US008744937B2

(12) United States Patent
Seubert et al.

(10) Patent No.: US 8,744,937 B2
(45) Date of Patent: Jun. 3, 2014

(54) CONSISTENT SET OF INTERFACES DERIVED FROM A BUSINESS OBJECT MODEL

(75) Inventors: Michael Seubert, Sinsheim (DE); Jochen A. Rasch, Sandhausen (DE); Axel Kuehl, Mannheim (DE); Dirk Becker, Reichartshausen (DE); Daniel Bock, Dossenheim (DE); Giovanni Deledda, Rauenberg (DE); Ralf Dielschneider, Rellingen (DE); Robert Doerner, Offenbach (DE); Philippe Drouin, Sinsheim (DE); Karsten Egetoft, Wiesloch (DE); Werner Gnan, Angelbachtal (DE); Daniel Goldmann, Mannheim (DE); Patrick Gross, Bensheim (DE); Joachim Kenntner, Heidelberg (DE); Adam Kiwon, Hannover (DE); Arndt Koester, Wiesloch (DE); Thilo Kraehmer, Heidelberg (DE); Andreas Krompholz, Heidelberg (DE); Corinne Kuster, Alpnach (CH); Otto Makris, Heidelberg (DE); Ramesh Nn, New Town (IN); Dietmar Nowotny, Dielheim (DE); Markus A. Peter, St. Leon-Rot (DE); Michael Redmann, Walldorf (DE); Jan Stephan, Bad Schoenborn (DE); Sergej Stotz, Wiesloch (DE); Frank Thome, Karlsruhe (DE); Burkhard Weiss, Wiesloch (DE); Rudolf Winkel, Walldorf (DE)

(73) Assignee: SAP AG, Walldorf (DE)

( * ) Notice: Subject to any disclaimer, the term of this patent is extended or adjusted under 35 U.S.C. 154(b) by 638 days.

(21) Appl. No.: 11/364,538

(22) Filed: Feb. 27, 2006
(Under 37 CFR 1.47)

(65) Prior Publication Data

US 2007/0150387 A1 Jun. 28, 2007

Related U.S. Application Data

(60) Provisional application No. 60/656,598, filed on Feb. 25, 2005, provisional application No. 60/729,480, filed on Oct. 21, 2005.

(30) Foreign Application Priority Data

| | | |
|---|---|---|
| Jun. 3, 2005 | (WO) | PCT/US05/19961 |
| Jun. 17, 2005 | (WO) | PCT/US05/21481 |
| Jun. 24, 2005 | (WO) | PCT/US05/22137 |

(51) Int. Cl.
*G06Q 40/00* (2012.01)

(52) U.S. Cl.
CPC ..... *G06Q 40/00* (2013.01)
USPC ..... 705/35

(58) Field of Classification Search
USPC ..... 705/35
See application file for complete search history.

(56) References Cited

U.S. PATENT DOCUMENTS 3,223,321 A 12/1965 Baumgartner
5,126,936 A 6/1992 Champion et al.

(Continued)

FOREIGN PATENT DOCUMENTS

CN 1501296 6/2004
CN 1609866 4/2005

(Continued)

OTHER PUBLICATIONS

FSML—Financial Services Markup Language (Jul. 14, 1999) http:xml.coverpages.org/FSML-v150a.pdf pp. 1-159.*

(Continued)

*Primary Examiner* — Ella Colbert
*Assistant Examiner* — Abdulmajeed Aziz
(74) *Attorney, Agent, or Firm* — Fish & Richardson P.C.

(57) ABSTRACT

A business object model, which reflects data that used during a given business transaction, is utilized to generate interfaces This business object model facilitates commercial transactions by providing consistent interfaces that are suitable for use across industries, across businesses, and across different departments within a business during a business transaction.

37 Claims, 1525 Drawing Sheets

(56) References Cited

U.S. PATENT DOCUMENTS

| | | | | |
|---|---|---|---|---|
| 5,210,686 | A | 5/1993 | Jernigan | |
| 5,247,575 | A | 9/1993 | Sprague et al. | |
| 5,255,181 | A | 10/1993 | Chapman et al. | |
| 5,321,605 | A | 6/1994 | Chapman et al. | |
| 5,463,555 | A | 10/1995 | Ward et al. | |
| 5,787,237 | A | 7/1998 | Reilly | |
| 5,812,987 | A | 9/1998 | Luskin et al. | |
| 5,966,695 | A | 10/1999 | Melchione et al. | |
| 5,970,465 | A | 10/1999 | Dietrich et al. | |
| 5,970,475 | A * | 10/1999 | Barnes et al. | 705/27 |
| 5,983,284 | A | 11/1999 | Argade | |
| 6,047,264 | A | 4/2000 | Fisher et al. | |
| 6,058,378 | A | 5/2000 | Clark et al. | |
| 6,073,137 | A | 6/2000 | Brown et al. | |
| 6,092,196 | A | 7/2000 | Reiche | |
| 6,104,393 | A | 8/2000 | Santos-Gomez | |
| 6,115,690 | A | 9/2000 | Wong | |
| 6,125,391 | A | 9/2000 | Meltzer et al. | |
| 6,138,118 | A | 10/2000 | Koppstein et al. | |
| 6,154,732 | A | 11/2000 | Tarbox | |
| 6,222,533 | B1 | 4/2001 | Notani et al. | |
| 6,226,675 | B1 | 5/2001 | Meltzer et al. | |
| 6,229,551 | B1 | 5/2001 | Huang | |
| 6,311,165 | B1 | 10/2001 | Coutts et al. | |
| 6,327,700 | B1 | 12/2001 | Chen et al. | |
| 6,331,972 | B1 | 12/2001 | Harris et al. | |
| 6,332,163 | B1 | 12/2001 | Bowman-Amuah | |
| 6,424,979 | B1 | 7/2002 | Livingston et al. | |
| 6,434,159 | B1 | 8/2002 | Woodward et al. | |
| 6,438,594 | B1 | 8/2002 | Bowman-Amuah | |
| 6,542,912 | B2 | 4/2003 | Meltzer et al. | |
| 6,591,260 | B1 | 7/2003 | Schwartzhoff et al. | |
| 6,725,122 | B2 | 4/2004 | Mori et al. | |
| 6,738,747 | B1 | 5/2004 | Tanaka et al. | |
| 6,745,229 | B1 | 6/2004 | Gobin et al. | |
| 6,763,353 | B2 | 7/2004 | Li et al. | |
| 6,775,647 | B1 | 8/2004 | Evans et al. | |
| 6,868,370 | B1 | 3/2005 | Burbridge et al. | |
| 6,937,992 | B1 | 8/2005 | Benda et al. | |
| 6,970,844 | B1 | 11/2005 | Bierenbaum | |
| 7,020,594 | B1 | 3/2006 | Chacon | |
| 7,039,606 | B2 | 5/2006 | Hoffman et al. | |
| 7,076,449 | B2 | 7/2006 | Tsunenari et al. | |
| 7,131,069 | B1 | 10/2006 | Rush et al. | |
| 7,206,768 | B1 | 4/2007 | deGroeve et al. | |
| 7,249,157 | B2 | 7/2007 | Stewart et al. | |
| 7,249,195 | B2 | 7/2007 | Panec et al. | |
| 7,269,569 | B2 | 9/2007 | Spira et al. | |
| 7,292,965 | B1 | 11/2007 | Mehta et al. | |
| 7,321,864 | B1 | 1/2008 | Gendler | |
| 7,363,271 | B2 | 4/2008 | Morimoto | |
| 7,379,931 | B2 | 5/2008 | Morinville | |
| 7,383,990 | B2 | 6/2008 | Veit | |
| 7,406,358 | B2 | 7/2008 | Preiss | |
| 7,426,520 | B2 | 9/2008 | Gorelik et al. | |
| 7,481,367 | B2 | 1/2009 | Fees et al. | |
| 7,509,278 | B2 | 3/2009 | Jones | |
| 7,515,697 | B2 | 4/2009 | Eng et al. | |
| 7,516,088 | B2 | 4/2009 | Johnson et al. | |
| 7,536,697 | B2 | 5/2009 | Wiseman et al. | |
| 7,574,383 | B1 | 8/2009 | Parasnis et al. | |
| 7,617,328 | B2 | 11/2009 | Lewis et al. | |
| 7,627,504 | B2 | 12/2009 | Brady et al. | |
| 7,634,482 | B2 | 12/2009 | Mukherjee et al. | |
| 7,689,711 | B2 | 3/2010 | Brouk et al. | |
| 7,788,319 | B2 | 8/2010 | Schmidt et al. | |
| 7,805,383 | B2 | 9/2010 | Veit et al. | |
| 7,853,491 | B2 | 12/2010 | Wittmer et al. | |
| 7,865,426 | B2 | 1/2011 | Volpert | |
| 7,873,965 | B2 | 1/2011 | Hayton et al. | |
| 7,895,209 | B2 | 2/2011 | Spence et al. | |
| 7,941,236 | B2 | 5/2011 | Spearman | |
| 8,082,243 | B2 | 12/2011 | Gorelik et al. | |
| 8,150,798 | B2 | 4/2012 | Ma et al. | |
| 2001/0042032 | A1 | 11/2001 | Crawshaw et al. | |
| 2001/0047372 | A1 | 11/2001 | Gorelik et al. | |
| 2002/0013721 | A1 | 1/2002 | Dabbiere et al. | |
| 2002/0026394 | A1 | 2/2002 | Savage et al. | |
| 2002/0046053 | A1 | 4/2002 | Hare et al. | |
| 2002/0052754 | A1 | 5/2002 | Joyce et al. | |
| 2002/0072988 | A1 | 6/2002 | Aram | |
| 2002/0087481 | A1 | 7/2002 | Harif | |
| 2002/0087483 | A1 | 7/2002 | Harif | |
| 2002/0099634 | A1 | 7/2002 | Coutts et al. | |
| 2002/0107765 | A1 | 8/2002 | Walker | |
| 2002/0112171 | A1 | 8/2002 | Ginter et al. | |
| 2002/0138318 | A1 | 9/2002 | Ellis et al. | |
| 2002/0147668 | A1 | 10/2002 | Smith et al. | |
| 2002/0152104 | A1 | 10/2002 | Ojha et al. | |
| 2002/0152145 | A1 | 10/2002 | Wanta et al. | |
| 2002/0156693 | A1 | 10/2002 | Stewart et al. | |
| 2002/0156930 | A1 | 10/2002 | Velasquez | |
| 2002/0157017 | A1 | 10/2002 | Mi et al. | |
| 2002/0169657 | A1 | 11/2002 | Singh et al. | |
| 2002/0184070 | A1 | 12/2002 | Chen et al. | |
| 2002/0186876 | A1 * | 12/2002 | Jones et al. | 382/135 |
| 2002/0194045 | A1 | 12/2002 | Shay et al. | |
| 2003/0004799 | A1 | 1/2003 | Kish | |
| 2003/0041178 | A1 | 2/2003 | Brouk et al. | |
| 2003/0069648 | A1 | 4/2003 | Douglas et al. | |
| 2003/0086594 | A1 | 5/2003 | Gross | |
| 2003/0120502 | A1 | 6/2003 | Robb et al. | |
| 2003/0120665 | A1 | 6/2003 | Fox et al. | |
| 2003/0126077 | A1 | 7/2003 | Kantor et al. | |
| 2003/0167193 | A1 | 9/2003 | Jones et al. | |
| 2003/0171962 | A1 | 9/2003 | Hirth et al. | |
| 2003/0172007 | A1 | 9/2003 | Helmolt et al. | |
| 2003/0172135 | A1 | 9/2003 | Bobick et al. | |
| 2003/0195815 | A1 * | 10/2003 | Li et al. | 705/26 |
| 2003/0204452 | A1 | 10/2003 | Wheeler | |
| 2003/0208389 | A1 | 11/2003 | Kurihara et al. | |
| 2003/0212614 | A1 | 11/2003 | Chu et al. | |
| 2003/0216978 | A1 | 11/2003 | Sweeney et al. | |
| 2003/0220875 | A1 | 11/2003 | Lam et al. | |
| 2003/0229522 | A1 | 12/2003 | Thompson et al. | |
| 2003/0229550 | A1 | 12/2003 | DiPrima et al. | |
| 2003/0233295 | A1 | 12/2003 | Tozawa et al. | |
| 2003/0236748 | A1 | 12/2003 | Gressel et al. | |
| 2004/0015366 | A1 | 1/2004 | Wiseman et al. | |
| 2004/0024662 | A1 | 2/2004 | Gray et al. | |
| 2004/0034577 | A1 | 2/2004 | Van Hoose et al. | |
| 2004/0039665 | A1 | 2/2004 | Ouchi | |
| 2004/0073510 | A1 | 4/2004 | Logan | |
| 2004/0083201 | A1 | 4/2004 | Sholl et al. | |
| 2004/0083233 | A1 | 4/2004 | Willoughby | |
| 2004/0133445 | A1 | 7/2004 | Rajan et al. | |
| 2004/0138942 | A1 | 7/2004 | Pearson et al. | |
| 2004/0148227 | A1 | 7/2004 | Tabuchi et al. | |
| 2004/0172360 | A1 | 9/2004 | Mabrey et al. | |
| 2004/0186891 | A1 | 9/2004 | Panec et al. | |
| 2004/0187140 | A1 | 9/2004 | Aigner et al. | |
| 2004/0220910 | A1 | 11/2004 | Zang et al. | |
| 2004/0254945 | A1 | 12/2004 | Schmidt et al. | |
| 2004/0267714 | A1 | 12/2004 | Frid et al. | |
| 2005/0015273 | A1 | 1/2005 | Iyer | |
| 2005/0021366 | A1 | 1/2005 | Pool et al. | |
| 2005/0033588 | A1 | 2/2005 | Ruiz et al. | |
| 2005/0038744 | A1 * | 2/2005 | Viijoen | 705/42 |
| 2005/0049903 | A1 | 3/2005 | Raja | |
| 2005/0055369 | A1 | 3/2005 | Gorelik et al. | |
| 2005/0071262 | A1 | 3/2005 | Kobeh et al. | |
| 2005/0080640 | A1 | 4/2005 | Bhaskaran et al. | |
| 2005/0108085 | A1 | 5/2005 | Dakar et al. | |
| 2005/0131947 | A1 | 6/2005 | Laub et al. | |
| 2005/0159997 | A1 | 7/2005 | John | |
| 2005/0171833 | A1 | 8/2005 | Jost et al. | |
| 2005/0182639 | A1 | 8/2005 | Dale | |
| 2005/0187797 | A1 | 8/2005 | Johnson | |
| 2005/0187866 | A1 * | 8/2005 | Lee | 705/39 |
| 2005/0194431 | A1 | 9/2005 | Fees et al. | |
| 2005/0194439 | A1 | 9/2005 | Zuerl et al. | |
| 2005/0197849 | A1 | 9/2005 | Fotteler et al. | |
| 2005/0197851 | A1 | 9/2005 | Veit | |
| 2005/0197878 | A1 | 9/2005 | Fotteler et al. | |

(56) References Cited

U.S. PATENT DOCUMENTS

2005/0197881 A1 9/2005 Fotteler et al.
2005/0197882 A1 9/2005 Fotteler et al.
2005/0197886 A1 9/2005 Veit
2005/0197887 A1 9/2005 Zuerl et al.
2005/0197896 A1 9/2005 Veit et al.
2005/0197897 A1 9/2005 Veit et al.
2005/0197898 A1 9/2005 Veit et al.
2005/0197899 A1 9/2005 Veit et al.
2005/0197900 A1 9/2005 Veit
2005/0197901 A1 9/2005 Veit et al.
2005/0197902 A1 9/2005 Veit
2005/0197928 A1 9/2005 Fotteler et al.
2005/0197941 A1 9/2005 Veit
2005/0209732 A1 9/2005 Audimoolam et al.
2005/0210406 A1 9/2005 Biwer et al.
2005/0216321 A1 9/2005 Veit
2005/0216371 A1 9/2005 Fotteler et al.
2005/0216421 A1 9/2005 Barry et al.
2005/0222888 A1 10/2005 Hosoda et al.
2005/0222896 A1 10/2005 Rhyne et al.
2005/0222945 A1 10/2005 Pannicke et al.
2005/0228821 A1 10/2005 Gold
2005/0234754 A1 10/2005 Veit
2005/0246240 A1 11/2005 Padilla
2005/0256753 A1 11/2005 Veit et al.
2006/0004934 A1 1/2006 Guldner et al.
2006/0005098 A1 1/2006 Lotz et al.
2006/0020515 A1 1/2006 Lee et al.
2006/0026552 A1 2/2006 Mazzitelli et al.
2006/0026586 A1 2/2006 Remmel et al.
2006/0036941 A1 2/2006 Neil
2006/0047574 A1 3/2006 Sundaram et al.
2006/0047598 A1 3/2006 Hansen
2006/0059005 A1 3/2006 Horn et al.
2006/0059059 A1 3/2006 Horn et al.
2006/0059060 A1 3/2006 Horn et al.
2006/0069598 A1 3/2006 Schweitzer et al.
2006/0069629 A1 3/2006 Schweitzer et al.
2006/0069632 A1 3/2006 Kahn et al.
2006/0074728 A1 4/2006 Schweitzer et al.
2006/0080338 A1 4/2006 Seubert et al.
2006/0085336 A1 4/2006 Seubert et al.
2006/0085412 A1 4/2006 Johnson et al.
2006/0085450 A1 4/2006 Seubert et al.
2006/0089885 A1 4/2006 Finke et al.
2006/0095373 A1 5/2006 Venkatasubramanian et al.
2006/0184435 A1* 8/2006 Mostowfi ........................ 705/35
2006/0212376 A1 9/2006 Snyder et al.
2006/0280302 A1 12/2006 Baumann et al.
2006/0282360 A1 12/2006 Kahn et al.
2007/0027742 A1 2/2007 Emuchay et al.
2007/0043583 A1 2/2007 Davulcu et al.
2007/0055688 A1 3/2007 Blattner
2007/0067411 A1 3/2007 Angelov
2007/0078799 A1 4/2007 Huber-Buschbeck et al.
2007/0112574 A1 5/2007 Greene
2007/0124227 A1 5/2007 Dembo et al.
2007/0129978 A1 6/2007 Shirasu et al.
2007/0132585 A1 6/2007 Llorca et al.
2007/0150387 A1 6/2007 Seubert et al.
2007/0150836 A1 6/2007 Deggelmann et al.
2007/0156428 A1 7/2007 Brecht-Tillinger et al.
2007/0156545 A1 7/2007 Lin
2007/0156552 A1 7/2007 Manganiello
2007/0156690 A1 7/2007 Moser et al.
2007/0165622 A1 7/2007 O'Rourke et al.
2007/0214065 A1* 9/2007 Kahlon et al. .................. 705/28
2007/0225949 A1 9/2007 Sundararajan et al.
2007/0226090 A1 9/2007 Stratton
2007/0255639 A1 11/2007 Seifert
2007/0265860 A1 11/2007 Herrmann et al.
2007/0265862 A1 11/2007 Freund et al.
2007/0288250 A1 12/2007 Lemcke et al.
2007/0294159 A1 12/2007 Cottle
2008/0005012 A1 1/2008 Deneef
2008/0016242 A1 1/2008 Panec et al.
2008/0021754 A1 1/2008 Horn et al.
2008/0040243 A1 2/2008 Chang et al.
2008/0046104 A1 2/2008 Van Camp et al.
2008/0046421 A1 2/2008 Bhatia et al.
2008/0120129 A1 5/2008 Seubert et al.
2008/0120190 A1 5/2008 Joao et al.
2008/0120204 A1 5/2008 Conner et al.
2008/0120313 A1 5/2008 O'Brien et al.
2008/0133303 A1 6/2008 Singh et al.
2008/0154969 A1 6/2008 DeBie
2008/0162266 A1 7/2008 Griessmann et al.
2008/0184265 A1 7/2008 Kasi et al.
2008/0196108 A1 8/2008 Dent et al.
2008/0215354 A1 9/2008 Halverson et al.
2008/0243578 A1 10/2008 Veit
2008/0288317 A1 11/2008 Kakar
2009/0006203 A1 1/2009 Fordyce et al.
2009/0063287 A1 3/2009 Tribout et al.
2009/0077074 A1 3/2009 Hosokawa
2009/0089198 A1 4/2009 Kroutik
2009/0094274 A1 4/2009 Gorelik et al.
2009/0164497 A1 6/2009 Steinmaier et al.
2009/0192926 A1 7/2009 Tarapata
2009/0193432 A1 7/2009 McKegney et al.
2009/0222360 A1 9/2009 Schmitt et al.
2009/0248429 A1 10/2009 Doenig et al.
2009/0248430 A1 10/2009 Hubert et al.
2009/0248431 A1 10/2009 Schoknecht et al.
2009/0248463 A1 10/2009 Piochon et al.
2009/0248473 A1 10/2009 Doenig et al.
2009/0248487 A1 10/2009 Santoso et al.
2009/0248547 A1 10/2009 Doenig et al.
2009/0248558 A1 10/2009 Hollberg et al.
2009/0248586 A1 10/2009 Kaisermayr et al.
2009/0248698 A1 10/2009 Rehmann
2009/0249358 A1 10/2009 Schuette
2009/0249362 A1 10/2009 Lindemann et al.
2009/0271245 A1 10/2009 Joshi et al.
2009/0300578 A1 12/2009 Neil
2009/0326988 A1 12/2009 Barth et al.
2009/0327009 A1 12/2009 Schmitt et al.
2009/0327105 A1 12/2009 Moussa et al.
2009/0327106 A1 12/2009 Bartelt et al.
2010/0001834 A1 1/2010 Brunswig et al.
2010/0014510 A1 1/2010 Boreli et al.
2010/0070391 A1 3/2010 Storr et al.
2010/0070395 A1 3/2010 Elkeles et al.
2010/0106555 A1 4/2010 Mneimneh et al.
2010/0131379 A1 5/2010 Dorais et al.
2010/0131394 A1 5/2010 Rutsch et al.
2010/0153297 A1 6/2010 Haaf et al.
2010/0161425 A1 6/2010 Sideman
2010/0217645 A1 8/2010 Jin et al.
2010/0217820 A1 8/2010 Brouk et al.
2010/0218245 A1 8/2010 Brouk et al.
2010/0241729 A1 9/2010 Angelov
2010/0306536 A1 12/2010 Brouk et al.
2011/0046775 A1 2/2011 Bailey et al.
2011/0077999 A1 3/2011 Becker et al.
2011/0078048 A1 3/2011 Becker et al.
2011/0153767 A1 6/2011 Coldicott et al.
2011/0276636 A1 11/2011 Cheng et al.

FOREIGN PATENT DOCUMENTS

CN 1632806 6/2005
CN 1765138 4/2006
CN 1767537 5/2006
CN 101174957 5/2008
CN 101288092 10/2008
WO WO 2008/005102 1/2008

OTHER PUBLICATIONS

SAP Structured Entity Relationship Model (SAP-SERM) for R/3 System Release 4.0 Introduction and Index: Dec. 1998; 26 pages.
SAP Structured Entity Relationship Model (SAP-SERM) for R/3 System Release 4.0 (Part 1); Dec. 1998; 5954 pages.

(56) References Cited

OTHER PUBLICATIONS

Sap Structured Entity Relationship Model (SAP-SERM) for R/3 System Release 4.0 (Part 2); Dec. 1998; 7838 pages.
Zencke, Peter: "Engineering a Business Platform"; SAP AG 2005; Engineering BPP: [Online]previously available at URL www.sap.com/community/pub/webcast/2006_01_16_Analyst_Summit_Vegas/2006_01_16_Analyst_Summit_Vegas_009.pdf ; 36 pages.
"UML in the .com Enterprise: Modeling CORBA, Components, XML/XMI and Metadata Workshop"; http://www.omg. org/news/meetings/workshops/uml_presentations.htm.
Medjahed, Brahim et al; "Business-to-Business Interactions: Issues and Enabling Technologies"; The VLDB Journal; vol. 12, No. 1; Apr. 3, 2003; pp. 59-89.
Medjahed, Brahim et al.; "Composing Web Services on the Semantic Web"; The VLDB Journal; vol. 12, No. 4, Sep. 23, 2003; pp. 333-351.
Born, Marc et al.; "Customizing UML for Component Design"; www.dot-profile.de; UML Workshop. Palm Springs, CA; Nov. 2000.
Kappel, Gerti et al.; "A Framework for Workflow Management Systems Based on Objects, Rules, and Roles"; ACM Computing Surveys; ACM Press; vol. 32; Mar. 2000; 5 pages.
Skonnard, Aaron et al.; "BizTalk Server 2000: Architecture and Tools for Trading Partner Integration"; MSDn Magazine; 2000: ms-help://ms.msdnqtr.2003apr.1033/dnmag00/htmal/biztalk.htm; 7 pages.
Microsoft: "Creating an XML Web Service Proxy"; 2001; mshelp://ms.msdnqtr.2003apr.1033/cpguide/html/cpconcreatingwebserviceproxy.htm; 3 pages.
Proceedings of OMG Workshops; http://www.omg.org/news/meetings/workshops/proceedings.htm; pp. 1-3.
Meltzer, Bart et al.; "XML and Electronic Commerce: Enabling the Network Economy"; SIGMOD Record; ACM Press; vol. 27, No. 4; Dec. 1998; p. 21-24.
Huhns, Michael N. et al.: "Automating Supply-Chain Mangement"; Jul. 15-19, 2002: pp. 1017-1024.
Soederstruem, Eva; "Standardising the Business Vocabulary of Standards"; SAC, Madrid, Spain: 2002; pp. 1048-1052.
Bastide. Remi et al.; "Formal Specification of CORBA Services: Experience and Lessons Learned"; 2000; pp. 105-117.
Glushko. Robert J. et al.: "An XML Framework for Agent-Based E-Commerce"; Communications of the ACM; vol. 42, No. 3; Mar. 1999; pp. 106-114.
Coen-Porisini, Alberto et al.; "A Formal Approach for Designing CORBA-Based Applications"; ACM Transactions on Software Engineering and Methodology; vol. 12, No. 2; Apr. 2003; pp. 107-151.
Yang. J. et al.; "Service Deployment for Virtual Enterprises"; IEEE; 2001: pp. 107-115.
Karp, Alan H.; "E-speak E-xplained"; Communications of the ACM; vol. 46, No. 7; Jul. 2003; pp. 113-118.
Gillibrand. David: "Essential Business Object Design"; Communications of the ACM; vol. 43. No. 2; Feb. 2000; pp. 117-119.
Cole, James et al.; "Extending Support for Contracts in ebXML"; IEEE; 2001; pp. 119-127.
DiNitto, Elisabetta et al.; "Deriving, Executable Process Descriptions from UML": ICSE '02; May 19-25, 2002; p. 155-165.
Stumptner, Markus et al.; "On the Road to Behavior-Based Integration"; First Asia-Pacific Conferences on Conceptual Modelling; Dunedin; New Zealand; Jan. 2004; pp. 15-22.
Gosain, Sanjay et al.; "The Impact of Common E-Business Interfaces"; Communications of the ACM; vol. 46, No. 2; Dec. 2003; pp. 186-195.
Damodaran, Suresh; "B2B Integration over the Internet with XML—RosettaNet Successes and Challenges"; WWW2004; May 17-22, 2004; pp. 188-195.
Schulze, Wolfgang et al.; "Standardising on Workflow-Management—The OMG Workflow Management Facility"; SIGGROUP Bulletin; vol. 19, No. 1, Apr. 1998; pp. 24-30.
Sutherland, Jeff; "Business Objects in Corporate Information Systems"; ACM Computing Surveys; vol. 27, No. 2; Jun. 1995; pp. 274-276.
Arsanjani, Ali; "Developing and Integrating Enterprise Components and Services": Communications of the ACM; vol. 45. No. 10; Oct. 2002; pp. 31-34.
Kim, Dan Jong et al.; "A Comparison of B2B E-Service Solutions": Communications of the ACM; vol. 46. No. 12; Dec. 2003; pp. 317-324.
Hasselbring. Wilhelm; "Information System Integration"; Communications of the ACM; vol. 43, No. 6; Jun. 2000; pp. 33-38.
Khosravi, Navid et al.; "An Approach to Building Model Driven Enterprise Systems in Nebras Enterprise Framework"; OOPSLA '02: Companion of the 17$^{th}$ Annual ACM SIGPLAN Conference on Object-Oriented Programming, Systems, Languages, and Applications; Nov. 4-8, 2002; pp. 32-33.
Hogg K. et al.; "An Evaluation of Web Sevice in the Design of a B2B Application"; 27$^{th}$ Australasian Computer Science Conference; Dunedin, New Zealand; 2004; pp. 331-340.
Gruhn, Volker et al.; "Workflow Management Based on Process Model Repositories"; IEEE 1998; pp. 379-388.
Kim, HyoungDo; "Conceptual Modeling and Specification Generation for B2B Business Processes Based on ebXML"; SIGMOD Record; vol. 31. No. 1; Mar. 2002; pp. 37-42.
Siegel, Jon; "OMG Overview: CORBA and the OMA in Enterprise Computing"; Communications of the ACM; vol. 41, No. 10; Oct. 1998; pp. 37-43.
Yang, Jian et al.; "Interoperation Support for Electronic Business"; Communications of the ACM; vol. 43, No. 6: Jun. 2000; pp. 39-47.
Levi, Keith et al.; "A Goal-Driven Approach to Enterprise Component Identification and Specification"; Communications of the ACM; vol. 45, No. 10; Oct. 2002; pp. 45-52.
Terai, Koichi et al.; "Coordinating Web Services Based on Business Models"; 2003; pp. 473-478.
Aversano. Lerina et al.; "Introducing eServices in BusineSs Process Models"; SEKE '02; Ischia Italy; Jul. 15-19, 2002; pp. 481-488.
Quix, Christoph et al.; "Business Data Management for Business-to-Business Electronic Commerce", SIGMOD Record; vol. 31, No. 1; Mar. 2002: pp. 49-54.
Sutherland, Jeff: "Why I Love the OMG: Emergence of a Business Object Component Architecture"; Standard View; vol. 6, No. 1; Mar. 1998; pp. 4-13.
Dogac, Asuman et al.; "An ebXML Infrastructure Implementation through UDDI Registries and RosettaNet PIPs"; ACM SIGMOD; Madison, Wisconsin; Jun. 4-6, 2002; pp. 512-523.
Lee, Jinyoul et al.; "Enterprise Integration with ERP and EAI"; Communications of the ACM; vol. 46. No. 2; Feb. 2003; pp. 54-60.
Bratthal, Lars G. et al.; "Integrating Hundreds of Products through One Architecture—The Industrial IT Architecture"; ICSE '02; Orlando, Florida; May 19-25; pp. 604-614.
Fingar, Peter; "Component-Based Frameworks for E-Commerce"; Communications of the ACM; vol. 43, No. 10; Oct. 2000; pp. 61-66.
Sprott, David; "Componentizing the Enterprise Application Packages"; Communications of the ACM: vol. 43, No. 4; Apr. 2000; pp. 63-69.
Gokhale, Aniruddha et al.; "Applying Model-Integrated Computing to Component Middleware and Enterprise Applications"; Communications of the ACM; vol. 45, No. 10; Oct. 2002; pp. 65-70.
Bussler, Christoph; "The Role of B2B Engines in B2B Integration Architectures"; SIGMOD record; vol. 31, No. 1; Mar. 2002; pp. 67-72.
Fremantle, Paul et al.; "Enterprise Services"; Communications of the ACM; vol. 45, No. 10; Oct. 2002; pp. 77-79.
Trastour, David et al.; "Semantic Web Support for the Business-to-Business E-Commerce Lifecycle"; WWW2002, Honolulu, Hawaii; May 7-11, 2002; pp. 89-98.
Jaeger, Dirl et al.; "Using UML for Software Process Modeling"; pp. 91-108.
Han, Zaw Z. et al.; "Interoperability from Electronic Commerce to Litigation Using XML Rules"; 2003; pp. 93-94.
Carlson, David A.; "Designing XML Vocabularies with UML"; OOPSLA 2000 Companion; Minneapolis, Minnesota; 2000; pp. 95-96.
Stonebraker, Michael; "Too Much Middleware"; SIGMOD Record; vol. 31, No. 1; Mar. 2002; pp. 97-106.

(56) References Cited

OTHER PUBLICATIONS

Maamar, Zakaria et al.; "Toward Intelligent Business Objects"; Communications of the ACM; vol. 43, No. 10; Oct. 2000: pp. 99-101.
Tenenbaum, Jay M. et al.; "Eco System: An Internet Commerce Architecture"; IEEE: May 1997; pp. 48-55.
Eyal, Anat et al.; "Integrating and Customizing Heterogeneous E-Commerce Applications"; The VLDB Journal; Aug. 2001; pp. 16-38.
Office Action issued in related U.S. Appl. No. 11/145,464, filed Jan. 22, 2009; 49 pages.
International Search Report and Written Opinion of the International Searching Authority issued in International Application No. PCT/US2007/011378 on Apr. 30, 2008; 17 pages.
International Preliminary Report on Patentability under Chapter 1 issued in International Application No. PCT/US2007/011378 on Nov. 17, 2008; 11 pages.
International Search Report and Written Opinion of the International Searching Authority issued in International Application No. PCT/IB2006/001401 on Aug. 27, 2008; 8 pages.
International Search Report and Written Opinion of the International Searching Authority issued in International Application No. PCT/US2005/019961 on Sep. 22, 2005; 8 pages.
International Preliminary Report on Patentability under Chapter 1 issued in International Application No. PCT/US2005/019961 on Dec. 4, 2006; 6 pages.
International Search Report and Written Opinion of the International Search Authority issued in International Application No. PCT/US2005/021481 on Apr. 11, 2006; 7 pages.
International Search Report and Written Opinion of the International Searching Authority issued in International Application No. PCT/US2005/021481 on May 29, 2007; 6 pages.
International Preliminary Report on Patentability under Chapter 1 issued in International Application No. PCT/US2005/021481 on Dec. 20, 2006; 6 pages.
International Preliminary Report on Patentability under Chapter 1 issued in International Application No. PCT/US2005/021481 on Jul. 15, 2008; 5 pages.
International Search Report and Written Opinion of the International Searching Authority issued in International Application No. PCT/US2005/022137 on Sep. 23, 2005; 7 pages.
International Search Report and Written Opinion of the International Searching Authority issued in International Application No. PCT/US2005/022137 on May 12, 2006; 7 pages.
International Preliminary Report on Patentability under Chapter 1 issued in International Application No. PCT/US2005/022137 on Dec. 28, 2006; 5 pages.
He, Ning et al.; "B2B Contract Implementation Using Windows DNS"; 2001; pp. 71-79.
Webster's Revised Unabridged Dictionary (1913+1828); Def. "merchandise".
Statement in Accordance with the Notice from the European Patent Office dated Oct. 1, 2007 Concerning Business Methods—EPC; Official Journal of the European Patent Office; Munich; Nov. 1, 2007; pp. 592-593.
Lynn, Chris; "Sony Enters Brand Asset Management Market"; The Seybold Report; Analyzing Publishing Technologies; Aug. 4, 2004; <www.Seybold365.com>; 3 pages.
"Header", Newton's Telecom Dictionary; 12th Edition, 2004; pp. 389-390).
Office Action issued in related U.S. Appl. No. 11/640,422 on Apr. 2, 2009; 13 pages.
Office Action issued in related U.S. Appl. No. 11/640,422 on Dec. 30, 2009; 9 pages.
Office Action issued in U.S. Appl. No. 11/640,422 on May 14, 2010; 12 pages.
Office Action issued in related U.S. Appl. No. 11/803,178 on Jun. 29, 2009; 5 pages.
Office Action issued in related U.S. Appl. No. 11/803,178 on Mar. 4, 2010; 43 pages.
Office Action issued in related U.S. Appl. No. 11/775,821 on Jan. 22, 2010; 16 pages.
Notice of Allowance issued in related U.S. Appl. No. 11/775,821 on Jul. 16, 2010; 4 pages.
Office Action issued in related U.S. Appl. No. 11/731,857 on May 15, 2009; 11 pages.
Office Action issued in related U.S. Appl. No. 11/731,857 on Feb. 4, 2010; 22 pages.
Office Action issued in related U.S. Appl. No. 11/864,786 on Jun. 22, 2009; 7 pages.
Office Action issued in related U.S. Appl. No. 11/864,786 on Mar. 3, 2010; 12 pages.
Office Action issued in related U.S. Appl. No. 11/864,832 on Sep. 18, 2009; 14 pages.
Notice of Allowance issued in related U.S. Appl. No. 11/864,832 on Mar. 24, 2010; 11 pages.
Office Action issued in related U.S. Appl. No. 11/864,871 on Apr. 21, 2010; 20 pages.
Office Action issued in related U.S. Appl. No. 12/059,867 on Aug. 18, 2009; 37 pages.
Office Action issued in related U.S. Appl. No. 12/059,867 on Feb. 22, 2010; 24 pages.
Office Action issued in related U.S. Appl. No. 12/060,178 on Dec. 7, 2009; 6 pages.
Office Action issued in related U.S. Appl. No. 12/060,178 on May 25, 2010; 19 pages.
Office Action issued in related U.S. Appl. No. 12/060,171 on Aug. 11, 2009; 11 pages.
Office Action issued in related U.S. Appl. No. 12/060,171 on Mar. 19, 2010; 10 pages.
Office Action issued in related U.S. Appl. No. 12/060,171 on Jul. 1, 2010; 19 pages.
Office Action issued in related U.S. Appl. No. 11/145,464 on Aug. 5, 2009; 31 pages.
Office Action issued in related U.S. Appl. No. 11/145,464 on Feb. 5, 2010; 57 pages.
Office Action issued in related U.S. Appl. No. 11/155,368 on May 14, 2009; 6 pages.
Office Action issued in related U.S. Appl. No. 11/155,368 on Dec. 10, 2009; 43 pages.
Advisory Action issued in U.S. Appl. No. 11/155,368 on Mar. 31, 2010; 3 pages.
Office Action issued in related U.S. Appl. No. 11/166,065 on Jun. 24, 2009; 6 pages.
Office Action issued in related U.S. Appl. No. 11/166,065 on Mar. 3, 2010; 25 pages.
Communication Pursuant to Article 94(3) EPC issued in related European Application No. 05757432.9 on Jan. 26, 2009; 4 pages.
Supplementary European Search Report issued in related European Application No. 05823434.5 on Sep. 28, 2009; 3 pages.
Supplementary European Search Report issued in related European Application No. 05766672.9 on Oct. 6, 2009; 3 pages.
Newton's Telecom Dictionary; 18th Edition; 2002; pp. 347, 454.
Notice of Allowance issued in related U.S. Appl. No. 12/147,395 on Oct. 26, 2010; 10 pages.
Office Action issued in related U.S. Appl. No. 12/147,399 on Jan. 26, 2011; 16 pages.
Notice of Allowance issued in related U.S. Appl. No. 11/775,821 on Oct. 22, 2010; 4 pages.
Notice of Allowance issued in related U.S. Appl. No. 11/775,821 on Feb. 4, 2011; 4 pages.
Notice of Allowance issued in related U.S. Appl. No. 11/731,857 on Nov. 29, 2010; 4 pages.
Notice of Allowance issued in related U.S. Appl. No. 11/864,832 on Aug. 23, 2010; 4 pages.
Notice of Allowance issued in related U.S. Appl. No. 11/864,832 on Dec. 3, 2010; 9 pages.
Office Action issued in related U.S. Appl. No. 11/864,871 on Oct. 1, 2010; 30 pages.
Office Action issued in related U.S. Appl. No. 12/059,971 on Nov. 4, 2010; 20 pages.
Office Action issued in related U.S. Appl. No. 12/060,149 on Aug. 26, 2010; 15 pages.

(56) References Cited

OTHER PUBLICATIONS

Office Action issued in related U.S. Appl. No. 12/060,149 on Feb. 4, 2011; 19 pages.
Notice of Allowance issued in related U.S. Appl. No. 12/060,178 on Dec. 6, 2010; 4 pages.
Office Action issued in related U.S. Appl. No. 12/060,171 on Jan. 26, 2011; 17 pages.
Notice of Allowance issued in related U.S. Appl. No. 11/145,464 on Nov. 1, 2010; 4 pages.
Notice of Allowance issued in U.S. Appl. No. 11/155,368 on Oct. 7, 2010; 4 pages.
Notice of Allowance issued in related U.S. Appl. No. 11/166,065 on Sep. 20, 2010; 6 pages.
Office Action issued in related U.S. Appl. No. 11/864,866 on Feb. 3, 2011; 20 pages.
Newton's Telecom Dictionary; 18th Edition; 2002; pp. 347, 464.
Baker, Stacy; "Benefits of Assortment Planning"; Assortment Planning for Apparel Retailers—2005 Management Briefing; Just Style; Jun. 2005; 3 pages.
"Visual and Quantitative Assortment Planning Applications Drive Partnership and Profit"; PR Newswire; Jan. 12, 2006; 3 pages.
"DOTS Inc. Selects Compass Software's smartmerchandising for Merchandise Planning and Assortment Planning"; PR Newswire; Dec. 11, 2002; 2 pages.
SAP; "BC-Central Maintenance and Transport Objects"; Release 4.6C; Apr. 2001; 15 pages.
Annevelink et al.; "Heterogeneous Database Intergration in a Physician Workstation"; 1992; 5 pages.
Ketabchi et al.; "Object-Oriented Database Management Support for Software Maintenance and Reverse Engineering"; Department of Electrical Engineering and Computer Science, Santa Clara University; 1989; 4 pages.
Diehl et al.; "Service Architecture for an Object-Oriented Next Generation Profile Register"; date unknown; 8 pages.
International Search Report and Written Opinion of the International Searching Authority issued in International Application No. PCT/CN2010/073856 on Mar. 17, 2011; 8 pages.
International Search Report and Written Opinion of the International Searching Authority issued in International Application No. PCT/CN2010/073864 on Mar. 3, 2011; 8 pages.
International Search Report and Written Opinion of the International Searching Authority issued in International Application No. PCT/CN2010/073868 on Mar. 17, 2011; 10 pages.
Communication Pursuant to Rules 70(2) and 70a(2) EPC issued in related European Application No. 07835755.5 on Feb. 28, 2011; 6 pages.
Communication Pursuant to Article 94(3) issued in European Application No. 05757432.9 on Apr. 12, 2011; 5 pages.
Notice of Allowance issued in U.S. Appl. No. 12/147,395 on May 4, 2011; 10 pages.
Notice of Allowance issued in related U.S. Appl. No. 12/147,449 on Apr. 28, 2011; 9 pages.
Office Action issued in related U.S. Appl. No. 12/334,175 on May 27, 2011; 12 pages.
Notice of Allowance issued in related U.S. Appl. No. 11/731,857 on Apr. 11, 2011; 8 pages.
Office Action issued in U.S. Appl. No. 12/147,414 on Apr. 14, 2011; 30 pages.
Office Action issued in U.S. Appl. No. 12/147,378 on Jun. 17, 2011; 10 pages.
Office Action issued in U.S. Appl. No. 12/323,116 on Sep. 6, 2011; 8 pages.
Notice of Allowance issued in U.S. Appl. No. 12/323,139 on Mar. 4, 2011; 13 pages.
Office Action issued in U.S. Appl. No. 12/571,140 on Sep. 26, 2011; 14 pages.
Office Action issued in related U.S. Appl. No. 12/059,971 on May 18, 2011; 13 pages.
Office Action issued in related U.S. Appl. No. 12/060,054 on Jun. 29, 2011; 15 pages.
Office Action issued in U.S. Appl. No. 12/060,144 on Jun. 23, 2011; 16 pages.
Office Action issued in related U.S. Appl. No. 12/059,804 on Apr. 28, 2011; 14 pages.
Office Action issued in related U.S. Appl. No. 12/059,860 on Aug. 3, 2011; 15 pages.
Office Action issued in related U.S. Appl. No. 12/060,192 on Apr. 14, 2011; 18 pages.
Office Action issued in related U.S. Appl. No. 12/060,192 on Sep. 6, 2011; 18 pages.
Notice of Allowance issued in related U.S. Appl. No. 12/060,178 on Sep. 2, 2011; 9 pages.
Office Action issued in related U.S. Appl. No. 12/060,062 on Jul. 13, 2011; 16 pages.
Office Action issued in related U.S. Appl. No. 12/060,155 on May 10, 2011; 8 pages.
Notice of Allowance issued in related U.S. Appl. No. 11/145,464 on Feb. 23, 2011; 7 pages.
Notice of Allowance issued in U.S. Appl. No. 11/155,368 on Mar. 14, 2011; 7 pages.
Notice of Allowance issued in U.S. Appl. No. 11/166,065 on Mar. 8, 2011; 5 pages.
Notice of Allowance issued in related U.S. Appl. No. 11/864,866 on Jul. 22, 2011; 6 pages.
Office Action issued in U.S. Appl. No. 11/864,811 on Mar. 18, 2011; 10 pages.
Office Action issued in U.S. Appl. No. 11/864,811 on Jul. 26, 2011; 7 pages.
Notice of Allowance issued in related U.S. Appl. No. 11/864,832 on Jul. 7, 2011;11 pages.
Office Action issued in related U.S. Appl. No. 11/864,863 on Jul. 21, 2011; 29 pages.
Notice of Allowance issued in related U.S. Appl. No. 11/803,178 on May 17, 2011; 13 pages.
Altintas et al.; "Aurora Software Product Line"; Cybersoft Information Technologies Co.; 2005; pp. 1-8.
Boetterweck, Goetz; "A Model-Driven Approach to the Engineering of Multiple User Interfaces"; Lecture Notes in Computer Science; 2007; vol. 4364/2007; pp. 106-115.
Gable, Julie; "Enterprise Application Integration"; Information Management Journal; Mar./Apr. 2002; pp. 48-52.
Himoff et al.; "MAGENTA Technology: Multi-Agent Systems for Industrial Logistics"; AAMAS'05; Jul. 25-29, 2005; 2005 ACM; pp. 60-66:1-7).
Lockemann et al.; "Flexibility through Multi-Agent Systems: Solutions or Illusions"; SOFSEM 2004; pp. 41-56.
Mascolo et al.; "An Analytical Method for Performance Evaluation of Kanban Controlled Production Systems"; Operations Research; vol. 44, No. 1; 1996; pp. 50-64.
SAP 2008 Annual Report; 256 pages.
"SAP Labs and HP Team to Advance Internet-Based Supply Chain Collaboration"; Business Editors and Technology Writers; Business Wire; New York; Feb. 3, 2000; 4 pages.
Shi, Min-Hua et al.; "MQML-Message Queuing Markup Language"; Proceedings of the 4th IEEE International Workshop on Advanced Issues of E-Commerce and Web-Based Information Systems (WECWIS 2002); 2002; 8 pages.
Communication Pursuant to Article 94(3) EPC issued in European Application No. 07835755.5 on Feb. 22, 2012; 7 pages.
Communication Pursuant to Article 94(3) issued in European Application No. 05766672.9 on Jul. 14, 2011; 4 pages.
International Search Report and Written Opinion issued in International Application No. PCT/CN2011/001238 on May 3, 2012; 9 pages.
Notice of Allowance issued in related U.S. Appl. No. 11/864,866 on Mar. 13, 2012; 7 pages.
Notice of Allowance issued in related U.S. Appl. No. 11/145,464 on Feb. 6, 2012; 7 pages.
Notice of Allowance issued in related U.S. Appl. No. 11/731,857 on Dec. 14, 2011; 7 pages.
Notice of Allowance issued in related U.S. Appl. No. 11/803,178 on Jul. 17, 2012; 7 pages.

(56) References Cited

OTHER PUBLICATIONS

Notice of Allowance issued in related U.S. Appl. No. 11/864,832 on Jan. 9, 2012;12 pages.
Notice of Allowance issued in related U.S. Appl. No. 11/864,832 on Jul. 30, 2012;12 pages.
Notice of Allowance issued in U.S. Appl. No. 11/155,368 on Jul. 23, 2012; 7 pages.
Notice of Allowance issued in U.S. Appl. No. 11/155,368 on Nov. 8, 2011; 7 pages.
Notice of Allowance issued in U.S. Appl. No. 11/166,065 on Feb. 15, 2012; 7 pages.
Notice of Allowance issued in U.S. Appl. No. 11/640,422 on May 22, 2012; 7 pages.
Notice of Allowance issued in U.S. Appl. No. 11/640,422 on Sep. 29, 2011; 7 pages.
Notice of Allowance issued in U.S. Appl. No. 11/775,821 on Dec. 30, 2011; 5 pages.
Notice of Allowance issued in U.S. Appl. No. 11/775,821 on Sep. 21, 2011; 5 pages.
Notice of Allowance issued in U.S. Appl. No. 11/864,811 on Sep. 10, 2012; 10 pages.
Notice of Allowance issued in U.S. Appl. No. 11/864,811 on Mar. 2, 2012; 8 pages.
Notice of Allowance issued in U.S. Appl. No. 11/864,811 on Nov. 14, 2011; 8 pages.
Notice of Allowance issued in U.S. Appl. No. 12/059,971 on Jun. 28, 2012; 12 pages.
Notice of Allowance issued in U.S. Appl. No. 12/060,062 on Mar. 20, 2012; 16 pages.
Notice of Allowance issued in U.S. Appl. No. 12/060,155 on Apr. 24, 2012; 15 pages.
Notice of Allowance issued in U.S. Appl. No. 12/060,192 on Mar. 2, 2012; 18 pages.
Notice of Allowance issued in U.S. Appl. No. 12/147,378 on Aug. 31, 2012; 9 pages.
Notice of Allowance issued in U.S. Appl. No. 12/147,378 on Nov. 9, 2011; 16 pages.
Notice of Allowance issued in U.S. Appl. No. 12/323,116 on Jun. 11, 2012; 10 pages.
Notice of Allowance issued in U.S. Appl. No. 12/323,139 on Mar. 14, 2012; 10 pages.
Notice of Allowance issued in U.S. Appl. No. 12/571,140 on Mar. 20, 2012; 16 pages.
Notice of Allowance issued in U.S. Appl. No. 12/815,618 on May 10, 2012; 7 pages.
Office Action issued in related U.S. Appl. No. 11/864,863 on Dec. 22, 2011; 20 pages.
Office Action issued in related U.S. Appl. No. 12/059,860 on Jan. 23, 2012; 16 pages.
Office Action issued in related U.S. Appl. No. 12/060,054 on Dec. 7, 2011; 15 pages.
Office Action issued in related U.S. Appl. No. 12/060,155 on Oct. 31, 2011; 15 pages.
Office Action issued in related U.S. Appl. No. 12/060,171 on Mar. 1, 2012; 19 pages.
Office Action issued in U.S. Appl. No. 11/864,786 on Mar. 30, 2012; 12 pages.
Office Action issued in U.S. Appl. No. 12/059,804 on Nov. 14, 2011; 15 pages.
Office Action issued in U.S. Appl. No. 12/060,144 on Dec. 8, 2011; 18 pages.
Office Action issued in U.S. Appl. No. 12/147,414 on Oct. 26, 2011; 27 pages.
Office Action issued in U.S. Appl. No. 12/323,116 on Jan. 27, 2012; 7 pages.
Office Action issued in U.S. Appl. No. 12/571,154 on Apr. 2, 2012; 13 pages.
Office Action issued in U.S. Appl. No. 12/571,154 on Aug. 15, 2012; 15 pages.
Office Action issued in U.S. Appl. No. 12/815,618 on Dec. 22, 2011; 8 pages.
Office Action issued in U.S. Appl. No. 12/815,639 on May 24, 2012; 7 pages.
Office Action issued in U.S. Appl. No. 12/815,698 on Jan. 20, 2012; 10 pages.
Office Action issued in U.S. Appl. No. 12/815,698 on Jul. 20, 2012; 13 pages.
Office Action issued in U.S. Appl. No. 12/815,750 on Sep. 28, 2012; 66 pages.
Office Action issued in U.S. Appl. No. 12/815,802 on Jul. 20, 2012; 16 pages.
Office Action issued in U.S. Appl. No. 12/816,083 on May 9, 2012; 20 pages.
Office Action issued in U.S. Appl. No. 12/816,170 on Jul. 24, 2012; 9 pages.
Office Action issued in U.S. Appl. No. 12/816,293 on Apr. 25, 2012; 10 pages.
Office Action issued in U.S. Appl. No. 12/815,911 on Sep. 26, 2012; 14 pages.
Office Action issued in U.S. Appl. No. 13/192,543 on Aug. 28, 2012; 14 pages.
Office Action issued in U.S. Appl. No. 13/192,555 on Jul. 20, 2012; 7 pages.
Office Action issued in U.S. Appl. No. 13/349,477 on Jun. 29, 2012; 13 pages.

* cited by examiner

Fig. 25

| CCT | | Category | Obj. Class | Prop. Term | Rep. Term | Type | Type Name | Lgth. | Card. | Remarks |
|---|---|---|---|---|---|---|---|---|---|---|
| Amount 2500 | | Complex Type 2504 | | Amount 2510 | Content 2514 | xsd 2518 | decimal 2522 | 22.6 2526 | | |
| | Currency Code 2502 | Attribute 2506 | Amount 2508 | Currency 2512 | Code 2516 | xsd 2520 | token 2524 | 3 2528 | 1 2530 | Mandatory 2532 |

Fig. 26a

| CCT | | Category | Obj. Class | Prop. Term | Rep. Term | Type | Type Name | Card. | Remarks |
|---|---|---|---|---|---|---|---|---|---|
| Binary-Object 2600 | | complex Type 2612 | | Binary-Object 2634 | Content 2646 | xsd 2658 | base64 binary 2670 | | |
| | mime Code 2602 | Attribute 2614 | Binary-Object 2624 | Mime 2636 | Code 2648 | xsd 2660 | token 2672 | 0..1 2680 | Necessary when Binary Object is represented as an element value 2688 |
| | charSet Code 2604 | Attribute 2616 | Binary-Object 2626 | Character Set 2638 | Code 2650 | xsd 2662 | token 2674 | 0..1 2682 | Necessary when Binary Object is represented as an element value and comprises text data 2690 |
| | format 2606 | Attribute 2618 | Binary-Object 2628 | Format 2640 | Text 2652 | xsd 2664 | token 2675 | 0..1 2684 | Optional 2692 |

Fig. 26b

| CCT | | | Obj. Class | Prop. Term | Rep. Term | Type | Type Name | Card. | Remarks |
|---|---|---|---|---|---|---|---|---|---|
| | filename 2608 | Attribute 2620 | Binary-Object 2630 | Filename 2642 | Text 2654 | xsd 2666 | string 2676 | 0..1 2686 | Not defined in ebXML CCTS 1.8 (but is to be submitted); conforms with IETF RFC 1341 2694 |
| | URI 2610 | Attribute 2622 | Binary-Object 2632 | Uniform Resource 2644 | Identifier 2656 | xsd 2668 | anyURI 2678 | | Necessary when referencing a remote Binary Object 2696 |

Fig. 27

| CCT | | Category | Obj. Class | Prop. Term | Rep. Term | Type | Type Name | Card. | Remarks |
|---|---|---|---|---|---|---|---|---|---|
| Code 2700 | | complex Type 2712 | | Code 2734 | Content 2746 | xsd 2750 | token 2770 | | |
| | listID 2702 | Attribute 2714 | CodeList 2724 | Identification 2736 | Identifier 2748 | xsd 2760 | token 2772 | 0..1 2782 | Optional 2792 |
| | listVersion ID 2704 | Attribute 2716 | CodeList 2726 | Version 2738 | Identifier 2750 | xsd 2762 | token 2774 | 0..1 2784 | Optional 2794 |
| | listAgency ID 2706 | Attribute 2718 | CodeList Agency 2728 | Identification 2740 | Identifier 2752 | xsd 2764 | token 2776 | 0..1 2786 | Optional 2796 |
| | listAgency - SchemeID 2708 | Attribute 2720 | CodeList Agency 2730 | Scheme 2742 | Identifier 2754 | xsd 2766 | token 2778 | 0..1 2788 | Optional 2797 |
| | listAgency -Scheme AgencyID 2710 | Attribute 2722 | CodeList Agency 2732 | Scheme Agency 2744 | Identifier 2756 | xsd 2768 | token 2780 | 0..1 2790 | Optional 2798 |

Fig. 28

| CCT | Category | Prop. Term | Rep. Term | Type | Type Name |
|---|---|---|---|---|---|
| DateTime 2800 | simpleType 2802 | DateTime 2804 | Content 2806 | xsd 2808 | dateTime 2810 |

Fig. 29

| CCT | | Cat. | Obj. Class | Prop. Term | Rep. Term | Type | Type Name | Lgth. | Card. | Remarks |
|---|---|---|---|---|---|---|---|---|---|---|
| Electronic Address 2900 | | complex Type 2906 | | Electronic Address 2916 | Content 2922 | xsd 2930 | anyURI 2934 | | | |
| | protocol ID 2902 | Attribute 2908 | Electronic Address 2912 | Protocol 2918 | Identifier 2924 | xsd 2930 | token 2936 | | 0..1 2942 | Optional 2946 |
| | language Code 2904 | Attribute 2910 | Electronic Address 2914 | Language 2920 | Code 2926 | xsd 2932 | language 2938 | 2..9 2940 | 0..1 2944 | Optional 2948 |

Fig. 30a

| CCT | | Cat. | Obj. Class | Prop. Term | Rep. Term | Type | Data-type | Lgth. | Card. | Remarks |
|---|---|---|---|---|---|---|---|---|---|---|
| Identifier 3000 | | complex Type 3012 | Identifier 3024 | Identifier 3036 | Content 3048 | xsd 3060 | token 3072 | | | |
| | scheme ID 3002 | Attribute 3014 | Identification Scheme 3026 | Identification 3038 | Identifier 3050 | xsd 3062 | token 3074 | 1..60 3084 | 0..1 3090 | Optional 3095 |
| | scheme Version ID 3004 | Attribute 3016 | Identification Scheme 3028 | Version 3040 | Identifier 3052 | xsd 3064 | token 3076 | 1..15 3086 | 0..1 3091 | Optional 3096 |
| | scheme Agency ID 3006 | Attribute 3018 | Identification Scheme-Agency 3030 | Identification 3042 | Identifier 3054 | xsd 3066 | token 3078 | 1..60 3087 | 0..1 3092 | Optional 3097 |

Fig. 30b

| CCT | | Cat. | Obj. Class | Prop. Term | Rep. Term | Type | Data-type | Lgth. | Card. | Remarks |
|---|---|---|---|---|---|---|---|---|---|---|
| | scheme Agency-Scheme ID 3008 | Attribute 3020 | Identification Scheme-Agency 3032 | Scheme 3044 | Identifier 3056 | xsd 3068 | token 3080 | 1..60 3088 | 0..1 3093 | Optional 3098 |
| | scheme Agency-Scheme Agency ID 3010 | Attribute 3022 | Identification Scheme-Agency 3034 | Scheme Agency 3046 | Identifier 3058 | xsd 3070 | token 3082 | 3 3089 | 0..1 3094 | Optional 3099 |

Fig. 31

| CCT | | Cat. | Obj. Class | Type | Type Name |
|---|---|---|---|---|---|
| Indicator 3100 | Simple Type 3102 | Indicator 3104 | Content 3106 | xsd 3108 | Boolean 3110 |

Fig. 32

| CCT | | Cat. | Obj. Class | Prop. Term | Rep. Term | Data Type | Lgth. | Card. | Remarks |
|---|---|---|---|---|---|---|---|---|---|
| Measure 3200 | | Complex Type 3204 | | Measure 3210 | Content 3214 | xsd: decimal 3218 | 13.6 3222 | | |
| | Unit Code 3202 | Attribute 3206 | Quantity 3208 | Unit 3212 | Code 3216 | xsd: token 3220 | 1..3 3224 | 1 3226 | Mandatory 3228 |

Fig. 33

| CCT | Cat. | Prop. Term | Rep. Term | Data Type |
|---|---|---|---|---|
| Numeric 3300 | Complex Type 3302 | Numeric 3304 | Content 3306 | xsd: decimal 3308 |

Fig. 34

| CCT | | Cat. | Obj. Class | Prop. Term | Rep. Term | Data Type | Lgth. | Card. | Remarks |
|---|---|---|---|---|---|---|---|---|---|
| Quantity 3400 | | Complex Type 3404 | | Quantity 3410 | Content 3414 | xsd: decimal 3418 | 13.6 3422 | | |
| | Unit Code 3402 | Attribute 3406 | Quantity 3408 | Unit 3412 | Code 3416 | xsd: token 3420 | 1..3 3424 | 1 3426 | Mandatory 3428 |

Fig. 35

| CCT | | Cat. | Prop. Term | Rep. Term | Type | Type Name | Lgth. | Card. | Remarks |
|---|---|---|---|---|---|---|---|---|---|
| Text 3500 | | Complex Type 3504 | Text 3508 | Content 3512 | xsd 3516 | string 3520 | ∞ 3524 | | |
| | Language Code 3502 | Attribute 3506 | Language 3510 | Code 3514 | xsd 3518 | language 3522 | 2..9 3526 | 0..1 3528 | Optional 3530 |

Fig. 36

| GDT | Prop. | Rep./ Assn. | Type | Type Name | Lgth. | Remarks |
|---|---|---|---|---|---|---|
| Acceptance Status Code 3600 | Acceptance Status Code 3602 | Code 3604 | CCT 3606 | Code 3608 | 2 3610 | Restricted 3612 |

Fig. 37

| GDT | | Cat. | Obj. Class | Prop. | Rep./Assn | Type | Type Name | Lgth. | Card. |
|---|---|---|---|---|---|---|---|---|---|
| Accounting Object Set 3700 | | | Accounting Object Set 3706 | | Details 3712 | | | | |
| | Cost Center ID 3702 | Element 3704 | Cost Center 3708 | Identification 3710 | Identifier 3714 | CCT 3716 | Identifier 3718 | 1..32 3720 | 0..1 3722 |

Fig. 38

| GDT | Prop. | Rep./Assn | Type | Type Name | Lgth. | Remarks |
|---|---|---|---|---|---|---|
| Action Code 3802 | Action 3804 | Code 3806 | CCT 3808 | Code 3810 | 2 3812 | Restricted 3814 |

Fig. 39

| GDT | Prop. | Rep./ Assn. | Type |
|---|---|---|---|
| Active Indicator 3902 | Active Indicator 3904 | Indicator 3906 | CCT: Indicator 3908 |

Fig. 40a

| GDT | | | Cat. | Obj. Class | Prop. | Rep./ Assn. | Type | Type Name | Lgth. | Card. | Remarks |
|---|---|---|---|---|---|---|---|---|---|---|---|
| Address 4000a | | | | Address 4000b | | Details 4000c | | | | | |
| | Organisation Formatted Name 4002a | | E 4002b | Address 4002c | Organisation Formatted Name 4002d | Name 4002e | CCT 4002f | Text 4002g | ..40 4002h | 0..4 4002i | Restricted 4002j |
| | Person Name 4003a | | E 4003b | Address 4003c | Person Name 4003d | Person Name 4003e | GDT 4003f | Person Name 4003g | | 0..1 4003h | |
| | Functional Title Name 4004a | | E 4004b | Address 4004c | Functional Title Name 4004d | Name 4004e | CCT 4004f | Text 4004g | ..40 4004h | 0..1 4004i | Restricted 4004j |
| | Department Name 4005a | | E 4005b | Address 4005c | Department Name 4005d | Name 4005e | CCT 4005f | Text 4005g | ..40 4005h | 0..1 4005i | Restricted 4005j |
| | Office 4006a | | E 4006b | Address 4006c | Office 4006d | Details 4006e | | | | 0..1 4006f | |
| | | Building ID 4007a | E 4007b | Office 4007c | Building Identification 4007d | Identifier 4007e | CCT 4007f | Identifier 4007g | 1..10 4007h | 0..1 4007i | Restricted 4007j |

Fig. 40b

| | | Cat. | Obj. Class | Prop. | Rep./ Assn. | Type | Type Name | Lgth. | Card. | Remarks |
|---|---|---|---|---|---|---|---|---|---|---|
| | Floor ID 4008a | E 4008b | Office 4008c | Floor Identification 4008d | Identifier 4008e | CCT 4008f | Identifier 4008g | 1..10 4008h | 0..1 4008i | Restricted 4008j |
| | Room ID 4009a | E 4008b | Office 4008c | Room Identification 4008d | Identifier 4008e | CCT 4008f | Identifier 4008g | 1..10 4008h | 0..1 4008i | Restricted 4008j |
| | In-house Mail ID 4010a | E 4010b | Office 4010c | In-house Mail Identification 4010d | Identifier 4010d | CCT 4010e | Identifier 4010f | 1..10 4010g | 0..1 4010h | Restricted 4010i |
| | Correspon-dence Short Name 4011a | E 4011b | Office 4011c | Correspon-dence Short Name 4011d | Name 4011e | CCT 4011f | Text 4011f | ..10 4011g | 0..1 4011h | Restricted 4011i |
| Physical Address 4012a | | E 4012b | Address 4012c | Physical Address 4012d | Details 4012e | | | | 0..1 4012f | |
| | Country Code 4013a | E 4013b | Physical Address 4013c | Country Code 4013d | Code 4013e | GDT 4013f | Country Code 4013g | | 0..1 4013h | |
| | Region Code 4014a | E 4014b | Physical Address 4014c | Region Code 4014d | Code 4014e | GDT 4014f | Region Code 4014g | | 0..1 4014h | |

Fig. 40c

| | | Cat. | Obj. Class | Prop. | Rep./ Assn. | Type | Type Name | Lgth. | Card. | Remarks |
|---|---|---|---|---|---|---|---|---|---|---|
| | Street Postal Code 4015a | E 4014b | Physical Address 4015c | Street Zip Code 4015d | Code 4015e | CCT 4015f | Code 4015g | 1..10 4015h | 0..1 4015i | Restricted 4015j |
| | PO Box Postal Code 4016a | E 4016b | Physical Address 4016c | PO Box Zip Code 4016d | Code 4016e | CCT 4016f | Code 4016g | 1..10 4016h | 0..1 4016i | Restricted 4016j |

Fig. 40d

| | | Cat. | Obj. Class | Prop. | Rep./ Assn. | Type | Type Name | Lgth. | Card. | Remarks |
|---|---|---|---|---|---|---|---|---|---|---|
| | Company Postal Code 4017a | E 4017b | Physical Address 4017c | Company Zip Code 4017d | Code 4017e | CCT 4017f | Code 4017g | 1..10 4017h | 0..1 4017i | Restricted 4017j |
| | City Name 4018a | E 4018b | Physical Address 4018c | City Name 4018d | Name 4018e | CCT 4018f | Text 4018g | ..40 4018h | 0..1 4018i | Restricted 4018j |
| | Additional City Name 4019a | E 4019b | Physical Address 4019c | Additional City Name 4019d | Name 4019e | CCT 4019f | Text 4019g | ..40 4019h | 0..1 4019i | Restricted 4019j |
| | District Name 4020a | E 4020b | Physical Address 4020c | District Name 4020d | Name 4020e | CCT 4020f | Text 4020g | ..40 4020h | 0..1 4020i | Restricted 4020j |
| | PO Box ID 4021a | E 4021b | Physical Address 4021c | PO Box Identification 4021d | Identifier 4021e | CCT 4021f | Identifier 4021g | 1..10 4021h | 0..1 4021i | Restricted 4021j |
| | PO Box Indicator 4022a | E 4022b | Physical Address 4022c | PO Box Indicator 4022d | Indicator 4022e | CCT 4022f | Indicator 4022g | | 0..1 4022h | |

Fig. 40e

| | | Cat. | Obj. Class | Prop. | Rep./ Assn. | Type | Type Name | Lgth. | Card. | Remarks |
|---|---|---|---|---|---|---|---|---|---|---|
| | PO Box Country Code 4023a | E 4023b | Physical Address 4023c | PO Box Country Code 4023d | Code 4023e | GDT 4023f | Country Code 4023g | | 0..1 4023h | |
| | PO Box Region Code 4024a | E 4024b | Physical Address 4024c | PO Box Region Code 4024d | Code 4024e | GDT 4024f | Region Code 4024g | | 0..1 4024h | |
| | PO Box City Name 4025a | E 4025b | Physical Address 4025c | PO Box City Name 4025d | Name 4025e | CCT 4025f | Text 4025g | ..40 4025h | 0..1 4025i | Restricted 4025j |
| | Street Name 4026a | E 4026b | Physical Address 4026c | Street Name 4026d | Name 4026e | CCT 4026f | Text 4026g | ..60 4026h | 0..1 4026i | Restricted 4026j |
| | Street Prefix Name 4027a | E 4027b | Physical Address 4027c | Street Prefix Name 4027d | Name 4027e | CCT 4027f | Text 4027g | ..40 4027h | 0..2 4027i | Restricted 4027j |
| | Street Suffix Name 4028a | E 4028b | Physical Address 4028c | Street Suffix Name 4028d | Name 4028e | CCT 4028f | Text 4028g | ..40 4028h | 0..2 4028i | Restricted 4027j |

Fig. 40f

| | | Cat. | Obj. Class | Prop. | Rep./ Assn. | Type | Type Name | Lgth. | Card. | Remarks |
|---|---|---|---|---|---|---|---|---|---|---|
| | House ID 4029a | E 4029b | Physical Address 4029c | House Identification 4029d | Identifier 4029e | CCT 4029f | Identifier 4029g | 1..10 4029h | 0..1 4029i | Restricted 4029j |
| | Additional House ID 4030a | E 4030b | Physical Address 4030c | Additional House Identification 4030d | Identifier 4030e | CCT 4030f | Identifier 4030g | 1..10 4030h | 0..1 4030i | Restricted 4030j |
| | Building ID 4031a | E 4031b | Physical Address 4031c | Building Identification 4031d | Identifier 4031e | CCT 4031f | Identifier 4031g | 1..20 4031h | 0..1 4031i | Restricted 4031j |
| | Floor ID 4032a | E 4032b | Physical Address 4032c | Floor Identification 4032d | Identifier 4032e | CCT 4032f | Identifier 4032g | 1..10 4032h | 0..1 4032i | Restricted 4032j |
| | Room ID 4033a | E 4033b | Physical Address 4033c | Room Identification 4033d | Identifier 4033e | CCT 4033f | Identifier 4033g | 1..10 4033h | 0..1 4033i | Restricted 4033j |
| | Care Of Name 4034a | E 4034b | Physical Address 4034c | Care Of Name 4034d | Name 4034e | CCT 4034f | Text 4034g | ..40 4034h | 0..1 4034i | Restricted 4034j |

Fig. 40g

| | | Cat. | Obj. Class | Prop. | Rep./ Assn. | Type | Type Name | Lgth. | Card. | Remarks |
|---|---|---|---|---|---|---|---|---|---|---|
| | Description 4035a | E 4035b | Physical Address 4035c | Description 4035d | Text 4035e | GDT 4035f | Description 4035g | | 0.. un bounded 4035h | |
| Tax Jurisdiction Code 4036a | | E 4036b | Address 4036c | Tax Jurisdiction Code 4036d | Code 4036e | GDT 4036f | Tax-Juris-diction Code 4036g | | 0..1 4036h | |

Fig. 40h

| | | | Cat. | Obj. Class | Prop. | Rep./ Assn. | Type | Type Name | Card. |
|---|---|---|---|---|---|---|---|---|---|
| Time Zone Difference Value 4037a | | | E 4037b | Address 4037c | Time Zone Difference Value 4037d | Value 4037e | GDT 4037f | Time Zone Difference Value 4037g | 0..1 4037h |
| Geo Coor-dinates 4038a | | | E 4038b | Address 4038c | Geo Coordinates 4038d | Geo Coordinates 4038e | GDT 4038f | Geo Coordinates 4038g | 0..1 4038h |
| Communi-cation 4039a | | | E 4039b | Address 4039c | Communication 4039d | Details 4030e | | | 0..1 4039f |
| | Corres-pondence Language Code 4040a | | E 4040b | Commu-nication 4040c | Corres-pondence Language Code 4040d | Code 4040e | GDT 4040f | Language Code 4040g | 0..1 4040h |
| | Telephone 4041a | | E 4041b | Communi-cation 4041c | Telephone 4041d | Details 4041e | | | 0..un-bounded 4041f |
| | | Number 4042a | E 4042b | Telephone 4042c | Phone Number 4042d | Phone Number 4042e | GDT 4042f | Phone Number 4042g | 1 4042h |
| | | Number Default Indicator 4043a | E 4043b | Telephone 4043c | Number Default Indicator 4043d | Indicator 4043e | CCT 4043f | Indicator 4043g | 1 4043h |

Fig. 40i

| | | | Cat. | Obj. Class | Prop. | Rep./ Assn. | Type | Type Name | Card. |
|---|---|---|---|---|---|---|---|---|---|
| | | Number Description 4044a | E 4044b | Telephone 4044c | Number Description 4044d | Text 4044e | GDT 4044f | Description 4044g | 0.. un-bounded 4044h |
| | | Number Usage Denial Indicator 4045a | E 4045b | Telephone 4045c | Number Usage Denial Indicator 4045d | Indicator 4045e | CCT 4045f | Indicator 4045g | 1 4045h |
| | Mobile Phone 4046a | | E 4046b | Communi-cation 4046c | Mobile Phone 4046d | Details 4046e | | | 0.. un-bounded 4046f |
| | | Number 4047a | E 4047b | Mobile phone 4047c | Phone Number 4047d | Phone Number 4047e | GDT 4047f | Phone Number 4047g | 1 4047h |
| | | Number Default Indicator 4048a | E 4048b | Mobile phone 4048c | Number Default Indicator 4048d | Indicator 4048e | CCT 4048f | Indicator 4048g | 1 4048h |
| | | Number Description 4049a | E 4049b | Mobile phone 4049c | Number Description 4049d | Text 4049e | GDT 4049f | Description 4049g | 0.. un-bounded 4049h |

Fig. 40j

| | | | Cat. | Obj. Class | Prop. | Rep./ Assn. | Type | Type Name | Card. |
|---|---|---|---|---|---|---|---|---|---|
| | | Number Usage Denial Indicator 4050a | E 4050b | Mobile phone 4050c | Number Usage Denial Indicator 4050d | Indicator 4050e | CCT 4050f | Indicator 4050g | 1 4050h |
| | Facsimile 4051a | | E 4051b | Communi- cation 4051c | Facsimile 4051d | Details 4051e | | | 0.. un- bounded 4051f |
| | | Number 4052a | E 4052b | Facsimile 4052c | Phone Number 4052d | Phone Number 4052e | GDT 4052f | Phone Number 4052g | 1 4052h |

Fig. 40k

| | | Cat. | Obj. Class | Prop. | Rep./ Assn. | Type | Type Name | Card. | Re-marks |
|---|---|---|---|---|---|---|---|---|---|
| | Number Default Indicator 4053a | E 4053b | Facsimile 4053c | Number Default Indicator 4053d | Indicator 4053e | CCT 4053f | Indicator 4053g | 1 4053h | |
| | Number Description 4054a | E 4054b | Facsimile 4054c | Number Description 4054d | Text 4054e | GDT 4054f | Description 4054g | 0.. un-bounded 4054h | |
| | Number Usage Denial Indicator 4055a | E 4055b | Facsimile 4055c | Number Usage Denial Indicator 4055d | Indicator 4055e | CCT 4055f | Indicator 4055g | 1 4055h | |
| Email 4056a | | E 4056b | Communi-cation 4056c | Email 4056d | Details 4056e | | | 0.. un-bounded 4056f | |
| | Address 4057a | E 4057b | Email 4057c | Email Address 4057d | Email Address 4057e | GDT 4057f | Email Address 4057g | 1 4057g | |
| | Address Default Indicator 4058a | E 4058b | Email 4058c | Email Address Default-Indicator 4058d | Indicator 4058e | CCT 4058f | Indicator 4058g | 1 4058h | |
| | Address Description 4059a | E 4059b | Email 4059c | Email Address Description 4059d | Text 4059e | GDT 4059f | Description 4059g | 0.. un-bounded 4059h | |

Fig. 40I

| | | Cat. | Obj. Class | Prop. | Rep./ Assn. | Type | Type Name | Card. | Remarks |
|---|---|---|---|---|---|---|---|---|---|
| | Address Usage Denial Indicator 4060a | E 4060b | Email 4060c | Email Address Usage Denial Indicator 4060d | Indicator 4060e | CCT 4060f | Indicator 4060g | 1 4060g | |

Fig. 40m

| | | Cat. | Obj. Class | Prop. | Rep./ Assn. | Type | Type Name | Card. |
|---|---|---|---|---|---|---|---|---|
| Web 4061a | | E 4061b | Communication 4061c | Web 4061d | Details 4061e | | | 0.. un-bounded 4061f |
| | Address 4062a | E 4062b | Web 4062c | Web Address 4062d | Address 4062e | GDT 4062f | Web Address 4062g | 1 4062h |
| | Address Default Indicator 4063a | E 4063b | Web 4063c | Address Default Indicator 4063d | Indicator 4063e | CCT 4063f | Indicator 4063g | 1 4063h |
| | Address Description 4064a | E 4064b | Web 4064c | Address Description 4064d | Text 4064e | GDT 4064f | Description 4064g | 0.. un-bounded 4064h |

Fig. 41

| GDT | | Cat. | Obj. Class | Prop. | Rep./ Assn. | Type | Type Name | Lgth. | Card. | Remarks |
|---|---|---|---|---|---|---|---|---|---|---|
| Adjustment Reason Code 4100 | | | | Adjustment Reason 4114 | Code 4122 | CCT 4130 | Code 4138 | 0..35 4146 | | Restricted 4156 |
| | List ID 4102 | Attribute 4108 | | Identification 4116 | Identifier 4124 | xsd 4132 | token 4140 | 1..60 4148 | 0..1 4152 | |
| | List Version ID 4104 | Attribute 4110 | | Version 4118 | Identifier 4126 | xsd 4134 | token 4142 | 1..15 4150 | 0..1 4154 | |
| | List Agency ID 4106 | Attribute 4112 | | Identification 4120 | Identifier 4128 | xsd 4136 | token 4144 | 1..60 4152 | 0..1 4158 | |

Fig. 42

| GDT | Prop. | Rep./ Assn. | Type | Type Name |
|---|---|---|---|---|
| Allowed Indicator 4200 | Allowed 4202 | Indicator 4204 | CCT 4206 | Indicator 4208 |

Fig. 43

| GDT | Prop. | Rep./ Assn. | Type | Type Name |
|---|---|---|---|---|
| Amount 4300 | Amount 4302 | Amount 4304 | CCT 4306 | Amount 4308 |

Fig. 44

| GDT | Prop. | Rep./ Assn. | Type | Type Name |
|---|---|---|---|---|
| Amount Balance Indicator 4400 | Amount Balance 4402 | Indicator 4404 | CCT 4406 | Indicator 4408 |

Fig. 45

| GDT | Obj. Class | Prop. | Rep./ Assn. | Type | Type Name | Lgth. |
|---|---|---|---|---|---|---|
| Aspect ID 4500 | Aspect 4502 | Identification 4504 | Identifier 4506 | CCT 4508 | Identifier 4510 | 1..40 4512 |

Fig. 46

| CCT | | Cat. | Obj. Class | Prop. | Rep/ Assn. | Type | Type Name | Lgth. | Card. | Remarks |
|---|---|---|---|---|---|---|---|---|---|---|
| Attach-ment 4600 | | | | Attachment 4602 | Binary Object 4604 | xsd 4606 | normalized String 4608 | | | Title 4610 |
| | Id 4612 | A 4614 | Attachment 4616 | Identification 4618 | Identifier 4620 | xsd 4622 | string 4624 | 1..35 4626 | 1 4628 | Must be unique as used for references using the manifest 4630 |
| | Filename 4632 | A 4634 | Attachment 4636 | Filename 4638 | Text 4640 | xsd 4642 | String 4644 | ..70 4646 | 0..1 4648 | |

Fig. 47

| CDT | Obj. Class Qual. | Obj. Class | Prop. | Rep./ Assn. | Type | Type Name |
|---|---|---|---|---|---|---|
| Attachment Web Address 4700 | Attachment 4702 | Web Address 4704 | Address 4706 | Electronic Address 4708 | GDT 4710 | Web Address 4712 |

Fig. 48

| GDT | Cat. | Obj. Class | Prop. Term | Rep. Term | Type | Data Type | Lgth. |
|---|---|---|---|---|---|---|---|
| Batch ID 4800 | Complex Type 4802 | Batch 4804 | Identification 4806 | Identifier 4808 | CCT 4810 | Identifier 4812 | 1..10 4814 |
| | Attribute 4818 | Identification Scheme 4820 | Identification 4822 | Identifier 4824 | xsd 4826 | token 4828 | |
| | Attribute 4836 | Identification Scheme 4838 | Version 4840 | Identifier 4842 | xsd 4844 | token 4846 | |
| | Attribute 4854 | Identification Scheme Agency 4856 | Identification 4858 | Identifier 4860 | xsd 4862 | token 4864 | |
| | Attribute 4872 | Identification Scheme Agency 4874 | Scheme 4876 | Identifier 4878 | xsd 4880 | token 4882 | |
| | Attribute 4890 | Identification Scheme Agency 4892 | Scheme Agency 4894 | Identifier 4896 | xsd 4898 | token 4899 | |

Fig. 49

| GDT | Obj. Class | Prop. | Rep./ Assn. | Type | Type Name | Lgth. |
|---|---|---|---|---|---|---|
| Bidding Condition Code 4900 | Bidding 4902 | Condition 4904 | Code 4906 | CCT 4908 | Code 4910 | 2 4912 |

Fig. 50a

| GDT | | Cat. | Obj. Class | Prop. | Rep./ Assn. | Type | Type Name | Lgth. | Card. |
|---|---|---|---|---|---|---|---|---|---|
| Business Document Message Header 5000 | | | Business Document Message 5002 | Header 5004 | Details 5006 | GDT 5008 | | | |
| | ID 5010 | E 5012 | Business Document Message 5014 | Identification 5016 | Identifier 5018 | GDT 5020 | Business Document Message ID 5022 | 1..35 5024 | 1..1 5026 |
| | Refer-ence ID 5028 | E 5030 | Business Document Message 5032 | Reference Identification 5034 | Identifier 5036 | GDT 5038 | Business Document Message ID 5040 | 1..35 5042 | 0..1 5044 |

Fig. 50b

| GDT | | Cat. | Obj. Class | Prop. | Rep./ Assn. | Type | Type Name | Lgth. | Card. |
|---|---|---|---|---|---|---|---|---|---|
| | Creation Date Time 5046 | E 5048 | Business Document Message 5050 | Creation Date Time 5052 | Date Time 5054 | GDT 5056 | Date Time 5058 | | 1..1 5060 |
| | Sender Party 5062 | E 5064 | Business Document Message 5066 | Sender 5068 | Party 5070 | GDT 5072 | Business Document Message Header Party 5074 | | 0..1 5076 |
| | Recipient Party 5078 | E 5080 | Business Document Message 5082 | Recipient 5084 | Party 5086 | GDT 5088 | Business Document Message Header Party 5090 | | 0..n 5092 |

Fig. 51a

| GDT | | Cat. | Obj. Class | Prop. | Rep./ Assn. | Type | Type Name | Lgth. | Card. |
|---|---|---|---|---|---|---|---|---|---|
| Business Document Message Header Party 5100 | | | Business Document Message Header Party 5102 | Details 5104 | | | | | |
| | Internal ID 5106 | E 5108 | Business Document Message Header Party 5110 | Internal Identification 5112 | Identifier 5114 | GDT 5116 | Party Internal ID 5118 | | 0..1 5120 |
| | Standard ID 5122 | E 5124 | Business Document Message Header Party 5126 | Standard Identification 5128 | Identifier 5130 | GDT 5132 | Party Standard ID 5134 | | 0..n 5136 |

Fig. 51b

| GDT | | Cat. | Obj. Class | Prop. | Rep./ Assn. | Type | Type Name | Lgth. | Card. |
|---|---|---|---|---|---|---|---|---|---|
| | Contact Person 5138 | E 5140 | Business Document Message Header Party 5142 | Contact Person 5144 | Contact Person 5146 | GDT 5148 | Contact Person 5152 | | 0..1 5152 |

Fig. 52a

| GDT | | Cat. | Obj. Class | Prop. Term | Rep. Term | Type | Type Name | Lgth. | Card. |
|---|---|---|---|---|---|---|---|---|---|
| Business Document Message ID 5200 | | Complex Type 5202 | Business Document Message 5204 | Identification 5206 | Identifier 5208 | CCT 5210 | Identifier 5212 | 1..35 5214 | Restricted 5216 |
| | Scheme ID 5218 | Attribute 5220 | Identification Scheme 5222 | Identification 5224 | Identifier 5226 | xsd 5228 | token 5230 | 1..60 5232 | 0..1 5234 |

Fig. 52b

| GDT | | Cat. | Obj. Class | Prop. Term | Rep. Term | Type | Type Name | Lgth. | Card. |
|---|---|---|---|---|---|---|---|---|---|
| | Scheme Agency ID 5236 | Attribute 5238 | Identification Scheme Agency 5240 | Identification 5242 | Identifier 5244 | xsd 5246 | token 5248 | 1..60 5250 | 0..1 5252 |
| | Scheme Agency Scheme Agency ID 5254 | Attribute 5256 | Identification Scheme Agency 5258 | Scheme Agency 5260 | Identifier 5262 | xsd 5264 | token 5266 | 3 5268 | 0..1 5270 |

Fig. 53

| GDT | Obj. Class | Prop. | Rep./ Assn. | Type | Type Name |
|---|---|---|---|---|---|
| Business Transaction Blocked Indicator 5300 | Business Transaction 5302 | Blocked Indicator 5304 | Indicator 5306 | CCT 5308 | Indicator 5310 |

Fig. 54

| GDT | | Prop. | Rep./ Assn. | Type | Type Name |
|---|---|---|---|---|---|
| Completed Indicator 5400 | | Completed Indicator 5402 | Indicator 5404 | CCT 5406 | Indicator 5408 |

Fig. 55

| GDT | | Obj. Class | Prop. | Rep./ Assn. | Type Name | Lgth. | Remarks |
|---|---|---|---|---|---|---|---|
| Business Transaction-Document Group ID 5500 | Business Transaction Document 5502 | Group Identification 5504 | Identifier 5506 | CCT 5508 | Identifier 5510 | 1..10 5512 | Restricted 5514 |

Fig. 56a

| GDT | | Cat. | Obj. Class | Prop. | Rep./ Assn. | Type | Type Name | Lgth. | Card. | Remarks |
|---|---|---|---|---|---|---|---|---|---|---|
| Business Transaction Document ID 5600 | | | Business Transaction Document 5602 | Identifi-cation 5604 | Identifier 5606 | CCT 5608 | Identifier 5610 | 1..35 5612 | | Restricted 5614 |
| | Scheme ID 5616 | A 5618 | Identifi-cation Scheme 5620 | Identifi-cation 5622 | Identifier 5624 | xsd 5626 | token 5628 | 1..60 5630 | 0..1 5632 | |
| | Scheme Agency ID 5634 | A 5636 | Identifi-cation Scheme Agency 5638 | Identifi-cation 5640 | Identifier 5642 | xsd 5644 | token 5646 | 1..60 5648 | 0..1 5650 | |
| | Scheme Agency Scheme ID 5652 | A 5654 | Identifi-cation Scheme Agency 5656 | Scheme 5658 | Identifier 5660 | xsd 5662 | token 5664 | 1..60 5666 | 0..1 5668 | |

Fig. 56b

| GDT | | Cat. | Obj. Class | Prop. | Rep./ Assn. | Type | Type Name | Lgth. | Card. | Remarks |
|---|---|---|---|---|---|---|---|---|---|---|
| | Scheme Agency Scheme Agency ID 5670 | A 5672 | Identifi-cation Scheme Agency 5674 | Scheme Agency 5676 | Identifier 5678 | xsd 5680 | token 5682 | 3 5684 | 0..1 5686 | |

Fig. 57

| GDT | Obj. Class | Prop. | Rep./ Assn. | Type | Type Name | Lgth. | Remarks |
|---|---|---|---|---|---|---|---|
| Business Transaction Document Item Group ID 5700 | Business-Transaction Document Item 5702 | Group Identification 5704 | Identifier 5706 | CCT 5708 | Identifier 5710 | 3 5712 | Restricted 5714 |

Fig. 58

| CDT | Obj. Class Qual. | Obj. Class | Prop. | Rep./ Assn. | Type | Type Name | Lgth. | Remarks |
|---|---|---|---|---|---|---|---|---|
| Business Transaction Document Item Hierarchy Relationship Type Code 5800 | Business Transaction Document Item Hierarchy 5802 | Relationship 5804 | Type Code 5806 | Code 5808 | GDT 5810 | Relationship Type Code 5812 | 3 5814 | Restricted 5816 |

Fig. 59

| GDT | Obj. Class | Prop. | Rep./ Assn. | Type | Type Name | Lgth. | Remarks |
|---|---|---|---|---|---|---|---|
| Business Transaction Document Item ID 5900 | Business-Transaction Document Item 5902 | Identification 5904 | Identifier 5906 | CCT 5908 | Identifier 5910 | 1..10 5912 | Restricted 5914 |

Fig. 60

| GDT | Obj. Class | Prop. | Rep./ Assn. | Type | Type Name | Lgth. | Remarks |
|---|---|---|---|---|---|---|---|
| Business Transaction Document Item Schedule Line ID 6000 | Business Transaction Document Item Schedule Line 6002 | Identification 6004 | Identifier 6006 | CCT 6008 | Identifier 6010 | 1..4 6012 | Restricted 6014 |

Fig. 61

| GDT | Obj. Class | Prop. | Rep./ Assn. | Type | Type Name |
|---|---|---|---|---|---|
| Third Party Indicator 6100 | Business Transaction Document Item 6102 | Third Party Deal Indicator 6104 | Indicator 6106 | CCT 6108 | Indicator 6110 |

Fig. 62

| GDT | Obj. Class | Prop. | Rep./ Assn. | Type | Type Name | Lgth. | Remarks |
|---|---|---|---|---|---|---|---|
| Business Transaction Document Item Type Code 6200 | Business Transaction Document Item 6202 | Type 6204 | Code 6206 | CCT 6208 | Code 6210 | ..3 6212 | Restricted 6214 |

Fig. 63a

| CDT | | Cat. | Obj. Class | Prop. Qualifier | Prop. | Rep./ Assn. | Type | Type Name | Card. |
|---|---|---|---|---|---|---|---|---|---|
| Business Transaction -Document Location 6300 | | | Business Transaction Document Location 6302 | | | Details 6304 | | | |
| | Internal ID 6306 | E 6308 | Business Transaction Document Location 6310 | Internal 6312 | Identification 6314 | Identifier 6316 | CDT 6318 | Location Internal ID 6320 | 0..1 6322 |
| | Standard ID 6324 | E 6326 | Business Transaction Document Location 6328 | Standard 6330 | Identification 6332 | Identifier 6334 | CDT 6336 | Location Standard ID 6338 | 0..n 6340 |

Fig. 63b

| CDT | | Cat. | Obj. Class | Prop. Qualifier | Prop. | Rep./ Assn. | Type | Type Name | Card. |
|---|---|---|---|---|---|---|---|---|---|
| | Buyer ID 6342 | E 6344 | Business Transaction Document Location 6346 | Buyer 6348 | Identification 6350 | Identifier 6352 | CDT 6354 | Location Party ID 6356 | 0..1 6358 |
| | Seller ID 6360 | E 6364 | Business Transaction Document Location 6364 | Seller 6366 | Identification 6368 | Identifier 6370 | CDT 6372 | Location Party ID 6374 | 0..1 6376 |
| | Product Recipient ID 6378 | E 6380 | Business Transaction Document Location 6390 | Product Recipient 6392 | Identification 6394 | Identifier 6396 | CDT 6398 | Location Party ID 6399 | 0..1 6301A |
| | Vendor ID 6302A | E 6303A | Business Transaction Document Location 6304A | Vendor 6305A | Identification 6306A | Identifier 6307A | CDT 6308A | Location Party ID 6309A | 0..1 6310A |
| | Bill To ID 6311A | E 6312A | Business Transaction -Document Location 6313A | Bill To 6314A | Identification 6315A | Identifier 6316A | CDT 6317A | Location Party ID 6318A | 0..1 6319A |

Fig. 63c

| CDT | | Cat. | Obj. Class | Prop. Qualifier | Prop. | Rep./ Assn. | Type | Type Name | Card. |
|---|---|---|---|---|---|---|---|---|---|
| | Bill From ID 6320A | E 6321A | Business Transaction Document Location 6322A | Bill From 6323A | Identification 6324A | Identifier 6325A | CDT 6326A | Location Party ID 6327A | 0..1 6328A |
| | Bidder ID 6329A | E 6330A | Business Transaction Document Location 6331A | Bidder 6332A | Identification 6333A | Identifier 6334A | CDT 6335A | Location Party ID 6336A | 0..1 6337A |
| | Address 6338A | E 6339A | Business Transaction Document Location 6340A | | Address 6340A | Address 6341A | GDT 6342A | Address 6343A | 0..1 6344A |
| | Note 6345A | E 6346A | Business Transaction Document Location 6347A | | Note 6348A | Text 6349A | GDT 6350A | Note 6351A | 0..1 6352A |

Fig. 64a

| CDT | | Cat. | Obj. Class | Prop. Qualifier | Prop. | Rep./ Assn. | Type | Type Name | Card. |
|---|---|---|---|---|---|---|---|---|---|
| Business Transaction Document Party 6400 | | | Business Transaction Document Party 6402 | | | Details 6404 | | | |
| | Internal ID 6406 | E 6408 | Business Transaction Document Party 6410 | Internal 6412 | Identification 6414 | Identifier 6416 | CDT 6418 | Party Internal ID 6420 | 0..1 6422 |
| | Standard ID 6424 | E 6426 | Business Transaction Document Party 6428 | Standard 6430 | Identification 6432 | Identifier 6434 | CDT 6436 | Party Standard ID 6438 | 0..n 6440 |
| | Buyer ID 6442 | E 6444 | Business Transaction Document Party 6446 | Buyer 6448 | Identification 6450 | Identifier 6452 | CDT 6454 | Party Party ID 6456 | 0..1 6458 |

Fig. 64b

| CDT | | Cat. | Obj. Class | Prop. Qualifier | Prop. | Rep./ Assn. | Type | Type Name | Card. |
|---|---|---|---|---|---|---|---|---|---|
| | Seller ID 6460 | E 6462 | Business Transaction Document Party 6464 | Seller 6466 | Identification 6468 | Identifier 6470 | CDT 6472 | Party Party ID 6474 | 0..1 6476 |
| | Product Recipient ID 6478 | E 6480 | Business Transaction Document Party 6482 | Product Recipient 6484 | Identification 6486 | Identifier 6488 | CDT 6490 | Party Party ID 6492 | 0..1 6494 |
| | Vendor ID 6496 | E 6498 | Business Transaction Document Party 6499 | Vendor 6401A | Identification 6402A | Identifier 6403A | CDT 6404A | Party Party ID 6405A | 0..1 6406A |
| | Bill To ID 6407A | E 6408A | Business Transaction Document Party 6409A | Bill To 6410A | Identification 6411A | Identifier 6412A | CDT 6413A | Party Party ID 6414A | 0..1 6415A |
| | Bill From ID 6416A | E 6417A | Business Transaction Document Party 6418A | Bill From 6419A | Identification 6420A | Identifier 6421A | CDT 6422A | Party Party ID 6423A | 0..1 6424A |

Fig. 64c

| CDT | | Cat. | Obj. Class | Prop. Qualifier | Prop. | Rep./ Assn. | Type | Type Name | Card. |
|---|---|---|---|---|---|---|---|---|---|
| | Bidder ID 6425A | E 6426A | Business Transaction Document Party 6427A | Bidder 6428A | Identification 6429A | Identifier 6430A | CDT 6431A | Party Party ID 6432A | 0..1 6433A |
| | Address 6434A | E 6435A | Business Transaction Document Party 6436A | | Address 6437A | Address 6438A | AGDT 6440A | Address 6441A | 0..1 6442A |
| | Contact Person 6443A | E 6444A | Business Transaction Document Party 6445A | | Contact Person 6446A | Contact Person 6447A | CDT 6448A | Contact Person 6449A | 0..1 6450A |

Fig. 65

| GDT | Obj. Class | Prop. | Rep./ Assn. | Type | Type Name |
|---|---|---|---|---|---|
| Business Transaction Document-Pricing Indicator 6500 | Business Transaction Document 6502 | Pricing Indicator 6504 | Indicator 6506 | CCT 6508 | Indicator 6510 |

Fig. 66a

| CDT | | Cat. | Obj. Class | Prop. Qualifier | Prop. | Rep./ Assn. | Type | Type Name | Card. |
|---|---|---|---|---|---|---|---|---|---|
| Business Transaction Document Product 6600 | | | Business Transaction Document Product 6602 | | | Details 6604 | | | |
| | Internal ID 6606 | E 6608 | Business Transaction Document Product 6610 | Internal 6612 | Identification 6614 | Identifier 6616 | CDT 6618 | Product Internal ID 6620 | 0..1 6622 |
| | Standard ID 6624 | E 6626 | Business Transaction Document Product 6628 | Standard 6630 | Identification 6632 | Identifier 6634 | CDT 6636 | Product Standard ID 6638 | 0..n 6640 |
| | Buyer ID 6642 | E 6644 | Business Transaction Document Product 6646 | Buyer 6648 | Identification 6650 | Identifier 6652 | CDT 6654 | Product Party ID 6656 | 0..1 6658 |
| | Seller ID 6660 | E 6662 | Business Transaction Document Product 6664 | Seller 6666 | Identification 6668 | Identifier 6670 | CDT 6672 | Product Party ID 6674 | 0..1 6676 |

Fig. 66b

| CDT | | Cat. | Obj. Class | Prop. Qualifier | Prop. | Rep./ Assn. | Type | Type Name | Card. |
|---|---|---|---|---|---|---|---|---|---|
| | Product Recipient ID 6678 | E 6680 | Business Transaction Document Product 6682 | Product Recipient 6684 | Identification 6686 | Identifier 6688 | CDT 6690 | Product Party ID 6692 | 0..1 6694 |
| | Vendor ID 6696 | E 6698 | Business Transaction Document Product 6699 | Vendor 6601A | Identification 6602A | Identifier 6603A | CDT 6604A | Product Party ID 6605A | 0..1 6606A |
| | Manufacturer ID 6607A | E 6608A | Business Transaction Document Product 6609A | Manu-facturer 6610A | Identification 6611A | Identifier 6612A | CDT 6613A | Product Party ID 6614A | 0..1 6615A |
| | Bill To ID 6616A | E 6617A | Business Transaction Document Product 6618A | Bill To 6619A | Identification 6620A | Identifier 6621A | CDT 6622A | Product Party ID 6623A | 0..1 6624A |
| | Bill From ID 6625A | E 6626A | Business Transaction Document Product 6627A | Bill From 6628A | Identification 6629A | Identifier 6630A | CDT 6631A | Product Party ID 6632A | 0..1 6633A |

Fig. 66c

| CDT | | Cat. | Obj. Class | Prop. Qualifier | Prop. | Rep./ Assn. | Type | Type Name | Card. |
|---|---|---|---|---|---|---|---|---|---|
| | Bidder ID 6634A | E 6635A | Business Transaction Document Product 6636A | Bidder 6637A | Identification 6638A | Identifier 6639A | CDT 6640A | Product Party ID 6641A | 0..1 6642A |
| | Type Code 6643A | E 6644A | Business Transaction Document Product 6645A | | Type Code 6646A | Code 6647A | GDT 6648A | Product Type Code 6649A | 0..1 6650A |
| | Note 6651A | E 6652A | Business Transaction Document Product 6653A | | Note 6654A | Note 6655A | GDT 6656A | Note 6657A | 0..1 6658A |
| Flat include of movement data | Change ID 6659A | E 6660A | Business Transaction Document Product 6661A | | Change Identification 6662A | Identifier 6663A | GDT 6664A | Product Change ID 6667A | 0..1 6666A |
| | Discontinuation Indicator 6666A | E 6667A | Business Transaction Document Product 6668A | | Discontinuation 6669A | Indicator 6670A | GDT 6671A | Product Discon-tinuation Indicator 6672A | 0..1 6673A |

Fig. 66d

| CDT | | Cat. | Obj. Class | Prop. Qualifier | Prop. | Rep./ Assn. | Type | Type Name | Card. |
|---|---|---|---|---|---|---|---|---|---|
| | Package Quantity 6674A | E 6675A | Business Transaction Document Product 6676A | Package 6677A | Quantity 6678A | Quantity 6679A | GDT 6680A | Quantity 6681A | 0..1 6682A |

Fig. 67a

| CDT | | Cat. | Obj. Class | Prop. Qualifier | Prop. | Rep./ Assn. | Type | Type Name | Card. |
|---|---|---|---|---|---|---|---|---|---|
| Business Transaction Document Product Cat. 6700 | | | Business Transaction Document Product Cat. 6702 | | | Details 6704 | | | |
| | Internal ID 6706 | E 6708 | Business Transaction Document Product Cat. 6710 | Internal 6712 | Identification 6714 | Identifier 6716 | CDT 6718 | Product Cat. Internal ID 6720 | 0..1 6722 |
| | Standard ID 6724 | E 6726 | Business Transaction Document Product Cat. 6728 | Standard 6730 | Identification 6732 | Identifier 6734 | CDT 6736 | Product Cat. Standard ID 6738 | 0..n 6740 |

Fig. 67b

| CDT | | Cat. | Obj. Class | Prop. Qualifier | Prop. | Rep./ Assn. | Type | Type Name | Card. |
|---|---|---|---|---|---|---|---|---|---|
| | Buyer ID 6742 | E 6744 | Business Transaction Document Product Cat. 6746 | Buyer 6748 | Identification 6750 | Identifier 6752 | CDT 6754 | Product Cat. Party ID 6756 | 0..1 6758 |
| | Seller ID 6760 | E 6762 | Business Transaction Document Product Cat. 6764 | Seller 6768 | Identification 6768 | Identifier 6770 | CDT 6772 | Product Cat. Party ID 6774 | 0..1 6776 |
| | Product Recipient ID 6778 | E 6780 | Business Transaction Document Product 6782 | Product Recipient 6784 | Identification 6786 | Identifier 6788 | CDT 6790 | Product Cat. Party ID 6792 | 0..1 6794 |
| | Vendor ID 6796 | E 6798 | Business Transaction Document Product 6799 | Vendor 6701A | Identification 6702A | Identifier 6703A | CDT 6704A | Product Cat. Party ID 6705A | 0..1 6706A |
| | Bill To ID 6707A | E 6708A | Business Transaction Document Product 6709A | Bill To 6710A | Identification 6711A | Identifier 6712A | CDT 6713A | Product Cat. Party ID 6714A | 0..1 6715A |

Fig. 67c

| CDT | | Cat. | Obj. Class | Prop. Qualifier | Prop. | Rep./ Assn. | Type | Type Name | Card. |
|---|---|---|---|---|---|---|---|---|---|
| | Bill From ID 6716A | E 6717A | Business Transaction Document Product 6718A | Bill From 6719A | Identification 6720A | Identifier 6721A | CDT 6722A | Product Cat.-Party ID 6723A | 0..1 6724A |
| | Bidder ID 6725A | E 6726A | Business Transaction Document Product 6727A | Bidder From 6728A | Identification 6729A | Identifier 6730A | CDT 6731A | Product Cat.-Party ID 6732A | 0..1 6733A |

Fig. 68

| GDT | Cat. | Obj. Class | Prop. | Rep./ Assn. | Type | Type Name |
|---|---|---|---|---|---|---|
| Business Transaction Document Public Indicator 6800 | | Business Transaction Document 6802 | Public Indicator 6804 | Indicator 6806 | CCT 6808 | Indicator 6810 |

Fig. 69

| GDT | | Cat. | Obj. Class | Prop. | Rep./ Assn. | Type | Type Name | Card. |
|---|---|---|---|---|---|---|---|---|
| Business Transaction Document-Reference 6900 | | | Business Transaction Document Reference 6902 | | Details 6904 | | | |
| | ID 6906 | E 6908 | Business Transaction Document Reference 6910 | Identification 6912 | Identifier 6914 | GDT 6916 | Business Transaction Document ID 6918 | 0..1 6920 |
| | Item ID 6922 | E 6924 | Business Transaction Document Reference 6926 | Item Identification 6928 | Identifier 6930 | GDT 6932 | Business Transaction Document-Item ID 6934 | 0..n 6936 |

Fig. 70

| GDT | Obj. Class | Prop. | Rep./ Assn. | Type | Type Name |
|---|---|---|---|---|---|
| Business Transaction Document Settlement Relevance Indicator 7000 | Business Transaction Document 7002 | Settlement Relevance Indicator 7004 | Indicator 7006 | CCT 7008 | Indicator 7010 |

Fig. 71a

| CDT | | Cat. | Obj. Class | Prop. Qualifier | Prop. | Rep/ Assn. | Type | Type Name | Ca rd. |
|---|---|---|---|---|---|---|---|---|---|
| Business Transaction -Document Ship From Location 7100 | | | Business Transaction -Document Ship From Location 7102 | | | Details 7104 | | | |
| | Internal ID 7106 | E 7108 | Business Transaction Document Ship From Location 7110 | Internal 7112 | Identifica-tion 7114 | Identifier 7116 | CDT 7118 | Location Internal ID 7120 | 0..1 7122 |
| | Standard ID 7124 | E 7126 | Business Transaction -Document Ship From Location 7128 | Standard 7130 | Identification 7132 | Identifier 7134 | CDT 7136 | Location Standard ID 7138 | 0..n 7140 |

Fig. 71b

| CDT | | Cat. | Obj. Class | Prop. Qualifier | Prop. | Rep/ Assn. | Type | Type Name | Ca rd. |
|---|---|---|---|---|---|---|---|---|---|
| | Buyer ID 7142 | E 7144 | Business Transaction Document Ship From Location 7146 | Buyer 7148 | Identification 7150 | Identifier 7152 | CDT 7154 | Location Party ID 7156 | 0..1 7158 |
| | Seller ID 7160 | E 7162 | Business Transaction Document Ship From Location 7164 | Seller 7166 | Identification 7168 | Identifier 7172 | CDT 7172 | Location Party ID 7174 | 0..1 7176 |
| | Product Recipient ID 7178 | E 7180 | Business Transaction Document Ship From Location 7182 | Product Recipient 7184 | Identification 7186 | Identifier 7188 | CDT 7190 | Location Party ID 7192 | 0..1 7194 |

Fig. 71c

| CDT | | Cat. | Obj. Class | Prop. Qualifier | Prop. | Rep/ Assn. | Type | Type Name | Ca rd. |
|---|---|---|---|---|---|---|---|---|---|
| | Vendor ID 7196 | E 7198 | Business Transaction Document Ship From Location 7199 | Vendor 7101A | Identifica-tion 7102A | Identifier 7103A | CDT 7104A | Location Party ID 7105A | 0..1 7106A |
| | Address 7107A | E 7108A | Business Transaction Document Ship From Location 7109A | | Address 7110A | Address 7111A | GDT 7112A | Address 7113A | 0..1 7114A |
| | Note 7115A | E 7116A | Business Transaction Document Ship From Location 7117A | | Note 7118A | Text 7119A | GDT 7120A | Note 7121A | 0..1 7122A |

Fig. 71d

| CDT | | Cat. | Obj. Class | Prop. Qualifier | Prop. | Rep/ Assn. | Type | Type Name | Card. |
|---|---|---|---|---|---|---|---|---|---|
| | Loading Location 7123A | E 7124A | Business Transaction Document Ship From Location 7125A | | Loading Location 7126A | Business Transaction-Document Location 7127A | GDT 7128A | Business Transaction Document Location 7129A | 0..1 7130A |

Fig. 72a

| CDT | | Cat. | Obj. Class | Prop. Qualifier | Prop. | Rep./ Assn. | Type | Type Name | Card. |
|---|---|---|---|---|---|---|---|---|---|
| Business Transaction Document Ship To Location 7200 | | | Business Transaction Document Ship To Location 7202 | | | Details 7204 | | | |

Fig. 72b

| CDT | | Cat. | Obj. Class | Prop. Qualifier | Prop. | Rep./ Assn. | Type | Type Name | Card. |
|---|---|---|---|---|---|---|---|---|---|
| | Internal ID 7206 | E 7208 | Business Transaction Document Ship To Location 7210 | Internal 7212 | Identification 7214 | Identifier 7216 | CDT 7218 | Location Internal ID 7220 | 0..1 7222 |
| | Standard ID 7224 | E 7226 | Business Transaction Document Ship To Location 7228 | Standard 7230 | Identification 7232 | Identifier 7234 | CDT 7236 | Location Standard ID 7238 | 0..n 7240 |
| | Buyer ID 7242 | E 7244 | Business Transaction Document Ship To Location 7246 | Buyer 7248 | Identification 7250 | Identifier 7252 | CDT 7254 | Location Party ID 7256 | 0..1 7258 |

Fig. 72c

| CDT | | Cat. | Obj. Class | Prop. Qual. | Prop. | Rep./ Assn. | Type | Type Name | Card. |
|---|---|---|---|---|---|---|---|---|---|
| | Seller ID 7260 | E 7262 | Business TransactionDocument Ship To Location 7264 | Seller 7266 | Identification 7268 | Identifier 7270 | CDT 7272 | Location Party ID 7274 | 0..1 7276 |
| | Product Recipient ID 7278 | E 7280 | Business TransactionDocument Ship To Location 7282 | Product Recipient 7284 | Identification 7286 | Identifier 7288 | CDT 7290 | Location Party ID 7292 | 0..1 7294 |
| | Vendor ID 7296 | E 7298 | Business Transaction Document Ship To Location 7299 | Vendor 7201A | Identification 7201A | Identifier 7202A | CDT 7203A | Location Party ID 7204A | 0..1 7205A |

Fig. 72d

| CDT | | Cat. | Obj. Class | Prop. Qual. | Prop. | Rep./ Assn. | Type | Type Name | Card. |
|---|---|---|---|---|---|---|---|---|---|
| | Address 7206A | E 7207A | Business Transaction Document Ship To Location 7208A | | Address 7209A | Address 7210A | GDT 7211A | Address 7212A | 0..1 7213A |
| | Note 7214A | E 7215A | Business Transaction Document Ship To Location 7216A | | Note 7217A | Text 7218A | GDT 7219A | Note 7220A | 0..1 7221A |
| | Unloading Location 7222A | E 7223A | Business Transaction Document Ship To Location 7224A | | Unloading Location 7224A | Business Transaction Document Location 7226A | GDT 7227A | Business Transaction Document Location 7228A | 0..1 7229A |

Fig. 73a

| CDT | | Cat. | Obj. Class | Prop. Qual. | Prop. | Rep./ Assn. | Type | Type Name | Card. |
|---|---|---|---|---|---|---|---|---|---|
| Business Transaction Document Trans-shipment Location 7300 | | | Business Transaction Document Trans-shipment Location 7302 | | | Details 7304 | | | |
| | Internal ID 7306 | E 7308 | Business Transaction Document Trans-shipment Location 7310 | Internal 7312 | Identification 7314 | Identifier 7316 | CDT 7318 | Location Internal ID 7320 | 0..1 7322 |
| | Standard ID 7324 | E 7326 | Business Transaction Document Trans-shipment Location 7328 | Standard 7328 | Identification 7330 | Identifier 7332 | CDT 7334 | Location Standard ID 7336 | 0..n 7338 |

Fig. 73b

| CDT | | Cat. | Obj. Class | Prop. Qual. | Prop. | Rep./ Assn. | Type | Type Name | Card. |
|---|---|---|---|---|---|---|---|---|---|
| | Buyer ID 7340 | E 7342 | Business Transaction Document Trans-shipment Location 7344 | Buyer 7346 | Identification 7348 | Identifier 7350 | CDT 7352 | Location Party ID 7354 | 0..1 7356 |
| | Seller ID 7358 | E 7360 | Business Transaction Document Trans-shipment Location 7362 | Seller 7364 | Identification 7366 | Identifier 7368 | CDT 7370 | Location Party ID 7374 | 0..1 7374 |
| | Product Recipient 7376 | E 7378 | Business Transaction Document Trans-shipment Location 7380 | Product Recipient 7382 | Identification 7384 | Identifier 7386 | CDT 7388 | Location Party ID 7390 | 0..1 7392 |

Fig. 73c

| CDT | | Cat. | Obj. Class | Prop. Qual. | Prop. | Rep./ Assn. | Type | Type Name | Card. |
|---|---|---|---|---|---|---|---|---|---|
| | Vendor ID 7394 | E 7396 | Business Transaction Document Trans-shipment Location 7398 | Vendor 7399 | Identification 7301A | Identifier 7302A | CDT 7303A | Location Party ID 7304A | 0..1 7305A |
| | Address 7306A | E 7307A | Business Transaction Document Trans-shipment Location 7308A | | Address 7309A | Address 7310A | GDT 7311A | Address 7312A | 0..1 7313A |
| | Note 7314A | E 7315A | Business Transaction Document Trans-shipment Location 7316A | | Note 7317A | Text 7318A | GDT 7319A | Note 7320A | 0..1 7321A |

Fig. 73d

| CDT | | Cat. | Obj. Class | Prop. Qual. | Prop. | Rep./ Assn. | Type | Type Name | Card. |
|---|---|---|---|---|---|---|---|---|---|
| | Loading Location 7322A | E 7323A | Business Transaction Document Trans-shipment Location 7324A | | Loading Location 7325A | Business Transaction-Document Location 7326A | GDT 7327A | Business TransactionDocument Location 7328A | 0..1 7329A |
| | Unloading Location 7330A | E 7331A | Business Transaction Document Trans-shipment Location 7332A | | Unloading Location 7333A | Business Transaction-Document Location 7334A | GDT 7335A | Business TransactionDocument Location 7336A | 0..1 7337A |

Fig. 74

| GDT | Obj. Class | Prop. | Rep./ Assn. | Type | Type Name | Lgth. | Remarks |
|---|---|---|---|---|---|---|---|
| Business Transaction Document Type Code 7400 | Business Transaction Document 7402 | Type 7404 | Code 7406 | CCT 7408 | Code 7410 | ..3 7412 | Restricted 7414 |

Fig. 75

| GDT | Obj. Class | Prop. | Rep./ Assn. | Type | Type Name | Lgth. | Remarks |
|---|---|---|---|---|---|---|---|
| Business Transaction Execution Status Code 7500 | Business Transaction 7502 | Execution Status Code 7504 | Code 7506 | CCT 7508 | Code 7510 | 1 7512 | Restricted 7514 |

Fig. 76

| GDT | Obj. Class | Prop. | Rep./ Assn. | Type | Type Name | Lgth. | Remarks |
|---|---|---|---|---|---|---|---|
| Business Transaction Priority Code 7600 | Business Transaction 7602 | Priority Code 7604 | Code 7606 | CCT 7608 | Code 7608 | 1 7610 | Restricted 7612 |

Fig. 77

| GDT | Obj. Class | Prop. | Rep./ Assn. | Type | Type Name | Lgth. | Remarks |
|---|---|---|---|---|---|---|---|
| Business Transaction Type Code 7700 | Business Transaction 7702 | Type Code 7704 | Code 7706 | CCT 7708 | Code 7710 | 4 7712 | Restricted 7714 |

Fig. 78

| GTD | | Cat. | Obj. Class | Prop. | Rep./ Assn. | Type | Type Name | Lgth. | Card. |
|---|---|---|---|---|---|---|---|---|---|
| Cash Discount 7800 | | | Cash Discount 7802 | | Details 7804 | | | | |
| | Days Value 7806 | E 7808 | Cash Discount 7810 | Days 7812 | Value 7814 | GDT 7816 | Integer Value 7818 | 1..3 7820 | 1 7822 |
| | Percent 7824 | E 7826 | Cash Discount 7828 | Percent 7830 | Percent 7832 | GDT 7834 | Percent 7836 | Max. 5/3 7838 | 1 7840 |

Fig. 79

| GDT | | Cat. | Obj. Class | Prop. | Rep./ Assn. | Type | Data Type | Lgth. | Card. |
|---|---|---|---|---|---|---|---|---|---|
| Cash Discount Terms 7900 | | | Cash Discount Terms 7902 | | Details 7904 | | | | |
| | Payment Baseline Date 7906 | E 7908 | Cash Discount Terms 7910 | Payment Baseline Date 7912 | Date 7914 | GDT 7916 | Date 7918 | | 0..1 7920 |
| | Maximum Cash Discount 7922 | E 7924 | Cash Discount Terms 7926 | Maximum Cash Discount 7928 | Details 7930 | GDT 7932 | Cash Discount 7934 | | 0..1 7936 |
| | Normal Cash Discount 7938 | E 7940 | Cash Discount Terms 7942 | Normal Cash Discount 7944 | Details 7946 | GDT 7948 | Cash Discount 7950 | | 0..1 7952 |
| | Full Payment Due Days Value 7954 | E 7956 | Cash Discount Terms 7960 | Full Payment Due Days 7962 | Value 7964 | GDT 7966 | Integer Value 7968 | 1..3 7970 | 0..1 7972 |

Fig. 80a

| GDT | | Cat. | Obj. Class | Prop. | Rep./ Assn. | Type | Type Name | Lgth. | Card. | Remarks |
|---|---|---|---|---|---|---|---|---|---|---|
| Catalogue ID 8000 | | | Catalog 8002 | Identification 8004 | Identifier 8006 | CCT 8008 | Identifier 8010 | 1..40 8012 | | Restricted 8014 |
| | Scheme ID 8016 | A 8018 | Identification Scheme 8020 | Identification 8022 | Identifier 8024 | xsd 8026 | token 8028 | 1..60 8030 | 0..1 8032 | |
| | Scheme Agency ID 8034 | A 8036 | Identification Scheme Agency 8038 | Identification 8040 | Identifier 8042 | xsd 8044 | token 8046 | 1..60 8048 | 0..1 8050 | |
| | Scheme Agency Scheme ID 8052 | A 8054 | Identification Scheme Agency 8056 | Scheme 8058 | Identifier 8060 | xsd 8062 | token 8064 | 1..60 8066 | 0..1 8068 | |

Fig. 80b

| GDT | | Cat. | Obj. Class | Prop. | Rep./ Assn. | Type | Type Name | Lgth. | Card. | Remarks |
|---|---|---|---|---|---|---|---|---|---|---|
| | Scheme Agency Scheme Agency ID 8070 | A 8072 | Identification Scheme Agency 8074 | Scheme Agency 8076 | Identifier 8078 | xsd 8080 | token 8082 | 3 8084 | 0..1 8086 | |

Fig. 81

| GDT | Obj. Class | Prop. | Rep./ Assn. | Type | Type Name | Lgth. | Remarks |
|---|---|---|---|---|---|---|---|
| Catalogue Item ID 8100 | Catalogue Item 8102 | Identification 8104 | Identifier 8106 | CCT 8108 | Identifier 8110 | 1..40 8112 | Restricted 8114 |

Fig. 82

| GDT | | Cat. | Obj. Class | Prop. | Rep./ Assn. | Type | Type Name | Card. |
|---|---|---|---|---|---|---|---|---|
| Catalogue Reference 8200 | | | Catalogue Reference 8202 | | Details 8204 | | | |
| | ID 8206 | E 8208 | Catalogue Reference 8210 | Identification 8212 | Identifier 8214 | GDT 8216 | Catalogue ID 8218 | 1 8220 |
| | Item ID 8222 | E 8224 | Catalogue Reference 8226 | Item Identification 8228 | Identifier 8230 | GDT 8232 | Catalogue Item ID 8234 | 0..n 8236 |

Fig. 83

| GDT | Obj. Class | Prop. | Rep./ Assn. | Type | Type Name | Lgth. | Remarks |
|---|---|---|---|---|---|---|---|
| Catalogue Schema ID 8300 | Catalogue Schema 8302 | Identification 8304 | Identifier 8306 | CCT 8308 | Identifier 8310 | 1..40 8312 | Restricted 8314 |

Fig. 84

| GDT | Obj. Class | Prop. | Rep./ Assn. | Type | Type Name | Lgth. | Remarks |
|---|---|---|---|---|---|---|---|
| Catalogue Schema Type Code 8400 | Catalogue Schema 8402 | Type 8404 | Code 8406 | CCT 8408 | Code 8410 | 2 8412 | Restricted 8414 |

Fig. 85

| GDT | Obj. Class | Prop. | Rep./ Assn. | Type | Type Name | Lgth. | Remarks |
|---|---|---|---|---|---|---|---|
| Catalogue Section ID 8500 | Catalogue Section 8502 | Identification 8504 | Identifier 8506 | CCT 8508 | Identifier 8510 | 1..40 8512 | Restricted 8514 |

Fig. 86

| GDT | Obj. Class | Prop. | Rep./ Assn. | Type | Type Name | Lgth. | Remarks |
|---|---|---|---|---|---|---|---|
| Catalogue Section Type ID 8600 | Catalogue Section Type 8602 | Identification 8604 | Identifier 8606 | CCT 8608 | Identifier 8610 | 1..40 8612 | Restricted 8614 |

Fig. 87

| GDT | Obj. Class | Prop. | Rep./ Assn. | Type | Type Name | Lgth. | Remarks |
|---|---|---|---|---|---|---|---|
| Catalogue Type Code 8700 | Catalog 8702 | Type 8704 | Code 8706 | CCT 8708 | Code 8710 | 2 8712 | Restricted 8714 |

Fig. 88

| GDT | Obj. Class | Prop. | Rep./ Assn. | Type | Type Name | Lgth. | Remarks |
|---|---|---|---|---|---|---|---|
| Catalogue View ID 8800 | Catalogue View 8802 | Identification 8804 | Identifier 8806 | CCT 8808 | Identifier 8810 | 1..40 8812 | Restricted 8814 |

Fig. 89

| GDT | Obj. Class | Prop. | Rep./ Assn. | Type | Type Name |
|---|---|---|---|---|---|
| Complete Transmission Indicator 8900 | Complete Transmission 8902 | Indicator 8904 | Indicator 8906 | CCT 8908 | Indicator 8910 |

Fig. 90

| GDT | Prop. Term | Rep./ Assn. | Type | Type Name |
|---|---|---|---|---|
| Consignment Indicator 9000 | Consignment Indicator 9002 | Indicator 9004 | CCT 9006 | Indicator 9008 |

Fig. 91a

| CDT | | Cat. | Obj. Class | Prop. Qual. | Prop. | Rep./ Assn. | Type | Type Name | Card. |
|---|---|---|---|---|---|---|---|---|---|
| Contact Person 9100 | | | Contact Person 9102 | | | Details 9104 | | | |
| | Internal ID 9106 | E 9108 | Contact Person 9110 | Internal 9112 | Identification 9114 | Identifier 9116 | CDT 9118 | Contact Person Internal ID 9120 | 0..1 9122 |
| | Buyer ID 9124 | E 9126 | Contact Person 9128 | Buyer 9130 | Identification 9132 | Identifier 9134 | CDT 9136 | Contact Person Party ID 9138 | 0..1 9140 |
| | Seller ID 9142 | E 9144 | Contact Person 9146 | Seller 9148 | Identification 9150 | Identifier 9152 | CDT 9154 | Contact Person Party ID 9156 | 0..1 9158 |
| | Product Recipient ID 9160 | E 9162 | Contact Person 9164 | Product Recipient 9166 | Identification 9168 | Identifier 9170 | CDT 9172 | Contact Person Party ID 9174 | 0..1 9176 |

Fig. 91b

| CDT | | Cat. | Obj. Class | Prop. Qual. | Prop. | Rep./ Assn. | Type | Type Name | Card. |
|---|---|---|---|---|---|---|---|---|---|
| | Vendor ID 9178 | E 9180 | Contact Person 9182 | Vendor 9184 | Identification 9186 | Identifier 9188 | CDT 9190 | Contact Person Party ID 9192 | 0..1 9194 |
| | Bill To ID 9196 | E 9198 | Contact Person 9199 | Bill To 9101A | Identification 9102A | Identifier 9103A | CDT 9104A | Contact Person Party ID 9105A | 0..1 9106A |
| | Bill From ID 9107A | E 9108A | Contact Person 9109A | Bill From 9110A | Identification 9111A | Identifier 9112A | CDT 9113A | Contact Person Party ID 9114A | 0..1 9115A |
| | Bidder ID 9116A | E 9117A | Contact Person 9118A | Bidder 9119A | Identification 9120A | Identifier 9121A | CDT 9122A | Contact Person Party ID 9123A | 0..1 9124A |
| | Address 9125A | E 9126A | Contact Person 9127A | | Address 9128A | Address 9129A | AGDT 9130A | Address 9131A | 0..1 9132A |

Fig. 92

| GDT | | Cat. | Obj. Class | Prop. | Rep./ Assn. | Type | Type Name | Lgth. | Card. | Remarks |
|---|---|---|---|---|---|---|---|---|---|---|
| Contact Person ID 9200 | | | Contact Person 9202 | Identification 9204 | Identifier 9206 | CCT 9208 | Identifier 9210 | 1..60 9212 | | Restricted 9214 |
| | scheme ID 9216 | A 9218 | Identification Scheme 9220 | Identification 9222 | Identifier 9224 | xsd 9226 | token 9228 | 1..60 9230 | 0..1 9232 | |
| | scheme Agency ID 9234 | A 9236 | Identification Scheme Agency 9238 | Identification 9240 | Identifier 9242 | xsd 9244 | token 9246 | 1..60 9248 | 0..1 9250 | |
| | scheme Agency Scheme ID 9252 | A 9254 | Identification Scheme Agency 9256 | Scheme 9258 | Identifier 9260 | xsd 9262 | token 9264 | 1..60 9266 | 0..1 9268 | |
| | scheme Agency Scheme Agency ID 9270 | A 9272 | Identification Scheme Agency 9274 | Scheme Agency 9276 | Identifier 9278 | xsd 9280 | token 9282 | 3 9284 | 0..1 9286 | |

Fig. 93

| CDT | | Cat. | Obj. Class | Prop. Qual. | Prop. | Rep./ Assn. | Type | Type Name | Lgth. | Card. | Remarks |
|---|---|---|---|---|---|---|---|---|---|---|---|
| Contact Person Internal ID 9300 | | | Contact Person 9302 | Internal 9304 | Identifica-tion 9306 | Identifier 9308 | GDT 9310 | Contact Person ID 9312 | 1..32 9314 | | Restricted 9316 |
| | scheme ID 9318 | A 9320 | Identifica-tion Scheme 9322 | | Identifica-tion 9324 | Identifier 9326 | xsd 9328 | token 9330 | 1..60 9332 | 0..1 9334 | |
| | scheme Agency ID 9336 | A 9338 | Identifica-tion Scheme Agency 9340 | | Identifica-tion 9342 | Identifier 9344 | xsd 9346 | token 9348 | 1..60 9350 | 0..1 9352 | |

Fig 94

| CDT | Obj. Class | Prop. Qual. | Prop. | Rep./ Assn. | Type | Type Name | Lgth. | Remarks |
|---|---|---|---|---|---|---|---|---|
| Contact Person Party ID 9400 | Contact Person 9402 | Party 9404 | Identification 9406 | Identifier 9408 | GDT 9410 | Contact Person ID 9412 | 1..60 9414 | Restricted 9416 |

Fig 95

| GDT | Rep./ Assn. Qual. | Rep./ Assn. | Type | Type Name | Lgth. |
|---|---|---|---|---|---|
| Counter Value 9500 | Counter 9502 | Value 9504 | xsd 9506 | non Negative Integer 9508 | 1..9 9510 |

Fig. 96

| GDT | Rep./ Assn. | Type | Type Name | Lgth. | Card. | Remarks |
|---|---|---|---|---|---|---|
| Country Code 9600 | Country 9602 | Code 9604 | CCT 9606 | Code 9608 | 2..3 9610 | Restricted 9612 |

Fig. 97

| GDT | Obj. Class | Prop. | Rep./ Assn. | Type | Type Name | Lgth. |
|---|---|---|---|---|---|---|
| Credit Agency Report Query Reason Code 9700 | Credit Agency Report Query 9702 | Reason 9704 | Code 9706 | CCT 9708 | Code 9710 | 2 9712 |

Fig. 98

| GDT | Obj. Class | Prop. | Rep./ Assn. | Type | Type Name |
|---|---|---|---|---|---|
| Credit Agency Report Retrieval Permission Indicator 9800 | Credit Agency Report 9802 | Retrieval Permission 9804 | Indicator 9806 | CCT 9808 | Indicator 9810 |

Fig. 99

| GDT | | Cat. | Obj. Class | Prop. | Rep./ Assn. | Type | Type Name | Lgth. | Card. | Remarks |
|---|---|---|---|---|---|---|---|---|---|---|
| Credit Agency Report Scoring 9900 | | | Credit Agency Report 9902 | Scoring 9904 | Details 9906 | | | | | |
| | Score Card ID 9908 | E 9910 | Credit Agency Report Scoring 9912 | Score Card Identification 9914 | Identifier 9916 | GDT 9918 | Score Card ID 9920 | 1..20 9922 | 0..1 9924 | |
| | Result Value 9926 | E 9928 | Credit Agency Report Scoring 9930 | Result 9932 | Value 9934 | GDT 9936 | Decimal Value 9938 | 6.2 9940 | 1 9942 | Restricted 9944 |
| | Descrip-tion 9946 | E 9948 | Credit Agency Report Scoring 9950 | Description 9952 | Text 9954 | GDT 9956 | Description 9958 | | 0..1 9960 | |

Fig. 100

| GDT | Obj. Class | Prop. | Rep./ Assn. | Type | Type Name | Lgth. |
|---|---|---|---|---|---|---|
| Credit Commitment Type Code 10000 | Credit Commitment 10002 | Type 10004 | Code 10006 | CCT 10008 | Code 10010 | 3 10012 |

Fig. 101

| GDT | | Cat. | Obj. Class | Prop. | Rep./ Assn. | Type | Type Name | Lgth. | Card. |
|---|---|---|---|---|---|---|---|---|---|
| Credit Rating Code 10100 | | | Credit 10102 | Rating 10104 | Code 10106 | CCT 10108 | Code 10110 | 1..10 10112 | 1 10114 |
| | list Agency ID 10116 | A 10118 | Code List Agency 10120 | Identification 10122 | Identifier 10124 | xsd 10126 | token 10128 | 1..60 10130 | 0..1 10132 |
| | list Agency Scheme Agency ID 10134 | A 10136 | Code List Agency 10138 | Scheme Agency 10140 | Identifier 10142 | xsd 10144 | token 10146 | 3 10148 | 0..1 10150 |

Fig. 102

| GDT | | Cat. | Obj. Class | Prop. | Rep./ Assn. | Type | Type Name | Lgth. | Card. |
|---|---|---|---|---|---|---|---|---|---|
| Credit Risk Class Code 10200 | | | Credit 10202 | Risk Class 10204 | Code 10206 | CCT 10208 | Code 10210 | 10 10212 | 1 10214 |
| | list Agency ID 10216 | A 10218 | Code List Agency 10220 | Identification 10222 | Identifier 10224 | xsd 10226 | token 10228 | 1..60 10230 | 0..1 10232 |
| | list Agency Scheme Agency ID 10234 | A 10236 | Code List Agency 10238 | Scheme Agency 10240 | Identifier 10242 | xsd 10244 | token 10246 | 3 10248 | 0..1 10250 |

Fig. 103

| GDT | Obj. Class | Prop. | Rep./ Assn. | Type | Type Name | Lgth. | Remarks |
|---|---|---|---|---|---|---|---|
| Credit Segment Internal ID 10300 | Credit Segment 10302 | Internal Identification 10304 | Identifier 10306 | CCT 10308 | Identifier 10310 | 1..10 10312 | Restricted 10314 |

Fig. 104

| GDT | Obj. Class | Prop. | Rep./ Assn. | Type | Type Name | Lgth. |
|---|---|---|---|---|---|---|
| Credit Worthiness Change Reason Code 10400 | Credit Worthiness 10402 | Change Reason 10404 | Code 10406 | CCT 10408 | Code 10410 | 2 10412 |

Fig. 105

| GDT | Obj. Class | Prop. | Rep./ Assn. | Type | Type Name | Lgth. |
|---|---|---|---|---|---|---|
| Credit Worthiness Checking Rule Code 10500 | Credit Worthiness 10502 | Checking Rule 10504 | Code 10506 | CCT 10508 | Code 10510 | 2 10512 |

Fig. 106

| GDT | Obj. Class | Prop. | Rep./ Assn. | Type | Type Name | Lgth. |
|---|---|---|---|---|---|---|
| Credit Worthiness Checking Severity Code 10600 | Credit Worthiness 10602 | Checking Severity 10604 | Code 10606 | CCT 10608 | Code 10610 | 1 10612 |

Fig. 107

| GDT | Obj. Class | Prop. | Rep./ Assn. | Type | Type Name |
|---|---|---|---|---|---|
| Credit Worthiness Indicator 10700 | Credit Worthiness 10702 | Indicator 10704 | Indicator 10706 | CCT 10708 | Indicator 10710 |

Fig. 108

| GDT | Obj. Class | Prop. | Rep./ Assn. | Type | Type Name | Lgth. | Remarks |
|---|---|---|---|---|---|---|---|
| Currency Code 10800 | Currency 10802 | Code 10804 | Code 10806 | CCT 10808 | Code 10810 | 3 10812 | Restricted 10814 |

Fig. 109

| GDT | | Cat. | Obj. Class | Prop. | Rep./ Assn. | Type | Type Name | Lgth. | Card. |
|---|---|---|---|---|---|---|---|---|---|
| Dangerous Goods 10900 | | | Dangerous Goods 10902 | | Details 10904 | | | | |
| | ID 10906 | E 10908 | Dangerous Goods 10910 | Identification 10912 | Identifier 10914 | GDT 10916 | Dangerous Goods ID 10918 | 4 10920 | 0..1 10922 |
| | Regulations Code 10924 | E 10926 | Dangerous Goods 10928 | Regulations 10930 | Code 10932 | GDT 10934 | Dangerous Goods Regulation Code 10936 | 1..3 10938 | 0..1 10940 |
| | Class ID 10942 | E 10944 | Dangerous Goods 10946 | Class 10948 | Identifier 10950 | CCT 10952 | Identifier 10954 | 1..3 10956 | 0..1 10958 |
| | Division ID 10960 | E 10962 | Dangerous Goods 10964 | Division 10966 | Identifier 10968 | CCT 10970 | Identifier 10972 | 1..6 10974 | 0..1 10976 |

Fig. 110

2.75.4 Structure

| GDT | Obj. Class | Prop. | Rep./ Assn. | Type | Type Name | Lgth. |
|---|---|---|---|---|---|---|
| Dangerous Goods ID 11000 | Dangerous Goods 11002 | Identification 11004 | Identifier 11006 | CCT 11008 | Identifier 11010 | 4 11012 |

Fig. 111

| GDT | Obj. Class | Prop. | Rep./ Assn. | Type | Type Name | Lgth. | Card. |
|---|---|---|---|---|---|---|---|
| Dangerous Goods Indicator 11100 | Dangerous Goods 11102 | Indicator 11104 | Indicator 11106 | CCT 11108 | Indicator 11110 | 1 11112 | 0..1 11114 |

Fig. 112

| GDT | Obj. Class | Prop. | Rep./ Assn. | Type | Type Name | Lgth. |
|---|---|---|---|---|---|---|
| Dangerous Goods Regulations Code 11200 | Dangerous Goods 11202 | Regulations 11204 | Code 11206 | CCT 11208 | Code 11210 | 1..3 11212 |

Fig. 113

| GDT | Prop. | Rep./ Assn. | Type | Type Name |
|---|---|---|---|---|
| Date 11300 | Date 11302 | Date 11304 | CCT 11306 | Date 11308 |

Fig. 114

| GDT | | Cat. | Obj. Class | Prop. | Rep./ Assn. | Type | Type Name | Card. |
|---|---|---|---|---|---|---|---|---|
| Date Period 11400 | | | Date Period 11402 | Details 11404 | | | | |
| | Start Date 11406 | E 11408 | Time Period 11410 | Start Date 11412 | Date 11414 | GDT 11416 | Date 11418 | 0..1 11420 |
| | End Date 11422 | E 11424 | Date Period 11426 | End Date 11428 | Date 11430 | GDT 11432 | Date 11434 | 0..1 11436 |
| | Duration 11438 | E 11440 | Date Period 11442 | Duration 11444 | Duration 11446 | GDT 11448 | Duration 11450 | 0..1 11452 |

Fig. 115

| GDT | Prop. | Rep./ Assn. | Type | Type Name |
|---|---|---|---|---|
| Date Time 11500 | Date Time 11502 | Date Time 11504 | CCT 11506 | Date Time 11508 |

Fig. 116

| GDT | | Cat. | Obj. Class | Prop. | Rep./ Assn. | Type | Type Name | Card. |
|---|---|---|---|---|---|---|---|---|
| Date Time Period 11600 | | | Date Time Period 11602 | Details 11604 | | | | |
| | Start Date Time 11606 | E 11608 | Date Time Period 11610 | Start Date Time 11612 | Date Time 11614 | GDT 11616 | Date Time 11618 | 0..1 11620 |
| | End Date Time 11622 | E 11624 | Date Time Period 11626 | End Date Time 11628 | Date Time 11630 | GDT 11632 | Date Time 11634 | 0..1 11636 |
| | Duration 11638 | E 11640 | Date Time Period 11642 | Duration 11644 | Duration 11646 | GDT 11648 | Duration 11650 | 0..1 11652 |

Fig. 117

| GDT | Rep./Assn. Qual. | Rep./ Assn. | Type | Type Name |
|---|---|---|---|---|
| Decimal Value 11700 | Decimal 11702 | Value 11704 | xsd 11706 | Decimal 11708 |

Fig. 118

| GDT | Prop. | Rep./ Assn. | Type | Type Name |
|---|---|---|---|---|
| Deleted Indicator 11800 | Deleted Indicator 11802 | Indicator 11804 | CCT 11806 | Indicator 11808 |

Fig. 119

| GDT | Obj. Class | Prop. | Rep./ Assn. | Type | Type Name | Lgth. |
|---|---|---|---|---|---|---|
| Delivery Schedule Type Code 11900 | Delivery Schedule 11902 | Type 11904 | Code 11906 | CCT 11908 | Code 11910 | 1 11912 |

Fig. 120a

| GDT | | | Cat. | Obj. Class | Prop. | Rep./ Assn. | Type | Type Name | Card. |
|---|---|---|---|---|---|---|---|---|---|
| Delivery Terms 12000 | | | | Delivery Terms 12002 | | Details 12004 | | | |
| | Delivery Item Group ID 12006 | | E 12008 | Delivery Terms 12010 | Order Item Group Identification 12012 | Identifier 12014 | GDT 12012 | Business Transaction Document Item Group ID 12014 | 0...1 12016 |
| | Delivery Priority Code 12018 | | E 12020 | Delivery Terms 12022 | Delivery Priority Code 12024 | Code 12026 | GDT 12028 | Business Transaction Priority Code 12030 | 0...1 12032 |
| | Incoterms 12034 | | E 12036 | Delivery Terms 12038 | Incoterms 12040 | Incoterms 12042 | GDT 12044 | Incoterms 12046 | 0...1 12048 |
| | Partial Delivery 12050 | | E 12052 | Delivery Terms 12054 | Partial Delivery 12056 | Partial Delivery 12058 | GDT 12060 | Partial Delivery 12062 | 0...1 12064 |
| | Quantity Tolerance 12066 | | E 12068 | Delivery Terms 12070 | Quantity Tolerance 12072 | Quantity Tolerance 12074 | GDT 12076 | Quantity Tolerance 12078 | 0...1 12080 |

Fig. 120b

| GDT | | | Cat. | Obj. Class | Prop. | Rep./ Assn. | Type | Type Name | Card. |
|---|---|---|---|---|---|---|---|---|---|
| | Maximum Lead Time Duration 12082 | | E 12084 | Delivery Terms 12086 | Maximum Lead Time 12088 | Duration 12090 | GDT 12092 | Duration 12094 | 0...1 12096 |
| | Transport 12098 | | E 12099 | Delivery Terms 12001A | Transport 12002A | Details 12003A | | | 0..1 12004A |
| | | Service Level Code 12005A | E 12006A | Transport 12007A | Service Level Code 12008A | Code 12009A | GDT 12010A | Transport Service Level Code 12011A | 0...1 12012A |
| | | Mode Code 12013A | E 12014A | Transport 12015A | Mode Code 12016A | Code 12017A | GDT 12018A | Transport Mode Code 12019A | 0...1 12020A |
| | | Means Description Code 12021A | E 12022A | Transport 12023A | Means Description Code 12024A | Code 12025A | GDT 12026A | Transport Means Description Code 12027A | 0...1 12028A |
| | Description 12029A | | E 12030A | Delivery Terms 12031A | Description 12032A | Description 12033A | GDT 12034A | Description 12035A | 0...1 12036A |

Fig. 121

| GDT | | Cat. | Obj. Class | Prop. | Rep./ Assn. | Type | Type Name | Card. | Remarks |
|---|---|---|---|---|---|---|---|---|---|
| Description 12100 | | | Description 12102 | | Text 12104 | CCT 12106 | Text 12108 | | Restricted 12110 |
| | Language Code 12112 | A 12114 | Description 12116 | language Code 12118 | Code 12120 | xsd 12122 | Language 12124 | 1 12126 | |

Fig. 122

| GDT | Rep./Assn. Qual. | Rep./ Assn. | Type | Type Name | Lgth. |
|---|---|---|---|---|---|
| Digit Number Value 12200 | Digit Number 12202 | Value 12204 | xsd 12206 | Non-Negative Integer 12208 | 1..2 12210 |

Fig. 123

| GDT | Prop. | Rep./ Assn. | Type | Type Name |
|---|---|---|---|---|
| Direct Material Indicator 12300 | Direct Material Indicator 12302 | Indicator 12304 | CCT 12306 | Indicator 12308 |

Fig. 124

| GDT | Obj. Class | Prop. | Rep./ Assn. | Type | Type Name |
|---|---|---|---|---|---|
| Dunning Counter Value 12400 | Dunning 12402 | Counter 12404 | Value 12406 | GDT 12408 | Counter Value 12410 |

Fig. 125

| GDT | Obj. Class | Prop. | Rep./ Assn. | Type | Type Name | Lgth. |
|---|---|---|---|---|---|---|
| Dunning Level Value 12500 | Dunning 12502 | Level 12504 | Value 12506 | CCT 12508 | Numeric 12510 | 1 12512 |

Fig. 126

| GDT | Prop. | Rep./ Assn. | Type | Type Name |
|---|---|---|---|---|
| Duration 12600 | Duration 12602 | Date Time 12604 | xsd 12606 | Duration 12608 |

Fig. 127

| GDT | | Cat. | Obj. Class | Prop. | Rep./ Assn. | Type | Type Name | Card. | Remarks |
|---|---|---|---|---|---|---|---|---|---|
| Email Address 12700 | | | Email 12702 | Address 12704 | Electronic Address 12706 | CCT 12708 | Electronic Address 12710 | | Restricted 12712 |
| | Protocol Code 12714 | A 12716 | Email 12718 | Protocol 12720 | Code 12722 | xsd 12724 | token 12726 | 0..1 12728 | Default: EM (smtp) 12730 |

Fig. 128

| GDT | Prop. Qual. | Rep./ Assn. | Type | Type Name |
|---|---|---|---|---|
| Evaluated Receipt Settlement Indicator 12800 | Evaluated Receipt 12802 | Settlement 12804 | CCT 12806 | Indicator 12808 |

Fig. 129

| GDT | | Cat. | Obj. Class | Prop. | Rep./ Assn. | Type | Type Name | Lgth. | Card. |
|---|---|---|---|---|---|---|---|---|---|
| Exchange Rate 12900 | | | Exchange Rate 12902 | | Details 12904 | | | | |
| | Unit Currency 12906 | E 12908 | Exchange Rate 12910 | Unit Currency 12912 | Code 12914 | GDT 12916 | Currency Code 12918 | | 1 12920 |
| | Quoted Currency 12922 | E 12924 | Exchange Rate 12926 | Quoted Currency 12928 | Code 12930 | GDT 12932 | Currency Code 12934 | | 1 12936 |
| | Rate 12938 | E 12940 | Exchange Rate 12942 | Rate 12944 | Rate 12946 | xsd 12948 | Decimal 12950 | 14.14 12952 | 1 12954 |
| | Quotation Date Time 12956 | E 12958 | Exchange Rate 12960 | Quotation Date Time 12962 | Date Time 12964 | GDT 12966 | Date Time 12968 | | 0..1 12970 |

Fig. 130

| GDT | Obj. Class | Rep./ Assn. | Type | Type Name | Lgth. | Remarks |
|---|---|---|---|---|---|---|
| Exponential Rep. Type Code 13000 | Exponential Rep.Type 13002 | Code 13004 | CCT 13006 | Code 13008 | 1 13010 | Restricted 13012 |

Fig. 131

| GDT | Prop. | Rep./ Assn. | Type | Type Name |
|---|---|---|---|---|
| Fixed Indicator 13100 | Fixed 13102 | Indicator 13104 | CCT 13106 | Indicator 13108 |

Fig. 132

| GDT | Rep./ Assn. Qual. | Rep./ Assn. | Type | Type Name |
|---|---|---|---|---|
| Float Value 13200 | Float 13202 | Value 13204 | xsd 13206 | Float 13208 |

Fig. 133

| GDT | Obj. Class Qual. | Obj. Class | Prop. | Rep./ Assn. | Type | Type Name | Lgth. | Remarks |
|---|---|---|---|---|---|---|---|---|
| Follow Up Business Transaction Document Requirement Code 13300 | Follow Up 13302 | Business Transaction Document 13304 | Require-ment 13306 | Code 13308 | CCT 13310 | Code 13312 | 2 13314 | Enumer-ation = “01 02 03 04 05“ 13316 |

Fig. 134

| CDT | Obj. Class Qual. | Obj. Class | Prop. | Rep./ Assn. | Type | Type Name | Lgth. | Remarks |
|---|---|---|---|---|---|---|---|---|
| Follow Up Message Requirement Code 13400 | Follow Up 13402 | Message 13404 | Requirement 13406 | Code 13408 | CCT 13410 | Code 13412 | 2 13414 | Restricted 13416 |

Fig. 135

| GDT | | Cat. | Obj. Class | Prop. | Rep./ Assn. | Type | Type Name | Card. |
|---|---|---|---|---|---|---|---|---|
| Geo Coordinates 13500 | | | Geo Coordinates 13502 | | Details 13504 | | | |
| | Latitude Measure 13506 | E 13508 | Geo Coordinates 13510 | Latitude 13512 | Measure 13514 | GDT 13516 | Measure 13518 | 1 13520 |
| | Longitude Measure 13522 | E 13524 | Geo Coordinates 13526 | Longitude 13528 | Measure 13530 | GDT 13532 | Measure 13534 | 1 13536 |

Fig. 136a

| Data Type | | | Obj. Class | Prop. Qual. | Prop. | Rep./ Assn. | Type | Type Name | Lgth. | Card. | Remarks |
|---|---|---|---|---|---|---|---|---|---|---|---|
| Handling Unit 13600 | | | Handling Unit 13602 | | | Details 13604 | | | | | |
| | ID 13606 | | Handling Unit 13608 | | Identifi- cation 13610 | Identifier 13612 | GDT 13614 | Identifier 13616 | 1..20 13618 | 1 13620 | |
| | Load Carrier 13622 | | Handling Unit 13624 | | | | | | | 1 13626 | |
| | | Product 13626 | Load Carrier 13628 | | Product 13630 | | GDT | Business Transaction Document Product 13632 | | 1 13634 | Restricted 13636 |
| | Height Measure 13638 | | Handling Unit 13640 | Height 13642 | Measure 13644 | Measure 13646 | GDT 13648 | Measure 13650 | 19.6 13652 | 0..1 13654 | |

Fig. 136b

| Data Type | | Obj. Class | Prop. Qual. | Prop. | Rep./ Assn. | Type | Type Name | Lgth. | Card. | Remarks |
|---|---|---|---|---|---|---|---|---|---|---|
| Lgth. Measure 13656 | | Handling Unit 13658 | Lgth. 13660 | Measure 13662 | Measure 13664 | GDT 13666 | Measure 13668 | 19.6 13670 | 0..1 13672 | |
| Width Measure 13674 | | Handling Unit 13676 | Width 13678 | Measure 13680 | Measure 13682 | GDT 13684 | Measure 13686 | 19.6 13688 | 0..1 13690 | |
| Gross Volume Measure 13692 | | Handling Unit 13694 | Volume 13696 | Measure 13698 | Measure 13699 | GDT 13601A | Measure 13602A | 19.6 13603A | 0..1 13604A | |
| Gross Weight Measure 13605A | | Handling Unit 13606A | Weight 13607A | Measure 13608A | Measure 13609A | GDT 13610A | Measure 13611A | 19.6 13612A | 0..1 13613A | |
| Additional Packaging 13614A | | Handling Unit 13615A | | | | | | | 0..n 13616A | |

Fig. 136c

| | Data Type | | | Obj. Class | Prop. Qual. | Prop. | Rep./ Assn. | Type | Type Name | Lgth. | Card. | Remarks |
|---|---|---|---|---|---|---|---|---|---|---|---|---|
| | | Product 13616A | | Additional Packaging 13617A | | Product 13618A | | GDT 13619A | Business Transaction Document Product 13620A | | 1 13621A | Restricted 13622A |
| | | Quantity 13623A | | Additional Packaging 13624A | | Quantity 13625A | Quantity 13626A | GDT 13627A | Quantity 13628A | 19.6 13629A | 1 13630A | |
| | Lower Level Hand-ling Unit 13631A | | | Handling Unit 13632A | | | | | | | 0..n 13633A | |

Fig. 136d

| | Data Type | | | Obj. Class | Prop. Qual. | Prop. | Rep./ Assn. | Type | Type Name | Lgth. | Card. | Remarks |
|---|---|---|---|---|---|---|---|---|---|---|---|---|
| | | ID 13634A | | Lower Level Handling Unit 13635A | | Identification 13636A | Identifier 13637A | GDT 13638A | Handling Unit ID 13639A | 1..20 13640A | 1 13641A | |

Fig. 136e

| Data Type | | Obj. Class | Prop. Qual. | Prop. | Rep./ Assn. | Type | Type Name | Lgth. | Card. | Remarks |
|---|---|---|---|---|---|---|---|---|---|---|
| Load 13642A | | Handling Unit 13643A | | Load 13644A | | | | | 0..n 13645A | |
| Business Transaction Document Reference 13645A | | Load 13646A | | Business Transac-tion Docu-ment 13647A | | GDT 13648A | Business Transaction Document Reference 13649A | | 1 13650A | |
| | ID 13651A | Business Transaction Document 13652A | | Identific-ation 13653A | Identifier 13654A | GDT 13655A | Business Transaction Document ID 13656A | 1..35 13657A | 0..1 13658A | |
| | Item ID 13659A | Business Transaction Document Item 13660A | | Identifica-tion 13661A | Identifier 13662A | GDT 13663A | Business Transaction Document Item ID 13664A | 1..10 13665A | 1 13666A | |
| Quantity 13666A | | Load 13667A | | Quantity 13668A | Quantity 13669A | GDT 13670A | Quantity 13671A | 19.6 13672A | 1 13673A | |

Fig. 137

| GDT | | Cat. | Obj. Class | Prop. | Rep./ Assn. | Type | Data Type | Lgth. | Card. | Remarks |
|---|---|---|---|---|---|---|---|---|---|---|
| Incoterms 13700 | | | Incoterms 13702 | | Details 13704 | | | | | |
| | Classification Code 13706 | E 13708 | Incoterms 13710 | Classifi-cation 13712 | Code 13714 | CCT 13716 | Code 13718 | 3 13720 | 1 13722 | Restricted 13724 |
| | Transfer Location Name 13726 | E 13728 | Incoterms 13730 | Transfer Location Name 13732 | Name 13734 | GDT 13736 | Name 13738 | 1..28 13740 | 0..1 13742 | Restricted 13744 |

Fig. 138

| GDT | Obj. Class | Prop. | Rep./ Assn. | Type | Type Name |
|---|---|---|---|---|---|
| Information Outdated Indicator 13800 | Information 13802 | Outdated Indicator 13804 | Indicator 13806 | CCT 13808 | Indicator 13810 |

Fig. 139

| GDT | Rep./ Assn. Qual. | Rep./ Assn. | Type | Type Name |
|---|---|---|---|---|
| Integer Value 13900 | Integer 13902 | Value 13904 | xsd 13906 | Integer 13908 |

Fig. 140

| GDT | | Cat. | Obj. Class | Prop. | Rep./ Assn. | Type | Type Name | Lgth. | Card. | Remarks |
|---|---|---|---|---|---|---|---|---|---|---|
| Interface Element ID 14000 | | | Interface Element 14002 | | Identifier 14004 | CCT 14006 | Identifier 14008 | 1..40 14010 | | Restricted 14012 |
| | Scheme ID 14014 | A 14016 | Identification Scheme 14018 | | Identifier 14020 | xsd 14022 | token 14024 | 1..60 14026 | 0..1 14028 | |
| | Scheme Agency ID 14030 | A 14032 | Identification Scheme Agency 14034 | | Identifier 14036 | xsd 14038 | token 14040 | 1..60 14042 | 0..1 14044 | |
| | Scheme Agency Scheme ID 14046 | A 14048 | Identification Scheme Agency 14050 | Scheme 14052 | Identifier 14054 | xsd 14056 | token 14058 | 1..60 14060 | 0..1 14062 | |
| | Scheme Agency Scheme Agency ID 14064 | A 14066 | Identification Scheme Agency 14068 | Scheme Agency 14070 | Identifier 14072 | xsd 14074 | token 14076 | 3 14078 | 0..1 14080 | |

Fig. 141

| GDT | Prop. | Rep./ Assn. | Type | Type Name | Lgth. | Remarks |
|---|---|---|---|---|---|---|
| Interval Boundary Type Code 14100 | Interval Boundary Type 14102 | Code 14104 | CCT 14106 | Code 14108 | 1 14110 | Restricted 14112 |

Fig. 142

| GDT | Obj. Class | Prop. | Rep./ Assn. | Type | Type Name | Lgth. | Remarks |
|---|---|---|---|---|---|---|---|
| Inventory Usability Status Code 14200 | Inventory 14202 | Usability Status 14204 | Code 14206 | CCT 14208 | Code 14210 | 1..2 14212 | Restricted 14214 |

Fig. 143

| GDT | Obj. Class | Prop. | Rep./ Assn. | Type | Type Name |
|---|---|---|---|---|---|
| Invoice Cancellation Invoice Indicator 14300 | Invoice 14302 | Cancellation Invoice Indicator 14304 | Indicator 14306 | CCT 14308 | Indicator 14310 |

Fig. 144

| GDT | Obj. Class | Prop. | Rep./ Assn. | Type | Type Name |
|---|---|---|---|---|---|
| Invoice IntraCorporate Indicator 14400 | Invoice 14402 | IntraCorporate Indicator 14404 | Indicator 14406 | CCT 14408 | Indicator 14410 |

Fig. 145

| GDT | Obj. Class | Prop. Term | Rep. | Type | Type Name | Lgth. |
|---|---|---|---|---|---|---|
| Language Code 14500 | Language 14502 | Identification 14504 | Code 14506 | xsd 14508 | language 14510 | 2..9 14512 |

Fig. 146

| GDT | Prop. | Rep./ Assn. | Type |
|---|---|---|---|
| Language Dependency Indicator 14600 | Language Dependency 14602 | Indicator 14604 | CCT: Indicator 14606 |

Fig. 147

| GDT | Obj. Class | Prop. | Rep./ Assn. | Type | Type Name | Lgth. |
|---|---|---|---|---|---|---|
| Legal Event Type Code 14700 | Legal Event 14702 | Type 14704 | Code 14706 | CCT 14708 | Code 14710 | 2 14712 |

Fig. 148

| GDT | | Cat. | Obj. Class | Prop. | Rep./ Assn. | Type | Type Name | Lgth. | Card. | Remarks |
|---|---|---|---|---|---|---|---|---|---|---|
| Location ID 14800 | | | Location 14802 | Identification 14804 | Identifier 14806 | CCT 14808 | | 20 14812 | | Restricted 14814 |
| | Scheme ID 14816 | A 14818 | Identification Scheme 14820 | Identification 14822 | Identifier 14824 | xsd 14826 | token 14828 | 0..60 14830 | 0..1 14832 | |
| | Scheme Agency ID 14834 | A 14836 | Identification Scheme Agency 14838 | Identification 14840 | Identifier 14842 | xsd 14844 | token 14846 | 0..60 14850 | 0.. 1 14852 | |
| | Scheme Agency Scheme ID 14854 | A 14856 | Identification Scheme Agency 14858 | Scheme 14860 | Identifier 14862 | xsd 14864 | token 14866 | 0..60 14868 | 0..1 14870 | |
| | Scheme Agency-Scheme Agency ID 14872 | A 14874 | Identification Scheme Agency 14876 | Scheme Agency 14878 | Identifier 14880 | xsd 14882 | token 14884 | 3 14886 | 0..1 14888 | |

Fig. 149

| CDT | | Cat. | Obj. Class | Prop. Qual. | Prop. | Rep./ Assn. | Type | Type Name | Lgth. | Card. | Remarks |
|---|---|---|---|---|---|---|---|---|---|---|---|
| Location Internal ID 14900 | | | Location 14902 | Internal 14904 | Identification 14906 | Identifier 14908 | GDT 14910 | Location ID 14912 | 1..32 14914 | | Restricted 14916 |
| | Scheme ID 14918 | A 14920 | Identification Scheme 14920 | | Identification 14922 | Identifier 14924 | xsd 14926 | token 14928 | 1..60 14930 | 0..1 14932 | |
| | Scheme Agency ID 14934 | A 14936 | Identification Scheme Agency 14938 | | Identification 14938 | Identifier 14940 | xsd 14942 | token 14944 | 1..60 14946 | 0..1 14948 | |

Fig. 150

| CDT | Obj. Class | Prop. Qual. | Prop. | Rep./ Assn. | Type | Type Name | Lgth. | Remarks |
|---|---|---|---|---|---|---|---|---|
| Location Party ID 15000 | Location 15002 | Party 15004 | Identification 15006 | Identifier 15008 | GDT 15010 | Location ID 15012 | 1..20 15014 | Restricted 15016 |

Fig. 151

| CDT | | Cat. | Obj. Class | Prop. Qual. | Prop. | Rep./ Assn. | Type | Type Name | Lgth. | Card. | Remarks |
|---|---|---|---|---|---|---|---|---|---|---|---|
| Location Standard ID 15100 | | | Location 15102 | Standard 15104 | Identification 15106 | Identifier 15108 | GDT 15110 | Location ID 15112 | 13 15114 | | Restricted 15116 |
| | Scheme Agency ID 15118 | A 15120 | Identifica-tion Scheme Agency 15122 | | Identification 15124 | Identifier 15126 | xsd 15128 | token 15130 | 3 15132 | 1 15134 | |

Fig. 152

| GDT | | Cat. | Obj. Class | Prop. | Rep./ Assn. | Type | Type Name | Lgth. | Card. | Remarks |
|---|---|---|---|---|---|---|---|---|---|---|
| Log Item 15200 | | | | | Details 15202 | | | | | |
| | Type ID 15204 | E 15206 | Log Item 15208 | Type Identification 15210 | Identifier 15212 | CCT 15214 | Identifier 15216 | 1..40 15218 | 0..1 15220 | Restricted 15222 |
| | Severity Code 15224 | E 15226 | Log Item 15228 | Severity 15230 | Code 15232 | GDT 15234 | Log Item Severity Code 15236 | | 0..1 15238 | |
| | Note 15240 | E 15242 | Log Item 15244 | Note 15246 | Note 15248 | GDT 15250 | Note 15252 | 1..200 15254 | 1 15256 | Restricted 15258 |
| | Web Address 15260 | E 15262 | Log Item 15264 | Web Address 15266 | Web Address 15268 | CCT 15270 | Web Address 15272 | | 0..1 15274 | |

Fig. 153

| GDT | Obj. Class | Prop. | Rep./ Assn. | Type | Type Name | Lgth. |
|---|---|---|---|---|---|---|
| Log Item Severity Code 15300 | Log Item 15302 | Severity 15304 | Code 15306 | CCT 15308 | Code 15310 | 1 15312 |

Fig. 154

| GDT | | Cat. | Obj. Class | Prop. | Rep./ Assn. | Type | Type Name | Lgth. | Card. |
|---|---|---|---|---|---|---|---|---|---|
| Measure 15400 | | | | | Measure 15402 | xsd 15404 | decimal 15406 | 13.6 15408 | |
| | Unit Code 15410 | A 15412 | Measure 15414 | Unit 15416 | Code 15418 | xsd 15420 | token 15422 | 1..3 15424 | 1 15426 |

Fig. 155

| GDT | Obj. Class | Rep./ Assn. | Type | Type Name | Lgth. |
|---|---|---|---|---|---|
| Measure Unit Code 15500 | Measure Unit 15502 | Code 15504 | xsd 15506 | token 15508 | 1..3 15510 |

Fig. 156

| GDT | Obj. Class | Prop. | Rep./ Assn. | Type | Type Name | Lgth. | Remarks |
|---|---|---|---|---|---|---|---|
| Measure Unit Meaning Code 15600 | Measure Unit 15602 | Meaning 15604 | Code 15606 | CCT 15608 | Code 15610 | 3 15612 | Restricted 15614 |

Fig. 157

| GDT | Obj. Class | Prop. | Rep./ Assn. | Type | Type Name | Lgth. | Remarks |
|---|---|---|---|---|---|---|---|
| Message Type Code 15700 | Message 15702 | Type Code 15704 | Code 15706 | CCT 15708 | Code 15710 | 4 15712 | Restricted 15714 |

Fig. 158

| GDT | | Cat. | Obj. Class | Prop. | Rep./ Assn. | Type | Type Name | Lgth. | Card. |
|---|---|---|---|---|---|---|---|---|---|
| Name 15800 | | | Name 15802 | | Text 15804 | CCT 15806 | Text 15808 | | |
| | Language Code 15810 | A 15812 | Name 15814 | language Code 15816 | Code 15818 | xsd 15820 | language 15822 | 2..5 15824 | 0..1 15826 |

Fig. 159

| GDT | Prop. | Rep./ Assn. | Type | Type Name | Remarks |
|---|---|---|---|---|---|
| Note 15900 | Note 15902 | Text 15904 | CCT 15906 | Text 15908 | Restricted 15910 |

Fig. 160

| GDT | Obj. Class | Prop. | Rep./ Assn. | Type | Type Name | Lgth. | Remarks |
|---|---|---|---|---|---|---|---|
| Object Structure Relationship Type Code 16000 | Object Structure Relationship 16002 | Type Code 16004 | Code 16006 | CCT 16008 | Code 16010 | 3 16012 | Restricted 16014 |

Fig. 161

| GDT | Rep./Assn. Qual. | Rep./ Assn. | Type | Type Name | Lgth. |
|---|---|---|---|---|---|
| Ordinal Number Value 16100 | Ordinal Number 16102 | Value 16104 | xsd 16106 | Positive Integer 16108 | 1..9 16110 |

Fig. 162

| GDT | Cat. | Obj. Class | Prop. | Rep./ Assn. | Type | Type Name | Lgth. | Card. | Remarks |
|---|---|---|---|---|---|---|---|---|---|
| Partial Delivery 16200 | | Partial Delivery 16202 | | Details 16204 | | | | | |
| | E 16206 | Partial Delivery 16208 | Maximal Number 16210 | Integer 16212 | GDT 16214 | Integer Value 16216 | 1 16218 | 0..1 16220 | Zero not allowed 16222 |
| | E 16224 | Partial Delivery 16226 | Unlimited Indicator 16228 | Indicator 16230 | GDT 16232 | Value Unlimited Indicator 16234 | 1 16236 | 0..1 16238 | |

Fig. 163

| GDT | | Cat. | Obj. Class | Prop. | Rep./ Assn. | Type | Type Name | Lgth. | Card. | Remarks |
|---|---|---|---|---|---|---|---|---|---|---|
| Party ID 16300 | | | Party 16302 | Identification 16304 | Identifier 16306 | CCT 16308 | Identifier 16310 | 1..60 16312 | | Restricted 16314 |
| | scheme ID 16316 | A 16318 | Identification Scheme 16320 | Identification 16322 | Identifier 16324 | xsd 16326 | token 16328 | 1..60 16330 | 0..1 16332 | |
| | scheme Agency ID 16334 | A 16336 | Identification Scheme Agency 16338 | Identification 16340 | Identifier 16342 | xsd 16344 | token 16346 | 1..60 16348 | 0..1 16350 | |
| | scheme Agency Scheme ID 16352 | A 16354 | Identification Scheme Agency 16356 | Scheme 16358 | Identifier 16360 | xsd 16362 | token 16364 | 1..60 16366 | 0..1 16368 | |
| | scheme Agency Scheme Agency ID 16370 | A 16372 | Identification Scheme Agency 16374 | Scheme Agency 16376 | Identifier 16378 | xsd 16380 | token 16382 | 3 16384 | 0..1 16386 | |

Fig. 164

| CDT | | Cat. | Obj. Class | Prop. Qual. | Prop. | Rep./ Assn. | Type | Type Name | Lgth. | Card. | Remarks |
|---|---|---|---|---|---|---|---|---|---|---|---|
| Party Internal ID 16400 | | | Party 16402 | Internal 16404 | Identification 16406 | Identifier 16408 | GDT 16410 | Party ID 16412 | 1..32 16414 | | Restricted 16416 |
| | scheme ID 16418 | A 16420 | Identification Scheme 16422 | | Identification 16424 | Identifier 16426 | xsd 16428 | token 16430 | 1..60 16432 | 0..1 16434 | |
| | scheme Agency ID 16436 | A 16438 | Identification Scheme Agency 16440 | | Identification 16442 | Identifier 16444 | xsd1 16446 | token 16448 | 1..60 16450 | 0..1 16452 | |

Fig. 165

| CDT | Obj. Class | Prop. Qual. | Prop. | Rep./ Assn. | Type | Type Name | Lgth. | Remarks |
|---|---|---|---|---|---|---|---|---|
| Party Party ID 16500 | Party 16502 | Party 16504 | Identification 16506 | Identifier 16508 | GDT 16510 | Party ID 16512 | 1..60 16514 | Restricted 16516 |

Fig. 166

| CDT | | Cat. | Obj. Class | Prop. Qual. | Prop. | Rep./ Assn. | Type | Type Name | Lgth. | Card. | Remarks |
|---|---|---|---|---|---|---|---|---|---|---|---|
| Party Standard ID 16600 | | | Party 16602 | Standard 16604 | Identifica-tion 16606 | Identifier 16608 | GDT 16610 | Party ID 16612 | 1..13 16614 | | Restricted 16616 |
| | scheme Agency ID 16618 | A 16620 | Identification Scheme Agency 16622 | | Identifica-tion 16624 | Identifier 16626 | xsd 16628 | token 16630 | 3 16632 | 1 16634 | |

Fig. 167

| GDT | | Cat. | Obj. Class | Prop. | Rep./ Assn. | Type | Type Name | Lgth. | Card. | Remarks |
|---|---|---|---|---|---|---|---|---|---|---|
| Payment Card 16700 | | | Payment Card 16702 | | Details 16704 | | | | | |
| | ID 16706 | E 16708 | Payment Card 16710 | Identifica-tion 16712 | Identifier 16714 | GDT 16716 | Payment Card ID 16718 | | 1 16720 | |
| | Reference ID 16722 | E 16724 | Payment Card 16726 | Reference Identifica-tion 16728 | Identifier 16730 | CCT 16732 | Identifier 16734 | 1..25 16736 | 0..1 16738 | Restricted 16740 |
| | Sequence ID 16740 | E 16742 | Payment Card 16744 | Sequence Identifica-tion 16746 | Identifier 16748 | CCT 16750 | Identifier 16752 | 1..10 16754 | 0..1 16756 | Restricted 16758 |
| | Holder 16760 | E 16762 | Payment Card 16764 | Holder 16766 | Text 16768 | CCT 16770 | text 16772 | 1..40 16774 | 0..1 16776 | |
| | Expiration Date 16778 | E 16780 | Payment Card 16782 | Expiration Date 16784 | Date 16786 | GDT 16788 | Date 16790 | | 1 16792 | |

Fig. 168

| GDT | | Cat. | Obj. Class | Prop. | Rep./ Assn. | Type | Type Name | Lgth. | Card. | Remarks |
|---|---|---|---|---|---|---|---|---|---|---|
| Payment Card ID 16800 | | E 16802 | Payment Card 16804 | Identification 16806 | Identifier 16808 | CCT 16810 | Identifier 16812 | 1..25 16814 | 1 16816 | Restricted 16818 |
| | scheme ID 16820 | A 16822 | Identification Scheme 16824 | Identification 16826 | Identifier 16828 | xsd 16830 | token 16832 | 1..60 16834 | 1 16836 | |
| | scheme Agency ID 16838 | A 16840 | Identification Scheme Agency 16842 | Identification 16844 | Identifier 16846 | xsd 16848 | token 16850 | 1..60 16852 | 1 16854 | |
| | scheme Agency Scheme ID 16856 | A 16858 | Identification Scheme Agency 16860 | Scheme 16862 | Identifier 16864 | xsd 16866 | token 16868 | 1..60 16870 | 0..1 16872 | |
| | scheme Agency Scheme Agency ID 16874 | A 16876 | Identification Scheme Agency 16878 | Scheme Agency 16880 | Identifier 16882 | xsd 16884 | token 16886 | 3 16888 | 0..1 16890 | |

Fig. 169

| CDT | Obj. Class | Prop. | Rep./ Assn. | Type | Type Name | Lgth. | Remarks |
|---|---|---|---|---|---|---|---|
| Payment Form Code 16900 | Payment 16902 | Form Code 16904 | Code 16906 | CCT 16908 | Code 16910 | 2 16912 | Restricted 16914 |

Fig. 170

| GDT | Cat. | Rep./ Assn. | Type | Type Name | Lgth. |
|---|---|---|---|---|---|
| Percent 17000 | E 17002 | Percent 17004 | xsd 17006 | decimal 17008 | 10.6 17010 |

Fig. 171a

| GDT PersonName | | | Cat. | Obj. Class | Prop. | Rep./ Assn. | Type | Type Name | Lgth. | Card. | Remarks |
|---|---|---|---|---|---|---|---|---|---|---|---|
| Person Name 17100 | | | E 17102 | Person Name 17104 | | Details 17106 | | | | | |
| | Formatted Name 17108 | | E 17110 | Person Name 17112 | For-matted Name 17114 | Name 17116 | xsd 17118 | string 17120 | ..80 17122 | 0..1 17124 | |
| | Legal Name 17126 | | E 17128 | Person Name 17130 | Legal Name 17132 | Name 17134 | xsd 17136 | string 17138 | ..80 17140 | 0..1 17142 | |
| | Given Name 17144 | | E 17146 | Person Name 17148 | Given Name 17150 | Name 17152 | xsd 17154 | string 17156 | ..40 17158 | 0.. un-bounded 17160 | |
| | Preferred Given Name 17162 | | E 17164 | Person Name 17166 | Pre-ferred Given Name 17168 | Name 17170 | xsd 17172 | string 17174 | ..40 17176 | 0..1 17178 | |
| | Middle Name 17180 | | E 17182 | Person Name 17184 | Middle Name 17186 | Name 17188 | xsd 17190 | string 17192 | ..40 17194 | 0.. un-bounded 17196 | |

Fig. 171b

| GDT Per-son-Name | | | Cat. | Obj. Class | Prop. | Rep./ Assn. | Type | Type Name | Lgth. | Card. | Remarks |
|---|---|---|---|---|---|---|---|---|---|---|---|
| | Family 17198 | | E 17101 | Person Name 17103 | Family 17105 | Detail 17107 | | | | 0.. un-bounded 17109 | |
| | | Family Name 17111 | E 17113 | Family 17113 | Family Name 17115 | Name 17117 | xsd 17119 | string 17121 | ..40 17123 | 1 17125 | |
| | | Primary Indicator 17127 | E 17129 | Family 17131 | Family Name Primary Code 17133 | Code 17135 | CCT 17137 | Indicator 17139 | 1 17141 | 0..1 17143 | No default value 17145 |
| | | Family Name Prefix 17147 | E 17149 | Family 17151 | Family Name Prefix 17153 | Text 17155 | xsd 17157 | string 17159 | ..20 17161 | 0..1 17163 | Different from the HR-XML Proposal 17165 |
| | Affix 17167 | | E 17169 | Person Name 17171 | Affix 17173 | Detail 17175 | | | | 0.. un-bounded 17177 | |
| | | Affix Name 17179 | E 17181 | Affix 17183 | Affix 17185 | Name 17187 | xsd 17189 | string 17191 | ..20 17193 | 1 17195 | |

Fig. 171c

| GDT Person Name | | | Cat. | Obj. Class | Prop. | Rep./ Assn. | Type | Type Name | Lgth. | Card. | Remarks |
|---|---|---|---|---|---|---|---|---|---|---|---|
| | | Affix Code 17197 | E 17199 | Affix 17102a | Affix Code 17104a | Code 17106a | CCT 17108a | Code 17110a | 1..20 17112a | 1 17114a | |

Fig. 172

| GDT | | Cat. | Obj. Class | Prop. | Rep./ Assn. | Type | Type Name | Lgth. | Card. | Remarks |
|---|---|---|---|---|---|---|---|---|---|---|
| Personnel Time Event ID 17200 | | | Personnel Time Event 17202 | Identification 17204 | Identifier 17206 | GDT 17208 | Identifier 17210 | 1..40 17212 | | Restricted 17214 |
| | scheme ID 17216 | A 17218 | Identification Scheme 17220 | Identification 17222 | Identifier 17224 | xsd 17226 | token 17227 | 1..60 17230 | 0..1 1 17232 | |
| | scheme Agency ID 17234 | A 17236 | Identification Scheme Agency 17238 | Identification 17240 | Identifier 17242 | xsd 17244 | token 17246 | 1..60 17248 | 0..1 17250 | |

Fig. 173

| GDT | | Cat. | Obj. Class | Prop. | Rep./ Assn. | Type | Type Name | Lgth. | Card. | Remarks |
|---|---|---|---|---|---|---|---|---|---|---|
| Personnel Time Event Type ID 17300 | | | Personnel Time Event Type 17302 | Identification 17304 | Identifier 17306 | GDT 17308 | Identifier 17310 | 1..40 17312 | | Restricted 17314 |
| | scheme ID 17316 | A 17318 | Identification Scheme 17320 | Identification 17322 | Identifier 17324 | xsd 17326 | token 17328 | 1..60 17330 | 0..1 17332 | |
| | scheme Agency ID 17334 | A 17336 | Identification Scheme Agency 17338 | Identification 17340 | Identifier 17342 | xsd 17344 | token 17346 | 1..60 17348 | 0..1 17350 | |

Fig. 174

| GDT | | Cat. | Obj. Class | Prop. | Rep./ Assn. | Type | Type Name | Lgth. | Card. | Remarks |
|---|---|---|---|---|---|---|---|---|---|---|
| Personnel Time ID 17400 | | | Personnel Time 17402 | Identification 17404 | Identifier 17406 | GDT 17408 | Identifier 17410 | 1..40 17412 | | Restricted 17414 |
| | scheme ID 17416 | A 17418 | Identification Scheme 17420 | Identification 17422 | Identifier 17424 | xsd 17426 | token 17428 | 1..60 17430 | 0..1 17432 | |
| | scheme Agency ID 17434 | A 17436 | Identification Scheme Agency 17438 | Identification 17440 | Identifier 17442 | xsd 17444 | token 17446 | 1..60 17448 | 0..1 17450 | |

Fig. 175

| GDT | | Cat. | Obj. Class | Prop. | Rep./ Assn. | Type | Type Name | Lgth. | Card. | Remarks |
|---|---|---|---|---|---|---|---|---|---|---|
| Personnel Time Type ID 17500 | | | Personnel Time Type 17502 | Identification 17504 | Identifier 17506 | GDT 17508 | Identifier 17510 | 1..40 17512 | | Restricted 17514 |
| | scheme ID 17516 | A 17518 | Identification Scheme 17520 | Identification 17522 | Identifier 17524 | xsd 17526 | token 17528 | 1..60 17530 | 0..1 17532 | |
| | scheme Agency ID 17534 | A 17536 | Identification Scheme Agency 17538 | Identification 17540 | Identifier 17542 | xsd 17544 | token 17546 | 1..60 17548 | 0..1 17550 | |

Fig. 176

| GDT | | Cat. | Obj. Class | Prop. | Rep./ Assn. | Type | Type Name | Lgth. | Card. | Remarks |
|---|---|---|---|---|---|---|---|---|---|---|
| Phone Number 17600 | | | Phone Number 17602 | | Details 17604 | | | | | |
| | Area ID 17606 | E 17608 | Phone Number 17610 | Phone Number Area 17612 | Identifier 17614 | CCT 17616 | Identifier 17618 | 1..10 17620 | 0..1 17622 | Restricted 17624 |
| | Subscriber ID 17626 | E 17628 | Phone Number 17630 | Phone Number Sub-scriber 17632 | Identifier 17634 | CCT 17636 | Identifier 17638 | 1..30 17640 | 0..1 17642 | Restricted 17644 |
| | Extension ID 17646 | E 17648 | Phone Number 17650 | Phone Number Exten-sion 17652 | Identifier 17654 | CCT 17656 | Identifier 17658 | 1..10 17660 | 0..1 17662 | Restricted 17664 |
| | Country Code 17666 | E 17668 | Phone Number 17670 | Phone Number Country 17672 | Code 17674 | GDT 17676 | Country Code 17678 | | 0..1 17680 | |

Fig. 177

| GDT | | Cat. | Obj. Class | Prop. | Rep./ Assn. | Type | Type Name |
|---|---|---|---|---|---|---|---|
| Price 17700 | | | Price 17702 | | Details 17704 | | |
| | Amount 17706 | E 17708 | Price 17710 | Amount 17712 | Amount 17714 | GDT 17716 | Amount 17718 |
| | Base Quantity 17720 | E 17722 | Price 17724 | Base 17726 | Quantity 17728 | GDT 17730 | Quantity 17732 |

Fig. 178

| GDT | | Cat. | Obj. Class | Prop. | Rep./ Assn. | Type | Type Name | Lgth. | Card. |
|---|---|---|---|---|---|---|---|---|---|
| Price Component 17800 | | C 17802 | Price Component 17804 | | Details 17806 | | | | |
| | Type Code 17808 | E 17810 | Price Component 17812 | Type Code 17814 | Code 17816 | GDT 17818 | Price Component Type Code 17820 | 4 17822 | 1 17824 |
| | Description 17826 | E 17828 | Price Component 17830 | Description 17832 | Text 17834 | GDT 17836 | Description 17838 | | 0..1 17840 |
| | Base Amount 17842 | E 17844 | Price Component 17846 | Base Amount 17848 | Amount 17850 | GDT 17852 | Amount 17854 | | 0..1 17856 |
| | Percent 17858 | E 17860 | Price Component 17862 | Percent 17864 | Percent 17866 | GDT 17868 | Percent 17870 | | 0..1 17872 |
| | Amount 17874 | E 17876 | Price Component 17878 | Amount 17880 | Amount 17882 | GDT 17884 | Amount 17886 | | 1 17888 |

Fig. 179

| GDT | Obj. Class | Prop. | Rep./ Assn. | Type | Type Name | Lgth. |
|---|---|---|---|---|---|---|
| Price Component Type Code 17900 | Price Component 17902 | Type Code 17904 | Code 17906 | CCT 17908 | Code 17910 | 4 17912 |

Fig. 180

| CDT | | | Cat. | Obj. Class Qual. | Obj. Class | Prop. | Rep./ Assn. | Type | Type Name | Card. | Remarks |
|---|---|---|---|---|---|---|---|---|---|---|---|
| Price Time Series 18000 | | | | Price 18002 | Time Series 18004 | | Details 18006 | GDT 18008 | Time Series 18010 | | Restricted 18012 |
| | Item 18014 | | E 18016 | | Time Series 18018 | Item 18020 | Details 18022 | | | 1..n 18024 | |
| | | Validity-Period 18026 | E 18028 | | Time Series 18030 | Validity Period 18032 | Details 18034 | GDT 18036 | Date Time Period 18038 | 1 18040 | |
| | | Price 18040 | E 18042 | | Time Series 18042 | Price 18044 | Price 18046 | GDT 18048 | Price 18050 | 1 18052 | |
| | | Fixed-Indicator 18054 | E 18056 | | Time Series 18058 | Fixed Indicator 18060 | Indicator 18062 | GDT 18064 | Fixed Indicator 18066 | 0..1 18068 | |

Fig. 181a

| GDT | | | Cat. | Obj. Class | Prop. | Rep./ Assn. | Type | Type Name | Card. |
|---|---|---|---|---|---|---|---|---|---|
| Procure-ment Cost Upper Limit 18100 | | | | Procure-ment Cost 18102 | Upper Limit 18104 | Details 18106 | | | |
| | Overall Limit 18108 | | E 18110 | Procure-ment Cost Upper Limit 18112 | Overall Limit 18114 | Details 18116 | | | 1 18118 |
| | | Amount 18120 | E 18122 | Overall Limit 18124 | Amount 18124 | Amount 18126 | GDT 18128 | Amount 18130 | 0..1 18132 |
| | | Amount Unlimited Indicator 18134 | E 18136 | Overall Limit 18138 | Amount Unlimited Indicator 18140 | Indicator 18142 | GDT 18144 | Value Unlimited Indicator 18146 | 0..1 18148 |
| | | Expected Amount 18150 | E 18152 | Overall Limit 18154 | Expected Amount 18156 | Amount 18158 | GDT 18160 | Amount 18162 | 0..1 18164 |

Fig. 181b

| GDT | | | Cat. | Obj. Class | Prop. | Rep./ Assn. | Type | Type Name | Card. |
|---|---|---|---|---|---|---|---|---|---|
| | Contract Partial Limit 18166 | | E 18168 | Procure-ment Cost Upper Limit 18170 | Contract Partial Limit 18172 | Details 18174 | | | 0..n 18176 |
| | | Amount 18178 | E 18180 | Contract Partial Limit 18182 | Amount 18184 | Amount 18186 | GDT 18188 | Amount 18190 | 0..1 18192 |
| | | Amount Unlimited Indicator 18194 | E 18196 | Contract Partial Limit 18198 | Amount Unlimited Indicator 181100 | Indicator 181102 | GDT 181104 | Value Unlimited 181106 | 0..1 181108 |
| | | Contract Refer-ence 181110 | E 181112 | Contract Partial Limit 181114 | Contract Reference 181116 | Business Transaction Document Reference 181118 | GDT 181120 | Business Trans-action Document Reference 181122 | 1 181124 |

Fig. 181c

| GDT | | | Cat. | Obj. Class | Prop. | Rep./ Assn. | Type | Type Name | Card. |
|---|---|---|---|---|---|---|---|---|---|
| | Miscel-laneous Partial Limit 181126 | | E 181128 | Procure-ment Cost Upper Limit 181130 | Miscellane-ous Partial Limit 181132 | Details 181134 | | | 0..1 181136 |
| | | Amount 181138 | E 181140 | Miscel-laneous Partial Limit 181142 | Amount 181144 | Amount 181146 | GDT 181148 | Amount 181150 | 0..1 181152 |
| | | Amount Unlimited Indicator 181154 | E 181156 | Miscel-laneous Partial Limit 181158 | Amount Unlimited Indicator 181160 | Indicator 181162 | GDT 181164 | Value Unlimited Indicator 181166 | 0..1 181168 |

Fig. 182a

| GDT | | Cat. | Obj. Class | Prop. | Rep./ Assn. | Type | Data Type | Lgth. | Card. | Remarks |
|---|---|---|---|---|---|---|---|---|---|---|
| Product Cat. ID 18200 | | | Product Cat. 18202 | Identification 18204 | Identifier 18206 | CCT 18208 | Identifier 18210 | 1..40 18212 | | Restricted 18214 |
| | scheme ID 18216 | A 18218 | Identification Scheme 18220 | Identification 18222 | Identifier 18228 | xsd 18230 | token 18232 | 1..60 18234 | 0..1 18236 | |
| | Scheme Version ID 18238 | A 18240 | Identification Scheme 18242 | Version 18244 | Identifier 18246 | xsd 18248 | token 18250 | 1..15 18252 | 0..1 18254 | |
| | scheme Agency ID 18256 | A 18258 | Identification Scheme Agency 18260 | Identification 18262 | Identifier 18264 | xsd 18266 | token 18268 | 1..60 18270 | 0..1 18272 | |

Fig. 182b

| GDT | | Cat. | Obj. Class | Prop. | Rep./ Assn. | Type | Data Type | Lgth. | Card. | Remarks |
|---|---|---|---|---|---|---|---|---|---|---|
| | scheme Agency Scheme ID 18274 | A 18276 | Identification Scheme Agency 18278 | Scheme 18280 | Identifier 18282 | xsd 18284 | token 18286 | 1..60 18288 | 0..1 18290 | |
| | scheme Agency Scheme Agency ID 18292 | A 18294 | Identification Scheme Agency 18296 | Scheme Agency 18298 | Identifier 18201 | xsd 18203 | token 18205 | 3 18207 | 0..1 18209 | |

Fig. 183

| CDT | | Cat. | Obj. Class | Prop. | Rep./ Assn. | Type | Type Name | Lgth. | Card. | Remarks |
|---|---|---|---|---|---|---|---|---|---|---|
| Product Cat. Internal ID 18300 | | | Product Cat. 18302 | Internal Identification 18304 | Identifier 18306 | GDT 18308 | Product Cat. ID 18310 | 1..40 18312 | | Restricted 18314 |
| | scheme ID 18316 | A 18318 | Identification Scheme 18320 | Identification 18322 | Identifier 18324 | xsd 18326 | token 18328 | 1..60 18330 | 0..1 18332 | |
| | scheme Agency ID 18334 | A 18336 | Identification Scheme Agency 18338 | Identification 18340 | Identifier 18342 | xsd 18344 | token 18346 | 1..60 18348 | 0..1 18350 | |

Fig. 184

| CDT | Obj. Class | Prop. Qual. | Prop. | Rep./ Assn. | Type | Type Name | Lgth. | Remarks |
|---|---|---|---|---|---|---|---|---|
| Product Cat. Party ID 18400 | Product Cat. 18402 | Party 18404 | Identification 18406 | Identifier 18408 | GDT 18410 | Product Cat. ID 18412 | 1..40 18414 | Restricted 18416 |

Fig. 185

| CDT | | Cat. | Obj. Class | Prop. Qual. | Prop. | Rep./ Assn. | Type | Type Name | Lgth. | Card. | Remarks |
|---|---|---|---|---|---|---|---|---|---|---|---|
| Product Cat. Standard ID 18500 | | | Product Cat. 18502 | Standard 18504 | Identification 18506 | Identifier 18508 | GDT 18510 | Product Cat. ID 18512 | 1..40 18514 | | Restricted 18516 |
| | scheme ID 18518 | A 18520 | Identification Scheme 18522 | | Identification 18524 | Identifier 18526 | xsd 18528 | token 18530 | 1..60 18532 | 0..1 18534 | |
| | Scheme Version ID 18536 | A 18538 | Identification Scheme 18540 | | Version 18542 | Identifier 18544 | xsd 18546 | token 18548 | 1..15 18550 | 0..1 18552 | |
| | scheme Agency ID 18554 | A 18556 | Identification Scheme Agency 18558 | | Identification 18560 | Identifier 18562 | xsd 18564 | token 18566 | 3 18568 | 1 18570 | |

Fig. 186

| GDT | Cat. | Obj. Class | Prop. | Rep./ Assn. | Type | Type Name | Lgth. | Remarks |
|---|---|---|---|---|---|---|---|---|
| Product Change ID 18600 | E 18602 | Product Change 18604 | Identification 18606 | Identifier 18608 | CCT 18610 | Identifier 18612 | 1..32 18614 | Restricted 18616 |

Fig. 187

| GDT | Obj. Class | Prop. | Rep./ Assn. | Type | Type Name | Lgth. | Remarks |
|---|---|---|---|---|---|---|---|
| Product Demand Influencing Event Status Code 18700 | Product Demand Influencing Event 18702 | Status 18704 | Code 18706 | CCT 18708 | Code 18710 | 1..35 18712 | Restricted 18714 |

Fig. 188

| GDT | Obj. Class | Prop. | Rep./ Assn. | Type | Type Name | Lgth. | Remarks |
|---|---|---|---|---|---|---|---|
| Product Demand Influencing Event Type Code 18800 | Product Demand Influencing Event 18802 | Type 18804 | Code 18806 | CCT 18808 | Code 18810 | 1..35 18812 | Restricted 18814 |

Fig. 189

| GDT | Obj. Class | Prop. | Rep./ Assn. | Type | Type Name |
|---|---|---|---|---|---|
| Product Discontinuation Indicator 18900 | Product 18902 | Discontinuation 18904 | Indicator 18906 | CCT 18908 | Indicator 18910 |

Fig. 190a

| GDT | | Cat. | Obj. Class | Prop. | Rep./ Assn. | Type | Type Name | Lgth. | Card. | Remarks |
|---|---|---|---|---|---|---|---|---|---|---|
| Product ID 19000 | | | Product 19002 | Identifi-cation 19004 | Identifier 19006 | CCT 19008 | Identifier 19010 | 1..60 19012 | | Restricted 19014 |
| | scheme ID 19016 | A 19018 | Identification Scheme 19020 | Identifi-cation 19022 | Identifier 19024 | xsd 19026 | token 19028 | 1..60 19030 | 0..1 19032 | |
| | scheme Agency ID 19034 | A 19036 | Identification Scheme Agency 19038 | Identifi-cation 19040 | Identifier 19042 | xsd 19044 | token 19046 | 1..60 19048 | 0..1 19050 | |

Fig. 190b

| GDT | | Cat. | Obj. Class | Prop. | Rep./ Assn. | Type | Type Name | Lgth. | Card. | Remarks |
|---|---|---|---|---|---|---|---|---|---|---|
| | scheme Agency Scheme ID 19052 | A 19054 | Identification Scheme Agency 19056 | Scheme 19058 | Identifier 19060 | xsd 19062 | token 19064 | 1..60 19066 | 0..1 19068 | |
| | scheme Agency Scheme Agency ID 19070 | A 19072 | Identification Scheme Agency 19074 | Scheme Agency 19076 | Identifier 19078 | xsd 19080 | token 19082 | 3 19084 | 0..1 19086 | |

Fig. 191

| CDT | | Cat. | Obj. Class | Prop. Qual. | Prop. | Rep./ Assn. | Type | Type Name | Lgth. | Card. | Remarks |
|---|---|---|---|---|---|---|---|---|---|---|---|
| Product Internal ID 19100 | | | Product 19102 | Internal 19104 | Identification 19106 | Identifier 19108 | GDT 19110 | Product ID 19112 | 1..60 19114 | | Restricted 19116 |
| | scheme ID 19118 | A 19120 | Identification Scheme 19122 | | Identification 19124 | Identifier 19126 | xsd 19128 | token 19130 | 1..60 19132 | 0..1 19134 | |
| | scheme Agency ID 19136 | A 19138 | Identification Scheme Agency 19140 | | Identification 19140 | Identifier 19142 | xsd 19144 | token 19146 | 1..60 19148 | 0..1 19150 | |

Fig. 192

| CDT | Obj. Class | Prop. Qual. | Prop. | Rep./ Assn. | Type | Type Name | Lgth. | Remarks |
|---|---|---|---|---|---|---|---|---|
| Product Party ID 19200 | Product 19202 | Party 19204 | Identification 19206 | Identifier 19208 | GDT 19210 | Product ID 19212 | 1..60 19214 | Restricted 19216 |

Fig. 193

| GDT | | Cat. | Obj. Class | Prop. Qual. | Prop. | Rep./ Assn. | Type | Type Name | Lgth. | Card. | Remarks |
|---|---|---|---|---|---|---|---|---|---|---|---|
| Product Standard ID 19300 | | | Product 19302 | Standard 19304 | Identifi-cation 19306 | Identifier 19308 | GDT 19310 | Product ID 19312 | 1..14 19314 | | Restricted 19316 |
| | scheme ID 19318 | Attribute 19320 | Identification Scheme 19322 | | Identifi-cation 19324 | Identifier 19326 | xsd 19328 | token 19330 | 1..60 19332 | 0..1 19334 | |
| | scheme Agency ID 19336 | Attribute 19338 | Identification Scheme Agency 19340 | | Identifi-cation 19342 | Identifier 19344 | xsd 19346 | token 19348 | 3 19350 | 1 19352 | |

Fig. 194a

| GDT | | Cat. | Obj. Class | Prop. | Rep./ Assn. | Type | Type Name | Lgth. | Card. |
|---|---|---|---|---|---|---|---|---|---|
| Product Tax 19400 | | | Product Tax 19401 | | Details 19402 | | | | |
| | Country Code 19403 | Element 19404 | Product Tax 19405 | Country Code 19406 | Code 19407 | GDT 19408 | Country Code 19409 | | 0..1 19410 |
| | Jurisdiction Code 19411 | Element 19412 | Product Tax 19413 | Tax Jurisdiction Code 19414 | Code 19415 | GDT 19416 | Tax Jurisdiction Code 19417 | | 0..1 19418 |
| | Type Code 19419 | Element 19420 | Product Tax 19421 | Type Code 19422 | Code 19423 | GDT 19424 | Product Tax Type Code 19425 | | 0..1 19426 |
| | Type Description 19427 | Element 19428 | Product Tax 19429 | Type Description 19430 | Text 19431 | GDT 19432 | Description 19433 | | 0..1 19434 |
| | Base Amount 19435 | Element 19436 | Product Tax 19437 | Base Amount 19438 | Amount 19439 | GDT 19440 | Amount 19441 | | 0..1 19442 |

Fig. 194b

| GDT | | Cat. | Obj. Class | Prop. | Rep./ Assn. | Type | Type Name | Lgth. | Card. |
|---|---|---|---|---|---|---|---|---|---|
| | Percent 19443 | Element 19444 | Product Tax 19445 | Percent 19446 | Percent 19447 | GDT 19448 | Percent 19449 | | 0..1 19450 |
| | Amount 19451 | Element 19452 | Product Tax 19453 | Amount 19454 | Amount 19455 | GDT 19456 | Amount 19457 | | 0..1 19458 |
| | NonDeduc-tible Percent 19459 | Element 19460 | Product Tax 19461 | NonDeduc-tible Percent 19462 | Decimal 19463 | GDT 19464 | Percent 19465 | | 0..1 19466 |
| | Non Deductible Amount 19467 | Element 19468 | Product Tax 19469 | NonDeduc-tible Amount 19470 | Amount 19471 | GDT 19472 | Amount 19473 | | 0..1 19474 |
| | Business Transaction Document Item Group ID 19475 | Element 19476 | Product Tax 19477 | Business Transaction Document Item Group Identification 19478 | Identifier 19479 | GDT 19480 | Business Transaction Document Item Group ID 19481 | | 0..1 19482 |

Fig. 194c

| GDT | | Cat. | Obj. Class | Prop. | Rep./ Assn. | Type | Type Name | Lgth. | Card. |
|---|---|---|---|---|---|---|---|---|---|
| | Triangu-lation Indicator 19483 | Element 19484 | Product Tax 19485 | Triangu-lation 19486 | Indicator 19487 | CCT 19488 | Indicator 19489 | | 0..1 19490 |
| | Legally Required Phrase 19491 | Element 19492 | Product Tax 19493 | Legally Required Phrase 19494 | Text 19495 | CCT 19496 | Text 19497 | 1..256 19498 | 0..1 19499 |

Fig. 195

| GDT | Obj. Class | Prop. | Rep./ Assn. | Type | Type Name | Lgth. | Remarks |
|---|---|---|---|---|---|---|---|
| Product Tax Event Type Code 19500 | Product Tax Event 19502 | Type Code 19504 | Code 19506 | CCT 19508 | Code 19510 | 3..6 19512 | Restricted 19514 |

Fig. 196

| GDT | Obj. Class | Prop. | Rep./ Assn. | Type | Type Name | Lgth. | Remarks |
|---|---|---|---|---|---|---|---|
| Product Tax Type Code 19600 | Product tax Type 19602 | Code 19604 | Code 19606 | CCT 19608 | Code 19610 | 3 19612 | Restricted 19614 |

Fig. 197

| GDT | Cat. | Obj. Class | Prop. | Rep./ Assn. | Type | Type Name | Lgth. | Remarks |
|---|---|---|---|---|---|---|---|---|
| Product Type Code 19700 | Element 19702 | Product 19704 | Type 19706 | Code 19708 | CCT 19710 | Code 19712 | 1..2 19714 | Restricted 19716 |

Fig. 198

| GDT | Obj. Class | Prop. | Rep./ Assn. | Type | Type Name | Lgth. | Remarks |
|---|---|---|---|---|---|---|---|
| Promotion ID 19800 | Promotion 19802 | Identification 19804 | Identifier 19806 | CCT 19808 | Identifier 19810 | 1..35 19812 | Restricted 19814 |

Fig. 199a

| GDT | | Cat. | Obj. Class | Prop. Qual. | Prop. | Rep./ Assn. | Type | Type Name | Lgth. | Card. | Remarks |
|---|---|---|---|---|---|---|---|---|---|---|---|
| Prop. 19900 | | | | | | Details 19901 | | | | | |
| | Action Code 19902 | Attribute 19903 | Prop. 19904 | | Action 19905 | Code 19906 | GDT 19907 | Action-Code 19908 | | 0..1 19909 | |
| | ID 19910 | Element 19911 | Prop. 19912 | | Iden-tification 19913 | Prop.ID 19914 | GDT 19915 | Prop.ID 19916 | | 1 19917 | |
| | Version ID 19918 | Element 19919 | Prop. 19920 | | Version Iden-tification 19921 | Version ID 19922 | GDT 19923 | Version ID 19924 | | 0..1 19925 | |
| | Definition Class Re-ference 19926 | Element 19927 | Prop. 19928 | | Definition Class Reference 19929 | Prop. Definition Class Refer-ence 19930 | GDT 19931 | Prop.Def-inition Class Ref-erence 19932 | | 0..1 19933 | |
| | Revision ID 19934 | Element 19935 | Prop. 19936 | | Revision identifi-cation 19937 | Identifier 19938 | CCT 19939 | Identifier 19940 | 1..10 19941 | 0..1 19942 | Restrict-ed 19943 |

Fig. 199b

| GDT | | Cat. | Obj. Class | Prop. Qual. | Prop. | Rep./ Assn. | Type | Type Name | Lgth. | Card. | Remarks |
|---|---|---|---|---|---|---|---|---|---|---|---|
| | Version Date Time 19952 | Element 19953 | Prop. 19954 | | Version 19955 | Date Time 19956 | GDT 19957 | Date Time 19958 | | 0..1 19959 | |
| | Revision Date Time 19960 | Element 19961 | Prop. 19962 | | Revision 19963 | Date Time 19964 | GDT 19965 | Date Time 19966 | | 0..1 19967 | |
| | Subject Area Code 19968 | Element 19969 | Prop. 19970 | | Subject Area 19971 | Code 19972 | GDT 19973 | Subject Area Code 19974 | | 0..n 19975 | |
| | Preferred Name 19976 | Element 19977 | Prop. 19978 | Preferred 19979 | Name 19980 | Name 19981 | GDT 19982 | Name 19983 | | 1..n 19984 | |
| | Synonymous Name 19985 | Element 19986 | Prop. 19987 | Synonymous 19988 | Name 19989 | Name 19990 | GDT 19991 | Name 19992 | | 0..n 19993 | |
| | Abbreviation Name 19994 | Element 19995 | Prop. 19996 | Abbreviation 19997 | Name 19998 | Name 19999 | GDT 19901a | Name 19902a | | 0..n 19903a | |

Fig. 199c

| GDT | | Cat. | Obj. Class | Prop. Qual. | Prop. | Rep./ Assn. | Type | Type Name | Lgth. | Card. | Remarks |
|---|---|---|---|---|---|---|---|---|---|---|---|
| | Defining Des-cription 19904a | Element 19905a | Prop. 19906a | Defining 19907a | Descrip-tion 19908a | Des-cription 19909a | GDT 19910a | Descrip-tion 19911a | | 0..n 19912a | |
| | Addi-tional Des-cription 19913a | Element 19914a | Prop. 19915a | Additional 19916a | Des-cription 19917a | Des-cription 19918a | GDT 19919a | Descrip-tion 19920a | | 0..n 19921a | |
| | Usage Des-cription 19922a | Element 19923a | Prop. 19924a | Usage 19925a | Descrip-tion 19926a | Des-cription 19927a | GDT 19928a | Descrip-tion 19929a | | 0..n 19930a | |
| | Preferred Symbol Note 19931a | Element 19932a | Prop. 19933a | Preferred 19934a | Symbol 19935a | Note 19936a | GDT 19937a | Note 19938a | | 0..1 19939a | |
| | Synonym ous Symbol Note 19940a | Element 19941a | Prop. 19942a | Syno-nymal 19943a | Symbol 19944a | Note 19945a | GDT 19946a | Note 19947a | | 0..n 19948a | |

Fig. 199d

| GDT | | Cat. | Obj. Class | Prop. Qual. | Prop. | Rep./ Assn. | Type | Type Name | Lgth. | Card. | Remarks |
|---|---|---|---|---|---|---|---|---|---|---|---|
| | Definition Source Docu- ment Web Address 19949a | Element 19950a | Prop. 19951a | Definition Source 19952a | Docu- ment 19953a | Web Address 19954a | GDT 19955a | Web Address 19956a | | 0..1 19957a | |
| | Icon Attach- ment 19958a | Element 19959a | Prop. 19960a | | Icon 19961a | Attach- ment 19962a | GDT 19963a | Attach- ment 19964a | | 0..1 19965a | |
| | Figure Attach- ment 19966a | Element 19967a | Prop. 19968a | | Figure 19969a | Attach- ment 19970a | GDT 19971a | Attach- ment 19972a | | 0..1 19973a | |
| | Prop. Data Type 19974a | Element 19975a | Prop. 19976a | | Prop. Data Type 19977a | Prop. Data Type 19978a | GDT 19979a | Prop. Data Type 19980a | | 0..1 19981a | |
| | Prop. Data Type Refer- ence 19982a | Element 19983a | Prop. 19984a | | Prop. Data Type Refer- ence 19985a | Prop. Data Type Refer- ence 19986a | GDT 19987a | Prop. Data Type Refer- ence 19988a | | 0..1 19989a | |

Fig. 199e

| GDT | | Cat. | Obj. Class | Prop. Qual. | Prop. | Rep./ Assn. | Type | Type Name | Lgth. | Card. | Remarks |
|---|---|---|---|---|---|---|---|---|---|---|---|
| | Measure Unit Meaning Code 19990a | Element 19991a | Prop. 19992a | | Measure Unit Meaning 19993a | Code 19994a | GDT 19995a | Measure Unit Meaning Code 19996a | | 0..1 19997a | |
| | Depend-ing Prop. Refer-ence 19998a | Element 19999a | Prop. 19901b | Depend-ing 19902b | Prop. Iden-tification 19903b | Prop Iden-tification 19904b | GDT 19905b | Prop. Refer-ence 19906b | | 0..n 19907b | |
| | Con-straining Prop. Refer-ence 19908b | Element 19909b | Prop. 19910b | Con-straining 19911b | Prop. Iden-tification 19912b | Prop. Iden-tification 19913b | GDT 19914b | Prop. Reference 19915b | | 0..n 19916b | |
| | Aspect ID 19917b | Element 19918b | Prop. 19919b | | Aspect Iden-tification 19920b | Identifier 19921b | GDT 19922b | Aspect ID 19923b | | 0..n 19924b | only for catalogue 19925b |

Fig. 199f

| GDT | | Cat. | Obj. Class | Prop. Qual. | Prop. | Rep./ Assn. | Type | Type Name | Lgth. | Card. | Remarks |
|---|---|---|---|---|---|---|---|---|---|---|---|
| | Target Interface Element ID 19926b | Element 19927b | Prop. 19928b | | Target Interface Element Iden-tification 19929b | Identifier 19930b | GDT 19931b | Interface Element ID 19932b | | 0..n 19933b | only for catalogue 19934b |
| | Multiple Value Indicator 19935b | Element 19936b | Prop. 19937b | | Multiple Value Indication 19938b | Indicator 19939b | GDT 19940b | Prop. Multiple Value Indicator 19941b | | 0..1 19942b | only for catalogue 19943b |
| | Text Search-able Indicator 19944b | Element 19946b | Prop. 19947b | | Text Search-able Indication 19948b | Indicator 19949b | GDT 19950b | Text Search-able Indicator 19951b | | 0..1 19952b | only for catalogue 19953b |
| | Para-metric Search-able Indicator 19954b | Element 19955b | Prop. 19956b | | Para-metric Search-able Indication 19957b | Indicator 19958b | GDT 19959b | Prop. Para-metric Search-able Indicator 19960b | | 0..1 19961b | only for catalogue 19962b |

Fig. 199g

| GDT | | Cat. | Obj. Class | Prop. Qual. | Prop. | Rep./ Assn. | Type | Type Name | Lgth. | Card. | Remarks |
|---|---|---|---|---|---|---|---|---|---|---|---|
| | Valuation Required Indicator 19963b | Element 19964b | Prop. 19965b | | Valuation Required Indication 19966b | Indicator 19967b | GDT 19968b | Prop. Valuation Required Indicator 19969b | | 0..1 19970b | only for catalogue 19971b |

Fig. 200a

| CDT | | | Cat. | Obj. Class | Prop. Qual. | Prop. | Rep./ Assn. Qual. | Rep./ Assn. | Type | Type Name | Lgth. | Card. |
|---|---|---|---|---|---|---|---|---|---|---|---|---|
| Prop. Data Type 20000 | | | | | | | | Details 20001 | | | | |
| | Action Code 20002 | | Attribute 20003 | Prop. Data Type 20004 | | Action 20005 | | Code 20006 | GDT 20007 | Action Code 20008 | | 0..1 20009 |
| | ID 20010 | | Element 20011 | Prop. Data Type 20012 | | Identification 20013 | | Identifier 20014 | GDT 20015 | Prop. Data Type ID 20016 | | 0..1 20017 |
| | Version ID 20018 | | Element 20019 | Prop. Data Type 20020 | | Version Identification 20021 | | Version ID 20022 | GDT 20023 | Version ID 20024 | | 0..1 20025 |
| | Preferred Name 20026 | | Element 20027 | Prop. Data Type 20028 | Preferred 20029 | Name 20030 | | Name 20031 | GDT 20032 | Name 20033 | | 1..n 20034 |
| | Synonymous Name 20035 | | Element 20036 | Prop. Data Type 20037 | Synonymous 20038 | Name 20039 | | Name 20040 | GDT 20041 | Name 20042 | | 0..n 20043 |

Fig. 200b

| CDT | | | Cat. | Obj. Class | Prop. Qual. | Prop. | Rep./ Assn. Qual. | Rep./ Assn. | Type | Type Name | Lgth. | Card. |
|---|---|---|---|---|---|---|---|---|---|---|---|---|
| | Short Name 20044 | | Element 20045 | Prop. Data Type 20046 | Short 20047 | Name 20048 | | Name 20049 | GDT 20050 | Name 20051 | | 0..n 20052 |
| | Icon Attach-ment 20053 | | Element 20054 | Prop. Data Type 20055 | | Icon 20056 | | Attach-ment 20057 | GDT 20058 | Attachment 20059 | | 0..1 20060 |
| | Des-cription 20061 | | Element 20062 | Prop. Data Type 20063 | | Des-cription 20064 | | Des-cription 20065 | GDT 20066 | Descrip-tion 20067 | | 0..n 20068 |
| | Usage Des-cription 20069 | | Element 20070 | Prop. Data Type 20071 | Usage 20072 | Des-cription 20073 | | Des-cription 20074 | GDT 20075 | Descrip-tion 20076 | | 0..n 20077 |
| | Format Code 20078 | | Element 20079 | Prop. Data Type 20080 | | Format 20081 | | Code 20082 | GDT 20083 | Prop. Data Type Format Code 20084 | | 1..1 20085 |

Fig. 200c

| CDT | | | Cat. | Obj. Class | Prop. Qual. | Prop. | Rep./ Assn. Qual. | Rep./ Assn. | Type | Type Name | Lgth. | Card. |
|---|---|---|---|---|---|---|---|---|---|---|---|---|
| | Lan-guage Depen-dency Indicator 20086 | | Element 20087 | Prop. Data Type 20087 | | Lan-guage Depen-dency 20089 | | Indicator 20090 | GDT 20091 | Language Dependency Indicator 20092 | | 0..1 20093 |
| | Maxi-mum Total Digit Number Value 20094 | | Element 20095 | Prop. Data Type 20096 | Maximum Total 20097 | Digit Number 20098 | Digit Number 20099 | Value 20001a | GDT 20002a | Digit Number Value 20003a | | 0..1 20004a |
| | Lower Case Allowed Indicator 20015a | | Element 20016a | Prop. Data Type 20017a | | Lower Case Allowed 20018a | | Indicator 20019a | GDT 20020a | Indicator 20021a | | 0..1 20022a |
| | Negative Value Allowed Indicator 20023a | | Element 20024a | Prop. Data Type 20025a | | Negative Value Allowed 20026a | | Indicator 20027a | GDT 20028a | Indicator 20029a | | 0..1 20030a |

Fig. 200d

| CDT | | Cat. | Obj. Class | Prop. Qual. | Prop. | Rep./Assn. Qual. | Rep./Assn. | Type | Type Name | Lgth. | Card. |
|---|---|---|---|---|---|---|---|---|---|---|---|
| | Measure Unit Code 20031a | Element 20032a | Prop. Data Type 20033a | | Measure Unit 20034a | | Code 20035a | GDT 20036a | Measure Unit Code 20037a | | 0..1 20038a |
| | Currency Code 20039a | Element 20040a | Prop. Data Type 20041a | | Currency 20042a | | Code 20043a | GDT 20044a | Currency Code 20045a | | 0..1 20046a |
| | Expo-nential Rep. Type Code 20047a | Element 20048a | Prop. Data Type 20049a | | Exponenti al Rep. Type 20050a | | Code 20051a | GDT 20052a | Exponen-tial Rep. Type Code 20053a | | 0..1 20054a |
| | Expo-nent Integer Value 20055a | Element 20056a | Prop. Data Type 20057a | | Expo-nent 20058a | Integer 20059a | Value 20060a | GDT 20061a | Integer Value 20062a | | 0..1 20063a |
| | Interval Value Allowed Indicator 20064a | Element 20065a | Prop. Data Type 20066a | Interval 20067a | Value Allowed 20068a | | Indicator 20069a | GDT 20070a | Indicator 20071a | | 0..1 20072a |

Fig. 200e

| CDT | | Cat. | Obj. Class | Prop. Qual. | Prop. | Rep./ Assn. Qual. | Rep./ Assn. | Type | Type Name | Lgth. | Card. |
|---|---|---|---|---|---|---|---|---|---|---|---|
| | Frac-tional Digit Present-ation Accu-racy Indicator 20073a | Element 20074a | Prop. Data Type 20075a | Frac-tional Digit 20076a | Present-ation Accu-racy 20077a | | Indicator 20078a | GDT 20079a | Indicator 20080a | | 0..1 20081a |
| | Regular Expres-sion 20082a | Element 20083a | Prop. Data Type 20084a | | Regular Expres-sion 20085a | | Text 20086a | GDT 20087a | Note 20088a | | 0..1 20089a |
| | Separa-tor Usage Indicator 20090a | Element 20091a | Prop. Data Type 20092a | | Sepa-rator Usage 20093a | | Indicator 20094a | GDT 20095a | Indicator 20096a | | 0..1 20097a |
| | Tupel Lgth. Value 20098a | Element 20099a | Prop. Data Type 20001b | | Tupel Lgth 20002b | Tupel Lgth. 20003b | Value 20004b | GDT 20005b | Tupel Lgth. Value 20006b | | 0..1 20007b |

Fig. 200f

| CDT | | | Cat. | Obj. Class | Prop. Qual. | Prop. | Rep./ Assn. Qual. | Rep./ Assn. | Type | Type Name | Lgth. | Card. |
|---|---|---|---|---|---|---|---|---|---|---|---|---|
| | Component Prop. Definition Class Reference 20008b | | Element 20009b | Prop. Data Type 20010b | Component 20011b | Prop. Definition Class Reference 20012b | | Prop. Definition Class Reference 20013b | GDT 20014b | Prop. Definition Class Reference 20015b | | 0..1 20016b |
| | Component Prop. 20017b | | Element 20018b | Prop. Data Type 20019b | Component 20020b | Prop. Reference 20021b | | Prop. Reference 20022b | GDT 20023b | Prop. Reference 20024b | | 0..n 20025b |
| | | Reference 20026b | Element 20027b | Component Prop. 20028b | | Prop. Reference 20029b | | Prop. Reference 20030b | GDT 20031b | Prop. Reference 20032b | | 1 20033b |
| | | Ordinal Number Value 20034b | Element 20035b | Component Prop. 20036b | | Ordinal Number 20037b | | Value 20038b | GDT 20039b | Ordinal Number Value 20040b | | 0..1 20041b |

Fig. 200g

| CDT | | | Cat. | Obj. Class | Prop. Qual. | Prop. | Rep./ Assn. Qual. | Rep./ Assn. | Type | Type Name | Lgth. | Card. |
|---|---|---|---|---|---|---|---|---|---|---|---|---|
| | Allowed Prop Value Element 20042b | | Element 20043b | Prop. Data Type 20044b | Allowed 20045b | Prop. Value Structure 20046b | | Details 20047b | | | | 0..n 20048b |
| | | Prop. Value 20049b | Element 20050b | Prop. Value Structure 20051b | | Prop. Value 20052b | | Prop. Value 20053b | GDT 20054b | Prop. Value 20055b | | 1 20056b |
| | | Default Value Indicator 20057b | Element 20058b | Prop. Value Structure 20059b | | Default Value 20060b | | Indicator 20061b | GDT 20062b | Indicator 20063b | | 0..1 20064b |
| | | Net Element ID 20065b | Element 20066b | Prop. Value Structure 20067b | | Net Element Identifi- cation 20068b | | Identifier 20069b | CCT 20070b | Identifier 20071b | 5 20072b | 0..1 20073b |

Fig. 200h

| CDT | | | Cat. | Obj. Class | Prop. Qual. | Prop. | Rep./ Assn. Qual. | Rep./ Assn. | Type | Type Name | Lgth. | Card. |
|---|---|---|---|---|---|---|---|---|---|---|---|---|
| | | Preced-ing Net Element ID 20074b | Element 20075b | Prop. Value Structure 20076b | Preced-ing 20077b | Netel-ment Ideniti-fication 20078b | | Identi-fier 20079b | CCT 20080b | Identifier 20081b | 5 20082b | 0..n 20083b |
| | Allowed Prop. Valua-tion 20084b | | Element 20085b | Prop. Data Type 20086b | Allowed 20087b | Prop. Valua-tion 20088b | | Prop. Valua-tion 20089b | GDT 20090b | Prop. Valua-tion 20091b | | 0..n 20092b |

Fig. 201

| GDT | Obj. Class | Prop. | Rep./ Assn. | Type | Type Name | Lgth. | Remarks |
|---|---|---|---|---|---|---|---|
| Prop. Data Type Format Code 20100 | Prop. Data Type 20102 | Format 20104 | Code 20106 | CCT 20108 | Code 20110 | 10 20112 | Restricted 20114 |

Fig. 202

| GDT | | Cat. | Obj. Class | Prop. | Rep./ Assn. | Type | Type Name | Lgth. | Card. | Remarks |
|---|---|---|---|---|---|---|---|---|---|---|
| Prop. Data Type ID 20200 | | | Prop. Data Type 20202 | Identification 20204 | Identifier 20206 | CCT 20208 | Identifier 20210 | 1..50 20212 | | Restricted 20214 |
| | Scheme Agency ID 20216 | Attribute 20218 | Identification Scheme-Agency 20220 | Identification 20222 | Identifier 20224 | xsd 20226 | token 20228 | 1..60 20230 | 1 20232 | |
| | Scheme Agency Scheme ID 20234 | Attribute 20236 | Identification Scheme-Agency 20238 | Scheme 20240 | Identifier 20242 | xsd 20244 | token 20246 | 1..60 20248 | 0..1 20250 | |
| | Scheme Agency Scheme Agency ID 20252 | Attribute 20254 | Identification Scheme-Agency 20256 | Scheme Agency 20258 | Identifier 20260 | xsd 20262 | token 20264 | 3 20266 | 0..1 20268 | |

Fig. 203

| GDT | | Cat. | Obj. Class | Prop. | Rep./ Assn. | Type | Type Name | Card. |
|---|---|---|---|---|---|---|---|---|
| Prop. Data Type Reference 20300 | | | Prop. Data Type Reference 20302 | | Details 20304 | | | |
| | ID 20306 | Element 20308 | Prop. Data Type Reference 20310 | Identification 20312 | Identifier 20314 | GDT 20316 | Prop. Data Type ID 20318 | 1 |
| | Version ID 20320 | Element 20322 | Prop. Data Type Reference 20324 | Version Identification 20326 | Identifier 20328 | GDT 20330 | Version ID 20332 | 0..1 20334 |

Fig. 204a

| GDT | | | Cat. | Obj. Class | Prop. Qual. | Prop. | Rep./ Assn. | Type | Type Name | Lgth. | Card. | Remarks |
|---|---|---|---|---|---|---|---|---|---|---|---|---|
| Prop. Definition Class 20400 | | | | | | | Details 20401 | | | | | |
| | Action Code 20402 | | Attribute 20403 | Prop. Definition Class 20404 | | Action 20405 | Code 20406 | GDT 20407 | Action Code 20408 | | 0..1 20409 | |
| | ID 20410 | | Element 20411 | Prop. Definition Class 20412 | | Identifi-cation 20413 | Prop. Definition Class ID 20414 | GDT 20415 | Prop. Definition Class ID 20416 | | 1..1 20417 | |
| | Version ID 20418 | | Element 20419 | Prop. Definition Class 20420 | | Version Identifi-cation 20421 | Version ID 20422 | GDT 20423 | Version ID 20424 | | 0..1 20425 | |
| | Revision ID 20426 | | Element 20427 | Prop. Definition Class 20428 | | Revision Identifi-cation 20429 | Identifier 20430 | CCT 20431 | Identifier 20432 | 1..10 20433 | 0..1 20434 | Restricted 20435 |
| | Creation Date Time 20436 | | Element 20437 | Prop. Definition Class 20438 | | Creation Date Time 20439 | Date Time 20440 | GDT 20441 | Date Time 20442 | | 0..1 20443 | |

Fig. 204b

| GDT | | | Cat. | Obj. Class | Prop. Qual. | Prop. | Rep./ Assn. | Type | Type Name | Lgth. | Card. | Remarks |
|---|---|---|---|---|---|---|---|---|---|---|---|---|
| | Version Date Time 20444 | | Ele-ment 20445 | Prop. Definition Class 20446 | | Version Date Time 20447 | Date Time 20448 | GDT 20449 | Date Time 20450 | | 0..1 20451 | |
| | Revision Date Time 20452 | | Ele-ment 20453 | Prop. Definition Class 20454 | | Revision Date Time 20455 | Date Time 20456 | GDT 20457 | Date Time 20458 | | 0..1 20459 | |
| | Preferred Name 20460 | | Ele-ment 20461 | Prop. Definition Class 20462 | Pre-ferred 20463 | Name 20464 | Name 20465 | GDT 20466 | Name 20467 | | 1..n 20468 | |
| | Synony-mous Name 20469 | | Ele-ment 20470 | Prop. Definition Class 20471 | Synony-mous 20472 | Name 20473 | Name 20474 | GDT 20475 | Name 20476 | | 0..n 20477 | |
| | Short Name 20478 | | Ele-ment 20479 | Prop. Definition Class 20480 | Short 20481 | Name 20482 | Name 20483 | GDT 20484 | Name 20485 | | 0..n 20486 | |

Fig. 204c

| GDT | | | Cat. | Obj. Class | Prop. Qual. | Prop. | Rep./ Assn. | Type | Type Name | Lgth. | Card. | Remarks |
|---|---|---|---|---|---|---|---|---|---|---|---|---|
| | Icon Attach-ment 20487 | | Ele-ment 20488 | Prop. Definition Class 20489 | Icon 20490 | Attach-ment 20491 | Attach-ment 20492 | GDT 20493 | Attach-ment 20494 | | 0..1 20495 | |
| | Defining Des-cription 20496 | | Ele-ment 20497 | Prop. Definition Class 20498 | Defining 20499 | Des-cription 20401a | Des-cription 20402a | GDT 20403a | Des-cription 20404a | | 0..n 20405a | |
| | Source Docu-ment Web Address 20406a | | Ele-ment 20407a | Prop. Definition Class 20408a | Source 20409a | Docu-ment 20410a | Web Address 20411a | CCT 20412a | Web Address 20413a | | 0..1 20414a | |
| | Additional Descrip-tion 20415a | | Element 20416a | Prop. Definition Class 20417a | Addi-tional 20418a | Des-cription 20419a | Des-cription 20420a | GDT 20421a | Des-cription 20422a | | 0..n 20423a | |
| | Usage Descrip-tion 20424a | | Element 20425a | Prop. Definition Class 20426a | Usage 20427a | Des-cription 20428a | Des-cription 20429a | GDT 20430a | Des-cription 20431a | | 0..n 20432a | |

Fig. 204d

| GDT | Cat. | Obj. Class | Prop. Qual. | Prop. | Rep./ Assn. | Type | Type Name | Lgth. | Card. | Remarks |
|---|---|---|---|---|---|---|---|---|---|---|
| Type Code 20433a | Element 20434a | Prop. Definition Class 20435a | | Type 20436a | Code 20437a | GDT 20438a | Prop. Definition Class Type Code 20439a | | 0..1 20440a | |
| Simplified Graphic Attach-ment 20441a | Ele-ment 20442a | Prop. Definition Class 20443a | Simp-lified Graphic 20444a | Attach-ment 20445a | Attachment 20446a | GDT 20447a | Attach-ment 20448a | | 0..1 20449a | |
| Subject Area Code 20450a | Ele-ment 20451a | Prop. Definition Class 20452a | Topic 20453a | Subject Area 20454a | Code 20455a | GDT 20456a | Subject Area Code 20457a | | 0..n 20458a | |
| Parent Prop. Definition Class Refer-ence 20459a | Ele-ment 20460a | Prop. Definition Class 20461a | Parent 20462a | Definition Class Reference 20463a | Prop. Definition Class Reference 20464a | GDT 20465a | Prop. Definition Class Refer-ence 20466a | | 0..1 20467a | |
| Defined Prop. 20468a | Ele-ment 20469a | Prop. Definition Class 20470a | | Defined Prop. 20471a | Details 20472a | | | | 0..n 20473a | |

Fig. 204e

| GDT | | | Cat. | Obj. Class | Prop. Qual. | Prop. | Rep./ Assn. | Type | Type Name | Lgth. | Card. | Remarks |
|---|---|---|---|---|---|---|---|---|---|---|---|---|
| | | Refer-ence 20474a | Element 20475a | Defined Prop. 20476a | | Reference 20477a | Prop. Reference 20478a | GDT 20479a | Prop. Refer-ence 20480a | | 1..1 20481a | |
| | | Ordinal Number Value 20482a | Element 20483a | Defined Prop. 20484a | | Ordinal Number 20485a | Value 20486a | GDT 20487a | Ordinal Number Value 20488a | | 0..1 20489a | |
| | | Sub-Hierarchy Definition Indicator 20490a | Element 20491a | Defined Prop. 20492a | | Sub-Hier-archy 20493a | Definition 20494a | CCT 20495a | Indicator 20496a | | 0..1 20497a | |
| | | Visibility Indicator 20498a | Element 20499a | Defined Prop. 20401b | | Visibility 20402b | Indicator 20403b | CCT 20404b | Indicator 20405b | | 0..1 20406b | |

Fig. 204f

| GDT | | | Cat. | Obj. Class | Prop. Qual. | Prop. | Rep./ Assn. | Type | Type Name | Lgth. | Card. | Remarks |
|---|---|---|---|---|---|---|---|---|---|---|---|---|
| | Hierarchy Prop. Valuation 20407b | | Element 20408b | Prop. Definition Class 20409b | Hier-archy 20410b | Prop. Valuation 20411b | Prop. Valuation 20412b | GDT 20413b | Prop. Valuation 20414b | | 0..n 20415b | |

Fig. 205

| GDT | | Cat. | Obj. Class | Prop. | Rep./ Assn. | Type | Type Name | Lgth. | Card. | Remarks |
|---|---|---|---|---|---|---|---|---|---|---|
| Prop. Definition Class ID 20500 | | | Prop. Definition Class 20502 | Identification 20504 | Identifier 20506 | CCT 20508 | Identifier 20510 | 1..50 20512 | | Restricted 20514 |
| | Scheme Agency ID 20516 | Attribute 20518 | Identification Scheme Agency 20520 | Identification 20522 | Identifier 20524 | xsd 20526 | token 20528 | 1..60 20530 | 1 | |
| | Scheme Agency Scheme ID 20532 | Attribute 20534 | Identification Scheme Agency 20536 | Scheme 20538 | Identifier 20540 | xsd 20542 | token 20544 | 1..60 20546 | 0..1 20548 | |
| | Scheme Agency Scheme Agency ID 20550 | Attribute 20552 | Identification Scheme Agency 20554 | Scheme Agency 20556 | Identifier 20558 | xsd 20560 | token 20562 | 3 20564 | 0..1 20566 | |

Fig. 206

| GDT | | Cat. | Obj. Class | Prop. | Rep./ Assn. | Type | Type Name | Card. |
|---|---|---|---|---|---|---|---|---|
| Prop. Definition Class Reference 20600 | | | Prop. Definition Class Reference 20602 | | Details 20604 | | | |
| | ID 20606 | Element 20608 | Prop. Definition Class Reference 20610 | Identification 20612 | Identifier 20614 | GDT 20616 | Prop. Definition Class ID 20618 | 1 20620 |
| | Version ID 20622 | Element 20624 | Prop. Definition Class Reference 20626 | Version Identification 20628 | Identifier 20630 | GDT 20632 | Version ID 20634 | 0..1 20636 |

Fig. 207

| GDT | Obj. Class | Rep./ Assn. | Type | Type Name | Lgth. | Remarks |
|---|---|---|---|---|---|---|
| Definition Class Type Code 20700 | Definition Class Type 20702 | Code 20704 | CCT 20706 | Code 20708 | 1 20710 | Restricted 20712 |

Fig. 208

| GDT | | Cat. | Obj. Class | Prop. | Rep./ Assn. | Type | Type Name | Lgth. | Card. | Remarks |
|---|---|---|---|---|---|---|---|---|---|---|
| Prop. ID 20800 | | | Prop. 20802 | Identification 20804 | Identifier 20806 | CCT 20808 | Identifier 20810 | 1..50 20812 | | Restricted 20814 |
| | Scheme Agency ID 20816 | Attribute 20818 | Identification Scheme-Agency 20820 | Identification 20822 | Identifier 20824 | xsd 20826 | token 20828 | 1..60 20830 | 1..1 20832 | |
| | Scheme Agency Scheme ID 20834 | Attribute 20836 | Identification Scheme-Agency 20838 | Scheme 20840 | Identifier 20842 | xsd 20844 | token 20846 | 1..60 20848 | 0..1 20850 | |
| | Scheme Agency Scheme Agency ID 20852 | Attribute 20854 | Identification Scheme-Agency 20856 | Scheme Agency 20858 | Identifier 20860 | xsd 20862 | token 20864 | 3 20866 | 0..1 20868 | |

Fig. 209

| GDT | Obj. Class | Prop. | Rep./ Assn. | Type Name |
|---|---|---|---|---|
| Prop. Multiple Value Indicator 20900 | Prop. 20902 | Multiple Value 20904 | Indicator 20906 | Indicator 20908 |

Fig. 210

| GDT | Obj. Class | Prop. | Rep./ Assn. | Type | Type Name |
|---|---|---|---|---|---|
| Prop. Parametric Searchable Indicator 21000 | Prop. 21002 | Parametric Searchable 21004 | Indicator 21006 | CCT 21008 | Indicator 21010 |

Fig. 211

| GDT | | Cat. | Obj. Class | Prop. | Rep./ Assn. | Type | Type Name | Card. |
|---|---|---|---|---|---|---|---|---|
| Prop. Reference 21100 | | | Prop. Reference 21102 | | Details 21104 | | | |
| | ID 21106 | Element 21108 | Prop. Reference 21110 | Identification 21112 | Identifier 21114 | GDT 21116 | Prop. ID 21118 | 1..1 21120 |
| | Version ID 21122 | Element 21124 | Prop. Reference 21126 | Version Identification 21128 | Version ID 21130 | GDT 21132 | Version ID 21134 | 0..1 21136 |
| | Definition Class Reference 21138 | Element 21140 | Prop. Reference 21142 | Definition Class Reference 21144 | Definition Class Reference 21146 | GDT 21148 | Definition Class Reference 21150 | 0..1 21152 |

Fig. 212a

| GDT | | Cat. | Obj. Class | Prop. | Rep./ Assn. | Type | Type Name | Lgth. | Card. |
|---|---|---|---|---|---|---|---|---|---|
| Prop. Valuation 21200 | | | Prop. Valuation 21202 | | Details 21204 | | | | |
| | Action Code 21206 | Attribute 21208 | Prop. Valuation 21210 | Action 21212 | Code 21214 | GDT 21216 | Action Code 21218 | | 0..1 21220 |
| | ID 21222 | Element 21224 | Prop. Valuation 21226 | Identifi-cation 21228 | Identifier 21230 | CCT 21232 | Identifier 21234 | 1..10 21236 | 0..1 21238 |

Fig. 212b

| GDT | | Cat. | Obj. Class | Prop. | Rep./ Assn. | Type | Type Name | Lgth. | Card. |
|---|---|---|---|---|---|---|---|---|---|
| | Parent ID 21240 | Element 21242 | Prop. Valuation 21244 | Parent Identification 21246 | Identifier 21248 | CCT 21250 | Identifier 21252 | 1..10 21254 | 0..1 21256 |
| | Prop. Reference 21258 | Element 21260 | Prop. Valuation 21262 | Prop. Reference 21264 | Reference 21266 | GDT 21268 | Prop. Reference 21270 | | 1 21272 |
| | Prop. Value 21274 | Element 21276 | Prop. Valuation 21278 | Prop. Value 21280 | Prop. Value 21282 | GDT 21284 | Prop. Value 21286 | | 0..n 21288 |

Fig. 213

| GDT | Obj. Class | Prop. | Rep./ Assn. | Type | Type Name |
|---|---|---|---|---|---|
| Prop. Valuation Required Indicator 21300 | Prop. 21302 | Valuation Required 21304 | Indicator 21306 | CCT 21308 | Indicator 21310 |

Fig. 214a

| GDT | | | Cat. | Obj. Class | Prop. Qual. | Prop. | Rep./ Assn. Qual. | Rep./ Assn. | Type | Type Name | Card. |
|---|---|---|---|---|---|---|---|---|---|---|---|
| Prop. Value 21400 | | | Ele-ment 21401 | Prop. Value 21402 | | | | Details 21403 | | | |
| | Amount Specifi-cation 21404 | | Ele-ment 21405 | Prop. Value 21406 | | Amount Specifi-cation 21407 | | Details 21408 | | | 0..1 21409 |
| | | Amount 21410 | Ele-ment 21411 | Amount Specifi-cation 21412 | | Amount 21413 | | Amount 21414 | GDT 21415 | Amount 21416 | 0..1 21417 |
| | | Lower Amount 21418 | Ele-ment 21419 | Amount Specifi-cation 21420 | Lower 21421 | Amount 21422 | | Amount 21423 | GDT 21424 | Amount 21425 | 0..1 21426 |
| | | Upper Amount 21427 | Ele-ment 21428 | Amount Specifi-cation 21429 | Upper 21430 | Amount 21431 | | Amount 21432 | GDT 21433 | Amount 21434 | 0..1 21435 |
| | Quan-tity Specifi-cation 21436 | | Ele-ment 21437 | Prop. Value 21438 | | Quantity Specifi-cation 21439 | | Details 21440 | | | 0..1 21441 |

Fig. 214b

| GDT | | | Cat. | Obj. Class | Prop. Qual. | Prop. | Rep./ Assn. Qual. | Rep./ Assn. | Type | Type Name | Card. |
|---|---|---|---|---|---|---|---|---|---|---|---|
| | | Quantity 21442 | Element 21443 | Quantity Specification 21444 | | Quantity 21445 | | Quantity 21446 | GDT 21447 | Quantity 21448 | 0..1 21449 |
| | | Lower Quantity 21450 | Element 21451 | Quantity Specification 21452 | Lower 21453 | Quantity 21454 | | Quantity 21455 | GDT 21456 | Quantity 21457 | 0..1 21458 |
| | | Upper Quantity 21459 | Element 21460 | Quantity Specification 21461 | Upper 21462 | Quantity 21463 | | Quantity 21464 | GDT 21465 | Quantity 21466 | 0..1 21467 |
| | Decimal Specification 21468 | | Element 21469 | Prop. Value 21470 | | Numeric Specification 21471 | | Details 21472 | | | 0..1 21473 |
| | | Decimal Value 21474 | Element 21475 | Decimal Specification 21476 | | Decimal Value 21477 | Decimal 21478 | Value 21479 | GDT 21480 | Decimal Value 21481 | 0..1 21482 |

Fig. 214c

| GDT | | | Cat. | Obj. Class | Prop. Qual. | Prop. | Rep./ Assn. Qual. | Rep./ Assn. | Type | Type Name | Card. |
|---|---|---|---|---|---|---|---|---|---|---|---|
| | | Lower Deci-mal Value 21483 | Ele-ment 21484 | Deci-mal Specifi-cation 21485 | Lower 21486 | Decimal Value 21487 | Deci-mal 21488 | Value 21489 | GDT 21490 | Deci-mal Value 21491 | 0..1 21492 |
| | | Upper Deci-mal Value 21493 | Ele ment 21494 | Deci-mal Specifi-cation 21495 | Upper 21496 | Decimal Value 21497 | Deci-mal 21498 | Value 21499 | GDT 21401a | Deci-mal Value 21402a | 0..1 21403a |
| | Float Specific ation 21404a | | Ele-ment 21405a | Prop. Value 21406a | | Float Specifi-cation 21407a | | Details 21408a | | | 0..1 21409a |
| | | Float Value 21410a | Ele-ment 21411a | Float Specifi-cation 21412a | | Float Value 21413a | Float 21414a | Value 21415a | GDT 21416a | Float Value 21417a | 0..1 21418a |

Fig. 214d

| GDT | | | Cat. | Obj. Class | Prop. Qual. | Prop. | Rep./ Asso. Qual. | Rep./ Assn. | Type | Type Name | Card. |
|---|---|---|---|---|---|---|---|---|---|---|---|
| | | Lower Float Value 21419a | Ele-ment 21420a | Float Specifi-cation 21421a | Lower 21422a | Float Value 21423a | Float 21424a | Value 21425a | GDT 21426a | Float Value 21427a | 0..1 21428a |
| | | Upper Float Value 21429a | Ele-ment 21430a | Float Specifi-cation 21431a | Upper 21432a | Float Value 21433a | Float 21434a | Value 21435a | GDT 21436a | Float Value 21437a | 0..1 21438a |
| | In-eger Specifi-cation 21439a | | Ele-ment 21440a | Prop. Value 21441a | | Integer Specifi-cation 21442a | | Details 21443a | | | 0..1 21444a |
| | | Integer Value 21445a | Ele-ment 21446a | Integer Specifi-cation 21447a | | Integer Value 21448a | Integer 21449a | Value 21450a | GDT 21451a | Integer Value 21452a | 0..1 21453a |
| | | Lower Integer Value 21454a | Ele-ment 21455a | Integer Specifi-cation 21456a | Lower 21457a | Integer Value 21458a | Integer 21459a | Value 21460a | GDT 21461a | Integer Value 21462a | 0..1 21463a |

Fig. 214e

| G D T | | | Cat. | Obj. Class | Prop. Qual. | Prop. | Rep./ Assn. Qual. | Rep./ Assn. | Type | Type Name | Card. |
|---|---|---|---|---|---|---|---|---|---|---|---|
| | | Upper Integer Value 21464a | Ele-ment 21465a | Integer Specifi-cation 21466a | Upper 21467a | Integer Value 21468a | Integer 21469a | Value 21470a | GDT 21471a | Integer Value 21472a | 0..1 21473a |
| | Date Specifi-cation 21474a | | Ele-ment 21475a | Prop. Value 21476a | | Date Specifi-cation 21477a | | Details 21478a | | | 0..1 21479a |
| | | Date 21480a | Ele-ment 21481a | Date Specifi-cation 21482a | | | | Date 21483a | GDT 21484a | Date 21485a | 0..1 21486a |
| | | Start Date 21487a | Ele-ment 21488a | Date Specifi-cation 21489a | | Start 21490a | | Date 21491a | GDT 21492a | Date 21493a | 0..1 21494a |
| | | End Date 21495a | Ele-ment 21496a | Date Specifi-cation 21497a | | End 21498a | | Date 21499a | GDT 21401b | Date 21402b | 0..1 21403b |

Fig. 214f

| GDT | | | Cat. | Obj. Class | Prop. Qual. | Prop. | Rep./ Assn. Qual. | Rep./ Assn. | Type | Type Name | Card. |
|---|---|---|---|---|---|---|---|---|---|---|---|
| | Time Specification 21404b | | Element 21405b | Prop. Value 21406b | | Time Specification 21407b | | Details 21408b | | | 0..1 21409b |
| | | Time 21410b | Element 21411b | Time Specification 21412b | | | | Time 21413b | GDT 21414b | Time 21415b | 0..1 21416b |
| | | Start Time 21417b | Element 21418b | Time Specification 21419b | | Start 21420b | | Time 21421b | GDT 21422b | Time 21423b | 0..1 21424b |
| | | End Time 21425b | Element 21426b | Time Specification 21427b | | End 21428b | | Time 21429b | GDT 21430b | Time 21431b | 0..1 21432b |
| | Date Time Specification 21433b | | Element 21434b | Prop. Value 21435b | | Date Time Specification 21436b | | Details 21437b | | | 0..1 21438b |

Fig. 214g

| GDT | | | Cat. | Obj. Class | Prop. Qual. | Prop. | Rep./ Assn. Qual. | Rep./ Assn. | Type | Type Name | Card. |
|---|---|---|---|---|---|---|---|---|---|---|---|
| | | Date Time 21439b | Element 21440b | Date Time Specification 21441b | | | | Date Time 21442b | GDT 21443b | Date Time 21444b | 0..1 21445b |
| | | Start Date Time 21446b | Element 21447b | Date Time Specification 21448b | | Start 21449b | | Date Time 21450b | GDT 21451b | Date Time 21452b | 0..1 21453b |
| | | End Date Time 21454b | Element 21455b | Date Time Specification 21456b | | End 21457b | | Date Time 21458b | GDT 21459b | Date Time 21460b | 0..1 21461b |
| | Name Specification 21462b | | Element 21463b | Prop. Value 21464b | | Name Specification 21465b | | Details 21466b | | | 0..1 21467b |
| | | Name 21468b | Element 21469b | Name Specification 21470b | | Name 21471b | | Name 21472b | GDT 21473b | Name 21474b | 0..1 21475b |

Fig. 214h

| GDT | | | Cat. | Obj. Class | Prop. Qual. | Prop. | Rep./ Assn. Qual. | Rep./ Assn. | Type | Type Name | Card. |
|---|---|---|---|---|---|---|---|---|---|---|---|
| | Indicator Specification 21476b | | Element 21477b | Prop. Value 21478b | | Indicator Specification 21479b | | Details 21480b | | | 0..1 21481b |
| | | Indicator 21482b | Element 21483b | Indicator Specification 21484b | | Indicator 21485b | | Indicator 21486b | GDT 2 1587b | Indicator 21488b | 0..1 21489b |
| | Interval Type Code 21490b | | Element 21491b | Prop. Value 21492b | | Interval Type 21493b | | Code 21494b | GDT 21495b | Interval Type Code 21496b | 0..1 21497b |
| | Preferred Name 21498b | | Element 21499b | Prop. Value 21401c | | Preferred Name 21402c | | Name 21403c | GDT 21404c | Name 21405c | 0..n 21406b |
| | Synonymous Name 21407c | | Element 21408c | Prop. Value 21409c | | Synonymous Name 21410c | | Name 21411c | GDT 21412c | Name 21413c | 0..n 21414c |

Fig. 214i

| GDT | | | Cat. | Obj. Class | Prop. Qual. | Prop. | Rep./ Assn. Qual. | Rep./ Assn. | Type | Type Name | Card. |
|---|---|---|---|---|---|---|---|---|---|---|---|
| | Abbrev-iation Name 21415c | | Ele-ment 21416c | Prop. Value 21417c | | Abbrevi-ation Name 21418c | | Name 21419c | GDT 21420c | Name 21421c | 0..n 21422c |
| | Icon Attach-ment 21423c | | Ele-ment 21424c | Prop. Value 21425c | | Icon 21426c | | Attach-ment 21427c | GDT 21428c | Attach-ment 21429c | 0..1 21430c |
| | Attach-ment Web Ad-dress 21431c | | Ele-ment 21432c | Prop. Value 21433c | | Attach-ment 21434c | | Web Add-ress 21435c | GDT 21436c | Web Add-ress 21437c | 0..1 21438c |

Fig. 215

| GDT | Cat. | Obj. Class | Prop. | Rep./ Assn. | Type | Lgth. | Card. | Remarks |
|---|---|---|---|---|---|---|---|---|
| Purchase Order Ordered Indicator 21500 | | Purchase Order 21502 | Ordered Indicator 21504 | Indicator 21506 | CCT: Indicator 21508 | | | |

Fig. 216

| CDT | Cat. | Obj. Class | Prop. | Rep./ Assn. | Type | Type Name | Lgth. | Card. | Remarks |
|---|---|---|---|---|---|---|---|---|---|
| Purchasing Group ID 21600 | | Purchasing Group 21602 | Identification 21604 | Identifier 21606 | CCT 21608 | Identifier 21610 | 1..20 21612 | | |

Fig. 217

| GDT | | Cat. | Obj. Class | Prop. | Rep./ Assn. | Type | Type Name | Lgth. | Card. | Remarks |
|---|---|---|---|---|---|---|---|---|---|---|
| Quantity 21700 | | | | | Quantity 21702 | xsd 21704 | Decimal 21706 | 13.6 21708 | | |
| | unit Code 21710 | Attribute 21712 | Quantity 21714 | Unit 21716 | Code 21718 | xsd 21720 | token 21722 | 1..3 21724 | 1 21726 | |

Fig. 218

| GDT | Cat. | Obj. Class | Prop. | Rep./ Assn. | Type | Type Name | Lgth. | Card. | Remarks |
|---|---|---|---|---|---|---|---|---|---|
| Quantity Discrep-ancy Code 21800 | | Quantity 21802 | Discrepancy 21804 | Code 21806 | CCT 21808 | Code 21810 | 1.4 21812 | | Restricted 21814 |

Fig. 219

| CDT | | | Cat. | Obj. Class Qual. | Obj. Class | Prop. Qual. | Prop. | Rep./ Assn Qual. | Rep./ Assn. | Type | Type Name | Lgth. | Card. | Remarks |
|---|---|---|---|---|---|---|---|---|---|---|---|---|---|---|
| Quantity-Time Series 21900 | | | | Quan-tity 21902 | Time Series 21904 | | | | Details 21906 | GDT 21908 | Time Series 21910 | | | Restricted 21912 |
| | Item 21914 | | Element 21916 | | Time Series 21918 | | Item 21920 | | Details 21922 | | | | 1..n 21924 | |
| | | Validity Period 21926 | Element 21928 | | Time Series 21930 | | Validity Period 21932 | | Details 21934 | GDT 21936 | Date Time Period 21938 | | 1 21940 | |
| | | Quantity 21942 | Element 21944 | | Time Series 21946 | | Quantity 21948 | | Quanti-ty 21950 | GDT 21952 | Quantity 21954 | | 1 21956 | |
| | | Fixed-Indicator 21958 | Element 21960 | | Time Series 21962 | | Fixed Indicator 21964 | | Indica-tor 21966 | GDT 21968 | Fixed Indicator 21970 | | 0..1 21972 | |

Fig. 220

| GDT | | Cat. | Obj. Class | Prop. | Rep./ Assn. | Type | Type Name | Lgth. | Card. | Remarks |
|---|---|---|---|---|---|---|---|---|---|---|
| Quantity Toler-ance 22000 | | | Quantity Tolerance 22002 | Details 22004 | Details 22006 | | | | | |
| | Over Percent 22008 | Element 22010 | Quantity Tolerance 22012 | Over 22014 | Percent 22016 | GDT 22018 | GDT: Percent 22020 | | 0..1 22022 | |
| | Over Percent Unlimited-Indicator 22024 | Element 22026 | Quantity Tolerance 22028 | Over Percen Unlimited 22030 | Indicator 22032 | GDT 22034 | GDT: Value Unlimited Indicator 22036 | | 0..1 22038 | |
| | Under Percent 22040 | Element 22042 | Quantity Tolerance 22044 | Under 22046 | Percent 22048 | GDT 22050 | GDT: Percent 22052 | | 0..1 22054 | |

Fig. 221

| GDT | | Cat. | Obj. Class | Prop. | Rep./ Assn. | Type | Type Name | Lgth. | Card. | Remarks |
|---|---|---|---|---|---|---|---|---|---|---|
| Recurrence 22100 | | | Recurrence 22102 | | Details 22104 | | | | | |
| | Duration 22106 | | Recurrence 22108 | Duration 22110 | Duration 22112 | GDT 22114 | Duration 22116 | | 1 22118 | |
| | Value 22120 | | Recurrence 22122 | Value 22124 | Value 22126 | GDT 22128 | Integer Value 22130 | 1..3 22132 | 1 22134 | |

Fig. 222

| GDT | | Cat. | Obj. Class | Prop. Term | Rep./ Assn. | Type | Type Name | Lgth. | Card. | Remarks |
|---|---|---|---|---|---|---|---|---|---|---|
| Region Code 22200 | | | Region 22202 | Identification 22204 | Code 22206 | CCT 22208 | Code 22210 | | | |
| | listID 22212 | Attribute 22214 | Code List 22216 | Identification 22218 | Identifier 22220 | xsd 22222 | token 22224 | 1..60 22226 | 0..1 22228 | |
| | list Version ID 22230 | Attribute 22232 | Code List 22234 | Version 22236 | Identifier 22238 | xsd 22240 | token 22242 | 1..15 22244 | 0..1 22246 | |
| | list Agency ID 22248 | Attribute 22250 | Code List Agency 22252 | Identification 22254 | Identifier 22256 | xsd 22258 | token 22260 | 1..60 22262 | 0..1 22264 | |
| | list Agency SchemeID 22266 | Attribute 22268 | Code List Agency 22270 | Scheme 22272 | Identifier 22274 | xsd 22276 | token 22278 | 1..60 22280 | 0..1 22282 | |
| | list Agency Scheme AgencyID 22284 | Attribute 22286 | Code List Agency 22288 | Scheme Agency 22290 | Identifier 22292 | xsd 22294 | token 22296 | 3 22298 | 0..1 22201 | |

Fig. 223

| GDT | Cat. | Obj. Class | Prop. | Rep./ Assn. | Type | Type Name | Lgth. | Card. | Remarks |
|---|---|---|---|---|---|---|---|---|---|
| RequiredIndicator 22300 | | | Required 22302 | Indicator 22304 | CCT 22306 | Indicator 22308 | | | |

Fig. 224a

| CDT | | | | Cat. | Obj. Class Qual. | Obj. Class | Prop. Qual. | Prop. | Rep./ Assn Qual. | Rep./ Assn. | Type | Type Name | Lgth. | Card. | Remarks |
|---|---|---|---|---|---|---|---|---|---|---|---|---|---|---|---|
| Revision Quantity Time Series 22400 | | | | | Revision Quantity 22402 | Time Series 22404 | | | | Details 22406 | GDT 22408 | Time Series 22410 | | | Restricted 22412 |
| | Item 22414 | | | Element 22416 | | Time Series 22418 | | Item 22420 | | Details 22422 | | | | 1..n 22424 | |
| | | Validity Period 22426 | | Element 22428 | | Time Series 22430 | | Validity Period 22432 | | Details 22434 | GDT 22436 | Date Time Period 22438 | | 1 22440 | |
| | | | Start Date Time 22442 | Element 22444 | | Time Series 22446 | | Validity Period Start 22448 | | Date Time 22450 | GDT 22452 | Date Time 22454 | | 1 22456 | |
| | | | End Date Time 22458 | Element 22460 | | Time Series 22462 | | Validity Period End 22464 | | Date Time 22466 | GDT 22468 | Date Time 22470 | | 1 22472 | |
| | | Quantity 22474 | | Element 22476 | | Time Series 22478 | | Quantity 22480 | | Quantity 22482 | GDT 22484 | Quantity 22486 | | 1 22488 | |

Fig. 224b

| CDT | | | | Cat. | Obj. Class Qual. | Obj. Class | Prop. Qual. | Prop. | Rep./ Assn. Qual. | Rep./ Assn. | Type | Type Name | Lgth. | Card. | Remarks |
|---|---|---|---|---|---|---|---|---|---|---|---|---|---|---|---|
| | | Fixed-Indicator 22490 | | Ele-ment 22492 | | Time Series 22494 | | Fixed Indica-tor 22496 | | Indica-tor 22498 | GDT 22401 | Fixed Indica-tor 22403 | | 0..1 22405 | |
| | | Adjust-ment-Reason Code 22407 | | Ele-ment 22409 | | Time Series 22411 | | Adjust-ment Reason 22413 | | Code 22415 | GDT 22417 | Adjust-ment Reason Code 22419 | | 0..1 22421 | |
| | | Note 22423 | | Ele-ment 22425 | | Time Series 22427 | | Note 22429 | | Note 22431 | GDT 22433 | Note 22435 | | 0..1 22437 | |

Fig. 225

| GDT | Cat. | Obj. Class | Prop. | Rep./ Assn. | Type | Type Name | Lgth. | Card. | Remarks |
|---|---|---|---|---|---|---|---|---|---|
| Scale Axis Interval Boundary Type Code 22500 | | Scale Axis 22502 | Interval Boundary Type Code 22504 | Code 22506 | CCT 22508 | Code 22510 | 1 22512 | | Restricted 22514 |

Fig. 226

| GDT | Cat. | Obj. Class | Prop. | Rep./ Assn. | Type | Type Name | Lgth. | Card. | Remarks |
|---|---|---|---|---|---|---|---|---|---|
| ScheduleLine Commitment Code 22600 | | Schedule Line 22602 | Commitment 22604 | Code 22606 | CCT 22608 | Code 22610 | 1..3 22612 | | Restricted 22614 |

Fig. 227

| GDT | Cat. | Obj. Class | Prop. | Rep./ Assn. | Type | Type Name | Lgth. | Card. | Remarks |
|---|---|---|---|---|---|---|---|---|---|
| ScoreCardID 22700 | | Score Card 22702 | Identification 22704 | Identifier 22706 | CCT 22708 | Identifier 22710 | 1..20 22712 | | Restricted 22714 |

Fig. 228

| GDT | Cat. | Obj. Class | Prop. | Rep./ Assn. | Type | Type Name | Lgth. | Card. | Remarks |
|---|---|---|---|---|---|---|---|---|---|
| SubContracting Indicator 22800 | | Sub Contracting 22802 | Indicator 22804 | Indicator 22806 | CCT 22808 | Indicator 22810 | | | |

Fig. 229

| GDT | Cat. | Obj. Class | Prop. | Rep./ Assn. | Type | Type Name | Lgth. | Card. | Remarks |
|---|---|---|---|---|---|---|---|---|---|
| SubHierarchy Definition Indicator 22900 | | | SubHierarchy Definition 22902 | Indicator 22904 | CCT 22906 | Indicator 22908 | | | |

Fig. 230

| GDT | Cat. | Obj. Class | Prop. | Rep./ Assn. | Type | Type Name | Lgth. | Card. | Remarks |
|---|---|---|---|---|---|---|---|---|---|
| Subject Area Code 23000 | | Subject Area 23002 | | Code 23004 | CCT 23006 | Code 23008 | 9 23010 | | Restricted 23012 |

Fig. 231

| GDT | | Cat. | Obj. Class | Prop. | Rep./ Assn. | Type | Type Name | Lgth. | Card. | Re-marks |
|---|---|---|---|---|---|---|---|---|---|---|
| Tax Jurisdic-tion Code 23100 | | Element 23102 | Tax Jurisdic-tion Code 23104 | Tax Jurisdic-tion Code 23106 | Code 23108 | CCT 23110 | Code 23112 | 1..15 23114 | | |
| | listID 23116 | Attribute 23118 | Code List 23120 | Identifica-tion 23122 | Identifier 23124 | xsd 23126 | token 23128 | 1..60 23130 | 0..1 23132 | Option-al 23134 |
| | list Version ID 23136 | Attribute 23138 | Code List 23140 | Version 23142 | Identifier 23144 | xsd 23146 | token 23148 | 1..15 23150 | 0..1 23152 | Option-al 23154 |
| | list Agency ID 23156 | Attribute 23158 | Code List Agency 23160 | Identifica-tion 23162 | Identifier 23164 | xsd 23166 | token 23168 | 1..60 23170 | 0..1 23172 | Option-al 23174 |
| | list Agency Scheme ID 23176 | Attribute 23178 | Code List Agency 23180 | Scheme 23182 | Identifier 23184 | xsd 23186 | token 23188 | 1..60 23190 | 0..1 23192 | Option-al 23194 |
| | list Agency Scheme Agency ID 23196 | Attribute 23198 | Code List Agency 23101 | Scheme Agency 23103 | Identifier 23105 | xsd 23107 | token 23109 | 3 23111 | 0..1 23113 | Option-al 23115 |

Fig. 232

| GDT | | Cat. | Obj. Class | Prop. | Rep./ Assn. | Type | Type Name | Lgth. | Card. | Remarks |
|---|---|---|---|---|---|---|---|---|---|---|
| Tex Searchable Indicator 23200 | | | | Text Searchable 23202 | Indicator 23204 | CCT 23206 | Indicator 23208 | | | |

Fig. 233

| GDT | | Cat. | Obj. Class | Prop. | Rep./ Assn. | Type | Type Name | Lgth. | Card. | Remarks |
|---|---|---|---|---|---|---|---|---|---|---|
| Time 23300 | | | | Time 23302 | DateTime 23304 | CCT 23306 | Time 23308 | | | |

Fig. 234

| GDT | | Cat. | Obj. Class | Prop. | Rep./ Assn. | Type | Type Name | Lgth. | Card. | Remarks |
|---|---|---|---|---|---|---|---|---|---|---|
| Time Period 23400 | | | Time Period 23402 | Details 23404 | | | | | | |
| | Start Time 23406 | Element 23408 | Time Period 23410 | Start Time 23412 | Time 23414 | GDT 23416 | Time 23418 | | 0..1 23420 | |
| | End Time 23422 | Element 23424 | Time Period 23426 | End Time 23428 | Time 23430 | GDT 23432 | Time 23434 | | 0..1 23436 | |
| | Duration 23438 | Element 23440 | Time Period 23442 | Duration 23444 | Duration 23446 | GDT 23448 | Duration 23450 | | 0..1 23452 | |

Fig. 235a

| GDT | | | Cat. | Obj. Class | Prop. | Rep./ Assn. | Type | Type Name | Lgth. | Card. | Remarks |
|---|---|---|---|---|---|---|---|---|---|---|---|
| Time-Series 23500 | | | | Time Series 23502 | | Details 23504 | | | | | |
| | Item 23506 | | Element 23508 | Time Series 23510 | Item 23512 | Details 23514 | | | | 1..n 23516 | |
| | | Validity Period 23518 | Element 23520 | Time Series 23522 | Validity Period 23524 | Details 23526 | GDT 23528 | Date Time Period 23530 | | 1 23532 | |
| | | Quantity 23534 | Element 23536 | Time Series 23538 | Quantity 23540 | Quantity 23542 | GDT 23544 | Quantity 23546 | | 0..1 23548 | |

Fig. 235b

| GDT | | | Cat. | Obj. Class | Prop. | Rep./ Assn. | Type | Type Name | Lgth. | Card. | Remarks |
|---|---|---|---|---|---|---|---|---|---|---|---|
| | | Price 23550 | Element 23552 | Time Series 23554 | Price 23556 | Price 23558 | GDT 23560 | Price 23562 | | 0..1 23564 | |
| | | Fixed-Indicator 23566 | Element 23568 | Time Series 23570 | Fixed Indicator 23572 | Indicator 23574 | GDT 23576 | Fixed Indicator 23578 | | 0..1 23580 | |
| | | Adjust-ment-Reason Code 23582 | Element 23584 | Time Series 23586 | Adjustment Reason 23588 | Code 23590 | GDT 23592 | Adjustment Reason Code 23594 | | 0..1 23594 | |
| | | Note 23596 | Element 23598 | Time Series 23501 | Note 23503 | Note 23505 | GDT 23507 | Note 23509 | | 0..1 23511 | |

Fig. 236

| GDT | Cat. | Obj. Class | Prop. | Rep./ Assn. | Type | Type Name | Lgth. | Card. | Remarks |
|---|---|---|---|---|---|---|---|---|---|
| Time Zone Difference Value 23600 | | | Time Zone Difference 23602 | Value 23604 | GDT 23606 | Decimal Value 23608 | 2.2 23610 | | Max.Value 12 Min. Value 12 23612 |

Fig. 237

| GDT | Cat. | Obj. Class | Prop. | Rep./Assn. Qual. | Rep./ Assn. | Type | Type Name | Lgth. | Card. | Remarks |
|---|---|---|---|---|---|---|---|---|---|---|
| Total Number Value 23700 | | | | Total Number 23702 | Value 23704 | xsd 23706 | nonNegative Integer 23708 | 1..9 23710 | | |

Fig. 238

| GDT | Cat. | Obj. Class | Prop. | Rep./ Assn. | Type | Type Name | Lgth. | Card. | Remarks |
|---|---|---|---|---|---|---|---|---|---|
| Transmission ID 23800 | | Transmission 23802 | Identification 23804 | Identifier 23806 | CCT 23808 | Identifier 23810 | 1..40 23812 | | Restricted 23814 |

Fig. 239

| GDT | | Cat. | Obj. Class | Prop. | Rep./ Assn. | Type | Type Name | Lgth. | Card. | Remarks |
|---|---|---|---|---|---|---|---|---|---|---|
| Transport-Means 23900 | | | Transport-Means 23902 | Details 23904 | Details 23906 | | | | | |
| | ID 23908 | Element 23910 | Transport-Means 23912 | Identification 23914 | Identifier 23916 | CCT 23918 | Identifier 23920 | 1..20 23922 | 0..1 23924 | Restricted 23926 |
| | Description Code 23928 | Element 23930 | Transport-Means 23932 | Description 23934 | Code 23936 | GDT 23938 | Transport Means DescriptionCode 23940 | | 1 23942 | |

Fig. 240

| GDT | Cat. | Obj. Class | Prop. | Rep./ Assn. | Type | Type Name | Lgth. | Card. | Remarks |
|---|---|---|---|---|---|---|---|---|---|
| Transport Means Description Code 24000 | | Transport Means 24002 | Description 24004 | Code 24006 | CCT 24008 | Code 24010 | 1...4 24012 | | Restricted 24014 |

Fig. 241

| GDT | Cat. | Obj. Class | Prop. | Rep./ Assn. | Type | Type Name | Lgth. | Card. | Remarks |
|---|---|---|---|---|---|---|---|---|---|
| Transport Mode Code 24100 | | Transport Mode 24102 | Code 24104 | Code 24106 | CCT 24108 | Code 24110 | 1..2 24112 | | Restricted 24114 |

Fig. 242

| GDT | Cat. | Obj. Class | Prop. | Rep./ Assn. | Type | Type Name | Lgth. | Card. | Remarks |
|---|---|---|---|---|---|---|---|---|---|
| Transport Service Level Code 24200 | | Transport 24202 | Service Level Code 24204 | Code 24206 | CCT 24208 | Code 24210 | 1..2 24212 | | Restricted 24214 |

Fig. 243

| GDT | | Cat. | Obj. Class | Prop. | Rep./ Assn. | Type | Type Name | Lgth. | Card | Remarks |
|---|---|---|---|---|---|---|---|---|---|---|
| Transport Tracking 24300 | | | Transport Tracking 24302 | Details 24304 | Details 24306 | | | | | |
| | ID 24308 | Element 24310 | Transport Tracking 24312 | Identifi-cation 24314 | Identifier 24316 | CCT 24318 | Identifier 24320 | 1..35 24322 | 1 | Restricted 24324 |
| | Web Address 24326 | Element 24328 | Transport Tracking 24330 | Web Address 24332 | Electronic Address 24334 | GDT 24336 | Web Address 24338 | | 0..1 24340 | |

Fig. 244

| GDT | | Cat. | Obj. Class | Prop. | Rep./Assn. Qual. | Rep./ Assn. | Type | Type Name | Lgth. | Card. | Remarks |
|---|---|---|---|---|---|---|---|---|---|---|---|
| Tuple Lgth. Value 24400 | | | | | Tuple Lgth. 24402 | Value 24404 | xsd 24406 | nonNegative Integer 24408 | 1..2 24410 | | |

Fig. 245

| GDT | Cat. | Obj. Class | Prop. | Rep./ Assn. | Type | Type Name | Lgth. | Card. | Remarks |
|---|---|---|---|---|---|---|---|---|---|
| Unplanned Item Permission Code 24500 | | Unplanned Item 24502 | Permission Code 24504 | Code 24506 | CCT 24508 | Code 24510 | 2 24512 | | Restricted 24514 |

Fig. 246

| GDT | Cat. | Obj. Class | Prop. | Rep./ Assn. | Type | Type Name | Lgth. | Card. | Remarks |
|---|---|---|---|---|---|---|---|---|---|
| Value Difference Indicator 24600 | | | Value Difference 24602 | Indicator 24604 | CCT 24606 | Indicator 24608 | | | |

Fig. 247

| GDT | Cat. | Obj. Class | Prop. | Rep./ Assn. | Type | Type Name | Lgth. | Card. | Remarks |
|---|---|---|---|---|---|---|---|---|---|
| Value Unlimited Indicator 24700 | | Value 24702 | Unlimited Indicator 24704 | Indicator 24706 | CCT 24708 | Indicator 24710 | | | |

Fig. 248

| GDT | Cat. | Obj. Class | Prop. | Rep./ Assn. | Type | Type Name | Lgth. | Card. | Remarks |
|---|---|---|---|---|---|---|---|---|---|
| VersionID 24800 | Element 24802 | Version 24804 | Identifica-tion 24806 | Identifier 24808 | CCT 24810 | Identifier 24812 | 1..32 24814 | | Restricted 24816 |

Fig. 249

| GDT | Cat. | Obj. Class | Prop. | Rep./ Assn. | Type | Type Name | Lgth. | Card. | Remarks |
|---|---|---|---|---|---|---|---|---|---|
| Visible Indicator 24900 | | | Visible 24902 | Indicator 24904 | CCT 24906 | Indicator 24908 | | | |

Fig. 250

| GDT | | Cat. | Obj. Class | Prop. | Rep./ Assn. | Type | TypeName | Lgth. | Card. | Remarks |
|---|---|---|---|---|---|---|---|---|---|---|
| Web Address | | | Web Address 25002 | Address 25004 | Electronic Address 25006 | CCT 25008 | Electronic Address 25010 | 1.255 25012 | | Restricted 25014 |
| | language Code 25016 | Attribut 25018 | Web Address 25020 | Language Code 25022 | Code 25024 | xsd 25026 | Language 25028 | 2..9 25030 | 0..1 25032 | |

Fig. 251

| GDT | | Cat. | Obj. Class | Prop. | Rep./ Assn. | Type | Type Name | Lgth. | Card. | Remarks |
|---|---|---|---|---|---|---|---|---|---|---|
| Work Agreement ID 25100 | | | Work Agreement 25102 | Identification 25104 | Identifier 25106 | GDT 25108 | Identifier 25110 | 1..40 25112 | | Restricted 25114 |
| | Scheme ID 25116 | Attribute 25118 | Identification Scheme 25120 | Identification 25122 | Identifier 25124 | xsd 25126 | token 25128 | 1..60 25130 | 0..1 25132 | |
| | Scheme Agency ID 25134 | Attribute 25136 | Identification Scheme Agency 25138 | Identification 25140 | Identifier 25142 | xsd 25144 | token 25146 | 1..60 25148 | 0..1 25150 | |

FIG. 280A

| Package 28000 | L. 1 28002 | L. 2 28004 | L. 3 28006 | L. 4 28008 | L. 5 28010 | Card. 28012 | Type 28014 | Name 28016 |
|---|---|---|---|---|---|---|---|---|
| Invoice Message 28018 | Invoice Message 28020 | | | | | | MDT 28022 | InvoiceMessage 28024 |
| Message Header 28026 | | Message Header 28030 | | | | 0..1 28032 | GDT 28034 | MessageHeader 28036 |
| | | | MessageID 28038 | | | 1 28040 | GDT 28042 | MessageID 28044 |
| | | | Reference MessageID 28046 | | | 0..1 28048 | GDT 28050 | MessageID 28052 |
| | | | Creation DateTime 28054 | | | 1 28056 | GDT 28058 | DateTime 28060 |
| | | | Sender Party 28062 | | | 0..1 28064 | GDT 28066 | BusinessDocument MessageHeaderParty 28068 |
| | | | Recipient Party 28070 | | | 0..1 28072 | GDT 28074 | BusinessDocument MessageHeaderParty 28076 |

FIG. 280B

| InvoiceMessage 28018 | | | | | | | | |
|---|---|---|---|---|---|---|---|---|
| Invoice 28028 | Invoice 28078 | | | | 1 28079 | GDT 28080 | Invoice 28081 |
| | | ID 28082 | | | 1 28084 | GDT 28086 | BusinessTransactionDocumentID 28088 |
| | | BillToID 28090 | | | 0..1 28092 | GDT 28094 | BusinessTransactionDocumentID 28096 |
| | | TypeCode 28098 | | | 1 28000A | GDT 28002A | BusinessTransactionDocumentTypeCode 28004A |
| | | DateTime 28006A | | | 1 28008A | GDT 28010A | DateTime 28012A |
| | | Cancellation InvoiceIndicator 28014A | | | 0..1 28016A | GDT 28018A | InvoiceCancellationInvoiceIndicator 28020A |
| | | Acceptance StatusCode 28022A | | | 0..1 28024A | GDT 28026A | AcceptanceStatusCode 28028A |
| | | Note 28030A | | | 0..1 28032A | GDT 28034A | Note 28036A |

FIG. 280C

| | | | | | | | | |
|---|---|---|---|---|---|---|---|---|
| InvoiceMessage | | | | 28018 | | | | |
| Invoice | | | | 28028 | | | | |
| Party 28038A | | | BillToParty 28056A | | | 1 28058A | GDT 28060A | BusinessTransactionDocumentParty 28062A |
| | | | BillFromParty 28064A | | | 1 28066A | GDT 28068A | BusinessTransactionDocumentParty 28070A |
| | | | BuyerParty 28072A | | | 0..1 28074A | GDT 28076A | BusinessTransactionDocumentParty 28078A |
| | | | SellerParty 28080A | | | 0..1 28082A | GDT 28084A | BusinessTransactionDocumentParty 28086A |
| | | | ProductRecipient Party 28088A | | | 0..1 28090A | GDT 28092A | BusinessTransactionDocumentParty 28094A |
| | | | VendorParty 28096A | | | 0..1 28098A | GDT 28000B | BusinessTransactionDocumentParty 28002B |
| | | | ManufacturerParty 28004B | | | 0..1 28006B | GDT 28008B | BusinessTransactionDocumentParty 28010B |
| | | | PayerParty 28012B | | | 0..1 28014B | GDT 28016B | BusinessTransactionDocumentParty 28018B |
| | | | PayeeParty 28020B | | | 0..1 28022B | GDT 28024B | BusinessTransactionDocumentParty 28026B |
| | | | CarrierParty 28028B | | | 0..1 28030B | GDT 28032B | BusinessTransactionDocumentParty 28034B |

FIG. 280D

| | | | | | | | | | | |
|---|---|---|---|---|---|---|---|---|---|---|
| InvoiceMessage | | | | | 28018 | | | | | |
| | Invoice | | | | 28028 | | | | | |
| | | Location 28040A | | | ShipToLocation 28036B | | | 0..1 28038B | GDT 28040B | BusinessTransaction DocumentLocation 28042B |
| | | | | | ShipFrom Location 28044B | | | 0..1 28046B | GDT 28048B | BusinessTransaction DocumentLocation 28050B |
| | | Delivery Information 28042A | | | DeliveryTerms 28052B | | | 0..1 28054B | GDT 28056B | DeliveryTerms 28058B |
| | | Payment Information 28044A | | | CashDiscount Terms 28060B | | | 0..1 28062B | GDT 28064B | CashDiscountTerms 28066B |
| | | | | | PaymentForm 28068B | | | 0..1 28070B | GDT 28071B | PaymentForm 28072B |
| | | Price Information 28046A | | | Price 28088B | | | 1 28090B | | |
| | | | | | | GrossAmount 28092B | | 1 28094B | GDT 28096B | Amount 28098B |

FIG. 280E

| | | | | | | | | |
|---|---|---|---|---|---|---|---|---|
| InvoiceMessage 28018 | | | | | | | | |
| Invoice 28028 | | | | | | | | |
| Price Information 28046A | | | NetAmount 28000C | | 1 28002C | GDT 28004C | Amount 28006C |
| | | | TaxAmount 28008C | | 0..1 28010C | GDT 28012C | Amount 28014C |
| | | | ExchangeRate 28016C | | 0...1 28018C | GDT 28020C | ExchangeRate 28022C |
| Tax 28048A | | ProductTax 28024C | | | 0..n 28026C | GDT 28028C | ProductTax 28030C |
| Attachment 28050A | | Attachment 28032C | | | 0..n 28034C | GDT 28036C | Attachment 28038C |
| Description 28052A | | Description 28040C | | | 0..1 28042C | GDT 28044C | Description 28046C |
| | | Confirmed Description 28048C | | | 0..1 28050C | GDT 28052C | Description 28054C |
| Item 28054A | | Item 28056C | | | 1..n 28057C | GDT 28058C | InvoiceItem 28059C |
| | | | ID 28060C | | 1 28062C | GDT 28064C | BusinessTransaction DocumentItemID 28066C |

FIG. 280F

| | | | | | | | | | | |
|---|---|---|---|---|---|---|---|---|---|---|
| InvoiceMessage 28018 | | | | | | | | | | |
| | Invoice 28028 | | | | | | | | | |
| | | Item 28054A | | | | BillToID 28068C | | 0..1 28070C | GDT 28072C | BusinessTransaction DocumentItemPartyID 28074C |
| | | | | | | TypeCode 28076C | | 1 28078C | GDT 28080C | BusinessTransaction DocumentItemTypeCode 28082C |
| | | | | | | Quantity 28084C | | 0..1 28086C | GDT 28088C | Quantity 28090C |
| | | | | | | Hierarchy Relationship 28092C | | 0..1 28094C | | |
| | | | | | | | ParentItemID 28096C | 1 28098C | GDT 28000D | BusinessTransaction DocumentItemID 28002D |
| | | | | | | | TypeCode 28004D | 1 28006D | CDT 28008D | ItemHierarchyRelationship TypeCode 28010D |
| | | | | | | Delivery Period 28012D | | 0..1 28014D | GDT 28016D | DateTimePeriod 28018D |
| | | | Product Information 28020D | | | Product 28038D | | 0..1 28040D | GDT 28042D | Product 28044D |

FIG. 280G

| | | | | | | | | |
|---|---|---|---|---|---|---|---|---|
| InvoiceMessage 28018 | | | | | | | | |
| Invoice 28028 | | | | | | | | |
| Item 28054A | | | | | | | | |
| Product Information 28020D | | | Product Category 28046D | | 0..1 28048D | GDT 28050D | ProductCategory 28052D |
| Price Information 28022D | | | Price 28054D | | 0..1 28056D | | |
| | | | | GrossAmount 28058D | 0..1 28060D | GDT 28062D | Amount 28064D |
| | | | | NetAmount 28066D | 1 28068D | GDT 28070D | Amount 28072D |
| | | | | TaxAmount 28074D | 0..1 28076D | GDT 28078D | Amount 28080D |
| | | | | NetUnitPrice 28082D | 0..1 28084D | GDT 28086D | Price 28088D |
| | | | | Component 28006E | 0..n 28008E | | |

FIG. 280H

| | | | | | |
|---|---|---|---|---|---|
| InvoiceMessage 28018 | | | | | |
| Invoice 28028 | | | | | |
| Item 28054A | | | | | |
| Tax 28024D | ProductTax 28014E | 0..n 28016E | GDT 28018E | ProductTax 28020E |
| Party 28026D | BuyerParty 28022E | 0..1 28024E | GDT 28026E | BusinessTransactionDocument Party 28028E |
| | SellerParty 28030E | 0..1 28032E | GDT 28034E | BusinessTransactionDocument Party 28036E |
| | ProductRecipientParty 28038E | 0..1 28040E | GDT 28042E | BusinessTransactionDocument Party 28044E |
| | VendorParty 28046E | 0..1 28048E | GDT 28050E | BusinessTransactionDocument Party 28052E |
| | ManufacturerParty 28054E | 0..1 28056E | GDT 28058E | BusinessTransactionDocument Party 28060E |
| | CarrierParty 28062E | 0..1 28064E | GDT 28066E | BusinessTransactionDocument Party 28068E |

FIG. 280I

| | | | | | | |
|---|---|---|---|---|---|---|
| InvoiceMessage 28018 | | | | | | |
| Invoice 28028 | | | | | | |
| Item 28054A | | | | | | |
| Location 28028D | ShipToLocation 28070E | 0..1 28072E | GDT 28074E | BusinessTransactionDocumentLocation 28076E | | |
| | ShipFromLocation 28078E | 0..1 28080E | GDT 28082E | BusinessTransactionDocumentLocation 28084E | | |
| Delivery Information 28030D | DeliveryTerms 28086E | 0..1 28088E | GDT 28090E | DeliveryTerms 28092E | | |
| Business Trans-action Document Reference 28032D | PurchaseOrder Reference 28094E | 0..n 28096E | GDT 28098E | BusinessTransactionDocumentReference 28000F | | |
| | SalesOrder Reference 28002F | 0..n 28004F | GDT 28006F | BusinessTransactionDocumentReference 28008F | | |
| | DeliveryReference 28010F | 0..1 28012F | GDT 28014F | BusinessTransactionDocumentReference 28016F | | |
| | Service Acknowledgement Reference 28018F | 0..1 28020F | GDT 28022F | BusinessTransactionDocumentReference 28024F | | |

FIG. 280J

| | | | | | | |
|---|---|---|---|---|---|---|
| InvoiceMessage 28018 | | | | | | |
| Invoice 28028 | | | | | | |
| Item 28054A | | | | | | |
| Business Transaction Document Reference 28032D | OriginInvoice Reference 28026F | 0..1 28028F | GDT 28030F | BusinessTransactionDocumentReference 28032F |
| | PurchaseContract Reference 28034F | 0..1 28036F | GDT 28038F | BusinessTransactionDocumentReference 28040F |
| | SalesContract Reference 28042F | 0..1 28044F | GDT 28046F | BusinessTransactionDocumentReference 28048F |
| | BuyerProduct Catalogue Reference 28050F | 0..1 28052F | GDT 28054F | CatalogueReference 28056F |
| | SellerProduct CatalogReference 28058F | 0..1 28060F | GDT 28062F | CatalogueReference 28064F |
| Attachment 28034D | Attachment 28066F | 0..n 28068F | GDT 28070F | Attachment 28072F |
| Description 28036D | Description 28074F | 0..1 28076F | GDT 28078F | Description 28080F |

FIG. 280K

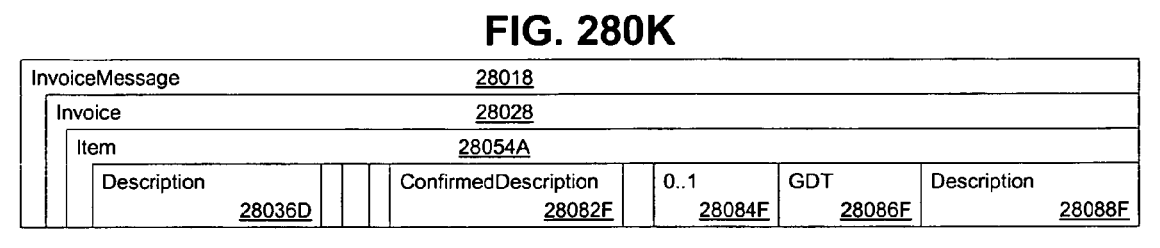

| | | | | | | | | | | | |
|---|---|---|---|---|---|---|---|---|---|---|---|
| InvoiceMessage | | | | | 28018 | | | | | | |
| | Invoice | | | | 28028 | | | | | | |
| | | Item | | | 28054A | | | | | | |
| | | | Description 28036D | | | | ConfirmedDescription 28082F | | 0..1 28084F | GDT 28086F | Description 28088F |

Fig. 290A

| Package 29000 | L1 29002 | L2 29004 | L3 29006 | L4 29008 | L5 29010 | Occ. 29012 | Datatype name 29014 |
|---|---|---|---|---|---|---|---|
| Purchase Requirement Message 29016 | Purchase Requirement Message 29018 | | | | | | MDT: PurchaseRequirement Message 29020 |
| Purchase Requirement 29022 | | Purchase Requirement 29024 | | | | 1 29026 | PurchaseRequirement 29028 |
| | | | ID 29030 | | | 1 29032 | BusinessTransactionDocumentID 29034 |
| | | | Creation-Date Time 29036 | | | 1 29038 | DateTime 29040 |
| | | | Note 29042 | | | 0..1 29044 | Note 29046 |
| Party 29048 | | | BuyerParty 29054 | | | 0..1 29056 | BusinessTransactionDocumentParty 29058 |
| | | | | Stan-dardID 29060 | | 0..n 29062 | PartyStandardID 29064 |

Fig. 290B

| | | | | | | | |
|---|---|---|---|---|---|---|---|
| Purchase Requirement Message 29016 | | | | | | | |
| Purchase Requirement 29022 | | | | | | | |
| Party 29048 | | | | InternalID 29066 | | 0..1 29068 | PartyInternalID 29070 |
| | | | | Address 29072 | | 0..1 29074 | Address 29076 |
| | | | | ContactPerson 29078 | | 0..1 29080 | ContactPerson 29082 |
| | | | | | InternalID 29084 | 0..n 29086 | ContactPersonInternalID 29088 |
| | | | | | Address 29090 | 0..1 29092 | Address 29094 |
| | | | SellerParty 29096 | | | 0..1 29098 | BusinessTransactionDocumentParty 29000A |
| | | | ProposedSeller Party 29002A | | | 0..1 29004A | BusinessTransactionDocumentParty 29006A |
| | | | RequestorParty 29008A | | | 0..1 29010A | BusinessTransactionDocumentParty 29012A |
| | | | Product RecipientParty 29014A | | | 0..1 29016A | BusinessTransactionDocumentParty 29018A |

Fig. 290C

| | | | | |
|---|---|---|---|---|
| Purchase Requirement Message 29016 | | | | |
| Purchase Requirement 29022 | | | | |
| Party 29048 | ManufacturerParty 29020A | | 0..1 29022A | BusinessTransactionDocumentParty 29024A |
| Location 29050 | ShipToLocation 29026A | | 0..1 29028A | BusinessTransactionDocumentLocation 29030A |
| | | StandardID 29032A | 0..1 29034A | LocationStandardID 29036A |
| | | InternalID 29038A | 0..1 29040A | LocationStandardID 29042A |
| | | Address 29044A | 0..1 29046A | Address 29048A |
| | ShipFromLocation 29050A | | 0..1 29052A | BusinessTransactionDocumentLocation 29054A |
| Item 29052 | Item 29056A | | 1..n 29058A | PurchaseRequirementItem 29060A |
| | | ID 29062A | 1 29064A | BusinessTransactionDocumentItemID 29066A |
| | | ThirdPartyDeal Indicator 29068A | 0..1 29070A | BusinessTransactionDocumentItem ThirdPartyDealIndicator 29072A |
| | | DirectMaterial Indicator 29074A | 0..1 29076A | DirectMaterialIndicator 29078A |

Fig. 290D

| | | | | | | | | |
|---|---|---|---|---|---|---|---|---|
| Purchase Requirement Message 29016 | | | | | | | | |
| Purchase Requirement 29022 | | | | | | | | |
| Item 29052 | | | | HierarchyRelationship 29080A | | 0..1 29082A | |
| | | | | | ParentItemID 29084A | 1 29086A | BusinessTransactionDocumentItemID 29088A |
| | | | | | TypeCode 29090A | 1 29092A | BusinessTransactionDocumentItem HierarchyRelationshipTypeCode 29094A |
| Product 29096A | | | | Product 29012B | | 0..1 29014B | BusinessTransactionDocumentProduct 29016B |
| | | | | | StandardID 29018B | 0..n 29020B | ProductStandardID 29022B |
| | | | | | InternalID 29024B | 0..1 29026B | ProductInternalID 29028B |
| | | | | | TypeCode 29030B | 0..1 29032B | ProductTypeCode 29034B |
| | | | | | Note 29036B | 0..1 29038B | Note 29040B |
| | | | | ProductCategory 29042B | | 0..1 29044B | BusinessTransactionDocumentProduct Category 29046B |

Fig. 290E

| Purchase Requirement Message 29016 | | | | | | | | |
|---|---|---|---|---|---|---|---|---|
| Purchase Requirement 29022 | | | | | | | | |
| Item 29052 | | | | | | | | |
| Product 29096A | | | | | StandardID 29048B | 0..n 29050B | ProductCategoryStandardID 29052B |
| | | | | | InternalID 29054B | 0..n 29056B | ProductCategoryInternalID 29058B |
| Price 29098A | | | | Price 29060B | | 0..1 29062B | |
| | | | | | NetUnitPrice 29064B | 0..1 29066B | Price 29068B |
| | | | | ProcurementCostUpper Limit 29070B | | 0..1 29072B | ProcurementCostUpperLimit 29074B |
| Party 29000B | | | | BuyerParty 29076B | | 0..1 29078B | BusinessTransactionDocumentParty 29080B |
| | | | | SellerParty 29082B | | 0..1 29084B | BusinessTransactionDocumentParty 29086B |
| | | | | ProposedSellerParty 29088B | | 0..1 29090B | BusinessTransactionDocumentParty 29092B |
| | | | | RequestorParty 29094B | | 0..1 29096B | BusinessTransactionDocumentParty 29098B |

Fig. 290F

| | | | | |
|---|---|---|---|---|
| Purchase Requirement Message 29016 | | | | |
| Purchase Requirement 29022 | | | | |
| Item 29052 | | | | |
| Party 29000B | ProductRecipientParty 29000C | 0..1 29002C | BusinessTransactionDocumentParty 29004C |
| | ManufacturerParty 29006C | 0..1 29008C | BusinessTransactionDocumentParty 29010C |
| Location 29002B | ShipFromLocation 29012C | 0..1 29014C | BusinessTransactionDocumentLocation 29016C |
| | ShipToLocation 29018C | 0..1 29020C | BusinessTransactionDocumentLocation 29022C |
| BusinessTransaction DocumentReference 29004B | PurchaseContract Reference 29024C | 0..1 29026C | BusinessTransactionDocument Reference 29028C |
| | OriginPurchaseOrder Reference 29030C | 0..1 29032C | BusinessTransactionDocument Reference 29034C |
| Attachment 29006B | AttachmentWebAddress 29036C | 0..1 29038C | AttachmentWebAddress 29040C |
| Description 29008B | Description 29042C | 0..1 29044C | Description 29046C |
| | InternalDescription 29048C | 0..1 29050C | Description 29052C |

Fig. 290G

| | | | | | | | | | | |
|---|---|---|---|---|---|---|---|---|---|---|
| Purchase Requirement Message 29016 | | | | | | | | | | |
| | Purchase Requirement 29022 | | | | | | | | | |
| | | Item 29052 | | | | | | | | |
| | | | ScheduleLine 29010B | | | | ScheduleLine 29054C | | 1 29056C | |
| | | | | | | | | DeliveryPeriod 29058C | 1 29060C | DateTimePeriod 29062C |
| | | | | | | | | Quantity 29064C | 0..1 29066C | Quantity 29068C |

Fig. 293A

| Package 29300 | L1 29302 | L2 29304 | L3 29306 | L4 29308 | L5 29310 | L6 29312 | Occ. 29314 | SAP GDT 29316 |
|---|---|---|---|---|---|---|---|---|
| SourceOf Supply Message 29318 | Source Of Supply Message 29320 | | | | | | | MDT: SourceOfSupplyMessage 29322 |
| SourceOf Supply 29324 | | Source Of Supply 29326 | | | | | 1..n 29328 | GDT: SourceOfSupply 29330 |
| | | | Active Indicator 29332 | | | | 1 29334 | GDT: ActiveIndicator 29336 |
| | | | Deleted Indicator 29338 | | | | 1 29340 | GDT: Deleted Indicator 29342 |
| | | | Sourcing PriorityCode 29344 | | | | 0..1 29346 | GDT: BusinessTransaction PriorityCode 29348 |
| | | | ValidityPeriod 29350 | | | | 1 29352 | GDT: DateTimePeriod 29354 |
| | | | Target Quantity 29356 | | | | 0..1 29358 | GDT: Quantity 29360 |

Fig. 293B

| SourceOf Supply Message 29318 | | | | |
|---|---|---|---|---|
| SourceOfSupply 29324 | TargetAmount 29362 | 0..1 29364 | GDT: Amount 29366 |
| | GoodsReceiptProcessing Duration 29368 | 0..1 29370 | GDT: Duration 29372 |
| | PlannedDeliveryDuration 29374 | 0..1 29376 | GDT: Duration 29378 |
| BusinessTransaction DocumentReference 29380 | PurchaseContractReference 29390 | 0..1 29392 | GDT: BusinessTransaction DocumentReference 29394 |
| | SchedulingAgreementReference 29396 | 0..1 29398 | GDT: BusinessTransaction DocumentReference 29300A |
| Party 29382 | BuyerParty 29302A | 0..1 29304A | GDT: BusinessTransaction DocumentParty 29306A |
| | SellerParty 29308A | 0..1 29310A | GDT: BusinessTransaction DocumentParty 29312A |
| Location 29384 | ShipToLocation 29314A | 0..n 29316A | GDT: BusinessTransaction DocumentLocation 29318A |

Fig. 293C

| | | | | | | | | |
|---|---|---|---|---|---|---|---|---|
| Source Of Supply Message 29318 | | | | | | | | |
| Source Of Supply 29324 | | | | | | | | |
| Location 29384 | | | ShipFrom Location 29320A | | | | 0..n 29322A | GDT: BusinessTransaction DocumentLocation 29324A |
| Product Information 29386 | | | Product 29326A | | | | 0..1 29328A | GDT: BusinessTransaction DocumentProduct 29330A |
| | | | Product Category 29332A | | | | 0..1 29334A | GDT: ProductCategory 29336A |
| Price Information 29388 | | | Price 29338A | | | | 0..n 29340A | |
| | | | | ShipToLocation 29342A | | | 0..1 29344A | GDT: BusinessTransaction DocumentLocation 29346A |
| | | | | ValidityPeriod 29348A | | | 1 29350A | GDT: DateTimePeriod 29352A |
| | | | | FixedCosts Amount 29354A | | | 0..1 29356A | GDT: Amount 29358A |
| | | | | NetUnitPrice 29360A | | | 0..1 29362A | GDT: Price 29364A |

Fig.293D

| | | | | | | | | | |
|---|---|---|---|---|---|---|---|---|---|
| Source Of Supply Message 29318 | | | | | | | | | |
| | Source Of Supply 29324 | | | | | | | | |
| | | Price Information 29388 | | | | Scale 29366A | | | 0..1 29368A | |
| | | | | | | | AxisInterval Boundary Type Code 29370A | | 1 29372A | GDT: ScaleAxisInterval BoundaryTypeCode 29374A |
| | | | | | | | Line 29376A | | 1..n 29378A | |
| | | | | | | | | Quantity 29380A | 1 29382A | GDT: Quantity 29384A |
| | | | | | | | | NetUnitPrice 29386A | 1 29388A | GDT: Price 29390A |

Fig. 297A

| Package 29700 | L1 29702 | L2 29704 | L3 29706 | L4 29708 | L5 29710 | L6 29712 | L7 29714 | Oc. 29716 | Type 29718 | Name 29720 |
|---|---|---|---|---|---|---|---|---|---|---|
| Purchase Order Message 29722 | Purchase Order Message 29724 | | | | | | | | MDT 29726 | Purchase Order Message 29728 |
| Message Header 29730 | | Message Header 29734 | | | | | | 1 29736 | AGDT 29738 | Business Document Message Header 29740 |
| | | | MessageID 29742 | | | | | 1 29744 | GDT 29746 | Business Document MessageID 29748 |
| | | | Reference ID 29750 | | | | | 0..1 29752 | GDT 29754 | Business Document MessageID 29756 |
| | | | Creation DateTime 29758 | | | | | 1 29760 | GDT 29762 | DateTime 29764 |

Fig. 297B

| PurchaseOrderMessage 29722 | | | | | | | |
|---|---|---|---|---|---|---|---|
| Message Header 29730 | | Sender Party 29766 | | | 0..1 29768 | AGDT 29770 | BusinessDocument MessageHeaderParty 29772 |
| | | | InternalID 29774 | | 0..1 29776 | CDT 29778 | PartyInternalID 29780 |
| | | | StandardID 29782 | | 0..n 29784 | CDT 29786 | PartyStandardID 29788 |
| | | | Contact Person 29790 | | 0..1 29792 | CDT 29794 | ContactPerson 29796 |
| | | | | BuyerID 29798 | 0..1 29700A | CDT 29702A | ContactPersonPartyID 29704A |
| | | | | SellerID 29706A | 0..1 29708A | CDT 29710A | ContactPersonPartyID 29712A |
| | | | | Address 29714A | 0..1 29716A | AGDT 29718A | Address 29720A |
| | | Recipient Party 29722A | | | 0..n 29724A | AGDT 29726A | BusinessDocument MessageHeaderParty 29728A |
| Purchase Order 29732 | Purchase Order 29730A | | | | 1 29732A | AGDT 29734A | PurchaseOrder 29736A |

Fig. 297C

| PurchaseOrderMessage 29722 | | | | | |
|---|---|---|---|---|---|
| Purchase Order 29732 | ID 29738A | 1 29740A | GDT 29742A | BusinessTransaction DocumentID 29744A |
| | SellerID 29746A | 0..1 29748A | GDT 29750A | BusinessTransaction DocumentID 29752A |
| | BuyerPostingDateTime 29754A | 0..1 29756A | GDT 29758A | DateTime 29760A |
| | BuyerLastChangeDate Time 29762A | 0..1 29764A | GDT 29766A | DateTime 29768A |
| | SellerPostingDateTime 29770A | 0..1 29772A | GDT 29774A | DateTime 29776A |
| | SellerLastChangeDate Time 29778A | 0..1 29780A | GDT 29782A | DateTime 29784A |
| | AcceptanceStatusCode 29786A | 0..1 29788A | GDT 29790A | AcceptanceStatusCode 29792A |
| | Note 29794A | 0..1 29796A | GDT 29798A | Note 29700B |

Fig. 297D

PurchaseOrderMessage 29722

| | | | | | | |
|---|---|---|---|---|---|---|
| Purchase Order 29732 | | ItemList Complete Transmission Indicator 29702B | | 0..1 29704B | GDT 29706B | Complete Transmission Indicator 29708B |
| | Party 29710B | BuyerParty 29726B | | 0..1 29728B | AGDT 29730B | BusinessTransaction DocumentParty 29732B |
| | | | StandardID 29734B | 0..n 29736B | CDT 29738B | PartyStandardID 29740B |
| | | | BuyerID 29742B | 0..1 29744B | CDT 29746B | PartyPartyID 29748B |
| | | | SellerID 29750B | 0..1 29752B | CDT 29754B | PartyPartyID 29756B |
| | | | Address 29758B | 0..1 29760B | AGDT 29762B | Address 29764B |
| | | | Contact Person 29766B | 0..1 29768B | CDT 29770B | ContactPerson 29772B |

Fig. 297E

| | | | | | | |
|---|---|---|---|---|---|---|
| PurchaseOrderMessage 29722 | | | | | | |
| PurchaseOrder 29732 | | | | | | |
| Party 29710B | | | BuyerID 29790B | 0..1 29792B | CDT 29794B | ContactPersonPartyID 29796B |
| | | | SellerID 29798B | 0..1 29700C | CDT 29702C | ContactPersonPartyID 29704C |
| | | | Address 29706C | 0..1 29708C | AGDT 29710C | Address 29712C |
| | SellerParty 29714C | | | 0..1 29716C | AGDT 29720C | BusinessTransaction DocumentParty 29722C |
| | Product Recipient Party 29724C | | | 0..1 29726C | AGDT 29728C | BusinessTransaction DocumentParty 29730C |
| | VendorParty 29732C | | | 0..1 29734C | AGDT 29736C | BusinessTransaction DocumentParty 29738C |

Fig. 297F

| | | | | | | |
|---|---|---|---|---|---|---|
| PurchaseOrderMessage 29722 | | | | | | |
| PurchaseOrder 29732 | | | | | | |
| Party 29710B | ManufacturerParty 29740C | | 0..1 29742C | AGDT 29744C | BusinessTransactionDocumentParty 29746C |
| | BillToParty 29748C | | 0..1 29750C | AGDT 29752C | BusinessTransactionDocumentParty 29754C |
| | PayerParty 29756C | | 0..1 29758C | AGDT 29760C | BusinessTransactionDocumentParty 29762C |
| | CarrierParty 29764C | | 0..1 29766C | AGDT 29768C | BusinessTransactionDocumentParty 29770C |
| Location 29712B | ShipToLocation 29772C | | 0..1 29774C | AGDT 29776C | BusinessTransactionDocumentShipToLocation 29778C |
| | | StandardID 29780C | 0..n 29782C | CDT 29784C | LocationStandardID 29786C |
| | | BuyerID 29788C | 0..1 29790C | CDT 29792C | LocationPartyID 29794C |
| | | SellerID 29796C | 0..1 29798C | CDT 29700D | LocationPartyID 29702D |

Fig. 297G

PurchaseOrderMessage 29722

PurchaseOrder 29732

| | | | | | | |
|---|---|---|---|---|---|---|
| Location 29712B | | Address 29704D | | 0..1 29706D | AGDT 29708D | Address 29710D |
| | ShipFrom Location 29712D | | | 0..1 29714D | AGDT 29716D | BusinessTransaction DocumentShipFrom Location 29718D |
| Delivery Information 29714B | Delivery Terms 29720D | | | 0..1 29722D | AGDT 29724D | DeliveryTerms 29726D |
| | | Delivery ItemGroup ID 29728D | | 0..1 29730D | GDT 29732D | BusinessTransaction DocumentItemGroup ID 29734D |
| | | Delivery Priority Code 29736D | | 0..1 29738D | GDT 29740D | BusinessTransaction PriorityCode 29742D |
| | | Incoterms 29744D | | 0..1 29746D | GDT 29748D | Incoterms 29750D |
| | | | Classification Code 29752D | 1 29754D | | |

Fig. 297H

PurchaseOrderMessage 29722

PurchaseOrder 29732

| | | | | |
|---|---|---|---|---|
| Delivery Information 29714B | TransferLocation Name 29756D | 0..1 29758D | | |
| | Partial Delivery 29760D | 0..1 29762D | AGDT 29764D | PartialDelivery 29766D |
| | MaximalNumber 29768D | 0..1 29770D | | |
| | Unlimited Indicator 29772D | 0..1 29774D | GDT 29776D | UnlimitedIndicator 29778D |
| | Quantity Tolerance 29780D | 0..1 29782D | AGDT 29784D | QuantityTolerance 29786D |
| | OverPercent 29788D | 0..1 29790D | GDT 29792D | Percent 29794D |
| | OverPercent Unlimited Indicator 29796D | 0..1 29798D | GDT 29700E | UnlimitedIndicator 29702E |

Fig. 297I

| | | | | | |
|---|---|---|---|---|---|
| PurchaseOrderMessage 29722 | | | | | |
| PurchaseOrder 29732 | | | | | |
| Delivery Information 29714B | | UnderPercent 29704E | 0..1 29706E | GDT 29708E | Percent 29710E |
| | Maximum LeadTime Duration 29712E | | 0..1 29714E | GDT 29716E | Duration 29718E |
| | Transport 29720E | | 0..1 29722E | | |
| | | ServiceLevel Code 29724E | 0..1 29726E | GDT 29728E | TransportServiceLevel Code 29730E |
| | | ModeCode 29732E | 0..1 29734E | GDT 29736E | TransportModeCode 29738E |
| | | Means DescriptionCode 29740E | 0..1 29742E | GDT 29744E | TransportMeans DescriptionCode 29746E |
| | Description 29748E | | 0..1 29750E | GDT 29752E | Description 29754E |
| | | LanguageCode 29756E | 1 29757E | | |

Fig. 297J

PurchaseOrderMessage 29722

PurchaseOrder 29732

| | | | | | | |
|---|---|---|---|---|---|---|
| Payment Information 29716B | Cash Discount Terms 29758E | | | 0..1 29760E | AGDT 29762E | CashDiscount Terms 29764E |
| | | PaymentBase LineDate 29766E | | 0..1 29768E | GDT 29770E | Date 29772E |
| | | MaximumCash Discount 29774E | | 0..1 29776E | GDT 29778E | CashDiscount 29780E |
| | | | DaysValue 29782E | 1 29783E | | |
| | | | Percent 29784E | 1 29785E | GDT 29786E | Percent 29788E |
| | | NormalCash Discount 29790E | | 0..1 29792E | GDT 29794E | CashDiscount 29796E |
| | | | DaysValue 29798E | 1 29700F | | |

Fig. 297K

PurchaseOrderMessage 29722

PurchaseOrder 29732

| | | | | | | |
|---|---|---|---|---|---|---|
| Payment Information 29716B | | | Percent 29702F | 1 29704F | GDT 29706F | Percent 29708F |
| | | FullPayment DueDays Value 29710F | | 0..1 29712F | | |
| | Payment Form 29714F | | | 0..1 29716F | | |
| | | Code 29718F | | 1 29720F | GDT 29722F | PaymentFormCode 29724F |
| | | Payment Card 29726F | | 0..1 29728F | AGDT 29730F | PaymentCard 29732F |
| | | | ID 29734F | 1 29736F | GDT 29738F | PaymentCardID 29740F |
| | | | ReferenceID 29742F | 0..1 29744F | | |
| | | | SequenceID 29746F | 0..1 29748F | | |

Fig. 297L

PurchaseOrderMessage 29722

PurchaseOrder 29732

| | | | | | | | | | | |
|---|---|---|---|---|---|---|---|---|---|---|
| Payment Information 29716B | | | | | Holder 29750F | | | 0..1 29752F | | |
| | | | | | Expiration Date 29754F | | | 1 29756F | GDT 29758F | Date 29760F |
| Attachment 29718B | | | Attachment 29762F | | | | | 0..n 29764F | GDT 29766F | Attachment 29768F |
| | | | | ID 29770F | | | | 1 29772F | | |
| | | | | Filename 29774F | | | | 0..1 29776F | | |
| | | | Attachment WebAddress 29762FA | | | | | 0..n 29762FB | | AttachmentWebAddress 29762FC |
| Description 29720B | | | Description 29778F | | | | | 0..1 29780F | GDT 29782F | Description 29784F |
| | | | | LanguageCode 29786F | | | | 1 29788F | | |
| | | | Confirmation Description 29790F | | | | | 0..1 29792F | GDT 29794F | Description 29796F |
| | | | | LanguageCode 29798F | | | | 1 29700G | | |

Fig. 297M

| | | | | |
|---|---|---|---|---|
| PurchaseOrderMessage 29722 | | | | |
| PurchaseOrder 29732 | | | | |
| FollowUp Message 29722B | FollowUpPurchase OrderConfirmation 29702G | | 0..1 29704G | | |
| | | Requirement Code 29706G | 1 29708G | GDT 29710G | FollowUpMessage RequirementCode 29712G |
| | FollowUpDespatched DeliveryNotification 29714G | | 0..1 29716G | | |
| | | Requirement Code 29718G | 1 29720G | GDT 29722G | FollowUpMessage RequirementCode 29724G |
| | FollowUpService Acknowledgement Request 29726G | | 0..1 29728G | | |

Fig. 297N

| | | | | | |
|---|---|---|---|---|---|
| PurchaseOrderMessage 29722 | | | | | |
| PurchaseOrder 29732 | | | | | |
| FollowUp Message 29722B | | Requirement Code 29734G | 1 29736G | GDT 29738G | FollowUpMessage RequirementCode 29740G |
| | FollowUp Invoice Request 29742G | | 0..1 29744G | | |
| | | Requirement Code 29746G | 1 29748G | GDT 29750G | FollowUpMessage RequirementCode 29752G |
| | | Evaluated Receipt Settlement Indicator 29754G | 0..1 29756G | GDT 29758G | EvaluatedReceiptSettlement Indicator 29760G |
| Item 29724B | Item 29762G | | 0..n 29764G | AGDT 29766G | PurchaseOrderItem 29768H |
| | | ID 29770G | 0..1 29772G | GDT 29774G | BusinessTransaction DocumentItemID 29776G |
| | | SellerID 29778G | 0..1 29780G | GDT 29782G | BusinessTransaction DocumentItemID 29784G |

Fig. 297O

| | | | |
|---|---|---|---|
| PurchaseOrderMessage 29722 | | | |
| PurchaseOrder 29732 | | | |

| Item | Element | Sub-element | Cardinality | Type | Data Type |
|---|---|---|---|---|---|
| Item 29724B | ActionCode 29786G | | 1 29788G | GDT 29790G | ActionCode 29792G |
| | AcceptanceStatus Code 29794G | | 0..1 29796G | GDT 29798G | AcceptanceStatusCode 29700H |
| | UnplannedItem PermissionCode 29702H | | 0..1 29704H | GDT 29706H | UnplannedItem PermissionCode 29708H |
| | UnconfirmrdQuantityCancelledIndicator 29702HA | | 0..1 29704HA | GDT 29706HA | CancelledIndicator 29708HA |
| | GoodsReceiptBasedInvoiceVerificationIndicator 29702HB | | 0..1 29704HB | GDT 29706HB | GoodsReceiptBasedInvoiceVerificationIndicator 29708HB |
| | Hierarchy Relationship 29710H | | 0..1 29712H | | |
| | | ParentItemID 29714H | 0..1 29716H | GDT 29718H | BusinessTransaction DocumentItemID 29720H |
| | | ParentItem SellerID 29722H | 0..1 29724H | GDT 29726H | BusinessTransaction DocumentItemID 29728H |
| | | TypeCode 29730H | 1 29732H | GDT 29734H | BusinessTransaction DocumentItemHierarchy RelationshipTypeCode 29736H |

Fig. 297P

| | | | | | | |
|---|---|---|---|---|---|---|
| PurchaseOrderMessage 29722 | | | | | | |
| PurchaseOrder 29732 | | | | | | |
| Item 29724B | | | | | | |
| Product Information 29738H | Product 29750H | | 0..1 29751H | GDT 29752H | BusinessTransaction DocumentProduct 29753H |
| | | StandardID 29754H | 0..n 29755H | CDT 29756H | ProductStandardID 29757H |
| | | BuyerID 29758H | 0..1 29759H | CDT 29760H | ProductPartyID 29761H |
| | | SellerID 29762H | 0..1 29763H | CDT 29764H | ProductPartyID 29765H |
| | | ManufacturerID 29766H | 0..1 29768H | CDT 29770H | ProductPartyID 29772H |
| | | TypeCode 29774H | 0..1 29776H | GDT 29778H | ProductTypeCode 29780H |
| | | Note 29782H | 0..1 29784H | GDT 29786H | Note 29788H |
| | Product Category 29790H | | 0..1 29792H | GDT 29794H | BusinessTransaction DocumentProductCategory 29796H |
| | | StandardID 29798H | 0..n 29700I | CDT 29702I | ProductCategoryStandardID 29704I |

Fig. 297Q

| | | | | | | | |
|---|---|---|---|---|---|---|---|
| PurchaseOrderMessage 29722 | | | | | | | |
| PurchaseOrder 29732 | | | | | | | |
| Item 29724B | | | | | | | |
| Product Information 29738H | | BuyerID 29706I | | | 0..1 29708I | CDT 29710I | ProductCategory PartyID 29712I |
| | | SellerID 29714I | | | 0..1 29716I | CDT 29718I | ProductCategory PartyID 29720I |
| Price Information 29740H | Price 29722I | | | | 0..1 29724I | | |
| | | NetUnitPrice 29726I | | | 0..1 29728I | AGDT 29730I | Price 29732I |
| | | | Amount 29734I | | 1 29736I | GDT 29738I | Amount 29740I |
| | | | | Currency Code 29742I | 1 | | |
| | | | Base Quantity 29744I | | 1 29746I | GDT 29748I | Quantity 29750I |

Fig. 297R

| | | | | | | | | | |
|---|---|---|---|---|---|---|---|---|---|
| PurchaseOrderMessage 29722 | | | | | | | | | |
| PurchaseOrder 29732 | | | | | | | | | |
| Item 29724B | | | | | | | | | |
| Price Information 29740H | | | | | UnitCode 29752I | 1 29754I | | | |
| | Confirmed Price 29756I | | | | | 0..1 29758I | | | |
| | | NetUnit Price 29760I | | | | 0..1 29762I | AGDT 29764I | Price 29766I | |
| | | | Amount 29768I | | | 1 29770I | GDT 29772I | Amount 29774I | |
| | | | | | Currency Code 29776I | 1 29778I | | | |
| | | | Base Quality 29782I | | | 1 29784I | GDT 29786I | Quantity 29788I | |
| | | | | | UnitCode 29790I | 1 29792I | | | |

Fig. 297S

PurchaseOrderMessage 29722

PurchaseOrder 29732

Item 29724D

| | | | | |
|---|---|---|---|---|
| Party 29736H | BuyerParty 29794I | 0..1 29796I | AGDT 29798I | BusinessTransactionDocumentParty 29700J |
| | SellerParty 29702J | 0..1 29704J | AGDT 29706J | BusinessTransactionDocumentParty 29708J |
| | Product RecipientParty 29710J | 0..1 29712J | AGDT 29714J | BusinessTransactionDocumentParty 29716J |
| | VendorParty 29718J | 0..1 29720J | AGDT 29722J | BusinessTransactionDocumentParty 29724J |
| | Manufacturer Party 29726J | 0..1 29728J | AGDT 29730J | BusinessTransactionDocumentParty 29732J |
| | BillToParty 29734J | 0..1 29736J | AGDT 29738J | BusinessTransactionDocumentParty 29740J |
| | PayerParty 29742J | 0..1 29744J | AGDT 29746J | BusinessTransactionDocumentParty 29748J |
| | CarrierParty 29750J | 0..1 29752J | AGDT 29754J | BusinessTransactionDocumentParty 29756J |

Fig. 297T

PurchaseOrderMessage 29722

PurchaseOrder 29732

Item 29724D

| | | | | | |
|---|---|---|---|---|---|
| Location 29738H | ShipTo Location 29758J | | 0..1 29760J | AGDT 29762J | BusinessTransactionDocumentShipToLocation 29764J |
| | ShipFrom Location 29766J | | 0..1 29768J | AGDT 29770J | BusinessTransactionDocumentShipFromLocation 29772J |
| Delivery Information 29740H | Delivery Terms 29774J | | 0..1 29776J | AGDT 29778J | DeliveryTerms 29780J |
| Business Transaction Document Reference 29742H | Quote Reference 29782J | | 0..1 29784J | AGDT 29786J | BusinessTransactionDocument Reference 29788J |
| | | ID 29790J | 1 29792J | GDT 29794J | BusinessTransactionDocumentID 29796J |
| | | ItemID 29798J | 0..n 29700K | GDT 29702K | BusinessTransactionDocumentItem ID 29704K |
| | Purchase Contract Reference 29706K | | 0..n 29708K | AGDT 29710K | BusinessTransactionDocument Reference 29712K |

Fig. 297U

PurchaseOrderMessage 29722

PurchaseOrder 29732

Item 29724D

| | | | | | |
|---|---|---|---|---|---|
| Business Transaction Document Reference 29742H | | ID 29714K | 1 29716K | GDT 29718K | BusinessTransactionDocumentID 29720K |
| | | ItemID 29722K | 0..n 29724K | GDT 29726K | BusinessTransactionDocumentItem ID 29728K |
| | Sales Contract Reference 29730K | | 0..n 29732K | AGDT 29734K | BusinessTransactionDocument Reference 29736K |
| | | ID 29738K | 1 29740K | GDT 29742K | BusinessTransactionDocumentID 29744K |
| | | ItemID 29746K | 0..n 29748K | GDT 29750K | BusinessTransactionDocumentItem ID 29752K |
| | Origin Purchase Order Reference 29754K | | 0..1 29756K | AGDT 29758K | BusinessTransactionDocument Reference 29760K |
| | | ID 29762K | 1 29764K | GDT 29766K | BusinessTransactionDocumentID 29768K |

Fig. 297V

| | | | | | |
|---|---|---|---|---|---|
| PurchaseOrderMessage 29722 | | | | | |
| PurchaseOrder 29732 | | | | | |
| Item 29724D | | | | | |
| Business Transaction Document Reference 29742H | | ItemID 29770K | 0..n 29772K | GDT 29774K | BusinessTransaction DocumentItemID 29776K |
| | BuyerProduct Catalogue Reference 29778K | | 0..1 29780K | AGDT 29782K | CatalogueReference 29784K |
| | | ID 29786K | 1 29788K | GDT 29790K | CatalogueID 29792K |
| | | ItemID 29794K | 0..n 29796K | GDT 29798K | CatalogueItemID 29700L |
| | SellerProduct Catalogue Reference 29702L | | 0..1 29704L | AGDT 29706L | CatalogueReference 29708L |
| | | ID 29710L | 1 29712L | GDT 29714L | CatalogueID 29716L |
| | | ItemID 29718L | 0..n 29720L | GDT 29722L | CatalogueItemID 29724L |

Fig. 297W

PurchaseOrderMessage 29722

PurchaseOrder 29732

Item 29724D

| | | | | | |
|---|---|---|---|---|---|
| Attachment 29744H | Attachment 29726L | | 0..n 29728L | AGDT 29732L | Attachment 29734L |
| | AttachmentWebAddress 29726LA | | 0..n 29728LA | AGDT 29732LA | AttachmentWebAddress 29734LA |
| Description 29746H | Description 29736L | | 0..1 29738L | GDT 29740L | Description 29742L |
| | | Language Code 29744L | 1 29746L | | |
| | Confirmation Description 29748L | | 0..1 29750L | GDT 29752L | Description 29754L |
| | | Language Code 29756L | 1 29758L | | |
| Schedule Line 29748H | ScheduleLine 29760L | | 0..n 29762L | AGDT 29764L | PurchaseOrderItem ScheduleLine 29766L |
| | | ID 29768L | 0..1 29770L | GDT 29772L | BusinessTransaction DocumentItem ScheduleLineID 29774L |

Fig. 297X

| | | | | | |
|---|---|---|---|---|---|
| PurchaseOrderMessage 29722 | | | | | |
| PurchaseOrder 29732 | | | | | |
| Item 29724D | | | | | |
| Schedule Line 29748H | SellerID 29776L | | 0..1 29778L | GDT 29780L | BusinessTransactionDocumentItemScheduleLineID 29782L |
| | Delivery Period 29784L | | 1 29786L | AGDT 29788L | DateTimePeriod 29790L |
| | | StartDate Time 29792L | 0..1 29794L | GDT 29796L | DateTime 29798L |
| | | EndDate Time 29700M | 0..1 29702M | GDT 29704M | DateTime 29706M |
| | | Duration 29708M | 0..1 29710M | GDT 29712M | Duration 29714M |
| | Quantity 29716M | | 0..1 29718M | GDT 29720M | Quantity 29722M |
| | | UnitCode 29724M | 1 29726M | | |

Fig. 297Z

| | | | | | |
|---|---|---|---|---|---|
| PurchaseOrderMessage 29722 | | | | | |
| PurchaseOrder 29732 | | | | | |
| Item 29724D | | | | | |
| FollowUp Message 29759A | FollowUpPurchase OrderConfirmation 29744HA | | 0..1 29746HA | | |
| | | Requirement Code 29748HA | 1 29750HA | FollowUpMessage RequirementCode 29752HA | |
| | FollowUpDespatched DeliveryNotification 29754HA | | 0..1 29756HA | | |
| | | Requirement Code 29760HA | 1 29762HA | FollowUpMessage RequirementCode 29764HA | |
| | FollowUpService Acknowledgement Request 29766HA | | 0..1 29768HA | | |
| | | Requirement Code 29770HA | 1 29772HA | FollowUpMessage RequirementCode 29774HA | |

Fig. 297ZA

| | | | |
|---|---|---|---|
| PurchaseOrderMessage 29722 | | | |
| PurchaseOrder 29732 | | | |
| Item 29724D | | | |
| FollowUp Message 29759A / FollowUp InvoiceRequest 29776HA | | 0..1 29778HA | |
| | Requirement Code 29780HA | 1 29782HA | FollowUpMessage RequirementCode 29784HA |
| | Evaluated Receipt Settlement Indicator 29786HA | 0..1 29788HA | EvaluatedReceipt SettlementIndicator 29790HA |

Fig. 300A

| Package 30000 | L1 30002 | L2 30004 | L3 30006 | L4 30008 | L5 30010 | Card 30012 | Type 30014 | DTN 30016 | PIDEX 30018 |
|---|---|---|---|---|---|---|---|---|---|
| Service Acknowledge-mentMessage 30020 | Service Acknow-ledgement Message 30022 | | | | | | MDT 30024 | Service Acknowledge-mentMessage 30026 | |
| Message Header 30028 | | Message Header 30032 | | | | 1 30034 | AGDT 30036 | Business Document MessageHeader 30038 | |
| | | | ID 30040 | | | 1 30042 | GDT 30044 | Business Document MessageID 30046 | |
| | | | ReferenceID 30048 | | | 0..1 30050 | GDT 30052 | Business Document MessageID 30054 | |
| | | | Creation DateTime 30056 | | | 1 30058 | GDT 30060 | DateTime 30062 | |
| | | | SenderParty 30064 | | | 0..1 30066 | AGDT 30068 | BusinessDocu-mentMessage HeaderParty 30070 | |

Fig. 300B

| ServiceAcknowledgementMessage 30020 | | | | | | | |
|---|---|---|---|---|---|---|---|
| Message Header 30028 | | | InternalID 30072 | | 0..1 30074 | CDT 30076 | PartyInternalID 30078 |
| | | | StandardID 30080 | | 0..n 30082 | CDT 30084 | PartyStandardID 30086 |
| | | | Contract Person 30088 | | 0..1 30090 | AGDT 30092 | ContactPerson 30094 |
| | | | | BuyerID 30096 | 0..1 30098 | CDT 30000A | ContactPersonParty ID 30002A |
| | | | | VendorID 30004A | 0..1 30006A | CDT 30008A | ContactPersonParty ID 30010A |
| | | | | Address 30012A | 0..1 30014A | AGDT 30016A | Address 30018A |
| | | Recipient Party 30020A | | | 0..n 30022A | AGDT 30024A | BusinessDocument MessageHeaderParty 30026A |
| Service Acknow-Ledgement 30030 | Service Acknow-ledgement 30028A | | | | 1 30030A | AGDT 30032A | Service Acknowledgement 30034A |

Fig. 300C

| ServiceAcknowledgementMessage 30020 | | | | | |
|---|---|---|---|---|---|
| Service Acknow-ledgement 30030 | ID 30036A | 1 30038A | GDT 30040A | BusinessTrans-actionDocumentID 30042A | FieldTicketProperties-FieldTicketNumber 30044A |
| | BuyerID 30046A | 0..1 30048A | GDT 30050A | BusinessTrans-actionDocumentID 30052A | |
| | Creation DateTime 30054A | 0..1 30056A | GDT 30058A | DateTime 30060A | FieldTicketProperties-FieldTicketDate 30062A |
| | Cancellation Service Acknow-ledgement Indicator 30051A | 0..1 30053A | GDT 30055A | CancellationService Acknowledgement Indicator 30057A | |
| | Acceptance StatusCode 30064A | 0..1 30066A | GDT 30068A | AcceptanceStatus Code 30070A | FieldTicketResponse LineItem-LineStatus Code 30072A |
| | Note 30074A | 0..1 30076A | GDT 30078A | Note 30080A | |

Fig. 300D

| | | | | | | | |
|---|---|---|---|---|---|---|---|
| ServiceAcknowledgementMessage 30020 | | | | | | | |
| Party 30082A | BuyerParty 30092A | | 0..1 30094A | AGDT 30096A | BusinessTransactionDocumentParty 30098A | PartnerInformation (all Parties) 30000B |
| | | StandardID 30002B | 0..n 30004B | CDT 30006B | PartyStandardID 30008B | |

Fig. 300E

ServiceAcknowledgementMessage 30020

ServiceAcknowledgement 30030

| | | | | | | | | | |
|---|---|---|---|---|---|---|---|---|---|
| Party 30082A | | | BuyerID 30010B | | 0..1 30012B | CDT 30014B | PartyPartyID 30016B | |
| | | | SellerID 30018B | | 0..1 30020B | CDT 30022B | PartyPartyD 30024B | |
| | | | Address 30026B | | 0..1 30028B | AGDT 30030B | Address 30032B | |
| | | | Contract Person 30034B | | 0..1 30036B | AGDT 30038B | ContactPerson 30040B | |
| | | | | BuyerID 30042B | 0..1 30044B | CDT 30046B | ContactPersonPartyID 30048B | |
| | | | | SellerID 30050B | 0..1 30052B | CDT 30054B | ContactPersonPartyID 30056B | |
| | | | | Address 30058B | 0..1 30060B | AGDT 30062B | Address 30064B | |
| | | Seller Party 30066B | | | 0..1 30068B | AGDT 30070B | BusinessTransaction DocumentParty 30072B | Partner Information 30074B |

Fig. 300F

ServiceAcknowledgementMessage 30020

ServiceAcknowledgement 30030

| | | | | | | |
|---|---|---|---|---|---|---|
| Party 30082A | Product Recipient Party 30076B | | 0..1 30078B | AGDT 30080B | BusinessTransaction DocumentParty 30082B | PartnerInformation 30084B |
| | Vendor Party 30086B | | 0..1 30088B | AGDT 30090B | BusinessTransaction DocumentParty 30092B | PartnerInformation and partially CountryOfOrigin 30094B |
| | Manufacture rParty 30096B | | 0..1 30098B | AGDT 30000C | BusinessTransaction DocumentParty 30002C | PartnerInformation 30004C |
| Location 30084A | ShipTo Location 30006C | | 0..1 30008C | AGDT 30010C | BusinessTransaction DocumentLocation 30012C | partially : Country OfFinalDestination 30014C |
| | | StandardID 30016C | 0..n 30018C | CDT 30020C | LocationStandardID 30022C | |
| | | BuyerID 30024C | 0..1 30026C | CDT 30028C | LocationPartyID 30030C | |
| | | SellerID 30032C | 0..1 30034C | CDT 30036C | LocationPartyID 30038C | |
| | | Address 30040C | 0..1 30042C | AGDT 30044C | Address 30046C | |
| Attach-ment 30086A | Attachment 30048C | | 0..n 30050C | AGDT 30052C | Attachment 30054C | FieldTicketProperties -Attachment 30056C |

Fig. 300G

ServiceAcknowledgementMessage 30020

ServiceAcknowledgement 30030

| | | | | | | |
|---|---|---|---|---|---|---|
| Description 30088A | Description 30058C | | 0..1 30060C | GDT 30062C | Description 30064C | FieldTicket Properties-Comment and -JobSummary 30066C |
| | Confirmation Description 30068C | | 0..1 30070C | GDT 30072C | Description 30074C | |
| Item 30090A | Item 30076C | | 0..n 30078C | AGDT 30080C | Service Acknowledgement Item 30082C | |
| | | ID 30084C | 1 30086C | GDT 30088C | Business Transaction DocumentItemID 30090C | FieldTicket LineItem-LineItem Number 30092C |
| | | BuyerID 30094C | 0..1 30096C | GDT 30098C | Business Transaction DocumentItemID 30000D | |

Fig. 300H

ServiceAcknowledgementMessage 30020

ServiceAcknowledgement 30030

| | | | | | | |
|---|---|---|---|---|---|---|
| Item 30090A | ServiceEntry Completed Indicator 30002D | | 0..1 30004D | GDT 30006D | Business Transaction CompletedID 30008D | |
| | Delivery Period 30010D | | 0..1 30012D | GDT 30014D | DateTimePeriod 30016C | FieldTicketLineItem-ServiceDateTime 30018D |
| | Quantity 30020D | | 0..1 30022D | GDT 30024D | Quantity 30026D | FieldTicketProperties-FieldTicketQuantity 30028D |
| | Hierarchy Relationship 30030D | | 0..1 30032D | | | realized with FieldTicket SubLineItem 30034D |
| | | ParentItem ID 30036D | 0..1 30038D | GDT 30040D | Business Transaction DocumentItem ID 30042D | |

Fig. 300I

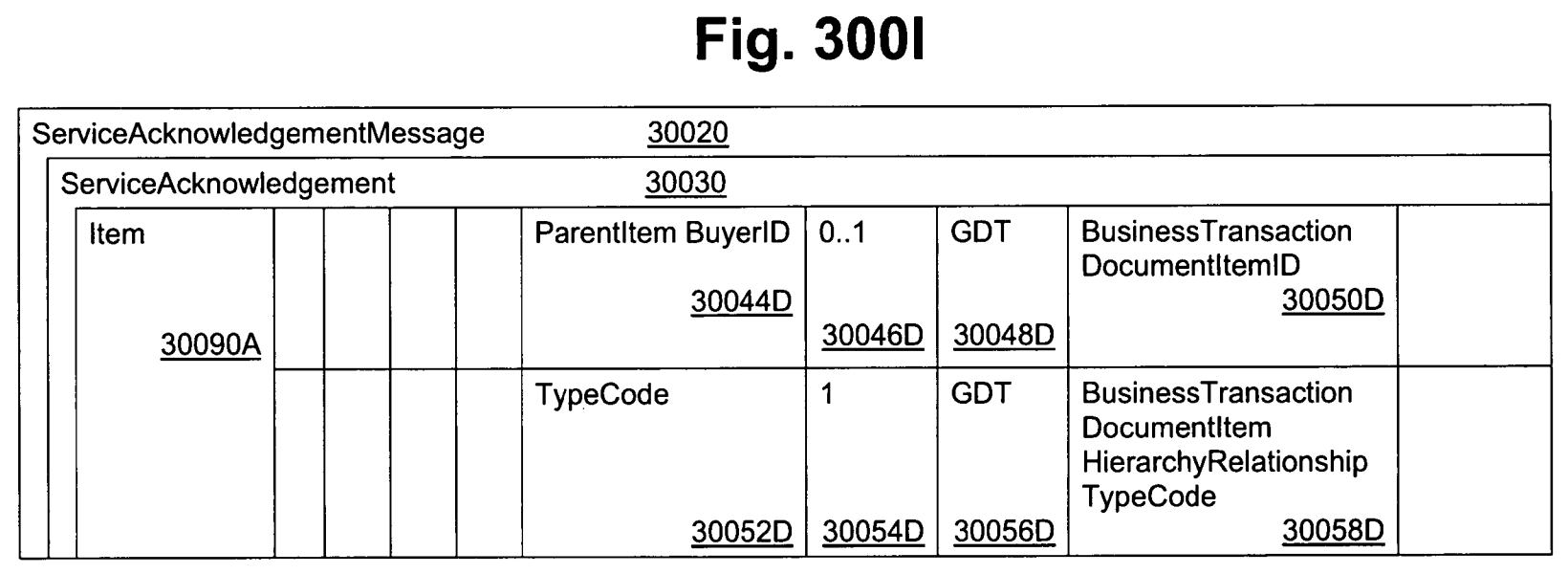

| | | | | | | | | | | |
|---|---|---|---|---|---|---|---|---|---|---|
| ServiceAcknowledgementMessage 30020 | | | | | | | | | | |
| | ServiceAcknowledgement 30030 | | | | | | | | | |
| | | Item 30090A | | | | | ParentItem BuyerID 30044D | 0..1 30046D | GDT 30048D | BusinessTransaction DocumentItemID 30050D | |
| | | | | | | | TypeCode 30052D | 1 30054D | GDT 30056D | BusinessTransaction DocumentItem HierarchyRelationship TypeCode 30058D | |

Fig. 300J

| | | | | | | |
|---|---|---|---|---|---|---|
| ServiceAcknowledgementMessage 30020 | | | | | | |
| ServiceAcknowledgement 30030 | | | | | | |
| Item 30090A | | | | | | |
| Product Information 30060D | Product 30074D | | 0..1 30076D | AGDT 30078D | Business Transaction DocumentProduct 30080D | FieldTicketProperties-LineItem Information 30082D |
| | | StandardID 30084D | 0..n 30086D | CDT 30088D | ProductStandardID 30090D | |
| | | BuyerID 30092D | 0..1 30094D | CDT 30096D | ProductPartyID 30098D | |
| | | SellerID 30000E | 0..1 30002E | CDT 30004E | ProductPartyID 30006E | |
| | | Manufacturer ID 30008E | 0..1 30010E | CDT 30012E | ProductPartyID 30014E | |
| | | TypeCode 30016E | 0..1 30018E | GDT 30020E | ProductTypeCode 30022E | |
| | | Note 30024E | 0..1 30026E | GDT 30028E | Note 30030E | |
| | Product Category 30032E | | 0..1 30034E | AGDT 30036E | Business Transaction DocumentProduct Category 30038E | |

Fig. 300K

| | | | | | |
|---|---|---|---|---|---|
| ServiceAcknowledgementMessage 30020 | | | | | |
| ServiceAcknowledgement 30030 | | | | | |
| Item 30090A | | | | | |
| Product Information 30060D | Standard ID 30040E | 0..n 30042E | CDT 30044E | ProductCategory StandardID 30046E | |
| | BuyerID 30048D | 0..1 30050E | CDT 30052E | ProductCategory PartyID 30054E | |
| | SellerID 30056E | 0..1 30058E | CDT 30060E | ProductCategory PartyID 30062E | |
| Price Information 30062D | Price 30064E | 0..1 30066E | | | FieldTicketLine Item-Pricing 30068E |
| | NetUnit Price 30070E | 0..1 30072E | AGDT 30074E | Price 30076E | partially: PrimaryCurrency 30078E |
| | Net Amount 30071E | 0..1 30073E | AGDT 30075E | Price 30077E | |

Fig. 300L

| | | | | | | | |
|---|---|---|---|---|---|---|---|
| ServiceAcknowledgementMessage | 30020 | | | | | | |
| ServiceAcknowledgement | 30030 | | | | | | |
| Item | 30090A | | | | | | |
| Party 30064D | Buyer Party 30080E | | 0..1 30082E | AGDT 30084E | BusinessTransaction DocumentParty 30086E | PartnerInformation 30088E | |
| | Seller Party 30090E | | 0..1 30092E | AGDT 30094E | BusinessTransaction DocumentParty 30096E | PartnerInformation 30098E | |

Fig. 300M

| | | | | | |
|---|---|---|---|---|---|
| ServiceAcknowledgementMessage 30020 | | | | | |
| ServiceAcknowledgement 30030 | | | | | |
| Item 30090A | | | | | |
| Party 30064D | ProductRecipientParty 30000F | 0..1 30002F | AGDT 30004F | BusinessTransactionDocumentParty 30006F | PartnerInformation 30008F |
| | VendorParty 30010F | 0..1 30012F | AGDT 30014F | BusinessTransactionDocumentParty 30016F | PartnerInformation and partially–CountryOfOrigin 30018F |
| | ManufacturerParty 30020F | 0..1 30022F | AGDT 30024F | BusinessTransactionDocumentParty 30026F | PartnerInformation 30028F |
| Location 30066D | ShipToLocation 30030F | 0..1 30032F | AGDT 30034F | BusinessTransactionDocumentLocation 30036F | |
| BusinessTransactionDocumentReference 30068D | PurchaseOrderReference 30038F | 0..1 30040F | AGDT 30042F | BusinessTransactionDocumentReference 30044F | FieldTicketLineItem-PurchaseOrderInformation 30046F |
| | PurchaseContractReference 30048F | 0..1 30050F | AGDT 30052F | BusinessTransactionDocumentReference 30054F | FieldTicketLineItem-ReferenceInformation 30056F |

Fig. 300N

ServiceAcknowledgementMessage 30020

ServiceAcknowledgement 30030

Item 30090A

| | | | | |
|---|---|---|---|---|
| Business Transaction Document Reference 30068D | SalesContract Reference 30058F | 0..1 30060F | AGDT 30062F | BusinessTransaction DocumentReference 30064F |
| | BuyerProduct Catalogue Reference 30066F | 0..1 30068F | AGDT 30070F | CatalogueReference 30072F |
| | OriginService Acknowledgement Reference 30061F | 0..1 30063F | GDT 30065F | BusinessTransaction DocumentReference 30067F |
| | SellerProduct Catalogue Reference 30074F | 0..1 30076F | AGDT 30078F | CatalogueReference 30080F |
| Accounting 30071D | Accounting ObjectSet Assignment 30083FF | 0..n 30085F | GDT 30087F | Accounting ObjectSet 30089F |

Fig. 300O

| | | | | | |
|---|---|---|---|---|---|
| ServiceAcknowledgementMessage 30020 | | | | | |
| ServiceAcknowledgement 30030 | | | | | |
| Item 30090A | | | | | |
| Attachment 30070D | Attachment 30082F | 0..n 30084F | AGDT 30086F | Attachment 30088F | FieldTicketLineItem-Attachment 30090F |
| Description 30072D | Description 30092F | 0..1 30094F | GDT 30096F | Description 30098F | FieldTicketLineItem-Comment and JobSummary 30000G |
| | Confirmation Description 30002G | 0..1 30004G | GDT 30006G | Description 30008G | |

Fig. 306A

| Package 30600 | L 1 30602 | L2 30604 | L3 30606 | L4 30608 | L5 30610 | L6 30612 | Occ 30614 | Type 30616 | Name 30618 |
|---|---|---|---|---|---|---|---|---|---|
| RFQMessage 30620 | RFQ Message 30622 | | | | | | | MDT 30624 | RFQMessage 30626 |
| Message Header 30628 | | Message Header 30632 | | | | | 1 30634 | AGDT 30636 | BusinessDocument MessageHeader 30638 |
| | | | ID 30640 | | | | 1 30642 | GDT 30644 | BusinessDocument MessageID 30646 |
| | | | Reference ID 30648 | | | | 0..1 30650 | GDT 30652 | BusinessDocument MessageID 30654 |
| | | | Creation DateTime 30656 | | | | 1 30658 | GDT 30660 | DateTime 30662 |
| | | | Sender Party 30664 | | | | 0..1 30666 | AGDT 30668 | BusinessDocument MessageHeader Party 30670 |
| | | | | InternalID 30672 | | | 0..1 30674 | CDT 30676 | PartyInternalID 30678 |

Fig. 306B

| RFQMessage 30620 | | | | | | | |
|---|---|---|---|---|---|---|---|
| Message Header 30628 | | | StandardID 30680 | | 0..n 30682 | CDT 30684 | PartyStandardID 30686 |
| | | | Contact Person 30688 | | 0..1 30690 | AGDT 30692 | ContactPerson 30694 |
| | | | | Internal ID 30696 | 0..n 30698 | CDT 30600A | ContactPerson InternalID 30602A |
| | | | | BuyerID 30604A | 0..1 30606A | CDT 30608A | ContactPersonPartyID 30610A |
| | | | | BidderID 30612A | 0..1 30614A | CDT 30616A | ContactPersonPartyID 30618A |
| | | | | Address 30620A | 0..1 30622A | AGDT 30624A | Address 30626A |
| | | RecipientParty 30628A | | | 0..n 30630A | AGDT 30632A | BusinessDocument MessageHeaderParty 30634A |
| RFQ 30630 | RFQ 30636A | | | | 1 30638A | AGDT 30640A | RFQ 30642A |
| | | ID 30644A | | | 1 30646A | GDT 30648A | BusinessTransaction DocumentID 30650A |
| | | VersionID 30641A | | | 1 30643A | GDT 30645A | VersionID 30647A |

Fig. 306C

| RFQMessage 30620 | | | | | | | | | |
|---|---|---|---|---|---|---|---|---|---|
| RFQ 30630 | | | PostingDateTime 30652A | | | | 0..1 30654A | GDT 30656A | DateTime 30658A |
| | | | LastChangeDateTime 30660A | | | | 0..1 30662A | GDT 30664A | DateTime 30666A |
| | | | PublishDateTime 30668A | | | | 0..1 30670A | GDT 30672A | DateTime 30674A |
| | | | DisplayDateTime 30676A | | | | 0..1 30678A | GDT 30680A | DateTime 30682A |
| | | | BiddingStartDateTime 30684A | | | | 0..1 30686A | GDT 30688A | DateTime 30690A |
| | | | QuoteSubmissionDateTime 30692A | | | | 1 30694A | GDT 30696A | DateTime 30698A |
| | | | QuoteOpeningDateTime 30600B | | | | 0..1 30602B | GDT 30604B | DateTime 30606B |
| | | | QuoteBindingDateTime 30608B | | | | 0..1 30610B | GDT 30612B | DateTime 30614B |
| | | | ContractValidityPeriod 30616B | | | | 0..1 30618B | GDT 30620B | DateTimePeriod 30622B |
| | | | Note 30624B | | | | 0..1 30626B | GDT 30628B | Note 30630B |

Fig. 306D

| RFQMessage 30620 | | | | | | | | | |
|---|---|---|---|---|---|---|---|---|---|
| RFQ 30630 | | | RFQPublicIndicator 30632B | | | | 1 30634B | GDT 30636B | BusinessTransaction DocumentPublicIndicator 30638B |
| | | | QuoteChange AllowIndicator 30641B | | | | 0..1 30643B | GDT 30645B | AllowIndicator 30647B |
| | | | QuoteUnplannedItem PermissionCode 30640B | | | | 0..1 30642B | GDT 30644B | UnplannedItemPermission Code 30646B |
| | | | QuotePriceBidding ConditionCode 30648B | | | | 1 30650B | GDT 30652B | BiddingConditionCode 30654B |
| | | | QuoteQuantityBidding ConditionCode 30656B | | | | 1 30658B | GDT 30660B | BiddingConditionCode 30662B |

Fig. 306E

| | | | | | | |
|---|---|---|---|---|---|---|
| RFQMessage 30620 | | | | | | |
| | QuoteItemBidding ConditionCode 30664B | | 1 30666B | GDT 30668B | BiddingConditionCode 30670B |
| | RequestedQuote CurrencyCode 30661B | | 0..n 30663B | GDT 30665B | CurrencyCode 30667B |
| | ContractTargetAmount 30672B | | 0..1 30674B | GDT 30676B | Amount 30678B |
| Party 30680B | BuyerParty 30600C | | 0..1 30602C | AGDT 30604C | BusinessTransaction DocumentParty 30606C |

Fig. 306F

| | | | | | | |
|---|---|---|---|---|---|---|
| RFQMessage 30620 | | | | | | |
| RFQ 30630 | | | | | | |
| Party 30680B | | StandardID 30608C | | 0..n 30610C | CDT 30612C | PartyStandardID 30614C |
| | | BuyerID 30616C | | 0..1 30618C | CDT 30620C | PartyPartyID 30622C |
| | | BidderID 30624C | | 0..1 30626C | CDT 30628C | PartyPartyID 30630C |
| | | Address 30632C | | 0..1 30634C | AGDT 30636C | Address 30638C |
| | | ContactPerson 30640C | | 0..1 30642C | AGDT 30644C | ContactPerson 30646C |
| | | | BuyerID 30648C | 0..1 30650C | CDT 30652C | ContactPersonPartyID 30654C |
| | | | BidderID 30656C | 0..1 30658C | CDT 30660C | ContactPersonPartyID 30662C |
| | | | Address 30664C | 0..1 30666C | AGDT 30668C | Address 30670C |
| | BidderParty 30672C | | | 0..1 30674C | AGDT 30676C | BusinessTransaction DocumentParty 30678C |

Fig. 306G

| | | | | | |
|---|---|---|---|---|---|
| RFQMessage 30620 | | | | | |
| RFQ 30630 | | | | | |
| Party 30680B | BidderPortal ProviderParty 30680C | | 0..1 30682C | AGDT 30684C | BusinessTransactionDocument Party 30686C |
| | ProductReceipient Party 30688C | | 0..1 30690C | AGDT 30692C | BusinessTransactionDocument Party 30694C |
| | VendorParty 30696C | | 0..1 30698C | AGDT 30600D | BusinessTransactionDocument Party 30602D |
| | ManufacturerParty 30604D | | 0..1 30606D | AGDT 30608D | BusinessTransactionDocument Party 30610D |
| | PayerParty 30612D | | 0..1 30614D | AGDT 30616D | BusinessTransactionDocument Party 30618D |
| Location 30682B | ShipToLocation 30620D | | 0..1 30622D | AGDT 30624D | BusinessTransactionDocument Location 30626D |
| | | StandardID 30628D | 0..n 30630D | CDT 30632D | LocationStandardID 30634D |
| | | BuyerID 30636D | 0..1 30638D | CDT 30640D | LocationPartyID 30642D |

Fig. 306H

RFQMessage 30620

RFQ 30630

| | | | | |
|---|---|---|---|---|---|
| Location 30682B | | BidderID 30644D | 0..1 30646D | CDT 30648D | LocationPartyID 30650D |
| | | Address 30652D | 0..1 30654D | AGDT 30656D | Address 30658D |
| Delivery Information 30684B | DeliveryTerms 30660D | | 0..1 30662D | AGDT 30664D | DeliveryTerms 30666D |
| | | Incoterms 30668D | 0..1 30670D | GDT 30672D | Incoterms 30674D |
| Payment Information 30686B | CashDiscount Terms 30676D | | 0..1 30678D | AGDT 30680D | CashDiscountTerms 30682D |
| | | MaximumCashDiscount 30684D | 0..1 30686D | GDT 30688D | CashDiscount 30690D |
| | | NormalCashDiscount 30692D | 0..1 30694D | GDT 30696D | CashDiscount 30698D |
| | | FullPaymentDueDays Value 30600E | 0..1 30602E | | |
| | PaymentForm 30604E | | 0..1 30606E | | |

Fig. 306I

| | | | | | | |
|---|---|---|---|---|---|---|
| RFQMessage 30620 | | | | | | |
| RFQ 30630 | | | | | | |
| Payment Information 30688B | | Code 30608E | 1 30610E | GDT 30612E | PaymentFormCode 30614E |
| Price Information 30681B | Price Specification Element 30607E | | 0..n 30609E | GDT 30611E | PriceSpecificationElement 30613E |
| Product Information 30688B | Product Category 30616E | | 0..1 30618E | GDT 30620E | BusinessTransactionDocument Product Category 30622E |
| | | Standard ID 30624E | 0..n 30626E | CDT 30628E | ProductCategoryStandardID 30630E |
| | | BuyerID 30632E | 0..1 30634E | CDT 30636E | ProductCategoryPartyID 30638E |
| | | Bidder ID 30640E | 0..1 30642E | CDT 30644E | ProductCategoryPartyID 30646E |

Fig. 306J

| | | | | | | |
|---|---|---|---|---|---|---|
| RFQMessage 30620 | | | | | | |
| RFQ 30630 | | | | | | |
| Business Transaction Document Reference 30690B | Quote Reference 30648E | | 0..1 30650E | GDT 30652E | BusinessTransactionDocument Reference 30654E |
| | | ID 30656E | 1 30658E | GDT 30660E | BusinessTransactionDocument ID 30662E |

Fig. 306K

| | | | | | | |
|---|---|---|---|---|---|---|
| RFQMessage 30620 | | | | | | |
| RFQ 30630 | | | | | | |
| FollowUp Business Transaction Document 30692B | FollowUp Purchase Order 30664E | | 0..1 30666E | | | |
| | | Requirement Code 30668E | 1 30670E | GDT 30672E | FollowUpBusinessTransaction DocumentRequirementCode 30674E | |
| | FollowUp Purchase Document 30676E | | 0..1 30678E | | | |
| | | Requirement Code 30680E | 1 30682E | GDT 30684E | FollowUpBusinessTransaction DocumentRequirementCode 30686E | |
| Attachment 30694B | Attachment 30688E | | 0..n 30690E | GDT 30692E | Attachment 30694E | |
| Description 30696B | Description 30696E | | 0..1 30698E | GDT 30600F | Description 30602F | |
| Item 30698B | Item 30604F | | 0..n 30606F | AGDT 30608F | RFQItem 30610F | |

Fig. 306L

RFQMessage 30620

RFQ 30630

| | | | | | |
|---|---|---|---|---|---|
| Item 30698B | ID 30612F | | 1 30614F | GDT 30616F | BusinessTransactionDocument ItemID 30618F |
| | Contract TargetAmount 30620F | | 0..1 30622F | GDT 30624F | Amount 30626F |
| | Hierarchy Relationship 30628F | | 0..1 30630F | | |
| | | ParentItemID 30632F | 1 30634F | GDT 30636F | BusinessTransactionDocument ItemID 30638F |
| | | TypeCode 30640F | 1 30642F | GDT 30644F | BusinessTransationDocument ItemHierarchyRelationshipType Code 30646F |
| Product Information 30648F | Product 30664F | | 0..1 30666F | GDT 30668F | BusinessTransactionDocument Product 30670F |
| | | StandardID 30672F | 0..n 30674F | CDT 30676F | ProductStandardID 30678F |

Fig. 306M

| | | | | | |
|---|---|---|---|---|---|
| RFQMessage 30620 | | | | | |
| RFQ 30630 | | | | | |
| Item 30698B | | | | | |
| Product Information 30648F | | BuyerID 30680F | 0..1 30682F | CDT 30684F | ProductPartyID 30686F |
| | | BidderID 30688F | 0..1 30690F | CDT 30692F | ProductPartyID 30694F |
| | | Manufacturer ID 30696F | 0..1 30698F | CDT 30600G | ProductPartyID 30602G |
| | | TypeCode 30604G | 0..1 30606G | GDT 30608G | ProductTypeCode 30610G |
| | | Note 30612G | 0..1 30614G | GDT 30616G | Note 30618G |
| | Product Category 30620G | | 0..1 30622G | GDT 30624G | BusinessTransactionDocument Product 30626G |
| | | StandardID 30628G | 0..n 30630G | CDT 30632G | ProductCategoryStandardID 30634G |
| | | BuyerID 30636G | 0..1 30638G | CDT 30640G | ProductCategoryPartyID 30642G |

Fig. 306N

| | | | | | |
|---|---|---|---|---|---|
| RFQMessage 30620 | | | | | |
| RFQ 30630 | | | | | |
| Item 30698B | | | | | |
| Product Information 30648F | | BidderID 30644G | 0..1 30646G | CDT 30648G | ProductCategoryPartyID 30650G |
| Price Information 30649F | Price Specification Element 30651F | | 0..n 30653F | GDT 30655F | PriceSpecificationElement 30657F |
| Party 30650F | BuyerParty 30652G | | 0..1 30654G | AGDT 30656G | BusinessTransactionDocument Party 30658G |
| | BidderParty 30660G | | 0..1 30662G | AGDT 30664G | BusinessTransactionDocument Party 30666G |
| | ProductRecipient Party 30668G | | 0..1 30670G | AGDT 30672G | BusinessTransactionDocument Party 30674G |

Fig. 306O

| | | | | | | |
|---|---|---|---|---|---|---|
| RFQMessage 30620 | | | | | | |
| RFQ 30630 | | | | | | |
| Item 30698B | | | | | | |
| Party 30650F | VendorParty 30676G | | 0..1 30678G | AGDT 30680G | BusinessTransactionDocument Party 30682G |
| | ManufacturerParty 30684G | | 0..1 30686G | AGDT 30688G | BusinessTransactionDocument Party 30690G |
| Location 30652F | ShipToLocation 30692G | | 0..1 30694G | AGDT 30696G | BusinessTransactionDocument Location 30698G |

Fig. 306P

| | | | | | | |
|---|---|---|---|---|---|---|
| RFQMessage 30620 | | | | | | |
| RFQ 30630 | | | | | | |
| Item 30698B | | | | | | |
| Location 30652F | | StandardID 30600H | 0..n 30602H | CDT 30604H | LocationStandardID 30606H |
| | | BuyerID 30608H | 0..1 30610H | CDT 30612H | LocationPartyID 30614H |
| | | BidderID 30616H | 0..1 30618H | CDT 30620H | LocationPartyID 30622H |
| | | Address 30624H | 0..1 30626H | AGDT 30628H | Address 30630H |
| DeliveryInformation 30654F | DeliveryTerms 30632H | | 0..1 30634H | AGDT 30636H | DeliveryTerms 30638H |
| | | MaximumLead TimeDuration 30640H | 0..1 30642H | GDT 30644H | Duration 30646H |
| | | Incoterms 30648H | 0..1 30650H | GDT 30652H | Incoterms 30654H |
| BusinessTransaction Document Reference 30656F | Quote Reference 30656H | | 0..1 30658H | GDT 30660H | BusinessTransaction Document Reference 30662H |

Fig. 306Q

| | | | | | | |
|---|---|---|---|---|---|---|
| RFQMessage 30620 | | | | | | |
| RFQ 30630 | | | | | | |
| Item 30698B | | | | | | |
| Business Transaction Document Reference 30656F | | ID 30664H | 1 30666H | GDT 30668H | BusinessTransactionDocumentID 30670H |
| | | ItemID 30672H | 0..n 30674H | GDT 30676H | BusinessTransactionDocument ItemID 30678H |
| | PurchaseContract Reference 30680H | | 0..1 30682H | GDT 30684H | BusinessTransactionDocument Reference 30686H |
| | | ID 30688H | 1 30690H | GDT 30692H | BusinessTransactionDocumentID 30694H |
| | | ItemID 30696H | 0..n 30698H | GDT 30600I | BusinessTransactionDocument ItemID 30602I |
| | BuyerProduct Catalogue Reference 30604I | | 0..1 30606I | AGDT 30608I | CatalogueReference 30610I |
| | | ID 30612I | 1 30614I | GDT 30616I | CatalogueID 30618I |

Fig. 306R

| | | | | | |
|---|---|---|---|---|---|
| RFQMessage 30620 | | | | | |
| RFQ 30630 | | | | | |
| Item 30698B | | | | | |
| Business Transaction Document Reference 30656F | | ItemID 30620I | 0..n 30622I | GDT 30624I | CatalogueItemID 30626I |
| Attachment 30658F | Attachment 30628I | | 0..n 30630I | GDT 30632I | Attachment 30634I |
| Description 30660F | Description 30636I | | 0..1 30638I | GDT 30640I | Description 30642I |
| Schedule Line 30662F | ScheduleLine 30644I | | 0..1 30646I | AGDT 30648I | RFQItemScheduleLine 30650I |
| | | ID 30652I | 0..1 30654I | GDT 30656I | BusinessTransactionDocument ItemScheduleLineID 30658I |
| | | Delivery Period 30660I | 1 30662I | AGDT 30664I | DateTimePeriod 30666I |
| | | Quantity 30668I | 0..1 30670I | GDT 30672I | Quantity 30674I |

Fig. 307A

| Package 30700 | L1 30702 | L2 30704 | L3 30706 | L4 30708 | L5 30710 | Card 30712 | Type 30714 | Name 30716 |
|---|---|---|---|---|---|---|---|---|
| RFQ Cancellation Message 30718 | RFQ Cancellation Message 30720 | | | | | | MDT 30722 | RFQCancelation Message 30724 |
| Message Header 30726 | | Message Header 30730 | | | | 1 30732 | AGDT 30734 | BusinessDocument MessageHeader 30736 |
| | | | ID 30738 | | | 1 30740 | GDT 30742 | BusinessDocument MessageID 30744 |
| | | | ReferenceID 30746 | | | 0..1 30748 | GDT 30750 | BusinessDocument MessageID 30752 |
| | | | Creation DateTime 30754 | | | 1 30756 | GDT 30758 | DateTime 30760 |
| | | | SenderParty 30762 | | | 0..1 30764 | AGDT 30766 | BusinessDocument MessageHeaderParty 30768 |

Fig. 307B

| RFQ Cancellation Message 30718 | | | | | | | | |
|---|---|---|---|---|---|---|---|---|
| Message Header 30726 | | | | InternalID 30770 | | 0..1 30772 | CDT 30774 | PartyInternalID 30776 |
| | | | | Standard ID 30778 | | 0..n 30780 | CDT 30782 | PartyStandardID 30784 |
| | | | | Contact 30786 | | 0..1 30788 | GDT 30790 | ContactPerson 30792 |
| | | | | | Internal ID 30794 | 0..n 30796 | CDT 30798 | ContactPerson InternalID 30700A |
| | | | | | BuyerID 30702A | 0..1 30704A | CDT 30706A | ContactPersonPartyID 30708A |
| | | | | | BidderID 30710A | 0..1 30712A | CDT 30714A | ContactPersonPartyID 30716A |
| | | | | | Address 30718A | 0..1 30720A | AGDT 30722A | Address 30724A |
| | | | Recipient Party 30726A | | | 0..n 30728A | AGDT 30730A | BusinessDocument MessageHeaderParty 30732A |

Fig. 307C

| RFQ Cancellation Message 30718 | | | | | | | | |
|---|---|---|---|---|---|---|---|---|
| RFQ Cancellation 30728 | | RFQCancellation 30734A | | | | 1 30736A | GDT 30738A | RFQCancellation 30740A |
| | | | ID 30742A | | | 1 30744A | GDT 30746A | BusinessTransactionDocumentID 30748A |

Fig. 308A

| Package 30800 | L. 1 30802 | L. 2 30804 | L. 3 30806 | L. 4 30808 | L. 5 30810 | L. 6 30812 | Card 30814 | Type 30816 | Name 30818 |
|---|---|---|---|---|---|---|---|---|---|
| Quote Message 30820 | Quote Message 30822 | | | | | | | MDT 30824 | QuoteMessage 30826 |
| Message Header 30828 | | Message Header 30832 | | | | | 1 30834 | AGDT 30836 | Business Document MessageHeader 30838 |
| | | | ID 30840 | | | | 1 30842 | GDT 30844 | Business Document MessageID 30846 |
| | | | Reference ID 30848 | | | | 0..1 30850 | GDT 30852 | Business Document MessageID 30854 |
| | | | Creation DateTime 30856 | | | | 1 30858 | GDT 30860 | DateTime 30862 |
| | | | SenderParty 30864 | | | | 0..1 30866 | AGDT 30868 | Business Document MessageHeader Party 30870 |

Fig. 308B

| QuoteMessage 30820 | | | | | | | | | |
|---|---|---|---|---|---|---|---|---|---|
| Message Header 30828 | | | | InternalID 30872 | | | 0..1 30874 | CDT 30876 | PartyInternalID 30878 |
| | | | | StandardID 30880 | | | 0..n 30882 | CDT 30884 | PartyStandardID 30886 |
| | | | | Contact 30888 | | | 0..1 30890 | GDT 30892 | ContactPerson 30894 |
| | | | | | InternalID 30896 | | 0..n 30898 | CDT 30800A | ContactPersonInternalID 30802A |
| | | | | | BuyerID 30804A | | 0..1 30806A | CDT 30808A | ContactPersonPartyID 30810A |
| | | | | | BidderID 30812A | | 0..1 30814A | CDT 30816A | ContactPersonPartyID 30818A |
| | | | | | Address 30820A | | 0..1 30822A | AGDT 30824A | Address 30826A |
| | | | Recipient Party 30828A | | | | 0..n 30830A | AGDT 30832A | BusinessDocument MessageHeaderParty 30834A |
| Quote 30830 | | Quote 30836A | | | | | 1 30838A | AGDT 30840A | Quote 30842A |
| | | | ID 30844A | | | | 1 30846A | GDT 30848A | BusinessTransaction DocumentID 30850A |

Fig. 308C

| QuoteMessage 30820 | | | | | | |
|---|---|---|---|---|---|---|
| Quote 30830 | | PostingDateTime 30852A | | 0..1 30854A | GDT 30856A | DateTime 30858A |
| | | LastChangeDateTime 30860A | | 0..1 30862A | GDT 30864A | DateTime 30866A |
| | | BindingDateTime 30868A | | 0..1 30870A | GDT 30872A | DateTime 30874A |
| | | Note 30876A | | 0..1 30878A | GDT 30880A | Note 30882A |
| | | ContractTargetAmount 30884A | | 0..1 30886A | GDT 30888A | Amount 30890A |
| | Party 30892A | BuyerParty 30810B | | 0..1 30812B | AGDT 30814B | BusinessTransactionDocument Party 30816B |
| | | | StandardID 30818B | 0..n 30820B | CDT 30822B | PartyStandardID 30824B |
| | | | BuyerID 30826B | 0..1 30828B | CDT 30830B | PartyPartyID 30832B |
| | | | BidderID 30834B | 0..1 30836B | CDT 30838B | PartyPartyID 30840B |

Fig. 308D

| | | | | | | | |
|---|---|---|---|---|---|---|---|
| QuoteMessage 30820 | | | | | | | |
| Quote 30830 | | | | | | | |
| Party 30892A | | Address 30842B | | 0..1 30844B | AGDT 30846B | Address 30848B |
| | | Contact 30850B | | 0..1 30852B | GDT 30854B | ContactPerson 30856B |
| | | | BuyerID 30858B | 0..1 30860B | CDT 30862B | PartyPartyID 30864B |
| | | | BidderID 30866B | 0..1 30868B | CDT 30870B | PartyPartyID 30872B |
| | | | Address 30874B | 0..1 30876B | AGDT 30878B | Address 30880B |
| | BidderParty 30882B | | | 0..1 30884B | AGDT 30886B | BusinessTransaction Document Party 30888B |
| | BidderPortal ProviderParty 30890B | | | 0..1 30892B | AGDT 30894B | BusinessTransaction DocumentParty 30896B |
| | ProductRecipient Party 30898B | | | 0..1 30800C | AGDT 30802C | BusinessTransaction DocumentParty 30804C |

Fig. 308E

| | | | | | |
|---|---|---|---|---|---|
| QuoteMessage 30820 | | | | | |
| Quote 30830 | | | | | |
| Party 30892A | VendorParty 30806C | | 0..1 30808C | AGDT 30810C | BusinessTransactionDocument Party 30812C |
| | ManufacturerParty 30814C | | 0..1 30816C | AGDT 30818C | BusinessTransactionDocument Party 30820C |
| | PayerParty 30822C | | 0..1 30824C | AGDT 30826C | BusinessTransactionDocument Party 30828C |
| Location 30894A | ShipToLocation 30830C | | 0..1 30832C | AGDT 30834C | BusinessTransactionDocument Location 30836C |
| | | StandardID 30838C | 0..n 30840C | CDT 30842C | LocationStandardID 30844C |
| | | BuyerID 30846C | 0..1 30848C | CDT 30850C | LocationPartyID 30852C |
| | | BidderID 30854C | 0..1 30856C | CDT 30858C | LocationPartyID 30860C |
| | | Address 30862C | 0..1 30864C | AGDT 30866C | Address 30868C |

Fig. 308F

| | | | | | |
|---|---|---|---|---|---|
| QuoteMessage 30820 | | | | | |
| Quote 30830 | | | | | |
| Delivery Information 30896A | DeliveryTerms 30870C | | 0..1 30872C | AGDT 30874C | DeliveryTerms 30876C |
| | | Incoterms 30878C | 0..1 30880C | GDT 30882C | Incoterms 30884C |
| Payment Information 30898A | CashDiscountTerms 30886C | | 0..1 30888C | AGDT 30890C | CashDiscountTerms 30892C |
| | | MaximumCash Discount 30894C | 0..1 30896C | GDT 30898C | CashDiscount 30800D |
| | | NormalCash Discount 30802D | 0..1 30804D | GDT 30806D | CashDiscount 30808D |
| | | FullPaymentDue DaysValue 30810D | 0..1 30812D | | |
| | PaymentForm 30814D | | 0..1 30816D | | |
| | | Code 30818D | 1 30820D | GDT 30822D | PaymentFormCode 30824D |

Fig. 308G

| | | | | | | |
|---|---|---|---|---|---|---|
| QuoteMessage 30820 | | | | | | |
| Quote 30830 | | | | | | |
| Product Information 30800B | Product Category 30826D | | 0..1 30828D | GDT 30830D | BusinessTransaction DocumentProductCategory 30832D |
| | | StandardID 30834D | | CDT 30836D | ProductCategoryStandardID 30838D |
| | | BuyerID 30840D | | CDT 30842D | ProductCategoryPartyID 30844D |
| | | BidderID 30846D | | CDT 30848D | ProductCategoryPartyID 30850D |
| Price Information 30801B | Price Specification Element 30841D | | 0..n 30843D | GDT 30845D | PriceSpecificationElement 30847D |
| Business Transaction Document Reference 30802B | RFQReference 30852D | | 0..1 30854D | GDT 30856D | BusinessTransaction DocumentReference 30858D |
| | | ID 30860D | 1 30862D | GDT 30864D | BusinessTransaction DocumentID 30866D |

Fig. 308H

| | | | | | | |
|---|---|---|---|---|---|---|
| QuoteMessage | | 30820 | | | | |
| Quote | | 30830 | | | | |
| Attachment 30804B | Attachment 30868D | | 0..n 30870D | GDT 30872D | Attachment | 30874D |
| Description 30806B | Description 30876D | | 0..1 30878D | GDT 30880D | Description | 30882D |
| Item 30808B | Item 30884D | | 0..n 30886D | AGDT 30888D | QuoteItem | 30890D |

Fig. 308I

| | | | | | | |
|---|---|---|---|---|---|---|
| QuoteMessage 30820 | | | | | | |
| Quote 30830 | | | | | | |
| Item 30808B | ID 30892D | | 1 30894D | GDT 30896D | BusinessTransaction DocumentItemID 30898D |
| | ContractTarget Amount 30800E | | 0..1 30802E | GDT 30804E | Amount 30806E |
| | Hierarchy Relationship 30808E | | 0..1 30810E | | |
| | | ParentItemID 30812E | 1 30814E | GDT 30816E | BusinessTransaction DocumentItemID 30818E |
| | | TypeCode 30820E | 1 30822E | GDT 30824E | BusinessTransaction DocumentItemHierarchy RelationshipTypeCode 30826E |
| Product Information 30828E | Product 30846E | | 0..1 30848E | | BusinessTransaction DocumentProduct 30850E |
| | | StandardID 30852E | 0..n 30854E | CDT 30856E | ProductStandardID 30858E |

Fig. 308J

| | | | | | | | | | |
|---|---|---|---|---|---|---|---|---|---|
| QuoteMessage 30820 | | | | | | | | | |
| Quote 30830 | | | | | | | | | |
| Item 30808B | | | | | | | | | |
| Product Information 30828E | | | | | BuyerID 30860E | | 0..1 30862E | CDT 30864E | ProductPartyID 30866E |
| | | | | | BidderID 30868E | | 0..1 30870E | CDT 30872E | ProductPartyID 30874E |
| | | | | | ManufacturerID 30876E | | 0..1 30878E | CDT 30880E | ProductPartyID 30882E |
| | | | | | TypeCode 30884E | | 0..1 30886E | GDT 30888E | ProductTypeCode 30890E |
| | | | | | Note 30892E | | 0..1 30894E | GDT 30896E | Note 30898E |
| | | | | Product Category 30800F | | | 0..1 30802F | | BusinessTransaction DocumentProduct 30804F |
| | | | | | StandardID 30806F | | 0..n 30808F | CDT 30810F | ProductCategory StandardID 30812F |
| | | | | | BuyerID 30814F | | 0..1 30816F | CDT 30818F | ProductCategoryPartyID 30820F |

Fig. 308K

QuoteMessage 30820

Quote 30830

Item 30808B

| | | | | | |
|---|---|---|---|---|---|
| Product Information 30828E | | BidderID 30822F | | CDT 30824F | ProductCategoryPartyID 30826F |
| Price Information 30830E | Price Specification Element 30828F | | 0..n 30830F | GDT 30831F | PriceSpecificationElement 30833F |
| | | NetUnitPrice 30832F | 0..1 30834F | AGDT 30836F | Price 30838F |
| Party 30832E | BuyerParty 30840F | | 0..1 30842F | AGDT 30844F | BusinessTransactionDocument Party 30846F |
| | BidderParty 30848F | | 0..1 30850F | AGDT 30852F | BusinessTransactionDocument Party 30854F |
| | Product Recipient Party 30856F | | 0..1 30858F | AGDT 30860F | BusinessTransactionDocument Party 30862F |
| | VendorParty 30864F | | 0..1 30866F | AGDT 30868F | BusinessTransactionDocument Party 30870F |

Fig. 308L

QuoteMessage 30820

Quote 30830

Item 30808B

| | | | | |
|---|---|---|---|---|---|
| Party 30832E | ManufacturerParty 30872F | | 0..1 30874F | AGDT 30876F | BusinessTransactionDocumentParty 30878F |
| Location 30834E | ShipToLocation 30880F | | 0..1 30882F | AGDT 30884F | BusinessTransactionDocumentLocation 30886F |
| | | StandardID 30888F | 0..n 30890F | CDT 30892F | LocationStandardID 30894F |
| | | BuyerID 30896F | 0..1 30898F | CDT 30800G | LocationPartyID 30802G |
| | | BidderID 30804G | 0..1 30806G | CDT 30808G | LocationPartyID 30810G |
| | | Address 30812G | 0..1 30814G | AGDT 30816G | Address 30818G |
| Delivery Information 30836E | DeliveryTerms 30820G | | 0..1 30822G | AGDT 30824G | DeliveryTerms 30826G |
| | | MaximumLeadTimeDuration 30828G | 0..1 30830G | GDT 30832G | Duration 30834G |

Fig. 308M

QuoteMessage 30820
Quote 30830
Item 30808B

| | | | | | |
|---|---|---|---|---|---|
| Delivery Information 30836E | | Incoterms 30836G | 0..1 30838G | GDT 30840G | Incoterms 30842G |
| Business Transaction Document Reference 30838E | RFQ Reference 30844G | | 0..1 30846G | GDT 30848G | BusinessTransaction DocumentReference 30850G |
| | | ID 30852G | 1 30854G | GDT 30856G | BusinessTransaction DocumentID 30858G |
| | | ItemID 30860G | 0..n 30862G | GDT 30864G | BusinessTransaction DocumentItemID 30866G |
| Attachment 30840E | Attachment 30868G | | 0..n 30870G | GDT 30872G | Attachment 30874G |
| Description 30842E | Description 30876G | | 0..1 30878G | GDT 30880G | Description 30882G |
| Schedule Line 30844E | Schedule Line 30884G | | 0..1 30886G | AGDT 30888G | QuoteItemScheduleLine 30890G |

Fig. 308N

| | | | | |
|---|---|---|---|---|
| QuoteMessage 30820 | | | | |
| Quote 30830 | | | | |
| Item 30808B | | | | |
| Schedule Line 30844E | ID 30892G | 0..1 30894G | GDT 30896G | BusinessTransaction DocumentItemScheduleLineID 30898G |
| | Delivery Period 30800H | 1 30802H | AGDT 30804H | DateTimePeriod 30806H |
| | Quantity 30808H | 0..1 30810H | GDT 30812H | Quantity 30814H |

Fig. 309A

| Package 30900 | L1 30902 | L2 30904 | L3 30906 | L4 30908 | L5 30910 | L6 30912 | Card 30914 | Type 30916 | Name 30918 |
|---|---|---|---|---|---|---|---|---|---|
| RFQResult Message 30920 | RFQResult Message 30922 | | | | | | | MDT 30924 | RFQResultMessage 30926 |
| Message Header 30928 | | Message Header 30932 | | | | | 1 30934 | AGDT 30936 | BusinessDocument MessageHeader 30938 |
| | | | ID 30940 | | | | 1 30942 | GDT 30944 | BusinessDocument MessageID 30946 |
| | | | Reference ID 30948 | | | | 0..1 30950 | GDT 30952 | BusinessDocument MessageID 30954 |
| | | | Creation DateTime 30956 | | | | 1 30958 | GDT 30960 | DateTime 30962 |
| | | | Sender Party 30964 | | | | 0..1 30966 | AGDT 30968 | BusinessDocument MessageHeader Party 30970 |

Fig. 309B

RFQResultMessage 30920

| | | | | | | | | |
|---|---|---|---|---|---|---|---|---|
| Message Header 30928 | | | | InternalID 30972 | | 0..1 30974 | CDT 30976 | PartyInternalID 30978 |
| | | | | StandardID 30980 | | 0..n 30982 | CDT 30984 | PartyStandardID 30986 |
| | | | | Contact 30988 | | 0..1 30990 | GDT 30992 | ContactPerson 30994 |
| | | | | | InternalID 30996 | 0..n 30998 | CDT 30900A | ContactPersonInternalID 30902A |
| | | | | | BuyerID 30904A | 0..1 30906A | CDT 30908A | ContactPersonPartyID 30910A |
| | | | | | BidderID 30912A | 0..1 30914A | CDT 30916A | ContactPersonPartyID 30918A |
| | | | | | Address 30920A | 0..1 30922A | AGDT 30924A | Address 30926A |
| | | | Recipient Party 30928A | | | 0..n 30930A | AGDT 30932A | BusinessDocumentMessage HeaderParty 30934A |

Fig. 309C

RFQResultMessage 30920

| | | | | | | | |
|---|---|---|---|---|---|---|---|
| RFQ Result 30930 | RFQ Result 30936A | | | | 1 30938A | AGDT 30940A | RFQResult 30942A |
| | | ID 30944A | | | 1 30946A | GDT 30948A | BusinessTransactionDocumentID 30950A |
| Party 30952A | | Bidder Party 30958A | | | 0..1 30960A | AGDT 30962A | BusinessTransactionDocumentParty 30964A |
| Descrip-tion 30954A | | Description 30966A | | | 0..1 30968A | GDT 30970A | Description 30972A |
| Item 30956A | | Item 30974A | | | 0..n 30976A | AGDT 30978A | RFQResultItem 30980A |
| | | | ID 30982A | | 1 30984A | GDT 30986A | BusinessTransactionDocumentItemID 30988A |
| | | | Hierarchy Relationship 30990A | | 0..1 30992A | | |
| | | | | Parent ItemID 30994A | 1 30996A | GDT 30998A | BusinessTransactionDocumentItemID 30900B |

Fig. 309D

| | | | | | | |
|---|---|---|---|---|---|---|
| RFQResultMessage 30920 | | | | | | |
| RFQResult 30930 | | | | | | |
| Item 30956A | | | TypeCode 30902B | 1 30904B | GDT 30906B | BusinessTransactionDocumentItemHierarchyRelationshipTypeCode 30908B |
| | Business Transaction Document Reference 30910B | Quote Reference 30914B | | 0..1 30916B | GDT 30918B | BusinessTransactionDocumentReference 30920B |
| | | | ID 30922B | 1 30924B | GDT 30926B | BusinessTransactionDocumentID 30928B |
| | | | ItemID 30930B | 0..n 30932B | GDT 30934B | BusinessTransactionDocumentItemID 30936B |
| | Schedule Line 30912B | ScheduleLine 30938B | | 0..1 30940B | AGDT 30942B | RFQResultItemScheduleLine 30944B |
| | | | ID 30946B | 0..1 30948B | GDT 30950B | BusinessTransactionDocumentItemScheduleLineID 30952B |
| | | | Delivery Period 30954B | 1 30956B | AGDT 30958B | DateTimePeriod 30960B |
| | | | Quantity 30962B | 0..1 30964B | GDT 30966B | Quantity 30968B |

Fig. 318

| GDT | Object Class | Property | Rep. / Assoc. | Type | Type Name | Len. |
|---|---|---|---|---|---|---|
| BusinessTransaction DocumentItemProcessing TypeCode 31800 | Business Transaction Document Item 31802 | Processing Type 31804 | Code 31806 | CCT 31808 | Code 31810 | 1..4 31812 |

Fig. 319

| GDT | Object Class | Property | Rep. / Assoc. | Type | Type Name | Len. |
|---|---|---|---|---|---|---|
| BusinessTransaction DocumentProcessing TypeCode 31900 | Business Transaction Document 31902 | Processing Type 31904 | Code 31906 | CCT 31908 | Code 31910 | 1..4 31912 |

Fig. 320

| GDT | Property | Rep. / Assoc. | Type | Type Name | Len. |
|---|---|---|---|---|---|
| CancellationReasonCode 32000 | Cancellation Reason 32002 | Code 32004 | CCT 32006 | Code 32008 | 1..4 32010 |

Fig. 321

| GDT | Property | Rep. / Assoc. | Type | Type Name |
|---|---|---|---|---|
| CashDiscountDeductibleIndicator 32100 | CashDiscountDeductible 32102 | Indicator 32104 | CCT 32106 | Indicator 32108 |

Fig. 322

| GDT | Object Class | Property | Rep. / Assoc. | Type | Type Name | Len. | Remarks |
|---|---|---|---|---|---|---|---|
| CustomsCommodity ClassificationCode 32200 | Customs 32202 | Commodity Classification 32204 | Code 32206 | CCT 32208 | Code 32210 | 4..11 32212 | Restricted 32214 |

Fig. 323

| GDT | Object Class | Property | Rep. / Assoc. | Type | Type Name | Len. | Remarks |
|---|---|---|---|---|---|---|---|
| CustomsPreferential Statement StatusCode 32300 | Customs 32302 | Preferential Statement Status 32304 | Code 32306 | CCT 32308 | Code 32310 | 2 32312 | Restricted 32314 |

Fig. 324

| GDT | Object Class | Property | Rep. / Assoc. | Type | Type Name | Len. |
|---|---|---|---|---|---|---|
| DeliveryTypeCode 32400 | Delivery 32402 | Type 32404 | Code 32406 | CCT 32408 | Code 32410 | 4 32412 |

Fig. 325

| GDT | Cat. | Object Class | Property | Rep. / Assoc. | Type | Type Name |
|---|---|---|---|---|---|---|
| DueClearingIndicator 32500 | E 32502 | Due 32504 | Clearing 32506 | Indicator 32508 | CCT 32510 | Indicator 32512 |

Fig. 326

| CDT | | Cat. | Obj. Class | Property | Rep./ Assoc. | Type | Type Name | Len. | Card. | Remarks |
|---|---|---|---|---|---|---|---|---|---|---|
| Kanban CardID 32600 | | | Kanban Card 32602 | Identification 32604 | Identifier 32606 | CCT 32608 | Identifier 32610 | 1..10 32612 | | Restric- ted 32614 |
| | scheme AgencyID 32616 | A 32618 | Identification Scheme Agency 32620 | | Identifier 32622 | xsd 32624 | token 32626 | 1..60 32628 | 0..1 32630 | Optional 32632 |

Fig. 327

| CDT | | Cat. | Obj. Class | Property Qualifier | Property | Rep./ Assoc. | Type | Type Name | Card. |
|---|---|---|---|---|---|---|---|---|---|
| Log 32700 | | | Log 32702 | | | Details 32704 | | | |
| | MaximumLogItem SeverityCode 32706 | E 32708 | Log 32710 | Maximum 32712 | LogItem Severity 32714 | Code 32716 | GDT 32718 | LogItem SeverityCode 32720 | 0..1 32722 |
| | Item 32724 | E 32726 | Log 32728 | | Item 32730 | Details 32732 | GDT 32734 | LogItem 32736 | 1..n 32738 |

Fig. 328

| GDT | Property | Rep. / Assoc. | Type | Type Name |
|---|---|---|---|---|
| NaturalPersonIndicator 32800 | Natural Person 32802 | Indicator 32804 | CCT 32806 | Indicator 32808 |

Fig. 329

| GDT | Object Class | Property | Rep. / Assoc. | Type | Type Name | Len. | Remarks |
|---|---|---|---|---|---|---|---|
| PackingListID 32900 | Packing List 32902 | Identification 32904 | Identifier 32906 | CCT 32908 | Identifier 32910 | 1..35 32912 | restricted 32914 |

Fig. 330

| GDT | | Cat. | Obj. Class | Prop. Qual. | Property | Rep./ Assoc. | Type | Type Name | Len. | Card. | Remarks |
|---|---|---|---|---|---|---|---|---|---|---|---|
| Party TaxID 33000 | | | Party 33002 | Tax 33004 | Identification 33006 | Identifier 33008 | CCT 33010 | Identifier 33012 | 1..20 33014 | | restricted 33016 |
| | scheme ID 33018 | A 33020 | Identifica tion Scheme 33022 | | Identification 33024 | Identifier 33026 | xsd 33028 | token 33030 | 3..4 33032 | 1 33034 | |

Fig. 331a

| GDT | | Cat. | Obj. Class | Property | Rep./ Assoc. | Type | Type Name | Card. |
|---|---|---|---|---|---|---|---|---|
| PriceSpecification-Element 33100 | | | PriceSpecificationElement 33102 | | Details 33104 | | | |
| | TypeCode 33106 | E 33108 | PriceSpecificationElement 33110 | Type 33112 | Code 33114 | GDT 33116 | PriceSpecification-ElementTypeCode 33118 | 1 33120 |
| | Validity-Period 33122 | E 33124 | PriceSpecificationElement 33126 | Validity Period 33128 | Period 33130 | GDT 33132 | DateTimePeriod 33134 | 1 33136 |
| | Property-Definition-ClassID 33138 | E 33140 | PriceSpecificationElement 33142 | Property Definition Class Identification 33144 | Identifier 33146 | GDT 33148 | PriceSpecification-ElementProperty-DefinitionClassID 33150 | 0..1 33152 |
| | Property-Valuation 33154 | E 33156 | PriceSpecificationElement 33158 | Property-Valuation 33160 | PriceSpecificationElementPropertyValuation 33162 | GDT 33164 | PriceSpecification-ElementProperty-Valuation 33166 | 1..unbounded 33168 |

Fig. 331b

| GDT | | Cat. | Obj. Class | Property | Rep./ Assoc. | Type | Type Name | Card. |
|---|---|---|---|---|---|---|---|---|
| | Price 33170 | E 33172 | Value 33174 | Price 33176 | Price 33178 | GDT 33180 | Price 33182 | 0..1 33184 |
| | Percent 33186 | E 33188 | Value 33190 | Percent 33192 | Percent 33194 | GDT 33196 | Percent 33198 | 0..1 33100A |
| | FixedAmount 33102A | E 33104A | Value 33106A | Fixed amount 33108A | Amount 33110A | GDT 33112A | Amount 33114A | 0..1 33116A |
| | ScaleLine 33118A | E 33120A | PriceSpeci-fication-Element 33122A | ScaleLine 33124A | PriceSpecification ElementScaleLine 33126A | GDT 33128A | PriceSpecifica-tionElement-ScaleLine 33130A | 0..unbou nded 33132A |

Fig. 332

| GDT | Object Class | Property | Rep. / Assoc. | Type | Type Name | Len. | Remarks |
|---|---|---|---|---|---|---|---|
| PriceSpecificationElementPropertyDefinitionClassID 33200 | PriceSpecification-ElementProperty Definition Class 33202 | Identification 33204 | Identifier 33206 | CCT 33208 | Identifier 33210 | 1..50 33212 | Restricted 33214 |

Fig. 333

| GDT | Object Class | Property | Rep. / Assoc. | Type | Type Name | Len. | Remarks |
|---|---|---|---|---|---|---|---|
| PriceSpecification-ElementPropertyID 33300 | PriceSpecification-ElementProperty 33302 | Identification 33304 | Identifier 33306 | CCT 33308 | Identifier 33310 | 1..30 33312 | Restricted 33314 |

Fig. 334

| GDT | | Cat. | Obj. Class | Property | Rep./ Assoc. | Type | Type Name | Card. |
|---|---|---|---|---|---|---|---|---|
| PriceSpecificationElementPropertyReference 33400 | | | PriceSpecificationElementProperty Reference 33402 | | Details 33404 | | | |
| | PriceSpecificationElementProperty ID 33406 | E 33408 | PriceSpecificationElementProperty Reference 33410 | PriceSpecification-ElementProperty-Identification 33412 | Identifier 33414 | GDT 33416 | PriceSpecificationElement-PropertyID 33418 | 1 33420 |
| | PriceSpecificationElementProperty Definition-ClassID 33422 | E 33424 | PriceSpecificationElementProperty Reference 33426 | PriceSpecification-ElementProperty-DefinitionClass-Identification 33428 | Identifier 33430 | GDT 33432 | PriceSpecificationElement-PropertyDefinitionClassID 33434 | 0..1 33436 |

Fig. 335

| GDT | | Cat. | Obj. Class | Property | Rep./ Assoc. | Type | Type Name | Card. |
|---|---|---|---|---|---|---|---|---|
| PriceSpecification-Element-Property-Valuation 33500 | | | PriceSpecificationElementProperty Valuation 33502 | | Details 33504 | | | |
| | TypeIndicator 33506 | E 33508 | PriceSpecificationElementProperty Valuation 33510 | IType 33512 | Indicator 33514 | GDT 33516 | Indicator 33518 | 0..1 33520 |
| | PriceSpecificationElementProperty Reference 33522 | E 33524 | PriceSpecificationElementProperty Valuation 33526 | PriceSpecificationElement-Property Reference 33528 | PriceSpecificationElement-PropertyReference 33530 | GDT 33532 | PriceSpecificationElement-PropertyReference 33534 | 1 33536 |
| | PriceSpecificationElementProperty Value 33538 | E 33540 | PriceSpecificationElementProperty Valuation 33542 | PriceSpecificationElement-Property Value 33544 | PriceSpecificationElement-PropertyValue 33546 | GDT 33548 | PriceSpecificationElement-PropertyValue 33550 | 1 33552 |

Fig. 336a

| GDT | | Cat. | Obj. Class | Prop. | Rep./ Ass. Qual. | Rep./ Assoc. | Type | Type Name | Len. | Card. |
|---|---|---|---|---|---|---|---|---|---|---|
| PriceSpecificationElementPropertyValue 33600 | | E 33602 | PriceSpecification ElementProperty Value 33604 | | | Details 33606 | | | | |
| | Code 33608 | E 33610 | PriceSpecification ElementProperty Value 33612 | Code 33614 | | Code 33616 | CCT 33618 | Code 33620 | 1..50 33622 | 0..1 33624 |
| | ID 33626 | E 33628 | PriceSpecification ElementProperty Value 33630 | Identification 33632 | | Identifier 33634 | CCT 33636 | Identifier 33638 | 1..50 33640 | 0..1 33642 |
| | Integer Value 33644 | E 33646 | PriceSpecification ElementProperty Value 33648 | Integer Value 33650 | Integer 33652 | Value 33654 | GDT 33656 | Integer -Value 33658 | | 0..1 33660 |
| | Date 33662 | E 33664 | PriceSpecification ElementProperty Value 33666 | Date 33668 | | Date 33670 | GDT 33672 | Date 33674 | | 0..1 33676 |

Fig. 336b

| GDT | | Cat. | Obj. Class | Prop. | Rep./ Ass. Qual. | Rep./ Assoc. | Type | Type Name | Len. | Card. |
|---|---|---|---|---|---|---|---|---|---|---|
| | Time 33678 | E 33680 | PriceSpecification ElementProperty Value 33682 | Time 33684 | | Time 33686 | GDT 33688 | Time 33690 | | 0..1 33692 |
| | Indica-tor 33694 | E 33696 | PriceSpecification ElementProperty Value 33698 | Indicator 33600A | | Indicator 33602A | GDT 33604A | Indica-tor 33606A | | 0..1 33608A |

Fig. 337

| GDT | | Cat. | Obj. Class | Property | Rep./ Assoc. | Type | Type Name | Card. |
|---|---|---|---|---|---|---|---|---|
| PriceSpecification-ElementScaleLine 33700 | | | PriceSpecification-ElementScaleLine 33702 | | Details 33704 | | | |
| | ScaleAxis-Step 33706 | E 33708 | PriceSpecification-ElementScaleLine 33710 | ScaleAxis-Step 33712 | ScaleAxis-Step 33714 | GDT 33716 | ScaleAxis-Step 33718 | 1..2 33720 |
| | Price 33722 | E 33724 | PriceSpecification-ElementScaleLine 33726 | Price 33728 | Price 33730 | GDT 33732 | Price 33734 | 0..1 33736 |
| | Percent 33738 | E 33740 | PriceSpecification-ElementScaleLine 33742 | Percent 33744 | Percent 33746 | GDT 33748 | Percent 33750 | 0..1 33752 |
| | Fixed-Amount 33754 | E 33756 | PriceSpecification-ElementScaleLine 33758 | Fixed-Amount 33760 | Amount 33762 | GDT 33764 | Amount 33766 | 0..1 33768 |

Fig. 338

| GDT | Object Class | Property | Rep. / Assoc. | Type | Type Name | Len. | Remarks |
|---|---|---|---|---|---|---|---|
| PriceSpecification-ElementTypeCode 33800 | PriceSpecification-Element 33802 | Type 33804 | Code 33806 | CCT 33808 | Code 33810 | 4 33812 | Restricted 33814 |

Fig. 339

| GDT | Object Class | Property | Rep. / Assoc. | Type | Type Name | Len. | Remarks |
|---|---|---|---|---|---|---|---|
| ProductAttributeGroupID 33900 | Product AttributeGroup 33902 | Identification 33904 | Identifier 33906 | CCT 33908 | Identifier 33910 | 1..16 33912 | Restricted 33914 |

Fig. 340

| GDT | | Cat. | Obj. Class | Prop. Qual. | Property | Rep./ Assoc. | Type | Type Name | Len. | Card. | Remarks |
|---|---|---|---|---|---|---|---|---|---|---|---|
| Promo-tionIn-ternalID 34000 | | | Promotion 34002 | Internal 34004 | Identification 34006 | Identifier 34008 | GDT 34010 | Promo-tionID 34012 | 1..35 34014 | | restricted 34016 |
| | Scheme-AgencyID 34018 | A 34020 | Identifica-tionScheme Agency 34022 | | Identification 34024 | Identifier 34026 | XSD 34028 | Token 34030 | 1..60 34032 | 0.1 34034 | |

Fig. 341

| GDT | Obj. Class | Prop. Qual. | Property | Rep./ Assoc. | Type | Type Name | Len. | Remarks |
|---|---|---|---|---|---|---|---|---|
| PromotionPartyID 34100 | Promotion 34102 | Party 34104 | Identification 34106 | Identifier 34108 | GDT 34110 | PromotionID 34112 | 1..35 34114 | Restricted 34116 |

Fig. 342

| GDT | | Cat. | Obj. Class | Property | Rep./ Assoc. | Type | Type Name | Len. | Card. |
|---|---|---|---|---|---|---|---|---|---|
| Received-Quantity-Accumulation 34200 | | | Received Quantity Accumulation 34202 | Details 34204 | Details 34206 | | | | |
| | Reference-Period 34208 | E 34210 | Received Quantity Accumulation 34212 | Reference-Period 34214 | Details 34216 | GDT 34218 | DateTime-Period 34220 | | 0..1 34222 |
| | Quantity 34224 | E 34226 | Received Quantity Accumulation 34228 | Quantity 34230 | Quantity 34232 | GDT 34234 | Quantity 34236 | 13,6 34238 | 1 34240 |
| | Reconcilia-tionDate-Time 34242 | E 34244 | Received Quantity Accumulation 34246 | Reconciliation 34248 | DateTime 34250 | GDT 34252 | DateTime 34254 | | 0..1 34256 |
| | Reoncilia-tionQuantity 34258 | E 34260 | Received Quantity Accumulation 34262 | Reconciliation 34264 | Quantity 34266 | GDT 34268 | Quantity 34270 | | 0..1 34272 |

Fig. 343

| GDT | Property | Rep./ Assoc. | Type | Type Name |
|---|---|---|---|---|
| ReleasedIndicator 34300 | Released Indicator 34302 | Indicator 34304 | CCT 34306 | Indicator 34308 |

Fig. 344

| GDT | Property | Rep./ Assoc. | Type |
|---|---|---|---|
| RelevanceIndicator 34400 | Relevance 34402 | Indicator 34404 | CCT:Indicator 34406 |

Fig. 345

| GDT | Property | Rep./ Assoc. | Type |
|---|---|---|---|
| ReturnsIndicator 34500 | Returns 34502 | Indicator 34504 | CCT:Indicator 34506 |

Fig. 346

| GDT | Obj. Class | Property | Rep./ Assoc. | Type | Type Name | Len. |
|---|---|---|---|---|---|---|
| ReturnMaterial-AuthorisationID 34600 | Return Material Authorisation 34602 | Identification 34604 | Identifier 34606 | CCT 34608 | Identifier 34610 | 1..20 34612 |

Fig. 347

| GDT | Cat. | Property | Rep./ Assoc. | Type | Type Name |
|---|---|---|---|---|---|
| RevocationIndicator 34700 | E 34702 | Revocation 34704 | Indicator 34706 | CCT 34708 | Indicator 34710 |

Fig. 348a

| GDT | | Cat. | Obj. Class | Property | Rep./ Assoc. | Type | Type Name | Card. |
|---|---|---|---|---|---|---|---|---|
| ScaleAxisStep 34800 | | | ScaleAxisStep 34802 | | Details 34804 | | | |
| | ScaleAxis-BaseCode 34806 | E 34808 | ScaleAxisStep 34810 | ScaleAxisBase 34812 | Code 34814 | GDT 34816 | ScaleAxis-BaseCode 34818 | 1 34820 |
| | IntervalBoun-daryTypeCode 34822 | E 34824 | ScaleAxisStep 34826 | Interval Boundary Type 34828 | Code 34830 | GDT 34832 | ScaleAxis-StepInterval-Boundary-TypeCode 34834 | 1 34836 |
| | Amount 34838 | E 34840 | ScaleAxisStep 34842 | Amount 34844 | Amount 34846 | GDT 34848 | Amount 34850 | 0..1 34852 |
| | Quantity 34854 | E 34856 | ScaleAxisStep 34858 | Quantity 34860 | Quantity 34862 | GDT 34864 | Quantity 34866 | 0..1 34868 |

Fig. 348b

| GDT | | Cat. | Obj. Class | Property | Rep./ Assoc. | Type | Type Name | Card. |
|---|---|---|---|---|---|---|---|---|
| | DecimalValue 34870 | E 34872 | ScaleAxisStep 34874 | DecimalValue 34876 | Decimal-Value 34878 | GDT 34880 | Decimal-Value 34882 | 0..1 34884 |
| | IntegerValue 34886 | E 34888 | ScaleAxisStep 34890 | IntegerValue 34892 | Integer-Value 34894 | GDT 34896 | Integer-Value 34898 | 0..1 34800A |

Fig. 349

| GDT | Rep./Ass. Qualifier | Representation/ Association | Type | Type Name |
|---|---|---|---|---|
| SearchText 34900 | Search 34902 | Text 34904 | xsd 34906 | string 34908 |

Fig. 350

| GDT | Property | Rep./Assoc. | Type | Type Name | Len. | Remarks |
|---|---|---|---|---|---|---|
| SerialID 35000 | Serial Identification 35002 | Identifier 35004 | CCT 35006 | Identifier 35008 | 1..30 35010 | restricted 35012 |

Fig. 351

| GDT | | Cat. | Obj. Class | Property | Rep./ Assoc. | Type | Type Name | Len. | Card. |
|---|---|---|---|---|---|---|---|---|---|
| Shipped-Quantity-Accumulation 35100 | | | Shipped Quantity Accumulation 35102 | Details 35104 | Details 35106 | | | | |
| | Reference-Period 35108 | E 35110 | Shipped Quantity Accumulation 35112 | Reference-Period 35114 | Details 35116 | GDT 35118 | DateTime-Period 35120 | | 0..1 35122 |
| | Quantity 35124 | E 35126 | Shipped Quantity Accumulation 35128 | Quantity 35130 | Quantity 35132 | GDT 35134 | Quantity 35136 | 13,6 35138 | 1 35140 |

Fig. 352

| GDT | Obj. Class | Property | Rep./ Assoc. | Type | Type Name | Len. | Remarks |
|---|---|---|---|---|---|---|---|
| SupplyChainExceptionStatusCode 35200 | SupplyChainException 35202 | Status 35204 | Code 35206 | CCT 35208 | Code 35210 | 1..15 35212 | Restricted 35214 |

Fig. 353

| GDT | | Cat. | Obj. Class | Property | Rep./ Assoc. | Type | Type Name | Len. | Card. | Remarks |
|---|---|---|---|---|---|---|---|---|---|---|
| Supply-Chain-Excep-tion-TypeID 35300 | | | SupplyChain-Exception 35302 | Type 35304 | Identifier 35306 | CCT 35308 | Identifi-er 35310 | 1..4 35312 | | restricted 35314 |
| | Scheme-Agency-ID 35316 | A 35318 | Identification-Scheme-Agency 35320 | Identifica-tion 35322 | Identifier 35324 | XSD 35326 | Token 35328 | 1..60 35330 | 0..1 35332 | |

Fig. 354

| GDT | | Cat. | Obj. Class | Property | Rep./ Assoc. | Type | Type Name | Card. |
|---|---|---|---|---|---|---|---|---|
| SystemAdministrativeData 35400 | | | System Administrative Data 35402 | | Details 35404 | | | |
| | CreationDateTime 35406 | E 35408 | System Administrative Data 35410 | Creation DateTime 35412 | DateTime 35414 | GDT 35416 | DateTime 35418 | 1..1 35420 |
| | CreationUserAccountID 35422 | E 35424 | System Administrative Data 35426 | Creation User Account ID 35428 | Identifier 35430 | GDT 35432 | UserAccountID 35434 | 1..1 35436 |
| | LastChangeDateTime 35438 | E 35440 | System Administrative Data 35442 | Last Change DateTime 35444 | DateTime 35446 | GDT 35448 | DateTime 35450 | 0..1 35452 |
| | LastChangeUserAccountID 35454 | E 35456 | System Administrative Data 35458 | Last Change User Account ID 35460 | Identifier 35462 | GDT 35464 | UserAccountID 35466 | 0..1 35468 |

Fig. 355

| CDT | | Cat. | Obj. Class | Property | Rep./ Assoc. | Type | Type Name | Len. | Card. | Remarks |
|---|---|---|---|---|---|---|---|---|---|---|
| TaxAuthority-Party 35500 | | | Tax Authority Party 35502 | | Details 35504 | | | | | |
| | ID 35506 | E 35508 | Tax Authority Party 35510 | Identifi-cation 35512 | Identifier 35514 | CCT 35516 | Identifier 35518 | 20 35520 | 0..1 35522 | Restricted 35324 |
| | Country-Code 35526 | E 35528 | Tax Authority Party 35530 | Country 35532 | Code 35534 | GDT 35536 | Country-Code 35538 | | 1 35540 | |
| | Region-Code 35542 | E 35544 | Tax Authority Party 35546 | Region 35548 | Code 35550 | GDT 35552 | Region-Code 35554 | | 0..1 35556 | |
| | Address 35558 | E 35560 | Tax Authority Party 35562 | Address 35564 | Address 35566 | GDT 35568 | Address 35570 | | 0..1 35572 | Restricted 35574 |

Fig. 356

| GDT | Obj. Class | Property | Rep./ Assoc. | Type | Type Name | Len. |
|---|---|---|---|---|---|---|
| TaxIdentification-NumberTypeCode 35600 | Tax Identification Number 35602 | Type 35604 | Code 35606 | CCT 35608 | Code 35610 | 3..4 35612 |

Fig. 357

| GDT | Cat. | Property | Rep./ Assoc. | Type | Type Name |
|---|---|---|---|---|---|
| TestDataIndicator 35700 | E 35702 | Test Data 35704 | Indicator 35706 | CCT 35708 | Indicator 35710 |

| GDT | Category | Object Class Term Qualifier | Object Class Term | Property | Representation/ Association | Type | Type Name | Len. | C. | Remarks |
|---|---|---|---|---|---|---|---|---|---|---|
| Account Determination House Bank Group Code 35800AA | | Account Determination 35802AA | House Bank Group 35804AA | | Code 35806AA | CCT 35808AA | Code 35810AA | 1..4 35812AA | | restricted 35814AA |

FIG. 358AA

| GDT | Category | Object Class | Property | Representation/ Association | Type | Type Name | Len. | Card. | Remarks |
|---|---|---|---|---|---|---|---|---|---|
| Account Determination Business Partner Group Code 35800AB | | Account Determination BusinessPartner Group 35802AB | | Code 35804AB | CCT 35806AB | Code 35808AB | 1..10 35810AB | | restricted 35812AB |

FIG. 358AB

| GDT | Category | Object Class Term Qualifier | Object Class Term | Prop. | Representation/ Association | Type | Type Name | Len. | Card. | Remarks |
|---|---|---|---|---|---|---|---|---|---|---|
| Account Determination Expense Group Code 35800AC | | Account Determination 35802AC | Expense Group 35804AC | | Code 35806AC | CCT 35808AC | Code 35810AC | 1..4 35812AC | | restricted 35814AC |

FIG. 358AC

| GDT | Category | Object Class | Property | Representation/ Association | Type | Type Name | Len. | Card. | Remarks |
|---|---|---|---|---|---|---|---|---|---|
| Account Determination Fixed Asset Class Group Code 35800AD | | Account Determination Fixed Asset Class Group 35802AD | | Code 35804AD | CCT 35806AD | Code 35808AD | 1..10 35810AD | | restricted 35812AD |

FIG. 358AD

| GDT | Cat. | Object Class Term Qualifier | Object Class | Property | Representation/ Association | Type | Type Name | Len. | Card. | Remarks |
|---|---|---|---|---|---|---|---|---|---|---|
| Account Determination Material Ledger Account Group Code 35800AE | | Account Determination 35802AE | Material Ledger Account Group 35804AE | | Code 35806AE | CCT 35808AE | Code 35810AE | 1..10 35812AE | | restricted 35814AE |

FIG. 358AE

| GDT | Category | Object Class Term Qualifier | Object Class Term | Property | Representation/ Association | Type | Type Name | Len. | Card. | Remarks |
|---|---|---|---|---|---|---|---|---|---|---|
| Account Determination Service Product Group Code 35800AF | | Account Determination 35802AF | Service Product Group 35804AF | | Code 35806AF | CCT 35808AF | Code 35810AF | 1..4 35812AF | | restricted 35814AF |

FIG. 358AF

| GDT | | Cat. | Object Class | Property | Representation/ Association | Type | Type Name | Len | Card. | Re. |
|---|---|---|---|---|---|---|---|---|---|---|
| Accounting Object Set Assignment 35800AG | | | Accounting Object Set Assignment 35802AG | Details 35804AG | | | | | | |
| | Percent 35806AG | E 35808AG | Accounting Object Set Assignment 35810AG | Percent 35812AG | Percent 35814AG | GDT 35816AG | Percent 35818AG | | 0..1 35820AG | |
| | Amount 35822AG | E 35824AG | Accounting Object Set Assignment 35826AG | Amount 35828AG | Amount 35830AG | GDT 35832AG | Amount 35834AG | | 0..1 35836AG | |
| | Quantity 35838AG | E 35840AG | Accounting Object Set Assignment 35842AG | Quantity 35844AG | Quantity 35846AG | GDT 35848AG | Quantity 35850AG | | 0..1 35852AG | |
| | Accounting Object Set 35854AG | E 35856AG | Accounting Object Set Assignment 35858AG | Accounting Object Set 35860AG | Accounting Object Set 35862AG | GDT 35864AG | Accounting Object Set 35866AG | | 1 35868AG | |

FIG. 358AG

| GDT | Cat. | Object Class | Property | Representation/ Association | Type | Type Name | Len. | Card. | Remarks |
|---|---|---|---|---|---|---|---|---|---|
| Accounting Period ID 35800AH | | AccountingPeriod 35802AH | Identification 35804AH | Identifier 35806AH | CCT 35808AH | Identifier 35810AH | 1..3 35812AH | | Restricted 35814AH |

FIG. 358AH

| GDT | | Cat. | Object Class | Property | Representation / Association | Type | Type Name | Len. | Card. | Remarks |
|---|---|---|---|---|---|---|---|---|---|---|
| Authority Type Code 35800AI | | | AuthorityType 35802AI | | Code 35804AI | CCT 35806AI | Code 35808AI | 1..2 35810AI | | restricted 35812AI |
| | List ID 35814AI | A 35816AI | CodeList 35818AI | Identification 35820AI | Identifier 35822AI | xsd 35824AI | token 35826AI | | 0..1 35828AI | |
| | List Agency ID 35830AI | A 35832AI | CodeList Agency 35834AI | Identification 35836AI | Identifier 35838AI | xsd 35840AI | token 35842AI | | 0..1 35844AI | |
| | List Version ID 35846AI | A 35848AI | CodeList 35850AI | Version 35852AI | Identifier 35854AI | xsd 35856AI | token 35858AI | | 0..1 35860AI | |
| | List Agency-Scheme ID 35862AI | A 35864AI | CodeList Agency 35866AI | Scheme 35868AI | Identifier 35870AI | xsd 35872AI | token 35874AI | | 0..1 35876AI | |
| | List Agency-Scheme Agency ID 35878AI | A 35880AI | CodeList Agency 35882AI | Scheme Agency 35884AI | Identifier 35886AI | xsd 35888AI | token 35890AI | | 0..1 35892AI | |

FIG. 358AI

| GDT | | Cat. | Object Class | Property | Representation/ Association | Type | Type Name | Len. | Card. | Re. |
|---|---|---|---|---|---|---|---|---|---|---|
| Bank 35800AJ | | | Bank 35802AJ | | Details 35804AJ | | | | | |
| | InternalID 35806AJ | E 35808AJ | Bank 35810AJ | Internal Identification 35812AJ | Identifier 35814AJ | GDT 35816AJ | BankInternalID 35818AJ | | 0..1 35820AJ | |
| | StandardID 35822AJ | E 35824AJ | Bank 35826AJ | Standard Identification 35828AJ | Identifier 35830AJ | GDT 35832AJ | BankStandardID 35834AJ | | 0..1 35836AJ | |
| | RoutingID 35838AJ | E 35840AJ | Bank 35842AJ | Routing Identification 35844AJ | Identifier 35846AJ | GDT 35848AJ | BankRoutingID 35850AJ | | 0..1 35852AJ | |
| | Routing ID Type Code 35854AJ | E 35856AJ | Bank 35858AJ | Routing Identification Type 35860AJ | Code 35862AJ | GDT 35864AJ | BankRouting IDTypeCode 35866AJ | | 0..1 35868AJ | |
| | Country Code 35870AJ | E 35872AJ | Bank 35874AJ | Country 35876AJ | Code 35878AJ | GDT 35880AJ | CountryCode 35881AJ | | 0..1 35882AJ | |
| | Address 35883AJ | E 35884AJ | Bank 35885AJ | Address 35886AJ | Details 35887AJ | GDT 35888AJ | Address 35889AJ | | 0..1 35890AJ | |
| | Branch Address 35891AJ | E 35892AJ | Bank 35893AJ | Branch Address 35894AJ | Details 35895AJ | GDT 35896AJ | Address 35897AJ | | 0..n 35898AJ | |

FIG. 358AJ

| GDT | | Cat. | Object Class | Property | Representation/ Association | Type | Type Name | Len. | Card. | Re. |
|---|---|---|---|---|---|---|---|---|---|---|
| Bank Account Balance 35800AK | | | BankAccountBalance 35802AK | | Details 35804AK | | | | | |
| | TypeCode 35806AK | E 35807AK | BankAccountBalance 35808AK | Type 35810AK | Code 35812AK | GDT 35814AK | Bank Account Balance Type Code 35816AK | | 0..1 35818AK | |
| | Creation Date Time 35820AK | E 35821AK | BankAccountBalance 35822AK | DateTime 35824AK | DateTime 35826AK | GDT 35828AK | DateTime 35830AK | | 1 35832AK | |
| | Amount 35834AK | E 35835AK | BankAccountBalance 35836AK | Amount 35838AK | Amount 35840AK | GDT 35842AK | Amount 35844AK | | 1 35846AK | |

FIG. 358AK

| GDT | | Cat. | Object Class | Property | Representation/ Association | Type | Type Name | Len. | Card. | Remarks |
|---|---|---|---|---|---|---|---|---|---|---|
| Bank Account Balance Type Code 35800AL | | | Bank Account Balance 35802AL | Type 35804AL | Code 35806AL | CCT 35808AL | Code 35810AL | 1..30 35812AL | | restricted 35814AL |
| | listID 35816AL | A 35818AL | CodeList 35820AL | Identification 35822AL | Identifier 35824AL | xsd 35826AL | token 35828AL | 1..60 35830AL | 0..1 35832AL | |
| | List Version ID 35834AL | A 35836AL | CodeList 35838AL | Version 35840AL | Identifier 35842AL | xsd 35844AL | token 35846AL | 1..15 35848AL | 0..1 35850AL | |
| | List Agency ID 35852AL | A 35854AL | CodeListAgency 35856AL | Identification 35858AL | Identifier 35860AL | xsd 35862AL | token 35864AL | 1..60 35866AL | 0..1 35868AL | |
| | List Agency Scheme ID 35870AL | | CodeListAgency 35874AL | Scheme 35876AL | Identifier 35878AL | xsd 35880AL | token 35882AL | 1..60 35884AL | 0..1 35886AL | |
| | List Agency Scheme Agency ID 35888AL | | CodeListAgency 35892AL | Scheme Agency 35894AL | Identifier 35895AL | xsd 35896AL | token 35897AL | 1..3 35898AL | 0..1 35899AL | |

FIG. 358AL

| GDT | Cat. | Object Class | Property | Representation/ Association | Type | Type Name | Len. | Card. | Remarks |
|---|---|---|---|---|---|---|---|---|---|
| Bank Account Differentiator ID 35800AM | | Bank Account 35802AM | Differentiator Identification 35804AM | Identifier 35806AM | CCT 35808AM | Identifier 35810AM | 1..20 35812AM | | restricted 35814AM |

FIG. 358AM

| GDT | Cat. | Object Class | Property | Representation/ Association | Type | Type Name | Len. | Card. | Remarks |
|---|---|---|---|---|---|---|---|---|---|
| Bank Account Holder Name 35800AN | | Bank Account 35802AN | Holder 35804AN | Name 35806AN | GDT 35808AN | Name 35810AN | 1..80 35812AN | | restricted 35814AN |

FIG. 358AN

| GDT | Object Class | Property Qual. | Property | Representation/ Association | Type | Type Name | Len. | Card. | Remarks |
|---|---|---|---|---|---|---|---|---|---|
| Bank Account ID 35800AO | BankAccount 35802AO | | Identification 35804AO | Identifier 35806AO | CCT 35808AO | Identifier 35810AO | 1..35 35812AO | | Restricted 35814AO |

FIG. 358AO

| GDT | Cat. | Object Class | Property | Representation / Association | Type | Type Name | Len. | Card. | Remarks |
|---|---|---|---|---|---|---|---|---|---|
| Bank Account ID Check Digit Value 35800AP | | Bank Account 35802AP | Identifier Check Digit 35804AP | Value 35806AP | xsd 35808AP | String 35810AP | 1..2 35812AP | | |

FIG. 358AP

| GDT | | Cat. | Object Class | Property Qual. | Property | Representation / Association | Type | Type Name | Len. | Card. | Remarks |
|---|---|---|---|---|---|---|---|---|---|---|---|
| Bank Account Internal ID 35800AQ | | | Bank Account 35802AQ | Internal 35804AQ | Identification 35806AQ | Identifier 35808AQ | CCT 35810AQ | Identifier 35812AQ | 1..32 35814AQ | | Restricted 35816AQ |
| | Scheme Agency ID 35818AQ | A 35820AQ | Identification Scheme Agency 35822AQ | Identification 35824AQ | Identification 35826AQ | Identifier 35828AQ | xsd 35830AQ | token 35832AQ | 1..60 35834AQ | 0..1 35836AQ | |

FIG. 358AQ

| GDT | Object Class | Property Qual. | Property | Representation/ Association | Type | Type Name | Len. | Card. | Remarks |
|---|---|---|---|---|---|---|---|---|---|
| Bank Account Standard ID 35800AR | Bank Account 35802AR | Standard 35804AR | Identification 35806AR | Identifier 35808AR | CCT 35810AR | Identifier 35812AR | 1..34 35814AR | | Restricted 35816AR |

FIG. 358AR

| GDT | Cat. | Object Class | Property | Representation / Association | Type | Type Name | Len. | Card. | Remarks |
|---|---|---|---|---|---|---|---|---|---|
| Bank Account Type Code 35800AS | | Bank Account 35802AS | Type 35804AS | Code 35806AS | CCT 35808AS | Code 35810AS | 1..3 35812AS | | Restricted 35814AS |

FIG. 358AS

| GDT | Cat. | Object Class | Property | Representation/ Association | Type | Type Name | Len. | Card. | Remarks |
|---|---|---|---|---|---|---|---|---|---|
| Bank Charge Bearer Code 35800AT | | Bank Charge Bearer 35802AT | | Code 35804AT | CCT 35806AT | Code 35808AT | 1..4 35810AT | | restricted 35812AT |

FIG. 358AT

| GDT | | Cat. | Object Class | Property | Representation/ Association | Type | Type Name | Len. | Card. | Remarks |
|---|---|---|---|---|---|---|---|---|---|---|
| Bank Internal ID 35800AU | | | Bank 35804AU | Internal Identification 35806AU | Identifier 35808AU | CCT 35810AU | Identifier 35812AU | 1..18 35814AU | | Restricted 35816AU |
| | Scheme Agency ID 35818AU | A 35820AU | Identification Scheme Agency 35822AU | Identification 35824AU | Identifier 35826AU | XSD 35828AU | Token 35830AU | 1..60 35832AU | 0..1 35834AU | |

FIG. 358AU

| GDT | Cat. | Object Class | Property | Representation/ Association | Type | Type Name | Len. | Card. | Remarks |
|---|---|---|---|---|---|---|---|---|---|
| Bank Routing ID 35800AV | | Bank 35802AV | Routing Identification 35804AV | Identifier 35806AV | CCT 35808AV | Identifier 35810AV | 1..35 35812AV | | restricted 35814AV |

FIG. 358AV

| GDT | Cat. | Object Class | Property | Representation / Association | Type | Type Name | Len. | Card. | Remarks |
|---|---|---|---|---|---|---|---|---|---|
| Bank Routing ID Type Code 35800AW | | Bank Routing Identifier 35802AW | Type 35804AW | Code 35806AW | CCT 35808AW | Code 35810AW | 1..3 35812AW | | Restricted 35814AW |

FIG. 358AW

| GDT | Object Class | Property Qual. | Property | Representation/ Association | Type | Type Name | Len. | Card. | Remarks |
|---|---|---|---|---|---|---|---|---|---|
| Bank Standard ID 35800AX | Bank 35802AX | Standard 35804AX | Identification 35806AX | Identifier 35808AX | CCT 35810AX | Identifier 35812AX | 8..11 35814AX | | restricted 35816AX |

FIG. 358AX

| GDT | Cat. | Object Class | Property | Representation/ Association | Type | Type Name | Len. | Card. | Remarks |
|---|---|---|---|---|---|---|---|---|---|
| Blocking Reason Code 35800AY | | Blocking Reason 35802AY | | Code 35806AY | CCT 35808AY | Code 35810AY | 1..2 35812AY | | restricted 35814AY |

FIG. 358AY

| GDT | Cat. | Object Class | Property | Representation/ Association | Type | Type Name | Len. | Card. | Remarks |
|---|---|---|---|---|---|---|---|---|---|
| Business Partner-Bank Details ID 35800AZ | | Business Partner Bank Details 35802AZ | Identification 35804AZ | Identifier 35806AZ | CCT 35808AZ | Identifier 35810AZ | 1..4 35812AZ | | Restricted 35814AZ |

FIG. 358AZ

| GDT | Cat. | Object Class | Property | Representation/ Association | Type | Type Name | Len. | Card. | Remarks |
|---|---|---|---|---|---|---|---|---|---|
| Business Partner Category Code 35800BA | | Business Partner 35802BA | Category 35804BA | Code 35806BA | CCT 35808BA | Code 35810BA | 1 35812BA | | restricted 35814BA |

FIG. 358BA

| GDT | | Cat. | Object Class | Property | Representation / Association | Type | Type Name | Len. | Card. | Remarks |
|---|---|---|---|---|---|---|---|---|---|---|
| Business Partner-Relationship-Category Code 35800BB | | | Business Partner Relationship 35802BB | Category 35804BB | Code 35806BB | CCT 35808BB | Code 35810BB | 1..6 35812BB | | Restricted 35814BB |
| | listID 35816BB | A 35818BB | CodeList 35820BB | Identification 35822BB | Identifier 35824BB | xsd 35826BB | token 35828BB | | 0..1 35830BB | |
| | listAgencyID 35832BB | A 35834BB | Code List Agency 35836BB | Identification 35838BB | Identifier 35840BB | xsd 35842BB | token 35844BB | | 0..1 35846BB | |
| | listVersionID 35848BB | A 35850BB | Code List 35852BB | Version 35854BB | Identifier 35856BB | xsd 35858BB | token 35860BB | | 0..1 35862BB | |
| | listAgency-SchemeID 35864BB | A 35866BB | Code List Agency 35868BB | Scheme 35870BB | Identifier 35872BB | xsd 35874BB | token 35876BB | | 0..1 35878BB | |
| | listAgency-Scheme Agency ID 35880BB | A 35882BB | Code List Agency 35884BB | Scheme Agency 35886BB | Identifier 35888BB | xsd 35890BB | token 35892BB | | 0..1 35894BB | |

FIG. 358BB

| GDT | | Cat. | Object Class | Property | Representation/ Association | Type | Type Name | Len. | Card. | Remarks |
|---|---|---|---|---|---|---|---|---|---|---|
| Business Transaction Document Bank Account 35800BC | | | Business Transaction Document Bank Account 35802BC | | Details 35804BC | | | | | |
| | ID 35806BC | E 35808BC | Business Transaction Document Bank Account 35810BC | Identification 35812BC | Identifier 35814BC | GDT 35816BC | Bank AccountID 35818BC | | 0..1 35820BC | |
| | ID Check Digit Value 35822BC | E 35824BC | Business Transaction Document Bank Account 35826BC | IDCheckDigit 35828BC | Value 35830BC | GDT 35832BC | Bank Account ID Check DigitValue 35834BC | | 0..1 35836BC | |
| | Internal ID 35838BC | E 35840BC | Business Transaction Document Bank Account 35842BC | Internal_ Identification 35844BC | Identifier 35846BC | GDT 35848BC | Bank Account InternalID 35850BC | | 0..1 35852BC | |
| | Standard ID 35854BC | E 35856BC | Business Transaction Document Bank Account 35858BC | Standard_ Identification 35860BC | Identifier 35862BC | GDT 35864BC | Bank Account StandardID 35866BC | | 0..1 35868BC | |
| | Type Code 35870BC | E 35872BC | Business Transaction Document Bank Account 35874BC | Type 35876BC | Code 35878BC | GDT 35880BC | Bank Account TypeCode 35881BC | | 0..1 35882BC | |

FIG. 358BC

| GDT | | Cat. | Object Class | Property | Representation/ Association | Type | Type Name | Len. | Card. | Re. |
|---|---|---|---|---|---|---|---|---|---|---|
| Central Bank Report Item 35800BD | | | Central Bank Report Item 35802BD | | Details 35804BD | | | | | |
| | ReportingCountry Code 35806BD | | Central Bank Report Item 35810BD | Reporting Country 35812BD | Code 35814BD | GDT 35816BD | CountryCode 35818BD | | 1 35820BD | |
| | SupplyingCountry Code 35822BD | | Central Bank Report Item 35826BD | Supplying Country 35828BD | Code 35830BD | GDT 35832BD | CountryCode 35834BD | | 0..1 35836BD | |
| | Amount 35838BD | | Central Bank Report Item 35842BD | Amount 35844BD | Amount 35846BD | GDT 35848BD | Amount 35850BD | | 1 35852BD | |
| | Reason Classification Code 35854BD | | Central Bank Report Item 35858BD | Reason Classification 35860BD | Code 35862BD | GDT 35864BD | Central Bank Report Reason Classification Code 35866BD | | 0..1 35868BD | |
| | ReasonCode 35870BD | | Central Bank Report Item 35874BD | Reason 35876BD | Code 35878BD | GDT 35880BD | CentralBank ReportReason Code 35881BD | | 0..1 35882BD | |
| | Reason Description 35889BD | | Central Bank Report Item 35890BD | Reason 35891BD | Description 35892BD | GDT 35893BD | Description 35894BD | | 0..1 35895BD | |

FIG. 358BD

| GDT | Cat. | Object Class | Property | Representation/ Association | Type | Type Name | Len. | Card. | Remarks |
|---|---|---|---|---|---|---|---|---|---|
| Central Bank Report Reason Classification Code 35800BE | | Central Bank ReportReason 35802BE | Classification 35804BE | Code 35806BE | CCT 35808BE | Code 35810BE | 1 35812BE | | restricted 35814BE |

FIG. 358BE

| GDT | Cat. | Object Class | Property | Representation/ Association | Type | Type Name | Len. | Card. | Remarks |
|---|---|---|---|---|---|---|---|---|---|
| Central Bank Report Reason Code 35800BF | | Central Bank Report 35802BF | Reason 35804BF | Code 35806BF | CCT 35808BF | Code 35810BF | 1..3 35812BF | | restricted 35814BF |

FIG. 358BF

| GDT | | Cat. | Object Class Qualifier | Object Class | Property | Represen-tation/ Associa-tion | Type | Type Name | Len. | Card. | Re. |
|---|---|---|---|---|---|---|---|---|---|---|---|
| Commission Product Group Code 35800BG | | | Commission 35802BG | Product Group 35804BG | | Code 35806BG | CCT 35008BG | Code 35810BG | 1..2 35812BG | | |
| | listID 35816BG | A 35818BG | CodeList 35820BG | | Identification 35822BG | Identifier 35824BG | xsd 35826BG | token 35828BG | | 0..1 35830BG | |
| | listAgencyID 35832BG | A 35834BG | Code-ListAgency 35836BG | | Identification 35838BG | Identifier 35840BG | xsd 35842BG | token 35844BG | | 0..1 35846BG | |
| | listVersionID 35848BG | A 35850BG | CodeList 35852BG | | Version 35854BG | Identifier 35856BG | xsd 35858BG | token 35860BG | | 0..1 35862BG | |
| | listAgency-SchemeID 35864BG | A 35866BG | Code-ListAgency 35868BG | | Scheme 35870BG | Identifier 35872BG | xsd 35874BG | token 35876BG | | 0..1 35878BG | |
| | listAgency-Sche-meAgencyID 35880BG | A 35882BG | Code-ListAgency 35884BG | | Scheme Agency 35886BG | Identifier 35888BG | xsd 35890BG | token 35892BG | | 0..1 35894BG | |

FIG. 358BG

| GDT | | Cat. | Object Class | Property | Representation/ Association | Type | Type Name | Len. | Card. | Remarks |
|---|---|---|---|---|---|---|---|---|---|---|
| Communication Medium TypeCode 35800BH | | | | Communication Medium_ Type 35802BH | Code 35804BH | CCT 35806BH | Code 35808BH | 1..2 35810BH | | restricted 35812BH |
| | List ID 35814BH | A 35816BH | CodeList 35818BH | Identification 35820BH | Identifier 35822BH | xsd 35824BH | token 35826BH | | 0..1 35828BH | |
| | List AgencyID 35830BH | A 35832BH | Code-ListAgency 35834BH | Identification 35836BH | Identifier 35838BH | xsd 35840BH | token 35842BH | | 0..1 35844BH | |
| | List Version ID 35846BH | A 35848BH | CodeList 35850BH | Version 35852BH | Identifier 35854BH | xsd 35856BH | token 35858BH | | 0..1 35860BH | |

FIG. 358BH

| GDT | Cat. | Object Class | Property | Representation/ Association | Type | Type Name | Len. | Card. | Remarks |
|---|---|---|---|---|---|---|---|---|---|
| Contact Allowed Code<br><br>35800BI | | | Contact Al-lowed<br><br>35802BI | Code<br><br>35804BI | CCT<br><br>35806BI | Code<br><br>35808BI | 1<br><br>35810BI | | Restricted<br><br>35812BI |

FIG. 358BI

| GDT | | Cat. | Object Class | Property | Representation/ Association | Type | Type Name | Len. | Card. | Remarks |
|---|---|---|---|---|---|---|---|---|---|---|
| Contact Person Function Type Code 35800BJ | | | Contact Person 35802BJ | Function Type 35804BJ | Code 35806BJ | CCT 35808BJ | Code 35810BJ | 1..4 35812BJ | | Restricted 35814BJ |
| | listID 35816BJ | A 35818BJ | CodeList 35820BJ | Identification 35822BJ | Identifier 35824BJ | xsd 35826BJ | token 35828BJ | | 0..1 35830BJ | |
| | listAgencyID 35832BJ | A 35834BJ | CodeList Agency 35836BJ | Identification 35838BJ | Identifier 35840BJ | xsd 35842BJ | token 35844BJ | | 0..1 35846BJ | |
| | listVersionID 35848BJ | A 35850BJ | CodeList 35852BJ | Version 35854BJ | Identifier 35856BJ | xsd 35858BJ | token 35860BJ | | 0..1 35862BJ | |
| | listAgency-SchemeID 35864BJ | A 35866BJ | CodeList Agency 35868BJ | Scheme 35870BJ | Identifier 35872BJ | xsd 35874BJ | token 35876BJ | | 0..1 35878BJ | |
| | listAgency-SchemeAgency ID 35880BJ | A 35882BJ | CodeList Agency 35884BJ | Scheme Agency 35886BJ | Identifier 35888BJ | xsd 35890BJ | token 35892BJ | | 0..1 35894BJ | |

FIG. 358BJ

| GDT | Cat. | Object Class | Property | Representation / Association | Type | Type Name | Len. | Card. | Remarks |
|---|---|---|---|---|---|---|---|---|---|
| Correspondence Bank Type Code<br>35800BK | | Corresponde nce Bank<br>35802BK | Type<br>35804BK | Code<br>35806BK | CCT<br>35808BK | Code<br>35810BK | 1<br>35812BK | | Restricted<br>35814BK |

FIG. 358BK

| GDT | Cat. | Object Class | Property | Representation/ Association | Type | Type Name | Len. | Card. | Remarks |
|---|---|---|---|---|---|---|---|---|---|
| Cost Center Type-Code<br>35800BL | | Cost Center<br>35802BL | Type<br>35804BL | Code<br>35806BL | CCT<br>35808BL | Code<br>35810BL | 1..4<br>35812BL | | restricted<br>35814BL |

FIG. 358BL

| GDT | | Cat. | Object Class | Property | Representation / Association | Type | Type Name | Len. | Card. | Remarks |
|---|---|---|---|---|---|---|---|---|---|---|
| Credit Agency Report Type Code 35800BM | | | CreditAgency Report 35802BM | Type 35804BM | Code 35806BM | CCT 35808BM | Code 35810BM | 2 35812BM | | restricted 35814BM |
| | listAgency ID 35816BM | A 35818BM | CodeList Agency 35820BM | Identification 35822BM | Identifier 35824BM | xsd 35826BM | token 35828BM | | 0..1 35830BM | |
| | listVersionID 35832BM | A 35834BM | CodeList 35836BM | Version 35838BM | Identifier 35840BM | xsd 35842BM | token 35844BM | | 0..1 35846BM | |
| | listAgency SchemeID 35848BM | A 35850BM | CodeList Agency 35852BM | Scheme 35854BM | Identifier 35856BM | xsd 35858BM | token 35860BM | | 0..1 35862BM | |
| | listAgency SchemeAgencyID 35864BM | A 35866BM | CodeList Agency 35868BM | SchemeAgency 35870BM | Identifier 35872BM | xsd 35874BM | token 35876BM | | 0..1 35878BM | |

FIG. 358BM

| GDT | | Cat. | Object Class | Property Qualifier | Property | Representation / Association | Type | Type Name | Len. | Card. | Remarks |
|---|---|---|---|---|---|---|---|---|---|---|---|
| Address Usage Type Code 35800BN | | | Address 35802BN | Usage 35804BN | Type 35806BN | Code 35808BN | CCT 35810BN | Code 35812BN | 1..10 35814BN | | Restricted 35815BN |
| | listAgencyID 35816BN | A 35818BN | Code List Agency 35820BN | | Identification 35822BN | Identifier 35824BN | xsd 35826BN | token 35828BN | | 0..1 35830BN | |
| | listVersionID 35832BN | A 35834BN | CodeList 35836BN | | Version 35838BN | Identifier 35840BN | xsd 35842BN | token 35844BN | | 0..1 35846BN | |
| | listAgency-SchemeID 35848BN | A 35850BN | Code List Agency 35852BN | | Scheme 35854BN | Identifier 35856BN | xsd 35858BN | token 35860BN | | 0..1 35862BN | |
| | listAgency-SchemeAgencyID 35864BN | A 35866BN | Code List Agency 35868BN | | Scheme Agency 35870BN | Identifier 35872BN | xsd 35874BN | token 35876BN | | 0..1 35878BN | |

FIG. 358BN

| GDT | Cat. | Object Class | Property | Representation/ Association | Type | Type Name | Len. | Card. | Remarks |
|---|---|---|---|---|---|---|---|---|---|
| Activity Initiator Code 35800BO | | Activity 35802BO | Initiator 35804BO | Code 35806BO | CCT 35808BO | Code 35810BO | 1 35812BO | | restricted 35814BO |

FIG. 358BO

| GDT | | Category | Object Class | Property Term | Representation Term | Type | Data Type | Length | Cardinality | Re. |
|---|---|---|---|---|---|---|---|---|---|---|
| BatchID 35800BP | | Complex Type 35802BP | Batch 35804BP | Identification 35806BP | Identifier 35808BP | CCT 35810BP | Identifier 35812BP | 1..10 35814BP | | |
| | schemeID 35816BP | Attribute 35818BP | Identification Scheme 35820BP | Identification 35822BP | Identifier 35824BP | xsd 35826BP | token 35828BP | | 0..1 35830BP | |
| | Scheme Version ID 35832BP | Attribute 35834BP | Identification Scheme 35836BP | Version 35838BP | Identifier 35840BP | xsd 35842BP | token 35844BP | | 0..1 35846BP | |
| | Scheme AgencyID 35848BP | Attribute 35850BP | Identification Scheme Agency 35852BP | Identification 35854BP | Identifier 35856BP | xsd 35858BP | token 35860BP | | 0..1 35862BP | |
| | Scheme Agency SchemeID 35864BP | Attribute 35866BP | Identification Scheme Agency 35868BP | Scheme 35870BP | Identifier 35872BP | xsd 35874BP | token 35876BP | | 0..1 35878BP | |
| | Scheme Agency Scheme AgencyID 35880BP | Attribute 35882BP | Identification Scheme Agency 35884BP | Scheme Agency 35886BP | Identifier 35888BP | xsd 35890BP | token 35892BP | | 0..1 35894BP | |

FIG. 358BP

| GDT | Cat. | Object Class | Property | Representation/ Association | Type | Type Name | Len. | Card. | Remarks |
|---|---|---|---|---|---|---|---|---|---|
| Bill Of Operations Connection Type Code 35800BQ | | Bill Of Operations Connection 35802BQ | Type 35804BQ | Code 35806BQ | CCT 35808BQ | Code 35810BQ | 1..2 35812BQ | | Restricted 35814BQ |

FIG. 358BQ

| GDT | | Cat. | Object Class | Property | Representation/ Association | Type | Type Name | Len. | Card. | Remarks |
|---|---|---|---|---|---|---|---|---|---|---|
| Bill Of Operations Element ID 35800BR | | | Bill Of Operations Element 35802BR | Identification 35804BR | Identifier 35806BR | CCT 35808BR | Identifier 35810BR | 1..40 35812BR | | Restricted 35814BR |

FIG. 358BR

| GDT | Cat. | Object Class | Property | Representation/ Association | Type | Type Name | Len. | Card. | Remarks |
|---|---|---|---|---|---|---|---|---|---|
| Bill Of Operations Element Type Code<br>35800BS | | BillOf Operations Element<br>35802BS | Type<br>35804BS | Code<br>35806BS | CCT<br>35808BS | Code<br>35810BS | 1..2<br>35812BS | | Restricted<br>35814BS |

FIG. 358BS

| GDT | Cat. | Object Class | Property | Representation/ Association | Type | Type Name | Len. | Card. | Remarks |
|---|---|---|---|---|---|---|---|---|---|
| Bill Of Operations ID<br>35800BT | | BillOf Operations<br>35802BT | Identification<br>35804BT | Identifier<br>35806BT | CCT<br>35808BT | Identifier<br>35810BT | 1..40<br>35812BT | | Restricted<br>35814BT |

FIG. 358BT

| GDT | Cat. | Object Class | Property | Representation/ Association | Type | Type Name | Len. | Card | Remarks |
|---|---|---|---|---|---|---|---|---|---|
| Bill Of Operations Template Type Code 35800BU | | BillOfOperations Template 35802BU | Type 35804BU | Code 35806BU | CCT 35808BU | Code 35810BU | 1..2 35812BU | | Restricted 35814BU |

FIG. 358BU

| GDT | Cat. | Object Class | Property | Representation/ Association | Type | Type Name | Len. | Card. | Remarks |
|---|---|---|---|---|---|---|---|---|---|
| Business Transaction Document Item Schedule Line Type Code 35800BV | | Business Transaction DocumentItem ScheduleLine 35802BV | Type 35804BV | Code 35806BV | CCT 35808BV | Code 35810BV | 1..2 35812BV | | Restricted 35814BV |

FIG. 358BV

| GDT | | Cat. | Object Class | Property | Representation/ Association | Type | Type Name | Len. | Card. | Remarks |
|---|---|---|---|---|---|---|---|---|---|---|
| Chart Of Accounts ID 35800BW | | | ChartOf Accounts 35802BW | Identification 35804BW | Identifier 35806BW | CCT 35808BW | Identifier 35810BW | 1..4 35812BW | | Restricted 35814BW |
| | Scheme AgencyID 35816BW | A 35818BW | Identification Scheme Agency 35820BW | Identification 35822BW | Identifier 35824BW | XSD 35826BW | Token 35828BW | 60 35830BW | 0..1 35832BW | |

FIG. 358BW

| GDT | | Cat. | Object Class | Property | Representation/ Association | Type | Type Name | Len. | Card. | Remarks |
|---|---|---|---|---|---|---|---|---|---|---|
| Logistics Package Type Code 35800BX | | | Logistics Package 35802BX | Type 35804BX | Code 35806BX | CCT 35808BX | Code 35810BX | 1 35812BX | 1 35814BX | Restricted 35816BX |

FIG. 358BX

| GDT | | Cat. | Object Class | Property | Representation/ Association | Type | Type Name | Len. | Card. | Remarks |
|---|---|---|---|---|---|---|---|---|---|---|
| Logistics Branching ID 35800BY | | | Logistics Branching 35802BY | Identification 35804BY | Identifier 35806BY | CCT 35808BY | Identifier 35810BY | 1..40 35812BY | | restricted 35814BY |

FIG. 358BY

| GDT | | Cat. | Object Class | Property | Representation/ Association | Type | Type Name | Len. | Card. | Remarks |
|---|---|---|---|---|---|---|---|---|---|---|
| Logistics Confirmation Method Code<br>35800BZ | | | Logistics Confirmation<br>35802BZ | Method<br>35804BZ | Code<br>35806BZ | CCT<br>35808BZ | Code<br>35810BZ | 1..2<br>35812BZ | | Restricted<br>35814BZ |

FIG. 358BZ

| GDT | | Cat. | Object Class | Property | Representation/ Association | Type | Type Name | Len. | Card. | Rem. |
|---|---|---|---|---|---|---|---|---|---|---|
| Logistic Unit Group ID 35800CA | | E 35801CA | Logistic Unit Group 35802CA | Identification 35803CA | Identifier 35804CA | CCT 35805CA | Identifier 35806CA | 1..40 35807CA | | |
| | scheme ID 35808CA | A 35809CA | Identification Scheme 35810CA | Identification 35811CA | Identifier 35812CA | xsd 35813CA | token 35814CA | 1..60 35815CA | 0..1 35816CA | |
| | scheme Version ID 35817CA | A 35818CA | Identification Scheme 35819CA | Version 35820CA | Identifier 35821CA | xsd 35822CA | token 35823CA | 1..15 35824CA | 0..1 35825CA | |
| | scheme Agency ID 35826CA | A 35827CA | Identification Scheme-Agency 35828CA | Identification 35829CA | Identifier 35830CA | xsd 35831CA | token 35832CA | 1..60 35833CA | 0..1 35834CA | |
| | scheme Agency-Scheme ID 35835CA | A 35836CA | Identification Scheme-Agency 35837CA | Scheme 35838CA | Identifier 35839CA | xsd 35840CA | token 35841CA | 1..60 35842CA | 0..1 35843CA | |
| | scheme Agency-Scheme Agency ID 35844CA | A 35845CA | Identification Scheme-Agency 35846CA | Scheme Agency 35847CA | Identifier 35848CA | xsd 35849CA | token 35850CA | 1..3 35851CA | 0..1 35852CA | |

FIG. 358CA

| GDT | | Cat. | Object Class | Property | Representation/ Association | Type | Type Name | Len. | Card. | Rem. |
|---|---|---|---|---|---|---|---|---|---|---|
| Logistic Unit ID 35800CB | | E 35801CB | Logistic Unit 35802CB | Identification 35803CB | Identifier 35804CB | CCT 35805CB | Identifier 35806CB | 1..40 35807CB | | |
| | scheme ID 35808CB | A 35809CB | Identification Scheme 35810CB | Identification 35811CB | Identifier 35812CB | xsd 35813CB | token 35814CB | 1..60 35815CB | 0..1 35816CB | |
| | scheme Version ID 35817CB | A 35818CB | Identification Scheme 35819CB | Version 35820CB | Identifier 35821CB | xsd 35822CB | token 35823CB | 1..15 35824CB | 0..1 35825CB | |
| | scheme Agency ID 35826CB | A 35827CB | Identification Scheme-Agency 35828CB | Identification 35829CB | Identifier 35830CB | xsd 35831CB | token 35832CB | 1..60 35833CB | 0..1 35834CB | |
| | scheme Agency-Scheme ID 35835CB | A 35836CB | Identification Scheme-Agency 35837CB | Scheme 35838CB | Identifier 35839CB | xsd 35840CB | token 35841CB | 1..60 35842CB | 0..1 35843CB | |
| | scheme Agency-Scheme Agency ID 35844CB | A 35845CB | Identification Scheme-Agency 35846CB | Scheme Agency 35847CB | Identifier 35848CB | xsd 35849CB | token 35850CB | 1..3 35851CB | 0..1 35852CB | |

FIG. 358CB

| GDT | | Cat. | Object Class | Property | Representation/ Association | Type | Type Name | Len. | Card. | Rem. |
|---|---|---|---|---|---|---|---|---|---|---|
| Logistic Unit Shape Code 35800CC | | E 35802CC | Logistic Unit Shape 35804CC | Shape 35806CC | Code 35808CC | CCT 35810CC | Code 35812CC | 1..2 35814CC | | |
| | list Agency ID 35816CC | A 35818CC | Code List Agency 35820CC | Identification 35822CC | Identifier 35824CC | xsd 35826CC | token 35828CC | | 0..1 35830CC | |
| | list Version ID 35832CC | A 35834CC | Code List 35836CC | Version 35838CC | Identifier 35840CC | xsd 35842CC | token 35844CC | | 0..1 35846CC | |
| | list Agency-Scheme ID 35848CC | A 35850CC | Code List Agency 35852CC | Scheme 35854CC | Identifier 35856CC | xsd 35858CC | token 35860CC | | 0..1 35862CC | |
| | list Agency-Scheme Agency ID 35864CC | A 35866CC | Code List Agency 35868CC | Scheme Agency 35870CC | Identifier 35872CC | xsd 35874CC | token 35876CC | | 0..1 35878CC | |

FIG. 358CC

| GDT | | Cat. | Object Class | Property | Representation/ Association | Type | Type Name | Len. | Card. | Rem. |
|---|---|---|---|---|---|---|---|---|---|---|
| Logistic Unit Usage ID 35800CD | | E 35801CD | Logistic Unit Usage 35802CD | Identification 35803CD | Identifier 35804CD | CCT 35805CD | Identifier 35806CD | 1..40 35807CD | | |
| | scheme ID 35808CD | A 35809CD | Identification Scheme 35810CD | Identification 35811CD | Identifier 35812CD | xsd 35813CD | token 35814CD | 1..60 35815CD | 0..1 35816CD | |
| | scheme Version ID 35817CD | A 35818CD | Identification Scheme 35819CD | Version 35820CD | Identifier 35821CD | xsd 35822CD | token 35823CD | 1..15 35824CD | 0..1 35825CD | |
| | scheme Agency ID 35826CD | A 35827CD | Identification Scheme-Agency 35828CD | Identification 35829CD | Identifier 35830CD | xsd 35831CD | token 35832CD | 1..60 35833CD | 0..1 35834CD | |
| | scheme Agency-Scheme ID 35835CD | A 35836CD | Identification Scheme-Agency 35837CD | Scheme 35838CD | Identifier 35839CD | xsd 35840CD | token 35841CD | 1..60 35842CD | 0..1 35843CD | |
| | scheme Agency-Scheme Agency ID 35844CD | A 35845CD | Identification Scheme-Agency 35846CD | Scheme Agency 35847CD | Identifier 35848CD | xsd 35849CD | token 35850CD | 1..3 35851CD | 0..1 35852CD | |

FIG. 358CD

| GDT | | Cat. | Object Class | Property | Representation/ Association | Type | Type Name | Len. | Card. | Remarks |
|---|---|---|---|---|---|---|---|---|---|---|
| Logistics Branching Join ID | | | Logistics Branching Join | Identification | Identifier | CCT | Identifier | 1..40 | | restricted |
| 35800CE | | | 35802CE | 35804CE | 35806CE | 35808CE | 35810CE | 35812CE | | 35814CE |

FIG. 358CE

| GDT | | Cat. | Object Class | Property | Representation/ Association | Type | Type Name | Len. | Card. | Remarks |
|---|---|---|---|---|---|---|---|---|---|---|
| Logistics Branching Path ID | | | Logistics Branching Path | Identification | Identifier | CCT | Identifier | 1..40 | | restricted |
| 35800CF | | | 35802CF | 35804CF | 35806CF | 35808CF | 35810CF | 35812CF | | 35814CF |

FIG. 358CF

| GDT | | Cat. | Object Class | Property | Representation/ Association | Type | Type Name | Len. | Card. | Remarks |
|---|---|---|---|---|---|---|---|---|---|---|
| Logistics Task Folder Registrant Type Code 35800CG | | | Logistics Task Folder Registrant 35802CG | Type 35804CG | Code 35806CG | CCT 35808CG | Code 35810CG | 1..2 35812CG | | Restricted 35814CG |

FIG. 358CG

| GDT | | Cat. | Object Class | Property | Representation/ Association | Type | Type Name | Len. | Card. | Remarks |
|---|---|---|---|---|---|---|---|---|---|---|
| Logistics Task Folder Type Code 35800CH | | | Logistics Task Folder 35802CH | Type 35804CH | Code 35806CH | CCT 35808CH | Code 35810CH | 1..2 35812CH | | Restricted 35814CH |

FIG. 358CH

| GDT | | Cat. | Object Class | Property | Representation/ Association | Type | Type Name | Len. | Card. | Remarks |
|---|---|---|---|---|---|---|---|---|---|---|
| Logistics Task Type Code<br>35800CI | | | Logistics Task<br>35802CI | Type<br>35804CI | Code<br>35806CI | CCT<br>35808CI | Code<br>35810CI | 1..2<br>35812CI | | Restricted<br>35814CI |

FIG. 358CI

| GDT | | Cat. | Object Class | Property | Representation / Association | Type | Type Name | Len. | Card. | Remarks |
|---|---|---|---|---|---|---|---|---|---|---|
| Marital Status Code 35800CJ | | | | Marital Status 35802CJ | Code 35804CJ | CCT 35806CJ | Code 35808CJ | 1 35810CJ | | Restricted 35812CJ |
| | list ID 35814CJ | A 35816CJ | Code List 35818CJ | Identification 35820CJ | Identifier 35822CJ | xsd 35824CJ | token 35826CJ | | 0..1 35828CJ | |
| | list Agency ID 35830CJ | A 35832CJ | Code List Agency 35834CJ | Identification 35836CJ | Identifier 35838CJ | xsd 35840CJ | token 35842CJ | | 0..1 35844CJ | |
| | list Version ID 35846CJ | A 35848CJ | Code List 35850CJ | Version 35852CJ | Identifier 35854CJ | xsd 35856CJ | token 35858CJ | | 0..1 35860CJ | |
| | list Agency-Scheme ID 35862CJ | A 35864CJ | Code List Agency 35866CJ | Scheme 35868CJ | Identifier 35870CJ | xsd 35872CJ | token 35874CJ | | 0..1 35876CJ | |
| | list Agency-Scheme Agency ID 35878CJ | A 35880CJ | Code List Agency 35882CJ | Scheme Agency 35884CJ | Identifier 35886CJ | xsd 35888CJ | token 35890CJ | | 0..1 35892CJ | |

FIG. 358CJ

| GDT | | Cat. | Object Class | Property | Representation/ Association | Type | Type Name | Len. | Card. | Remarks |
|---|---|---|---|---|---|---|---|---|---|---|
| Material Input ID<br>35800CK | | | Material Input<br>35802CK | Identification<br>35804CK | Identifier<br>35806CK | CCT<br>35808CK | Identifier<br>35810CK | 1..6<br>35812CK | | restricted<br>35814CK |

FIG. 358CK

| GDT | | Cat. | Object Class | Property | Representation/ Association | Type | Type Name | Len. | Card. | Remarks |
|---|---|---|---|---|---|---|---|---|---|---|
| Material Output ID<br>35800CL | | | Material Output<br>35802CL | Identification<br>35804CL | Identifier<br>35806CL | CCT<br>35808CL | Identifier<br>35810CL | 1..6<br>35812CL | | restricted<br>35814CL |

FIG. 358CL

| GDT | | Cat. | Object Class | Property | Representation/ Association | Type | Type Name | Len. | Card. | Remarks |
|---|---|---|---|---|---|---|---|---|---|---|
| Material Role Code<br><br>35800CM | | | Material<br><br>35802CM | Role<br><br>35804CM | Code<br><br>35806CM | CCT<br><br>35808CM | Code<br><br>35810CM | 1..2<br><br>35812CM | | Restricted<br><br>35814CM |

FIG. 358CM

| GDT | | Cat. | Object Class | Property | Representation / Association | Type | Type Name | Len. | Card. | Remarks |
|---|---|---|---|---|---|---|---|---|---|---|
| Maternity Protection Delivery Type Code 35800CN | | | Maternity Protection 35801CN | Delivery Type 35802CN | Code 35804CN | CCT 35806CN | Code 35808CN | 1..2 35810CN | | Restricted 35812CN |
| | list ID 35814CN | A 35816CN | Code List 35818CN | Identification 35820CN | Identifier 35822CN | xsd 35824CN | token 35826CN | | 0..1 35828CN | |
| | list Agency ID 35830CN | A 35832CN | Code List Agency 35834CN | Identification 35836CN | Identifier 35838CN | xsd 35840CN | token 35842CN | | 0..1 35844CN | |
| | list Version ID 35846CN | A 35848CN | Code List 35850CN | Version 35852CN | Identifier 35854CN | xsd 35856CN | token 35858CN | | 0..1 35860CN | |
| | list Agency-Scheme ID 35862CN | A 35864CN | Code List Agency 35866CN | Scheme 35868CN | Identifier 35870CN | xsd 35872CN | token 35874CN | | 0..1 35876CN | |
| | list Agency-Scheme Agency ID 35878CN | A 35880CN | Code List Agency 35882CN | Scheme Agency 35884CN | Identifier 35886CN | xsd 35888CN | token 35890CN | | 0..1 35892CN | |

FIG. 358CN

| GDT | | Cat. | Object Class | Property | Representation/ Association | Type | Type Name | Len. | Card. | Remarks |
|---|---|---|---|---|---|---|---|---|---|---|
| Mileage Reimbursement Vehicle Class Code 35800CO | | | Mileage Reimbursement Vehicle 35802CO | Class 35804CO | Code 35806CO | CCT 35808CO | Code 35810CO | 1..2 35812CO | | Restricted 35814CO |

FIG. 358CO

| GDT | | Cat. | Object Class | Property | Representation/ Association | Type | Type Name | Len. | Card. | Remarks |
|---|---|---|---|---|---|---|---|---|---|---|
| Mileage Reimbursement Vehicle Type Code 35800CP | | | Mileage Reimbursement Vehicle 35802CP | Type 35804CP | Code 35806CP | CCT 35808CP | Code 35810CP | 1..2 35812CP | | Restricted 35814CP |

FIG. 358CP

| GDT | | Cat. | Object Class | Property | Representation/ Association | Type | Type Name | Len. | Card. | Rem. |
|---|---|---|---|---|---|---|---|---|---|---|
| Numbering Method Code 35800CQ | | | Numbering 35804CQ | Method 35806CQ | Code 35808CQ | GDT 35810CQ | Code 35812CQ | 1..10 35814CQ | | Restricted 35815CQ |
| | list Agency ID 35816CQ | A 35818CQ | Code List Agency 35820CQ | Identification 35822CQ | Identifier 35824CQ | xsd 35826CQ | token 35828CQ | | 0..1 35830CQ | |
| | list Version ID 35832CQ | A 35834CQ | Code List 35836CQ | Version 35838CQ | Identifier 35840CQ | xsd 35842CQ | token 35844CQ | | 0..1 35846CQ | |
| | list Agency-Scheme ID 35848CQ | A 35850CQ | Code List Agency 35852CQ | Scheme 35854CQ | Identifier 35856CQ | xsd 35858CQ | token 35860CQ | | 0..1 35862CQ | |
| | list Agency-Scheme Agency ID 35864CQ | A 35866CQ | Code List Agency 35868CQ | Scheme Agency 35870CQ | Identifier 35872CQ | xsd 35874CQ | token 35876CQ | | 0..1 35878CQ | |

FIG. 358CQ

| GDT | Cat. | Object Class Qualifier | Object Class | Property | Representation/ Association | Type | Type Name | Len. | Card. | Remarks |
|---|---|---|---|---|---|---|---|---|---|---|
| Number Range Interval Business Partner Group Code<br>35800CR | | Number Range Interval<br>35802CR | Business Partner Group<br>35804CR | | Code<br>35806CR | CCT<br>35808CR | Code<br>35810CR | 1..4<br>35812CR | | restricted<br>35814CR |

FIG. 358CR

| GDT | | Cat. | Object Class | Property | Representation / Association | Type | Type Name | Len. | Card. | Remarks |
|---|---|---|---|---|---|---|---|---|---|---|
| Occupation Code 35800CS | | | | Occupation 35802CS | Code 35804CS | CCT 35806CS | Code 35808CS | 1..4 35810CS | | Restricted 35812CS |
| | list ID 35814CS | A 35816CS | Code List 35818CS | Identification 35820CS | Identifier 35822CS | xsd 35824CS | token 35826CS | | 0..1 35828CS | |
| | list Agency ID 35830CS | A 35832CS | Code List Agency 35834CS | Identification 35836CS | Identifier 35838CS | xsd 35840CS | token 35842CS | | 0..1 35844CS | |
| | list Version ID 35846CS | A 35848CS | Code List 35850CS | Version 35852CS | Identifier 35854CS | xsd 35856CS | token 35858CS | | 0..1 35860CS | |
| | list Agency-Scheme ID 35862CS | A 35864CS | Code List Agency 35866CS | Scheme 35868CS | Identifier 35870CS | xsd 35872CS | token 35874CS | | 0..1 35876CS | |
| | list Agency-Scheme Agency ID 35878CS | A 35880CS | Code List Agency 35882CS | Scheme Agency 35884CS | Identifier 35886CS | xsd 35888CS | token 35890CS | | 0..1 35892CS | |

FIG. 358CS

| GDT | Cat. | Object Class | Property | Representation/ Association | Type | Type Name | Len. | Card. | Remarks |
|---|---|---|---|---|---|---|---|---|---|
| CreditCommitmentTypeCode<br>35800CT | | Credit Commitment<br>35804CT | Type<br>35806CT | Code<br>35808CT | CCT<br>35810CT | Code<br>35812CT | 3<br>35814CT | | |

FIG. 358CT

| GDT | Cat. | Object Class | Property | Representation/ Association | Type | Type Name | Len. | Card. | Remarks |
|---|---|---|---|---|---|---|---|---|---|
| CurrencyUsageCode<br>35800CU | | | Currency Usage<br>35806CU | Code<br>35808CU | CCT<br>35810CU | Code<br>35812CU | 1..3<br>35814CU | | restricted<br>35818CU |

FIG. 358CU

| GDT | Cat. | Object Class | Property | Representation/ Association | Type | Type Name | Len. | Card. | Remarks |
|---|---|---|---|---|---|---|---|---|---|
| CustomerPriceListTypeCode 35800CV | | Customer Price List Type 35804CV | | Code 35808CV | CCT 35810CV | Code 35812CV | 1..2 35814CV | | restricted 35818CV |

FIG. 358CV

| GDT | | Cat. | Object Class | Property Qualifier | Property | Representation / Association | Type | Type Name | Len. | Card. | Remarks |
|---|---|---|---|---|---|---|---|---|---|---|---|
| DataOriginTypeCode 35800CW | | | | Data 35802CW | Origin Type 35803CW | Code 35804CW | CCT 35805CW | Code 35806CW | 1..4 35807CW | | Restricted 35809CW |
| | ListID 35810CW | A 35811CW | CodeList 35812CW | | Identification 35813CW | Identifier 35814CW | XSD 35815CW | Token 35816CW | | 0..1 35818CW | |
| | ListAgencyID 35820CW | A 35821CW | CodeListAgency 35822CW | | Identification 35823CW | Identifier 35824CW | XSD 35825CW | Token 35826CW | | 0..1 35828CW | |
| | ListVersionID 35830CW | A 35831CW | CodeList 35832CW | | Version 35833CW | Identifier 35834CW | XSD 35835CW | Token 35836CW | | 0..1 35838CW | |
| | ListAgency-SchemeID 35840CW | A 35841CW | CodeListAgency 35842CW | | Scheme 35843CW | Identifier 35844CW | XSD 35845CW | Token 35846CW | | 0..1 35848CW | |
| | ListAgency-SchemeAgencyID 35850CW | A 35851CW | CodeListAgency 35852CW | | SchemeAgency 35853CW | Identifier 35854CW | XSD 35855CW | Token 35856CW | | 0..1 35858CW | |

FIG. 358CW

| GDT | Cat. | Object Class | Property | Representation/ Association | Type | Type Name | Len. | Card. | Remarks |
|---|---|---|---|---|---|---|---|---|---|
| DebitCreditCode 35800CX | | Debit Credit 35804CX | | Code 35808CX | CCT 35810CX | Code 35812CX | 1 35814CX | | restricted 35818CX |

FIG. 358CX

| GDT | Cat. | Object Class | Property | Representation/ Association | Type | Type Name | Len. | Card. | Remarks |
|---|---|---|---|---|---|---|---|---|---|
| DisabledPersonCertificate TypeCode 35800CY | | DisabledPerson Certificate 35804CY | Type 35806CY | Code 35808CY | CCT 35810CY | Code 35812CY | 1..2 35814CY | | restricted 35818CY |

FIG. 358CY

| GDT | Cat. | Object Class | Property | Representation/ Association | Type | Type Name | Len. | Card. | Remarks |
|---|---|---|---|---|---|---|---|---|---|
| DisabledPersonStatistic ExceptionReasonCode 35800CZ | | Disabled Person 35804CZ | Statistic Exception Reason 35806CZ | Code 35808CZ | CCT 35810CZ | Code 35812CZ | 1..2 35814CZ | | restricted 35818CZ |

FIG. 358CZ

| GDT | | Cat. | Object Class | | Property | Representation / Association | Type | Type Name | Len. | Card. | Remarks |
|---|---|---|---|---|---|---|---|---|---|---|---|
| DisabledPersonWork CapabilityLimitationCode 35800DA | | | Disabled Person 35801DA | | Work Capability Limitation. 35803DA | Code 35804DA | CCT 35805DA | Code 35806DA | 1..2 35807DA | | restricted 35809DA |
| | listID 35810DA | A 35811DA | CodeList 35812DA | | Identification 35813DA | Identifier 35814DA | xsd 35815DA | token 35816DA | | 0..1 35818DA | |
| | listAgencyID 35820DA | A 35821DA | CodeListAgency 35822DA | | Identification 35823DA | Identifier 35824DA | xsd 35825DA | token 35826DA | | 0..1 35828DA | |
| | listVersionID 35830DA | A 35831DA | CodeList 35832DA | | Version 35833DA | Identifier 35834DA | xsd 35835DA | token 35836DA | | 0..1 35838DA | |
| | listAgency-SchemeID 35840DA | A 35841DA | CodeListAgency 35842DA | | Scheme 35843DA | Identifier 35844DA | xsd 35845DA | token 35846DA | | 0..1 35848DA | |
| | listAgency-SchemeAgencyID 35850DA | A 35851DA | CodeListAgency 35852DA | | SchemeAgency 35853DA | Identifier 35854DA | xsd 35855DA | token 35856DA | | 0..1 35858DA | |

FIG. 358DA

| GDT | Cat. | Object Class | Property | Representation/ Association | Type | Type Name | Len. | Card. | Remarks |
|---|---|---|---|---|---|---|---|---|---|
| DisagioDeductionEventType Code 35800DB | 35802DB | Disagio 35804DB | Deduction Event Type 35806DB | Code 35808DB | CCT 35810DB | Code 35812DB | 1..2 35814DB | 35816DB | restricted 35818DB |

FIG. 358DB

| GDT | Cat. | Object Class | Property | Representation/ Association | Type | Type Name | Len. | Card. | Remarks |
|---|---|---|---|---|---|---|---|---|---|
| DisagioPercent 35800DC | E 35802DC | Disagio 35804DC | | Percent 35808DC | GDT 35810DC | Percent 35812DC | 3.3 35814DC | | restricted 35818DC |

FIG. 358DC

| GDT | | Cat. | Object Class | | Property | Representation / Association | Type | Type Name | Len. | Card. | Remarks |
|---|---|---|---|---|---|---|---|---|---|---|---|
| DistributionChannelCode 35800DD | | | Distribution Channel 35801DD | | | Code 35804DD | CCT 35805DD | Code 35806DD | 1..2 35807DD | | restricted 35809DD |
| | listID 35810DD | A 35811DD | CodeList 35812DD | | Identification 35813DD | Identifier 35814DD | xsd 35815DD | token 35816DD | | 0..1 35818DD | |
| | listAgencyID 35820DD | A 35821DD | CodeListAgency 35822DD | | Identification 35823DD | Identifier 35824DD | xsd 35825DD | token 35826DD | | 0..1 35828DD | |
| | listVersionID 35830DD | A 35831DD | CodeList 35832DD | | Version 35833DD | Identifier 35834DD | xsd 35835DD | token 35836DD | | 0..1 35838DD | |
| | listAgency-SchemeID 35840DD | A 35841DD | CodeListAgency 35842DD | | Scheme 35843DD | Identifier 35844DD | xsd 35845DD | token 35846DD | | 0..1 35848DD | |
| | listAgency-SchemeAgencyID 35850DD | A 35851DD | CodeListAgency 35852DD | | SchemeAgency 35853DD | Identifier 35854DD | xsd 35855DD | token 35856DD | | 0..1 35858DD | |

FIG. 358DD

| GDT | Cat. | Object Class | | Property | Representation / Association | Type | Type Name | Len. | Card. | Remarks |
|---|---|---|---|---|---|---|---|---|---|---|
| DivisionCode 35800DE | | Division 35801DE | | | Code 35804DE | CCT 35805DE | Code 35806DE | 1..2 35807DE | | restricted 35809DE |
| listID 35810DE | A 35811DE | CodeList 35812DE | | Identification 35813DE | Identifier 35814DE | xsd 35815DE | token 35816DE | | 0..1 35818DE | |
| listAgencyID 35820DE | A 35821DE | CodeListAgency 35822DE | | Identification 35823DE | Identifier 35824DE | xsd 35825DE | token 35826DE | | 0..1 35828DE | |
| listVersionID 35830DE | A 35831DE | CodeList 35832DE | | Version 35833DE | Identifier 35834DE | xsd 35835DE | token 35836DE | | 0..1 35838DE | |
| listAgency-SchemeID 35840DE | A 35841DE | CodeListAgency 35842DE | | Scheme 35843DE | Identifier 35844DE | xsd 35845DE | token 35846DE | | 0..1 35848DE | |
| listAgency-SchemeAgencyID 35850DE | A 35851DE | CodeListAgency 35852DE | | SchemeAgency 35853DE | Identifier 35854DE | xsd 35855DE | token 35856DE | | 0..1 35858DE | |

FIG. 358DE

| GDT | Cat. | Object Class | Property | Representation/ Association | Type | Type Name | Len. | Card. | Remarks |
|---|---|---|---|---|---|---|---|---|---|
| DueCategoryCode 35800DF | | Due 35804DF | Category 35806DF | Code 35808DF | CCT 35810DF | Code 35812DF | 1 35814DF | 35816DF | restricted 35818DF |

FIG. 358DF

| GDT | | Cat. | Object Class | | Property | Representation / Association | Type | Type Name | Len. | Card. | Remarks |
|---|---|---|---|---|---|---|---|---|---|---|---|
| DurationValueRecurrence 35800DG | | | DurationValueRecurrence 35801DG | | | Details 35804DG | | | | | |
| | Duration 35810DG | | DurationValueRecurrence 35812DG | | Duration 35813DG | Duration 35814DG | GDT 35815DG | Duration 35816DG | | 1 35818DG | |
| | Value 35820DG | | DurationValueRecurrence 35822DG | | Value 35823DG | Value 35824DG | GDT 35825DG | Integer Value 35826DG | 1..3 35827DG | 1 35828DG | |

FIG. 358DG

| GDT | Cat. | Object Class | Property | Representation/ Association | Type | Type Name | Len. | Card. | Remarks |
|---|---|---|---|---|---|---|---|---|---|
| EffectiveYieldCalculation MethodCode 35800DH | | Effective Yield 35804DH | Calculation Method 35806DH | Code 35808DH | CCT 35810DH | Code 35812DH | 1..2 35814DH | | |

FIG. 358DH

| GDT | Cat. | Object Class | | Property | Representation / Association | Type | Type Name | Len. | Card. | Remarks |
|---|---|---|---|---|---|---|---|---|---|---|
| EmployeeTimeAccountLineItemTypeCode 35800DI | | EmployeeTimeAccountLineItem 35801DI | | Type 35803DI | Code 35804DI | CCT 35805DI | Code 35806DI | 1..6 35807DI | | restricted 35809DI |
| listID 35810DI | A 35811DI | CodeList 35812DI | | Identification 35813DI | Identifier 35814DI | xsd 35815DI | token 35816DI | 1..60 35817DI | 0..1 35818DI | |
| listAgencyID 35820DI | A 35821DI | CodeListAgency 35822DI | | Identification 35823DI | Identifier 35824DI | xsd 35825DI | token 35826DI | 1..60 35827DI | 0..1 35828DI | |
| listVersionID 35830DI | A 35831DI | CodeList 35832DI | | Version 35833DI | Identifier 35834DI | xsd 35835DI | token 35836DI | 1..15 35837DI | 0..1 35838DI | |
| listAgency-SchemeID 35840DI | A 35841DI | CodeListAgency 35842DI | | Scheme 35843DI | Identifier 35844DI | xsd 35845DI | token 35846DI | 1..60 35847DI | 0..1 35848DI | |
| listAgency-SchemeAgencyID 35850DI | A 35851DI | CodeListAgency 35852DI | | SchemeAgency 35853DI | Identifier 35854DI | xsd 35855DI | token 35856DI | 1..3 35857DI | 0..1 35858DI | |

FIG. 358DI

| GDT | Cat. | Object Class | | Property | Representation / Association | Type | Type Name | Len. | Card. | Remarks |
|---|---|---|---|---|---|---|---|---|---|---|
| EmployeeTimeAccount TypeCode 35800DJ | | EmployeeTime Account 35801DJ | | Type 35803DJ | Code 35804DJ | CCT 35805DJ | Code 35806DJ | 1..6 35807DJ | | restricted 35809DJ |
| listID 35810DJ | A 35811DJ | CodeList 35812DJ | | Identification 35813DJ | Identifier 35814DJ | xsd 35815DJ | token 35816DJ | 1..60 35817DJ | 0..1 35818DJ | |
| listAgencyID 35820DJ | A 35821DJ | CodeListAgency 35822DJ | | Identification 35823DJ | Identifier 35824DJ | xsd 35825DJ | token 35826DJ | 1..60 35827DJ | 0..1 35828DJ | |
| listVersionID 35830DJ | A 35831DJ | CodeList 35832DJ | | Version 35833DJ | Identifier 35834DJ | xsd 35835DJ | token 35836DJ | 1..15 35837DJ | 0..1 35838DJ | |
| listAgency-SchemeID 35840DJ | A 35841DJ | CodeListAgency 35842DJ | | Scheme 35843DJ | Identifier 35844DJ | xsd 35845DJ | token 35846DJ | 1..60 35847DJ | 0..1 35848DJ | |
| listAgency-SchemeAgencyID 35850DJ | A 35851DJ | CodeListAgency 35852DJ | | SchemeAgency 35853DJ | Identifier 35854DJ | xsd 35855DJ | token 35856DJ | 1..3 35857DJ | 0..1 35858DJ | |

FIG. 358DJ

| GDT | Cat. | Object Class | Property | Representation/ Association | Type | Type Name | Len. | Card. | Remarks |
|---|---|---|---|---|---|---|---|---|---|
| EnterpriseMealsReimbursement ExpenseReporterGroupCode 35800DK | | | Enterprise_MealsReimburse-ment_ExpenseReporterGroup 35806DK | Code 35808DK | CCT 35810DK | Code 35812DK | 1..2 35814DK | | restricted 35818DK |

FIG. 358DK

| GDT | Cat. | Object Class | Property | Representation/ Association | Type | Type Name | Len. | Card. | Remarks |
|---|---|---|---|---|---|---|---|---|---|
| EnterpriseMileageReimbursement ExpenseReporterGroupCode 35800DL | | | Enterprise_MileageReimburse-ment_ExpenseReporterGroup 35806DL | Code 35808DL | CCT 35810DL | Code 35812DL | 1..2 35814DL | | restricted 35818DL |

FIG. 358DL

| GDT | | Cat. | Object Class | | Property | Representation / Association | Type | Type Name | Len. | Card. | Remarks |
|---|---|---|---|---|---|---|---|---|---|---|---|
| ExpenseClassification FunctionalAreaCode 35800DM | | | | | ExpenseClassification _Functional Area 35803DM | Code 35804DM | CCT 35805DM | Code 35806DM | 1..4 35807DM | | restricted 35809DM |
| | listAgencyID 35810DM | A 35811DM | CodeListAgency 35812DM | | Identification 35813DM | Identifier 35814DM | xsd 35815DM | token 35816DM | | 0..1 35818DM | |
| | listVersionID 35820DM | A 35821DM | CodeList 35822DM | | Version 35823DM | Identifier 35824DM | xsd 35825DM | token 35826DM | | 0..1 35828DM | |
| | listAgency-SchemeID 35830DM | A 35831DM | CodeListAgency 35832DM | | Scheme 35833DM | Identifier 35834DM | xsd 35835DM | token 35836DM | | 0..1 35838DM | |
| | listAgency-SchemeAgencyID 35840DM | A 35841DM | CodeListAgency 35842DM | | SchemeAgency 35843DM | Identifier 35844DM | xsd 35845DM | token 35846DM | | 0..1 35848DM | |

FIG. 358DM

| GDT | Cat. | Object Class | Property | Representation/ Association | Type | Type Name | Len. | Card. | Remarks |
|---|---|---|---|---|---|---|---|---|---|
| ExpenseReportActivityStay TypeCode 35800DN | | ExpenseReport Activity_StayType 35804DN | | Code 35808DN | CCT 35810DN | Code 35812DN | 1..2 35814DN | | restricted 35818DN |

FIG. 358DN

| GDT | Cat. | Object Class | Property | Representation/ Association | Type | Type Name | Len. | Card. | Remarks |
|---|---|---|---|---|---|---|---|---|---|
| ExpenseReportEnterprise StayTypeCode 35800DO | | Expense Report Enterprise_Stay Type 35804DO | | Code 35808DO | CCT 35810DO | Code 35812DO | 1..2 35814DO | | restricted 35818DO |

FIG. 358DO

| GDT | Cat. | Object Class | Property | Representation/ Association | Type | Type Name | Len. | Card. | Remarks |
|---|---|---|---|---|---|---|---|---|---|
| ExpenseReportExpense CategoryCode 35800DP | | ExpenseReport Expense 35804DP | Category 35806DP | Code 35808DP | CCT 35810DP | Code 35812DP | 1 35814DP | | restricted 35818DP |

FIG. 358DP

| GDT | Cat. | Object Class | Property | Representation/ Association | Type | Type Name | Len. | Card. | Remarks |
|---|---|---|---|---|---|---|---|---|---|
| ExpenseReportExpense TypeCode 35800DQ | | ExpenseReport Expense 35804DQ | Type 35806DQ | Code 35808DQ | CCT 35810DQ | Code 35812DQ | 1..4 35814DQ | | restricted 35818DQ |

FIG. 358DQ

| GDT | Cat. | Object Class | Property | Representation/ Association | Type | Type Name | Len. | Card. | Remarks |
|---|---|---|---|---|---|---|---|---|---|
| ExpenseReportID 35800DR | | ExpenseReport 35804DR | Identification 35806DR | Identifier 35808DR | CCT 35810DR | Identifier 35812DR | 1..10 35814DR | | restricted 35818DR |

FIG. 358DR

| GDT | Cat. | Object Class | Property | Representation/ Association | Type | Type Name | Len. | Card. | Remarks |
|---|---|---|---|---|---|---|---|---|---|
| ExpenseReportItinerary SegmentID 35800DS | | ExpenseReport ItinerarySegment 35804DS | Identification 35806DS | Identifier 35808DS | CCT 35810DS | Identifier 35812DS | 1..3 35814DS | | restricted 35818DS |

FIG. 358DS

| GDT | Cat. | Object Class | Property | Representation/ Association | Type | Type Name | Len. | Card. | Remarks |
|---|---|---|---|---|---|---|---|---|---|
| ExpenseReportItinerary SegmentTypeCode 35800DT | | ExpenseReport ItinerarySegment 35804DT | Type 35806DT | Code 35808DT | CCT 35810DT | Code 35812DT | 1..2 35814DT | | restricted 35818DT |

FIG. 358DT

| GDT | Cat. | Object Class | Property | Representation / Association | Type | Type Name | Len. | Card. | Remarks |
|---|---|---|---|---|---|---|---|---|---|
| ExpenseReportMileage CumulationPeriodTypeCode 35800DU | | ExpenseReportMileageCumulationPeriod 35802DU | Type 35803DU | Code 35804DU | CCT 35805DU | Code 35806DU | 1 35807DU | 1 35808DU | restricted 35809DU |
| listAgencyID 35810DU | A 35811DU | CodeListAgency 35812DU | Identification 35813DU | Identifier 35814DU | xsd 35815DU | token 35816DU | | 0..1 35818DU | |
| listVersionID 35820DU | A 35821DU | CodeList 35822DU | Version 35823DU | Identifier 35824DU | xsd 35825DU | token 35826DU | | 0..1 35828DU | |
| listAgency-SchemeID 35830DU | A 35831DU | CodeListAgency 35832DU | Scheme 35833DU | Identifier 35834DU | xsd 35835DU | token 35836DU | | 0..1 35838DU | |
| listAgency-SchemeAgencyID 35840DU | A 35841DU | CodeListAgency 35842DU | SchemeAgency 35843DU | Identifier 35844DU | xsd 35845DU | token 35846DU | | 0..1 35848DU | |

FIG. 358DU

| GDT | Cat. | Object Class | Property | Representation/ Association | Type | Type Name | Len. | Card. | Remarks |
|---|---|---|---|---|---|---|---|---|---|
| ExpenseReportMileageID 35800DV | | ExpenseReport Mileage 35804DV | Identification 35806DV | Identifier 35808DV | CCT 35810DV | Identifier 35812DV | 1..3 35814DV | | restricted 35818DV |

FIG. 358DV

| GDT | Cat. | Object Class | Property | Representation/ Association | Type | Type Name | Len. | Card. | Remarks |
|---|---|---|---|---|---|---|---|---|---|
| ExpenseReportProvision Variant Code 35800DW | | ExpenseReport ProvisionVariant 35804DW | | Code 35808DW | CCT 35810DW | Code 35812DW | 1..4 35814DW | | restricted 35818DW |

FIG. 358DW

| GDT | Cat. | Object Class | Property | Representation/ Association | Type | Type Name | Len. | Card. | Remarks |
|---|---|---|---|---|---|---|---|---|---|
| ExpenseReportReceiptID 35800DX | | ExpenseReport Receipt 35804DX | Identification 35806DX | Identifier 35808DX | CCT 35810DX | Identifier 35812DX | 1..3 35814DX | | restricted 35818DX |

FIG. 358DX

| GDT | Cat. | Object Class | Property | Representation/ Association | Type | Type Name | Len. | Card. | Remarks |
|---|---|---|---|---|---|---|---|---|---|
| ExpenseReportStatutory StayTypeCode 35800DY | | Expense Report 35804DY | Statutory_ Stay Type 35806DY | Code 35808DY | CCT 35810DY | Code 35812DY | 1..2 35814DY | | restricted 35818DY |

FIG. 358DY

| GDT | Cat. | Object Class | Property | Representation/ Association | Type | Type Name | Len. | Card. | Remarks |
|---|---|---|---|---|---|---|---|---|---|
| ExpenseReportTypeCode 35800DZ | | ExpenseReport 35804DZ | Type 35806DZ | Code 35808DZ | CCT 35810DZ | Code 35812DZ | 1..2 35814DZ | | restricted 35818DZ |

FIG. 358DZ

| GDT | Cat. | Object Class | Property | Representation/ Association | Type | Type Name | Len. | Card. | Remarks |
|---|---|---|---|---|---|---|---|---|---|
| ExpenseReporterGroupCode 35800EA | | ExpenseReporter Group 35804EA | | Code 35808EA | CCT 35810EA | Code 35812EA | 1..4 35814EA | | restricted 35818EA |

FIG. 358EA

| GDT | Cat. | Object Class | Property | Representation/ Association | Type | Type Name | Len. | Card. | Remarks |
|---|---|---|---|---|---|---|---|---|---|
| FiscalYearValue 35800EB | | FiscalYear 35804EB | | Value 35808EB | Xsd 35810EB | nonNegative Integer 35812EB | 4 35814EB | | |

FIG. 358EB

| GDT | Cat. | Object Class | | Property | Representation / Association | Type | Type Name | Len. | Card. | Remarks |
|---|---|---|---|---|---|---|---|---|---|---|
| HandlingUnitID 35800EC | | HandlingUnit 35801EC | | Identification 35803EC | Identifier 35804EC | CCT 35805EC | Identifier 35806EC | 1..40 35807EC | | restricted 35809EC |
| SchemeID 35810EC | A 35811EC | Identification Scheme 35812EC | | Identification 35813EC | Identifier 35814EC | xsd 35815EC | token 35816EC | 1..60 35817EC | 0..1 35818EC | |
| SchemeAgencyID 35820EC | A 35821EC | Identification Scheme-Agency 35822EC | | Identification 35823EC | Identifier 35824EC | xsd 35825EC | token 35826EC | 1..60 35827EC | 0..1 35828EC | |
| SchemeAgency SchemeID 35830EC | A 35831EC | Identification Scheme-Agency 35832EC | | Procedure 35833EC | Identifier 35834EC | xsd 35835EC | token 35836EC | 1..60 35837EC | 0..1 35838EC | |
| SchemeAgency SchemeAgencyID 35840EC | A 35841EC | Identification Scheme-Agency 35842EC | | SchemeAgency 35843EC | Identifier 35844EC | xsd 35845EC | token 35846EC | 1..3 35847EC | 0..1 35848EC | |

FIG. 358EC

| GDT | Cat. | Object Class | Property Qualifier | Property | Representation / Association | Type | Type Name | Len. | Card. | Remarks |
|---|---|---|---|---|---|---|---|---|---|---|
| HandlingUnitInternalID 35800ED | | HandlingUnit 35801ED | Internal 35802ED | Identification 35803ED | Identifier 35804ED | GDT 35805ED | Handling UnitID 35806ED | 1..40 35807ED | | restricted 35809ED |
| SchemeID 35810ED | A 35811ED | Identification Scheme 35812ED | | Identification 35813ED | Identifier 35814ED | xsd 35815ED | token 35816ED | 1..60 35817ED | 0..1 35818ED | |
| SchemeAgencyID 35820ED | A 35821ED | Identification Scheme-Agency 35822ED | | Identification 35823ED | Identifier 35824ED | xsd 35825ED | token 35826ED | 1..60 35827ED | 0..1 35828ED | |

FIG. 358ED

| GDT | Cat. | Object Class | Property Qualifier | Property | Representation / Association | Type | Type Name | Len. | Card. | Remarks |
|---|---|---|---|---|---|---|---|---|---|---|
| HandlingUnitStandardIID 35800EE | | HandlingUnit 35801EE | Standard 35802EE | Identification 35803EE | Identifier 35804EE | GDT 35805EE | Handling UnitID 35806EE | 1..40 35807EE | | restricted 35809EE |
| SchemeID 35810EE | A 35811EE | Identification Scheme 35812EE | | Identification 35813EE | Identifier 35814EE | xsd 35815EE | token 35816EE | 1..60 35817EE | 0..1 35818EE | |
| SchemeAgencyID 35820EE | A 35821EE | Identification Scheme-Agency 35822EE | | Identification 35823EE | Identifier 35824EE | xsd 35825EE | token 35826EE | 1..60 35827EE | 0..1 35828EE | |

FIG. 358EE

| GDT | Cat. | Object Class | Property | Representation/ Association | Type | Type Name | Len. | Card. | Remarks |
|---|---|---|---|---|---|---|---|---|---|
| Indicator<br>35800EF | Simple Type<br>35802EF | Indicator<br>35804EF | Type<br>35806EF | | xsd<br>35810EF | Boolean<br>35812EF | | | |

FIG. 358EF

| GDT | Cat. | Object Class | Property | Representation/ Association | Type | Type Name | Len. | Card. | Remarks |
|---|---|---|---|---|---|---|---|---|---|
| IndividualProductGroupID<br>35800EG | | Individual Product Group<br>35804EG | Identification<br>35806EG | Identifier<br>35808EG | CCT<br>35810EG | Identifier<br>35812EG | 1..4<br>35814EG | | restricted<br>35818EG |

FIG. 358EG

| GDT | Cat. | Object Class | | Property | Representation / Association | Type | Type Name | Len. | Card. | Remarks |
|---|---|---|---|---|---|---|---|---|---|---|
| IndustrialSectorCode 35800EH | | | | Industrial Sector 35803EH | Code 35804EH | CCT 35805EH | Code 35806EH | 1..10 35807EH | | restricted 35809EH |
| ListID 35810EH | A 35811EH | CodeList 35812EH | | Identification 35813EH | Identifier 35814EH | XSD 35815EH | Token 35816EH | | 0..1 35818EH | |
| ListAgencyID 35820EH | A 35821EH | CodeListAgency 35822EH | | Identification 35823EH | Identifier 35824EH | XSD 35825EH | Token 35826EH | | 0..1 35828EH | |
| ListVersionID 35830EH | A 35831EH | CodeList 35832EH | | Version 35833EH | Identifier 35834EH | XSD 35835EH | Token 35836EH | | 0..1 35838EH | |
| ListAgency-SchemeID 35840EH | A 35841EH | CodeListAgency 35842EH | | Scheme 35843EH | Identifier 35844EH | XSD 35845EH | Token 35846EH | | 0..1 35848EH | |
| ListAgency-SchemeAgencyID 35850EH | A 35851EH | CodeListAgency 35852EH | | SchemeAgency 35853EH | Identifier 35854EH | XSD 35855EH | Token 35856EH | | 0..1 35858EH | |

FIG. 358EH

| GDT | Cat. | Object Class | Property | Representation / Association | Type | Type Name | Len. | Card. | Remarks |
|---|---|---|---|---|---|---|---|---|---|
| IndustryClassificationSystemCode 35800EI | | | Industry Classification System 35803EI | Code 35804EI | CCT 35805EI | Code 35806EI | 1..4 35807EI | | restricted 35809EI |
| ListID 35810EI | A 35811EI | CodeList 35812EI | Identification 35813EI | Identifier 35814EI | XSD 35815EI | Token 35816EI | | 0..1 35818EI | |
| ListAgencyID 35820EI | A 35821EI | CodeListAgency 35822EI | Identification 35823EI | Identifier 35824EI | XSD 35825EI | Token 35826EI | | 0..1 35828EI | |
| ListVersionID 35830EI | A 35831EI | CodeList 35832EI | Version 35833EI | Identifier 35834EI | XSD 35835EI | Token 35836EI | | 0..1 35838EI | |
| ListAgency-SchemeID 35840EI | A 35841EI | CodeListAgency 35842EI | Scheme 35843EI | Identifier 35844EI | XSD 35845EI | Token 35846EI | | 0..1 35848EI | |
| ListAgency-SchemeAgencyID 35850EI | A 35851EI | CodeListAgency 35852EI | SchemeAgency 35853EI | Identifier 35854EI | XSD 35855EI | Token 35856EI | | 0..1 35858EI | |

FIG. 358EI

| GDT | Cat. | Object Class | Property | Representation/ Association | Type | Type Name | Len. | Card. | Remarks |
|---|---|---|---|---|---|---|---|---|---|
| InspectionResultValuation TypeCode 35800EJ | | Inspection 35804EJ | Result_Valuation Type 35806EJ | Code 35808EJ | CCT 35810EJ | Code 35812EJ | 1 35814EJ | | restricted 35818EJ |

FIG. 358EJ

| GDT | Cat. | Object Class | Property | Representation/ Association | Type | Type Name | Len. | Card. | Remarks |
|---|---|---|---|---|---|---|---|---|---|
| InspectionScopeCode 35800EK | | InspectionScope 35804EK | | Code 35808EK | CCT 35810EK | Code 35812EK | 1 35814EK | | restricted 35818EK |

FIG. 358EK

| GDT | Cat. | Object Class | Property | Representation/ Association | Type | Type Name | Len. | Card. | Remarks |
|---|---|---|---|---|---|---|---|---|---|
| InspectionStageID 35800EL | | InspectionStage 35804EL | Identification 35806EL | Identifier 35808EL | CCT 35810EL | Identifier 35812EL | 1..15 35814EL | | restricted 35818EL |

FIG. 358EL

| GDT | Cat. | Object Class | Property Qualifier | Property | Representation / Association | Type | Type Name | Len. | Card. | Remarks |
|---|---|---|---|---|---|---|---|---|---|---|
| InstallationPointID 35800EM | | Installation Point 35801EM | | Identification 35803EM | Identifier 35804EM | CCT 35805EM | Identifier 35806EM | 1..18 35807EM | | restricted 35809EM |
| schemeID 35810EM | A 35811EM | Identification Scheme 35812EM | | Identification 35813EM | Identifier 35814EM | xsd 35815EM | token 35816EM | 1..60 35817EM | 0..1 35818EM | |
| schemeAgencyID 35820EM | A 35821EM | Identification Scheme-Agency 35822EM | | Identification 35823EM | Identifier 35824EM | xsd 35825EM | token 35826EM | 1..60 35827EM | 0..1 35828EM | |

FIG. 358EM

| GDT | Cat. | Object Class | Property Qualifier | Property | Representation / Association | Type | Type Name | Len. | Card. | Remarks |
|---|---|---|---|---|---|---|---|---|---|---|
| InstalledBaseCategory Code 35800EN | | InstalledBase 35801EN | | Category 35803EN | Code 35804EN | CCT 35805EN | Code 35806EN | 1..2 35807EN | | restricted 35809EN |
| listAgencyID 35810EN | A 35811EN | CodeListAgency 35812EN | | Identification 35813EN | Identifier 35814EN | xsd 35815EN | token 35816EN | | 0..1 35818EN | |
| listVersionID 35820EN | A 35821EN | CodeList 35822EN | | Version 35823EN | Identifier 35824EN | xsd 35825EN | token 35826EN | | 0..1 35828EN | |
| listAgency-SchemeID 35830EN | A 35831EN | CodeListAgency 35832EN | | Scheme 35833EN | Identifier 35834EN | xsd 35835EN | token 35836EN | | 0..1 35838EN | |
| listAgency-SchemeAgencyID 35840EN | A 35841EN | CodeListAgency 35842EN | | SchemeAgency 35843EN | Identifier 35844EN | xsd 35845EN | token 35846EN | | 0..1 35848EN | |

FIG. 358EN

| GDT | Cat. | Object Class | Property Qualifier | Property | Representation / Association | Type | Type Name | Len. | Card. | Remarks |
|---|---|---|---|---|---|---|---|---|---|---|
| InstalledBaseID 35800EO | | Installed Base 35801EO | | Identification 35803EO | Identifier 35804EO | CCT 35805EO | Identifier 35806EO | 1..18 35807EO | | restricted 35809EO |
| schemeID 35810EO | A 35811EO | Identification Scheme 35812EO | | Identification 35813EO | Identifier 35814EO | xsd 35815EO | token 35816EO | 1..60 35817EO | 0..1 35818EO | |
| schemeAgencyID 35820EO | A 35821EO | Identification Scheme-Agency 35822EO | | Identification 35823EO | Identifier 35824EO | xsd 35825EO | token 35826EO | 1..60 35827EO | 0..1 35828EO | |

FIG. 358EO

| GDT | Cat. | Object Class | Property | Representation/ Association | Type | Type Name | Len. | Card. | Remarks |
|---|---|---|---|---|---|---|---|---|---|
| IntegratedProductionProcess ModelID 35800EP | | IntegratedProduction ProcessModel 35804EP | Identification 35806EP | Identifier 35808EP | CCT 35810EP | Identifier 35812EP | 1..40 35814EP | | restricted 35818EP |

FIG. 358EP

| GDT | Cat. | Object Class | Property | Representation/ Association | Type | Type Name | Len. | Card. | Remarks |
|---|---|---|---|---|---|---|---|---|---|
| IntegratedSiteLogistics ProcessModelID 35800EQ | | Integrated Site Logistics Process Model 35804EQ | Identification 35806EQ | Identifier 35808EQ | CCT 35810EQ | Identifier 35812EQ | 1..40 35814EQ | | restricted 35818EQ |

FIG. 358EQ

| GDT | Cat. | Object Class | Property | Representation/ Association | Type | Type Name | Len. | Card. | Remarks |
|---|---|---|---|---|---|---|---|---|---|
| InventoryResponsible OrganisationalUnitTypeCode 35800ER | | Inventory 35804ER | Responsible Organisational Unit Type 35806ER | Code 35808ER | CCT 35810ER | Code 35812ER | 1 35814ER | 1 35816ER | restricted 35818ER |

FIG. 358ER

| GDT | Cat. | Object Class | | Property | Representation / Association | Type | Type Name | Len. | Card. |
|---|---|---|---|---|---|---|---|---|---|
| InventorySeparating Values 35800ES | | Inventory Separating Values 35801ES | | | Details 35804ES | | | | |
| MaterialUUID 35810ES | E 35811ES | Inventory Separating Values 35812ES | | Material 35813ES | Identifier 35814ES | GDT 35815ES | UUID 35816ES | 36 35817ES | 1 35818ES |
| BatchUUID 35820ES | E 35821ES | Inventory Separating Values 35822ES | | Batch 35823ES | Identifier 35824ES | GDT 35825ES | UUID 35826ES | 36 35827ES | 0..1 35828ES |
| OwnerPartyUUID 35830ES | E 35831ES | Inventory Separating Values 35832ES | | Owner Party 35833ES | Identifier 35834ES | GDT 35835ES | UUID 35836ES | 36 35837ES | 1 35838ES |
| SupplyPlanning AreaUUID 35840ES | E 35841ES | Inventory Separating Values 35842ES | | Supply Planning Area 35843ES | Identifier 35844ES | GDT 35845ES | UUID 35846ES | 36 35847ES | 0..1 35848ES |
| InventoryUsability StatusCode 35850ES | E 35851ES | Inventory Separating Values 35852ES | | Inventory Usability Status 35853ES | Code 35854ES | GDTI 35855ES | InventoryUsability StatusCode 35856ES | 1..2 35857ES | 1 35858ES |
| Consignment Indicator 35860ES | E 35861ES | Inventory Separating Values 35862ES | | Consignment 35863ES | Indicator 35864ES | GDT 35865ES | Consignment Indicator 35866ES | | 0..1 35868ES |
| Subcontraction Indicator 35870ES | E 35871ES | Inventory Separating Values 35872ES | | Subcontracting 35873ES | Indicator 35874ES | GDT 35875ES | Subcontracting Indicator 35876ES | | 0..1 35878ES |
| PackagingMaterial TiedIndicator 35880ES | E 35881ES | Inventory Separating Values 35882ES | | Packaging Material Tied 35883ES | Indicator 35884ES | GDT 35885ES | PackagingMaterial TiedIndicator 35886ES | | 0..1 35888ES |

FIG. 358ES

| GDT | | Cat. | Object Class | Property | Representation/ Association | Type | Type Name | Len. | Card. | Remarks |
|---|---|---|---|---|---|---|---|---|---|---|
| Operation Activity ID 35800ET | | | Operation Activity 35802ET | Identification 35804ET | Identifier 35806ET | CCT 35808ET | Identifier 35810ET | 1..40 35812ET | | restricted 35814ET |

FIG. 358ET

| GDT | | Cat. | Object Class | Property | Representation/ Association | Type | Type Name | Len. | Card. | Remarks |
|---|---|---|---|---|---|---|---|---|---|---|
| Operation Activity Step ID 35800EU | | | Operation Activity Step 35802EU | Identification 35804EU | Identifier 35806EU | CCT 35808EU | Identifier 35810EU | 1..40 35812EU | | restricted 35814EU |

FIG. 358EU

| GDT | | Cat. | Object Class | Property | Representation/ Association | Type | Type Name | Len. | Card. | Rem. |
|---|---|---|---|---|---|---|---|---|---|---|
| Operation Activity Type Code 35800EV | | | Operation Activity 35804EV | Type 35806EV | Code 35808EV | CCT 35810EV | Code 35812EV | 1..4 35814EV | | Restricted 35815EV |
| | list Agency ID 35816EV | A 35818EV | Code List Agency 35820EV | Identification 35822EV | Identifier 35824EV | xsd 35826EV | token 35828EV | | 1 35830EV | |
| | list Version ID 35832EV | A 35834EV | Code List 35836EV | Version 35838EV | Identifier 35840EV | xsd 35842EV | token 35844EV | | 1 35846EV | |
| | list Agency-Scheme ID 35848EV | A 35850EV | Code List Agency 35852EV | Scheme 35854EV | Identifier 35856EV | xsd 35858EV | token 35860EV | | 0..1 35862EV | |
| | list Agency-Scheme Agency ID 35864EV | A 35866EV | Code List Agency 35868EV | Scheme Agency 35870EV | Identifier 35872EV | xsd 35874EV | token 35876EV | | 0..1 35878EV | |

FIG. 358EV

| GDT | | Cat. | Object Class | Property | Representation/ Association | Type | Type Name | Len. | Card. | Remarks |
|---|---|---|---|---|---|---|---|---|---|---|
| Operation ID<br>35800EW | | | Operation<br>35802EW | Identification<br>35804EW | Identifier<br>35806EW | CCT<br>35808EW | Identifier<br>35810EW | 1..40<br>35812EW | | restricted<br>35814EW |

FIG. 358EW

| GDT | | Cat. | Object Class | Property | Representation/ Association | Type | Type Name | Len. | Card. | Rem. |
|---|---|---|---|---|---|---|---|---|---|---|
| Operation Type Code 35800EX | | | Operation 35804EX | Type 35806EX | Code 35808EX | CCT 35810EX | Code 35812EX | 1..4 35814EX | | Restricted 35815EX |
| | list Agency ID 35816EX | A 35818EX | Code List Agency 35820EX | Identification 35822EX | Identifier 35824EX | xsd 35826EX | token 35828EX | | 1 35830EX | |
| | list Version ID 35832EX | A 35834EX | Code List 35836EX | Version 35838EX | Identifier 35840EX | xsd 35842EX | token 35844EX | | 1 35846EX | |
| | list Agency-Scheme ID 35848EX | A 35850EX | Code List Agency 35852EX | Scheme 35854EX | Identifier 35856EX | xsd 35858EX | token 35860EX | | 0..1 35862EX | |
| | list Agency-Scheme Agency ID 35864EX | A 35866EX | Code List Agency 35868EX | Scheme Agency 35870EX | Identifier 35872EX | xsd 35874EX | token 35876EX | | 0..1 35878EX | |

FIG. 358EX

| GDT | | Cat. | Object Class | Property | Representation/ Association | Type | Type Name | Len. | Card. | Remarks |
|---|---|---|---|---|---|---|---|---|---|---|
| Organisational Centre Business Character Code<br>35800EY | | | Organisational Centre<br>35802EY | Business Character<br>35804EY | Code<br>35806EY | CCT<br>35808EY | Code<br>35810EY | 1..2<br>35812EY | | restricted<br>35814EY |

FIG. 358EY

| GDT | | Cat. | Object Class | Property | Representation/ Association | Type | Type Name | Len. | Card. | Remarks |
|---|---|---|---|---|---|---|---|---|---|---|
| Organisational Centre Hierarchy Type Code<br>35800EZ | | | Organisational Centre<br>35802EZ | Hierarchy Type<br>35804EZ | Code<br>35806EZ | CCT<br>35808EZ | Code<br>35810EZ | 1..4<br>35812EZ | | restricted<br>35814EZ |

FIG. 358EZ

| GDT | | Cat. | Object Class | Property | Representation/ Association | Type | Type Name | Len. | Card. | Remarks |
|---|---|---|---|---|---|---|---|---|---|---|
| Organisational Centre ID 35800FA | | | Organisational Centre 35802FA | Identification 35804FA | Identifier 35806FA | CCT 35808FA | Identifier 35810FA | 1..20 35812FA | | restricted 35814FA |

FIG. 358FA

| GDT | | Cat. | Object Class | Property | Representation/ Association | Type | Type Name | Len. | Card. | Remarks |
|---|---|---|---|---|---|---|---|---|---|---|
| Organisational Centre Type Code 35800FB | | | Organisational Centre 35802FB | Type 35804FB | Code 35806FB | CCT 35808FB | Code 35810FB | 1..4 35812FB | | restricted 35814FB |

FIG. 358FB

| GDT | | Cat. | Object Class | Property | Representation/ Association | Type | Type Name | Len. | Card. | Remarks |
|---|---|---|---|---|---|---|---|---|---|---|
| Packing Bill Of Material ID 35800FC | | | Packing Bill Of Material 35802FC | Identification 35804FC | Identifier 35806FC | CCT 35808FC | Identifier 35810FC | 1..20 35812FC | | Restricted 35814FC |
| | scheme Agency ID 35816FC | A 35818FC | Identification Scheme Agency 35820FC | Identification 35822FC | Identifier 35824FC | xsd 35826FC | token 35828FC | 1..60 35830FC | 0..1 35832FC | |

FIG. 358FC

| GDT | | Cat. | Object Class | Property | Representation/ Association | Type | Type Name | Len. | Card. | Remarks |
|---|---|---|---|---|---|---|---|---|---|---|
| Packing Bill Of Material Item ID 35800FD | | | Packing Bill Of Material Item 35802FD | Identification 35804FD | Identifier 35806FD | CCT 35808FD | Identifier 35810FD | 1..8 35812FD | | restricted 35814FD |

FIG. 358FD

| GDT | | Cat. | Object Class | Property | Representation/ Association | Type | Type Name | Len. | Card. | Remarks |
|---|---|---|---|---|---|---|---|---|---|---|
| Partial Delivery Control Code<br>35800FE | | | Partial Delivery<br>35802FE | Control<br>35804FE | Code<br>35806FE | CCT<br>35808FE | Code<br>35810FE | 1..2<br>35812FE | | Restricted<br>35814FE |

FIG. 358FE

| GDT | | Cat. | Object Class | Property | Representation/ Association | Type | Type Name | Len. | Card. | Remarks |
|---|---|---|---|---|---|---|---|---|---|---|
| Payment Advice Type Code<br>35800FF | | | Payment Advice<br>35802FF | Type<br>35804FF | Code<br>35806FF | CCT<br>35808FF | Code<br>35810FF | 1..2<br>35812FF | | Restricted<br>35814FF |

FIG. 358FF

| GDT | | Cat. | Object Class | Property | Representation/ Association | Type | Type Name | Len. | Card. | Rem. |
|---|---|---|---|---|---|---|---|---|---|---|
| Payment Block 35800FG | | | Payment Block 35802FG | | Details 35804FG | GDT 35806FG | | | | |
| | Blocking Reason Code 35808FG | E 35810FG | Payment Block 35812FG | Blocking Reason Code 35814FG | Code 35816FG | GDT 35818FG | Blocking Reason Code 35820FG | | 0..1 35822CB | |
| | Expiration Date Time 35824FG | E 35826FG | Payment Block 35828FG | Expiration Date Time 35830FG | DateTime 35832FG | GDT 35834FG | Date Time 35836FG | | 1 35838CB | |
| | Creation User Account ID 35840FG | E 35842FG | Payment Block 35844FG | Creation User Account Identification 35846FG | Identifier 35848FG | GDT 35850FG | User Account ID 35852FG | | 0..1 35854CB | |
| | Creation Date Time 35856FG | E 35858FG | Payment Block 35860FG | Creation Date Time 35862FG | DateTime 35864FG | GDT 35866FG | Date Time 35868FG | | 0..1 35870CB | |

FIG. 358FG

| GDT | | Cat. | Object Class | Property | Representation/ Association | Type | Type Name | Len. | Card. | Remarks |
|---|---|---|---|---|---|---|---|---|---|---|
| Payment Card Category Code<br>35800FH | | | Payment Card<br>35802FH | Category<br>35804FH | Code<br>35806FH | CCT<br>35808FH | Code<br>35810FH | 1..2<br>35812FH | | Restricted<br>35814FH |

FIG. 358FH

| GDT | | Cat. | Object Class | Property | Representation/ Association | Type | Type Name | Len. | Card. | Remarks |
|---|---|---|---|---|---|---|---|---|---|---|
| Payment Card Type Code<br>35800FI | | | Payment Card<br>35802FI | Payment Card Type<br>35804FI | Code<br>35806FI | CCT<br>35808FI | Code<br>35810FI | 1..4<br>35812FI | | Restricted<br>35814FI |

FIG. 358FI

| GDT | | Cat. | Object Class | Property | Representation/ Association | Type | Type Name | Len. | Card. | Remarks |
|---|---|---|---|---|---|---|---|---|---|---|
| Payment Difference Reason Code 35800FJ | | | Payment Difference 35802FJ | Reason 35804FJ | Code 35806FJ | CCT 35808FJ | Code 35810FJ | 1..3 35812FJ | | Restricted 35814FJ |

FIG. 358FJ

| GDT | | Cat. | Object Class | Prop. | Representation/ Association | Type | Type Name | Len. | Card. | Rem. |
|---|---|---|---|---|---|---|---|---|---|---|
| Payment Instruction 35800FJ | | | | | Details 35802FJ | | | | | |
| | ID 35804FJ | | | | Identifier 35806FJ | CCT 35808FJ | Identifier 35810FJ | 1 35812FJ | 1 35814FJ | |
| | Code 35816FJ | | | | Code 35818FJ | GDT 35820FJ | Payment Instruction Code 35822FJ | | 1 35824FJ | |
| | Code Description 35826FJ | | | | Text 35828FJ | GDT 35830FJ | Description 35832FJ | | 0..1 35834FJ | |
| | Note 35836FJ | | | | Text 35838FJ | GDT 35840FJ | Note 35842FJ | | 0..1 35844FJ | |

FIG. 358FK

| GDT | | Cat. | Object Class | Property | Representation / Association | Type | Type Name | Len. | Card. | Remarks |
|---|---|---|---|---|---|---|---|---|---|---|
| Payment Instruction Code 35800FL | | | Payment Instruction 35802FL | | Code 35804FL | CCT 35806FL | Code 35808FL | 1..10 35810FL | | Restricted 35812FL |
| | list ID 35814FL | A 35816FL | Code List 35818FL | Identification 35820FL | Identifier 35822FL | xsd 35824FL | token 35826FL | 1..60 35827FL | optional 35828FL | |
| | list Agency ID 35830FL | A 35832FL | Code List Agency 35834FL | Identification 35836FL | Identifier 35838FL | xsd 35840FL | token 35842FL | 1..60 35843FL | optional 35844FL | |
| | list Agency-Scheme Agency ID 35846FL | A 35848FL | Code List Agency 35850FL | Scheme Agency 35852FL | Identifier 35854FL | xsd 35856FL | token 35858FL | 1..3 35859FL | optional 35860FL | |

FIG. 358FL

| GDT | Cat. | Object Class | Property | Representation/ Association | Type | Type Name | Len. | Card. | Remarks |
|---|---|---|---|---|---|---|---|---|---|
| Inventory Valuation Procedure Code<br>35800FM | | Inventory Valuation Procedure<br>35802FM | | Code<br>35804FM | CCT<br>35806FM | Code<br>35808FM | 1..3<br>35810FM | | |

FIG. 358FM

| GDT | | Cat. | Object Class | Property | Representation / Association | Type | Type Name | Len. | Card. | Remarks |
|---|---|---|---|---|---|---|---|---|---|---|
| Legal Entity Type Code 35800FN | | | | Legal Entity Type 35802FN | Code 35804FN | CCT 35806FN | Code 35808FN | 1..2 35810FN | | Restricted 35812FN |
| | list ID 35814FN | A 35816FN | Code List 35818FN | Identification 35820FN | Identifier 35822FN | xsd 35824FN | token 35826FN | | 0..1 35828FN | |
| | list Agency ID 35830FN | A 35832FN | Code List Agency 35834FN | Identification 35836FN | Identifier 35838FN | xsd 35840FN | token 35842FN | | 0..1 35844FN | |
| | list Version ID 35846FN | A 35848FN | Code List 35850FN | Version 35852FN | Identifier 35854FN | xsd 35856FN | token 35858FN | | 0..1 35860FN | |
| | list Agency-Scheme ID 35862FN | A 35864FN | Code List Agency 35866FN | Scheme 35868FN | Identifier 35870FN | xsd 35872FN | token 35874FN | | 0..1 35876FN | |
| | list Agency-Scheme Agency ID 35878FN | A 35880FN | Code List Agency 35882FN | Scheme Agency 35884FN | Identifier 35886FN | xsd 35888FN | token 35890FN | | 0..1 35892FN | |

FIG. 358FN

| GDT | | Cat. | Object Class | Property | Representation/ Association | Type | Type Name | Len. | Card. | Rem. |
|---|---|---|---|---|---|---|---|---|---|---|
| Loan Amortizement Condition 35800FO | | | Loan Amortizement Condition 35801FO | Details 35802FO | | | | | | |
| | Calculation Date Recurrence 35803FO | E 35804FO | Loan Amortizement Condition 35805FO | Calculation Date 35806FO | Recurrence 35807FO | GDT 35808FO | Period Duration Day Recurrence 35809FO | | 0..1 35810FO | |
| | Due Date Recurrence 35811FO | E 35812FO | Loan Amortizement Condition 35813FO | Due Date 35814FO | Recurrence 35815FO | GDT 35816FO | Period Duration Day Recurrence 35817FO | | 0..1 35818FO | |
| | Total Amorizement Indicator 35819FO | E 35820FO | Loan Amortizement Condition 35821FO | Total Amorizement 35822FO | Indicator 35823FO | GDT 35824FO | Total Amorizement Indicator 35825FO | | 0..1 35826FO | |
| | Annuity Rate Percent 35827FO | E 35828FO | Loan Amortizement Condition 35829FO | Annuity Rate 35830FO | Percent 35831FO | GDT 35832FO | Percent 35833FO | | 0..1 35834FO | |
| | Annuity Rate Amount 35835FO | E 35836FO | Loan Amortizement Condition 35837FO | Annuity Rate 35838FO | Amount 35839FO | GDT 35840FO | Amount 35841FO | | 0..1 35842FO | |
| | Installment Rate Percent 35843FO | E 35844FO | Loan Amortizement Condition 35845FO | Installment Rate 35846FO | Percent 35847FO | GDT 35848FO | Percent 35849FO | | 0..1 35850FO | |
| | Installment Rate Amount 35851FO | E 35852FO | Loan Amortizement Condition 35853FO | Installment Rate 35854FO | Amount 35855FO | GDT 35856FO | Amount 35857FO | | 0..1 35858FO | |

FIG. 358FO

| GDT | | Cat. | Object Class | Property | Representation/ Association | Type | Type Name | Len. | Card. | Remarks |
|---|---|---|---|---|---|---|---|---|---|---|
| Loan Fee Condition 35800FP | | | | | Details 35802FP | | | | | |
| | Loan Fee Type Code 35804FP | A 35806FP | Loan Fee Condition 35808FP | Loan Fee Type 35810FP | Code 35812FP | GDT 35814FP | Loan Fee Type Code 35816FP | | 1 35818FP | |
| | Calculation Date Recurrence 35820FP | E 35822FP | Loan Fee Condition 35824FP | Calculation 35826FP | Recurrence 358028FP | GDT 35830FP | Period Duration Day Recurrence 35832FP | | 1 35834FP | |
| | Due Date Recurrence 35836FP | E 35838FP | Loan Fee Condition 35840FP | Due Date 35842FP | Recurrence 35844FP | GDT 35846FP | Period Duration Day Recurrence 35848FP | | 0..1 35850FP | |
| | Rate Percent 35852FP | E 35854FP | Loan Fee Condition 35856FP | Rate 35858FP | Percent 35860FP | GDT 35862FP | Percent 35864FP | | 0..1 35866FP | |
| | Rate Amount 35868FP | E 35870FP | Loan Fee Condition 35872FP | Rate 35874FP | Amount 35876FP | GDT 35878FP | Amount 35880FP | | 0..1 35882FP | |

FIG. 358FP

| GDT | | Cat. | Object Class | Property | Representation/ Association | Type | Type Name | Len. | Card. | Remarks |
|---|---|---|---|---|---|---|---|---|---|---|
| Loan Fee Type Code<br>35800FQ | | | Loan Fee<br>35802FQ | Type<br>35804FQ | Code<br>35806FQ | CCT<br>35808FQ | Code<br>35810FQ | 1..10<br>35812FQ | | restricted<br>35814FQ |

FIG. 358FQ

| GDT | | Cat. | Object Class | Property | Representation/ Association | Type | Type Name | Len. | Card. | Rem. |
|---|---|---|---|---|---|---|---|---|---|---|
| Loan Interest Condition 35800FR | | | Loan Interest Condition 35802FR | Details 35804FR | | | | | | |
| | Calculation Date Recurrence 35806FR | E 35808FR | Loan Interest Condition 35810FR | Calculation Date 35812FR | Recurrence 35814R | GDT 35816FR | Period Duration Day Recurrence 35818FR | | 1 35820FR | |
| | Due Date Recurrence 35822FR | E 35824FR | Loan Interest Condition 35826FR | Due Date 35828FR | Recurrence 35830FR | GDT 35832FR | Period Duration Day Recurrence 35834FR | | 0..1 35836FR | |
| | Fixed Interest Rate Percent 35838FR | E 35840FR | Loan Interest Condition 35842FR | Fixed Interest Rate 35844FR | Percent 35846FR | GDT 35848FR | Percent 35850FR | | 0..1 35852FR | |
| | Variable Interest Rate 35854FR | E 35856FR | Loan Interest Condition 35858FR | Variable Interest Rate 35860FR | Variable Interest Rate 35862FR | GDT 35864FR | Variable Interest Rate 35866FR | | 0..1 35868FR | |

FIG. 358FR

| GDT | | Cat. | Object Class | Property | Representation/ Association | Type | Type Name | Len. | Card. | Remarks |
|---|---|---|---|---|---|---|---|---|---|---|
| Loan Key FigureType Code 35800FS | | | Loan Key Figure 35802FS | Type 35804FS | Code 35806FS | CCT 35808FS | Code 35810FS | 1..2 35812FS | | restricted 35814FS |

FIG. 358FS

| GDT | | Cat. | Object Class | Property | Representation/ Association | Type | Type Name | Len. | Card. | Remarks |
|---|---|---|---|---|---|---|---|---|---|---|
| Loan Payment Plan Item 35800FT | | | | Loan Payment Plan Item 35801FT | Details 35802FT | | | | | |
| | Payment Date 35803FT | E 35804FT | Loan Payment Plan Item 35805FT | Payment 35806FT | Date 35807FT | GDT 35808FT | Date 35809FT | | 1 35810FT | |
| | Installment Amount 35811FT | E 35812FT | Loan Payment Plan Item 35813FT | Installment 35814FT | Amount 35815FT | GDT 35816FT | Amount 35817FT | | 0..1 35818FT | |
| | Interest Amount 35819FT | E 35820FT | Loan Payment Plan Item 35821FT | Interest 35822FT | Amount 35823FT | GDT 35824FT | Amount 35825FT | | 0..1 35826FT | |
| | Repayment Amount 35827FT | E 35828FT | Loan Payment Plan Item 35829FT | Repayment 35830FT | Amount 35831FT | GDT 35832FT | Amount 35833FT | | 0..1 35834FT | |
| | Fee Amount 35835FT | E 35836FT | Loan Payment Plan Item 35837FT | Fee 35838FT | Amount 35839FT | GDT 35840FT | Amount 35841FT | | 0..1 35842FT | |
| | Balance Amount 35843FT | E 35844FT | Loan Payment Plan Item 35845FT | Balance 35846FT | Amount 35847FT | GDT 35848FT | Amount 35849FT | | 1 35850FT | |

FIG. 358FT

| GDT | | Cat. | Object Class | Property | Representation/ Association | Type | Type Name | Len. | Card. | Remarks |
|---|---|---|---|---|---|---|---|---|---|---|
| Loan Purpose Code<br>35800FU | | | Loan<br>35802FU | Purpose<br>35804FU | Code<br>35806FU | CCT<br>35808FU | Code<br>35810FU | 1..2<br>35812FU | | restricted<br>35814FU |

FIG. 358FU

| GDT | | Cat. | Object Class | Property | Representation/ Association | Type | Type Name | Len. | Card. | Remarks |
|---|---|---|---|---|---|---|---|---|---|---|
| Payment Procedure Code 35800FV | | | Payment 35802FV | Procedure 35804FV | Code 35806FV | CCT 35808FV | Code 35810FV | 1..5 35812FV | | Restricted 35814FV |

FIG. 358FV

| GDT | | Cat. | Object Class | Property | Representation/ Association | Type | Type Name | Len. | Card. | Remarks |
|---|---|---|---|---|---|---|---|---|---|---|
| Payment Transaction Reference ID 35800FW | | | Payment Transaction 35802FW | Reference 35804FW | Identifier 35806FW | CCT 35808FW | Identifier 35810FW | 1..35 35812FW | | |

FIG. 358FW

| GDT | | Cat. | Object Class | Property | Representation / Association | Type | Type Name | Len. | Card. | Remarks |
|---|---|---|---|---|---|---|---|---|---|---|
| Payment Transaction Type Code 35800FX | | | Payment Transaction 35802FX | Type 35803FX | Code 35804FX | CCT 35806FX | Code 35808FX | 1..4 35810FX | | Restricted 35812FX |
| | list Agency ID 35814FX | A 35816FX | Code List Agency 35818FX | Identification 35820FX | Identifier 35822FX | xsd 35824FX | token 35826FX | 1..60 35827FX | optional 35828FX | |
| | list Agency-Scheme Agency ID 35830FX | A 35832FX | Code List Agency 35834FX | Scheme Agency Identification 35836FX | Identifier 35838FX | xsd 35840FX | token 35842FX | 1..3 35843FX | optional 35844FX | |

FIG. 358FX

| GDT | | Cat. | Object Class | Property | Representation/ Association | Type | Type Name | Len. | Card. | Rem. |
|---|---|---|---|---|---|---|---|---|---|---|
| Period Duration Day Recurrence 35800FY | | | Period Duration Day Recurrence 35802FY | | Details 35804FY | | | | | |
| | Period 35806FY | E 35808FY | Period Duration Day Recurrence 35810FY | Period 35812FY | Date Period 35814FY | GDT 35816FY | Date Period 35818FY | | 1 35820FY | |
| | Interior Duration 35822FY | E 35824FY | Period Duration Day Recurrence 35826FY | Interior 35828FY | Duration 35830FY | GDT 35832FY | Duration 35834FY | | 1 35836FY | |
| | Offset Duration 35838FY | E 35840FY | Period Duration Day Recurrence 35842FY | Offset 35844FY | Duration 35846FY | GDT 35848FY | Duration 35850FY | | 0..1 35852FY | |
| | Month Day Value 35854FY | E 35856FY | Period Duration Day Recurrence 35858FY | Month Day 35860FY | Value 35862FY | GDT 35864FY | Integer Value 35866FY | | 0..1 35868FY | |

FIG. 358FY

| GDT | | Cat. | Object Class | Property | Representation/ Association | Type | Type Name | Len. | Card. | Remarks |
|---|---|---|---|---|---|---|---|---|---|---|
| Person Disability Certificate ID<br><br>35800FZ | | | Person Disability Certificate<br>35802FZ | Identification<br><br>35804FZ | Identifier<br><br>35806FZ | CCT<br><br>35808FZ | Identifier<br><br>35810FZ | 1..20<br><br>35812FZ | | restricted<br><br>35814FZ |

FIG. 358FZ

| GDT | | Cat. | Object Class | Property | Representation/ Association | Type | Type Name | Len. | Card. | Rem. |
|---|---|---|---|---|---|---|---|---|---|---|
| Personnel Event Reason Code 35800GA | | | Personnel Event 35804GA | Reason 35806GA | Code 35808GA | CCT 35810GA | Code 35812GA | 1..4 35814GA | | Restricted 35815GA |
| | list Agency ID 35816GA | A 35818GA | Code List Agency 35820GA | Identification 35822GA | Identifier 35824GA | xsd 35826GA | token 35828GA | | 0..1 35830GA | |
| | list Version ID 35832GA | A 35834GA | Code List 35836GA | Version 35838GA | Identifier 35840GA | xsd 35842GA | token 35844GA | | 0..1 35846GA | |
| | list Agency-Scheme ID 35848GA | A 35850GA | Code List Agency 35852GA | Scheme 35854GA | Identifier 35856GA | xsd 35858GA | token 35860GA | | 0..1 35862GA | |
| | list Agency-Scheme Agency ID 35864GA | A 35866GA | Code List Agency 35868GA | Scheme Agency 35870GA | Identifier 35872GA | xsd 35874GA | token 35876GA | | 0..1 35878GA | |

FIG. 358GA

| GDT | Cat. | Object Class | Property | Representation/ Association | Type | Type Name | Len. | Card. | Remarks |
|---|---|---|---|---|---|---|---|---|---|
| StockLevelControl RequirementTypeCode 35800GB | | Stock Level Control Requirement 35804GB | Type 35806GB | Code 35808GB | CCT 35810GB | Code 35812GB | 1 35814GB | | restricted 35818GB |

FIG. 358GB

| GDT | Cat. | Object Class | Property | Representation/ Association | Type | Type Name | Len. | Card. | Remarks |
|---|---|---|---|---|---|---|---|---|---|
| SubledgerAccount GranularityCode 35800GC | | SubledgerAccount Granularity 35804GC | | Code 35808GC | CCT 35810GC | Code 35812GC | 1..3 35814GC | | |

FIG. 358GC

| GDT | Cat. | Object Class | Property Qualifier | Property | Representation / Association | Type | Type Name | Len. | Card. | Remarks |
|---|---|---|---|---|---|---|---|---|---|---|
| WithholdingTax 35800GD | | | | | Details 35804GD | | | | | |
| CountryCode 35810GD | E 35811GD | WithholdingTax 35812GD | | Country 35813GD | Code 35814GD | GDT 35815GD | CountryCode 35816GD | | 0..1 35818GD | |
| TypeCode 35820GD | E 35821GD | WithholdingTax 35822GD | | Type 35823GD | Code 35824GD | GDT 35825GD | TaxTypeCode 35826GD | | 0..1 35828GD | |
| BaseAmount 35830GD | E 35831GD | WithholdingTax 35832GD | | | Amount 35834GD | GDT 35835GD | Amount 35836GD | | 1 35838GD | |
| Percent 35840GD | E 35841GD | WithholdingTax 35842GD | | | Percent 35844GD | GDT 35845GD | Percent 35846GD | | 0..1 35848GD | |
| Amount 35850GD | E 35851GD | WithholdingTax 35852GD | | | Amount 35854GD | GDT 35855GD | Amount 35856GD | | 0..1 35858GD | |

FIG. 358GD

| GDT | Cat. | Object Class | Property Qualifier | Property | Representation / Association | Type | Type Name | Len. | Card. | Remarks |
|---|---|---|---|---|---|---|---|---|---|---|
| TaxTypeCode 35800GE | | Tax 35801GE | | Type Code 35803GE | Code 35804GE | CCT 35805GE | Code 35806GE | 3 35807GE | | restricted 35809GE |
| listID 35810GE | A 35811GE | CodeList 35812GE | | Identification 35813GE | Identifier 35814GE | xsd 35815GE | token 35816GE | 1..40 35817GE | 1 35818GE | |
| listAgencyID 35820GE | A 35821GE | CodeListAgency 35822GE | | Identification 35823GE | Identifier 35824GE | xsd 35825GE | token 35826GE | 1..3 35827GE | 0..1 35828GE | |

FIG. 358GE

| GDT | Cat. | Object Class | Property | Representation/ Association | Type | Type Name | Len. | Card. | Remarks |
|---|---|---|---|---|---|---|---|---|---|
| TransshipmentMethodCode 35800GF | | Transshipment Method 35804GF | | Code 35808GF | CCT 35810GF | Code 35812GF | 1.2 35814GF | | |

FIG. 358GF

| GDT | | Cat. | Object Class | | Property | Representation / Association | Type | Type Name | Len. | Card. | Remarks |
|---|---|---|---|---|---|---|---|---|---|---|---|
| TaxRateTypeCode 35800GG | | | Tax Rate 35801GG | | Type 35803GG | Code 35804GG | CCT 35805GG | Code 35806GG | 5 35807GG | | restricted 35809GG |
| | listID 35810GG | A 35811GG | CodeList 35812GG | | Identification 35813GG | Identifier 35814GG | xsd 35815GG | token 35816GG | 1..40 35817GG | 1 35818GG | |
| | listAgencyID 35820GG | A 35821GG | CodeListAgency 35822GG | | Identification 35823GG | Identifier 35824GG | xsd 35825GG | token 35826GG | 1..3 35827GG | 0..1 35828GG | |

FIG. 358GG

| GDT | Cat. | Object Class | Property | Representation/ Association | Type | Type Name | Len. | Card. | Remarks |
|---|---|---|---|---|---|---|---|---|---|
| TripServiceProviderCode 35800GH | | TripServiceProvider 35804GH | | Code 35808GH | CCT 35810GH | Code 35812GH | 1..2 35814GH | | restricted 35818GH |

FIG. 358GH

| GDT | Cat. | Object Class | | Property | Representation / Association | Type | Type Name | Len. | Card. | Remarks |
|---|---|---|---|---|---|---|---|---|---|---|
| Text 35800GI | complex Type 35801GI | Text 35802GI | | | Content 35804GI | xsd 35805GI | string 35806GI | unlimited 35807GI | | |
| languageCode 35810GI | attribute 35811GI | Text 35812GI | | Language 35813GI | Code 35814GI | xsd 35815GI | language 35816GI | 2..9 35817GI | 0..1 35818GI | Optional 35819GI |

FIG. 358GI

| GDT | Cat. | Object Class | Property Qualifier | Property | Representation/ Association | Type | Type Name | Len. | Card. | Remarks |
|---|---|---|---|---|---|---|---|---|---|---|
| UUID 35800GJ | | | Universally Unique 35804GJ | Identification 35806GJ | Identifier 35808GJ | CCT 35810GJ | Identifier 35812GJ | 36 35814GJ | 35816GJ | restricted 35818GJ |

FIG. 358GJ

| GDT | Cat. | Object Class | Property | Rep./ Assoc. Qual. | Representation / Association | Type | Type Name | Len. | Card. | |
|---|---|---|---|---|---|---|---|---|---|---|
| VariableInterestRate 35800GK | | Variable Interest Rate 35801GK | Details 35802GK | | | | | | | |
| ReferenceInterest CurveCode 35810GK | E 35811GK | Variable Interest Rate 35812GK | Reference Interest Curve 35813GK | | Code 35814GK | GDT 35815GK | ReferenceInterest CurveCode 35816GK | | 1 35818GK | |
| Adjustment Recurrence 35820GK | E 35821GK | Variable Interest Rate 35822GK | Adjustment 35823GK | | Recurrence 35824GK | GDT 35825GK | PeriodDurationDay Recurrence 35826GK | | 0..1 35828GK | |
| BeforeAdjustment DaysValue 35830GK | E 35831GK | Variable Interest Rate 35832GK | Before Adjustment 35833GK | Days 35837GK | Value 35834GK | GDT 35835GK | IntegerValue 35836GK | | 0..1 35838GK | |
| InitialRatePercent 35840GK | E 35841GK | Variable Interest Rate 35842GK | Initial Rate 35843GK | | Percent 35844GK | GDT 35845GK | Percent 35846GK | | 0..1 35848GK | |
| MarginPercent 35850GK | E 35851GK | Variable Interest Rate 35852GK | Margin 35853GK | | Percent 35854GK | GDT 35855GK | Percent 35856GK | | 0..1 35858GK | |
| FluctuationMargin Percent 35860GK | E 35861GK | Variable Interest Rate 35862GK | Fluctuation Margin 35863GK | | Percent 35864GK | GDT 35865GK | Percent 35866GK | | 1 35868GK | |
| CapPercent 35870GK | E 35871GK | Variable Interest Rate 35872GK | Cap 35873GK | | Percent 35874GK | GDT 35875GK | Percent 35876GK | | 0..1 35878GK | |
| FloorPercent 35880GK | E 35881GK | Variable Interest Rate 35882GK | Floor 35883GK | | Percent 35884GK | GDT 35885GK | Percent 35886GK | | 0..1 35888GK | |

FIG. 358GK

| GDT | Cat. | Object Class | Property Qualifier | Property | Representation / Association | Type | Type Name | Len. | Card. | Remarks |
|---|---|---|---|---|---|---|---|---|---|---|
| VIPReasonCode 35800GL | | | | VIP Reason 35803GL | Code 35804GL | CCT 35805GL | Code 35806GL | 1 35807GL | | restricted 35809GL |
| ListID 35810GL | A 35811GL | CodeList 35812GL | | Identification 35813GL | Identifier 35814GL | XSD 35815GL | Token 35816GL | | 0..1 35818GL | |
| ListAgencyID 35820GL | A 35821GL | CodeListAgency 35822GL | | Identification 35823GL | Identifier 35824GL | XSD 35825GL | Token 35826GL | | 0..1 35828GL | |
| ListVersionID 35830GL | A 35831GL | CodeList 35832GL | | Version 35833GL | Identifier 35834GL | XSD 35835GL | Token 35836GL | | 0..1 35838GL | |
| ListAgency-SchemeID 35840GL | A 35841GL | CodeListAgency 35842GL | | Scheme 35843GL | Identifier 35844GL | XSD 35845GL | Token 35846GL | | 0..1 35848GL | |
| ListAgency-SchemeAgencyID 35850GL | A 35851GL | CodeListAgency 35852GL | | SchemeAgency 35853GL | Identifier 35854GL | XSD 35855GL | Token 35856GL | | 0..1 35858GL | |

FIG. 358GL

| GDT | Cat. | Object Class | | Property | Representation / Association | Type | Type Name | Len. | Card. | Remarks |
|---|---|---|---|---|---|---|---|---|---|---|
| WithholdingTaxEvent TypeCode 35800GM | | Withholding Tax Event 35801GM | | Type 35803GM | Code 35804GM | CCT 35805GM | Code 35806GM | 1..3 35807GM | | restricted 35809GM |
| listID 35810GM | A 35811GM | CodeList 35812GM | | Identification 35813GM | Identifier 35814GM | xsd 35815GM | token 35816GM | 1..40 | 1 35818GM | |

FIG. 358GM

| GDT | Cat. | Object Class | Property | Representation/ Association | Type | Type Name | Length | Card. | Remarks |
|---|---|---|---|---|---|---|---|---|---|
| StartendCode 35800GN | | Start End 35802GN | | Code 35804GN | CCT 35806GN | Code 35808GN | 1..2 35810GN | | Restricted 35812GN |

FIG. 358GN

| GDT | | Cat. | Object Class | Property | Representation/ Association | Type | Type Name | Length | Card. | Remarks |
|---|---|---|---|---|---|---|---|---|---|---|
| Personnel Event TypeCode 35800GO | | | Personnel Administration 35802GO | | Code 35804GO | CCT 35806GO | Code 35808GO | 1..4 35810GO | | Restricted 35812GO |
| | List AgencyID 35814GO | A 35816GO | CodeList Agency 35818GO | Identification 35820GO | Identifier 35822GO | xsd 35824GO | token 35826GO | | 0..1 35828GO | |
| | List Ver-sionID 35830GO | A 35832GO | CodeList 35834GO | Version 35836GO | Identifier 35838GO | xsd 35840GO | token 35842GO | | 0..1 35844GO | |
| | List Agency SchemeID 35846GO | A 35848GO | CodeList Agency 35850GO | Scheme 35852GO | Identifier 35854GO | xsd 35856GO | token 35858GO | | 0..1 35860GO | |
| | List Agency Scheme AgencyID 35862GO | A 35864GO | CodeList Agency 35866GO | Scheme Agency 35868GO | Identifier 35870GO | xsd 35872GO | token 35874GO | | 0..1 35876GO | |

FIG. 358GO

| GDT | | Cat. | Object Class | Property | Representation/ Association | Type | Type Name | Length | Card. | Remarks |
|---|---|---|---|---|---|---|---|---|---|---|
| Person Race Ethnicity Code 35800GP | | | Person 35802GP | Race Ethnicity 35804GP | Code 35806GP | CCT 35808GP | Code 35810GP | 1..2 35812GP | | Restricted 35814GP |
| | listID 35816GP | A 35818GP | CodeList 35820GP | Identification 35822GP | Identifier 35824GP | xsd 35826GP | token 35828GP | | 0..1 35830GP | |
| | List AgencyID 35832GP | A 35834GP | CodeListAgency 35836GP | Identification 35838GP | Identifier 35840GP | xsd 35842GP | token 35844GP | | 0..1 35846GP | |
| | List VersionID 35848GP | A 35850GP | CodeList 35852GP | Version 35854GP | Identifier 35856GP | xsd 35858GP | token 35862GP | | 0..1 35864GP | |

FIG. 358GP

| GDT | Cat. | Object Class Qualifier | Object Class | Property Qualifier | Property | Representation/ Association | Type | Type Name | Length | Card. | Remarks |
|---|---|---|---|---|---|---|---|---|---|---|---|
| Priority Value 35800GQ | | | | | Priority 35802GQ | Value 35804GQ | CCT 35806GQ | Numeric 35808GQ | 13.2 35810GQ | | Restricted 35812GQ |

FIG. 358GQ

| GDT | Cat. | Object Class | Property | Representation/ Association | Type | Type Name | Length | Card. | Remarks |
|---|---|---|---|---|---|---|---|---|---|
| Process Branching TypeCode 35800GR | | Process Branching 35802GR | Type 35804GR | Code 35806GR | CCT 35808GR | Code 35810GR | 1..2 35812GR | | Restricted 35814GR |

FIG. 358GR

| GDT | Cat. | Object Class | Property | Representation/ Association | Type | Type Name | Length | Card. | Remarks |
|---|---|---|---|---|---|---|---|---|---|
| RegistrantRoleCode 35800GS | | Registrant 35802GS | Role 35804GS | Code 35806GS | CCT 35808GS | Code 35810GS | 1..2 35812GS | | Restricted 35814GS |

FIG. 358GS

| GDT | Cat. | Object Class | Property | Representation/ Association | Type | Type Name | Len. | Card. | Remarks |
|---|---|---|---|---|---|---|---|---|---|
| ReportingPointID 35800GT | | Reporting Point 35802GT | Identification 35804GT | Identifier 35806GT | CCT 35808GT | Identifier 35810GT | 1..40 35812GT | | Restricted 35814GT |

FIG. 358GT

| GDT | | Cat. | Object Class | Property | Representation/ Association | Type | Type Name | Length | Card. | Remarks |
|---|---|---|---|---|---|---|---|---|---|---|
| SalesCycleCode 35800GU | | | Sales Cycle 35802GU | | Code 35804GU | CCT 35806GU | Code 35808GU | 1...5 35810GU | | |
| | listID 35812GU | A 35814GU | CodeList 35816GU | Identification 35817GU | Identifier 35818GU | xsd 35820GU | token 35822GU | | 0..1 35824GU | At least document 35826GU |
| | listAgencyID 35828GU | A 35830GU | CodeList Agency 35832GU | Identification 35834GU | Identifier 35836GU | xsd 35838GU | token 35840GU | | 0..1 35842GU | At least document 35844GU |
| | listVersionID 35846GU | A 35848GU | CodeList 35850GU | Version 35852GU | Identifier 35854GU | xsd 35856GU | token 35858GU | | 0..1 35860GU | At least document 35862GU |
| | listAgency SchemeID 35864GU | A 35866GU | CodeList Agency 35868GU | Scheme 35870GU | Identifier 35872GU | xsd 35874GU | token 35876GU | | 0..1 35878GU | |
| | listAgency Scheme AgencyID 35880GU | A 35882GU | CodeList Agency 35884GU | Scheme Agency 35886GU | Identifier 35888GU | xsd 35890GU | token 35892GU | | 0..1 35894GU | |

FIG. 358GU

| GDT | | Cat. | Object Class | Property | Representation/ Association | Type | Type Name | Length | Card. | Remarks |
|---|---|---|---|---|---|---|---|---|---|---|
| SalesCycle Phase 35800GV | | | SalesCycle 35802GV | Phase 35804GV | Code 35806GV | CCT 35808GV | Code 35810GV | 1..3 35812GV | | |
| | listID 35814GV | A 35816GV | CodeList 35818GV | Identification 35820GV | Identifier 35822GV | xsd 35824GV | token 35826GV | | 0..1 35830GV | Record at least 35831GV |
| | List AgencyID 35832GV | A 35834GV | CodeList Agency 35836GV | Identification 35838GV | Identifier 35840GV | xsd 35842GV | token 35844GV | | 0..1 35848GV | Record at least 35849GV |
| | List VersionID 35850GV | A 35852GV | CodeList 35854GV | Version 35856GV | Identifier 35858GV | xsd 35860GV | token 35862GV | | 0..1 35866GV | Record at least 35867GV |
| | listAgency SchemeID 35868GV | A 35870GV | CodeList Agency 35872GV | Scheme 35874GV | Identifier 35876GV | xsd 35878GV | token 35880GV | | 0..1 35884GV | |
| | listAgency Scheme AgencyID 35886GV | A 35888GV | CodeList Agency 35890GV | SchemeAgen cy 35892GV | Identifier 35894GV | xsd 35896GV | token 35897GV | | 0..1 35899GV | |

FIG. 358GV

| GDT | | Cat. | Object Class | Property | Representation/ Association | Type | Type Name | Length | Card. | Remarks |
|---|---|---|---|---|---|---|---|---|---|---|
| Salutation Text 35800GW | | | | Salutation 35802GW | Text 35804GW | GDT 35806GW | Text 35808GW | 0..50 35810GW | 1 35812GW | Restricted 35814GW |
| | LanguageCode 35816GW | A 35818GW | | Language 35820GW | Code 35822GW | xsd 35824GW | Language 35826GW | 2..9 35828GW | 0..1 35830GW | Optional 35832GW |

FIG. 358GW

| GDT | Cat. | Object Class | Property | Representation/ Association | Type | Type Name | Length | Card. | Remarks |
|---|---|---|---|---|---|---|---|---|---|
| SampleDrawing TypeCode 35800GX | | Sample Drawing 35802GX | Type 35804GX | Code 35806GX | CCT 35808GX | Code 35810GX | 1 35812GX | | Restricted 35814GX |

FIG. 358GX

| GDT | Cat. | Object Class | Property | Representation/ Association | Type | Type Name | Length | Card. | Remarks |
|---|---|---|---|---|---|---|---|---|---|
| ShiftCalendar Determination RuleCode 35800GY | | Shift Calendar 35802GY | Determination Rule. 35804GY | Code 35806GY | CCT 35808GY | Code 35810GY | 1 35812GY | | Restricted 35814GY |

FIG. 358GY

| GDT | | Cat. | Object Class | Property | Representation/ Association | Type | Type Name | Length | Card. | Remarks |
|---|---|---|---|---|---|---|---|---|---|---|
| Power Of Attorney TypeCode 35800GZ | | | | Power Of Attorney Type 35802GZ | Code 35804GZ | CCT 35806GZ | Code 35808GZ | 1 35810GZ | | Restricted 35812GZ |
| | listID 35814GZ | A 35816GZ | CodeList 35818GZ | Identification 35820GZ | Identifier 35822GZ | xsd 35824GZ | token 35826GZ | | 0..1 35828GZ | |
| | listAgencyID 35830GZ | A 35832GZ | CodeListAgency 35834GZ | Identification 35836GZ | Identifier 35838GZ | xsd 35840GZ | token 35842GZ | | 0..1 35844GZ | |
| | listVersionID 35846GZ | A 35848GZ | CodeList 35850GZ | Version 35852GZ | Identifier 35854GZ | xsd 35856GZ | token 35858GZ | | 0..1 35860GZ | |
| | listAgency-SchemeID 35862GZ | A 35864GZ | CodeListAgency 35866GZ | Scheme 35868GZ | Identifier 35870GZ | xsd 35872GZ | token 35874GZ | | 0..1 35876GZ | |
| | listAgency-SchemeAgency-ID 35878GZ | A 35880GZ | CodeListAgency 35882GZ | SchemeAgency 35884GZ | Identifier 35886GZ | xsd 35888GZ | token 35890GZ | | 0..1 35892GZ | |

FIG. 358GZ

| GDT | Cat. | Object Class | Property | Representation/ Association | Type | Type Name | Length | Card. | Remarks |
|---|---|---|---|---|---|---|---|---|---|
| Price Component Inactivity Reason Code 35800HA | | Price Component 35802HA | Inactivity Reason 35804HA | Code 35806HA | CCT 35808HA | Code 35810HA | 1..2 35812HA | | Restricted 35814HA |

FHA. 358HA

| GDT | | Cat. | Object Class | Property | Representation/ Association | Type | Type Name | Length | Card. | Remarks |
|---|---|---|---|---|---|---|---|---|---|---|
| Price Detail Level Code 35800HB | | | Price 35802HB | Detail Level 35804HB | Code 35806HB | CCT 35808HB | Code 35810HB | 1..2 35812HB | | restricted 35814HB |
| | listVersionID 35816HB | A 35818HB | CodeList 35820HB | Version 35822HB | Identifier 35824HB | xsd 35824HB | token 35826HB | | 0..1 35828HB | |

FHA. 358HB

| GDT | Cat. | Object Class | Property | Representation/ Association | Type | Type Name | Length | Card. | Remarks |
|---|---|---|---|---|---|---|---|---|---|
| Price Specification Base Code 35800HC | | Price Specification 35802HC | Base 35804HC | Code 35806HC | CCT 35808HC | Code 35810HC | 1..2 35812HC | | Restricted 35814HC |

FIG. 358HC

| GDT | | Cat. | Object Class Qualifier | Object Class | Property | Representation/ Association | Type | Type Name | Len. | Card. | Remarks |
|---|---|---|---|---|---|---|---|---|---|---|---|
| Price Specification Customer Group Code 35800HD | | | Price Specification 35802HD | Customer Group 35804HD | | Code 35806HD | CCT 35808HD | Code 35810HD | 1..2 35812HD | | |
| | listID 35814HD | A 35816HD | CodeList 35818HD | | Identification 35820HD | Identifier 35822HD | xsd 35824HD | token 35826HD | | 0..1 35828HD | |
| | listAgencyID 35830HD | A 35832HD | Code-ListAgency 35834HD | | Identification 35836HD | Identifier 35838HD | xsd 35840HD | token 35842HD | | 0..1 35844HD | |
| | listVersionID 35846HD | A 35848HD | CodeList 35850HD | | Version 35852HD | Identifier 35854HD | xsd 35856HD | token 35858HD | | 0..1 35860HD | |
| | listAgency-SchemeID 35862HD | A 35864HD | Code-ListAgency 35866HD | | Scheme 35868HD | Identifier 35870HD | xsd 35872HD | token 35874HD | | 0..1 35876HD | |
| | listAgency-Sche-meAgencyID 35878HD | A 35880HD | Code-ListAgency 35882HD | | Sche-meAgency 35884HD | Identifier 35886HD | xsd 35888HD | token 35890HD | | 0..1 35892HD | |

FIG. 358HD

| GDT | Cat. | Object Class | Property | Representation/ Association | Type | Type Name | Length | Card. | Remarks |
|---|---|---|---|---|---|---|---|---|---|
| Price Specification Element Property ID 35800HE | | PriceSpecification ElementProperty 35802HE | Identification 35804HE | Identifier 35806HE | CCT 35808HE | Identifier 35810HE | 1..30 35812HE | | restricted 35814HE |

FIG. 358HE

| GDT | | Cat. | Object Class | Property | Representation/ Association | Type | Type Name | Len. | Card. | Remarks |
|---|---|---|---|---|---|---|---|---|---|---|
| Price Specification Element Scale Line 35800HF | | | Price Specification Element Scale Line 35802HF | | Details 35804HF | | | | | |
| | Scale AxisStep 35806HF | E 35808HF | Price Specification Element Scale Line 35810HF | ScaleAxisStep 35812HF | ScaleAxisStep 35814HF | GDT 35816HF | ScaleAxisStep 35818HF | | 1..2 35820HF | |
| | Rate 35822HF | E 35824HF | Price Specification Element Scale Line 35826HF | Rate 35828HF | Rate 35830HF | GDT 35832HF | Rate 35834HF | | 0..1 35836HF | |
| | Percent 35838HF | E 35840HF | Price Specification Element Scale Line 35842HF | Percent 35844HF | Percent 35846HF | GDT 35848HF | Percent 35850HF | | 0..1 35852HF | |
| | Fixed Amount 35854HF | E 35856HF | Price Specification Element Scale Line 35858HF | FixedAmount 35860HF | Amount 35862HF | GDT 35864HF | Amount 35866HF | | 0..1 35868HF | |

FIG. 358HF

| GDT | | Cat. | Object Class Qualifier | Object Class | Property | Representation/ Association | Type | Type Name | Length | Card. | Remarks |
|---|---|---|---|---|---|---|---|---|---|---|---|
| Price Specification Product Group Code 35800HG | | | Price Specification 35802HG | Product Group 35804HG | | Code 35806HG | CCT 35808HG | Code 35810HG | 1..2 35812HG | | |
| | listID 35814HG | A 35816HG | | CodeList 35818HG | Identification 35820HG | Identifier 35822HG | xsd 35824HG | token 35826HG | | 0..1 35828HG | |
| | listAgency ID 35830HG | A 35832HG | | CodeList Agency 35834HG | Identification 35836HG | Identifier 35838HG | xsd 35840HG | token 35842HG | | 0..1 35844HG | |
| | listVersion ID 35846HG | A 35848HG | | CodeList 35850HG | Version 35852HG | Identifier 35854HG | xsd 35856HG | token 35858HG | | 0..1 35860HG | |
| | listAgency SchemeID 35862HG | A 35864HG | | CodeList Agency 35866HG | Scheme 35868HG | Identifier 35870HG | xsd 35872HG | token 35874HG | | 0..1 35876HG | |
| | listAgency Scheme AgencyID 35878HG | A 35880HG | | CodeList Agency 35882HG | Scheme Agency 35884HG | Identifier 35886HG | xsd 35888HG | token 35890HG | | 0..1 35892HG | |

FIG. 358HG

| GDT | | Cat. | Object Class | Property | Representation/ Association | Type | Type Name | Length | Card. | Remarks |
|---|---|---|---|---|---|---|---|---|---|---|
| Pricing Procedure Code 35800HH | | | Pricing Procedure 35802HH | | Code 35804HH | CCT 35806HH | Code 35808HH | 1-4 35810HH | | Restricted 35812HH |
| | listID 35814HH | A 35816HH | CodeList 35818HH | Identification 35820HH | Identifier 35822HH | xsd 35824HH | token 35826HH | | 0..1 35828HH | |
| | listAgencyID 35830HH | A 35832HH | CodeListAgency 35834HH | Identification 35836HH | Identifier 35838HH | xsd 35840HH | token 35842HH | | 0..1 35844HH | |
| | listVersionID 35846HH | A 35848HH | CodeList 35850HH | Version 35852HH | Identifier 35854HH | xsd 35856HH | token 35858HH | | 0..1 35860HH | |
| | listAgency-SchemeID 35862HH | A 35864HH | CodeListAgency 35866HH | Scheme 35868HH | Identifier 35870HH | xsd 35872HH | token 35874HH | | 0..1 35876HH | |
| | listAgency-SchemeAgency-ID 35878HH | A 35880HH | CodeListAgency 35882HH | SchemeAgency 35884HH | Identifier 35886HH | xsd 35888HH | token 35890HH | | 0..1 35892HH | |

FIG. 358HH

| GDT | Cat. | Object Class | Property | Representation/ Association | Type | Type Name | Length | Card. | Remarks |
|---|---|---|---|---|---|---|---|---|---|
| PricingProcedureDeterminationCode 35800HI | | Pricing Procedure Determination 35802HI | | Code 35804HI | CCT 35806HI | Code 35808HI | 1 35810HI | | |

FIG. 358HI

| GDT | Cat. | Object Class | Property | Representation/ Association | Type | Type Name | Length | Card. | Remarks |
|---|---|---|---|---|---|---|---|---|---|
| Product Category Hierarchy Usage Code 35800HJ | | ProductCategory Hierarchy 35802HJ | Usage 35804HJ | Code 35806HJ | CCT 35808HJ | Code 35810HJ | 1..20 35812HJ | | Restricted 35814HJ |

FIG. 358HJ

| GDT | | Cat. | Object Class | Property | Representation/ Association | Type | Type Name | Length | Card. | Remarks |
|---|---|---|---|---|---|---|---|---|---|---|
| Product Dimensions 35800HK | | | Product Dimensions 35802HK | Details 35804HK | Details 35806HK | | | | | |
| | MeasureUnit Code 35808HK | A 35810HK | Product Dimensions 35812HK | Measure Unit 35814HK | Code 35816HK | GDT 35818HK | MeasureUnit Code 35820HK | | 1 35822HK | |
| | LengthMeasure 35824HK | E 35826HK | Product Dimension 35828HK | Length 35830HK | Measure 35832HK | GDT 35834HK | Measure 35836HK | | 0..1 35838HK | |
| | WidthMeasure 35840HK | E 35842HK | Product Dimension 35844HK | Width 35846HK | Measure 35848HK | GDT 35850HK | Measure 35852HK | | 0..1 35854HK | |
| | HeightMeasure 35856HK | E 35858HK | Product Dimension 35860HK | Height 35862HK | Measure 35864HK | GDT 35866HK | Measure 35868HK | | 0..1 35870HK | |

FIG. 358HK

| GDT | Cat. | Object Class | Property | Representation/ Association | Type | Type Name | Length | Card. | Remarks |
|---|---|---|---|---|---|---|---|---|---|
| Production SegmentID 35800HL | | Production Segment 35802HL | Identification 35804HL | Identifier 35806HL | CCT 35808HL | Identifier 35810HL | 1..40 35812HL | | Restricted 35814HL |

FHL. 358HL

| GDT | Cat. | Object Class | Property | Representation/ Association | Type | Type Name | Length | Card. | Remarks |
|---|---|---|---|---|---|---|---|---|---|
| ProductModelID 35800HM | | ProductModel 35802HM | Identification 35804HM | Identifier 35806HM | CCT 35808HM | Identifier 35810HM | 1..40 35812HM | | Restricted 35814HM |

FIG. 358HM

| CDT | Cat. | Object Class | Property Qualifier | Property | Representation/ Association | Type | Type Name | Length | Card. | Remarks |
|---|---|---|---|---|---|---|---|---|---|---|
| ProductPartyID 35800HN | | Product 35802HN | Party 35804HN | Identification 35806HN | Identifier 35808HN | GDT 35810HN | ProductID 35812HN | 1..60 35814HN | | Restricted 35816HN |

FIG. 358HN

| GDT | | Cat. | Object Class | Property | Representation/ Association | Type | Type Name | Length | Card. | Remarks |
|---|---|---|---|---|---|---|---|---|---|---|
| Product Tax 35800HO | | | Product Tax 35801HO | | Details 35802HO | | | | | |
| | CountryCode 35803HO | E 35804HO | Product Tax 35805HO | Country Code 35806HO | Code 35807HO | GDT 35808HO | CountryCode 35809HO | | 0..1 35810HO | |
| | JurisdictionCode 35811HO | E 35812HO | Product Tax 35813HO | Tax Jurisdic-tion Code 35814HO | Code 35815HO | GDT 35816HO | TaxJurisdiction Code 35817HO | | 0..1 35818HO | |
| | TypeCode 35819HO | E 35820HO | Product Tax 35821HO | Type Code 35822HO | Code 35823HO | GDT 35824HO | ProductTaxType Code 35825HO | | 0..1 35826HO | |
| | TypeDescription 35827HO | E 35828HO | Product Tax 35829HO | Type Descrip-tion 35830HO | Text 35831HO | GDT 35832HO | Description 35833HO | | 0..1 35834HO | |
| | BaseAmount 35835HO | E 35836HO | Product Tax 35837HO | Base Amount 35838HO | Amount 35839HO | GDT 35840HO | Amount 35841HO | | 0..1 35842HO | |
| | Percent 35843HO | E 35844HO | Product Tax 35845HO | Percent 35846HO | Percent 35847HO | GDT 35848HO | Percent 35849HO | | 0..1 35850HO | |
| | Amount 35851HO | E 35852HO | Product Tax 35853HO | Amount 35854HO | Amount 35855HO | GDT 35856HO | Amount 35857HO | | 0..1 35858HO | |
| | NonDeductible Percent 35859HO | E 35860HO | Product Tax 35861HO | Non Deducti-ble Percent 35862HO | Decimal 35863HO | GDT 35864HO | Percent 35865HO | | 0..1 35866HO | |

FIG. 358HOi

| | | | | | | | | | | |
|---|---|---|---|---|---|---|---|---|---|---|
| | NonDeductible Amount 35867HO | E 35868HO | Product Tax 35869HO | NonDeductible Amount 35870HO | Amount 35871HO | GDT 35872HO | Amount 35873HO | | 0..1 35874HO | |
| | Business Transaction Document Item GroupID 35875HO | E 35876HO | Product Tax 35877HO | Business Transaction Document Item Group Identification 35878HO | Identifier 35879HO | GDT 35880HO | Business Transaction DocumentItem GroupID 35881HO | | 0..1 35882HO | |
| | Triangulation Indicator 35883HO | E 35884HO | Product Tax 35885HO | Triangulation 35886HO | Indicator 35887HO | CCT 35888HO | Indicator 35889HO | | 0..1 35890HO | |
| | LegallyRequired Phrase 35891HO | E 35892HO | Product Tax 35893HO | Legally Required Phrase 35894HO | Text 35895HO | CCT 35896HO | Text 35897HO | 1..256 35898HO | 0..1 35899HO | |

FIG. 358HOii

| GDT | | Cat. | Object Class | Property | Representation/ Association | Type | Type Name | Length | Card. | Remarks |
|---|---|---|---|---|---|---|---|---|---|---|
| Product Usage Code 35800HP | | | Product 35802HP | Usage 35804HP | Code 35806HP | CCT 35808HP | Code 35810HP | 1..3 35812HP | | Restricted 35814HP |
| | listID 35816HP | A 35818HP | CodeList 35820HP | Identification 35822HP | Identifier 35824HP | xsd 35826HP | token 35828HP | | 0..1 35830HP | |
| | listAgencyID 35832HP | A 35834HP | Code ListAgency 35836HP | Identification 35838HP | Identifier 35840HP | xsd 35842HP | token 35844HP | | 0..1 35846HP | |
| | listVersionID 35848HP | A 35850HP | CodeList 35852HP | Version 35854HP | Identifier 35856HP | xsd 35858HP | token 35860HP | | 0..1 35862HP | |
| | listAgency-SchemeID 35864HP | A 35866HP | Code-ListAgency 35868HP | Scheme 35870HP | Identifier 35872HP | xsd 35874HP | token 35876HP | | 0..1 35878HP | |
| | listAgency-Scheme AgencyID 35880HP | A 35882HP | Code-ListAgency 35884HP | Sche-meAgency 35886HP | Identifier 35888HP | xsd 35890HP | token 35892HP | | 0..1 35894HP | |

FIG. 358HP

| GDT | | Cat. | Object Class | Property | Representation/ Association | Type | Type Name | Length | Card. | Remarks |
|---|---|---|---|---|---|---|---|---|---|---|
| Product Weights 35800HQ | | | Product Weights 35802HQ | Details 35804HQ | Details 35806HQ | | | | | |
| | MeasureUnit Code 35808HQ | A 35810HQ | Product Weights 35812HQ | MeasureUnit 35814HQ | Code 35816HQ | GDT 35818HQ | Measure Unit Code 35820HQ | | 1 35822HQ | |
| | GrossWeight Measure 35824HQ | E 35826HQ | Product Weights 35828HQ | Gross Weight 35830HQ | Measure 35832HQ | GDT 35834HQ | Measure 35836HQ | | 0..1 35838HQ | |
| | NetWeight Measure 35840HQ | E 35842HQ | Product Weights 35844HQ | Net Weight 35846HQ | Measure 35848HQ | GDT 35850HQ | Measure 35852HQ | | 0..1 35854HQ | |
| | TareWeight Measure 35856HQ | E 35858HQ | Product Weights 35860HQ | Tare Weight 35862HQ | Measure 35864HQ | GDT 35866HQ | Measure 35868HQ | | 0..1 35870HQ | |

FIG. 358HQ

| GDT | Cat. | Object Class | Property | Representation/ Association | Type | Type Name | Length | Card. | Remarks |
|---|---|---|---|---|---|---|---|---|---|
| ProfitCentre Type Code 35800HR | | Profit Centre 35802HR | Type 35804HR | Code 35806HR | CCT 35808HR | Code 35810HR | 1..4 35812HR | | restricted 35814HR |

FIG. 358HR

| GDT | | Cat. | Object Class | Property | Representation/ Association | Type | Type Name | Len. | Card. | Remarks |
|---|---|---|---|---|---|---|---|---|---|---|
| Project Element Assignment 35800HS | | | Project Element Assignment 35802HS | | Details 35804HS | GDT 35806HS | ProjectElement Assignment 35808HS | | | |
| | FromProjectReference 35810HS | E 35812HS | Project Element Assignment 35814HS | FromProject Reference 35816HS | Details 35818HS | GDT 35820HS | Project Reference 35822HS | | 1 35824HS | |
| | ToProjectReference 35826HS | E 35828HS | Project Element Assignment 35830HS | ToProject Reference 35832HS | Details 35834HS | GDT 35836HS | Project Reference 35838HS | | 1 35840HS | |

FIG. 358HS

| GDT | | Cat. | Object Class | Property | Representation/ Association | Type | Type Name | Length | Card. | Remarks |
|---|---|---|---|---|---|---|---|---|---|---|
| Project ElementID 35800HT | | | Project Element 35802HT | Identification 35804HT | Identifier 35806HT | CCT 35808HT | Identifier 35810HT | 1..32 35812HT | | Restricted 35814HT |
| | Scheme ID 35816HT | A 35818HT | Identification Scheme 35820HT | Identification 35822HT | Identifier 35824HT | xsd 35826HT | Token 35828HT | 1..60 35830HT | 0..1 35832HT | |
| | Scheme AgencyID 35834HT | A 35836HT | Identification Scheme Agency 35838HT | Identification 35840HT | Identifier 35842HT | xsd 35844HT | Token 35846HT | 1..60 35848HT | 0..1 35850HT | |
| | schemeAgency SchemeAgencyID 35852HT | A 35854HT | Identification Scheme Agency 35856HT | Scheme Agency 35858HT | Identifier 35860HT | xsd 35862HT | Token 35864HT | 1..3 35866HT | 0..1 35868HT | |

FIG. 358HT

| GDT | Cat. | Object Class | Property | Representation/ Association | Type | Type Name | Length | Card. | Remarks |
|---|---|---|---|---|---|---|---|---|---|
| ProjectElementTypeCode 35800HU | | Project Element 35802HU | Type 35804HU | Code 35806HU | CCT 35808HU | Code 35810HU | 1..3 35812HU | | restricted 35814HU |

FIG. 358HU

| GDT | | Cat. | Object Class | Property | Representation/ Association | Type | Type Name | Length | Card. | Remarks |
|---|---|---|---|---|---|---|---|---|---|---|
| Project ID 35800HV | | | Project 35802HV | Identification 35804HV | Identifier 35806HV | CCT 35808HV | Identifier 35810HV | 1..32 35812HV | | restricted 35814HV |
| | schemeID 35816HV | A 35818HV | Identification Scheme 35820HV | Identification 35822HV | Identifier 35824HV | xsd 35826HV | token 35828HV | 1..60 35830HV | 0..1 35832HV | |
| | Scheme AgencyID 35834HV | A 35836HV | Identification Scheme Agency 35838HV | Identification 35840HV | Identifier 35842HV | xsd 35844HV | token 35846HV | 1..60 35848HV | 0..1 35850HV | |
| | schemeAgency SchemeAgencyID 35852HV | A 35854HV | Identification Scheme Agency 35856HV | Scheme Agency 35858HV | Identifier 35860HV | xsd 35862HV | token 35864HV | 1..3 35866HV | 0..1 35868HV | |

FIG. 358HV

| GDT | | Cat. | Object Class | Property | Representation/ Association | Type | Type Name | Len. | Card. | Remarks |
|---|---|---|---|---|---|---|---|---|---|---|
| Project Reference 35800HW | | | Project Reference 35802HW | | Details 35804HW | | | | | |
| | ProjectID 35806HW | E 35808HW | Project Reference 35810HW | Identification 35812HW | Identifier 35814HW | GDT 35816HW | ProjectID 35818HW | | 0..1 35820HW | |
| | ProjectElement ID 35822HW | E 35824HW | Project Reference 35826HW | Element Identification 35828HW | Identifier 35830HW | GDT 35832HW | Project ElementID 35834HW | | 0..1 35836HW | |
| | ProjectElement TypeCode 35838HW | E 35840HW | Project Reference 35842HW | Element Type Code 35844HW | Code 35846HW | GDT 35848HW | Project Element TypeCode 35850HW | | 0..1 35852HW | |

FIG. 358HW

| GDT | | Cat. | Object Class | Property | Representation/ Association | Type | Type Name | Length | Card. | Remarks |
|---|---|---|---|---|---|---|---|---|---|---|
| Rate 35800HX | | | Rate 35802HX | | Details 35804HX | | | | | |
| | DecimalValue 35806HX | E 35808HX | Rate 35810HX | Decimal Value 35812HX | Value 35814HX | GDT 35816HX | Decimal Value 35818HX | | 1 35820HX | |
| | MeasureUnitCode 35822HX | E 35824HX | Rate 35826HX | Measure Unit 35828HX | Code 35830HX | GDT 35832HX | Measure UnitCode 35834HX | 1..3 35836HX | 0..1 35838HX | |
| | CurrencyCode 35840HX | E 35842HX | Rate 35844HX | Currency 35846HX | Code 35848HX | GDT 35850HX | Currency Code 35852HX | 3 35854HX | 0..1 35856HX | |
| | BaseDecimalValue 35858HX | E 35860HX | Rate 35862HX | Base Decimal Value 35864HX | Value 35866HX | GDT 35868HX | Decimal Value 35870HX | | 0..1 35874HX | Default = 1 35876HX |
| | BaseMeasureUnit-Code 35878HX | E 35880HX | Rate 35882HX | Base Measure Unit 35884HX | Code 35886HX | GDT 35887HX | Measure UnitCode 35888HX | 1..3 35889HX | 0..1 35890HX | |
| | BaseCurrencyCode 35891HX | E 35892HX | Rate 35893HX | Base Currency 35894HX | Code 35895HX | GDT 35896HX | Currency Code 35897HX | 3 35898HX | 0..1 35899HX | |

FIG. 358HX

| GDT | | Cat. | Object Class Qualifier | Object Class | Property | Representation/ Association | Type | Type Name | Length | Card. | Remarks |
|---|---|---|---|---|---|---|---|---|---|---|---|
| Rebate Product GroupCode 35800HY | | | Price 35802HY | Product Group 35804HY | | Code 35806HY | CCT 35808HY | Code 35810HY | 1..2 35812HY | | |
| | listID 35814HY | A 35816HY | CodeList 35818HY | | Identification 35820HY | Identifier 35822HY | xsd 35824HY | token 35826HY | | 0..1 35828HY | |
| | List AgencyID 35830HY | A 35832HY | Code List Agency 35834HY | | Identification 35836HY | Identifier 35838HY | xsd 35840HY | token 35842HY | | 0..1 35844HY | |
| | List Version ID 35846HY | A 35848HY | CodeList 35850HY | | Version 35852HY | Identifier 35854HY | xsd 35856HY | token 35858HY | | 0..1 35860HY | |
| | listAgency SchemeID 35862HY | A 35864HY | Code List Agency 35866HY | | Scheme 35868HY | Identifier 35870HY | xsd 35872HY | token 35874HY | | 0..1 35876HY | |
| | listAgency-Scheme AgencyID 35878HY | A 35880HY | Code List Agency 35882HY | | Scheme Agency 35884HY | Identifier 35886HY | xsd 35888HY | token 35890HY | | 0..1 35892HY | |

FIG. 358HY

| GDT | | Cat. | Object Class | Property | Representation/ Association | Type | Type Name | Length | Card. | Remarks |
|---|---|---|---|---|---|---|---|---|---|---|
| ReferenceInterestCurveCode 35800HZ | | | Reference Interest Curve 35802HZ | | Code 35804HZ | CCT 35806HZ | Code 35808HZ | 1..10 35810HZ | | restricted 35812HZ |
| | listID 35814HZ | A 35816HZ | CodeList 35818HZ | Identification 35820HZ | Identifier 35822HZ | xsd 35824HZ | token 35826HZ | 1..60 35828HZ | 0..1 35830HZ | |
| | List AgencyID 35832HZ | A 35834HZ | CodeList Agency 35836HZ | Identification 35838HZ | Identifier 35840HZ | xsd 35842HZ | token 35844HZ | 1..60 35846HZ | 0..1 35848HZ | |
| | List VersionID 35850HZ | A 35852HZ | CodeList 35854HZ | Version 35856HZ | Identifier 35858HZ | xsd 35860HZ | token 35862HZ | 1..15 35864HZ | 0..1 35866HZ | |
| | List Agency SchemeID 35868HZ | A 35870HZ | CodeList Agency 35872HZ | Scheme 35874HZ | Identifier 35876HZ | xsd 35878HZ | token 35880HZ | 1..60 35882HZ | 0..1 35884HZ | |
| | listAgency Scheme AgencyID 35886HZ | A 35888HZ | CodeList Agency 35890HZ | Scheme Agency 35892HZ | Identifier 35894HZ | xsd 35896HZ | token 35897HZ | 1..3 35898HZ | 0..1 35899HZ | |

FIG. 358HZ

| GDT | Cat. | Object Class | Property | Representation/ Association | Type | Type Name | Length | Card. | Remarks |
|---|---|---|---|---|---|---|---|---|---|
| ScaleAxis BaseCode 35800IA | | Scale Axis 35802IA | Base 35804IA | Code 35806IA | CCT 35808IA | Code 35810IA | 1-3 35812IA | | restricted 35814IA |

FIG. 358IA

| GDT | Cat. | Object Class | Property | Representation/ Association | Type | Type Name | Length | Card. | Remarks |
|---|---|---|---|---|---|---|---|---|---|
| ScaleAxis StepInterval Boundary TypeCode 35800IB | | Scale Axis Step 35802IB | Interval Boundary Type Code 35804IB | Code 35806IB | CCT 35808IB | Code 35810IB | 1 35812IB | | restricted 35814IB |

FIG. 358IB

| GDT | | Cat. | Object Class | Property | Representation/ Association | Type | Type Name | Length | Card. | Remarks |
|---|---|---|---|---|---|---|---|---|---|---|
| ServiceWorking ConditionsCode 35800IC | | | Service 35802IC | Working Conditions 35804IC | Code 35806IC | CCT 35808IC | Code 35810IC | 1..4 35812IC | | Restricted 35814IC |
| | listID 35816IC | A 35818IC | CodeList 35820IC | Identification 35822IC | Identifier 35824IC | xsd 35826IC | token 35828IC | | 0..1 35830IC | |
| | List AgencyID 35832IC | A 35834IC | CodeList Agency 35836IC | Identification 35838IC | Identifier 35840IC | xsd 35842IC | token 35844IC | | 0..1 35846IC | |
| | List Version ID 35848IC | A 35850IC | CodeList 35852IC | Version 35854IC | Identifier 35856IC | xsd 35858IC | token 35860IC | | 0..1 35862IC | |
| | listAgency SchemeID 35864IC | A 35866IC | CodeList Agency 35868IC | Scheme 35870IC | Identifier 35872IC | xsd 35874IC | token 35876IC | | 0..1 35878IC | |
| | listAgency Scheme AgencyID 35880IC | A 35882IC | CodeList Agency 35884IC | Scheme Agency 35886IC | Identifier 35888IC | xsd 35890IC | token 35892IC | | 0..1 35894IC | |

FIG. 358IC

| GDT | | Cat. | Object Class | Property | Representation / Association | Type | Type Name | Len. | Card. | Remarks |
|---|---|---|---|---|---|---|---|---|---|---|
| Academic Title Code 35800ID | | | | Academic Title 35802ID | Code 35804ID | CCT 35806ID | Code 35808ID | 1..4 35810ID | 0..1 35812ID | |
| | list ID 35814ID | A 35816ID | Code List 35818ID | Identification 35820ID | Identifier 35822ID | xsd 35824ID | token 35826ID | | 0..1 35828ID | |
| | list Agency ID 35830ID | A 35832ID | Code List Agency 35834ID | Identification 35836ID | Identifier 35838ID | xsd 35840ID | token 35842ID | | 0..1 35844ID | |
| | list Version ID 35846ID | A 35848ID | Code List 35850ID | Version 35852ID | Identifier 35854ID | xsd 35856ID | token 35858ID | | 0..1 35860ID | |
| | list Agency-Scheme ID 35862ID | A 35864ID | Code List Agency 35866ID | Scheme 35868ID | Identifier 35870ID | xsd 35872ID | token 35874ID | | 0..1 35876ID | |
| | list Agency-Scheme Agency ID 35878ID | A 35880ID | Code List Agency 35882ID | Scheme Agency 35884ID | Identifier 35886ID | xsd 35888ID | token 35890ID | | 0..1 35892ID | |

FIG. 358ID

| GDT | Cat. | Object Class Term Qualifier | Object Class Term | Prop. | Representation/ Association | Type | Type Name | Len. | Card. | Remarks |
|---|---|---|---|---|---|---|---|---|---|---|
| Account Determination Company Group Code<br>35800IE | | Account Determination<br>35802IE | Company Group<br>35804IE | | Code<br>35806IE | CCT<br>35808IE | Code<br>35810IE | 1..4<br>35812IE | | restricted<br>35814IE |

FIG. 358IE

| GDT | Cat. | Object Class | Property | Representation/ Association | Type | Type Name | Len. | Card. | Remarks |
|---|---|---|---|---|---|---|---|---|---|
| Account Determination Resource Group Code<br>35800IF | | Account Determination Resource Group<br>35802IF | | Code<br>35806IF | CCT<br>35808IF | Code<br>35810IF | 1..4<br>35812IF | | restricted<br>35814IF |

FIG. 358IF

| GDT | | Cat. | Object Class | Property | Representation/ Association | Type | Type Name | Len. | Card. | Remarks |
|---|---|---|---|---|---|---|---|---|---|---|
| Accounting Business Transaction Type Code<br>35800IG | | | Accounting Business Transaction<br>35802IG | Type<br>35804IG | Code<br>35806IG | CCT<br>35808IG | Code<br>35810IG | 1..4<br>35812IG | | restricted<br>35814IG |

FIG. 358IG

| GDT | Cat. | Object Class | Property | Representation/ Association | Type | Type Name | Len. | Card. | Remarks |
|---|---|---|---|---|---|---|---|---|---|
| Accounting Document TypeCode 35800IH | | Accounting Document 35804IH | Type 35806IH | Code 35808IH | CCT 35810IH | Code 35812IH | 1..5 35814IH | | restricted 35818IH |

FIG. 358IH

| GDT | Cat. | Object Class | Property | Representation/ Association | Type | Type Name | Len. | Card. | Remarks |
|---|---|---|---|---|---|---|---|---|---|
| AddressID 35800II | | Address 35804II | Identification 35806II | Identifier 35808II | CCT 35810II | Identifier 35812II | 1..40 35814II | | Restricted 35818II |

FIG. 358II

| GDT | Cat. | Object Class | Property | Representation/ Association | Type | Type Name | Len. | Card. | Remarks |
|---|---|---|---|---|---|---|---|---|---|
| AddressPersonID 35800IJ | | Address Person 35804IJ | Identification 35806IJ | Identifier 35808IJ | CCT 35810IJ | Identifier 35812IJ | 1..10 35814IJ | 35816IJ | Restricted 35818IJ |

FIG. 358IJ

| GDT | Cat. | Object Class | Property | Representation/ Association | Type | Type Name | Len. | Card. | Remarks |
|---|---|---|---|---|---|---|---|---|---|
| AddressTypeCode 35800IK | | | AddressType 35806IK | Code 35808IK | CCT 35810IK | Code 35812IK | 1 35814IK | | restricted 35818IK |

FIG. 358IK

| GDT | | Cat. | Object Class | Property Term | Representation Term | Type | Type Name | Len. | Card. | Remarks |
|---|---|---|---|---|---|---|---|---|---|---|
| BatchID 35800IL | | Complex Type 35801IL | Batch 35802IL | Identifier 35803IL | Identifier 35804IL | CCT 35805IL | Identifier 35806IL | 1..10 35807IL | | restricted 35809IL |
| | schemeID 35810IL | A 35811IL | Identification Scheme 35812IL | Identification 35813IL | Identifier 35814IL | XSD 35815IL | token 35816IL | | 0..1 35818IL | |
| | scheme VersionID 35820IL | A 35821IL | Identification Scheme 35822IL | Identification 35823IL | Identifier 35824IL | XSD 35825IL | token 35826IL | | 0..1 35828IL | |
| | scheme AgencyID 35830IL | A 35831IL | Identification SchemeAgency 35832IL | Version 35833IL | Identifier 35834IL | XSD 35835IL | token 35836IL | | 0..1 35838IL | |
| | scheme Agency SchemeID 35840IL | A 35841IL | Identification SchemeAgency 35842IL | Scheme 35843IL | Identifier 35844IL | XSD 35845IL | token 35846IL | | 0..1 35848IL | |
| | scheme Agency Scheme AgencyID 35850IL | A 35851IL | Identification SchemeAgency 35852IL | Scheme Agency 35853IL | Identifier 35854IL | XSD 35855IL | token 35856IL | | 0..1 35858IL | |

FIG. 358IL

| GDT | Cat. | Object Class | Property | Representation/ Association | Type | Type Name | Len. | Card. | Remarks |
|---|---|---|---|---|---|---|---|---|---|
| BuildingID 35800IM | | Building 35804IM | Identification 35806IM | Identifier 35808IM | CCT 35810IM | Identifier 35812IM | 1..10 35814IM | | Restricted 35818IM |

FIG. 358IM

| GDT | | Cat. | Object Class | Property | Representation/ Association | Type | Type Name | Len. | Card. | Remarks |
|---|---|---|---|---|---|---|---|---|---|---|
| Business Intelligence FilterID 35800IN | | | Business Intelligence Filter 35801IN | Identification 35803IN | Identifier 35804IN | CCT 35805IN | Identifier 35806IN | 1…60 35807IN | | Restricted 35809IN |
| | scheme AgencyID 35810IN | A 35811IN | Identification Scheme-Agency 35812IN | Identification 35813IN | Identifier 35814IN | xsd 35815IN | Token 35816IN | 1..60 35817IN | 0..1 35818IN | |

FIG. 358IN

| GDT | | Cat. | Object Class | Property | Representation/ Association | Type | Type Name | Len. | Card. | Remarks |
|---|---|---|---|---|---|---|---|---|---|---|
| Business Intelligence Information ObjectID 35800IO | | | Business Intelligence Information Object 35801IO | Identification 35803IO | Identifier 35804IO | CCT 35805IO | Identifier 35806IO | 1…60 35807IO | | Restricted 35809IO |
| | scheme AgencyID 35810IO | A 35811IO | Identification Scheme-Agency 35812IO | Identification 35813IO | Identifier 35814IO | xsd 35815IO | Token 35816IO | 1..60 35817IO | 0..1 35818IO | |

FIG. 358IO

| GDT | | Cat. | Object Class | Property | Representation/ Association | Type | Type Name | Len. | Card. | Remarks |
|---|---|---|---|---|---|---|---|---|---|---|
| Business Intelligence FilterID 35800IP | | | Business Intelligence Filter 35801IP | Identification 35803IP | Identifier 35804IP | CCT 35805IP | Identifier 35806IP | 1…60 35807IP | | Restricted 35809IP |
| | scheme AgencyID 35810IP | A 35811IP | Identification Scheme-Agency 35812IP | Identification 35813IP | Identifier 35814IP | xsd 35815IP | Token 35816IP | 1..60 35817IP | 0..1 35818IP | |

FIG. 358IP

| GDT | | Cat. | Object Class | Property | Representation/ Association | Type | Type Name | Len. | Card. | Remarks |
|---|---|---|---|---|---|---|---|---|---|---|
| Business Intelligence Planning SequenceID 35800IQ | | | Business Intelligence Planning Sequence 35801IQ | Identification 35803IQ | Identifier 35804IQ | CCT 35805IQ | Identifier 35806IQ | 1…60 35807IQ | | Restricted 35809IQ |
| | scheme AgencyID 35810IQ | A 35811IQ | Identification Scheme-Agency 35812IQ | Identification 35813IQ | Identifier 35814IQ | xsd 35815IQ | Token 35816IQ | 1..60 35817IQ | 0..1 35818IQ | |

FIG. 358IQ

| GDT | Cat. | Object Class | Property | Representation/ Association | Type | Type Name | Len. | Card. | Remarks |
|---|---|---|---|---|---|---|---|---|---|
| Business ObjectTypeCode 35800IR | | BusinessObject 35804IR | Type 35806IR | Code 35808IR | CCT 35810IR | Code 35812IR | 1..4 35814IR | | restricted 35818IR |

FIG. 358IR

| GDT | | Cat. | Object Class | Property Qualification | Property | Representation/ Association | Type | Type Name | Len. | Card. | Remarks |
|---|---|---|---|---|---|---|---|---|---|---|---|
| Cheque Storage InternalID 35800IT | | | Cheque Storage 35801IT | Internal 35802IT | Identification 35803IT | Identifier 35804IT | CCT 35805IT | Identifier 35806IT | 1...32 35807IT | | Restricted 35809IT |
| | scheme AgencyID 35810IT | A 35811IT | Identification Scheme-Agency 35812IT | | Identification 35813IT | Identifier 35814IT | xsd 35815IT | Token 35816IT | 1..60 35817IT | 0..1 35818IT | |

FIG. 358IT

| GDT | Cat. | Object Class | Property | Representation / Association | Type | Type Name | Len. | Card. | Remarks |
|---|---|---|---|---|---|---|---|---|---|
| ExceptionFolderID 35800JE | | Exception Folder 35801JE | Identification 35803JE | Identifier 35804JE | CCT 35805JE | Identifier 35806JE | 1..40 35807JE | | restricted 35809JE |
| SchemeAgencyID 35810JE | A 35811JE | IdentificationScheme-Agency 35812JE | Identification 35813JE | Identifier 35814JE | xsd 35815JE | token 35816JE | 1..60 35817JE | 0..1 35818JE | |

FIG. 358JE

| GDT | Cat. | Object Class | Property Qualifier | Property | Representation / Association | Type | Type Name | Len. | Card. | Remarks |
|---|---|---|---|---|---|---|---|---|---|---|
| ExceptionKeyFigure 35800JF | | Exception Key Figure 35801JF | | | Details 35804JF | | | | | |
| Code 35810JF | E 35811JF | Exception Key Figure 35812JF | | Code 35813JF | Code 35814JF | GDT 35815JF | ExceptionKey FigureCode 35816JF | | 1 35818JF | |
| Value 35820JF | E 35821JF | Exception Key Figure 35822JF | | Value 35823JF | Value 35824JF | GDT 35825JF | ExceptionKey FigureValue 35826JF | | 1 35828JF | |

FIG. 358JF

| GDT | Cat. | Object Class | Property | Representation/ Association | Type | Type Name | Len. | Card. | Remarks |
|---|---|---|---|---|---|---|---|---|---|
| ExceptionKeyFigureCode 35800JG | | Exception 35804JG | Key Figure 35806JG | Code 35808JG | CCT 35810JG | Code 35812JG | 1..2 35814JG | | restricted 35818JG |

FIG. 358JG

| GDT | Cat. | Object Class | Property Qualifier | Property | Representation / Association | Type | Type Name | Len. | Card. | Remarks |
|---|---|---|---|---|---|---|---|---|---|---|
| ExceptionKeyFigureValue 35800JH | | Exception Key Figure Value 35801JH | | | Details 35804JH | | | | | |
| Quantity 35810JH | E 35811JH | | | Quantity 35813JH | Quantity 35814JH | GDT 35815JH | Quantity 35816JH | 13.6 35817JH | 0..1 35818JH | |
| Percent 35820JH | E 35821JH | | | Percent 35823JH | Percent 35824JH | GDT 35825JH | Percent 35826JH | 10.6 35827JH | 0..1 35828JH | |
| Duration 35830JH | E 35831JH | | | Duration 35833JH | Duration 35834JH | GDT 35835JH | Duration 35836JH | | 0..1 35838JH | |

FIG. 358JH

| GDT | Cat. | Object Class | Property Qualifier | Property | Representation / Association | Type | Type Name | Len. | Card. | Remarks |
|---|---|---|---|---|---|---|---|---|---|---|
| FamilyNamePrefixCode 35800JI | | Person 35801JI | | Family Name Prefix 35803JI | Code 35804JI | CCT 35805JI | Code 35806JI | 1..4 35807JI | | |
| ListAgencyID 35810JI | A 35811JI | CodeListAgency 35812JI | | Identification 35813JI | Identifier 35814JI | xsd 35815JI | token 35816JI | | 0..1 35818JI | |
| ListVersionID 35820JI | A 35821JI | CodeList 35822JI | | Version 35823JI | Identifier 35824JI | xsd 35825JI | token 35826JI | | 0..1 35828JI | |
| ListAgency-SchemeID 35830JI | A 35831JI | CodeListAgency 35832JI | | Scheme 35833JI | Identifier 35834JI | xsd 35835JI | token 35836JI | | 0..1 35838JI | |
| ListAgency-SchemeAgencyID 35840JI | A 35841JI | CodeListAgency 35842JI | | SchemeAgency 35843JI | Identifier 35844JI | xsd 35845JI | token 35846JI | | 0..1 35848JI | |

FIG. 358JI

| GDT | Cat. | Object Class | Property | Representation/ Association | Type | Type Name | Len. | Card. | Remarks |
|---|---|---|---|---|---|---|---|---|---|
| FloorID 35800JJ | | Floor 35804JJ | Identification 35806JJ | Identifier 35808JJ | CCT 35810JJ | Identifier 35812JJ | 1..10 35814JJ | | restricted 35818JJ |

FIG. 358JJ

| GDT | Cat. | Object Class | Property | Representation/ Association | Type | Type Name | Len. | Card. | Remarks |
|---|---|---|---|---|---|---|---|---|---|
| GenderCode 35800JK | | | Gender 35806JK | Code 35808JK | CCT 35810JK | Code 35812JK | 1 35814JK | | Restricted 35818JK |

FIG. 358JK

| GDT | | Cat. | Object Class | Property | Representation/ Association | Type | Type Name | Len. | Card. | Remarks |
|---|---|---|---|---|---|---|---|---|---|---|
| General Ledger Account Code 35800JL | | | General Ledger Account 35802JL | Alias 35803JL | Code 35804JL | CCT 35805JL | Code 35806JL | 1..10 35807JL | | Restricted 35809JL |
| | listID 35810JL | A 35811JL | CodeList 35812JL | Identification 35813JL | Identifier 35814JL | xsd 35815JL | token 35816JL | | 0..1 35818JL | |
| | listAgencyID 35820JL | A 35821JL | CodeListAgency 35822JL | Identification 35823JL | Identifier 35824JL | xsd 35825JL | token 35826JL | | 0..1 35828JL | |
| | listVersionID 35830JL | A 35831JL | CodeList 35832JL | Version 35833JL | Identifier 35834JL | xsd 35835JL | token 35836JL | | 0..1 35838JL | |
| | listAgency-SchemeID 35840JL | A 35841JL | CodeList Agency 35842JL | Scheme 35843JL | Identifier 35844JL | xsd 35845JL | token 35846JL | | 0..1 35848JL | |
| | listAgency-SchemeAgencyID 35850JL | A 35851JL | CodeList Agency 35852JL | SchemeAgency 35853JL | Identifier 35854JL | xsd 35855JL | token 35856JL | | 0..1 35858JL | |

FIG. 358JL

| GDT | Cat. | Object Class | Property | Representation/ Association | Type | Type Name | Len. | Card. | Remarks |
|---|---|---|---|---|---|---|---|---|---|
| IncotermsClassification Code<br>35800JM | | | Incoterms<br>35806JM | Classification<br>35808JM | Code<br>35810JM | CCT<br>35812JM | Code<br>35814JM | 3<br>35816JM | 1<br>35818JM |

FIG. 358JM

| GDT | Cat. | Object Class | Property | Representation/ Association | Type | Type Name | Len. | Card. | Remarks |
|---|---|---|---|---|---|---|---|---|---|
| InhouseMailID<br>35800JN | | InhouseMail<br>35804JN | Identification<br>35806JN | Identifier<br>35808JN | CCT<br>35810JN | Identifier<br>35812JN | 1..10<br>35814JN | | Restricted<br>35818JN |

FIG. 358JN

| GDT | | Cat. | Object Class | Property | Representation/ Association | Type | Type Name | Len. | Card. | Remarks |
|---|---|---|---|---|---|---|---|---|---|---|
| Payment Register Grouping CriterionCode 35800JO | | | Payment Register 35802JO | Grouping Criterion 35803JO | Code 35804JO | CCT 35805JO | Code 35806JO | 1..2 35807JO | | restricted 35809JO |
| | listAgencyID 35810JO | A 35811JO | CodeListAgency 35812JO | Identification 35813JO | Identifier 35814JO | xsd 35815JO | token 35816JO | | 0..1 35818JO | |
| | listVersionID 35820JO | A 35821JO | CodeList 35822JO | Version 35823JO | Identifier 35824JO | xsd 35825JO | token 35826JO | | 0..1 35828JO | |
| | listAgency-SchemeID 35830JO | A 35831JO | CodeListAgency 35832JO | Scheme 35833JO | Identifier 35834JO | xsd 35835JO | token 35836JO | | 0..1 35838JO | |
| | listAgency-SchemeAgencyID 35840JO | A 35841JO | CodeListAgency 35842JO | SchemeAgency 35843JO | Identifier 35844JO | xsd 35845JO | token 35846JO | | 0..1 35848JO | |

FIG. 358JO

| GDT | | Cat. | Object Class | Property | Representation/ Association | Type | Type Name | Len. | Card. |
|---|---|---|---|---|---|---|---|---|---|
| Person Name 35800JP | | S 35801JP | Person 35802JP | Name 35803JP | Details 35804JP | | | | |
| | FormOfAddress Code 35805JP | E 35806JP | PersonName 35807JP | Form of Address 35808JP | Code 35809JP | GDT 35810JP | FormOf AddressCode 35811JP | 4 35812JP | 0..1 35813JP |
| | GivenName 35814JP | E 35815JP | PersonName 35816JP | GivenName 35817JP | Name 35818JP | GDT 35819JP | _MEDIUM _Name 35820JP | 40 35821JP | 0..1 35822JP |
| | MiddleName 35823JP | E 35824JP | PersonName 35825JP | MiddleName 35826JP | Name 35827JP | GDT 35828JP | _MEDIUM _Name 35829JP | 40 35830JP | 0..1 35831JP |
| | FamilyName 35832JP | E 35833JP | PersonName 35834JP | FamilyName 35835JP | Name 35836JP | GDT 35837JP | _MEDIUM _Name 35838JP | 40 35839JP | 0..1 35840JP |
| | AdditionalFamily Name 35841JP | E 35842JP | PersonName 35843JP | Additional FamilyName 35844JP | Name 35845JP | GDT 35846JP | _MEDIUM _Name 35847JP | 40 35848JP | 0..1 35849JP |
| | BirthName 35850JP | E 35851JP | PersonName 35852JP | Birthname 35853JP | Name 35854JP | GDT 35855JP | _MEDIUM _Name 35856JP | 40 35857JP | 0..1 35858JP |
| | NickName 35859JP | E 35860JP | PersonName 35861JP | NickName 35862JP | Name 35863JP | GDT 35864JP | _MEDIUM _Name 35865JP | 40 35866JP | 0..1 35867JP |
| | InitialsName 35868JP | E 35869JP | PersonName 35870JP | Initials 35871JP | Name 35872JP | GDT 35873JP | _SHORT _Name 35874JP | 40 35875JP | 0..1 35876JP |

FIG. 358JP.1

| GDT | | Cat. | Object Class | Property | Representation/ Association | Type | Type Name | Len. | Card. |
|---|---|---|---|---|---|---|---|---|---|
| | AcademicTitle Code 35877JP | E 35878JP | PersonName 35879JP | AcademicTitle 35880JP | Code 35881JP | GDT 35882JP | Academic TitleCode 35883JP | 4 35884JP | 0..1 35885JP |
| | Additional AcademicTitle Code 35886JP | E 35887JP | PersonName 35888JP | Additional AcademicTitle 35889JP | Code 35890JP | GDT 35891JP | Academic TitleCode 35892JP | 4 35893JP | 0..1 35894JP |
| | NamePrefixCode 35895JP | E 35896JP | PersonName 35897JP | NamePrefix 35898JP | Code 35899JP | GDT 35800AJP | FamilyName PrefixCode 35802AJP | 4 35804AJP | 0..1 35806AJP |
| | AdditionalName PrefixCode 35808AJP | E 35810AJP | PersonName 35811AJP | AdditionalName Prefix 35812AJP | Code 35813AJP | GDT 35814AJP | FamilyName PrefixCode 35815AJP | 4 35816AJP | 0..1 35817AJP |
| | NameSupplement Code 35818AJP | E 35819AJP | PersonName 35820AJP | NameSupplement 35821AJP | Code 35822AJP | GDT 35823AJP | PersonName Supplement Code 35824AJP | 40 35825AJP | 0..1 35826AJP |
| | DeviatingFullName 35827AJP | E 35828AJP | PersonName 35829AJP | DeviatingFullName 35830AJP | Name 35831AJP | GDT 35832AJP | _LONG _Name 35833AJP | 80 35834AJP | 0..1 35835AJP |
| | NameFormat CountryCode 35836AJP | E 35837AJP | PersonName 35838AJP | NameFormat Country 35839AJP | Code 35840AJP | GDT 35841AJP | CountryCode 35842AJP | 3 35843AJP | 0..1 35844AJP |
| | NameFormatCode 35845AJP | E 35846AJP | PersonName 35847AJP | NameFormat 35848AJP | Code 35849AJP | GDT 35850AJP | PersonName FormatCode 35851AJP | 2 35852AJP | 0..1 35853AJP |

FIG. 358JP.2

| GDT | | Cat. | Object Class | Property | Representation/ Association | Type | Type Name | Len. | Card. | Remarks |
|---|---|---|---|---|---|---|---|---|---|---|
| PersonName Supplement Code 35800JQ | | | | Person Name Supplement 35803JQ | Code 35804JQ | CCT 35805JQ | Code 35806JQ | 1..4 35807JQ | | |
| | listID 35810JQ | A 35811JQ | CodeList 35812JQ | Identification 35813JQ | Identifier 35814JQ | xsd 35815JQ | token 35816JQ | | 0..1 35818JQ | |
| | ListAgencyID 35820JQ | A 35821JQ | CodeListAgency 35822JQ | Identification 35823JQ | Identifier 35824JQ | xsd 35825JQ | token 35826JQ | | 0..1 35828JQ | |
| | ListVersionID 35830JQ | A 35831JQ | CodeList 35832JQ | Version 35833JQ | Identifier 35834JQ | xsd 35835JQ | token 35836JQ | | 0..1 35838JQ | |
| | ListAgency-SchemeID 35840JQ | A 35841JQ | CodeListAgency 35842JQ | Scheme 35843JQ | Identifier 35844JQ | xsd 35845JQ | token 35846JQ | | 0..1 35848JQ | |
| | ListAgency-SchemeAgencyID 35850JQ | A 35851JQ | CodeListAgency 35852JQ | SchemeAgency 35853JQ | Identifier 35854JQ | xsd 35855JQ | token 35856JQ | | 0..1 35858JQ | |

FIG. 358JQ

| GDT | Cat. | Object Class | Property | Representation/ Association | Type | Type Name | Len. | Card. | Remarks |
|---|---|---|---|---|---|---|---|---|---|
| POBoxID 35800JR | | POBox 35804JR | Identification 35806JR | Identifier 35808JR | CCT 35810JR | Identifier 35812JR | 1..10 35814JR | | restricted 35818JR |

FIG. 358JR

| GDT | Cat. | Object Class | Property | Representation/ Association | Type | Type Name | Len. | Card. | Remarks |
|---|---|---|---|---|---|---|---|---|---|
| PostalCode<br>35800JS | | PostalCode<br>35804JS | | Code<br>35808JS | CCT<br>35810JS | Code<br>35812JS | 0..10<br>35814JS | | restricted<br>35818JS |

FIG. 358JS

| GDT | Cat. | Object Class | Property | Representation/ Association | Type | Type Name | Len. | Card. | Remarks |
|---|---|---|---|---|---|---|---|---|---|
| PriceSpecificationElement TypeCode<br>35800JT | | PriceSpecification Element<br>35804JT | Type<br>35806JT | Code<br>35808JT | CCT<br>35810JT | Code<br>35812JT | 4<br>35814JT | | restricted<br>35818JT |

FIG. 358JT

| GDT | Cat. | Object Class | Property | Representation/ Association | Type | Type Name | Len. | Card. | Remarks |
|---|---|---|---|---|---|---|---|---|---|
| PriceTypeCode 35800JU | | Price 35802JU | Type 35803JU | Code 35804JU | CCT 35805JU | Code 35806JU | 1..3 35807JU | | |
| listID 35810JU | A 35811JU | CodeList 35812JU | Identification 35813JU | Identifier 35814JU | xsd 35815JU | token 35816JU | | 0..1 35818JU | |
| listAgencyID 35820JU | A 35821JU | CodeListAgency 35822JU | Identification 35823JU | Identifier 35824JU | xsd 35825JU | token 35826JU | | 0..1 35828JU | |
| listVersionID 35830JU | A 35831JU | CodeList 35832JU | Version 35833JU | Identifier 35834JU | xsd 35835JU | token 35836JU | | 0..1 35838JU | |
| listAgency-SchemeID 35840JU | A 35841JU | CodeListAgency 35842JU | Scheme 35843JU | Identifier 35844JU | xsd 35845JU | token 35846JU | | 0..1 35848JU | |
| listAgency-SchemeAgencyID 35850JU | A 35851JU | CodeListAgency 35852JU | SchemeAgency 35853JU | Identifier 35854JU | xsd 35855JU | token 35856JU | | 0..1 35858JU | |

FIG. 358JU

| GDT | Cat. | Object Class | Property | Representation/ Association | Type | Type Name | Len. | Card. | Remarks |
|---|---|---|---|---|---|---|---|---|---|
| ProjectTypeCode 35800JV | | Project 35802JV | Type 35803JV | Code 35804JV | CCT 35805JV | Code 35806JV | 1..15 35807JV | | Restricted 35809JV |
| listAgencyID 35810JV | A 35811JV | CodeListAgency 35812JV | Identification 35813JV | Identifier 35814JV | xsd 35815JV | token 35816JV | | 0..1 35818JV | |
| listVersionID 35820JV | A 35821JV | CodeList 35822JV | Version 35823JV | Identifier 35824JV | xsd 35825JV | token 35826JV | | 0..1 35828JV | |
| listAgency-SchemeID 35830JV | A 35831JV | CodeListAgency 35832JV | Scheme 35833JV | Identifier 35834JV | xsd 35835JV | token 35836JV | | 0..1 35838JV | |
| listAgency-SchemeAgencyID 35840JV | A 35841JV | CodeListAgency 35842JV | SchemeAgency 35843JV | Identifier 35844JV | xsd 35845JV | token 35846JV | | 0..1 35848JV | |

FIG. 358JV

| GDT | Cat. | Object Class | Property | Representation/ Association | Type | Type Name | Len. | Card. | Remarks |
|---|---|---|---|---|---|---|---|---|---|
| PurchaseLedgerAccount TypeCode 35800JW | | PurchaseLedger Account 35804JW | Type 35806JW | Code 35808JW | CCT 35810JW | Code 35812JW | 1..2 35814JW | | restricted 35818JW |

FIG. 358JW

| GDT | Cat. | Object Class | Property Qualifier | Property | Representation / Association | Type | Type Name | Len. | Card. | Remarks |
|---|---|---|---|---|---|---|---|---|---|---|
| RegionalStructure CityCode 35800JX | | Regional StructureCity 35801JX | | | Code 35804JX | CCT 35805JX | Code 35806JX | 1..12 35807JX | | restricted 35809JX |
| listAgencyID 35810JX | A 35811JX | CodeListAgency 35812JX | | Identification 35813JX | Identifier 35814JX | xsd 35815JX | Token 35816JX | | 0..1 35818JX | |
| listVersionID 35820JX | A 35821JX | CodeList 35822JX | | Version 35823JX | Identifier 35824JX | xsd 35825JX | Token 35826JX | | 0..1 35828JX | |
| listAgency-SchemeID 35830JX | A 35831JX | CodeListAgency 35832JX | | Scheme 35833JX | Identifier 35834JX | xsd 35835JX | Token 35836JX | | 0..1 35838JX | |
| listAgency-SchemeAgencyID 35840JX | A 35841JX | CodeListAgency 35842JX | | SchemeAgency 35843JX | Identifier 35844JX | xsd 35845JX | Token 35846JX | | 0..1 35848JX | |

FIG. 358JX

| GDT | Cat. | Object Class | Property Qualifier | Property | Representation / Association | Type | Type Name | Len. | Card. | Remarks |
|---|---|---|---|---|---|---|---|---|---|---|
| RegionalStructure DistrictCode 35800JY | | Regional StructureCity 35801JY | | | Code 35804JY | CCT 35805JY | Code 35806JY | 1..12 35807JY | | restricted 35809JY |
| listAgencyID 35810JY | A 35811JY | CodeListAgency 35812JY | | Identification 35813JY | Identifier 35814JY | xsd 35815JY | Token 35816JY | | 0..1 35818JY | |
| listVersionID 35820JY | A 35821JY | CodeList 35822JY | | Version 35823JY | Identifier 35824JY | xsd 35825JY | Token 35826JY | | 0..1 35828JY | |
| listAgency-SchemeID 35830JY | A 35831JY | CodeListAgency 35832JY | | Scheme 35833JY | Identifier 35834JY | xsd 35835JY | Token 35836JY | | 0..1 35838JY | |
| listAgency-SchemeAgencyID 35840JY | A 35841JY | CodeListAgency 35842JY | | SchemeAgency 35843JY | Identifier 35844JY | xsd 35845JY | Token 35846JY | | 0..1 35848JY | |

FIG. 358JY

| GDT | | Cat. | Object Class | Property Qualifier | Property | Representation / Association | Type | Type Name | Len. | Card. | Remarks |
|---|---|---|---|---|---|---|---|---|---|---|---|
| RegionalStructure StreetCode 35800JZ | | | Regional StructureCity 35801JZ | | | Code 35804JZ | CCT 35805JZ | Code 35806JZ | 1..12 35807JZ | | restricted 35809JZ |
| | listAgencyID 35810JZ | A 35811JZ | CodeListAgency 35812JZ | | Identification 35813JZ | Identifier 35814JZ | xsd 35815JZ | Token 35816JZ | | 0..1 35818JZ | |
| | listVersionID 35820JZ | A 35821JZ | CodeList 35822JZ | | Version 35823JZ | Identifier 35824JZ | xsd 35825JZ | Token 35826JZ | | 0..1 35828JZ | |
| | listAgency-SchemeID 35830JZ | A 35831JZ | CodeListAgency 35832JZ | | Scheme 35833JZ | Identifier 35834JZ | xsd 35835JZ | Token 35836JZ | | 0..1 35838JZ | |
| | listAgency-SchemeAgencyID 35840JZ | A 35841JZ | CodeListAgency 35842JZ | | SchemeAgency 35843JZ | Identifier 35844JZ | xsd 35845JZ | Token 35846JZ | | 0..1 35848JZ | |

FIG. 358JZ

| GDT | Cat. | Object Class | Property Qualifier | Property | Representation / Association | Type | Type Name | Len. | Card. | Remarks |
|---|---|---|---|---|---|---|---|---|---|---|
| SetOfBooksCode 35800MD | | SetOfBooks 35801MD | | | Code 35804MD | CCT 35805MD | Code 35806MD | 1..4 35807MD | | restricted 35809MD |
| listID 35810MD | A 35811MD | CodeList 35812MD | | Identification 35813MD | Identifier 35814MD | xsd 35815MD | token 35816MD | | 0..1 35818MD | |
| listAgencyID 35820MD | A 35821MD | CodeListAgency 35822MD | | Identification 35823MD | Identifier 35824MD | xsd 35825MD | token 35826MD | | 0..1 35828MD | |
| listVersionID 35830MD | A 35831MD | CodeList 35832MD | | Version 35833MD | Identifier 35834MD | xsd 35835MD | token 35836MD | | 0..1 35838MD | |
| listAgency-SchemeID 35840MD | A 35841MD | CodeListAgency 35842MD | | Scheme 35843MD | Identifier 35844MD | xsd 35845MD | token 35846MD | | 0..1 35848MD | |
| listAgency-SchemeAgencyID 35850MD | A 35851MD | CodeListAgency 35852MD | | SchemeAgency 35853MD | Identifier 35854MD | xsd 35855MD | token 35856MD | | 0..1 35858MD | |

FIG. 358MD

| GDT | Cat. | Object Class | Property | Representation/ Association | Type | Type Name | Len. | Card. | Remarks |
|---|---|---|---|---|---|---|---|---|---|
| SourceOfSupplyBaseObject TypeCode 35800ME | | SourceOf Supply_Base Object 35804ME | Type 35806ME | Code 35808ME | CCT 35810ME | Code 35812ME | 1..2 35814ME | | restricted 35818ME |

FIG. 358ME

| GDT | Cat. | Object Class | Property | Representation/ Association | Type | Type Name | Len. | Card. | Remarks |
|---|---|---|---|---|---|---|---|---|---|
| SourcesOfSupply SpecificationDetailLevelCode 35800MF | | Sources Of Supply Specification 35804MF | Detail Level 35806MF | Code 35808MF | CCT 35810MF | Code 35812MF | 1 35814MF | | restricted 35818MF |

FIG. 358MF

| GDT | Cat. | Object Class | Property | Representation/ Association | Type | Type Name | Len. | Card. | Remarks |
|---|---|---|---|---|---|---|---|---|---|
| StreetName 35800MG | | | Street 35806MG | Name 35808MG | GDT 35810MG | Name 35812MG | 1..60 35814MG | 0..1 35816MG | restricted 35818MG |

FIG. 358MG

| GDT | Cat. | Object Class | Property | Representation/ Association | Type | Type Name | Len. | Card. | Remarks |
|---|---|---|---|---|---|---|---|---|---|
| SubledgerAccountCharge TypeCode 35800MH | | Subledger Account 35804MH | Charge_ Type 35806MH | Code 35808MH | CCT 35810MH | Code 35812MH | 1..3 35814MH | | restricted 35818MH |

FIG. 358MH

| GDT | Cat. | Object Class | Property Qualifier | Property | Representation / Association | Type | Type Name | Len. | Card. | Remarks |
|---|---|---|---|---|---|---|---|---|---|---|
| SupplyPlannningCost FunctionCode 35800MI | | SupplyPlanning_ CostFunction 35801MI | | | Code 35804MI | CCT 35805MI | Code 35806MI | 1..2 35807MI | | restricted 35809MI |
| listAgencyID 35810MI | A 35811MI | CodeListAgency 35812MI | | Identification 35813MI | Identifier 35814MI | xsd 35815MI | Token 35816MI | | 0..1 35818MI | |
| listVersionID 35820MI | A 35821MI | CodeList 35822MI | | Version 35823MI | Identifier 35824MI | xsd 35825MI | Token 35826MI | | 0..1 35828MI | |
| listAgency-SchemeID 35830MI | A 35831MI | CodeListAgency 35832MI | | Scheme 35833MI | Identifier 35834MI | xsd 35835MI | Token 35836MI | | 0..1 35838MI | |
| listAgency-SchemeAgencyID 35840MI | A 35841MI | CodeListAgency 35842MI | | SchemeAgency 35843MI | Identifier 35844MI | xsd 35845MI | Token 35846MI | | 0..1 35848MI | |

FIG. 358MI

| GDT | | Cat. | Object Class | Property Qualifier | Property | Representation / Association | Type | Type Name | Len. | Card. | Remarks |
|---|---|---|---|---|---|---|---|---|---|---|---|
| TaxDeclarationTypeCode 35800MJ | | | Tax Declaration 35801MJ | | Type 35803MJ | Code 35804MJ | CCT 35805MJ | Code 35806MJ | 1..3 35807MJ | | restricted 35809MJ |
| | listID 35810MJ | A 35811MJ | CodeList 35812MJ | | Identification 35813MJ | Identifier 35814MJ | xsd 35815MJ | token 35816MJ | | 0..1 35818MJ | |

FIG. 358MJ

| GDT | Cat. | Object Class | Property Qualifier | Property | Representation / Association | Type | Type Name | Len. | Card. | Remarks |
|---|---|---|---|---|---|---|---|---|---|---|
| TaxExemption 35800MK | | Tax Exemption 35801MK | | | Details 35804MK | | | | | |
| CertificateID 35810MK | E 35811MK | Tax Exemption 35812MK | Certificate 35817MK | Identification 35813MK | Identifier 35814MK | GDT 35815MK | TaxExemption CertificateID 35816MK | | 1 35818MK | |
| ValidityPeriod 35820MK | E 35821MK | Tax Exemption 35822MK | Validity 35827MK | Period 35823MK | DateTimePeriod 35824MK | GDT 35825MK | DateTime Period 35826MK | | 0..1 35828MK | |
| Percent 35830MK | E 35831MK | Tax Exemption 35832MK | | Exempt Amount 35833MK | Percent 35834MK | GDT 35835MK | Percent 35836MK | | 0..1 35838MK | |
| Amount 35840MK | E 35841MK | Tax Exemption 35842MK | | Exempt 35843MK | Amount 35844MK | GDT 35845MK | Amount 35846MK | | 0..1 35848MK | |

FIG. 358MK

| GDT | Cat. | Object Class | Property | Representation/ Association | Type | Type Name | Len. | Card. | Remarks |
|---|---|---|---|---|---|---|---|---|---|
| TaxExemptionCertificateID 35800ML | | Tax Exemption Certificate 35804ML | | Identification 35808ML | Identifier 35810ML | CCT 35812ML | Identifier 35814ML | 1..30 35816ML | |

FIG. 358ML

| GDT | Cat. | Object Class | Property Qualifier | Property | Representation / Association | Type | Type Name | Len. | Card. | Remarks |
|---|---|---|---|---|---|---|---|---|---|---|
| TaxExemptionReason 35800MM | | Tax Exemption 35801MM | | Reason 35803MM | Code 35804MM | CCT 35805MM | Code 35806MM | 1..3 35807MM | | restricted 35809MM |
| listID 35810MM | A 35811MM | CodeList 35812MM | | Identification 35813MM | Identifier 35814MM | xsd 35815MM | token 35816MM | 1..40 | 1 35818MM | |
| listAgencyID 35820MM | A 35821MM | CodeListAgency 35822MM | | Identification 35823MM | Identifier 35824MM | xsd 35825MM | token 35826MM | 1..3 | 0..1 35828MM | |

FIG. 358MM

| GDT | | Cat. | Object Class | Property | Representation/ Association | Type | Type Name | Len. | Card. |
|---|---|---|---|---|---|---|---|---|---|
| ActivityGroupCode 35800NM | | | Activity 35801NM | Group 35802NM | Code 35803NM | CCT 35804NM | Code 35805NM | 1...4 35806NM | |
| | listID 35810NM | A 35811NM | CodeList 35812NM | Identification 35813NM | Identifier 35814NM | xsd 35815NM | token 35816NM | | 0..1 35818NM |
| | listAgencyID 35820NM | A 35821NM | CodeListAgency 35822NM | Identification 35823NM | Identifier 35824NM | xsd 35825NM | token 35826NM | | 0..1 35828NM |
| | listVersionID 35830NM | A 35831NM | CodeList 35832NM | Version 35833NM | Identifier 35834NM | xsd 35835NM | token 35836NM | | 0..1 35838NM |
| | listAgency-SchemeID 35840NM | A 35841NM | CodeListAgency 35842NM | Scheme 35843NM | Identifier 35844NM | xsd 35845NM | token 35846NM | | 0..1 35848NM |
| | listAgency-SchemeAgencyID 35850NM | A 35851NM | CodeListAgency 35852NM | SchemeAgency 35853NM | Identifier 35854NM | xsd 35855NM | token 35856NM | | 0..1 35858NM |

FIG. 358MN

| GDT | Cat. | Object Class | Property | Representation / Association | Type | Type Name | Len. | Card. | Remarks |
|---|---|---|---|---|---|---|---|---|---|
| TradeReceivablesPayables RegisterGroupingCriterionCode 35800MO | | TradeReceivables PayablesRegister 35802MO | Grouping Criterion 35803MO | Code 35804MO | CCT 35805MO | Code 35806MO | 1..2 35807MO | | restricted 35809MO |
| listAgencyID 35810MO | A 35811MO | CodeListAgency 35812MO | Identification 35813MO | Identifier 35814MO | xsd 35815MO | token 35816MO | | 0..1 35818MO | |
| listVersionID 35820MO | A 35821MO | CodeList 35822MO | Version 35823MO | Identifier 35824MO | xsd 35825MO | token 35826MO | | 0..1 35828MO | |
| listAgency-SchemeID 35830MO | A 35831MO | CodeListAgency 35832MO | Scheme 35833MO | Identifier 35834MO | xsd 35835MO | token 35836MO | | 0..1 35838MO | |
| listAgency-SchemeAgencyID 35840MO | A 35841MO | CodeListAgency 35842MO | SchemeAgency 35843MO | Identifier 35844MO | xsd 35845MO | token 35846MO | | 0..1 35848MO | |

FIG. 358MO

| GDT | Cat. | Object Class | Property | Representation/ Association | Type | Type Name | Len. | Card. | Remarks |
|---|---|---|---|---|---|---|---|---|---|
| TransportationZone ID 35800MP | | TransportationZone 35804MP | Identification 35806MP | Identifier 35808MP | CCT 35810MP | Identifier 35812MP | 1..20 35814MP | | restricted 35818MP |

FIG. 358MP

| GDT | Cat. | Object Class | Property | Representation/ Association | Type | Type Name | Len. | Card. | Remarks |
|---|---|---|---|---|---|---|---|---|---|
| WorkAgreementTypeCode 35800MQ | | WorkAgreement 35804MQ | Type 35806MQ | Code 35808MQ | CCT 35810MQ | Code 35812MQ | 1..4 35814MQ | | restricted 35818MQ |

FIG. 358MQ

| GDT | | Cat. | Object Class | Property Qualifier | Property | Representation / Association | Type | Type Name | Len. | Card. | Remarks |
|---|---|---|---|---|---|---|---|---|---|---|---|
| WorkingDayCalendar Code 35800MR | | | WorkingDay Calendar 35801MR | | | Code 35804MR | CCT 35805MR | Code 35806MR | 1..6 35807MR | | restricted 35809MR |
| | listID 35810MR | A 35811MR | CodeList 35812MR | | Identification 35813MR | Identifier 35814MR | xsd 35815MR | token 35816MR | | 0..1 35818MR | |
| | listAgencyID 35820MR | A 35821MR | CodeListAgency 35822MR | | Identification 35823MR | Identifier 35824MR | xsd 35825MR | token 35826MR | | 0..1 35828MR | |
| | listVersionID 35830MR | A 35831MR | CodeList 35832MR | | Version 35833MR | Identifier 35834MR | xsd 35835MR | token 35836MR | | 0..1 35838MR | |
| | listAgency-SchemeID 35840MR | A 35841MR | CodeListAgency 35842MR | | Scheme 35843MR | Identifier 35844MR | xsd 35845MR | token 35846MR | | 0..1 35848MR | |
| | listAgency-SchemeAgencyID 35850MR | A 35851MR | CodeListAgency 35852MR | | SchemeAgency 35853MR | Identifier 35854MR | xsd 35855MR | token 35856MR | | 0..1 35858MR | |

FIG. 358MR

| GDT | Object Class | Property | Representation/ Association | Type | Type Name | Len. | Remarks |
|---|---|---|---|---|---|---|---|
| AddressPostalAddressID<br><br>35800OS | Address Postal Address<br><br>35802OS | Identification<br><br>35804OS | Identifier<br><br>35806OS | CCT<br><br>35808OS | Identifier<br><br>35810OS | 1..10<br><br>35812OS | Restricted<br><br>35814OS |

FIG. 358OS

| GDT | | Cat. | Object Class | Property | Representation/ Association | Type | Type Name | Len. | Card. |
|---|---|---|---|---|---|---|---|---|---|
| Address Representation Code 35800OT | | | Address 35801OT | Representation 35802OT | Code 35803OT | CCT 35804OT | Code 35805OT | 1 35806OT | |
| | listAgencyID 35820OT | A 35821OT | CodeListAgency 35822OT | Identification 35823OT | Identifier 35824OT | xsd 35825OT | token 35826OT | | 0..1 35828OT |
| | listVersionID 35830OT | A 35831OT | CodeList 35832OT | Version 35833OT | Identifier 35834OT | xsd 35835OT | token 35836OT | | 0..1 35838OT |
| | listAgency-SchemeID 35840OT | A 35841OT | CodeListAgency 35842OT | Scheme 35843OT | Identifier 35844OT | xsd 35845OT | token 35846OT | | 0..1 35848OT |
| | listAgency-SchemeAgencyID 35850OT | A 35851OT | CodeListAgency 35852OT | SchemeAgency 35853OT | Identifier 35854OT | xsd 35855OT | token 35856OT | | 0..1 35858OT |

FIG. 358OT

| GDT | Cat. | Object Class | Property | Representation/ Association | Type | Type Name | Len. | Card. | Remarks |
|---|---|---|---|---|---|---|---|---|---|
| BusinessSystemID 35800OU | | | Business System 35806OU | Identification 35808OU | Identifier 35810OU | CCT 35812OU | 1..60 35814OU | | |

FIG. 358OU

| CDT | | Cat. | Object Class | PropertyQualifier | Property | Representation/ Association | Type | Type Name | Card. |
|---|---|---|---|---|---|---|---|---|---|
| Business Transaction Document Party 35820OVi | | | Business Transaction Document Party 35821OVi | | | Details 35822OVi | | | |
| | InternalID 35823OVi | E 35827OVi | Business Transaction Document Party 35824OVi | Internal 35825OVi | Identification 35826OVi | Identifier 35828OVi | CDT 35830OVi | PartyInternalID 35831OVi | 0..1 35832OVi |
| | StandardID 35833OVi | E 35837OVi | Business Transaction Document Party 35834OVi | Standard 35835OVi | Identification 35836OVi | Identifier 35838OVi | CDT 35840OVi | PartyStandardID 35841OVi | 0..n 35842OVi |
| | BuyerID 35843OVi | E 35844OVi | Business Transaction Document Party 35845OVi | Buyer 35846OVi | Identification 35848OVi | Identifier 35850OVi | CDT 35851OVi | PartyPartyID 35852OVi | 0..1 35853OVi |
| | SellerID 35854OVi | E 35855OVi | Business Transaction Document Party 35856OVi | Seller 35857OVi | Identification 35858OVi | Identifier 35859OVi | CDT 35860OVi | PartyPartyID 35861OVi | 0..1 35862OVi |
| | ProductRecipientID 35863OVi | E 35864OVi | Business Transaction Document Party 35865OVi | Product Recipient 35866OVi | Identification 35867OVi | Identifier 35868OVi | CDT 35869OVi | PartyPartyID 35870OVi | 0..1 35871OVi |

FIG. 358OVi

| CDT | | Cat. | Object Class | Property Qualifier | Property | Representation/ Association | Type | Type Name | Card. |
|---|---|---|---|---|---|---|---|---|---|
| | VendorID 35823OVii | E 35827OVii | Business Transaction Document Party 35824OVii | Vendor 35825OVii | Identification 35826OVii | Identifier 35828OVii | CDT 35830OVii | PartyPartyID 35831OVii | 0..1 35832OVii |
| | BillToID 35833OVii | E 35837OVii | Business Transaction Document Party 35834OVii | BillTo 35835OVii | Identification 35836OVii | Identifier 35838OVii | CDT 35840OVii | PartyPartyID 35841OVii | 0..1 35842OVii |
| | BillFromID 35843OVii | E 35844OVii | Business Transaction Document Party 35845OVii | BillFrom 35846OVii | Identification 35848OVii | Identifier 35850OVii | CDT 35851OVii | PartyPartyID 35852OVii | 0..1 35853OVii |

FIG. 358OVii

| CDT | | Cat. | Object Class | Property Qualifier | Property | Representation/ Association | Type | Type Name | Card. |
|---|---|---|---|---|---|---|---|---|---|
| | BidderID 35823OViii | E 35824OViii | Business Transaction Document Party 35825OViii | Bidder 35826OViii | Identification 35828OViii | Identifier 35830OViii | CDT 35831OViii | PartyPartyID 35832OViii | 0..1 35833OViii |
| | TaxID 35834OViii | | Business Transaction Document Party 35835OViii | | TaxIdentification 35836OViii | Identifier 35838OViii | GDT 35840OViii | PartyTaxID 35841OViii | 0..1 35842OViii |
| | Address 35843OViii | E 35844OViii | Business Transaction Document Party 35845OViii | | Address 35848OViii | Address 35850OViii | GDT 35851OViii | Address 35852OViii | 0..1 35853OViii |
| | ContactPerson 35854OViii | E 35855OViii | Business Transaction Document Party 35856OViii | | Contact Person 35858OViii | ContactPerson 35859OViii | GDT 35860OViii | ContactPerson 35861OViii | 0..1 35862OViii |

FIG. 358OViii

| GDT | | Cat. | Object Class | Property | Rep./ Ass. | Type | Type Name | Card. |
|---|---|---|---|---|---|---|---|---|
| CommunicationAddressUsage 35800OW | | | Communication Address Usage 35801OW | | Details 35804OW | | | |
| | Code 35810OW | E 35811OW | Communication Address Usage 35812OW | Usage 35813OW | Code 35814OW | GDT 35815OW | CommunicationAddressUsageCode 35816OW | 1 35818OW |
| | ValidityPeriod 35820OW | E 35821OW | Communication Address Usage 35822OW | Validity 35823OW | Date Period 35824OW | GDT 35825OW | DatePeriod 35826OW | 0..1 35828OW |

FIG. 358OW

| GDT | | Cat. | Object Class | Property | Representation/ Association | Type | Type Name | Len. | Card. |
|---|---|---|---|---|---|---|---|---|---|
| Communication Address Usage Code 35800OX | | | Address 35801OX | Representation 35802OX | Code 35803OX | CCT 35804OX | Code 35805OX | 1 35806OX | Restricted |
| | listAgencyID 35820OX | A 35821OX | CodeListAgency 35822OX | Identification 35823OX | Identifier 35824OX | xsd 35825OX | token 35826OX | | 0..1 35828OX |
| | listVersionID 35830OX | A 35831OX | CodeList 35832OX | Version 35833OX | Identifier 35834OX | xsd 35835OX | token 35836OX | | 0..1 35838OX |
| | listAgency-SchemeID 35840OX | A 35841OX | CodeListAgency 35842OX | Scheme 35843OX | Identifier 35844OX | xsd 35845OX | token 35846OX | | 0..1 35848OX |
| | listAgency-SchemeAgencyID 35850OX | A 35851OX | CodeListAgency 35852OX | SchemeAgency 35853OX | Identifier 35854OX | xsd 35855OX | token 35856OX | | 0..1 35858OX |

FIG.358OX

| GDT | Property | Representation/ Association | Type | Type Name | Len. | Remarks |
|---|---|---|---|---|---|---|
| CriticalityCode 35800OY | Criticality 35802OY | Code 35804OY | CCT 35806OY | Code 35808OY | 1 35810OY | restricted 35812OY |

FIG.358OY

| GDT | | Cat. | Object Class | Property | Representation/ Association | Type | Type Name | Length | Card. | Remarks |
|---|---|---|---|---|---|---|---|---|---|---|
| Customer Transaction Document ReasonCode 35800OZ | | | Customer Transaction Document Reason 35802OZ | | Code 35804OZ | CCT 35806OZ | Code 35808OZ | 1..4 35810OZ | | Restricted 35812OZ |
| | listAgencyID 35814OZ | A 35816OZ | CodeList Agency 35818OZ | Identification 35820OZ | Identifier 35822OZ | xsd 35824OZ | token 35826OZ | | 0..1 35828OZ | |
| | listVersionID 35830OZ | A 35832OZ | CodeList 35834OZ | Version 35836OZ | Identifier 35838OZ | xsd 35840OZ | token 35842OZ | | 0..1 35844OZ | |
| | listAgency SchemeID 35846OZ | A 35848OZ | CodeList Agency 35850OZ | Scheme 35852OZ | Identifier 35854OZ | xsd 35856OZ | token 35858OZ | | 0..1 35860OZ | |
| | listAgency Scheme AgencyID 35862OZ | A 35864OZ | CodeList Agency 35866OZ | Scheme Agency 35868OZ | Identifier 35870OZ | xsd 35872OZ | token 35874OZ | | 0..1 35876OZ | |

FIG. 358OZ

| GDT | Cat. | Object Class | Property | Representation / Association | Type | Type Name | Len. | Card. | Remarks |
|---|---|---|---|---|---|---|---|---|---|
| HouseID 35800PA | | House 35802PA | Identification 35804PA | Identifier 35806PA | CCT 35808PA | Identifier 35810PA | 1..10 35812PA | | Restricted 35814PA |

FIG. 358PA

| GDT | Cat. | Object Class | Property | Representation/ Association | Type | Type Name | Len. | Card. | Remarks |
|---|---|---|---|---|---|---|---|---|---|
| Inventory Movement Direction Code 35800PB | | Inventory Movement 35802PB | Direction 35804PB | Code 35806PB | CCT 35808PB | Code 35810PB | 1 35812PB | | restricted 35814PB |

FIG. 358PB

| GDT | | Cat. | Object Class | Property | Representation/ Association | Type | Type Name | Len. | Card. | Remarks |
|---|---|---|---|---|---|---|---|---|---|---|
| Opportunity GroupCode 35800PC | | | Opportunity 35802PC | Group 35804PC | Code 35806PC | CCT 35808PC | Code 35810PC | 1…4 35812PC | | |
| | ListID 35816PC | A 35818PC | CodeList 35820PC | Identification 35822PC | Identifier 35824PC | xsd 35826PC | token 35828PC | | 0..1 35830PC | |
| | List AgencyID 35832PC | A 35834PC | CodeList Agency 35836PC | Identification 35838PC | Identifier 35840PC | xsd 35842PC | token 35844PC | | 0..1 35846PC | |
| | List VersionID 35848PC | A 35850PC | CodeList 35852PC | Version 35854PC | Identifier 35856PC | xsd 35858PC | token 35860PC | | 0..1 35862PC | |
| | listAgency SchemeID 35864PC | A 35866PC | CodeList Agency 35868PC | Scheme 35870PC | Identifier 35872PC | xsd 35874PC | token 35876PC | | 0..1 35878PC | |
| | listAgency Scheme AgencyID 35880PC | A 35882PC | CodeList Agency 35884PC | Scheme Agency 35886PC | Identifier 35888PC | xsd 35890PC | token 35892PC | | 0..1 35894PC | |

FIG. 358PC

| GDT | | Cat. | Object Class | Property | Representation/ Association | Type | Type Name | Length | Card. | Remarks |
|---|---|---|---|---|---|---|---|---|---|---|
| Opportunity Origin TypeCode 35800PD | | | Opportunity 35802PD | OriginType 35804PD | Code 35806PD | CCT 35808PD | Code 35810PD | 1…3 35812PD | | |
| | ListID 35816PD | A 35818PD | CodeList 35820PD | Identification 35822PD | Identifier 35824PD | xsd 35826PD | token 35828PD | | 0..1 35830PD | |
| | List AgencyID 35832PD | A 35834PD | CodeList Agency 35836PD | Identification 35838PD | Identifier 35840PD | xsd 35842PD | token 35844PD | | 0..1 35846PD | |
| | List VersionID 35848PD | A 35850PD | CodeList 35852PD | Version 35854PD | Identifier 35856PD | xsd 35858PD | token 35860PD | | 0..1 35862PD | |
| | listAgency SchemeID 35864PD | A 35866PD | CodeList Agency 35868PD | Scheme 35870PD | Identifier 35872PD | xsd 35874PD | token 35876PD | | 0..1 35878PD | |
| | listAgency Scheme AgencyID 35880PD | A 35882PD | CodeList Agency 35884PD | Scheme Agency 35886PD | Identifier 35888PD | xsd 35890PD | token 35892PD | | 0..1 35894PD | |

FIG. 358PD

| GDT | | Cat. | Object Class | Property | Representation/ Association | Type | Type Name | Len. | Card. | Remarks |
|---|---|---|---|---|---|---|---|---|---|---|
| PersonName FormatCode 35800PE | | | | Person Name Format 35802PE | Code 35804PE | CCT 35806PE | Code 35808PE | 1..2 35810PE | | |
| | ListID 35816PE | A 35818PE | CodeList 35820PE | Identification 35822PE | Identifier 35824PE | xsd 35826PE | token 35828PE | | 0..1 35830PE | |
| | listAgencyID 35832PE | A 35834PE | CodeList Agency 35836PE | Identification 35838PE | Identifier 35840PE | xsd 35842PE | token 35844PE | | 0..1 35846PE | |
| | listVersionID 35848PE | A 35850PE | CodeList 35852PE | Version 35854PE | Identifier 35856PE | xsd 35858PE | token 35860PE | | 0..1 35862PE | |
| | listAgency SchemeID 35864PE | A 35866PE | CodeList Agency 35868PE | Scheme 35870PE | Identifier 35872PE | xsd 35874PE | token 35876PE | | 0..1 35878PE | |
| | listAgency Scheme AgencyID 35880PE | A 35882PE | CodeList Agency 35884PE | Scheme Agency 35886PE | Identifier 35888PE | xsd 35890PE | token 35892PE | | 0..1 35894PE | |

FIG. 358PE

| GDT | Cat. | Object Class | Property | Representation/ Association | Type | Type Name | Length | Card. | Remarks |
|---|---|---|---|---|---|---|---|---|---|
| PriceComponent FixationCode 35800PF | | PriceComponent 35802PF | Fixation 35804PF | Code 35806PF | CCT 35808PF | Code 35810PF | 1..2 35812PF | | Restricted 35814PF |

FIG. 358PF

| GDT | Cat. | Object Class | Property | Representation/ Association | Type | Type Name | Length | Card. | Remarks |
|---|---|---|---|---|---|---|---|---|---|
| PriceComponent Item Hierarchy Evaluation MethodCode 35800PG | | Price Com- ponent 35802PG | ItemHierarchy EvaluationMethod 35804PG | Code 35806PG | CCT 35808PG | Code 35810PG | 1..2 35812PG | | Restricted 35814PG |

FIG. 358PG

| GDT | Cat. | Object Class | Property | Representation/ Association | Type | Type Name | Length | Card. | Remarks |
|---|---|---|---|---|---|---|---|---|---|
| PriceComponent OriginCode 35800PH | | Price Component 35802PH | Origin 35804PH | Code 35806PH | CCT 35808PH | Code 35810PH | 1..2 35812PH | | Restricted 35814PH |

FIG. 358PH

| GDT | Cat. | Object Class | Property | Representation/ Association | Type | Type Name | Length | Card. | Remarks |
|---|---|---|---|---|---|---|---|---|---|
| Priority Code 35800PI | | | PriorityCode 35802PI | Code 35804PI | CCT 35806PI | Code 35808PI | 1 35810PI | | restricted 35812PI |

FIG. 358PI

| GDT | | Cat. | Object Class | Property | Representation/ Association | Type | Type Name | Length | Card. | Remarks |
|---|---|---|---|---|---|---|---|---|---|---|
| Price Specifiction GroupCode 35800PJ | | | Price Specification 35802PJ | Group 35804PJ | Code 35806PJ | CCT 35808PJ | Code 35810PJ | 1..3 35812PJ | | Restricted 35814PJ |
| | ListID 35816PJ | A 35818PJ | CodeList 35820PJ | Identification 35822PJ | Identifier 35824PJ | xsd 35826PJ | token 35828PJ | | 0..1 35830PJ | |
| | List AgencyID 35832PJ | A 35834PJ | CodeList Agency 35836PJ | Identification 35838PJ | Identifier 35840PJ | xsd 35842PJ | token 35844PJ | | 0..1 35846PJ | |
| | List VersionID 35848PJ | A 35850PJ | CodeList 35852PJ | Version 35854PJ | Identifier 35856PJ | xsd 35858PJ | token 35860PJ | | 0..1 35862PJ | |
| | listAgency SchemeID 35864PJ | A 35866PJ | CodeList Agency 35868PJ | Scheme 35870PJ | Identifier 35872PJ | xsd 35874PJ | token 35876PJ | | 0..1 35878PJ | |
| | listAgency Scheme AgencyID 35880PJ | A 35882PJ | CodeList Agency 35884PJ | Scheme Agency 35886PJ | Identifier 35888PJ | xsd 35890PJ | token 35892PJ | | 0..1 35894PJ | |

FIG. 358PJ

| GDT | Cat. | Object Class | Property | Representation/ Association | Type | Type Name | Len. | Card. | Remarks |
|---|---|---|---|---|---|---|---|---|---|
| Product Category HierarchyID 35800PK | | Product Category Hierarchy 35802PK | Identification 35804PK | Identifier 35806PK | GDT 35808PK | Identifier 35810PK | 1..10 35812PK | | Restricted 35814PK |

FIG. 358PK

| GDT | | Cat. | Object Class | Property | Representation/ Association | Type | Type Name | Length | Card. | Remarks |
|---|---|---|---|---|---|---|---|---|---|---|
| Product Relationship TypeCode 35800PL | | | Product. 35801PL | Type 35802PL | Code 35804PL | CCT 35806PL | Code 35808PL | 1..6 35810PL | | Restricted 35812PL |
| | List AgencyID 35814PL | A 35816PL | CodeList Agency 35818PL | Identification 35820PL | Identifier 35822PL | xsd 35824PL | token 35826PL | | 0..1 35828PL | |
| | List VesionID 35830PL | A 35832PL | CodeList 35834PL | Version 35836PL | Identifier 35838PL | xsd 35840PL | token 35842PL | | 0..1 35844PL | |
| | listAgency SchemeID 35846PL | A 35848PL | CodeList Agency 35850PL | Scheme 35852PL | Identifier 35854PL | xsd 35856PL | token 35858PL | | 0..1 35860PL | |
| | listAgency Scheme AgencyID 35862PL | A 35864PL | CodeList Agency 35866PL | Scheme Agency 35868PL | Identifier 35870PL | xsd 35872PL | token 35874PL | | 0..1 35876PL | |

FIG. 358PL

| GDT | | | Cat. | Object Class | Property | Representation/ Association | Type | Type Name | Len. | Card. | Remarks |
|---|---|---|---|---|---|---|---|---|---|---|---|
| Quantity Ratio 35800PM | | | | Quantity Ratio 35802PM | | Details 35804PM | | | | | |
| | Quantity 35806PM | | E 35808PM | Quantity Ratio 35810PM | Quantity 35812PM | Quantity 35814PM | GDT 35816PM | Quantity 35818PM | | 1 35820PM | Restricted 35821PM |
| | | UnitCode 35822PM | A 35824PM | Quantity Ratio 35826PM | Unit 35828PM | Code 35830PM | GDT 35832PM | Measure UnitCode 35834PM | | 1 35836PM | |
| | Corresponding Quantity 35838PM | | E 35840PM | Quantity Ratio 35842PM | Corresponding Quantity 35844PM | Quantity 35846PM | GDT 35848PM | Quantity 35850PM | | 1 35852PM | Restricted 35853PM |
| | | UnitCode 35854PM | A 35856PM | Quantity Ratio 35858PM | Unit 35860PM | Code 35862PM | GDT 35864PM | Measure UnitCode 35866PM | | 1 35868PM | |

FIG. 358PM

| GDT | | Cat. | Object Class | Property | Representation/ Association | Type | Type Name | Length | Card. | Remarks |
|---|---|---|---|---|---|---|---|---|---|---|
| SalesCycle Phase StepCode 35800PN | | | SalesCycle Phase 35801PN | Step 35802PN | Code 35804PN | CCT 35806PN | Code 35808PN | 1..3 35810PN | | Restricted 35812PN |
| | List AgencyID 35814PN | A 35816PN | CodeList Agency 35818PN | Identificati on 35820PN | Identifier 35822PN | xsd 35824PN | token 35826PN | | 0..1 35828PN | |
| | List VersionID 35830PN | A 35832PN | CodeList 35834PN | Version 35836PN | Identifier 35838PN | xsd 35840PN | token 35842PN | | 0..1 35844PN | |
| | listAgency SchemeID 35846PN | A 35848PN | CodeList Agency 35850PN | Scheme 35852PN | Identifier 35854PN | xsd 35856PN | token 35858PN | | 0..1 35860PN | |
| | listAgency Scheme AgencyID 35862PN | A 35864PN | CodeList Agency 35866PN | Scheme Agency 35868PN | Identifier 35870PN | xsd 35872PN | token 35874PN | | 0..1 35876PN | |

FIG. 358PN

| GDT | Cat. | Object Class | Property | Representation/ Association | Type | Type Name | Length | Card. | Remarks |
|---|---|---|---|---|---|---|---|---|---|
| Supply Planning AreaID 35800PO | | Supply Planning Area 35802PO | Identification 35804PO | Identifier 35806PO | CCT 35808PO | Identifier 35810PO | 1..20 35812PO | | restricted 35814PO |

FIG. 358PO

| GDT | Cat. | Object Class | Property Qualifier | Property | Representation/ Association | Type | Type Name | Len. | Card. | Remarks |
|---|---|---|---|---|---|---|---|---|---|---|
| ChequeLotIID 35800PP | | Check Lot 35802PP | | Identification 35804PP | Identifier 35806PP | CCT 35808PP | Identifier 35810PP | 1..8 35812PP | | Restricted 35814PP |

FIG. 358PP

| GDT | Cat. | Object Class | Property | Representation/ Association | Type | Type Name | Length | Card. | Remarks |
|---|---|---|---|---|---|---|---|---|---|
| Enterprise Accommodation Reimbursement Expense Reporter GroupCode 35800PQ | | Enterprise AccommodationReimbursement Expense Reporter Group 35802PQ | | Code 35804PQ | CCT 35806PQ | Code 35808PQ | 1..2 35810PQ | | restricted 35812PQ |

FIG. 358PQ

| GDT | | Cat. | Object Class | Property | Representation / Association | Type | Type Name | Len. | Card. | Remarks |
|---|---|---|---|---|---|---|---|---|---|---|
| HouseID 35800PR | | | House 35802PR | Identification 35804PR | Identifier 35806PR | CCT 35808PR | Identifier 35810PR | 1..10 35812PR | | Restricted 35814PR |

FIG. 358PR

| GDT | | Cat. | Object Class | Property | Representation/ Association | Type | Type Name | Len. | Card. | Remarks |
|---|---|---|---|---|---|---|---|---|---|---|
| GeneralLedgerAccountTypeCode 35800PS | | | General Ledger Account 35802PS | Type 35804PS | Code 35806PS | CCT 35808PS | Code 35810PS | 1..6 35812PS | | restricted 35814PS |

FIG. 358PS

| GDT | Cat. | Object Class | Property | Representation/ Association | Type | Type Name | Len. | Card. | Remarks |
|---|---|---|---|---|---|---|---|---|---|
| InventoryMovement DirectionCode 35800PU | | Inventory Movement 35804PU | Direction 35806PU | Code 35808PU | CCT 35810PU | Code 35812PU | 1 35814PU | | restricted 35818PU |

FIG. 358PU

| GDT | Cat. | Object Class | Property Qualifier | Property | Representation / Association | Type | Type Name | Len. | Card. | Remarks |
|---|---|---|---|---|---|---|---|---|---|---|
| ProfitCentreID 35800PT | | ProfitCentre 35801PT | | Identification 35803PT | Identifier 35804PT | CCT 35805PT | Identifier 35806PT | 1..32 35807PT | | restricted 35809PT |
| schemeID 35810PT | A 35811PT | Identification Scheme 35812PT | | Identification 35813PT | Identifier 35814PT | XSD 35815PT | Token 35816PT | 60 35817PT | 0..1 35818PT | |
| schemeAgencyID 35820PT | A 35821PT | Identification SchemeAgency 35822PT | | Identification 35823PT | Identifier 35824PT | XSD 35825PT | Token 35826PT | 60 35827PT | 0..1 35828PT | |

FIG. 358PT

| GDT | Object Class | Representation/ Association | Type | Type Name | Len. | Card. | Remarks |
|---|---|---|---|---|---|---|---|
| StatutoryAccommodationReimbursementExpenseReporterGroupCode<br>35800PV | Statutory_AccommodationReimbursement_ExpenseReporterGroup<br>35804PV | Code<br>35808PV | CCT<br>35810PV | Code<br>35812PV | 1..2<br>35814PV | | restricted<br>35818PV |

FIG. 358PV

| GDT | Cat. | Object Class | Property Qualifier | Property | Representation / Association | Type | Type Name | Len. | Card. | Remarks |
|---|---|---|---|---|---|---|---|---|---|---|
| InspectionSample TypeCode 35800PW | | Inspection SampleType 35801PW | | | Code 35804PW | xsd 35805PW | Token 35806PW | 1..3 35807PW | | restricted 35809PW |
| listAgencyID 35810PW | A 35811PW | CodeListAgency 35812PW | | Identification 35813PW | Identifier 35814PW | xsd 35815PW | token 35816PW | | 0..1 35818PW | |
| listVersionID 35820PW | A 35821PW | CodeList 35822PW | | Version 35823PW | Identifier 35824PW | xsd 35825PW | token 35826PW | | 0..1 35828PW | |
| listAgency-SchemeID 35830PW | A 35831PW | CodeListAgency 35832PW | | Scheme 35833PW | Identifier 35834PW | xsd 35835PW | token 35836PW | | 0..1 35838PW | |
| listAgency-SchemeAgencyID 35840PW | A 35841PW | CodeListAgency 35842PW | | SchemeAgency 35843PW | Identifier 35844PW | xsd 35845PW | token 35846PW | | 0..1 35848PW | |

FIG. 358PW

| GDT | | Cat. | Object Class | Property | Representation/ Association | Type | Type Name | Length | Card. | Remarks |
|---|---|---|---|---|---|---|---|---|---|---|
| Inspection Container TypeCode 35800PX | | | Inspection 35802PX | | Code 35804PX | xsd 35806PX | token 35808PX | 1..15 35810PX | | Restricted 35812PX |
| | List AgencyID 35814PX | A 35816PX | CodeList Agency 35818PX | Identification 35820PX | Identifier 35822PX | xsd 35824PX | token 35826PX | | 0..1 35828PX | |
| | List VersionID 35830PX | A 35832PX | CodeList 35834PX | Version 35836PX | Identifier 35838PX | xsd 35840PX | token 35842PX | | 0..1 35844PX | |
| | listAgency SchemeID 35846PX | A 35848PX | CodeList Agency 35850PX | Scheme 35852PX | Identifier 35854PX | xsd 35856PX | token 35858PX | | 0..1 35860PX | |
| | listAgency Scheme AgencyID 35862PX | A 35864PX | CodeList Agency 35866PX | Scheme Agency 35868PX | Identifier 35870PX | xsd 35872PX | token 35874PX | | 0..1 35876PX | |

FIG. 358PX

| GDT | | Cat. | Object Class | Property | Representation/ Association | Type | Type Name | Length | Card. | Remarks |
|---|---|---|---|---|---|---|---|---|---|---|
| Inspection Decision Code 35800PY | | | Inspection Decision 35802PY | | Code 35804PY | xsd 35806PY | Token 35808PY | 1..15 35810PY | | Restricted 35812PY |
| | List AgencyID 35814PY | A 35816PY | CodeList Agency 35818PY | Identification 35820PY | Identifier 35822PY | xsd 35824PY | token 35826PY | | 0..1 35828PY | |
| | List VersionID 35830PY | A 35832PY | CodeList 35834PY | Version 35836PY | Identifier 35838PY | xsd 35840PY | token 35842PY | | 0..1 35844PY | |
| | listAgency SchemeID 35846PY | A 35848PY | CodeList Agency 35850PY | Scheme 35852PY | Identifier 35854PY | xsd 35856PY | token 35858PY | | 0..1 35860PY | |
| | listAgency Scheme AgencyID 35862PY | A 35864PY | CodeList Agency 35866PY | Scheme Agency 35868PY | Identifier 35870PY | xsd 35872PY | token 35874PY | | 0..1 35876PY | |

FIG. 358PY

| GDT | | Cat. | Object Class | Property | Representation/ Association | Type | Type Name | Len. | Card. | Remarks |
|---|---|---|---|---|---|---|---|---|---|---|
| Inspection Decision CodeListID 35800PZ | | | Inspection Decision CodeList 35802PZ | Identification 35804PZ | Identifier 35806PZ | CCT 35808PZ | Identifier 35810PZ | 1..15 35812PZ | | Restricted 35814PZ |
| | SchemeID 35816PZ | A 35818PZ | Identification Scheme 35820PZ | Identification 35822PZ | Identifier 35824PZ | xsd 35826PZ | token 35828PZ | 1..60 35830PZ | 0..1 35832PZ | |
| | Scheme AgencyID 35834PZ | A 35836PZ | Identification Scheme-Agency 35838PZ | Identification 35840PZ | Identifier 35842PZ | xsd 35844PZ | token 35846PZ | 1..60 35848PZ | 0..1 35850PZ | |

FIG. 358PZ

| GDT | | Cat. | Object Class | Property | Representation Association | Type | Type Name | Len. | Card. | Remarks |
|---|---|---|---|---|---|---|---|---|---|---|
| InspectionSampleCategory Code 35800QA | | | InspectionSampleCategory 35802QA | | Code 35804QA | xsd 35806QA | Token 35808QA | 1..3 35810QA | | Restricted 35812QA |
| | listVersion ID 35814QA | A 35816QA | CodeList 35818QA | Version 35820QA | Identifier 35822QA | xsd 35824QA | Token 35826QA | | 0..1 35828QA | |

FIG. 358QA

| GDT | | Cat. | Object Class | Property | Represen-tation/ As-sociation | Type | Type Name | Len. | Card. | Remarks |
|---|---|---|---|---|---|---|---|---|---|---|
| InspectionSampleType Code 35800QB | . | | Inspection SampleType 35801QB | | Code 35802QB | xsd 35803QB | Token 35804QB | 1..3 35805QB | | Restricted 35806QB |
| | listAgencyID 35807QB | A 35808QB | CodeListAgency 35809QB | Identification 35810QB | Identifier 35811QB | xsd 35812QB | token 35813QB | | 0..1 35815QB | |
| | listVersionID 35816QB | A 35818QB | CodeList 35820QB | Version 35821QB | Identifier 35822QB | xsd 35823QB | token 35824QB | | 0..1 35825QB | |
| | listAgency-SchemeID 35826QB | A 35828QB | CodeListAgency 35830QB | Scheme 35831QB | Identifier 35832QB | xsd 35833QB | token 35834QB | | 0..1 35835QB | |
| | listAgency-SchemeAgencyID 35836QB | A 35838QB | CodeListAgency 35840QB | SchemeAgency 35841QB | Identifier 35842QB | xsd 35843QB | token 35844QB | | 0..1 35845QB | |

FIG. 358QB

| GDT | Cat. | Object Class | Property | Representation / Association | Type | Type Name | Len. | Card. | Remarks |
|---|---|---|---|---|---|---|---|---|---|
| InspectionSubsetID 35800QC | | InspectionSubset 35801QC | Identification 35803QC | Identifier 35804QC | xsd 35805QC | token 35806QC | 1..35 35807QC | | restricted 35809QC |
| SchemeID 35810QC | A 35811QC | IdentificationScheme 35812QC | Identification 35813QC | Identifier 35814QC | xsd 35815QC | token 35816QC | 1..60 35817QC | 0..1 35818QC | |
| SchemeAgencyID 35820QC | A 35821QC | IdentificationScheme-Agency 35822QC | Identification 35823QC | Identifier 35824QC | xsd 35825QC | token 35826QC | 1..60 35827QC | 0..1 35828QC | |

FIG. 358QC

| GDT | Cat. | Object Class | Property Qualifier | Property | Representation / Association | Type | Type Name | Len. | Card. | Remarks |
|---|---|---|---|---|---|---|---|---|---|---|
| InspectionSubset TypeCode 35800QD | | Inspection SubsetType 35801QD | | | Code 35804QD | xsd 35805QD | Token 35806QD | 1..3 35807QD | | restricted 35809QD |
| listAgencyID 35810QD | A 35811QD | CodeListAgency 35812QD | | Identification 35813QD | Identifier 35814QD | xsd 35815QD | token 35816QD | | 0..1 35818QD | |
| listVersionID 35820QD | A 35821QD | CodeList 35822QD | | Version 35823QD | Identifier 35824QD | xsd 35825QD | token 35826QD | | 0..1 35828QD | |
| listAgency-SchemeID 35830QD | A 35831QD | CodeListAgency 35832QD | | Scheme 35833QD | Identifier 35834QD | xsd 35835QD | token 35836QD | | 0..1 35838QD | |
| listAgency-SchemeAgencyID 35840QD | A 35841QD | CodeListAgency 35842QD | | SchemeAgency 35843QD | Identifier 35844QD | xsd 35845QD | token 35846QD | | 0..1 35848QD | |

FIG. 358QD

| GDT | | Cat. | Object Class | Property Qualifier | Property | Representation / Association | Type | Type Name | Len. | Card. | Remarks |
|---|---|---|---|---|---|---|---|---|---|---|---|
| InspectionTypeCode 35800QE | | | InspectionType 35801QE | | | Code 35804QE | XSD 35805QE | Token 35806QE | 1..4 35807QE | | restricted 35809QE |
| | listAgencyID 35810QE | A 35811QE | CodeListAgency 35812QE | | Identification 35813QE | Identifier 35814QE | xsd 35815QE | token 35816QE | | 0..1 35818QE | |
| | listVersionID 35820QE | A 35821QE | CodeList 35822QE | | Version 35823QE | Identifier 35824QE | xsd 35825QE | token 35826QE | | 0..1 35828QE | |
| | listAgency-SchemeID 35830QE | A 35831QE | CodeListAgency 35832QE | | Scheme 35833QE | Identifier 35834QE | xsd 35835QE | token 35836QE | | 0..1 35838QE | |
| | listAgency-SchemeAgencyID 35840QE | A 35841QE | CodeListAgency 35842QE | | SchemeAgency 35843QE | Identifier 35844QE | xsd 35845QE | token 35846QE | | 0..1 35848QE | |

FIG. 358QE

| GDT | Cat. | Object Class | Property | Representation / Association | Type | Type Name | Len. | Card. | Remarks |
|---|---|---|---|---|---|---|---|---|---|
| CostCentreID 35800QF | | CostCentre 35801QF | Identification 35803QF | Identifier 35804QF | CCT 35805QF | Identifier 35806QF | 1..32 35807QF | | restricted 35809QF |
| schemeID 35810QF | A 35811QF | IdentificationScheme 35812QF | Identification 35813QF | Identifier 35814QF | XSD 35815QF | Token 35816QF | 60 35817QF | 0..1 35818QF | |
| schemeAgencyID 35820QF | A 35821QF | IdentificationScheme Agency 35822QF | Identification 35823QF | Identifier 35824QF | XSD 35825QF | Token 35826QF | 60 35827QF | 0..1 35828QF | |

FIG. 358QF

| GDT | Cat. | Object Class | Property | Representation / Association | Type | Type Name | Len. | Card. | Remarks |
|---|---|---|---|---|---|---|---|---|---|
| TaxDeclarationKey NumberTypeCode 35800QG | E 35802QG | Tax Declaration 35801QG | Key Number Type 35803QG | Code 35804QG | CCT 35805QG | Code 35806QG | 1..10 35807QG | | restricted 35809QG |
| listID 35810QG | A 35811QG | Code List 35812QG | Identification 35813QG | Identifier 35814QG | xsd 35815QG | token 35816QG | 3..4 35817QG | 0..1 35818QG | |
| listVersionID 35820QG | A 35821QG | Code List 35822QG | Version 35823QG | Identifier 35824QG | xsd 35825QG | token 35826QG | 1..6 35827QG | 0..1 35828QG | |

| Package 36100 | level 1 36102 | level 2 36104 | level 3 36106 | level 4 36108 | level 5 36110 | level 6 36112 | level 7 36114 | Card 36116 | DataType Name 36118 | |
|---|---|---|---|---|---|---|---|---|---|---|
| CatalogueUpdateMessage 36120 | CataloguePublicationMessage 36122 | | | | | | | | MDT 36124 | CatalogueUpdateMessage 36126 |
| MessageHeader 36128 | | MessageHeader 36130 | | | | | | 1 36132 | GDT 36134 | BusinessDocumentMessageHeader 36136 |
| | | | ID 36138 | | | | | 1 36140 | GDT 36142 | BusinessDocumentMessageID 36144 |

Fig. 361B

CatalogueUpdateMessage 36120

| | | | | | | | | | | |
|---|---|---|---|---|---|---|---|---|---|---|
| MessageHeader 36128 | | | CreationDateTime 36146 | | | | | 1 36148 | GDT 36150 | DateTime 36152 |
| | | | SenderParty 36154 | | | | | 0..1 36156 | GDT 36158 | BusinessDocumentMessageHeaderParty 36160 |
| TransmissionInformation 36162 | | TransmissionHeader 36164 | | | | | | 0..1 36166 | | BusinessDocumentTransmissionHeader 36170 |
| | | | ID 36172 | | | | | 1 36174 | GDT 36176 | TransmissionID 36178 |
| | | | PackageOrdinalNumberValue 36180 | | | | | 1 36182 | GDT 36184 | OrdinalNumberValue 36186 |

Fig. 361C

CatalogueUpdateMessage 36120

| | | | | | | | | | | |
|---|---|---|---|---|---|---|---|---|---|---|
| TransmissionInformation 36162 | | | PackageTotalNumberValue 36188 | | | | | 0..1 36190 | GDT 36192 | TotalNumberValue 36194 |
| | | | MinimumRequestedLogItemSeverityCode 36196 | | | | | 0..1 36198 | GDT 36100A | LogItemSeverityCode 36102A |
| Catalogue 36104A | | Catalogue 36106A | | | | | | 1 36108A | | TransmissionCatalogue 36112A |
| | | | @actionCode 36114A | | | | | 0..1 36116A | GDT 36118A | ActionCode 36120A |
| | | | @completeTransmissionIndicator 36122A | | | | | 0..1 36124A | GDT 36126A | CompleteTransmissionIndicator 36128A |

Fig. 361D

CatalogueUpdateMessage 36120

| | | | | | | | | | | |
|---|---|---|---|---|---|---|---|---|---|---|
| Catalogue 36104A | | | @providerPropertyValuationListCompleteTransmissionIndicator 36130A | | | | | 0..1 36132A | GDT 36134A | CompleteTransmissionIndicator 36136A |
| | | | @languageCode 36138A | | | | | 0..1 36140A | GDT 36142A | LanguageCode 36144A |
| | | | @currencyCode 36146A | | | | | 0..1 36148A | GDT 36150A | CurrencyCode 36152A |
| | | | @unitCode 36154A | | | | | 0..1 36156A | GDT 36158A | MeasureUnitCode 36160A |
| | | | ID 36162A | | | | | 1 36164A | GDT 36166A | CatalogueID 36168A |
| | | | VersionID 36170A | | | | | 0..1 36172A | GDT 36174A | VersionID 36176A |

Fig. 361E

CatalogueUpdateMessage 36120

| | | | | | | | | | | |
|---|---|---|---|---|---|---|---|---|---|---|
| Catalogue 36104A | | | Name 36178A | | | | | 0..n 36180A | GDT 36182A | Name 36184A |
| | | | TypeCode 36186A | | | | | 1 36188A | GDT 36190A | CatalogueTypeCode 36192A |
| | | | ValidityPeriod 36194A | | | | | 0..1 36196A | GDT 36198A | DateTimePeriod 36100B |
| | | | | StartDateTime 36102B | | | | 0..1 36104B | GDT 36106B | DateTime 36108B |
| | | | | EndDateTime 36110B | | | | 0..1 36112B | GDT 36114B | DateTime 36116B |
| GlobalInformation 36118B | | | ProviderPropertyValuation 36120B | | | | | 0..n 36122B | GDT 36124B | PropertyValuation 36126B |

Fig. 361F

CatalogueUpdateMessage 36120

Catalogue 36104A

| | | | | | | | | | | |
|---|---|---|---|---|---|---|---|---|---|---|
| GlobalInformation 36118B | | | | @actionCode 36128B | | | | 0..1 36130B | GDT 36132B | ActionCode 36134B |
| | | | | PropertyReference 36136B | | | | 1 36138B | GDT 36140B | PropertyReference 36142B |
| | | | | | ID 36144B | | | 1 36146B | GDT 36148B | PropertyID 36150B |
| | | | | ValueGroup 36152B | | | | 1..n 36154B | GDT 36156B | PropertyValueIterator 36158B |
| | | | | | ID 36160B | | | 0..1 36162B | CCT 36164B | Identifier 36166B |
| | | | | | ParentID 36168B | | | 0..1 36170B | CCT 36172B | Identifier 36174B |

Fig. 361G

CatalogueUpdateMessage 36120

Catalogue 36104A

| | | | | | | | | | | |
|---|---|---|---|---|---|---|---|---|---|---|
| GlobalInformation 36118B | | | | | OrdinalNumberValue 36176B | | | 0..1 36178B | GDT 36180B | OrdinalNumberValue 36182B |
| | | | | | PropertyValue 36184B | | | 0..n 36186B | GDT 36188B | PropertyValue 36190B |
| | | | | | | AmountSpecification 36192B | | 0..1 36194B | | |
| | | | | | | | Amount 36196B | 0..1 36198B | GDT 36100C | Amount 36102C |
| | | | | | | | LowerAmount 36104C | 0..1 36106C | GDT 36108C | Amount 36110C |
| | | | | | | | UpperAmount 36112C | 0..1 36114C | GDT 36116C | Amount 36118C |

Fig. 361H

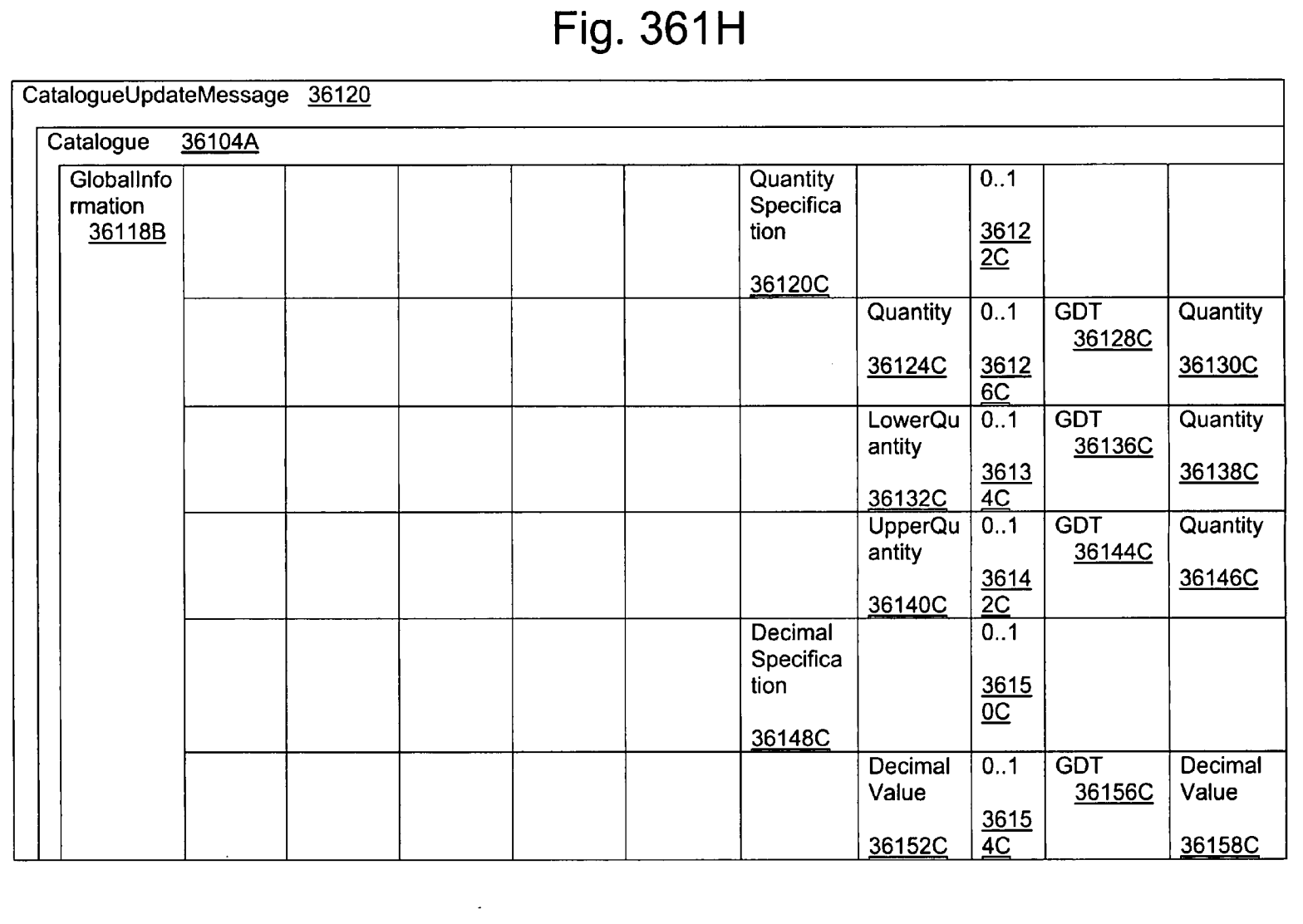

CatalogueUpdateMessage 36120

Catalogue 36104A

| | | | | | | | | | | |
|---|---|---|---|---|---|---|---|---|---|---|
| GlobalInformation 36118B | | | | | | Quantity Specification 36120C | | 0..1 36122C | | |
| | | | | | | | Quantity 36124C | 0..1 36126C | GDT 36128C | Quantity 36130C |
| | | | | | | | LowerQuantity 36132C | 0..1 36134C | GDT 36136C | Quantity 36138C |
| | | | | | | | UpperQuantity 36140C | 0..1 36142C | GDT 36144C | Quantity 36146C |
| | | | | | | Decimal Specification 36148C | | 0..1 36150C | | |
| | | | | | | | Decimal Value 36152C | 0..1 36154C | GDT 36156C | Decimal Value 36158C |

Fig. 361I

CatalogueUpdateMessage 36120

Catalogue 36104A

| | | | | | | | | | | |
|---|---|---|---|---|---|---|---|---|---|---|
| GlobalInformation 36118B | | | | | | | LowerDecimalValue 36160C | 0..1 36162C | GDT 36164C | DecimalValue 36166C |
| | | | | | | | UpperDecimalValue 36168C | 0..1 36170C | GDT 36172C | DecimalValue 36174C |
| | | | | | | FloatSpecification 36176C | | 0..1 36178C | | |
| | | | | | | | FloatValue 36180C | 0..1 36182C | GDT 36184C | FloatValue 36186C |
| | | | | | | | LowerFloatValue 36188C | 0..1 36190C | GDT 36192C | FloatValue 36194C |

Fig. 361J

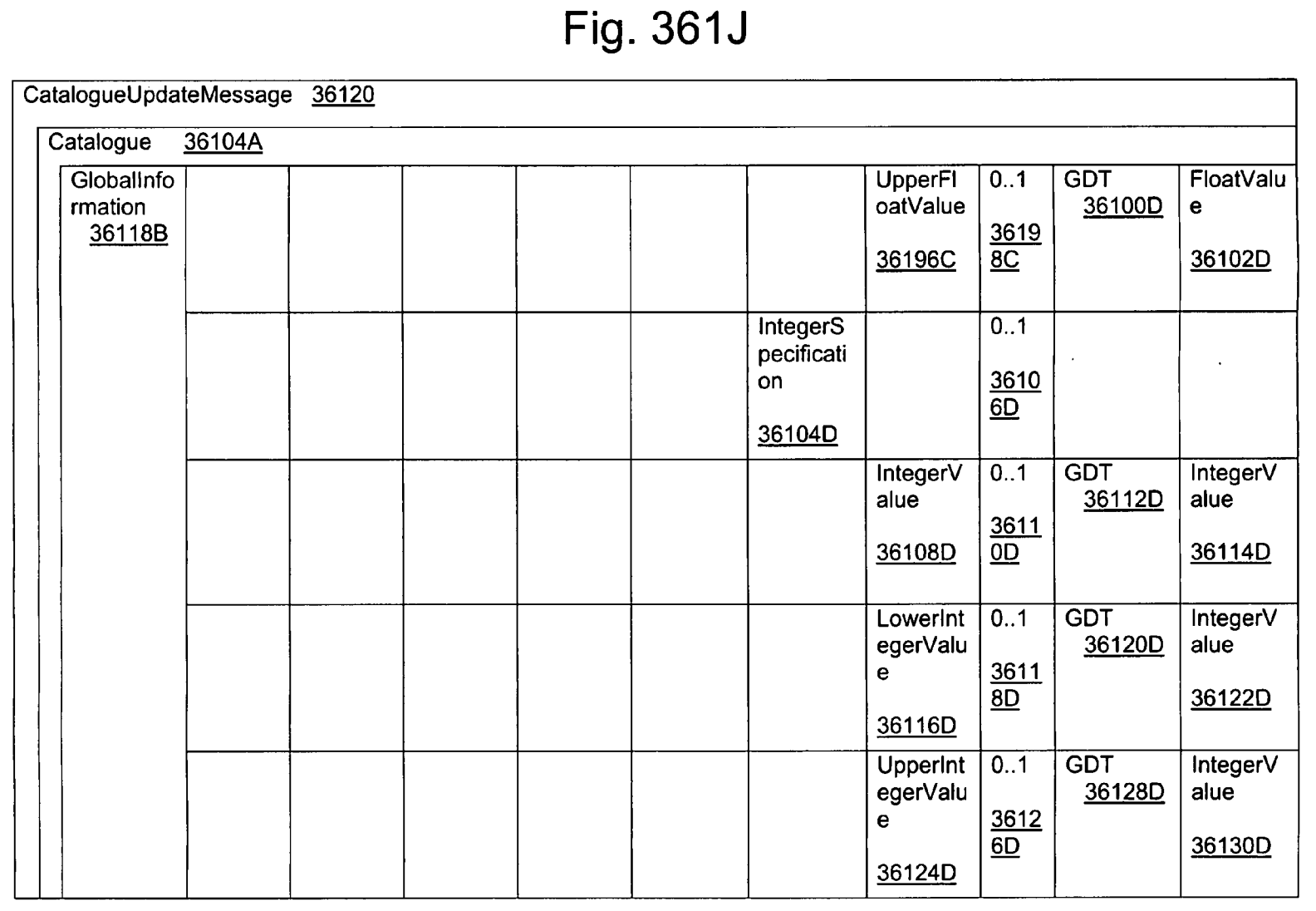

CatalogueUpdateMessage 36120

Catalogue 36104A

| | | | | | | | | | | |
|---|---|---|---|---|---|---|---|---|---|---|
| GlobalInformation 36118B | | | | | | | UpperFloatValue 36196C | 0..1 36198C | GDT 36100D | FloatValue 36102D |
| | | | | | | IntegerSpecification 36104D | | 0..1 36106D | | |
| | | | | | | | IntegerValue 36108D | 0..1 36110D | GDT 36112D | IntegerValue 36114D |
| | | | | | | | LowerIntegerValue 36116D | 0..1 36118D | GDT 36120D | IntegerValue 36122D |
| | | | | | | | UpperIntegerValue 36124D | 0..1 36126D | GDT 36128D | IntegerValue 36130D |

Fig. 361K

CatalogueUpdateMessage 36120

Catalogue 36104A

| | | | | | | | | | | |
|---|---|---|---|---|---|---|---|---|---|---|
| GlobalInformation 36118B | | | | | | DateTimeSpecification 36132D | | 0..1 36134D | | |
| | | | | | | | DateTime 36136D | 0..1 36138D | GDT 36140D | DateTime 36142D |
| | | | | | | | StartDateTime 36144D | 0..1 36146D | GDT 36148D | DateTime 36150D |
| | | | | | | | EndDateTime 36152D | 0..1 36154D | GDT 36156D | DateTime 36158D |
| | | | | | | NameSpecification 36160D | | 0..1 36162D | | |

Fig. 361L

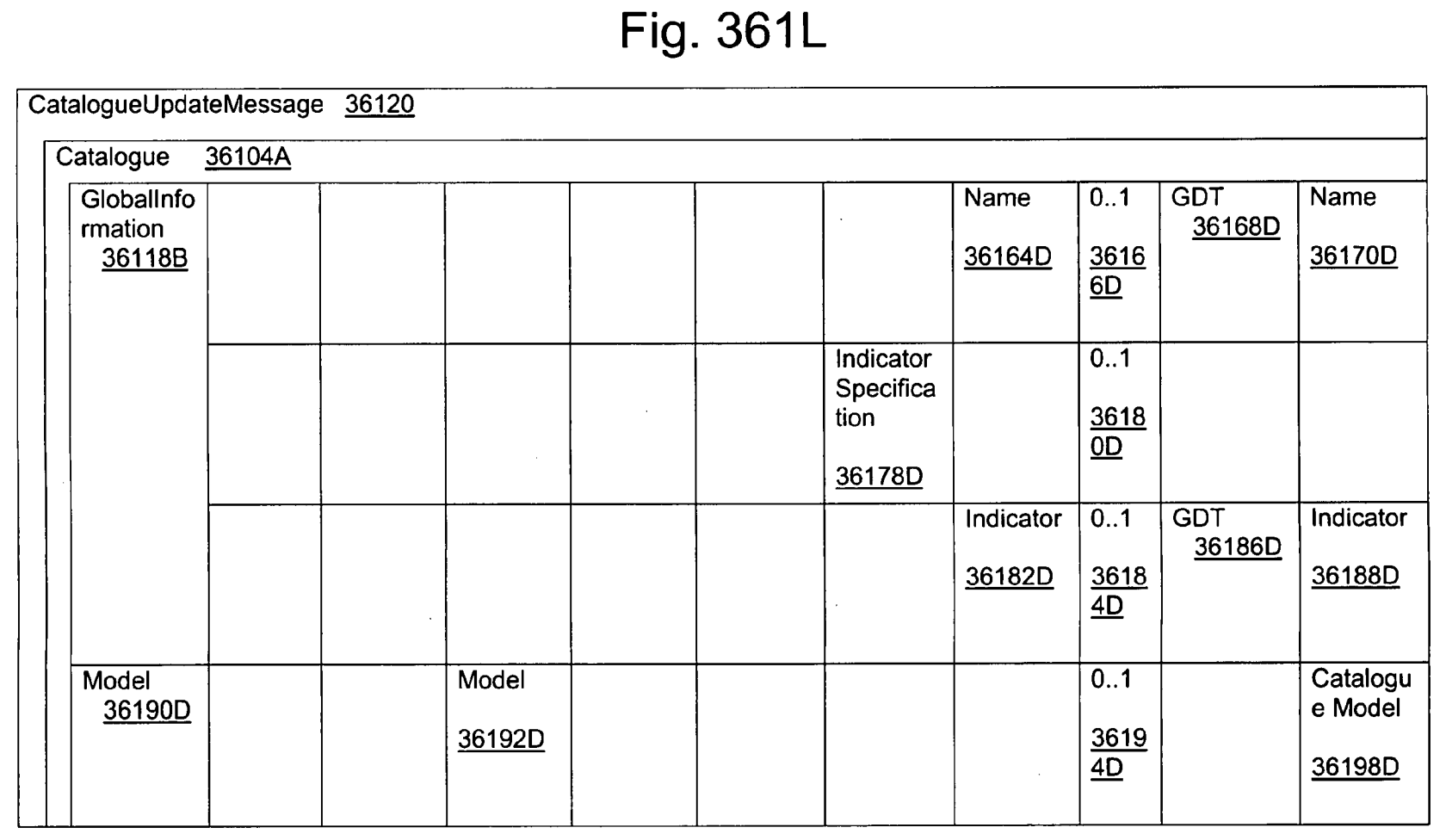

CatalogueUpdateMessage 36120

Catalogue 36104A

| | | | | | | | | | | |
|---|---|---|---|---|---|---|---|---|---|---|
| GlobalInfo rmation 36118B | | | | | | | Name 36164D | 0..1 3616 6D | GDT 36168D | Name 36170D |
| | | | | | | Indicator Specifica tion 36178D | | 0..1 3618 0D | | |
| | | | | | | | Indicator 36182D | 0..1 3618 4D | GDT 36186D | Indicator 36188D |
| Model 36190D | | | Model 36192D | | | | | 0..1 3619 4D | | Catalogu e Model 36198D |

Fig. 361M

CatalogueUpdateMessage 36120

Catalogue 36104A

| | | | | | | | | | | |
|---|---|---|---|---|---|---|---|---|---|---|
| Model 36190D | | | | @propertyDataTypeListCompleteTransmissionIndicator 36100E | | | | 0..1 36102E | GDT 36104E | CompleteTransmissionIndicator 36106E |
| | | | | @propertyListCompleteTransmissionIndicator 36108E | | | | 0..1 36110E | GDT 36112E | CompleteTransmissionIndicator 36114E |
| | | | | @catalogueSectionTypeListCompleteTransmissionIndicator 36116E | | | | 0..1 36118E | GDT 36120E | CompleteTransmissionIndicator 36122E |

Fig. 361N

CatalogueUpdateMessage 36120

Catalogue 36104A

| | | | | | | | | | | |
|---|---|---|---|---|---|---|---|---|---|---|
| Model 36190D | | | | @catalogueSchemaListCompleteTransmissionIndicator 36124E | | | | 0..1 36126E | GDT 36128E | CompleteTransmissionIndicator 36130E |
| PropertyDefinitionClass 36132E | | | | PropertyDefinitionClass 36134E | | | | 0..n 36136E | GDT 36138E | PropertyDefinitionClass 36140E |
| | | | | | ID 36142E | | | 1 36144E | GDT 36146E | PropertyDefinitionClassID 36148E |
| | | | | | PreferredName 36150E | | | 1 36152E | GDT 36154E | Name 36156E |

Fig. 361O

CatalogueUpdateMessage 36120

Catalogue 36104A

Model 36190D

| | | | | | | | | | | |
|---|---|---|---|---|---|---|---|---|---|---|
| PropertyDefinitionClass 36132E | | | | | DefinedProperty 36158E | | | 0..n 36160E | | |
| | | | | | | Reference 36162E | | 1 36164E | GDT 36166E | PropertyReference 36168E |
| | | | | | | | ID 36170E | 1 36172E | GDT 36174E | PropertyID 36176E |
| | | | | | | OrdinalNumberValue 36178E | | 0..1 36180E | GDT 36182E | OrdinalNumberValue 36184E |
| PropertyDataType 36186E | | | | PropertyDataType 36188E | | | | 0..n 36190E | GDT 36192E | PropertyDataType 36194E |

Fig. 361P

CatalogueUpdateMessage 36120

Catalogue 36104A

Model 36190D

| | | | | | | | | | | |
|---|---|---|---|---|---|---|---|---|---|---|
| Property DataType 36186E | | | | | @action Code 36196E | | | 0..1 36198E | GDT 36100F | ActionCode 36102F |
| | | | | | ID 36104F | | | 0..1 36106F | GDT 36108F | PropertyDataTypeID 36110F |
| | | | | | Preferred Name 36112F | | | 1..n 36114F | GDT 36116F | Name 36118F |
| | | | | | | @languageCode 36120F | | 0..1 36122F | GDT 36124F | LanguageCode 36126F |
| | | | | | FormatCode 36128F | | | 1 36130F | GDT 36132F | PropertyDataTypeFormatCode 36134F |

Fig. 361Q

CatalogueUpdateMessage 36120

Catalogue 36104A

Model 36190D

| | | | | | | | | | | |
|---|---|---|---|---|---|---|---|---|---|---|
| PropertyDataType 36186E | | | | | MaximumTotalDigitNumberValue 36136F | | | 0..1 36138F | GDT 36140F | DigitNumberValue 36142F |
| | | | | | FractionalDigitNumberValue 36144F | | | 0..1 36146F | GDT 36148F | DigitNumberValue 36150F |
| | | | | | PropertyDefinitionClassReference 36152F | | | 0..1 36154F | GDT 36156F | PropertyDefinitionClassReference 36158F |
| | | | | | | ID 36160F | | 1 36162F | GDT 36164F | PropertyDefinitionClassID 36166F |
| | | | | | AllowedPropertyValueElement 36168F | | | 0..n 36170F | | |

Fig. 361R

CatalogueUpdateMessage 36120

Catalogue 36104A

Model 36190D

| | | | | | | | | | | |
|---|---|---|---|---|---|---|---|---|---|---|
| Property DataType 36186E | | | | | | Property Value 36172F | | 1 36174F | GDT 36176F | Property Value 36178F |
| Property 36180F | | | | Property 36182F | | | | 0..n 36184F | GDT 36186F | Property 36188F |
| | | | | | @actionCode 36190F | | | 0..1 36192F | GDT 36194F | ActionCode 36196F |
| | | | | | ID 36198F | | | 1 36100G | GDT 36102G | PropertyID 36104G |
| | | | | | DefinitionClassReference 36106G | | | 0..1 36108G | GDT 36110G | PropertyDefinitionClassReference 36112G |

Fig. 361S

CatalogueUpdateMessage 36120

Catalogue 36104A

Model 36190D

| | | | | | | | | | | |
|---|---|---|---|---|---|---|---|---|---|---|
| Property 36190D<br>36180F | | | | | | ID<br>36114G | | 1<br>36116G | GDT<br>36118G | Property Definition ClassID<br>36120G |
| | | | | | Preferred Name<br>36122G | | | 1..n<br>36124G | GDT<br>36126G | Name<br>36128G |
| | | | | | Property DataTypeReference<br>36130G | | | 1<br>36132G | GDT<br>36134G | Property DataTypeReference<br>36136G |
| | | | | | | ID<br>36138G | | 1<br>36140G | GDT<br>36142G | Property DataTypeID<br>36144G |
| | | | | | AspectID<br>36146G | | | 0..n<br>36148G | GDT<br>36150G | AspectID<br>36152G |

Fig. 361T

CatalogueUpdateMessage 36120

Catalogue 36104A

Model 36190D

| | | | | | | | | | | |
|---|---|---|---|---|---|---|---|---|---|---|
| Property 36180F | | | | | TargetInterfaceElementID 36154G | | | 0..n 36156G | GDT 36158G | InterfaceElementID 36160G |
| | | | | | MultipleValueIndicator 36162G | | | 0..1 36164G | GDT 36166G | PropertyMultipleValueIndicator 36168G |
| | | | | | TextSearchableIndicator 36170G | | | 0..1 36172G | GDT 36174G | TextSearchableIndicator 36176G |
| | | | | | ParametricSearchableIndicator 36178G | | | 0..1 36180G | GDT 36182G | PropertyParametricSearchableIndicator 36184G |
| | | | | | ValuationRequiredIndicator 36186G | | | 0..1 36188G | GDT 36190G | PropertyValuationRequiredIndicator 36192G |

Fig. 361U

CatalogueUpdateMessage 36120

Catalogue 36104A

Model 36190D

| | | | | | | | | | | |
|---|---|---|---|---|---|---|---|---|---|---|
| CatalogueItemProperty 36194G | | | | CatalogueItemProperty 36196G | | | | 0..n 36198G | | CatalogueItemProperty 36102H |
| | | | | | PropertyReference 36104H | | | 1 36106H | GDT 36108H | PropertyReference 36110H |
| | | | | | | ID 36112H | | 1 36114H | GDT 36116H | PropertyID 36118H |
| | | | | | OrdinalNumberValue 36120H | | | 1 36122H | GDT 36124H | OrdinalNumberValue 36126H |
| CatalogueSectionType 36128H | | | | CatalogueSectionType 36130H | | | | 0..n 36132H | | Catalogue Section Type 36136H |

Fig. 361V

CatalogueUpdateMessage 36120

Catalogue 36104A

Model 36190D

| | | | | | | | | | | |
|---|---|---|---|---|---|---|---|---|---|---|
| CatalogueSectionType 36128H | | | | | @actionCode 36138H | | | 0..1 36140H | GDT 36142H | ActionCode 36144H |
| | | | | | ID 36146H | | | 1 36148H | GDT 36150H | CatalogueSectionTypeID 36152H |
| | | | | | Name 36154H | | | 0..n 36156H | GDT 36158H | Name 36160H |
| | | | | | SectionProperty 36162H | | | 0..n 36164H | | CatalogueSectionTypeSectionProperty 36168H |
| | | | | | | PropertyReference 36170H | | 1 36172H | GDT 36174H | PropertyReference 36176H |

Fig. 361W

CatalogueUpdateMessage 36120

Catalogue 36104A

Model 36190D

| | | | | | | | | | | |
|---|---|---|---|---|---|---|---|---|---|---|
| CatalogueSectionType 36128H | | | | | | | ID 36178H | 1 36180H | GDT 36182H | PropertyID 36184H |
| | | | | | | OrdinalNumberValue 36186H | | 1 36188H | GDT 36190H | OrdinalNumberValue 36192H |
| CatalogueSchema 36194H | | | | CatalogueSchema 36196H | | | | 0..n 36198H | | CatalogueSchema 36102I |
| | | | | | @actionCode 36104I | | | 0..1 36106I | GDT 36108I | ActionCode 36110I |
| | | | | | @catalogueSectionListCompleteTransmissionIndicator 36112I | | | 0..1 36114I | GDT 36116I | CompleteTransmissionIndicator 36118I |

Fig. 361X

CatalogueUpdateMessage 36120

Catalogue 36104A

Model 36190D

| | | | | | | | | | | |
|---|---|---|---|---|---|---|---|---|---|---|
| CatalogueSchema 36194H | | | | | @catalogueSectionRelationshipListCompleteTransmissionIndicator 36120I | | | 0..1 36122I | GDT 36124I | CompleteTransmissionIndicator 36126I |
| | | | | | ID 36128I | | | 1 36130I | GDT 36132I | CatalogueSchemaID 36134I |
| | | | | | TypeCode 36136I | | | 0..1 36138I | GDT 36140I | CatalogueSchemaTypeCode 36142I |
| | | | | | Name 36144I | | | 0..n 36146I | GDT 36148I | Name 36150I |

Fig. 361Y

CatalogueUpdateMessage 36120

Catalogue 36104A

Model 36190D

| | | | | | | | | | | |
|---|---|---|---|---|---|---|---|---|---|---|
| CatalogueSchema 36194H | | | | | CatalogueItemProperty 36152I | | | 0..n 36154I | | CatalogueSchemaCatalogueItemProperty 36158I |
| | | | | | | PropertyReference 36160I | | 1 36162I | GDT 36164I | PropertyReference 36166I |
| | | | | | | | ID 36168I | 1 36170I | GDT 36172I | PropertyID 36174I |
| | | | | | | OrdinalNumberValue 36176I | | 1 36178I | GDT 36180I | OrdinalNumberValue 36182I |
| | | | | | CatalogueSection 36184I | | | 0..n 36186I | | CatalogueSection 36190I |

Fig. 361Z

CatalogueUpdateMessage 36120

Catalogue 36104A

Model 36190D

| | | | | | | | | | | |
|---|---|---|---|---|---|---|---|---|---|---|
| CatalogueSchema 36194H | | | | | | @actionCode 36192I | | 0..1 36194I | GDT 36196I | ActionCode 36198I |
| | | | | | | @propertyValuationListCompleteTransmissionIndicator 36100J | | 0..1 36102J | GDT 36104J | CompleteTransmissionIndicator 36106J |
| | | | | | | ID 36108J | | 1 36110J | GDT 36112J | CatalogueSectionID 36114J |
| | | | | | | TypeID 36116J | | 0..1 36118J | GDT 36120J | CatalogueSectionTypeID 36122J |
| | | | | | | Name 36124J | | 0..n 36126J | GDT 36128J | Name 36130J |

Fig. 361AA

CatalogueUpdateMessage 36120

Catalogue 36104A

Model 36190D

| | | | | | | | | | | |
|---|---|---|---|---|---|---|---|---|---|---|
| CatalogueSchema 36194H | | | | | | Property Valuation 36132J | | 0..n 36134J | GDT 36136J | PropertyValuation 36138J |
| | | | | | | CatalogueItemProperty 36140J | | 0..n 36142J | | CatalogueSectionCatalogueItemProperty 36146J |
| | | | | | | | Property Reference 36148J | 1 36150J | GDT 36152J | PropertyReference 36154J |
| | | | | | | | OrdinalNumberValue 36162J | 1 36164J | GDT 36166J | OrdinalNumberValue 36168J |

Fig. 361AB

CatalogueUpdateMessage 36120

Catalogue 36104A

Model 36190D

| | | | | | | | | | | |
|---|---|---|---|---|---|---|---|---|---|---|
| CatalogueSchema 36194H | | | | | CatalogueSectionRelationship 36170J | | | 0..n 36172J | | CatalogueSectionRelationship 36176J |
| | | | | | | @actionCode 36178J | | 0..1 36180J | GDT 36182J | ActionCode 36184J |
| | | | | | | SourceCatalogueSectionID 36186J | | 1 36188J | GDT 36190J | CatalogueSectionID 36192J |
| | | | | | | TargetCatalogueSectionID 36194J | | 1 36196J | GDT 36198J | CatalogueSectionID 36100K |
| Content 36102K | | | Content 36104K | | | | | 0..1 36106K | | CatalogueContent 36110K |

Fig. 361AC

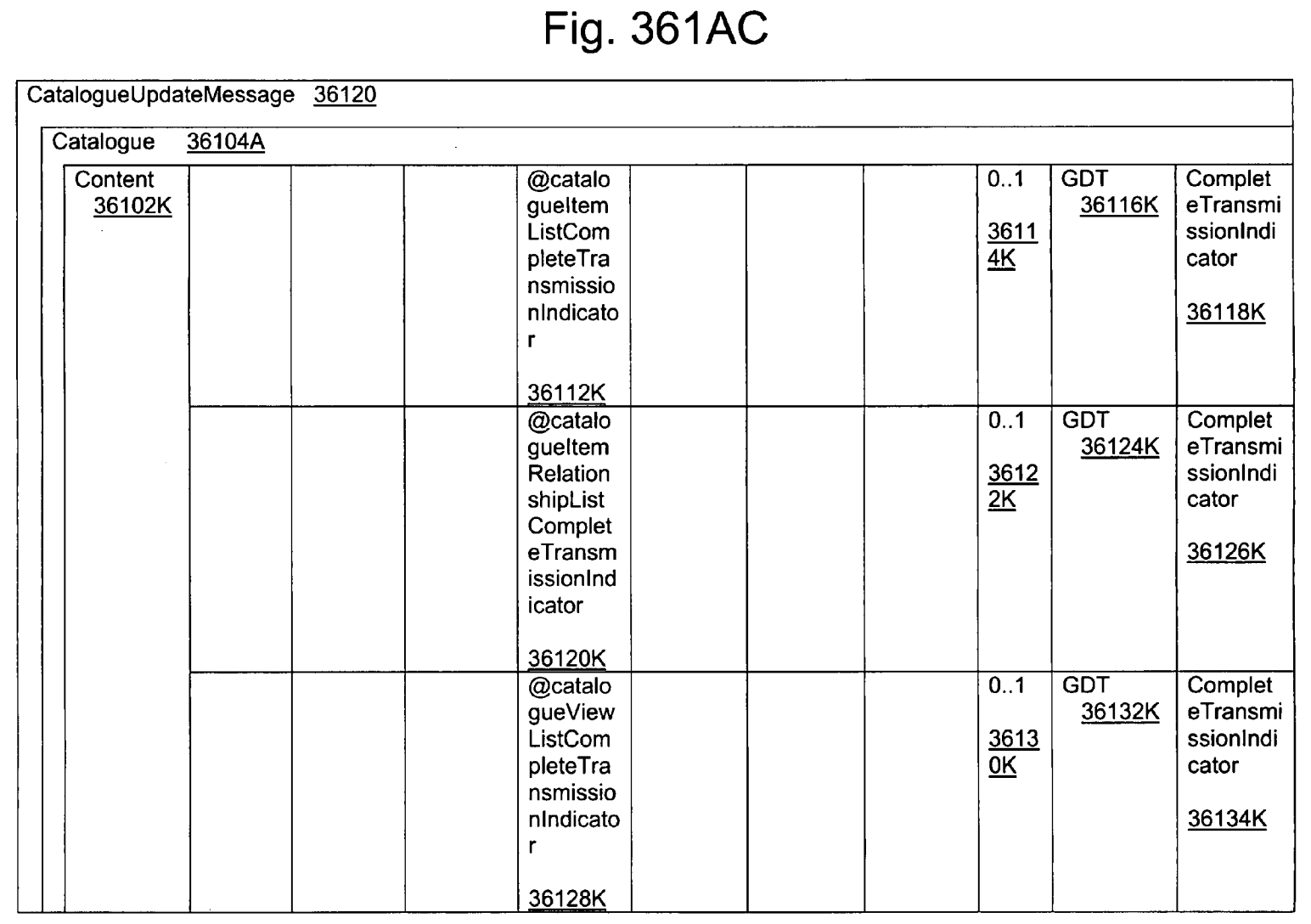

CatalogueUpdateMessage 36120

Catalogue 36104A

| | | | | | | | | | | |
|---|---|---|---|---|---|---|---|---|---|---|
| Content 36102K | | | | @catalogueItemListCompleteTransmissionIndicator 36112K | | | | 0..1 36114K | GDT 36116K | CompleteTransmissionIndicator 36118K |
| | | | | @catalogueItemRelationshipListCompleteTransmissionIndicator 36120K | | | | 0..1 36122K | GDT 36124K | CompleteTransmissionIndicator 36126K |
| | | | | @catalogueViewListCompleteTransmissionIndicator 36128K | | | | 0..1 36130K | GDT 36132K | CompleteTransmissionIndicator 36134K |

Fig. 361AD

CatalogueUpdateMessage 36120

Catalogue 36104A

| | | | | | | | | | | |
|---|---|---|---|---|---|---|---|---|---|---|
| Content 36102K | | | | CatalogueSchemaID 36136K | | | | 0..1 36138K | GDT 36140K | CatalogueSchemaID 36142K |
| CatalogueItem 36144K | | | | CatalogueItem 36146K | | | | 0..n 36148K | | Catalogue Item 36152K |
| | | | | | @actionCode 36154K | | | 0..1 36156K | GDT 36158K | ActionCode 36160K |
| | | | | | @propertyValuationListCompleteTransmissionIndicator 36162K | | | 0..1 36164K | GDT 36166K | CompleteTransmissionIndicator 36168K |
| | | | | | ID 36170K | | | 1 36172K | GDT 36174K | CatalogueItemID 36176K |

Fig. 361AE

CatalogueUpdateMessage 36120

Catalogue 36104A

Content 36102K

| | | | | | | | | | | |
|---|---|---|---|---|---|---|---|---|---|---|
| Catalog ueItem 36144K | | | | | Descripti on 36178K | | | 0..n 3618 0K | GDT 36182K | Descripti on 36184K |
| | | | | | Classific ation 36186K | | | 0..n 3618 8K | | Catalogu eItemCla ssificatio n 36192K |
| | | | | | | Catalogu eSchema ID 36194K | | 0..1 3619 6K | GDT 36198K | Catalogu eSchema ID 36100L |
| | | | | | | Catalogu eSectionI D 36102L | | 1 3610 4L | GDT 36106L | Catalogu eSectionI D 36108L |
| | | | | | Property Valuation 36110L | | | 0..n 3611 2L | GDT 36114L | Property Valuation 36116L |

Fig. 361AF

CatalogueUpdateMessage 36120

Catalogue 36104A

Content 36102K

| | | | | | | | | | | |
|---|---|---|---|---|---|---|---|---|---|---|
| CatalogueItem 36144K | | | | CatalogueItemRelationship 36118L | | | | 0..n 36120L | | CatalogueItemRelationship 36124L |
| | | | | | @actionCode 36126L | | | 0..1 36128L | GDT 36130L | ActionCode 36132L |
| | | | | | SourceCatalogueItemID 36134L | | | 1 36136L | GDT 36138L | CatalogueItemID 36140L |
| | | | | | TargetCatalogueItemID 36142L | | | 1 36144L | GDT 36146L | CatalogueItemID 36148L |
| | | | | | TypeCode 36150L | | | 1 36152L | GDT 36154L | ObjectStructureRelationshipTypeCode 36156L |

Fig. 361AG

CatalogueUpdateMessage 36120

Catalogue 36104A

Content 36102K

| | | | | | | | | | | |
|---|---|---|---|---|---|---|---|---|---|---|
| CatalogueView 36158L | | | | CatalogueView 36160L | | | | 0..n 36162L | | CatalogueView 36166L |
| | | | | | @actionCode 36168L | | | 0..1 36170L | GDT 36172L | ActionCode 36174L |
| | | | | | @itemList CompleteTransmissionIndicator 36176L | | | 0..1 36178L | GDT 36180L | CompleteTransmissionIndicator 36182L |
| | | | | | @itemRelationshipTypeList CompleteTransmissionIndicator 36184L | | | 0..1 36186L | GDT 36188L | CompleteTransmissionIndicator 36190L |

Fig. 361AH

CatalogueUpdateMessage 36120

Catalogue 36104A

Content 36102K

| | | | | | | | | | | |
|---|---|---|---|---|---|---|---|---|---|---|
| CatalogueView 36158L | | | | | @excludedPropertyList CompleteTransmissionIndicator 36192L | | | 0..1 36194L | GDT 36196L | CompleteTransmissionIndicator 36198L |
| | | | | | ID 36100M | | | 1 36102M | GDT 36104M | CatalogueViewID 36106M |
| | | | | | Name 36108M | | | 0..n 36110M | GDT 36112M | Name 36114M |
| | | | | | Schema 36116M | | | 0..n 36118M | | CatalogueViewSchema 36122M |

Fig. 361AI

CatalogueUpdateMessage 36120

Catalogue 36104A

Content 36102K

| | | | | | | | | | | |
|---|---|---|---|---|---|---|---|---|---|---|
| CatalogueView 36158L | | | | | | @sectionListCompleteTransmissionIndicator 36124M | | 0..1 36126M | GDT 36128M | CompleteTransmissionIndicator 36130M |
| | | | | | | CatalogueSchemaID 36132M | | 1 36134M | GDT 36136M | CatalogueSchemaID 36138M |
| | | | | | | Section 36140M | | 0..n 36142M | | CatalogueViewSchemaSection 36146M |
| | | | | | | | @actionCode 36148M | 0..1 36150M | GDT 36152M | ActionCode 36154M |

Fig. 361AJ

CatalogueUpdateMessage 36120

Catalogue 36104A

Content 36102K

| | | | | | | | | | | |
|---|---|---|---|---|---|---|---|---|---|---|
| CatalogueView 36158L | | | | | | | CatalogueSectionID 36156M | 1 36158M | GDT 36160M | CatalogueSectionID 36162M |
| | | | | | Item 36164M | | | 0..n 36166M | | CatalogueViewItem 36170M |
| | | | | | | @actionCode 36172M | | 0..1 36174M | GDT 36176M | ActionCode 36178M |
| | | | | | | CatalogueItemID 36180M | | 1 36182M | GDT 36184M | CatalogueItemID 36186M |
| | | | | | ItemRelationshipType 36188M | | | 0..n 36190M | | CatalogueViewItemRelationshipType 36194M |

Fig. 361AK

CatalogueUpdateMessage 36120

Catalogue 36104A

Content 36102K

| | | | | | | | | | | |
|---|---|---|---|---|---|---|---|---|---|---|
| CatalogueView 36158L | | | | | | @actionCode 36196M | | 0..1 36198M | GDT 36100N | ActionCode 36102N |
| | | | | | | CatalogueItemRelationshipTypeCode 36104N | | 1 36106N | GDT 36108N | ObjectStructureRelationshipTypeCode 36110N |
| | | | | | ExcludedProperty 36112N | | | 0..n 36114N | | CatalogueViewExcludedProperty 36118N |
| | | | | | | @actionCode 36120N | | 0..1 36122N | GDT 36124N | ActionCode 36126N |
| | | | | | | PropertyReference 36128N | | 1 36130N | GDT 36132N | PropertyReference 36134N |
| | | | | | | | ID 36136N | 1 36138N | GDT 36140N | PropertyID 36142N |

Fig. 363A

| Package 36300 | level 1 36302 | level 2 36304 | level 3 36306 | level 4 36308 | level 5 36310 | level 6 36312 | level 7 36314 | Card 36316 | DataType Name 36318 | |
|---|---|---|---|---|---|---|---|---|---|---|
| CataloguePublicationMessage 36320 | CataloguePublication Message 36322 | | | | | | | | MDT 36324 | CataloguePublicationMessage 36326 |
| MessageHeader 36328 | | MessageHeader 36330 | | | | | | 1 36332 | GDT 36334 | BusinessDocumentMessageHeader 36336 |
| | | | ID 36338 | | | | | 1 36340 | GDT 36342 | BusinessDocumentMessageID 36344 |

Fig. 363B

CataloguePublicationMessage 36320

| | | | | | | | | | | |
|---|---|---|---|---|---|---|---|---|---|---|
| MessageHeader 36328 | | | CreationDateTime 36346 | | | | | 1 36348 | GDT 36350 | DateTime 36352 |
| | | | SenderParty 36354 | | | | | 0..1 36356 | GDT 36358 | BusinessDocumentMessageHeaderParty 36360 |
| TransmissionInformation 36362 | | TransmissionHeader 36364 | | | | | | 0..1 36366 | | BusinessDocumentTransmissionHeader 36370 |
| | | | ID 36372 | | | | | 1 36374 | GDT 36376 | TransmissionID 36378 |
| | | | PackageOrdinalNumberValue 36380 | | | | | 1 36382 | GDT 36384 | OrdinalNumberValue 36386 |

Fig. 363C

CataloguePublicationMessage 36320

| | | | | | | | | | | |
|---|---|---|---|---|---|---|---|---|---|---|
| TransmissionInformation 36362 | | | PackageTotalNumberValue 36388 | | | | | 0..1 36390 | GDT 36392 | TotalNumberValue 36394 |
| | | | MinimumRequestedLogItemSeverityCode 36396 | | | | | 0..1 36398 | GDT 36300A | LogItemSeverityCode 36302A |
| Catalogue 36304A | | Catalogue 36306A | | | | | | 1 36308A | | TransmissionCatalogue 36312A |
| | | | @actionCode 36314A | | | | | 0..1 36316A | GDT 36318A | ActionCode 36320A |
| | | | @completeTransmissionIndicator 36322A | | | | | 0..1 36324A | GDT 36326A | CompleteTransmissionIndicator 36328A |

Fig. 363D

CataloguePublicationMessage 36320

| | | | | | | | | | | |
|---|---|---|---|---|---|---|---|---|---|---|
| Catalogue 36304A | | | @providerPropertyValuationListCompleteTransmissionIndicator 36330A | | | | | 0..1 36332A | GDT 36334A | CompleteTransmissionIndicator 36336A |
| | | | @languageCode 36338A | | | | | 0..1 36340A | GDT 36342A | LanguageCode 36344A |
| | | | @currencyCode 36346A | | | | | 0..1 36348A | GDT 36350A | CurrencyCode 36352A |
| | | | @unitCode 36354A | | | | | 0..1 36356A | GDT 36358A | MeasureUnitCode 36360A |
| | | | ID 36362A | | | | | 1 36364A | GDT 36366A | CatalogueID 36368A |
| | | | VersionID 36370A | | | | | 0..1 36372A | GDT 36374A | VersionID 36376A |

Fig. 363E

CataloguePublicationMessage 36320

| | | | | | | | | | | |
|---|---|---|---|---|---|---|---|---|---|---|
| Catalogue 36304A | | | Name 36378A | | | | | 0..n 36380A | GDT 36382A | Name 36384A |
| | | | TypeCode 36386A | | | | | 1 36388A | GDT 36390A | CatalogueTypeCode 36392A |
| | | | ValidityPeriod 36394A | | | | | 0..1 36396A | GDT 36398A | DateTimePeriod 36300B |
| | | | | StartDateTime 36302B | | | | 0..1 36304B | GDT 36306B | DateTime 36308B |
| | | | | EndDateTime 36310B | | | | 0..1 36312B | GDT 36314B | DateTime 36316B |
| GlobalInformation 36318B | | | ProviderPropertyValuation 36320B | | | | | 0..n 36322B | GDT 36324B | PropertyValuation 36326B |

Fig. 363F

CataloguePublicationMessage 36320

Catalogue 36304A

| | | | | | | | | | | |
|---|---|---|---|---|---|---|---|---|---|---|
| GlobalInformation 36318B | | | | @actionCode 36328B | | | | 0..1 36330B | GDT 36332B | ActionCode 36334B |
| | | | | PropertyReference 36336B | | | | 1 36338B | GDT 36340B | PropertyReference 36342B |
| | | | | | ID 36344B | | | 1 36346B | GDT 36348B | PropertyID 36350B |
| | | | | ValueGroup 36352B | | | | 1..n 36354B | GDT 36356B | PropertyValueIterator 36358B |
| | | | | | ID 36360B | | | 0..1 36362B | CCT 36364B | Identifier 36366B |
| | | | | | ParentID 36368B | | | 0..1 36370B | CCT 36372B | Identifier 36374B |

Fig. 363G

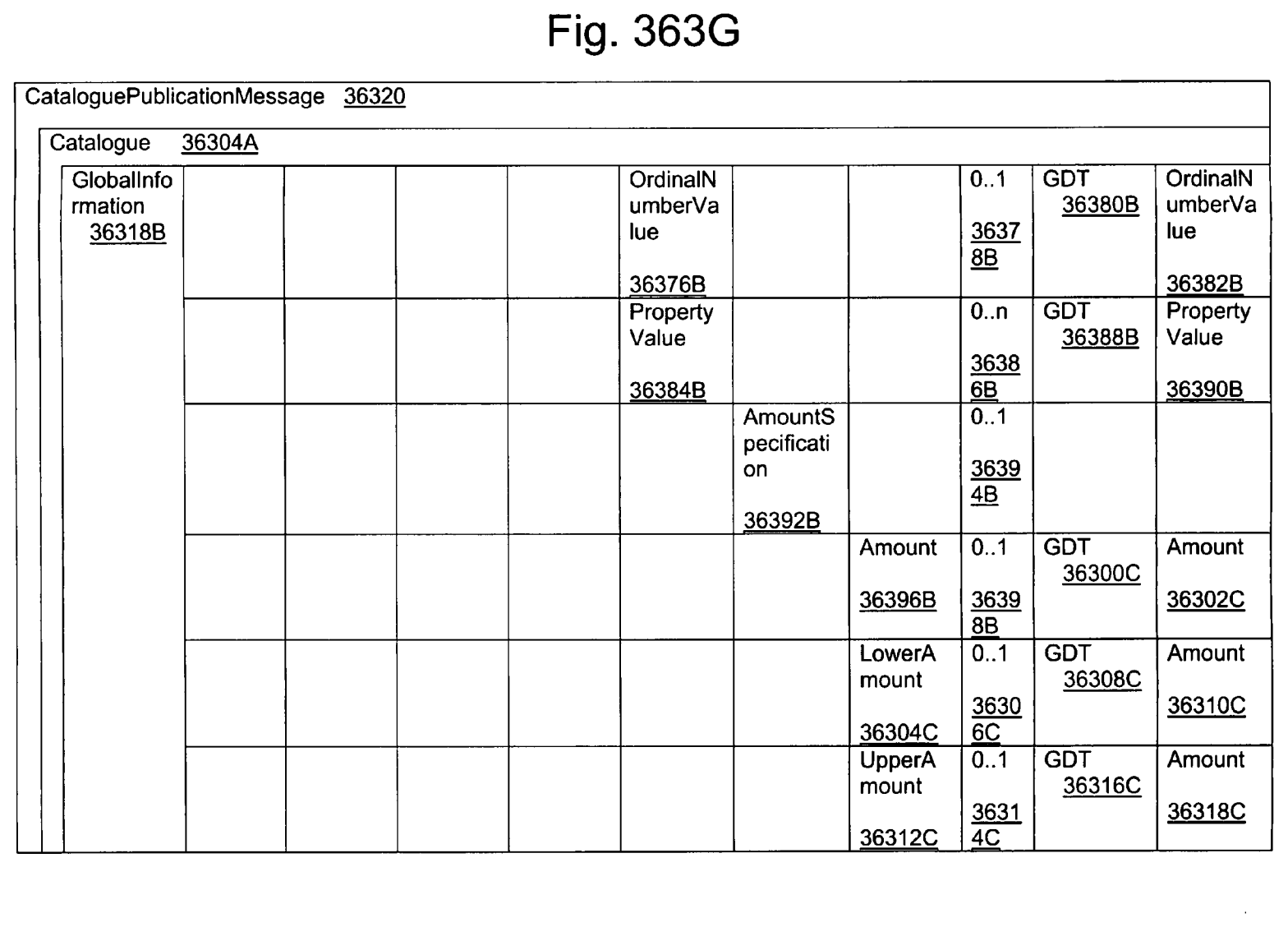

CataloguePublicationMessage 36320

Catalogue 36304A

| | | | | | | | | | | |
|---|---|---|---|---|---|---|---|---|---|---|
| GlobalInformation 36318B | | | | | OrdinalNumberValue 36376B | | | 0..1 36378B | GDT 36380B | OrdinalNumberValue 36382B |
| | | | | | Property Value 36384B | | | 0..n 36386B | GDT 36388B | Property Value 36390B |
| | | | | | | AmountSpecification 36392B | | 0..1 36394B | | |
| | | | | | | | Amount 36396B | 0..1 36398B | GDT 36300C | Amount 36302C |
| | | | | | | | LowerAmount 36304C | 0..1 36306C | GDT 36308C | Amount 36310C |
| | | | | | | | UpperAmount 36312C | 0..1 36314C | GDT 36316C | Amount 36318C |

Fig. 363H

CataloguePublicationMessage 36320

Catalogue 36304A

| | | | | | | | | | | |
|---|---|---|---|---|---|---|---|---|---|---|
| GlobalInformation 36318B | | | | | | QuantitySpecification 36320C | | 0..1 36322C | | |
| | | | | | | | Quantity 36324C | 0..1 36326C | GDT 36328C | Quantity 36330C |
| | | | | | | | LowerQuantity 36332C | 0..1 36334C | GDT 36336C | Quantity 36338C |
| | | | | | | | UpperQuantity 36340C | 0..1 36342C | GDT 36344C | Quantity 36346C |
| | | | | | | DecimalSpecification 36348C | | 0..1 36350C | | |
| | | | | | | | DecimalValue 36352C | 0..1 36354C | GDT 36356C | DecimalValue 36358C |

Fig. 363I

CataloguePublicationMessage 36320

Catalogue 36304A

| | | | | | | | | | | |
|---|---|---|---|---|---|---|---|---|---|---|
| GlobalInformation 36318B | | | | | | | LowerDecimalValue 36360C | 0..1 36362C | GDT 36364C | DecimalValue 36366C |
| | | | | | | | UpperDecimalValue 36368C | 0..1 36370C | GDT 36372C | DecimalValue 36374C |
| | | | | | | FloatSpecification 36376C | | 0..1 36378C | | |
| | | | | | | | FloatValue 36380C | 0..1 36382C | GDT 36384C | FloatValue 36386C |
| | | | | | | | LowerFloatValue 36388C | 0..1 36390C | GDT 36392C | FloatValue 36394C |

Fig. 363J

CataloguePublicationMessage 36320

Catalogue 36304A

| | | | | | | | | | | |
|---|---|---|---|---|---|---|---|---|---|---|
| GlobalInformation 36318B | | | | | | | UpperFloatValue 36396C | 0..1 36398C | GDT 36300D | FloatValue 36302D |
| | | | | | | IntegerSpecification 36304D | | 0..1 36306D | | |
| | | | | | | | IntegerValue 36308D | 0..1 36310D | GDT 36312D | IntegerValue 36314D |
| | | | | | | | LowerIntegerValue 36316D | 0..1 36318D | GDT 36320D | IntegerValue 36322D |
| | | | | | | | UpperIntegerValue 36324D | 0..1 36326D | GDT 36328D | IntegerValue 36330D |

Fig. 363K

CataloguePublicationMessage 36320

Catalogue 36304A

| | | | | | | | | | | |
|---|---|---|---|---|---|---|---|---|---|---|
| GlobalInformation 36318B | | | | | | DateTimeSpecification 36332D | | 0..1 36334D | | |
| | | | | | | | DateTime 36336D | 0..1 36338D | GDT 36340D | DateTime 36342D |
| | | | | | | | StartDateTime 36344D | 0..1 36346D | GDT 36348D | DateTime 36350D |
| | | | | | | | EndDateTime 36352D | 0..1 36354D | GDT 36356D | DateTime 36358D |
| | | | | | | NameSpecification 36360D | | 0..1 36362D | | |

Fig. 363L

CataloguePublicationMessage 36320

Catalogue 36304A

| | | | | | | | | | | |
|---|---|---|---|---|---|---|---|---|---|---|
| GlobalInformation 36318B | | | | | | | Name 36364D | 0..1 36366D | GDT 36368D | Name 36370D |
| | | | | | | Indicator Specification 36378D | | 0..1 36380D | | |
| | | | | | | | Indicator 36382D | 0..1 36384D | GDT 36386D | Indicator 36388D |
| Model 36390D | | | Model 36392D | | | | | 0..1 36394D | | Catalogue Model 36398D |

Fig. 363M

CataloguePublicationMessage 36320

Catalogue 36304A

| | | | | | | | | | | |
|---|---|---|---|---|---|---|---|---|---|---|
| Model 36390D | | | | @propertyDataTypeListCompleteTransmissionIndicator 36300E | | | | 0..1 36302E | GDT 36304E | CompleteTransmissionIndicator 36306E |
| | | | | @propertyListCompleteTransmissionIndicator 36308E | | | | 0..1 36310E | GDT 36312E | CompleteTransmissionIndicator 36314E |
| | | | | @catalogueSectionTypeListCompleteTransmissionIndicator 36316E | | | | 0..1 36318E | GDT 36320E | CompleteTransmissionIndicator 36322E |

Fig. 363N

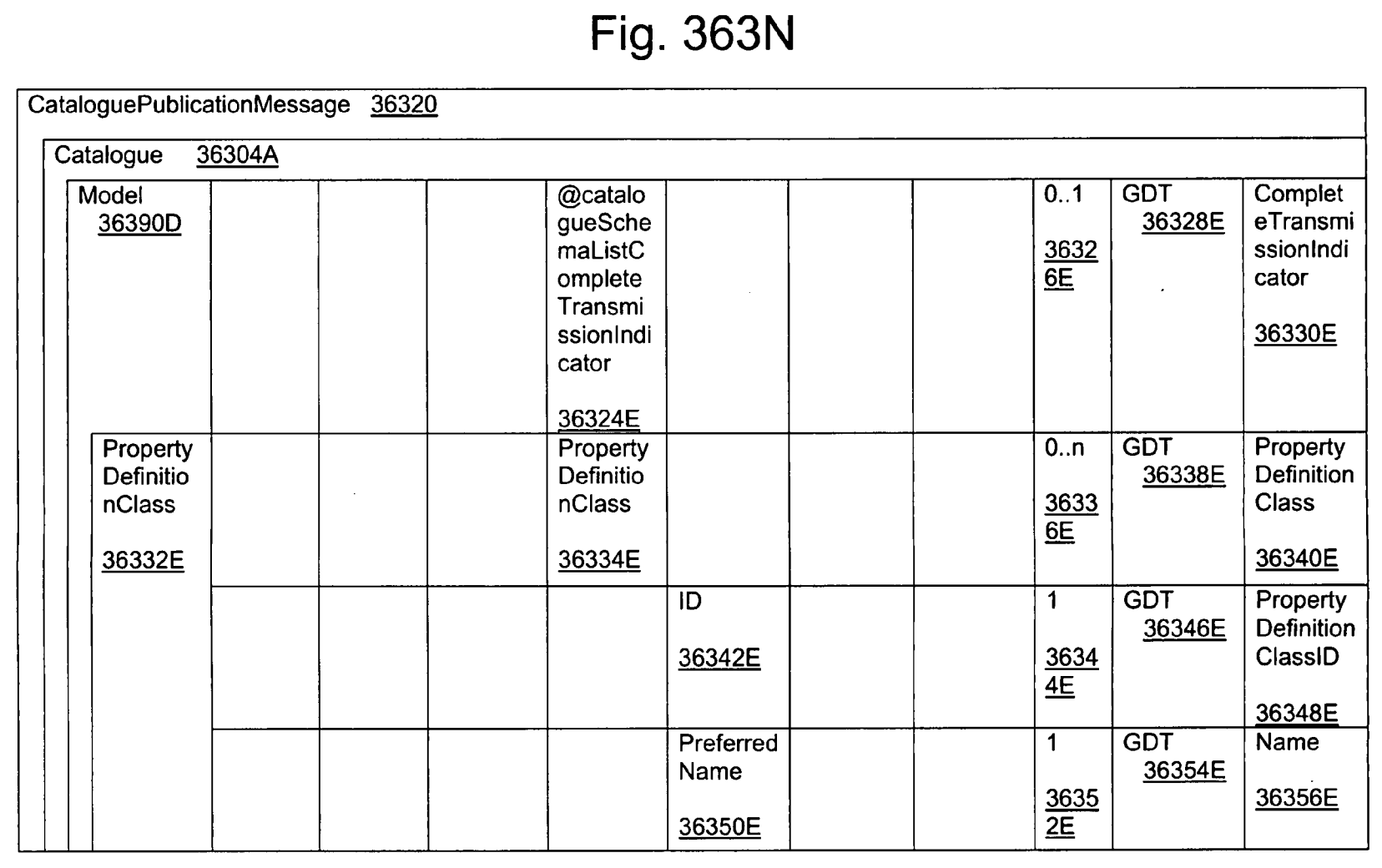

CataloguePublicationMessage 36320

Catalogue 36304A

| | | | | | | | | | |
|---|---|---|---|---|---|---|---|---|---|
| Model 36390D | | | | @catalogueSchemaListCompleteTransmissionIndicator 36324E | | | | 0..1 36326E | GDT 36328E | CompleteTransmissionIndicator 36330E |
| Property DefinitionClass 36332E | | | | Property DefinitionClass 36334E | | | | 0..n 36336E | GDT 36338E | Property Definition Class 36340E |
| | | | | | ID 36342E | | | 1 36344E | GDT 36346E | Property Definition ClassID 36348E |
| | | | | | Preferred Name 36350E | | | 1 36352E | GDT 36354E | Name 36356E |

Fig. 363O

CataloguePublicationMessage 36320

Catalogue 36304A

Model 36390D

| | | | | | | | | | | |
|---|---|---|---|---|---|---|---|---|---|---|
| PropertyDefinitionClass 36332E | | | | | DefinedProperty 36358E | | | 0..n 36360E | | |
| | | | | | | Reference 36362E | | 1 36364E | GDT 36366E | PropertyReference 36368E |
| | | | | | | | ID 36370E | 1 36372E | GDT 36374E | PropertyID 36376E |
| | | | | | | OrdinalNumberValue 36378E | | 0..1 36380E | GDT 36382E | OrdinalNumberValue 36384E |
| PropertyDataType 36386E | | | | PropertyDataType 36388E | | | | 0..n 36390E | GDT 36392E | PropertyDataType 36394E |

Fig. 363P

CataloguePublicationMessage 36320

Catalogue 36304A

Model 36390D

| | | | | | | | | | | |
|---|---|---|---|---|---|---|---|---|---|---|
| Property DataType 36386E | | | | | @actionCode 36396E | | | 0..1 36398E | GDT 36300F | ActionCode 36302F |
| | | | | | ID 36304F | | | 0..1 36306F | GDT 36308F | PropertyDataTypeID 36310F |
| | | | | | PreferredName 36312F | | | 1..n 36314F | GDT 36316F | Name 36318F |
| | | | | | | @languageCode 36320F | | 0..1 36322F | GDT 36324F | LanguageCode 36326F |
| | | | | | FormatCode 36328F | | | 1 36330F | GDT 36332F | PropertyDataTypeFormatCode 36334F |

Fig. 363Q

CataloguePublicationMessage 36320

Catalogue 36304A

Model 36390D

| | | | | | | | | | | |
|---|---|---|---|---|---|---|---|---|---|---|
| PropertyDataType 36386E | | | | | MaximumTotalDigitNumberValue 36336F | | | 0..1 36338F | GDT 36340F | DigitNumberValue 36342F |
| | | | | | FractionalDigitNumberValue 36344F | | | 0..1 36346F | GDT 36348F | DigitNumberValue 36350F |
| | | | | | PropertyDefinitionClassReference 36352F | | | 0..1 36354F | GDT 36356F | PropertyDefinitionClassReference 36358F |
| | | | | | | ID 36360F | | 1 36362F | GDT 36364F | PropertyDefinitionClassID 36366F |
| | | | | | AllowedPropertyValueElement 36368F | | | 0..n 36370F | | |

Fig. 363R

CataloguePublicationMessage 36320

Catalogue 36304A

Model 36390D

| | | | | | | | | | | |
|---|---|---|---|---|---|---|---|---|---|---|
| Property DataType 36386E | | | | | | Property Value 36372F | | 1 36374F | GDT 36376F | Property Value 36378F |
| Property 36380F | | | | Property 36382F | | | | 0..n 36384F | GDT 36386F | Property 36388F |
| | | | | | @actionCode 36390F | | | 0..1 36392F | GDT 36394F | ActionCode 36396F |
| | | | | | ID 36398F | | | 1 36300G | GDT 36302G | PropertyID 36304G |
| | | | | | DefinitionClassReference 36306G | | | 0..1 36308G | GDT 36310G | PropertyDefinitionClassReference 36312G |

Fig. 363S

CataloguePublicationMessage 36320

Catalogue 36304A

Model 36390D

Model 36390D

| | | | | | | | | | | |
|---|---|---|---|---|---|---|---|---|---|---|
| Property 36380F | | | | | | ID 36314G | | 1 36316G | GDT 36318G | PropertyDefinitionClassID 36320G |
| | | | | | PreferredName 36322G | | | 1..n 36324G | GDT 36326G | Name 36328G |
| | | | | | PropertyDataTypeReference 36330G | | | 1 36332G | GDT 36334G | PropertyDataTypeReference 36336G |
| | | | | | | ID 36338G | | 1 36340G | GDT 36342G | PropertyDataTypeID 36344G |
| | | | | | AspectID 36346G | | | 0..n 36348G | GDT 36350G | AspectID 36352G |

Fig. 363T

CataloguePublicationMessage 36320

Catalogue 36304A

Model 36390D

| | | | | | | | | | | |
|---|---|---|---|---|---|---|---|---|---|---|
| Property 36380F | | | | | TargetInterfaceElementID 36354G | | | 0..n 36356G | GDT 36358G | InterfaceElementID 36360G |
| | | | | | MultipleValueIndicator 36362G | | | 0..1 36364G | GDT 36366G | PropertyMultipleValueIndicator 36368G |
| | | | | | TextSearchableIndicator 36370G | | | 0..1 36372G | GDT 36374G | TextSearchableIndicator 36376G |
| | | | | | ParametricSearchableIndicator 36378G | | | 0..1 36380G | GDT 36382G | PropertyParametricSearchableIndicator 36384G |
| | | | | | ValuationRequiredIndicator 36386G | | | 0..1 36388G | GDT 36390G | PropertyValuationRequiredIndicator 36392G |

Fig. 363U

CataloguePublicationMessage 36320

Catalogue 36304A

Model 36390D

| | | | | | | | | | | |
|---|---|---|---|---|---|---|---|---|---|---|
| CatalogueItemProperty 36394G | | | | CatalogueItemProperty 36396G | | | | 0..n 36398G | | CatalogueItemProperty 36302H |
| | | | | | PropertyReference 36304H | | | 1 36306H | GDT 36308H | PropertyReference 36310H |
| | | | | | | ID 36312H | | 1 36314H | GDT 36316H | PropertyID 36318H |
| | | | | | OrdinalNumberValue 36320H | | | 1 36322H | GDT 36324H | OrdinalNumberValue 36326H |
| CatalogueSectionType 36328H | | | | CatalogueSectionType 36330H | | | | 0..n 36332H | | Catalogue Section Type 36336H |

Fig. 363V

CataloguePublicationMessage 36320

Catalogue 36304A

Model 36390D

| | | | | | | | | | | |
|---|---|---|---|---|---|---|---|---|---|---|
| CatalogueSectionType 36328H | | | | | @actionCode 36338H | | | 0..1 36340H | GDT 36342H | ActionCode 36344H |
| | | | | | ID 36346H | | | 1 36348H | GDT 36350H | CatalogueSectionTypeID 36352H |
| | | | | | Name 36354H | | | 0..n 36356H | GDT 36358H | Name 36360H |
| | | | | | SectionProperty 36362H | | | 0..n 36364H | | CatalogueSectionTypeSectionProperty 36368H |
| | | | | | | PropertyReference 36370H | | 1 36372H | GDT 36374H | PropertyReference 36376H |

Fig. 363W

CataloguePublicationMessage 36320

Catalogue 36304A

Model 36390D

| | | | | | | | | | | |
|---|---|---|---|---|---|---|---|---|---|---|
| CatalogueSectionType 36328H | | | | | | | ID 36378H | 1 36380H | GDT 36382H | PropertyID 36384H |
| | | | | | | OrdinalNumberValue 36386H | | 1 36388H | GDT 36390H | OrdinalNumberValue 36392H |
| CatalogueSchema 36394H | | | | CatalogueSchema 36396H | | | | 0..n 36398H | | CatalogueSchema 36302I |
| | | | | | @actionCode 36304I | | | 0..1 36306I | GDT 36308I | ActionCode 36310I |
| | | | | | @catalogueSectionListCompleteTransmissionIndicator 36312I | | | 0..1 36314I | GDT 36316I | CompleteTransmissionIndicator 36318I |

Fig. 363X

CataloguePublicationMessage 36320

Catalogue 36304A

Model 36390D

| | | | | | | | | | | |
|---|---|---|---|---|---|---|---|---|---|---|
| CatalogueSchema 36394H | | | | | @catalogueSectionRelationshipListCompleteTransmissionIndicator 36320I | | | 0..1 36322I | GDT 36324I | CompleteTransmissionIndicator 36326I |
| | | | | | ID 36328I | | | 1 36330I | GDT 36332I | CatalogueSchemaID 36334I |
| | | | | | TypeCode 36336I | | | 0..1 36338I | GDT 36340I | CatalogueSchemaTypeCode 36342I |
| | | | | | Name 36344I | | | 0..n 36346I | GDT 36348I | Name 36350I |

Fig. 363Y

CataloguePublicationMessage 36320

Catalogue 36304A

Model 36390D

| | | | | | | | | | | |
|---|---|---|---|---|---|---|---|---|---|---|
| CatalogueSchema 36394H | | | | | CatalogueItemProperty 36352I | | | 0..n 36354I | | CatalogueSchemaCatalogueItemProperty 36358I |
| | | | | | | PropertyReference 36360I | | 1 36362I | GDT 36364I | PropertyReference 36366I |
| | | | | | | | ID 36368I | 1 36370I | GDT 36372I | PropertyID 36374I |
| | | | | | | OrdinalNumberValue 36376I | | 1 36378I | GDT 36380I | OrdinalNumberValue 36382I |
| | | | | | CatalogueSection 36384I | | | 0..n 36386I | | CatalogueSection 36390I |

Fig. 363Z

CataloguePublicationMessage 36320

Catalogue 36304A

Model 36390D

| | | | | | | | | | | |
|---|---|---|---|---|---|---|---|---|---|---|
| CatalogueSchema 36394H | | | | | | @actionCode 36392I | | 0..1 36394I | GDT 36396I | ActionCode 36398I- |
| | | | | | | @propertyValuationListCompleteTransmissionIndicator 36300J | | 0..1 36302J | GDT 36304J | CompleteTransmissionIndicator 36306J |
| | | | | | | ID 36308J | | 1 36310J | GDT 36312J | CatalogueSectionID 36314J |
| | | | | | | TypeID 36316J | | 0..1 36318J | GDT 36320J | CatalogueSectionTypeID 36322J |
| | | | | | | Name 36324J | | 0..n 36326J | GDT 36328J | Name 36330J |

Fig. 363AA

CataloguePublicationMessage 36320

Catalogue 36304A

Model 36390D

| | | | | | | | | | | |
|---|---|---|---|---|---|---|---|---|---|---|
| CatalogueSchema 36394H | | | | | | PropertyValuation 36332J | | 0..n 36334J | GDT 36336J | PropertyValuation 36338J |
| | | | | | | CatalogueItemProperty 36340J | | 0..n 36342J | | CatalogueSectionCatalogueItemProperty 36346J |
| | | | | | | | PropertyReference 36348J | 1 36350J | GDT 36352J | PropertyReference 36354J |
| | | | | | | | OrdinalNumberValue 36362J | 1 36364J | GDT 36366J | OrdinalNumberValue 36368J |

Fig. 363AB

CataloguePublicationMessage 36320

Catalogue 36304A

Model 36390D

| | | | | | | | | | | |
|---|---|---|---|---|---|---|---|---|---|---|
| CatalogueSchema 36394H | | | | | CatalogueSectionRelationship 36370J | | | 0..n 36372J | | CatalogueSectionRelationship 36376J |
| | | | | | | @actionCode 36378J | | 0..1 36380J | GDT 36382J | ActionCode 36384J |
| | | | | | | SourceCatalogueSectionID 36386J | | 1 36388J | GDT 36390J | CatalogueSectionID 36392J |
| | | | | | | TargetCatalogueSectionID 36394J | | 1 36396J | GDT 36398J | CatalogueSectionID 36300K |
| Content 36302K | | | Content 36304K | | | | | 0..1 36306K | | CatalogueContent 36310K |

Fig. 363AC

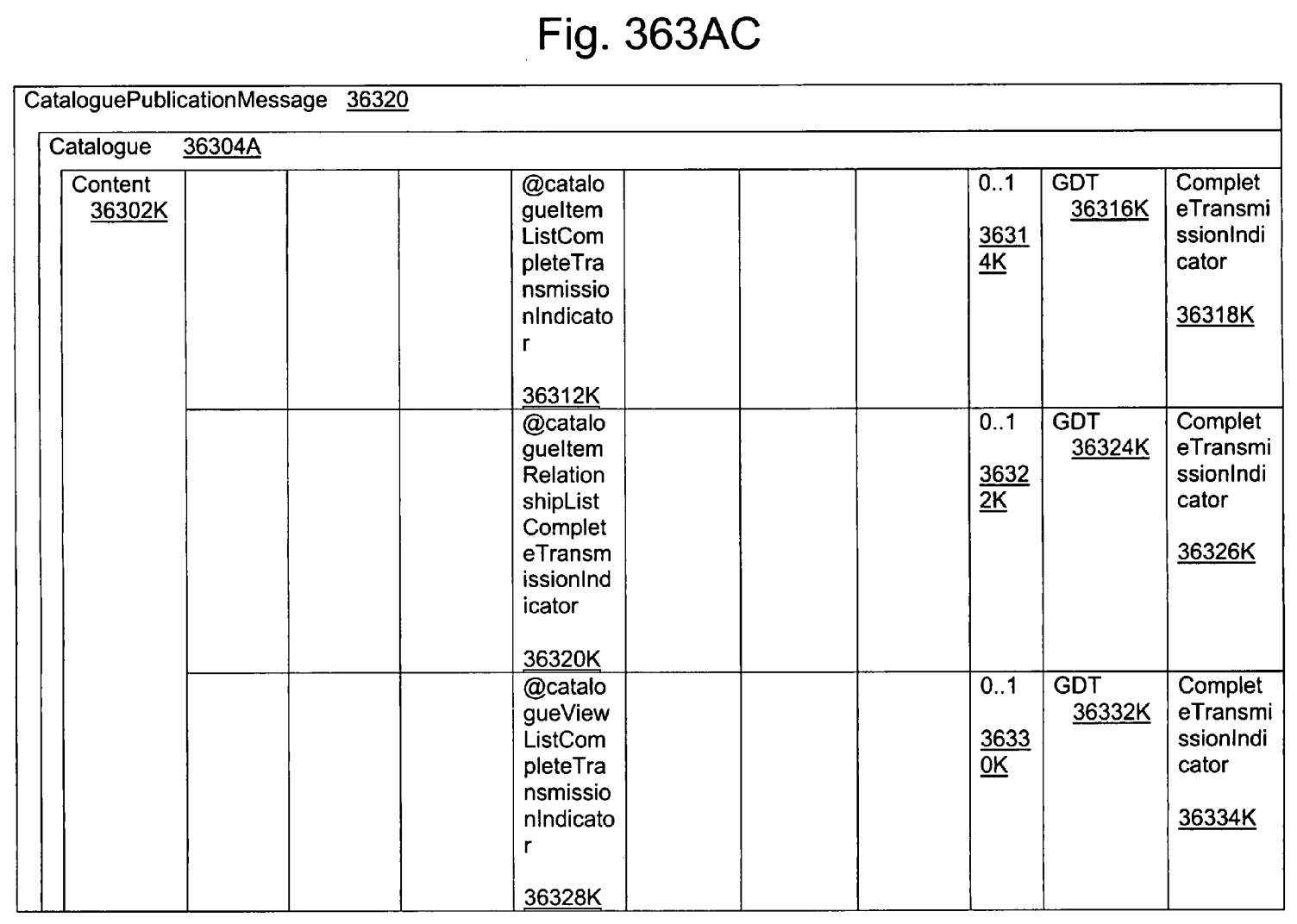

CataloguePublicationMessage 36320

Catalogue 36304A

| | | | | | | | | | | |
|---|---|---|---|---|---|---|---|---|---|---|
| Content 36302K | | | | @catalogueItemListCompleteTransmissionIndicator 36312K | | | | 0..1 36314K | GDT 36316K | CompleteTransmissionIndicator 36318K |
| | | | | @catalogueItemRelationshipListCompleteTransmissionIndicator 36320K | | | | 0..1 36322K | GDT 36324K | CompleteTransmissionIndicator 36326K |
| | | | | @catalogueViewListCompleteTransmissionIndicator 36328K | | | | 0..1 36330K | GDT 36332K | CompleteTransmissionIndicator 36334K |

Fig. 363AD

CataloguePublicationMessage 36320

Catalogue 36304A

| | | | | | | | | | | |
|---|---|---|---|---|---|---|---|---|---|---|
| Content 36302K | | | | CatalogueSchemaID 36336K | | | | 0..1 36338K | GDT 36340K | CatalogueSchemaID 36342K |
| CatalogueItem 36344K | | | | CatalogueItem 36346K | | | | 0..n 36348K | | Catalogue Item 36352K |
| | | | | | @actionCode 36354K | | | 0..1 36356K | GDT 36358K | ActionCode 36360K |
| | | | | | @propertyValuationListCompleteTransmissionIndicator 36362K | | | 0..1 36364K | GDT 36366K | CompleteTransmissionIndicator 36368K |
| | | | | | ID 36370K | | | 1 36372K | GDT 36374K | CatalogueItemID 36376K |

Fig. 363AE

CataloguePublicationMessage 36320

Catalogue 36304A

Content 36302K

| | | | | | | | | | | |
|---|---|---|---|---|---|---|---|---|---|---|
| CatalogueItem 36344K | | | | | Description 36378K | | | 0..n 36380K | GDT 36382K | Description 36384K |
| | | | | | Classification 36386K | | | 0..n 36388K | | CatalogueItemClassification 36392K |
| | | | | | | CatalogueSchemaID 36394K | | 0..1 36396K | GDT 36398K | CatalogueSchemaID 36300L |
| | | | | | | CatalogueSectionID 36302L | | 1 36304L | GDT 36306L | CatalogueSectionID 36308L |
| | | | | | PropertyValuation 36310L | | | 0..n 36312L | GDT 36314L | PropertyValuation 36316L |

Fig. 363AF

CataloguePublicationMessage 36320

Catalogue 36304A

Content 36302K

| | | | | | | | | | | |
|---|---|---|---|---|---|---|---|---|---|---|
| CatalogueItem 36344K | | | | CatalogueItemRelationship 36318L | | | | 0..n 36320L | | CatalogueItemRelationship 36324L |
| | | | | | @actionCode 36326L | | | 0..1 36328L | GDT 36330L | ActionCode 36332L |
| | | | | | SourceCatalogueItemID 36334L | | | 1 36336L | GDT 36338L | CatalogueItemID 36340L |
| | | | | | TargetCatalogueItemID 36342L | | | 1 36344L | GDT 36346L | CatalogueItemID 36348L |
| | | | | | TypeCode 36350L | | | 1 36352L | GDT 36354L | ObjectStructureRelationshipTypeCode 36356L |

Fig. 363AG

CataloguePublicationMessage 36320

Catalogue 36304A

Content 36302K

| | | | | | | | | | | |
|---|---|---|---|---|---|---|---|---|---|---|
| CatalogueView 36358L | | | | CatalogueView 36360L | | | | 0..n 36362L | | CatalogueView 36366L |
| | | | | | @actionCode 36368L | | | 0..1 36370L | GDT 36372L | ActionCode 36374L |
| | | | | | @itemListCompleteTransmissionIndicator 36376L | | | 0..1 36378L | GDT 36380L | CompleteTransmissionIndicator 36382L |
| | | | | | @itemRelationshipTypeListCompleteTransmissionIndicator 36384L | | | 0..1 36386L | GDT 36388L | CompleteTransmissionIndicator 36390L |

Fig. 363AH

CataloguePublicationMessage 36320

Catalogue 36304A

Content 36302K

| | | | | | | | | | | |
|---|---|---|---|---|---|---|---|---|---|---|
| CatalogueView 36358L | | | | | @excludedPropertyListCompleteTransmissionIndicator 36392L | | | 0..1 36394L | GDT 36396L | CompleteTransmissionIndicator 36398L |
| | | | | | ID 36300M | | | 1 36302M | GDT 36304M | CatalogueViewID 36306M |
| | | | | | Name 36308M | | | 0..n 36310M | GDT 36312M | Name 36314M |
| | | | | | Schema 36316M | | | 0..n 36318M | | CatalogueViewSchema 36322M |

Fig. 363AI

| | | | | | | | | | | |
|---|---|---|---|---|---|---|---|---|---|---|
| CataloguePublicationMessage 36320 | | | | | | | | | | |
| Catalogue 36304A | | | | | | | | | | |
| Content 36302K | | | | | | | | | | |
| CatalogueView 36358L | | | | | | @sectionListCompleteTransmissionIndicator 36324M | | 0..1 36326M | GDT 36328M | CompleteTransmissionIndicator 36330M |
| | | | | | | CatalogueSchemaID 36332M | | 1 36334M | GDT 36336M | CatalogueSchemaID 36338M |
| | | | | | | Section 36340M | | 0..n 36342M | | CatalogueViewSchemaSection 36346M |
| | | | | | | | @actionCode 36348M | 0..1 36350M | GDT 36352M | ActionCode 36354M |

Fig. 363AJ

CataloguePublicationMessage 36320

Catalogue 36304A

Content 36302K

| | | | | | | | | | | |
|---|---|---|---|---|---|---|---|---|---|---|
| CatalogueView 36358L | | | | | | | CatalogueSectionID 36356M | 1 36358M | GDT 36360M | CatalogueSectionID 36362M |
| | | | | | Item 36364M | | | 0..n 36366M | | CatalogueViewItem 36370M |
| | | | | | | @actionCode 36372M | | 0..1 36374M | GDT 36376M | ActionCode 36378M |
| | | | | | | CatalogueItemID 36380M | | 1 36382M | GDT 36384M | CatalogueItemID 36386M |
| | | | | | ItemRelationshipType 36388M | | | 0..n 36390M | | CatalogueViewItemRelationshipType 36394M |

Fig. 363AK

CataloguePublicationMessage 36320

Catalogue 36304A

Content 36302K

| | | | | | | | | | | |
|---|---|---|---|---|---|---|---|---|---|---|
| CatalogueView 36358L | | | | | | @actionCode 36396M | | 0..1 36398M | GDT 36300N | ActionCode 36302N |
| | | | | | | CatalogueItemRelationshipTypeCode 36304N | | 1 36306N | GDT 36308N | ObjectStructureRelationshipTypeCode 36310N |
| | | | | | ExcludedProperty 36312N | | | 0..n 36314N | | CatalogueViewExcludedProperty 36318N |
| | | | | | | @actionCode 36320N | | 0..1 36322N | GDT 36324N | ActionCode 36326N |
| | | | | | | PropertyReference 36328N | | 1 36330N | GDT 36332N | PropertyReference 36334N |
| | | | | | | | ID 36336N | 1 36338N | GDT 36340N | PropertyID 36342N |

FIG. 365A

| Package 36500 | L1 36502 | L2 36504 | L3 36506 | Card 36508 | Type 36510 | Name 36512 |
|---|---|---|---|---|---|---|
| CataloguePublication Transmission PackageMessage 36516 | CataloguePublication Transmission PackageMessage 36518 | | | | GDT 36520 | CataloguePublication TransmissionPackage Message 36522 |
| MessageHeader 36524 | | Message Header 36530 | | 1 36532 | GDT 36534 | Business Document Message Header 36536 |
| | | | ID 36540 | 1 36542 | GDT 36544 | Business Document MessageID 36546 |
| | | | Creation DateTime 36548 | 1 36550 | GDT 36552 | DateTime 36554 |
| | | | Sender Party 36556 | 0..1 36558 | GDT 36560 | BusinessDocument MessageHeaderParty 36562 |

FIG. 365B

Catalogue Publication Transmission Package Message 36516

| | | | | | |
|---|---|---|---|---|---|
| Transmission Information 36526 | TransmissionLog 36564 | | 0..1 36566 | | |
| | | Item 36568 | 1..n 36570 | GDT 36572 | LogItem 36574 |
| Catalogue Publication Transmission 36528 | CataloguePublication Transmission 36576 | | 1 36578 | GDT 36580 | CataloguePublication TransmissionPackage 36582 |
| | | ID 36584 | 1 36586 | GDT 36588 | TransmissionID 36590 |
| | | PackageOrdinal NumberValue 36592 | 1 36594 | GDT 36596 | OrdinalNumberValue 36598 |
| | | PackageCompleted Indicator 36500A | 1 36502A | GDT 36504A | BusinessTransaction CompletedIndicator 36506A |

Fig. 367A

| Package 36700 | Level 1 36702 | Level 2 36704 | Level 3 36706 | Cardinality 36708 | Type/Name 36710 | |
|---|---|---|---|---|---|---|
| CataloguePublicationConfirmationMessage 36714 | CataloguePublicationConfirmationMessage 36716 | | | | MDT 36718 | CataloguePublicationConfirmationMessage 36720 |
| MessageHeader 36722 | | MessageHeader 36724 | | 1 36726 | GDT 36728 | BusinessDocumentMessageHeader 36730 |
| | | | ID 36732 | 1 36734 | GDT 36736 | BusinessDocumentMessageID 36738 |
| | | | CreationDateTime 36740 | 1 36742 | GDT 36744 | DateTime 36746 |
| | | | SenderParty 36748 | 0..1 36750 | GDT 36752 | BusinessDocumentMessageHeaderParty 36754 |

Fig. 367B

| CataloguePublicationConfirmationMessage 36714 | | | | | | |
|---|---|---|---|---|---|---|
| TransmissionInformation 36756 | | TransmissionHeader 36758 | | 0..1 36760 | | BusinessDocumentTransmissionHeader 36764 |
| | | | ID 36766 | 1 36768 | GDT 36770 | TransmissionID 36772 |
| | | TransmissionLog 36774 | | 0..1 36776 | | |
| | | | Item 36778 | 1..n 36780 | GDT 36782 | LogItem 36784 |
| Catalogue 36786 | | Catalogue 36788 | | 1 36790 | | CataloguePublication Confirmation 36794 |
| | | | ID 36796 | 1 36798 | GDT 36700A | CatalogueID 36702A |
| | | | Publication Completed Indicator 36704A | 1 36706A | GDT 36708A | BusinessTransactionCompletedIndicator 36710A |

FIG. 369A

| Package 36900 | L1 36902 | L2 36904 | L3 36906 | L4 36908 | Conf. 36910 | Type 36912 | Name 36914 |
|---|---|---|---|---|---|---|---|
| Catalogue Publication Transmission Cancellation RequestMessage 36918 | Catalogue Publication Transmission Cancellation RequestMessage 36920 | | | | | GDT 36922 | Catalogue Publication Transmission Cancellation Request Message 36924 |
| Message Header 36926 | | Message Header 36932 | | | 1 36934 | GDT 36936 | Business Document Message Header 36938 |
| | | | ID 36942 | | 1 36944 | GDT 36946 | Business Document MessageID 36948 |
| | | | Creation DateTime 36950 | | 1 36952 | GDT 36954 | DateTime 36956 |
| | | | Sender Party 36958 | | 0..1 36960 | GDT 36962 | Business Document Message HeaderParty 36964 |

FIG. 369B

| Catalogue Publication Transmission Cancellation Request Message 36918 | | | | | | |
|---|---|---|---|---|---|---|
| Transmission Information 36928 | Transmission Header 36966 | | | 0..1 36968 | GDT 36970 | Business Document Transmission Header 36972 |
| | | MinimalRequested LogItemSeverity Code 36976 | | 0..1 36978 | GDT 36980 | LogItem SeverityCode 36982 |
| Catalogue Publication Transmission 36930 | Catalogue Publication Transmission 36984 | | | 1 36986 | GDT 36988 | Catalogue Publication Transmission Cancellation Request 36990 |
| | | ID 36992 | | 1 36994 | GDT 36996 | Transmission ID 36998 |
| Catalogue 36900A | | Catalogue 36902A | | 1 36904A | | |
| | | | ID 36906A | 1 36908A | GDT 36910A | CatalogueID 36912A |

FIG. 371A

| Package 37100 | L1 37102 | L2 37104 | L3 37106 | L4 37108 | Card. 37110 | Type 37112 | Name 37114 |
|---|---|---|---|---|---|---|---|
| Catalogue Publication Transmission Cancellation Confirmation Message 37118 | Catalogue Publication Transmission Cancellation Confirmation Message 37120 | | | | | GDT 37122 | CataloguePublication TransmissionCancellation ConfirmationMessage 37124 |
| Message Header 37126 | | Message Header 37132 | | | 1 37134 | GDT 37136 | BusinessDocument MessageHeader 37138 |
| | | | ID 37142 | | 1 37144 | GDT 37146 | BusinessDocument MessageID 37148 |
| | | | Creation DateTime 37150 | | 1 37152 | GDT 37154 | DateTime 37156 |

FIG. 371B

Catalogue Publication Transmission Catalogue Cancellation Request Message 37118

| | | | | | | |
|---|---|---|---|---|---|---|
| Message Header 37126 | | SenderParty 37158 | | 0..1 37160 | GDT 37162 | Business Document Message HeaderParty 37164 |
| Transmission Information 37128 | Transmission Header 37166 | | | 0..1 37168 | | |
| | | Item 37170 | | 1..n 37172 | GDT 37174 | LogItem 37176 |
| Catalogue Publication Transmission 37130 | Catalogue Publication Transmission 37178 | | | 1 37180 | GDT 37182 | Catalogue Publication Transmission Cancellation Confirmation 37184 |
| | | ID 37186 | | 1 37188 | GDT 37190 | Transmission ID 37192 |
| | | Cancellation Completed Indicator 37194 | | 1 37196 | GDT 37198A | Business Transaction Completed Indicator 37100A |
| Catalogue 37102A | | Catalogue 37104A | | 1 37106A | | |
| | | | ID 37108A | 1 37110A | GDT 37112A | CatalogueID 37114A |

FIG. 373A

| Package 37300 | L1 37302 | L2 37304 | L3 37306 | L4 37308 | L5 37310 | L6 37312 | Card. 37314 | Type 37316 | Name 37318 |
|---|---|---|---|---|---|---|---|---|---|
| Catalogue Publication Transmission ItemLock Request Message 37320 | Catalogue Publication Trans-mission ItemLock Request Message 37322 | | | | | | | GDT 37323 | CataloguePublication TransmissionItem LockRequest Message 37324 |
| Message Header 37326 | | Message Header 37332 | | | | | 1 37334 | GDT 37336 | BusinessDocument MessageHeader 37338 |
| | | | ID 37340 | | | | 1 37342 | GDT 37344 | BusinessDocument MessageID 37346 |
| | | | Creation Date Time 37348 | | | | 1 37350 | GDT 37352 | DateTime 37354 |
| | | | Sender Party 37356 | | | | 0..1 37358 | GDT 37360 | BusinessDocument MessageHeader Party 37362 |

FIG. 373B

Catalogue Publication Transmission ItemLock Request Message 37320

| | | | | | | |
|---|---|---|---|---|---|---|
| Transmission Information 37328 | Transmission Header 37364 | | | 0..1 37366 | GDT 37368 | Business Document Transmission Header 37370 |
| | | Minimal Requested LogItem Severity Code 37372 | | 0..1 37374 | GDT 37376 | LogItemSeverityCode 37378 |
| Catalogue Publication Transmission 37330 | Catalogue Publication Transmission 37380 | | | 1 37382 | GDT 37384 | CataloguePublication TransmissionItemLock Request 37386 |
| | | ID 37388 | | 1 37390 | GDT 37392 | Transmission ID 37394 |
| Catalogue 37396 | | Catalogue 37398 | | 1 37300A | | |
| | | | ID 37302A | 1 37304A | GDT 37306A | CatalogueID 37308A |
| Content 37310A | | | Content 37312A | 1 37314A | | |

FIG. 373C

| | | | | | |
|---|---|---|---|---|---|
| Catalogue Publication Transmission ItemLock Request Message | | | 37320 | | |
| Catalogue Publication Transmission | | | 37330 | | |
| Catalogue | | | 37396 | | |
| Content | | | 37310A | | |
| Item 37316A | Item 37318A | | 1..n 37320A | | |
| | | ID 37322A | 1 37324A | GDT 37326A | CatalogueItemID 37328A |

FIG. 375A

| Package 37500 | L1 37502 | L2 37504 | L3 37506 | L4 37508 | Card. 37510 | Type 37512 | Name 37514 |
|---|---|---|---|---|---|---|---|
| Catalogue Publication Transmission ItemLock Confirmation Message 37518 | Catalogue Publication Transmission ItemLock Confirmation Message 37520 | | | | | GDT 37522 | CataloguePublication TransmissionItemLock ConfirmationMessage 37524 |
| Message Header 37526 | | Message Header 37532 | | | 1 37534 | GDT 37536 | BusinessDocument MessageHeader 37538 |
| | | | ID 37542 | | 1 37544 | GDT 37546 | BusinessDocument MessageID 37548 |
| | | | Creation DateTime 37550 | | 1 37552 | GDT 37554 | DateTime 37556 |

FIG. 375B

Catalogue Publication Transmission Cancellation Request Message 37518

| | | | | | | |
|---|---|---|---|---|---|---|
| Message Header 37526 | | SenderParty 37558 | | 0..1 37560 | GDT 37562 | BusinessDocument MessageHeaderParty 37564 |
| Transmission Information 37528 | Transmission Log 37566 | | | 0..1 37568 | | |
| | | Item 37570 | | 1..n 37572 | GDT 37574 | LogItem 37576 |
| Catalogue Publication Transmission 37530 | Catalogue Publication Transmission 37578 | | | 1 37580 | GDT 37582 | CataloguePublication TransmissionItemLock Confirmation 37584 |
| | | ID 37586 | | 1 37588 | GDT 37590 | TransmissionID 37592 |
| | | ItemLockCompleted Indicator 37594 | | 1 37596 | GDT 37598 | BusinessTransaction CompletedIndicator 37500A |
| Catalogue 37502A | | Catalogue 37504A | | 1 37506A | | |
| | | | ID 37508A | 1 37510A | GDT 37512A | CatalogueID 37514A |

FIG. 375CA

| Package 375C00 | L1 375C01 | L2 375C02 | L3 375C03 | L4 375C04 | L5 375C05 | L6 375C06 | L7 375C07 | L8 375C08 | L9 375C09 | C 375C10 | Name 375C11 |
|---|---|---|---|---|---|---|---|---|---|---|---|
| CataloguePublicationTransmission ContentChangeRequestMessage 375C12 | CataloguePublicationTransmission Content Change Request Message 375C13 | | | | | | | | | | CataloguePublicationTransmission ContentChangeRequestMessage 375C14 |
| MessageHeader 375C15 | | MessageHeader 375C16 | | | | | | | | 1 375C17 | BusinessDocumentMessageHeader 375C18 |
| | | | ID 375C19 | | | | | | | 1 375C20 | BusinessDocumentMessageID 375C21 |
| | | | CreationDateTime 375C22 | | | | | | | 1 375C23 | DateTime 375C24 |

FIG. 375CB

| Package 375C00 | L1 375C01 | L2 375C02 | L3 375C03 | L4 375C04 | L5 375C05 | L6 375C06 | L7 375C07 | L8 375C08 | L9 375C09 | C 375C10 | Name 375C11 |
|---|---|---|---|---|---|---|---|---|---|---|---|
| | | | SenderParty 375C25 | | | | | | | 0..1 375C26 | BusinessDocumentMessageHeaderParty 375C27 |
| TransmissionInformation 375C28 | | TransmissionHeader 375C29 | | | | | | | | 0..1 375C30 | BusinessDocumentTransmissionHeader 375C31 |
| | | | Minimal Requested LogItem Severity Code 375C32 | | | | | | | 0..1 375C33 | LogItemSeverityCode 375C34 |
| CataloguePublicationTransmission 375C35 | | CataloguePublication Transmission 375C36 | | | | | | | | 1 375C37 | CataloguePublicationTransmission ContentChangeRequest 375C38 |

FIG. 375CC

| Package 375C00 | L1 375C01 | L2 375C02 | L3 375C03 | L4 375C04 | L5 375C05 | L6 375C06 | L7 375C07 | L8 375C08 | L9 375C09 | C 375C10 | Name 375C11 |
|---|---|---|---|---|---|---|---|---|---|---|---|
| | | | ID 375C39 | | | | | | | 1 375C40 | TransmissionID 375C41 |
| Catalogue 375C42 | | | Catalogue 375C43 | | | | | | | 1 375C44 | CataloguePublicationTransmission ContentChangeRequestCatalogue 375C45 |
| | | | | @completeTrans-missionIndicator 375C46 | | | | | | 1 375C47 | CompleteTransmissionIndicator 375C48 |
| | | | | @languageCode 375C49 | | | | | | 0..1 375C50 | LanguageCode 375C51 |
| | | | | @currencyCode 375C52 | | | | | | 0..1 375C53 | CurrencyCode 375C54 |

FIG. 375CD

| Package 375C00 | L1 375C01 | L2 375C02 | L3 375C03 | L4 375C04 | L5 375C05 | L6 375C06 | L7 375C07 | L8 375C08 | L9 375C09 | C 375C10 | Name 375C11 |
|---|---|---|---|---|---|---|---|---|---|---|---|
| | | | | @unitCode 375C55 | | | | | | 0..1 375C56 | MeasureUnitCode 375C57 |
| | | | | ID 375C58 | | | | | | 1 375C59 | CatalogueID 375C60 |
| Content 375C61 | | | | Content 375C62 | | | | | | 1 375C63 | CataloguePublicationTransmissionContentChangeRequestCatalogueContent 375C64 |
| | | | | | @catalogueItemListCompleteTransmissionIndicator 375C65 | | | | | 0..1 375C66 | CompleteTransmissionIndicator 375C67 |

FIG. 375CE

| Package 375C00 | L1 375C01 | L2 375C02 | L3 375C03 | L4 375C04 | L5 375C05 | L6 375C06 | L7 375C07 | L8 375C08 | L9 375C09 | C 375C10 | Name 375C11 |
|---|---|---|---|---|---|---|---|---|---|---|---|
| | | | | | @catalogueItemRelationshipListCompleteTransmissionIndicator 375C68 | | | | | 0..1 375C69 | CompleteTransmissionIndicator 375C70 |
| | | | | | @catalogueViewListCompleteTransmissionIndicator 375C71 | | | | | 0..1 375C72 | CompleteTransmissionIndicator 375C73 |
| | | | | | CatalogueSchemaID 375C74 | | | | | 0..1 375C75 | CatalogueSchemaID 375C76 |
| CatalogueItem 375C77 | | | | | CatalogueItem 375C78 | | | | | 0..n 375C79 | CatalogueItem 375C80 |
| | | | | | | @actionCode 375C81 | | | | 0..1 375C82 | ActionCode 375C83 |

FIG. 375CF

| Package 375C00 | L1 375C01 | L2 375C02 | L3 375C03 | L4 375C04 | L5 375C05 | L6 375C06 | L7 375C07 | L8 375C08 | L9 375C09 | C 375C10 | Name 375C11 |
|---|---|---|---|---|---|---|---|---|---|---|---|
| | | | | | | @propertyValuationList CompleteTransmissionIndicator 375C84 | | | | 0..1 375C85 | CompleteTransmissionIndicator 375C86 |
| | | | | | | ID 375C87 | | | | 1 375C88 | CatalogueItemID 375C89 |
| | | | | | | Description 375C90 | | | | 0..n 375C91 | Description 375C92 |
| | | | | | | Classification 375C93 | | | | 0..n 375C94 | CatalogueItemClassification 375C95 |
| | | | | | | | CatalogueSchemaID 375C96 | | | 0..1 375C97 | CatalogueSchemaID 375C98 |
| | | | | | | | CatalogueSectionID 375C99 | | | 1 375C00A | CatalogueSectionID 375C01A |

FIG. 375CG

| Package 375C00 | L1 375C01 | L2 375C02 | L3 375C03 | L4 375C04 | L5 375C05 | L6 375C06 | L7 375C07 | L8 375C08 | L9 375C09 | C 375C10 | Name 375C11 |
|---|---|---|---|---|---|---|---|---|---|---|---|
| | | | | | | PropertyValuation 375C02A | | | | 0..n 375C03A | PropertyValuation 375C04A |
| | | | | | | | @actionCode 375C05A | | | 0..1 375C06A | ActionCode 375C07A |
| | | | | | | | PropertyReference 375C08A | | | 1 375C09A | PropertyReference 375C10A |
| | | | | | | | | ID 375C11A | | 1 375C12A | PropertyID 375C13A |
| | | | | | | | ValueGroup 375C14A | | | 1..n 375C15A | PropertyValueIterator 375C16A |
| | | | | | | | | ID 375C17A | | 0..1 375C18A | Identifier 375C19A |

FIG. 375CH

| Package 375C00 | L1 375C01 | L2 375C02 | L3 375C03 | L4 375C04 | L5 375C05 | L6 375C06 | L7 375C07 | L8 375C08 | L9 375C09 | C 375C10 | Name 375C11 |
|---|---|---|---|---|---|---|---|---|---|---|---|
| | | | | | | | | ParentID 375C20A | | 0..1 375C21A | Identifier 375C22A |
| | | | | | | | | OrdinalNumberValue 375C23A | | 0..1 375C24A | OrdinalNumberValue 375C25A |
| | | | | | | | | PropertyValue 375C26A | | 0..n 375C27A | PropertyValue 375C28A |
| | | | | | | | | | AmountSpecification 375C29A | 0..1 375C30A | |
| | | | | | | | | | QuantitySpecification 375C31A | 0..1 375C32A | |

FIG. 375CI

| Package 375C00 | L1 375C01 | L2 375C02 | L3 375C03 | L4 375C04 | L5 375C05 | L6 375C06 | L7 375C07 | L8 375C08 | L9 375C09 | C 375C10 | Name 375C11 |
|---|---|---|---|---|---|---|---|---|---|---|---|
| | | | | | | | | | DecimalSpecification 375C33A | 0..1 375C34A | |
| | | | | | | | | | FloatSpecification 375C35A | 0..1 375C36A | |
| | | | | | | | | | IntegerSpecification 375C37A | 0..1 375C38A | |
| | | | | | | | | | DateTimeSpecification 375C39A | 0..1 375C40A | |
| | | | | | | | | | NameSpecification 375C41A | 0..1 375C42A | |

FIG. 375CJ

| Package 375C00 | L1 375C01 | L2 375C02 | L3 375C03 | L4 375C04 | L5 375C05 | L6 375C06 | L7 375C07 | L8 375C08 | L9 375C09 | C 375C10 | Name 375C11 |
|---|---|---|---|---|---|---|---|---|---|---|---|
| | | | | | | | | | IndicatorSpecification 375C43A | 0..1 375C44A | |
| | | | | | CatalogueItemRelationship 375C45A | | | | | 0..n 375C46A | CatalogueItemRelationship 375C47A |
| | | | | | | @actionCode 375C48A | | | | 0..1 375C49A | ActionCode 375C50A |
| | | | | | | SourceCatalogueItemID 375C51A | | | | 1 375C52A | CatalogueItemID 375C53A |
| | | | | | | TargetCatalogueItemID 375C54A | | | | 1 375C55A | CatalogueItemID 375C56A |
| | | | | | | TypeCode 375C57A | | | | 1 375C58A | ObjectStructureRelationshipTypeCode 375C59A |

FIG. 375CK

| Package 375C00 | L1 375C01 | L2 375C02 | L3 375C03 | L4 375C04 | L5 375C05 | L6 375C06 | L7 375C07 | L8 375C08 | L9 375C09 | C 375C10 | Name 375C11 |
|---|---|---|---|---|---|---|---|---|---|---|---|
| CatalogueView 375C60A | | | | | CatalogueView 375C61A | | | | | 0..n 375C62A | CataloguePublicationTransmission ContentChangeRequestCatalogueView 375C63A |
| | | | | | | @actionCode 375C64A | | | | 0..1 375C65A | ActionCode 375C66A |
| | | | | | | @itemListCompleteTransmissionIndicator 375C67A | | | | 0..1 375C68A | CompleteTransmissionIndicator 375C69A |
| | | | | | | ID 375C70A | | | | 1 375C71A | CatalogueViewID 375C72A |

FIG. 375CL

| Package 375C00 | L1 375C01 | L2 375C02 | L3 375C03 | L4 375C04 | L5 375C05 | L6 375C06 | L7 375C07 | L8 375C08 | L9 375C09 | C 375C10 | Name 375C11 |
|---|---|---|---|---|---|---|---|---|---|---|---|
| | | | | | | Name 375C73A | | | | 0..n 375C74A | Name 375C75A |
| | | | | | | Item 375C76A | | | | 0..n 375C77A | CatalogueViewItem 375C78A |
| | | | | | | | @actionCode 375C79A | | | 0..1 375C80A | ActionCode 375C81A |
| | | | | | | | CatalogueItemID 375C82A | | | 1 375C83A | CatalogueItemID 375C84A |

FIG. 375DA

| Package 375D00 | L1 375D01 | L2 375D02 | L3 375D03 | L4 375D04 | C 375D05 | Name 375D06 |
|---|---|---|---|---|---|---|
| CataloguePublicationTransmission ContentChangeConfirmationMessage 375D07 | CataloguePublicationTransmissionContentChangeConfirmationMessage 375D08 | | | | | CatalogueContentChangeConfirmation Message 375D09 |
| MessageHeader 375D10 | | MessageHeader 375D11 | | | 1 375D12 | BusinessDocumentMessageHeader 375D13 |
| | | | ID 375D14 | | 1 375D15 | BusinessDocumentMessageID 375D16 |
| | | | ReferenceID 375D17 | | 1 375D18 | BusinessDocumentMessageID 375D19 |
| | | | CreationDateTime 375D20 | | 1 375D21 | DateTime 375D22 |
| | | | SenderParty 375D23 | | 0..1 375D24 | BusinessDocumentMessageHeaderParty 375D25 |
| TransmissionInformation 375D26 | | TransmissionLog 375D27 | | | 0..1 375D28 | |
| | | | Item 375D29 | | 1..n 375D30 | LogItem 375D31 |

FIG. 375DB

| Package 375D00 | L1 375D01 | L2 375D02 | L3 375D03 | L4 375D04 | C 375D05 | Name 375D06 |
|---|---|---|---|---|---|---|
| CataloguePublication Transmission 375D32 | | CataloguePublication Transmission 375D33 | | | 1 375D34 | CataloguePublicationTransmission ContentChangeConfirmation 375D35 |
| | | | ID 375D36 | | 1 375D37 | TransmissionID 375D38 |
| | | | ContentChangeCompletedIndicator 375D39 | | 1 375D40 | BusinessTransactionCompletedIndicator 375D41 |
| Catalogue 375D42 | | | Catalogue 375D43 | | 1 375D44 | CatalogueContentChangeConfirmation 375D45 |
| | | | | ID 375D46 | 1 375D47 | CatalogueID 375D48 |

Fig. 378A

| Package 37800 | level 1 37802 | level 2 37804 | level 3 37806 | level 4 37808 | level 5 37810 | Card. 37812 | Data Type Name 37814 |
|---|---|---|---|---|---|---|---|
| PurchaseOrder Information Message 37816 | PurchaseOrder Information Message 37818 | | | | | | PurchaseOrder InformationMessage 37820 |
| MessageHeader 37822 | | Message Header 37824 | | | | 1 37826 | BusinessDocument MessageHeader 37828 |
| | | | ID 37830 | | | 1 37832 | BusinessDocument MessageID 37834 |
| | | | ReferenceID 37836 | | | 0..1 37838 | BusinessDocument MessageID 37840 |
| | | | CreationDate Time 37842 | | | 1 37844 | DateTime 37846 |
| | | | SenderParty 37848 | | | 0..1 37850 | BusinessDocument MessageParty 37852 |

Fig. 378B

| | | | | | | | |
|---|---|---|---|---|---|---|---|
| PurchaseOrderInformationMessage 37816 | | | | | | | |
| MessageHeader 37822 | | | | | | | |
| | | | | InternalID 37854 | | 0..1 37856 | PartyInternalID 37858 |
| | | | | StandardID 37860 | | 0..n 37862 | PartyStandardID 37864 |
| | | | | ContactPerson 37866 | | 0..1 37868 | ContactPerson 37870 |
| | | | | | BuyerID 37872 | 0..1 37874 | ContactPerson PartyID 37876 |
| | | | | | SellerID 37878 | 0..1 37880 | ContactPerson PartyID 37882 |
| | | | | | Address 37884 | 0..1 37886 | Address 37888 |
| | | | Recipient Party 37890 | | | 0..n 37892 | BusinessDocument MessageParty 37894 |

Fig. 378C

| PurchaseOrderInformationMessage 37816 | | | | | | |
|---|---|---|---|---|---|---|
| PurchaseOrder Information 37896 | | PurchaseOrder Information 37898 | | | 1 37800A | PurchaseOrder Information 37802A |
| | | | ID 37804A | | 1 37806A | BusinessTransaction DocumentID 37808A |
| | | | PostingDateTime 37810A | | 0..1 37812A | DateTime 37814A |
| | | | LastChangeDateTime 37816A | | 0..1 37818A | DateTime 37820A |
| | | | Note 37822A | | 0..1 37824A | Note 37826A |
| Party 37828A | | | BuyerParty 37830A | | 1 37832A | BusinessTransaction DocumentParty 37834A |
| | | | | StandardID 37836A | 0..n 37838A | PartyStandardID 37840A |
| | | | | BuyerID 37842A | 0..1 37844A | PartyPartyID 37846A |

Fig. 378D

| | | | | | |
|---|---|---|---|---|---|
| PurchaseOrderInformationMessage 37816 | | | | | |
| PurchaseOrderInformation 37896 | | | | | |
| Party 37828A | | | | | |
| | SellerID 37848A | | 0..1 37850A | PartyPartyID 37852A |
| | Address 37854A | | 0..1 37856A | Address 37858A |
| | ContactPerson 37860A | | 0..1 37862A | ContactPerson 37864A |
| | | BuyerID 37866A | 0..1 37868A | ContactPersonPartyID 37870A |
| | | SellerID 37872A | 0..1 37874A | ContactPersonPartyID 37876A |
| | | Address 37878A | 0..1 37880A | Address 37882A |
| SellerParty 37884A | | | 1 37886A | BusinessTransactionDocumentParty 37888A |
| ProductRecipientParty 37890A | | | 0..1 37892A | BusinessTransactionDocumentParty 37894A |

Fig. 378E

| | | | |
|---|---|---|---|
| PurchaseOrderInformationMessage | 37816 | | |
| PurchaseOrderInformation | 37896 | | |
| Party | 37828A | | |
| VendorParty 37896A | | 0..1 37898A | BusinessTransactionDocumentParty 37800B |
| ManufacturerParty 37802B | | 0..1 37804B | BusinessTransactionDocumentParty 37806B |
| BillToParty 37808B | | 0..1 37810B | BusinessTransactionDocumentParty 37812B |
| PayerParty 37814B | | 0..1 37816B | BusinessTransactionDocumentParty 37818B |
| CarrierParty 37820B | | 0..1 37822B | BusinessTransactionDocumentParty 37824B |
| ShipToLocation 37826B | | 0..1 37828B | BusinessTransactionDocument Location 37830B |
| | StandardID 37832B | 0..n 37834B | LocationStandardID 37836B |
| | BuyerID 37838B | 0..1 37840B | LocationPartyID 37842B |

Fig. 378F

| | | | | | |
|---|---|---|---|---|---|
| PurchaseOrderInformationMessage 37816 | | | | | |
| PurchaseOrderInformation 37896 | | | | | |
| Party 37828A | | | | | |
| | | SellerID 37844B | | 0..1 37846B | LocationPartyID 37848B |
| | | Address 37850B | | 0..1 37852B | Address 37854B |
| Location 37856B | ShipFrom Location 37858B | | | 0..1 37860B | BusinessTransactionDocument Location 37862B |
| Delivery Information 37864B | DeliveryTerms 37866B | | | 0..1 37868B | DeliveryTerms 37870B |
| | | DeliveryItemGroupID 37872B | | 0..1 37874B | BusinessTransactionDocumentItem GroupID 37876B |
| | | DeliveryPriorityCode 37878B | | 0..1 37880B | BusinessTransactionPriorityCode 37882B |
| | | Incoterms 37884B | | 0..1 37886B | Incoterms 37888B |

Fig. 378G

| | | | | |
|---|---|---|---|---|
| PurchaseOrderInformationMessage 37816 | | | | |
| PurchaseOrderInformation 37896 | | | | |
| DeliveryInformation 37864B | | | | |
| PartialDelivery 37890B | | 0..1 37892B | PartialDelivery 37894B | |
| QuantityTolerance 37896B | | 0..1 37898B | QuantityTolerance 37800C | |
| Transport 37802C | | 0..1 37804C | | |
| | ServiceLevelCode 37806C | 0..1 37808C | TransportServiceLevelCode 37810C | |
| | ModeCode 37812C | 0..1 37814C | TransportModeCode 37816C | |
| | MeansDescription Code 37818C | 0..1 37820C | TransportMeansDescriptionCode 37822C | |
| Description 37824C | | 0..1 37826C | Description 37828C | |

Fig. 378H

| | | | | | | |
|---|---|---|---|---|---|---|
| PurchaseOrderInformationMessage 37816 | | | | | | |
| PurchaseOrderInformation 37896 | | | | | | |
| PaymentInformation 37830C | | | CashDiscountTerms 37832C | | 0..1 37834C | CashDiscountTerms 37836C |
| | | | | PaymentBaselineDate 37838C | 0..1 37840C | Date 37842C |
| | | | | MaximumCashDiscount 37844C | 0..1 37846C | CashDiscount 37848C |
| | | | | NormalCashDiscount 37850C | 0..1 37852C | CashDiscount 37854C |
| | | | | FullPaymentDueDays Value 37856C | 0..1 37858C | |
| | | | PaymentForm 37860C | | 0..1 37862C | |
| | | | | Code 37864C | 1 37866C | PaymentFormCode 37868C |
| | | | | PaymentCard 37870C | 0..1 37872C | PaymentCard 37874C |

Fig. 378I

| | | | | |
|---|---|---|---|---|
| PurchaseOrderInformationMessage 37816 | | | | |
| PurchaseOrderInformation 37896 | | | | |
| Attachment 37876C | AttachmentWebAddress 37878C | | 0..n 37880C | AttachmentWebAddress 37882C |
| | InternalAttachmentWeb Address 37884C | | 0..n 37886C | AttachmentWebAddress 37888C |
| Description 37890C | Description 37892C | | 0..1 37894C | Description 37896C |
| | InternalDescription 37898C | | 0..1 37800D | Description 37802D |
| FollowUpMessage 37804D | FollowUpPurchaseOrder Confirmation 37806D | | 0..1 37808D | |
| | | RequirementCode 37810D | 1 37812D | FollowUpMessage RequirementCode 37814D |
| | FollowUpDespatched DeliveryNotification 37816D | | 0..1 37818D | |

Fig. 378J

| | | | | |
|---|---|---|---|---|
| PurchaseOrderInformationMessage 37816 | | | | |
| PurchaseOrderInformation 37896 | | | | |
| FollowUpMessage 37804D | | | | |
| | RequirementCode 37820D | | 1 37822D | FollowUpMessage RequirementCode 37824D |
| FollowUpService AcknowledgementRequest 37826D | | | 0..1 37828D | |
| | RequirementCode 37830D | | 1 37832D | FollowUpMessage RequirementCode 37834D |
| FollowUpInvoiceRequest 37836D | | | 0..1 37838D | |
| | RequirementCode 37840D | | 1 37842D | FollowUpMessage RequirementCode 37844D |
| | EvaluatedReceipt SettlementIndicator 37846D | | 0..1 37848D | EvaluatedReceipt SettlementIndicator 37850D |

Fig. 378K

| | | | | | |
|---|---|---|---|---|---|
| PurchaseOrderInformationMessage 37816 | | | | | |
| PurchaseOrderInformation 37896 | | | | | |
| Item 37852D | Item 37854D | | | 1..n 37856D | PurchaseOrderInformationItem 37858D |
| | | ID 37860D | | 1 37862D | BusinessTransactionDocumentItemID 37864D |
| | | ConfirmedInformationOutdatedIndicator 37866D | | 0..1 37868D | InformationOutdatedIndicator 37870D |
| | | HierarchyRelationship 37872D | | 0..1 37874D | |
| | | | ParentItemID 37876D | 1 37878D | BusinessTransactionDocumentItemID 37880D |
| | | | TypeCode 37882D | 1 37884D | BusinessTransactionDocumentItemHierarchyRelationshipTypeCode 37886D |

Fig. 378L

| | | | | |
|---|---|---|---|---|
| PurchaseOrderInformationMessage 37816 | | | | |
| PurchaseOrderInformation 37896 | | | | |
| Item 37852D | | | | |
| ProductInformation 37888D | Product 37890D | | 0..1 37892D | BusinessTransactionDocument Product 37894D |
| | | StandardID 37896D | 0..n 37898D | ProductStandardID 37800E |
| | | BuyerID 37802E | 0..1 37804E | ProductPartyID 37806E |
| | | SellerID 37808E | 0..1 37810E | ProductPartyID 37812E |
| | | ManufacturerID 37814E | 0..1 37816E | ProductPartyID 37818E |
| | | TypeCode 37820E | 0..1 37822E | ProductTypeCode 37824E |
| | | Note 37826E | 0..1 37828E | Note 37830E |

Fig. 378M

| | | | | |
|---|---|---|---|---|
| PurchaseOrderInformationMessage 37816 | | | | |
| PurchaseOrderInformation 37896 | | | | |
| Item 37852D | | | | |
| ProductInformation 37888D | | | | |
| | ProductCategory 37832E | | 0..1 37834E | BusinessTransactionDocument ProductCategory 37836E |
| | | StandardID 37838E | 0..n 37840E | ProductCategoryStandardID 37842E |
| | | BuyerID 37844E | 0..1 37846E | ProductCategoryPartyID 37848E |
| | | SellerID 37850E | 0..1 37852E | ProductCategoryPartyID 37854E |
| PriceInformation 37856E | Price 37858E | | 0..1 37860E | |
| | | NetUnitPrice 37862E | 0..1 37864E | Price 37866E |
| | ConfirmedPrice 37868E | | 0..1 37870E | |

Fig. 378N

| | | | | |
|---|---|---|---|---|
| PurchaseOrderInformationMessage 37816 | | | | |
| PurchaseOrderInformation 37896 | | | | |
| Item 37852D | | | | |
| PriceInformation 37856E | | | | |
| | | NetUnitPrice 37872E | 0..1 37874E | Price 37876E |
| | ProcurementCostUpperLimit 37878E | | 0..1 37880E | ProcurementCostUpperLimit 37882E |
| Party 37884E | BuyerParty 37886E | | 0..1 37888E | BusinessTransactionDocumentParty 37890E |
| | SellerParty 37892E | | 0..1 37894E | BusinessTransactionDocumentParty 37896E |
| | ProductRecipientParty 37898E | | 0..1 37800F | BusinessTransactionDocumentParty 37802F |
| | VendorParty 37804F | | 0..1 37806F | BusinessTransactionDocumentParty 37808F |

Fig. 378O

| | | | |
|---|---|---|---|
| PurchaseOrderInformationMessage 37816 | | | |
| PurchaseOrderInformation 37896 | | | |
| Item 37852D | | | |
| Party 37884E | | | |
| | ManufacturerParty 37810F | 0..1 37812F | BusinessTransactionDocumentParty 37814F |
| | BillToParty 37816F | 0..1 37818F | BusinessTransactionDocumentParty 37820F |
| | PayerParty 37822F | 0..1 37824F | BusinessTransactionDocumentParty 37826F |
| | CarrierParty 37828F | 0..1 37830F | BusinessTransactionDocumentParty 37832F |
| Location 37834F | ShipToLocation 37836F | 0..1 37838F | BusinessTransactionDocumentLocation 37840F |
| | ShipFromLocation 37842F | 0..1 37844F | BusinessTransactionDocumentLocation 37846F |
| DeliveryInformation 37848F | DeliveryTerms 37850F | 0..1 37852F | DeliveryTerms 37854F |

Fig. 378P

| | | | | |
|---|---|---|---|---|
| PurchaseOrderInformationMessage 37816 | | | | |
| PurchaseOrderInformation 37896 | | | | |
| Item 37852D | | | | |
| BusinessTransactionDocumentReference 37856F | QuoteReference 37858F | | 0..1 37860F | BusinessTransactionDocumentReference 37862F |
| | | ID 37864F | 1 37866F | BusinessTransactionDocumentID 37868F |
| | | ItemID 37870F | 0..n 37872F | BusinessTransactionDocumentItemID 37874F |
| | PurchaseContractReference 37876F | | 0..n 37878F | BusinessTransactionDocumentReference 37880F |
| | | ID 37882F | 1 37884F | BusinessTransactionDocumentID 37886F |
| | | ItemID 37888F | 0..n 37890F | BusinessTransactionDocumentItemID 37892F |

Fig. 378Q

| | | | | |
|---|---|---|---|---|
| PurchaseOrderInformationMessage 37816 | | | | |
| PurchaseOrderInformation 37896 | | | | |
| Item 37852D | | | | |
| BusinessTransactionDocumentReference 37856F | | | | |
| | OriginPurchaseOrder Reference 37894F | | 0..1 37896F | BusinessTransactionDocumentReference 37898F |
| | | ID 37800G | 1 37802G | BusinessTransactionDocumentID 37804G |
| | | ItemID 37806G | 0..n 37808G | BusinessTransactionDocumentItemID 37810G |
| | BuyerProductCatalog Reference 37812G | | 0..1 37814G | CatalogReference 37816G |
| | | ID 37818G | 1 37820G | CatalogID 37822G |
| | | ItemID 37824G | 0..n 37826G | CatalogItemID 37828G |

Fig. 378R

| | | | | | | | |
|---|---|---|---|---|---|---|---|
| PurchaseOrderInformationMessage 37816 | | | | | | | |
| PurchaseOrderInformation 37896 | | | | | | | |
| Item 37852D | | | | | | | |
| BusinessTransactionDocumentReference 37856F | | | | | | | |
| | | | | SellerProductCatalogReference 37830G | | 0..1 37832G | CatalogReference 37834G |
| | | | | | ID 37836G | 1 37838G | CatalogID 37840G |
| | | | | | ItemID 37842G | 0..n 37844G | CatalogItemID 37846G |
| Attachment 37848G | | | | AttachmentWebAddress 37850G | | 0..n 37852G | WebAddress 37854G |
| | | | | InternalAttachmentWebAddress 37856G | | 0..n 37858G | WebAddress 37860G |
| Description 37862G | | | | Description 37864G | | 0..1 37866G | Description 37868G |
| | | | | InternalDescription 37870G | | 0..1 37872G | Description 37874G |

Fig. 378S

| | | | | |
|---|---|---|---|---|
| PurchaseOrderInformationMessage 37816 | | | | |
| PurchaseOrderInformation 37896 | | | | |
| Item 37852D | | | | |
| ScheduleLine 37876G | ScheduleLine 37878G | | 0..n 37880G | PurchaseOrderInformationItem ScheduleLine 37882G |
| | | ID 37884G | 0..1 37886G | BusinessTransactionDocumentItem ScheduleLineID 37888G |
| | | DeliveryPeriod 37890G | 1 37892G | DateTimePeriod 37894G |
| | | Quantity 37896G | 0..1 37898G | Quantity 37800H |
| | Confirmed ScheduleLine 37802H | | 0..n 37804H | PurchaseOrderInformationItem ScheduleLine 37806H |

Fig. 378AA

| Package 378A00 | level 1 378A02 | level 2 378A04 | level 3 378A06 | level 4 378A08 | level 5 378A10 | Card. 378A12 | DataType Name 378A14 | |
|---|---|---|---|---|---|---|---|---|
| PurchaseOrderLegalDocumentMessage 378A16 | PurchaseOrderLegalDocumentMessage 378A18 | | | | | | MDT 378A20 | PurchaseOrderLegalDocumentMessage 378A22 |
| PurchaseOrderLegalDocument 378A24 | | PurchaseOrder 378A26 | | | | 1 378A28 | | PurchaseOrderInformation 378A30 |
| | | | ID 378A32 | | | 1 378A34 | | BusinessTransactionDocumentID 378A36 |
| | | | PostingDateTime 378A38 | | | 0..1 378A40 | | DateTime 378A42 |

Fig. 378AB

| | | | | | | |
|---|---|---|---|---|---|---|
| PurchaseOrderLegalDocumentMessage 378A16 | | | | | | |
| PurchaseOrderLegalDocument 378A24 | | | | | | |
| | LastChangeDateTime 378A44 | | | 0..1 378A46 | | DateTime 378A48 |
| | Note 378A50 | | | 0..1 78A52 | | Note 378A54 |
| Party 378A56 | BuyerParty 378A58 | | | 0..1 78A60 | | BusinessTransactionDocumentParty 378A62 |
| | | InternalID 378A64 | | 0..1 378A66 | | PartyInternalID 378A68 |
| | | StandardID 378A70 | | 0..n 378A72 | | PartyStandardID 378A74 |
| | | Address 378A76 | | 0..1 378A78 | | Address 378A80 |
| | | Contact Person 378A82 | | 0..1 378A84 | | ContactPerson 378A86 |
| | | | InternalID 378A88 | 0..1 378A90 | | ContactPersonID 378A92 |

Fig. 378AC

| | | | |
|---|---|---|---|
| PurchaseOrderLegalDocumentMessage 378A16 | | | |
| PurchaseOrderLegalDocument 378A24 | | | |
| Party 378A56 | | | |
| | Address 378A94 | 0..1 378A96 | Address 378A98 |
| SellerParty 378A02A | | 0..1 378A04A | BusinessTransactionDocumentParty 378A06A |
| ProductRecipientParty 378A08A | | 0..1 378A10A | BusinessTransactionDocumentParty 378A12A |
| VendorParty 378A14A | | 0..1 378A16A | BusinessTransactionDocumentParty 378A18A |
| ManufacturerParty 378A20A | | 0..1 378A22 | BusinessTransactionDocumentParty 378A24A |
| BillToParty 378A26A | | 0..1 378A28A | BusinessTransactionDocumentParty 378A30A |

Fig. 378AD

| | | | | |
|---|---|---|---|---|
| PurchaseOrderLegalDocumentMessage 378A16 | | | | |
| PurchaseOrderLegalDocument 378A24 | | | | |
| Party 378A56 | | | | |
| | PayerParty 378A32A | | 0..1 378A34A | BusinessTransactionDocumentParty 378A36A |
| | CarrierParty 378A38A | | 0..1 378A40A | BusinessTransactionDocumentParty 378A42A |
| Location 378A44A | ShipToLocation 378A46A | | 0..1 378A48A | BusinessTransactionDocumentShipToLocation 378A50A |
| | ShipFromLocation 378A52A | | 0..1 378A54A | BusinessTransactionDocumentShipFromLocation 378A56A |

Fig. 378AE

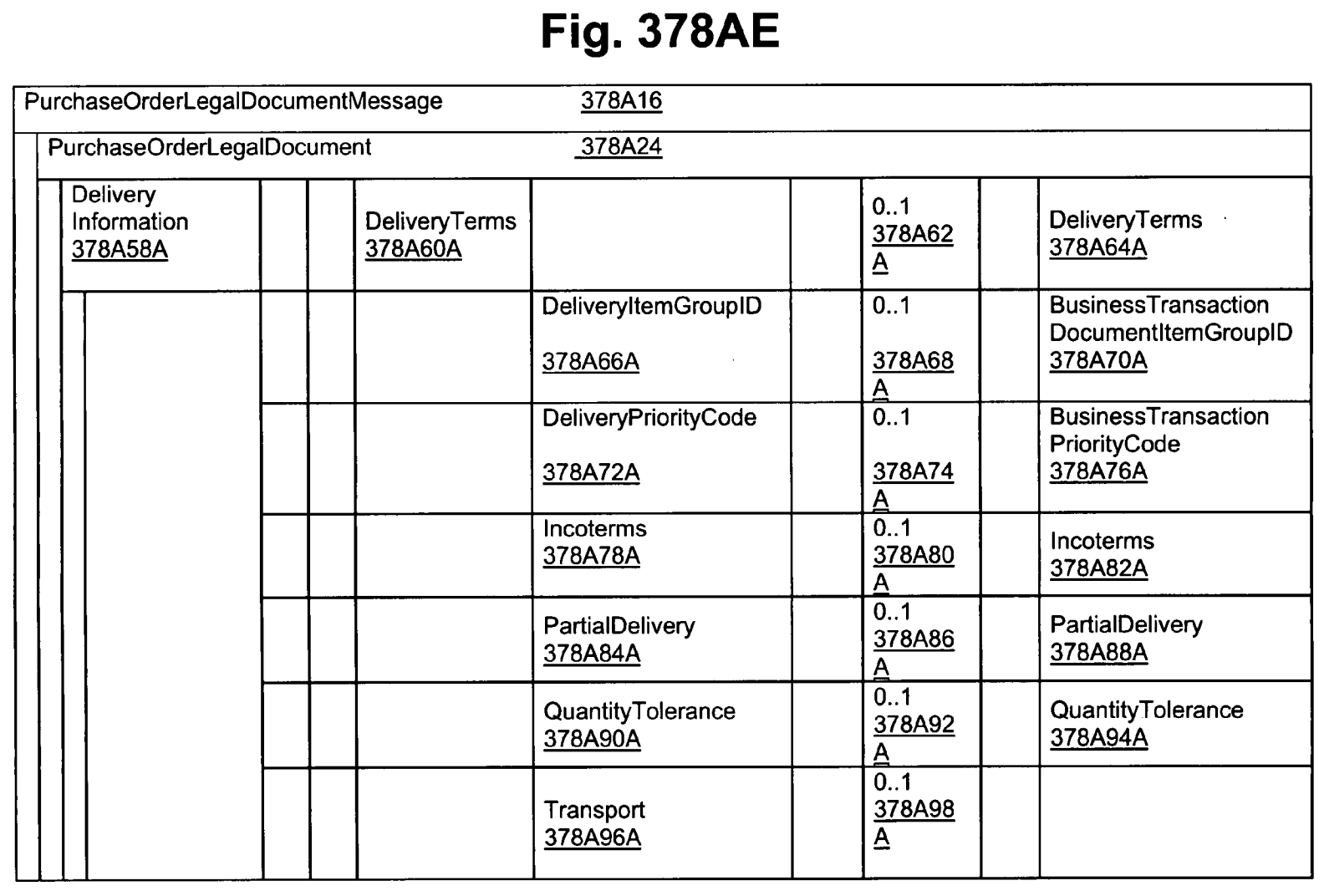

| | | | | | | |
|---|---|---|---|---|---|---|
| PurchaseOrderLegalDocumentMessage 378A16 | | | | | | |
| PurchaseOrderLegalDocument 378A24 | | | | | | |
| Delivery Information 378A58A | DeliveryTerms 378A60A | | | 0..1 378A62A | | DeliveryTerms 378A64A |
| | | DeliveryItemGroupID 378A66A | | 0..1 378A68A | | BusinessTransaction DocumentItemGroupID 378A70A |
| | | DeliveryPriorityCode 378A72A | | 0..1 378A74A | | BusinessTransaction PriorityCode 378A76A |
| | | Incoterms 378A78A | | 0..1 378A80A | | Incoterms 378A82A |
| | | PartialDelivery 378A84A | | 0..1 378A86A | | PartialDelivery 378A88A |
| | | QuantityTolerance 378A90A | | 0..1 378A92A | | QuantityTolerance 378A94A |
| | | Transport 378A96A | | 0..1 378A98A | | |

Fig. 378AF

| | | | | | | | |
|---|---|---|---|---|---|---|---|
| PurchaseOrderLegalDocumentMessage 378A16 | | | | | | | |
| PurchaseOrderLegalDocument 378A24 | | | | | | | |
| DeliveryInformation_ 378A58A | | | | | | | |
| | | | | ServiceLevel Code 378A02B | 0..1 378A04B | | TransportServiceLevel Code 378A06B |
| | | | | ModeCode 378A08B | 0..1 378A10B | | TransportModeCode 378A12B |
| | | | | Means DescriptionCode 378A14B | 0..1 378A16B | | TransportMeans DescriptionCode 378A18B |
| | | | Description 378A20B | | 0..1 378A22B | | Description 378A24B |
| Payment Information 378A26B | | | CashDiscount Terms 378A28B | | 0..1 378A30B | | CashDiscountTerms 378A32B |
| | | | Payment BaselineDate 378A34B | | 0..1 378A36B | | Date 378A38B |

Fig. 378AG

| | | | | | |
|---|---|---|---|---|---|
| PurchaseOrderLegalDocumentMessage 378A16 | | | | | |
| PurchaseOrderLegalDocument 378A24 | | | | | |
| PaymentInformation 378A26B | | | | | |
| | MaximumCashDiscount 378A40B | | 0..1 378A42B | | CashDiscount 378A44B |
| | NormalCash Discount 378A46B | | 0..1 378A48B | | CashDiscount 378A50B |
| | FullPaymentDueDays Value 378A52B | | 0..1 378A54B | | |
| PaymentForm 378A56B | | | 0..1 378A58B | | |
| | Code 378A60B | | 1 378A62B | | PaymentFormCode 378A64B |
| | PaymentCard 378A66B | | 0..1 378A68B | | PaymentCard 378A70B |

Fig. 378AH

| | | | | | | | | |
|---|---|---|---|---|---|---|---|---|
| PurchaseOrderLegalDocumentMessage 378A16 | | | | | | | | |
| PurchaseOrderLegalDocument 378A24 | | | | | | | | |
| Attachment 378A72B | | | AttachmentWebAddress 378A74B | | | 0..n 378A76B | | AttachmentWeb Address 378A78B |
| | | | InternalAttachmentWeb Address 378A80B | | | 0..n 378A82B | | AttachmentWeb Address 378A84B |
| | | | LegalDocument Attachment 378A86B | | | 0..n 378A88B | | Attachment 378A90B |
| Description 378A92B | | | Description 378A94B | | | 0..1 378A96B | | Description 378A98B |
| | | | InternalDescription 378A02C | | | 0..1 378A04C | | Description 378A06C |

Fig. 378AI

| | | | | | | | |
|---|---|---|---|---|---|---|---|
| PurchaseOrderLegalDocumentMessage 378A16 | | | | | | | |
| PurchaseOrderLegalDocument 378A24 | | | | | | | |
| FollowUp Message 378A08C | | | FollowUpPurchase OrderConfirmation 378A10C | | | 0..1 378A12 C | | |
| | | | | Requirement Code 378A14C | | 1 378A16 C | | FollowUpMessage RequirementCode 378A18C |
| | | | FollowUpDespatched DeliveryNotification 378A20C | | | 0..1 378A22 C | | |
| | | | | Requirement Code 378A24C | | 1 378A26 C | | FollowUpMessage RequirementCode 378A28C |
| | | | FollowUpService AcknowledgementRequest 378A30C | | | 0..1 378A32 C | | |
| | | | | Requirement Code 378A34C | | 1 378A36 C | | FollowUpMessage RequirementCode 378A38C |

Fig. 378AJ

| | | | | | | | | |
|---|---|---|---|---|---|---|---|---|
| PurchaseOrderLegalDocumentMessage 378A16 | | | | | | | | |
| PurchaseOrderLegalDocument 378A24 | | | | | | | | |
| FollowUpMessage 378A08C | | | | | | | | |
| | | | FollowUpInvoice Request 378A40C | | | 0..1 378A42C | | |
| | | | | RequirementCode 378A44C | | 1 378A46C | | FollowUpMessage RequirementCode 378A48C |
| | | | | EvaluatedReceipt SettlementIndicator 378A50C | | 0..1 378A52C | | EvaluatedReceipt SettlementIndicator 378A54C |
| Item 378A56C | | | Item 378A58C | | | 0..n 378A60C | | PurchaseOrder InformationItem 378A62C |
| | | | | ID 378A64C | | 1 378A66C | | BusinessTransaction DocumentItemID 378A68C |
| | | | | Hierarchy Relationship 378A70C | | 0..1 378A72C | | |

Fig. 378AK

| | | | | | | | | |
|---|---|---|---|---|---|---|---|---|
| PurchaseOrderLegalDocumentMessage 378A16 | | | | | | | | |
| PurchaseOrderLegalDocument 378A24 | | | | | | | | |
| Item 378A56C | | | | | | | | |
| | | | | | Parent ItemID 378A74C | 1 378A76C | | BusinessTransactionDocumentItemID 378A78C |
| | | | | | TypeCode 378A80C | 1 378A82C | | BusinessTransactionDocumentItemHierarchyRelationshipTypeCode 378A84C |
| Product Information 378A86C | | | | Product 378A88C | | 0..1 378A90C | | BusinessTransactionDocumentProduct 378A92C |
| | | | | | InternalID 378A94C | 0..1 378A96C | | ProductInternalID 378A98C |
| | | | | | StandardID 378A02D | 0..n 378A04D | | ProductStandardID 378A06D |
| | | | | | ManufacturerID 378A08D | 0..1 378A10D | | ProductPartyID 378A12D |
| | | | | | TypeCode 378A14D | 0..1 378A16D | | ProductTypeCode 378A18D |

Fig. 378AL

| | | | | | | | | | |
|---|---|---|---|---|---|---|---|---|---|
| PurchaseOrderLegalDocumentMessage 378A16 | | | | | | | | | |
| PurchaseOrderLegalDocument 378A24 | | | | | | | | | |
| Item 378A56C | | | | | | | | | |
| ProductInformation 378A86C | | | | | | | | | |
| | | | | | | Note 378A20D | 0..1 378A22D | | Note 378A24D |
| | | | | | ProductCategory 378A26D | | 0..1 378A28D | | BusinessTransaction DocumentProductCategory 378A30D |
| | | | | | | InternalID 378A32D | 0..1 378A34D | | ProdcutCategoryInternalID 378A36D |
| | | | | | | StandardID 378A38D | 0..n 378A40D | | ProductCategoryStandardID 378A42D |
| | Price Information 378A44D | | | | Price 378A46D | | 0..1 378A48D | | |
| | | | | | | NetUnitPrice 378A50D | 0..1 378A52D | | Price 378A54D |
| | | | | | ConfirmedPrice 378A56D | | 0..1 378A58D | | |

Fig. 378AM

| | | | | |
|---|---|---|---|---|
| PurchaseOrderLegalDocumentMessage | 378A16 | | | |
| PurchaseOrderLegalDocument | 378A24 | | | |
| Item | 378A56C | | | |
| PriceInformation | 378A44D | | | |
| | | | | |
| | | NetUnitPrice 378A60D | 0..1 378A62D | Price 378A64D |
| | ProcurementCost UpperLimit 378A66D | | 0..1 378A68D | ProcurementCostUpperLimit 378A70D |
| Party 378A72D | BuyerParty 378A74D | | 0..1 378A76D | BusinessTransaction DocumentParty 378A78D |
| | SellerParty 378A80D | | 0..1 378A82D | BusinessTransactionDocumentParty 378A84D |
| | ProductRecipient Party 378A86D | | 0..1 378A88D | BusinessTransactionDocumentParty 378A90D |
| | VendorParty 378A92D | | 0..1 378A94D | BusinessTransactionDocumentParty 378A96D |

Fig. 378AN

| | | | | | | | |
|---|---|---|---|---|---|---|---|
| PurchaseOrderLegalDocumentMessage | 378A16 | | | | | | |
| PurchaseOrderLegalDocument | 378A24 | | | | | | |
| Item | 378A56C | | | | | | |
| Party | 378A72D | | | | | | |
| | | | | ManufacturerParty 378A98D | | 0..1 378A02E | BusinessTransactionDocumentParty 378A04E |
| | | | | BillToParty 378A06E | | 0..1 378A08E | BusinessTransactionDocumentParty 378A10E |
| | | | | PayerParty 378A12E | | 0..1 378A14E | BusinessTransactionDocumentParty 378A16E |
| | | | | CarrierParty 378A18E | | 0..1 378A20E | BusinessTransactionDocumentParty 378A22E |
| Location 378A24 E | | | | ShipToLocation 378A26E | | 0..1 378A28E | BusinessTransactionDocumentShip ToLocation 378A30E |
| | | | | ShipFromLocation 378A32E | | 0..1 378A34E | BusinessTransactionDocumentShip FromLocation 378A36E |

Fig. 378AO

| | | | | |
|---|---|---|---|---|
| PurchaseOrderLegalDocumentMessage 378A16 | | | | |
| PurchaseOrderLegalDocument 378A24 | | | | |
| Item 378A56C | | | | |
| Delivery Information 378A38E | DeliveryTerms 378A40E | | 0..1 378A42E | DeliveryTerms 378A44E |
| BusinessDocument ObjectReference 378A46E | QuoteReference 378A48E | | 0..1 378A50E | BusinessTransactionDocument Reference 378A52E |
| | | ID 378A54E | 1 378A56E | BusinessTransactionDocumentID 378A58E |
| | | ItemID 378A60E | 0..n 378A62E | BusinessTransactionDocument ItemID 378A64E |
| | PurchaseContract Reference 378A66E | | 0..n 378A68E | BusinessTransactionDocument Reference 378A70E |
| | | ID 378A72E | 1 378A74E | BusinessTransactionDocumentID 378A76E |

Fig. 378AP

| | | | |
|---|---|---|---|
| PurchaseOrderLegalDocumentMessage 378A16 | | | |
| PurchaseOrderLegalDocument 378A24 | | | |
| Item 378A56C | | | |
| BusinessDocumentObjectReference 378A46E | | | |
| | ItemID 378A78E | 0..n 378A80E | BusinessTransactionDocumentItemID 378A82E |
| OriginPurchaseOrderReference 378A84E | | 0..1 378A86E | BusinessTransactionDocumentReference 378A88E |
| | ID 378A90E | 1 378A92E | BusinessTransactionDocumentID 378A94E |
| | ItemID 378A96E | 0..n 378A98E | BusinessTransactionDocumentItemID 378A02F |
| BuyerProductCatalogueReference 378A04F | | 0..1 378A06F | CatalogueReference 378A08F |
| | ID 378A10F | 1 378A12F | CatalogueID 378A14F |

Fig. 378AQ

| | | | | | |
|---|---|---|---|---|---|
| PurchaseOrderLegalDocumentMessage 378A16 | | | | | |
| PurchaseOrderLegalDocument 378A24 | | | | | |
| Item 378A56C | | | | | |
| BusinessDocumentObjectReference 378A46E | | | | | |
| | | ItemID 378A16F | 0..n 378A18F | | CatalogueItemID 378A20F |
| Attachment 378A22F | AttachmentWebAddress 378A24F | | 0..n 378A26F | | AttachmentWebAddress 378A28F |
| | InternalAttachmentWeb Address 378A30F | | 0..n 378A32F | | AttachmentWebAddress 378A34F |
| Description 378A36F | Description 378A38F | | 0..1 378A40F | | Description 378A42F |
| | InternalDescription 378A44F | | 0..1 378A46F | | Description 378A48F |

Fig. 378AR

| | | | | |
|---|---|---|---|---|
| PurchaseOrderLegalDocumentMessage 378A16 | | | | |
| PurchaseOrderLegalDocument 378A24 | | | | |
| Item 378A56C | | | | |
| ScheduleLine 378A50F | ScheduleLine 378A52F | | 0..n 378A54F | PurchaseOrderInformationItem ScheduleLine 378A56F |
| | | ID 378A58F | 0..1 378A60F | BusinessTransactionDocument ItemScheduleLineID 378A62F |
| | | Delivery Period 378A64F | 1 378A66F | DateTimePeriod 378A68F |
| | | Quantity 378A70F | 0..1 378A72F | Quantity 378A74F |
| | ConfirmedScheduleLine 378A76F | | 0..n 378A78F | PurchaseOrderInformationItem ScheduleLine 378A80F |

FIG. 381A

| Package 38100 | L1 38102 | L2 38104 | L3 38106 | L4 38108 | Occ. 38110 | Data Type 38112 |
|---|---|---|---|---|---|---|
| TaxDueMessage 38114 | TaxDue Message 38116 | | | | | GDT:TaxDueMessage 38118 |
| TaxDue 38120 | | TaxDue 38122 | | | 1 38124 | GDT:TaxDue 38126 |
| | | | BaseBusinessTransaction DocumentID 38128 | | 1 38130 | GDT:BusinessTransaction DocumentID 38132 |
| | | | BaseBusinessTransaction DocumentTypeCode 38134 | | 1 38136 | GDT:BusinessTransaction DocumentTypeCode 38138 |
| | | | BaseBusinessTransaction DocumentDate 38140 | | 1 38142 | GDT:Date 38144 |
| | | | ProductTaxEventTypeCode 38146 | | 0..1 38148 | GDT:ProductTaxEventType Code 38150 |
| Party 38152 | | | BuyerParty 38158 | | 0..1 38160 | GDT:BusinessTransaction DocumentParty 38162 |

FIG. 381B

| | | | | | | | | |
|---|---|---|---|---|---|---|---|---|
| TaxDueMessage | | | | | | 38114 | | |
| | TaxDue | | | | | 38120 | | |
| | | Party 38152 | | | SellerParty 38164 | | 0..1 38166 | GDT:BusinessTransactionDocumentParty 38168 |
| | | | | | Product RecipientParty 38170 | | 0..1 38172 | GDT:BusinessTransactionDocumentParty 38174 |
| | | | | | VendorParty 38176 | | 0..1 38178 | GDT:BusinessTransactionDocumentParty 38180 |
| | | | | | DebitorParty 38182 | | 0..1 38184 | GDT:BusinessTransactionDocumentParty 38186 |
| | | | | | CreditorParty 38188 | | 0..1 38190 | GDT:BusinessTransactionDocumentParty 38192 |
| | | Tax 38154 | | | ProductTax 38194 | | 1..n 38196 | GDT:ProductTax 38198 |
| | | Item 38156 | | | Item 38100A | | 1..n 38102A | GDT:TaxDueItem 38104A |

FIG. 381C

| | | | | | |
|---|---|---|---|---|---|
| TaxDueMessage 38114 | | | | | |
| TaxDue 38120 | | | | | |
| Item 38156 | | BaseBusinessTransactionDocument ItemID 38106A | 1 38108A | GDT:BusinessTransactionDocumentItemID 38110A |
| | | BaseBusinessTransactionDocument ItemTypeCode 38112A | 0..1 38114A | GDT:BusinessTransactionDocumentItem TypeCode 38116A |
| | | BaseBusinessTransactionDocument DeliveryDate 38118A | 0..1 38120A | GDT:Date 38122A |
| | | ProductTaxEventTypeCode 38124A | 0..1 38126A | GDT:ProductTaxEventTypeCode 38128A |
| | Party 38130A | BuyerParty 38134A | 0..1 38136A | GDT:BusinessTransactionDocumentParty 38138A |
| | | SellerParty 38140A | 0..1 38142A | GDT:BusinessTransactionDocumentParty 38144A |
| | | ProductRecipientParty 38146A | 0..1 38148A | GDT:BusinessTransactionDocumentParty 38150A |
| | | VendorParty 38152A | 0..1 38154A | GDT:BusinessTransactionDocumentParty 38156A |
| | | DebitorParty 38158A | 0..1 38160A | GDT:BusinessTransactionDocumentParty 38162A |

FIG. 381D

| | | | | | | | | |
|---|---|---|---|---|---|---|---|---|
| TaxDueMessage 38114 | | | | | | | | |
| | TaxDue 38120 | | | | | | | |
| | | Item 38156 | | | | | | |
| | | | Party 38130A | | | CreditorParty 38164A | 0..1 38166A | GDT:BusinessTransactionDocumentParty 38168A |
| | | | Tax 38132A | | | ProductTax 38170A | 1..n 38172A | GDT:ProductTax 38174A |

FIG. 384A

| Package 38400 | L1 38402 | L2 38404 | L3 38406 | L4 38408 | L5 38410 | Occ. 38412 | Data Type Name 38414 |
|---|---|---|---|---|---|---|---|
| DeliveryInformation Message 38416 | Delivery Information Message 38418 | | | | | | Delivery Information 38420 |
| MessageHeader 38422 | | Message Header 38426 | | | | 0..1 38428 | MessageHeader 38430 |
| | | | ID 38440E | | | 1 38442E | MessageID 38444E |
| | | | CreationDate Time 38446E | | | 1 38448E | DateTime 38450E |
| | | | SenderParty 38452E | | | 0..1 38454E | BusinessDocument MessageHeaderPa rty 38456E |
| | | | | InternalID 38458E | | 0..1 38460E | PartyInternalID 38462E |
| | | | | StandardID 38464E | | 0..1 38466E | PartyStandardID 38468E |
| | | | RecipientParty 38470E | | | 0..1 38472E | BusinessDocument MessageHeaderPa rty 38474E |
| | | | | InternalID 38476E | | 0..1 38478E | PartyInternalID 38480E |
| | | | | StandardID 38482E | | 0..1 38484E | PartyStandardID 38486E |

FIG. 384B

| DeliveryInformationMessage | | | 38416 | | | | |
|---|---|---|---|---|---|---|---|
| Delivery 38424 | | Delivery 38432 | | | | 1 38434 | |
| | | | actionCodeID 38448 | | | 0..1 38450 | ActionCode 38452 |
| | | | ID 38436 | | | 1 38438 | BusinessTransaction DocumentID 38440 |
| | | | VendorID 38488E | | | 0..1 38490E | BusinessTransaction DocumentID 38492E |
| | | | TypeCode 38442 | | | 1 38444 | BusinessTransaction DocumentTypeCode 38446 |
| | | | CreationDateTime 38454 | | | 1 38456 | DateTime 38458 |
| | | | LastChangeDateTime 38460 | | | 0..1 38462 | DateTime 38464 |
| | | | ThirdPartyDealIndicator 38488E | | | 0..1 38490E | BusinessTransaction DocumentThirdParty DealIndicator 38492E |
| | | | ReturnsIndicator 38494E | | | 0..1 38496E | ReturnsIndicator 38498E |

FIG. 384C

| | | | |
|---|---|---|---|
| DeliveryInformationMessage 38416 | | | |
| Delivery 38424 | VendorIndicatedActionIndicator 38460 | 0..1 38462 | PartyInitiatedAction Indicator 38464 |
| | GroupID 38466 | 0..1 38468 | BusinessTransaction DocumentGroupID 38470 |
| | GrossWeightMeasure 38472 | 0..1 38474 | Measure 38476 |
| | NetWeightMeasure 38478 | 0..1 38480 | Measure 38482 |
| | GrossVolumeMeasure 38484 | 0..1 38486 | Measure 38488 |
| | WayBillID 38400F | 0..1 38402F | BusinessTransaction DocumentID 38404F |
| | FreightInvoiceID 38406F | 0..1 38408F | BusinessTransaction DocumentID 38410F |
| | DangerousGoodsIndicator 38412F | 0..1 38414F | DangerousGoods Indicator 38416F |
| | Note 38400H | 0..1 38402H | Note 38404H |

FIG. 384D

| | | | | | |
|---|---|---|---|---|---|
| DeliveryInformationMessage | 38416 | | | | |
| Delivery | 38424 | | | | |
| Execution Information 38490 | PlannedExecution 38406A | | 0..1 38408A | | |
| | | IssuePeriod 38410A | 0..1 38412A | DateTimePeriod 38414A | |
| | | CarrierHandoverPeriod 38416A | 0..1 38418A | DateTimePeriod 38420A | |
| | | ArrivalPeriod 38422A | 0..1 38424A | DateTimePeriod 38426A | |
| | ActualExecution 38440A | | 0..1 38442A | | |
| | | PickingPeriod 38444A | 0..1 38446A | DateTimePeriod 38448A | |
| | | IssuePeriod 38450A | 0..1 38452A | DateTimePeriod 38454A | |
| | | PackingPeriod 38456A | 0..1 38458A | DateTimePeriod 38460A | |
| | | PutawayPeriod 38462A | 0..1 38464A | DateTimePeriod 38466A | |
| | | ReceiptPeriod 38468A | 0..1 38470A | DateTimePeriod 38472A | |

FIG. 384E

| | | | | |
|---|---|---|---|---|
| DeliveryInformationMessage 38416 | | | | |
| Delivery 38424 | | | | |
| Execution Information 38490 | LoadingPeriod 38418F | | 0..1 38420F | DateTimePeriod 38422F |
| | YardDepartureDateTime 38424F | | 0..1 38426F | DateTimePeriod 38428F |
| | ShippingPeriod 38430F | | 0..1 38432F | DateTimePeriod 38434F |
| | YardArrivalDateTime 38436F | | 0..1 38438F | DateTimePeriod 38440F |
| | UnloadingPeriod 38442F | | 0..1 38444F | DateTimePeriod 38446F |
| | UnpackingPeriod 38448F | | 0..1 38450F | DateTimePeriod 38452F |

FIG. 384F

| | | | | |
|---|---|---|---|---|
| DeliveryInformationMessage 38416 | | | | |
| Delivery 38424 | | | | |
| Party 38492 | BuyerParty 38474A | | 0..1 38476A | BusinessTransactionDocumentParty 38478A |
| | | InternalID 38480A | 0..1 38482A | PartyInternalID 38484A |
| | | Address 38486A | 0..1 38488A | Address 38490A |
| | | StandardID 38492A | 0..1 38494A | PartyStandardID 38496A |
| | VendorParty 38410B | | 0..1 38414B | BusinessTransactionDocumentParty 38416B |
| | | InternalID 38498A | 0..1 38400B | PartyInternalID 38402B |
| | | Address 38404B | 0..1 38406B | Address 38408B |
| | | StandardID 38412A | 0..1 38430F | PartyStandardID 38432F |
| | ProductRecipientParty 38434F | | 0..1 38438F | BusinessTransactionDocumentParty 38440F |
| | CarrierParty 38442F | | 0..1 38446F | BusinessTransactionDocumentParty 38448F |
| | BillToParty 38450F | | 0..1 38454F | BusinessTransactionDocumentParty 38456F |

FIG. 384G

| | | | | | | | |
|---|---|---|---|---|---|---|---|
| DeliveryInformationMessage 38416 | | | | | | | |
| Delivery 38424 | | | | | | | |
| Location 38494 | | ShipFromLocation 38426B | | | 0..1 38428B | BusinessTransactionDocumentLocation 38430B |
| | | | InternalID 38432B | | 0..1 38434B | LocationInternalID 38436B |
| | | | StandardID 38458F | | 0..1 38460F | LocationInternalID 38462F |
| | | | Loading Location 38464F | | 0..1 38466F | |
| | | | | InternalID 38468F | 0..1 38470F | LocationInternalID 38472F |
| | | | | StandardID 38474F | 0..1 38476F | LocationInternalID 38478F |
| | | | Address 38438B | | 0..1 38440B | Address 38442B |
| | | Transshipment Location 38444B | | | 0..1 38448B | BusinessTransactionDocumentLocation 38480F |
| | | ShipToLocation 38450B | | | 0..1 38454B | BusinessTransactionDocumentLocation 38456B |

FIG. 384H

| | | | | | |
|---|---|---|---|---|---|
| DeliveryInformationMessage 38416 | | | | | |
| Delivery 38424 | | | | | |
| Transportation Information 38496 | TransportMeans 38458B | | | 0..1 38460B | TransportMeans 38462B |
| | TransportTracking 38480G | | | 0..1 38480H | TransportTracking 38480I |
| BusinessTrans-actionDocument Reference 38498 | Outbound DeliveryReference 38464B | | | 0..1 38466B | BusinessTransaction DocumentReference 38468B |
| | Inbound DeliveryReference 38482F | | | 0..1 38484F | BusinessTransaction DocumentReference 38486F |
| | ShipmentReference 38470B | | | 0..1 38472B | BusinessTransaction DocumentReference 38474B |
| Attachment 38400A | AttachmentWebAddress 38476B | | | 0..n 38478B | WebAddress 38480B |
| Log 38402A | ValidationLog 38482B | | | 0..n 38484B | Log 38486B |
| HandlingUnit 38408G | HandlingUnit 38410G | | | 0..n 384712G | HandlingUnit 38414G |
| Delivery Information 38404A | IncoTerms 38488B | | | 0..1 38490B | IncoTerms 38488F |

FIG. 384I

| | | | | |
|---|---|---|---|---|
| DeliveryInformationMessage 38416 | | | | |
| Delivery 38424 | | | | |
| DeliveryItem 38404A | Item 38490F | | 0..n 38492F | DeliveryItem_Information 38494F |
| | | ID 38492B | 1 38494B | BusinessTransaction DocumentItemID 38496B |
| | | CreationDateTime 38404C | 1 38406C | DateTime 38408C |
| | | LastChange DateTime 38410C | 0..1 38412C | DateTime 38414C |
| | | Consignment Indicator 38498B | 0..1 38400C | ConsignmentIndicator 38402C |
| | | VendorInitiated ActionIndicator 38404C | 1 38406C | PartyInitiated ActionIndicator 38408C |
| | | CompletedIndicator 38496F | 0..1 38498F | CompletedIndicator 38400G |
| | | ShippedQuantity Accumulation 38402G | 0..1 38404G | |
| | | ReceivedQuantity Accumulation 38406G | 0..1 38408G | |

FIG. 384J

| | | | | |
|---|---|---|---|---|
| DeliveryInformationMessage 38416 | | | | |
| Delivery 38424 | | | | |
| DeliveryItem 38404A | GroupID 38416C | | 0..1 38418C | BusinessTransaction DocumentItemGroupID 38420C |
| | PackingListID 38414G | | 0..1 38416G | PackingListID 38418G |
| | GrossWeightMeasure 38420G | | 0..1 38422G | Measure 38424G |
| | NetWeightMeasure 38426G | | 0..1 38428G | Measure 38430G |
| | GrossVolumeMeasure 38432G | | 0..1 38434G | Measure 38436G |
| | Quantity 38438G | | 1 38440G | Quantity 38442G |
| | SalesOrderQuantity 38444G | | 0..1 38446G | Quantity 38448G |
| | PurchaseOrderQuantity 38450G | | 0..1 38452G | Quantity 38454G |
| | InventoryQuantity 38456G | | 0..1 38458G | Quantity 38460G |
| | ReceivedQuantity 38462C | | 0..1 38464C | Quantity 38466C |

FIG. 384K

| | | | | |
|---|---|---|---|---|
| DeliveryInformationMessage 38416 | | | | |
| Delivery 38424 | | | | |
| DeliveryItem 38404A | | | | |
| Execution Information 38468C | ActualExecution 38480C | | 0..1 38482C | |
| | | IssuePeriod 38484C | 0..1 38486C | DateTimePeriod 38488C |
| | | PickingPeriod 38490C | 0..1 38492C | DateTimePeriod 38494C |
| | | PackingPeriod 38496C | 0..1 38498C | DateTimePeriod 38400D |
| | | LoadingPeriod 38402D | 0..1 38404D | DateTimePeriod 38406D |
| | | YardDepartureDateTime 38408D | 0..1 38410D | DateTimePeriod 38412D |
| | | ShippingPeriod 38414D | 0..1 38416D | DateTimePeriod 38416G |
| | | YardArrivalDateTime 38418D | 0..1 38420D | DateTimePeriod 38422D |
| | | UnloadingPeriod 38424D | 0..1 38426D | DateTimePeriod 38428D |

FIG. 384L

| | | | | | |
|---|---|---|---|---|---|
| DeliveryInformationMessage 38416 | | | | | |
| Delivery 38424 | | | | | |
| DeliveryItem 38404A | | | | | |
| Execution Information 38468C | | UnpackingPeriod 38442D | 0..1 38444D | DateTimePeriod 38446D |
| | | ReceiptPeriod 38430D | 0..1 38432D | DateTimePeriod 38434D |
| | | PutawayPeriod 38436D | 0..1 38438D | DateTimePeriod 38440D |
| Delivery Information 38424G | Variance 38426G | | 0..1 38428G | |
| | | Quantity 38430G | 1 38432G | Quantity 38434G |
| | | Quantity DiscrepancyCode 38436G | 1 38438G | QuantityDiscrepancyCode 38440G |
| Product Information 38470C | Product 38448D | | 1 38450D | BusinessTransactionDocument Product 38452D |
| | | InternalID 38454D | 0..1 38456D | ProductInternalID 38458D |
| | | StandardID 38460D | 0..1 38462D | ProductStandardID 38464D |
| | | ChangeID 38466D | 0..1 38468D | ProductChangeID 38470D |

FIG. 384M

| | | | | |
|---|---|---|---|---|
| DeliveryInformationMessage 38416 | | | | |
| Delivery 38424 | | | | |
| DeliveryItem 38404A | | | | |
| Party 38418G | BuyerParty 38420G | | 0..1 38422G | BusinessTransactionDocumentParty 38424G |
| | | InternalID 38426G | 0..1 38428G | PartyInternalID 38430G |
| | | StandardID 38432G | 0..1 38434G | PartyStandardID 38436G |
| | | Address 38438G | 0..1 38440G | Address 38442G |
| Batch 38472C | Batch 38484D | | 0..1 38486D | Batch 38488D |
| | | ManufacturingDate 38472D | 0..1 38474D | Date 38476D |
| | | BestBeforeDate 38478D | 0..1 38480D | Date 38482D |
| | | OriginCountryCode 38418G | 0..1 38420G | CountryCode 38422G |
| | | InternalID 38490D | 0..1 38492D | BatchID 38494D |

FIG. 384N

| | | | |
|---|---|---|---|
| DeliveryInformationMessage 38416 | | | |
| Delivery 38424 | | | |
| DeliveryItem 38404A | | | |

| | | | | |
|---|---|---|---|---|
| Business Transaction Document Reference 38474C | PurchaseOrderReference 38496D | | 0..1 38498D | BusinessTransactionDocument Reference 38400E |
| | SalesOrderReference 38402E | | 0..1 38404E | BusinessTransactionDocument Reference 38406E |
| | OriginPurchaseOrder Reference 38408E | | 0..n 38410E | BusinessTransactionDocument Reference 38412E |
| | SchedulingAgreement Reference 38414E | | 0..1 38416E | BusinessTransactionDocument Reference 38418E |
| | ShipmentReference 38420E | | 0..1 38422E | BusinessTransactionDocument Reference 38424E |
| Attachment 38476C | AttachmentWebAddress 38426E | | 0..n 38428E | WebAddress 38430E |
| Log 38478C | ValidationLog 38432E | | 0..1 38434E | Log 38436E |

FIG. 387A

| Package 38700 | L1 38702 | L2 38704 | L3 38706 | L4 38708 | L5 38710 | Occ. 38712 | Data Type 38714 |
|---|---|---|---|---|---|---|---|
| PersonnelTime SheetMessage 38722 | PersonnelTime SheetMessage 38724 | | | | | | GDT: PersonnelTime SheetMessage 38726 |
| Message Header 38734 | | Message Header 38738 | | | | 0..1 38740 | GDT: BusinessDocument MessageHeader 38742 |
| | | | MessageID 38744 | | | 1 38746 | GDT: Message ID 38748 |
| | | | Creation DateTime 38754 | | | 1 38756 | GDT: DateTime 38758 |
| | | | Sender Party 38766 | | | 0..1 38768 | GDT: BusinessDocument MessageHeaderParty 38770 |
| | | | Recipient Party 38778 | | | 0..1 38780 | GDT: BusinessDocument MessageHeaderParty 38782 |
| Personnel TimeSheet 38736 | | Personnel TimeSheet 38786 | | | | 1 38788 | GDT: PersonnelTime Sheet 38790 |

FIG. 387B

| | | | | | | |
|---|---|---|---|---|---|---|
| PersonnelTimeSheetMessage 38722 | | | | | | |
| Personnel TimeSheet 38736 | | Personnel ResourceID 38798 | | | 1 38700A | GDT: PartyInternalID 38702A |
| | Personnel Time Subsheet 38708A | PersonnelTime Subsheet 38710A | | | 1..n 38712A | GDT: PersonnelTime Subsheet 38714A |
| | | | Period 38722A | | 1 38724A | GDT: DatePeriod 38726A |
| | | | WorkAgreementID 38734A | | 0..1 38736A | GDT: WorkAgreementID 38738A |
| | | | PersonnelTime 38746A | | 0..n 38748A | GDT: PersonnelTime 38750A |
| | | | | ID 38758A | 0..1 38760A | GDT: PersonnelTimeID 38762A |
| | | | | TypeID 38768A | 1 38770A | GDT: PersonnelTime TypeID 38772A |
| | | | | DateTimePeriod 38780A | 0..1 38782A | GDT:DateTimePeriod 38784A |
| | | | | DatePeriod 38792A | 0..1 38794A | GDT:Date Period 38796A |

FIG. 387C

| | | | | | | | | |
|---|---|---|---|---|---|---|---|---|
| PersonnelTimeSheetMessage 38722 | | | | | | | | |
| PersonnelTimeSheet 38736 | | | | | | | | |
| Personnel Time Subsheet 38708A | | | | | Duration 38704B | 0..1 38706B | GDT:Duration 38708B |
| | | | | | DateForEvaluation 38716B | 0..1 38718B | GDT: Date 38720B |
| | | | | PersonnelTimeEvent 38728B | | 0..n 38730B | GDT:PersonnelTimeEvent 38732B |
| | | | | | ID 38740B | 0..1 38742B | GDT: PersonnelTime EventID 38744B |
| | | | | | TypeID 38750B | 1 38752B | GDT:PersonnelTimeEventTypeID 38754B |
| | | | | | DateTime 38762B | 1 38764B | GDT:DateTime 38766B |
| | | | | | DateForEvaluation 38774B | 0..1 38776B | GDT:Date 38778B |

FIG. 391A

| Package 39100 | L1 39102 | L2 39104 | L3 39106 | L4 39108 | Occ. 39110 | Datatype 39112 |
|---|---|---|---|---|---|---|
| Credit Worthiness QueryMessage 39114 | CreditWorth-inessQuery Message 39116 | | | | | MDT: CreditWorthiness QueryMessage 39118 |
| CreditWorthi-nessQuery 39120 | | CreditWorth-inessQuery 39122 | | | 1 39124 | AGDT: CreditWorthiness Query 39126 |
| | | | CreditSegment InternalID 39128 | | 0..1 39130 | GDT: CreditSegment InternalID 39132 |
| | | | CheckedAmount 39134 | | 0..1 39136 | GDT: Amount 39138 |
| | | | CheckingRuleCode 39140 | | 0..1 39142 | GDT: CreditWorthiness CheckingRuleCode 39144 |
| | | | CheckingSeverity Code 39146 | | 0..1 39148 | GDT: CreditWorthiness CheckingSeverityCode 39150 |
| | | | CreditAgency ReportRetrieval Permission Indicator 39152 | | 1 39154 | GDT: Credit Agency ReportRetrieval PermissionIndicator 39156 |

FIG. 391B

| | | | | | |
|---|---|---|---|---|---|
| CreditWorthinessQueryMessage 39114 | | | | | |
| CreditWorthinessQuery 39122 | | | | | |
| Party 39158 | DebtorParty 39162 | | 1 39164 | GDT: BusinessTransactionDocumentParty 39166 |
| | | InternalID 39168 | 1 39170 | GDT: PartyInternalID 39172 |
| | CreditorParty 39174 | | 0..1 39176 | GDT: BusinessTransactionDocumentParty 39178 |
| | | InternalID 39180 | 1 39182 | GDT: PartyInternalID 39184 |
| | SellerParty 39186 | | 0..1 39188 | GDT: BusinessTransactionDocumentParty 39190 |
| | | InternalID 39192 | 1 39194 | GDT: PartyInternalID 39196 |
| Product Information 39160 | ProductCategory 39198 | | 0..1 39100A | GDT: BusinessTransactionDocumentProductCategory 39102A |
| | | InternalID 39104A | 1 39106A | GDT: ProductCategoryInternalID 39108A |

FIG. 391C

| Packages 39110A | L1 39112A | L2 39114A | L3 39116A | L4 39118A | Occ. 39120A | Data Type 39122A |
|---|---|---|---|---|---|---|
| CreditWorthinessMessage 39124A | CreditWorthinessMessage 39126A | | | | | MDT: CreditWorthinessMessage 39128A |
| CreditWorthiness 39130A | | CreditWorthiness 39132A | | | 1 39134A | |
| | | | CreditSegmentInternalID 39136A | | 0..1 39138A | GDT: CreditSegmentInternalID 39140A |
| | | | Indicator 39142A | | 1 39144A | GDT: CreditWorthinessIndicator 39146A |
| | | | CheckingDescription 39148A | | 0..n 39150A | GDT: Description 39152A |
| | | | DebtorPartyBlockedIndicator 39154A | | 0..1 39156A | CDT: Indicator 39158A |
| | | | DebtorPartySpecialAttentionRequiredIndicator 39160A | | 0..1 39162A | CDT: Indicator 39164A |

FIG. 391D

CreditWorthinessResponseMessage 39124A

| | | | | | | |
|---|---|---|---|---|---|---|
| Party 39166A | | | DebtorParty 39168A | | 1 39170A | GDT: BusinessTransactionDocumentParty 39172A |
| | | | | InternalID 39174A | 1 39176A | GDT: PartyInternalID 39178A |
| | | | CreditorParty 39180A | | 0..n 39182A | GDT: BusinessTransactionDocumentParty 39184A |
| | | | | InternalID 39186A | 1 39188A | GDT: PartyInternalID 39190A |
| | | | SellerParty 39192A | | 0..n 39194A | GDT: BusinessTransactionDocumentParty 39196A |
| | | | | InternalID 39198A | 1 39100B | GDT: PartyInternalID 39102 |
| ProductInformation 39104B | | | ProductCategory 39106 | | 0..n 39108B | GDT: BusinessTransactionDocumentProductCategory 39110B |
| | | | | InternalID 39112B | 1 39114B | GDT: ProductCategoryInternalID 39116B |

FIG. 391E

| CreditWorthinessResponseMessage 39124A | | | | | | |
|---|---|---|---|---|---|---|
| CreditWorthinessInformation 39118B | | | CreditRating 39120B | | 1 39122B | |
| | | | | Code 39124B | 1 39126B | GDT:CreditRatingCode 39128B |
| | | | | ValidityPeriod 39130B | 0..1 39132B | GDT: DateTimePeriod 39134B |
| | | | CreditRiskClass 39136B | | 0..1 39138B | |
| | | | | Code 39140B | 1 39142B | GDT:CreditRiskClassCode 39144B |
| | | | | ValidityPeriod 39146B | 0..1 39148B | GDT:DateTimePeriod (restricted) 39150B |
| | | | CreditLimit 39152B | | 0..1 39154B | |
| | | | | Amount 39156B | 1 39158B | GDT: Amount 39160B |
| | | | | ValidityPeriod 39162B | 0..1 39164B | GDT: DateTimePeriod 39166B |
| | | | CreditExposure 39168B | | 0..1 39170bB | |
| | | | | Amount 39172B | 1 39174B | GDT: Amount 39176B |

FIG. 392A

| Package 39200 | L1 39202 | L2 39204 | L3 39206 | L4 39208 | Occ. 39210 | Datatype 39212 |
|---|---|---|---|---|---|---|
| Credit Worthiness Message 39214 | CreditWorthinessMessage 39216 | | | | | MDT: CreditWorthiness Message 39218 |
| CreditWorthiness 39220 | | CreditWorthiness 39222 | | | 1 39224 | AGDT: Credit Worthiness 39226 |
| | | | CreditSegment InternalID 39228 | | 0..1 39230 | GDT: CreditSegment InternalID 39232 |
| | | | Indicator 39234 | | 1 39236 | GDT: CreditWorthiness Indicator39238 |
| | | | Checking Description 39240 | | 0..n 39242 | GDT: Description 39244 |
| | | | DebtorPartyBlockedIndicator 39245 | | 0..1 39247 | CDT 39249 |
| | | | DebtorPartySpecialAttentionRequiredIndicator 39251 | | 0..1 39253 | CDT 39255 |
| Party 39246 | | | DebtorParty 39252 | | 1 39254 | GDT: Business TransactionDocument Party 39256 |

FIG. 392B

| | | | | | | |
|---|---|---|---|---|---|---|
| CreditWorthinessMessage 39214 | | | | | | |
| CreditWorthiness 39220 | | | | | | |
| Party 39246 | | | | InternalID 39258 | 1 39260 | GDT: PartyInternalID 39262 |
| | | | CreditorParty 39264 | | 0..n 39266 | GDT: BusinessTransaction DocumentParty 39268 |
| | | | | InternalID 39270 | 1 39272 | GDT: PartyInternalID 39274 |
| | | | SellerParty 39276 | | 0..n 39278 | GDT: BusinessTransaction DocumentParty 39280 |
| | | | | InternalID 39282 | 1 39284 | GDT: PartyInternalID 39286 |
| Product Information 39248 | | | ProductCategory 39288 | | 0..n 39290 | GDT: BusinessTransaction DocumentProductCategory 39292 |
| | | | | InternalID 39294 | 1 39296 | GDT: ProductCategoryInternalID 39298 |
| Creditworthi-ness Information 39250 | | | CreditRating 39200A | | 1 39202A | |
| | | | | Code 39204A | 1 39206A | GDT: CreditRatingCode 39208A |

FIG. 392C

| | | | | | | |
|---|---|---|---|---|---|---|
| CreditWorthinessMessage | | | | 39214 | | |
| CreditWorthiness | | | | 39220 | | |
| Creditworthi-ness Information 39250 | | | | ValidityPeriod 39210A | 0..1 39212A | GDT: DateTimePeriod 39214A |
| | | | CreditRiskClass 39216A | | 0..1 39218A | |
| | | | | Code 39220A | 1 39222A | GDT: CreditRiskClassCode 39224A |
| | | | | ValidityPeriod 39226A | 0..1 39228A | GDT: DateTimePeriod 39230A |
| | | | CreditLimit 39232A | | 0..1 39234A | |
| | | | | Amount 39236A | 1 39238A | GDT: Amount 39240A |
| | | | | ValidityPeriod 39242A | 0..1 39244A | GDT: DateTimePeriod 39246A |
| | | | CreditExposure 39248A | | 0..1 39250A | |
| | | | | Amount 39252A | 1 39254A | GDT 39256A |

FIG. 396A

| Package 39600 | L1 39602 | L2 39604 | L3 39606 | L4 39608 | Occ. 39610 | Datatype 39612 |
|---|---|---|---|---|---|---|
| CreditAgency ReportQuery Message 39614 | CreditAgency ReportQuery Message 39616 | | | | | MDT: CreditAgency ReportQueryMessage 39618 |
| Message Header 39620 | | Message Header 39624 | | | 1 39626 | GDT: MessageHeader 39628 |
| | | | ID 39630 | | 1 39632 | GDT: Business DocumentMessageID 39634 |
| | | | ReferenceID 39636 | | 0..1 39638 | GDT: Business DocumentMessageID 39640 |
| | | | CreationDate Time 39642 | | 1 39644 | GDT: DateTime 39646 |
| | | | SenderParty 39648 | | 0..1 39650 | GDT: Business DocumentMessage HeaderParty 39652 |

FIG. 396B

| | | | | | | |
|---|---|---|---|---|---|---|
| CreditAgencyReportQueryMessage 39614 | | | | | | |
| Message Header 39620 | | | | InternalID 39654 | 1 39656 | GDT: PartyInternalID 39658 |
| | | | RecipientParty 39660 | | 0..n 39662 | GDT: BusinessDocument MessageHeaderParty 39664 |
| | | | | Internal ID 39666 | 1 39668 | GDT: PartyInternalID 39670 |
| Credit Agency Report Query 39622 | | CreditAgency Report Query 39672 | | | 1 39674 | AGDT: Item 39676 |
| | | | Reason 39678 | | 1 39680 | GDT: CreditAgencyReportQueryReason Code 39682 |
| Party 39684 | | | DebtorParty 39688 | | 1 39690 | GDT: Business Transaction Document Party 39692 |
| | | | | Standard ID 39694 | 0..1 39696 | GDT: Party Standard ID 39698 |
| | | | | Credit Agency ID 39600A | 0..1 39602A | GDT: Party Party ID 39604A |

FIG. 396C

| | | | | | | | |
|---|---|---|---|---|---|---|---|
| CreditAgencyReportQueryMessage 39614 | | | | | | | |
| Credit Agency Report Query 39622 | | | | | | | |
| Party 39684 | | | | Address 39606A | 0..1 39608A | GDT: Address 39610A |
| | | | | IncorporationDate 39612A | 0..1 39614A | GDT: Date 39616A |
| | | | | BirthDate 39618A | 0..1 39620A | DT: Date 39622A |
| Service 39686 | | | Service 39624A | | 1 39626A | |
| | | | | CreditAgencyID 39628A | 1 39630A | GDT: Product Party ID 39632A |

FIG. 397A

| Package 39700 | L1 39702 | L2 39704 | L3 39706 | L4 39708 | L5 39710 | O. 39712 | Datatype 39714 |
|---|---|---|---|---|---|---|---|
| CreditAgency ReportMessage 39716 | CreditAgency ReportMessage 39718 | | | | | | MDT:CreditAgency ReportMessage 39720 |
| MessageHeader 39722 | | Message Header 39726 | | | | 1 39728 | GDT:MessageHeader 39730 |
| | | | ID 39732 | | | 1 39734 | GDT:Business DocumentMessageID 39736 |
| | | | Reference ID 39738 | | | 0..1 39740 | GDT:Business DocumentMessageID 39742 |
| | | | Creation DateTime 39744 | | | 1 39746 | GDT:DateTime 39748 |
| | | | Sender Party 39750 | | | 0..1 39752 | GDT:Business DocumentMessage HeaderParty 39754 |
| | | | | Internal ID 39756 | | 1 39758 | GDT:PartyInternalID 39760 |

FIG. 397B

| CreditAgencyReportMessage 39716 | | | | | | | |
|---|---|---|---|---|---|---|---|
| MessageHeader 39722 | | | RecipientParty 39762 | | | 0..n 39764 | GDT:BusinessDocumentMessageHeaderParty 39766 |
| | | | | Internal ID 39768 | | 1 39770 | GDT:PartyInternalID 39772 |
| CreditAgency Report 39724 | | CreditAgency Report 39774 | | | | 1 39776 | GDT:CreditAgency Report 39778 |
| CreationLog 39780 | | | CreationLog 39788 | | | 0..1 39790 | |
| | | | | Item 39792 | | 1..n 39794 | GDT:LogItem 39796 |
| | | | | | TypeID 39798 | 0..1 39700A | xsd:token 39702A |
| | | | | | Severity Code 39704A | 0..1 39706A | GDT:LogItemSeverity Code 39708A |
| | | | | | Note 39710A | 1 39712A | GDT:Note 39714A |

FIG. 397C

| | | | | | | | |
|---|---|---|---|---|---|---|---|
| CreditAgencyReportMessage 39716 | | | | | | | |
| CreditAgencyReport 39724 | | | | | | | |
| Party 39782 | | | DebtorParty 39716A | | | 1 39718A | GDT:BusinessTransaction DocumentParty 39720A |
| | | | | StandardID 39722A | | 0..n 39724A | GDT:PartyStandardID 39726A |
| | | | | CreditAgencyID 39728A | | 0..1 39730A | GDT:PartyPartyID 39732A |
| | | | | Address 39734A | | 1 39736A | GDT:Address 39738A |
| | | | | IncorporationDate 39740A | | 0..1 39742A | GDT:Date 39744A |
| | | | | BirthDate 39746A | | 0..1 39748A | GDT:Date 39750A |
| Credit Worthiness Information 39784 | | | CreditRating 39752A | | | 1 39754A | |
| | | | | Code 39756A | | 1 39758A | GDT:CreditRatingCode 39760A |
| | | | | ValidityPeriod 39762A | | 0..1 39764A | GDT:DatePeriod 39766A |

FIG. 397D

| | | | | | | | |
|---|---|---|---|---|---|---|---|
| CreditAgencyReportMessage 39716 | | | | | | | |
| CreditAgencyReport 39724 | | | | | | | |
| Credit Worthiness Information 39784 | | | CreditRiskClass 39768A | | | 0..1 39770A | |
| | | | | Code 39772A | | 1 39774A | GDT:CreditRiskClassCode 39776A |
| | | | | ValidityPeriod 39778A | | 0..1 39780A | GDT:DateTimePeriod 39782A |
| | | | Scoring 39784A | | | 0..n 39786A | GDT:CreditAgencyReport Scoring 39788A |
| | | | | ScoreCardID 39790A | | 0..1 39792A | GDT:ScoreCardID 39794A |
| | | | | ResultValue 39796A | | 1 39798A | xsd:decimal 39700B |
| | | | | Description 39702B | | 0..1 39704B | GDT:Description 39706B |
| | | | CreditLimit 39708B | | | 0..n 39710B | |
| | | | | Amount 39712B | | 1 39714B | GDT:Amount 39716B |

FIG. 397E

| CreditAgencyReportMessage 39716 | | | | | | | | |
|---|---|---|---|---|---|---|---|---|
| CreditAgencyReport 39724 | | | | | | | | |
| Credit Worthiness Information 39784 | | | | ValidityPeriod 39718B | | 0..1 39720B | GDT:DatePeriod 39722B |
| Legal Information 39786 | | | LegalEvent 39724B | | | 0..n 39726B | |
| | | | | TypeCode 39728B | | 0..1 39730B | GDT:LegalEventTypeCode 39732B |
| | | | | Date 39734B | | 0..1 39736B | GDT:Date 39738B |
| | | | | Description 39740B | | 0..1 39742B | GDT:Description 39744B |

FIG. 400A

| Package 40000 | L1 40002 | L2 40004 | L3 40006 | L4 40008 | Occ. 40010 | Data Type 40012 |
|---|---|---|---|---|---|---|
| Accounting Cancellation Message 40014 | Accounting Cancellation Message 40016 | | | | 1 40018 | |
| Accounting Cancellation 40020 | | Accounting Cancellation 40022 | | | 1 40024 | |
| | | | BasePrimaNotaID 40026 | | 1 40028 | GDT: BusinessTransactionDocumentID 40030 |
| | | | PostingDate 40032 | | 0..1 40034 | GDT: Date 40036 |
| | | | Note 40038 | | 0..1 40040 | GDT: Note 40042 |
| | | | OriginPrimaNotaTypeCode 40046 | | 1 40048 | GDT: BusinessTransactionDocumentTypeCode 40050 |

FIG. 400B

| | | | | | | |
|---|---|---|---|---|---|---|
| Accounting Cancellation Message 40016 | | | | | | |
| Accounting Cancellation 40022 | | | | | | |
| Business Transaction Document Reference 40044 | | | OriginPrima NotaReference 40058 | | 1 40060 | GDT: BusinessTransaction DocumentReference 40062 |
| | | | | ID 40064 | 1 40066 | GDT: BusinessTransaction DocumentID 40068 |
| | | | | | | |

FIG. 404A

| Package 40400 | L1 40402 | L2 40404 | L3 40406 | L4 40408 | L5 40410 | occ. 40412 | Datatype 40414 |
|---|---|---|---|---|---|---|---|
| InvoiceDue Message 40416 | Invoice Due Message 40418 | | | | | | MDT:InvoiceDueMessage 40420 |
| InvoiceDue 40422 | | Invoice Due 40424 | | | | 1 40426 | GDT:InvoiceDue 40428 |
| | | | BaseBusiness Transaction DocumentID 40430 | | | 1 40432 | GDT:BusinessTransaction DocumentID 40434 |
| | | | BaseBusiness DocumentType Code 40436 | | | 1 40438 | GDT:BusinessTransaction DocumentTypeCode 40440 |
| | | | SettlementPriority Code 40442 | | | 0..1 40444 | GDT:BusinessTransaction Priority Code 40446 |
| | | | Settlement Relevance Indicator 40448 | | | 0..1 40450 | GDT:BusinessTransaction DocumentSettlement RelevanceIndicator 40452 |

FIG. 404B

| | | | |
|---|---|---|---|
| InvoiceDueMessage 40416 | | | |
| InvoiceDue 40422 | SettlementBlockedIndicator 40454 | 0..1 40456 | GDT:BusinessTransactionBlockedIndicator 40458 |
| | ItemListCompleteTransmission Indicator 40460 | 0..1 40462 | GDT:CompleteTransmissionIndicator 40464 |
| | PlannedBilling Date 40466 | 0..1 40468 | GDT:Date 40470 |
| | DeliveryPeriod 40472 | 0..1 40474 | GDT:DateTimePeriod 40476 |
| | ProposedInvoiceDate 40478 | 0..1 40480 | GDT:DateTime 40482 |
| Party 40484 | BuyerParty 40402A | 0..1 40404A | GDT:BusinessTransactionDocumentParty 40406A |
| | SellerParty 40408A | 0..1 40410A | GDT:BusinessTransaction DocumentParty 40412A |
| | ProductRecipientParty 40414A | 0..1 40416A | GDT:BusinessTransactionDocumentParty 40418A |
| | VendorParty 40420A | 0..1 40422A | GDT:BusinessTransactionDocumentParty 40424A |
| | BillToParty 40426A | 0..1 40428A | GDT:BusinessTransactionDocumentParty 40430A |

FIG. 404C

| | | | |
|---|---|---|---|
| InvoiceDueMessage 40416 | | | |
| InvoiceDue 40422 | | | |
| Party 40484 | BillFromParty 40432A | 0..1 40434A | GDT:BusinessTransactionDocumentParty 40436A |
| | PayerParty 40438A | 0..1 40440A | GDT:BusinessTransactionDocumentParty 40442A |
| | PayeeParty 40444A | 0..1 40446A | GDT:BusinessTransactionDocumentParty 40448A |
| Location 40486 | ShipToLocation 40450A | 0..1 40452A | GDT:BusinessTransactionDocumentLocation 40454A |
| | ShipFromLocation 40456A | 0..1 40458A | GDT:BusinessTransactionDocumentLocation 40460A |
| Delivery Information 40488 | DeliveryTerms 40462A | 0..1 40464A | GDT:DeliveryTerms 40466A |
| Payment Information 40490 | CashDiscountTerms 40468A | 0..1 40470A | GDT:CashDiscountTerms 40472A |
| | PaymentForm 40474A | 0..1 40476A | GDT:PaymentForm 40478A |
| Price Information 40492 | Price 40480A | 0..1 40482A | |

FIG. 404D

| | | | | | |
|---|---|---|---|---|---|
| InvoiceDueMessage 40416 | | | | | |
| InvoiceDue 40422 | | | | | |
| Price Information 40492 | | GrossAmount 40484A | 0..1 40486A | GDT:Amount 40488A | |
| | | NetAmount 40490A | 0..1 40492A | GDT:Amount 40494A | |
| | | TaxAmount 40496A | 0..1 40498A | GDT:Amount 40400B | |
| | | ExchangeRate 40402B | 0..1 40404B | GDT:ExchangeDate 40406B | |
| | | PricingDate 40408B | 0..1 40410B | GDT:DateTime 40412B | |
| Account Assignment 40494 | AccountAssignment 40414B | | 0..1 40416B | ???GDT:AccountingObjectSet Distribution ??? (zu Zeit nicht relevant) 40418B | |
| Attachment 40496 | AttachmentWebAddress 40420B | | 0..n 40422B | GDT:AttachmentWebAddress 40424B | |
| Description 40498 | Description 40426B | | 0..1 40428B | GDT:Description 40430B | |
| Item 40400A | Item 40432B | | 1..n 40434B | GDT:InvoiceDueItem 40436B | |

FIG. 404E

| | | | |
|---|---|---|---|
| InvoiceDueMessage 40416 | | | |
| InvoiceDue 40422 | | | |
| Item 40400A | BaseBusinessTransaction DocumentItemID 40438B | 1 40440B | GDT:BusinessTransactionDocument ItemID 40442B |
| | BaseBusinessTransaction DocumentItemTypeCode 40444B | 1 40446B | GDT:BusinessTransactionDocument ItemTypeCode 40448B |
| | BaseBusinessTransaction DocumentItemDeletedIndicator 40450B | 1 40452B | GDT:DeletedIndicator 40454B |
| | SettlementRelevanceIndicator 40455B | 0..1 40456B | GDT:BusinessTransactionDocument SettlementRelevanceIndicator 40458B |
| | EvaluatedReceiptSettlement Indicator 40460B | 0..1 40462B | GDT:EvaluatedReceiptSettlementIndicator 40464B |
| | SettlementBlockedIndicator 40466B | 0..1 40468B | GDT:BusinessTransactionBlockedIndicator 40470B |
| | PricingIndicator 40472B | 0..1 40474B | GDT:BusinessTransactionDocument PricingIndicator 40476B |
| | PlannedBillingDate 40478B | 0..1 40480B | GDT:Date 40482B |

FIG. 404F

| | | | | | | | | |
|---|---|---|---|---|---|---|---|---|
| InvoiceDueMessage | | | | | 40416 | | | |
| InvoiceDue | | | | | 40422 | | | |
| Item 40400A | | | | ProposedInvoice Date 40484B | | 0..1 40486B | GDT:DateTime 40488B | |
| | | | | Hierarchy Relationship 40490B | | 0..1 40492B | | |
| | | | | | ParentItemID 40494B | 1 40496B | GDT:BusinessTransactionDocumentItemID 40498B | |
| | | | | | TypeCode 40400C | 1 40402C | GDT:BusinessTransactionDocument ItemHierarchyRelationshipTypeCode 40403C | |
| Product Information 40404C | | | | Product 40424C | | 0..1 40426C | GDT:BusinessTransactionDocument Product 40428C | |
| | | | | ProductCategory 40430C | | 0..1 40432C | GDT:ProductCategory 40434C | |
| | | | | DeliveryDate TimePeriod 40436C | | 0..1 40438C | GDT:DateTimePeriod 40440C | |
| | | | | Quantity 40442C | | 1 40444C | GDT:Quantity 40446C | |

FIG. 404G

| | | | | | |
|---|---|---|---|---|---|
| InvoiceDueMessage 40416 | | | | | |
| InvoiceDue 40422 | | | | | |
| Item 40400A | | | | | |
| Price Information 40406C | Price 40448C | | 0..1 40450C | | |
| | | GrossAmount 40452C | 0..1 40454C | GDT:Amount 40456C | |
| | | NetAmount 40458C | 0..1 40460C | GDT:Amount 40462C | |
| | | TaxAmount 40464C | 0..1 40466C | GDT:Amount 40468C | |
| | | ExchangeRate 40470C | 0..1 40472C | GDT:ExchangeRate 40474C | |
| | | PricingDate 40476C | 0..1 40478C | GDT:DateTime 40480C | |
| | | NetUnitPrice 40482C | 0..1 40484C | GDT:Price 40486C | |
| | ProcurementCost UpperLimit 40488C | | 0..1 40490C | GDT:ProcurementCostUpperLimit 40492C | |
| Party 40408C | BuyerParty 40494C | | 0..1 40496C | GDT:BusinessTransaction DocumentParty 40498C | |

FIG. 404H

| | | | | | | | | |
|---|---|---|---|---|---|---|---|---|
| InvoiceDueMessage 40416 | | | | | | | | |
| | InvoiceDue 40422 | | | | | | | |
| | | Item 40400A | | | | | | |
| | | | Party 40408C | | SellerParty 40400D | | 0..1 40402D | GDT:BusinessTransactionDocumentParty 40404D |
| | | | | | ProductRecipientParty 40406D | | 0..1 40408D | GDT:BusinessTransactionDocumentParty 40410D |
| | | | | | VendorParty 40412D | | 0..1 40414D | GDT:BusinessTransactionDocumentParty 40416D |
| | | | | | BillToParty 40418D | | 0..1 40420D | GDT:BusinessTransactionDocumentParty 40422D |
| | | | | | BillFromParty 40424D | | 0..1 40426D | GDT:BusinessTransactionDocumentParty 40428D |
| | | | | | PayerParty 40430D | | 0..1 40432D | GDT:BusinessTransactionDocumentParty 40434D |
| | | | | | PayeeParty 40436D | | 0..1 40438D | GDT:BusinessTransactionDocumentParty 40440D |
| | | | Location 40410C | | ShipToLocation 40442D | | 0..1 40444D | GDT:BusinessTransactionDocumentLocation 40446D |
| | | | | | ShipFromLocation 40448D | | 0..1 40450D | GDT:BusinessTransactionDocumentLocation 40452D |

FIG. 404I

| | | | | | | |
|---|---|---|---|---|---|---|
| InvoiceDueMessage 40416 | | | | | | |
| InvoiceDue 40422 | | | | | | |
| Item 40400A | | | | | | |
| Delivery Information 40412C | | | DeliveryTerms 40454D | | 0..1 40456D | GDT:DeliveryTerms 40458D |
| Payment Information 40414C | | | CashDiscountTerms 40460D | | 0..1 40462D | GDT:CashDiscountTerms 40464D |
| | | | PaymentForm 40466D | | 0..1 40468D | GDT:PaymentFormCode 40470D |
| Business Transaction Document Reference 40416C | | | PurchaseOrder Reference 40472D | | 0..1 40474D | GDT:BusinessTransactionDocumentReference 40476D |
| | | | SalesOrderReference 40478D | | 0..1 40480D | GDT:BusinessTransactionDocumentReference 40482D |
| | | | DeliveryReference 40484D | | 0..1 40486D | GDT:BusinessTransactionDocumentReference 40488D |
| | | | PurchaseContract Reference 40490D | | 0..1 40492D | GDT:BusinessTransactionDocumentReference 40494D |
| | | | SalesContract Reference 40496D | | 0..1 40498D | GDT:BusinessTransactionDocumentReference 40400E |

FIG. 404J

| | | | | | | |
|---|---|---|---|---|---|---|
| InvoiceDueMessage 40416 | | | | | | |
| InvoiceDue 40422 | | | | | | |
| Item 40400A | | | | | | |
| Business Transaction Document Reference 40416C | | | BuyerProduct CatalogueReference 40402E | | 0..1 40404E | GDT:CatalogueReference 40406E |
| | | | SellerProduct CatalogueReference 40408E | | 0..1 40410E | GDT:CatalogueReference 40412E |
| Account Assignment 40418C | | | AccountAssignment 40414E | | 0..1 40416E | *??? GDT:AccountingObjectSetDistribution ???* (zu Zeit nicht relevant) 40418E |
| Attachment 40420C | | | AttachmentWeb Address 40420E | | 0..n 40422E | GDT:AttachmentWebAddress 40424E |
| Description 40422C | | | Description 40426E | | 0..1 40428E | GDT:Description 40430E |

Fig. 407A

| Package 40700 | L 1 40702 | L2 40704 | L3 40706 | L4 40708 | L5 40710 | L6 40712 | Occ. 40714 | Datatype 40716 |
|---|---|---|---|---|---|---|---|---|
| Inventory Change Message 40718 | Inventory Change Message 40720 | | | | | | | MDT:InventoryChange Message 40722 |
| Inventory Change 40724 | | Inventory Change 40726 | | | | | 1 40728 | GDT:InventoryChange 40730 |
| | | | ID 40732 | | | | 1 40734 | GDT:BusinessTransaction DocumentID 40736 |
| | | | Business Transac-tionType Code 40738 | | | | 1 40740 | GDT:BusinessTransaction TypeCode 40742 |
| Item 40744 | | | Item 40746 | | | | 1..n 40748 | GDT:InventoryChange Item 40750 |
| | | | | ID 40752 | | | 1 40754 | GDT:BusinessTransaction DocumentItemID 40756 |
| | | | | Date Time 40758 | | | 1 40760 | GDT:DateTime 40762 |

Fig. 407B

| | | | | | | | | |
|---|---|---|---|---|---|---|---|---|
| InventoryChangeMessage 40718 | | | | | | | | |
| InventoryChange 40724 | | | | | | | | |
| Item 40744 | | | | Note 40764 | | | 0..1 40766 | GDT:Note 40768 |
| Outbound 40770 | | | | Outbound 40776 | | | 0..1 40778 | GDT:InventoryChangeItem Outbound 40780 |
| | | | | | Location 40782 | | 1..n 40784 | GDT:BTDLocation 40786 |
| | | | | | | InternalID 40788 | 1 40790 | GDT:LocationInternalID 40792 |
| | | | | | Product 40794 | | 1 40796 | GDT:BTDProduct 40798 |
| | | | | | | InternalID 40700A | 1 40702A | GDT:ProductInternalID 40704A |
| | | | | | OwnerParty 40706A | | 1 40708A | GDT:BTDParty 40710A |
| | | | | | | InternalID 40712A | 1 40714A | GDT:PartyInternalID 40716A |
| | | | | | Inventory Usability StatusCode 40718A | | 1 40720A | GDT:InventoryUsability StatusCode 40722A |

Fig. 407C

| | | | | | | | | | |
|---|---|---|---|---|---|---|---|---|---|
| InventoryChangeMessage 40718 | | | | | | | | | |
| InventoryChange 40724 | | | | | | | | | |
| Item 40744 | | | | | | | | | |
| Outbound 40770 | | | | | OrderingQuantity 40724A | | 0..1 40726A | GDT:Quantity 40728A |
| | | | | | ValuationQuantity 40730A | | 0..1 40732A | GDT:Quantity 40734A |
| | | | | | AdditionalQuantity 40736A | | 0..n 40738A | GDT:Quantity 40740A |
| Inbound 40774 | | | | Inbound 40742A | | | 0..1 40744A | GDT:InventoryChange ItemInbound 40746A |
| | | | | | Location 40748A | | 1..n 40750A | GDT:BTDLocation 40752A |
| | | | | | | InternalID 40754A | 1 40756A | GDT:LocationInternalID 40758A |
| | | | | | Product 40760A | | 1 40762A | GDT:BTDProduct 40764A |
| | | | | | | InternalID 40766A | 1 40768A | GDT:ProductInternalID 40770A |
| | | | | | OwnerParty 40772A | | 1 40774A | GDT:BTDParty 40776A |

Fig. 407D

| | | | | | | | | | | |
|---|---|---|---|---|---|---|---|---|---|---|
| InventoryChangeMessage 40718 | | | | | | | | | | |
| InventoryChange 40724 | | | | | | | | | | |
| Item 40744 | | | | | | | | | | |
| Inbound 40774 | | | | | | | InternalID 40778A | 1 40780A | GDT:PartyInternalID 40782A |
| | | | | | | InventoryUsability StatusCode 40784A | | 1 40786A | GDT:InventoryUsability StatusCode 40788A |
| | | | | | | OrderingQuantity 40790A | | 0..1 40792A | GDT:Quantity 40794A |
| | | | | | | Valuation Quantity 40796A | | 0..1 40798A | GDT:Quantity 40700B |
| | | | | | | Additional Quantity 40702B | | 0..n 40704B | GDT:Quantity 40706B |
| Business Transaction Document Reference 40776 | | | | | SalesOrder Reference 40708B | | | 0..1 40710B | GDT:BusinessTransactionDocumentReference 40712B |
| | | | | | Purchase Order Reference 40714B | | | 0..1 40716B | GDT:BusinessTransactionDocumentReference 40718B |

FIG. 410A

| Package 41000 | L1 41002 | L2 41004 | L3 41006 | L4 41008 | L5 41010 | Occ. 41012 | SAP Global Data Type 41014 |
|---|---|---|---|---|---|---|---|
| SalesOrder Fulfillment Message 41016 | SalesOrder Fulfillment Message 41018 | | | | | 1 41020 | MDT:SalesOrderFulfillment Message 41022 |
| Message Header 41024 | | Message Header 41028 | | | | 0..1 41030 | GDT: BusinessDocument MessageHeader 41032 |
| SalesOrder Fulfillment 41026 | | SalesOrder Fulfillment 41034 | | | | 1 41036 | GDT: SalesOrderFulfillment 41038 |
| | | | ID 41040 | | | 1 41042 | GDT: BusinessTransaction DocumentID 41044 |
| | | | BaseBusiness Transaction DocumentID 41046 | | | 0..1 41048 | GDT: BusinessTransaction DocumentID 41050 |
| | | | BaseBusiness Transaction DocumentType Code 41052 | | | 0..1 41054 | GDT: BusinessTransaction DocumentTypeCode 41056 |

FIG. 410B

| | | | | | | | |
|---|---|---|---|---|---|---|---|
| SalesOrderFulfillmentMessage 41016 | | | | | | | |
| SalesOrder Fulfillment 41026 | | | ActionCode 41058 | | | 0..1 41060 | GDT: ActionCode 41062 |
| | | | ItemListComplete TransmissionIndicator 41064 | | | 0..1 41066 | GDT: CompleteTransmission Indicator 41068 |
| | | | CreationDateTime 41070 | | | 0..1 41072 | GDT: DateTime 41074 |
| | | | LastChangeDateTime 41076 | | | 0..1 41078 | GDT: DateTime 41080 |
| | | | AcceptanceStatusCode 41082 | | | 0..1 41084 | GDT: AcceptanceStatusCode 41086 |
| Party 41088 | | | BuyerParty 41002A | | | 1 41004A | GDT: BusinessTransaction DocumentParty 41006A |
| | | | | InternalID 41008A | | 1 41010A | GDT: PartyInternalID 41012A |
| | | | | StandardID 41014A | | 0..n 41016A | CDT:PartyStandardID 41018A |
| | | | SellerParty 41020A | | | 1 41022A | GDT: BusinessTransaction DocumentParty 41024A |

Fig. 410C

| | | | | |
|---|---|---|---|---|
| SalesOrderFulfillmentMessage 41016 | | | | |
| SalesOrderFulfillment 41026 | | | | |
| Party 41088 | ProductRecipientParty 41026A | | 0..1 41028A | GDT: BusinessTransaction DocumentParty 41030A |
| | VendorParty 41032A | | 0..1 41034A | GDT: BusinessTransaction DocumentParty 41036A |
| | ManufacturerParty 41038A | | 0..1 41040A | GDT: BusinessTransaction DocumentParty 41042A |
| | CarrierParty 41044A | | 0..1 41046A | GDT: BusinessTransaction DocumentParty 41048A |
| Location 41090 | ShipToLocation 41050A | | 0..1 41052A | GDT: BusinessTransaction Document Location 41054A |
| | | InternalID 41056A | 1 41058A | GDT: LocationID 41060A |
| | ShipFromLocation 41062A | | 0..1 41064A | GDT: BusinessTransaction Document Location 41066A |

FIG. 410D

| | | | | | | | |
|---|---|---|---|---|---|---|---|
| SalesOrderFulfillmentMessage 41016 | | | | | | | |
| SalesOrderFulfillment 41026 | | | | | | | |
| Delivery Information 41092 | | | DeliveryTerms 41068A | | | 0..1 41070A | GDT: DeliveryTerms 41072A |
| | | | | DeliveryItemGroupID 41074A | | 0..1 41076A | GDT: BusinessTransaction DocumentItemGroupID 41078A |
| | | | | Delivery PriorityCode 41080A | | 0..1 41082A | GDT: BusinessTransaction PriorityCode 41084A |
| | | | | IncoTerms 41086A | | 0..1 41088A | GDT: IncoTerms 41090A |
| | | | | PartialDelivery 41092A | | 0..1 41094A | GDT: PartialDelivery 41096A |
| | | | | QuantityTolerance 41098A | | 0..1 41000B | GDT: QuantityTolerance 41002B |
| | | | | Transport 41004B | | 0..1 41006B | |
| | | | | Description 41008B | | 0..1 41010B | GDT: Description 41012B |

FIG. 410E

| | | | | | |
|---|---|---|---|---|---|
| SalesOrderFulfillmentMessage 41016 | | | | | |
| SalesOrderFulfillment 41026 | | | | | |
| Delivery Information 41092 | DeliveryControl 41014B | | 0..1 41016B | | |
| | | DeliveryBlockedIndicator 41018B | 0..1 41020B | GDT: BusinessTransaction BlockedIndicator 41022B | |
| Attachment 41094 | AttachmentWebAddress 41024B | | 0..n 41026B | GDT: WebAddress 41028B | |
| Description 41096 | Description 41030B | | 0..1 41032B | GDT: Description 41034B | |
| | ConfirmationDescription 41036B | | 0..1 41038B | GDT: Description 41040B | |
| FollowUp 41098 | FollowUpSalesOrder FulfillmentConfirmation 41042B | | 0..1 41044B | | |
| | | RequirementCode 41046B | 1 41048B | GDT: FollowUpMessage RequirementCode 41050B | |
| | FollowUpDespatched DeliveryNotification 41052B | | 0..1 41054B | | |

FIG. 410 F

| | | | | | | | | |
|---|---|---|---|---|---|---|---|---|
| SalesOrderFulfillmentMessage 41016 | | | | | | | | |
| | SalesOrderFulfillment 41026 | | | | | | | |
| | | FollowUp 41098 | | | RequirementCode 41056B | | 1 41058B | GDT: FollowUpMessage RequirementCode 41060B |
| | | | | FollowUpBillingDue Notification 41062B | | | 0..1 41064B | |
| | | | | | RequirementCode 41066B | | 1 41068B | GDT: FollowUpMessage RequirementCode 41070B |
| | | SalesOrder FulfillmentItem 41000A | | Item 41072B | | | 0..n 41074B | GDT: SalesOrderFulfillmentItem 41076B |
| | | | | | ID 41078B | | 1 41080B | GDT: BusinessTransaction DocumentID 41082B |
| | | | | | TypeCode 41084B | | 1 41086B | GDT: BusinessTransaction DocumentItemTypeCode 41088B |
| | | | | | ActionCode 41090B | | 0..1 41092B | GDT: ActionCode 41094B |

FIG. 410G

| | | | | | | | | |
|---|---|---|---|---|---|---|---|---|
| SalesOrderFulfillmentMessage 41016 | | | | | | | | |
| | SalesOrderFulfillment 41026 | | | | | | | |
| | | SalesOrder FulfillmentItem 41000A | | | ScheduleLineListComplete TransmissionIndicator 41096B | | 0..1 41098B | GDT: CompleteTransmission Indicator 41000C |
| | | | | | CreationDateTime 41002C | | 0..1 41004C | GDT: DateTime 41006C |
| | | | | | LastChangeDateTime 41008C | | 0..1 41010C | GDT: DateTime 41012C |
| | | | | | AcceptanceStatusCode 41014C | | 0..1 41016C | GDT: AcceptanceStatusCode 41018C |
| | | | | | HierarchyRelationship 41020C | | 0..1 41022C | |
| | | | | | | ParentItemID 41024C | 0..1 41026C | GDT: BusinessTransaction DocumentItemID 41028C |
| | | | | | | TypeCode 41030C | 1 41032C | GDT: BusinessTransaction DocumentItemHierarchy RelationshipTypeCode 41034C |

FIG. 410H

| | | | | | |
|---|---|---|---|---|---|
| SalesOrderFulfillmentMessage 41016 | | | | | |
| SalesOrderFulfillment 41026 | | | | | |
| SalesOrderFulfillmentItem 41000A | | | | | |
| Product Information 41036C | Product 41054C | | 1 41056C | GDT: BusinessTransactionDocumentProduct 41058C |
| | | ID 41060C | 0..1 41062C | GDT: ProductID 41064C |
| | | StandardID 41066C | 0..1 41068C | CDT:ProductStandardID 41070C |
| | | PartyID 41072C | 0..1 41074C | CDT:ProductPartyID 41076C |
| | | Description 41078C | 0..1 41080C | GDT: Description 41082C |
| | ProductCategory 41084C | | 0..1 41086C | GDT: BusinessTransactionDocumentProduct Category 41088C |
| | | ID 41090C | 0..1 41092C | GDT: ProductCategoryID 41094C |
| Batch 41038C | Batch 41096C | | 0..1 41098C | |
| | | ID 41000D | 0..1 41002D | GDT: BatchID 41004D |

FIG. 410I

| | | | | |
|---|---|---|---|---|
| SalesOrderFulfillmentMessage 41016 | | | | |
| SalesOrderFulfillment 41026 | | | | |
| SalesOrderFulfillmentItem 41000A | | | | |
| Party 41040C | BuyerParty 41006D | 1 41008D | GDT: BusinessTransactionDocumentParty 41010D |
| | SellerParty 41012D | 1 41014D | GDT: BusinessTransactionDocumentParty 41016D |
| | ProductRecipientParty 41018D | 0..1 41020D | GDT: BusinessTransactionDocumentParty 41022D |
| | VendorParty 41024D | 0..1 41026D | GDT: BusinessTransactionDocumentParty 41028D |
| | ManufacturerParty 41030D | 0..1 41032D | GDT: BusinessTransactionDocumentParty 41034D |
| | CarrierParty 41036D | 0..1 41038D | GDT: BusinessTransactionDocumentParty 41040D |
| Location 41042C | ShipToLocation 41042D | 0..1 41044D | GDT: BusinessTransactionDocument Location 41046D |
| | Ship From Location 41048D | 0..1 41050D | GDT: BusinessTransactionDocument Location 41052D |

FIG. 410J

| | | | | | |
|---|---|---|---|---|---|
| SalesOrderFulfillmentMessage 41016 | | | | | |
| SalesOrderFulfillment 41026 | | | | | |
| SalesOrderFulfillmentItem 41000A | | | | | |
| Delivery Information 41044C | Delivery Terms 41054D | | 0..1 41056D | GDT: DeliveryTerms 41058D |
| | | DeliveryItemGroupID 41060D | 0..1 41062D | GDT: BusinessTransaction DocumentItemGroupID 41064D |
| | | DeliveryPriorityCode 41066D | 0..1 41068D | GDT: BusinessTransaction riorityCode 41070D |
| | | Incoterms 41072D | 0..1 41074D | GDT: Incoterms 41076D |
| | | PartialDelivery 41078D | 0..1 41080D | GDT: PartialDelivery 41082D |
| | | QuantityTolerance 41084D | 0..1 41086D | GDT: QuantityTolerance 41088D |
| | | Transport 41090D | 0..1 41092D | |
| | | Description 41094D | 0..1 41096D | GDT: Description 41098D |

FIG. 410K

| | | | | | | | | | |
|---|---|---|---|---|---|---|---|---|---|
| SalesOrderFulfillmentMessage 41016 | | | | | | | | | |
| SalesOrderFulfillment 41026 | | | | | | | | | |
| SalesOrderFulfillmentItem 41000A | | | | | | | | | |
| Delivery Information 41044C | | | | DeliveryControl 41000E | | 0..1 41002E | | | |
| | | | | | DeliveryBlocked Indicator 41004E | 0..1 41006E | GDT: BusinessTransactionBlocked Indicator 41008E | | |
| Reference 41046C | | | | QuoteReference 41010E | | 0..1 41012E | GDT: BusinessTransactionDocument Reference 41014E | | |
| | | | | SalesContract Reference 41016E | | 0..1 41018E | GDT: BusinessTransactionDocument Reference 41020E | | |
| | | | | PurchaseOrder Reference 41022E | | 0..1 41024E | GDT: BusinessTransactionDocument Reference 41026E | | |
| | | | | OriginPurchase OrderReference 41034E | | 0..1 41036E | GDT: BusinessTransactionDocument Reference 41038E | | |

FIG. 410L

| | | | | | | | | | |
|---|---|---|---|---|---|---|---|---|---|
| SalesOrderFulfillmentMessage 41016 | | | | | | | | | |
| | SalesOrderFulfillment 41026 | | | | | | | | |
| | | SalesOrderFulfillmentItem 41000A | | | | | | | |
| | | | Attachment 41048C | | | AttachmentWebAddress 41040E | | 0..n 41042E | GDT: WebAddress 41044E |
| | | | Description 41050C | | | Description 41046E | | 0..1 41048E | GDT: Description 41050E |
| | | | | | | ConfirmationDescription 41052E | | 0..1 41054E | GDT: Description 41056E |
| | | | ScheduleLine 41052C | | | ScheduleLine 41058E | | 1..n 41060E | GDT: SalesOrderFulfillmentItem ScheduleLine 41062E |
| | | | | | | | ID 41064E | 0..1 41066E | GDT: ScheduleLineID 41068E |
| | | | | | | | ActionCode 41070E | 0..1 41072E | GDT: ActionCode 41074E |
| | | | | | | | Quantity 41076E | 1 41078E | GDT: Quantity 41080E |
| | | | | | | | DeliveryPeriod 41082E | 0..1 41084E | GDT: DateTimePeriod 41086E |
| | | | | | | ConfirmedScheduled Line 41088E | | 0..n 41090E | GDT: SalesOrderFulfillmentItem ScheduleLine 41092E |

FIG. 410M

| | | | |
|---|---|---|---|
| SalesOrderFulfillmentMessage 41016 | | | |
| SalesOrderFulfillment 41026 | | | |
| SalesOrderFulfillmentItem 41000A | | | |
| ScheduleLine 41052C | ID 41094E | 0..1 41096E | GDT: ScheduleLineID 41098E |
| | ActionCode 41000F | 0..1 41002F | GDT: ActionCode 41004F |
| | Quantity 41006F | 1 41008F | GDT: Quantity 41010F |
| | DeliveryPeriod 41012F | 0..1 41014F | GDT: DateTimePeriod 41016F |

FIG. 414A

| Package 41400 | L1 41402 | L2 41404 | L3 41406 | L4 41408 | L5 41410 | Occ. 41412 | Generic Data Type 41414 |
|---|---|---|---|---|---|---|---|
| Despatched Delivery Notification Message 41416 | Despatched Delivery Notification Message 41418 | | | | | 0..1 41420 | DespatchedDelivery NotificationMessage 41422 |
| Message Header 41424 | | Message Header 41428 | | | | 0..1 41430 | MessageHeader 41432 |
| | | | MessageID 41434 | | | 0..1 41436 | MessageID 41438 |
| | | | CreationDate Time 41440 | | | 0..1 41442 | DateTime 41444 |
| | | | SenderParty 41446 | | | 0..1 41448 | BusinessDocumentMessage HeaderParty 41450 |
| | | | RecipientParty 41452 | | | 0..1 41454 | BusinessDocumentMessage HeaderParty 41456 |
| Delivery 41426 | | Delivery 41458 | | | | 1 41460 | Delivery 41462 |

FIG. 414B

| DespatchedDeliveryNotificationMessage 41416 | | | | | | | |
|---|---|---|---|---|---|---|---|
| Delivery 41426 | | | ID 41464 | | | 1 41466 | BusinessTransactionDocumentID 41468 |
| | | | Action Code 41467 | | | 0..1 41469 | ActionCode 41471 |
| | | | CreationDateTime 41470 | | | 1 41472 | DateTime 41474 |
| | | | ProductRecipientID 41473 | | | 0..1 41475 | BusinessTransactionDocumentID 41466 |
| | | | GrossWeightMeasure 41476 | | | 0..1 41478 | Measure 41480 |
| | | | NetWeightMeasure 41482 | | | 0..1 41484 | Measure 41486 |
| | | | VolumeMeasure 41488 | | | 0..1 41490 | Measure 41492 |
| | | | ArrivalDateTime 41494 | | | 0..1 41496 | DateTime 41498 |
| | | | IssueDateTime 41400A | | | 0..1 41402A | DateTime 41404A |
| | | | CarrierHandoverDateTime 41406A | | | 0..1 41408A | DateTime 41410A |
| | | | GroupID 41412A | | | 0..1 41414A | BusinessTransactionDocumentGroupID 41416A |

FIG. 414C

| | | | | | | | | |
|---|---|---|---|---|---|---|---|---|
| | | | | WayBillID 41418A | | | 0..1 41420A | BusinessTransactionDocumentID 41422A |
| | | | | ReturnsIndicator 41419A | | | 0..1 41421A | ReturnsIndicator 41423A |

FIG. 414D

DespatchedDeliveryNotificationMessage 41416

| | | | | |
|---|---|---|---|---|
| Delivery 41426 | TransportModeCode 41424A | | 0..1 41426A | TransportModeCode 41428A |
| | DangerousGoodsIndicator 41430A | | 0..1 41432A | DangerousGoodsIndicator 41434A |
| | Note 41436A | | 0..1 41438A | Note 41440A |
| Party 41442A | VendorParty 41452A | | 1 41454A | BusinessTransactionDocumentParty 41456A |
| | | Address 41437A | 0..1 41439A | Address 41441A |
| | ProductRecipientParty 41458A | | 1 41460A | BusinessTransactionDocumentParty 41462A |
| | | Address 41459A | 0..1 41461A | Address 41463A |
| | CarrierParty 41464A | | 0..1 41466A | BusinessTransactionDocumentParty 41468A |
| | | Address 41449A | 0..1 41451A | Address 41453A |

FIG. 414E

| | | | |
|---|---|---|---|
| BuyerParty 41467A | | 0..1 41469A | BusinessTransaction-DocumentParty 41471A |
| | InternalID 41473A | 0..1 41475A | PartyInternalID 41477A |
| | StandardID 41479A | 0..n 41481A | PartyStandardID 41483A |
| | ProductRecipientID 41485A | 0..1 41487A | PartyPartyID 41489A |
| | Address 41464A | 0..1 41491A | Address 41493A |
| BillToParty 41400E | | 0..1 41402E | Address 41404E |
| | InternalID 41406E | 0..1 41408E | PartyInternalID 41410E |
| | StandardID 41412E | 0..n 41414E | PartyStandardID 41416E |
| | ProductRecipientID 41418E | 0..1 41420E | PartyPartyID 41422E |
| | Address 41424E | 0..1 41426E | Address 41428E |

FIG. 414F

| | | | | | | | | | |
|---|---|---|---|---|---|---|---|---|---|
| | | Location <u>41444A</u> | | | ShipFromLocation <u>41470A</u> | | | 0..1 <u>41472A</u> | BusinessTransactionDocumentShipFromLocation <u>41474A</u> |
| | | | | | TransshipmentLocation <u>41450E</u> | | | 0..1 <u>41452E</u> | BusinessTransactionDocument <u>41454E</u> |
| | | | | | | InternalID <u>41456E</u> | | 0..1 <u>41458E</u> | TransshipmentLocation <u>41460E</u> |
| | | | | | | StandardID <u>41462E</u> | | 0..n <u>41464E</u> | LocationInternalID <u>41464E</u> |
| | | | | | | VendorID <u>41466E</u> | | 0..1 <u>41468E</u> | LocationStandardID <u>41470E</u> |
| | | | | | | ProductRecipientID <u>41472E</u> | | 0..1 <u>41474E</u> | LocationPartyID <u>41476E</u> |
| | | | | | | Note <u>41478E</u> | | 0..1 <u>41480E</u> | LocationPartyID <u>41482E</u> |
| | | | | | | Address <u>41486E</u> | | 0..1 <u>41488E</u> | Note <u>41490E</u> |

FIG. 414G

| | | | | | | | | | |
|---|---|---|---|---|---|---|---|---|---|
| | | | | | ShipToLocation 41476A | | | 1 41478A | BusinessTransactionDocumentShipToLocation 41480A |
| | | | | | | Address 41400F | | 0..1 41402F | Address 41404F |
| | | | | | FreightInvoiceID 41406F | | | 0..1 41408F | BusinessTransactionDocumentID 41410F |
| | | Transport Information 41446A | | | | TransportMeans 41482A | | 0..1 41484A | TransportMeans 41486A |
| | | | | | | TransportTracking 41488A | | 0..1 41490A | TransportTracking 41492A |

FIG. 414H

| | | | | |
|---|---|---|---|---|
| DespatchedDeliveryNotificationMessage 41416 | | | | |
| Delivery 41426 | | | | |
| Delivery Information 41448A | Incoterms 41494A | | 0..1 41496A | Incoterms 41498A |
| Delivery Item 41450A | Item 41400B | | 1..n 41402B | DeliveryItem 41404B |
| | | ID 41406B | 0..1 41408B | BusinessTransactionDocumentItemID 41410B |
| | | ConsignmentIndicator 41412B | 0..1 41414B | ConsignmentIndicator 41416B |
| | | CompletedIndicator 41417B | 0..1 41419B | BusinessTransaction-CompletedIndicator 41421B |
| | | GrossWeightMeasure 41418B | 0..1 41420B | Measure 41422B |
| | | NetWeightMeasure 41424B | 0..1 41426B | Measure 41428B |
| | | VolumeMeasure 41430B | 1 41432B | Measure 41434B |
| | | Quantity 41436B | 0..1 41438B | Quantity 41440B |

FIG. 414I

| | | | | | | | | | |
|---|---|---|---|---|---|---|---|---|---|
| | | | | | | DangerousGoods 41442B | | 0..1 41444B | DangerousGoods 41446B |
| | | | | | | Note 41448B | | 0..1 41450B | Note 41452B |

FIG. 414J

| | | | | |
|---|---|---|---|---|
| DespatchedDeliveryNotificationMessage 41416 | | | | |
| Delivery 41426 | | | | |
| Delivery Item 41450A | | | | |
| Business Transaction Document Reference 41454B | PurchaseOrder Reference 41458B | | 0..1 41460B | BusinessTransactionDcumentReference 41462B |
| | OriginPurchaseOrderReference 41463B | | 0..1 41465B | BusinessTransactionDcumentReference 41467B |
| | Scheduling Agreement Reference 41464B | | 0..1 41466B | BusinessTransactionDcumentReference 41468B |
| | SalesOrder Reference 41470B | | 1 41472B | BusinessTransactionDocumentProduct 41474B |

FIG. 414K

| | | | | | | | | | | |
|---|---|---|---|---|---|---|---|---|---|---|
| | | | Product Information 41456B | | | | Product 41476B | | 0..1 41478B | BusinessTransactionDocumentProduct 41480B |
| | | | | | | | | InternalID 41482B | 0..1 41484B | ProductInternalID 41486B |
| | | | | | | | | StandardID 41488B | 0..1 41490B | ProductStandardID 41492B |
| | | | | | | | | ShipperID 41494B | 0..1 41496B | ProductPartyID 41498B |
| | | | | | | | | ConsigneeID 41400C | 0..1 41402C | ProductPartyID 41404C |

FIG. 414L

| | | | | |
|---|---|---|---|---|
| DespatchedDeliveryNotificationMessage 41416 | | | | |
| Delivery 41426 | | | | |
| Delivery Item 41450A | | | | |
| Product Information 41456B | | ChangeID 41406C | 0..1 41408C | ProductChangeID 41410C |
| | | Note 41412C | 0..1 41414C | Note 41416C |
| | Batch 41418C | | 0..1 41420C | |
| | | InternalID 41422C | 0..1 41424C | BatchID 41426C |
| | | ShipperID 41428C | 0..1 41430C | BatchID 41432C |
| | | ConsigneeID 41434C | 0..1 41436C | BatchID 41438C |
| | | ManufacturingDate 41440C | 0..1 41442C | Date 41444C |
| | | BestBeforeDate 41446C | 0..1 41448C | Date 41450C |
| | | OriginCountryCode 41452C | 0..1 41454C | CountryCode 41456C |

FIG. 414M

| | | | | | | | | | | |
|---|---|---|---|---|---|---|---|---|---|---|
| | | | Item 41450A | | | | | | | |
| | | | | | | | SerialID 41420F | | 0..n 41422F | SerialID 41424F |
| | | | | | | | ShippedQuantityAccumulation 41426F | | 0..1 41428F | ShippedQuantityAccumulation 41430F |
| | | | | | | | ReturnMaterialAuthorisationID 41432F | | 0..1 41434F | "ReturnMaterial 41436F |
| | | | | | | | KanbanCardID 41438F | | 0..1 41440F | AuthorisationID" 41442F |
| | | | | | | | PackingListID 41444F | | 0..1 41446F | KanbanCardID 41448F |
| | | | | | | | Outstanding Quantity 41450F | | 0..1 41452F | Quanity 41454F |

FIG. 414N

| | | | | | | | |
|---|---|---|---|---|---|---|---|
| DespatchedDeliveryNotificationMessage 41416 | | | | | | | |
| Delivery 41426 | | | | | | | |
| HandlingUnit 41458C | | | HandlingUnit 41460C | | | 0..n 41462C | HandlingUnit 41464C |
| | | | | NetVolumeMeasure 41456F | | 0..1 41458F | Measure 41460F |
| | | | | NetWeightMeasure 41462F | | 0..1 41464F | Measure 41466F |
| | | | | SerialID 41468F | | 0..1 41470F | SerialID 41472F |

FIG. 415A

| Package 41500 | L1 41502 | L2 41504 | L3 41506 | L4 41508 | L5 41510 | O. 41512 | GDT 41514 |
|---|---|---|---|---|---|---|---|
| Received Delivery Notification Message 41516 | ReceivedDelivery Notification Message 41518 | | | | | | ReceivedDelivery NotificationMessage 41520 |
| Delivery 41522 | | Delivery 41524 | | | | 1 41526 | Delivery 41528 |
| | | | ID 41530 | | | 1 41532 | BusinessTransaction DocumentID 41534 |
| | | | Receipt DateTime 41536 | | | 0..1 41538 | DateTime 41540 |
| Party 41542 | | | Vendor Party 41548 | | | 1 41550 | BusinessTransaction DocumentParty 41552 |
| | | | Product Recipient Party 41554 | | | 1 41556 | BusinessTransaction DocumentParty 41558 |
| Location 41544 | | | ShipTo Location 41560 | | | 0..1 41562 | BusinessTransaction DocumentShipTo Location 41564 |

FIG. 415B

| | | | | | |
|---|---|---|---|---|---|
| ReceivedDeliveryNotificationMessage 41516 | | | | | |
| Delivery 41522 | | | | | |
| DeliveryItem 41546 | Item 41566 | | | 0..n 41568 | |
| | | ID 41570 | | 0..1 41572 | BusinessTransactionDocumentItemID 41574 |
| | | CompletedIndicator 41576 | | 0..1 41578 | BusinessTransactionCompleteIndicator 41580 |
| | | InventoryStatusDateTime 41582 | | 0..1 41584 | DateTime 41586 |
| | | ReceivedQuantity 41588 | | 1 41590 | Quantity 41592 |
| ProductInformation 41594 | | Product 41598 | | 1 41500A | BusinessTransactionDocumentProduct 41502A |
| | | | InternalID 41504A | 0..1 41506A | ProductInternalID 41508A |
| | | | StandardID 41510A | 0..1 41512A | ProductStandardID 41514A |
| | | | ShipperID 41516A | 0..1 41518A | ProductPartyID 41520A |

FIG. 415C

| | | | | | |
|---|---|---|---|---|---|
| ReceivedDeliveryNotificationMessage 41516 | | | | | |
| Delivery 41522 | | | | | |
| DeliveryItem 41546 | | | | | |
| Product Information 41594 | | ConsigneeID 41522A | 0..1 41524A | ProductPartyID 41526A |
| Delivery Information 41596 | Variance 41528A | | 0..n 41530A | |
| | | Quantity 41532A | 1 41534A | Quantity 41536A |
| | | QuantityDiscrepancy Code 41538A | 1 41540A | QuantityDiscrepancyCode 41542A |

FIG. 418A

| Package 41800 | L1 41802 | L2 41804 | L3 41806 | L4 41808 | L5 41810 | L6 41812 | Occ. 41814 | Type 41816 | Name 41818 |
|---|---|---|---|---|---|---|---|---|---|
| Invoice Accounting Message 41820 | Invoice Accounting Message 41822 | | | | | | | MDT 41824 | Invoice Accounting Message 41825 |
| Invoice Accounting 41826 | | Invoice Accounting 41828 | | | | | 1 41830 | AGDT 41832 | Invoice Accounting 41834 |
| | | | ID 41836 | | | | 1 41838 | BGDT 41840 | Business Transaction DocumentID 41842 |
| | | | Type Code 41844 | | | | 1 41846 | BGDT 41848 | Business Transaction Document TypeCode 41850 |
| | | | Date 41852 | | | | 1 41854 | BGDT 41856 | Date 41858 |
| | | | Posting Date 41860 | | | | 0..1 41862 | BGDT 41864 | Date 41866 |

FIG. 418B

| | | | | | | | | | |
|---|---|---|---|---|---|---|---|---|---|
| InvoiceAccountingMessage 41820 | | | | | | | | | |
| InvoiceAccounting 41826 | | | | | | | | | |
| Party 41868 | | | DebtorParty 41874 | | | | 1 41876 | AGDT 41878 | BusinessTransaction DocumentParty 41880 |
| | | | | InternalID 41882 | | | 1 41884 | BGDT 41886 | PartyID 41888 |
| | | | Creditor Party 41890 | | | | 1 41892 | AGDT 41894 | BusinessTransaction DocumentParty 41896 |
| | | | | InternalID 41898 | | | 1 41800A | BGDT 41802A | PartyID 41804A |
| BusinessTransaction DocumentReference 41870 | | | Original Invoice Reference 41806A | | | | 0..1 41808A | AGDT 41810A | BusinessTransaction DocumentReference 41812A |
| | | | | ID 41814A | | | 1 41816A | BGDT 41818A | BusinessTransaction DocumentID 41820A |
| | | | Original Vendor Invoice Reference 41822A | | | | 0..1 41824A | AGDT 41826A | BusinessTransaction DocumentReference 41828A |

FIG. 418C

| | | | | | | | | | |
|---|---|---|---|---|---|---|---|---|---|
| InvoiceAccountingMessage 41820 | | | | | | | | | |
| InvoiceAccounting 41826 | | | | | | | | | |
| BusinessTransaction DocumentReference 41870 | | | | ID 41830A | | | 1 41832A | BGDT 41834A | BusinessTrans-actionDocumentID 41836A |
| Item 41872 | | | Item 41838A | | | | | | |
| DueItem 41840A | | | | DueItem 41846A | | | 1..n 41848A | AGDT 41850A | InvoiceAccounting DueItem 41852A |
| | | | | | Amount 41854A | | 1 41856A | BGDT 41858A | Amount 41860A |
| TaxItem 41842A | | | | TaxItem 41862A | | | 0..n 41864A | AGDT 41866A | InvoiceAccounting TaxItem 41868A |
| | | | | | Amount 41870A | | 1 41872A | BGDT 41874A | Amount 41876A |
| | | | | | ProductTax EventType Code 41878A | | 1 41880A | BGDT 41882A | ProductTaxEvent TypeCode 41884A |

FIG. 418D

| | | | | | | | | | |
|---|---|---|---|---|---|---|---|---|---|
| InvoiceAccountingMessage | | | | | 41820 | | | | |
| InvoiceAccounting | | | | | 41826 | | | | |
| Item | | | | | 41872 | | | | |
| ExpenseRevenue Item 41844A | | | | Expense Revenue Item 41886A | | | 1..n 41888A | AGDT 41890A | InvoiceAccounting ExpenseRevenue Item 41892A |
| | | | | | Amount 41894A | | 1 41896A | BGDT 41898A | Amount 41800B |
| | | | | | PriceCom-ponentType Code 41802B | | 1 41804B | BGDT 41806B | PriceComponent TypeCode 41808B |
| | | | | | Quantity 41810B | | 0..1 41812B | BGDT 41814B | Quantity 41816B |
| Product Information 41818B | | | | | Product 41824B | | 0..1 41826B | AGDT 41828B | BusinessTrans-actionDocument Product 41830B |
| | | | | | | InternalID 41832B | 1 41834B | BGDT 41836B | ProductID 41838B |

FIG. 418E

| | | | | | | |
|---|---|---|---|---|---|---|
| InvoiceAccountingMessage 41820 | | | | | | |
| InvoiceAccounting 41826 | | | | | | |
| Item 41872 | | | | | | |
| ExpenseRevenueItem 41844A | | | | | | |
| Business Transaction Document Reference 41820B | | PurchaseOrder Reference 41840B | 0..1 41842B | AGDT 41844B | BusinessTransaction DocumentReference 41846B |
| | | SalesOrder Reference 41848B | 0..1 41850B | AGDT 41852B | BusinessTransaction DocumentReference 41854B |
| Accounting ObjectSet 41822B | | AccountingObject Set 41856B | 0..1 41858B | AGDT 41860B | AccountingObjectSet 41862B |

Fig. 421A

| Package 42100 | L1 42102 | L2 42104 | L3 42106 | L4 42108 | L5 42110 | Occ. 42112 | SAP Global Data Type 42114 |
|---|---|---|---|---|---|---|---|
| Delivery Execution Request Message 42116 | Delivery Execution Request Message 42118 | | | | | | DeliveryExecutionRequest Message 42120 |
| Message Header 42122 | | Message Header 42126 | | | | 0..1 42128 | MessageHeader 42130 |
| Delivery Execution Request 42124 | | Delivery Execution Request 42132 | | | | 1 42134 | DeliveryExecutionRequest 42136 |
| | | | BaseBusiness Transaction DocumentID 42138 | | | 1 42140 | BusinessTransaction DocumentID 42142 |
| | | | BaseBusiness Transaction Document TypeCode 42144 | | | 1 42146 | BusinessTransaction DocumentTypeCode 42148 |
| | | | ActionCode 42150 | | | 0..1 42152 | ActionCode 42154 |

Fig. 421B

| DeliveryExecutionRequestMessage 42116 | | | | | | | |
|---|---|---|---|---|---|---|---|
| Delivery Execution Request 42124 | | | CreationDateTime 42156 | | | 0..1 42158 | DateTime 42160 |
| | | | LastChangeDateTime 42162 | | | 0..1 42164 | DateTime 42166 |
| | | | ItemListComplete TransmissionIndicator 42168 | | | 0..1 42170 | CompleteTransmission Indicator 42172 |
| Party 42174 | | | BuyerParty 42188 | | | 0..1 42190 | BusinessTransaction DocumentParty 42192 |
| | | | | InternalID 42194 | | 1 42196 | PartyInternalID 42198 |
| | | | | Address 42100A | | 0..1 42102A | Address 42104A |
| | | | | Contact 42106A | | 0..1 42108A | BusinessTransaction DocumentContact 42110A |
| | | | | | InternalID 42112A | 1 42114A | PartyInternalID 42116A |
| | | | | | Address 42118A | 0..1 42120A | Address 42122A |

Fig. 421C

| | | | | |
|---|---|---|---|---|
| DeliveryExecutionRequestMessage 42116 | | | | |
| DeliveryExecutionRequest 42124 | | | | |
| Party 42174 | SellerParty 42124A | ... 42126A | 0..1 42128A | BusinessTransactionDocumentParty 42130A |
| | ProductRecipientParty 42132A | ... 42134A | 0..1 42136A | BusinessTransactionDocumentParty 42138A |
| | VendorParty 42140A | ... 42142A | 0..1 42144A | BusinessTransactionDocumentParty 42146A |
| | CarrierParty 42148A | ... 42150A | 0..1 42152A | BusinessTransactionDocumentParty 42154A |
| Location 42176 | ShipToLocation 42156A | | 0..1 42158A | BusinessTransactionDocumentLocation 42160A |
| | | InternalID 42162A | 1 42164A | LocationInternalID 42166A |
| | | Address 42168A | 0..1 42170A | Address 42172A |
| | ShipFromLocation 42174A | ... 42176A | 0..1 42178A | BusinessTransactionDocumentLocation 42180A |
| Delivery Information 42178 | DeliveryTerms 42182A | | 0..1 42184A | DeliveryTerms 42186A |
| | | DeliveryItem GroupID 42188A | 0..1 42190A | BusinessTransactionDocumentItem GroupID 42192A |

Fig. 421D

| | | | | | | | | |
|---|---|---|---|---|---|---|---|---|
| DeliveryExecutionRequestMessage 42116 | | | | | | | | |
| DeliveryExecutionRequest 42124 | | | | | | | | |
| Delivery Information 42178 | | | | DeliveryPriorityCode 42194A | | 0..1 42196A | BusinessTransactionPriorityCode 42198A |
| | | | | IncoTerms 42100B | | 0..1 42102B | Incoterms 42104B |
| | | | | PartialDelivery 42106B | | 0..1 42108B | PartialDelivery 42110B |
| | | | | QuantityTolerance 42112B | | 0..1 42114B | QuantityTolerance 42116B |
| | | | | Transport 42118B | | 0..1 42120B | |
| | | | | Description 42122B | | 0..1 42124B | Description 42126B |
| | | | DeliveryControl 42128B | | | 0..1 42130B | |
| | | | | DeliveryBlockedIndicator 42132B | | 0..1 42134B | BusinessTransactionBlocked Indicator 42136B |
| FollowUp Message 42180 | | | FollowUp Despatched Delivery Notification 42138B | | | 0..1 42140B | |

Fig. 421E

| | | | | | |
|---|---|---|---|---|---|
| DeliveryExecutionRequest Message 42116 | | | | | |
| DeliveryExecutionRequest 42124 | | | | | |
| FollowUp Message 42180 | | RequirementCode 42142B | 1 42144B | FollowUpMessage RequirementCode 42146B |
| | FollowUpBillingDue Notification 42148B | | 0..1 42150B | |
| | | RequirementCode 42152B | 1 42154B | FollowUpMessage Requirement Code 42156B |
| | FollowUpInvoicingDue Notification 42158B | | 0..1 42160B | |
| | | RequirementCode 42162B | 1 42164B | FollowUpMessage RequirementCode 42166B |
| Attachment 42182 | AttachmentWebAddress 42168B | | 0..n 42170B | WebAddress 42172B |
| Description 42184 | InternalDescription 42174B | | 0..1 42176B | Description 42178B |
| | Description 42180B | | 0..1 42182B | Description 42184B |

Fig. 421F

| | | | | | | | | |
|---|---|---|---|---|---|---|---|---|
| DeliveryExecutionRequest Message 42116 | | | | | | | | |
| DeliveryExecutionRequest 42124 | | | | | | | | |
| Delivery Request Item 42186 | | | Item 42186B | | | 0..n 42188B | DeliveryExecutionRequest Item 42190B |
| | | | | BaseBusinessTransaction DocumentItemID 42192B | | 1 42194B | BusinessTransaction DocumentItemID 42196B |
| | | | | BaseBusinessTransaction DocumentItemTypeCode 42198B | | 1 42100C | BusinessTransaction DocumentItemTypeCode 42102C |
| | | | | ActionCode 42104C | | 0..1 42106C | ActionCode 42108C |
| | | | | CreationDateTime 42110C | | 0..1 42112C | DateTime 42114C |
| | | | | LastChangeDateTime 42116C | | 0..1 42118C | DateTime 42120C |
| | | | | HierarchyRelationship 42122C | | 0..1 42124C | |
| | | | | | Parent ItemId 42126C | 0..1 42128C | BusinessTransaction DocumentItemID 42130C |

Fig. 421G

| | | | | | | | |
|---|---|---|---|---|---|---|---|
| DeliveryExecutionRequest Message 42116 | | | | | | | |
| DeliveryExecutionRequest 42124 | | | | | | | |
| Delivery Request Item 42186 | | | | | TypeCode 42132C | 1 42134C | BusinessTransactionDocument ItemHierarchyRelationshipType Code 42136C |
| | | | | ScheduleLineListComplete TransmissionIndicator 42138C | | 0..1 42140C | CompleteTransmissionIndicator 42142C |
| Product Informa-tion 42144C | | | | Product 42160C | | 1 42162C | BusinessTransactionDocument Product 42164C |
| | | | | | InternalID 42166C | 0..1 42168C | ProductInternalID 42170C |
| | | | | | Description 42172C | 0..1 42174C | Note 42176C |
| Batch 42146C | | | | Batch 42178C | | 0..1 42180C | Batch 42182C |
| | | | | | ID 42184C | 0..1 42186C | BatchID 42188C |
| Party 42148C | | | | BuyerParty 42190C | ... 42192C | 0..1 42194C | BusinessTransactionDocument Party 42196C |

Fig. 421H

| | | | | | | | | |
|---|---|---|---|---|---|---|---|---|
| DeliveryExecutionRequest Message 42116 | | | | | | | | |
| DeliveryExecutionRequest 42124 | | | | | | | | |
| DeliveryRequestItem 42186 | | | | | | | | |
| Party 42148C | | | | SellerParty 42198C | ... 42100D | 0..1 42102D | BusinessTransactionDocumentParty 42104D |
| | | | | ProductRecipientParty 42106D | ... 42108D | 0..1 42110D | BusinessTransactionDocumentParty 42112D |
| | | | | VendorParty 42114D | ... 42116D | 0..1 42118D | BusinessTransactionDocumentParty 42120D |
| | | | | CarrierParty 42122D | ... 42124D | 0..1 42126D | BusinessTransactionDocumentParty 42128D |
| Location 42150C | | | | ShipToLocation 42130D | ... 42132D | 0..1 42134D | BusinessTransactionDocument Location 42136D |
| | | | | ShipFromLocation 42138D | ... 42140D | 0..1 42142D | BusinessTransactionDocument Location 42144D |
| Delivery Information 42152C | | | | DeliveryTerms 42146D | | 0..1 42148D | DeliveryTerms 42150D |
| | | | | | DeliveryItem GroupID 42152D | 0..1 42154D | BusinessTransactionDocumentItem GroupID 42156D |

Fig. 421I

| | | | | | | | | |
|---|---|---|---|---|---|---|---|---|
| DeliveryExecutionRequest Message 42116 | | | | | | | | |
| | DeliveryExecutionRequest 42124 | | | | | | | |
| | | DeliveryRequestItem 42186 | | | | | | |
| | | | Delivery Information 42152C | | DeliveryPriorityCode 42158D | 0..1 42160D | BusinessTransactionPriority Code 42162D |
| | | | | | Incoterms 42164D | 0..1 42166D | Incoterms 42168D |
| | | | | | PartialDeliery 42170D | 0..1 42172D | PartialDelivery 42174D |
| | | | | | QuantityTolerance 42176D | 0..1 42178D | QuantityTolerance 42180D |
| | | | | | Transport 42182D | 0..1 42184D | |
| | | | | | Description 42186D | 0..1 42188D | Description 42190D |
| | | | | DeliveryControl 42192D | | 0..1 42194D | |
| | | | | | DeliveryBlocked 42196D | 0..1 42198D | BusinessTransactionBlocked Indicator 42100E |

Fig. 421J

| | | | | | |
|---|---|---|---|---|---|
| DeliveryExecutionRequest Message 42116 | | | | | |
| DeliveryExecutionRequest 42124 | | | | | |
| DeliveryRequestItem 42186 | | | | | |
| Attachment 42154C | AttachmentWebAddress 42102E | | 0..n 42104E | WebAddress 42106E |
| Description 42156C | InternalDescription 42108E | | 0..1 42110E | Description 42112E |
| | Description 42114E | | 0..1 42116E | Description 42118E |
| ScheduleLine 42158C | ScheduleLine 42120E | | 1..n 42122E | DeliveryExecutionRequest ItemScheduleLine 42124E |
| | | ID 42126E | 0..1 42128E | ScheduleLineID 42130E |
| | | ActionCode 42132E | 0..1 42134E | ActionCode 42136E |
| | | Quantity 42138E | 1 42140E | Quantity 42142E |
| | | Delivery Period 42144E | 0..1 42146E | DateTimePeriod 42148E |
| | CofirmedScheduleLine 42150E | | 0..n 42152E | DeliveryExecutionRequest ItemScheduleLine 42154E |

Fig. 421K

| | | | | | | | | |
|---|---|---|---|---|---|---|---|---|
| DeliveryExecutionRequest Message 42116 | | | | | | | | |
| DeliveryExecutionRequest 42124 | | | | | | | | |
| DeliveryRequestItem 42186 | | | | | | | | |
| ScheduleLine 42158C | | | | | ID 42156E | 0..1 42158E | ScheduleLineID 42160E |
| | | | | | ActionCode 42162E | 0..1 42164E | ActionCode 42166E |
| | | | | | Quantity 42168E | 1 42170E | Quantity 42172E |
| | | | | | Delivery Period 42174E | 0..1 42176E | DateTimePeriod 42178E |

Fig. 424A

| Package 42400 | L 1 42402 | L2 42404 | L3 42406 | L4 42408 | L5 42410 | L6 42412 | C. 42414 | G/CDT 42416 | Lgth. 42420 |
|---|---|---|---|---|---|---|---|---|---|
| Delivery Schedule 42424 | Delivery Schedule Notification 42426 | | | | | | | DeliverySchedule 42428 | |
| Business Document Message Header 42432 | | Message Header 42436 | | | | | 1 42438 | BusinessDocument MessageHeader 42440 | |
| | | | ID 42446 | | | | 1 42448 | BusinessDocument MessageID 42450 | 1.35 42452 |
| | | | Creation DateTime 42466 | | | | 1 42468 | DateTime 42470 | |

Fig. 424B

| DeliverySchedule 42424 | | | | | | |
|---|---|---|---|---|---|---|
| BusinessDocumentMessageHeader 42432 | | Sender Party 42474 | | | 0..1 42476 | BusinessDocumentMessageHeaderParty 42478 |
| | | | InternalID 42484 | | 0..1 42486 | PartyInternalID 42488 |
| | | | StandardID 42492 | | 0..n 42494 | PartyStandardID 42496 |
| | | Recipient Party 42400A | | | 0..1 42402A | BusinessDocumentMessageHeaderParty 42404A |
| | | | InternalID 42410A | | 0..1 42412A | PartyInternalID 42414A |
| | | | StandardID 42418A | | 0..n 42420A | PartyStandardID 42422A |
| DeliverySchedule 42434 | DeliverySchedule 42426A | | | | 1 42428A | DeliverySchedule 42430A |

Fig. 424C

| DeliverySchedule 42424 | | | | | |
|---|---|---|---|---|---|
| Delivery Schedule 42434 | ID 42434A | | 0..1 42436A | BusinessTransaction DocumentID 42438A | 1.35 42440A |
| | TypeCode 42444A | | 0..1 42446A | DeliverySchedule TypeCode 42448A | 1 42450A |
| | CreationDate Time 42454A | | 1 42456A | DateTime 42458A | |
| Party 42462A | BuyerParty 42466A | | 0..1 42468A | BusinessTransaction DocumentParty 42470A | |
| | | InternalID 42476A | 0..1 42478A | PartyInternal ID 42480A | 1..10 42482A |
| | | StandardID 42486A | 0..n 42488A | PartyStandardID 42490A | 1.. 13 / 9 42492A |

Fig. 424D

| | | | | | |
|---|---|---|---|---|---|
| DeliverySchedule 42424 | | | | | |
| DeliverySchedule 42434 | | | | | |
| Party 42462A | BuyerID 42496A | | 0..1 42498A | PartyPartyID 42400B | 1..10 42402B |
| | VendorID 42406B | | 0..1 42408B | ContactPerson InternalID 42410B | 1..10 42412B |
| | Address 42416B | | 0..1 42418B | Address 42420B | |
| | ContactPerson 42480H | | 0..n 42482H | ContactPerson 42484H | |
| | | InternalID 42486H | 0..1 42488H | ContactPerson InternalID 42490H | |
| | | BuyerID 42492H | 0..1 42494H | ContactPerson PartyID 42496H | |
| | | VendorID 42498H | 0..1 42400I | ContactPerson PartyID 42402I | |
| | | Address 42404I | 0..1 42406I | Address 42408I | |

Fig. 424E

| | | | | | |
|---|---|---|---|---|---|
| DeliverySchedule 42424 | | | | | |
| DeliverySchedule 42434 | | | | | |
| Party 42462A | VendorParty 42426B | | 1 42428B | BusinessTransaction DocumentParty 42430B | |
| | | InternalID 42436B | 0..1 42438B | PartyInternalID 42440B | 1..10 42442B |
| | | StandardID 42446B | 0..n 42448B | PartyStandardID 42450B | 1.. 13 / 9 42452B |
| | | BuyerID 42456B | 0..1 42458B | PartyPartyID 42460B | 1..10 42462B |
| | | VendorID 42466B | 0..1 42468B | PartyParty ID 42470B | 1..10 42472B |
| | | Address 42476B | 0..1 42478B | Address 42480B | |

Fig. 424F

| | | | | |
|---|---|---|---|---|
| DeliverySchedule 42424 | | | | |
| DeliverySchedule 42434 | | | | |
| Contact Person 42410I | | 0..n 42412I | ContactPerson 42414I | |
| | InternalID 42416I | 0..1 42418I | ContactPerson InternalID 42420I | |
| | BuyerID 42422I | 0..1 42424I | ContactPerson PartyID 42426I | |
| | VendorID 42428I | 0..1 42430I | ContactPerson PartyID 42432I | |
| | Address 42434I | 0..1 42436I | Address 42438I | |

Fig. 424G

| | | | | | |
|---|---|---|---|---|---|
| DeliverySchedule 42424 | | | | | |
| DeliverySchedule 42434 | | | | | |
| Party 42462A | BillToParty 42440I | | 0..1 42442I | BusinessTransaction DocumentParty 42444I | |
| | | InternalID 42446I | 0..1 42448I | PartyInternalID 42450I | 1..10 42452I |
| | | StandardID 42454I | 0..n 42456I | PartyStandardID 42458I | 1.. 13 / 9 42460I |
| | | BuyerID 42462I | 0..1 42464I | PartyPartyID 42466I | 1..10 42468I |
| | | VendorID 42470I | 0..1 42472I | PartyParty ID 42474I | 1..10 42476I |
| | | Address 42478I | 0..1 42480I | Address 42482I | |

Fig. 424H

| | | | | | | |
|---|---|---|---|---|---|---|
| DeliverySchedule 42424 | | | | | | |
| DeliverySchedule 42434 | | | | | | |
| Party 42462A | Note 42486B | | | 0..1 42488B | Note 42490B | 1..132c 42492B |
| Item 42464A | Item 42496B | | | 1..n 42498B | DeliverySchedule Item 42400C | |
| | | @action Code 42404C | | 0..1 42406C | ActionCode 42408C | 2 42410C |
| | | ID 42414C | | 1 42416C | Business Transaction DocumentItemID 42418C | 1..35 42420C |

Fig. 424I

| | | | | | |
|---|---|---|---|---|---|
| DeliverySchedule 42424 | | | | | |
| DeliverySchedule 42434 | | | | | |
| Item 42464A | | | | | |
| Business Transaction Document Reference 42424C | Scheduling Agreement Reference 42436C | | 1 42438C | BusinessTransaction DocumentReference 42440C | |
| Release 42426C | Release 42444C | | 1 42446C | | |
| | | ID 42450C | 1 42452C | BusinessTransaction Document ID 42454C | 1..35 42456C |
| | | Creation DateTime 42460C | 0..1 42462C | DateTime 42464C | |
| | | Horizon DateTime 42468C | 0..1 42470C | DateTime 42472C | |
| | Previous Release 42476C | | 0..1 42478C | | |

Fig. 424J

| | | | | | |
|---|---|---|---|---|---|
| DeliverySchedule 42424 | | | | | |
| DeliverySchedule 42434 | | | | | |
| Item 42464A | | | | | |
| Release 42426C | | ID 42482C | 1 42484C | BusinessTransactionDocumentID 42486C | 1..35 42488C |
| | | Creation DateTime 42492C | 0..1 42494C | DateTime 42496C | |
| Location 42428C | ShipFrom Location 42400D | | 0..1 42402D | BusinessTransactionDocument ShipFromLocation 42404D | |
| | | InternalID 42410D | 0..1 42412D | LocationInternalID 42414D | 1..20 42416D |
| | | StandardID 42420D | 0..n 42422D | LocationStandardID 42424D | 1..13 42426D |

Fig. 424K

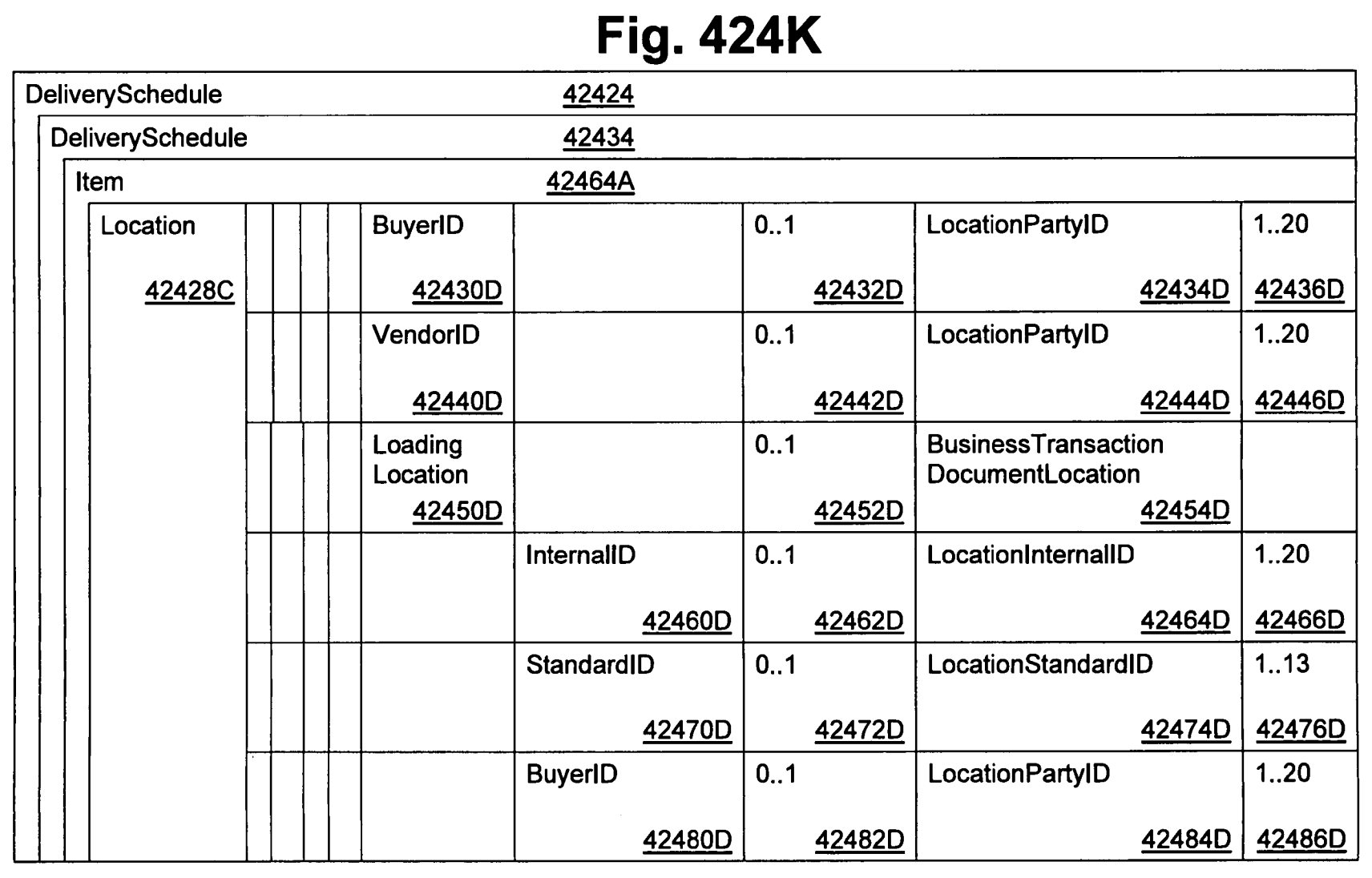

DeliverySchedule 42424

DeliverySchedule 42434

Item 42464A

| | | | | | |
|---|---|---|---|---|---|
| Location 42428C | BuyerID 42430D | | 0..1 42432D | LocationPartyID 42434D | 1..20 42436D |
| | VendorID 42440D | | 0..1 42442D | LocationPartyID 42444D | 1..20 42446D |
| | Loading Location 42450D | | 0..1 42452D | BusinessTransaction DocumentLocation 42454D | |
| | | InternalID 42460D | 0..1 42462D | LocationInternalID 42464D | 1..20 42466D |
| | | StandardID 42470D | 0..1 42472D | LocationStandardID 42474D | 1..13 42476D |
| | | BuyerID 42480D | 0..1 42482D | LocationPartyID 42484D | 1..20 42486D |

Fig. 424L

| | | | | | | |
|---|---|---|---|---|---|---|
| DeliverySchedule 42424 | | | | | | |
| DeliverySchedule 42434 | | | | | | |
| Item 42464A | | | | | | |
| Location 42428C | | VendorID 42490D | | 0..1 42492D | LocationPartyID 42494D | 1..20 42496D |
| | | Address 42400E | | 0..1 42402E | Address 42404E | |
| | Transshipment Location 42410E | | | 0..1 42412E | BusinessTransaction DocumentTransshipment Location 42414E | |
| | | InternalID 42420E | | 0..1 42422E | LocationInternalID 42424E | 1..20 42426E |
| | | StandardID 42430E | | 0..n 42432E | LocationStandardID 42434E | 1..13 42436E |

Fig. 424M

DeliverySchedule 42424

DeliverySchedule 42434

Item 42464A

| | | | | | |
|---|---|---|---|---|---|
| Location 42428C | | BuyerID 42440E | 0..1 42442E | Location PartyID 42444E | 1..20 42446E |
| | | VendorID 42450E | 0..1 42452E | Location PartyID 42454E | 1..20 42456E |
| | | Address 42460E | 0..1 42462E | Address 42464E | |
| | ShipTo Location 42470E | | 1 42472E | BusinessTransactionDocument ShipToLocation 42474E | |

Fig. 424N-1

DeliveryScheduleNotification 424A24

DeliverySchedule 424A34

Item 424A64A

| | | | | |
|---|---|---|---|---|
| Location 424A28C | InternalID 424A80E | 0..1 424A82E | LocationInternal ID 424A84E | 1..20 424A86E |
| | Standard ID 424A90E | 0..n 424A92E | LocationStandardID 424A94E | 1..13 424A96E |
| | BuyerID 424A00F | 0..1 424A02F | LocationPartyID 424A04F | 1..20 424A06F |
| | VendorID 424A10F | 0..1 424A12F | LocationPartyID 424A14F | 1..20 424A16F |
| | Unloading Location 424A20F | 0..1 424A22F | BusinessTransaction DocumentLocation 424A24F | |

Fig. 424N-2

| | | | |
|---|---|---|---|
| InternalID 424A30F | 0..1 424A32F | LocationInternalID 424A34F | 1..20 424A36F |
| StandardID 424A40F | 0..n 424A42F | LocationStandardID 424A44F | 1..13 424A46F |

Fig. 424O

| | | | | | | |
|---|---|---|---|---|---|---|
| DeliverySchedule 42424 | | | | | | |
| DeliverySchedule 42434 | | | | | | |
| Item 42464A | | | | | | |
| Location 42428C | | | Buyer ID 42450F | 0..1 42452F | LocationPartyID 42454F | 1..20 42456F |
| | | | Vendor ID 42460F | 0..1 42462F | LocationPartyID 42464F | 1..20 42466F |
| | | Address 42470F | | 0..1 42472F | Addess 42474F | |
| Product Information 42430C | Product 42480F | | | 1 42482F | BusinessTransaction DocumentProduct 42484F | |
| | | InternalID 42490F | | 0..1 42492F | ProductInternalID 42494F | 1..40 42496F |
| | | Standard ID 42400G | | 0..1 42402G | ProductStandardID 42404G | 14 42406G |

Fig. 424P

| | | | | | |
|---|---|---|---|---|---|
| DeliverySchedule 42424 | | | | | |
| DeliverySchedule 42434 | | | | | |
| Item 42464A | | | | | |
| Product Information 42430C | | BuyerID 42410G | 0..1 42412G | ProductPartyID 42414G | 1..40 42416G |
| | | VendorID 42420G | 0..1 42422G | ProductPartyID 42424G | 1..40 42426G |
| Delivery Information 42432C | PreviousDelivery 42430G | | 0..1 42432G | | |
| | | ID 42436G | 1 42438G | BusinessTransaction DocumentID 42440G | 1..35 42442G |
| | | Received Quantity 42446G | 0..1 42448G | Quantity 42449G | 19,6 42450G |
| | | Receipt DateTime 42454G | 0..1 42456G | DateTime 42458G | |
| | Cumulative Delivery 42462G | | 0..1 42464G | | |

Fig. 424Q

| | | | | | | |
|---|---|---|---|---|---|---|
| DeliverySchedule 42424 | | | | | | |
| DeliverySchedule 42434 | | | | | | |
| Item 42464A | | | | | | |
| Delivery Information 42432C | | ValidityPeriod 42468G | 0..1 42470G | DateTimePeriod 42472G | |
| | | ReceivedQuantity 42476G | 1 42478G | Quantity 42480G | 19,6 42482G |
| | | Reconcillation DateTime 42486G | 0..1 42488G | DateTime 42490G | |
| | | Shipped Quantity 42484I | 0..1 42486I | Quantity 42488I | 19,6 42490I |
| | | Reconcilliation Quantity 42494G | 0..1 42496G | Quantity 42498G | 19,6 42400H |
| Schedule Line 42434C | Schedule Line 42404H | | 1..n 42406H | DeliverySchedule ItemLine 42408H | |
| | | CommitmentCode 42412H | 1 42414H | ScheduleLine ComitmentCode 42416H | 3 42418H |

Fig. 424R

| | | | | |
|---|---|---|---|---|
| DeliverySchedule 42424 | | | | |
| DeliverySchedule 42434 | | | | |
| Item 42464A | | | | |
| Schedule Line 42434C | ProductChangeID 42422H | 0..1 42424H | ProductChangeID 42426H | 1..25 42428H |
| | DeliveryPeriod 42432H | 0..1 42434H | DateTimePeriod 42436H | |
| | PickUpPeriod 42440H | 0..1 42442H | DateTimePeriod 42444H | |
| | Quantity 42448H | 1 42450H | Quantity 42452H | 19,6 42454H |
| | Note 42458H | 0..1 42460H | Note 42462H | 1..132 42464H |

Fig. 424S

| | | | |
|---|---|---|---|
| DeliverySchedule 42424 | | | |
| DeliverySchedule 42434 | | | |
| Item 42464A | | | |
| Note 42468H | 0..1 42470H | Note 42472H | 1..132 42474H |
| KanBanCardID 42474J | 0..1 42476J | KanBanCardID 42478J | 1..10 42480J |
| ProductAuthorization Period 42482J | 0..1 42484J | DateTimePeriod 42486J | |
| PurchasingAuthorization Period 42488J | 0..1 42490J | DateTimePeriod 42492J | |

Fig. 424T

DeliverySchedule 42424

DeliverySchedule 42434

Item 42464A

| | | | | | |
|---|---|---|---|---|---|
| Party 42472J | BuyerParty 42484I | | 0..1 42486I | BusinessTransaction DocumentParty 42488I | |
| | | InternalID 42490I | 0..1 42492I | Party InternalID 42494I | 1..10 42496I |
| | | StandardID 42498I | 0..n 42400J | Party StandardID 42402J | 1..13/9 42404J |
| | | BuyerID 42406J | 0..1 42408J | PartyPartyID 42410J | 1..10 42412J |
| | | VendorID 42414J | 0..1 42416J | Party PartyID 42418J | 1..10 42420J |
| | | Address 42422J | 0..1 42424J | Address 42426J | |

Fig. 424U

| | | | | |
|---|---|---|---|---|
| DeliverySchedule 42424 | | | | |
| DeliverySchedule 42434 | | | | |
| Item 42464A | | | | |
| Party 42472J | | | | |
| Product Reclpient Party 42428J | | 0..1 42430J | BusinessTransaction DocumentParty 42432J | |
| | InternalID 42434J | 0..1 42436J | Party InternalID 42438J | 1..10 42440J |
| | StandardID 42442J | 0..n 42444J | Party StandardID 42446J | 1..13/9 42448J |
| | BuyerID 42450J | 0..1 42452J | PartyPartyID 42454J | 1..10 42456J |
| | VendorID 42458J | 0..1 42460J | Party PartyID 42462J | 1..10 42464J |
| | Address 42466J | 0..1 42468J | Address 42470J | |

Fig. 424V

| | | | | |
|---|---|---|---|---|
| DeliverySchedule | 42424 | | | |
| DeliverySchedule | 42434 | | | |
| Item | 42464A | | | |
| Schedule Line 42434C | ConfirmedScheduleLine 42400K | | 1..n 42402K | DeliveryScheduleItem-ConfirmedScheduleLine 42404K |
| | | DeliveryPeriod 42406K | 0..1 42408K | DateTimePeriod 42410K |
| | | PickUpPeriod 42412K | 0..1 42414K | DateTimePeriod 42416K |
| | | Quantity 42418K | 1 42420K | Quantity 42422K |

Fig. 424AA

| Package 424A00 | L 1 424A02 | L2 424A04 | L3 424A06 | L4 424A08 | L5 424A10 | L6 424A12 | C. 424A14 | G/CDT 424A16 | Lgth. 424A20 |
|---|---|---|---|---|---|---|---|---|---|
| Delivery Schedule Notification 424A24 | Delivery Schedule Notification 424A26 | | | | | | | DeliverySchedule Notification Message 424A28 | |
| Business Document Message Header 424A32 | | Message Header 424A36 | | | | | 1 424A38 | BusinessDocument MessageHeader 424A40 | |
| | | | ID 424A46 | | | | 1 424A48 | BusinessDocument MessageID 424A50 | 1.35 424A52 |
| | | | Creation DateTime 424A66 | | | | 1 424A68 | DateTime 424A70 | |

Fig. 424AB

| DeliveryScheduleNotification 424A24 | | | | | |
|---|---|---|---|---|---|
| BusinessDocument MessageHeader 424A32 | | Sender Party 424A74 | | 0..1 424A76 | BusinessDocument MessageHeaderParty 424A78 |
| | | | InternalID 424A84 | 0..1 424A86 | PartyInternalID 424A88 |
| | | | StandardID 424A92 | 0..n 424A94 | PartyStandardID 424A96 |
| | | Recipient Party 424A00A | | 0..1 424A02A | BusinessDocument MessageHeaderParty 424A04A |
| | | | InternalID 424A10A | 0..1 424A12A | PartyInternalID 424A14A |
| | | | StandardID 424A18A | 0..n 424A20A | PartyStandardID 424A22A |
| DeliverySchedule 424A34 | DeliverySchedule 424A26A | | | 1 424A28A | DeliverySchedule_ Notification 424A30A |

Fig. 424AC

| DeliveryScheduleNotification 424A24 | | | | | |
|---|---|---|---|---|---|
| Delivery Schedule 424A34 | ID 424A34A | | 0..1 424A36A | BusinessTransaction DocumentID 424A38A | 1.35 424A40A |
| | TypeCode 424A44A | | 0..1 424A46A | DeliverySchedule TypeCode 424A48A | 1 424A50A |
| | CreationDate Time 424A54A | | 1 424A56A | DateTime 424A58A | |
| Party 424A62A | BuyerParty 424A66A | | 0..1 424A68A | BusinessTransaction DocumentParty 424A70A | |
| | | InternalID 424A76A | 0..1 424A78A | PartyInternal ID 424A80A | 1..10 424A82A |
| | | StandardID 424A86A | 0..n 424A88A | PartyStandardID 424A90A | 1.. 13 / 9 424A92A |

Fig. 424AD

| | | | | | |
|---|---|---|---|---|---|
| DeliveryScheduleNotification 424A24 | | | | | |
| DeliverySchedule 424A34 | | | | | |
| Party 424A62A | BuyerID 424A96A | | 0..1 424A98A | PartyPartyID 424A00B | 1..10 424A02B |
| | VendorID 424A06B | | 0..1 424A08B | ContactPerson InternalID 424A10B | 1..10 424A12B |
| | Address 424A16B | | 0..1 424A18B | Address 424A20B | |
| | ContactPerson 424A80H | | 0..n 424A82H | ContactPerson 424A84H | |
| | | InternalID 424A86H | 0..1 424A88H | ContactPerson InternalID 424A90H | |
| | | BuyerID 424A92H | 0..1 424A94H | ContactPerson PartyID 424A96H | |
| | | VendorID 424A98H | 0..1 424A00I | ContactPerson PartyID 424A02I | |
| | | Address 424A04I | 0..1 424A06I | Address 424A08I | |

Fig. 424AE

| | | | | | |
|---|---|---|---|---|---|
| DeliveryScheduleNotification 424A24 | | | | | |
| DeliverySchedule 424A34 | | | | | |
| Party 424A62A | VendorParty 424A26B | | 1 424A28B | BusinessTransaction DocumentParty 424A30B | |
| | | InternalID 424A36B | 0..1 424A38B | PartyInternalID 424A40B | 1..10 424A42B |
| | | StandardID 424A46B | 0..n 424A48B | PartyStandardID 424A50B | 1.. 13 / 9 424A52B |
| | | BuyerID 424A56B | 0..1 424A58B | PartyPartyID 424A60B | 1..10 424A62B |
| | | VendorID 424A66B | 0..1 424A68B | PartyParty ID 424A70B | 1..10 424A72B |
| | | Address 424A76B | 0..1 424A78B | Address 424A80B | |

Fig. 424AF

DeliveryScheduleNotification 424A24

DeliverySchedule 424A34

| | | | |
|---|---|---|---|
| Contact Person 424A10I | | 0..n 424A12I | ContactPerson 424A14I |
| | InternalID 424A16I | 0..1 424A18I | ContactPerson InternalID 424A20I |
| | BuyerID 424A22I | 0..1 424A24I | ContactPerson PartyID 424A26I |
| | VendorID 424A28I | 0..1 424A30I | ContactPerson PartyID 424A32I |
| | Address 424A34I | 0..1 424A36I | Address 424A38I |

Fig. 424AG

| | | | | | | |
|---|---|---|---|---|---|---|
| DeliveryScheduleNotification 424A24 | | | | | | |
| DeliverySchedule 424A34 | | | | | | |
| Party 424A62A | BillToParty 424A40I | | 0..1 424A42I | BusinessTransaction DocumentParty 424A44I | | |
| | | InternalID 424A46I | 0..1 424A48I | PartyInternalID 424A50I | 1..10 424A52I | |
| | | StandardID 424A54I | 0..n 424A56I | PartyStandardID 424A58I | 1.. 13 / 9 424A60I | |
| | | BuyerID 424A62I | 0..1 424A64I | PartyPartyID 424A66I | 1..10 424A68I | |
| | | VendorID 424A70I | 0..1 424A72I | PartyParty ID 424A74I | 1..10 424A76I | |
| | | Address 424A78I | 0..1 424A80I | Address 424A82I | | |

Fig. 424AH

| DeliveryScheduleNotification 424A24 | | | | | | |
|---|---|---|---|---|---|---|
| DeliverySchedule 424A34 | | | | | | |
| Party 424A62A | Note 424A86B | | | 0..1 424A88B | Note 424A90B | 1..132c 424A92B |
| Item 424A64A | Item 424A96B | | | 1..n 424A98B | DeliverySchedule Item_Notification 424A00C | |
| | | @action Code 424A04C | | 0..1 424A06C | ActionCode 424A08C | 2 424A10C |
| | | ID 424A14C | | 1 424A16C | Business Transaction DocumentItemID 424A18C | 1..35 424A20C |

Fig. 424AI

| | | | | | |
|---|---|---|---|---|---|
| DeliveryScheduleNotification 424A24 | | | | | |
| DeliverySchedule 424A34 | | | | | |
| Item 424A64A | | | | | |
| Business Transaction Document Reference 424A24C | Scheduling Agreement Reference 424A36C | | 1 424A38C | BusinessTransaction DocumentReference 424A40C | |
| Release 424A26C | Release 424A44C | | 1 424A46C | | |
| | | ID 424A50C | 1 424A52C | BusinessTransaction Document ID 424A54C | 1..35 424A56C |
| | | Creation DateTime 424A60C | 0..1 424A62C | DateTime 424A64C | |
| | | Horizon DateTime 424A68C | 0..1 424A70C | DateTime 424A72C | |
| | Previous Release 424A76C | | 0..1 424A78C | | |

Fig. 424AJ

DeliveryScheduleNotification 424A24

DeliverySchedule 424A34

Item 424A64A

| | | | | | | |
|---|---|---|---|---|---|---|
| Release 424A26C | | ID 424A82C | 1 424A84C | BusinessTransactionDocumentID 424A86C | 1..35 424A88C |
| | | CreationDateTime 424A92C | 0..1 424A94C | DateTime 424A96C | |
| Location 424A28C | ShipFromLocation 424A00D | | 0..1 424A02D | BusinessTransactionDocumentShipFromLocation 424A04D | |
| | | InternalID 424A10D | 0..1 424A12D | LocationInternalID 424A14D | 1..20 424A16D |
| | | StandardID 424A20D | 0..n 424A22D | LocationStandardID 424A24D | 1..13 424A26D |

Fig. 424AK

| | | | | | |
|---|---|---|---|---|---|
| DeliveryScheduleNotification 424A24 | | | | | |
| DeliverySchedule 424A34 | | | | | |
| Item 424A64A | | | | | |
| Location 424A28C | BuyerID 424A30D | | 0..1 424A32D | LocationPartyID 424A34D | 1..20 424A36D |
| | VendorID 424A40D | | 0..1 424A42D | LocationPartyID 424A44D | 1..20 424A46D |
| | Loading Location 424A50D | | 0..1 424A52D | BusinessTransaction DocumentLocation 424A54D | |
| | | InternalID 424A60D | 0..1 424A62D | LocationInternalID 424A64D | 1..20 424A66D |
| | | StandardID 424A70D | 0..1 424A72D | LocationStandardID 424A74D | 1..13 424A76D |
| | | BuyerID 424A80D | 0..1 424A82D | LocationPartyID 424A84D | 1..20 424A86D |

Fig. 424AL

| | | | | | | |
|---|---|---|---|---|---|---|
| DeliveryScheduleNotification 424A24 | | | | | | |
| DeliverySchedule 424A34 | | | | | | |
| Item 424A64A | | | | | | |
| Location 424A28C | | VendorID 424A90D | | 0..1 424A92D | LocationPartyID 424A94D | 1..20 424A96D |
| | | Address 424A00E | | 0..1 424A02E | Address 424A04E | |
| | Transshipment Location 424A10E | | | 0..1 424A12E | BusinessTransaction DocumentTransshipment Location 424A14E | |
| | | InternalID 424A20E | | 0..1 424A22E | LocationInternalID 424A24E | 1..20 424A26E |
| | | StandardID 424A30E | | 0..n 424A32E | LocationStandardID 424A34E | 1..13 424A36E |

Fig. 424AM

| | | | | | |
|---|---|---|---|---|---|
| DeliveryScheduleNotification 424A24 | | | | | |
| DeliverySchedule 424A34 | | | | | |
| Item 424A64A | | | | | |
| Location 424A28C | | BuyerID 424A40E | 0..1 424A42E | Location PartyID 424A44E | 1..20 424A46E |
| | | VendorID 424A50E | 0..1 424A52E | Location PartyID 424A54E | 1..20 424A56E |
| | | Address 424A60E | 0..1 424A62E | Address 424A64E | |
| | ShipTo Location 424A70E | | 1 424A72E | BusinessTransactionDocument ShipToLocation 424A74E | |

Fig. 424AN

| | | | | | |
|---|---|---|---|---|---|
| DeliveryScheduleNotification | 424A24 | | | | |
| DeliverySchedule | 424A34 | | | | |
| Item | 424A64A | | | | |
| Location 424A28C | InternalID 424A80E | | 0..1 424A82E | LocationInternal ID 424A84E | 1..20 424A86E |
| | Standard ID 424A90E | | 0..n 424A92E | LocationStandardID 424A94E | 1..13 424A96E |
| | BuyerID 424A00F | | 0..1 424A02F | LocationPartyID 424A04F | 1..20 424A06F |
| | VendorID 424A10F | | 0..1 424A12F | LocationPartyID 424A14F | 1..20 424A16F |
| | Unloading Location 424A20F | | 0..1 424A22F | BusinessTransaction DocumentLocation 424A24F | |

Fig. 424AN (continued)

| | | | | | | | | | | | | |
|---|---|---|---|---|---|---|---|---|---|---|---|---|
| | | | | | | | | | InternalID 424A30F | 0..1 424A32F | LocationInternalID 424A34F | 1..20 424A36F |
| | | | | | | | | | StandardID 424A40F | 0..n 424A42F | LocationStandardID 424A44F | 1..13 424A46F |

Fig. 424AO

| | | | | | | | |
|---|---|---|---|---|---|---|---|
| DeliveryScheduleNotification 424A24 | | | | | | | |
| DeliverySchedule 424A34 | | | | | | | |
| Item 424A64A | | | | | | | |
| Location 424A28C | | | Buyer ID 424A50F | 0..1 424A52F | LocationPartyID 424A54F | 1..20 424A56F |
| | | | Vendor ID 424A60F | 0..1 424A62F | LocationPartyID 424A64F | 1..20 424A66F |
| | | Address 424A70F | | 0..1 424A72F | Addess 424A74F | |
| Product Information 424A30C | Product 424A80F | | | 1 424A82F | BusinessTransaction DocumentProduct 424A84F | |
| | | InternalID 424A90F | | 0..1 424A92F | ProductInternalID 424A94F | 1..40 424A96F |
| | | Standard ID 424A00G | | 0..1 424A02G | ProductStandardID 424A04G | 14 424A06G |

Fig. 424AP

DeliveryScheduleNotification 424A24

DeliverySchedule 424A34

Item 424A64A

| | | | | | |
|---|---|---|---|---|---|
| Product Information 424A30C | | BuyerID 424A10G | 0..1 424A12G | ProductPartyID 424A14G | 1..40 424A16G |
| | | VendorID 424A20G | 0..1 424A22G | ProductPartyID 424A24G | 1..40 424A26G |
| Delivery Information 424A32C | PreviousDelivery 424A30G | | 0..1 424A32G | | |
| | | ID 424A36G | 1 424A38G | BusinessTransaction DocumentID 424A40G | 1..35 424A42G |
| | | Received Quantity 424A46G | 0..1 424A48G | Quantity 424A49G | 19,6 424A50G |
| | | Receipt DateTime 424A54G | 0..1 424A56G | DateTime 424A58G | |
| | Cumulative Delivery 424A62G | | 0..1 424A64G | | |

Fig. 424AQ

| | | | | | |
|---|---|---|---|---|---|
| DeliveryScheduleNotification 424A24 | | | | | |
| DeliverySchedule 424A34 | | | | | |
| Item 424A64A | | | | | |
| Delivery Information 424A32C | | ValidityPeriod 424A68G | 0..1 424A70G | DateTimePeriod 424A72G | |
| | | ReceivedQuantity 424A76G | 1 424A78G | Quantity 424A80G | 19,6 424A82G |
| | | Reconcillation DateTime 424A86G | 0..1 424A88G | DateTime 424A90G | |
| | | Shipped Quantity 424A84I | 0..1 424A86I | Quantity 424A88I | 19,6 424A90I |
| | | Reconcilliation Quantity 424A94G | 0..1 424A96G | Quantity 424A98G | 19,6 424A00H |
| Schedule Line 424A34C | Schedule Line 424A04H | | 1..n 424A06H | DeliverySchedule ItemLine_Notification 424A08H | |
| | | CommitmentCode 424A12H | 1 424A14H | ScheduleLine ComitmentCode 424A16H | 3 424A18H |

Fig. 424AR

| | | | | | |
|---|---|---|---|---|---|
| DeliveryScheduleNotification 424A24 | | | | | |
| DeliverySchedule 424A34 | | | | | |
| Item 424A64A | | | | | |
| Schedule Line 424A34C | ProductChangeID 424A22H | 0..1 424A24H | ProductChangeID 424A26H | 1..25 424A28H |
| | DeliveryPeriod 424A32H | 0..1 424A34H | DateTimePeriod 424A36H | |
| | PickUpPeriod 424A40H | 0..1 424A42H | DateTimePeriod 424A44H | |
| | Quantity 424A48H | 1 424A50H | Quantity 424A52H | 19,6 424A54H |
| | Note 424A58H | 0..1 424A60H | Note 424A62H | 1..132 424A64H |

Fig. 424AS

| | | | | |
|---|---|---|---|---|
| DeliveryScheduleNotification 424A24 | | | | |
| DeliverySchedule 424A34 | | | | |
| Item 424A64A | | | | |
| Note 424A68H | | 0..1 424A70H | Note 424A72H | 1..132 424A74H |
| KanBanCardID 424A74J | | 0..1 424A76J | KanBanCardID 424A78J | 1..10 424A80J |
| ProductAuthorization Period 424A82J | | 0..1 424A84J | DateTimePeriod 424A86J | |
| PurchasingAuthorization Period 424A88J | | 0..1 424A90J | DateTimePeriod 424A92J | |

Fig. 424AT

| | | | | | | |
|---|---|---|---|---|---|---|
| DeliveryScheduleNotification 424A24 | | | | | | |
| DeliverySchedule 424A34 | | | | | | |
| Item 424A64A | | | | | | |
| Party 424A72J | BuyerParty 424A84I | | 0..1 424A86I | BusinessTransactionDocumentParty 424A88I | | |
| | | InternalID 424A90I | 0..1 424A92I | Party InternalID 424A94I | 1..10 424A96I | |
| | | StandardID 424A98I | 0..n 424A00J | Party StandardID 424A02J | 1..13/9 424A04J | |
| | | BuyerID 424A06J | 0..1 424A08J | PartyPartyID 424A10J | 1..10 424A12J | |
| | | VendorID 424A14J | 0..1 424A16J | Party PartyID 424A18J | 1..10 424A20J | |
| | | Address 424A22J | 0..1 424A24J | Address 424A26J | | |

Fig. 424AU

DeliveryScheduleNotification 424A24

DeliverySchedule 424A34

Item 424A64A

| | | | | |
|---|---|---|---|---|
| Party 424A72J | | | | |
| Product RecIpient Party 424A28J | | 0..1 424A30J | BusinessTransaction DocumentParty 424A32J | |
| | InternalID 424A34J | 0..1 424A36J | Party InternalID 424A38J | 1..10 424A40J |
| | StandardID 424A42J | 0..n 424A44J | Party StandardID 424A46J | 1..13/9 424A48J |
| | BuyerID 424A50J | 0..1 424A52J | PartyPartyID 424A54J | 1..10 424A56J |
| | VendorID 424A58J | 0..1 424A60J | Party PartyID 424A62J | 1..10 424A64J |
| | Address 424A66J | 0..1 424A68J | Address 424A70J | |

FIG. 424BA

| Package 424B00 | level1 424B01 | level2 424B02 | level3 424B03 | level4 424B04 | level5 424B05 | level6 424B06 | Cardinality 424B07 | Name 424B08 |
|---|---|---|---|---|---|---|---|---|
| DeliveryScheduleMessage 424B09 | DeliveryScheduleConfirmation 424B10 | | | | | | | DeliveryScheduleConfirmationMessage 424B11 |
| BusinessDocument MessageHeader 424B12 | | MessageHeader 424B13 | | | | | 1 424B14 | BusinessDocumentMessageHeader 424B15 |
| | | | ID 424B16 | | | | 1 424B17 | BusinessDocumentMessageID 424B18 |
| | | | CreationDateTime 424B19 | | | | 1 424B20 | DateTime 424B21 |
| | | | SenderParty 424B22 | | | | 0..1 424B23 | BusinessDocument-MessageHeaderParty 424B24 |
| | | | | InternalID 424B25 | | | 0..1 424B26 | PartyInternalID 424B27 |
| | | | | StandardID 424B28 | | | 0..n 424B29 | PartyStandardID 424B30 |

FIG. 424BB

| Package 424B00 | level1 424B01 | level2 424B02 | level3 424B03 | level4 424B04 | level5 424B05 | level6 424B06 | Cardinality 424B07 | Name 424B08 |
|---|---|---|---|---|---|---|---|---|
| | | | RecipientParty 424B31 | | | | 0..1 424B32 | BusinessDocumentMessageHeaderParty 424B33 |
| | | | | InternalID 424B34 | | | 0..1 424B35 | PartyInternalID 424B36 |
| | | | | StandardID 424B37 | | | 0..n 424B38 | PartyStandardID 424B39 |
| DeliverySchedule 424B40 | | DeliverySchedule 424B41 | | | | | 1 424B42 | DeliverySchedule_Confirmation 424B43 |
| | | | ID 424B44 | | | | 0..1 424B45 | BusinessTransactionDocumentID 424B46 |
| | | | TypeCode 424B47 | | | | 0..1 424B48 | DeliveryScheduleTypeCode 424B49 |
| | | | CreationDateTime 424B50 | | | | 1 424B51 | DateTime 424B52 |

FIG. 424BC

| Package 424B00 | level1 424B01 | level2 424B02 | level3 424B03 | level4 424B04 | level5 424B05 | level6 424B06 | Cardinality 424B07 | Name 424B08 |
|---|---|---|---|---|---|---|---|---|
| Party 424B53 | | | BuyerParty 424B54 | | | | 0..1 424B55 | BusinessTransactionDocumentParty 424B56 |
| | | | | InternalID 424B57 | | | 0..1 424B58 | PartyInternalID 424B59 |
| | | | | StandardID 424B60 | | | 0..n 424B61 | PartyStandardID 424B62 |
| | | | | BuyerID 424B63 | | | 0..1 424B64 | PartyPartyID 424B65 |
| | | | | VendorID 424B66 | | | 0..1 424B67 | PartyPartyID 424B68 |
| | | | VendorParty 424B69 | | | | 1 424B70 | BusinessTransactionDocumentParty 424B71 |
| | | | | InternalID 424B72 | | | 0..1 424B73 | PartyInternalID 424B74 |
| | | | | StandardID 424B75 | | | 0..n 424B76 | PartyStandardID 424B77 |
| | | | | BuyerID 424B78 | | | 0..1 424B79 | PartyPartyID 424B80 |

FIG. 424BD

| Package 424B00 | level1 424B01 | level2 424B02 | level3 424B03 | level4 424B04 | level5 424B05 | level6 424B06 | Cardinality 424B07 | Name 424B08 |
|---|---|---|---|---|---|---|---|---|
| | | | | VendorID 424B81 | | | 0..1 424B82 | PartyPartyID 424B83 |
| | | | Note 424B84 | | | | 0..1 424B85 | Note 424B86 |
| Item 424B87 | | | Item 424B88 | | | | 1..n 424B89 | DeliveryScheduleItem_Confirmation 424B90 |
| | | | | @actionCode 424B91 | | | 0..1 424B92 | ActionCode 424B93 |
| | | | | ID 424B94 | | | 1 424B95 | BusinessTransactionDocumentItemID 424B96 |
| BusinessTransactionDocumentReference 424B97 | | | | SchedulingAgreementReference 424B98 | | | 1 424B99 | BusinessTransactionDocumentReference 424B00A |
| Release 424B01A | | | | Release 424B02A | | | 1 424B03A | |

FIG. 424BE

| Package 424B00 | level1 424B01 | level2 424B02 | level3 424B03 | level4 424B04 | level5 424B05 | level6 424B06 | Cardinality 424B07 | Name 424B08 |
|---|---|---|---|---|---|---|---|---|
| | | | | | ID 424B04A | | 1 424B05A | BusinessTransactionDocumentID 424B06A |
| | | | | | CreationDateTime 424B07A | | 0..1 424B08A | DateTime 424B09A |
| | | | | | HorizonDateTime 424B10A | | 0..1 424B11A | DateTime 424B12A |
| Party 424B13A | | | | BuyerParty 424B14A | | | 0..1 424B15A | BusinessTransactionDocumentParty 424B16A |
| | | | | | InternalID 424B17A | | 0..1 424B18A | PartyInternalID 424B19A |
| | | | | | StandardID 424B20A | | 0..n 424B21A | PartyStandardID 424B22A |
| | | | | | BuyerID 424B23A | | 0..1 424B24A | PartyPartyID 424B25A |
| | | | | | VendorID 424B26A | | 0..1 424B27A | PartyPartyID 424B28A |

FIG. 424BF

| Package 424B00 | level1 424B01 | level2 424B02 | level3 424B03 | level4 424B04 | level5 424B05 | level6 424B06 | Cardinality 424B07 | Name 424B08 |
|---|---|---|---|---|---|---|---|---|
| | | | | ProductRecipientParty 424B29A | | | 0..1 424B30A | BusinessTransactionDocumentParty 424B31A |
| | | | | | InternalID 424B32A | | 0..1 424B33A | PartyInternalID 424B34A |
| | | | | | StandardID 424B35A | | 0..n 424B36A | PartyStandardID 424B37A |
| | | | | | BuyerID 424B38A | | 0..1 424B39A | PartyPartyID 424B40A |
| | | | | | VendorID 424B41A | | 0..1 424B42A | PartyPartyID 424B43A |
| Location 424B44A | | | | ShipFromLocation 424B45A | | | 0..1 424B46A | BusinessTransaction-DocumentShipFromLocation 424B47A |
| | | | | | InternalID 424B48A | | 0..1 424B49A | LocationInternalID 424B50A |

FIG. 424BG

| Package 424B00 | level1 424B01 | level2 424B02 | level3 424B03 | level4 424B04 | level5 424B05 | level6 424B06 | Cardinality 424B07 | Name 424B08 |
|---|---|---|---|---|---|---|---|---|
| | | | | | StandardID 424B51A | | 0..n 424B52A | LocationStandardID 424B53A |
| | | | | | BuyerID 424B54A | | 0..1 424B55A | LocationPartyID 424B56A |
| | | | | | VendorID 424B57A | | 0..1 424B58A | LocationPartyID 424B59A |
| | | | | TransshipmentLocation 424B60A | | | 0..1 424B61A | BusinessTransactionDocumentTransshipmentLocation 424B62A |
| | | | | | InternalID 424B63A | | 0..1 424B64A | LocationInternalID 424B65A |
| | | | | | StandardID 424B66A | | 0..n 424B67A | LocationStandardID 424B68A |
| | | | | | BuyerID 424B69A | | 0..1 424B70A | LocationPartyID 424B71A |

FIG. 424BH

| Package 424B00 | level1 424B01 | level2 424B02 | level3 424B03 | level4 424B04 | level5 424B05 | level6 424B06 | Cardinality 424B07 | Name 424B08 |
|---|---|---|---|---|---|---|---|---|
| | | | | | VendorID 424B72A | | 0..1 424B73A | LocationPartyID 424B74A |
| | | | | ShipToLocation 424B75A | | | 0..1 424B76A | BusinessTransaction DocumentShipTo Location 424B77A |
| | | | | | InternalID 424B78A | | 0..1 424B79A | LocationInternalID 424B80A |
| | | | | | StandardID 424B81A | | 0..n 424B82A | LocationStandardID 424B83A |
| | | | | | BuyerID 424B84A | | 0..1 424B85A | LocationPartyID 424B86A |
| | | | | | VendorID 424B87A | | 0..1 424B88A | LocationPartyID 424B89A |
| ProductInformation 424B90A | | | | Product 424B91A | | | 1 424B92A | BusinessTransactionDocumentProduct 424B93A |

FIG. 424BI

| Package 424B00 | level1 424B01 | level2 424B02 | level3 424B03 | level4 424B04 | level5 424B05 | level6 424B06 | Cardinality 424B07 | Name 424B08 |
|---|---|---|---|---|---|---|---|---|
| | | | | | InternalID 424B94A | | 0..1 424B95A | ProductInternalID 424B96A |
| | | | | | StandardID 424B97A | | 0..1 424B98A | ProductStandardID 424B99A |
| | | | | | BuyerID 424B00B | | 0..1 424B01B | ProductPartyID 424B02B |
| | | | | | VendorID 424B03B | | 0..1 424B04B | ProductPartyID 424B05B |
| | | | | Note 424B06B | | | 0..1 424B07B | Note 424B08B |
| Schedule Line 424B09B | | | | ConfirmedScheduleLine 424B10B | | | 1..n 424B11B | DeliveryScheduleItem-ConfirmedScheduleLine_Confirmation 424B12B |
| | | | | | DeliveryPeriod 424B13B | | 0..1 424B14B | DateTimePeriod 424B15B |

FIG. 424BJ

| Package 424B00 | level1 424B01 | level2 424B02 | level3 424B03 | level4 424B04 | level5 424B05 | level6 424B06 | Cardinality 424B07 | Name 424B08 |
|---|---|---|---|---|---|---|---|---|
| | | | | | PickUpPeriod 424B16B | | 0..1 424B17B | DateTimePeriod 424B18B |
| | | | | | Quantity 424B19B | | 1 424B20B | Quantity 424B21B |

Fig. 427A

| Package 42700 | L1 42702 | L2 42704 | L3 42706 | L4 42708 | Occ427 42710 | Datatype 42712 |
|---|---|---|---|---|---|---|
| InvoiceIssued Message 42714 | InvoiceIssued Message 42716 | | | | 1 42718 | MDT:InvoiceIssued Message 42720 |
| Invoice Issued 42722 | | InvoiceIssued 42724 | | | 1 42726 | GDT:InvoiceIssued 42728 |
| | | | BaseInvoiceID 42730 | | 1 42732 | GDT:Business TransactionDocumentID 42734 |
| | | | Cancellation InvoiceIndicator 42736 | | 1 42738 | GDT:Invoice CancellationInvoice Indicator 42740 |
| | | | IntraCorporate Indicator 42742 | | 1 42744 | GDT:IntraCorporate Indicator 42746 |
| Item 42748 | | | Item 42750 | | 1..n 42752 | GDT:Item 42754 |
| | | | | BaseInvoice ItemID 42756 | 1 42758 | GDT:BusinessTrans-actionDocumentItemID 42760 |

Fig. 427B

| | | | | | | | |
|---|---|---|---|---|---|---|---|
| InvoiceIssuedMessage 42714 | | | | | | | |
| InvoiceIssued 42722 | | | | | | | |
| Item 42748 | | | | | BilledQuantity 42762 | 0..1 42764 | GDT:Quantity 42769 |
| | | | | | BilledValue 42768 | 0..1 42770 | GDT:Amount 42772 |
| | Business Transaction Document Reference 42774 | | | | SalesOrder Reference 42776 | 0..1 42778 | GDT:BusinessTransaction DocumentReference 42780 |
| | | | | | Delivery Reference 42782 | 0..1 42784 | GDT:BusinessTransaction DocumentReference 42786 |

FIG. 430A

| Package 43000 | L1 43002 | L2 43004 | L3 43006 | L4 43008 | L5 43010 | L6 43012 | Crd 43014 | GDT 43016 | Lgh 43020 |
|---|---|---|---|---|---|---|---|---|---|
| Product Activity Message 43026 | Product Activity Message 43028 | | | | | | | ProductActivity Message 43030 | |
| Message Header 43036 | | Message Header 43040 | | | | | 1 43042 | BusinessDocument MessageHeader 43044 | |
| | | | ID 43052 | | | | 1 43054 | BusinessDocument MessageID 43056 | 1..35 43058 |
| | | | Creation DateTime 43064 | | | | 1 43066 | DateTime 43068 | |
| | | | Sender Party 43072 | | | | 0..1 43074 | BusinessDocument MessageHeader Party 43076 | |
| | | | | InternalID 43084 | | | 0..1 43086 | PartyInternalID 43088 | |
| | | | | StandardID 43092 | | | 0..n 43094 | PartyStandardID 43096 | |

FIG. 430B

| ProductActivityMessage 43026 | | | | | | |
| --- | --- | --- | --- | --- | --- | --- |
| Message Header 43036 | | Recipient Party 43002A | | 0..1 43004A | BusinessDocumentMessa ge HeaderParty 43006A | |
| | | | InternalID 43014A | 0..1 43016A | PartyInternalID 43018A | |
| | | | StandardID 43022A | 0..n 43024A | PartyStandardID 43026A | |
| Product Activity 43038 | Product Activity 43032A | | | 1 43034A | ProductActivity 43036A | |
| | | Validity Period 43040A | | 0..1 43042A | DateTimePeriod 43044A | |
| | | | StartDateTime 43052A | 0..1 43054A | DateTime 43056A | |
| | | | EndDateTime 43062A | 0..1 43064A | DateTime 43066A | |
| | | SubContractingIndicator 43067A | | 0..1 43069A | GDT 43071A | |
| Party 43072A | | Buyer Party 43078A | | 0..1 43080A | BusinessTransaction DocumentParty 43082A | |
| | | | InternalID 43090A | 0..1 43092A | PartyInternalID 43094A | 1..10 43096 A |

FIG. 430C

| | | | | | |
|---|---|---|---|---|---|
| ProductActivityMessage | | 43026 | | | |
| ProductActivity | | 43038 | | | |
| Party 43072A | | StandardID 43000B | 0..n 43002B | PartyStandardID 43004B | 1.. 13 / 9 43006B |
| | | BuyerID 43012B | 0..1 43014B | PartyPartyID 43016B | 1..10 43018B |
| | | VendorID 43024B | 0..1 43026B | PartyPartyID 43028B | 1..10 43030B |
| | VendorParty 43036B | | 0..1 43038B | BusinessTransaction DocumentParty 43040B | |
| | | InternalID 43048B | 0..1 43050B | PartyInternalID 43052B | 1..10 43054B |
| | | StandardID 43058B | 0..n 43060B | PartyStandardID 43062B | 1.. 13 / 9 43064B |
| | | BuyerID 43070B | 0..1 43072B | PartyPartyID 43074B | 1..10 43076B |
| | | VendorID 43082B | 0..1 43084B | PartyPartyID 43086B | 1..10 43088B |
| | ProductRecipient Party 43089B | | | | |
| | | InternalID 43091B | 0..1 43093B | GDT\ 43095B | PartyInter nalID 43097B |

FIG. 430CA

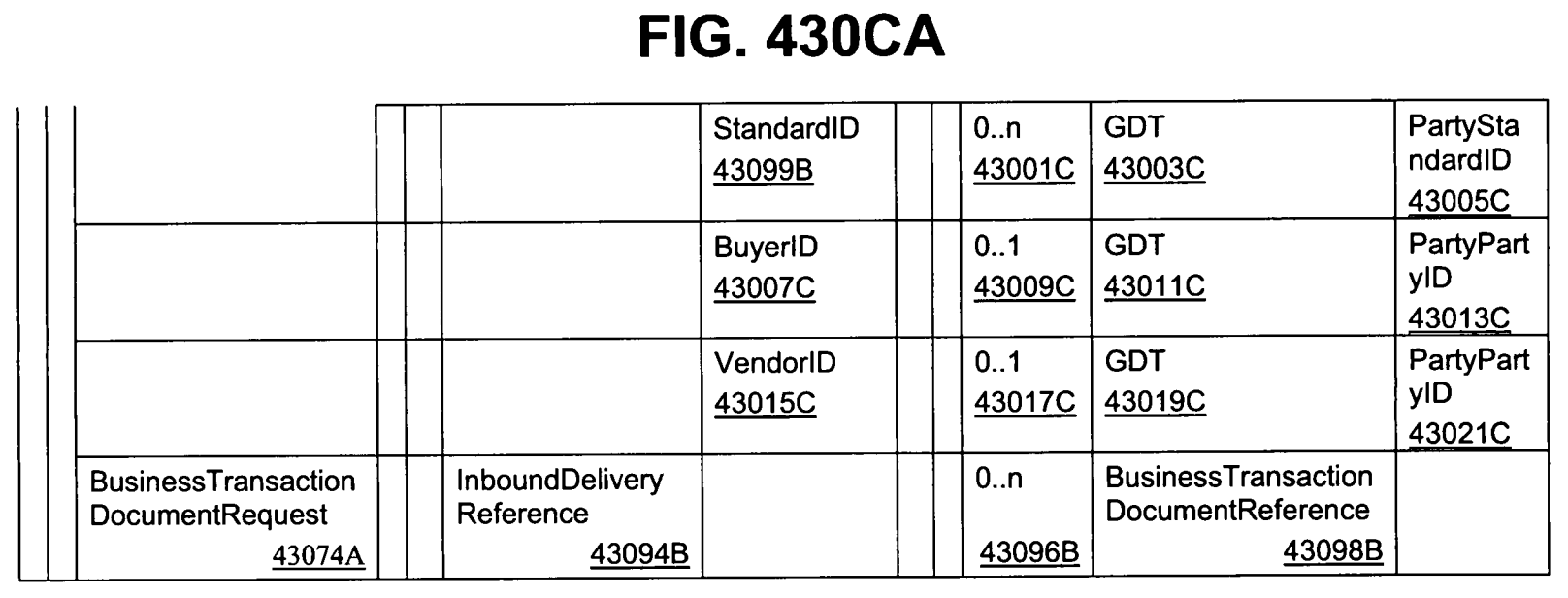

| | | | | | | | | | | | |
|---|---|---|---|---|---|---|---|---|---|---|---|
| | | | | | | StandardID 43099B | | | 0..n 43001C | GDT 43003C | PartyStandardID 43005C |
| | | | | | | BuyerID 43007C | | | 0..1 43009C | GDT 43011C | PartyPartyID 43013C |
| | | | | | | VendorID 43015C | | | 0..1 43017C | GDT 43019C | PartyPartyID 43021C |
| | | BusinessTransactionDocumentRequest 43074A | | | InboundDeliveryReference 43094B | | | | 0..n 43096B | BusinessTransactionDocumentReference 43098B | |

FIG. 430D

| ProductActivityMessage 43026 | | | | | | |
|---|---|---|---|---|---|---|
| ProductActivity 43038 | Note 43002C | | | 0..1 43004C | Note 43006C | 1..132 43008C |
| Item 43076A | Item 43012C | | | 1..n 43014C | ProductActivityItem 43016C | |
| Location 43022C | | ShipFrom Location 43028C | | 0..1 43030C | BusinessTransaction DocumentShipFrom Location 43032C | |
| | | | InternalID 43040C | 0..1 43042C | LocationInternalID 43044C | 1..20 43046C |
| | | | StandardID 43050C | 0..1 43052C | LocationStandardID 43054C | 1..13 43056C |
| | | | BuyerID 43062C | 0..1 43064C | LocationPartyID 43066C | 1..20 43068C |
| | | | VendorID 43074C | 0..1 43076C | LocationPartyID 43078C | 1..20 43080C |
| | | ShipTo Location 43086C | | 1 43088C | BusinessTransaction DocumentShipToLocation 43090C | |

FIG. 430E

| | | | | | | |
|---|---|---|---|---|---|---|
| ProductActivityMessage | | 43026 | | | | |
| ProductActivity | | 43038 | | | | |
| Item | | 43076A | | | | |
| Location 43022C | | InternalID 43098C | | 0..1 43000D | LocationInternalID 43002D | 1..20 43004D |
| | | StandardID 43008D | | 0..1 43010D | LocationStandardID 43012D | 1..13 43014D |
| | | BuyerID 43020D | | 0..1 43022D | LocationPartyID 43024D | 1..20 **26D |
| | | VendorID 43032D | | 0..1 43034D | LocationPartyID 43036D | 1..20 43038D |
| Product Information 43024C | Product 43044D | | | 1 46D | BusinessTransaction DocumentProduct 43048D | |
| | | InternalID 43056D | | 0..1 43058D | ProductInternalID 43060D | 1..40 43062D |
| | | StandardID 43066D | | 0..1 43068D | ProductStandardID 43070D | 14 43072D |
| | | BuyerID 43078D | | 0..1 43080D | ProductPartyID 43082D | 1..40 43084D |

FIG.430F

| | | | | | |
|---|---|---|---|---|---|
| ProductActivityMessage 43026 | | | | | |
| ProductActivity 43038 | | | | | |
| Item 43076A | | | | | |
| | | PackageQuantity 43002E | 0..1 43004E | Quantity 43006E | 19,6 43008E |
| | | Discontinuation Indicator 43012E | 0..1 43014E | ProductDiscontinuation Indicator 43016E | |
| Inventory 43026C | Inventory 43020E | | 0..1 43022D | ProductActivity ItemInventory 43024E | |
| | | VendorDependent Indicator 43023D | 0..1 43025D | GDT 43027D | |
| | | StatusDateTime 43030E | 0..1 43032E | DateTime 43034E | |
| | | UnrestrictedUse Quantity 43040E | 0..1 43042E | Quantity 43044E | 19,6 43046E |
| | | QualityInspection Quantity 43052E | 0..1 43054E | Quantity 43056E | 19,6 43058E |
| | | BlockedQuantity 43062E | 0..1 43064E | Quantity 43066E | 19,6 43068E |

FIG. 430G

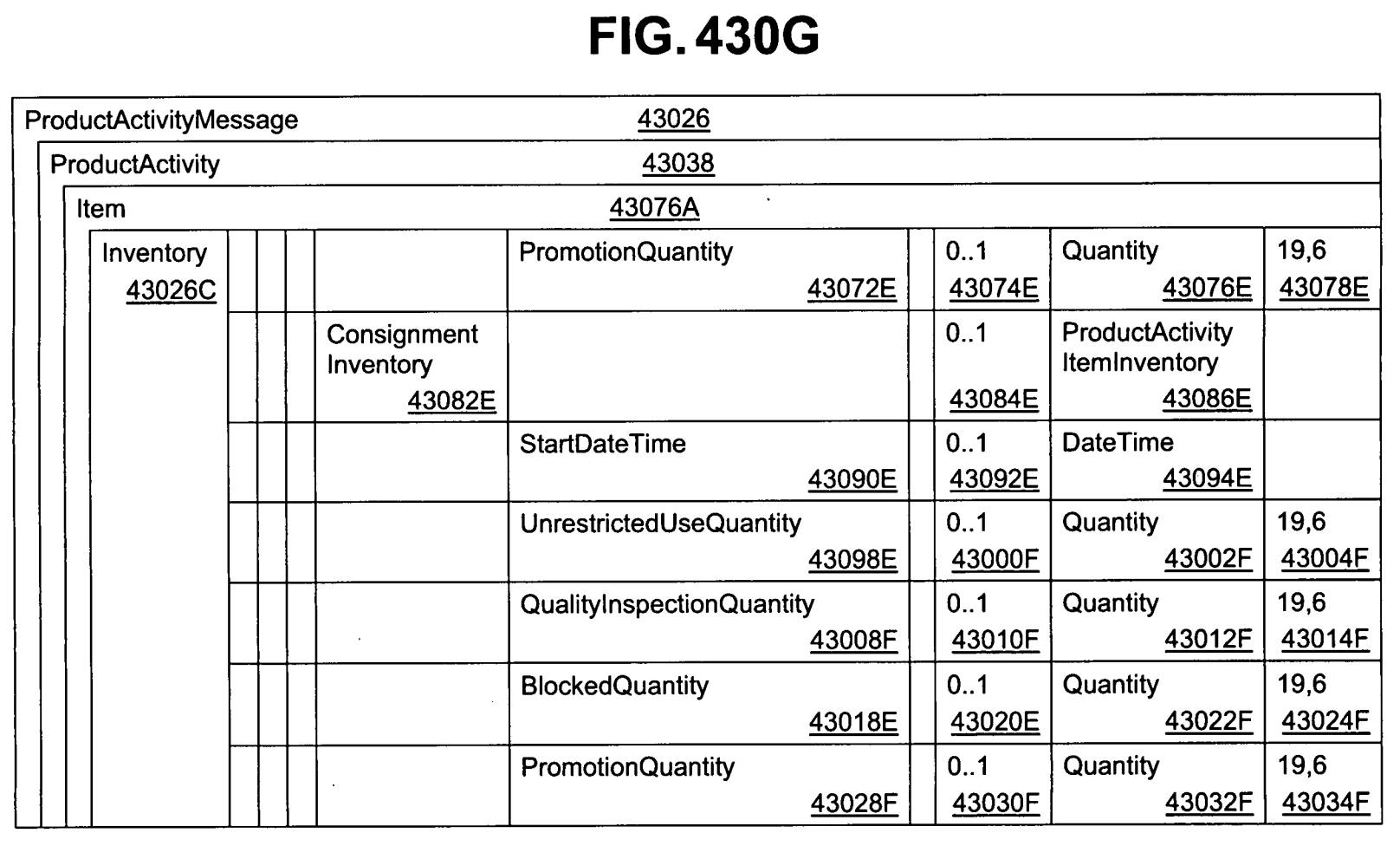

| | | | | |
|---|---|---|---|---|
| ProductActivityMessage 43026 | | | | |
| ProductActivity 43038 | | | | |
| Item 43076A | | | | |
| Inventory 43026C | | | | |
| | PromotionQuantity 43072E | 0..1 43074E | Quantity 43076E | 19,6 43078E |
| Consignment Inventory 43082E | | 0..1 43084E | ProductActivity ItemInventory 43086E | |
| | StartDateTime 43090E | 0..1 43092E | DateTime 43094E | |
| | UnrestrictedUseQuantity 43098E | 0..1 43000F | Quantity 43002F | 19,6 43004F |
| | QualityInspectionQuantity 43008F | 0..1 43010F | Quantity 43012F | 19,6 43014F |
| | BlockedQuantity 43018E | 0..1 43020E | Quantity 43022F | 19,6 43024F |
| | PromotionQuantity 43028F | 0..1 43030F | Quantity 43032F | 19,6 43034F |

FIG. 430H

ProductActivityMessage 43026

ProductActivity 43038

| | | | | |
|---|---|---|---|---|
| Item 43076A | SalesTimeSeries 43038F | | | 0..1 43040F | QuantityTimeSeries 43042F |
| | | Item 43048F | | 0..n 43050F | |
| | | | ValidityPeriod 43056F | 1 43058F | DateTime Period 43060F |
| | | | Quantity 43066F | 1 43068F | Quantity 43070F |
| | PromotionSalesTimeSeries 43076F | | | 0..1 43078F | QuantityTime Series 43080F |
| | | Item 43086F | | 0..n 43088F | |
| | | | ValidityPeriod 43092F | 1 43094F | DateTime Period 43096F |
| | | | Quantity 43000G | 1 43002G | Quantity 43004G |
| | SalesForecastTimeSeries 43008G | | | 0..1 43010G | QuantityTime Series 43012G |

FIG. 430I

| | | | | | |
|---|---|---|---|---|---|
| ProductActivityMessage 43026 | | | | | |
| ProductActivity 43038 | | | | | |
| Item 43076A | | Item 43018G | | 0..n 43020G | |
| | | | ValidityPeriod 43024G | 1 43026G | DateTimePeriod 43028G |
| | | | Quantity 43032G | 1 43034G | Quantity 43036G |
| | PromotionSales ForecastTimeSeries 43040G | | | 0..1 43042G | QuantityTimeSeries 43044G |
| | | Item 43050G | | 0..n 43052G | |
| | | | Validity Period 43056G | 1 43058G | DateTimePeriod 43060G |
| | | | Quantity 43064G | 1 43066G | Quantity 43068G |
| | OrderForecastTime Series 43072G | | | 0..1 43074G | QuantityTimeSeries 43076G |

FIG.430J

ProductActivityMessage 43026

ProductActivity 43038

| | | | | | |
|---|---|---|---|---|---|
| Item 43076A | | Item 43082G | | 0..n 43084G | |
| | | | ValidityPeriod 43090G | 1 43092G | DateTimePeriod 43094G |
| | | | Quantity 43000H | 1 43002H | Quantity 43004H |
| | PromotionOrder ForecastTimeSeries 43010H | | | 0..1 43012H | QuantityTime Series 43014H |
| | | Item 43020H | | 0..n 43022H | |
| | | | ValidityPeriod 43026H | 1 43028H | DateTimePeriod 43030H |
| | | | Quantity 43034H | 1 43036H | Quantity 43038H |
| | Consumption TimeSeries 43042H | | | 0..1 43044H | QuantityTimeSeries 43046H |
| | | Item 43052H | | 0..n 43054H | |

FIG. 430K

ProductActivityMessage 43026

ProductActivity 43038

| | | | | | |
|---|---|---|---|---|---|
| Item 43076A | | | ValidityPeriod 43058H | 1 43060H | DateTimePeriod 43062H |
| | | | Quantity 43066H | 1 43068H | Quantity 43070H |
| | ConsumptionForecastTime Series 43074H | | | 0..1 43076H | QuantityTimeSeries 43078H |
| | | Item 43084H | | 0..n 43086H | |
| | | | ValidityPeriod 43090H | 1 43092H | DateTimePeriod 43094H |
| | | | Quantity 43098H | 1 43000I | Quantity 43002I |
| | OnOrderTime Series 43006I | | | 0..1 43008I | QuantityTimeSeries 43010I |
| | | Item 43016I | | 0..n 43018I | |
| | | | ValidityPeriod 43022I | 1 43024I | DateTimePeriod 43026I |

FIG. 430L

ProductActivityMessage 43026

ProductActivity 43038

| | | | | | |
|---|---|---|---|---|---|
| Item 43076A | | | Quantity 43030I | 1 43032I | Quantity 43034I |
| | OutofStockTimeSeries 43038I | | | 0..1 43040I | QuantityTimeSeries 43042I |
| | | Item 43048I | | 0..n 43050I | |
| | | | ValidityPeriod 43056I | 1 43058I | DateTimePeriod 43060I |
| | | | Quantity 43066I | 1 43068I | Quantity 43070I |

Fig. 433A

| Package 43300 | L 1 43302 | L2 43304 | L3 43306 | L4 43308 | L5 43310 | Occ 43314 | Type 43316 | Name 43318 |
|---|---|---|---|---|---|---|---|---|
| Payment Due Message 43320 | Payment Due Message 43322 | | | | | | MDT 43324 | PaymentDue Message 43326 |
| Payment Due 43328 | | Payment Due 43330 | | | | 1 43332 | AGDT 43334 | PaymentDue 43336 |
| | | | BaseBusiness TransactionDocumentID 43338 | | | 1 43340 | BGDT 43342 | BusinessTransaction DocumentID 43344 |
| | | | BaseBusiness TransactionDocument TypeCode 43346 | | | 1 43348 | BGDT 43350 | BusinessTransaction DocumentTypeCode 43352 |
| | | | BaseBusiness TransactionDocument Date 43354 | | | 1 43356 | BGDT 43358 | Date 43360 |

Fig. 433B

| | | | | | | | | |
|---|---|---|---|---|---|---|---|---|
| Payment Due Message 43320 | | | | | | | | |
| Payment Due 43328 | | | | | | | | |
| Party 43362 | | | PayerParty 43368 | | | 1 43370 | AGDT 43372 | BusinessTransactionDocumentParty 43374 |
| | | | | InternalID 43376 | | 1 43378 | BGDT 43380 | PartyID 43382 |
| | | | PayeeParty 43384 | | | 1 43386 | AGDT 43388 | BusinessTransactionDocumentParty 43390 |
| | | | | InternalID 43392 | | 1 43394 | BGDT 43396 | PartyID 43398 |
| | | | DebtorParty 43300A | | | 0..1 43302A | AGDT 43304A | BusinessTransactionDocumentParty 43306A |
| | | | | InternalID 43308A | | 1 43310A | BGDT 43312A | PartyID 43314A |
| | | | CreditorParty 43316A | | | 0..1 43318A | AGDT 43320A | BusinessTransactionDocumentParty 43322A |
| | | | | InternalID 43324A | | 1 43326A | BGDT 43328A | PartyID 43330A |
| Business Transaction Document Reference 43364 | | | OriginInvoice Reference 43332A | | | 0..1 43334A | AGDT 43336A | BusinessTransactionDocument Reference 43338A |
| | | | | ID 43340A | | 1 43342A | BGDT 43344A | BusinessTransactionDocumentID 43346A |

Fig. 433C

| | | | | | | | | | |
|---|---|---|---|---|---|---|---|---|---|
| Payment Due Message 43320 | | | | | | | | | |
| | Payment Due 43328 | | | | | | | | |
| | | Business Transaction Document Reference 43364 | | OriginVendor InvoiceReference 43348A | | | 0..1 43350A | AGDT 43352A | BusinessTransaction DocumentReference 43354A |
| | | | | | ID 43356A | | 1 43358A | BGDT 43360A | BusinessTransaction DocumentID 43362A |
| | | | | InvoiceReference 43364A | | | 0..1 43366A | AGDT 43368A | BusinessTransaction DocumentReference 43370A |
| | | | | | ID 43372A | | 1 43374A | BGDT 43376A | BusinessTransaction DocumentID 43378A |
| | | Item 43366 | | Item 43380A | | | 1..n 43382A | AGDT 43384A | PaymentDueItem 43386A |
| | | | | | Amount 43388A | | 1 43390A | BGDT 43392A | Amount 43394A |
| | | | | | PaymentCurrency 43396A | | 0..1 43398A | BGDT 43300B | CurrencyCode 43302B |

Fig. 433D

| | | | | | | | | | | |
|---|---|---|---|---|---|---|---|---|---|---|
| Payment Due Message 43320 | | | | | | | | | | |
| Payment Due 43328 | | | | | | | | | | |
| Item 43366 | | | | | FixedExchangeRate 43304B | | 0..1 43306B | AGDT 43308B | ExchangeRate 43310B |
| | | | | | GroupID 43312B | | 0..1 43314B | BGDT 43316B | BusinessTransaction DocumentItemGroupID 43318B |
| Payment Information 43320B | | | | | CashDiscountTerms 43324B | | 1 43326B | AGDT 43328B | CashDiscountTerms 43330B |
| | | | | | PaymentFormCode 43332B | | 0..1 43334B | AGDT 43336B | PaymentFormCode 43338B |
| Party 43322B | | | | | PayerParty 43340B | | 0..1 43342B | AGDT 43344B | BusinessTransaction DocumentParty 43346B |
| | | | | | | InternalID 43348B | 1 43350B | BGDT 43352B | PartyID 43354B |
| | | | | | PayeeParty 43356B | | 0..1 43358B | AGDT 43360B | BusinessTransaction DocumentParty 43362B |

Fig. 436A

| Package 43600 | L1 43602 | L2 43604 | L3 43606 | L4 43608 | L5 43610 | Card. 43612 | Data Type 43614 | Lgh. 43618 |
|---|---|---|---|---|---|---|---|---|
| OrderID Assignment Message 43622 | OrderID Assignment Message 43624 | | | | | | OrderIDAssignment Message 43626 | |
| Message Header 43630 | | Message Header 43634 | | | | 1 43636 | BusinessDocument MessageHeader 43638 | |
| | | | ID 43644 | | | 1 43646 | BusinessDocument MessageID 43648 | 1..35 43650 |
| | | | ReferenceID 43654 | | | 0..1 43656 | BusinessDocument MessageID 43658 | 1..35 43660 |
| | | | CreationDate Time 43664 | | | 1 43666 | DateTime 43668 | |
| | | | Sender Party 43672 | | | 0..1 43674 | BusinessDocument MessageHeader Party 43676 | |

Fig. 436B

| OrderIDAssignmentMessage 43622 | | | | | | | | |
|---|---|---|---|---|---|---|---|---|
| Message Header 43630 | | | | InternalID 43682 | | 0..1 43684 | PartyInternalID 43686 | |
| | | | | StandardID 43690 | | 0..n 43692 | PartyStandardID 43694 | |
| | | | Recipient Party 43698 | | | 0..1 43600A | BusinessDocument MesageHeaderParty 43602A | |
| | | | | InternalID 43608A | | 0..1 43610A | PartyInternalID 43612A | |
| | | | | StandardID 43616A | | 0..n 43618A | PartyStandardID 43620A | |
| OrderID Assignment 43632 | | OrderIDAssignment 43624A | | | | 1 43626A | OrderIDAssignment 43628A | |
| | | | ID 43632A | | | 0..1 43634A | BusinessTransaction DocumentID 43636A | 1..35 43638A |
| | | | CreationDate Time 43642A | | | 1 43644A | DateTime 43646A | |

Fig. 436C

| | | | | | | |
|---|---|---|---|---|---|---|
| OrderIDAssignmentMessage 43622 | | | | | | |
| OrderIDAssignment 43632 | | | | | | |
| Party 43650A | BuyerParty 43654A | | 1 43656A | BusinessTransactionDocumentParty 43658A | |
| | | InternalID 43664A | 0..1 43666A | PartyInternalID 43668A | 1..20 43670A |
| | | StandardID 43674A | 0..n 43676A | PartyStandardID 43678A | 1..13 / 9 43680A |
| | | BuyerID 43684A | 0..1 43686A | PartyPartyID 43688A | 1..20 43690A |
| | | VendorID 43694A | 0..1 43696A | PartyPartyID 43698A | 1..20 43600B |
| | VendorParty 43604B | | 1 43606B | BusinessTransactionDocumentParty 43608B | |
| | | InternalID 43614B | 0..1 43616B | PartyInternalID 43618B | 1..20 43620B |
| | | StandardID 43624B | 0..n 43626B | PartyStandard ID 43628B | 1..13 / 9 43630B |
| | | BuyerID 43634B | 0..1 43636B | PartyPartyID 43638B | 1..20 43640B |
| | | VendorID 43644B | 0..1 43646B | PartyPartyID 43648B | 1..20 43650B |

Fig. 436D

| | | | | | | | | | |
|---|---|---|---|---|---|---|---|---|---|
| OrderIDAssignmentMessage 43622 | | | | | | | | | |
| OrderIDAssignment 43632 | | | | | | | | | |
| Item 43652A | | | Item 43654B | | | 1..n 43656B | OrderID AssignmentItem 43658B | |
| Location 43662B | | | | ShipTo Location 43666B | | 0..1 43668B | BusinessTransaction DocumentShipToLocation 43670B | |
| | | | | | InternalID 43676B | 0..1 43678B | LocationInternalID 43680B | 1..20 43682B |
| | | | | | StandardID 43686B | 0..n 43688B | LocationStandardID 43690B | 1..13 43692B |
| | | | | | BuyerID 43696B | 0..1 43698B | LocationPartyID 43600C | 1..20 43602C |
| | | | | | VendorID 43606C | 0..1 43608C | LocationPartyID 43610C | 1..20 43612C |
| Promotion 43664B | | | | Promotion 43616C | | 0..1 43618C | Promotion 43620C | 1..35 43622C |
| | | | | | InternalID 43626C | 0..1 43628C | PromotionInternalID 43630C | 1..20 43632C |
| | | | | | BuyerID 43636C | 0..1 43638C | PromotionPartyID 43640C | 1..20 43642C |
| | | | | | VendorID 43646C | 0..1 43648C | PromotionPartyID 43650C | 1..20 43652C |

Fig. 436E

| | | | | | | | | | | |
|---|---|---|---|---|---|---|---|---|---|---|
| OrderIDAssignmentMessage 43622 | | | | | | | | | | |
| | OrderIDAssignment 43632 | | | | | | | | | |
| | | Item 43652A | | | | BuyerPurchasingGroupID 43656C | | 0..1 43658C | PurchasingGroupID 43660C | 1..20 43662C |
| | | | | | | PurchaseOrderIDRange 43666C | | 1 43668C | PurchaseOrderIDRange 43670C | |
| | | | | | | | FromID 43674C | 1 43676C | BusinessTransactionDocumentID 43678C | 1..35 43680C |
| | | | | | | | ToID 43684C | 1 43686C | BusinessTransactionDocumentID 43688C | 1..35 43690C |

Fig. 439A

| Package 43900 | L1 43902 | L2 43904 | L3 43906 | L4 43908 | L5 43910 | L6 43912 | L7 43914 | Card 43916 | Type 43918 | GDT 43920 | Lgh 43924 |
|---|---|---|---|---|---|---|---|---|---|---|---|
| Product Demand Influencing Event Message 43928 | Product Demand Influencing Event Message 43930 | | | | | | | 1 43932 | | Product Demand Influencing Event Message 43934 | |
| Message Header 43938 | | Message Header 43942 | | | | | | 0..1 43944 | GDT 43946 | Business Document Message Header 43948 | |

Fig. 439B

ProductDemandInfluencingEventMessage 43928

| | | | | | | |
|---|---|---|---|---|---|---|
| Message Header 43938 | ID 43954 | | 1 43956 | GDT 43958 | BusinessDocument MessageID 43960 | 1..35 43962 |
| | CreationDateTime 43966 | | 1 43968 | GDT 43970 | DateTime 43972 | |
| | SenderParty 43974 | | 0..1 43976 | GDT 43978 | BusinessDocument MessageHeaderParty 43980 | |
| | | InternalID 43986 | 0..1 43988 | GDT 43990 | PartyInternalID 43992 | |
| | | StandardID 43994 | 0..n 43996 | GDT 43998 | PartyStandardID 43900A | |
| | RecipientParty 43904A | | 0..1 43906A | GDT 43908A | BusinessDocument MessageHeaderParty 43910A | |
| | | InternalID 43916A | 0..1 43918A | GDT 43920A | PartyInternalID 43922A | |
| | | StandardID 43924A | 0..n 43926A | GDT 43928A | PartyStandardID 43930A | |

Fig. 439C

ProductDemandInfluencingEventMessage 43928

| | | | | | | |
|---|---|---|---|---|---|---|
| Product Demand Influencing Event 43940 | ProductDemand InfluencingEvent 43934A | | 1 43936A | AGDT 43938A | ProductDemand InfluencingEvent 43940A | |
| | | InternalID 43944A | 0..1 43946A | GDT 43948A | BusinessTransaction DocumentID 43950A | 1..35 43952A |
| | | BuyerID 43954A | 0..1 43956A | GDT 43958A | BusinessTransaction DocumentID 43960A | 1..35 43962A |
| | | VendorID 43966A | 0..1 43968A | GDT 43970A | BusinessTransaction DocumentID 43972A | 1..35 43974A |
| | | Name 43978A | 0..1 43980A | GDT 43982A | Name 43984A | 1..40 43986A |
| | | TypeCode 43990A | 1 43992A | GDT 43994A | ProductDemand InfluencingEvent TypeCode 43996A | 1..35 43998A |
| | | StatusCode 43902B | 0..1 43904B | GDT 43906B | ProductDemand InfluncingEvent StatusCode 43908B | 1..35 43910B |

Fig. 439D

ProductDemandInfluencingEventMessage 43928

| | | | | | | |
|---|---|---|---|---|---|---|
| Product Demand Influenc-ingEvent 43940 | Recurrence 43914B | | 0..1 43916B | GDT 43918B | Recurrence 43920B | 1..3 43922B |
| | | Duration 43924B | 1 43926B | | | |
| | | Value 43928B | 1 43930B | | | 3 43932B |
| | PlanningPeriod 43934B | | 0..1 43936B | GDT 43938B | DateTimePeriod 43940B | |
| | | StartDateTime 43942B | 0..1 43944B | | | |
| | | EndDateTime 43948B | 0..1 43950B | | | |
| | ExecutingPeriod 43952B | | 0..1 43954B | GDT 43956B | DateTimePeriod 43958B | |
| | | StartDateTime 43962B | 0..1 43964B | | | |
| | | EndDateTime 43968B | 0..1 43970B | | | |
| | Advertisement Period 43974B | | 0..1 43976B | GDT 43978B | DateTimePeriod 43980B | |

Fig. 439E

| ProductDemandInfluencingEventMessage 43928 | | | | | | |
|---|---|---|---|---|---|---|
| ProductDemand Influencing Event 43940 | | StartDateTime 43982B | 0..1 43984B | | | |
| | | EndDateTime 43986B | 0..1 43988B | | | |
| | Note 43990B | | 0..1 43992B | GDT 43994B | Note 43996B | 1..132 43998B |
| Party 43902C | BuyerParty 43908C | | 0..1 43910C | CDT 43912C | BusinessTransaction DocumentParty 43914C | |
| | | InternalID 43920C | 0..1 43922C | CDT 43924C | PartyInternalID 43926C | 1..10 43928C |
| | | StandardID 43930C | 0..n 43932C | CDT 43934C | PartyStandardID 43936C | 1..13 43938C |
| | | BuyerID 43942C | 0..1 43944C | CDT 43946C | PartyPartyID 43948C | 1..10 43950C |
| | | VendorID 43954C | 0..1 43956C | CDT 43958C | PartyPartyID 43960C | 1..10 43962C |

Fig. 439F

| | | | | | | |
|---|---|---|---|---|---|---|
| ProductDemandInfluencingEventMessage 43928 | | | | | | |
| ProductDemandInfluencingEvent 43940 | | | | | | |
| Party 43902C | VendorParty 43966C | | 0..1 43968C | CDT 43970C | BusinessTransaction DocumentParty 43972C | |
| | | InternalID 43978C | 0..1 43980C | CDT 43982C | PartyInternalID 43984C | 1..10 43986C |
| | | StandardID 43988C | 0..n 43990C | CDT 43992C | PartyStandard ID 43994C | 1..13 43996C |
| | | BuyerID 43900D | 0..1 43902D | CDT 43904D | PartyPartyID 43906D | 1..10 43908D |
| | | VendorID 43912D | 0..1 43914D | CDT 43916D | PartyPartyID 43918D | 1..10 43920D |
| Scheduling 43904C | Scheduling 43924D | | 0..1 43926D | AGDT 43928D | | |
| | | OrderingPeriod 43930D | 0..1 43932D | GDT 43934D | DateTimePeriod 43936D | |
| | | DistributionCenter ReceiptPeriod 43938D | 0..1 43940D | GDT 43942D | DateTimePeriod 43944D | |

Fig. 439G

ProductDemandInfluencingEventMessage 43928

ProductDemandInfluencingEvent 43940

| | | | | | | | |
|---|---|---|---|---|---|---|---|
| Scheduling 43904C | | Distribution CenterIssue Period 43946D | | 0..1 43948D | GDT 43950D | DateTimePeriod 43952D | |
| | | StoreReceipt Period 43954D | | 0..1 43956D | GDT 43958D | DateTimePeriod 43960D | |
| | | PlantIssue Period 43947D | | 0..1 43949D | GDT 43951D | DateTimePeriod 43953D | |
| | | PickupPeriod 43962D | | 0..1 43964D | GDT 43966D | DateTimePeriod 43968D | |
| Item 43906C | Item 43970D | | | 1..n 43972D | AGDT 43974D | ProductDemand InfluencingEventItem 43976D | |
| Location 43980D | | ShipFrom Location 43984D | | 0..1 43986D | CDT 43988D | BusinessTransaction DocumentShipFrom Location 43990D | |
| | | | InternalID 43996D | 0..1 43998D | CDT 43900E | LocationInternalID 43902E | 1..20 43904E |

Fig. 439H

| | | | | | | |
|---|---|---|---|---|---|---|
| ProductDemandInfluencingEventMessage 43928 | | | | | | |
| ProductDemandInfluencingEvent 43940 | | | | | | |
| Item 43906C | | | | | | |
| Location 43980D | | StandardID 43906E | 0..n 43908E | CDT 43910E | LocationStandardID 43912E | 1..13 43914E |
| | | BuyerID 43918E | 0..1 43920E | CDT 43922E | LocationPartyID 43924E | 1..20 43926E |
| | | VendorID 43930E | 0..1 43932E | CDT 43934E | LocationPartyID 43936E | 1..20 43938E |
| | ShipTo Location 43942E | | 1 43944E | CDT 43946E | BusinessTransaction DocumentShipTo Location 43948E | |
| | | InternalID 43954E | 0..1 43956E | CDT 43958E | LocationInternalID 43960E | 1..20 43962E |
| | | StandardID 43964E | 0..n 43966E | CDT 43968E | LocationStandardID 43970E | 1..13 43972E |
| | | BuyerID 43976E | 0..1 43978E | CDT 43980E | LocationPartyID 43982E | 1..20 43984E |
| | | VendorID 43988E | 0..1 43990E | CDT 43992E | LocationPartyID 43994E | 1..20 43996E |

Fig. 439I

| | | | | | |
|---|---|---|---|---|---|
| ProductDemandInfluencingEventMessage 43928 | | | | | |
| ProductDemandInfluencingEvent 43940 | | | | | |
| Item 43906C | | | | | |
| Product Information 43982D | Product 43900F | | 1 43902F | CDT 43904F | BusinessTransaction DocumentProduct 43906F | |
| | | InternalID 43912F | 0..1 43914F | CDT 43916F | ProductInternalID 43918F | 1..40 43920F |
| | | StandardID 43922F | 0..1 43924F | CDT 43926F | ProductStandardID 43928F | 1..14 43930F |
| | | BuyerID 43934F | 0..1 43936F | CDT 43938F | ProductPartyID 43940F | 1..40 43942F |
| | | VendorID 43946F | 0..1 43948F | CDT 43950F | ProductPartyID 43952F | 1..40 43954F |
| | | Package Quantity 43958F | 0..1 43960F | GDT 43962F | Quantity 43964F | 13,6 43966F |

Fig. 439J

ProductDemandInfluencingEventMessage 43928

ProductDemandInfluencingEvent 43940

| | | | | | | | | |
|---|---|---|---|---|---|---|---|---|
| Item 43906C | SalesForecast TimeSeries 43968F | | | | 0..1 43970F | CDT 43972F | Quantity TimeSeries 43974F | |
| | | Item 43980F | | | 0..n 43982F | | | |
| | | | Validity Period 43984F | | 1 43986F | GDT 43988F | DateTime Period 43990F | |
| | | | | StartDate Time 43994F | 0..1 43996F | | | |
| | | | | EndDate Time 43900G | 0..1 43902G | | | |
| | | | Quantity 43906G | | 1 43908G | GDT 43910G | Quantity 43912G | |
| | OrderForecast TimeSeries 43916G | | | | 0..1 43918G | CDT 43920G | Quantity TimeSeries 43922G | |

Fig. 439K

ProductDemandInfluencingEventMessage 43928

ProductDemandInfluencingEvent 43940

Item 43906C

| | | | | | | | |
|---|---|---|---|---|---|---|---|
| Product Information 43982D | | Item 43928G | | | 0..n 43930G | | |
| | | | Validity Period 43932G | | 1 43934G | GDT 43936G | DateTime Period 43938G |
| | | | | StartDate Time 43942G | 0..1 43944G | | |
| | | | | EndDate Time 43948G | 0..1 43950G | | |
| | | | Quantity 43954G | | 1 43956G | GDT 43958G | Quantity 43960G |
| | PlannedSales PriceTimeSeries 43964G | | | | 0..1 43966G | CDT 43968G | PriceTime Series 43970G |
| | | Item 43976G | | | 0..n 43978G | | |

Fig. 439L

ProductDemandInfluencingEventMessage 43928

ProductDemandInfluencingEvent 43940

Item 43906C

| | | | | | |
|---|---|---|---|---|---|
| Product Information 43982D | ValidityPeriod 43980G | | 1 43982G | GDT 43984G | DateTimePeriod 43986G |
| | | StartDateTime 43990G | 0..1 43992G | | |
| | | EndDateTime 43996G | 0..1 43998G | | |
| | Price 43902H | | 1 43904H | GDT 43906H | Price 43908H |

Fig. 442A

| Pack-age 44200 | L1 44202 | L2 44204 | L3 44206 | L4 44208 | L5 44210 | L6 44212 | L7 44214 | C 44216 | Type 44218 | GDT 44220 | Lgh 44224 |
|---|---|---|---|---|---|---|---|---|---|---|---|
| Product Forecast Notification Message 44228 | Product Forecast Notification Message 44230 | | | | | | | 1 44232 | | Product Forecast Notification Message 44234 | |
| Message Header 44238 | | Message Header 44242 | | | | | | 0..1 44244 | GDT 44246 | Business Document Message Header 44248 | |
| | | | ID 44254 | | | | | 1 44256 | GDT 44258 | Business Document MessageID 44260 | 1..35 44262 |

Fig. 442B

| ProductForecastNotificationMessage 44228 | | | | | | |
|---|---|---|---|---|---|---|
| Message Header 44238 | | CreationDateTime 44266 | | 1 44268 | GDT 44270 | DateTime 44272 |
| | | SenderParty 44274 | | 0..1 44276 | GDT 44278 | BusinessDocument MessageHeaderParty 44280 |
| | | | InternalID 44286 | 0..1 44288 | GDT 44290 | PartyInternalID 44292 |
| | | | StandardID 44294 | 0..n 44296 | GDT 44298 | PartyStandardID 44200A |
| | | RecipientParty 44204A | | 0..1 44206A | GDT 44208A | BusinessDocument MessageHeaderParty 44210A |
| | | | InternalID 44216A | 0..1 44218A | GDT 44220A | PartyInternalID 44222A |
| | | | StandardID 44224A | 0..n 44226A | GDT 44228A | PartyStandardID 44230A |
| Product Forecast 44240 | Product Forecast 44234A | | | 1 44236A | AGDT 44238A | ProductForecast 44240A |

Fig. 442C

| ProductForecastNotificationMessage 44228 | | | | | | |
|---|---|---|---|---|---|---|
| Product Forecast 44240 | ValidityPeriod 44242A | | 0..1 44244A | GDT 44246A | DateTimePeriod 44248A | |
| | | StartDateTime 44252A | 0..1 44254A | | | |
| | | EndDateTime 44258A | 0..1 44260A | | | |
| Party 44264A | BuyerParty 44268A | | 0..1 44270A | CDT 44272A | BusinessTransaction DocumentParty 44274A | |
| | | InternalID 44280A | 0..1 44282A | CDT 44284A | PartyInternalID 44286A | 1..10 44288A |
| | | StandardID 44290A | 0..n 44292A | CDT 44294A | PartyStandardID 44296A | 1..13 44298A |
| | | BuyerID 44202B | 0..1 44204B | CDT 44206B | PartyPartyID 44208B | 1..10 44210B |
| | | VendorID 44214B | 0..1 44216B | CDT 44218B | PartyPartyID 44220B | 1..10 44222B |

Fig. 442D

ProductForecastNotificationMessage 44228

Product Forecast 44240

| | | | | | | |
|---|---|---|---|---|---|---|
| Party 44264A | Vendor Party 44226B | | 0..1 44228B | CDT 44230B | BusinessTransactionDocument Party 44232B | |
| | | InternalID 44238B | 0..1 44240B | CDT 44242B | PartyInternalID 44244B | 1..10 44246B |
| | | StandardID 44248B | 0..n 44250B | CDT 44252B | PartyStandardID 44254B | 1..13 44256B |
| | | BuyerID 44260B | 0..1 44262B | CDT 44264B | PartyPartyID 44266B | 1..10 44268B |
| | | VendorID 44272B | 0..1 44274B | CDT 44276B | PartyPartyID 44278B | 1..10 44280B |
| | Note 44284B | | 0..1 44286B | GDT 44288B | Note 44290B | 1..132 44292B |
| Item 44266A | Item 44294B | | 1..n 44296B | AGDT 44298B | ProductForecastItem 44200C | |
| Location 44204C | | ShipFrom Location 44208C | 0..1 442010C | CDT 44212C | BusinessTransactionDocument ShipFromLocation 44214C | |

Fig. 442E

ProductForecastNotificationMessage 44228

Product Forecast 44240

Item 44266A

| | | | | | | | | | | | |
|---|---|---|---|---|---|---|---|---|---|---|---|
| Location 44204C | | | | | InternalID 44220C | | | 0..1 44222C | CDT 44224C | LocationInternalID 44226C | 1..20 44228C |
| | | | | | StandardID 44230C | | | 0..n 44232C | CDT 44234C | LocationStandardID 44236C | 1..13 44238C |
| | | | | | BuyerID 44242C | | | 0..1 44244C | CDT 44246C | LocationPartyID 44248C | 1..20 44250C |
| | | | | | VendorID 44254C | | | 0..1 44256C | CDT 44258C | LocationPartyID 44260C | 1..20 44262C |
| | | | | ShipTo Location 44266C | | | | 1 44268C | CDT 44270C | BusinessTransaction DocumentShipToLocation 44272C | |
| | | | | | InternalID 44278C | | | 0..1 44280C | CDT 44282C | LocationInternalID 44284C | 1..20 44286C |
| | | | | | StandardID 44288C | | | 0..n 44290C | CDT 44292C | LocationStandardID 44294C | 1..13 44296C |
| | | | | | BuyerID 44200D | | | 0..1 44202D | CDT 44204D | LocationPartyID 44206D | 1..20 44208D |
| | | | | | VendorID 44212D | | | 0..1 44214D | CDT 44216D | LocationPartyID 44218D | 1..20 44220D |

Fig. 442F

| | | | | | | | | | | | | |
|---|---|---|---|---|---|---|---|---|---|---|---|---|
| ProductForecastNotificationMessage 44228 | | | | | | | | | | | | |
| Product Forecast 44240 | | | | | | | | | | | | |
| Item 44266A | | | | | | | | | | | | |
| Product Information 44206C | | | | Product 44224D | | | | 1 44226D | CDT 44228D | BusinessTransaction DocumentProduct 44230D | |
| | | | | | InternalID 44236D | | | 0..1 44238D | CDT 44240D | ProductInternalID 44242D | 1..40 44244D |
| | | | | | StandardID 44246D | | | 0..1 44248D | CDT 44250D | ProductStandardID 44252D | 1..14 44254D |
| | | | | | BuyerID 44258D | | | 0..1 44260D | CDT 44262D | ProductPartyID 44264D | 1..40 44266D |
| | | | | | VendorID 44270D | | | 0..1 44272D | CDT 44274D | ProductPartyID 44276D | 1..40 44278D |
| | | | | | Package Quantity 44282D | | | 0..1 44284D | GDT 44286D | Quantity 44288D | 19,6 44290D |
| | | | | SalesForecast TimeSeries 44292D | | | | 0..1 44294D | CDT 44296D | QuantityTimeSeries 44298D | |

Fig. 442G

| ProductForecastNotificationMessage 44228 | | | | | | | | | | | |
|---|---|---|---|---|---|---|---|---|---|---|---|
| Product Forecast 44240 | | | | | | | | | | | |
| Item 44266A | | | | | Item 44200E | | | 0..n 44202E | | | |
| | | | | | | ValidityPeriod 44206E | | 1 44208E | GDT 44210E | DateTime Period 44212E | |
| | | | | | | | StartDate Time 44216E | 0..1 44218E | | | |
| | | | | | | | EndDate Time 44222E | 0..1 44224E | | | |
| | | | | | | Quantity 44228E | | 1 44230E | GDT 44232E | Quantity 44234E | |
| | | | | | | FixedIndicator 44238E | | 0..1 44240E | GDT 44242E | Fixed Indicator 44244E | |
| | | | | PromotionSales ForecastTime Series 44246E | | | | 0..1 44248E | CDT 44250E | Quantity TimeSeries 44252E | |

Fig. 442H

| | | | | | | | | |
|---|---|---|---|---|---|---|---|---|
| ProductForecastNotificationMessage 44228 | | | | | | | | |
| Product Forecast 44240 | | | | | | | | |
| Item 44266A | | Item 44254E | | | 0..n 44256E | | | |
| | | | Validity Period 44260E | | 1 44262E | GDT 44264E | DataTime Period 44266E | |
| | | | | StartDate Time 44270E | 0..1 44272E | | | |
| | | | | EndDate Time 44276E | 0..1 44278E | | | |
| | | | Quantity 44282E | | 1 44284E | GDT 44286E | Quantity 44288E | |
| | | | Fixed Indicator 44292E | | 0..1 44294E | GDT 44296E | Fixed Indicator 44298E | |
| | OrderForecast TimeSeries 44200F | | | | 0..1 44202F | CDT 44204F | Quantity TimeSeries 44206F | |
| | | Item 44208F | | | 0..n 44210F | | | |

Fig. 442I

| ProductForecastNotificationMessage 44228 | | | | | | | | | | |
|---|---|---|---|---|---|---|---|---|---|---|
| Product Forecast 44240 | | | | | | | | | | |
| Item 44266A | | | | | | ValidityPeriod 44214F | | 1 44216F | GDT 44218F | DateTime Period 44220F |
| | | | | | | | StartDate Time 44224F | 0..1 44226F | | |
| | | | | | | | EndDate Time 44230F | 0..1 44232F | | |
| | | | | | | Quantity 44236F | | 1 44238F | GDT 44240F | Quantity 44242F |
| | | | | | | FixedIndicator 44246F | | 0..1 44248F | GDT 44250F | Fixed Indicator 44252F |
| | | | | PromotionOrder ForecastTime Series 44254F | | | | 0..1 44256F | CDT 44258F | Quantity TimeSeries 44260F |
| | | | | | Item 44262F | | | 0..n 44264F | | |

Fig. 442J

| | | | | | | | | | | | | |
|---|---|---|---|---|---|---|---|---|---|---|---|---|
| ProductForecastNotificationMessage 44228 | | | | | | | | | | | | |
| | Product Forecast 44240 | | | | | | | | | | | |
| | | Item 44266A | | | | | ValidityPeriod 44268F | | 1 44270F | GDT 44272F | DateTimePeriod 44274F | |
| | | | | | | | | StartDateTime 44278F | 0..1 44280F | | | |
| | | | | | | | | EndDateTime 44284F | 0..1 44286F | | | |
| | | | | | | | Quantity 44290F | | 1 44292F | GDT 44294F | Quantity 44296F | |
| | | | | | | | FixedIndicator 44200G | | 0..1 44202G | GDT 44204G | FixedIndicator 44206G | |

Fig. 445A

| Package 44500 | L1 44502 | L2 44504 | L3 44506 | L4 44508 | L5 44510 | L6 44512 | L7 44514 | C 44516 | Type 44518 | GDT 44520 | Lgh 44524 |
|---|---|---|---|---|---|---|---|---|---|---|---|
| Product Forecast Revision Message 44528 | Product Forecast Revision Message 44530 | | | | | | | 1 44532 | | Product Forecast Revision Message 44534 | |
| Message Header 44538 | | Message Header 44542 | | | | | | 0..1 44544 | GDT 44546 | Business Document Message Header 44548 | |

Fig. 445B

| ProductForecastRevisionMessage 44528 | | | | | | | | | | | |
|---|---|---|---|---|---|---|---|---|---|---|---|
| Message Header 44538 | | | ID 44554 | | | | | 1 44556 | GDT 44558 | BusinessDocument MessageID 44560 | 1..35 44562 |
| | | | Creation DateTime 44566 | | | | | 1 44568 | GDT 44570 | DateTime 44572 | |
| | | | Sender Party 44574 | | | | | 0..1 44576 | GDT 44578 | BusinessDocument MessageHeader Party 44580 | |
| | | | | InternalID 44584 | | | | 0..1 44586 | GDT 44588 | PartyInternalID 44590 | |
| | | | | StandardID 44592 | | | | 0..n 44594 | GDT 44596 | PartyStandardID 44598 | |
| | | | Recipient Party 44502A | | | | | 0..1 44504A | GDT 44506A | BusinessDocument-MessageHeader Party 44508A | |
| | | | | InternalID 44514A | | | | 0..1 44516A | GDT 44518 | PartyInternalID 44520A | |

Fig. 445C

| ProductForecastRevisionMessage 44528 | | | | | | | | | |
|---|---|---|---|---|---|---|---|---|---|
| Message Header 44538 | | | StandardID 44522A | | | 0..n 44524A | GDT 44526A | PartyStandardID 44528A | |
| Product Forecast 44540 | Product Forecast 44532A | | | | | 1 44534A | AGDT 44536A | ProductForecast Revision 44538A | |
| | | Acceptance StatusCode 44540A | | | | 0..1 44542A | GDT 44546A | AcceptanceStatus Code 44548A | 2 44550A |
| | | Validity Period 44554A | | | | 0..1 44556A | GDT 44558A | DateTimePeriod 44560A | |
| | | | StartDate Time 44564A | | | 0..1 44566A | | | |
| | | | EndDate Time 44570A | | | 0..1 44572A | | | |

Fig. 445D

| | | | | | | | | | | | | |
|---|---|---|---|---|---|---|---|---|---|---|---|---|
| ProductForecastRevisionMessage 44528 | | | | | | | | | | | | |
| ProductForecast 44540 | | | | | | | | | | | | |
| Party 44576A | | | BuyerParty 44580A | | | | | 0..1 44582A | CDT 44584A | BusinessTransaction DocumentParty 44586A | |
| | | | | InternalID 44592A | | | | 0..1 44594A | CDT 44596A | PartyInternalID 44598A | 1..10 44500B |
| | | | | StandardID 44502B | | | | 0..n 44504B | CDT 44506B | PartyStandardID 44508B | 1..13 44510B |
| | | | | BuyerID 44514B | | | | 0..1 44516B | CDT 44518B | PartyPartyID 44520B | 1..10 44522B |
| | | | | VendorID 44526B | | | | 0..1 44528B | CDT 44530B | PartyPartyID 44532B | 1..10 44534B |
| | | | VendorParty 44538B | | | | | 0..1 44540B | CDT 44542B | BusinessTransaction DocumentParty 44544B | |
| | | | | InternalID 44550B | | | | 0..1 44552B | CDT 44554B | PartyInternalID 44556B | 1..10 44558B |

Fig. 445E

| | | | | | | | |
|---|---|---|---|---|---|---|---|
| ProductForecastRevisionMessage 44528 | | | | | | | |
| ProductForecast 44540 | | | | | | | |
| Party 44576A | | StandardID 44560B | | 0..n 44562B | CDT 44564B | PartyStandardID 44566B | 1..13 44568B |
| | | Buyer ID 44572B | | 0..1 44574B | CDT 44576B | PartyPartyID 44578B | 1..10 44580B |
| | | Vendor ID 44584B | | 0..1 44586B | CDT 44588B | PartyPartyID 44590B | 1..10 44592B |
| | Note 44596B | | | 0..1 44598B | GDT 44500C | Note 44502C | 1..132 44504C |
| Item 44578A | Item 44506C | | | 1..n 44508C | AGDT 44510C | ProductForecast RevisionItem 44512C | |
| Location 44516C | | Ship From Location 44520C | | 0..1 44522C | CDT 44524C | Business Transaction DocumentShip FromLocation 44526C | |
| | | | InternalID 44532C | 0..1 44534C | CDT 44536C | LocationInternalID 44538C | 1..20 44540C |

Fig. 445F

| | | | | | | | | | | | | | |
|---|---|---|---|---|---|---|---|---|---|---|---|---|---|
| ProductForecastRevisionMessage 44528 | | | | | | | | | | | | | |
| | ProductForecast 44540 | | | | | | | | | | | | |
| | | Item 44578A | | | | | | | | | | | |
| | | | Location 44516C | | | | | Stan-dardID 44542C | | | 0..n 44544C | CDT 44546C | LocationStandardID 44548C | 1..13 44550C |
| | | | | | | | | BuyerID 44554C | | | 0..1 44556C | CDT 44558C | LocationPartyID 44560C | 1..20 44562C |
| | | | | | | | | VendorID 44566C | | | 0..1 44568C | CDT 44570C | LocationPartyID 44572C | 1..20 44574C |
| | | | | | | | ShipTo Location 44578C | | | | 1 44580C | CDT 44582C | BusinessTrans-actionDocument ShipToLocation 44584C | |
| | | | | | | | | InternalID 44590C | | | 0..1 44592C | CDT 44594C | LocationInternalID 44596C | 1..20 44598C |
| | | | | | | | | Standard ID 44500D | | | 0..n 44502D | CDT 44504D | LocationStandardID 44506D | 1..13 44508D |
| | | | | | | | | BuyerID 44512D | | | 0..1 44514D | CDT 44516D | LocationPartyID 44518D | 1..20 44520D |

Fig. 445G

| | | | | | | | | | | | | | |
|---|---|---|---|---|---|---|---|---|---|---|---|---|---|
| ProductForecastRevisionMessage 44528 | | | | | | | | | | | | | |
| | ProductForecast 44540 | | | | | | | | | | | | |
| | | Item 44578A | | | | | | | | | | | |
| | | | Location 44516C | | | | | | VendorID 44526D | | 0..1 44528D | CDT 44530D | LocationPartyID 44532D | 1..20 44534D |
| | | | Product Information 44518C | | | | Product 44538D | | | | 1 44540D | CDT 44542D | Business Transaction DocumentProduct 44544D | |
| | | | | | | | | InternalID 44550D | | | 0..1 44552D | CDT 44554D | ProductInternalID 44556D | 1..40 44558D |
| | | | | | | | | Standard ID 44560D | | | 0..1 44562D | CDT 44564D | ProductStandardID 44566D | 1..14 44568D |
| | | | | | | | | BuyerID 44572D | | | 0..1 44574D | CDT 44576D | ProductPartyID 44578D | 1..40 44580D |
| | | | | | | | | VendorID 44584D | | | 0..1 44586D | CDT 44588D | ProductPartyID 44590D | 1..40 44592D |
| | | | | | | | | Package Quantity 44596D | | | 0..1 44598D | GDT 44500E | Quantity 44502E | 19,6 44504E |

Fig. 445H

| ProductForecastRevisionMessage 44528 | | | | | | | |
|---|---|---|---|---|---|---|---|
| ProductForecast 44540 | | | | | | | |
| Item 44578A | Sales Forecast TimeSeries 44506E | | | | 0..1 44508E | CDT 44510E | Revision Quantity Time Series 44512E |
| | | Item 44514E | | | 0..n 44516E | | |
| | | | Validity Period 44520E | | 1 44522E | GDT 44524E | DateTime Period 44526E |
| | | | | StartDate Time 44530E | 0..1 44532E | | |
| | | | | EndDate Time 44536E | 0..1 44538E | | |
| | | | Quantity 44542E | | 1 44544E | GDT 44546E | Quantity 44548E |
| | | | Fixed Indicator 44552E | | 0..1 44554E | GDT 44556E | Fixed Indicator 44558E |

Fig. 445I

ProductForecastRevisionMessage 44528

ProductForecast 44540

| | | | | | | | | | | | |
|---|---|---|---|---|---|---|---|---|---|---|---|
| Item 44578A | | | | | | Adjustment Reason Code 44560E | | 0..1 44562E | GDT 44564E | Adjustment Reason Code 44566E | 1..35 44568E |
| | | | | | | Note 44572E | | 0..1 44574E | GDT 44576E | Note 44578E | 1..132 44580E |
| | | | | Promotion SalesForecast Time Series 44584E | | | | 0.1 44586E | CDT 44588E | Revision Quantity TimeSeries 44590E | |
| | | | | | Item 44592E | | | 0..n 44594E | | | |
| | | | | | | Validity Period 44598E | | 1 44500F | GDT 44502F | DataTime Period 44504F | |
| | | | | | | | Start Date Time 44508F | 0.1 44510F | | | |

Fig. 445J

ProductForecastRevisionMessage 44528

ProductForecast 44540

| | | | | | | | | | | | |
|---|---|---|---|---|---|---|---|---|---|---|---|
| Item 44578A | | | | | | | End Date Time 44514F | 0.1 44516F | | | |
| | | | | | | Quantity 44520F | | 1 44522F | GDT 44524F | Quantity 44526F | |
| | | | | | | Fixed Indicator 44530F | | 0..1 44532F | GDT 44534F | FixedIndicator 44536F | |
| | | | | | | Adjustment ReasonCode 44538F | | 0..1 44540F | GDT 44542F | Adjustment ReasonCode 44544F | 1..35 44546F |
| | | | | | | Note 44550F | | 0..1 44552F | GDT 44554F | Note 44556F | 1..132 44558F |
| | | | | Order Forecast Time Series 44562F | | | | 0..1 44564F | CDT 44566F | Revision QuantityTime Series 44568F | |
| | | | | | Item 44570F | | | 0..n 44572F | | | |

Fig. 445K

| | | | | | | | | | | | | |
|---|---|---|---|---|---|---|---|---|---|---|---|---|
| ProductForecastRevisionMessage 44528 | | | | | | | | | | | | |
| | ProductForecast 44540 | | | | | | | | | | | |
| | | Item 44578A | | | | | ValidityPeriod 44576F | | 1 44578F | GDT 44580F | DateTime Period 44582F | |
| | | | | | | | | StartDateTime 44586F | 0..1 44588F | | | |
| | | | | | | | | EndDateTime 44592F | 0..1 44594F | | | |
| | | | | | | | Quantity 44598F | | 1 44500G | GDT 44502G | Quantity 44504G | |
| | | | | | | | FixedIndicator 44508G | | 0..1 44510G | GDT 44512G | FixedIndicator 44514G | |
| | | | | | | | Adjustment ReasonCode 44516G | | 0..1 44518G | GDT 44520G | Adjustment ReasonCode 44522G | 1..35 44524G |
| | | | | | | | Note 44528G | | 0..1 44530G | GDT 44532G | Note 44534G | 1..132 44536G |

Fig. 445L

| ProductForecastRevisionMessage 44528 | | | | | | | | | | | |
|---|---|---|---|---|---|---|---|---|---|---|---|
| ProductForecast 44540 | | | | | | | | | | | |
| Item 44578A | | | | Promotion OrderForecast Time Series 44540G | | | | 0..1 44542G | CDT 44544G | Revision Quantity TimeSeries 44546G | |
| | | | | | Item 44548G | | | 0..n 44550G | | | |
| | | | | | | ValidityPeriod 44554G | | 1 44556G | GDT 44558G | DateTime Period 44560G | |
| | | | | | | | StartDate Time 44564G | 0..1 44566G | | | |
| | | | | | | | EndDate Time 44570G | 0..1 44572G | | | |
| | | | | | | Quantity 44576G | | 1 44578G | GDT 44580G | Quantity 44582G | |
| | | | | | | Fixed Indicator 44586G | | 0..1 44588G | GDT 44590G | FixedIndicator 44592G | |

Fig. 445M

| | | | | | | | | | | | | |
|---|---|---|---|---|---|---|---|---|---|---|---|---|
| ProductForecastRevisionMessage 44528 | | | | | | | | | | | | |
| | ProductForecast 44540 | | | | | | | | | | | |
| | | Item 44578A | | | | | AdjustmentReasonCode 44594G | | 0..1 44596G | GDT 44598G | AdjustmentReasonCode 44500H | 1..35 44502H |
| | | | | | | | Note 44506H | | 0..1 44508H | CDT 44510H | Note 44512H | 1..132 44514H |

Fig. 448A

| Package 44800 | L1 44802 | L2 44804 | L3 44806 | L4 44808 | L5 44810 | L6 44812 | Card. 44814 | G/CDT 44816 | Lgth 44818 |
|---|---|---|---|---|---|---|---|---|---|
| Replenish-mentOrder Notification 44820 | Replenish-mentOrder Notification 44822 | | | | | | 1 44824 | Replenishment OrderNotification 44826 | |
| Business Document Message Header 44828 | | Message Header 44832 | | | | | 1 44834 | BusinessDocument MessageHeader 44836 | |
| | | | ID 44838 | | | | 1 44840 | BusinessDocument MessageID 44842 | 1..35 44844 |
| | | | Creation DateTime 44846 | | | | 1 44848 | Date Time 44850 | |
| | | | Sender Party 44852 | | | | 0..1 44854 | BusinessDocument MessageHeader Party 44856 | |
| | | | | InternalID 44858 | | | 0..1 44860 | PartyInternalID 44862 | |
| | | | | Standard ID 44864 | | | 0..n 44866 | PartyStandardID 44868 | |

Fig. 448B

| ReplenishmentOrderNotification 44820 | | | | | | | |
|---|---|---|---|---|---|---|---|
| Business Document Message Header 44828 | | Recipient Party 44870 | | 0..1 44872 | BusinessDocument MessageHeader Party 44874 | |
| | | | InternalID 44876 | 0..1 44878 | PartyInternalID 44880 | |
| | | | StandardID 44882 | 0..n 44884 | PartyStandardID 44886 | |
| Replenishment Order 44830 | Replenishment Order 44888 | | | 1 44890 | ReplenishmentOrder 44892 | |
| | | @actionCode 44894L | | 0..1 44896L | ActionCode 44898L | 2 44800M |
| | | @itemList Complete Transmission Indicator 44802M | | 0..1 44804M | Complete Transmission Indicator 44806M | |
| | | ID 44894 | | 1 44896 | BusinessTransaction DocumentID 44898 | 1..35 44800A |

Fig. 448C

| ReplenishmentOrderNotification 44820 | | | | | | |
|---|---|---|---|---|---|---|
| Replenishment Order 44830 | | Creation DateTime 44802A | | 1 44804A | DateTime 44806A | |
| | | LastChange DateTime 44808M | | 0..1 44810M | DateTime 44812M | |
| Party 44808A | | Buyer Party 44816A | | 0..1 44818A | BusinessTransaction DocumentParty 44820A | |
| | | | InternalID 44822A | 0..1 44824A | PartyInternalID 44826A | 1..10 44828A |

Fig. 448D

| | | | | | | |
|---|---|---|---|---|---|---|
| ReplenishmentOrderNotification 44820 | | | | | | |
| ReplenishmentOrder 44830 | | | | | | |
| Party 44808A | StandardID 44830A | | 0..n 44832A | PartyStandardID 44834A | 1..13 / 9 44836A |
| | BuyerID 44838A | | 0..1 44840A | PartyPartyID 44842A | 1..10 44844A |
| | VendorID 44846A | | 0..1 44848A | PartyPartyID 44850A | 1..10 44852A |
| | Address 44854A | | 0..1 44856A | Address 44858A | |
| | ContactPerson 44860A | | 0..n 44862A | ContactPerson 44864A | |
| | | InternalID 44866A | 0..1 44868A | ContactPersonInternalID 44870A | |
| | | BuyerID 44872A | 0..1 44874A | ContactPersonPartyID 44876A | |
| | | VendorID 44878A | 0..1 44880A | ContactPersonPartyID 44882A | |
| | | Address 44884A | 0..1 44886A | Address 44888A | |

Fig. 448E

| ReplenishmentOrderNotification 44820 | | | | | |
|---|---|---|---|---|---|
| ReplenishmentOrder 44830 | | | | | |
| Party 44808A | Seller Party 44814M | | 0..1 44816M | BusinessTransaction DocumentParty 44818M | |
| | | InternalID 44820M | 0..1 44822M | PartyInternalID 44824M | 1..10 44826M |
| | | StandardID 44828M | 0..n 44830M | PartyStandardID 44832M | 1..13 / 9 44834M |
| | | BuyerID 44836M | 0..1 448438M | PartyPartyID 44840M | 1..10 44842M |
| | | VendorID 44844M | 0..1 44846M | PartyPartyID 44858M | 1..10 44850M |
| | | Address 44852M | 0..1 44854M | Address 44856M | |
| | | ContactPerson 44858M | 0..n 44860M | ContactPerson 44862M | |

Fig. 448F

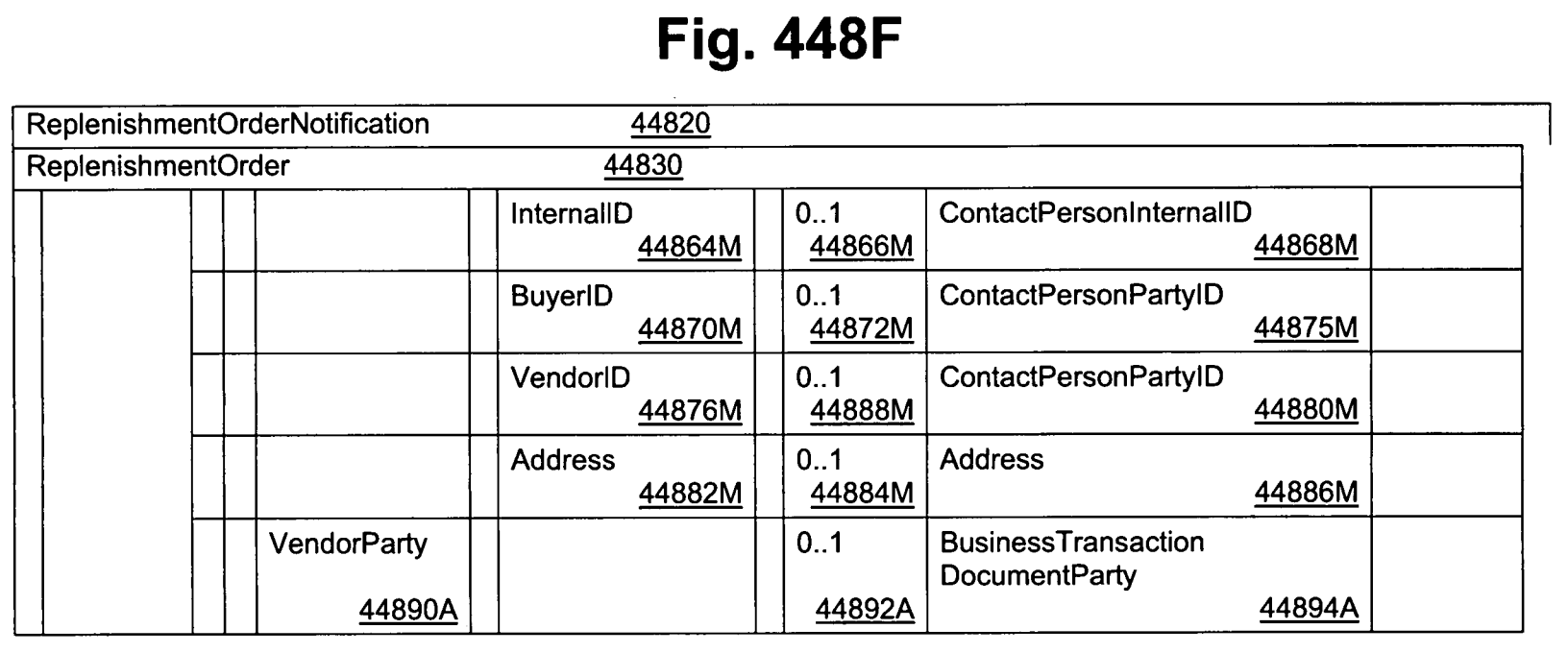

| | | | | |
|---|---|---|---|---|
| ReplenishmentOrderNotification 44820 | | | | |
| ReplenishmentOrder 44830 | | | | |
| | InternalID 44864M | 0..1 44866M | ContactPersonInternalID 44868M | |
| | BuyerID 44870M | 0..1 44872M | ContactPersonPartyID 44875M | |
| | VendorID 44876M | 0..1 44888M | ContactPersonPartyID 44880M | |
| | Address 44882M | 0..1 44884M | Address 44886M | |
| VendorParty 44890A | | 0..1 44892A | BusinessTransaction DocumentParty 44894A | |

Fig. 448G

| | | | | | | | | | |
|---|---|---|---|---|---|---|---|---|---|
| ReplenishmentOrderNotification 44820 | | | | | | | | | |
| ReplenishmentOrder 44830 | | | | | | | | | |
| Party 44808A | | | | InternalID 44896A | | | 0..1 44898A | PartyInternalID 44800B | 1..10 44802B |
| | | | | StandardID 44804B | | | 0..n 44806B | PartyStandardID 44808B | 1..13 / 9 10B |
| | | | | BuyerID 44812B | | | 0..1 44814B | PartyPartyID 44816B | 1..10 18B |
| | | | | VendorID 44820B | | | 0..1 44822B | PartyPartyID 44824B | 1..10 44826B |
| | | | | Address 44828B | | | 0..1 44830B | Address 44832B | |
| | | | | ContactPerson 44834B | | | 0..n 44836B | ContactPerson 44838B | |
| | | | | | InternalID 44840B | | 0..1 44842B | ContactPersonInternalID 44844B | |
| | | | | | BuyerID 44846B | | 0..1 44848B | ContactPersonPartyID 44850B | |
| | | | | | VendorID 44852B | | 0..1 44854B | ContactPersonPartyID 44856B | |
| | | | | | Address 44858B | | 0..1 44860B | Address 44862B | |

Fig. 448H

| | | | | | | |
|---|---|---|---|---|---|---|
| ReplenishmentOrderNotification 44820 | | | | | | |
| ReplenishmentOrder 44830 | | | | | | |
| Delivery Information 44810A | DeliveryTerms 44864B | | | 0..1 44866B | DeliveryTerms 44868B | |
| | | Delivery Priority Code 44870B | | 0..1 44872B | BusinessTransaction PriorityCode 44874B | |
| | | Incoterms 44876B | | 0..1 44878B | Incoterms 44880B | |
| | | Quantity Tolerance 44882B | | 0..1 44884B | QuantityTolerance 44886B | |
| | | | OverPercent 44888B | 0..1 44890B | Percent 44892B | |
| | | | UnderPercent 44894B | 0..1 44896B | Percent 44898B | |
| | TransportMeans DescriptionCode 44800C | | | 0..1 44802C | TransportMeans DescriptionCode 44804C | 4 44806C |
| | TransportService LevelCode 44808C | | | 0..1 44810C | TransportService LevelCode 44812C | 2 44814C |

Fig. 448I

| ReplenishmentOrderNotification 44820 | | | | | |
|---|---|---|---|---|---|
| Replenishment Order 44830 | GrossWeightMeasure 44816C | | 0..1 44818C | Measure 44820C | 19,6 44822C |
| | NetWeightMeasure 44824C | | 0..1 44826C | Measure 44828C | 19,6 44830C |
| | GrossVolumeMeasure 44832C | | 0..1 44834C | Measure 44836C | 19,6 44838C |
| Payment Information 44812A | CashDiscountTerms 44840C | | 0..1 44842C | CashDiscountTerms 44844C | |
| | Note 44846C | | 0..1 44848C | Note 44850C | 1..132 44852C |
| Item 44814A | Item 44854C | | 1..n 44856C | ReplishmentOrder Item 44858C | |
| | | ActionCode 44860C | 0..1 44862C | ActionCode 44864C | 2 44866C |
| | | ID 44868C | 1 44870C | BusinessTransaction DocumentItemID 44872C | 1…10 44874C |
| | | Hierarchie Relationship 44888M | 0..1 44890M | | |

Fig. 448J

| | | | | | |
|---|---|---|---|---|---|
| ReplenishmentOrderNotification 44820 | | | | | |
| ReplenishmentOrder 44830 | | | | | |
| Item 44814A | | ParentItem ID 44892M | 1 44894M | BusinessTransaction DocumentID 44896M | |
| | | TypeCode 44898M | 0..1 44800N | BusinessTransaction Document Reference 44802N | |
| | AcceptanceStatus Code 44876C | | 0..1 44878C | AcceptanceStatus Code 44880C | 2 44882C |
| | CompletedIndicator 44884C | | 0...1 44886C | BusinessTransaction Completed Indicator 44888C | 1 44890C |
| | ConsignmentIndicator 44892C | | 0..1 44894C | ConsignmentIndicator 44896C | 1 44898C |
| | ThirdPartyDealIndicator 44800D | | 0..1 44802D | BusinessTransaction DocumentItem ThirdPartyDealIndicator 44804D | |
| | SubcontractingIndicator 44804N | | 0..1 44806N | SubcontractingIndicator 44808N | |

Fig. 448K

| | | | | |
|---|---|---|---|---|
| ReplenishmentOrderNotification 44820 | | | | |
| ReplenishmentOrder 44830 | | | | |
| Item 44814A | VendorInitiatedAction Indicator 44810N | 0..1 44812N | PartyInitiatedAction Indicator 44814N | |
| | BlockedIndicator 44816N | 0..1 44818N | BusinessTransaction BlockedIndicator 44820N | |
| | CancelledIndicator 44806D | 0..1 44808D | CancelledIndicator 44810D | |
| | CancellationReasonCode 44812D | 0..1 44814D | CancellationReason Code 44816D | |
| Business Transaction Document Reference 44818D | PurchaseContract Reference 44836D | 0..1 44838D | BusinessTransaction Document Reference 44840D | |
| | SchedulingAgreement Reference 44822N | 0..1 44824N | BusinessTransaction Document Reference 44826N | |
| | PurchaseOrder Reference 44842D | 0..1 44844D | BusinessTransaction Document Reference 44846D | |

Fig. 448L

| | | | | | | |
|---|---|---|---|---|---|---|
| ReplenishmentOrderNotification 44820 | | | | | | |
| ReplenishmentOrder 44830 | | | | | | |
| Item 44814A | | | | | | |
| Business Transaction Document Reference 44818D | OriginPurchase Order Reference 44848D | | 0..1 44850D | BusinessTransaction Document Reference 44852D | | |
| | SalesOrder Reference 44854D | | 0..1 44856D | BusinessTransactionDocument Reference 44858D | | |
| | OriginSalesOrder Reference 44860D | | 0..1 44862D | BusinessTransactionDocument Reference 44864D | | |
| Party 44820D | BuyerParty 44828N | | 0..1 44830N | BusinessTransactionDocument Party 44832N | | |
| | | InternalID 44834N | 0…1 44836N | PartyInternalID 44838N | 1…10 44840N | |
| | | StandardID 44842N | 0…n 44844N | PartyStandardID 44846N | 1…13/9 44848N | |
| | | BuyerID 44850N | 0…1 44852N | PartyPartyID 44854N | 1…10 44856N | |
| | | VendorID 44860N | 0…1 44862N | PartyPartyID 44864N | 1…10 44866N | |

Fig. 448M

| | | | | | |
|---|---|---|---|---|---|
| ReplenishmentOrderNotification 44820 | | | | | |
| ReplenishmentOrder 44830 | | | | | |
| Item 44814A | | | | | |
| Party 44820D | | Address 44868N | 0…1 44870N | Address 44872N | |
| | ProductRecipient Party 44866D | | 0..1 44868D | BusinessTransactionDocument Reference 44870D | |
| | | InternalID 44872D | 0…1 44874D | PartyInternalID 44876D | 1…10 44878D |
| | | StandardID 44880D | 0…n 44882D | PartyStandardID 44884D | 1…13/9 44886D |
| | | BuyerID 44888D | 0…1 44890D | PartyPartyID 44892D | 1…10 44894D |
| | | VendorID 44896D | 0…1 44898D | PartyPartyID 44800E | 1…10 44802E |

Fig. 448N

| | | | | | | |
|---|---|---|---|---|---|---|
| ReplenishmentOrderNotification 44820 | | | | | | |
| ReplenishmentOrder 44830 | | | | | | |
| Item 44814A | | | | | | |
| Party 44820D | | Address 44804E | 0…1 44806E | Address 44808E | |
| | BillToParty 44810E | | 0..1 44812E | BusinessTransactionDocument Party 44814E | |
| | | InternalID 44816E | 0…1 44818E | PartyInternalID 44820E | 1…10 44822E |
| | | StandardID 44824E | 0…n 44826E | PartyStandardID 44828E | 1…13/9 44830E |
| | | BuyerID 44832E | 0…1 44834E | PartyPartyID 44836E | 1…10 44838E |
| | | VendorID 44840E | 0…1 44842E | PartyPartyID 44844E | 1…10 44846E |
| | | Address 44848E | 0…1 44850E | Address 44852E | |

Fig. 448O

| | | | | | | |
|---|---|---|---|---|---|---|
| ReplenishmentOrderNotification 44820 | | | | | | |
| ReplenishmentOrder 44830 | | | | | | |
| Item 44814A | | | | | | |
| Location 44822D | ShipFrom Location 44854E | | | 1 44856E | BusinessTransaction DocumentShipFromLocation 44858E | |
| | | InternalID 44860E | | 0..1 44862E | LocationInternalID 44864E | 1..20 44866E |
| | | StandardID 44868E | | 0..n 44870E | LocationStandardID 44872E | 1..13 44874E |
| | | BuyerID 44876E | | 0..1 44878E | LocationPartyID 44880E | 1..20 44882E |
| | | VendorID 44884E | | 0..1 44886E | LocationPartyID 44888E | 1..20 44890E |
| | | Loading Location 44892E | | 0..1 44894E | BusinessTransaction DocumentLocation 44896E | |
| | | | InternalID 44898E | 0..1 44800F | LocationInternalID 44802F | 1..20 44804F |
| | | | StandardID 44806F | 0..n 44808F | LocationStandardID 44810F | 1..13 44812F |
| | | | BuyerID 44814F | 0..1 44816F | LocationPartyID 44818F | 1..20 44820F |

Fig. 448P

| ReplenishmentOrderNotification 44820 | | | | | | |
|---|---|---|---|---|---|---|
| ReplenishmentOrder 44830 | | | | | | |
| Item 44814A | | | | | | |
| Location 44822D | | | VendorID 44822F | 0..1 44824F | LocationPartyID 44826F | 1…20 44828F |
| | | Address 44830F | | 0..1 44832F | Address 44834F | |
| | Transshipment Location 44836F | | | 0..1 44838F | BusinessTransaction TransshipmentLocation 44840F | |
| | | InternalID 44842F | | 0..1 44844F | LocationInternalID 44846F | 1..20 44848F |
| | | StandardID 44850F | | 0..n 44852F | LocationStandardID 44854F | 1..13 44856F |
| | | BuyerID 44858F | | 0..1 44860F | LocationPartyID 44862F | 1..20 44864F |
| | | VendorID 44866F | | 0..1 44868F | LocationPartyID 44870F | 1..20 44872F |
| | | Loading Location 44874F | | 0..1 44876F | BusinessTransaction DocumentLocation 44878F | |

Fig. 448Q

| | | | | | |
|---|---|---|---|---|---|
| ReplenishmentOrderNotification 44820 | | | | | |
| ReplenishmentOrder 44830 | | | | | |
| Item 44814A | | | | | |
| Location 44822D | | Unloading Location 44880F | 0..1 44882F | BusinessTransaction DocumentLocation 44884F | |
| | | Address 44886F | 0..1 44888F | Address 44890F | |
| | ShipTo Location 44892F | | 1 44894F | BusinessTransaction DocumentShipToLocation 44896F | |
| | | InternalID 44898F | 0..1 44800G | LocationInternalID 44802G | 1..20 44804G |
| | | StandardID 44806G | 0..n 44808G | LocationStandardID 44810G | 1..13 44812G |
| | | BuyerID 44814G | 0..1 44816G | LocationPartyID 44818G | 1..20 44820G |
| | | VendorID 44822G | 0..1 44824G | LocationPartyID 44826G | 1..20 44828G |
| | | Unloading Location 44830G | 0..1 44832G | BusinessTransactionDocumentLocation 44834G | |

Fig. 448R

ReplenishmentOrderNotification 44820
ReplenishmentOrder 44830
Item 44814A

| | | | | | | |
|---|---|---|---|---|---|---|
| Location 44822D | | | InternalID 44836G | 0..1 44838G | LocationInternalID 44840G | 1..20 44842G |
| | | | StandardID 44844G | 0..n 44846G | LocationStandardID 44848G | 1..13 44850G |
| | | | BuyerID 44852G | 0..1 44854G | LocationPartyID 44856G | 1..20 44858G |
| | | | VendorID 44860G | 0..1 44862G | LocationPartyID 44864G | 1...20 44866G |
| | | Address 44868G | | 0..1 44870G | Address 44872G | |
| Product Information 44824D | Product 44874G | | | 1 44876G | BusinessTransaction DocumentProduct 44878G | |
| | | InternalID 44880G | | 0..1 44882G | LocationInternalID 44884G | 1..40 44886G |
| | | StandardID 44888G | | 0..1 44890G | LocationStandardID 44892G | 1..14 44894G |
| | | BuyerID 44896G | | 0..1 44898G | LocationPartyID 44800H | 1..40 44802H |

Fig. 448S

| | | | | | |
|---|---|---|---|---|---|
| ReplenishmentOrderNotification 44820 | | | | | |
| ReplenishmentOrder 44830 | | | | | |
| Item 44814A | | | | | |
| Product Information 44824D | | VendorID 44804H | 0..1 44806H | LocationPartyID 44808H | 1..40 44810H |
| | | ChangeID 44812H | 0..1 44814H | ProductChangeID 44816H | 1..25 44818H |
| | | Package Quantity 44820H | 0..1 44822H | Quantity 44824H | 19,6 44826H |
| Batch 44826D | Batch 44828H | | 0..1 44830H | | |
| | | InternalID 44832H | 0..1 44834H | BatchInternalID 44836H | 1..10 44838H |
| | | BuyerID 44840H | 0..1 44842H | BatchPartyID 44844H | 1..10 44846H |
| | | VendorID 44848H | 0..1 44850H | BatchPartyID 44852H | 1..10 44854H |
| | | ManufacturingDate 44856H | 0..1 44858H | Date 44860H | |
| | | BestBeforeDate 44862H | 0..1 44864H | Date 44866H | |

Fig. 448T

| | | | | | |
|---|---|---|---|---|---|
| ReplenishmentOrderNotification 44820 | | | | | |
| ReplenishmentOrder 44830 | | | | | |
| Item 44814A | | | | | |
| Batch 44826D | | OriginCountryCode 44868H | 0..1 44870H | CountryCode 44872H | 3 44874H |
| Promotion 44828D | Promotion 44876H | | 0..1 44878H | Promotion 44880H | 1..35 44882H |
| | | InternalID 44884H | 0..1 44886H | PromotionInternalID 44888H | 1..20 44890H |
| | | BuyerID 44892H | 0..1 44894H | PromotionPartyID 44896H | 1..20 44898H |
| | | VendorID 44800I | 0..1 44802I | PromotionPartyID 44804I | 1..20 44806I |
| | NetWeightMeasure 44808I | | 0..1 44810I | Measure 44812I | 19,6 44814I |
| Delivery Information 44830D | DeliveryTerms 44816I | | 0..1 44818I | DeliveryTerms 44820I | |
| | | DeliveryPriorityCode 44822I | 0..1 44824I | BusinessTransaction PriorityCode 44826I | |
| | | Incoterms 44828I | 0..1 44830I | Incoterms 44832I | |

Fig. 448U

| | | | | | | |
|---|---|---|---|---|---|---|
| ReplenishmentOrderNotification 44820 | | | | | | |
| ReplenishmentOrder 44830 | | | | | | |
| Item 44814A | | | | | | |
| Delivery Information 44830D | | Quantity Tolerance 44834I | | 0..1 44836I | Quantity Tolerance 44838I | |
| | | | OverPercent 44840I | 0..1 44842I | Percent 44844I | |
| | | | UnderPercent 44846I | 0..1 44848I | Percent 44850I | |
| Price Information 44832D | NetPrice 44852I | | | 0..1 44854I | Price 44856I | |
| | Kanban CardID 44874N | | | 0..1 44876N | Kanban CardID 44878N | 1..10 44880N |
| | Note 44858I | | | 0..1 44860I | Note 44862I | |

Fig. 448V

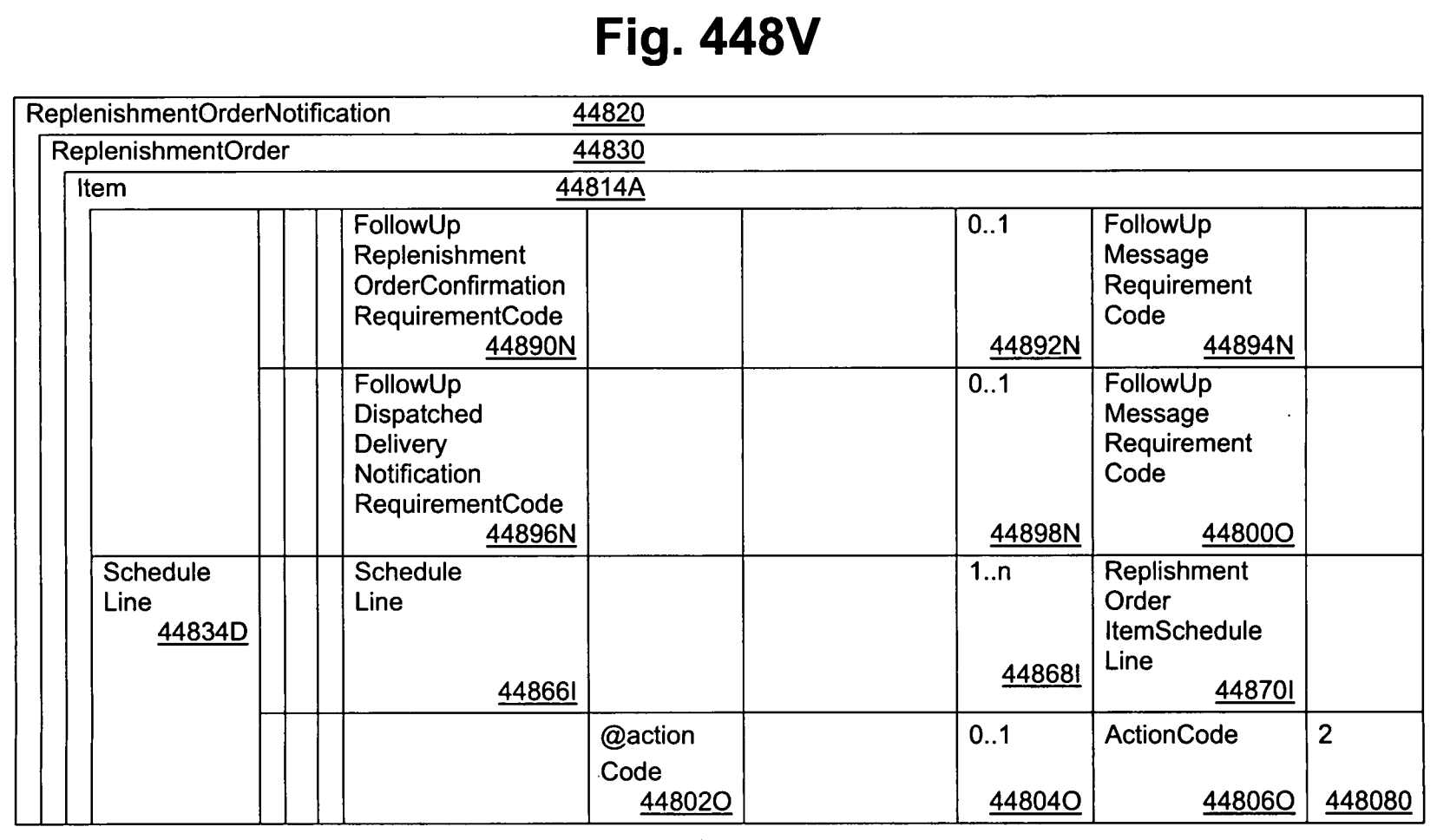

| | | | | | | |
|---|---|---|---|---|---|---|
| ReplenishmentOrderNotification 44820 | | | | | | |
| ReplenishmentOrder 44830 | | | | | | |
| Item 44814A | | | | | | |
| | FollowUp Replenishment OrderConfirmation RequirementCode 44890N | | | 0..1 44892N | FollowUp Message Requirement Code 44894N | |
| | FollowUp Dispatched Delivery Notification RequirementCode 44896N | | | 0..1 44898N | FollowUp Message Requirement Code 44800O | |
| Schedule Line 44834D | Schedule Line 44866I | | | 1..n 44868I | Replishment Order ItemSchedule Line 44870I | |
| | | @action Code 44802O | | 0..1 44804O | ActionCode 44806O | 2 448080 |

Fig. 448W

| | | | | |
|---|---|---|---|---|
| ReplenishmentOrderNotification 44820 | | | | |
| ReplenishmentOrder 44830 | | | | |
| Item 44814A | | | | |
| Schedule Line 44834D | ID 44810O | 0..1 44812O | Business Transaction DocumentItem ScheduleLineID 44814O | 1..4 44816O |
| | Shipment GroupID 44872I | 0..1 44874I | Business Transaction DocumentGroupID 44876I | 1..10 44878I |
| | Transport Planning Period 44880I | 0..1 44882I | DateTimePeriod 44884I | |
| | PositioningPeriod 44886I | 0..1 44888I | DateTimePeriod 44890I | |
| | LoadingPeriod 44892I | 0..1 44894I | DateTimePeriod 44896I | |
| | ShippingPeriod 44898I | 0..1 44800J | DateTimePeriod 44802J | |

Fig. 448X

| | | | | | |
|---|---|---|---|---|---|
| ReplenishmentOrderNotification 44820 | | | | | |
| ReplenishmentOrder 44830 | | | | | |
| Item 44814A | | | | | |
| | DeliveryPeriod 44804JI | | 0..1 44806J | DateTimePeriod 44808J | |
| Schedule Line 44834D | AvailabilityPeriod 44810J | | 0..1 44812J | DateTimePeriod 44814J | |
| | PickUpPeriod 44816J | | 0..1 44818J | DateTimePeriod 44820J | |
| | Quantity 44822J | | 1 44824J | Quantity 44826J | 19,6 44828J |
| | ReceivedQuantity 44830J | | 0..1 44832J | Quantity 44834J | 19,6 44836J |
| | Component Requirement 44831J | | 0..n 44833J | ReplenishmentOrder ItemScheduleLine ComponentRequirement 44835J | |

Fig. 448Y

| | | | | |
|---|---|---|---|---|
| ReplenishmentOrderNotification 44820 | | | | |
| ReplenishmentOrder 44830 | | | | |
| Item 44814A | | | | |
| Schedule Line 44834D | | | | |
| Product 44810O | | 1 44812O | BusinessTransactionDocument Product 44814O | |
| | InternalID 44816O | 0..1 44818O | ProductInternalID 44820O | 1,40 44822O |
| | StandardID 44824O | 0..1 44826O | ProductStandardID 44828O | 14 44830O |
| | BuyerID 44832O | 0..1 44832O | ProductBuyerID 44834O | 1,40 44836O |
| | VendorID 44838O | 0..1 44840O | ProductVendorID 44842O | 1,40 44844O |
| Quantity 44846O | | 1 44848O | Quantity 44850O | 19,6 44852O |

Fig. 448Z

| | | | | | | |
|---|---|---|---|---|---|---|
| ReplenishmentOrderNotification 44820 | | | | | | |
| ReplenishmentOrder 44830 | | | | | | |
| Item 44814A | | | | | | |
| Schedule Line 44834D | Confirmed ScheduleLine 44838J | | 0..n 44840J | ReplenishmentOrder ItemScheduleLine 44842J | |
| | | @action Code 44839J | 0..1 44841J | ActionCode 44843J | 2 44845J |
| | | Shipment GroupID 44844J | 0..1 44846J | BusinessTransaction DocumentGroupID 44848J | 1..10 44850J |
| | | Transport PlanningPeriod 44852J | 0..1 44854J | DateTimePeriod 44856J | |
| | | Positioning Period 44858J | 0..1 44860J | DateTimePeriod 44862J | |

Fig. 448AA

| | | | | |
|---|---|---|---|---|
| ReplenishmentOrderNotification 44820 | | | | |
| ReplenishmentOrder 44830 | | | | |
| Item 44814A | | | | |
| Schedule Line 44834D | LoadingPeriod 44864J | 0..1 44866J | DateTimePeriod 44868J | |
| | ShippingPeriod 44870J | 0..1 44872J | DateTimePeriod 44874J | |
| | DeliveryPeriod 44876J | 0..1 44878J | DateTimePeriod 44880J | |
| | AvailabilityPeriod 44882J | 0..1 44884J | DateTimePeriod 44886J | |
| | PickUpPeriod 44888J | 0..1 44890J | DateTimePeriod 44892J | |
| | Quantity 44894J | 1 44896J | Quantity 44898J | 19,6 44800K |
| | Component Requirement 44895J | 0..n 44897J | ReplenishmentOrder ItemConfirmedScheduleLine ComponentRequirement 44899J | |

Fig. 448BB

| | | | | | | |
|---|---|---|---|---|---|---|
| ReplenishmentOrderNotification 44820 | | | | | | |
| ReplenishmentOrder 44830 | | | | | | |
| Item 44814A | | | | | | |
| Schedule Line 44834D | Product 44854O | | 1 44856O | BusinessTransactionDocument Product 44858O | |
| | | InternalID 44860O | 0..1 44862O | ProductInternalID 44864O | 1,40 44866O |
| | | StandardID 44868O | 0..1 44870O | ProductStandardID 44872O | 1,40 44874O |
| | | BuyerID 44876O | 0..1 44878O | ProductBuyerID 44880O | 1,40 44882O |
| | | VendorID 44884O | 0..1 44886O | ProductVendorID 44888O | 1,40 44890O |
| | Quantity 44892O | | 1 44894O | Quantity 44896O | 19,6 44898O |

Fig. 448CC

| | | | | | | | |
|---|---|---|---|---|---|---|---|
| ReplenishmentOrderNotification 44820 | | | | | | | |
| ReplenishmentOrder 44830 | | | | | | | |
| Handling Unit 44815A | Handling Unit 44802K | | | | 0..n 44804K | HandlingUnit 44806K | |
| | | ID 44808K | | | 1 44810K | HandlingUnitID 44812K | 1..20 44814K |
| | | Load Carrier 44816K | | | 1 44818K | | |
| | | | Product 44820K | | 1 44822K | | |
| | | | | InternalID 44824K | 0..1 44826K | ProductInternalID 44828K | 1..40 44830K |
| | | | | StandardID 44832K | 0..1 44834K | ProductStandardID 44836K | 1..14 44838K |
| | | | | BuyerID 44840K | 0..1 44842K | ProductPartyID 44844K | 1..40 44846K |
| | | | | VendorID 44848K | 0..1 44850K | ProductPartyID 44852K | 1..40 44854K |

Fig. 448DD

| | | | | | | | | |
|---|---|---|---|---|---|---|---|---|
| ReplenishmentOrderNotification 44820 | | | | | | | | |
| ReplenishmentOrder 44830 | | | | | | | | |
| HandlingUnit 44815A | | | | HeightMeasure 44856K | | 0..1 44858K | Measure 44860K | 19,6 44862K |
| | | | | LengthMeasure 44864K | | 0..1 44866K | Measure 44868K | 19,6 44870K |
| | | | | WidthMeasure 44872K | | 0..1 44874K | Measure 44876K | 19,6 44878K |
| | | | | GrossVolumeMeasure 44880K | | 0..1 44882K | Measure 44884K | 19,6 44886K |
| | | | | NetVolumeMeasure 44888K | | 0..1 44890K | Measure 44892K | 19,6 44894K |
| | | | | GrossWeightMeasure 44896K | | 0..1 44898K | Measure 44800L | 19,6 44802L |
| | | | | NetWeightMeasure 44804L | | 0..1 44806L | Measure 44808L | 19,6 44810L |
| | | | | AdditionalPackaging 44812L | | 0..n 44814L | | |
| | | | | | Product 44816L | 1 44818L | | |

Fig. 448EE

| | | | | | | |
|---|---|---|---|---|---|---|
| ReplenishmentOrderNotification 44820 | | | | | | |
| ReplenishmentOrder 44830 | | | | | | |
| HandlingUnit 44815A | | | InternalID 44820L | 0..1 44822L | ProductInternalID 44824L | 1..40 44826L |
| | | | StandardID 44828L | 0..1 44830L | ProductStandardID 44832L | 1..14 44834L |
| | | | BuyerID 44836L | 0..1 44838L | ProductPartyID 44840L | 1..40 44842L |
| | | | VendorID 44844L | 0..1 44846L | ProductPartyID 44848L | 1..40 44850L |
| | | Quantity 44852L | | 1 44854L | Quantity 44856L | 19,6 44858L |
| | LowerLevel HandlingUnit 44860L | | | 0..n 44862L | | |
| | | ID 44864L | | 1 44866L | HandlingUnitID 44868L | 1..20 44870L |

Fig. 448FF

| | | | | | |
|---|---|---|---|---|---|
| ReplenishmentOrderNotification 44820 | | | | | |
| ReplenishmentOrder 44830 | | | | | |
| HandlingUnit 44815A | | | | | |
| Load 44872L | | | 0..n 44874L | | |
| | BusinessTransactionDocumentReference 44876L | | | | |
| | | ItemID 44878L | 1 44880L | BusinessTransactionDocumentItemID 44882L | 1..10 44884L |
| | Quantity 44886L | | 1 44888L | Quantity 44890L | 19,6 44892L |

Fig. 451A

| Package 45100 | L1 45102 | L2 45104 | L3 45106 | L4 45108 | L5 45110 | L6 45112 | Card. 45114 | G/CDT 45116 | Lgh. 45120 |
|---|---|---|---|---|---|---|---|---|---|
| Vendor Generated Order 45124 | Vendor Generated Order 45126 | | | | | | 1 45128 | VendorGenerated Order 45130 | |
| Business Document Message Header 45134 | | Message Header 45138 | | | | | 1 45140 | BusinessDocument MessageHeader 45142 | |
| | | | ID 45148 | | | | 1 45150 | BusinessDocument MessageID 45152 | 1..35 45154 |
| | | | Reference ID 45158 | | | | 0..1 45160 | BusinessDocument MessageID 45162 | 1..35 45164 |
| | | | Creation DateTime 45168 | | | | 1 45170 | DateTime 45172 | |

Fig. 451B

Vendor Generated Order 45124

| | | | | | |
|---|---|---|---|---|---|
| BusinessDocument MessageHeader 45134 | | Sender Party 45176 | | 0..1 45178 | BusinessDocument MessageHeaderParty 45180 |
| | | | InternalID 45186 | 0..1 45188 | PartyInternalID 45190 |
| | | | StandardID 45194 | 0..n 45196 | PartyStandardID 45198 |
| | | Recipient Party 45102A | | 0..1 45104A | BusinessDocument MessageHeaderParty 45106A |
| | | | InternalID 45112A | 0..1 45114A | PartyInternalID 45116A |
| | | | StandardID 45120A | 0..n 45122A | PartyStandardID 45124A |
| Order 45136 | VendorGenerated Order 45128A | | | 1 45130A | VendorGenerated Order 45132A |

Fig. 451C

| Vendor Generated Order 45124 | | | | | | |
|---|---|---|---|---|---|---|
| Order 45136 | ID 45136A | | 0..1 45138A | BusinessTransactionDocumentID 45140A | 1..35 45142A |
| | CreationDateTime 45146A | | 1 45148A | DateTime 45150A | |
| Party 45154A | BuyerParty 45158A | | 0..1 45160A | BusinessTransactionDocumentParty 45162A | |
| | | InternalID 45168A | 0..1 45170A | PartyInternalID 45172A | 1..10 45174A |
| | | StandardID 45178A | 0..n 45180A | PartyStandardID 45182A | 1.. 13 / 9 45184A |
| | | BuyerID 45188A | 0..1 45190A | PartyPartyID 45192A | 1..10 45194A |
| | | VendorID 45198A | 0..1 45100B | PartyPartyID 45102B | 1..10 45104B |
| | VendorParty 45108B | | 0..1 45110B | BusinessTransactionDocumentParty 45112B | |

Fig. 451D

Vendor Generated Order 45124

Order 45136

| | | | | | |
|---|---|---|---|---|---|
| Party 45154A | | InternalID 45118B | 0..1 45120B | PartyInternalID 45122B | 1..10 45124B |
| | | StandardID 45128B | 0..n 45130B | PartyStandardID 45132B | 1..13 / 9 45134B |
| | | BuyerID 45138B | 0..1 45140B | PartyPartyID 45142B | 1..10 45144B |
| | | VendorID 45148B | 0..1 45150B | PartyPartyID 45152B | 1..10 45154B |
| | TransportMeans DesprictionCode 45158B | | 0..1 45160B | TransportMeans-DescriptionCode 45162B | 4 45164B |
| | GrossWeight Measure 45168B | | 0..1 45170B | Measure 45172B | 19,6 45174B |
| | NetWeightMeasure 45178B | | 0..1 45180B | Measure 45182B | 19,6 45184B |
| | Handling Unit 45188B | | 0..1 45190B | Measure 45192B | 19,6 45194B |
| | Note 45198B | | 0..1 45100C | Note 45102C | 1..132 45104C |

Fig. 451E

Vendor Generated Order 45124

Order 45136

| | | | | | |
|---|---|---|---|---|---|
| Item 45156A | Item 45108C | | 1..n 45110C | VendorGenerated OrderItem 45112C | |
| | | ID 45116C | 0..1 45118C | BusinessTransaction DocumentItemID 45120C | 1..10 45122C |
| | | AcceptanceStatus Code 45126C | 0..1 45128C | AcceptanceStatus Code 45129C | 2 45132C |
| | | Consignment Indicator 45136C | 0..1 45138C | Consignment Indicator 45140C | 1 45142C |
| BusinessTransaction DocumentReference 45146C | | SalesOrder Reference 45156C | 0..1 45158C | BusinessTransaction DocumentReference 45160C | |

Fig. 451F

| | | | | | | |
|---|---|---|---|---|---|---|
| Vendor Generated Order 45124 | | | | | | |
| Order 45136 | | | | | | |
| Item 45156A | | | | | | |
| Location 45148C | ShipFrom Location 45164C | | 0..1 45166C | BusinessTransactionDocumentShipFromLocation 45168C | | |
| | | InternalID 45174C | 0..1 45176C | LocationInternalID 45178C | 1..20 45180C | |
| | | StandardID 45184C | 0..n 45186C | LocationStandardID 45188C | 1..13 45190C | |
| | | BuyerID 45194C | 0..1 45196C | LocationPartyID 45198C | 1..20 45100D | |
| | | VendorID 45104D | 0..1 45106D | LocationPartyID 45108D | 1..20 45110D | |
| | | Loading Location 45114D | 0..1 45116D | BusinessTransactionDocumentLocation 45118D | | |

Fig. 451G

| | | | | |
|---|---|---|---|---|
| Vendor Generated Order 45124 | | | | |
| Order 45136 | | | | |
| Item 45156A | | | | |
| Location 45148C | | | | |
| Transshipment Location 45124D | | 0..1 45126D | BusinessTransactionDocument TransshipmentLocation 45128D | |
| | InternalID 45134D | 0..1 45136D | LocationInternalID 45138D | 1..20 45140D |
| | Standard ID 45144D | 0..n 45146D | LocationStandardID 45148D | 1..13 45150D |
| | BuyerID 45154D | 0..1 45156D | LocationPartyID 45158D | 1..20 45160D |
| | VendorID 45164D | 0..1 45166D | LocationPartyID 45168D | 1..20 45170D |
| | Address 45174D | 0..1 45176D | Address 45178D | |
| | Loading Location 45182D | 0..1 45184D | BusinessTransaction DocumentLocation 45186D | |

Fig. 451H

| | | | | |
|---|---|---|---|---|
| Vendor Generated Order 45124 | | | | |
| Order 45136 | | | | |
| Item 45156A | | | | |
| Location 45148C | | | | |
| | | | | |
| Level 1 | Level 2 | Cardinality | Type | Cardinality |
| | Unloading Location 45192D | 0..1 45194D | BusinessTransactionDocument Location 45196D | |
| ShipTo Location 45102E | | 1 45104E | BusinessTransactionDocument ShipToLocation 45106E | |
| | InternalID 45112E | 0..1 45114E | LocationInternalID 45116E | 1..20 45118E |
| | StandardID 45122E | 0..n 45124E | LocationStandard ID 45126E | 1..13 45128E |
| | BuyerID 45132E | 0..1 45134E | LocationPartyID 45136E | 1..20 45138E |
| | VendorID 45142E | 0..1 45144E | LocationPartyID 45146E | 1..20 45148E |
| | Unloading Location 45152E | 0..1 45154E | BusinessTransactionDocument Location 45156E | |

Fig. 451I

Vendor Generated Order 45124

Order 45136

Item 45156A

| | | | | | |
|---|---|---|---|---|---|
| ProductInformation 45150C | Product 45162E | | 1 45164E | BusinessTransaction DocumentProduct 45166E | |
| | | InternalID 45172E | 0..1 45174E | ProductInternalID 45176E | 1..40 45178E |
| | | StandardID 45182E | 0..1 45184E | ProductStandardID 45186E | 1..14 45188E |
| | | BuyerID 45192E | 0..1 45194E | ProductPartyID 45196E | 1..40 45198E |
| | | VendorID 45102F | 0..1 45104F | Product Party ID 45106F | 1..40 45108F |
| | | PackageQuantity 45112F | 0..1 45114F | Quantity 45116F | 19,6 45118F |
| Promotion 45152C | Promotion 45122F | | 0..1 45124F | | |
| | | InternalID 45128F | 0..1 45130F | PromotionInternalID 45132F | 1..35 45134F |

Fig. 451J

| | | | | | | |
|---|---|---|---|---|---|---|
| Vendor Generated Order 45124 | | | | | | |
| Order 45136 | | | | | | |
| Item 45156A | | | | | | |
| Promotion 45152C | | BuyerID 45138F | | 0..1 45140F | PromotionPartyID 45142F | 1..35 45144F |
| | | VendorID 45148F | | 0..1 45150F | PromotionPartyID 45152F | 1..35 45154F |
| | NetWeight Measure 45158F | | | 0..1 45160F | Measure 45162F | 19,6 45164F |
| | Note 45168F | | | 0..1 45170F | Note 45172F | 1..132 45174F |
| Schedule Line 45154C | Schedule Line 45178F | | | 1..n 45180F | VendorGenerated OrderItemSchedule Line 45182F | |
| | | Shipment GroupID 45186F | | 0..1 45188F | BusinessTransaction-DocumentGroupID 45190F | 1..10 45192F |

Fig. 451K

| | | | | | |
|---|---|---|---|---|---|
| Vendor Generated Order 45124 | | | | | |
| Order 45136 | | | | | |
| Item 45156A | | | | | |
| ScheduleLine 45154C | | DeliveryPeriod 45196F | 0..1 45198F | DateTimePeriod 45100G | |
| | | PickUpPeriod 45104G | 0..1 45106G | DateTimePeriod 45108G | |
| | | Quantity 45112G | 1 45114G | Quantity 45116G | 19,6 45118G |
| | Confirmed ScheduleLine 45122G | | 0..n 45124G | VendorGeneratedOrder ItemScheduleLine 45126G | |
| | | Shipment GroupID 45130G | 0..1 45132G | BusinessTransaction DocumentGroupID 45134G | 1..10 45136G |
| | | DeliveryPeriod 45140G | 0..1 45142G | DateTimePeriod 45144G | |
| | | PickUpPeriod 45148G | 0..1 45150G | DateTimePeriod 45152G | |

Fig. 451L

Vendor Generated Order 45124

Order 45136

Item 45156A

| | | | | | | | |
|---|---|---|---|---|---|---|---|
| Schedule Line 45154C | | | Quantity 45156G | | 1 45158G | Quantity 45160G | 19,6 45162G |
| Handling Unit 45166G | Handling Unit 45168G | | | | 0..n 45170G | HandlingUnit 45172 | |
| | | ID 45178G | | | 1 45180G | HandlingUnitID 45182G | 1..20 45184G |
| | | Load Carrier 45188G | | | 1 45190G | | |
| | | | Product 45194G | | 1 45196G | | |
| | | | | Internal ID 45100H | 0..1 45102H | ProductInternal ID 45104H | 1..40 45106H |

Fig. 451M

| | | | | | | | |
|---|---|---|---|---|---|---|---|
| Vendor Generated Order 45124 | | | | | | | |
| | Order 45136 | | | | | | |
| | | Handling Unit 45166G | | StandardID 45110H | 0..1 45112H | Product StandardID 45114H | 1..14 45116H |
| | | | | BuyerID 45120H | 0..1 45122H | ProductPartyID 45124H | 1..40 45126H |
| | | | | VendorID 45130H | 0..1 45132H | ProductPartyID 45134H | 1..40 45136H |
| | | | HeightMeasure 45140H | | 0..1 45142H | Measure 45144H | 19,6 45146H |
| | | | LengthMeasure 45150H | | 0..1 45152H | Measure 45154H | 19,6 45156H |
| | | | WidthMeasure 45160H | | 0..1 45162H | Measure 45164H | 19,6 45166H |
| | | | HandlingUnit 45170H | | 0..1 45172H | Measure 45174H | 19,6 45176H |

Fig. 451N

| | | | | | | | | | | |
|---|---|---|---|---|---|---|---|---|---|---|
| Vendor Generated Order 45124 | | | | | | | | | | |
| | Order 45136 | | | | | | | | | |
| | | HandlingUnit 45166G | | | GrossWeightMeasure 45180H | | | 0..1 45182H | Measure 45184H | 19,6 45186H |
| | | | | | Additional Packaging 45190H | | | 0..n 45192H | | |
| | | | | | | Product 45196H | | 1 45198H | | |
| | | | | | | | InternalID 45102I | 0..1 45104I | ProductInternalID 45106I | 1..40 45108I |
| | | | | | | | StandardID 45112I | 0..1 45114I | ProductStandardID 45116I | 1..14 45118I |
| | | | | | | | BuyerID 45122I | 0..1 45124I | ProductPartyID 45126I | 1..40 45128I |
| | | | | | | | VendorID 45132I | 0..1 45134I | ProductPartyID 45136I | 1..40 45138I |

Fig. 451O

| | | | | | | | | | |
|---|---|---|---|---|---|---|---|---|---|
| Vendor Generated Order 45124 | | | | | | | | | |
| Order 45136 | | | | | | | | | |
| Handling Unit 45166G | | | | | Quantity 45142I | | 1 45144I | Quantity 45146I | 19,6 45148I |
| | | | | LowerLevel HandlingUnit 45152I | | | 0..n 45154I | | |
| | | | | | ID 45158I | | 1 45160I | HandlingUnitID 45162I | 1..20 45164I |
| | | | | Load 45168I | | | 0..n 45170I | | |
| | | | | | BusinessTransaction DocumentReference 45174I | | | | |
| | | | | | | ItemID 45178I | 1 45180I | BusinessTransaction DocumentItemID 45182I | 1..10 45184I |
| | | | | | Quantity 45188I | | 1 45190I | Quantity 45192I | 19,6 45194I |

Fig. 455A

| Package 45500 | L1 45502 | L2 45504 | L3 45506 | L4 45508 | Card. 45510 | Type/Name 45512 | |
|---|---|---|---|---|---|---|---|
| BankAccount BalanceReport Response Message 45516 | BankAccount BalanceReport Response 45518 | | | | | MDT 45520 | BankAccountBalanc e ReportResponseMe ssage 45522 |
| MessageHeader 45526 | | MessageHeader 45528 | | | 0..1 45530 | GDT 45532 | BusinessDocument MessageHeader 45534 |
| | | | Reference ID 45538 | | 1 45540 | GDT 45542 | BusinessDocument MessageID 45544 |
| BankAccount BalanceReport 45548 | | BankAccount BalanceReport 45550 | | | 1 45552 | | BankAccountBalanc e Report 45556 |

Fig. 455B

BalanceReportResponse Message 45516

BankAccountBalanceReport 45548

| | | | | | | |
|---|---|---|---|---|---|---|
| Log 45560 | | Log 45562 | | 0..1 45564 | GDT 45566 | Log 45568 |
| BankAccount 45572 | | BankAccount 45574 | | 0..1 45576 | GDT 45578 | BusinessTransaction DocumentBankAccount 45580 |
| | | BankAccount Differentiator 45584 | | 0..1 45586 | | BankAccountDifferentiator 45590 |
| | | | ID 45594 | 0..1 45596 | GDT 45598 | BankAccountDifferentiatorID 45500A |
| BankAccount Balance 45504A | | BankAccountBalance 45506A | | 0..n 45508A | GDT 45510A | BankAccountBalance 45512A |

Fig. 456A

| Package 45600 | L1 45602 | L2 45604 | L3 45606 | L4 45608 | L5 45610 | Card. 45612 | Type/Name 45614 | |
|---|---|---|---|---|---|---|---|---|
| BankAccount Balance ReportQuery Message 45618 | Bank Account Balance Report Query 45620 | | | | | | MDT 45622 | BankAccountBalan ce ReportQueryMessa ge 45624 |
| Message Header 45628 | | Message Header 45630 | | | | 0..1 45632 | GDT 45634 | BusinessDocument MessageHeader 45636 |
| | | | ID 45640 | | | 1 45642 | GDT 45644 | BusinessDocument MessageID 45646 |
| Bank Account Balance Report Query 45650 | | Bank Account Balance Report Query 45652 | | | | 1 45654 | | BankAccountBalan ce ReportQuery 45658 |

Fig. 456B

BankAccountBalanceReportQuery Message 45618

BankAccountBalanceReportQuery 45650

| | | | | | |
|---|---|---|---|---|---|
| BankAccount 45662 | BankAccount 45664 | | 1 45666 | GDT 45668 | BusinessTransactionDocumentBankAccount 45670 |
| | BankAccount Differentiator 45674 | | 0..1 45676 | | BankAccountDifferentiator 45680 |
| | | ID 45684 | 0..1 45686 | GDT 45688 | BankAccountDifferentiator ID 45690 |
| Item 45694 | Item 45696 | | 1..n 45698 | | BankAccountBalance ReportQueryItem 45602A |
| | | BankAccount BalanceType Code 45606A | 1 45608A | GDT 45610A | BankAccount BalanceTypeCode 45612A |
| | | DatePeriod 45616A | 1 45618A | GDT 45620A | DatePeriod 45622A |

Fig. 459A

| Package 45900 | Level1 45902 | Level2 45904 | Level3 45906 | Level4 45908 | Card. 45910 | DataType Name 45912 | |
|---|---|---|---|---|---|---|---|
| BankAccountStatementMessage 45914 | BankAccountStatementMessage 45916 | | | | | MDT 45918 | BankAccountStatementMessage 45920 |
| MessageHeader 45922 | | MessageHeader 45926 | | | 1 45928 | GDT 45930 | MessageHeader 45932 |
| | | | ID 45934 | | 1 45936 | GDT 45938 | BusinessDocumentMessageID 45940 |
| | | | CreationDateTime 45942 | | 1 45944 | GDT 45946 | DateTime 45948 |
| | | | SenderParty 45950 | | 0..1 45952 | GDT 45954 | BusinessDocumentMessageHeaderParty 45956 |
| | | | ReceiverParty 45958 | | 0..n 45960 | GDT 45962 | BusinessDocumentMessageHeaderParty 45964 |

Fig. 459B

| BankAccountStatementMessage 45900 | | | | | | | | |
|---|---|---|---|---|---|---|---|---|
| | BankAccount Statement 45924 | | Bank Account Statement 45966 | | | 1 45968 | AGDT 45970 | BankAccountStatement 45972 |
| | | | | ID 45974 | | 1 45976 | GDT 45978 | BusinessTransactionDocumentID 45980 |
| | | | | Date 45982 | | 1 45984 | GDT 45986 | Date 45988 |
| | | | | Validity Period 45990 | | 0..1 45992 | GDT 45994 | DatePeriod 45996 |
| | | | | Opening Balance Amount 45998 | | 0..1 45902A | GDT 45904A | Amount 45906A |

Fig. 459C

| BankAccountStatementMessage 45900 | | | | | | | | |
|---|---|---|---|---|---|---|---|---|
| | | | | ClosingBalanceAmount 45908A | | 0..1 45910A | GDT 45912A | Amount 45914A |
| | | | | TotalDebit Amount 45916A | | 0..1 45918A | GDT 45920A | Amount 45922A |
| | | | | TotalCredit Amount 45924A | | 0..1 45926A | GDT 45928A | Amount 45930A |
| | | | | ItemTotalNumber Value 45932A | | 0..1 45934A | GDT 45936A | TotalNumberValue 45938A |

Fig. 459D

| BankAccountStatementMessage 45900 | | | | | | |
|---|---|---|---|---|---|---|
| BankAccount 45940A | | Bank Account 45942A | | 1 45944A | GDT 45946A | BusinessTransactionDocumentBankAccount 45968A |
| Item 45970A | | Item 45972A | | 0..n 45974A | AGDT 45976A | BankAccountStatementItem 45978A |
| | | | ID 45982A | 0..1 45984A | GDT 45986A | BusinessTransactionDocumentItemID 45988A |
| | | | PaymentTransactionTypeCode 45990A | 0..1 45992A | GDT 45994A | PaymentTransactionTypeCode 45996A |
| | | | PaymentTransactionTypeDescription 45998A | 0..1 45902B | GDT 45904B | Description 45906B |
| | | | ValueDate 45908B | 0..1 45910B | GDT 45912B | Date 45914B |
| | | | PostingDateTime 45916B | 0..1 45918B | GDT 45920B | DateTime 45922B |

Fig. 459E

| BankAccountStatementMessage 45900 | | | | | | | | | |
|---|---|---|---|---|---|---|---|---|---|
| | | | | | | PostingDate 45924B | 0..1 45926B | GDT 45928B | Date 45930B |
| | | | | | | Amount 45932B | 1 45934B | GDT 45936B | Amount 45938B |
| | | | | | | ExchangeRate 45940B | 0..1 45942B | GDT 45944B | ExchangeRate 45946B |
| | | | | | | BankChargeAmount 45948B | 0..1 45950B | GDT 45952B | Amount 45954B |
| | | | | | | OriginalCurrencyAmount 45956B | 0..1 45958B | GDT 45960B | Amount 45962B |

Fig. 459F

| BankAccountStatementMessage 45900 | | | | | | | | | |
|---|---|---|---|---|---|---|---|---|---|
| | | | | | | OriginalBankChargeAmount 45964B | 0..1 45966B | GDT 45968B | Amount 45970B |
| | | | | | | BankPaymentTransactionReferenceID 45972B | 0..1 45974B | GDT 45976B | PaymentTransactionReferenceID 45978B |
| | | | | | | BankPrimaNotaNote 45980B | 0..1 45982B | GDT 45984B | Note 45986B |
| | | | | | | Note 45988B | 0..n 45990B | GDT 45992B | Note 45994B |
| | | | Party 45980A | | | PaymentTransactionInitiatorParty 45996B | 0..1 45998B | GDT 45902C | BusinessTransactionDocumentParty 45904C |

Fig. 459G

| BankAccountStatementMessage 45900 | | | | | | | | | | |
|---|---|---|---|---|---|---|---|---|---|---|
| | | | | | | | PaymentTransactionDestinatedParty 45906C | 0..1 45908C | GDT 45910C | BusinessTransactionDocumentParty 45912C |
| | | | | | | | OriginalPaymentTransactionInitiatorParty 45914C | 0..1 45916C | GDT 45918C | BusinessTransactionDocumentParty 45920C |
| | | | | | | | FinalPaymentTransactionDestinatedParty 45922C | 0..1 45924C | GDT 45926C | BusinessTransactionDocumentParty 45928C |

Fig. 459H

| BankAccountStatementMessage 45900 | | | | | | | | | | |
|---|---|---|---|---|---|---|---|---|---|---|
| | | | Bank Account 45930C | | | | PaymentTransactionInitiatorBankAccount 45932C | 0..1 45934C | GDT 45936C | BusinessTransactionDocumentBankAccount 45938C |
| | | | | | | | PaymentTransaction Destinated BankAccount 45940C | 0..1 45942C | GDT 45944C | BusinessTransactionDocumentBankAccount 45946C |
| | | | | | | | PartnerBankAccount 45948C | 0..1 45950C | GDT 45952C | BusinessTransactionDocumentBankAccount 45954C |
| | | | BusinessTransactionDocumentReference 45956C | | | | Payment Reference 45958C | 0..1 45960C | GDT 45962C | BusinessTransactionDocumentReference 45964C |

Fig. 459I

| BankAccountStatementMessage 45900 | | | | | | | | | | |
|---|---|---|---|---|---|---|---|---|---|---|
| | | | | | | | PaymentOrderReference 45966C | 0..1 45968C | GDT 45970C | BusinessTransactionDocumentReference 45972C |
| | | | | | | | ChequeReference 45974C | 0..1 45976C | GDT 45978C | BusinessTransactionDocumentReference 45980C |
| | | | | | | | BillOfExchangeReference 45982C | 0..1 45984C | GDT 45986C | BusinessTransactionDocumentReference 45988C |
| | | | PaymentExplanationItem | | | | PaymentExplanationItem 45990C | 0..n 45992C | GDT 45994C | PaymentExplanationItem 45996C |

Fig. 462

| Package 46200 | level1 46202 | level2 46204 | level3 46206 | level4 46208 | Cardinality 46210 | Data Type Name 46212 | |
|---|---|---|---|---|---|---|---|
| BusinessTransactionDocumentImageRecognitionRequestMessage 46214 | BusinessTransactionDocument ImageRecognitionRequest 46216 | | | | | MDT 46218 | BusinessTransactionDocumentImageRecognitionRequestMessage 46220 |
| BusinessTransactionDocument ImageRecognition 46222 | | Business TransactionDocument ImageRecognition 46224 | | | 1 46226 | | BusinessTransactionDocumentImageRecognition 46228 |
| | | | BusinessTransactionDocument TypeCode 46230 | | 1 46232 | GDT 46234 | BusinessTransactionDocumentTypeCode 46236 |
| Attachment 46238 | | | Attachment 46240 | | 1..n 46242 | GDT 46244 | Attachment 46246 |

Fig. 465A

| Package 46500 | level 1 46502 | level 2 46504 | level 3 46506 | level 4 46508 | level 5 46510 | Card. 46512 | Data Type Name 46514 | |
|---|---|---|---|---|---|---|---|---|
| CollectivePaymentOrderMessage 46516 | CollectivePaymentOrderMessage 46518 | | | | | | MDT 46520 | CollectivePaymentOrderMessage 46522 |
| MessageHeader 46524 | | MessageHeader 46526 | | | | 1 46528 | GDT 46530 | MessageHeader 46532 |
| | | | ID 46534 | | | 1 46536 | GDT 46538 | BusinessDocumentMessageID 46540 |
| | | | CreationDateTime 46542 | | | 1 46544 | GDT 46546 | DateTime 46548 |
| | | | SenderParty 46550 | | | 0..1 46552 | GDT 46554 | BusinessDocumentMessageHeaderParty 46556 |
| | | | ReceiverParty 46558 | | | 0..n 46560 | GDT 46562 | BusinessDocumentMessageHeaderParty 46564 |

Fig. 465B

| CollectivePaymentOrderMessage 46516 | | | | | | | |
|---|---|---|---|---|---|---|---|
| CollectivePayment Order 46566 | | CollectivePaymentOrder 46568 | | | | 1 46570 | AGDT 46572 | CollectivePaymentOrder 46574 |
| | | | ID 46576 | | | 0..1 46578 | GDT 46580 | BusinessTransactionDocumentID 46582 |
| | | | PaymentFormCode 46584 | | | 1 46588 | GDT 46590 | PaymentFormCode 46592 |
| | | | PaymentProcedureCode 46594 | | | 1 46596 | GDT 46598 | PaymentProcedureCode 46500A |
| | | | AccountDebitIndicator 46502A | | | 1 46504A | GDT 46506A | Account DebitIndicator 46508A |
| | | | PaymentExecutionDate 46510A | | | 1 46512A | GDT 46514A | Date 46516A |
| | | | PaymentTransactionInitiatorBankAccountValueDate 46518A | | | 0..1 46520A | GDT 46522A | Date 46524A |

Fig. 465C

CollectivePaymentOrderMessage 46516

| | | | | | |
|---|---|---|---|---|---|
| | PaymentTransactionDestinatedBankAccountValueDate 46526A | | 0..1 46528A | GDT 46530A | Date 46532A |
| | TotalNetAmount 46534A | | 0..1 46536A | GDT 46538A | Amount 46540A |
| | PaymentOrderTotalNumberValue 46542A | | 0..1 46544A | GDT 46546A | TotalNumberValue 46548A |
| Party 46550A | PaymentTransactionInitiatorParty 46552A | | 0..1 46554A | CDT 46556A | BusinessTransactionDocumentParty 46558A |
| BankAccount 46560A | PaymentTransactionInitiatorBankAccount 46562A | | 0..1 46564A | GDT 46566A | BusinessTransactionDocumentBankAccount 46568A |
| | BankChargesBankAccount 46570A | | 0..1 46572A | GDT 46574A | BusinessTransactionDocumentBankAccount 46576A |
| Payment Order 46578A | PaymentOrder 46580A | | 1..n 46582A | AGDT 46584A | PaymentOrder 46586A |
| | | ID 46588A | 0..1 46590A | GDT 46592A | BusinessTransactionDocumentID 46594A |
| | | BillOfExchangeDueDate 46596A | 0..1 46598A | GDT 46500B | Date 46502B |

Fig. 465D

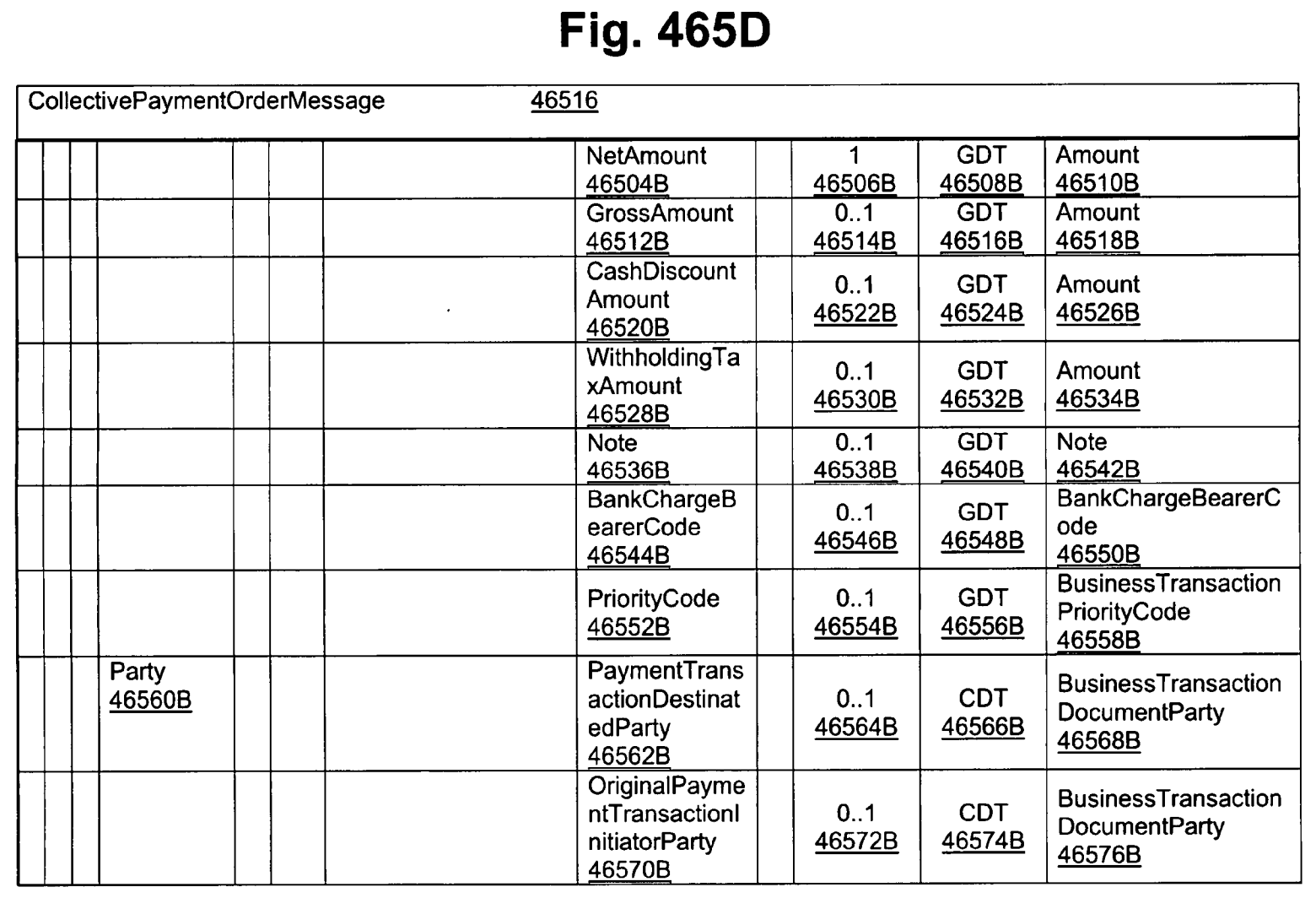

| CollectivePaymentOrderMessage 46516 | | | | |
|---|---|---|---|---|
| | NetAmount 46504B | 1 46506B | GDT 46508B | Amount 46510B |
| | GrossAmount 46512B | 0..1 46514B | GDT 46516B | Amount 46518B |
| | CashDiscount Amount 46520B | 0..1 46522B | GDT 46524B | Amount 46526B |
| | WithholdingTa xAmount 46528B | 0..1 46530B | GDT 46532B | Amount 46534B |
| | Note 46536B | 0..1 46538B | GDT 46540B | Note 46542B |
| | BankChargeB earerCode 46544B | 0..1 46546B | GDT 46548B | BankChargeBearerC ode 46550B |
| | PriorityCode 46552B | 0..1 46554B | GDT 46556B | BusinessTransaction PriorityCode 46558B |
| Party 46560B | PaymentTrans actionDestinat edParty 46562B | 0..1 46564B | CDT 46566B | BusinessTransaction DocumentParty 46568B |
| | OriginalPayme ntTransactionI nitiatorParty 46570B | 0..1 46572B | CDT 46574B | BusinessTransaction DocumentParty 46576B |

Fig. 465E

| CollectivePaymentOrderMessage 46516 | | | | | | | |
|---|---|---|---|---|---|---|---|
| | | FinalPaymentTransactionDestinatedParty 46578B | | 0..1 46580B | CDT 46582B | BusinessTransactionDocumentParty 46584B |
| | BankAccount 46586B | PaymentTransactionDestinatedBankAccount 46588B | | 0..1 46590B | GDT 46592B | BusinessTransactionDocumentBankAccount 46594B |
| | Payment Instruction 46596B | PaymentInstruction 46598B | | 0..n 46500C | GDT 46502C | PaymentInstruction 46504C |
| | | CorrespondenceBankDetails 46506C | | 0..3 46508C | AGDT 46510C | PaymentOrderCorrespondenceBankDetails 46512C |
| | | | CorrespondenceBankTypeCode 46514C | 1 46516C | GDT 46518C | CorrespondenceBankTypeCode 46520C |
| | | | Bank 46522C | 0..1 46524C | GDT 46526C | Bank 46528C |
| | | | BankAccount 46530C | 0..1 46532C | GDT 46534C | BusinessTransactionDocumentBankAccount 46536C |
| | StateCentralBankReport 46538C | CentralBankReportItem 46540C | | 0..n 46542C | GDT 46544C | CentralBankReportItem 46546C |

Fig. 465F

| CollectivePaymentOrderMessage 46516 | | | | | |
|---|---|---|---|---|---|
| BusinessTransactionDocumentReference 46548C | PaymentReference 46550C | | 0..1 46552C | GDT 46554C | BusinessTransactionDocumentReference 46556C |
| | ChequeReference 46558C | | 0..1 46560C | GDT 46562C | BusinessTransactionDocumentReference 46564C |
| | BillOfExchangeReference 46566C | | 0..1 46568C | GDT 46570C | BusinessTransactionDocumentReference 46572C |
| PaymentExplanation 46574C | PaymentExplanationItem 46576C | | 0..n 46578C | GDT 46580C | PaymentExplanationItem 46582C |

Fig. 468A

| Package 46800 | level1 46802 | level2 46804 | level3 46806 | level4 46808 | level5 46810 | Card. 46812 | Data Type Name 46814 | |
|---|---|---|---|---|---|---|---|---|
| CreditPayment BehaviourSummary Message 46816 | CreditPa ymentBe haviourS ummary Message 46818 | | | | | 1 46820 | MDT 46822 | CreditPayment BehaviourSummary Message 46824 |
| CreditPaymentBeh aviourSummary 46826 | | CreditPa ymentBe haviourS ummary 46828 | | | | 1 46830 | | CreditPayment BehaviourSummary 46832 |
| | | | CreditSe gmentInt ernalID 46834 | | | 0..1 46836 | GDT 46838 | CreditSegment InternalID 46840 |

Fig. 468B

| CreditPaymentBehaviourSummaryMessage 46816 | | | | | | | | | | |
|---|---|---|---|---|---|---|---|---|---|---|
| | | Party 46842 | | | DebtorParty 46844 | | | 1 46846 | GDT 46848 | BusinessTransactionDocumentParty 46850 |
| | | | | | | InternalID 46852 | | 1 46854 | GDT 46856 | PartyInternalID 46858 |
| | | | | | CreditorParty 46860 | | | 0..1 46862 | GDT 46864 | BusinessTransactionDocumentParty 46866 |
| | | | | | | InternalID 46868 | | 1 46870 | GDT 46872 | PartyInternalID 46874 |
| | | | | | SellerParty 46876 | | | 0..1 46878 | GDT 46880 | BusinessTransactionDocumentParty 46882 |
| | | | | | | InternalID 46884 | | 1 46886 | GDT 46888 | PartyInternalID 46890 |

Fig. 468C

| | | | | | | | | | |
|---|---|---|---|---|---|---|---|---|---|
| CreditPaymentBehaviourSummaryMessage 46816 | | | | | | | | | |
| | | Product Information 46892 | | | Product Category 46894 | | | 0..1 46896 | GDT 46898 | BusinessTransactionDocument ProductCategory 468100 |
| | | | | | | InternalID 468102 | | 1 468104 | GDT 468106 | ProductCategoryInternalID 468108 |
| | | Payment Information 468110 | | | LastPayment 468112 | | | 0..1 468114 | | CreditPaymentBehaviourSummaryLastPayment 468116 |
| | | | | | | ID 468118 | | 1 468120 | GDT 468122 | BusinessTransactionDocumentID 468124 |
| | | | | | | Amount 468126 | | 1 468128 | GDT 468130 | Amount 468132 |
| | | | | | | Date 468134 | | 1 468136 | GDT 468138 | Date 468140 |

Fig. 468D

| CreditPaymentBehaviourSummaryMessage 46816 | | | | |
|---|---|---|---|---|
| Oldest OpenItem 468142 | | 0..1 468144 | | CreditPaymentBehaviourSummary OldestOpenItem 468146 |
| | AccountingDocumentID 468148 | 1 468150 | GDT 468152 | BusinessTransactionDocumentID 468154 |
| | AccountingDocumentItemID 468156 | 1 468158 | GDT 468160 | BusinessTransactionDocumentItemID 468162 |
| | Amount 468164 | 1 468166 | GDT 468168 | Amount 468170 |
| | OverdueNetDate 468172 | 1 468174 | GDT 468176 | Date 468178 |

Fig. 468E

| CreditPaymentBehaviourSummaryMessage 46816 | | | | | | | | | | |
|---|---|---|---|---|---|---|---|---|---|---|
| | | | | | MaximumLevelDunnedOpenItem 468180 | | | 0..1 468182 | | CreditPaymentBehaviourSummaryMaximumLevelDunnedOpenItem 468184 |
| | | | | | | AccountingDocumentID 468186 | | 1 468188 | GDT 468190 | BusinessTransactionDocumentID 468192 |
| | | | | | | AccountingDocumentItemID 468194 | | 1 468196 | GDT 468198 | BusinessTransactionDocumentItemID 468200 |
| | | | | | | Amount 468202 | | 1 468204 | GDT 468206 | Amount 468208 |
| | | | | | | MaximumLevelDunningDate 468210 | | 1 468212 | GDT 468214 | Date 468216 |

Fig. 468F

| CreditPaymentBehaviourSummaryMessage 46816 | | | | | | | | | | |
|---|---|---|---|---|---|---|---|---|---|---|
| | | | | | | DunningLevelValue 468218 | | 1 468220 | GDT 468222 | DunningLevelValue 468224 |
| | | | | | DunningCounterValue 468226 | | | 0..1 468228 | GDT 468230 | DunningCounterValue 468232 |
| | | | | | CumulatedReceivablesAmount 468234 | | | 0..1 468236 | GDT 468238 | Amount 468240 |
| | | | | | DaysOfSalesOutstandingDuration 468242 | | | 0..1 468244 | GDT 468246 | Duration 468248 |
| | | | | | OverdueOpenItemsPercent 468250 | | | 0..1 468252 | GDT 468254 | Percent 468256 |

Fig. 468G

| CreditPaymentBehaviourSummaryMessage 46816 | | | | | | | | | | | |
|---|---|---|---|---|---|---|---|---|---|---|---|
| | | | | | LastTwelveMonths MaximumCredit ExposureAmount 468258 | | | 0..1 468260 | GDT 468262 | Amount 468264 |
| | | | | | LastTwelveMonthsSalesV olumeAmount 468266 | | | 0..1 468268 | GDT 468270 | Amount 468272 |
| | | | | | CollectionAgency SubmittedAmount 468274 | | | 0..1 468276 | GDT 468278 | Amount 468280 |
| | | | | | WithoutDiscount Payments 468282 | | | 0..1 468284 | | CreditPaymentBeh aviourSummary Payments 468286 |
| | | | | | | AverageArrears Duration 468288 | | 1 468290 | GDT 468292 | Duration 468294 |

Fig. 468H

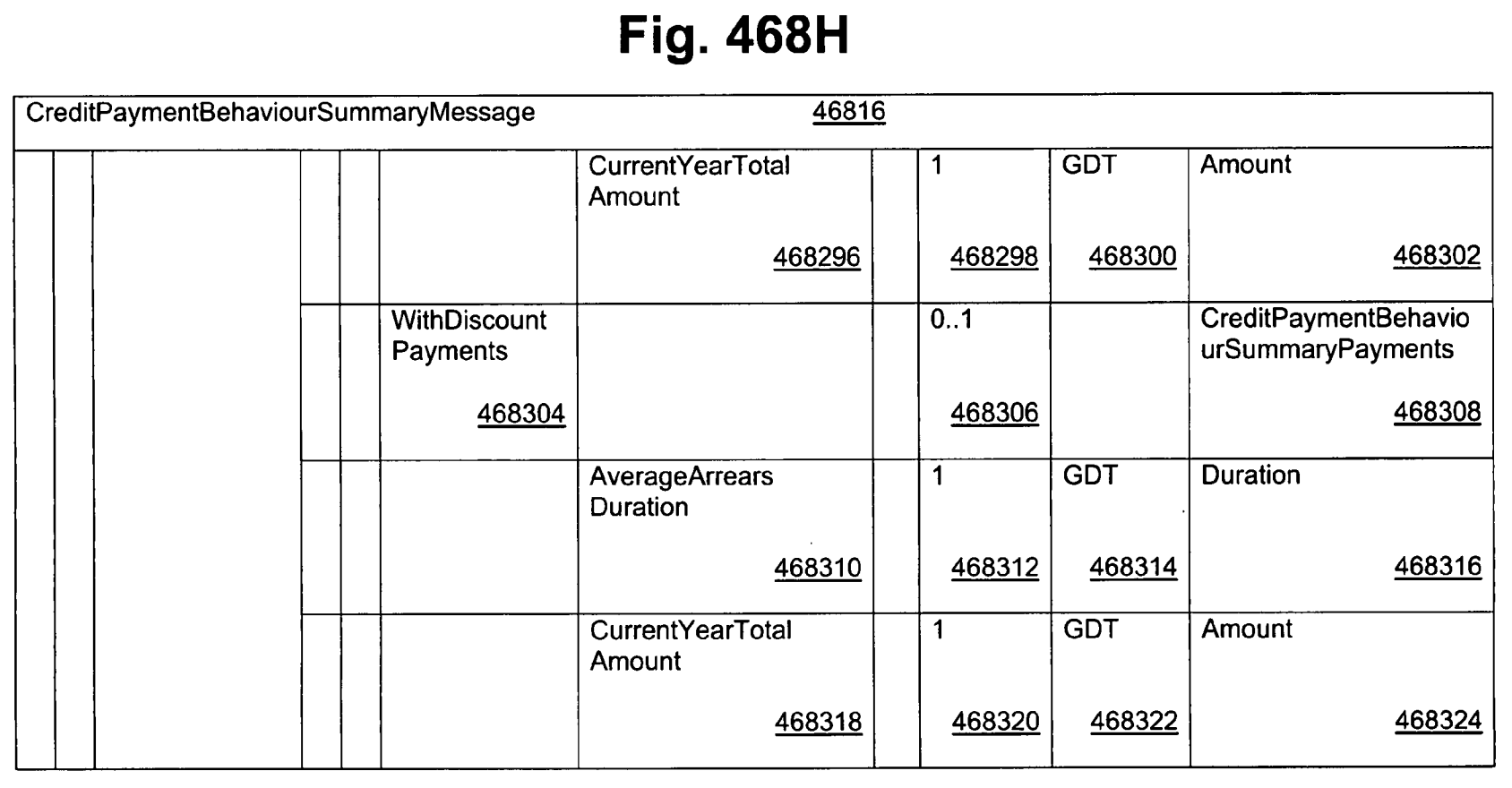

| CreditPaymentBehaviourSummaryMessage 46816 | | | | | | | | | | |
|---|---|---|---|---|---|---|---|---|---|---|
| | | | | | | CurrentYearTotal Amount 468296 | | 1 468298 | GDT 468300 | Amount 468302 |
| | | | | | WithDiscount Payments 468304 | | | 0..1 468306 | | CreditPaymentBehaviourSummaryPayments 468308 |
| | | | | | | AverageArrears Duration 468310 | | 1 468312 | GDT 468314 | Duration 468316 |
| | | | | | | CurrentYearTotal Amount 468318 | | 1 468320 | GDT 468322 | Amount 468324 |

Fig. 471A

| Package 47100 | Level1 47102 | Level2 47104 | Level3 47106 | Level4 47108 | Level5 47110 | Level6 47112 | Card. 47114 | DataType Name 47116 | |
|---|---|---|---|---|---|---|---|---|---|
| CustomsVendorDeclarationMessage 47118 | CustomsVendorDeclarationMessage 47120 | | | | | | | MDT 47122 | CustomsVendorDeclarationMessage 47124 |
| MessageHeader 47126 | | MessageHeader 47128 | | | | | 1 47130 | GDT 47132 | BusinessDocumentMessageHeader 47134 |
| | | | ID 47136 | | | | 1 47138 | GDT 47140 | BusinessDocumentMessageID 47142 |
| | | | ReferenceID 47144 | | | | 0..1 47146 | GDT 47148 | BusinessDocumentMessageID 47150 |
| | | | CreationDateTime 47152 | | | | 1 47154 | GDT 47156 | DateTime 47158 |

Fig. 471B

| CustomsVendorDeclarationMessage 47118 | | | | | | | | | |
|---|---|---|---|---|---|---|---|---|---|
| CustomsVendorDeclaration 47160 | | CustomsVendorDeclaration 47162 | | | | | 1 47164 | XXX 47166 | CustomsVendorDeclaration 47168 |
| | | | ID 47170 | | | | 0..1 47172 | GDT 47174 | BusinessTransactionDocumentID 47176 |
| | | | BuyerID 47178 | | | | 0..1 47180 | GDT 47182 | BusinessTransactionDocumentID 47184 |
| | | | CreationDate 47186 | | | | 1 47188 | GDT 47190 | Date 47192 |
| Party 47194 | | | BuyerParty 47196 | | | | 1 47198 | GDT 47100A | BusinessTransactionDocumentParty 47102A |
| | | | | InternalID 47104A | | | 0..1 47106A | GDT 47108A | PartyInternalID 47110A |
| | | | | BuyerID 47112A | | | 0..1 47114A | GDT 47116A | PartyPartyID 47118A |

Fig. 471C

| CustomsVendorDeclarationMessage 47118 | | | | | | | | | | | |
|---|---|---|---|---|---|---|---|---|---|---|---|
| | | | | | | VendorID 47120A | | | 0..1 47122A | GDT 47124A | PartyPartyID 47126A |
| | | | | | | Address 47128A | | | 1 47130A | GDT 47132A | Address 47134A |
| | | | | | | Contact Person 47136A | | | 0..1 47138A | GDT 47140A | ContactPerson 47142A |
| | | | | | | | Address 47144A | | 1 47146A | GDT 47148A | Address 47150A |
| | | | | | VendorParty 47152A | | | | 1 47154A | GDT 47156A | BusinessTransactionDocumentParty 47158A |
| | | | | | | InternalID 47160A | | | 0..1 47162A | GDT 47164A | PartyInternalID 47166A |
| | | | | | | BuyerID 47168A | | | 0..1 47170A | GDT 47172A | PartyPartyID 47174A |

Fig. 471D

CustomsVendorDeclarationMessage 47118

| | | | | | | | | | |
|---|---|---|---|---|---|---|---|---|---|
| | | | | VendorID 47176A | | | 0..1 47178A | GDT 47180A | PartyPartyID 47182A |
| | | | | Address 47184A | | | 1 47186A | GDT 47188A | Address 47190A |
| | | | | Contact Person 47192A | | | 0..1 47194A | GDT 47196A | ContactPerson 47198A |
| | | | | | Address 47100B | | 1 47102B | GDT 47104B | Address 47106B |
| Attachment 47108B | | | Attachment 47110B | | | | 0..n 47112B | GDT 47114B | Attachment 47116B |
| Item 47118B | | | Item 47120B | | | | 0..n 47122B | XXX 47124B | CustomsVendorDeclarationItem 47126B |
| | | | | ValidityPeriod 47128B | | | 1 47130B | GDT 47132B | DatePeriod 47134B |

Fig. 471E

| CustomsVendorDeclarationMessage 47118 | | | | | | | | | | |
|---|---|---|---|---|---|---|---|---|---|---|
| | | | | Preferen tialOrigin Country Code 47136B | | | 0..1 47138B | GDT 47140B | CountyCode 47142B |
| | | | | CustomsCommodity ClassificationCode 47144B | | | 0..1 47146B | GDT 47148B | CustomsCommodityClassificationCode 47150B |
| ProductInformation 47152B | | | | Product 47154B | | | 1 47156B | GDT 47158B | BusinessTransactionDocumentProduct 47160B |
| | | | | | InternalID 47162B | | 0..1 47164B | GDT 47166B | ProductInternalID 47168B |

Fig. 471F

| CustomsVendorDeclarationMessage 47118 | | | | | | | | | | | | |
|---|---|---|---|---|---|---|---|---|---|---|---|---|
| | | | | | | | | BuyerID 47170B | | 0..1 47172B | GDT 47174B | ProductPartyID 47176B |
| | | | | | | | | VendorID 47178B | | 0..1 47180B | GDT 47182B | ProductPartyID 47184B |
| | | | | | | | | Note 47186B | | 0..1 47188B | GDT 47190B | Note 47192B |
| | | | CustomsInformation 47194B | | | | PreferentialStatement 47196B | | | 0..n 47198B | XXX 47100C | CustomsVendorDeclarationItemPreferentialStatement 47102C |
| | | | | | | | | StatusCode 47104C | | 0..1 47106C | GDT 47108C | CustomPreferentialStatementStatusCode 47110C |

Fig. 471G

| CustomsVendorDeclarationMessage 47118 | | | | | | | | | | | | |
|---|---|---|---|---|---|---|---|---|---|---|---|---|
| | | | | | | | | DestinationCountryCode 47112C | | 1 47114C | GDT 47116C | CountryCode 47118C |
| | | | | | | | | NonPreferentialCommodityConstituent 47122C | | 0..n 47124C | XXX 47126C | CustomsVendorDeclarationItemPreferentialStatementNonPreferentialProductConstituent 47128C |
| | | | | | | | | | ID 47130C | 1 47132C | CCT 47134C | Identifier 47136C |
| | | | | | | | | | CustomsCommodityClassificationCode 47138C | 1 47140C | GDT 47142C | CustomsCommodityClassificationCode 47144C |
| | | | | | | | | | Amount 47146C | 1 47148C | GDT 47150C | Amount 47152C |

Fig. 477A

| Package 47700 | L1 47702 | L2 47704 | L3 47706 | L4 47708 | L5 47710 | Card. 47712 | Type/Name 47714 | |
|---|---|---|---|---|---|---|---|---|
| Invoice Message 47718 | Invoice Message 47720 | | | | | | MDT 47722 | InvoiceMessage 47724 |
| Message Header 47728 | | Message Header 47730 | | | | 0..1 47732 | GDT 47734 | MessageHeader 47736 |
| | | | ID 47740 | | | 1 47742 | GDT 47744 | MessageID 47746 |
| | | | Reference ID 47750 | | | 0..1 47752 | GDT 47754 | MessageID 47756 |
| | | | Creation DateTime 47760 | | | 1 47762 | GDT 47764 | DateTime 47766 |
| | | | SenderParty 47770 | | | 0..1 47772 | GDT 47774 | BusinessDocument MessageHeader Party 47776 |
| | | | Recipient Party 47780 | | | 0..1 47782 | GDT 47784 | BusinessDocument MessageHeader Party 47786 |

Fig. 477B

InvoiceMessage 47718

| | | | | | | | | | |
|---|---|---|---|---|---|---|---|---|---|
| Invoice 47790 | | Invoice 47792 | | | | 1 47794 | | |
| | | | ID 47798 | | | 1 47700A | GDT 47702A | BusinessTransaction DocumentID 47704A |
| | | | BillToID 47708A | | | 0..1 47710A | GDT 47712A | BusinessTransaction DocumentID 47714A |
| | | | TypeCode 47718A | | | 1 47720A | GDT 47722A | BusinessTransaction DocumentTypeCode 47724A |
| | | | DateTime 47728A | | | 1 47730A | GDT 47732A | DateTime 47734A |
| | | | Cancellation Invoice Indicator 47738A | | | 0..1 47740A | GDT 47742A | InvoiceCancellationInvoice Indicator 47744A |
| | | | Acceptance StatusCode 47748A | | | 0..1 47750A | GDT 47752A | AcceptanceStatusCode 47754A |
| | | | Note 47758A | | | 0..1 47760A | GDT 47762A | Note 47764A |

Fig. 477C

| | | | | | |
|---|---|---|---|---|---|
| InvoiceMessage 47718 | | | | | |
| Invoice 47790 | | | | | |
| Party 47768A | BillToParty 47770A | 1 47772A | GDT 47774A | BusinessTransactionDocumentParty 47776A | |
| | BillFromParty 47780A | 1 47782A | GDT 47784A | BusinessTransactionDocumentParty 47786A | |
| | BuyerParty 47790A | 0..1 47792A | GDT 47794A | BusinessTransactionDocumentParty 47796A | |
| | SellerParty 47700B | 0..1 47702B | GDT 47704B | BusinessTransactionDocumentParty 47706B | |
| | ProductRecipientParty 47710B | 0..1 47712B | GDT 47714B | BusinessTransactionDocumentParty 47716B | |
| | VendorParty 47720B | 0..1 47722B | GDT 47724B | BusinessTransactionDocumentParty 47726B | |
| | ManufacturerParty 47730B | 0..1 47732B | GDT 47734B | BusinessTransactionDocumentParty 47736B | |
| | PayerParty 47740B | 0..1 47742B | GDT 47744B | BusinessTransactionDocumentParty 47746B | |
| | PayeeParty 47750B | 0..1 47752B | GDT 47754B | BusinessTransactionDocumentParty 47756B | |
| | CarrierParty 47760B | 0..1 47762B | GDT 47764B | BusinessTransactionDocumentParty 47766B | |

Fig. 477D

InvoiceMessage 47718

Invoice 47790

| | | | | | |
|---|---|---|---|---|---|
| Location 47770B | ShipToLocation 47772B | | 0..1 47774B | GDT 47776B | BusinessTransactionDocumentLocation 47778B |
| | ShipFromLocation 47782B | | 0..1 47784B | GDT 47786B | BusinessTransactionDocumentLocation 47788B |
| DeliveryInformation 47792B | DeliveryTerms 47794B | | 0..1 47796B | GDT 47798B | DeliveryTerms 47700C |
| PaymentInformation 47704C | CashDiscountTerms 47706C | | 0..1 47708C | GDT 47710C | CashDiscountTerms 47712C |
| | PaymentForm 47716C | | 0..1 47718C | | |
| | | Code 47722C | 0..1 47724C | GDT 47726C | PaymentFormCode 47728C |
| | | PaymentCard 47732C | 0..1 47734C | GDT 47736C | PaymentCard 47738C |

Fig. 477E

| | | | | | | |
|---|---|---|---|---|---|---|
| InvoiceMessage 47718 | | | | | | |
| Invoice 47790 | | | | | | |
| Price Information 47742C | Price 47744C | | 1 47746C | | |
| | | GrossAmount 47750C | 1 47752C | GDT 47754C | Amount 47756C |
| | | NetAmount 47760C | 0..1 47762C | GDT 47764C | Amount 47766C |
| | | TaxAmount 47770C | 0..1 47772C | GDT 47774C | Amount 47776C |
| | | ExchangeRate 47780C | 0..1 47782C | GDT 47784C | ExchangeRate 47786C |
| Tax 47790C | ProductTax 47792C | | 0..n 47794C | GDT 47796C | ProductTax 47798C |
| Attachment 47702D | Attachment 47704D | | 0..n 47706D | GDT 47708D | Attachment 47710D |
| Description 47712D | Description 47714D | | 0..1 47716D | GDT 47718D | Description 47720D |
| | Confirmed Description 47724D | | 0..1 47726D | GDT 47728D | Description 47730D |

Fig. 477F

| | | | | | | | |
|---|---|---|---|---|---|---|---|
| InvoiceMessage 47718 | | | | | | | |
| Invoice 47790 | | | | | | | |
| Item 47734D | Item 47736D | | | 1..n 47738D | | | |
| | | ID 47742D | | 1 47744D | GDT 47746D | BusinessTransaction DocumentItemID 47748D |
| | | BillToID 47752D | | 0..1 47754D | GDT 47756D | BusinessTransaction DocumentItemPartyID 47758D |
| | | TypeCode 47762D | | 1 47764D | GDT 47766D | BusinessTranscation DocumentItemTypeCode 47768D |
| | | Quantity 47772D | | 0..1 47774D | GDT 47776D | Quantity 47778D |
| | | Hierarchy Relationship 47782D | | 0..1 47784D | | |
| | | | ParentItemID 47788D | 1 47790D | GDT 47792D | BusinessTransaction DocumentItemID 47794D |
| | | | TypeCode 47798D | 1 47700E | CDT 47702E | ItemHierarchyRelationship TypeCode 47704E |
| | | DeliveryPeriod 47708E | | 0..1 47710E | GDT 47712E | DateTimePeriod 47714E |

Fig. 477G

| | | | | | | |
|---|---|---|---|---|---|---|
| InvoiceMessage 47718 | | | | | | |
| Invoice 47790 | | | | | | |
| Item 47734D | | | | | | |
| Product Information 47718E | Product 47720E | | 0..1 47722E | GDT 47724E | BusinessTransactionDocumentProduct 47726E |
| | ProductCategory 47730E | | 0..1 47732E | GDT 47734E | BusinessTransactionDocumentProductCategory 47736E |
| Price Information 47740E | Price 47742E | | 0..1 47744E | | |
| | | GrossAmount 47748E | 0..1 47750E | GDT 47752E | Amount 47754E |
| | | NetAmount 47758E | 1 47760E | GDT 47762E | Amount 47764E |
| | | TaxAmount 47768E | 0..1 47770E | GDT 47772E | Amount 47774E |
| | | NetUnitPrice 47778E | 0..1 47780E | GDT 47782E | Price 47784E |
| | | ExchangeRate 47788E | 0..1 47790E | GDT 47792E | ExchangeRate 47794E |
| | | PricingDate 47798E | 0..1 47700F | GDT 47702F | Date 47704F |
| | | Component 47708F | 0..n 47710F | GDT 47712F | PriceComponent 47714F |

Fig. 477H

| | | | | |
|---|---|---|---|---|
| InvoiceMessage 47718 | | | | |
| Invoice 47790 | | | | |
| Item 47734D | | | | |
| Tax 47718F | ProductTax 47720F | 0..n 47722F | GDT 47724F | ProductTax 47726F |
| Party 47730F | BuyerParty 47732F | 0..1 47734F | GDT 47736F | BusinessTransactionDocumentParty 47738F |
| | SellerParty 47742F | 0..1 47744F | GDT 47746F | BusinessTransactionDocumentParty 47748F |
| | ProductRecipientParty 47752F | 0..1 47754F | GDT 47756F | BusinessTransactionDocumentParty 47758F |
| | VendorParty 47762F | 0..1 47764F | GDT 47766F | BusinessTransactionDocumentParty 47768F |
| | ManufacturerParty 47772F | 0..1 47774F | GDT 47776F | BusinessTransactionDocumentParty 47778F |
| | CarrierParty 47782F | 0..1 47784F | GDT 47786F | BusinessTransactionDocumentParty 47788F |
| Location 47792F | ShipToLocation 47794F | 0..1 47796F | GDT 47798F | BusinessTransactionDocumentLocation 47700G |
| | ShipFromLocation 47704G | 0..1 47706G | GDT 47708G | BusinessTransactionDocumentLocation 47710G |

Fig. 477I

| | | | | |
|---|---|---|---|---|
| InvoiceMessage 47718 | | | | |
| Invoice 47790 | | | | |
| Item 47734D | | | | |
| Delivery Information 47714G | DeliveryTerms 47716G | 0..1 47718G | GDT 47720G | DeliveryTerms 47722G |
| Business Transaction Document Reference 47726G | PurchaseOrder Reference 47728G | 0..n 47730G | GDT 47732G | BusinessTransaction DocumentReference 47734G |
| | SalesOrderReference 47738G | 0..n 47740G | GDT 47742G | BusinessTransaction DocumentReference 47744G |
| | DeliveryReference 47748G | 0..1 47750G | GDT 47752G | BusinessTransaction DocumentReference 47754G |
| | ServiceAcknowledgement Reference 47758G | 0..1 47760G | GDT 47762G | BusinessTransaction DocumentReference 47764G |
| | OriginInvoiceReference 47768G | 0..1 47770G | GDT 47772G | BusinessTransaction DocumentReference 47774G |
| | PurchaseContract Reference 47778G | 0..1 47780G | GDT 47782G | BusinessTransaction DocumentReference 47784G |
| | SalesContractReference 47788G | 0..1 47790G | GDT 47792G | BusinessTransaction DocumentReference 47794G |

Fig. 477J

| | | | | |
|---|---|---|---|---|
| InvoiceMessage 47718 | | | | |
| Invoice 47790 | | | | |
| Item 47734D | | | | |
| BusinessTransactionDocumentReference 47726G | | | | |
| | BuyerProductCatalog Reference 47798G | 0..1 47700H | GDT 47702H | CatalogueReference 47704H |
| | SellerProductCatalog Reference 47708H | 0..1 47710H | GDT 47712H | CatalogueReference 47714H |
| Attachment 47718H | Attachment 47720H | 0..n 47722H | GDT 47724H | Attachment 47726H |
| Description 47730H | Description 47732H | 0..1 47734H | GDT 47736H | Description 47738H |
| | ConfirmedDescription 47742H | 0..1 47744H | GDT 47746H | Description 47748H |

Fig. 483A

| Package 48300 | level 1 48302 | level 2 48304 | level 3 48306 | level 4 48308 | level 5 48310 | level 6 48312 | Card. 48314 | Data Type Name 48316 | |
|---|---|---|---|---|---|---|---|---|---|
| LoanContractCreateRequest Message 48318 | LoanContractCreate Request Message 48320 | | | | | | | MDT 48322 | LoanContractCreateRequest Message 48324 |
| MessageHeader 48326 | | Message Header 48328 | | | | | 0..1 48330 | GDT 48332 | BusinessDocumentMessage Header 48334 |
| LoanContract 48336 | | LoanContract 48338 | | | | | 1 48340 | | LoanContractCreateRequest 48342 |
| | | | LoanOfferID 48344 | | | | 0..1 48346 | GDT 48348 | BusinessTransactionDocumentID 48350 |
| | | | LoanPurposeCode 48352 | | | | 0..1 48354 | GDT 48356 | LoanPurposeCode 48358 |
| | | | MaturityPeriod 48360 | | | | 0..1 48362 | GDT 48364 | DatePeriod 48366 |

Fig. 483B

| LoanContractCreateRequest Message | | | | | | | 48318 | | | | | |
|---|---|---|---|---|---|---|---|---|---|---|---|---|
| | | | | | | FixedInterestPeriod 48368 | | | | 1 48370 | GDT 48372 | DatePeriod 48374 |
| | | | | | | Amount 48376 | | | | 1 48378 | GDT 48380 | Amount 48382 |
| | | | | | | EffectiveYieldPercent 48384 | | | | 0..1 48386 | GDT 48388 | Percent 48390 |
| | | | | | | EffectiveYieldCalculationMethodCode 48392 | | | | 0..1 48394 | GDT 48396 | EffectiveYieldCalculationMethodCode 48398 |
| | | | | | | DisagioPercent 48300A | | | | 0..1 48302A | GDT 48304A | DisagioPercent 48306A |
| | | | | | | DisagioDeductionEventTypeCode 48308A | | | | 0..1 48310A | GDT 48312A | DisagioDeductionEventTypeCode 48314A |
| | | Party 48316A | | | | LenderParty 48318A | | | | 1 48320A | GDT 48322A | BusinessTransactionDocumentParty 48324A |

Fig. 483C

| LoanContractCreateRequest Message | | | | | | | 48318 | | | | | |
|---|---|---|---|---|---|---|---|---|---|---|---|---|
| | | | | | | | InternalID 48326A | | | 1 48328A | GDT 48330A | PartyInternal ID 48332A |
| | | | | | | Borrower Party 48334A | | | | 1..n 48336A | GDT 48338A | BusinessTra nsactionDoc umentParty 48340A |
| | | | | | | | InternalID 48342A | | | 1 48344A | GDT 48346A | PartyInternal ID 48348A |
| | | | | | | PayerPar ty 48350A | | | | 0..1 48352A | GDT 48354A | BusinessTra nsactionDoc umentParty 48356A |
| | | | | | | | InternalID 48358A | | | 1 48360A | GDT 48362A | PartyInternal ID 48364A |
| | | | | | | BrokerPa rty 48366A | | | | 0..1 48368A | GDT 48370A | BusinessTra nsactionDoc umentParty 48372A |
| | | | | | | | InternalID 48374A | | | 1 48376A | GDT 48378A | PartyInternal ID 48380A |
| | | | | | | Bailsman Party 48382A | | | | 0..n 48384A | GDT 48386A | BusinessTra nsactionDoc umentParty 48388A |
| | | | | | | | InternalID 48390A | | | 1 48392A | GDT 48394A | PartyInternal ID 48396A |

Fig. 483D

| LoanContractCreateRequest Message | | | | | | | | | |
|---|---|---|---|---|---|---|---|---|---|
| 48318 | | | | | | | | | |
| ProductInformation 48398A | | | ProductCategory 48300B | | | | 1 48302B | GDT 48304B | BusinessTransactionDocumentProductCategory 48306B |
| | | | Product 48308B | | | | 0..1 48310B | GDT 48312B | BusinessTransactionDocumentProduct 48314B |
| PaymentInformation 48316B | | | PaymentForm 48318B | | | | 1 48320B | | |
| | | | | Code 48322B | | | 1 48324B | GDT 48326B | PaymentFormCode 48328B |
| | | | | BankAccount 48330B | | | 0..1 48332B | GDT 48334B | BusinessTransactionDocumentBankAccount 48336B |
| Attachment 48338B | | | AttachmentWebAddress 48340B | | | | 0..n 48342B | GDT 48344B | AttachmentWebAddress 48346B |

Fig. 483E

LoanContractCreateRequest Message 48318

| | | | | | | | |
|---|---|---|---|---|---|---|---|
| Item 48348B | | Item 48350B | | | 1..n 48352B | | LoanContractItem 48354B |
| | LoanCondition Information 48356B | | LoanInterestCondition 48358B | | 0..1 48360B | GDT 48362B | LoanInterestCondition 48364B |
| | | | LoanAmortizementCondition 48366B | | 0..1 48368B | GDT 48370B | LoanAmortizementCondition 48372B |
| | | | LoanFeeCondition 48374B | | 0..1 48376B | GDT 48378B | LoanFeeCondition 48380B |
| | Party 48382B | | PayerParty 48384B | | 0..1 48385B | GDT 48386B | BusinessTransactionDocumentParty 48387B |
| | | | | InternalID 48388B | 1 48389B | GDT 48390B | PartyInternalID 48391B |
| | PaymentInformation 48392B | | PaymentForm 48393B | | 0..1 48394B | | |
| | | | | Code 48395B | 0..1 48396B | GDT 48397B | PaymentFormCode 48398B |
| | | | | BankAccount 48399C | 0..1 48300D | GDT 48302D | BusinessTransactionDocumentBankAccount 48304D |

Fig. 484A

| Package 48400 | level 1 48402 | level 2 48404 | level 3 48406 | level 4 48408 | level 5 48410 | Card. 48412 | Date Type Name 48414 | |
|---|---|---|---|---|---|---|---|---|
| LoanCalculation Message 48418 | LoanCalculation Message 48420 | | | | | | MDT 48422 | LoanCalculation Message 48424 |
| MessageHeader 48426 | | MessageHeader 48428 | | | | 0..1 48430 | GDT 48432 | BusinessDocumentMessageHeader 48434 |
| LoanCalculation 48436 | | LoanCalculation 48438 | | | | 1 48440 | | LoanCalculation 48442 |
| | | | MaturityPeriod 48444 | | | 0..1 48446 | GDT 48448 | DatePeriod 48450 |
| | | | EffectiveYieldPercent 48452 | | | 0..1 48454 | GDT 48456 | Percent 48458 |
| | | | EffectiveYieldCalculationMethodCode 48460 | | | 0..1 48462 | GDT 48464 | EffectiveYieldCalculationMethodCode 48466 |

Fig. 484B

| LoanCalculation Message 48318 | | | | | | |
|---|---|---|---|---|---|---|
| | Installment Amount 48468 | | | 0..1 48470 | GDT 48472 | Amount 48474 |
| LoanPayment Plan 48476 | LoanPaym entPlan 48478 | | | 0..1 48480 | | LoanPayme ntPlan 48482 |
| | | LoanPayme ntPlanItem 48484 | | 1..n 48486 | GDT 48488 | LoanPayme ntPlanItem 48490 |

Fig. 485A

| Package 48500 | level 1 48502 | level 2 48504 | level 3 48506 | Card 48508. | Data Type Name 48510 | |
|---|---|---|---|---|---|---|
| LoanContractCreateConfirmation Message 48512 | LoanContractCreate Confirmation Message 48514 | | | | MDT 48516 | LoanContractCreate Confirmation Message 48518 |
| MessageHeader 48520 | | MessageHeader 48522 | | 0..1 48524 | GDT 48526 | BusinessDocumentMessageHeader 48528 |
| LoanContract 48530 | | Loan Contract 48532 | | 1 48534 | | LoanContractCreateConfirmation 48536 |
| | | | ID 48538 | 0..1 48540 | GDT 48542 | BusinessTransactionDocumentID 48544 |
| | | | LoanOfferID 48546 | 1 48548 | GDT 48550 | BusinessTransactionDocumentID 48552 |
| Log 48554 | | | Log 48556 | 0..1 48558 | GDT 48560 | Log 48562 |
| PaymentInformation 48564 | | | BankAccount 48566 | 0..1 48568 | GDT 48570 | BusinessTransactionDocumentBankAccount 48572 |

Fig. 486A

| Package 48600 | level 1 48602 | level 2 48604 | level 3 48606 | Card. 48608 | Data Type Name 48610 | |
|---|---|---|---|---|---|---|
| LoanCalculationQuery Message 48612 | LoanCalculationQuery Message 48614 | | | | MDT 48616 | LoanCalculationQuery Message 48618 |
| MessageHeader 48620 | | MessageHeader 48622 | | 0..1 48624 | GDT 48626 | BusinessDocumentMessageHeader 48628 |
| LoanCalculationQuery 48630 | | LoanCalculationQuery 48632 | | 1 48634 | | LoanCalculationQuery 48636 |
| | | | LoanKeyFigureTypeCode 48638 | 1..n 48640 | GDT 48642 | LoanKeyFigureTypeCode 48644 |
| | | | MaturityPeriod 48646 | 0..1 48648 | GDT 48650 | DatePeriod 48652 |
| | | | FixedInterestPeriod 48654 | 1 48656 | GDT 48658 | DatePeriod 48660 |
| | | | Amount 48662 | 1 48664 | GDT 48666 | Amount 48668 |

Fig. 486B

| LoanCalculationQuery Message 48612 | | | | | |
|---|---|---|---|---|---|
| | | EffectiveYieldCalculationMethodCode 48670 | 0..1 48672 | GDT 48674 | EffectiveYieldCalculationMethodCode 48676 |
| | | DisagioPercent 48678 | 0..1 48680 | GDT 48682 | DisagioPercent 48684 |
| | | DisagioDeductionEventTypeCode 48686 | 0..1 48688 | GDT 48690 | DisagioDeductionEventTypeCode 48692 |
| ProductInformation 48694 | | ProductCategory 48696 | 1 48698 | GDT 48600A | BusinessTransactionDocumentProductCategory 48602A |
| | | Product 48604A | 0..1 48606A | GDT 48608A | BusinessTransactionDocumentProduct 48610A |
| LoanConditionInformation 48612A | | LoanInterestCondition 48614A | 1..n 48616A | GDT 48618A | LoanInterestCondition 48620A |
| | | LoanAmortizementCondition 48622A | 0..n 48624A | GDT 48626A | LoanAmortizementCondition 48628A |
| | | LoanFeeCondition 48630A | 0..n 48632A | GDT 48634A | LoanFeeCondition 48636A |

Fig. 490A

| Package 49000 | L1 49002 | L2 49004 | L3 49006 | L4 49008 | L5 49010 | Card. 49012 | DataType Name 49014 | |
|---|---|---|---|---|---|---|---|---|
| Purchase Request Message 49018 | Purchase Request Message 49020 | | | | | | MDT 49022 | PurchaseRequest Message 49024 |
| Purchase Request 49028 | | Purchase Request 49030 | | | | 1 49032 | | PurchaseRequest 49036 |
| | | | Base Business Transaction Document ID 49040 | | | 1..2 49042 | GDT 49044 | BusinessTransactionDocument ID 49046 |
| | | | Creation DateTime 49050 | | | 1 49052 | GDT 49054 | DateTime 49056 |
| | | | Note 49060 | | | 0.1 49062 | GDT 49064 | Note 49066 |

Fig. 490B

Purchase Request Message 49018

Purchase Request 49028

| | | | | | | | |
|---|---|---|---|---|---|---|---|
| Party 49070 | BuyerParty 49072 | | | 0..1 49074 | GDT 49076 | BusinessTransaction DocumentParty 49078 |
| | | Standard ID 49082 | | 0..n 49084 | GDT 49086 | PartyStandard ID 49088 |
| | | Internal ID 49092 | | 0..1 49094 | GDT 49096 | PartyInternal ID 49098 |
| | | Address 49002A | | 0..1 49004A | GDT 49006A | Address 49008A |
| | | Contact Person 49012A | | 0..1 49014A | GDT 49016A | ContactPerson 49018A |
| | | | Internal ID 49022A | 0..n 49024A | GDT 49026A | ContactPersonInternalI D 49028A |
| | | | Address 49032A | 0..1 49034A | GDT 49036A | Address 49038A |

Fig. 490C

| | | | | | | |
|---|---|---|---|---|---|---|
| Purchase Request Message 49018 | | | | | | |
| Purchase Request 49028 | | | | | | |
| Party 49070 | | SellerParty 49042A | | 0..1 49044A | GDT 49046A | BusinessTransactionDocumentParty 49048A |
| | | ProposedSellerParty 49052A | | 0..1 49054A | GDT 49056A | BusinessTransactionDocumentParty 49058A |
| | | RequestorParty 49062A | | 0..1 49064A | GDT 49066A | BusinessTransactionDocumentParty 49068A |
| | | ShipToParty 49072A | | 0..1 49074A | GDT 49076A | BusinessTransactionDocumentParty 49078A |
| | | ManufacturerParty 49082A | | 0..1 49084A | GDT 49086A | BusinessTransactionDocumentParty 49088A |

Fig. 490D

| | | | | | |
|---|---|---|---|---|---|
| Purchase Request Message 49018 | | | | | |
| Purchase Request 49028 | | | | | |
| Location 49092A | ShipTo Location 49094A | | 0..1 49096A | GDT 49098A | BusinessTransaction DocumentLocation 49000B |
| | | Standard ID 49004B | 0..1 49006B | GDT 49008B | LocationStandardID 49010B |
| | | Internal ID 49014B | 0..1 49016B | GDT 49018B | LocationInternalID 49020B |
| | | Address 49024B | 0..1 49026B | GDT 49028B | Address 49030B |
| | ShipFrom Location 49034B | | 0..1 49036B | GDT 49038B | BusinessTransaction DocumentLocation 49040B |

Fig. 490E

Purchase Request Message 49018

Purchase Request 49028

| | | | | | | |
|---|---|---|---|---|---|---|
| Item 49044B | Item 49046B | | | 1..n 49048B | | PurchaseRequestItem 49052B |
| | | BaseBusiness TransactionDocument ItemID 49056B | | 1..2 49058B | GDT 49060B | BusinessTransaction DocumentItemID 49062B |
| | | ThirdPartyDeal Indicator 49066B | | 0..1 49068B | GDT 49070B | BusinessTransactionDocumentItemThirdPartyDealIndicator 49072B |
| | | DirectMaterial Indicator 49076B | | 0..1 49078B | GDT 49080B | DirectMaterialIndicator 49082B |
| | | Hierarchy Relationship 49086B | | 0..1 49088B | | |
| | | | Parent Item ID 49092B | 1 49094B | GDT 49096B | BusinessTransactionDocumentItemID 49098B |
| | | | Type Code 49002C | 1 49004C | GDT 49006C | BusinessTransactionDocumentItemHierarchy RelationshipTypeCode 49008C |

Fig. 490F

Purchase Request Message 49018

Purchase Request 49028

Item 49044B

| | | | | | |
|---|---|---|---|---|---|
| Product Information 49012C | Product 49014C | | 0..1 49016C | GDT 49018C | BusinessTransactionDocumentProduct 49020C |
| | | StandardID 49024C | 0..n 49026C | GDT 49028C | ProductStandardID 49030C |
| | | InternalID 49034C | 0..1 49036C | GDT 49038C | ProductInternalID 49040C |
| | | TypeCode 49044C | 0..1 49046C | GDT 49048C | ProductTypeCode 49050C |
| | | Note 49054C | 0..1 49056C | GDT 49058C | Note 49060C |
| | Product Category 49064C | | 0..1 49066C | GDT 49068C | BusinessTransactionDocumentProductCategory 49070C |
| | | StandardID 49074C | 0..n 49076C | GDT 49078C | ProductCategoryStandardID 49080C |
| | | InternalID 49084C | 0..n 49086C | GDT 49088C | ProductCategoryInternalID 49090C |

Fig. 490G

| | | | | |
|---|---|---|---|---|
| Purchase Request Message 49018 | | | | |
| Purchase Request 49028 | | | | |
| Item 49044B | | | | |
| Price Information 49012C | Price 49096C | | 0..1 49098C | | |
| | | NetUnitPrice 49002D | 0..1 49004D | GDT 49006D | Price 49008D |
| | ProcurementCost UpperLimit 49012D | | 0..1 49014D | GDT 49016D | ProcurementCost UpperLimit 49018D |
| Party 49022D | BuyerParty 49024D | | 0..1 49026D | GDT 49028D | BusinessTransaction DocumentParty 49030D |
| | SellerParty 49034D | | 0..1 49036D | GDT 49038D | BusinessTransaction DocumentParty 49040D |
| | ProposedSeller Party 49044D | | 0..1 49046D | GDT 49048D | BusinessTransaction DocumentParty 49050D |
| | RequestorParty 49054D | | 0..1 49056D | GDT 49058D | BusinessTransaction DocumentParty 49060D |
| | ShipToParty 49064D | | 0..1 49066D | GDT 49068D | BusinessTransaction DocumentParty 49070D |
| | ManufacturerParty 49074D | | 0..1 49076D | GDT 49078D | BusinessTransaction DocumentParty 49080D |

Fig. 490H

| | | | | | |
|---|---|---|---|---|---|
| Purchase Request Message 49018 | | | | | |
| Purchase Request 49028 | | | | | |
| Item 49044B | | | | | |
| Location 49084D | ShipFromLocation 49086D | | 0..1 49088D | GDT 49090D | BusinessTransactionDocumentLocation 49092D |
| | ShipToLocation 49094D | | 0..1 49096D | GDT 49098D | BusinessTransactionDocumentLocation 49000E |
| Business Document Object Reference 49004E | Purchasing Contract Reference 49006E | | 0..1 49008E | GDT 49010E | BusinessTransactionDocumentReference 49012E |
| | OriginPurchaseOrderReference 49016E | | 0..1 49018E | GDT 49020E | BusinessTransactionDocumentReference 49022E |
| | ProjectReference 49026E | | 0..1 49028E | GDT 49030E | ProjectReference 49032E |
| | ProjectElement Assignment 49036E | | 0..1 49038E | GDT 49040E | ProjectElement Assignment 49042E |
| | | FromProject Reference 49046E | 1 49048E | GDT 49050E | ProjectReference 49052E |
| | | ToProject Reference 49056E | 1 49058E | GDT 49060E | ProjectReference 49062E |

Fig. 490I

Purchase Request Message 49018

Purchase Request 49028

Item 49044B

| | | | | | |
|---|---|---|---|---|---|
| Accounting 49066E | AccountingObject SetAssignment 49068E | | 0..n 49070E | GDT 49072E | AccountingObject SetAssignment 49074E |
| | | Percent 49078E | 0..1 49080E | GDT 49082E | Percent 49084E |
| | | Amount 49088E | 0..1 49090E | GDT 49092E | Amount 49000F |
| | | Quantity 49004F | 0..1 49006F | GDT 49008F | Quantity 49010F |
| | | Accounting ObjectSet 49014F | 1 49016F | GDT 49018F | AccountingObjectSet 49020F |

Fig. 490J

Purchase Request Message 49018

Purchase Request 49028

Item 49044B

| | | | | | |
|---|---|---|---|---|---|
| Attachment 49024F | AttachmentWeb Address 49026F | | 0..1 49028F | GDT 49030F | AttachmentWebAddres s 49032F |
| Description 49036F | Description 49038F | | 0..1 49040F | GDT 49042F | Description 49044F |
| | InternalDescription 49048F | | 0..1 49050F | GDT 49052F | Description 49054F |
| ScheduleLine 49058F | ScheduleLine 49060F | | 1 49062F | | PurchaseRequest ItemScheduleLine 49066F |
| | | Delivery Period 49070F | 1 49072F | GDT 49074F | DateTimePeriod 49076F |
| | | Quantity 49080F | 0..1 49082F | GDT 49084F | Quantity 49086F |

Fig. 491A

| Package EEE01 | L1 EEE02 | L2 EEE03 | L3 EEE04 | L4 EEE05 | L5 EEE06 | | Card. EEE07 | DataType Name EEE08 | |
|---|---|---|---|---|---|---|---|---|---|
| Purchase Request Confirmation Message EEE09 | Purchase Request Confirmation Message EEE10 | | | | | | | MDT EEE11 | Purchase Request ConfirmationMessage EEE12 |
| Purchase Request EEE13 | | Purchase Request EEE14 | | | | | 1 EEE15 | | Purchase Request Confirmation EEE16 |
| | | | Base Business Transaction Document ID EEE17 | | | | 1..2 EEE18 | GDT EEE19 | Business Transaction DocumentID EEE20 |
| Item EEE21 | | | Item EEE22 | | | | 1..n EEE23 | | Purchase Request Confirmation Item EEE24 |
| | | | | Base Business Transaction Document ItemID EEE25 | | | 1..2 EEE26 | GDT EEE27 | Business Transaction Document ItemID EEE28 |

Fig. 491B

| | | | | | | |
|---|---|---|---|---|---|---|
| | Open Quantity Cancelled Indicator EEE29 | | | 0..1 EEE30 | GDT EEE31 | Cancelled Indicator EEE32 |
| | Total Requested Quantity EEE33 | | | 1 EEE34 | GDT EEE35 | Quantity EEE36 |
| | Total Ordered Quantity EEE37 | | | 1 EEE38 | GDT EEE39 | Quantity EEE40 |
| Fulfilling Purchase Order EEE41 | Fulfilling Purchase Order EEE42 | | | 0..n EEE43 | | Purchase Request Confirmation Item Fulfilling Purchase Order EEE44 |
| | | ID EEE45 | | 1 EEE46 | GDT EEE47 | BusinessTransactionDocumentID EEE48 |
| | | Ordered Indicator EEE49 | | 0..1 EEE50 | GDT EEE51 | Purchase Order OrderedIndicator EEE52 |
| Fulfilling Purchase Order Item EEE53 | | Item EEE54 | | 1..n EEE55 | | PurchaseRequestConfirmationItemFulfillingPurchaseOrderItem EEE56 |
| | | | ID EEE57 | 1 EEE58 | GDT EEE59 | BusinessTransaction DocumentItemID EEE60 |
| | | | Quantity EEE61 | 0..1 EEE62 | GDT EEE63 | Quantity EEE64 |

Fig. 495A

| Package 49500 | L1 49502 | L2 49504 | L3 49506 | L4 49508 | L5 49510 | Cardinality 49512 | Type 49514 | Name 49516 |
|---|---|---|---|---|---|---|---|---|
| Purchasing Contract Release Message 49518 | Purchasing Contract Release Message 49520 | | | | | | MDT 49522 | Purchasing Contract Release Message 49524 |
| Purchasing Contract Release 49526 | | Purchasing Contract Release 49528 | | | | 1 49530 | | Purchasing Contract Release 49532 |
| | | | Base Business Transaction Document ID 49534 | | | 1 49536 | GDT 49538 | Business Transaction DocumentID 49540 |
| | | | Base Business Transaction Document TypeCode 49544 | | | 1 49546 | GDT 49548 | Business Transaction Document TypeCode 49550 |
| | | | Base Business Transaction Document Date Time 49554 | | | 0..1 49556 | GDT 49558 | DateTime 49560 |

Fig. 495B

| | | | | | | | | | | |
|---|---|---|---|---|---|---|---|---|---|---|
| Purchasing Contract Release Message 49518 | | | | | | | | | | |
| | Purchasing Contract Release 49526 | | | | | | | | | |
| | | Party 49562 | | | BuyerParty 49564 | | | 0..1 49566 | GDT 49568 | Business Transaction Document Party 49570 |
| | | | | | | InternalID 49574 | | 0..1 49576 | GDT 49578 | PartyInternalID 49580 |
| | | | | | | StandardID 49584 | | 0..n 49586 | GDT 49588 | PartyStandardID 49590 |
| | | | | | | Contact Person 49594 | | 0..1 49596 | GDT 49598 | ContactPerson 49500A |
| | | Location 49502A | | | ShipTo Location 49504A | | | 0..1 49506A | GDT 49508A | Business Transaction Document ShipTo Location 49510A |

Fig. 495C

Purchasing Contract Release Message 49518

Purchasing Contract Release 49526

| | | | | | | | | |
|---|---|---|---|---|---|---|---|---|
| Item 49512A | | | Item 49514A | | | 1..n 49516A | | PurchaseContract ReleaseItem 49518A |
| | | | | BaseBusiness Transaction Document ItemID 49524A | | 1 49526A | GDT 49528A | Business Transaction DocumentItemID 49530A |
| | | | | BaseBusiness Transaction DocumentItem TypeCode 49534A | | 1 49536A | GDT 49538A | Business Transaction DocumentItem TypeCode 49540A |
| | | | | Release Quantity 49544A | | 0..1 49546A | GDT 49548A | Quantity 49550A |
| | | | | Release Amount 49554A | | 0..1 49556A | GDT 49558A | Amount 49560A |

Fig. 495D

| | | | | | | | |
|---|---|---|---|---|---|---|---|
| Purchasing Contract Release Message 49518 | | | | | | | |
| Purchasing Contract Release 49526 | | | | | | | |
| Item 49512A | | | | | | | |
| Location 49562A | | | | ShipToLocation 49564A | | 0..1 49566A | GDT 49568A | Business Transaction Document ShipTo Location 49570A |
| Business Document Object Reference 49572A | | | | Purchasing Contract Reference 49574A | | 1 49576A | GDT 49578A | BusinessTransaction DocumentReference 49580A |
| | | | | | ID 49584A | 1 49586A | GDT 49588A | BusinessTransaction DocumentID 49590A |
| | | | | | ItemID 49594A | 0..n 49596A | GDT 49598A | BusinessTransaction DocumentItemID 49599A |

FIG. 496A

| | Package 49600 | L1 49601 | L2 49602 | L3 49603 | L4 49604 | L5 49605 | C 49606 | C/GDT 49607 |
|---|---|---|---|---|---|---|---|---|
| PurchasingContractMessage 49608 | | PurchasingContractMessage 49609 | | | | | | MDT:PurchasingContractInformationMessage 49610 |
| | PurchasingContract 49611 | | PurchasingContract 49612 | | | | 1 49613 | PurchasingContractInformation 49614 |
| | | | | ID 49615 | | | 1 49616 | BusinessTransactionDocumentID 49617 |
| | | | | CreationDateTime 49618 | | | 0..1 49619 | DateTime 49620 |
| | | | | LastChangeDateTime 49621 | | | 0..1 49622 | DateTime 49623 |
| | | | | CompletedIndicator 49624 | | | 0..1 49625 | BusinessTransactionCompletedIndicator 49626 |
| | | | | BlockedIndicator 49627 | | | 0..1 49628 | BusinessTransactionBlockedIndicator 49629 |
| | | | | Note 49630 | | | 0..1 49631 | Note 49632 |

FIG. 496B

| Package 49600 | L1 49601 | L2 49602 | L3 49603 | L4 49604 | L5 49605 | C 49606 | C/GDT 49607 |
|---|---|---|---|---|---|---|---|
| | | | ValidityPeriod 49633 | | | 0..1 49634 | DateTimePeriod 49635 |
| | | | TargetAmount 49636 | | | 0..1 49637 | Amount 49638 |
| Party 49639 | | | BuyerParty 49640 | | | 0..1 49641 | BusinessTransactionDocumentParty 49642 |
| | | | | InternalID 49643 | | 0..1 49644 | PartyInternalID 49645 |
| | | | | StandardID 49646 | | 0..n 49647 | PartyStandardID 49648 |
| | | | | Address 49649 | | 0..1 49650 | Address 49651 |
| | | | | ContactPerson 49652 | | 0..1 49653 | ContactPerson 49654 |
| | | | | | InternalID 49655 | 0..1 49656 | ContactPersonID 49657 |
| | | | | | Address 49658 | 0..1 49659 | Address 49660 |
| | | | SellerParty 49661 | | | 0..1 49662 | BusinessTransactionDocumentParty 49663 |

FIG. 496C

| Package 49600 | L1 49601 | L2 49602 | L3 49603 | L4 49604 | L5 49605 | C 49606 | C/GDT 49607 |
|---|---|---|---|---|---|---|---|
| | | | ProductRecipientParty 49664 | | | 0..1 49665 | BusinessTransactionDocumentParty 49666 |
| | | | PurchasingContractReleaseAuthorizedParty 49667 | | | 0..n 49668 | BusinessTransactionDocumentParty 49669 |
| Location 49670 | | | ShipToLocation 49671 | | | 0..1 49672 | BusinessTransactionDocumentLocation 49673 |
| DeliveryInformation 49674 | | | DeliveryTerms 49675 | | | 0..1 49676 | DeliveryTerms 49677 |
| | | | | Incoterms 49678 | | 0..1 49679 | Incoterms 49680 |
| | | | | QuantityTolerance 49681 | | 0..1 49682 | QuantityTolerance 49683 |
| | | | | MaximumLeadTimeDuration 49684 | | 0..1 49685 | Duration 49686 |
| PaymentInformation 49687 | | | CashDiscountTerms 49688 | | | 0..1 49689 | CashDiscountTerms 49690 |

FIG. 496D

| Package 49600 | L1 49601 | L2 49602 | L3 49603 | L4 49604 | L5 49605 | C 49606 | C/GDT 49607 |
|---|---|---|---|---|---|---|---|
| | | | | MaximumCashDiscount 49691 | | 0..1 49692 | CashDiscount 49693 |
| | | | | NormalCashDiscount 49694 | | 0..1 49695 | CashDiscount 49696 |
| | | | | FullPaymentDueDaysValue 49697 | | 0..1 49698 | |
| PriceInformation 49699 | | | PriceSpecificationElement 49600A | | | 0..n 49601A | PriceSpecificationElement 49602A |
| | | | | TypeCode 49603A | | 1 49604A | PriceSpecificationElementTypeCode 49605A |
| | | | | ValidityPeriod 49606A | | 1 49607A | DateTimePeriod 49608A |
| | | | | PropertyValuation 49609A | | 1..n 49610A | PriceSpecificationElementPropertyValuation 49611A |
| | | | | Price 49612A | | 0..1 49613A | Price 49614A |

FIG. 496E

| Package 49600 | L1 49601 | L2 49602 | L3 49603 | L4 49604 | L5 49605 | C 49606 | C/GDT 49607 |
|---|---|---|---|---|---|---|---|
| | | | | Percent 49615A | | 0..1 49616A | Percent 49617A |
| | | | | FixedAmount 49618A | | 0..1 49619A | Amount 49620A |
| | | | | PriceSpecificationElementScaleLine 49621A | | 0..n 49622A | PriceSpecificationElementScaleLine 49623A |
| Attachment 49624A | | | AttachmentWebAddress 49625A | | | 0..n 49626A | WebAddress 49627A |
| | | | InternalAttachmentWebAddress 49628A | | | 0..n 49629A | WebAddress 49630A |
| | | | LegalDocumentAttachment 49631A | | | 0..n 49632A | Attachment 49633A |
| Description 49634A | | | InternalDescription 49635A | | | 0..1 49636A | Description 49637A |
| | | | Description 49638A | | | 0..1 49639A | Description 49640A |
| | | | | | | | |

FIG. 496F

| Package 49600 | L1 49601 | L2 49602 | L3 49603 | L4 49604 | L5 49605 | C 49606 | C/GDT 49607 |
|---|---|---|---|---|---|---|---|
| Item 49641 A | | | Item 49642A | | | 0..n 49643 A | PurchasingContractInformationItem 49644A |
| | | | | ID 49645A | | 1 49646 A | BusinessTransactionDocumentItemID 49647A |
| | | | | ActiveIndicator 49648A | | 0..1 49649 A | ActiveIndicator 49650A |
| | | | | TypeCode 49651A | | 0..1 49652 A | BusinessTransactionDocumentItemTypeCode 49653A |
| | | | | TargetQuantity 49654A | | 0..1 49655 A | Quantity 49656A |
| | | | | TargetAmount 49657A | | 0..1 49658 A | Amount 49659A |
| | | | | MinimumOrderQuantity 49660A | | 0..1 49661 A | Quantity 49662A |

FIG. 496G

| Package 49600 | | L1 49601 | L2 49602 | L3 49603 | L4 49604 | L5 49605 | C 49606 | C/GDT 49607 |
|---|---|---|---|---|---|---|---|---|
| | | | | | MinimumOrderAmount 49663A | | 0..1 49664A | Amount 49665A |
| | ProductInformation 49666A | | | | Product 49667A | | 0..1 49668A | BusinessTransactionDocumentProduct 49669A |
| | | | | | | InternalID 49670A | 0..1 49671A | ProdcutInternalID 49672A |
| | | | | | | StandardID 49673A | 0..n 49674A | ProductStandardID 49675A |
| | | | | | | ManufacturerID 49676A | 0..1 49677A | ProductPartyID 49678A |
| | | | | | | SellerID 49679A | 0..1 49680A | ProductPartyID 49681A |
| | | | | | | TypeCode 49682A | 0..1 49683A | ProductTypeCode 49684A |
| | | | | | | Note 49685A | 0..1 49686A | Note 49687A |

FIG. 496H

| Package 49600 | L1 49601 | L2 49602 | L3 49603 | L4 49604 | L5 49605 | C 49606 | C/GDT 49607 |
|---|---|---|---|---|---|---|---|
| | | | | ProductCategory 49688A | | 0..1 49689A | BusinessTransactionDocumentProductCategory 49690A |
| | | | | | InternalID 49691A | 0..1 49692A | ProdcutCategoryInternalID 49693A |
| | | | | | StandardID 49694A | 0..n 49695A | ProductCategoryStandardID 49696A |
| PriceInformation 49697A | | | | PriceSpecificationElement 49698A | | 0..n 49699A | PriceSpecificationElement 49600B |
| Party 49601B | | | | ProductRecipientParty 49602B | | 0..n 49603B | BusinessTransactionDocumentParty 49604B |
| Location 49605B | | | | ShipToLocacton 49606B | | 0..n 49607B | BusinessTransactionDocumentShipToLocation 49608B |
| DeliveryInformation 49609B | | | | DeliveryTerms 49610B | | 0..1 49611B | DeliveryTerms 49612B |

FIG. 496I

| Package 49600 | | | | L1 49601 | L2 49602 | L3 49603 | L4 49604 | L5 49605 | C 49606 | C/GDT 49607 |
|---|---|---|---|---|---|---|---|---|---|---|
| | | | BusinessDocument ObjectReference 49613B | | | | QuoteReference 49614B | | 0..1 49615B | BusinessTransactionDocumentReference 49616B |
| | | | | | | | | ID 49617B | 1 49618B | BusinessTransactionDocumentID 49619B |
| | | | | | | | | ItemID 49620B | 0..n 49621B | BusinessTransactionDocumentItemID 49622B |
| | | | | | | | OperationalPurchasingContractReference 49623B | | 0..1 49624B | BusinessTransactionDocumentReference 49625B |
| | | | | | | | | ID 49626B | 1 49627B | BusinessTransactionDocumentID 49628B |
| | | | | | | | | ItemID 49629B | 0..n 49630B | BusinessTransactionDocumentItemID 49631B |

FIG. 496J

| Package 49600 | L1 49601 | L2 49602 | L3 49603 | L4 49604 | L5 49605 | C 49606 | C/GDT 49607 |
|---|---|---|---|---|---|---|---|
| | | | | BuyerProduct Catalogue Reference 49632B | | 0..1 49633B | CatalogueReference 49634B |
| | | | | | ID 49635B | 1 49636B | CatalogueID 49637B |
| | | | | | ItemID 49638B | 0..n 49639B | CatalogueItemID 49640B |
| Attachment 49641B | | | | AttachmentWebAddress 49642B | | 0..n 49643B | WebAddress 49644B |
| | | | | InternalAttachmentWebAddress 49645B | | 0..n 49646B | WebAddress 49647B |
| Description 49648B | | | | Description 49649B | | 0..1 49650B | Description 51B |
| | | | | InternalDescription 49652B | | 0..1 49653B | Description 49654B |

Fig. 499A

| Package 49900 | L1 49901 | L2 49902 | L3 49903 | L4 49904 | L5 49905 | Card. 49906 | Data Type Name 49907 | |
|---|---|---|---|---|---|---|---|---|
| ReplenishmentOrderProposal Request Message 49910 | Replen-ishment Order Proposal Message 49911 | | | | | | MDT 49917 | Replenish-mentOrder Proposal Message 49918 |
| Message Header 49920 | | Message Header 49922 | | | | 1 49926 | GDT 49927 | Business Document Message Header 49928 |
| | | | ID 49933 | | | 1 49936 | GDT 49937 | Business Document MessageID 49938 |
| | | | CreationDate Time 49943 | | | 1 49946 | GDT 49947 | DateTime 49948 |
| ReplenishmentOrderProposal 49950 | | Replen-ishment Order Proposal 49952 | | | | 1 49956 | | Replenish-mentOrder Proposal 49958 |
| | | | @actionCode 49963 | | | 1 49966 | GDT 49967 | ActionCode 49968 |

Fig. 499B

| | | | | | | | | | |
|---|---|---|---|---|---|---|---|---|---|
| | | | | @complete Transmission Indicator 49973 | | | 1 49976 | GDT 49977 | Complete Transmission Indicator 49978 |
| | | | | ID 49983 | | | 1 49986 | GDT 49987 | Business Transaction DocumentID 49988 |
| | | | | Purchasing GroupID 49993 | | | 0..1 49996 | GDT 49997 | Purchasing GroupID 49998 |
| | | | | Transship-mentMethod Code 49903A | | | 0..1 49906A | GDT 49907A | Transship-mentMethod Code 49908A |
| | | | | Consignment Indicator 49913A | | | 0..1 49916A | GDT 49917A | Consignment Indicator 49918A |
| | | | | Quantity Rounding Allowed Indicator 49923A | | | 0..1 49926A | GDT 49927A | Allowed Indicator 49928A |
| | | | | OrderPeriod 49933A | | | 0..1 49936A | GDT 49937A | DateTime Period 49938A |
| | | | | Delivery Period 49943A | | | 0..1 49946A | GDT 49947A | DateTime Period 49948A |

Fig. 499C

| | | | | | | | | | | |
|---|---|---|---|---|---|---|---|---|---|---|
| | | Party 49950A | | | BuyerParty 49953A | | | 0..1 49956A | | |
| | | | | | | InternalID 49964A | | 0..1 49966A | GDT 49967A | Business Transaction Document Party InternalID 49968A |
| | | | | | VendorParty 49973A | | | 0..1 49976A | | |
| | | | | | | InternalID 49984A | | 0..1 49986A | GDT 49987A | Business Transaction Document Party InternalID 49988A |
| | | | | | | StandardID 49994A | | 0..1 49996A | GDT 49997A | Business Transaction Document Party StandardID 49998A |
| | | | | | Product Recipient 49903B | | | 0..1 49906B | | |
| | | | | | | InternalID 49914B | | 0..1 49916B | GDT 49917B | Business Transaction Document Party InternalID 49918B |

Fig. 499D

| | | | | | | | | | | |
|---|---|---|---|---|---|---|---|---|---|---|
| | | | | | | StandardID 49924B | | 0..1 49926B | GDT 49927B | Business Transaction Document Party StandardID 49928B |
| | | Location 49930B | | | ShipFrom Location 49933B | | | 1 49936B | GDT 49937B | Business Transaction Document ShipFrom Location 49938B |
| | | | | | | InternalID 49944B | | 0..1 49946B | GDT 49947B | Location InternalID 49948B |
| | | | | | | StandardID 49954B | | 0..1 49956B | GDT 49957B | Location StandardID 49958B |
| | | | | | ShipTo Location 49963B | | | 1 49966B | GDT 49967B | Business Transaction Document ShipTo Location 49968B |
| | | | | | | InternalID 49974B | | 0..1 49976B | GDT 49977B | Location InternalID 49978B |
| | | | | | | StandardID 49984B | | 0..1 49986B | GDT 49987B | Location StandardID 49988B |

Fig. 499E

| | | | | | | | | | | |
|---|---|---|---|---|---|---|---|---|---|---|
| | | Business Document Object Reference 49990B | | | Purchase Order Reference 49993B | | | 0..1 49996B | GDT 49997B | Business Transaction Document Reference 49998B |
| | | | | | | ID 49904C | | 1 49906C | GDT 49907C | Business Transaction Document ItemID 49908C |
| | | Item 49910C | | | Item 49913C | | | 0..n 49916C | | Replenish-mentOrder ProposalItem 49918C |
| | | | | | | @actionCode 49924C | | 1 49926C | GDT 49927C | ActionCode 49928C |
| | | | | | | @complete Transmission Indicator 49934C | | 1 49936C | GDT 49937C | Complete Transmission Indicator 49938C |
| | | | | | | ID 49944C | | 1 49946C | GDT 49947C | Business Transaction Document ItemID 49948C |
| | | | | | | Purchasing GroupID 49954C | | 0..1 49956C | GDT 49957C | Purchasing GroupID 49958C |

Fig. 499F

| | | | | | | | | | | | |
|---|---|---|---|---|---|---|---|---|---|---|---|
| | | | | | | | Transship-mentMethod Code 49964C | | 0..1 49966C | GDT 49967C | Transship-ment MethodCode 49968C |
| | | | | | | | Consignment Indicator 49974C | | 0..1 49976C | GDT 49977C | Consignment Indicator 49978C |
| | | | | | | | OrderPeriod 49984C | | 0..1 49986C | GDT 49987C | DateTime Period 49988C |
| | | | Product Informa-tion 49990C | | | | Product 49994C | | 1 49996C | GDT 49997C | Business Transaction Document Product 49998C |
| | | | | | | | | Internal ID 49905D | 1 49906D | GDT 49907D | Product InternalID 49908D |
| | | | | | | | | Standard ID 49915D | 1 49916D | GDT 49917D | Product StandardID 49918D |
| | | | | | | | Product Category 49924D | | 0..1 49926D | GDT 49927D | Business Transaction Document Product Category 49928D |

Fig. 499G

| | | | | | | | | | | | |
|---|---|---|---|---|---|---|---|---|---|---|---|
| | | | | | | | | Internal ID 49935D | 1 49936D | GDT 49937D | Product Category InternalID 49938D |
| | | | | | | | Vendor Product Category 49944D | | 0..1 49946D | GDT 49947D | Business Transaction Document Product Category 49948D |
| | | | | | | | | Internal ID 49955D | 1 49956D | GDT 49957D | Product Category InternalID 49958D |
| | | | Price Informa-tion 49960D | | | | NetPurchase Price 49964D | | 0..1 49966D | GDT 49967D | Price 49968D |
| | | | Party 49970D | | | | BuyerParty 49974D | | 0..1 49976D | | |
| | | | | | | | | Internal ID 49985D | 0..1 49986D | GDT 49987D | Business Transaction Document Party InternalID 49988D |
| | | | | | | | VendorParty 49994D | | 0..1 49996D | | |

Fig. 499H

| | | | | | | | | | | | | |
|---|---|---|---|---|---|---|---|---|---|---|---|---|
| | | | | | | | | | Internal ID 49905E | 0..1 49906E | GDT 49907E | Business Transaction Document Party InternalID 49908E |
| | | | | | | | | | Standard ID 49915E | 0..1 49916E | GDT 49917E | Business Transaction Document Party StandardID 49918E |
| | | | | | | | | Product Recipient Party 49924E | | 0..1 49926E | | |
| | | | | | | | | | Internal ID 49935E | 0..1 49936E | GDT 49937E | Business Transaction Document Party InternalID 49938E |
| | | | | | | | | | Standard ID 49945E | 0..1 49946E | GDT 49947E | Business Transaction Document Party StandardID 49948E |

Fig. 499I

| | | | | | | | | | | | |
|---|---|---|---|---|---|---|---|---|---|---|---|
| | | | Location 49950E | | | | ShipFrom Location 49954E | | 0..1 49956E | GDT 49957E | Business Transaction Document ShipFrom Location 49958E |
| | | | | | | | | Internal ID 49965E | 0..1 49966E | GDT 49967E | Location InternalID 49968E |
| | | | | | | | | Standard ID 49975E | 0..1 49976E | GDT 49977E | Location StandardID 49978E |
| | | | | | | | ShipTo Location 49984E | | 0..1 49986E | GDT 49987E | BusinessTransactionDocumentShipTo Location 49988E |
| | | | | | | | | Internal ID 49995E | 0..1 49996E | GDT 49997E | Location InternalID 49998E |
| | | | | | | | | Standard ID 49905F | 0..1 49906F | GDT 49907F | Location StandardID 49908F |
| | | | Schedule Line 49910F | | | | ScheduleLine 49914F | | 1 49916F | | |
| | | | | | | | | Delivery Period 49925F | 1 49926F | GDT 49927F | DateTime Period 49928F |
| | | | | | | | | Quantity 49935F | 1 49936F | GDT 49937F | Quantity 49938F |

Fig. 499AA

| Package 499A00 | level 1 499A02 | level 2 499A04 | level 3 499A06 | level 4 499A08 | level 5 499A10 | Card. 499A12 | Data Type Name 499A14 | |
|---|---|---|---|---|---|---|---|---|
| ReplenishmentOrderProposalConfirmationMessage 499A16 | ReplenishmentOrderProposalMessage 499A18 | | | | | | MDT 499A20 | ReplenishmentOrderProposalMessage 499A22 |
| MessageHeader 499A24 | | MessageHeader 499A26 | | | | 1 499A28 | GDT 499A30 | BusinessDocumentMessageHeader 499A32 |
| | | | ID 499A34 | | | 1 499A36 | GDT 499A38 | BusinessDocumentMessageID 499A40 |
| | | | CreationDateTime 499A42 | | | 1 499A44 | GDT 499A46 | DateTime 499A48 |

Fig. 499AB

| ReplenishmentOrderProposalConfirmationMessage 499A16 | | | | | | | | | |
|---|---|---|---|---|---|---|---|---|---|
| | Replenishment OrderProposal 499A50 | | Replenishment OrderProposal 499A52 | | | | 1 499A54 | XXX 499A56 | Replenishment OrderProposal 499A58 |
| | | | | @actionCode 499A60 | | | 1 499A62 | GDT 499A64 | ActionCode 499A66 |
| | | | | @complete Transmission Indicator 499A68 | | | 1 499A70 | GDT 499A72 | CompleteTransmission Indicator 499A74 |
| | | | | ID 499A76 | | | 1 499A78 | GDT 499A80 | BusinessTransaction DocumentID 499A82 |
| | | | | Purchasing GroupID 499A84 | | | 0..1 499A86 | GDT 499A88 | PurchasingGroupID 499A90 |
| | | | | Transshipment MethodCode 499A92 | | | 0..1 499A94 | GDT 499A96 | TransshipmentMethod Code 499A98 |
| | | | | Consignment Indicator 499A00A | | | 0..1 499A02 A | GDT 499A04 A | ConsignmentIndicator 499A06A |

Fig. 499AC

| ReplenishmentOrderProposalConfirmationMessage 499A16 | | | | | |
|---|---|---|---|---|---|
| ReplenishmentOrderProposal 499A50 | | | | | |
| | OrderPeriod 499A08A | | 0..1 499A10A | GDT 499A12A | DateTimePeriod 499A14A |
| | DeliveryPeriod 499A16A | | 0..1 499A18A | GDT 499A20A | DateTimePeriod 499A22A |
| Party 499A24A | BuyerParty 499A26A | | 0..1 499A28A | | |
| | | InternalID 499A30A | 0..1 499A32A | GDT 499A34A | BusinessTransaction DocumentPartyInternalID 499A36A |
| | VendorParty 499A38A | | 0..1 499A40A | | |
| | | InternalID 499A42A | 0..1 499A44A | GDT 499A46A | BusinessTransaction DocumentPartyInternalID 499A48A |
| | | StandardID 499A50A | 0..1 499A52A | GDT 499A54A | BusinessTransaction DocumentPartyStandardID 499A56A |

Fig. 499AD

| | | | | | | | |
|---|---|---|---|---|---|---|---|
| ReplenishmentOrderProposalConfirmationMessage 499A16 | | | | | | | |
| ReplenishmentOrderProposal 499A50 | | | | | | | |
| Party 499A24A | | | | | | | |
| | | ProductRecipient Party 499A58A | | | 0..1 499A60A | | |
| | | | InternalID 499A62A | | 0..1 499A64A | GDT 499A66A | BusinessTransaction DocumentPartyInternalID 499A68A |
| | | | StandardID 499A70A | | 0..1 499A72A | GDT 499A74A | BusinessTransaction DocumentPartyStandardID 499A76A |
| Location 499A78A | | ShipFrom Location 499A80A | | | 1 499A82A | GDT 499A84A | BusinessTransaction DocumentShipFromLocation 499A86A |
| | | | InternalID 499A88A | | 0..1 499A90A | GDT 499A92A | LocationInternalID 499A94A |
| | | | StandardID 499A96A | | 0..1 499A98A | GDT 499A00B | LocationStandardID 499A02B |

Fig. 499AE

| | | | | | | | | | | |
|---|---|---|---|---|---|---|---|---|---|---|
| ReplenishmentOrderProposalConfirmationMessage 499A16 | | | | | | | | | | |
| | ReplenishmentOrderProposal 499A50 | | | | | | | | | |
| | | Location 499A78A | | | | | | | | |
| | | | | | ShipToLocation 499A04B | | | 1 499A06B | GDT 499A08B | BusinessTransactionDocumentShipToLocation 499A10B |
| | | | | | | InternalID 499A12B | | 0..1 499A14B | GDT 499A16B | LocationInternalID 499A18B |
| | | | | | | StandardID 499A20B | | 0..1 499A22B | GDT 499A24B | LocationStandardID 499A26B |
| | | Business Document Object Reference 499A28B | | | PurchaseOrder Reference 499A30B | | | 0..1 499A32B | GDT 499A34B | BusinessTransactionDocumentReference 499A36B |
| | | | | | | ID 499A38B | | 1 499A40B | GDT 499A42B | BusinessTransactionDocumentItemID 499A44B |

Fig. 499AF

| | | | | | | |
|---|---|---|---|---|---|---|
| ReplenishmentOrderProposalConfirmationMessage 499A16 | | | | | | |
| ReplenishmentOrderProposal | | | 499A50 | | | |
| Item 499A46B | | Item 499A48 B | | 0..n 499A50 B | | ReplenishmentOrder ProposalItem 499A52B |
| | | | @actionCode 499A54B | 1 499A56 B | GDT 499A58 B | ActionCode 499A60B |
| | | | @complete TransmissionIndicator 499A62B | 1 499A64 B | GDT 499A66 B | CompleteTransmission Indicator 499A68B |
| | | | ID 499A70B | 1 499A72 B | GDT 499A74 B | BusinessTransaction DocumentItemID 499A76B |
| | | | PurchasingGroupID 499A78B | 0..1 499A80 B | GDT 499A82 B | PurchasingGroupID 499A84B |
| | | | TransshipmentMethod Code 499A86B | 0..1 499A88 B | GDT 499A90 B | TransshipmentMethodCode 499A92B |
| | | | ConsignmentIndicator 499A94B | 0..1 499A96 B | GDT 499A98 B | ConsignmentIndicator 499A00C |
| | | | ReturnsIndicator 499A02C | 0..1 499A04 C | GDT 499A06 C | ReturnsIndicator 499A08C |

Fig. 499AG

| | | | | | |
|---|---|---|---|---|---|
| ReplenishmentOrderProposalConfirmationMessage 499A16 | | | | | |
| ReplenishmentOrderProposal 499A50 | | | | | |
| Item 499A46B | | | | | |
| | PlanningRelevance Indicator 499A10C | | 0..1 499A12 C | GDT 499A14 C | PlanningRelevance Indicator 499A16C |
| | CompletedIndicator 499A18C | | 0..1 499A20 C | GDT 499A22 C | BusinessTransaction CompletedIndicator 499A24C |
| | ReceivedQuantity 499A26C | | 0..1 499A28 C | GDT 499A30 C | Quantity 499A32C |
| | OrderPeriod 499A34C | | 0..1 499A36 C | GDT 499A38 C | DateTimePeriod 499A40C |
| Product Information 499A42C | Product 499A44C | | 1 499A46 C | GDT 499A48 C | BusinessTransaction DocumentProduct 499A50C |
| | | InternalID 499A52C | 1 499A54 C | GDT 499A56 C | ProductInternalID 499A58C |
| | | StandardID 499A60C | 1 499A62 C | GDT 499A64 C | ProductStandardID 499A66C |

Fig. 499AH

| | | | | |
|---|---|---|---|---|
| ReplenishmentOrderProposalConfirmationMessage 499A16 | | | | |
| ReplenishmentOrderProposal 499A50 | | | | |
| Item 499A46B | | | | |
| ProductInformation 499A42C | | | | |
| ProductCategory 499A68C | | 0..1 499A70 C | GDT 499A72 C | BusinessTransactionDocumentProduct Category 499A74C |
| | InternalID 499A76C | 1 499A78 C | GDT 499A80 C | ProductCategory InternalID 499A82C |
| VendorProduct Category 499A84C | | 0..1 499A86 C | GDT 499A88 C | BusinessTransactionDocumentProduct Category 499A90C |
| | InternalID 499A92C | 1 499A94 C | GDT 499A96 C | ProductCategory InternalID 499A98C |

Fig. 499AI

| | | | | | |
|---|---|---|---|---|---|
| ReplenishmentOrderProposalConfirmationMessage 499A16 | | | | | |
| ReplenishmentOrderProposal 499A50 | | | | | |
| Item 499A46B | | | | | |
| Party 499A00D | BuyerParty 499A02D | | 0..1 499A04D | | |
| | | InternalID 499A06D | 0..1 499A08D | GDT 499A10D | BusinessTransactionDocumentPartyInternalID 499A12D |
| | VendorParty 499A14D | | 0..1 499A16D | | |
| | | InternalID 499A18D | 0..1 499A20D | GDT 499A22D | BusinessTransactionDocumentPartyInternalID 499A24D |
| | | StandardID 499A26D | 0..1 499A28D | GDT 499A30D | BusinessTransactionDocumentPartyStandardID 499A32D |
| | ProductRecipientParty 499A34D | | 0..1 499A36D | | |

Fig. 499AJ

| | | | | | |
|---|---|---|---|---|---|
| ReplenishmentOrderProposalConfirmationMessage 499A16 | | | | | |
| ReplenishmentOrderProposal 499A50 | | | | | |
| Item 499A46B | | | | | |
| Party 499A00D | | | | | |
| | | InternalID 499A38D | 0..1 499A40D | GDT 499A42D | BusinessTransactionDocumentPartyInternalID 499A44D |
| | | StandardID 499A46D | 0..1 499A48D | GDT 499A50D | BusinessTransactionDocumentPartyStandardID 499A52D |
| Location 499A54D | ShipFromLocation 499A56D | | 0..1 499A58D | GDT 499A60D | BusinessTransactionDocumentShipFromLocation 499A62D |
| | | InternalID 499A64D | 0..1 499A66D | GDT 499A68D | LocationInternalID 499A70D |
| | | StandardID 499A72D | 0..1 499A74D | GDT 499A76D | LocationStandardID 499A78D |
| | ShipToLocation 499A80D | | 0..1 499A82D | GDT 499A84D | BusinessTransactionDocumentShipToLocation 499A86D |

Fig. 499AK

| | | | | | |
|---|---|---|---|---|---|
| ReplenishmentOrderProposalConfirmationMessage 499A16 | | | | | |
| ReplenishmentOrderProposal 499A50 | | | | | |
| Item 499A46B | | | | | |
| Location 499A54D | | | | | |
| | | InternalID 499A88D | 0..1 499A90D | GDT 499A92D | LocationInternalID 499A94D |
| | | StandardID 499A96D | 0..1 499A98D | GDT 499A00E | LocationStandardID 499A02E |
| Business Document Object Reference 499A04E | PurchaseOrder Reference 499A06E | | 0..1 499A08E | GDT 499A10E | BusinessTransaction DocumentReference 499A12E |
| | | ID 499A14E | 1 499A16E | GDT 499A18E | BusinessTransaction DocumentID 499A20E |
| | | ItemID 499A22E | 1 499A24E | GDT 499A26E | BusinessTransaction DocumentItemID 499A28E |

Fig. 499AL

| | | | |
|---|---|---|---|
| ReplenishmentOrderProposalConfirmationMessage 499A16 | | | |
| ReplenishmentOrderProposal 499A50 | | | |
| Item 499A46B | | | |
| ScheduleLine 499A30E | | | |
| ConfirmedScheduleLine 499A32E | | | |
| | 1 499A34E | | |
| PurchaseOrderItemScheduleLineReferenceID 499A36E | 0..1 499A38E | GDT 499A40E | BusinessTransactionDocumentItemSceduleLineID 499A42E |
| DeliveryPeriod 499A44E | 0..1 499A46E | GDT 499A48E | DateTimePeriod 499A50E |
| Quantity 499A52E | 0..1 499A54E | GDT 499A56E | Quantity 499A58E |

Fig. 499AM

| | | | | | |
|---|---|---|---|---|---|
| ReplenishmentOrderProposalConfirmationMessage 499A16 | | | | | |
| ReplenishmentOrderProposal 499A50 | | | | | |
| Item 499A46B | | | | | |
| ScheduleLine 499A30E | Confirmed ScheduleLine 499A32E | | 1 499A34 E | | |
| | | PurchaseOrder ItemSchedule LineReferenceID 499A36E | 0..1 499A38 E | GDT 499A40 E | BusinessTransaction DocumentItem SceduleLineID 499A42E |
| | | DeliveryPeriod 499A44E | 0..1 499A46 E | GDT 499A48 E | DateTimePeriod 499A50E |
| | | Quantity 499A52E | 0..1 499A54 E | GDT 499A56 E | Quantity 499A58E |

Fig. 502A

| Packages 50202 | level 1 50204 | level 2 50206 | level 3 50208 | level 4 50210 | level 5 50212 | level 6 50214 | Card. 50216 | Data Type Name 50218 | |
|---|---|---|---|---|---|---|---|---|---|
| ReturnDeliveryInstructionNotification 50220 | ReturnDelivery-Notification 50222 | | | | | | 1 50224 | MDT 50226 | ReturnDeliveryInstructionNotification 50228 |
| Business Document Header 50230 | | MessageHeader 50232 | | | | | 1 50234 | GDT 50236 | BusinessDocumentMessageHeader 50238 |
| | | | ID 50240 | | | | 1 50242 | GDT 50244 | BusinessDocumentMessageID 50246 |
| | | | CreationDateTime 50248 | | | | 1 50250 | GDT 50252 | DateTime 50254 |
| | | | SenderParty 50256 | | | | 0..1 50258 | GDT 50260 | BusinessDocumentMessageHeaderParty 50262 |
| | | | | InternalID 50264 | | | 0..1 50266 | GDT 50268 | PartyInternalID 50270 |
| | | | | StandardID 50272 | | | 0..n 50274 | GDT 50276 | PartyStandardID 50278 |

Fig. 502B

| ReturnDeliveryInstructionNotification 50220 | | | | | | | | | |
|---|---|---|---|---|---|---|---|---|---|
| | | | RecipientParty 50280 | | | | 0..1 50282 | GDT 50284 | BusinessDocument-MessageHeaderParty 50286 |
| | | | | InternalID 50288 | | | 0..1 50290 | GDT 50292 | PartyInternalID 50294 |
| | | | | StandardID 50296 | | | 0..n 50298 | GDT 50200A | PartyStandardID 50202A |
| ReturnDelivery Instruction 50204A | | ReturnDelivery-Instruction 50206A | | | | | 1 50208A | | ReturnDeliveryInstruction 50210A |
| | | | ID 50212A | | | | 0..1 50214A | GDT 50216A | BusinessTransactionDocumentID 50218A |
| | | | CreationDateTime 50220A | | | | 1 50222A | GDT 50224A | DateTime 50226A |
| | | | DeliveryTypeCode 50228A | | | | 0..1 50230A | GDT 50232A | DeliveryTypeCode 50234A |

Fig. 502C

| ReturnDeliveryInstructionNotification 50220 | | | | | | | | | | | |
|---|---|---|---|---|---|---|---|---|---|---|---|
| | | Party 50236A | | | BuyerParty 50238A | | | | 0..1 50240A | GDT 50242A | BusinessTransactionDocumentParty 50244A |
| | | | | | | InternalID 50246A | | | 0..1 50248A | GDT 50250A | PartyInternalID 50252A |
| | | | | | | StandardID 50254A | | | 0..n 50256A | GDT 50258A | PartyStandardID 50260A |
| | | | | | | BuyerID 50262A | | | 0..1 50264A | GDT 50266A | PartyPartyID 50268A |
| | | | | | | VendorID 50270A | | | 0..1 50272A | GDT 50274A | PartyPartyID 50276A |
| | | | | | | Address 50278A | | | 0..1 50280A | GDT 50282A | Address 50284A |
| | | | | | VendorParty 50286A | | | | 1 50288A | GDT 50290A | BusinessTransactionDocumentParty 50292A |
| | | | | | | InternalID 50294A | | | 0..1 50296A | GDT 50298A | PartyInternalID 50200B |

Fig. 502D

| ReturnDeliveryInstructionNotification | | | | | | 50220 | | | | | |
|---|---|---|---|---|---|---|---|---|---|---|---|
| | | | | | StandardID 50202B | | | 0..n 50204B | GDT 50206B | PartyStandardID 50208B |
| | | | | | BuyerID 50210B | | | 0..1 50212B | GDT 50214B | PartyPartyID 50216B |
| | | | | | VendorID 50218B | | | 0..1 50220B | GDT 50222B | PartyPartyID 50224B |
| | | | | | Address 50226B | | | 0..1 50228B | GDT 50230B | Address 50232B |
| | | | | ProductRecipientParty 50234B | | | | 0..1 50236B | GDT 50238B | BusinessTransactionDocumentParty 50240B |
| | | | | | InternalID 50242B | | | 0..1 50244B | GDT 50246B | PartyInternalID 50248B |
| | | | | | StandardID 50250B | | | 0..n 50252B | GDT 50254B | PartyStandardID 50256B |
| | | | | | BuyerID 50258B | | | 0..1 50260B | GDT 50262B | PartyPartyID 50264B |
| | | | | | VendorID 50266B | | | 0..1 50268B | GDT 50270B | PartyPartyID 50272B |
| | | | | | Address 50274B | | | 0..1 50276B | GDT 50278B | Address 50280B |

Fig. 502E

| ReturnDeliveryInstructionNotification 50220 | | | | | | | | | | | |
|---|---|---|---|---|---|---|---|---|---|---|---|
| | | Location 50282B | | | ShipFromLocation 50284B | | | | 0..1 50286B | GDT 50288B | BusinessTransactionDocument ShipFromLocation 50290B |
| | | | | | | InternalID 50292B | | | 0..1 50294B | GDT 50296B | LocationInternalID 50298B |
| | | | | | | StandardID 50200C | | | 0..n 50202C | GDT 50204C | LocationStandardID 50206C |
| | | | | | | BuyerID 50208C | | | 0..1 50210C | GDT 50212C | LocationPartyID 50214C |
| | | | | | | VendorID 50216C | | | 0..1 50218C | GDT 50220C | LocationPartyID 50222C |
| | | | | | | Note 50224C | | | 0..1 50226C | GDT 50228C | Note 50230C |
| | | | | | | LoadingLocation 50232C | | | 0..1 50234C | GDT 50236C | BusinessTransactionDocumentLocation 50238C |

Fig. 502F

| ReturnDeliveryInstructionNotification 50220 | | | | | |
|---|---|---|---|---|---|
| | | InternalID 50240C | 0..1 50242C | GDT 50244C | LocationInternalID 50246C |
| | | StandardID 50248C | 0..n 50250C | GDT 50252C | LocationStandardID 50254C |
| | | BuyerID 50256C | 0..1 50258C | GDT 50260C | LocationPartyID 50262C |
| | | VendorID 50264C | 0..1 50266C | GDT 50268C | LocationPartyID 50270C |
| | Address 50272C | | 0..1 50274C | GDT 50276C | Address 50278C |
| ShipToLocation 50280C | | | 0..1 50282C | GDT 50284C | BusinessTransactionDocumentShipToLocation 50286C |
| | InternalID 50288C | | 0..1 50290C | GDT 50292C | LocationInternalID 50294C |
| | StandardID 50296C | | 0..n 50298C | GDT 50200D | LocationStandardID 50202D |
| | BuyerID 50204D | | 0..1 50206D | GDT 50208D | LocationPartyID 50210D |

Fig. 502G.1

| ReturnDeliveryInstructionNotification 50220 | | | | | |
|---|---|---|---|---|---|
| | VendorID 50212D | | 0..1 50214D | GDT 50200 | LocationPartyID 50200 |
| | Note 50200 | | 0..1 50216D | GDT 50218D | Note 50220D |
| | UnloadingLocation 50222D | | 0..1 50224D | GDT 50226D | BusinessTransaction-DocumentLocation 50228D |
| | | InternalID 50230D | 0..1 50232D | GDT 50234D | LocationInternalID 50236D |
| | | StandardID 50238D | 0..n 50240D | GDT 50242D | LocationStandardID 50244D |
| | | BuyerID 50246D | 0..1 50248D | GDT 50250D | LocationPartyID 50252D |
| | | VendorID 50256D | 0..1 50258D | GDT 50260D | LocationPartyID 50262D |
| | Address 50264D | | 0..1 50266D | GDT 50268D | Address 50270D |
| Note 50272D | | | 0..1 50274D | GDT 50276D | Note 50278D |

Fig. 502G.2

| ReturnDeliveryInstructionNotification 50220 | | | | |
|---|---|---|---|---|
| Item 50280D | Item 50282D | 1..n 50284D | | ReturnDeliveryInstructionItem 50286D |
| | ID 50288D | 0..1 50290D | GDT 50292D | BusinessTransactionDocumentItemID 50294D |
| | DeliveryTypeCode 50296D | 0..1 50298D | GDT 50200E | DeliveryTypeCode 50202E |
| BusinessTransactionDocumentReference 50204E | ReturnAuthorisationRequestReference 50206E | 0..1 50208E | GDT 50210E | BusinessTransactionDocumentReference 50212E |
| | ReturnMaterialAuthorisationID 50214E | 1 50216E | GDT 50218E | ReturnMaterialAuthorisationID 50220E |
| Party 50222E | BuyerParty 50224E | 0..1 50226E | GDT 50228E | BusinessTransactionDocumentParty 50230E |
| | InternalID 50232E | 0..1 50234E | GDT 50236E | PartyInternalID 50238E |
| | StandardID 50240E | 0..n 50242E | GDT 50244E | PartyStandardID 50246E |

Fig. 502H

| ReturnDeliveryInstructionNotification 50220 | | | | |
|---|---|---|---|---|
| | BuyerID 50248E | 0..1 50250E | GDT 50252E | PartyPartyID 50254E |
| | VendorID 502056E | 0..1 50258E | GDT 50260E | PartyPartyID 50262E |
| | Address 50264E | 0..1 50266E | GDT 50268E | Address 50270E |
| CarrierParty 50272E | | 0..n 50274E | GDT 50276E | BusinessTransactionDocumentParty 50278E |
| | InternalID 50280E | 0..1 50282E | GDT 50284E | PartyInternalID 50286E |
| | StandardID 50288E | 0..n 50290E | GDT 50292E | PartyStandardID 50294E |
| | BuyerID 50296E | 0..1 50298E | GDT 50200F | PartyPartyID 50202F |
| | VendorID 50204F | 0..1 50206F | GDT 50208F | PartyPartyID 50210F |
| | Address 50212F | 0..1 50214F | GDT 50216F | Address 50218F |

Fig. 502I

| ReturnDeliveryInstructionNotification 50220 | | | | | | |
|---|---|---|---|---|---|---|
| ProductInformation 50220F | | Product 50222F | | 1 50224F | GDT 50226F | BusinessTransactionDocumentProduct 50228F |
| | | | InternalID 50230F | 0..1 50232F | GDT 50234F | ProductInternalID 50236F |
| | | | StandardID 50238F | 0..1 50240F | GDT 50242F | ProductStandardID 50244F |
| | | | BuyerID 50246F | 0..1 50248F | GDT 50250F | ProductPartyID 50252F |
| | | | VendorID 50254F | 0..1 50256F | GDT 50258F | ProductPartyID 50260F |
| Batch 50262F | | Batch 50264F | | 0..1 50266F | | |
| | | | InternalID 50266F | 0..1 50268F | GDT 50270F | BatchID 50272F |
| | | | VendorID 50274F | 0..1 50276F | GDT 50278F | BatchID 50280F |
| | | | ProductRecipientID 50282F | 0..1 50284F | GDT 50286F | BatchID 50288F |
| | | | ManufacturingDate 50290F | 0..1 50292F | GDT 50294F | Date 50296F |

Fig. 502J

| ReturnDeliveryInstructionNotification 50220 | | | | | | |
|---|---|---|---|---|---|---|
| | | | BestBeforeDate 50298F | 0..1 50200G | GDT 50202G | Date 50204G |
| | | | OriginCountryCode 50206G | 0..1 50208G | GDT 50210G | CountryCode 50212G |
| | | SerialID 50214G | | 0..n 50216G | GDT 50218G | SerialID 50220G |
| | | GroupID 50200 | | 0..1 50200 | GDT 50200 | BusinessTransaction-DocumentItemGroupID 50200 |
| | | DeliveryPeriod 50222G | | 0..1 50224G | GDT 50236G | DateTimePeriod 50228G |
| | | RequestedQuantity 50230G | | 0..1 50232G | GDT 50234G | Quantity 50236G |
| | | ApprovedQuantity 50238G | | 1 50240G | GDT 50242G | Quantity 50244G |
| | | Note 50246G | | 0..1 50248G | GDT 50250G | Note 50252G |
| Handling Unit 50254G | Handling Unit 50256G | | | 0..n 50258G | GDT 50260G | HandlingUnit 50262G |
| | | ID 50264G | | 1 50255G | GDT 50268G | HandlingUnitID 50270G |

Fig. 502K

| ReturnDeliveryInstructionNotification 50220 | | | | | | |
|---|---|---|---|---|---|---|
| LoadCarrier 50272G | | | 1 50274G | GDT 50276G | | |
| | Product 50278G | | 1 50280G | GDT 50282G | | |
| | | InternalID 50284G | 0..1 50286G | GDT 50288G | ProductInternalID 50290G | |
| | | Standard ID 50292G | 0..1 50294G | GDT 50296G | ProductStandardID 50298G | |
| | | Buyer ID 50200H | 0..1 50202H | GDT 50204H | ProductPartyID 50206H | |
| | | Vendor ID 50208H | 0..1 50210H | GDT 50212H | ProductPartyID 50214H | |
| HeightMeasure 50216H | | | 0..1 50218H | GDT 50220H | Measure 50222H | |
| LengthMeasure 50224H | | | 0..1 50226H | GDT 50228H | Measure 50230H | |
| WidthMeasure 50232H | | | 0..1 50234H | GDT 50236H | Measure 50238H | |
| GrossVolumeMeasure 50240H | | | 0..1 50242H | GDT 50244H | Measure 50246H | |
| NetVolumeMeasure 50248H | | | 0..1 50250H | GDT 50252H | Measure 50254H | |

Fig. 502L

| ReturnDeliveryInstructionNotification 50220 | | | | | | | | | | | | |
|---|---|---|---|---|---|---|---|---|---|---|---|---|
| | | | | | | GrossWeightMeasure 50256H | | | 0..1 50258H | GDT 50260H | Measure 50262H |
| | | | | | | NetWeightMeasure 50264H | | | 0..1 50266H | GDT 50268H | Measure 50270H |
| | | | | | | Load 50272H | | | 0..n 50274H | GDT 50276H | |
| | | | | | | | BusinessTransactionDocumentReference 50278H | | | GDT 50280H | |
| | | | | | | | | Item ID 50282H | 1 50284H | GDT 50286H | BusinessTransactionDocumentItemID 50288H |
| | | | | | | | Quantity 50289H | | 1 50290H | GDT 50291H | Quantity 50292H |
| | | | | | | | SerialID 50293H | | 0..1 50294H | GDT 50295H | SerialID 50296H |

Fig. 505A

| Package 50500D | L1 50502D | L2 50504D | L3 50506D | L4 50508D | L5 50510D | C 50512D | Data Type Name 50514D | |
|---|---|---|---|---|---|---|---|---|
| RFQLegal Document Message 50500 | RFQLegal Document Message 50501 | | | | | | MDT 50502 | RFQLegal Document Message 50503 |
| RFQ 50504 | | RFQ 50505 | | | | 1 50506 | AGDT 50507 | RFQ Information 50508 |
| | | | ID 50509 | | | 1 50510 | GDT 50511 | Business Transaction DocumentID 50512 |
| | | | PostingDate Time 50513 | | | 0..1 50514 | GDT 50515 | DateTime 50516 |
| | | | LastChange DateTime 50517 | | | 0..1 50518 | GDT 50519 | DateTime 50520 |
| | | | PublishDate Time 50521 | | | 0..1 50522 | GDT 50523 | DateTime 50524 |
| | | | DisplayDate Time 50525 | | | 0..1 50526 | GDT 50527 | DateTime 50528 |
| | | | BiddingStart DateTime 50529 | | | 0..1 50530 | GDT 50531 | DateTime 50532 |

Fig. 505B

| | | | | | | | | |
|---|---|---|---|---|---|---|---|---|
| RFQLegalDocumentMessage 50500 | | | | | | | | |
| | RFQ 50504 | | | | | | | |
| | | | QuoteSubmissionDate Time 50533 | | | 0..1 50534 | GDT 50535 | DateTime 50536 |
| | | | QuoteOpeningDateTime 50537 | | | 0..1 50538 | GDT 50539 | DateTime 50540 |
| | | | QuoteBindingDateTime 50541 | | | 0..1 50542 | GDT 50543 | DateTime 50544 |
| | | | ContractValidityPeriod 50545 | | | 0..1 50546 | GDT 50547 | DateTimePeriod 50548 |
| | | | Note 50549 | | | 0..1 50550 | GDT 50551 | Note 50552 |
| | | | RFQPublicIndicator 50553 | | | 0..1 50554 | GDT 50555 | BusinessTransaction DocumentPublic Indicator 50556 |
| | | | QuoteUnplannedItem PermissionCode 50557 | | | 0..1 50558 | GDT 50559 | UnplannedItem PermissionCode 50560 |

Fig. 505C

| | | | | | | | | | |
|---|---|---|---|---|---|---|---|---|---|
| RFQLegalDocumentMessage 50500 | | | | | | | | | |
| RFQ 50504 | | | | | | | | | |
| | | | QuotePriceBiddingConditionCode 50561 | | | 0..1 50562 | GDT 50563 | BiddingConditionCode 50564 |
| | | | QuoteQuantityBiddingConditionCode 50565 | | | 0..1 50566 | GDT 50567 | BiddingConditionCode 50568 |
| | | | QuoteItemBiddingConditionCode 50569 | | | 0..1 50570 | GDT 50571 | BiddingConditionCode 50572 |
| | | | ContractTargetAmount 50573 | | | 0..1 50574 | GDT 50575 | Amount 50576 |
| Party 50577 | | | BuyerParty 50578 | | | 0..1 50579 | AGDT 50580 | BusinessTransactionDocumentParty 50581 |
| | | | | StandardID 50582 | | 0..n 50583 | CDT 50584 | PartyStandardID 50585 |
| | | | | InternalID 50586 | | 0..1 50587 | CDT 50588 | PartyInternalID 50589 |
| | | | | Address 50590 | | 0..1 50591 | AGDT 50592 | Address 50593 |
| | | | | ContactPerson 50594 | | 0..1 50595 | AGDT 50596 | ContactPerson 50597 |

Fig. 505D

| | | | | |
|---|---|---|---|---|
| RFQLegalDocumentMessage 50500 | | | | |
| RFQ 50504 | | | | |
| Party 50577 | | | | |
| | InternalID 50598 | 0..1 50599 | CDT 50500A | ContactPersonID 50501A |
| | Address 50502A | 0..1 50503A | AGDT 50504A | Address 50505A |
| BidderParty 50506A | | 0..1 50507A | AGDT 50508A | BusinessTransactionDocumentParty 50509A |
| BidderPortalProviderParty 50510A | | 0..1 50511A | AGDT 50512A | BusinessTransactionDocumentParty 50513A |
| ProductRecipientParty 50514A | | 0..1 50515A | AGDT 50516A | BusinessTransactionDocumentParty 50517A |
| VendorParty 50518A | | 0..1 50519A | AGDT 50520A | BusinessTransactionDocumentParty 50521A |
| ManufacturerParty 50522A | | 0..1 50523A | AGDT 50524A | BusinessTransactionDocumentParty 50525A |
| PayerParty 50526A | | 0..1 50527A | AGDT 50528A | BusinessTransactionDocumentParty 50529A |

Fig. 505E

| | | | | | | |
|---|---|---|---|---|---|---|
| RFQLegalDocumentMessage 50500 | | | | | | |
| RFQ 50504 | | | | | | |
| Location 50530A | ShipToLocation 50531A | | | 0..1 50532A | AGDT 50533A | BusinessTransaction DocumentLocation 50534A |
| | | StandardID 50535A | | 0..n 50536A | CDT 50537A | LocationStandardId 50538A |
| | | InternalID 50539A | | 0..1 50540A | CDT 50541A | LocationInternalId 50542A |
| | | Address 50543A | | 0..1 50544A | AGDT 50545A | Address 50546A |
| Delivery Information 50547A | DeliveryTerms 50548A | | | 0..1 50549A | AGDT 50550A | DeliveryTerms 50551A |
| | | Incoterms 50552A | | 0..1 50553A | GDT 50554A | Incoterms 50555A |
| Payment Information 50556A | CashDiscount Terms 50557A | | | 0..1 50558A | AGDT 50559A | CashDiscountTerms 50560A |
| | | MaximumCashDiscount 50561A | | 0..1 50562A | GDT 50563A | CashDiscount 50564A |
| | | NormalCashDiscount 50565A | | 0..1 50566A | GDT 50567A | CashDiscount 50568A |
| | | FullPaymentDueDays Value 50569A | | 0..1 50570A | | |

Fig. 505F

| | | | | | | |
|---|---|---|---|---|---|---|
| RFQLegalDocumentMessage 50500 | | | | | | |
| RFQ 50504 | | | | | | |
| PaymentInformation 50556A | | | | | | |
| | PaymentForm 50571A | | | 0..1 50572A | | |
| | | Code 50573A | | 1 50574A | GDT 50575A | PaymentFormCode 50576A |
| ProductInformation 50577A | ProductCategory 50578A | | | 0..1 50579A | GDT 50580A | BusinessTransactionDocumentProductCategory 50581A |
| | | StandardID 50582A | | 0..n 50583A | CDT 50584A | ProductCategoryStandardID 50585A |
| | | InternalID 50586A | | 0..1 50587A | CDT 50588A | ProductCategoryInternalID 50589A |
| FollowUpBusinessTransactionDocument 50590A | FollowUpPurchaseOrder 50591A | | | 0..1 50592A | | |
| | | RequirementCode 50593A | | 1 50594A | GDT 50595A | FollowUpBusinessTransactionDocumentRequirementCode 50596A |

Fig. 505G

| | | | | | | | | |
|---|---|---|---|---|---|---|---|---|
| RFQLegalDocumentMessage 50500 | | | | | | | | |
| RFQ 50504 | | | | | | | | |
| FollowUpBusinessTransactionDocument 50590A | | | | | | | | |
| | | | FollowUp PurchaseContract 50597A | | | 0..1 50598A | | |
| | | | | Requirement Code 50599A | | 1 50500B | GDT 50501B | FollowUpBusiness TransactionDocument RequirementCode 50502B |
| Attachment 50503B | | | AttachmentWebAddress 50504B | | | 0..n 50505B | GDT 50506B | AttachmentWeb Address 50507B |
| | | | InternalAttachmentWeb Address 50508B | | | 0..n 50509B | GDT 50510B | AttachmentWeb Address 50511B |
| | | | LegalDocument Attachment 50512B | | | 0..n 50513B | GDT 50514B | Attachment 50515B |
| Description 50516B | | | Description 50517B | | | 0..1 50518B | GDT 50519B | Description 50520B |
| | | | InternalDescription 50521B | | | 0..1 50522B | GDT 50523B | Description 50524B |

Fig. 505H

| | | | | | | | | | | |
|---|---|---|---|---|---|---|---|---|---|---|
| RFQLegalDocumentMessage 50500 | | | | | | | | | | |
| | RFQ 50504 | | | | | | | | | |
| | | Item 50525B | | | Item 50526B | | | 0..n 50527B | AGDT 50528B | RFQInformationItem 50529B |
| | | | | | | ID 50530B | | 1 50531B | GDT 50532B | BusinessTransaction DocumentItemID 50533B |
| | | | | | | Contract TargetAmount 50534B | | 0..1 50535B | GDT 50536B | Amount 50537B |
| | | | | | | Hierarchy Relationship 50538B | | 0..1 50539B | | |
| | | | | | | | ParentItemID 50540B | 1 50541B | GDT 50542B | BusinessTransaction DocumentItemID 50543B |
| | | | | | | | TypeCode 50544B | 1 50545B | GDT 50546B | BusinessTransaction DocumentItemHierarchy RelationshipTypeCode 50547B |

Fig. 505I

| | | | | | | |
|---|---|---|---|---|---|---|
| RFQLegalDocumentMessage | 50500 | | | | | |
| RFQ | 50504 | | | | | |
| Item | 50525B | | | | | |
| Product Information 50548B | Product 50549B | | 0..1 50550B | GDT 50551B | BusinessTransaction DocumentProduct 50552B | |
| | | StandardID 50553B | 0..n 50554B | CDT 50555B | ProductStandardID 50556B | |
| | | ManufacturerID 50557B | 0..1 50558B | CDT 50559B | ProductPartyID 50560B | |
| | | TypeCode 50561B | 0..1 50562B | GDT 50563B | ProductTypeCode 50564B | |
| | | Note 50565B | 0..1 50566B | GDT 50567B | Note 50568B | |
| | Product Category 50569B | | 0..1 50570B | GDT 50571B | BusinessTransaction DocumentProduct 50572B | |
| | | StandardID 50573B | 0..n 50574B | CDT 50575B | ProductCategory StandardID 50576B | |
| Party 50577B | BuyerParty 50578B | | 0..1 50579B | AGDT 50580B | BusinessTransaction DocumentParty 50581B | |
| | BidderParty 50582B | | 0..1 50583B | AGDT 50584B | BusinessTransaction DocumentParty 50585B | |

Fig. 505J

| | | | | | |
|---|---|---|---|---|---|
| RFQLegalDocumentMessage | 50500 | | | | |
| RFQ | 50504 | | | | |
| Item | 50525B | | | | |
| | ProductRecipientParty 50586B | | 0..1 50587B | AGDT 50588B | BusinessTransactionDocumentParty 50589B |
| | VendorParty 50590B | | 0..1 50591B | AGDT 50592B | BusinessTransactionDocumentParty 50593B |
| | ManufacturerParty 50594B | | 0..1 50595B | AGDT 50596B | BusinessTransactionDocumentParty 50597B |
| Location 50598B | ShipToLocation 50599B | | 0..1 50500C | AGDT 50501C | BusinessTransactionDocumentLocation 50502C |
| | | StandardID 50503C | 0..n 50504C | CDT 50505C | LocationStandardId 50506C |
| | | BuyerID 50507C | 0..1 50508C | CDT 50509C | LocationPartyId 50510C |
| | | BidderID 50511C | 0..1 50512C | CDT 50513C | LocationPartyId 50514C |
| | | Address 50515C | 0..1 50516C | AGDT 50517C | Address 50518C |

Fig. 505K

| | | | | | |
|---|---|---|---|---|---|
| RFQLegalDocumentMessage 50500 | | | | | |
| RFQ 50504 | | | | | |
| Item 50525B | | | | | |
| Delivery Information 50519C | DeliveryTerms 50520C | | 0..1 50521C | AGDT 50522C | DeliveryTerms 50523C |
| | | MaximumLead TimeDuration 50524C | 0..1 50525C | GDT 50526C | Duration 50527C |
| | | Incoterms 50528C | 0..1 50529C | GDT 50530C | Incoterms 50531C |
| Business Transaction Document Reference 50532C | PurchaseContract Reference 50533C | | 0..1 50534C | GDT 50535C | BusinessTransaction DocumentReference 50536C |
| | | ID 50537C | 1 50538C | GDT 50539C | BusinessTransaction DocumentID 50540C |
| | | ItemID 50541C | 0..n 50542C | GDT 50543C | BusinessTransaction DocumentItemID 50544C |

Fig. 505L

| | | | | | | |
|---|---|---|---|---|---|---|
| RFQLegalDocumentMessage | 50500 | | | | | |
| RFQ | 50504 | | | | | |
| Item | 50525B | | | | | |
| | BuyerProductCatalogue Reference 50545C | | 0..1 50546C | AGDT 50547C | CatalogueReference 50548C | |
| | | ID 50549C | 1 50550C | GDT 50551C | CatalogueID 50552C | |
| | | ItemID 50553C | 0..1 50554C | GDT 50555C | CatalogueItemID 50556C | |
| Attachment 50557C | AttachmentWebAddress 50558C | | 0..n 50559C | GDT 50560C | AttachmentWebAddress 50561C | |
| | InternalAttachmentWeb Address 50562C | | 0..n 50563C | GDT 50564C | AttachmentWebAddress 50565C | |
| Description 50566C | Description 50567C | | 0..1 50568C | GDT 50569C | Description 50570C | |
| | InternalDescription 50571C | | 0..1 50572C | GDT 50573C | Description 50574C | |

Fig. 505M

| | | | | | | | | | | |
|---|---|---|---|---|---|---|---|---|---|---|
| RFQLegalDocumentMessage | | | | | | 50500 | | | | |
| | RFQ | | | | | 50504 | | | | |
| | | Item | | | | 50525B | | | | |
| | | | Schedule Line 50575C | | | ScheduleLine 50576C | | 0..1 50577C | AGDT 50578C | RFQItemScheduleLine 50579C |
| | | | | | | | ID 50580C | 0..1 50581C | GDT 50582C | BusinessTransaction DocumentItemSchedule LineID 50583C |
| | | | | | | | DeliveryPeriod 50584C | 1 50585C | AGDT 50586C | DateTimePeriod 50587C |
| | | | | | | | Quantity 50588C | 0..1 50589C | GDT 50590C | Quantity 50591C |

Fig. 508A

| Pack. 50800 | level 1 50802 | level 2 50804 | level 3 50806 | level 4 50808 | level 5 50810 | level 6 50812 | level 7 50814 | level 8 50816 | Card. 50818 | Type 50820 | Name 50822 |
|---|---|---|---|---|---|---|---|---|---|---|---|
| SupplyChainException Report Message 50824 | Supply Chain Exception Report Notification 50826 | | | | | | | | | MDT 50828 | Supply ChainException Report Message 50830 |

Fig. 508B

| SupplyChainExceptionReportMessage 50824 | | | | | | |
|---|---|---|---|---|---|---|
| MessageHeader 50832 | MessageHeader 50834 | | | 1 50836 | GDT 50838 | BusinessDocumentMessageHeader 50840 |
| | | ID 50842 | | 1 50844 | GDT 50846 | BusinessDocumentMessageID 50848 |
| | | CreationDateTime 50850 | | 1 50852 | GDT 50854 | DateTime 50856 |
| | | SenderParty 50858 | | 0..1 50860 | GDT 50862 | BusinessDocumentMessageHeaderParty 50864 |
| | | | InternalID 50866 | 0..1 50868 | GDT 50870 | PartyInternalID 50872 |
| | | | StandardID 50874 | 0..n 50876 | GDT 50878 | PartyStandardID 50880 |
| | | RecipientParty 50882 | | 0..1 50884 | GDT 50886 | BusinessDocumentMessageHeaderParty 50888 |

Fig. 508C

| | | | | | | | |
|---|---|---|---|---|---|---|---|
| SupplyChainExceptionReportMessage 50824 | | | | | | | |
| MessageHeader 50826 | | | | | | | |
| | | | InternalID 50890 | 0..1 50892 | GDT 50894 | PartyInternalID 50896 |
| | | | StandardID 50898 | 0..n 50802A | GDT 50804A | PartyStandardID 50806A |
| SupplyChain Exception Report 50808A | SupplyChain ExceptionReport 50810A | | | 1 50810A | | SupplyChainExceptionReport 50812A |
| Party 50814A | | BuyerParty 50816A | | 0..1 50818A | GDT 50820A | BusinessTransaction DocumentParty 50822A |
| | | | InternalID 50824A | 0..1 50826A | GDT 50828A | PartyInternalID 50830A |
| | | | StandardID 50832A | 0..n 50834A | GDT 50836A | PartyStandardID 50838A |

Fig. 508D

| | | | | | |
|---|---|---|---|---|---|
| SupplyChainExceptionReportMessage 50824 | | | | | |
| SupplyChainExceptionReport 50836 | | | | | |
| Party 50814A | | | | | |
| | BuyerID 50840A | 0..1 50842A | GDT 50844A | PartyPartyID 50846A |
| | VendorID 50848A | 0..1 50850A | GDT 50852A | PartyPartyID 50854A |
| VendorParty 50856A | | 0..1 50858A | GDT 50860A | BusinessTransaction DocumentParty 50862A |
| | InternalID 50864A | 0..1 50866A | GDT 50868A | PartyInternalID 50870A |
| | StandardID 50872A | 0..n 50874A | GDT 50876A | PartyStandardID 50878A |
| | BuyerID 50880A | 0..1 50882A | GDT 50884A | PartyPartyID 50886A |
| | VendorID 50888A | 0..1 50890A | GDT 50892A | PartyPartyID 50894A |

Fig. 508E

| | | | | | |
|---|---|---|---|---|---|
| SupplyChainExceptionReportMessage 50824 | | | | | |
| SupplyChainExceptionReport 50836 | | | | | |
| Party 50814A | | | | | |
| ProductRecipientParty 50896A | | 0..1 50898A | GDT 50802B | BusinessTransactionDocumentParty 50804B | |
| | InternalID 50806B | 0..1 50808B | GDT 50810B | PartyInternalID 50812B | |
| | StandardID 50814B | 0..n 50816B | GDT 50818B | PartyStandardID 50820B | |
| | BuyerID 50822B | 0..1 50824B | GDT 50826B | PartyPartyID 50828B | |
| | VendorID 50830B | 0..1 50832B | GDT 50834B | PartyPartyID 50836B | |

Fig. 508F

| | | | | | |
|---|---|---|---|---|---|
| SupplyChainExceptionReportMessage 50824 | | | | | |
| SupplyChainExceptionReport 50836 | | | | | |
| Supply Chain Exception 50838B | SupplyChain Exception 50840B | | 1..n 50842B | | SupplyChainException 50844B |
| | | @actionCode 50846B | 0..1 50848B | GDT 50850B | ActionCode 50852B |
| | | InternalID 50854B | 0..1 50856B | GDT 50858B | BusinessTransaction DocumentID 50860B |
| | | BuyerID 50862B | 0..1 50864B | GDT 50866B | BusinessTransaction DocumentID 50868B |
| | | VendorID 50870B | 0..1 50872B | GDT 50874B | BusinessTransaction DocumentID 50876B |
| | | Name 50878B | 0..1 50880B | GDT 50882B | Name 50884B |

Fig. 508G

| | | | | |
|---|---|---|---|---|
| SupplyChainExceptionReportMessage 50824 | | | | |
| SupplyChainExceptionReport 50836 | | | | |
| SupplyChainException 50838B | | | | |
| TypeID 50886B | 1 50888B | GDT 50890B | SupplyChainExceptionTypeID 50890B | |
| CreationDateTime 50892B | 1 50894B | GDT 50896B | DateTime 50898B | |
| LastChangeDateTime 50802C | 0..1 50804C | GDT 50806C | DateTime 50808C | |
| StatusCode 50810C | 0..1 50812C | GDT 50814C | SupplyChainExceptionStatus Code 50816C | |
| ProcessingPriorityCode 50818C | 1 50820C | GDT 50822C | BusinessTransaction PriorityCode 50824C | |
| ValidityPeriod 50826C | 0..1 50828C | GDT 50830C | DateTimePeriod 50832C | |

Fig. 508H

| | | | | |
|---|---|---|---|---|
| SupplyChainExceptionReportMessage 50824 | | | | |
| SupplyChainExceptionReport 50836 | | | | |
| SupplyChainException 50838B | | | | |
| Business Transaction Document Reference 50832C | PurchaseOrderReference 50834C | 0..1 50836C | GDT 50838C | BusinessTransaction DocumentReference 50840C |
| | SchedulingAgreement Reference 50842C | 0..1 50844C | GDT 50846C | BusinessTransaction DocumentReference 50848C |
| | SalesOrderReference 50850C | 0..1 50852C | GDT 50854C | BusinessTransaction DocumentReference 50856C |
| | InboundDeliveryReference 50858C | 0..1 50860C | GDT 50862C | BusinessTransaction DocumentReference 50864C |

Fig. 508I

| | | | | | | |
|---|---|---|---|---|---|---|
| SupplyChainExceptionReportMessage 50824 | | | | | | |
| SupplyChainExceptionReport 50836 | | | | | | |
| SupplyChainException 50838B | | | | | | |
| Location 50866C | ShipFrom Location 50868C | | 0..1 50870C | GDT 50872C | BusinessTransactionDocumentShipFromLocation 50874C |
| | | InternalID 50876C | 0..1 50878C | GDT 50880C | LocationInternalID 50882C |
| | | StandardID 50884C | 0..1 50886C | GDT 50888C | LocationStandardID 50890C |
| | | BuyerID 50892C | 0..1 50894C | GDT 50896C | LocationPartyID 50898C |
| | | VendorID 50802D | 0..1 50804D | GDT 50806D | LocationPartyID 50808D |
| | ShipToLocation 50810D | | 0..1 50812D | GDT 50814D | BusinessTransactionDocumentShipToLocation 50816D |

Fig. 508J

| | | | |
|---|---|---|---|
| SupplyChainExceptionReportMessage 50824 | | | |
| SupplyChainExceptionReport 50836 | | | |
| SupplyChainException 50838B | | | |
| Location 50866C | | | |
| InternalID 50818D | 0..1 50820D | GDT 50822D | LocationInternalID 50824D |
| StandardID 50826D | 0..1 50828D | GDT 50830D | LocationStandardID 50832D |
| BuyerID 50834D | 0..1 50836D | GDT 50838D | LocationPartyID 50840D |
| VendorID 50842D | 0..1 50844D | GDT 50846D | LocationPartyID 50848D |

Fig. 508K

| | | | | | |
|---|---|---|---|---|---|
| SupplyChainExceptionReportMessage 50824 | | | | | |
| SupplyChainExceptionReport 50836 | | | | | |
| SupplyChainException 50838B | | | | | |
| Product Information 50850D | Product 50852D | | 0..1 50854D | GDT 50856D | BusinessTransactionDocumentProduct 50858D |
| | | InternalID 50860D | 0..1 50862D | GDT 50864D | ProductInternalID 50866D |
| | | StandardID 50868D | 0..1 50870D | GDT 50872D | ProductStandardID 50874D |
| | | BuyerID 50876D | 0..1 50878D | GDT 50880D | ProductPartyID 50882D |
| | | VendorID 50884D | 0..1 50886D | GDT 50888D | ProductPartyID 50890D |
| | | ChangeID 50892D | 0..1 50894D | GDT 50896D | ProductChangeID 50898D |
| | | PackageQuantity 50802E | 0..1 50804E | GDT 50806E | Quantity 50808E |

Fig. 508L

| | | | | | |
|---|---|---|---|---|---|
| SupplyChainExceptionReportMessage 50824 | | | | | |
| SupplyChainExceptionReport 50836 | | | | | |
| SupplyChainException 50838B | | | | | |
| Batch 50810E | Batch 50812E | | 0..1 50814E | | |
| | | InternalID 50816E | 0..1 50818E | GDT 50820E | BatchInternalID 50822E |
| | | BuyerID 50824E | 0..1 50826E | GDT 50828E | BatchPartyID 50830E |
| | | VendorID 50832E | 0..1 50834E | GDT 50836E | BatchPartyID 50838E |
| | | ManufacturingDate 50840E | 0..1 50842E | GDT 50844E | Date 50846E |
| | | BestBeforeDate 50848E | 0..1 50850E | GDT 50852E | Date 50854E |
| | | OriginCountryCode 50856E | 0..1 50858E | GDT 50860E | CountryCode 50862E |

Fig. 508M

| | | | | | | | | |
|---|---|---|---|---|---|---|---|---|
| SupplyChainExceptionReportMessage | | | 50824 | | | | | |
| SupplyChainExceptionReport | | | 50836 | | | | | |
| SupplyChainException | | | 50838B | | | | | |
| Property Valuation 50864E | Property Valuation 50866E | | | | | 0..n 50868E | GDT 50870E | Property Valuation 50872E |
| | | Property Reference 50874E | | | | 1 50876E | GDT 50878E | Property Reference 50880E |
| | | | ID 50882E | | | 1 50884E | GDT 50886E | PropertyID 50888E |
| | | Value Group 50890E | | | | 1 50892E | | |
| | | | Property Value 50894E | | | 1 50896E | GDT 50898E | Property Value 50802F |

Fig. 508N

| | | | | | |
|---|---|---|---|---|---|
| SupplyChainExceptionReportMessage 50824 | | | | | |
| SupplyChainExceptionReport 50836 | | | | | |
| SupplyChainException 50838B | | | | | |
| PropertyValuation 50864E | | | | | |
| AmountSpecification 50802F | | 0..1 50804F | | |
| | Amount 50806F | 1 50808F | GDT 50810F | Amount 50812F |
| QuantitySpecification 50814F | | 0..1 50816F | | |
| | Quantity 50818F | 1 50820F | GDT 50822F | Quantity 50824F |
| DateTimeSpecification 50826F | | 0..1 50828F | | |
| | DateTime 50830F | 1 50832F | GDT 50834F | DateTime 50836F |
| NameSpecification 50838F | | 0..1 50840F | | |

Fig. 508O

| | | | | | | |
|---|---|---|---|---|---|---|
| SupplyChainExceptionReportMessage 50824 | | | | | | |
| SupplyChainExceptionReport 50836 | | | | | | |
| SupplyChainException 50838B | | | | | | |
| PropertyValuation 50864E | | | | | | |
| | | | Name 50842F | 1 50843F | GDT 50844F | Name 50846F |
| | Note 50848F | | | 0..1 50850F | GDT 50852F | Note 50854F |
| Log 50856F | Validation Log 50858F | | | 0..1 50860F | GDT 50862F | Log 50864F |
| | | MinimumLogItem SeverityCode 50866F | | 0..1 50868F | GDT 50870F | LogItem Severity Code 50872F |
| | | Item 50874F | | 1..n 50876F | GDT 50878F | LogItem 50880F |

Fig. 508P

| | | | |
|---|---|---|---|
| SupplyChainExceptionReportMessage 50824 | | | |
| SupplyChainExceptionReport 50836 | | | |
| SupplyChainException 50838B | | | |
| Log 50856F | | | |
| TypeID 50882F | 1 50884F | CCT 50886F | Identifier 50888F |
| SeverityCode 50890F | 0..1 50892F | GDT 50894F | LogItemSeverityCode 50896F |
| Note 50898F | 0..1 50802G | GDT 50804G | Note 50806G |

Fig. 511A

| Package 51100 | level 1 51102 | level 2 51104 | level 3 51106 | level 4 51108 | level 5 51110 | Card. 51112 | DataType Name 51114 | |
|---|---|---|---|---|---|---|---|---|
| VATDeclarationMessage 51116 | VATDeclaration Message 51118 | | | | | | MDT 51120 | VATDeclaration Message 51122 |
| MessageHeader 51124 | | Message Header 51126 | | | | 0..1 51128 | GDT 51130 | BusinessDocumentMessageHeader 51132 |
| | | | ID 51134 | | | 1 51136 | GDT 51138 | BusinessDocumentMessageID 51140 |
| | | | Refernce ID 51142 | | | 0..1 51144 | GDT 51146 | BusinessDocumentMessageID 51148 |
| | | | CreationDateTime 51150 | | | 1 51152 | GDT 51154 | DateTime 51156 |

Fig. 511B

| VATDeclarationMessage 51116 | | | | | | | | | |
|---|---|---|---|---|---|---|---|---|---|
| | VATDeclaration 51158 | | VATDeclaration 51160 | | | | 1 51162 | XXX 51164 | VATDeclaration 51166 |
| | | | | @actionCode 51168 | | | 0..1 51170 | GDT 51172 | ActionCode 51174 |
| | | | | ID 51176 | | | 1 51178 | GDT 51180 | BusinessTransactionDocumentID 51182 |
| | | | | Period 51184 | | | 1 51186 | GDT 51188 | DatePeriod 51190 |
| | | | | AcceptanceStatusCode 51192 | | | 0..1 51194 | GDT 51196 | AcceptanceStatusCode 51198 |
| | | | | PaymentAmount 51100A | | | 1 51102A | GDT 51104A | Amount 51106A |

Fig. 511C

| VATDeclarationMessage 51116 | | | | | | | | | | |
|---|---|---|---|---|---|---|---|---|---|---|
| | | | | | Advance Payment Amount 51108A | | | 0..1 51110A | GDT 51112A | Amount 51114A |
| | | | | | TaxDueClearingIndicator 51116A | | | 1 51118A | GDT 51120A | DueClearingIndicator 51122A |
| | | | | | CollectionAuthorisationRevocationIndicator 51124A | | | 0..1 51126A | GDT 51128A | RevocationIndicator 51130A |
| | | | | | Note 51132A | | | 0..1 51134A | GDT 51136A | Note 51138A |
| | | Log 51140A | | | ValidationLog 51142A | | | 0..1 51144A | XXX 51146A | VATDeclaration ValidationLog 51148A |

Fig. 511D

| VATDeclarationMessage 51116 | | | | | | | | | | |
|---|---|---|---|---|---|---|---|---|---|---|
| | | | | | | Item 51150A | | 1..n 51152A | GDT 51154A | LogItem 51156A |
| | | | | | | | TypeID 51158A | 0..1 51160A | CCT 51162A | Identifier 51164A |
| | | | | | | | Severity Code 51166A | 0..1 51168A | GDT 51170A | LogItemSeverity Code 51172A |
| | | | | | | | Note 51174A | 1 51176A | GDT 51178A | Note 51180A |
| | | Party 51182A | | | TaxPayerParty 51184A | | | 1 51186A | GDT 51188A | BusinessTransactionDocument Party 51190A |
| | | | | | | TaxID 51192A | | 1 51194A | GDT 51196A | PartyTaxID 51198A |

Fig. 511E

| VATDeclarationMessage 51116 | | | | | | | | | | |
|---|---|---|---|---|---|---|---|---|---|---|
| | | | | | | Address 51100B | | 0..1 51102B | GDT 51104B | Address 51106B |
| | | | | | TaxAuthorityParty 51108B | | | 1 51110B | GDT 51112B | TaxAuthorityParty 51114B |
| | | | | | TaxOperator Party 51116B | | | 0..1 51118B | GDT 51120B | BusinessTransactionDocument Party 51122B |
| | | | | | | Address 51124B | | 0..1 51126B | GDT 51128B | Address 51130B |
| | | | | | | Contact Person 51132B | | 1 51134B | GDT 51136B | ContactPerson 51138B |
| | | | | | | | Address 51140B | 1 51142B | GDT 51144B | Address 51146B |

Fig. 511F

| VATDeclarationMessage 51116 | | | | | | | | | | |
|---|---|---|---|---|---|---|---|---|---|---|
| | | Item 51148B | | | Item 51150B | | | 0..n 51152B | XXX 51154B | VATDeclarationItem 51156B |
| | | | | | | TaxDeclarationAmoutTypeCode 51158B | | 1 51160B | GDT 51162B | TaxDeclarationAmoutTypeCode 51164B |
| | | | | | | Amount 51166B | | 1 51168B | GDT 51170B | Amount 51172B |
| | | | | | | Note 51174B | | 0..1 51176B | GDT 51178B | Note 51180B |

Fig. 512A

| Package 51200 | level 1 51202 | level 2 51204 | level 3 51206 | level 4 51208 | level 5 51210 | Card. 51212 | DataType Name 51214 | |
|---|---|---|---|---|---|---|---|---|
| VATDeclaration RequestMessage 51216 | VATDecla ration RequestM essage 51218 | | | | | | MDT 51220 | VATDeclaration RequestMessa ge 51222 |
| MessageHeader 51224 | | Message Header 51226 | | | | 0..1 51228 | GDT 51230 | BusinessDocu mentMessageH eader 51232 |
| | | | ID 51234 | | | 1 51236 | GDT 51238 | BusinessDocu mentMessageI D 51240 |
| | | | Creation DateTim e 51242 | | | 1 51244 | GDT 51246 | DateTime 51248 |

Fig. 512B

| VATDeclarationRequestMessage 51216 | | | | | | | | |
|---|---|---|---|---|---|---|---|---|
| VATDeclaration 51250 | | VATDeclaration 51252 | | | | 1 51254 | XXX 51256 | VATDeclarationRequest 51258 |
| | | | @actionCode 51260 | | | 1 51262 | GDT 51264 | ActionCode 51266 |
| | | | ID 51268 | | | 1 51270 | GDT 51272 | BusinessTransactionDocumentID 51274 |
| | | | Period 51276 | | | 1 51278 | GDT 51280 | DatePeriod 51282 |
| | | | PaymentAmount 51284 | | | 1 51286 | GDT 51288 | Amount 51290 |
| | | | AdvancePaymentAmount 51292 | | | 0..1 51294 | GDT 51296 | Amount 51298 |

Fig. 512C

| VATDeclarationRequestMessage | | | | | 51216 | | | | | |
|---|---|---|---|---|---|---|---|---|---|---|
| | | | | | TaxDue Clearingl ndicator 51200A | | | 1 51202A | GDT 51204A | DueClearingInd icator 51206A |
| | | | | | Collectio nAuthori sation Revocati onIndicat or 51208A | | | 1 51210A | GDT 51212A | RevocationIndi cator 51214A |
| | | | | | Note 51216A | | | 0..1 51218A | GDT 51220A | Note 51222A |
| | | Party 51224A | | | TaxPaye rParty 51226A | | | 1 51228A | GDT 51230A | BusinessTrans actionDocumen tParty 51232A |
| | | | | | | TaxID 51234A | | 1 51236A | GDT 51238A | PartyTaxID 51240A |

Fig. 512D

| VATDeclarationRequestMessage 51216 | | | | | | | | | | |
|---|---|---|---|---|---|---|---|---|---|---|
| | | | | | | Address 51242A | | 0..1 51244A | GDT 51246A | Address 51248A |
| | | | | | TaxAuthorityParty 51250A | | | 1 51252A | GDT 51254A | TaxAuthorityParty 51256A |
| | | | | | TaxOperatorParty 51258A | | | 0..1 51260A | GDT 51262A | BusinessTransactionDocumentParty 51264A |
| | | | | | | Address 51266A | | 0..1 51268A | GDT 51270A | Address 51272A |
| | | | | | | Contact Person 51274A | | 1 51276A | GDT 51278A | ContactPerson 51280A |
| | | | | | | | Address 51282A | 1 51284A | GDT 51286A | Address 51288A |

Fig. 512E

| VATDeclarationRequestMessage | | | | | 51216 | | | | | |
|---|---|---|---|---|---|---|---|---|---|---|
| | | Item<br>51290A | | | Item<br>51292A | | | 1..n<br>51294A | XXX<br>51296A | VATDeclaration Item<br>51298A |
| | | | | | | TaxDeclarationAmout TypeCode<br>51200B | | 1<br>51202B | GDT<br>51204B | TaxDeclaration AmoutTypeCode<br>51206B |
| | | | | | | Amount<br>51208B | | 1<br>51210B | GDT<br>51212B | Amount<br>51214B |
| | | | | | | Note<br>51216B | | 0..1<br>51218B | GDT<br>51220B | Note<br>51222B |

Fig 513A

| Package 51300 | level1 51302 | level2 51304 | level3 51306 | level4 51308 | level5 51310 | Card. 51312 | DataType Name 51314 | |
|---|---|---|---|---|---|---|---|---|
| VATDeclarationConfirmationMessage 51316 | VATDeclarationConfirmationMessage 51318 | | | | | | MDT 51320 | VATDeclarationConfirmationMessage 51322 |
| MessageHeader 51324 | | MessageHeader 51326 | | | | 0..1 51328 | GDT 51330 | MessageHeader 51332 |
| | | | ID 51334 | | | 1 51336 | GDT 51338 | BusinessDocumentMessageID 51340 |
| | | | ReferenceID 51342 | | | 0..1 51344 | GDT 51346 | BusinessDocumentMessageID 51348 |
| | | | CreationDateTime 51350 | | | 1 51352 | GDT 51354 | DateTime 51356 |

Fig. 513B

| VATDeclarationConfirmationMessage 51316 | | | | | | | | |
|---|---|---|---|---|---|---|---|---|
| VATDeclaration 51358 | | VATDeclaration 51360 | | | | 1 51362 | XXX 51364 | VATDeclarationConfirmation 51366 |
| | | | ID 51368 | | | 0..1 51370 | GDT 51372 | BusinessTransactionDocumentID 51374 |
| | | | Period 51376 | | | 0..1 51378 | GDT 51380 | DatePeriod 51382 |
| | | | AcceptanceStatusCode 51384 | | | 1 51386 | GDT 51388 | AcceptanceStatusCode 51390 |
| Log 51392 | | | ValidationLog 51394 | | | 0..1 51396 | XXX 51398 | VATDeclarationValidationLog 51300A |
| | | | | Item 51302A | | 1..n 51304A | GDT 51306A | LogItem 51308A |
| | | | | | TypeID 51310A | 0..1 51312A | CCT 51314A | Identifier 51316A |

Fig. 513C

| VATDeclarationConfirmationMessage 51316 | | | | | | | | | | |
|---|---|---|---|---|---|---|---|---|---|---|
| | | | | | | | Severity Code 51318A | 0..1 51320A | GDT 51322A | LogItemSeverityCode 51324A |
| | | | | | | | Note 51326A | 1 51328A | GDT 51330A | Note 51332A |
| | | Party 51334A | | | TaxPayerParty 51336A | | | 1 51338A | GDT 51340A | BusinessTransactionDocumentParty 51342A |
| | | | | | | TaxID 51344A | | 1 51346A | GDT 51348A | PartyTaxID 51350A |
| | | | | | | Address 51352A | | 0..1 51354A | GDT 51356A | Address 51358A |
| | | | | | TaxAuthorityParty 51360A | | | 1 51362A | GDT 51364A | TaxAuthorityParty 51366A |

Fig. 513D

| VATDeclarationConfirmationMessage 51316 | | | | | | | | | | |
|---|---|---|---|---|---|---|---|---|---|---|
| | | | | | TaxOperator Party 51368A | | | 0..1 51370A | GDT 51372A | BusinessTransactionDocumentParty 51374A |
| | | | | | | Address 51376A | | 0..1 51378A | GDT 51380A | Address 51382A |
| | | | | | | Contact Person 51384A | | 1 51386A | GDT 51388A | ContactPerson 51390A |
| | | | | | | | Address 51392A | 1 51394A | GDT 51396A | Address 51398A |

CONSISTENT SET OF INTERFACES DERIVED FROM A BUSINESS OBJECT MODEL

I. CROSS-REFERENCE TO RELATED APPLICATIONS

The following identified U.S. patent applications are relied upon and are incorporated herein by reference in this application in their entirety:

U.S. Patent Application No. 60/577,453, entitled "Interfaces Derived from a Business Object Model Shared by the Heterogeneous Applications," filed on Jun. 4, 2004.

U.S. Patent Application No. 60/581,252, entitled "Interfaces Derived from a Business Object Model Shared by Heterogeneous Applications," filed on Jun. 18, 2004.

U.S. Patent Application No. 60/582,949, entitled "Interfaces Derived from a Business Object Model Shared by Heterogeneous Applications," filed on Jun. 25, 2004.

U.S. Patent Application No. 60/656,598, entitled "Interfaces Derived from a Business Object Model Shared by Heterogeneous Applications," filed on Feb. 25, 2005.

U.S. patent application Ser. No. 11/145,464, entitled "Consistent Set Of Interfaces Derived From A Business Object Model," filed on Jun. 3, 2005.

PCT Patent Application No. PCT/US05/19961, entitled "Consistent Set Of Interfaces Derived From A Business Object Model," filed on Jun. 3, 2005.

U.S. patent application Ser. No. 11/155,368, entitled "Consistent Set Of Interfaces Derived From A Business Object Model," filed on Jun. 17, 2005.

PCT Patent Application No. PCT/US05/021481, entitled "Consistent Set Of Interfaces Derived From A Business Object Model," filed on Jun. 17, 2005.

U.S. patent application Ser. No. 11/166,065, entitled "Consistent Set Of Interfaces Derived From A Business Object Model," filed on Jun. 24, 2005.

PCT Patent Application No. PCT/US05/22137, entitled "Consistent Set Of Interfaces Derived From A Business Object Model," filed on Jun. 24, 2005.

U.S. Patent Application No. 60/729,480, entitled "Consistent Set Of Interfaces Derived From A Business Object Model," filed on Oct. 21, 2005.

PCT Patent Application No. PCT/US06/07760, entitled "Consistent Set Of Interfaces Derived From A Business Object Model," filed on Feb. 27, 2006.

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

II. FIELD

The subject matter described herein relates generally to the generation and use of consistent interfaces derived from a business object model. More particularly, the subject matter described herein relates to the generation and use of consistent interfaces that are suitable for use across industries, across businesses, and across different departments within a business.

III. BACKGROUND

Transactions are common among businesses and between business departments within a particular business. During any given transaction, these business entities exchange information. For example, during a sales transaction, numerous business entities may be involved, such as a sales entity that sells merchandise to a customer, a financial institution that handles the financial transaction, and a warehouse that sends the merchandise to the customer. The end-to-end business transaction may require a significant amount of information to be exchanged between the various business entities involved. For example, the customer may send a request for the merchandise as well as some form of payment authorization for the merchandise to the sales entity, and the sales entity may send the financial institution a request for a transfer of funds from the customer's account to the sales entity's account.

Exchanging information between different business entities is not a simple task. This is particularly true because the information used by different business entities is usually tightly tied to the business entity itself. Each business entity may have its own program for handling its part of the transaction. These programs differ from each other because they typically are created for different purposes and because each business entity may use semantics that differ from the other business entities. For example, one program may relate to accounting, another program may relate to manufacturing, and a third program may relate to inventory control. Similarly, one program may identify merchandise using the name of the product while another program may identify the same merchandise using its model number. Further, one business entity may use U.S. dollars to represent its currency while another business entity may use Japanese Yen. A simple difference in formatting, e.g., the use of upper-case lettering rather than lower-case or title-case, makes the exchange of information between businesses a difficult task. Unless the individual businesses agree upon particular semantics, human interaction typically is required to facilitate transactions between these businesses. Because these "heterogeneous" programs are used by different companies or by different business areas within a given company, a need exists for a consistent way to exchange information and perform a business transaction between the different business entities.

The United Nations established the United Nations Centre for Trade Facilitation and Electronic Business ("UN/CEFACT") to improve worldwide coordination for the exchange of information. The primary focus of UN/CEFACT is to facilitate national and international transactions by simplifying and harmonizing processes, procedures and information flow to contribute to the growth of global commerce. UN/CEFACT is still in its early stages of developing such a harmonized system. Additional information regarding UN/CEFACT can be found at www.unece.org/cefact/.

Currently many standards exist, which offer a variety of interfaces used to exchange business information. Most of these interfaces, however, apply to only one specific industry, and are not consistent between the different standards. Moreover, a number of these interfaces are not consistent within an individual standard. Thus, there is a need for the harmonization of interfaces across these standards and across various industries.

IV. SUMMARY

Methods and systems consistent with the subject matter described herein facilitate e-commerce by providing consistent interfaces that can be used during a business transaction. Such business entities may include different companies within different industries. For example, one company may be in the chemical industry, while another company may be in the automotive industry. The business entities also may include different businesses within a given industry, or they may include different departments within a given company.

The interfaces are consistent across different industries and across different business units because they are generated using a single business object model. The business object model defines the business-related concepts at a central location for a number of business transactions. In other words, the business object model reflects the decisions made about modeling the business entities of the real world acting in business transactions across industries and business areas. The business object model is defined by the business objects and their relationships to each other (overall net structure).

A business object is a capsule with an internal hierarchical structure, behavior offered by its operations, and integrity constraints. Business objects are semantically disjoint, i.e., the same business information is represented once. The business object model contains all of the elements in the messages, user interfaces and engines for these business transactions. Each message represents a business document with structured information. The user interfaces represent the information that the users deal with, such as analytics, reporting, maintaining or controlling. The engines provide services concerning a specific topic, such as pricing or tax.

Methods and systems consistent with the subject matter described herein generate interfaces from the business object model by assembling the elements that are required for a given transaction in a corresponding hierarchical manner. Because each interface is derived from the business object model, the interface is consistent with the business object model and with the other interfaces that are derived from the business object model. Moreover, the consistency of the interfaces is also maintained at all hierarchical levels. By using consistent interfaces, each business entity can easily exchange information with another business entity without the need for human interaction, thus facilitating business transactions.

Methods and systems consistent with the subject matter described herein provide a consistent set of interfaces that are suitable for use with more than one industry. This consistency is reflected at a structural level as well as through the semantic meaning of the elements in the interfaces.

Methods and systems consistent with the subject matter described herein provide an object model and, from this object model, derive two or more interfaces that are consistent.

Methods and systems consistent with the subject matter described herein provide a consistent set of interfaces suitable for use with a business scenario that spans across the components within a company. These components, or business entities, may be heterogeneous.

Additionally, methods and systems consistent with the subject matter described herein provide a consistent set of interfaces suitable for use with different businesses.

An electronic message to request cancellation of an accounting can be generated by a first application that executes in a landscape of computer systems providing message-based services. Transmission of the message to a second application can be initiated in order to request cancellation of the accounting. Responding to a request to cancel an accounting can include receiving a message including an accounting cancellation package and initiating cancellation of an accounting of posting information. An accounting cancellation package can contain an accounting cancellation entity and a business transaction document reference package, where the accounting cancellation entity identifies a first document that characterizes cancellation of an accounting and identifies a type of a second document characterizing posting information previously sent and to be canceled, and the business transaction document reference package contains a reference entity identifying the second document.

In some variations, the posting information can include posting information previously sent for an invoice or credit memo, and the request for cancellation of an accounting can include a request for cancellation of an accounting of an invoice. The posting information can include posting information previously sent with respect to a movement of goods, and the request for cancellation of an accounting can include a request for cancellation of an accounting of a movement of goods. The accounting cancellation package can further contain a note entity characterizing a reason for the cancellation, and a date entity characterizing a date on which the cancellation is to be entered.

An electronic message to request a bank account statement can be generated by a first application that executes in a landscape of computer systems providing message-based services. Transmission of the message to a second application can be initiated in order to request the bank account statement.

The generated message can include a bank account statement package containing a bank account statement entity characterizing a statement of a bank regarding turnovers on a customer bank account. The bank account statement package can also contains a bank account package containing information characterizing a bank account. The bank account statement package further contains a bank account statement item package containing an item entity characterizing a single turnover on a bank account. The bank account statement item package also contains a payment explanation package containing information characterizing payments in a bank account statement. The payment explanation package contains a payment difference explanation package containing information characterizing documents relating to payments in a bank account statement.

The bank account statement package can further contain a party package containing a payment transaction initiator party entity characterizing a party that initiated a payment. The party package can also contain a payment transaction destination party entity characterizing a party that receives payment in case of a bank transfer or whose account is debited in case of a direct debit. The party package can also contain an original payment transaction initiator party entity characterizing a party executing a payment transaction. The party package can also contain a final payment transaction destination party entity characterizing a party to receive a payment or to be debited. The bank account statement package can also include a bank account statement bank account package containing a payment transaction initiator bank account entity characterizing a bank account of a party initiating a payment transaction. The bank account statement bank account package can also contain a payment transaction destination bank account characterizing a bank account of a party receiving a payment or to be debited. The bank account statement package can also include a business transaction document reference package containing a payment reference entity characterizing a document from a payment transaction initiator. The business transaction document reference package can also include a payment order reference entity characterizing a payment order by a payment transaction initiator. The business transaction document reference package can also include a business transaction document reference package. The business transaction document reference package can further contain a bill of exchange reference entity characterizing a bill of exchange number.

The payment explanation package can further contain a payment explanation item characterizing a payment amount. The payment explanation package can also contain a payment explanation party package containing an original payment transaction initiator party entity characterizing an original party on behalf of which a payment transaction is executed. The payment explanation party package can also contain a final payment transaction destination party characterizing a party on behalf of which a payment is received or debited. The payment explanation package can also contain a business document object reference package containing a payment explanation payment transaction initiator invoice reference entity characterizing an invoice of a transaction initiator. The business document object reference package can also contain a payment explanation payment transaction destination invoice reference entity characterizing an invoice of a party receiving a payment or being debited. The business document object reference package can also contain a payment explanation payment transaction initiator contract reference entity characterizing a contract of a transaction initiator. The business document object reference package can also contain a payment explanation payment transaction destination contract reference entity characterizing a contract of a party receiving a payment or being debited. The business document object reference package can also contain a payment explanation payment transaction initiator purchase order reference entity characterizing a purchase order of a transaction initiator. The business document object reference package can also contain a payment explanation payment transaction destination purchase order reference entity characterizing a reference to a purchase order of a party receiving a payment or being debited.

The payment difference explanation package can contain a payment difference explanation item entity characterizing differences between expected and actual payment amounts. The payment difference explanation package can also contain a business document object reference package containing a payment difference explanation payment transaction initiator invoice reference entity characterizing an invoice of a transaction initiator. The business document object reference package can also contain a payment difference explanation payment transaction destination invoice reference entity characterizing an invoice of a party receiving a payment or being debited. The business document object reference package can also contain a payment difference explanation payment transaction initiator contract reference entity characterizing a contract of a transaction initiator. The business document object reference package can also contain a payment difference explanation payment transaction destination contract reference entity characterizing a contract of a party receiving a payment or being debited. The business document object reference package can also contain a payment difference explanation payment transaction initiator purchase order reference entity characterizing a purchase order of a transaction initiator. The business document object reference package can further contain a payment difference explanation payment transaction destination purchase order reference entity characterizing a reference to a purchase order of a party receiving a payment or being debited.

Generating a request for a bank account statement can be accomplished by receiving an electronic message in a landscape of computer systems providing message-based services and initiating generation of a request for a bank account statement. The received message includes a bank account statement package containing a bank account statement entity characterizing a statement of a bank regarding turnovers on a customer bank account. The bank account statement package also includes a bank account package containing information characterizing a bank account. The bank account statement package further contains a bank account statement item package containing an item entity characterizing a single turnover on a bank account. The bank account statement item package also contains a payment explanation package containing information characterizing payments in a bank account statement. The payment explanation package also contains a payment difference explanation package containing information characterizing documents relating to payments in a bank account statement.

An electronic message to request bank account balances for a time period for a group of bank accounts can be generated by a first application that executes in a landscape of computer systems. Transmission of the message to a second application can be initiated in order to request account balances for a time period for a group of bank accounts. Responding to a request for account balances for a time period for a group of bank accounts can include receiving a message including a bank account balance report query package and initiating a request for bank account balances for a time period for a group of bank accounts. The bank account balance report query package can contain a bank account balance report query entity, a bank account package, and item package. The bank account balance report query entity characterizes a request for balance information for a bank account. The bank account package characterizes the bank account for which requests are to be made. The item package characterizes criteria that are relevant for determining bank account balances. The bank account package can contain a bank account entity identifying the bank account for which balance information is to be ascertained. The item package can contain a bank account balance report query item entity characterizing criteria for determining bank account balances. The bank account balance report query item entity can contain a bank account balance type code characterizing a type of a bank account balance and a date period entity identifying a period for which the bank account balances are to be taken into consideration. In some variations, the bank account package can further contain a bank account differentiator entity characterizing the difference between accounts that are managed under one account number. In some variations, the bank account differentiator entity can contain a bank account differentiator ID characterizing a unique identifier to differentiate between bank accounts.

An electronic message to respond to a request for bank account balances for a time period for a group of bank accounts can be generated by a first application that executes in a landscape of computer systems. Transmission of the message to a second application can be initiated in order to receive account balances for a time period for a group of bank accounts. Responding to a request for account balances for a time period for a group of bank accounts can include receiving a message including a bank account balance report package and initiating a request for bank account balances for a time period for a group of bank accounts. The bank account balance report package can contain a bank account balance report entity containing information about balances of a bank account.

In some variations, the bank account balance report package can contain a log package, a bank account package and a bank account balance package. The log package characterizes log messages that are issued when bank account balances are determined and can contain a log entity characterizing a sequence of log messages issued by an application while executing a task. The bank account package characterizes information about the bank account for which requests are made and can contain a bank account entity characterizing the bank account to which balance information belongs, and a bank account differentiator entity characterizing the difference between accounts that are managed under one account number. The bank account differentiator entity can contain a bank account differentiator ID characterizing a unique identifier to differentiate between bank accounts. The bank account balance package characterizes bank account balances, and can contain a bank account balance entity containing bank account balances.

An electronic message to record business document data from a digitized image of the data can be generated by a first application that executes in a landscape of computer systems providing message-based services. Transmission of the message to a second application can be initiated in order to record the digitized business document data either manually or automatically. Responding to a request to record business document data from a digitized image of the data can include receiving a message including a business transaction document image recognition package and initiating recording of the digitized business document data either manually or automatically. A business transaction document image recognition package can contain a business transaction document image recognition request entity characterizing a request for a digitized business document to be recognized and an attachment package containing an attachment entity identifying the digitized business document.

In some variations, the digitized business document to be recognized can include an invoice, and the request to record business document data from an image can include a request for the manual entry of the invoice data. The digitized business document to be recognized can include an invoice, and the request to record business document data from an image can include a request for automatic entry of the invoice data with the use of Optical Character Recognition (OCR) software.

An electronic message requesting to change, create, or delete items in a catalogue can be generated by a first application that executes in a landscape of computer systems providing message-based services. Transmission of the message to a second application can be initiated in order to request to change, create, or delete items in a catalogue. Responding to the request to change, create, or delete items in a catalogue can include receiving a message including a catalogue publication transmission package and initiating generation of a confirmation to the request to change, create, or delete items in a catalog. A catalogue publication transmission package can contain a catalogue entity that characterizes a structured directory of catalogue items.

In some variations, the catalogue publication transmission package can further contain a content package. The content package can contain a content entity, catalogue item package, a catalogue view package, and a transmission information package. The content entity can characterize a list of items to be changed, created, or read. The catalogue item package can contain a catalogue item entity, a catalogue item description entity, a catalogue classification entity, a property valuation entity and a catalogue item relationship entity. The catalogue item entity can characterize information about a catalogue item required to change, create, or delete it. The catalogue item description entity can characterize an item in various locales. The catalogue classification entity can characterize a classification of a catalogue item. The property valuation entity can characterize a value of a property associated with a catalogue item. The catalogue item relationship entity can characterize a relationship between two catalogue items. The catalogue view package can contain a catalogue view entity and a catalogue view item entity. The catalogue view entity can characterize a restricted subset of a catalogue. The catalogue view item entity can characterize a catalogue item to be included in a catalogue view. The transmission information package containing information characterizing a transmission of an object contained in the message.

An electronic message confirming receipt of a request to change, create, or delete items in a catalogue can be generated by a first application that executes in a landscape of computer systems providing message-based services. Transmission of the message to a second application can be initiated in order to confirm receipt of the request to change, create, or delete items in a catalogue. Responding to the confirmation request can include receiving a message including a catalogue publication transmission package and initiating generation of a confirmation that the request to change, create, or delete items in a catalog can be performed. The catalogue publication transmission package can contain a catalogue publication transmission entity characterizing information required to confirm whether items in a catalogue request can be changed, created, or deleted. The catalogue publication transmission package can also contain a catalog package. The catalog package can contain a catalogue entity that can characterize a catalogue of items which can be changed, created, or deleted.

An electronic message to request institutions to carry out one or more payment transactions can be generated by a first application that executes in a landscape of computer systems providing message-based services. Transmission of the message to a second application can be initiated in order to request institutions to carry out on payment transactions. Responding to a request for instructions to carry out one or more payment transactions can include receiving a message including the instructions to carry out one or more payment transactions, and initiating an instruction to a payer's account to record the results of payment transactions.

The message can comprise a collective payment order package which in turn can include a collective payment order entity and a payment order package. The collective payment order entity characterizes an instruction to a credit institution to carry out one or more payment transactions. The payment order package contains a payment order entity characterizing one or more instructions to a credit institution to carry out a payment transaction, and a net amount entity identifying a payment amount associated with the payment order entity.

In some variations, the instruction to a credit institution can comprises a payment form code identifying a form of payment, and the instruction to the payment transaction initiator's account to record the result of the payment transaction can comprises the result of the payment transaction based on a form of payment. The instruction to a credit institution can also comprise an account debit indicator identifying whether or not the payment transaction initiator's account is to be debited, and the instruction to the payment transaction initiator's account to record the result of the payment transaction can comprises an indication as to whether or not the payment transaction initiator's account was debited. The instruction to a credit institution can comprise a payment procedure code identifying one or more technical characteristics of the payment transaction, and the instruction to the payment transaction initiator's account to record the result of the payment transaction can comprises the result of the payment transaction based on a payment procedure code. The instruction to a credit institution can comprise a payment execution date identifying an execution date for the payment transaction, and the instruction to the payment transaction initiator's account to record the result of the payment transaction can comprises a date of execution of the payment transaction.

The collective payment order package can include a party package containing information characterizing information concerning parties involved in the payment transaction, and a bank account package containing information characterizing information concerning banking details of a payment transaction initiator and a bank account to be used by a bank for bank charges.

The party package can include a payment transaction initiator party entity characterizing the party that initiated a payment. The bank account package can include a payment transaction initiator bank account entity characterizing a bank account of the payment transaction initiator, and a bank charges bank account entity characterizing a bank account to be debited with bank charges for a collective payment order.

The payment order package can include a party package containing information characterizing the party that placed the order and a bank account package containing information characterizing banking details for the destination party of the payment transaction. It can also include a payment instruction package containing information characterizing information for participating banks concerning a payment transaction execution, and a state central bank report package containing information characterizing legal reporting information to a central bank. The payment order package further can include information to satisfy a legal reporting requirement for payments to foreign payees, and a business transaction document reference package containing information characterizing references to different documents involved in the payment transaction, such as checks. It can also include a payment explanation package containing information characterizing an explanation for a purpose, and an amount of a payment, which can include references to individual invoices or credit memos.

The party package can include a payment transaction destination party entity characterizing the party that receives a payment or whose account is debited, and an original payment transaction initiator party entity characterizing the party on whose behalf a payment order can be executed by the payment transaction initiator party entity. It can also include a final payment transaction destination party entity characterizing the party that can optionally receive a payment or be debited.

The bank account package can include a payment transaction destination bank account entity characterizing a bank account of the party that the payment transaction is destined.

The payment instruction package can include a payment instruction entity characterizing an instruction to an executing bank related to the payment order, such as to send a bank advice to the payee, and a correspondence bank details entity characterizing details from a bank of a correspondence bank that should be used for forwarding the payment order. The correspondence bank details entity further can include a correspondence bank type code characterizing a type of a correspondence bank, a bank code characterizing an address or identifier for the correspondence bank, and a bank account code characterizing a correspondence bank account.

The state central bank report package can include a central bank report item entity characterizing information to satisfy legal reporting to a central bank and a requirement for payments to foreign payees.

The business transaction document reference package can include a payment reference entity characterizing a reference to a payer's payment document representing an actual payment that includes at least the payment procedure, the payment currency, the payment amount, the payment date and the payment receiver. The payment reference entity can also identify parties involved and banking details associated with a payment. The business transaction document reference package can also include a check reference entity characterizing a reference to a check (i.e., checknumber) that was used for the payment, and a bill of exchange reference entity characterizing a reference to a bill of exchange (i.e., a bill of exchange number) that was used for the payment.

The payment explanation package can include a payment explanation item entity characterizing a payment amount for the payee. It can refer to one or more invoices or other business documents relevant for the payment amount such as potential adjustments applied by the payer.

An electronic message to provide notification of the payment behavior of the business partner can be generated by a first application that executes in a landscape of computer systems providing message-based services. Transmission of the message to a second application can be initiated in order to provide notification of the payment behavior of the business partner. Responding to the message to provide notification of the payment behavior of the business partner can include receiving a message including a credit payment behavior summary package and initiating the notification of the payment behavior of the business partner. A credit payment behavior summary package can contain a credit payment behavior summary message entity and a party package. The credit payment behavior summary message entity can characterize key figures regarding the payment behavior of a business partner. The party package can contain information that characterizes the parties relevant to the payment behavior of the business party.

In some variations, the party package can contain a debtor party entity, a creditor party entity, and a seller party entity. The debtor party entity can characterize a debtor party having a payment obligation. The creditor party entity can characterize a party that owns a receivable due from the debtor party. The seller party entity can characterize a party that has sold a product to the debtor party. The message to provide notification of the payment behavior of the business partner can further contain a product information package. The product information package can contain information that characterizes the product sold to the debtor party. The product information package can further contain a payment information package. The payment information package can contain information that characterizes the payment behavior of the debtor party. The payment information package can contain a last payment entity, an oldest open item entity and a maximum level dunned open item entity. The last payment entity can characterize a last payment received from the debtor party. The oldest open item entity can characterize an oldest open item of the debtor party. The maximum level dunned open item entity can characterize an open item of the debtor party having a highest dunning level.

An electronic message requesting to generate a query regarding creditworthiness of a party can be generated by a first application that executes in a landscape of computer systems providing message-based services. Transmission of the message to a second application can be initiated in order to generate a query regarding creditworthiness of a party. Responding to a message requesting to generate a query regarding creditworthiness of a party can include receiving a message including a credit worthiness query package and initiating a query regarding creditworthiness of a party. The credit worthiness query package can contain a credit worthiness entity and a party package. The credit worthiness entity can characterize a query regarding creditworthiness of a party. The party package can contain a debtor party entity that can characterize a party for whom creditworthiness information is to be provided.

In some variations, the party package can further contain a creditor party entity and a seller party entity. The creditor party entity can characterize a party that owns a receivable due from a debtor. The seller party entity can characterize a party that sells or plans to sell a product to a debtor. The credit worthiness query package can further contain a product information package. The product information package can contain information that can characterize a product category of a product sold or to be sold to a debtor.

An electronic message requesting to generate a response to a query regarding the creditworthiness of a party can be generated by a first application that executes in a landscape of computer systems providing message-based services. Transmission of the message to a second application can be initiated in order to generate a response to a query regarding the creditworthiness of a party. Responding to a message requesting to generate a response to a query regarding creditworthiness of a party can include receiving a message including a credit worthiness query package and initiating a response to a query regarding creditworthiness of a party. The credit worthiness query package can contain a credit worthiness entity, a party package and an information package. The credit worthiness entity can characterize a query regarding creditworthiness of a party. The party package can contain a debtor party entity that can characterize a party for whom creditworthiness information is to be provided. The information package can contain a credit rating entity that can characterize a credit rating for a debtor party.

In some variations, the party package can further contain a creditor party entity and a seller party entity. The creditor party entity can characterize a party that owns a receivable due from a debtor. The seller party entity can characterize a party that sells or plans to sell a product to a debtor. The credit worthiness query package can further contain a product information package. The product information package can contain information that can characterize a product category of a product sold or to be sold to a debtor. The information package can further contain a credit risk class entity, a credit limit entity and a credit exposure entity. The credit risk class entity can characterize a risk of non-payment by a debtor party. The credit limit entity can characterize a credit limit for a debtor party. The credit exposure entity can characterize a level of a credit limit that has been consumed.

An electronic message to request generation of delivery quantity and scheduling information can be generated by a first application that executes in a landscape of computer systems providing message-based services. Transmission of the message to a second application can be initiated in order to request generation of delivery quantity and scheduling information. Responding to the request for generation of delivery quantity and scheduling information can include receiving a message including a purchase request package and initiating a generation of delivery quantity and scheduling information. A purchase request package can contain a purchase request entity and a purchase request item package. The purchase request entity can characterize requisition requirements. The purchase request item package can contain a schedule line package that can characterize quantity and date information associated with a requisition.

In some variations, the party package can further contain a buyer party entity and a bill to party entity. The buyer party entity can characterize a party that buys goods or services. The bill to party entity can characterize a party that is billed for goods or services. The item package can further contain a delivery information package, a delivery schedule item party package, a location package and a schedule line package. The delivery information package can contain a previous delivery entity and a cumulative delivery entity. The previous delivery entity can characterize identification and validity of a last release instance previously transferred in a delivery schedule. The cumulative delivery entity can characterize identification and validity of instances previously transferred in a delivery schedule. The delivery schedule item party package can contain a buyer party entity and a product recipient party entity. The buyer party entity can characterize a party that buys the goods to be delivered. The product recipient party entity can characterize a party that receives a goods delivery. The location package can contain a ship from location entity, a trans-shipment location entity and a ship to location entity. The ship from location entity can characterize a place from which ordered goods are delivered. The trans-shipment location entity can characterize a location to which ordered products are trans-shipped en route to a recipient. The ship to location entity can characterize a place to which ordered goods are delivered. The schedule line package can contain a schedule line entity and a confirmed schedule line entity. The schedule line entity can characterize a statement about goods to be delivered. The confirmed schedule line entity can characterize a confirmation from a vendor party as terms of a delivery of goods from a scheduling agreement An electronic message to request generation of delivery quantity and scheduling information can be generated by a first application that executes in a landscape of computer systems providing message-based services. Transmission of the message to a second application can be initiated in order to request generation of delivery quantity and scheduling information. Responding to the request for generation of delivery quantity and scheduling information can include receiving a message including a purchase request package and initiating a generation of delivery quantity and scheduling information. A purchase request package can contain a purchase request entity and a purchase request item package. The purchase request entity can characterize requisition requirements. The purchase request item package can contain a schedule line package that can characterize quantity and date information associated with a requisition.

In some variations, the party package can further contain a buyer party entity and a bill to party entity. The buyer party entity can characterize a party that buys goods or services. The bill to party entity can characterize a party that is billed for goods or services. The item package can further contain a delivery information package, a delivery schedule item party package, a location package and a schedule line package. The delivery information package can contain a previous delivery entity and a cumulative delivery entity. The previous delivery entity can characterize identification and validity of a last release instance previously transferred in a delivery schedule. The cumulative delivery entity can characterize identification and validity of instances previously transferred in a delivery schedule. The delivery schedule item party package can contain a buyer party entity and a product recipient party entity. The buyer party entity can characterize a party that buys the goods to be delivered. The product recipient party entity can characterize a party that receives a goods delivery. The location package can contain a ship from location entity, a trans-shipment location entity and a ship to location entity. The ship from location entity can characterize a place from which ordered goods are delivered. The trans-shipment location entity can characterize a location to which ordered products are trans-shipped en route to a recipient. The ship to location entity can characterize a place to which ordered goods are delivered. The schedule line package can contain a schedule line entity and a confirmed schedule line entity. The schedule line entity can characterize a statement about goods to be delivered. The confirmed schedule line entity can characterize a confirmation from a vendor party as terms of a delivery of goods from a scheduling agreement.

Generating a notification regarding a shipment event associated with a delivery of goods can be accomplished by using a first application executing in a landscape of computer systems providing message-based services to generate an electronic message and initiating transmission of the message to a second application to generate a shipment notification regarding an event associated with a delivery of goods. The generated message includes a delivery package containing a delivery entity characterizing goods or a combination of goods to be made available for transportation. The delivery package also contains a location package containing a ship to location entity characterizing a place to which goods are shipped. The delivery package also contains an item package containing an item entity characterizing a quantity of goods in a delivery. The item package further contains a product information package containing information characterizing a product in a delivery item.

The delivery package can further contain a handling unit containing information characterizing units of packaging materials and packaged products. The delivery package can also contain a delivery party package containing a buyer party entity characterizing a party that purchased goods specified in a delivery. The delivery party package can also contain a vendor party entity characterizing is a party that delivers goods. The delivery party package can also contain a product recipient party characterizing is party to whom goods are delivered. The delivery party package can also contain a carrier party entity characterizing a party that transports goods. The delivery party package can also contain a bill to party entity characterizing a party to whom an invoice for delivered goods is sent. The delivery package can also contain a transport information package containing a transport means entity characterizing a transport mechanism for a delivery. The transport information package can also contain a transport tracking entity characterizing information tracking a status of a transport of a delivery. The delivery package can also contain a delivery information package containing information characterizing delivery conditions related to a shipping notification.

The location package can further contain a ship from location entity characterizing a place from which goods are shipped. The location package can also contain a trans-shipment location entity characterizing a location at which goods are to be trans-shipped on their way to a recipient. In addition, the item package can further contain a business transaction document reference package containing a purchase order reference entity characterizing a reference to a purchase order or an item in a purchase order. The business transaction document reference package can also contain an origin purchase order reference entity characterizing a reference to an original purchase order or an item within an original purchase order. The business transaction document reference package can also contain a scheduling agreement reference entity characterizing an outline agreement item. The business transaction document reference package can further contain a sales order reference entity characterizing a reference to an item in a sales order. The location package can further contain a batch package containing information characterizing a batch in a delivery item.

Generating a notification regarding a shipment event associated with a delivery of goods can be accomplished by receiving an electronic message in a landscape of computer systems providing message-based services and initiating a notification regarding a shipment event associated with a delivery of goods. The received message includes a delivery package containing a delivery entity characterizing goods or a combination of goods to be made available for transportation. The delivery package also contains a location package containing a ship to location entity characterizing a place to which goods are shipped. The delivery package further contains an item package containing an item entity characterizing a quantity of goods in a delivery. The item package also contains a product information package containing information characterizing a product in a delivery item.

Generating a notification regarding a receipt of a delivery of goods can be accomplished by using a first application executing in a landscape of computer systems providing message-based services to generate an electronic message and initiating transmission of the message to a second application to generate a notification regarding a receipt of a delivery of goods. The generated message includes a delivery package containing a delivery entity characterizing a confirmation of a receipt of a delivery of goods. The delivery package also contains a party package containing a vendor party entity characterizing party that delivered goods or on whose behalf goods were delivered. The delivery package also contains a location package containing information characterizing a place to which goods were delivered. The delivery package further contains an item package containing an item entity characterizing a quantity of goods that were delivered. The item package also contains a product information package containing information characterizing a delivered.

The party package can further contain a product recipient party entity characterizing a party that took delivery of goods. In addition, the item package can further contain a delivery information package containing information characterizing a delivery information for a delivery of goods.

Generating a notification regarding a receipt of a delivery of goods can be accomplished by receiving an electronic message in a landscape of computer systems providing message-based services and initiating generation of a notification regarding a receipt of a delivery of goods. The received message includes a delivery package containing a delivery entity characterizing goods or a combination of goods to be made available for transportation. The delivery package also contains a location package containing a ship to location entity characterizing a place to which goods are shipped. The delivery package further contains an item package containing an item entity characterizing a quantity of goods in a delivery. The item package also contains a product information package containing information characterizing a product in a delivery item.

An electronic message requesting to generate invoicing information associated with a business transaction can be generated by a first application that executes in a landscape of computer systems providing message-based services. Transmission of the message to a second application can be initiated in order to generate invoicing information associated with a business transaction . Responding to the request to generate invoicing information associated with a business transaction can include receiving a message including invoice package and initiating the generation of invoicing information associated with a business transaction. The invoice package can contain an invoice entity and an invoice party package. The invoice entity can characterize payables and receivables for delivered goods and rendered services. The invoice party package can contain a bill to party entity and a bill from party entity. The bill to party entity can characterize a party to which an invoice for deliveries received or services rendered is sent. The bill from party entity can characterize a party initiating an execution of an invoice.

In some variations, the invoice party package can further contain an invoice buyer party entity, an invoice seller party entity, an invoice product recipient party entity, an invoice vendor party entity, an invoice manufacturer party entity, an invoice payer party entity, an invoice payee party entity and an invoice carrier party entity. The invoice buyer party entity can characterize a party authorizing deliveries or services. The invoice seller party entity can characterize a party that sells goods or services. The invoice product recipient party entity can characterize a party to whom goods are delivered or services are provided. The invoice vendor party entity can characterize a party that delivers goods or provides services. The invoice manufacturer party entity can characterize a party that produces goods being invoiced. The invoice payer party entity can characterize a party that pays for goods or services. The invoice payee party entity can characterize a party that receives payment for goods or services. The invoice carrier party entity can characterize a party that transports goods to be invoiced.

The invoice due package can further contain a location package, an invoice delivery information package, an invoice payment information package, an invoice price information package, an invoice tax package, an invoice attachment package, an invoice description package, an invoice item package, an item hierarchy relationship entity, an item product information package, an item price information package, an item tax package, an item package, a business transaction document reference package, an item attachment package, an item description package and an item delivery information package. The location package can contain a ship to location entity and a ship from location entity. The ship to location entity can characterize a place to which goods are shipped or where services are provided. The ship from location entity can characterize a place from which goods are shipped. The invoice delivery information package can contain information that can characterize delivery information for goods being invoiced. The invoice payment information package can contain a cash discount terms entity and a payment form entity. The cash discount terms entity can characterize terms of payment. The payment form entity can characterize a payment form and required data for the payment form. The invoice price information package can contain information that can characterize a total price to be settled for goods or services to be invoiced. The invoice tax package can contain information that can characterize tax price components in an invoice. The invoice attachment package can contain information that can characterize attachment information associated with an invoice. The invoice description package can contain information that can characterize texts associated with an invoice.

The invoice item package can contain an item entity. The item entity can characterize pricing information and taxes for a quantity of product that has been delivered or for a service that has been rendered. The item hierarchy relationship entity can characterize hierarchical relationships between items. The item product information package can contain a product entity and a product category entity. The product entity can characterize a product in an invoice item. The product category entity can characterize a category of a good or service that is being invoiced. The item price information package can contain information that can characterize an amount invoiced for goods delivered or services rendered. The item tax package can contain information that can characterize tax components in a total amount invoiced for goods delivered or services rendered.

The item package can contain an item buyer party entity, an item seller party entity, an item product recipient party entity, an item vendor party entity, an item manufacturer party and a carrier party entity. The item buyer party entity can characterize a party authorizing deliveries or services. The item seller party entity can characterize a party that sells goods or services. The item product recipient party entity can characterize a party to whom goods are delivered or services are provided. The item vendor party entity can characterize a party that delivers goods or provides services. The item manufacturer party can characterize a party that produces goods being invoiced. The carrier party entity can characterize a party that transports goods to be invoiced. The business transaction document reference package can contain a purchase order reference entity, a sales order reference entity, a delivery reference entity, a service acknowledgement reference entity, an origin invoice reference entity, a purchase contract reference entity, a sales contract reference entity, a buyer product catalogue reference entity and a seller product catalogue reference entity. The purchase order reference entity can characterize a purchase order or an item within a purchase order. The sales order reference entity can characterize a sales order or an item within a sales order. The delivery reference entity can characterize a delivery or an item within a delivery. The service acknowledgement reference entity can characterize a confirmation by a seller that a service has been provided. The origin invoice reference entity can characterize a reference to an invoice previously sent. The purchase contract reference entity can characterize a purchase contract or an item within a purchase contract. The sales contract reference entity can characterize a sales contract or an item within a sales contract. The buyer product catalogue reference entity can characterize a product catalogue of a buyer or an item within the catalogue. The seller product catalogue reference entity can characterize a product catalogue of a seller or an item within the catalogue. The item attachment package can contain information that can characterize attachment information associated with an invoice. The item description package can contain information that can characterize texts associated with an invoice. The item delivery information package can characterize delivery information associated with an invoice. In some variations, the item package can further contain an accounting package. The accounting package can contain information that can characterize an assignment of an invoice item net amount or partial amount to a set of account assignment objects.

An electronic message requesting to generate business transaction information can be generated by a first application that executes in a landscape of computer systems providing message-based services. Transmission of the message to a second application can be initiated in order to generate business transaction information. Responding to the request to generate business transaction information can include receiving a message including invoice due package and initiating the generation of business transaction information. An invoice due package can contain an invoice due entity, an invoice due party package, an invoice due location package, an invoice due delivery information package, an invoice due payment information package, an invoice due price information package, an invoice due account assignment package, an invoice due attachment package, an invoice due description package and an invoice due item package. The invoice due entity can characterize details of a business transaction relevant for settling the business transaction. The invoice due party package can contain information that can characterize parties to a business transaction. The invoice due location package can contain information that can characterize locales associated with a business transaction. The invoice due delivery information package can contain information that can characterize a delivery of goods associated with a business transaction. The invoice due payment information package can contain information that can characterize payment terms for a business transaction. The invoice due price information package can contain information that can characterize a total price to be settled for goods or services provided under a business transaction. The invoice due account assignment package can contain information that can characterize account assignment information associated with a business transaction. The invoice due attachment package can contain information that can characterize attachment information associated with a settlement of a business transaction. The invoice due description package can contain information that can characterize texts associated with a settlement of a business transaction. The invoice due item package can contain information that can characterize item information for a settlement of a business transaction.

In some variations, the invoice due party package can further contain a buyer party entity, a seller party entity, a product recipient party entity, a vendor party entity, a bill to party entity, a bill from party entity, a payer party entity and a payee party entity. The buyer party entity can characterize a party that purchases goods or services. The seller party entity can characterize a party that sells goods or services. The product recipient party entity can characterize a party to whom goods are delivered or services are provided. The vendor party entity can characterize a party that delivers goods or provides services. The bill to party entity can characterize a party to which an invoice for goods or services is sent. The bill from party entity can characterize a party that draws up an invoice for goods or services. The payer party entity can characterize a party that pays for goods or services. The payee party entity can characterize a party that receives payment for goods or services. The invoice due location package can further contain a ship to location entity and a ship from location. The ship to location entity can characterize a place to which goods are shipped or where services are provided. The ship from location can characterize a place from which goods are shipped. The invoice due payment information package can further contain a cash discount terms entity and a payment form entity. The cash discount terms entity can characterize terms of payment. The payment form entity can characterize a payment form and required data for the payment form.

The item package can further contain an item entity, an item hierarchy relationship entity, an item product information package, an item price information package, a business transaction document reference package, an item attachment package, an item due description package and a delivery information package. The item entity can characterize information from a business document item that is to be taken into account for a settlement of a business transaction. The item hierarchy relationship entity can characterize hierarchical relationships between items. The item product information package can contain a product entity and a product category entity. The product entity can characterize a product for which an invoice is due. The product category entity can characterize a category of a product or service that is being invoiced. The item price information package can contain a price entity and a procurement cost upper limit entity. The price entity can characterize an amount to be settled for a product or service. The procurement cost upper limit entity can characterize a quantity or value-based restriction placed on a product or service to be settled.

The business transaction document reference package can contain a purchase order reference entity, a sales order reference entity, a delivery reference entity, a purchase contract reference entity, a sales contract reference entity, a buyer product catalogue reference entity and a vendor product catalogue reference entity. The purchase order reference entity can characterize a purchase order or an item within a purchase order. The sales order reference entity can characterize a sales order or an item within a sales order. The delivery reference entity can characterize a delivery or an item within a delivery. The purchase contract reference entity can characterize a purchase contract or an item within a purchase contract. The sales contract reference entity can characterize a sales contract or an item within a sales contract. The buyer product catalogue reference entity can characterize a product catalogue of a buyer or an item within the catalogue. The vendor product catalogue reference entity can characterize a product catalogue of a vendor or an item within the catalogue. The item attachment package can contain information that can characterize attachment information associated with a settlement of a business transaction. The item due description package can contain information that can characterize texts associated with a settlement of a business transaction. The delivery information package can characterize delivery information associated with a business transaction.

Requesting a generation of a loan contract can be implemented by using a first application executing in a landscape of computer systems providing message-based services to generate an electronic message and initiate transmission of the message to a second application to generate a loan contract or a request associated therewith. The generated message includes a loan contract package. The loan contract package contains a loan contract entity characterizing information required to generate a loan contract. The loan contract package also includes a party package containing information characterizing parties to a loan contract. The loan contract package also contains a product information package containing information characterizing a product upon which a loan contract is based. The loan contract package also contains a payment information package containing information characterizing information associated with payment processing. The loan contract package further contains an item package containing information characterizing conditions of a loan contract.

The party package can contain a lender party entity characterizing a party that grants a loan. The party package can also contain a borrower party entity characterizing a party that is issued a loan. The party package can also contain a payer party entity characterizing a party responsible for repayment of a loan. The party package can also contain a broker party entity characterizing an agent for issuance of a loan. The party package can further contain a bailsman party entity characterizing a party responsible for guaranteeing a loan.

The product information package can further contain a product category entity characterizing a product category of a loan. The product information package can further contain a product entity. In addition, the payment information package can further contain a payment form entity characterizing a form of payment. The product information package can further contain a bank account entity characterizing a bank account. Further, the loan contract package can further contain a loan contract attachment package containing information characterizing documents relevant for a loan. The loan contract package can also contain a loan contract item package. The loan contract item package can contain a loan condition information entity characterizing terms and conditions of a loan. The loan can contain a loan interest condition entity characterizing an interest condition for a loan. The loan can also contain a loan amortizement condition entity characterizing a repayment condition for a loan. The loan can further contain a loan fee condition entity characterizing a fee condition for a loan. The a loan contract item package can further contain a loan contract item party package containing information characterizing all parties to a loan contract.

Requesting a generation of a loan contract can be accomplished by receiving an electronic message and initiating generation of a loan contract in a landscape of computer systems providing message-based services. The received message includes a loan contract package. The loan contract package contains a loan contract entity characterizing information required to generate a loan contract. The loan contract package can also contain a party package containing information characterizing parties to a loan contract. The loan contract package can also contain a product information package containing information characterizing a product upon which a loan contract is based. The loan contract package can also contain a payment information package containing information characterizing information associated with payment processing. The loan contract package can further contain an item package containing information characterizing conditions of a loan contract.

Generating a confirmation of a creation of a loan contract can be accomplished by using a first application executing in a landscape of computer systems providing message-based services to generate an electronic message and initiating transmission of the message to a second application to generate a confirmation of a creation of a loan contract. The generated message includes a loan contract package. The loan contract package contains a loan contract entity characterizing information regarding a creation of a loan contract. The loan contract package also contains a log package containing information characterizing log messages associated with a creation of al loan contract. The loan contract package further contains a payment information package, and the payment information package contains a bank account entity characterizing information about a bank account to be used to repay a loan.

Generating a confirmation of a creation of a loan contract can be accomplished by receiving an electronic message in a landscape of computer systems providing message-based services and initiating a generation of a confirmation of a creation of a loan contract. The received message includes a loan contract package. The loan contract package includes a loan contract entity characterizing information regarding a creation of a loan contract. The loan contract package can also include a log package containing information characterizing log messages associated with a creation of al loan contract. The loan contract package can further include a payment information package, and the payment information package contains a bank account entity characterizing information about a bank account to be used to repay a loan.

A notice relating to product activities for a vendor can be created by generating an electronic message characterizing activities associated with goods of a buyer and initiating transmission of the message to an application to generate a notice to a vendor relating to product activities. In another or the same aspect, generating a notice from a buyer to a vendor relating to product activities can include receiving an electronic message characterizing activities associated with goods of a buyer and initiating a generation of a notice to a vendor relating to product activities.

An electronic message can characterize product activities by including a package that characterizes activities associated with goods of a buyer at a ship to location and a package containing an entity package characterizing activities associated with goods of a buyer at a ship to location. Those packages can be a product activity package and item package, respectively, and the entity can be an item entity. The location package can contain a ship to location entity characterizing a location to which goods are to be delivered and the item package can include a product information package characterizing goods to be delivered.

The product activity message can further contain a party package that contains a buyer party entity characterizing a party that purchases goods, a vendor party entity characterizing a party that delivers goods, and a product recipient party entity characterizing a party that receives a delivery of goods. The party package can further contain a business transaction document reference package containing information characterizing references to business documents associated with a product activity notice, and the location package can further contain a ship from location entity characterizing a location from which goods are to be shipped for delivery. The item package can further contain an inventory package containing an inventory entity characterizing stock of a good at a buyer and a consignment inventory entity characterizing goods in possession of a buyer that are owned by a vendor until purchased.

An electronic message requesting to generate a notice of an event affecting product demand can be generated by a first application that executes in a landscape of computer systems providing message-based services. Transmission of the message to a second application can be initiated in order to generate a notice of an event affecting product demand. Responding to the request to generate a notice of an event affecting product demand can include receiving a message including product demand influencing event package and initiating a generation of a notice of an event affecting product demand. A product demand influencing event package can contain a product demand influencing event entity, a party package and an item package. The product demand influencing event entity can characterize a product demand influencing event. The party package can contain a buyer party entity and a vendor party entity. The buyer party entity can characterize a party that purchases goods. The vendor party entity can characterize a party that delivers goods. The item package can contain an item entity, a location package and a product information package. The item entity can characterize activities associated with goods of a buyer at a ship to location. The location package can contain a ship to location entity. The ship to location entity can characterize a location to which goods are to be delivered. The product information package can contain information that can characterize goods to be delivered. In some variations, the product demand influencing event package can further contain a scheduling package. The scheduling package can contain information that can characterize time orders utilized to define a schedule for logistics associated with goods affected by a product demand influencing event. The location package can further contain a ship from location entity. The ship from location entity can characterize a location from which goods are to be shipped for delivery. The item package can further contain a product information package. The product information package can contain information that can characterize goods affected by a product demand influencing event.

An electronic message requesting to generate information associated with a purchase order can be generated by a first application that executes in a landscape of computer systems providing message-based services. Transmission of the message to a second application can be initiated in order to generate information associated with a purchase order. Responding to the request to generate information associated with a purchase order can include receiving a message including purchase order package and initiating generation of information associated with a purchase order.

The purchase order package can contain a purchase order entity, a purchase order party package, a purchase order location package, a purchase order delivery information package, a purchase order payment information package, a price order price information package, a purchase order attachment package, a purchase order description package, a purchase order follow up message package and a purchase order item package. The purchase order entity can characterize a request by a buyer to a seller to provide certain quantities of products or services. The purchase order party package can contain information characterizing parties to a purchase order. The purchase order location package can contain information characterizing locations associated with a purchase order. The purchase order delivery information package can contain information characterizing a delivery of goods associated with a purchase order. The purchase order payment information package can contain information characterizing payment terms associated with a purchase order. The price order price information package can contain pricing information associated with a purchase order. The purchase order attachment package can contain information characterizing attachments relevant to a purchase order. The purchase order description package can contain information characterizing texts associated with a purchase order. The purchase order follow up message package can contain information characterizing messages associated with a purchase order and occurring subsequent to an issuance of such purchase order. The purchase order item package can contain information characterizing an item associated with a purchase order.

In some variations, the purchase order party package can further contain a buyer party entity, a seller party entity, a product recipient party entity, a vendor party entity, a manufacturer party entity, a bill to party entity, a payer party entity and a carrier party entity. The buyer party entity can characterize a party that buys goods or services. The seller party entity can characterize a party that sells goods or services. The product recipient party entity can characterize a party to which goods are to be delivered or to whom services are to be provided. The vendor party entity can characterize a party that delivers goods or services. The manufacturer party entity can characterize a party that manufactures goods. The bill to party entity can characterize a party to which an invoice for goods or services is sent. The payer party entity can characterize a party that pays for goods or services. The carrier party entity can characterize a party that transports goods. The purchase order location package can further contain a ship to location entity and a ship from location entity. The ship to location entity can characterize a location to which goods are to be delivered or where services are to be provided. The ship from location entity can characterize a location from where goods are to be shipped. The purchase order payment information package can further contain a cash discount terms entity, a payment form entity and a payment card entity. The cash discount terms entity can characterize terms of payment in an ordering process. The payment form entity can characterize a payment form and associated payment information. The payment card entity can characterize a credit card or a customer payment card. The purchase order description package can further contain a description entity and a confirmation description entity. The description entity can characterize text associated with a purchase order. The confirmation description entity can characterize text associated with an order confirmation. The follow up message package can further contain a follow up purchase confirmation entity, a follow up dispatched delivery notification entity and a follow up service acknowledgement request entity. The follow up purchase confirmation entity can characterize information associated with a confirmation to be received by a buyer from a seller in connection with a purchase order. The follow up dispatched delivery notification entity can characterize notification preferences of a buyer relating to outbound deliveries by a seller. The follow up service acknowledgement request entity can characterize notification preferences of a buyer relating to services provided by a seller.

The purchase order item package can further contain a purchase order item entity, a hierarchy relationship entity, a product information package, a price information package, a purchase order item party package, a purchase order location package, a purchase order item delivery information package, a purchase order item business transaction document reference package, a purchase order item attachment package, a purchase order item description package and a schedule line package. The purchase order item entity can characterize a product ordered in a purchase order. The hierarchy relationship entity can characterize a hierarchical relationship between items. The product information package can contain a product entity and a product category entity. The product entity can characterize a commercial description of a product. The product category entity can characterize a commercial categorization of a product. The price information package can contain a price entity, a confirmed price entity, an item buyer party entity, an item seller party entity, an item product recipient party entity, an item vendor party entity, an item manufacturer party entity, an item bill to party entity, an item payer party entity, an item carrier party entity, a ship to location entity and a ship from location entity. The price entity can characterize a purchase order price specified by a buyer. The confirmed price entity can characterize a purchase order price specified by a seller.

The purchase order item party package can contain an item buyer party entity can characterize a party that buys goods or services. The item seller party entity can characterize a party that sells goods or services. The item product recipient party entity can characterize a party to which goods are to be delivered or to whom services are to be provided. The item vendor party entity can characterize a party that delivers goods or services. The item manufacturer party entity can characterize a party that manufactures goods. The item bill to party entity can characterize a party to which an invoice for goods or services is sent. The item payer party entity can characterize a party that pays for goods or services. The item carrier party entity can characterize a party that transports goods. The purchase order location package can contain a ship to location entity and a ship from location entity. The ship to location entity can characterize a location to which goods are to be delivered or where services are to be provided. The ship from location entity can characterize a location from where goods are to be shipped. The purchase order item delivery information package can contain information characterizing a delivery of goods associated with a purchase order. The purchase order item business transaction document reference package can contain a quote reference entity, a purchase contract reference entity, a sales contract reference entity, an origin purchase order reference entity, a buyer product catalogue reference entity and a seller product catalogue reference entity. The quote reference entity can characterize a reference to a quotation or an item within a quotation. The purchase contract reference entity can characterize a purchase contract or an item in a purchase contract. The sales contract reference entity can characterize a sales contract or an item in a sales contract. The origin purchase order reference entity can characterize an origin purchase order to an item within an origin purchase order. The buyer product catalogue reference entity can characterize a product catalogue of a buyer or an item within such catalogue. The seller product catalogue reference entity can characterize a product catalogue of a seller or an item within such catalogue. The purchase order item attachment package can contain information characterizing attachments relevant to a purchase order. The purchase order item description package can contain a description entity and a confirmation description entity. The description entity can characterize texts associated with a purchase order item. The confirmation description entity can characterize texts regarding a purchase order item confirmation. The schedule line package can contain a schedule line entity and a confirmed schedule line entity. The schedule line entity can characterize a line containing a quantity and date of a performance schedule required by a buyer for a purchase order. The confirmed schedule line entity can characterize a quantity and date of a confirmed by a seller for a purchase order.

An electronic message can be generated that characterizes a status of a purchase order and transmission of this message can be initiated so that such status information can be created. In another or the same aspect, an electronic message can be received that can be used to subsequently create status information for a purchase order.

The message can include a purchase order package that contains one or more of a purchase order information package containing one or more of a purchase order information entity characterizing a request by a buyer to a seller to provide certain quantities of products or services, a purchase order information party package containing information characterizing parties to a purchase order, a purchase order information location package containing information characterizing locations associated with a purchase order, a purchase order information payment information package containing information characterizing payment information associated with a purchase order, a price order price information package containing pricing information associated with a purchase order, a purchase order information attachment package containing information characterizing attachments relevant to a purchase order, a purchase order information description package containing information characterizing texts associated with a purchase order, a purchase order information follow up message package containing information characterizing, and a purchase order information item package containing information characterizing an item.

The purchase order information party package can further contain one or more of a buyer party entity characterizing a party that buys goods or services, a seller party entity characterizing a party that sells goods or services, a product recipient party entity characterizing a party to which goods are to be delivered or to whom services are to be provided, a vendor party entity characterizing a party that delivers goods or services, a manufacturer party entity characterizing a party that manufactures goods, a bill to party entity characterizing a party to which an invoice for goods or services is sent, a payer party entity characterizing a party that pays for goods or services, and a carrier party entity characterizing a party that transports goods. The purchase order information location package further can also contain one or both of a ship to location entity characterizing a location to which goods are to be delivered or where services are to be provided and a ship from location entity characterizing a location from where goods are to be shipped. The purchase order information payment information package can additionally contain one or more of a cash discount terms entity characterizing terms of payment in an ordering process, a payment form entity characterizing a payment form and associated payment information, and a payment card entity characterizing a credit card or a customer payment card. The purchase order information description package can further contain one or both of a description entity characterizing text associated with a purchase order and a confirmation description entity characterizing text associated with an order confirmation. The follow up message package can include one or more of a follow up purchase confirmation entity characterizing information associated with a confirmation to be received by a buyer from a seller in connection with a purchase order, a follow up dispatched delivery notification entity characterizing notification preferences of a buyer relating to outbound deliveries by a seller, a follow up service acknowledgement request entity characterizing notification preferences of a buyer relating to services provided by a seller, and a follow up invoice request entity characterizing whether a buyer expects to receive an invoice from a seller.

The purchase order information item package can include one or more of a purchase order information item entity characterizing a product ordered in a purchase order, a hierarchy relationship entity characterizing a hierarchical relationship between items, a product information package, a price information package, a purchase order information item party package, a purchase order information location package, a purchase order information item delivery information package containing information characterizing a delivery of goods associated with a purchase order, a purchase order information item business transaction document reference package, a purchase order information item attachment package containing information characterizing attachments relevant to a purchase order, a purchase order information item description package containing a description entity characterizing texts associated with a purchase order item, and a confirmation description entity characterizing texts regarding a purchase order item confirmation. The product information package can contain one or both of a product entity characterizing a commercial description of a product, and a product category characterizing a commercial categorization of a product. The price information package can contain one or more of a price entity characterizing a purchase order price specified by a buyer, a confirmed price entity characterizing a purchase order price specified by a seller, and a procurement cost upper limit entity characterizing a cost upper limit for one or more types of procurement costs. The purchase order information item party package can contain one or more of an item buyer party entity characterizing a party that buys goods or services, an item seller party entity characterizing a party that sells goods or services, an item product recipient party entity characterizing a party to which goods are to be delivered or to whom services are to be provided, an item vendor party entity characterizing a party that delivers goods or services, an item manufacturer party entity characterizing a party that manufactures goods, an item bill to party entity characterizing a party to which an invoice for goods or services is sent, an item payer party entity characterizing a party that pays for goods or services, and an item carrier party entity characterizing a party that transports goods. The purchase order information location package can contain one or both of a ship to location entity characterizing a location to which goods are to be delivered or where services are to be provided, and a ship from location entity characterizing a location from where goods are to be shipped. The purchase order information item business transaction document reference package can contain one or more of a quote reference entity characterizing a reference to a quotation or an item within a quotation, a purchase contract reference entity characterizing a purchase contract or an item in a purchase contract, a sales contract reference entity characterizing a sales contract or an item in a sales contract, an origin purchase order reference entity characterizing an origin purchase order to an item within an origin purchase order, a buyer product catalogue reference entity characterizing a product catalogue of a buyer or an item within such catalogue, and a seller product catalogue reference entity characterizing a product catalogue of a seller or an item within such catalogue.

Generating a request querying a buyer to procure products or services can be accomplished by using a first application executing in a landscape of computer systems providing message-based services to generate an electronic message and initiate transmission of the message to a second application. The generated message includes a purchase request package. The purchase request package contains a purchase request entity characterizing requisition requirements. The purchase request package further contains a purchase request item package, and the purchase request item package contains a schedule line package containing information characterizing quantity and date information associated with a requisition.

The purchase request party package can further contain a buyer party entity characterizing a party that buys goods or services. The purchase request party package can also contain a seller party entity characterizing a party that sells goods or services, The purchase request party package can also contain a proposed seller party entity characterizing a preferred party for selling goods or services. The purchase request party package can also contain a requestor party entity characterizing a party that requests procurement of goods or services. The purchase request party package can also contain a product recipient party entity characterizing a party to which goods are to be delivered or to whom services are to be provided. The purchase request party package can further contain a manufacturer party entity characterizing a party that manufactures goods.

The generated message can further contain a purchase request location package grouping information associated with locations relevant for a requisition. The purchase request location package includes a ship to location entity characterizing a location to which goods are to be delivered or where services are to be provided. The purchase request location package also includes a ship from location entity characterizing a location from where goods are to be shipped.

The purchase request item package can further contain a purchase request entity characterizing a requested product. The purchase request item package can also contain a hierarchy relationship entity characterizing relationship between items in an item hierarchy. The purchase request item package can also contain a product information package containing a product entity characterizing a product and a product category entity characterizing a product category. The purchase request item package can also contain a price information package containing a price entity characterizing a specified purchase order price, and a procurement cost upper limit entity characterizing upper procurement limits. The purchase request item package can also contain an item party package containing information characterizing parties to a requisition. The purchase request item package can also contain a location package containing information characterizing location information associated with a requisition. The purchase request item package can also contain an object reference package containing information characterizing business documents relevant for a requisition. The object reference package contains a purchase contract reference entity characterizing a purchase contract or an item in a purchase contract. The object reference package also contains a purchase order reference entity characterizing a purchase order or an item in a purchase order. The object reference package also contains a project reference entity characterizing a project or an element within a project associated with a requisition. The object reference package further contains a project element assignment entity characterizing an assignment between two elements of a project associated with a requisition. The purchase request item package can also contain an accounting object set assignment package containing information characterizing accounting information associated with a requisition. The purchase request item package can also contain an attachment package containing information characterizing attachments relevant to a requisition. The purchase request item package can further contain a description package containing information characterizing texts relating to a requisition.

The schedule line package can further contain a schedule line entity characterizing quantity and dates of a performance period associated with a requisition. The schedule line package can also contain a delivery period entity characterizing a delivery period for a requisition. The schedule line package can further contain a quantity entity characterizing a quantity specified by a requisition.

Generating a request querying a buyer to procure products or services can be accomplished by receiving an electronic message in a landscape of computer systems providing message-based services and initiating a generation of a request querying a buyer to procure products or services. The received message includes a purchase request package. The purchase request package contains a purchase request entity characterizing requisition requirements. The purchase request package also contains a purchase request item package containing a schedule line package containing information characterizing quantity and date information associated with a requisition.

Generating a confirmation of a fulfillment of a requisition can be accomplished by using a first application executing in a landscape of computer systems providing message-based services to generate an electronic message and initiate transmission of the message to a second application. The generated message includes a purchase request package containing a purchase request entity characterizing a confirmation of requirements associated with a procurement of products or services. The purchase request package also contains an item package containing an item entity characterizing a product and a purchase order package containing information characterizing a level of fulfillment of a requirement by a purchase order.

Generating a confirmation of a fulfillment of a requisition can be accomplished by receiving an electronic message in a landscape of computer systems providing message-based services and initiating a generation of a confirmation of a fulfillment of a requisition. The received message includes a purchase request package containing a purchase request entity characterizes a confirmation of requirements associated with a procurement of products or services. The purchase request further includes an item package containing an item entity characterizing a product, and a purchase order package containing information characterizing a level of fulfillment of a requirement by a purchase order.

An electronic message to generate purchasing contract information can be generated by a first application that executes in a landscape of computer systems providing message-based services. Transmission of the message to a second application can be initiated in order to generate purchasing contract information.

The message can include a purchasing contract package. The purchasing contract package can contain one or more of a purchasing contract entity characterizing an agreement to order products or provide services within a certain period of time, a purchasing contract party package containing information characterizing parties to a purchasing contract parties to a purchasing contract, a purchasing contract location package containing information characterizing locations associated with a purchasing contract, a purchasing contract delivery information package containing information characterizing a delivery requested in a purchasing contract, a purchasing contract payment information package containing information characterizing payment terms for a purchasing contract, a purchasing contract price information package containing information characterizing pricing of goods or services identified in a purchasing contract, a purchasing contract attachment package containing information characterizing documents referring to a purchasing contract, a purchasing contract description package containing information characterizing texts associated with a purchasing contract, and a purchasing contract item package containing information characterizing a product or service in a purchasing contract.

The purchasing contract party package can include one or more of a buyer party entity characterizing a party that buys goods or services, a seller party entity characterizing a party that sells goods or services, a product recipient party entity characterizing a party to which goods are to be delivered or to whom services are to be provided, and a contract release authorized party entity characterizing a party that is authorized to effect releases from a purchasing contract. The purchasing contract attachment package can also contain one or more of an attachment web address entity characterizing a location of documents referring to a purchasing contract, an internal attachment web address entity characterizing a location of internal documents referring to a purchasing contract, and a legal document attachment entity characterizing legal text of a purchasing contract. The purchasing contract description package can include one or more of a description entity characterizing text associated with a purchasing contract, and an internal description entity characterizing internal text associated with a purchasing contract.

The purchasing contract item package can contain one or more of a purchasing contract item entity characterizing a product or service in a purchasing contract, a purchasing contract item product information package, a purchasing contract item price information package containing information characterizing pricing of goods or services identified in a purchasing contract, a purchasing contract item location package containing information characterizing locations associated with a purchasing contract, a purchasing contract item party package containing information characterizing parties to a purchasing contract parties to a purchasing contract, a purchasing contract item delivery information package containing information characterizing a delivery requested in a purchasing contract, a purchasing contract business document object reference package, a purchasing contract item attachment package containing information characterizing documents referring to a purchasing contract, and a purchasing contract item description package containing information characterizing texts associated with a purchasing contract. The purchasing contract item product information package can contain one or both of a product entity characterizing a product or service, and a product category entity characterizing a category for a product or service. The purchasing contract business document object reference package can contain one or more of a quote reference entity characterizing a bid of a purchaser or a bid to an item within a bid of a purchaser, an operational purchasing contract reference entity characterizing an operational purchasing contract or an item in an operational purchasing contract, and a buyer product catalogue reference entity characterizing a product catalogue of a purchaser or to an item within such a catalogue.

An electronic message to generate a notification of a purchasing contract release can be generated by a first application that executes in a landscape of computer systems providing message-based services. Transmission of the message to a second application can be initiated in order to generate a notification of a purchasing contract release.

The message can contain a purchasing contract release package can contain one or more of a purchasing contract release entity characterizing a notification regarding a performed release with reference to a purchasing contract, a purchasing contract release party package containing information characterizing a release of a purchasing contract, a purchasing contract release location package containing information characterizing locations associated with a release of a purchasing contract, and a purchasing contract release item package. The purchasing contract release item can include one or more of a purchasing contract release item entity characterizing an item in a purchasing contract release, a purchasing contract release item location package containing information characterizing locations associated with a contract release item, and a purchasing contract release item business document object package containing information characterizing references to business documents relevant to an item in a purchasing contract release.

An electronic message to generate replenishment order information can be generated by a first application that executes in a landscape of computer systems providing message-based services. Transmission of the message to a second application can be initiated in order to generate replenishment order information.

The electronic message can include a replenishment order package containing a replenishment order entity characterizing a replenishment order executed by a vendor for a customer, and a replenishment order item package. The replenishment order item package can contain a replenishment order item entity characterizing an item in a replenishment order, a replenishment order item location package that contains a ship from location entity characterizing a location from which products listed in a replenishment order are to be delivered and a ship to location entity characterizing a location from which products listed in a replenishment order are to be delivered. The replenishment order item package can also include a replenishment order item product information package containing information characterizing a product associated with a replenishment order.

The replenishment order package can contain one or more of a replenishment order party package, a replenishment order delivery information package containing information characterizing a requested delivery for a replenishment order, a replenishment order payment information package containing information characterizing payment information for a replenishment order, and a replenishment order handling unit package containing information characterizing packing requirements for product associated with a replenishment order. The replenishment order party package can include one or more of a buyer party entity characterizing a party that purchases goods associated with a replenishment order, a seller party entity characterizing a party that sells goods associated with a replenishment order, and a vendor party entity characterizing a party to provide a replenishment delivery. In addition, the replenishment order location package can further contain a trans-shipment location entity characterizing a location at product in a replenishment order is transferred from a first transportation mechanism to a second transportation mechanism.

The replenishment order item package can contain one or more of a business transaction documents reference package, a replenishment order item party package, a replenishment order item product information package containing information characterizing a product listed in a replenishment order, a replenishment order item batch package containing information characterizing a batch to be delivered, a replenishment order item promotion package containing information characterizing marketing promotions associated with a replenishment order, a replenishment order item price information package containing pricing information of an item in a replenishment order, and a replenishment order item schedule line package. The business transaction documents reference package can contain on or more of a purchase contract reference entity characterizing a purchase contract or an item in a purchase contract, a scheduling agreement reference entity characterizing a scheduling agreement or an item in a scheduling agreement, a purchase order reference entity characterizing a purchase order of a buyer or a purchase order item created by a vendor, an origin purchase order reference entity characterizing an original purchase order or to an item within an original purchase order, a sales order reference entity characterizing a sales order or an item in a sales order, and an origin sales order reference entity characterizing an original sales order or an item within an original sales order. The replenishment order item party package can contain one or more of a replenishment order item buyer party entity characterizing a party that purchases goods associated with a replenishment order, a replenishment order item product recipient party entity characterizing a party to receive goods associated with a replenishment order, and a replenishment order item bill to party entity characterizing a party to receive an invoice associated with a replenishment order. The replenishment order item schedule line package can contain one or both of a schedule line entity characterizing quantity and scheduling associated with a replenishment order, and a confirmed schedule line entity characterizing a confirmation of quantity and scheduling associated with a replenishment order.

An electronic message to generate replenishment order proposal information can be generated by a first application that executes in a landscape of computer systems providing message-based services. Transmission of the message to a second application can be initiated in order to generate replenishment order proposal information.

The message can include a replenishment order proposal package can contain a replenishment order proposal entity characterizing a proposal for an order to replenish product supply and a replenishment order proposal item package. The replenishment order proposal item package can contain a replenishment order proposal item entity characterizing an item in a replenishment order proposal, a replenishment order proposal item location package, and a replenishment order proposal item product information package containing information characterizing a product associated with a replenishment order proposal. The replenishment order proposal location package can contain a ship from location entity characterizing a location from which products listed in a replenishment order proposal are to be delivered and a ship to location entity characterizing a location from which products listed in a replenishment order proposal are to be delivered.

The replenishment order proposal package can contain one or both of a replenishment order proposal party package and a replenishment order proposal business document object reference package containing information characterizing business documents relating to a replenishment order. The replenishment order proposal party package can contain one or more of a buyer party entity characterizing a party that buys goods associated with a replenishment order, a vendor party entity characterizing a party that delivers goods associated with a replenishment order, and a product recipient party entity characterizing a party to which goods associated with a replenishment order are delivered. The product information package can contain one or both of a product category entity characterizing a category of a product associated with a replenishment order proposal, and a vendor product category entity characterizing a vendor category of a product associated with a replenishment order proposal.

The replenishment order proposal item package can contain one or more of a replenishment order proposal item price information package containing information characterizing pricing of a product associated with a proposed replenishment order, a replenishment order proposal item party package containing information characterizing parties associated with a proposed replenishment order a replenishment order proposal item location package, a replenishment order proposal item business document object reference package containing information characterizing business documents relating to a replenishment order, and a schedule line package. The replenishment order proposal item location package can contain one or both of a ship from location entity characterizing a location from which products listed in a replenishment order proposal are to be delivered, and a ship to location entity characterizing a location from which products listed in a replenishment order proposal are to be delivered. The schedule line package can contain one or both of a schedule line entity characterizing quantity and scheduling associated with a replenishment order proposal, and a confirmed schedule line entity characterizing a confirmation of quantity and scheduling associated with a replenishment order proposal.

Generating a notification associated with a return delivery is accomplished by using a first application executing in a landscape of computer systems providing message-based services to generate an electronic message and initiating transmission of the message to a second application to generate a notification associated with a return delivery. The generated message includes a return delivery instruction package. The included return delivery instruction package further contains a return delivery instruction entity characterizing logistical instructions to a vendor for a future return delivery and a return delivery instruction item package containing a product information package containing information characterizing.

The return delivery instruction package can further include a party package and a location package. A party package can contain a buyer party entity characterizing a party that has purchased goods being returned or has reordered a repurchase of goods. A party package can also contain a vendor entity characterizing a party that sends backs goods to be returned. A party package can further contain a product recipient entity characterizing a company to which goods are returned. In addition, a location package can contains a ship to entity characterizing a location from which goods for return are sent back and a ship to location characterizing a location to which goods for return are sent back.

The return delivery instruction package can further include a return delivery item package and a delivery handling unit package. A return delivery item package can contain a return delivery instruction item entity characterizing a quantity of product to be returned and an associated delivery period. A return delivery item package can also contain a delivery item business transaction document reference package characterizing business document references relevant to a product to be returned A return delivery item package can also contain a party package containing information characterizing business partners relevant to a product to be returned. A return delivery item package can further contain a batch package containing information characterizing a batch of product to be returned. In addition, a delivery handling unit package containing information characterizing handling requirements for a product to be returned.

Generating a notification associated with a return delivery can be accomplished by receiving an electronic message in a landscape of computer systems providing message-based services and initiating a generation of a notification associated with a return delivery. The message includes a return delivery instruction package. The return delivery instruction package further includes a return delivery instruction entity characterizing logistical instructions to a vendor for a future return delivery, and a return delivery instruction item package containing a product information package containing information characterizing.

Exchanging information associated with a request for quotation is accomplished by using a first application executing in a landscape of computer systems providing message-based services to generate an electronic message and initiate transmission of the message to a second application.

Exchanging information associated with a request for quotation is accomplished by receiving an electronic message in a landscape of computer systems providing message-based services and initiating an exchange of information associated with a request for quotation.

The generated and received message includes a package that contains various other packages that contain information associated with a request for quotation. The package contains a party package, a location package, a delivery information package, a payment information package, a product information package, a business transaction document reference package, a follow up business transaction document reference package, an attachment package, a description package, and an item package.

Each of the information containing packages contain different information associated with a request for quotation. A party package contains information characterizing parties associated with a request for quotation. A location package contains information characterizing locations associated with a request for quotation. A delivery information package contains information characterizing a required delivery associated with a request for quotation. A payment information package contains information characterizing payment information associated with a request for quotation. A product information package contains information characterizing a product category associated with a request for quotation. A business transaction document reference package contains information characterizing business document references associated with a request for quotation. A follow up business transaction document reference package contains information characterizing business transaction documents expected by a buying party associated with a request for quotation. An attachment package contains information characterizing documents referring to a request for quotation. A description package contains information characterizing text visible to parties to a request for quotation.

An item package also contains various information containing packages including a product information package, a party package, a delivery information package, a business transaction document reference package, an attachment package, a description package, and a schedule line package. A product information package contains information characterizing a product tendered by a request for quotation. A party package contains information characterizing parties associated with a request for quotation. A delivery information package contains information characterizing delivery of a product. A business transaction document reference package contains information characterizing a required delivery associated with a request for quotation. An attachment package contains information characterizing documents referring to a request for quotation. A description package contains information characterizing text visible to parties to a request for quotation. A schedule line package contains information characterizing quantity and date information associated with a request for quotation.

The information contained in the various packages is selected from a group including a request from a buyer to a bidder to start a request for quotation process, a request from a buyer to a bidder to modify a request for quotation during a request for quotation process, a cancellation of a request for quotation, a notification from a bidder to a buyer containing a response by the bidder to an invitation to respond to a request for quotation, a notification of an acceptance of a bid in response to a request for quotation, a notification of a declination of a bid in response to a request for quotation, a confirmation from a bidder to a buyer indicating that the bidder intends to submit a bid in response to a request for quotation, a confirmation from a bidder to a buyer indicating an acceptance or rejection of a quotation accepted by the buyer, a request to generate a legal text document in response to an invitation to bid for quotation, and a notification of a generation of a legal text document in response to an invitation to bid on a request for quotation.

Exchanging information associated with services that have been entered can be accomplished by using a first application executing in a landscape of computer systems providing message-based services to generate an electronic message and initiate transmission of the message to a second application. The generated message includes a service acknowledgement package. The service acknowledgement package contains a service acknowledgement entity characterizing information about a confirmation by a purchase of an entered service and a party package. The party package further contains a buyer party entity characterizing a party that purchases goods or services.

The party package can further contain a seller party entity characterizing a party selling goods or services. The party package can also contain a product recipient party entity characterizing a party to which goods are delivered or for whom services are provided. The party package can also contain vendor party entity characterizing a party that delivers goods or provides services. The party package can further contain a manufacturer party entity characterizing a party that manufactures goods.

The service acknowledgement package can further contain a location package containing information characterizing a location at which products have been delivered or a service provided. The service acknowledgement package can also contain an attachment package containing information characterizing a document referring to a service acknowledgement. The service acknowledgement package can also contain a description package containing information characterizing text regarding a service acknowledgement. Also, the service acknowledgement package can further contain an item package. The item package can contain an item entity characterizing an entered service or service product. The item package can also contain a hierarchy relationship entity characterizing a relationship between items in a hierarchy and a product information package. The product information package can contain a product entity characterizing a product, and a product category entity characterizing a category for a product. The service acknowledgement package can also contain a price information package containing information characterizing price information for a service acknowledgement item. The service acknowledgement package can also contain a party package containing information characterizing parties associated with a service acknowledgement. The service acknowledgement package can also contain a location package containing information characterizing a location at which a products have been delivered or services provided.

The service acknowledgement package can also contain a business document object reference package. The business document object reference package can contain a purchase order reference entity characterizing a purchase order or an item within a purchase order. The business document object reference package can also contain a service acknowledgement reference entity characterizing a previously sent service acknowledgement. The business document object reference package can also contain a purchase contract reference entity characterizing a reference to a purchase contract or an item within a purchase contract. The business document object reference package can also contain a sales contract reference entity characterizing a reference to a sales contract or an item within a sales contract. The business document object reference package can also contain a buyer product catalogue reference entity characterizing a reference to a product catalogue of a buyer or an item within a product catalogue of a buyer. The business document object reference package can further contain a seller product catalogue reference entity characterizing a reference to a product catalogue of a seller or an item within a product catalogue of a seller. The service acknowledgement package can also contain an attachment package containing information characterizing a document referring to a service acknowledgement, The service acknowledgement package can further contain a description package containing information characterizing text regarding a service acknowledgement.

The business document object reference package can further contain a project reference entity characterizing a reference to a project or an element within a project. The business document object reference package can further contain a project element assignment entity characterizing an assignment of two elements within a project that is referenced by an item of a service acknowledgment. In addition, the item package can further contain an accounting package containing information characterizing account assignment information.

Exchanging information associated with services that have been entered can be accomplished by receiving an electronic message in a landscape of computer systems providing message-based services and initiating an exchange of information associated with services that have been entered. The received message includes a service acknowledgement package. The service acknowledgement package includes a service acknowledgement entity characterizing information about a confirmation by a purchase of an entered service. The service acknowledgement package further includes a party package, which contains a buyer party entity characterizing a party that purchases goods or services.

An electronic message to request generation of a supply chain exception notification can be generated by a first application that executes in a landscape of computer systems providing message-based services. Transmission of the message to a second application can be initiated in order to generate a supply chain exception notification. Responding to a request to generate the supply chain exception notification can include receiving a message including a supply chain exception package and initiating generation of the supply chain exception notification. The supply chain exception package can contain a supply chain exception report entity, a business transaction document reference package, a location package and a product information package. The supply chain exception report entity can characterize an exception that occurred in a supply chain. The business transaction document reference package can contain a purchaser order entity that can characterize a reference to a purchase order or an item within a purchase order for which an exception in a supply chain has occurred. The location package can contain a ship from location that can characterize a location from which ordered products are delivered. A product information package can characterize a product associated with a supply chain exception.

In some variations, the message requesting generation of a supply chain exception notification can further include a party package containing a buyer party entity, a vendor party entity and a product recipient entity. The buyer party entity can characterize a buyer of goods or services. The vendor party entity can characterize a vendor of goods or services. The product recipient entity can characterize a recipient of goods or services. The business transaction document reference package can further contain a scheduling agreement reference entity, a sales order reference entity, an inbound delivery reference entity and a batch package. The scheduling agreement reference entity can characterize a reference to an item in a scheduling agreement. The sales order reference entity can characterize a reference to a sales order or to an item in a sales order. The inbound delivery reference entity can characterize an inbound delivery or an item of an inbound delivery. The supply chain exception package can further contain a batch package. The batch package can contain a batch entity, a property valuation package and a log package. The batch entity can characterize a batch of products. The property valuation package can characterize properties of a characteristic of a supply chain exception. The log package can contain a validation log entity that can characterize a logistics planning or logistics execution check log. The log package can also contain an item entity. The location package can further contain a ship to location entity that can characterize a location where ordered products are delivered.

An electronic message to generate a tax declaration can be generated by a first application that executes in a landscape of computer systems providing message-based services. Transmission of the message to a second application can be initiated in order to provide tax declaration information to generate a tax declaration based on a purchase. Responding to a request to generate a tax declaration can include receiving a message including a tax declaration package and initiating a generation of a tax declaration. A tax declaration package can contain a log package and a party package, where the log package can contain a validation log entity characterizing log messages from a tax authority associated with a receipt and validation of a tax return based on a purchase, and the party package can contain a tax payer party entity that characterizes a party liable for tax on a purchase. The party package can also contain a tax authority party entity that characterizes a tax authority that receives a tax declaration. In some variations, a log package can also contain an item entity. The item entity can characterize a log of a receipt and validation of a tax refund based on a purchase. The party package can also contain a tax operator entity that characterizes a party that creates and sends a tax return for tax on purchases. A declaration package can also contain an item package that characterizes reported taxes on purchases.

An electronic message to create information associated with a vendor initiated purchase order can be generated by a first application that executes in a landscape of computer systems providing message-based services. Transmission of the message to a second application can be initiated in order to generate information associated with a vendor initiated purchase order.

The message can include a vendor generated order package containing a vendor generated order entity characterizing a purchaser order that is initiated by a vendor for a customer, a party package, a location package, and a vendor generated order item package. The party package can contain a buyer party entity characterizing a party to receive a goods replenishment delivery, and a vendor party entity characterizing a party to provide a goods replenishment delivery. The location package can contain a ship from location entity characterizing a location from which goods associated with a purchase order is to be delivered, and a ship to location entity characterizing a location at which goods associated with a purchase order is to be delivered. The vendor generated order item package can contain a vendor generated order item entity characterizing quantities of goods and associated delivery and location conditions for goods in a purchase order, and a product information package containing information characterizing goods associated with a purchase order. The location package can further contain a trans-shipment location entity characterizing a location at which delivery of products using a first transport mechanism changes to second transport mechanism. The vendor generated order package can also contain a handling unit containing information characterizing packing requirements for goods associated with a replenishment order.

The vendor generated order item package can further contain one or more of a business transaction document reference package, a promotion package containing information characterizing marketing promotions relevant to goods associated with a purchase order, and a schedule line package. The business transaction document reference package can contain one or both of a purchasing contract reference entity characterizing a purchase contract or an item in a purchase contract and a sales order reference entity characterizing a sales order or an item in a sales order. The schedule line package can contain one or more of a schedule line entity characterizing quantity and scheduling dates for replenishment deliveries of goods associated with a purchase order, and a confirmed schedule line entity characterizing confirmed quantity and scheduling dates for replenishment deliveries of goods associated with a purchase order.

Adapters and other proxies can be utilized such that messages or other data structures that are not in a format compatible with the generated and received messages can be utilized in connection with the subject matter described herein. For example, generating the message can include converting or mapping a non-compatible message format or other data structure into a compatible message type prior to its transmission. Similarly, a received message can be subsequently converted or mapped into a non-compatible message format or other data structure to effect the actions specified by the received message.

Other systems, methods, features and advantages of the subject matter described herein will be or will become apparent to one with skill in the art upon examination of the following figures and detailed description. It is intended that such additional systems, methods, features and advantages be included within this description, be within the scope of the subject matter described herein, and be protected by the accompanying claims.

V. BRIEF DESCRIPTION OF THE DRAWINGS

The accompanying drawings, which are incorporated in and constitute a part of this specification, illustrate an implementation of the subject matter described herein and, together with the description, serve to explain the advantages and principles of the subject matter described herein. In the drawings, FIGS. 1A-1G depict problems that may arise without the use of consistent interfaces;

FIGS. 25-251 depict data type structures in accordance with methods and systems consistent with the subject matter described herein;

Figure 266A:
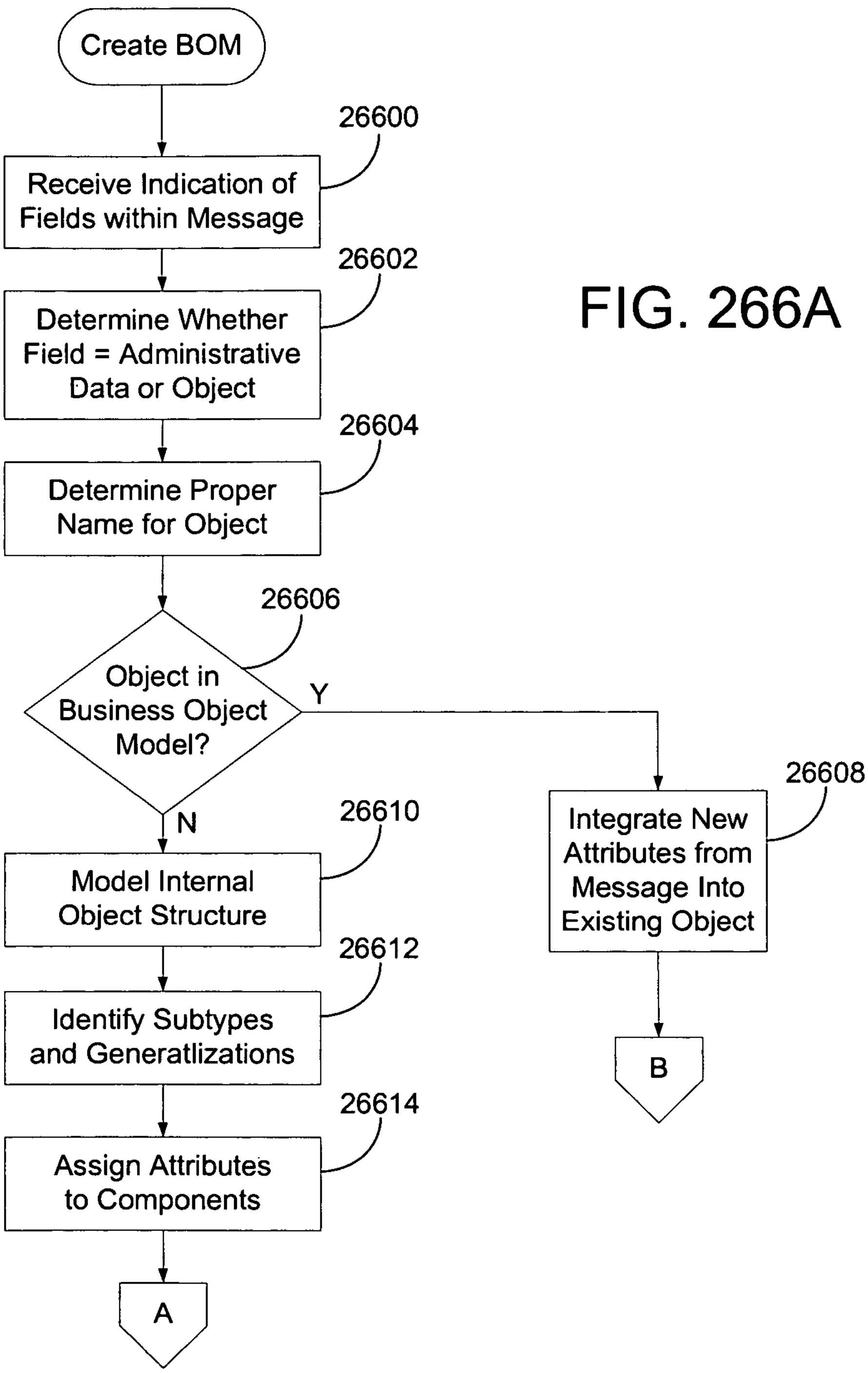
Figure 266B:
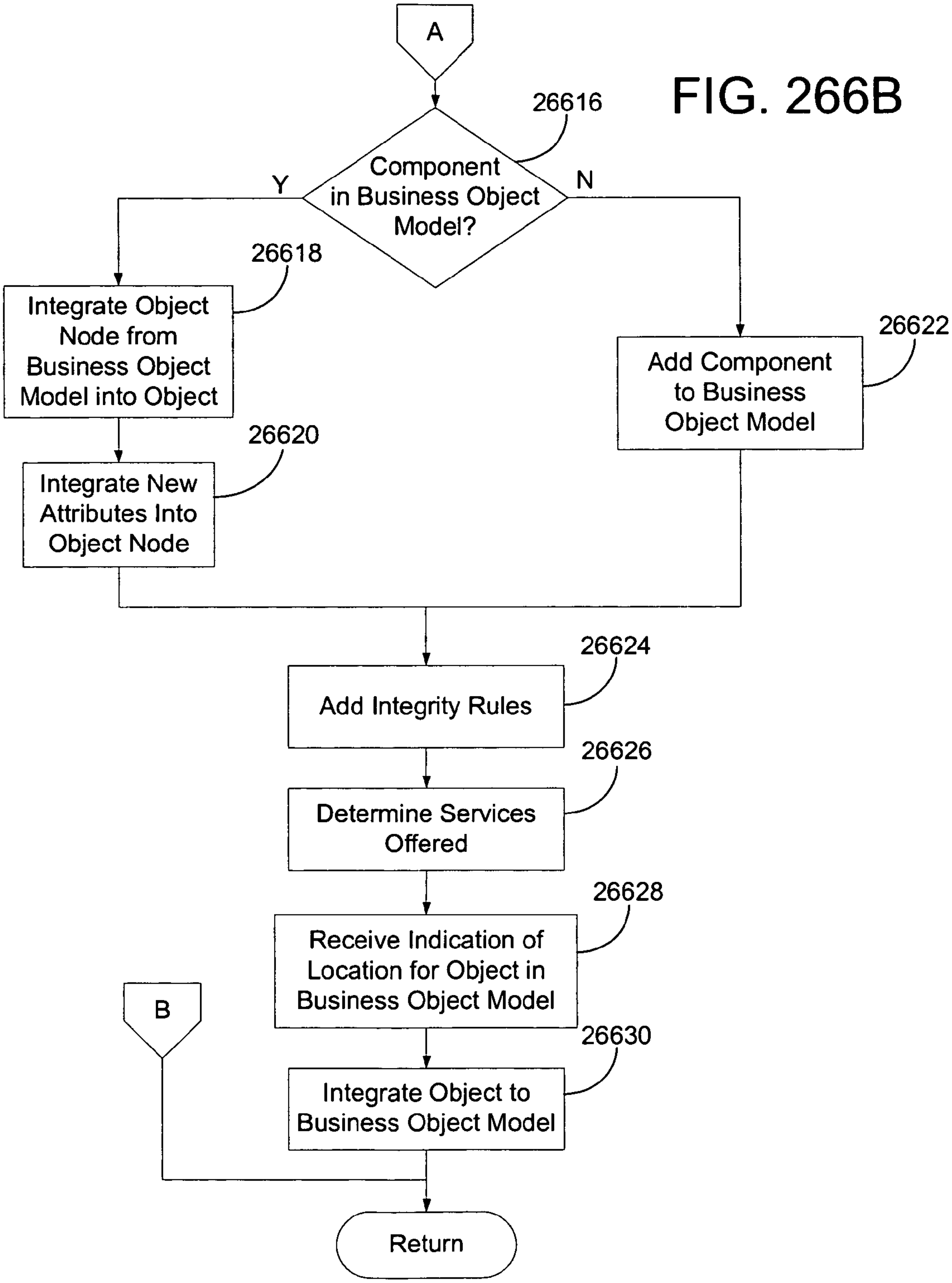
Figure 267A:
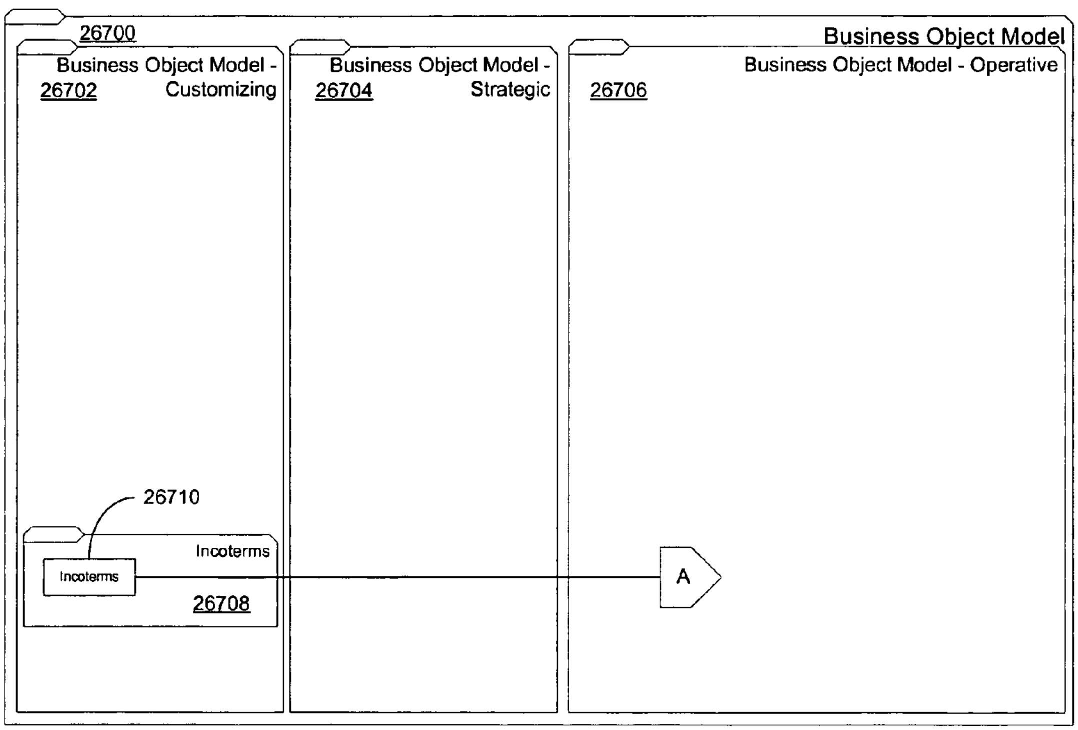
Figure 267B:
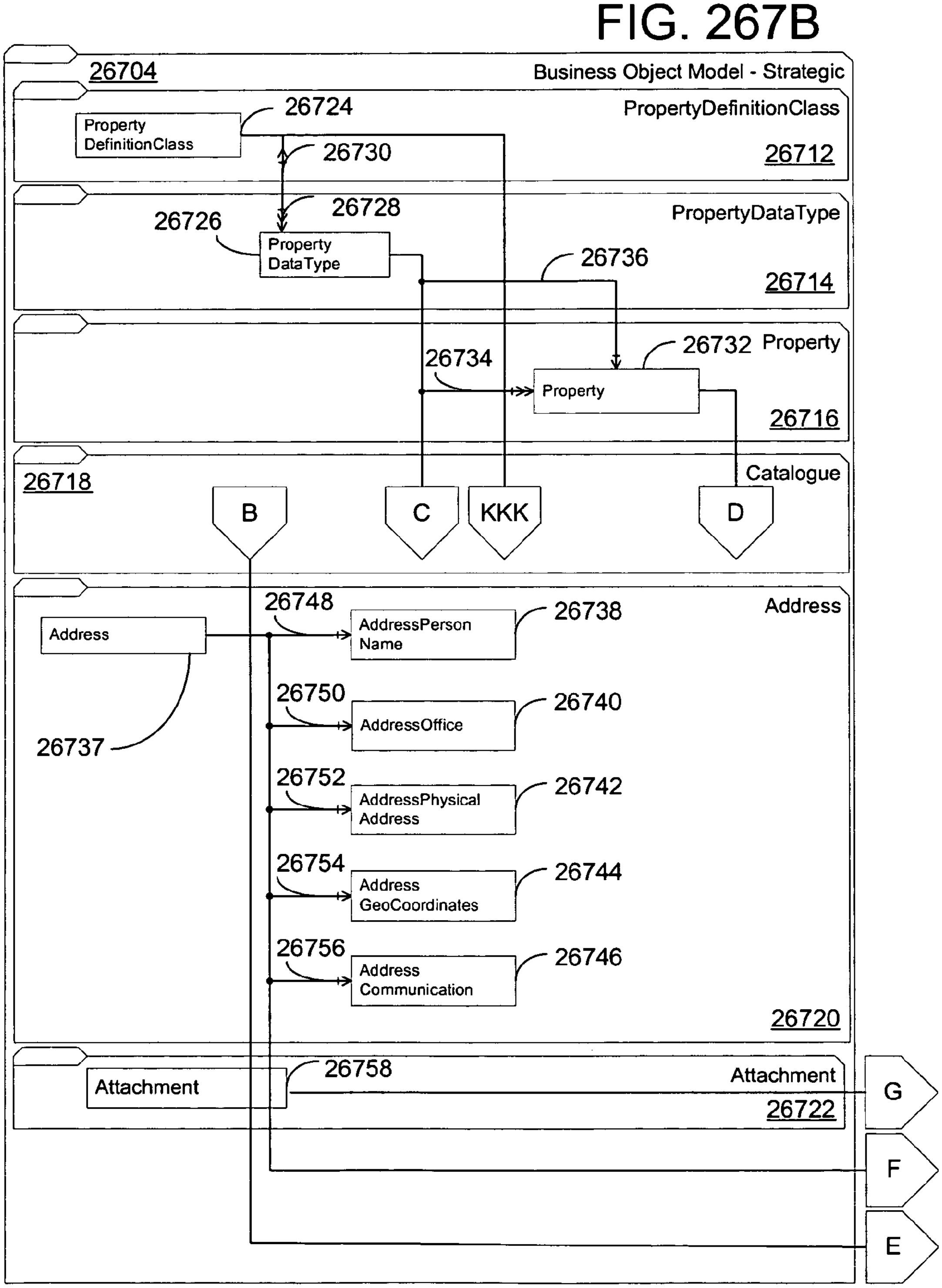
Figure 267C:
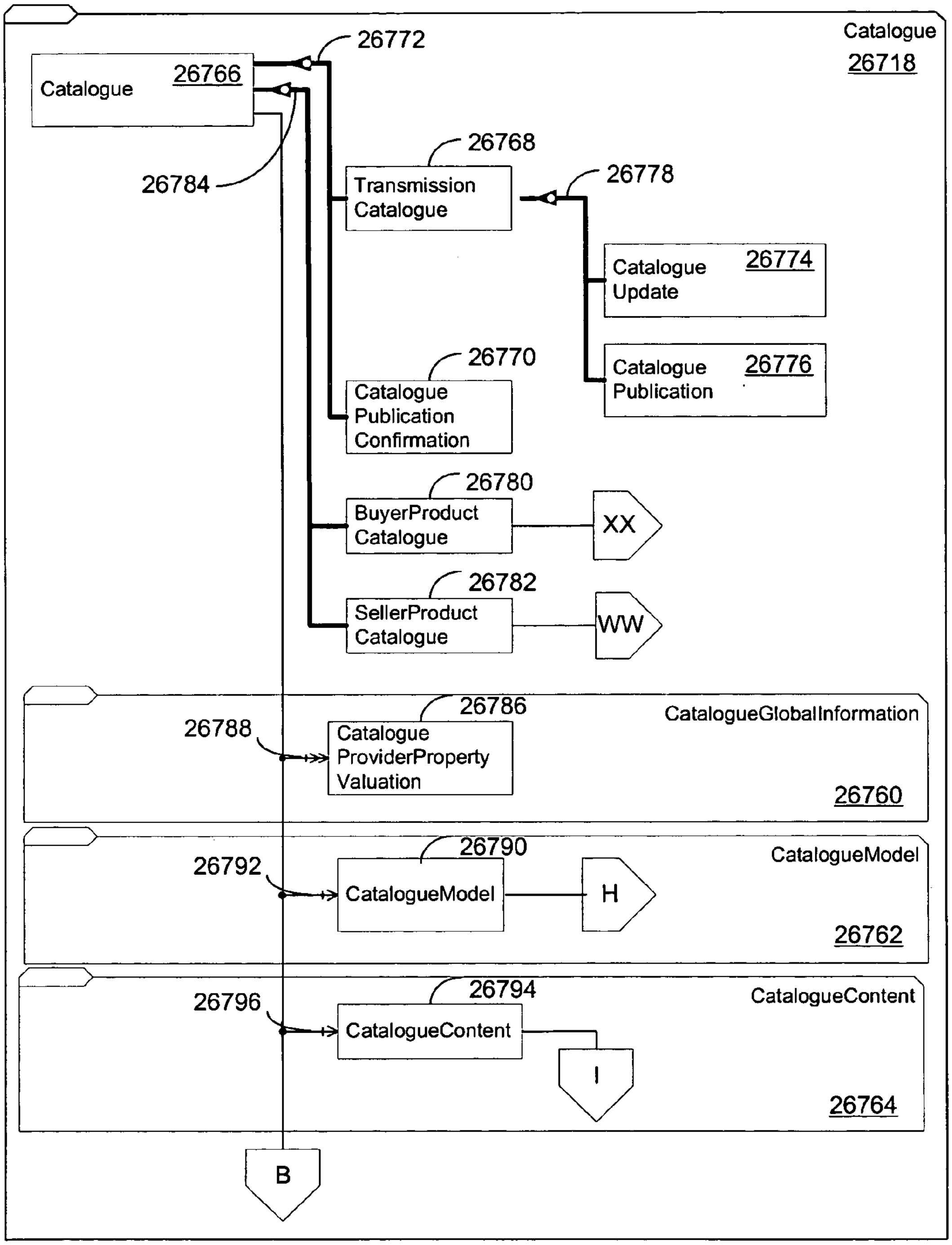
Figure 267D:
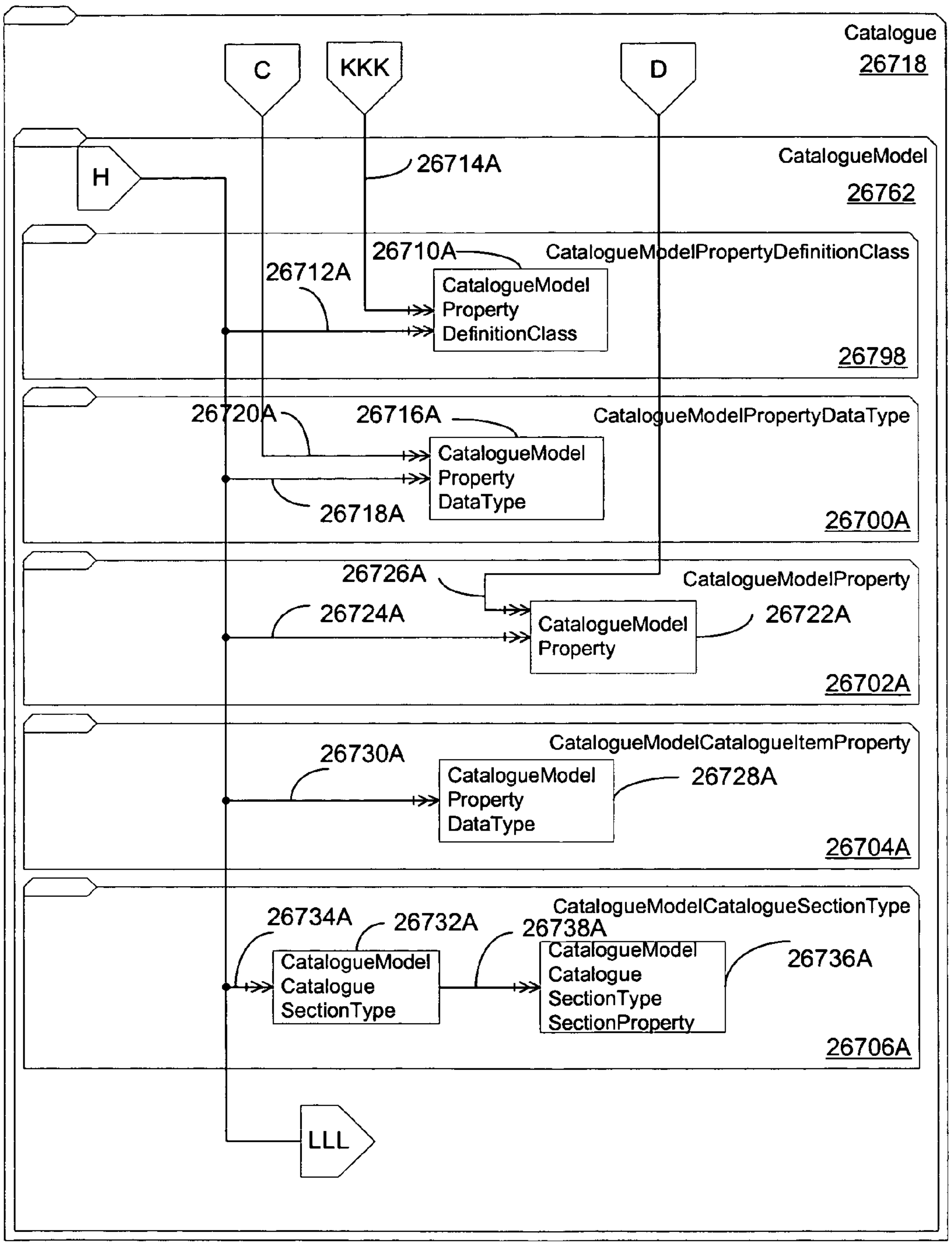
Figure 267E:
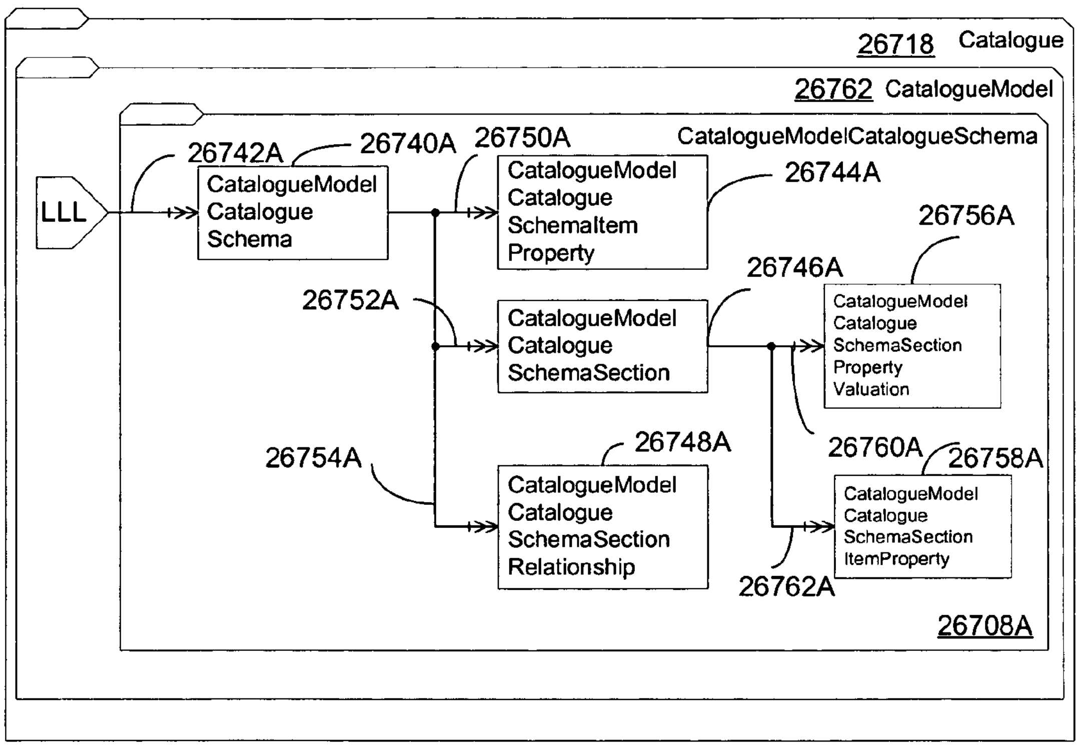
Figure 268:
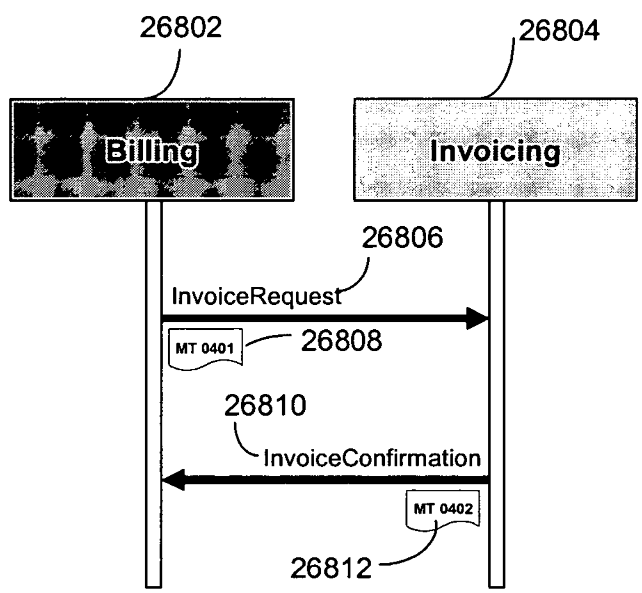
Figure 270A:
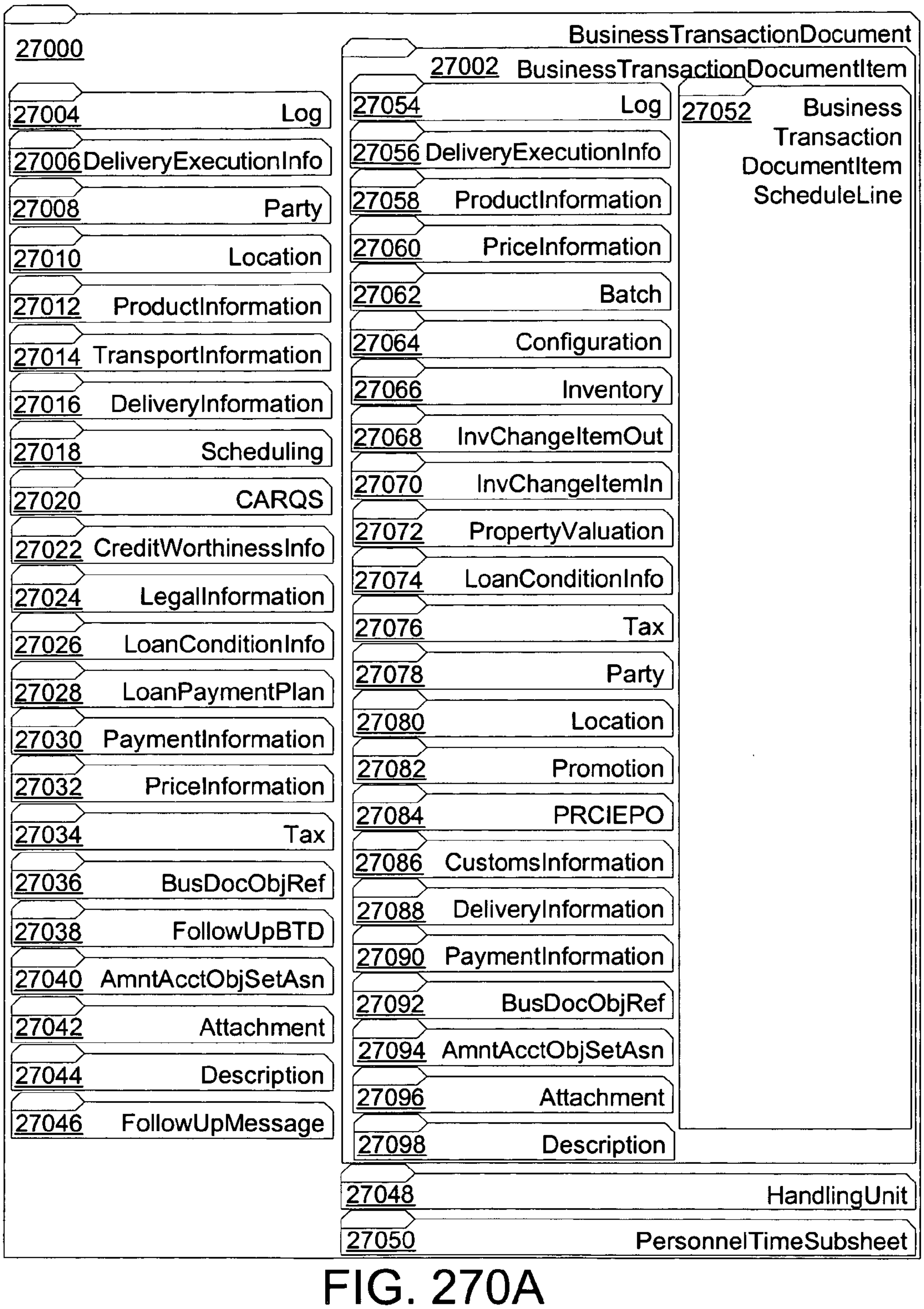
Figure 270B:
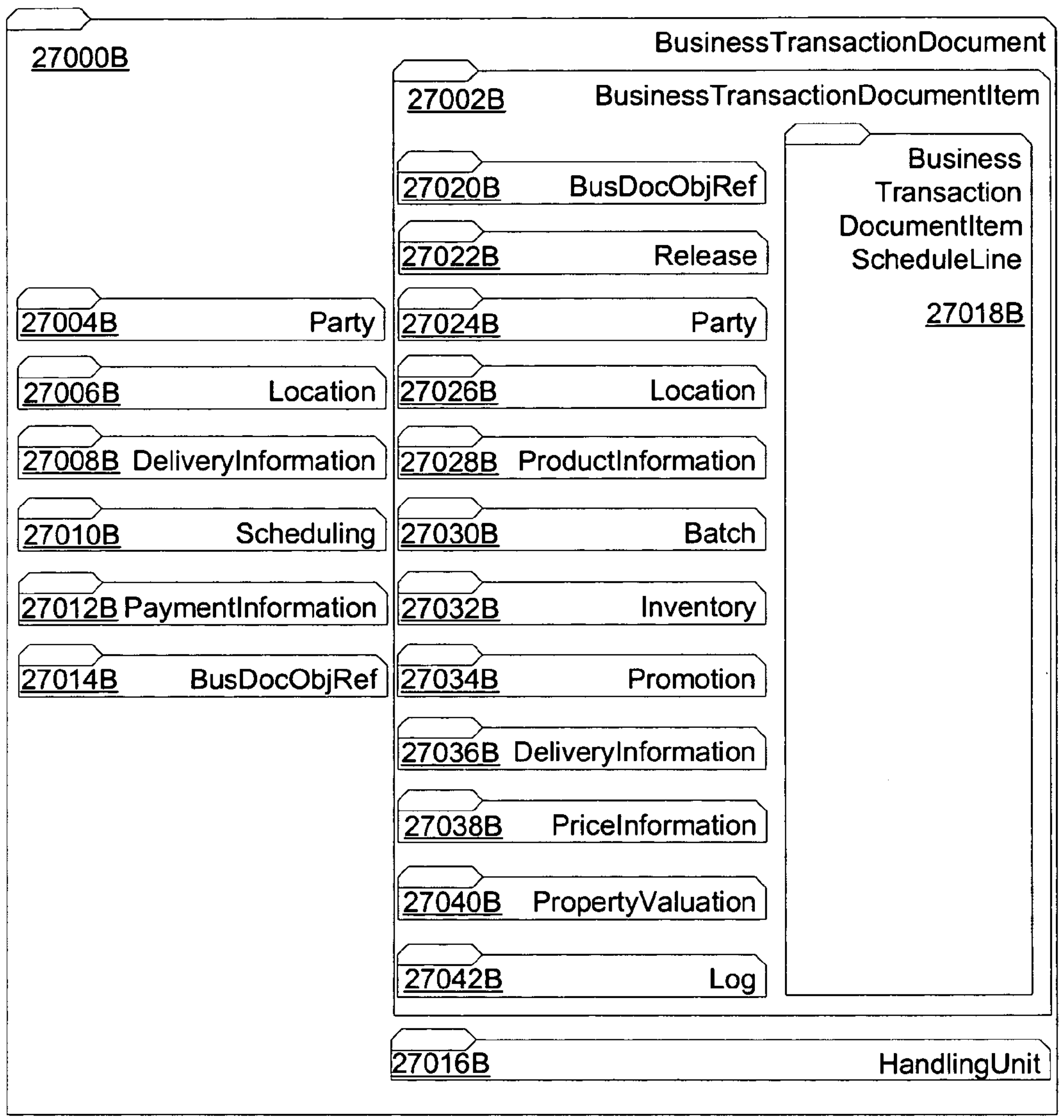
Figure 270C:
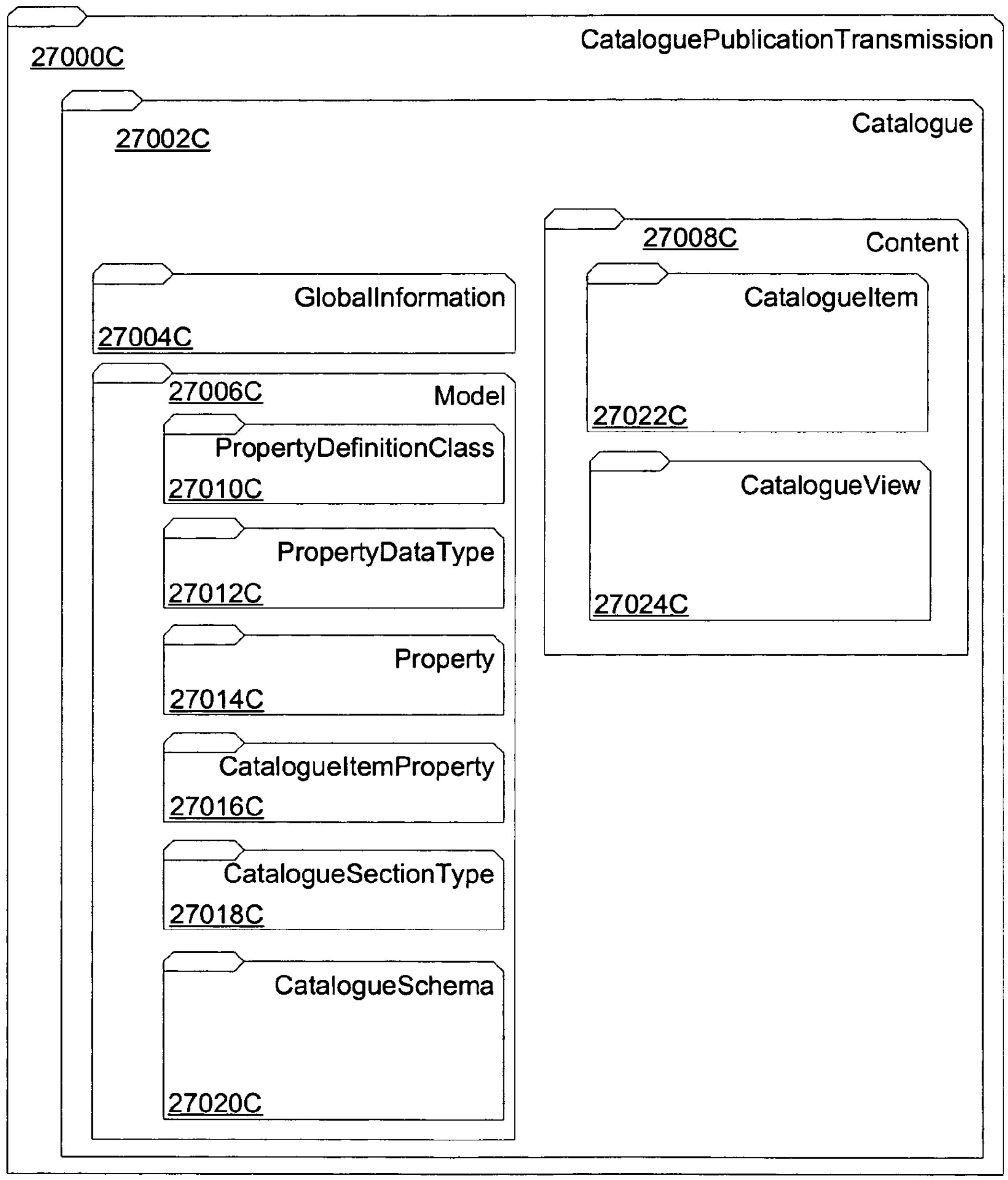
Figure 271:
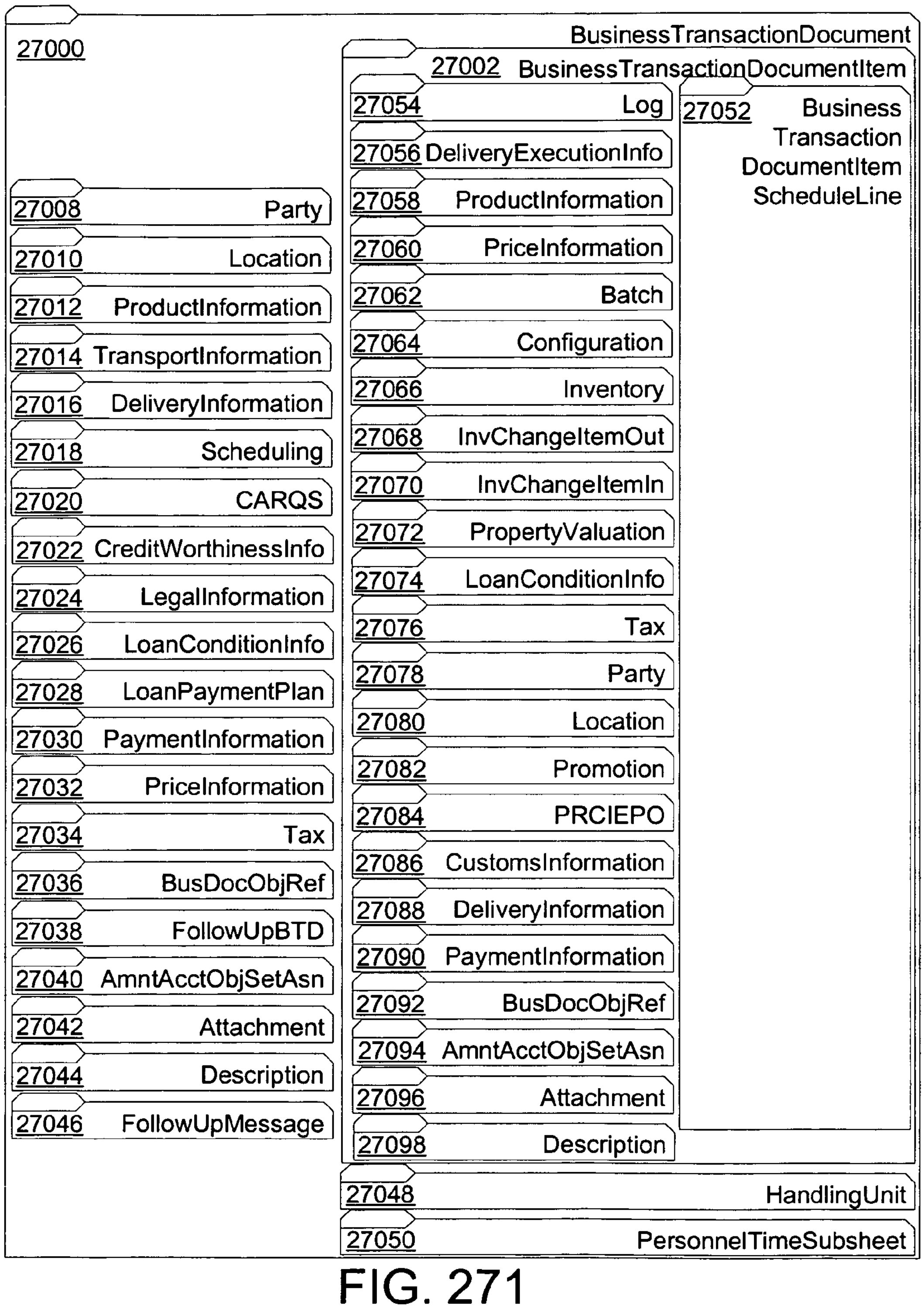
Figure 272:
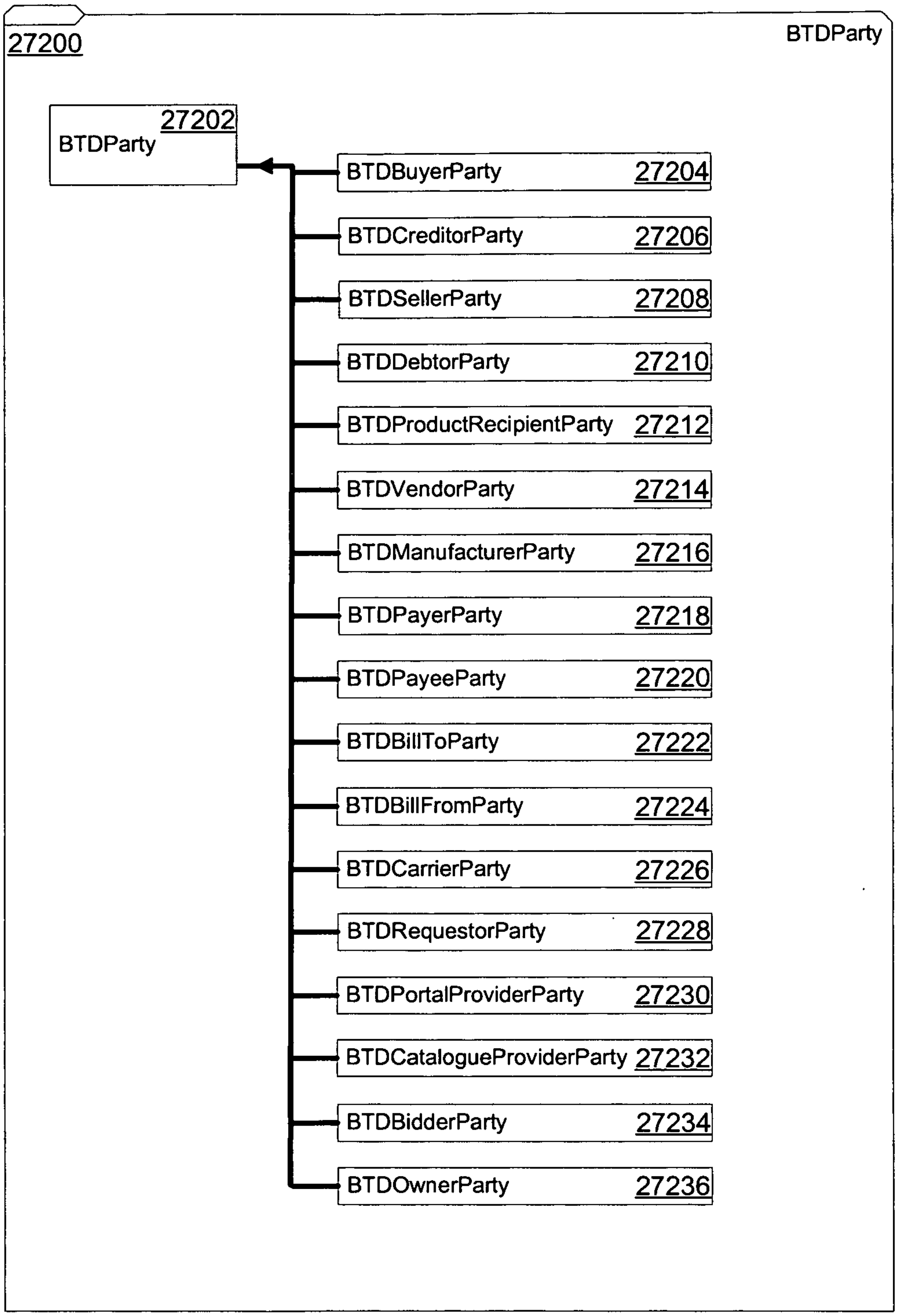
Figure 273:
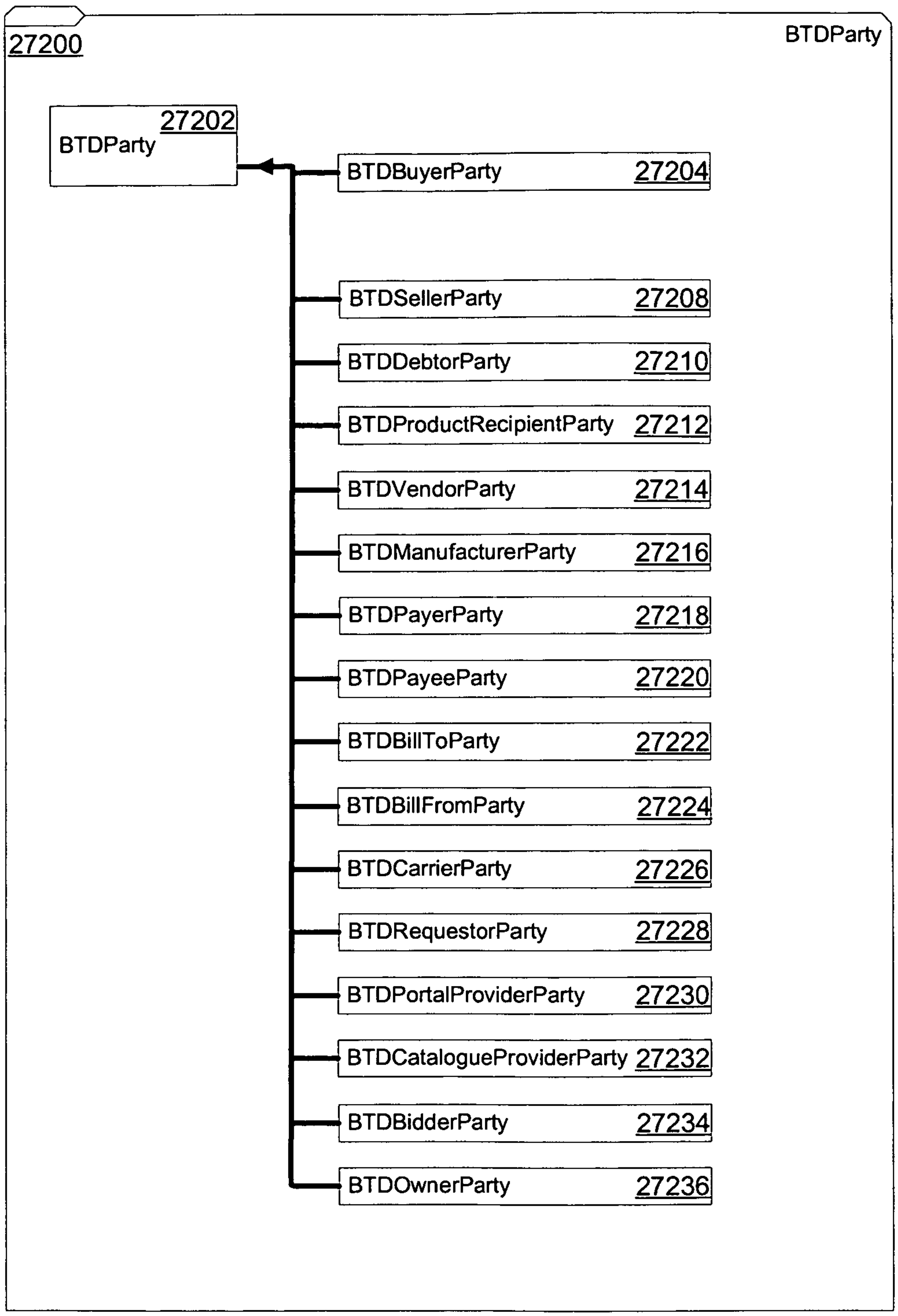
Figure 274:
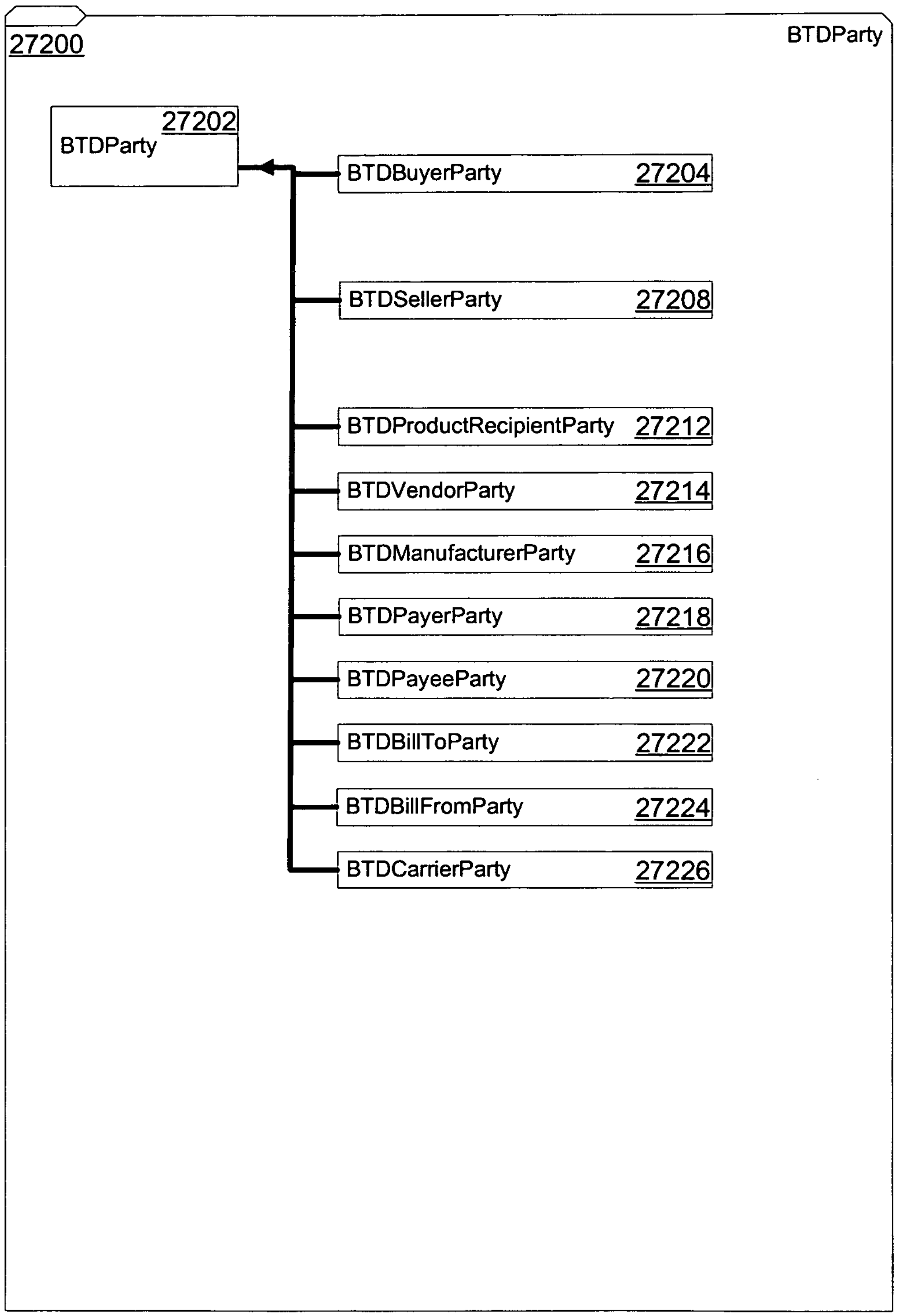
Figure 275:
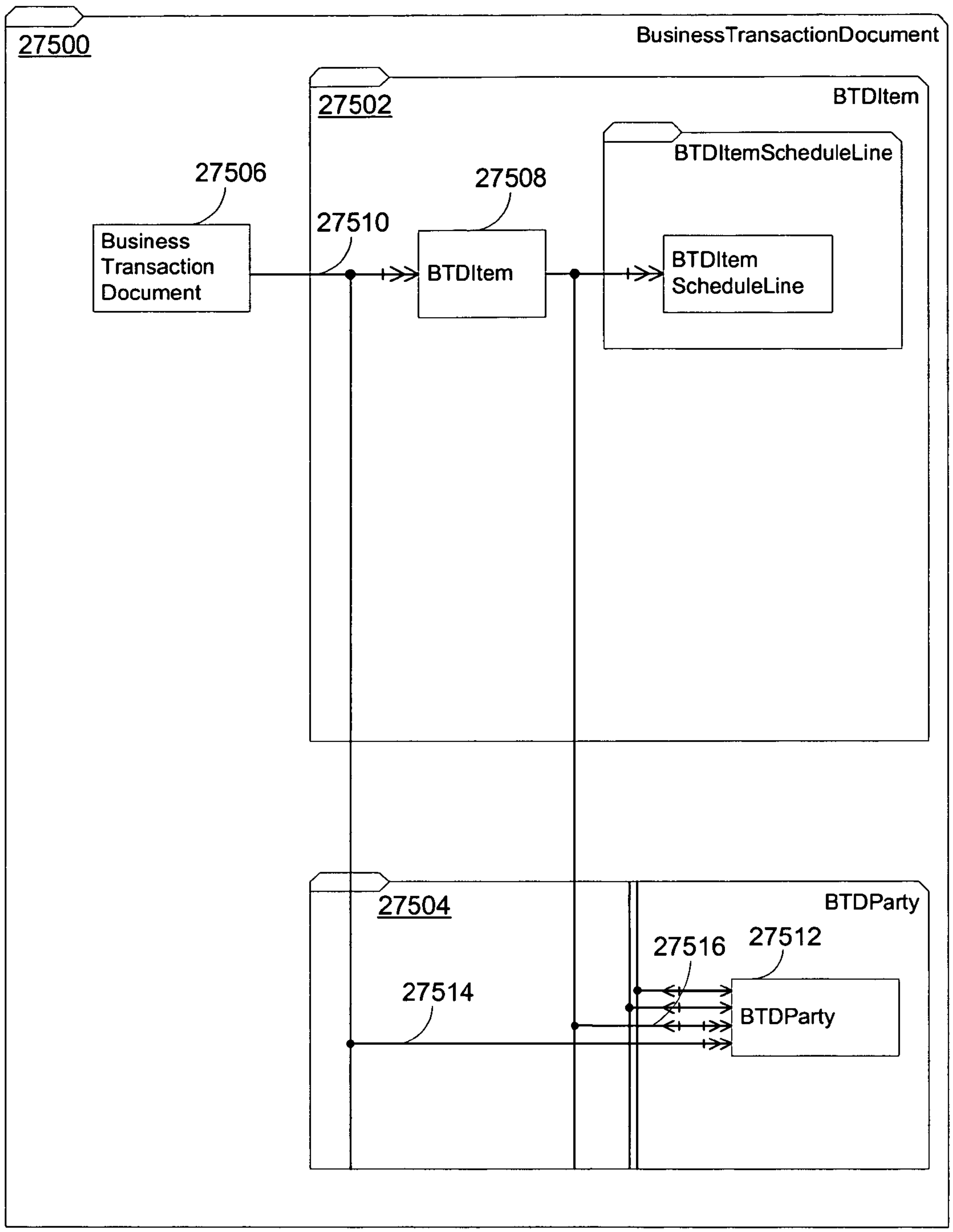
Figure 276:
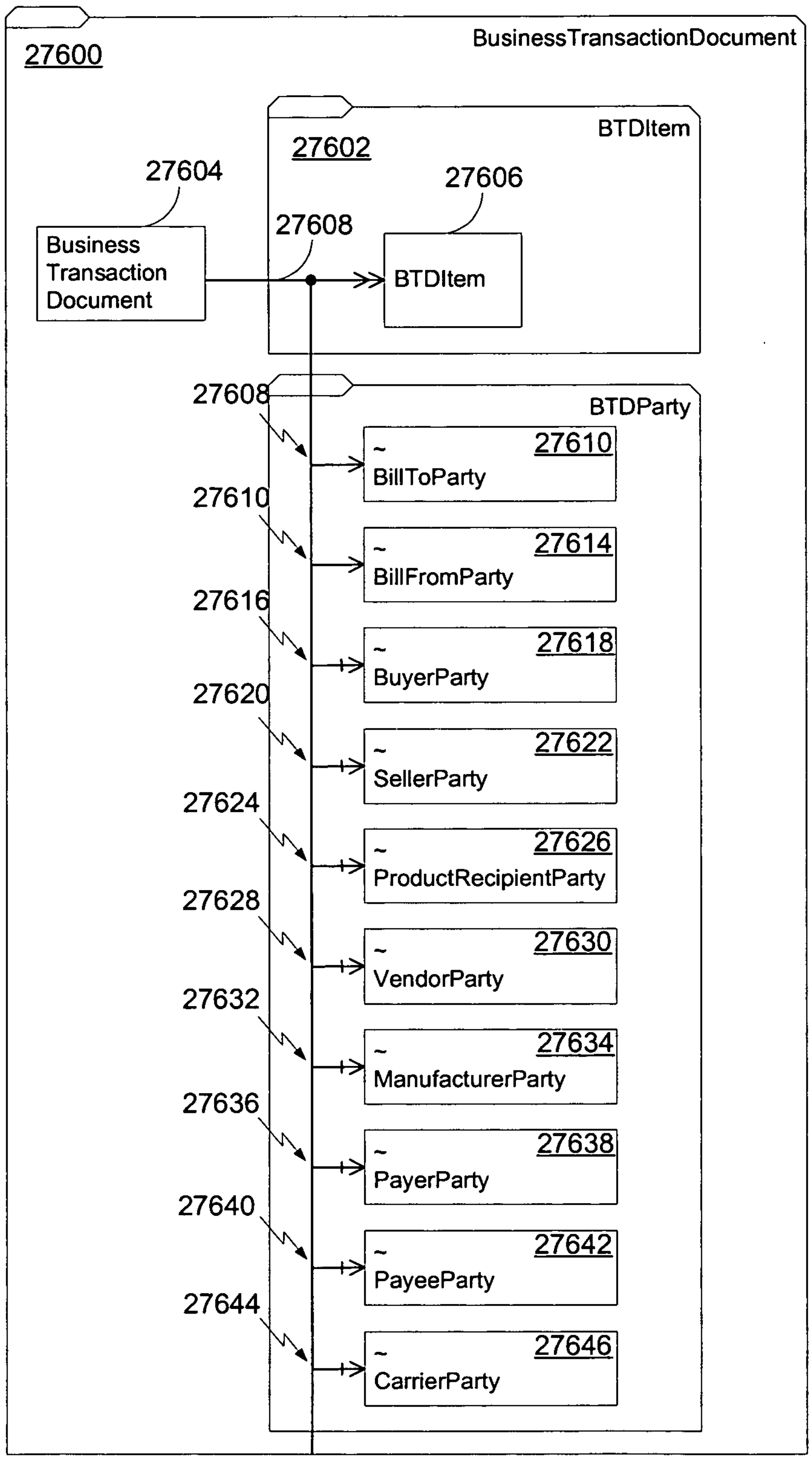
Figure 277:
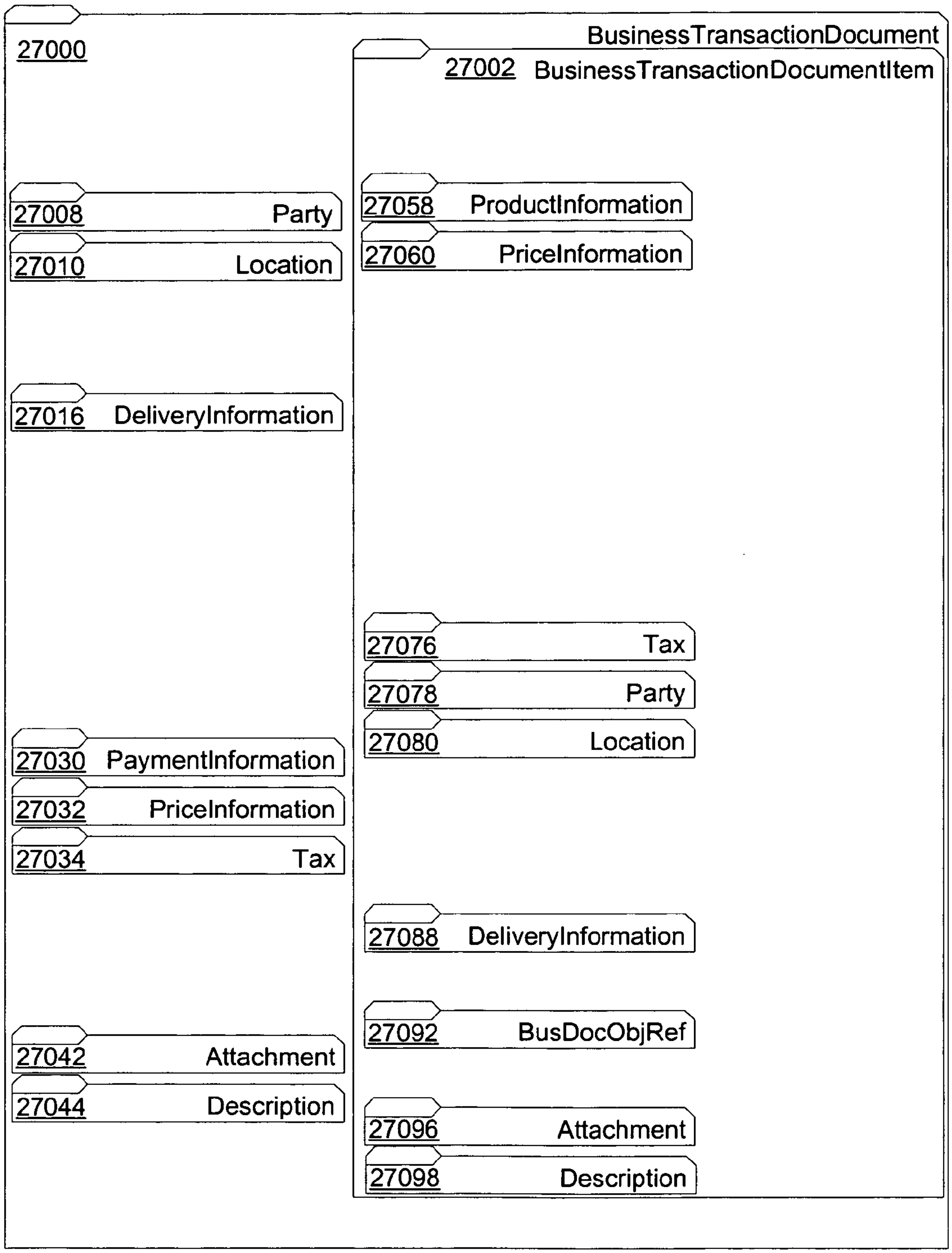
Figure 278:
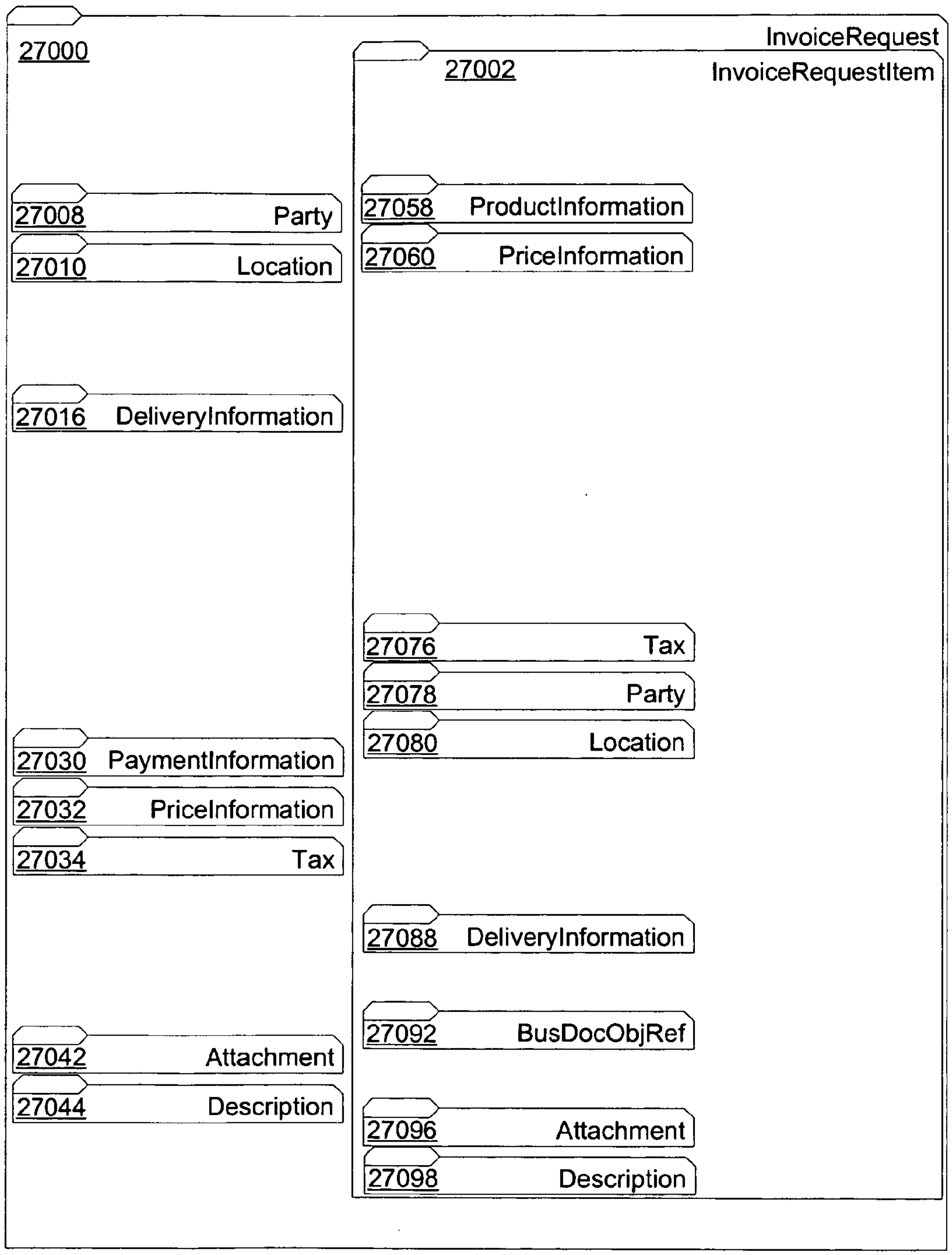
Figure 279A:
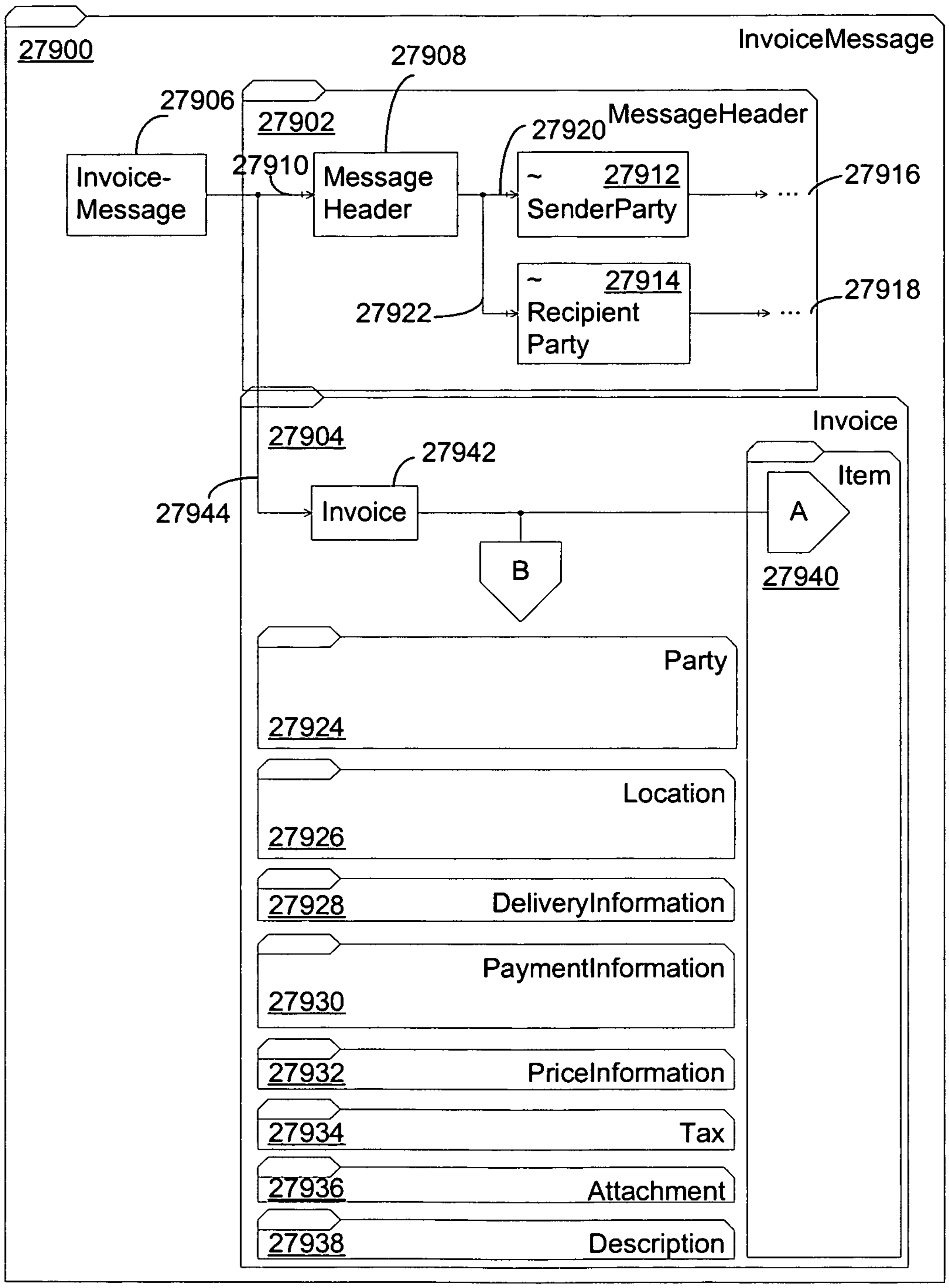
Figure 279B:
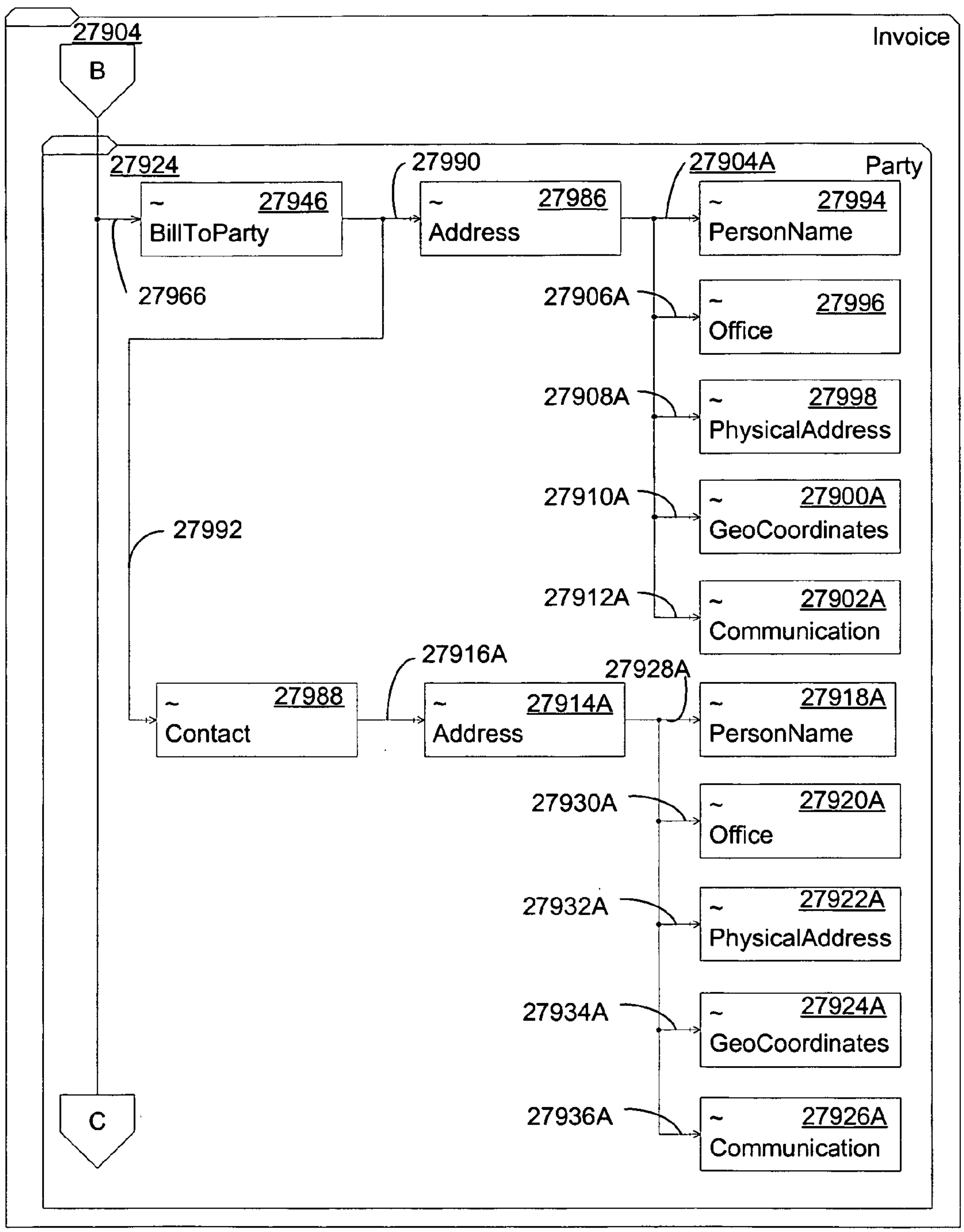
Figure 279C:
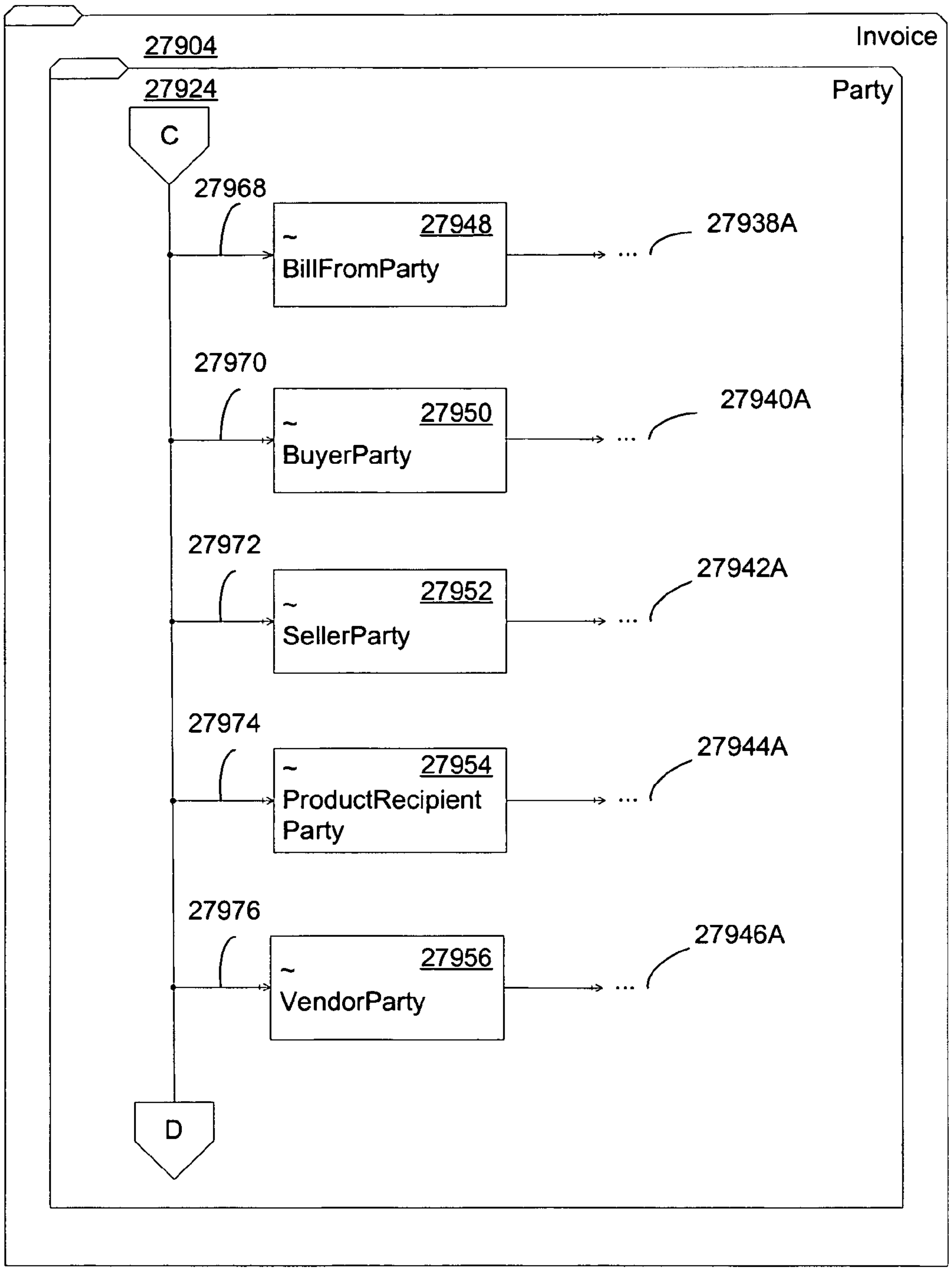
Figure 279D:
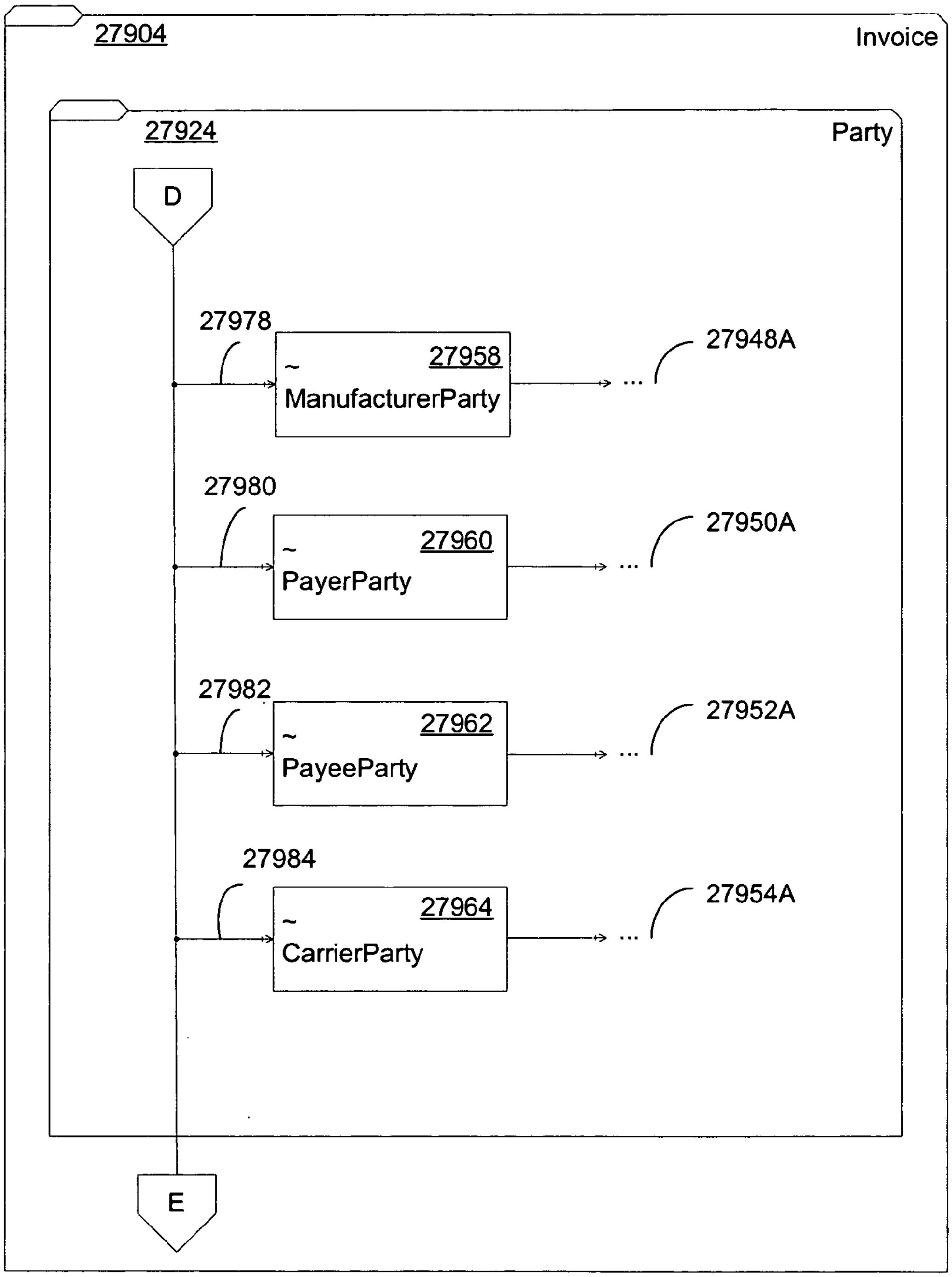
Figure 279E:
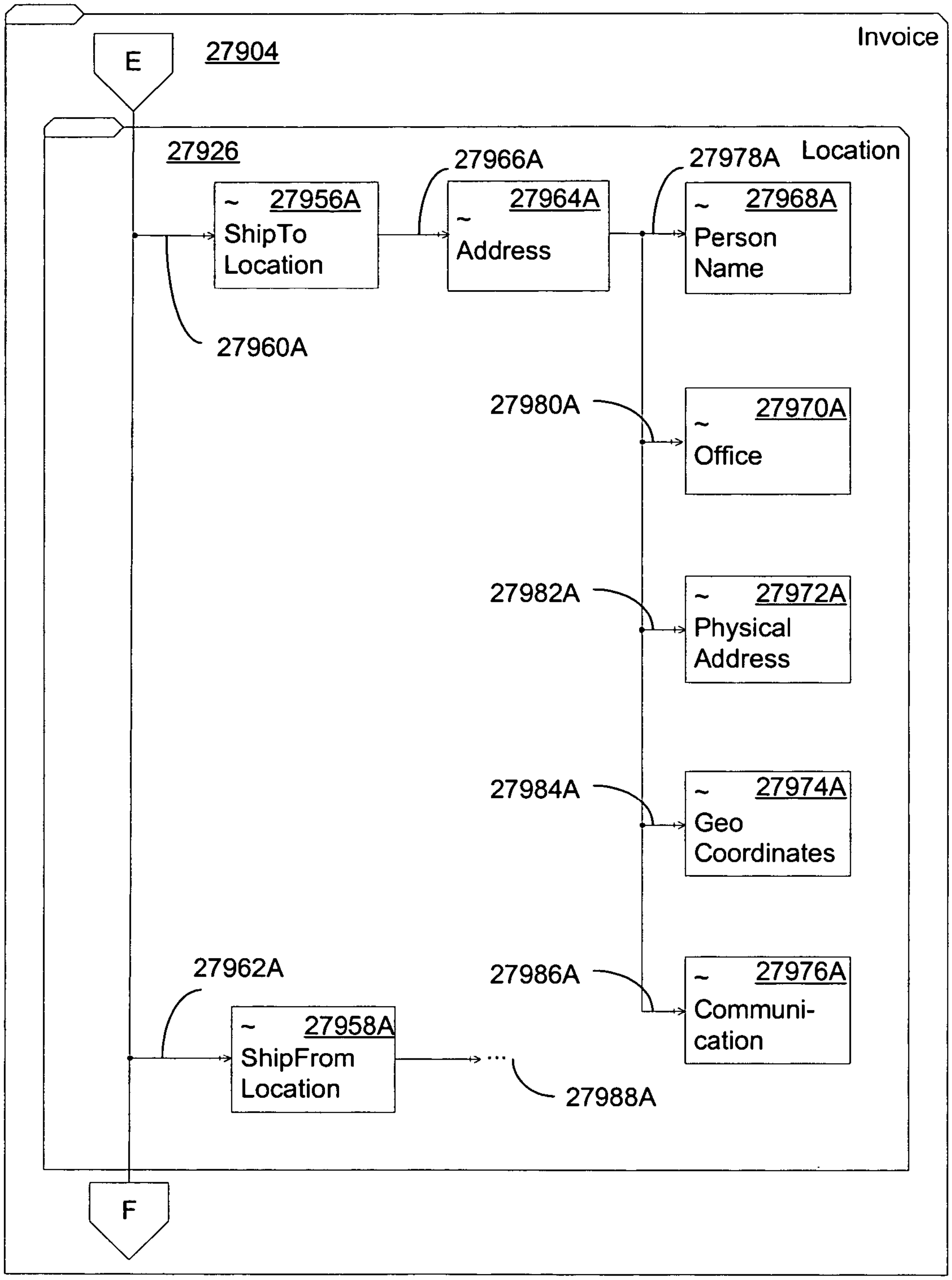
Figure 279F:
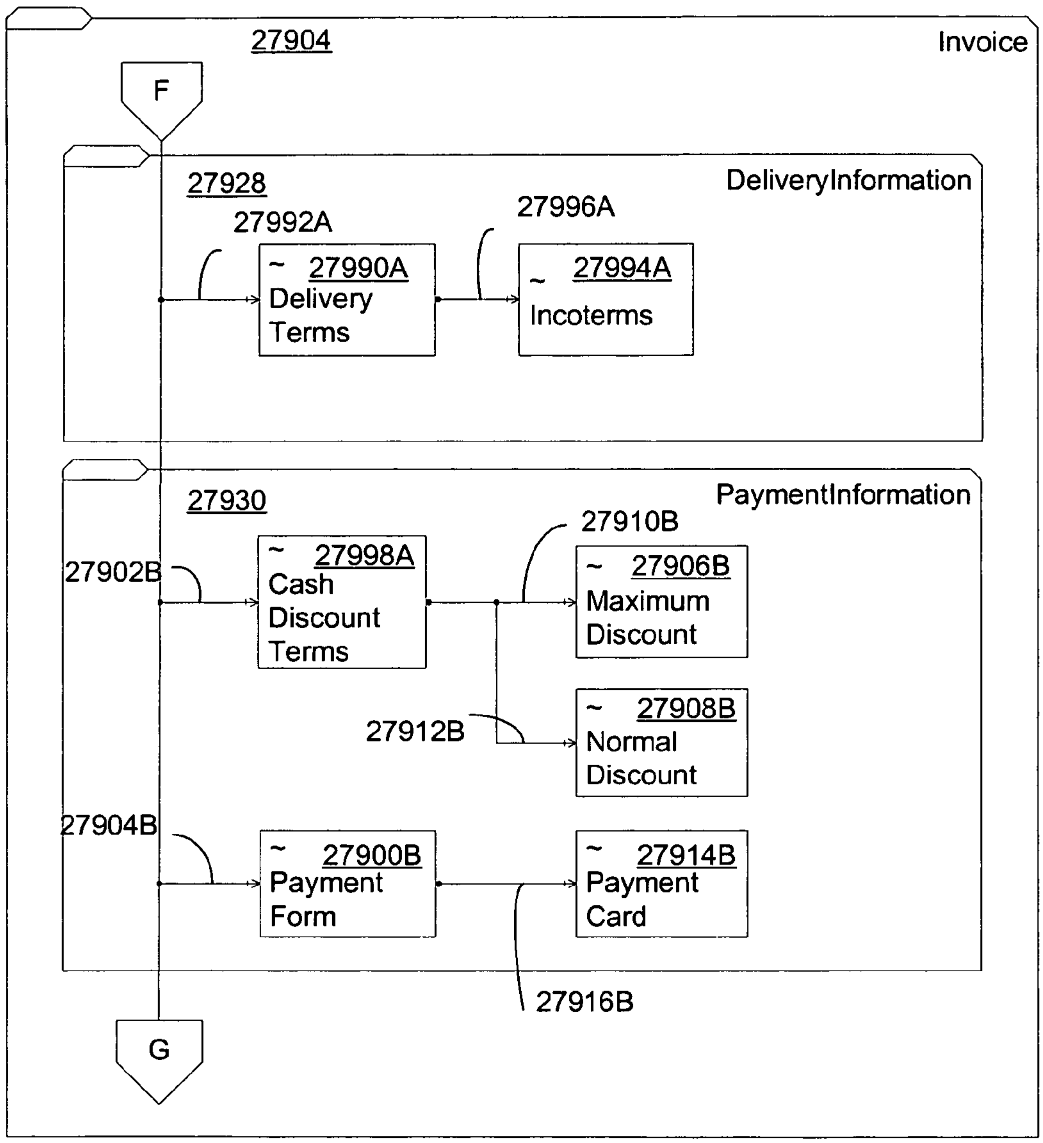
Figure 279G:
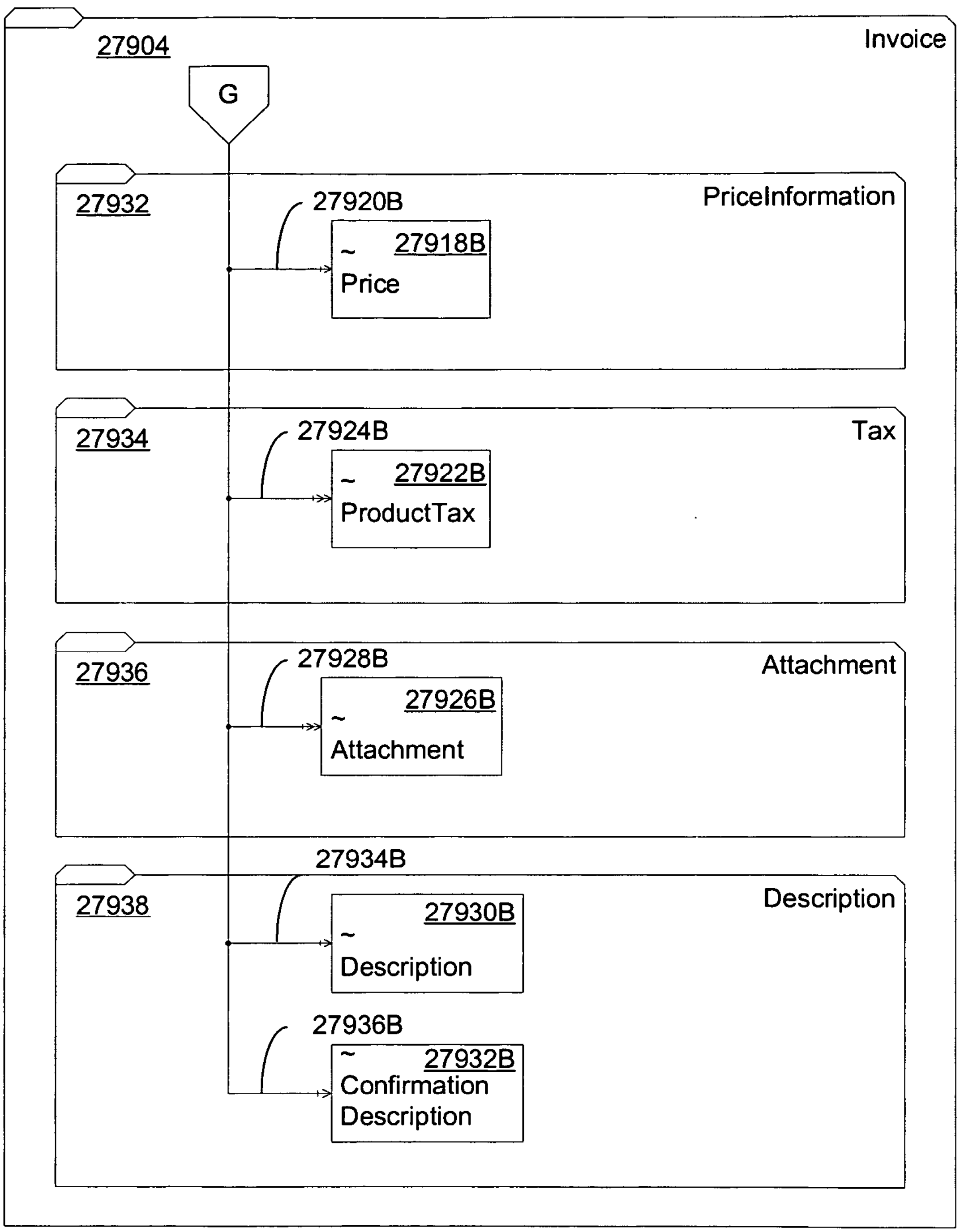
Figure 279H:
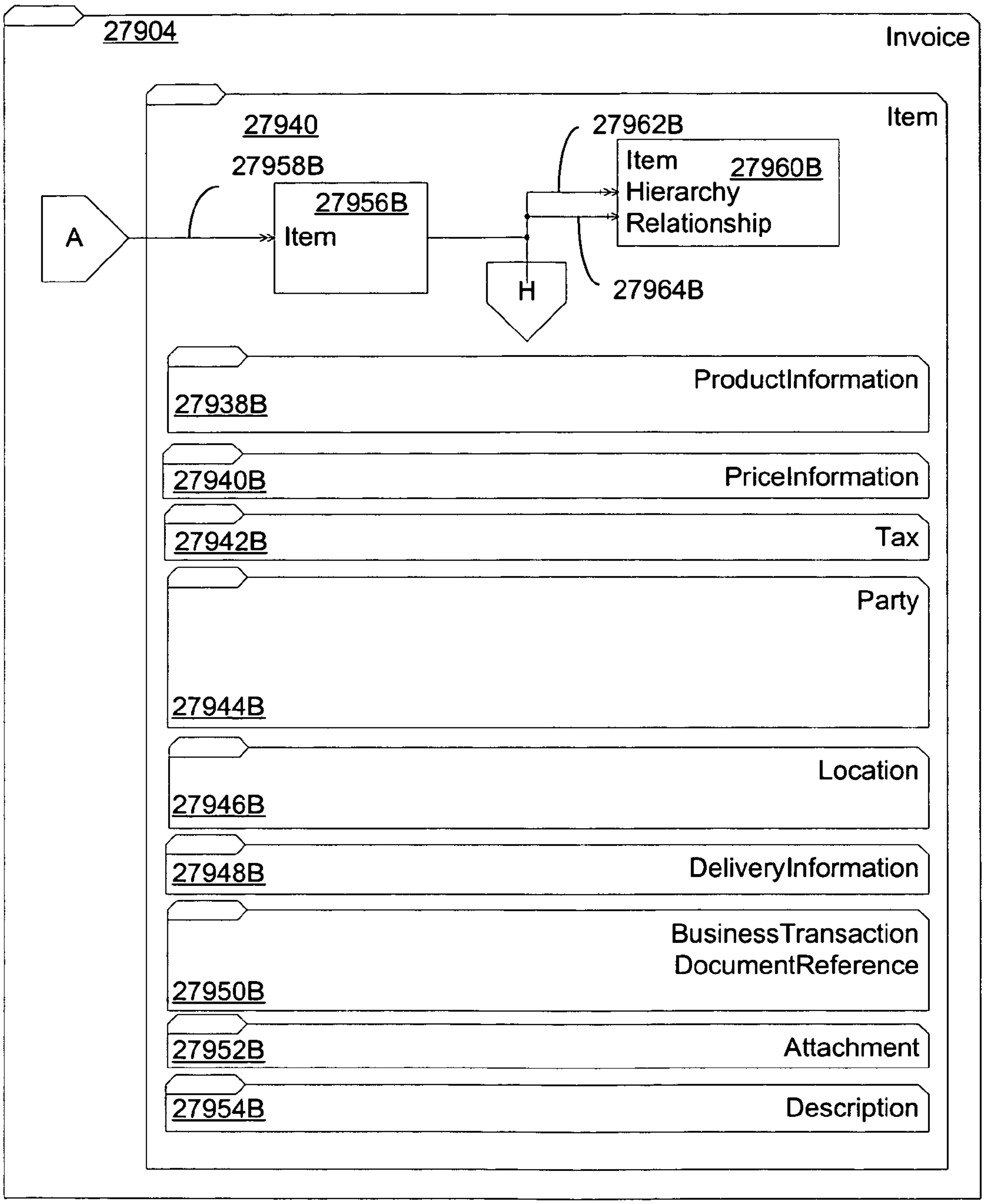
Figure 279I:
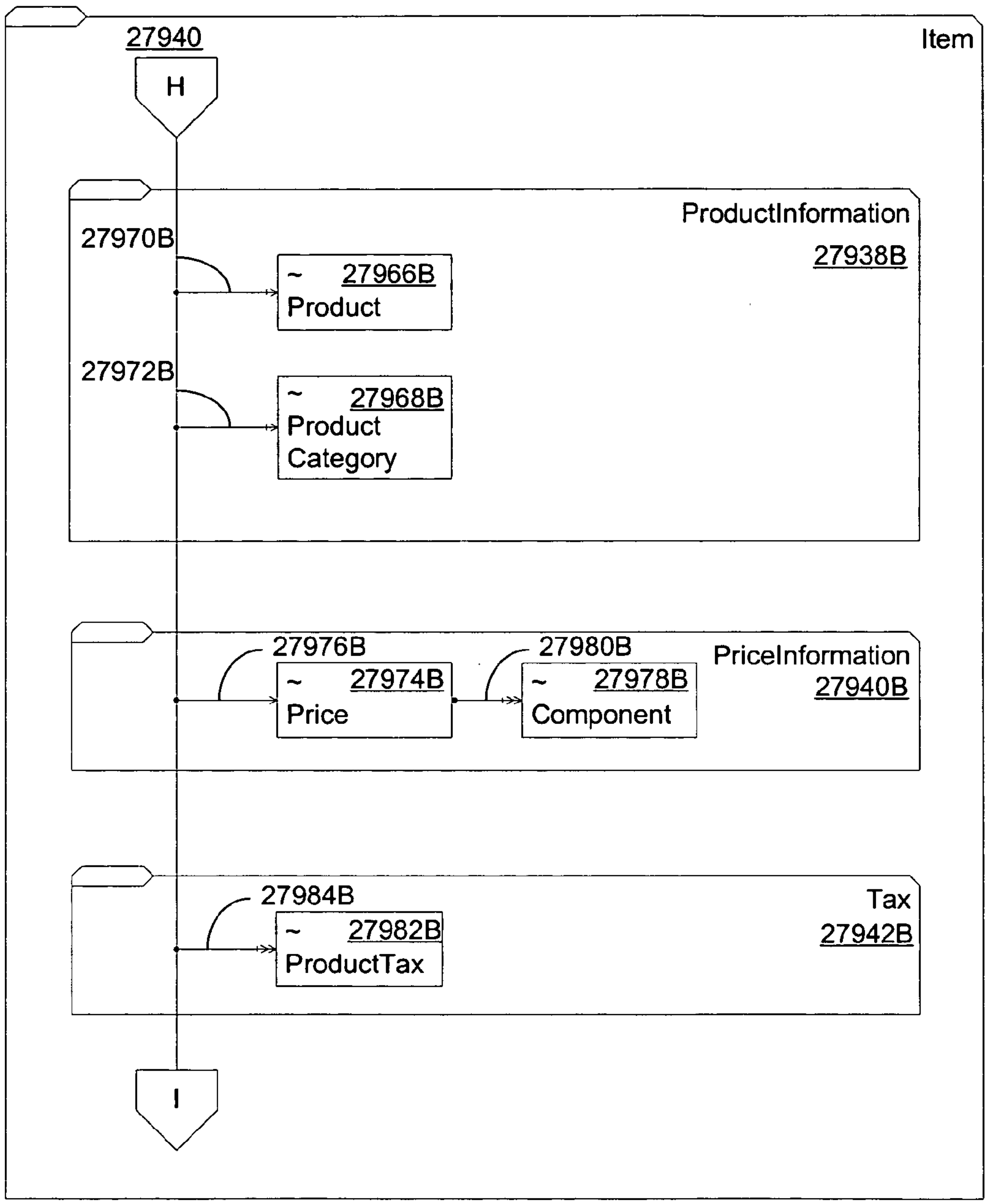
Figure 279J:
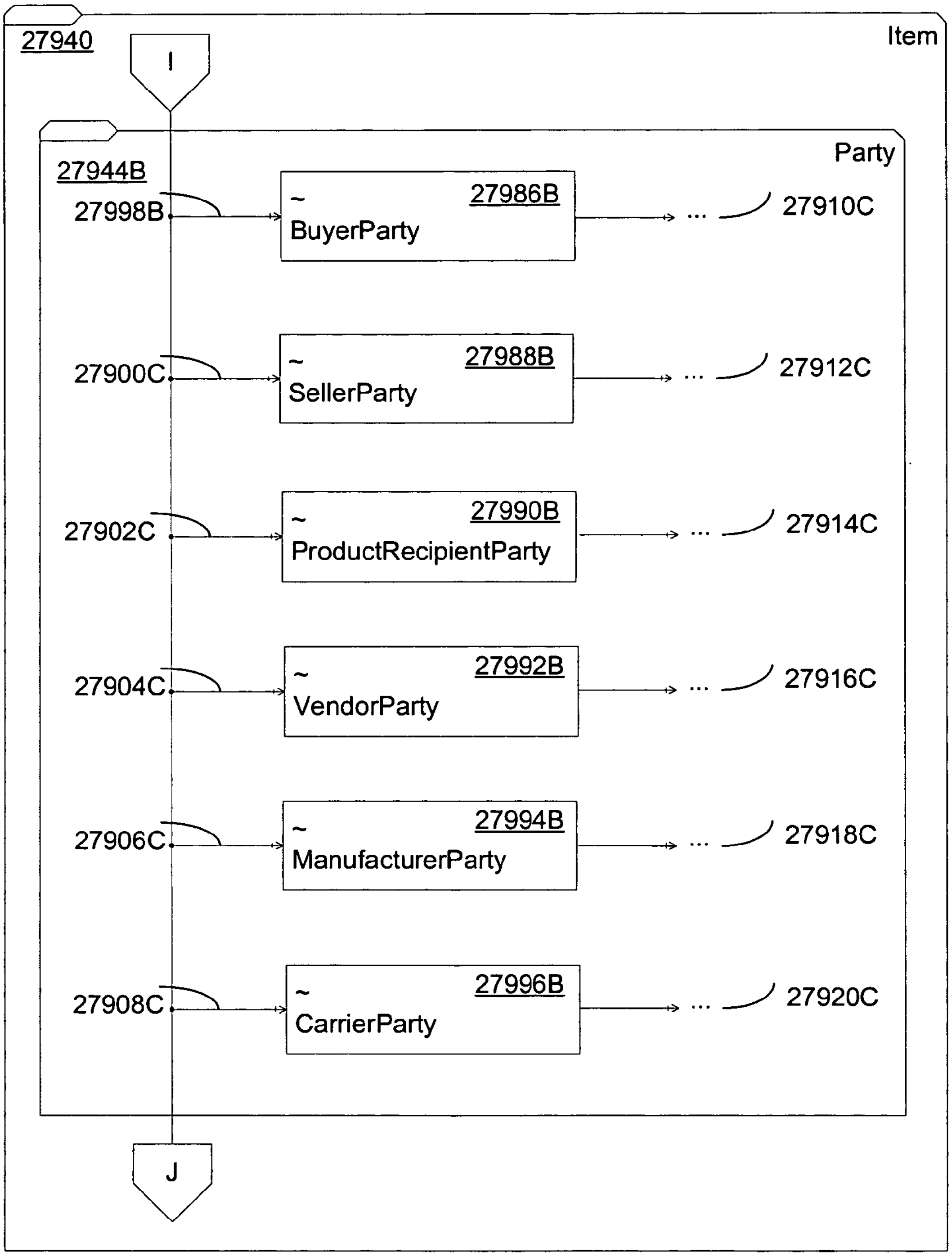
Figure 279K:
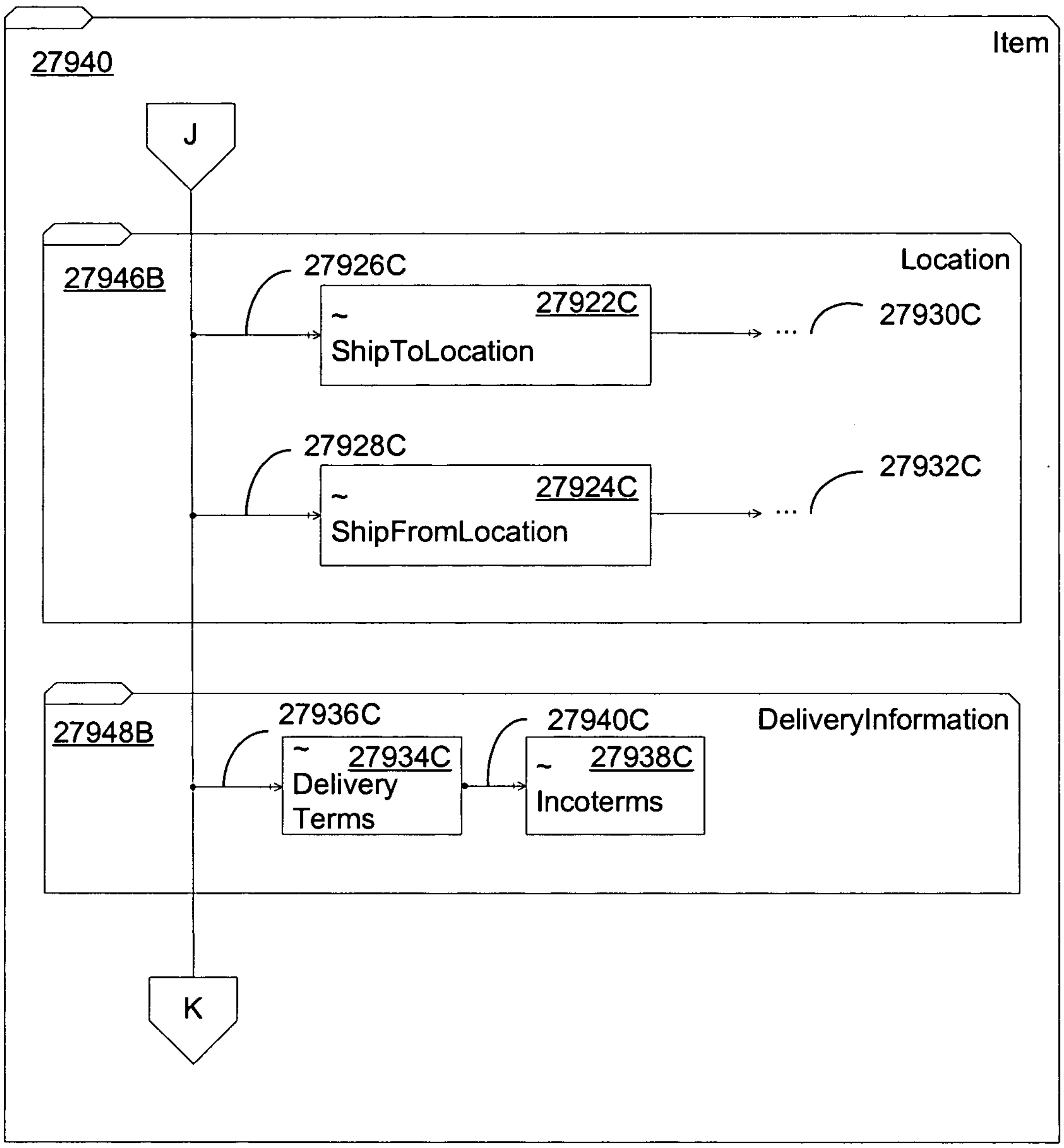
Figure 279L:
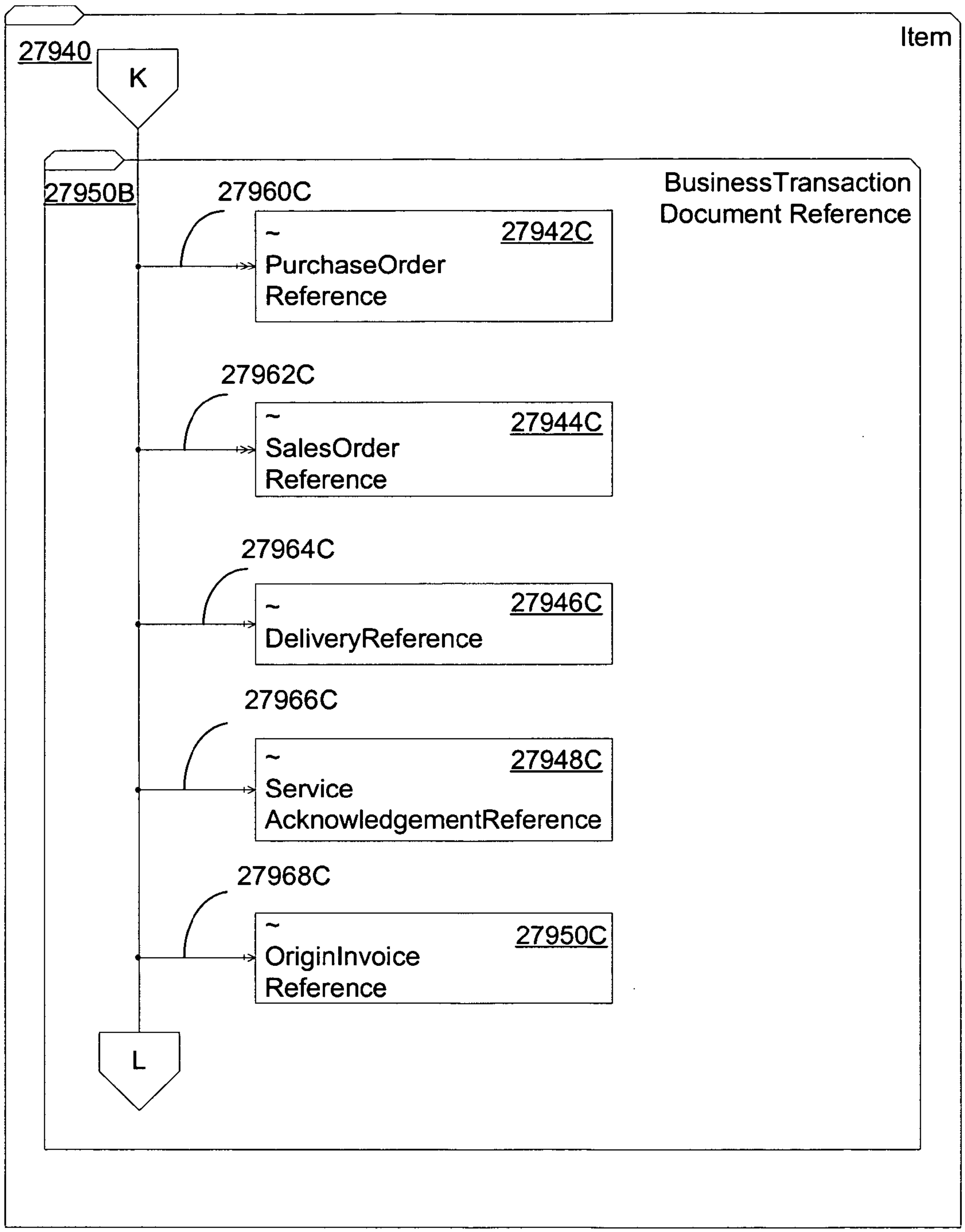
Figure 279M:
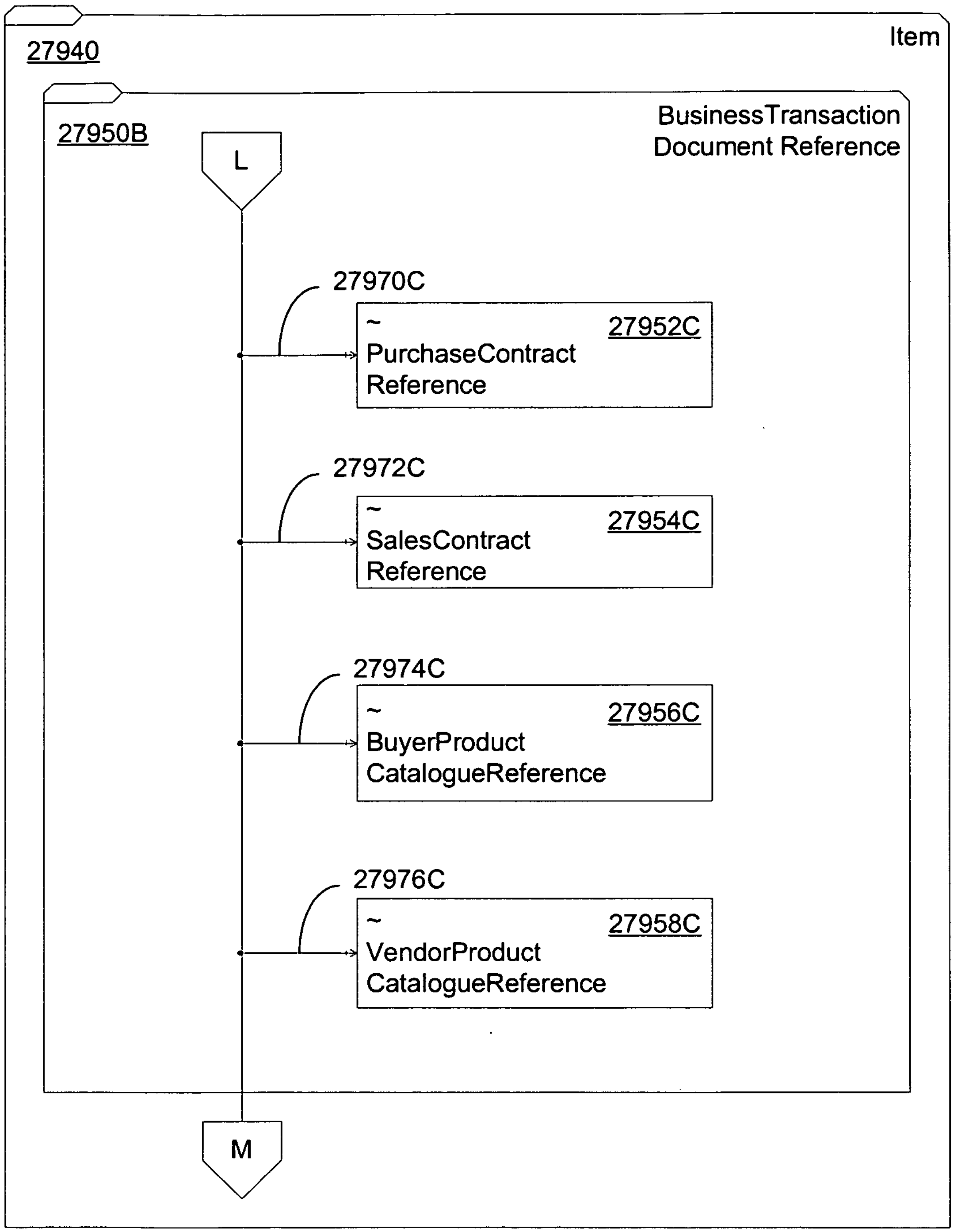
Figure 279N:
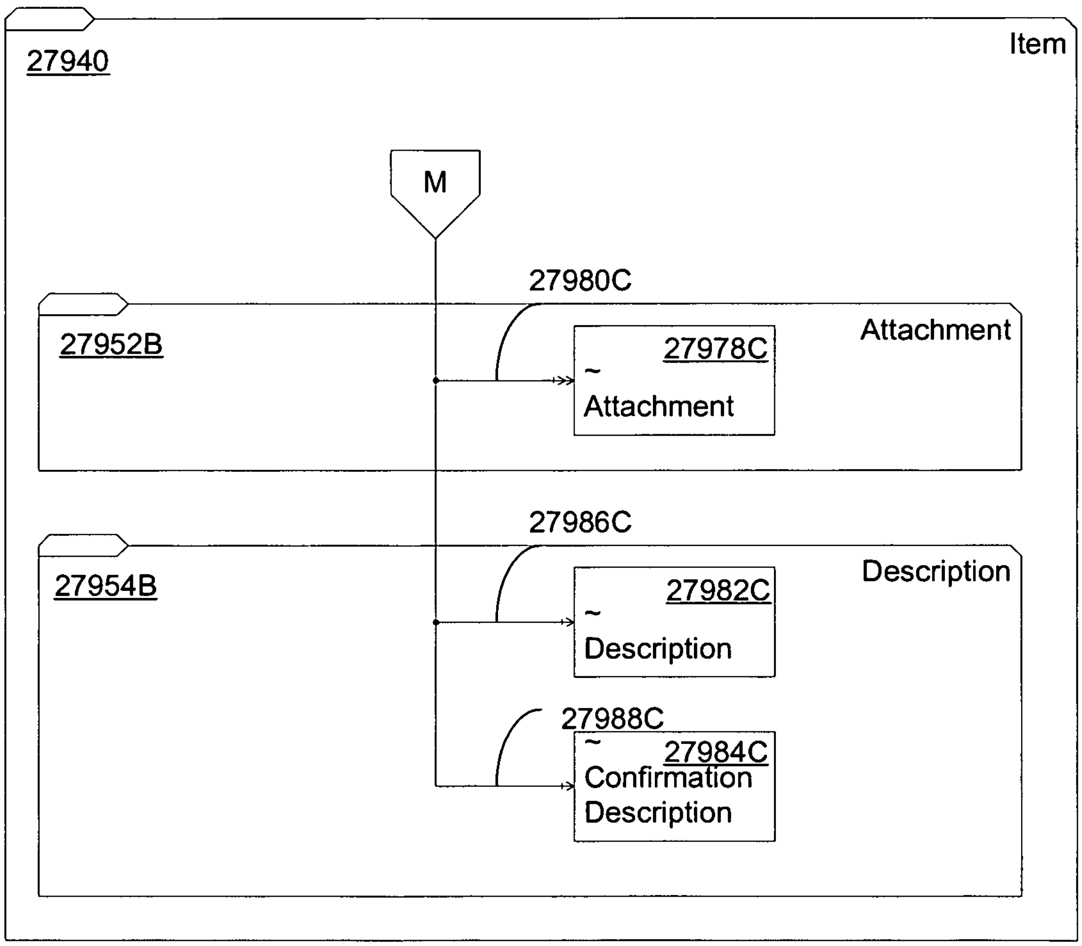
Figure 281:
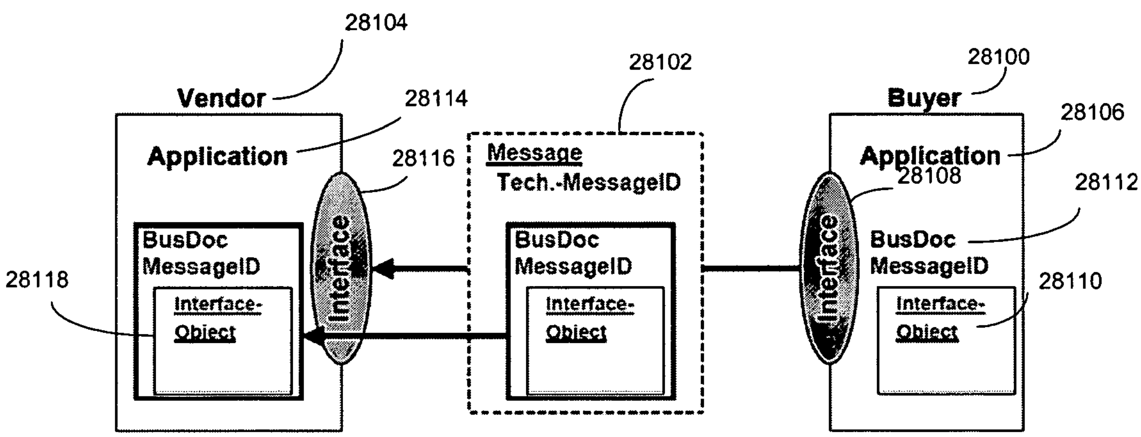
Figure 282:
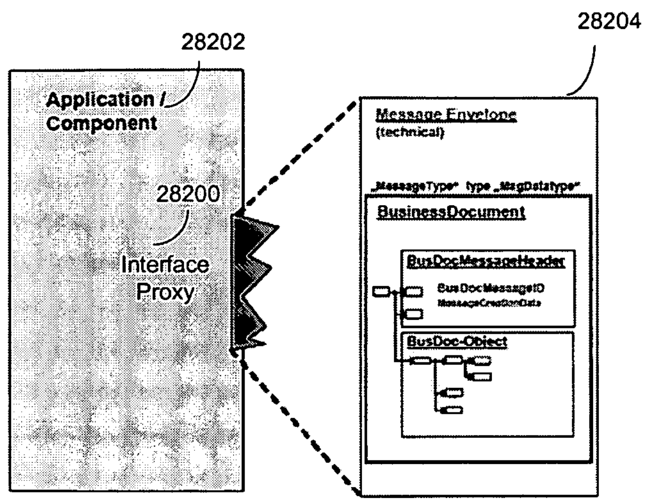
Figure 283:
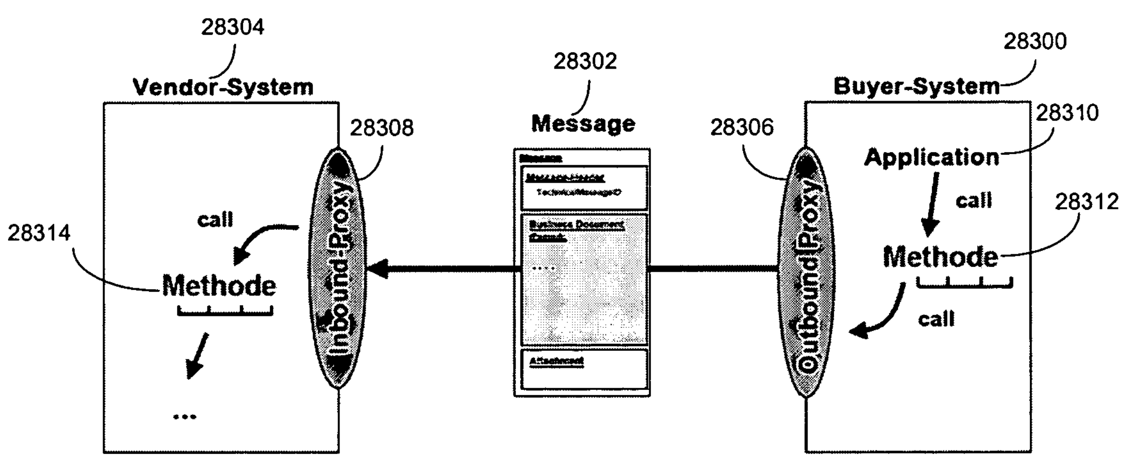
Figure 284:
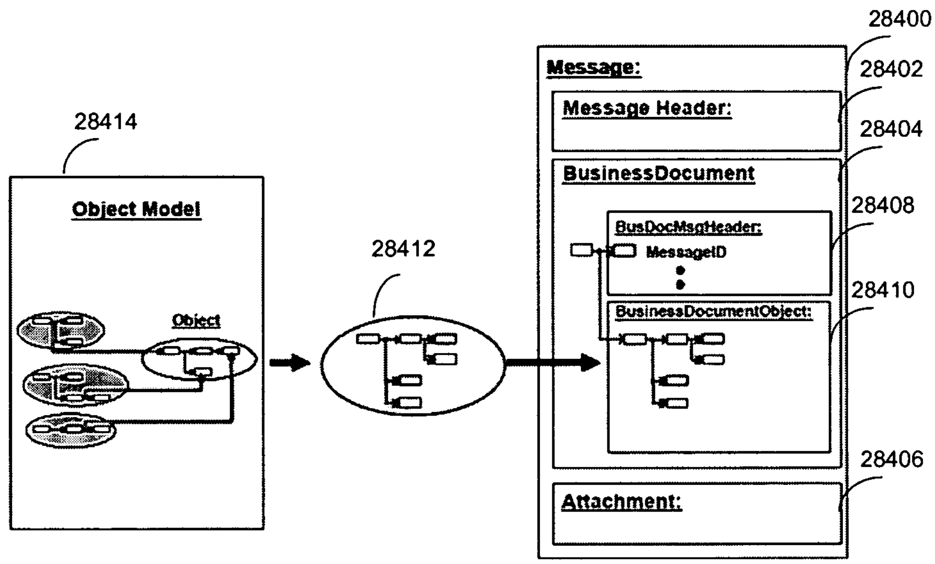
Figure 285:
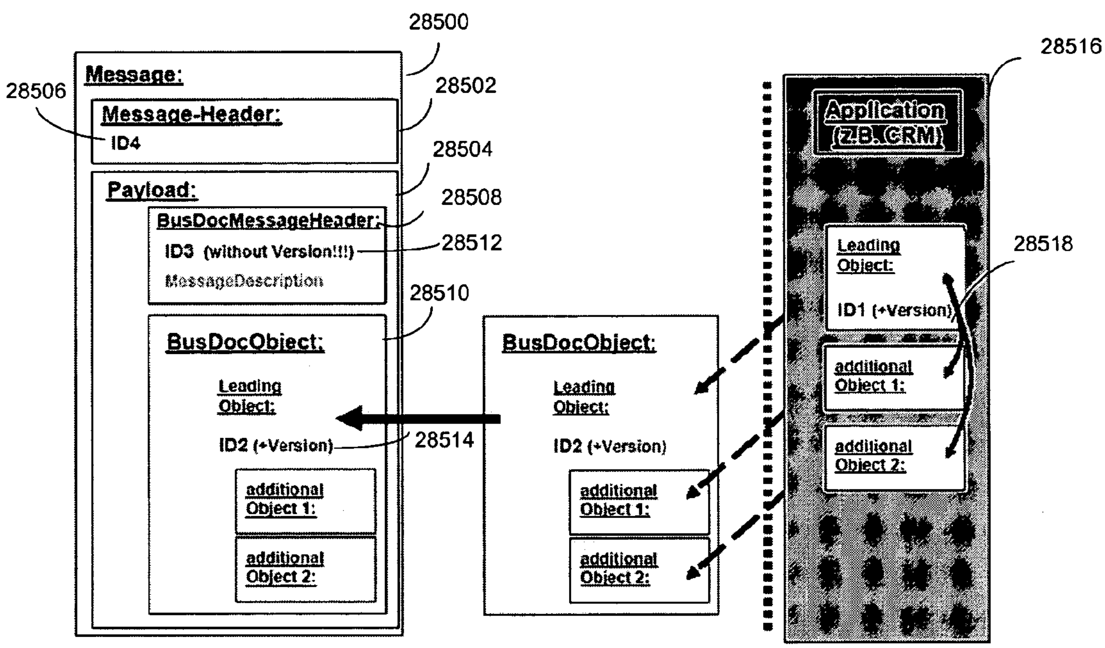
Figure 286:
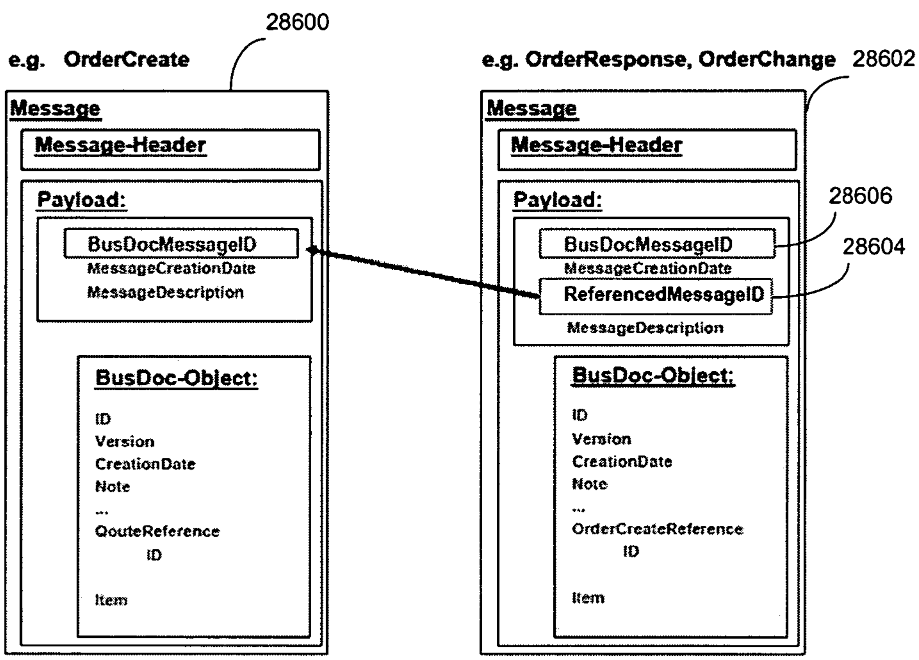
Figure 287:
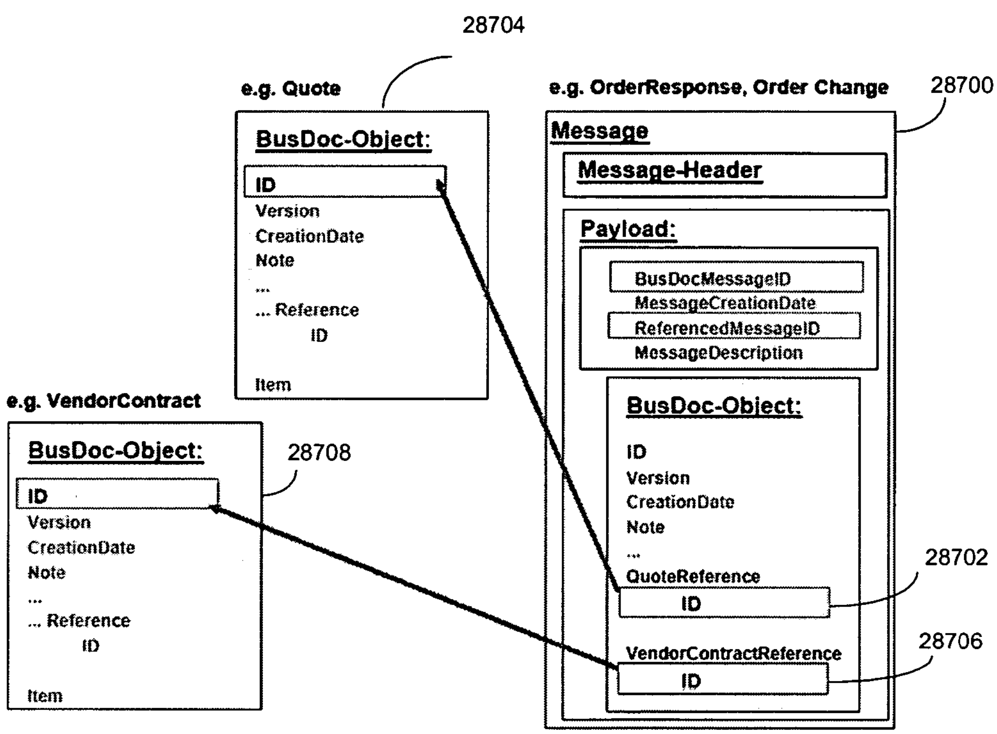
Figure 288:
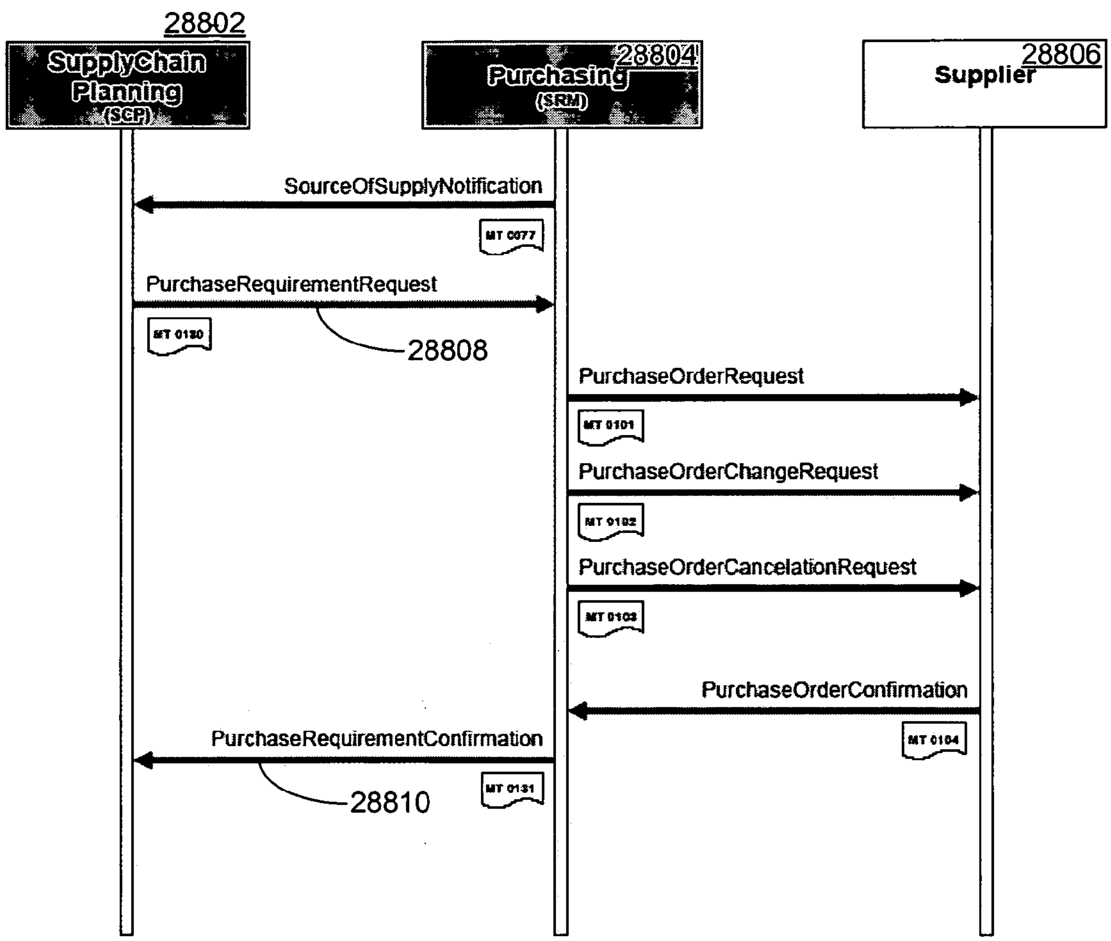
Figure 289A:
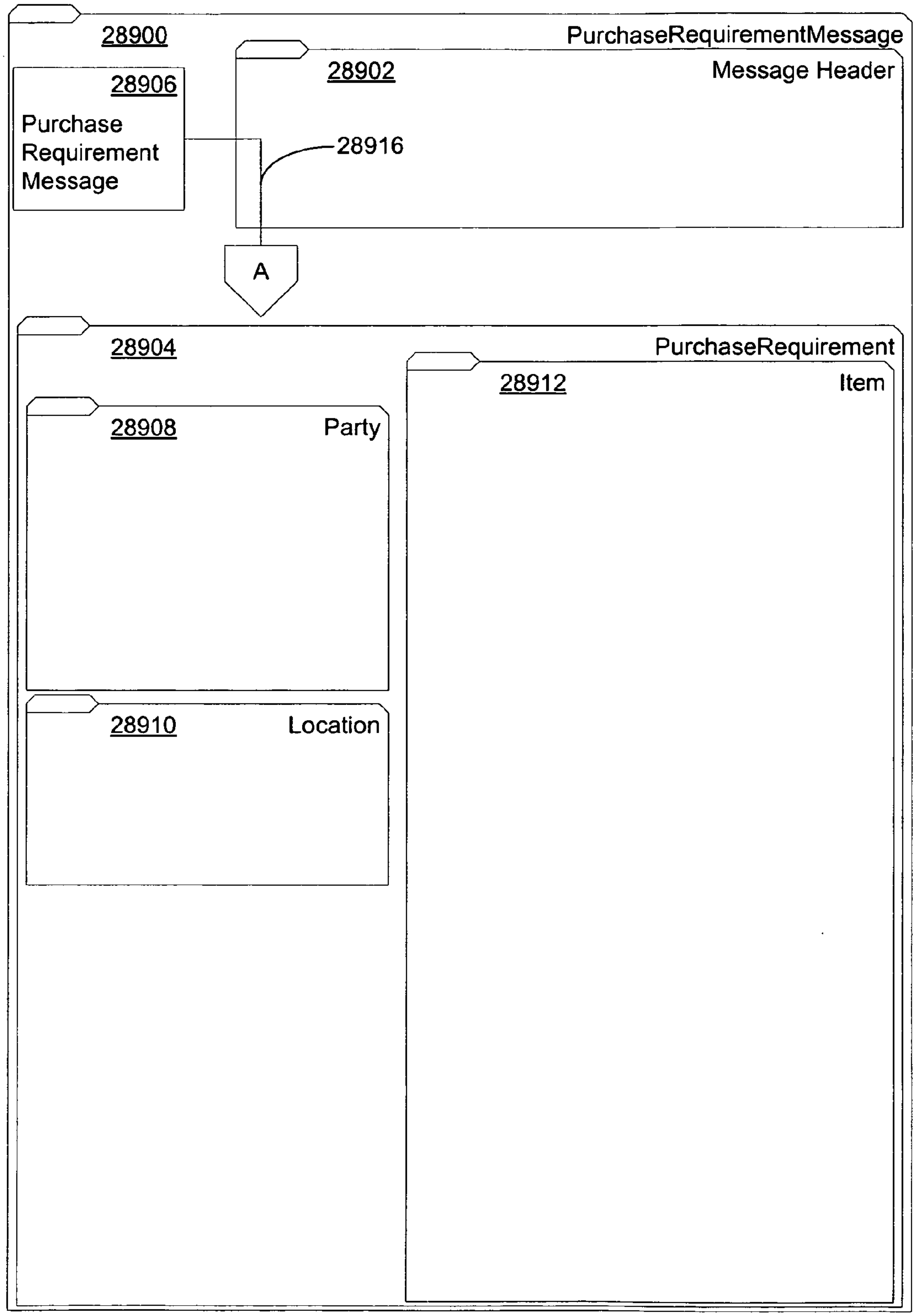
Figure 289B:
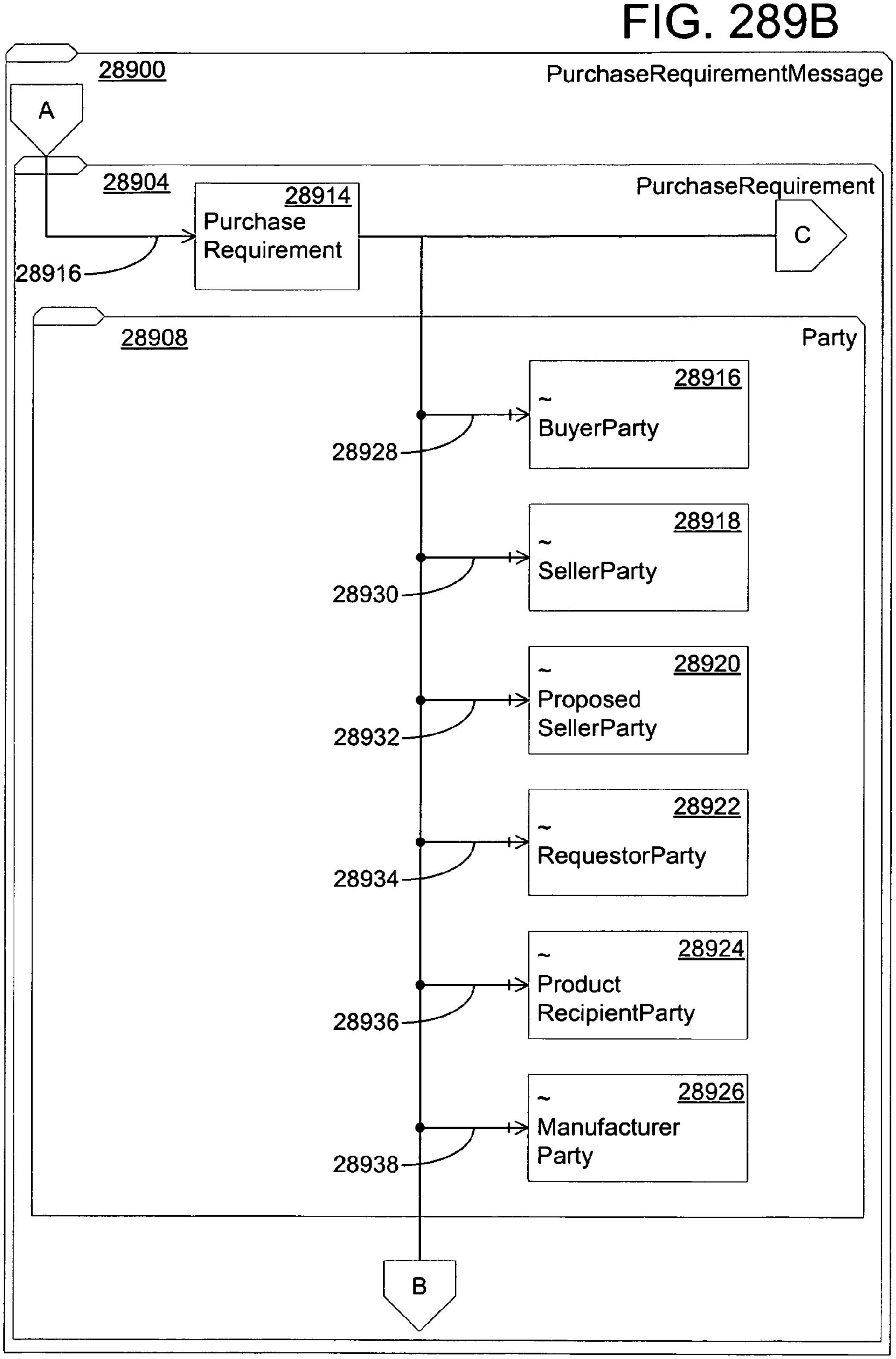
Figure 289C:
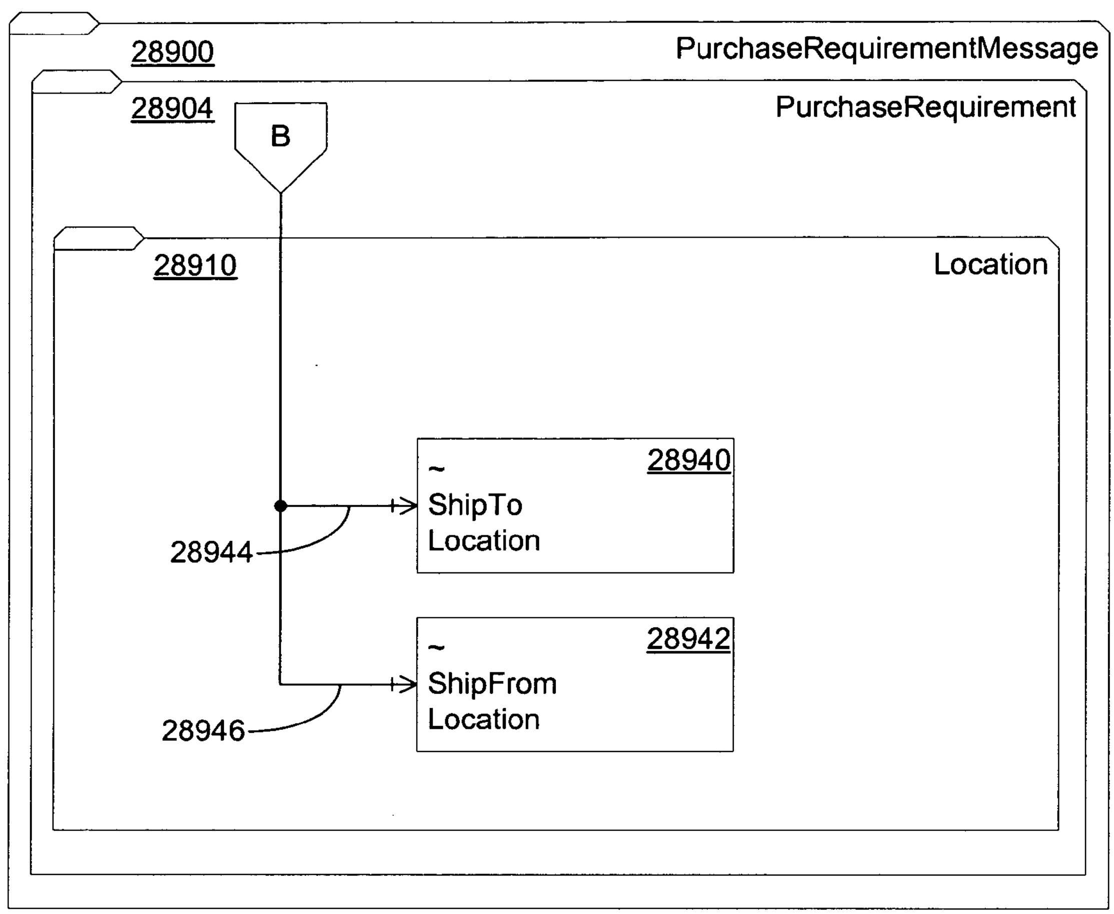
Figure 289D:
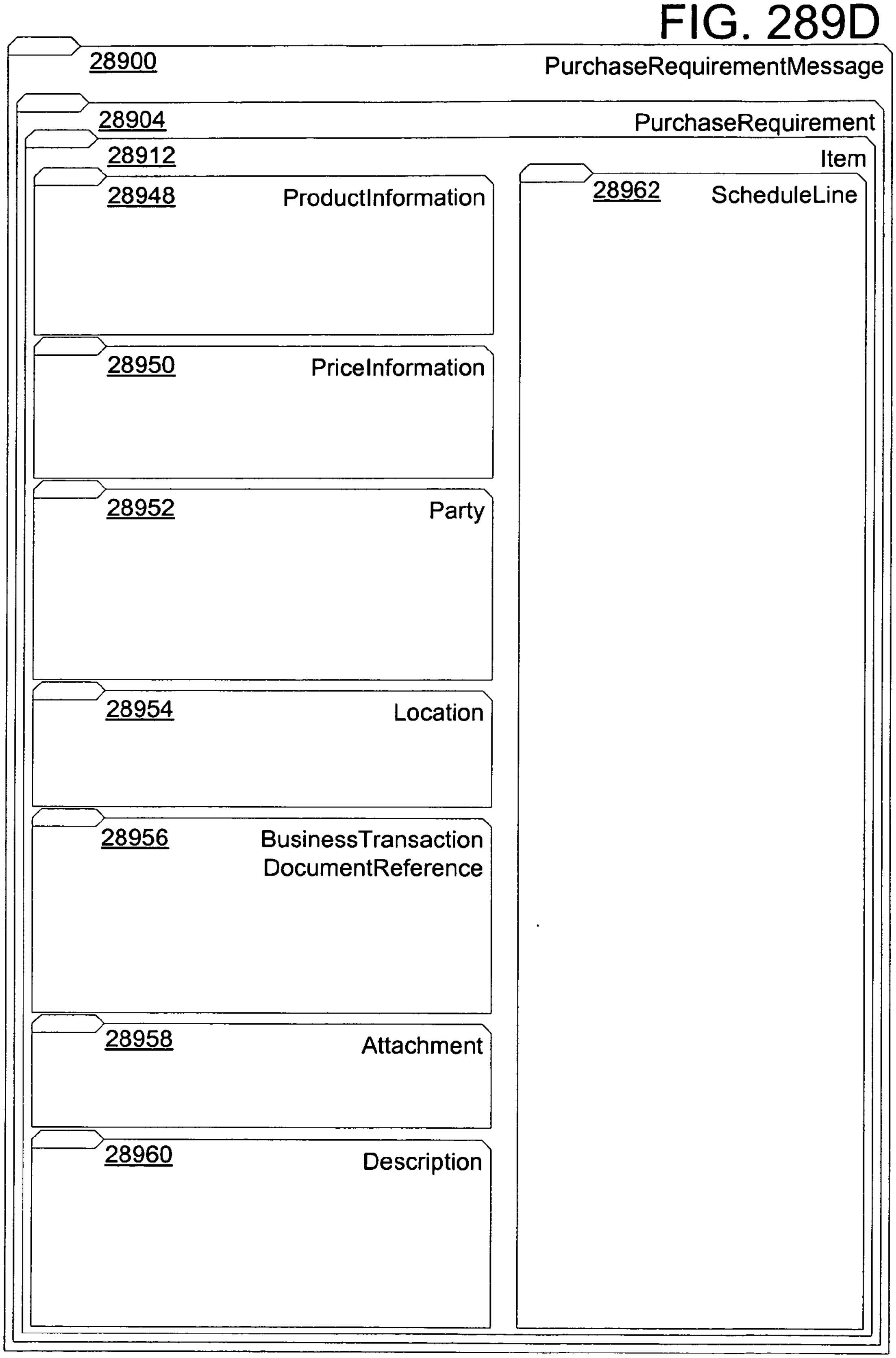
Figure 289E:
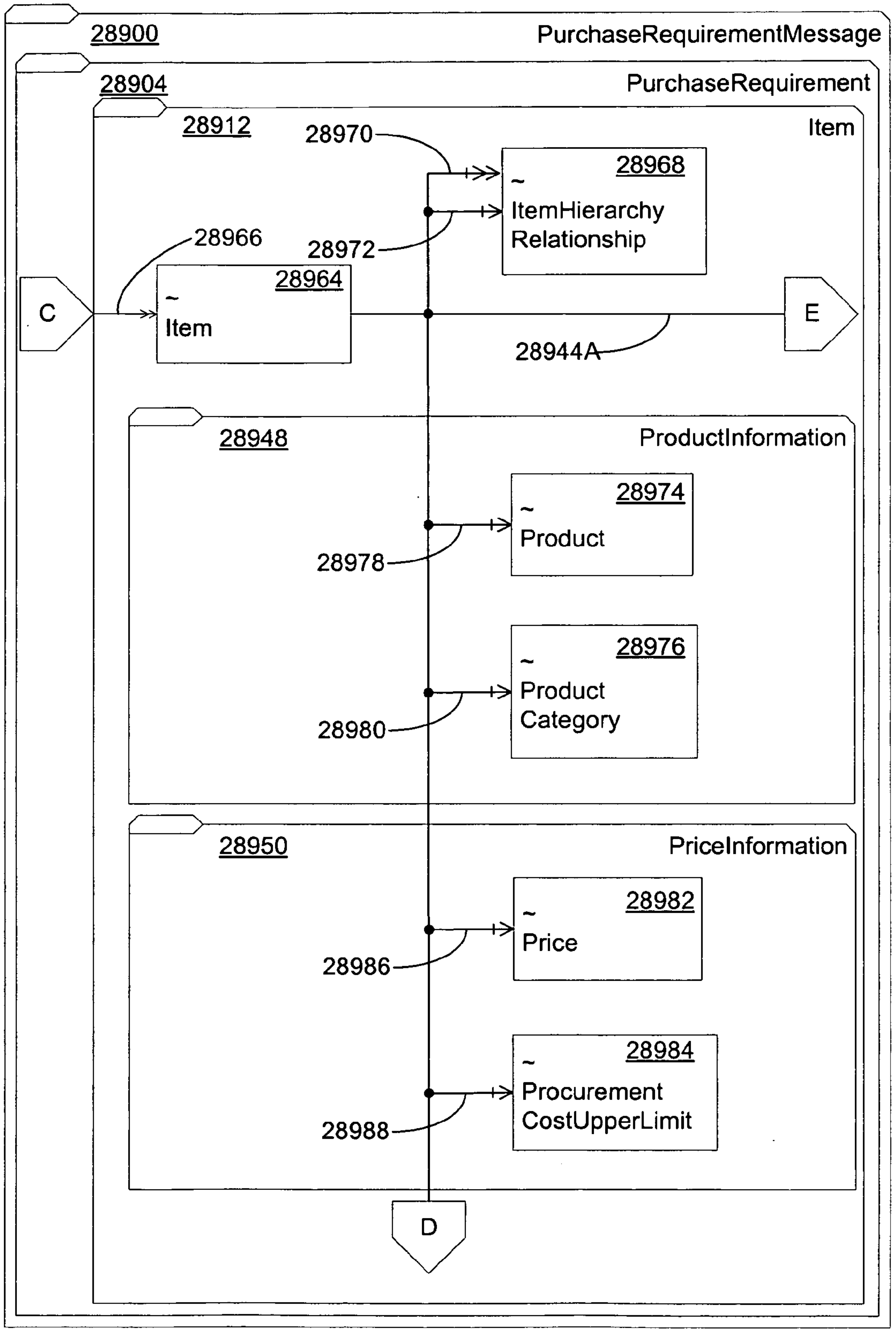
Figure 289F:
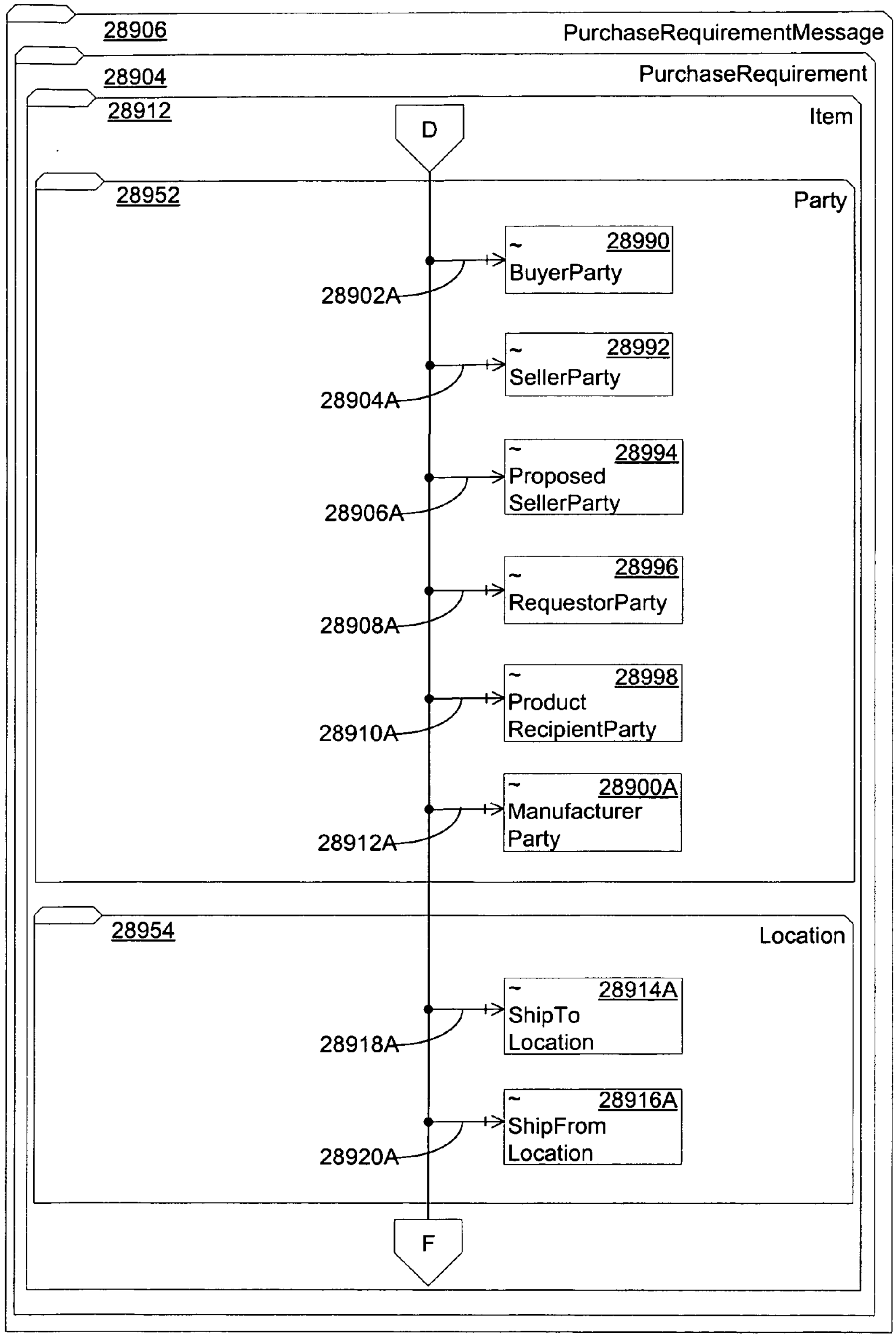
Figure 289G:
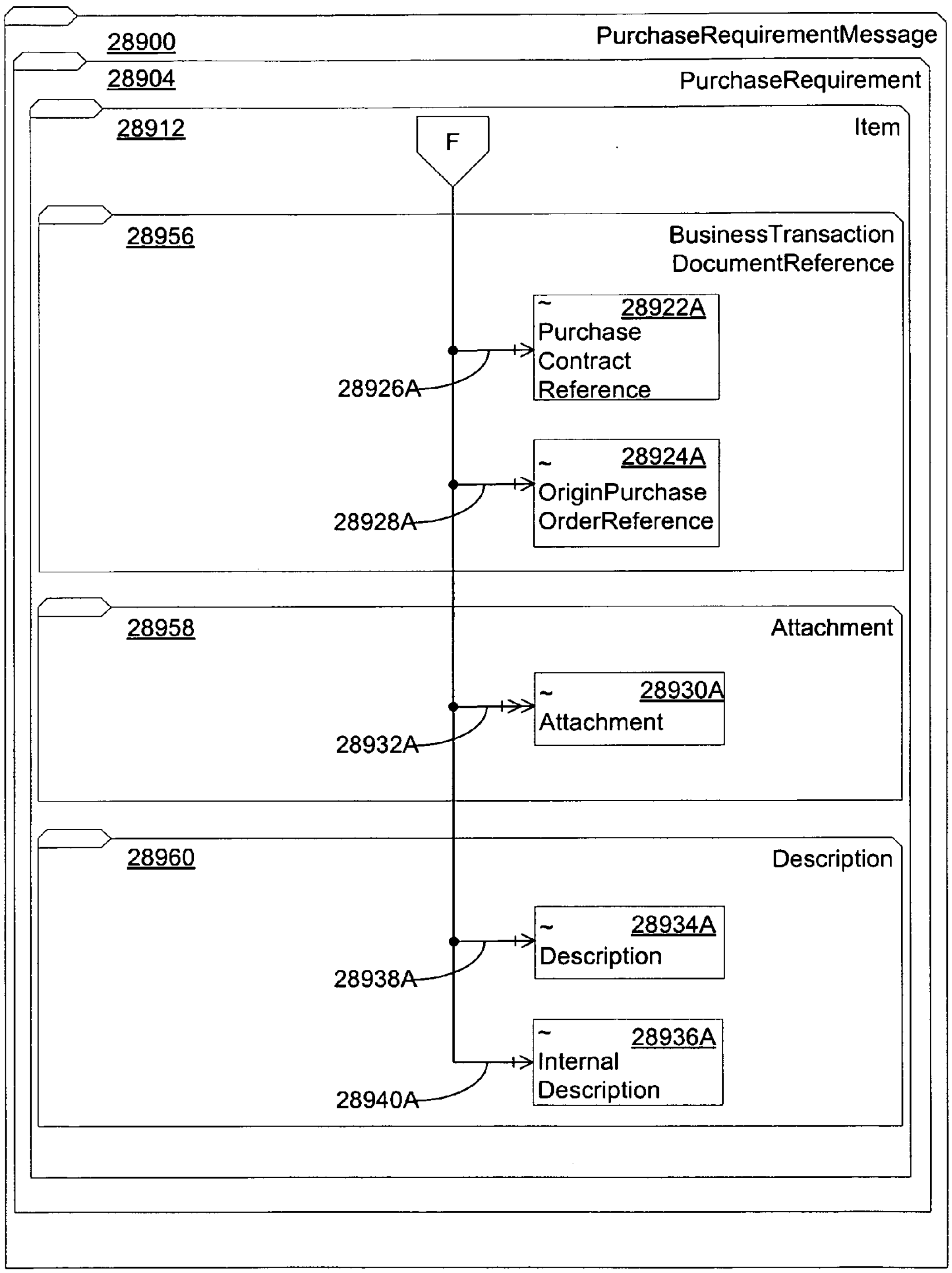
Figure 289H:
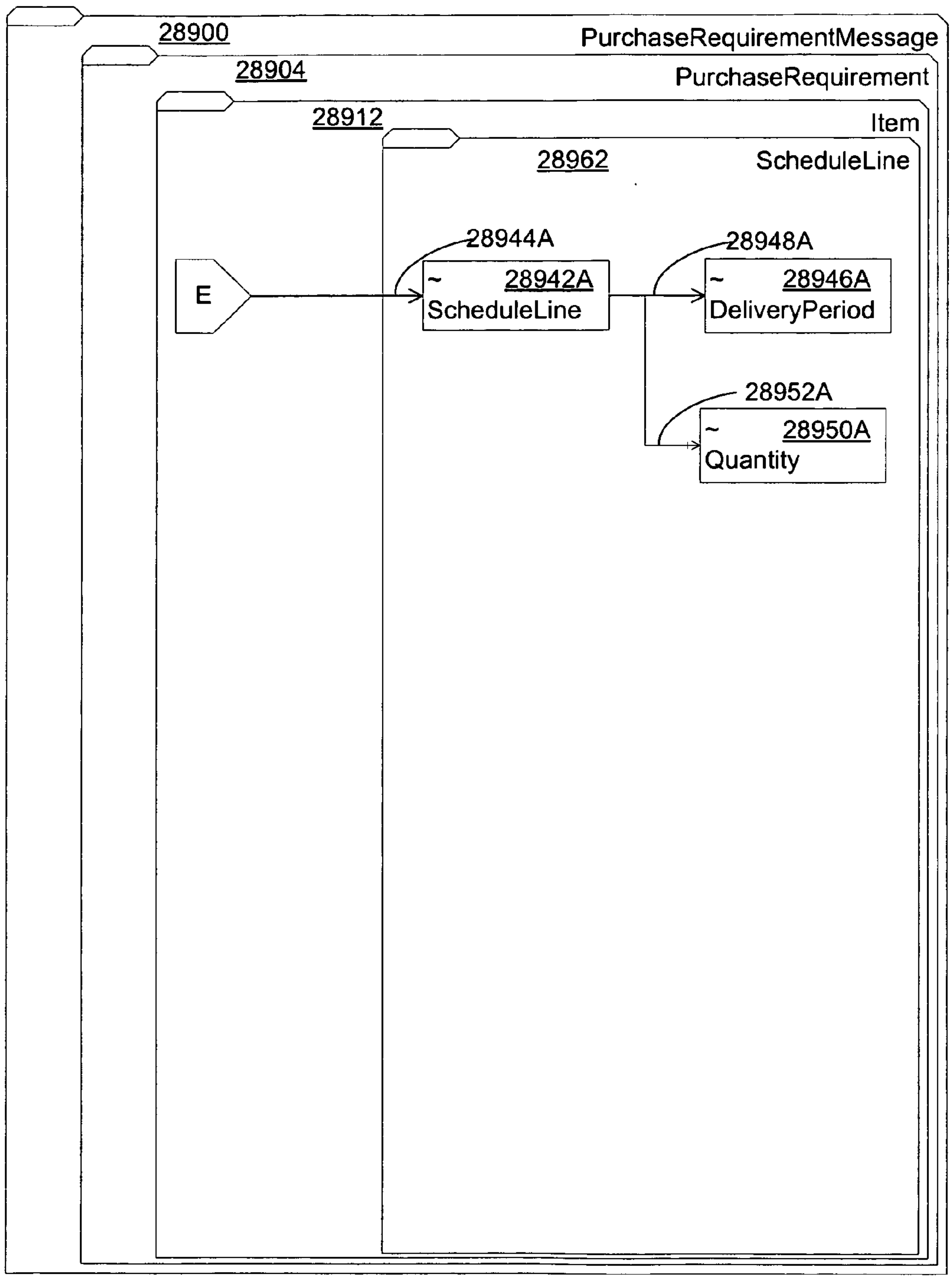
Figure 291:
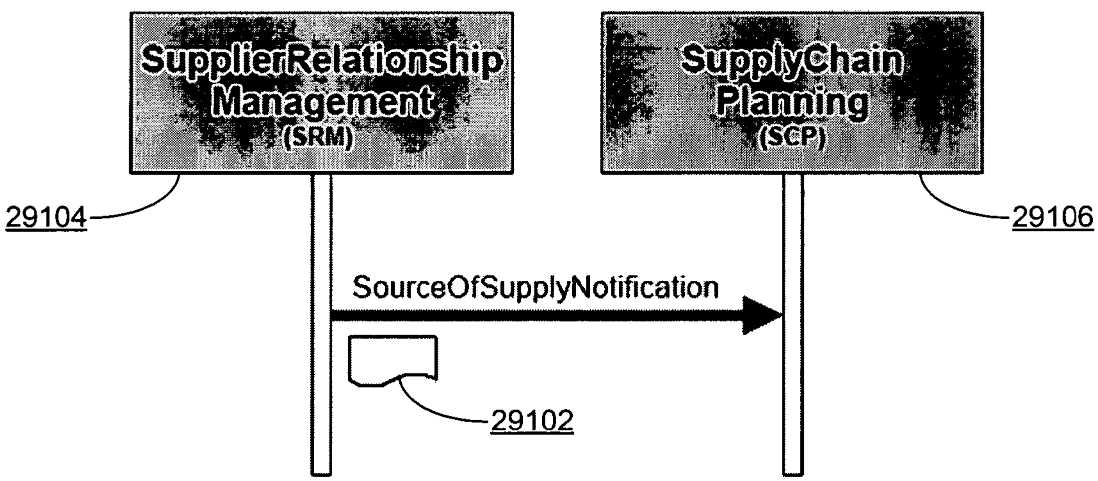
Figure 292A:
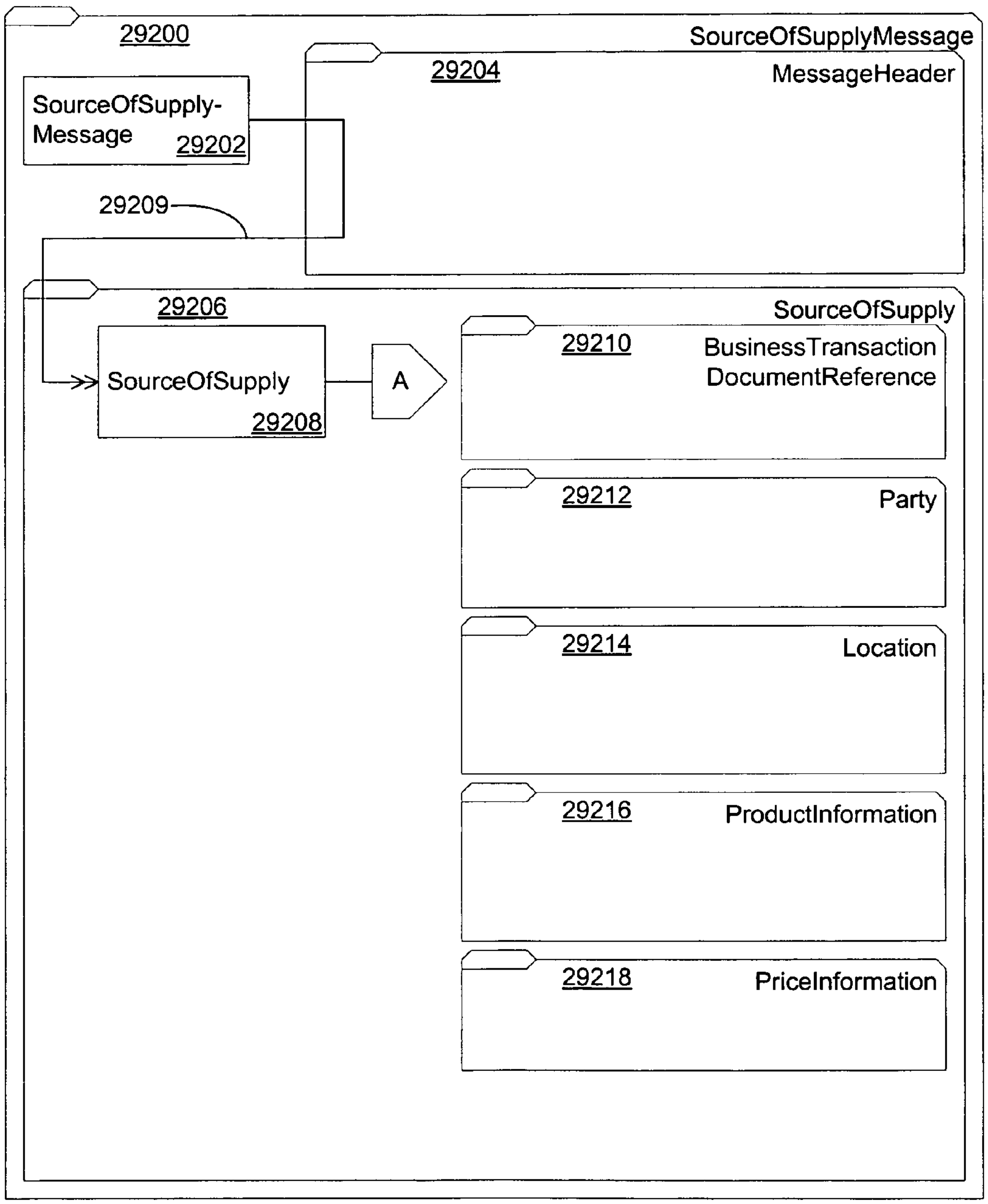
Figure 292B:
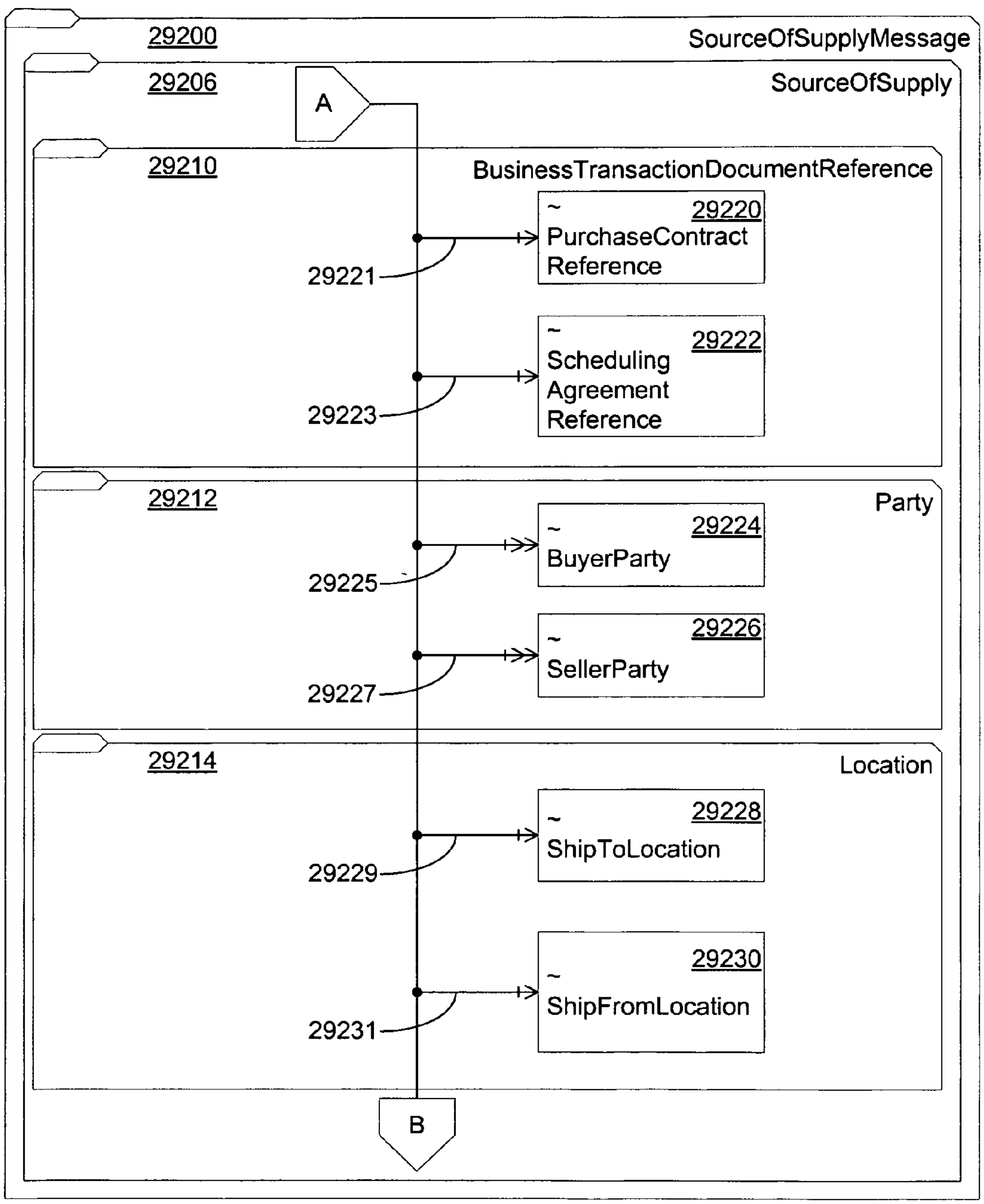
Figure 292C:
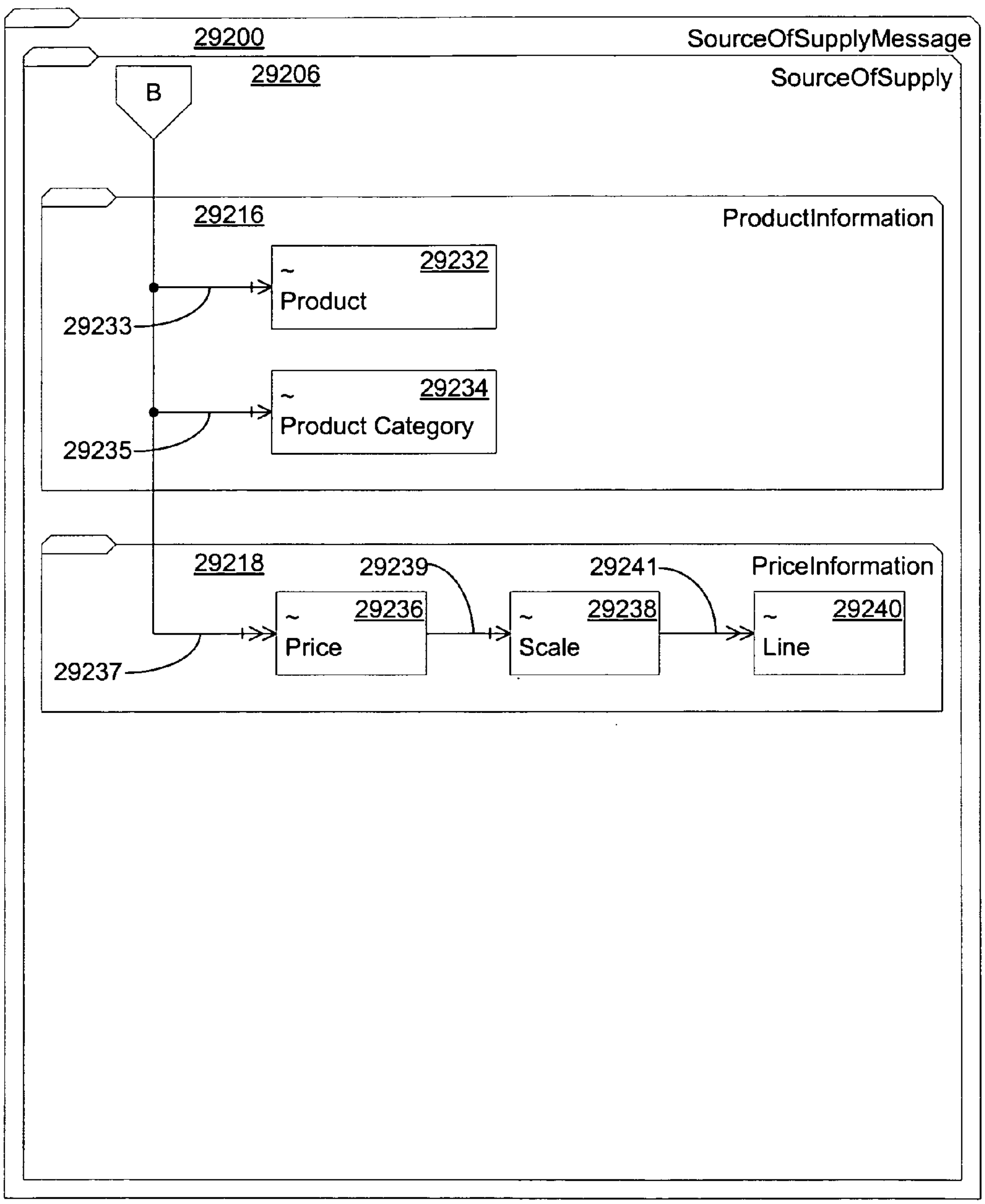
Figure 294:
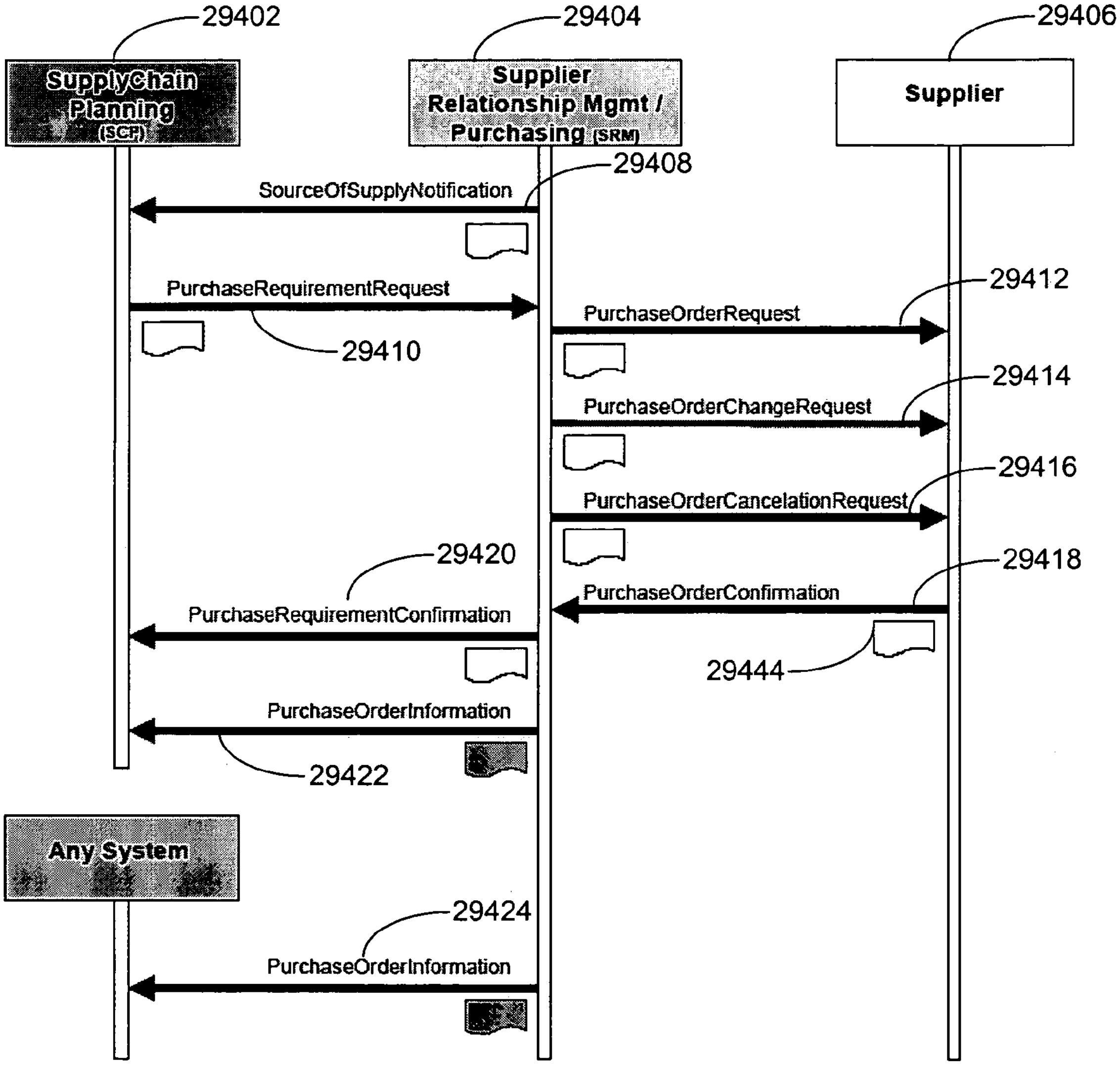
Figure 295A:
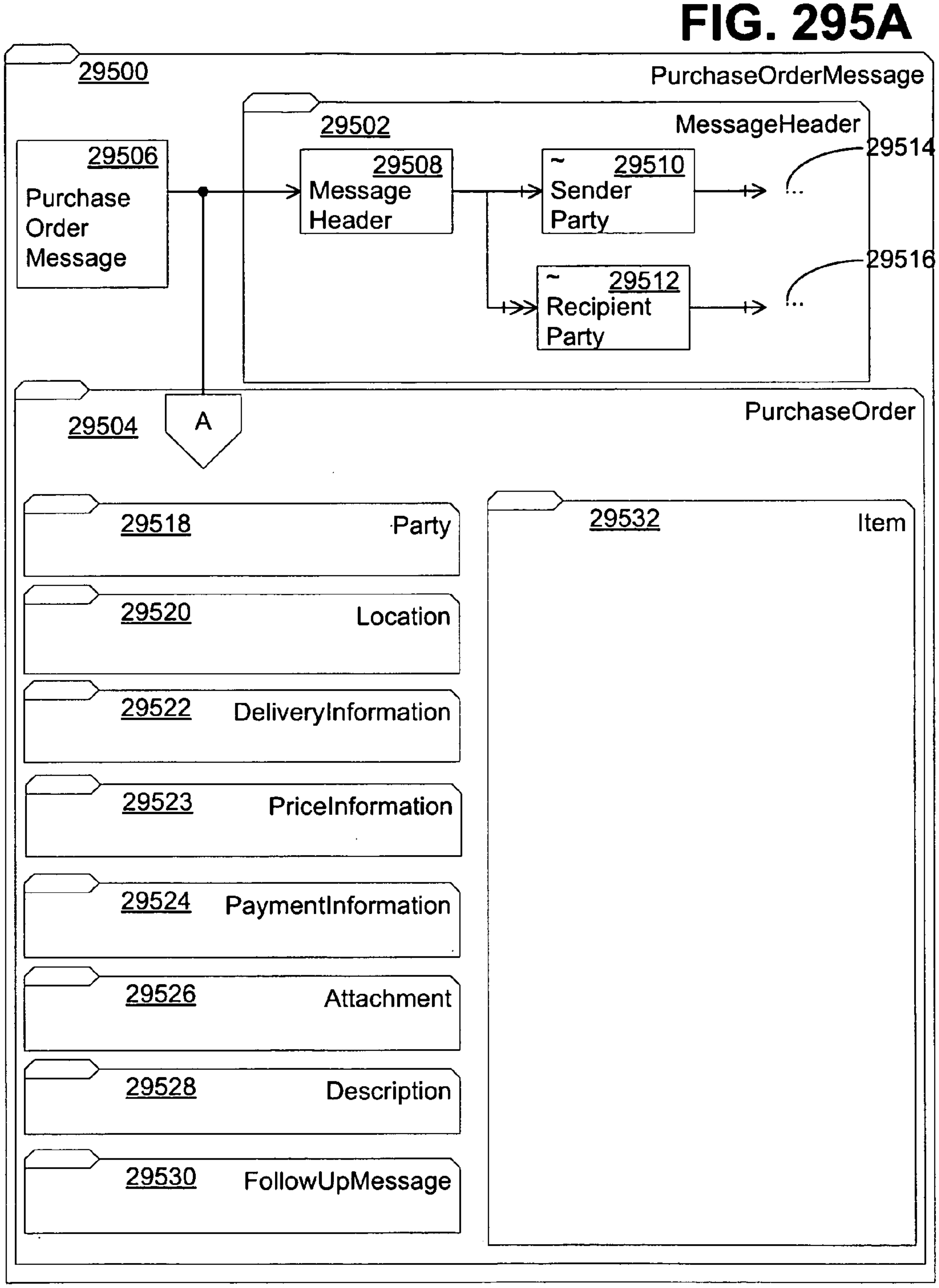
Figure 295B:
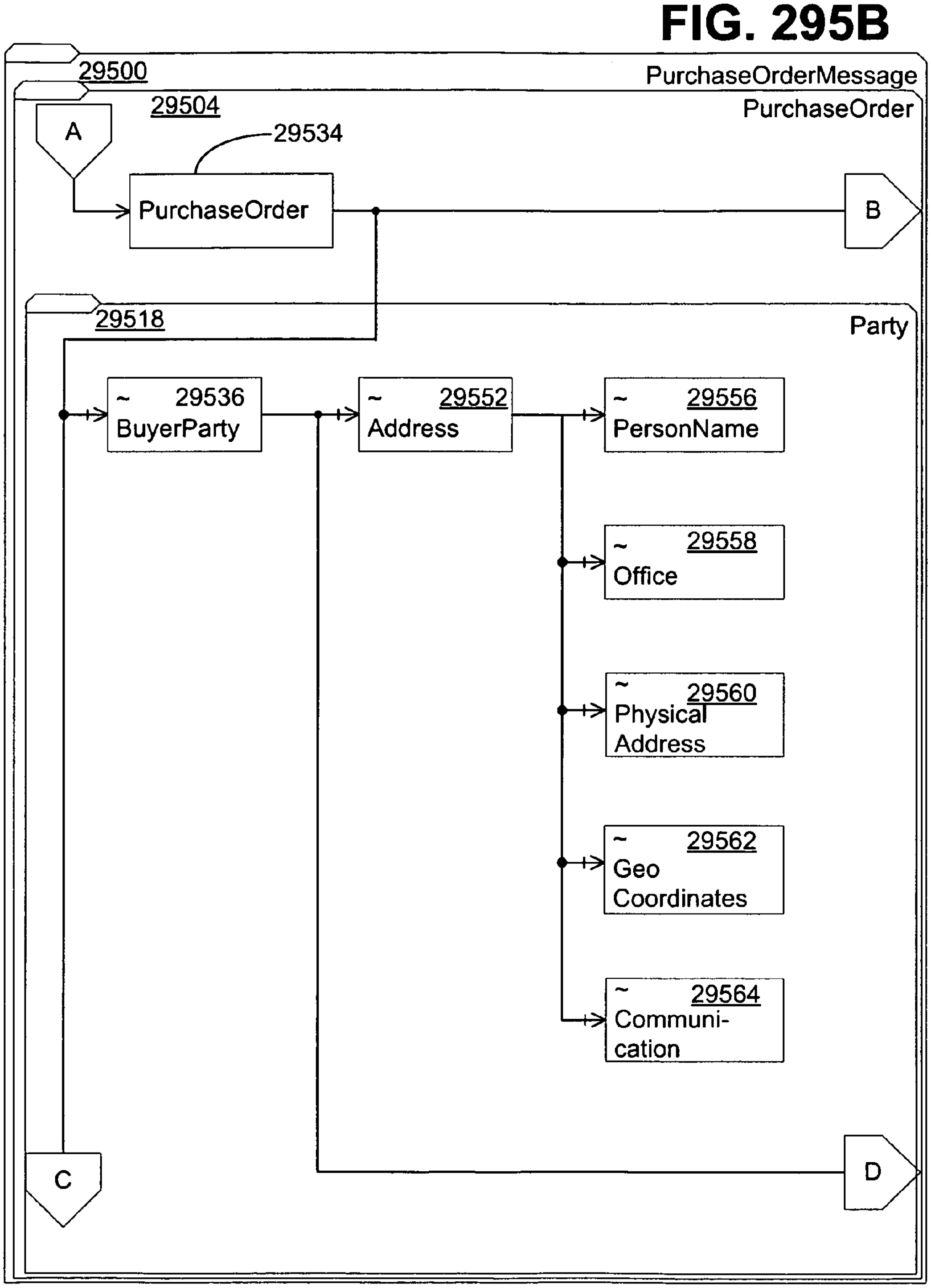
Figure 295C:
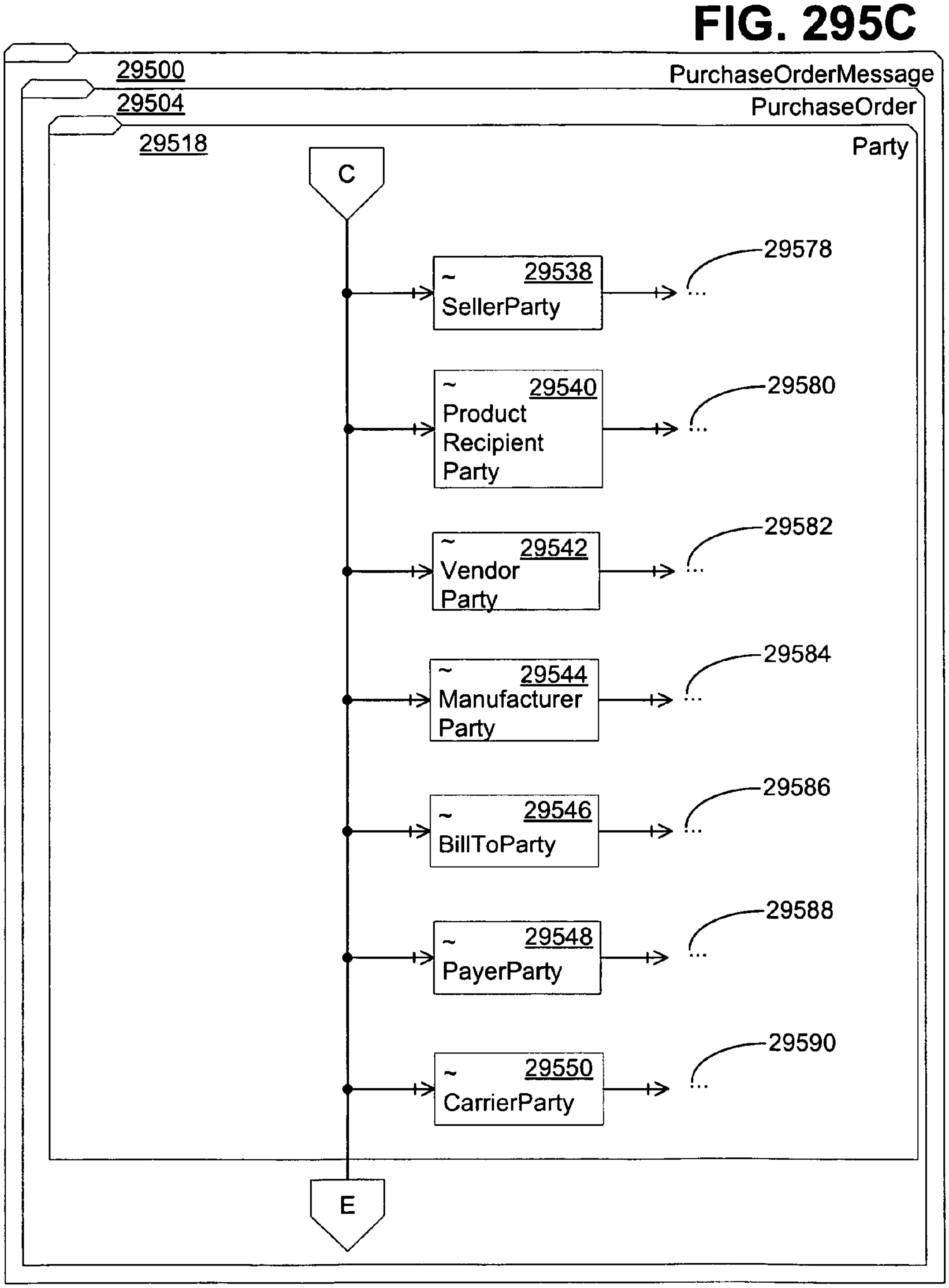
Figure 295D:
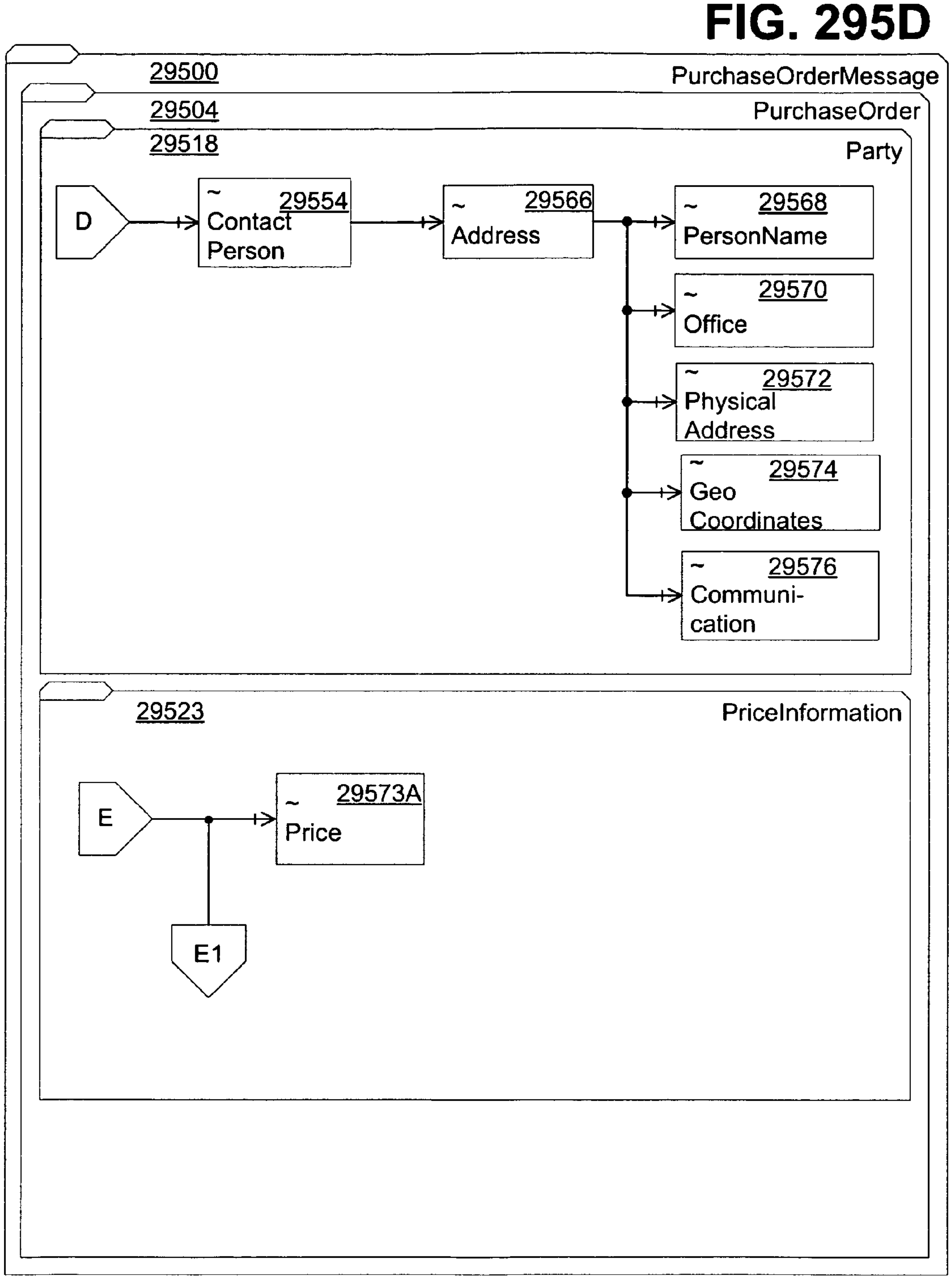
Figure 295E:
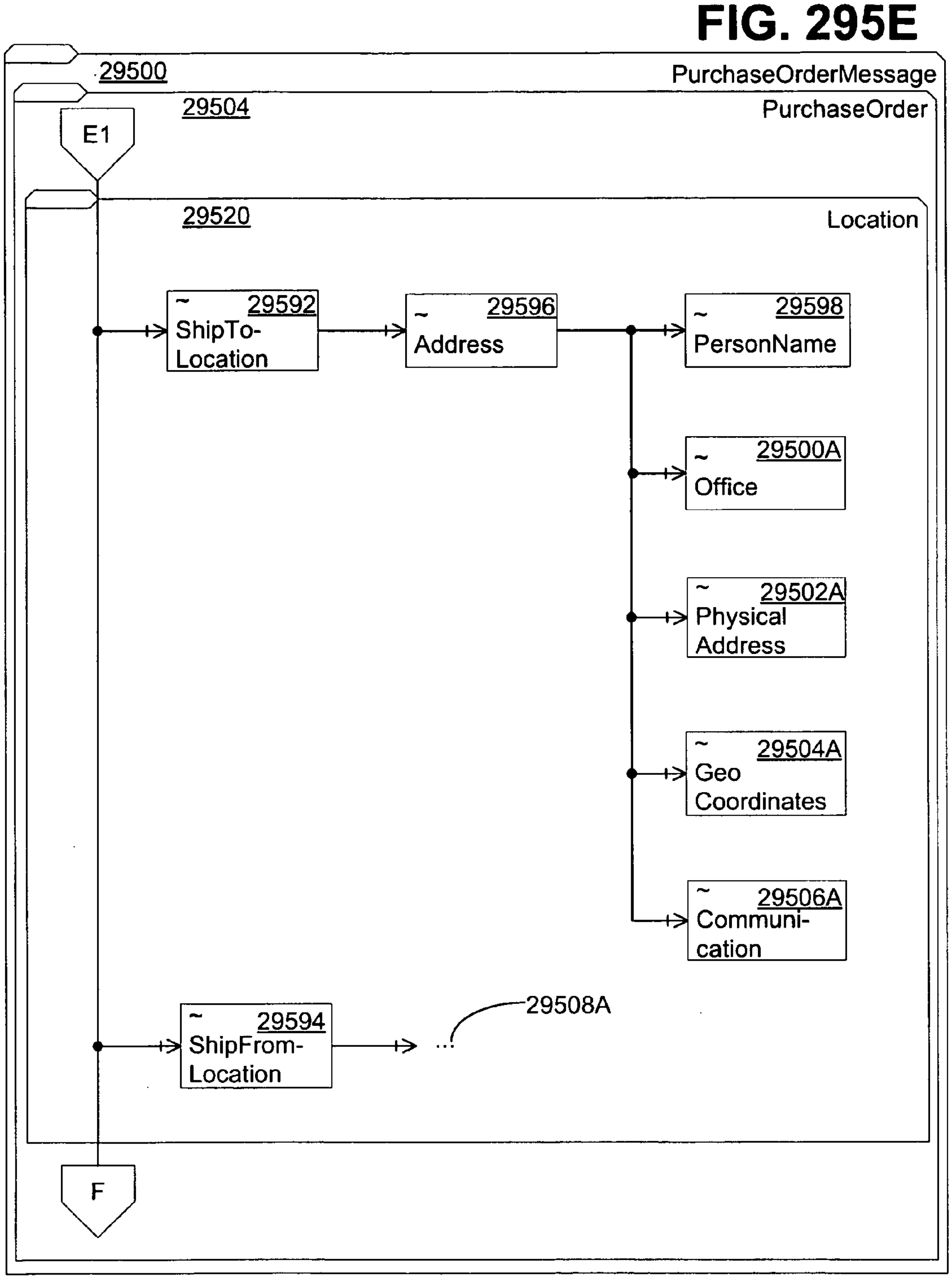
Figure 295F:
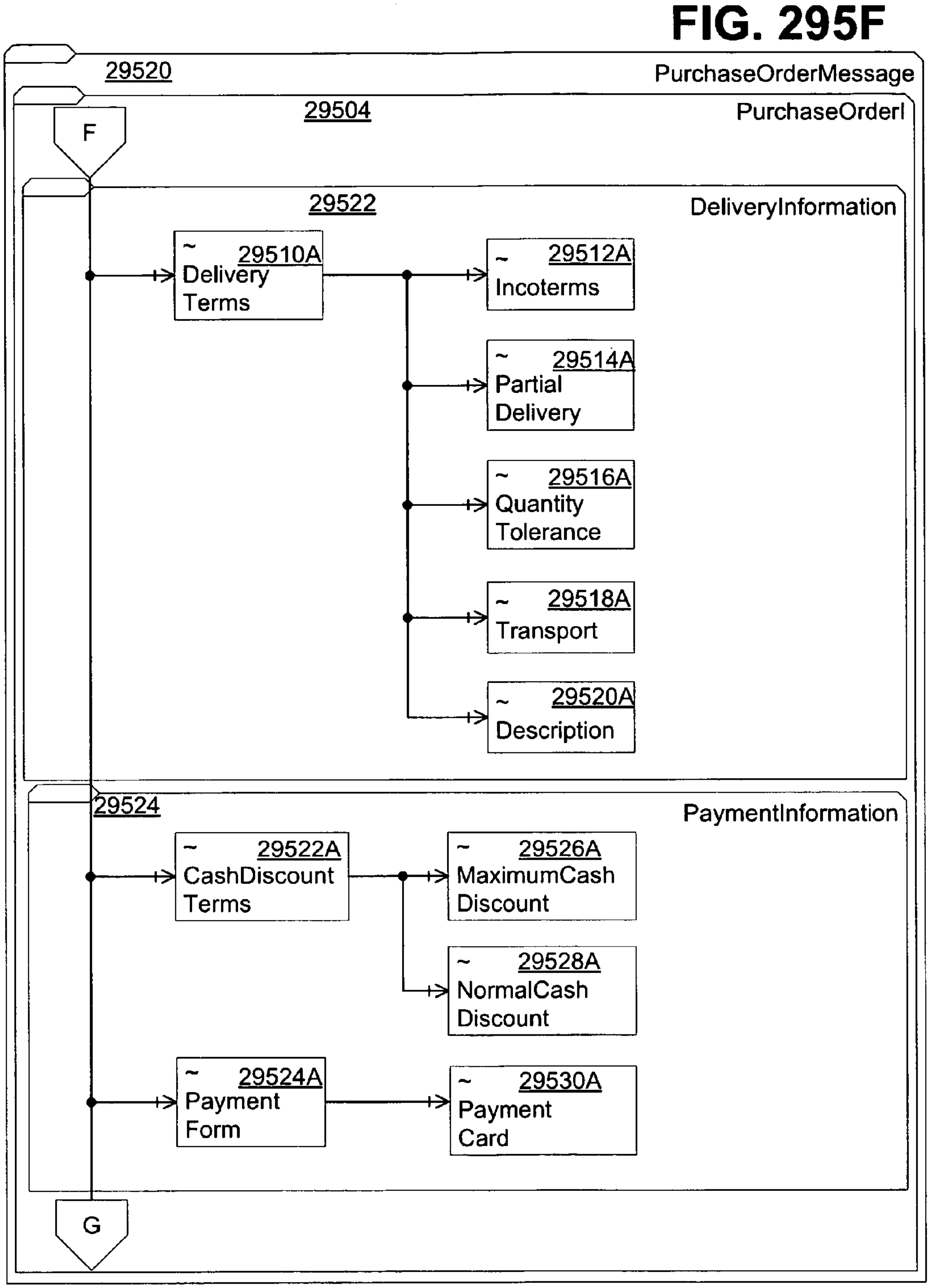
Figure 295G:
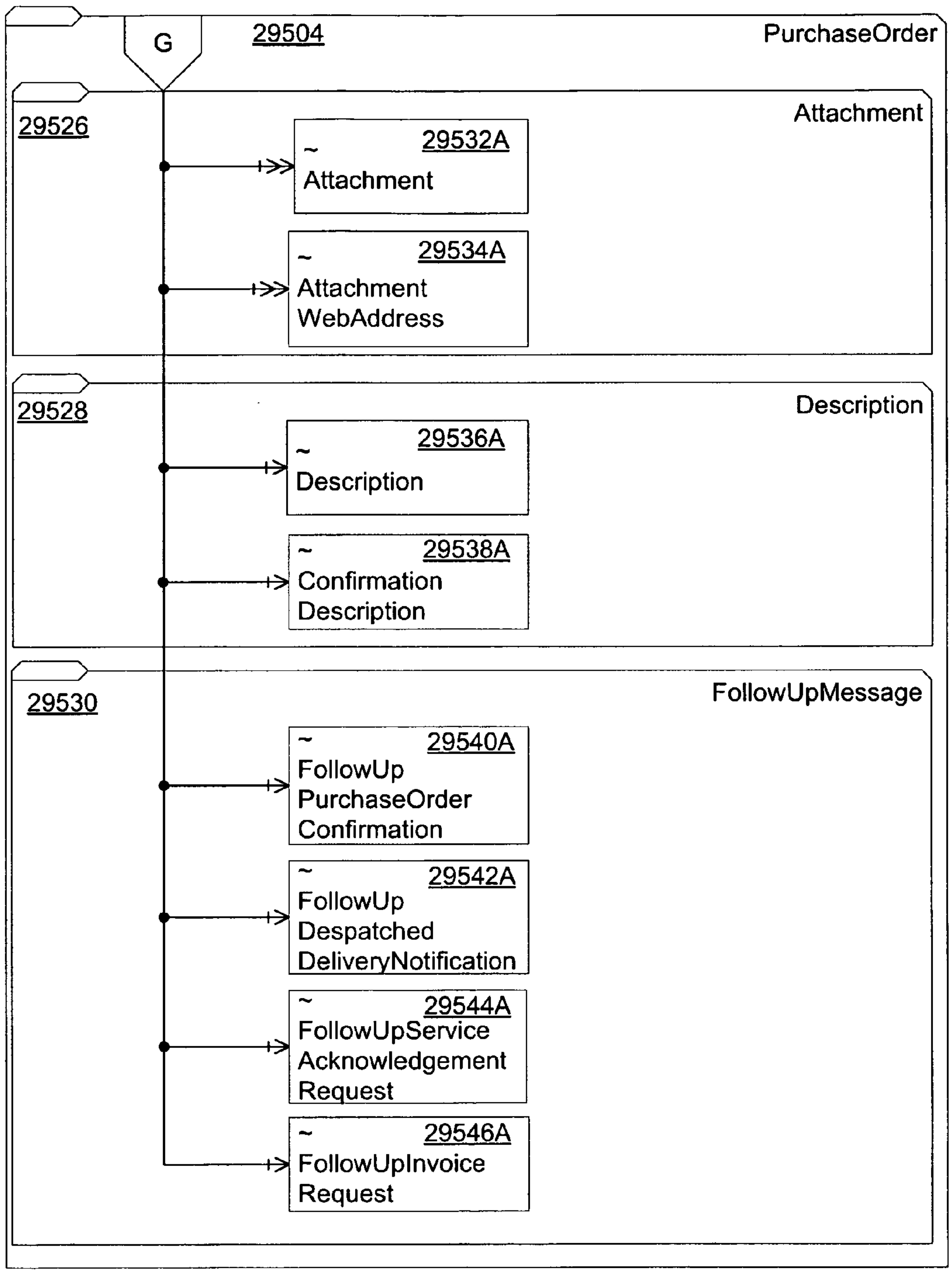
Figure 295H:
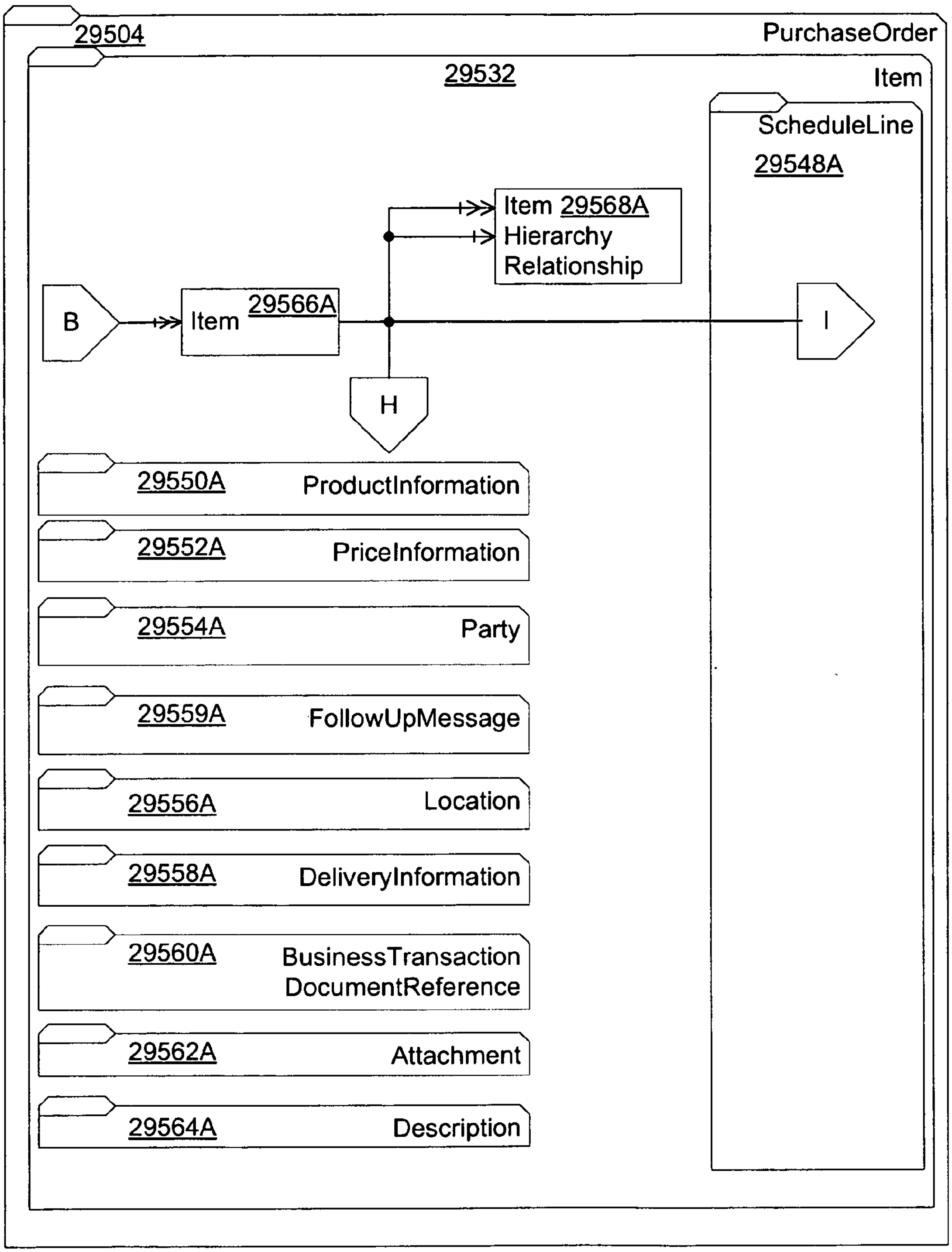
Figure 295I:
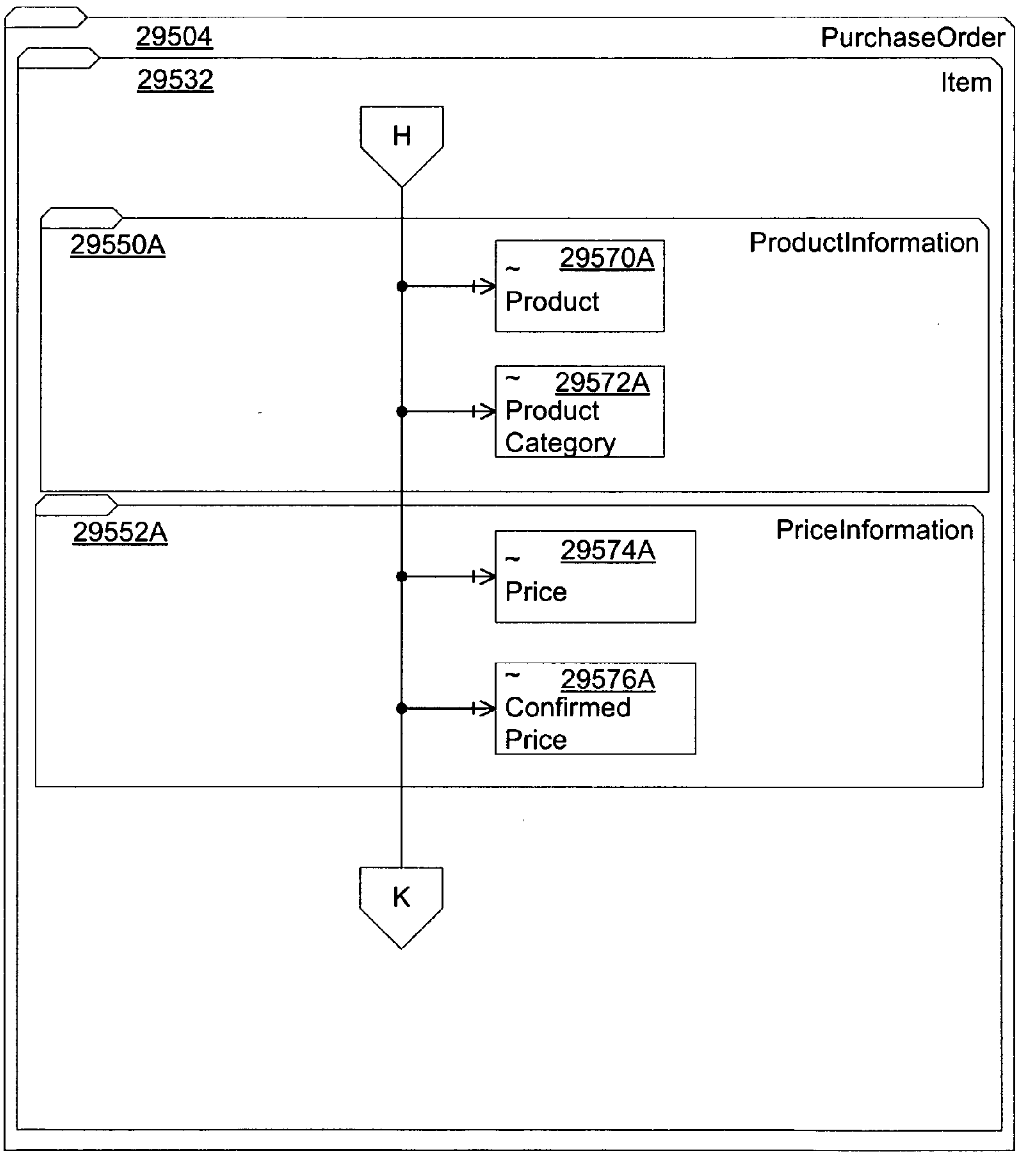
Figure 295J:
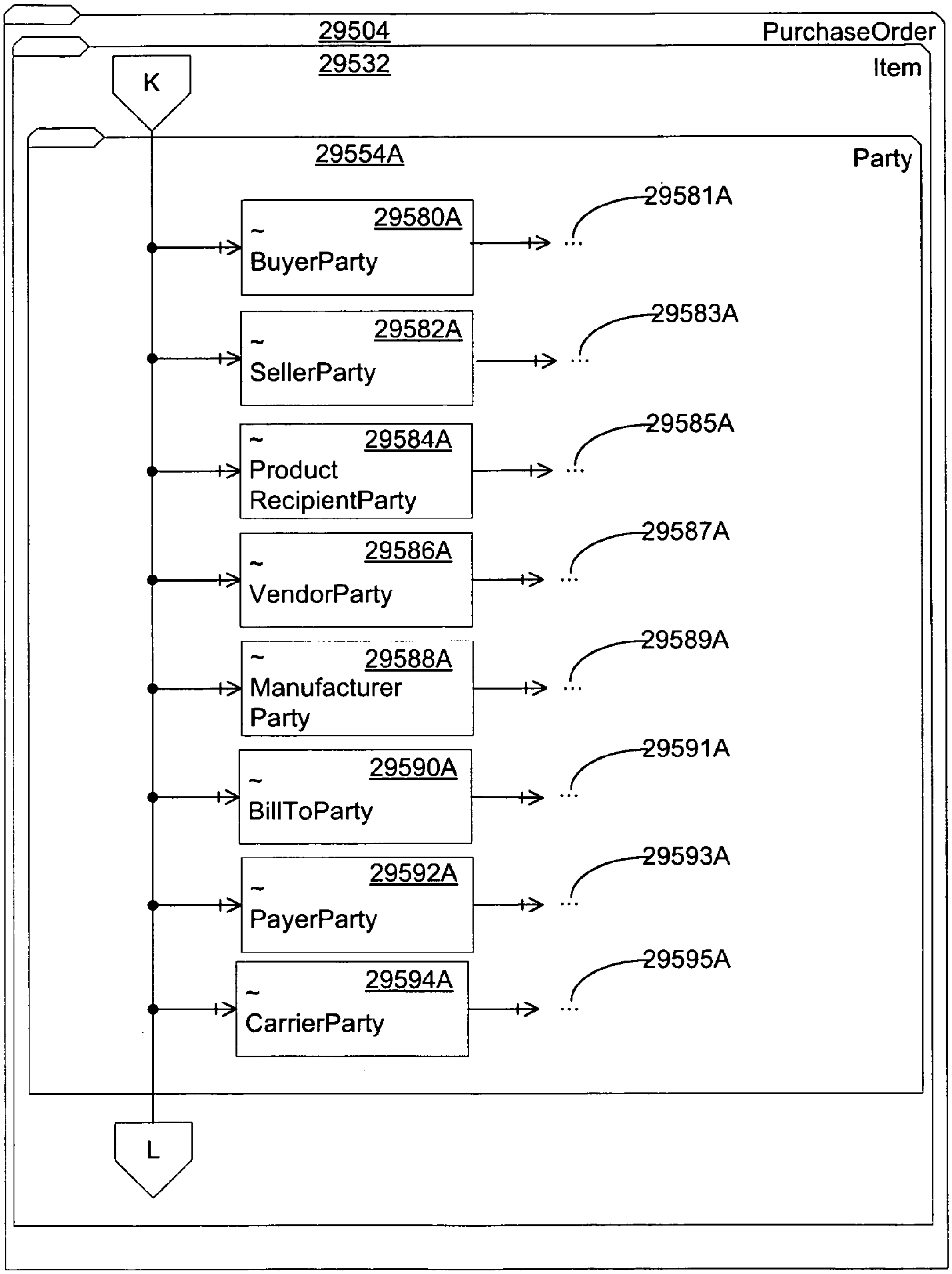
Figure 295K:
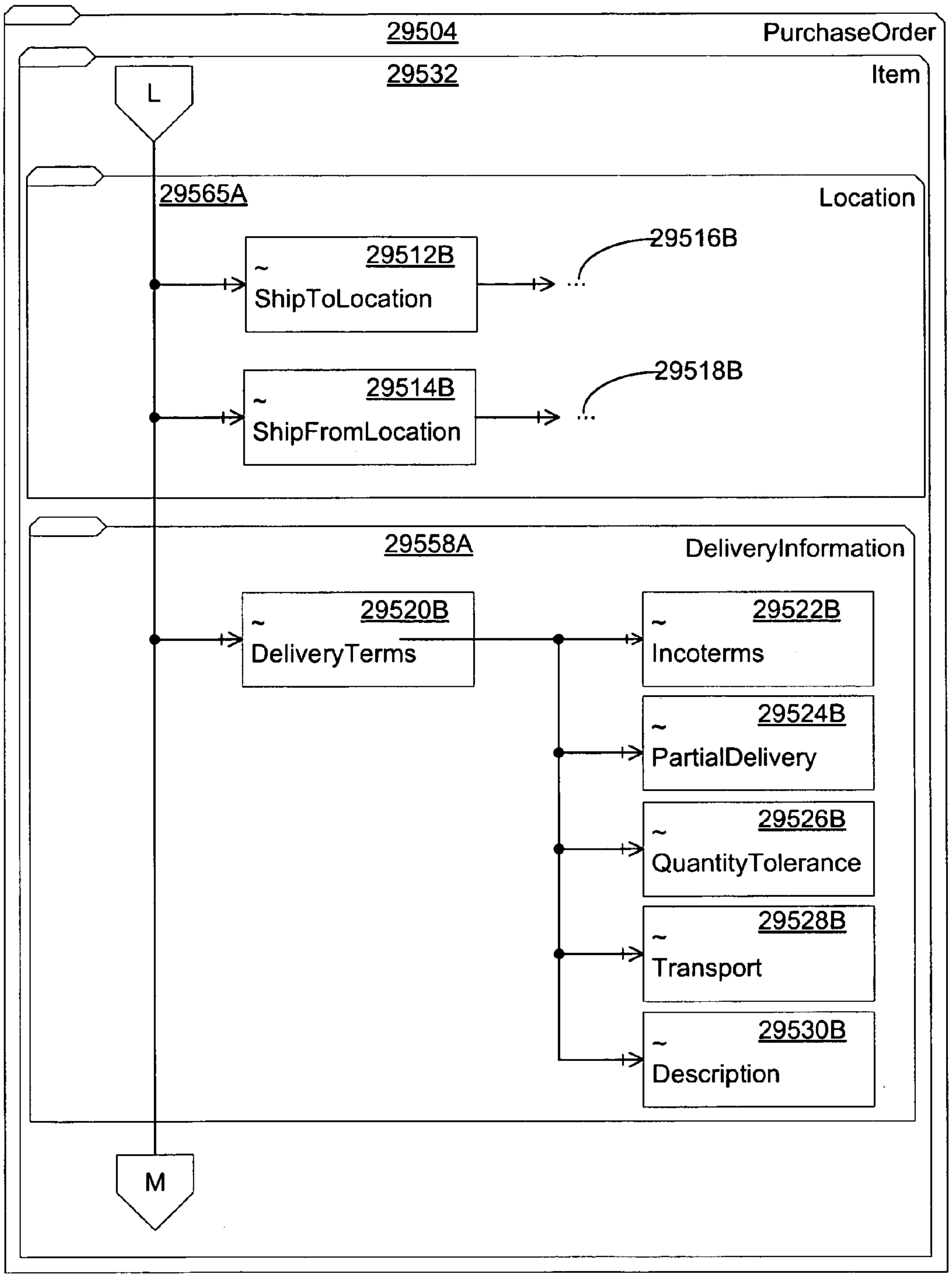
Figure 295L:
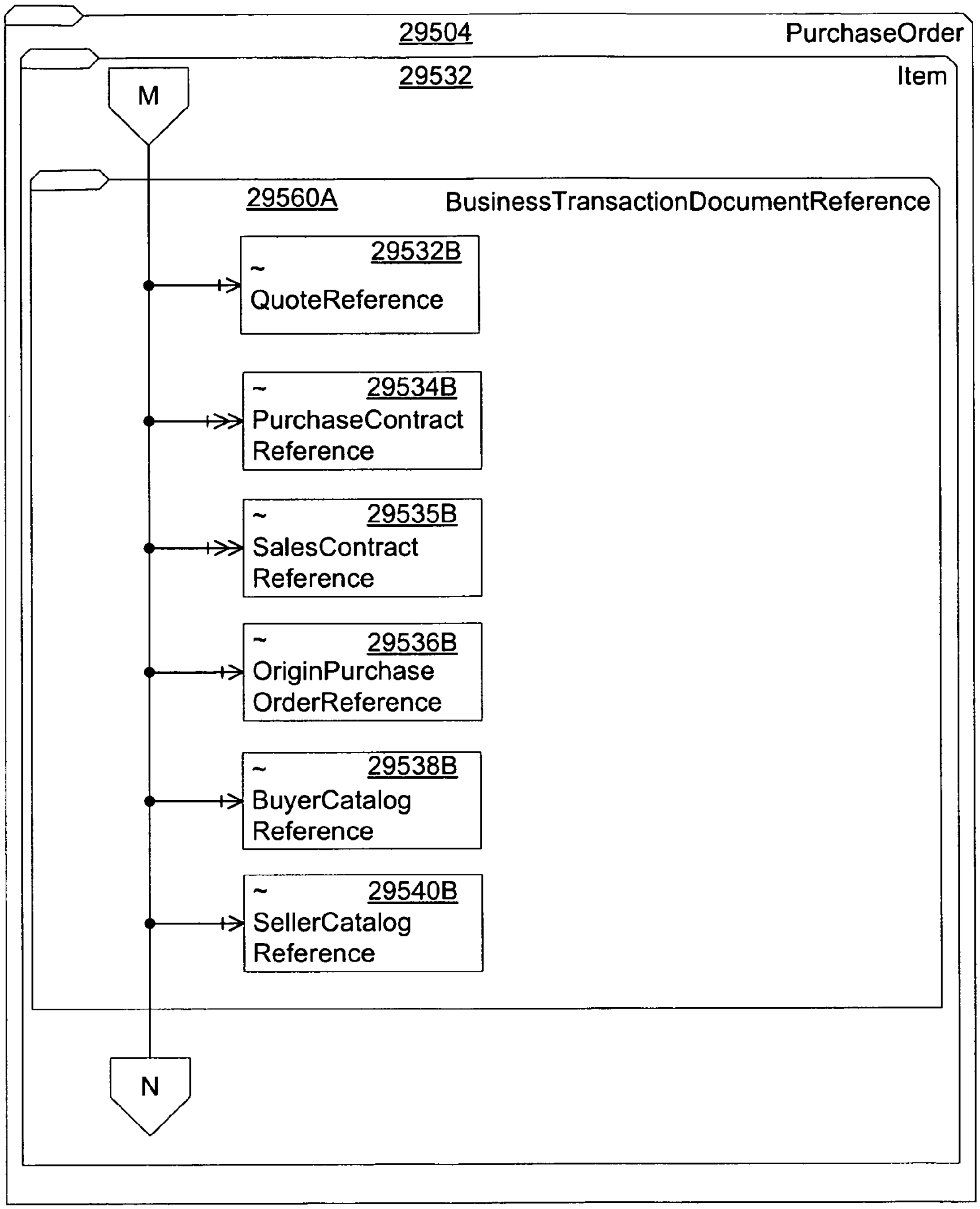
Figure 295M:
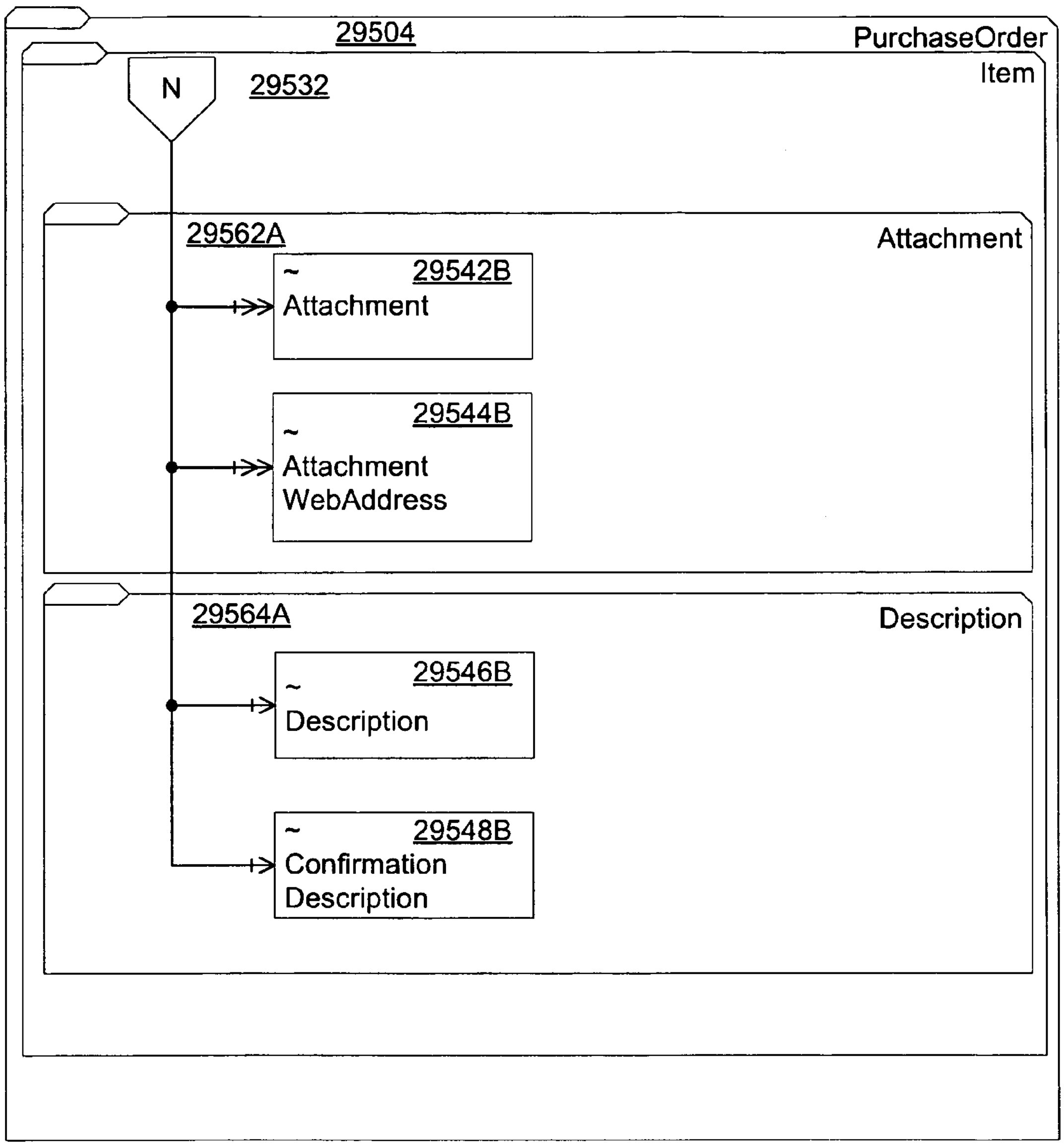
Figure 295N:
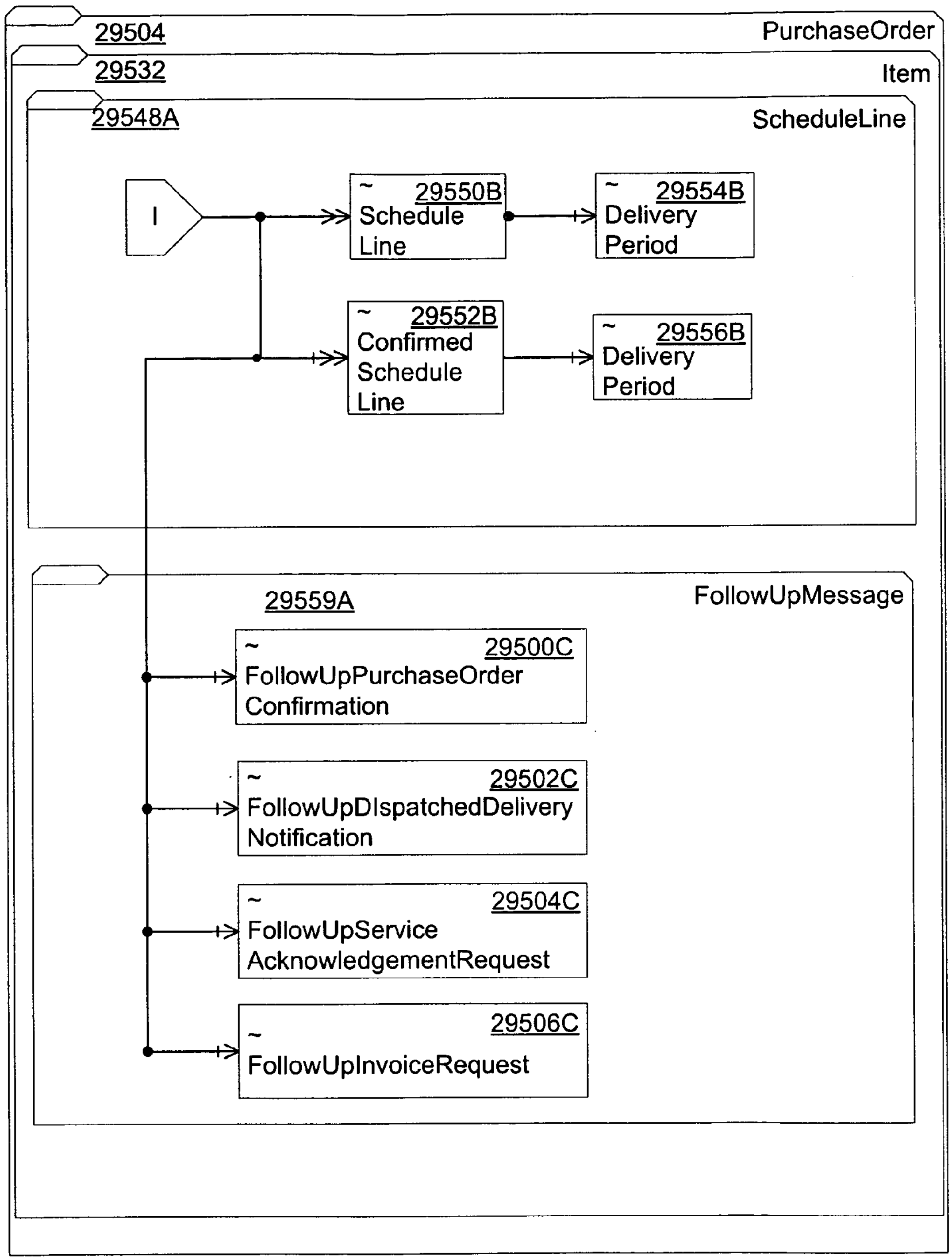
Figure 295O:
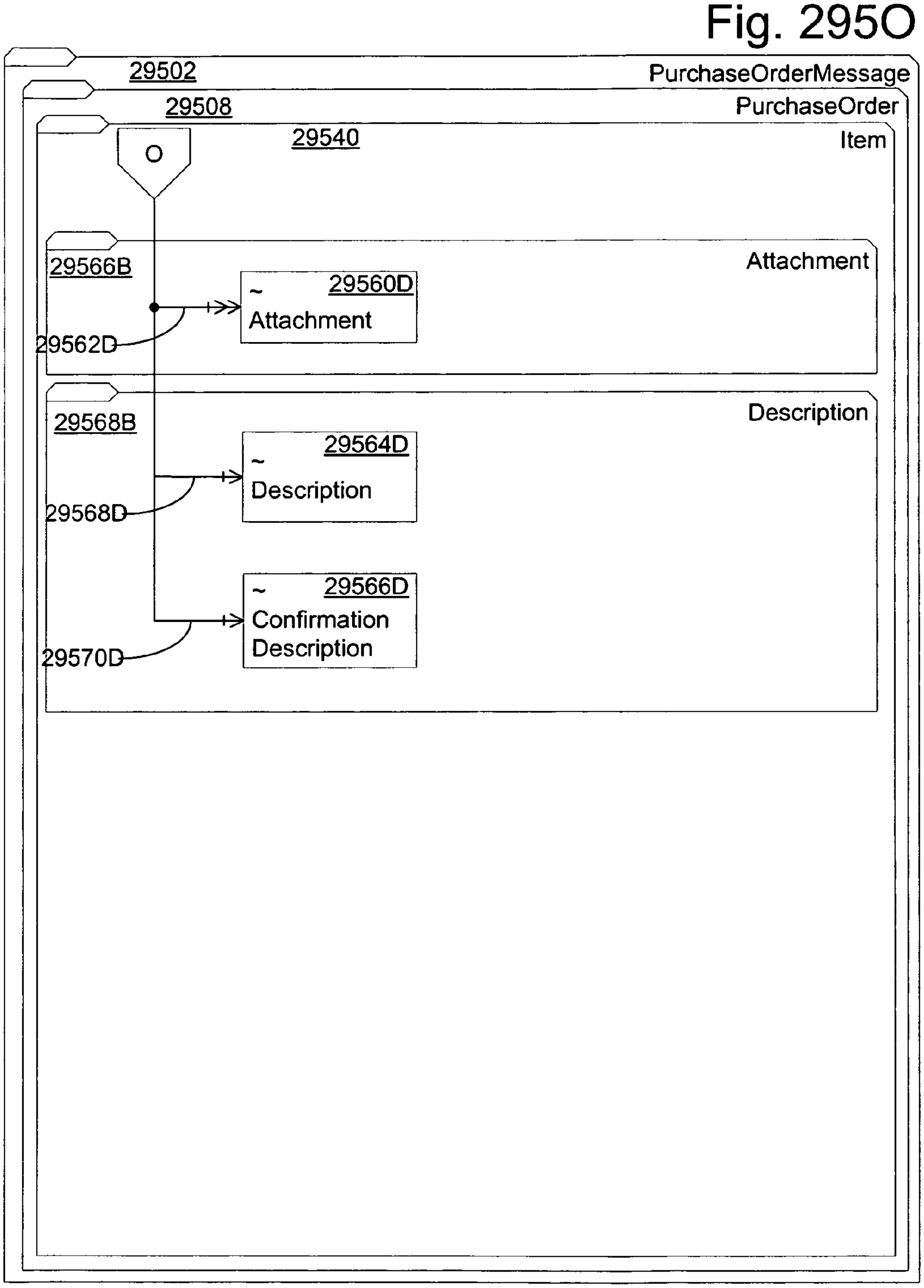
Figure 295P:
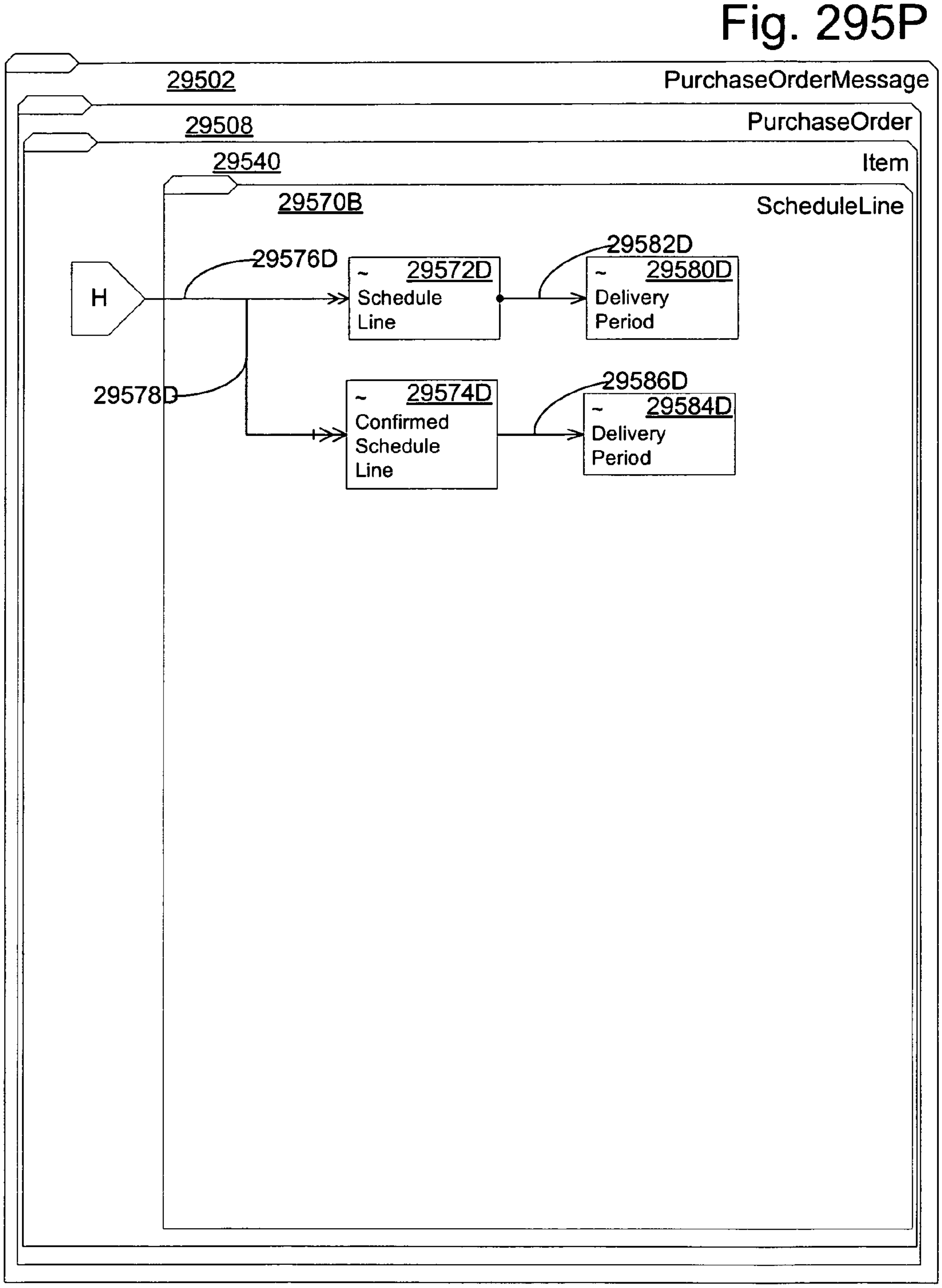
Figure 296:
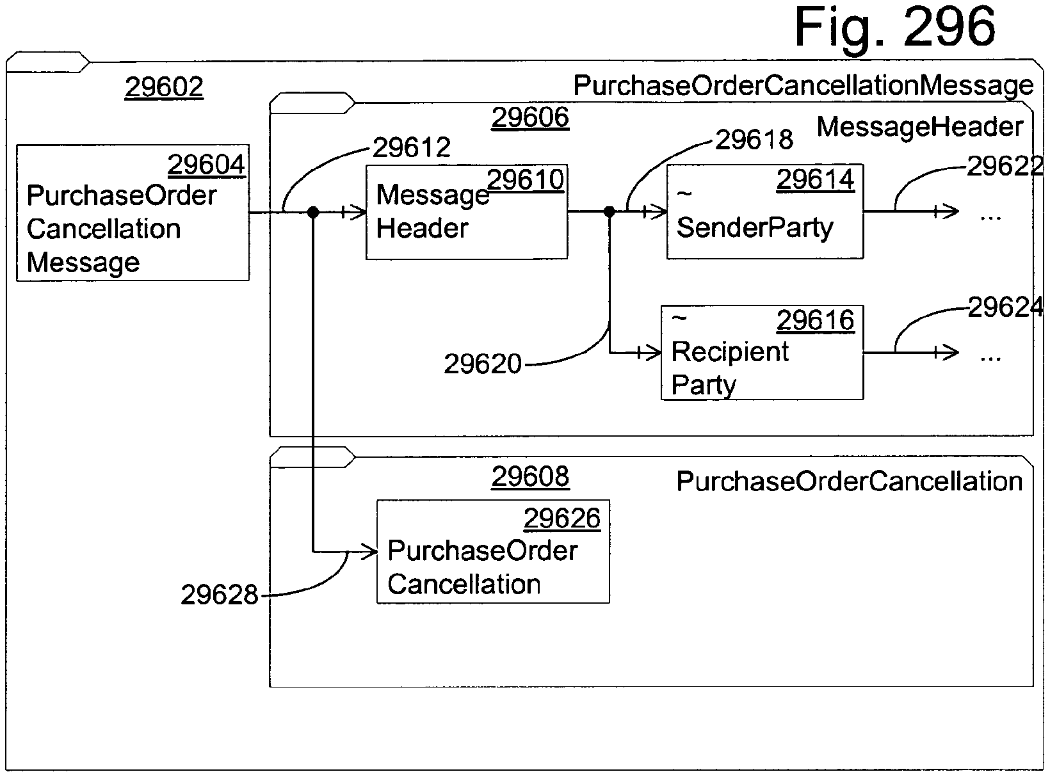
Figure 297Y:
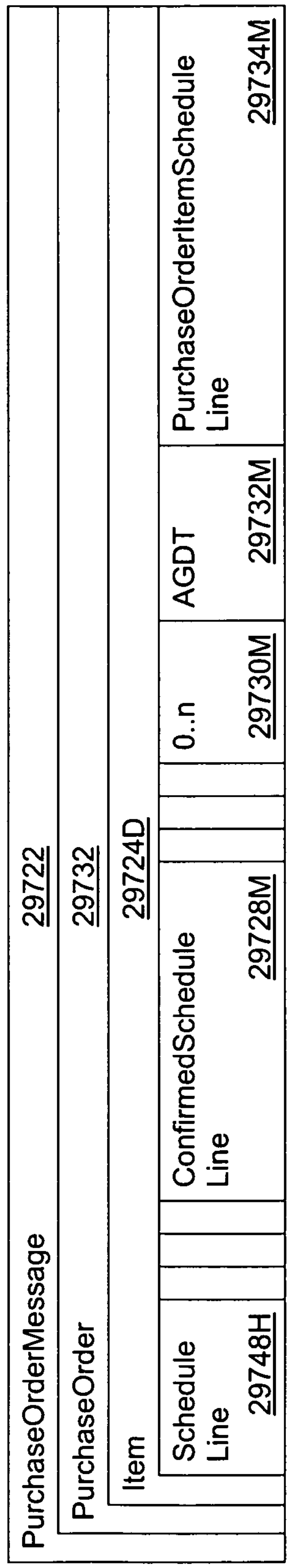
Figure 298:
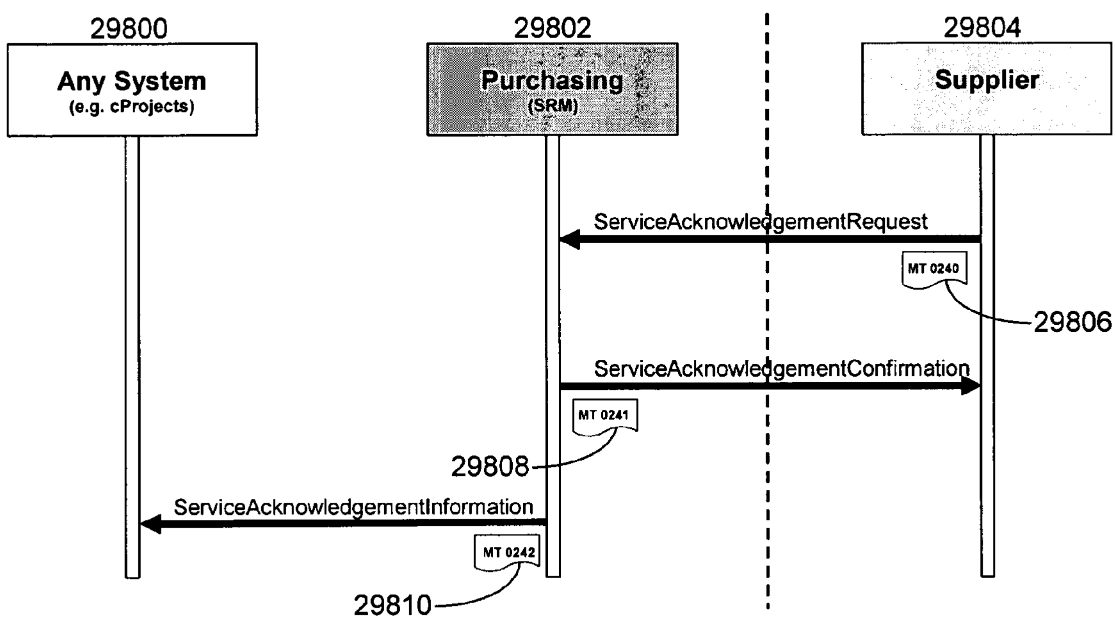
Figure 299A:
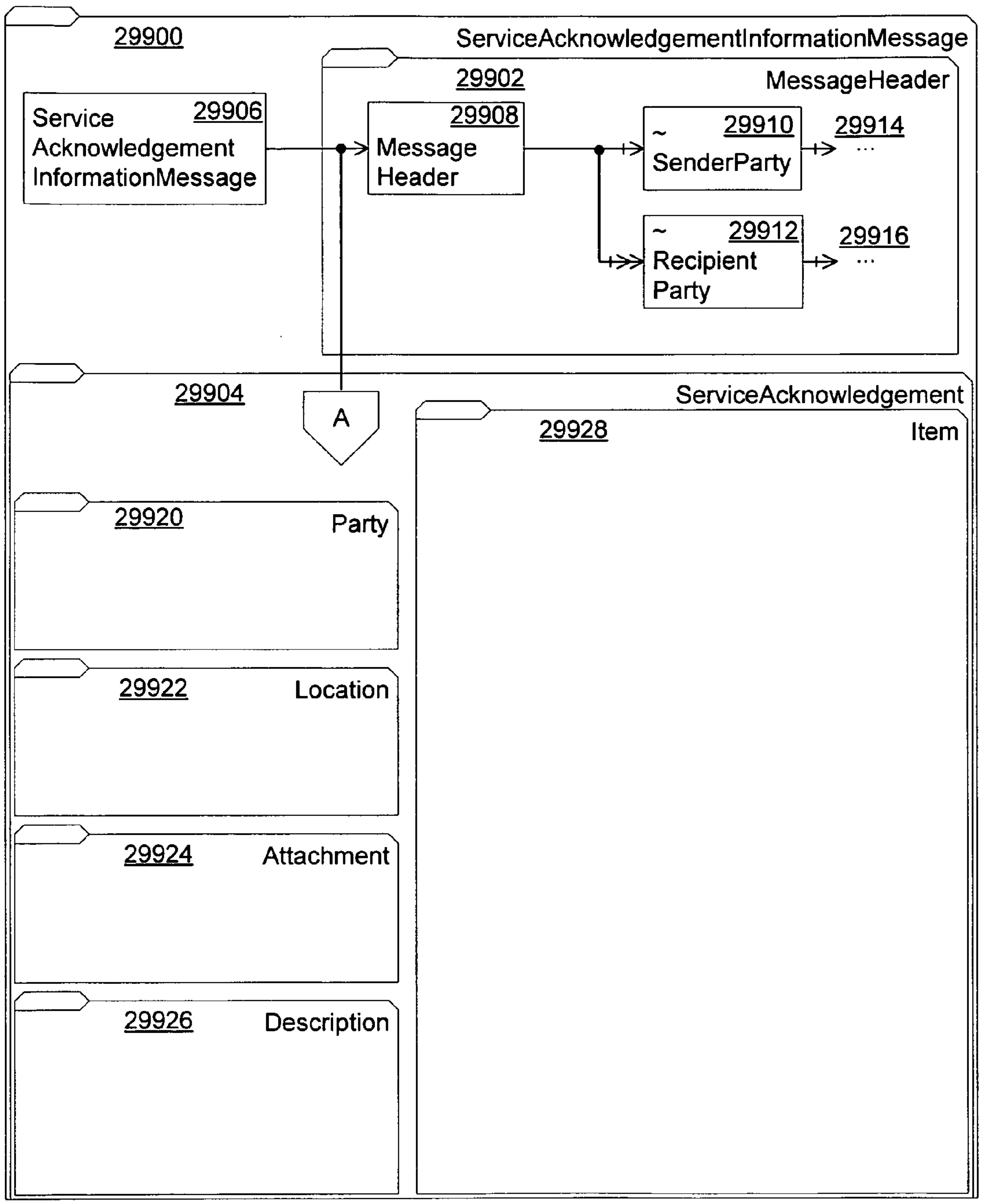
Figure 299B:
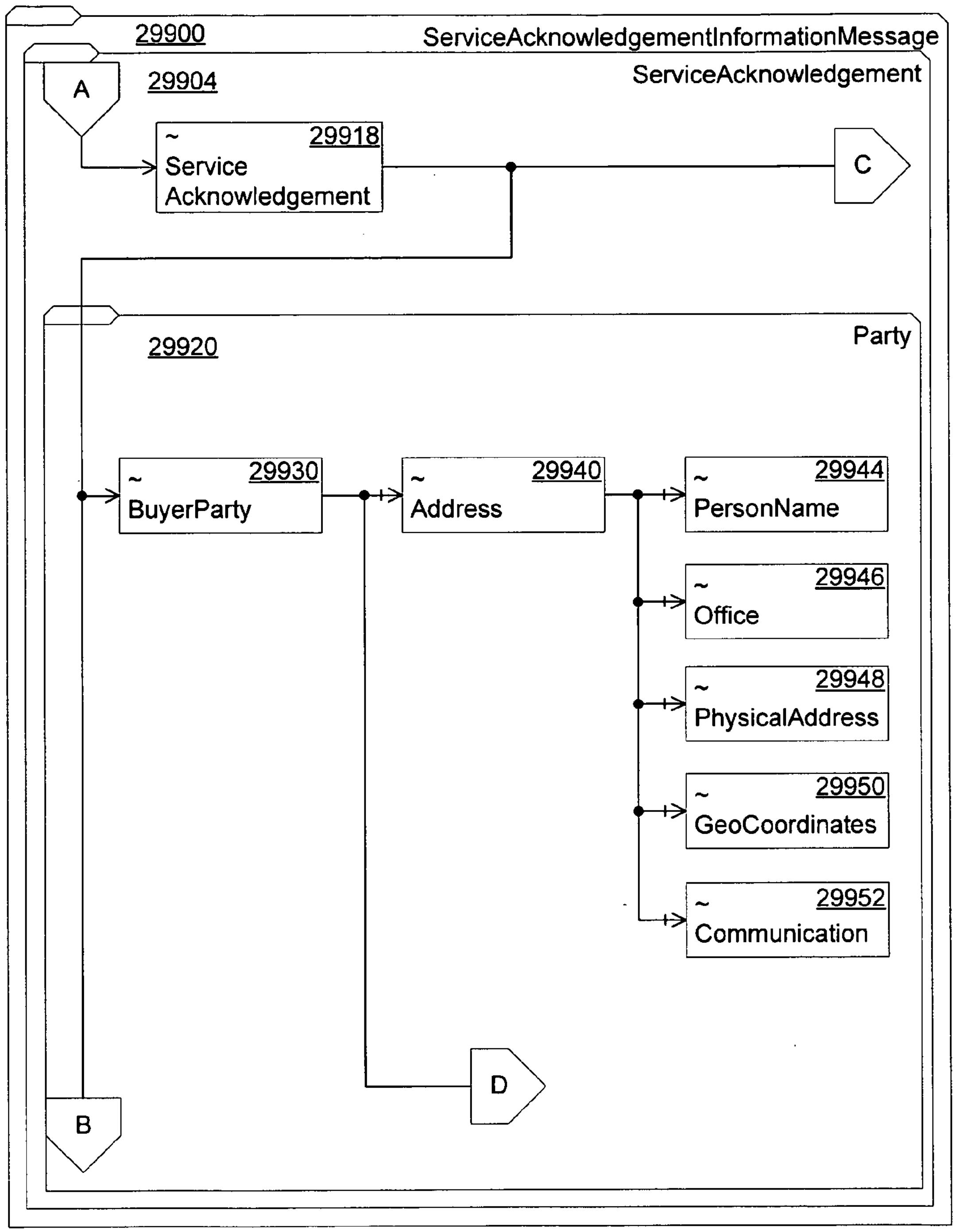
Figure 299C:
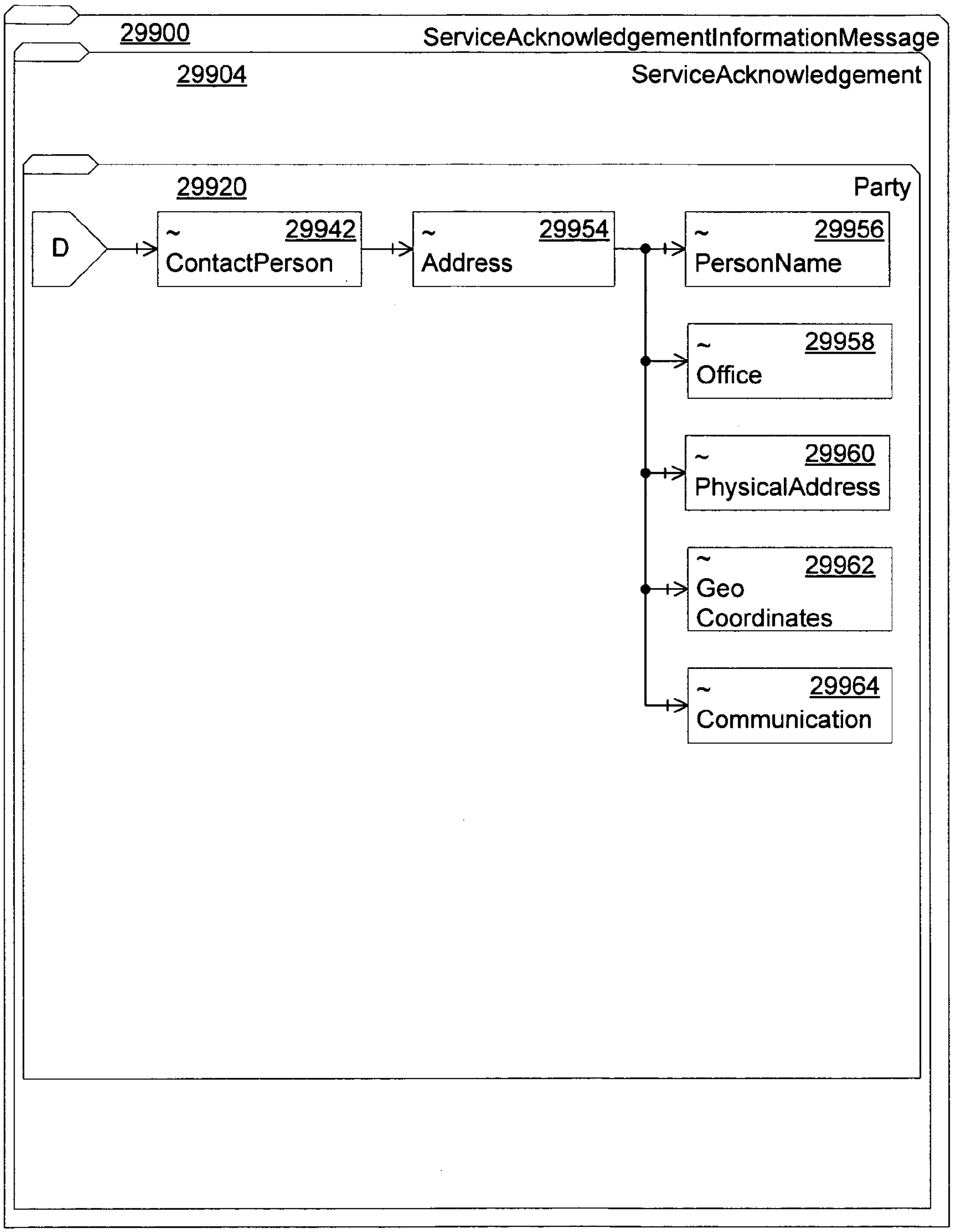
Figure 299D:
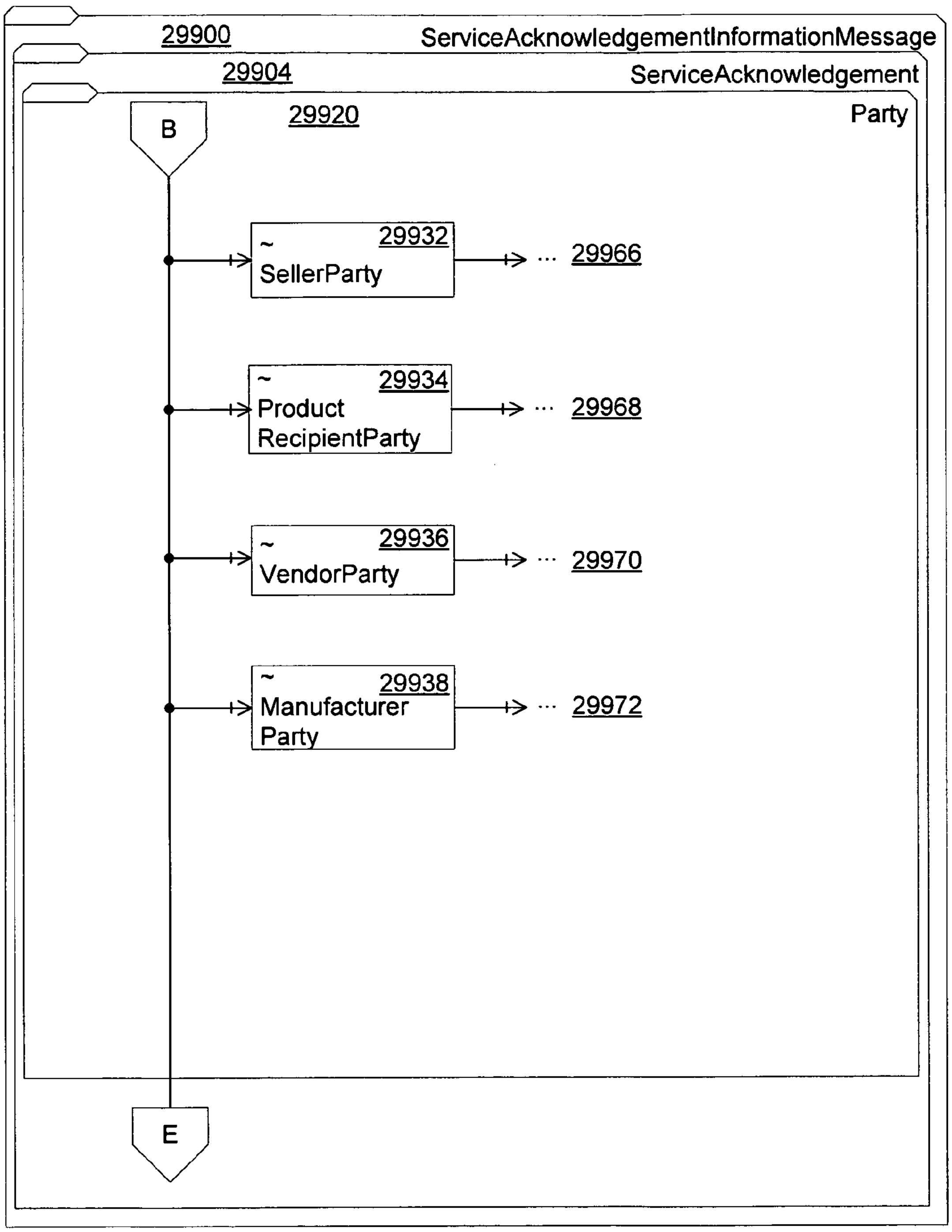
Figure 299E:
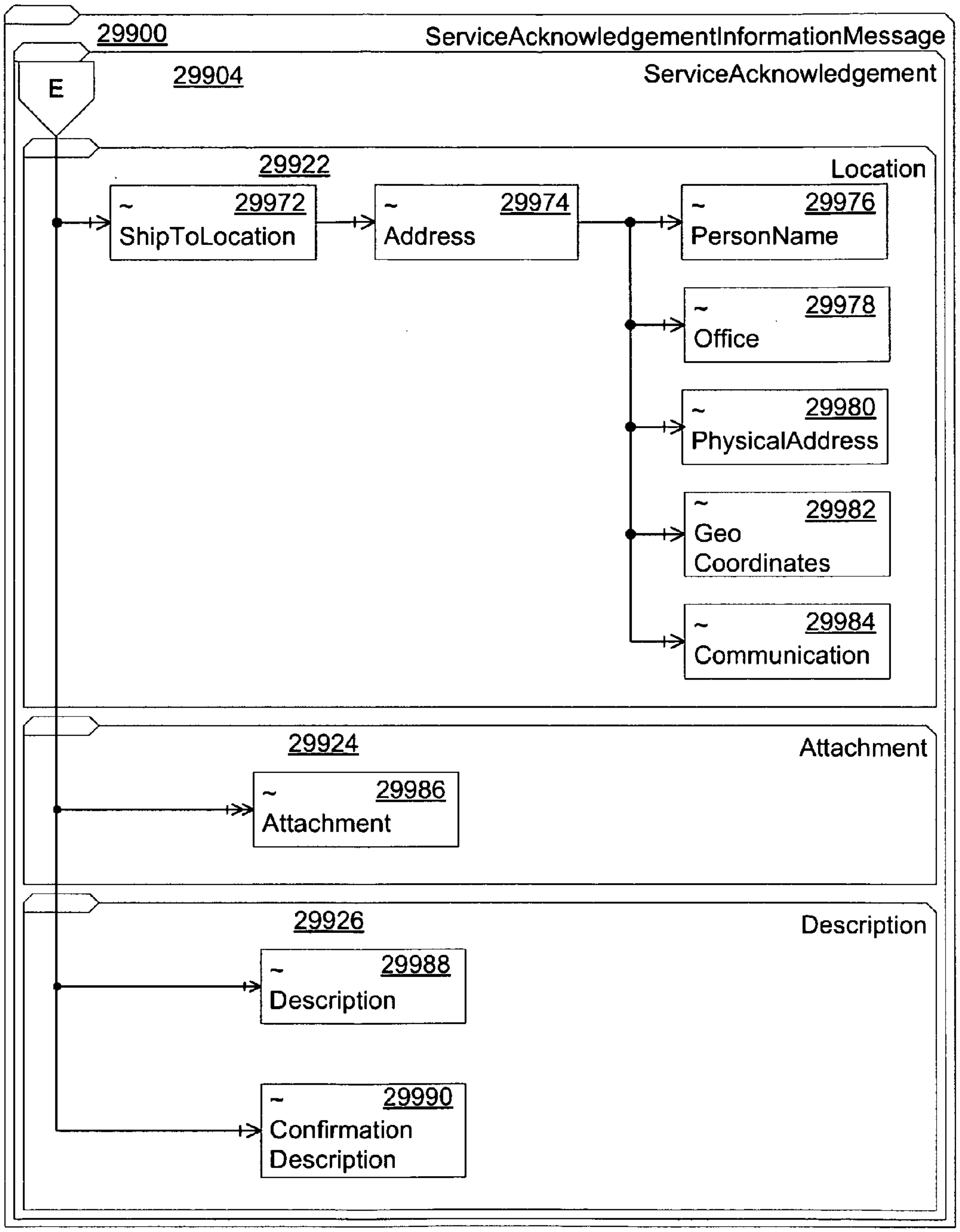
Figure 299F:
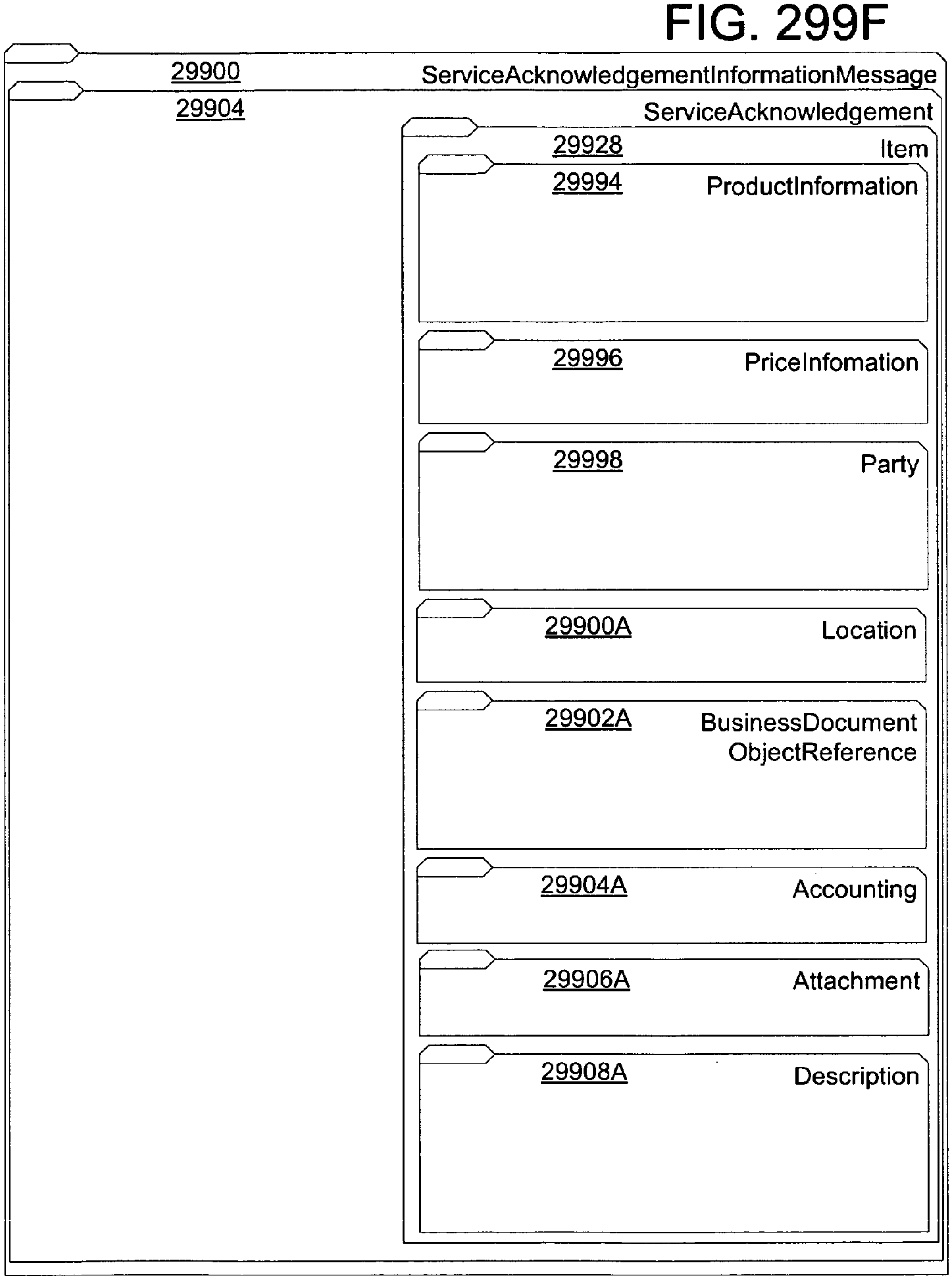
Figure 299G:
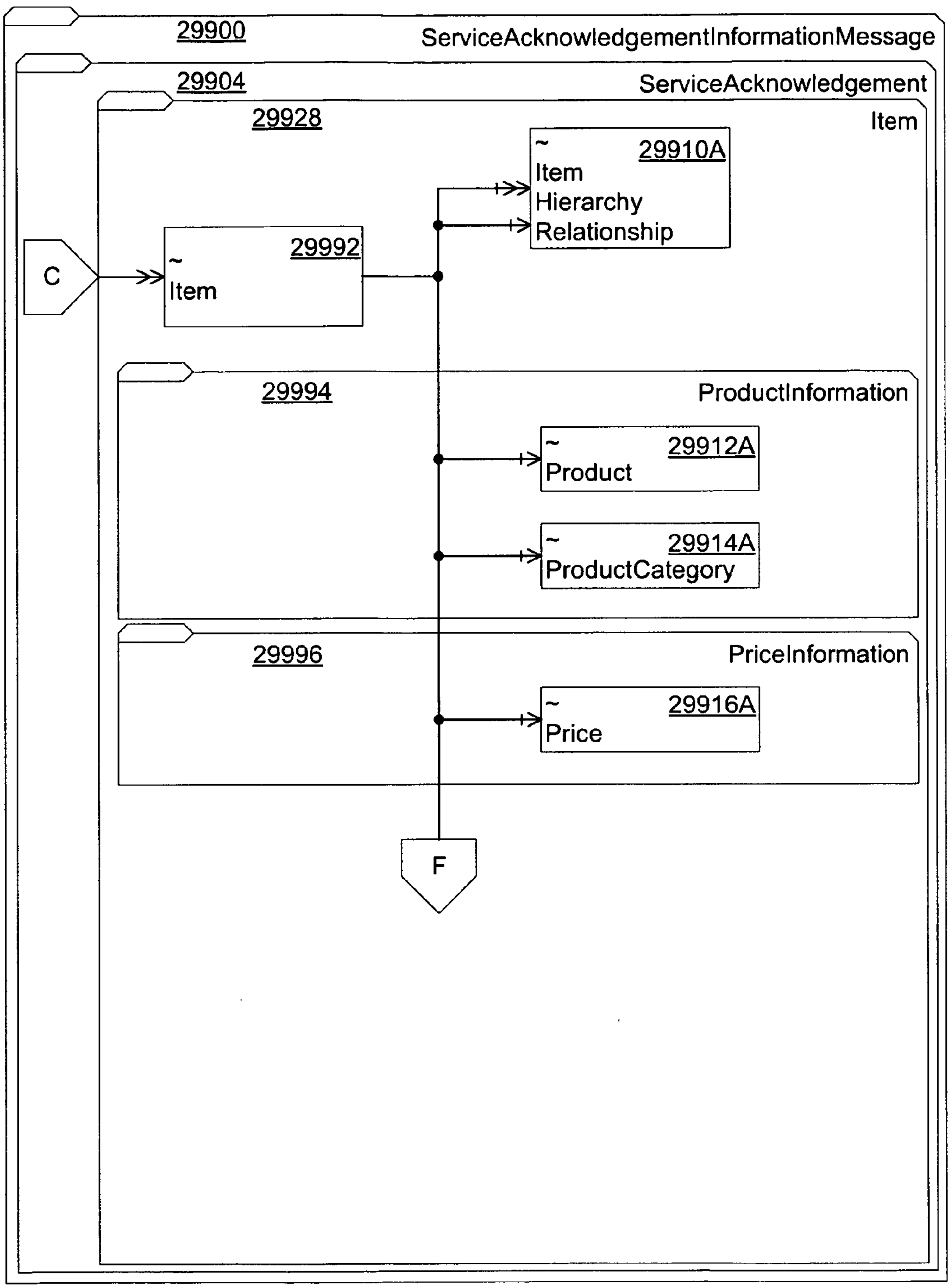
Figure 299H:
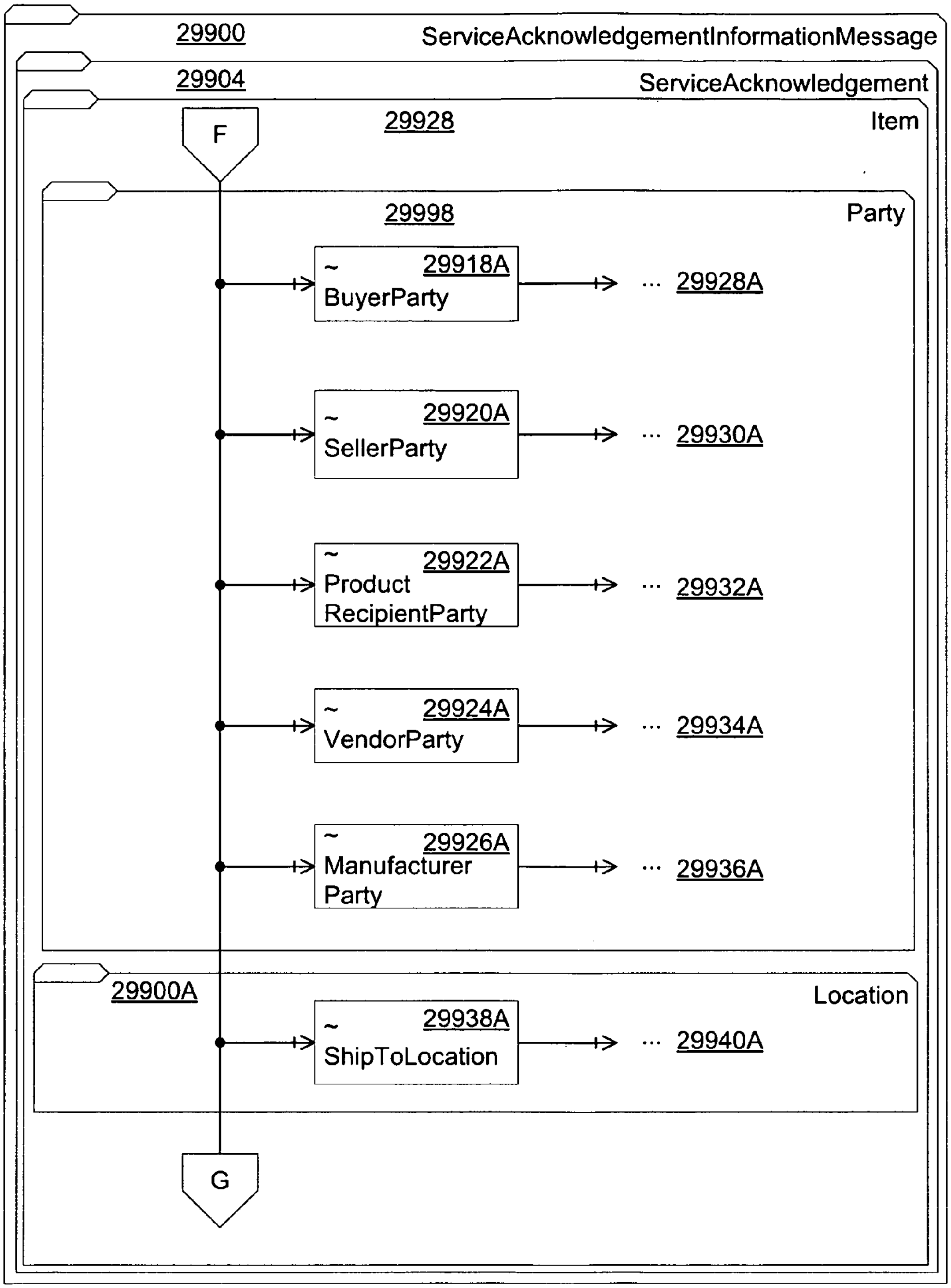
Figure 299I:
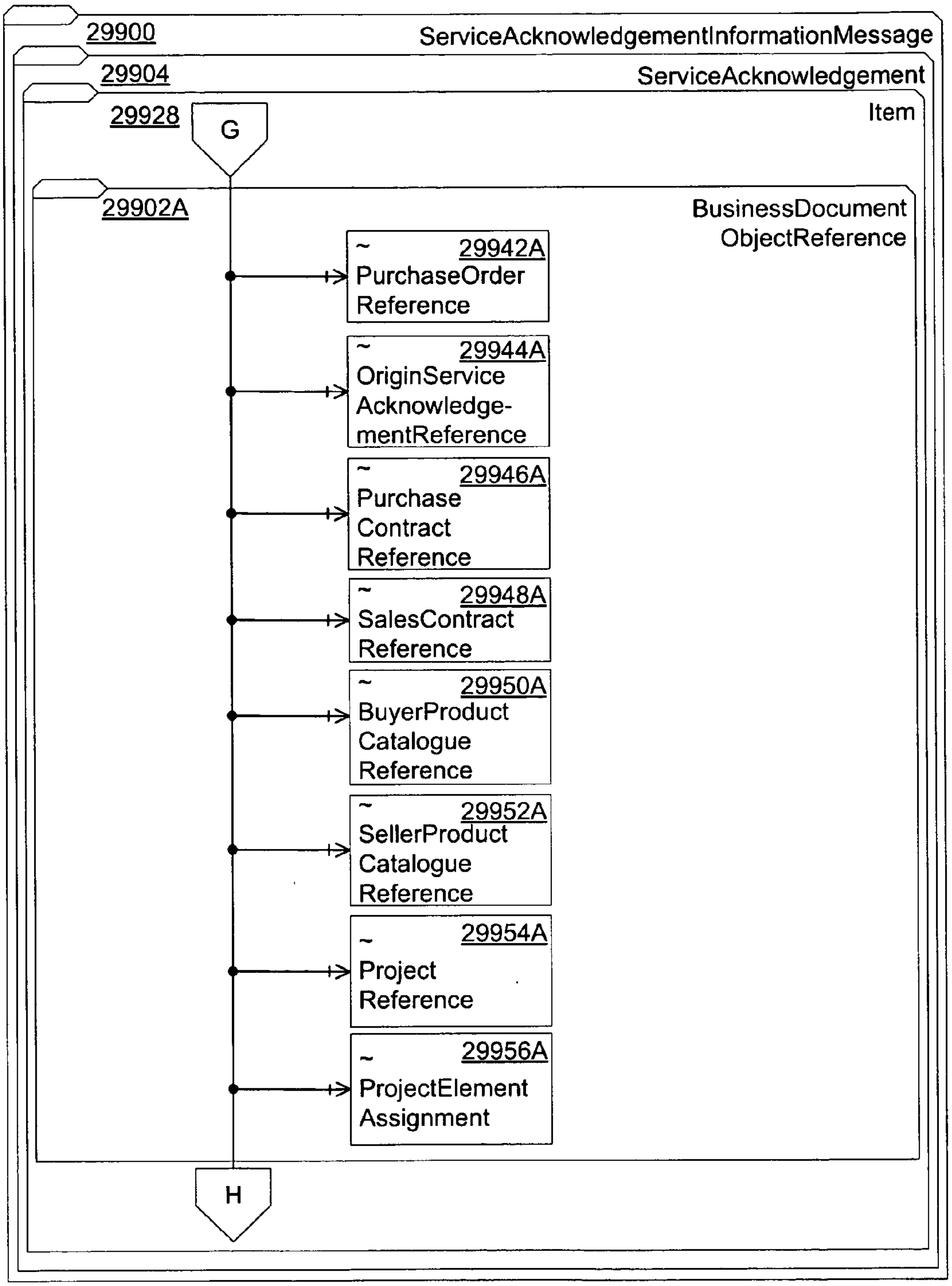
Figure 299J:
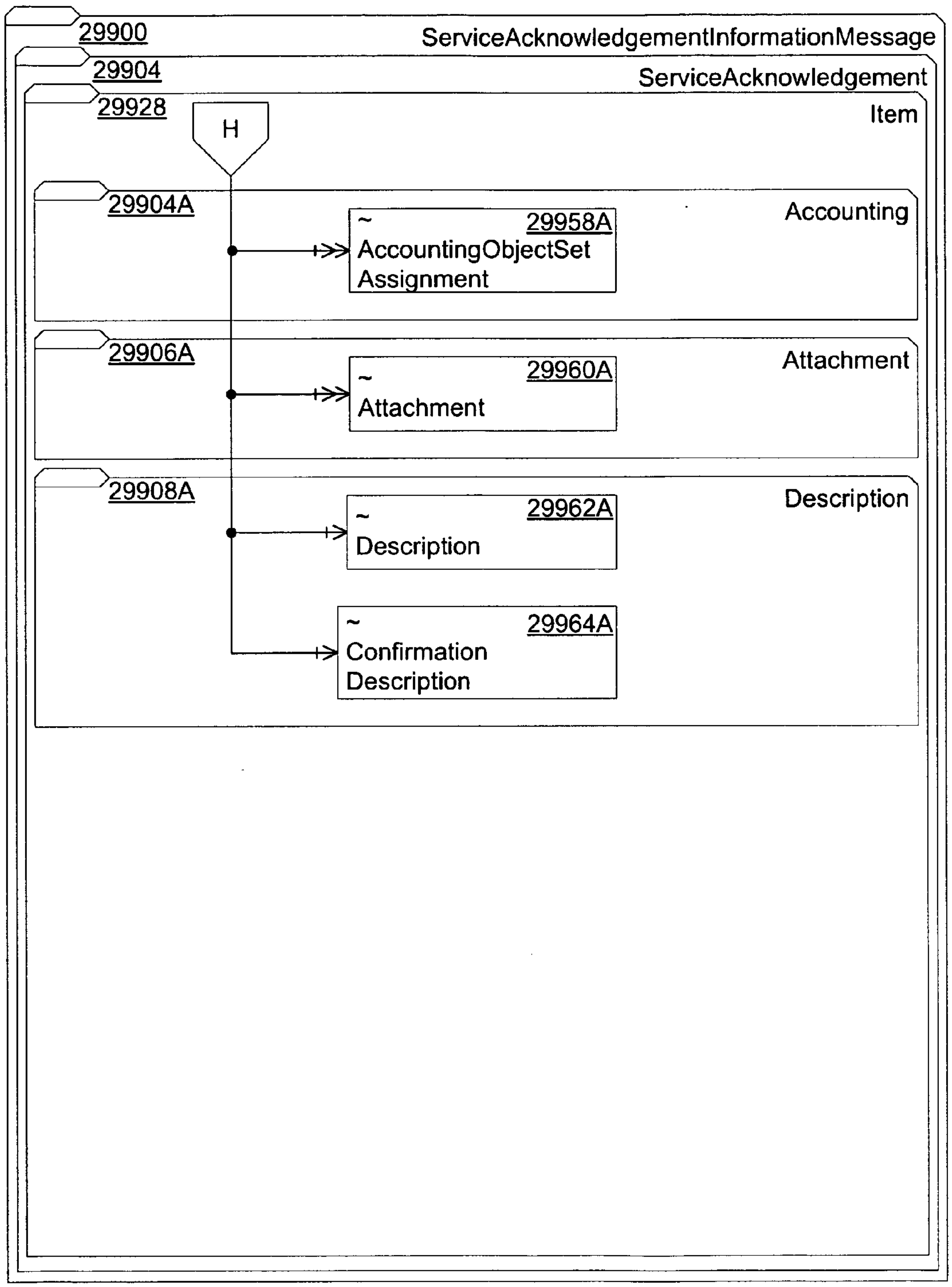
Figure 301:
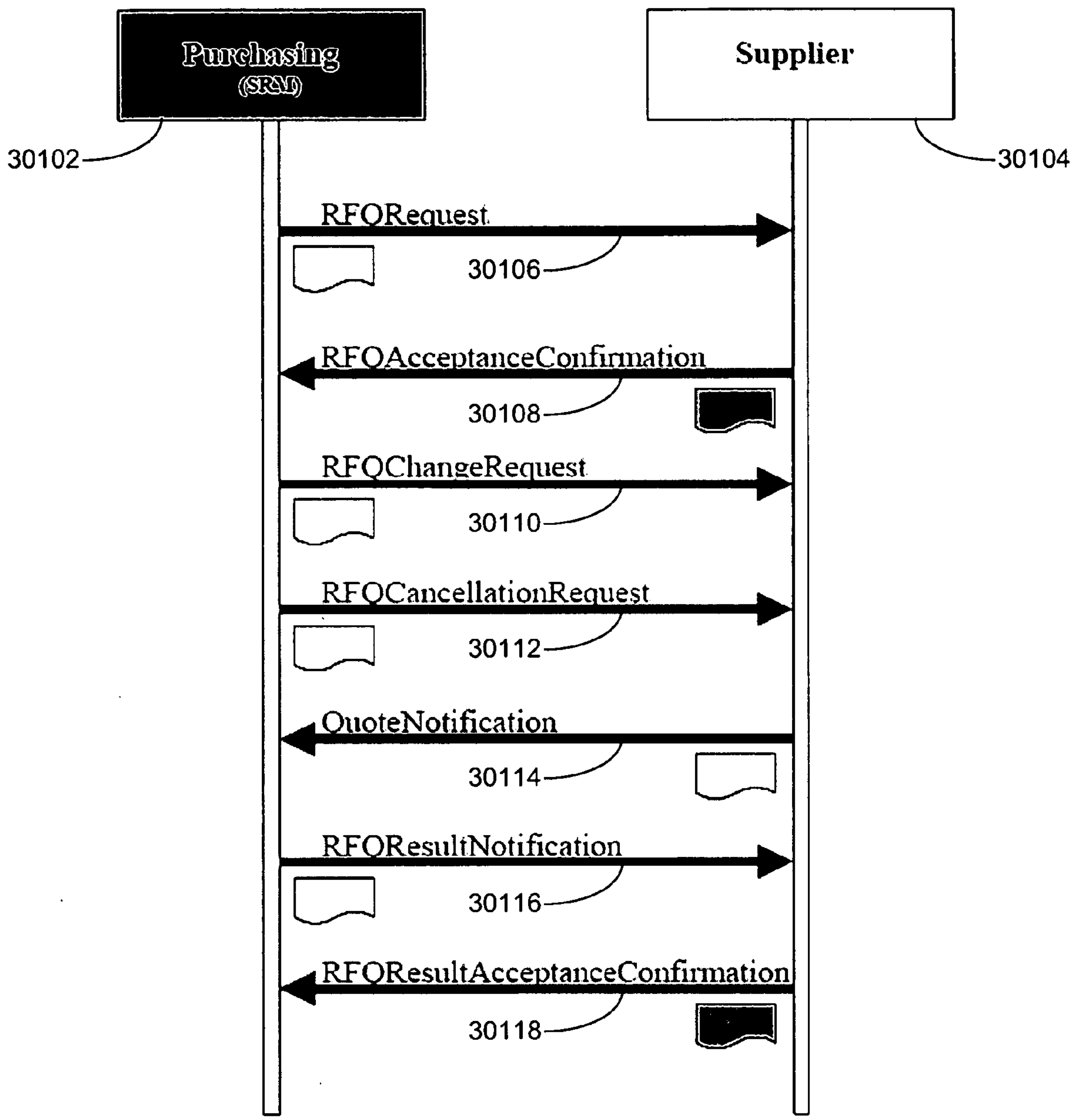
Figure 302A:
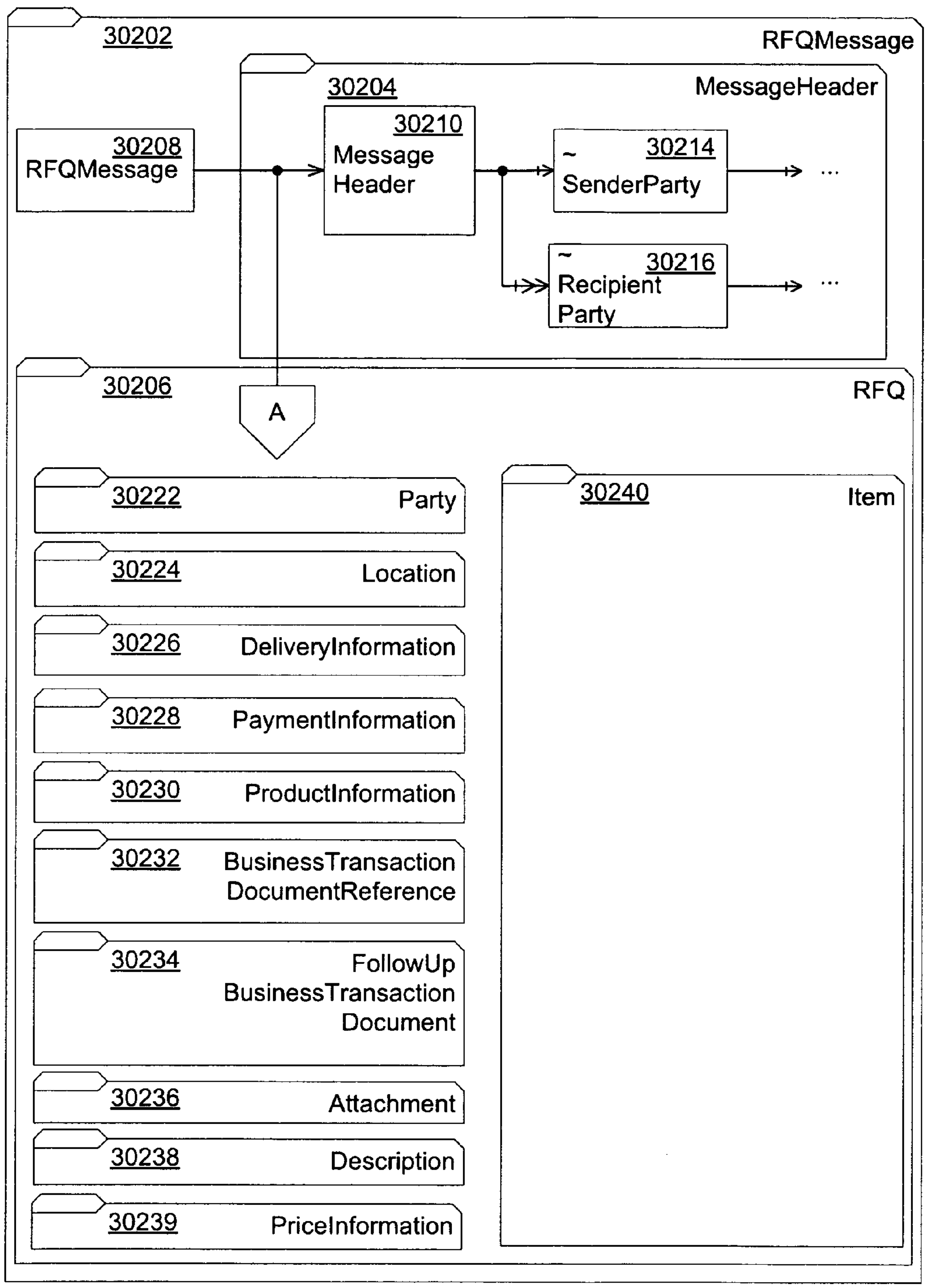
Figure 302B:
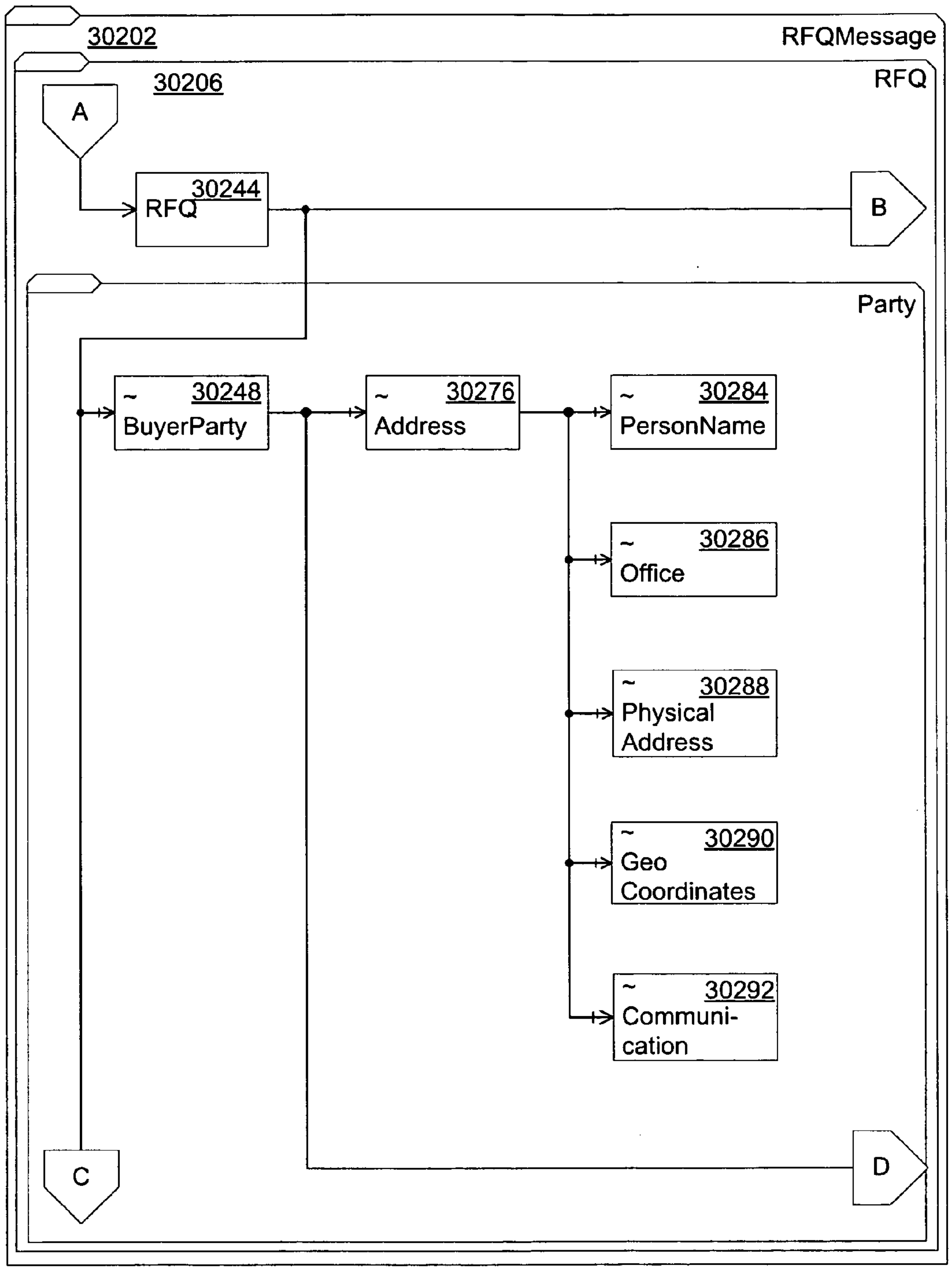
Figure 302C:
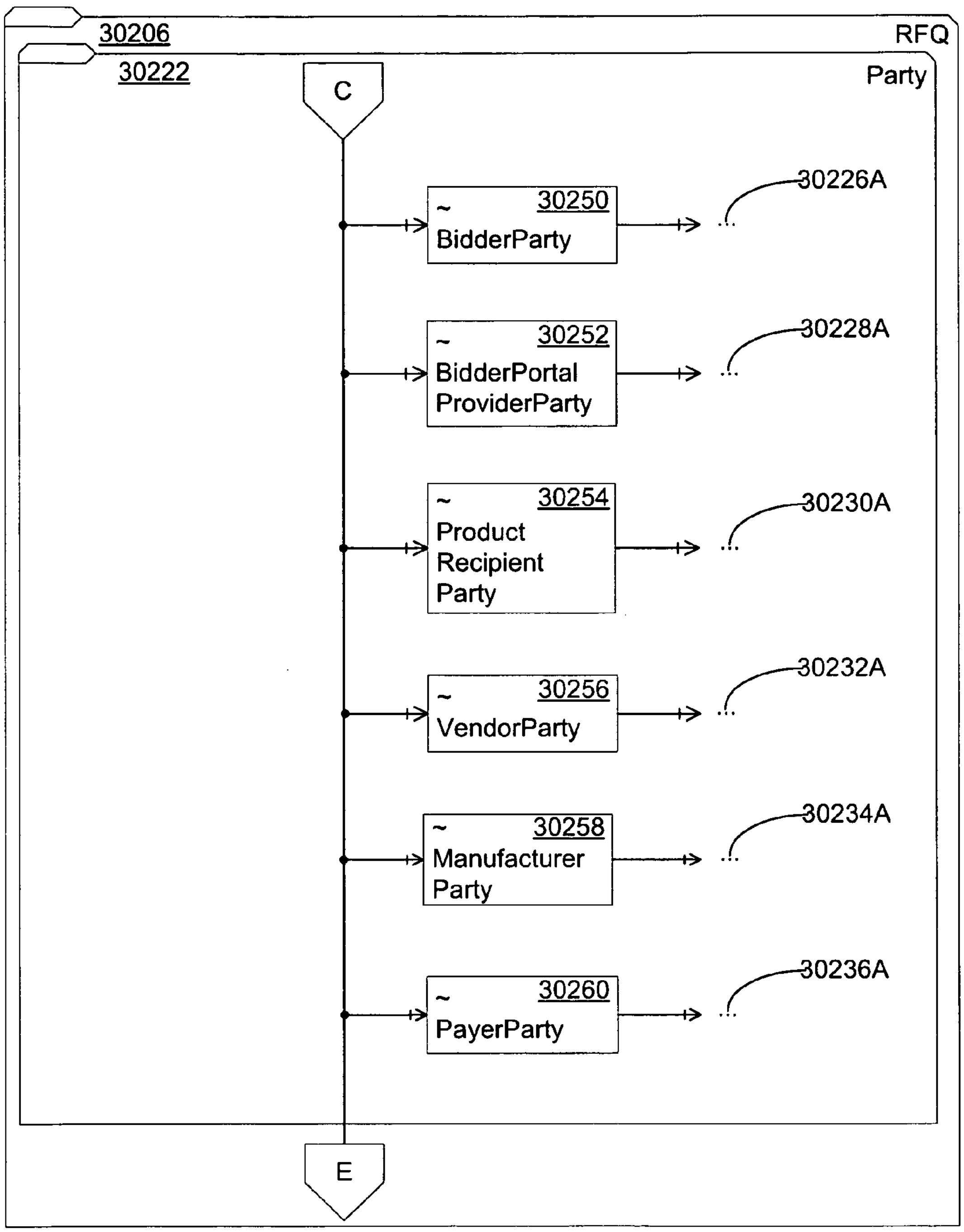
Figure 302D:
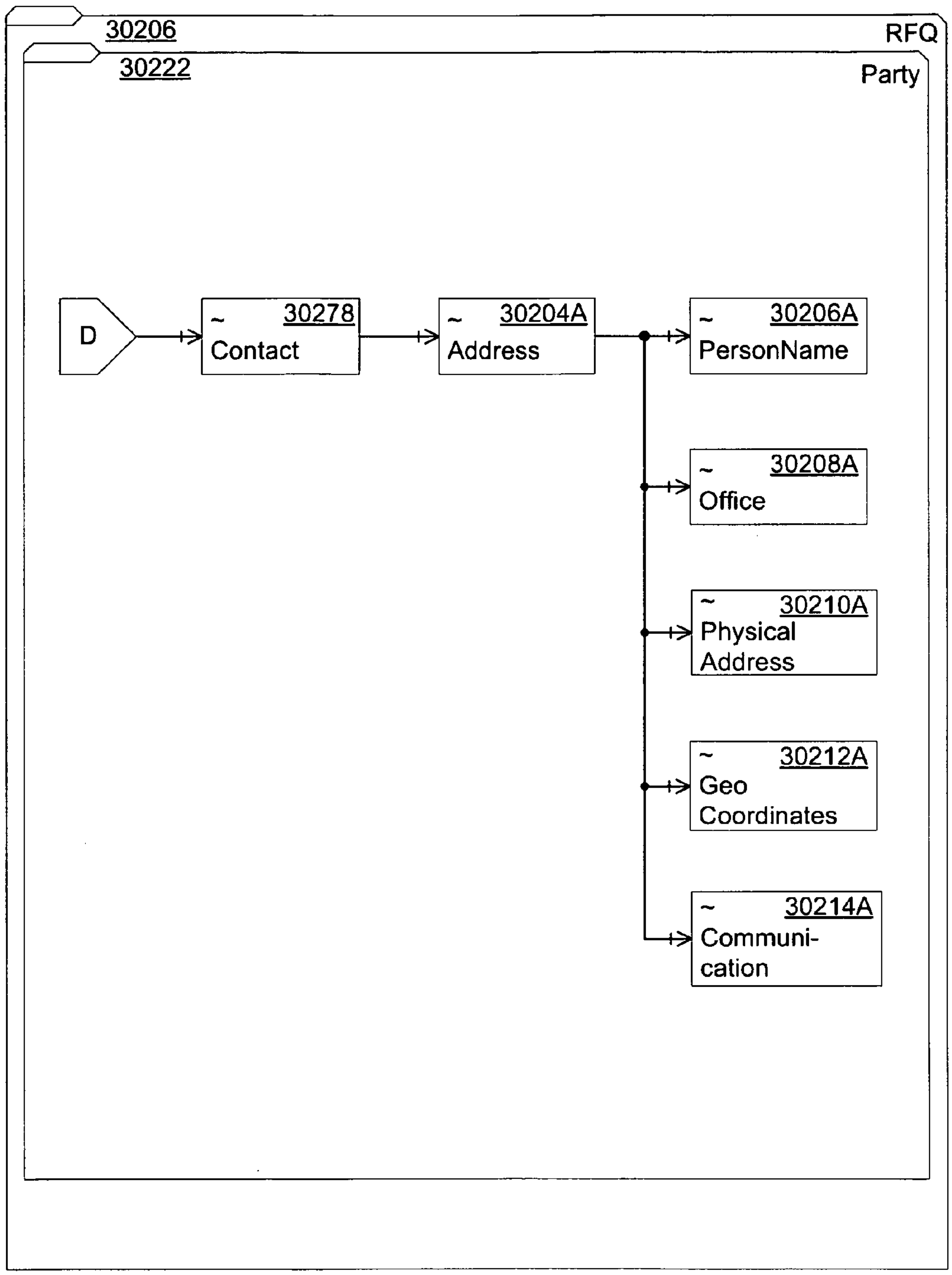
Figure 302E:
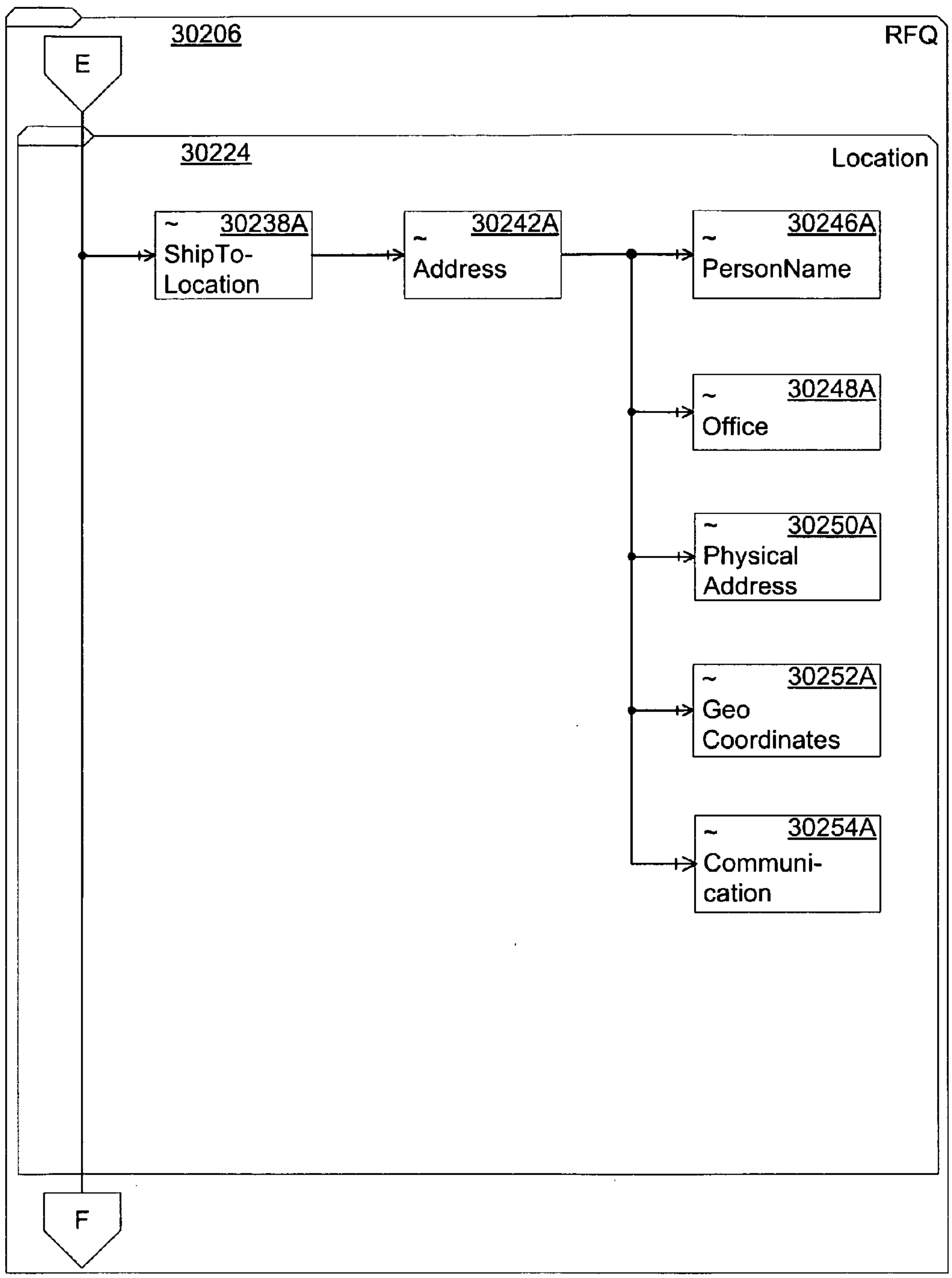
Figure 302F:
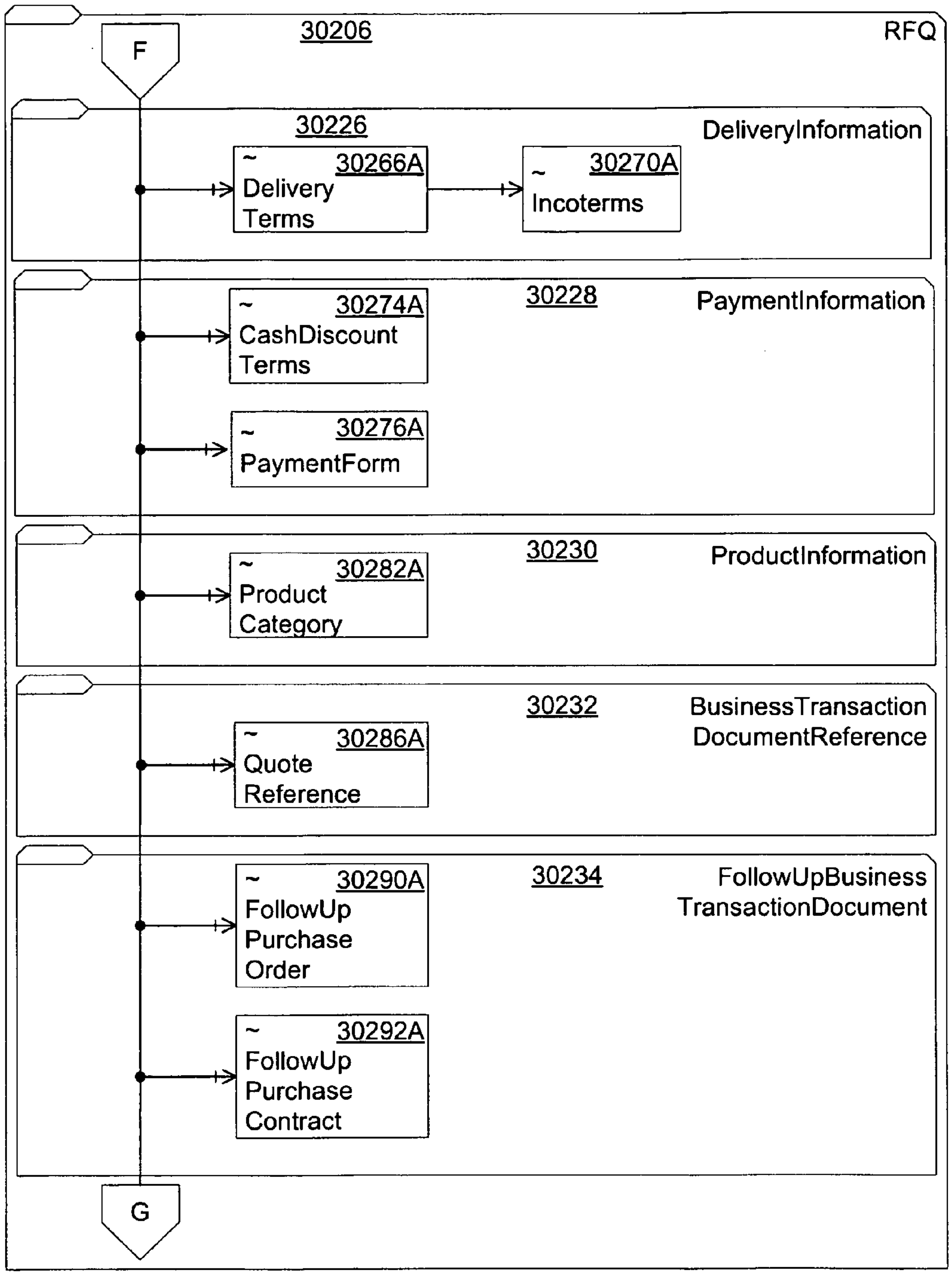
Figure 302G:
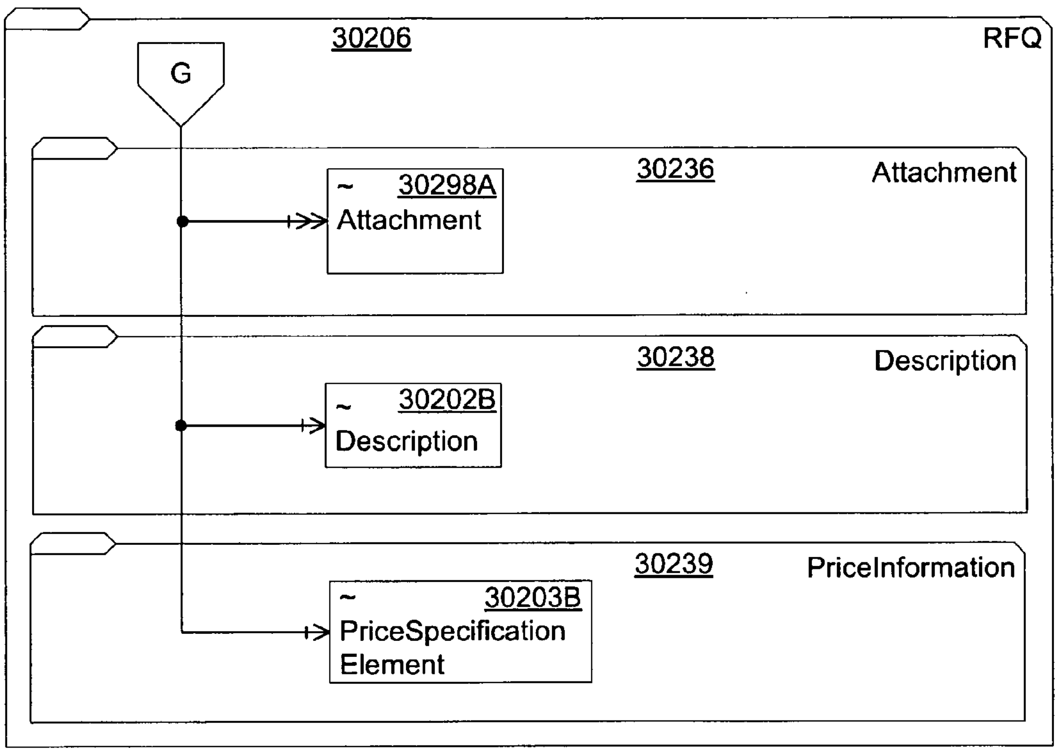
Figure 302H:
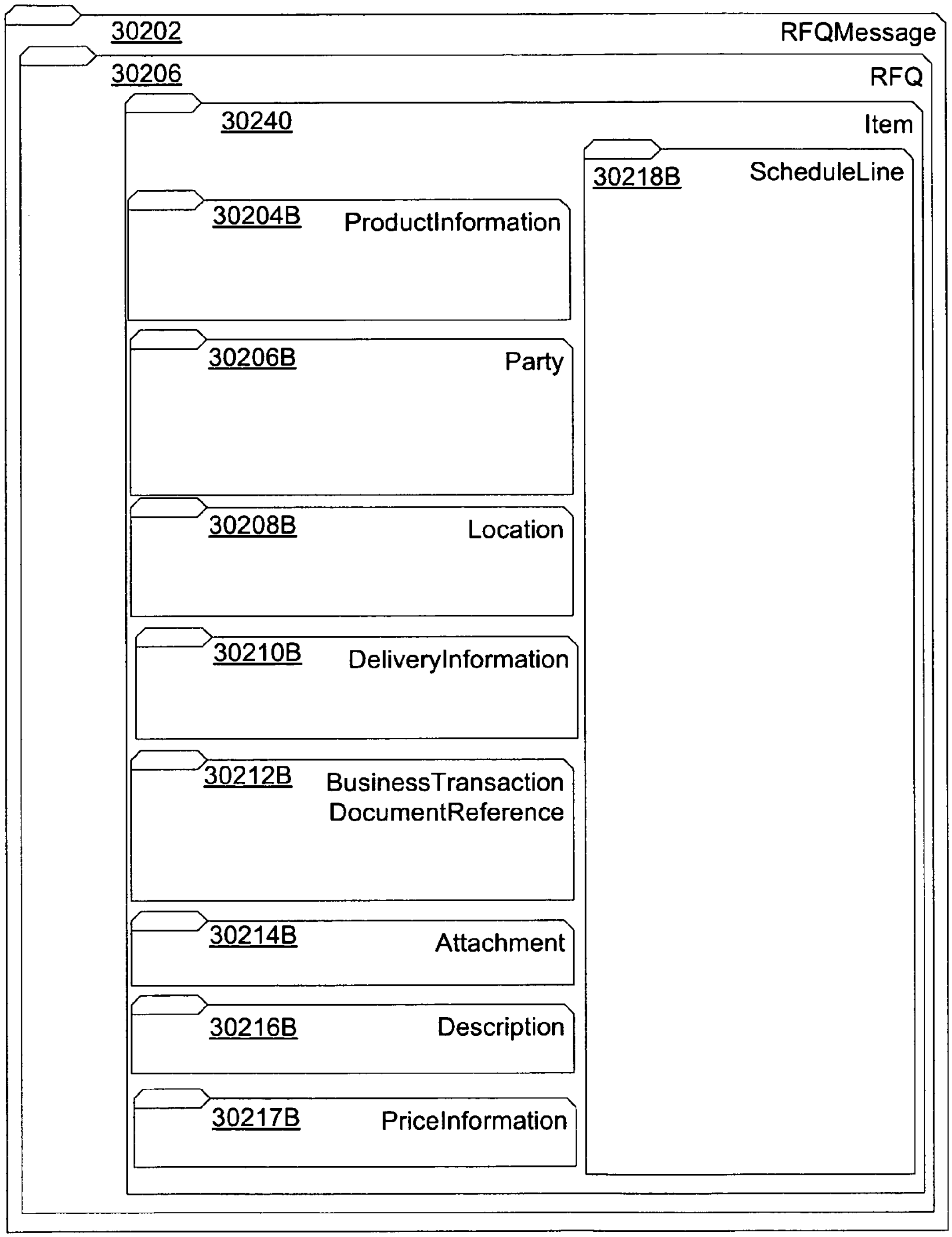
Figure 302I:
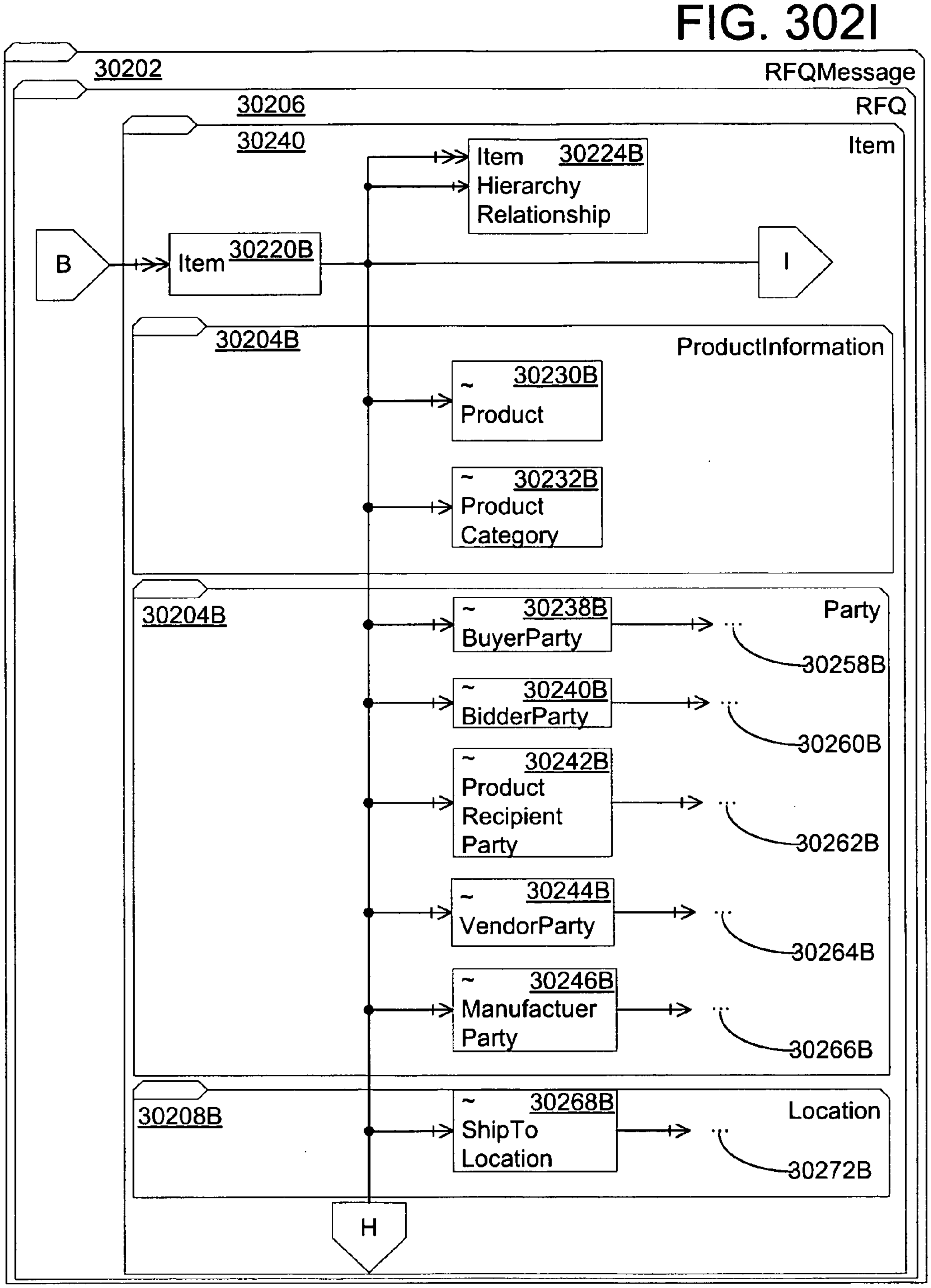
Figure 302J:
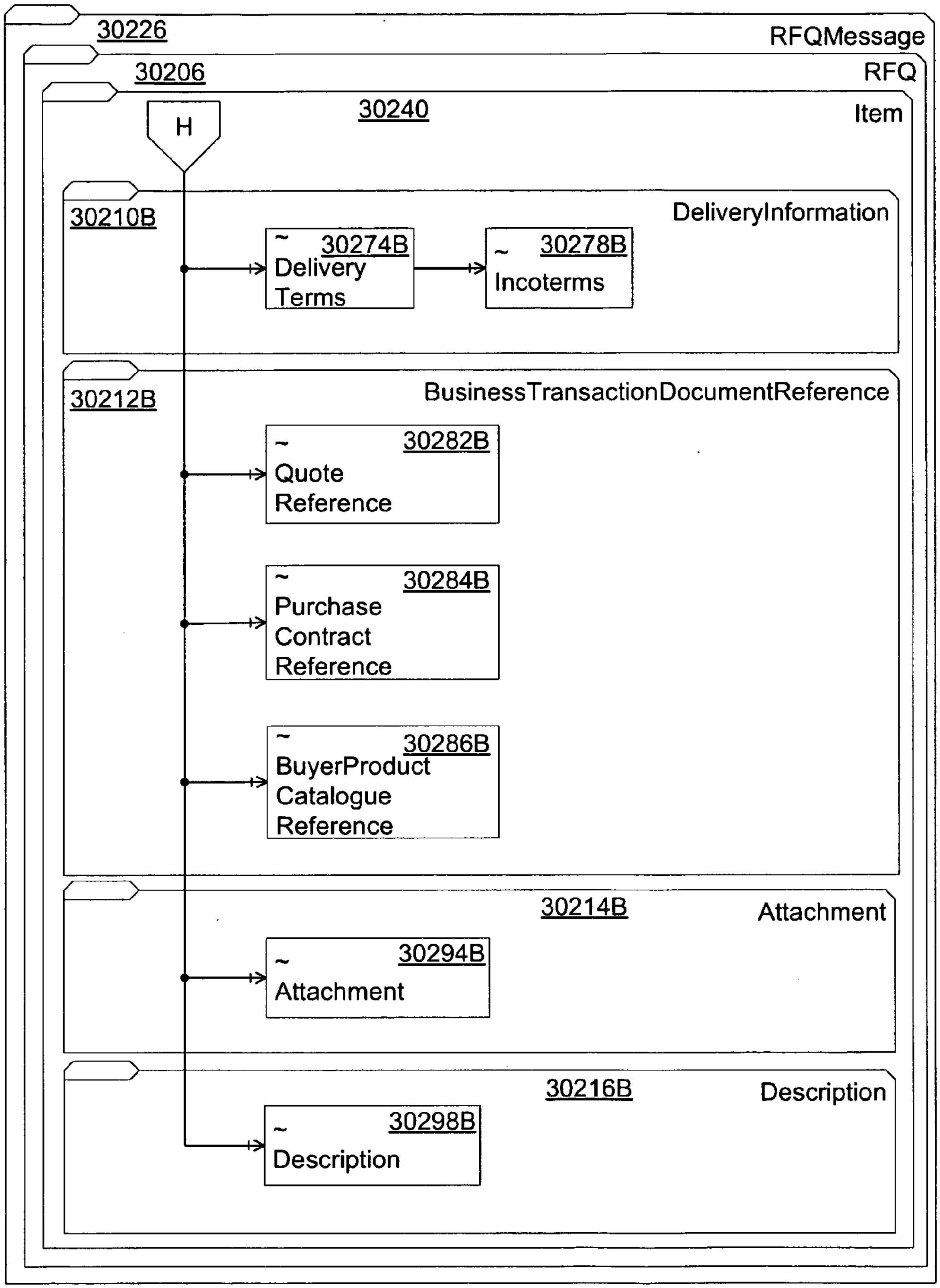
Figure 302K:
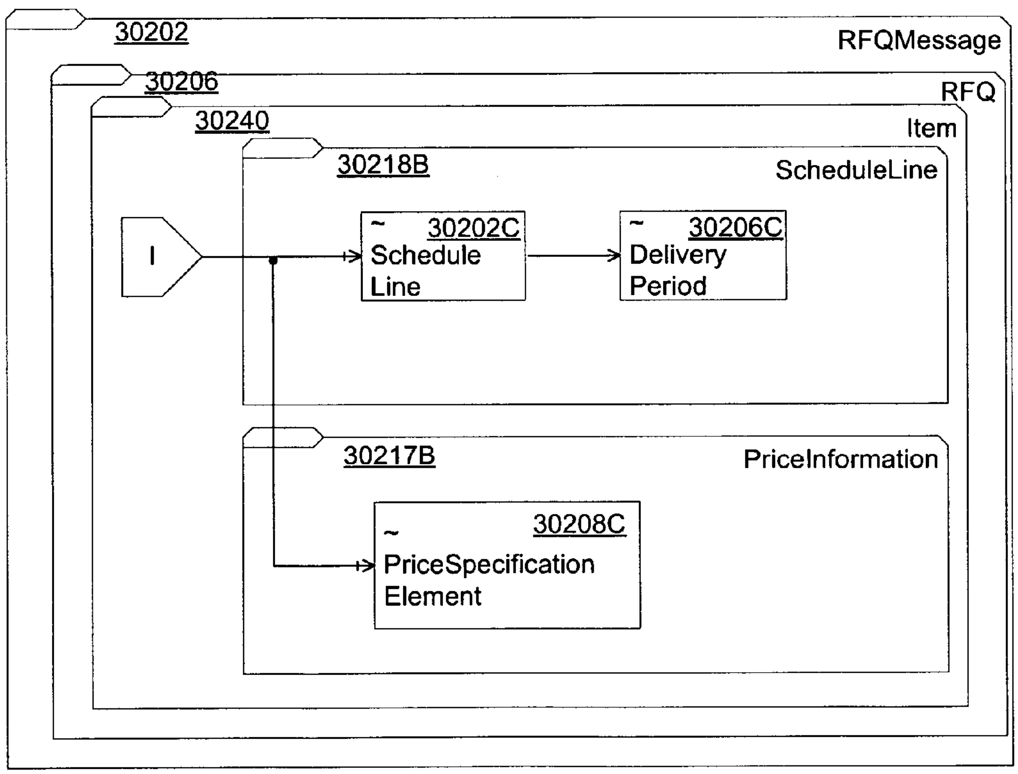
Figure 303:
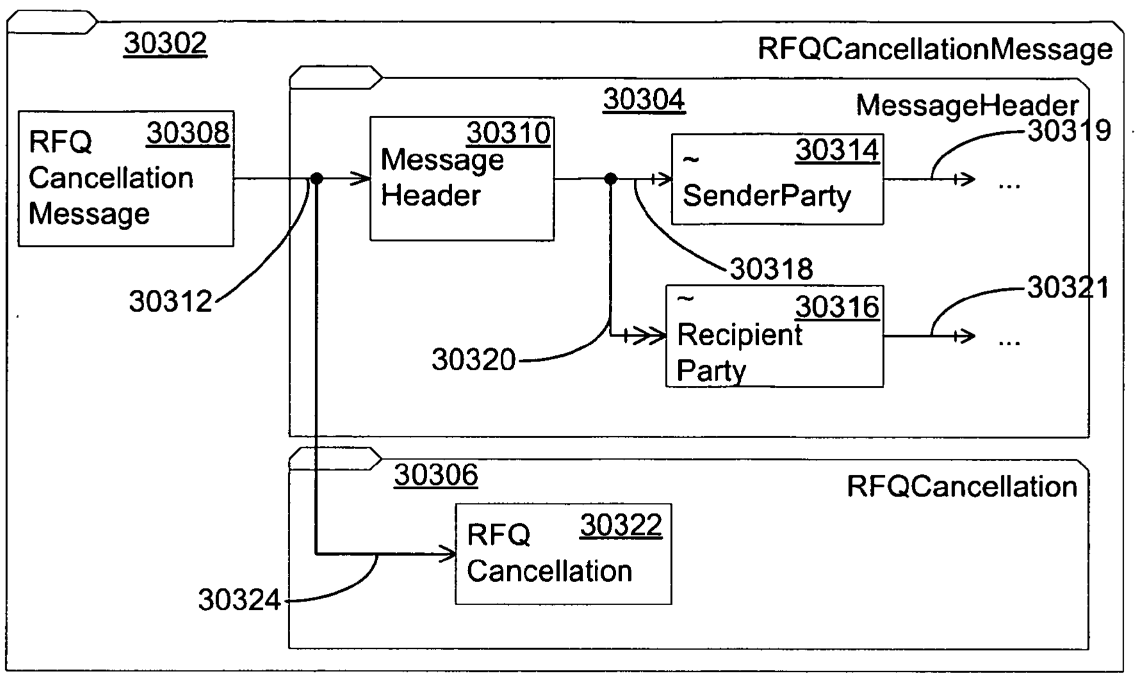
Figure 304A:
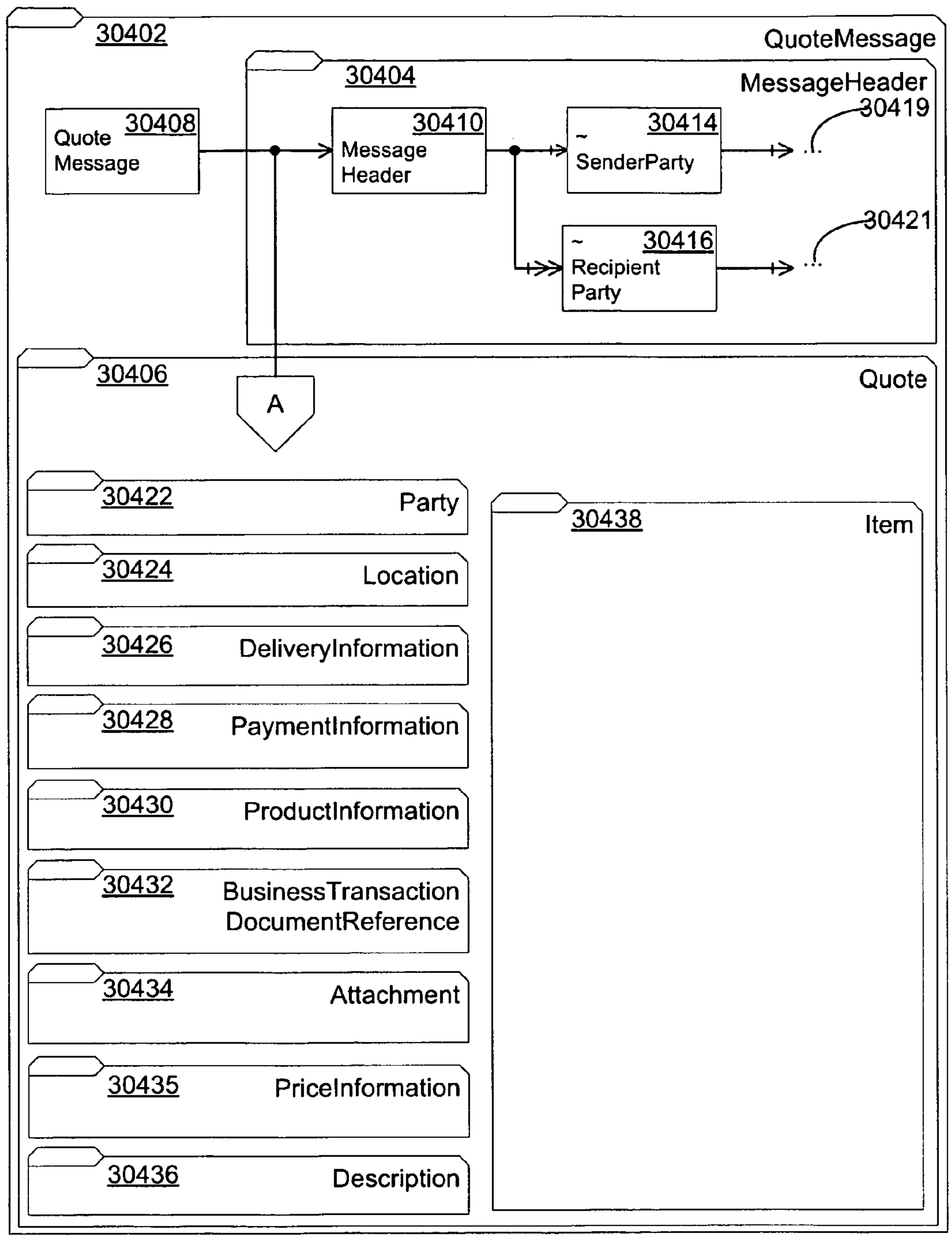
Figure 304B:
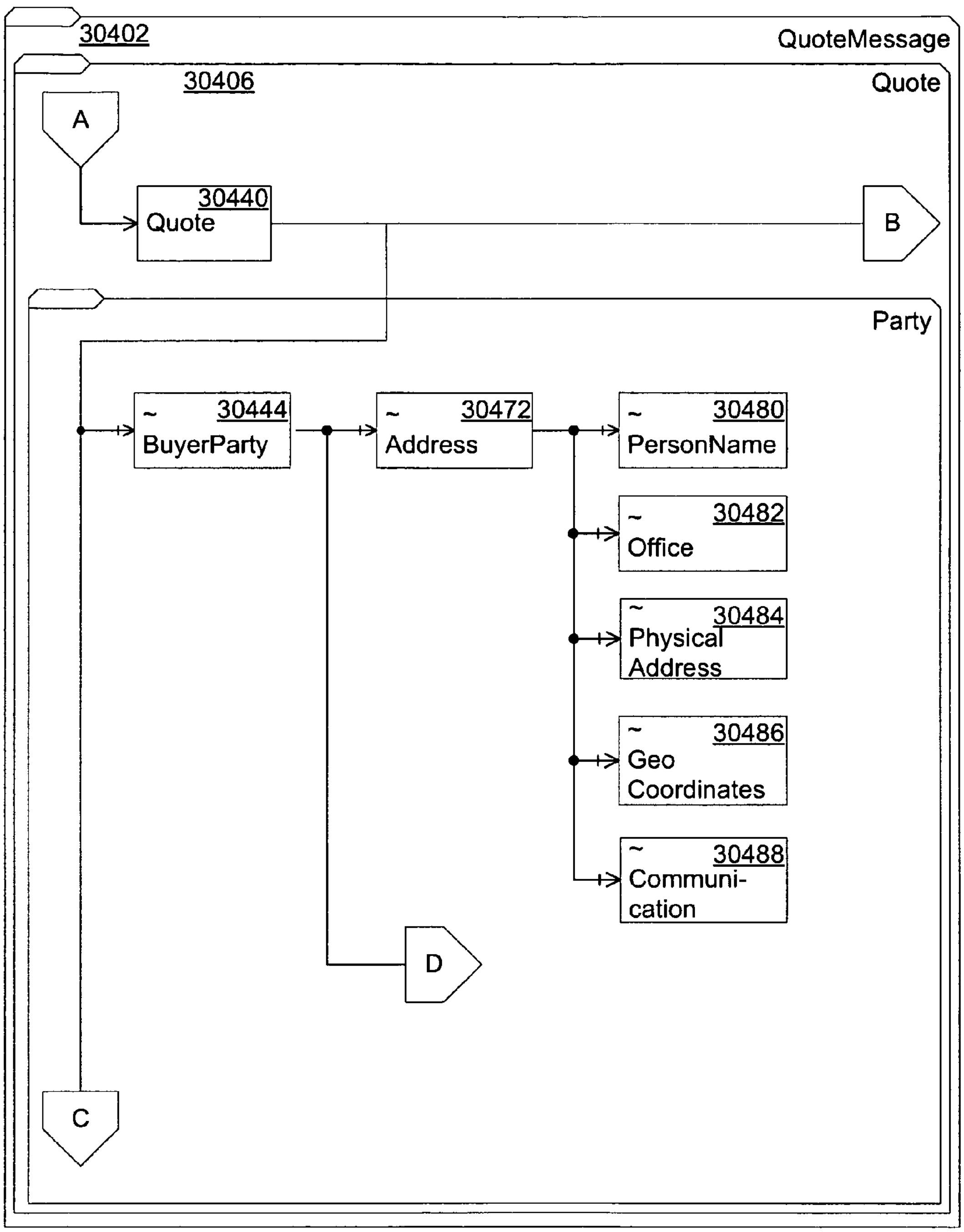
Figure 304C:
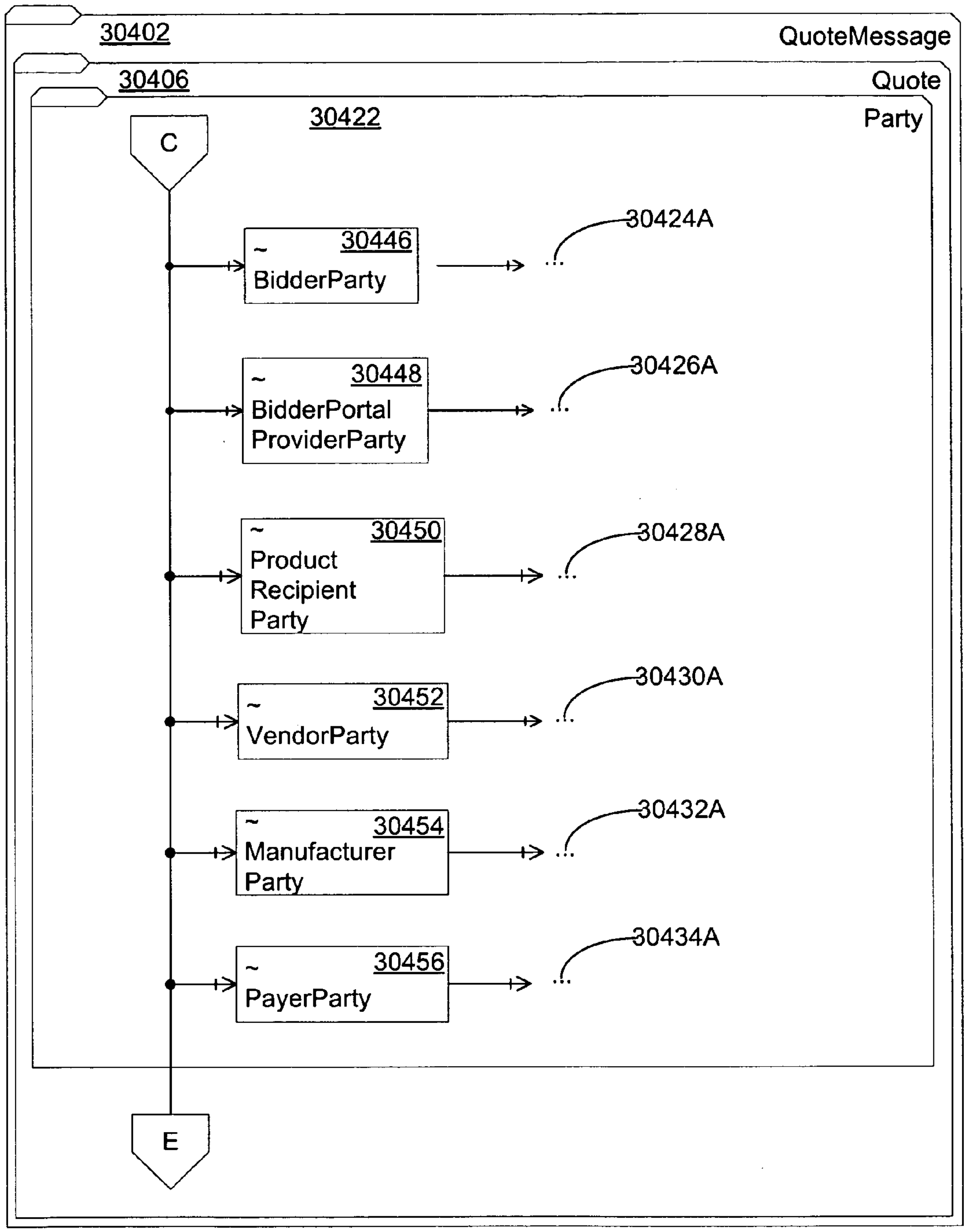
Figure 304D:
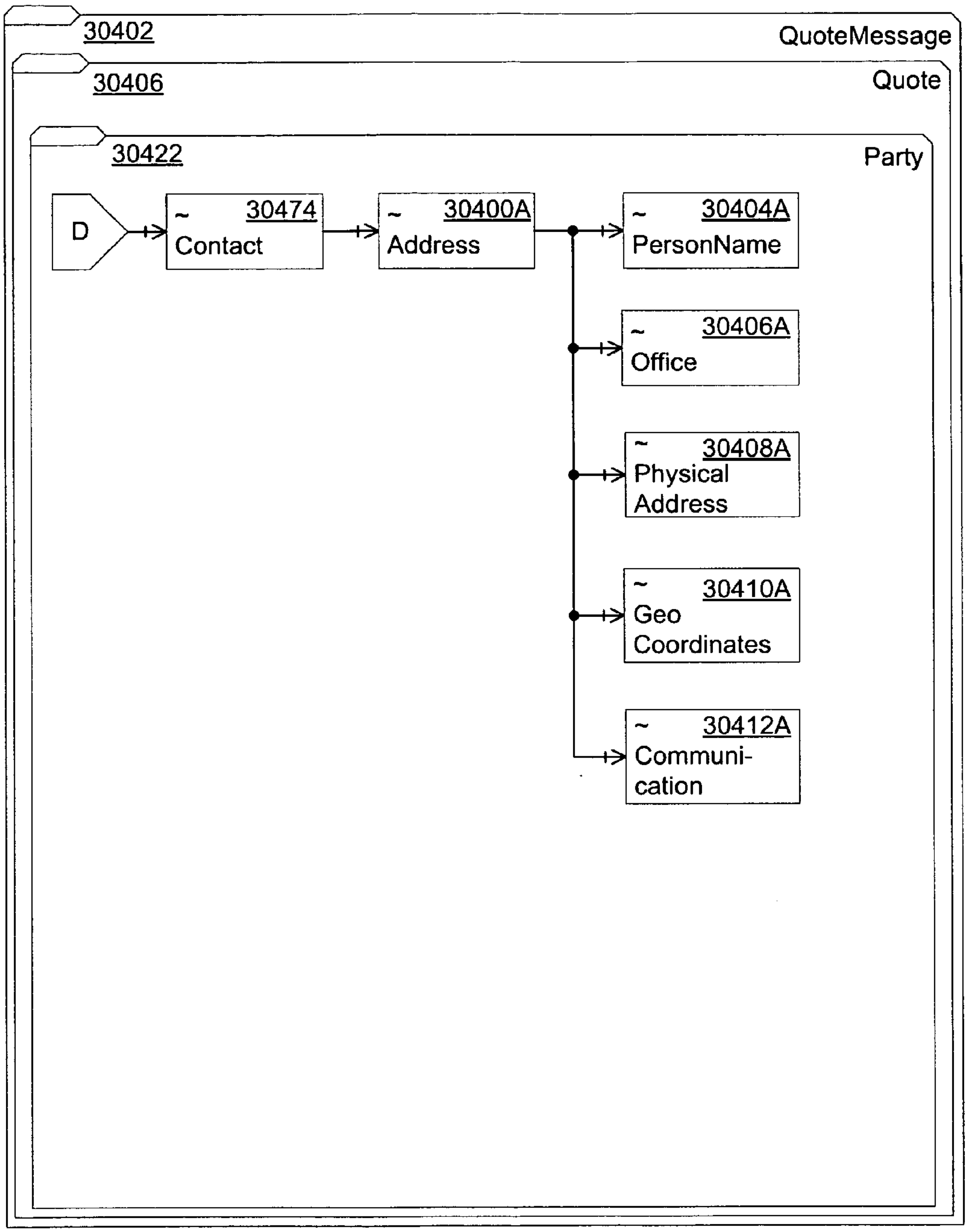
Figure 304E:
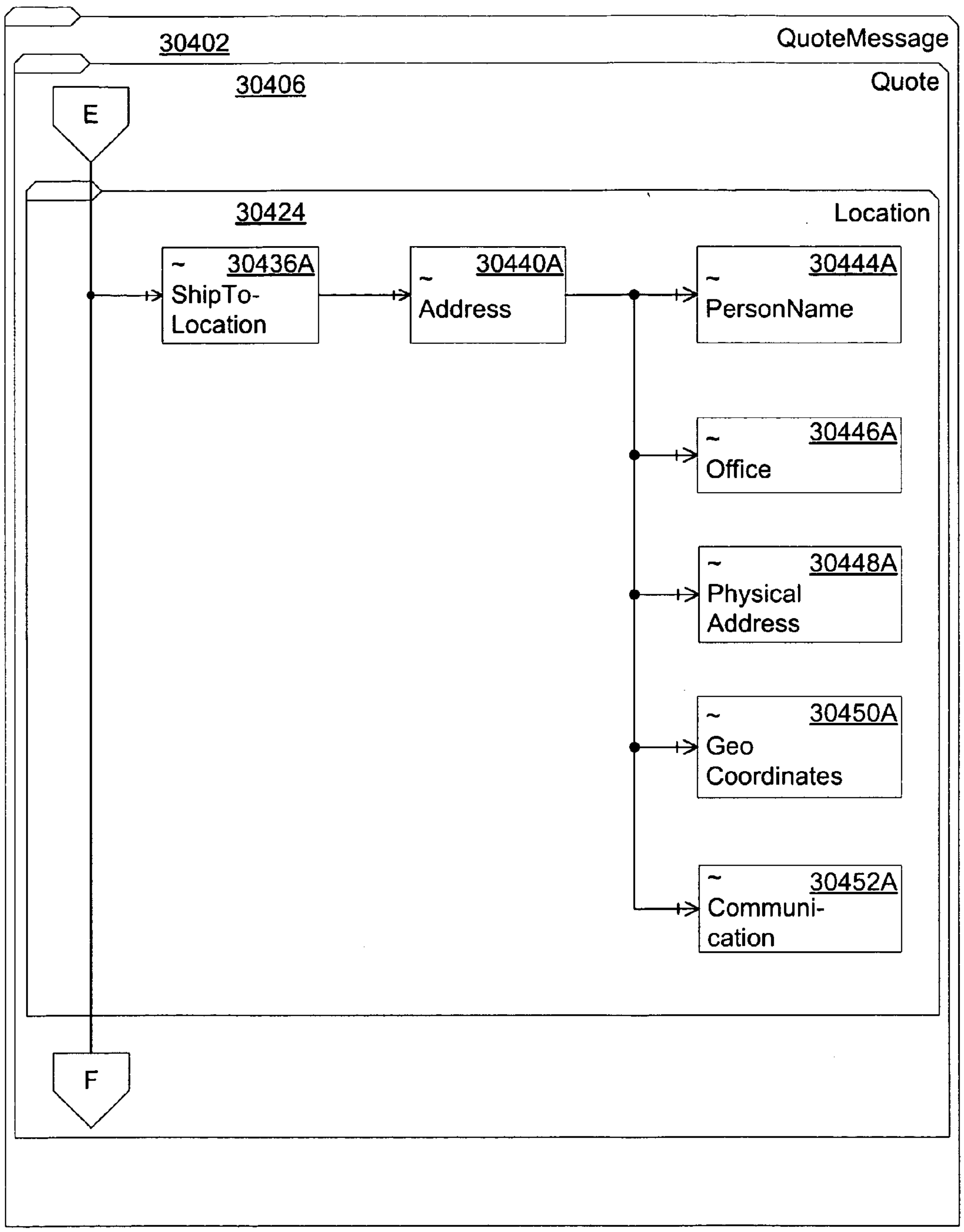
Figure 304F:
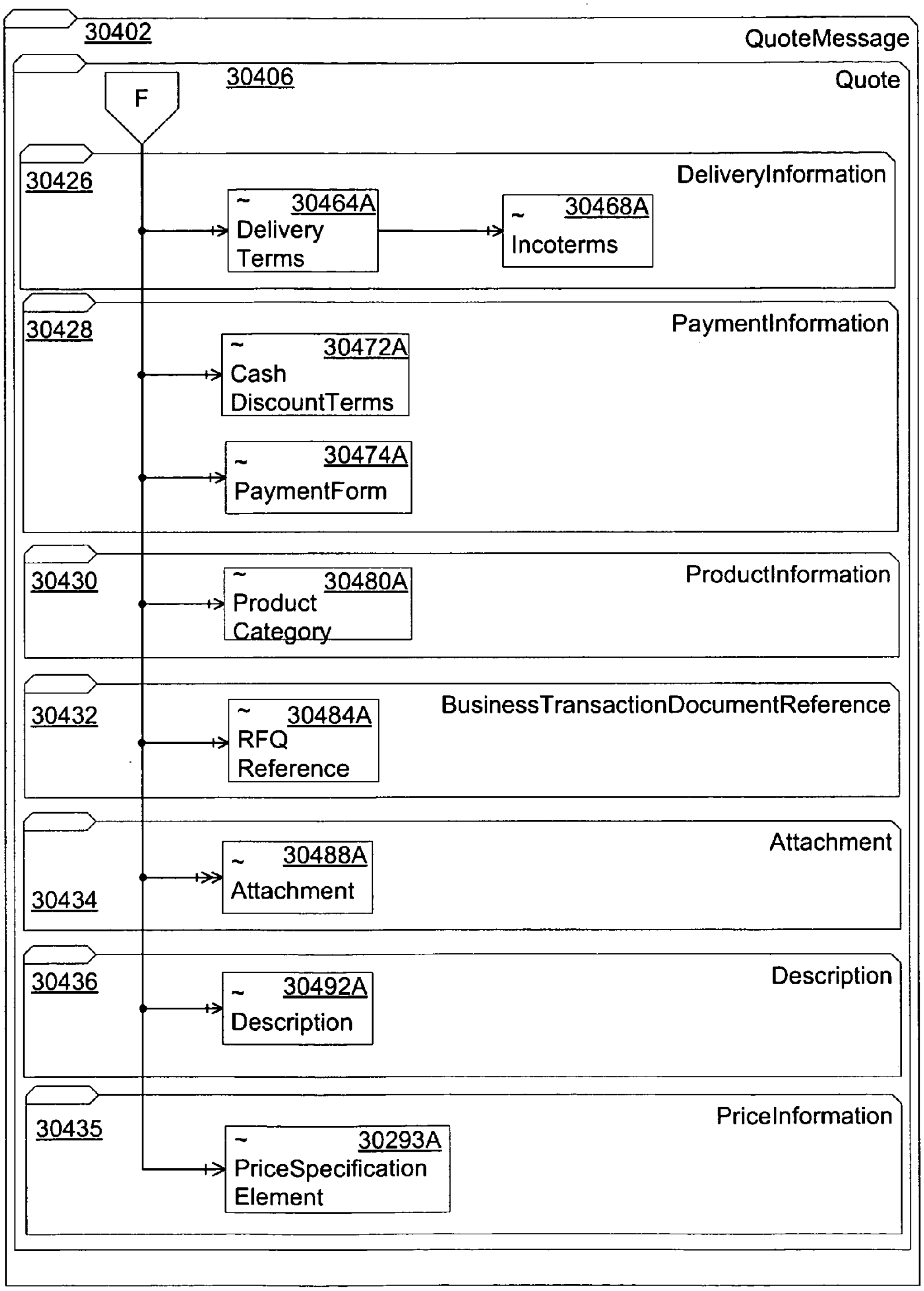
Figure 304G:
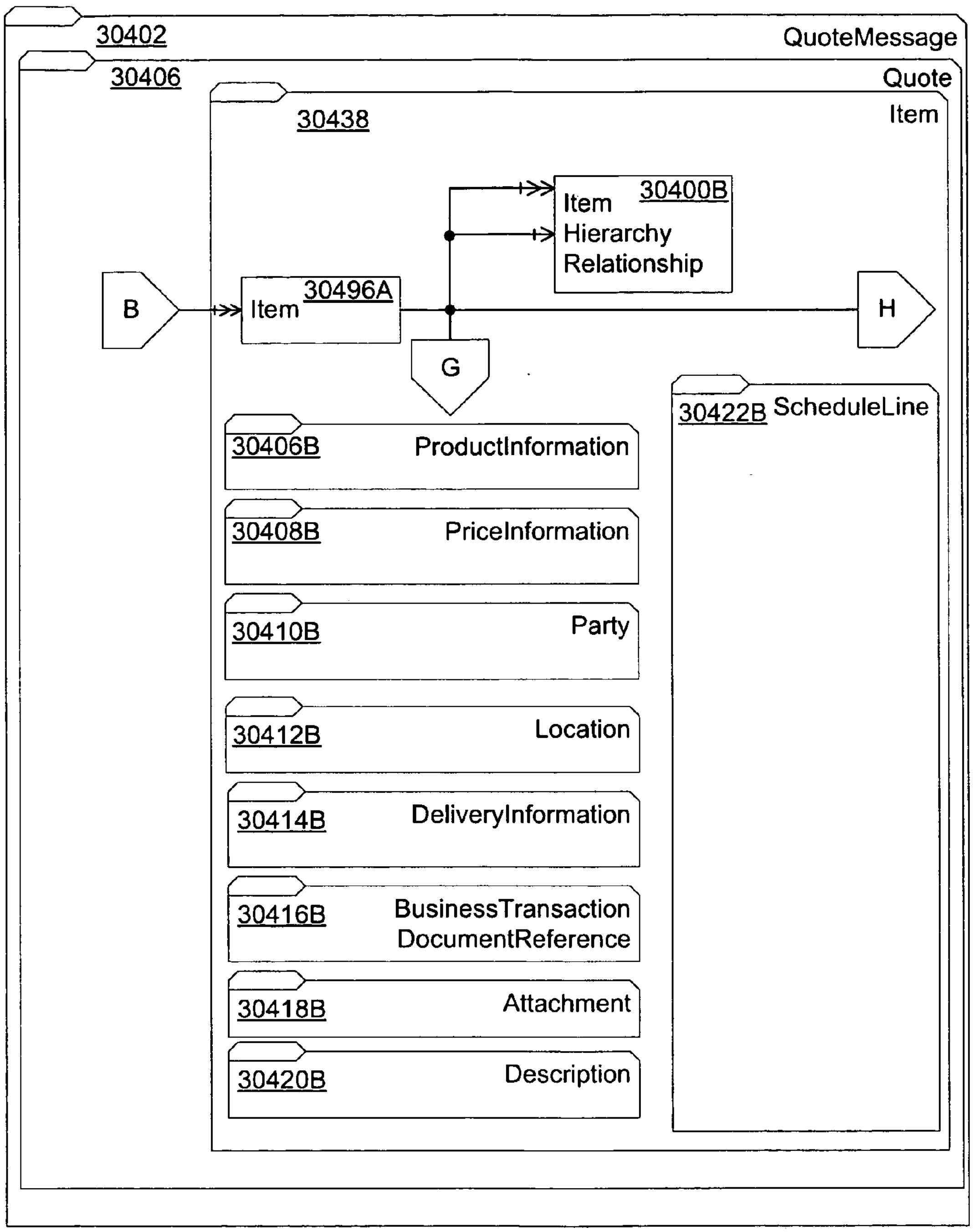
Figure 304H:
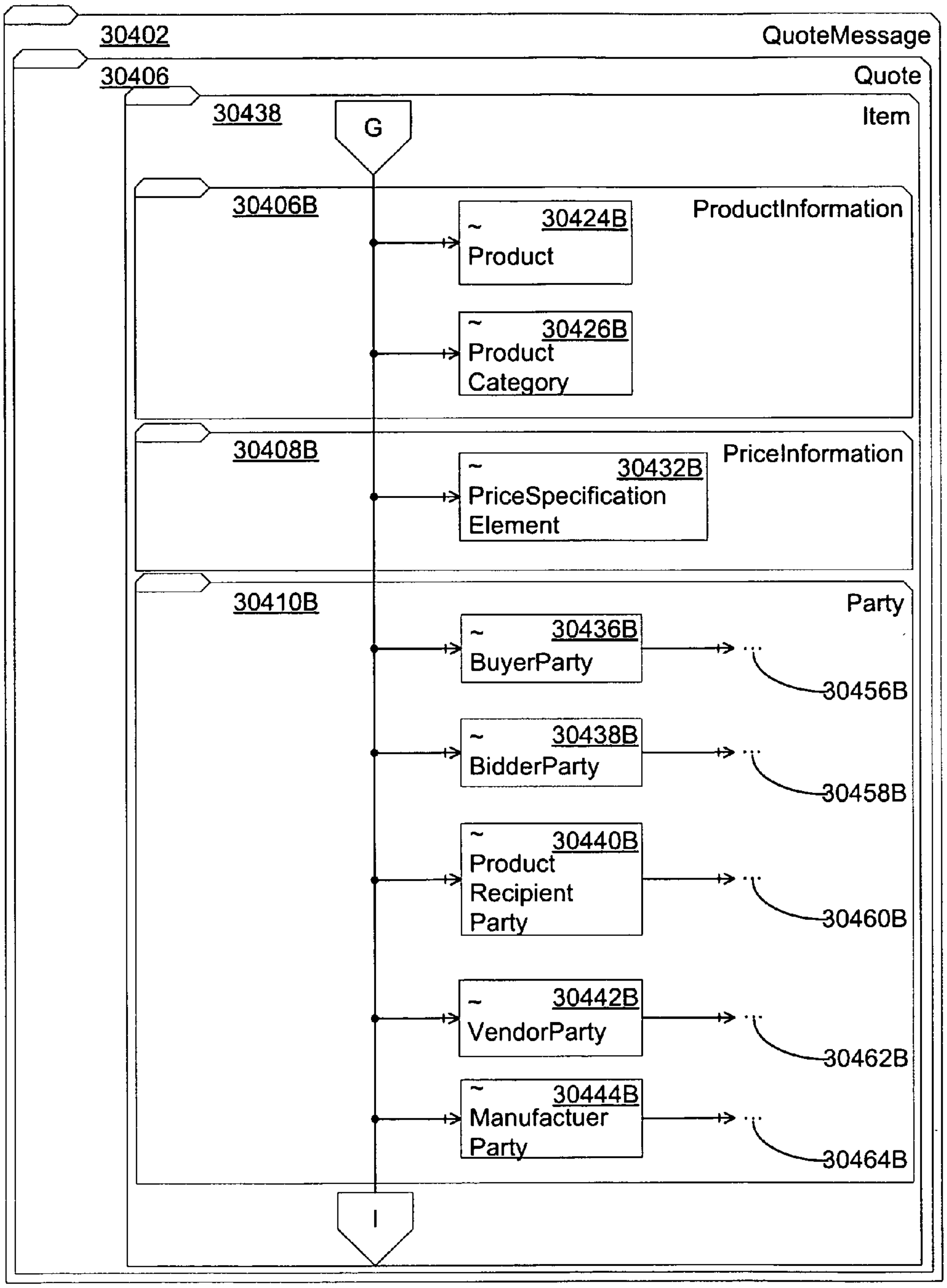
Figure 304I:
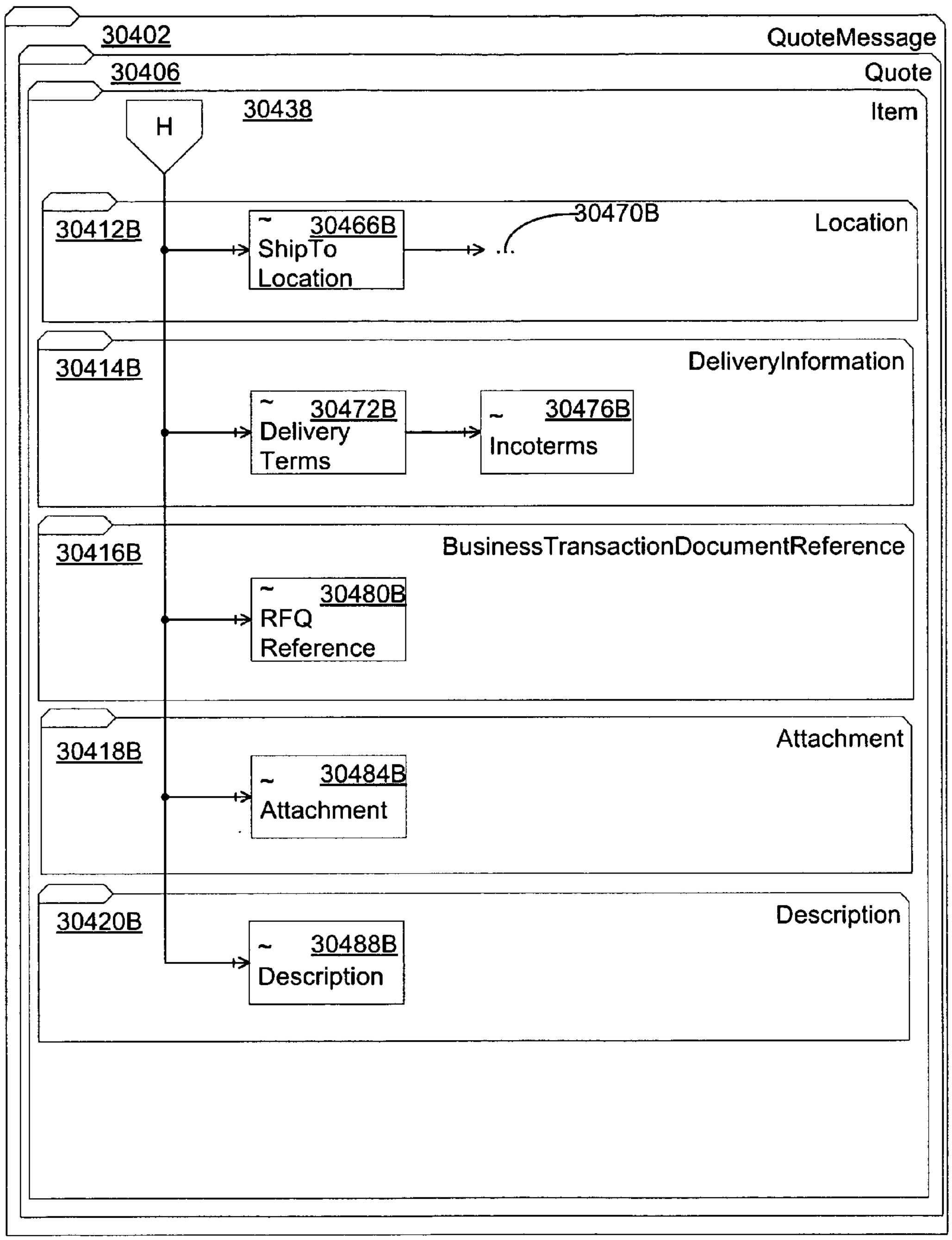
Figure 304J:
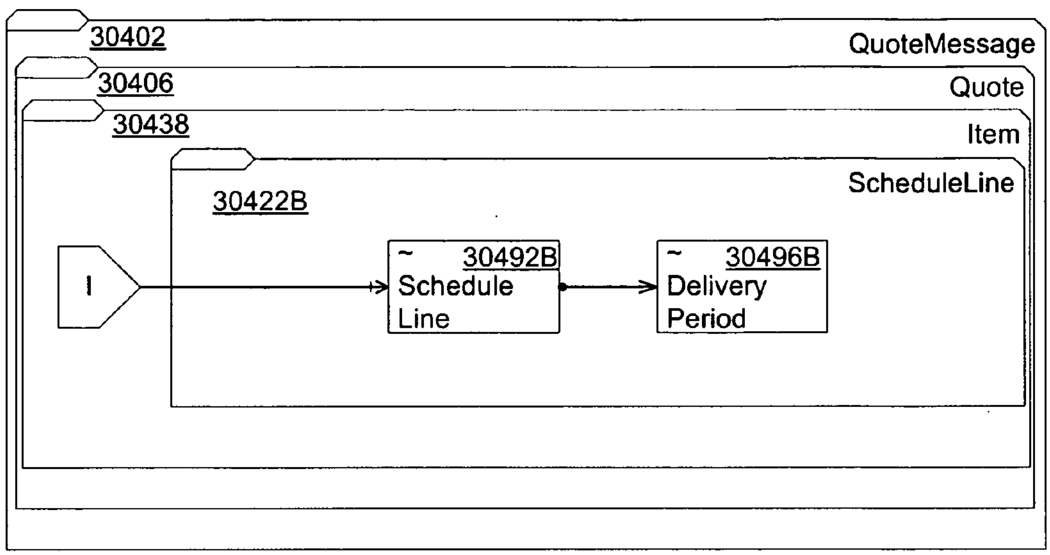
Figure 305A:
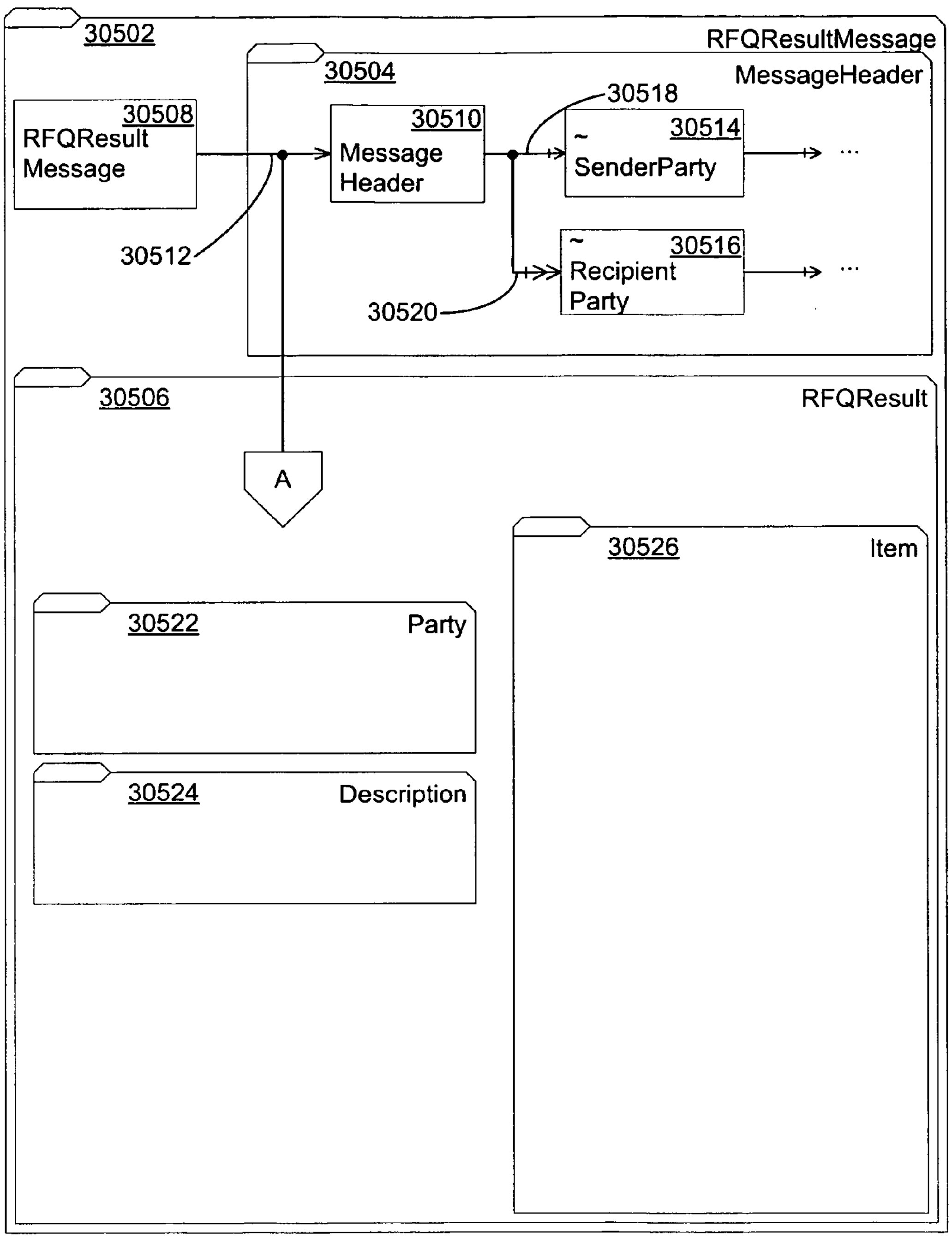
Figure 305B:
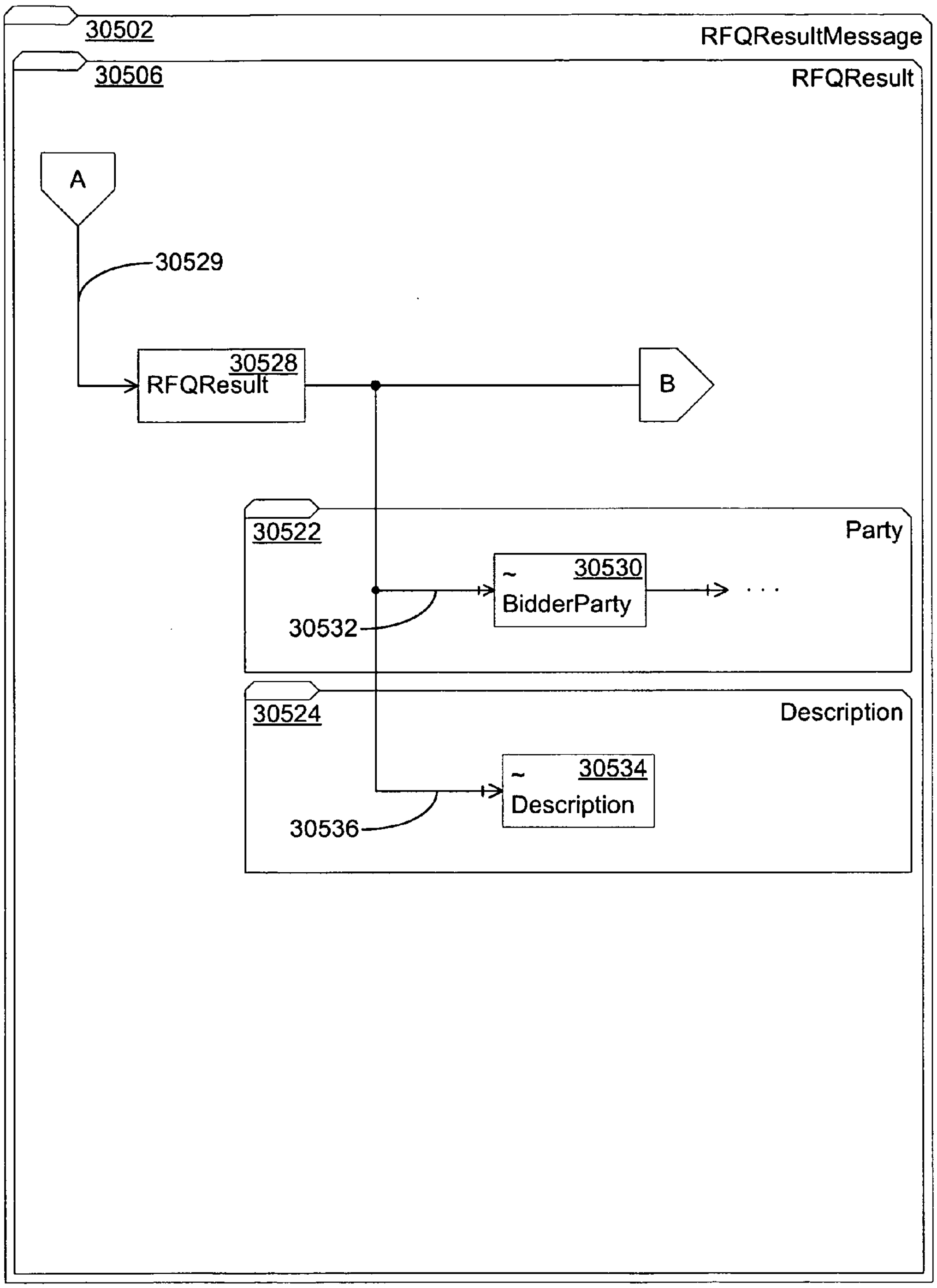
Figure 305C:
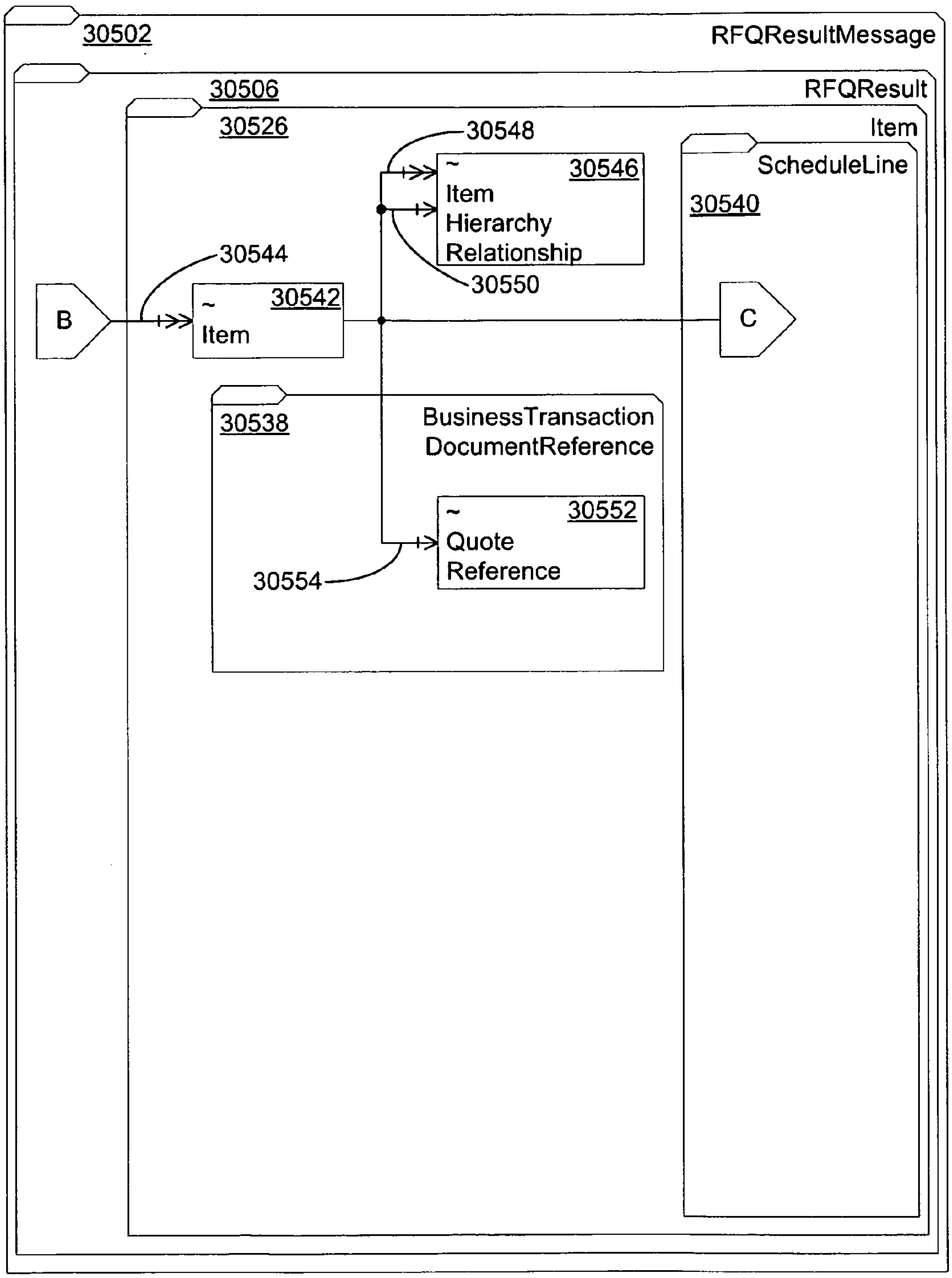
Figure 305D:
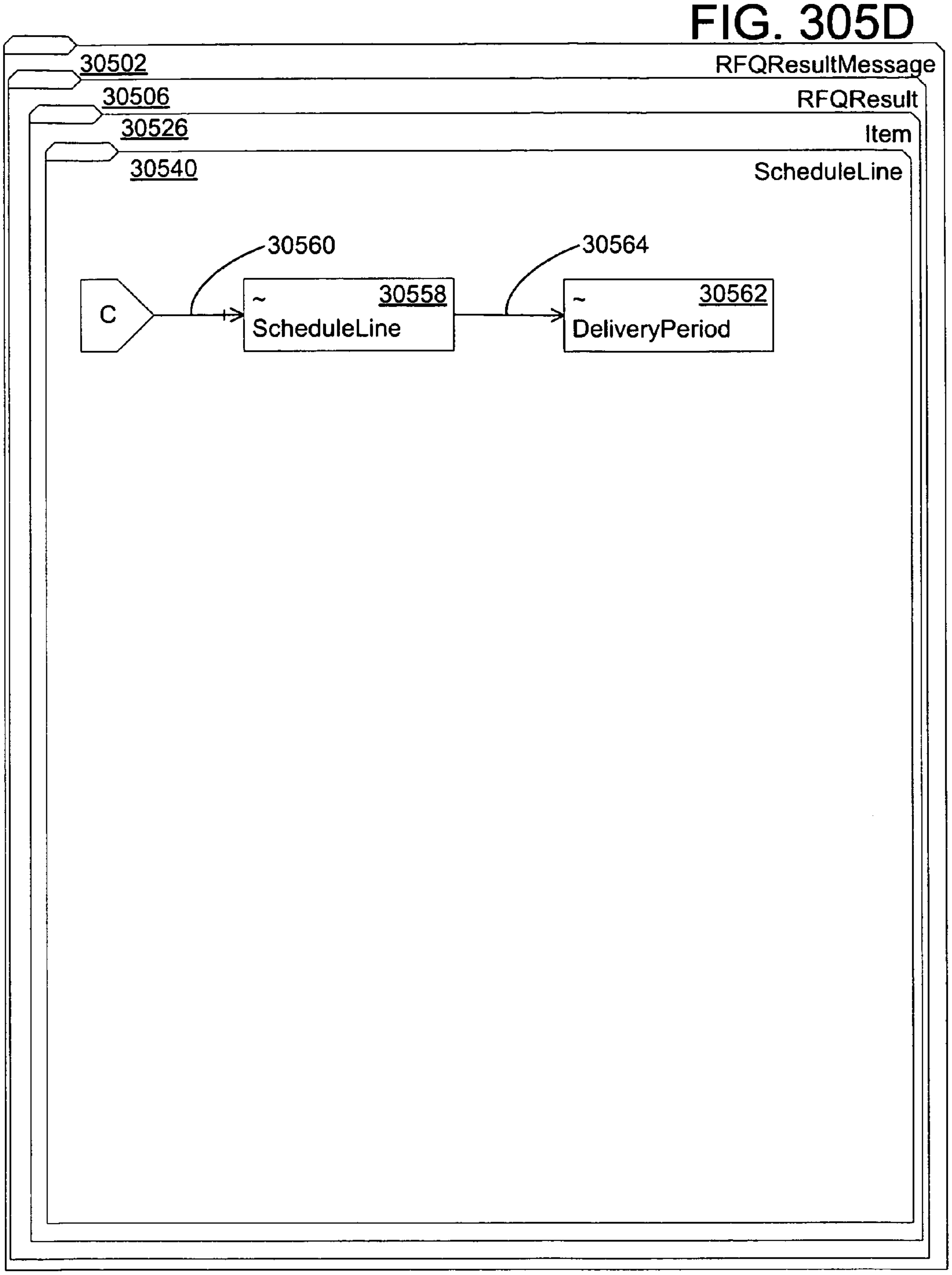
Figure 310:
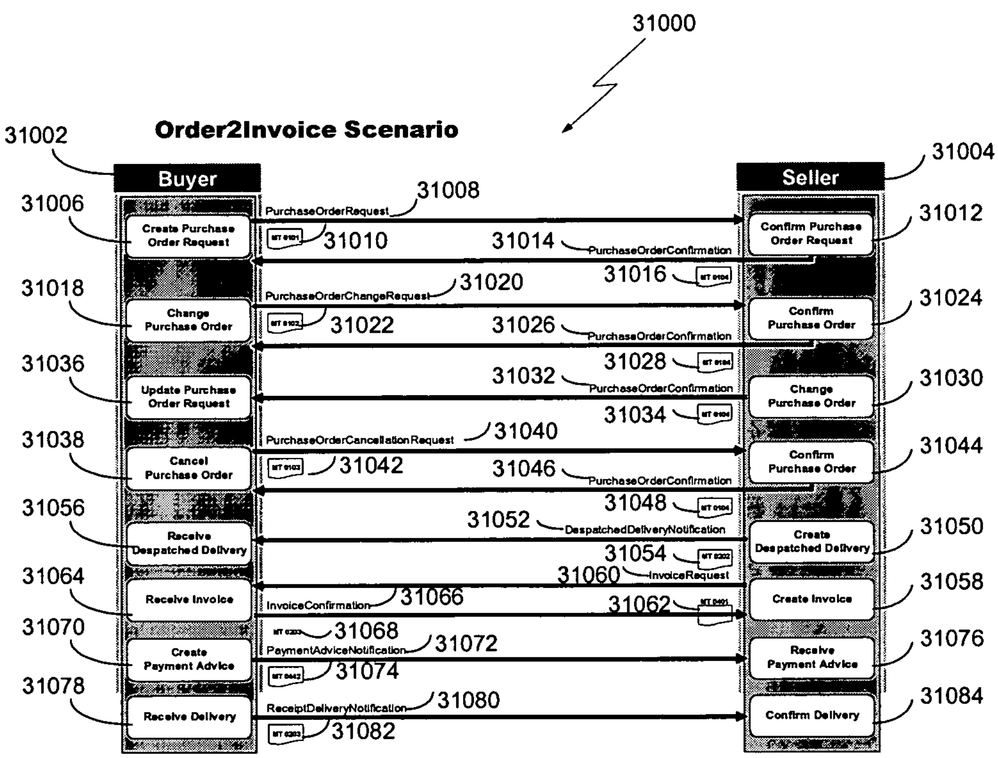
Figure 311:
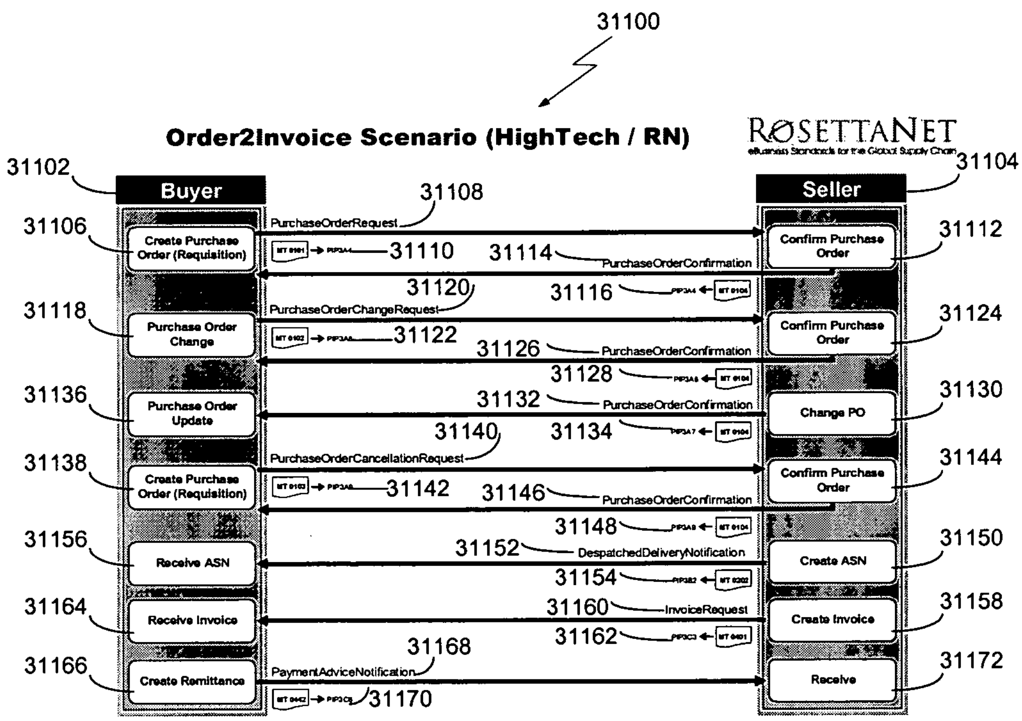
Figure 312:
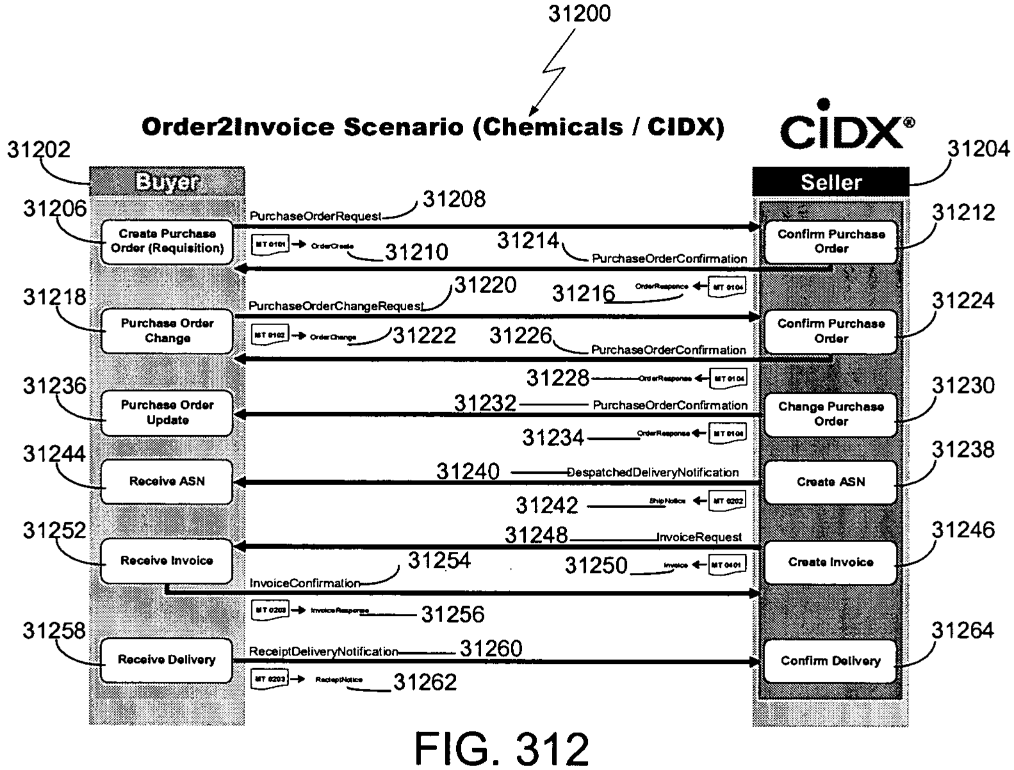
Figure 359:
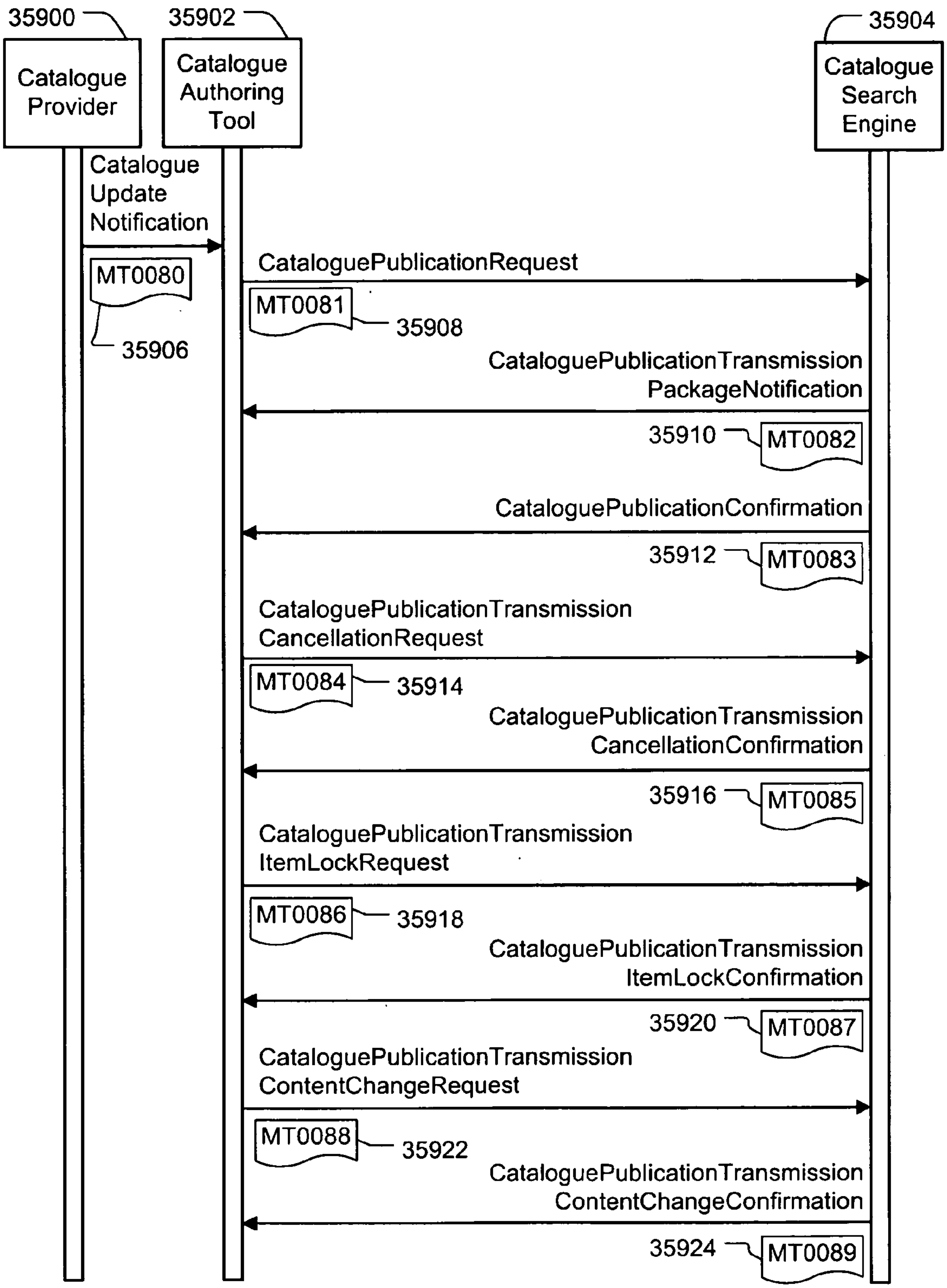
Figure 360A:
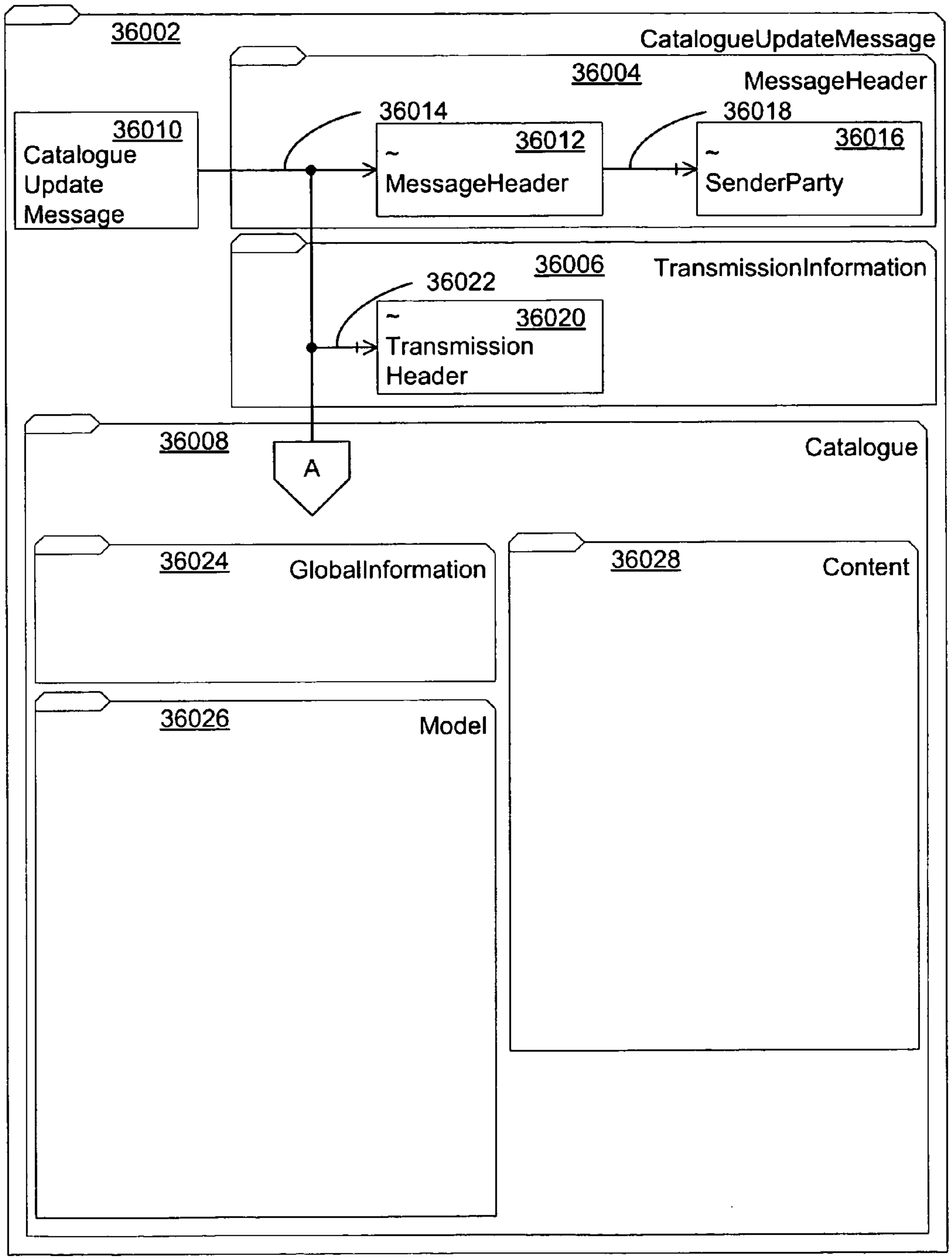
Figure 360B:
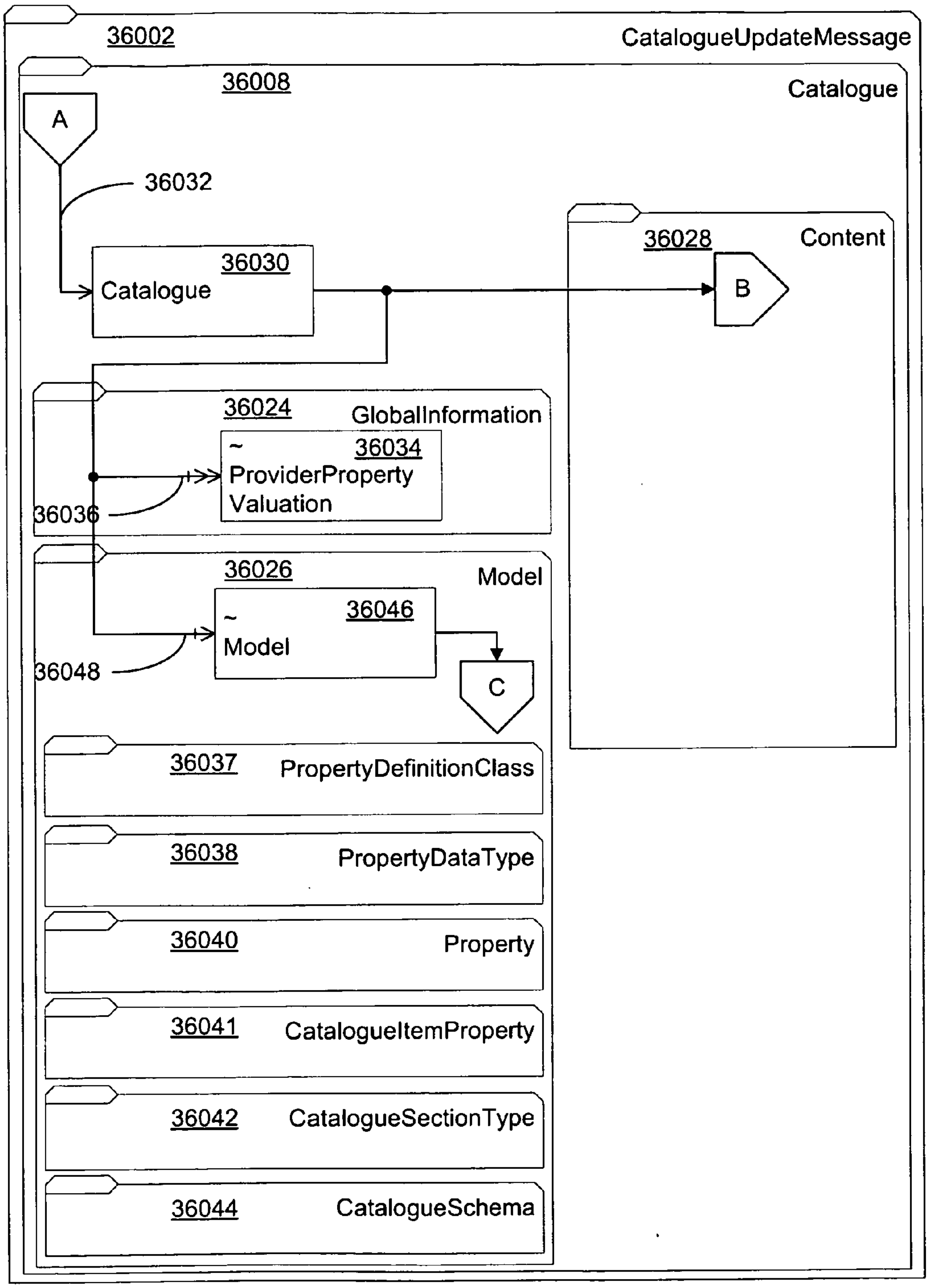
Figure 360C:
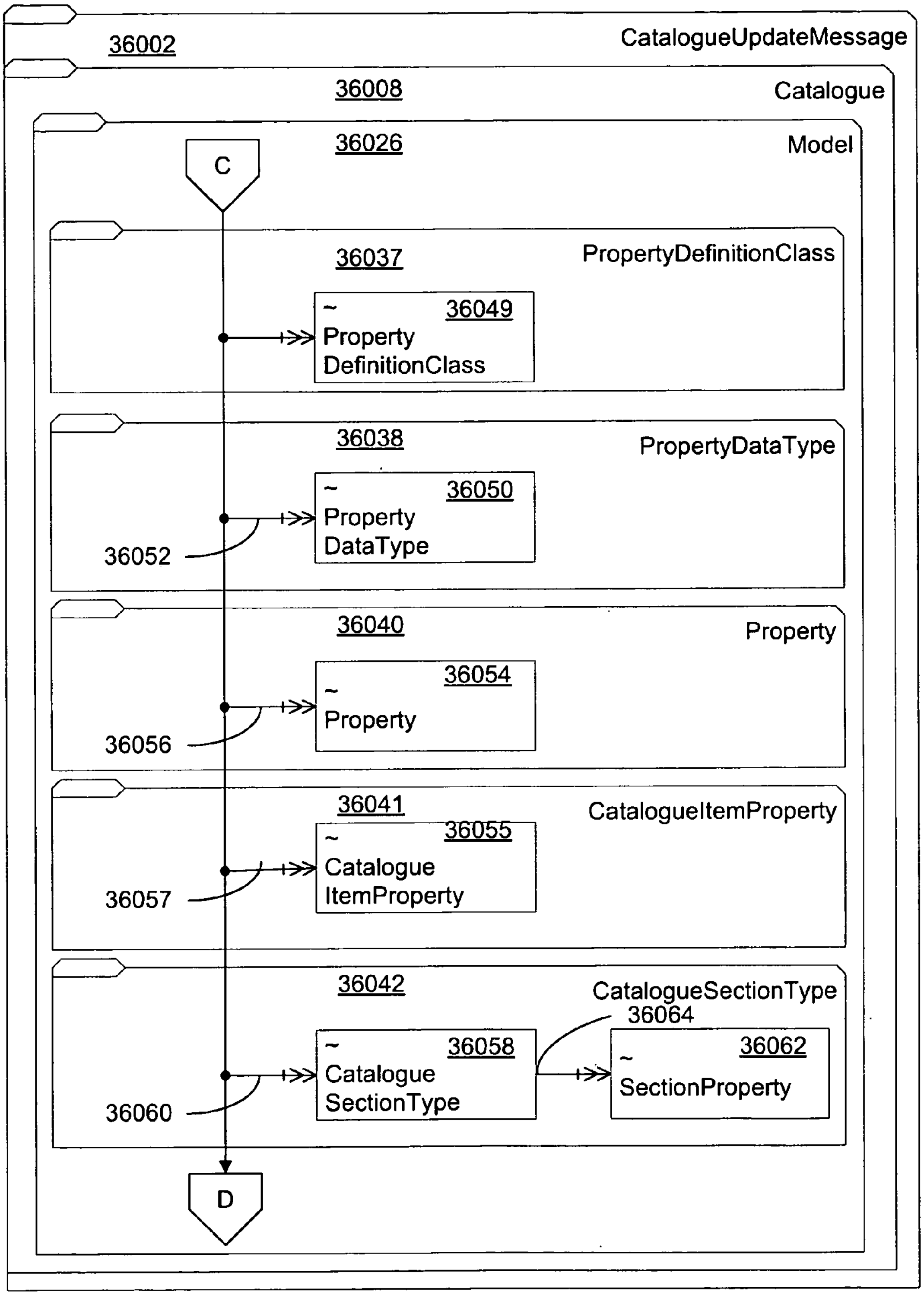
Figure 360D:
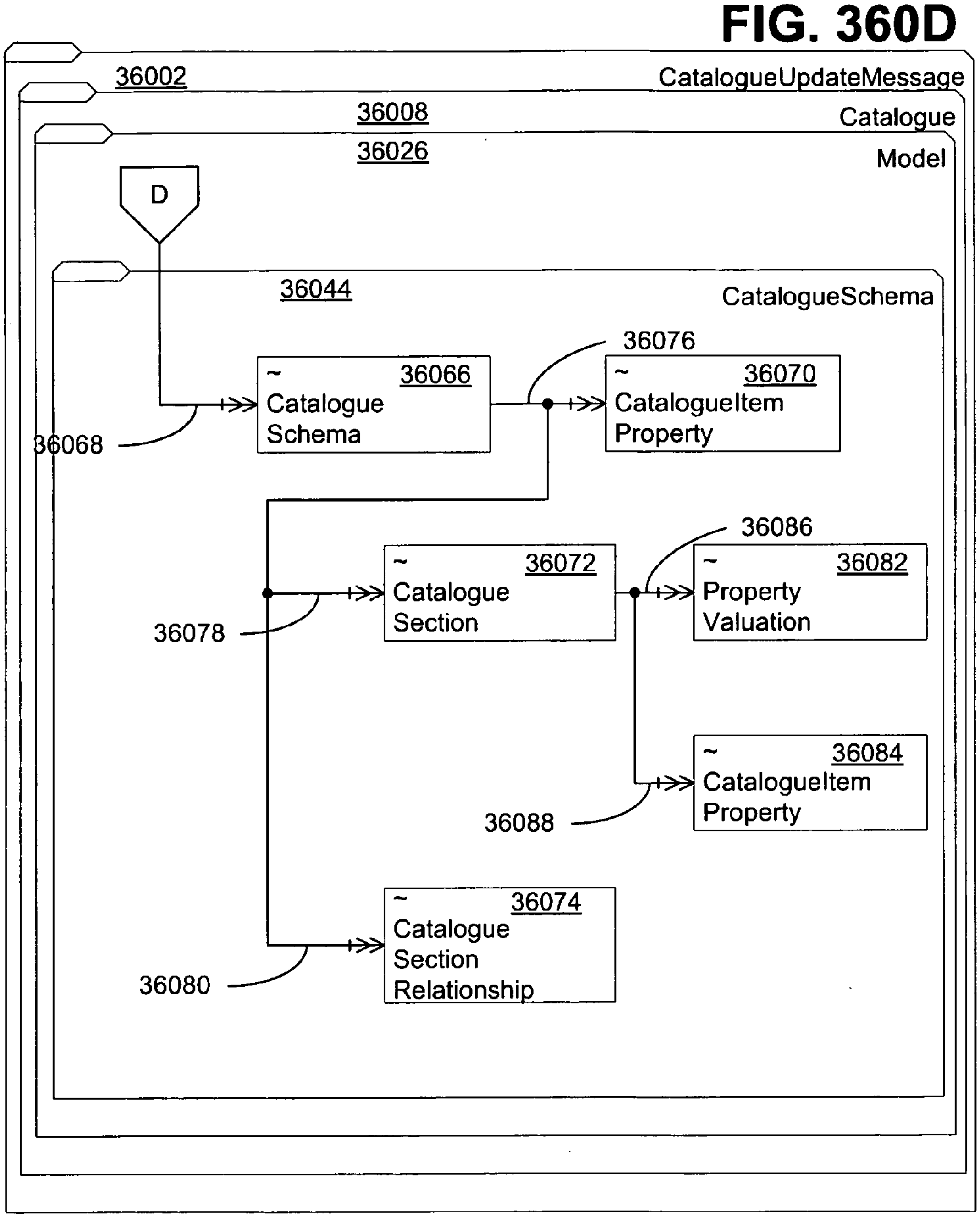
Figure 360E:
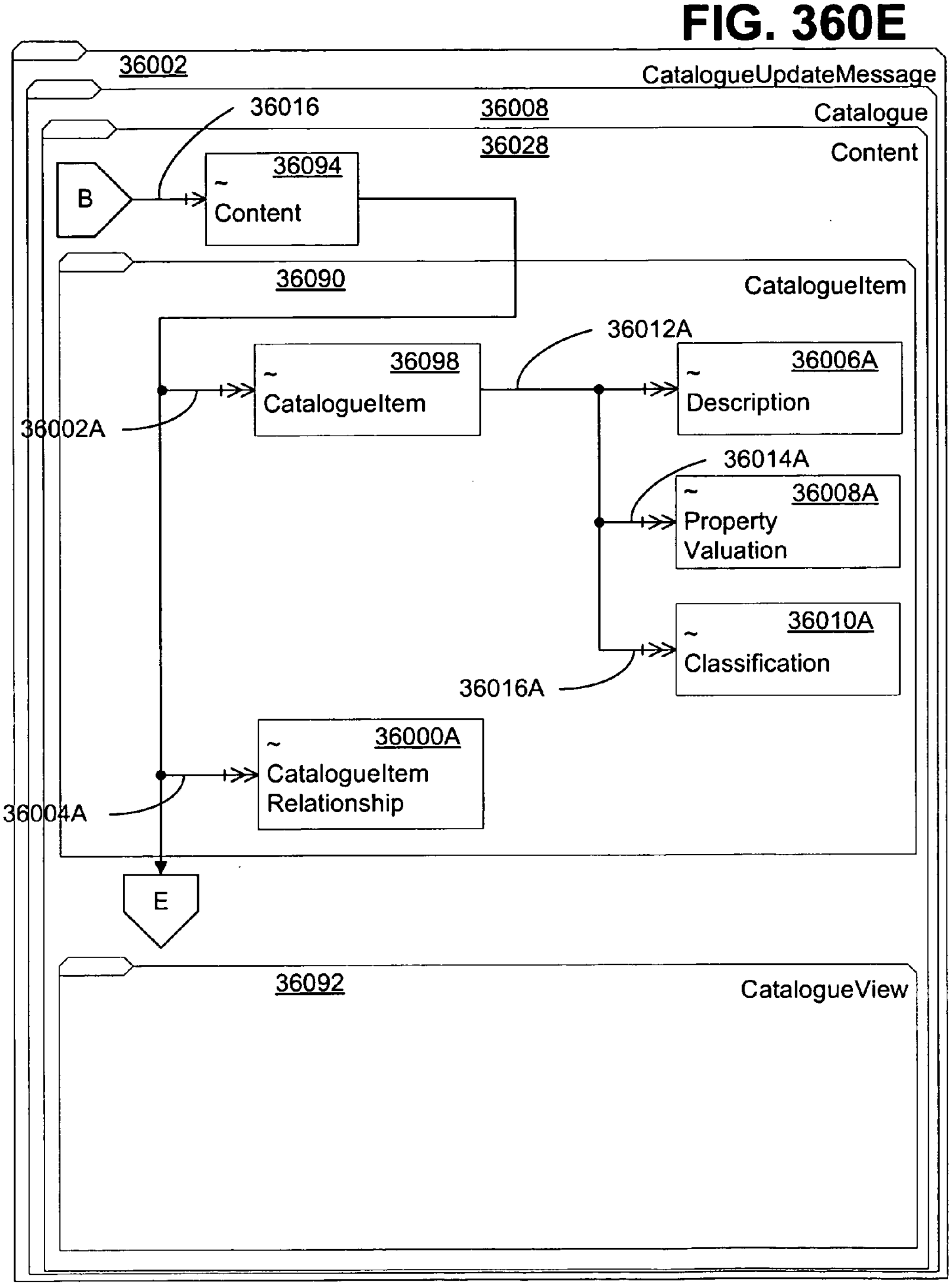
Figure 360F:
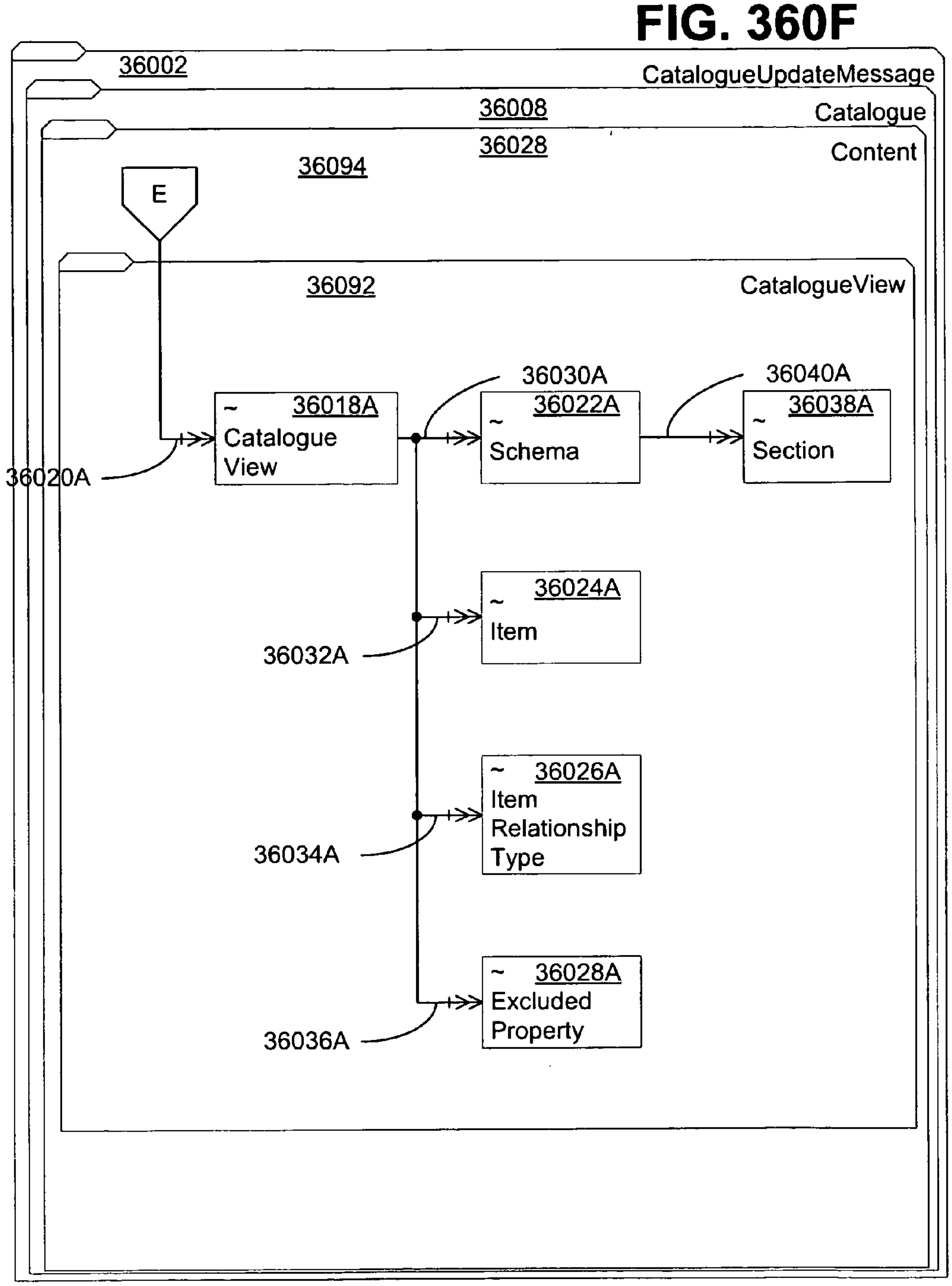
Figure 362A:
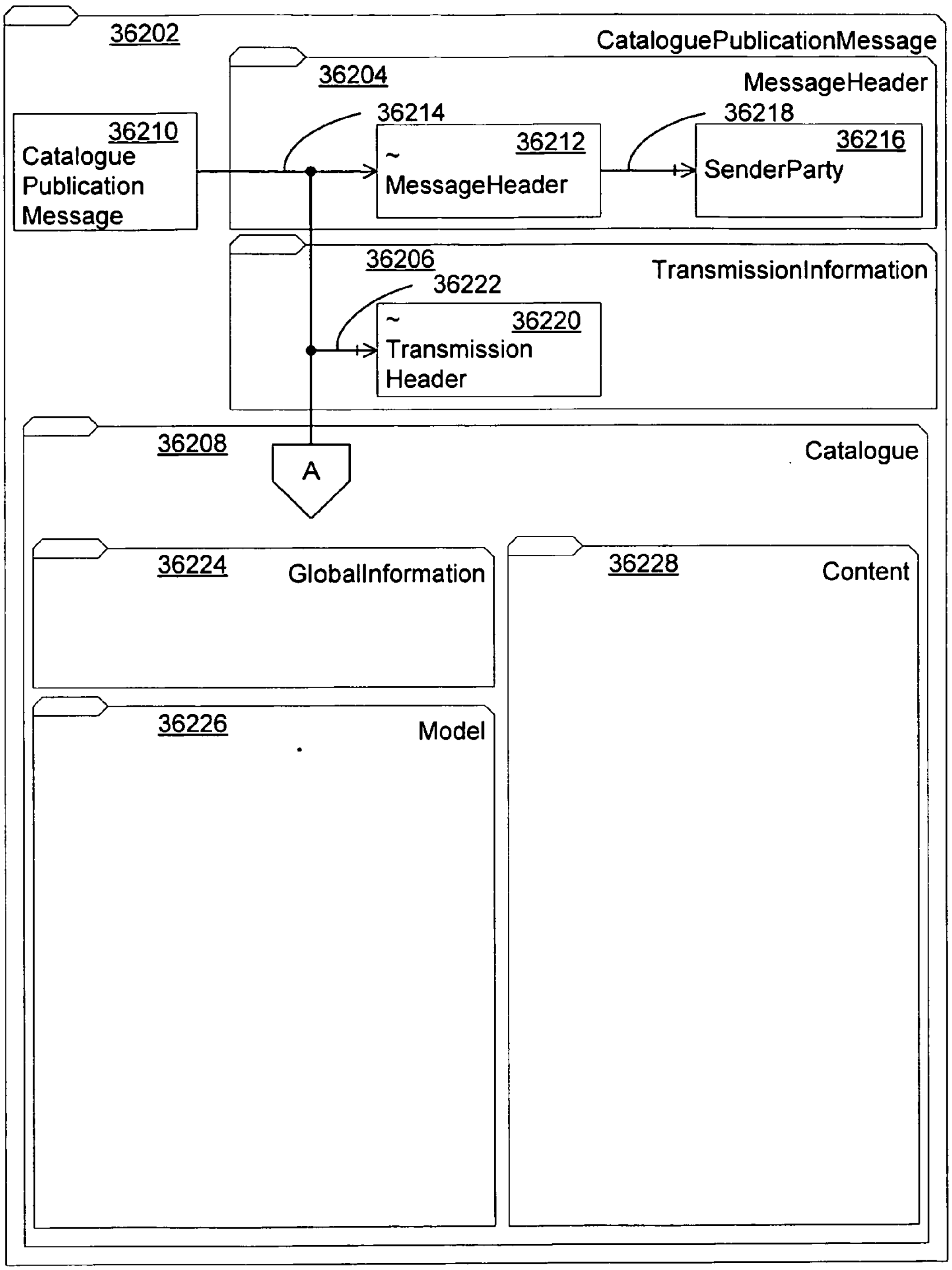
Figure 362B:
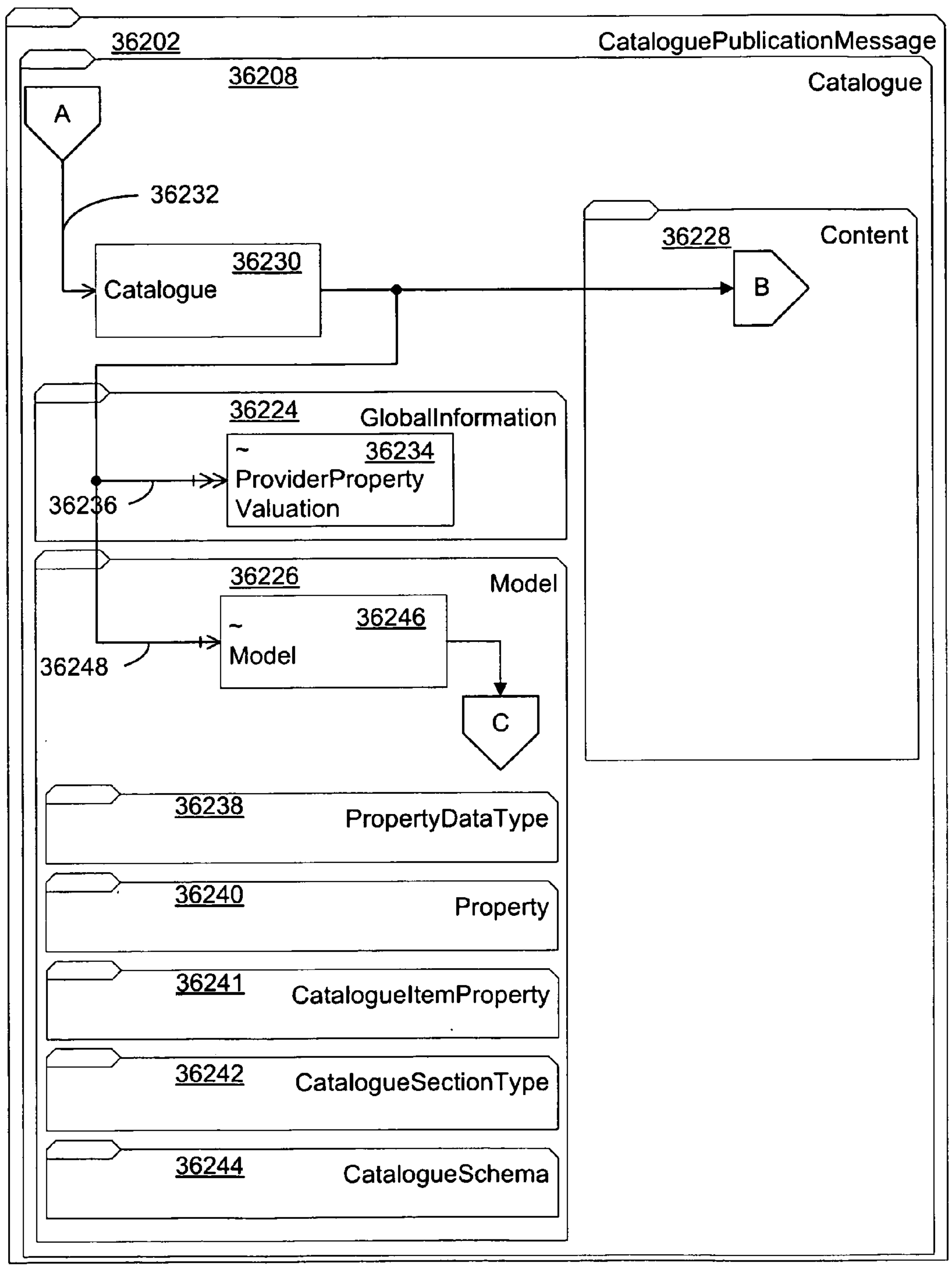
Figure 362C:
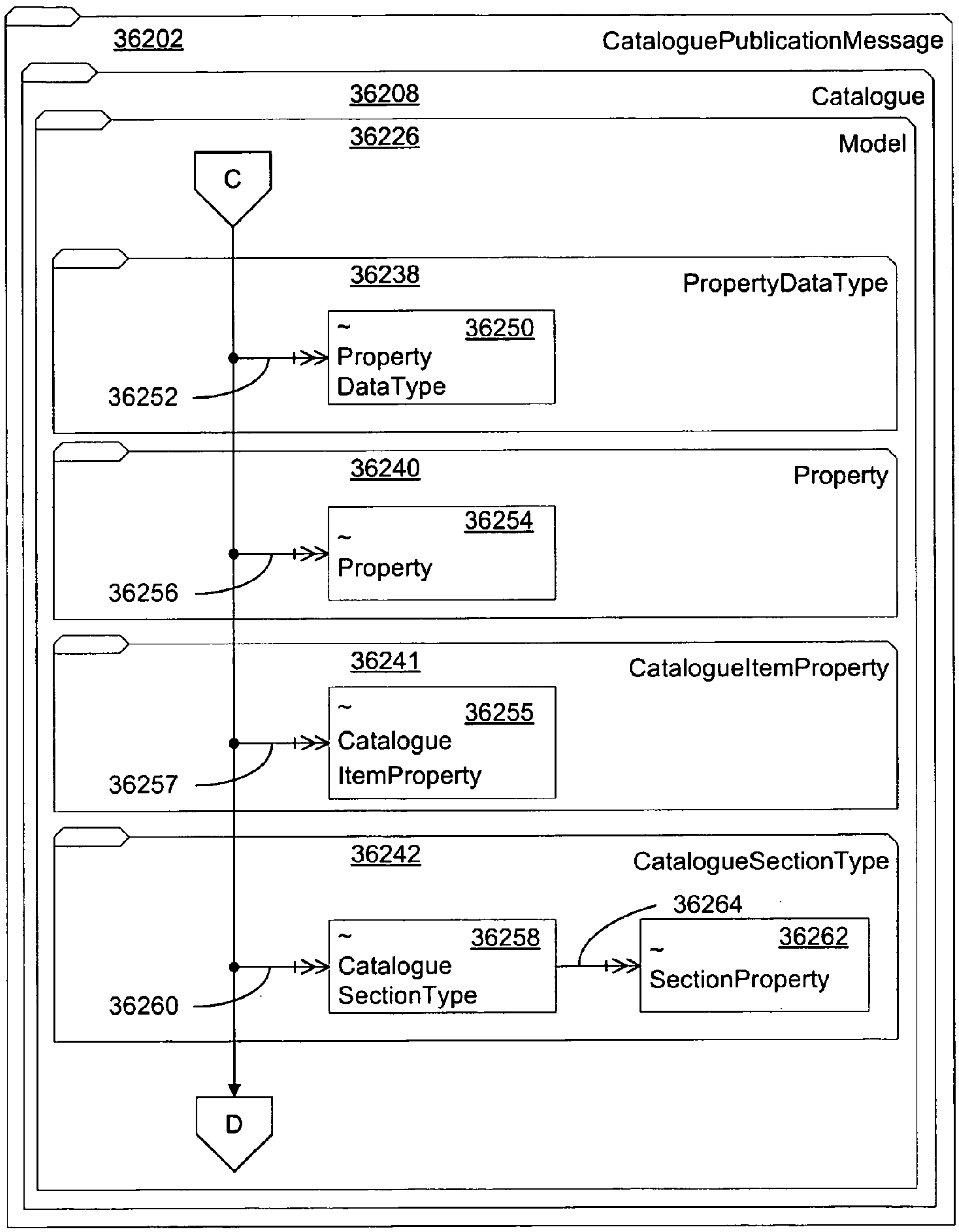
Figure 362D:
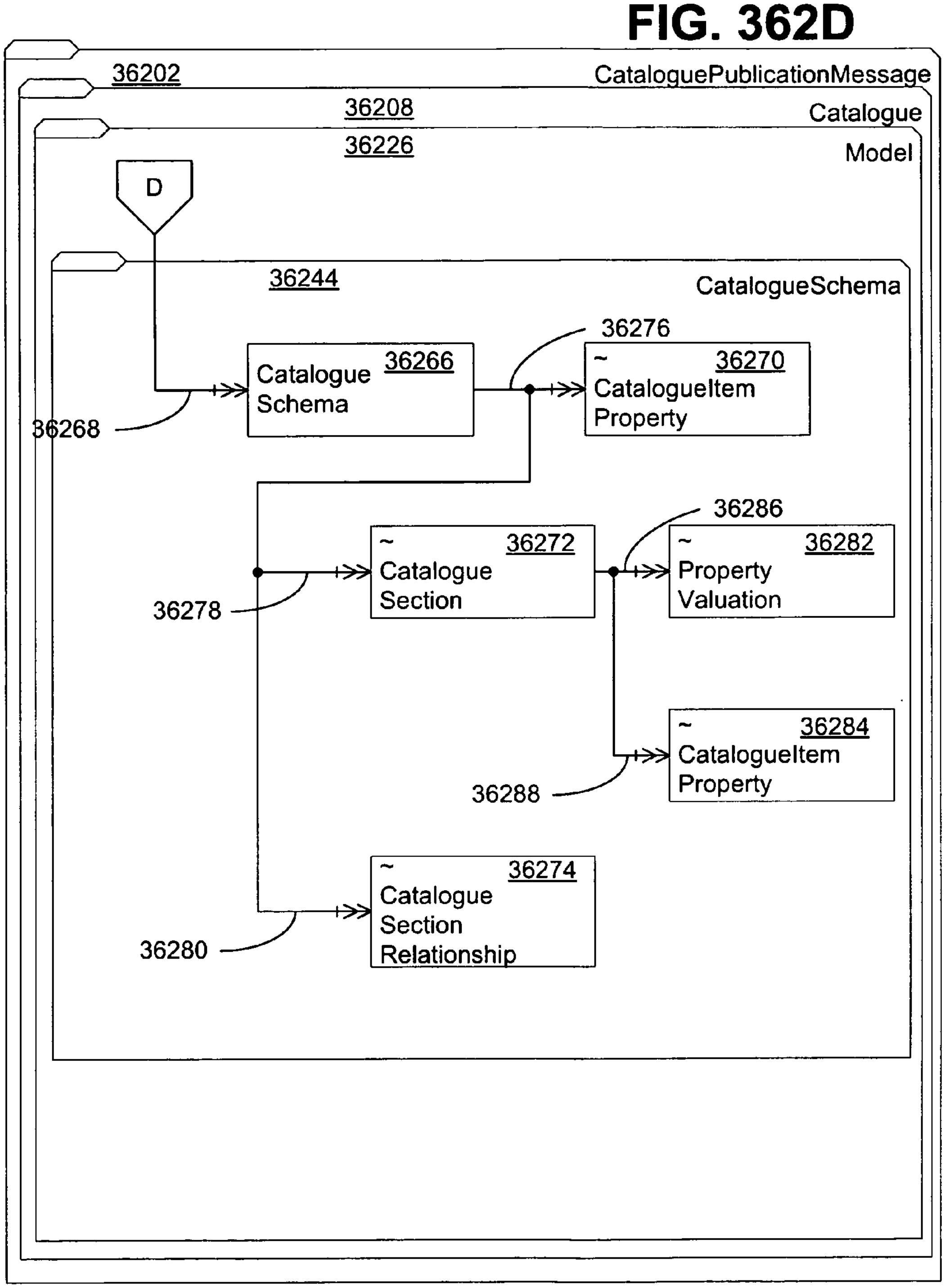
Figure 362E:
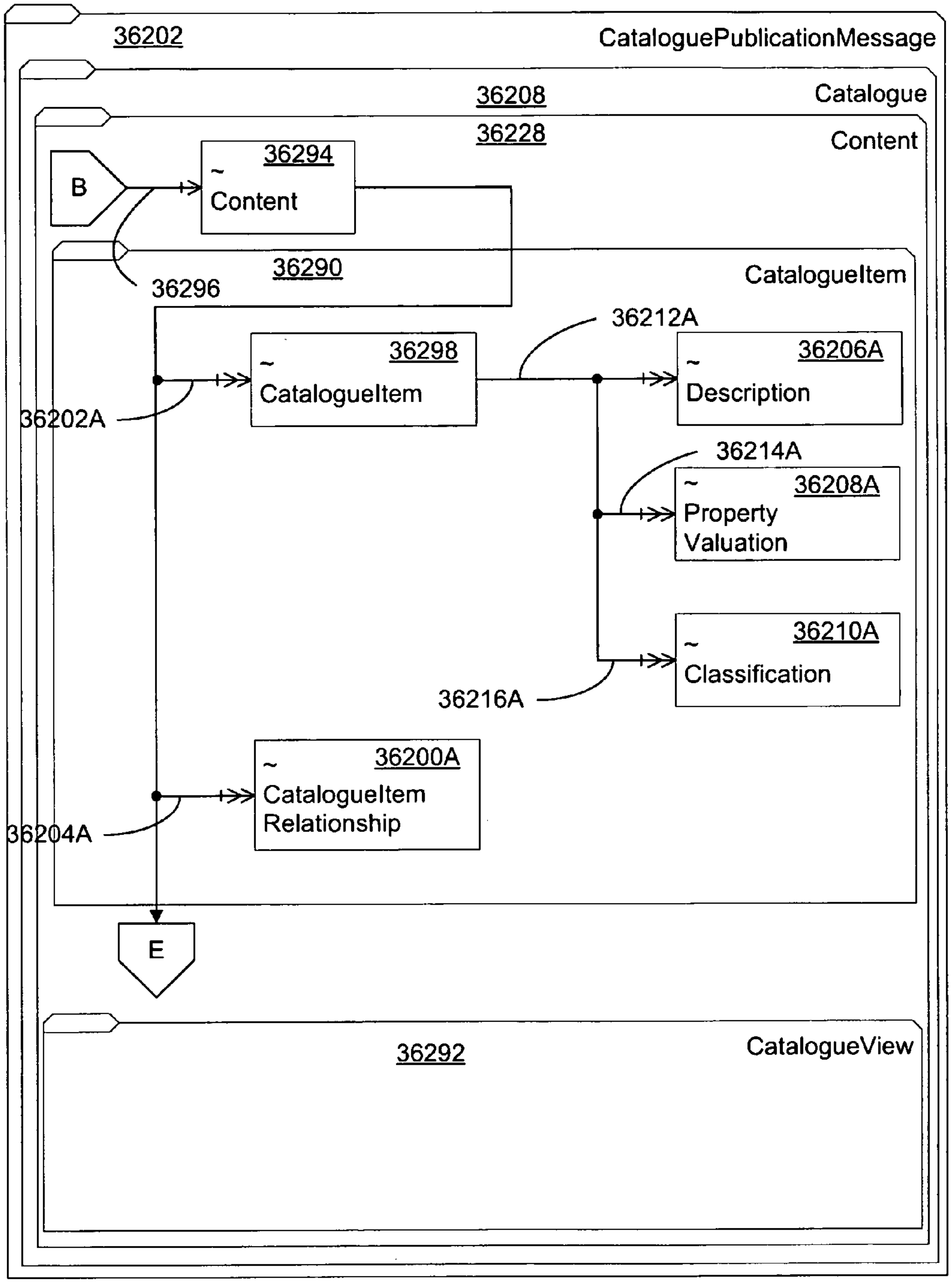
Figure 362F:
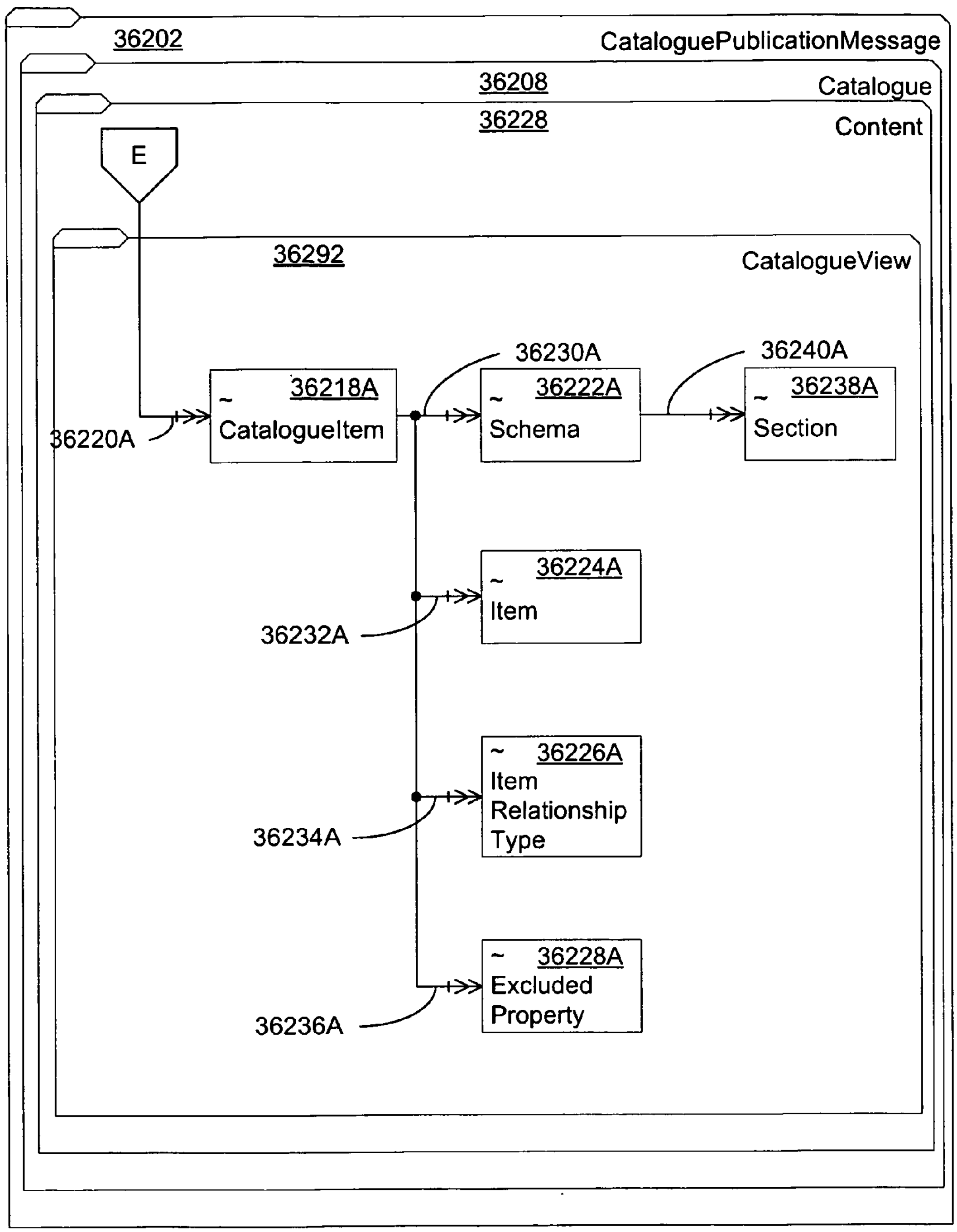
Figure 364:
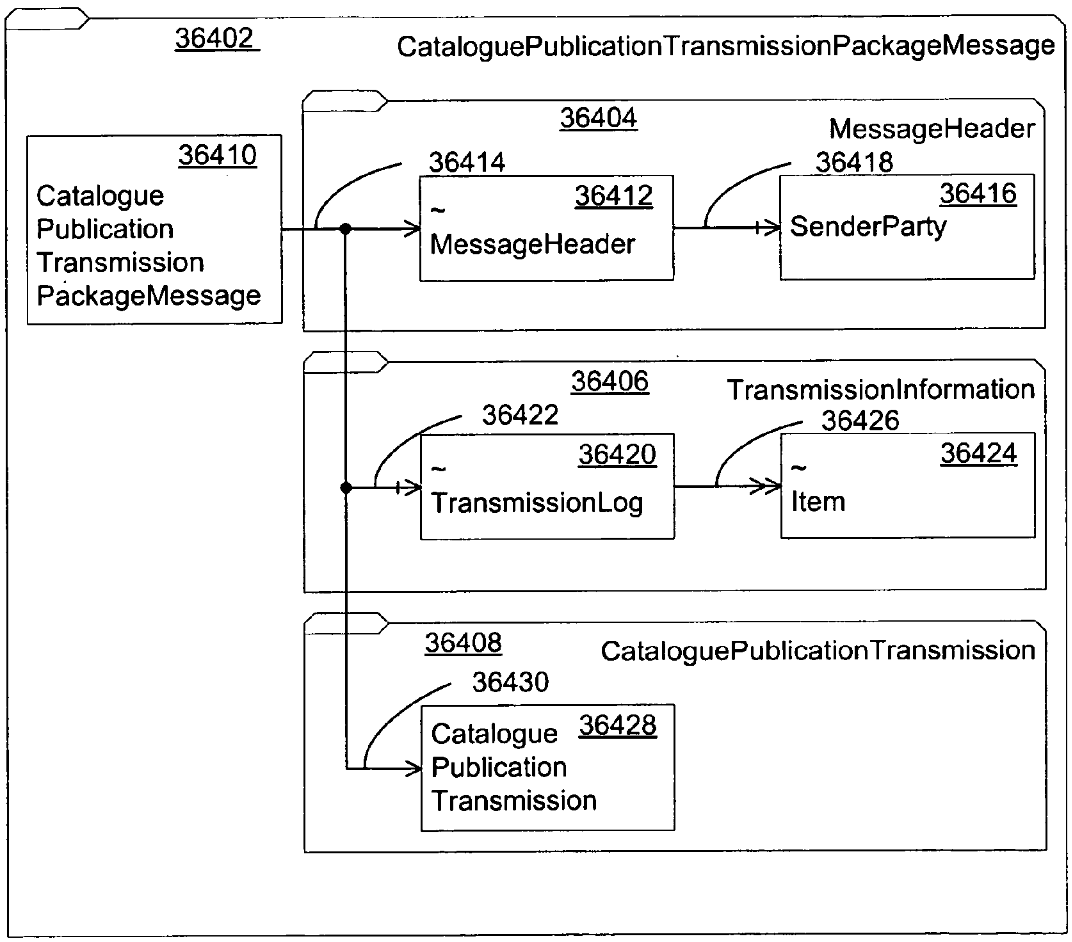
Figure 366:
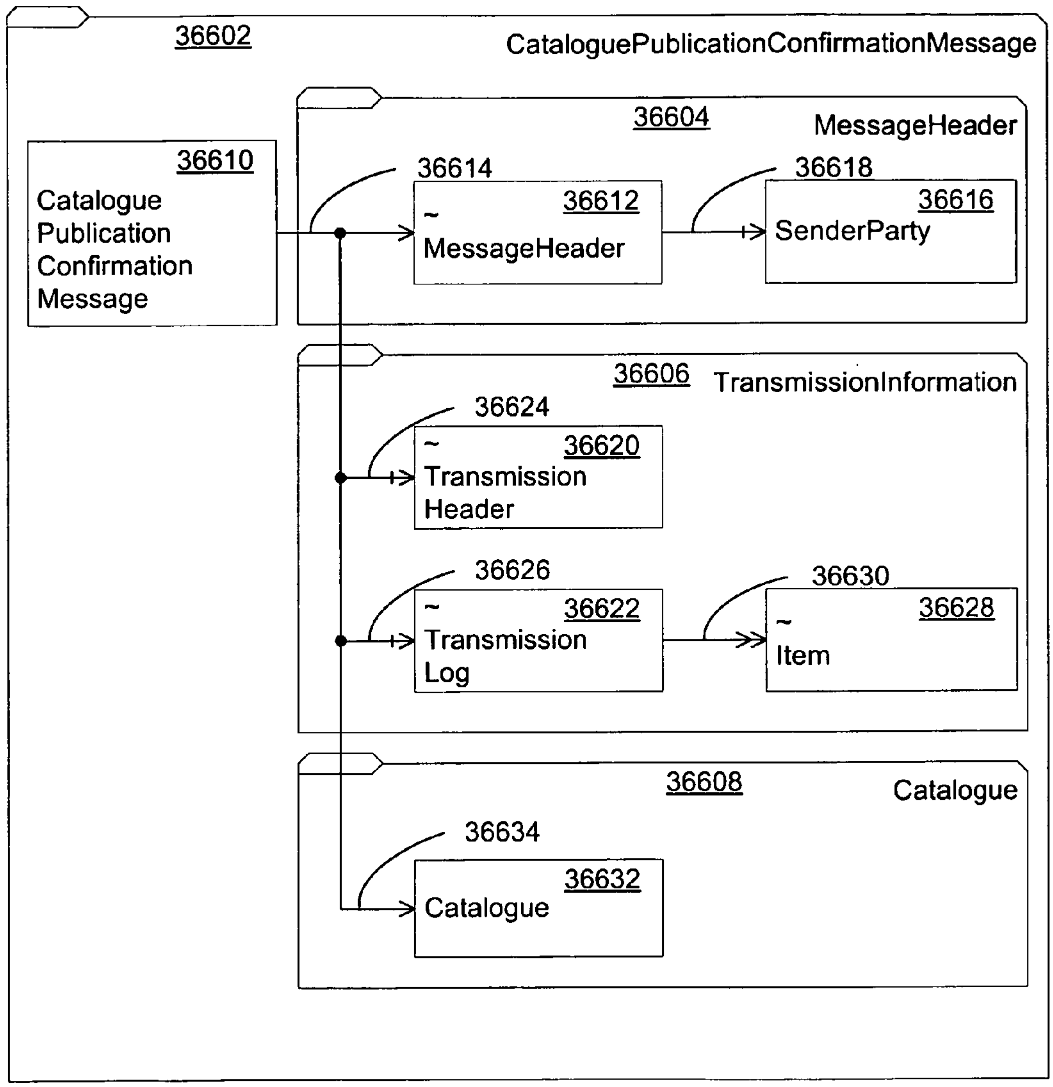
Figure 368:
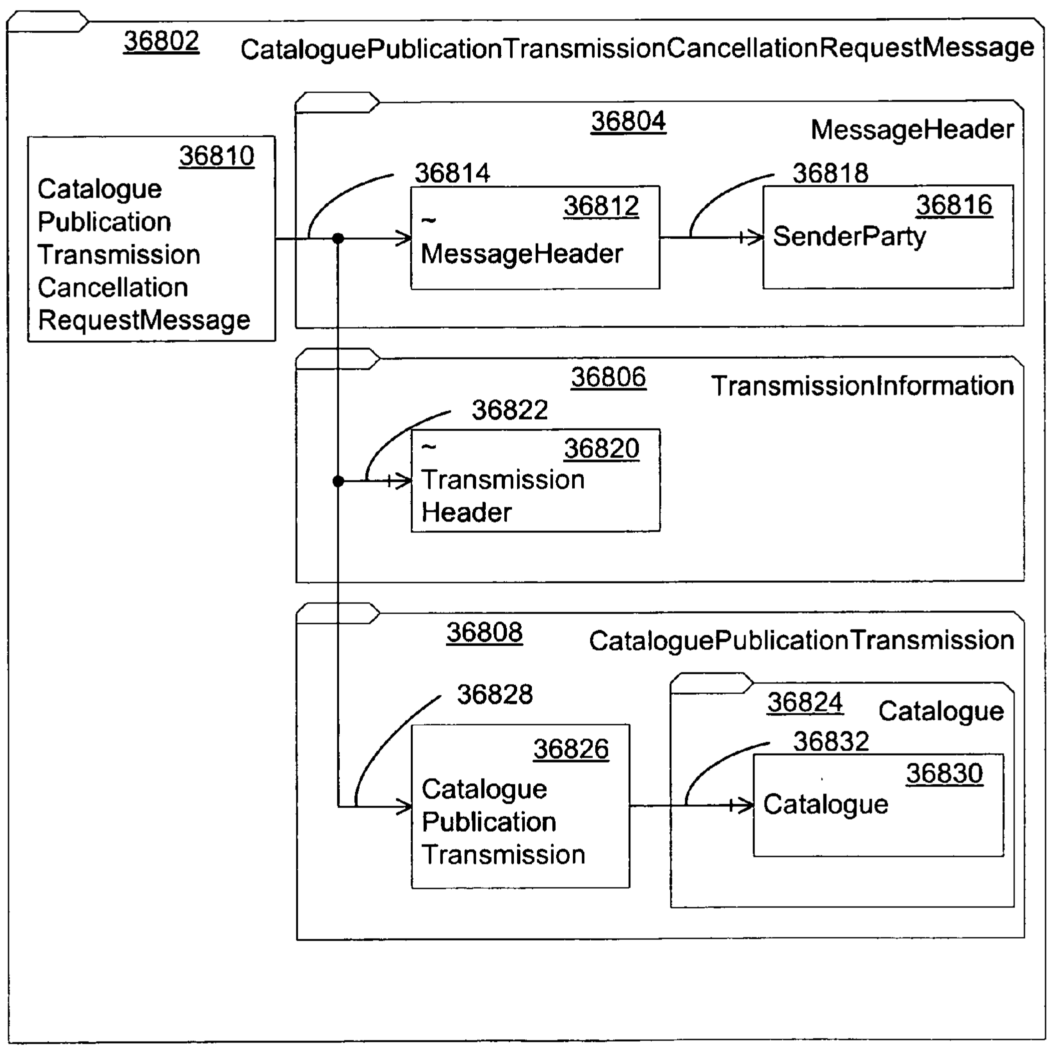
Figure 370:
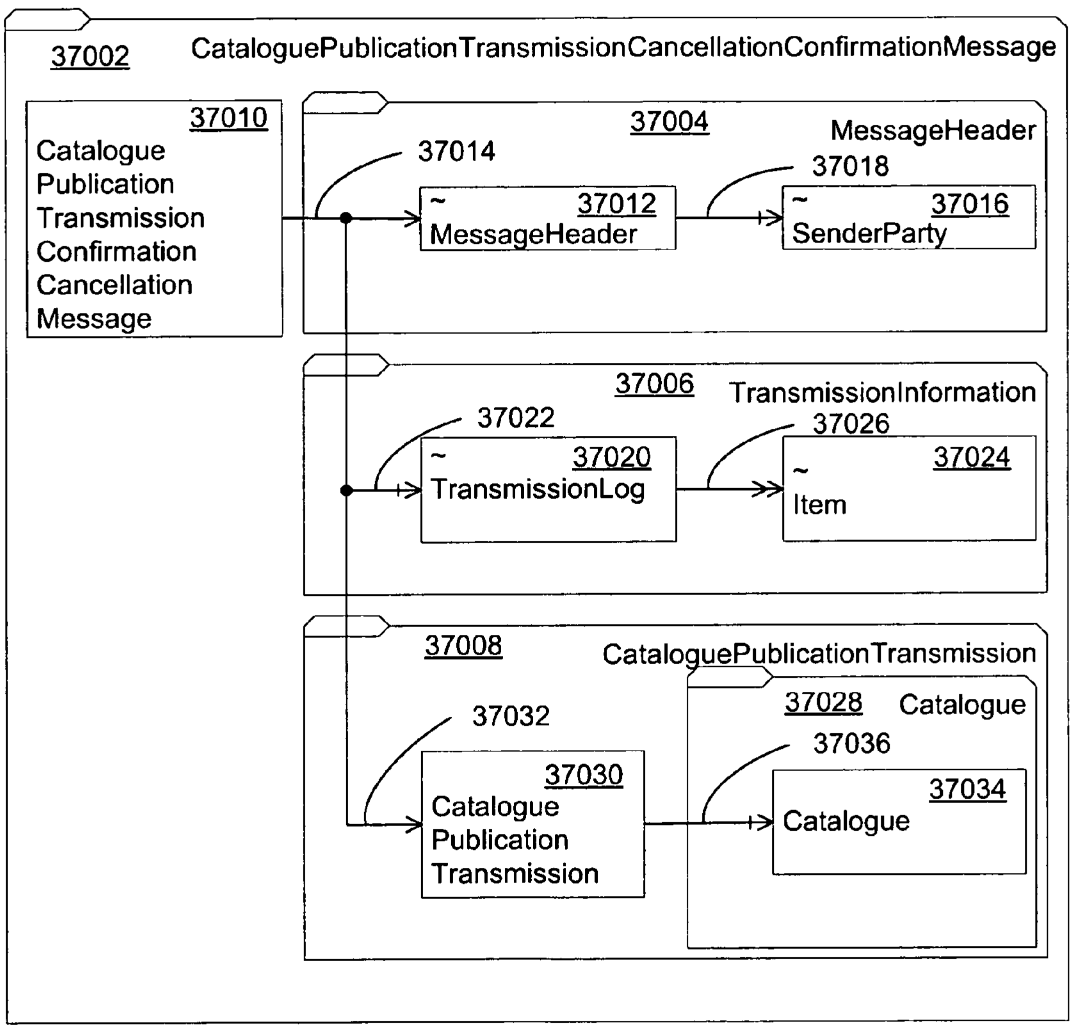
Figure 372:
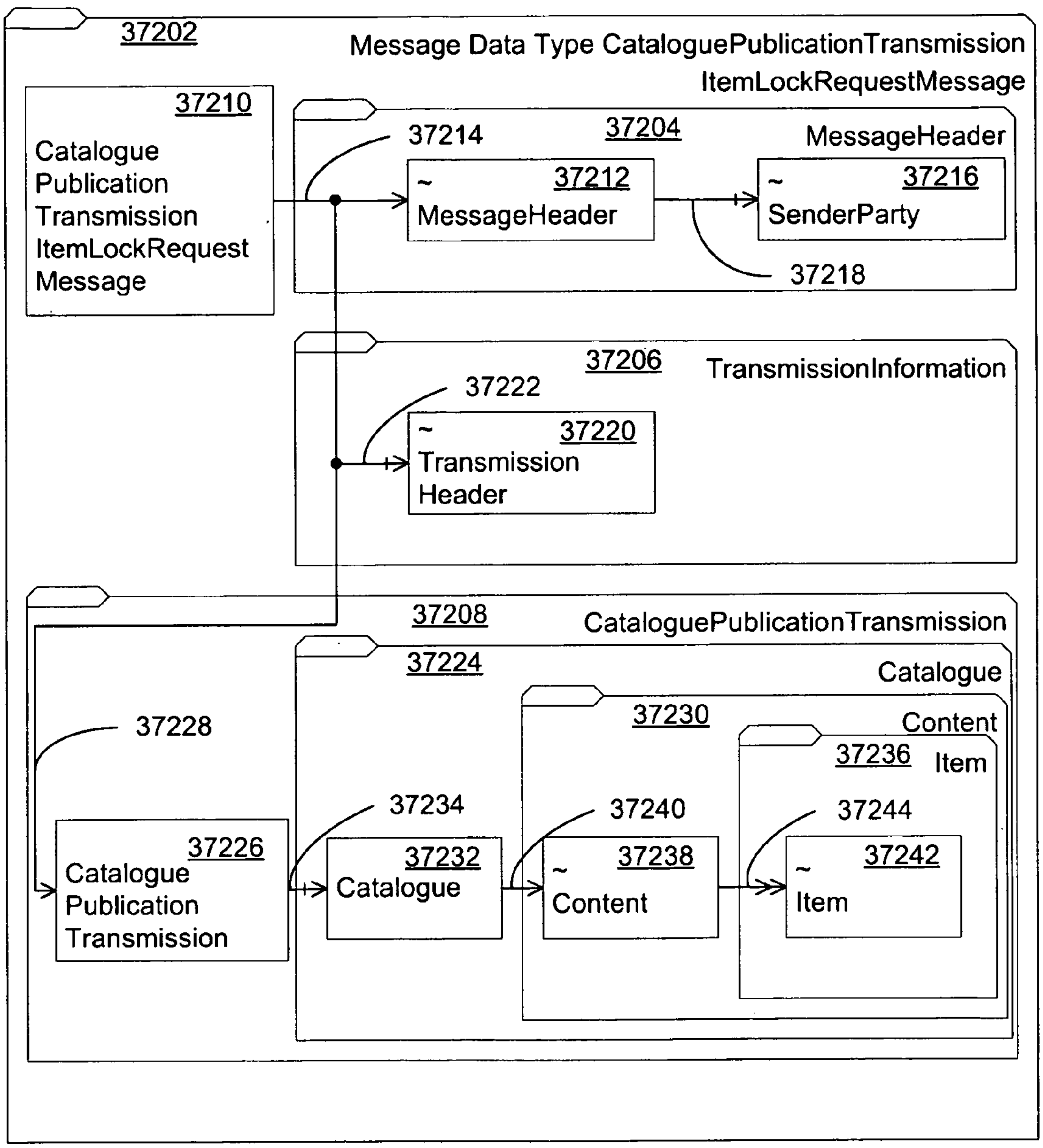
Figure 374:
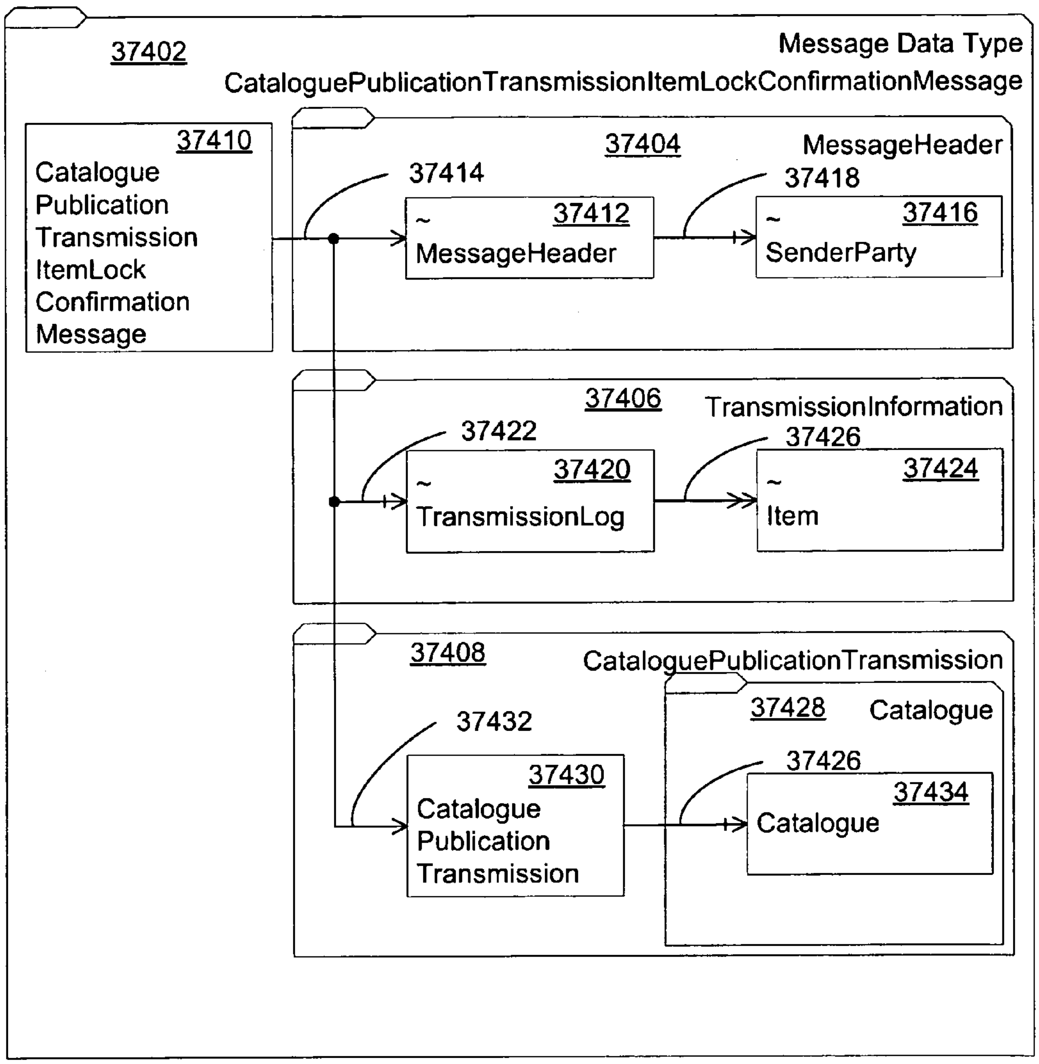
Figure 375A:
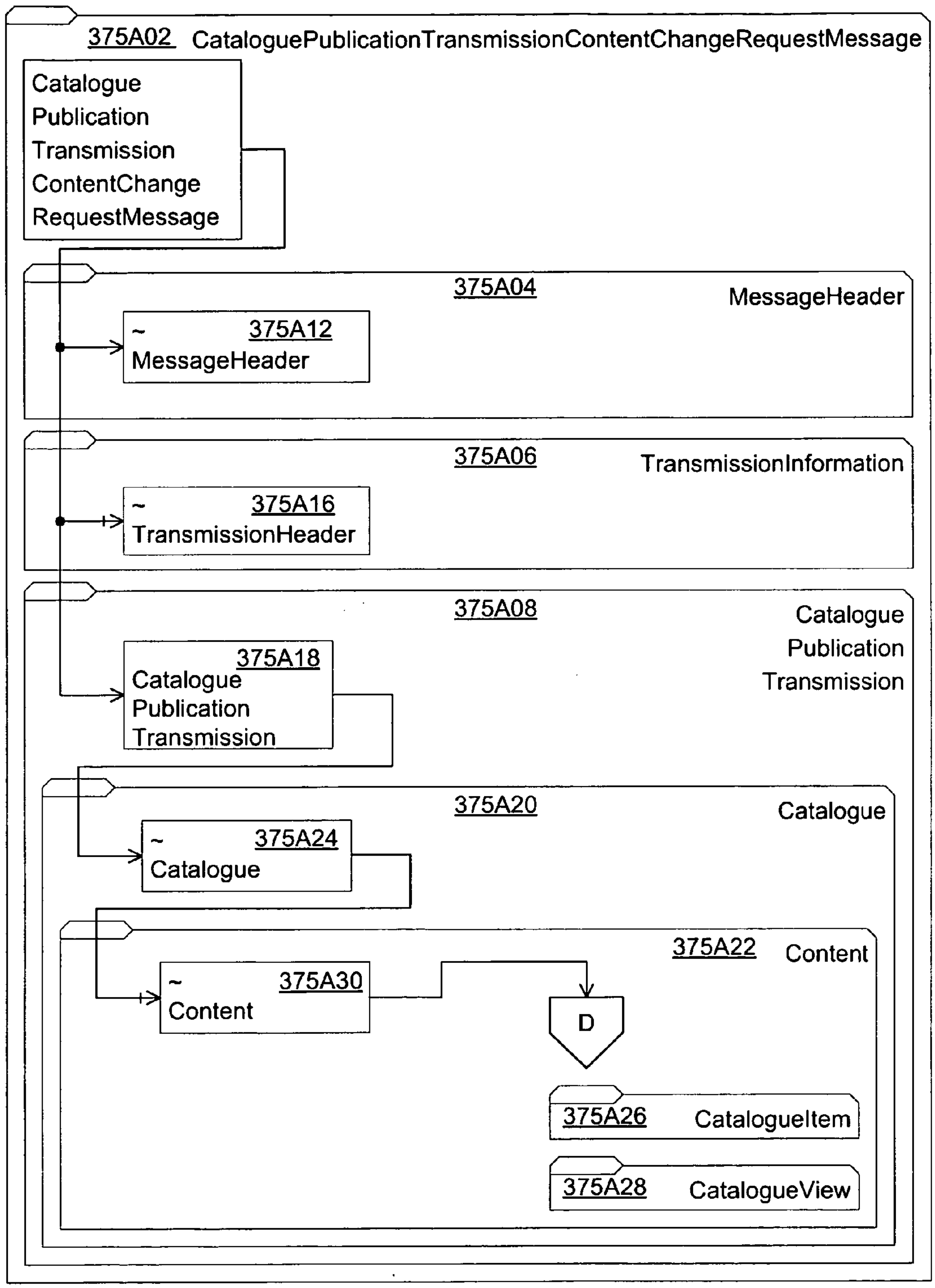
Figure 375A:
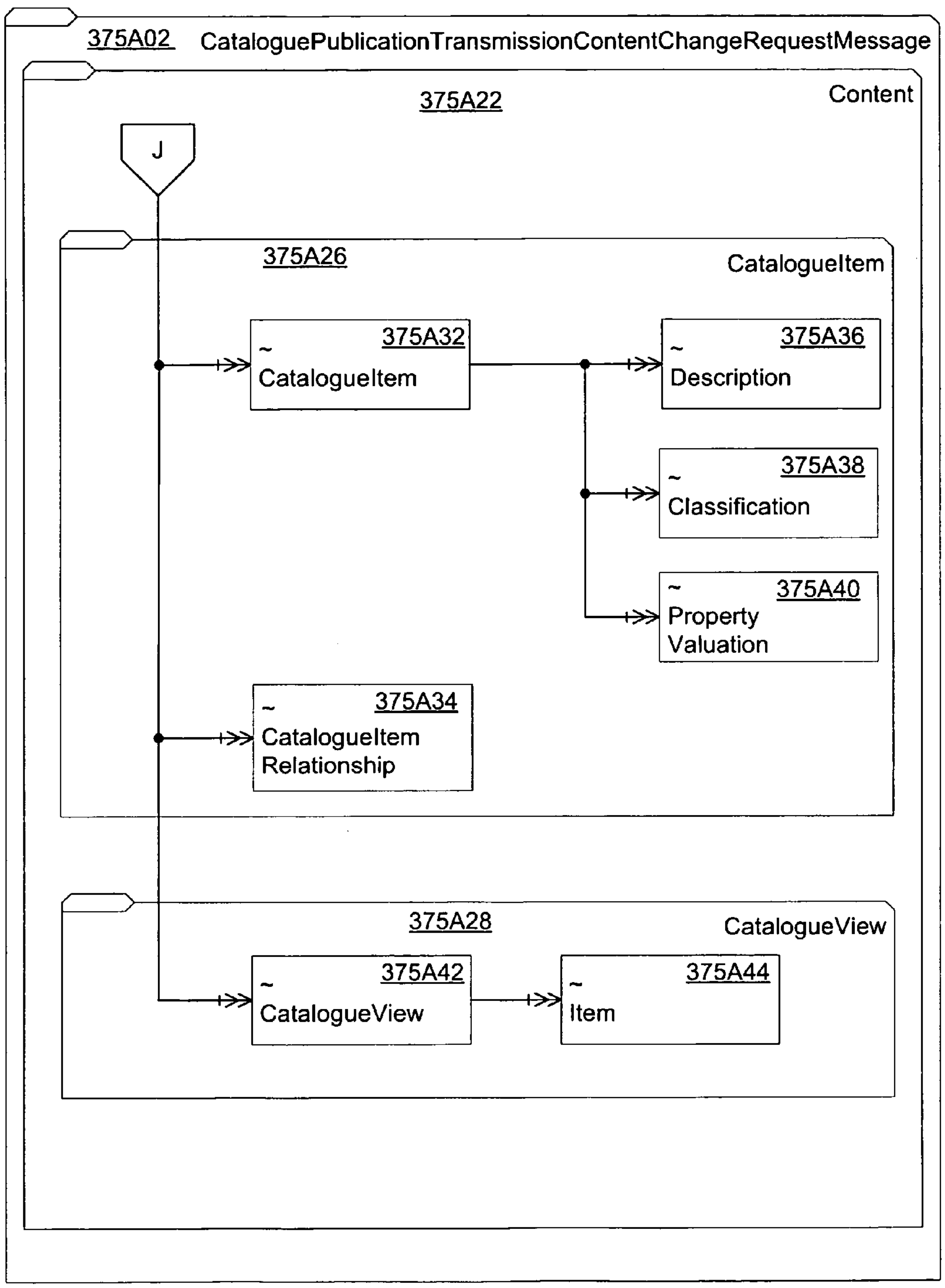
Figure 375B:
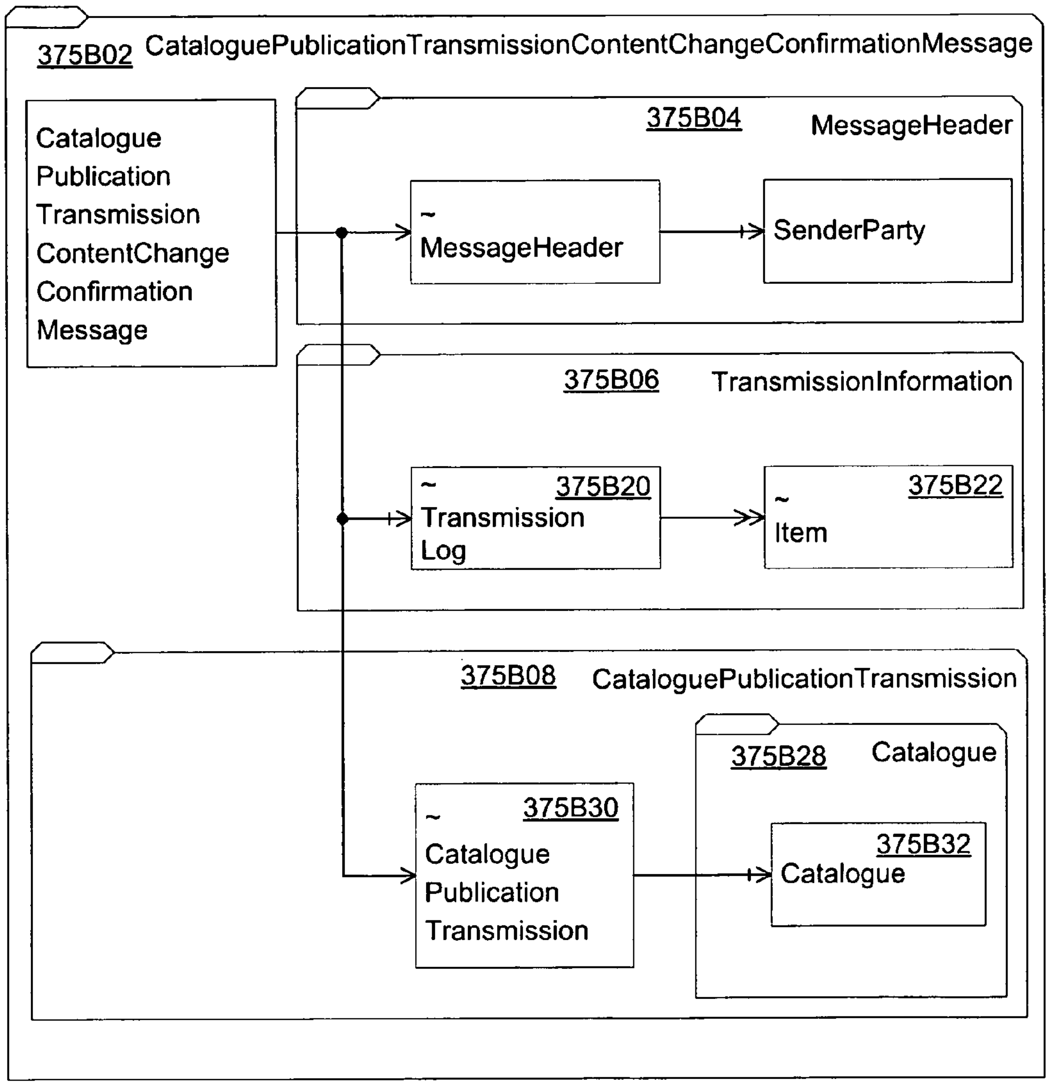
Figure 375B:
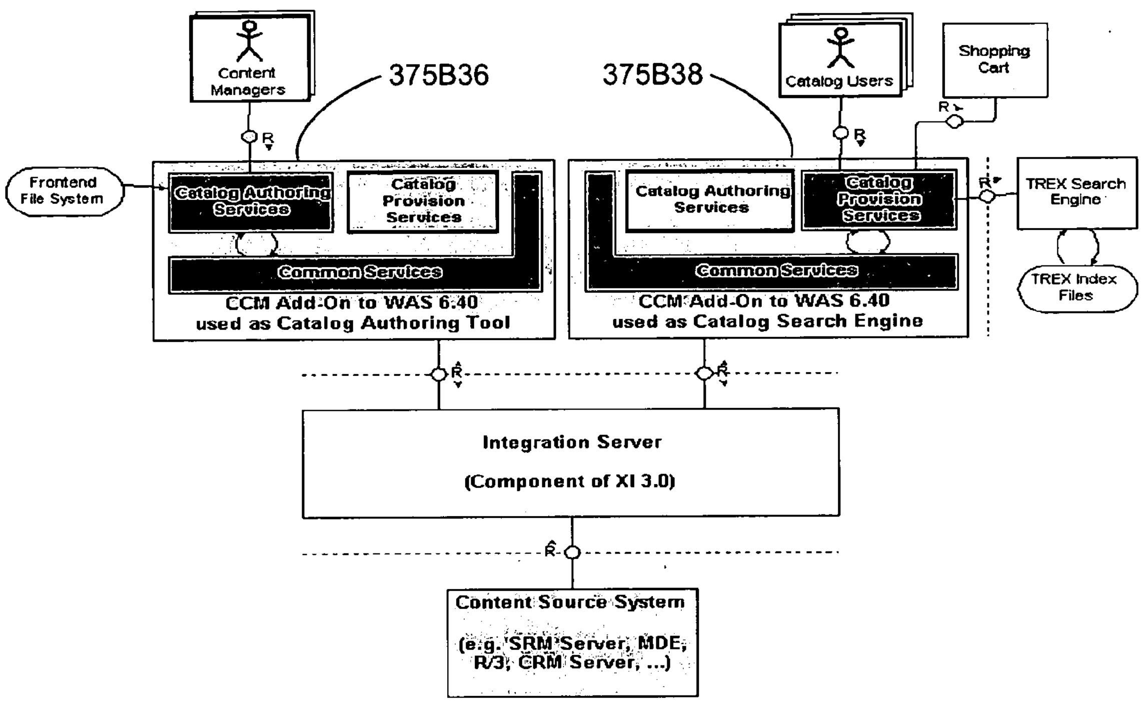

FIGS. 266A-B depict a flow diagram of the steps performed to create a business object model in accordance with methods and systems consistent with the subject matter described herein;

FIGS. 267A-NN depict the business object model in accordance with methods and systems consistent with the subject matter described herein;

FIG. 268 depicts the message choreography for the Invoice interfaces in accordance with methods and systems consistent with the subject matter described herein;

FIGS. 269A-F depict a flow diagram of the steps performed to generate an interface from the business object model in accordance with methods and systems consistent with the subject matter described herein;

FIGS. 270A-C depict examples of package templates in accordance with methods and systems consistent with the subject matter described herein;

FIG. 271 depicts the package template of FIG. 270A after the removal of a package in accordance with methods and systems consistent with the subject matter described herein;

FIG. 272 depicts an entity template for the party package from the business object model in accordance with methods and systems consistent with the subject matter described herein;

FIG. 273 depicts the entity template for the party package of FIG. 272 after removal of an entity in accordance with methods and systems consistent with the subject matter described herein;

FIG. 274 depicts the party package of FIG. 272 after removal of the nonessential entities for the Invoice Request in accordance with methods and systems consistent with the subject matter described herein;

FIG. 275 depicts a portion of the business object model in accordance with methods and systems consistent with the subject matter described herein;

FIG. 276 depicts a further portion of the business object model in accordance with methods and systems consistent with the subject matter described herein;

FIG. 277 depicts the package template of FIG. 270A after the removal of the nonessential packages for the Invoice Request in accordance with methods and systems consistent with the subject matter described herein;

FIG. 278 depicts package template of FIG. 277 after the "business transaction document" is changed in accordance with methods and systems consistent with the subject matter described herein;

FIGS. 279A-N depict a data model for Invoice interfaces in accordance with methods and systems consistent with the subject matter described herein;

FIGS. 280A-K depict an element structure for Invoice interfaces in accordance with methods and systems consistent with the subject matter described herein;

FIG. 281 depicts an example illustrating the transmittal of a business document in accordance with methods and systems consistent with the subject matter described herein;

FIG. 282 depicts an interface proxy in accordance with methods and systems consistent with the subject matter described herein;

FIG. 283 depicts an example illustrating the transmittal of a message using proxies in accordance with methods and systems consistent with the subject matter described herein;

FIG. 284 depicts components of a message in accordance with methods and systems consistent with the subject matter described herein;

FIG. 285 depicts IDs used in a message in accordance with methods and systems consistent with the subject matter described herein;

FIG. 286 depicts a reference to previous messages in accordance with methods and systems consistent with the subject matter described herein;

FIG. 287 depicts a reference to business documents from previous transactions in accordance with methods and systems consistent with the subject matter described herein;

FIG. 288 depicts a message choreography for Purchase Requirement interfaces in accordance with methods and systems consistent with the subject matter described herein;

FIGS. 289A-H depict a data model for Purchase Requirement interfaces in accordance with methods and systems consistent with the subject matter described herein;

FIGS. 290A-G depict an element structure for Purchase Requirement interfaces in accordance with methods and systems consistent with the subject matter described herein;

FIG. 291 depicts message choreography for a Source of Supply interface in accordance with methods and systems consistent with the subject matter described herein;

FIGS. 292A-C depict a data model for the Source of Supply interface in accordance with methods and systems consistent with the subject matter described herein;

FIGS. 293A-D depict an element structure for the Source of Supply interface in accordance with methods and systems consistent with the subject matter described herein;

FIG. 294 depicts a message choreography for Purchase Order interfaces in accordance with methods and systems consistent with the subject matter described herein;

FIGS. 295A-P depict the data model for the Purchase Order interfaces in accordance with methods and systems consistent with the subject matter described herein;

FIG. 296 depicts a data mode for the Purchase Order Cancellation interfaces in accordance with methods and systems consistent with the subject matter described herein;

FIGS. 297A-ZA depict an element structure for the Purchase Order interfaces in accordance with methods and systems consistent with the subject matter described herein;

FIG. 298 depicts a message choreography for Service Acknowledgement interfaces in accordance with methods and systems consistent with the subject matter described herein;

FIGS. 299A-J depict a data model for the Service Acknowledgement interfaces in accordance with methods and systems consistent with the subject matter described herein;

FIGS. 300A-O depict an element structure for the Service Acknowledgement interfaces in accordance with methods and systems consistent with the subject matter described herein;

FIG. 301 depicts a message choreography for RFQ interfaces in accordance with methods and systems consistent with the subject matter described herein;

FIGS. 302A-K depict a data model for the RFQ interfaces in accordance with methods and systems consistent with the subject matter described herein;

FIG. 303 depicts a data model for RFQ Cancellation interfaces in accordance with methods and systems consistent with the subject matter described herein;

FIGS. 304A-J depict a data model for Quote interfaces in accordance with methods and systems consistent with the subject matter described herein;

FIGS. 305A-D depict a data model for RFQ Result interfaces in accordance with methods and systems consistent with the subject matter described herein;

FIGS. 306A-R depict an element structure for RFQ interfaces in accordance with methods and systems consistent with the subject matter described herein;

FIGS. 307A-C depict an element structure for RFQ Cancellation interfaces in accordance with methods and systems consistent with the subject matter described herein;

FIGS. 308A-N depict an element structure for Quote interfaces in accordance with methods and systems consistent with the subject matter described herein;

FIGS. 309A-D depict an element structure for RFQ Request interfaces in accordance with methods and systems consistent with the subject matter described herein;

FIG. 310 depicts a message choreography for Order to Invoice in accordance with methods and systems consistent with the subject matter described herein;

FIG. 311 depicts a message choreography for the Order to Invoice provided by RosettaNet;

FIG. 312 depicts a message choreography for the Order to Invoice provided by CIDX;

FIGS. 313-317 depict a hierarchization process in accordance with methods and systems consistent with the subject matter described herein;

FIGS. 318-358QG depict additional data type structures in accordance with methods and systems consistent with the subject matter described herein;

FIG. 359 depicts a message choreography for the Catalogue interfaces in accordance with methods and systems consistent with the subject matter described herein;

FIGS. 360A-F depict a data model for Catalogue Update Message in accordance with methods and systems consistent with the subject matter described herein;

FIGS. 361A-AK depict an element structure for the Catalogue Update Message in accordance with methods and systems consistent with the subject matter described herein;

FIGS. 362A-F depict a data model for Catalogue Publication Message in accordance with methods and systems consistent with the subject matter described herein;

FIGS. 363A-AK depict an element structure for Catalogue Publication Message in accordance with methods and systems consistent with the subject matter described herein;

FIG. 364 depicts a data model for Catalogue Publication Transmission Package Message in accordance with methods and systems consistent with the subject matter described herein;

FIGS. 365A-B depict an element structure for the Catalogue Publication Transmission Package Message in accordance with methods and systems consistent with the subject matter described herein;

FIG. 366 depicts a data model for Catalogue Publication Confirmation Message in accordance with methods and systems consistent with the subject matter described herein;

FIGS. 367A-B depict an element structure for the Catalogue Publication Confirmation Message in accordance with methods and systems consistent with the subject matter described herein;

FIG. 368 depicts a data model for Catalogue Publication Transmission Cancellation Request Message in accordance with methods and systems consistent with the subject matter described herein;

FIGS. 369A-B depict an element structure for Catalogue Publication Transmission Cancellation Request Message in accordance with methods and systems consistent with the subject matter described herein;

FIG. 370 depicts a data model for Catalogue Publication Transmission Cancellation Confirmation Message in accordance with methods and systems consistent with the subject matter described herein;

FIGS. 371A-B depict an element structure for the Catalogue Publication Transmission Cancellation Confirmation Message in accordance with methods and systems consistent with the subject matter described herein;

FIG. 372 depicts a data model for Catalogue Publication Transmission Item Lock Request Message in accordance with methods and systems consistent with the subject matter described herein;

FIGS. 373A-C depict an element structure for the Catalogue Publication Transmission Item Lock Request Message in accordance with methods and systems consistent with the subject matter described herein;

FIG. 374 depicts a data model for Catalogue Publication Transmission Item Lock Confirmation Message in accordance with methods and systems consistent with the subject matter described herein;

FIGS. 375A-B depict an element structure for Catalogue Publication Transmission Item Lock Confirmation Message in accordance with methods and systems consistent with the subject matter described herein;

FIGS. 375AA-AB depict a data model for Catalogue Publication Transmission Content Change Request Message in accordance with methods and systems consistent with the subject matter described herein;

FIG. 375BA depicts a data model for Catalogue Publication Transmission Content Change Confirmation Message in accordance with methods and systems consistent with the subject matter described herein;

FIG. 375BB depicts an illustration of a Catalog Content Management system in accordance with methods and systems consistent with the subject matter described herein;

FIGS. 375CA-CL depict the element structure for a CataloguePublicationTransmission-ContentChangeRequestMessage in accordance with methods and systems consistent with the subject matter described herein:

FIGS. 375DA-B depict the element structure for a CataloguePublicationTransmission-ContentChangeConfirmationMessage in accordance with methods and systems consistent with the subject matter described herein.

Figure 376:
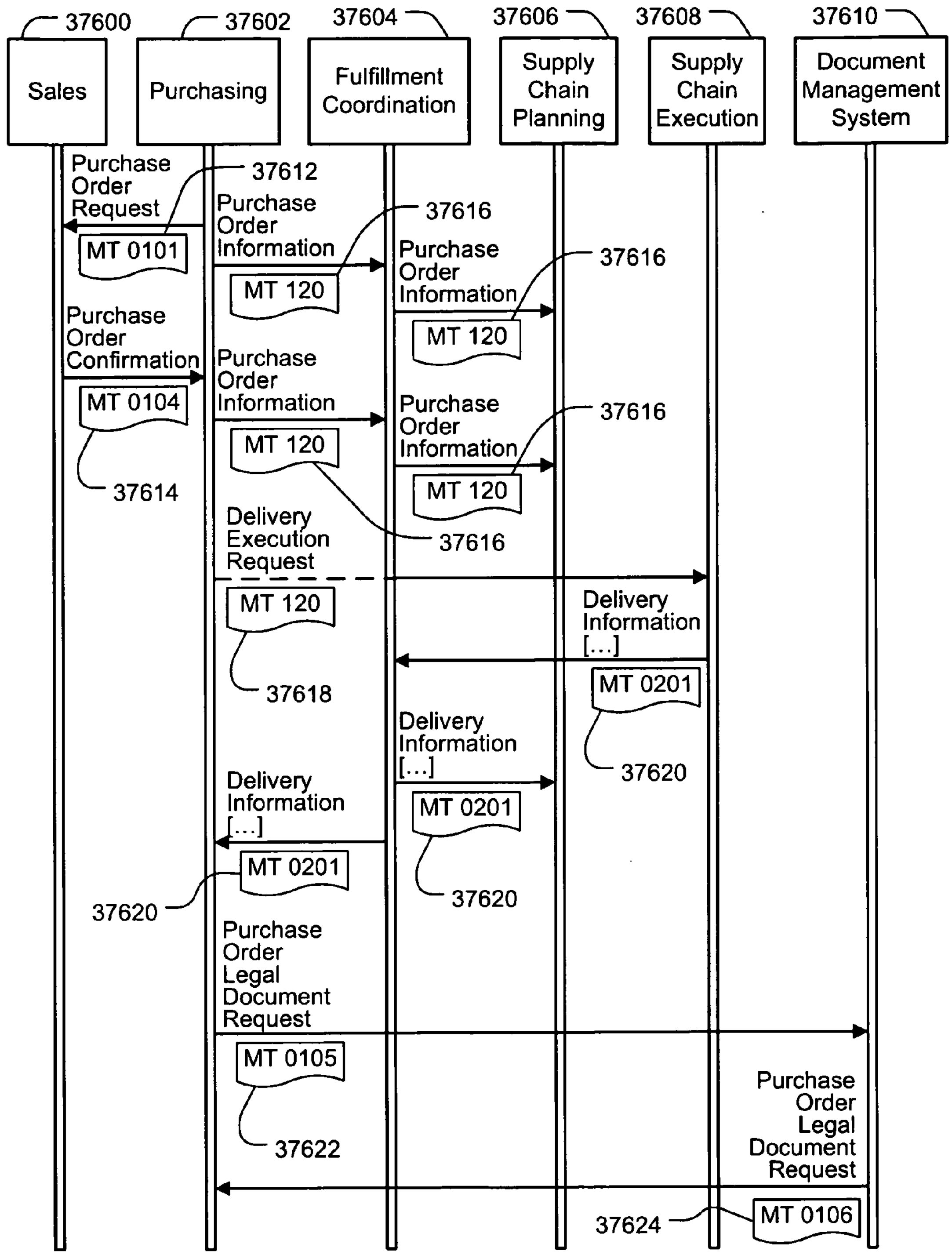
Figure 377A:
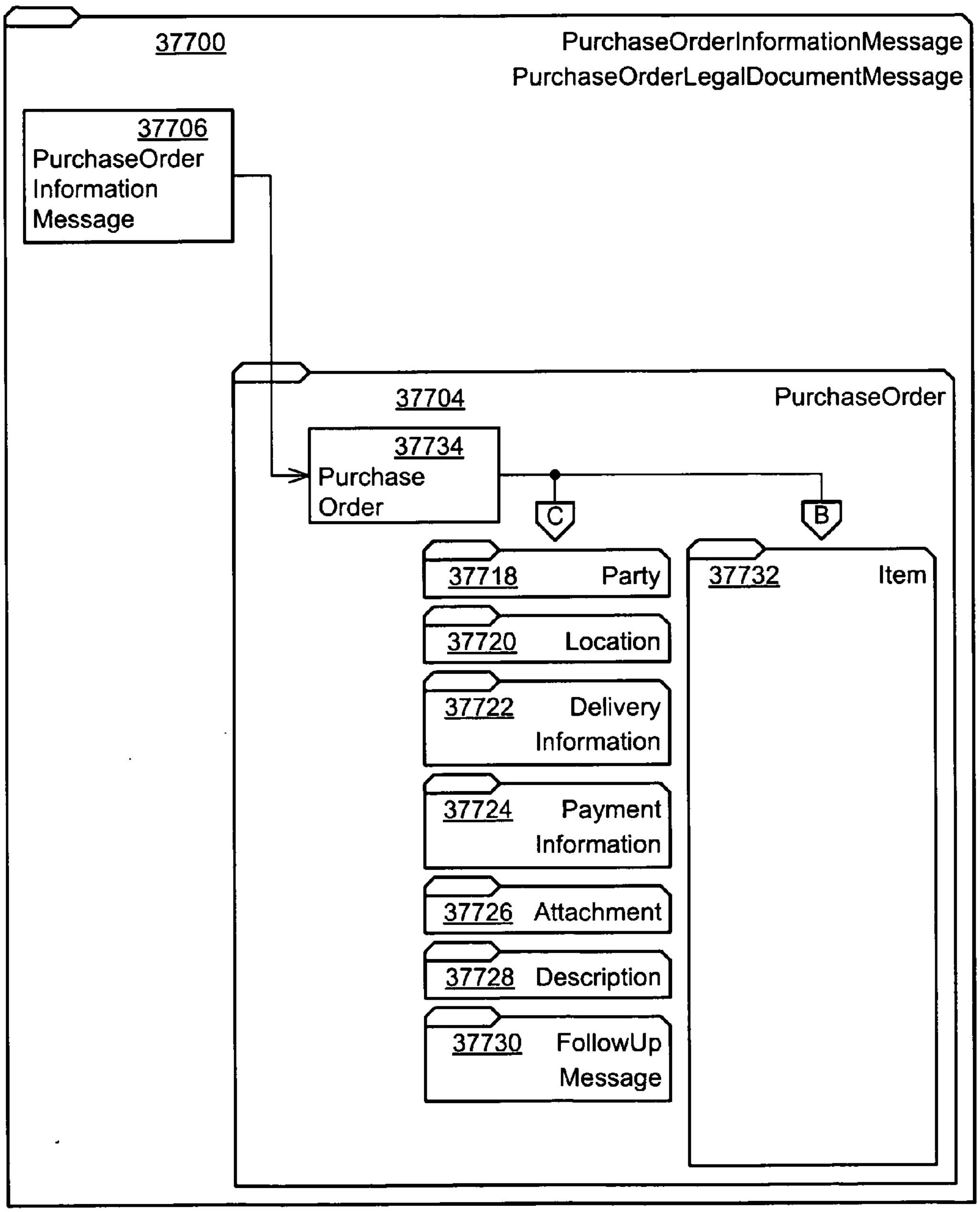
Figure 377B:
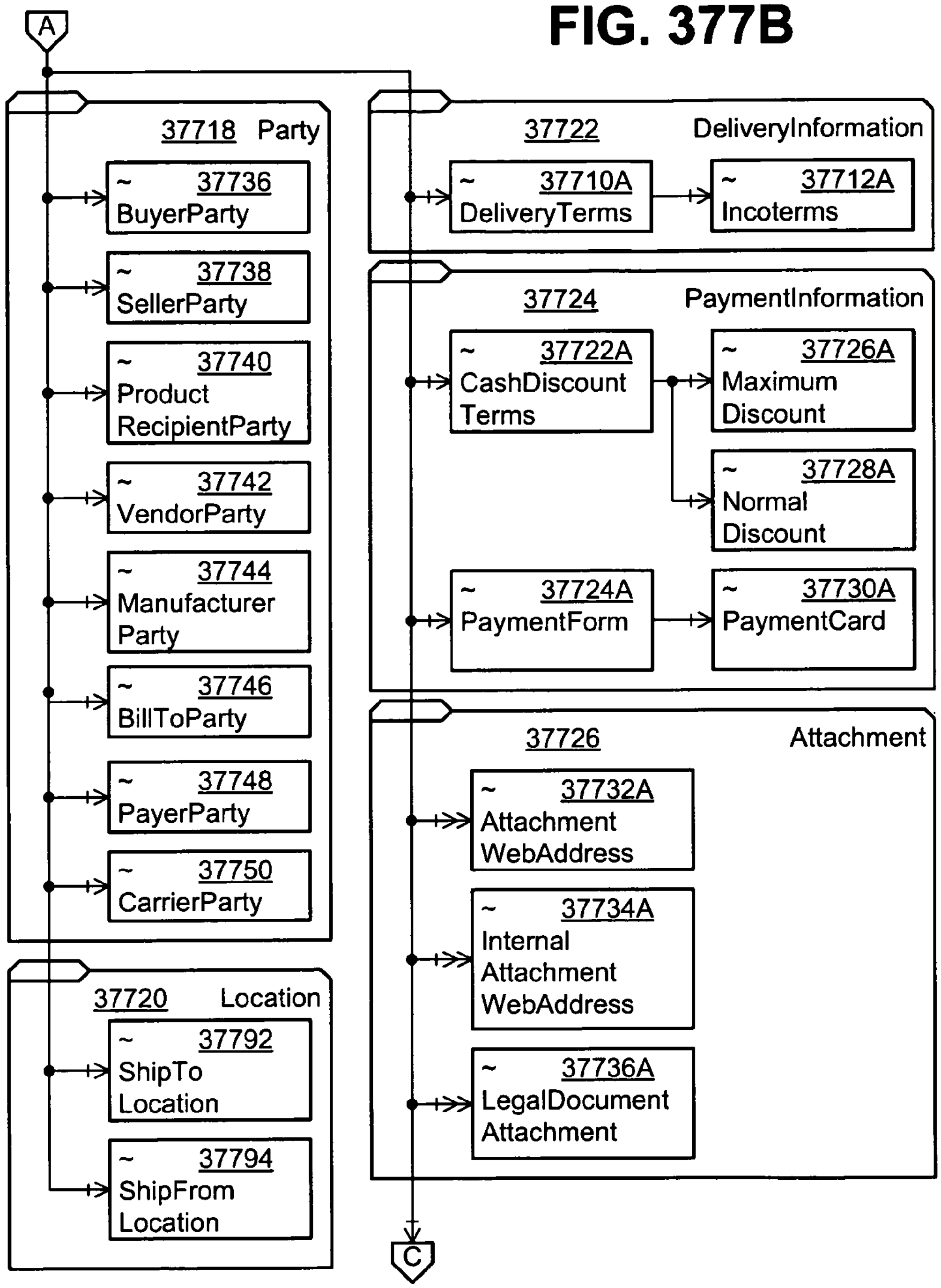
Figure 377C:
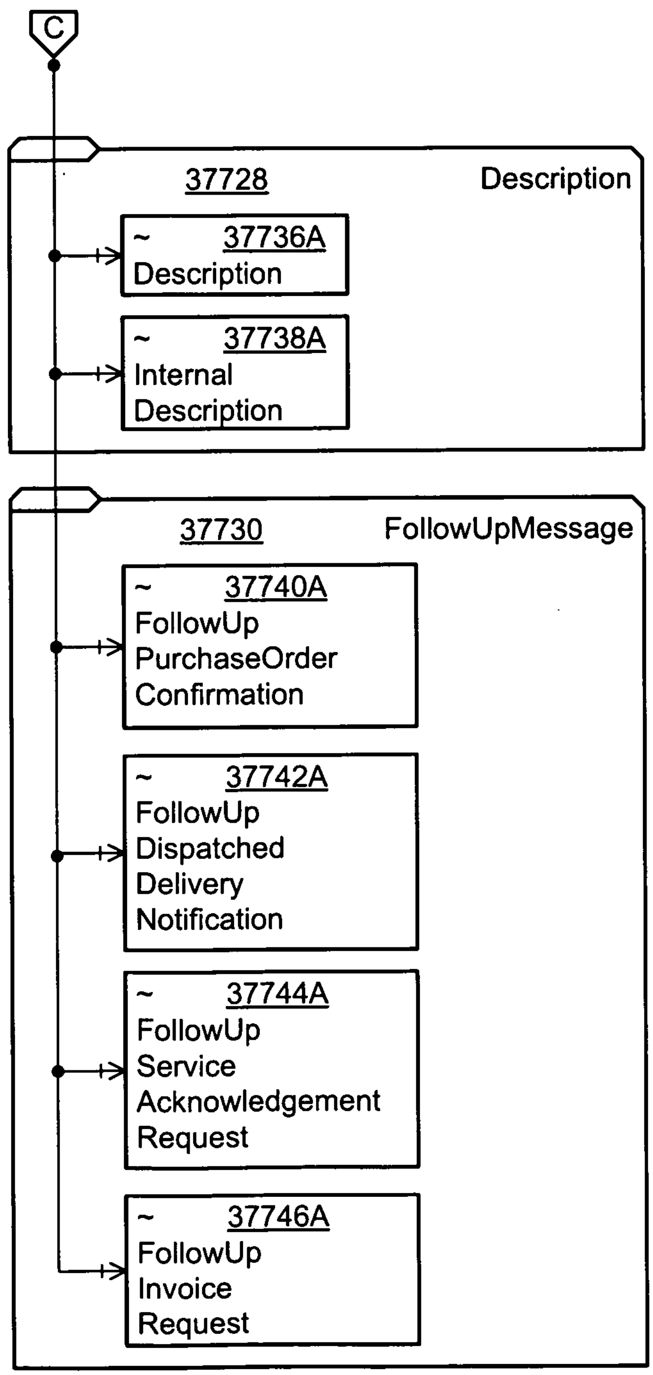
Figure 377D:
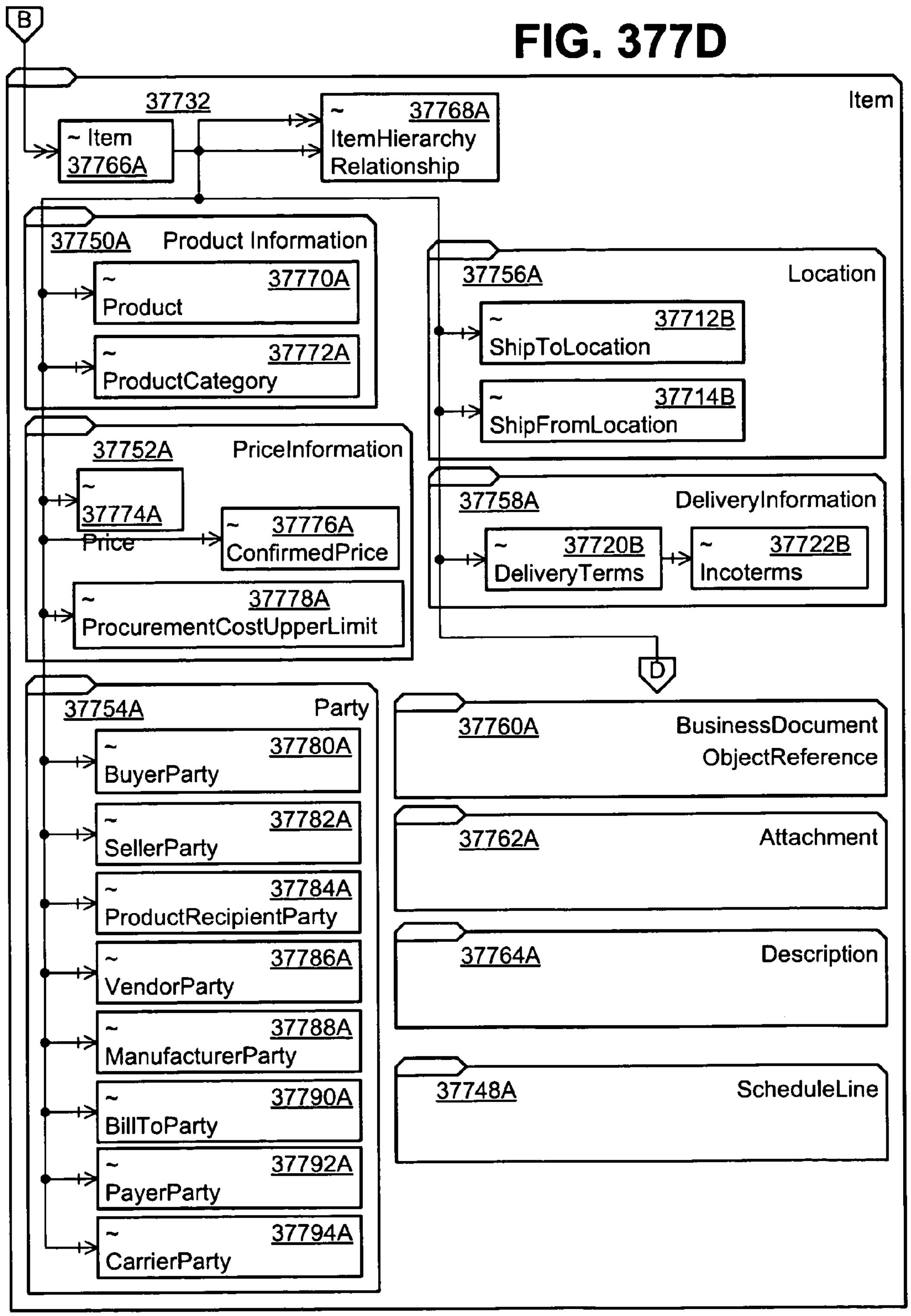
Figure 377E:
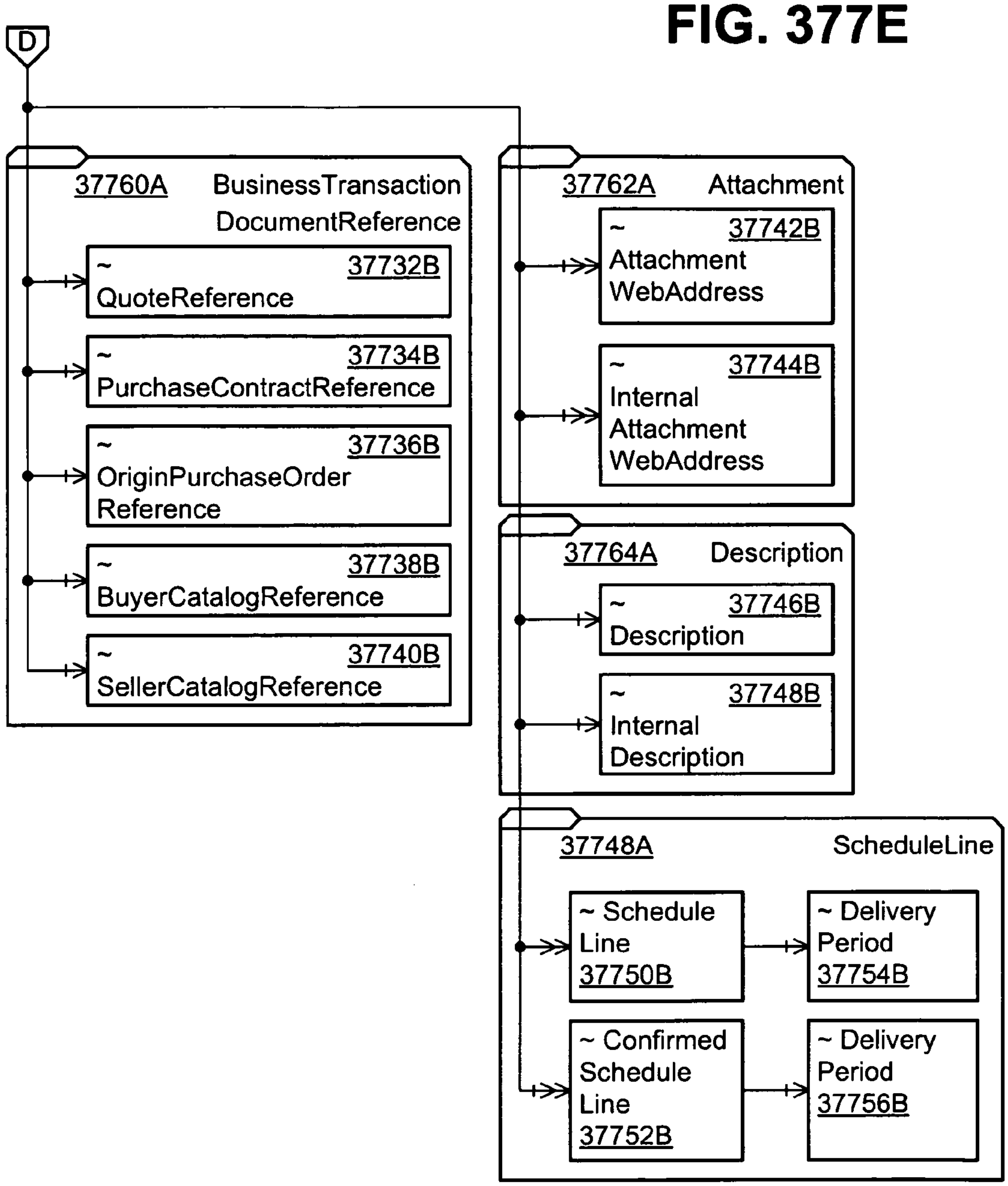
Figure 377F:
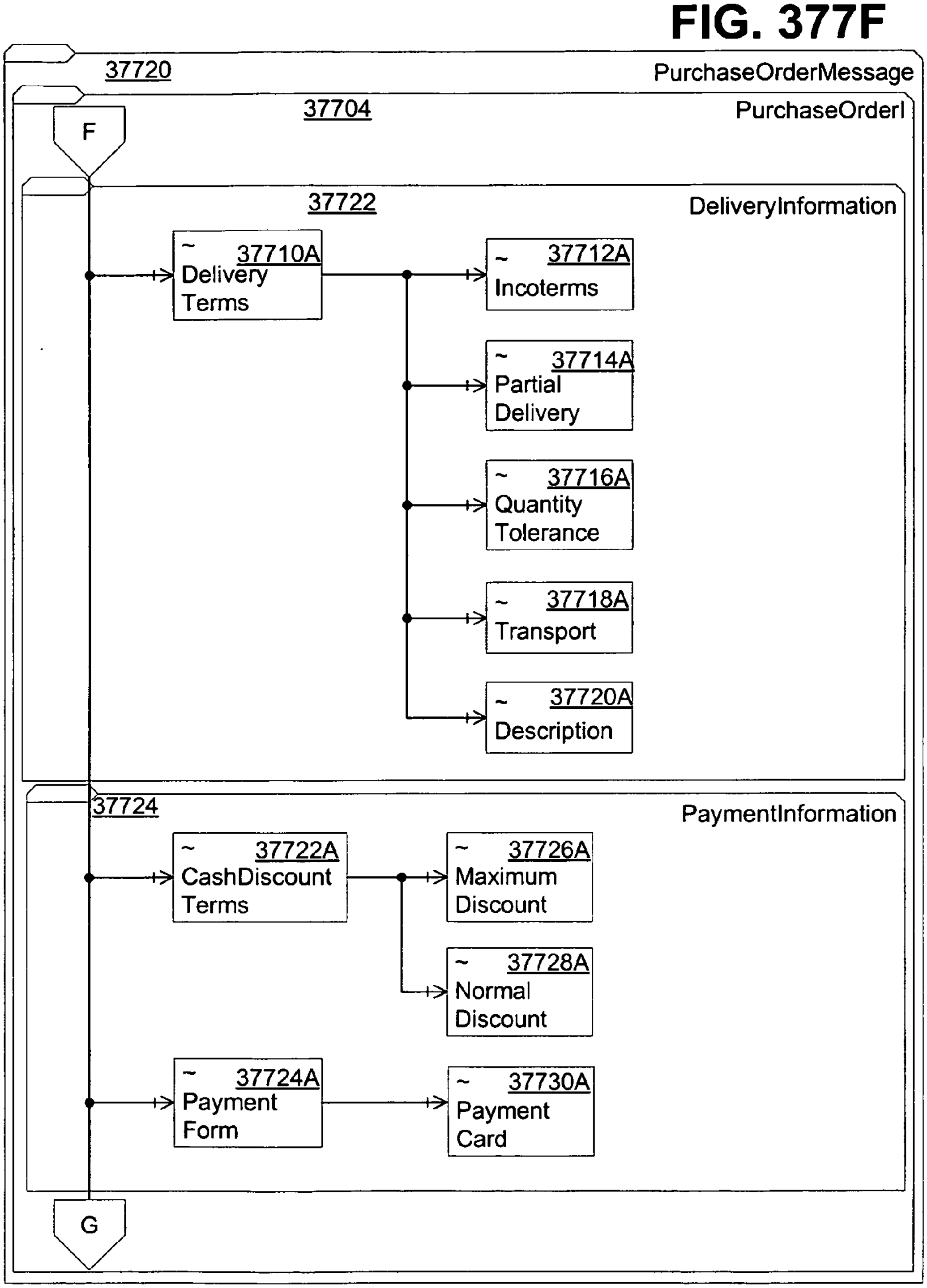
Figure 377G:
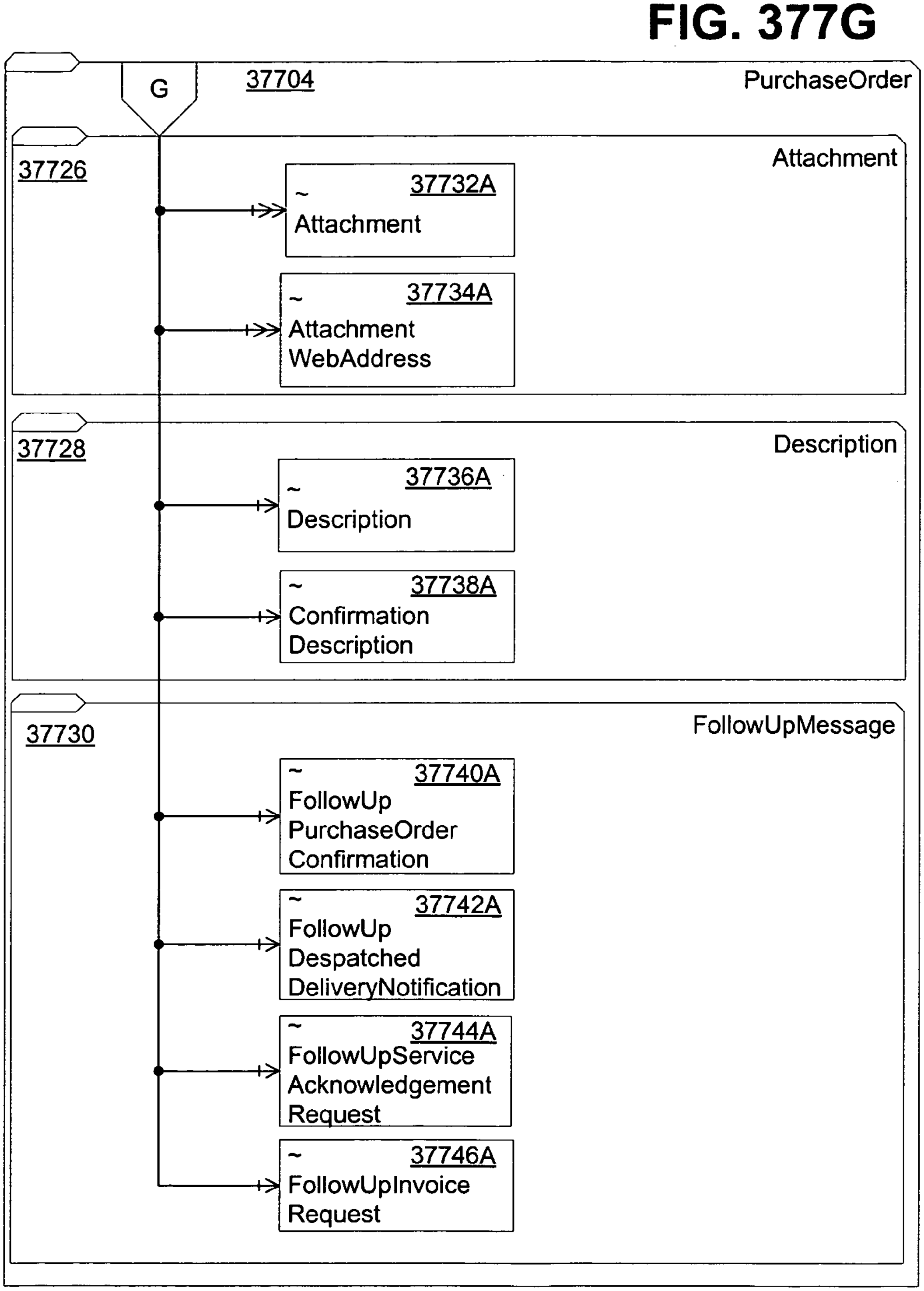
Figure 377H:
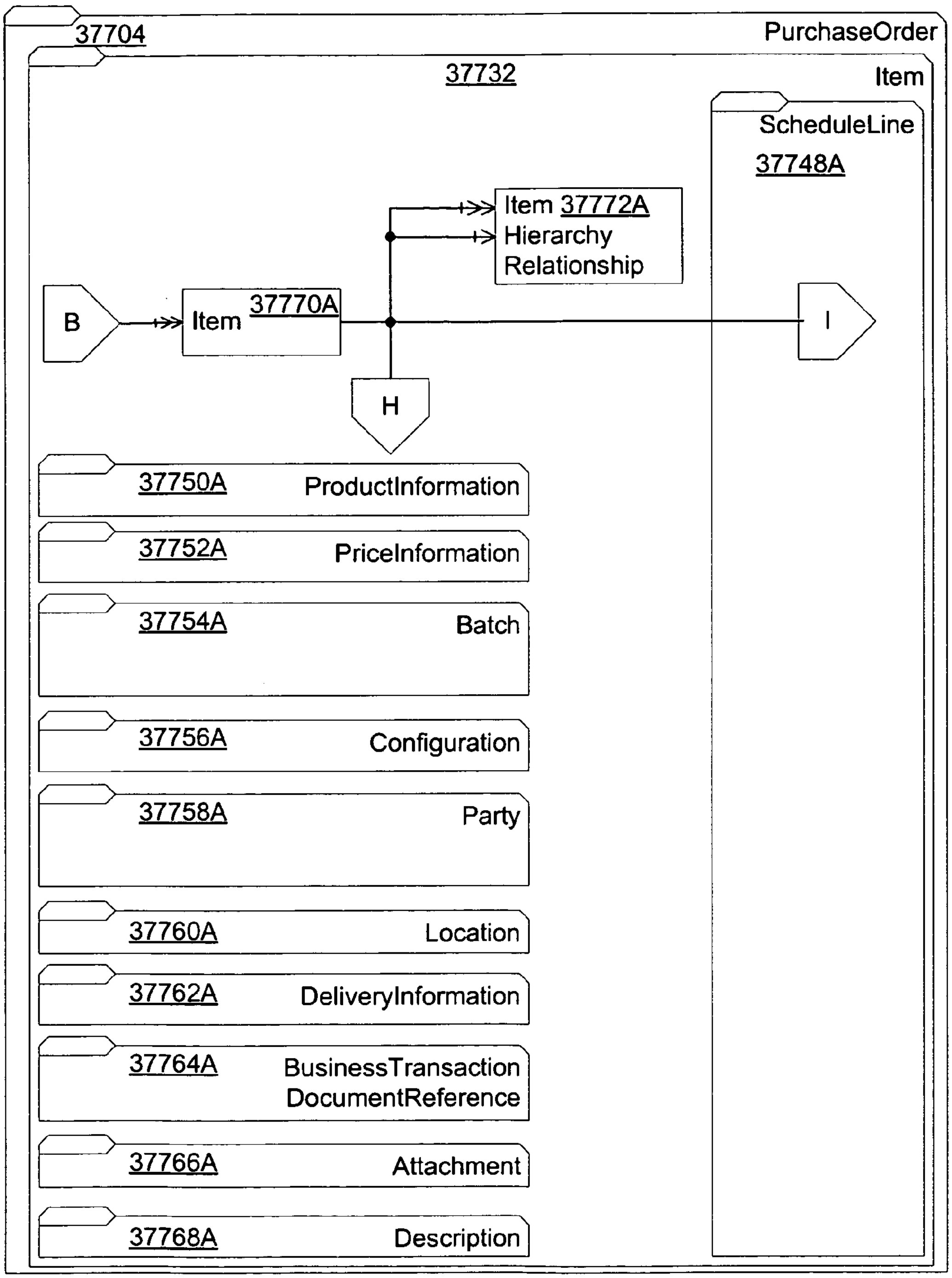
Figure 377I:
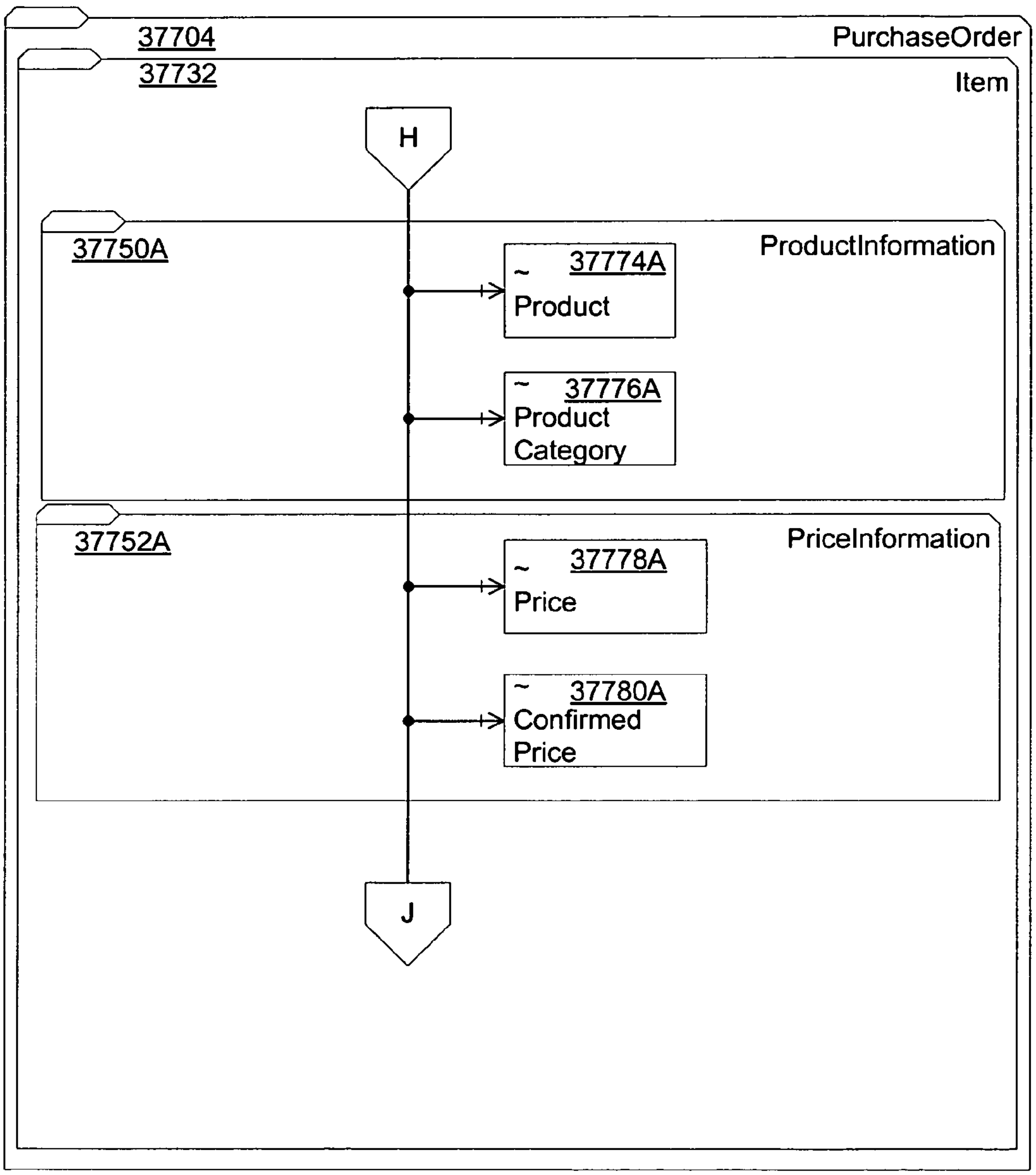
Figure 377J:
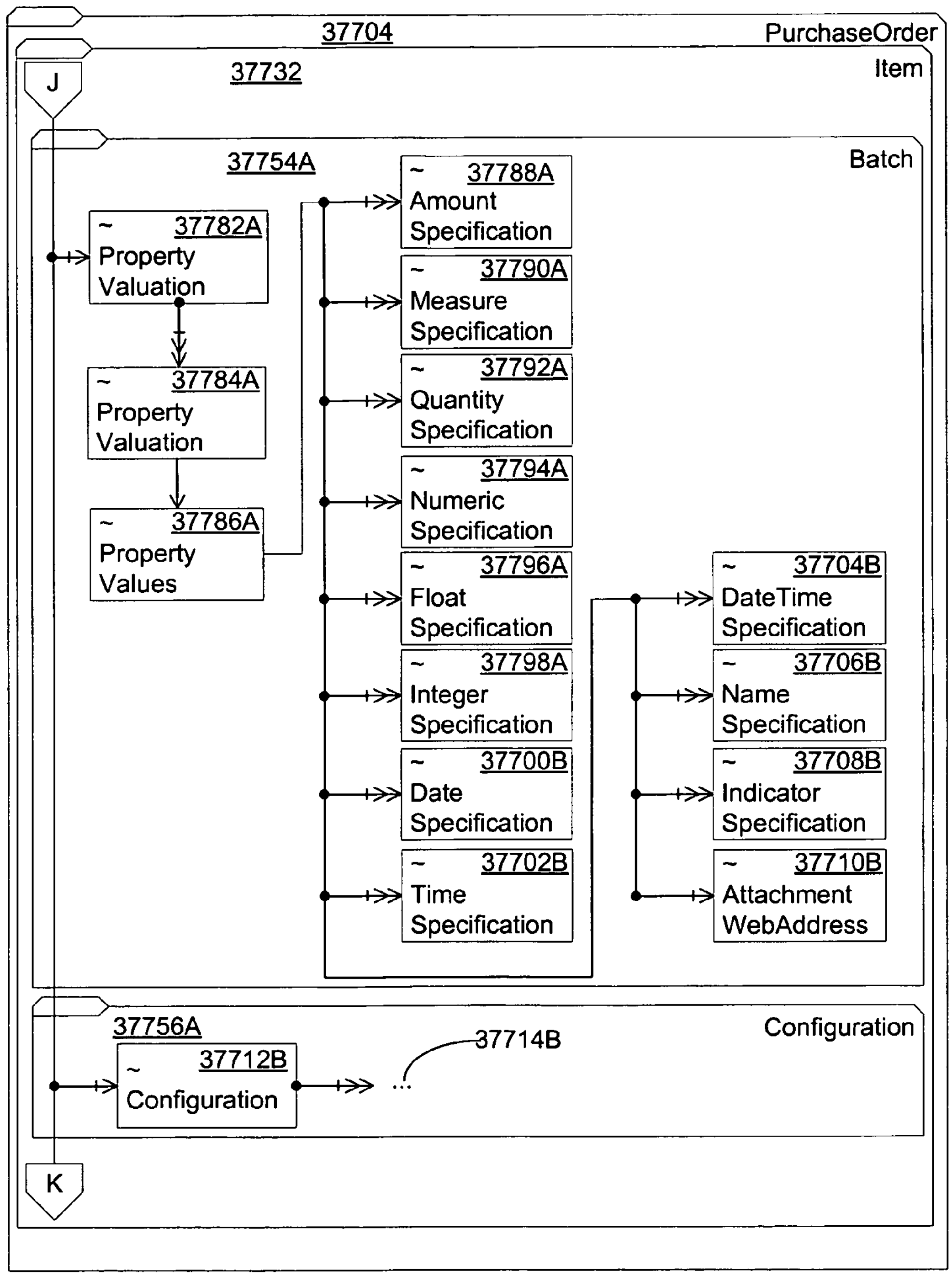
Figure 377K:
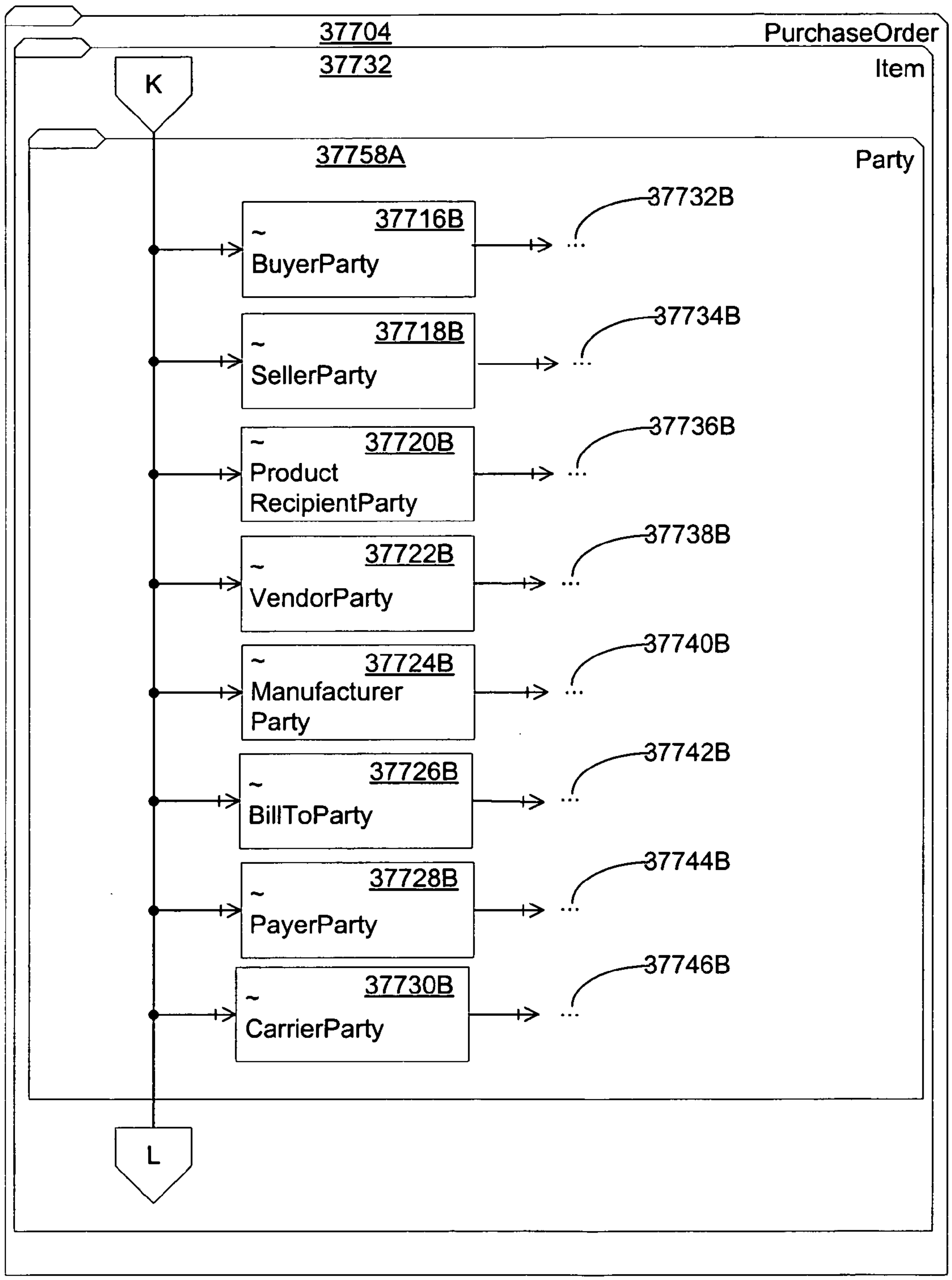
Figure 377L:
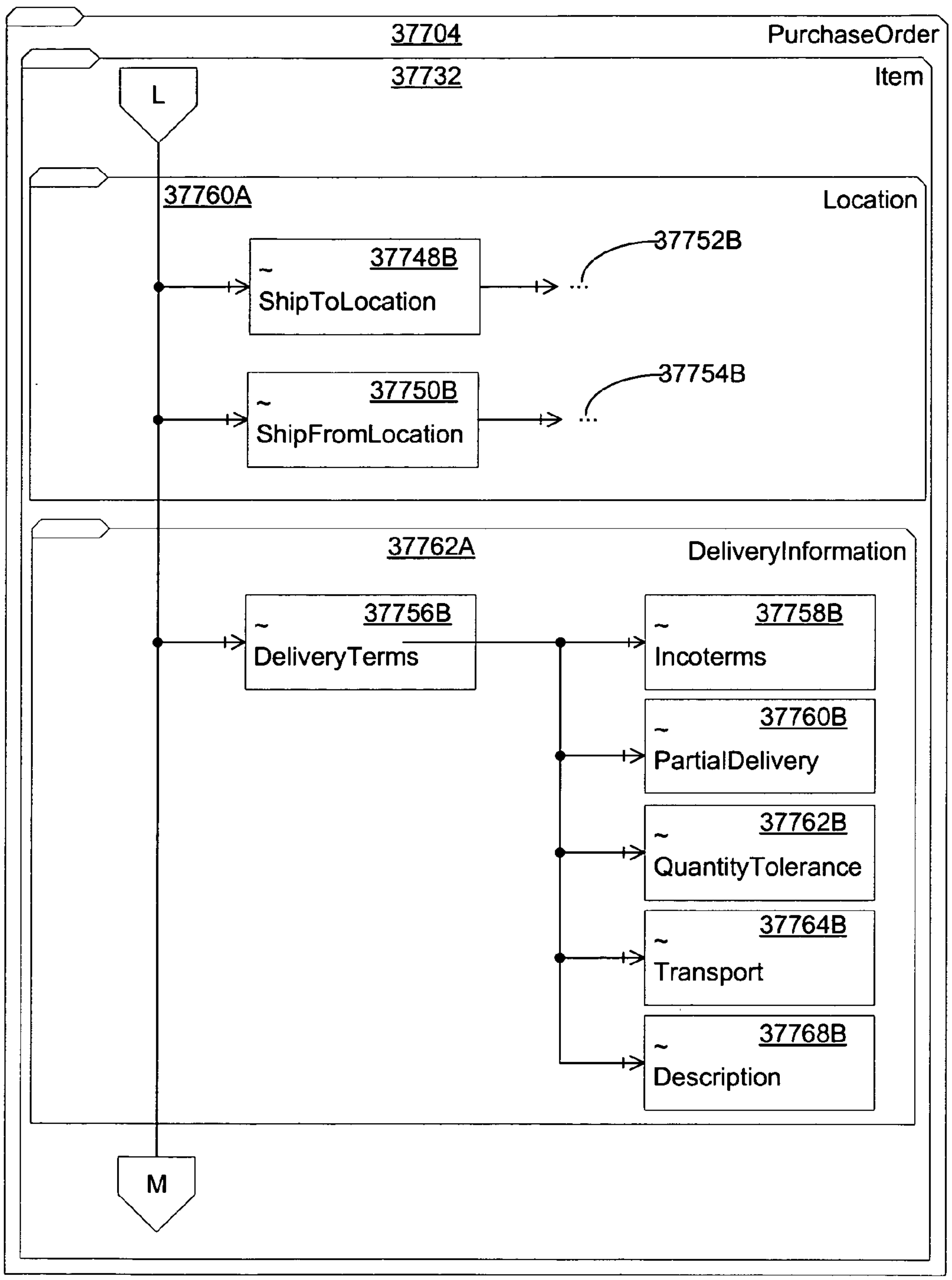
Figure 377M:
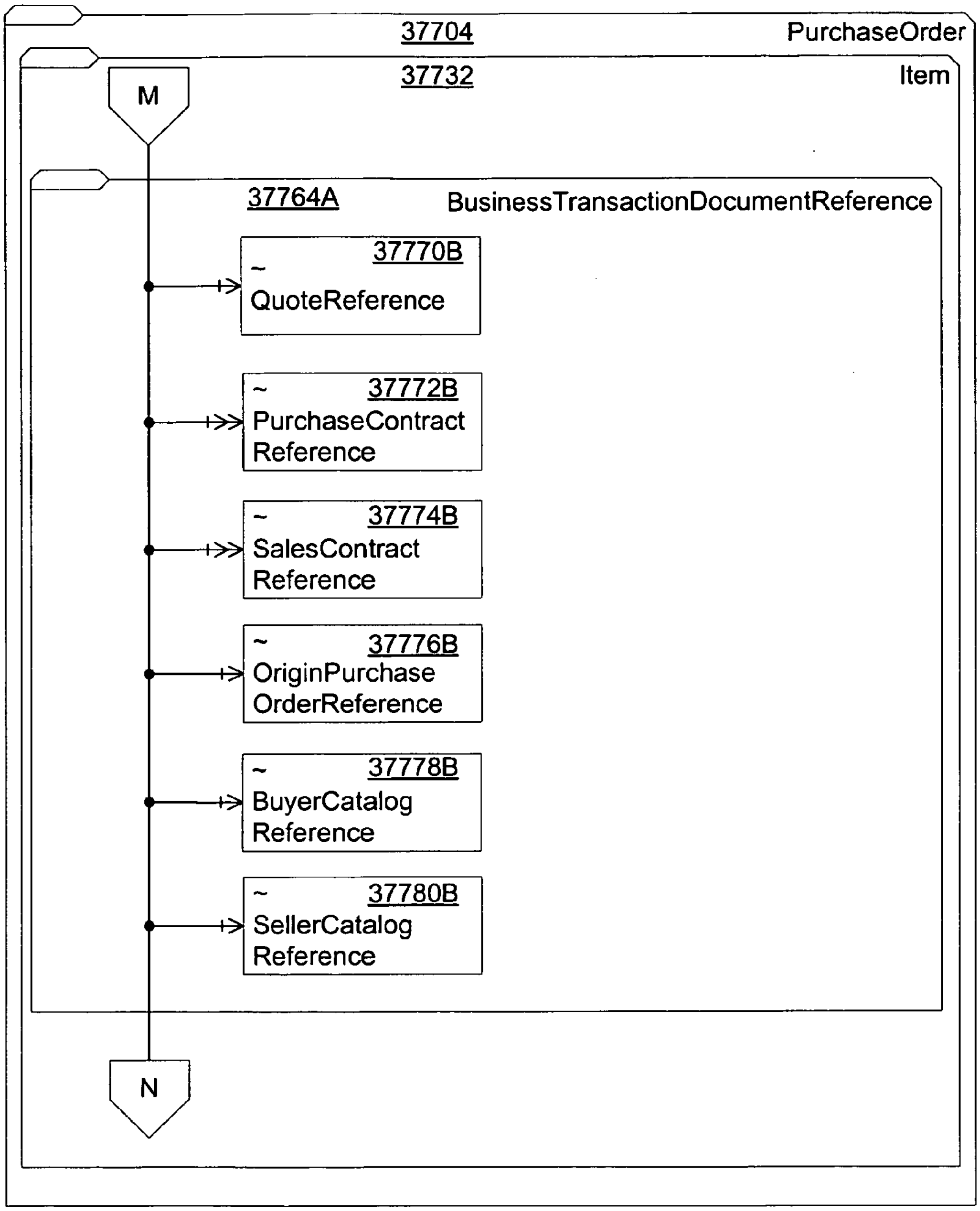
Figure 377N:
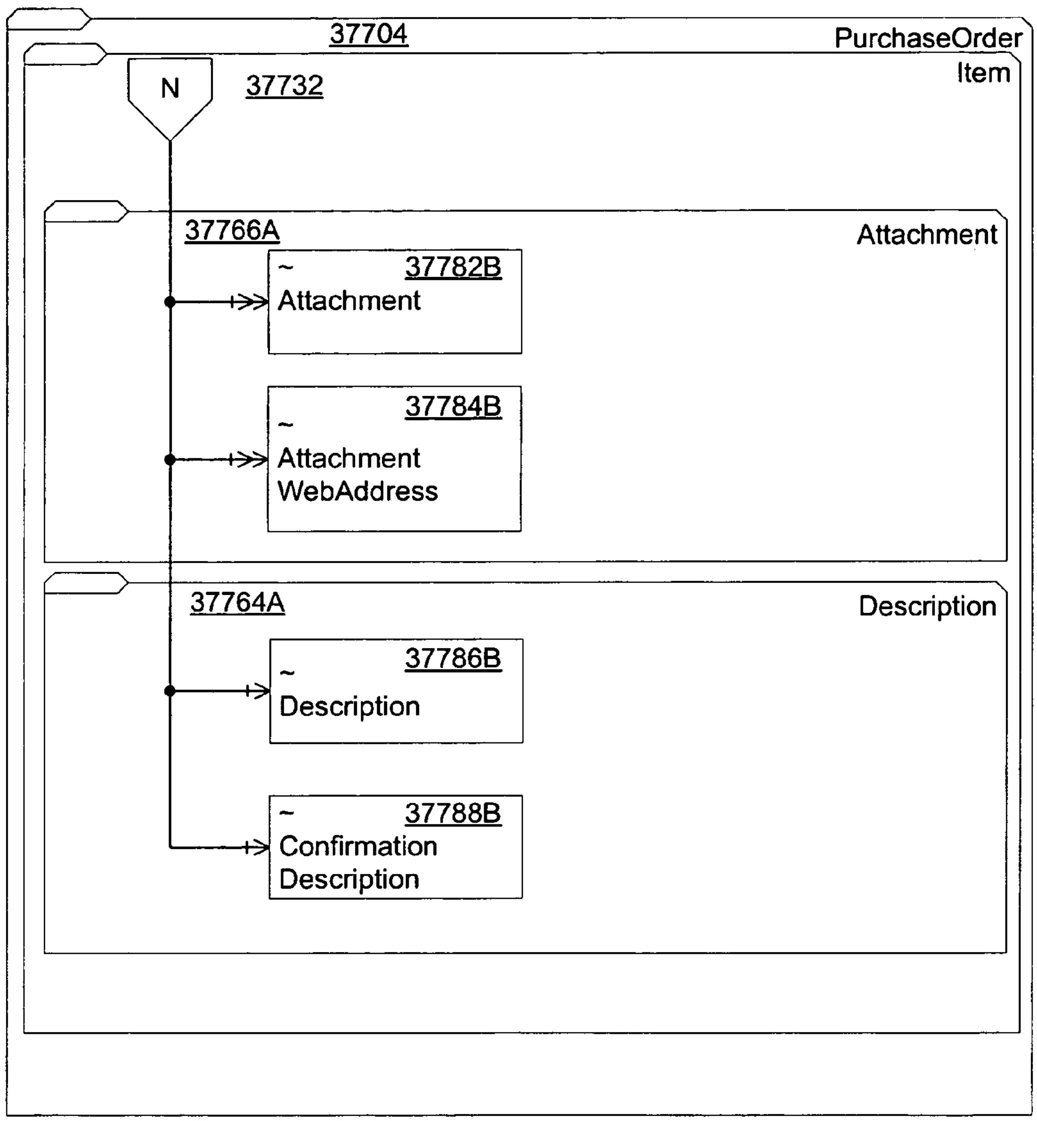
Figure 377O:
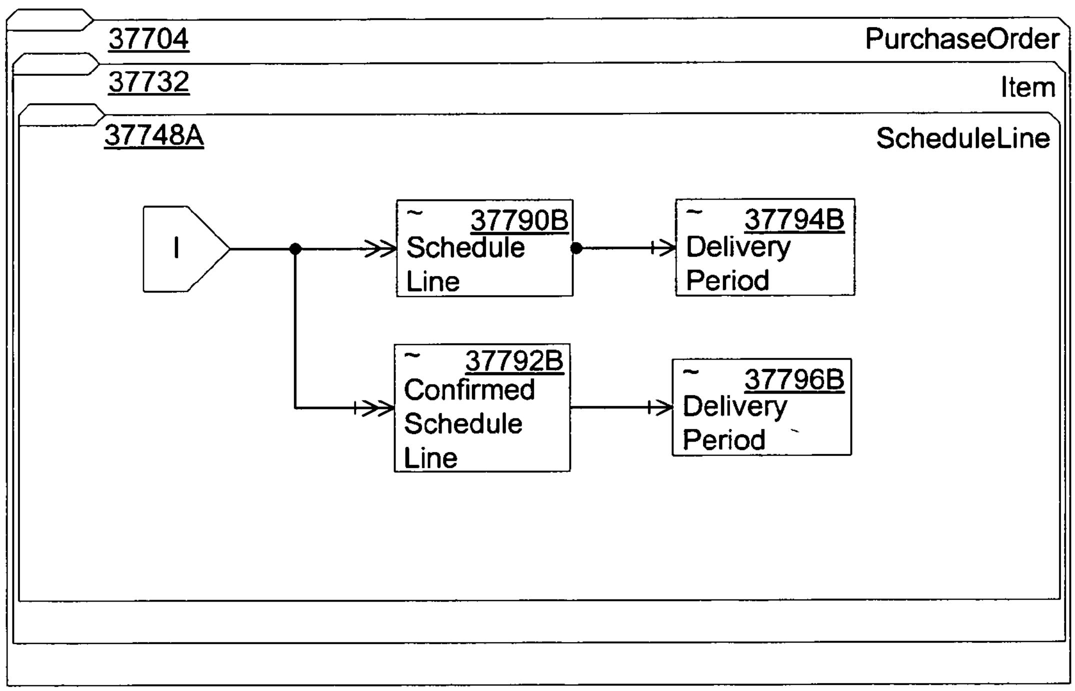
Figure 379:
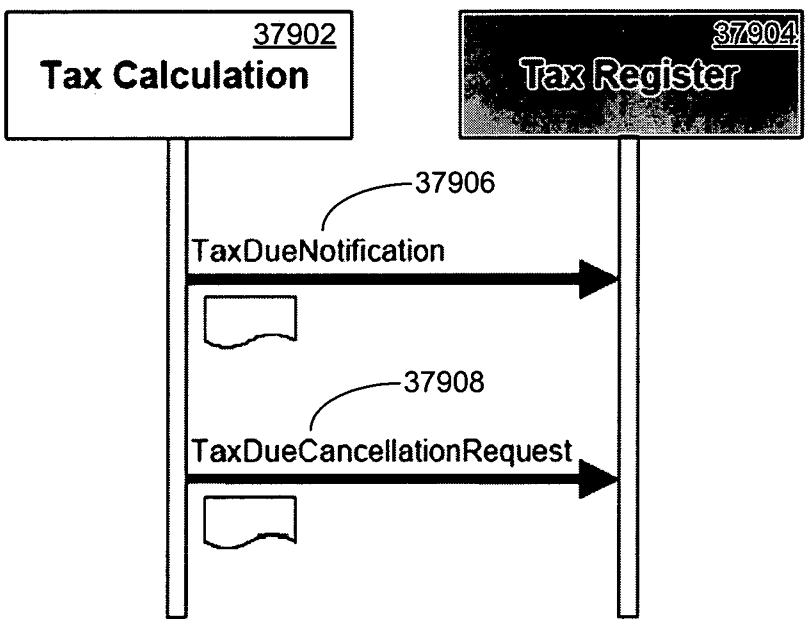
Figure 380A:
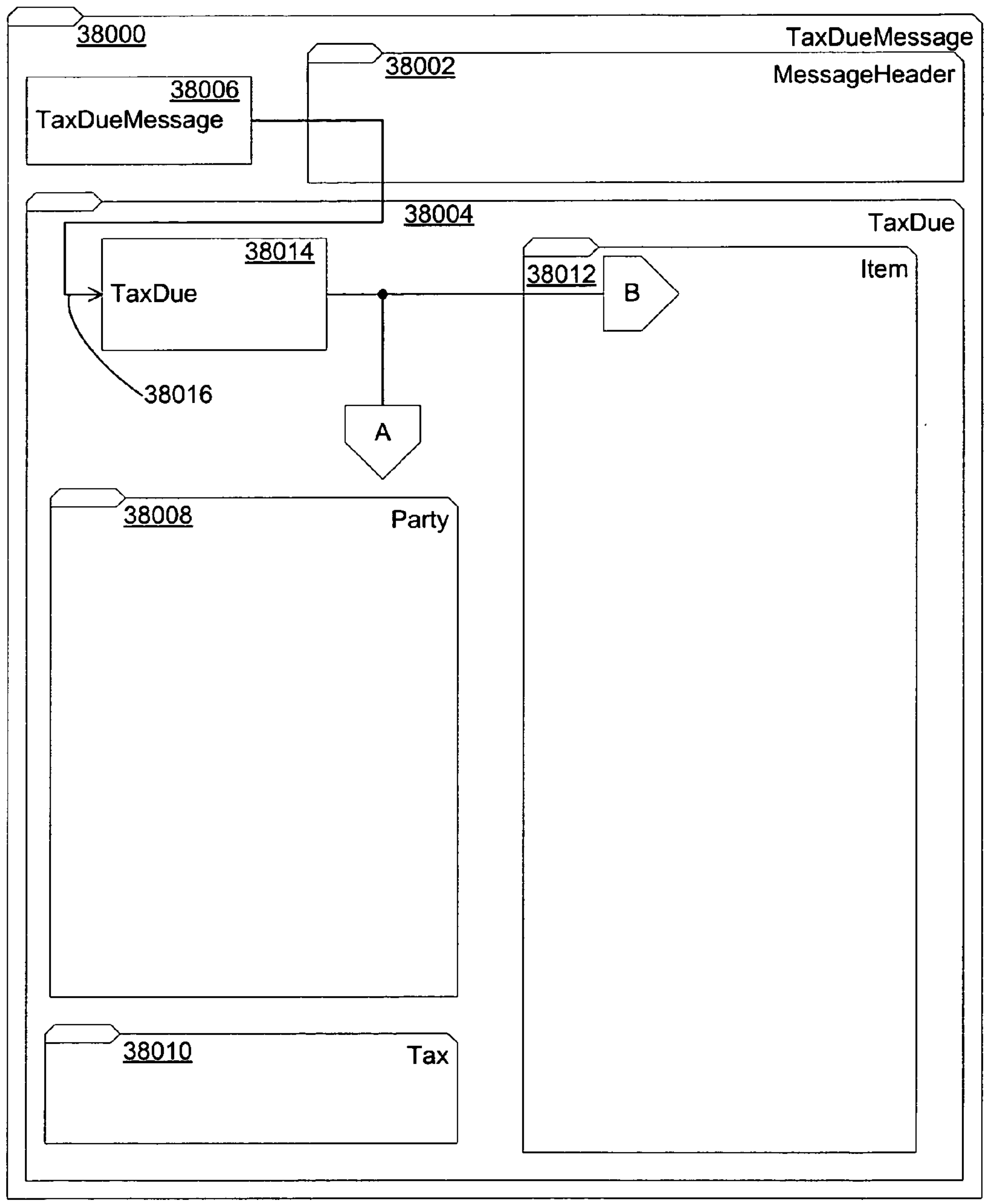
Figure 380B:
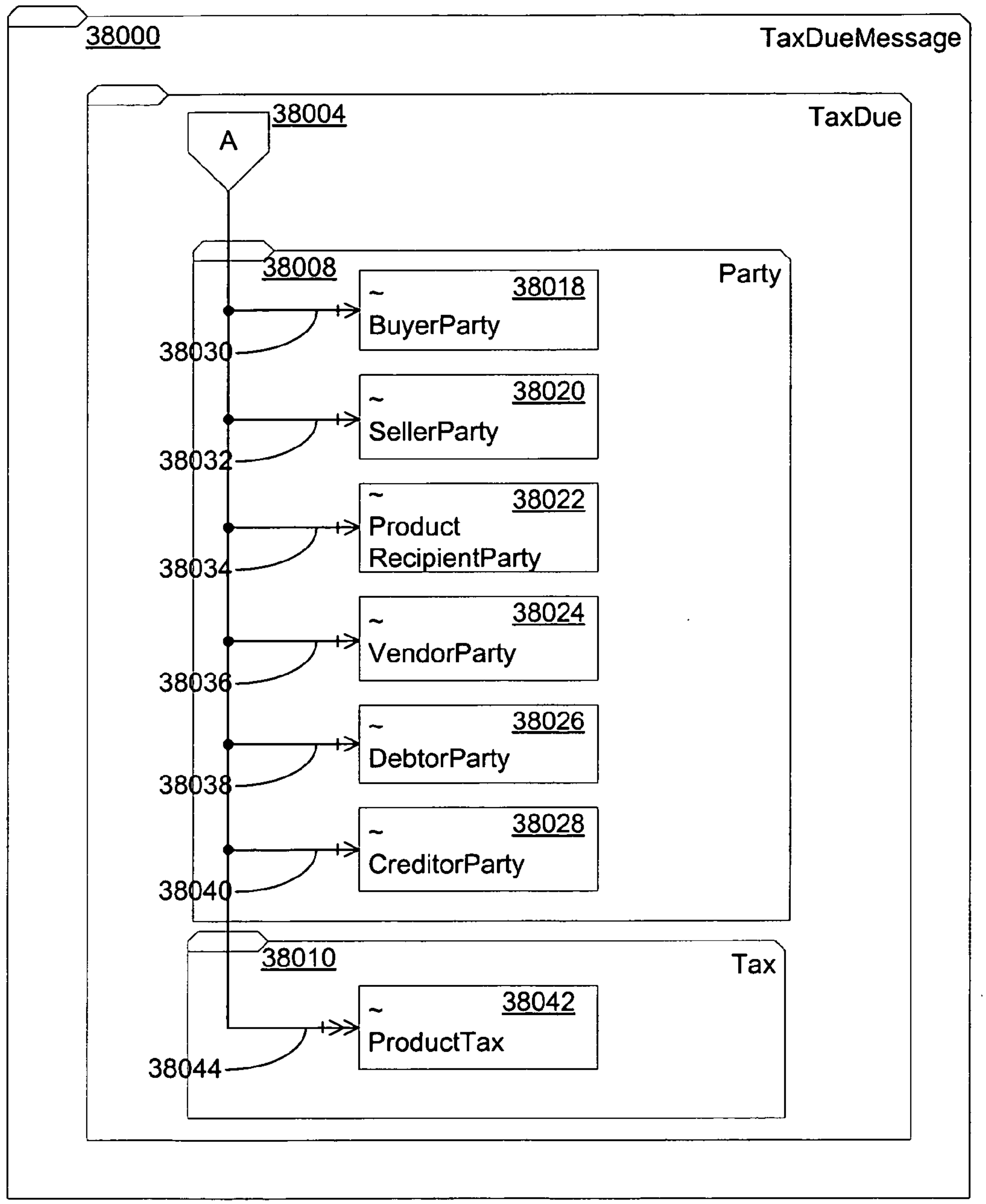
Figure 380C:
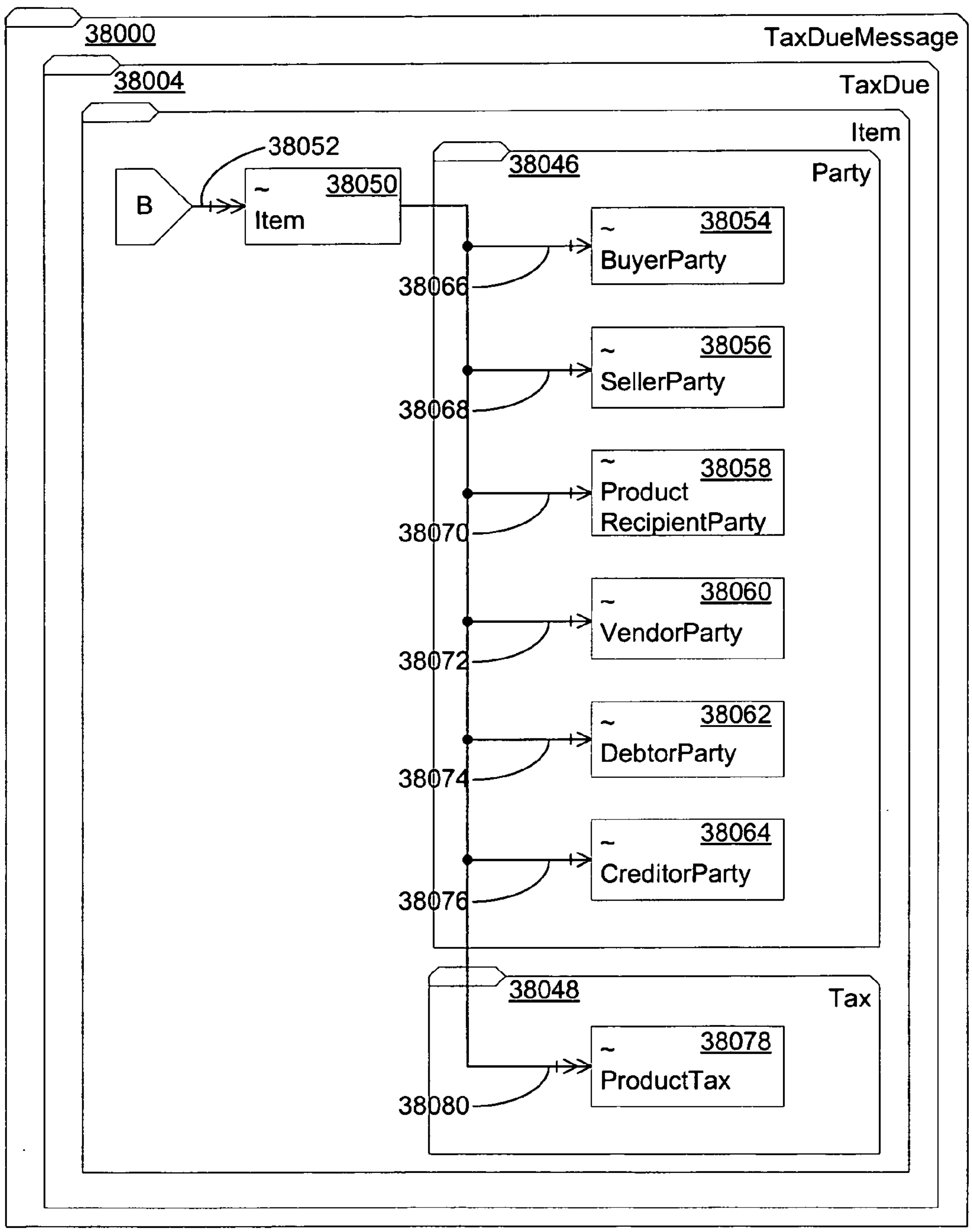
Figure 382:
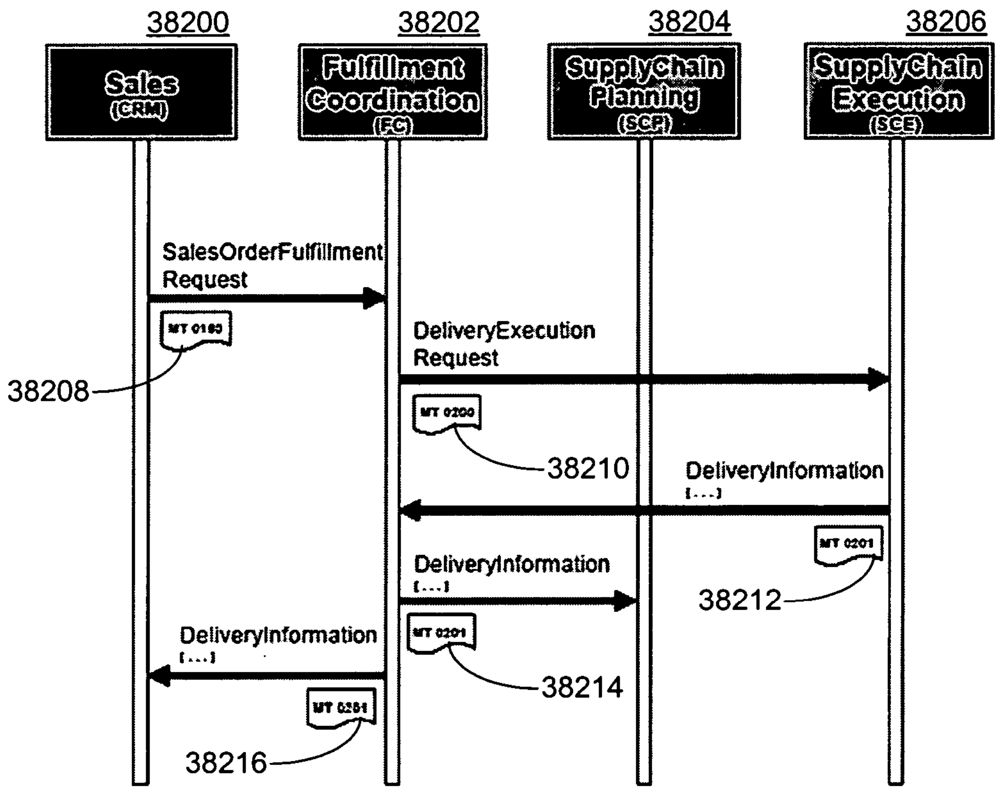
Figure 383A:
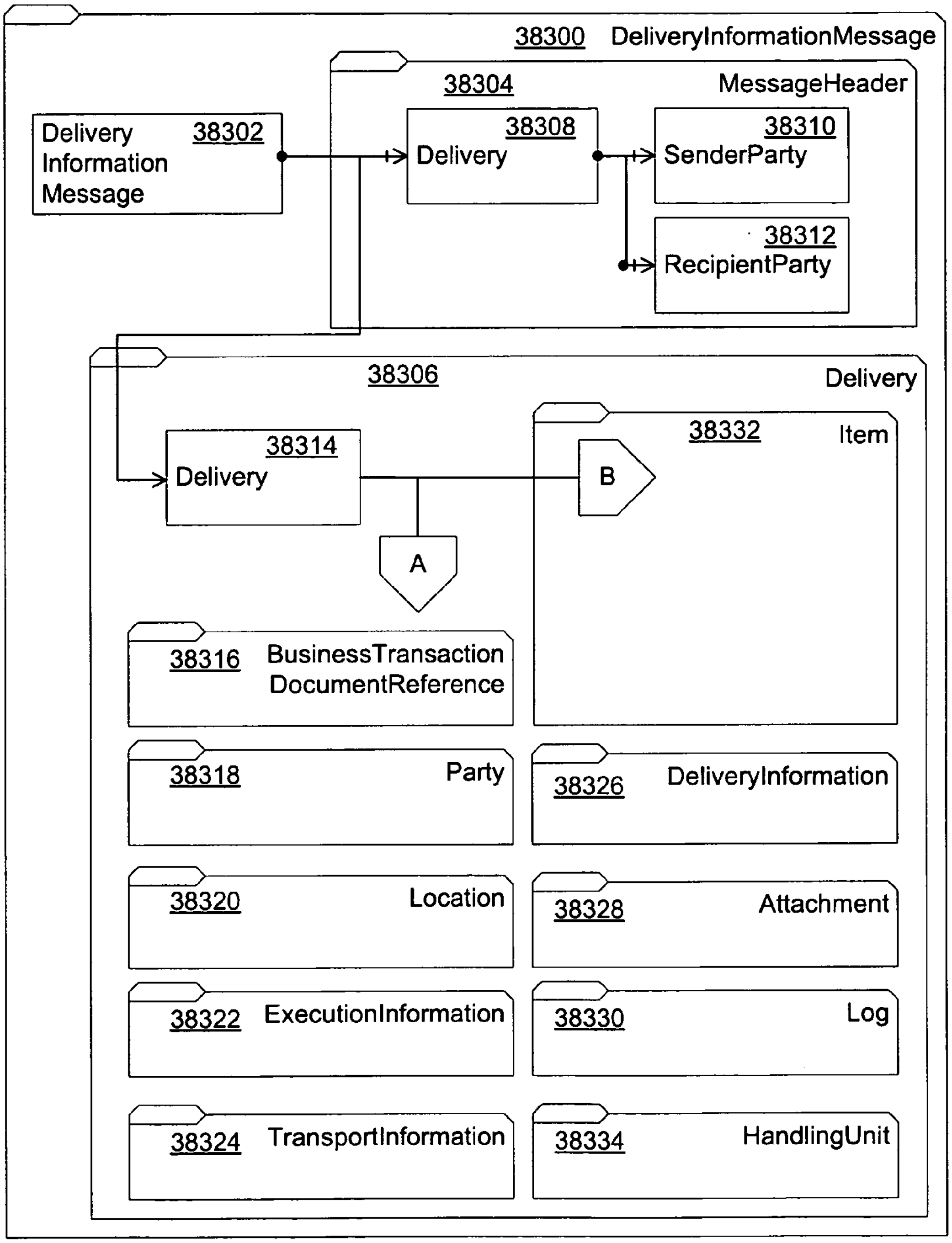
Figure 383B:
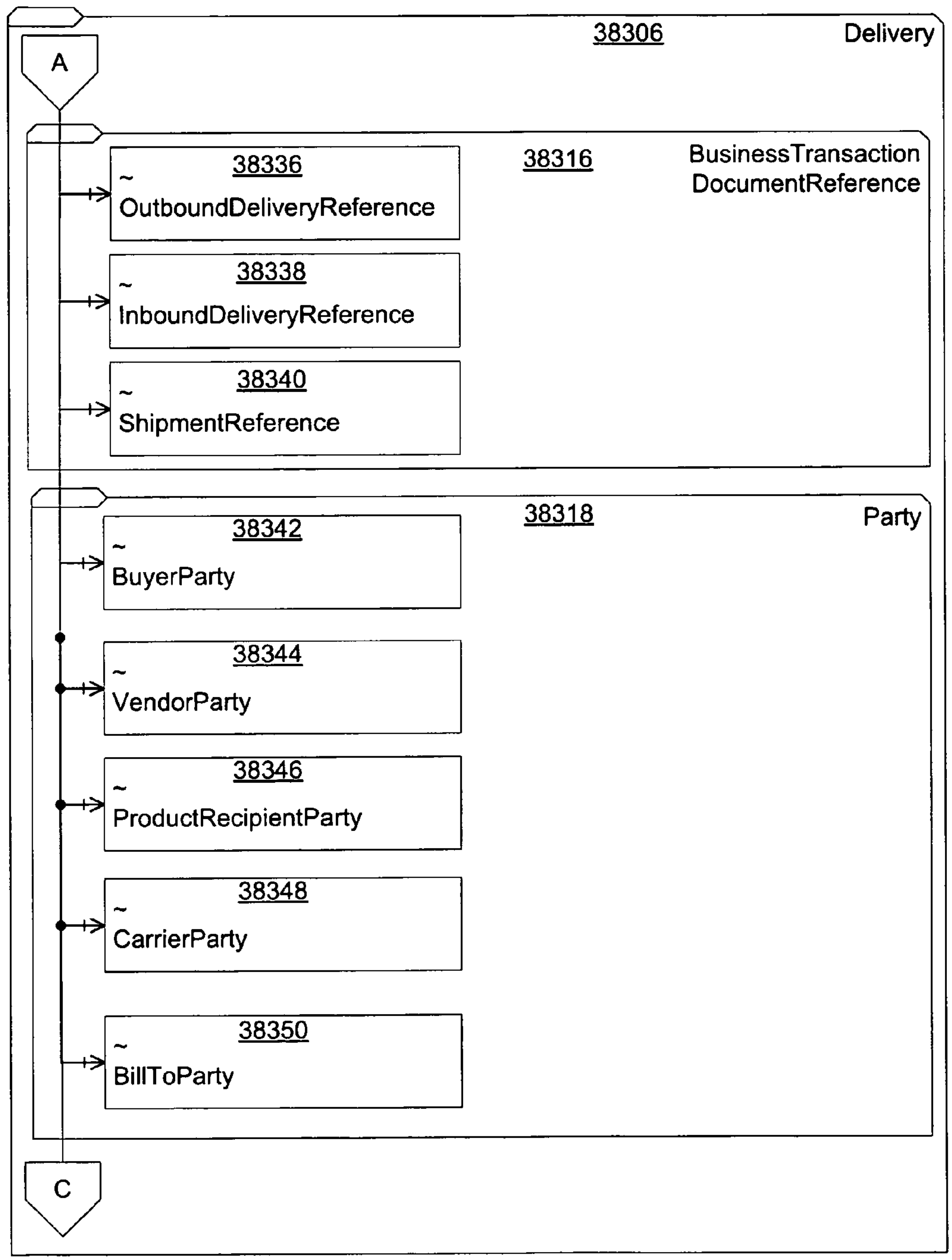
Figure 383C:
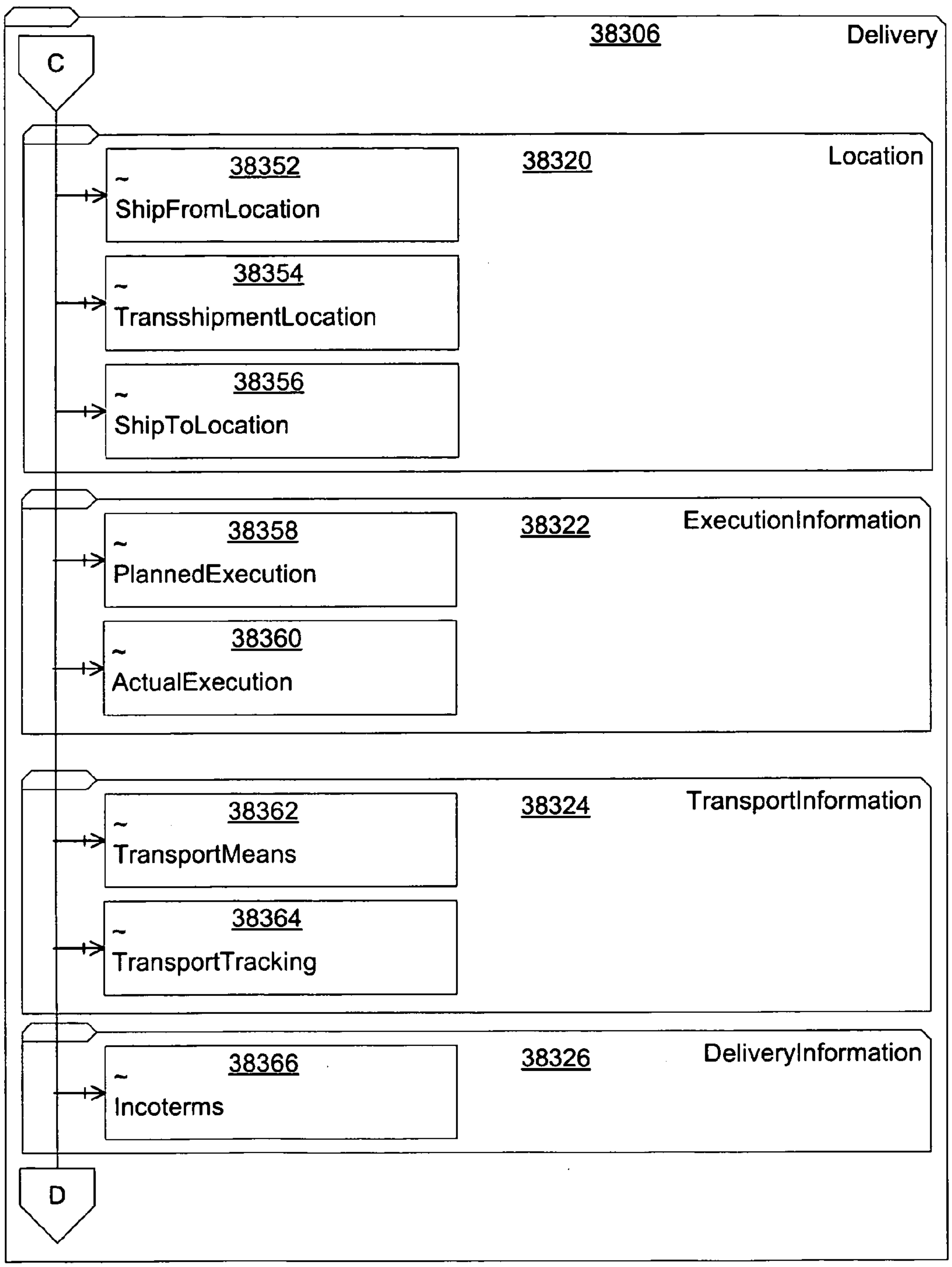
Figure 383D:
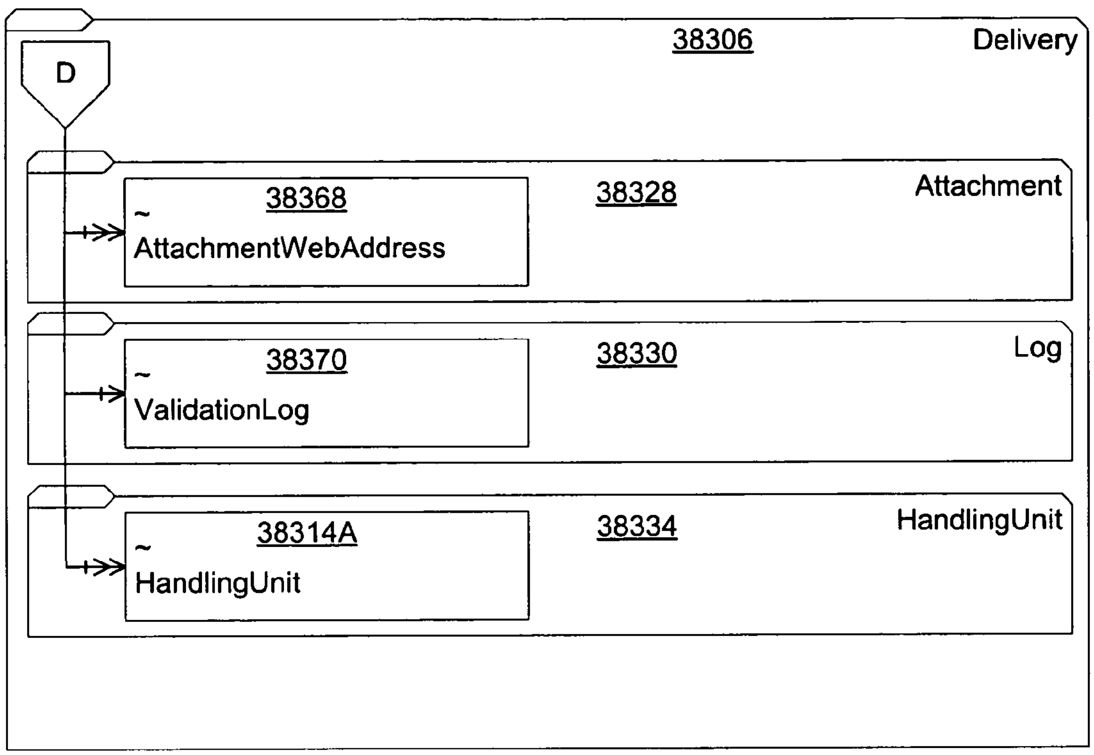
Figure 383E:
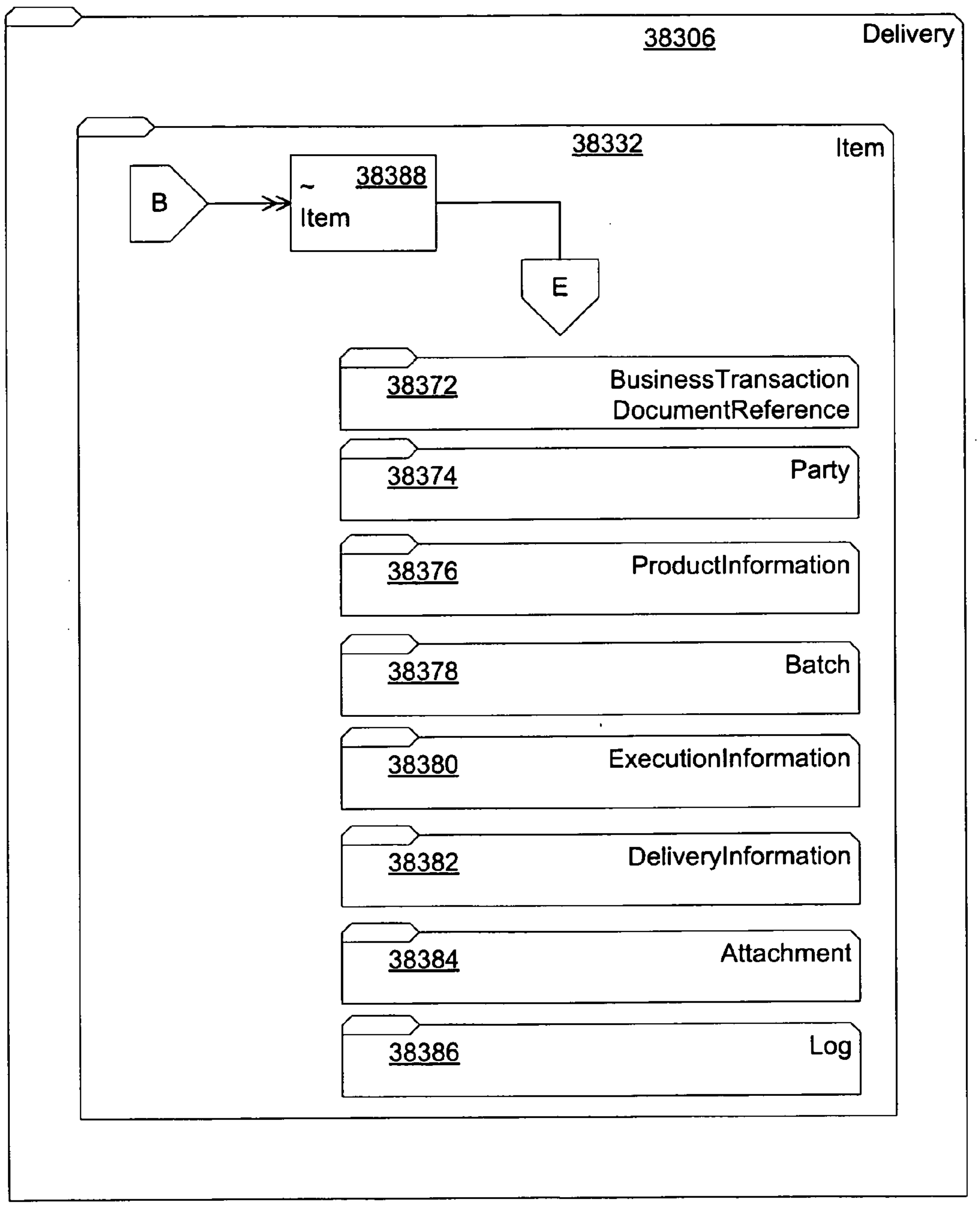
Figure 383F:
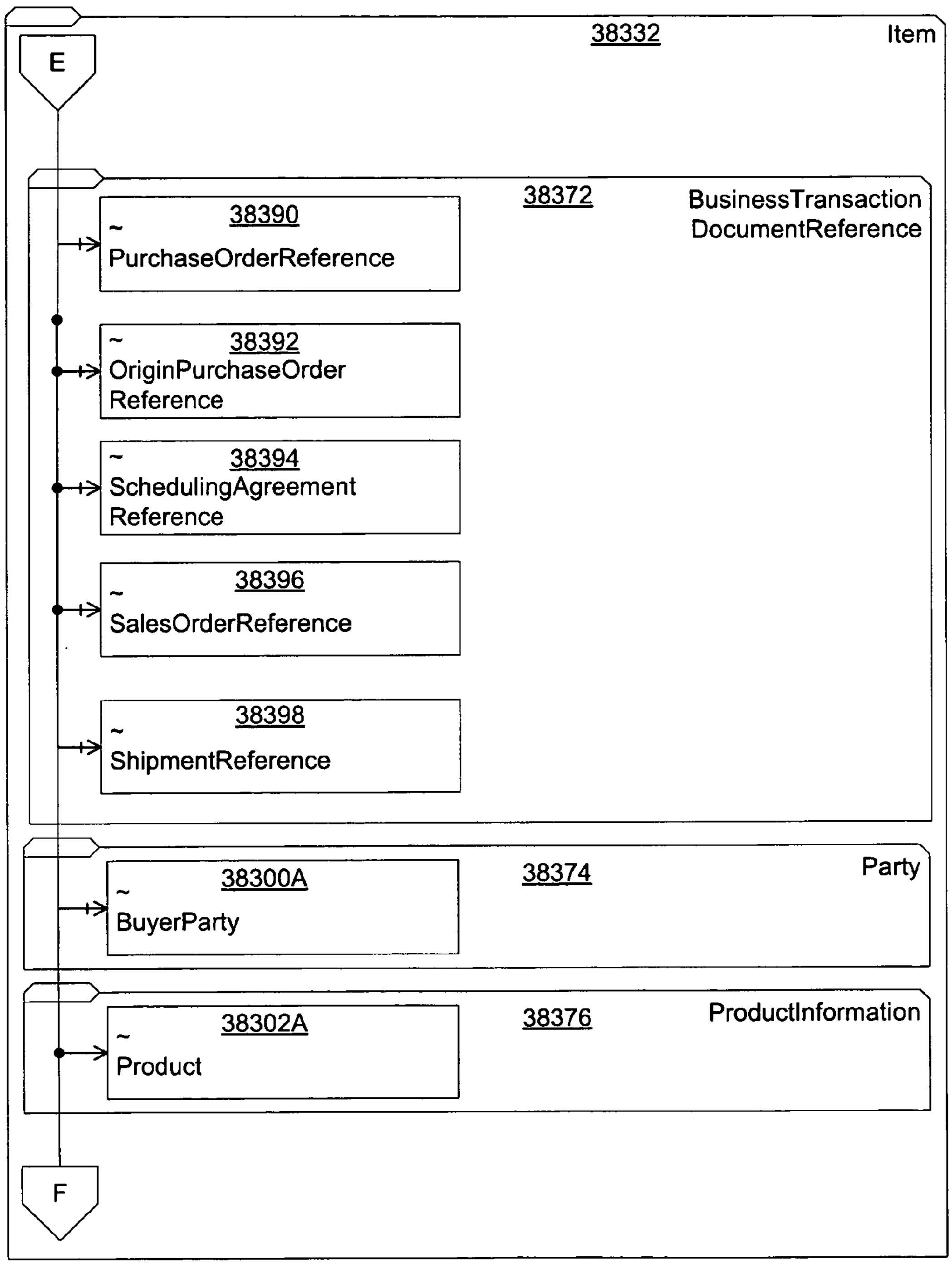
Figure 383G:
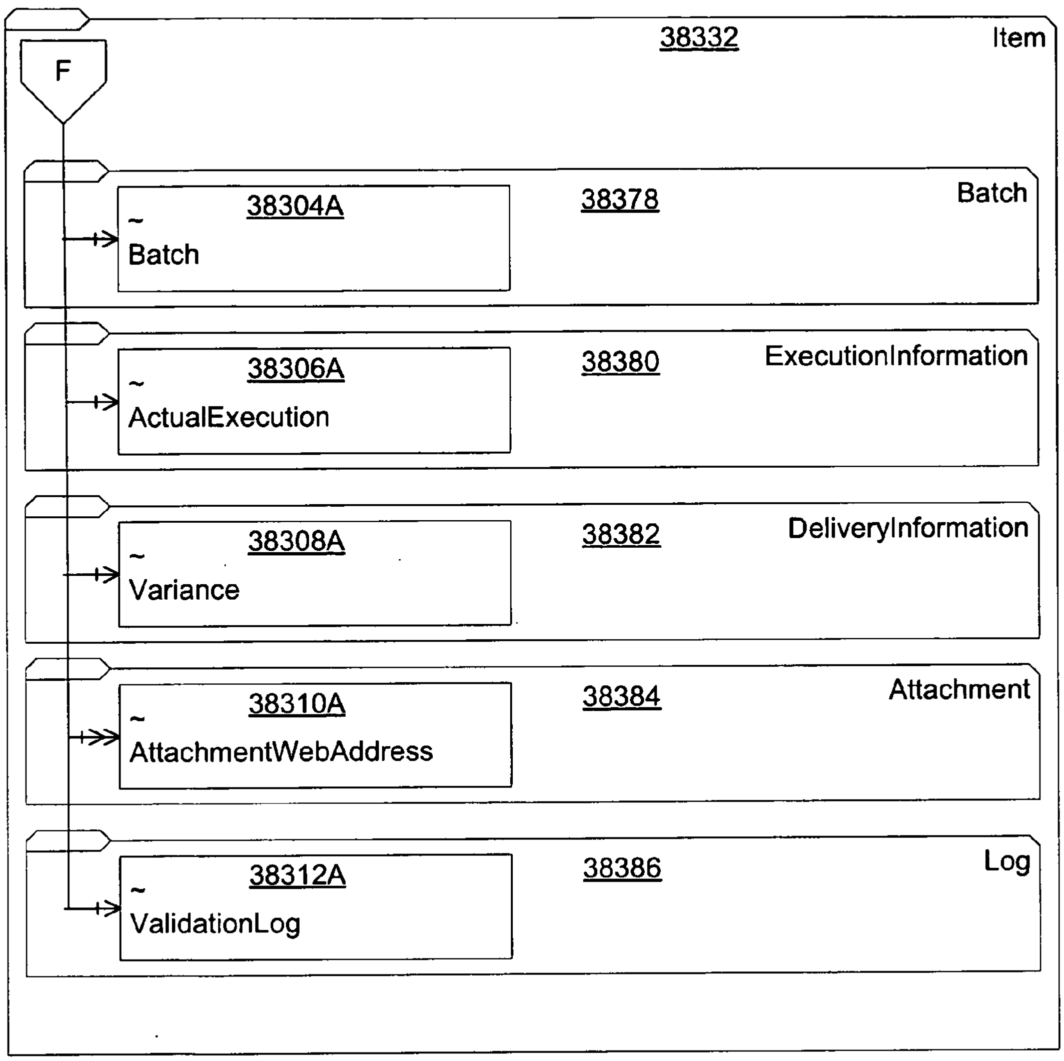
Figure 385:
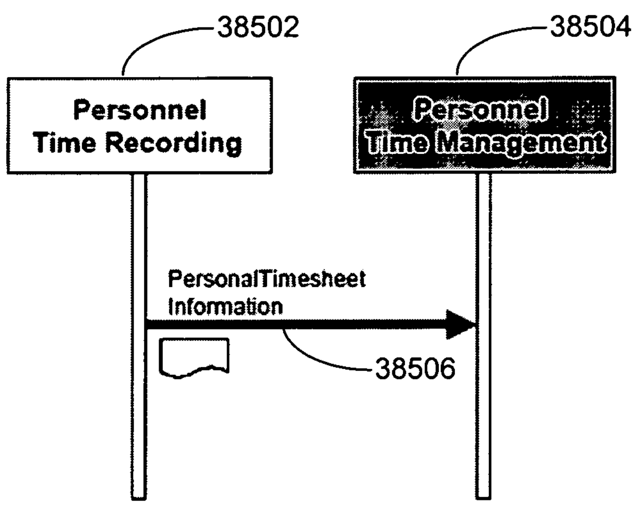
Figure 386:
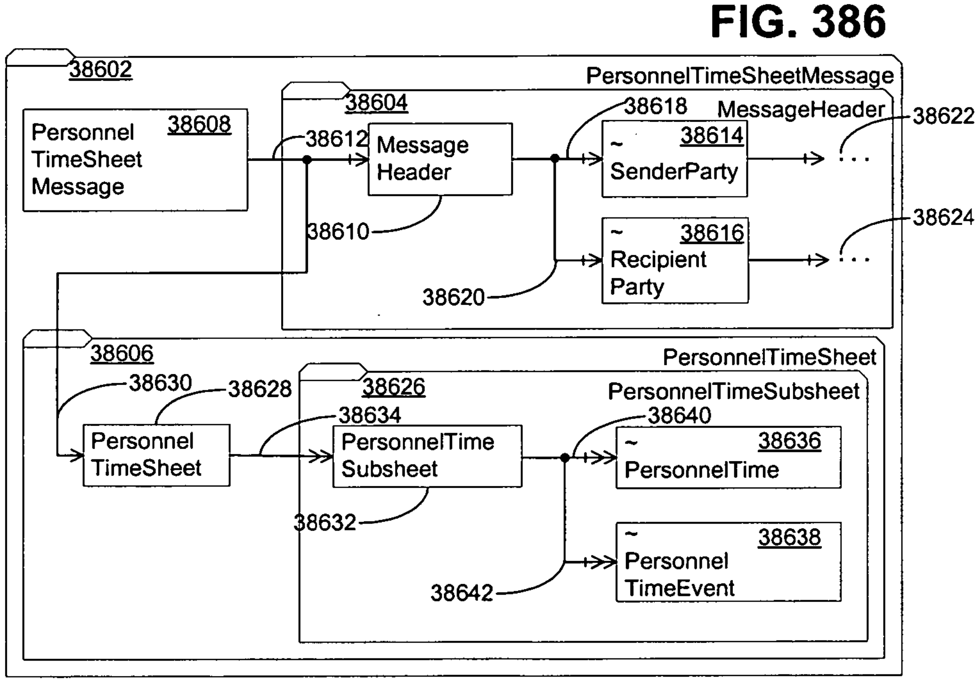
Figure 388:
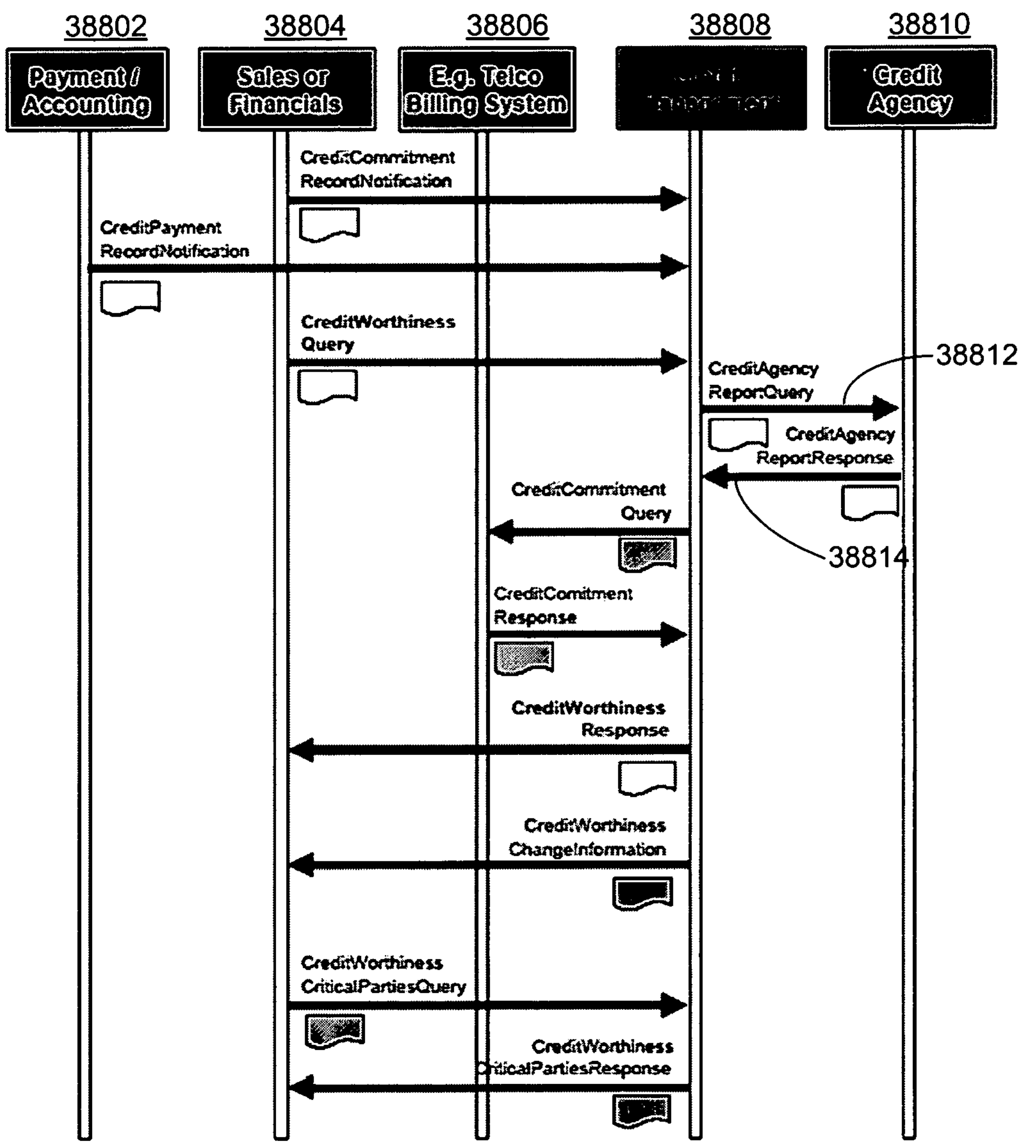
Figure 389:
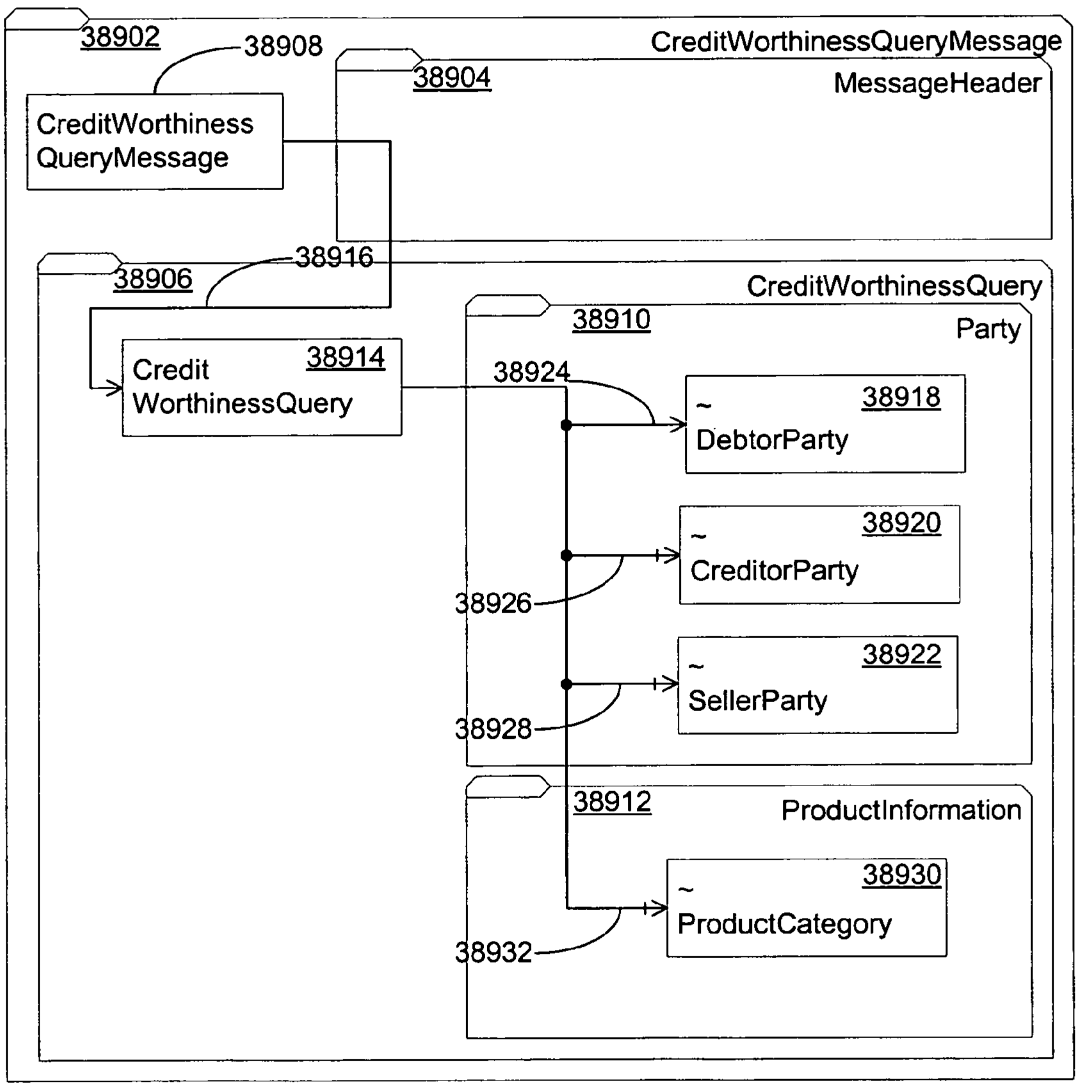
Figure 390:
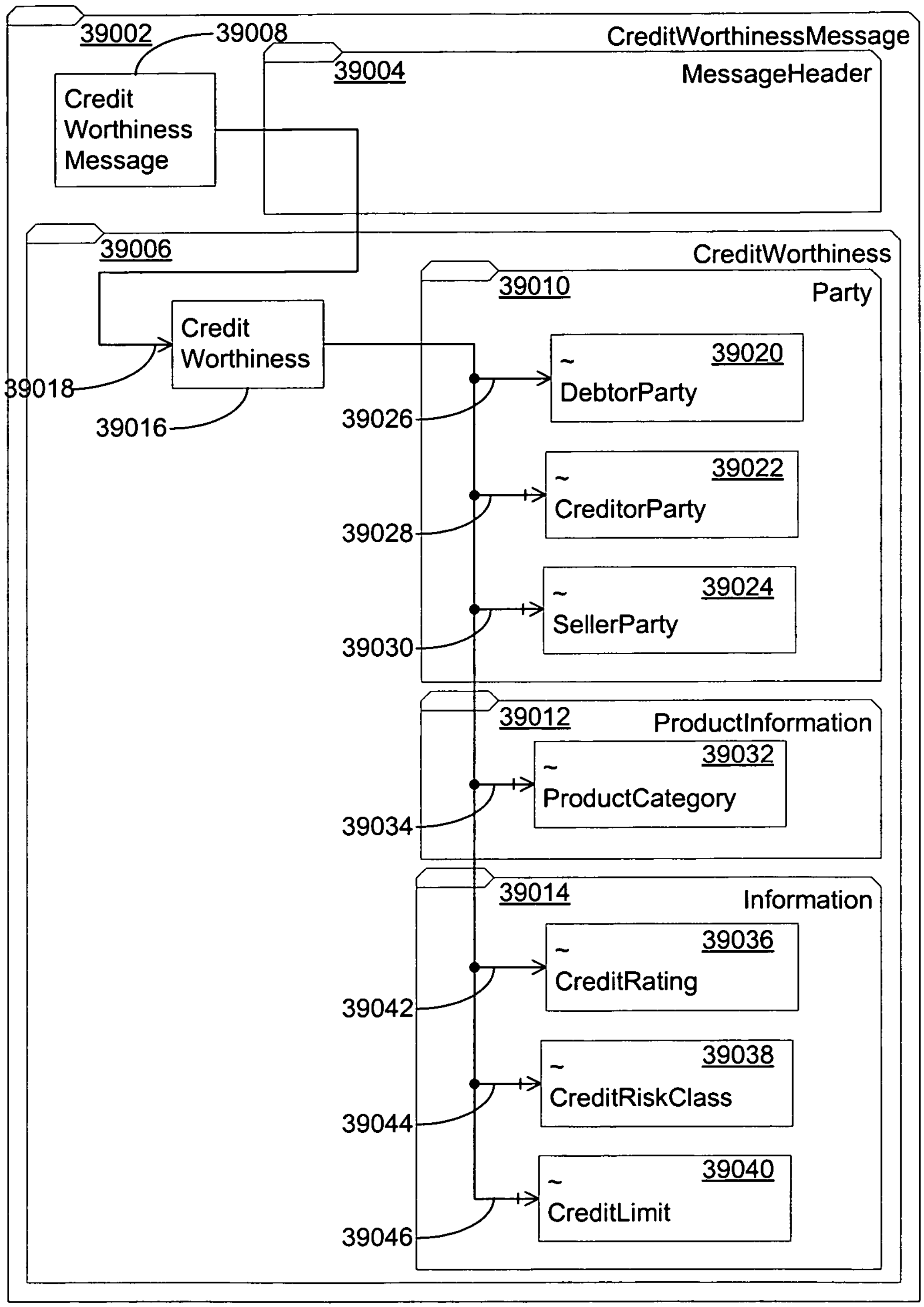
Figure 393:
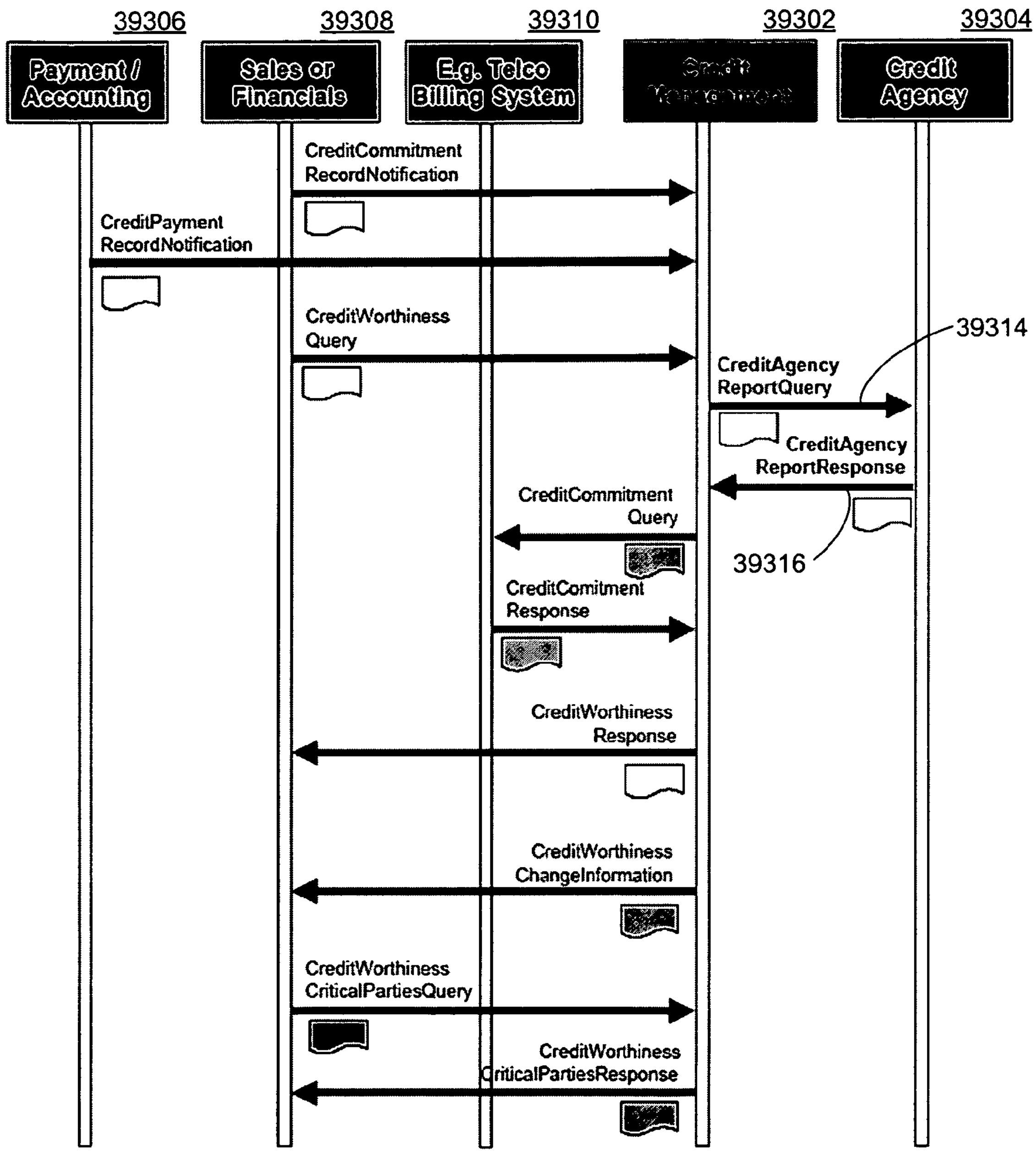
Figure 394:
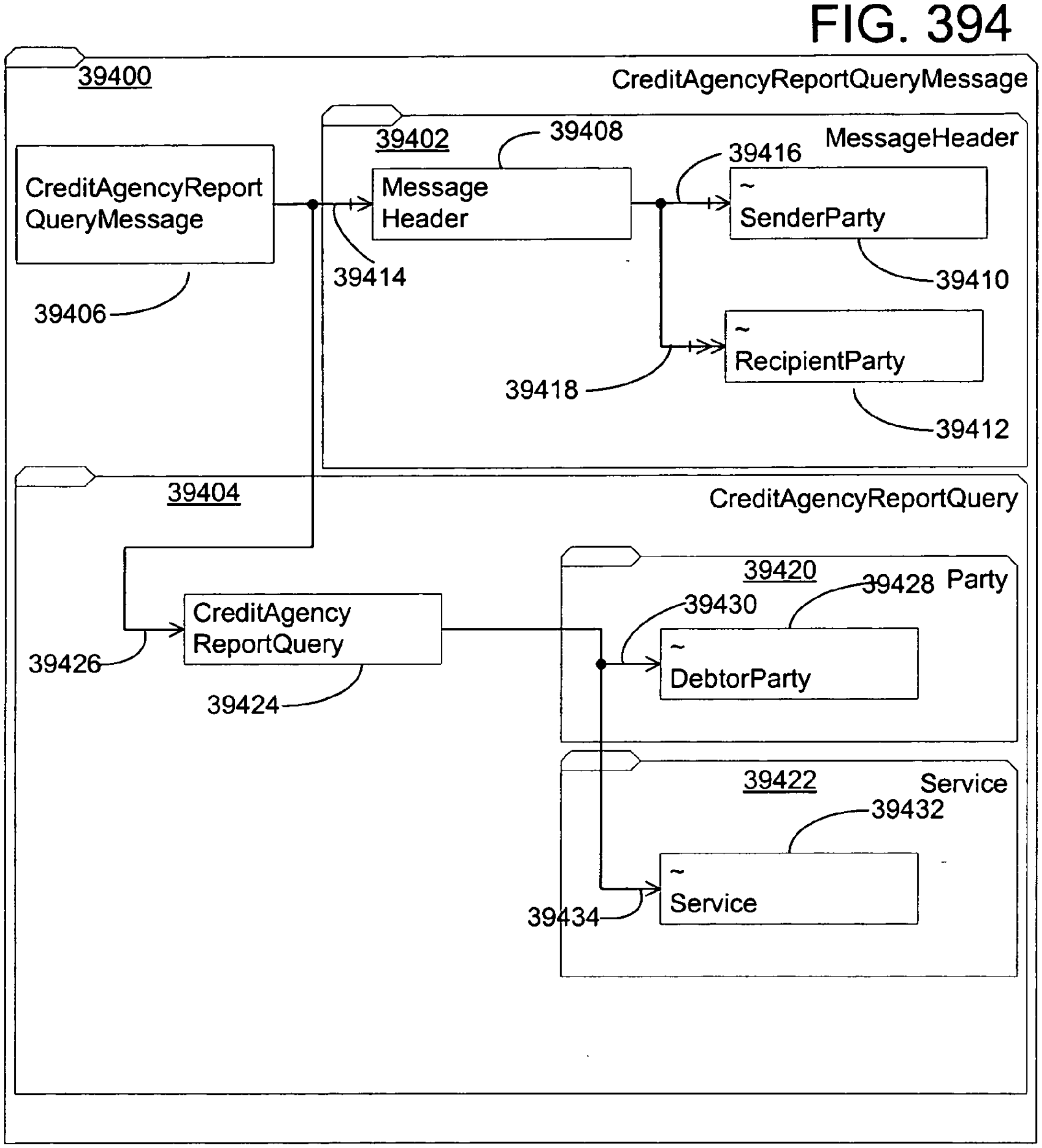
Figure 395A:
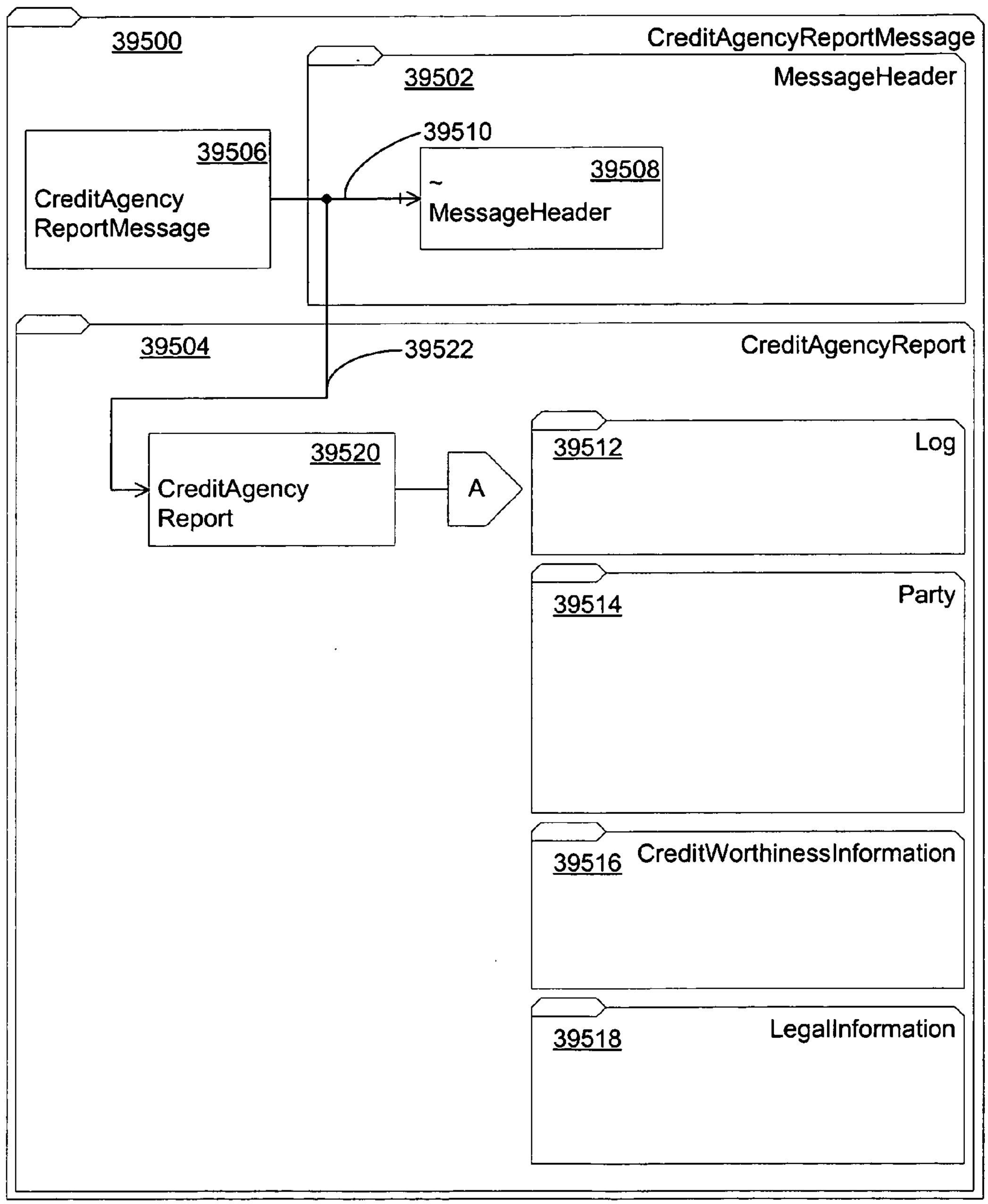
Figure 395B:
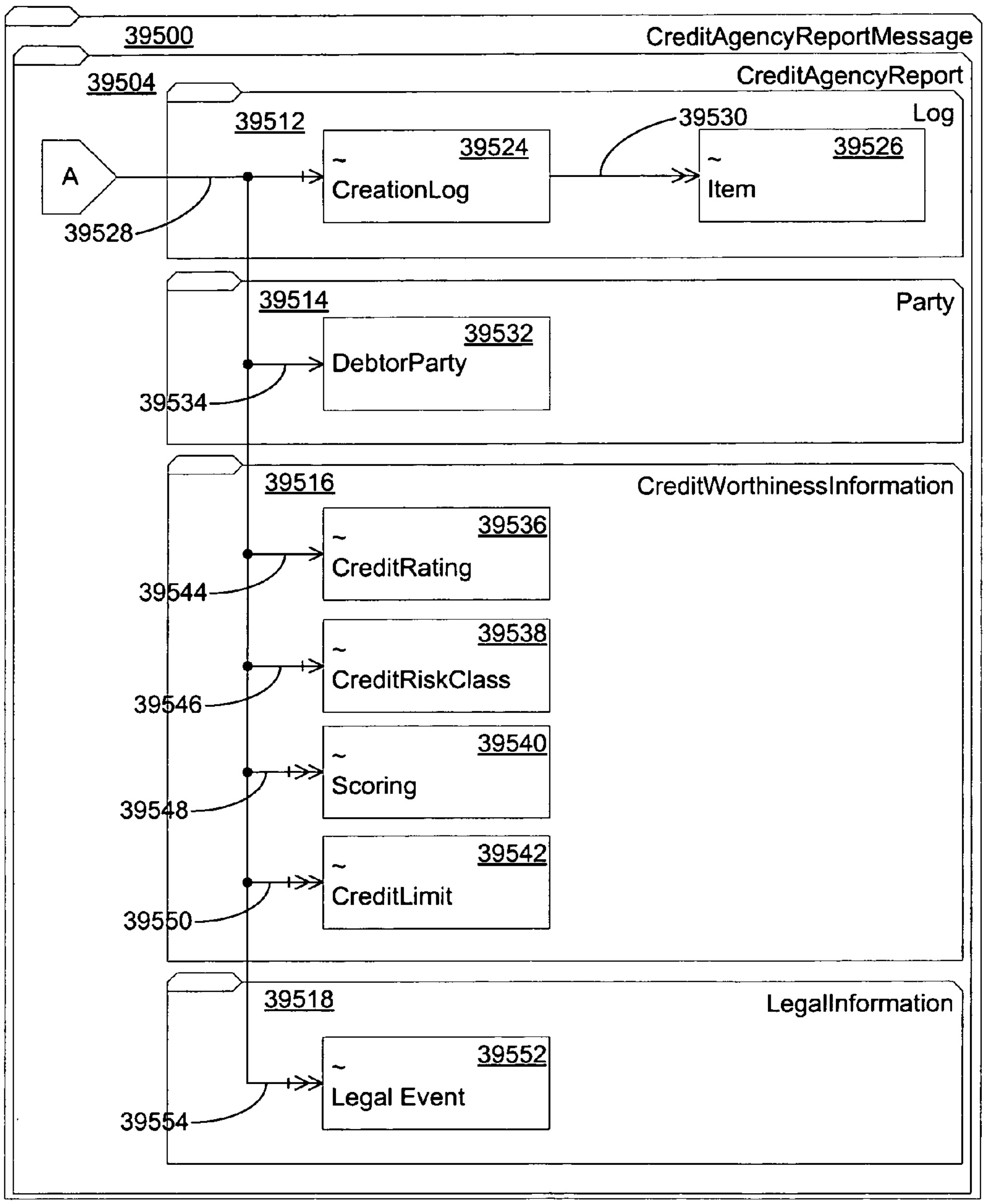
Figure 398:
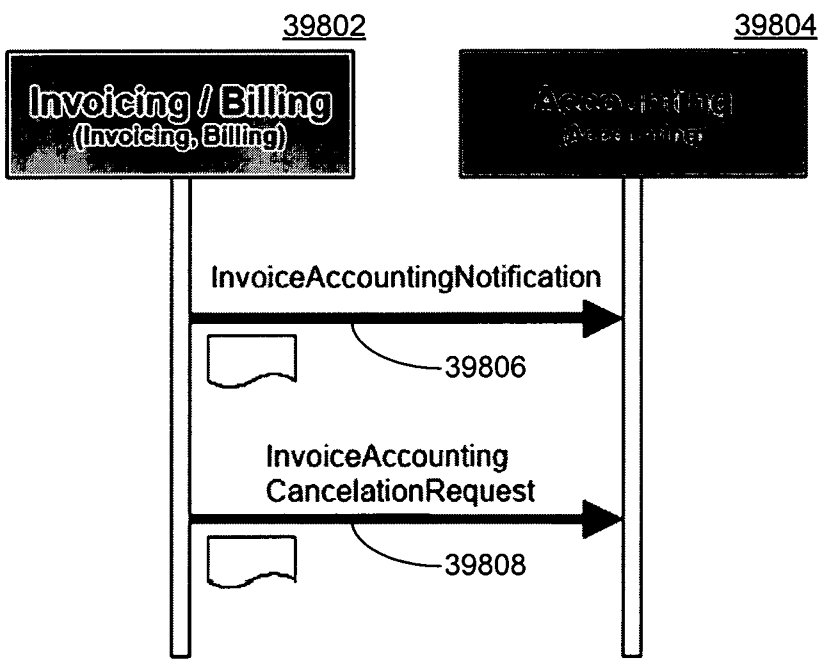
Figure 399:
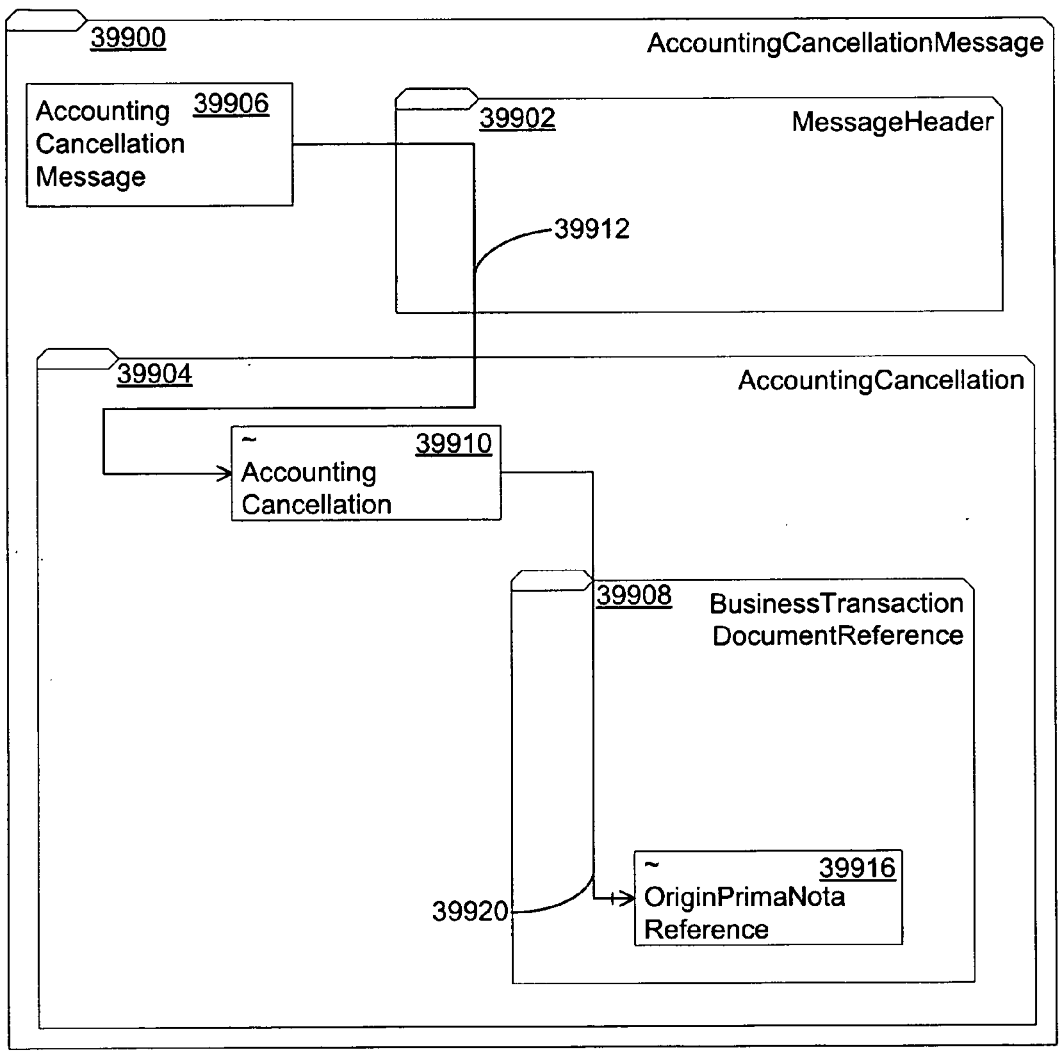
Figure 401:
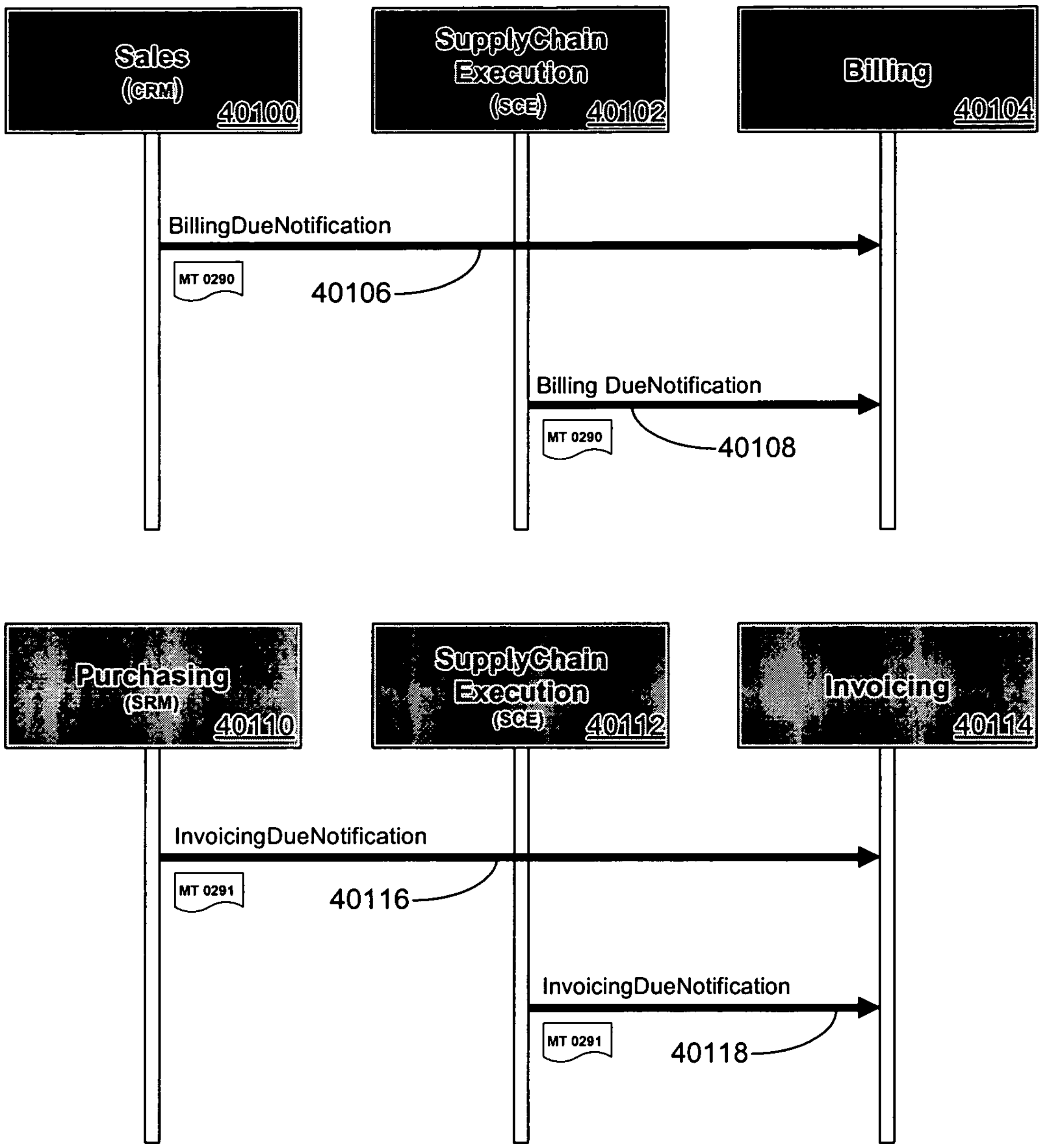
Figure 402A:
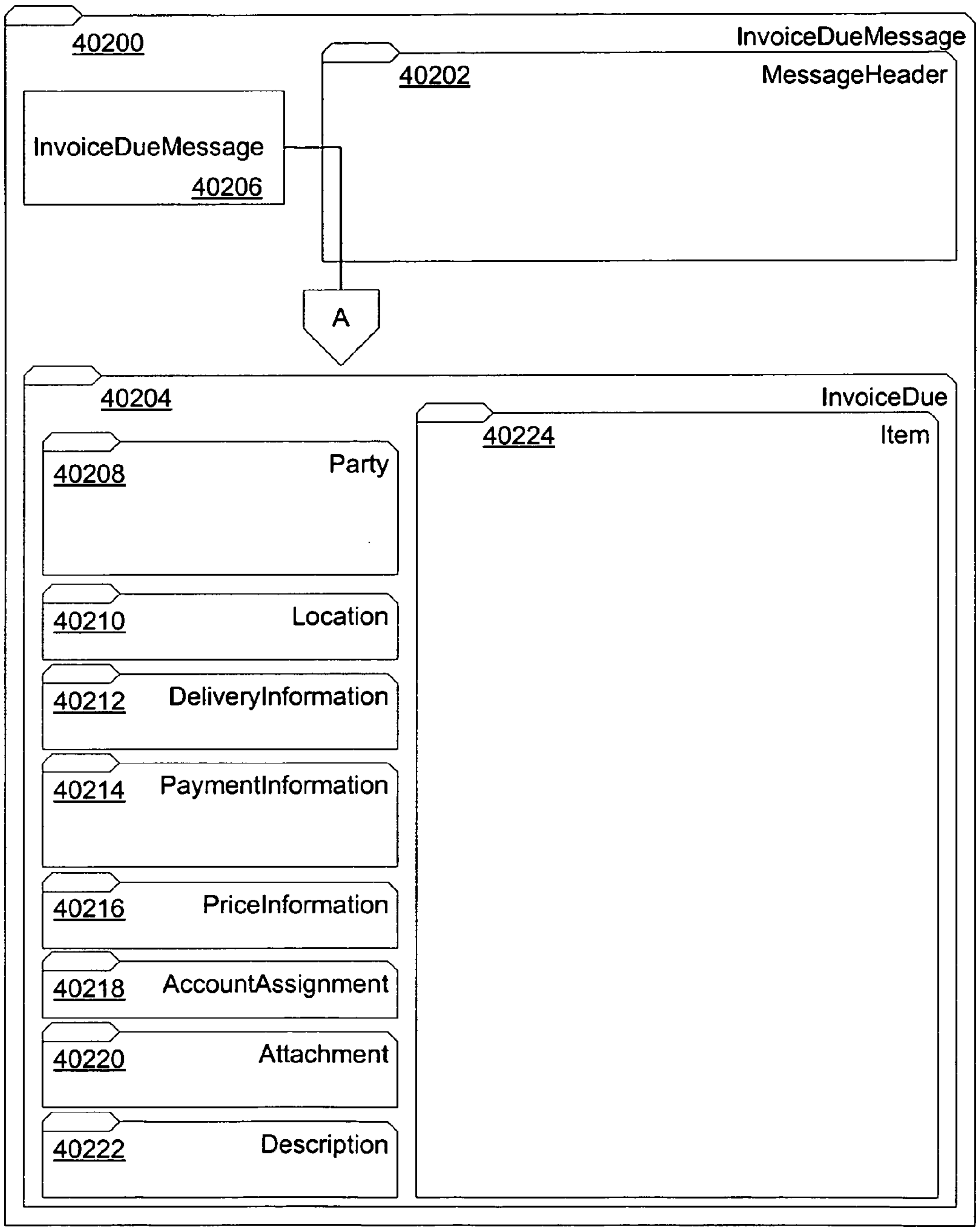
Figure 402B:
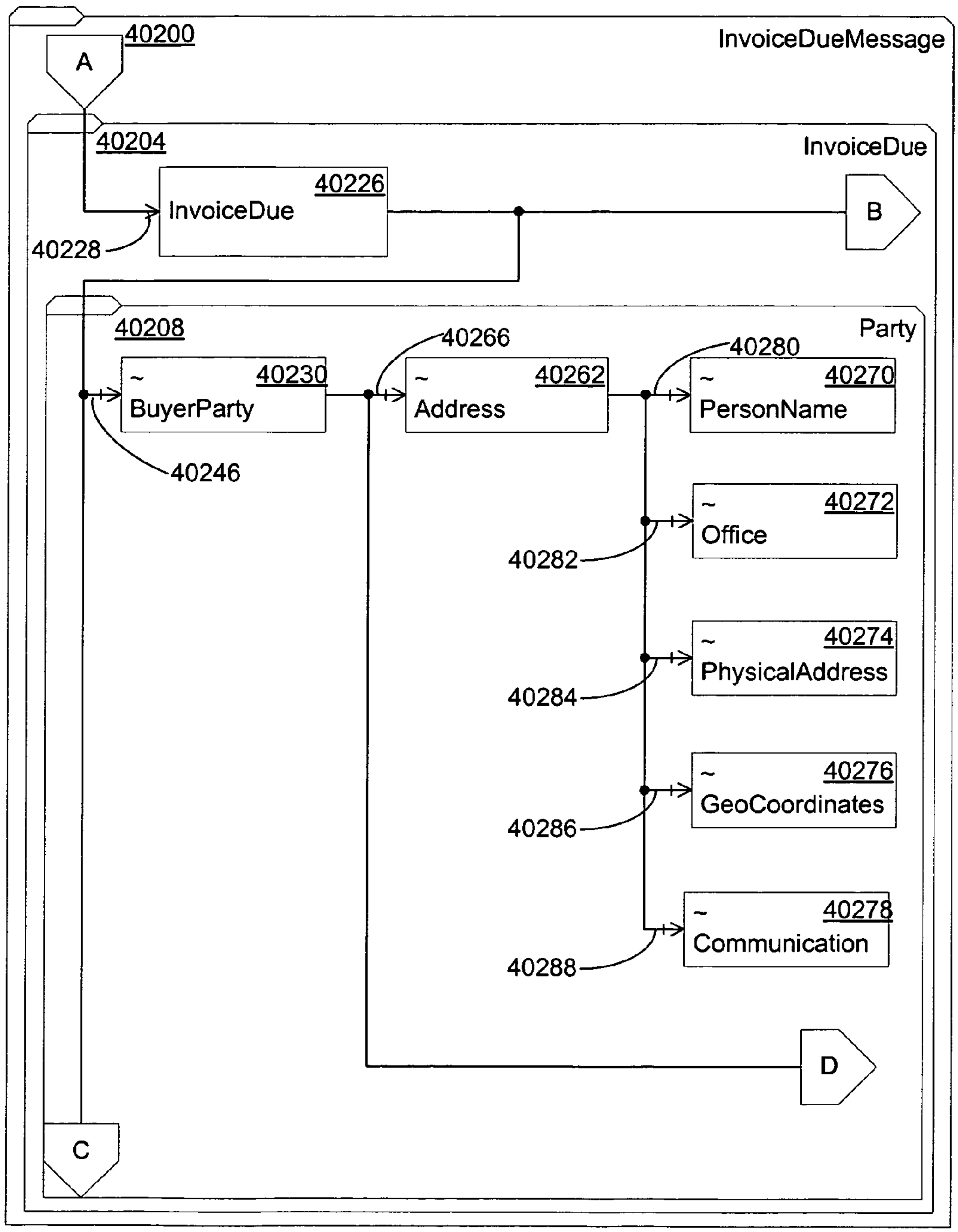
Figure 402C:
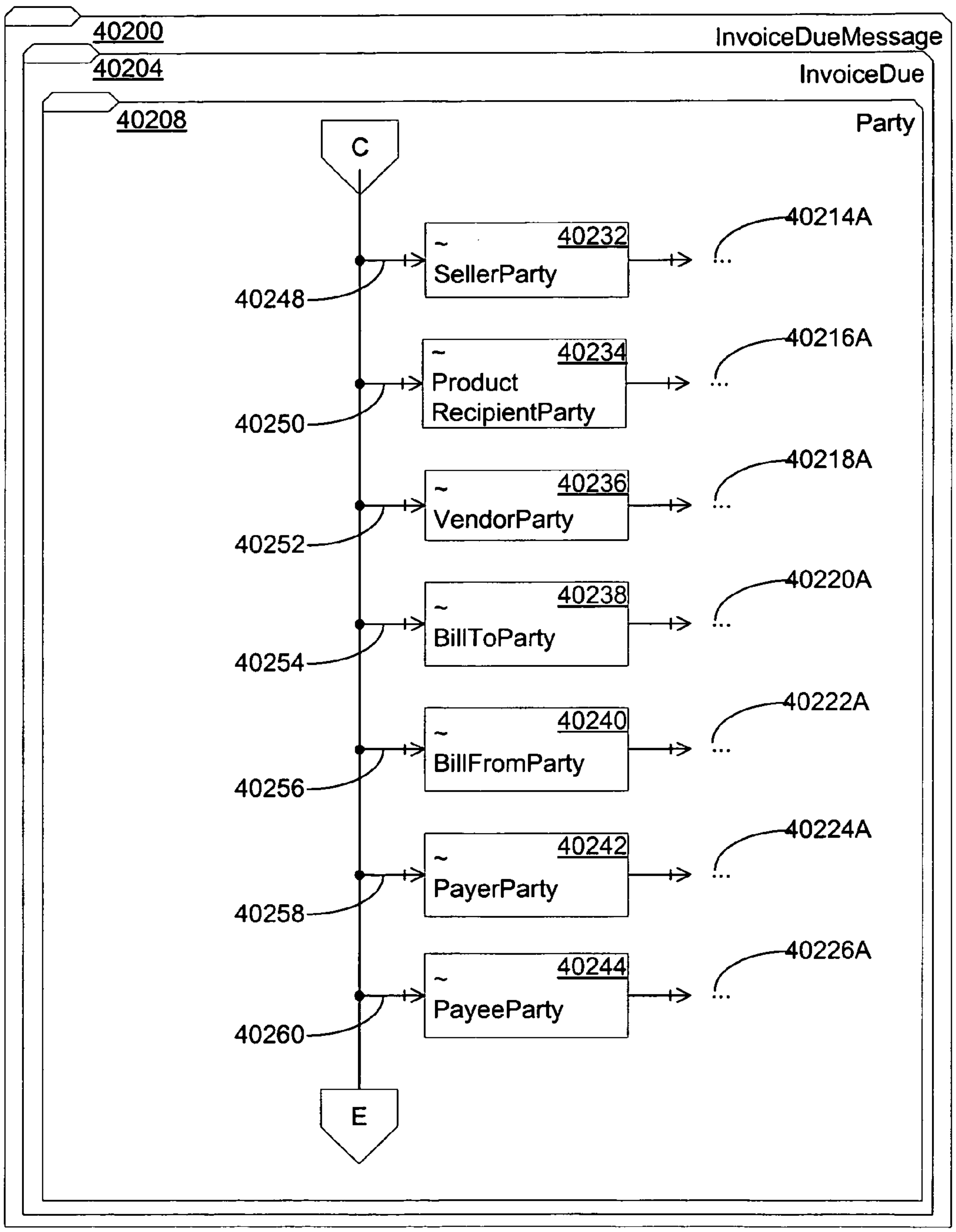
Figure 402D:
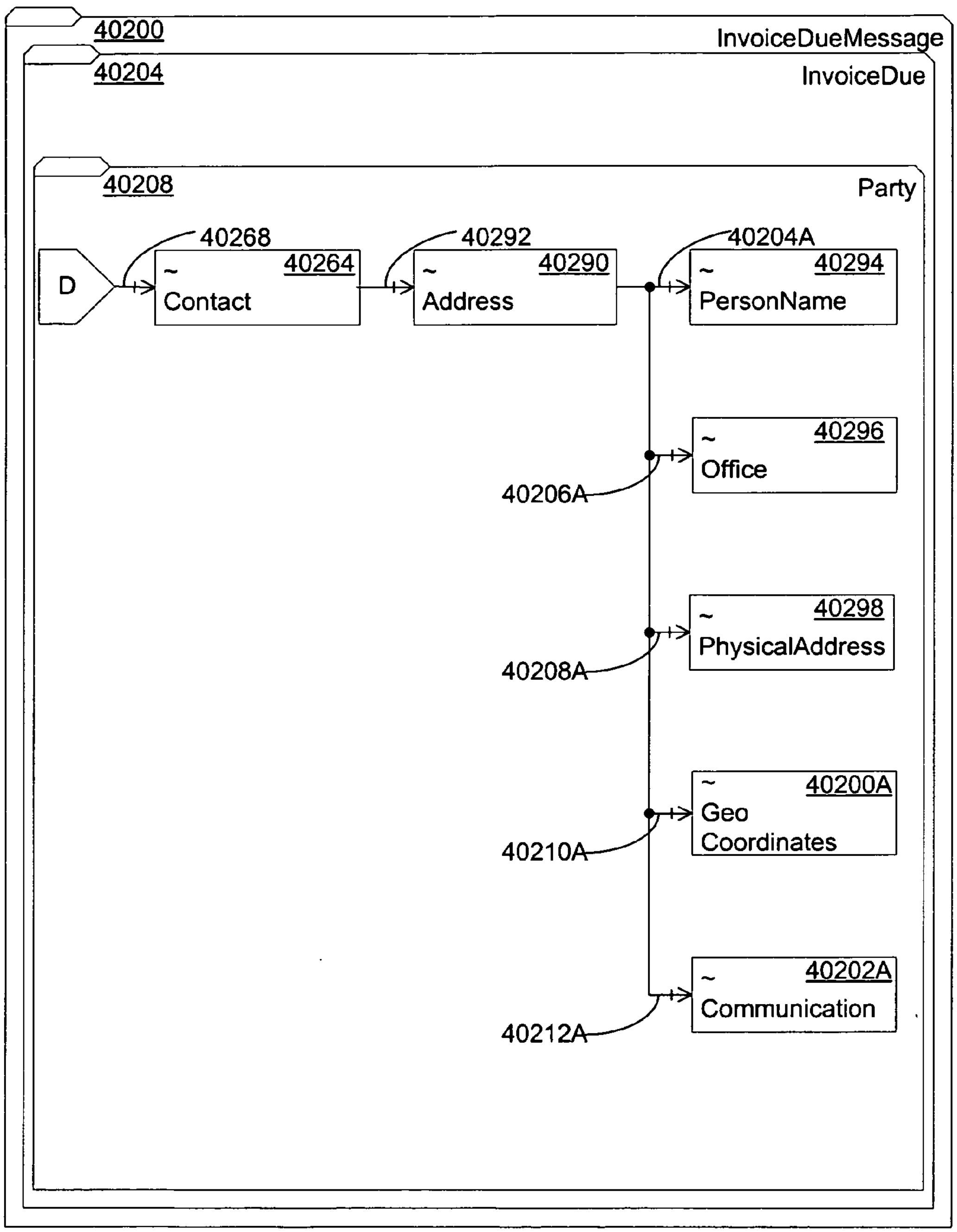
Figure 402E:
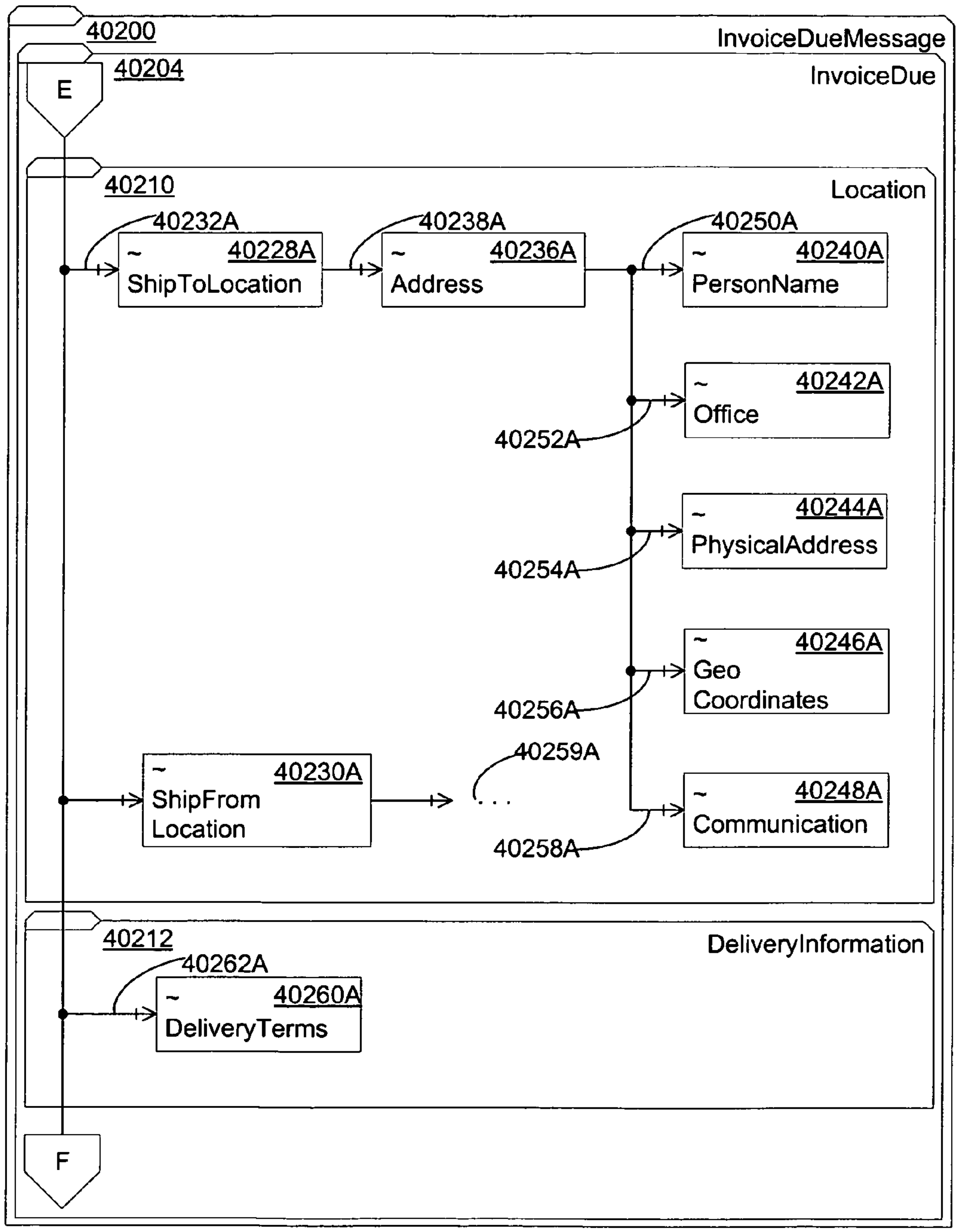
Figure 402F:
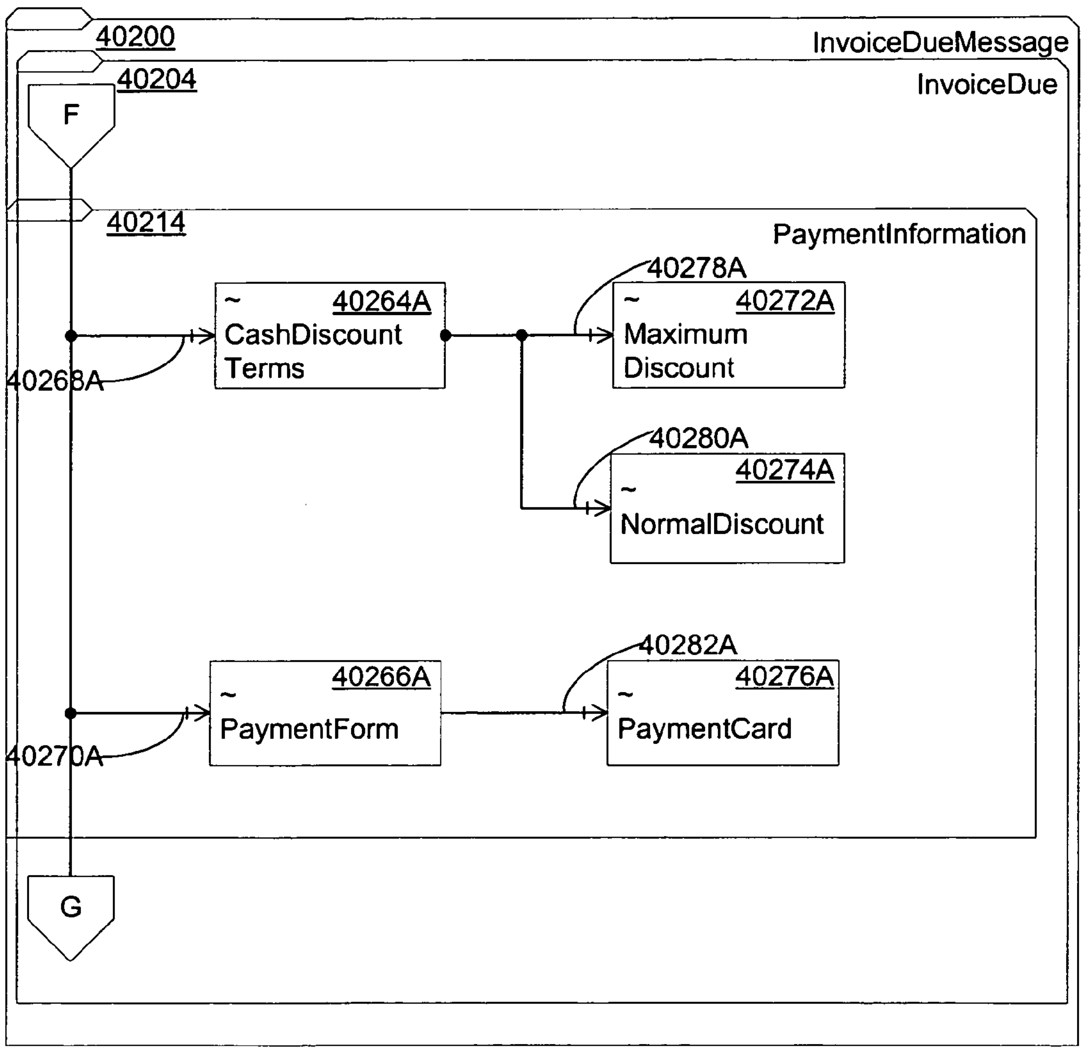
Figure 402G:
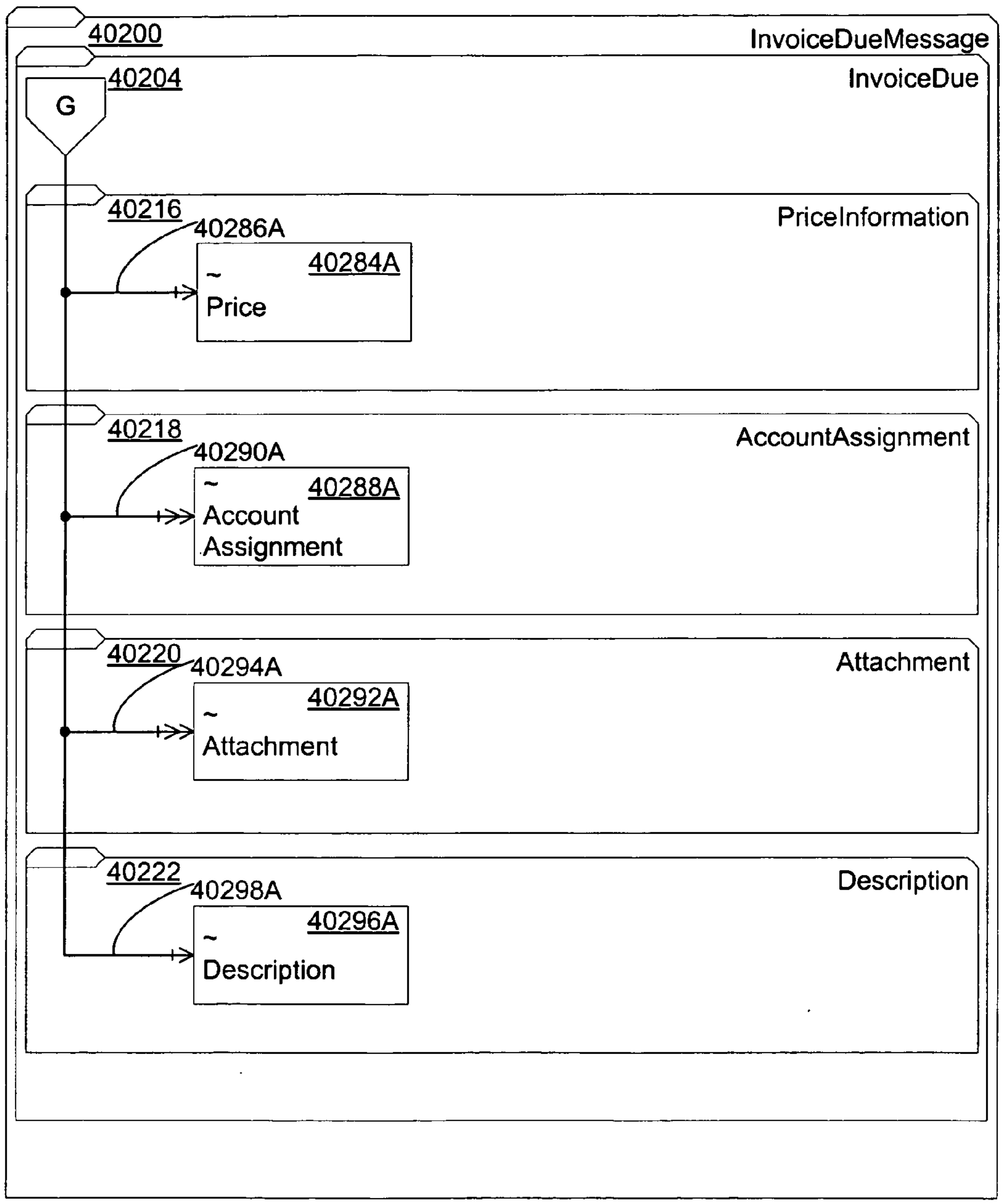
Figure 402H:
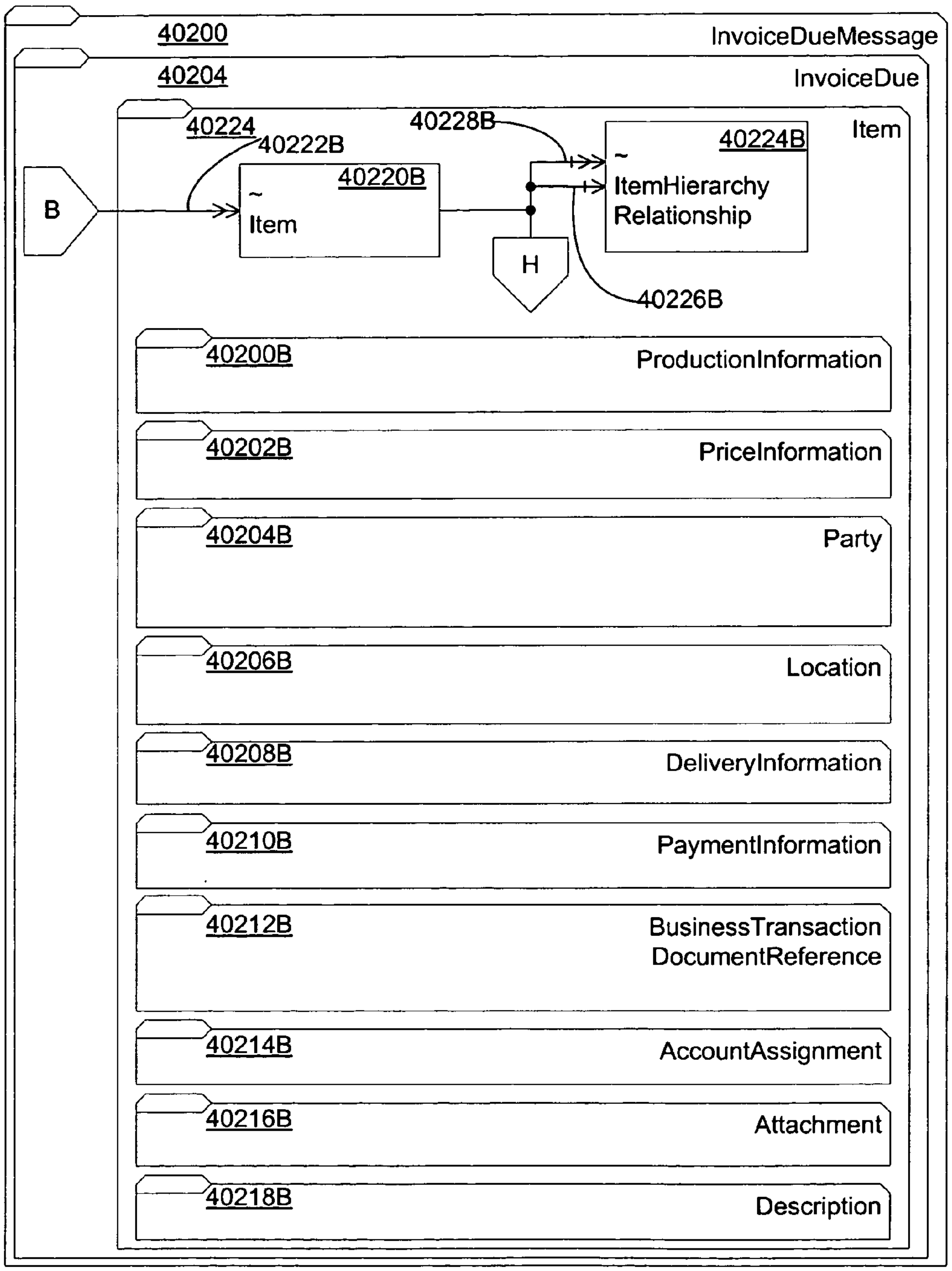
Figure 402I:
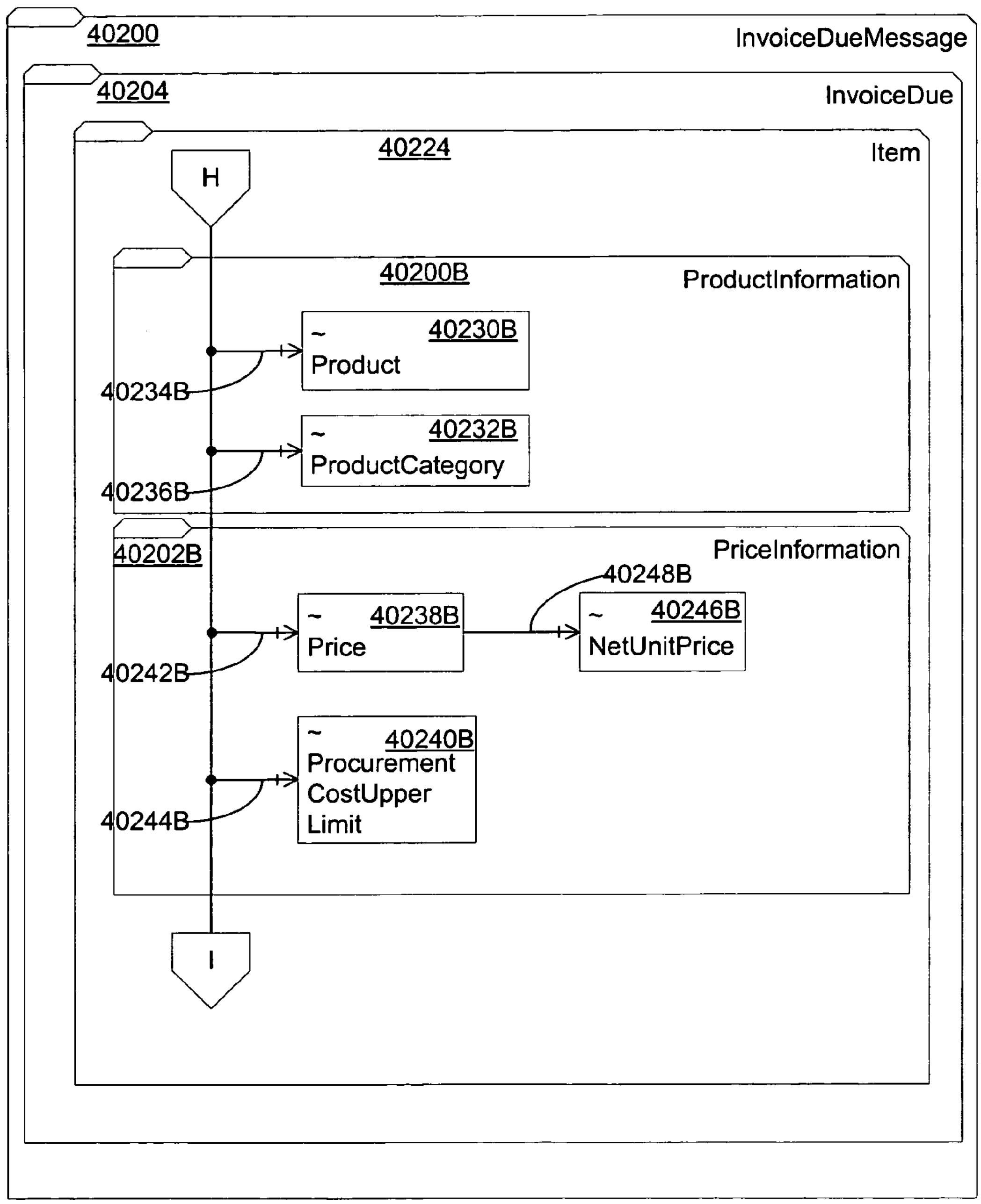
Figure 402J:
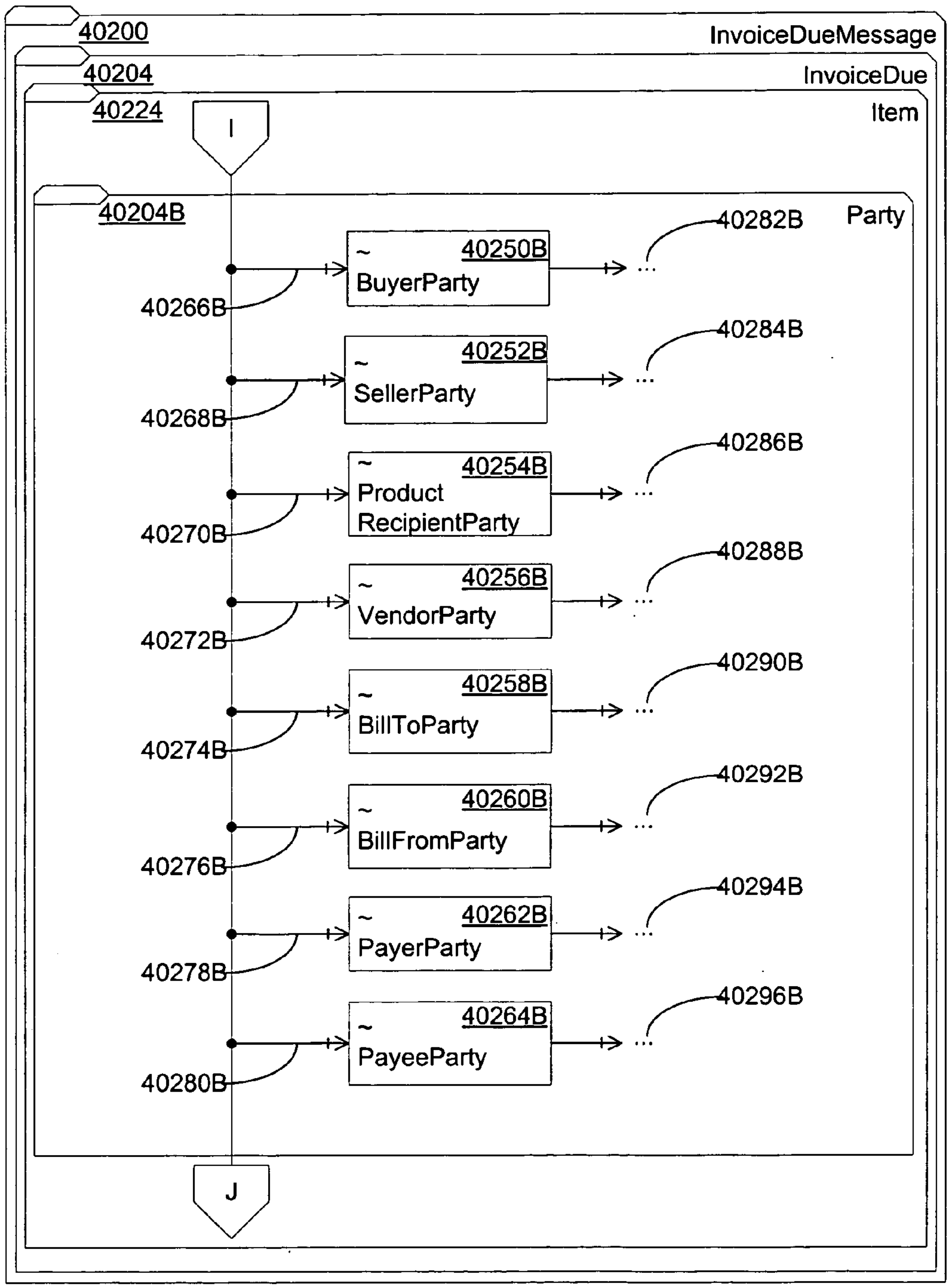
Figure 402K:
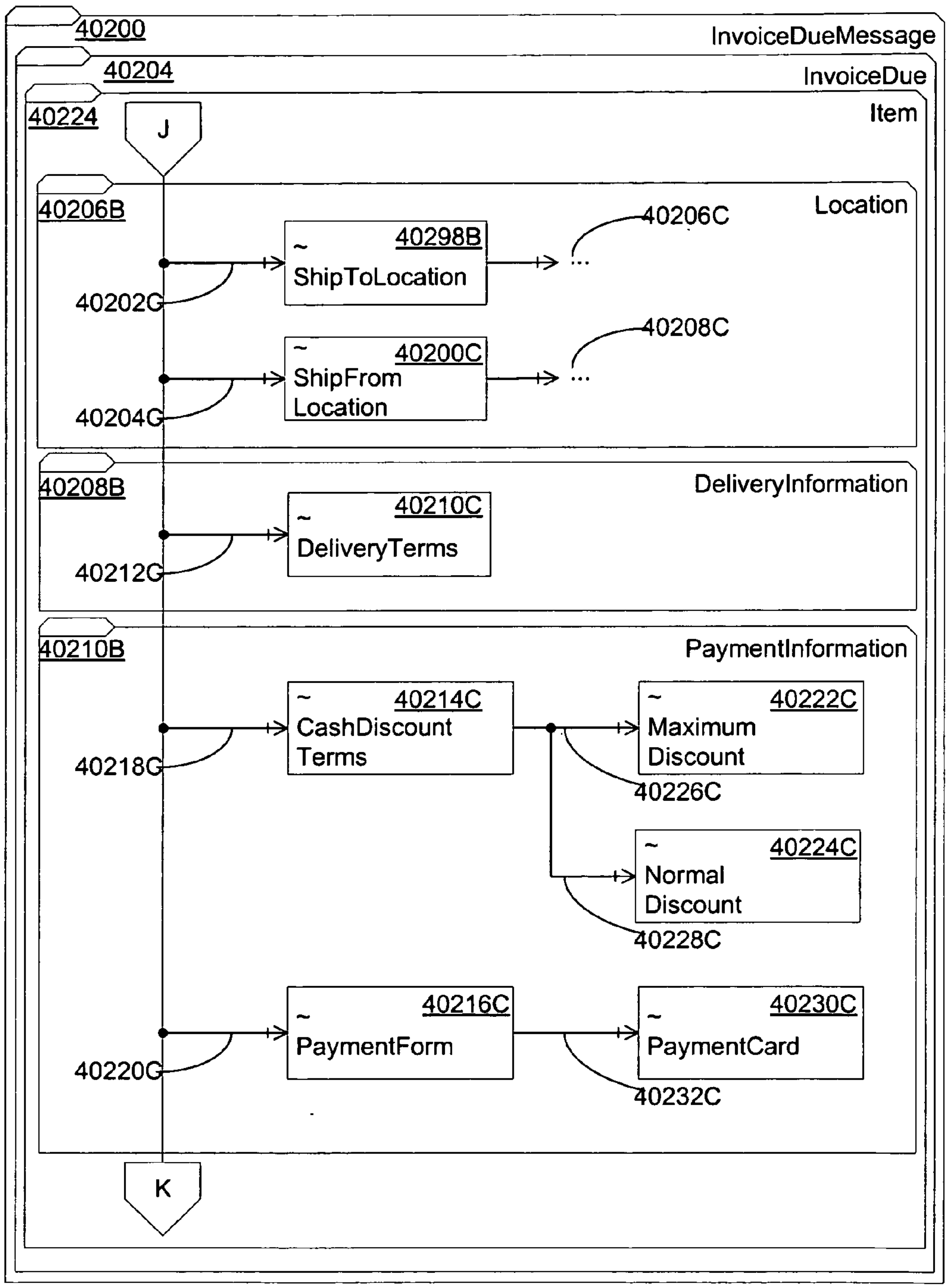
Figure 402L:
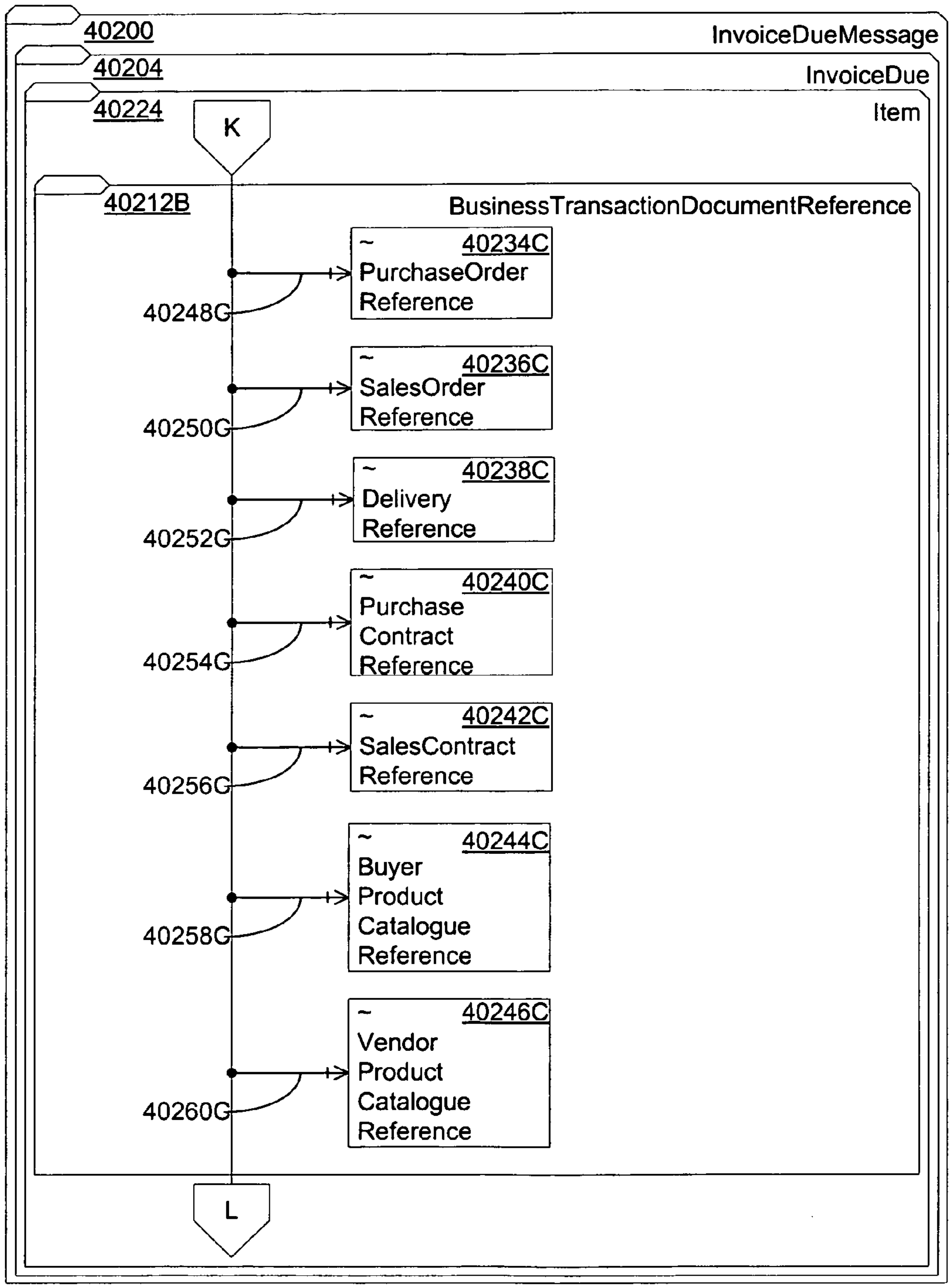
Figure 402M:
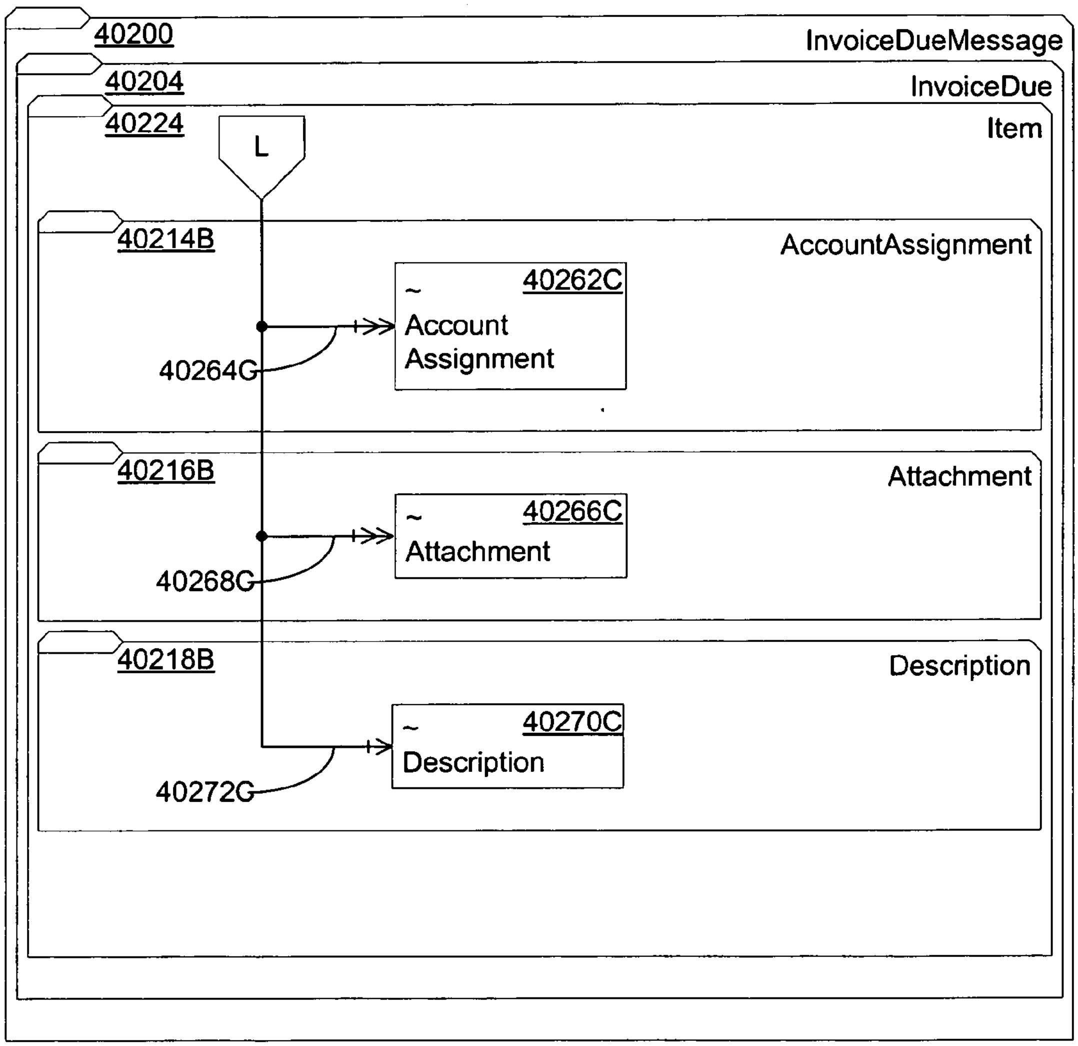
Figure 403:
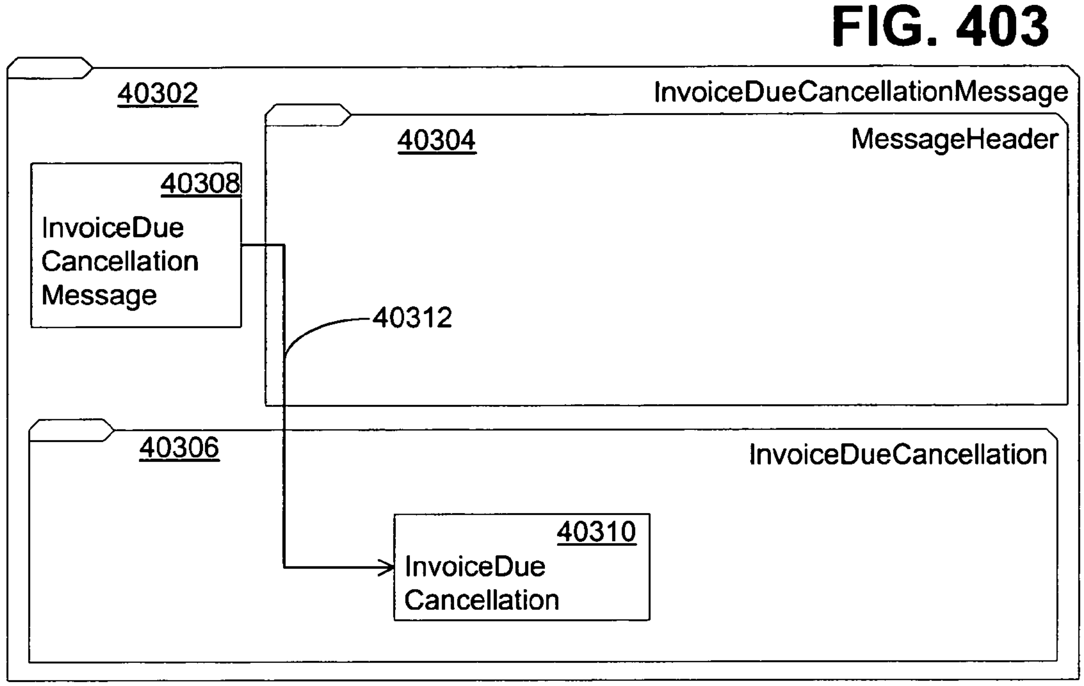
Figure 405:
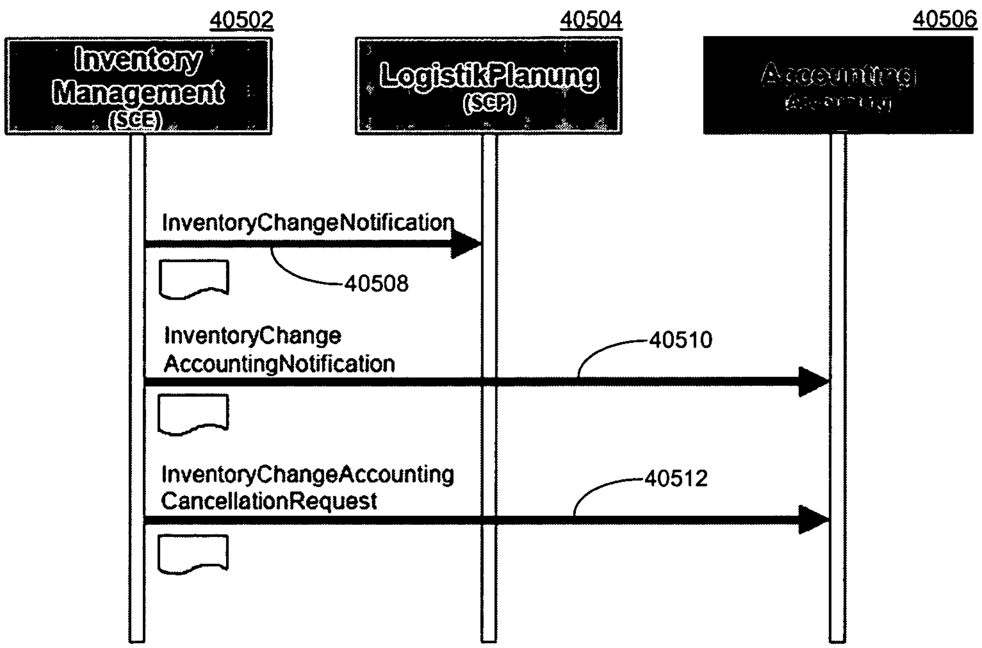
Figure 406A:
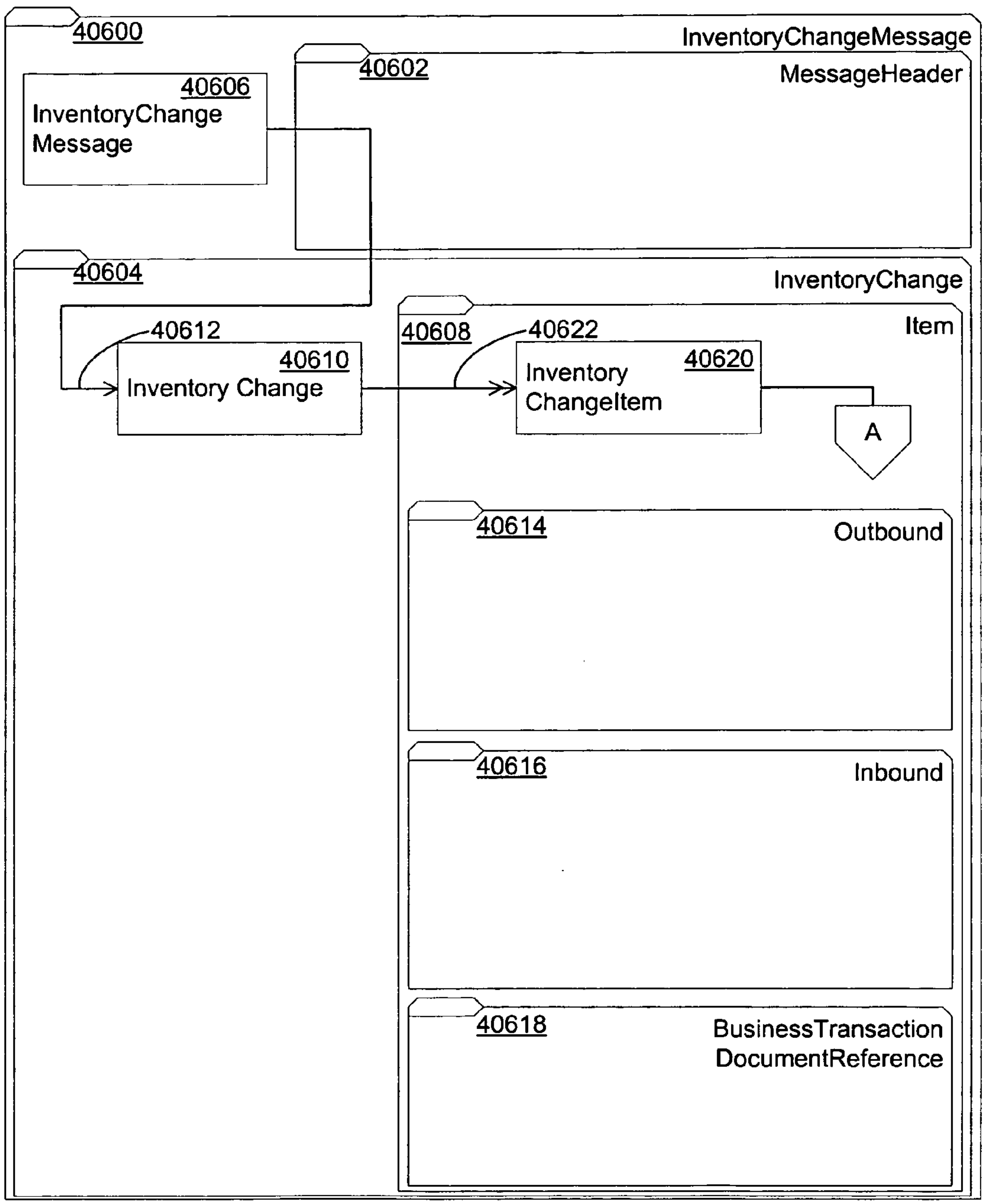
Figure 406B:
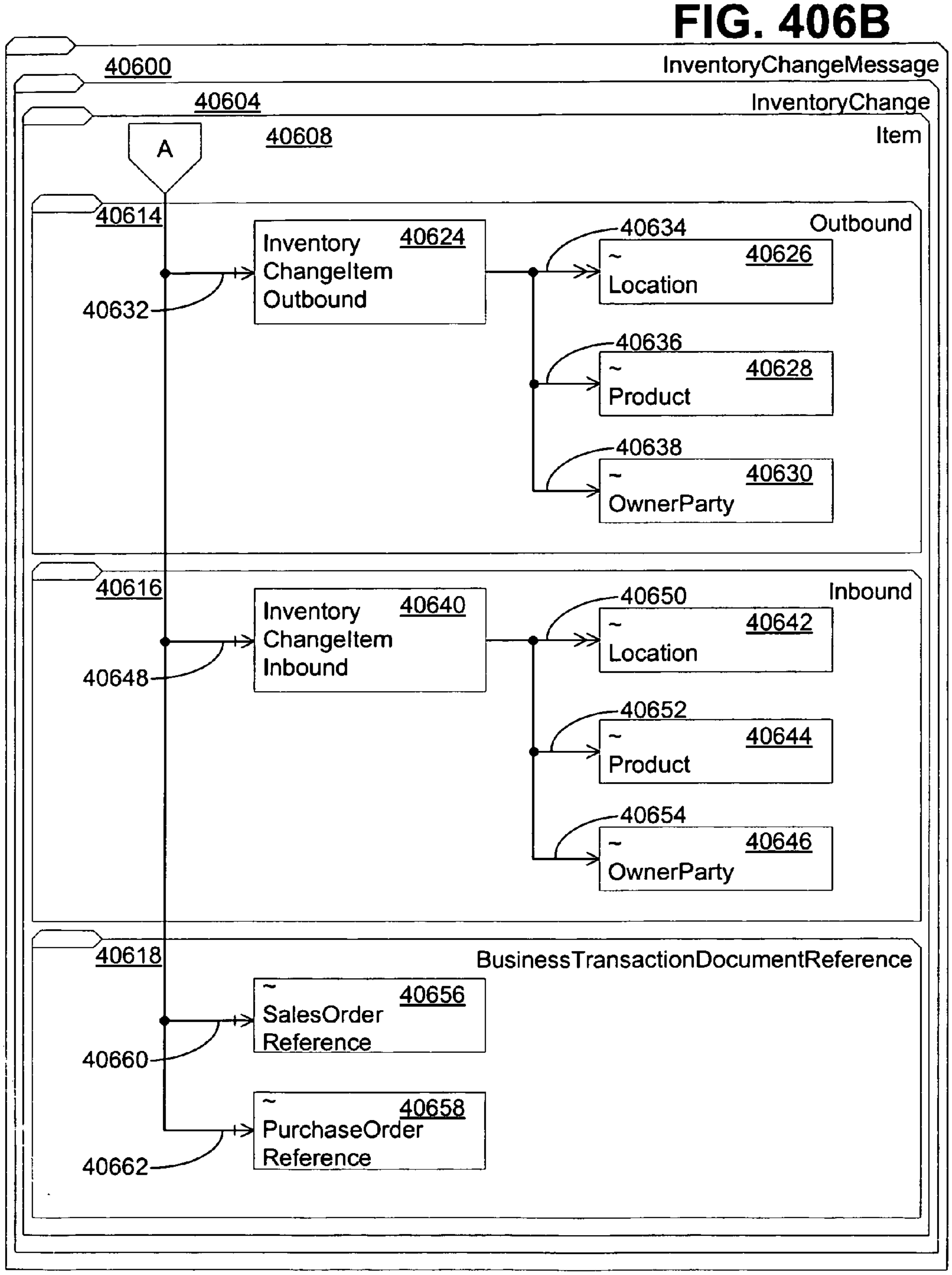
Figure 408:
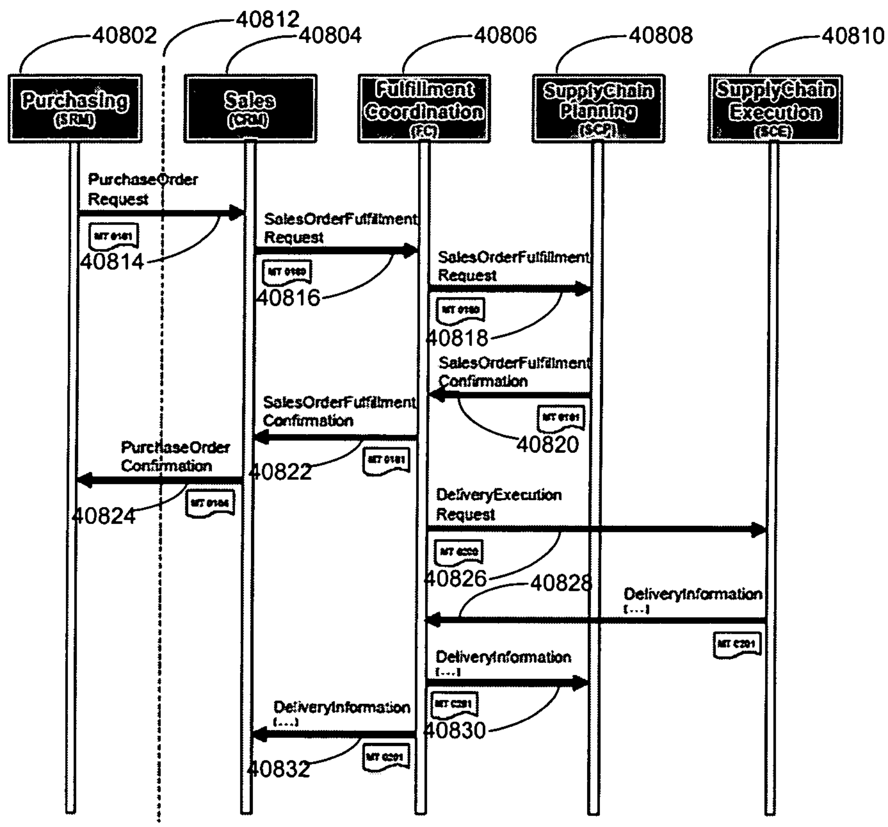
Figure 411:
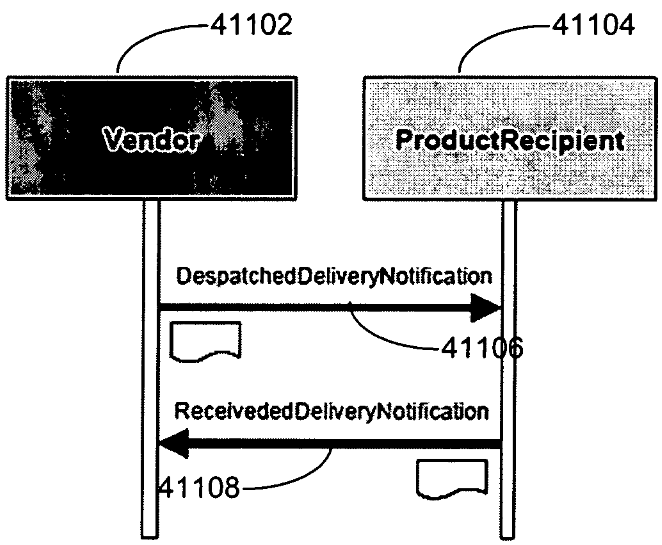
Figure 412A:
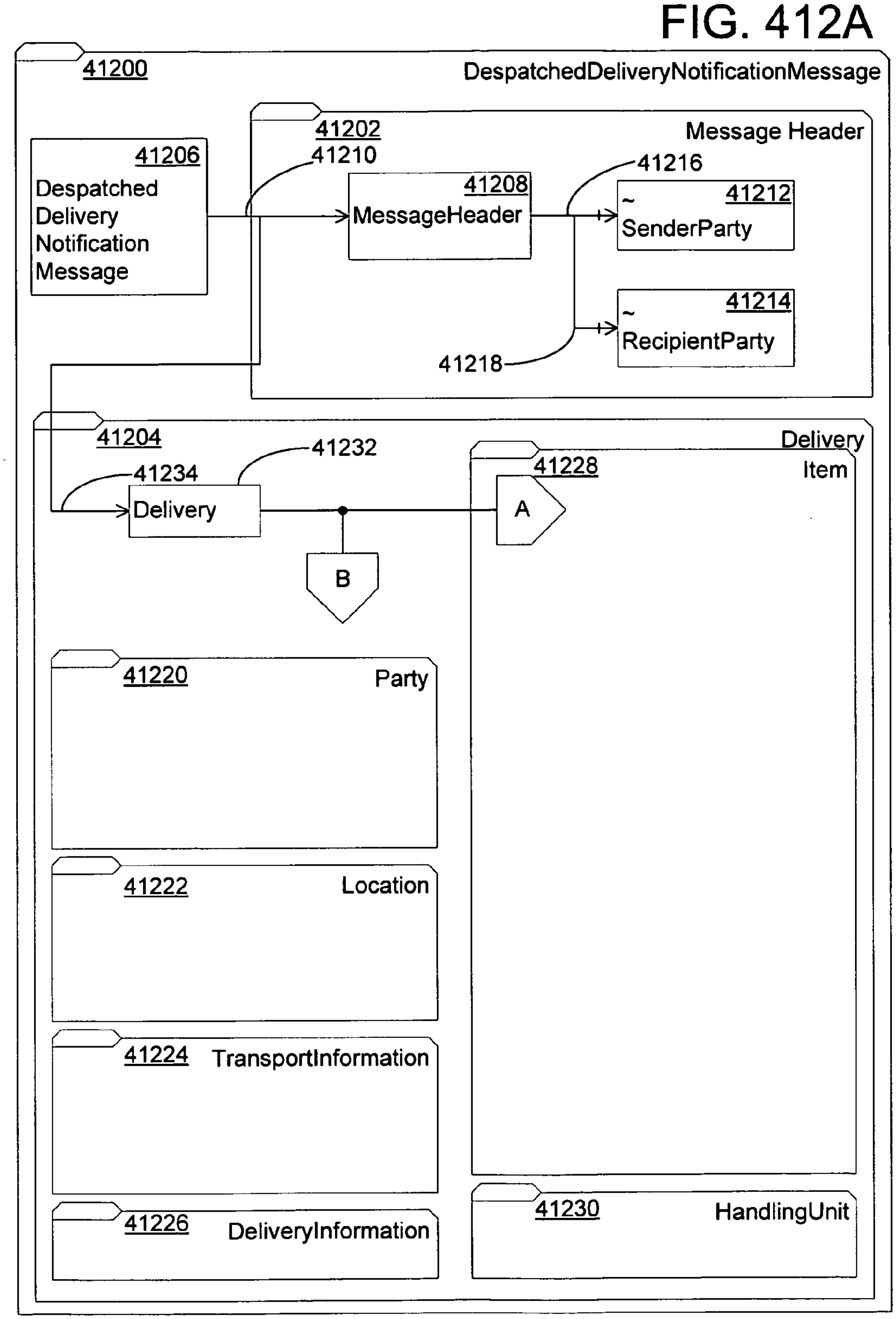
Figure 412B:
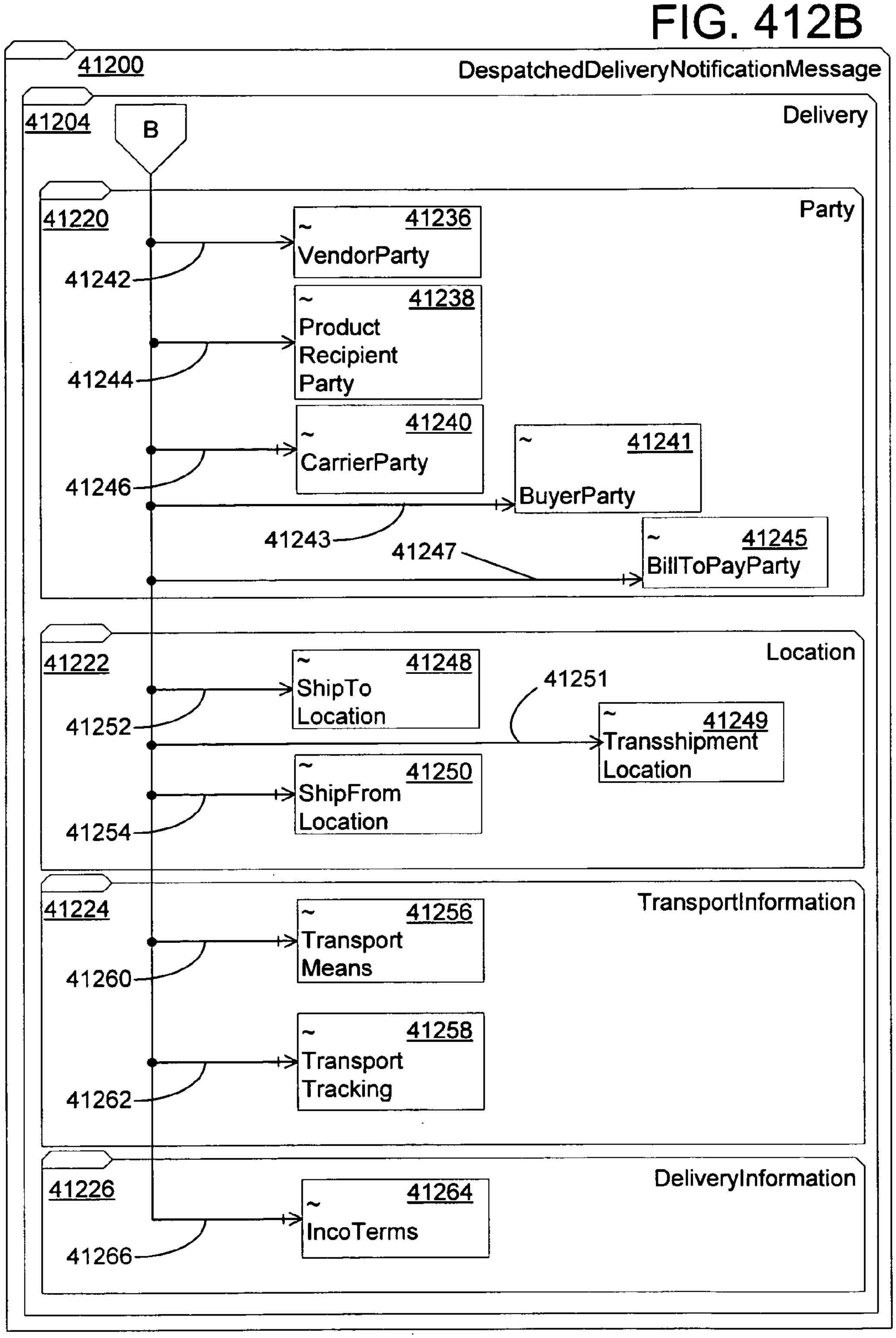
Figure 412C:
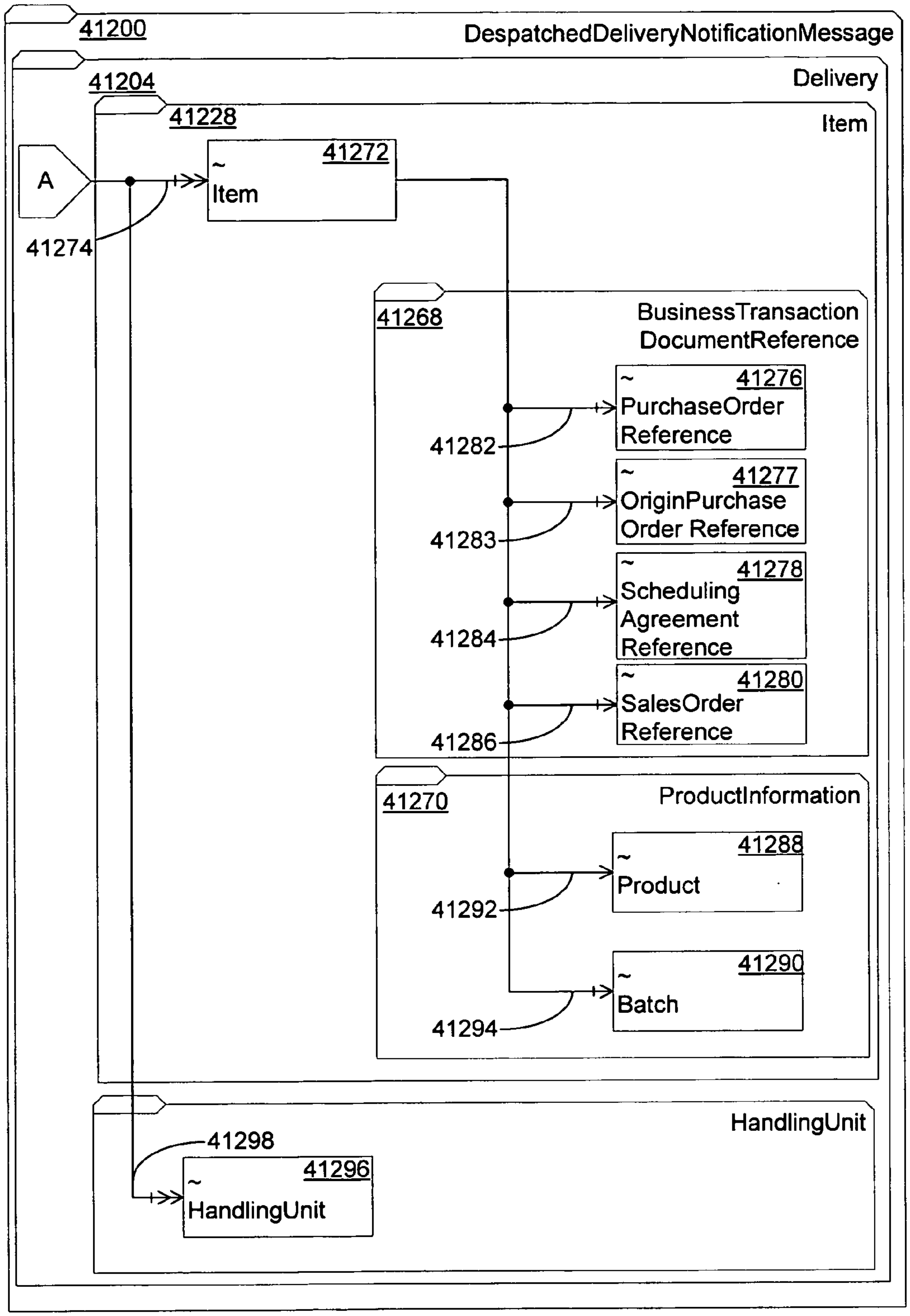
Figure 413:
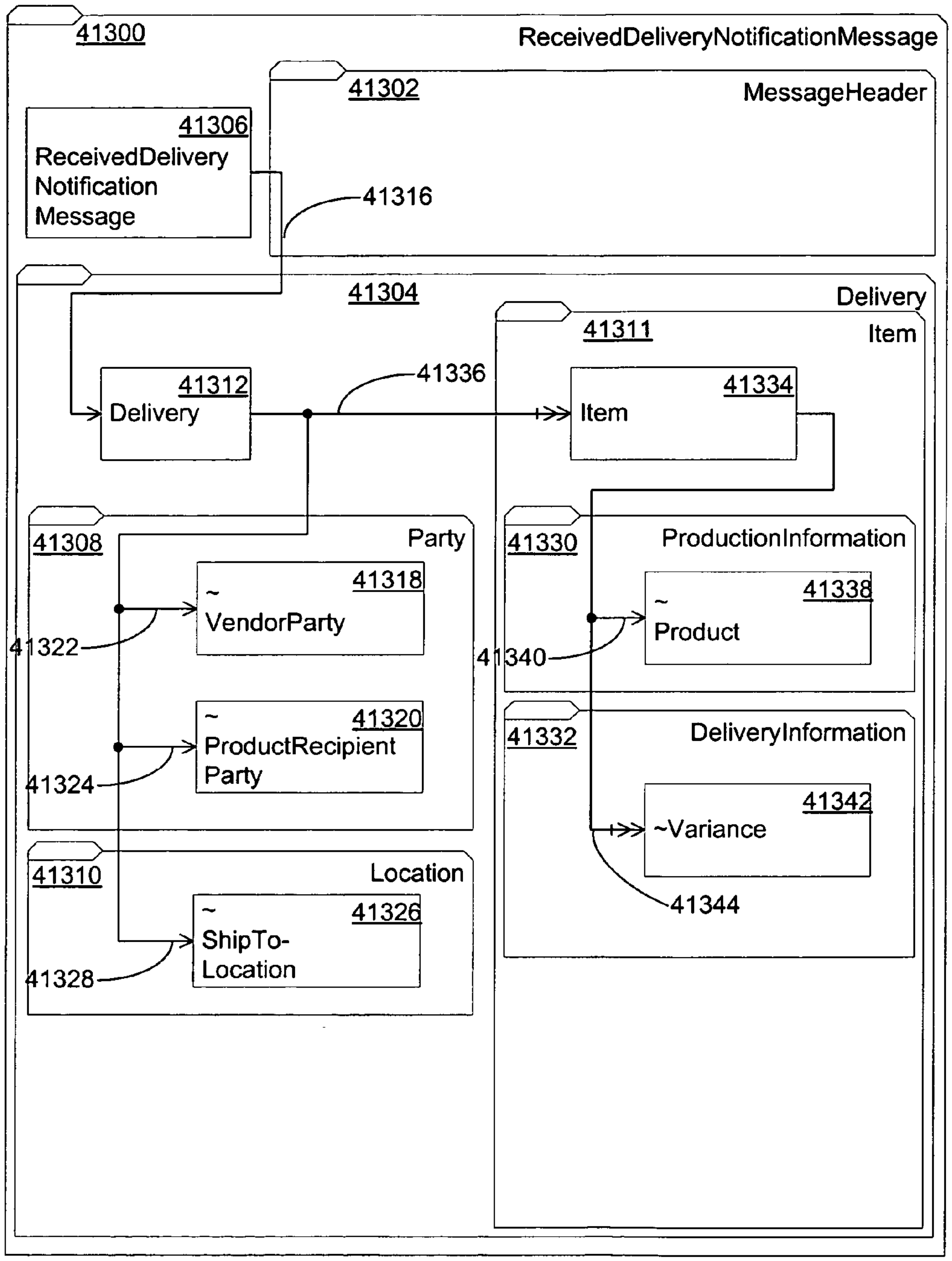
Figure 416:
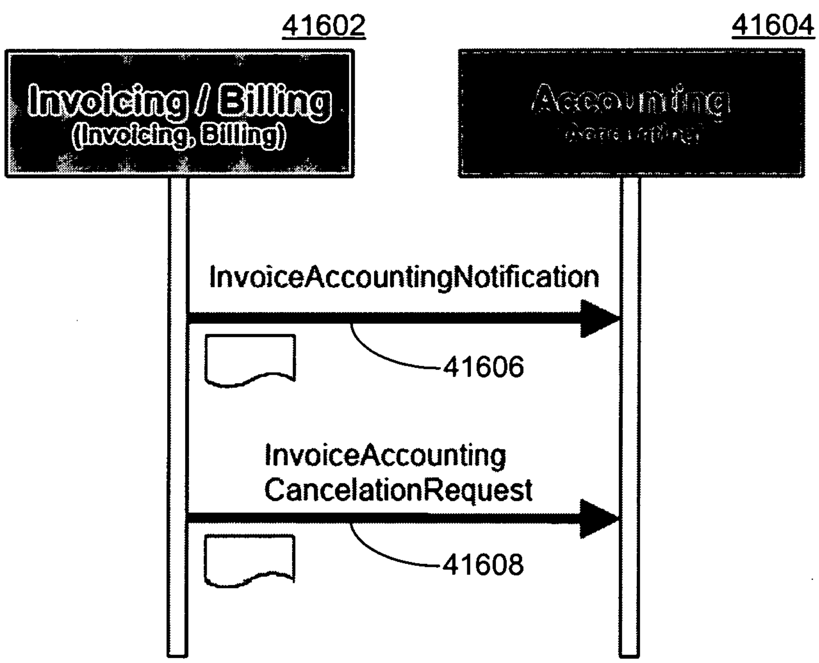
Figure 417A:
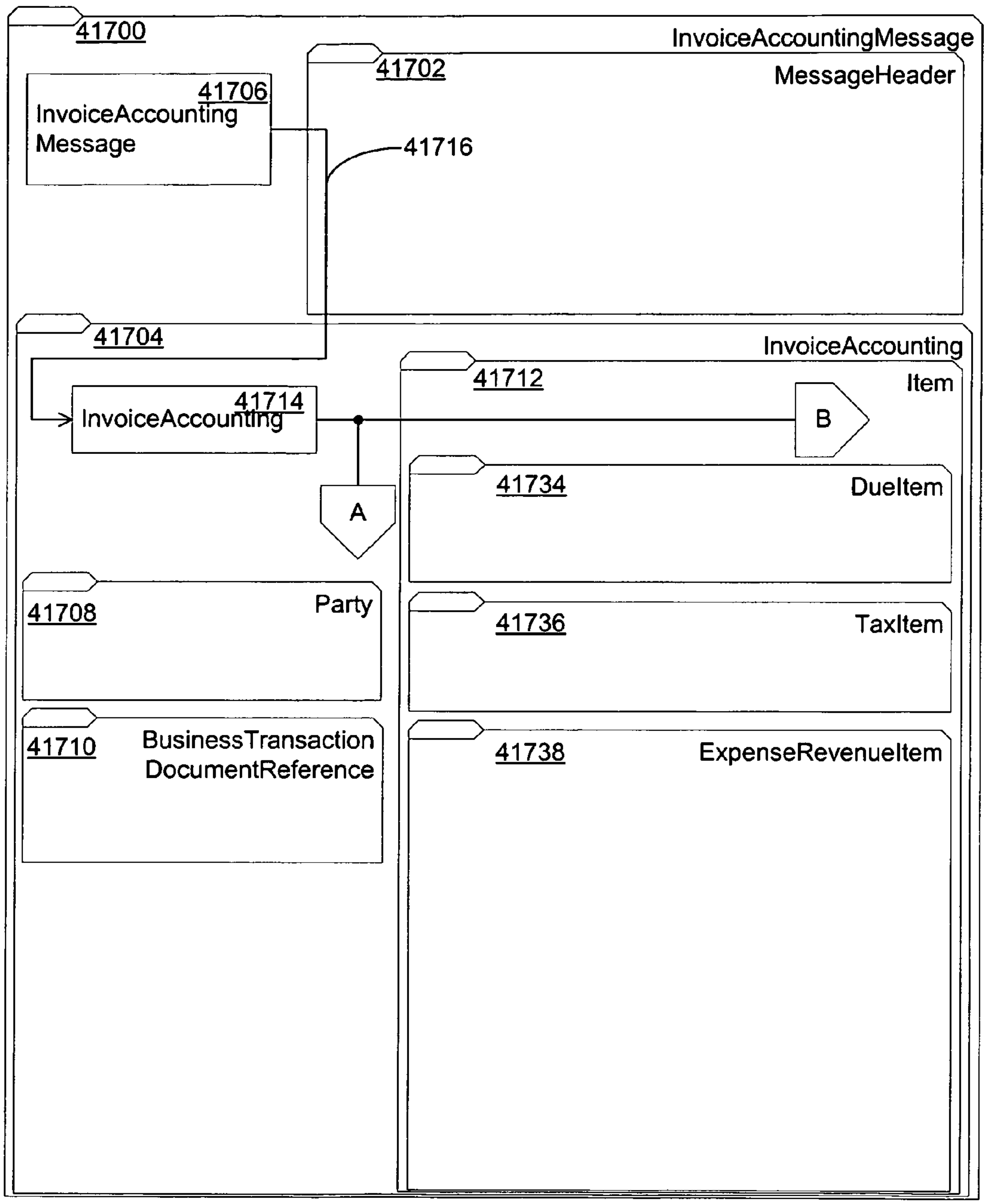
Figure 417B:
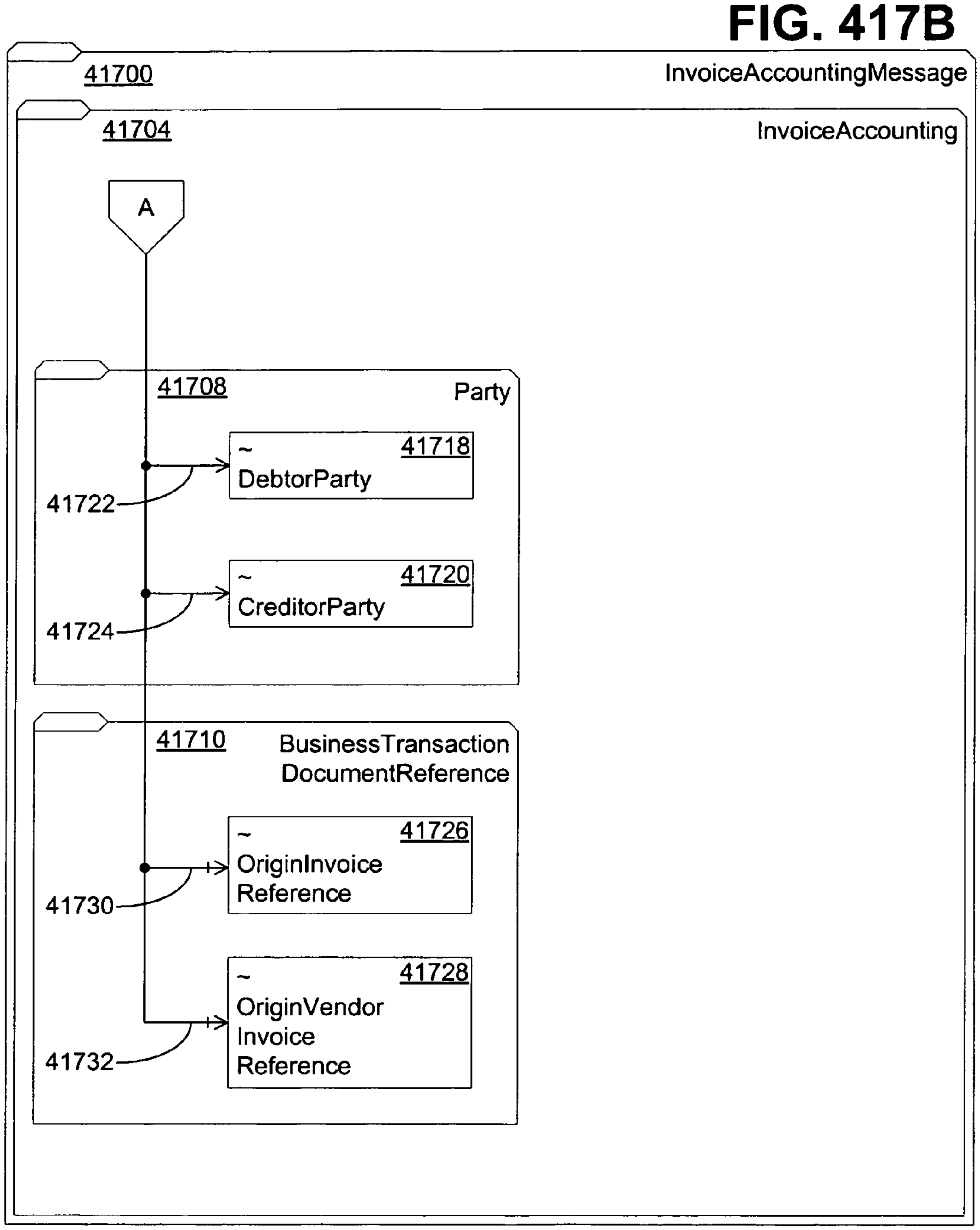
Figure 417C:
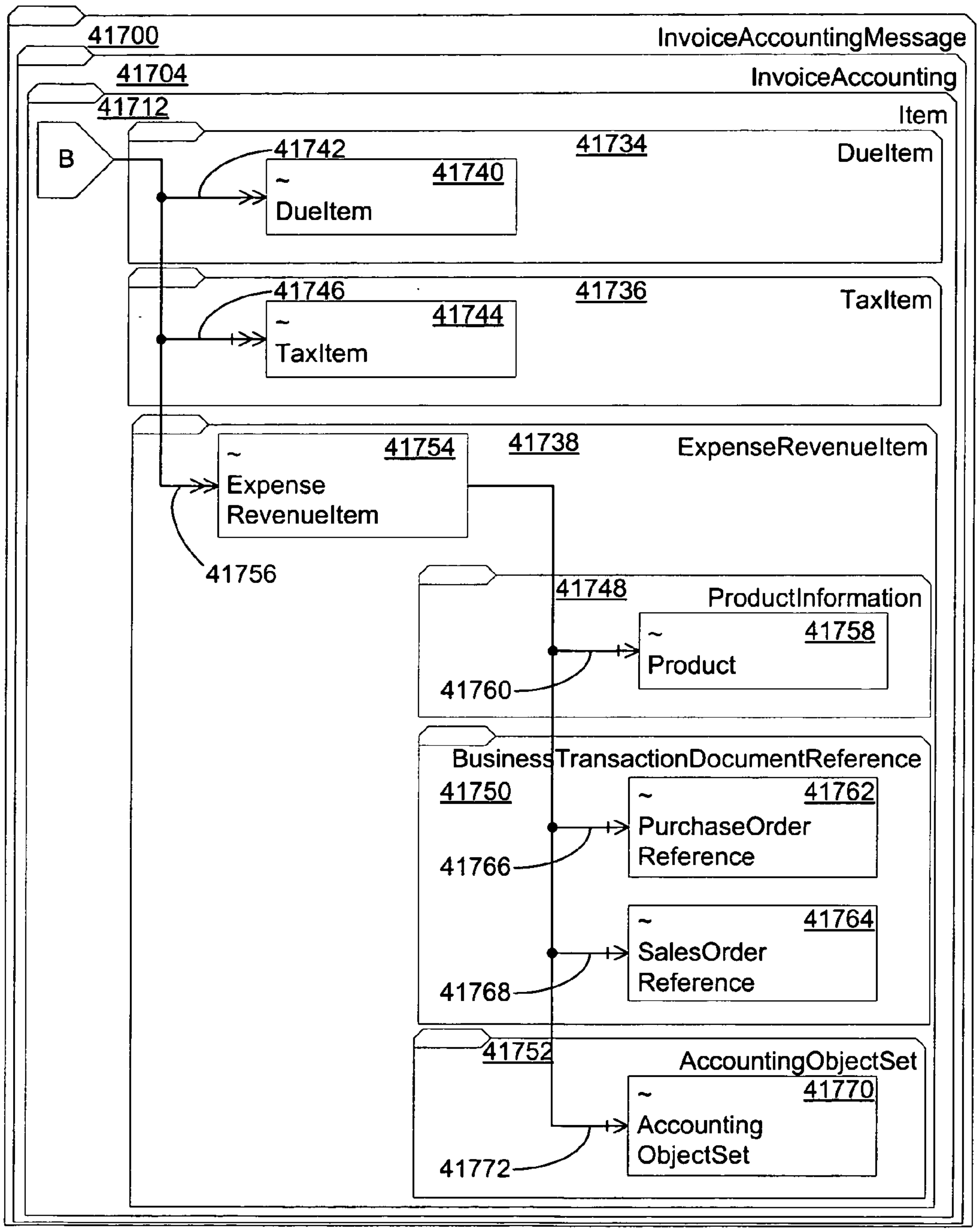
Figure 419:
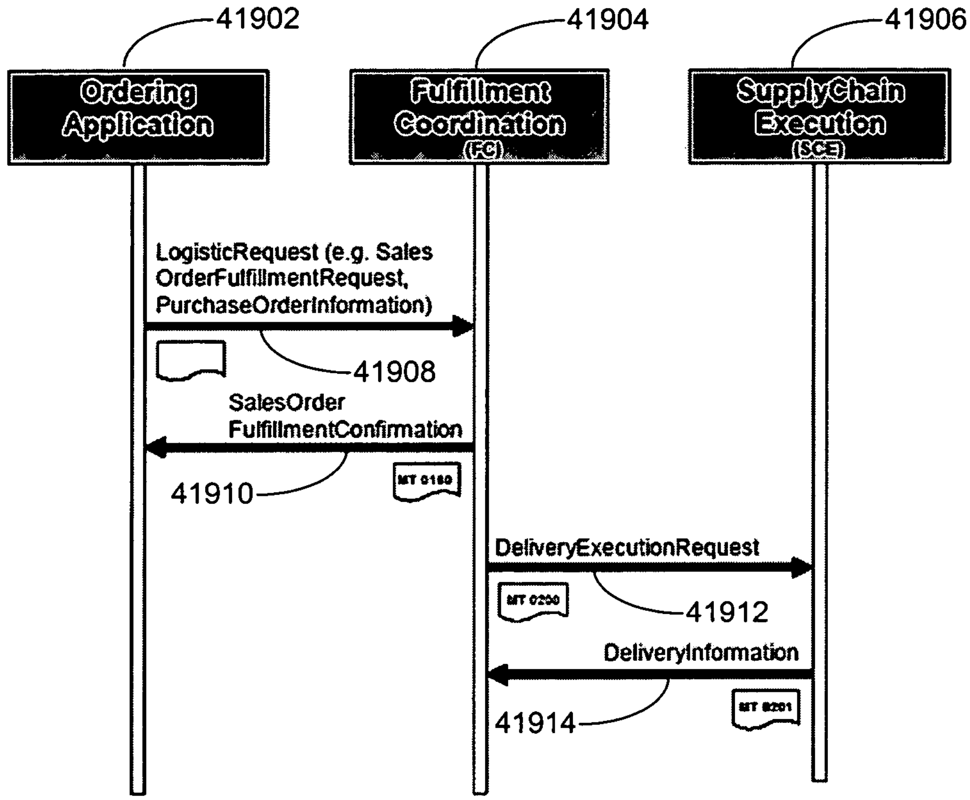
Figure 420A:
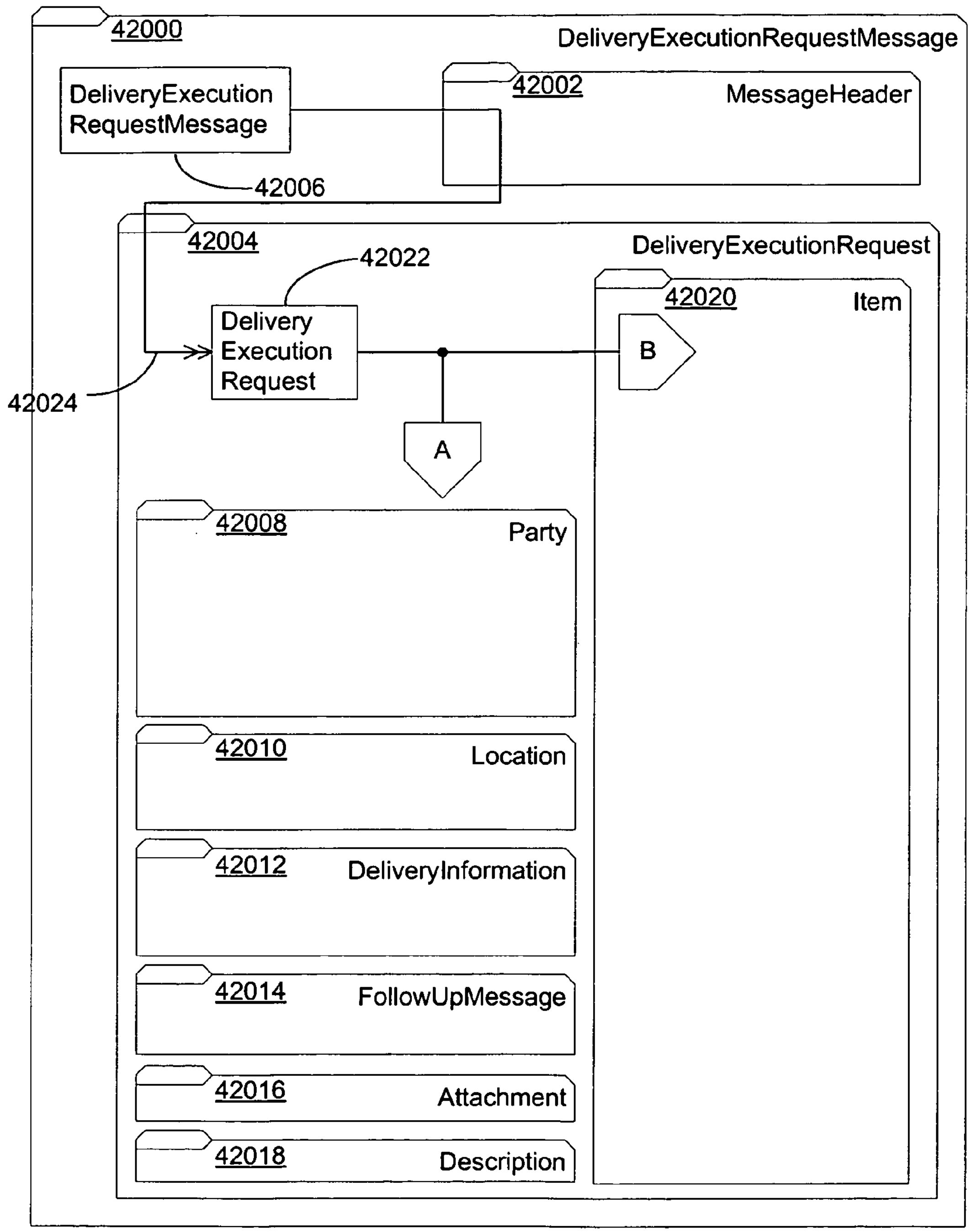
Figure 420B:
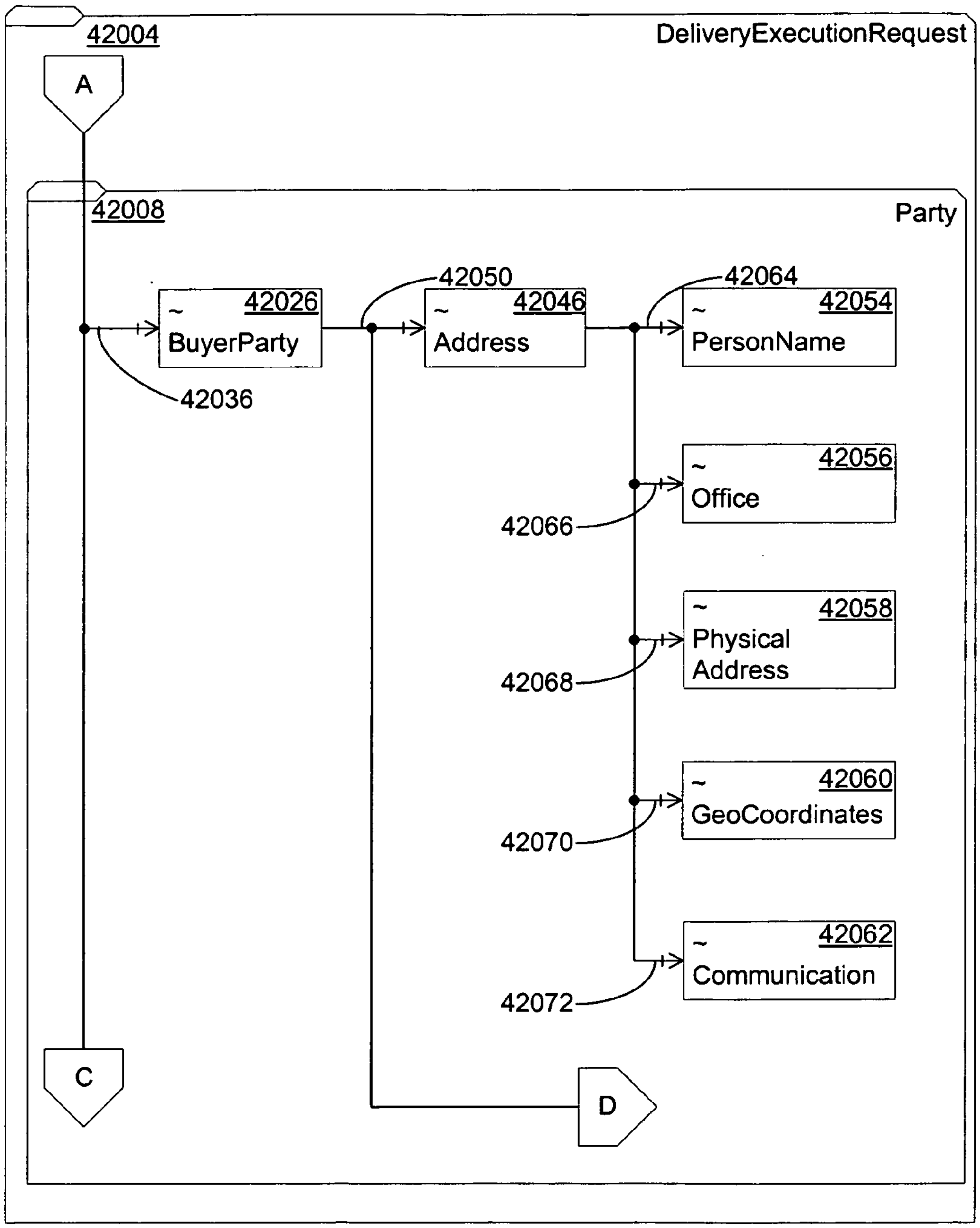
Figure 420C:
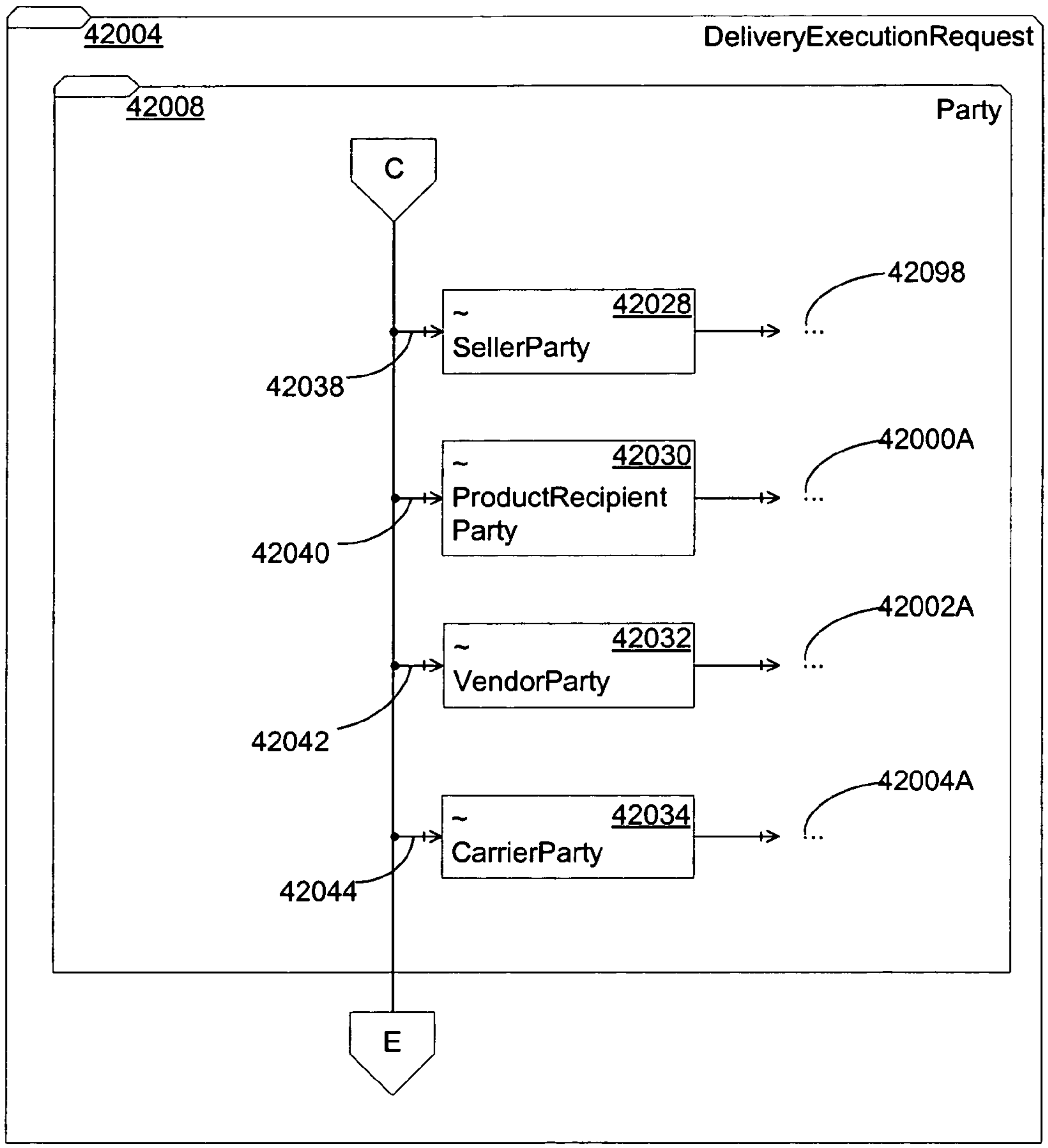
Figure 420D:
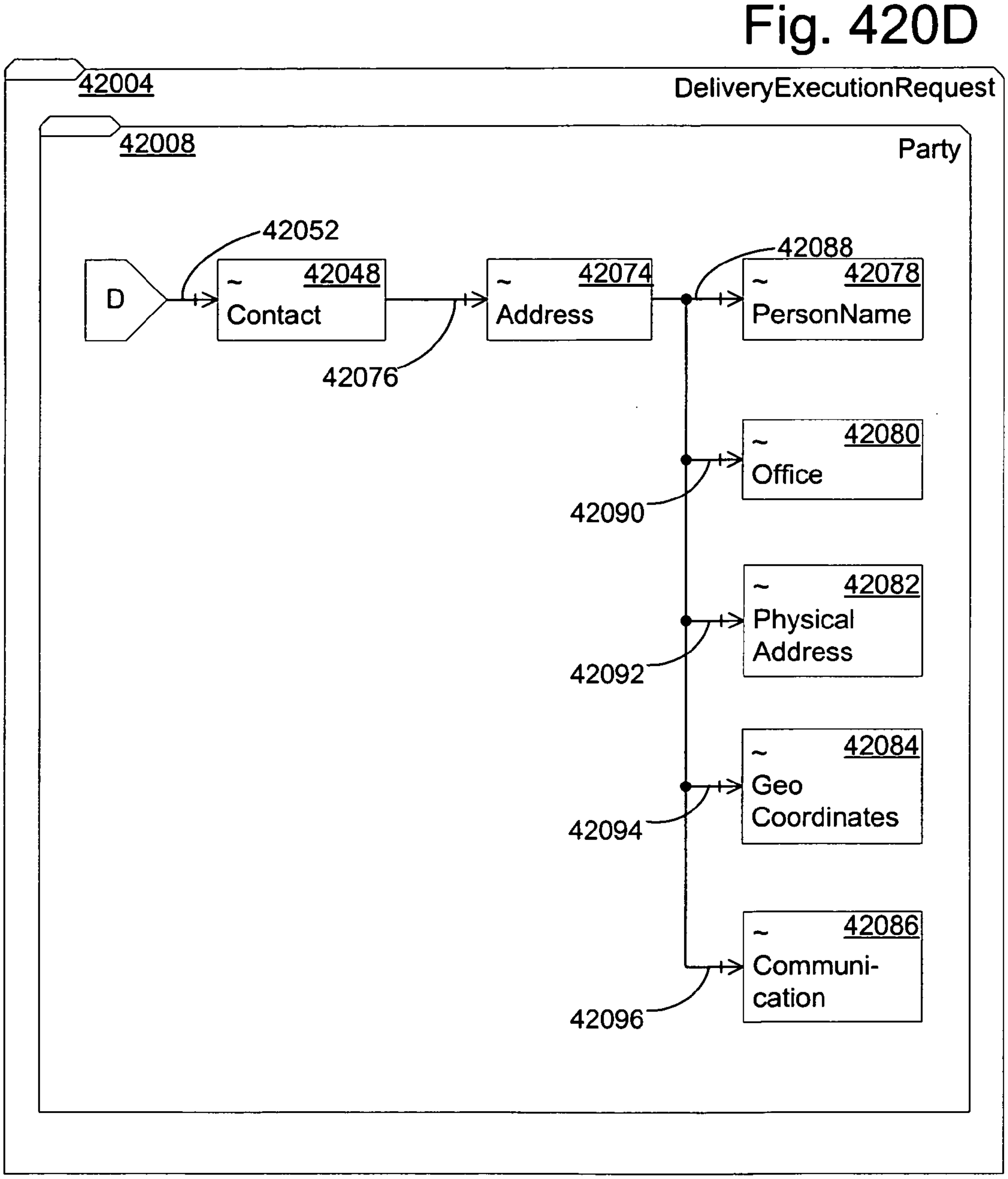
Figure 420E:
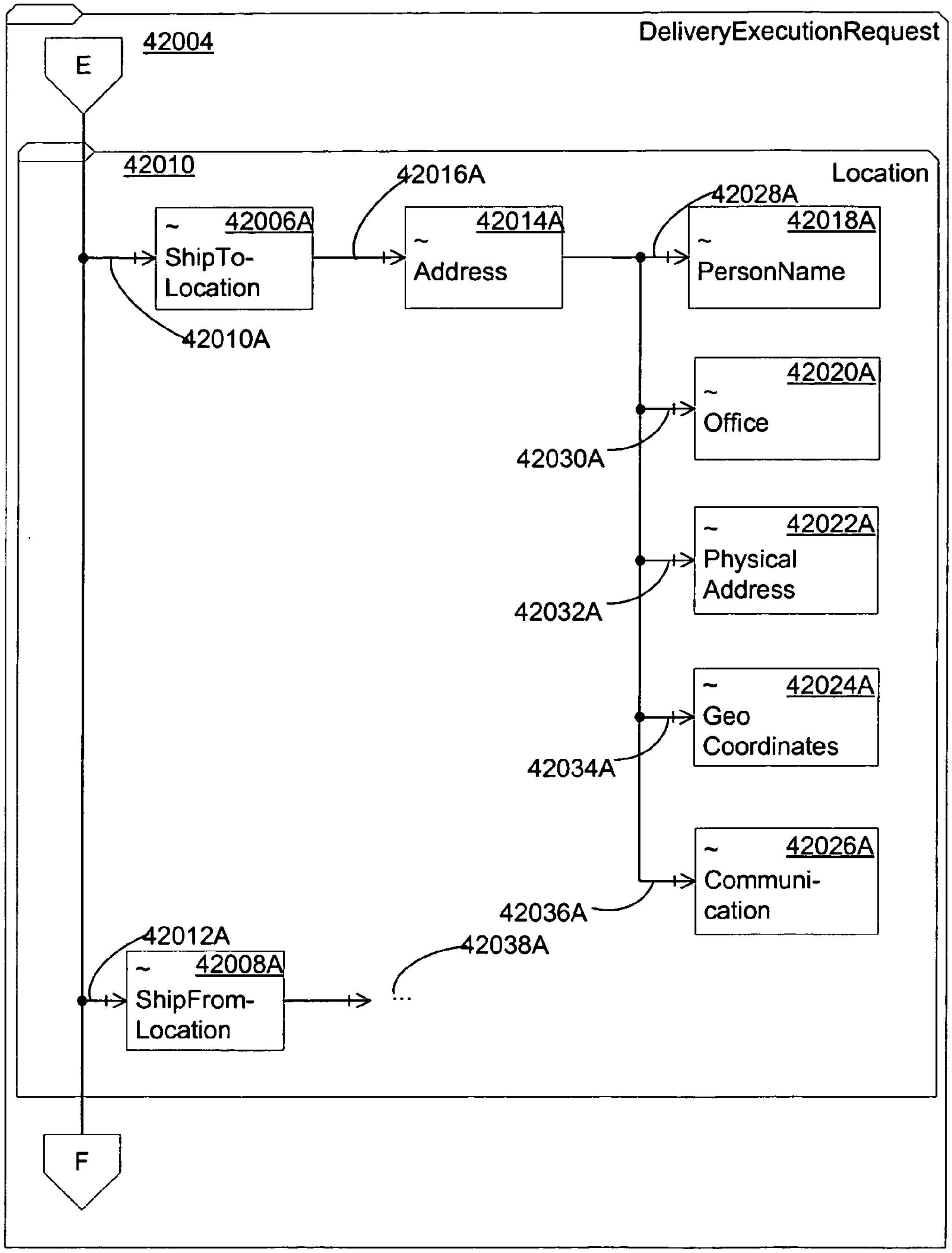
Figure 420F:
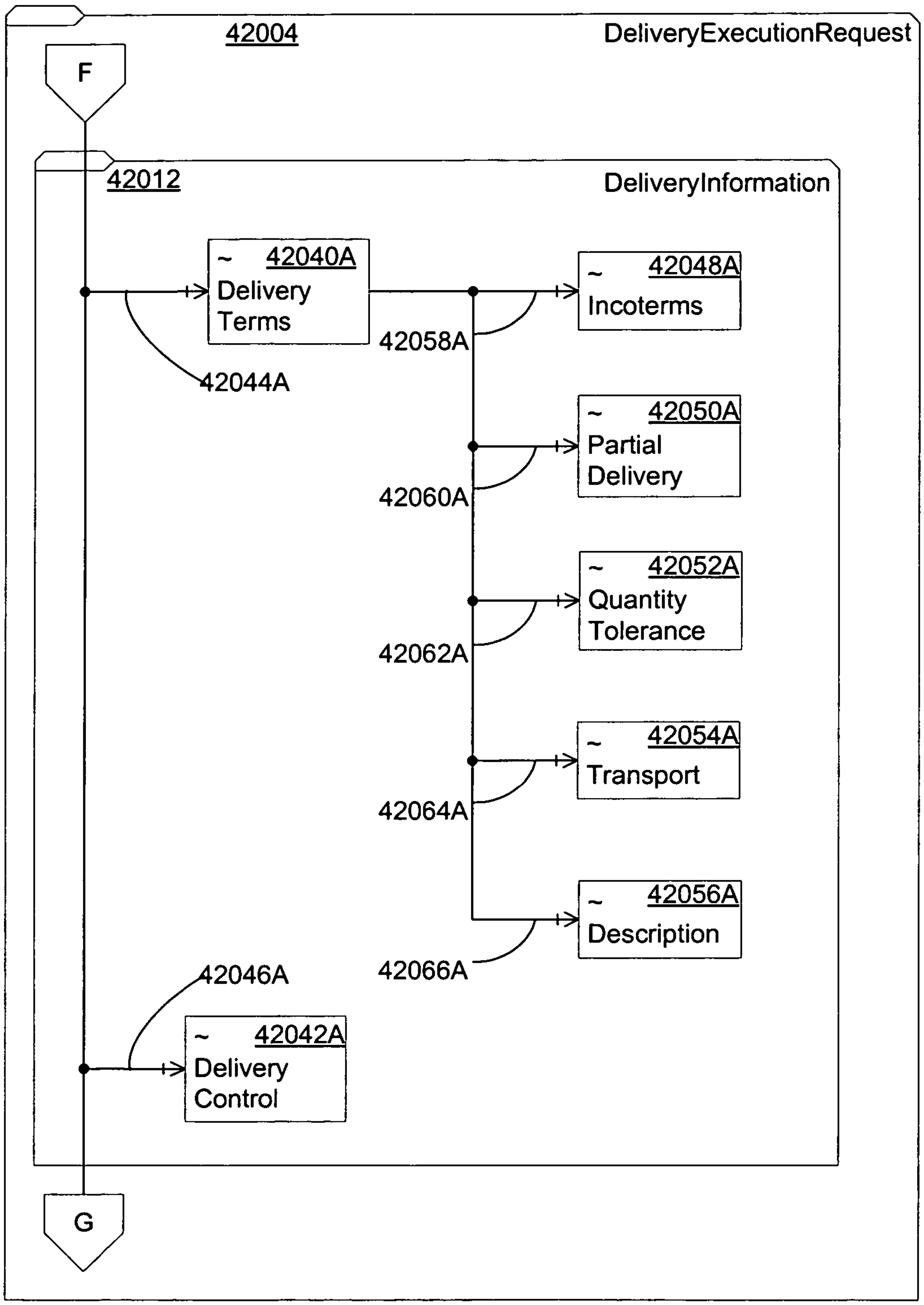
Figure 420G:
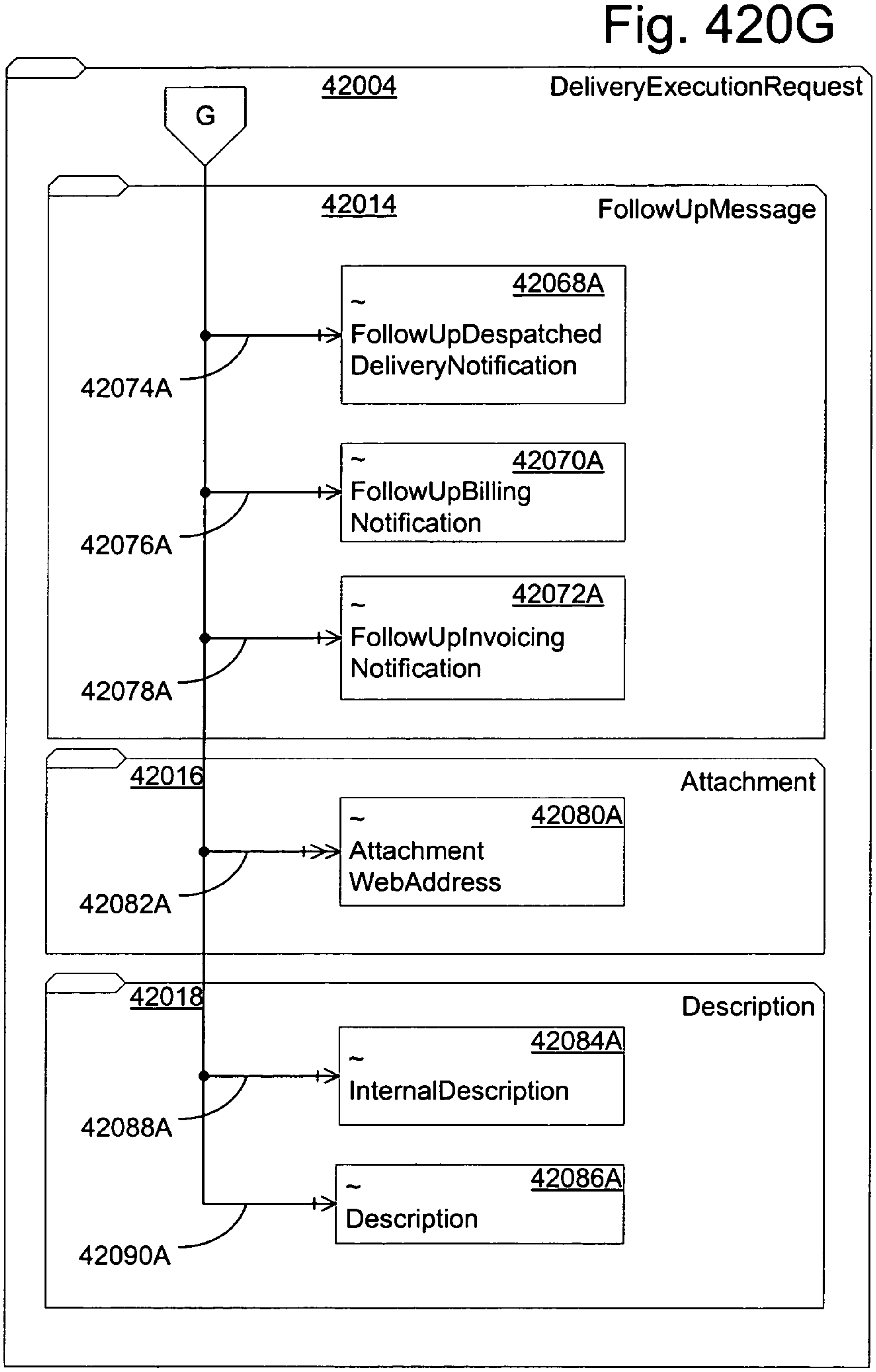
Figure 420H:
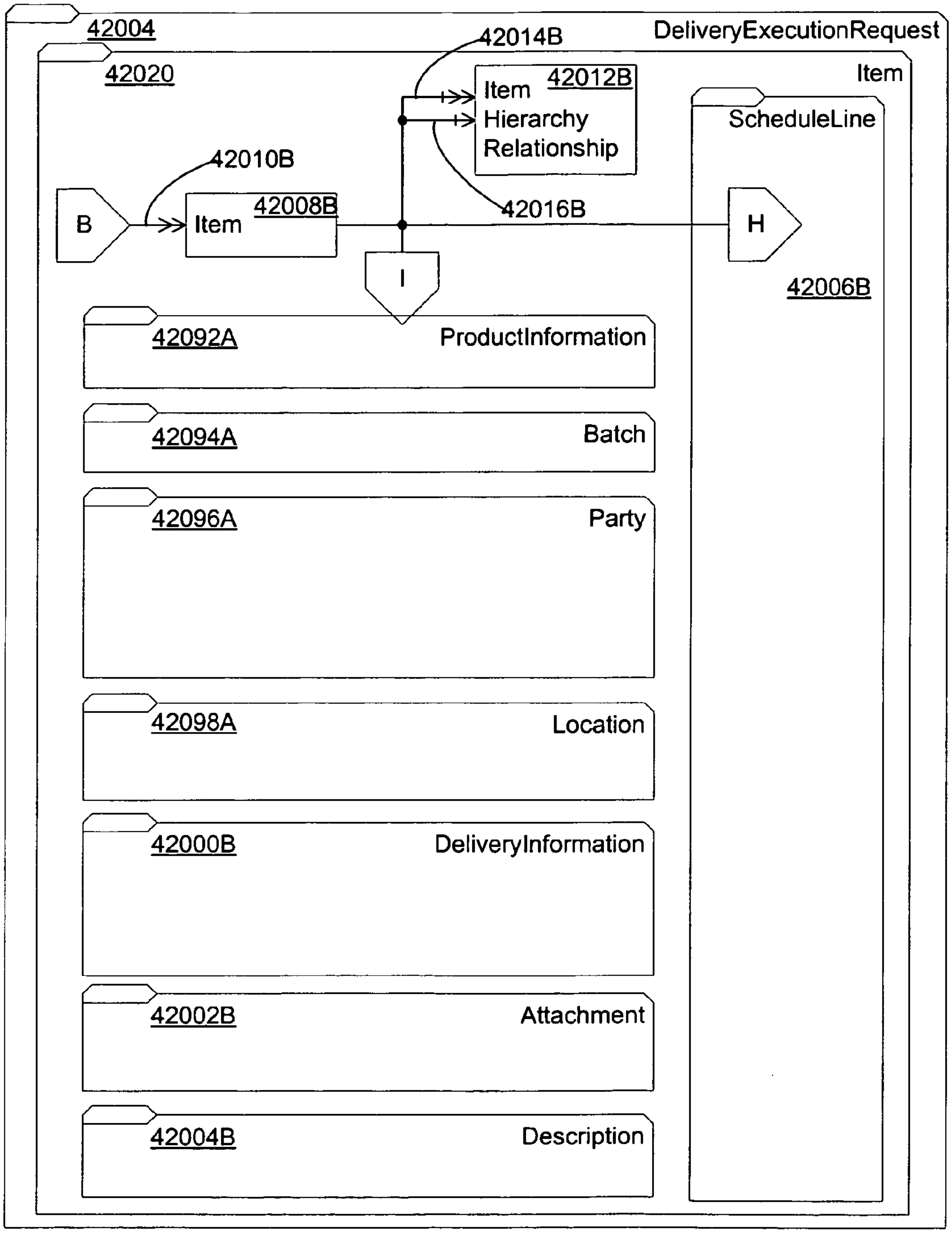
Figure 420I:
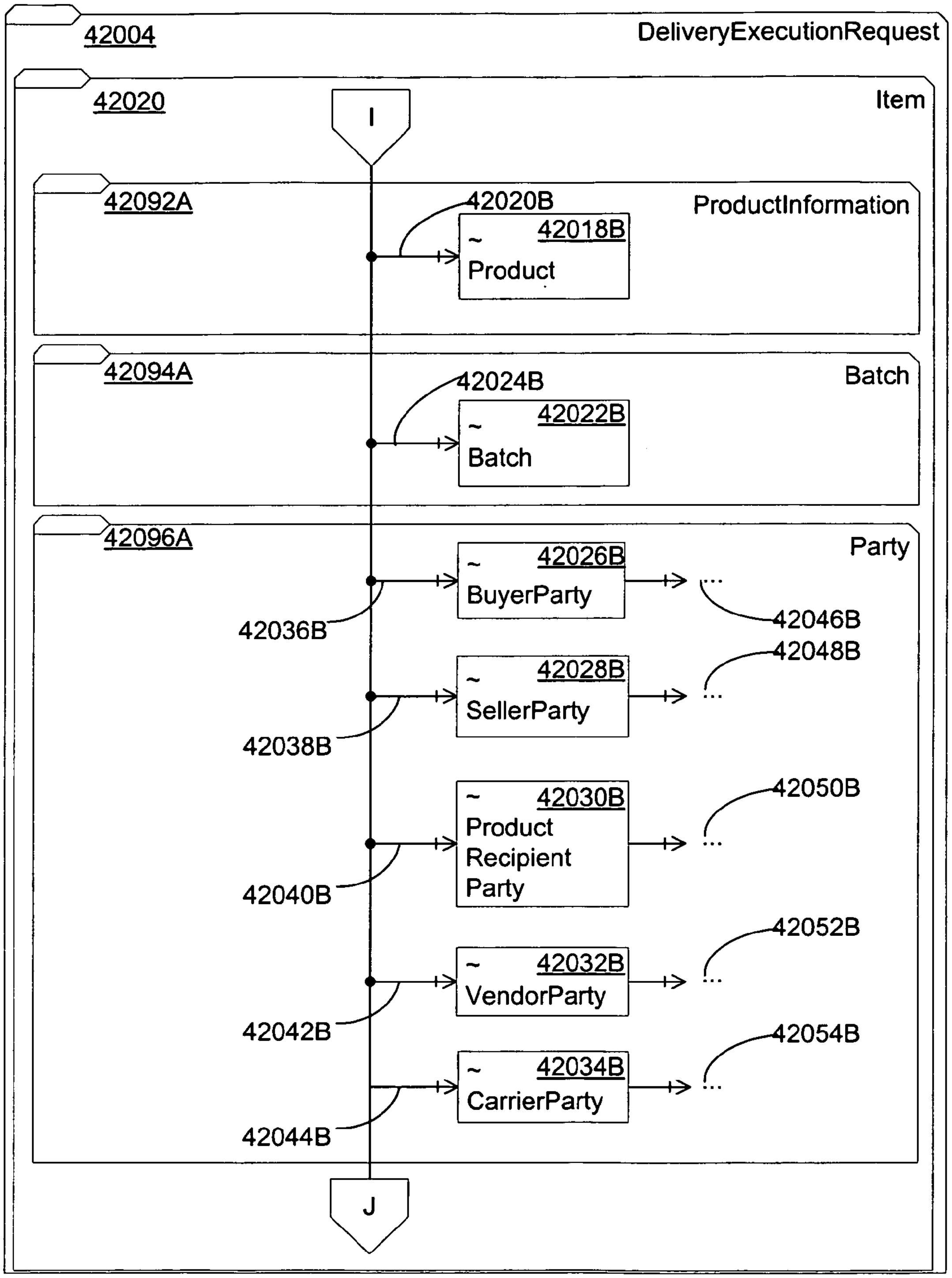
Figure 420J:
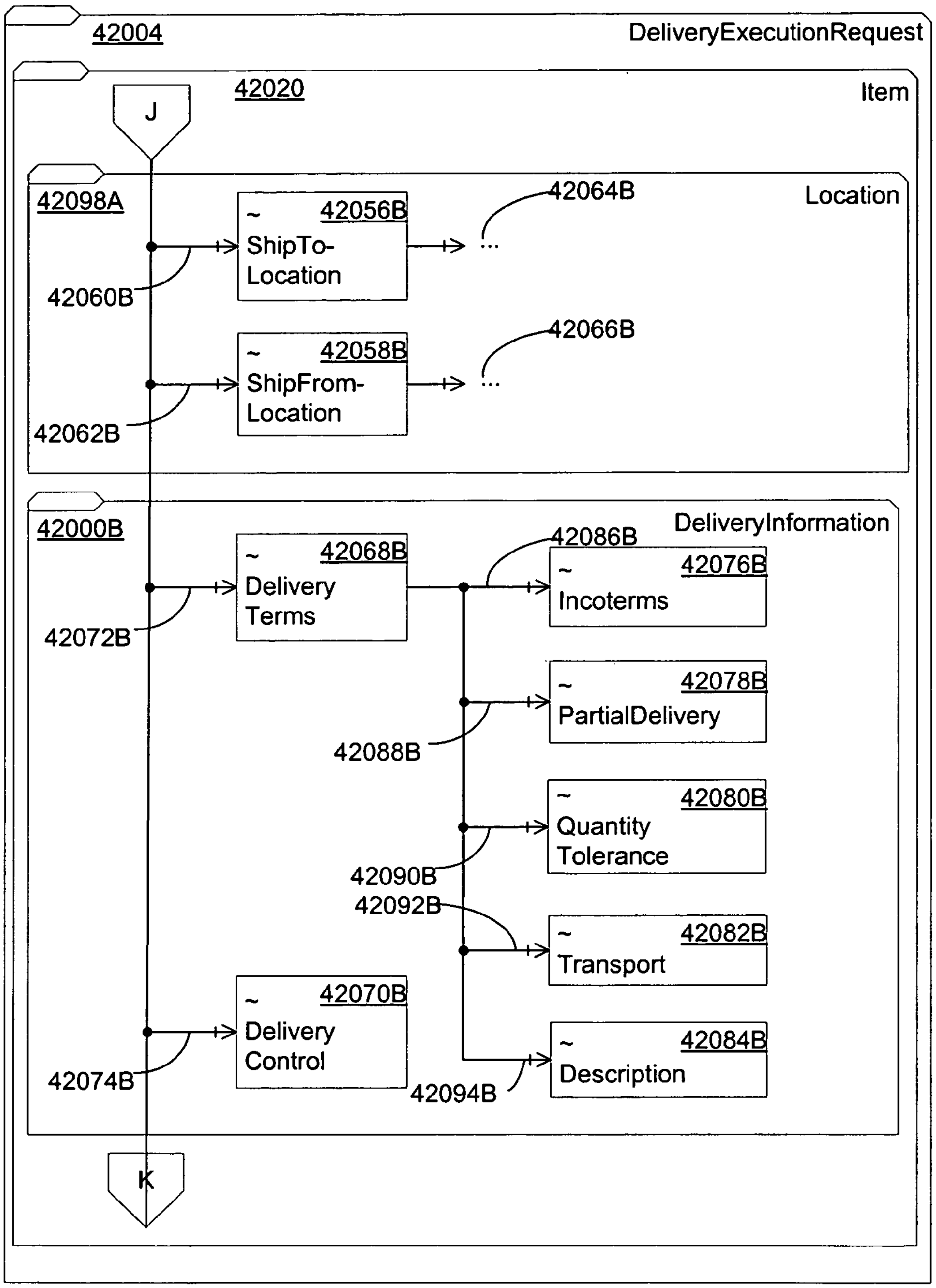
Figure 420K:
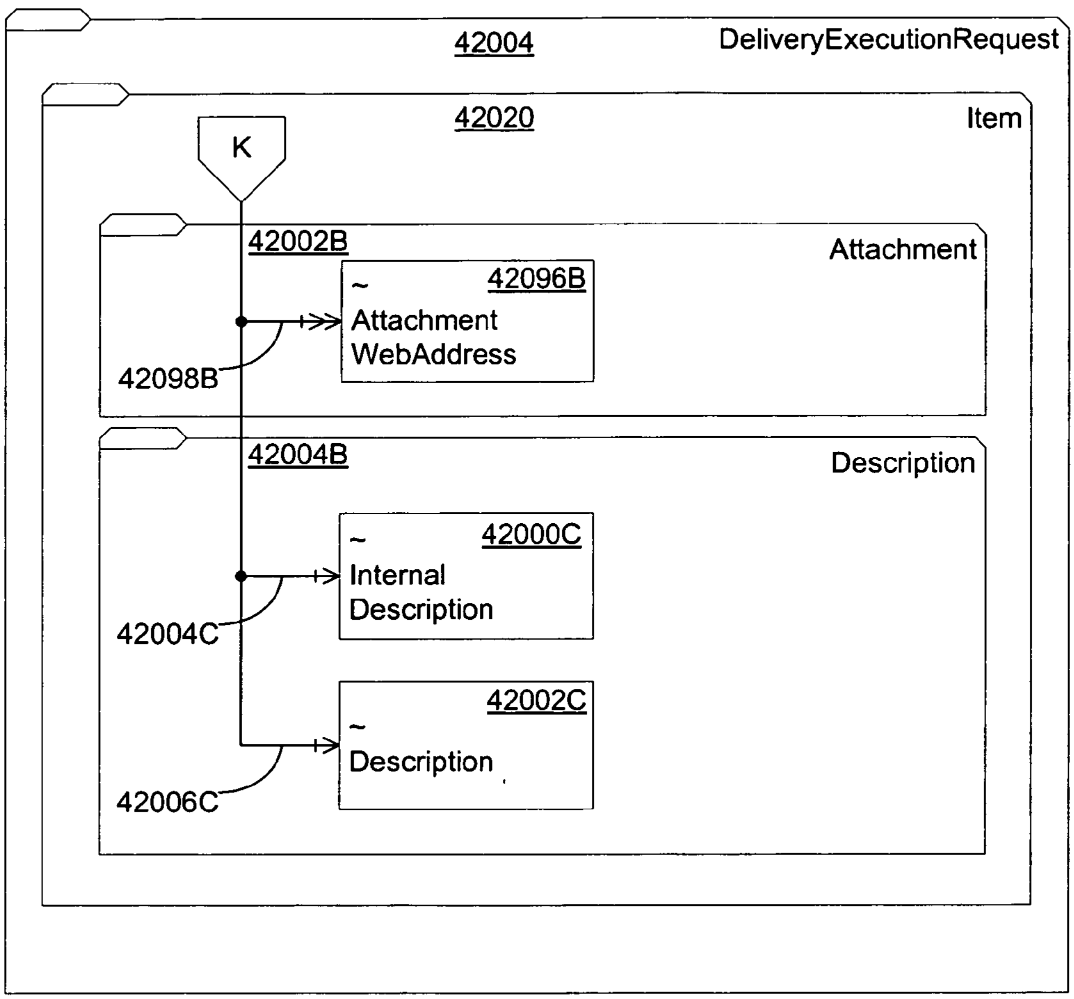
Figure 420L:
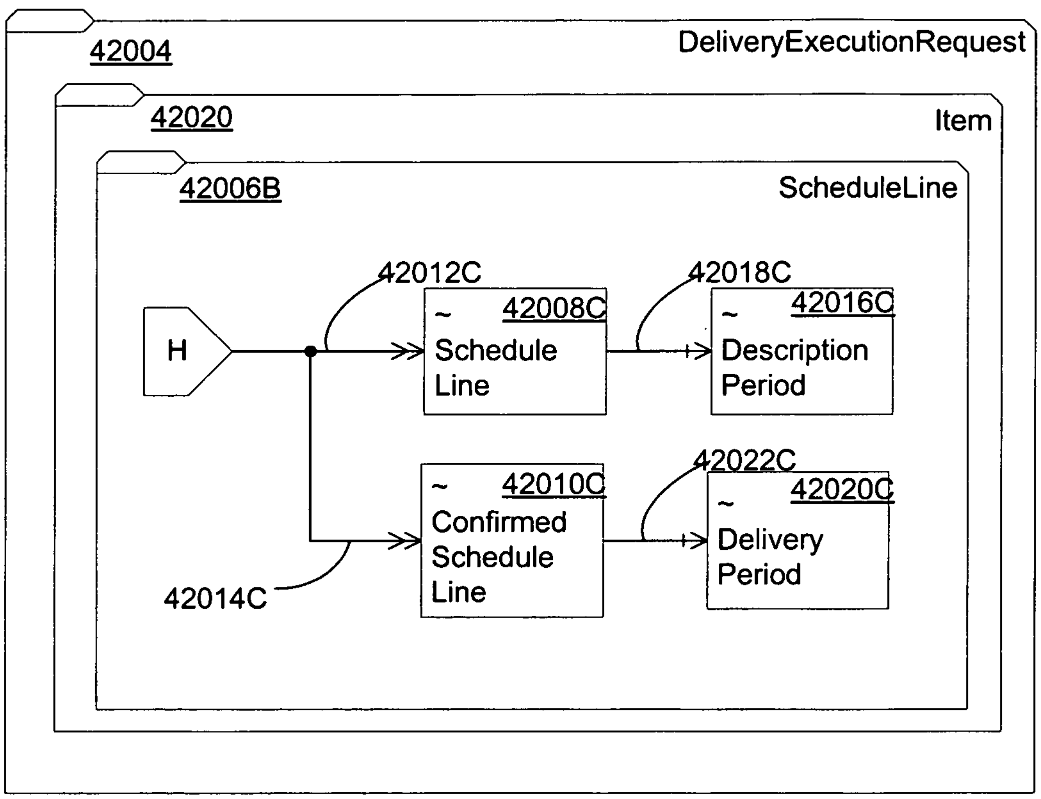
Figure 422:
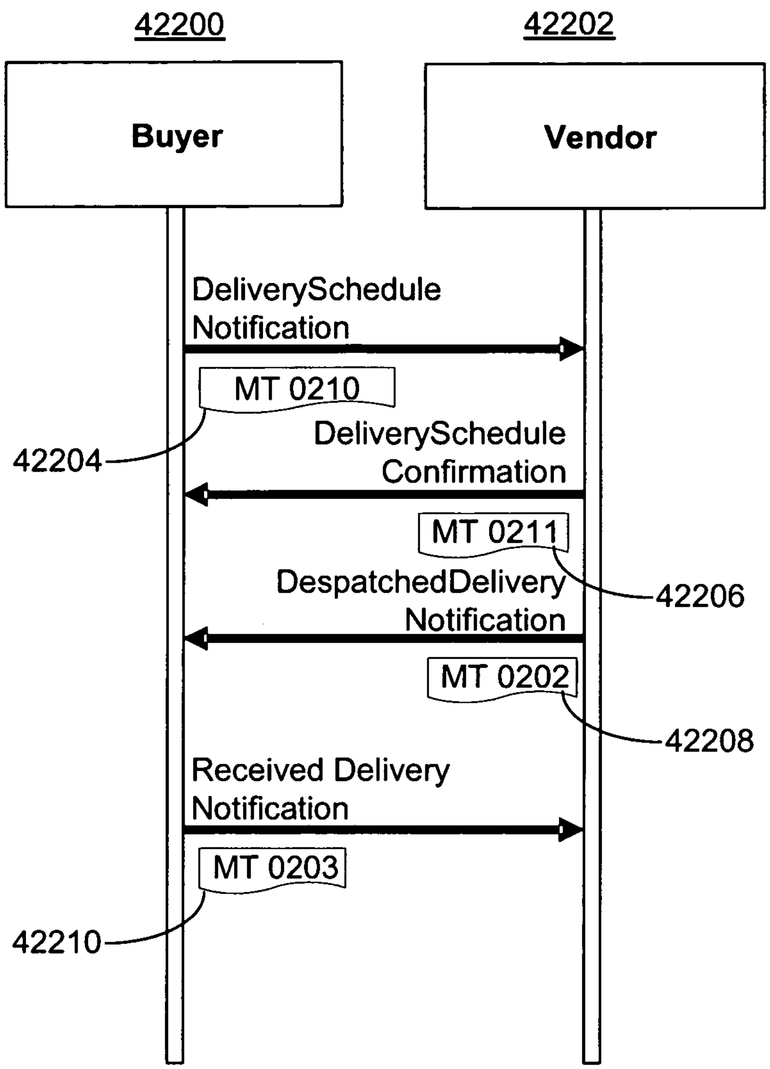
Figure 423A:
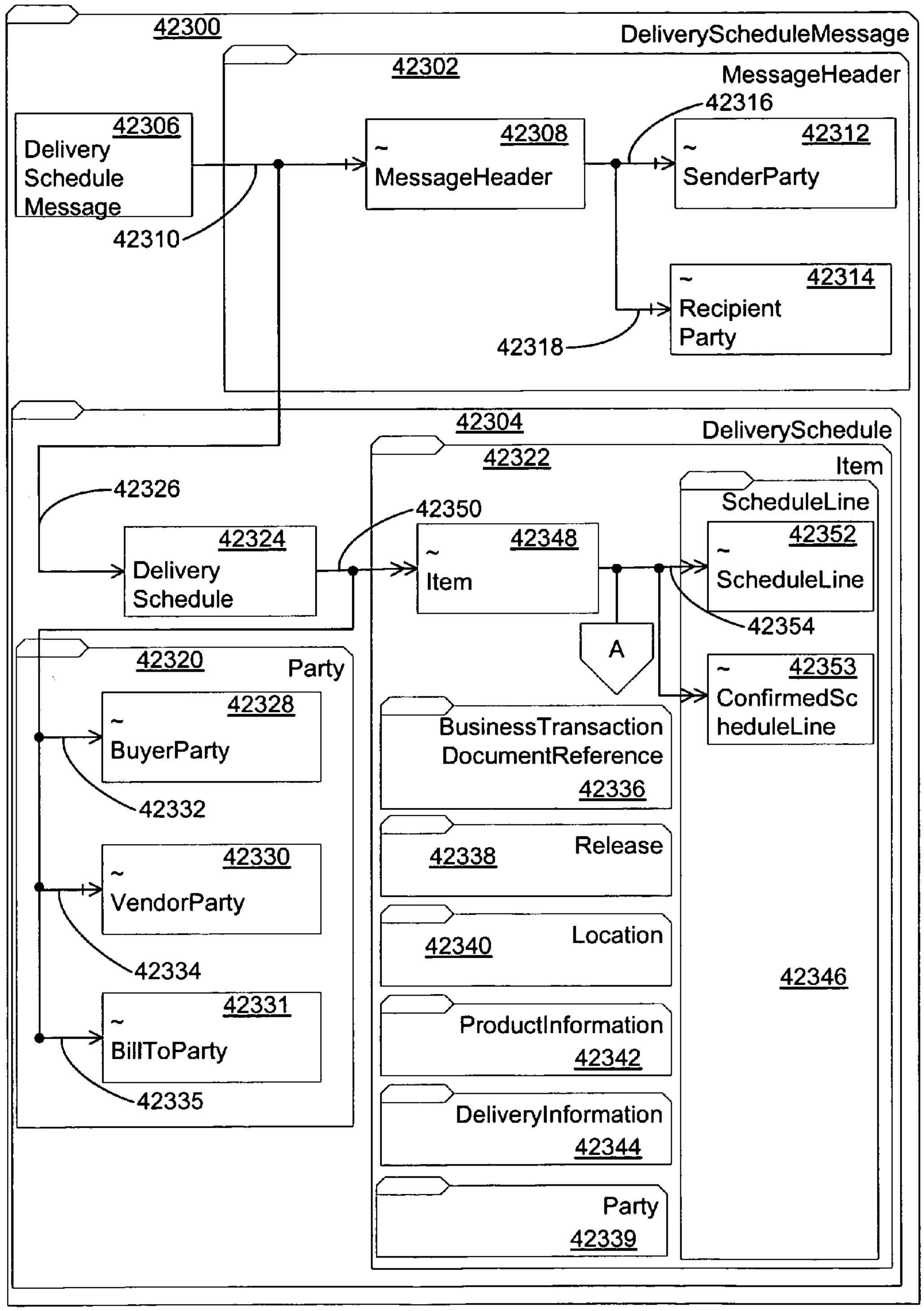
Figure 423B:
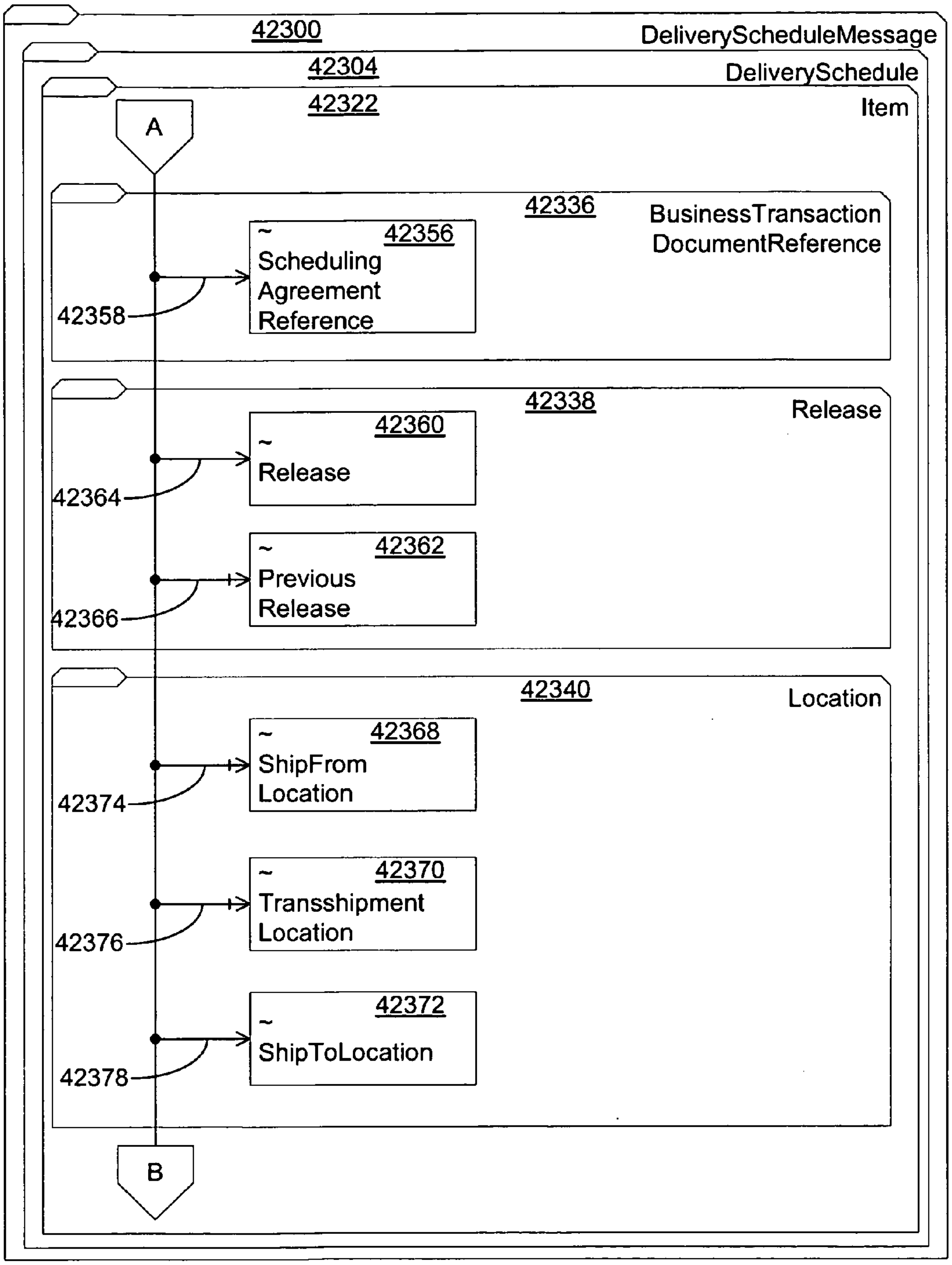
Figure 423C:
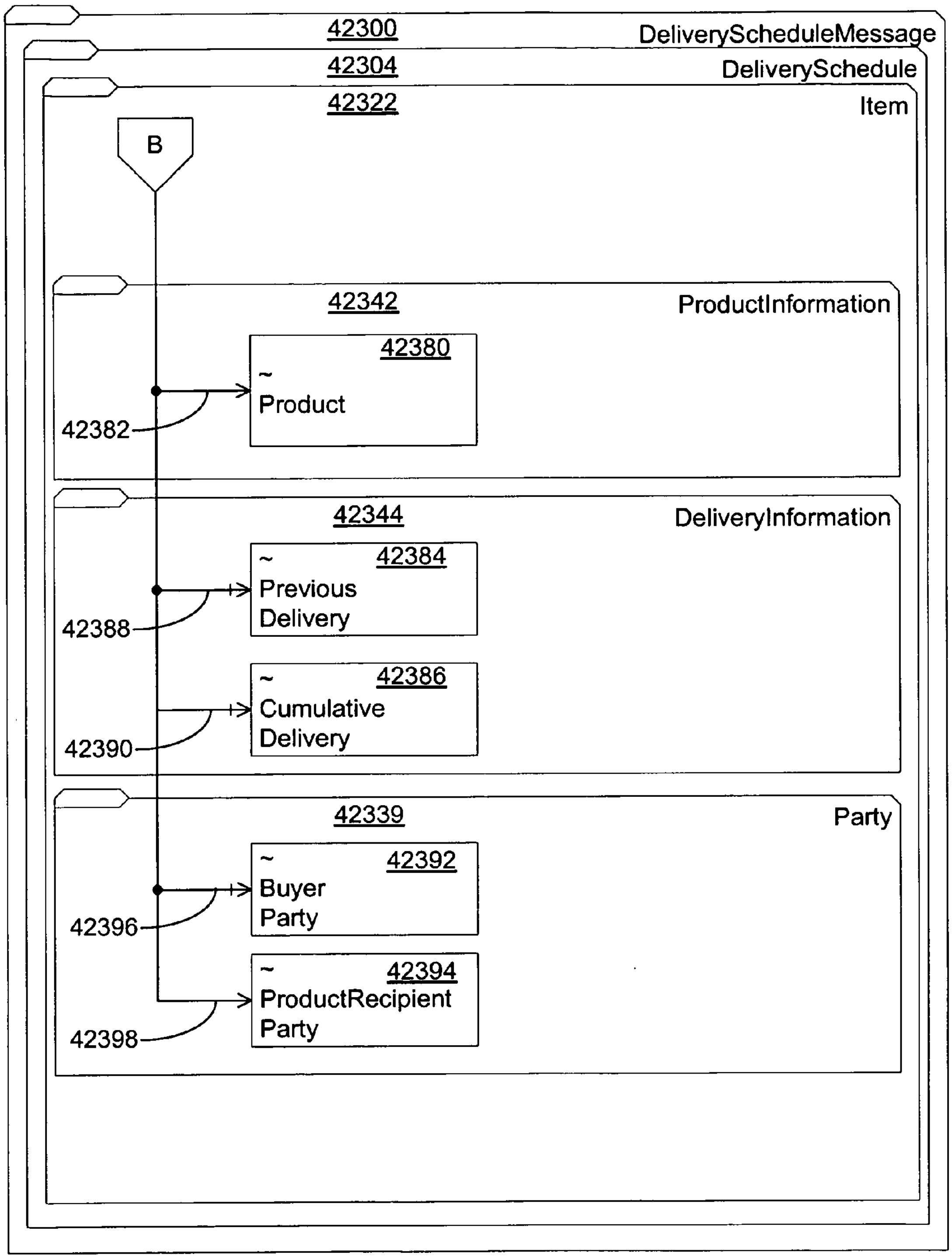
Figure 425:
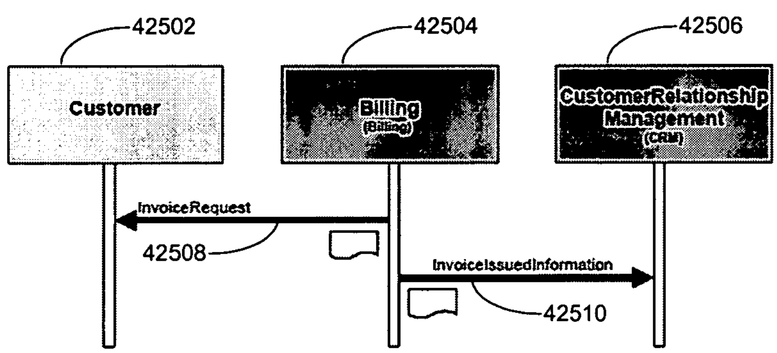
Figure 426:
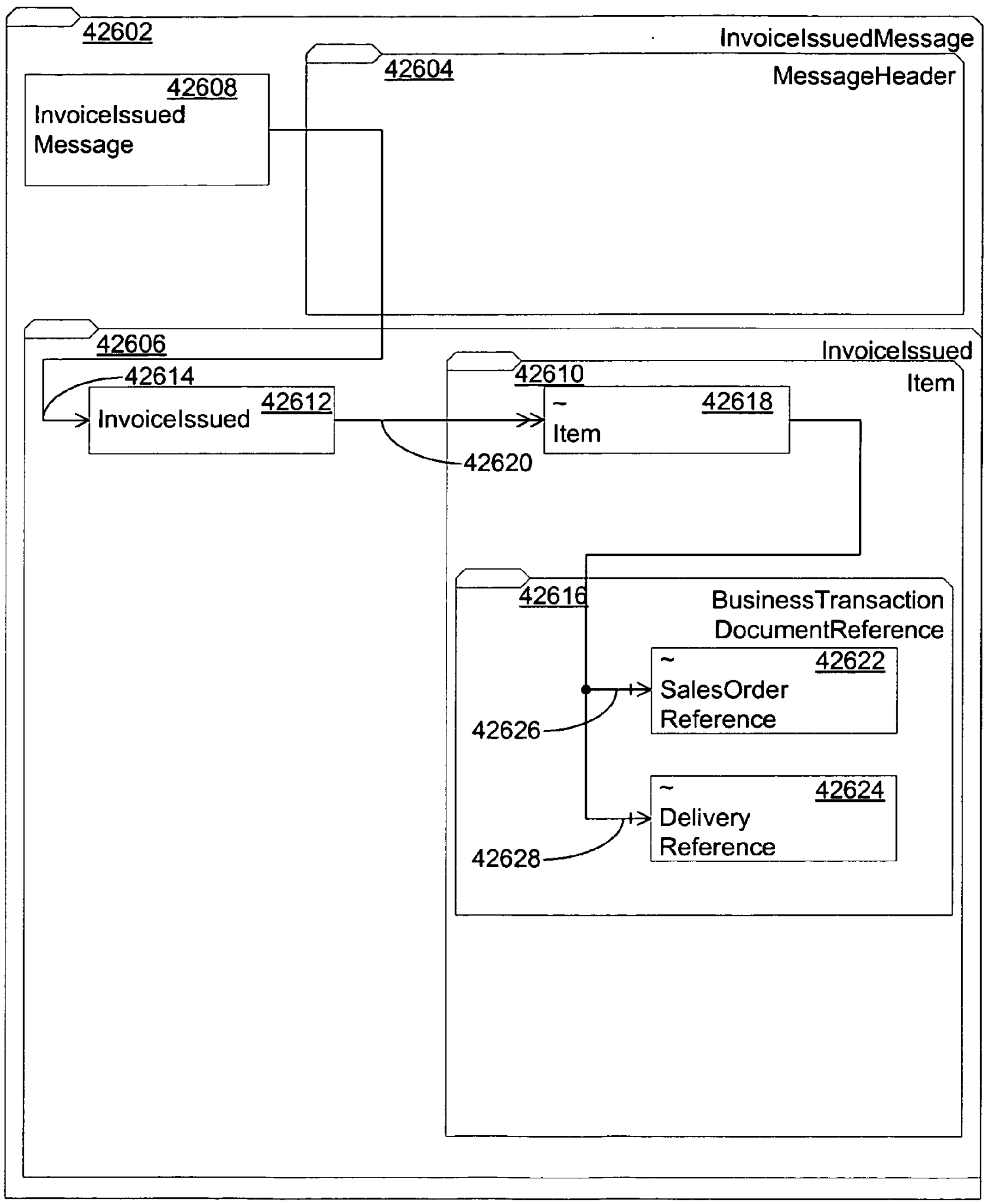
Figure 428:
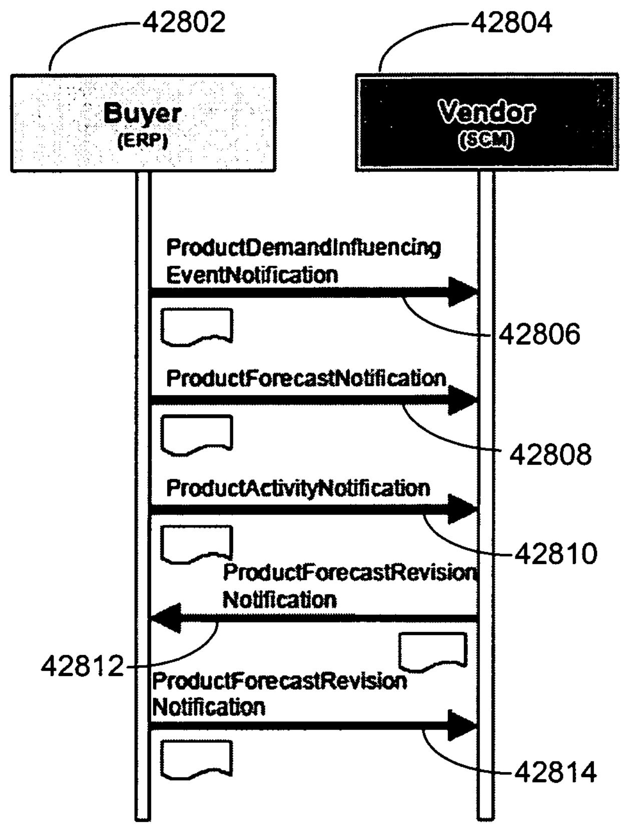
Figure 429:
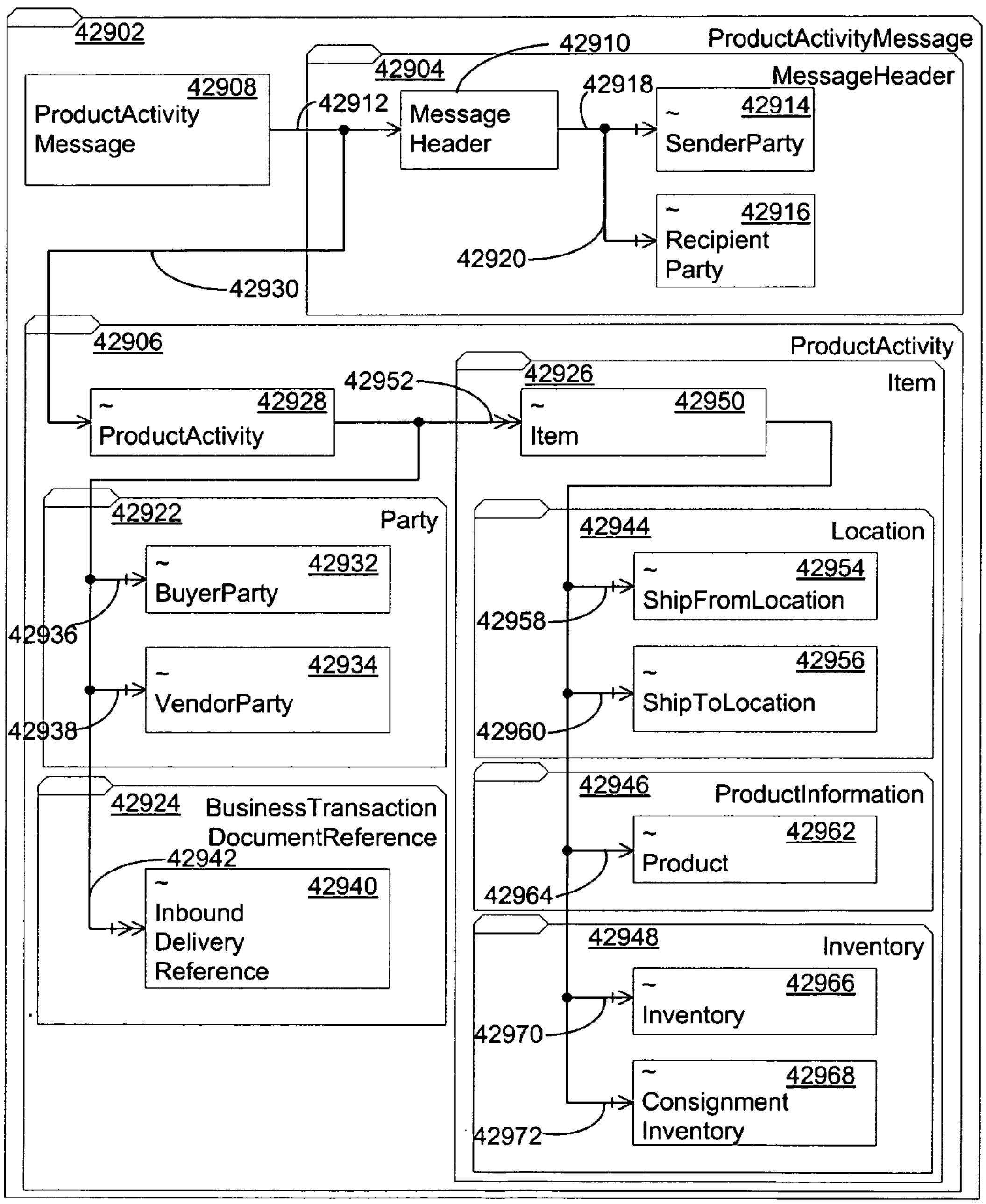
Figure 431:
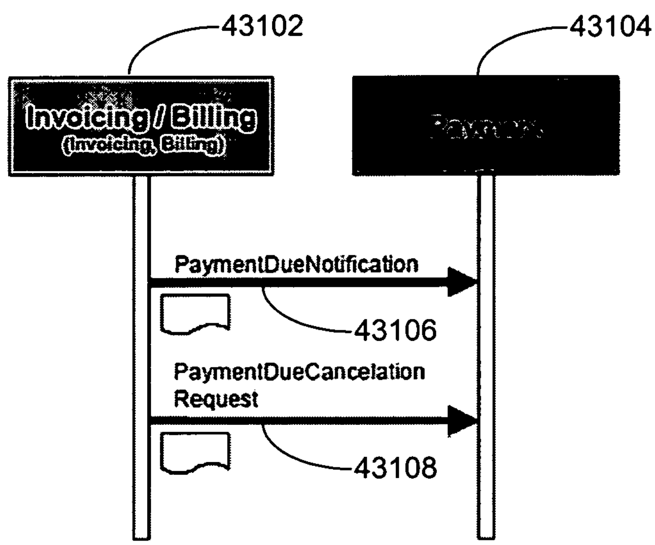
Figure 432A:
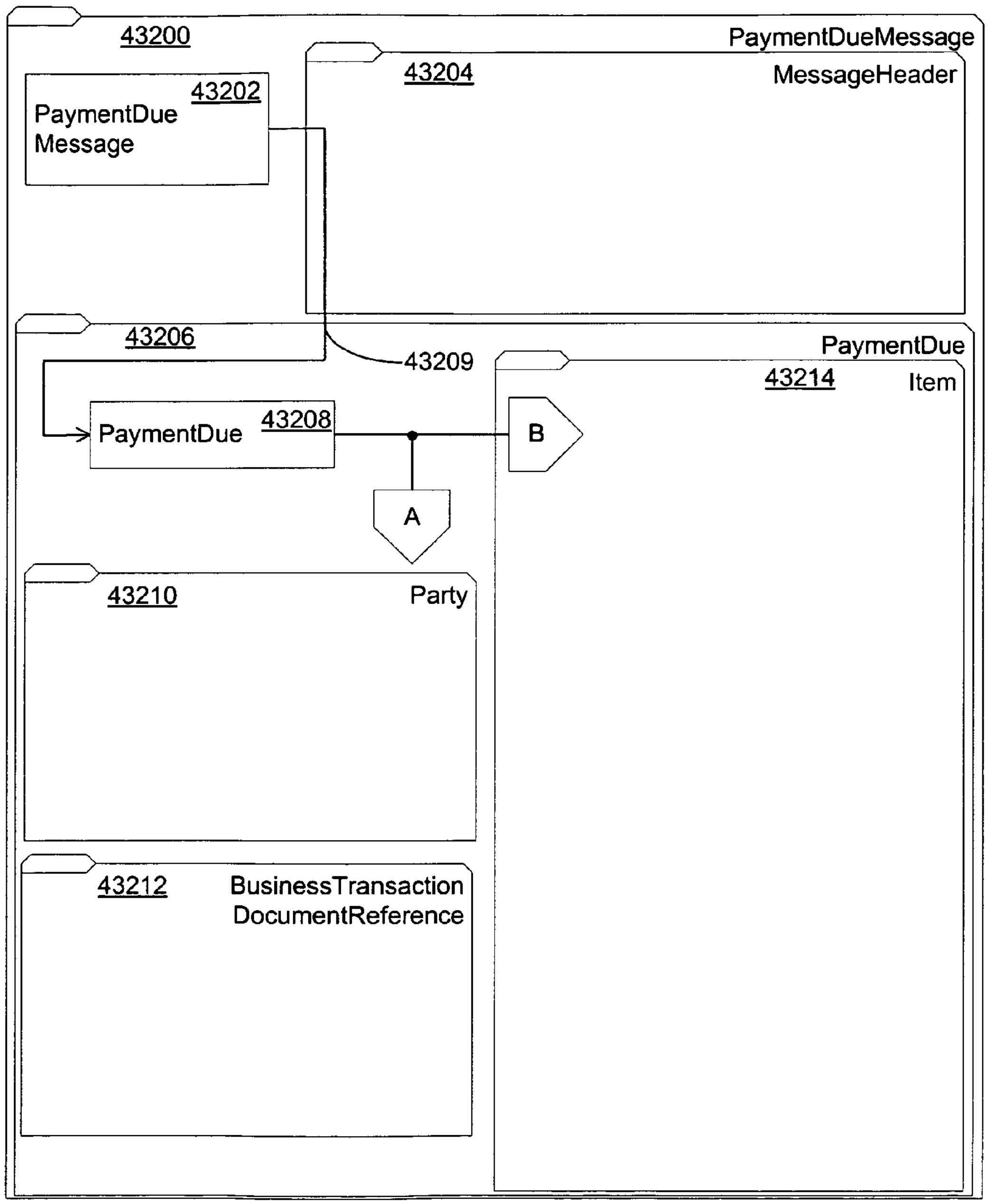
Figure 432B:
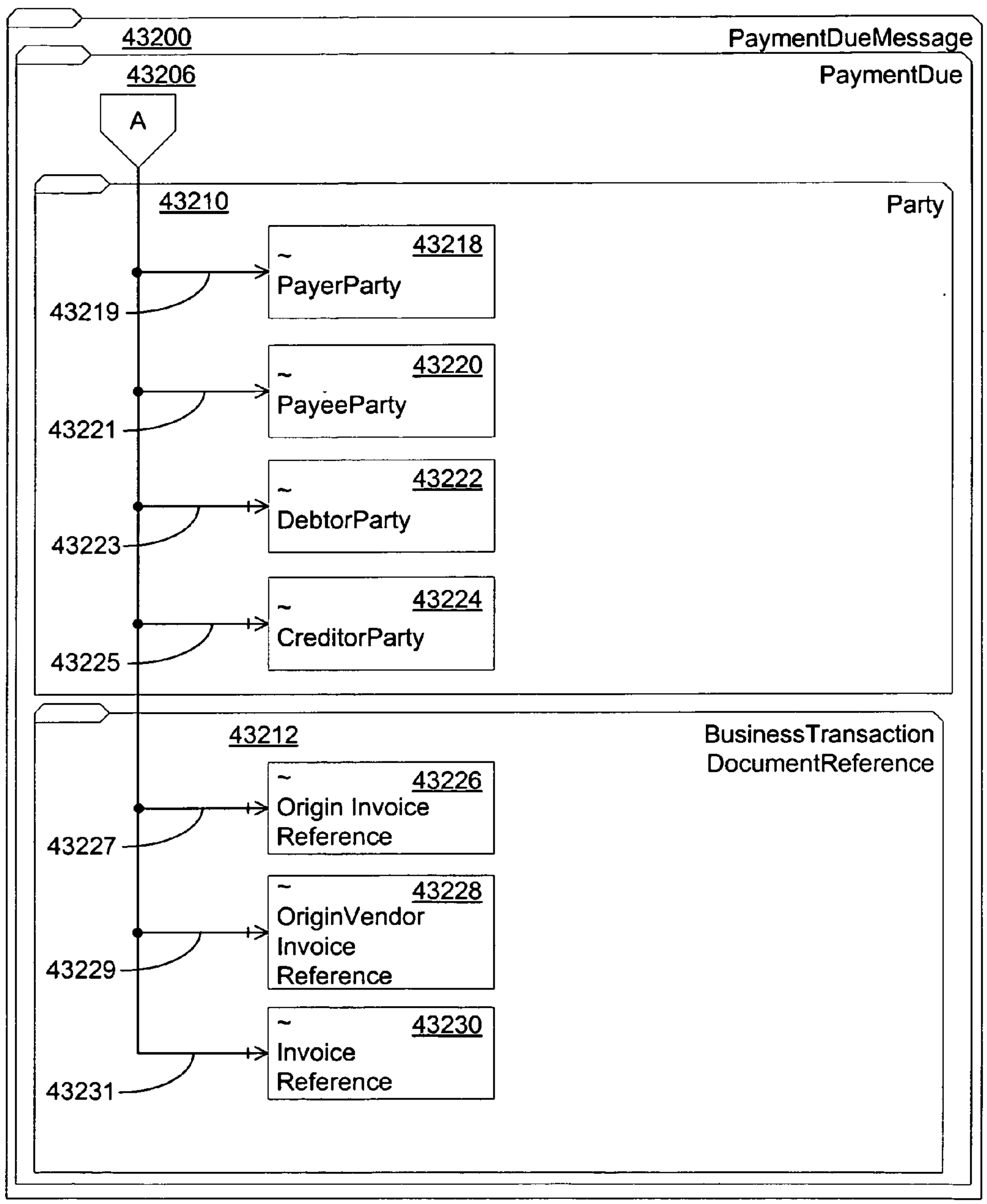
Figure 432C:
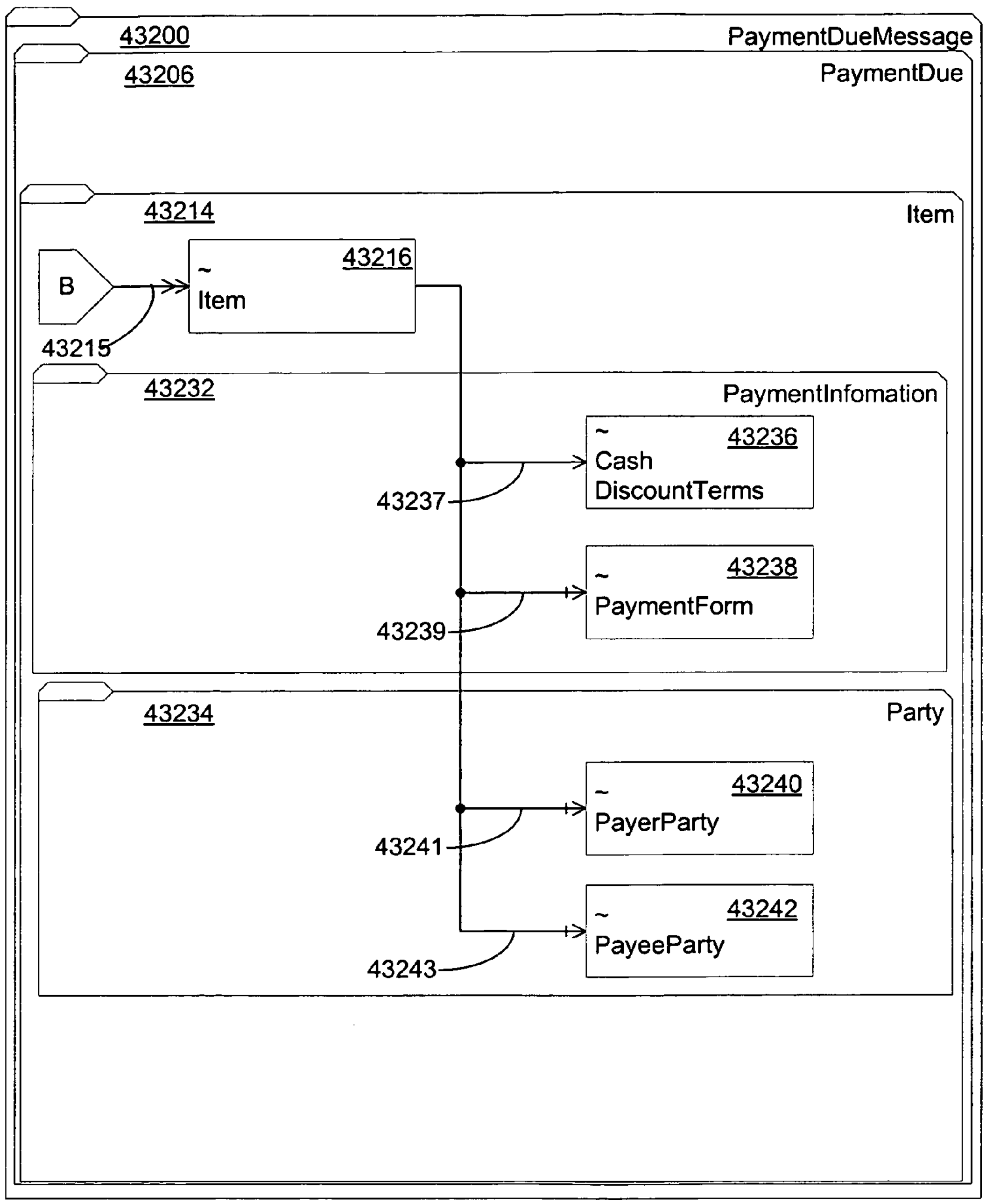
Figure 434:
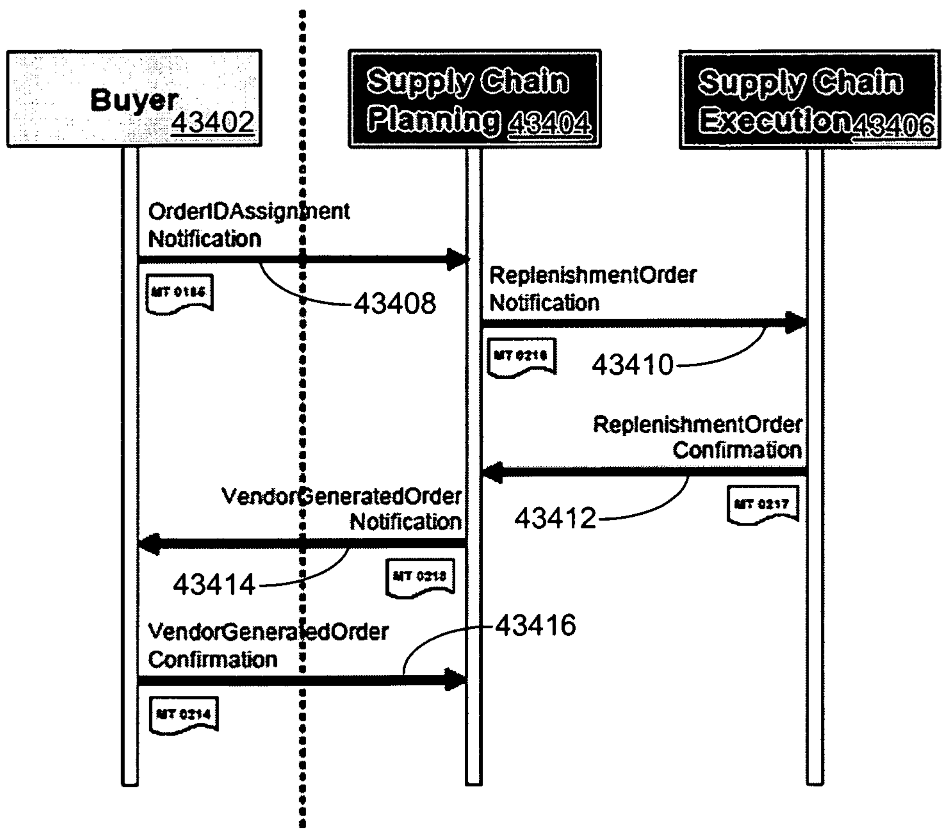
Figure 435:
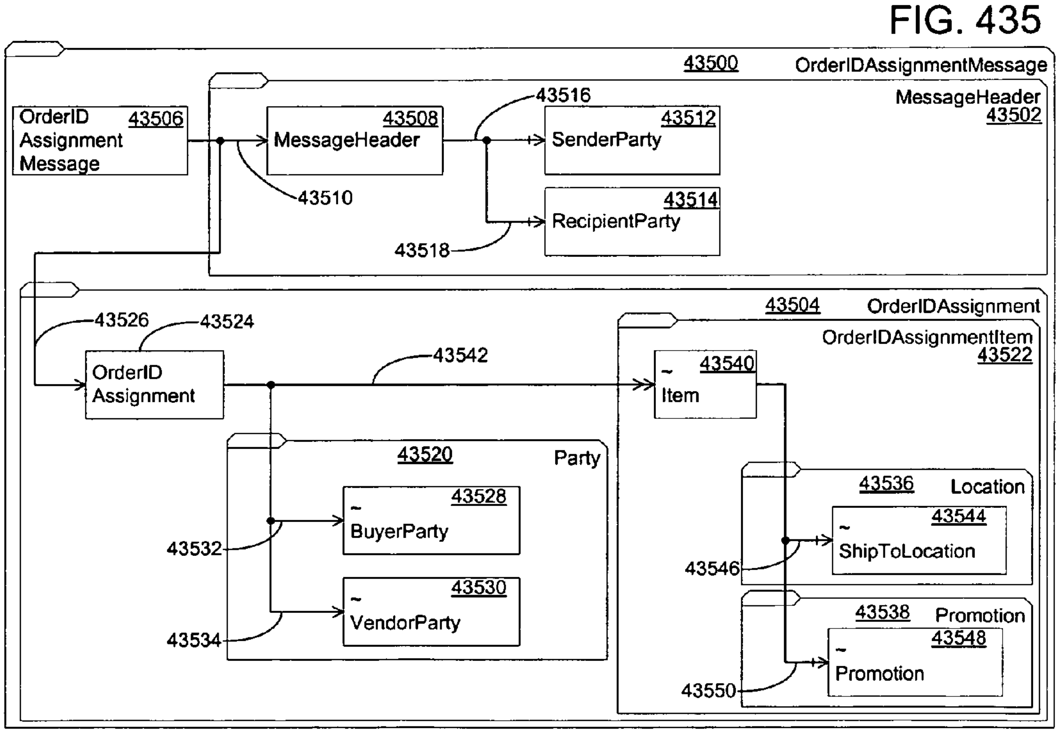
Figure 437:
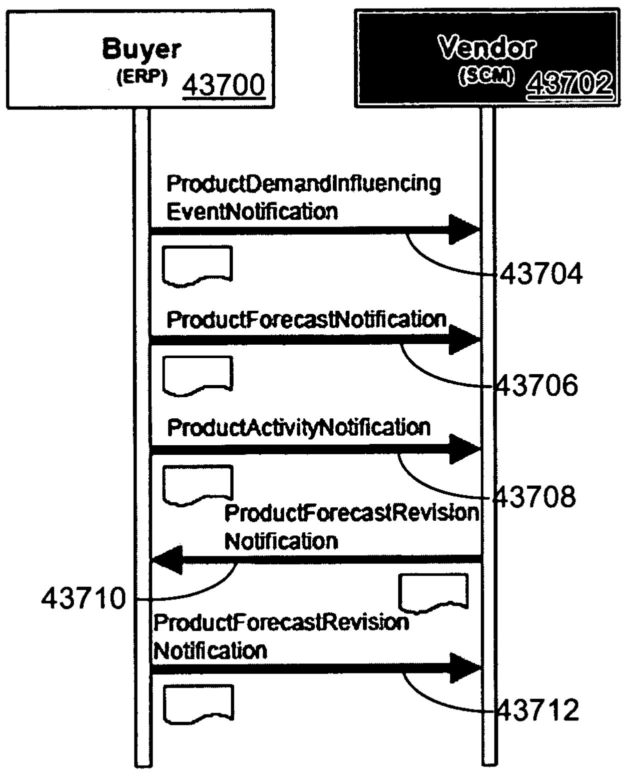
Figure 438:
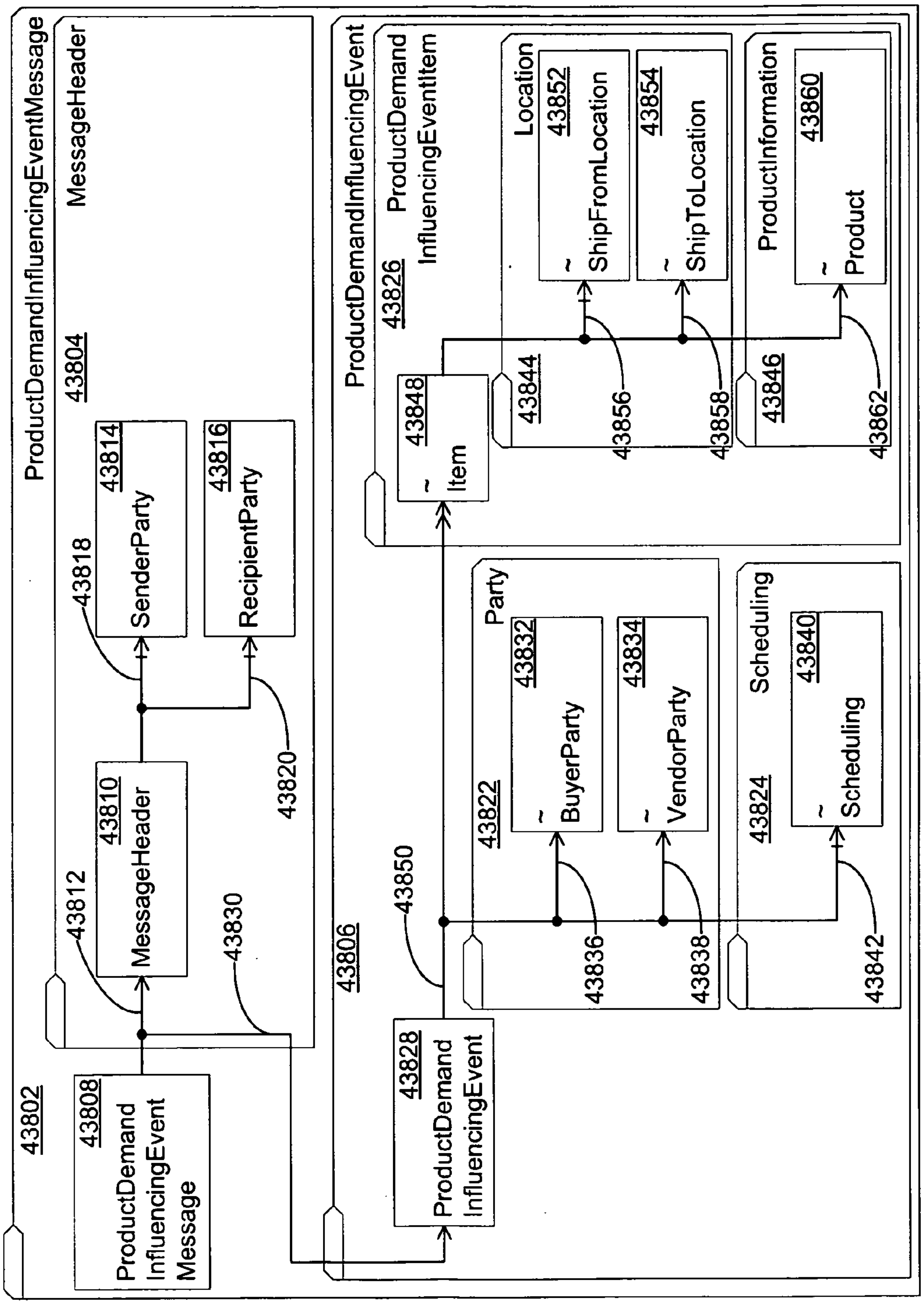
Figure 440:
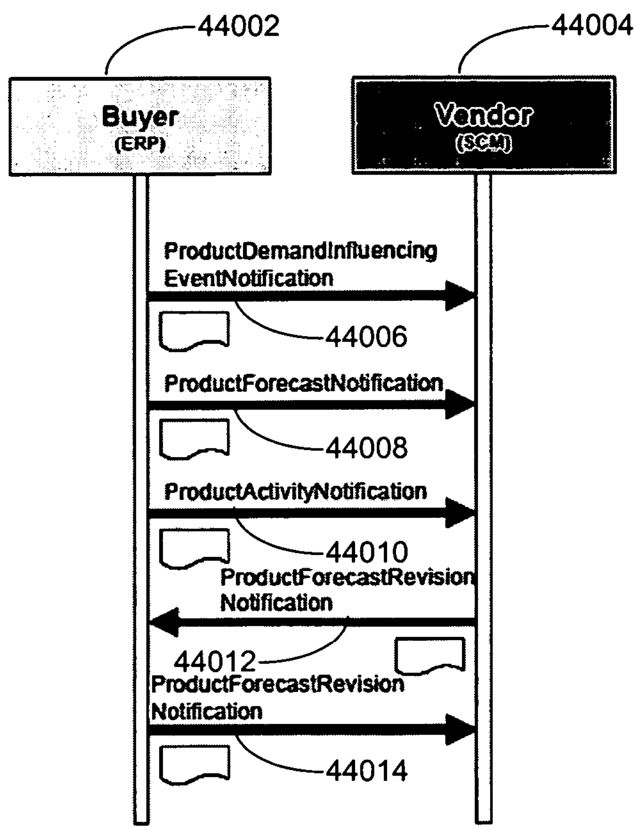
Figure 441:
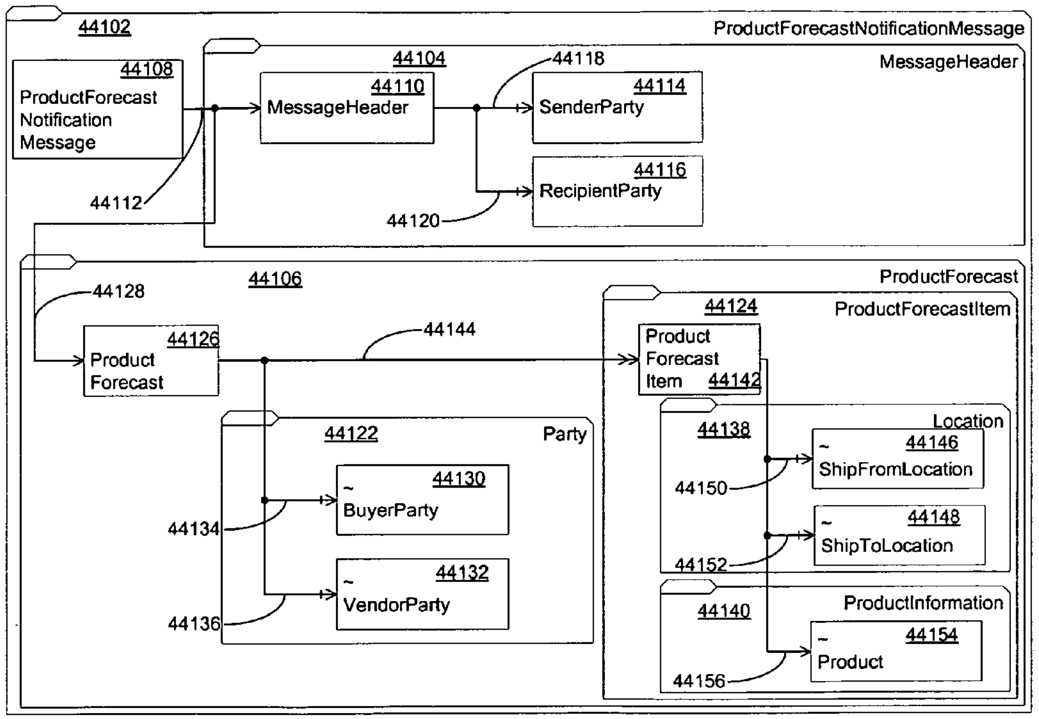
Figure 443:
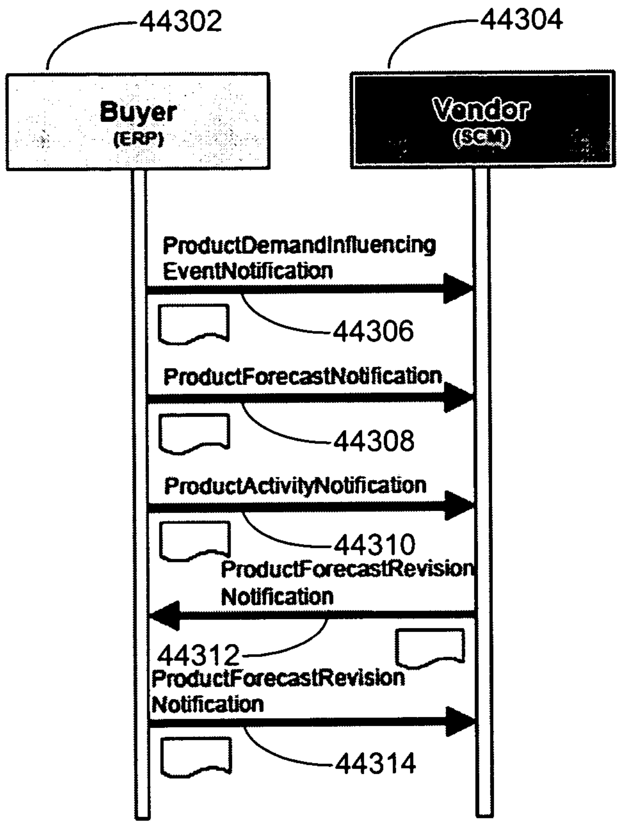
Figure 444:
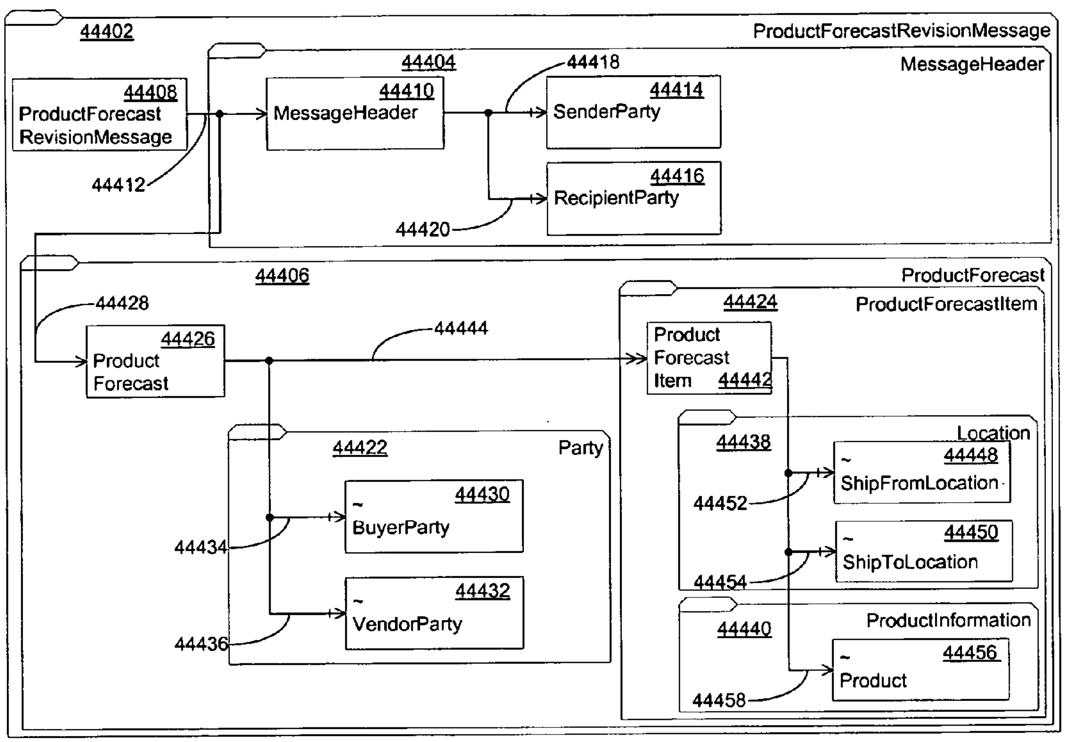
Figure 446:
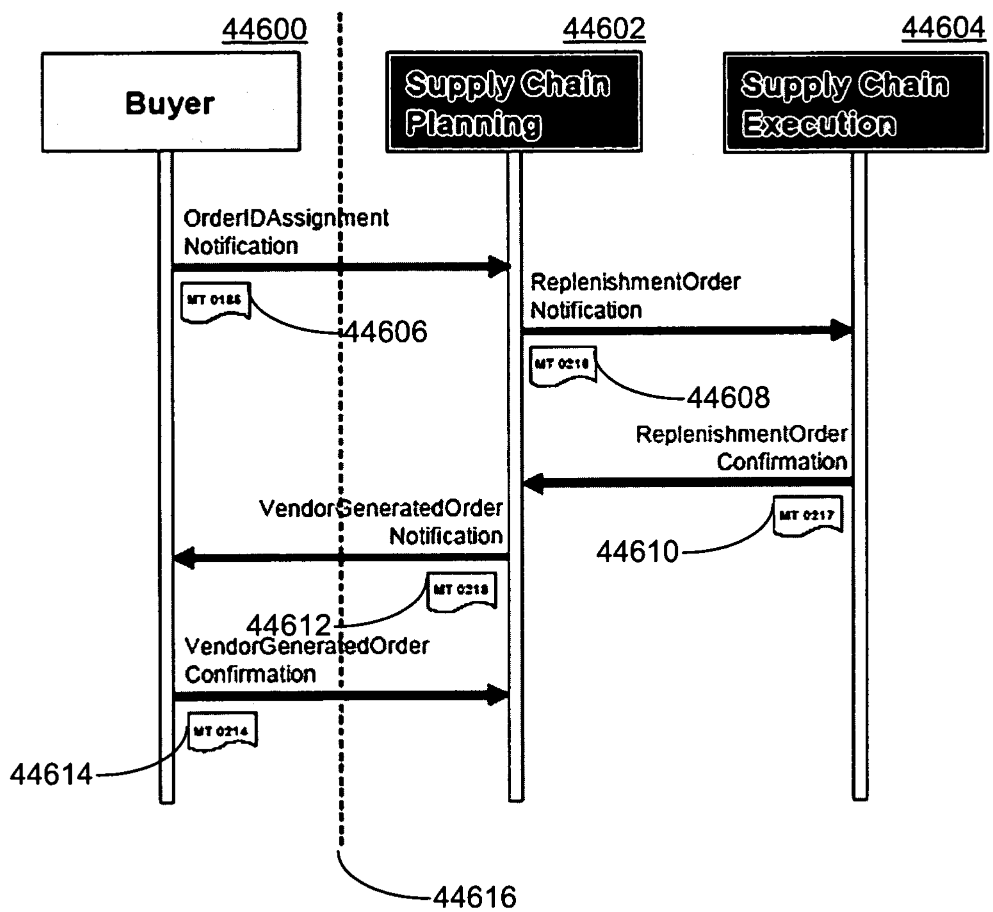
Figure 447A:
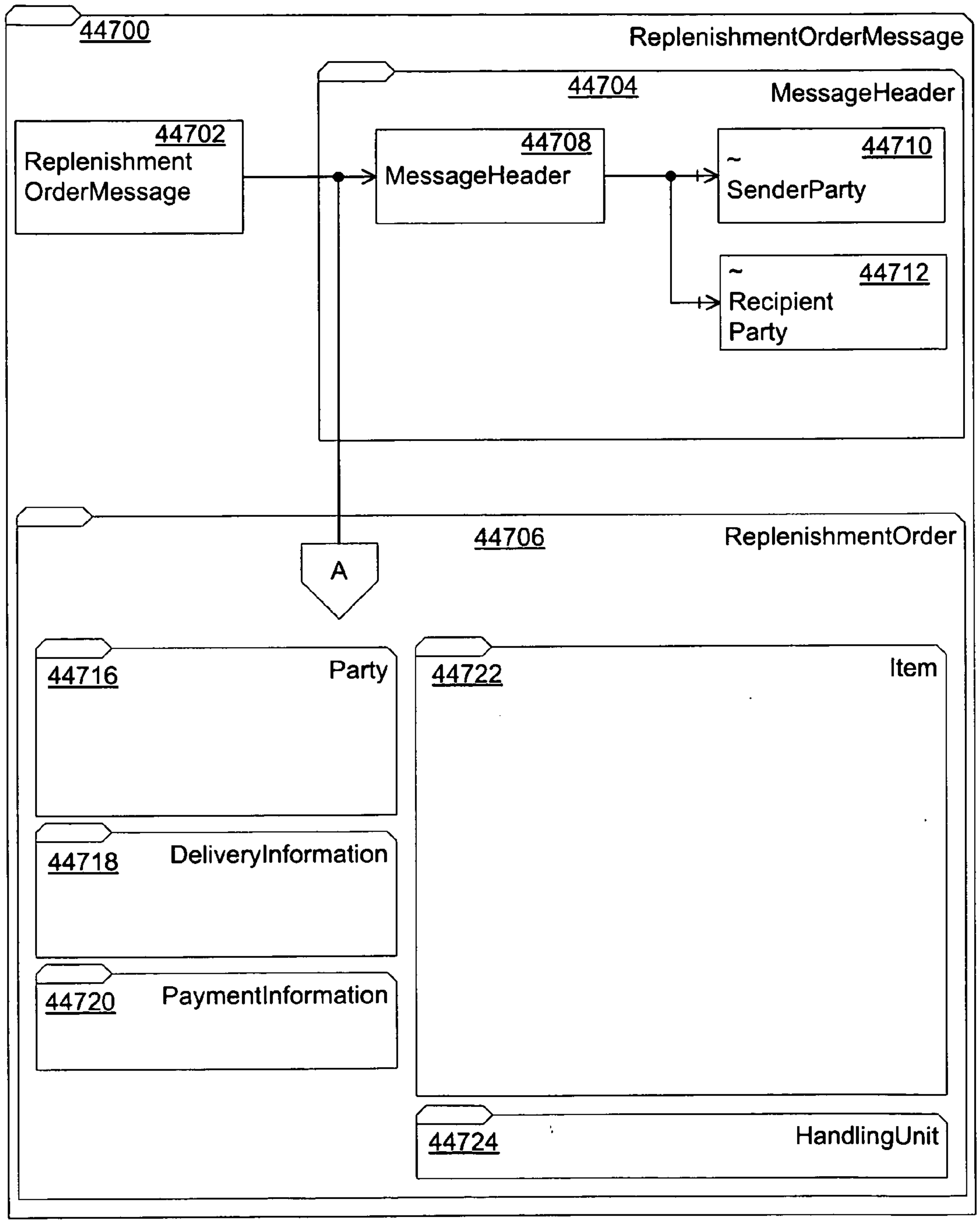
Figure 447B:
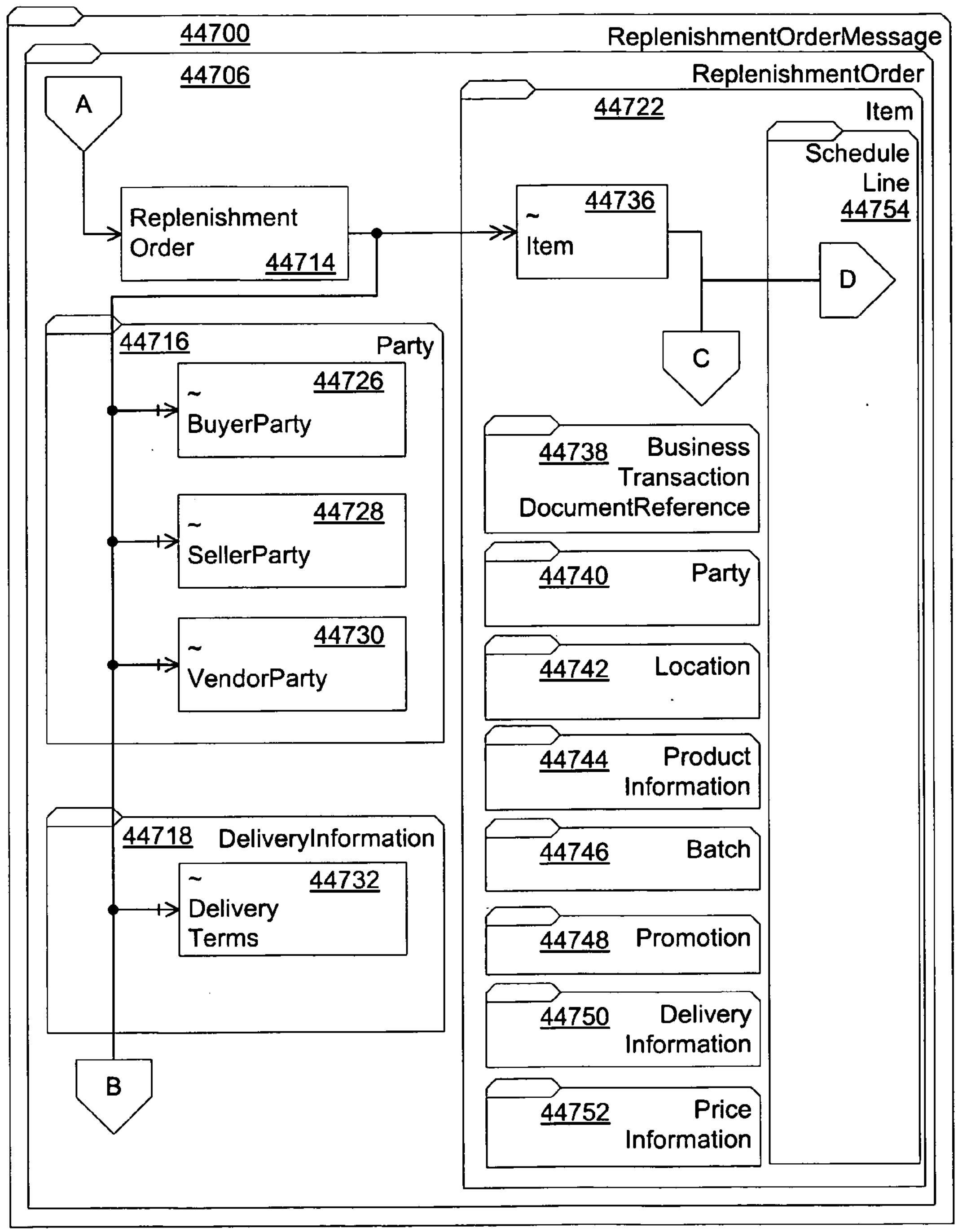
Figure 447C:
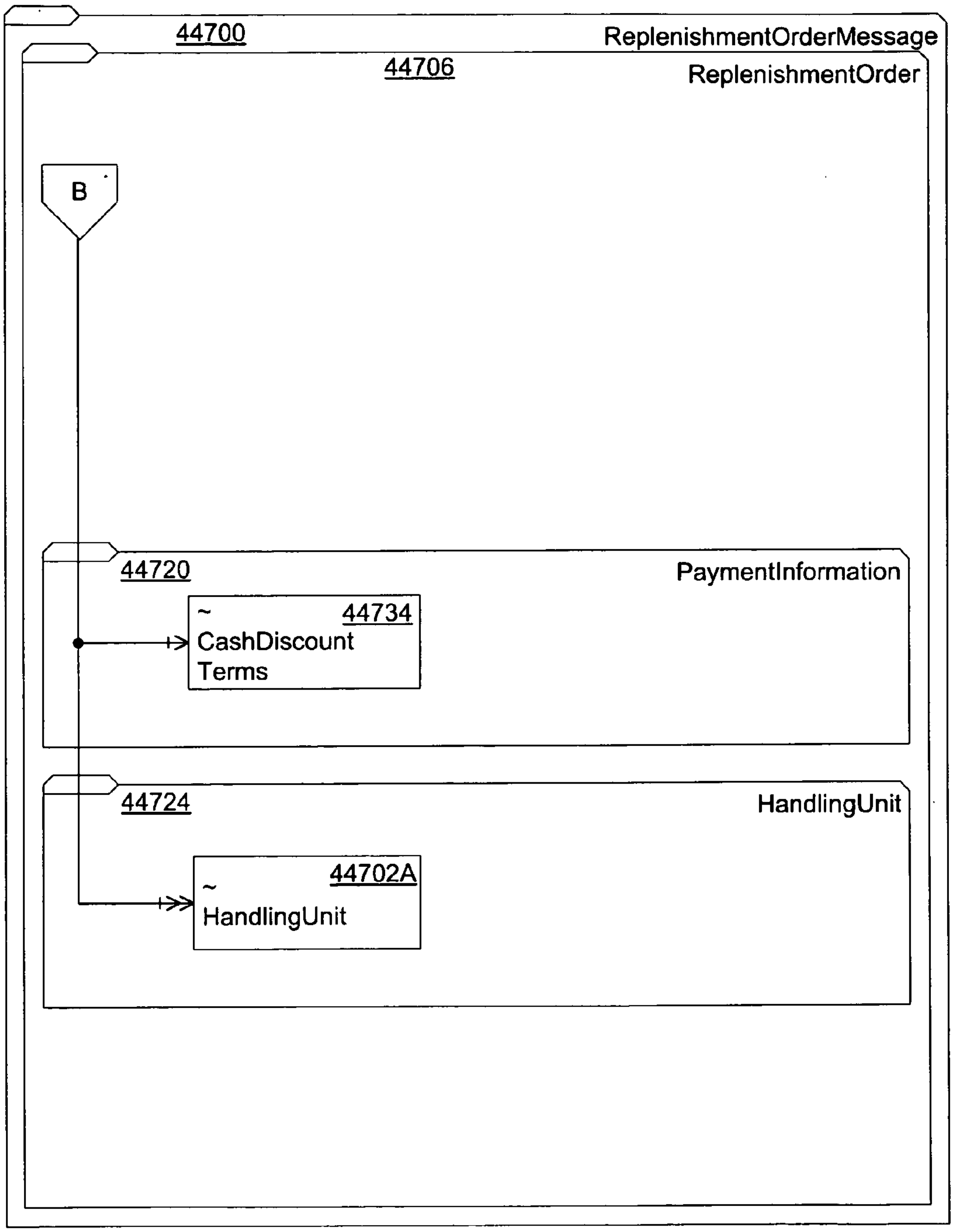
Figure 447D:
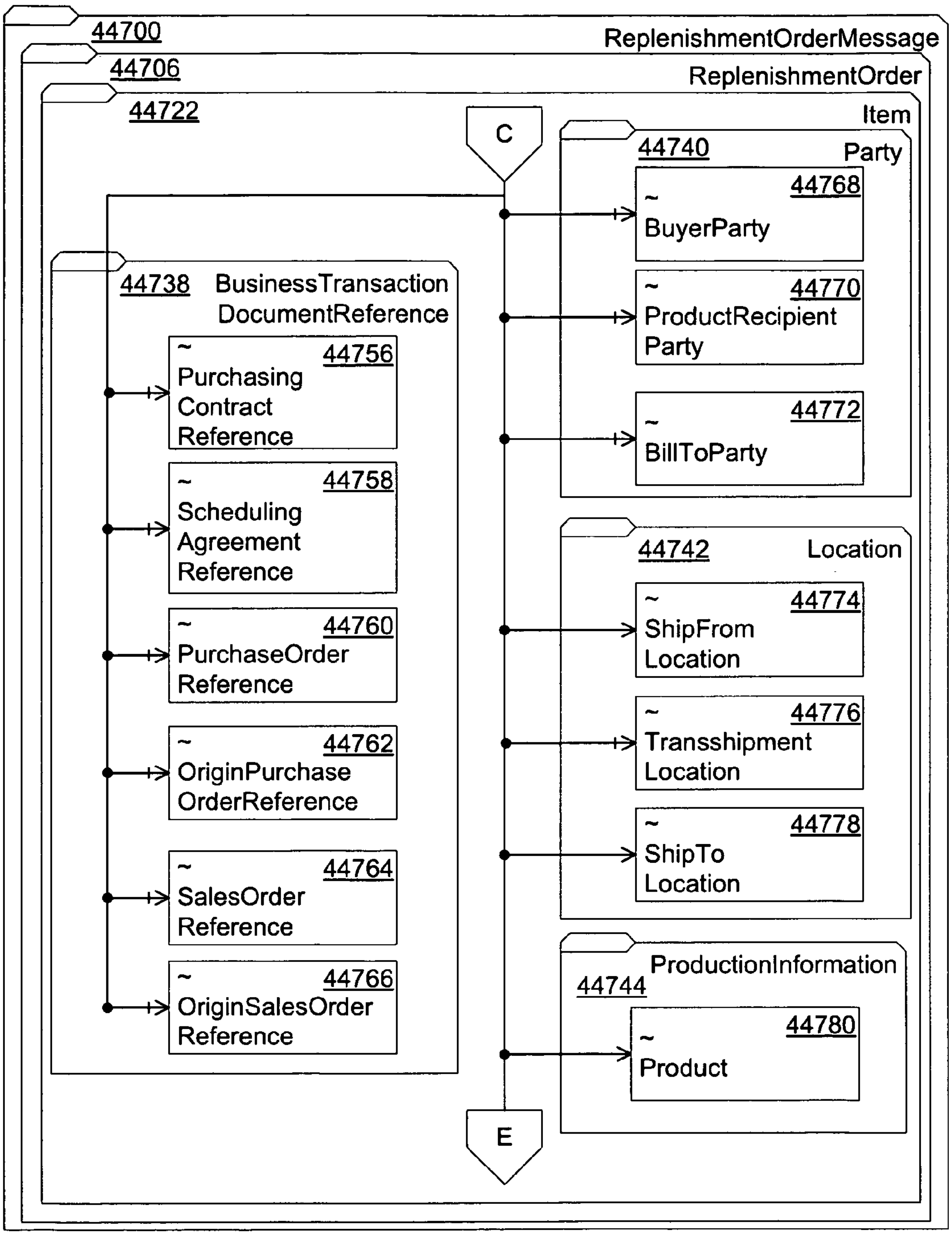
Figure 447E:
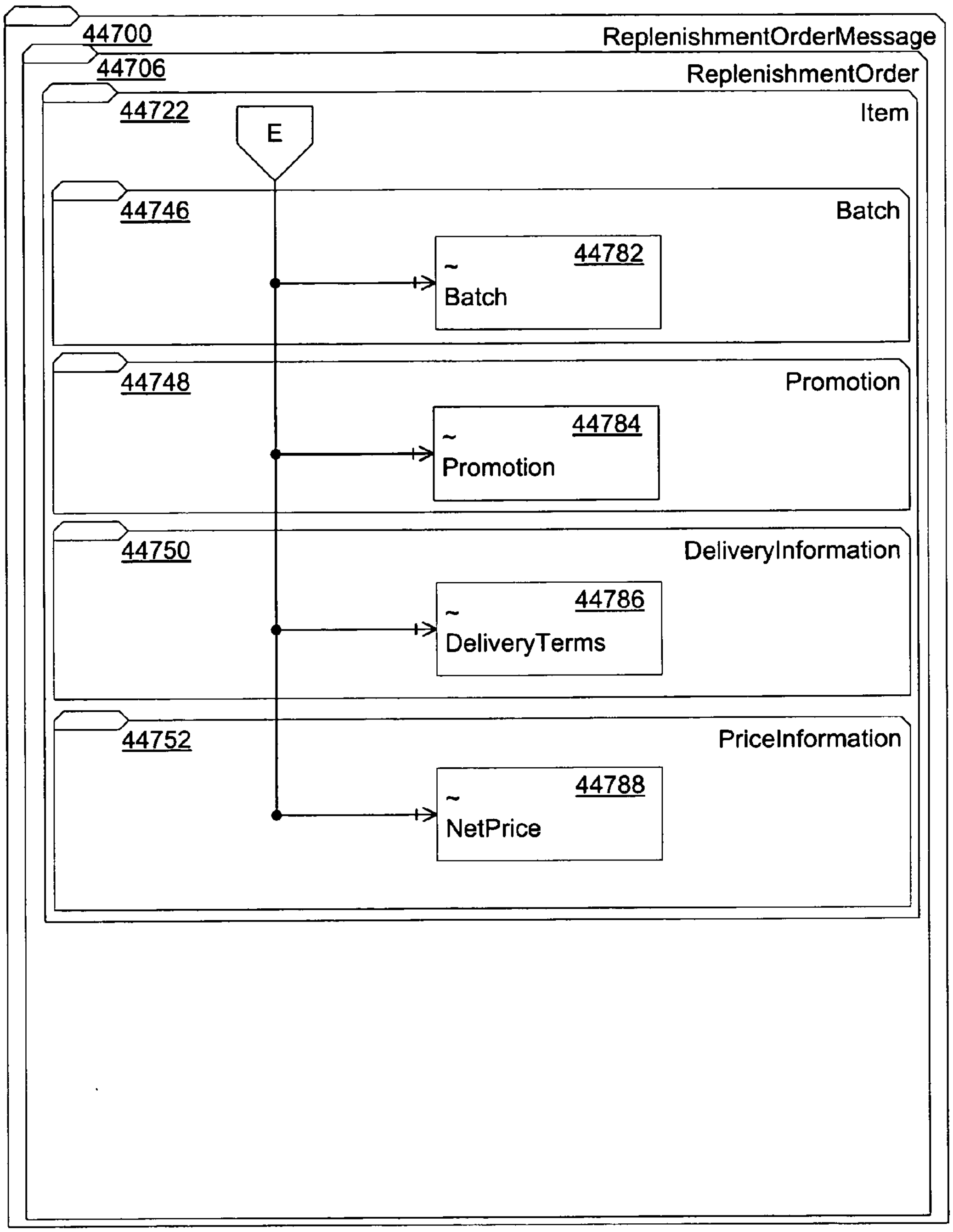
Figure 447F:
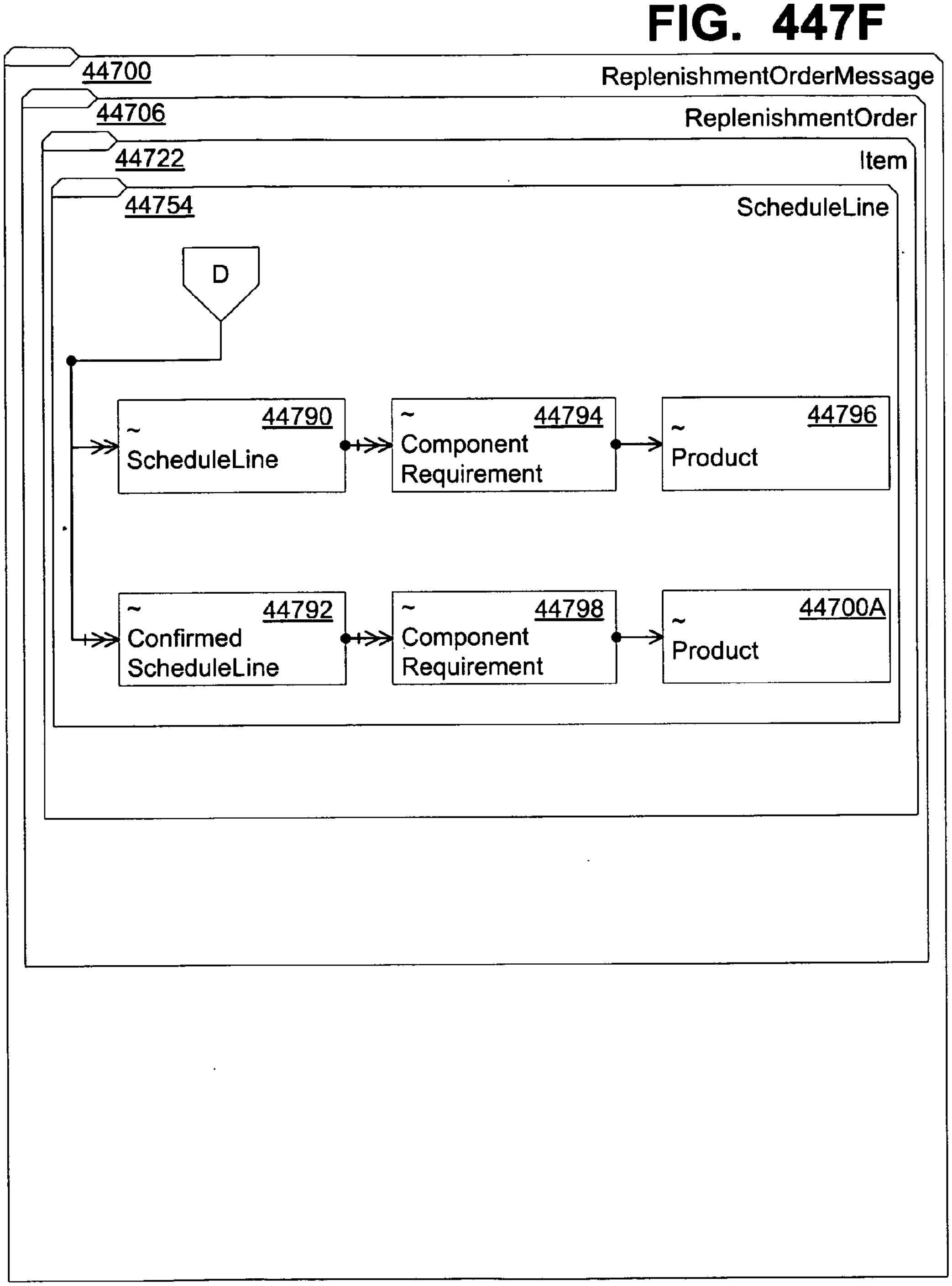
Figure 449:
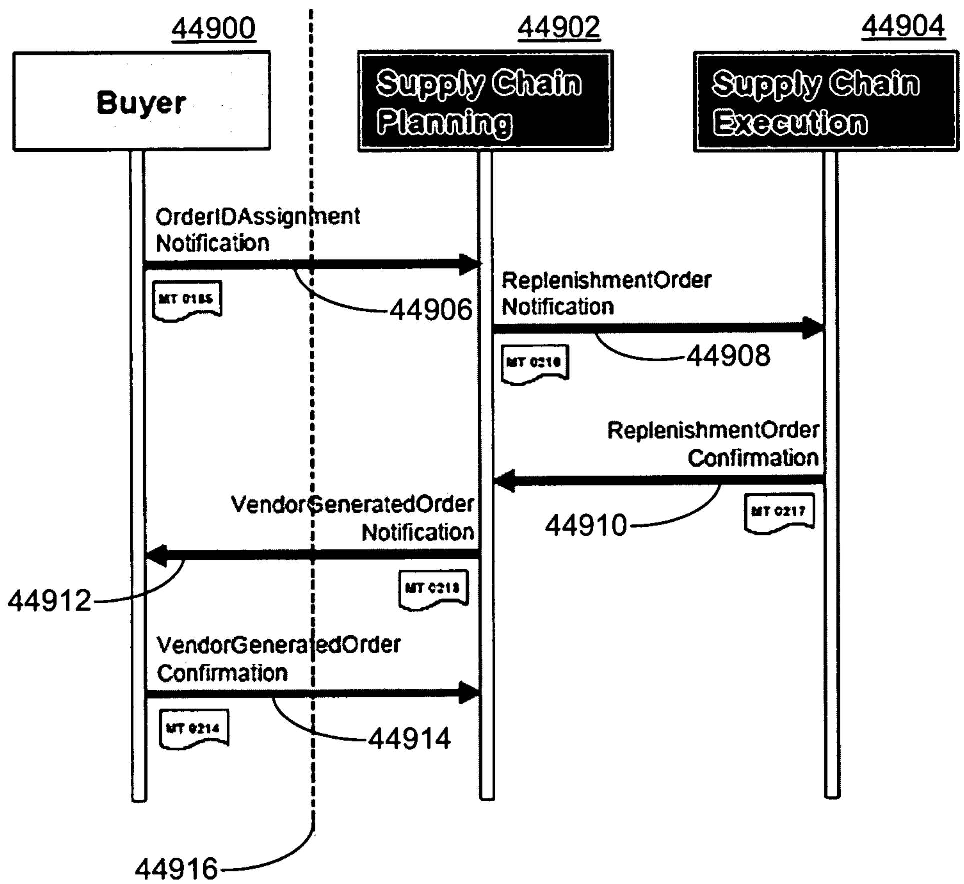
Figure 450A:
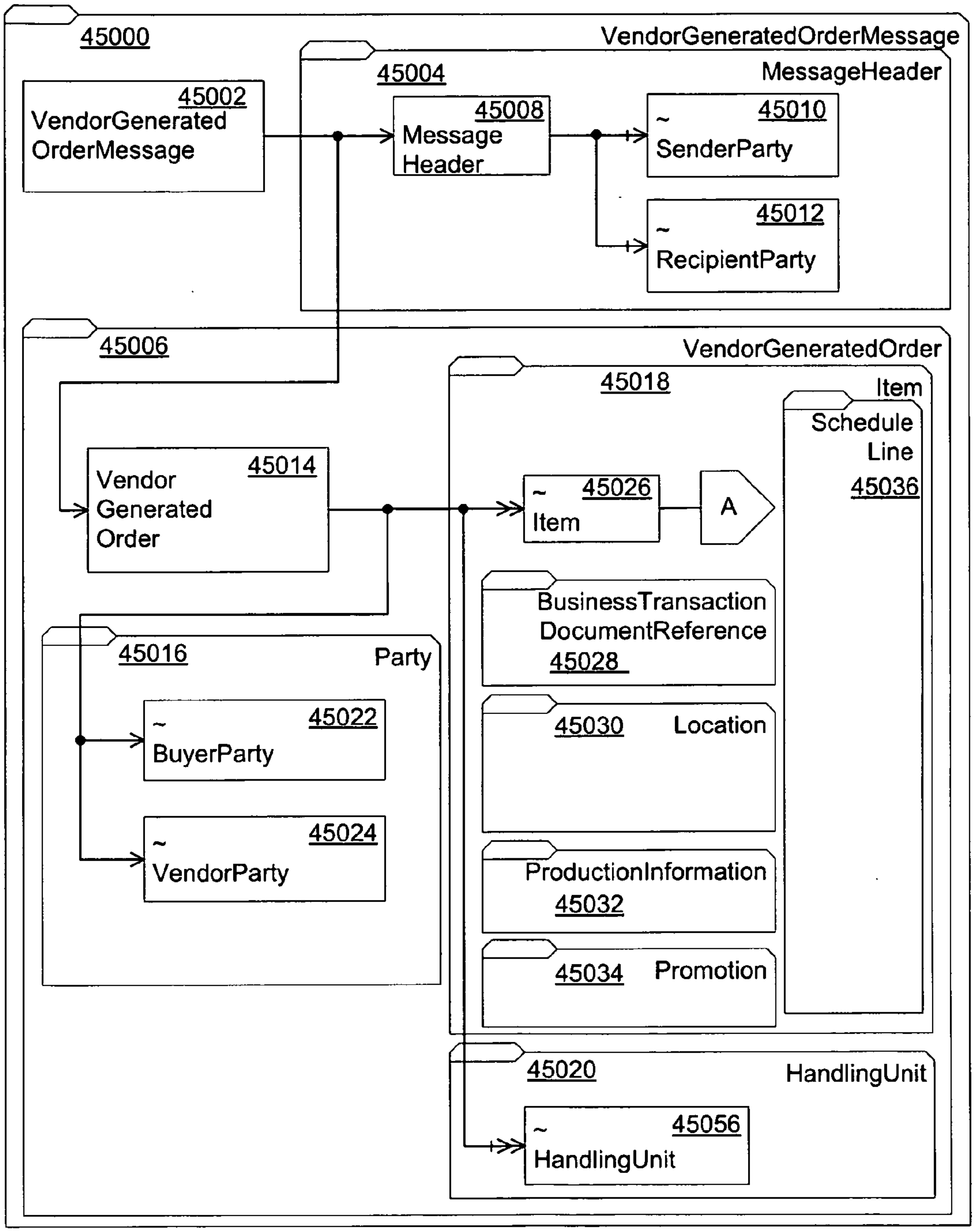
Figure 450B:
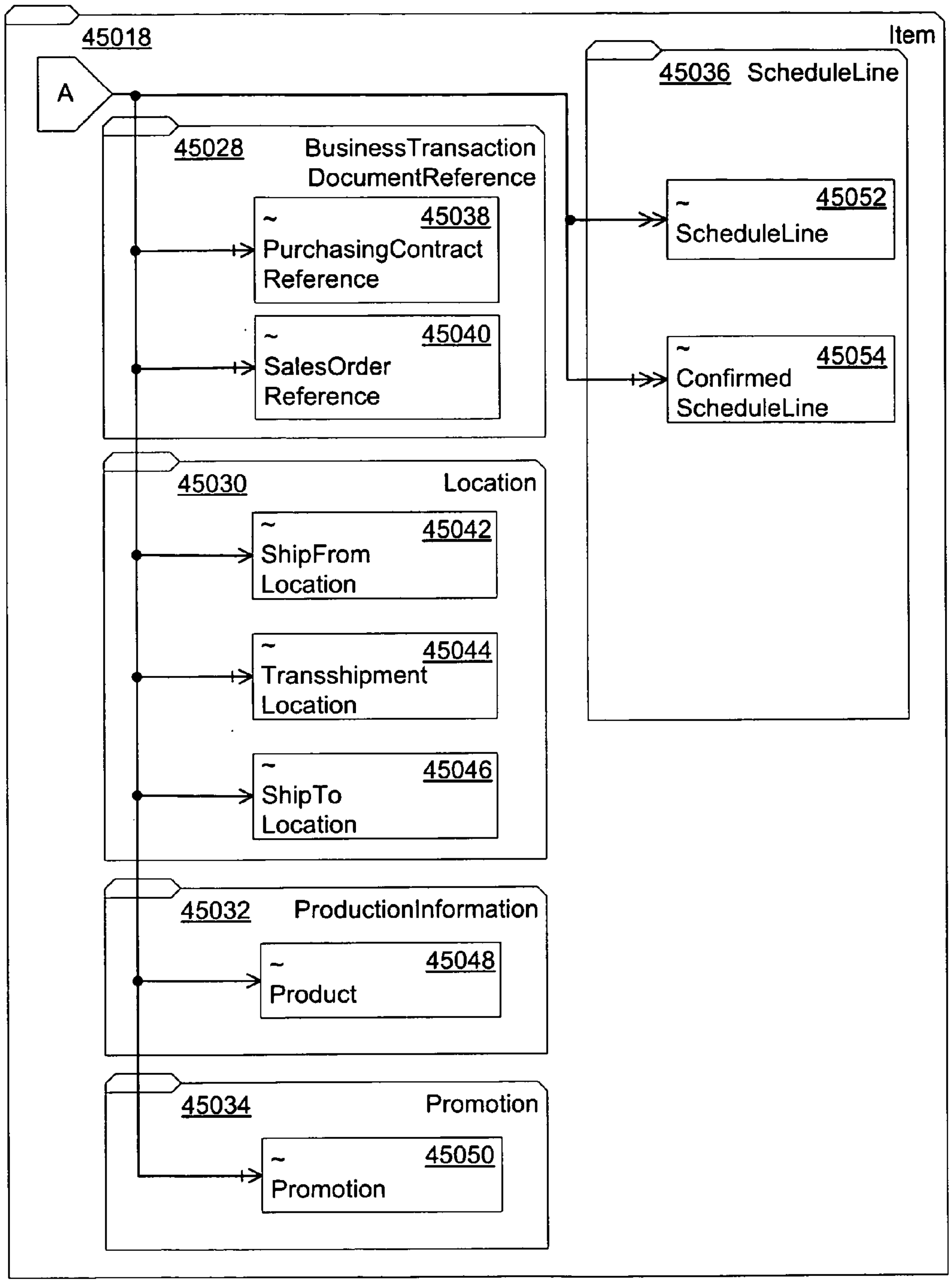
Figure 452:
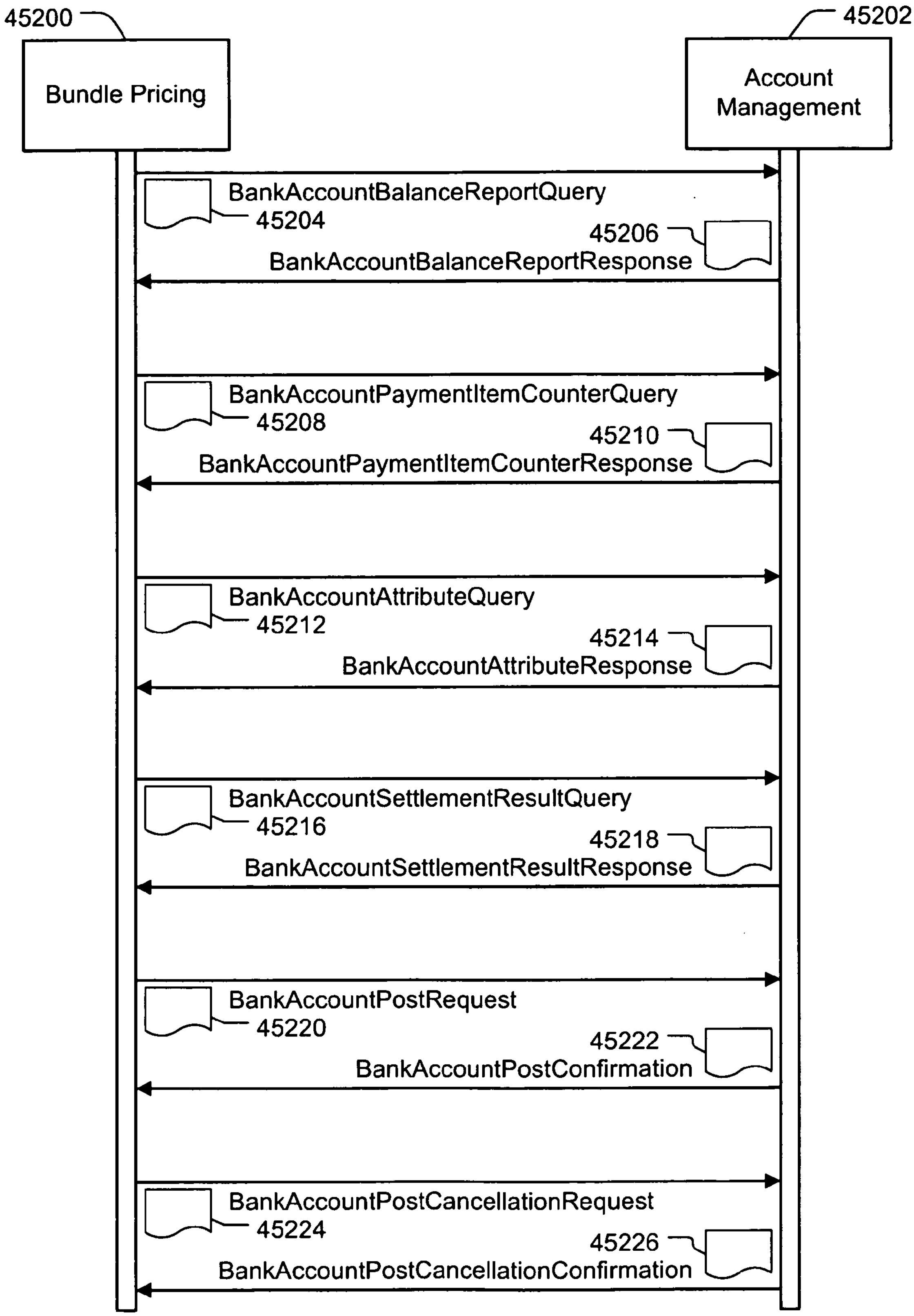
Figure 453:
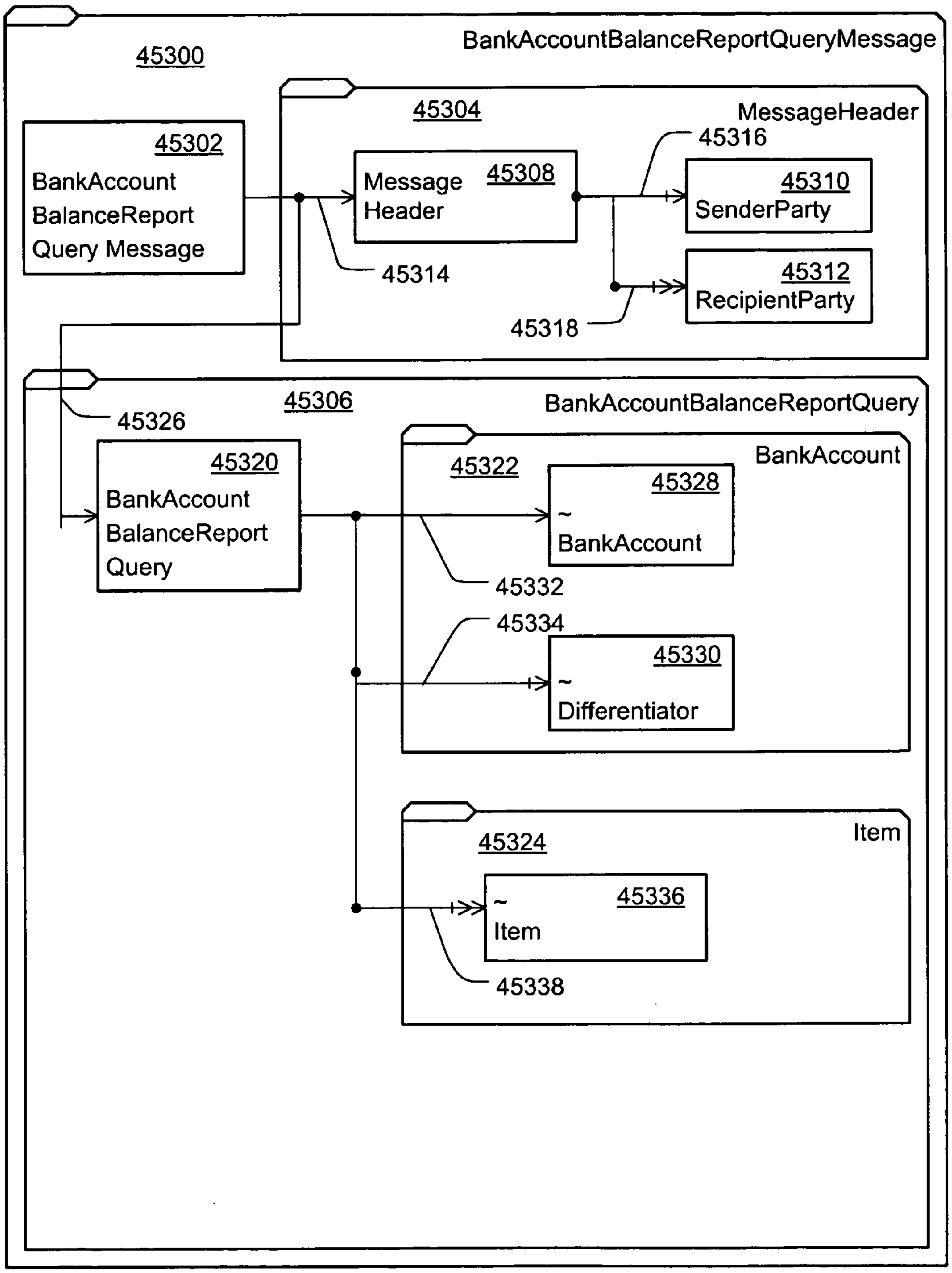
Figure 454:
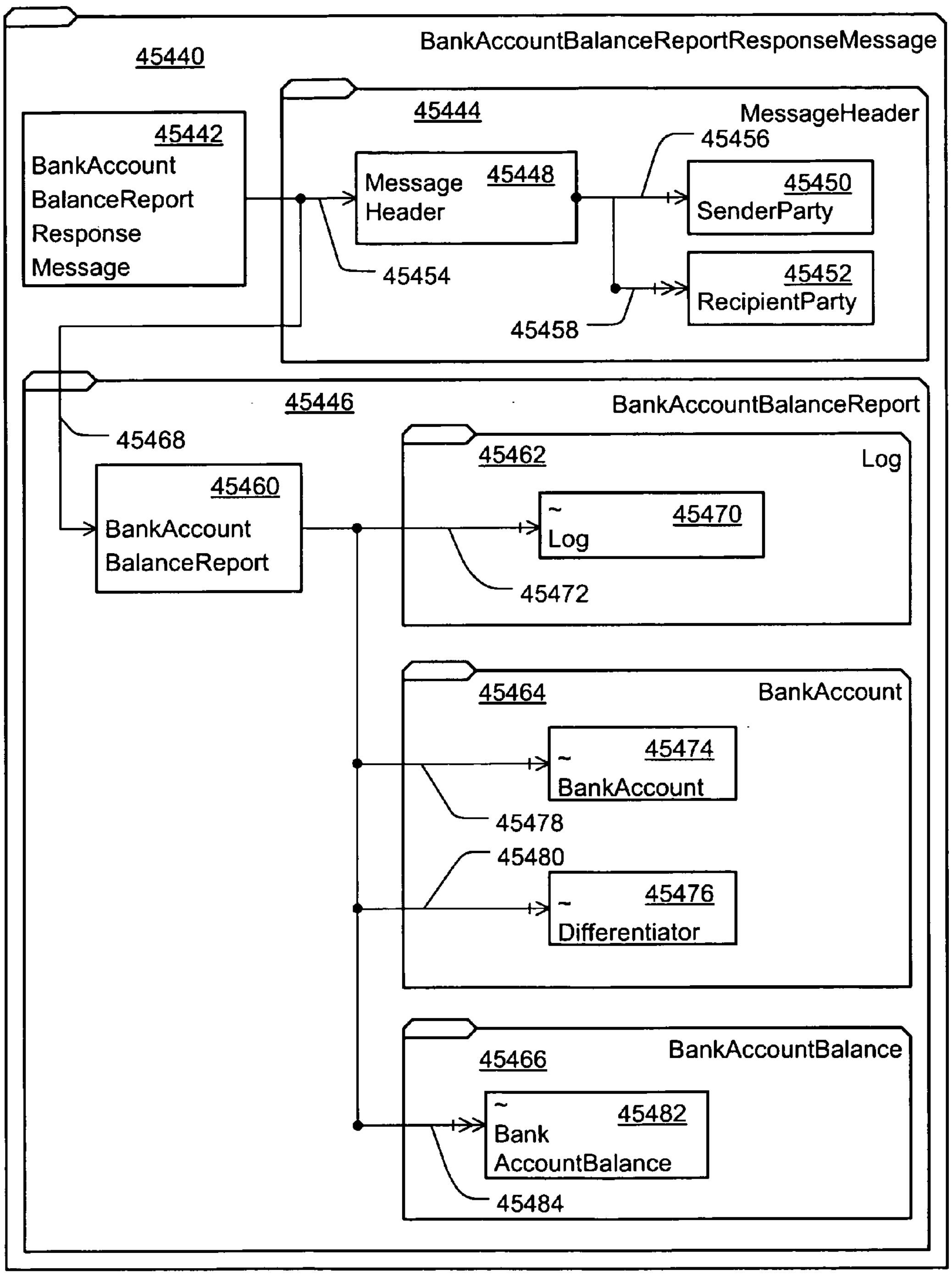
Figure 457:
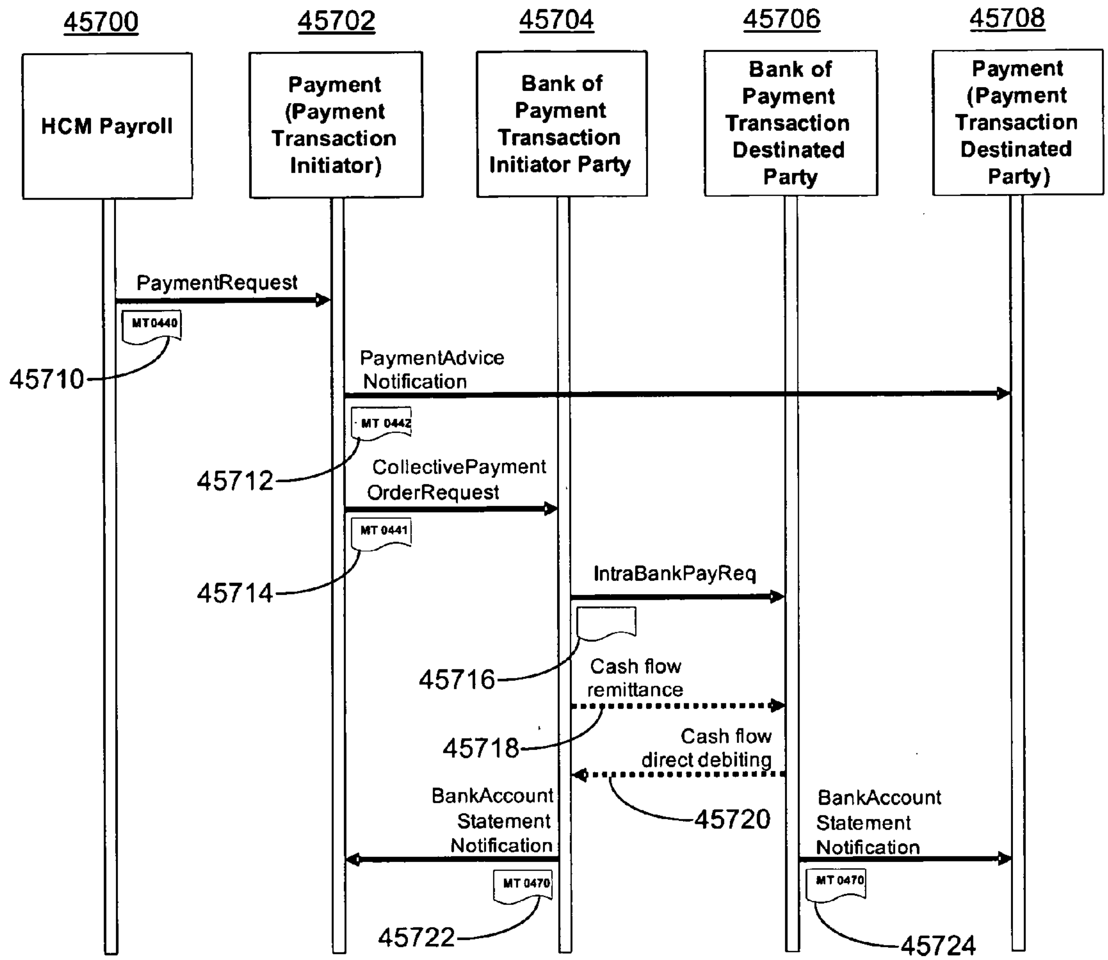
Figure 460:
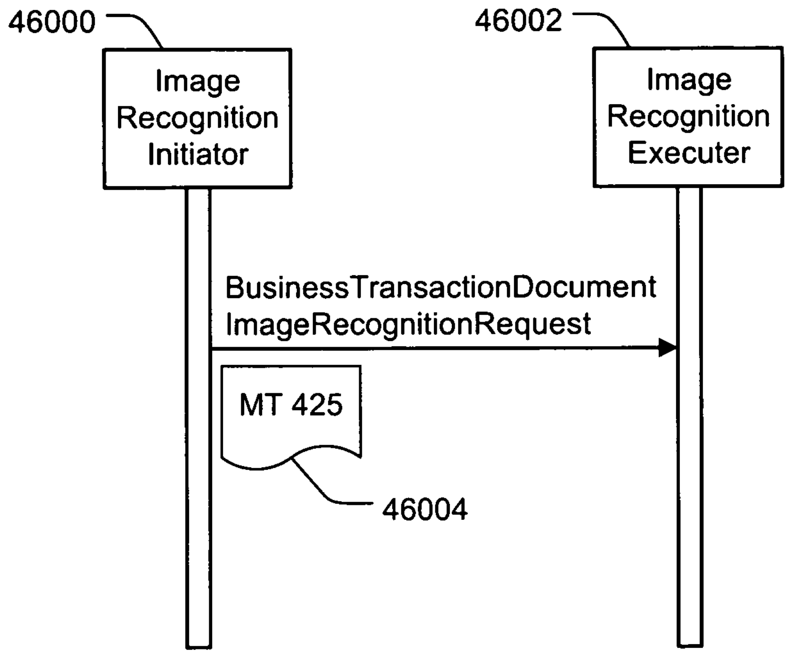
Figure 461:
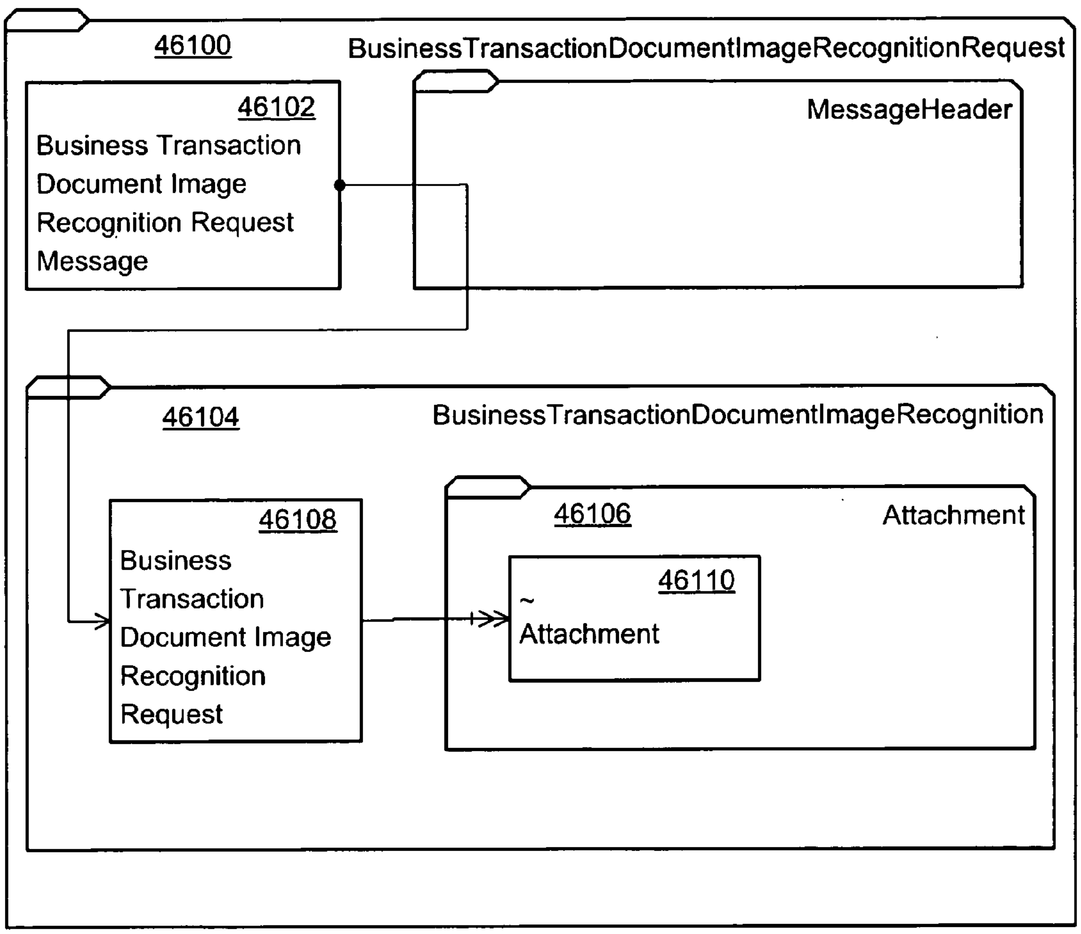
Figure 463:
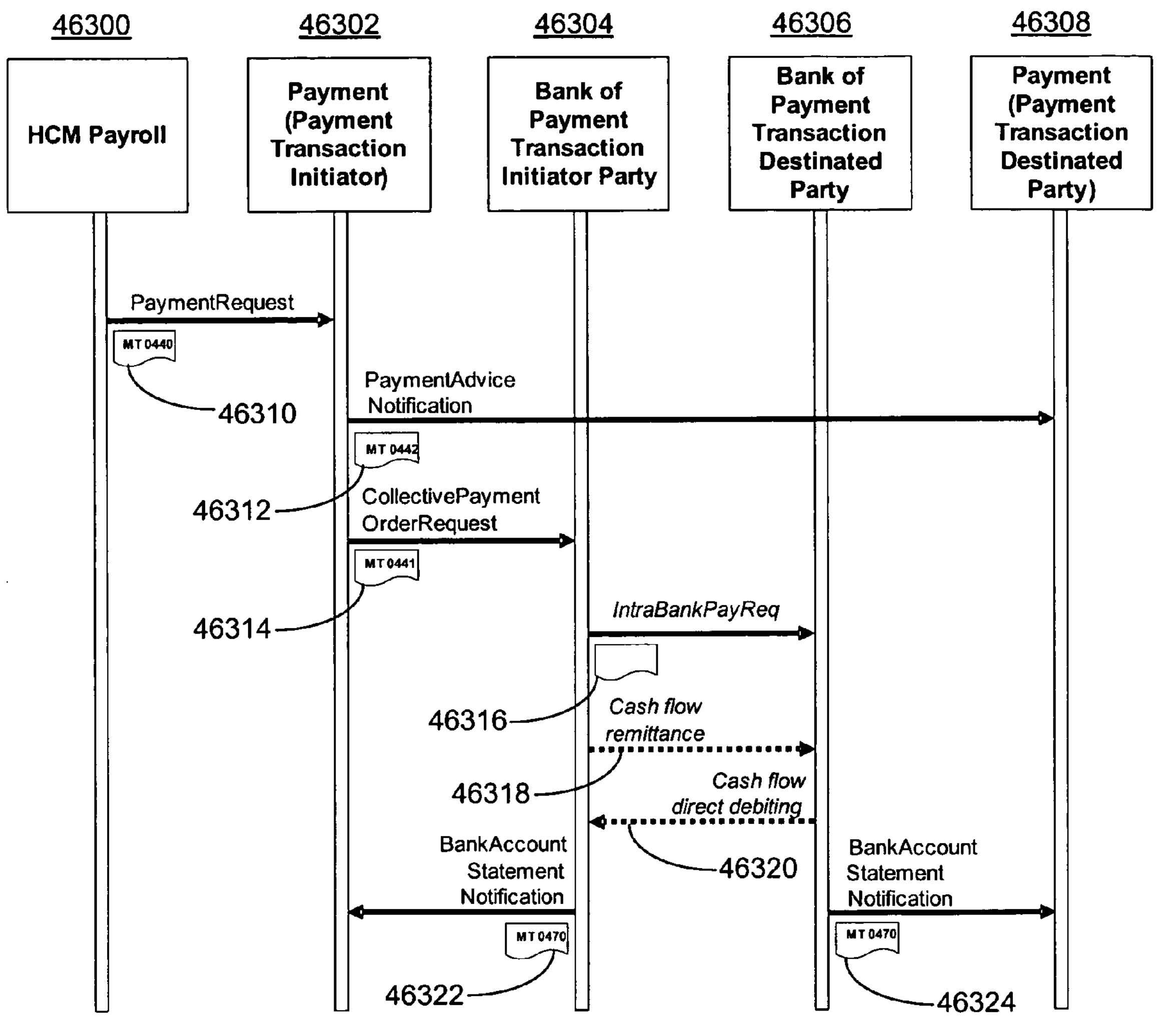
Figure 466:
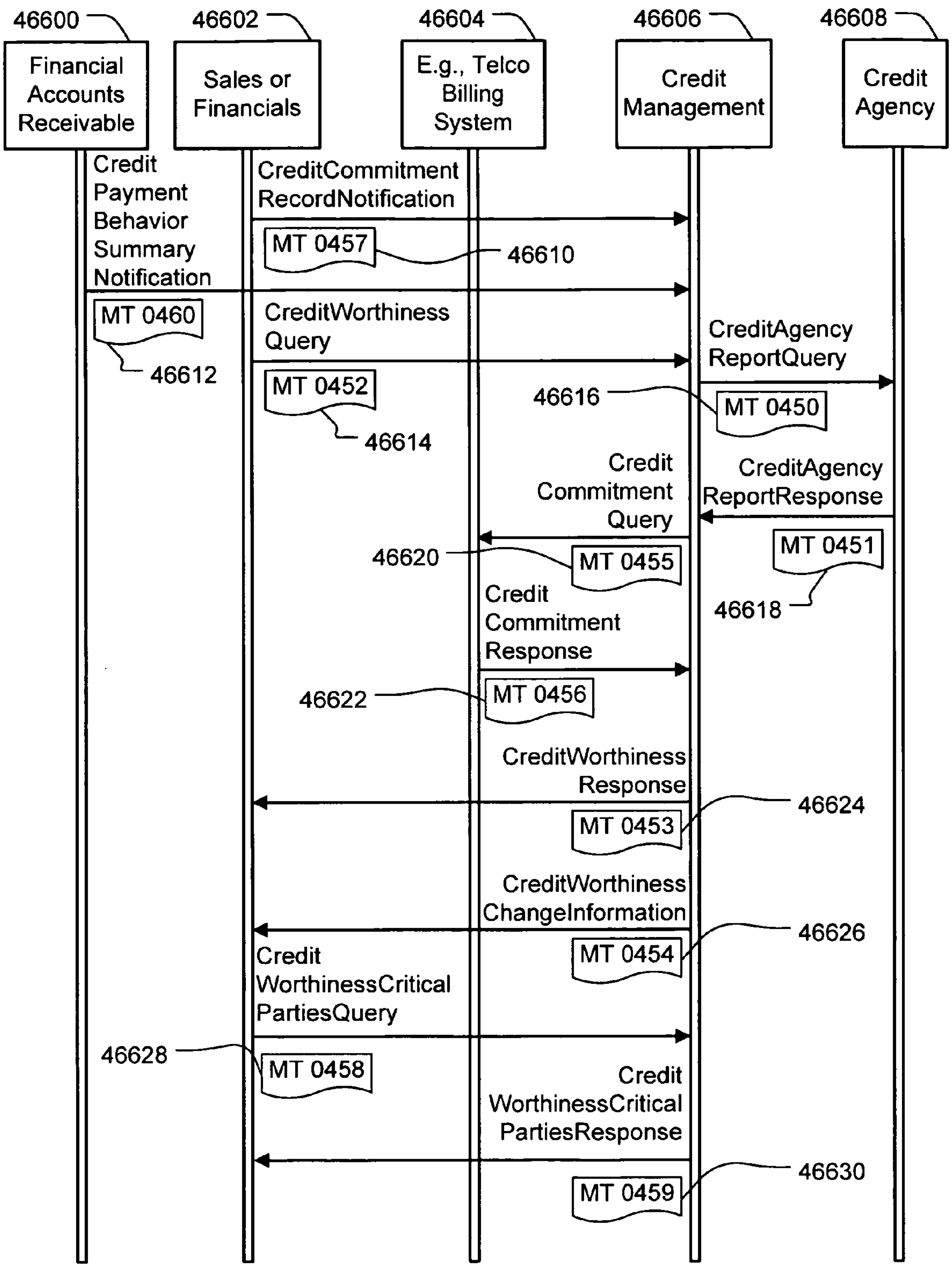
Figure 467:
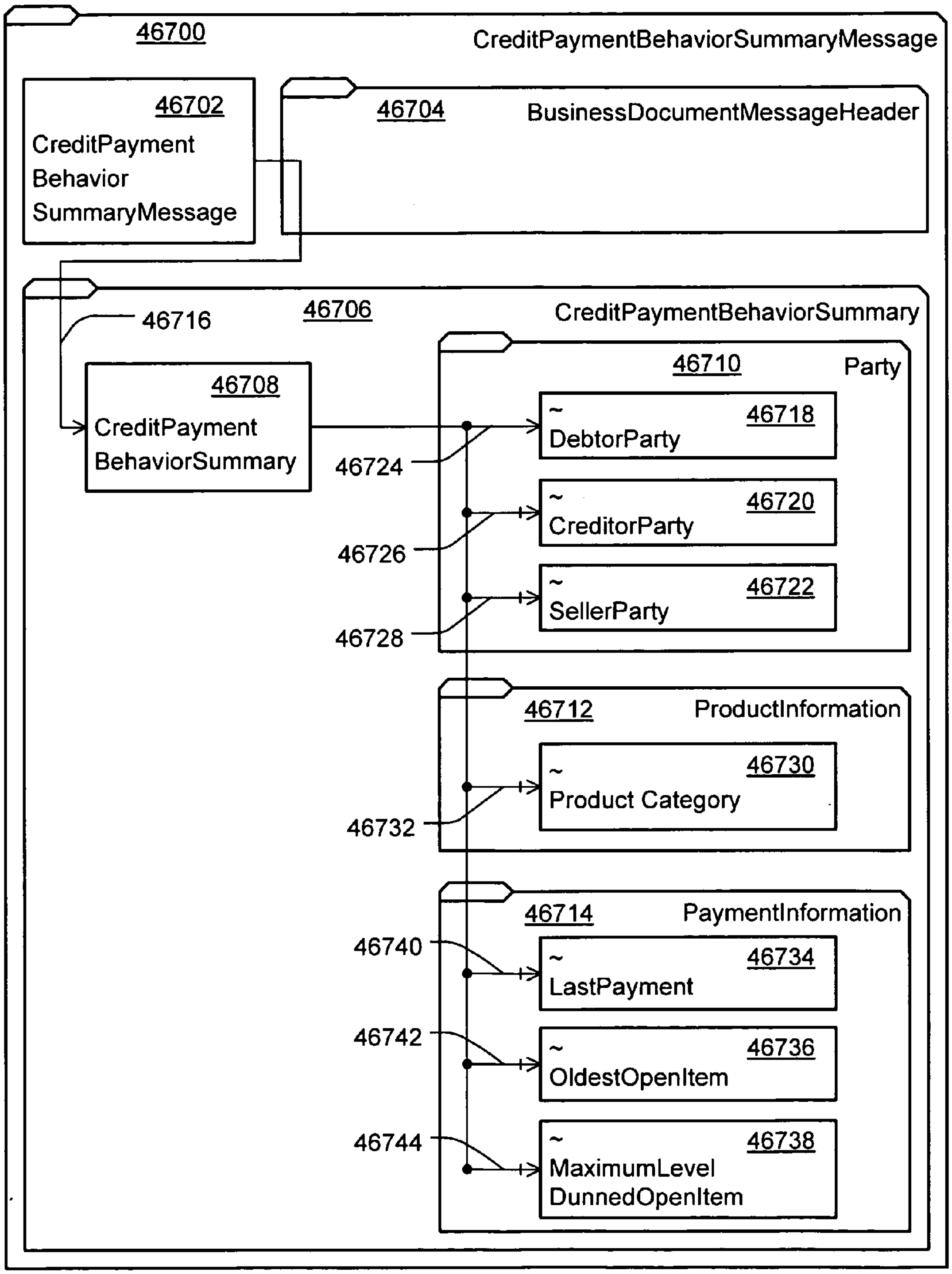
Figure 469:
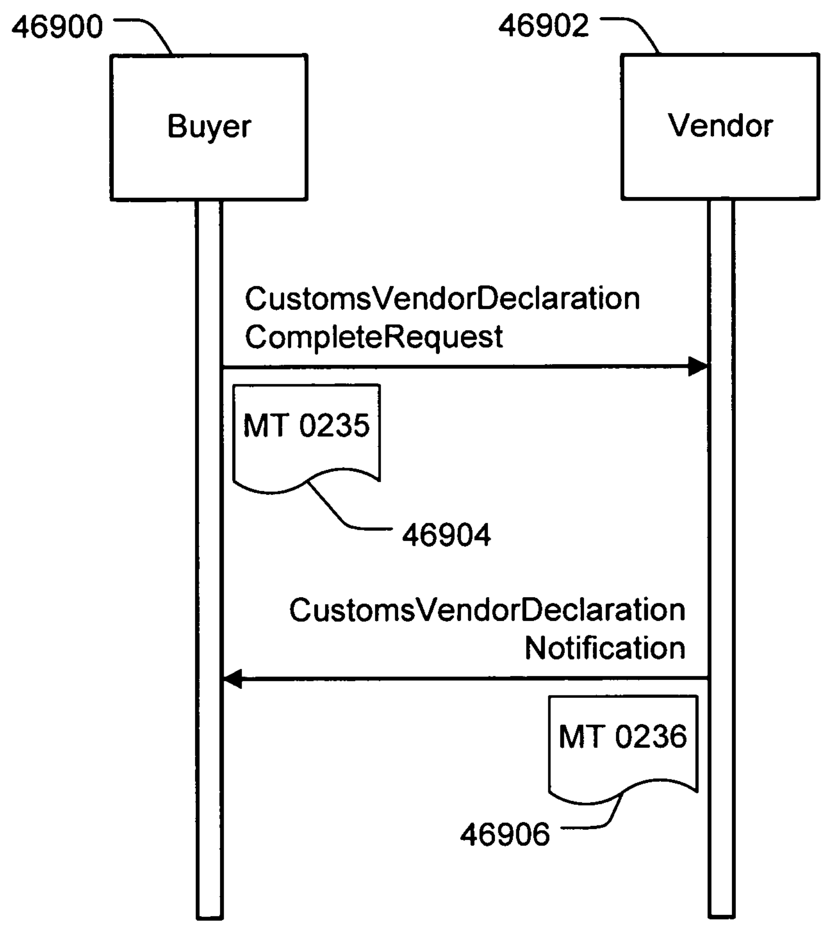
Figure 470:
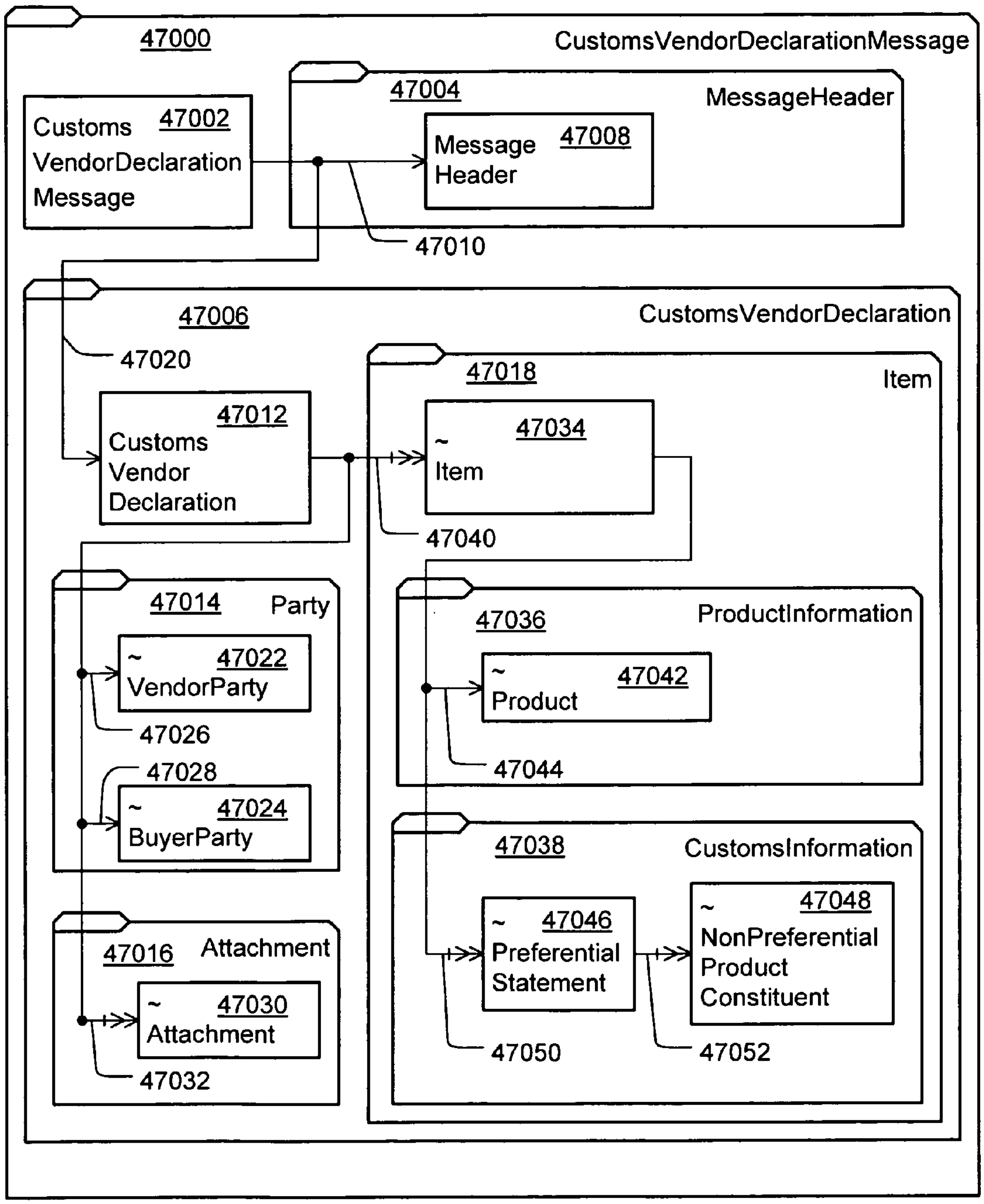
Figure 472:
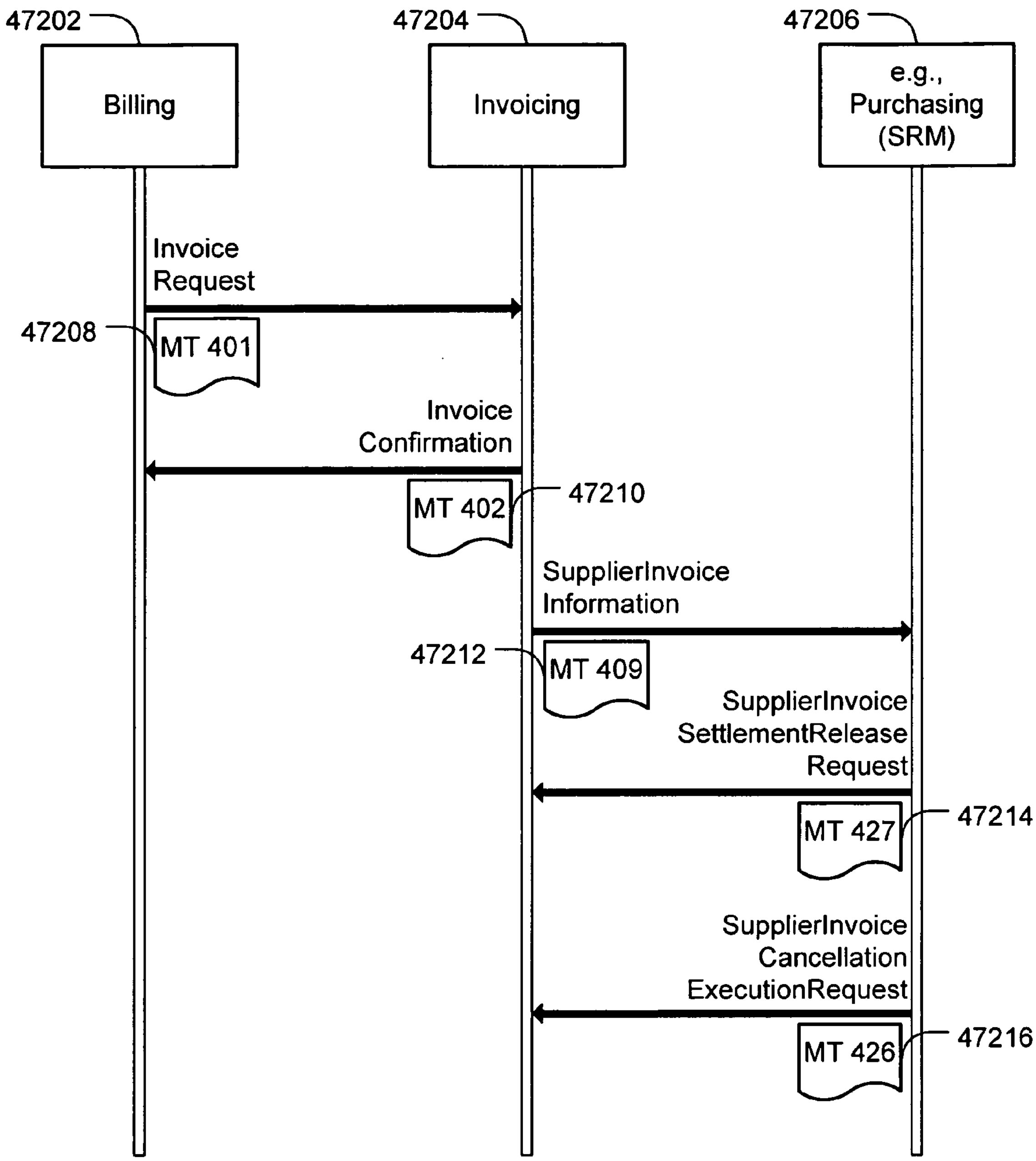
Figure 473A:
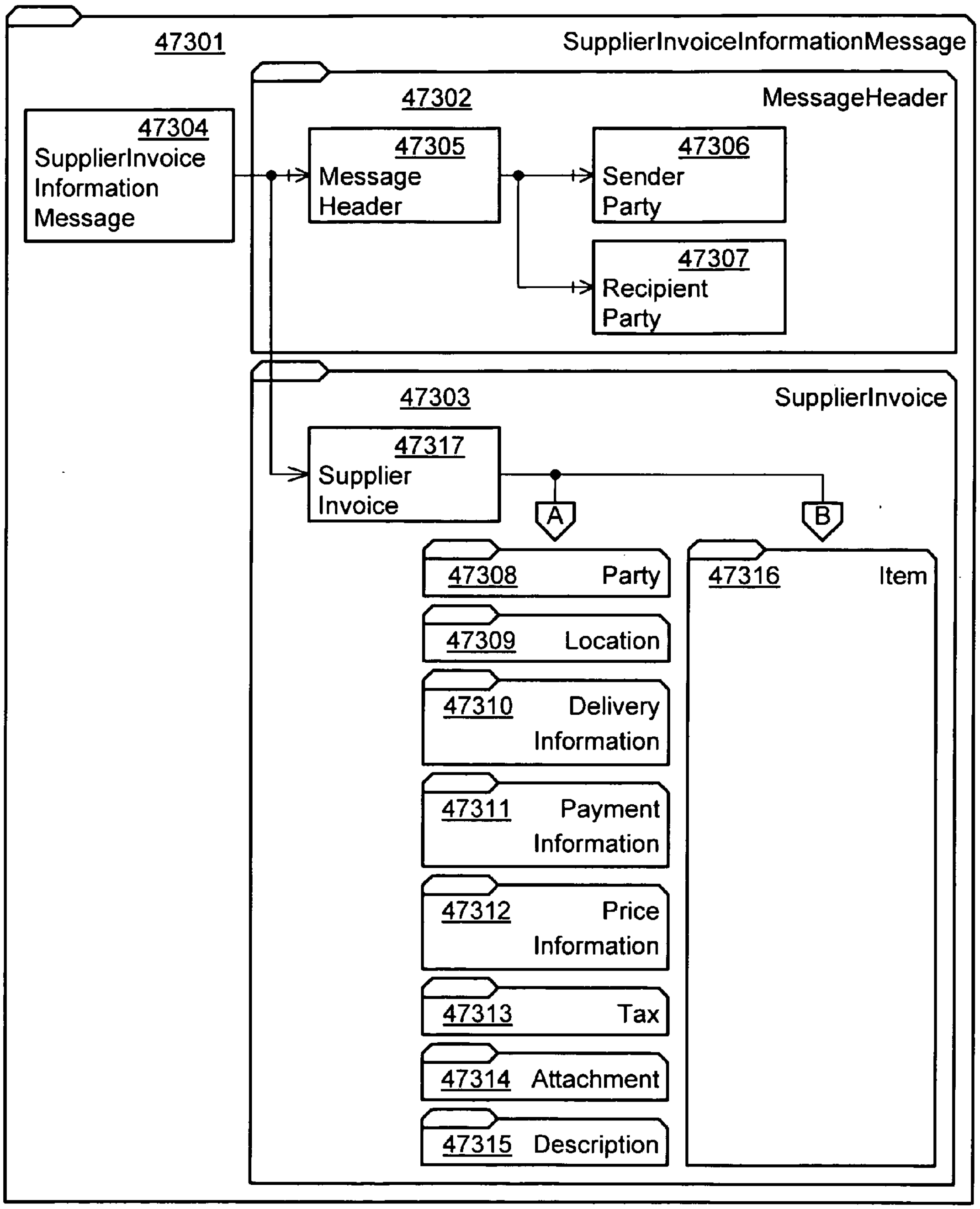
Figure 473B:
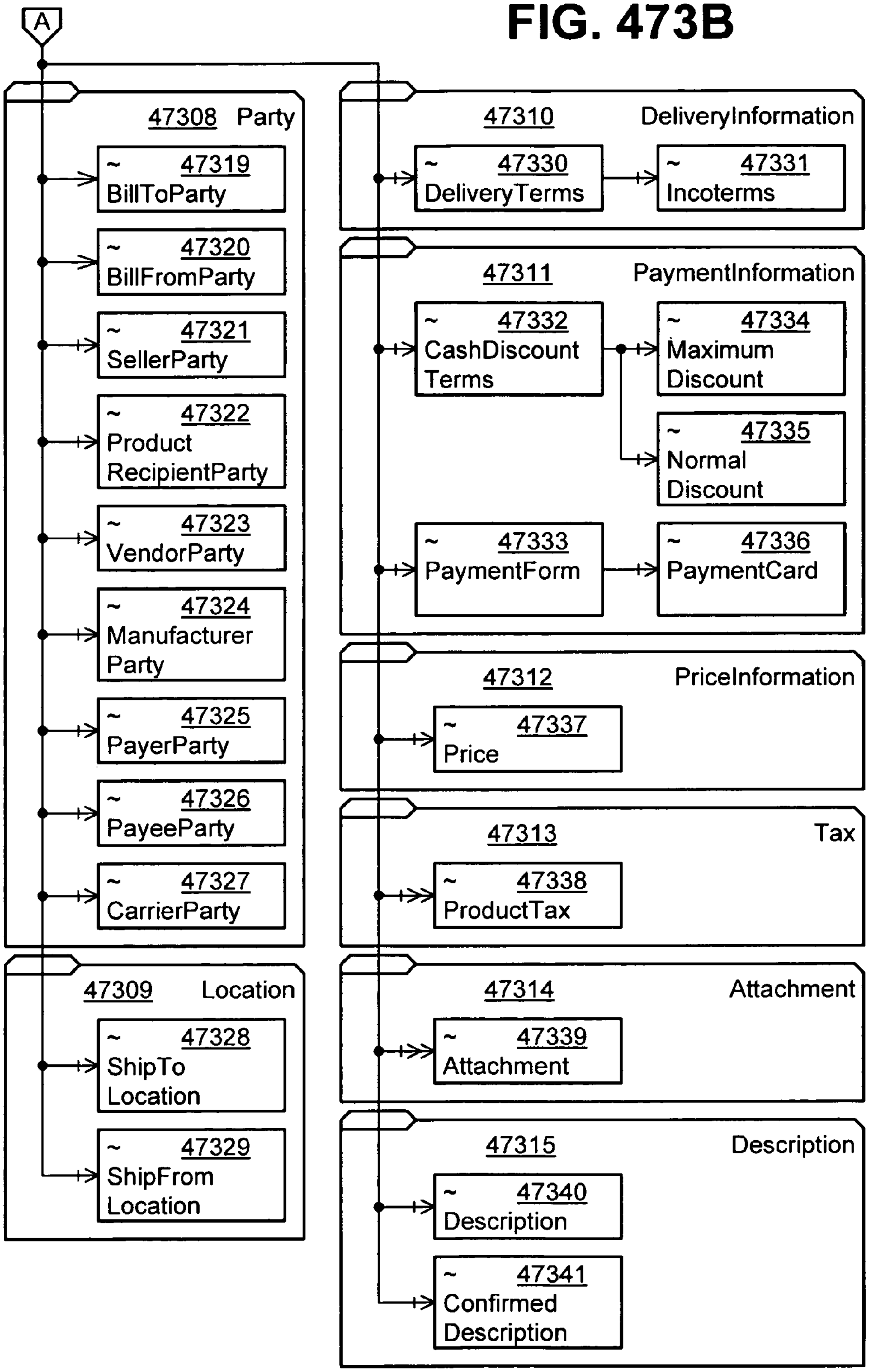
Figure 473C:
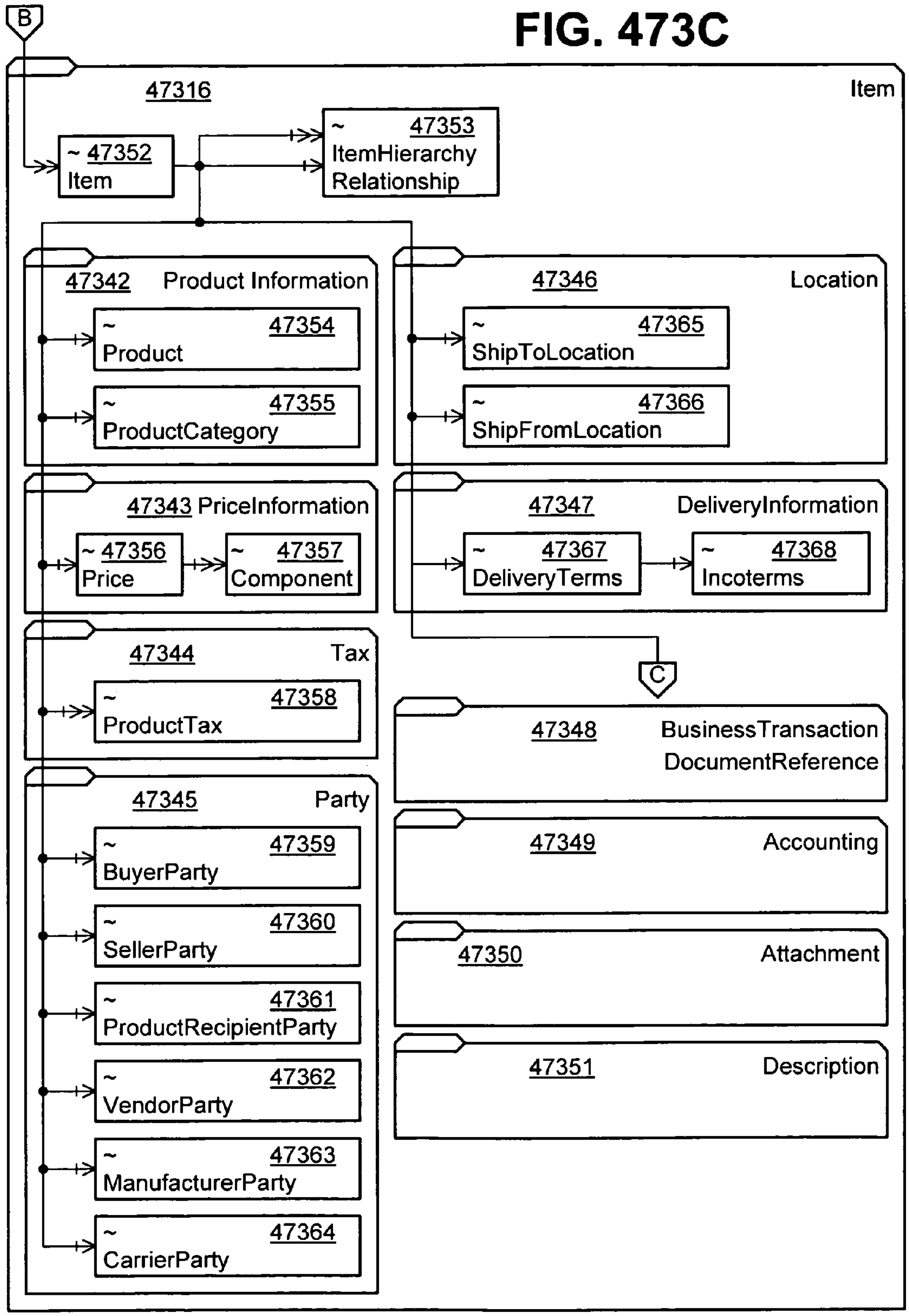
Figure 473D:
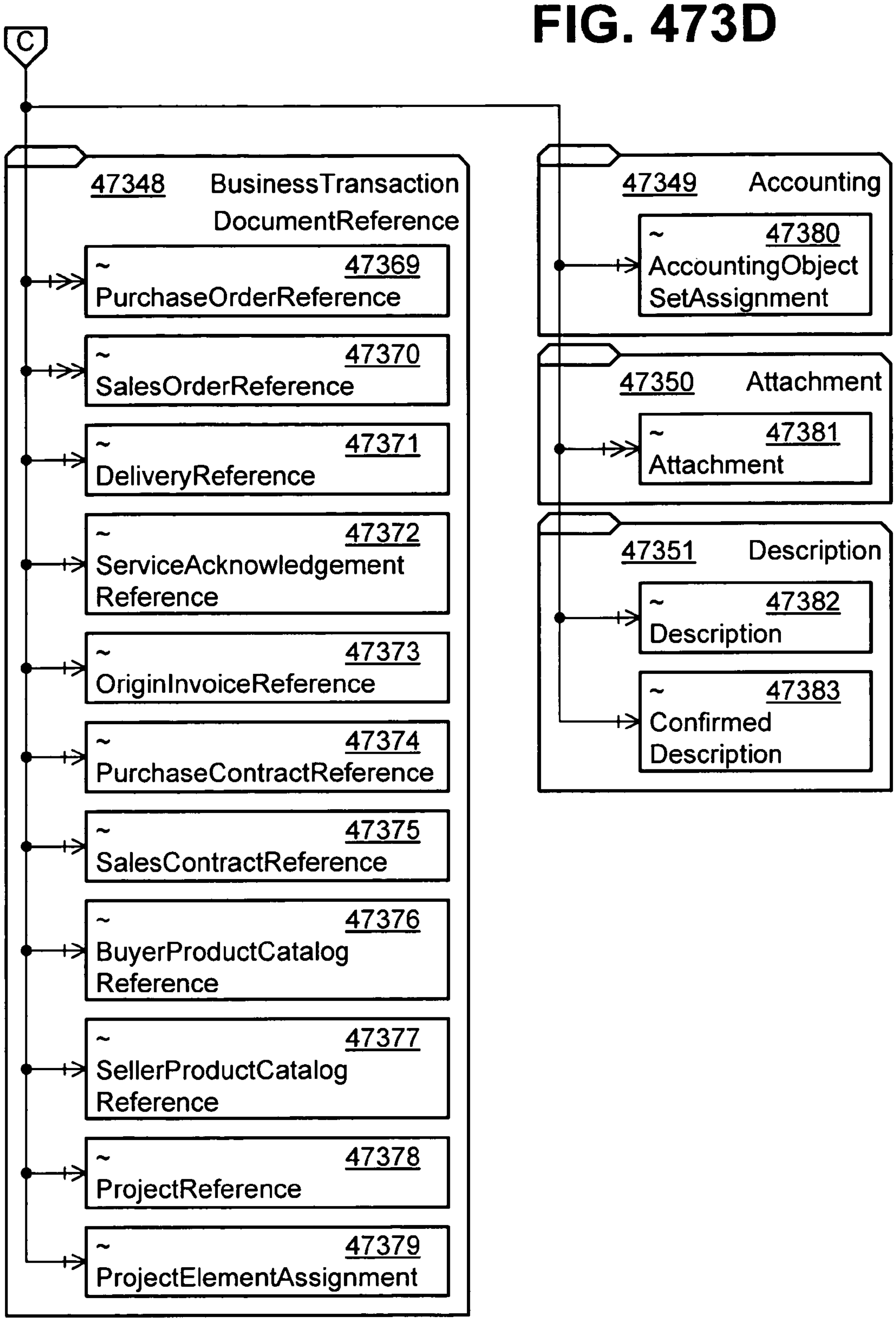
Figure 474:
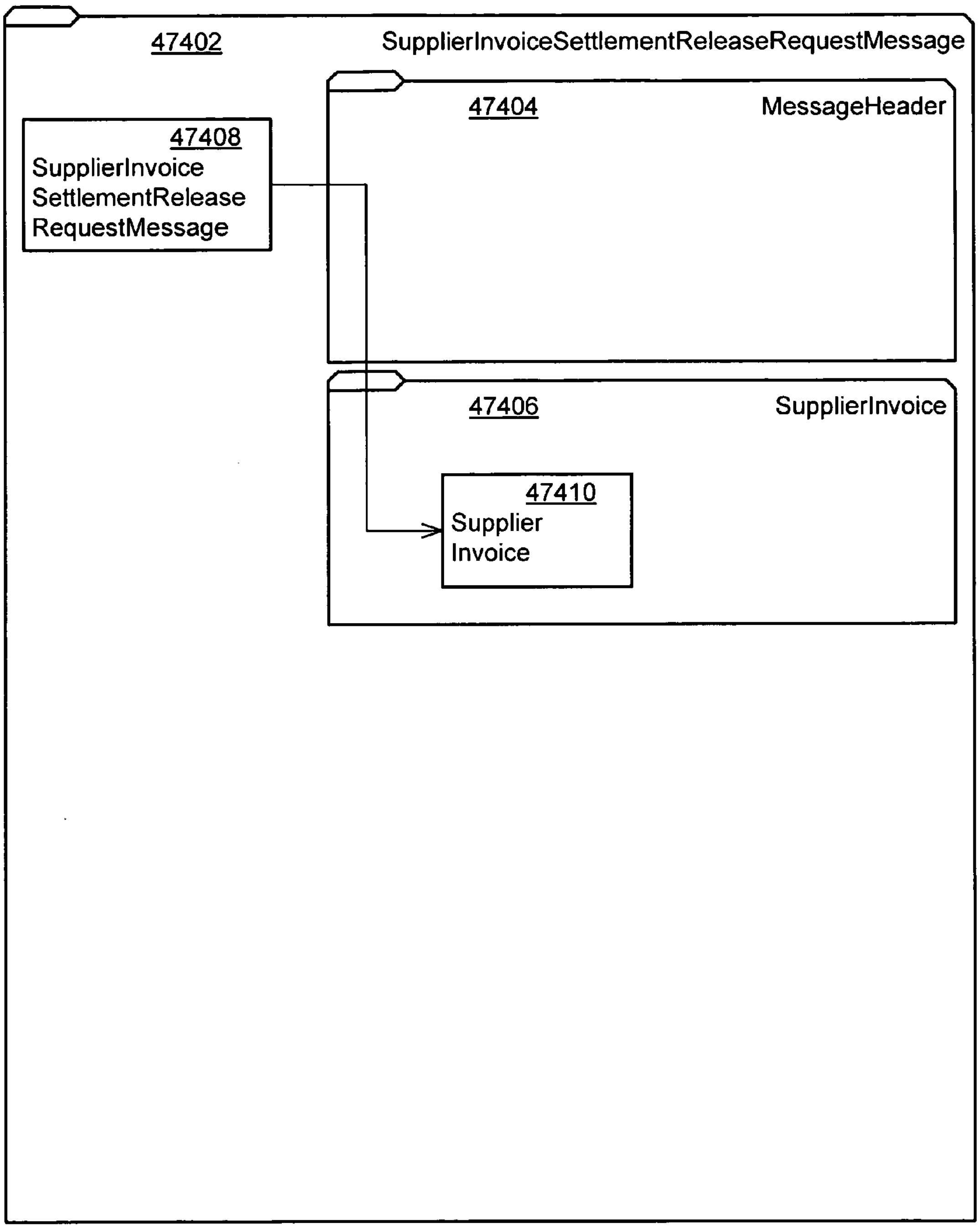
Figure 475:
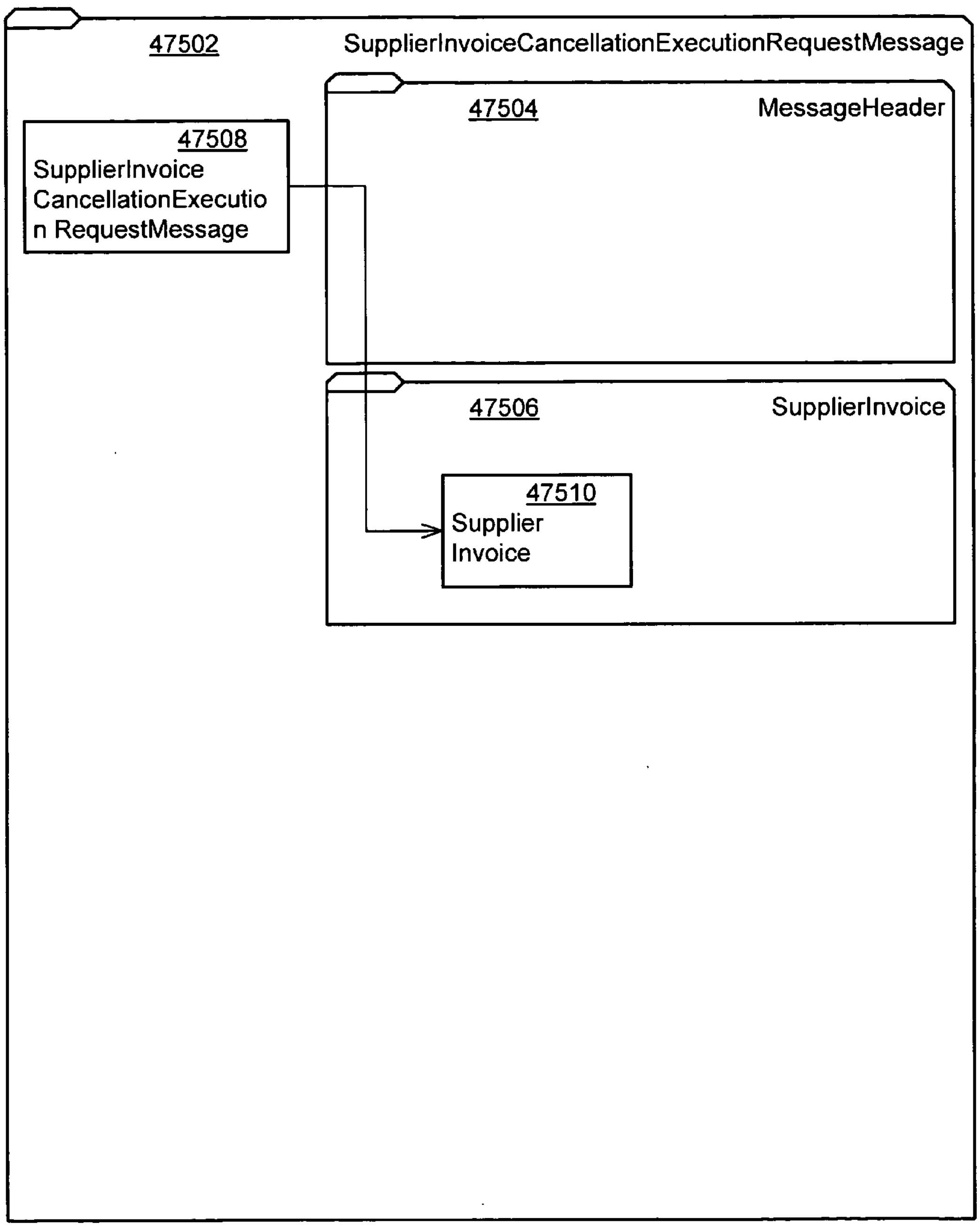
Figure 476A:
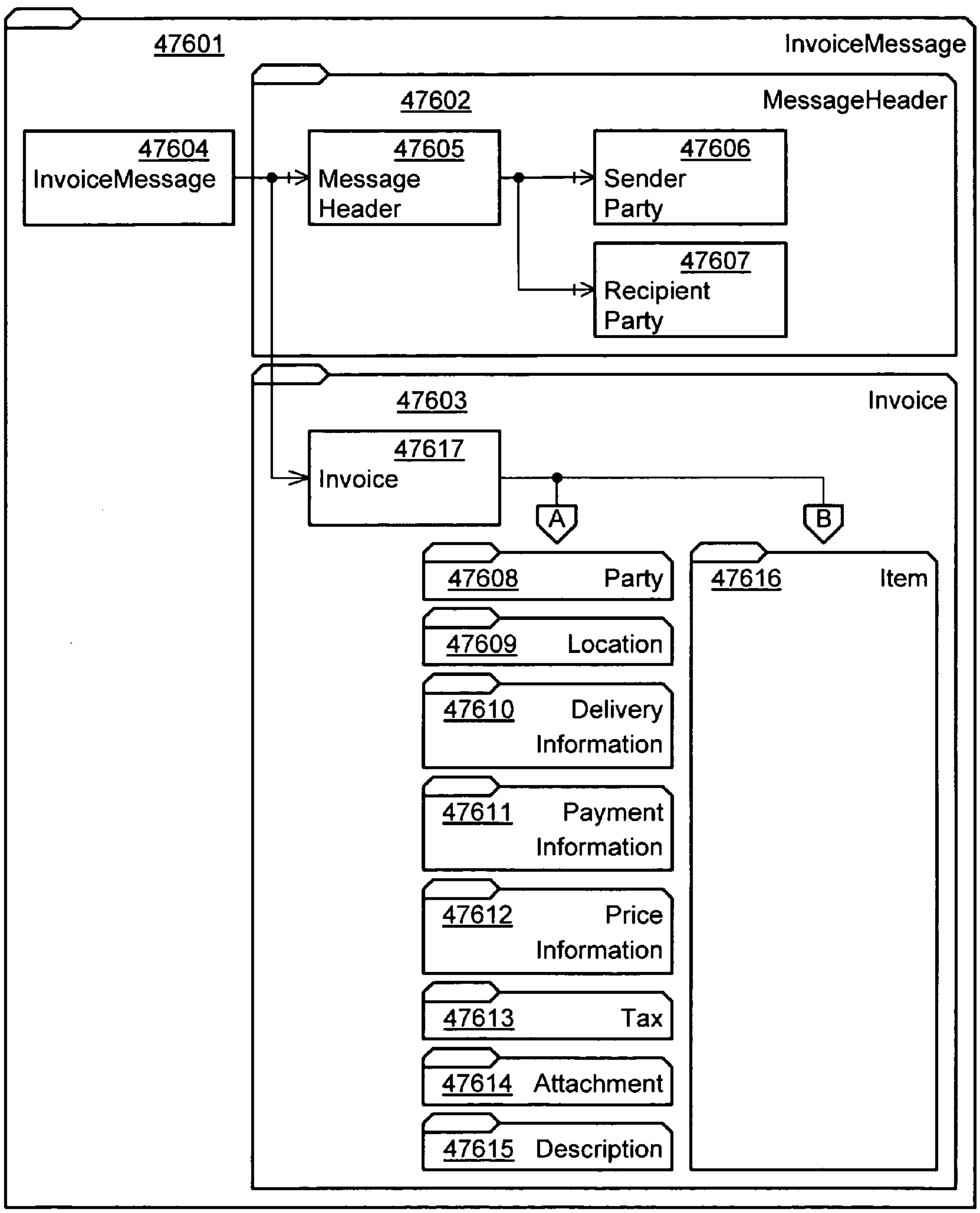
Figure 476B:
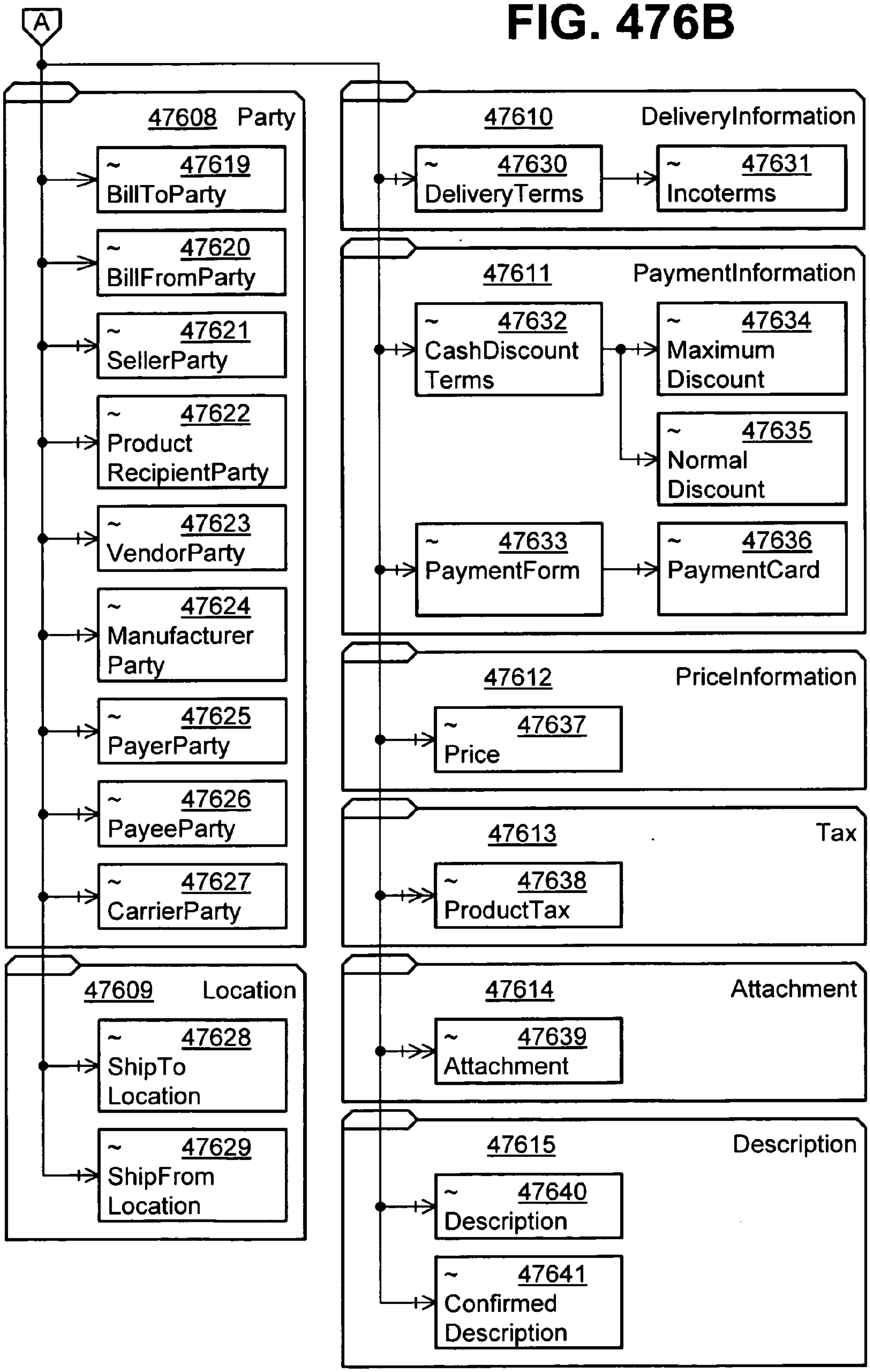
Figure 476C:
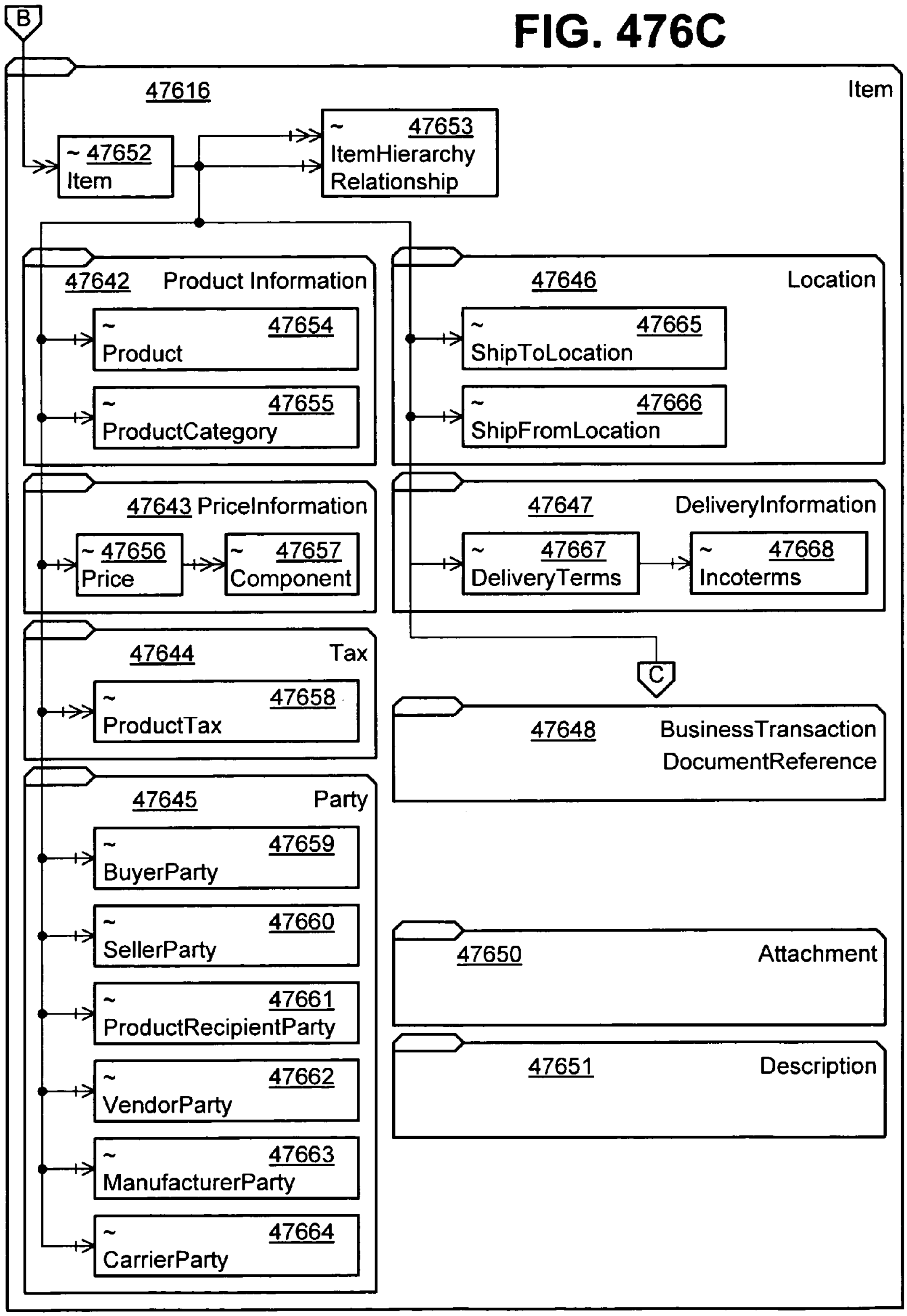
Figure 476D:
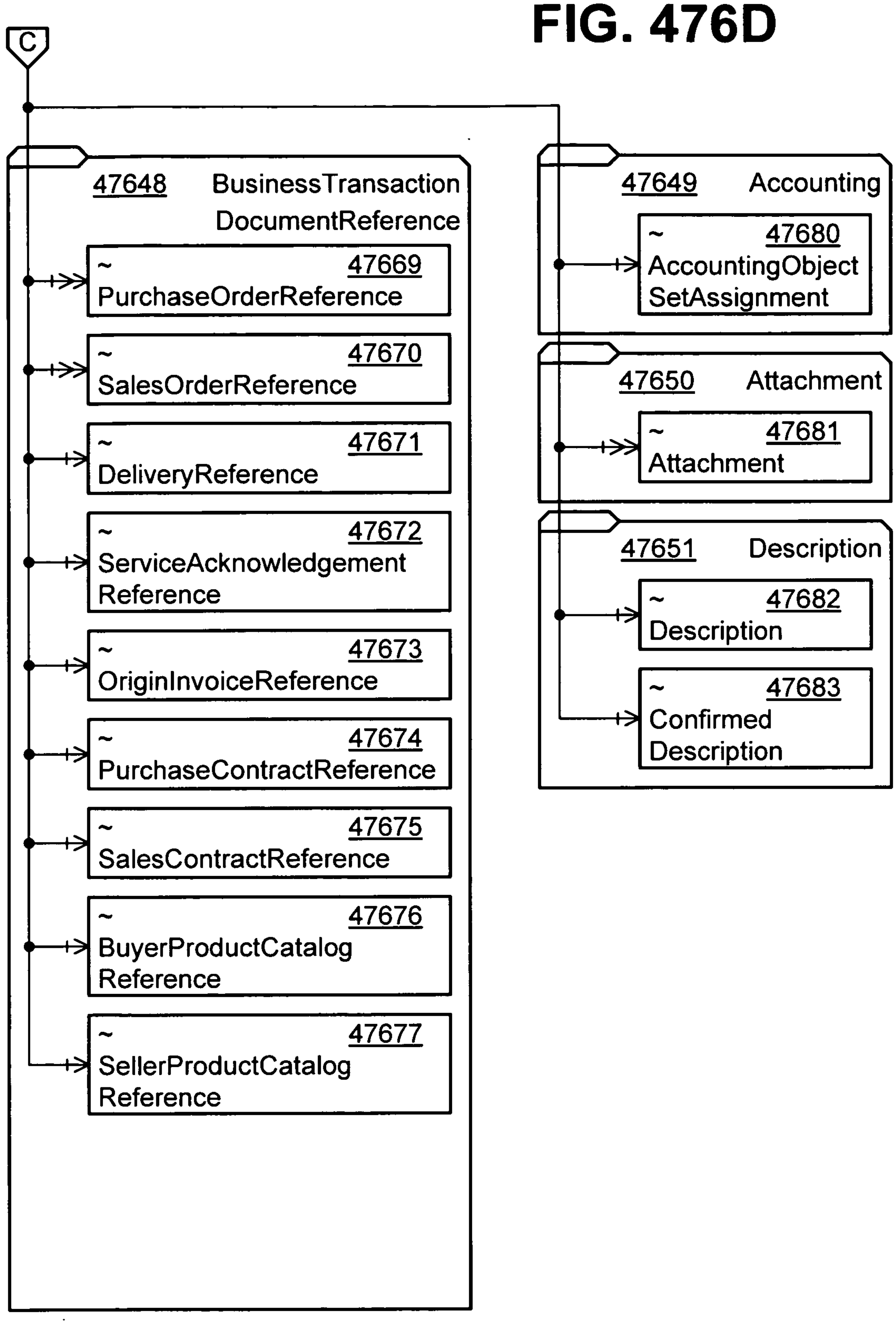
Figure 478:
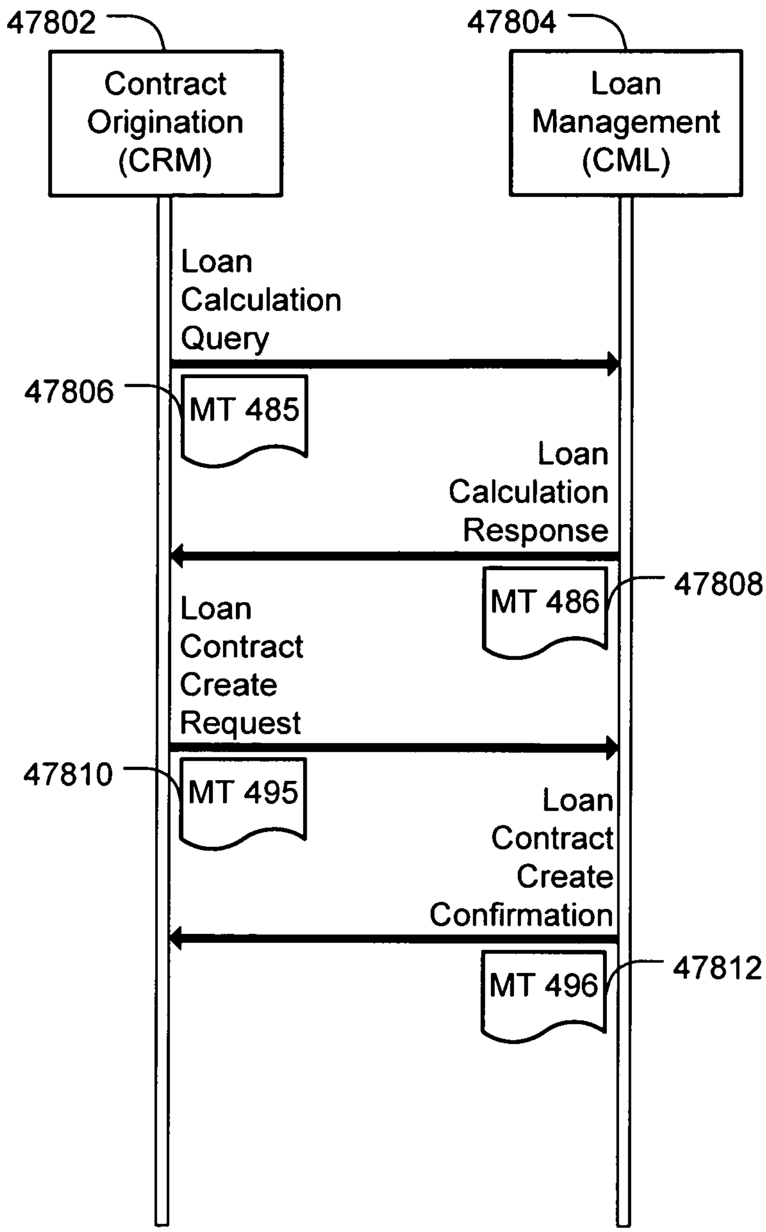
Figure 479:
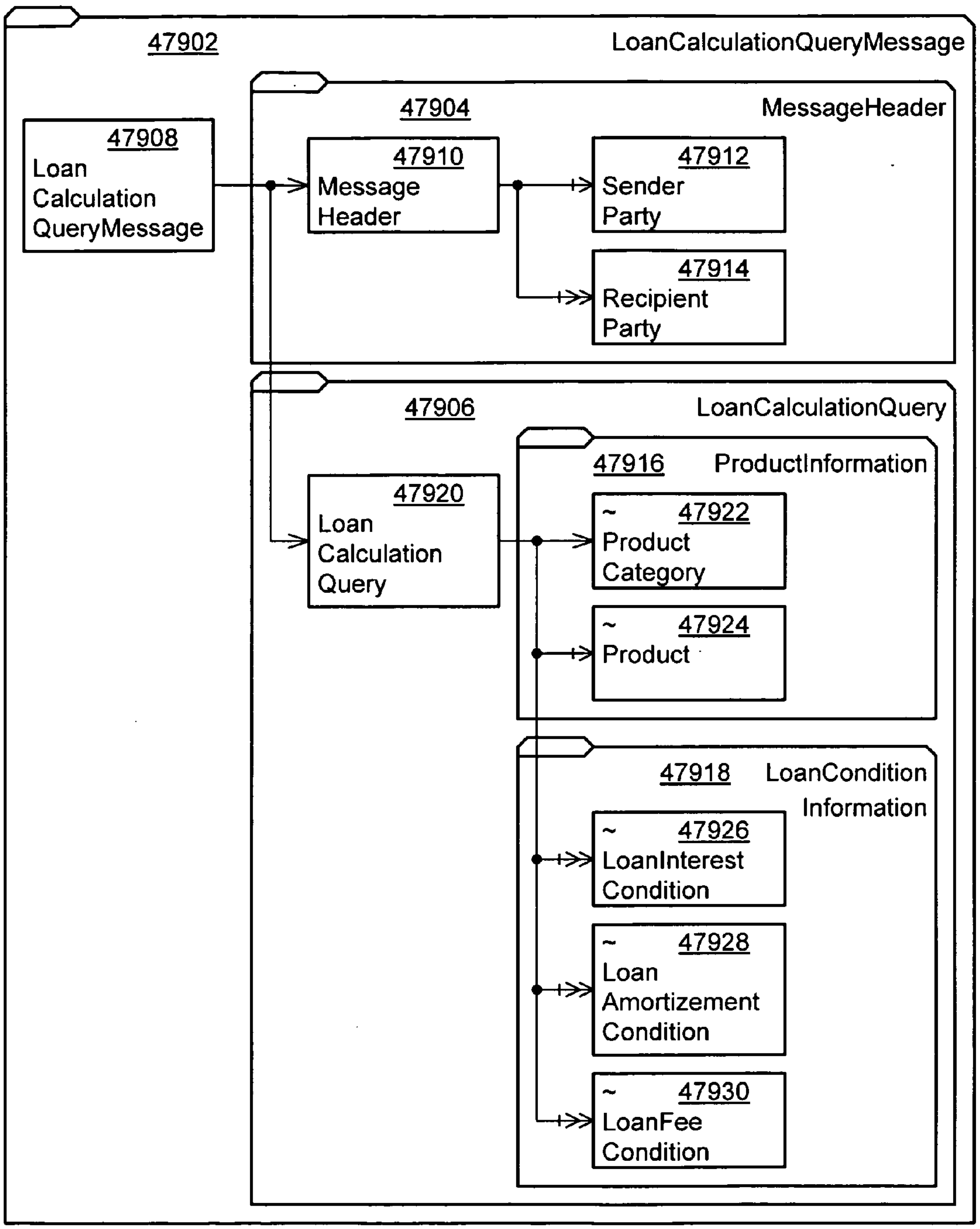
Figure 480:
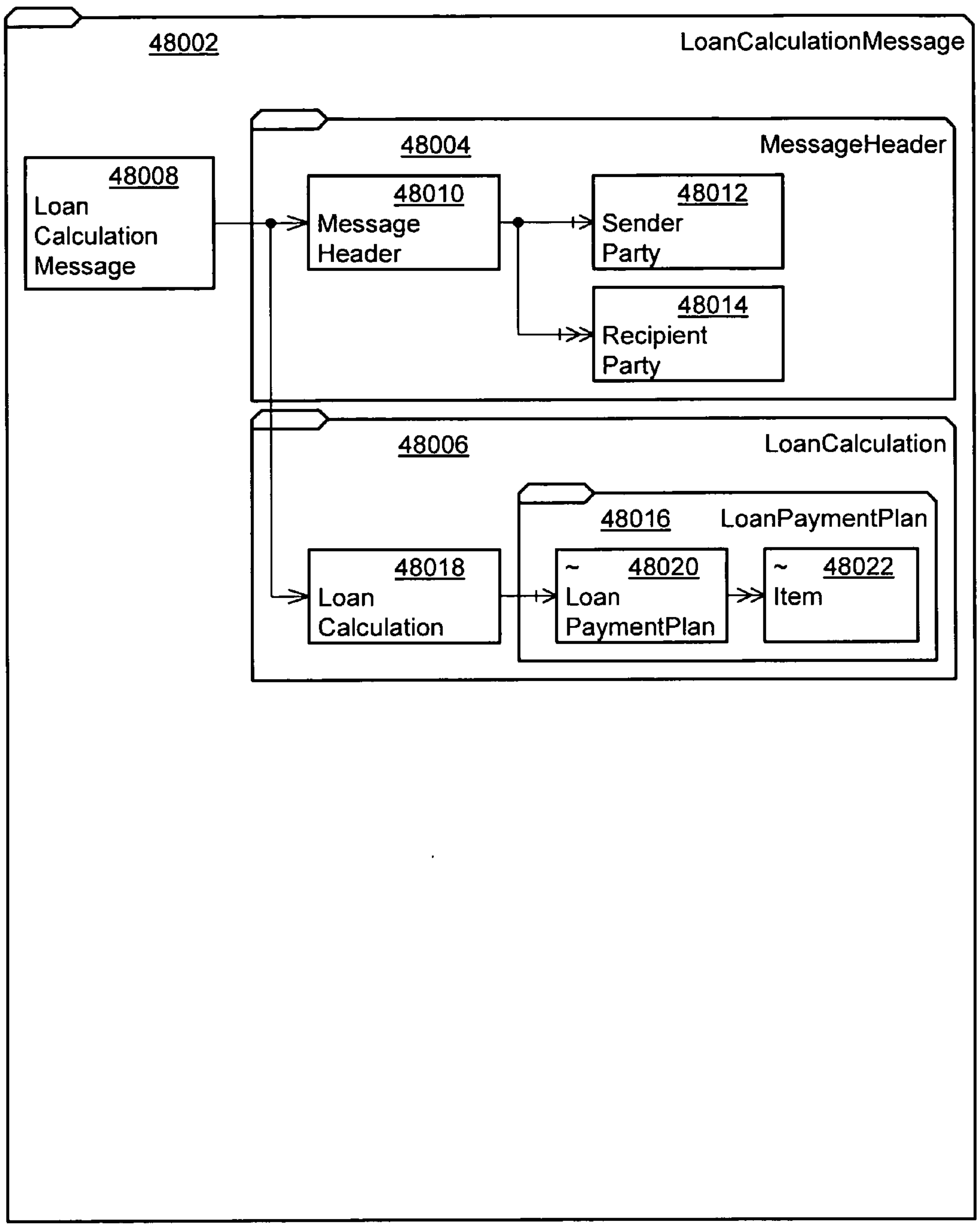
Figure 481A:
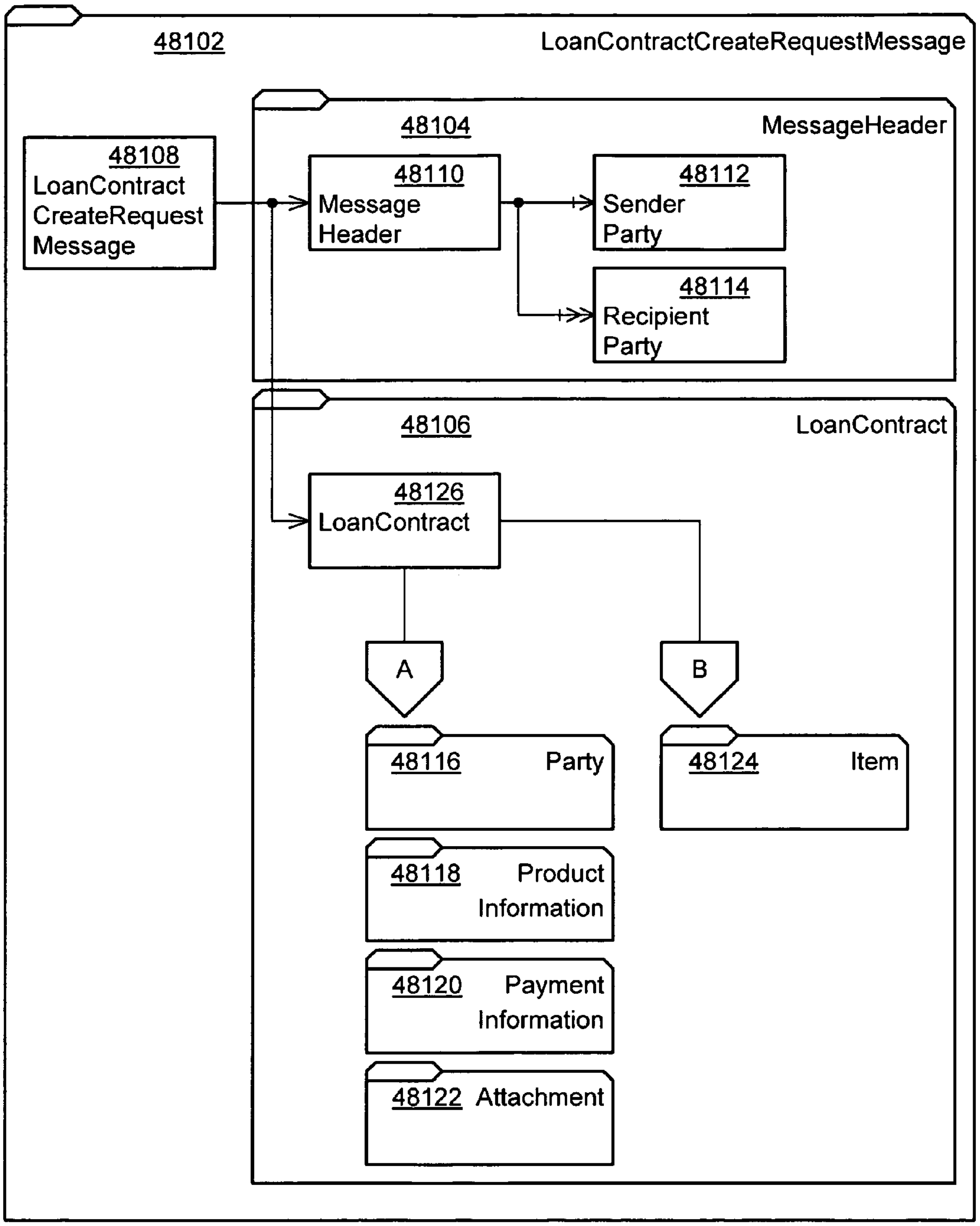
Figure 481B:
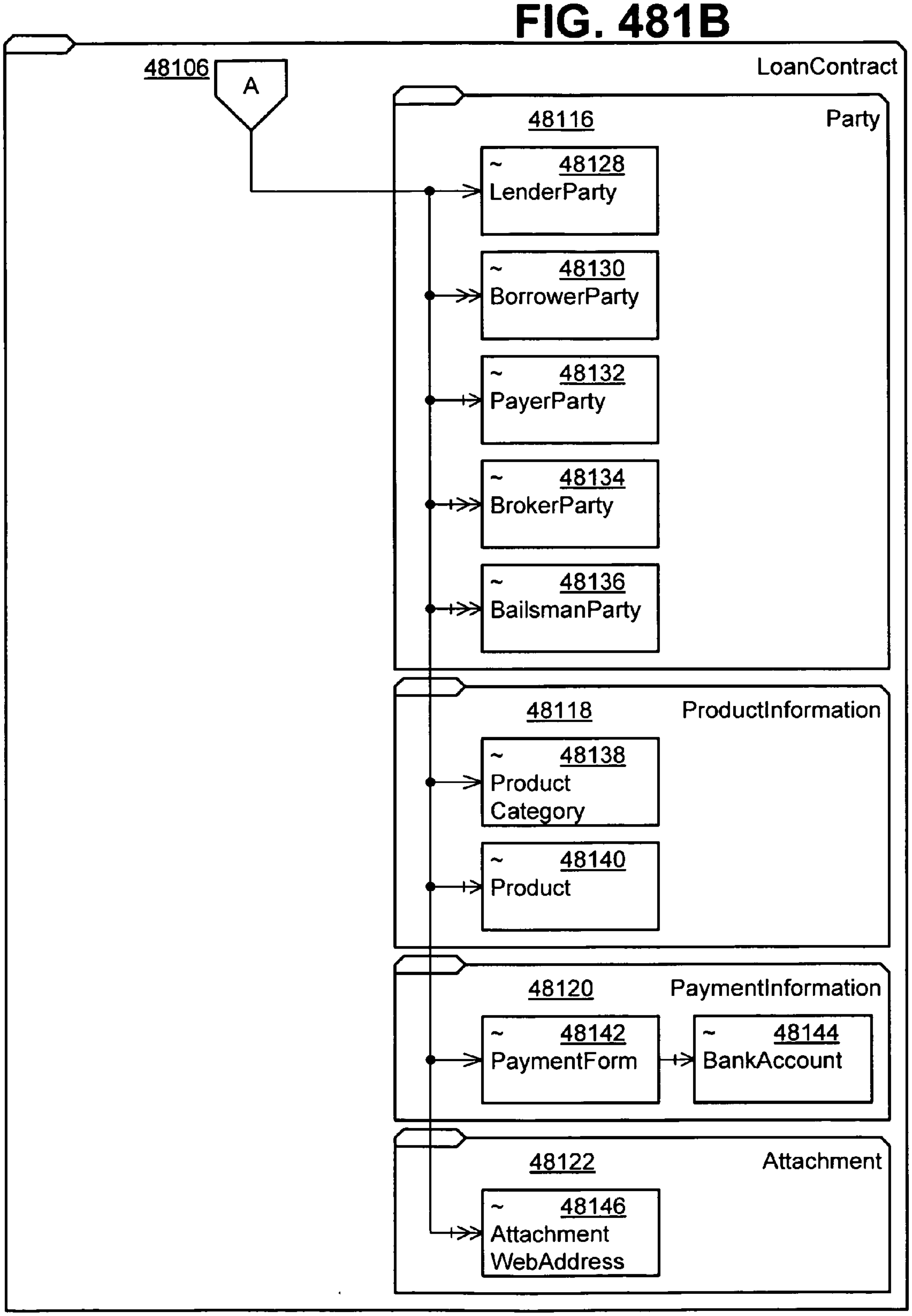
Figure 481C:
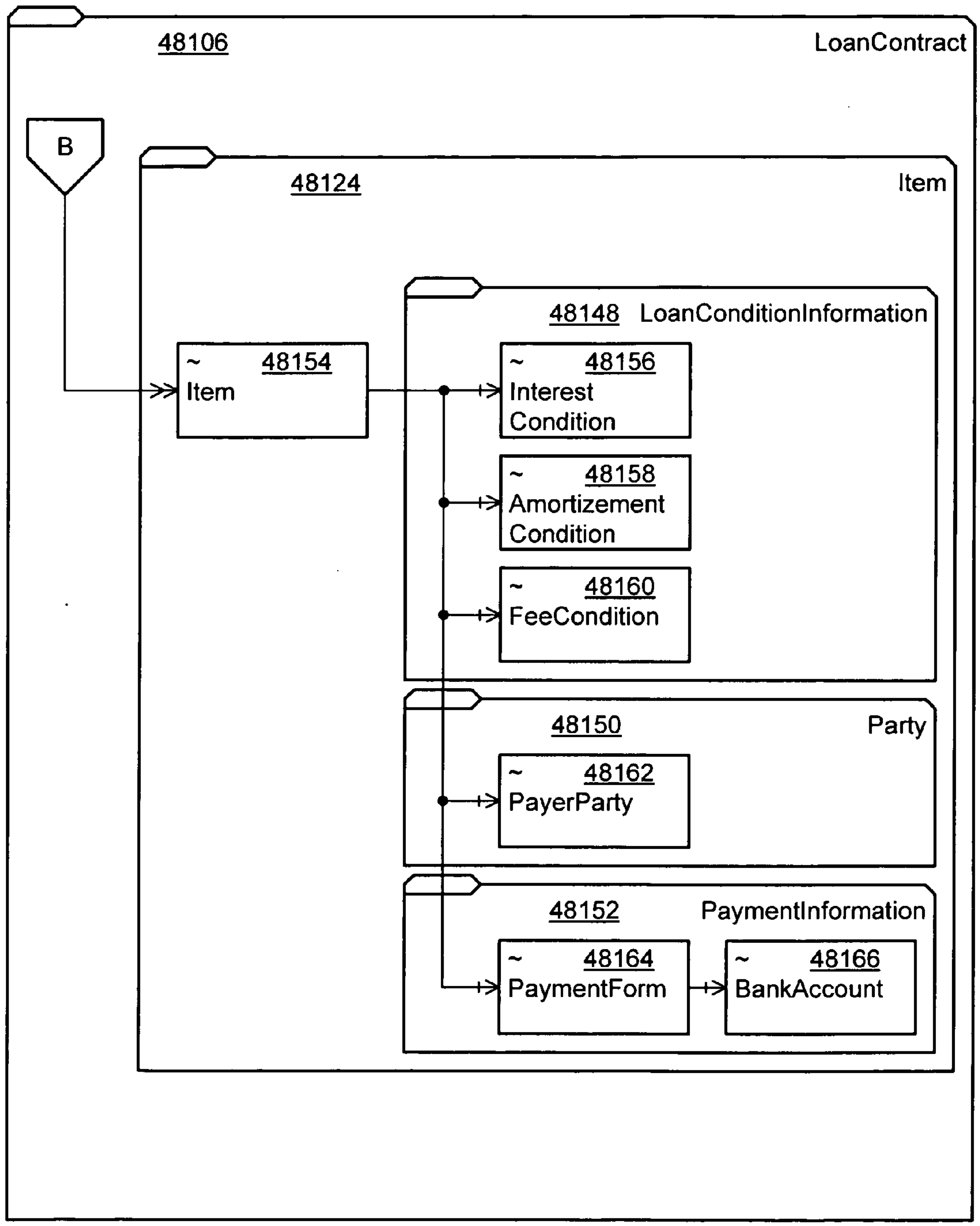
Figure 482:
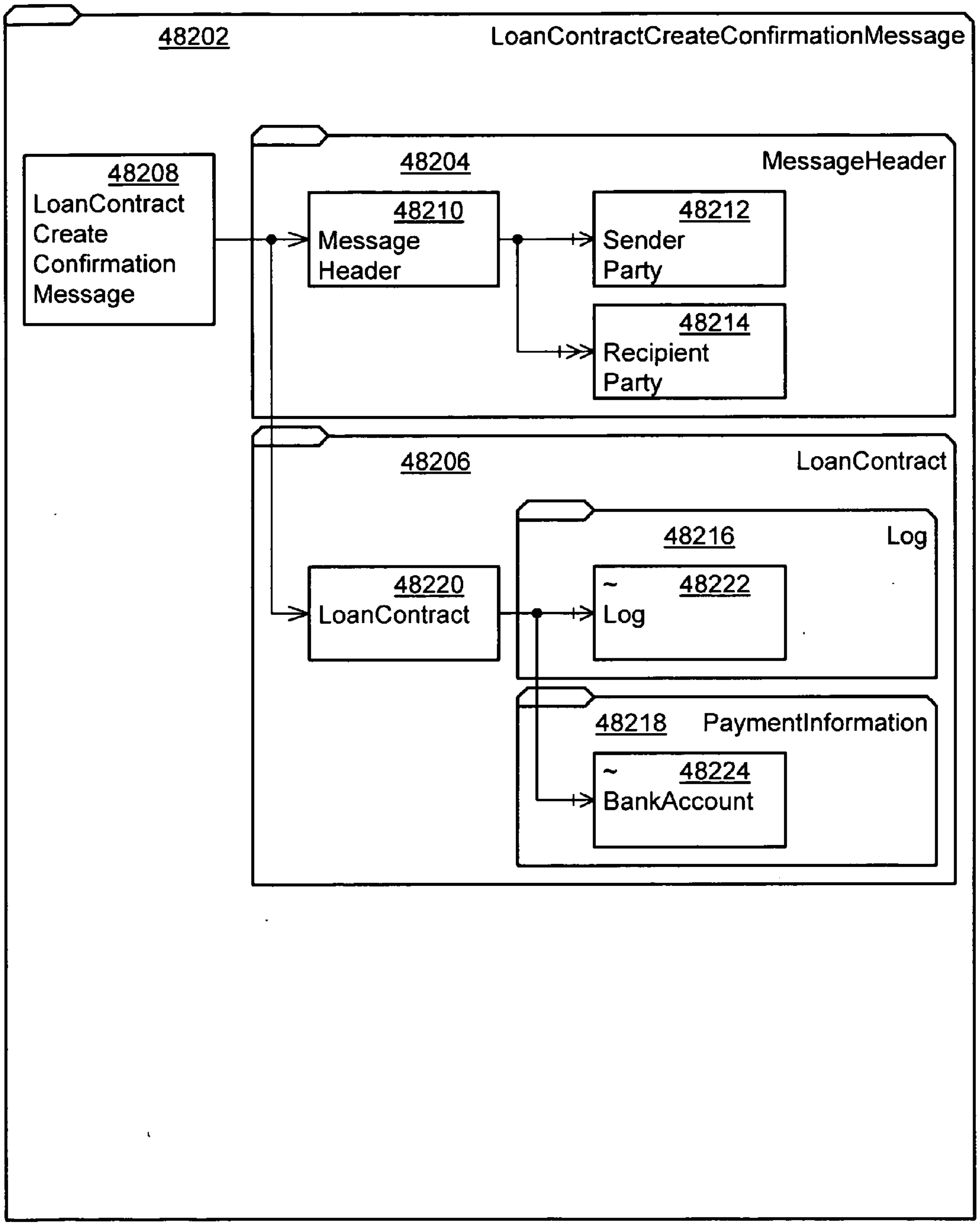
Figure 487:
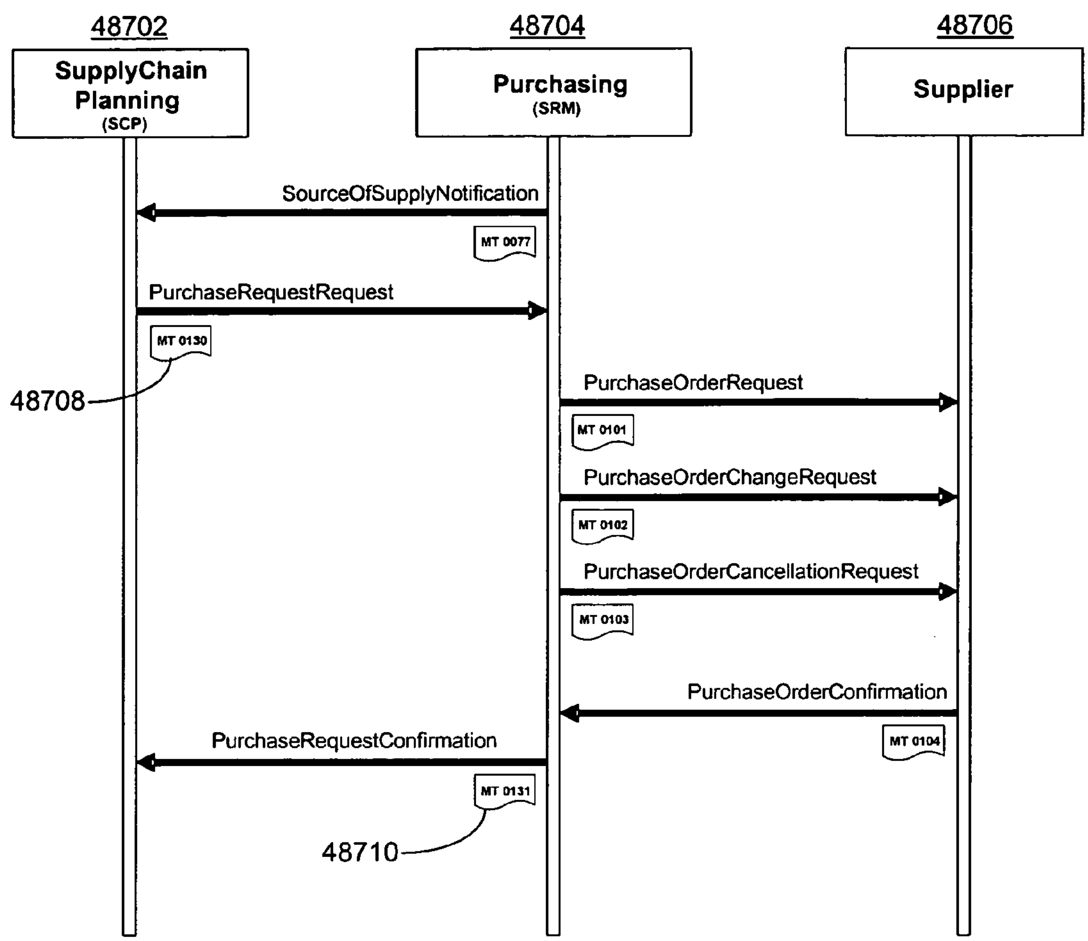
Figure 488A:
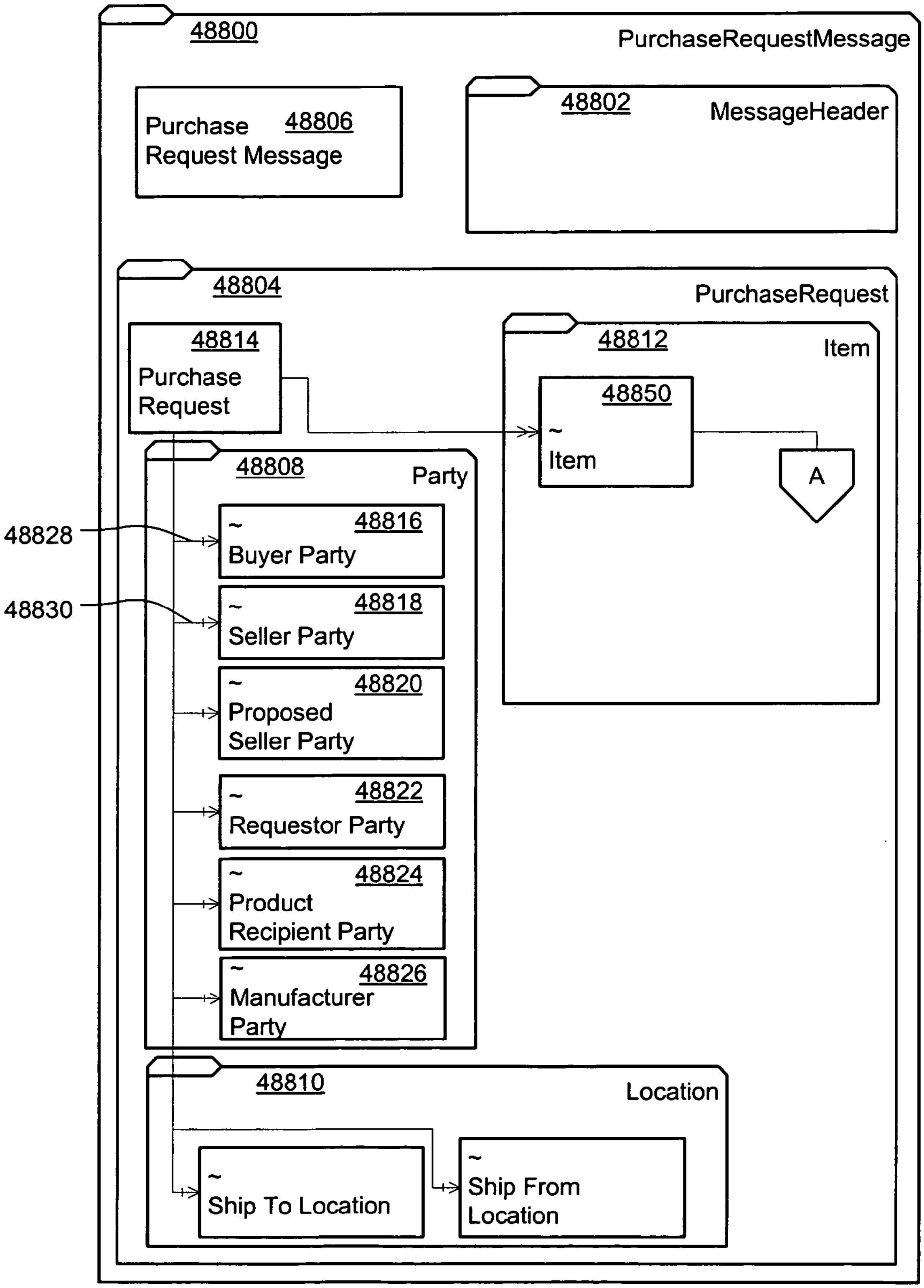
Figure 488B:
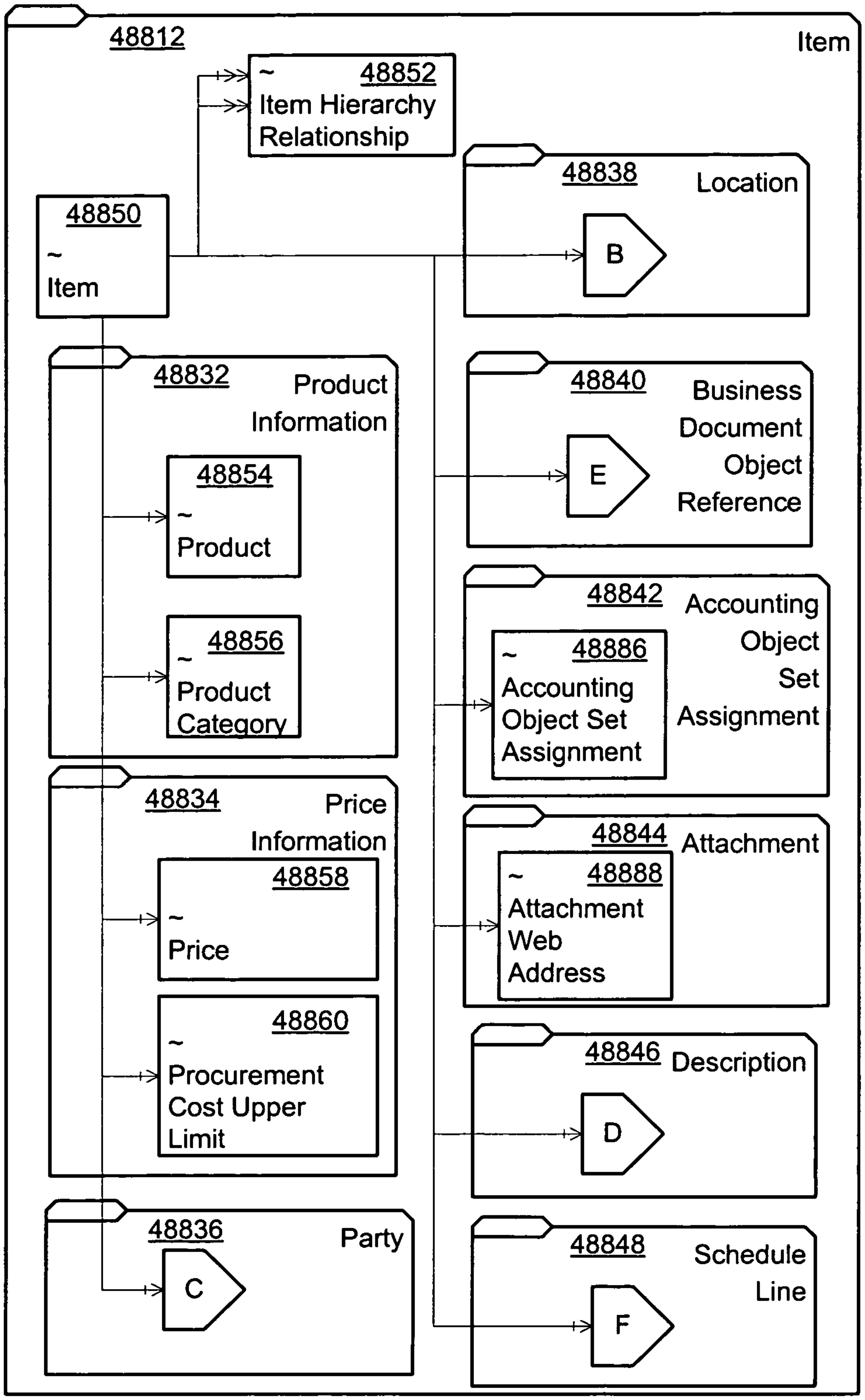
Figure 488C:
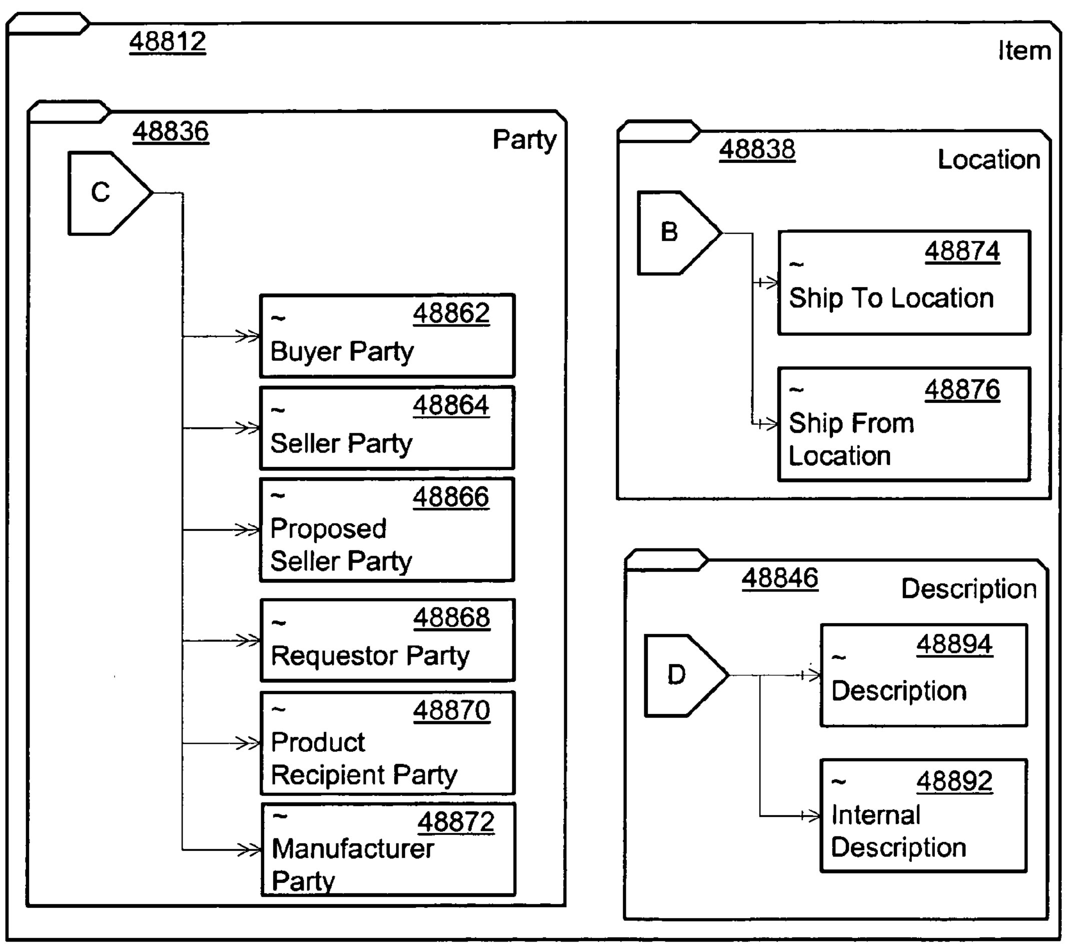
Figure 488D:
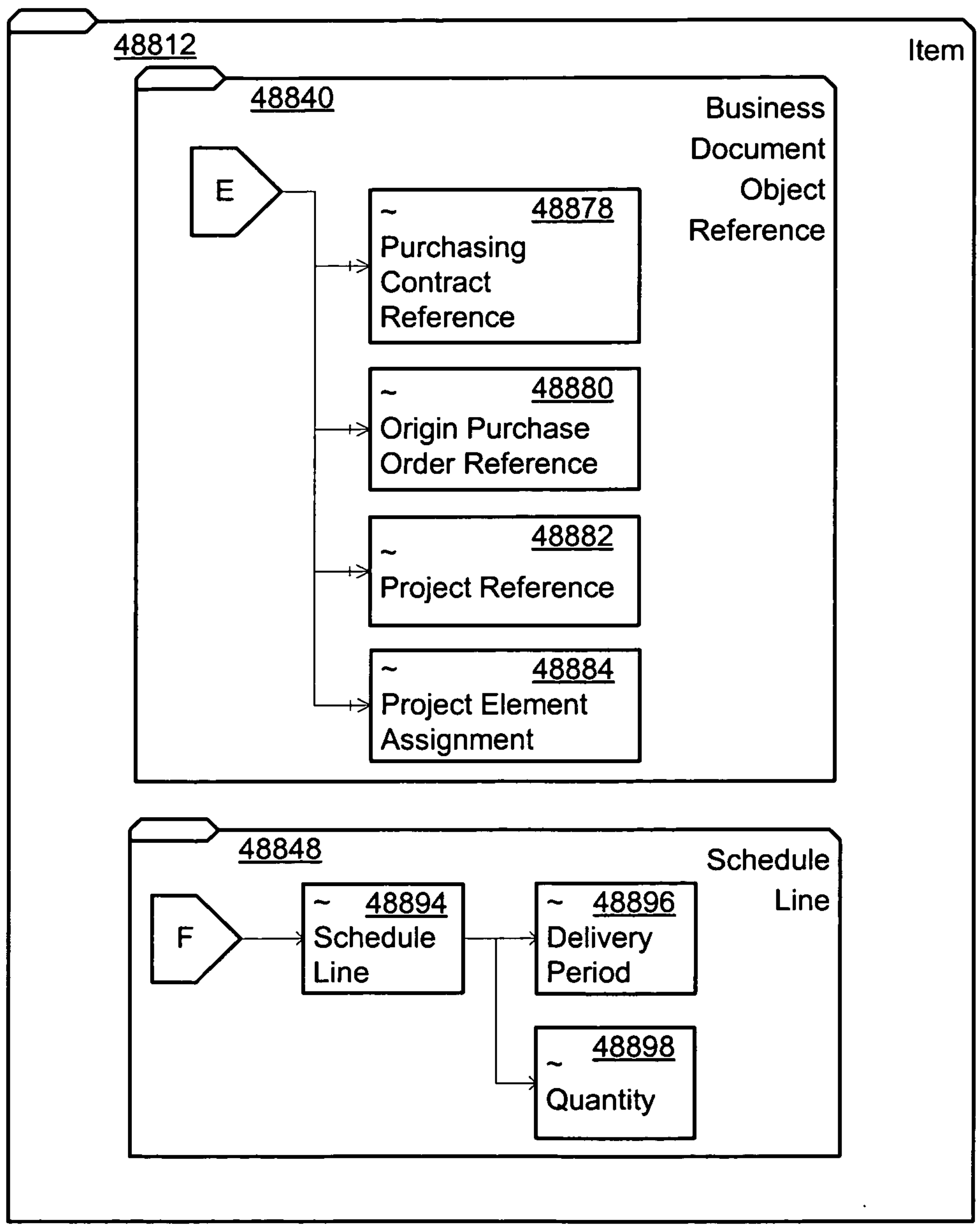
Figure 489:
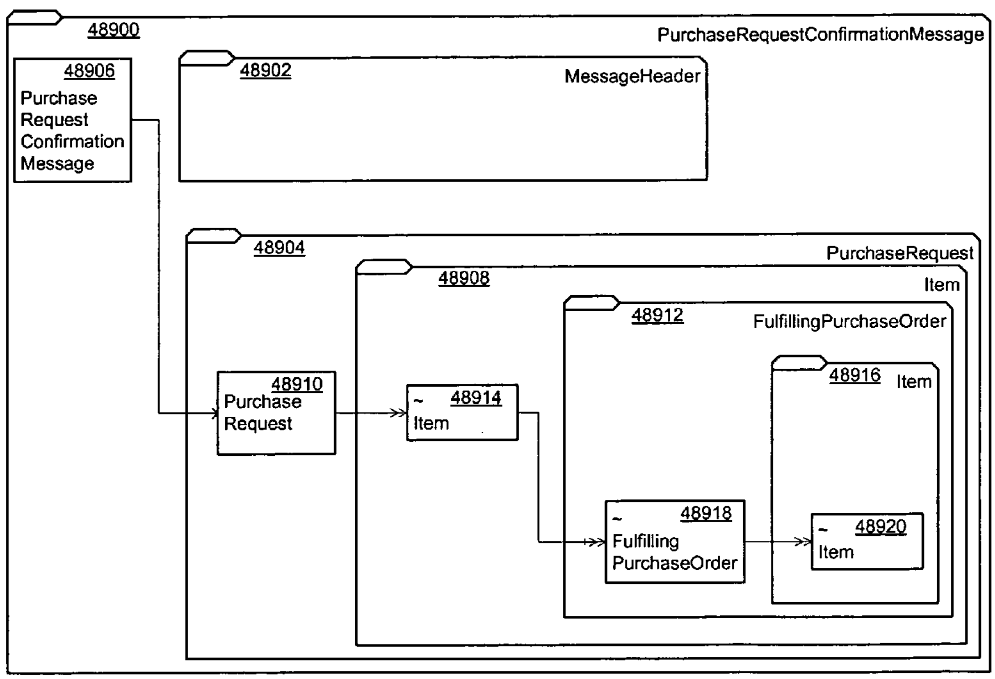
Figure 492:
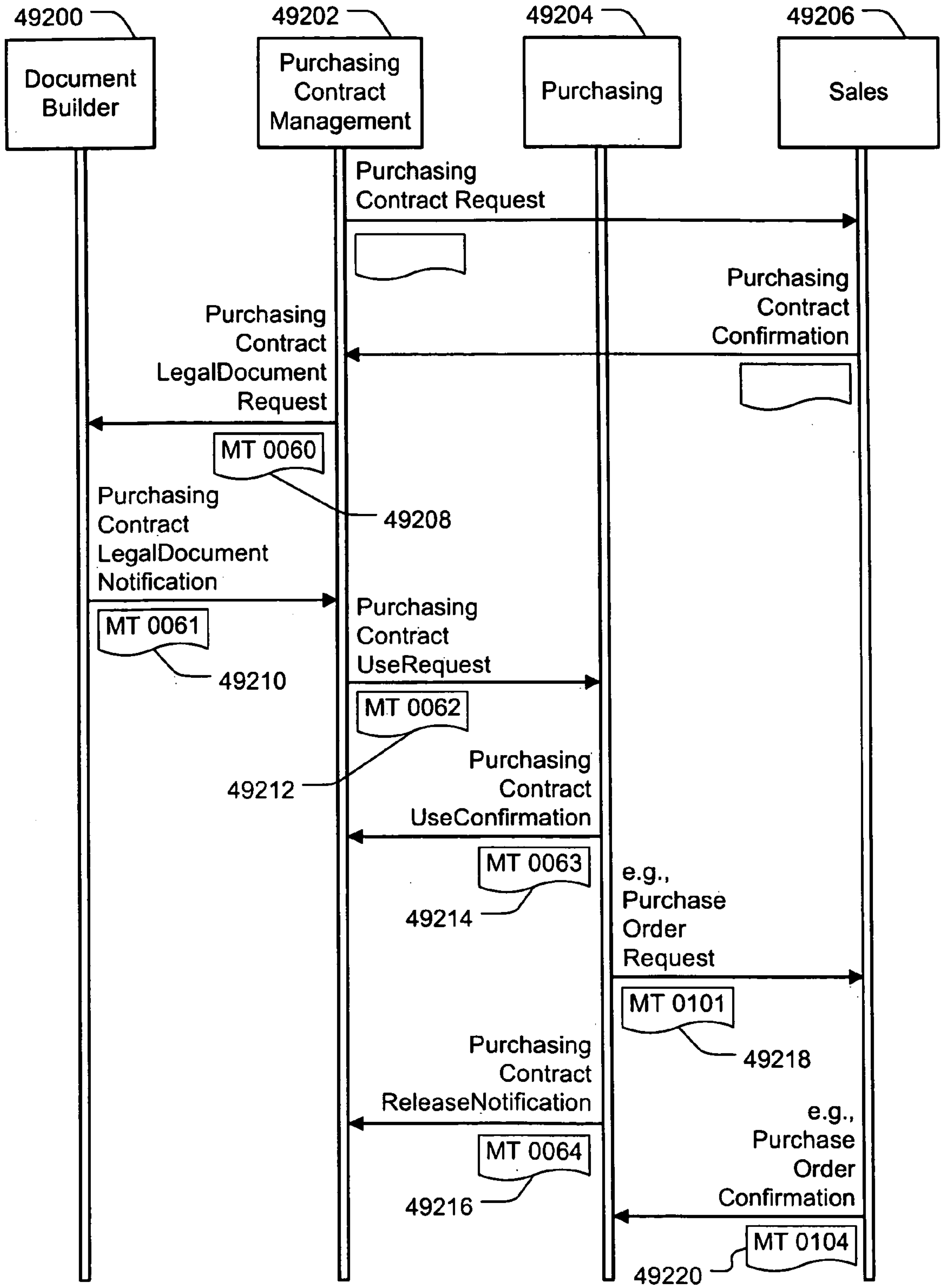
Figure 493A:
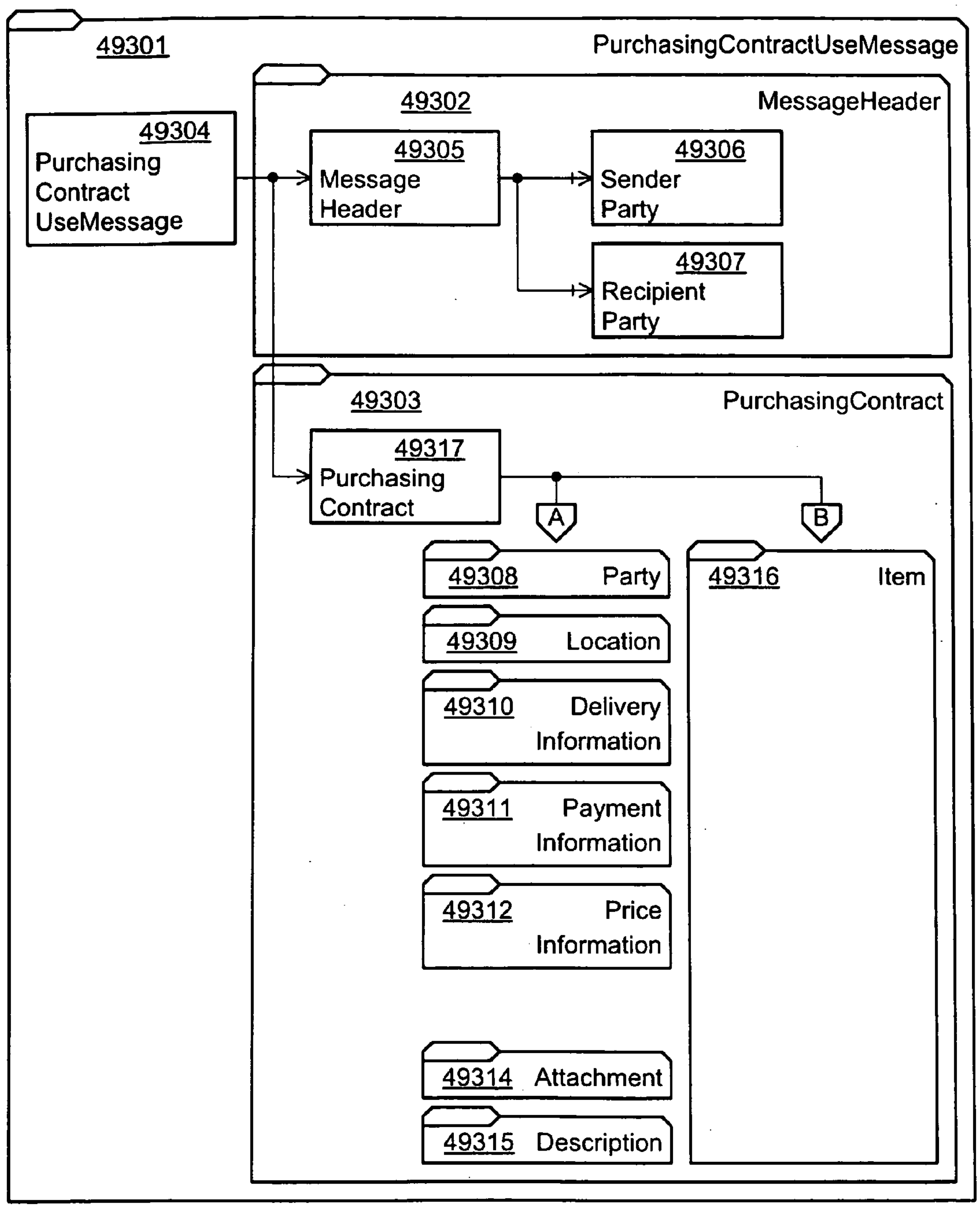
Figure 493B:
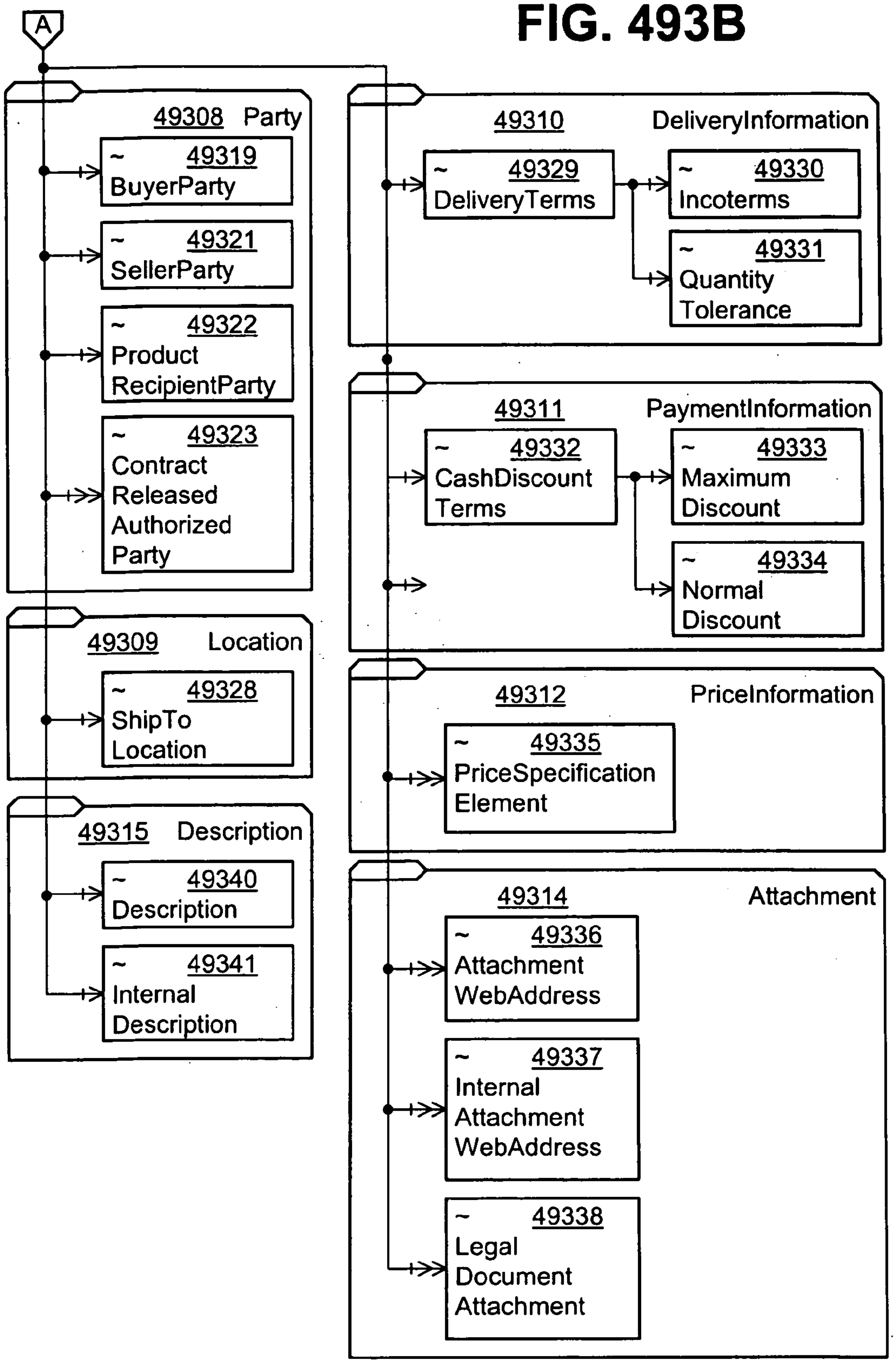
Figure 493C:
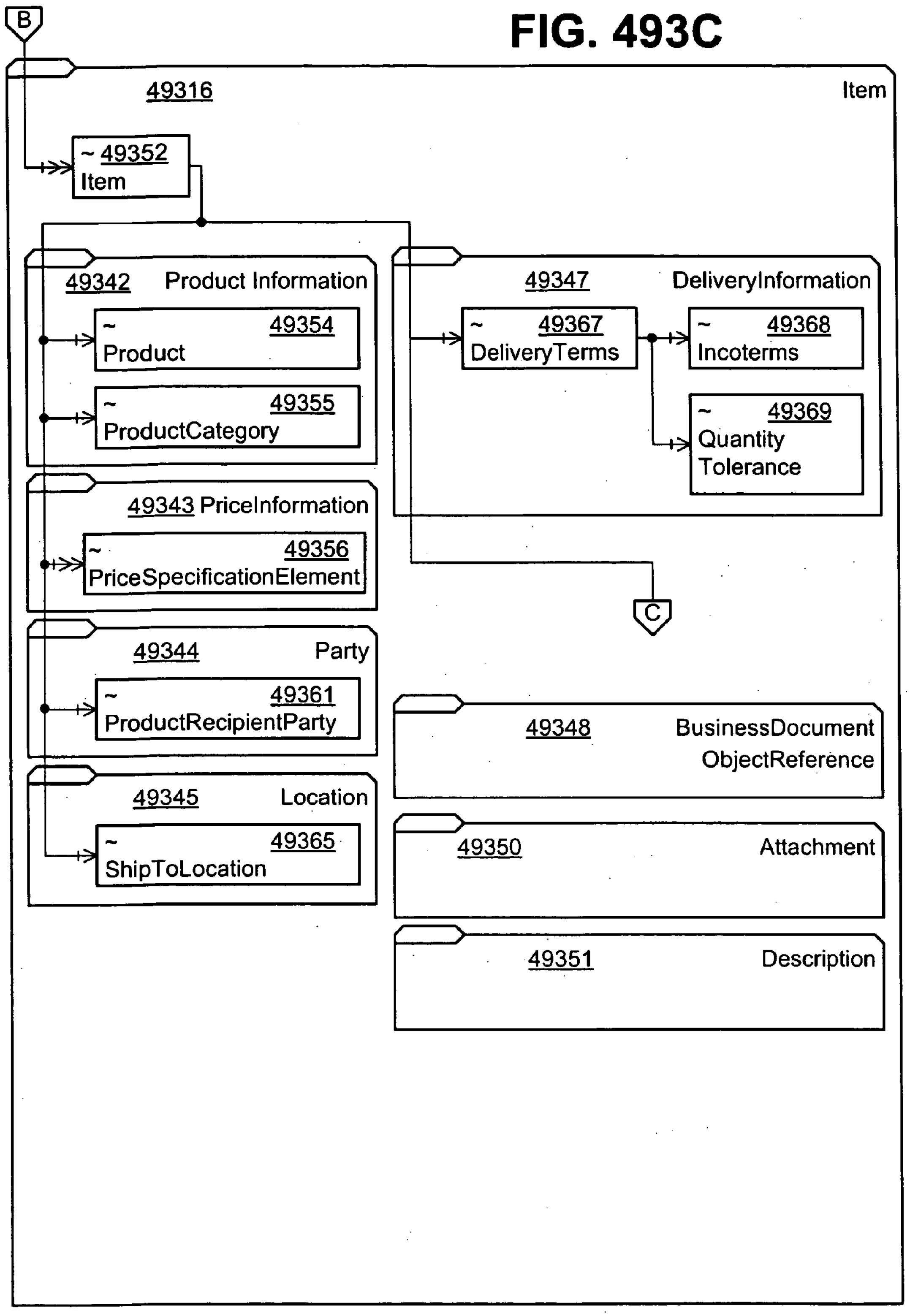
Figure 493D:
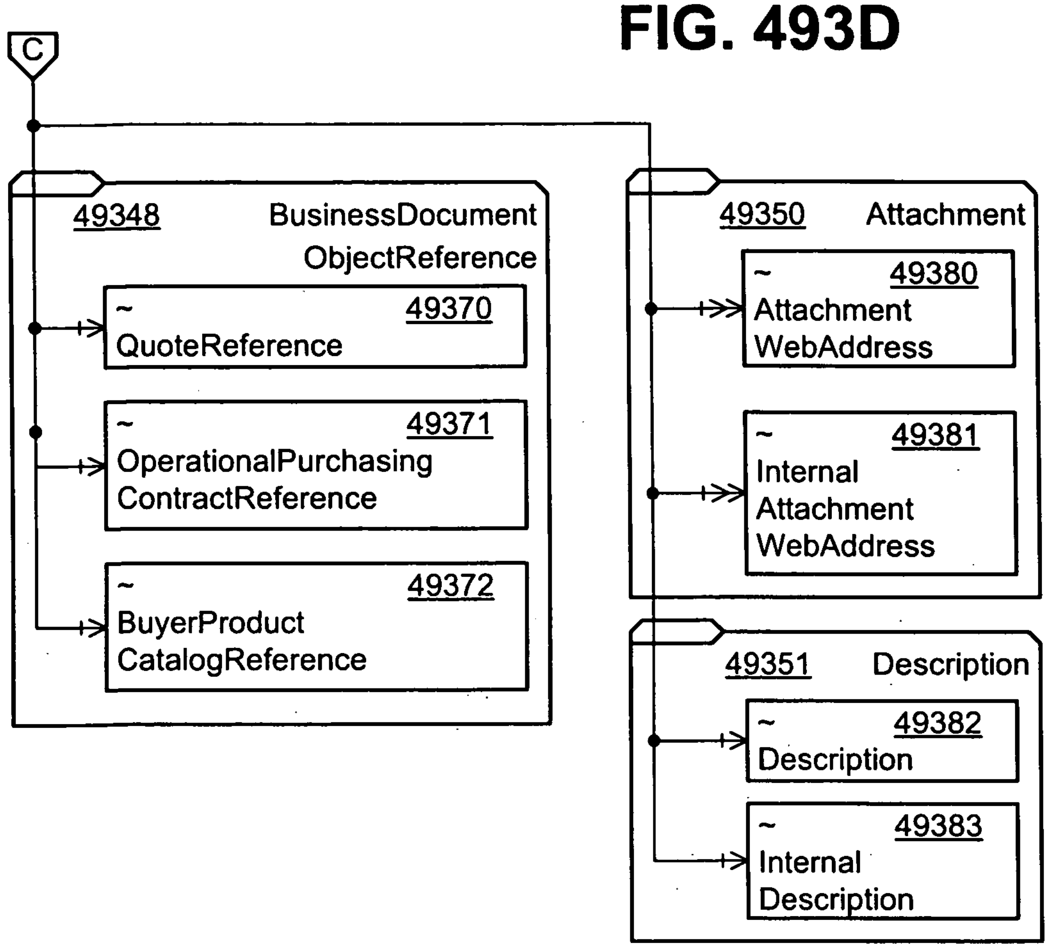
Figure 494:
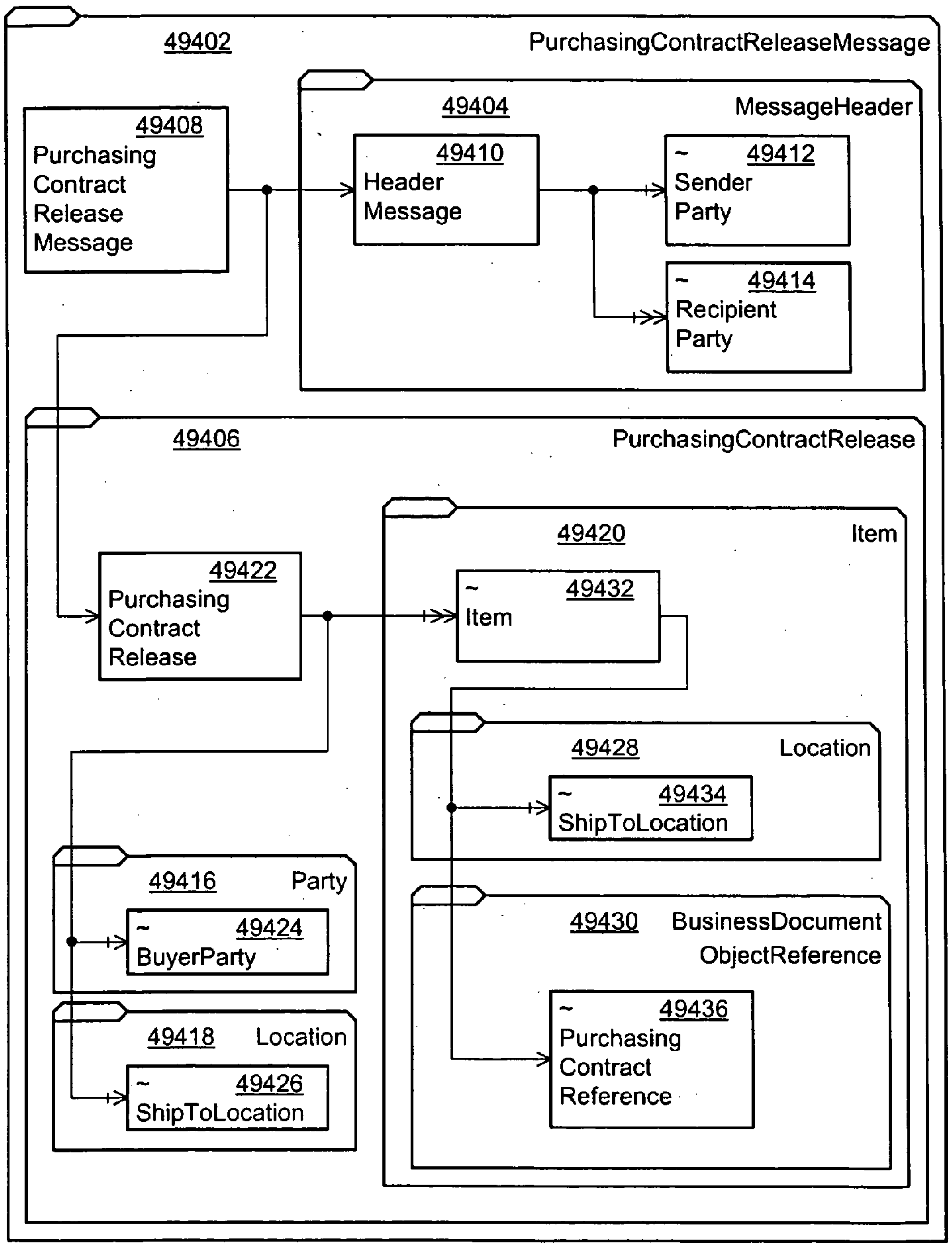
Figure 497:
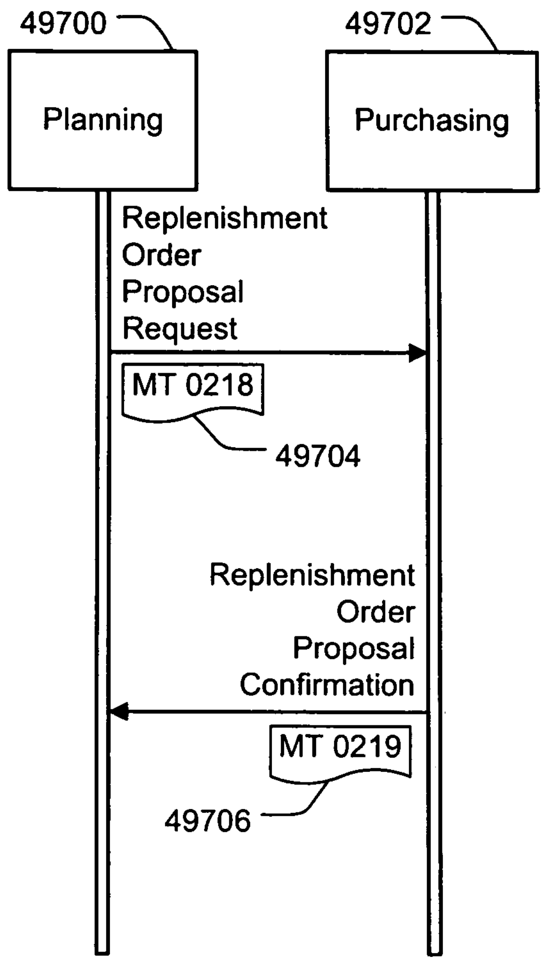
Figure 498A:
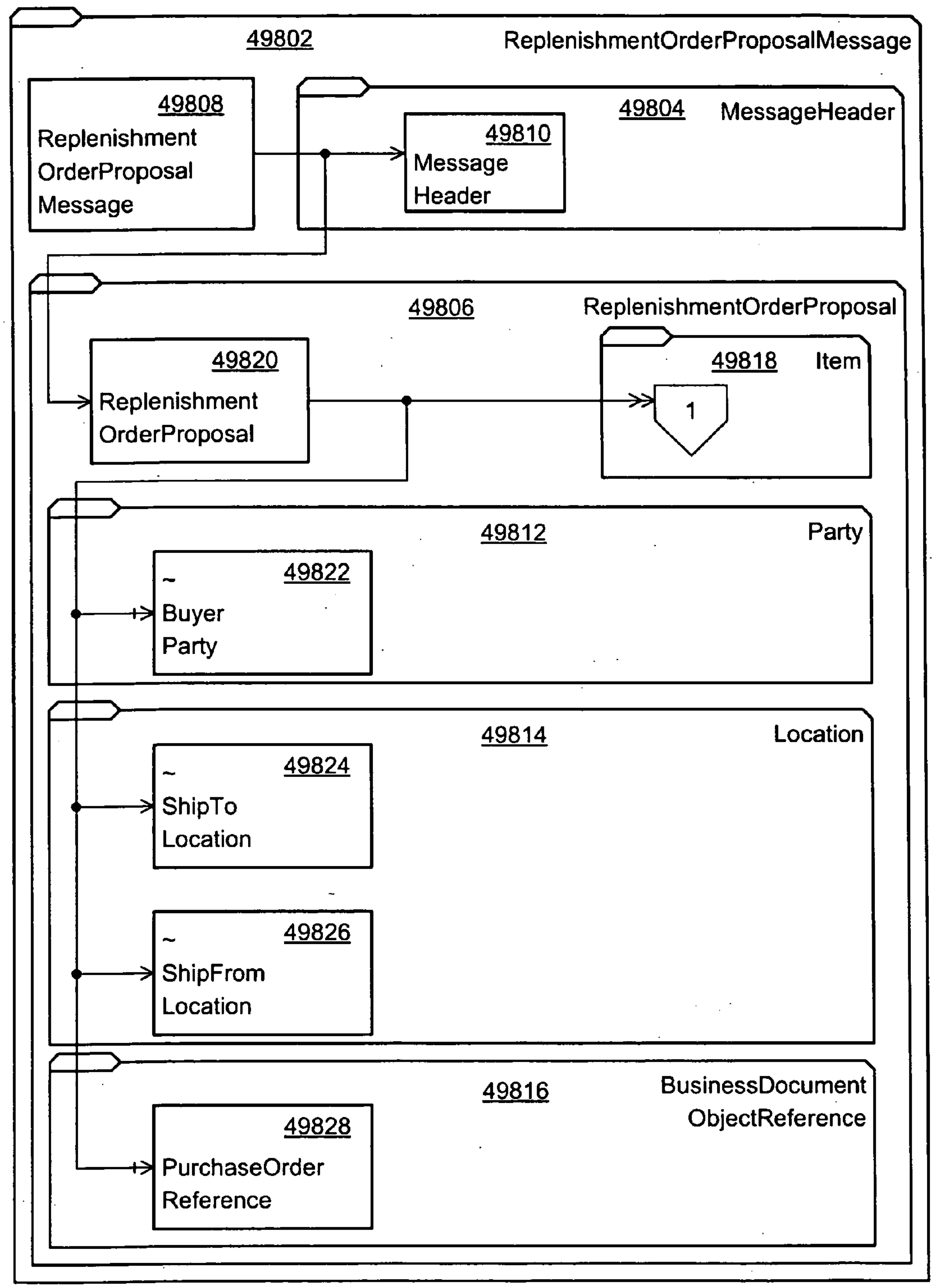
Figure 498B:
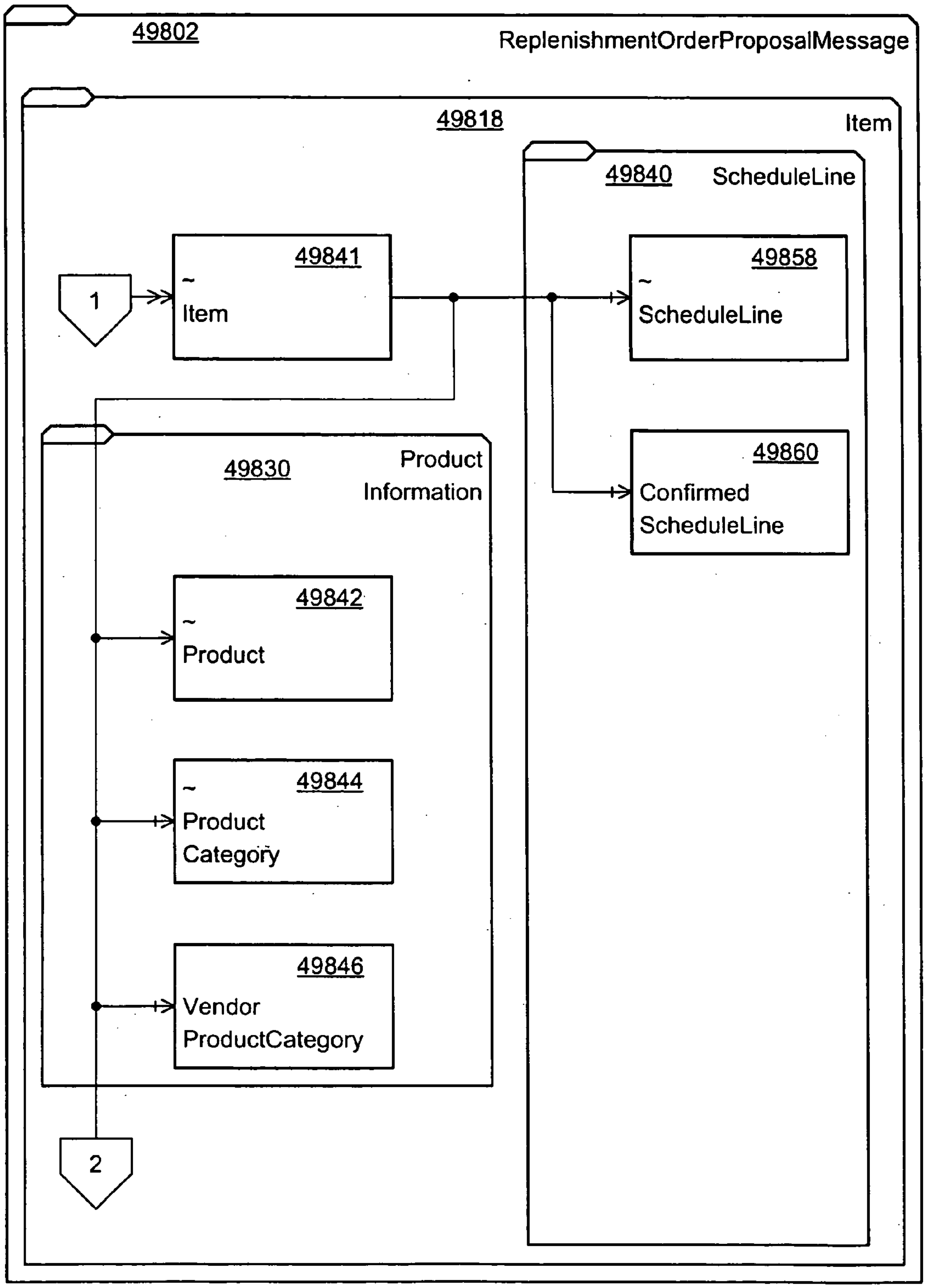
Figure 498C:
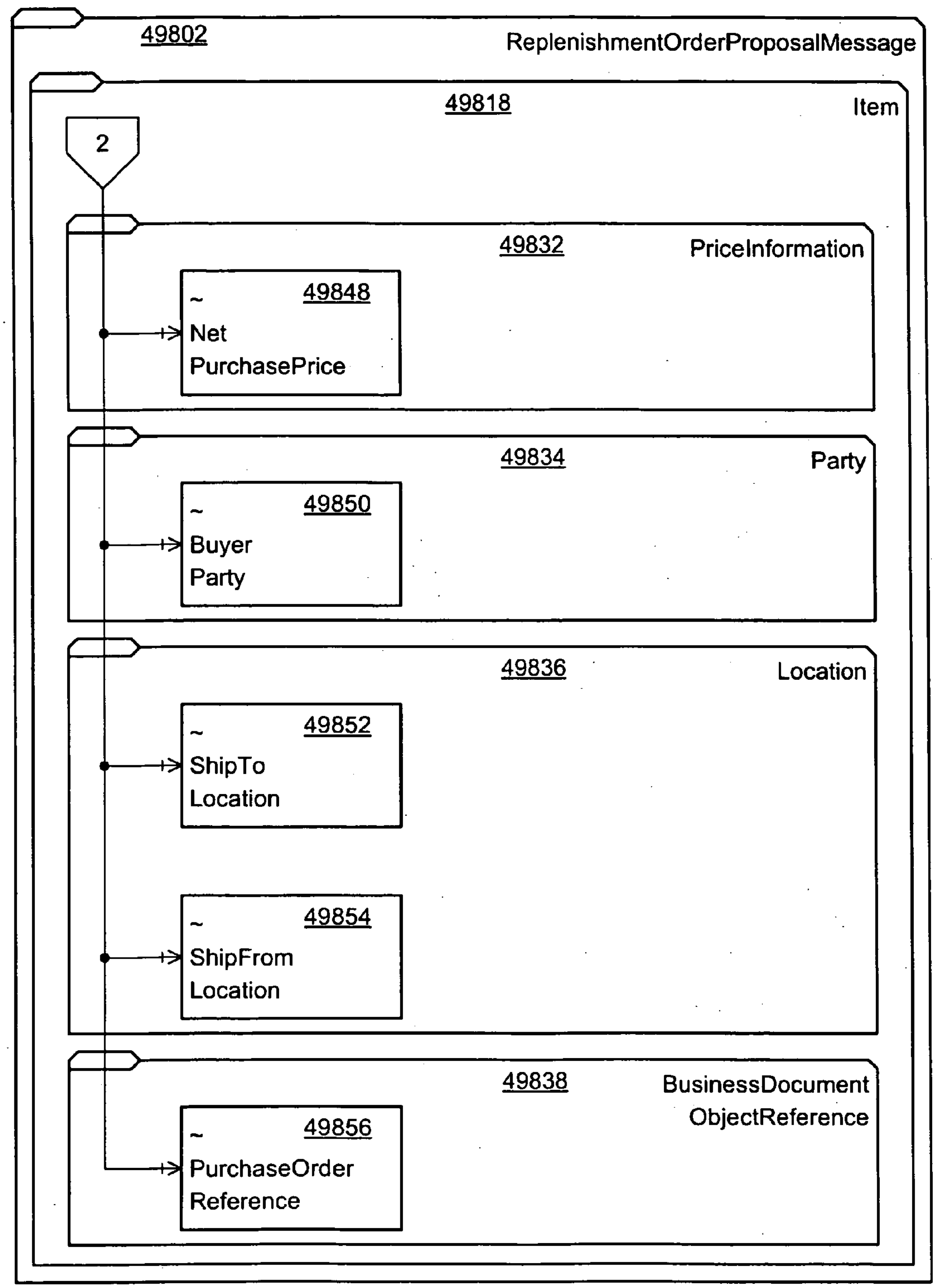
Figure 500:
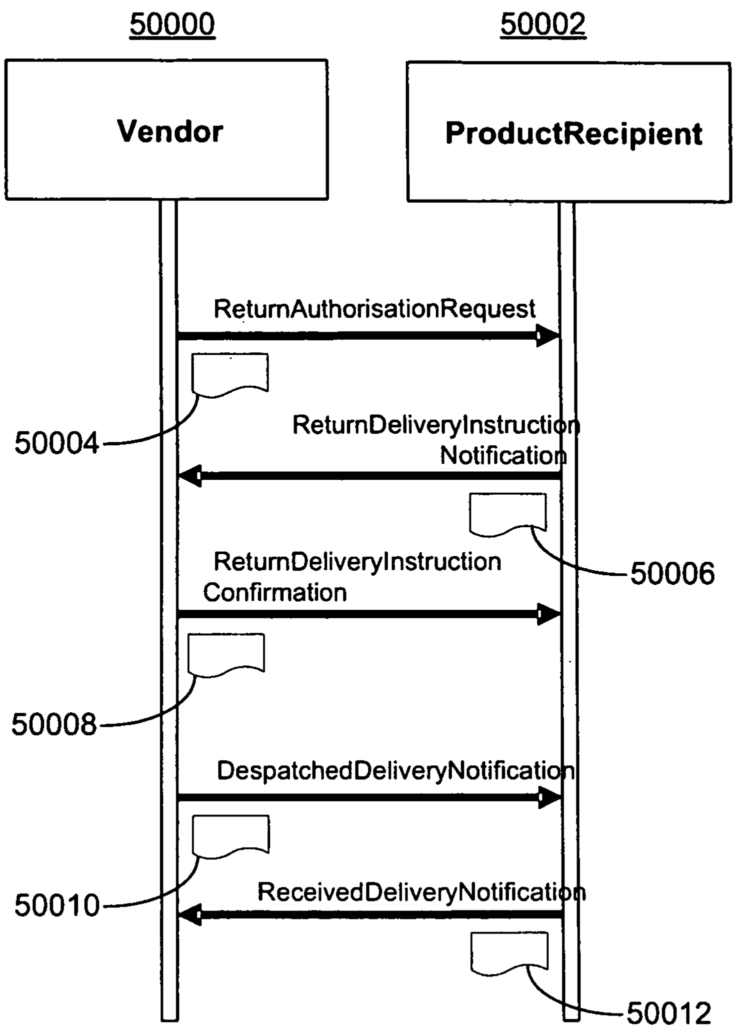
Figure 501A:
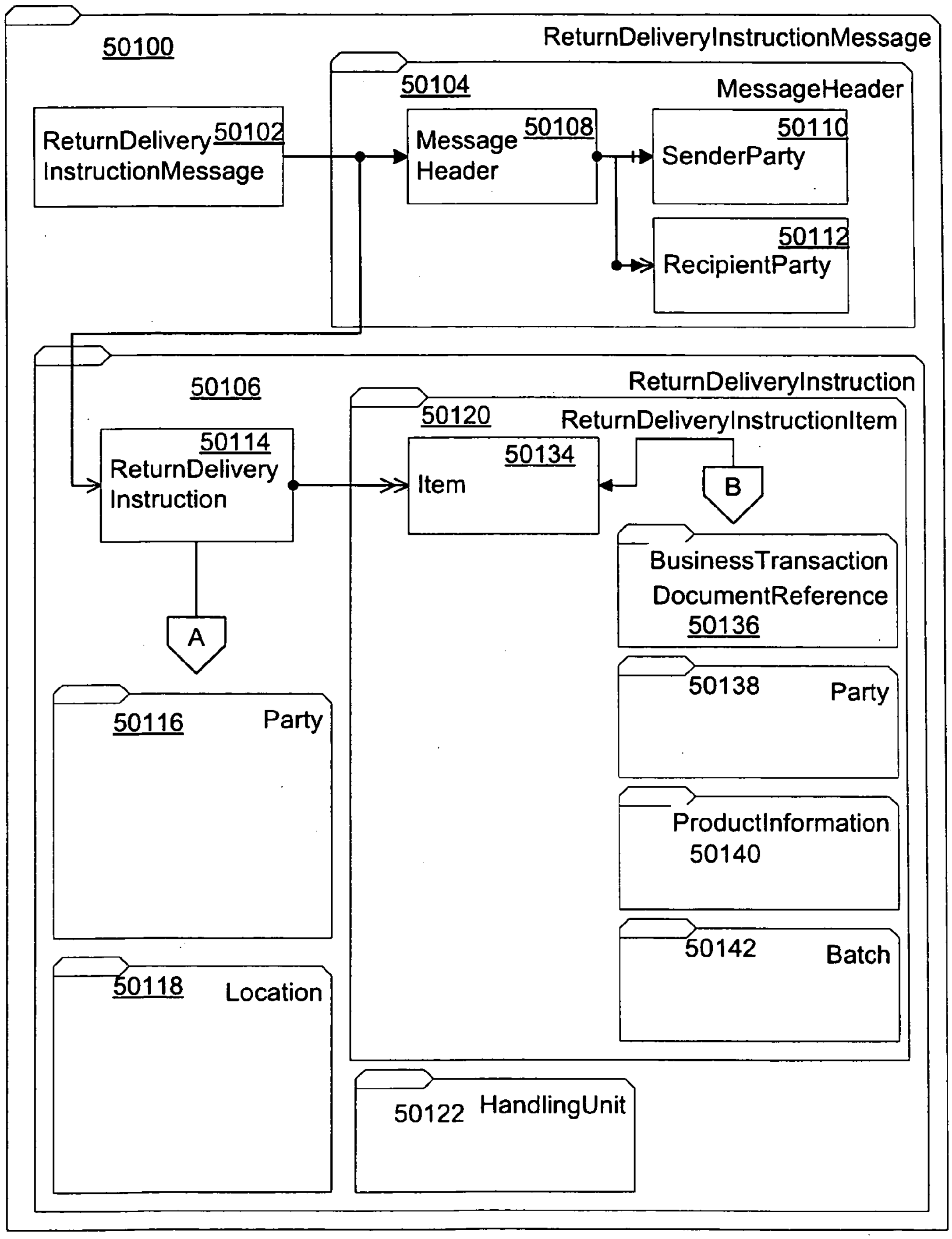
Figure 501B:
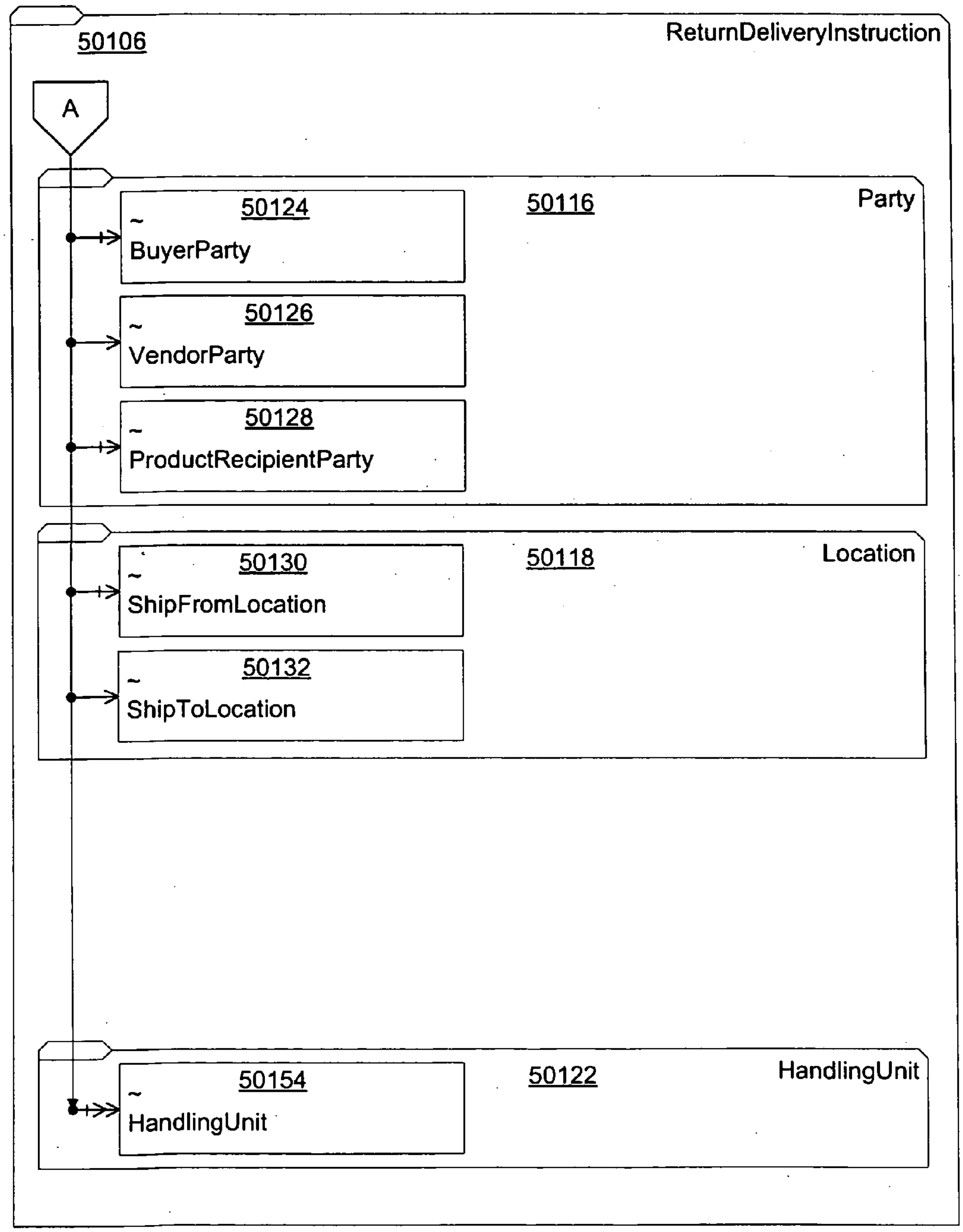
Figure 501C:
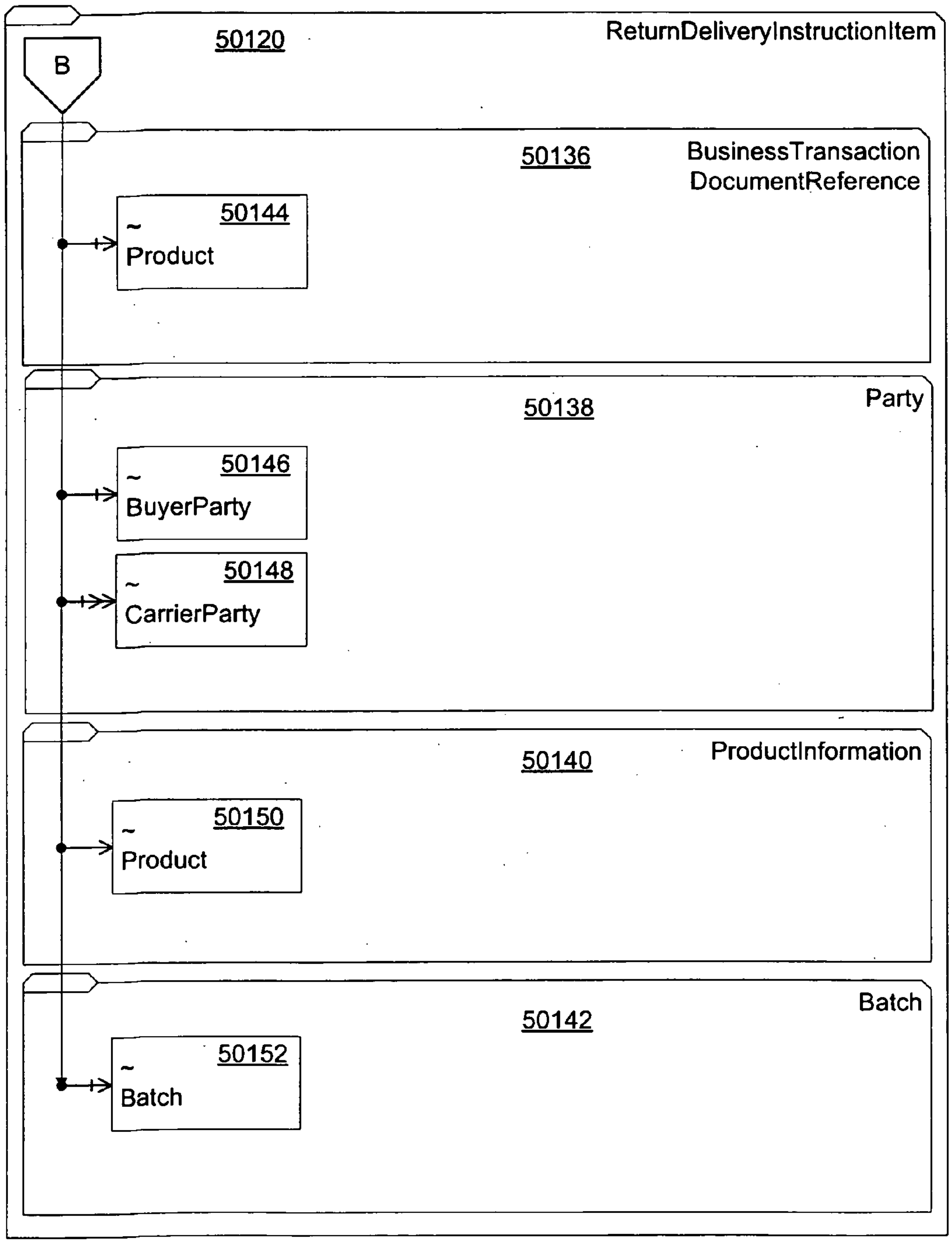
Figure 503:
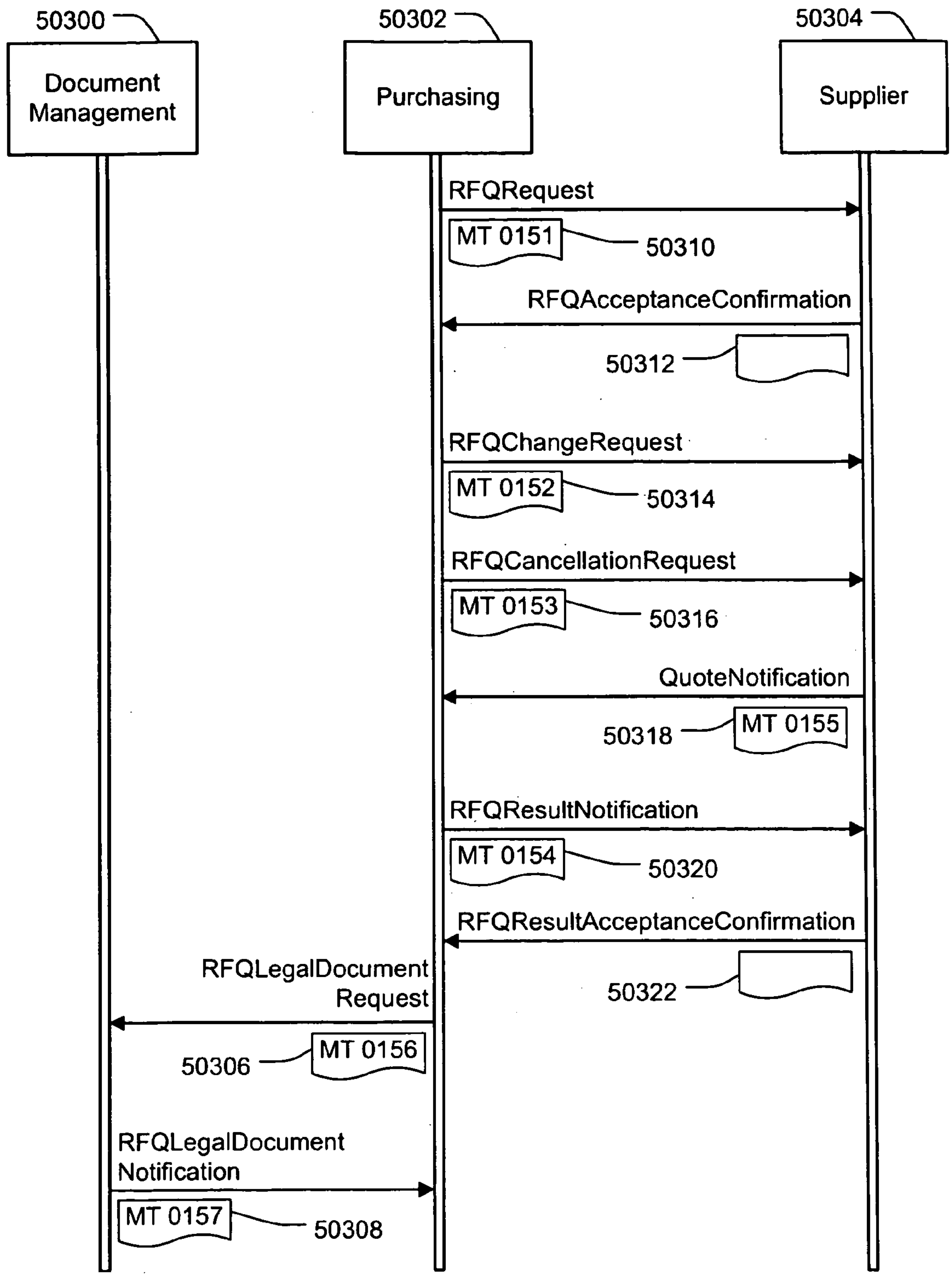
Figure 504A:
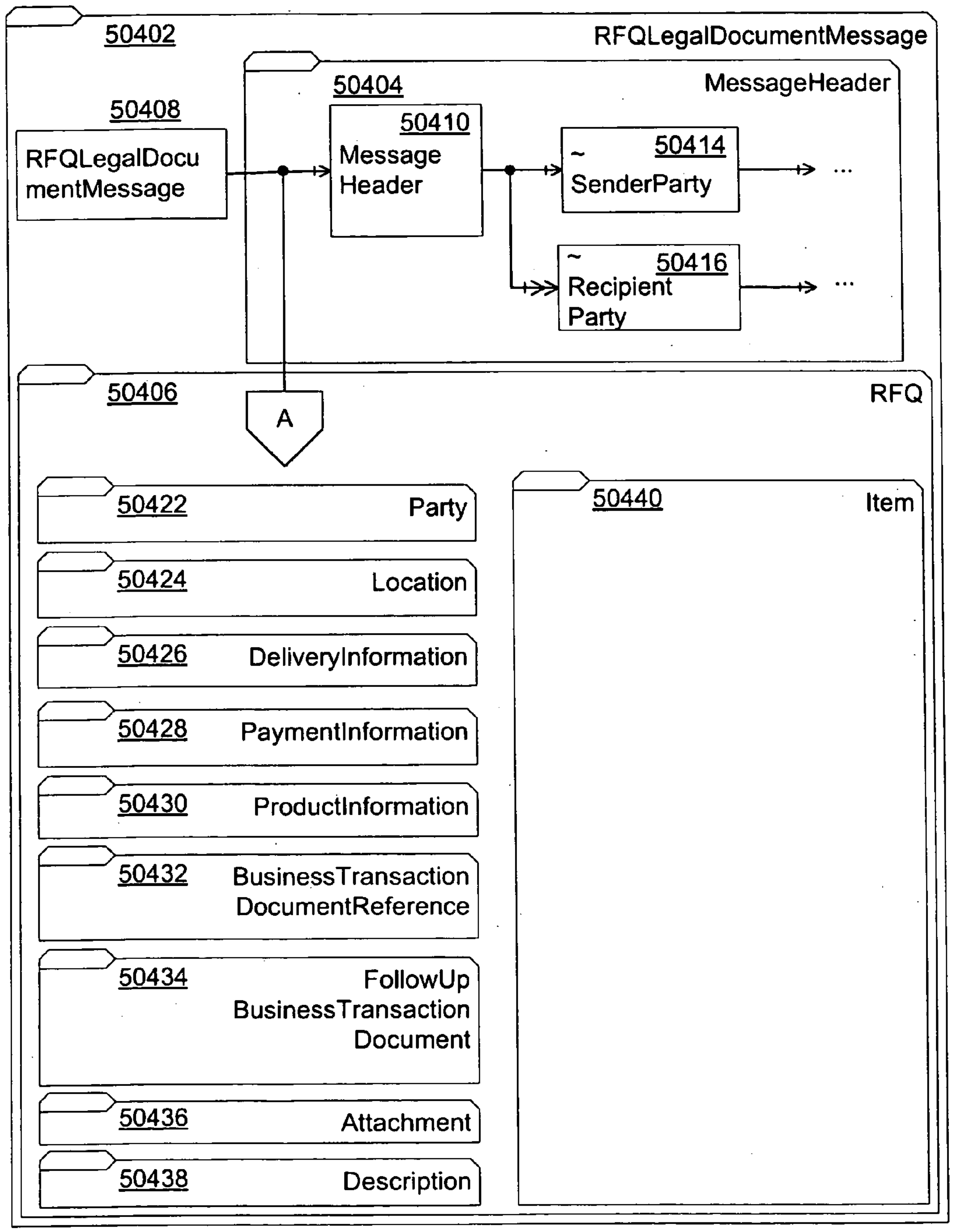
Figure 504B:
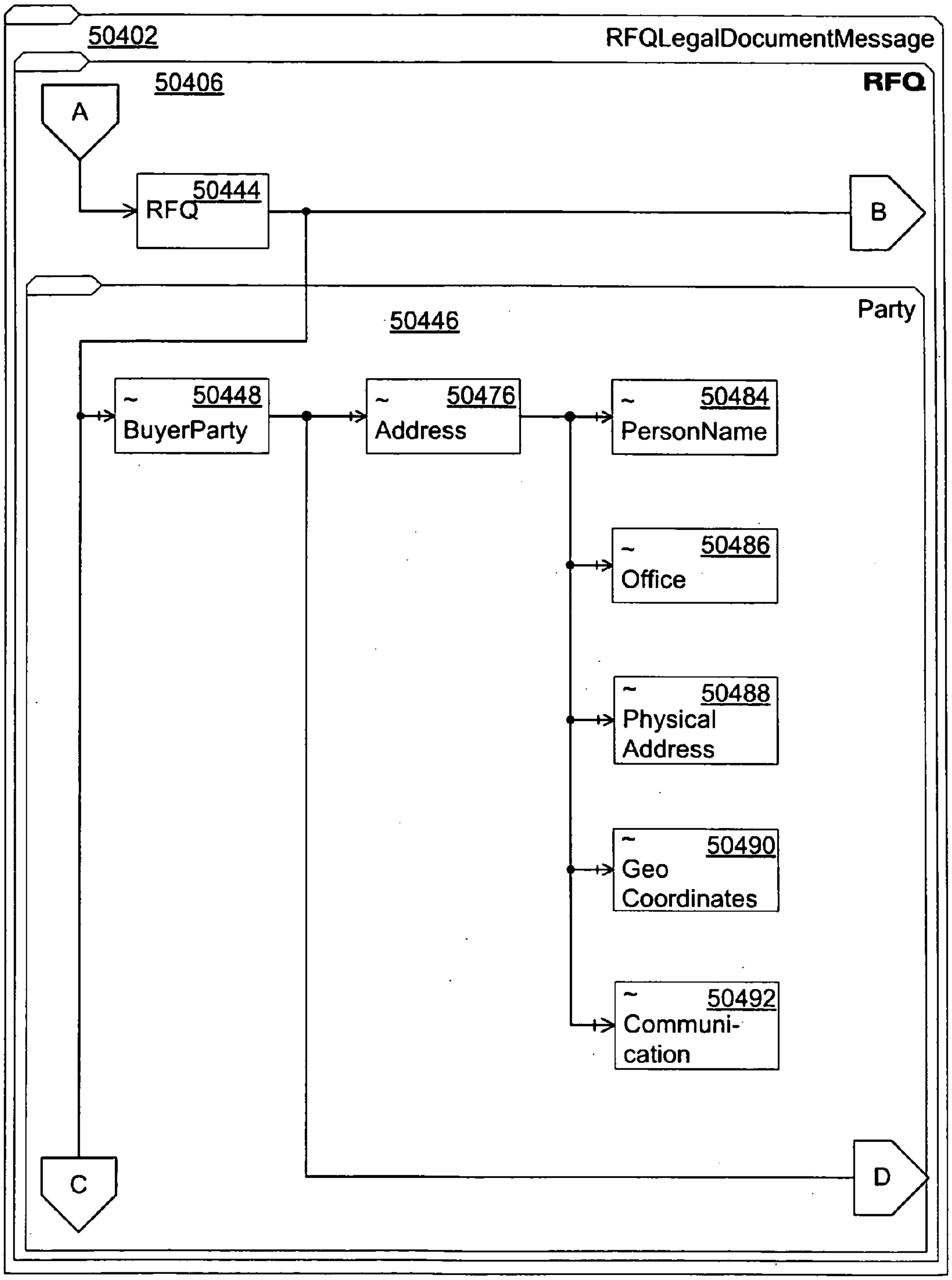
Figure 504C:
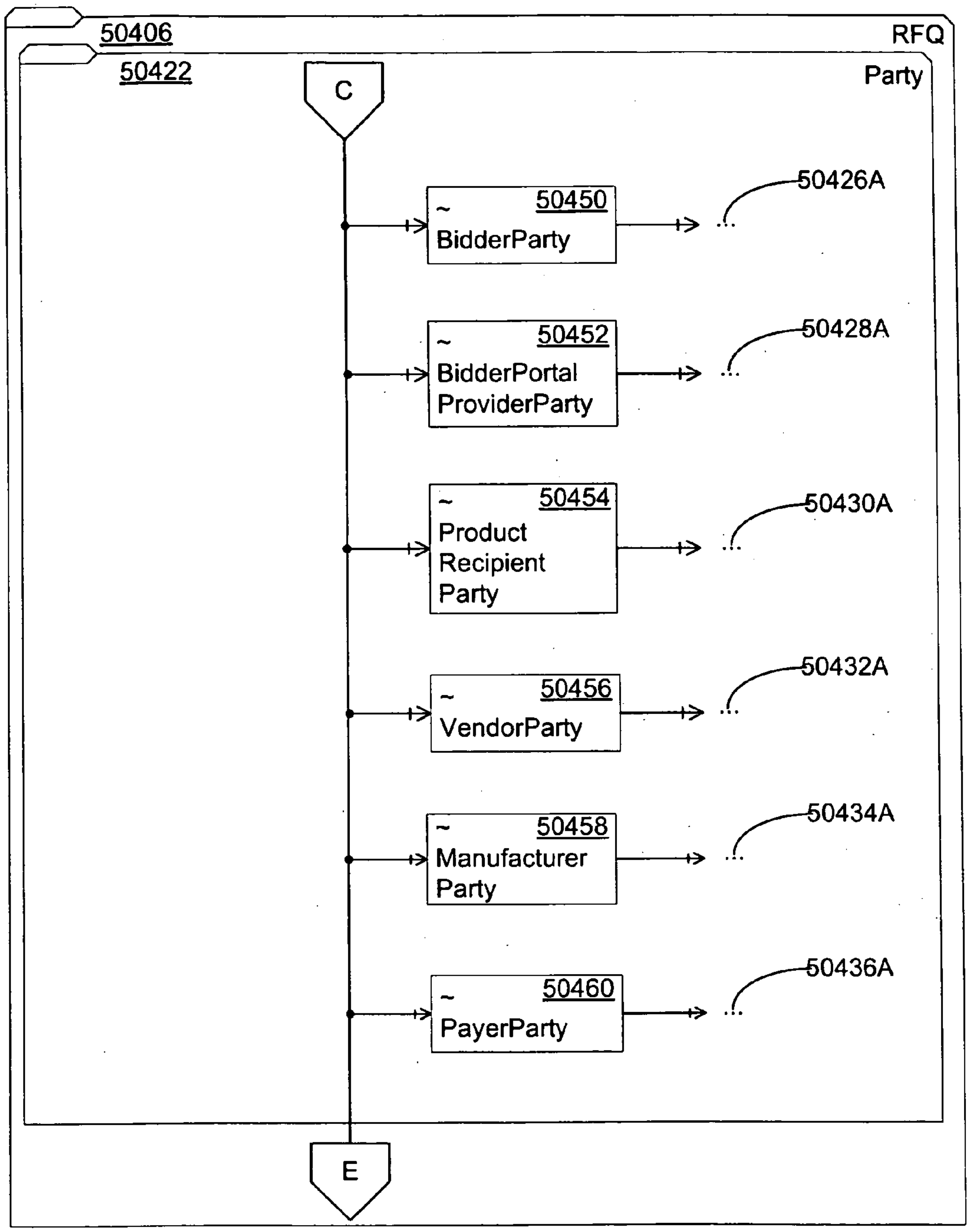
Figure 504D:
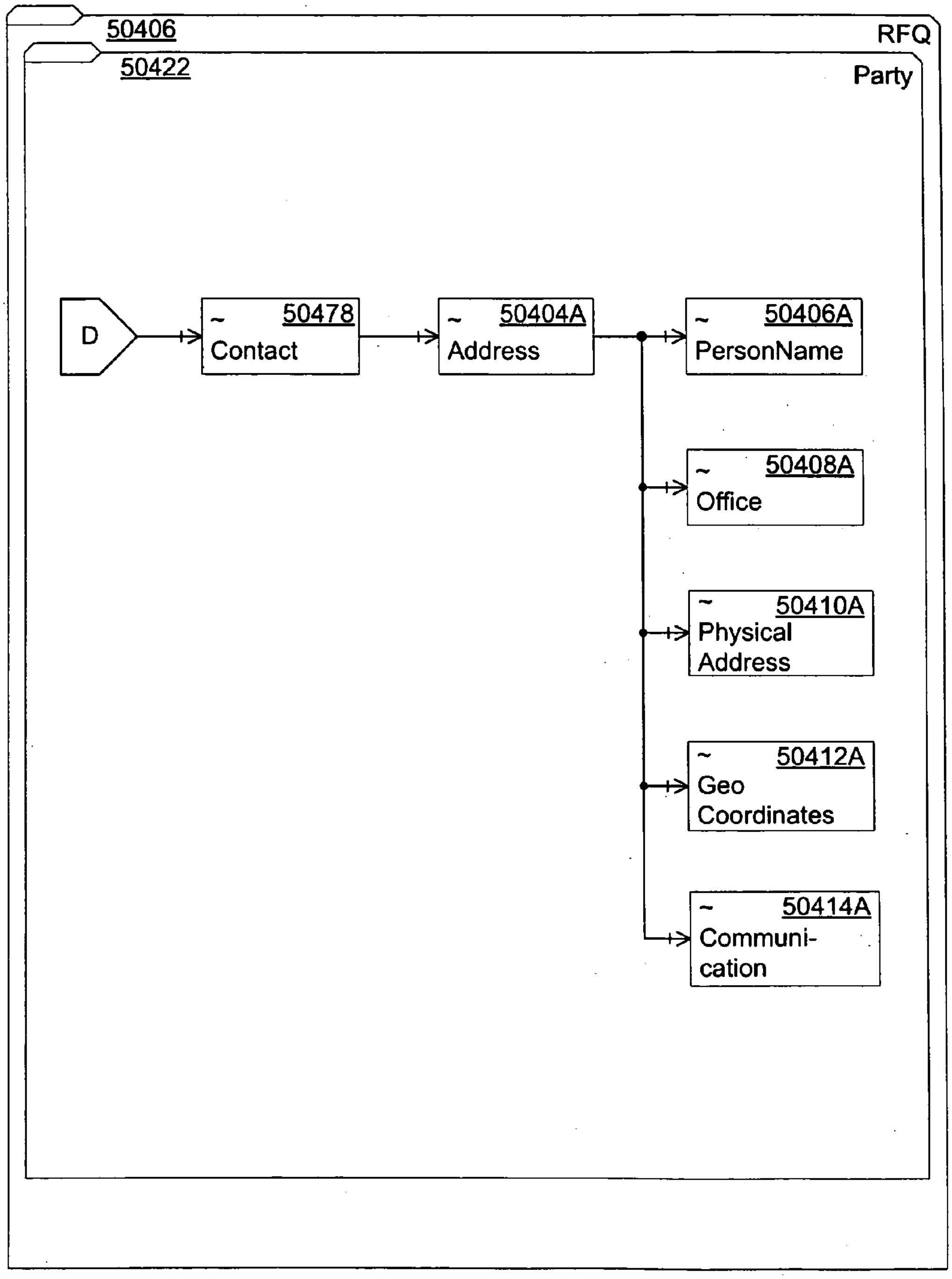
Figure 504E:
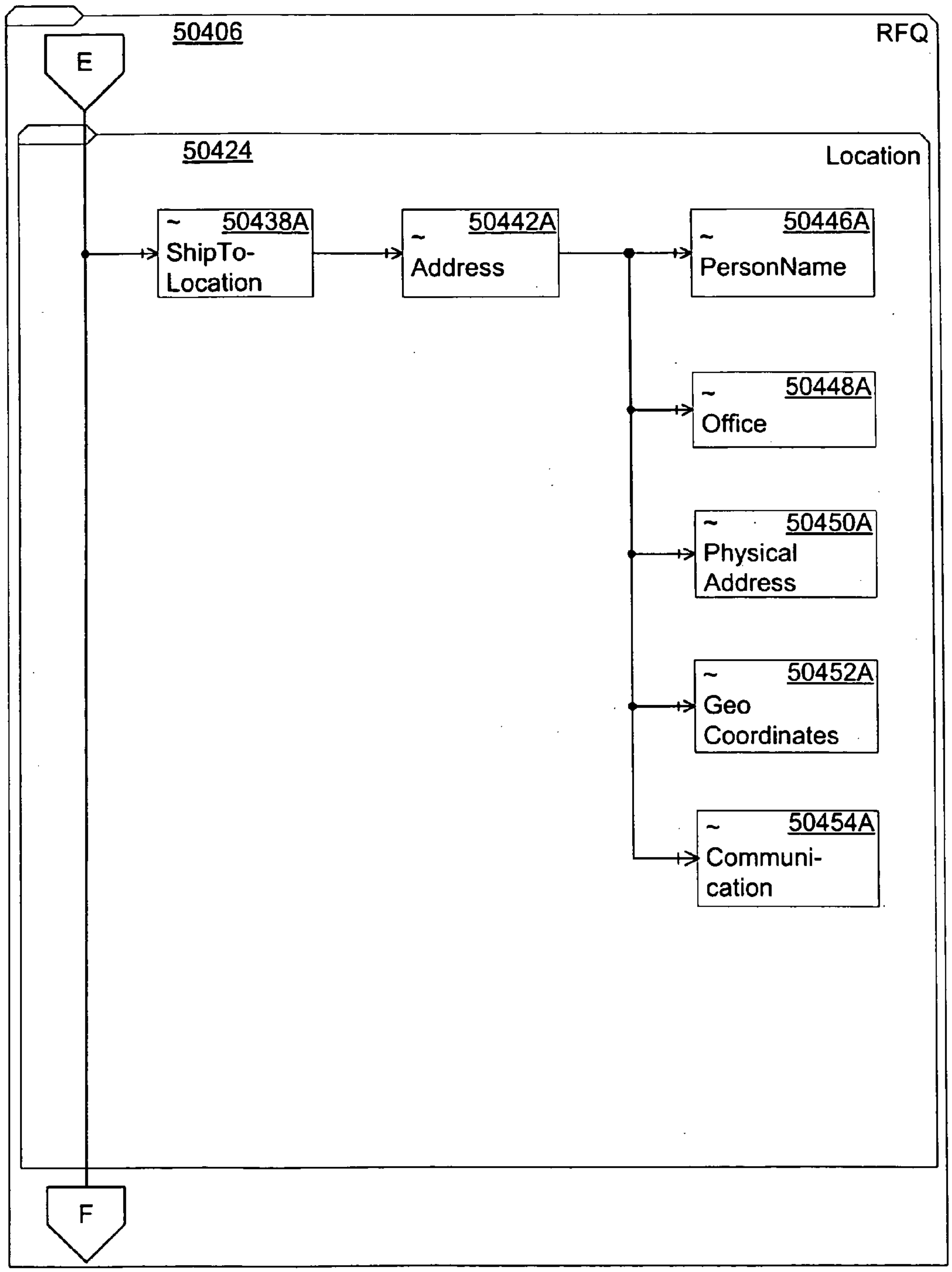
Figure 504F:
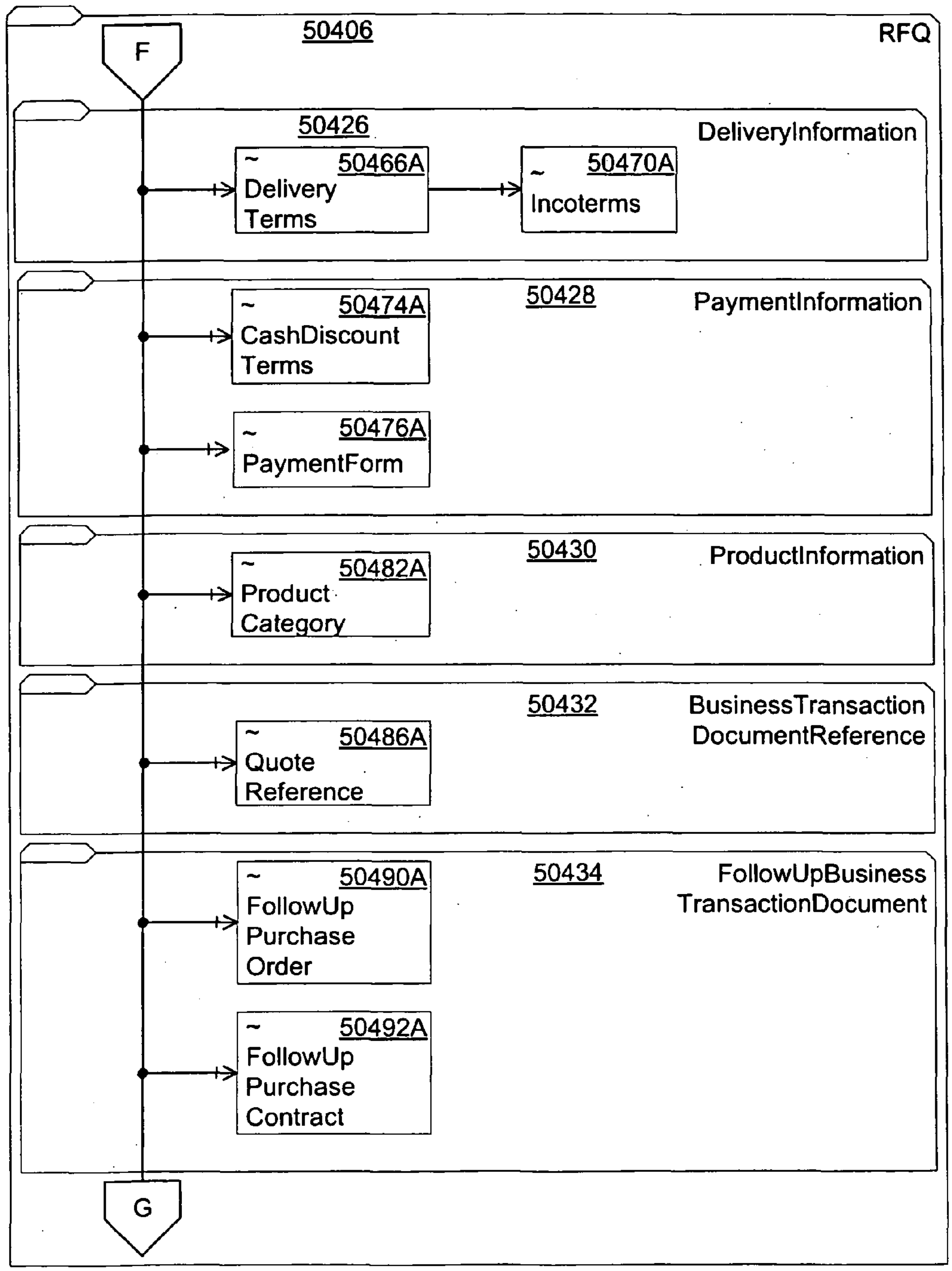
Figure 504G:
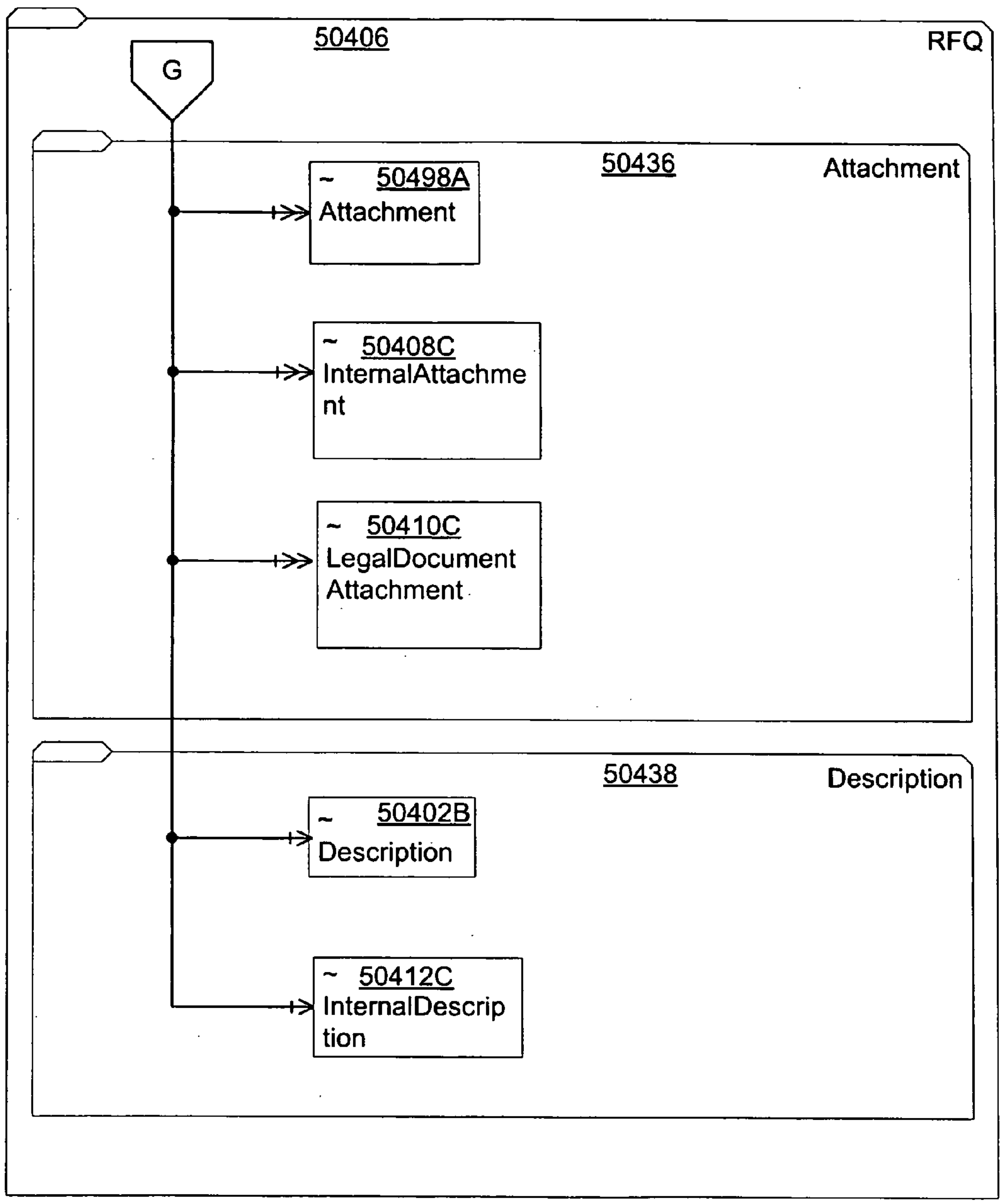
Figure 504H:
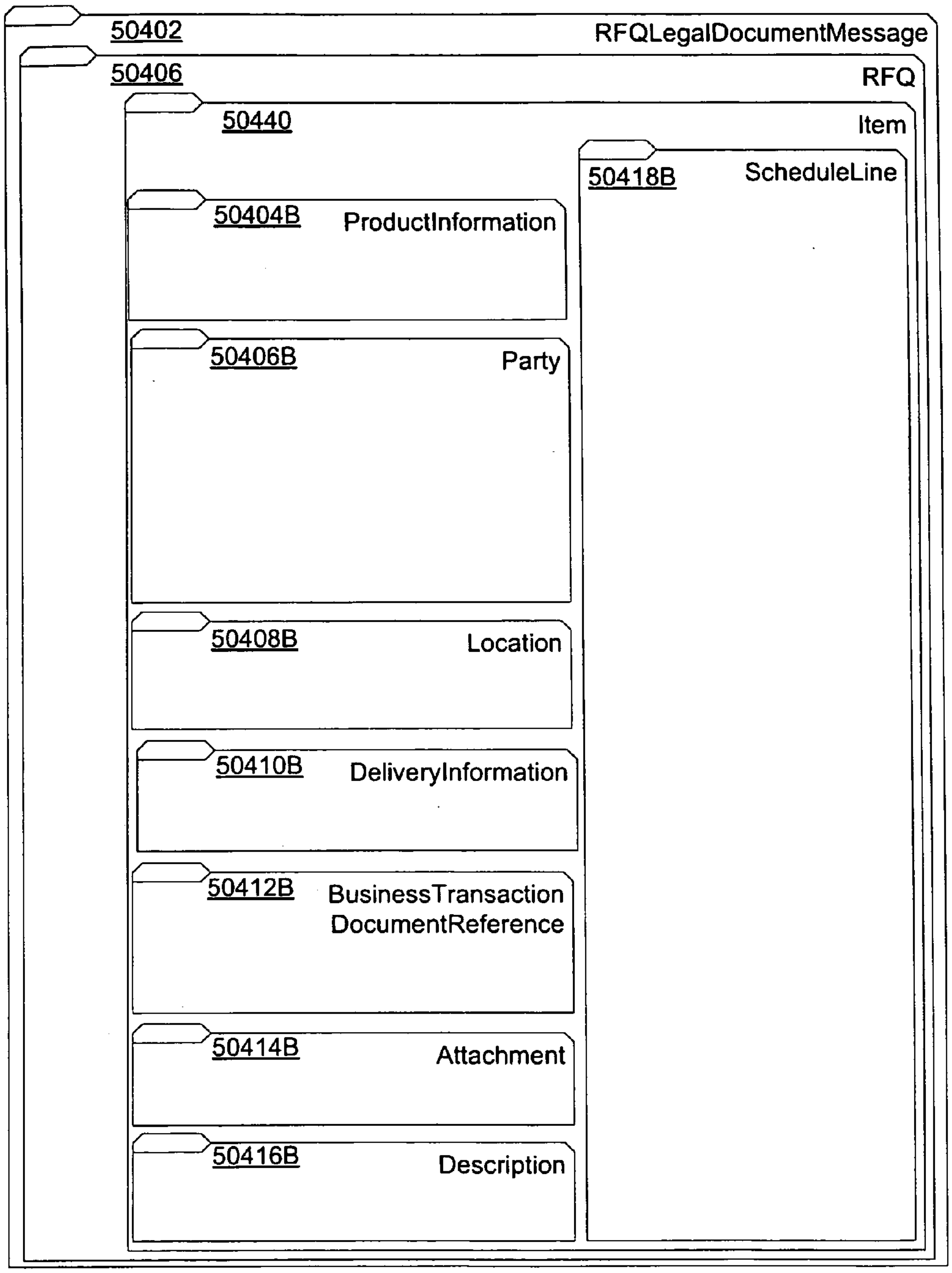
Figure 504I:
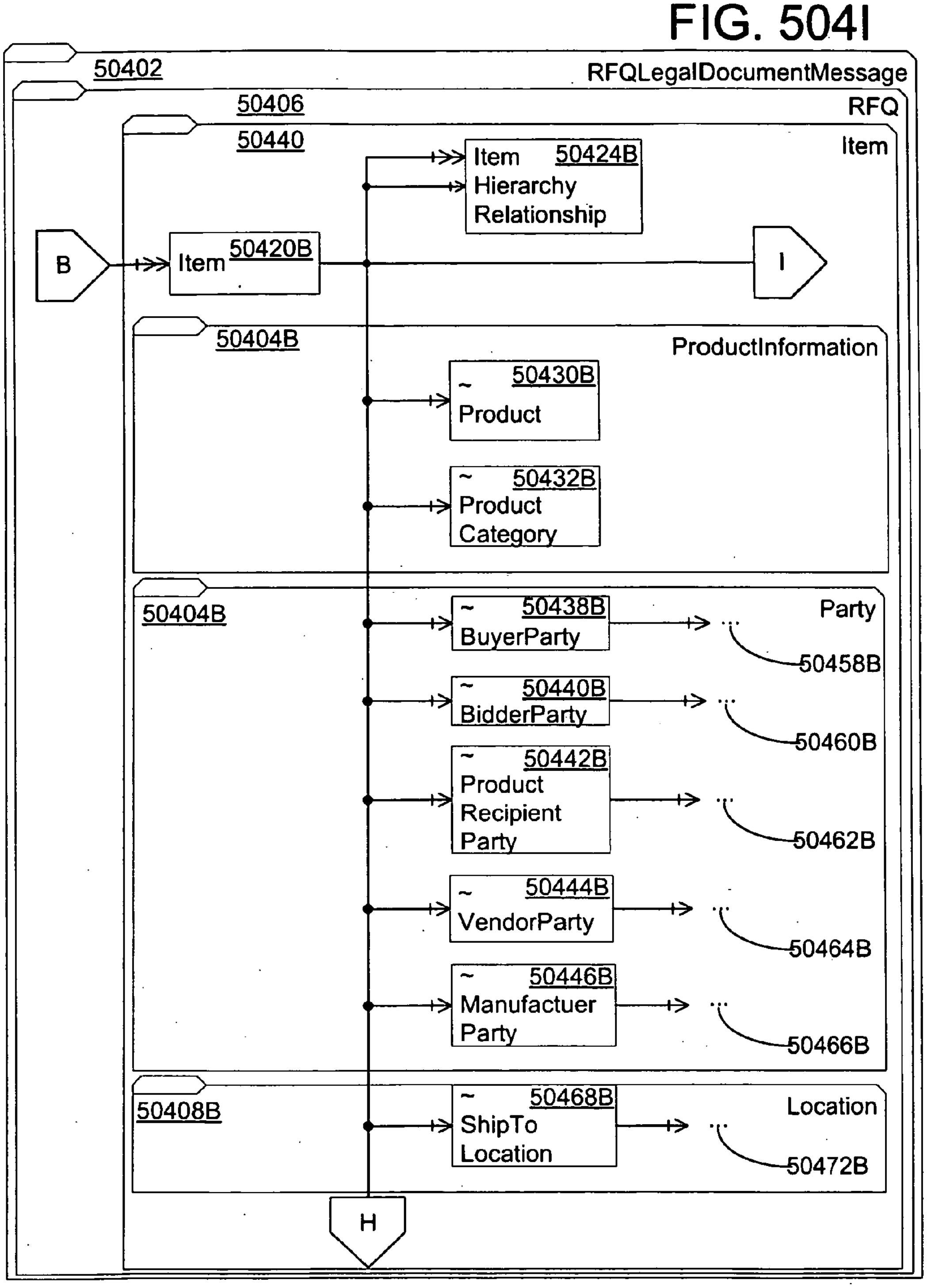
Figure 504J:
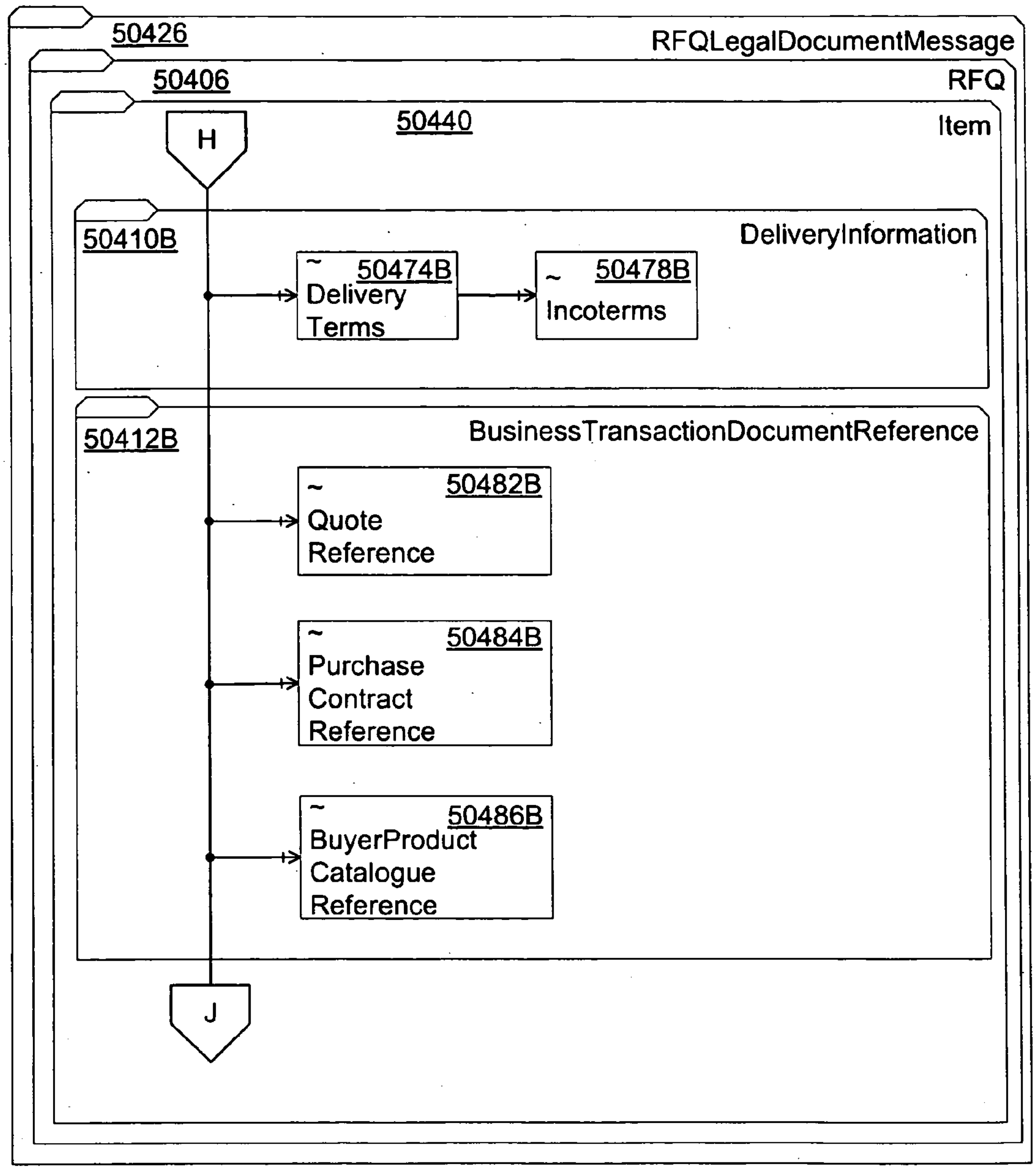
Figure 504K:
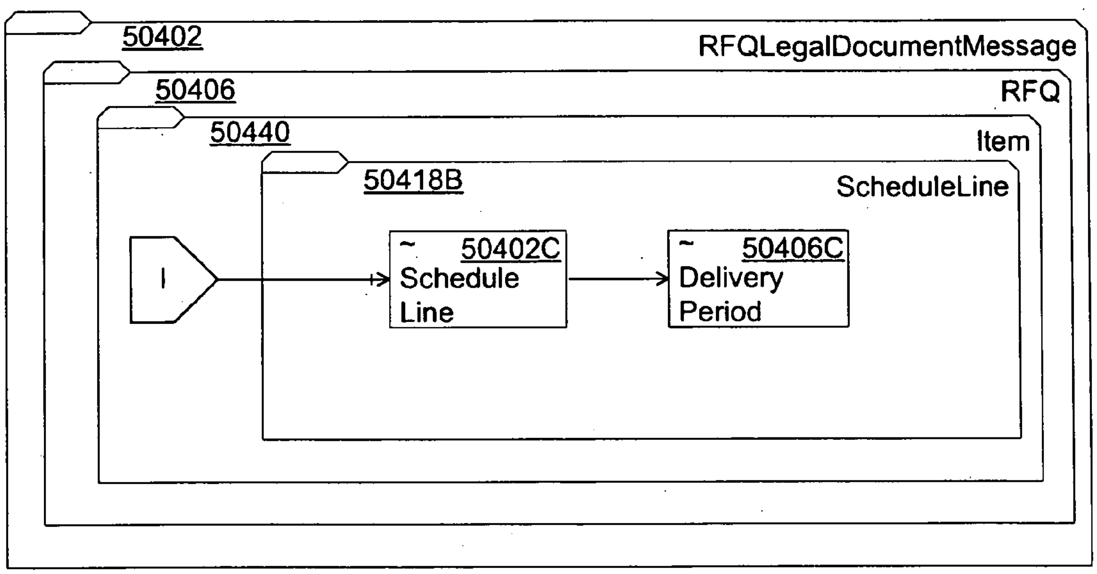
Figure 504L:
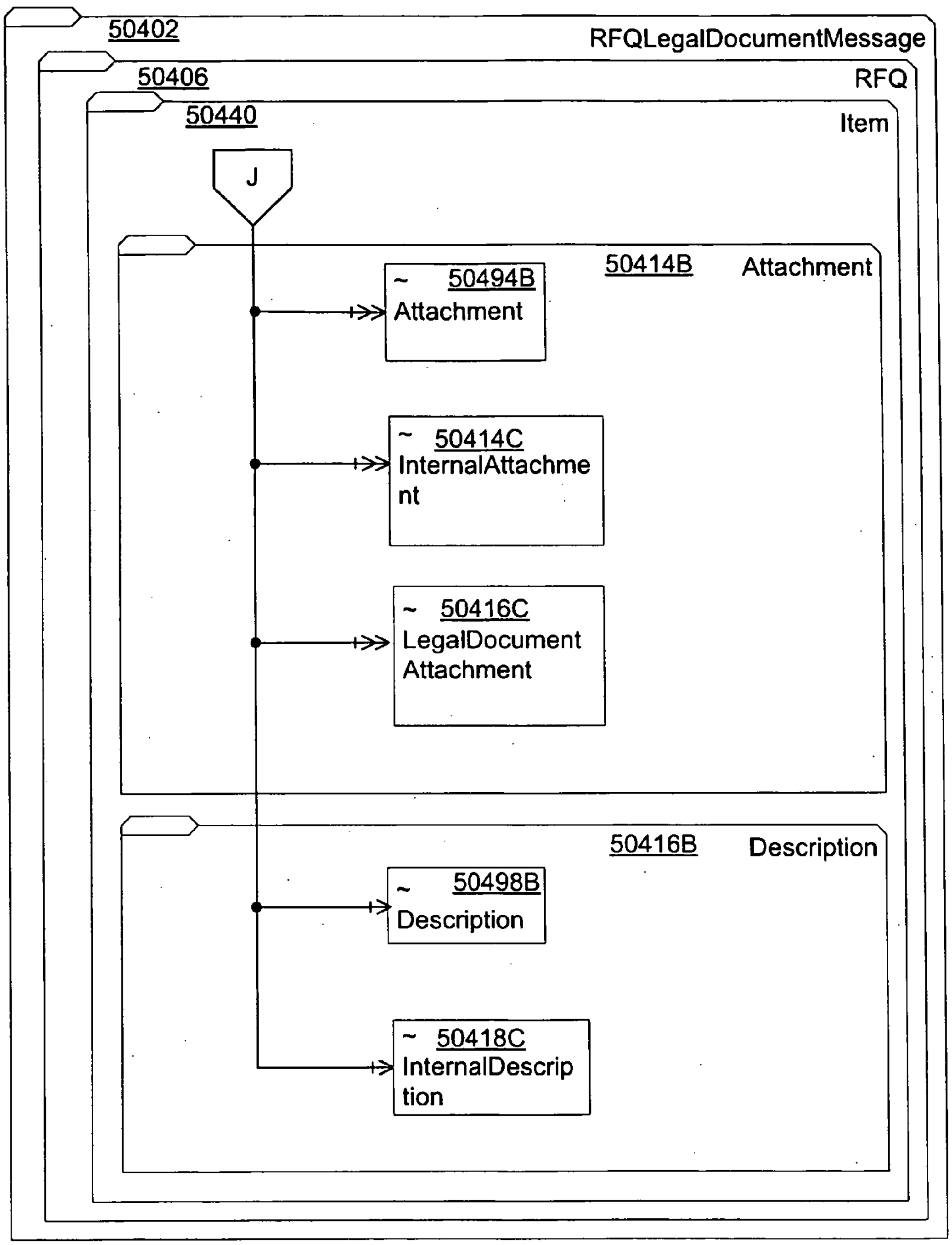
Figure 506:
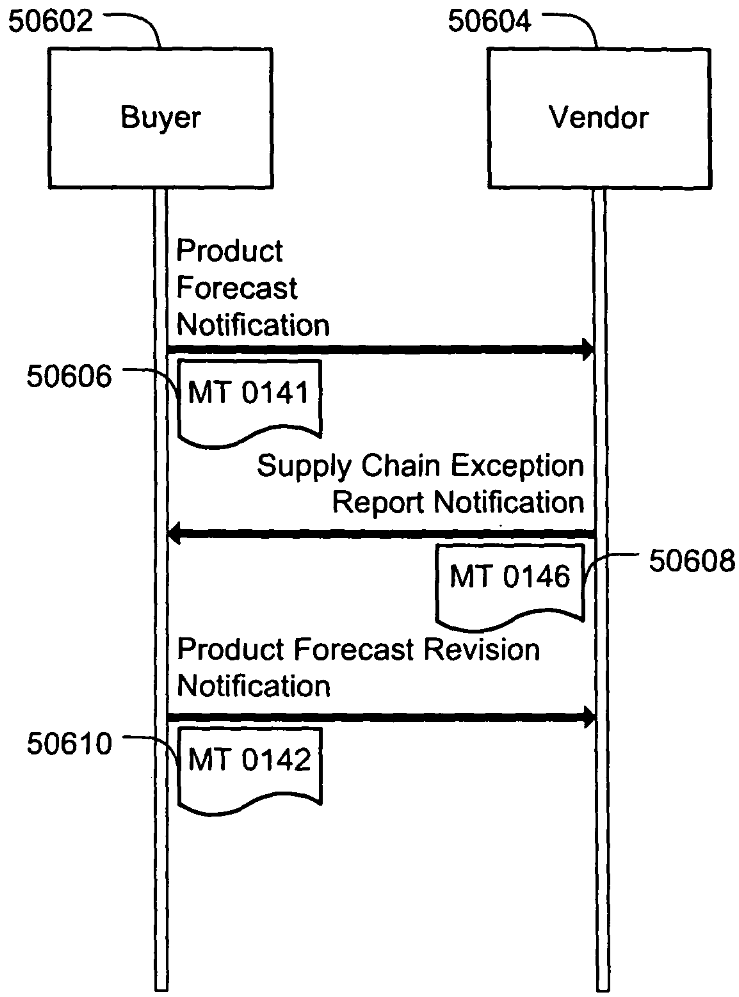
Figure 507A:
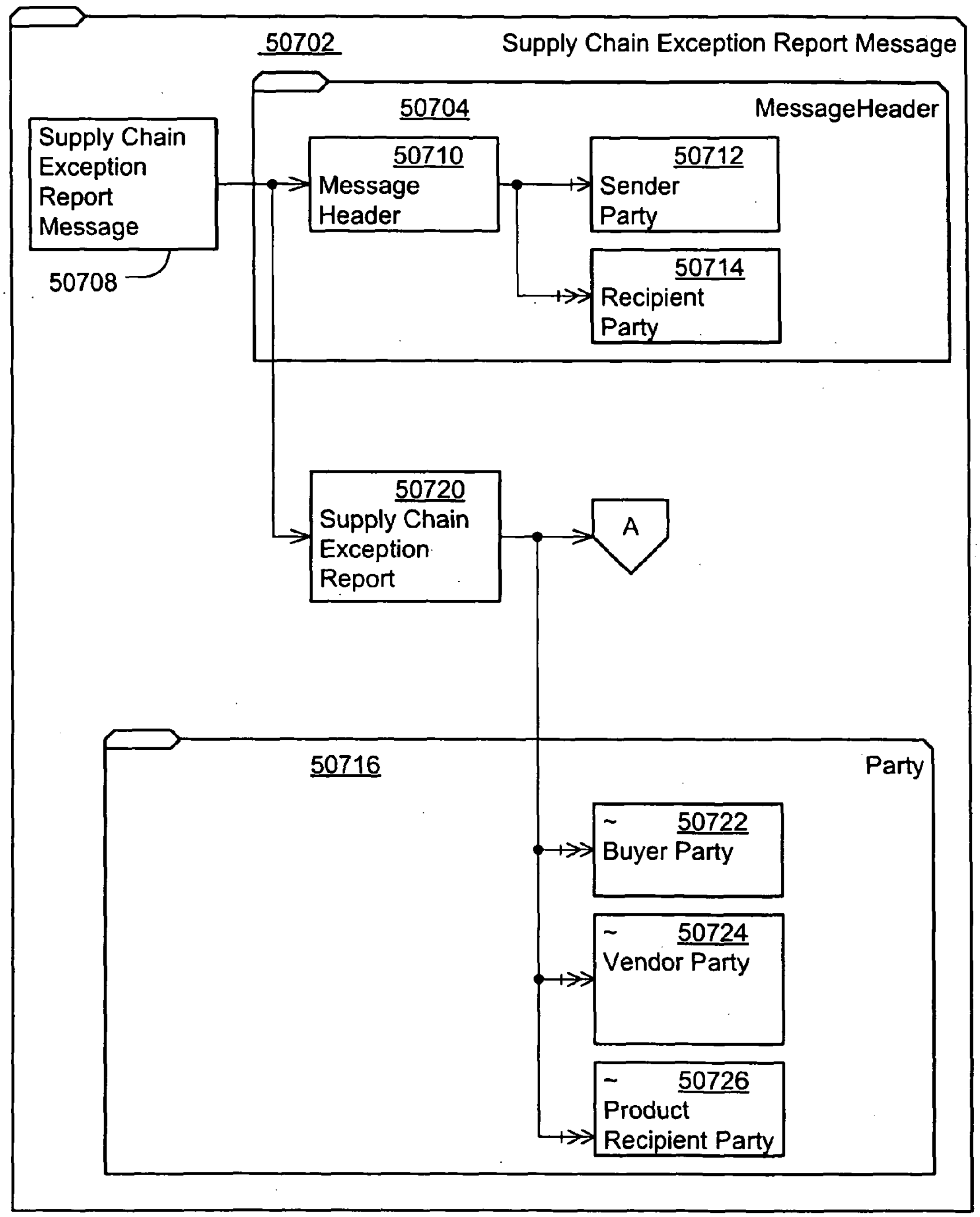
Figure 507B:
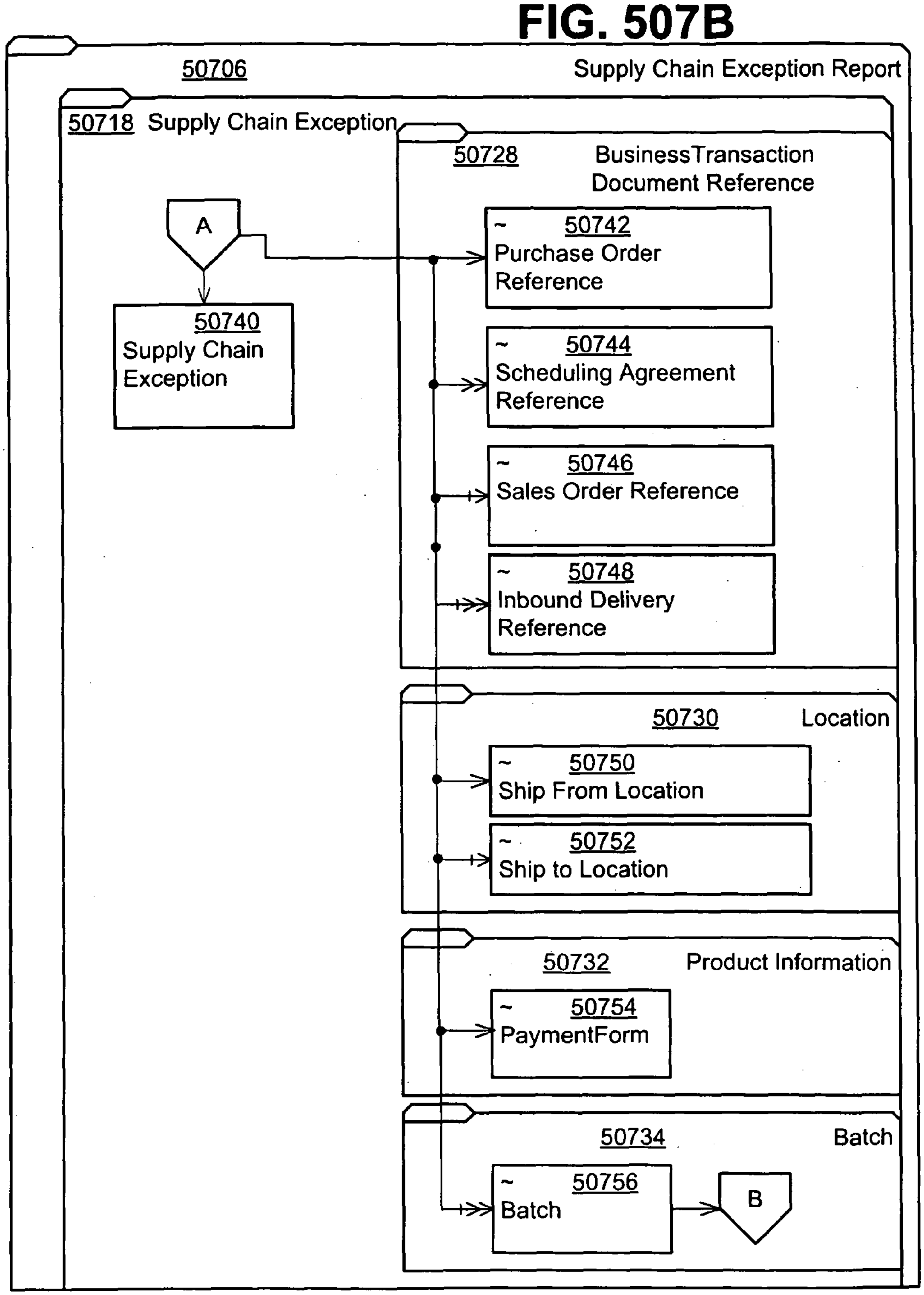
Figure 507C:
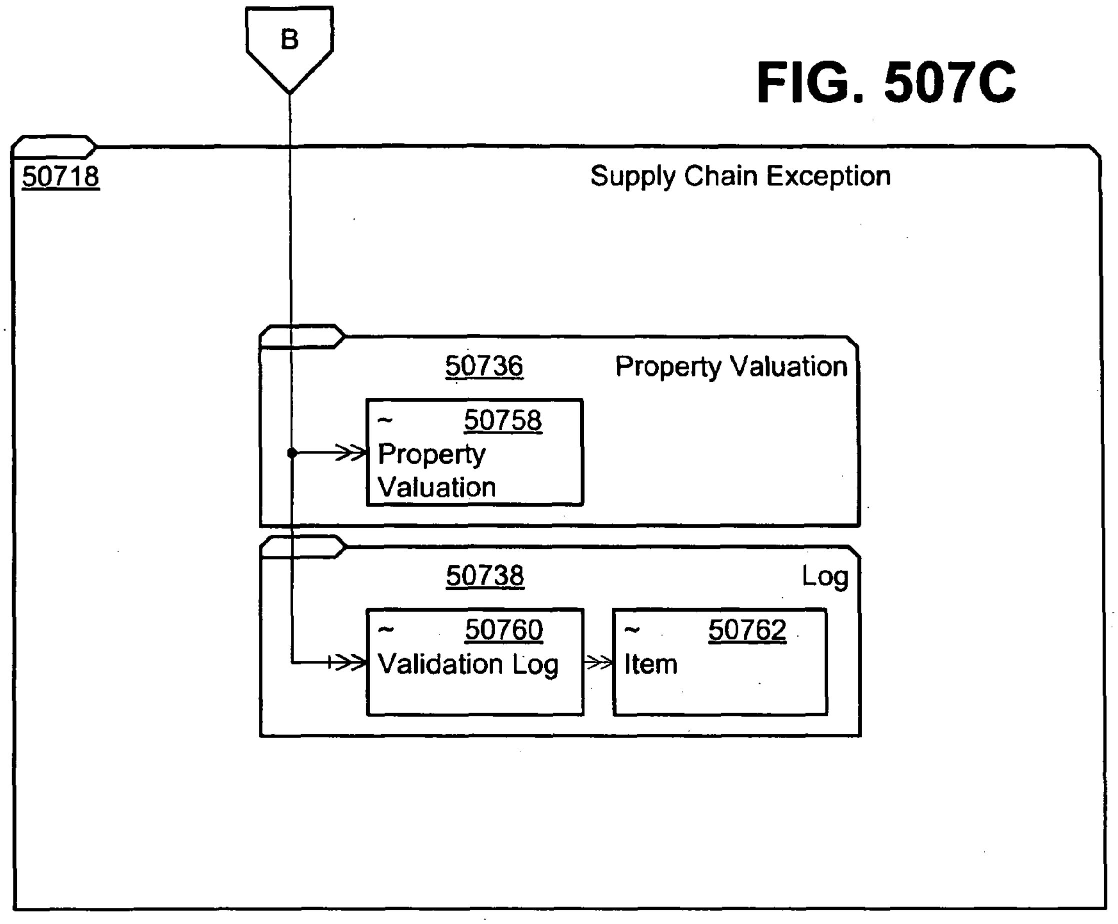
Figure 509:
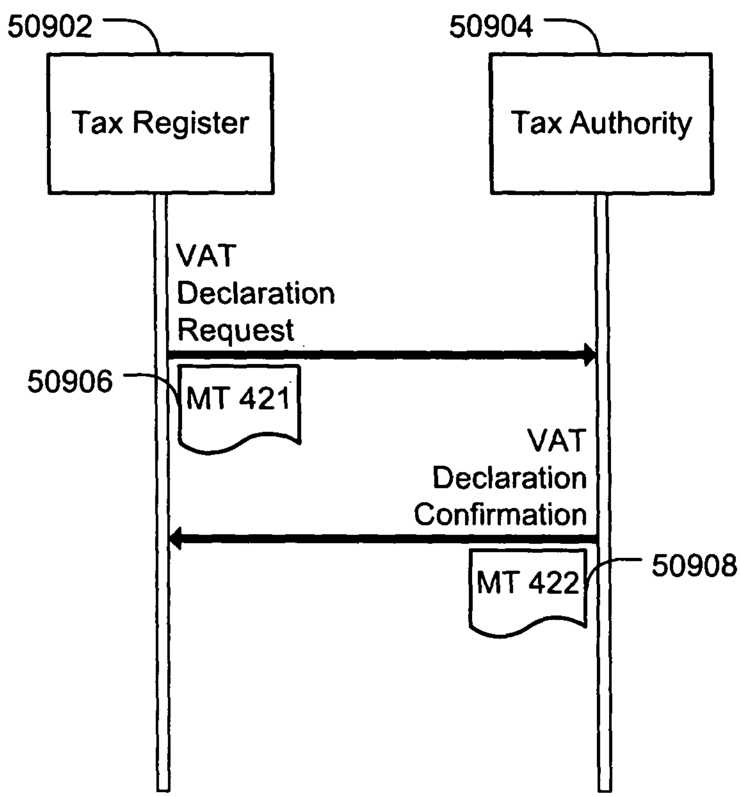
Figure 510:
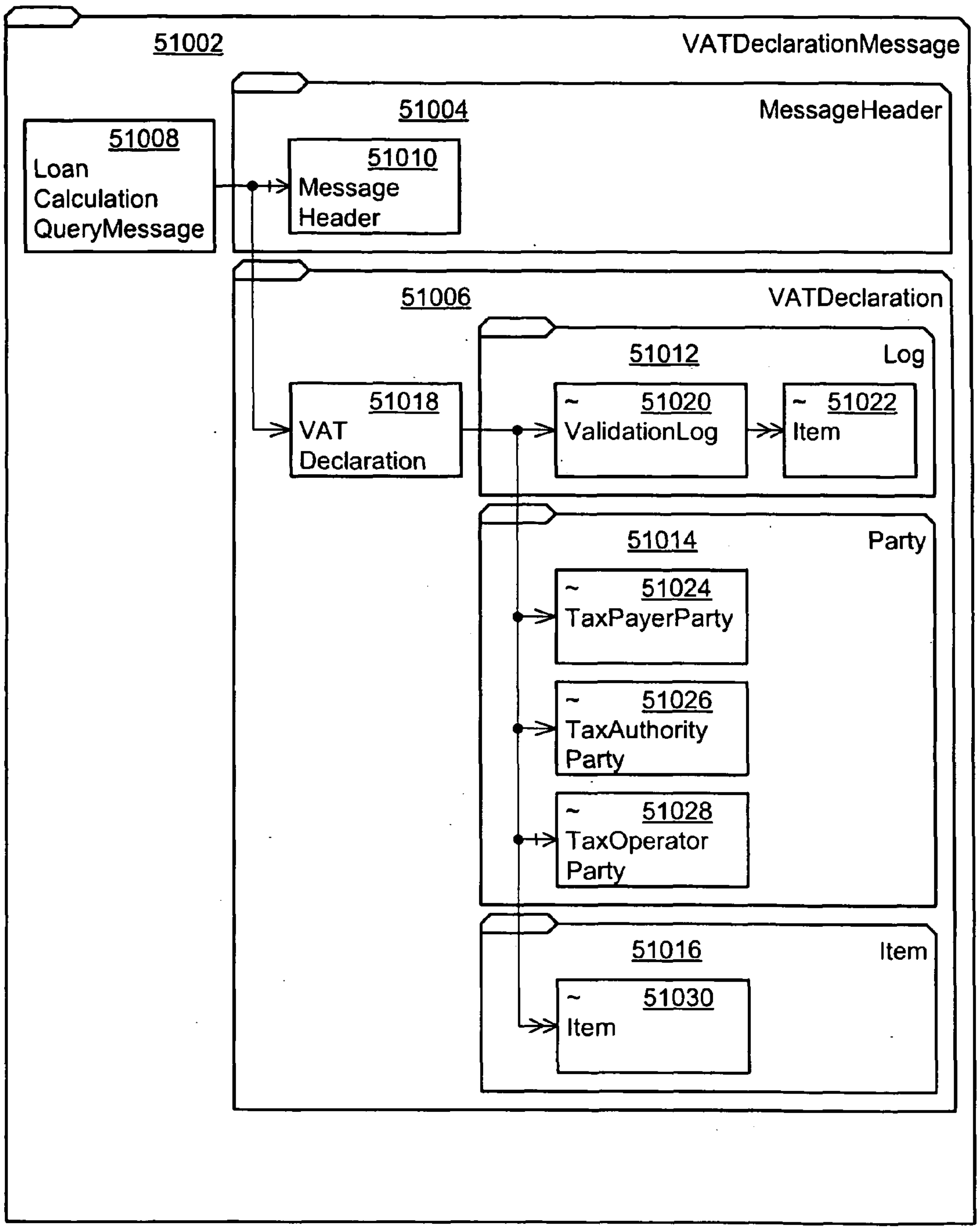

FIG. 376 depicts a message choreography for the Purchase Order Information interfaces in accordance with methods and systems consistent with the subject matter described herein;

FIGS. 377A-O depict a data model for Purchase Order Information Message in accordance with methods and systems consistent with the subject matter described herein;

FIGS. 378A-S depict an element structure for the Purchase Order Information Message in accordance with methods and systems consistent with the subject matter described herein;

FIGS. 378AA-AR depict an element structure for Purchase Order Information Legal Document Message in accordance with methods and systems consistent with the subject matter described herein;

FIG. 379 depicts a message choreography for Tax Due interfaces in accordance with methods and systems consistent with the subject matter described herein;

FIGS. 380A-C depict a data model for Tax Due Message in accordance with methods and systems consistent with the subject matter described herein;

FIGS. 381A-D depict an element structure for the Tax Due Message in accordance with methods and systems consistent with the subject matter described herein;

FIG. 382 depicts a message choreography for Delivery Information interfaces in accordance with methods and systems consistent with the subject matter described herein;

FIGS. 383A-G depict a data model for Delivery Information Message in accordance with methods and systems consistent with the subject matter described herein;

FIGS. 384A-N depict an element structure for the Delivery Information Message in accordance with methods and systems consistent with the subject matter described herein;

FIG. 385 depicts a message choreography for Personnel Timesheet Information interfaces in accordance with methods and systems consistent with the subject matter described herein;

FIG. 386 depicts a data model for Personnel Timesheet Message in accordance with methods and systems consistent with the subject matter described herein;

FIGS. 387A-C depict an element structure for Personnel Timesheet Message in accordance with methods and systems consistent with the subject matter described herein;

FIG. 388 depicts a message choreography for Credit Worthiness interfaces in accordance with methods and systems consistent with the subject matter described herein;

FIG. 389 depicts a data model for Credit Worthiness Query Message in accordance with methods and systems consistent with the subject matter described herein;

FIG. 390 depicts a data model for Credit Worthiness Message in accordance with methods and systems consistent with the subject matter described herein;

FIGS. 391A-E depict an element structure for the Credit Worthiness Query Message in accordance with methods and systems consistent with the subject matter described herein;

FIGS. 392A-C depict an element structure for the Credit Worthiness Message in accordance with methods and systems consistent with the subject matter described herein;

FIG. 393 depicts a message choreography for Credit Agency Report interfaces in accordance with methods and systems consistent with the subject matter described herein;

FIG. 394 depicts a data model for Credit Agency Report Query Message in accordance with methods and systems consistent with the subject matter described herein;

FIGS. 395A-B depict a data model for Credit Agency Report Message in accordance with methods and systems consistent with the subject matter described herein;

FIGS. 396A-C depict an element structure for the Credit Agency Report Query Message in accordance with methods and systems consistent with the subject matter described herein;

FIGS. 397A-E depict an element structure for the Credit Agency Report Message in accordance with methods and systems consistent with the subject matter described herein;

FIG. 398 depicts a message choreography for Invoicing Accounting interfaces in accordance with methods and systems consistent with the subject matter described herein;

FIG. 399 depicts a data model for Accounting Cancellation Message in accordance with methods and systems consistent with the subject matter described herein;

FIGS. 400A-B depict an element structure for Accounting Cancellation Message in accordance with methods and systems consistent with the subject matter described herein;

FIG. 401 depicts a message choreography for Invoice Due interfaces in accordance with methods and systems consistent with the subject matter described herein;

FIGS. 402A-M depict a data model for Invoice Due Message in accordance with methods and systems consistent with the subject matter described herein;

FIG. 403 depicts a data model for Invoice Due Cancellation Message in accordance with methods and systems consistent with the subject matter described herein;

FIGS. 404A-J depict an element structure for the Invoice Due Message in accordance with methods and systems consistent with the subject matter described herein;

FIG. 405 depicts a message choreography for Inventory Change interfaces in accordance with methods and systems consistent with the subject matter described herein;

FIGS. 406A-B depict a data model for Inventory Change Message in accordance with methods and systems consistent with the subject matter described herein;

FIGS. 407A-D depict an element structure for the Inventory Change Message in accordance with methods and systems consistent with the subject matter described herein;

FIG. 408 depicts a message choreography for Sales Order Fulfillment interfaces in accordance with methods and systems consistent with the subject matter described herein;

FIGS. 409A-L depict a data model for Sales Order Fulfillment Message in accordance with methods and systems consistent with the subject matter described herein;

FIGS. 410A-M depict an element structure for Sales Order Fulfillment Message in accordance with methods and systems consistent with the subject matter described herein;

FIG. 411 depicts a message choreography for Delivery interfaces in accordance with methods and systems consistent with the subject matter described herein;

FIGS. 412A-C depict a data model for Despatched Delivery Notification Message in accordance with methods and systems consistent with the subject matter described herein;

FIG. 413 depicts a data model for Received Delivery Notification Message in accordance with methods and systems consistent with the subject matter described herein;

FIGS. 414A-N depict an element structure for Despatched Delivery Notification Message in accordance with methods and systems consistent with the subject matter described herein;

FIGS. 415A-C depict an element structure for Received Delivery Notification Message in accordance with methods and systems consistent with the subject matter described herein;

FIG. 416 depicts a message choreography for Invoice Accounting interfaces in accordance with methods and systems consistent with the subject matter described herein;

FIGS. 417A-C depict a data model for Invoice Accounting Message in accordance with methods and systems consistent with the subject matter described herein;

FIGS. 418A-E depict an element structure for Invoice Accounting Message in accordance with methods and systems consistent with the subject matter described herein;

FIG. 419 depicts a message choreography for Delivery Execution Request interfaces in accordance with methods and systems consistent with the subject matter described herein;

FIGS. 420A-L depict a data model for Delivery Execution Request Message in accordance with methods and systems consistent with the subject matter described herein;

FIGS. 421A-K depict an element structure for the Delivery Execution Request Message in accordance with methods and systems consistent with the subject matter described herein;

FIG. 422 depicts a message choreography for Delivery Schedule interfaces in accordance with methods and systems consistent with the subject matter described herein;

FIGS. 423A-C depict a data model for Delivery Schedule Message in accordance with methods and systems consistent with the subject matter described herein;

FIGS. 424A-V depict an element structure for the Delivery Schedule Message in accordance with methods and systems consistent with the subject matter described herein;

FIGS. 424AA-AU depict an element structure for the Delivery Schedule Notification Message in accordance with methods and systems consistent with the subject matter described herein;

FIGS. 424BA-BJ depict an element structure for the Delivery Schedule Confirmation Message in accordance with methods and systems consistent with the subject matter described herein;

FIG. 425 depicts a message choreography for Invoice Issued Information interfaces in accordance with methods and systems consistent with the subject matter described herein;

FIG. 426 depicts a data model for Invoice Issued Message in accordance with methods and systems consistent with the subject matter described herein;

FIGS. 427A-B depict an element structure for the Invoice Issued Message in accordance with methods and systems consistent with the subject matter described herein;

FIG. 428 depicts a message choreography for Product Activity interfaces in accordance with methods and systems consistent with the subject matter described herein;

FIG. 429 depicts a data model for Product Activity Message in accordance with methods and systems consistent with the subject matter described herein;

FIGS. 430A-L depict an element structure for the Product Activity Message in accordance with methods and systems consistent with the subject matter described herein;

FIG. 431 depicts a message choreography for Payment Due invoices in accordance with methods and systems consistent with the subject matter described herein;

FIGS. 432A-C depict a data model for Payment Due Message in accordance with methods and systems consistent with the subject matter described herein;

FIGS. 433A-D depict an element structure for Payment Due Message in accordance with methods and systems consistent with the subject matter described herein;

FIG. 434 depicts a message choreography for Order ID Assignment interfaces in accordance with methods and systems consistent with the subject matter described herein;

FIG. 435 depicts a data model for Order ID Assignment Message in accordance with methods and systems consistent with the subject matter described herein;

FIGS. 436A-E depict an element structure for the Order ID Assignment Message in accordance with methods and systems consistent with the subject matter described herein;

FIG. 437 depicts a message choreography for Product Demand Influencing Event interfaces in accordance with methods and systems consistent with the subject matter described herein;

FIG. 438 depicts a data model for ProductDemand Influencing Event Message in accordance with methods and systems consistent with the subject matter described herein;

FIGS. 439A-L depict an element structure for the Product-Demand Influencing Event Message in accordance with methods and systems consistent with the subject matter described herein;

FIG. 440 depicts a message choreography for Product Forecast interfaces in accordance with methods and systems consistent with the subject matter described herein;

FIG. 441 depicts a data model for Product Forecast Notification Message in accordance with methods and systems consistent with the subject matter described herein;

FIGS. 442A-J depict an element structure for the Product Forecast Notification Message in accordance with methods and systems consistent with the subject matter described herein;

FIG. 443 depicts a message choreography for Product Forecast Revision interfaces in accordance with methods and systems consistent with the subject matter described herein;

FIG. 444 depicts a data model for Product Forecast Revision Message in accordance with methods and systems consistent with the subject matter described herein;

FIGS. 445A-M depict an element structure for the Product Forecast Revision Message in accordance with methods and systems consistent with the subject matter described herein;

FIG. 446 depicts a message choreography for Replenishment Order interfaces in accordance with methods and systems consistent with the subject matter described herein;

FIGS. 447A-F depict the data model for Replenishment Order Message in accordance with methods and systems consistent with the subject matter described herein;

FIGS. 448A-FF depict an element structure for the Replenishment Order Message in accordance with methods and systems consistent with the subject matter described herein;

FIG. 449 depicts a message choreography for Vendor Generated Order interfaces in accordance with methods and systems consistent with the subject matter described herein;

FIGS. 450A-B depict the data model for the Vendor Generated Order Message in accordance with methods and systems consistent with the subject matter described herein;

FIGS. 451A-O depict an element structure for the Vendor Generated Order Message in accordance with methods and systems consistent with the subject matter described herein;

FIG. 452 depicts a message choreography for Bank Account Balance interfaces in accordance with methods and systems consistent with the subject matter described herein;

FIG. 453 depicts a data model for Bank Account Balance Report Query Message in accordance with methods and systems consistent with the subject matter described herein;

FIG. 454 depicts a data model for Bank Account Balance Report Response Message in accordance with methods and systems consistent with the subject matter described herein;

FIGS. 455A-B depict an element structure for the Bank Account Balance Report Response Message in accordance with methods and systems consistent with the subject matter described herein;

FIGS. 456A-B depict an element structure for the Bank Account Balance Report Query Message in accordance with methods and systems consistent with the subject matter described herein;

FIG. 457 depicts a message choreography for Bank Account Statement interfaces in accordance with methods and systems consistent with the subject matter described herein;

FIGS. 458A-E depict the data model for Bank Account Statement Message in accordance with methods and systems consistent with the subject matter described herein;

FIGS. 459A-I depict an element structure for the Bank Account Statement Message in accordance with methods and systems consistent with the subject matter described herein;

FIG. 460 depicts a message choreography for Business Transaction Document Image Recognition Request interfaces in accordance with methods and systems consistent with the subject matter described herein;

FIG. 461 depicts a data model for Business Transaction Document Image Recognition Request in accordance with methods and systems consistent with the subject matter described herein;

FIG. 462 depicts an element structure for the Business Transaction Document Image Recognition Request Message in accordance with methods and systems consistent with the subject matter described herein;

FIG. 463 depicts a message choreography for Collective Payment Order interfaces in accordance with methods and systems consistent with the subject matter described herein;

FIGS. 464A-F depict the data model for Collective Payment Order in accordance with methods and systems consistent with the subject matter described herein;

FIGS. 465A-F depict an element structure for the Collective Payment Order Message in accordance with methods and systems consistent with the subject matter described herein;

FIG. 466 depicts a message choreography for Credit Payment Behavior Summary interfaces in accordance with methods and systems consistent with the subject matter described herein;

FIG. 467 depicts a data model for Credit Payment Behavior Summary Message in accordance with methods and systems consistent with the subject matter described herein;

FIGS. 468A-H depict an element structure for the Credit Payment Behaviour Summary Message in accordance with methods and systems consistent with the subject matter described herein;

FIG. 469 depicts a message choreography for Customs Vendor Declaration interfaces in accordance with methods and systems consistent with the subject matter described herein;

FIG. 470 depicts a data model for the Customs Vendor Declaration Message in accordance with methods and systems consistent with the subject matter described herein;

FIGS. 471A-G depict an element structure for the Customs Vendor Declaration Message in accordance with methods and systems consistent with the subject matter described herein;

FIG. 472 depicts a message choreography for Invoice interfaces in accordance with methods and systems consistent with the subject matter described herein;

FIGS. 473A-D depict the data model for Supplier Invoice Information Message in accordance with methods and systems consistent with the subject matter described herein;

FIG. 474 depicts a data model for Supplier Invoice Settlement Release Request Message in accordance with methods and systems consistent with the subject matter described herein;

FIG. 475 depicts a data model for Supplier Invoice Cancellation Execution Request Message in accordance with methods and systems consistent with the subject matter described herein;

FIGS. 476A-D depict the data model for Invoice Message in accordance with methods and systems consistent with the subject matter described herein;

FIGS. 477A-J depict an element structure for the Invoice Message in accordance with methods and systems consistent with the subject matter described herein;

FIG. 478 depicts a message choreography for Loan Contract interfaces in accordance with methods and systems consistent with the subject matter described herein;

FIG. 479 depicts a data model for Loan Calculation Query Message in accordance with methods and systems consistent with the subject matter described herein;

FIG. 480 depicts a data model for Loan Calculation Message in accordance with methods and systems consistent with the subject matter described herein;

FIGS. 481A-C depict the data model for the Loan Contract in accordance with methods and systems consistent with the subject matter described herein;

FIG. 482 depicts a data model for Loan Contract Create Confirmation Message in accordance with methods and systems consistent with the subject matter described herein;

FIGS. 483A-E depicts an element structure for Loan Contract Create Request Message in accordance with methods and systems consistent with the subject matter described herein;

FIGS. 484A-B depicts an element structure for the Loan Calculation Message in accordance with methods and systems consistent with the subject matter described herein;

FIG. 485A depicts an element structure for the Loan Contract Create Confirmation Message in accordance with methods and systems consistent with the subject matter described herein;

FIGS. 486A-B depict an element structure for the Loan Calculation Query Message in accordance with methods and systems consistent with the subject matter described herein;

FIG. 487 depicts a message choreography for Purchase Request interfaces in accordance with methods and systems consistent with the subject matter described herein;

FIGS. 488A-D depict the data model for Purchase Request Message in accordance with methods and systems consistent with the subject matter described herein;

FIG. 489 depicts a data model for Purchase Request Confirmation Message in accordance with methods and systems consistent with the subject matter described herein;

FIGS. 490A-J depict an element structure for the Purchase Request Message in accordance with methods and systems consistent with the subject matter described herein;

FIGS. 491A-B depict an element structure for the Purchase Request Confirmation Message in accordance with methods and systems consistent with the subject matter described herein;

FIG. 492 depicts a message choreography for Purchasing Contract interfaces in accordance with methods and systems consistent with the subject matter described herein;

FIGS. 493A-D depict the data model for the Purchasing Contract Use Message in accordance with methods and systems consistent with the subject matter described herein;

FIG. 494 depicts a data model for the Purchasing Contract Release Message in accordance with methods and systems consistent with the subject matter described herein;

FIGS. 495A-D depict an element structure for the Purchasing Contract Release Message in accordance with methods and systems consistent with the subject matter described herein;

FIGS. 496A-J depict an element structure for the Purchasing Contract Message in accordance with methods and systems consistent with the subject matter described herein;

FIG. 497 depicts a message choreography for Replenishment Order Proposal interfaces in accordance with methods and systems consistent with the subject matter described herein;

FIGS. 498A-C depict the data model for Replenishment Order Proposal Message in accordance with methods and systems consistent with the subject matter described herein;

FIGS. 499A-I depict an element structure for the Replenishment Order Proposal Request Message in accordance with methods and systems consistent with the subject matter described herein;

FIGS. 499AA-AM depict an element structure for the Replenishment Order Proposal Confirmation Message in accordance with methods and systems consistent with the subject matter described herein;

FIG. 500 depicts a message choreography for Return Delivery Instruction interfaces in accordance with methods and systems consistent with the subject matter described herein;

FIGS. 501A-C depict the data model for the Return Delivery Instruction Message in accordance with methods and systems consistent with the subject matter described herein;

FIGS. 502A-L depict an element structure for the Return Delivery Instruction Notification in accordance with methods and systems consistent with the subject matter described herein;

FIG. 503 depicts a message choreography for RFQ Legal Document interfaces in accordance with methods and systems consistent with the subject matter described herein;

FIGS. 504A-L depict the data model for the RFQ Legal Document Message in accordance with methods and systems consistent with the subject matter described herein;

FIGS. 505A-M depict an element structure for the RFQ Legal Document Message in accordance with methods and systems consistent with the subject matter described herein;

FIG. 506 depicts a message choreography for Supply Chain Exception interfaces in accordance with methods and systems consistent with the subject matter described herein;

FIGS. 507A-C depict the data model for Supply Chain Exception Report Message in accordance with methods and systems consistent with the subject matter described herein;

FIGS. 508A-P depict an element structure for the Supply Chain Exception Report Message in accordance with methods and systems consistent with the subject matter described herein;

FIG. 509 depicts a message choreography for VATDeclaration interfaces in accordance with methods and systems consistent with the subject matter described herein;

FIG. 510 depicts a data model for VATDeclaration Message in accordance with methods and systems consistent with the subject matter described herein;

FIGS. 511A-F depict an element structure for the VATDeclaration Message in accordance with methods and systems consistent with the subject matter described herein;

FIGS. 512A-E depict an element structure for the VATDeclaration Request Message in accordance with methods and systems consistent with the subject matter described herein; and, FIGS. 513A-D depict an element structure for the VATDeclaration Confirmation Message in accordance with methods and systems consistent with the subject matter described herein.

VI. DETAILED DESCRIPTION

Reference will now be made in detail to an implementation consistent with the subject matter described herein as illustrated in the accompanying drawings. Wherever possible, the same reference numbers will be used throughout the drawings and the following description to refer to the same or like parts.

A. Overview

Methods and systems consistent with the subject matter described herein facilitate e-commerce by providing consistent interfaces that are suitable for use across industries, across businesses, and across different departments within a business during a business transaction. To generate consistent interfaces, methods and systems consistent with the subject matter described herein utilize a business object model, which reflects the data that will be used during a given business transaction. An example of a business transaction is the exchange of purchase orders and order confirmations between a buyer and a seller. The business object model is generated in a hierarchical manner to ensure that the same type of data is represented the same way throughout the business object model. This ensures the consistency of the information in the business object model. Consistency is also reflected in the semantic meaning of the various structural elements. That is, each structural element has a consistent business meaning. For example, the location entity, regardless of in which package it is located, refers to a location.

From this business object model, various interfaces are derived to accomplish the functionality of the business transaction. Interfaces provide an entry point for components to access the functionality of an application. For example, the interface for a Purchase Order Request provides an entry point for components to access the functionality of a Purchase Order, in particular, to transmit and/or receive a Purchase Order Request. One skilled in the art will recognize that each of these interfaces may be provided, sold, distributed, utilized, or marketed as a separate product or as a major component of a separate product. Alternatively, a group of related interfaces may be provided, sold, distributed, utilized, or marketed as a product or as a major component of a separate product. Because the interfaces are generated from the business object model, the information in the interfaces is consistent, and the interfaces are consistent among the business entities. Such consistency facilitates heterogeneous business entities in cooperating to accomplish the business transaction.

Figure 1A:
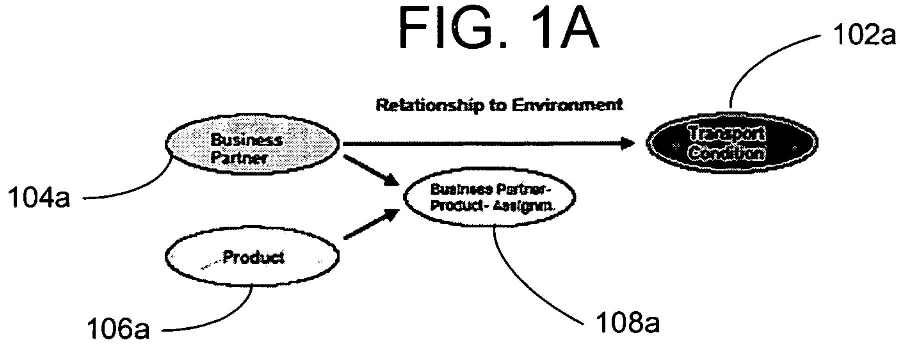
FIG. 1 depicts a flow diagram of the overall steps performed by methods and systems consistent with the subject matter described herein.
Figure 1B:
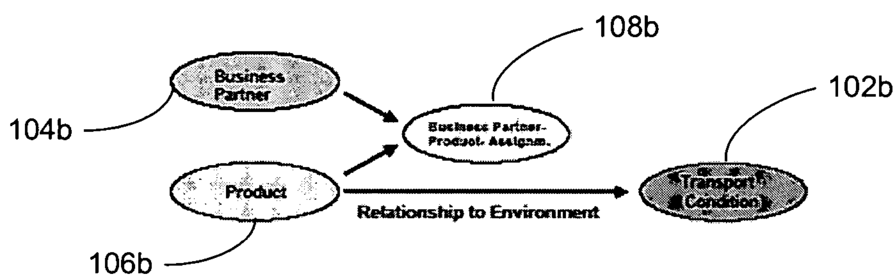
Figure 1C:
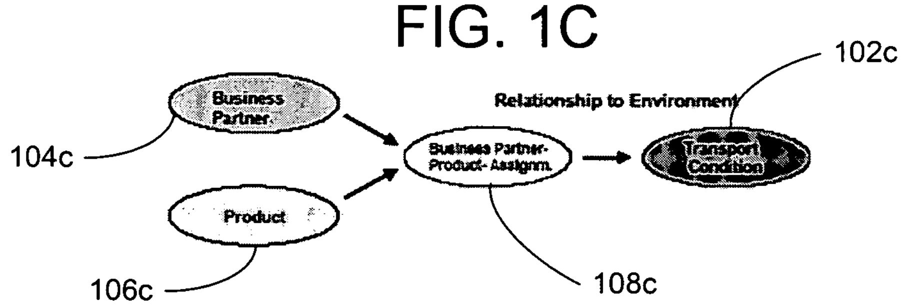

Without cross-component consistency, different conceptual approaches lead to different interface structures, resulting in incompatible interfaces. For example, FIGS. 1A-C depict three different approaches to a transport condition 102*a*, 102*b*, 102*c*, which specifies how products are to be transported. The transport condition 102*a*, 102*b*, 102*c*, considers a business partner 104*a*, 104*b*, 104*c*, a product 106*a*, 106*b*, 106*c*, and a combination of the business partner and the product 108*a*, 108*b*, 108*c*.

As depicted in FIG. 1A, the transport condition 102*a* may depend on the business partner 104*a*. Alternatively, as depicted in FIG. 1B, the transport condition 102*b* may depend on the product 106*b*. As a third alternative, the transport condition 102*c* may depend on the combination of the business partner and the product 108*c*. These three conceptual models represent three different object models that may be used to derive interfaces.

Figure 1D:
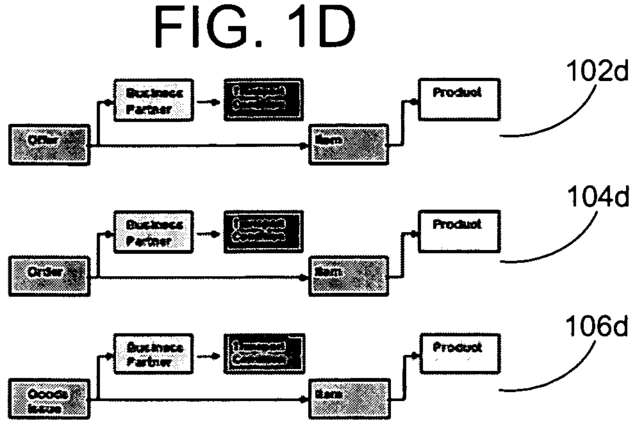
Figure 1E:
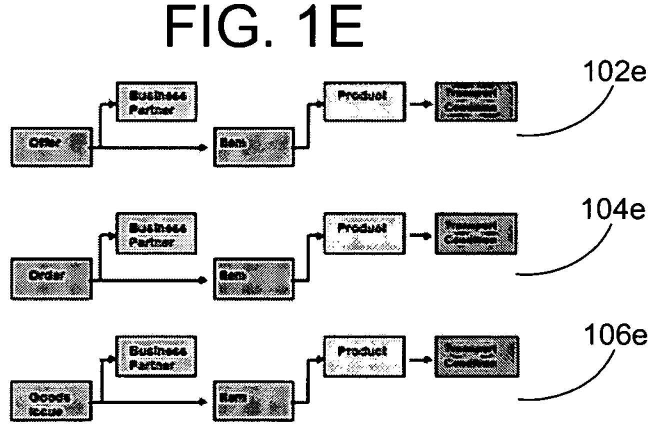
Figure 1F:
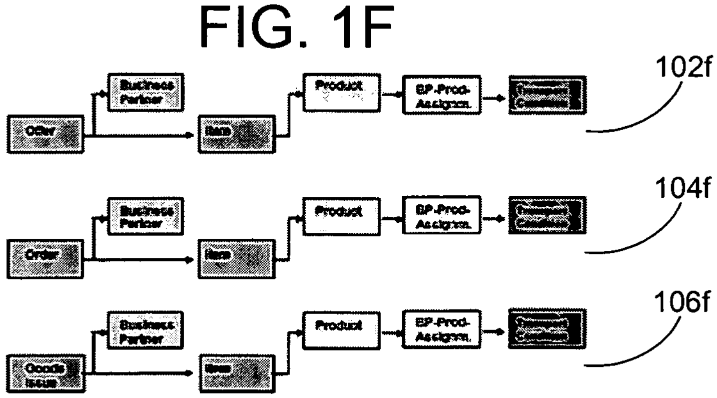
Figure 1G:
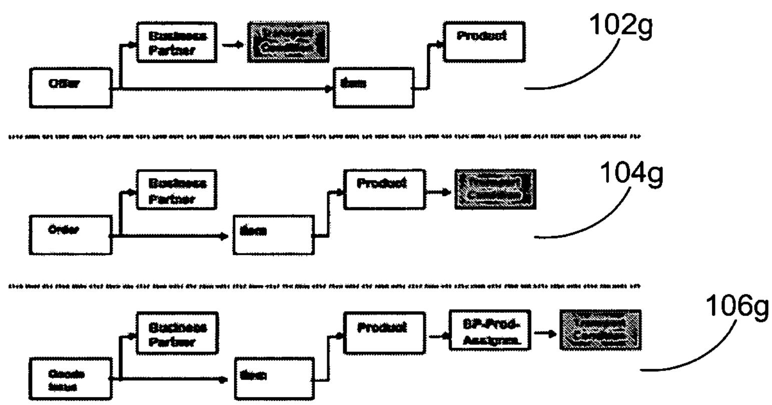

FIGS. 1D-F depict the resulting consistent interfaces from these object models. In particular, FIG. 1D depicts an interface for quotations 102*d*, an interface for purchase orders 104*d* and an interface for goods issued 106*d* derived using the conceptual model depicted in FIG. 1A. FIG. 1E depicts these same respective interfaces 102*e*, 104*e*, 106*e* derived using the conceptual model depicted in FIG. 1B. FIG. 1F depicts these same respective interfaces 102*f*, 104*f*, 106*f* derived using the conceptual model depicted in FIG. 1C. As depicted in FIG. 1G, inconsistent interfaces 102*g*, 104*g*, 106*g* result without a cross-component understanding of a transport condition.

Figure 1:
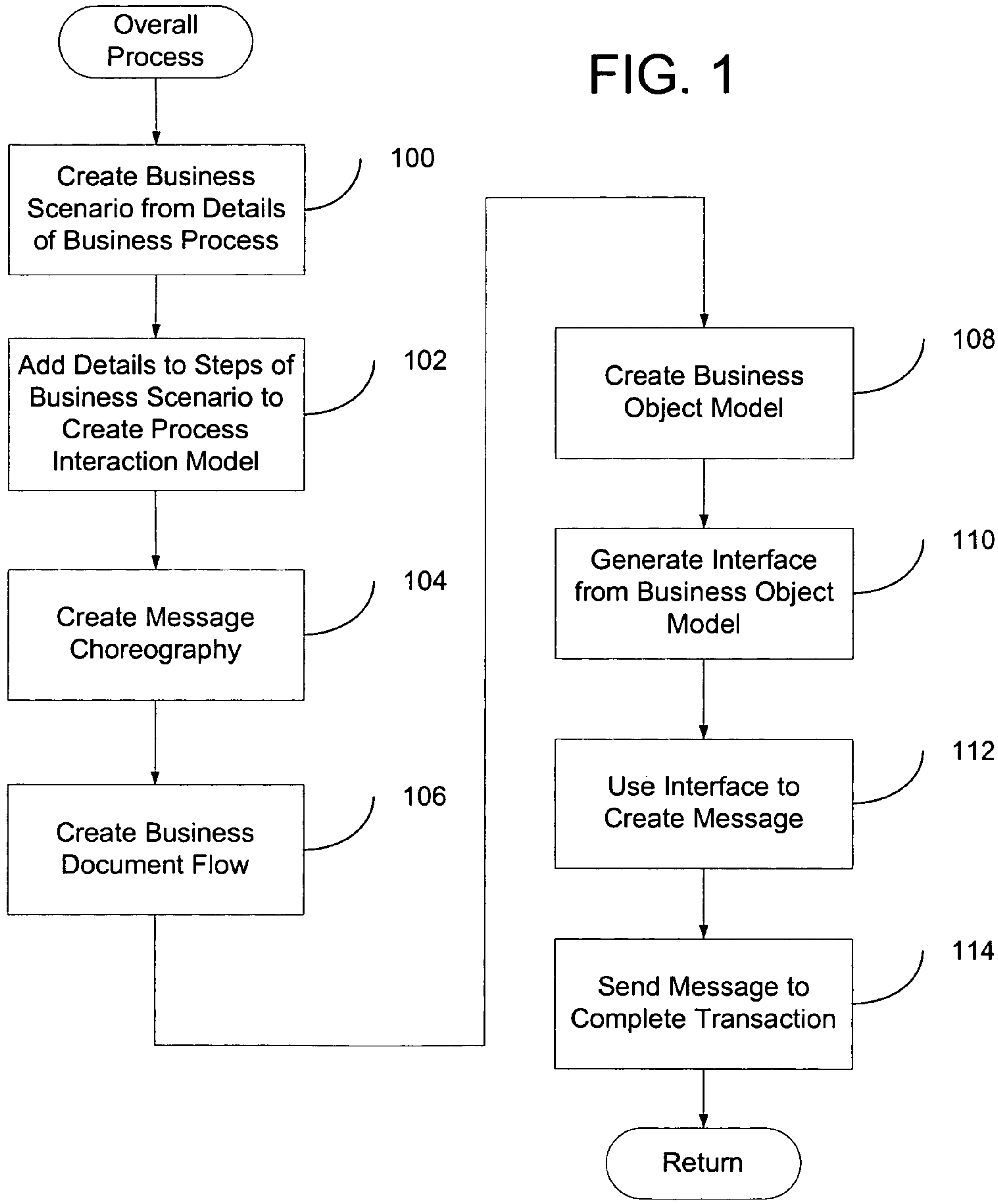
Figure 2:
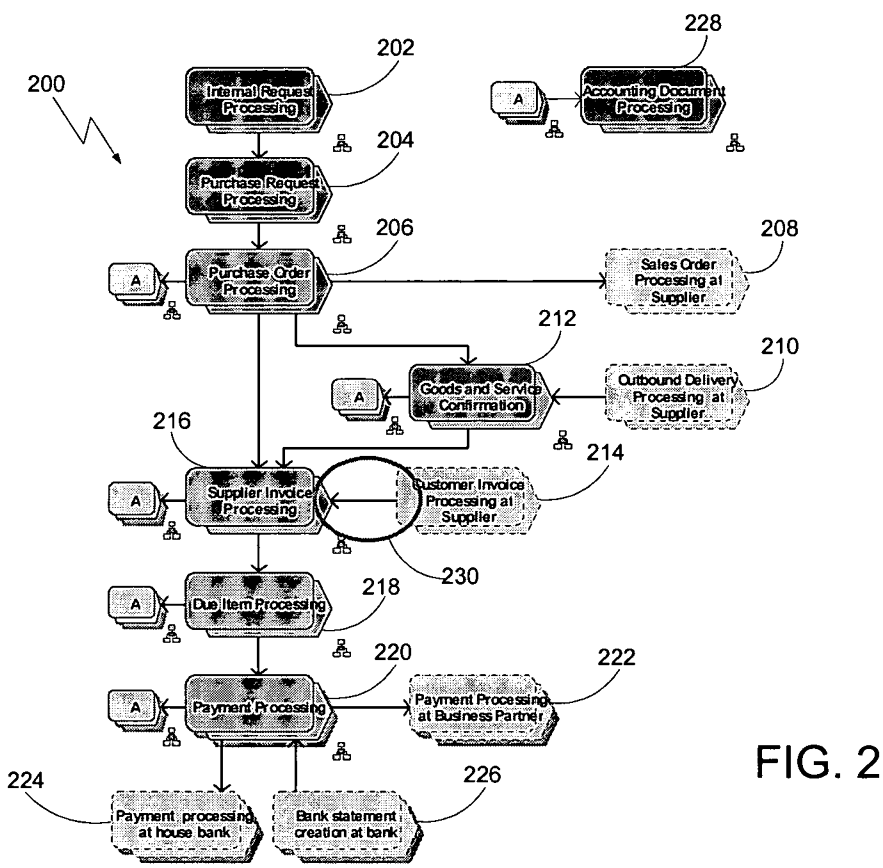
FIG. 2 depicts a scenario variant model in accordance with methods and systems consistent with the subject matter described herein.

FIG. 1 depicts a flow diagram of the overall steps performed by methods and systems consistent with the subject matter described herein. Initially, to generate the business object model, design engineers study the details of a business process, and model the business process using a "business scenario" (step 100). The business scenario identifies the steps performed by the different business entities during a business process. Thus, the business scenario is a complete representation of a clearly defined business process. For example, in FIG. 2, a scenario variant model is used to depict an illustrative business scenario for a Maintenance Repair Operation ("MRO") Procurement 200. The developers use these scenario variant models to depict the individual process steps performed by the business entities during the business process.

For an MRO Procurement, the customer initially processes an internal request (step 202). The internal request corresponds to the customer's internal documentation for the requested maintenance or repair. The customer then processes a purchase request (step 204). The purchase request corresponds to the customer's internal documentation for a specific product or service related to the maintenance or repair. Next, the customer processes a purchase order (step 206), which is sent to the supplier. This prompts the supplier to process a sales order (step 208). The sales order is the supplier's internal documentation regarding the requested product or service. After processing the sales order, the supplier processes an outbound delivery (step 210), which is the supplier's internal documentation identifying the products or services that will be provided to the customer. The supplier then sends a goods and services confirmation to the customer (step 212). Next, the supplier processes a customer invoice (step 214) and sends the invoice to the customer. Upon receiving the invoice, the customer processes the supplier invoice (step 216). The customer also processes a due item (step 218). The due item summarizes the information regarding the product or service ordered by the customer. Next, the customer processes the payment (step 220) by sending the payment information to the business partner and sending the payment information to the house bank. After receiving the payment information, the business partner processes the payment (step 222), and the bank processes the payment (step 224). The bank also creates a bank statement (step 226) and forwards the bank statement information to the customer. During the MRO Procurement, the customer also processes an accounting document (step 228). The accounting document is the customer's internal documentation regarding the payment to the supplier.

Figure 3:
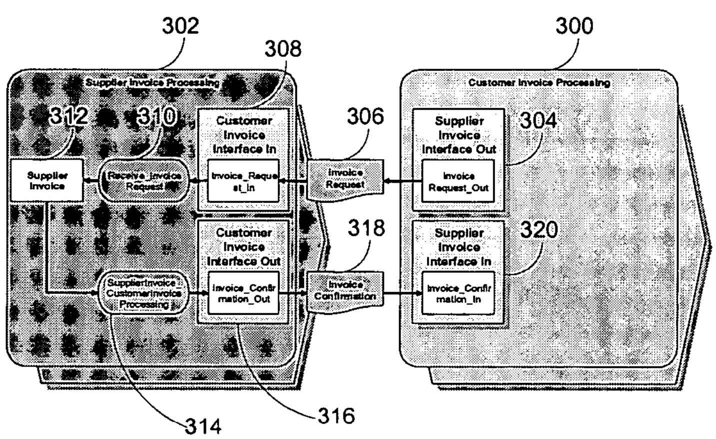
FIG. 3 depicts a process interaction model for invoice processing in accordance with methods and systems consistent with the subject matter described herein.

Returning to the overall process in FIG. 1, after creating the business scenario, the developers add details to each step of the business scenario (step 102). In particular, for each step of the business scenario, the developers identify the complete process steps performed by each business entity. A discrete portion of the business scenario reflects a "business transaction," and each business entity is referred to as a "component" of the business transaction. The developers also identify the messages that are transmitted between the components. A "process interaction model" represents the complete process steps between two components. For example, FIG. 3 depicts the process interaction model for the invoice processing 230 between the supplier 300, which processes the customer invoice, and the customer 302, which processes the supplier invoice.

The supplier uses an Invoice Request Out interface 304 to send an Invoice Request message 306 to the customer. The customer uses the Invoice Request In interface 308 to receive the Invoice Request message (step 310), and to create an internal instantiation of the supplier invoice 312. The customer processes the supplier invoice (step 314), and uses an Invoice Confirmation Out interface 316 to send an Invoice Confirmation 318 to the supplier. The supplier uses an Invoice Confirmation In interface 320 to receive the Invoice Confirmation 318.

Returning to FIG. 1, after creating the process interaction model, the developers create a "message choreography" (step 104), which depicts the messages transmitted between the two components in the process interaction model. The developers then represent the transmission of the messages between the components during a business process in a "business document flow" (step 106). Thus, the business document flow illustrates the flow of information between the business entities during a business process.

Figure 4:
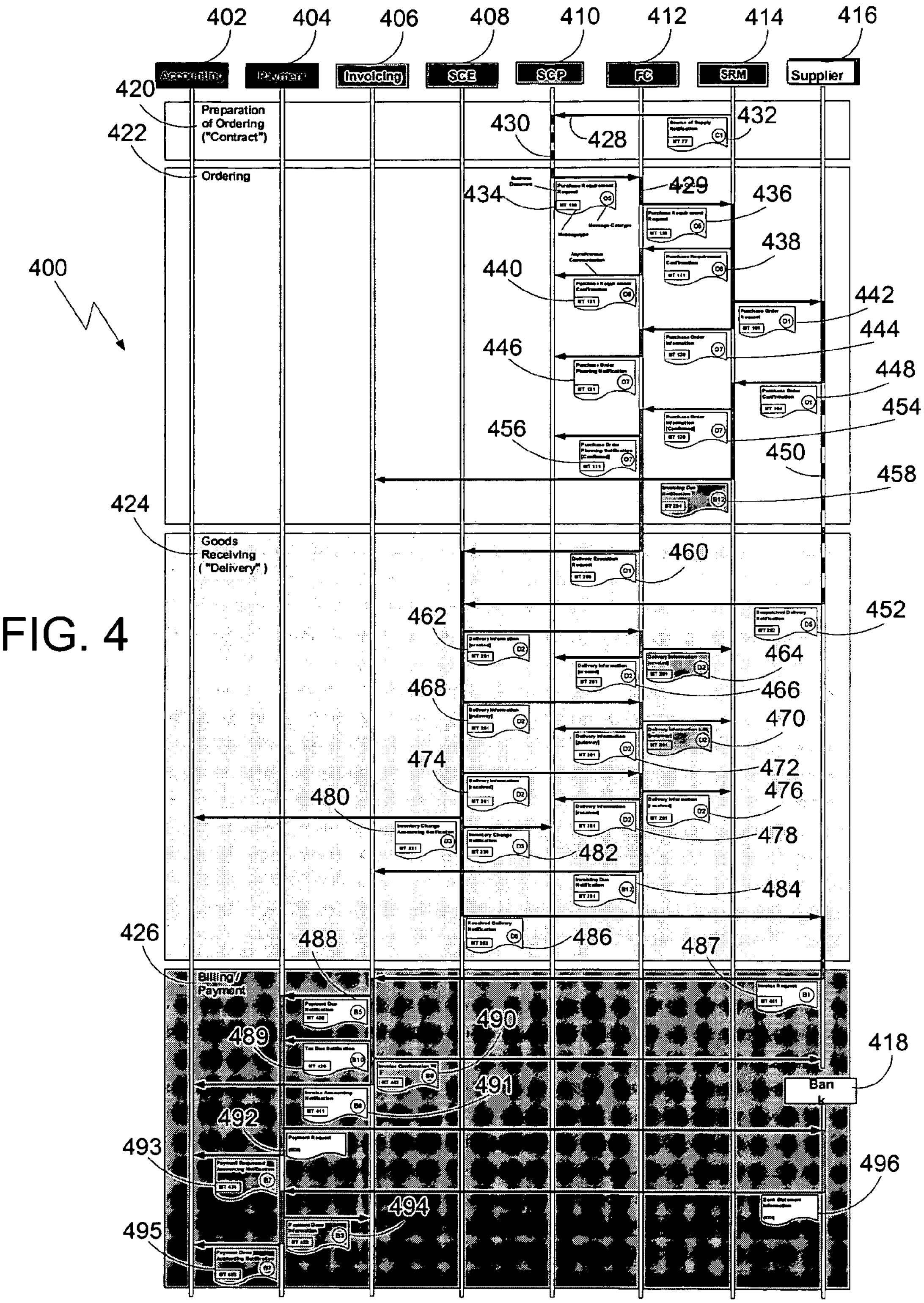
FIG. 4 depicts a business document flow for an invoice request in accordance with methods and systems consistent with the subject matter described herein.

FIG. 4 depicts an exemplary business document flow 400 for the process of purchasing a product or service. The business entities involved with the illustrative purchase process include Accounting 402, Payment 404, Invoicing 406, Supply Chain Execution ("SCE") 408, Supply Chain Planning ("SCP") 410, Fulfillment Coordination ("FC") 412, Supply Relationship Management ("SRM") 414, Supplier 416, and Bank 418. The business document flow 400 is divided into four different transactions: Preparation of Ordering ("Contract") 420, Ordering 422, Goods Receiving ("Delivery") 424, and Billing/Payment 426. In the business document flow, arrows 428 represent the transmittal of documents. Each document reflects a message transmitted between entities. One of ordinary skill in the art will appreciate that the messages transferred may be considered to be a communications protocol. The process flow follows the focus of control, which is depicted as a solid vertical line (e.g., 429) when the step is required, and a dotted vertical line (e.g., 430) when the step is optional.

During the Contract transaction 420, the SRM 414 sends a Source of Supply Notification 432 to the SCP 410. This step is optional, as illustrated by the optional control line 430 coupling this step to the remainder of the business document flow 400.

During the Ordering transaction 422, the SCP 410 sends a Purchase Requirement Request 434 to the FC 412, which forwards a Purchase Requirement Request 436 to the SRM 414. The SRM 414 then sends a Purchase Requirement Confirmation 438 to the FC 412, and the FC 412 sends a Purchase Requirement Confirmation 440 to the SCP 410. The SRM 414 also sends a Purchase Order Request 442 to the Supplier 416, and sends Purchase Order Information 444 to the FC 412. The FC 412 then sends a Purchase Order Planning Notification 446 to the SCP 410. The Supplier 416, after receiving the Purchase Order Request 442, sends a Purchase Order Confirmation 448 to the SRM 414, which sends a Purchase Order Information confirmation message 454 to the FC 412, which sends a message 456 confirming the Purchase Order Planning Notification to the SCP 410. The SRM 414 then sends an Invoice Due Notification 458 to Invoicing 406.

During the Delivery transaction 424, the FC 412 sends a Delivery Execution Request 460 to the SCE 408. The Supplier 416 could optionally 450 send a Despatched Delivery Notification 452 to the SCE 408. The SCE 408 then sends a message 462 to the FC 412 notifying the FC 412 that the request for the Delivery Information was created. The FC 412 then sends a message 464 notifying the SRM 414 that the request for the Delivery Information was created. The FC 412 also sends a message 466 notifying the SCP 410 that the request for the Delivery Information was created. The SCE 408 sends a message 468 to the FC 412 when the goods have been set aside for delivery. The FC 412 sends a message 470 to the SRM 414 when the goods have been set aside for delivery. The FC 412 also sends a message 472 to the SCP 410 when the goods have been set aside for delivery.

The SCE 408 sends a message 474 to the FC 412 when the goods have been delivered. The FC 412 then sends a message 476 to the SRM 414 indicating that the goods have been delivered, and sends a message 478 to the SCP 410 indicating that the goods have been delivered. The SCE 408 then sends an Inventory Change Accounting Notification 480 to Accounting 402, and an Inventory Change Notification 482 to the SCP 410. The FC 412 sends an Invoice Due Notification 484 to Invoicing 406, and SCE 408 sends a Received Delivery Notification 486 to the Supplier 416.

During the Billing/Payment transaction 426, the Supplier 416 sends an Invoice Request 487 to Invoicing 406. Invoicing 406 then sends a Payment Due Notification 488 to Payment 404, a Tax Due Notification 489 to Payment 404, an Invoice Confirmation 490 to the Supplier 416, and an Invoice Accounting Notification 491 to Accounting 402. Payment 404 sends a Payment Request 492 to the Bank 418, and a Payment Requested Accounting Notification 493 to Accounting 402. Bank 418 sends a Bank Statement Information 496 to Payment 404. Payment 404 then sends a Payment Done Information 494 to Invoicing 406 and a Payment Done Accounting Notification 495 to Accounting 402.

Within a business document flow, business documents having the same or similar structures are marked. For example, in the business document flow 400 depicted in FIG. 4, Purchase Requirement Requests 434, 436 and Purchase Requirement Confirmations 438, 440 have the same structures. Thus, each of these business documents is marked with an "O6." Similarly, Purchase Order Request 442 and Purchase Order Confirmation 448 have the same structures. Thus, both documents are marked with an "O1." Each business document or message is based on a message type. The message type is identified within the rectangle within each of the business documents depicted in the business document flow. For example, Source of Supply Notification 432 is based on message type 77, as reflected by "MT 77." A list of various message types with their corresponding codes and a description of each message type is provided below.

| Code | Name | Description |
|---|---|---|
| 0077 | Source of Supply Notification | A SourceOfSupplyNotification is a notice to Supply Chain Planning about available sources of supply. |
| 0080 | Catalogue Update Notification | A CatalogueUpdateNotification is a notice from a catalogue provider to an interested party about a new catalogue transmitted in the message or about changes to an existing catalogue transmitted in the message. |
| 0081 | Catalogue Publication Request | A CataloguePublicationRequest is a request from catalogue authoring to the Catalogue Search Engine (the publishing system) to publish a new or changed catalogue or to delete an already published catalogue (the catalogue is possibly split into several transmission packages). |

-continued

| Code | Name | Description |
|---|---|---|
| 0082 | CataloguePublication TransmissionPackage Notification | A CataloguePublicationTransmissionPackageNotification is the notification of the Catalogue Search Engine (the publishing system) to Catalogue Authoring about a package of a catalogue publication transmission and information about the reception of this package and the validity of its content. |
| 0083 | CataloguePublication Confirmation | A CataloguePublicationConfirmation is the confirmation of the Catalogue Search Engine (the publishing system) to Catalogue Authoring whether the publication or deletion of a catalogue requested by a CataloguePublicationRequest was successful or not. |
| 0084 | CataloguePublication Transmission CancellationRequest | A CataloguePublicationTransmissionCancellationRequest is the request of Catalogue Authoring to Catalogue Search Engine (the publishing system) to cancel the transmission of a catalogue and to restore an earlier published state (if such exists) of the catalogue. Moreover, no more packages are sent for this transmission. |
| 0085 | CataloguePublication TransmissionCancellation Confirmation | A CataloguePublicationTransmissionCancellationConfirmation is the confirmation of Catalogue Search Engine (the publishing system) whether the transmission of a catalogue has been cancelled successfully and an earlier published state of this catalogue (if such exists) has been restored or not. |
| 0086 | CataloguePublication TransmissionItemLock Request | A CataloguePublicationTransmissionItemLockRequest is the request of Catalogue Authoring to lock single items of the catalogue contained in the catalogue publication transmission. |
| 0087 | Catalogue Publication Transmission Item Lock Confirmation | A CataloguePublicationTransmissionItemLockConfirmation is the confirmation of Catalogue Search Engine (the publishing system) to Catalogue Authoring whether single items of the catalogue contained in the catalogue publication transmission could be locked or not. To lock means that if the catalogue is not yet published the items must not be published and if the catalogue is already published, the publication of these items must be revoked. |
| 0101 | Purchase Order Request | A PurchaseOrderRequest is a request from a purchaser to a seller to deliver goods or provide services. |
| 0102 | Purchase Order Change Request | A PurchaseOrderChangeRequest is a change to a purchaser's request to the seller to deliver goods or provide services. |
| 0103 | Purchase Order Cancellation Request | A PurchaseOrderCancellationRequest is the cancellation of a purchaser's request to the seller to deliver goods or provide services. |
| 0104 | Purchase Order Confirmation | A PurchaseOrderConfirmation is a confirmation, partial confirmation, or change from a seller to the purchaser, regarding the requested delivery of goods or provision of services. |
| 0120 | Purchase Order Information | A PurchaseOrderInformation is information from a purchasing system for interested recipients about the current state of a purchase order when creating or changing a purchase order, confirming a purchase order or canceling a purchase order. |
| 0121 | Purchase Order Planning Notification | A PurchaseOrderPlanningNotification is a message by means of which planning applications are notified about those aspects of a purchase order that are relevant for planning. |
| 0130 | Purchase Requirement Request | A PurchaseRequirementRequest is a request from a requestor to a purchaser to (externally) procure products (materials, services) (external procurement). |
| 0131 | Purchase Order Requirement Confirmation | A PurchaseRequirementConfirmation is a notice from the purchaser to the requestor about the degree of fulfillment of a requirement. |
| 0140 | Product Demand Influencing Event Notification | A ProductDemandInfluencingEventNotification is a notification about an event which influences the supply or demand of products. |
| 0141 | Product Forecast Notification | A ProductForecastNotification is a notification about future product demands (forecasts). |
| 0142 | Product Forecast Revision Notification | A ProductForecastRevisionNotification is a notification about the revision of future product demands (forecasts). |
| 0145 | Product Activity Notification | A ProductActivityNotification is a message which communicates product-related activities of a buyer to a vendor. Based on this, the vendor can perform supply planning for the buyer. |
| 0151 | RFQ Request | An RFQRequest is the request from a purchaser to a bidder to participate in a request for quotation for a product. |
| 0152 | RFQ Change Request | An RFQChangeRequest is a change to the purchaser's request for a bidder to participate in the request for quotation for a product. |

-continued

| Code | Name | Description |
|---|---|---|
| 0153 | RFQ Cancellation Request | An RFQCancellationRequest is a cancellation by the purchaser of a request for quotation for a product. |
| 0154 | RFQ Result Notification | An RFQResultNotification is a notification by a purchaser to a bidder about the type and extent of the acceptance of a quote or about the rejection of the quote. |
| 0155 | Quote Notification | A QuoteNotification is the quote of a bidder communicated to a purchaser concerning the request for quotation for a product by the purchaser. |
| 0160 | Sales Order Fulfillment Request | A SalesOrderFulfillmentRequest is a request (or change or cancellation of such a request) from a selling component to a procuring component, to fulfill the logistical requirements (e.g., available-to-promise check, scheduling, requirements planning, procurement, and delivery) of a sales order. |
| 0161 | Sales Order Fulfillment Confirmation | A SalesOrderFulfillmentConfirmation is a confirmation, partial confirmation or change from the procuring component to the selling component, regarding a sales order with respect to which procurement has been requested. |
| 0185 | Order ID Assignment Notification | An OrderIDAssignmentNotification is a message that allows a buyer to assign a vendor order numbers for identifying "purchase orders generated by the vendor." |
| 0200 | Delivery Execution Request | A DeliveryExecutionRequest is a request to a warehouse or supply chain execution to prepare and execute the outbound delivery of goods or the acceptance of an expected or announced inbound delivery. |
| 0201 | Delivery Information | A DeliveryInformation is a message about the creation, change, and execution status of a delivery. |
| 0202 | Despatched Delivery Notification | A DespatchedDeliveryNotification is a notification communicated to a product recipient about the planned arrival, pickup, or issue date of a ready-to-send delivery, including details about the content of the delivery. |
| 0203 | Received Delivery Notification | A ReceivedDeliveryNotification is a notification communicated to a vendor about the arrival of the delivery sent by him to the product recipient, including details about the content of the delivery. |
| 0210 | Delivery Schedule Notification | A DeliveryScheduleNotification is a message that is sent from a buyer to a vendor to notify the latter about the quantity of a product to be delivered with a certain liability at a certain date in accordance with a given scheduling agreement between buyer and vendor. |
| 0213 | Vendor Generated Order Notification | A VendorGeneratedOrderNotification is a message that is used by a vendor/seller to transfer the replenishment order that he has initiated and planned to a customer/buyer so that the latter can create a purchase order. The notification sent by the vendor/seller to the customer/buyer regarding the planned replenishment order can be regarded as a "purchase order generated by the seller." |
| 0214 | Vendor Generated Order Confirmation | VendorGeneratedOrderConfirmation is the confirmation from a customer/buyer that a purchase order has been created for the replenishment order initiated and planned by his vendor/seller.<br>This confirmation from the customer/buyer for a "purchase order generated by the seller" can be regarded as a "purchase order" in the traditional sense, which, in turn, triggers the corresponding fulfillment process at the vendor/seller. |
| 0216 | Replenishment Order Notification. | A ReplenishmentOrderNotification is a message that is used by Logistics Planning (SCP, vendor) to transfer a replenishment order planned for a customer/buyer to Logistics Execution (SCE, vendor) in order to trigger further processing for the order and prepare the outbound delivery. |
| 0217 | Replenishment Order Confirmation | A ReplenishmentOrderConfirmation is a message that is used by Logistics Execution (SCE, vendor) to confirm to Logistics Planning (SCP, vendor) that a replenishment order that is planned for a customer/buyer can be fulfilled. |
| 0240 | Service Acknowledgement Request | A ServiceAcknowledgementRequest is a request by a seller to a purchaser to confirm the services recorded. |
| 0241 | Service Acknowledgement Confirmation | A ServiceAcknowledgementConfirmation is a confirmation (or rejection) of the services recorded. |
| 0250 | Inventory Change Notification | An InventoryChangeNotification is a summery of detailed information about inventory changes in inventory management, which is required for logistics planning. |
| 0251 | Inventory Change Accounting Notification | An InventoryChangeAccountingNotification is a summary of aggregated information about inventory changes in inventory management, which is required for financials. |

-continued

| Code | Name | Description |
|---|---|---|
| 0252 | Inventory Change Accounting Cancellation Request | An InventoryChangeAccountingCancellationRequest is a request for the full cancellation of posting information previously sent to financials with respect to a goods movement. |
| 0290 | Billing Due Notification | A BillingDueNotification is a notification about billing-relevant data communicated to an application in which the subsequent operative processing of billing takes place. |
| 0291 | Invoicing Due Notification | An InvoicingDueNotification is a notification about invoicing-relevant data communicated to an application in which the operative verification and creation of invoices takes place, and/or in which "self billing" invoices (evaluated receipt settlement) are created. |
| 0401 | Invoice Request | An InvoiceRequest is a legally binding notice about accounts receivable or accounts payable for delivered goods or provided services - typically a request that payment be made for these goods or services. |
| 0402 | Invoice Confirmation | An InvoiceConfirmation is the response of a recipient of an invoice to the bill-from-party by which the invoice as a whole is confirmed, rejected, or classified as "not yet decided." |
| 0410 | Invoice Issued Information | An InvoiceIssuedInformation is information about provided services, delivered products, or credit or debit memo request items that have been billed, the items of an invoice that have been used for this, and the extent to which they have been billed. |
| 0411 | Invoice Accounting Notification | An InvoiceAccountingNotification is a notification to financials about information on incoming or outgoing invoices from invoice verification or billing. |
| 0412 | Invoice Accounting Cancellation Request | An InvoiceAccountingCancellationRequest is a request for the full cancellation of posting information previously sent to financials, regarding an incoming or outgoing invoice or credit memo. |
| 0420 | Tax Due Notification | A TaxDueNotification communicates data from tax determination and calculation relevant for tax reports and tax payments to the tax register of a company. |
| 0430 | Payment Due Notification | A PaymentDueNotification notifies an application (Payment), in which subsequent operative processing of payments take place, about due dates (accounts receivable and accounts payable) of business partners. |
| 0450 | Credit Agency Report Query | A CreditAgencyReportQuery is an inquiry to a credit agency concerning the credit report for a business partner. |
| 0451 | Credit Agency Report Response | A CreditAgencyReportResponse is a response from a credit agency concerning the inquiry about the credit report for a business partner. |
| 0452 | Credit Worthiness Query | A CreditWorthinessQuery is an inquiry to credit management concerning the credit worthiness of a business partner. |
| 0453 | Credit Worthiness Response | A CreditWorthinessResponse is a response from credit management concerning the inquiry about the credit worthiness of a business partner. |
| 0454 | Credit Worthiness Change Information | A CreditWorthinessChangeInformation is information about changes of the credit worthiness of a business partner. |
| 0455 | Credit Commitment Query | A CreditCommitmentQuery is an inquiry from credit management concerning existing payment obligations of a business partner. |
| 0456 | Credit Commitment Response | A CreditCommitmentResponse is a response concerning an inquiry from credit management about existing payment obligations of a business partner. |
| 0457 | Credit Commitment Record Notification | A CreditCommitmentRecordNotification is a notice to credit management about existing payment obligations of business partners. |
| 0458 | Credit Worthiness Critical Parties Query | A CreditWorthinessCriticalPartiesQuery is an inquiry to credit management about business partners, for which the credit worthiness has been rated as critical. |
| 0459 | Credit Worthiness Critical Parties Response | A CreditWorthinessCriticalPartiesResponse is a response from credit management concerning an inquiry about business partners, for which the credit worthiness has been rated as critical. |
| 0460 | Credit Payment Record Notification | A CreditPaymentRecordNotification is a notice to credit management about the payment behavior of business partners. |
| 0601 | Personnel Time Sheet Information | A PersonnelTimeSheetInformation communicates recorded personnel times and personnel time events from an upstream personnel time recording system to personnel time management. |

From the business document flow, the developers identify the business documents having identical or similar structures, and use these business documents to create the business object model (step 108). The business object model includes the objects contained within the business documents. These objects are reflected as packages containing related information, and are arranged in a hierarchical structure within the business object model, as discussed below.

Methods and systems consistent with the subject matter described herein then generate interfaces from the business object model (step 110). The heterogeneous programs use instantiations of these interfaces (called "business document objects" below) to create messages (step 112), which are sent to complete the business transaction (step 114). Business entities use these messages to exchange information with other business entities during an end-to-end business transaction. Since the business object model is shared by heterogeneous programs, the interfaces are consistent among these programs. The heterogeneous programs use these consistent interfaces to communicate in a consistent manner, thus facilitating the business transactions.

Standardized Business-to-Business ("B2B") messages are compliant with at least one of the e-business standards (i.e., they include the business-relevant fields of the standard). The e-business standards include, for example, RosettaNet for the high-tech industry, Chemical Industry Data Exchange ("CIDX"), Petroleum Industry Data Exchange ("PIDX") for the oil industry, UCCnet for trade, PapiNet for the paper industry, Odette for the automotive industry, HR-XML for human resources, and XML Common Business Library ("xCBL"). Thus, B2B messages enable simple integration of components in heterogeneous system landscapes. Application-to-Application ("A2A") messages exceed the standards, and thus provide the benefit of the full functionality of application components. Although various steps of FIG. 1 were described as being performed manually, one skilled in the art will appreciate that such steps could be computer-assisted or performed entirely by a computer, including being performed by either hardware, software, or any other combination thereof.

B. Implementation Details

As discussed above, methods and systems consistent with the subject matter described herein create consistent interfaces by generating the interfaces from a business object model. Details regarding the creation of the business object model, the generation of an interface from the business object model, and the use of an interface generated from the business object model are provided below.

Figure 5:
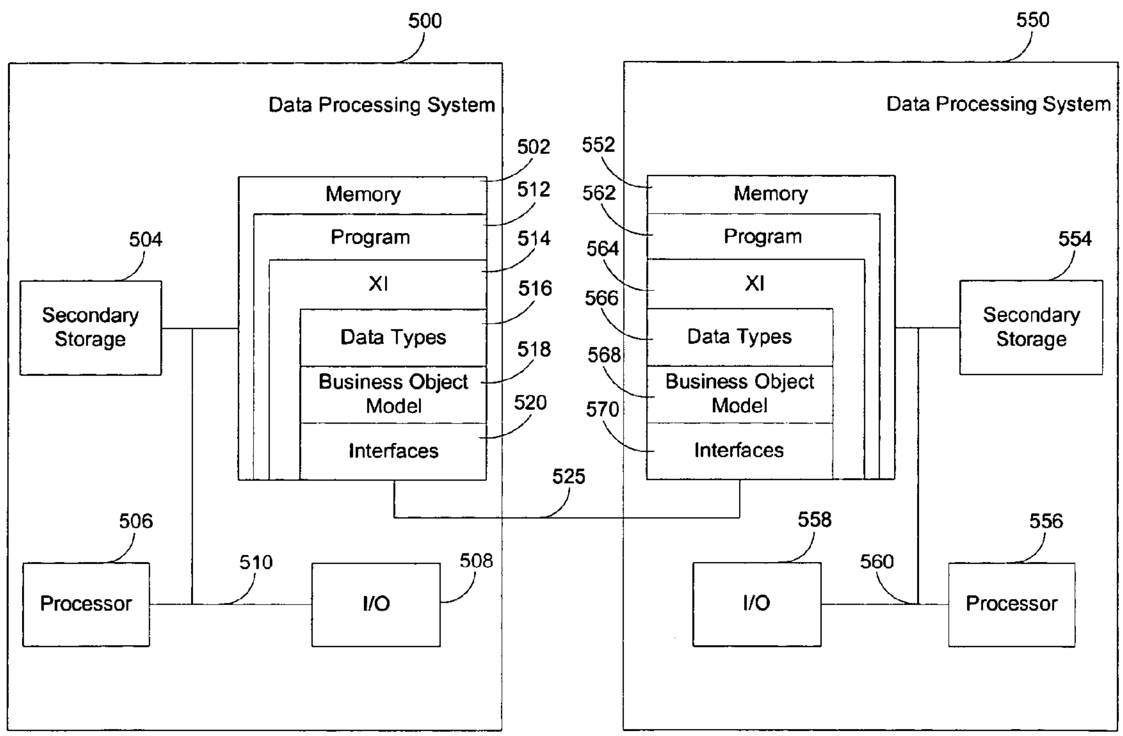
FIG. 5 depicts data processing systems suitable for practicing methods and systems consistent with the subject matter described herein.

FIG. 5 depicts two exemplary data processing systems 500, 550 suitable for practicing methods and systems consistent with the subject matter described herein. Data processing system 500 includes a main memory 502, a secondary storage device 504, a processor 506, and an input/output (I/O) device 508. Likewise, data processing system 550 includes a main memory 552, a secondary storage device 554, a processor 556, and an input/output (I/O) device 558. Each data processing system 500, 550 may further comprise standard input devices, such as a keyboard, a mouse or a speech processing means (each not illustrated). The internal components of each data processing system 500, 550 exchange information with one another via system buses 510, 560. The components are standard in most computer systems suitable for use with practicing methods and configuring systems consistent with the subject matter described herein. One skilled in the art will recognize that data processing systems 500, 550 may contain additional or different components.

Memory 502 includes program 512, which is an application program that facilitates the transfer of information between business entities. Memory 552 similarly includes program 562, which is an application program that facilitates the transfer of information between business entities. For example, program 512 could be an accounting program that transfers information to program 562, which could be a manufacturing program. Although depicted in two separate data processing systems 500, 550, one having skill in the art will appreciate that programs 512, 562 can reside in the same data processing system, the same computer, and even in the same memory. Each program 512, 562 may comprise or may be included in one or more code sections containing instructions for performing their respective operations. While programs 512, 562 are described as being implemented as software, the present implementation may be implemented as a combination of hardware and software or hardware alone.

Memory 502 also includes an exchange infrastructure ("XI") 514, which is an infrastructure that supports the technical interaction of business processes across heterogeneous system environments. XI centralizes the communication between components within a business entity and between different business entities. If necessary, XI carries out the mapping between the messages. XI is a publicly available product sold by SAP AG, Walldorf, Germany. Similarly, memory 552 includes an XI 564. XI 514, 564 integrates different versions of systems implemented on different platforms (e.g., Java® and ABAP). XI 514, 564 is based on an open architecture, and makes use of open standards, such as XML™ and Java® environments. XI 514, 564 offers services that are useful in a heterogeneous and complex system landscape. In particular, XI 514, 564 offers a runtime infrastructure for message exchange, configuration options for managing business processes and message flow, and options for transforming message contents between sender and receiver systems. XML is a trademark of the Massachusetts Institute of Technology, Institut National de Recherche en Informatique et en Automatique, and Keio University. Java is a registered trademark of Sun Microsystems, Inc. All names used herein may be trademarks or registered trademarks of their respective companies.

XI 514, 564 stores data types 516, 566, a business object model 518, 568, and interfaces 520, 570. The details regarding the business object model are described below. Data types 516, 566 are the building blocks for the business object model 518, 568. The business object model 518, 568 is used to derive consistent interfaces 520, 570. XI 514, 564 allows for the exchange of information from a first company having one computer system to a second company having a second computer system over network connection 525 by using the standardized interfaces 520, 570.

Although not shown in FIG. 5, like all data processing systems, data processing systems 500, 550 have operating systems that control their operations, including the execution of programs 512, 562 by processors 506, 556. Also, although aspects of one implementation consistent with the principles of the subject matter described herein are described herein with programs 512, 562 stored in main memories 502, 552, one skilled in the art will appreciate that all or part of systems and methods consistent with the subject matter described herein may be stored on or read from other computer-readable media, such as secondary storage devices 504, 554, like hard disks, floppy disks, and CD-ROM; a carrier wave received from a network, such as the Internet; or other forms of ROM or RAM, either currently known or later developed. Finally, although specific components of data processing system 500, 550 have been described, one skilled in the art will appreciate that a data processing system suitable for use with the methods and systems consistent with the subject matter described herein may contain additional or different components.

Methods and systems consistent with the subject matter described herein provide and use interfaces 520, 570 derived from the business object model 518, 568 suitable for use with more than one business area, for example different departments within a company such as finance, or marketing. Also, they are suitable across industries and across businesses. Interfaces 520, 570 are used during an end-to-end business transaction to transfer business process information in an application-independent manner. For example the interfaces can be used for fulfilling a sales order.

1. Message Overview

To perform an end-to-end business transaction, consistent interfaces are used to create business documents that are sent within messages between heterogeneous programs.

a) Message Categories

Figure 6:
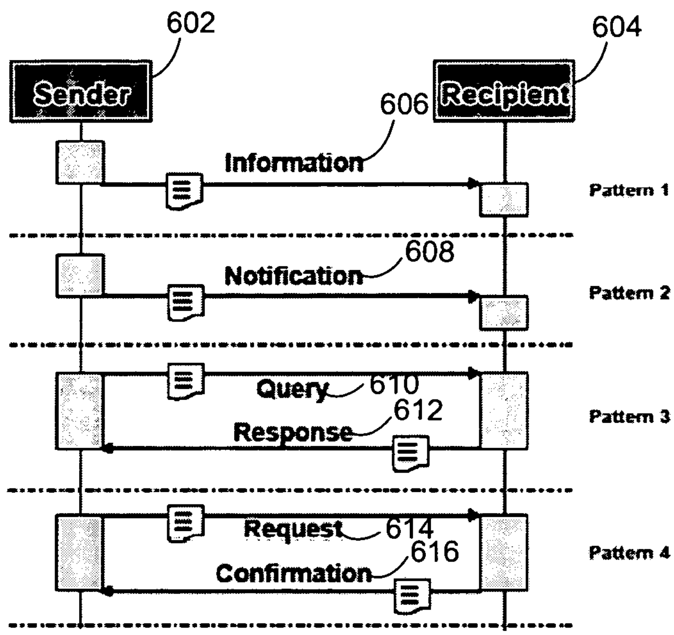
FIG. 6 depicts message categories in accordance with methods and systems consistent with the subject matter described herein.

As depicted in FIG. 6, the communication between a sender 602 and a recipient 604 can be broken down into basic categories that describe the type of the information exchanged and simultaneously suggest the anticipated reaction of the recipient 604. A message category is a general business classification for the messages. Communication is sender-driven. In other words, the meaning of the message categories is established or formulated from the perspective of the sender 602. The message categories include information 606, notification 608, query 610, response 612, request 614, and confirmation 616.

(1) Information

Information 606 is a message sent from a sender 602 to a recipient 604 concerning a condition or a statement of affairs. No reply to information is expected. Information 606 is sent to make business partners or business applications aware of a situation. Information 606 is not compiled to be application-specific. Examples of "information" are an announcement, advertising, a report, planning information, and a message to the business warehouse.

(2) Notification

A notification 608 is a notice or message that is geared to a service. A sender 602 sends the notification 608 to a recipient 604. No reply is expected for a notification. For example, a billing notification relates to the preparation of an invoice while a dispatched delivery notification relates to preparation for receipt of goods.

(3) Query

A query 610 is a question from a sender 602 to a recipient 604 to which a response 612 is expected. A query 610 implies no assurance or obligation on the part of the sender 602. Examples of a query 610 are whether space is available on a specific flight or whether a specific product is available. These queries do not express the desire for reserving the flight or purchasing the product.

(4) Response

A response 612 is a reply to a query 610. The recipient 604 sends the response 612 to the sender 602. A response 612 generally implies no assurance or obligation on the part of the recipient 604. The sender 602 is not expected to reply. Instead, the process is concluded with the response 612. Depending on the business scenario, a response 612 also may include a commitment, i.e., an assurance or obligation on the part of the recipient 604. Examples of responses 612 are a response stating that space is available on a specific flight or that a specific product is available. With these responses, no reservation was made.

(5) Request

A request 614 is a binding requisition or requirement from a sender 602 to a recipient 604. Depending on the business scenario, the recipient 604 can respond to a request 614 with a confirmation 616. The request 614 is binding on the sender 602. In making the request 614, the sender 602 assumes, for example, an obligation to accept the services rendered in the request 614 under the reported conditions. Examples of a request 614 are a parking ticket, a purchase order, an order for delivery and a job application.

(6) Confirmation

A confirmation 616 is a binding reply that is generally made to a request 614. The recipient 604 sends the confirmation 616 to the sender 602. The information indicated in a confirmation 616, such as deadlines, products, quantities and prices, can deviate from the information of the preceding request 614. A request 614 and confirmation 616 may be used in negotiating processes. A negotiating process can consist of a series of several request 614 and confirmation 616 messages. The confirmation 616 is binding on the recipient 604. For example, 100 units of X may be ordered in a purchase order request; however, only the delivery of 80 units is confirmed in the associated purchase order confirmation.

b) Message Choreography

A message choreography is a template that specifies the sequence of messages between business entities during a given transaction. The sequence with the messages contained in it describes in general the message "lifecycle" as it proceeds between the business entities. If messages from a choreography are used in a business transaction, they appear in the transaction in the sequence determined by the choreography. This illustrates the template character of a choreography, i.e., during an actual transaction, it is not necessary for all messages of the choreography to appear. Those messages that are contained in the transaction, however, follow the sequence within the choreography. A business transaction is thus a derivation of a message choreography. The choreography makes it possible to determine the structure of the individual message types more precisely and distinguish them from one another.

Figure 7:
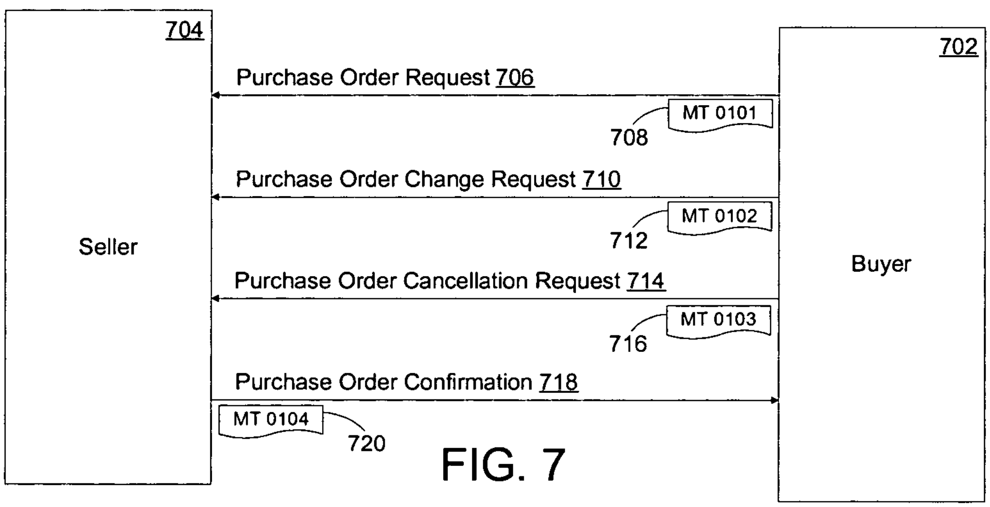
FIG. 7 depicts a message choreography for a purchase order scenario in accordance with methods and systems consistent with the subject matter described herein.

For example, the message choreography 700 for a purchase order scenario between buyer 702 and seller 704 is depicted in FIG. 7. A Purchase Order Request Message 706 is the request from the buyer 702 to the seller 704 to deliver goods or render services. The message type 708 of the Purchase Order Request Message 706 is 0101, as defined above. The Purchase Order Change Request Message 710 requests a change of a previous purchase order request or purchase order change request message. The message type 712 of the Purchase Order Change Request Message 710 is 0102. The Purchase Order Cancellation Request Message 714 is the cancellation of the request of the buyer 702 to the seller 704 to deliver goods or render services. The message type 716 of the Purchase Order Cancellation Request Message 714 is 0103. The Purchase Order Confirmation Message 718 is a confirmation, a partial confirmation, or a change with respect to the delivery of goods or the rendering of services that were requested or cancelled. The message type 720 of the Purchase Order Confirmation Message 718 is 0104.

Illustrative message choreographies that cover a number of transactions are presented below.

(1) Master Data Management

Figure 8:
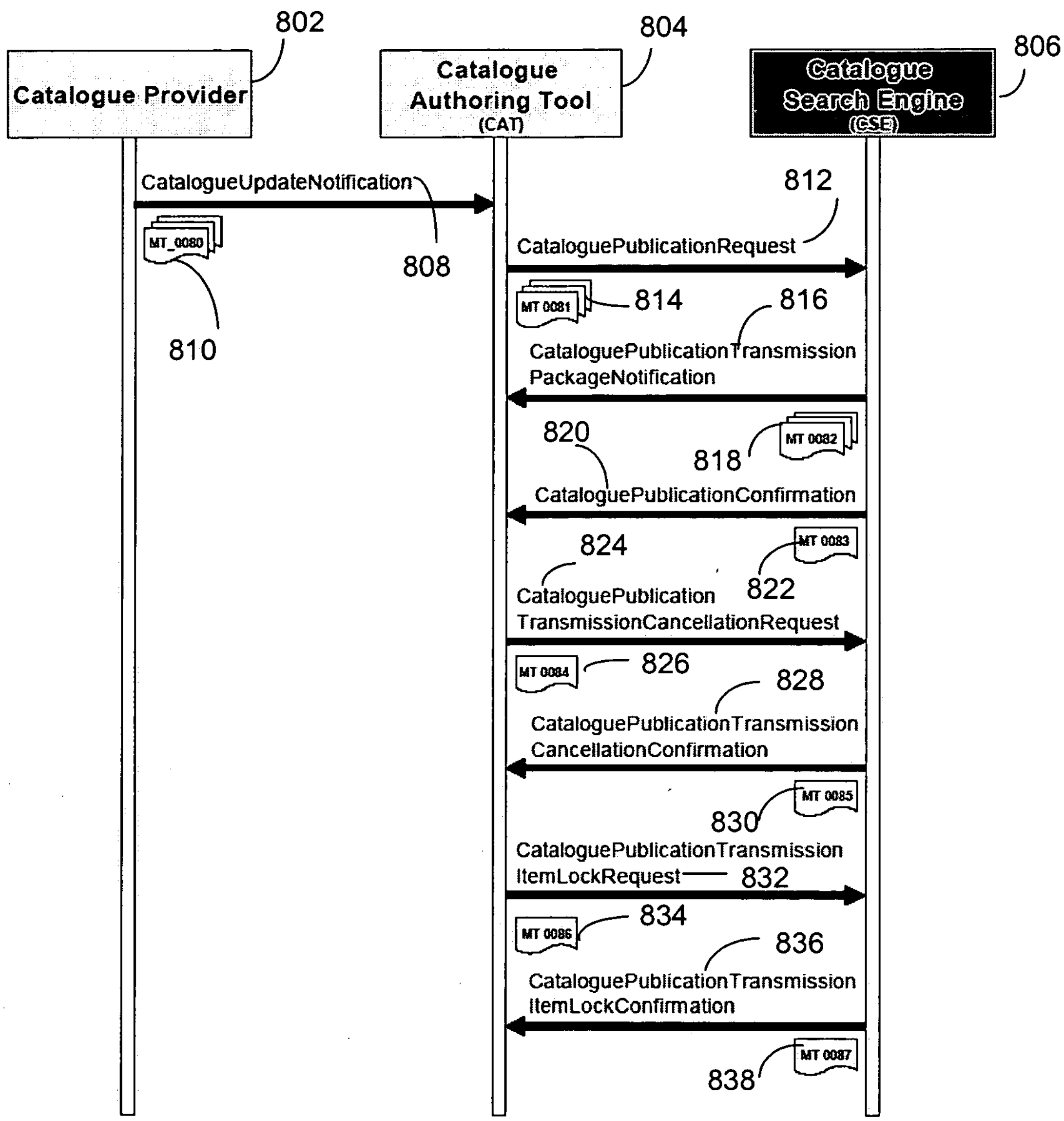
FIG. 8 depicts a message choreography of a Master Data Management in accordance with methods and systems consistent with the subject matter described herein.

FIG. 8 depicts the message choreography of a Master Data Management. The Master Data Management choreography involves three components: a Catalogue Provider 802, a Catalogue Authoring Tool (CAT) 804, and a Catalogue Search Engine (CSE) 806. The Catalogue Provider 802 sends a CatalogueUpdateNotification message 808 to the CAT 804. The message type 810 of the CatalogueUpdateNotification message 808 is 0080, i.e., a notice from a catalogue provider to an interested party about a new catalogue transmitted in the message or about changes to an existing catalogue transmitted in the message. The message type 810 can be divided into multiple messages. The CAT 804 then sends a CataloguePublicationRequest message 812 to the CSE 806. The message type 814 of the CataloguePublicationRequest message 812 is 0081, i.e., a request from catalogue authoring to the Catalogue Search Engine (the publishing system) to publish a new or changed catalogue or to delete an already published catalogue (the catalogue is possibly split into several transmission packages). The message type 814 also can be divided into multiple messages.

The CSE 806 sends a CataloguePublicationTransmissionPackageNotification message 816 to the CAT 804. The message type 818 of the CataloguePublicationTransmissionPackageNotification message 816 is 0082, i.e., the notification of the Catalogue Search Engine (the publishing system) to Catalogue Authoring about a package of a catalogue publication transmission and information about the reception of this package and the validity of its content. The message type 818 can be divided into multiple messages.

The CSE 806 sends a CataloguePublicationConfirmation message 820 to the CAT 804. The message type 822 of the CataloguePublicationConfirmation message 820 is 0083, i.e., the confirmation of the Catalogue Search Engine (the publishing system) to the Catalogue Authoring whether the publication or deletion of a Catalogue requested by a CataloguePublicationRequest 812 was successful or not.

The CAT 804 sends a CataloguePublicationTransmissionCancellationRequest message 824 to the CSE 806. The message type 826 of the CataloguePublicationTransmissionCancellationRequest message 824 is 0084, i.e., the request of Catalogue Authoring to Catalogue Search Engine (the publishing system) to cancel the transmission of a Catalogue and to restore an earlier published state (if such exists) of the Catalogue. Moreover, no more packages are sent for this transmission.

The CSE 806 sends a CataloguePublicationTransmissionCancellationConfirmation message 828 to the CAT 804. The message type 830 of the CataloguePublicationTransmissionCancellationConfirmation message 828 is 0085, i.e., the confirmation of Catalogue Search Engine (the publishing system) whether the transmission of a Catalogue has been cancelled successfully and an earlier published state of this catalogue (if such exists) has been restored or not.

The CAT 804 sends a CataloguePublicationTransmissionItemLockRequest message 832 to the CSE 806. The message type 834 of the CataloguePublicationTransmissionItemLockRequest message 832 is 0086, i.e., the request of Catalogue Authoring to lock single items of the catalogue contained in the catalogue publication transmission.

The CSE 806 sends a CataloguePublicationTransmissionItemLockConfirmation message 836 to the CAT 804. The message type 838 of the CataloguePublicationTransmissionItemLockConfirmation message 836 is 0087, i.e., the confirmation of Catalogue Search Engine (the publishing system) to Catalogue Authoring whether single items of the catalogue contained in the catalogue publication transmission could be locked or not. If an item of the catalogue is locked and the catalogue is not yet published, the items must not be published. If the catalogue is already published, the publication of these items must be revoked.

Figure 9:
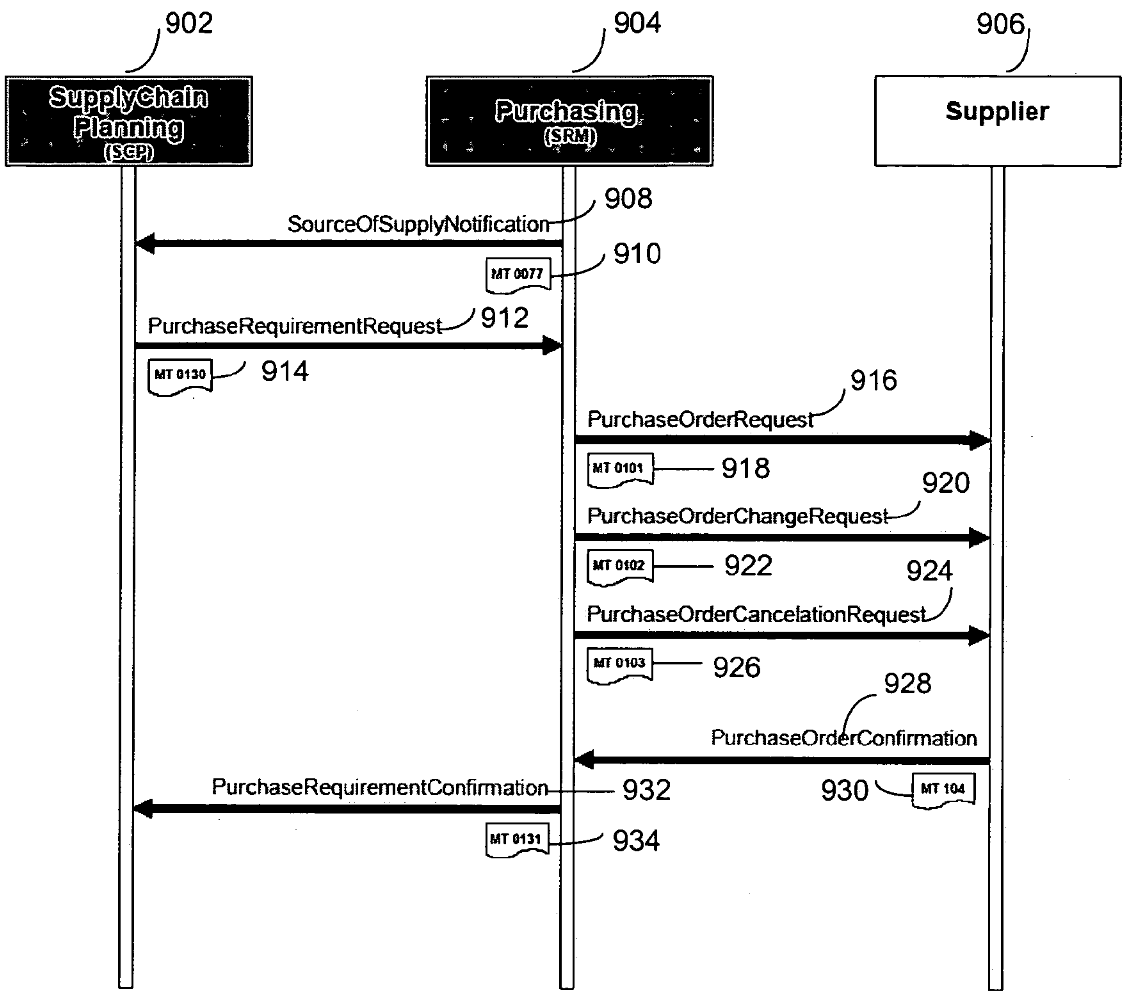
FIG. 9 depicts a message choreography of a Source of Supply, Purchase Requirement, and Purchase Order in accordance with methods and systems consistent with the subject matter described herein.

(2) Purchasing and Sales (a) Source of Supply, Purchase Requirement, and Purchase Order FIG. 9 depicts the message choreography of a Source of Supply, Purchase Requirement, and Purchase Order. The Source of Supply, Purchase Requirement, and Purchase Order choreography involves three components: Supply Chain Planning (SCP) 902, Purchasing (SRM) 904, and a Supplier 906.

The SRM 904 sends a SourceOfSupplyNotification message 908 to the SCP 902. The message type 910 of the SourceOfSupplyNotification message 908 is 0077, i.e., a notice to Supply Chain Planning about available sources of supply.

The SCP 902 sends a PurchaseRequirementRequest message 912 to the SRM 904. The message type 914 of the PurchaseRequirementRequest message 912 is 0130, i.e., a request from a requestor to a purchaser to (externally) procure products (materials, services) (external procurement).

The SRM 904 sends a PurchaseOrderRequest message 916 to the Supplier 906. The message type 918 of the PurchaseOrderRequest message 916 is 0101, i.e., a request from a purchaser to a seller to deliver goods or provide services.

The SRM 904 sends a PurchaseOrderChangeRequest message 920 to the Supplier 906. The message type 922 of the PurchaseOrderChangeRequest message 920 is 0102, i.e., a change to a purchaser's request to the seller to deliver goods or provide services.

The SRM 904 sends a PurchaseOrderCancellationRequest message 924 to the Supplier 906. The message type 926 of the PurchaseOrderCancellationRequest message 924 is 0103, i.e., the cancellation of a purchaser's request to the seller to deliver goods or provide services.

The Supplier 906 sends a PurchaseOrderConfirmation message 928 to the SRM 904. The message type 930 of the PurchaseOrderConfirmation message 928 is 0104, i.e., a confirmation, partial confirmation, or change from a seller to the purchaser, regarding the requested delivery of goods or provision of services.

The SRM 904 sends a PurchaseRequirementConfirmation message 932 to the SCP 902. The message type 934 of the PurchaseRequirementConfirmation message 932 is 0131, i.e., a notice from the purchaser to the requestor about the degree of fulfillment of a requirement.

(b) Product Demand, Product Forecast and Product Activity

Figure 10:
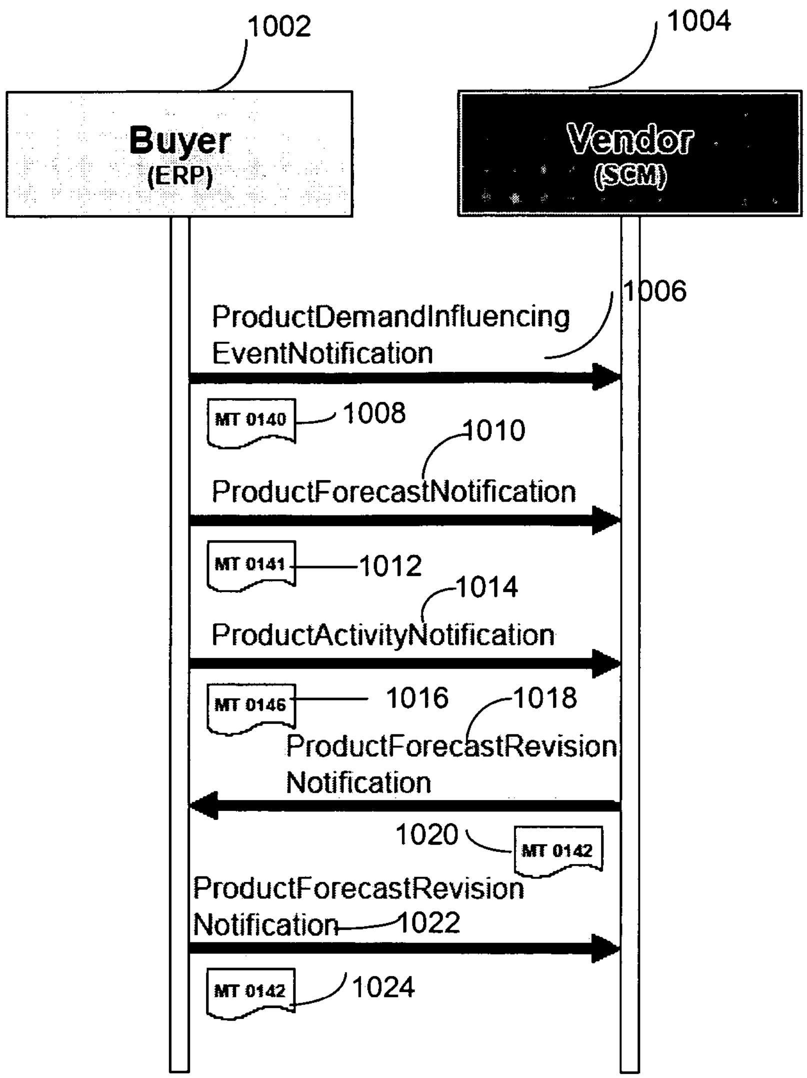
FIG. 10 depicts a message choreography of a Product Demand, Product Forecast and Product Activity in accordance with methods and systems consistent with the subject matter described herein.

FIG. 10 depicts the message choreography of a Product Demand, Product Forecast and Product Activity. The Product Demand, Product Forecast and Product Activity choreography involves two components: a Buyer (ERP) 1002 and a Vendor (SCM) 1004.

The Buyer 1002 sends a ProductDemandInfluencingEventNotification message 1006 to the Vendor 1004. The message type 1008 of the ProductDemandInfluencingEventNotification message 1006 is 0140, i.e., a notification about an event which influences the supply or demand of products.

The Buyer 1002 sends a ProductForecastNotification message 1010 to the Vendor 1004. The message type 1012 of the ProductForecastNotification message 1010 is 0141, i.e., a notification about future product demands (forecasts).

The Buyer 1002 sends a ProductActivityNotification message 1014 to the Vendor 1004. The message type 1016 of the ProductActivityNotification message 1014 is 0145, i.e., a message which communicates product-related activities of a buyer to a vendor. Based on this, the vendor can perform supply planning for the buyer.

The Vendor 1004 sends a ProductForecastRevisionNotification message 1018 to the Buyer 1002. The message type 1020 of the ProductForecastRevisionNotification message 1018 is 0142, i.e., a notification about the revision of future product demands (forecasts).

The Buyer 1002 sends the ProductForecastRevisionNotification message 1022 to the Vendor 1004. The message type 1024 of the ProductForecastRevisionNotification message 1022 is 0142.

(c) RFQ and Quote

Figure 11:
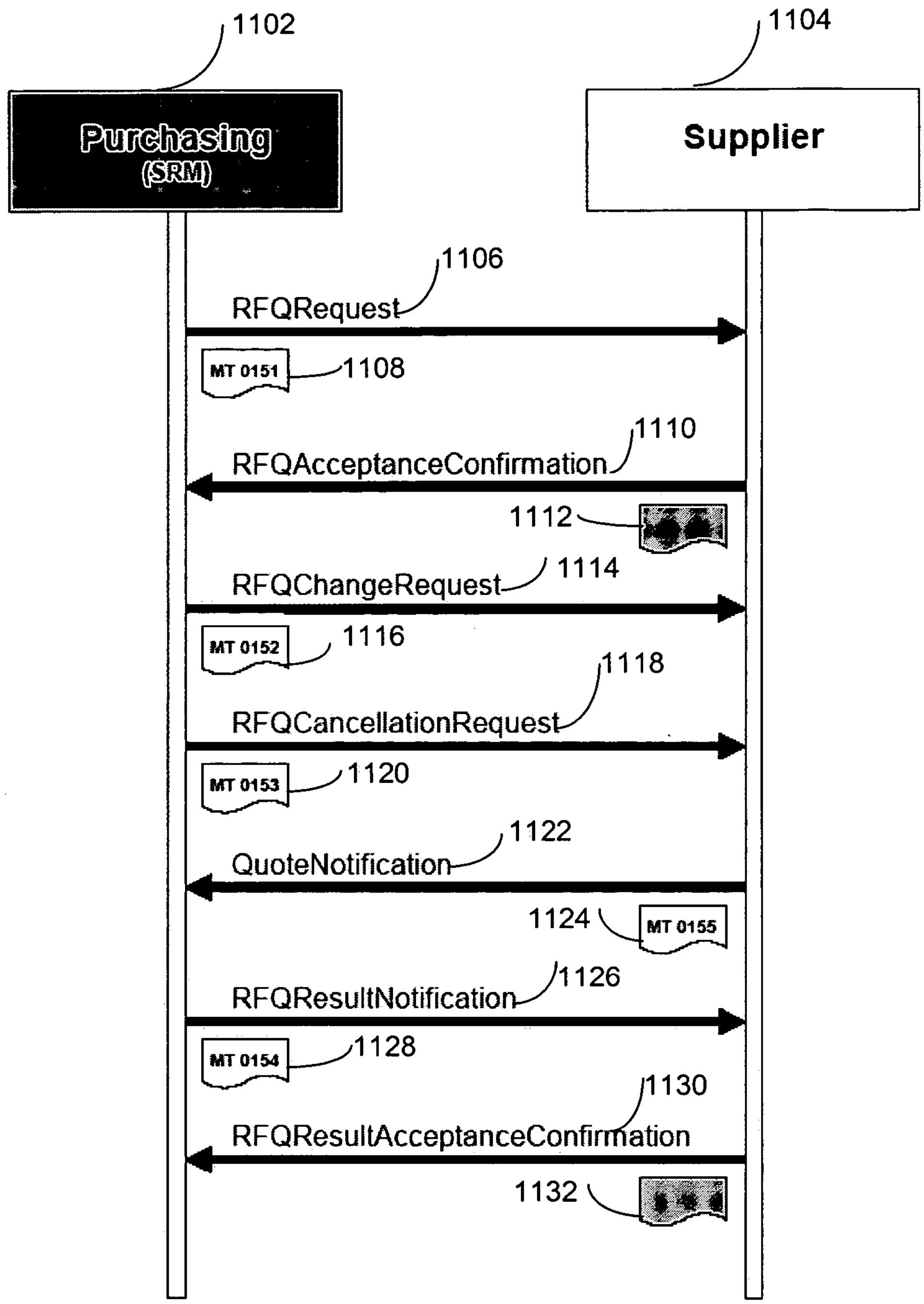
FIG. 11 depicts a message choreography of a RFQ and Quote in accordance with methods and systems consistent with the subject matter described herein.

FIG. 11 depicts the message choreography of a RFQ and Quote. The RFQ and Quote choreography involves two components: Purchasing (SRM) 1102 and a Supplier 1104.

The SRM 1102 sends a RFQRequest message 1106 to the Supplier 1104. The message type 1108 of the RFQRequest message 1106 is 0151, i.e., the request from a purchaser to a bidder to participate in a request for quotation for a product.

The Supplier 1104 sends a RFQAcceptanceConfirmation message 1110 to the SRM 1102. The message type of the RFQAcceptanceConfirmation message 1110 can be any conventional RFQ Acceptance Confirmation 1112.

The SRM 1102 sends a RFQChangeRequest message 1114 to the Supplier 1104. The message type 1116 of the RFQChangeRequest message 1114 is 0152, i.e., a change to the purchaser's request for a bidder to participate in the request for quotation for a product.

The SRM 1102 sends a RFQCancellationRequest message 1118 to the Supplier 1104. The message type 1120 of the RFQCancellationRequest message 1118 is 0153, i.e., a cancellation by the purchaser of a request for quotation for a product.

The Supplier 1104 sends a QuoteNotification message 1122 to the SRM 1102. The message type 1124 of the QuoteNotification message 1122 is 0155, i.e., the quote of a bidder communicated to a purchaser concerning the request for quotation for a product by the purchaser.

The SRM 1102 sends a RFQResultNotification message 1126 to the Supplier 1104. The message type 1128 of the RFQResultNotification message 1126 is 0154, i.e., a notification by a purchaser to a bidder about the type and extent of the acceptance of a quote or about the rejection of the quote.

The Supplier 1104 sends a RFQResultAcceptanceConfirmation message 1130 to the SRM 1102. The message type of the RFQResultAcceptanceConfirmation message 1130 can be any conventional RFQ Result Acceptance Confirmation 1132.

(d) Purchasing

Figure 12:
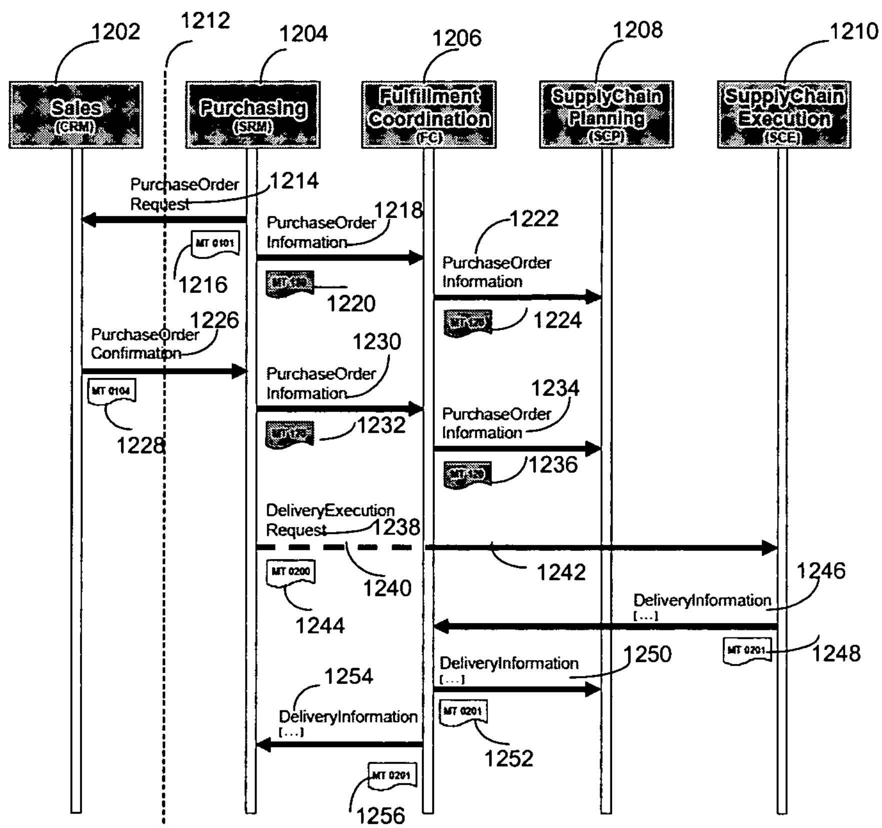
FIG. 12 depicts a message choreography of Purchasing in accordance with methods and systems consistent with the subject matter described herein.

FIG. 12 depicts the message choreography of Purchasing. The Purchasing choreography involves five components: Sales (CRM) 1202, Purchasing (SRM) 1204, Fulfillment Coordination (FC) 1206, Supply Chain Planning (SCP) 1208, and Supply Chain Execution (SCE) 1210. Line 1212 denotes a company border. Thus, one company includes Sales 1202, while another company includes SRM 1204, FC 1206, SCP 1208, and SCE 1210.

The SRM 1204 sends a PurchaseOrderRequest message 1214 to the CRM 1202. The message type 1216 of the PurchaseOrderRequest message 1214 is 0101, i.e., a request from a purchaser to a seller to deliver goods or provide services.

The SRM 1204 sends a PurchaseOrderInformation message 1218 to the FC 1206. The message type 1220 of the PurchaseOrderInformation message 1218 is 0120, i.e., information from a purchasing system for interested recipients about the current state of a purchase order when creating or changing a purchase order, confirming a purchase order or canceling a purchase order.

The FC 1206 sends the PurchaseOrderInformation message 1222 to the SCP 1208. The message type 1224 of the PurchaseOrderInformation message 1222 is message type 0120.

The CRM 1202 sends a PurchaseOrderConfirmation message 1226 to the SRM 1204. The message type 1228 of the PurchaseOrderConfirmation message 1226 is 0104, i.e., a confirmation, partial confirmation, or change from a seller to the purchaser, regarding the requested delivery of goods or provision of services.

The SRM 1204 sends a PurchaseOrderInformation message 1230 to the FC 1206. The message type 1232 of the PurchaseOrderInformation message 1230 is 0120, described above.

The FC 1206 sends the PurchaseOrderInformation message 1234 to the SCP 1208. The message type 1236 of the PurchaseOrderInformation message 1234 is 0120.

The FC 1206 sends a DeliveryExecutionRequest message 1238 to the SCE 1210, as depicted by line 1242. Alternatively, the SRM 1204 may send the DeliveryExecutionRequest message 1238 to the SCE 1210, as depicted by broken line 1240. The message type 1244 of the DeliveryExecutionRequest message 1238 is 0200, i.e., a request to a warehouse or supply chain execution to prepare and execute the outbound delivery of goods or the acceptance of an expected or announced inbound delivery.

The SCE 1210 sends a DeliveryInformation message 1246 to the FC 1206. The message type 1248 of the DeliveryInformation message 1246 is 0201, i.e., a message about the creation, change, and execution status of a delivery.

The FC 1206 sends a DeliveryInformation message 1250 to the SCP 1208. The message type 1252 of the DeliveryInformation message is 0201.

The FC 1206 sends a DeliveryInformation message 1254 to the SRM 1204. The message type 1256 of the DeliveryInformation message 1254 is 0201.

(e) Sales

Figure 13:
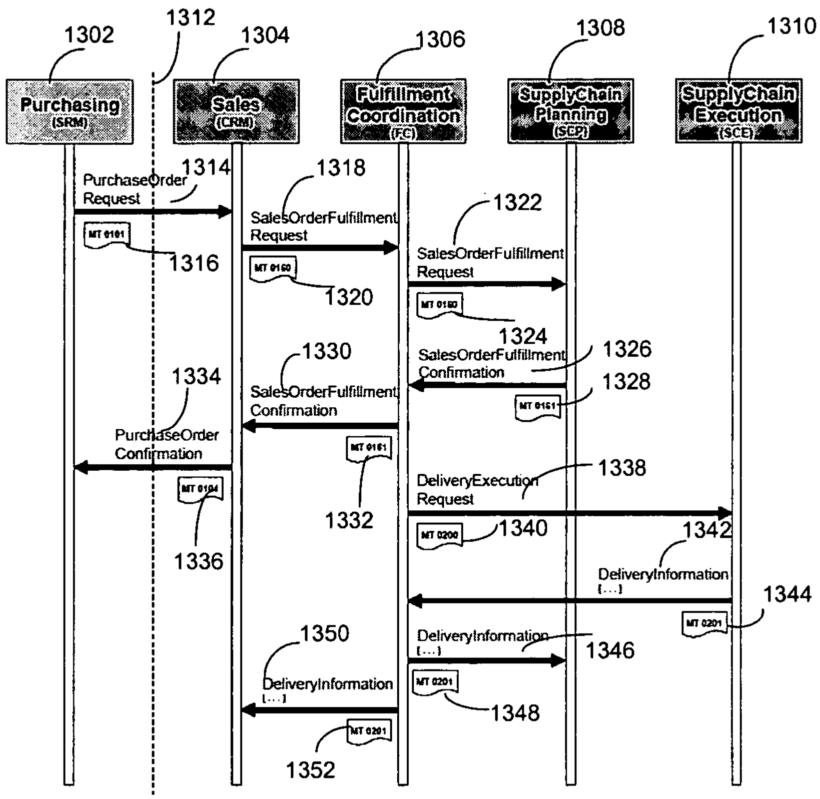
FIG. 13 depicts a message choreography of Sales in accordance with methods and systems consistent with the subject matter described herein.

FIG. 13 depicts the message choreography of Sales. The Sales choreography involves five components: Purchasing (SRM) 1302, Sales (CRM) 1304, Fulfillment Coordination (FC) 1306, Supply Chain Planning (SCP) 1308, and Supply Chain Execution (SCE) 1310. Line 1312 denotes a company border. Thus, one company includes SRM 1302, while another company includes CRM 1304, FC 1306, SCP 1308, and SCE 1310.

The SRM 1302 sends a PurchaseOrderRequest message 1314 to the CRM 1304. The message type 1316 of the PurchaseOrderRequest message 1314 is 0101, i.e., a request from a purchaser to a seller to deliver goods or provide services.

The CRM 1304 sends a SalesOrderFulfillmentRequest message 1318 to the FC 1306. The message type 1320 of the SalesOrderFulfillmentRequest message 1318 is 0160, i.e., a request (or change or cancellation of such a request) from a selling component to a procuring component, to fulfill the logistical requirements (for example, available-to-promise check, scheduling, requirements planning, procurement, and delivery) of a sales order.

The FC 1306 sends the SalesOrderFulfillmentRequest message 1322 to the SCP 1308. The message type 1324 of the SalesOrderFulfillmentRequest message 1322 is 0160.

The SCP 1308 sends a SalesOrderFulfillmentConfirmation message 1326 to the FC 1306. The message type 1328 of the SalesOrderFulfillmentConfirmation message 1326 is 0161, i.e., a confirmation, partial confirmation or change from the procuring component to the selling component, regarding a sales order with respect to which procurement has been requested.

The FC 1306 sends the SalesOrderFulfillmentConfirmation message 1330 to the CRM 1304. The message type 1332 of the SalesOrderFulfillmentConfirmation message 1330 is 0161.

The CRM 1304 sends a PurchaseOrderConfirmation message 1334 to the SRM 1302. The message type 1336 of the PurchaseOrderConfirmation message 1334 is 0104, i.e., a confirmation, partial confirmation, or change from a seller to the purchaser, regarding the requested delivery of goods or provision of services.

The FC 1306 sends a DeliveryExecutionRequest message 1338 to the SCE 1310. The message type 1340 of the DeliveryExecutionRequest message 1338 is 0200, i.e., a request to a warehouse or supply chain execution to prepare and execute the outbound delivery of goods or the acceptance of an expected or announced inbound delivery.

The SCE 1310 sends a DeliveryInformation message 1344 to the FC 1306. The message type 1346 of the DeliveryInformation message 1344 is 0201, i.e., a message about the creation, change, and execution status of a delivery.

The FC 1306 sends the DeliveryInformation message 1348 to the SCP 1308. The message type 1350 of the DeliveryInformation message 1348 is 0201, i.e., a message about the creation, change, and execution status of a delivery.

The FC 1306 also sends the DeliveryInformation message 1352 to the CRM 1304. The message type 1354 of the DeliveryInformation message 1352 is 0201.

(f) Vendor Managed Inventory/Responsive Replenishment

Figure 14:
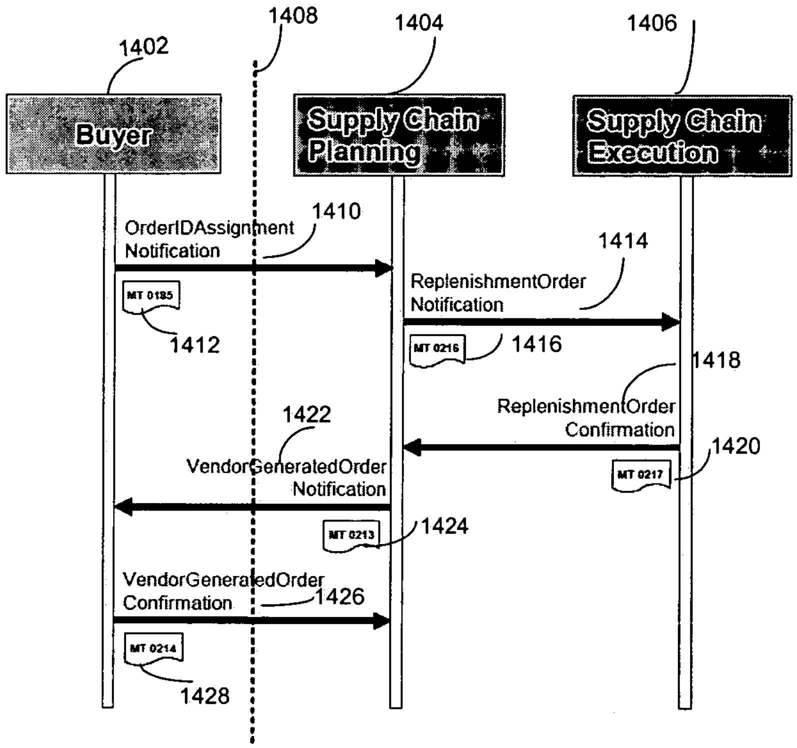
FIG. 14 depicts a message choreography of a Vendor Managed Inventory/Responsive Replenishment in accordance with methods and systems consistent with the subject matter described herein.

FIG. 14 depicts the message choreography of a Vendor Managed Inventory/Responsive Replenishment. The Vendor Managed Inventory/Responsive Replenishment choreography involves three components: a Buyer 1402, Supply Chain Planning 1404, and Supply Chain Execution 1406. Line 1408 denotes a company border. Thus, one company includes Buyer 1402, while another company includes Supply Chain Planning 1404 and Supply Chain Execution 1406.

The Buyer 1402 sends an OrderIDAssignmentNotification message 1410 to Supply Chain Planning 1404. The message type 1412 of the OrderIDAssignmentNotification message 1410 is 0185, i.e., a message that allows a buyer to assign a vendor order numbers for identifying "purchase orders generated by the vendor."

Supply Chain Planning 1404 sends a ReplenishmentOrderNotification message 1414 to Supply Chain Execution 1406. The message type 1416 of the ReplenishmentOrderNotification message 1414 is 0216, i.e., a message that is used by Logistics Planning (SCP, vendor) to transfer a replenishment order planned for a customer/buyer to Logistics Execution (SCE, vendor) in order to trigger further processing for the order and prepare the outbound delivery.

Supply Chain Execution 1406 sends a ReplenishmentOrderConfirmation message 1418 to Supply Chain Planning 1404. The message type 1420 of the ReplenishmentOrderConfirmation message 1418 is 0217, i.e., a message that is used by Logistics Execution (SCE, vendor) to confirm to Logistics Planning (SCP, vendor) that a replenishment order that is planned for a customer/buyer can be fulfilled.

Supply Chain Planning 1404 sends a VendorGeneratedOrderNotification message 1422 to the Buyer 1402. The message type 1424 of the VendorGeneratedOrderNotification message 1422 is 0213, i.e., a message that is used by a vendor/seller to transfer the replenishment order that he has initiated and planned to a customer/buyer so that the latter can create a purchase order. The notification sent by the vendor/seller to the customer/buyer regarding the planned replenishment order can be regarded as a "purchase order generated by the seller."

The Buyer 1402 sends a VendorGeneratedOrderConfirmation message 1426 to Supply Chain Planning 1404. The message type 1428 of the VendorGeneratedOrderConfirmation message 1426 is 0214, i.e., VendorGeneratedOrderConfirmation is the confirmation from a customer/buyer that a purchase order has been created for the replenishment order initiated and planned by his vendor/seller. This confirmation from the customer/buyer for a "purchase order generated by the seller" can be regarded as a "purchase order" in the traditional sense, which, in turn, triggers the corresponding fulfillment process at the vendor/seller.

Figure 15:
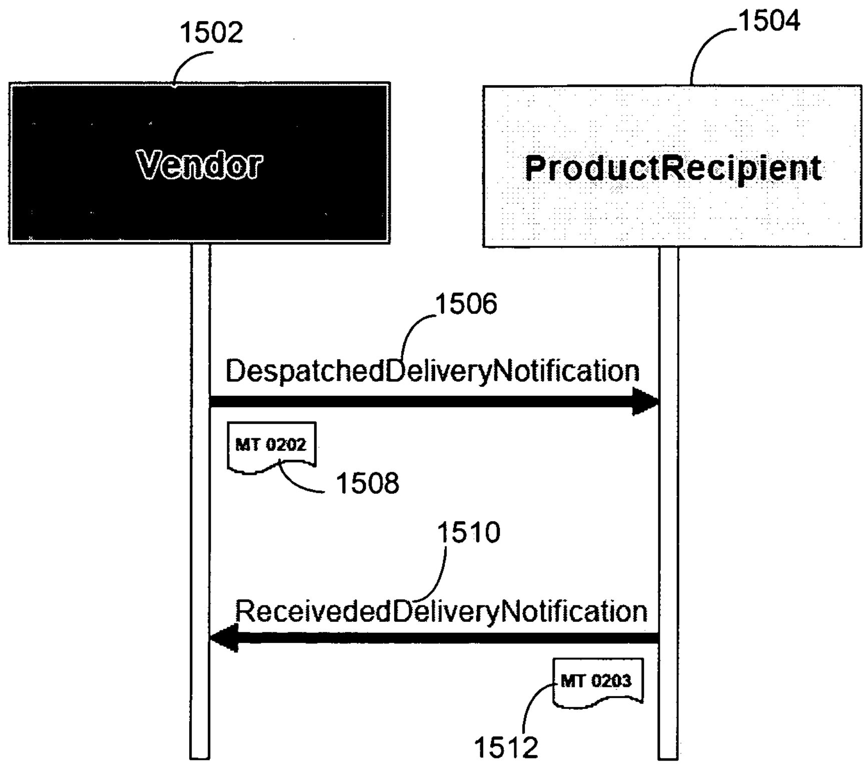
FIG. 15 depicts a message choreography of an Advanced Shipment Notification and Proof of Delivery in accordance with methods and systems consistent with the subject matter described herein.

(3) Delivery and Goods Movement (a) Advanced Shipment Notification and Proof of Delivery FIG. 15 depicts the message choreography of an Advanced Shipment Notification and Proof of Delivery. The Advanced Shipment Notification and Proof of Delivery choreography involves two components: a Vendor 1502 and a Product Recipient 1504.

The Vendor 1502 sends a DespatchedDeliveryNotification message 1506 to the Product Recipient 1504. The message type 1508 of the DespatchedDeliveryNotification message 1506 is 0202, i.e., a notification communicated to a product recipient about the planned arrival, pickup, or issue date of a ready-to-send delivery, including details about the content of the delivery.

The Product Recipient 1504 sends a ReceivedDeliveryNotification message 1510 to the Vendor 1502. The message type 1512 of the ReceivedDeliveryNotification message 1510 is 0203, i.e., a notification communicated to a vendor about the arrival of the delivery sent by him to the product recipient, including details about the content of the delivery.

(b) Service Acknowledgement

Figure 16:
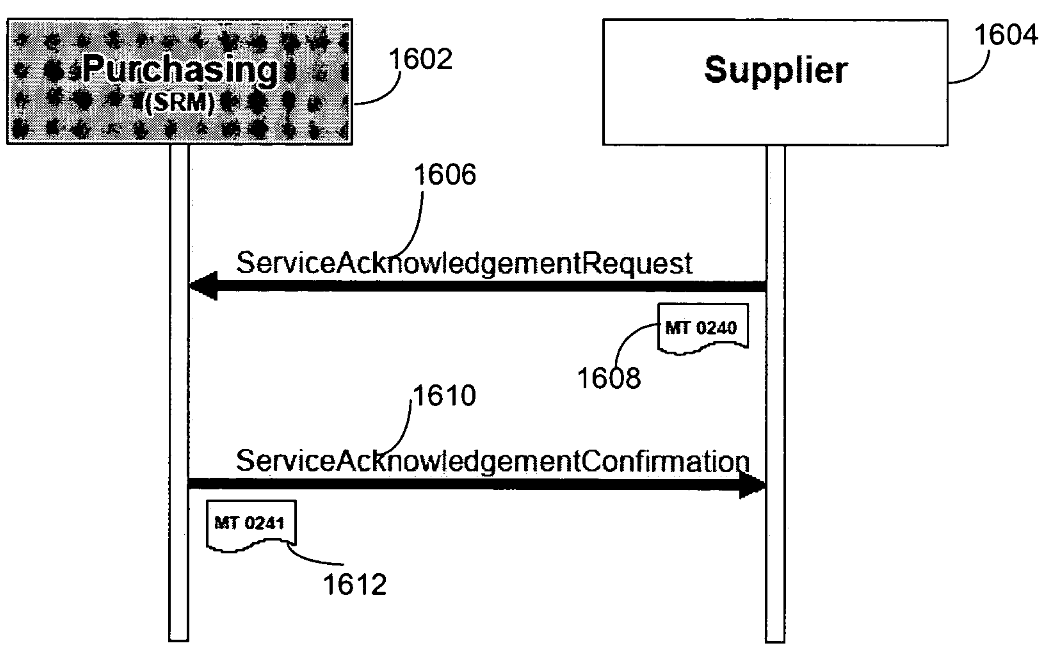
FIG. 16 depicts a message choreography of a Service Acknowledgement in accordance with methods and systems consistent with the subject matter described herein.

FIG. 16 depicts the message choreography of a Service Acknowledgement. The Service Acknowledgement choreography involves two components: Purchasing (SRM) 1602 and a Supplier 1604.

The Supplier 1604 sends a ServiceAcknowledgementRequest message 1606 to the SRM 1602. The message type 1608 of the ServiceAcknowledgementRequest message 1606 is 0240, i.e., a request by a seller to a purchaser to confirm the services recorded.

The SRM 1602 sends a ServiceAcknowledgementConfirmation message 1610 to the Supplier 1604. The message type 1612 of the ServiceAcknowledgementConfirmation message 1610 is 0241, i.e., a confirmation (or rejection) of the services recorded.

(c) Inventory Change

Figure 17:
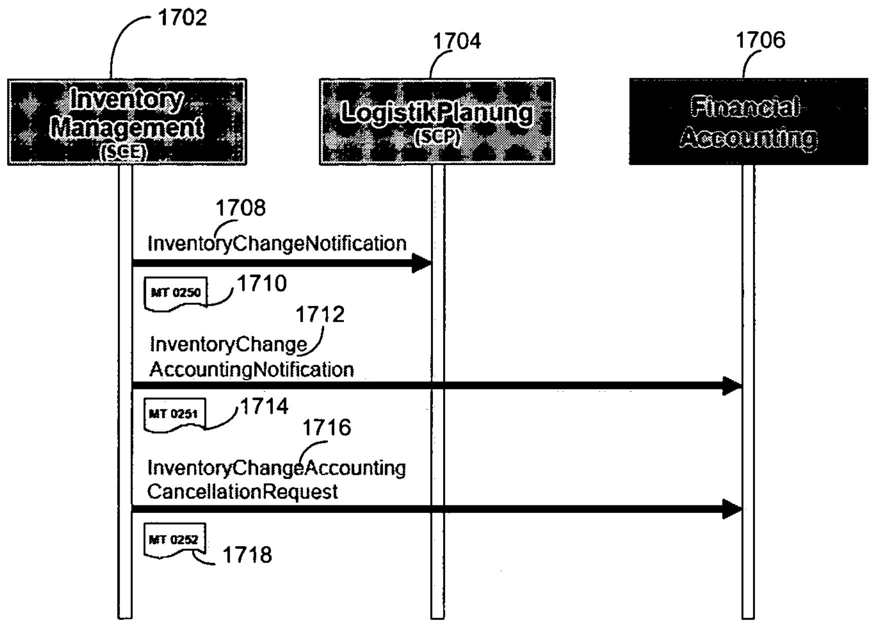
FIG. 17 depicts a message choreography of an Inventory Change in accordance with methods and systems consistent with the subject matter described herein.

FIG. 17 depicts the message choreography of an Inventory Change. The Inventory Change choreography involves three components: Inventory Management (SCE) 1702, Logistic Planning (SCP) 1704 and Financial Accounting 1706.

The SCE 1702 sends an InventoryChangeNotification message 1708 to the SCP 1704. The message type 1710 of the InventoryChangeNotification message 1708 is 0250, i.e., a summery of detailed information about inventory changes in inventory management, which is required for logistics planning.

The SCE 1702 sends an InventoryChangeAccountingNotification message 1712 to Financial Accounting 1706. The message type 1714 of the InventoryChangeAccountingNotification message 1712 is 0251, i.e., a summary of aggregated information about inventory changes in inventory management, which is required for financials.

The SCE 1702 sends an InventoryChangeAccountingCancellationRequest message 1716 to Financial Accounting 1706. The message type 1718 of the InventoryChangeAccountingCancellationRequest message 1716 is 0252, i.e., a request for the full cancellation of posting information previously sent to financials with respect to a goods movement.

(4) Invoice and Payment and Financials (a) Billing Due

Figure 18:
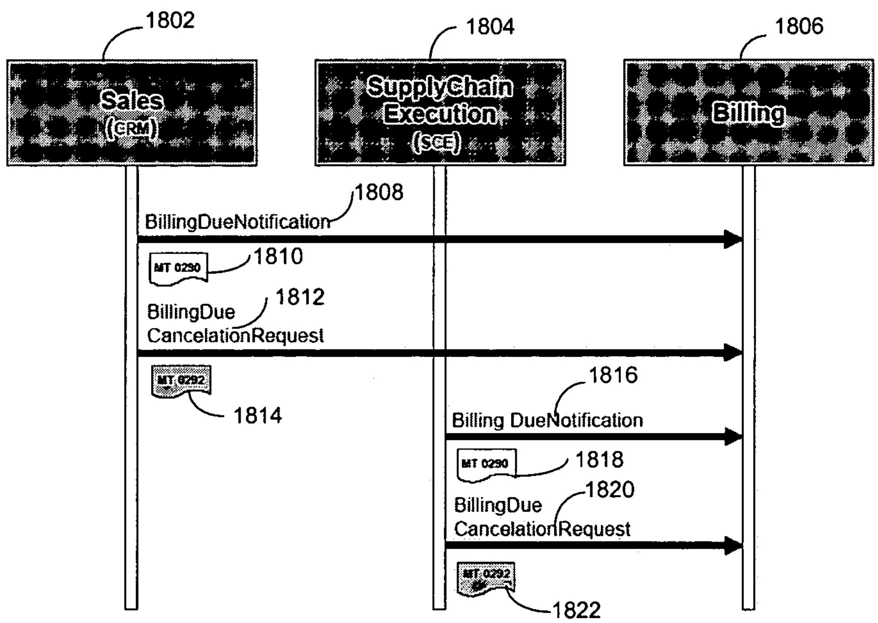
FIG. 18 depicts a message choreography of Billing Due in accordance with methods and systems consistent with the subject matter described herein.

FIG. 18 depicts the message choreography of Billing Due. The Billing Due choreography involves three components: Sales (CRM) 1802, Supply Chain Execution (SCE) 1804, and Billing 1806.

The CRM 1802 sends a BillingDueNotification message 1808 to Billing 1806. The message type 1810 of the BillingDueNotification message 1808 is 0290, i.e., a notification about billing-relevant data communicated to an application in which the subsequent operative processing of billing takes place.

The SCE 1804 sends a BillingDueNotification message 1816 to Billing 1806. The message type 1818 of the BillingDueNotification message 1816 is 0290, i.e., a notification about billing-relevant data communicated to an application in which the subsequent operative processing of billing takes place.

(b) Invoicing Due

Figure 19:
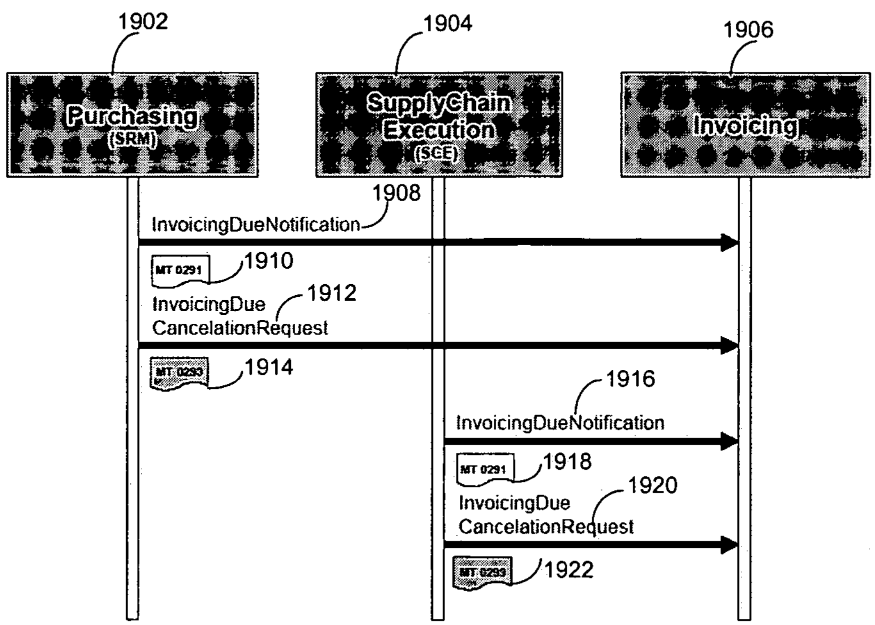
FIG. 19 depicts a message choreography of Invoicing Due in accordance with methods and systems consistent with the subject matter described herein.

FIG. 19 depicts the message choreography of Invoicing Due. The Invoicing Due choreography involves three components: Purchasing (SRM) 1902, Supply Chain Execution (SCE) 1904, and Invoicing 1906.

The SRM 1902 sends an InvoicingDueNotification message 1908 to Invoicing 1906. The message type 1910 of the InvoicingDueNotification message 1908 is 0291, i.e., a notification about invoicing-relevant data communicated to an application in which the operative verification and creation of invoices takes place, and/or in which "self billing" invoices (evaluated receipt settlement) are created.

The SCE 1904 sends an InvoicingDueNotification message 1916 to Invoicing 1906. The message type 1918 of the InvoicingDueNotification message 1916 is 0291, i.e., a notification about invoicing-relevant data communicated to an application in which the operative verification and creation of invoices takes place, and/or in which "self billing" invoices (evaluated receipt settlement) are created.

(c) Invoice

Figure 20:
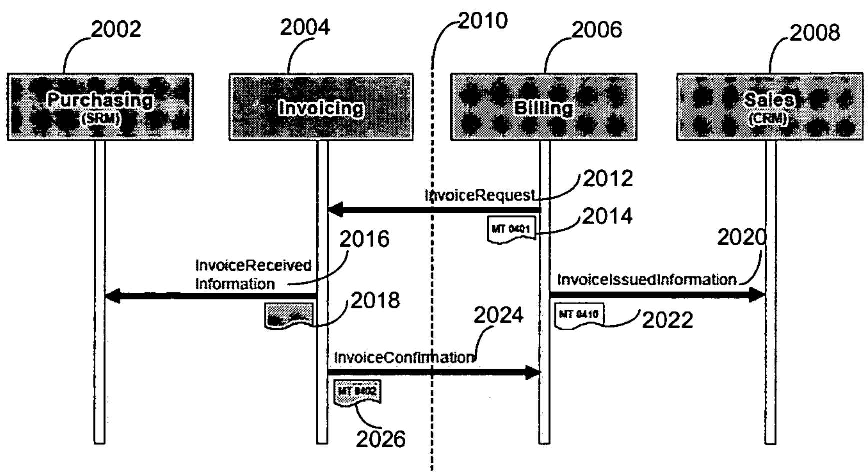
FIG. 20 depicts a message choreography of an Invoice in accordance with methods and systems consistent with the subject matter described herein.

FIG. 20 depicts the message choreography of an Invoice. The Invoice choreography involves four components: Purchasing (SRM) 2002, Invoicing 2004, Billing 2006, and Sales (CRM) 2008. Line 2010 denotes a company border. Thus, one company includes SRM 2002 and Invoicing 2004, while another company includes Billing 2006 and CRM 2008.

Billing 2006 sends an InvoiceRequest message 2012 to Invoicing 2004. The message type 2014 of the InvoiceRequest message 2012 is 0401, i.e., a legally binding notice about accounts receivable or accounts payable for delivered goods or provided services—typically a request that payment be made for these goods or services.

Invoicing 2004 sends an InvoiceReceivedInformation message 2016 to the SRM 2002. The message type 2018 of the InvoiceReceivedInformation message 2016 can be a conventional Invoice Received Information.

Billing 2006 sends an InvoiceIssuedInformation message 2020 to Sales 2008. The message type 2022 of the InvoiceIssuedInformation message 2020 is 0410, i.e., information about provided services, delivered products, or credit or debit memo request items that have been billed, the items of an invoice that have been used for this, and the extent to which they have been billed.

Invoicing 2004 sends an InvoiceConfirmation message 2024 to Billing 2006. The message type 2026 of the InvoiceConfirmation message 2024 is 0402, i.e., the repose of a recipient of an invoice to the bill-from-party by which the invoice as a whole is confirmed, rejected, or classified as 'not yet decided.'

(d) Invoice Accounting and Payment Due

Figure 21:
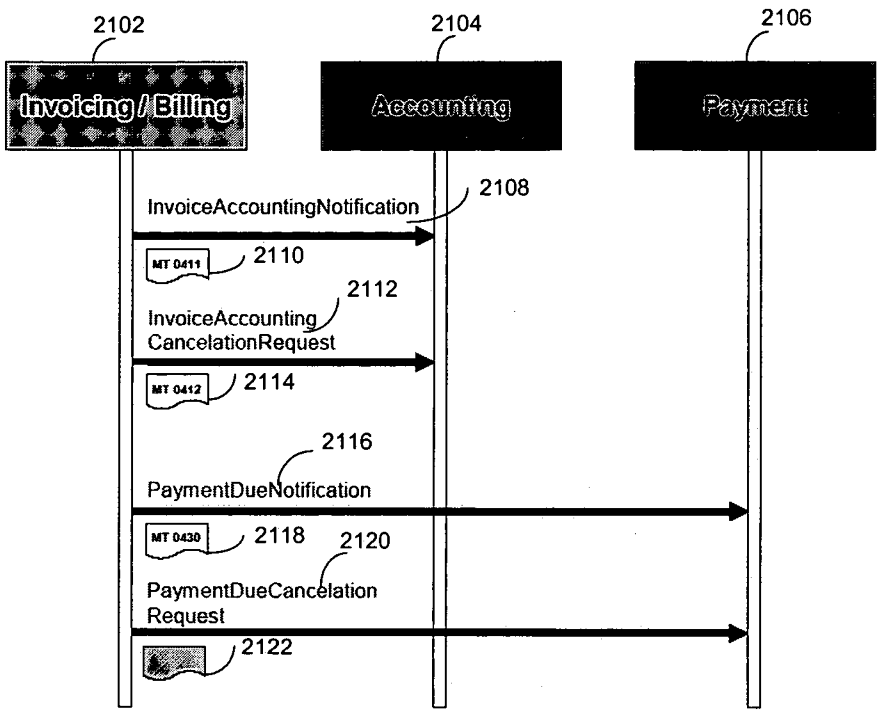
FIG. 21 depicts a message choreography of Invoice Accounting and Payment Due in accordance with methods and systems consistent with the subject matter described herein.

FIG. 21 depicts the message choreography of Invoice Accounting and Payment Due. The Invoice Accounting and Payment Due choreography involves three components: Invoicing/Billing 2102, Accounting 2104 and Payment 2106.

Invoicing/Billing 2102 sends an InvoiceAccountingNotification message 2108 to Accounting 2104. The message type 2110 of the InvoiceAccountingNotification message 2108 is 0411, i.e., a notification to financials about information on incoming or outgoing invoices from invoice verification or billing.

Invoicing/Billing 2102 sends an InvoiceAccountingCancellationRequest message 2112 to Accounting 2104. The message type 2114 of the InvoiceAccountingCancellationRequest message 2112 is 0412, i.e., a request for the full cancellation of posting information previously sent to financials, regarding an incoming or outgoing invoice or credit memo.

Invoicing/Billing 2102 sends a PaymentDueNotification message 2116 to Payment 2106. The message type 2118 of the PaymentDueNotification message 2116 is 0430, i.e., the PaymentDueNotification notifies an application (Payment), in which subsequent operative processing of payments take place, about due dates (accounts receivable and accounts payable) of business partners.

Invoicing/Billing 2102 sends a PaymentDueCancellationRequest message 2120 to Payment 2106. The message type 2122 of the PaymentDueCancellationRequest message 2120 can be any conventional Payment Due Cancellation Request.

(e) Tax Due

Figure 22:
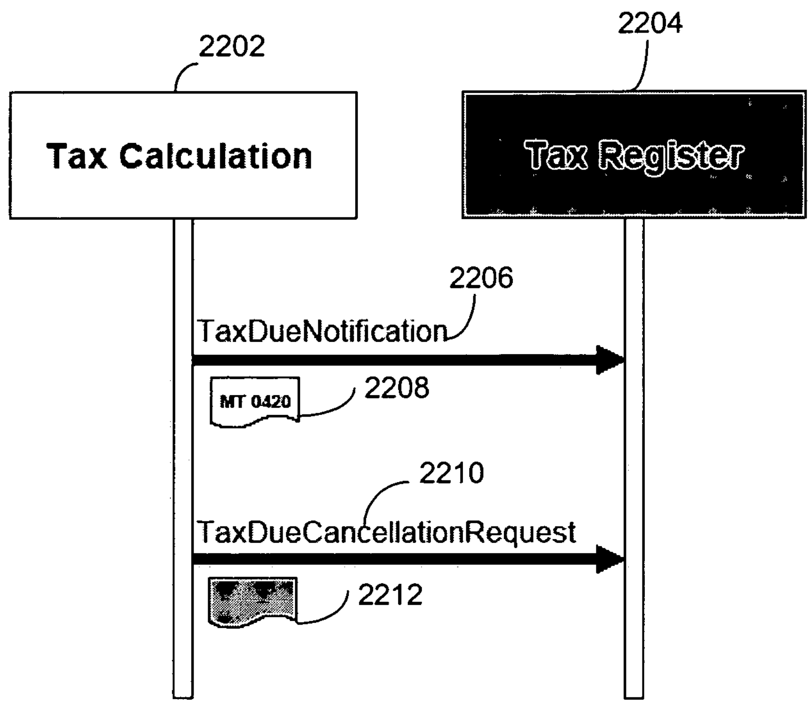
FIG. 22 depicts a message choreography of Tax Due in accordance with methods and systems consistent with the subject matter described herein.

FIG. 22 depicts the message choreography of Tax Due. The Tax Due choreography involves two components: Tax Calculation 2202 and Tax Register 2204.

Tax Calculation 2202 sends a TaxDueNotification message 2206 to the Tax Register 2204. The message type 2208 of the TaxDueNotification message 2206 is 0420, i.e., the TaxDueNotification communicates data from tax determination and calculation relevant for tax reports and tax payments to the tax register of a company.

Tax Calculation 2202 sends a TaxDueCancellationRequest message 2210 to the Tax Register 2204. The message type 2212 of the TaxDueCancellationRequest message 2210 can be any conventional Tax Due Cancellation Request.

Figure 23:
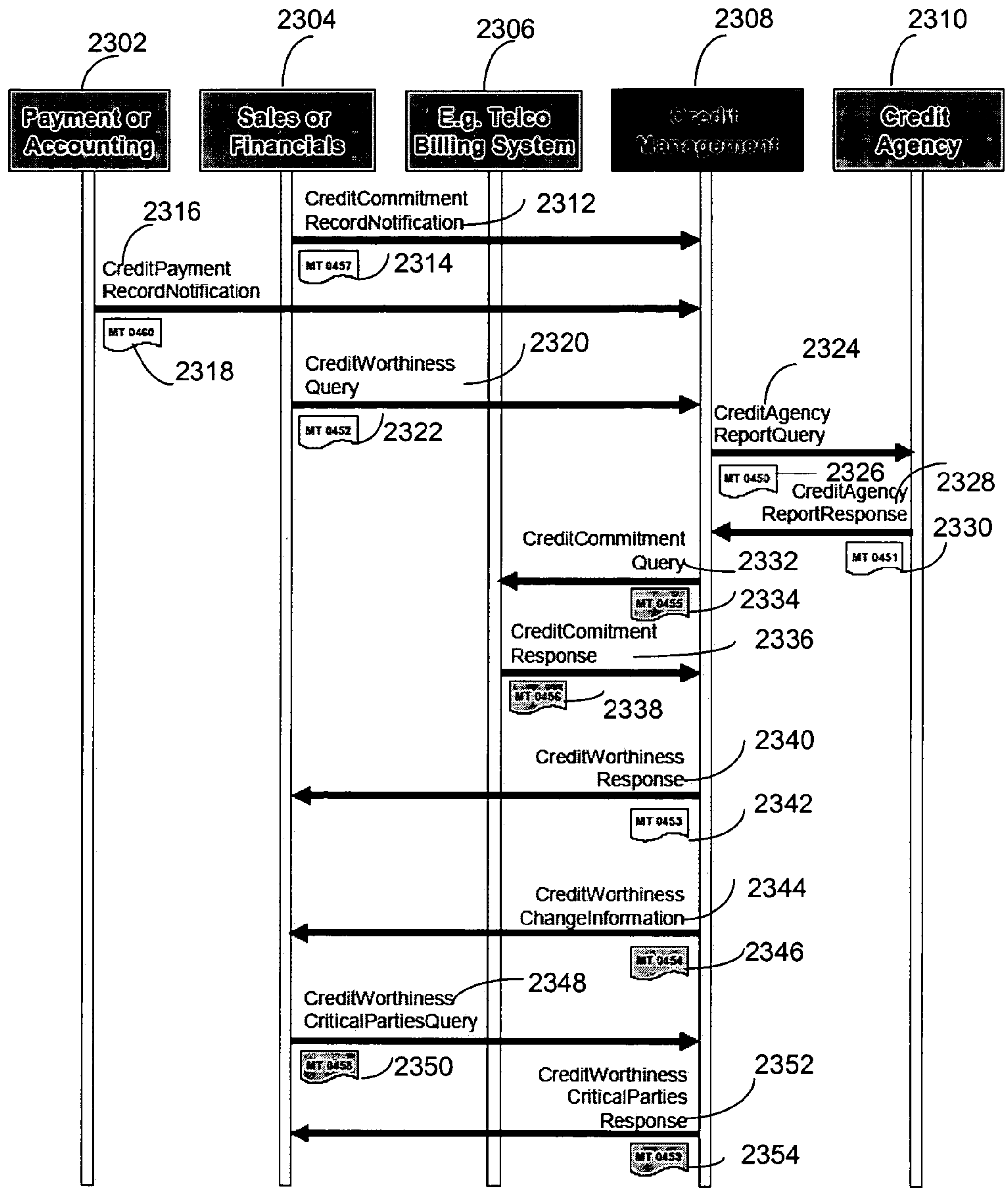
FIG. 23 depicts a message choreography of Credit Worthiness, Credit Agency Report, Credit Payment, and Credit Commitment in accordance with methods and systems consistent with the subject matter described herein.

(f) Credit Worthiness, Credit Agency Report, Credit Payment, and Credit Commitment FIG. 23 depicts the message choreography of Credit Worthiness, Credit Agency Report, Credit Payment, and Credit Commitment. The Credit Worthiness, Credit Agency Report, Credit Payment, and Credit Commitment choreography involves five components: Payment or Accounting 2302, Sales or Financials 2304, a Billing System (e.g., Telco) 2306, Credit Management 2308, and Credit Agency 2310.

Sales or Financials 2304 sends a CreditCommitmentRecordNotification message 2312 to Credit Management 2308. The message type 2314 of the CreditCommitmentRecordNotification message 2312 is 0457, i.e., a notice to credit management about existing payment obligations of business partners.

Payment or Accounting 2302 sends a CreditPaymentRecordNotification message 2316 to Credit Management 2308. The message type 2318 of the CreditPaymentRecordNotification message 2316 is 0460, i.e., a notice to credit management about the payment behavior of business partners.

Sales or Financials 2304 sends a CreditWorthinessQuery message 2320 to Credit Management 2308. The message type 2322 of the CreditWorthinessQuery message 2320 is 0452, i.e., an inquiry to credit management concerning the credit worthiness of a business partner.

Credit Management 2308 sends a CreditAgencyReportQuery message 2324 to Credit Agency 2310. The message type 2326 of the CreditAgencyReportQuery message 2324 is 0450, i.e., an inquiry to a credit agency concerning the credit report for a business partner.

Credit Agency 2310 sends a CreditAgencyReportResponse message 2328 to Credit Management 2308. The message type 2330 of the CreditAgencyReportResponse message 2328 is 0451, i.e., a response from a credit agency concerning the inquiry about the credit report for a business partner.

Credit Management 2308 sends a CreditCommitmentQuery message 2332 to the Billing System 2306. The message type 2334 of the CreditCommitmentQuery message 2332 is 0455, i.e., an inquiry from credit management concerning existing payment obligations of a business partner.

The Billing System 2306 sends a CreditCommitmentResponse message 2336 to Credit Management 2308. The message type 2338 of the CreditCommitmentResponse message 2336 is 0456, i.e., a response concerning an inquiry from credit management about existing payment obligations of a business partner.

Credit Management 2308 sends a CreditWorthinessResponse message 2340 to Sales or Financials 2304. The message type 2342 of the CreditWorthinessResponse message 2340 is 0453, i.e., a response from credit management concerning the inquiry about the credit worthiness of a business partner.

Credit Management 2308 sends a CreditWorthinessChangeInformation message 2344 to Sales or Financials 2304. The message type 2346 of the CreditWorthinessChangeInformation message 2344 is 0454, i.e., information about changes of the credit worthiness of a business partner.

Sales or Financials 2304 sends a CreditWorthinessCriticalPartiesQuery message 2348 to Credit Management 2308. The message type 2350 of the CreditWorthinessCriticalPartiesQuery message 2348 is 0458, i.e., an inquiry to credit management about business partners, for which the credit worthiness has been rated as critical.

Credit Management 2308 sends a CreditWorthinessCriticalPartiesResponse message 2352 to Sales or Financials 2304. The message type 2354 of the CreditWorthinessCriticalPartiesResponse message 2352 is 0459, i.e., a response from credit management concerning an inquiry about business partners, for which the credit worthiness has been rated as critical.

(5) Human Capital Management (a) Personnel Time Sheet

Figure 24:
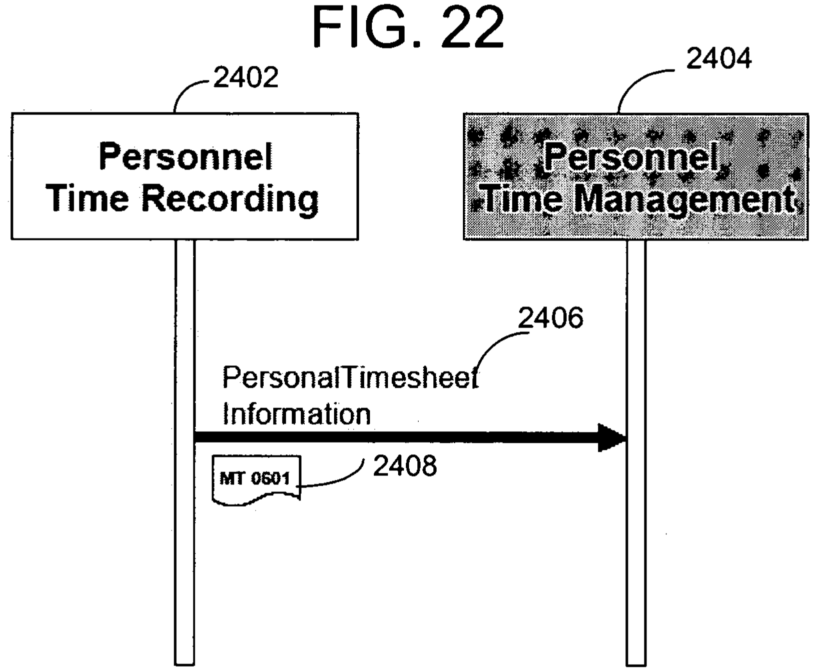
FIG. 24 depicts a message choreography of a Personnel Time Sheet in accordance with methods and systems consistent with the subject matter described herein.

FIG. 24 depicts the message choreography of a Personnel Time Sheet. The Personnel Time Sheet choreography involves two components: Personnel Time Recording 2402 and Personnel Time Management 2404.

Personnel Time Recording 2402 sends a PersonalTimeSheetInformation message 2406 to Personnel Time Management 2404. The message type 2408 of the PersonalTimeSheetInformation message 2406 is 0601, i.e., the PersonnelTimeSheetInformation communicates recorded personnel times and personnel time events from an upstream personnel time recording system to personnel time management.

2. Components of the Business Object Model

The overall structure of the business object model ensures the consistency of the interfaces that are derived from the business object model. The derivation ensures that the same business-related subject matter or concept is represented and structured in the same way in all interfaces.

The business object model defines the business-related concepts at a central location for a number of business transactions. In other words, it reflects the decisions made about modeling the business entities of the real world acting in business transactions across industries and business areas. The business object model is defined by the business objects and their relationship to each other (the overall net structure).

A business object is a capsule with an internal hierarchical structure, behavior offered by its operations, and integrity constraints. Business objects are semantically disjoint, i.e., the same business information is represented once. In the business object model, the business objects are arranged in an ordering framework. From left to right, they are arranged according to their existence dependency to each other. For example, the customizing elements may be arranged on the left side of the business object model, the strategic elements may be arranged in the center of the business object model, and the operative elements may be arranged on the right side of the business object model. Similarly, the business objects are arranged from the top to the bottom based on defined order of the business areas, e.g., finance could be arranged at the top of the business object model with CRM below finance and SRM below CRM.

To ensure the consistency of interfaces, the business object model may be built using standardized data types as well as packages to group related elements together, and package templates and entity templates to specify the arrangement of packages and entities within the structure.

"The following sections © SAP AG."

a) Data Types

Data types are used to type object entities and interfaces with a structure. This typing can include business semantic. For example, the data type BusinessTransactionDocumentID is a unique identifier for a document in a business transaction. Also, as an example, Data type BusinessTransactionDocumentParty contains the information that is exchanged in business documents about a party involved in a business transaction, and includes the party's identity, the party's address, the party's contact person and the contact person's address. BusinessTransactionDocumentParty also includes the role of the party, e.g., a buyer, seller, product recipient, or vendor.

The data types are based on Core Component Types ("CCTs"), which themselves are based on the World Wide Web Consortium ("W3C") data types. "Global" data types represent a business situation that is described by a fixed structure. Global data types include both context-neutral generic data types ("GDTs") and context-based context data types ("CDTs"). GDTs contain business semantics, but are application-neutral, i.e., without context. CDTs, on the other hand, are based on GDTs and form either a use-specific view of the GDTs, or a context-specific assembly of GDTs or CDTs. A message is constructed with reference to a use, and is thus a use-specific assembly of GDTs and CDTs. The data types can be aggregated to complex data types.

To achieve a harmonization across business objects and interfaces, the same subject matter is always typed with the same data type. For example, the data type "GeoCoordinates" is built using the data type "Measure" so that the measures in a GeoCoordinate (i.e., the latitude measure and the longitude measure) are represented the same as other "Measures" that appear in the business object model.

(1) CoreComponentTypes (CCTs)

(a) Amount

A CCT Amount 2500 is used to represent amounts, costs, remunerations, and fees. A CCT Amount 2500 includes an amount with the corresponding currency unit. An example of the CCT Amount 2500 is: <Amount currencyCode="EUR">777.95</Amount>, which represents the amount 777.95 Euros.

The structure of CCT Amount 2500 is depicted in FIG. 25. CCT Amount 2500 includes the attribute currencyCode 2502. For CCT Amount 2500, the Category is complexType 2504, the Property is Amount 2510, the Representation/Association is Content 2514, the Type is xsd 2518, the Type Name is decimal 2522, and the Length can have a maximum 22 predecimal places and 6 decimal places 2626.

For the currencyCode 2502, the Category is Attribute 2506, the Object Class is Amount 2508, the Property is Currency 2512, the Representation/Association is Code 2516, the Type is xsd 2520, the Type Name is token 2524, and the Length is three 2528. The Cardinality between CCT Amount 2500 and currencyCode 2502 is one 2530. CurrencyCode 2502 is mandatory 2532. CurrencyCode 2502 requires the currency to always be specified.

(b) BinaryObject

A CCT BinaryObject 2600 includes a finite data stream of any number of characters in binary notation (octets). CCT BinaryObject 2600 can be delivered to a partner using two methods: (1) an implicit representation as an element value; or (2) as a MIME attachment within a message, with a unique URI-based reference to the corresponding attachment. An example for CCT BinaryObject 2600 is a representation of CCT BinaryObject 2600 as an element value based on base64 encoding is:

```
<BinaryObject typeCode="application/zip" name="photos.zip">
    T2xkIE1hY0RvbmFsZCBoYWQgYSBmYXJtCkUgSS
    BFIEkgTwpBbmQgb24gaGlzIGZhcm0gaGUgaGFk
    IHNvbWUgZHVja3MKRSBJIEUgSSBPCldpdGggYS
    BxdWFjayBxdWFjayBoZXJlLAphIHF1YWNrIHF1
    YWNrIHRoZXJlLApldmVyeSB3aGVyZSBhIHF1YW
    NrIHF1YWNrCkUgSSBFIEkgTwo=
</BinaryObject>.
```

An example of a reference to CCT BinaryObject 2600 that is delivered as a MIME attachment within a message is:

<BinaryObject uri="cid:a34ccrt@15.4.9.92/s445"/>.

The element value of CCT BinaryObject 2600 is based on the XML-scheme-specific built-in data type xsd: base64binary. This enables any binary data to be represented using base64 encoding. This is done using the base64 Content-Transfer-Encoding procedure.

The structure of CCT BinaryObject 2600 is depicted in FIG. 26. CCT BinaryObject 2600 includes attributes mimeCode 2602, charSetCode 2604, format 2606, filename 2608, and URI 2610. For CCT BinaryObject 2600, the Category is complexType 2612, the Property is Binary-Object 2634, the Representation/Association is Content 2646, the Type is xsd 2658, and the Type Name is base64binary 2670.

MimeCode 2602 identifies the medium type (image, audio, video, application) of the binary content according to the MIME type definition in IETF RFC 2046 and the corresponding MIME type recommendations. For mimeCode 2602, the Category is Attribute 2614, the Object Class is Binary-Object 2625, the Property is mime 2636, the Representation/Association is Code 2648, the Type is xsd 2660, the Type Name is token 2672, and the Cardinality may be 0 or 1 2680. MimeCode 2602 is necessary when CCT BinaryObject 2600 is represented as an element value (see 2688).

CharSetCode 2604 identifies the specific character set of text data. For CharSetCode 2604, the Category is Attribute 2616, the Object Class is Binary-Object 2626, the Property is Character Set 2638, the Representation/Association is Code 2650, the Type is xsd 2662, the Type Name is token 2674, and the Cardinality may be 0 or 1 2680. CharSetCode 2604 is necessary when CCT BinaryObject 2600 is represented as an element value and comprises text data (see 2690).

Format 2606 describes the format of the binary content if the format is not clear or unique from the "mimeCode." For Format 2606, the Category is Attribute 2618, the Object Class is Binary-Object 2628, the Property is Format 2640, the Representation/Association is Text 2652, the Type is xsd 2664, the Type Name is token 2675, and the Cardinality may be 0 or 1 2684. Format 2606 may be optional (see 2692).

Filename 2608 contains the corresponding name or file name of the binary content according to the MIME protocol. For filename 2608, the Category is Attribute 2620, the Object Class is Binary-Object 2630, the Property is Filename 2642, the Representation/Association is Text 2654, the Type is xsd 2666, the Type Name is string 2676, and the Cardinality is may be 0 or 1 2686. Filename 2608 is not defined in ebXML CCTS 1.8, but it is to be submitted. Filename 2608 also conforms with IETF RFC 1341 (see 2694).

URI 2610 references the physical location of CCT BinaryObject 2600 if this is represented as a MIME attachment in a SOAP message or in an ebXML-MSG message. The syntax of the URI is defined in the IETF RFC 2396 recommendation and is as follows: <scheme>.<scheme-specific part>. For URI 2610, the Category is Attribute 2622, the Object Class is Binary-Object 2632, the Property is Uniform Resource 2644, the Representation/Association is Identifier 2656, the Type is xsd 2668, and the Type Name is any URI 2678. URI 2610 is necessary when referencing a remote CCT BinaryObject 2600 (see 2696).

As enumerated by the Internet Assigned Numbers Authority (IANA), November 2002, various MIME types are available for mimeCode 2602. For example one MIME type may be iso-8859-n, where n is a placeholder for the number of the relevant ISO character set from 1 to 9. Another example MIME type is us-ascii.

Various URI schemes are also available for the scheme-specific part in the URI, as enumerated by the IANA. For example, one available scheme is cid which is a content identifier. Another available scheme is uuid, which is a Universal Unique Identifier Scheme.

CCT BinaryObject 2600 can be used for binary data and all types of binary files. This includes graphics (such as diagrams, mathematic curves, and the like), pictures (such as photos, passport photos, and the like), sound recordings, video recordings, and documents in binary notation (such as PDF, DOC, and XLS files). The primary Representation/Association for CCT BinaryObject 2600 is BinaryObject. Additional secondary Representation/Associations may be Graphic, Picture, Sound and Video.

The useful data in Binary Object 2600 may be delivered either as an element value using base64 octet representation or as a MIME attachment. In certain variations, CCT BinaryObject 2600 is not used to reference a file that is located on a Web server. The global data type "WebAddress" is available for this purpose. If CCT BinaryObject 2600 is in a MIME attachment, the URI 2610 may reference the corresponding "Content ID" of the respective MIME attachment. For this purpose, URI scheme cid may be used, which identifies a freely defined "Content ID". URI scheme uuid may also be used for this purpose. Uuid identifies a unique identification in accordance with UUID guidelines.

It is not necessary to specify the "typeCode" and "fileName" attributes in a MIME attachment, since this information is contained in the MIME attachment itself.

(c) Code

A CCT Code 2700 is a character string of letters, numbers, special characters (except escape sequences), and symbols. It represents a definitive value, a method, or a property description in an abbreviated or language-independent form. An example for the CCT Code 2700 is: a Standard Code/Standard Agency is <SecurityErrorCode listID="DE 0571" listAgencyID="6">4</SecurityErrorCode>.

An example of a Proprietary Code/Standard Agency is <SecurityErrorCode listID="SEC" listAgencyID="065055766" listAgencySchemeID="DUNS" listAgencySchemeAgencyID="016">ANS</SecurityErrorCode>.

An example of a Proprietary Code/Proprietary Agency is <SecurityErrorCode listID="SEC" listAgencyID="4711" listAgencySchemeID="PartyA" listAgencySchemeAgencyID="ZZZ">ER05</SecurityErrorCode>

The structure of CCT Code 2700 is depicted in FIG. 27. CCT Code 2700 includes Attributes listID 2702, listVersionID 2704, listAgencyID 2706, listAgency-SchemeID 2708, and listAgency-SchemeAgencyID 2710. For CCT Code 2700, the Category is complexType 2712, the Property is Code 2734, the Representation/Association is Content 2746, the Type is xsd 2758, and the Type Name is token 2770.

ListID 2702 identifies a list of the codes that belong together. ListID 2702 is unique within the agency that manages this code list. For listID 2702, the Category is Attribute 2714, the Object Class is CodeList 2724, the Property is Identification 2736, the Representation/Association is Identifier 2748, the Type is xsd 2760, the Type Name is token 2772, and the Cardinality is may be 0 or 1 2782. The attribute ListID may be optional (see 2792).

ListVersionID 2704 identifies the version of a code list. For listVersionID 2704, the Category is Attribute 2716, the Object Class is CodeList 2726, the Property is Version 2738, the Representation/Association is Identifier 2750, the Type is xsd 2762, the Type Name is token 2774, and the Cardinality may be 0 or 1 2784. The attribute ListVersionID may be optional (see 2792).

ListAgencyID 2706 identifies the agency that manages the code list. The agencies from DE 3055 are used as the default (without roles). For listAgencyID 2706, the Category is Attribute 2718, the Object Class is CodeListAgency 2728, the Property is Identification 2740, the Representation/Association is Identifier 2752, the Type is xsd 2764, the Type Name is token 2776, and the Cardinality is may be 0 or 1 2786. The attribute ListAgencyID may be optional (see 2796).

ListAgencySchemeID 2708 identifies the identification scheme that represents the context that is used to identify the agency. For listAgencySchemeID 2708, the Category is Attribute 2720, the Object Class is CodeListAgency 2730, the Property is Scheme 2742, the Representation/Association is Identifier 2754, the Type is xsd 2766, the Type Name is token 2778, and the Cardinality is may be zero or one 2788. The attribute ListVersionAgencyID may be optional (see 2797).

ListAgencySchemeAgencyID identifies the agency that manages the listAgencySchemeID. This attribute can contain values from DE 3055 (excluding roles). For listAgencySchemeAgencyID 2710, the Category is Attribute 2722, the Object Class is CodeListAgency 2732, the Property is SchemeAgency 2744, the Representation/Association is Identifier 2756, the Type is xsd 2768, the Type Name is token 2780, and the Cardinality may be zero or one 2790. The attribute listAgencySchemeAgencyID may be optional (see 2798).

The CCT Code 2700 data type is used for elements that are used in the communication between partners or systems to enable a common coded value representation in place of texts, methods, or properties. This code list should be relatively stable, and not subject to frequent or significant changes (for example, CountryCode, LanguageCode, and so on). If the agency that manages the code list is not named explicitly, but is specified by using a role, this is done in the tag name.

Standardized codes and proprietary codes may be represented by CCT Code 2700. For standardized codes whose code lists are managed by an agency from the DE 3055 code list, listID 2702 identifies the code list for the standard code, listVersionID 2704 identifies the version of the code list, and listAgencyID 2706 identifies the agency from DE 3055 (excluding roles). For proprietary codes whose code lists are managed by an agency that is identified using a standard, listID 2702 identifies a code list for the proprietary code, listVersionID 2704 identifies a version of the code list, listAgencyID 2706 identifies standardized ID for the agency (such as the company that manages the proprietary code list), listAgencySchemeID 2708 identifies the identification scheme for the schemeAgencyID, and listAgency-SchemeAgencyID 2710 identifies the agency from DE 2055 that manages the standardized ID 'listAgencyID'. For proprietary codes whose code lists are managed by an agency that is identified without the use of a standard, list ID 2702 identifies a code list for the proprietary code, listVersionID 2704 identifies a version of the code list, listAgencyID 2706 identifies a proprietary ID for the agency (such as the company that manages the proprietary code list), list AgencySchemeID 2708 identifies the identification scheme for the schemeAgencyID, and listAgencySchemeAgencyID 2710 identifies 'ZZZ' which is mutually defined from DE 3055.

For proprietary codes whose code lists are managed by an agency that is specified using a role or not at all, listID 2702 identifies an identification scheme for the proprietary identifier, and listVersionID 2704 identifies a version of the identification scheme. The role is specified as a prefix in the tag name. If there is more than one code list, listID and listVersionID can be used as attributes. No attributes are required if there is only one code list.

The representation term for the CCT Code 2700 is Code.

If CCT Code 2700 is used as a basis to define a specific code GDT that combines parts of standard code lists of different standardization organizations, and the complied lists are not disjunctive, attributes listID 2702, listVersionID 2704, and listAgencyID 2706 may be included in the GDT. However, these attributes may not be required in the GDT if the compiled lists are not disjunctive but, in each interface that uses the GDT, the lists supported by the interface are disjunctive.

To be able to represent values, methods, and property descriptions as code, the corresponding code list may be consistent and, unlike identifier lists, subject to very few changes to its content. In certain variations, CCT Code 2700 is not used to uniquely identify any logical or real objects. In some cases it may not be possible to differentiate clearly between Identifier and Code for coded values. This is particularly applicable if a coded value is used to uniquely identify an object and, at the same time, this coded value is used to replace a longer text. For example, this includes the coded values for "Country," "Currency," "Organization," "Region,"

and the like. If the list of coded values in this case is consistent, then the GDT Code can be used for the individual coded values.

For example, a passport number (PassportId) is an "Identifier," because a) it identifies a (real) object, namely, a natural person, and b) the list of passport numbers is constantly growing as new passport numbers are issued. A country code (CountryCode or CountryId) may be either an Identifier or a Code. The country code uniquely identifies a real object, namely, the country. However, the country code itself is also a replacement for the respective (unique) country name. Therefore, it is also a Code. Since the code list is relatively consistent, the country name should be represented as a Code. Changes are caused by political events and such changes are few in comparison to those relating to natural persons. A process code (ProcessCode) is a Code, because a) it describes a method type and not an object, and b) the list of process codes seldom changes.

(d) DateTime

A CCT DateTime 2800 is the time stamp, accurate to the second, of a calendar day. An example for CCT DateTime 2800 is: the following code represents Apr. 19, 2002 at 3:30, in Berlin:

<DateTime>2002-04-19T15:30:00+01:00</DateTime>.

The structure of CCT DateTime 2800 is depicted in FIG. 28. The Category for CCT DateTime 2800 is simpleType 2802, the Property is DateTime 2804, the Representation/Association is Content 2806, the Type is xsd 2808, and the Type Name is dateTime 2810.

The CCT DateTime 2800 core component type uses the W3C built-in data type xsd: dateTime. This is structured in accordance with the extended representation of ISO 8601. However, unlike in xsd: date, in certain variations, negative years or years are not represented with more than 4 numeric values in "Date." The extended representation may be represented as CCYY-MM-DDThh:mm:ss(.sss)Z or CCYY-MM-DDThh:mm:ss(.sss)(+/−)hh:mm (for example, 2002-04-19T15:30:00Z or 2002-04-19T10:30:00+05:00, respectively).

The extended representation uses CC for century (00-99); YY for year (00-99); MM for month (01-12); DD for day (01-28 for month 02; 01-29 for month 02 when the year is a leap year; 01-30 for months 04, 06, 09, and 11; 01-31 for months 01, 03, 05, 07, 08, 10, and 12); a hyphen between the year, month, and day; a separator "T" between the date and time; hh for hours (00-23); mm for minutes (00-59); ss for seconds (00-59); sss for one or more characters after the decimal point to represent fractions of a second; a colon between the hours, minutes, and seconds; Z to specify when the represented time is also the UTC time; +hh:mm to specify when the represented time is a local time that is ahead of UTC time; and −hh:mm to specify when the represented time is a local time that is behind UTC time.

The time stamp may be indicated without additional information (Z, +hh:mm, −hh:mm) relative to the coordinated world time (UTC time). In certain variations, this time stamp is not then be converted to the respective local time and is therefore for information purposes.

Ranges Day, Time, Minutes, Seconds, and Time Zone are defined for DateTime. Day represents all dates from the Gregorian calendar. Time represents exactly 24 hours (0-23). Minutes represents exactly 60 minutes (0-59). Seconds represents exactly 60 seconds (0-59). Time zone may be expressed in UTC (Coordinated Universal Time). If DateTime represents a local time, the time difference with respect to UTC time may also be specified.

CCT DateTime 2800 is used for exact time stamps that may contain the day and time. It may be, the creation date/time, receipt date/time, processing date/time, delivery date/time, expiry date/time, and the like. The primary representation term for the CCT DateTime 2800 is DateTime. Additional secondary representation terms are Date and Time. Date is a calendar representation of a particular day. The Built-In Data Type of Date is xsd: date and a restriction is length=10. Time is a time stamp, accurate to the second, of a particular time. The Built-In Data Type for Time is xsd: time.

The coordinated world time or coordinated universal time (UTC) is currently the uniform basis for time specifications that are used internationally. It is based on the route of the sun and is an extremely constant time unit. The mean solar time at the Greenwich meridian can be used as an approximate guide value for UTC.

The Gregorian calendar is currently used primarily in the western world and is an approximation of the complicated calculation of a "tropical year." The mean of the "tropical year" is 365.2422 days. The Gregorian calendar, in use since 1582, defines the rules for leap years.

(e) ElectronicAddress

A CCT ElectronicAddress 2900 is a unique digital address that is represented by the Unified Resource Identifier (URI). An example for CCT ElectronicAddress 2900 in http format is:

```
<Address>
    www.sap.com/InterfaceRepository/ElectronicAddresses/
    description.htm
</Address>
One example representation of an X.400 address is:
<Address protocolID="XF" >
    mailto:c=DE;a=SAP;p=SAP;o=EXCHANGE;s=STUHEC;
    g=GUNTHER
</Address>.
```

The structure of CCT ElectronicAddress 2900 is depicted in FIG. 29. CCT ElectronicAddress 2900 includes attributes protocolID 2902 and languageCode 2904. The Category for CCT ElectronicAddress 2900 is complexType 2906, the Property is ElectronicAddress 2916, the Representation/Association is Content 2922, the Type is xsd 2928 and the Type Name is any URI 2934.

For protocolID 2902, the Category is Attribute 2908, the Object Class is ElectronicAddress 2912, the Property is Protocol 2918, the Representation/Association is Identifier 2924, the Type is xsd 2930, the Type Name is token 2936, and the Cardinality between the CCT Electronic Address 2900 and protocolID 2902 is zero or one 2942. The protocolID Attribute 2902 may be optional (see 2946).

For languageCode 2904, the Category is Attribute 2908, the Object Class is ElectronicAddress 2914, the Property is Language 2920, the Representation/Association is Code 2926, the Type is xsd 2932, the Type Name is language 2938, the Length is from two to nine 2940, and the Cardinality between CCT Electronic Address 2900 and languageCode 2904 is zero or one 2944. The languageCode Attribute 2904 may be optional (see 2948).

The syntax for CCT Electronic Address 2900 is specified in the IETF RFC 2396. A URI consists of the scheme (in other words, how to access a resource), followed by a colon and the scheme-specific part. The scheme-specific part is relevant for the service that is connected to the particular scheme. A resource can have multiple URIs. One reason may be that a resource exists physically at multiple locations, due to mirroring, or it may be addressed using different protocols, which are specified by the scheme name. For example, a file can be referenced using http and ftp.

A URI is therefore generally constructed as <scheme>: <scheme-specific part>. The following is an example of a URL with typical partial expression types:

<scheme>://<user>:<password>@<host>:<port>/<path>?<query>;

<argument>=<value>&<argument>=<value>#<fragment>.

URI schemes that are available include ftp, http, mailto, File, cid, mid, nfs, https, uuid. Additional URI schemes that are currently not required include Gopher, News, nntp, telnet, wais, prospere, z39.50s, z39.50r, vemmi, service, imap, acap, rtsp, tip, pop, data, dav, opaquelocktoken, sip, tel, fax, modem, Idap, soap.beep, soap.beeps, urn, go, afs, tn3270, and mailserver.

If the above-listed URI schemes are not sufficient to determine the address protocol, one can either apply for another URI scheme in accordance with the guidelines of IETF RFC 2717, or define the corresponding protocol type more exactly by specifying the "protocolID" attribute as well. For this protocol type, the codes from the UN/EDIFACT DE 3155 "Communication Address Code Qualifier" code list are used. These codes include AB, AF, AN, AO, EM, El, FT, GM, IM, SW, and XF. AB refers to Communications number assigned by Societe Internationale de Telecommunications Aeronaufiques (SITA). AD refers to the AT&T mailbox identifier. AF refers to the switched telecommunications network of the United States Department of Defense. AN refers to the ODETTE File Transfer Protocol. AO refers to identification of the Uniform Resource Location (URL) Synonym: World wide web address. EM refers to the Electronic Mail Exchange of mail by electronic means (SMTP). EI refers to the number identifying the service and service user of an EDI transmission. FT refers to the file transfer access method according to ISO. GM refers to the GEIS (General Electric Information Service) mailbox. IM refers to the Internal mail address/number. SW refers to communications address assigned by Society for Worldwide Interbank Financial Telecommunications s.c. XF refers to the X.400 address.

No codings currently exist for ms (Microsoft Mail) and ccmail protocols, although respective coding proposals are expected to be submitted to the UN/CEFACT Forum for standardization.

If the attachment is a document or text, attribute languageCode 2904 may be used to represent the language of the attachment in accordance with IETF RFC 1766 or IETF RFC 3066.

CCT ElectronicAddress 2900 is a core component type that can be used to represent global data types (GDTS) for email addresses, Web sites, and documents or information provided on Web sites. The representation term for the CCT ElectronicAddress 2900 is ElectronicAddress.

In certain variations, CCT ElectronicAddress 2900 is not used as a reference component for binary data that is sent as an additional MIME attachment. The CCT BinaryObject 2900 is available for this purpose.

(f) Identifier

A CCT Identifier 3000 is a unique identification of an object within an identification scheme that is managed by an agency. There may be multiple identification schemes for identifying an object. An example for CCT Identifier 3000 is: a Standard Identifier/Standard Agency is <ProductID schemeID="GTIN" schemeAgencyID="113"> 10614141000415</ProductId>. One example of a Proprietary Identifier/Standard Agency is <ProductID schemeID="householdappliance" schemeAgencyID="065055766" schemeAgencySchemeID="DUNS" schemeAgencySchemeAgencyID="016">123</ProductId>. One example of a Proprietary Identifier/Proprietary Agency is <ProductID schemeID="householdappliance" schemeAgencyID="4711" schemeAgencySchemeID="PartyA" schemeAgencySchemeAgencyID="ZZZ">456</ProductId>.

The structure of CCT Identifier 3000 is depicted in FIG. 30. CCT Identifier 3000 includes Attributes schemeID 3002, schemeVersionID 3004, schemeAgencyID 3006, schemeAgency-SchemeID 3008, and schemeAgency-SchemeAgencyID 3010. For CCT Identifier 3000, the Category is complexType 3012, the Object Class is Identifier 3024, the Property is identifier 3036, the Representation/Association is Content 3048, the Type is xsd 3060, and the Datatype is token 3072.

SchemeID 3002 identifies an identification scheme. The identification scheme represents the context that is used to identify an object. SchemeID is unique within the agency that manages this identification scheme. For schemeID, the Category is Attribute 3014, the Object Class is Identification-Scheme 3026, the Property is Identification 3038, the Representation/Association is Identifier 3050, the Type is xsd 3062, the Datatype is token 3074, and the Length is from one to sixty 3084. The Cardinality between the CCT Identifier 3000 and schemeID 3002 is zero or one 3090. The schemeID attribute 3002 may be optional (see 3095).

SchemeVersionID 3004 identifies the version of an identification scheme. For schemeVersionID, the Category is Attribute 3016, the Object Class is IdentificationScheme 3028, the Property is Version 3040, the Representation/Association is Identifier 3052, the Type is xsd 3064, the Data-type is token 3076, and the Length is from one to fifteen 3086. The Cardinality between the CCT Identifier 3000 and Scheme-Version ID is zero or one 3091. The schemeVersionID attribute 3004 may be optional (see 3096).

SchemeAgencyID 3006 identifies the agency that manages an identification scheme. The agencies from DE 3055 are used as the default, but in certain variations the roles defined in DE 3055 are not used. For schemeAgencyID, the Category is Attribute 3018, the Object Class is IdentificationScheme-Agency 3030, the Property is Identification 3042, the Representation/Association is Identifier 3054, the Type is xsd 3066, the Datatype is token 3078, and the Length is between one to sixty 3087. The Cardinality between the CCT Identifier 3000 and schemeAgencyID 3006 is zero or one 3092. The schemeAgencyID attribute 3006 may be optional (see 3097).

SchemeAgencySchemeID 3008 identifies the identification scheme that represents the context that is used to identify the agency. For schemeAgencySchemeID, the Category is Attribute 3020, the Object Class is IdentificationScheme-Agency 3032, the Property is Scheme 3044, the Representation/Association is Identifier 3056, the Type is xsd 3068, the Datatype is token 3080, and the Length is from one to sixty 3088. The Cardinality between CCT Identifier 3000 and schemeAgencySchemeID 3008 is zero or one 3093. The SchemeAgencySchemeID attribute 3008 may be optional (see 3098).

SchemeAgencySchemeAgencyID 3010 identifies the agency that manages the SchemeAgencySchemeID. This attribute can contain values from DE 3055 (excluding roles). For SchemeAgencySchemeAgencyID, the Category is Attribute 3022, the Object Class is IdentificationScheme-Agency 3034, the Property is SchemeAgency 3046, the Representation/Association is Identifier 3058, the Type is xsd 3070, the Data-type is token 3082, and the Length is three 3089. The Cardinality between the CCT Identifier and SchemeAgencySchemeAgencyID 3010 is zero or one 3099. The SchemeAgencySchemeAgencyID attribute 3010 may be optional (see 3099).

The CCT Identifier 3000 data type is used for elements or attributes that are used in the communication between partners or systems to enable unique identification of logical or real objects. The number of types should not be limited, but continues to grow (e.g., ProductId, OrderId, . . . ). New IDs are continually added.

If the agency that manages the identification scheme is not explicitly identified, but is specified using a role, this is done in the tag name.

Standardized and proprietary identifiers can be represented. For standardized identifiers whose identification schemes are managed by an agency from the DE 3055 code list, schemeID 3002 identifies an identification scheme for the standard identifier, schemeVersionID 3004 identifies a version of the identification scheme, and schemeAgencyID 3006 identifies an agency from DE 3055 (excluding roles). For proprietary identifiers whose identification schemes are managed by an agency that is identified using a standard, schemeID 3002 identifies an identification scheme for the proprietary identifier, schemeVersionID 3004 identifies a version of the identification scheme, schemeAgencyID 3006 identifies a standardized ID for the agency (normally the company that manages the proprietary identifier), schemeAgencySchemeID 3008 identifies an identification scheme for the schemeAgencyID, and schemeAgencySchemeAgencyID 3010 identifies an agency from DE 3055 that manages standardized ID 'schemeAgencyID'. For proprietary identifiers whose identification schemes are managed by an agency that is identified without the use of a standard, schemeID 3002 identifies an identification scheme for the proprietary identifier, schemeVersionID 3004 identifies a version of the identification scheme, schemeAgencyID 3006 identifies a proprietary ID for the agency (normally the company that manages the proprietary identifier), schemeAgencySchemeID 3008 identifies an identification scheme for the schemeAgencyID, and schemeAgencySchemeAgencyID 3010 identifies 'ZZZ' which is mutually defined from DE 3055.

For proprietary identifiers whose identification schemes are managed by an agency that is specified using a role or not at all, schemeID 3002 identifies an identification scheme for the proprietary identifier and schemeVersionID 3004 identifies a version of the identification scheme. The role is specified as a prefix in the tag name. If there is more than one identification scheme, schemeID 3002 and schemeVersionID 3004 can be used as attributes. No attributes are required if there is one identification scheme.

The representation term for the CCT "Identifier" is Identifier.

(g) Indicator

A CCT Indicator 3100 is the binary encoded specification of a fact that has the value '0' or '1', i.e., 'true' or 'false'. An example for the CCT Indicator 3100 is: <Indicator>true</Indicator>.

The structure of CCT Indicator 3100 is depicted in FIG. 31. The Category for CCT Indicator 3100 is simpleType 3102, the Property is Indicator 3104, the Representation/Association is Content 3106, the Type is xsd 3108, and the Type Name is Boolean 3110.

CCT Indicator 3100 can have either the value 'true' ('1') or 'false' ('0'). CCT Indicator 3100 is used for binary classifications, indicators, flags, and the like. The representation term for the CCT "Indicator" is Indicator.

(h) Measure

CCT Measure 3200 is a physical measure value with the corresponding measurement unit. One example of CCT Measure 3200 is <Measure unitCode="KG">100</Measure>

The structure of Measure 3200 is depicted in FIG. 32. The Category for CCT Measure 3200 is complex Type 3204, the Property is Measure 3210, the Representation/Association is Content 3214, the Datatype is xsd: decimal 3218, and the length is 13 predecimal digits and 6 decimal values. Measure 3200 also includes attribute unitCode 3202. For Attribute unitCode 3202, the Category is Attribute 3206, the Object Class is Quantity 3206, the Property is Unit 3212, the representation term is Code 3216, the Datatype is xsd: token 3220, the length is 1 to 3 3224, and the Cardinality is one 3226.

Positive and negative quantities can be used by using the built-in data type "xsd: decimal." Negative values may be prefixed with a negative sign ("−"). However, positive values do not require a positive sign "+" prefix. Measurement units are represented in the attribute "unitCode," in accordance with UN/ECE Recommendation #20.

Measure is used for the representation of measure values with physical sizes (meters, centimeters, kilograms). The Representation/Association for the CCT "Measure" is Measure.

Measure should not be confused with Quantity. In contrast to Measure, Quantity is used for the definition of quantity values or units. Quantities can on the one hand be piece sizes, such as packets, containers, and the like. but also physical sizes (meters, centimeters, kilograms).

(i) Numeric

A CCT Numeric 3300 is a decimal value. An example of the CCT Numeric 3300 is: <Numeric>123.345</Numeric>.

The structure of CCT Numeric 3300 is depicted in FIG. 33. The Category for CCT Numeric 3300 is complexType 3302, the Property is Numeric 3304, the Representation/Association is Content 3306, and the Datatype is xsd: decimal 3308.

Positive and negative numeric values can be used by using the built-in data type "xsd: decimal." Negative values may be prefixed with a negative sign ("−"). However, positive values do not require a positive sign "+" prefix. The decimal sign may be represented as a period (".").

The primary representation term for CCT Numeric 3300 is Numeric. Other secondary representation terms are Value, Rate, and Percent.

In certain variations, CCT Numeric 3300 is not used for an indication of quantity, measure or amount.

(j) Quantity

A CCT Quantity 3400 is a quantity with the corresponding quantity unit. An example of the CCT Quantity 3400 is: <Quantity unitCode="CT">100</Quantity>(CT=Carton).

The structure of CCT Quantity 3400 is depicted in FIG. 34. CCT Quantity 3400 includes attribute unitCode 3402. For the CCT Quantity 3400, the Category is Complex Type 3404, the Property is Quantity 3410, the Representation/Association is Content 3414, the Data Type is xsd: decimal 3418, and the Length is thirteen predecimal and six decimal places 3422.

For the Attribute unitCode 3402, the Category is Attribute 3406, the Object Class is Quantity 3406, the Property is Unit 3412, the Representation/Association is Code 3416, the Datatype is xsd: token 3420, and the Length is from one to three 3424. The Cardinality between the CCT Quantity 3400 and unitCode 3402 is one 3426. The attribute unitCode 3402 is mandatory (see 3428).

Positive and negative quantities can be used by using the built-in data type "xsd: decimal." Negative values may be prefixed with a negative sign ("−"). However, positive values do not require a positive sign "+" prefix. Measurement units are represented in the attribute "unitCode," in accordance with UN/ECE Recommendation #20 or X12 355.

CCT Quantity 3400 is used for the representation of quantity values or units. This can involve physical sizes (meters, centimeters, kilograms) or piece sizes, such as packets, containers, and the like. The representation term for the CCT Quantity 3400 is Quantity.

CCT Quantity 3400 should not be confused with Measure. In contrast to Quantity, Measure is used for the definition of physical properties, such as sizes (temperature, lengths, and the like.) and weights of a part, product or article.

(k) Text

A CCT Text 3500 is a character string with an optional language specification. An example for CCT Text 3500 is: <Text languageCode="DE">Text is a character string with optional language specification.</Text>.

The structure of CCT Text 3500 is depicted in FIG. 35. CCT Text 3500 includes Attribute languageCode 3502. For CCT Text 3500, the Category is complexType 3504, the Property is Text 3508, the Representation/Association is Content 3512, the Type is xsd 3516, the Type Name is string 3520, and the Length is infinity 3524.

If the attachment is a document or text, languageCode 3502 can be used to show the language of the attachment in accordance with IETF RFC 1766 or IETF RFC 3066. For languageCode 3502, the Category is Attribute 3506, the Property is Language 3510, the Type is xsd 3518, the Type Name is language 3522, and the Length is from two to nine 3526. The Cardinality between the CCT Text 3500 and languageCode 3502 is zero or one 3528. Attribute languageCode 3502 may be optional (see 3530).

The primary representation term for the CCT Text 3500 include Amount, BinaryObject, Code, DateTime, Identifier, Indicator, Measure, Numeric, Quantity, and Text. Additional secondary representation terms include Graphic, Picture, Sound, Video, Date, Time, Value, Rate, Percent, and Name. The character length for CCT Text 3500 is not defined.

(2) Global Data Types (a) AcceptanceStatusCode

The GDT AcceptanceStatusCode 3600 is a coded representation of the status of the acceptance by a communication partner regarding a business transaction that has been transmitted to that partner. An example for GDT AcceptanceStatusCode 3600 is: <AcceptanceStatusCode>AP</AcceptanceStatusCode>.

The structure of GDT AcceptanceStatusCode 3600 is depicted in FIG. 36. For GDT AcceptanceStatusCode 3600, the Property is Acceptance Status Code 3602, the Representation/Association is Code 3604, the Type is CCT 3606, the Type Name is Code 3608, and the Length is two 3610. AcceptanceStatusCode CCT 3600 may be restricted (see 3612).

The possible values for GDT AcceptanceStatusCode 3600 may be a selection from the UN/EDIFACT code list DE 4343. Three codes that may be used are AP, AJ, and RE. AP means the business transaction transmitted by the communication partner has been accepted, AJ means a decision regarding the business transaction transmitted by the communication partner has not (yet) been made, and RE means the business transaction transmitted by the communication partner has been rejected.

GDT AcceptanceStatusCode 3600 may be used as a business status instead of as a technical acknowledgment of a message. GDT AcceptanceStatusCode 3600 also may be used as an immediate response to individual messages in bilateral negotiation processes between communication partners.

In a variation, GDT AcceptanceStatusCode 3600 is a proprietary selection from the UN/EDIFACT code list DE 4343. Addition of codes to this selection from the code list may require the approval of the Process Integration Council (PIC).

(b) AccountingObjectSet

A GDT AccountingObjectSet 3700 is a set of different account assignment objects. An account assignment object is a business object to which changes in value from business transactions may be assigned in accounting. An example of GDT AccountingObjectSet 3700 is:

```
<AccountingObjectSet>
    <CostCenterID>CC1000</CostCenterID>
    . . .
</AccountingObjectSet>.
```

The structure of GDT AccountingObjectSet 3700 is depicted in FIG. 37. GDT AccountingObjectSet 3700 includes an element CostCenterID 3702. For GDT AccountingObjectSet 3700, the Object Class is Accounting Object Set 3706 and the Representation/Association is Details 3712.

For CostCenterID 3702, the Category is Element 3704, the Object Class is Cost Center 3708, the Property is Identification 3710, the Representation/Association is identifier 3714, the Type is CCT 3716, the Type is identifier 3718, and the Length is from one to thirty-two 3720. The Cardinality between the GDT AccountingObjectSet 3700 and CostCenterID 3702 is zero or one 3722.

The data type GDT AccountingObjectSet 3700 provides the identifier for multiple types of account assignment objects including cost center (organizational unit for which costs arise), sales order, project, asset, task, funds center, and profit center. Identifiers are optional, but at least one identifier may be specified.

The data type GDT AccountingObjectSet 3700 may be used for account assignment, i.e., to assign an amount or quantity to a set of account assignment objects. The amount or quantity is assigned to account assignment objects of the GDT AccountingObjectSet 3700 according to accounting rules. For example, expenses from the purchase of office materials can be transferred to Accounting once the incoming invoice for the materials has been checked and then assigned to a cost center CC1000 and a profit center PC3050 there.

Applications that distribute an amount to several AccountingObjectSets (e.g., as percentages) may perform this distribution themselves and transfer the partial amounts, each with a separate AccountingObjectSet, to accounting. An example of a percentage distribution to several AccountingObjectSets is 40% to cost center CC1000 and profit center PC3050, 20% to cost center CC2000 and task IO0815, and 40% to cost center CC3000

(c) ActionCode

A GDT ActionCode 3802 is a coded representation of an instruction to the recipient of a message about how to process a transmitted business object.

An example for GDT ActionCode 3802 is:

```
<Item actionCode='04'>
    <ID>10</ID>
    <!-- . . . Further Elements . . . -->
</Item>
```

The structure of ActionCode 3802 is depicted in FIG. 38. For GDT ActionCode 3802, the Property is Action 3804, the Representation/Association is Code 3806, the Type is CCT 3808, the Type Name is Code, and the Length is two 3812. GDT ActionCode 3802 may be a restricted GDT (see 3814).

In a variation, GDT ActionCode 3802 can have a value from 01 to 06. The name for code 01 is Create and means that the element is to be created at the recipient. The element does not exist at the recipient. The element ID and data is transferred. The name for code 02 is Change and means that the element is to be changed at the recipient. The element exists at the recipient. The element ID and data is transferred. The name for the code 03 is Delete and means the element is to be deleted at the recipient. The element exists at the recipient. The element ID is transferred; data is transferred with the exception of elements that are mandatory due to their cardinality. The name for the code 04 is Save and means the element is to be saved at the recipient. The element can exist at the recipient. If the element already exists there, it is changed. If it does not exist there, it is created. The name for code 05 is Remove and means the element is to be deleted at the recipient. The element can exist at the recipient. If it exists, it is deleted. The element ID is transferred; data is not transferred with the exception of elements that are mandatory due to their cardinality. The name for code 06 is No Action and means that no action is to be carried out for the element at the recipient. The element exists at the recipient. The element ID and data is transferred.

ActionCodes may be used under one another in a hierarchy of elements. The following table lists the combinations that may be allowed (X) and not allowed (–).

| | | Parent | | | | | |
|---|---|---|---|---|---|---|---|
| | ActionCode | 01 | 02 | 03 | 04 | 05 | 06 |
| Child | 01 | X | X | — | X | — | — |
| | 02 | — | X | — | X | — | — |
| | 03 | — | X | — | X | — | — |
| | 04 | X(1) | X | — | X | — | X(2) |
| | 05 | — | X | — | X | — | — |
| | 06 | — | X | — | X | — | — |

For the table above, note (1) indicates that the code can have the meaning of the code "01" (Create). Note (2) in the table indicates that, to ensure compatibility with regard to enhancements, code "04" (Save) is allowed because this code is the default code if no code is transferred. A sender preferably does not set this code. A recipient preferably handles this code as a code "06" (No Action).

Also, regarding the table above, no further codes occur under code "03" (Delete) or "05" (Remove) because, apart from the element ID, no further data is transferred. A recipient checks the existence of an element using the rules described for the individual codes and generates an error if necessary. A recipient checks the validity of the codes in a hierarchy of elements according to the rules described and generates an error if necessary. A recipient ignores elements and ActionCodes transferred under a code "03" (Delete) or "05 (Remove) and behaves as if these elements and ActionCodes had not been transferred. A syntax check is allowed for these elements.

The actions requested at the recipient can have names that are typically used in the business context of a message, as long as this does not change the semantics of the ActionCodes defined above. For example, "Annul" or "Cancel" can be used instead of "Delete". An ActionCode is an attribute of the element to which it refers.

The ActionCodes "01" (Create), "02" (Change), "03" (Delete), and "06" (No Action) may model strict semantics that lead to errors at the recipient if the elements corresponding to the actions requested by the sender exist ("01") or do not exist ("02", "03", "06") at the recipient. Using strict semantics, therefore, may require that the sender have and use information about the messages it has already sent. The ActionCodes "04" (Save) and "05" (Remove) model soft semantics that, in a variation, do not lead to errors if the respective elements do not exist at the recipient. These soft semantics, therefore, do not require that the sender have and use information about the messages it has already sent. In a variation, an ActionCode that is not filled in a message instance or does not exist in an interface may be assumed to be "04" (Save). This ensures compatibility when enhancing interfaces to include an ActionCode.

In some messages, the action at the top level may be represented in the name of the message type rather than by an ActionCode. These messages behave semantically as if the ActionCode were at the level of the transferred BusinessTransactionDocument (for example: a message of the message type PurchaseOrderChangeRequest behaves semantically as if an ActionCode "02" (Change) were specified at the PurchaseOrder level).

An ActionCode may be used with a CompleteTransmissionIndicator for the parent element. For information about the combined use of CompleteTransmissionIndicator and ActionCode, see the description herein for the CompleteTransmissionIndicator. The ActionCode, can also be used for an element whose parent element does not have a CompleteTransmissionIndicator. In this case, the child elements of the parent element are transferred, not just the changed child elements.

The ActionCode may be used for elements that remain uniquely identifiable across several messages in a business process or that can only occur once in a message (cardinality 0 . . . 1 or 1). If an element cannot be clearly identified, it is documented explicitly when the ActionCode is used.

In a variation, the ActionCodes "03" (Delete) and "05" (Remove) do not stipulate that the recipient delete the respective element physically. However, once the element has been deleted, the recipient application handles further transmitted ActionCodes as if the element has been physically deleted. For example, in the case of the ActionCode "01" (Create), it is possible to create a new element with the same identification as the deleted element. Exceptions to this ActionCode behavior are explained and documented in the corresponding description of the interface or message type.

(d) ActiveIndicator

A GDT ActiveIndicator 3902 indicates whether an object is commercially active and whether it can be used in a process or not. An example of GDT ActiveIndicator 3902 is: <ActiveIndicator>true</ActiveIndicator>.

The structure of GDT ActiveIndicator 3902 is depicted in FIG. 39. For the GDT ActiveIndicator 3902, the Property is Active Indicator 3904, the Representation/Association is Indicator 3906, and the Type is CCT: Indicator 3908. GDT ActiveIndicator 3902 can have values 1 (true) or 0 (false). True means the object is active and false means the object is not active.

GDT ActiveIndicator 3902 is used to label objects that can be commercially active or inactive, for example, sources of supply. In the context of an interface, there may be a description of which object the GDT ActiveIndicator 3902 refers to and what it means in terms of business.

(e) Address

A GDT Address 4000a contains structured information about types of addresses. This information includes details about addressees, the postal address, and the physical location and communication connections.

The structure of GDT Address 4000a is depicted in FIG. 40. GDT Address 4000a includes elements OrganisationFormattedName 4002a, PersonName 4003a, FunctionalTitleName 4004a, DepartmentName 4005a, Office 4006a, PhysicalAddress 4012a, TaxJurisdictionCode 4036a, TimeZoneDifferenceValue 4037a, GeoCoordinates 4038a, and Communication 4039a. For the GDT Address 4000a, the Object Class is Address 4000b and the Representation/Association is Details 4000c.

Within the global data type GDT Address 4000a, OrganisationFormattedName 4002a contains the name of an organization (for example, a company or corporate body) as a part of the address. For example, this might be the address of a business partner. For OrganisatoinFormattedName 4002a, the Category is Element 4002b, the Object Class is Address 4002c, the Property is Organisation Formatted Name 4002d, the Representation/Association is Name 4002e, the Type is CCT 4002f, the Type Name is text 4002g, and the Length is from zero to forty 4002h. The Cardinality between the GDT Address 4000a and OrganisatoinFormattedName 4002b is from zero to four 4003i. OrganisationFormattedName may be restricted (see 4002j).

PersonName 4003a contains the parts of a natural person's name. For PersonName 4003a, the Category is Element 4003b, the Object Class is Address 4003c, the Property is Person Name 4003d, the Representation/Association is Person Name 4003e, the Type is GDT 4003f, and the Type Name is Person Name 4003g. The Cardinality between the GDT Address 4000a and PersonName 4003a is zero or one 4003h.

FunctionalTitleName 4004a contains the function of a contact person and can be a part of the address of the contact person in the organization. For the FunctionalTitleName 4004a, the Category is Element 4004b, the Object Class is Address 4004c, the Property is Functional Title Name 4004d, the Representation/Association is Name 4004e, the Type is CCT 4004f, the Type Name is Text 4004g, and the Length is from zero to forty 4004h. The Cardinality between the GDT Address 4000a and FunctionalTitleName 4004a is zero or one 4004i. FunctionalTitleName may be restricted (see 4004j).

DepartmentName 4005a contains the department of a contact person and can be a part of the address of the contact person in the organization. For the DepartmentName 4005a, the Category is Element 4005b, the Object Class is Address 4005c, the Property is Department Name 4005d, the Representation/Association is Name 4005e, the Type is CCT 4005f, the Type Name is text 4005g, and the Length is from zero to forty 4005h. The Cardinality between the GDT Address 4000a and DepartmentName 4005a is zero or one 4005i. DepartmentName may be restricted (see 4005j).

Office 4006a contains information that describes the working environment of a contact person as well as information for addressing or identifying this person within the organization. For Office 4006a, the Category is Element 4006b, the Object Class is Address 4006c, the Property is Office 4006d, and the Representation/Association is Details 4006e. The Cardinality between the GDT Address 4000a and Office 4006a is zero or one 4006f. Office can also comprise BuildingID 4007a, FloorID 4008a, RoomID 4009a, InhouseMailID 4010a, and CorrespondenceShortName 4011a.

BuildingID 4007a is the number or ID of the building in the address of a contact person. For BuildingID 4007a, the Category is Element 4007b, the Object Class is Office 4007c, the Property is Building Identification 4007d, the Representation/Association is Identifier 4007e, the Type is CCT 4007f, the Type Name is identifier 4007g, and the Length is from one to ten 4007h. The Cardinality between the GDT Address 4000a and BuildingID 4007a is zero or one 4007i. BuildingID may be restricted (see 4007j).

FloorID 4008a refers to the floor of the building in the address of a contact person. For FloorID 4008a, the Category is Element 4008b, the Object Class is Office 4008c, the Property is Floor Identification 4008d, the Representation/Association is Identifier 4008e, the Type is CCT 4008f, the Type Name is Identifier 4008g, and the Length is from one to ten 4008h. The Cardinality between the GDT Address 4000a and FloorID 4008a is zero or one 4008i. FloorID may be restricted (see 4008j).

RoomID 4009a specifies the room number in the address of a contact person. For RoomID 4009a, the Category is Element 4009b, the Object Class is Office 4009c, the Property is Room Identification 4009d, the Representation/Association is Identifier 4009e, the Type is CCT 4009f, the Type Name is Identifier 4009g, and the Length is from one to ten 4009h. The Cardinality between the GDT Address 4000a and RoomID 4009a is zero or one 4009i. RoomID may be restricted (see 4009j).

InhouseMailID 4010a specifies an internal mail address. For InhouseMailID 4010a, the Category is Element 4010b, the Object Class is Office 4010c, the Property is Inhouse Identification 4010d, the Representation/Association is Identifier 4010e, the Type is CCT 4010f, the Type Name is Identifier 4010g, and the Length is from one to ten 4010h. The Cardinality between the GDT Address 4000a and InhouseMailID 4010a is zero or one 4010i. InHouseMailID may be restricted (see 4010j).

CorrespondenceShortName 4011a is the short name of the contact person for use in correspondence. This short name can be used both internally and externally. For CorrespondenceShortName 4011a, the Category is Element 4011b, the Object Class is Office 4011c, the Property is Correspondence Short Name 4011d, the Representation/Association is Name 4011e, the Type is CCT 4011f, the Type Name is text 4011g, and the Length is from zero to ten 4011h. The Cardinality between the GDT Address 4000a and CorrespondenceShortName 4011a is zero or one 4011i. CorrespondenceShortName may be restricted (see 4011j).

PhysicalAddress 4012a contains the postal address data of a physical location. For the PhysicalAddress 4012a, the Category is Element 4012b, the Object Class is Address 4012c, the Property is Physical Address 4012d, and the Representation/Association is Details 4012e. The Cardinality between the GDT Address 4000a and PhysicalAddress 4012a is zero or one 4012f.

PhysicalAddress 4012a also comprises CountryCode 4013a, RegionCode 4014a, StreetPostalCode 4015a, POBox PostalCode 4016a, CompanyPostalCode 4017a, CityName 4018a, AdditionalCityName 4019a, DistrictName 4020a, POBoxID 4021a, POBoxIndicator 4022a, POBoxCountryCode 4023a, POBoxRegionCode 4034a, POBoxCityName 4035a, StreetName 4036a, StreetPrefixName 4037a, StreetSuffixName 4038a, HouseID 4039a, AdditionalHouseID 4040a, BuildingID 4041a, FloorID 4042a, RoomID 4043a, CareOfName 4044a, and Description 4045a. For each, the category is Element (4013b-4045b) and the Object Class is Physical Address (4013c-4045c).

CountryCode 4013a is the country code of the address in accordance with ISO 3166-1. For the CountryCode 4013a, the Property is CountryCode 4013d, the Representation/Association is Code 4013e, the Type is GDT 4013f, and the Type Name is CountryCode 4013g. The Cardinality between the GDT Address 4000a and CountryCode 4013a is zero or one 4013h.

RegionCode 4014a is the code for the region of the country in the address. This specification may be part of the address, e.g., in the US. For RegionCode 4014a, the Property is RegionCode 4014d, the Representation/Association is Code 4014e, the Type is GDT 4014f, and the Type Name is RegionCode 4014g. The Cardinality between the GDT Address 4000a and RegionCode 4014a is zero or one 4014h.

StreetPostalCode 4015a is the zip code in the street address. The rules for zip codes are country-specific. For StreetPostalCode 4015a, the Property is Street Zip Code 4015d, the Representation/Association is Code 4015e, the Type is CCT 4015f, the Type Name is Code 4015g, and the Length is from one to ten 4015h. The Cardinality between GDT Address 4000a and StreetPostalCode 4015a is zero or one 4015i. StreetPostalCode 4015a may be restricted (see 4015j).

POBoxPostalCode 4016a is the box zip code. For POBoxPostalCode 4016a, the Property is PO Box Zip Code 4016d, the Representation/Association is Code 4016e, the Type is CCT 4016f, the Type Name is Code 4016g, and the Length is from one to ten 4016h. The Cardinality between GDT Address 4000a and POBoxPostalCode 4016a is zero or one 4016i. POBoxPostalCode 4016a may be restricted (see 4016j).

CompanyPostalCode 4017a is the zip code of the company when the receiver is an organization with its own zip code. For CompanyPostalCode 4017a, the Property is Company Zip Code 4017d, the Representation/Association is Code 4017e, the Type is CCT 4017f, the Type Name is Code 4017g, and the Length is from one to ten 4017h. The Cardinality between GDT Address 4000a and CompanyPostalCode 4017a is zero or one 4017i. CompanyPostalCode 4015a may be restricted (see 4017j).

CityName 4018a is the name of the city in the address. For the CityName 4018a, the Property is City Name 4018d, the Representation/Association is Name 4018e, the Type is CCT 4018f, the Type Name is Text 4018g, and the Length is from zero to forty 4018h. The Cardinality between GDT Address 4000a and CityName 4018a is zero or one 4018i. CityName 4018a may be restricted (see 4018j).

AdditionalCityName 4019a is the name of the city of residence if it differs from the city in the postal address. AdditionalCityName may have different semantics (field HOME_CITY in the ADRC) and therefore may not be handled using Cardinality. It is analogous to AdditionalHouseID. For AdditionalCityName 4019a, the Property is Additional City Name 4019d, the Representation/Association is Name 4019e, the Type is CCT 4019f, the Type Name is Text 4019g, and the Length is from zero to forty 4019h. The Cardinality between the GDT Address 4000a and AdditionalCityName 4019a is zero or one 4019i. AdditionalCityName 4019a may be restricted (see 4019j).

DistrictName 4020a is the name of the district. For DistrictName 4020a, the Property is District Name 4020d, the Representation/Association is Name 4020e, the Type is CCT 4020f, the Type Name is Text 4020g, and the Length is from zero to forty 4020h. The Cardinality between the GDT Address 4000a and DistrictName 4020a is zero or one 4020i. DistrictName 4020a may be restricted (see 4020j).

POBoxID 4021a is the number of the post-office box. For POBoxID 4021a, the Property is PO Box Identification 4021d, the Representation/Association is Identifier 4021e, the Type is CCT 4021f, the Type Name is Identifier 4021g, and the Length is from one to ten 4021h. The Cardinality between the GDT Address 4000a and POBoxID 4021a is zero or one 4021i. CityName 4021a may be restricted (see 4021j).

POBoxIndicator 4022a specifies whether the post-office box has a number that is unknown. For POBoxIndicator 4018a, the Property is PO Box Indicator 4018d, the Representation/Association is Indicator 4018e, the Type is CCT 4018f, and the Type Name is Indicator 4018g. The Cardinality between GDT Address 4000a and POBoxIndicator 4022 is zero or one 4018h.

POBoxCountryCode 4023a is the country code for the post-office box in the address. For POBoxCountryCode 4023a, the Property is PO Box Country Code 4023d, the Representation/Association is Code 4023e, the Type is GDT 4023f, and the Type Name is CountryCode 4023g. The Cardinality between GDT Address 4000a and POBoxCountryCode 4023a is zero or one 4023h.

POBoxRegionCode 4024a is the code for the region of the country for the post-office box in the address. For the POBoxRegionCode 4024a, the Property is PO Box Region Code 4024d, the Representation/Association is Code 4024e, the Type is GDT 4024f, and the Type Name is Region Code 4024g. The Cardinality between GDT Address 4000a and POBoxRegionCode 4024a is zero or one 4024h.

POBoxCityName 4025a is the name of the city for the post-office box in the address. For the POBoxCityName 4025a, the Property is PO Box City name 4025d, the Representation/Association is Name 4025e, the Type is CCT 4025f, the Type Name is Text 4025g, and the Length is from zero to forty 4025h. The Cardinality between GDT Address 4000a and POBoxCityName 4025a is zero or one 4025i. POBoxCityName 4025a may be restricted (see 4025j).

StreetName 4026a is the name of the street in the address. For the StreetName 4026a, the Property is Street name 4026d, the Representation/Association is Name 4026e, the Type is CCT 4026f, the Type Name is Text 4026g, and the Length is from zero to sixty 4026h. The Cardinality between GDT Address 4000a and StreetName 4026a is zero or one 4026i. POBoxCityName 4026a may be restricted (see 4026j).

StreetPrefixName 4027a is an additional prefix in the address and precedes the street name in the previous line. For the StreetPrefixName 4027a, the Property is Street Prefix Name 4027d, the Representation/Association is Name 4027e, the Type is CCT 4027f, the Type Name is Text 4027g, and the Length is from zero to forty 4027h. The Cardinality between GDT Address 4000a and StreetPrefixName 4027a is from zero to two 4027i. StreetPrefixName 4027a may be restricted (see 4027j)

StreetSuffixName 4028a is an additional suffix in the address and comes after the street name in the subsequent line. For the StreetSuffixName 4028a, the Property is Street Suffix Name 4028d, the Representation/Association is Name 4028e, the Type is CCT 4028f, the Type Name is Text 4028g, and the Length is from zero to forty 4028h. The Cardinality between GDT Address 4000a and StreetSuffixName 4028a is from zero to two 4028i. StreetPrefixName 4028a may be restricted (see 4028j).

HouseID 4029a is the house number for the street in the address. For the HouseID 4029a, the Property is House Identification 4029d, the Representation/Association is Identifier 4029e, the Type is CCT 4029f, the Type Name is Identifier 4029g, and the Length is from one to ten 4029h. The Cardinality between GDT Address 4000a and HouseID 4029a is zero or one 4029i. HouseID 4029a may be restricted (see 4029j).

AdditionalHouseID 4030*a* is an addition to the house number, e.g., apartment number. For the AdditionalHouseID 4030*a*, the Property is Additional House Identification 4030*d*, the Representation/Association is Identifier 4030*e*, the Type is CCT 4030*f*, the Type Name is Identifier 4030*g*, and the Length is from one to ten 4030*h*. The Cardinality between GDT Address 4000*a* and AdditionalHouseID is zero or one 4030*i*. AdditionalHouseID 4030*a* may be restricted (see 4030*j*).

BuildingID 4031*a* is the number or abbreviation for a building, e.g., WDF03. For the BuildingID 4030*a*, the Property is Building Identification 4030*d*, the Representation/Association is Identifier 4030*e*, the Type is CCT 4030*f*, the Type Name is Identifier 4030*g*, the Length is from one to twenty 4030*h*. The Cardinality between GDT Address 4000*a* and BuildingID 4031*a* is zero or one 4030*i*. BuildingID 4030*a* may be restricted (see 4030*j*).

FloorID 4032*a* is the number of the floor in the building. For the FloorID 4032*a*, the Property is Floor Identification 4032*d*, the Representation/Association is Identifier 4032*e*, the Type is CCT 4032*f*, the Type Name is Identifier 4032*g*, and the Length is from one to ten 4032*h*. The Cardinality between GDT Address 4000*a* and FloorID 4032*a* is zero or one 4032*i*. FloorID 4032*a* may be restricted (see 4032*j*).

RoomID 4033*a* is the number of the room in the building. For the RoomID 4033*a*, the Property is Room Identification 4033*d*, the Representation/Association is Identifier 4033*e*, the Type is CCT 4033*f*, the Type Name is Identifier 4033*g*, and the Length is from one to ten 4033*h*. The Cardinality between GDT Address 4000*a* and RoomID 4033*a* is zero or one 4033*i*. RoomID 4033*a* may be restricted (see 4033*j*).

CareOfName 4034*a* is a different receiver when the receiver is not the same as the addressee. For the CareofName 4034*a*, the Property is Care of name 4034*d*, the Representation/Association is Name 4034*e*, the Type is CCT 4034*f*, the Type Name is Text 4034*g*, and the Length is from zero to ten 4034*h*. The Cardinality between the GDT Address 4000*a* and CareOfName 4034*a* is zero or one 4034*i*. CareofName 4034*a* may be restricted (see 4034*j*).

Description 4035*a* is an addition to the address that refers to any special details. For the Description 4030*a*, the Property is Description 4030*d*, the Representation/Association is Text 4030*e*, the Type is GDT 4030*f*, and the Type Name is Description 4030*g*. The Cardinality between GDT Address 4000*a* and Description 4035*a* is unbounded 4030*h*.

TaxJurisdictionCode 4036*a* is the tax jurisdiction code belonging to the address. This code is used in various countries and can normally be derived uniquely from the address. However, it is dependent on the code list of the provider. A country can have multiple code-list providers. For the TaxJurisdictionCode 4036*a*, the Category is Element 4036*b*, the Object Class is Address 4036*c*, the Property is Tax Jurisdiction Code 4036*d*, the Representation/Association is Code 4036*e*, the Type is GDT 4046*f*, and the Type Name is TaxJurisdictionCode 4036*g*. The Cardinality between the GDT Address 4000*a* and TaxJurisdictionCode 4036*a* is zero or one 4036*h*.

TimeZoneDifferenceValue 4037*a* is the difference (in hours) between the local time zone of the location defined by PhysicalAddress 4012*a* and UTC (Coordinated Universal Time). For the TimeZoneDifferenceValue 4037*a*, the Category is Element 4037*b*, the Object Class is Address 4037*c*, the Property is Time Zone Difference Value 4037*d*, the Representation/Association is Value 4037*e*, the Type is GDT 4037*f*, and the Type Name is TimeZoneDifferenceValue 4037*g*. The Cardinality between the GDT Address 4000*a* and TimeZoneDifference Value 4037*a* is zero or one 4037*h*.

GeoCoordinates 4038*a* contains the geographic data, i.e., longitude and latitude, specified in accordance with the WGS84 reference system, with which a location on the globe can be determined. LatitudeMeasure is the geographic latitude in degrees. LongitudeMeasure is the Geographic longitude in degrees. The measurement unit degrees for each is specified by the attribute "unitCode" Southern latitudes are generally negative and northern latitudes are generally positive. Also, western longitudes are negative and eastern longitudes are positive. Positive values do not require a positive sign (+) for a prefix. However, negative values may have a negative sign (−) for a prefix. The unitCode "DD" corresponds to the unit for the degree of an angle (UN/CEFACT Rec. #20). For the GeoCoordinates 4038*a*, the Category is Element 4038*b*, the Object Class is Address 4038*c*, the Property is GeoCoordinates 4038*d*, the Representation/Association is GeoCoordinates 4038*e*, the Type is GDT 4038*f*, and the Type Name is GeoCoordinates 4038*g*. The Cardinality between the GDT Address 4000*a* and GeoCoordinates 4038*a* is zero or one 4038*h*.

Communication 4049*a* contains information about communication paths with which a person or organization can be reached. For the Communication 4049*a*, the Category is Element 4049*b*, the Object Class is Address 4049*c*, the Property is Communication 4049*d*, and the Representation/Association is Details 4049*e*. The Cardinality between the GDT Address 4000*a* and Communication 4049 is zero or one 4049*f*. Communication 4049*a* is comprised of CorrespondenceLanguageCode 4040*a*, Telephone 4042*a*, MobilePhone 4047*a*, Facsimile 4052*a*, email 4058*a*, and Web 4063*a*.

CorrespondenceLanguageCode 4040*a* specifies the language for written correspondence. For CorrespondenceLanguageCode 4040*a*, the Category is Element 4040*b*, the Object Class is Communication 4040*c*, the Property is Correspondence Language Code 4040*d*, the Representation/Association is Code 4040*e*, the Type is GDT 4040*f*, and the Type Name is LanguageCode 4040*g*. The Cardinality may be zero or one 4040*h*.

Telephone 4042*a* contains one telephone number in each instance. For Telephone 4042*a*, the Category is Element 4042*b*, the Object Class is Communication 4042*c*, the Property is Telephone 4042*d*, and the Representation/Association is Details 4042*e*. The Cardinality between the GDT Address 4000*a* and Telephone 4042*a* is unbounded 4042*f*. Telephone is comprised of Number 4043*a*, NumberDefaltIndicator 4044*a*, NumberDescription 4045*a*, and NumberUsageDenialIndicator 4046*a*.

For Number 4043*a*, the Category is Element 4043*b*, the Object Class is telephone 4043*c*, the Property is Phone Number 4043*d*, the Representation/Association is Phone Number 4043*e*, the Type is GDT 4043*f*, and the Type Name is Phone Number 4043*g*. The Cardinality between the GDT Address 4000*a* and Number 4043*a* is one 4043*h*.

NumberDefaultIndicator 4044*a* indicates whether a telephone number is the default number for the address. In certain variations, there may be a default telephone number, provided the address contains a telephone number. The default value is "false." For NumberDefaultIndicator 4044*a*, the Category is Element 4044*b*, the Object Class is Telephone 4044*c*, the Property is Number Default Indicator 4044*d*, the Representation/Association is Indicator 4044*e*, the Type is CCT 4044*f*, and the Type Name is Indicator 4044*g*. The Cardinality between the GDT Address 4000*a* and NumberDefaultIndicator 4044*a* is one 4044*h*.

NumberDescription 4045*a* is an addition to the telephone number that refers to special details or that contains other unstructured information. For NumberDescription 4045*a*, the Category is Element 4045*b*, the Object Class is telephone 4045*c*, the Property is Number Description 4045*d*, the Representation/Association is Text 4045*e*, the Type is GDT 4045*f*, and the Type Name is Description 4045*g*. The Cardinality between the GDT Address 4000*a* and NumberDescription 4045*a* is unbounded 4045*h*.

NumberUsageDenial 4046*a* indicates whether the telephone number may be used or not. If this indicator is set to "true," this means that, in accordance with the legal requirements of the respective country, the telephone number may not be used. There are exceptions, however. For example, return calls requested by the business partner or calls made for service purposes may still be permitted. Furthermore, it is advisable to save telephone numbers so that calls from business partners can still be identified, even if this indicator is set. The default is "false." For NumberUsageDenial 4046*a*, the Category is Element 4046*b*, the Object Class is telephone 4046*c*, the Property is Number Usage Denial Indicator 4046*d*, the Representation/Association is Indicator 4046*e*, the Type is CCT 4046*f*, and the Type Name is Indicator 4046*g*. The Cardinality between the GDT Address 4000*a* and NumberUsageDenial 4046*a* is one 4046*h*.

MobilePhone 4047*a* contains a mobile phone number in each instance. For MobilePhone 4047*a*, the Category is Element 4047*b*, the Object Class is Communication 4047*c*, the Property is Mobile Phone 4047*d*, and the Representation/Association is Details 4047*e*. The Cardinality between the GDT Address 4000*a* and MobilePhone 4047*a* is unbounded 4047*f*. MobilePhone 4047*a* is also comprised of Number 4048*a*, NumberDefaultIndicator 4049*a*, NumberDescription 4050*a*, and NumberUsageDenialIndicator 4051*a*.

For Number 4048*a*, the Category is Element 4048*b*, the Object Class is Mobilephone 4048*c*, the Property is Phone Number 4048*d*, the Representation/Association is Phone Number 4048*e*, the Type is GDT 4048*f*, and the Type Name is Phone Number 4048*g*. The Cardinality between the GDT Address 4000*a* and Number 4048*a* is one 4048*h*.

NumberDefaultIndicator 4049*a* indicates whether a mobile phone number is the default mobile phone number for the address. In certain variations, there may be a default mobile phone number, provided the address contains a mobile phone number. For NumberDefaultIndicator 4049*a*, the Category is Element 4049*b*, the Object Class is Mobilephone 4049*c*, the Property is Number Default Indicator 4049*d*, the Representation/Association is Indicator 4049*e*, the Type is CCT 4049*f*, and the Type Name is Indicator 4049*g*. The Cardinality between the GDT Address 4000*a* and NumberDefaultIndicator 4049*a* is one 4049*h*.

NumberDescription 4050*a* is an addition to the mobile phone number that refers to special details or that contains other unstructured information. For NumberDescription 4050*a*, the Category is Element 4050*b*, the Object Class is Mobilephone 4050*c*, the Property is Number Description 4050*d*, the Representation/Association is Text 4050*e*, the Type is GDT 4050*f*, and the Type Name is Description 4050*g*. The Cardinality between the GDT Address 4000*a* and NumberDescription 4050*a* is unbounded 4050*h*.

NumberUsageDenialIndicator 4051*a* indicates whether the mobile phone number may be used or not. If this indicator is set to "true," this means that, in accordance with the legal requirements of the respective country, the mobile phone number may not be used. There are exceptions, however. For example, return calls requested by the business partner or calls made for service purposes may still be permitted. Further, mobile phone numbers may be saved so that calls from business partners and the like can still be identified, even if the indicator is set. For NumberUsageDenial 4051*a*, the Category is Element 4051*b*, the Object Class is Mobilephone 4051*c*, the Property is Number Usage Denial Indicator 4051*d*, the Representation/Association is Indicator 4051*e*, the Type is CCT 4051*f*, and the Type Name is Indicator 4051*g*. The Cardinality between the GDT Address 4000*a* and NumberUsageDenialIndicator 4051*a* is one 4051*h*.

Facsimile 4052*a* contains a fax number in each instance. For Facsimile 4052*a*, the Category is Element 4052*b*, the Object Class is Communication 4052*c*, the Property is Facsimile 4052*d*, and the Representation/Association is Details 4052*e*. The Cardinality between the GDT Address 4000*a* and Facsimile 4052*a* is unbounded 4052*f*. Facsimile 4052*a* is also comprised of Number 4053*a*, NumberDefaultIndicator 4054*a*, NumberDescription 4055*a*, and NumberUsageDenialIndicator 4056*a*.

For Number 4053*a*, the Category is E 4053*b*, the Object Class is Facsimile 4053*c*, the Property is Phone Number 4053*d*, the Representation/Association is Phone Number 4053*e*, the Type is GDT 4053*f*, the Type Name is Phone Number 4053*g*, and the Cardinality between the GDT Address 4000*a* and Number 4053*a* is one 4053*h*.

NumberDefaultIndicator 4054*a* indicates whether a fax number is the default number for the address. In certain variations, there is a default fax number, provided the address contains a fax number. For NumberDefaultIndicator 4054*a*, the Category is Element 4054*b*, the Object Class is Facsimile 4054*c*, the Property is Number Default Indicator 4054*d*, the Representation/Association is Indicator 4054*e*, the Type is CCT 4054*f*, and the Type Name is Indicator 4054*g*. The Cardinality between the GDT Address 4000*a* and NumberDefaultIndicator 4054*a* is one 4054*h*.

NumberDescription 4055*a* is an addition to the fax number that refers to special details or that contains other unstructured information. For NumberDescription 4055*a*, the Category is Element 4055*b*, the Object Class is Facsimile 4055*c*, the Property is Number Description 4055*d*, the Representation/Association is Text 4055*e*, the Type is GDT 4055*f*, and the Type Name is Description 4055*g*. The Cardinality between the GDT Address 4000*a* and NumberDescription 4055*a* is unbounded 4055*h*.

NumberUsageDenial 4056*a* indicates whether the fax number may be used or not. If this indicator is set to "true," this means that, in accordance with the legal requirements of the respective country, the fax number may not be used. There are exceptions, however. For example, response faxes requested by the business partner or faxes sent for service purposes and the like may still be permitted. Furthermore, it is advisable to save fax numbers so that faxes sent by business partners and the like can still be identified, even if the indicator is set. For NumberUsageDenial 4056*a*, the Category is Element 4056*b*, the Object Class is Facsimile 4056*c*, the Property is Number Usage Denial Indicator 4056*d*, the Representation/Association is Indicator 4056*e*, the Type is CCT 4056*f*, and the Type Name is Indicator 4056*g*. The Cardinality between the GDT Address 4000*a* and NumberUsageDenial 4056*a* is one 4056*h*.

Email 4058*a* contains an email address in each instance. For Email 4058*a*, the Category is Element 4058*b*, the Object Class is Communication 4058*c*, the Property is Email 4058*d*, and the Representation/Association is Details 4058*e*. The Cardinality between the GDT Address 4000*a* and Email 4058*a* is unbounded 4058*h*. Email 4058 also comprises Address 4059*a*, AddressDefaultIndicator 4060*a*, AddressDescription 4061*a*, and AddressUsageDenialIndicator 4062*a*.

Address 4059*a* specifies the email address. For Address 4059*a*, the Category is Element 4059*b*, the Object Class is Email 4059*c*, the Property is Email Address 4059*d*, the Representation/Association is Email Address 4059*e*, the Type is GDT 4059*f*, and the Type Name is Email Address 4059*g*. The Cardinality between the GDT Address 4000*a* and Address 4059*a* is one 4053*h*.

AddressDefaultIndicator 4060*a* indicates whether an email address is the default email address for this address. There may be a default email address, provided there are any email addresses for this address. For AddressDefaultIndicator 4060*a*, the Category is Element 4060*b*, the Object Class is Email 4060*c*, the Property is Email Address Default Indicator 4060*d*, the Representation/Association is Indicator 4060*e*, the Type is CCT 4060*f*, and the Type Name is Indicator 4060*g*. The Cardinality between the GDT Address 4000*a* and AddressDefaultIndicator 4060*a* is one 4060*h*.

AddressDescription 4061*a* is an addition to the email address that refers to special details or that contains other unstructured information. For AddressDescription 4061*a*, the Category is Element 4061*b*, the Object Class is Email 4061*c*, the Property is Email Address Description 4061*d*, the Representation/Association is Text 4061*e*, the Type is GDT 4061*f*, and the Type Name is Description 4061*g*. The Cardinality between the GDT Address 4000*a* and AddressDescription 4061*a* is unbounded 4061*h*.

AddressUsageDenialIndicator 4062*a* indicates whether the e-mail address may be used or not. If this indicator is set to "true," this means that, in accordance with the legal requirements of the respective country, the email address may not be used. There are exceptions, for example, responses to email enquiries may still be permitted. Furthermore, email addresses may be saved so that emails sent by business partners and the like can still be identified, even if the indicator is set. For AddressUsageDenialIndicator 4062*a*, the Category is Element 4062*b*, the Object Class is Email 4062*c*, the Property is Email address Usage Denial Indicator 4062*d*, the Representation/Association is Indicator 4062*e*, the Type is CCT 4062*f*, and the Type Name is Indicator 4062*g*. The Cardinality between the GDT Address 4000*a* and AddressUsageDenialIndicator 4062*a* is one 4062*h*.

Web 4063*a* contains a Web address in each instance. For Web 4063*a*, the Category is Element 4063*b*, the Object Class is Communication 4063*c*, the Property is Web 4063*d*, and the Representation/Association is Details 4063*e*. The Cardinality between the GDT Address 4000*a* and Web 4063*a* is unbounded 4063*f*. Web 4063*a* is also comprised of Address 4064*a*, AddressDefaultIndicator 4065*a*, and AddressDescription 4066*a*.

Address 4064*a* specifies the URI of a Web site. The length is long enough to accommodate a generated URI. For Address 4064*a*, the Category is Element 4064*b*, the Object Class is Web 4064*c*, the Property is Web Address 4064*d*, the Representation/Association is Address 4064*e*, the Type is GDT 4064*f*, and the Type Name is Web Address 4064*g*. The Cardinality between the GDT Address 4000*a* and Address 4064*a* is one 4064*h*.

AddressDefaultIndicator 4065*a* indicates whether a Web address is the default Web address for this address. There may be a default Web address, provided the address contains a Web address. For AddressDefaultIndicator 4065*a*, the Category is Element 4065*b*, the Object Class is Web 4065*c*, the Property is Address Default Indicator 4065*d*, the Representation/Association is Indicator 4065*e*, the Type is CCT 4065*f*, and the Type Name is Indicator 4065*g*. The Cardinality between the GDT Address 4000*a* and AddressDefaultIndicator 4065*a* is one 4065*h*.

Address Description 4066*a* is an addition to the Web address that refers to special details or that contains other unstructured information. For AddressDescription 4066*a*, the Category is Element 4066*b*, the Object Class is Web 4066*c*, the Property is Address Description 4066*d*, the Representation/Association is Text 4066*e*, the Type is GDT 4066*f*, and the Type Name is Description 4066*g*. The Cardinality between the GDT Address 4000*a* and Address Description 4066*a* is unbounded 4066*h*.

An example of GDT Address 4000*a* is:

```
<Address>
  <OrganisationFormattedName>Systems, Applications
and Products</OrganisationFormattedName>
  <OrganisationFormattedName>in Data
Processing</OrganisationFormattedName>
  <PersonName>
    <FormattedName>Mr. Paul John Tester</FormattedName>
    <LegalName>Paul John Tester</LegalName>
    <GivenName></GivenName>
    <PreferredGivenName>Paul</PreferredGivenName>
    <MiddleName>John</MiddleName>
    <Family>
      <FamilyName>Tester</FamilyName>
      <PrimaryIndicator>true</PrimaryIndicator>
      <FamilyNamePrefix></FamilyNamePrefix>
    </Family>
    <Affix>
      <AffixName>Mr.</AffixName>
      <AffixCode>FormOfAddress</AffixCode>
    </Affix>
  </PersonName>
  <FunctionalTitleName>Sales Manager</FunctionalTitleName>
  <DepartmentName>Sales Department</DepartmentName>
  <Office>
    <BuildingID>WDF01</BuildingID>
    <FloorID>2</FloorID>
    <RoomID>G2.01</RoomID>
    <InhouseMailID>SCM IBD 2</ InhouseMailID >
    <CorrespondenceShortName>TeP</CorrespondenceShortName>
  </Office>
  <PhysicalAddress>
    <CountryCode>MX</CountryCode>
    <RegionCode>DIF</RegionCode>
    <StreetPostalCode>01210</StreetPostalCode>
    <CityName>Mexico</CityName>
    <DistrictName> Santa Fé</DistrictName>
    <StreetName>Piso Col Pena Blanca</StreetName>
    <StreetPrefixName>Edificio Plaza Reforma Santy
Fé</StreetPrefixName>
    <StreetPrefixName>Prologacion Paseo de la
Reforma</StreetPrefixName>
    <HouseID>No 600-2°</HouseID>
  </PhysicalAddress>
  <TaxJurisdictionCode listID="," listVersionID="," listAgencyID =","
 listAgencySchemeID=
 ","listAgencySchemeAgencyID="">123456789101112
 </TaxJurisdictionCode>
    <TimeZoneDifferenceValue>+08:00</TimeZoneDifferenceValue>
  <GeoCoordinates>
    <LatitudeMeasure
unitCode="DD">40.23232300000</LatitudeMeasure>
    <LongitudeMeasure
unitCode="DD">123.12121200000</LongitudeMeasure>
  </GeoCoordinates>
  <Communication>
    <Telephone>
      <TelephoneNumber>
        <AreaID>6227</AreaID>
        <SubscriberID>7</SubscriberID>
        <ExtensionID>47474</ExtensionID>
        <CountryCode>DE</ CountryCode>
      </TelephoneNumber>
      <TelephoneNumberDefaultIndicator>1
 </TelephoneNumberDefaultIndicator>
      <Description></ Description>
      <UsageDenialIndicator>0</UsageDenialIndicator>
    </Telephone>
    <MobilePhone>
      <MobilePhoneNumber>
```

-continued

```
            <AreaID>170</AreaID>
            <SubscriberID>1234567</SubscriberID>
            <ExtensionID></ExtensionID>
            <CountryCode>DE</ CountryCode>
          </MobilePhoneNumber>
          <MobilePhoneNumberDefaultIndicator>1
</MobilePhoneNumberDefaultIndicator>
          <Description></Description>
          <UsageDenialIndicator>0</UsageDenialIndicator>
        </MobilePhone>
        <Facsimile>
          <FacsimileNumber>
            <AreaID>6227</AreaID>
            <SubscriberID>78</SubscriberID>
            <ExtensionID>99999</ExtensionID>
            <CountryCode>DE</ CountryCode >
          </FacsimileNumber>
          <FacsimileNumberDefaultIndicator>1
</FacsimileNumberDefaultIndicator>
          <Description>Secretary</Description>
          <UsageDenialIndicator>0</UsageDenialIndicator>
        </Facsimile>
        <EmailAddress>paul.tester@sap.com</EmailAddress>
<EmailAddressDefaultIndicator>1</EmailAddressDefaultIndicator>
          <Description></Description>
          <UsageDenialIndicator>0</UsageDenialIndicator>
        <Web>
          <WebAddress>www.sap.com</WebAddress>
<WebAddressDefaultIndicator>1</WebAddressDefaultIndicator>
          <Description>Official information</Description>
        </Web>
      </Communication>
</Address>.
```

This example address produces the following result, which can be printed out for a label:

Systems, Applications and Products
in Data Processing
Mr. Paul John Tester
Sales Manager
Edificio Plaza Reforma Santa Fé
Prolongacion Paseo de la Reforma
No 600-2° Piso Col Pena Blanca
Santa Fé 01210
Mexico, DIF.

Note that some fields, such as TaxJurisdictionCode and TimeZoneValueDifference, may not be used even if they have been completed. If BuyerParty is an organization then PersonName may be empty. If BuyerParty is a natural person then OrganisationFormattedName may be empty.

The addresses of technical objects, which describe a physical location, are represented by an appropriate field selection, e.g., the address of the organization without OrganisationFormattedName and Communication.

(f) AdjustmentReasonCode

The GDT AdjustmentReasonCode 4100 is a coded representation for the reason for an adjustment. An example of GDT AdjustmentReasonCode 4100 is: <AdjustmentReasonCode>CANCELED_PROMOTION</AdjustmentReasonCode>.

The structure of GDT AdjustmentReasonCode 4100 is depicted in FIG. 41.

The illustrative code is general and can be used in many contexts. The standard code list to be used in an interface depends on the particular context. In a variation, a standard code list is used. If an interface supports one of the lists or if the supported code lists are disjunctive, none of the attributes may be required for identification of the particular standard code lists.

For the use of GDTs in revisions of forecast time series, the possible code values are subsets of the "Adjustment Reason Code List" of the "EAN.UCC XML Business Message Standards, version 1.3 (July 2003)." These include CANCELED_PROMOTION, DISCONTINUED_PRODUCT, DISTRIBUTION_ISSUE, EXPANDED_PROMOTION, FORWARD_BUY, INVENTORY_POLICY_CHANGE, NEW_LOCATION, NEW_PRODUCT, NEW_PROMOTION, ORDER_POLICY_CHANGE, OVERSTOCK_CONDITION, PRICE_CHANGE, PRODUCT_CHANGEOVER, PRODUCTION_ISSUE, REDUCED_PROMOTION, REVISED_PLAN, REVISED_PROMOTION, STORE_CLOSURE, TRANSPORTATION_ISSUE and WEATHER_RELATED_EVENT. For each use of the above, the context and code list used may be documented.

(g) AllowedIndicator

A GDT AllowedIndicator 4200 indicates whether something, such as a specific procedure, operation or status, is allowed or not. An example of GDT AllowedIndicator 4200 is: <LowerCaseAllowedIndicator>true</LowerCaseAllowedIndicator>.

The structure of GDT Allowed Indicator 4200 is depicted in FIG. 42. For the GDT Allowed Indicator 4200, the Property is Allowed 4202, the Representation/Association is Indicator 4204, the Type is CCT 4206, and the Type Name is Indicator 4208.

The GDT AllowedIndicator 4200 can have the values true or false. True means that something is allowed while false means that something is not allowed. For each GDT AllowedIndicator 4200, what is allowed or not allowed may be indicated precisely. This is reflected in an appropriate name prefix. For example, a NegativeValueAllowedIndicator specifies whether negative numeric values are allowed, while a LowerCaseAllowedIndicator specifies whether lower-case letters are allowed.

The GDT AllowedIndicator 4200 may be used to indicate whether a customer is allowed to submit an online purchase order in lower-case letters. In the context of an interface, the business significance of "what is allowed" may be described for the AllowedIndicator in addition to using the name prefix.

(h) Amount

A GDT Amount 4300 is an amount with the corresponding currency unit. An example of GDT Amount 4300 is: <OrderedAmount currencyCode="EUR">777.95</OrderedAmount>.

The structure of GDT Amount 4300 is depicted in FIG. 43. For the GDT Amount 4300, the Property is Amount 4302, the Representation/Association is Amount 4304, the Type is CCT 4306, and the Type Name is Amount 4308.

GDT Amount 4300 is used to represent amounts, costs, remunerations, and fees. The amount value in GDT Amount 4300 may be represented with a maximum of 22 predecimal places and 6 decimal places. Both positive and negative amounts can be used. Amount 4300 may also include the attribute currencyCode which refers to the currency unit in accordance with the ISO 4217 three-character code. A currency may be specified.

(i) AmountBalanceIndicator

A GDT AmountBalanceIndicator 4400 indicates whether an amount is a balance or not. An example of GDT AmountBalanceIndicator 4400 is: <AmountBalanceIndicator>true</AmountBalanceIndicator>.

The structure of GDT AmountBalanceIndicator 4400 is depicted in FIG. 44. For the GDT AmountBalanceIndicator 4400, the Property is Amount Balance 4402, the Representation/Association is Indicator 4404, the Type is CCT 4406, and the Type Name Indicator is 4408.

BalanceIndicator can have either the value true or false. True signifies that the amount specified is a balance. False signifies that the amount specified is not a balance. GDT Amount 4400 can be used to indicate whether the balance of all open receivables is transferred in a message to a party or whether the amount transferred is an individual receivable. A balance amount may also be positive or negative. In the context of an interface, the amount to which the GDT Amount 4400 refers and the business significance of the balance may be described.

(j) AspectID

A GDT AspectID 4500 is a unique identifier for an aspect. An aspect determines a selection of attributes relevant for the aspect for a predefined object type. An example of GDT AspectID 4500 is: <AspectID>DETAIL</AspectID>.

The structure of GDT AspectID 4500 is depicted in FIG. 45. For the GDT AspectID 4500, the Object Class is Aspect 4502, the Property is Identification 4504, the Representation/Association is Identifier 4506, the Type is CCT 4508, the Type Name is Identifier 4510 and the length is from one to forty 4512.

In one variation, when a catalog is published, a GDT AspectID 4500 can be used as the CatalogueItemAspectID to specify which properties (and their values) are to be displayed in the view for a catalog item. For example, in a product catalog, the "LIST" aspect contains those product properties that are required to select a product from a list quickly. The "DETAIL" aspect contains all the properties, while the "COMPARISON" aspect contains those that are useful for comparing the details of two products.

A distinction should also be made between an aspect and a "view." A view of a predefined object is a restriction of the object's attributes. An aspect is a semantic criterion that is used to decide which attributes belong to a particular object view. When a given aspect is applied to various object types, the result is a view. For this reason, an aspect usually has many different views.

(k) Attachment

A CCT Attachment 4600 is an arbitrary document type that is related to either the whole message or just a particular part. An example of CCT Attachment 4600 is: <Attachment id="sampleAttachment.xml">Some Attachment</Attachment>.

The structure of CCT Attachment 4600 is depicted in FIG. 46. The CCT Attachment 4600 includes attributes id 4612 and filename 4632. For the CCT Attachment 4600, the Property is Attachment 4602, the Representation/Association is Binary Object 4604, the Type is xsd 4606, the Type Name is normalizedString 4608. The CCT Attachment 4600 is Title 4610.

Attribute id 4612 uniquely identifies the binary content within the message that corresponds to the SOAP or ebXML messaging protocols. For the CCT Id 4612, the Category is Attribute 4614, the Object Class is Attachment 4616, the Property is Identification 4618, the Representation/Association is Identifier 4620, the Type is xsd 4622, the Type Name is string 4624, the Length is from one to thirty five 4626, the Cardinality is one 4628. The CCT Id 4612 may be unique as used for references using the manifest 4630.

Attribute filename 4632 contains the relevant name or file name of the binary content. The structure of CCT Filename 4632 is depicted in FIG. 46. For the CCT Filename 4632, the Category is Attribute 4634, the Object Class is Attachment 4636, the Property is Filename 4638, the Representation/Association is Text 4640, the Type is xsd 4642, the Type Name is String 4644, the length is up to seventy 4646, and the Cardinality is zero or one 4648.

The element value of CCT BinaryObject 4600 is based on the XML-scheme-specific built-in data type xsd: normalizedString and can be used to represent an intelligible title or name of the binary object.

The attachment may be sent in the same message in the form of a MIME attachment. The technical referencing is done using the manifest of the respective message protocol (SOAP or ebXML messaging). The value from the "id" attribute is used as the referencing code. Every attachment may have this attribute and the identifiers may be unique in the same document instance.

Attachments are similar to the attachments in electronic message transfer (for example, STMP). The attachments may be documents that can be read by humans, such as word-processing documents, spreadsheet documents, presentation documents, and the like. These documents can be in many different formats (e.g., doc, pdf, ppt, xls, and the like.).

The binary data streams of Attachment should not be stored on a Web server as a file. The global data type "WebAddress" is available for this purpose.

(l) AttachmentWebAddress

A CDT AttachmentWebAddress 4700 is a Web address for a document of any type that is related to the transmitted message or part of the message, but is not itself transmitted as part of the message. An example of CDT AttachmentWebAddress 4700 is: <AttachmentWebAddress>www.abc.com/Attachments/HelloWorld.txt</AttachmentWebAddress>.

The structure of CDT AttachmentWebAddress 4700 is depicted in FIG. 47. For the CDT Attachment Web Address 4700, the Object Class Qualification is Attachment 4702, the Object Class is Web Address 4704, the Property is Address 4706, the Representation/Association is Electronic Address 4708, the Type is GDT 4710, and the Type Name is Web Address 4712.

The specification of an CDT AttachmentWebAddress 4700 may support http and https URI schemes. The CDT AttachmentWebAddress 4700 may also be used to transmit a link to an attachment, instead of transmitting the attachment itself. The recipient can use the transmitted link to access the attachment.

When using an CDT AttachmentWebAddress 4700 in an interface or GDT, how the link is to be interpreted may be described. For example, as a simple link to enable the user to display the attachment on the interface, as a request to the recipient system to load the attachment from the specified address as soon as possible, whether there are restrictions on how long the attachment is available at the specified URL, or whether and by whom the attachment can be changed.

(m) BatchID

A GDT BatchID 4800 is a unique identifier for one batch in the context of a material number. Batches are non-reproducible, homogenous subsets of a product, whose characteristics lie within the batch characteristics defined for the product. An example of GDT BatchID 4800 is: <BatchID> CH20021015</BatchID>.

The structure of GDT BatchID 4800 is depicted in FIG. 48. For the GDT BatchID 4800, the Category is Complex Type 4802, the Object Class is Batch 4804, the Property is Identification 4806, the Representation/Association is Identifier 4808, the Type is CCT 4810, the Data Type is Identifier 4812, the Length is from one to ten 4814.

The GDT BatchID 4800 may comprise letters, numbers, and displayable special characters, with the possible exception of "*," "&," and ",". The identifier may be uppercase and the GDT BatchID 4800 may not begin with blank characters or contain consecutive blank characters. The GDT BatchID

4800 value range includes combinations of the permitted characters up to a maximum length of 10 characters.

SchemeID identifies an identification scheme. The identification scheme represents the context that is used to identify an object. SchemeID may be unique within the agency that manages this identification scheme. The structure of GDT schemeID 4816 is depicted in FIG. 48. For the GDT schemeID 4816, the Category is Attribute 4818, the Object Class is Identification Scheme 4820, the Property is Identification 4822, the Representation/Association is Identifier 4824, the Type is xsd 3126, the Data Type is Token 4828, the Cardinality is zero or one 4830. The GDT schemeID 4816 may be Optional 4832.

SchemeVersionID identifies the version of an identification scheme. The structure of GDT schemeVersionID 4834 is depicted in FIG. 48. For the GDT schemeVersionID 4834, the Category is Attribute 4836, the Object Class is Identification Scheme 4838, the Property is Version 4840, the Representation/Association is Identifier 4842, the Type is xsd 4844, the Data Type is Token 4846, and the Cardinality is zero or one 4848. The GDT schemeVersionID 4834 may be optional 4850.

SchemeAgencyID identifies the agency that manages an identification scheme. The agencies from DE 3055 may be used as the default, but the roles defined in DE 3055 may not be used. GDT BatchID 4800 may be unique within the identification scheme that is managed by schemeAgencyID. For the GDT schemeAgencyID 4852, the Category is Attribute 4854, the Object Class is IdentificationSchemeAgency 4856, the Property is Identification 4858, the Representation/Association is Identifier 4860, the Type is xsd 4862, the Data Type is Token 4864, and the Cardinality is zero or one 4866. The GDT schemeAgencyID 4852 may be optional 4868.

SchemeAgencySchemeID identifies the identification scheme that represents the context for agency identification. For the GDT schemeAgencySchemeID 4870, the Category is Attribute 4872, the Object Class is Identification-SchemeAgency 4874, the Property is Scheme 4876, the Representation/Association is Identifier 4878, the Type is xsd 4880, the Data Type is Token 4882, and the Cardinality is zero or one 4884. The GDT schemeAgencySchemeID 4870 may be optional 4886.

SchemeAgencySchemeAgencyID identifies the agency that manages the SchemeAgencySchemeID. This attribute may contain values from DE 3055 (excluding roles). For the GDT schemeAgencySchemeAgencyID 4888, the Category is Attribute 4890, the Object Class is Identification-SchemeAgency 4892, the Property is SchemeAgency 4894, the Representation/Association is Identifier 4896, the Type is xsd 4898, the Data Type is Token 4899, and the Cardinality is zero or one 4801A. The GDT schemeAgencySchemeAgencyID 4888 may be optional 4802A.

The GDT BatchID 4800 may be used to identify batches. Specifying attributes may be optional. By default, the system may assume that the batch identified by the GDT BatchID 4800 is a manufacturer batch and therefore no attributes are required.

(n) BiddingConditionCode

The GDT BiddingConditionCode 4900 is a coded representation of the bidding conditions for a bid invitation property. An example of GDT BiddingConditionCode 4900 is: <QuoteQuantityBiddingConditionCode>01</QuoteQuantityBiddingConditionCode>.

The structure of GDT Bidding Condition Code 4900 is depicted in FIG. 49. For the GDT Bidding Condition Code 4900, the Object Class is Bidding 4902, the Property is Condition 4904, the Representation/Association is Code 4906, the Type is CCT 4908, the Type Name is Code 4910, and the Length is two 4912.

The GDT BiddingConditionCode 4900 may have the values 01 through 04. 01 means that a bid is mandatory for a bid invitation property, and the property valuation may not be changed. 02 means a bid is mandatory for a bid invitation property, and the property valuation can be changed. 03 means a bid may be optional for a bid invitation property, and the property valuation cannot be changed. 04 means a bid may be optional for a bid invitation property, and the property valuation can be changed Illustrative bid invitation properties for which bidding conditions can be specified may include quantity, price, and terms of delivery. When the GDT BiddingConditionCode 4900 is applied to a bid invitation property, it is identified in the prefix, e.g., QuoteQuantityBiddingConditionCode. A default procedure should be specified for each usage of a GDT BiddingConditionCode 4900.

The GDT BiddingConditionCode 4900 may be a proprietary code list with fixed predefined values. Changes to the permitted values may involve changes to the interface.

(o) BusinessDocumentMessageHeader

A GDT BusinessDocumentMessageHeader 5000 comprises business information from the perspective of the sender application for identifying a business document within a message (if applicable, with a reference to a previous instance of a business document within a previous message), information about the sender, and any information about the receiver. An example of GDT BusinessDocumentMessageHeader 5000 is:

```
<PurchaseOrderRequest>
  <MessageHeader>
    <ID schemeID="INVOIC">00000000123456</ID>
    <ReferenceID
schemeID="ORDER">00000000123455</ReferenceID>
    <CreationDateTime>2003-10-21T12:21Z+01:00</ID>
    <SenderParty>
      <StandardID schemeAgencyID="016">4711</StandardID>
      <ContactPerson>
        <InternalID schemeID="PartyID"
schemeAgencyID="MPL_002">820</InternalID>
        <Address> . . .</Address>
      </ContactPerson>
    </SenderParty>
    <RecipientParty>
      <InternalID schemeID="PartyID"
schemeAgencyID="BPL_300">747</InternalID>
      <ContactPerson>
        <InternalID schemeID="PartyID"
schemeAgencyID="BPL_300">737</InternalID>
        <Address> . . .</Address>
      </ContactPerson>
    </RecipientParty>
  </MessageHeader>
  . . .
</PurchaseOrderRequest>.
```

The structure of GDT Business Document Message Header 5000 is depicted in FIG. 50. The GDT Business Document Message Header 5000 includes elements ID 5010, ReferenceID 5028, CreationDateTime 5046, SenderParty 5062, and RecipientParty 5078. For the GDT Business Document Message Header 5000, the Object Class is Business Document Message 5002, the Property is Header 5004, the Representation/Association is Details 5006, the Type is GDT 5008.

ID 5010 is the identifier for the instance of the business document within a (technical) message that is generated by the business application level at the sender. For the ID 5010, the Category is Element 5012, the Object Class is Business Document Message 5014, the Property is Identification 5016, the Representation/Association is Identifier 5018, the Type is GDT 5020, the Type Name is Business Document Message ID 5022, the Length is from one to thirty-five 5024, and Cardinality is zero or one 5026.

ReferenceID 5028 is the identifier of another instance of a business document in another (technical) message that the BusinessDocument references (a BusinessDocument can link to another BusinessDocumentMessage to represent a business interrelation or a dependency). For the Reference ID 5028, the Category is Element 5030, the Object Class is Business Document Message 5032, the Property is Reference Identification 5034, the Representation/Association is Identifier 5036, the Type is GDT 5038, the Type Name is Business Document Message ID 5040, the Length is from one to thirty-five 5042, and the Cardinality is zero or one 5044.

CreationDateTime 5046 is a date and time stamp (to the second) for when a message is created for the business document within the business application. For the GDT Creation Date Time 5046, the Category is Element 5048, the Object Class is Business Document Message 5050, the Property is Creation Date Time 5052, the Representation/Association is Date Time 5054, the Type is GDT 5056, the Type Name is Date Time 5058, the Cardinality is one 5060.

SenderParty 5062 is the party that creates and sends the BusinessDocument at business application level. SenderParty contains a unique sender identification. The identifiers contained in SenderParty can also be used for internal forwarding at application level. The contact person in it contains the necessary direct contact information in case there are problems or errors during processing of the respective BusinessDocument. For the GDT Sender Party 5062, the Category is Element 5064, the Object Class is Business Document Message 5066, the Property is Sender 5068, the Representation/Association is Party 5070, the Type is GDT 5072, the Type Name is Business Document Message Header Party 5074, the Cardinality is zero or one 5076.

RecipientParty 5078 is the party that receives and processes the BusinessDocument at business application level. RecipientParty may contain a unique receiver identification. The identifiers contained in RecipientParty can also be used for internal forwarding at application level. The contact person in it contains the contact information in case there are problems or errors during processing of the respective BusinessDocument. The structure of GDT Recipient Party 5078 is depicted in FIG. 50. For the GDT Recipient Party 5078, the Category is Element 5080, the Object Class is Business Document Message 5082, the Property is Recipient 5084, the Representation/Association is Party 5086, the Type is GDT 5088, the Type Name is Business Document Message Header Party 5090, the Cardinality is from zero to n 5092.

BusinessDocuments used for B2B scenarios may use the GDT BusinessDocumentMessageHeader 5000. If required, GDT BusinessDocumentMessageHeader 5000 can also be used in BusinessDocuments intended for A2A scenarios.

GDT BusinessDocumentMessageHeader 5000 may be used for numerous purposes. For example, GDT BusinessDocumentMessageHeader 5000 may be used for forwarding to the relevant position or target person within a business application, for tracing and monitoring of a BusinessDocument and its processing status at business application level, and for managing and monitoring business processes.

GDT BusinessDocumentMessageHeader 5000 may also be used for administration and error handling. The unique identification can be used for referencing and in the case of errors at business application level, the contact person in SenderParty or RecipientParty can be contacted directly. The name, telephone number, e-mail address, fax number, and the like. can be transmitted by the GDT BusinessDocumentMessageHeader 5000 for this purpose.

GDT BusinessDocumentMessageHeader 5000 may also be used for converting general information to other standards, such as IDoc, UN/CEFACT, ANSI X.12, ODETTE, TRADACOMMS, xCBL, OAG BODs, and RosettaNet-PIPs. These are standards that represent reference data for the business application level according to predefined conventions. In a variation, this may be guaranteed if the general header information of a BusinessDocument is identical to the envelope or header information of the respective default message.

The ReferenceID is used to represent references that originate from the succession of BusinessDocuments in the BusinessDocument choreography. This may include query/response or request/confirmation messages. The respective interface document may identify the previous BusinessDocument to which the ReferenceID refers, i.e., what the reference specified by the BusinessDocument reference means.

Comparing GDT BusinessDocumentMessageHeader 5000 to the header information from the message transfer protocols such as "Reliable Messaging," "OASIS ebXML MSG," "OASIS ebXML CPP/CPA," and "Rosetta Net RNIF 2.0," demonstrates that the GDT BusinessDocumentMessageHeader 5000 may contain redundant information compared to these technical transfer protocols. However, the GDT BusinessDocumentMessageHeader 5000 may be used at business application level instead of at a technical level. The information in this case is information that can be sent, received, and processed at this level.

GDT BusinessDocumentMessageHeader 5000 may be based on UN/CEFACT Standard BusinessDocumentMessage Header Technical Specification—Working Draft—Revision 2.2.5" dated 26 Nov. 2003. The ID (BusinessDocumentMessageID) of the GDT BusinessDocumentMessageHeader 5000 may be distinguishable from the technical Messaged (the XI message). Specifically the BusinessDocumentMessageID is issued by the business application and is stable over the entire lifetime of the BusinessDocument. It also remains unchanged even when the message is sent via multiple, successive middleware systems. The technical Messaged is issued at the level of the technical middleware system and generally changes each time the BusinessDocument is resent or forwarded by a middleware system and when the BusinessDocument is split into multiple technical messages by a middleware system.

(p) BusinessDocumentMessageHeaderParty

A GDT BusinessDocumentMessageHeaderParty 5100 is information about a party that is responsible for sending or receiving a BusinessDocument at a business application level. GDT BusinessDocumentMessageHeaderParty 5100 contains the necessary general business information about an involved sender or receiver party. A party is typically a natural person, organization, or business partner group in which a company has a business or intra-enterprise interest. This could be a person, organization, or group within or outside of the company. An example of GDT BusinessDocumentMessageHeaderParty 5100 is:

```
<PurchaseOrderRequest>
  <MessageHeader>
    <SenderParty>
      <StandardID schemeAgencyID="016">4711</StandardID>
```

-continued

```
            <ContactPerson>
               <InternalID schemeID="PartyID"
schemeAgencyID="MPL_002">820</InternalID>
               <Address> . . .</Address>
            </ContactPerson>
         </SenderParty>
         <RecipientParty>
            <InternalID schemeID="PartyID"
schemeAgencyID="BPL_300">747</InternalID>
            <ContactPerson>
               <InternalID schemeID="PartyID"
schemeAgencyID="BPL_300">737</InternalID>
               <Address> . . .</Address>
            </ContactPerson>
         </RecipientParty>
         . . .
      </MessageHeader>
      . . .
   </PurchaseOrderRequest>.
```

In the above example, for SenderParty, schemeAgencyID="016" can correspond to Dun & Bradstreet according to the code list DE 3055. For RecipientParty: schemeID="PartyID" specifies that the scheme "PartyID" was used to identify the party. schemeAgencyID="BPL__300" specifies that the scheme was assigned by the SAP CMDM system "BPL__300."

The structure of GDT Business Document Message Header Party 5100 is depicted in FIG. 51. For the GDT Business Document Message Header Party 5100, the Object Class is Business Document Message Header Party 5102 and the Property is Details 5104.

InternalID 5106 refers to the proprietary identifier used when SenderParty or RecipientParty use common master data (Extended Enterprise) or when they are in alignment with regard to the semantics and use of InternalID. For the GDT Internal ID 5106, the Category is Element 5108, the Object Class is Business Document Message Header Party 5110, the Property is Internal Identification 5112, the Representation/Association is Identifier 5114, the Type is GDT 5116, the Type Name is Party Internal ID 5118, and the Cardinality is zero or one 5120.

StandardID 5122 refers to the standardized identifier for SenderParty or RecipientParty of the organization based on the code list DE 3055. For the GDT Standard ID 5122, the Category is Element 5124, the Object Class is Business Document Message Header Party 5126, the Property is Standard Identification 5128, the Representation/Association is Identifier 5130, the Type is GDT 5132, the Type Name is Party Standard ID 5134, and the Cardinality is from zero to n 5136.

ContactPerson refers to the contact person of the party. For the GDT Contact Person 5138, the Category is Element 5140, the Object Class is Business Document Message Header Party 5142, the Property is Contact Person 5144, the Representation/Association is Contact Person 5146, the Type is GDT 5148, the Type Name is Contact Person 5150, and the Cardinality is zero or one 5152.

The GDT BusinessDocumentMessageHeaderParty 5100 may be used in the BusinessDocumentMessageHeader of a BusinessDocument. This GDT is meant for defining the SenderParty or RecipientParty. The different IDs of a GDT BusinessDocumentMessageHeaderParty 5100 may identify the same party.

A party may be identified using an InternalID or Standard ID. InternalID is when SenderParty and RecipientParty use common master data or are in alignment with regard to the semantics and use of InternalID. StandardID is when SenderParty and RecipientParty can manage standardized identifiers. Of all of the IDs available to the SenderParty, generally those IDs the RecipientParty is expected to understand are used in a BusinessDocument. Either company-internal ID or a standardized ID can be used for identification.

GDT BusinessDocumentMessageHeaderParty 5100 can be used for the details and identification of the sender or recipient of a BusinessDocument. Furthermore, additional information about the contact person, including address, can be defined, which makes it possible to contact this person directly should any problems or errors occur when validating or processing the inbound BusinessDocument.

(q) BusinessDocumentMessageID

A GDT BusinessDocumentMessageID 5200 may be a unique identifier of a business document in a message that is issued by the sender business application. An example of GDT BusinessDocumentMessageID 5200 is:

```
<PurchaseOrderRequest>
      <MessageHeader>
            <ID
                  schemeID="ORDER"
                  schemeAgencyID="124224"
                  schemeAgencySchemeAgencyID="12232344">
                  00000000000001
            </ID>
            . . .
      </MessageHeader>
      . . .
</PurchaseOrderRequest>.
```

The structure of GDT Business Document Message ID 5200 is depicted in FIG. 52. For the GDT Business Document Message ID 5200, the Category is Complex Type 5202, the Object Class is Business Document Message 5204, the Property is Identification 5206, the Representation/Association is Identifier 5208, the Type is CCT 5210, the Type Name is Identifier 5212, the Length is from one to thirty-five 5214. The GDT Business Document Message ID 5200 may be a restricted GDT.

SchemeID 5218 identifies an identification scheme. These identification schemes may be provided by a code list, such as the SAP MessageTypes. The "schemeID" attribute is not required if the GDT BusinessDocumentMessageID 5200 is unique within a schemeAgencyID. For the GDT Scheme ID 5218, the Category is Attribute 5220, the Object Class is Identification Scheme 5222, the Property is Identification 5224, the Representation/Association is Identifier 5226, the Type is xsd 5228, the Type Name is Token 5230, the Length is from one to sixty 5232, and the Cardinality is zero or one 5234.

SchemeAgencyID 5236 may be covered by the agency ID of the sender. If this agency manages multiple business systems, the schemeAgencyID contains the unique identification of the respective business system from which the BusinessDocument was sent. For the GDT Scheme Agency ID 5236, the Category is Attribute 5238, the Object Class is Identification Scheme Agency 5240, the Property is Identification 5242, the Representation/Association is Identifier 5244, the Type is xsd 5246, the Type Name is Token 5248, and the Length is from one to sixty 5250. The Cardinality between the GDT BusinessDocumentMessageID 5200 and SchemeAgencyID is zero or one 5252.

SchemeAgencySchemeAgencyID contains the unique identification of the agency that manages the schemeAgencyID. This attribute may contain values from DE 3055 (excluding roles). This attribute is not required if this information comes unequivocally from the sender.

The format of GDT BusinessDocumentMessageID 5200 identification is a sequential number comprising a maximum of 35 characters. The number may be positive. This representation complies with the UN/EDIFACT conventions (see DE 0340 (Interactive Message Reference Number)).

The GDT BusinessDocumentMessageID 5200 is a unique identification for at least the entire lifetime of a BusinessDocument. The identification is generated by the respective business application of the creator and, in a variation, may not be created or interpreted by the technical message transfer systems.

The technical MessageID depends on the respective technical transfer protocol and may not be associated with the GDT BusinessDocumentMessageID 5200. When a technical message is sent, the BusinessDocument is the payload in the message. The MessageID can change as a result of the forwarding mechanisms of the respective middleware systems or the different transfer protocols used.

In the inbound direction, mapping can be performed to the in-house message code. In the outbound direction, there are various scenarios. If a Sender is known because it is given by SenderParty, schemeID 5202 identifies the message type. If a Sender is unknown because it is not given by SenderParty and Identification of business level at the sender is standardized, then schemeID 5202 identifies the message type, schemeAgencyID 5204 identifies the standardized ID for the agency that generates the MessageID, and schemeAgencySchemeAgencyID 5206 identifies the agency from DE 3055 that manages the standardized ID schemeAgencyId. If a Sender is unknown because it is not given by SenderParty and identification of business level at the sender is proprietary, then schemeID 5202 identifies the message type, schemeAgencyID 5204 identifies the proprietary ID for the agency that generates the MessageID, and schemeAgencySchemeAgencyID 5206 identifies 'ZZZ' which is mutually defined from DE 3055.

If a Sender has multiple business systems that are unique within an agency (for example: System Landscape Directory), then schemeID 5202 identifies the message type and schemeAgencyID 5204 identifies the unique ID of the business system that may be unique within an agency. In this scenario, uniqueness is ensured by the sender and the Sender is not required in internal communication.

(r) BusinessTransactionBlockedIndicator

A GDT BusinessTransactionBlockedIndicator 5300 indicates whether or not the execution of a business transaction is blocked. An example of GDT BusinessTransactionBlockedIndicator 5300 is: <DeliveryExecutionBlockedIndicator>true</DeliveryExecutionBlockedIndicator>.

The structure of GDT Business Transaction Blocked Indicator 5300 is depicted in FIG. 53. For the GDT Business Transaction Blocked Indicator 5300, the Object Class is Business Transaction 5302, the Property is Blocked Indicator 5304, the Representation/Association is Indicator 5306, the Type is CCT 5308, and the Type Name is Indicator 5310.

GDT BusinessTransactionBlockedIndicator 5300 may have the value true or false. True indicates that the execution of a business transaction is blocked. False indicates that the execution of a business transaction is not blocked.

The GDT BusinessTransactionBlockedIndicator 5300 can be used in various environments, such as in delivery and in billing. In a delivery environment, this data type is used by a requesting application (e.g., Sales) to send a delivery request to Supply Chain Execution (e.g., for planning purposes) at an early stage, but, at the same time, to inform Supply Chain Execution that the delivery should not be executed yet since several points still have to be clarified with the customer, necessary papers are missing, or the customer's credit limit has been exceeded or has not yet been checked.

In a billing environment, this data type is used by a requesting application (e.g., Sales) to set up a billing due list in billing but, at the same time, to specify that billing may not yet be executed. It is possible that the requesting application first executes a release procedure, that the customer-specific prices have not yet been determined, that certain necessary documents have not yet been received (letter of credit procedure), or that the customer's credit limit has been exceeded.

(s) CompletedIndicator

A GDT CompletedIndicator 5400 indicates whether an object is completed in a business sense or not. GDT CompletedIndicator 5400 may relate to business translations (for example, invoice creation, delivery, sourcing) or to objects that have the character of a transaction (for example, product catalog transfer in multiple steps). An example of GDT CompletedIndicator 5400 is: <CompletedIndicator>false</CompletedIndicator>.

The structure of GDT CompletedIndicator 5400 is depicted in FIG. 54. For GDT CompletedIndicator 5400, the Property is Completed Indicator 5402, the Representation/Association is Indicator 5404, the Type is CCT 5406, and the Type Name is Indicator 5408.

The GDT CompletedIndicator 5400 can have the values true or false. True indicates that an object is completed. False indicates that an object is not completed.

The GDT CompletedIndicator 5400 is used to indicate that the processing of an object has been completed, even if further processing steps are being run in a different context (for example, sourcing for a requirement may be completed but procurement of the requirement calls for further process steps). In various variations, for various objects a CompletedIndicator or a CancelledIndicator can be used depending on whether it is desired to emphasize that processing of the object has been completed properly (CompletedIndicator) or that the object has been canceled in the sense of an exception situation (CancelledIndicator).

From the context of the interface in which a GDT CompletedIndicator 5400 is used, the object to which the CompletedIndicator refers is described, its business significance is described, and whether a set CompletedIndicator can be undone in a follow-on message is described.

(t) BusinessTransactionDocumentGroupID

A GDT BusinessTransactionDocumentGroupID 5500 may uniquely identify a group of business documents that are to be considered as one group within a business process. An example of GDT BusinessTransactionDocumentGroupID 5500 is: <DeliveryGroupID>4711</DeliveryGroupID>.

The structure of GDT Business Transaction Document Group ID 5500 is depicted in FIG. 55. For the GDT Business Transaction Document Group ID 5500, the Object Class is Business Transaction Document 5502, the Property is Group Identification 5504, the Representation/Association is Indicator 5506, the Type is CCT 5508, the Type Name is Identifier 5510, the Length is from one to ten 5512. The GDT Business Transaction Document Group ID 5500 may be a restricted GDT.

GDT BusinessTransactionDocumentGroupID 5500 is used to identify documents that belong together to enable them to be processed together by the application. "BusinessTransactionDocument" is replaced by the description of each document in the XML instance, e.g., "PurchaseOrder" for a purchase order, "Delivery" for a delivery, and the like.

(u) BusinessTransactionDocumentID

A GDT BusinessTransactionDocumentID 5600 is a unique identifier for a document in a business transaction. An example for GDT BusinessTransactionDocumentID 5600 is: <OrderID schemeID='Orders' schemeAgencyID='123456789'schemeAgencySchemeAgencyID='16'> 5400000012</OrderID>which assigns the identifier 5400000012 to the OrderID having an "Orders" identification scheme, "123456789" as the agency managing the identification scheme, and 16 as the identification scheme that represents the context that is used to identify the agency.

The structure of GDT Business Transaction Document ID 5600 is depicted in FIG. 56. For the GDT Business Transaction Document ID 5600, the Object Class is Business Transaction Document 5602, the Property is Identification 5604, the Representation/Association is Identifier 5606, the Type is CCT 5608, the Type Name is Identifier 5610, and the Length is from one to thirty-five 5612. The GDT Business Transaction Document ID 5600 may be a restricted GDT.

For the GDT Scheme ID 5616, the Category is Attribute 5618, the Object Class is Identification Scheme 5620, the Property is Identification 5622, the Representation/Association is Identifier 5624, the Type is xsd 5626, the Type Name is Token 5628, and the Length is from one to sixty 5630. The Cardinality is zero or one 5632.

For the GDT Scheme Agency ID 5634, the Category is Attribute 5636, the Object Class is Identification Scheme Agency 5638, the Property is Identification 5640, the Representation/Association is Identifier 5642, the Type is xsd 5644, the Type Name is Token 5646, the Length is from one to sixty 5648, and the Cardinality is zero or one 5650.

For the GDT Scheme ID 5616, the Category is Attribute 5618, the Object Class is Identification Scheme 5620, the Property is Identification 5622, the Representation/Association is Identifier 5624, the Type is xsd 5626, the Type Name is Token 5628, and the Length is from one to sixty 5630. The Cardinality is zero or one 5632.

For the GDT Scheme Agency Scheme ID 5652, the Category is Attribute 5654, the Object Class is Identification Scheme Agency 5656, the Property is Scheme 5658, the Representation/Association is Identifier 5660, the Type is xsd 5662, the Type Name is Token 5664, and the Length is from one to sixty 5666. The Cardinality is zero or one 5668.

For the GDT Scheme Agency ID 5670, the Category is Attribute 5672, the Object Class is Identification Scheme Agency 5674, the Property is Scheme Agency 5676, the Representation/Association is Identifier 5678, the Type is xsd 5680, the Type Name is Token 5682, and the Length is three 5684. The Cardinality is zero or one 5686.

A business process uses GDT BusinessTransactionDocumentID 5600 to uniquely identify a document, such as a purchase order or an invoice in a business transaction. A partner uses a GDT BusinessTransactionDocumentID 5600 to inform another partner of the identification of a business transaction document in an initial step, e.g., when creating data for the business transaction or sending it for the first time. The second partner can use this identifier to reference the business transaction document in the subsequent process.

In a variation, there may be no standardized IDs for transaction data. The attributes schemeID, schemeAgencyID, schemeAgencySchemeID, and schemeAgencySchemeAgencyID are used in the same way as for the CCT Identifier to define the context for which a GDT BusinessTransactionDocumentID 5600 is guaranteed to be unique.

In the XML instance, "BusinessTransactionDocument" is replaced by the description of the respective document, e.g., "PurchaseOrder" for a purchase order, "Delivery" for a delivery, and the like.

(v) BusinessTransactionDocumentItemGroupID

A GDT BusinessTransactionDocumentationGroupID 5700 uniquely identifies a group of business document items that are to be characterized as a group within a business document. An example of GDT BusinessTransactionDocumentationGroupID 5700 is: <DeliveryItemGroupID>123</DeliveryItemGroupID>.

The structure of GDT Business Transaction Document Item Group ID 5700 is depicted in FIG. 57. For the GDT Business Transaction Document Item Group ID 5700, the Object Class is Business Transaction Document Item 5702, the Property is Group Identification 5704, the Representation/Association is Identifier 5706, the Type is CCT 5708, the Type Name is Identifier 5710, and the Length is three 5712. The GDT Business Transaction Document Item Group ID 5700 may be restricted.

A freely-definable numeric sequence may be used for display purposes. In a variation, it is a 3-digit, numeric text field. Leading zeros are also displayed. However, according to the current definition in R/3 in the processing applications "order" and "delivery," a 3-figure, numeric text field (NUMC3) having a freely-definable 3-character string using the character set {"0," "1," "2," "3," "4," "5," "6," "7," "8," "9"} may be used. Otherwise, a corresponding mapping may be necessary, but it might not be unique due to the use of a larger number of characters. In this case, the uniqueness may have to be ensured explicitly. This requirement, however, may not be ensured explicitly per definition/data type and therefore may be documented.

The GDT BusinessTransactionDocumentationGroupID 5700 is used to indicate the items of a business document that belong together for a unique identification of this item grouping in subsequent steps. For example, delivery groups are used to check the availability of materials that may be delivered together. Items that belong to the same delivery group may be delivered at the same time. Therefore, from the point of view of the availability check, the products/materials selected in the highlighted items may be available in sufficient quantities at the same time on the requested date so that the requirement can be fulfilled.

In the XML instance, the "BusinessTransactionDocument" is replaced by the description of the respective document, e.g., "PurchaseOrder" for a purchase order, "Delivery" for a delivery, and the like.

(w) BusinessTransactionDocumentItemHierarchyRelationshipTypeCode

A CDT BusinessTransactionDocumentItemHierarchyRelationshipTypeCode 5800 is a coded representation of the business type of a hierarchical relationship between items of a BusinessTransactionDocument. An example of CDT BusinessTransactionDocumentItemHierarchyRelationshipTypeCode 5800 in the context of a purchase order item is: <HierarchyRelationshipTypeCode>001</HierarchyRelationshipTypeCode>.

The structure of CDT Business Transaction Document Item Hierarchy Relationship Type Code 5800 is depicted in FIG. 58. For the CDT Business Transaction Document Item Hierarchy Relationship Type Code 5800, the Object Class Qualification is Business Transaction Document Item Hierarchy 5802, the Object Class is Relationship 5804, the Property is Type Code 5806, the Representation/Association is Code 5808, the Type is GDT 5810, the Type is Relationship Type Code 5812, and the Length is three 5814. The CDT Business Transaction Document Item Hierarchy Relationship Type Code 5800 may be restricted.

The GDT BusinessTransactionDocumentItemHierarchyRelationshipTypeCode 5800 is based on the GDT ObjectStructureRelationshipTypeCode. Elements of type BusinessTransactionDocumentItemHierarchyTypeCode can have values 001, 002, 003, or 006. 001 means that the relationship is a bill of material relationship, 002 means the relationship is a grouping relationship (one object in this relationship is part of a logical grouping to another object), 003 means the relationship is a discount in kind relationship, and 006 means the relationship is a substitution product relationship.

The CDT BusinessTransactionDocumentItemHierarchyRelationshipTypeCode 5800 is used together with a ParentItemID to map item hierarchies. An item hierarchy is a tree of subordinated items, where the BusinessTransactionDocumentHierarchyRelationshipTypeCode 5800 describes the meaning of the hierarchical level of an item.

When using the CDT BusinessTransactionDocumentItemHierarchyRelationshipTypeCode 5800, which types of lower-level items are permitted in each use context and which integrity conditions apply to items in a hierarchy of a particular CDT BusinessTransactionDocumentItemHierarchyRelationshipTypeCode 5800 may be explicitly defined. In particular, it may be specified how hierarchies with different BusinessTransactionDocumentItemHierarchyRelationshipTypeCodes can be combined with each other. For example: When a bill of material hierarchy and a grouping hierarchy exist for one item, and when a grouping hierarchy exists for an item.

In a variation, there may be one hierarchy for each item, that is, the same CDT BusinessTransactionDocumentItemHierarchyRelationshipTypeCode 5800 is specified for lower-level items. However, there are exceptions to this rule. A purchase order can contain items that have both a bill of material hierarchy and a discount in kind hierarchy. In a variation, the CDT BusinessTransactionDocumentItemHierarchyRelationshipTypeCode 5800 may be a proprietary code list with fixed predefined values. In that case, changes to the permitted values may involve changes to the interface.

In the XML instance, "BusinessTransactionDocument" is replaced by the description of the specific business transaction document, for example "PurchaseOrder" for a purchase order, "Delivery" for a delivery, and the like.

(x) BusinessTransactionDocumentItemID

A GDT BusinessTransactionDocumentItemID 5900 is a unique identifier of an item or sub item of a document within a business transaction and is unique in the context of the business transaction. An example of BusinessTransactionDocumentItemID is: <ItemID>13</ItemID>.

The structure of GDT Business Transaction Document Item ID 5900 is depicted in FIG. 59. For the GDT Business Transaction Document Item ID 5900, the Object Class is Business Transaction Document Item 5902, the Property is Identification 5904, the Representation/Association is Identifier 5906, the Type is CCT 5908, the Type Name is Identifier 5910, and the Length is from one to ten 5912. The GDT Business Transaction Document Item ID 5900 may be restricted 5914.

GDT BusinessTransactionDocumentItemID 5900 is a sequence of numbers with a maximum of ten characters. Leading zeros may not be significant at the recipient and may not be sent.

Business transactions, such as purchase orders or invoices, may be divided into items and sub items. GDT BusinessTransactionDocumentItemID 5900 is used in a business process to identify uniquely an item or sub item within a business transaction. A partner uses its GDT BusinessTransactionDocumentItemID 5900 to inform the other partner of its identification of the item in an initial step, for example, when creating an item or transmitting it for the first time. The second partner can then use this identifier to reference the respective item of the document in the subsequent process.

In the XML instance, "BusinessTransactionDocument" is replaced by the description of the respective document, e.g., "PurchaseOrder" for a purchase order, "Delivery" for a delivery, and the like.

(y) BusinessTransactionDocumentItemScheduleLineID

A GDT BusinessTransactionDocumentItemScheduleLineID 6000 is a unique identifier that uses a deadline to identify the schedule line of a document item within a business transaction. An example of GDT BusinessTransactionDocumentItemScheduleLineID 6000 is: <PurchaseOrderItemScheduleLineID>0001</PurchaseOrderItemScheduleLineID>.

The structure of GDT Business Transaction Document Item Schedule Line ID 6000 is depicted in FIG. 60. For the GDT Business Transaction Document Item Schedule Line ID 6000, the Object Class is Business Transaction Document Item Schedule Line 6002, the Property is Identification 6004, the Representation/Association is Identifier 6006, the Type is CCT 6008, the Type Name is Identifier 6010, the Length is from one to four 6012. The GDT Business Transaction Document Item Schedule Line ID 6000 may be restricted 6014.

Documents such as purchase orders, sales orders, or invoices are divided into items. Items are then further divided according to schedule lines. Each of these schedule lines specifies a deadline and relevant product quantities for this deadline.

"BusinessTransactionDocument" is replaced by the description of each document in the XML instance, e.g., "PurchaseOrder" for a purchase order, "Delivery" for a delivery, and the like.

(z) ThirdPartyIndicator

A GDT ThirdPartyIndicator 6100 indicates whether or not a document item is used in the context of a third-party deal. An example of GDT ThirdPartyIndicator 6100 in the context of a document item is: <ThirdPartyDealIndicator>true</ThirdPartyDealIndicator>.

The structure of GDT Third Party Indicator 6100 is depicted in FIG. 61. For the GDT Third Party Indicator 6100, the Object Class is Business Transaction Document Item 6102, the Property is third Party Deal Indicator 6104, the Representation/Association term is Indicator 6106, the Type is CCT 6108, and the Type Name is Identifier 6110. The GDT ThirdPartyIndicator 6100 can have the values true or false. True indicates that the object is used in the context of a third-party deal. False indicates that the object is not used in the context of a third-party deal.

The GDT ThirdPartyIndicator 6100 is used to indicate that a document item is used in the context of a third-party deal. A third-party deal may be a process in which a company processes a sales order via a third party rather than fulfilling it directly itself. The context to which the BusinessTransactionDocumentItemThirdPartyDealIndicator refers may be clear from the usage of the GDT.

(aa) BusinessTransactionDocumentItemTypeCode

The GDT BusinessTransactionDocumentItemTypeCode 6200 is a coded representation of the type of an item in a document that occurs in business transactions. The document item type describes the business nature of similar document items and defines the basic features of the document items of this type. An example of GDT BusinessTransactionDocumentItemTypeCode 6200 is: <BusinessTransactionDocumentItemTypeCode>001</BusinessTransactionDocumentItemTypeCode>.

The structure of GDT Business Transaction Document Item Type Code 6200 is depicted in FIG. 62. For the GDT Business Transaction Document Item Type Code 6200, the Object Class is Business Transaction Document Item 6202, the Property is Type 6204, the Representation/Association is Code 6206, the Type is CCT 6208, the Type Name is Code 6210, and the Length is three 6212. The GDT Business Transaction Document Item Type Code 6200 may be restricted 6214.

GDT BusinessTransactionDocumentItemTypeCode 6200 can have a value from 001 to 004. 001 identifies a purchase order item that specifies an ordered product or additional information on ordered products. This includes information on free goods, substitute products and value limits. 002 identifies an invoice item that specifies prices and taxes for a delivered product (including completed work) and, if necessary, more information on this product. 003 identifies a credit memo item that specifies refunded prices and taxes for a delivered product (including completed work) and, if necessary, more information on this product. 004 identifies a delivery cost item that specifies delivery costs incurred by the purchaser on top of the actual product costs. There may be a differentiation between shipping costs, customs duty costs, and miscellaneous costs, such as packaging and insurance.

Certain combinations of a GDT BusinessTransactionDocumentItemTypeCode 6200 and a BusinessTransactionDocumentTypeCode may be allowed. For example, if BusinessTransactionDocumentTypeCode is 001, BusinessTransactionDocumentItemTypeCode may be 001. If BusinessTransactionDocumentTypeCode is 004, BusinessTransactionDocumentItemTypeCode may be 002, 003, or 004. If BusinessTransactionDocumentTypeCode is 005, BusinessTransactionDocumentItemTypeCode may be 001.

The GDT BusinessTransactionDocumentItemTypeCode 6200 categorizes an item in a document that is sent if the concrete semantic meaning of the item or sub-item is not defined by the message itself or if semantically different items can occur in one message. In particular, there are documents in applications that contain items with different types so that it may not be enough to specify the type of the complete document. For example, in addition to a "standard" invoice item for an ordered product, an invoice can contain a delivery costs item that is to be shown separately.

In an example, in R/3, the BusinessTransactionDocumentItemTypeCode 6200 corresponds to VBTYP+POSAR in Sales or BSTYP in Purchasing or MRM_REFERENZBELEG in Invoice Verification, and the like, at a less detailed level.

(bb) BusinessTransactionDocumentLocation

A CDT BusinessTransactionDocumentLocation 6300 contains the information that is exchanged in business documents about a location relevant for business transactions. This information identifies the location and its address. The identification may be a company-internal ID, a standardized ID, or one or several partner-specific IDs. A location is a logical or a physical place. An ID for a location assigned by a party identifies in the name the role the assigning party plays in the business transaction. At present, the role descriptions are Buyer, Seller, ProductRecipient, Vendor, BillTo, and BillFrom. An example of CDT BusinessTransactionDocumentLocation 6300 is:

```
<InventoryChange>
    . . .
    <Location>
        <StandardID schemeAgencyID="016">4711 </StandardID>
        <BuyerID>9873</BuyerID>
        <Address> . . .</Address>
    <Location>
<InventoryChange>.
```

The structure of CDT Business Transaction Document Location 6300 is depicted in FIG. 63. For the CDT Business Transaction Document Location 6300, the Object Class is Business Transaction Document Location 6302 and the Representation/Association is Details 6304.

For the Internal ID 6306, the Category is Element 6308, the Object Class is Business Transaction Document Location 6310, the Property Qualifier is Internal 6312, the Property is Identification 6314, the Representation/Association is Identifier 6316, the Type is CDT 6318, and the Type Name is Location Internal ID 6320. The Cardinality is zero or one 6322.

For the Standard ID 6324, the Category is Element 6326, the Object Class is Business Transaction Document Location 6328, the Property Qualifier is Standard 6330, the Property is Identification 6332, the Representation/Association is Identifier 6334, the Type is CDT 6336, and the Type Name is Location Standard ID 6338. The Cardinality is from zero to n. 6340.

For the Buyer ID 6342, the Category is Element 6344, the Object Class is Business Transaction Document Location 6346, the Property Qualifier is Buyer 6363, the Property is Identification 6350, the Representation/Association is Identifier 6352, the Type is CDT 6354, and the Type Name is Location Party ID 6356. The Cardinality is zero or one 6358.

For the Seller ID 6360, the Category is Element 6362, the Object Class is Business Transaction Document Location 6364, the Property Qualifier is Seller 6366, the Property is Identification 6368, the Representation/Association is Identifier 6370, the Type is CDT 6372, and the Type Name is Location Party ID 6374. The Cardinality is zero or one 6376.

For the Seller ID 6360, the Category is Element 6362, the Object Class is Business Transaction Document Location 6364, the Property Qualifier is Seller 6366, the Property is Identification 6368, the Representation/Association is Identifier 6370, the Type is CDT 6372, and the Type Name is Location Party ID 6374. The Cardinality is zero or one 6376.

For the Product Recipient ID 6378, the Category is Element 6380, the Object Class is Business Transaction Document Location 6390, the Property Qualifier is Product Recipient 6392, the Property is Identification 6394, the Representation/Association is Identifier 6396, the Type is CDT 6398, and the Type Name is Location Party ID 6399. The Cardinality is zero or one 6301A.

For the Vendor ID 6302A, the Category is Element 6303A, the Object Class is Business Transaction Document Location 6304A, the Property Qualifier is Vendor 6305A, the Property is Identification 6306A, the Representation/Association is Identifier 6307A, the Type is CDT 6308A, and the Type Name is Location Party ID 6309A. The Cardinality is zero or one 6310A.

For the Bill To ID 6311A, the Category is Element 6312A, the Object Class is Business Transaction Document Location 6313A, the Property Qualifier is Bill To 6314A, the Property is Identification 6315A, the Representation/Association is Identifier 6316A, the Type is CDT 6317A, and the Type Name is Location Party ID 6318A. The Cardinality is zero or one 6319A.

For the Bill From ID 6320A, the Category is Element 6321A, the Object Class is Business Transaction Document Location 6322A, the Property Qualifier is Bill From 6323A, the Property is Identification 6324A, the Representation/Association is Identifier 6325A, the Type is CDT 6326A, and the Type Name is Location Party ID 6327A. The Cardinality is zero or one 6328A.

For the Bidder ID 6329A, the Category is Element 6330A, the Object Class is Business Transaction Document Location 6331A, the Property Qualifier is Bidder 6332A, the Property is Identification 6333A, the Representation/Association is Identifier 6334A, the Type is CDT 6335A, and the Type Name is Location Party ID 6336A. The Cardinality is zero or one 6337A.

For the Address 6338A, the Category is Element 6339A, the Object Class is Business Transaction Document Location 6340A, the Property is Address 6341A, the Representation/Association is Address 6342A, the Type is GDT 6343A, and the Type Name is Address 6344A. The Cardinality is zero or one 6345A.

For the Note 6346A, the Category is Element 6347A, the Object Class is Business Transaction Document Location 6348A, the Property is Note 6349A, the Representation/Association is Text 6350A, the Type is GDT 6351A, and the Type Name is Note 6352A. The Cardinality is zero or one 6353A.

InternalID refers to a proprietary identifier that is used when both sender and recipient can access shared master data (extended enterprise). Standard ID refers to a standardized identifier, whose identification schemes may be managed by an agency from the DE 3055 code list. Buyer ID refers to an identifier that is used by the BuyerParty proprietarily for this location. SellerID refers to an identifier that is used by the SellerParty proprietarily for this location. ProductRecipientID refers to an identifier that is used by the ProductRecipientParty proprietarily for this location. VendorID refers to an identifier that is used by the VendorParty proprietarily for this location. BillToID refers to an identifier that is used by the BillToParty proprietarily for this location. BillFromID refers to an identifier that is used by the BillFromParty proprietarily for this location. BidderID refers to an identifier that is used by the BidderParty proprietarily for this location. Address is an address that describes the location by specifying information such as postal address, geographic coordinates, or any other information that specifies a location. Note refers to an additional information such as direction.

When defining addresses, organization addresses may be supported. The different IDs of a CDT BusinessTransactionDocumentLocation 6300 identify the same location. A location may be identified by the InternalID when sender and recipient can access shared master data, by the StandardID when sender and recipient can manage standardized identifiers, or by the PartyIDs: when sender and recipient are interested in the PartyIDs assigned by the parties involved. From all of the IDs available to the sender, the IDs that the recipient is expected to understand may be used.

(cc) BusinessTransactionDocumentParty

A CDT BusinessTransactionDocumentParty 6400 contains the information that is exchanged—in accordance with common business understanding—in business documents about a party involved in business transactions. This information is used to identify the party and the party's address, as well as the party's contact person and the contact person's address. This identification can take place using an internal ID, a standardized ID, or IDs assigned by the parties involved. A party is a natural person, organization, or business partner group in which a company has a business or intra-enterprise interest. This could be a person, organization, or group within or outside of the company. An ID assigned by a party identifies in the name the role the assigning party plays in the business transaction. At present, the roles are Buyer, Seller, ProductRecipient, Vendor, BillTo, BillFrom and Bidder. An example of CDT BusinessTransactionDocumentParty 6400 is:

```
<PurchaseOrder>
      . . .
      <BuyerParty>
            <StandardID schemeAgencyID="016">4711</StandardID>
            <BuyerID>9873</BuyerID>
            <SellerID>487847</SellerID>
            <Address> . . .</Address>
            <ContactPerson>
                  <BuyerID>9874</BuyerID>
                  <SellerID>487848</SellerID>
                  <Address> . . .</Address>
            </ContactPerson>
      </BuyerParty>
</PurchaseOrder>.
```

In this example, schemeAgencyID="016" corresponds to Dun&Bradstreet according to code list D3055 that means that the DUNS number is assigned by Dun&Bradstreet. The following is a second example of BusinessTransactionDocumentParty:

```
<PurchaseOrder>
      . . .
      <BuyerParty>
            <InternalID schemeID="PartyID"
schemeAgencyID="BPL_300">747</InternalID>
            <Address> . . .</Address>
            <ContactPerson>
                        <InternalID schemeID="PartyID"
schemeAgencyID="BPL_300">737</InternalID>
                        <Address> . . .</Address>
                  </ContactPerson>
            </BuyerParty>
      <PurchaseOrder>.
```

In this example, schemeID="PartyID" indicates that the scheme "PartyID" was used to identify the party and schemeAgencyID="BPL_300" indicates that the scheme was assigned by the SAP CMDM system "BPL_300."

The examples above show the XML instance of the GDT BusinessTransactionDocumentParty within a purchase order for different identification types (standard ID, party IDs, internal ID). In this scenario, the party assumes the role of Buyer.

The structure of CDT Business Transaction Document Party 6400 is depicted in FIG. 64. For the CDT Business Transaction Document Party 6400, the Category is Element 6408, the Object Class is Business Transaction Document Party 6402, and the Representation/Association is Details 6404.

For the Internal ID 6406, the Category is Element 6408, the Object Class is Business Transaction Document Party 6470, the Property Qualifier is Internal 6412, the Property is Identification 6414, the Representation/Association is Identifier 6416, the Type is CDT 6418, and the Type Name is Party Internal ID 6420. The Cardinality is zero or one 6422.

For the Standard ID 6424, the Category is Element 6426, the Object Class is Business Transaction Document Party 6428, the Property Qualifier is Standard 6430, the Property is Identification 6432, the Representation/Association is Identifier 6434, the Type is CDT 6436, and the Type Name is Party Standard ID 6438. The Cardinality is from zero to n. 6440.

For the Buyer ID 6442, the Category is Element 6444, the Object Class is Business Transaction Document Party 6446, the Property Qualifier is Buyer 6448, the Property is Identification 6450, the Representation/Association is Identifier 6452, the Type is CDT 6454, and the Type Name is Party ID 6456. The Cardinality is zero or one 6458.

For the Seller ID 6460, the Category is Element 6462, the Object Class is Business Transaction Document Party 6464, the Property Qualifier is Seller 6466, the Property is Identification 6468, the Representation/Association is Identifier 6470, the Type is CDT 6472, and the Type Name is Party Party ID 6474. The Cardinality is zero or one 6476.

For the Product Recipient ID 6478, the Category is Element 6480, the Object Class is Business Transaction Document Party 6482, the Property Qualifier is Product Recipient 6484, the Property is Identification 6486, the Representation/Association is Identifier 6488, the Type is CDT 6490, and the Type Name is Party Party ID 6492. The Cardinality is zero or one 6494.

For the Vendor ID 6496, the Category is Element 6498, the Object Class is Business Transaction Document Party 6499, the Property Qualifier is Vendor 6401A, the Property is Identification 6402A, the Representation/Association is Identifier 6403A, the Type is CDT 6404A, and the Type Name is Party Party ID 6405A. The Cardinality is zero or one 6406A.

For the Bill To ID 6407A, the Category is Element 6408A, the Object Class is Business Transaction Document Party 6409A, the Property Qualifier is Bill To 6410A, the Property is Identification 6411A, the Representation/Association is Identifier 6412A, the Type is CDT 6413A, and the Type Name is Party Party ID 6414A. The Cardinality is zero or one 6415A.

For the Bill From ID 6416A, the Category is Element 6417A, the Object Class is Business Transaction Document Party 6418A, the Property Qualifier is Bill From 6419A, the Property is Identification 6420A, the Representation/Association is Identifier 6421A, the Type is CDT 6422A, and the Type Name is Party Party ID 6423A. The Cardinality is zero or one 6424A.

For the Bidder ID 6425A, the Category is Element 6426A, the Object Class is Business Transaction Document Party 6427A, the Property Qualifier is Bidder 6428A, the Property is Identification 6429A, the Representation/Association is Identifier 6430A, the Type is CDT 6431A, and the Type Name is Party Party ID 6432A. The Cardinality is zero or one 6433A.

For the Address 6434A, the Category is Element 6435A, the Object Class is Business Transaction Document Party 6436A, the Property is Address 6437A, the Representation/Association is Address 6438A, the Type is GDT 6440A, and the Type Name is Address 6441A. The Cardinality is zero or one 6424A.

For the Contact Person 6443A, the Category is Element 6444A, the Object Class is Business Transaction Document Party 6445A, the Property is Contact Person 6446A, the Representation/Association is Contact Person 6447A, the Type is CDT 6448A, and the Type Name is Contact Person 6464A. The Cardinality is zero or one 6450A.

InternalID refers to a proprietary identifier that is used when both sender and recipient can access shared master data (extended enterprise). StandardID refers to a standardized identifier for this party, whose identification scheme may be managed by an agency from the DE 3055 code list. BuyerID refers to an identifier that is used by the BuyerParty for this party. SellerID refers to an identifier that is used by the SellerParty for this party. ProductRecipientID refers to an identifier that is used by the ProductRecipientParty for this party. VendorID refers to an identifier that is used by the VendorParty for this party. BillToID refers to an identifier that is used by the BillToParty for this party. BillFromID refers to an identifier that is used by the BillFromParty for this party. BidderID refers to an identifier that is used by the BidderParty for this party. Address refers to the address of the party. ContactPerson refers to a contact person of the party.

The different IDs of a CDT BusinessTransactionDocumentParty 6400 may identify the same party. A party may be identified by InternalID when sender and recipient can access shared master data, by StandardID when sender and recipient can manage standardized identifiers, or by PartytPartyIDs when sender and recipient are interested in the PartyIDs assigned by the parties involved. Of the IDs available to the sender, IDs that the recipient is expected to understand may be used in a message.

The parties involved in a business transaction assume a specific role that is also specified for them in the corresponding business documents. For example, BuyerParty is a party that buys goods or services, SellerParty is a party that sells goods or services, CreditorParty is a party that is authorized to claim goods, services or payment for a debt owed to it, DebtorParty is a party that is obliged to provide goods, services or payment for a debt it owes, ProductRecipientParty is a party to which goods are delivered or for which services are provided, VendorParty is a party that delivers goods or provides services, ManufacturerParty is a party that manufactures goods, PayerParty is a party that pays for goods or services, PayeeParty is a party that receives a payment for goods or services, BillToParty is a party to which the invoice for goods or services is sent, BillFromParty is a party that creates the invoice for goods or services, CarrierParty is a party that transports goods, RequestorParty is a party that requests the procurement of goods or services, PortalProviderParty is a party that runs a portal that brings business partners together for a business transaction, CatalogueProviderParty is a party that compiles a catalogue, BidderParty is a party that bids for goods or services, and OwnerParty is a party that has tangible or intangible assets as property.

The CDT BusinessTransactionDocumentParty 6400 is used in messages for internal and external communication to transmit required information about the parties involved.

(dd) BusinessTransactionDocumentPricingIndicator

The GDT BusinessTransactionDocumentPricingIndicator 6500 indicates whether pricing/price determination should be performed for all items or for selected items in a business transaction. An example of GDT BusinessTransactionDocumentPricingIndicator 6500 is: <BusinessTransactionDocumentPricingIndicator>true</BusinessTransactionDocumentPricingIndicator>.

The structure of GDT Business Transaction Document Pricing Indicator 6500 is depicted in FIG. 65. For the GDT Business Transaction Document Pricing Indicator 6500, the Object Class is Business Transaction Document 6502, the Property is Pricing Indicator 6504, the Representation/Association is Indicator 6506, the Type is CCT 6508, and the Type Name is Indicator 6510.

The GDT BusinessTransactionDocumentPricingIndicator 6500 can have the values true or false. True indicates that the pricing/price determination should be performed. False indicates that the pricing/price determination should not be performed.

Business documents or items in business documents for which pricing/price determination can be performed are linked to the purchase or sale of products. Illustrative examples are order, delivery and transport documents and their items.

(ee) BusinessTransactionDocumentProduct

A CDT BusinessTransactionDocumentProduct 6600 contains the information that is exchanged—for example, in accordance with common business understanding—in business documents about a product. This information identifies the product and product type, and describes the product. This identification can occur using an internal ID, a standardized ID, or IDs assigned by the parties involved. A product is either a tangible or intangible good, and is a part of the business activities of a company. It can be traded and contributes directly or indirectly to value added. An ID assigned by a party identifies in the name the role the assigning party plays in the business transaction. At present, the roles are Buyer, Seller, ProductRecipient, Vendor, Manufacturer, BillTo, BillFrom and Bidder. An example of CDT BusinessTransactionDocumentProduct 6600 is:

Example 1)

Standard ID, PartyIDs

```
<PurchaseOrder>
        . . .
        <Product>
                <StandardID schemeAgencyID="009">4711</StandardID>
                <BuyerID>A6B7915634654</BuyerID>
                <SellerID>234532358B4</SellerID>
                <ManufacturerID>6546</ManufacturerID>
                <TypeCode>1</TypeCode>
                <Note>SAP NetWeaver</Note>
        </Product>
</PurchaseOrder>.
```

In this example, schemeAgencyID="009" corresponds to "EAN" according to code list DE 3055, and TypeCode="1" indicates it is the product type "Material."

The following is a second example of CDT BusinessTransactionDocumentProduct 6600:

Example 2)

Internal ID

```
        <PurchaseOrder>
                . . .
                <Product>
                        <InternalID schemeID="ProductGUID"
schemeAgencyID=
"MPL_002">1C743CEC501F6A4D8826C7EC5A8554B9</InternalID>
                        <TypeCode>1</TypeCode>
                        <Note>SAP NetWeaver</Note>
                </Product>
        </PurchaseOrder>.
```

In this example, schemeID="PartyGUID" indicates that the scheme "ProductGUID" was used to identify the product and schemeAgencyID="MPL__002" indicates that the scheme was assigned by the business system "MPL__002."

The structure of CDT Business Transaction Document Product 6600 is depicted in FIG. 66. For the CDT Business Transaction Document Product 6600, the Object Class is Business Transaction Document Product 6602, and the Representation/Association is Details 6604.

For the Internal ID 6606, the Category is Element 6608, the Object Class is Business Transaction Document Product 6610, the Property Qualifier is Internal 6612, the Property is Identification 6614, the Representation/Association is Identifier 6616, the Type is CDT 6618, and the Type Name is Product Internal ID 6620. The Cardinality is zero or one 6622.

For the Standard ID 6624, the Category is Element 6626, the Object Class is Business Transaction Document Product 6628, the Property Qualifier is Standard 6630, the Property is Identification 6632, the Representation/Association is Identifier 6634, the Type is CDT 6636, and the Type Name is Product Standard ID 6638. The Cardinality is from zero to n. 6640.

For the Buyer ID 6642, the Category is Element 6644, the Object Class is Business Transaction Document Product 6646, the Property Qualifier is Buyer 6648, the Property is Identification 6650, the Representation/Association is Identifier 6652, the Type is CDT 6654, and the Type Name is Product Party ID 6656. The Cardinality is zero or one 6658.

For the Seller ID 6660, the Category is Element 6680, the Object Class is Business Transaction Document Product 6664, the Property Qualifier is Seller 6666, the Property is Identification 6668, the Representation/Association is Identifier 6670, the Type is CDT 6672, and the Type Name is Product Party ID 6674. The Cardinality is zero or one 6676.

For the Product Recipient ID 6678, the Category is Element 6680, the Object Class is Business Transaction Document Product 6682, the Property Qualifier is Product Recipient 6684, the Property is Identification 6686, the Representation/Association is Identifier 6688, the Type is CDT 6690, and the Type Name is Product Party ID 6692. The Cardinality is zero or one 6694.

For the Vendor ID 6696, the Category is Element 6698, the Object Class is Business Transaction Document Product 6699, the Property Qualifier is Vendor 6601A, the Property is Identification 6602A, the Representation/Association is Identifier 6603A, the Type is CDT 6604A, and the Type Name is Product Party ID 6605A. The Cardinality is zero or one 6606A.

For the Manufacturer ID 6607A, the Category is Element 6608A, the Object Class is Business Transaction Document Product 6609A, the Property Qualifier is Manufacturer 6610A, the Property is Identification 6611A, the Representation/Association is Identifier 6612A, the Type is CDT 6613A, and the Type Name is Product Party ID 6614A. The Cardinality is zero or one 6615A.

For the Bill To ID 6616A, the Category is Element 6617A, the Object Class is Business Transaction Document Product 6618A, the Property Qualifier is Bill To 6619A, the Property is Identification 6620A, the Representation/Association is Identifier 6621A, the Type is CDT 6622A, and the Type Name is Product Party ID 6623A. The Cardinality is zero or one 6624A.

For the Bill From ID 6625A, the Category is Element 6626A, the Object Class is Business Transaction Document Product 6627A, the Property Qualifier is Bill From 6628A, the Property is Identification 6629A, the Representation/Association is Identifier 6630A, the Type is CDT 6631A, and the Type Name is Product Party ID 6632A. The Cardinality is zero or one 6633A.

For the Bidder ID 6634A, the Category is Element 6635A, the Object Class is Business Transaction Document Product

6636A, the Property Qualifier is Bidder 6637A, the Property is Identification 6639A, the Representation/Association is Identifier 6639A, the Type is CDT 6640A, and the Type Name is Product Party ID 6641A. The Cardinality is zero or one 6642A.

For the Type Code 6643A, the Category is Element 6644A, the Object Class is Business Transaction Document Product 6645A, the Property is Type Name Code 6646A, the Representation/Association is Code 6647A, the Type is GDT 6648A, and the Type Name is Product Type Code 6649A. The Cardinality is zero or one 6650A.

For the Note 6651A, the Category is Element 6652A, the Object Class is Business Transaction Document Product 6653A, the Property is Note 6654A, the Representation/Association is Note 6655A, the Type is GDT 6656A, and the Type Name is Note 6657A. The Cardinality is zero or one 6658A.

For the Change ID 6659A, the Category is Element 6660A, the Object Class is Business Transaction Document Product 6661A, the Property is Change Identification 6662A, the Representation/Association is Identifier 6663A, the Type is GDT 6664A, and the Type Name is product Change ID 6665A. The Cardinality is zero or one 6666A.

For the Discontinuation Indicator 6666A, the Category is Element 6667A, the Object Class is Business Transaction Document Product 6668A, the Property is Discontinuation 6669A, the Representation/Association is Indicator 6670A, the Type is GDT 6671A, and the Type Name is product Discontinuation Indicator 6672A. The Cardinality is zero or one 6673A.

For the Package Quantity 6674A, the Category is Element 6675A, the Object Class is Business Transaction Document Product 6676A, the Property Qualifier is Package 6677A, the Property is Quantity 6678A, the Representation/Association is Quantity 6679A, the Type term is GDT 6680A, and the Type Name term is Quantity 6681A. The Cardinality is zero or one 6682A.

InternalID refers to a proprietary identifier for the product that is used when both sender and recipient can access shared master data (extended enterprise). StandardID refers to a standardized identifier for this product, whose identification scheme may be managed by an agency from the DE 3055 code list. BuyerID refers to an identifier that is used proprietarily by the BuyerParty for this product. SellerID refers to an identifier that is used proprietarily by the SellerParty for this product. ProductRecipientID refers to an identifier that is used proprietarily by the ProductRecipientParty for this product. VendorID refers to an identifier that is used proprietarily by the VendorParty for this product. ManufacturerID refers to an identifier that is used proprietarily by the ManufacturerParty for this product. BillToID refers to an identifier that is used proprietarily by the BillToParty for this product. BillFromID refers to an identifier that is used proprietarily by the BillFromParty for this product. BidderID refers to an identifier that is used proprietarily by the BidderParty for this product. Type Code refers to coded representation of the type of a product such as “1” for material and “2” for service product. Note refers to a product description. ChangeID refers to an unique identifier for a change to a product that has no effect on the properties that are relevant for the user. DiscontinuationIndicator indicates whether the offering of a product is to be discontinued, i.e., removed from the line. PackageQuantity refers to an amount per container (package amount). The amount per container may be necessary if different package quantities are relevant, but the same product ID can have different package quantities depending on the item. This information is also variable movement data at time of the message.

The different IDs of a CDT BusinessTransactionDocumentProduct 6600 may identify the same product. Identification of a product can take place by an InternalID when sender and recipient can access shared master data, by a StandardID when sender and recipient can manage standardized identifiers, or by a ProductPartyIDs when sender and recipient are interested in the ProductIDs assigned by the parties involved. Of all of the IDs available to the sender, IDs that the recipient is expected to understand may be used in a message.

(ff) BusinessTransactionDocumentProductCategory

A CDT BusinessTransactionDocumentProductCategory 6700 contains the information that is exchanged—for example, in accordance with common business understanding—in business documents about a product category. It identifies the product category using an internal ID, a standard ID, and IDs assigned by parties involved. A product category is a division of products according to objective criteria. An ID assigned by a party identifies in the name the role the assigning party plays in the business transaction. At present, roles are Buyer, Seller, ProductRecipient, Vendor, BillTo, BillFrom and Bidder. An example of CDT BusinessTransactionDocumentProductCategory 6700 is:

```
<BusinessTransactionDocumentProductCategory>
<StandardID schemeID=“UNSPSC” schemeVersionID=“11.0”
schemeAgencyID=“257”>4711</StandardID>
<BuyerID>1234</BuyerID>
<SellerID>2345</SellerID>
</BusinessTransactionDocumentProductCategory>.
```

In this example, SchemeID=“UNSPSC” indicates that it is the scheme “United Nations Standard Product and Services Classification Code”, SchemeVersionID=“11.0” indicates the version of the scheme, and schemeAgencyID=“257” corresponds to the Agency “ECCMA” (Electronic Commerce Code Management Association) according to the code list DE 3055.

The structure of CDT Business Transaction Document Product Category 6700 is depicted in FIG. 67. For the CDT Business Transaction Document Product Category 6700, the Object Class is Business Transaction Document Product Category 6702, and the Representation/Association term is Details 6704.

For the Internal ID 6706, the Category is Element 6708, the Object Class is Business Transaction Document Product Category 6710, the Property Qualifier term is Internal 6712, the Property is Identification 6714, the Representation/Association term is Identifier 6716, the Type term is CDT 6718, and the Type Name term is Product Category Internal ID 6720. The Cardinality is zero or one 6722.

For the Standard ID 6724, the Category is Element 6726, the Object Class is Business Transaction Document Product Category 6728, the Property Qualifier term is Standard 6730, the Property is Identification 6732, the Representation/Association term is Identifier 6734, the Type term is CDT 6736, and the Type Name is Product Category Standard ID 6738. The Cardinality is from zero to n 6740.

For the Buyer ID 6742, the Category is Element 6744, the Object Class is Business Transaction Document Product Category 6746, the Property Qualifier term is Buyer 6748, the Property is Identification 6750, the Representation/Association term is Identifier 6767, the Type term is CDT 6754, and the Type Name is Product Category Party ID 6756. The Cardinality is zero or one 6758.

For the Seller ID 6760, the Category is Element 6762, the Object Class is Business Transaction Document Product Category 6764, the Property Qualifier term is Seller 6766, the Property is Identification 6768, the Representation/Association term is Identifier 6770, the Type term is CDT 6772, and the Type Name term is Product Category Party ID 6774. The Cardinality is zero or one 6776.

For the Product Recipient ID 6778, the Category is Element 6780, the Object Class is Business Transaction Document Product Category 6782, the Property Qualifier term is Product Recipient 6784, the Property is Identification 6786, the Representation/Association term is Identifier 6788, the Type term is CDT 6790, and the Type Name term is Product Category Party ID 6792. The Cardinality is zero or one 6794.

For the Vendor ID 6796, the Category is Element 6798, the Object Class is Business Transaction Document Product Category 6799, the Property Qualifier term is Vendor 6701A, the Property is Identification 6702A, the Representation/Association term is Identifier 6703A, the Type term is CDT 6704A, and the Type Name term is Product Category Party ID 6705A. The Cardinality is zero or one 6706A.

For the Bill To ID 6707A, the Category is Element 6708A, the Object Class is Business Transaction Document Product Category 6709A, the Property Qualifier term is Bill To 6710A, the Property is Identification 6711A, the Representation/Association term is Identifier 6712A, the Type term is CDT 6713A, and the Type Name term is Product Category Party ID 6714A. The Cardinality is zero or one 6715A.

For the Bill From ID 6716A, the Category is Element 6717A, the Object Class is Business Transaction Document Product Category 6718A, the Property Qualifier term is Bill From 6719A, the Property is Identification 6720A, the Representation/Association term is Identifier 6721A, the Type term is CDT 6722A, and the Type Name term is Product Category Party ID 6723A. The Cardinality is zero or one 6724A.

For the Bidder ID 6725A, the Category is E 6726A, the Object Class is Business Transaction Document Product Category 6727A, the Property Qualifier term is Bidder From 6728A, the Property is Identification 6729A, the Representation/Association term is Identifier 6730A, the Type term is CDT 6731A, and the Type Name term is Product Category Party ID 6732A. The Cardinality is zero or one 6733A.

InternalID refers to a proprietary identifier for the product category that is used when both sender and recipient can access shared master data (extended enterprise). StandardID refers to a standardized identifier for this product category whose identification scheme may be managed by an agency from the DE 3055 code list. BuyerID refers to an identifier that is used proprietarily by the BuyerParty for this product category. SellerID refers to an identifier that is used proprietarily by the SellerParty for this product category. ProductRecipientID refers to an identifier that is used proprietarily by the ProductRecipientParty for this product category. VendorID refers to an identifier that is used proprietarily by the VendorParty for this product category. BillToID refers to an identifier that is used proprietarily by the BillToParty for this product category. BillFromID refers to an identifier that is used proprietarily by the BillFromParty for this product category. BidderID refers to an identifier that is used proprietarily by the BidderParty for this product category.

The different IDs of a CDT BusinessTransactionDocumentProductCategory 6700 may identify the same product category. A product category may be identified by the ProductCategoryInternalID when sender and recipient can access shared master data, by the ProductCategoryStandardID when sender and recipient can manage standardized identifiers, or by the ProductCategoryPartyIDs when sender or recipient are interested in the ProductCategoryIDs assigned by the parties involved. Of the IDs available to the sender, IDs that the recipient is expected to understand may be used in a message. At least one ID may be specified.

The CDT BusinessTransactionDocumentProductCategory 6700 is used in messages for internal and external communication to transmit required information about a product category.

(gg) BusinessTransactionDocumentPublicIndicator

A GDT BusinessTransactionDocumentPublicIndicator 6800 indicates whether or not a business document is public. "Public" in this case means that access to the business document is not restricted in any way and the document is published in a standard place. An example of GDT BusinessTransactionDocumentPublicIndicator 6800 is: <RFQPublicIndicator>true</RFQPublicIndicator>.

The structure of CDT Business Transaction Document Public Indicator 6800 is depicted in FIG. 68. For the CDT Business Transaction Document Public Indicator 6800, the Object Class is Business Transaction Document 6802, the Property is Public Indicator 6804, the Representation/Association term is Indicator 6806, the Type term is CCT 6808, and the Type Name term is Indicator.

GDT BusinessTransactionDocumentPublicIndicator 6800 may have the value true or false. True indicates that the business document is public. False indicates that the business document is not public.

The GDT BusinessTransactionDocumentPublicIndicator 6800 may be used in a bid invitation to indicate whether the bid invitation is open to the public or limited to an exclusive group of participants. It therefore indicates to potential participants whether the group of fellow bidders may be restricted in advance.

When the GDT is used, the name component "BusinessTransactionDocument" is replaced with an actual BusinessTransactionDocumentType, e.g., PurchaseOrder, RFQ, and the like.

(hh) BusinessTransactionDocumentReference

A GDT BusinessTransactionDocumentReference 6900 is a unique reference to other business documents that are important within the respective business process. Furthermore, it is also possible to have references to one or more line items within the same business document. An example of GDT BusinessTransactionDocumentReference 6900 is:

```
<PurchaseOrderReference>
    <ID>102321</ID>
    <ItemID>1</ItemID>
</PurchaseOrderReference >.
```

The structure of CDT Business Transaction Document Reference 6900 is depicted in FIG. 69. For the CDT Business Transaction Document Reference 6900, the Object Class is Business Transaction Document Reference 6902, and the Representation/Association term is Details 6904.

For the ID 6906, the Category is Element 6908, the Object Class is Business Transaction Document Reference 6910, the Property is Identification 6912, the Representation/Association term is Identifier 6914, the Type term is GDT 6916, and the Type Name is Business Transaction Document ID 6918. The Cardinality is zero or one 6920.

For the Item ID 6922, the Category is Element 6924, the Object Class is Business Transaction Document Reference 6926, the Property is Item Identification 6928, the Representation/Association term is Identifier 6930, the Type term is GDT 6932, and the Type Name is Business Transaction Document Item ID 6934. The Cardinality is from zero to n 6936.

The business process role of the issuer of the referenced document does not occur in the GDT; rather, it is defined explicitly in the name, such as PurchaseContractReference and SalesContractReference. "DocumentReference" can be used for referencing relevant documents within a business process. They are used as a reference asset for the respective business document. It is also possible to reference the individual items of the respective documents. For example, within the "Order" document, references can be created to the business documents "Quote," "Contract," "PurchaseOrder," as well as to their individual item lines.

"BusinessTransactionDocument" may be replaced by the description of each document in the XML instance, e.g., "PurchaseOrder" for a purchase order, "Delivery" for a delivery, and the like.

(ii) BusinessTransactionDocumentSettlementRelevanceIndicator

A GDT BusinessTransactionDocumentSettlementRelevanceIndicator 7000 indicates whether a given Business Transaction document or one of its items should be settled or not. Settlement incorporates both billing and invoice verification. An example of GDT BusinessTransactionDocumentSettlementRelevanceIndicator 7000 is: <BusinessTransactionDocumentSettlementRelevanceIndicator>true</BusinessTransactionDocumentSettlementRelevanceIndicator>.

The structure of GDT Business Transaction Document Settlement Relevance Indicator 7000 is depicted in FIG. 70. For the GDT Business Transaction Document Settlement Relevance Indicator 7000, the Object Class is Business Transaction Document 7002, the Property is Settlement Relevance Indicator 7004, the Representation/Association term is Indicator 7006, the Type term is CCT 7008, and the Type Name term is Indicator 7010.

The GDT BusinessTransactionDocumentSettlementRelevanceIndicator 7000 may have the value true or false. True indicates that the document or an item in the document should be settled. False indicates that the document or an item in the document should not be settled.

The GDT BusinessTransactionDocumentSettlementRelevanceIndicator 7000 may be applied to business documents that are created when products are ordered, goods are delivered, or services are provided, or that transmit information from such business documents. It can be applied to the entire document or to individual items.

If it is transmitted with the value "true" for an entire document or one of that document's items, the whole document or the marked item is settled. References are used to ensure that additional information is taken into account.

If the indicator is transmitted with the value "false" for an entire document or one of that document's items, then the whole document or the marked item is not settled. References can be used to ensure that transmitted information is also taken into account during settlement of documents/items that are transmitted with an indicator with value 'true'.

In one example, if an Order Management credit memo request prompts the creation of a credit memo in billing, then the credit memo request will be transferred with the indicator value set to "true."

In another example, if an Order Management standard order needs to be taken into account during the billing of the deliveries that resulted from it, then that standard order is transferred with the indicator set to "false," and the subsequent delivery document with the indicator set to "true." The references in the delivery document to the items in the standard order ensure that the standard order is then taken into account during settlement.

In an example, the BusinessTransactionDocumentSettlementRelevanceIndicator corresponds to "billing relevance" in R/3 or CRM, with which it is additionally possible, however, to control which quantities should be settled when.

(jj) BusinessTransactionDocumentShipFromLocation

A CDT BusinessTransactionDocumentShipFromLocation 7100 contains the information that is exchanged in business documents about a location relevant for business transactions and from which goods or services are shipped. The information identifies the location, its address, and, if necessary, a different loading location. The identification may be a company-internal ID, a standardized ID, or one or more partner-specific IDs. A location is a logical or a physical place. An ID assigned by a party identifies in the name the role the assigning party occupies in the business transaction. Roles may include Buyer, Seller, ProductRecipient, and Vendor. An example of CDT BusinessTransactionDocumentShipFromLocation 7100 is:

```
<ReplenishmentOrder>
    . . .
    <ShipFromLocation>
        <StandardID schemeAgencyID="016">4711</StandardID>
        <BuyerID>9873</BuyerID>
        <SellerID>487847</SellerID>
        <Address> . . . </Address>
        <LoadingLocation> . . . </LoadingLocation>
    <ShipFromLocation>
<ReplenishmentOrder>.
```

The structure of CDT Business Transaction Document Ship From Location 7100 is depicted in FIG. 71. For the CDT Business Transaction Document Ship From Location 7100, Object Class is Business Transaction Document Ship From Location 7102, and the Representation/Association term is Details 7104.

For the Internal ID 7106, the Category is Element 7108, the Object Class is Business Transaction Document Ship From Location 7110, the Property Qualifier term is Internal 7112, the Property is Identification 7114, the Representation/Association term is Identifier 7116, the Type term is CDT 7118, and the Type Name term is Location Internal ID 7120. The Cardinality is zero or one 7122.

For the Standard ID 7124, the Category is Element 7126, the Object Class is Business Transaction Document Ship From Location 7128, the Property Qualifier term is Standard 7130, the Property is Identification 7132, the Representation/Association term is Identifier is 7134, the Type term is 7136, and the Type Name term is Location Standard ID 7138. The Cardinality is zero or one 7140.

For the Buyer ID 7142, the Category is Element 7144, the Object Class is Business Transaction Document Ship From Location 7146, the Property Qualifier term is Buyer 7148, the Property is Identification 7150, the Representation/Association term is Identifier 7152, the Type term is CDT 7154, and the Type Name term is Location Party ID 7156. The Cardinality is zero or one 7158.

For the Seller ID 7160, the Category is Element 7162, the Object Class is Business Transaction Document Ship From Location 7164, the Property Qualifier term is Seller 7166, the Property is Identification 7168, the Representation/Association term is Identifier 7170, the Type term is CDT 7172, and the Type Name term is Location Party ID 7174. The Cardinality is zero or one 7176.

For the Product Recipient ID 7178, the Category is Element 7180, the Object Class is Business Transaction Document Ship From Location 7182, the Property Qualifier term is Product Recipient 7184, the Property is Identification 7186, the Representation/Association term is Identifier 7188, the Type term is CDT 7190, and the Type Name term is Location Party ID 7192. The Cardinality is zero or one 7194.

For the Vendor ID 7196, the Category is Element 7198, the Object Class is Business Transaction Document Ship From Location 7199, the Property Qualifier term is Vendor 7101A, the Property is Identification 7102A, the Representation/Association term is Identifier 7103A, the Type term is CDT 7104A, the and Type Name term is Location Party ID 7105A. The Cardinality is zero or one 7106A.

For the Address 7107A, the Category is Element 7108A, the Object Class is Business Transaction Document Ship From Location 7109A, the Property is Address 7110A, the Representation/Association term is Address 7111A, the Type term is GDT 7112A, and the Type Name term is Address 7113A. The Cardinality is zero or one 7114A.

For the Note 7115A, the Category is Element 7116A, the Object Class is Business Transaction Document Ship From Location 7117A, the Property is Note 7118A, the Representation/Association term is Text 7119A, the Type term is GDT 7120A, and the Type Name term is Note 7121A. The Cardinality is zero or one 7122.

For the Loading Location 7123A, the Category is Element 7124A, the Object Class is Business Transaction Document Ship From Location 7125A, the Property is Loading Location 7126A, the Representation/Association term Business Transaction Document Location 7127A, the Type term is GDT 7128A, and the Type Name term is Business Transaction Document Location 7129A. The Cardinality is zero or one 7130A.

InternalID refers to a proprietary identifier that is used when both sender and recipient can access shared master data (extended enterprise). StandardID refers to a standardized identifier for this location, whose identification scheme may be managed by an agency from the DE 3055 code list. BuyerID refers to an identifier that is used proprietarily by the BuyerParty for this location. SellerID refers to an identifier that is used proprietarily by the SellerParty for this location. ProductRecipientID refers to an identifier that is used proprietarily by the ProductRecipientParty for this location. VendorID refers to an identifier that is used proprietarily by the VendorParty for this location. Address refers to an address that describes the location by indicating postal address, geographic coordinates, and the like. Note refers to an additional information such as directions. LoadingLocation refers to one loading location. The loading locations is a location itself and can be identified proprietarily or partner-specifically.

When defining addresses, organization addresses are supported. The different IDs of a BusinessTransactionDocumentShipFromLocation may identify the same location. A location may be identified by the InternalID when sender and recipient can access shared master data, by the StandardID when sender and recipient can manage standardized identifiers or by the PartyIDs when sender and recipient are interested in the PartyIDs assigned by the parties involved. Of the IDs available to the sender, those that the recipient is expected to understand may be used.

(kk) BusinessTransactionDocumentShipToLocation

A CDT BusinessTransactionDocumentShipToLocation 7200 contains the information that is exchanged in business documents about a location relevant for business transactions and to which goods or services are shipped. This information identifies the location, its address and, if necessary, a different unloading location. The identification may be a company-internal ID, a standardized ID, or one or many partner-specific IDs. A location is a logical or a physical place. An ID assigned by a party identifies in the name the role the assigning party plays in the business transaction. Roles include Buyer, Seller, Product-Recipient, and Vendor. An example of CDT BusinessTransactionDocumentShipToLocation 7200 is:

```
<ReplenishmentOrder>
        . . .
        <ShipToLocation>
                <StandardID schemeAgencyID="016">4711</StandardID>
                <SellerID>487847</SellerID>
                <Address> . . . </Address>
                <UnloadingLocation> . . . </UnloadingLocation>
        </ShipToLocation>
</ReplenishmentOrder>.
```

The structure of CDT Business Transaction Document Ship To Location 7200 is depicted in FIG. 72. For the CDT Business Transaction Document Ship To Location 7200, Object Class is Business Transaction Document Ship To Location 7202, and the Representation/Association term is Details 7204.

For the CDT Internal ID 7206, the Category is Element 7208, the Object Class is Business Transaction Document Ship To Location 7210, the Property Qualifier term is Internal 7212, the Property is Identification 7214, the Representation/Association term is Identifier 7216, the Type term is CDT 7218, and the Type Name term is Location Internal ID 7220. The Cardinality is zero or one 7222.

For the CDT Standard ID 7224, the Category is Element 7226, the Object Class is Business Transaction Document Ship To Location 7228, the Property Qualifier term is Standard 7230, the Property is Identification 7232, the Representation/Association term is Identifier 7234, the Type term is CDT 7236, the Type Name term is Location Standard ID 7238, and the Cardinality is zero or one 7240.

For the Buyer ID 7242, the Category is E 7244, the Object Class is Business Transaction Document Ship To Location 7246, the Property Qualifier term is Buyer 7248, the Property is Identification 7250, the Representation/Association term is Identifier 7252, the Type term is CDT 7254, the Type Name term is Location Party ID 7256, and the Cardinality is zero or one 7258.

For the Seller ID 7260, the Category is Element 7262, the Object Class is Business Transaction Document Ship To Location 7264, the Property Qualifier term is Seller 7266, the Property is Identification 7268, the Representation/Association term is Identifier 7270, the Type term is CDT 7272, the Type Name term is Location Party ID 7274, and the Cardinality is zero or one 7276.

For the Product Recipient ID 7278, the Category is Element 7280, the Object Class is Business Transaction Document Ship To Location 7282, the Property Qualifier term is Product Recipient 7284, the Property is Identification 7286, the Representation/Association term is Identifier 7288, the Type term is CDT 7290, the Type Name term is Location Party ID 7292, and the Cardinality is zero or one 7294.

For the Vendor ID 7296, the Category is Element 7298, the Object Class is Business Transaction Document Ship To Location 7299, the Property Qualifier term is Vendor 7201A, the Property is Identification 7201A, the Representation/Association term is Identifier 7202, the Type term is CDT 7203A, the Type Name term is Location Party ID 7204, and the Cardinality is zero or one 7205A.

For the Address 7206A, the Category is E 7207A, the Object Class is Business Transaction Document Ship To Location 7208A, the Property is Address 7209A, the Representation/Association term is Address 7210A, the Type term is GDT 7211, the Type Name term is Address 7212A, and the Cardinality is zero or one 7213A.

For the Note 7214A, the Category is Element 7215A, the Object Class is Business Transaction Document Ship To Location 7216, the Property is Note 7217A, the Representation/Association term is 7218A, the Type term is GDT 7219A, the Type Name term is Note 7220A, and the Cardinality is zero or one 7221A.

For the Unloading Location 7222A, the Category is Element 7223A, the Object Class is Business Transaction Document Ship To Location E 7224A, the Property is Unloading Location 7225A, the Representation/Association term is Business Transaction Document Location 7226A, the Type term is GDT 7227A, the Type Name term is Business Transaction Document Location 7228A, and the Cardinality is zero or one 7229A.

InternalID refers to a proprietary identifier that is used when both sender and recipient can access shared master data. StandardID refers to a standardized identifier for this location, whose identification scheme may be managed by an agency from the DE 3055 code list. BuyerID refers to an identifier that is used proprietarily by the BuyerParty for this location. SellerID refers to an iIdentifier that is used proprietarily by the SellerParty for this location. ProductRecipientID refers to an identifier that is used proprietarily by the ProductRecipientParty for this location. VendorID refers to an identifier that is used proprietarily by the VendorParty for this location. Address refers to an address that describes the location by indicating postal address, geographic coordinates, and the like. Note refers to an additional information such as directions. UnLoadingLocation refers to an unloading location. The unloading location is a location itself and therefore can be identified proprietarily or partner-specifically.

When defining addresses, organization addresses may be supported. The different IDs of a CDT BusinessTransactionDocumentShipToLocation 7200 may identify the same location. A location may be identified by the InternalID when sender and recipient can access shared master data, by the StandardID when sender and recipient can manage standardized identifiers, or by the PartyIDs when sender and recipient are interested in the IDs assigned by the parties involved. Of the IDs available to the sender, those that the recipient is expected to understand may be used.

(ll) BusinessTransactionDocumentTransshipmentLocation

A CDT BusinessTransactionDocumentTransshipmentLocation 7300 contains the information that is exchanged in business documents about a relevant location for business transactions where goods are transshipped (unloaded and reloaded). This information identifies the location, its address, a loading location, and an unloading location. The identification may be a company-internal ID, a standardized ID, or one or more partner-specific IDs. A location is a logical or a physical place. An ID assigned by a party identifies in the name the role the assigning party plays in the business transaction. Roles include Buyer, Seller, ProductRecipient, and Vendor. An example of CDT BusinessTransactionDocumentTransshipmentLocation 7300 is:

```
<ReplenishmentOrder>
    . . .
    <TransshipmentLocation>
        <StandardID schemeAgencyID="016">4711</StandardID>
        <Address> . . .</Address>
        <LoadingLocation> . . . </LoadingLocation>
        <UnloadingLocation> . . . </UnloadingLocation>
    <TransshipmentLocation>
</ReplenishmentOrder>.
```

The structure of CDT Business Transaction Document Transshipment Location 7300 is depicted in FIG. 73. For the CDT Object Class is 7302, the Representation/Association term is Details 7304.

For the Internal ID 7306, the Category is Element 7308, the Object Class is Business Transaction Document Transship Location 7310, the Property Qualifier term is Internal 7312, the Property is Identification 7314, the Representation/Association term is Identifier 7316, the Type term is CDT 7318, the Type Name term is Location Internal ID 7320, and the Cardinality is zero or one 7322.

For the Standard ID 7324, the Category is Element 7326, the Object Class is Business Transaction Document Transship Location 7328, the Property Qualifier term is Internal 7328, the Property is Identification 7330, the Representation/Association term is Identifier 7332, the Type term is CDT 7334, the Type Name term is Location Internal ID 7336, and the Cardinality is zero or one 7338.

For the Buyer 7340, the Category is Element 7342, the Object Class is Business Transaction Document Transship Location 7344, the Property Qualifier term is Buyer 7346, the Property is Identification 7348, the Representation/Association term is Identifier 7350, the Type term is CDT 7352, the Type Name term is Location Party ID 7354, and the Cardinality is zero or one 7356.

For the Seller ID 7358, the Category is Element 7360, the Object Class is Business Transaction Document Transship Location 7362, the Property Qualifier term is Seller 7364, the Property is Identification 7366, the Representation/Association term is Identifier 7368, the Type term is CDT 7370, the Type Name term is Location Party ID 7372, and the Cardinality is zero or one 7374.

For the Product Recipient 7376, the Category is Element 7378, the Object Class is Business Transaction Document Transship Location 7380, the Property Qualifier term is Product Recipient 7382, the Property is Identification 7384, the Representation/Association term is Identifier 7386, the Type term is CDT 7388, the Type Name term is Location Party ID 7390, and the Cardinality is zero or one 7392.

For the Vendor ID 7394, the Category is Element 7396, the Object Class is Business Transaction Document Transship Location 7398, the Property Qualifier term is Vendor 7399, the Property is Identification 7301A, the Representation/Association term is Identifier 7302A, the Type term is CDT 7303A, the Type Name term is Location Party ID 7304A, and the Cardinality is zero or one 7305A.

For the Address 7306A, the Category is Element 7307A, the Object Class is Business Transaction Document Transship Location 7308A, the Property is 7309A, the Representation/Association term is Address 7310A, the Type term is GDT 7311A, the Type Name term is Address 7312A, and the Cardinality is zero or one 7313A.

For the Note 7314A, the Category is Element 7315A, the Object Class is Business Transaction Document Transship Location 7316A, the Property is Note 7317A, the Representation/Association term is Text 7318A, the Type term is GDT 7319A, the Type Name term is Note 7320A, and the Cardinality is zero or one 7321A.

For the Loading Location 7322A, the Category is Element 7323A, the Object Class is Business Transaction Document Transship Location 7324A, the Property is Loading Location 7325A, the Representation/Association term is Business Transaction Document Location 7326A, the Type term is GDT 7327A, the Type Name term is Business Transaction Document Location 7328A, and the Cardinality is zero or one 7329A.

For the Unloading Location 7330A, the Category is Element 7331A, the Object Class is Business Transaction Document Transshipment Location 7332A, the Property is Unloading Location 7333A, the Representation/Association term is Business Transaction Document Location 7334A, the Type is GDT 7335A, the Type Name is Business Transaction Document Location 7336A, and the Cardinality is zero or one 7337A.

InternalID refers to a proprietary identifier that is used when both sender and recipient can access shared master data. StandardID refers to a standardized identifier for this location, whose identification scheme may be managed by an agency from the DE 3055 code list. BuyerID refers to an identifier that is used proprietarily by the BuyerParty for this location. SellerID refers to an iIdentifier that is used proprietarily by the SellerParty for this location. ProductRecipientID refers to an identifier that is used proprietarily by the ProductRecipientParty for this location. VendorID refers to an identifier that is used proprietarily by the VendorParty for this location. Address refers to an address that describes the location by indicating postal address, geographic coordinates, and the like. Note refers to an additional information such as directions. LoadingLocation refers to one loading location, which is a location itself and can be identified proprietarily or partner-specifically. UnLoadingLocation refers to an unloading location, which is also a location itself and therefore can be identified proprietarily or partner-specifically.

When defining addresses, organization addresses may be supported. The different IDs of a CDT BusinessTransactionDocumentTransshipmentLocation 7300 may identify the same location. A location may be identified by the InternalID when sender and recipient can access shared master data, by the StandardID when sender and recipient can manage standardized identifiers, or by the PartyIDs when sender and recipient are interested in the IDs assigned by the parties involved. Of the IDs available to the sender, those that the recipient is expected to understand may be used.

(mm) BusinessTransactionDocumentTypeCode

The GDT BusinessTransactionDocumentTypeCode 7400 is a coded representation of the type of a document that occurs in business transactions. The document type describes the nature of similar documents and defines the basic features of the documents of this type. An example of GDT BusinessTransactionDocumentTypeCode 7400 is: <BusinessTransactionDocumentTypeCode>001</BusinessTransactionDocumentTypeCode The structure of GDT Business Transaction Document Type Code 7400 is depicted in FIG. 74. For the GDT Business Transaction Document Type Code 7400, the Object Class is Business Transaction Document 7402, the Property is Type 7404, the Representation/Association term is Code 7406, the Type term is CCT 7408, the Type Name term is Code 7410, the Length is three 7412. The GDT Business Transaction Document Type Code 7400 may be restricted 7414.

GDT BusinessTransactionDocumentTypeCode 7400 may have a value from 001 and 005. 001 indicates a purchase order. In an example, a PurchaseOrder is a request from a buying party to a seller to provide or deliver certain quantities of products on one or several dates. For the buying party, the commitments resulting from the request are legally binding for a certain period. On acceptance by the seller, they are binding for both parties. 002 indicates a sales contract, which is a framework agreement with a customer concerning the supply of products in a certain period. 003 indicates a Quote, which is an offer from a selling party to a buying party to supply or deliver products at predefined conditions. 004 indicates an invoice, which may be a legally binding notification concerning claims or liabilities for delivered products and services rendered. 005 indicates a credit memo, which is a notification to a beneficiary regarding an invoice that reduces the balance of the payment or liabilities.

The GDT BusinessTransactionDocumentTypeCode 7400 is used, for example, to categorize business transaction documents into messages if the document type is not already apparent based on the message. Applications provide "service-driven" interfaces—the messages of these interfaces can be filled from various applications from different underlying documents. However, the "service" application has to know the type of business transaction document in question such as the document type from which the message arose. For example DeliveryExecutionRequest refers to a consistent request to Logistics to prepare and execute goods receipts or deliveries, BillingDueNotification refers to a creation of the billing due list based on data from various applications and business documents, and PaymentDueNotification refers to a creation of payment dues based on data from various applications and business documents.

Messages correspond to business documents. Such a business document contains a business document object. A business document object may be a Business Transaction Document or a Master Data Document. The GDT BusinessTransactionDocumentTypeCode 7400 categorizes the Business Transaction Document.

In an example, in R/3, the BusinessTransactionDocumentTypeCode corresponds in principle, to VBTYP in Sales or BSTYP in Purchasing or MRM_REFERENZBELEG in Invoice Verification, and the like. The Code Names defined in the code list may also be used in the tag names of the XML instance for references to Business Transaction Documents.

(nn) BusinessTransactionExecutionStatusCode

The GDT BusinessTransactionExecutionStatusCode 7500 is an encoded representation of the status of the execution of a business transaction. An example of GDT BusinessTransactionExecutionStatusCode 7500 is: <GoodsIssueExecutionStatusCode>3</GoodsIssueExecutionStatusCode>.

The structure of GDT Business Transaction Execution Status Code 7500 is depicted in FIG. 75. For the GDT Business Transaction Execution Status Code 7500, the Object Class is Business Transaction 7502, the Property is Execution Status Code 7504, the Representation/Association term is Code 7506, the Type term is CCT 7508, the Type Name term is Code 7510, and the Length is one 7512. The GDT Business Transaction Execution Status Code 7500 may be restricted 7514.

GDT BusinessTransactionExecutionStatusCode 7500 may have a proprietary code of 1, 2, or 3. 1 indicates that the execution of a business transaction has not yet started, 2 indicates that a business transaction is currently being executed, and 3 indicates that the execution of a business transaction has been completed.

When using the GDT BusinessTransactionExecutionStatusCode 7500 for a certain business transaction, the part of the name "BusinessTransaction" of the GDT is replaced by the English description of the business transaction. In a variation, business transactions from the code list of the GDT BusinessTransactionTypeCode 7500 are allowed. For example, the execution status of a "GoodsIssue" is specified by the GoodsIssueExecutionStatusCode and the execution status of a "GoodsPutaway" is specified by the GoodsPutawayExecutionStatusCode.

The execution status of a business transaction in Sales (Sales and Delivery) may be represented in R/3 by the data element STATV.

GDT BusinessTransactionBlockedIndicator 5300 indicates whether or not the execution of a business transaction is blocked. While the GDT BusinessTransactionExecutionStatusCode 7500 indicates the current execution status of a business transaction, the GDT BusinessTransactionBlockedIndicator 5300 shows whether or not the execution of a business transaction should start or be continued. For example, when a delivery is requested, it can also be requested that the delivery not be executed.

GDT BusinessTransactionCompletedIndicator 5400 indicates whether or not the execution of a business transaction has been completed. This indicator specifies whether or not a business transaction is regarded as completed, regardless of its execution status. For example, a delivery that is being executed can be considered completed, even though the entire quantity has not been delivered.

(oo) BusinessTransactionPriorityCode

The GDT BusinessTransactionPriorityCode 7600 is a coded representation of the ranking of a business transaction in terms of its urgency. The assignment of a priority always creates a sequence such that a unique predecessor-successor relationship exists between the individual values of a priority and they can be sorted uniquely. An example of GDT BusinessTransactionPriorityCode 7600 is: <PriorityCode>1</PriorityCode>.

The structure of GDT Business Transaction Priority Code 7600 is depicted in FIG. 76. For the GDT Business Transaction Priority Code 7600, the Object Class is Business Transaction 7602, the Property is Priority Code 7604, the Representation/Association term is Code 7606, the Type term is CCT 7608, the Type Name term is Code 7608, and the Length is one 7610. The GDT Business Transaction Priority Code 7600 may be restricted 7612.

For example, business transactions that are assigned a higher priority are more important, are required more urgent or have to be carried out first and are therefore considered first or are given preference during selection and processing.

The codes that may be used for GDT BusinessTransactionPriorityCode 7600 are 1, 2, 3, and 7. 1 means the transaction is to be done immediately, 2 means it is to be performed before any non-urgent task, 3 means it is to be done as routine work, and 7 means it is a low priority. The sequence of urgency is: 1, 2, 3, 7.

Priorities are assigned in nearly all business areas such as to specify delivery priorities, the urgency of an e-mail, posting priorities, deduction priorities, or urgency of a problem. For example, the delivery of product ABC is of particular importance to customer 4711. Therefore orders/order items containing this product are treated with preference and receive the delivery priority "immediate."

Since information describing priorities can be communicated in many different areas, the definition is kept general. In particular, in certain circumstances, the context determines which standard and therefore with which code list the "PriorityCode" should be communicated (e.g., "very high," "high," "medium," "low," or "A," . . . , "Z"). In a variation, proprietary code lists are used that were agreed upon by the communication partners individually.

For example, in the area of R/3 shipping, a delivery priority of the type NUMC, length 2.0, is used with codes 01 (High), 02 (Normal) and 03 (Low).

"BusinessTransaction" is replaced in the XML instance by the description of the respective business transaction, e.g., "delivery" (see Use for BusinessTransactionPriorityCodeDelivery in DeliveryTerms).

(pp) BusinessTransactionTypeCode

The GDT BusinessTransactionTypeCode 7700 is a coded representation of the type of a business transaction. A business transaction is a self-sufficient, logical commercial transaction that results in a value change, a quantity change, or an event. An example of GDT BusinessTransactionTypeCode 7700 is: <BusinessTransactionTypeCode>0001</BusinessTransactionTypeCode>.

The structure of BusinessTransactionTypeCode is depicted in FIG. 77. For the GDT Business Transaction Execution Status Code 7700, the Object Class is Business Transaction 7702, the Property is Execution Status Code 7704, the Representation/Association term is Code 7706, the Type term is CCT 7708, the Type Name term is Code 7710, and the Length is one 7712. The GDT Business Transaction Execution Status Code 6000 may be restricted 7714 GDT.

GDT BusinessTransactionTypeCode 7700 is based on a proprietary code list. The data type is used for internal business processes or A2A interfaces. One possible value for BusinessTransactionTypeCode is 0001, which refers to Service Entry. A service entry is an entry for the type and scope of services provided by a seller. The entry is the basis for creating an invoice. A ServiceAcknowledgementRequest message can be sent based on the entry.

A GDT BusinessTransactionTypeCode 7700 may be used to provide accounting with information about the type of a business transaction, the quantities, amounts, and other data from this business transaction. In accounting, the business transaction type is a central control element for the document structure, account determination, and the like.

For a business application area (e.g., accounting), the GDT BusinessTransactionTypeCodes 7700 have the same level of detail. This means that there may be no refinement or grouping relationships between the codes of an area. The codes to be used from the code list in the interface are defined for each interface that uses the GDT BusinessTransactionTypeCode 7700. For every interface that uses the GDT BusinessTransactionTypeCode 7700 the admissible codes may be specified in the interface documentation.

Business transactions create or change BusinessTransactionDocuments. The data types GDT BusinessTransactionTypeCode 7700 and BusinessTransactionDocumentTypeCode are therefore closely related. Since complex business transactions (e.g., confirmation of a production order) create or change several business documents, however, in a variation, it may not be possible to create a simple (1:1 or 1:n) relationship between the code lists of these data types.

(qq) CashDiscount

A GDT CashDiscount 7800 is an agreement on the percentage of cash discount that is granted during a sales transaction when payment takes place within a certain number of days after the baseline date for payment has passed. An example of GDT CashDiscount 7800 is:

```
<MaximumCashDiscount>
    <DaysValue>15</DaysValue>
    <Percent>1.75</Percent>
</MaximumCashDiscount>.
```

The structure of GTD CashDiscount is depicted in FIG. 78. For the GDT Cash Discount term 7802 and the Representation/Association term is Code 7804.

GDT CashDiscount 7800 includes elements DaysValue and Percent from the core component type 'numeric'. DaysValue is the number of days after the baseline payment date has passed. The number of days can be a whole number from 1 to 999.

For the Days Value Code 7806, the Category is Element, the Object Class is Cash Discount 7810, the Property is Days 6004, the Representation/Association term is Code 7814, the Type term is GDT 7816, the Type Name term is Code 7818, and the Length is from one to three 7820. The Cardinality is zero or one 7822.

Percent is the cash discount percentage rate. It is a decimal number with a maximum of two places before the decimal point and three places after the decimal point. For the Percent Code 7806, the Category is Element, the Object Class is Cash Discount 7828, the Property is Percent 6004, the Representation/Association term is Percent 783214, the Type term is GDT 783416, the Type Name term is Percent 7836, and the Length is maximum five digits with three places after the decimal point 7838. The Cardinality is zero or one 7840.

GDT CashDiscount 7800 is used in the Global Data Type CashDiscountTerms to define cash discount levels.

(rr) CashDiscountTerms

GDT CashDiscountTerms 7900 are payment conditions for goods and services. An example of GDT CashDiscountTerms 7900 is:

```
<CashDiscountTerms>
    <MaximumCashDiscount>
        <DaysValue>15</DaysValue>
        <Percent>1.75</Percent>
    </MaximumCashDiscount>
    <NormalCashDiscount>
        <DaysValue>30</DaysValue>
        <Percent>0.50</Percent>
    </NormalCashDiscount>
    <FullPaymentDueDaysValue>40</FullPaymentDueDaysValue>
</ CashDiscountTerms >.
```

The structure of GDT CashDiscountTerms 7900 is depicted in FIG. 79. The GDT Payment Baseline Date Terms 7900 includes elements scheme 7908, the Cash Discount term is 7910, the Property Payment Baseline Date term is 7912, the Representation/Association Date term is 7914, the Type term is GDT 7916, the Type Name term is Date 7918. The Cardinality is zero or one 7920.

For the GDT Maximum Cash Discount term is 7922 and includes element scheme 7924, the Cash Discount term is 7926, the Property Maximum Cash Discount term is 7928, the Representation/Association Details term is 7930, the Type term is GDT 7932, the Type Name term is Cash Discount 7934. The Cardinality is zero or one 7936.

For the GDT Maximum Cash Discount term is 7938 and includes element scheme 7940, the Cash Discount term is 7942, the Property Normal Cash Discount term is 7944, the Representation/Association Details term is 7946, the Type term is GDT 7948, the Type Name term is Cash Discount 7950. The Cardinality is zero or one 7952.

For the GDT Full Payment Due Days Value term is 7954 and includes element scheme 7956, the Cash Discount term is 7960, the Property Full Payment Due Days term is 7928, the Representation/Association Value term is 7964, the Type term is GDT 7966, the Type Name term is Integer Value 7934, the Length is from one and 7970. The Cardinality is zero or one 7972.

PaymentBaselineDate refers to a payment baseline date such as the date from which the payment periods run. MaximumCashDiscount refers to the maximum cash discount for rapid payments. NormalCashDiscount refers to the normal cash discount. FullPaymentDueDaysValue refers to the number of days after the payment baseline date within which the full payment (e.g., of an invoice) should take place.

MaximumCashDiscount may be present when NormalCashDiscount is offered, as well. Therefore, NormalCashDiscount may be used if a cash discount percentage rate is specified. If both MaximumCashDiscount and NormalCashDiscount are specified, MaximumCashDiscount.DaysValue may be <NormalCashDiscount.DaysValue, and MaximumCashDiscount.Percent may be > NormalCashDiscount.Percent. MaximumCashDiscount.DaysValue<=NormalCashDiscount.DaysValue<=FullPaymentDueDaysValue may be true. The number of days in FullPaymentDueDaysValue can be a whole number from 1 to 999. PaymentBaselineDate is specified when conditions for a concrete payment are transmitted, e.g., for an invoice. This element does not apply when the payment baseline date has not yet been set such as in the case of an order.

GDT CashDiscountTerms 7900 are used to establish payment conditions, e.g., for an order or when creating an invoice for goods and services.

(ss) CatalogueID

A GDT CatalogueID 8000 is a unique identifier for a catalog. A catalog is a systematically arranged directory of objects of a particular type that are identified uniquely within the catalog. An example of GDT CatalogueID 8000 is: <CatalogueID schemeID='ProductCatalogues' schemeAgencyID='123456789' schemeAgencySchemeAgencyID='16'>MyProducts2002</CatalogueID>.

The structure of GDT CatalogueID 8000 is depicted in FIG. 80. For the GDT CatalogueID 8000 the Object Class Catalog term is 8002, the Property Identification term is 8004, the Representation/Association Identifier term is 8006, the Type term is CCT 8008, the Type Name term is Identifier 8010, and the Length is from one to forty 8012. The CatalogueID may be restricted 8014.

GDT schemeID 8016 includes attribute scheme 8018, the Object Class Catalog term is 8020, the Property Identification term is 8022, the Representation/Association Identifier term is 8024, the Type term is xsd 8026, the Type Name term is Token 8028, the Length is from one to 60 8030. The Cardinality is zero or one 8032.

GDT schemeAgencyID 8034 includes attribute scheme 8036, the Object Class IndentificationSchemeAgency term is 8038, the Property Identification term is 8040, the Representation/Association Identifier term is 8042, the Type term is xsd 8044, the Type Name term is Token 8046, the Length is from 1 to 60 and 8048. The Cardinality is zero or one 8050.

GDT schemeAgencySchemeID 8052 includes attribute scheme 8054, the Object Class IdentificationSchemeAgency term is 8056, the Property Scheme term is 8058, the Representation/Association Identifier term is 8060, the Type term is xsd 8062, the Type Name term is Token 8064, the Length is from 1 to 60 and 8066. The Cardinality is zero or one 8068.

GDT schemeAgencySchemeAgencyID 8070 includes attribute scheme 8072, the Object Class Identification-SchemeAgency term is 8074, the Property SchemeAgency term is 8076, the Representation/Association Identifier term is 8078, the Type term is xsd 8080, the Type Name term is Token 8082, the Length is three 8084. The Cardinality is zero or one 8086.

GDT CatalogueID 8000 is from the core component type (CCT) Identifier. CatalogueID is used to identify a catalog uniquely. Examples of typical catalogs are electronic product or vendor catalogs. The attributes schemeId, schemeAgencyID, schemeAgencySchemeID, and schemeAgency-SchemeAgencyID are used in the same way as planned for the CCT Identifier, in order to define the context for which a CatalogueID is guaranteed to be unique.

(tt) CatalogueItemID

A GDT CatalogueItemID 8100 is the unique identifier for an object within a catalog and is unique within the context of the catalog. An example of GDT CatalogueItemID 8100 is: <CatalogueItemID>1AXX3332-0</CatalogueItemID>.

The structure of GDT CatalogueItemID 8100 is depicted in FIG. 81. For the GDT CatalogueItemId 8160, the Object Class CatalogueItem term is 8102, the Property Identification term is 8104, the Representation/Association Identifier term is 8106, the Type term is CCT 8108, the Type Name term is Identifier 8110, and the Length is from one to forty 8112. The GDT CatalogueItemID 8100 is 8114.

GDT CatalogueItemID 8100 is from the CCT Identifier. CatalogueItemID is a character string that has a maximum length of 40 characters and that conforms to the rules defined for xsd: token. CatalogueItemID is used to identify an object uniquely within a catalog.

(uu) CatalogueReference

A GDT CatalogueReference 8200 is a unique reference to a catalog or to an object within a catalog. A catalog is a list of objects of a particular type that are uniquely identified within the list and that have access functions for this list. An example of GDT CatalogueReference 8200 is:

```
<CatalogueReference>
        <CatalogueID schemeID='ProductCatalogues'
schemeAgencyID='123456789'
schemeAgencySchemeAgencyID='16'>MyProducts2002</CatalogueID>
    <CatalogueItemID>1AXX3332-0</CatalogueItemID>
    </CatalogueReference >.
```

The structure of GDT CatalogueReference 8200 is depicted in FIG. 82. For the GDT CatalogueReference 8200 the Object Class is CatalogueReference 8202 and the Representation/Association is Details 8204.

For ID 8206, the Category is Element 8208, the Object Class is CatalogueReference 8210, the Property Identification term is 8212, the Representation/Association term is Identifier 8214, the Type term is GDT 8216, the Type Name term is CatalogueID 8218, and the Cardinality is one 8220.

For ItemID 8222, the Category is Element 8224, the Object Class CatalogueReference term is 8226, the Property Item term is Identification 8228, the Representation/Association Identifier term is 8230, the Type term is GDT 8232, the Type Name term is CatalogueItemID 8234, and the Cardinality is from 0 to n 8236.

GDT CatalogueReference 8200 can be used to reference a catalog or an item within a catalog. For example, the "Order" document can contain references to a vendor's product catalog.

(vv) CatalogueSchemaID

A GDT CatalogueSchemaID 8300 is a unique identifier for a catalog schema. A catalog schema defines the structure of a catalog by means of sections which group together similar catalog objects, relationships between sections, and attributes which can be assigned to all the catalog items or to catalog items within a particular section. An example of GDT CatalogueSchemaID 8300 is: <CatalogueSchemaID>UNSPC</CatalogueSchemaID>.

The structure of GDT CatalogueSchemaID 8300 is depicted in FIG. 83. For the GDT CatalogueSchemeID 8300, the Object Class Catalogue Schema term is 8302, the Property is Identification 8304, the Representation/Association term is Identifier 8306, the Type term is CCT 8308, the Type Name term is Identifier 8310, the Length is from one to 40 8312, and the Cardinality is unrestricted 8314.

Characters used for GDT CatalogueSchemaID 8300 may include upper and lowercase characters from A to Z (without German umlauts), digits from 0 to 9, – (minus sign), _ (underscore), /, \, and . (period). No distinction is made between upper and lowercase characters.

GDT CatalogueSchemaID 8300 is used to identify a catalog schema uniquely within the catalog.

(ww) CatalogueSchemaTypeCode

The GDT CatalogueSchemaTypeCode 8400 is a coded representation of the type of a catalog schema. An example of GDT CatalogueSchemaTypeCode 8400 is: <CatalogueSchemaTypeCode>01</CatalogueSchemaTypeCode>.

The structure of GDT CatalogueSchemaTypeCode 8400 is depicted in FIG. 84. For the GDT CatalogueSchemeID 8400, the Object Class Catalogue Schema term is 8402, the Property is Type 8404, the Representation/Association term is Code 8406, the Type term is CCT 8408, the Type Name term is Code 8410, and the Length is two 8412. The GDT CatalogueSchemaTypeCode 8400 may be restricted 8414.

Valid values for GDT CatalogueSchemaTypeCode 8400 are 01 and 02. 01 is a neutral schema, which is a schema without identifying the business significance. 02 is a schema for good groups.

(xx) CatalogueSectionID

A GDT CatalogueSectionID 8500 is a unique identifier for a catalog section. A catalog section is a means of structuring the contents of a catalog using a particular system. A section can contain additional sections, as well as catalog items and the attributes that describe the types of the items. An example of GDT CatalogueSectionID 8500 is: <CatalogueSectionID>Bicycles</CatalogueSectionID>.

The structure of GDT CatalogueSectionID 8500 is depicted in FIG. 85. For the GDT CatalogueSectionID 8500 the Object Class Catalogue Section term is 8502, the Property is Identification 8504, the Representation/Association term is Identifier 8506, the Type term is CCT 8510, the Type Name term is Identifier 8510, and the Length is from one to forty 8512. The GDT CatalogueSectionID 8500 may be a restricted GDT.

The characters allowed for GDT CatalogueSectionID 8500 are upper and lowercase characters from A to Z (without German umlauts), digits from 0 to 9, – (minus sign), _ (underscore), /, \, and . (period). No distinction is made between upper and lowercase characters.

GDT CatalogueSectionID 8500 is used to identify a section uniquely within a catalog schema.

(yy) CatalogueSectionTypeID

A GDT CatalogueSectionTypeID 8600 is a unique identifier for a catalog section type. A catalog section type describes the nature of a catalog sections and defines a set of attributes that is assigned to a section of this type. An example of GDT CatalogueSectionTypeID 1700 is: <CatalogueSectionTypeID>Vehicles<CatalogueSectionTypeID>.

The structure of GDT CatalogueSectionTypeID 8600 is depicted in FIG. 86. For the GDT CatalogueSectionTypeID 8600 the Object Class is Catalogue Section Type 8602, the Property is Identification 8604, the Representation/Association term is Identifier 6906, the Type term is CCT 8608, the Type Name term is Identifier 8610, and the Length is one 8612. The GDT CatalogueSectionTypeID 8600 may be a restricted GDT.

The characters allowed for GDT CatalogueSectionTypeID 8600 are upper and lowercase characters from A to Z (without German umlauts), digits from 0 to 9, – (minus sign), _ (underscore), /, \, and . (period). No distinction is made between upper and lowercase characters. No distinction is made between upper and lowercase characters.

The GDT CatalogueSectionTypeID 7100 may be unique in the context of the catalog.

(zz) CatalogueTypeCode

The GDT CatalogueTypeCode 8700 is a coded representation of the type of a catalog. This is determined by its business purpose, from which the basic attributes are derived. An example of GDT CatalogueTypeCode 8700 is: <CatalogueTypeCode>01</CatalogueTypeCode>.

The structure of GDT CatalogueTypeCode 8700 is depicted in FIG. 87. For the GDT CatalogueTypeCode 8700 the Object Class is Catalog 8702, the Property is Type 8704, the Representation/Association term is Identifier 8706, the Type term is CCT 8708, the Type Name term is Code 8710, and the Length is one 8712. The GDT CatalogueTypeCode 8700 may be a restricted GDT.

Valid values for GDT CatalogueTypeCode 8700 are 01, 02, and 03. 01 refers to a catalog compiled by a company for its own use when purchasing products, 02 refers to a product catalog for one vendor for a purchasing company, and 03 refers to a purchase contract product catalog that contains those products that are included in a special contract with the conditions agreed in the contract. In one example, a purchasing catalog (code 01) could be SAP-B2B, for example. The company uses this catalog for purchasing. The products contained in the catalog can come from different vendors.

(aaa) CatalogueViewID

A GDT CatalogueViewID 8800 is a unique identifier for a catalog view. A catalog view is a subset of the information contained in the catalog. The view is determined by its catalog schemes, sections, and catalog items. In addition, individual attributes can be excluded from a view. An example of GDT CatalogueViewID 8800 is: <CatalogueViewID>ManagerView</CatalogueViewID>.

The structure of GDT CatalogueViewID 8800 is depicted in FIG. 88. For the GDT CatalogueViewID 8800, the Object Class is Catalogue View 8802, the Property is Identification 8804, the Representation/Association term is Identifier 8806, the Type term is CCT 8808, the Type Name term is Identifier 8810, the Length is from one to forty 8812, and CatalogueViewID 8800 may be restricted 8814.

The characters allowed for GDT CatalogueViewID 8800 are upper and lowercase characters from A to Z (without German umlauts), digits from 0 to 9, – (minus sign), _ (underscore), /, \, and . (period). No distinction is made between upper and lowercase characters. No distinction is made between upper and lowercase characters.

The GDT CatalogueViewID 8800 may be in the context of the catalog to which the view belongs.

(bbb) CompleteTransmissionIndicator

The GDT CompleteTransmissionIndicator 8900 indicates whether an object transferred in a message or a transmitted list of similar objects is transmitted in its entirety or not. "Complete Transmission" means the complete transmission of data of the object that is relevant for the message type. "Complete Transmission" is independent of whether the data at the sender have changed since the last transmission. An example of GDT CompleteTransmissionIndicator 8900 is: <CompleteTransmissionIndicator>true</CompleteTransmissionIndicator>.

The structure of GDT CompleteTransmissionIndicator 8900 is depicted in FIG. 89. For the GDT CompleteTransmission Indicator 8900, the Object Class is Complete Transmission 8902, the Property is Indicator 8904, the Representation/Association term is Indicator 8906, the Type term is CCT 8908, and the Type Name term is Indicator 8910.

The GDT CompleteTransmissionIndicator 8900 can have the value true or false. True indicates that the objects indicated by the indicator are transmitted in their entirety. False indicates that the objects indicated by the indicator are not transmitted in their entirety.

The GDT CompleteTransmissionIndicator 8900 is used for the business document object or for lists of objects. The GDT CompleteTransmissionIndicator 8900 can be used in various ways. First, it can be used for the leading business object of a message data type (business document object), to display its complete or incomplete transmission. In this example, the GDT CompleteTransmissionIndicator 8900 is an element of the business document object. If it is set to "true," then a business document object that already exists at the recipient of the message is replaced completely by the transmitted business document object. If it is set to "false," then those elements of the business document object that already exist at the recipient of the message for which data is transmitted are updated. All elements for which no data is transmitted remain unchanged.

In another example, GDT CompleteTransmissionIndicator 8900 may be used for a list of similar objects, to display the complete or incomplete transmission of the list. In this example, the GDT CompleteTransmissionIndicator 8900 is an element of the object that contains the list and has the name "xListCompleteTransmissionIndicator," where "x" is the name of the listed objects. If the GDT CompleteTransmissionIndicator 8900 is set to "true," the list is transmitted in its entirety with all objects. Objects that are not transmitted are implicitly considered to be deleted. Transmitted objects of the list can have an ActionCode, which may be fixed at the value "01" (Create). If the GDT CompleteTransmissionIndicator 8900 is set to "false," the list is not transmitted in its entirety with all objects. Objects that are not transmitted are considered to be unchanged. New objects or objects to be changed or deleted are transmitted. The action that is to be taken for an object in the list is controlled by the value of the assigned ActionCode, where either the hard or soft semantic may be used exclusively.

A GDT CompleteTransmissionIndicator 8900 that exists in a message type but is not filled is assumed by default to be "true." This ensures compatibility when enhancing interfaces to include a GDT CompleteTransmissionIndicator 8900. The GDT CompleteTransmissionIndicator 8900 can be used at different hierarchy levels within a message type. In order to ensure compatibility when enhancing interfaces with additional CompleteTransmissionIndicators, higher-level and lower-level CompleteTransmissionIndicators are not interdependent.

The following is one usage example of GDT CompleteTransmissionIndicator 8900:

```
<BusinessTransactionDocumentChangeRequest>
  <BusinessTransactionDocument>
    <ID>4800000123</ID>
    . . .
  <ItemListCompleteTransmissionIndicator>false</
ItemListCompleteTransmissionIndicator>
    <Item>
      <ID>10</ID>
      <ActionCode>02</ActionCode>
      . . .
  <ScheduleLineListCompleteTransmissionIndicator>true</
ScheduleLineListCompleteTransmissionIndicator>
      <ScheduleLine>
        <ID>1</ID>
        <ActionCode>01</ActionCode>
        . . .
      </ScheduleLine>
      <ScheduleLine>
        <ID>3</ID>
        <ActionCode>01</ActionCode>
        . . .
      </ScheduleLine>
    </Item>
    <Item>
      <ID>30</ID>
      <ActionCode>02</ActionCode>
      . . .
  <ScheduleLineListCompleteTransmissionIndicator>false
</ScheduleLineListCompleteTransmissionIndicator>
      <ScheduleLine>
        <ID>3</ID>
        <ActionCode>03</ActionCode>
      </ScheduleLine>
    </Item>
  </BusinessTransactionDocument>
</BusinessTransactionDocumentChangeRequest>
```

In the usage example above, the message requests a change to the business transaction 4800000123. New or changed items in the business transaction, or items to be deleted, are transmitted in the message (ItemListCompleteTranmissionIndicator="false"). Item 10 is to be changed (ActionCode="02"). In item 10, all schedule lines are transmitted (ScheduleLineListCompleteTranmissionIndicator="true"). The ActionCode is fixed at "01" (Create) in schedule lines 1 and 3 of item 10 because ScheduleLineListCompleteTranmissionIndicator="true." Schedule line 2 is deleted implicitly, because it is not transmitted. Item 20 remains unchanged, because it is not transmitted. Item 30 is to be changed (ActionCode="02"). In item 20, new or changed schedule lines, or schedule lines to be deleted are transmitted (ScheduleLineListCompleteTranmissionIndicator="false"). Schedule lines 1 and 2 of item 30 remain unchanged, because they are not transmitted. Schedule line 3 of item 30 is deleted (ActionCode="03").

The default case for a message is complete transmission and this may be supported by every system. A business process can thus be recreated in the event of errors. To improve performance, support for the complete transmission at the segment level should detailed according to the performance requirements.

Which objects the GDT CompleteTransmissionIndicator 8900 refers to may be recognizable from the context of the interface in which a CompleteTransmissionIndicator is used. The meaning of a complete transmission of an object may be defined.

(ccc) ConsignmentIndicator

The GDT ConsignmentIndicator 9000 indicates whether the transaction form of the consignment is present or not. In an example, "Consignment" is a transaction form in which the vendor stores a material stock at the ordering party at the vendor's expense. The vendor is the owner of the materials until they are withdrawn from the consignment stores. The vendor is notified of the withdrawals at regular time intervals and the withdrawals are then settled accordingly. An example of GDT ConsignmentIndicator 9000 is: <ConsignmentIndicator>true</ConsignmentIndicator>.

The structure of ConsignmentIndicator is depicted in FIG. 90. For the GDT ConsignmentIndicator 9000, the Property term is Consignment Indicator 9002, the Representation/Association term is Indicator 9004, the Type term is CCT 9006, and the Type Name term is Indicator 9008.

The GDT ConsignmentIndicator 9000 can have the values true or false. True indicates that the transaction form of consignment is present. False indicates that the transaction form of consignment is not present.

(ddd) ContactPerson

A CDT ContactPerson 9100 is a natural person who is the contact person during the execution of business processes. CDT ContactPerson 9100 identifies the contact person and the contact person's address. Identification can occur using an internal ID and using IDs assigned by the parties involved. An ID assigned by a party identifies in the name the role the assigning party plays in the business transaction. Roles include Buyer, Seller, ProductRecipient, Vendor, BillTo, BillFrom and Bidder. An example of CDT ContactPerson 9100 is:

Example 1)

PartyIDs

```
<ContactPerson>
  <BuyerID>9874</BuyerID>
  <SellerID>487848</SellerID>
  <Address> . . . </Address>
</ContactPerson>
```

Example 2)

Internal ID

```
<ContactPerson>
  <InternalID schemeID="ContactPersonID"
schemeAgencyID="BPL_300">737</InternalID>
  <Address> . . . </Address>
</ContactPerson>
```

In the above examples, schemeID="ContactPersonID" specifies that the scheme CDT ContactPersonID 9100 was used to identify the party, and schemeAgencyID="BPL__300" specifies that the scheme was assigned by the SAP CMDM system "BPL__300."

The structure of CDT ContactPerson 9100 is depicted in FIG. 91. The CDT ContactPerson 9100 includes elements InternalID 9106, BuyerID 9124, SellerID 9142, ProductRecipientID 9160, VendorID 9178, BillToID 9196, BillFromID 9107A, BidderID 9116A, and Address 9125A. For the CDT ContactPerson 9100, the Object Class is Contact Person 9102 and the Representation/Association term is Details 9104.

For the InternalId 9106, the Category is Element 9108, the Object Class is Contact Person 9110, the Property Qualifier term is Internal 9112, the Property is Identification 9114, the Representation/Association term is Identifier 9116, the Type term is CDT 9118, and the Type Name is ContactPersonInternalID 9120. The Cardinality between the CDT ContactPerson 9100 and the InternalID 9106 is zero or one 9122.

For the BuyerID 9124, the Category is Element 9126, the Object Class is Contact Person 9128, the Property Qualifier term is Buyer 9130, the Property is Identification 9132, the Representation/Association term is Identifier 9134, the Type term is CDT 9136, and the Type Name term is ContactPersonPartyID 9138. The Cardinality between the CDT ContactPerson 9100 and BuyerID 9124 is zero or one 9140.

For the SellerID 9142, the Category is Element 9144, the Object Class is Contact Person 9146, the Property Qualifier term is Seller 9148, the Property is Identification 9150, the Representation/Association term is Identifier 9152, the Type term is CDT 9154, and the Type Name is ContactPersonPartyID 9156. The Cardinality between the CDT ContactPerson 9100 and SellerID 9142 is zero or one 9158.

For the ProductRecipientID 9160, the Category is Element 9162, the Object Class is Contact Person 9164, the Property Qualifier term is Product Recipient 9166, the Property is Identification 9168, the Representation/Association term is Identifier 9170, the Type term is CDT 9172, and the Type Name is ContactPersonPartyID 9174. The Cardinality between the CDT ContactPerson 9100 and ProductRecipientID 9160 is zero or one 9176.

For the VendorID 9178, the Category is Element 9180, the Object Class is Contact Person 9182, the Property Qualifier term is Vendor 9184, the Property is Identification 9186, the Representation/Association term is Identifier 9188, the Type term is CDT 9190, and the Type Name term is ContactPersonPartyID 9192. The Cardinality between the CDT ContactPerson 9100 and VendorID 9178 is zero or one 9194.

For the BillToID 9196, the Category is Element 9198, the Object Class is 9199, the Property Qualifier term is 9101A, the Property is 9102A, the Representation/Association term is Identifier 9103A, the Type term is CDT 9104A, and the Type Name is ContactPersonPartyID 9105A. The Cardinality between the CDT ContactPerson 9100 and BillToID 9196 is zero or one 9106A.

For the BillFromID 9107A, the Category is Element 9108A, the Object Class is Contact Person 9109A, the Property Qualifier term is BillFrom 9110A, the Property is Identification 9111A, the Representation/Association term is Identifier 9112A, the Type term is CDT 9113A, and the Type Name term is ContactPersonPartyID 9114A. The Cardinality between the CDT ContactPerson 9100 and BillFromID 9107A is zero or one 9115A.

For the BidderID 9116A, the Category is Element 9117A, the Object Class is Contact Person 9118A, the Property Qualifier term is Bidder 9119A, the Property is Identification 9120A, the Representation/Association term is Identifier 9121A, the Type term is CDT 9122A, and the Type Name term is ContactPersonPartyID 9123A. The Cardinality between the CDT ContactPerson 9100 and BidderID 9116A is zero or one 9124A.

For the Address 9125A, the Category is Element 9126A, the Object Class is Contact Person 9127A, the Property is Address 9128A, the Representation/Association term is Address 9129A, the Type term is AGDT 9130A, and the Type Name term is Address 9131A. The Cardinality between the CDT ContactPerson 9100 and Address 9125A is zero or one 9132A.

InternalID refers to a proprietary identifier for the CDT ContactPerson 9100 that is used when both sender and recipient can access shared master data (extended enterprise). This may be a personnel number. BuyerID refers to an identifier that is used by the BuyerParty for this CDT ContactPerson 9100. SellerID refers to an identifier that is used by the SellerParty for this CDT ContactPerson 9100. ProductRecipientID refers to an identifier that is used by the ProductRecipientParty for this CDT ContactPerson 9100. VendorID refers to an identifier that is used by the VendorParty for this CDT ContactPerson 9100. BillToID refers to an identifier that is used by the BillToParty for this ContactPerson. BillFromID refers to an identifier that is used by the BillFromParty for this ContactPerson. BidderID refers to an identifier that is used by the BidderParty for this party. Address refers to a contact person's address The different IDs of a BusinessTransactionDocumentParty may identify the same CDT ContactPerson 9100. There is no StandardID for a CDT ContactPerson 9100. A contact person can therefore be identified using an internal ID, as well as by an ID assigned by an involved party. Thus, a CDT ContactPerson 9100 may be identified by the InternalID when sender and recipient can access shared master data or by the ContactPersonPartyIDs when sender and recipient are interested in the PartyIDs assigned by the parties involved Of the IDs available to the sender, IDs the recipient is expected to understand may be used in a message.

The address includes the elements of a personal address.

(eee) ContactPersonID

A GDT ContactPersonID 9200 is a unique identifier for a contact person. GDT ContactPersonID 9200 is a natural person who is the contact person during the execution of business processes. GDT ContactPersonID 9200 identifies the contact person and the contact person's address. An example of GDT ContactPersonID 9200 is:

<ContactPersonID schemeID="PartyID" schemeAgencyID="BPL__300" schemeAgencySchemeAgencyID="ZZZ">
4711
</ContactPersonID>

In the above example, 4711 refers to a contact person in system BPL__300, and ZZZ refers to a proprietary Agency.

The structure of GDT ContactPersonID 9200 is depicted in FIG. 92. The GDT ContactPersonID 9200 includes attributes schemeID 9216, schemeAgencyID 9234, schemeAgencySchemeID 9252 and schemeAgencySchemeAgencyID 9270. For the GDT ContactPersonID 9200, the Object Class is ContactPerson 9202, the Property is Identification 9204, the Representation/Association term is Identifier 9206, the Type term is CCT 9208, the Type Name term is Identifier 9210, the Length is from 1 to 60 9212. The GDT ContactPersonID 9200 may be restricted 9214.

For the schemeID 9216, the Category is Attribute 9218, the Object Class is IdentificationScheme 9220, the Property is Identification is 9222, the Representation/Association term is Identifier 9224, the Type term is xsd 9226, the Type Name term is Token 9228, and the Length is from one to sixty 9230. The Cardinality between the ContactPersonID 9200 and the schemeID 9216 is zero or one 9232.

For the schemeAgencyID 9234, the Category is Attribute A9273, the Object Class is IdentificationSchemeAgency 9238, the Property is Identification 9240, the Representation/Association term is Identifier 9242, the Type term is xsd 9244, the Type Name term is Token 9246, and the Length is from one to sixty 9248. The Cardinality between the ContactPersonID is zero or one 9250.

For the schemeAgencySchemeID 9252, the Category is Attribute A9254, the Object Class is IdentificationSchemeAgency 9256, the Property is Scheme 9258, the Representation/Association term is Identifier 9260, the Type term is xsd 9262, the Type Name term is Token 9264, and the Length is from one to sixty 9266. The Cardinality is zero or one 9268.

For the schemeAgencySchemeAgencyID 9270, the Category is Attribute A9272, the Object Class is IdentificationSchemeAgency 9274, the Property is SchemeAgency 9276, the Representation/Association term is Identifier 9278, the Type term is xsd 9280, the Type Name term is Token 9282, and the Length is three 9284. The Cardinality is zero or one 9286.

Contact persons may be used as contact persons for a party, not for products, and the like. ContactPerson also identifies a contact person for a party. This can take place explicitly within the GDT BusinessTransactionDocumentParty or implicitly in a message. In the latter case, the party for which the contact person is being specified may be clear.

In an SAP MDM example, a contact person is a subtype of a party and can be identified like a party using a GUID or a PartyID.

(fff) ContactPersonInternalID

A CDT ContactPersonInternalID 9300 is a proprietary identifier for a contact person. ContactPerson is a natural person who is the contact person during the execution of business processes. An example of a CDT ContactPersonInternalID 9300 is:

GUID of a contact person:

<ContactPersonInternalID schemeID="PartyGUID" schemeAgencyID="MPL_002">1C743CEC501F6A4D 8826C7EC5A8554B9</ContactPersonInternalID>

In the above example, schemeID="PartyGUID" indicates that the scheme "PartyGUID" was used to identify the contact person, and schemeAgencyID="MPL_002" indicates that the scheme was assigned by the business system "MPL_002."

The following is another example of a CDT ContactPersonInternalID 9300:

Party ID of a contact person:

| |
|---|
| <ContactPersonInternalID schemeID="PartyID" schemeAgencyID="MPL_002">4711</ContactPersonInternalID> |

The structure of CDT ContactPersonInternalID 9300 is depicted in FIG. 93. The CDT ContactPersonInternalID 9300 includes attributes schemeID 9318 and schemeAgencyID 9336. For the CDT ContactPersonInternalID 9300, the Object Class is ContactPerson 9302, the Property Qualifier term is Internal 9304, the Property is Identification 9306, the Representation/Association term is Identifier 9308, the Type term is GDT 9310, the Type Name term is ContactPersonID 9312, and the Length is from one to thirty-two 9314. The CDT ContactPersonInternalID 9300 may be restricted 9316.

For the schemeID 9318, the Category is Attribute 9320, the Object Class is IdentificationScheme 9322, the Property is Identification 9324, the Representation/Association term is Identifier 9326, the Type term is xsd 9328, the Type Name term is Token 9330, and the length is from one to sixty 9332. The Cardinality is zero or one 9334.

For the schemeAgencyID 9336, the Category is Attribute 9338, the Object Class is IdentificationSchemeAgency 9340, the Property is Identification 9342, the Representation/Association term is Identifier 9344, the Type term is xsd 9346, the Type Name term is Token 9348, and the Length is from one to sixty 9350. The Cardinality is zero or one 9352.

In an example, the attributes of a ContactPersonInternalID may be filled in as follows in an SAP MDM. Scheme 'Part GUID' identifies a contact person using a Global Unique Identifier. SchemeID 'PartyID' identifies a contact person using an identification number. SchemeAgencyID is a business system in which the identifier was assigned.

The CDT ContactPersonInternalID 9300 represents a projection of the CDT ContactPersonID 9300, in which the attributes 'schemeID' and 'schemeAgencyID' are contained for describing an internally assigned ID. If an attribute is not explicitly assigned in the use of the CDT, it may be determined through the context.

The InternalID is used when both sender and recipient can access shared master data, e.g., during internal communication. In an SAP MDM example, a contact person is a subtype of a party and can be identified like a party using a GUID or a PartyID.

(ggg) ContactPersonPartyID

A CDT ContactPersonPartyID 9400 is an identifier for a contact person and is assigned by a party. ContactPerson is a natural person who is the contact person during the execution of business processes. ContactPerson identifies the contact person and the contact person's address. An example of CDT ContactPersonPartyID 9400 is: <ContactPersonSellerID>4711</ContactPersonSellerID>.

The structure of CDT ContactPersonPartyID 9400 is depicted in FIG. 94. For the CDT ContactPersonPartyID 9400, the Object Class is ContactPerson 9402, the Property Qualifier term is Party 9404, the Property is Identification 9406, the Representation/Association term is Identifier 9408, the Type term is GDT 9410, the Type Name term is ContactPersonID 9412, and the Length is from one to sixty 9414. The CDT ContactPersonPartyID 9400 may be restricted 9416.

The ContactPersonPartyID is the proprietary identifier assigned by a party. The party (in its role) that assigned this identifier may be derived from the context of the message that the ContactPersonPartyID uses.

CDT ContactPersonPartyID 9400 limits the general identifier 'ContactPersonID'. In contrast to 'ContactPersonInternalID', the use of 'ContactPersonPartyID' within ContactPerson is also role-dependent (e.g., as an ID assigned by the Buyer).

The party that assigns the ID is indicated by its role. The name component 'Party' in ContactPersonPartyID is replaced with the corresponding role (e.g., ContactPersonSellerID). SchemeID and schemeVersionID may also be included as attributes if there is a need for differentiating between several schemes.

(hhh) CounterValue

A GDT CounterValue 9500 specifies a value that counts a number that changes in fixed increments. An example of GDT CounterValue 9500 is: <CounterValue>42</CounterValue>.

The structure of GDT CounterValue 9500 is depicted in FIG. 95. For the GDT CounterValue 9500, the Representation/Association Qualifier term is Counter 9502, the Representation/Association term is Value 9504, the Type term is xsd 9506, the Type Name term is nonNegativeInteger 9508, and the Length is from one to nine 9510.

GDT CounterValue 9500 is a qualified basic GDT that is based on the secondary Representation/Association Value of the CCT Numeric and a restriction of xsd: decimal. Non-negative whole numbers less than one billion may be permitted.

GDT CounterValue 9500 may be used to count dunning notices to a debtor, orders in a queue, or telephone calls that have to be billed. GDT CounterValue 9500 can count forwards and backwards. Changes to a CounterValue may be made in steps of +1 or −1. The permitted value range can be restricted depending on how the GDT CounterValue 9500 is used.

While GDT CounterValue 9500 focuses on dynamic changes to numbers, TotalNumberValue describes a static number at a given time or for a given period. The incremental increase in a set by one element at a time, which can be counted using the CounterValue, can generate linear ordering of the elements in the set, which is reflected in the item numbers of the elements (OrdinalNumberValue).

(iii) CountryCode

The GDT CountryCode 9600 is a coded representation of a country defined by either national or administrative/political borders. An example of GDT CountryCode is: <CountryCode>DE</CountryCode>.

The structure of GDT CountryCode 9600 is depicted in FIG. 96. For the GDT CountryCode 9600, the Property is Country 9602, the Representation/Association term is Code 9604, the Type term is CCT 9606, the Type Name term is Code 9608, and the Length is from two to three 9610. The GDT CountryCode 9600 may be restricted 9612.

GDT CountryCode 9600 may be represented using an alphabetical two-character code based on ISO 3166-1. ISO 3166-1 may be the default code list.

GDT CountryCode 9600 is used to identify a country defined by national or administrative/political borders in a physical address, or to identify a country of origin.

(jjj) CreditAgencyReportQueryReasonCode

The GDT CreditAgencyReportQueryReasonCode 9700 is the coded representation of the reason for a query to a credit agency for credit information. An example of GDT CreditAgencyReportQueryReasonCode 9700 is: <CreditAgencyReportQueryReasonCode>01</CreditAgencyReportQueryReasonCode>.

The structure of GDT CreditAgencyReportQueryReasonCode 9700 is depicted in FIG. 97. For the GDT CreditAgencyReportQueryReasonCode 9700, the Object Class is Credit Agency Report Query 9702, the Property is Reason 9704, the Representation/Association term is Code 9706, the Type term is CCT 9708, the Type Name term is Code 9710, and the Length is two 9712.

In an example, the value range of the GDT CreditAgencyReportQueryReasonCode 9700 consists of a proprietary code list. Possible values are 01 and 02. 01 refers to a business initiation and 02 refers to an existing business connection.

(kkk) CreditAgencyReportRetrievalPermissionIndicator

A GDT CreditAgencyReportRetrievalPermissionIndicator 9800 indicates whether a party has consented to have credit information about it obtained. An example of GDT CreditAgencyReportRetrievalPermissionIndicator 9800 is: <CreditAgencyReportRetrievalPermissionIndicator>true</CreditAgencyReportRetrievalPermissionIndicator>

The structure of GDT CreditAgencyReportRetrievalPermissionIndicator 9800 is depicted in FIG. 98. For the GDT CreditAgencyReportRetrievalPermissionIndicator 9800, the Object Class is Credit Agency Report 9802, the Property is RetrievalPermission 9804, the Representation/Association term is Indicator 9806, the Type term is CCT 9808, the Type Name term is Indicator 9810.

GDT CreditAgencyReportRetrievalPermissionIndicator 9800 may have the value true or false. True indicates that a party has consented for credit information about it to be obtained. False indicates that a party has not consented for credit information about it to be obtained.

Obtaining credit information from a credit agency such as Dun & Bradstreet or Schufa may be performed, particularly for new business partners or for transactions with larger volumes. To comply with the legal requirements of the country concerned, explicit consent by the business partner may be required. The existence of the CreditAgencyReportRetrievalPermissionIndicator indicates whether this consent has been provided.

(lll) CreditAgencyReportScoring

A GDT CreditAgencyReportScoring 9900 is the rating of a party for credit information using a scorecard. A scorecard is a scheme used by a credit agency for assessing a party using different characteristics. Several individual characteristics are examined for each scorecard, which means that several scorecards may be needed for a comprehensive rating. This results in more scorings. An example of GDT CreditAgencyReportScoring 9900 is:

```
<CreditAgencyReportScoring>
<ScoreCardID>5</ScoreCardID>
<ResultValue>85</ResultValue>
<Description languageCode="EN">ScoreCard for real
estate</Description>
</CreditAgencyReportScoring>.
```

The structure of GDT CreditAgencyReportScoring 9900 is depicted in FIG. 99. The GDT CreditAgencyReportScoring 9900 includes attributes ScoreCardId 9908, ResultValue 9926 and Description 9946. For the GDT CreditAgencyReportScoring 9900, the Object Class is CreditAgencyReport 9902, the Property is Scoring 9904, and the Representation/Association term is Details 9906.

For the ScoreCardID 9908, the Category is Attribute Element 9910, the Object Class is Credit Agency Reporting Scoring 9912, the Property is Score Card Identification 9914, the Representation/Association term is Identifier 9916, the Type term is GDT 9918, the Type Name term is ScoreCardID 9920, and the Length is from one to twenty 9922. The Cardinality is zero or one 9924.

For the ResultValue 9926, the Category is Attribute Element 9928, the Object Class is Credit Agency Report Scoring 9930, the Property is Result 9932, the Representation/Association term is Value 9934, the Type term is GDT 9936, the Type Name term is DecimalValue 9938, and the Length is maximum six predecimal digits with two decimal digits 9940. The Cardinality is one 9942. The GDT CreditAgencyReportScoring 9900 may be restricted 9944.

ScoreCardID identifies the scorecard used by the credit agency. ResultValue is the rating result calculated by the credit agency using the scorecard. Description is the description of scoring. ResultValue is unique in the context of the scorecard. The element ScoreCardID may not be required if this is already determined by the context.

(mmm) CreditCommitmentTypeCode

The GDT CreditCommitmentTypeCode 10000 is the coded representation of the type of a payment obligation (liability). An example of GDT CreditCommitmentTypeCode 10000 is: <CreditCommitmentTypeCode>001</CreditCommitmentTypeCode>.

The structure of GDT CreditCommitmentTypeCode 10000 is depicted in FIG. 100. For the GDT CreditCommitmentTypeCode 10000, the Object Class is Credit Commitment 10002, the Property is Type 10004, the Representation/Association term is Code 10006, the Type term is CCT 10008, the Type Name term is Code 10010, and the Length is three 10012.

The value range for the GDT CreditCommitmentTypeCode 10000 may consist of a proprietary code list. Possible values are 001 through 005. 001 means liability from a sales order, 002 means liability from an accounting open item (receivable from delivery and service), 003 means liability from a special general ledger transaction (down payment, collateral), 004 means liability from a delivery, and 005 means liability from a billing document.

GDT CreditCommitmentTypeCode 10000 may be used to inform central credit management about the type of payment obligation. The GDT CreditCommitmentTypeCode 10000 may be a proprietary code list with fixed predefined values. Changes to the permitted values involve changes to the interface. This code list may correspond to the entries in table UKM_COMM_TYPE in SAP FSCM Credit Management.

(nnn) CreditRatingCode

The GDT CreditRatingCode 10100 is the coded representation of the rating of the creditworthiness of a party. An example of GDT CreditRatingCode 10100 is: <CreditRatingCode listAgencyID="016">5A1</CreditRatingCode>.

The structure of GDT CreditRatingCode 10100 is depicted in FIG. 101. The GDT CreditRatingCode 10100 includes attributes listAgencyID 10116 and listAgencySchemeAgencyID 10134. For the GDT CreditRatingCode 10100, the Object Class is Credit 10102, the Property is Rating 10104, the Representation/Association term is Code 10106, the Type term is CCT 10108, the Type Name term is Code 10110, and the Length is from one to ten 10112. The Cardinality is one 10114.

For the listAgencyID 10116, the Category is Attribute 10118, the Object Class is Code List Agency 10120, the Property is Identification 10122, the Representation/Association term is Identifier 10124, the Type term is xsd 10126, the Type Name term is Token 10128, and the Length is from one to sixty 10130. The Cardinality is zero or one 10132.

For the listAgencySchemeAgencyID 10134, the Category is Attribute 10136, the Object Class is Code List Agency 10138, the Property is Scheme Agency 10140, the Representation/Association term is Identifier 10142, the Type term is xsd 10144, the Type Name term is Token 10146, and the Length is three 10148. The Cardinality is zero or one 10150.

The CreditRatingCode may be a proprietary code list of a credit agency, but may also be a company's credit management code list. The individual values of the code represent a score value, for example, a ranking using German school report card grades (1="very good" through 6="unsatisfactory") or percentage points. However, there are also codes whose meaning is explained separately. Code lists that may be used for CreditRatingCode include, for example, Dun & Bradstreet Rating Code, Schufa, Bürgel, Credireform, and Mutually agreed code lists.

For Dun & Bradstreet Rating Code, the ListAgencyID is 016. For Schufa, the ListAgency ID is 344149856 and the ListAgencySchemeAgencyID is 016. For Bürgel, the ListAgency ID is the DUNS number from Bürgel and the ListAgencySchemeAgencyID is 016. For Creditreform, the ListAgency ID is 325636231 and the ListAgencySchemeAgencyID is 016. For Mutually agreed code lists, the ListAgencyID is ZZZ.

(ooo) CreditRiskClassCode

The GDT CreditRiskClassCode 10200 is the coded representation for the risk of non-payment. An example of GDT CreditRiskClassCode 10200 is: <CreditRiskClassCode listAgencyID="016">A</CreditRiskClassCode>.

The structure of GDT CreditRiskClassCode 10200 is depicted in FIG. 102. The GDT CreditRiskClassCode 10200 includes attributes listAgencyID 10216 and listAgencySchemeAgencyID 10234. For the GDT CreditRiskClassCode 10200, the Object Class is Credit 10202, the Property is RiskClass 10204, the Representation/Association term is Code 10206, the Type term is CCT 10208, the Type Name term is Code 10210, and the Length is ten 10212. The Cardinality is one 10214.

For the listAgencyID 10216, the Category is Attribute 10218, the Object Class is Code List Agency 10220, the Property is Identification 10222, the Representation/Association term is Identifier 10224, the Type term is xsd, the Type Name term is Token 10228, and the Length is from one to sixty 10230. The Cardinality is zero or one 10232.

For the listAgencySchemeAgencyID 10234, the Category is Attribute 10236, the Object Class is Code List Agency 10238, the Property is Scheme Agency 10240, the Representation/Association term is Identifier 10242, the Type term is xsd 10244, the Type Name term is Token 10246, and the Length is three 10248. The Cardinality is zero or one 10250.

The CreditRiskClassCode may be a proprietary code list of a credit agency, but may also be a company's credit management code list. The individual values of the code represent a risk class, for example, "high," "medium," or "low." However, there are also codes whose meaning is explained separately. Codes that may be used for CreditRiskClassCode include, for example, include Dun & Bradstreet Rating Code, Schufa, Bürgel, Credireform, and Mutually agreed code lists.

For Dun & Bradstreet Rating Code, the ListAgencyID is 016. For Schufa, the ListAgency ID is 344149856 and the ListAgencySchemeAgencyID is 016. For Bürgel, the ListAgency ID is the DUNS number from Bürgel and the ListAgencySchemeAgencyID is 016. For Creditreform, the ListAgency ID is 325636231 and the ListAgencySchemeAgencyID is 016. For Mutually agreed code lists, the ListAgencyID is ZZZ.

GDT CreditRiskClassCode 10200 is used to represent the risk of non-payment involved in a business transaction. The risk of non-payment refers to the party involved in the business transaction concerned.

(ppp) CreditSegmentInternalID

A GDT CreditSegmentInternalID 10300 is a proprietary identifier for a credit segment. A credit segment groups a company's business transactions from the perspective of credit assignment and control. An example of GDT CreditSegmentInternalID 10300 is <CreditSegmentInternalID>2000</CreditSegmentInternalID>

The structure of GDT CreditSegmentInternalID 10300 is depicted in FIG. 103. For the GDT Credit Segment Internal ID 10300, the Object Class is Credit Segment 10302, the Property is Internal Identification 10304, the Representation/Association term is Identifier 10306, the Type term is CCT 10308, the Type Name term is Identifier 10310, and the Length is from one to ten 10312. The GDT Credit Segment Internal ID 10300 may be restricted 10314.

In one variation, the credit segment ID is assigned by a company's credit manager(s). For this reason, schemeID and schemeAgencyID attributes may not be required.

A company's business transactions may be grouped into a small number of credit segments (from 1 to 5). In credit control, telecommunications companies often distinguish between the product categories such as "fixed network" and "mobile business." Other grouping criteria may be the selling organization (SellerParty) or creditor (CreditorParty).

GDT CreditSegmentInternalID 10300 is used when both sender and recipient can access shared master data.

(qqq) CreditWorthinessChangeReasonCode

The GDT CreditWorthinessChangeReasonCode 10400 is the coded representation of the reason for a change in the creditworthiness of a party. An example of GDT CreditWorthinessChangeReasonCode 10400 is: <CreditWorthinessChangeReasonCode>CL</CreditWorthinessChangeReasonCode>.

The structure of GDT CreditWorthinessChangeReasonCode 10400 is depicted in FIG. 104. For the GDT Credit Worthiness Change Reason Code 10400, the Object Class is Credit Worthiness 10402, the Property is Change Reason 10404, the Representation/Association term is Code 10406, the Type term is CCT 10408, the Type Name term is Code 10410, and the Length is two 10412.

GDT CreditWorthinessChangeReasonCode 10400 may be represented by a proprietary code list. Possible values are 01 through 13. 01 means the creditworthiness in Credit Management was changed. 02 means the validity period of the creditworthiness in Credit Management has expired. 03 means the creditworthiness at a credit agency was changed. 04 means the validity period of the creditworthiness at a credit agency has expired. 05 means the risk class in Credit Management was changed. 06 means the credit limit was changed (manually or automatically). 07 means the validity period of the credit limit has expired. 08 means the credit limit utilization has changed. 09 means the credit limit utilization has fallen below 100%. 10 means the credit limit utilization has exceeded 100%. 11 means the credit representative has requested a change to the credit limit; this change is currently in the approval process. 12 means the rule governing the creditworthiness check that is defined in the master data of a party was changed. 13 means a negative response was received regarding the creditworthiness of a party. Changes to the permitted values require changes to the interface.

(rrr) CreditWorthinessCheckingRuleCode

The GDT CreditWorthinessCheckingRuleCode 10500 is the coded representation of the check procedure to be used to determine creditworthiness. An example of GDT CreditWorthinessCheckingRuleCode 10500 is: <CreditWorthinessCheckingRuleCode>02</CreditWorthinessCheckingRuleCode>.

The structure of GDT CreditWorthinessCheckingRuleCode 10500 is depicted in FIG. 105. For the GDT Credit Worthiness Checking Rule Code 10500, the Object Class is Credit Worthiness 10502, the Property is Checking Rule 10504, the Representation/Association term is Code 10506, the Type term is CCT 10508, the Type Name term is Code 10510, and the Length is two 10512.

The value range of the GDT CreditWorthinessCheckingRuleCode 10500 may comprise a proprietary code list. Possible values are 01 through 04. 01 refers to a procedure for determining the creditworthiness of new business customers. 02 refers to a procedure for determining the creditworthiness of existing business customers. 03 refers to a procedure for determining the creditworthiness of new private customers. 04 refers to a procedure for determining the creditworthiness of existing private customers. Changes to the permitted values involve changes to the interface.

GDT CreditWorthinessCheckingRuleCode 10500 is used, e.g., when querying the creditworthiness of a business partner, to define the procedure for determining the score and the credit limit.

(sss) CreditWorthinessCheckingSeverityCode

The GDT CreditWorthinessCheckingSeverityCode 10600 is the coded representation of the severity of the checking procedure for determining creditworthiness. An example of GDT CreditWorthinessCheckingSeverityCode 10600 is: <CreditWorthinessCheckingSeverityCode>3</CreditWorthinessCheckingSeverityCode>.

The structure of GDT CreditWorthinessCheckingSeverityCode 10600 is depicted in FIG. 106. For the GDT Credit Worthiness Checking Severity Code 10600, the Object Class is Credit Worthiness 10602, the Property is Checking Severity 10604, the Representation/Association term is Code 10606, the Type term is CCT 10608, the Type Name term is Code 10610, and the Length is one 10612.

The value range of the GDT CreditWorthinessCheckingSeverityCode 10600 may comprise a proprietary code list. Possible values are 1, 2 or 3. 1 refers to checks with low severity. 2 refers to checks with medium severity. 3 refers to checks with high severity. Thus, the following linear order (from low to high severity) applies for the severity of the checking procedure for determining creditworthiness: 1<2<3. Changes to the permitted values may involve changes to the interface.

The GDT CreditWorthinessCheckingSeverityCode 10600 may be used when querying the creditworthiness of a business partner, in order to define the severity of the creditworthiness check. For example, if a high severity check is to be performed for a goods issue, but a low severity check is to be performed for a bid.

(ttt) CreditWorthinessIndicator

A GDT CreditWorthinessIndicator 10700 indicates whether a party is creditworthy or not. An example of GDT CreditWorthinessIndicator 10700 is: <CreditWorthinessIndicator>true</CreditWorthinessIndicator>.

The structure of GDT CreditWorthinessIndicator 10700 is depicted in FIG. 107. For the GDT Credit Worthiness Indictor 10700, the Object Class is Currency 9302, the Property is Indicator 10704, the Representation/Association term is Indicator 10706, the Type term is CCT 10708, and the Type Name term is Indicator 10710.

GDT CreditWorthinessIndicator 10700 may have the values true or false. True indicates that a party is creditworthy. False indicates that a party is not creditworthy.

Prior to the sale, rental, or lease of a product, one may check a business partner's creditworthiness. The GDT CreditWorthinessIndicator 10700 indicates whether or not the business partner is creditworthy.

(uuu) CurrencyCode

The GDT CurrencyCode 10800 is a coded representation of the currency. An example of GDT CurrencyCode 10800 is: <PaymentCurrencyCode>EUR</PaymentCurrencyCode>.

The structure of GDT CurrencyCode 10800 is depicted in FIG. 108. For the GDT Currency Code 10800, the Object Class is Currency 10802, the Property is Code 10804, the Representation/Association term is Code 10806, the Type term is CCT 10808, the Type Name term is Code 10810, and the Length is three 10812. The GDT Currency Code 10800 may be restricted 10814.

GDT CurrencyCode 10800 represents a three-character code according to ISO 4217. GDT Amount contains a currency. However, an additional currency can be specified with GDT CurrencyCode 10800. This may be used, for example, for the specification of an alternative payment currency in the message "Payment Due Notification."

(vvv) DangerousGoods

GDT DangerousGoods 10900 are substances or objects that, due to their properties, present a danger to public safety, to the life and health of people and animals, or to the safety of things. An example of GDT DangerousGoods 10900 is:

```
< DangerousGoods >
    <ClassID>1</ ClassID >
    <SubClassID >3</SubClassID >
</ DangerousGoods >.
```

The structure of DangerousGoods is depicted in FIG. 109. The GDT DangerousGoods 10900 includes elements ID, RegulationsCode, ClassID, and DivisionID. For the GDT Dangerous Goods 10900, the Object Class is Dangerous Goods 10902 and the Representation/Association term is Details 10904.

For the ID 10906, the Category is Element 10908, the Object Class is Dangerous Goods 10910, the Property is Identification 10912, the Representation/Association term is Identifier 10914, the Type term is GDT 10916, the Type Name term is Dangerous Goods ID 10918, the Length is four 10920, and the Cardinality is zero or one 10922.

For the GDT Regulations Code 10924, the Category is Element 10926, the Object Class is Dangerous Goods 10928, the Property is Regulations 10930, the Representation/Association term is Code 10932, the Type term is GDT 10934, the Type Name term is Dangerous Goods Regulation Code 10936, the Length is from one to three 10938 and the Cardinality is zero or one 10940.

For the GDT Class ID 10942, the Category is Element 10944, the Object Class is Dangerous Goods 10946, the Property is Class 10948, the Representation/Association term is Identifier 10950, the Type term is CCT 10952, the Type Name term is Identifier 10954, the Length is from one to three 10956, and the Cardinality is zero or one 10958.

For the GDT Division ID 10960, the Category is Element 10962, the Object Class is Dangerous Goods 10964, the Property is Division 10966, the Representation/Association term is Identifier 10968, the Type term is CCT 10970, the Type Name term is Identifier 10972, the Length is from one to six 10974, and the Cardinality is zero or one 10976.

ID identifies a hazardous material using the United Nations Dangerous Goods (UNDG) Identifier. RegulationsCode is a coded representation of national or international dangerous goods rules or regulations according to the UN/EDIFACT code list 8273 "Dangerous goods regulations code." ClassID identifies a dangerous goods class, for example, class 2 (Gases). DivisionID identifies a breakdown of the dangerous goods class, for example, division 3 (Toxic Gases). The value ranges and the use of elements "ClassID" and "DivisionID" can differ from system to system and may not have a standardized norm.

If the RegulationCode is specified, ClassID may be filled in and, if necessary, DivisionID of this RegulationCode may be filled in. In one variation, dangerous goods rules or regulations can be used that have a maximum of a two steps in their classification scheme. The information DangerousGoods may be a requirement for an appropriate and environmentally-friendly handling, transport, and storage of a product, that is or contains a dangerous good.

GDT DangerousGoods 10900 can be used with the GDT DangerousGoodsIndicator 10900 in that the GDT DangerousGoodsIndicator 10900 displays that dangerous goods are contained in a delivery, while the GDT DangerousGoods 10900 provides more detail about the danger posed by a delivery item. "Dangerous Goods" is the usual name for dangerous goods/materials at national and international level. In the USA, however, the term "Hazardous Materials" is also common. The terms "Dangerous Goods" and "Hazardous Materials" and variants of these two are not used to differentiate between the transport of dangerous goods and the storage of dangerous goods.

(www) DangerousGoodsID

A GDT DangerousGoodsID 11000 is the unique identifier for a dangerous good, using the United Nations Dangerous Goods (UNDG) Number. An example of GDT DangerousGoodsID 11000 is: <DangerousGoodsID>2453</DangerousGoodsID>.

The structure of GDT DangerousGoodsID 11000 is depicted in FIG. 110. For the GDT Dangerous Goods ID 11000, the Object Class is Dangerous Goods 11002, the Property is Identification 11004, the Representation/Association term is Identifier 11006, the Type term is CCT 11008, the Type Name term is Identifier 11010 and the Length is four 11012.

(xxx) DangerousGoodsIndicator

A GDT DangerousGoodsIndicator 11100 indicates whether dangerous goods are contained in a combination of products or not. An example of GDT DangerousGoodsIndicator 11100 is: <DangerousGoodsIndicator>true</DangerousGoodsIndicator>.

The structure of GDT DangerousGoodsIndicator 11100 is depicted in FIG. 111. For the GDT Dangerous Goods Indicator 11100, the Object Class is Dangerous Goods 11102, the Property is Indicator 11104, the Representation/Association term is Indicator 11106, the Type term is CCT 11108, the Type Name term is Indicator 11110, the Length is one 11112, and the Cardinality is zero or one 11114.

GDT DangerousGoodsIndicator 11100 may have the values true or false. True indicates that a combination of products contains dangerous goods. False indicates that a combination of products contains no dangerous goods.

If the indicator is set, the stipulations for the corresponding dangerous good are valid for the combination. These stipulations may be determined by analyzing the message using the GDT DangerousGoods 11100.

GDT DangerousGoodsIndicator 11100 may be used with the GDT DangerousGoods in that the GDT DangerousGoodsIndicator 11100 displays that dangerous goods are contained in a combination, and the GDT DangerousGoods provides more detail about the danger posed by a delivery item.

(yyy) DangerousGoodsRegulationsCode

The GDT DangerousGoodsRegulationsCode 11200 is the coded representation of a national or international dangerous goods rules or regulations according to the UN/EDIFACT code list 8273 "Dangerous goods regulations code" An example of GDT DangerousGoodsRegulationsCode 11200 is: <DangerousGoodsRegulationsCode>GVS</DangerousGoodsRegulationsCode>.

The structure of GDT DangerousGoodsRegulationsCode 11200 is depicted in FIG. 112. For the GDT Dangerous Goods Regulation Code 11200, the Object Class is Dangerous Goods 11202, the Property is Regulations 11204, the Representation/Association term is Code 11206, the Type term is CCT 11208, the Type Name is Code 11210 and the Length is from one to three 11212.

In a variation, the possible values for GDT DangerousGoodsRegulationsCode 11200 are described in the UN/EDI- FACT code list 8273 “Dangerous goods regulations code.” These include ADR, ADS, ADT, ADU, AGS, ANR, ARD, CFR, COM, GVE, GVS, ICA, IMD, RGE, RID, UI, and ZZZ.

(zzz) Date

A GDT Date 11300 is the specification of an exact day in the Gregorian calendar. An example of GDT Date 11300 is: <OrderDate>2002-04-19</OrderDate>.

The structure of GDT Date 11300 is depicted in FIG. 113. For the GDT Date 11300, the Property is Date 11302, the Representation/Association term is Date 11304, the Type term is CCT 11306, and the Type Name term is Date 11308.

The GDT Date 11300 uses the W3C built-in data type xsd: date. This is structured according to the extended representation of ISO 8601.

The extended representation of Date is CCYY-MM-DD, for example, 2002-04-19. The extended representation uses the literals CC for century, YY for year, MM for month, and DD for day. There may also be a hyphen between the year, month, and day.

In a variation, years are represented by a four-character code and the years 0001 to 9999 are supported. Leading positive or negative signs before the year are not supported. Time zones prefixed with the time-zone-character “Z” may not be supported for the date.

GDT Date 11300 is used to represent points in time or time stamps in which the day may be exact.

(aaaa) DatePeriod

A GDT DatePeriod 11400 is a period that is defined by two points in time. These points in time are expressed in calendar days. This time period is determined by a start time and an end time, a start time with a duration, or a duration with an end time. An example of GDT DatePeriod 11400 is:

```
<HolidayPeriod>
    <StartDate>2003-07-01</StartDate>
    <EndDate>2003-10-25</EndDate>
</HolidayPeriod>.
```

The structure of GDT DatePeriod 11400 is depicted in FIG. 114. The GDT DatePeriod 11400 includes elements StartDate, EndDate, and Duration. For the GDT Date Period 11400, the Object Class is Date Period 11402 and the Property is Details 11404.

For the GDT Start Date 11406, the Category is Element 11408, the Object Class is Time Period 11410, the Property is Start Date 11412, the Representation/Association term is Date 11414, the Type term is GDT 11416, the Type Name term is Date 11418, and the Cardinality is zero or one 11420.

For the GDT End Date 11422, the Category is Element 11424, the Object Class is Date Period 11426, the Property is End Date 11428, the Representation/Association term is Date 11430, the Type term is GDT 11432, the Type Name term is Date 11434, and the Cardinality is zero or one 11436.

For the GDT Duration 11438, the Category is Element 11440, the Object Class is Date Period 11442, the Property is Duration 11444, the Representation/Association term is Duration 11446, the Type term is GDT 11448, the Type Name term is Duration 11450, and the Cardinality is zero or one 11452.

GDT DatePeriod 11400 is an aggregation and includes the sub-elements StartDate, EndDate, and Duration. StartDate represents the start date in the time unit based on the extended representation of ISO 8601. EndDate represents the end date in the time unit based on the extended representation of ISO 8601. Duration represents the relative duration based on convention ISO 8601. The following conventions may be used: years (nY), months (nM) and days (nD), hours (nH), minutes (nM) and seconds (n.nnnS). One example of Duration is <Duration>P1H7M9T</Duration>

The sub-elements in GDT DatePeriod 11400 are optional. However, the representation can include one of the following tuples: StartDate and EndDate, StartDate and Duration, or EndDate and Duration. EndDate may be greater than or equal to the StartDate. For example, <StartDate>2003-07-01</StartDate>, <EndDate>2003-10-25</EndDate>.

Period can be used to specify a time period that can be expressed using two predefined dates or one date and one relative duration. This period may be the start and end dates of a holiday or the start date and duration in days of a temporary work contract.

The time of day is not specified in GDT DatePeriod 11400. For this reason, two business partners may agree unambiguously when a date period begins and when it ends. For example, it can begin at 00:00:00 and end at 23:59:59. The term “Date” in the “Object Class” of the CDT is redundant. Therefore, it comprises the term “Period.” This is because the term “Date” is given by the “Property” of the sub-elements. As a result, the semantic of this CDT is unique.

(bbbb) DateTime

A GDT DateTime 11500 is the specification of an accurate-to-the-second time stamp of a calendar day. An example of GDT DateTime 11500 is: <ConstructionDateTime>2002-04-19T15:30:00+01:00</ConstructionDateTime>.

The structure of GDT DateTime 11500 is depicted in FIG. 115. For GDT Date Time 11500, the Property is Date Time 11502, the Representation/Association term is Date Time 11504, the Type term is CCT 11506, the Type Name term is Date Time 11508.

The GDT DateTime 11500 core component may be based on the W3C “built-in datatype” xsd: dateTime. This is structured according to the extended representation of ISO 8601. The extended representation is CCYY-MM-DDThh:mm:ss(.sss)Z or CCYY-MM-DDThh:mm:ss(.sss)(+/−)hh:mm (for example, 2002-04-19T15:30:00Z or 2002-04-19T10:30:00+05:00, respectively).

The extended representation uses the literals CC for century (00-99), YY for year (00-99), MM for month (01-12), and DD for day (01-28 in month 02; 01-29 in month 02 when the year is a leap year; 01-30 for months 04, 06, 09, and 11; 01-31 for months 01, 03, 05, 07, 08, 10, and 12), hh for hours (00-23), mm for minutes (00-59), ss for seconds (00-59), and .sss for fractions of a second (up to three decimal places after the decimal). In addition, there may be a hyphen between the year, month, and day. A separator “T” may be used between the date and time. Z specifies when the time represented is also UTC time. Also, +hh:mm specifies when the represented time is a local time that is ahead of UTC time, and −hh:mm specifies when the represented time is a local time that is behind UTC time.

The time stamp can be specified without the additional specifications (Z, +hh:mm, −hh:mm) relating to the coordinated world time (UTC time). In a variation, this time stamp is not converted to the respective local time and is therefore for information purposes.

The following value ranges are defined for DateTime: Day represents all dates from the Gregorian calendar, Time represents exactly 24 hours (0-23), Minutes represents exactly 60 minutes (0-59), Seconds represents exactly 60 seconds (0-59), and Time may be expressed in UTC.

Years are represented by a four-character code (0001 to 9999). In a variation, leading positive or negative signs before the year are not supported. According to these constraints, the regular expression restricts the character pattern of date and time to the following:

[0-9]{4}–[0-9]{2}–[0-9]{2}T[0-9]{2}[0-9]{2}:[0-9]{2}[0-9]{2}:[0-9]{2}[0-9]{2}(.[0-9]*)?([Z+–][0-9]{2}[0-9]{2}:[0-9]{2}[0-9]{2})?

Nevertheless, meaningless data such as 0000-00-00T00:00Z can be represented by this regular expression. However, explicit restrictions mean that this is not possible for the built-in data type “xsd: dateTime”.

GDT DateTime 11500 is used for exact time stamps that contain the day and time. For example, creation date/time, receipt date/time, processing date/time, delivery date/time, expiry date/time, and the like.

The primary representation term for the CCT “DateTime” is DateTime. Additional secondary representation terms are Date, which represents a calendar value for a single day and has a built-in data type xsd: date and a length of 10, and Time, which represents a to-the-second time value and has a built-in data type xsd: time.

In the case of a business transaction, DateTime may arise in a specific business role. In the element name, these roles are placed in front of the term “DateTime”, whereby additional context-specific qualifiers may also be added. For example, PlannedArrivalDateTime is a date/time of a planned arrival.

Times that are relevant in logistics execution are described in their logistical sequence in the table below. Further roles of DateTime are also described in alphabetical order.

| DateTime Role | English Name | Definition |
|---|---|---|
| PositioningDateTime | Material availability date/time | Date/time at which goods are made available for packing and picking. |
| IssueDateTime | Issue date/time | Date/time at which something is issued. |
| PickingDateTime | Picking date/time | Date/time at which goods are picked. |
| PackingDateTime | Packing date/time | Date/time at which goods are packed. |
| CarrierHandoverDateTime | Date/time of handover to the carrier | Date/time at which something is handed over to the carrier. |
| PickupDateTime | Pickup date/time | Date/time at which goods are picked up. |
| LoadingDateTime | Loading date/time | Date/time at which goods are loaded. |
| YardDepartureDateTime | Date/time when something leaves the yard | Date/time of departure of a closed area outside the warehouse in which vehicles are loaded and unloaded. |
| ArrivalDateTime | Arrival date/time | Date/time at which something arrives. |
| DeliveryDateTime | Delivery date/time | Date/time at which a delivery takes place. |
| ReceiptDateTime | Receipt date/time | Date/time at which something is received. |
| YardArrivalDateTime | Date/time of arrival in the yard | Date/time of arrival in a closed area outside the warehouse in which vehicles are loaded and unloaded. |
| UnloadingDateTime | Unloading date/time | Date/time at which goods are unloaded. |
| UnpackingDateTime | Unpacking date/time | Date/time at which goods are unpacked. |
| PutawayDateTime | Putaway date/time | Date/time at which goods are put away. |
| AvailabilityDateTime | Availability date/time | Date/time at which something is available. |
| AdvertisementDateTime | Advertisement date/time | Date/time at which something is advertised. |
| ChangeDateTime | Change date/time | Date/time at which something is changed. |
| CreationDateTime | Creation date/time | Date/time at which something is created. |
| ExecutionDateTime | Execution date/time | Date/time at which something is executed. |
| OrderingDateTime | Ordering date/time | Date/time at which an order is expected or takes place. |
| PlannedDateTime | Planned date/time | Date/time for which something is planned. |
| ValidityDateTime | Validity date/time | Date/time at which something is valid. |

The coordinated world time or coordinated universal time (UTC) is the standardized basis for time specifications that are used internationally. It is based on solar time and is an extremely constant time unit. The mean solar time at the Greenwich meridian can be taken as an approximate guide value for UTC. UTC replaced Greenwich Mean Time (GMT) in 1972 as it was more accurate.

The Gregorian calendar is used predominantly in the western world today and is an approximation of the complicated calculation of a tropical year. The length of a mean tropical year is 365.2422 days. The Gregorian calendar determines the rules for leap years and was introduced in 1582.

(cccc) DateTimePeriod

A GDT DateTimePeriod 11600 is a period that is defined by two points in time. These points in time are expressed by time stamps, accurate to the second, together with calendar days. The time period is determined by a start time and an end time, a start time with a duration, or a duration with an end time. An example of GDT DateTimePeriod 11600 is:

```
<ContractValidityPeriod>
    <StartDateTime>2003-03-01T12:00:00</StartDateTime>
    <EndDateTime>2005-06-15T12:00:00</EndDateTime>
</ContractValidityPeriod>.
```

The structure of GDT DateTimePeriod 11600 is depicted in FIG. 116. The GDT DateTimePeriod 11600 includes elements StartDateTime 11606, EndDateTime 11622, and Duration 11638. For GDT Date Time Period 11600, the Object Class is Date Time Period 11602, and the Property is Details 11604.

For GDT Start Date Time 11606, the Category is Element 11608, the Object Class is Date Time Period 11610, the Property term is Start Date Time 11612, the Representation/Association term is Date Time 11614, the Type term is GDT 11616, the Type Name term is Date Time 11618, and the Cardinality is zero or one 11620.

For GDT End Date Time 11622, the Category is Element 11624, the Object Class is Date Time Period 11626, the Property term is End Date Time 11628, the Representation/Association term is Date Time 11630, the Type term is GDT 11632, the Type Name term is Date Time 11634, and the Cardinality is zero or one 11636.

For GDT Duration 11638, the Category is Element 11640, the Object Class is Date Time Period 11642, the Property term is Duration 11644, the Representation/Association term is Duration 11646, the Type term is GDT 11648, the Type Name term is Duration 11650, and the Cardinality is zero or one 11652.

GDT DateTimePeriod 11600 is an aggregation and includes the sub-elements StartDateTime, EndDateTime, and Duration. StartDateTime represents the accurate-to-the-second start time on a calendar day based on the extended representation ISO 8601. EndDateTime represents the accurate-to-the-second end time on a calendar day based on the extended representation ISO 8601.

Duration represents the relative duration based on convention ISO 8601. Other representation conventions for year (nY), month (nM), and day (nD) can be used. One example of duration is <Duration>P1H7M9T12H10M13.3S</Duration>.

The sub-elements in GDT DateTimePeriod 11600 are optional. However, the representation can include one of the following date sets: StartDateTime and EndDateTime, StartDateTime and Duration, and EndDateTime and Duration.

The time stamp (EndDateTime) may be greater than or equal to the start time stamp (StartDateTime) (both accurate to the second). For example, <StartDateTime>2003-03-01T12:00:00</StartDateTime>, <EndDateTime>2005-06-15T18:30:00</EndDateTime>or <StartDateTime>2003-03-01T12:00:00</StartDateTime>, <EndDateTime>2005-03-01T12:00:00</EndDateTime>.

Period can be used to specify a time period and can be expressed using two time stamps (both accurate to the second) or one accurate-to-the-second time stamp and one relative duration. This period might be the validity of a contract, which is expressed by a start and end time.

In the case of a business transaction, DateTimePeriod arises in a specific business role. In the element name, these roles are placed in front of the term Period, whereby additional context-specific qualifiers could also be added, for example, PlannedArrivalPeriod is a period of a planned arrival.

The logistical sequence or the overlapping time periods, which may be relevant in logistical execution, are described in this sequence in the table below. Further roles of DateTimePeriod are then shown in alphabetical order.

| Period Role | English Name | Definition |
|---|---|---|
| TransportPlanningPeriod | Transportation planning period | Period in which transportation planning takes place. |
| PositioningPeriod | Material availability period | Period in which goods are made available for packing and picking. |
| IssuePeriod | Issue period | Period in which something is issued. |
| PickingPeriod | Picking period | Period in which goods are picked. |
| PackingPeriod | Packing period | Period in which goods are packed. |
| CarrierHandoverPeriod | Period for handover to the carrier | Period in which something is handed over to the carrier. |
| PickupPeriod | Pickup period | Period in which goods are picked up. |
| LoadingPeriod | Loading period | Period in which goods are loaded. |
| YardDeparturePeriod | Period when something leaves the yard | Period of departure of a closed area outside the warehouse in which vehicles are loaded and unloaded. |
| ShippingPeriod | Shipping period | Period in which goods are shipped (between ship-from location, ship-to location, and possibly transshipment location). |
| ArrivalPeriod | Arrival period | Period in which something arrives. |
| DeliveryPeriod | Delivery period | Period in which a delivery takes place. |
| ReceiptPeriod | Receipt period | Period in which something is received. |
| YardArrivalPeriod | Period of arrival in the yard | Period of arrival in a closed area outside the warehouse in which vehicles are loaded and unloaded. |
| UnloadingPeriod | Unloading period | Period in which goods are unloaded. |
| UnpackingPeriod | Unpacking period | Period in which goods are unpacked. |
| PutawayPeriod | Putaway period | Period in which goods are put away. |
| AvailabilityPeriod | Availability period | Period in which something is available. |
| AdvertisementPeriod | Advertisement period | Period in which something is advertised. |
| ExecutionPeriod | Execution period | Period in which something is executed. |
| OrderingPeriod | Ordering period | Period in which an order is expected/takes place. |
| PlannedPeriod | Planned period | Period for which something is planned. |
| PlanningPeriod | Planning period | Period in which something is planned. |
| ValidityPeriod | Validity period | Period in which something is valid. |

TransportPlanningPeriod can include PositioningPeriod, PickingPeriod, and PackingPeriod. IssuePeriod can include PickingPeriod, PackingPeriod, LoadingPeriod, and YardDeparturePeriod. PickupPeriod can include LoadingPeriod and YardDeparturePeriod. CarrierHandoverPeriod can include LoadingPeriod, YardDeparturePeriod, and ShippingPeriod. DeliveryPeriod, ArrivalPeriod, and ReceiptPeriod can include YardArrivalPeriod, UnloadingPeriod, UnpackingPeriod, and PutawayPeriod.

The term DateTime in Object Class Term may be obsolete in GDTs. Therefore, this term comprises Period. This is because the term DateTime is given by the sub-elements using Property Term. As a result, the semantic of these GDTs may be unique.

(dddd) DecimalValue

A GDT DecimalValue 11700 is a numeric value represented as a decimal. An example of GDT DecimalValue 11700 is:

```
<PropertyValue>
  <DecimalValue>3.14159</DecimalValue>
</PropertyValue>.
```

The structure of GDT DecimalValue 11700 is depicted in FIG. 117. For the GDT Decimal Value 11700, the Representation/Association Qualifier term is Decimal 11702, the Representation/Association term is Value 11704, the Type term is xsd 11706, and the Type Name term is Decimal 11708.

GDT DecimalValue 11700 is a qualified basic GDT that is based on the secondary Representation/Association Value of the CCT Numeric. GDT DecimalValue 11700 is used if the reference to the decimal representation of the element based on GDT DecimalValue 11700 is both meaningful and desired from a semantic perspective. This is the case with mathematical/scientific and technical numeric values. The Decimal qualifier then forms part of the relevant element name.

Numeric business values may not be defined using their decimal representation; rather, this representation is derived implicitly from the semantics of the numeric value. Examples of this include Price or ExchangeRate. In this case, GDT DecimalValue 11700 is not used.

(eeee) DeletedIndicator

A GDT DeletedIndicator 11800 indicates whether an object has been logically deleted or not. An example of GDT DeletedIndicator 11800 is: <DeletedIndicator>false</DeletedIndicator>.

The structure of GDT DeletedIndicator 11800 is depicted in FIG. 118. For the GDT Deleted Indicator 11800, the Property is Deleted Indicator 11802, the Representation/Association term is Indicator 11804, the Type term is CCT 11806, and the Type Name term is Indicator 11808.

The GDT DeletedIndicator 11800 can have the values true or false. True indicates that the object has been logically deleted. False indicates that the object has not been logically deleted.

In the context of an interface, there may be a description of which object the GDT DeletedIndicator 11800 refers to, its business meaning, and whether a set DeletedIndicator can be canceled in a subsequent message.

(ffff) DeliveryScheduleTypeCode

The GDT DeliveryScheduleTypeCode 11900 is a coded representation of the type of a delivery schedule. This type describes the (business) character of a delivery schedule and defines its fundamental properties. An example of GDT DeliveryScheduleTypeCode 11900 is:

```
<DeliverySchedule>
    <ID>4711</ID>
    <TypeCode>2</TypeCode>
    . . .
</DeliverySchedule>.
```

The structure of GDT DeliveryScheduleTypeCode 11900 is depicted in FIG. 119. For GDT Delivery Schedule Type Code 11900, the Object Class is Delivery Schedule 11902, the Property is Type 11904, the Representation/Association term is Code 11906, the Type term is CCT 11908, the Type Name term is Code 11910, and the Length is one 11912.

The value ranges of the GDT DeliveryScheduleTypeCode 11900 may consist of a proprietary code list. Possible values are 1 or 2. 1 refers to a delivery schedule for the short-, medium- and/or long-term area on the basis of daily, weekly and/or monthly time specifications. 2 refers to a delivery schedule for just-in-time deliveries on the basis of time specifications throughout the day, if necessary, in terms of minutes.

The GDT DeliveryScheduleTypeCode 11900 is used within the scheduling-agreement-based release ordering to communicate the business character of a delivery schedule to a vendor. It may be used, for example, in the automotive industry.

(gggg) DeliveryTerms

The GDT DeliveryTerms 12000 summarizes conditions and agreements formulated at the time of the order that apply for the execution of the delivery and transport of ordered goods and the associated services and activities. An example of GDT DeliveryTerms 12000 is:

```
<DeliveryTerms>
   <DeliveryItemGroupID>123</DeliveryItemGroupID>
   <DeliveryPriorityCode>1</DeliveryPriorityCode>
   <Incoterms>
      <ClassificationCode listID="Incoterms" listVersionID="2000"
listAgencyID="4"> FOB
      </ClassificationCode >
      <TransferLocationName langCode="de"> Hamburg
</TransferLocationName>
   </Incoterms>
   <PartialDelivery>
      <MaximalNumber>9</MaximalNumber>
   </PartialDelivery>
   <QuantityTolerance>
      <OverPercent>33.0</OverPercent>
      <UnderPercent>1.0</UnderPercent>
   </ QuantityTolerance>
   < MaximumLeadTimeDuration> P2M5D
   </ MaximumLeadTimeDuration>
   <Transport>
      <ServiceLevelCode listID="DE 4219" listVersionID="D.02B"
listAgencyID="6"> 1 </ ServiceLevelCode>
      <ModeCode listID="DE 8067" listVersionID="D.02B"
listAgencyID="6"> 1 </ ModeCode>
      <MeansDescriptionCode listID="DE 8179"
listVersionID="D.02B" listAgencyID="6"> 4
      </MeansDescriptionCode>
   <Transport>
   <Description langCode="de">
      This is a German description text.
   </Description>
</DeliveryTerms >.
```

In the above example, ListAgencyID="4" describes "ICC/WBO", ListAgencyID="6" describes "UN/ECE", listVersionID="D.02B" describes UN/EDIFACT standard directory Year 2002, Version B, listID="DE 4219" describes UN/EDIFACT "Transport Service Priority Code", listID="DE 8067" describes UN/EDIFACT "Transport Mode Name Code", listID="DE 8179" describes UN/EDIFACT "Transport Means Description Code", and MaximumLeadTimeDuration=P2M5D describes a duration of 2 months 5 days.

The structure of GDT DeliveryTerms 12000 is depicted in FIG. 120. For GDT Delivery Terms 12000, the Object Class is Delivery Terms 12002 and the Representation/Association term is Details 12004.

For GDT Delivery Item Group ID 12006, the Category is Element 12008, the Object Class is Delivery Terms 12010, the Property is Order Item Group Identification 12012, the Representation/Association term is Identifier 12014, the Type term is GDT 12012, the Type Name term is Business Transaction Document Item Group ID 12014, and the Cardinality is zero or one 12016.

For GDT Delivery Priority Code 12018, the Category is Element 12020, the Object Class is Delivery Terms 12022, the Property is Delivery Priority Code 12024, the Representation/Association term is Code 12026, the Type term is GDT 12028, the Type Name term is Business Transaction Priority Code 12030 and the Cardinality is zero or one 12032.

For GDT Incoterms 12034, the Category is Element 12036, the Object Class is Delivery Terms 12038, the Property is Incoterms 12042, the Representation/Association term is Incoterms 12042, the Type term is GDT 12044, the Type Name term is Incoterms 12046 and the Cardinality is zero or one 12048.

For GDT Partial Delivery 12050, the Category is Element 12052, the Object Class is Delivery Terms 12054, the Property is Partial Delivery 12056, the Representation/Association term is Partial Delivery 12058, the Type term is GDT 12060, the Type Name term is Partial Delivery 12062, and the Cardinality is zero or one 12064.

For GDT Quantity Tolerance 12066, the Category is Element 12068, the Object Class is Delivery Terms 12070, the Property is Quantity Tolerance 12072, the Representation/Association term is Quantity Tolerance 12074, the Type term is GDT 12076, the Type Name term is Quantity Tolerance 12078, and the Cardinality is zero or one 12080.

For GDT Maximum Lead Time Duration 12082, the Category is Element 12084, the Object Class is Delivery Terms 12086, the Property is Maximum Lead Time 12088, the Representation/Association term is Duration 12090, the Type term is GDT 12092, the Type Name term is Duration 12094, and the Cardinality is zero or one 12096.

For GDT Transport 12098, the Category is Element 12099, the Object Class is Delivery Terms 12001A, the Property is Transport 12002A, the Representation/Association term is Details 12003A, and the Cardinality is zero or one 12004A.

For GDT Service Level Code 12005A, the Category is Element 12006A, the Object Class is Transport 12007A, the Property is Service Level Code 12008A, the Representation/Association term is Code 12009A, the Type term is GDT 12010A, the Type Name term is Transport Service Level Code 12011A, and the Cardinality is zero or one 12012A.

For GDT Mode Code 12013A, the Category is Element 12014A, the Object Class is Transport 12015A, the Property is Mode Code 12016A, the Representation/Association term is Code 12017A, the Type term is GDT 12018A, the Type Name term is Transport Mode Code 12019A, and the Cardinality is zero or one 12020A.

For GDT Means Description Code 12021A, the Category is Element 12022A, the Object Class is Transport 12023A, the Property is Means Description Code 12024A, the Representation/Association term is Code 12025A, the Type term is GDT 12026A, the Type Name term is Transport Means Description Code 12027A, and the Cardinality is zero or one 12028A.

For GDT Description 12029A, the Category is Element 12030A, the Object Class is Delivery Terms 12031A, the Property is Description 12032A, the Representation/Association term is Description 12033A, the Type term is GDT 12034A, the Type Name term is Description 12035A, and the Cardinality is zero or one 12036A.

DeliveryItemGroupID is a unique identifier for a group of items to be delivered together. DeliveryPriorityCode is a priority/urgency of the delivery/delivery item according to the requirements of the buyer. Incoterms is a standard contract formula for the terms of delivery. PartialDelivery is the maximum number of partial deliveries that may/can be carried out to deliver the ordered quantity of an item. QuantityTolerance is the tolerated difference between a requested quantity and an actual quantity.

MaximumLeadTimeDuration is the maximum lead time from the time of the order to the receipt of the delivery. This duration can be specified in a contract award or can be agreed upon in a supply contract and defines the binding basis for calculating the latest possible received delivery date for a given order date.

Transport: ServiceLevelCode is in terms of delivery of goods, agreed/defined services concerning the speed of the delivery. Transport: ModeCode describes how the delivery is to be made and the transportation mode to be used for the delivery, but may not define a specific route or means of transport. Transport: MeansDescriptionCode is the means of transport category to be used to move goods or persons. Description is the natural readable text for providing additional information about a delivery/delivery item.

GDT DeliveryTerms 12000 contain detailed information on the agreed delivery conditions (Incoterms), delivery modalities (accepted number of partial deliveries, delivery priority, grouping requests for deliveries, tolerances for quantity deviations) and transport modalities (such as shipping/transport type and means of transport to be used). Moreover, additional information can be specified as freeform text. Specifying an element of the structure may be optional.

Using the information in GDT DeliveryTerms 12000, the involved business partners (buyer and seller) agree on outline conditions for purchase orders regarding the delivery and transportation of the ordered products/goods. They determine and influence the flow of the subsequent logistical processes.

GDT DeliveryTerms 12000 are used at header and item level. A specification at item level overwrites the corresponding specification at header level.

(hhhh) Description

A GDT Description 12100 is natural-language text. An example of GDT Description 12100 is:

```
<OrderDescription langCode="en">
    A character string with a specified language.
</OrderDescription>.
```

The structure of GDT Description 12100 is depicted in FIG. 121. For GDT Description 12100, the Object Class is Description 12102, the Representation/Association term is Text 12104, the Type term is CCT 12106, the Type Name term is Text 12108. The GDT Description 12100 may be restricted 12110.

GDT Description 12100 contains an attribute "languageCode" for determining the appropriate language of the element content. The language code is based on RFC 3066. For GDT Language Code 12112, the Category is A 12114, the Object Class is Description 12116, the Property is Language Code 12118, the Representation/Association term is Code 12120, the Type term is xsd 12122, the Type Name term is Language 12124, and the Cardinality is one 12126.

GDT Description 12100 may be used for handling information, readable additional information on the structured information, or descriptions of services and products.

The character length of GDT Description 12100 may not defined and would therefore be system-dependent. In a variation, GDT Description 12100 may not be used for transmitting proprietary control information, coded and mutually agreed on values, detailed descriptions of values that could otherwise be represented as coded values or identifiers, or numerical values.

(iiii) DigitNumberValue

A GDT DigitNumberValue 12200 is the number of digits used to represent a real value or whole number. An example of GDT DigitNumberValue 12200 is: <DigitNumberValue>7</DigitNumberValue>.

The structure of GDT DigitNumberValue 12200 is depicted in FIG. 122. For GDT Digit Number Value 12200, the Representation/Association Qualifier term is Digit Number 12202, the Representation/Association term is Value 12204, the Type term is xsd 12206, the Type Name term is non Negative Integer 12208, and the Length is from one to two 12210.

GDT DigitNumberValue 12200 is a qualified basic GDT based on the secondary Representation/Association Value of the CCT Numeric and a restriction of xsd: decimal. Non-negative whole numbers less than one hundred may be permitted.

GDT DigitNumberValue 12200 may be used to describe the format for representing decimal values (e.g., total number of digits, number of decimal places) or floating point numbers (e.g., mantissa length).

(jjjj) DirectMaterialIndicator

A GDT DirectMaterialIndicator 12300 indicates whether a material is used as a direct material in the context of a process or not. A direct material is a product of the type "material" that is used directly in the production of products and that affects the value of the finished product in terms of manufacturing costs. An example of DirectMaterialIndicator is: <DirectMaterialIndicator>true</DirectMaterialIndicator>.

The structure of GDT DirectMaterialIndicator 12300 is depicted in FIG. 123. For GDT Direct Material Indicator 12300, the Property is Direct Material Indicator 12302, the Representation/Association term is Indicator 12304, the Type term is CCT 12306 and the Type Name term is Indicator 12308.

The GDT DirectMaterialIndicator 12300 can have the values true or false. True indicates that a material is used as a direct material in the context of a process. False indicates that a material is not used as a direct material in the context of a process. The GDT DirectMaterialIndicator 12300 is to be used for products of type "material."

The GDT DirectMaterialIndicator 12300 may be used to indicate whether a material or material type listed in a purchase order item is used as a direct material in the context of a process. In a variation, the DirectMaterialIndicator is not an attribute of a material. A material can be treated as a direct material in some processes and not in others.

The context to which the DirectMaterialIndicator refers may be identified from the usage of the GDT.

(kkkk) DunningCounterValue

A GDT DunningCounterValue 12400 is the number of dunning notices sent. An example of GDT DunningCounterValue 12400 is: <DunningCounterValue>2</DunningCounterValue>.

The structure of GDT DunningCounterValue 12400 is depicted in FIG. 124. For GDT Dunning Counter Value 12400, the Object Class is Dunning 12402, the Property is Counter 12404, the Representation/Association term is Value 12406, the Type term is GDT 12408 and the Type Name term is Counter Value 12410.

In a variation, non-negative, whole number values are permitted for GDT DunningCounterValue 12400.

GDT DunningCounterValue 12400 specifies the number of dunning notices that have been sent to one or more business partners in a specified period with regard to one or more receivables. In a company, for example, this information is sent from Current Account Accounting to Credit Management.

Several dunning notices can exist for a receivable. These dunning notices are also grouped by dunning level (DunningLevelValue). However, the dunning level does not have to increase automatically each time a dunning notice is sent.

(llll) DunningLevelValue

A GDT DunningLevelValue 12500 is the level of intensity with which a party is urged to pay existing receivables. An example of GDT DunningLevelValue 12500 is: <DunningLevelValue>4</DunningLevelValue>.

The structure of GDT DunningLevelValue 12500 is depicted in FIG. 125. For GDT Dunning Level Value 12500, the Object Class is Dunning 12502, the Property is Level 12504, the Representation/Association term is Value 12506, the Type term is CCT 12508, the Type Name term is Numeric 12510, and the Length is one 12512.

Non-negative, whole number values from 0 to a maximum value may be permitted for GDT DunningLevelValue 12500. Also, the maximum value may not exceed 9. For the dunning level, the following linear order applies: 0<1<2< . . . <maximum value.

The GDT DunningLevelValue 12500 conveys the relative intensity of a dunning notice based on a linear integer scale between zero and a specified maximum value.

Dunning is a process for contacting customers to collect unpaid bills. It generally starts at the first level with a payment reminder and progresses to dunning notices and even threats as payments become more overdue. Overall, dunning levels are first regulated and prescribed by country-specific laws. Within the scope of the statutory regulations, however, a dunning company can also define several additional dunning levels that differ in the form of the dunning notice, e.g., a friendly payment reminder at level 1 and a more abrupt payment reminder at level 2.

The GDT DunningLevelValue 12500 may not define a DunningLevelCode that is then used to define the semantics of individual dunning levels. Since these semantics can differ from country to country and company to company, a DunningLevelCode can be defined using additional attributes such as schemeAgencyID. In contrast, the use of the GDT DunningLevelValue 12500 presupposes that the semantic of a conveyed dunning level is either known to the sender and recipient or is not relevant in the given context.

(mmmm) Duration

A GDT Duration 12600 is a period of time of a particular length without a fixed start or end time. This period of time is expressed in years, months, days, hours, minutes, seconds, and fractions of a second. An example of GDT Duration 12600 is: <TravelDuration>PT23H12M</TravelDuration>.

The structure of GDT Duration 12600 is depicted in FIG. 126. For GDT Duration 12600, the Property is Duration 12602, the Representation/Association term is Date Time 12604, the Type term is xsd 12606, and the Type Name term is Duration 12608.

GDT Duration 12600 is based on the "built-in data type" of W3C xsd: duration. This is structured according to the extended representation of ISO 8601. The representation of GDT Duration 12600 is PnYnMnDTnHnMnS, for example, P12Y12M2DT4H12M40S. The representation uses the literals P for the duration and may precede every duration value, nY for duration in years, nM for the duration in months, nD for the duration in days, T for the time period in hours, minutes, and seconds. nH for the duration in hours, nM for the duration in minutes, nS for the duration in seconds. nS may also be substituted with n.nnnS where the decimal point precedes fractions of seconds. Tenths (nS), hundredths (nS), and thousandths (nnnS) of a second can be shown. The number prefix (n) in each case is the duration in fractions of a second.

Time values that are not required may not be represented. For example, P12Y1M. When hours, minutes, and/or seconds are represented, "T" may precede the time values. For example, PT23H12M or P3Y1MT9H.

GDT Duration 12600 describes a time period with a particular length of an event or process. For instance, working time, duration of stay, or processing time. However, it may not be dependent on a fixed point in time.

(nnnn) EmailAddress

A GDT EmailAddress 12700 is the abbreviation for Electronic Mail Address and represents a digital and unique address in a mailbox system. An example of GDT EmailAddress 12700 is:

```
><EmailAddress>
    mailto:gunther.stuhec@sap.com
</EmailAddress.
```

The structure of GDT EmailAddress 12700 is depicted in FIG. 127. The GDT EmailAddress 12700 includes attribute protocolCode 12714. For GDT Email Address 12700, the Object Class is Email 12702, the Property is Address 12704, the Representation/Association term is Electronic Address 12706, the Type term is CCT 12708, the Type Name term is Electronic Address 12710. The GDT Email Address 12700 may be restricted 12712.

For GDT Protocol Code 12714, the Category is Attribute 12716, the Object Class is Email 12718, the Property is Protocol 12720, the Representation/Association term is Code 12722, the Type term is xsd 12724, the Type Name term is Token 12726, the Cardinality is zero or one 12728. The GDT Protocol Code 12714 is in default: EM (smtp) 12730.

The element content for GDT EmailAddress 12700 is structured using URL conventions. The syntax is specified in the IETF RFC 2396 recommendation. The additional attribute "protocolCode" is not necessary. The scheme is the uriType "mailto:." The part following the colon is the scheme-specific part that represents the respective email address.

If the email address is not based on the SMTP address, another URI scheme according to the IETF RFC 2717 specifications can be applied or the relevant email address can be indicated by an additional "protocolCode" attribute.

Various codes may be used for protocolCode for specification of an address representation of a particular message protocol. For this email address type, the codes from the UN/EDIFACT DE 3155 "Communication Address Code Qualifier" code list may be used. It is not necessary to state the attribute because "EM" is the default value for the SMTP protocol. The main codes are AB (SITA), AD (AT&T mailbox), AF (U.S. Defense Switched Network), AN (ODETTE File Transfer Protocol), AO (Uniform Resource Location), EI (EDI transmission), EM (Electronic Mail Exchange of mail by electronic means), FT (File transfer access method according to ISO), GM (General Electric Information Service), IM (Internal mail), SW (S.W.I.F.T.) and XF (X.400 address).

(oooo) EvaluatedReceiptSettlementIndicator

An GDT EvaluatedReceiptSettlementIndicator 12800 indicates whether the evaluated receipt settlement (ERS) procedure is to be used for settlement or not. An example of GDT EvaluatedReceiptSettlementIndicator 12800 is: <EvaluatedReceiptSettlementIndicator>false</EvaluatedReceiptSettlementIndicator>.

The structure of GDT EvaluatedReceiptSettlementIndicator 12800 is depicted in FIG. 128. For GDT Evaluated Receipt Settlement Indicator 12800, the Property Qualifier term is Evaluated Receipt 12802, the Representation/Association term is Settlement 12804, the Type term is CCT 12806 and the Type Name term is Indicator 12808.

The GDT EvaluatedReceiptSettlementIndicator 12800 can have the values true or false. True indicates that the evaluated receipt settlement (ERS) procedure is to be used for settlement. False indicates the evaluated receipt settlement (ERS) procedure shall not be used for settlement.

In the ERS procedure, payment is made directly on receipt of the goods, without the need for an invoice.

(pppp) ExchangeRate

GDT ExchangeRate 12900 is the representation of an exchange rate between two currencies. An example of GDT ExchangeRate 12900 is:

```
<ExchangeRate>
<UnitCurrency>EUR</UnitCurrency>
<QuotedCurrency>USD</QuotedCurrency>
  <Rate>1.1234</Rate>
</ExchangeRate>.
```

The structure of GDT ExchangeRate 12900 is depicted in FIG. 129. The GDT ExchangeRate 12900 includes elements UnitCurrency 12906, QuotedCurrency 12922, Rate 12938, and QuotationDateTime 12956. For GDT Exchange Rate 12900, the Object Class is Exchange Rate 12902 and the Representation/Association term is Details 12904.

For GDT Unit Currency 12906, the Category is Element 12908, the Object Class is Exchange Rate 12910, the Property is Unit Currency 12912, the Representation/Association term is Code 12914, the Type term is GDT 12916, the Type Name term is Currency Code 12918, and the Cardinality is one 12920.

For GDT Quoted Currency 12922, the Category is Element 12924, the Object Class is Exchange Rate 12926, the Property is Quoted Currency 12928, the Representation/Association term is Code 12930, the Type term is GDT 12932, the Type Name term is Currency Code 12934, and the Cardinality is one 12936.

For GDT Rate 12938, the Category is Element 12940, the Object Class is Exchange Rate 12942, the Property is Rate 12944, the Representation/Association term is Rate 12946, the Type term is xsd 12948, the Type Name term is Decimal 12950, the Length is fourteen 12952, and the Cardinality is one 12954.

For GDT Quotation Date Time 12956, the Category is Element 12958, the Object Class is Exchange Rate 12960, the Property is Quotation Date Time 12962, the Representation/Association term is Date Time 12964, the Type term is GDT 12966, the Type Name term is Date Time 12968, and the Cardinality is zero or one 12970.

UnitCurrency refers to the "Leading currency." QuotedCurrency refers to the "Following currency." Rate refers to the exchange rate between these currencies. This corresponds to the price at which one unit of the currency UnitCurrency can be changed into the currency QuotedCurrency. QuotationDateTime refers to the exchange rate date and time when the exchange rate was defined. Specifying an exchange rate date may be optional.

One example use of GDT ExchangeRate 12900 is when an incoming invoice was received with currency Dollar. A different currency is to be used for the payment. The GDT ExchangeRate 12900 between invoice and payment currency may be transmitted to the Payment System. Another example is when current exchange rates are transmitted to an ERP system daily from a provider such as Reuters.

The exchange rate is calculated using the formula: 1 UnitCurrency=Rate*QuotedCurrency.

(qqqq) ExponentialRepresentationTypeCode

The GDT ExponentialRepresentationTypeCode 13000 is a coded representation for how a number is displayed in exponential form in base 10. An example of GDT ExponentialRepresentationTypeCode 13000 is: <ExponentialRepresentationTypeCode>1</ExponentialRepresentationTypeCode>.

The structure of GDT ExponentialRepresentationTypeCode 13000 is depicted in FIG. 130. For GDT Exponential Representation Type Code 13000, the Object Class is Exponential Representation Type 13002, the Representation/Association term is Code 13004, the Type term is CCT 13006, the Type Name term is Code 13008, the Length is one 13010. The GDT Exponential Representation Type Code 13000 may be restricted 13012.

An exponential form in base 10 comprises the mantissa, as a real number with predecimal and decimal places, and a whole number exponent for base 10, where the mantissa and exponent are separated by "E-". In English, the mantissa is specified with a decimal point and a comma is used for thousands.

GDT ExponentialRepresentationTypeCode 13000 can have the values 1, 2 or 3. 1 means exactly one predecimal place in the mantissa. 2 means one fixed predefined exponent. 3 means a maximum of three predecimal places in the mantissa. If the template is exceeded when code 3 is used, the exponent is increased by 3.

The GDT ExponentialRepresentationTypeCode 13000 regulates the format of an exponential number (e.g., on a monitor or printout) but does not affect the technical representation when data is transferred or stored. The format is not a function of the user, but of the purpose and consequently of the instance of the data type.

The GDT ExponentialRepresentationTypeCode 13000 corresponds to the coding for the exponential representation type in R/3 classification. In the case of code 2, the GDT PropertyDataType may also contain an additional attribute, which contains the value of the exponent.

(rrrr) FixedIndicator

A GDT FixedIndicator 13100 indicates whether a value/object is fixed or not. 'Fixed' means that the value/object is limited in its use, for example, it may not be changed. An example of GDT FixedIndicator 13100 is: <FixedIndicator>true</FixedIndicator>.

The structure of GDT FixedIndicator 13100 is depicted in FIG. 131. For GDT Fixed Indicator 13100, the Property is Fixed 13102, the Representation/Association term is Indicator 13104, the Type term is CCT 13106 and the Type Name is Indicator 13108.

GDT FixedIndicator 13100 can have the values true or false. True indicates a value/object is fixed. False indicates a value/object is not fixed. The business meaning of the fixing may be specified in the context of the interface.

(ssss) FloatValue

A GDT FloatValue 13200 is a numeric value represented as a floating point number. An example of GDT FloatValue 13200 is:

```
<PropertyValue>
    <FloatValue>6.02214E+23</FloatValue>
</PropertyValue>.
```

The structure of GDT FloatValue 13200 is depicted in FIG. 132. For GDT Float Value 13200, the Representation/Association Qualifier term is Float 13202, the Representation/Association term is Value 13204, the Type term is xsd 13206, the Type Name term is Float 13208.

GDT FloatValue 13200 is a qualified basic GDT based on the secondary Representation/Association Value of the CCT Numeric. GDT FloatValue 13200 is used if the explicit reference to the floating point representation of the element based on GDT FloatValue 13200 is both meaningful and desired from a semantic perspective. This is the case with mathematical and technical numeric values. The Float qualifier then becomes part of the element name.

Numeric business values are not generally defined using their floating point representation. Instead, this representation derives implicitly from the semantics of the numeric value. An example of this is Measure. FloatValue is not used if this is the case.

(tttt) FollowUpBusinessTransactionDocumentRequirementCode

The GDT FollowUpBusinessTransactionDocumentRequirementCode 13300 is a coded representation of the need for a follow-up document. An example of GDT FollowUpBusinessTransactionDocumentRequirementCode 13300 is: <FollowUpInvoiceRequirementCode>01</FollowUpInvoiceRequirementCode>.

The structure of GDT FollowUpBusinessTransactionDocumentRequirementCode 13300 is depicted in FIG. 133. For GDT FollowUp Business Transaction Document Requirement Code 13300, the Object Class Qualification term is Follow Up 13302, the Object Class is Business Transaction Document 13304, the Property is Requirement 13306, the Representation/Association term is Code 13308, the Type term is CCT 13310, the Type Name term is Code 13312, and the Length is 2 13314. The GDT FollowUp Business Transaction Document Requirement Code 13300 Enumeration="01 02 03 04 05" 13316.

The GDT FollowUpBusinessTransactionDocumentRequirementCode 13300 can have the values 01 through 05. 01 means the follow-up document is required in the subsequent process. 02 means the follow-up document is expected in the subsequent process, but optional. 03 means the follow-up document may be optional. 04 means the follow-up document is not expected, but can be received and processed. 04 means the follow-up document is forbidden, therefore it cannot be received or processed.

The GDT FollowUpDocumentRequirementCode 13300 is used to control the exchange of documents within a business process at runtime. It may refer from the context in which it is used to a follow-up document. When the GDT is used in a document, “BusinessTransactionDocument” is replaced by the respective follow-up document, for example, Invoice. A default procedure may be specified every time a GDT FollowUpBusinessTransactionRequirementCode 13300 is used.

For example in an order process, the buyer uses a GDT FollowUpDocumentRequirementCode 13300 in the purchase order to specify that an order confirmation is “unexpected.” This means that the buyer does not expect a confirmation as part of the business transaction but is able to receive and file a confirmation.

The GDT FollowUpBusinessTransactionDocumentRequirementCode 13300 may be a proprietary code list with fixed predefined values. Changes to the permitted values involve changes to the interface.

In addition to the GDT FollowUpBusinessTransactionDocumentRequirementCode 13300, which refers to follow-up documents, there is also a GDT FollowUpMessageRequirementCode, which refers to follow-up messages. When used in a message, a check may be performed to determine which of these GDTs may be used.

(uuuu) FollowUpMessageRequirementCode

The GDT FollowUpMessageRequirementCode 13400 is a coded representation of the necessity of a follow-up message. An example of GDT FollowUpMessageRequirementCode 13400 is: <FollowUpInvoiceRequestRequirementCode>01</FollowUpInvoiceRequestRequirementCode>.

The structure of GDT FollowUpMessageRequirementCode is 13400 depicted in FIG. 134. For GDT FollowUp Message Requirement Code 13400, the Object Class Qualification term is Follow Up 13402, the Object Class is Message 13404, the Property is Requirement 13406, the Representation/Association term is Code 13408, the Type term is CCT 13410, the Type Name term is Code 13412, and the Length is 2 13414. The GDT FollowUp Message Requirement Code 13400 may be restricted 13416.

GDT FollowUpMessageRequirementCode 13400 can have the values 01 through 05. 01 means the follow-up message is necessary in the subsequent process. 02 means the follow-up message is expected in the subsequent process, but is optional. 03 means the follow-up message may be optional. 04 means the follow-up message is not expected, but can be received and processed. 05 means the follow-up message is forbidden, therefore it cannot be received or processed.

The GDT FollowUpMessageRequirementCode 13400 is used to control the exchange of messages within a business process at runtime. It may always refer from the context in which it is used to a follow-up message. When the GDT is used in a document, “Message” is replaced by the respective follow-up message, for example, InvoiceRequest. The follow-up message names that are permitted are listed in the GDT: MessageTypeCode.

A default procedure may be specified every time a GDT FollowUpMessageRequirementCode 13400 is used. For example, in an order process, the buyer uses a GDT FollowUpMessageRequirementCode 13400 in the purchase order to specify that an order confirmation is “unexpected.” This means that the buyer does not expect an confirmation as part of the business transaction but is able to receive and file a confirmation.

The GDT FollowUpMessageRequirementCode 13400 may be a proprietary code list with fixed predefined values. Changes to the permitted values involve changes to the interface.

In addition to the GDT FollowUpMessageRequirementCode 13400, which refers to follow-up messages, there is also a GDT FollowUpBusinessTransactionDocumentRequirementCode, which refers to follow-up documents. When used in a message, a check may be performed to determine which of these GDTs may be used.

(vvvv) GeoCoordinates

GDT GeoCoordinates 13500 contain the geographic data, in other words longitude and latitude specified as per the WGS84 reference system, which enables one to determine a position on the globe. An example of GDT GeoCoordinates 13500 is:

```
<GeoCoordinates>
   <LatitudeMeasure unitCode="DD">40.23232300000
   </LatitudeMeasure>
   <LongitudeMeasure
unitCode="DD">123.12121200000</LongitudeMeasure>
</GeoCoordinates>.
```

In the above example, the unitCode “DD” corresponds to the unit degree of an angle.

The structure of GDT GeoCoordinates 13500 is depicted in FIG. 135. The GDT GeoCoordinates 13500 includes elements LatitudeMeasure and Longitude Measure. For GDT GeoCoordinates 13500, the Object Class is GeoCoordinates 13502, the Representation/Association term is Details 13504.

LatitudeMeasure refers to the geographic latitude in degrees. The degrees unit of measurement is specified by the attribute “unitCode.” For GDT Latitude Measure 13506, the Category is E 13508, the Object Class is GeoCoordinates 13510, the Property is Latitude 13512, the Representation/Association term is Measure 13514, the Type term is GDT 13516, the Type Name term is Measure 13518, the Cardinality is one 13520.

LongitudeMeasure refers to the Geographic longitude in degrees. The degrees unit of measurement is specified by the attribute “unitCode.” For GDT Longitude Measure 13522, the Category is E 13524, the Object Class is GeoCoordinates 13526, the Property is Longitude 13528, the Representation/Association term is Measure 13530, the Type term is GDT 13532, the Type Name term is Measure 13534, the Cardinality is one 13536.

In general, southern latitudes are negative and northern latitudes are positive. Western longitudes are negative and eastern longitudes are positive. It is also not necessary to use the positive sign (+) for positive values. Negative values may have a negative sign (−) for a prefix.

The specification of longitude and latitude corresponds to spherical coordinates. The definition range for LatitudeMeasure is −90 to +90. The definition range for LongitudeMeasure is −180 to +180. Specifications outside the definition range, for example, +190 for longitude or −100 for latitude, may result in an error.

GDT GeoCoordinates 13500 may be used in the field of transport planning. The geodata are determined from the address data of a customer to calculate the time required for transport, the distance to be covered, and the speed of the means of transport used.

Another usage is may be to locate suitable garages in the case of an accident or breakdown in a specific area. The garages are geo-coded using their addresses and are available for such an enquiry.

(wwww) HandlingUnit

A HandlingUnit 13600 is a physical unit of packaging materials (load carrier, additional packaging materials) and the packaged products (type "Material"). An example of HandlingUnit 13600 is:

Example 1

Handling Unit with a Load of 10 Boxes of a Product

```
<HandlingUnit>
    <ID>4711</ID>
    <LoadCarrier>
        <Product>
            <StandardID
schemeAgencyID="DUNS">123456789</StandardID>
</Product>
    </LoadCarrier>
    <Load>
        <BusinessTransactionDocumentReference>
            <ItemID>LF800001</ItemID>
        </BusinessTransactionDocumentReference>
        <Quantity unitCode="CT">10</Quantity>
    </Load>
</HandlingUnit>.
```

Example 2

Handling Unit with Lower-Level Handling Unit

```
<HandlingUnit>
    <ID>4712</ID>
    <LoadCarrier>
        <Product> . . . </Product>
    </LoadCarrier>
    <LowerLevelHandlingUnit>
        <ID>4711</ID>
    </LowerLevelHandlingUnit>
</HandlingUnit>.
```

The structure of HandlingUnit 13600 is depicted in FIG. 136. For Handling Unit 13600, the Object Class is Handling Unit 13602, the Representation/Association term is Details 13604.

ID identifies the handling unit. For ID 13606, the Object Class is Handling Unit 13608, the Property is Identification 13610, the Representation/Association term is Identifier 13612, the Type term is GDT 13614, the Type Name term is Identifier 13616, the Length is from one to twenty 13618, and the Cardinality is one 13620.

LoadCarrier refers to the device with which physical objects can be stored or transported. Examples of load carriers include crates, nestings, containers, mesh box pallets, and pallets. For Load Carrier 13622 the Object Class is Handling Unit 13624, and the Cardinality is one 13626.

LoadCarrierProduct refers to the product ID of the load carrier. For Product 13626, the Object Class is Load Carrier 13628, the Property is Product 13630, the Type term is GDT, the Type Name term is Business Transaction Document Production 13632, and the Cardinality is one 13634. The Product 13626 maybe restricted 13636.

HeightMeasure refers to the height of the handling unit. For Height Measure 13638, the Object Class is Handling Unit 13640, the Property Qualifier term is Height 13642, the Property is Measure 13644, the Representation/Association term is Measure 13646, the Type term is GDT 13648, the Type Name term is Measure 13650, the Length is maximum 19 predecimal and 6 decimal digits 13652, and the Cardinality is zero or one 13654.

LengthMeasure refers to the length of the handling unit. For Length Measure 13656, the Object Class is Handling Unit 13658, the Property Qualifier term is Length 13660, the Property is Measure 13662, the Representation/Association term is Measure 13664, the Type term is GDT 13666, the Type Name term is Measure 13668, the Length is maximum 19 predecimal and 6 decimal digits 13670, and the Cardinality is zero or one 13672.

WidthMeasure refers to the width of the handling unit. For Width Measure 13674, the Object Class is Handling Unit 13676, the Property Qualifier term is Width 13678, the Property is Measure 13680, the Representation/Association term is Measure 13682, the Type term is GDT 13684, the Type Name term is Measure 13686, the Length is maximum 19 predecimal and 6 decimal digits 13688, and the Cardinality is zero or one 13690.

HandlingUnit refers to the total volume of the load carrier for a closed load carrier (wire basket) or total of packaging material and the contents for open packaging materials (pallets). For HandlingUnit 13692, the Object Class is Handling Unit 13694, the Property Qualifier term is Length 13696, the Property is Measure 13698, the Representation/Association term is Measure 13699, the Type term is GDT 13601, the Type Name term is Measure 13602A, the Length is maximum 19 predecimal and 6 decimal digits 13603A, and the Cardinality is zero or one 13604A.

GrossWeightMeasure refers to the total weight of packaging material and complete contents. For Gross Weight Measure 13605A, the Object Class is Handling Unit 13606A, the Property Qualifier term is Weight 13607A, the Property is Measure 13608A, the Representation/Association term is Measure 13609A, the Type term is GDT 13610A, the Type Name term is Measure 13611A, the Length is maximum 19 predecimal and 6 decimal digits 13612A, and the Cardinality is zero or one 13613A.

AdditionalPackaging refers to additional packaging materials. Together with the load carrier used, these are intended for fulfilling the requirements of the materials to be packed in terms of fixing, securing, and filling. With the load carrier, they constitute the packaging of a handling unit (examples: lid, intermediate layers, frames, shrink-wrap, padding material). For Additional Packaging 13614A, the Object Class is Handling Unit 13615A, and the Cardinality is from zero to n 13616A.

AdditionalPackaging Product refers to the product ID of a packaging material/additional packaging material. For Product 13616A, the Object Class is Additional Packaging 13617A, the Property is Product 13618A, the Type term is GDT 13619A, the Type Name term is Business Transaction Document Product 13620A, and the Cardinality is one 13621A. The Product 13616A may be restricted 13622A.

For Quantity 13623A, the Object Class is Additional Packaging 13624A, the Property is Quantity 13625A, the Property/Association term is Quantity 13626A, the Type term is GDT 13627A, the Type Name term is Quantity 13628A, the Length is maximum 19 predecimal and 6 decimal digits 13629A, and the Cardinality is one 13630A.

AdditionalPackaging Quantity refers to the quantity of a packaging material/additional packaging material used in the specified handling unit.

A handling unit can consist of an empty load carrier. It is therefore beneficial to specify the HandlingUnitID and the load carrier, whereas packed products (loads), lower-level handling units, packaging materials, and additional packaging materials are optional. LowerLevelHandlingUnit refers to a lower-level handling unit for displaying a hierarchy of handling units. For Lower Level Handling Unit 13631A, the Object Class is Handling Unit 13632A, and the Cardinality is from zero to n 13633A.

For ID 13634A, the Object Class is Lower Level Handling Unit 13635A, the Property is Identification 13636A, the Representation/Association term is Identifier 13637A, the Type term is GDT 13638A, the Type Name term is Handling Unit ID 13639A, the Length is from one to twenty 13640A, and the Cardinality is one 13641A.

Load refers to the load (quantity of a product) packed in the specified handling unit without lower-level handling units. The load in a handling unit is characterized by referencing the item in a business document that contains information about the type and quantity of a product. For Load 13642A, the Object Class is Handling Unit 13643A, the Property is Load 13644A, and the Cardinality is from zero to n 13645A.

LoadBusinessTransactionDocumentReference is a reference to the item in a business document that contains more specific details to the load packed in the handling unit. For Business Transaction Document Reference 13645A, the Object Class is Load 13646A, the Property is Business Transaction Document 13647A, the Type term is GDT 13648A, the Type Name term is Business Transaction Document Reference 13649A, the Cardinality is one 13650A.

For ID 13651A, the Object Class is Business Transaction Document 13652A, the Property is Identification 13653A, the Representation/Association term is Identifier 13654A, the Type term is GDT 13655A, the Type Name term is Business Transaction Document ID 13656A, the Length is from one to thirty-five 13657A, and the Cardinality is zero or one 13658A.

For Item ID 13659A, the Object Class is Business Transaction Document Item 13660A, the Property is Identification 13661A, the Representation/Association term is Identifier 13662A, the Type term is GDT 13663A, the Type Name term is Business Transaction Document Item ID 13664A, the Length is from one to ten 13665A, and the Cardinality is one 13666A.

AdditionalPackaging Quantity refers to the quantity of a packaging material/additional packaging material used in the specified handling unit.

LoadQuantity refers to the quantity of the load packed in the specified handling unit without lower-level handling units. For Quantity 13666A, the Object Class is Load 13667A, the Property is Quantity 13668A, the Representation/Association term is Quantity 13669A, the Type term is GDT 13670A, the Type Name term is Quantity 13671A, the Length is from maximum 19 predecimal and 6 decimal digits 13672A, and the Cardinality is one 13673A.

In a variation, the product quantity in the referenced item is not less than the LoadQuantity specified in the HandlingUnit 13600. If the business document referenced in the handling unit directly concerns the document in which the handling unit is used, the identification of the business document (but not of the item) can be left out.

HandlingUnit 13600 maps the packaging/packaging hierarchy of products. The HandlingUnit 13600 simplifies logistics processes: It enables the production- or sales-controlled combination of various products/same products with inconsistent packaging sizes in physical storage units or delivery units; and, using the link to batch numbers and serial numbers, it enables an improved logistical check, which may be necessary for effective processing.

The structure of the GDTs HandlingUnit 13600 is compatible with the "packaging" in the DELVRY03 IDoc. A handling unit has a unique scannable identification number that can be used to call up data for the handling unit.

(xxxx) Incoterms

GDT Incoterms 13700 are commercial contract formulae for the delivery conditions that correspond to the rules compiled by the International Chamber of Commerce (ICC). An example of Incoterms is:

```
<Incoterms>
    <ClassificationCode>FOB</ClassificationCode>
    <TransferLocationName>Hamburg</TransferLocationName>
</Incoterms>.
```

The structure of GDT Incoterms 13700 is depicted in FIG. 137. The GDT Incoterms 13700 includes elements ClassificationCode and TransferLocationName. For GDT Incoterms 13700, the Object Class is Incoterms 13702 and the Representation/Association term is Details 13704.

ClassificationCode refers to the coded representation of the internationally used abbreviation for characterizing delivery conditions. ClassificationCode is a three-character field and can accept the values EXW (Ex Works), FCA (Free Cargo), FAS (Free Alongside Ship), FOB (Free on Board), CFR (Cost & Freight), CIF (Cost, Insurance & Freight to named destination), CPT (Freight, Carriage paid to destination), CIP (Freight, Carriage, Insurance to destination), DAF (Delivery at frontier—Named place), DES (Delivered Ex Ship—Named port of destination), DEQ (Delivered Ex Quay—Duty paid, Named port), DDU (Delivered duty unpaid to destination), DDU (Delivered duty unpaid to destination). For Classification Code 13706, the Category is E 13708, the Object Class is Incoterms 13710, the Property is Classification 13712, the Representation/Association term is Code 13714, the Type term is CCT 13716, the Type Name term is Code 13718, the Length is three 13720, and the Cardinality is one 13722. The Classification Code 13706 may be restricted 13724.

TransferLocationName refers to a place (place, port of shipment, port of destination, place of destination) to which the above code refers. For example, it may refer to the port of shipment in the case of FOB. For Transfer Location Name 13726, the Category is Element 13728, the Object Class is Incoterms 13730, the Property is Transfer Location Name 13732, the Representation/Association term is Name 13734, the Type term is GDT 13736, the Type Name term is Name 13738, the Length is from one to twenty-eight 13740, and the Cardinality is zero or one 13742. The Transfer Location Name 13726 may be restricted 13744.

GDT Incoterms 13700 are used in the transmission of an order to establish the delivery conditions agreed upon by the business partners.

(yyyy) InformationOutdatedIndicator

A GDT InformationOutdatedIndicator 13800 indicates whether information is outdated or not. An example of GDT InformationOutdatedIndicator 13800 is: <InformationOutdatedIndicator>false</InformationOutdatedIndicator>.

The structure of GDT InformationOutdatedIndicator 13800 is depicted in FIG. 138. For GDT Information Outdated Indicator 13800, the Object Class is Information 13802, the Property is OutdatedIndicator 13804, the Representation/Association term is Indicator 13806, the Type term is CCT 13808, and the Type Name term is Indicator 13810.

The GDT InformationOutdatedIndicator 13800 can have the values true or false. True indicates that information contained in the message is outdated. False indicates that information contained in the message is not outdated.

One example is the purchase order information message, which also contains confirmed quantities and deadlines. The InformationOutdatedIndicator indicates whether the confirmed quantities and deadlines relate to the current PO information or whether the PO has been changed since the last confirmation was received.

It may be clear from the context of the interface which information is outdated. This can be done by extending the name (e.g., ConfirmationInformationOutdatedIndicator).

(zzzz) IntegerValue

An GDT IntegerValue 13900 is an integer. An integer can be regarded as a numerical decimal value without decimal places. An example of GDT IntegerValue 13900 is:

```
<PropertyValue>
  <IntegerValue>42</IntegerValue>
</PropertyValue>.
```

The structure of GDT IntegerValue 13900 is depicted in FIG. 139. For GDT IntegerValue 13900, the Representation/Association Qualifier term is Integer 13902, the Representation/Association term is Value 13904, the Type term is xsd 13906, and the Type Name term is Integer 13908.

GDT IntegerValue 13900 is a qualified basic GDT based on the secondary Representation/Association Value of the CCT Numeric. IntegerValue is used when the explicit reference to the integer representation of the element based on IntegerValue is both meaningful and desired from a semantic perspective. This is the case with rounded or estimated values. The Integer qualifier then becomes part of the relevant element name.

Generally, numeric business values are not defined using their integer representation. Instead, this representation is derived implicitly from the semantics of the numeric value. Examples of this include OrdinalNumberValue or DunningCounterValue. In this case, GDT IntegerValue 13900 is not used.

(aaaaa) InterfaceElementID

An GDT InterfaceElementID 14000 is a unique identifier for an element in an interface. An example of GDT InterfaceElementID 14000 is:

<InterfaceElementID schemeID='Open Catalog Interface' schemeAgencyID='123456789' schemeAgencySchemeID='DUNS' schemeAgencySchemeAgencyID='016'>NEW_ITEM-DESCRIPTION</InterfaceElementID>.

The structure of GDT InterfaceElementID 14000 is depicted in FIG. 140. For GDT InterfaceElementID 14000, the Object Class is Interface Element 14002, the Representation/Association term is Identifier 14004, the Type term is CCT 14006, the Type Name term is Identifier 14008, and the Length is from one to forty 14010. The GDT Interface Element ID 14000 may be restricted 14012.

For Scheme ID 14014, the Category term is Attribute 14016, the Object Class is Identification Scheme 14018, the Representation/Association term is Identifier 14020, the Type term is xsd 14022, the Type Name term is Token 14024, the Length is from one to sixty 14026, and the Cardinality is zero or one 14028.

For Scheme Agency ID 14030, the Category term is Attribute 14032, the Object Class is Identification Scheme Agency 14034, the Representation/Association term is Identifier 14036, the Type term is xsd 14038, the Type Name term is Token 14040, the Length is from one to sixty 14042, and the Cardinality is zero or one 14044.

For Scheme Agency Scheme ID 14046, the Category term is Attribute 14048, the Object Class is Identification Scheme Agency 14050, the Property is Scheme 14052, the Representation/Association term is Identifier 14054, the Type term is xsd 14056, the Type Name term is Token 14058, the Length is from one to sixty 14060, and the Cardinality is zero or one 14062.

For Scheme Agency Scheme Agency ID 14064, the Category term is Attribute 14066, the Object Class is Identification Scheme Agency 14068, the Property is Scheme Agency 14070, the Representation/Association term is Identifier 14072, the Type term is xsd 14074, the Type Name term is Token 14076, the Length is three 14078, and the Cardinality is zero or one 14080.

The permitted values depend on the corresponding interface and may be taken from its documentation. The attribute schemeID identifies the interface, schemeAgencyID identifies the issuer of the interface, which may be unique in the context of the attributes schemeAgencySchemeID and schemeAgencySchemeAgencyID. For more information about the use of the attributes schemeID, schemeAgencyID, schemeAgencySchemeID, and schemeAgencySchemeAgencyID, see the discussion for the CCT Identifier.

In a variation, the GDT InterfaceElementID 14000 may not be used to refer to elements of XML interfaces. If necessary, there may be an examination of how an element of an XML interface is identified and how the attributes are to be used in this case. GDT InterfaceElementID 14000 is used to assign references to interface elements of various e-procurement systems to characteristics within a catalog. For example, the "Open Catalog Interface" can be used to link Web-based purchasing catalogs to an e-procurement system. A user calls up a catalog from the e-procurement system, searches for products in this catalog, and makes a selection. When this is transmitted to the virtual shopping cart of the e-procurement system (user purchase order), characteristics of the product are transmitted to the e-procurement using the above-mentioned interface. The GDT InterfaceElementID 14000 contains the interface element identification of the calling e-procurement system for each characteristic and enables the characteristics to be assigned correctly to the elements of the e-procurement interface.

(bbbbb) IntervalBoundaryTypeCode

An GDT IntervalBoundaryTypeCode 14100 is a coded representation of an interval boundary type. An example of GDT IntervalBoundaryTypeCode 14100 is: <IntervalBoundaryTypeCode>3</IntervalBoundaryTypeCode>.

The structure of GDT IntervalBoundaryTypeCode 14100 is depicted in FIG. 141. For the GDT Interval Boundary Type Code 14100, the Property is Interval Boundary Type 14102, the Representation/Association is Code 14104, the Type is CCT 14106, the Type Name is Code 14108, and the Length is one 14110. The GDT IntervalBoundaryTypeCode 14100 may be a restricted GDT.

An element of type GDT IntervalBoundaryTypeCode 14100 can have the values 1 through 9. 1 corresponds to a single value X. 2 corresponds to an interval with a closed lower interval boundary and an open upper interval boundary; [X,Y). 3 corresponds to an interval with a closed upper and lower interval boundary; [X,Y]. 4 corresponds to an interval with an open upper and lower interval boundary; (X,Y). 5 corresponds to an interval with an open lower interval boundary and a closed upper interval boundary; (X,Y]. 6 corresponds to an interval with an unlimited lower boundary and an open upper boundary; <X. 7 corresponds to an interval with an unlimited lower boundary and a closed upper boundary; <=x. 8 corresponds to an interval with an open lower boundary and an unlimited upper boundary; >X. 9 corresponds to an interval with a closed lower boundary and an unlimited upper boundary; >=X.

The values that are expressed by the interval relationship may belong to the same ordinal scale. The meaning of scale values established by the GDT IntervalBoundaryTypeCode 14100 is used to describe intervals by their boundaries. One use relates to property values and property valuations.

The GDT IntervalBoundaryTypeCode 14100 may be a proprietary code list with fixed predefined values. Changes to the permitted values may involve changes to the interface.

(ccccc) InventoryUsabilityStatusCode

The GDT InventoryUsabilityStatusCode 14200 is the encoded representation of the usability of a warehouse inventory for company-specific business processes. An example of GDT InventoryUsabilityStatusCode 14200 is: <InventoryUsabilityStatusCode>1</InventoryUsabilityStatusCode>.

The structure of GDT InventoryUsabilityStatusCode 14200 is depicted in FIG. 142. For the GDT Inventory Usability Status Code 14200, the Object Class is Inventory 14202, the Property is Usability Status 14204, the Representation/Association Code is 14206, the Type CCT is 14208, the Type Name is Code 14210, and the Length is from one to two 14212. The GDT InventoryUsabilityStatusCode 14200 may be a restricted GDT.

The value range of the GDT InventoryUsabilityStatusCode 14200 may comprise a proprietary code list. Possible values are 1 through 6. 1 means the stock can be used as necessary for business processes. 2 means the stock is blocked for business processes. 3 means the usage of stock is subject to certain restrictions. 4 means the InventoryUsabilityStatusCode of the stock is not defined more precisely, i.e., no other status is specified. 4 means the stock is in quality inspection. 6 means the stock is a goods return. Depending on the coded value, certain business processes can be allowed for a warehouse stock, however, others may not be allowed.

The usage can be clarified using a concrete business process as an example: At a goods receipt for a purchase order, the GDT InventoryUsabilityStatusCode 14200 "quality inspection" is assigned to the stock delivered since Quality Control may inspect the quality of the received stock. Depending on this inspection, parts of the stock are then posted to the GDT InventoryUsabilityStatusCode 14200 "unrestricted use" or "blocked." The GDT InventoryUsabilityStatusCode 14200 is used for transmitting stock changes from Inventory Management to Accounting and to Logistics Planning. Different InventoryUsabilityStatusCodes can cause a different stock valuation in Accounting and are handled differently in planning.

A warehouse inventory is a quantity of material at a certain location. For example, 17 pieces of material "42" at storage location "17-05-72".

(ddddd) InvoiceCancellationInvoiceIndicator

An GDT InvoiceCancellationInvoiceIndicator 14300 indicates whether an invoice is a cancellation invoice or not. An example of GDT InvoiceCancellationInvoiceIndicator 14300 is: <InvoiceCancellationInvoiceIndicator>true</InvoiceCancellationInvoiceIndicator>.

The structure of GDT InvoiceCancellationInvoiceIndicator 14300 is depicted in FIG. 143. For the GDT Invoice Cancellation Invoice Indicator 14300, the Object Class Invoice is 14302, the Property is Cancellation Invoice Indicator 14304, the Representation/Association is Indicator 14306, the Type is CCT 14308, and the Type Name is Indicator 14310.

The GDT InvoiceCancellationInvoiceIndicator 14300 can have the values true or false. True indicates that the invoice is a cancellation invoice. False indicates that the invoice is not a cancellation invoice.

A cancellation invoice is a newly created invoice that renders a previously generated invoice or parts of it invalid. This is done by marking the new invoice with the GDT InvoiceCancellationInvoiceIndicator 14300 (value 'true'). Marking an invoice using the GDT InvoiceCancellationInvoiceIndicator 14300 is specific to invoices. If an invoice contains errors, is incorrect, or has been created for services that have not been provided, it may not be canceled itself. The correction may be made via an additional, appropriately marked invoice. A cancellation invoice may not be equated with a credit memo, even if from an accounting point of view the original invoiced amount can be credited using the invoice marked as a cancellation invoice.

For example, the distinction is made in R/3 using the sales document type. In particular, the distinction between 'cancellation invoice' and 'cancellation credit memo' needs to be observed here.

(eeeee) InvoiceIntraCorporateIndicator

A GDT InvoiceIntraCorporateIndicator 14400 indicates whether or not an invoice is between independent companies in a corporate group. An example of GDT InvoiceIntraCorporateIndicator 14400 is: <InvoiceIntraCorporateIndicator>true</InvoiceIntraCorporateIndicator>.

The structure of GDT InvoiceIntraCorporateIndicator 14400 is depicted in FIG. 144. For the GDT Invoice Corporate Indicator 14400, the Object Class is Invoice 14402, the Property is Intra Corporate Indicator 14404, the Representation/Association is Indicator 14406, the Type is CCT 14408, the Type Name is Indicator 14410. The Indicator may have the values true or false. True indicates the invoice is between two companies within a corporate group. False indicates the invoice is to a company that does not belong to the corporate group or is an invoice to an end customer.

The creation of invoices between companies in a corporate group is sometimes also referred to as "Intercompany Billing." For example, a customer places an order with company C1, which also sends the invoice to the customer. Delivery of goods, however, is performed by company C2 of the same group. C1 gathers all revenue, while C2 incurs the costs. This makes a settlement between the two companies necessary, which may require an invoice in the case of legally independent companies.

Therefore, two invoices may be created for one business transaction (in the example of the customer order), whose differing semantics are made explicit by the indicator. Distinction between the two is necessary, since different prices are applied in invoicing and the invoice to the customer affects the status of the order item.

If more than two companies in one corporate group are involved in a business transaction, further invoices can result—this is known as Chain Invoicing. However, differentiation of invoices between these companies may not be required in that case.

In an example, the distinction is made in R/3 using the sales document type.

(fffff) LanguageCode

The GDT LanguageCode 14500 is a coded representation for the language. An example of GDT LanguageCode 14500 is: <OrderLanguageCode>de</OrderLanguageCode>.

The structure of GDT LanguageCode 14500 is depicted in FIG. 145. The GDT Language Code 14500, the Object Class is Language 14502, the Property is Identification 14504, the Representation is Code 14506, the Type is xsd 14508, the Type Name is language 14510, the Length is from two to nine 14512.

GDT LanguageCode 14500 is from the Core Component Type "Code." GDT LanguageCode 14500 is based on the W3C "built-in" data type xsd: language. The language code of GDT LanguageCode 14500 is represented according to IETF RFC 3066. RFC 3066 includes two parts: a primary language code and a series of sub-codes. The primary language code can be an ISO 639-1-compliant (ISO 639:1988) two-character code or an ISO 639-2-compliant (ISO 639: 1998) three-character code. If the language code is to occur in both standards, the two-character language code (ISO 639-1) may be used. The sub-codes can be used for differentiating the language according to special criteria or for different dialects within a single country. If the ISO 639-1 or 639-2-compliant codes are not sufficient, the ISO 3166-1-compliant two-character code is usually used as the first sub-code. Regional differences in a language within a single country can be defined by using the second ISO 3116-2-compliant two-character sub-code "Country Subdivision Code."

A GDT LanguageCode 14500 is represented as aa, anm, aa-CC, aaa-CC, aa-CC-RR, aaa-CC-RR. The literal aa/aaa stands for ISO 639-1 or ISO 639-2-compliant language code, CC stands for ISO 3166-1-compliant country code, and RR stands for ISO 3166-2-compliant "Country Subdivision Code".

GDTLanguageCode 14500 is used to identify the language for business documents or business partners. Furthermore, it enables a business partner to request a particular language. There is also a difference between inbound and outbound in the implementation of "LanguageCode." Outbound, mapping from, for example, the SAP language key to the ISO 639-1-compliant two-character ISO language code always occurs without language differentiation. Inbound, most SAP applications work internally with the SAP language key. These applications support the ISO 639-1-compliant two-character language code without a sub-code. Other language codes may be mapped to ISO 639-1 for these applications; otherwise an error may occur during inbound processing.

(ggggg) LanguageDependencyIndicator

A GDT LanguageDependencyIndicator 14600 indicates whether or not there is a language dependency. An example of GDT LanguageDependencyIndicator 14600 is: <LanguageDependencyIndicator>true</LanguageDependencyIndicator>.

The structure of GDT LanguageDependencyIndicator 14600 is depicted in FIG. 146. The GDT Language Dependency Indicator 14600, the Property is Language Dependency 14602, the Representation/Association is Indicator 14604, and the Type is CCT: Indicator 14606.

The GDT LanguageDependencyIndicator 14600 can have the values true (or 1) or false (or 0). True indicates language dependency. False indicates no language dependency.

The GDTLanguageDependencyIndicator 14600 is used in GDT PropertyDataType to indicate that values in character strings are language dependent.

(hhhhh) LegalEventTypeCode

The GDT LegalEventTypeCode 14700 is the coded representation of a legal transaction or an official or legal event. An example of GDT LegalEventTypeCode 14700 is:

```
<LegalEvent>
  <TypeCode>01</TypeCode>
</LegalEvent>.
```

The structure of GDT LegalEventTypeCode 14700 is depicted in FIG. 147. The GDT Legal Event Type Code 14700, the Object Class is Legal Event 14702, the Property is Type 14704, Representation/Association is Code 14706, the Type is CCT 14708, the Type Name is Code 14710, the Length is two 14712.

Values permitted for GDT LegalEventTypeCode 14700 are 01-20 and ZZ. 01 stands for foreclosure, 02 stands for Law suit, 03 stands for Outstanding Judgment, 04 stands for Tax Lien, 05 stands for Support Debt, 06 stands for Bankruptcy, 07 stands for Garnishment, 08 stands for Repossession, 09 stands for Collection, 10 stands for Divorce Decree, 11 stands for Custody Agreement, 12 stands for Financing Statement (Secured Loan), 13 stands for Lien, 14 stands for Non-responsibility, 15 stands for Financial Counseling, 16 stands for Fictitious Name, 17 stands for Notice of Default, 18 stands for Forcible Detainer, 19 stands for Unlawful Detainer, 20 stands for an other Public Record or Obligation Type, and ZZ stands for a mutually defined code.

(iiiii) LocationID

A GDT LocationID 14800 is a unique identifier for a location. A location is a logical or a physical place. An example of GDT LocationID 14800 is:

```
<LocationID schemeID="myLocations"
      schemeAgencyID="065055766"
        schemeAgencySchemeID="DUNS"
        schemeAgencySchemeAgencyID="016">
   LOC_4711
</LocationID>.
```

In the above example, 065055766 is the DUNS number for Bosch, and 016 is the DUN & Bradstreet Corporation from code list UN/EDIFACT DE 3055.

The structure of GDT LocationID 14800 is depicted in FIG. 148. For GDT ID 14800, the Object Class is Location 14802, the Property is Indemnification 14804, the Representation/Association is Identifier 14806, the Type is CCT 14808, the Type Name is Identifier 14810, and the Length is twenty 14812. The GDT LocationID 14800 may be a restricted GDT.

For the scheme ID 14816, the Category is Attribute 14818, the Object Class is Identification Scheme 14820, the Property is Identification 14822, the Representation/Association is Identifier 14824, the Type is xsd 14826, the Type Name is Token 14828, and the Length is from zero to sixty 14830. The Cardinality is zero or one 14852.

For the scheme Agency ID 14834, the Category is Attribute 14836, the Object Class is Identification Scheme Agency 14838, the Property is Identification 14840, the Representation/Association is Identifier 14842, the Type is xsd 14844, the Type Name is Token 14846, and the Length is from zero to sixty 14850. The Cardinality is zero or one 14852.

For the Scheme Agency-Scheme ID 14854, the Category is Attribute 14856, the Object Class is Identification Scheme Agency 14858, the Property is Scheme 14860, the Representation/Association is Identifier 14862, the Type is xsd 14864, the Type Name is Token 14866, and the Length is thee 14868. The Cardinality is zero or one 14870.

For the Scheme Agency-Scheme Agency ID 14872, the Category is Attribute 14874, the Object Class is Identification Scheme Agency 14876, the Property is Scheme Agency 14878, the Representation/Association is Identifier 14880, the Type is xsd 14882, the Type Name is Token 14884, the Length is three 14886. The Cardinality is zero or one 14888.

For standardized and proprietary GDT LocationID 14800, there is the CDT: LocationStandardID and CDT: LocationPartyID.

(jjjj) LocationInternalID

A CDT LocationInternalID 14900 is a proprietary identifier for a location. A location is a logical or a physical place. An example of CDT LocationInternalID 14900 is:

GUID of a location:

```
<LocationInternalID schemeID="LocationGUID"
schemeAgencyID=
"MPL_002">1C743CEC501F6A4D8826C7EC5A8554B9
</LocationInternalID>.
```

In the above example, schemeID="LocationGUID" indicates that the scheme "LocationGUID" was used to identify the location, and schemeAgencyID="MPL__002" indicates that the scheme was assigned by the business system "MPL__002."

The following is another example of LocationInternalID:

ID of a location:

```
<LocationInternalID schemeID="LocationID"
schemeAgencyID="MPL_002">CU0000000001</LocationInternalID>.
```

The structure of CDT LocationInternalID 14900 is depicted in FIG. 149. For GDT Location Internal ID 14902, the Object Class is Location 14904, the Property is Internal 14906, the Representation/Association is Identifier 13308, the Type is GDT 14910, the Type Name is Location ID 14912, and the Length is from one to thirty-two 14914. The CDT LocationInternalID 14900 may be a restricted CDT.

For the scheme ID 14918, the Category is Attribute 14320, the Object Class is Identification Scheme 14920, the Property is Identification 14922, the Representation/Association is Identifier 14924, the Type is xsd 14926, the Type Name is Token 14928, the Length is from one to sixty 14930. The Cardinality is zero or one 14932.

For the scheme Agency ID 14934, the Category is Attribute A 14936, the Object Class is Identification Scheme Agency 14936, the Property is Identification 14938, the Representation/Association is Identifier 14940, the Type is xsd 14942, the Type Name is Token 14944, the Length is from one to sixty 14946. The Cardinality is zero or one 14948.

LocationGUID and Location ID are both schemes provided for schemeID. LocationGUID identifies a location using a Global Unique Identifier, and LocationID identifies a location using an identifier. SchemeAgencyID identifies a business system in which the identifier was assigned.

The CDT LocationInternalID represents a projection of the GDT LocationID, in which the attributes "schemeID" and "schemeAgencyID" are contained for describing an internally assigned ID. If an attribute is not explicitly assigned in the use of the CDT, it may be clearly specified through the context.

The CDT LocationInternalID 14900 is used when both sender and recipient can access shared master data.

(kkkkk) LocationPartyID

A CDT LocationPartyID 15000 is an identifier for a location assigned by a party. A location is a logical or a physical place. An example of CDT LocationPartyID 15000 is: <LocationBuyerID>4711</LocationBuyerID>.

The structure of CDT LocationPartyID 15000 is depicted in FIG. 150. For the CDT Location Party ID 15000, the Object Class is location 15002, the Property Quality is Party 15004, the Property is Identification 15006, the Representation/Association is Identifier 15008, the Type is GDT 15010, the Type Name is Location ID 15012, the Length is from one to twenty 15014. The CDT LocationPartyID 15000 may be a restricted CDT.

The PartyPartyID is the proprietary identifier assigned by a party. The party that assigned this identifier may derive from the context of the message that the LocationPartyID uses.

The CDT LocationPartyID 15000 represents a projection of the GDT LocationID, which may not contain attributes. In the XML instance, "Party" is replaced with "Partner Role Type" (e.g., LocationBuyerID, and the like). In contrast to LocationStandardID, the use of the CDT LocationPartyID 15000 is role-dependent (e.g., as an ID assigned by the Buyer). SchemeID and VersionID may be included as attributes to differentiate between several schemes.

(lllll) LocationStandardID

A CDT LocationStandardID 15100 is a standardized identifier for a location, whereby the identification scheme used is controlled by an agency from the code list DE 3055. A location is a logical or a physical place. An example of CDT LocationStandardID 15100 is:

```
<LocationStandardID
    schemeAgencyID ="009">
4012345678910
</LocationStandardID>.
```

In the above example, 009 stands for EAN.UCC (International Article Numbering association) from the code list UN/EDIFACT DE 3055.

The structure of CDT LocationStandardID 15100 is depicted in FIG. 151. The CDT Location Standard ID 15100 includes attribute schemeAgencyID. For the CDT LocationStandardID 15100, the Object Class is Location 15102, Property Quality is Standard 15104, the Property is Identification 15106, the Representation/Association is Identifier 15108, the Type is GDT 15110, the Type Name is Location ID 15112, and the Length is thirteen 15114. The CDT LocationStandardID 15100 may be a restricted CDT.

For the Scheme Agency ID 15118, the Category is Attribute 15120, the Object Class is Identification Scheme Agency 15122, the Property is Identification 15124, the Representation/Association is Identifier 15126, the Type is xsd 15128, the Type Name is Token 15130, and the Length is three 15132. The Cardinality is one 15134. The schemeAgencyID 15118 identifies the agency that manages an identification scheme. The agencies from DE 3055 may be used as the default, but the roles defined in DE 3055 may not be used. In a variation, the supported codes are 009 (EAN.UCC) for the 13-character Global Location Number (GLN), and 116 (ANSI ASC X12) for the 13-character DUNS+4, an enhancement to DUNS (Data Universal Numbering System from Dun & Bradstreet) for location identification.

The CDT LocationStandardID 15100 represents a projection of the GDT LocationID, in which the attribute schemeAgencyID is contained. This indicates the standardization organization that assigned the ID.

In a variation, the attribute schemeAgencyID is a mandatory attribute. SchemeID and VersionID may be included as attributes to differentiate between several schemes.

(mmmmm) LogItem

A GDT LogItem 15200 is a log message that is generated when an application is executed. An example of GDT LogItem 15200 is:

```
<LogItem>
<TypeID>001(/CCM/)</TypeID>
<SeverityCode>3</SeverityCode>
<Note>Catalog CAMERAS could not be published</Note>
<WebAddress>pgwdf0123.sap.corp:12345/
sap/ccm/messagedetail&language=EN&i d=001(/
CCM/)&param1=CAMERAS</WebAddress>
</LogItem>.
```

The structure of GDT LogItem 15200 is depicted in FIG. 152. The GDT LogItem 15200 includes elements TypeID, SeverityCode, Note, and WebAddress. For the GDT LogItem 15200, the Representation/Association is Details 15202. The GDT LogItemTypeID 15200 may not be confused with sequential numbering for the messages in a log. The GDT LogItemTypeID 15200 does not require the attributes to be listed for the CCT Identifier, since these are taken from the context.

TypeID is a unique identification of the type of a log entry (within the application that generates the log). For example, when a catalog is published, a log can be generated containing several items concerning the successful publication of a catalog item. Since these log entries may be similar, they all have the same TypeID, although the respective catalog items are inserted dynamically in a text pattern that corresponds to the message type. For the Type ID 15204, the Category is Element 15206, the Object Class is Log Item 15208, the Property is Type Identification 15210, the Representation/Association is Identifier 15212, the Type is CCT 15214, the Type Name is Identifier 15216, and the Length is from one to forty 15218. The Cardinality is zero or one 15220. The GDT LogItem 15200 may be a restricted 15222.

Severity Code is the severity of the log message. For the Severity Code, the Category is Element 15226, the Object Class is Log Item 15228, the Property is Severity 15230, the Representation/Association is Code 15232, the Type is GDT 15234, the Type Name is Log Item Severity Code 15236, and the Cardinality is zero or one 15238.

Note is a short text for the log message. The GDT LogItemNote 15200 restricts the length permitted in the GDT Note. For the Note 15240, the Category is Element 15242, the Object Class is Log Item 15244, the Property is Note 15246, the Representation/Association is Note 15248, the Type is GDT 15250, the Type Name is 15252, the Length is from one to two-hundred 15254. The Cardinality is one 15256. The Remarks may be restricted 15258.

WebAddress is the address for a document available on the Internet that contains more information about the log entry. For the Web Address, the Category is Element 15262, the Object Class is Log Item 15264, the Property is Web Address 15266, the Representation/Association is Web Address 15268, the Type is CCT 15270, the Type Name is Web Address 15272, and the Cardinality is zero or one 15274.

The URI schemas, for example "http" and "https," are permitted.

The use of the elements TypeID and WebAddress (with or without a specified language) may be optional depending on the business context. It may not be useful to use the SeverityCode for all types of log. The GDT LogItem 15200 can therefore be extended in the future by specifying an attack level, for instance, in the area of Internet-security, or for user interaction in the area of e-learning.

In ABAP applications, the element TypeID corresponds to the combination of message class (also known as application area) and message number. These are listed consecutively in accordance with the pattern for the LogItemTypeID: <message number>(/<message class>/).

(nnnnn) LogItemSeverityCode

The GDT LogItemSeverityCode 15300 is the coded representation of the severity in a log message on the execution of an application. An example of GDT LogItemSeverityCode 15300 is: <SeverityCode>2</SeverityCode>.

The structure of GDT LogItemSeverityCode 15300 is depicted in FIG. 153. The GDT Log Item Severity Code 15300, the Object Class is Log Item 15302, the Property is Severity 15304, the Representation/Association Code is 15306, the Type is CCT 15308, the Type Name is Code 15310, and the Length is one 15312.

The GDT LogItemSeverityCode 15300 can have the values 1 through 4. 1 refers to a notification of the execution of an application or an application step if no errors or error possibilities have occurred. 2 refers to a warning of the possibility of an error or an error source in the execution of an application or an application step. 3 refers to a notification of the occurrence of an error during the execution of an application or an application step—for, example with a more precise description of the type of error. 4 refers to a notification of a premature or unforeseen termination of the execution of an application.

The values of the ServiceProcessingLogItemSeverityCode follow the UN/EDIFACT code list 0331 "Report function," with regard to naming and additional values. This code list also focuses on the dialog with a system.

The following linear order applies for the severity: 1<2<3<4. During the execution of an application, log messages may be created that are classified by the severity of the GDT LogItemSeverityCode 15300 (e.g., as an error message).

The ServiceProcessingLogItemSeverityCode may be a proprietary code list with fixed predefined values. Changes to the permitted values involve changes to the interface.

(ooooo) Measure

A GDT Measure 15400 is a physical measurement with the corresponding unit of measurement. An example of GDT Measure 15400 is: <NetWeightMeasure unitCode="KGM">420.5</NetWeightMeasure>, where KGM means kilogram.

The structure of GDT Measure 15400 is depicted in FIG. 154. The GDT Measure 15400 includes attribute unitCode 15410. For the GDT Measure 15400, the Representation/Association is Measure 15402, the Type is xsd 15404, the Type Name is decimal 15406, and the Length is maximum thirteen predecimal units and six decimal units 15408.

For the unitCode 15410, the Category is Attribute 15412, the Object Class is Measure 15414, the Property is Unit 15416, the Representation/Association is Code 15418, the Type is xsd 15420, the Type Name is token 15422, and the Length is from one to three 15424. The Cardinality is one 15426.

GDT Measure 15400 is the result of the measurement of a physical size in relation to a standard size, which may be the standard against which everything else is measured. Positive and negative entries are possible by using the built-in data type “xsd: decimal.” Negative entries may be prefixed with a negative sign (“–”). Positive entries do not have to be prefixed with a positive sign (“+”).

GDT Measure 15400 can be used to specify physical business sizes. Examples of such measurements are the height, width, length, weight, and volume of a handling unit, or the latitude or longitude of a geographic location.

(ppppp) MeasureUnitCode

The GDT MeasureUnitCode 15500 is the coded representation of a non-monetary unit of measurement. A unit of measurement is, for example, a quantity that is either defined by a standard or established by conventions as a particular type of unit. This unit quantity may be the standard of comparison for determining and specifying other quantities of the same type. An example of GDT MeasureUnitCode 15500 is: <MeasureUnitCode>BX</MeasureUnitCode>, where BX stands for box.

The structure of GDT MeasureUnitCode 15500 is depicted in FIG. 155. The GDT Measure Unit Code 15500, the Object Class is Measure Unit 15502, the Representation/Association is Code 15504, the Type is xsd 15506, the Type Name is token 15508, and the Length is from one to three 15510.

The permitted values for GDT MeasureUnitCode 15500 are the “Common Codes” specified in UN/CEFACT Recommendation #20. The Common Code is a sequence of a maximum of three alphanumerical characters. The recommendation is divided into three levels. Each unit belongs to a level. Levels 1 and 2 contain physical units: level 1 contains SI units and level 2 contains SI-equivalent units. Level 3 contains other “informative” units of measurement that are not assigned to level 1 or 2.

In particular, UN/CEFACT Recommendation #20 contains codes for physical units (Physical Measure Units) such as meters, kilograms, or seconds and units that derive from them such as cubic meters, hours, and Newtons, as well as country-specific and industry-specific physical units.

A distinction may be made between Common Code and the representation symbol of a unit. A standardized representation symbol may be available.

(qqqqq) MeasureUnitMeaningCode

The GDT MeasureUnitMeaningCode 15600 is a coded representation of the meaning of a physical unit of measurement. An example of GDT MeasureUnitMeaningCode 15600 is: <MeasureUnitMeaningCode>E17</MeasureUnitMeaningCode>.

The structure of GDT MeasureUnitMeaningCode 15600 is depicted in FIG. 156. The GDT Measure Unit Meaning Code 15600, the Object Class is Measure Unit 15602, the Property is Meaning 15604, the Representation/Association is Code 15606, the Type is CCT 15608, the Type Name is Code 15610, and the Length is three 15612. The GDT MeasureUnitMeaningCode 15600 may be restricted.

The possible values may be taken from the IEC61360 standard. For example, the unit kA/m can be derived in different ways and describes different properties, such as longitudinal currents, magnetic field strength, or magnetization.

(rrrrr) MessageTypeCode

The GDT MessageTypeCode 15700 is a coded representation of the (business) type of a message. A message type describes the nature of (business) messages of the same kind. An example of GDT MessageTypeCode 15700 is: <MessageTypeCode>0101</MessageTypeCode>.

The structure of GDT MessageTypeCode 15700 is depicted in FIG. 157. For the GDT Message Type Code 15700, the Object Class is Message 15702, the Property is Type Code 15704, the Representation/Association is Code 15706, the Type is CCT 15708, the Type Name is Code 15710, and the Length is four 15712. The GDT MessageTypeCode 15700 may be a restricted GDT.

The permitted values for the GDT MessageTypeCode 15700 are described in the table below.

| Code | Name | Description |
|---|---|---|
| 0060 | PurchaseContractLegal-DocumentRequest | A PurchaseContractLegalDocumentRequest is a request from Purchase Contract Management to Document Builder to create from purchase contract data a contract text conforming to legal standards. |
| 0061 | PurchaseContractLegal-DocumentNotification | A PurchaseContractLegalDocumentNotification is a notification from Document Builder to Purchase Contract Management about a legal contract. |
| 0062 | PurchaseContractUse-Request | A PurchaseContractUseRequest is a request from Purchase Contract Management to Purchasing to use the transmitted purchase contract or to take into account transmitted changes of the purchase contract. |
| 0063 | PurchaseContractUse-Confirmation | A PurchaseContractUseConfirmation is a confirmation from Purchasing to Purchase Contract Management about the use or change, respectively, of a transmitted purchase contract. |
| 0064 | PurchaseContractRelease-Notification | A PurchaseContractReleaseNotification is a notification from Purchasing to Purchase Contract Management about a purchase contract release. |

-continued

| Code | Name | Description |
|---|---|---|
| 0077 | SourceOfSupplyNotification | A SourceOfSupplyNotification is a notice to Supply Chain Planning about available sources of supply. |
| 0080 | CatalogueUpdateNotification | A CatalogueUpdateNotification is a notice from a catalogue provider to an interested party about a new catalogue transmitted in the message or about changes to an existing catalogue transmitted in the message. |
| 0081 | CataloguePublication Request | A CataloguePublicationRequest is a request from catalogue authoring to the Catalogue Search Engine (the publishing system) to publish a new or changed catalogue or to delete an already published catalogue (the catalogue is possibly split into several transmission packages) |
| 0082 | CataloguePublication Transmission PackageNotification | A CataloguePublicationTransmissionPackage otification is the notification of the Catalogue Search Engine (the publishing system) to Catalogue Authoring about a package of a catalogue publication transmission and information about the reception of this package and the validity of its content. |
| 0083 | CataloguePublication-Confirmation | A CataloguePublicationConfirmation is the confirmation of the Catalogue Search Engine (the publishing system) to the Catalogue Authoring whether the publication or deletion of a Catalogue requested by a CataloguePublicationRequest was successful or not. |
| 0084 | CataloguePublication-TransmissionCancelation-Request | A CataloguePublicationTransmissionCancellation equest is the request of Catalogue Authoring to Catalogue Search Engine (the publishing system) to cancel the transmission of a Catalogue and to restore an earlier published state (if such exists) of the Catalogue. Moreover, no more packages are sent for this transmission. |
| 0085 | CataloguePublication-TransmissionCancelation-Confirmation | A CataloguePublicationTransmissionCancellation onfirmation is the confirmation of Catalogue Search Engine (the publishing system) whether the transmission of a Catalogue has been cancelled successfully and an earlier published state of this catalogue (if such exists) has been restored or not. |
| 0086 | CataloguePublication-TransmissionItemLock-Request | A CataloguePublicationTransmissionItem Lock equest is the request of Catalogue Authoring to lock single items of the catalogue contained in the catalogue publication transmission. |
| 0087 | CataloguePublication-TransmissionItemLock-Confirmation | A CataloguePublicationTransmissionItem Lock onfirmation is the confirmation of Catalogue Search Engine (the publishing system) to Catalogue Authoring whether single items of the catalogue contained in the catalogue publication transmission could be locked or not. |

-continued

| Code | Name | Description |
|---|---|---|
| | | To lock means: If the catalogue is not yet published the items must not be published. If the catalogue is already published, the publication of these items must be revoked. |
| 0101 | PurchaseOrderRequest | A PurchaseOrderRequest is a request from a purchaser to a seller to deliver goods or provide services. |
| 0102 | PurchaseOrderChange-Request | A PurchaseOrderChangeRequest is a change to a purchaser's request to the seller to deliver goods or provide services. |
| 0103 | PurchaseOrderCancellation-Request | A PurchaseOrderCancellationRequest is the cancellation of a purchaser's request to the seller to deliver goods or provide services. |
| 0104 | PurchaseOrderConfirmation | A PurchaseOrderConfirmation is a confirmation, partial confirmation, or change from a seller to the purchaser, regarding the requested delivery of goods or provision of services. |
| 0120 | PurchaseOrderInformation | A PurchaseOrderInformation is information from a purchasing system for interested recipients about the current state of a purchase order when making, changing, confirming, or cancelling a purchase order. |
| 0121 | PurchaseOrderPlanning-Notification | A PurchaseOrderPlanningNotification is a message by means of which planning applications are notified about those aspects of a purchase order that are relevant for planning. |
| 0130 | PurchaseRequirement Request | A PurchaseRequirementRequest is a request from a requestor to a purchaser to (externally) procure products (materials, services) (external procurement). |
| 0131 | PurchaseRequirement-Confirmation | A PurchaseRequirementConfirmation is a notice from the purchaser to the requestor about the degree of fulfillment of a requirement. |
| 0140 | ProductDemandInfluencing-EventNotification | A ProductDemandInfluencingEventNotification is a notification about an event that influences the supply or demand of products. |
| 0141 | ProductForecastNotification | A ProductForecastNotification is a notification about future product supply or demand (forecasts). |
| 0142 | ProductForecastRevision-Notification | A ProductForecastRevisionNotification is a notification about the revision of future product supply or demand (forecasts). |
| 0145 | ProductActivityNotification | A ProductActivityNotification is a notice from a buyer to a vendor about product-related activities. Based on this, the vendor can perform supply planning for the buyer. |
| 0151 | RFQRequest | An RFQRequest is the request from a purchaser to a bidder to participate in a request for quotation for a product. |
| 0152 | RFQChangeRequest | An RFQChangeRequest is a change to the purchaser's request to a bidder to participate in the request for quotation for a product. |
| 0153 | RFQCancellationRequest | An RFQCancellationRequest is a cancellation by the purchaser of a |

-continued

| Code | Name | Description |
|---|---|---|
| | | request for quotation for a product. |
| 0154 | RFQResultNotification | An RFQResultNotification is a notification by a purchaser to a bidder about the type and extent of the acceptance of a quote or about the rejection of the quote. |
| 0155 | Quote Notification | A QuoteNotification is the quote of a bidder communicated to a purchaser concerning the request for quotation for a product by the purchaser. |
| 0160 | SalesOrderFulfillment-Request | A SalesOrderFulfillmentRequest is a request (or change and cancellation of such a request) from a selling component to a procuring component, to fulfill the logistical requirements (available-to-promise check, scheduling, requirements planning, procurement, delivery, . . . ) of a sales order. |
| 0161 | SalesOrderFulfillment-Confirmation | A SalesOrderFulfillmentConfirmation is a confirmation, partial confirmation, or change from the procuring component to the selling component, regarding a sales order with respect to which procurement has been requested. |
| 0185 | OrderIDAssignment-Notification | An OrderIDAssignmentNotification is a notice from a buyer to a vendor that contains order IDs to be used by the latter for identifying "purchase orders generated by the vendor". |
| 0200 | DeliveryExecutionRequest | A DeliveryExecutionRequest is a request to a warehouse or supply chain execution to prepare and execute the outbound delivery of goods or the acceptance of an expected or announced inbound delivery. |
| 0201 | DeliveryInformation | A DeliveryInformation is a notice about the creation, change, and execution status of a delivery. |
| 0202 | DespatchedDelivery-Notification | A DespatchedDeliveryNotification is a notification communicated to a product recipient about the planned arrival, pickup, or issue date of a ready-to-send delivery, including details about the content of the delivery. |
| 0203 | ReceivedDeliveryNotification | A ReceivedDeliveryNotification is a notification communicated to a vendor about the arrival of the delivery sent by him to the product recipient, including details about the content of the delivery. |
| 0206 | ReturnDeliveryInstruction-Notification | A ReturnDeliveryInstructionNotification is a notice to a vendor which contains instructions for the return delivery to be executed by him. |
| 0210 | DeliveryScheduleNotification | A DeliveryScheduleNotification is the notification to a vendor about the quantity of a product to be delivered with a certain liability at a certain date in accordance with a given scheduling aggreement between buyer and vendor. |
| 0213 | VendorGeneratedOrder-Notification | A VendorGeneratedOrderNotification is a notification to a customer/buyer about a replenishment order initiated and planned by a vendor/seller so that |

-continued

| Code | Name | Description |
|---|---|---|
| | | the former can create a corresponding purchase order. |
| 0214 | VendorGeneratedOrder-Confirmation | VendorGeneratedOrderConfirmation is the confirmation from a customer/buyer that a purchase order has been created for the replenishment order initiated and planned by his vendor/seller. |
| 0216 | Replenishment Order Notification | A ReplenishmentOrderNotification is a notification from Logistics Planning (SCP, vendor) to Logistics Execution (SCE, vendor) about a replenishment order planned for a customer/buyer in order to trigger further processing for the order and prepare the outbound delivery. |
| 0217 | ReplenishmentOrder Confirmation | A ReplenishmentOrderConfirmation is a confirmation from Logistics Execution (SCE, vendor) to Logistics Planning (SCP, vendor) that a replenishment order that is planned for a customer/buyer can be fulfilled. |
| 0235 | CustomsVendorDeclaration-CompleteRequest | A CustomsVendorDeclarationCompleteRequest is the request a buyer makes to a vendor to complete a long-term vendor declaration for customs purposes. |
| 0236 | CustomsVendorDeclaration-Notification | A CustomsVendorDeclarationNotification is a notification from a vendor to inform a buyer of a long-term vendor declaration for customs purposes. A vendor declaration refers to goods that are delivered from the vendor to the buyer. |
| 0240 | ServiceAcknowledgement-Request | A ServiceAcknawledgementRequest is a request by a seller to a purchaser to confirm the services recorded. |
| 0241 | ServiceAcknowledgement-Confirmation | A ServiceAcknowledgementConfirmation is a confirmation (or rejection) of the services recorded. |
| 0250 | InventoryChangeNotification | An InventoryChangeNotification is a notice with detailed information about inventory changes in inventory management, which is used, e.g., by logistics planning. |
| 0251 | InventoryChangeAccounting Notification | An InventoryChangeAccountingNotification is a notice with aggregated information about inventory changes in inventory management, which is tailored to financials. |
| 0252 | InventoryChangeAccounting Cancellation Request | An InventoryChangeAccountingCancellation Request is a request for the full cancellation of posting information previously sent to financials with respect to a goods movement. |
| 0290 | BillingDueNotification | A BillingDueNotification is a notification about billing-relevant data communicated to an application in which the subsequent operative processing of billing takes place. |
| 0291 | InvoicingDueNotification | An InvoicingDueNotification is a notification about invoicing-relevant data communicated to an application in which the operative verification and creation of invoices takes place, and/or in which “self billing” invoices |

-continued

| Code | Name | Description |
|---|---|---|
| | | (evaluated receipt settlement) are created. |
| 0401 | InvoiceRequest | An InvoiceRequest is a legally binding notice about accounts receivable or accounts payable for delivered goods or provided services - typically a request that payment be made for these goods or services. |
| 0402 | InvoiceConfirmation | An InvoiceConfirmation is the respose of a recipient of an invoice to the bill-from-party by which the invoice as a whole is confirmed, rejected, or classified as 'not yet decided'. |
| 0409 | SupplierInvoiceInformation | A SupplierInvoiceInformation is an information from Invoicing about an accepted supplier invoice or its cancelation. |
| 0410 | InvoiceIssuedInformation | An InvoiceIssuedInformation contains information on the following: Which items of an invoice have been billed Which rendered services, delivered products, or credit or debit memo request items have been billed The extent to which the above items have been billed. |
| 0411 | InvoiceAccounting-Notification | An InvoiceAccountingNotification is a notification tailored to financials about incoming or outgoing invoices. |
| 0412 | InvoiceAccounting-CancellationRequest | An InvoiceAccountingCancellationRequest is a request for the full cancellation of posting information previously sent to financials, regarding an incoming or outgoing invoice or credit memo. |
| 0420 | TaxDueNotification | A TaxDueNotification is a notice from tax determination and calculation to the tax register of a company about data relevant for tax reports and tax payments. |
| 0421 | VATDeclarationRequest | A VATDeclarationRequest is a request to a tax authority to handle a tax return for tax on sales/purchases. |
| 0422 | VATDeclarationConfirmation | A VATDeclarationConfirmation is a confirmation about the receipt, completeness, formal correctness and, if necessary, consistency of a tax return for tax on sales/purchases. |
| 0426 | SupplierInvoiceCancellation-ExecutionRequest | A SupplierInvoiceCancellationExecution Request is request to execute the cancellation of a supplier invoice. |
| 0427 | SupplierInvoiceSettlement-ReleaseRequest | A SupplierInvoiceSettlementReleaseRequest is the request to release an accepted supplier invoice for settlement. |
| 0430 | PaymentDueNotification | A PaymentDueNotification is a notification about due payments (accounts receivable and accounts payable). |
| 0450 | CreditAgencyReport Query | A CreditAgencyReportQuery is an inquiry to a credit agency concerning the credit report for a business partner. |
| 0451 | CreditAgencyReport-Response | A CreditAgencyReportResponse is a response from a credit agency concerning the inquiry about the |

-continued

| Code | Name | Description |
|---|---|---|
| | | credit report for a business partner. |
| 0452 | CreditWorthinessQuery | A CreditWorthinessQuery is an inquiry to credit management concerning the credit worthiness of a business partner. |
| 0453 | CreditWorthinessResponse | A CreditWorthinessResponse is a response from credit management concerning the inquiry about the credit worthiness of a business partner. |
| 0454 | CreditWorthinessChange-Information | A CreditWorthinessChangeInformation is information about changes of the credit worthiness of a business partner. |
| 0455 | CreditCommitmentQuery | A CreditCommitmentQuery is an inquiry from credit management concerning existing payment obligations of a business partner. |
| 0456 | CreditCommitmentResponse | A CreditCommitmentResponse is a response concerning an inquiry from credit management about existing payment obligations of a business partner. |
| 0457 | CreditCommitmentRecord-Notification | A CreditCommitmentRecordNotification is a notice to credit management about existing payment obligations of business partners. |
| 0458 | CreditWorthinessCritical-PartiesQuery | A CreditWorthinessCriticalPartiesQuery is an inquiry to credit management about business partners, for which the credit worthiness has been rated as critical. |
| 0459 | CreditWorthinessCritical-PartiesResponse | A CreditWorthinessCriticalpartiesResponse is a response from credit management concerning an inquiry about business partners, for which the credit worthiness has been rated as critical. |
| 0460 | CreditPaymentBehaviour-SummaryNotification | A CreditPaymentRecordNotification is a notification to credit management about the payment behavior (payments made, open items, dunning notices) of a business partner. |
| 0601 | PersonnelTimeSheet-Information | A PersonnelTimeSheetInformation is a notice to personnel time management.about personnel times and personnel time events recorded by an upstream personnel time recording system. |

Message types may be collected in this code list.

(sssss) Name

A GDT Name 15800 is a word or word combination used to name or identify an object. An example of GDT Name 15800 is: <ProductName>NW Feezer SJ-450</ProductName>.

The structure of GDT Name 15800 is depicted in FIG. 158. For the GDT Name 15800, the Object Class is 15802, the Representation/Association is Text 15804, the Type is CCT 15806, and the Type Name is Text 15808.

For the Language Code 15810, the Category is Attribute 15812, the Object Class is Name 15814, the Property is Language Code 15816, the Representation/Association Code 15818, the Type is xsd 15820, the Type Name is Language 15822, the Length is from two to five 15824, and the Cardinality is zero or one 15826. GDT Name 15800 is from the Core Component Type "Text."

The GDT Name 15800 can be language-specific. If the name is language-specific, the attribute "languageCode" can be used to determine the relevant language of the name according to RFC 3066.

GDT Name 15800 may be used for the object label that is typically used in a natural language context. This may be the name of a person, location, service or product, for example.

The GDT Name 15800 can be language-specific. For example, an object can have a different name in different languages. In this case, the language may be specified using the "languageCode" attribute.

(ttttt) Note

A GDT Note 15900 is a brief communication, the language of which is not explicitly specified. An example of GDT Note 15900 is: <DocumentNote>Order 04.04.2002</DocumentNote>.

The structure of GDT Note 15900 is depicted in FIG. 159. For the GDT Note 15900, the Property is Note 15902, the Representation/Association is Text 15904, the Type is CCT 15906, and the Type Name is Text 15908. The GDT Note 15900 may be a restricted GDT. GDT Note 15900 is from the Core Component Type "Text":

GDT Note 15900 may be used to title or briefly describe a complex object. In a variation, GDT Note 15900 may not be used as a placeholder when there is no other appropriate global type for an individual element. GDT Note 15900 may not have its own language. Either the language is known from the context or GDT Note 15900 is language-independent.

(uuuuu) ObjectStructureRelationshipTypeCode

The GDT ObjectStructureRelationshipTypeCode 16000 is a coded representation of the type of a business relationship between objects of the same object type, and is used to create structures (hierarchies or networks) on these objects. An example of GDT ObjectStructureRelationshipTypeCode 16000 is: <ObjectStructureRelationshipTypeCode>001</ObjectStructureRelationshipTypeCode>.

The structure of GDT ObjectStructureRelationshipTypeCode 16000 is depicted in FIG. 160. The GDT Object Structure Relationship Type Code 16000, the Object Class is Object Structure Relationship 16002, the Property is Type Code 16004, the Representation/Association is Code 16006, the Type is CCT 16008, the Type Name is Code 16010, and the Length is three 16012. The GDT ObjectStructureRelationshipTypeCode 16000 may be a restricted GDT.

ObjectStructureHierarchyRelationshipTypeCode can have the values 001 through 006. 001 means the relationship is a bill of materials relationship. 002 means the relationship is a grouping relationship. The object involved in this relationship is part of a logical grouping to the other object. 003 means the relationship is a discount-in-kind relationship. 004 means the relationship is a spare-part relationship. 005 means the relationship is an accessories relationship. 006 means the relationship is a substitute-product relationship.

GDT ObjectStructureRelationshipTypeCode 16000 is used for typing relationships between objects of a single object type, for example, relationships between products (e.g., a spare-part relationship), relationships between (document) items (e.g., a discount-in-kind relationship), or relationships between project plans.

The typing of relationships between objects of different object types may not be covered by this GDT. This includes relationships between a product and a business document, between a marketing plan and a marketing campaign, between a business document and an item of a document, or between a project plan and a project plan element.

Furthermore, the GDT ObjectStructureRelationshipTypeCode 16000 may be restricted to the typing of relationships from a purely business perspective. In a variation, technical typings (e.g., "implemented by" or "generated from") may not be covered.

(vvvvv) OrdinalNumberValue

A GDT OrdinalNumberValue 16100 is a number that indicates the position of an element in a linearly ordered set that is ordered according to particular factors. An example of GDT OrdinalNumberValue 16100 is: <OrdinalNumberValue>4</OrdinalNumberValue>.

The structure of GDT OrdinalNumberValue 16100 is depicted in FIG. 161. The GDT Ordinal Number Value 16100, the Representation/Association Quality is Ordinal Number 16102, the Representation/Association is Value 16104, the Type is xsd 16106, the Type Name is Positive Integer 16108, an the Length is from one to nine 16110.

Positive, whole numbers smaller than one billion are permitted. GDT OrdinalNumberValue 16100 may be used in a catalog to specify the order of characteristics in a list of characteristics.

(wwwww) PartialDelivery

A GDT PartialDelivery 16200 is the maximum number of partial deliveries that may/can be carried out to deliver the ordered quantity of an item. An example of GDT PartialDelivery 16200 is:

```
<PartialDelivery>
    <MaximalNumber>
        9
    <\MaximalNumber>
<\ PartialDelivery >.
```

The structure of GDT PartialDelivery 16200 is depicted in FIG. 162. For the GDT Partial Delivery 16200, the Object Class is Partial Delivery 16202 and the Representation/Association is Details 16204.

For Category Element 16206, the Object Class is Partial Delivery 16208, the Property is Maximal Number 16210, the Representation/Association is Integer 16212, the Type is GDT 16214, the Type Name is Integer Value 16216, the Length is one 16218. The Cardinality is zero or one 16220. For Category Element 16206, zero not allowed 16222. A length of 1 in the MaximalNumber field means that a maximum of up to 9 partial deliveries will be accepted to fulfill the ordered quantity. The specification is made as a whole number without any plus/minus sign (e.g., 9). No entry in this field means that complete delivery is wanted and no partial delivery is allowed even if the UnlimitedIndicator is not set.

For Category Element 16224, the Object Class is Partial Delivery 16226, the Property is Unlimited Indicator 16228, the Representation/Association is Indicator 16230, the Type is GDT 16232, the Type Name is Value Unlimited Indicator 16234, and the Length is one 16236. The Cardinality is zero or one 16238. The UnlimitedIndicator can have the values 1 (true) or 0 (false). True means that a number of partial deliveries will be accepted. False means that a number of partial deliveries will not be accepted. The fields MaximalNumber and UnlimitedIndicator are mutually exclusive, i.e., entering "true" or "1" in the UnlimitedIndicator and simultaneously making an entry in Number is not logical.

PartialDelivery comprises two child elements, Number from the CCT: Numeric and UnlimitedIndicator from the CCT: Indicator.

GDT PartialDelivery 16200 indicates the maximum number of partial deliveries (including the first delivery) that may be performed to deliver the ordered quantity of an item.

(xxxxx) PartyID

A GDT PartyID 16300 is a unique identifier for a party. A party is a natural person, organization, or group in which a company has a business or intra-enterprise interest. This could be a person, organization, or group within or outside of the company. An example of GDT PartyID 16300 is:

Example 1

Standard ID, Standard Agency

```
<PartyID        schemeID="DUNS"
                    schemeAgencyID="016">
    065055766
</PartyID>
    065055766 = Bosch at DUNS
    016 = DUNS from Code List DE 3055
```

Example 2

Proprietary ID, Proprietary Agency

```
<PartyID          schemeID="PartyID"
                      schemeAgencyID="BPL_300">
                      schemeAgencySchemeAgencyID="ZZZ">
    4711
</PartyID>.
```

In the above examples, 4711 refers to the business partner in system BPL__300 with SAP CMDMm and ZZZ refers to a proprietary agency from Code List DE 3055.

The structure of GDT PartyID 16300 is depicted in FIG. 163. The GDT PartyID 16300 includes attributes schemeID 16316, schemeAgencyID 16334, schemeAgencySchemeID 16352, and schemeAgencySchemeAgencyID 16370. For the GDT PartyID 16300, the Object Class is Party 16302, the Property is Identification 16304, the Representation/Association term is Identifier 16306, the Type term is CCT 16308, the Type Name term is Identifier 16310, and the Length is from one to sixty 16312. The GDT PartyID 16300 may be a restricted GDT.

For the schemeID 16316, the Category is Attribute 16318, the Object Class is IdentificationScheme 16320, the Property tem is Identification 16322, the Representation/Association term is Identifier, the Type term is xsd 16326, the Type Name term is Token 16328, and the Length is from one to sixty 16330. The Cardinality between the GDT PartyID 16300 and the schemeID 16316 is zero or one 16332.

For the schemeAgencyID 16334, the Category is Attribute 16336, the Object Class is IdentificationSchemeAgency 16338, the Property is Identification 16340, the Representation/Association term is Identifier 16342, the Type term is xsd 16344, the Type Name term is Token 16346, and the Length is from one to sixty 16348. The Cardinality between the GDT PartyID 16300 and the schemeAgencyID 16334 is zero or one 16350.

For the schemeAgencySchemeID 16352, the Category is Attribute 16354, the Object Class is IdentificationSchemeAgency 16356, the Property is Scheme 16358, the Representation/Association term is Identifier 16360, the Type term is xsd 16362, the Type Name term is Token 16364, and the Length is from one to sixty 16366. The Cardinality between the GDT PartyID 16300 and the schemeAgencySchemeID 16352 is zero or one 16368.

For the schemeAgencySchemeAgencyID 16370, the Category is Attribute 16372, the Object Class is IdentificationSchemeAgency 16374, the Property is SchemeAgency 16376, the Representation/Association term is Identifier 16378, the Type term is xsd 16380, the Type Name term is Token 16382, and the Length is three 16384. The Cardinality between the GDT PartyID 16300 and the schemeAgencySchemeAgencyID 16370 is zero or one 16386.

The definition of the GDT PartyID 16300 includes persons, organizations, and party groups. The name GDT PartyID 16300 was intentionally chosen instead of BusinessPartnerID in order to be able to use the GDT for parties in which there is no direct business interest (e.g., employees' partners or children). The GDT is intended to cover roles which a party might assume. IDs that identify a party are permitted. IDs that identify a location may not be permitted.

GDT PartyID 16300 is used for software representation of a natural person, a legal person (organization), or a grouping of natural persons, legal persons, and their groupings (business partner group). The different roles of a party (e.g., Buyer, Vendor, Supplier) can be used in accordance with the UBL standard to enhance element names (e.g., BuyerPartyID).

(yyyyy) PartyInternalID

A CDT PartyInternalID 16400 is a proprietary identifier for a party. A party is a natural person, organization, or group in which a company has a business or intra-enterprise interest. This could be a person, organization, or group within or outside of the company. An example of a GUID of a party is:

```
<PartyInternalID schemeID="PartyGUID"
schemeAgencyID=
"MPL_002">1C743CEC501F6A4D8826C7EC5A8554B9
</PartyInternal ID>
```

In the example, schemeID="PartyGUID" indicates that the scheme "PartyGUID" was used to identify the party, and schemeAgencyID="MPL__002" indicates that the scheme was assigned by the business system "MPL__002."

The following is an example of a party ID of a party:

```
<PartyInternalID schemeID="PartyID"
schemeAgencyID="MPL_002">4711</PartyInternalID>.
```

The structure of CDT PartyInternalID 16400 is depicted in FIG. 164. The CDT PartyInternalID 16400 includes attributes schemeID 16418 and schemeAgencyID 16436. For the CDT PartyInternalID 16400, the Object Class is Party 16402, the Property Qualifier term is Internal 16404, the Property is Identification 16406, the Representation/Association term is Identifier 16408, the Type term is GDT 16410, the Type Name term is PartyID 16412, and the Length is from one to thirty-two 16414. The CDT PartyInternalID 16400 may be a restricted CDT.

For the schemeID 16418, the Category is Attribute 16420, the Object Class is IdentificationScheme 16422, the Property is Identification 16424, the Representation/Association term is Identifier 16426, the Type term is xsd 16428, the Type Name term is Token 16430, and the Length is from one to sixty 16432. The Cardinality between the CDT PartyInternalID 16400 and the schemeID 16418 is zero or one 16434.

For the schemeAgencyID 16436, the Category is Attribute 16438, the Object Class is IdentificationSchemeAgencyID 16440, the Property is Identification 16442, the Representation/Association term is Identifier 16444, the Type term is xsd 16446, the Type Name term is Token 16448, and the Length is from one to sixty 16450. The Cardinality between the CDT PartyInternalID 16400 and the schemeAgencyID 16436 is zero or one 16452.

PartyGUID and PartyID are schemes provided for scheme ID. PartyGUID identifies a party via a Global Unique Identifier, and PartyID identifies a party via an identification number. ShemeAgencyID identifies a business system in which the identifier was assigned.

The CDT PartyInternalID 16400 represents a projection of the GDT "PartyID," in which the attributes "schemeID" and "schemeAgencyID" are contained for describing an internally assigned ID. If an attribute is not explicitly assigned in the use of the CDT, it may be determined through the context.

The CDT PartyInternalID 16400 is used when both sender and recipient can access shared master data, e.g., during internal communication.

(zzzzz) PartyPartyID

A CDT PartyPartyID 16500 is an identifier for a party assigned by a party. A party is a natural person, organization, or group in which a company has a business or intra-enterprise interest. This could be a person, organization, or group within or outside of the company. An example is:

<BuyerPartySellerID>ABC</BuyerPartySellerID>

(the ID assigned by the seller for the Buyer).

The structure of CDT PartyPartyID 16500 is depicted in FIG. 165. For the CDT PartyPartyID 16500, the Object Class is Party 16502, the Property Qualifier term is Party 16504, the Property is Identification 16506, the Representation/Association term is Identifier 16508, the Type term is GDT 16510, the Type Name term is PartyID 16512, and the Length is from one to sixty 16514. The CDT PartyPartyID 16500 may be a restricted CDT.

The CDT PartyPartyID 16500 is the proprietary identifier assigned by a party. The party (in its role) that assigned this identifier may derive from the context of the message that the CDT PartyPartyID 16500 uses. The CDT PartyPartyID 16500 limits the general identifier PartyID. In contrast to "PartyStandardID," the use of the "PartyPartyID" is role-dependent (e.g., as an ID assigned by the Buyer). The party that assigns the ID is indicated by its role. The "Party" is replaced with the "partner role type" (e.g., PartySellerID). The SchemeID and schemeVersionID may be included as attributes to differentiate between several schemes. (See also PartyID and PartyStandardID).

(aaaaaa) PartyStandardID

A CDT PartyStandardID 16600 is a standardized identifier for a party, and the identification scheme used is controlled by an agency from the code list DE 3055. A party is a natural person, organization, or business partner group in which a company has a business or intra-enterprise interest. This could be a person, organization, or group within or outside of the company. An example is:

```
<BuyerParty>
    . . .
    <StandardID schemeAgencyID="016">123456789
    </PartyStandardID>
    . . .
</BuyerParty>
```

(the standardID assigned for the buyer).

The structure of PartyStandardID is depicted in FIG. 166. The CDT PartyStandardID 16600 includes attribute schemeAgencyID 16618. For the CDT PartyStandardID 16600, the Object Class is Party 16602, the Property Qualifier term is Standard 16604, the Property is Identification 16606, the Representation/Association term is Identifier 16608, the Type term is GDT 16610, the Type Name term is PartyID 16612, and the Length is from one to thirteen. The CDT PartyStandardID 16600 may be a restricted CDT.

For the schemeAgencyID 16618, the Category is Attribute 16620, the Object Class is IdentificationSchemeAgency 16622, the Property is Identification 16624, the Representation/Association term is Identifier 16626, the Type term is xsd 16628, the Type Name term is Token 16630, and the Length is three 16632. The Cardinality between the CDT PartyStandardID 16600 and the schemeAgencyID 16618 is one 16634.

The attribute 'schemeAgencyID' can contain values from the code list DE 3055. The codes which are supported for schemeAgencyID are: 1) 009 (EAN.UCC) for the 13-character Global Location Number (GLN); 2) 016 (Dun&Bradstreet Corporation) for the 9-character DUNS (Data Universal Numbering System); and 3) 182 (US, Standard Carrier Alpha Code (Motor) Organization) for the 2-to-4-character SCAC (Standard Carrier Alpha Code).

CDT PartyStandardID 16600 limits the general identifier PartyID to standard identifiers, whose scheme was assigned by a standardization organization from code list DE 3055. IDs that identify a party are permitted. IDs that identify a location may not be permitted. In contrast to PartyPartyID, use of CDT PartyStandardID 16600 is not role dependent. See also PartyID and PartyPartyID.

(bbbbbb) PaymentCard

A GDT PaymentCard 16700 is an identification card that authorizes the holder to settle invoices without cash with contract companies connected to the payment system. An example is:

CreditCard VISA:

```
CreditCard VISA:
<PaymentCard>
    <ID schemeAgencyID="XYZ" schemeAgencySchemeID="9362"
schemeAgencySchemeAgencyID="5">5555222200008888</ID>
    <ReferenceID>8765432</ReferenceID>
    <SequenceID>01</SequenceID>
    <HolderName>Mayermann</HolderName>
    <ExpiryDate>2005-05-31</ExpiryDate>
</PaymentCard>
CustomerCard IKEAGold:
<PaymentCard>
    <ID schemeID="IKEAGold" schemeAgencyID="124224"
schemeAgencySchemeID="DUNS"
schemeAgencySchemeAgencyID="16">
        AEIBDEFXXXX
    </ID>
    <ReferenceID>8765432</ReferenceID>
    <HolderName>Mayermann</HolderName>
    <ExpiryDate>2005-05-31</ExpiryDate>
</PaymentCard>.
```

The structure of GDT PaymentCard 16700 is depicted in FIG. 167. The GDT PaymentCard 16700 includes elements ID 16706, ReferenceID 16722, SequenceID 16740, Holder 16760, and ExpirationDate 16778. For the GDT Payment Card 16700, the Object Class is Payment Card 16702, and the Representation/Association term is Details 16704.

The ID is an unique identifier for a payment card. For the ID 16706, the Category is Element 16708, the Object Class is Payment Card 16710, the Property is Identification 16712, the Representation/Association term is Identifier 16714, the Type term is GDT 16716, and the Type Name term is PaymentCardID 16718. The Cardinality between the GDT PaymentCard 16700 and the ID 16706 is one 16720.

The ReferenceID is an additional reference number that is required for certain credit cards or customer cards for security purposes to guarantee error-free processing. For the ReferenceID 16722, the Category is Element 16724, the Object Class is PaymentCard 16726, the Property is Reference Identification 16728, the Representation/Association term is Identifier 16730, the Type term is CCT 16732, the Type Name term is Identifier 16734, and the Length is from one to twenty-five 16736. The Cardinality between the GDT PaymentCard 16700 and the ReferenceID 16722 is zero or one 16738. The ReferenceID 16722 may be restricted 16740.

The SequenceID is a sequence number of the payment card that indicates that the bank has issued more than one card for an account, and identifies which card is being used in this case.

For the SequenceID 16740, the Category is Element 16742, the Object Class is PaymentCard 16744, the Property is Sequence Identification 16746, the Representation/Association term is Identifier 16748, the Type term is CCT 16750, the Type Name term is Identifier 16752, and the Length is from one to ten 16754. The Cardinality between the GDT PaymentCard 16700 and the SequenceID 16740 is zero or one 16756. The SequenceID 16740 may be restricted 16758.

The Holder is the name of the cardholder (name of a person or company; for a person's name, both first and last names are usually included). For the Holder 16760, the Category is Element 16762, the Object Class is Payment Card 16764, the Property is Holder 16766, the Representation/Association term is Text 16768, the Type term is CCT 16770, the Type Name term is text 16772, and the Length is from one to forty 16774. The Cardinality between the GDT PaymentCard 16700 and the Holder 16760 is zero or one 16776.

The ExpirationDate is an expiration date of the payment card. For the ExpirationDate 16778, the Category is Element 16780, the Object Class is Payment Card 16782, the Property is Expiration Date 16784, the Representation/Association term is Date 16786, the Type term is GDT 16788, and the Type Name term is Date 16790. The Cardinality between the GDT PaymentCard 16700 and the ExpirationDate 16778 is one 16792.

No restriction is placed on company-specific customer cards in terms of the possible identifications based on UN/CEFACT code list DE 3055. The GDT PaymentCard 16700 is used when the payment card is a credit card that belongs to one of the listed standard types, or a company-specific customer card.

(cccccc) PaymentCardID

A GDT PaymentCardID 16800 is a unique identifier for a payment card. An example is:

CreditCard VISA:

```
CreditCard VISA:
<PaymentCardID
    schemeAgencyID="XYZ" schemeAgencySchemeID="9362"
schemeAgencySchemeAgencyID="5">5555222200008888
</IPaymentCardID>
CustomerCard IKEAGold:
<PaymentCardID>
    schemeID="IKEAGold" schemeAgencyID="124224"
schemeAgencySchemeID="DUNS"
schemeAgencySchemeAgencyID="16">
AEIBDEFXXXX
</PaymentCardID>
```

The structure of GDT PaymentCardID 16800 is depicted in FIG. 168. The GDT PaymentCardID 16800 includes attributes schemeID 16820, schemeAgencyID 16838, schemeAgencySchemeID 16856, and schemeAgency-SchemeAgencyID 16874. For the GDT PaymentCardID 16800, the Category is Element 16802, the Object Class is Payment Card 16804, the Property is Identification 16806, the Representation/Association term is Identifier 16808, the Type term is CCT 16810, the Type Name term is Identifier 16812, and the Length is from one to twenty-five 16814. The Cardinality of the GDT PaymentCardID 16800 is one 16816. The GDT PaymentCardID 16800 may be a restricted GDT.

For the schemeID 16820, the Category is Attribute 16822, the Object Class is Identification Scheme 16824, the Property is Identification 16826, the Representation/Association term is Identifier 16828, the Type term is xsd 16830, the Type Name term is token 16832, and the Length is from one to sixty 16834. The Cardinality between the GDT PaymentCardID 16800 and the schemeID 16820 is one 16836.

For the schemeAgencyID 16838, the Category is Attribute 16840, the Object Class is Identification Scheme Agency 16842, the Property is Identification 16844, the Representation/Association term is Identifier 16846, the Type term is xsd 16848, the Type Name term is token 16850, and the Length is from one to sixty 16852. The Cardinality between the GDT PaymentCardID 16800 and the schemeAgencyID 16838 is one 16854.

For the schemeAgencySchemeID 16856, the Category is Attribute 16858, the Object Class is Identification Scheme Agency 16860, the Property is Scheme 16862, the Representation/Association term is Identifier 16864, the Type term is xsd 16866, the Type Name term is token 16868, and the Length is from one to sixty 16870. The Cardinality between the GDT PaymentCardID 16800 and the schemeAgency-SchemeID 16856 is zero or one 16872.

For the schemeAgencySchemeAgencyID 16874, the Category is Attribute 16876, the Object Class is Identification Scheme Agency 16878, the Property is Scheme Agency 16880, the Representation/Association term is Identifier 16882, the Type term is xsd 16886, the Type Name term is token 16886, and the Length is three 16888. The Cardinality between the GDT PaymentCardID 16800 and the schemeAgencySchemeAgencyID 16874 is zero or one 16890.

No restriction is placed on company-specific customer cards in terms of the possible identifications based on UN/CEFACT code list DE 3055. In a variation, the identifier for the standard types is based on the BIC (Bank Identification Code), whose scheme is standardized according to ISO 9362: 1994. Therefore, the attribute "schemeAgencySchemeID" is set to 9362 for standard types, and the attribute "schemeAgencySchemeAgencyID" is set to '5' for ISO. Standard types are registered using SWIFT. These standard types can be queried at the following link: www.swift.com/biconline/index.cfm Then, e.g., "XYZ" is the result for attribute "schemeAgencyID."

The responsible organizations for the company-specific customer cards are identified via a generally valid and standardized identification, like that of Dun & Bradstreet. For this, the attribute "schemeID" may contain the identifier of the corresponding identification list (e.g., IKEAGold). In the attribute "schemeAgencyID," the particular unique identification may correspond to the responsible organization according to the international standardized identifier list (for example, DUNS). The attribute "schemeAgencySchemeID" contains the identification of the scheme on which the organization identifier is based, and the attribute "schemeAgencySchemeAgencyID" contains the particular identification according to the DE 3055 code list, which is responsible for the international and standardized identification scheme for the responsible organization of the company-specific customer card.

(dddddd) PaymentFormCode

The CDT PaymentFormCode 16900 is a coded representation of the payment form. The payment form is the way in which, e.g., goods or services are paid for. An example is: <PaymentFormCode>01</PaymentFormCode>.

The structure of CDT PaymentFormCode 16900 is depicted in FIG. 169. For the CDT PaymentFormCode 16900, the Object Class is Payment 16902, the Property is Form Code 16904, the Representation/Association term is Code 16906, the Type term is CCT 16908, the Type Name term is Code 16910, and the Length is two 16912. The CDT PaymentFormCode 16900 may be a restricted CDT.

CDT PaymentFormCode 16900 can have the following values: 01) Invoice, which means that the selling company issues an invoice to the buyer; 02) PaymentCard, which means that the buyer pays with credit card, customer card, or generally a payment card; 03) CashOnDelivery, which means that the payment is made on delivery; and 04) BankCollection, which means that the payment is carried out using automatic debit.

Existing standardized code lists (e.g., UN/EDIFACT code list '4461', Payment Means Code) may not cover these values. Consequently, the above code list may be used for this GDT, and this code list is submitted to the responsible standardization body. The CDT PaymentFormCode 16900 is used to determine the payment form when goods or services are ordered. The code "Invoice" is the default value.

The CDT PaymentFormCode 16900 does not contain additional information needed for payment processing, e.g., the type and number of the credit card or the number of the bank account from which the payment should be debited. Some of this information is transmitted in other parts of the message, and some is transmitted in separate messages. The CDT PaymentFormCode 16900 should not be confused with the PaymentMethod, which describes in detail how a payment is carried from FI, HR, or the Treasury.

Some parts of the UN/EDIFACT code list 4461 (Payment Means Code) (or ASC X12 107) can also be used for the PaymentMethodCode, including 1) Domestic bank transfer; 2) Foreign bank transfer; 3) Postal transfer; 4) Bank direct debit; 5) Check; 6) Order check; 7) Bank check; and 8) Bill of exchange.

A suitable payment method is determined based on the payment form. These two terms cannot be placed together in one list, as shown below.

| PaymentFormCode | >>> | PaymentMethodCode |
|---|---|---|
| Invoice | | BankTransfer, Check |
| PaymentCard | | PaymentCard |
| CashOnDelivery | | Check, Cash |
| BankCollection | | DirectDebit |

Up until CRM 4.0, three values (PaymentCard, CashOnDelivery, Per Invoice) are used. If a payment is to be made per invoice, it is not necessary to specify a payment form. To use a new value, an implementation for the new code may be made; therefore, CRM may not accept other values.

(eeeeee) Percent

A GDT Percent 17000 is a number that relates to the comparison FIG. 100. An example is: <ProductTaxPercent>16</ProductTaxPercent>.

The structure of GDT Percent 17000 is depicted in FIG. 170. GDT Percent 17000 is given as a percent value. For the GDT Percent 17000, the Category is Element 17002, the Representation/Association term is Percent 17004, the Type term is xsd 17006, the Type Name term is decimal 17008, and the Length is maximum ten predecimal values and 6 decimal values 17010.

Positive and negative values can be used by using the built-in data type "xsd: decimal." Negative values may be prefixed with a negative sign ("–"). However, positive values do not require a positive sign "+" prefix.

No measurements or currencies are specified in GDT Percent 17000.

GDT Percent 17000 can be used to represent a percentage that indicates how many hundredths of a basic value are to be calculated. The result of the calculation is the proportion in percent of, e.g., amounts, values, rates, discounts, and taxes. Further examples for the application of Percent are proportion and comparison information, such as dividends and earnings, or a percentage comparison of target and actual business results, or trade or amount margins.

Information on measurements or currencies may be expressed in the basic value, for example:

```
<Total>
<Amount currencyCode="EUR">777.95</Amount>
<ProductTaxPercent>16</ProductTaxPercent>
</Total>
```

Here the value added tax rate of 16 percent is specified for the basic value of 777.95 EUR.

(ffffff) PersonName

A GDT PersonName 17100 contains the parts of a natural person's name. An example is:

```
<PersonName>
    <FormattedName>Mr. Paul John Tester</FormattedName>
    <LegalName>Paul John Tester</LegalName>
    <GivenName></GivenName>
    <PreferredGivenName>Paul</PreferredGivenName>
    <MiddleName>John</MiddleName>
    <Family>
        <FamilyName>Tester</FamilyName>
        <PrimaryIndicator>true</PrimaryIndicator>
        <FamilyNamePrefix></FamilyNamePrefix>
    </Family>
    <Affix>
        <AffixName>Mr.</AffixName>
        <AffixCode>FormOfAddress</AffixCode>
    </Affix>
</PersonName>
```

The structure of GDT PersonName 17100 is depicted in FIG. 171. The GDT PersonName 17100 includes elements FormattedName 17108, LegalName 17126, GivenName 17144, PreferredGivenName 17162, MiddleName 17180, Family 17198, FamilyName 17111, PrimaryIndicator 17127, FamilyNamePrefix 17147, Affix 17167, AffixName 17179, and AffixCode 17197. For the GDT PersonName 17100, the Category is Element 17102, the Object Class is PersonName 17104, and the Representation/Association term is Details 17106.

The attribute FormattedName 17108 contains, in one string, a formatted name with its pieces in their places. This includes the necessary punctuation. For the FormattedName 17108, the Category is Element 17110, the Object Class is PersonName 17112, the Property is FormattedName 17114, the Representation/Association term is Name 17116, the Type term is xsd 17118, the Type Name term is string 17120, and the Length is eighty 17122. The Cardinality between the GDT PersonName 17100 and the FormattedName 17108 is zero or one 17124.

The attribute LegalName 17126 is the legal name used for legal documentation or other legal purposes. LegalName 17126 contains, in one string, a formatted name with its pieces in their places. This includes the necessary punctuation. For the LegalName 17126, the Category is Element 17128, the Object Class is PersonName 17130, the Property is LegalName 17132, the Representation/Association term is Name 17134, the Type term is xsd 17136, the Type Name term is string 17138, and the Length is eighty 17140. The Cardinality between the GDT PersonName 17100 and the LegalName 17126 is zero or one 17142.

The attribute GivenName 17144 contains the given or chosen name. Also known as a person's first name. If multiple givenNames are used, the order is implied. For the GivenName 17144, the Category is Element 17146, the Object Class is PersonName 17148, the Property is GivenName 17150, the Representation/Association term is Name 17152, the Type term is xsd 17154, the Type Name term is string 17156, and the Length is forty 17158. The Cardinality between the GDT PersonName 17100 and the GivenName 17144 is zero or unbounded 17160.

The attribute PreferredGivenName 17162 contains the chosen name by which the person prefers to be addressed. Note: This name may be a name other than a given name, such as a nickname. For the PreferredGivenName 17162, the Category is Element 17164, the Object Class is PersonName 17166, the Property is PreferredGivenName 17168, the Representation/Association term is Name 17170, the Type term is xsd 17172, the Type Name term is string 17174, and the Length is from one to forty 17176. The Cardinality between the GDT PersonName 17100 and the PreferredGivenName 17162 is zero or one 17178.

The attribute MiddleName 17180 contains a person's middle name or initial. For the MiddleName 17180, the Category is Element 17182, the Object Class is PersonName 17184, the Property is MiddleName 17186, the Representation/Association term is Name 17188, the Type term is xsd 17190, the Type Name term is string 17192, and the Length is from one to forty 17194. The Cardinality between the GDT PersonName 17100 and the MiddleName 17180 is zero or unbounded 17196.

The attribute Family 17198 contains the non-chosen or inherited name. Also known as a person's last name in the Western context. For the Family 17198, the Category is Element 17101, the Object Class is PersonName 17103, the Property is Family 17105, and the Representation/Association term is Detail 17107. The Cardinality between the GDT PersonName 17100 and the Family 17198 is zero or unbounded 17109.

The element FamilyName 17111 describes the non-chosen or inherited name. For the FamilyName 17111, the Category is Element, the Object Class is Family 17113, the Property is FamilyName 17115, the Representation/Association term is Name 17117, the Type term is xsd 17119, the Type Name term is string 17121, and the Length is from one to forty 17123. The Cardinality between the GDT PersonName 17100 and the FamilyName 17111 is one 17125.

The element PrimaryIndicator 17127 allows you to mark one family name to be printed or shown first. For the PrimaryIndicator 17127, the Category is Element 17129, the Object Class is Family 17131, the Property is FamilyNamePrimaryCode 17133, the Representation/Association term is Code 17135, the Type is CCT 17137, the Type Name term is Indicator 17139, and the Length is one 17141. The Cardinality between the GDT PersonName 17100 and the PrimaryIndicator 17127 is zero or one 17143. The PrimaryIndicator 17127 is a no default value 17145.

The element FamilyNamePrefix 17147 contains the PersonName prefix, such as an aristocratic prefix. For the FamilyNamePrefix 17147, the Category is Element 17149, the Object Class is Family 17151, the Property is FamilyNamePrefix 17153, the Representation/Association term is Text 17155, the Type term is xsd 17157, the Type Name term is string 17159, and the Length is from one to twenty 17161. The Cardinality between the GDT PersonName 17100 and the FamilyNamePrefix 17147 is zero or one 17163. The FamilyNamePrefix 17147 may be different from the HR-XML Proposal 17165.

The attribute Affix 17167 contains the remaining parts of the PersonName as defined by the elements AffixName and AffixCode. For the Affix 17167, the Category is Element 17169, the Object Class is PersonName 17171, the Property is Affix 17173, and the Representation/Association term is Detail 17175. The Cardinality between the GDT PersonName 17100 and the Affix 17167 is zero or unbounded 17177.

The element AffixName 17179 contains the affix. For the AffixName 17179, the Category is Element 17181, the Object Class is Affix 17183, the Property is Affix 17185, the Representation/Association term is Name 17187, the Type term is xsd 17189, the Type Name term is string 17191, and the Length is from one to twenty 17193. The Cardinality between the GDT PersonName 17100 and the AffixName 17179 is one 17195.

The element AffixCode 17197 defines the context for the affix. For the AffixCode 17197, the Category is Element 17199, the Object Class is Affix 17102*a*, the Property is AffixCode 17104*a*, the Representation/Association term is Code 17106*a*, the Type is CCT 17108*a*, the Type Name term is Code 17110*a*, and the Length is from one to twenty 17112*a*. The Cardinality between the GDT PersonName 17100 and the AffixCode 17197 is one 17114*a*.

The code=aristocraticTitle, contains titles, such as, Baron, Earl, and so on. The code=formOfAddress, contains the form of address, for example Mr., Mrs., Hon., Dr., or Major. The code=generation, contains terms such as, Sr., Jr., III (the third). The code=qualification, contains the letters used to describe academic or other type qualifications held by a person and/or the distinctions conferred upon them, for example PhD, MD, CPA, or MCSD.

GDT PersonName 17100 is used to identify actual people.

(gggggg) PersonnelTimeEventID

A GDT PersonnelTimeEventID 17200 is a unique ID for a personnel time event. A personnel time event is a change in the execution of services of a personnel resource with which one personnel time ends and another personnel time begins. Such changes can include, e.g., the start of work, interruption of work or end of work. A personnel time event is characterized by a type such as, e.g., "clock-in entry," "clock-out entry," or "start of break." A personnel time event can include additional information (e.g., reference to project, order, cost center) for different target applications (e.g., project system or Controlling). An example is: <PersonnelTimeEventID>1234567890123456</PersonnelTimeEventID>.

The structure of GDT PersonnelTimeEventID 17200 is depicted in FIG. 172. The GDT PersonnelTimeEventID 17200 includes attributes schemeID 17216 and schemeAgencyID 17234. For the GDT PersonnelTimeEventID 17200, the Object Class is Personnel Time Event 17202, the Property is Identification 17204, the Representation/Association term is Identifier 17206, the Type term is GDT 17208, the Type Name term is Identifier 17210, and the Length is from one to forty 17212. The GDT PersonnelTimeEventID 17200 may be a restricted GDT.

The schemeID specifies the scheme according to which the ID was assigned. Currently, the following schemes are provided: 1) PersonnelTimeEventGUID, which identifies the personnel time event via a Global Unique Identifier; and 2) PersonnelTimeTypeID: Identifies the personnel time event via an internal identifier of the scheme agency. For the schemeID 17216, the Category is Attribute 17218, the Object Class is IdentificationScheme 17220, the Property is Identification 17222, the Representation/Association term is Identifier 17224, the Type term is xsd 17226, the Type Name term is Token 17227, and the Length is from one to sixty 17230. The Cardinality between the GDT PersonnelTimeEventID 17200 and the schemeID 17216 is zero or one 17232.

The schemeAgencyID 17234 identifies the business system in which the ID was assigned. For the schemeAgencyID 17234, the Category is Attribute 17236, the Object Class is IdentificationSchemeAgency 17238, the Property is Identification 17240, the Representation/Association term is Identifier 17242, the Type term is xsd 17244, the Type Name term is Token 17246, and the Length is from one to sixty 17248. The Cardinality between the GDT PersonnelTimeEventID 17200 and the schemeAgencyID 17234 is zero or one 17250.

If PersonnelTimeEventGUID is used for schemeID, PersonnelTimeEventID may comprise 1-40 characters. If "PersonnelTimeEventID" is used, PersonnelTimeEventID may comprise 1-16 characters and may be alphanumeric. If schemeID and schemeAgencyID have not been specified, they may be determined from the context.

(hhhhhh) PersonnelTimeEventTypeID

A GDT PersonnelTimeEventTypeID 17300 is a unique ID for a personnel time event type. A personnel time event type is a classification of personnel time events according to personnel time management criteria. A typical criterion is whether the employee is at work or not. Examples are "clock-in entry," "clock-out entry," or "start of break." An example is: <PersonnelTimeEventTypeID>1234567890123456</PersonnelTimeEventTypeID>

The structure of GDT PersonnelTimeEventTypeID 17300 is depicted in FIG. 173. The GDT PersonnelTimeEventTypeID 17300 includes attributes schemeID 17316 and schemeAgencyID 17334. For the GDT PersonnelTimeEventTypeID 17300, the Object Class is Personnel Time Event Type 17302, the Property is Identification 17304, the Representation/Association term is Identifier 17306, the Type term is GDT 17308, the Type Name term is Identifier 17310, and the Length is from one to forty 17312. The GDT PersonnelTimeEventTypeID 17300 may be a restricted GDT.

SchemeID 17316 identifies the scheme according to which the ID was assigned. For example, the following schemes may be supported: 1) PersonnelTimeEventTypeGUID, which identifies the personnel time event type using a Global Unique Identifier; and 2) PersonnelTimeEventTypeID: Identifies the personnel time event type using an internal identifier for the scheme agency. For the schemeID 17316, the Category is Attribute 17318, the Object Class is IdentificationScheme 17320, the Property is Identification 17322, the Representation/Association term is Identifier 17324, the Type term is xsd 17326, the Type Name term is Token 17328, and the Length is from one to sixty 17330. The Cardinality between the GDT PersonnelTimeEventTypeID 17300 and the schemeID 17316 is zero or one 17332.

The schemeAgencyID 17334 specifies the business system in which the ID was assigned. For the schemeAgencyID 17334, the Category is Attribute 17336, the Object Class is IdentificationSchemeAgency 17338, the Property is Identification 17340, the Representation/Association term is Identifier 17342, the Type term is xsd 17344, the Type Name term is Token 17346, and the Length is from one to sixty 17348. The Cardinality between the GDT PersonnelTimeEventTypeID 17300 and the schemeAgencyID 17334 is zero or one 17350.

If the PersonnelTimeEventTypeGUID is used for schemeID, the PersonnelTimeEventTypeID may comprise 1-40 characters. If the PersonnelTimeEventTypeID is used, the GDT PersonnelTimeEventTypeID 17300 may comprise 1-16 characters and may be alphanumeric. If the schemeID 17316 or the schemeAgencyID 17334 have not been specified, they may be determined from the context.

(iiiiii) PersonnelTimeID

A GDT PersonnelTimeID 17400 is a unique ID for a personnel time. A personnel time is a period of a personnel resource that is characterized by business, pay scale, or legal criteria. The period can be entered as a duration (e.g., 8 hours on Nov. 10, 2003) or as clock times (e.g., from 8:10 to 17:30 on Nov. 10, 2003). A personnel time is characterized by a personnel time type (e.g., "working time," "leave," "overtime," "availability for work," "illness," or "work break"). A personnel time can include additional information (e.g., reference to project, order, cost center) for different target applications (e.g., project system or Controlling). An example is: <PersonnelTimeID>1234567890123456</PersonnelTimeID>.

The structure of GDT PersonnelTimeID 17400 is depicted in FIG. 174. The GDT PersonnelTimeID 17400 includes attributes schemeID 17416 and schemeAgencyID 17434. For the GDT PersonnelTimeID 17400, the Object Class is Personnel Time 17402, the Property is Identification 17404, the Representation/Association term is Identifier 17406, the Type term is GDT 17408, the Type Name term is Identifier 17410, and the Length is from one and forty 17412. The GDT PersonnelTimeID 17400 may be a restricted GDT.

The schemeID 17416 specifies the scheme according to which the identifier was assigned. For example, the following schemes may be provided: 1) PersonnelTimeGUID, which identifies the personnel time using a Global Unique Identifier; and 2) PersonnelTimeID: Identifies the personnel time using an internal identifier for the scheme agency. For the schemeID 17416, the Category is Attribute 17418, the Object Class is IdentificationScheme 17420, the Property is Identification 17422, the Representation/Association term is Identifier 17424, the Type term is xsd 17426, the Type Name term is Token 17428, and the Length is from one to sixty 17430. The Cardinality between the GDT PersonnelTimeID 17400 and the schemeID 17416.

The SchemeAgencyID 17434 indicates the business system in which the identifier was assigned. For the schemeAgencyID 17434, the Category is Attribute 17436, the Object Class is IdentificationSchemeAgency 17438, the Property is Identification 17440, the Representation/Association term is Identifier 17442, the Type term is xsd 17444, the Type Name term is Token 17446, and the Length is from one to sixty 17448. The Cardinality between the GDT PersonnelTimeID 17400 and the schemeAgencyID 17434 is zero or one 17450.

If the PersonnelTimeGUID is used for the schemeID, the PersonnelTimeID may comprise 1-40 characters. If the PersonnelTimeID" is used, the PersonnelTimeID may comprise 1-16 characters and may be alphanumeric. If the schemeID or the schemeAgencyID have not been specified, they may be determined from the context.

(jjjjjj) PersonnelTimeTypeID

A GDT PersonnelTimeType ID 17500 is a unique identifier for a personnel time type. The PersonnelTimeType is a classification of personnel times according to business, pay scale, or legal criteria. Depending on whether the employee is at work or absent, the classification can be made according to payment-relevant or further personnel time management criteria. Examples include "working time," "leave," "overtime," "availability for work," "illness" or "work break." An example is: <PersonnelTimeTypeID>1234567890123456</PersonnelTimeTypeID>.

The structure of GDT PersonnelTimeTypeID 17500 is depicted in FIG. 175. The GDT PersonnelTimeTypeID 17500 includes attributes schemeID 17516 and schemeAgencyID 17534. For the GDT PersonnelTimeTypeID 17500, the Object Class is Personnel Time Type 17502, the Property is Identification 17504, the Representation/Association term is Identifier 17506, the Type term is GDT 17508, the Type Name term is Identifier, and the Length is from one to forty 17512. The GDT PersonnelTimeTypeID 17500 may be a restricted GDT.

The schemeID 17516 indicates the scheme according to which the identifier was assigned. For example, the following schemes may be provided: 1) PersonnelTimeTypeGUID, which identifies the personnel time type using a Global Unique Identifier; and 2) PersonnelTimeTypeID, which identifies the personnel time type using an internal identifier for the scheme agency. For the schemeID 17516, the Category is Attribute 17518, the Object Class is IdentificationScheme 17520, the Property is Identification 17522, the Representation/Association term is Identifier 17524, the Type term is xsd 17526, the Type Name term is Token 17528, and the Length is from one to sixty 17530. The Cardinality between the GDT PersonnelTimeTypeID 17500 and the schemeID 17516 is zero or one 17532.

The SchemeAgencyID 17534 specifies the business system in which the ID was assigned. For the schemeAgencyID 17534, the Category is Attribute 17536, the Object Class is IdentificationSchemeAgency 17538, the Property is Identification 17540, the Representation/Association term is Identifier 17542, the Type term is xsd 17544, the Type Name term is Token 17546, and the Length is from one to sixty 17548. The Cardinality between the GDT PersonnelTimeTypeID 17500 and the schemeAgencyID is zero or one 17550.

If the PersonnelTimeTypeGUID is used for the schemeID, the PersonnelTimeTypeID may comprise 1-40 characters. If the PersonnelTimeTypeID is used, the PersonnelTimeTypeID may comprise 1-16 characters and may be alphanumeric. If the schemeID or the schemeAgencyID have not been specified, it may be possible to determine them from the context.

(kkkkkk) PhoneNumber

A GDT PhoneNumber 17600 is a telephone number that comprises the international dialing code, regional area code, number, and extension. An example is:

```
<PhoneNumber>
    <AreaID>6227</AreaID>
    <SubscriberID>7</SubscriberID>
    <ExtensionID>47474</ExtensionID>
    <CountryCode>DE</ CountryCode>
</PhoneNumber>
```

The structure of GDT PhoneNumber 17600 is depicted in FIG. 176. The GDT PhoneNumber 17600 contains one telephone number. The GDT PhoneNumber 17600 includes elements AreaID 17606, SubscriberID 17626, ExtensionID 17646, and CountryCode 17666. For the GDT PhoneNumber 17600, the Object Class is PhoneNumber 17602 and the Representation/Association term is Details 17604.

The AreaID 17606 indicates the area code if known separately. It may be displayed in standardized format, i.e., without a leading zero or the like. Alternatively, the area code can be displayed together with the telephone number in SubscriberID 17626. When using a mobile phone number, the AreaID 17606 contains the prefix for the mobile phone network (also without a leading zero or the like). The synonym for AreaID 17606 is AreaCodeNumber. For the AreaID 17606, the Category is Element 17608, the Object Class is PhoneNumber 17610, the Property is PhoneNumberArea 17612, the Representation/Association term is Identifier 17614, the Type term is CCT 17616, the Type Name term is Identifier 17618, and the Length is from one to ten 17620. The Cardinality between the GDT PhoneNumber 17600 and the AreaID 17606 is zero or one 17622. The AreaID 17606 may be restricted 17624.

The SubscriberID 17626 may indicate the telephone number without the regional area code and without the international dialing code. Alternatively, SubscriberID 17626 can also contain the telephone number together with the regional area code, extension, or both. SubscriberID 17626 is displayed in a standardized format that can contain numbers or letters and cannot contain blanks or special characters. A synonym for SubscriberID 17626 is SubscriberNumber. For the SubscriberID 17626, the Category is Element 17628, the Object Class is PhoneNumber 17630, the Property is PhoneNumberSubscriber 17632, the Representation/Association term is Identifier 17634, the Type term is CCT 17636, the Type Name term is Identifier 17638, and the Length is from one to thirty 17640. The Cardinality between the GDT PhoneNumber 17600 and the SubscriberID 17626 is zero or one 17642. The SubscriberID 17626 may be restricted 17644.

The ExtensionID 17646 indicates the extension if the telephone number comprises a telephone number and an extension. Alternatively, the extension can be included in SubscriberID 17626 together with the telephone number. ExtensionID 17646 may be empty if the telephone number is a cell phone number. A synonym for ExtensionID 17646 is ExtensionTelephoneNumber. For the ExtensionID 17646, the Category is Element 17648, the Object Class is PhoneNumber 17650, the Property is PhoneNumberExtension 17652, the Representation/Association term is Identifier 17654, the Type term is CCT 17656, the Type Name term is Identifier 17658, and the Length is from one to ten 17660. The Cardinality between the GDT PhoneNumber 17600 and the ExtensionID 17646 is zero or one 17662. The ExtensionID 17646 may be restricted 17664.

The CountryCode 17666 identifies the country code in accordance with ISO 3166-1. It is used to determine the international dialing code. If it is empty, the country can be derived from the address instead. The country entered in the address and the country for the telephone number can also be different if the telephone number is provided in the context of an address. The country code is more appropriate for determining the international dialing code than the standardized format (e.g., +49). For the CountryCode 17666, the Category is Element 17668, the Object Class is PhoneNumber 17670, the Property is PhoneNumberCountry 17672, the Representation/Association term is Code 17674, the Type term is GDT 17676, and the Type Name is CountryCode 17678. The Cardinality between the GDT PhoneNumber 17600 and the CountryCode 17666 is zero or one 17680.

The telephone number is divided into components based on the Microsoft TAPI specification and ITU guidelines (International Telecommunication Union). The GDT PhoneNumber 17600 is used to describe the sequence of numbers that may be dialed to establish a connection. The GDT PhoneNumber 17600 is used for Telephone, MobilePhone, and Facsimile (fax), all of which have a similar structure.

(llllll) Price

A GDT Price 17700 is the exchange value, expressed in a monetary unit, of a product or a service in relation to a basic amount. An example is:

```
<NetPrice>
    <Amount currencyCode="EUR">32.14</Amount>
    <BaseQuantity unitCode="C62">1</BaseQuantity>
</NetPrice>
(Note: According to UN/ECE Recommendation 20, C62 is a piece)
```

The structure of GDT Price 17700 is depicted in FIG. 177. The GDT Price 17700 includes elements Amount 17706 and BaseQuantity 17720. For the GDT Price 17700, the Object Class is Price 17702 and the Representation/Association term is Details 17704.

For the Amount 17706, the Category is Element 17708, the Object Class is Price 17710, the Property is Amount 17712, the Representation/Association term is Amount 17714, the Type term is GDT 17716, and the Type Name term is Amount 17718. The Cardinality between the GDT Price 17700 and the Amount 17706 is one. For more on the Amount 17706, see GDT Amount.

For the BaseQuantity 17720, the Category is Element 17722, the Object Class is Price 17724, the Property is Base 17726, the Representation/Association term is Quantity 17728, the Type term is GDT 17730, and the Type Name term is Quantity 17732. The Cardinality between the GDT Price 17700 and the BaseQuantity 17720 is one. For more on the BaseQuantity 17720, see GDT Quantity.

GDT Price 17700 is used for the price of goods, products, and services. See the following examples: 1) Natural price; 2) Market price; 3) Unit price; 4) Total price; and 5) Recommended price.

(mmmmmm) PriceComponent

A GDT PriceComponent 17800 is a non-fiscal part of a price that was calculated for the quantity of a product. An example is:

```
<PriceComponent >
  <TypeCode>0001</TypeCode >
  <Description languageCode="EN">Product Base Price</Description >
  <Amount currencyCode="EUR">250</Amount>
</PriceComponent >
<PriceComponent >
  <TypeCode>0004</TypeCode >
  <Description languageCode="EN">Customer Discount</Description >
  <BaseAmount currencyCode="EUR">250</BaseAmount>
  <Percent>5</Percent>
  <Amount currencyCode="EUR">12.5</Amount>
</PriceComponent >
```

The structure of GDT PriceComponent 17800 is depicted in FIG. 178. The GDT PriceComponent 17800 includes elements TypeCode 17808, Description 17826, BaseAmount 17842, Percent 17858, and Amount 17874. For the GDT PriceComponent 17800, the Category is Complex 17802, the Object Class is PriceComponent 17804, and the Representation/Association term is Details 17806.

The TypeCode 17808 is the coded representation of a type of price component according to GDT PriceComponentTypeCode. For the TypeCode 17808, the Category is Element 17810, the Object Class is PriceComponent 17812, the Property is Type Code 17814, the Representation/Association term is Code 17816, the Type term is GDT 17818, the Type Name term is PriceComponentTypeCode 17820, and the Length is four 17822. The Cardinality between the GDT PriceComponent 17800 and the TypeCode 17808 is one 17824.

The Description 17826 is additional natural language information on price component, which may be optional. For the Description 17826, the Category is Element 17828, the Object Class is PriceComponent 17830, the Property is Description 17832, the Representation/Association term is Text 17834, the Type term is GDT 17836, and the Type Name term is Description 17838. The Cardinality between the GDT PriceComponent 17800 and the Description 17826 is zero or one 17840.

The BaseAmount 17842 is the base amount from which a price component is calculated using a percentage, which may be optional. For the BaseAmount 17842, the Category is Element 17844, the Object Class is PriceComponent 17846, the Property is Base Amount 17848, the Representation/Association term is Amount 17850, the Type term is GDT 17852, and the Type Name term is Amount 17854. The Cardinality between the GDT PriceComponent 17800 and the BaseAmount 17842 is zero or one 17856.

The Percent 17858 is the percentage which is used to calculate a price component from a base amount, which may be optional. For the Percent 17858, the Category is Element 17860, the Object Class is PriceComponent 17862, the Property is Percent 17864, the Representation/Association term is Percent 17866, the Type term is GDT 17868, and the Type Name term is Percent 17870. The Cardinality between the GDT PriceComponent 17800 and the Percent 17858 is zero or one 17872.

The Amount 17874 is the amount of a price component. For the Amount 17874, the Category is Element 17876, the Object Class is PriceComponent 17878, the Property is Amount 17880, the Representation/Association term is Amount 17882, the Type term is GDT 17884, and the Type Name term is Amount 17886. The Cardinality between the GDT PriceComponent 17800 and the Amount 17874 is one 17888.

If GDT PriceComponents 17800 are specified for a quantity of a product, the PriceComponentTypeCode for the base price may be used once here. The two optional elements BaseAmount and Percent may either both be specified or not specified in each instance of PriceComponent. Manual changes to a percentage price component for the quantity of a product in the original document lead to the value calculated from the elements BaseAmount and Percent varying from the content of the element Amount. The element BaseAmount always has a non-negative value. The elements Percent and Amount can both be either positive or negative at the same time, e.g., to express a surcharge or discount.

The GDT PriceComponent 17800 is used to make the net price specified or to be specified in an invoice for an ordered or delivered quantity of products comprehensible by specifying price components. Therefore, it may be used in invoice items. Results of price calculations are preferably transmitted, not the exact calculation method, which can be complex due to, e.g., proprietary Customizings, user exits in the form of coding, scales, rounding difference clearing, price date or reference steps. Therefore, the GDT can be used for automated control of calculation results using a recipient system in a limited way (e.g., invoice verification). Different types of price components may be represented by "condition types" which are defined in customer-specific Customizing.

(nnnnnn) PriceComponentTypeCode

The GDT PriceComponentTypeCode 17900 is the coded representation of a non-fiscal price element type that was calculated for the quantity of a product. An example is: <PriceComponentTypeCode>0001</PriceComponentTypeCode>.

The structure of GDT PriceComponentTypeCode 17900 is depicted in FIG. 179.

The possible illustrative values of the PriceComponentTypeCode are:

1) Code 0001, which represents a Base Price, for example, for a price from a price list calculated as (quantity*unit price) or (weight*price per kg);

2) Code 0002, which represents a surcharge or discount based on a special product configuration, for example, a surcharge for the color 'red', surcharge for size "XL," discount for smaller model;

3) Code 0003, which represents a surcharge or discount based on sales promotion over a limited period of time, for example, a Christmas discount, Easter sale, summer surcharge;

4) Code 0004, which represents a surcharge or discount based on special group membership; typically a product belonging to a product group, the customer belonging to a customer group, or a combination of both, for example, an OEM surcharge for a product, corporate customer discount;

5) Code 0005, which represents a surcharge or discount for a quantity of the product based on a special agreement made when the order was taken or at the acquisition of the sales contract (manual entries);

6) Code 0006, which represents a surcharge or discount for a total order based on a special agreement made when the order was taken or at the acquisition of the sales contract (manual entries);

7) Code 0007, which represents a surcharge or discount for a quantity of the product based on deviations from standard business processing, for example, a minimum price, pallet discount, surcharge for incomplete pallet, mixed pallet discount, surcharge for incomplete mixed pallet, free-goods discount;

8) Code 0008, which represents a surcharge or discount for a total order based on deviations from standard business processing, for example, a minimum sales order value, minimum value surcharge;

9) Code 0009, which represents a surcharge or discount for a quantity of the product based on special calculation processing, for example, a 100% discount, rounding difference;

10) Code 0010, which represents a shipment costs/packaging/customs for a quantity of the product;

11) Code 0011, which represents a shipment costs/packaging/customs for a total order;

12) code 0012, which represents a cash discount.

The GDT PriceComponentTypeCode 17900 may be a proprietary code list with fixed predefined values. Changes to the permitted values involve changes to the interface. In a variation, related standardized code lists such as Price.Type.Code (UN/CEFACT 5375) or Price.Specification.Code (UN/CEFACT 5387) may not be used, since they contain a different semantic that is also worked out at a much greater level of detail. In the first case, e.g., the classifying of prices into different types according to special information for the quantity of products takes up a large amount of space. In the second case, however, the business circumstances determining the prices take up more space. For the GDT Price Component Type Code 17900, the Object Class is Price Component 17902, the Property is Type Code 17904, the Representation/Association term is Code 17906, the Type term is CCT 17908, the Type Name term is Code 17910, and the Length is four 17912.

(oooooo) PriceTimeSeries

A CDT PriceTimeSeries 18000 is time series information that consists of items that each contain a period with a start time and end time and a period-based price. An example is:

```
<PriceTimeSeries>
  <Item>
    <ValidityPeriod>
    <StartDateTime>2002-04-19T15:00:00Z</StartDateTime>
    <EndDateTime>2002-04-19T17:00:00Z</EndDateTime>
    </ValidityPeriod>
    <Price>
      <Amount currencyCode="EUR">32.14</Amount>
      <BaseQuantity unitCode="C62">1</BaseQuantity>
    </Price>
  </Item>
</PriceTimeSeries>.
```

The structure of CDT PriceTimeSeries 18000 is depicted in FIG. 180. The CDT PriceTimeSeries 18000 includes elements Item 18014, Validity-Period 18026, Price 18040, and Fixed-Indicator 18054. For the CDT PriceTimeSeries 18000, the Object Class Qual. term is Price 18002, the Object Class is TimeSeries 18004, the Representation/Association term is Details 18006, the Type term is GDT 18008, the Type Name term is TimeSeries 18010. The CDT PriceTimeSeries 18000 may be a restricted CDT 18012.

The PriceTimeSeriesItem 18014 is an item in a time series and can be repeated as often as required. For the Item 18014, the Category is Element 18016, the Object Class is TimeSeries 18018, the Property is Item 18020, and the Representation/Association term is Details 18022. The Cardinality between the CDT PriceTimeSeries 18000 and the Item 18014 is from one to n 18024. The ValidityPeriod 18026 describes the validity period of the time series item with a start time stamp and an end time stamp. For the ValidityPeriod 18026, the Category is Element 18028, the Object Class is TimeSeries 18030, the Property is ValidityPeriod 18032, the Representation/Association term is Details 18034, the Type term is 18036, and the Type Name term is DateTimePeriod 18038. The Cardinality between the CDT PriceTimeSeries 18000 and the Validity-Period 18026 is one 18040.

The Price 18040 describes the price connected to the time series item. For the Price 18040, the Category is Element 18042, the Object Class is TimeSeries 18042, the Property is Price 18044, the Representation/Association term is Price 18046, the Type term is GDT 18048, and the Type Name term is Price 18050. The Cardinality between the CDT PriceTimeSeries 18000 and the Price 18040 is one 18052. The FixedIndicator 18054 describes whether the corresponding item for changes is blocked or not. For the Fixed-Indicator 18054, the Category is Element 18056, the Object Class is TimeSeries 18058, the Property is FixedIndicator 18060, the Representation/Association term is Indicator 18062, the Type term is GDT 18064, and the Type Name term is Fixed Indicator 18066. The Cardinality between the CDT PriceTimeSeries 18000 and the Fixed-Indicator 18054 is zero or one 18068.

The CDT PriceTimeSeries 18000 is used as a generic data type that can have various specifications in one interface, depending on the context category being used.

(pppppp) ProcurementCostUpperLimit

A GDT ProcurementCostUpperLimit 18100 is the cost upper limit for different types of procurement costs. An example is:

```
<ProcurementCostUpperLimit>
  <OverallLimit>
    <Amount currencyCode="EUR">10000.00</Amount>
    <AmountUnlimitedIndicator>false</AmountUnlimitedIndicator>
```

-continued

<ExpectedAmount currencyCode="EUR">7500.00</
ExpectedAmount>
<OverallLimit>
<ContractPartialLimit>
<Amount currencyCode="EUR">0.00</Amount>
<AmountUnlimitedIndicator>true</AmountUnlimitedIndicator>
<ContractReference>
<ID>4000008599</ID>
<ItemID>148</ItemID>
</ContractReference>
</ContractPartialLimit>
<MiscellaneousPartialLimit>
<Amount currencyCode="EUR">500.00</Amount>
<AmountUnlimitedIndicator>false</AmountUnlimitedIndicator>
</MiscellaneousPartialLimit>
</ProcurementCostUpperLimit>.

The structure of GDT ProcurementCostUpperLimit 18100 is depicted in FIG. 181. The GDT Procurement Cost Upper Limit 18100 includes elements OverallLimit 18108, Amount 18120, Amount Unlimited Indicator 18134, Expected Amount 18150, Contract Partial Limit 18166, Amount 18178, Amount Unlimited Indicator 18194, ContractReference 181110, Miscellaneous Partial Limit 181126, Amount 181138, and Amount Unlimited Indicator 181154. For the GDT Procurement Cost Upper Limit 18100, the Object Class is Procurement Cost 18102, the Property is Upper Limit 18104, and the Representation/Association term is Details 18106.

The OverallLimit 18108 is the limit for the total costs in a procurement process. For the OverallLimit 18108, the Category is Element 18110, the Object Class is Procurement Cost Upper Limit 18112, the Property is Overall Limit 18114, and the Representation/Association term is Details 18116. The Cardinality between the GDT Procurement Cost Upper Limit 18100 and the OverallLimit 18108 is one 18118.

The OverallLimit/Amount 18120 is the cost upper limit that may not be exceeded in a procurement process. For the Amount 18120, the Category is Element 18122, the Object Class is Overall Limit 18124, the Property is Amount 18124, the Representation/Association term is Amount 18126, the Type term is GDT 18128, and the Type Name term is Amount 18130. The Cardinality between the GDT Procurement Cost Upper Limit 18100 and the Amount 18120 is zero or one 18132.

The OverallLimit/AmountUnlimitedIndicator 18134 indicates whether the amount in OverallLimit/Amount is unlimited. For the Amount Unlimited Indicator 18134, the Category is Element 18136, the Object Class is Overall Limit 18138, the Property is Amount Unlimited Indicator 18140, the Representation/Association term is Indicator 18142, the Type term is GDT 18144, and the Type Name term is ValueUnlimitedIndicator 18146. The Cardinality between the GDT Procurement Cost Upper Limit 18100 and the Amount Unlimited Indicator 18134 is zero or one 18148.

The OverallLimit/ExpectedAmount 18150 is the costs that are expected. The expected costs may be less than the maximum permitted costs. For the Expected Amount 18150, the Category is Element 18152, the Object Class is 18154, the Property is Expected Amount 18156, the Representation/Association term is Amount 18158, the Type term is GDT 18160, and the Type Name term is Amount 18162. The Cardinality between the GDT Procurement Cost Upper Limit 18100 and the Expected Amount 18150 is zero or one 18164.

The ContractPartialLimit 18166 is the partial limit for costs relating to a contract. For the Contract Partial Limit 18166, the Category is Element 18168, the Object Class is Procurement Cost Upper Limit 18170, the Property is Contract Partial Limit 18172, and the Representation/Association term is Details 18174. The Cardinality between the GDT Procurement Cost Upper Limit 18100 and the Contract Partial Limit 18166 is from zero to n 18176.

The ContractPartialLimit/Amount 18178 is the cost upper limit for a particular contract that may not be exceeded in a procurement process. For the Amount 18178, the Category is Element 18180, the Object Class is Contract PartialLimit 18182, the Property is Amount 18184, the Representation/Association term is Amount 18186, the Type term is GDT 18188, and the Type Name term is Amount 18190. The Cardinality between the GDT Procurement Cost Upper Limit 18100 and the Amount 18178 is zero or one 18192.

The ContractPartialLimit/AmountUnlimitedIndicator 18194 indicates whether the amount in ContractLimit/Amount is unlimited. For the Amount Unlimited Indicator 18194, the Category is Element 18196, the Object Class is Contract PartialLimit 18198, the Property is Amount Unlimited Indicator 181100, the Representation/Association term is Indicator 181102, the Type term is GDT 181104, and the Type Name term is ValueUnlimitedIndicator 181106. The Cardinality between the GDT Procurement Cost Upper Limit 18100, and the Amount Unlimited Indicator 18194 is zero or one 181108.

The ContractPartialLimit/ContractReference 181110 is the reference to a contract. For the ContractReference 181110, the Category is Element 181112, the Object Class is Contract PartialLimit 181114, the Property is Contract Reference 181116, the Representation/Association term is Business Transaction Document Reference 181118, the Type term is GDT 181120, and the Type Name is Business Transaction Document Reference 181122. The Cardinality between the GDT Procurement Cost Upper Limit 18100 and the ContractReference 181110 is one 181124. The ContractPartialLimit/ContractReference/ID 181126 is the contract number. The ContractPartialLimit/ContractReference/ItemID an item within the contract. If no item number is specified, the partial limit applies for all the items in the contract.

The MiscellaneousPartialLimit 181126 is the partial limit for the overall limit for miscellaneous costs. For the Miscellaneous Partial Limit 181126, the Category is Element 181128, the Object Class is Procurement Cost Upper Limit 181130, the Property is Miscellaneous PartialLimit 181132, and the Representation/Association term is Details 181134. The Cardinality between the GDT Procurement Cost Upper Limit 18100 and the Miscellaneous Partial Limit 181126 is zero or one 181136.

The MiscellaneousPartialLimit/Amount 181138 is the cost upper limit for miscellaneous costs. For the Amount 181138, the Category is Element 181140, the Object Class is Miscellaneous PartialLimit 181142, the Property is Amount 181144, the Representation/Association term is 181146, the Type term is GDT 181148, and the Type Name is Amount 181150. The Cardinality between the GDT Procurement Cost Upper Limit 18100 and the Amount 181138 is zero or one 181152.

The MiscellaneousPartialLimit/AmountUnlimitedIndicator 181154 indicates whether the amount in MiscellaneousLimit/Amount is unlimited. For the Amount Unlimited Indicator 181154, the Category is Element 181156, the Object Class is Miscellaneous PartialLimit 181158, the Property is Amount Unlimited Indicator 181160, the Representation/Association term is Indicator 181162, the Type term is GDT 181164, and the Type Name term is ValueUnlimitedIndicator 181181. The Cardinality between the GDT Procurement Cost Upper Limit 18100 and the Amount Unlimited Indicator 181154 is zero or one 181168.

The rules for the GDT AmountUnlimitedIndicator apply for Amount and AmountUnlimitedIndicator. Currencies within a ProcurementCostUpperLimit may be identical. The OverallLimit/Amount may be greater than or equal to the OverallLimit/ExpectedAmount. If no ExpectedAmount is specified, the Amount is used as the ExpectedAmount. If no ExpectedAmount is specified and the Amount is unlimited, an ExpectedAmount of 0.00 is assumed. In a variation, the same contract/same contract item may not be referenced in different limits which refer to contracts.

A ProcurementCostUpperLimit is used to define the type and amount of costs that are permitted for limit items within an ordering process. Limit items are used as placeholders in purchase orders if the requirements are unknown at the time of ordering. This can be the case, e.g., for repairs, where the time and spare parts required are not known until the repair has been made.

Regarding the costs in a procurement process and the limits, the total of all the costs may not exceed the overall limit, though the total of all the partial limits may well exceed the overall limit. This can lead to mistakes, for example: 1) Overall limit of EUR 10,000; 2) Partial limit of EUR 8,000 for contract 4711; and 3) Miscellaneous partial limit of EUR 4,000. The total of the partial limits is EUR 12,000, which is greater than the overall limit of EUR 10,000. This makes sense when costs of EUR 8,000 and miscellaneous costs of EUR 3,000 (=total costs of EUR 11,000) are to be identified as too high for contract 4711.

(qqqqqq) ProductCategoryID

A GDT ProductCategoryID 18200 is a unique identifier for a product category. A product category is a division of products according to objective business-specific criteria. An example or instance is:

1. Reference to a category using a standard ID:

```
<ProductCategoryID schemeID="eClass"
schemeAgencyID="ZZZ">AAA650001</ProductCategoryID>
```

2. Reference to a category using a version-dependent, hierarchical standard ID:

```
<ProductCategoryID schemeID="UNSPSC" scheme VersionID="11.0"
schemeAgencyID="257">10.10.15.17.00</ProductCategoryID>
```

3. Reference to a category using a proprietary ID:

```
<ProductCategoryID schemeID='ProductCategories'
schemeAgencyID='123456789'
schemeAgencySchemeAgencyID='16'>0006</ ProductCategoryID >
```

The structure of GDT ProductCategoryID 18200 is depicted in FIG. 182. The GDT ProductCategoryID 18200 is from the Core Component Type Identifier. The GDT ProductCategoryID 18200 includes attributes schemeID 18216, SchemeVersionID 18238, schemeAgencyID 18256, schemeAgencySchemeID 18274, and schemeAgencySchemeAgencyID 18292. For the GDT ProductCategoryID 18200, the Object Class is ProductCategory 18202, the Property is Identification 18204, the Representation/Association term is Identifier 18206, the Type term is CCT 18208, the Type Name term is Identifier 18210, and the Length is from one to forty 18212. The GDT ProductCategoryID 18200 may be a restricted GDT.

The following classifications are supported for standard IDs: 1) schemeID 18216 of 'UNSPSC'; 2) schemeAgencyID 18256 of '257'; 3) schemeID of 'eClass'; and 4) schemeAgencyID of 'ZZZ'. The following classifications are supported for version-dependent, hierarchical standard IDs: 1) schemeID of 'UNSPSC'; 2) schemeVersionID of nn.m; 3) schemeAgencyID of '257'; 4) schemeID of 'eClass'; 5) schemeVersionID: nn.m; and 6) schemeAgencyID: 'ZZZ'. For the schemeID 18216, the Category is Attribute 18218, the Object Class is IdentificationScheme 18220, the Property is Identification 18222, the Representation/Association term is Identifier 18228, the Type term is xsd 18230, the Type Name term is Token 18232, and the Length is from one to sixty 18234. The Cardinality between the GDT ProductCategoryID 18200 and the schemeID 18216 is zero or one 18236.

For the SchemeVersionID 18238, the Category is Attribute 18240, the Object Class is IdentificationScheme 18242, the Property is Version 18244, the Representation/Association term is Identifier 18246, the Type term is xsd 18248, the Type Name term is Token 18250, and the Length is from one to fifteen 18252. The Cardinality between the GDT ProductCategoryID 18200 and the SchemeVersionID 18238 is zero or one 18254.

For the schemeAgencyID 18256, the Category is Attribute 18258, the Object Class is IdentificationSchemeAgency 18260, the Property is Identification 18262, the Representation/Association term is Identifier 18264, the Type term is xsd 18266, the Type Name term is Token 18268, and the Length is from one to sixty 18270. The Cardinality between the GDT ProductCategoryID 18200 and the schemeAgencyID 18256 is zero or one 18272.

For the schemeAgencySchemeID 18274, the Category is Attribute 18276, the Object Class is IdentificationSchemeAgency 18278, the Property is Scheme 18280, the Representation/Association term is Identifier 18282, the Type term is xsd 18284, the Type Name term is Token 18286, and the Length is from one to sixty 18288. The Cardinality between the GDT ProductCategoryID 18200 and the schemeAgencySchemeID 18274 is zero or one 18290.

For the schemeAgencySchemeAgencyID 18292, the Category is Attribute 18294, the Object Class is IdentificationSchemeAgency 18296, the Property is SchemeAgency 18298, the Representation/Association term is Identifier 18201, the Type term is xsd 18203, the Type Name term is Token 18205, and the Length is three 18207. The Cardinality between the GDT ProductCategoryID 18200 and the schemeAgencySchemeAgencyID 18292 is zero or one 18209.

Product CategoryID can be used, for example, in three ways:

1) For identifying a product category using a globally-unique, non-versioned, standardized ID. The ID is generally not structured hierarchically, i.e., it references one product category and does not contain information about how this category is based on several other general categories. The attribute schemeID and schemeAgencyID are used in the same way as planned in the CCT identifier for standard IDs. Other attributes are not specified.

2) For identifying a product category within a tree of product categories that build on one another and using a globally unique, standardized ID that contains information on the location of the category within the tree structure. The ID is generally version-dependent. The attribute schemeID and schemeVersionID and schemeAgencyID are used in the same way as planned in the CCT identifier for standard IDs. Other attributes are not specified.

3) For identifying a product category using a proprietary ID. The attributes schemeID, schemeAgencyID, schemeAgencySchemeID and schemeAgencySchemeAgencyID are used as planned for the CCT identifier in order to define the context for which a CategoryPartyID is guaranteed to be unique. Other attributes are not specified.

(rrrrrr) ProductCategoryInternalID

A CDT ProductCategoryInternalID 18300 is a proprietary identifier for a product category. A product category is a division of products according to objective criteria. Illustrative examples of ProductCategoryInternalID (SAP MDM) are:

The GUID of a product category:

---

<ProductCategoryInternalID schemeID="ProductCategoryGUID" schemeAgencyID="MPL__002">
1C743CEC501F6A4D8826C7EC5A8554B9</ProductCategoryInternalID>
schemeID="ProductCategoryGUID" indicates that the scheme "ProductCategoryGUID" was used to identify the product category.
schemeAgencyID="MPL__002" indicates that the scheme was assigned by the business system "MPL__002."

---

ProductCategoryID of a product category:

---

<ProductCategoryInternalID schemeID="ProductCategoryID" schemeAgencyID="MPL__002">Private Car Vehicles MPLCNT002</ProductCategoryInternalID>

---

The structure of CDT ProductCategoryInternalID 18300 is depicted in FIG. 183. The CDT ProductCategoryInternalID 18300 includes attributes schemeID 18316 and schemeAgencyID 18334. For the CDT ProductCategoryInternalID 18300, the Object Class is ProductCategory 18302, the Property is Internal Identification 18304, the Representation/Association term is Identifier 18306, the Type term is GDT 18308, the Type Name term is ProductCategoryID 18310, and the Length is from one to forty 18312. The CDT ProductCategoryInternalID 18300 may be a restricted CDT.

The attributes of a CDT ProductCategoryInternalID 18300 are filled, for example, as follows in SAP MDM:

1) The schemeID 18316, in which the following schemes are provided for:

1) The ProductCategoryGUID, which identifies a product category using a Global Unique Identifier, and 2) The ProductCategoryID, which identifies a product category using an identifier.

For the schemeID 18316, the Category is Attribute 18318, the Object Class is IdentificationScheme 18320, the Property is Identification 18322, the Representation/Association term is Identifier 18324, the Type term is xsd 18326, the Type Name term is Token 18328, and the Length is from one to sixty 18330. The Cardinality between the CDT ProductCategoryInternalID 18300 and the schemeID 18316 is zero or one 18332.

2) The schemeAgencyID 18334 for a Business system in which the number was assigned. For the schemeAgencyID 18334, the Category is Attribute 18336, the Object Class is IdentificationSchemeAgency 18338, the Property is Identification 18340, the Representation/Association term is Identifier 18342, the Type term is xsd 18344, the Type Name term is Token 18346, and the Length is from one to sixty 18348. The Cardinality between the CDT ProductCategoryInternalID 18300 and the schemeAgencyID 18334 is zero or one 18350.

The GDT ProductCategoryInternalID 18300 represents a projection of the GDT ProductCategoryID, in which the attributes schemeID and schemeAgencyID are contained for describing an internally assigned ID. If an attribute is not explicitly assigned in the use of the GDT, it may be determined through the context.

The ProductCategoryInternalID 18300 is used when both sender and recipient can access shared master data, e.g., during internal communication.

If the product category is identified using the ProductCategoryID scheme (schemeID), the product category may be uniquely identified using a combined key (e.g., the product category at an entity level can be uniquely identified (semantically) using ProductCategoryID, ProductHierarchyID and the logical system).

(ssssss) ProductCategoryPartyID

A CDT ProductCategoryPartyID 18400 is an identifier for a product category assigned by a party. A product category is a division of products according to objective criteria. An example is: <ProductCategorySellerID>0006</ProductCategorySellerID>.

The structure of CDT ProductCategoryPartyID 18400 is depicted in FIG. 184.

The CDT ProductCategoryPartyID 18400 is the proprietary identifier assigned by a party. The party (in its role) that assigned this identifier may derive from the business context of the message that uses the CDT ProductCategoryPartyID 18400. For the CDT Product Category Party ID 18400, the Object Class is Product Category 18402, the Property Quality term is Party 18404, the Property is Identification 18406, the Representation/Association term is Identifier 18408, the Type term is GDT 18410, the Type Name term is ProductCategoryID 18412, and the Length is from one to forty 18414. The CDT Product Category Party ID 18400 may be a restricted CDT 18416.

In contrast to CDT ProductCategoryStandardID 18500, the use of the CDT ProductCategoryPartyID 18400 is role-dependent (e.g., as an ID assigned by the Buyer).

The party is specified by its role. The Party is replaced with the partner role type (e.g., ProductCategorySellerID). SchemeID and SchemeVersionID are to be included as attributes as soon as there is a need to differentiate between several schemes. (See GDT ProductCategoryID).

(tttttt) ProductCategoryStandardID

A CDT ProductCategoryStandardID 18500 is a standardized identifier for a product category, whereby the identification scheme used may be managed by an agency from the code list DE 3055. A product category is a division of products according to objective criteria. An example is:

<ProductCategoryStandardID schemeID="UNSPSC" schemeVersionID="11.0" schemeAgencyID="113"> 10.10.15.17</ProductCategoryStandardID>

The structure of CDT ProductCategoryStandardID 18500 is depicted in FIG. 185. The CDT Product Category Standard ID 18500 includes attributes schemeID 18518, SchemeVersionID 18536, and schemeAgencyID 18554. For the CDT Product Category Standard ID 18500, the Object Class is Product Category 18502, the Property Qual. is Standard 18504, the Property is Identification 18506, the Representation/Association term is Identifier 18508, the Type term is GDT 18510, the Type Name is ProductCategoryID 18512, and the Length is from one to forty 18514. The CDT Product Category Standard ID 18500 may be a restricted CDT 18516.

For the schemeID 18518, the Category is Attribute 18520, the Object Class is IdentificationScheme 18522, the Property is Identification 18524, the Representation/Association term is Identifier 18526, the Type term is xsd 18528, the Type Name term is Token 18530, and the Length is from one to sixty 18532. The Cardinality between the CDT Product Category Standard ID 18500 and the scheme ID 18518 is zero or one 18534.

For the SchemeVersionID 18536, the Category is Attribute 18538, the Object Class is IdentificationScheme 18540, the Property is Version 18542, the Representation/Association term is Identifier 18544, the Type term is xsd 18546, the Type Name term is Token 18548, and the Length is from one to fifteen 18550. The Cardinality between CDT Product Category Standard ID 18500 and the SchemeVersionID 18536 is zero or one 18552.

The schemeAgencyID 18554 identifies the agency that manages an identification scheme. The agencies from DE 3055 are used as the default, but the roles defined in DE 3055 cannot be used. For the schemeAgencyID 18554, the Category is Attribute 18556, the Object Class is IdentificationSchemeAgency 18558, the Property is Identification 18560, the Representation/Association term is Identifier 18562, the Type term is xsd 18564, the Type Name term is Token 18566, and the Length is three 18568. The Cardinality between CDT Product Category Standard ID 18500 and the schemeAgencyID 18554 is one 18570. The following illustrative code is supported for a version-dependent hierarchical standard ID:

1) SchemeAgencyID="113"–UCC (Uniform Code Council) with 1) SchemeID="UNSPSC" (United Nations Standard Product and Services Classification Code); and 2) SchemeVersionID=nn.m (e.g. 11.0).

The GDT ProductCategoryStandardID 18500 represents a projection of the GDT ProductCategoryID, in which the attributes schemeID, schemeVersionID, and schemeAgencyID are contained for describing an ID assigned by a standardization organization (i.e., an organization registered in the DE 3055). The attribute schemeAgencyID may be a mandatory attribute.

In contrast to ProductCategoryPartyID, the use of ProductCategoryStandardID may not be role-dependent.

The SchemeID is another standardized identification scheme (for material classification and material groups) is "eClass" (current release status 5.0). The German Institute for Economics in Cologne provides the classification as an independent platform and central point of contact, free of charge, in the Internet under www.eClass.de (For the specification see www.eclass.de/informationen/download/eclassMerkmalleisten5_00.doc).

The version of eClass is a 2-digit number.

Illustrative usages of the SchemeID include: 1) SchemeAgencyID for the German Institute for Economics Cologne (not contained in DE 3055), wherein the SchemeID equals "eClass," and the SchemeVersionID equals nn (e.g. 42). If necessary, the SchemeID ETIM (www.etim.de) can also be examined for its applicability. (See also GDT ProductCategoryID).

(uuuuuu) ProductChangeID

A GDT ProductChangeID 18600 is a unique identifier for a change to a product which leaves the product unchanged in terms of its properties that are relevant for the user. Changes in terms of this definition may occur, e.g., due to changed manufacturing processes or the use of other modules/component batches. An example is: <ProductChangeID>31337KSK/4711</ProductChangeID>.

The structure of GDT ProductChangeID 18600 is depicted in FIG. 186. For the GDT ProductChangeID 18600, the Category is Element 18602, the Object Class is Product Change 18604, the Property is Identification 18606, the Representation/Association term is Identifier 18608, the Type term is CCT 18610, the Type Name term is Identifier 18612, and the Length is from one to thirty-two 18614. The GDT ProductChangeID 18600 may be a restricted GDT.

ProductChangeIDs may be used, e.g., for a recall activity: Assuming the transistors installed in a product are replaced with other similar ones, then the features of the product are not changed and it should still have the same ProductID. However, if the transistors turn out to be faulty, it may be ensured that the serial numbers of the product affected are logged using ProductChangeIDs in case there is a resulting recall activity. If a change is made using change management, the ProductChangeID as a rule contains the ID of the relevant change order (ChangeOrderID).

In an example, in the R/3, GDT ProductChangeID 18600 is the change number that uniquely identifies a change master record for a product. A change identified here is neither a version nor a variant. For example, A yellow VW Golf C with leather seats would be "yellow with leather seats," a variant of version "C" of product "VW Golf."

(vvvvvv) ProductDemandInfluencingEventStatusCode

The GDT ProductDemandInfluencingEventStatusCode 18700 is a coded representation for the status of an event that influences the demand for products. The event might be, e.g., a promotional event. An example is: <ProductDemandInfluencingEventStatusCode> PLANNED</ProductDemandInfluencingEventStatusCode>.

The structure of GDT ProductDemandInfluencingEventStatusCode 18700 is depicted in FIG. 187. For the GDT Product Demand Influencing Event Status Code 18700, the Object Class is Product Demand Influencing Event 18702, the Property is Status 18704, the Representation/Association term is Code 18706, the Type term is CCT 18708, the Type Name term is Code 18710, and the Length is from one to thirty-five 18712. The GDT Product Demand Influencing Event Status Code 18700 may be a restricted GDT.

The possible code values are a subset of the "Retail Event Status Code List" of the "EAN.UCC XML Business Message Standards, Version 1.3 (July 2003)." These are: 1) CANCELED; 2) COMPLETED; 3) PLANNED; 4) PROPOSED; and 5) TERMINATED.

(wwwwww) ProductDemandInfluencingEventTypeCode

The GDT ProductDemandInfluencingEventTypeCode 18800 is a coded representation for the type of an event that influences the demand for products. An example is: <ProductDemandInfluencingEventTypeCode>HOLIDAY</ProductDemandInfluencingEventTypeCode>.

The structure of GDT ProductDemandInfluencingEventTypeCode 18800 is depicted in FIG. 188. For the GDT Product Demand Influencing Event Type Code 18800, the Object Class is Product Demand Influencing Event 18802, the Property is Type 18804, the Representation/Association term is Code 18806, the Type term is CCT 18808, the Type Name term is Code 18810, and the Length is from one to thirty-five 18812. The GDT Product Demand Influencing Event Type Code 18800 may be a restricted GDT.

The GDT groups several partial quantities of standard code lists, whereby the supported partial quantities are disjunctive. Therefore no attributes, or supplementary components, are needed to identify the relevant standard code list.

The illustrative code values may be subsets of the union of the "Miscellaneous Event Type Code List" and "Promotional Event Type Code List" of the "EAN.UCC XML Business Message Standards, version 1.3 (July 2003)." These are: (From the "Miscellaneous Event Type Code List"): 1) The code ASSORTMENT_CHANGE is used when the set of items that the location carries for this category is changing, affecting one or more items; 2) The code DISASTER is used when a hurricane, tornado, accident, attack, or some other catastrophic, unexpected event affecting supply or demand; 3) The code FREIGHT_FLOW_ALLOCATION is used when an item availability may be restricted, due to unexpected demand, transportation issues, production problems, or some other reason; 4) The code INVENTORY_POLICY_CHANGE is used when the inventory policy at the store or retail distribution center is changing, resulting in changes to the estimated supply of the item; 5) The code LABOR is used when a strike or other labor issue affects supply; 6) The code LOCATION_CLOSING is used when one or more locations that carry the item are closing. No promotion is associated with the item during the closing; 7) The code LOCATION_OPENING is used when one or more new locations is opening that will carry the item. No promotion is associated with the item during the opening; 8) The code PACKAGING_LABELING_CHANGE is used when the packaging or labeling of the item is changing, possibly affecting demand or distribution; 9) The code PRICE_DECREASE is used when the price is decreasing for the item at the retail location(s); 10) The code PRICE_INCREASE is used when the price is increasing for the item at the retail location(s); 11) The code STORE_FORMAT_OR_PLANOGRAM_CHANGE is used when the store format or planogram is changing, affecting one or more items; 12) The code TEST_MARKET is used when selling a new item at a limited set of locations to gauge consumer interest, or testing an existing item in a new channel or location; and 13) The code WEATHER is used when a heat wave, cold front, snow storm, or other weather phenomenon affecting supply or demand. (From the "Promotional Event Type Code List"): 1) The code COMMUNITY_EVENT is used when a promotional activity timed to coincide with a local, regional, or national event (charity drive, Indy 500, Grammy Awards); 2) The code HOLIDAY is used when a promotional activity timed to coincide with a national, regional, or religious holiday; 3) The code SEASONAL_EVENT is used when a promotional activity timed to coincide with a change in the season, or an annual cultural phenomenon (such as "back to school"); 4) The code STORE_CLOSING is used when a promotional activity timed to coincide with the elimination of one or more store locations (e.g. going-out-of-business sale); 5) The code STORE_OPENING is used when a promotional activity timed to coincide with the opening of one or more new store locations (e.g. grand opening sale); 6) The code TRADE_ITEM_DISCONTINUATION is used when a promotional activity timed to coincide with the elimination of a product from a location or market (e.g. clearance sale); and 7) The code TRADE_ITEM_INTRODUCTION is used when a promotional activity timed to coincide with the introduction of a new product to a location or market (xxxxxx) ProductDiscontinuationIndicator A GDT ProductDiscontinuationIndicator 18900 indicates whether a product is to be discontinued, i.e., removed from the product line, or not. An example, <ProductDiscontinuationIndicator>true</ProductDiscontinuationIndicator>.

The structure of GDT ProductDiscontinuationIndicator 18900 is depicted in FIG. 189. For the GDT ProductDiscontinuationIndicator 18900, the Object Class is Product 18902, the Property is Discontinuation 18904, the Representation/Association term is Indicator 18906, the Type term is CCT 18908, and the Type Name term is Indicator 18910. Valid values for 18900 are: 1) true, meaning that the product is discontinued; or 2) false, meaning that the product is not discontinued. (See CCT: Indicator for the value range).

(yyyyyy) ProductID

A GDT ProductID 19000 is a unique identifier for a product. A product is either a tangible or intangible good, and is a part of the business activities of a company. It can be traded and contributes directly or indirectly to value added. An example and instance is:

(a) Proprietary ID, Standard Agency

```
<ProductID schemeID="Domestic Appliances"
        schemeAgencyID="065055766"
            schemeAgencySchemeID="DUNS"
            schemeAgencySchemeAgencyID="016">
    B 1165 HS
</ProductID>
065055766 = Bosch at DUNS
016 = DUNS from Code List DE 3055
```

The structure of GDT ProductID 19000 is depicted in FIG. 190. ProductID connotes the type of product, instead of a concrete object. Thus, in the above example: B1165HS means a type of appliance, not an actual appliance with the serial number XY. The GDT ProductID 19000 includes attributes schemeID 19016, the schemeAgencyID 19034, schemeAgencySchemeID 19052, and schemeAgencySchemeAgencyID 19070. For the GDT ProductID 19000, the Object Class is Product 19002, the Property is Identification 19004, the Representation/Association term is Identifier 19006, the Type term is CCT 19008, the Type Name is Identifier 19010, and the Length is from one to sixty 19012. The GDT ProductID 19000 may be a restricted GDT.

A product contributes directly to the value creation if it is salable. A product contributes indirectly to value creation if it is necessary for selling another product, it supports the salability of another product, or it occurs in the business activity of a company and it is in the company's interest that this product adds value.

For the schemeID 19016, the Category is Attribute 19018, the Object Class is IdentificationScheme 19020, the Property is Identification 19022, the Representation/Association term is Identifier 19024, the Type term is xsd 19026, the Type Name term is Token 19028, and the Length is from one to sixty 19030. The Cardinality between the GDT ProductID 19000 and the schemeID 19016 is zero or one 15732. For the schemeAgencyID 19034, the Category is Attribute 19036, the Object Class is IdentificationSchemeAgency 19038, the Property is Identification 19040, the Representation/Association term is Identifier 19042, the Type term is xsd 19044, the Type Name term is Token 19046, and the Length is from one to sixty 19048. The Cardinality between the GDT ProductID 19000 and the schemeAgencyID 19034 is zero or one 19050. For the schemeAgencySchemeID 19052, the Category is Attribute 19054, the Object Class is IdentificationSchemeAgency 19056, the Property is Scheme 19058, the Representation/Association term is Identifier 19060, the Type term is xsd 19062, the Type Name term is Token 19064, and the Length is from one to sixty 19066. The Cardinality between the GDT ProductID 19000 and the schemeAgencySchemeID 19052 is zero or one 19068. For the schemeAgencySchemeAgencyID 19070, the Category is Attribute 19072, the Object Class is IdentificationSchemeAgency 19074, the Property is SchemeAgency 19076, the Representation/Association term is Identifier 19078, the Type term is xsd 19080, the Type Name term is Token 19082, and the Length is three 19084. The Cardinality between the GDT ProductID 19000 and the schemeAgencySchemeAgencyID 19070 is zero or one 19086.

(zzzzzz) ProductInternalID

A CDT ProductInternalID 19100 is a proprietary identifier for a product. A product is either a tangible or intangible good, and is a part of the business activities of a company. It can be traded and contributes directly or indirectly to value added. Examples (in SAP MDM)

GUID of a Product:

<ProductInternalID schemeID="ProductGUID" schemeAgencyID= "MPL__002">1C743CEC501F6A4D8826C7EC5A8554B9</ProductInternalID> schemeID="PartyGUID" indicates that the scheme "ProductGUID" was used to identify the product.

schemeAgencyID="MPL__002" indicates that the scheme was assigned by the business system "MPL__002."

Product ID of a Product:

<ProductInternalID schemeID="ProductID" schemeAgencyID="MPL__002"> VWPassat 01 0601 MPLCNT002 </ProductInternalID>

The structure of CDT ProductInternalID 19100 is depicted in FIG. 191. The CDT ProductInternalID 19100 includes attributes schemeID 19118 and schemeAgencyID 19136. For the CDT ProductInternalID 19100, the Object Class is Product 19102, the Property Qualifier term is Internal 19104, the Property is Identification 19106, the Representation/Association term is Identifier 19108, the Type term is GDT 19110, the Type Name term is ProductID 19112, and the Length is from one to sixty 19114. The CDT ProductInternalID 19100 may be a restricted CDT.

The attributes of a CDT ProductInternalID 19100 may be filled as follows in an SAP MDM example.

For the schemeID 19118, the following schemes are provided: 1) ProductGUID, which identifies a product category via a Globally Unique Identifier; and 2) ProductID, which identifies a product category using an identifier. For the schemeID 19118, the Category is Attribute 19120, the Object Class is IdentificationScheme 19122, the Property is Identification 19124, the Representation/Association term is Identifier 19126, the Type term is xsd 19128, the Type Name term is Token 19130, and the Length is from one to sixty 19132. The Cardinality between the CDT ProductInternalID 19100 and the schemeID 19118 is zero or one 19134.

The schemeAgencyID 19136 is the business system in which the identifier was assigned. For the schemeAgencyID 19136, the Category is Attribute 19138, the Object Class is IdentificationSchemeAgency 19140, the Property is Identification 19140, the Representation/Association term is Identifier 19142, the Type term is xsd 19144, the Type Name term is Token 19146, and the Length is from one to sixty 19148. The Cardinality between the CDT ProductInternalID 19100 and the schemeAgencyID 19136 is zero or one 19150.

The CDT ProductInternalID 19100 represents a projection of the GDT ProductID, in which the attributes schemeID and schemeAgencyID are contained for describing an internally assigned ID. If an attribute is not explicitly assigned in the use of the GDT, it may be determined through the context.

The CDT ProductInternalID 19100 is used when both sender and recipient can access shared master data, e.g., during internal communication.

A product contributes directly to the value creation if it is salable. A product contributes indirectly to value creation if
- it is necessary for selling another product,
- it supports the salability of another product, or
- it occurs in the business activity of a company and it is in the company's interest that this product adds value.

In case the product is identified via the schema (schemeID), it should be noted that the product category may first be capable of being uniquely identified via a combined key (for example, the product category at an entity level can be uniquely identified (semantically) by using the ProductID, the ProductTypeID, the ObjectFamily and the logical system).

(aaaaaaa) CDT ProductPartyID

A CDT ProductPartyID 19200 is an identifier for a product assigned by a party. A product is either a tangible or intangible good, and is a part of the business activities of a company. It can be traded and contributes directly or indirectly to value added. An example of a CDT ProductPartyID 19200 is: <ProductSellerID>B 1165 HS</ProductSellerID>

The structure of ProductPartyID is depicted in FIG. 192. The CDT ProductPartyID 19200 is the proprietary identifier assigned by a business partner. The business partner, in its role, that assigned this identifier may derive from the business context of the message that the ProductPartyID uses. For the CDT ProductPartyID 19200, the Object Class is Product 19202, the Property Quality term is Party 19204, the Property is Identification 19206, the Representation/Association term is Identifier 19208, the Type term is GDT 19210, the Type Name term is ProductID 19212, and the Length is from one to sixty 19214. The CDT ProductPartyID 19200 may be a restricted CDT.

The use of the CDT ProductPartyID 19200, unlike the ProductStandardID, is role-dependent for example, as an ID assigned by the Buyer. The party is specified by its role. The term "Party" is replaced with the term "partner role type" for example, ProductSellerID. SchemeID and schemeVersionID are to be included as attributes as soon as there is a need to differentiate between several schemes. (See GDT ProductID 17500).

(bbbbbbb) ProductStandardID

A CDT ProductStandardID 19300 is a standardized identifier for a product, and the identification scheme may be managed by an agency from the code list DE 3055. A product is either a tangible or intangible good, and is a part of the business activities of a company. The product can be traded and contributes directly or indirectly to value added. An example of a CDT ProductStandardID 19300 is: <ProductStandardID schemeAgencyID="009">B 1165 HS</ProductStandardID>, wherein 009 is the EAN (International Article Numbering association) code.

The structure of GDT ProductStandardID 19300 is depicted in FIG. 193. The structure of GDT ProductStandard ID 19300 is depicted in FIG. 193. The GDT ProductStandard ID 19300 includes attributes schemeID 19318 and schemeAgencyID 19336. For the GDT ProductStandard ID 19300, the Object Class is Product 19302, the Property Qualifier term is Standard 19304, the Property is Identification 19306, the Representation/Association term is Identifier 19308, the Type term is GDT 19310, the Type Name term is ProductID 19312, and the Length is from one to fourteen 19314. The GDT ProductStandard ID 19300 may be a restricted GDT.

For the schemeID 19318, the Category is Attribute 19320, the Object Class is Identification Scheme 19322, the Property is Identification 19324, the Representation/Association term is Identifier 19326, the Type term is xsd 19328, the Type Name term is Token 19330, and the Length is from one to sixty 19332. The Cardinality between the GDT ProductStandard ID 19300 and the schemeID 19318 is zero or one 19334.

The "schemeAgencyID" 19336 identifies the agency that manages an identification scheme. The agencies from DE 3055 may be used as the default, but in a variation the roles defined in DE 3055 may no be used. At least the following two codes may be supported: 1) 009, which is the EAN.UCC, International Numbering Association code for the GTIN (Global Trade Item Number), which can have up to 14 characters; and 2) 005, which is the ISO, International Organization for Standardization code for the 13-character ISBN (International Standard Book Number). For ISBN, the code "005" (ISO) is entered for the schemeAgencyID 19336 along with the schemeID 19318 of "ISO 2108: 1992," which indicates that it is an ISBN. The ISBN scheme is managed by isbn-international.org/. Specifying a schemeID 19318 is not necessary if a scheme exists for an agency.

For the schemeAgencyID 19336, the Category is Attribute 19338, the Object Class is Identification Scheme Agency 19340, the Property is Identification 19342, the Representation/Association term is Identifier 19344, the Type term is xsd 19346, the Type Name term is Token 19348, and the Length is three 19350. The Cardinality between the CDT ProductStandard ID 19300 and the schemeAgencyID 19336 is one 19352.

Another standardized identification scheme is the pharmaceutical central number. There is no SchemeAgencyID 19336 for this in the code list DE 3055. How this will be represented may still be clarified. The structure of the GDTs HandlingUnit may be compatible with the "packaging" in the DELVRY03 IDoc.

The GDT ProductStandardID 19300 represents a projection of the GDT ProductID 19000, in which the attributes schemeID 19318 and schemeAgencyID 19336 are contained for describing an ID assigned by a standardization organization (i.e., an organization registered in DE 3055). The attribute schemeAgencyID 19336 may be a mandatory attribute.

Contrary to the ProductPartyID 19200, use of the ProductStandardID 19300 is not role dependent. SchemeVersionID is to be included as an attribute as soon as there is a need to differentiate between several schemes. (See GDT ProductID 19000).

(ccccccc) GDT ProductTax

A GDT ProductTax 19400 is a tax that is incurred during the sale, purchase, and consumption of products and during other related business transactions. An example of a ProductTax GDT 19400 used in TaxDueNotification, is as follows:

```
<ProductTax>
    <CountryCode>DE</CountryCode>
    <TypeCode>VAT</TypeCode>
    <TypeDescription>Value added tax</TypeDescription>
    <BaseAmount currencyCode="EUR">100</BaseAmount>
    <Percent>16</Percent>
    <Amount currencyCode="EUR">116</Amount>
    <BusinessTransactionDocumentItemGroupID>1
</BusinessTransactionDocumentItemGroupID>
</ProductTax>.
```

The structure of the GDT ProductTax 19400 is depicted in FIG. 194. The structure of GDT ProductTax 19400 is depicted in FIG. 194. The GDT ProductTax 19400 includes elements CountryCode 19403, JurisdictionCode 19411, Type Code 19419, TypeDescription 19427, BaseAmount 19435, Percent 19443, Amount 19452, NonDeductiblePercent 19460, NonDeductibleAmount 19468, BusinessTransactionDocument ItemGroupID 19476, TriangulationIndicator 19484, and LegallyRequiredPhrase 19492. For the GDT ProductTax 19400, the Object Class is ProductTax 19401, and the Representation/Association term is Details 19402.

The CountryCode 19406 (ISO 3166-1) defines the country in which the tax is incurred. For the CountryCode 19403, the Category is Element 19404, the Object Class is ProductTax 19405, the Property is Country Code 19406, the Representation/Association term is Cod 19407, the Type term is GDT 19408, and the Type Name term is CountryCode 19409. The Cardinality between the GDT ProductTax 19400 and the CountryCode 19403 is zero or one 19410.

The JurisdictionCode 19422 is used for some countries (in particular the US) to identify the responsible tax authorities. For the JurisdictionCode 19411, the Category is Element 19412, the Object Class is ProductTax 19413, the Property is Tax Jurisdiction Code 19414, the Representation/Association term is Code 19415, the Type term is GDT 19416, and the Type Name term is TaxJurisdictionCode 19417. The Cardinality between the GDT ProductTax 19400 and the JurisdictionCode 19411 is zero or one 19418.

The TypeCode 19438 is a tax code, see GDT ProductTaxTypeCode. For the TypeCode 19419, the Category is Element 19420, the Object Class is ProductTax 19421, the Property is Type Code 19422, the Representation/Association term is Code 19423, the Type term is GDT 19424, and the Type Name term is ProductTaxTypeCode 19425. The Cardinality between the GDT ProductTax 19400 and the TypeCode 19419 is zero or one 19426.

The TypeDescription 19454 is a short description of tax, such as for the tax code "OTH—Other taxes, unspecified, miscellaneous tax charges." For the TypeDescription 19427, the Category is Element 19428, the Property is Type Description 19430, the Representation/Association term is Text 19431, the Type term is GDT 19432, and the Type Name term is Description 19433. The Cardinality between the GDT ProductTax 19400 and the TypeDescription 19427 is zero or one 19434.

The BaseAmount 19470 is a Base amount on which tax was calculated (assessment basis). For the BaseAmount 19435, the Category is Element 19436, the Object Class is ProductTax 19437, the Property is Base Amount 19438, the Representation/Association term is Amount 19439, the Type term is GDT 19440*m*, and the Type Name term is Amount 19441. The Cardinality between the GDT ProductTax 19400 and the BaseAmount 19435 is zero or one 19442.

The Percent 19486 is a tax rate, or level of tax in percent. For the Percent 19443, the Category is Element 19444, the Object Class is ProductTax 19445, the Property is Percent 19446, the Representation/Association term is Percent 19447, the Type term is GDT 19448, and the Type Name term is Percent 19449. The Cardinality between the GDT ProductTax 19400 and the Percent 19443 is either zero or one 19450.

The Amount 19403 is a tax amount that is due for the underlying base amount. For the Amount 19451, the Category is Element 19452, the Object Class is ProductTax 19453, the Property is Amount 19454, the Representation/Association term is Amount 19455, the Type term is GDT 19456, and the Type Name term is Amount 19457. The Cardinality between the GDT ProductTax 19400 and the Amount 19451 is either zero or one 19458.

The NonDeductiblePercent 19419 is a percentage rate, portion, of tax that is non-deductible. For the NonDeductiblePercent 19459, the Category is Element 19460, the Object Class is ProductTax 19461, the Property is NonDeductiblePercent 19462, the Representation/Association term is Decimal 19463, the Type term is GDT 19464, and the Type Name term is Percent 19465. The Cardinality between the GDT ProductTax 19400 and the NonDeductiblePercent 19459 is zero or one 19466.

The NonDeductibleAmount 19435 is an amount of tax that is non-deductible. For the NonDeductibleAmount 19467, the Category is Element 19468, the Object Class is ProductTax 19469, the Property is NonDeductibleAmount 19470, the Representation/Association term is Amount 19471, the Type term is GDT 19472, and the Type Name term is Amount 19473. The Cardinality between the GDT ProductTax 19400 and the NonDeductibleAmount 19467 is zero or one 19474.

The BusinessTransactionDocumentItemGroupID 19451 groups items of a BusinessTransactionDocument that may be taxed in the same way. There is no global code list for the BusinessTransactionDocumentItemGroupID 19451, the possible values are arbitrary and may be used consistently within a document (e.g., an invoice). The BusinessTransactionDocumentItemGroupID 19451 can optionally be used to relate the taxes at item level to the summary tax lines at document level. The BusinessTransactionDocumentItemGroupID 19451 assists during invoice verification. For the BusinessTransactionDocument ItemGroupID 19475, the Category is Element 19476, the Object Class is ProductTax 19477, the Property is Business Transaction Document Item Group Identification 19478, the Representation/Association term is Identifier 19479, the Type term is GDT 19480, and the Type Name term is BusinessTransactionDocumentItemGroupID 19481. The Cardinality between the GDT ProductTax 19400 and the BusinessTransactionDocument ItemGroupID 19475 is zero or one 19482.

The TriangulationIndicator 19467 is a yes or no indicator that specifies whether the transaction is a triangular transaction. For the TriangulationIndicator 19483, the Category is Element 19484, the Object Class is ProductTax 19485, the Property is Triangulation 19486, the Representation/Association term is Indicator 19487, the Type term is CCT 19488, and the Type Name term is Indicator 19489. The Cardinality between the GDT ProductTax 19400 and the TriangulationIndicator 19483 is zero or one 19490.

The LegallyRequiredPhrase 19438 is a legally required phrase that may be printed on the invoice. For the LegallyRequiredPhrase 19491, the Category is Element 19492, the Object Class is ProductTax 19493, the Property is Legally Required Phrase 19494, the Representation/Association term is Text 19495, the Type term is CCT 19496, the Type Name term is Text 19497, and the Length is one to two hundred fifty-six 19498. The Cardinality between the GDT ProductTax 19400 and the LegallyRequiredPhrase 19491 is zero or one 19499.

The segment GDT ProductTax 19400 is connected with an amount from which the base amount to be taxed is calculated. Rules on which taxes may be reported in summary form or at item level are country-dependent and are derived from the relevant legal requirements. For example, German sales tax may be reported in an invoice in summarized form for each tax rate. Non-deductible taxes are relevant for incoming invoices and credit memos. When a tax rate or tax amount is reported, the tax type the TypeCode 19438, may also be specified.

It is possible to tell from the BusinessTransactionDocumentItemGroupID 19451 how the individual items are taxed. If the items also report tax rate and tax amount, then the BusinessTransactionDocumentItemGroupID 19451 is superfluous. An example of an invoice with 3 items with German sales tax is shown in the following table:

| | Country | Type Code | Description | Base Amount | Percent | Amount | Item Group ID |
|---|---|---|---|---|---|---|---|
| Item 1 | | | | 100.00 EUR | | | A |
| Item 2 | | | | 200.00 EUR | | | B |
| Item 3 | | | | 300.00 EUR | | | A |
| Total A | DE | VAT | Sales Tax | 400.00 EUR | 16 | 64.00 EUR | A |
| Total B | DE | VAT | Sales Tax | 200.00 EUR | 7 | 14.00 EUR | B |

The GDT ProductTax 19400 is used to report different tax portions in invoice amounts or to initiate tax returns and payments of a company to the responsible tax authorities. A tax is a mandatory public payment that a community levies on natural and legal persons in its territory at a unilaterally fixed level (unlike fees and contributions) without providing a service in return. The tax jurisdiction code of a natural or legal person is part of the address data. The tax calculation depends on the tax jurisdiction code of the ship-from or ship-to party in certain countries, e.g., the US and Brazil.

(ddddddd) ProductTaxEventTypeCode

The GDT ProductTaxEventTypeCode 19500 is a coded representation of the tax event type that is linked to the purchase, sale or consumption of products. A tax event type refers to a combination of characteristics that are the basis for tax liability, tax relief measures, or tax exemptions of specific types and amounts, from the point of view of country-specific tax laws. An example or Instance of GDT ProductTaxEventTypeCode 19500 is:

```
<ProductTaxEventTypeCode>
DE101
</ProductTaxEventTypeCode >.
```

The structure of GDT ProductTaxEventTypeCode 19500 is depicted in FIG. 195.

Characteristics of the tax event types in terms of tax legislation are the subject of taxation, the legal entity that may pay tax, and the taxation object, the object, transaction or status of taxation. The type and number of tax event types to be taken into account for product taxes derive from the tax laws of a country. These laws or their provisions generally do not stipulate any specific codes, however. The codes may therefore be individually defined by the respective software manufacturers. The structure of GDT Product Tax Event Type Code 19500 is depicted in FIG. 195. For the GDT Product Tax Event Type Code 19500, the Object Class is Product Tax Event 19502, the Property is Type Code 19504, the Representation/Association term is Code 19506, the Type term is CCT 19508, the Type Name term is Code 19510, and the Length is from three to six 19512. The GDT Product Tax Event Type Code 19500 may be a restricted GDT.

In the GDT ProductTaxEventTypeCode 19500, the first two figures consist of the two-character ISO code 3166-1 for the country for which the tax matter is relevant, and is generally followed by a three-digit number from 100 to 999.

The GDT ProductTaxEventTypeCodes 19500 for Germany and the USA are listed in the following table:

the tax code in R/3 from a semantic point of view. In contrast to the tax code, however, the GDT ProductTaxEventTypeCode 19500 is independent of tax rates.

(eeeeeee) ProductTaxTypeCode

The GDT ProductTaxTypeCode 19600 is a coded representation of the type of a tax that is incurred during the sale, purchase, and consumption of products and during other related business transactions. An example of 19600 is: <ProductTaxTypeCode>VAT</ProductTaxTypeCode>

The structure of 19600 is depicted in FIG. 196. The structure of GDT Product Tax Type Code 19600 is depicted in FIG. 196. For the GDT Product Tax Type Code 19600, the Object Class is ProductTaxType 19602, the Property is Code 19604, the Representation/Association term is Code 19606, the Type term is CCT 19608, the Type Name term is Code 19610, and the Length is three 19612. The GDT Product Tax Type Code 19600 may be a restricted GDT.

| ProductTaxEventTypeCode | Description |
|---|---|
| DE100 | Non-taxable delivery |
| DE101 | Domestic delivery |
| DE102 | Intra-community delivery to recipient with VAT reg. no. |
| DE103 | Intra-community delivery of new vehicles to recipient without VAT reg. no. |
| DE104 | Intra-community delivery of new vehicles outside a company |
| DE105 | Tax-free delivery according to § 4 nos. 2 to 7 UStG (German taxation law) |
| DE106 | Tax-free delivery according to § 4 nos. 8 to 28 UStG (German taxation law) |
| DE107 | Domestic delivery according to § 3c(3) UStG (German taxation law) (Distance selling) |
| DE110 | Export delivery (export to third country) |
| DE151 | Delivery by an agricultural or forestry company to the remaining community area to recipients with VAT reg. no. |
| DE152 | Domestic delivery by an agricultural or forestry company according to § 24(1)2 UStG (German taxation law) |
| DE200 | Non-taxable acquisition |
| DE201 | Domestic acquisition |
| DE202 | Tax-free intra-community acquisition according to § 4b UStG (German taxation law) |
| DE203 | Taxable intra-community acquisition of objects |
| DE204 | Taxable intra-community acquisition of other services |
| DE205 | Taxable intra-community acquisition of new vehicles from deliverers without VAT reg. no. |
| DE206 | Taxable intra-community acquisition according to delivery to first recipient in intra-community triangular transaction according to § 25b(2) UStG (German taxation law) |
| DE207 | Acquisition according to § 13b(2) UStG (German taxation law) (beneficiary owes tax) |
| DE210 | Import (import from third country) |
| DE301 | Posttax for taxed payments due to increased tax rate |
| DE302 | Authorization for input tax deduction according to § 15a UStG (German taxation law) |
| US100 | Non-taxable domestic sale |
| US101 | Taxable domestic sale |
| US110 | Export (not taxable) |
| US200 | Non-taxable domestic acquisition |
| US201 | Domestic acquisition use tax |
| US202 | Domestic acquisition sales tax |
| US210 | Import (taxable) |

The GDT ProductTaxEventTypeCode 19500 is used in tax calculation to determine the type and percentage rate of tax to be taken into account. Furthermore, based on the GDT ProductTaxEventTypeCode 19500, the tax register decides how and when the reported tax may be declared and paid to the tax authorities.

The GDT ProductTaxEventTypeCode 19500 may be a proprietary code list with fixed predefined values. Changes to the permitted values involve changes to the interface. In a variation, the GDT ProductTaxEventTypeCode 19500 is similar to The complete UN/EDIFACT code list "Duty or tax or fee Type code" is used for the values of the GDT ProductTaxTypeCode 19600. The GDT ProductTaxTypeCode 19600 is used for entering taxes, e.g., in invoices. The relevant types of product taxes for Germany and the US are, for example:

1) A Value added tax (VAT), which is a sales tax levied in Germany. The VAT also applies to all other EU countries and countries with comparable sales tax.

2) A State/provincial sales tax (STT), which is a sales tax levied by federal states in the USA; also applies to other federal countries with comparable tax.

3) Local sales tax (LOC), which is a sales tax levied by tax authorities in a state in the US, e.g., county sales tax, city sales tax. The LOC also applies to other federal countries with comparable tax.

(fffffff) ProductTypeCode

The GDT ProductTypeCode 19700 is a coded representation of the product type. A product type describes the nature of products and establishes the basic properties for products of this type. An example of 19700 is: <ProductTypeCode>1</ProductTypeCode>. The structure of GDT ProductTypeCode 19700 is depicted in FIG. 197. The structure of GDT ProductTypeCode 19700 is depicted in FIG. 197. For the GDT ProductTypeCode 19700, the Category is Element 19702, the Object Class is Product 19704, the Property is Type 19706, the Representation/Association term is Code 19708, the Type term is CCT 19710, the Type Name term is Code 19712, and the Length is from one to two 19714. The GDT ProductTypeCode 19700 may be a restricted GDT.

Some illustrative examples of the GDT ProductTypeCode 19700 are:

1) The number 1, which represents a Material. A material is a tangible product that can be created and thus represents a commercial value. A material's manufacture/production is time-independent from its consumption/use. A material can be traded; used in manufacture, consumed, or produced.

2) The number 2, which represents a Service product. A service product is an intangible product that describes the rendering of service. The rendering of a service coincides in time with its use.

The GDT ProductTypeCode 19700 determines the type of a product in more detail. It can be used in the context of a product instance or of a reference to a product instance in order to qualify this product instance, and can also be used in its own right. The GDT ProductTypeCode 19700 may be a proprietary code list with fixed predefined values. Changes to the permitted values involve changes to the interface.

The ProductTypeCode can be expanded with other product types if necessary, including for example:

3) The number 3, which represents a Financial Product. A financial product may be a series of incoming and outgoing payments based on a contract and for the purposes of investment or financing. Examples of a financial product are: Shares, bonds, loans, foreign exchange transactions or financial derivatives.

4) The number 4, which represents an Intellectual Property. Intellectual Property may be an intangible product of creative work. Intellectual Property includes, for example, a media title, if it is (art)work that is to be conveyed to a wide audience through the media.

5) The number 5, which represents a Warranty. A warranty may be a guarantee within a specified time period to be responsible for flaws or defects in a product sold. The type and scope of this service are specified in the warranty.

(ggggggg) PromotionID

A GDT PromotionID 19800 is a unique identifier for a promotion. A promotion is a marketing activity between the consumer goods industry and retail over a limited timeframe to increase brand capital, name recognition, and market share, to boost sales volumes, or to position new products or product groups. An example of 19800 is: <PromotionID>72318</PromotionID>.

The structure of GDT PromotionID 19800 is depicted in FIG. 198. For the GDT PromotionID 19800, the Object Class is Promotion 19802, the Property is Identification 19804, the Representation/Association term is Identifier 19806, the Type term is CCT 19808, the Type Name term is Identifier 19810, and the Length is from one to thirty-five 19812. The GDT PromotionID 19800 may be a restricted GDT.

Role-based IDs (e.g., BuyerPromotionID, SellerPromotionID) based on the CCT identifier are used without additional attributes; they may be unique in connection with the identification of the business partner described by the role (e.g., BuyerID, SellerID). A promotion can have different objectives, e.g., to generate awareness of a new product, selectively increase demand for a certain brand, retain loyal customers, or fight competition, with various characteristics, e.g., price reductions, retail promotion, and promotional rebates.

GDT PromotionID 19800 is used in connection with cooperative business processes, in particular Vendor Managed Inventory (VMI) and Collaborative Planning, Forecasting and Replenishment (CPFR) to clearly identify a promotion between the business partners involved. Initially, one business partner, such as a retail company or a consumer goods manufacturer, informs the other partner of his identification of the promotion with a PromotionID. This identification can then be used as a reference in the downstream message exchange between the business partners.

(hhhhhhh) Property

A GDT Property 19900 is an object attribute. An example of 19900 is:

```
<Property>
  <ID schemeAgencyID="005">PROPERTY_1</ID>
  <DefinitionClassReference>
      <ID schemeAgencyID="005">DEFCLASS_01</ID>
      <VersionID>DEFCLASS_01</VersionID>
  </DefinitionClassReference>
  <PreferredName languageCode="EN">My first property</
  PreferredName>
  <PreferredName languageCode="DE">Mein erstes
Merkmal</PreferredName>
<PropertyDataTypeReference>DATATYPE_5</
PropertyDataTypeReference>
</Property>.
```

The structure of GDT Property 19900 is depicted in FIG. 199. The GDT Property 19900 includes attribute ActionCode 19902, elements ID 19910, VersionID 19918, DefinitionClassReference 19926, RevisionID 19934, CreationDateTime 19944, VersionDateTime 19952, RevisionDateTime 19960, SubjectAreaCode 19968, PreferredName 19976, SynonymousName 19985, AbbreviationName 19994, DefiningDescription 19904*a*, AdditionalDescription 19913*a*, UsageDescription 19922*a*, PreferredSymbolNote 19931*a*, SynonymousSymbolNote 19940*a*, DefinitionSourceDocument WebAddress 19949*a*, IconAttachment 19958*a*, FigureAttachment 19966*a*, PropertyDataType 19974*a*, PropertyDataTypeReference 19982*a*, MeasureUnitMeaningCode 19990*a*, DependingPropertyReference 19998*a*, ConstrainingPropertyReference 19908*b*, AspectID 19917*b*, TargetInterfaceElementID 19926*b*, MultipleValueIndicator 19935*b*, TextSearchableIndicator 19944*b*, ParametricSearchableIndicator 19954*b*, and ValuationRequiredIndicator 19963*b*. For the GDT Property 19900, the Representation/Association term is Details 19901.

The ActionCode 19902 is an instruction to the recipient of a message telling it how to process a transmitted property. For the ActionCode 19902, the Category is Attribute 19903, the Object Class is Property 19904, the Property is Action 19905, the Representation/Association term is Code 19906, the Type term is GDT 19907, the Type Name term is ActionCode 19908. The Cardinality between the GDT Property 19900 and the ActionCode 19902 is zero or one 19909.

The ID 19910 is an unique identifier of the property. For the ID 19910, the Category is Element 19911, the Object Class is Property 19912, the Property is Identification 19913, the Representation/Association term is PropertyID 19914, the Type term is GDT 19915, the Type Name term is PropertyID 19916. The Cardinality between the GDT Property 19900 and the ID 19910 is one 19917.

The VersionID 19918 is an unique identifier for a version of the property. For the VersionID 19918, the Category is Element 19919, the Object Class is Property 19920, the Property is Version Identification 19921, the Representation/Association term is VersionID 19922, the Type term is GDT 19923, and the Type Name term is VersionID 19924. The Cardinality between the GDT Property 19900 and the VersionID 19918 is zero or one 19925.

The DefinitionClassReference 19926 is a reference to the definition class (or to a version of the definition class) of the property; if this reference exists, the property is unique within the specified definition class. For the DefinitionClassReference 19926, the Category is Element 19927, the Object Class is Property 19928, the Property is Definition Class Reference 19929, the Representation/Association term is PropertyDefinitionClassReference 19930, the Type term is GDT 19931, and the Type Name term is PropertyDefinitionClassReference 19932. The Cardinality between the GDT Property 19900 and the DefinitionClassReference 19926 is zero or one 19933.

The RevisionID 19934 is a revision number, that is, a sequential number that is assigned when changes are made. For the RevisionID 19934, the Category is Element 19935, the Object Class is Property 19936, the Property is Revision identification 19937, the Representation/Association term is Identifier 19938, the Type term is CCT 19939, the Type Name term is Identifier 19940, and the Length is from one to ten 19941. The Cardinality between the GDT Property 19900 and the RevisionID 19934 is zero or one 19942. The RevisionID may be a restricted CCT.

The CreationDateTime 19944 is a creation date/time stamp. For the CreationDateTime 19944, the Category is Element 19945, the Object Class is Property 19946, the Property is Creation 19947, the Representation/Association term is Date Time 19948, the Type term is GDT 19949, and the Type Name term is Date Time 19950. The Cardinality between the GDT Property 19900 and the CreationDateTime 19944 is zero or one 19951.

The VersionDateTime 19952 is a creation date/time stamp of this property version. For the VersionDateTime 19952, the Category is Element 19945, the Object Class is Property 19954, the Property is Version 19955, the Representation/Association term is Date Time 19956, the Type term is GDT 19957, and the Type Name term is Date Time 19958. The Cardinality between the GDT Property 19900 and the VersionDateTime 19952 is zero or one 19959.

The RevisionDateTime 19960 is a date/time stamp of the last change. For the RevisionDateTime 19960, the Category is Element 19961, the Object Class is Property 19962, the Property is Revision 19968, the Representation/Association term is Date Time 19964, the Type term is GDT 19965, and the Type Name term is Date Time 19966. The Cardinality between the GDT Property 19900 and the RevisionDateTime 19960 is zero or one 19967.

The SubjectAreaCode 19968 is a subject area in which the property can be used. (See GDT SubjectAreaCode). For the SubjectAreaCode 19968, the Category is Element 19969, the Object Class is Property 19970, the Property is Subject Area 19971, the Representation/Association term is Code 19972, the Type term is GDT 19973, and the Type Name term is SubjectAreaCode 19974. The Cardinality between the GDT Property 19900 and the SubjectAreaCode 19968 is zero or n 19975.

The PreferredName 19976 is a name of the property. There may be a maximum of one entry per language for the PreferredName 19976. For the PreferredName 19976, the Category is Element 19977, the Object Class is Property 19978, the Property Quality term is Preferred 19979, the Property is Name 19980, the Representation/Association term is Name 19981, the Type term is GDT 19982, and the Type Name term is Name 19983. The Cardinality between the GDT Property 19900 and the PreferredName 19976 is from one to n 19984.

The SynonymousName 19985 is a synonym name for the property. For the SynonymousName 19985, the Category is Element 19986, the Object Class is Property 19987, the Property Quality term is Synonymous 19988, the Property is Name 19989, the Representation/Association term is Name 19990, the Type term is GDT 19991, and the Type Name term is Name 19992. The Cardinality between the GDT Property 19900 and the SynonymousName 19985 is from zero to n 19993.

The AbbreviationName 19994 is an abbreviated property name. There may be a maximum of one entry per language for the AbbreviationName 19994. For the AbbreviationName 19994, the Category is Element 19995, the Object Class is Property 19996, the Property Quality term is Abbreviation 19997, the Property is Name 19998, the Representation/Association term is Name 19999, the Type term is GDT **19901*a*, and the Type Name term is Name 19902*a*. The Cardinality between the GDT Property 19900 and the AbbreviationName 19994 is from zero to n 19903*a***.

The DefiningDescription **19904*a* is an unique definition of the property's meaning that makes it possible to uniquely distinguish the property from the other properties. A definition may be entered for each language. For the Defining/Description 19904*a*, the Category is Element 19905*a*, the Object Class is Property 19906*a*, the Property Quality term is Defining 19907*a*, the Property is Description 19908*a*, the Representation/Association term is Description 19909*a*, the Type term is GDT 19910*a*, and the Type Name term is Description 19911*a*. The Cardinality between the GDT Property 19900 and the Defining/Description 19904*a* is from zero to n 19912*a***.

The AdditionalDescription **19913*a* is an additional information about parts of the property which aids in the understanding of the property. For the AdditionalDescription 19913*a*, the Category is Element 19914*a*, the Object Class is Property 19915*a*, the Property Quality term is Additional 19916, the Property is Description 19917*a*, the Representation/Association term is Description 19918*a*, the Type term is GDT 19919*a*, and the Type Name term Description 19920*a*. The Cardinality between the GDT Property 19900 and the AdditionalDescription 19913*a* is from zero to n 19921*a***.

The UsageDescription **19922*a* is a free-text comment. The 19922*a* can be used to add explanatory text or general/individual notes. The comment may not supplement the definition; the description is used for this. The comment clarifies particular aspects concerning the use of a property. For the UsageDescription 19922*a*, the Category is Element 19923*a*, the Object Class is Property 19924*a*, the Property Quality term is Usage 19925*a*, the Representation/Association term is Description, the Type term is GDT 19928*a*, and the Type Name term is Description 19929***a*. The Cardinality between the GDT Property 19900 and the UsageDescription 19922*a* is from zero to n 19930*a*.

The PreferredSymbol 19931*a* is a symbol for the property, such as "d" for diameter. For the PreferredSymbolNote 19931*a*, the Category is Element 19932*a*, the Object Class is Property 19933*a*, the Property Quality term is Preferred 19934*a*, the Property is Symbol 19935*a*, the Representation/Association term is Note 19936*a*, the Type term is GDT 19937*a*, and the Type Name term is Note 19938*a*. The Cardinality between the GDT Property 19900 and the PreferredSymbolNote 19931*a* is zero or one 19939*a*.

The SynonymousSymbolNote 19940*a* is a synonymous symbol for the property. For the SynonymousSymbolNote 19940*a*, the Category is Element 19941*a*, the Object Class is Property 19942*a*, the Property Quality term is Synonymal 19943*a*, the Property is Symbol 19944*a*, the Representation/Association term is Note 19945*a*, the Type term is GDT 19946*a*, and the Type Name term is Note 19947*a*. The Cardinality between the GDT Property 19900 and the SynonymousSymbolNote 19940*a* is zero or n 19948*a*.

The DefinitionSourceDocumentWebAddress 19949*a* is a reference to the original document from which the complete property definition or its meaning was taken. For the DefinitionSourceDocument WebAddress 19949*a*, the Category is Element 19950*a*, the Object Class is Property 19951*a*, the Property Quality term is DefinitionSource 19952*a*, the Property is Document 19953*a*, the Representation/Association term is WebAddress 19954*a*, the Type term is GDT 19955*a*, and the Type Name term is WebAddress 19956*a*. The Cardinality between the GDT Property 19900 and the DefinitionSourceDocument WebAddress 19949*a* is zero or one 19957*a*.

The IconAttachment 19958*a* is a preferred icon, that is, a character (alphanumeric character, symbol, or combination thereof) that conforms to international standards and that, particularly in formulas, represents the property in place of the property name. For the IconAttachement 19958*a*, the Category is Element 19959*a*, the Object Class is Property 19960*a*, the Property is Icon 19961*a*, the Representation/Association term is Attachment 19962*a*, the Type term is GDT 19963*a*, and the Type Name term is Attachment 19964*a*. The Cardinality between the GDT Property 19900 and the IconAttachment 19958*a* is zero or one 19965*a*.

The FigureAttachment 19966*a* is a link to a figure. For the FigureAttachment 19966*a*, the Category is Element 19967*a*, the Object Class is Property 19968*a*, the Property is FIG. 19969*a*, the Representation/Association term is Attachment 19970*a*, the Type term is GDT 19971*a*, and the Type Name term is Attachment 19972*a*. The Cardinality between the GDT Property 19900 and the FigureAttachment 19966*a* is zero or one 19973*a*.

The PropertyDataType 19974*a* is used if the data type of the property is defined for this property (local), then the GDT is embedded here. In this case, GlobalPropertyDataType is not used. For the PropertyDataType 19974*a*, the Category is Element 19975*a*, the Object Class is Property 19976*a*, the Property is Property Data Type 19977*a*, the Representation/Association term is PropertyDataType 19978*a*, the Type is GDT 19979*a*, and the Type Name term is PropertyDataType 19980*a*. The Cardinality between the GDT Property 19900 and the PropertyDataType 19974*a* is zero or one 19981*a*.

The PropertyDataTypeReference 19982*a* is used if an independent data type (global) is to be used for this property, then its identifier is specified here. In this case, LocalPropertyDataType is not used. For the PropertyDataTypeReference 19982*a*, the Category is Element 19983*a*, the Object Class is Property 19984*a*, the Property is Property Data Type Reference 19985*a*, the Representation/Association term is PropertyDataTypeReference 19986*a*, the Type term is GDT 19987*a*, and the Type Name term is PropertyDataTypeReference 19988*a*. The Cardinality between the GDT Property 19900 and the PropertyDataTypeReference 19982*a* is zero or one 19989*a*.

The MeasureUnitMeaningCode 199909*a* indicates the meaning of a physical unit. (See GDT MeasureUnitMeaningCode). For the MeasureUnitMeaningCode 19990*a*, the Category is Element 19991*a*, the Object Class is Property 19992*a*, the Property is Measure Unit Meaning 19993*a*, the Representation/Association term is Code 19994*a*, the Type term is GDT 19995*a*, and the Type Name term is MeasureUnitMeaningCode 19996*a*. The Cardinality between the GDT Property 19900 and the MeasureUnitMeaningCode 19990*a* is zero or one 19997*a*.

The DependingPropertyReference 19998*a* is, for a constraining property, the reference to the depending properties. For examples, the "temperature" property, which affects the measurement of a length, contains the key for the "length" property here, in the evaluation, the "temperature" property contains the temperature at which the length is to be measured. For the DependingPropertyReference 19998*a*, the Category is Element 19999*a*, the Object Class is Property 19901*b*, the Property Quality term is Depending 19902*b*, the Property is Property Identification 19903*b*, the Representation/Association term is PropertyIdentifcation 19904*b*, the Type term is GDT 19905*b*, and the Type Name term is PropertyReference 19906*b*. The Cardinality between the GDT Property 19900 and the DependingPropertyReference 19998*a* is from zero to n 19907*b*.

The ConstrainingPropertyReference 19908*b* is, for a depending property, the reference to the constraining properties. For example, the "length" property, which is dependent on the temperature, contains the key for the "temperature" property here; in the evaluation, the "temperature" property contains the temperature at which the length is to be measured. For the ConstrainingPropertyReference 19908*b*, the Category is Element 19909*b*, the Object Class is Property 19910*b*, the Property Quality term is Constraining 19911*b*, the Property is Property Identification 19912*b*, the Representation/Association term is PropertyIdentification 19913*b*, the Type term is GDT 19914*b*, and the Type Name term is PropertyReference 19915*b*. The Cardinality between the GDT Property 19900 and the ConstrainingPropertyReference 19908*b* is from zero to n 19916*b*.

The following elements may be used in the context of a catalogue:

The AspectID 19917*b* identifies an aspect for which the property is relevant. For the AspectID 19917*b*, the Category is Element 19918*b*, the Object Class is Property 19919*b*, the Property is Aspect Identification 19920*b*, the Representation/Association term is Identifier 19921*b*, the Type term is GDT 19922*b*, and the Type Name term is AspectID 19923*b*. The Cardinality between the GDT Property 19900 and the AspectID 19917*b* is form zero to n 19924*b*. The AspectID 19917 may be for the catalogue 19925*b*.

The TargetInterfaceElementID 48426*b* is the unique identifier of an element in an interface to which element the property can be assigned. For the TargetInterfaceElementID 19926*b*, the Category is Element 19927*b*, the Object Class is Property 19928*b*, the Property is Target Interface Element Identification 19929*b*, the Representation/Association term is Identifier 19930*b*, the Type term is GDT 19931*b*, and the Type Name term is InterfaceElementID 19932*b*. The Cardinality between the GDT Property 19900 and the TargetInterfaceElementID 19926*b* is from zero to n 19933*b*. The TargetInterface ElementID 19926*b* may be for the catalogue 19934*b*.

The MultipleValueIndicator 19935*b* indicates whether a property can contain a list of values or not. For the MultipleValueIndicator 19935*b*, the Category is Element 19936*b*, the Object Class is Property 19937*b*, the Property is Multiple Value Indication 19938*b*, the Representation/Association term is Indicator 19939*b*, the Type term is GDT 19940*b*, and the Type Name term is PropertyMultipleValueIndicator 19941*b*. The Cardinality between the GDT Property 19900 and the MultipleValueIndictor 19935*b* is zero or one 19942*b*. The MultipleValueIndictor 19935*b* may be for the catalogue 19943*b*.

The TextSearchableIndicatorm 19944 indicates whether a property is suitable for a text search or not. For the TextSearachableIndicator 19944*b*, the Category is Element 19946*b*, the Object Class is Property 19947*b*, the Property is TextSearchableIndication 19948*b*, the Representation/Association term is Indicator 19949*b*, the Type term is GDT 19950*b*, the Type Name term is TextSearchableIndicator 19951*b*. The Cardinality between the GDT Property 19900 and the TextSearchableIndicator 19944*b* is zero or one 19952*b*. The TextSearchableIndicator 19944*b* may be for the catalogue 19953*b*.

The ParametricSearchableIndicator 19954*b* indicates, whether a property is suitable for a parametric search or not. For the ParametricSearchableIndicator 19954*b*, the Category is Element 19955*b*, the Object Class is Property 19956*b*, the Property is Parametric Searchable Indication 19957*b*, the Representation/Association term is Indicator 19958*b*, the Type term is GDT 19959*b*, and the Type Name term is PropertyParametric SearchableIndicator 19960*b*. The Cardinality between the GDT Property 19900 and the ParametricSearchableIndicator 19954*b* is zero or one 19961*b*. The ParametricSearchableIndicator 19954*b* may be for the catalogue 19962*b*.

The ValuationRequiredIndicator 19963*b* indicates whether a value may be assigned for the property or not. For the ValuationRequiredIndicator 19963*b*, the Category is Element 19964*b*, the Object Class is Property 19965*b*, the Property is Valuation Required Indication 19966*b*, the Representation/Association term is Indicator 19967*b*, the Type term is GDT 19968*b*, and the Type Name term is PropertyValuationReequiredIndicator 19969*b*. The Cardinality between the GDT Property 19900 and the ValuationRequiredIndicator 19963*b* is zero or one 19970*b*. The ValuationRequiredIndicator 19963*b* may be for the catalogue 19971*b*.

See, for example, ISO13584/42 (Definition of data model for properties) available from the GDT owner, for illustrative Integrity Conditions for the PropertyDataType 19900.

The property may have a data type. The data type can either be embedded under PropertyDataType 19900 or specified as a reference under PropertyDataType 19900.

The ISO13584/42 specifies that a property cannot be depending and constraining at the same time. This means that, in a variation, DependingPropertyReference 19998*a* and ConstrainingPropertyReference 19908*b* are not both be filled out.

Properties can be used for classification, for example.

Some elements that are mandatory in ISO13584/42 are optional in this scheme. This is intended to enable wider use of the scheme.

The attribute AdditionalDescription 19913*a* corresponds to the attribute Note in ISO; the attribute UsageDescription 19922*a* corresponds to the attribute Remark in ISO. ISO also contains an attribute that contains a formula describing the property. The GDT may not contain this attribute.

(iiiiiii) PropertyDataType

A CDT PropertyDataType 20000 is the data type of a property. It describes the syntax of the values and can contain a list of permitted values. An example or instance of 20000 is as follows and describes a typical data type in character format and with a fixed length.

```
<PropertyDataType>
    <ID schemeAgencyID="005">MY_DATATYPE_01</ID>
    <VersionID>5</VersionID>
    <PreferredName languageCode='EN'>My first data
type</PreferredName>
    <Format>02</Format>
    <MaximumTotalDigits>13</MaximumTotalDigits>
    <LowerCaseAllowedIndicator>true</
    LowerCaseAllowedIndicator>
</PropertyDataType>
```

The following example of 20000 describes a data type in numeric format and with decimal places. Negative numbers are permitted, as are intervals. The following format is used: ______,______,______.______.

```
<PropertyDataType>
    <ID schemeAgencyID="005">MY_DATATYPE_01</ID>
    <VersionID>5</VersionID>
    <PreferredName languageCode='EN'>My first data
type</PreferredName>
    <FormatCode>06</FormatCode>
    <MaximumTotalDigitsNumeric>13</
    MaximumTotalDigitsNumeric>
    <FractionalDigitsNumeric>5</FractionalDigitsNunmeric>
 <NegativeValuesAllowedIndicator>true</
 NegativeValuesAllowedIndicator>
 <IntervalValuesAllowedIndicator>true</
 IntervalValuesAllowedIndicator>
  </PropertyDataType>.
```

The structure of CDT PropertyDataType 20000 is depicted in FIG. 200. The CDT PropertyDataType 20000 includes attribute ActionCode 20002 and elements ID 20010, VersionID 20018, PreferredName 20026, SynonymousName 20035, ShortName 20044, IconAttachment 20053, Description 20061, UsageDescription 20069, FormatCode 20078, LanguageDependencyIndicator 20086, MaximumTotalDigitNumberValue 20094, FractionalDigitNumberValue 20005*a*, LowerCaseAllowedIndicator 20015*a*, NegativeValueAllowedIndicator 20023*a*, MeasureUnitCode, CurrencyCode, ExponentialRepresentationTypeCode 20047*a*, ExponentIntegerValue 20055*a*, IntervalValueIndicator 20064*a*, FractionalDigitPresentationAccuracyIndicator 20073*a*, RegularExpression 20082*a*, SeparatorUsageIndicator 20090*a*, TupelLengthValue 20098*a*, ComponentPropertyDefinition Class Reference 20008*b*, ComponentProperty 20017*b*, AllowedPropertyValueElement 20042*b*, and AllowedPropertyValuation 20084*b*. For the PropertyDataType 20000, the Representation/Association term is Details 20001.

The ActionCode 20002 is an instruction to the recipient of a message telling it how to process a transmitted property data type. For the ActionCode 20002, the Category is Attribute 20003, the Object Class is PropertyDataType 20004, the Property is Action 20005, the Representation/Association term is Code 20006, the Type term is GDT 20007, and the Type Name term is ActionCode 20008. The Cardinality between the PropertyDataType 20000 and the ActionCode 20002 is zero or one 20009.

The ID 20010 is an unique identifier of the data type. A data type can either be embedded in a property or defined as a dependent object, in which case, no identifier or names are specified. If a data type is to be used for several properties, it may have its own key and can have a name. For the ID 20010, the Category is Element 20011, the Object Class is PropertyDataType 20012, the Property is Identification 20013, the Representation/Association term is Identifier 20014, the Type term is GDT 20015, and the Type Name term is PropertyDataTypeID 20016. The Cardinality between the PropertyDataType 20000 and the ID 20010 is zero or one 20017.

The VersionID 20018 is an unique identifier for a version of the data type. For the VersionID 20018, the Category is Element 20019, the Object Class is PropertyDataType 20020, the Property is Version Identification 20021, the Representation/Association term is VersionID 20022, the Type term is GDT 20023, and the Type Name term is VersionID 20024. The Cardinality between the PropertyDataType 20000 and the VersionID is zero or one 20025.

The PreferredName 20026 is a name with, for example, one entry per language. For the Preferred Name 20026, the Category is Element 20027, the Object Class is PropertyDataType 20028, the Property Quality term is Preferred 20029, the Property is Name 20030, the Representation/Association term is Name 20031, the Type term is GDT 20032, and the Type Name term is Name 20033. The Cardinality between the PropertyDataType 20000 and the Preferred Name 20026.

The SynonymousName 20035 is a synonym for the data type. Several synonyms can be specified for each language. For the SynonymousName 20035, the Category is Element 20036, the Object Class is PropertyDataType 20037, the Property Quality term is Synonymous 20038, the Property is Name 20039, the Representation/Association term is Name 20040, the Type term is GDT 20041, and the Type Name term is Name 20042. The Cardinality between the PropertyDataType 20000 and the Preferred Name 20026 is from zero to n 20043.

The ShortName 20044 is a short name of the data type. One short name can be entered for each language. For the ShortName 20044, the Category is Element 20045, the Object Class is PropertyDataType 20047, the Property Quality term is Short 20047, the Property is Name 20048, the Representation/Association term is Name 20049, the Type term is GDT 20050, and the Type Name term is Name 20051. The Cardinality between the PropertyDataType 20000 and the ShortName 20044 is from zero to n 20052.

The IconAttachment 20053 is a preferred icon. A character (alphanumeric character, symbol, or combination thereof) that conforms to international standards and that, particularly in formulas, represents the data type in place of the data Type. For the IconAttachment 20053, the Category is Element 20054, the Object Class is PropertyDataType 20055, the Property is Icon 20056, the Representation/Association term is Attachment 20057, the Type term is GDT 20058, and the Type Name term is Attachment 20059. The Cardinality between the PropertyDataType 20000 and the IconAttachment is zero or one 20060.

The Description 20061 is an additional description for any parts of the definition class and that aids the understanding of the definition class. The description can supplement the definition. For the Description 20061, the Category is Element 20062, the Object Class is PropertyDataType 20063, the Property is Description 20064, the Representation/Association term is Description 20065, the Type term is GDT 20066, and the Type Name term is Description 20067. The Cardinality between the PropertyDataType 20000 and the Description 20061 is from zero to n 20068.

The UsageDescription 20069 is a description of aspects concerning the usage of the property. This can be an explanatory text or general/individual notes. For the Usage Description 20069, the Category is Element 20070, the Object Class is PropertyDataType 20071, the Property Quality term is Usage 20072, the Property is Description 20073, the Representation/Association term is Description 20074, the Type term is GDT 20075, and the Type Name term is Description 20076. The Cardinality between the PropertyDataType 20000 and the Usage Description 20069 is from zero to n 20077.

The FormatCode 20078 is a format of the data type; see GDT PropertyDataTypeFormatCode. For the FormatCode 20078, the Category is Element 20079, the Object Class is PropertyDataType 20080, the Property is Format 20081, the Representation/Association term is Code 20082, the Type term is GDT 20083, and the Type Name term is PropertyDataTypeFormatCode 20084. The Cardinality between the PropertyDataType 20000 and the FormatCode 20078 is zero or one 20085.

The LanguageDependencyIndicator 20086 values may not be language neutral. The default value is "false," i.e., values are language neutral. For the LanguageDependencyIndicator 20086, the Category is Element 20087, the Object Class is PropertyDataType 20088, the Property is Language Dependency 20089, the Representation/Association term is Indicator 20090, the Type term is GDT 20091, and the Type Name term is LanguageDependencyIndicator 20092. The Cardinality between the PropertyDataType 20000 and the LanguageDependencyIndicator 20086 is zero or one 20093.

The MaximumTotalDigitNumber 20094 is a total length, including decimal places. For the MaximumTotalDigitNumberValue 20094, the Category is Element 20095, the Object Class is PropertyDataType 20096, the Property Quality term is Maximum Total 20097, the Property is Digit Number 20098, the Representation/Association Quality term is Digit Number 20099, the Representation/Association term is Value **20001*a*, the Type term is GDT 20002*a*, and the Type Name term is DigitNumberValue 20003*a*. The Cardinality between the PropertyDataType 20000 and the MaximumTotalDigitNumberValue 20094 is zero or one 20004*a***.

The FractionalDigitNumber **20005*a* is a number of decimal places. For the FractionalDigitNumberValue 20005*a*, the Category is Element 20006, the Object Class is PropertyDataType 20007*a*, the Property Quality term is Fractional 20008*a*, the Property is Digit Number 20009*a*, the Representation/Association Quality term is Digit Number 20010*a*, the Representation/Association term is Value 20011*a*, the Type term is GDT 20012*a*, and the Type Name term is DigitNumberValue 20013*a*. The Cardinality between the PropertyDataType 20000 and the FractionalDigitNumberValue 20005*a* is zero or one 20014*a***.

The LowerCaseAllowedIndicator **20015*a* indicates whether or not lowercase entries are allowed. The default value is "false," i.e., lowercase values are not allowed. For the LowerCaseAllowedIndicator 20015*a*, the Category is Element 20016*a*, the Object Class is PropertyDataType 20017*a*, the Property is Lower Case Allowed 20018*a*, the Representation/Association term is Indicator 20019*a*, the Type term is GDT 20020*a*, and the Type Name term is Indicator 20021*a*. The Cardinality between the PropertyDataType 20000 and the LowerCaseAllowedIndicator 20015*a* is zero or one 20022*a***.

The NegativeValueAllowedIndicator 20023*a* indicates whether or not negative values are allowed. The default value is "false," i.e., negative values are not allowed. For the NegativeValueAllowedIndicator 20023*a*, the Category is Element 20024*a*, the ObjectClass term is PropertyDataType 20025*a*, the Property is Negative Value Allowed 20026*a*, the Representation/Association term is Indicator 20027*a*, the Type term is GDT 20028*a*, and the Type Name term is Indicator 20029*a*. The Cardinality between the PropertyDataType 20000 and the NegativeValueAllowedIndicator 20015*a* is zero or one 20030*a*.

The MeasureUnitCode 20031*a* is a coded representation of a non-monetary unit of measurement; see GDT MeasureUnitCode. For the MeasureUnitCode 20031*a*, the Category is Element 20032*a*, the Object Class is PropertyDataType 20033*a*, the Property is Measure Unit 20034*a*, the Representation/Association term is Code 20035*a*, the Type term is GDT 20036*a*, and the Type Name term is MeasureUnitCode 20037*a*. The Cardinality between the PropertyDataType 20000 and the MeasureUnitCode 20031*a* is zero or one 20038*a*.

The CurrencyCode 20039*a* is a currency of the data type; see GDT CurrencyCode. For the CurrencyCode 20039*a*, the Category is Element 20040*a*, the Object Class is PropertyDataType 20041*a*, the Property is Currency 20042*a*, the Representation/Association term is Code 20043*a*, the Type term is GDT 20044*a*, and the Type Name term is CurrencyCode 20045*a*. The Cardinality between the PropertyDataType 20000 and the CurrencyCode 20039*a* is zero or one 20046*a*.

The ExponentialRepresentationTypeCode 20047*a* is a type of exponential representation; see GDT ExponentialRepresentationTypeCode. For the ExponentialRepresentationTypeCode 20047*a*, the Category is Element 20048*a*, the Object Class is PropertyDataType 20049*a*, the Property is ExponentialRepresentationType 20049*a*, the Representation/Association term is Code 20051*a*, the Type term is GDT 20052*a*, and the Type Name term is ExponentialRepresentationTypeCode 20053*a*. The Cardinality between the PropertyDataType 20000 and the ExponentialRepresentationTypeCode 20047*a* is zero or one 20054*a*.

The ExponentIntegerValue 20055*a* is an exponent value for exponential representation with predefined exponents. For the ExponentIntegerValue 20055*a*, the Category is Element 20056*a*, the Object Class is PropertyDataType 20057*a*, the Property is Exponent 20058*a*, the Representation/Association Quality term is Integer 20059*a*, the Representation/Association term is Value 20060*a*, the Type term is GDT 20061*a*, and the Type Name term is IntegerValue 20062*a*. The Cardinality between the PropertyDataType 20000 and the ExponentIntegerValue 20055*a* is zero or one 20063*a*.

The IntervalValueAllowedIndicator 20064*a* indicates whether or not interval values are allowed (the interval is classed as one value in the value list.) The default value may be "false," i.e., interval values are not allowed. For the IntervalValueAllowedIndicator 20064*a*, the Category is Element 20065*a*, the Object Class PropertyDataType 20066*a*, the Property Quality term is Interval 20067*a*, the Property is Value Allowed 20068*a*, the Representation/Association term is Indicator 20069*a*, the Type term is GDT 20070*a*, and the Type Name term is Indicator 20071*a*. The Cardinality between the PropertyDataType 20000 and the IntervalValueAllowedIndicator 20064*a* is zero or one 20072*a*.

The FractionalDigitPresentationAccuracyIndicator 20073*a* indicates whether or not the number of decimal places of numeric values follows the entry under FractionalDigitsNumeric or the actual user entry. Example: three decimal places, entry 2.40; if this switch is not set, the entry is formatted as 2.400, if the switch is set, the format remains as 2.40. The default value may be "false," i.e. FractionalDigitsNumeric is deciding. For the FractionalDigitPresentationAccuracyIndicator 20073*a*, the Category is Element 20074*a*, the Object Class is PropertyDataType 20075*a*, the Property Quality term is Fractional Digit 20076*a*, the Property is Presentation Accuracy 20077*a*, the Representation/Association term is Indicator 20078*a*, the Type term is GDT 20079*a*, and the Type Name term is Indicator 20080*a*. The Cardinality between the PropertyDataType 20000 and the FractionalDigitPresentationAccuracyIndicator 20073*a* is zero or one 20081*a*.

The RegularExpression 20082*a* is a formula that describes the data type, e.g., for a data type for density, this could indicate that the density is the quotient of mass and volume. For the RegularExpression 20082*a*, the Category is Element 20083*a*, the Object Class is PropertyDataType 20084*a*, the Property is Regular Expression 20085*a*, the Representation/Association term is Text 20086*a*, the Type term is GDT 20087*a*, and the Type Name term is Note 20088*a*. The Cardinality between the PropertyDataType 20000 and the RegularExpression 20082*a* is zero or one 20089*a*.

The SeparatorUsageIndicator 20090*a* indicates whether or not thousand separators are to be used in numeric formats. The default value is "true"-thousand separators are used. For the SeparatorUsageIndicator 20090*a*, the Category is Element 20091*a*, the Object Class is PropertyDataType 20092*a*, the Property is Separator Usage 20093*a*, the Representation/Association term is Indicator 20094*a*, the Type term is GDT 20095*a*, and the Type Name term is Indicator 20096*a*. The Cardinality between the PropertyDataType 20000 and the SeparatorUsageIndicator 20090*a* is zero or one 20097*a*.

The TupelLengthValue 20098*a* if the data type is used to record measured values, minimum, maximum, and average values, e.g., need to be recorded, since a single value is generally not sufficient; these values have the same format. In this case, the TupelLengthValue can be used to specify that a value data set is required. In the example, a 3-tupel is required for specifying values. If this attribute is not specified, the values are single values. For the TupelLengthValue 20098*a*, the Category is Element 20099*a*, the Object Class is PropertyDataType 20001*b*, the Property is Tupel Length 20002*b*, the Representation/Association Quality term is Tupel Length 20003*b*, the Representation/Association term is Value 20004*b*, the Type term is GDT 20005*b*, and the Type Name is TupelLengthValue 20006*b*. The Cardinality between the PropertyDataType 20000 and the TupelLengthValue 20098*a* is zero or one 20007*b*.

The ComponentPropertyDefinitionClassReference 20008*b* is used in the case of complex data types. This is the reference to the definition class (or to a version of the definition class) that contains the sub properties of the complex data type. If a definition class is not used, the properties contained are specified under ComponentPropertyReference instead. For the ComponentPropertyDefinition ClassReference 20008*b*, the Category is Element 20009*b*, the Object Class is PropertyDataType 20010*b*, the Property Quality term is Component 20011*b*, the Property is Property Definition Class Reference 20012*b*, the Representation/Association term is PropertyDefinition ClassReference 20013*b*, the Type term is GDT 20014*b*, and the Type Name term is PropertyDefinition ClassReference 20015*b*. The Cardinality between the PropertyDataType 20000 and the ComponentPropertyDefinition ClassReference 20008*b* is zero or one 20016*b*.

The ComponentProperty 20017*b* is in the case of complex data types, these are the properties that form the components of the complex data type and the attributes related to this assignment. For the ComponentProperty 20017*b*, the Category is Element, the Object Class is PropertyDataType 20019*b*, the Property Quality term is Component 20020*b*, the Property is Property Reference 20021*b*, the Representation/Association term is PropertyReference 20022*b*, the Type term is GDT 20023*b*, and the Type Name is PropertyReference 20024*b*. The Cardinality between the PropertyDataType 20000 and the ComponentProperty 20017*b* is zero or n 20025*b*.

The ComponentPropertyReference 20026*b* is if a complex data type is modeled, but no definition class is used, these are the identifiers of the properties that form the complex data type. A complex data type may contain at least two properties. For the ComponentProperty 20017*b* Reference 20026*b*, the Category is Element 20027*b*, the Object Class is ComponentProperty 20028*b*, the Property is Property Reference 20029*b*, the Representation/Association term is PropertyReference 20030*b*, the Type term is GDT 20031*b*, and the Type Name term is PropertyReference 20032*b*. The Cardinality between the PropertyDataType 20000 and the ComponentProperty 20017*b* Reference 20026*b* is one 20033*b*.

The PropertyOrdinalNumberValue 20034*b* is a position of a given property in the list of component properties. The sequence of this property list is specified by the required display sequence of the properties. For the ComponentProperty 20017*b* OrdinalNumberValue 20034*b*, the Category is Element 20035*b*, the Object Class is ComponentProperty 20036, the Property is Ordinal Number 20037*b*, the Representation/Association term is Value 20038*b*, the Type term is GDT 20039*b*, and the Type Name term is OrdinalNumberValue 20040*b*. The Cardinality between the PropertyDataType 20000 and the ComponentProperty 20017*b* OrdinalNumberValue 20034*b* is zero or one 20041*b*.

The AllowedPropertyValueElement 20042*b* is a data type value that is allowed in an evaluation of the associated property. If no value is specified, there are no restrictions in terms of the values allowed in an evaluation (with the exception of the format specifications for the data type). For the AllowedPropertyValueElement 20042*b*, the Category is Element 20043*b*, the Object Class is PropertyDataType 20044*b*, the Property Quality term is Allowed 20045*b*, the Property is PropertyValueStructure 20046*b*, and the Representation/Association term is Details 20047*b*. The Cardinality between the PropertyDataType 20000 and the AllowedPropertyValueElement 20042*b* is from zero to n 20048*b*.

The AllowedPropertyValue 20049*b* is the value allowed. For the AllowedPropertyValueElement 20042*b* PropertyValue 20049*b*, the Category is Element 20050*b*, the Object Class is PropertyValueStructure 20051*b*, the Property is PropertyValue 20052*b*, the Representation/Association term is PropertyValue 20053*b*, the Type term is GDT 20054*b*, and the Type Name term is PropertyValue 20055*b*. The Cardinality between the PropertyDataType 20000 and the AllowedPropertyValueElement 20042*b* PropertyValue 20049*b* is one 20056*b*.

The DefaultValueIndicator 20057*b* indicates whether or not the value or value interval is a standard value or standard value interval. The format and value range are defined by the GDT Indicator. The default value may be "false," i.e., the value is not a standard value. For the AllowedPropertyValueElement 20042*b* DefaultValueIndicator 20057*b*, the Category is Element 20058*b*, the Object Class is PropertyValueStructure 20059*b*, the Property is DefaultValue 20060*b*, the Representation/Association term is Indicator 20061*b*, the Type term is GDT 20062*b*, and the Type Name term is Indicator 20063*b*. The Cardinality between the PropertyDataType 20000 and the AllowedPropertyValueElement 20042*b* DefaultValueIndicator 20057*b* is zero or one 20064*b*.

The NetElementID 20065*b* identifies the current value or value interval in a value hierarchy. The ID is allocated sequentially in whole numbers in the value list. NetElementID is type CCT: Identifier. For the AllowedPropertyValueElement 20042*b* NetElementID 20065*b*, the Category is Element 20066*b*, the Object Class is PropertyValueStructure 20067*b*, the Property is NetElementIndentification 20068*b*, the Representation/Association term is Identifier 20069*b*, the Type term is CCT 20070*b*, and the Type Name term is Identifier 20071*b*. The Length is five 20072. The Cardinality between the PropertyDataType 20000 and the AllowedPropertyValueElement 20042*b* NetElementID 20065*b* is zero or one 20073*b*.

The PreceedingNetElementID 20074*b* identifies a preceding value or preceding value interval in the value hierarchy. There can be several preceding values or value intervals. PreceedingNetElementID is type CCT: Identifier. For the PreceedingNetElementID 20074*b*, the Category is Element, the Object Class is PropertyValueStructure 20076*b*, the Property Quality term is Preceding 20077*b*, the Property is NetelmentIdentification 20078*b*, the Representation/Association term is Identifier 20079*b*, the Type term is CCT 20080*b*, and the Type Name term is Identifier 20081*b*. The Length is five 20082*b*. The Cardinality between the PropertyDataType 20000 and the AllowedPropertyValueElement 20042*b* PreceedingNetElementID 20074*b* is from zero to n 20083*b*.

The AllowedPropertyValuation 20084*b* is used if the data type is a complex data type. It may not have a direct value list. The values allowed result from the valuation of the components of the complex data type. This valuation is specified in AllowedPropertyValuation. For the AllowedPropertyValuation 20084*b*, the Category is Element 20085*b*, the Object Class is PropertyDataType 20086*b*, the Property Quality term is Allowed 20087*b*, the Property is Property Valuation 20088*b*, the Representation/Association term is PropertyValuation 20089*b*, the Type term is GDT 20090*b*, and the Type Name is PropertyValuation 20091*b*. The Cardinality between the PropertyDataType 20000 and the AllowedPropertyValuation 20084*b* is from zero to n 20092*b*.

See ISO13584/42 (Definition of data model for properties), available from the GDT owner, for illustrative Integrity Conditions for 20000.

There are a number of consistency conditions for the individual fields; illustrative consistency conditions are: 1) a LanguageDependencyIndicator, which is for character format; 2) a MaximumTotalDigitNumber, which is exactly 1 for Boolean values and not set for character strings of unlimited length and complex data types; 3) a FractionalDigitsNumber for decimal numbers and exponential numbers. The FractionalDigitsNumber is shorter than the total length; 4) a LowerCaseAllowedIndicator for character format; 5) a NegativeValueAllowedIndicator for whole numbers, decimal numbers, exponential numbers, and currency format; 6) aExponentialRepresentationTypeCode for exponential format; 7) a ExponentInteger for ExponentialRepresentationTypeCode equal to 02; 8) a IntervalValueAllowedIndicator for whole numbers, decimal numbers, exponential numbers, and currency format; 9) a FractionalDigitsPresentationAccuracyIndicator for decimal numbers and exponential numbers; 10) a SeparatorUsageIndicator for whole numbers, decimal numbers, exponential numbers, and currency format; 11) a TupelLengthNumber for integers, decimal numbers, and exponential numbers; 12) an AllowedPropertyValue which can be filled for simple data types; and 13) an AllowedPropertyValuation can be filled for complex data types. If the data type contains a value list, the values contained in the list may satisfy the value syntax defined in the data type. In the case of complex data types, either the identifier for the area of application (ComponentPropertyDefinitionClassReference) or the list of the components contained (ComponentPropertyReference) is used.

The data type is specified for a property in order to define its format and allowed values. If the data type does not contain a value list, any value that satisfies the format described in the data type is allowed for the assigned property. A data type can be created explicitly with an external key. Such data types can be assigned to several properties. Alternatively, a data type can be created implicitly when a property is created; in this case, the data type can be used for this particular property and that it can be changed on the basis of this particular property.

The data type defined here is not to be confused with a DDIC data type. In a variation, it contains particular properties, does not cover all of the attributes of a DDIC data type, and is linked to ISO13584/42. Some elements that are mandatory in ISO13584/42 are optional in this scheme (such as, the optional use of the definition class in the case of complex data types). This is provides wider use of the scheme. The attribute Description corresponds to the attribute Note in ISO and the attribute UsageDescription 20069 corresponds to the attribute Remark in ISO.

For the NetElementID 20065*b* and the PreceedingNetElementID 20074*b*, when the values allowed for the property are defined, they can be arranged in hierarchies in order to simplify navigation and value selection. A value can have several predecessors. For example, the values of the property 'country' are to be arranged by continent. For example, Great Britain is to be grouped under North America as well as under Europe. In an example, this would appear as shown in the following table:

| Value Index | Value | ID of Predecessor |
| --- | --- | --- |
| 1 | Europe | |
| 2 | North America | |
| 3 | Germany | 1 |
| 4 | US | 2 |
| 5 | Great Britain | 1, 2 |

(jjjjjjj) PropertyDataTypeFormatCode

The GDT PropertyDataTypeFormatCode 20100 is a coded representation of the format of a property data type. An example of 20100 is: <PropertyDataTypeFormatCode>date</PropertyDataTypeFormatCode>.

The structure of GDT PropertyDataTypeFormatCode 20100 is depicted in FIG. 201. For the GDT PropertyDataTypeFormatCode 20100, the Object Class is Property Data Type 20102, the Property is Format 20104, the Representation/Association term is Code 20106, the Type term is CCT 20108, the Type Name term is Code 20110, and the Length is ten 20112. The GDT PropertyDataTypeFormatCode 20100 may be a restricted GDT.

The values for 20100 may come from the data type system defined by W3C (www.w3.org/TR/xmlschema-2/#built-in-datatypes). The list contains those data types of the W3C data type system that are used for classification purposes.

The Code Boolean has the Name Boolean and has the value space to support the mathematical concept of binary-valued logic: {true, false}.

The Code complex has the Name complex and is a data type comprising several simple or complex data types.

The Code date has the Name date and represents a calendar date. The value space of date is the set of Gregorian calendar dates as defined in §5.2.1 of [ISO 8601]. For example it may be a set of one-day long, non-periodic instances e.g. lexical 1999-10-26 to represent the calendar date 1999-10-26, independent of how many hours this day has.

The Code decimal has the Name decimal and represents arbitrary precision decimal numbers. The value space of decimal is the set of the values i×10^−n, where i and n are integers such that n>=0. The order-relation on decimal is: x<y iff y−x is positive.

The Code float has the Name float and corresponds to the IEEE single-precision 32-bit floating point type [IEEE 754-1985]. The basic value space of float consists of the values m×2^e, where m is an integer whose absolute value is less than 2^24, and e is an integer from 149 to 104, inclusive. In addition to the basic value space described above, the value space of float also contains the following special values: positive and negative zero, positive and negative infinity and not-a-number. The order-relation on float is: x<y iff y−x is positive. Positive zero is greater than negative zero. Not-a-number equals itself and is greater than all float values including positive infinity.

The Code integer has the Name integer and is derived from decimal by fixing the value of fractionDigits to be 0. This results in the standard mathematical concept of the integer numbers. The value space of integer is the infinite set { . . . , −2, −1,0,1,2, . . . }. The base type of integer is decimal.

The Code string has the Name string and represents character strings in XML. The value space of string is the set of finite-length sequences of characters (as defined in [XML 1.0 (Second Edition)]) that match the Char production from [XML 1.0 (Second Edition)]. A character is an atomic unit of communication; it is not further specified except to note that every character has a corresponding Universal Character Set code point, which is an integer.

The Code time has the Name time and represents an instant of time that recurs every day. The value space of time is the space of time of day values as defined in §5.3 of [ISO 8601]. Specifically, it may be a set of zero-duration daily time instances.

The Code dateTime has the Name dateTime and represents a specific instant of time. The value space of dateTime is the space of Combinations of date and time of day values as defined in §5.4 of [ISO 8601].

The Code anyURI has the Name anyURI and represents a Uniform Resource Identifier Reference (URI). An anyURI value can be absolute or relative, and may have an optional fragment identifier (i.e., it may be a URI Reference). This type should be used to specify the intention that the value fulfills the role of a URI as defined by [RFC 2396], as amended by [RFC 2732].

The type is used in the GDT PropertyDataType 20100. The Code establishes which formats are possible for a data type entry and how associated values are transferred and stored. The valuations for the formats (e.g., the number of decimal places) are specified in the GDT PropertyDataType 20100.

(kkkkkkk) PropertyDataTypeID

A GDT PropertyDataTypeID 20200 is a unique identifier for a property data type. PropertyDataType is the data type of a property. It describes the syntax of the property values and can contain a list of permitted values. An example of 20200 is: <PropertyDataTypeID schemeAgencyID='005'>MY_DATATYPE_01</PropertyDataTypeID>.

The structure of GDT PropertyDataTypeID 20200 is depicted in FIG. 202. (See CCT Identifier). The GDT PropertyDataTypeID 20200 includes attributes SchemeAgencyID 20216, SchemeAgencySchemeID 20234, and schemeAgencySchemeAgencyID 20252. For the GDT PropertyDataTypeID 20200, the Object Class is Property Data Type 20202, the Property is Identification 20204, the Representation/Association term is Identifier 20206, the Type term is CCT 20208, the Type Name term is Identifier 20210, and the Length is from one to fifty 20212. The GDT PropertyDataTypeID 20200 may be a restricted GDT.

For the SchemeAgencyID 20216, the Category is Attribute 20218, the Object Class is Identification Scheme-Agency 20220, the Property is Identification 20222, the Representation/Association term is Identifier 20224, the Type term is xsd 20226, the Type Name term is Token 20228, and the Length is from one to sixty 20230. The Cardinality between the GDT PropertyDataTypeID 20200 and the SchemeAgencyID 20216 is one 20232. For the SchemeAgencySchemeID 20234, the Category is Attribute 20236, the Object Class is Identification Scheme-Agency 20238, the Property is Scheme 20240, the Representation/Association term is Identifier 20242, the Type term is xsd 20244, the Type Name term is Token 20246, and the Length is from one to sixty 20248. The Cardinality between the GDT PropertyDataTypeID 20200 and the SchemeAgencySchemeID 20234 is zero or one 20250.

For the schemeAgencySchemeAgencyID 20252, the Category is Attribute 20254, the Object Class is Identification Scheme-Agency 20256, the Property is Scheme Agency 20258, the Representation/Association term is Identifier 20260, the Type term is xsd 20262, the Type Name term is Token 20264, and the Length is three 20266. The Cardinality between the GDT PropertyDataTypeID 20200 and the schemeAgencySchemeAgencyID 20252 is zero or one 20268.

The GDT is used to assign an independently defined data type to a property. The concept is defined in ISO13584/42.

The GDT PropertyDataTypeReference 20200 is used to reference a version of a property data type.

Related GDTs are: PropertyID, Property, DefinitionClassID, DefinitionClass, PropertyValues, and PropertyValuation (lllllll) PropertyDataTypeReference A GDT PropertyDataTypeReference 20300 is a unique reference to a property data type or a version of a property data type. PropertyDataType is the data type of a property. It describes the syntax of the property values and can contain a list of permitted values. An example of the 20300 is:

```
<PropertyDataTypeReference>
    <ID schemeAgencyID="005">MY__DATATYPE__01</ID>
    <VersionID>1</VersionID>
</PropertyDataTypeReference>
    (005=ISO).
```

The structure of GDT PropertyDataTypeReference 20300 is depicted in FIG. 203. The GDT PropertyDataTypeReference 20300 includes elements ID and VersionID. For the GDT PropertyDataTypeReference 20300, the Object Class is Property Data Type Reference 20302 and the Representation/Association term is Details 20304.

The ID 20306 is the identifier of the property data type. For the ID 20306, the Category is Element 20308, the Object Class is Property Data Type Reference 20310, the Property is Identification 20312, the Representation/Association term is Identifier 20314, the Type term is GDT 20316, and the Type Name term is PropertyDataTypeID 20318. The Cardinality between the GDT PropertyDataTypeReference 20300 and the ID 20306 is one.

The VersionID 20320 is the version of the property data type. For the VersionID 20320, the Category is Element 20322, the Object Class is Property Data Type Reference 20324, the Property is Version Identification 20326, the Representation/Association term is Identifier 20328, the Type term is GDT 20330, and the Type Name term is VersionID 20332. The Cardinality between the GDT PropertyDataTypeReference 20300 and the VersionID 20320 is zero or one 20334.

For information about the property data type, see GDT PropertyDataType 20000.

(mmmmmmm) PropertyDefinitionClass

A GDT PropertyDefinitionClass 20400 is a class for defining properties in a classification system. A PropertyDefinitionClass 20400 defines a subject area. The properties defined in a PropertyDefinitionClass represent the attributes of this subject area. The PropertyDefinitionClass 20400 is not used directly for classifying objects. For this purpose, classes are defined that use the properties defined in a PropertyDefinitionClass 20400.

The PropertyValuation environment, and relationships to other objects, is discussed below.

"Simple" properties are described first. A property definition class can contain one or more properties. A property can have property valuations, each of which assigns one or more property values to a property. A property is typed by a property data type, which specifies the possible property values for the property valuations. The values permitted by the property data type can be specified by listing the values in "PropertyValue."

Complex properties can also be defined. A complex property data type can be used to define a complex property by referencing to a property definition class. The property definition class contains several properties that structure the complex property data type. The properties are then typed by property data types. Properties can also be defined without a property definition class. In this case, each property is defined globally, i.e., the "area of application" of the properties is not specified by the property definition class. A PropertyValuation is used to valuate properties for any objects, or to assign values to properties.

An example or instance is:

```
<PropertyDefinitionClass>
    <ID schemeAgencyID="005">SCREW__PROPERTIES</ID>
    <VersionID>1</VersionID>
    <PreferredName languageCode='EN'>
        'Properties for screw description'
    </PreferredName>
    <ShortName languagecode='EN'>
        'Screws'
    </ShortName>
    <DefinedProperty>
        <Reference>
            <ID schemeAgencyID="005">LENGTH</ID>
            <VersionID>1</VersionID>
            <DefinitionClassReference>
                <ID>SCREW__PROPERTIES</ID>
                <VersionID>1</VersionID>
            </DefinitionClassReference>
        </Reference>
    </DefinedProperty>
    <DefinedProperty>
        <Reference>
            <ID schemeAgencyID="005">HEAD__TYPE</ID>
```

-continued

```
                <VersionID>1</VersionID>
                <DefinitionClassReference>
                    <ID>SCREW__PROPERTIES</ID>
                    <VersionID>1</VersionID>
                </DefinitionClassReference>
            </Reference>
<SubHierarchyDefinitionIndicator>true</
SubHierarchyDefinitionIndicator>
        </DefinedProperty>
    </PropertyDefinitionClass>.
```

The structure of GDT PropertyDefinitionClass 20400 is depicted in FIG. 204. The GDT PropertyDefinitionClass 20400 includes attributes ActionCode 20402 and elements ID 20410, VersionID 20418, RevisionID 20427, CreationDateTime 20436, VersionDateTime 20444, RevisionDateTime 20452, PreferredName 20460, SynonymousName 20469, ShortName 20478, IconAttachement 20487, DefiningDescription 20496, SourceDocumentWebAddress 20406*a*, AdditionalDescription 20415*a*, UsageDescription 20424*a*, TypeCode 20433*a*, SimplifiedGraphicAttachement 20441*a*, SubjectAreaCode 20450*a*, ParentPropertyDefinitionClassReference 20459*a*, Defined Property 20468*a*, and HierarchyPropertyValuation 20407*b*. For the GDT PropertyDefinitionClass 20400, the Representation/Association term is Details 20401.

The ActionCode 20402 is an instruction to the recipient of a message telling it how to process a transmitted business object. For the ActionCode 20402, the Category is Attribute 20403, the Object Class is Property Definition Class 20404, the Property is Action 20405, the Representation/Association term is Code 20406, the Type term is GDT 20407, and the Type Name term is ActionCode 20408. The Cardinality between the GDT PropertyDefinitionClass 20400 and the ActionCode 20402 is zero or one 20409.

The ID 20410 is an unique identifier of the definition class (see GDT PropertyDefinitionClassID). For the ID 20410, the Category is Element 20411, the Object Class is Property Definition Class 20412, the Property is Identification 20413, the Representation/Association term is PropertyDefinitionClassID 20414, the Type term is GDT 20415, and the Type Name term is PropertyDefinitionClassID 20416. The Cardinality between the GDT PropertyDefinitionClass 20400 and the ID 20410 is zero or one 20417.

The VersionID 20418 is an unique identifier for a version of the definition class. For the VersionID 20418, the Category is Element 20419, the Object Class is Property Definition Class 20420, the Property is Version Identification 20421, the Representation/Association term is VersionID 20422, the Type term is GDT 20423, and the Type Name term is VersionID 20424. The Cardinality between the GDT PropertyDefinitionClass 20400 and the VersionID 20418 is zero or one 20425.

The RevisionID 20426 is an unique identifier for a revision of the definition class. The RevisionID is a sequential number that is assigned when changes are made. For the RevisionID 20426, the Category is Element 20427, the Object Class is Property Definition Class 20428, the Property is Revision Identification 20429, the Representation/Association term is Identifier 20430, the Type term is CCT 20431, the Type Name term is Identifier 20432, and the Length is from one to ten 20433. The Cardinality between the GDT PropertyDefinitionClass 20400 and the RevisionID 20426 is zero or one 20434. The RevisionID 20426 may be restricted.

The CreationDateTime 20436 is a creation date/time of the definition class. For the CreationDateTime 20436, the Category is Element 20437, the Object Class is Property Definition Class 20438, the Property is Creation Date Time 20439, the Representation/Association term is DateTime 20440, the Type term is GDT 20441, and the Type Name term is DateTime 20442. The Cardinality between the GDT PropertyDefinitionClass 20400 and the CreationDateTime 20436 is zero or one 20443.

The VersionDateTime 20444 is a creation date/time of the definition class version. For the VersionDateTime 20444, the Category is Element 20445, the Object Class is Property Definition Class 20446, the Property is Version Date Time 20447, the Representation/Association term is DateTime 20448, the Type term is GDT 20449, and the Type Name term is DateTime 20450. The Cardinality between the GDT PropertyDefinitionClass 20400 and the VersionDateTime 20444 is zero or one 20451.

The RevisionDateTime 20452 is a date/time of the last change to the definition class that resulted in a RevisionID. For the RevisionDateTime 20452, the Category is Element 20453, the Object Class is Property Definition Class 20454, the Property is Revision Date Time 20455, the Representation/Association term is DateTime 20456, the Type term is GDT 20457, and the Type Name term is DateTime 20458. The Cardinality between the GDT PropertyDefinitionClass 20400 and the RevisionDateTime 20452 is zero or one 20459.

The PreferredName 20460 is a name of the definition class with, for example, maximum one entry per language. For the PreferredName 20460, the Category is Element 20461, the Object Class is Property Definition Class 20462, the Property Quality term is Preferred 20463, the Property is Name 20464, the Representation/Association term is Name 20465, the Type term is GDT 20466, and the Type Name term is Name 20467. The Cardinality between the GDT PropertyDefinitionClass 20400 and the PreferredName 20460 is one or n 20468.

The SynonymousName 20469 is a synonym for the definition class. Several synonyms can be specified for each language. For the SynonymousName 20469, the Category is Element 20470, the Object Class is Property Definition Class 20471, the Property Quality term is Synonymous 20472, the Property is Name 20473, the Representation/Association term is Name 20474, the Type term is GDT 20475, the Type Name term is Name 20476. The Cardinality between the GDT PropertyDefinitionClass 20400 and the SynonymousName 20469 is from zero to n 20477.

The ShortName 20478 is a short name for definition class. A short name can be entered for each language. For the ShortName 20478, the Category is Element 20479, the Object Class is Property Definition Class 20480, the Property Quality term is Short 20481, the Property is Name 20482, the Representation/Association term is Name 20483, the Type term is GDT 20484, and the Type Name term is Name 20485. The Cardinality between the GDT PropertyDefinitionClass 20400 and the ShortName 20478 is from zero to n 20486.

The IconAttachment 20487 is a preferred symbol or character (alphanumeric character, symbol, or combination thereof) for the definition class that represents the definition class in conformance with international standards, particularly as "symbols" in formulas. For the IconAttachement 20487, the Category is Element 20488, the Object Class is Property Definition Class 20489, the Property Quality term is Icon 20490, the Property is Attachement 20491, the Representation/Association term is Attachement 20492, the Type term is GDT 20493, and the Type Name term is Attachement 20494. The Cardinality between the GDT PropertyDefinitionClass 20400 and the IconAttachement 20487 is zero or one 20495.

The DefiningDescription 20496 is an unique definition of the definition class's meaning makes it possible to uniquely distinguish the definition class from other definition classes. A definition can be entered for each language. For the DefiningDescription 20496, the Category is Element 20497, the Object Class is Property Definition Class 20498, the Property Quality term is Defining 20499, the Property is Description 20401*a*, the Representation/Association term is Description 20402*a*, the Type term is GDT 20403*a*, and the Type Name term is Description 20404*a*. The Cardinality between the GDT PropertyDefinitionClass 20400 and the DefiningDescription 20496 is from zero to n 20405*a*.

The SourceDocumentWebAddress 20406*a* is an address of a document available on the Internet in which the definition of the definition class or its meaning can be found. For example, the URI schemes "http" and "https" may be permitted. For the SourceDocumentWebAddress 20406*a*, the Category is Element 20407*a*, the Object Class is Property Definition Class 20408*a*, the Property Quality term is Source 20409*a*, the Property is Document 20410*a*, the Representation/Association term is WebAddress 20411*a*, the Type is CCT 20412*a*, and the Type Name term is WebAddress 20413*a*. The Cardinality between the GDT PropertyDefinitionClass 20400 and the SourceDocumentWebAddress 20406*a* is zero or one 20414*a*.

The AdditionalDescription 20415*a* is an additional information about parts of the definition class; aids the understanding of the definition class. The description can extend the definition. For the AdditionalDescription 20415*a*, the Category is Element 20416*a*, the Object Class is Property Definition Class 20417*a*, the Property Quality term is Additional 20418*a*, the Property is Description 20419*a*, the Representation/Association term is Description 20420*a*, the Type term is GDT 20421*a*, and the Type Name term is Description 20422*a*. The Cardinality between the GDT PropertyDefinitionClass 20400 and the AdditionalDescription 20415*a* is from zero to n 20423*a*.

The UsageDescription 20424*a* is a description of special aspects concerning the usage of the property. This can be explanatory text of general/individual notes. For the UsageDescription 20424*a*, the Category is Element 20425*a*, the Object Class is Property Definition Class 20426*a*, the Property Quality term is Usage 20427*a*, the Property is Description 20428*a*, the Representation/Association term is Description 20429*a*, the Type term is GDT 20430*a*, and the Type Name term is Description 20431*a*. The Cardinality between the GDT PropertyDefinitionClass 20400 and the UsageDescription 20424*a* is from zero to n 20432*a*.

A TypeCode 20433*a* is similar in its general description to GDT PropertyDefinitionClassTypeCode. For the TypeCode 20433*a*, the Category is Element 20434*a*, the Object Class is Property Definition Class 20435*a*, the Property is Type 20436*a*, the Representation/Association term is Code 20437*a*, the Type term is GDT 20438*a*, and the Type Name term is PropertyDefinitionClassTypeCode 20439*a*. The Cardinality between the GDT PropertyDefinitionClass 20400 and the TypeCode 20433*a* is zero or one 20440*a*.

The SimplifiedGraphicAttachment 20441*a* is a reference to a graphic that illustrates the meaning of the definition class. For the SimplifiedGraphicAttachement 20441*a*, the Category is Element 20442*a*, the Object Class is Property Definition Class 20443*a*, the Property Quality term is Simplified Graphic 20444*a*, the Property is Attachement 20445*a*, the Representation/Association term is Attachement 20446*a*, the Type term is GDT 20447*a*, and the Type Name term is Attachement 20448*a*. The Cardinality between the GDT PropertyDefinitionClass 20400 and the SimplifiedGraphicAttachement 20441*a* is zero or one 20449*a*.

The SubjectAreaCode 20450*a* is a subject area in accordance with the International Classification of Standards (see GDT SubjectAreaCode). For the SubjectAreaCode 20450*a*, the Category is Element 20451*a*, the Object Class is Property Definition Class 20452*a*, the Property Quality term is Topic 20453*a*, the Property is SubjectArea 20454*a*, the Representation/Association term is Code 20455*a*, the Type term is GDT 20456*a*, and the Type Name term is SubjectAreaCode 20457*a*. The Cardinality between the GDT PropertyDefinitionClass 20400 and the SubjectAreaCode 20450*a* is from zero to n 20458*a*.

The ParentPropertyDefinitionClassReference 20459*a* is an assignment to the parent property definition class. In the case of versioning, the version of this definition class is specified in the reference. For the ParentPropertyDefinitionClassReference 20459*a*, the Category is Element 20460*a*, the Object Class is Property Definition Class 20461*a*, the Property Quality term is Parent 20462*a*, the Property is Definition Class Reference 20463*a*, the Representation/Association term is PropertyDefinitionClassReference 20464*a*, the Type term is GDT 20465*a*, and the Type Name term is PropertyDefinitionClassReference 20466*a*. The Cardinality between the GDT PropertyDefinitionClass 20400 and the ParentPropertyDefinitionClassReference 20459*a* is zero or one 20467*a*.

The DefinedProperty 20468*a* is the property defined in this definition class. For the DefinedProperty 20468*a*, the Category is Element 20469*a*, the Object Class is Property Definition Class 20470*a*, the Property is Defined Property 20471*a*, and the Representation/Association term is Details 20472*a*. The Cardinality between the GDT PropertyDefinitionClass 20400 and the DefinedProperty 20468*a* is from zero to n 20473*a*.

The Reference 20474*a* is an assignment to the parent property definition class. In versioning, the version of this definition class is indicated in the reference. For the Reference 20474*a*, the Category is Element 20475*a*, the Object Class is Defined Property 20476*a*, the Property is Reference 20477*a*, the Representation/Association term is PropertyReference 20478*a*, the Type term is GDT 20479*a*, and the Type Name term is PropertyReference 20480*a*. The Cardinality between the GDT PropertyDefinitionClass 20400 and the DefinedProperty 20468*a* Reference 20474*a* is one or one 20481*a*.

The OrdinalNumberValue 20482*a* is the position of a property in the property list of a definition class. The sequence of the property list is given by the desired display sequence of the properties. For the Ordinal Number Value 20482*a*, the Category is Element 20475*a*, the Object Class is Defined Property 20476*a*, the Property is Ordinal Number 20485*a*, the Representation/Association term is Value 20486*a*, the Type term is GDT 20487*a*, and the Type Name term is OrdinalNumberValue 20488*a*. The Cardinality between the GDT PropertyDefinitionClass 20400 and the DefinedProperty 20468*a* Ordinal Number Value 20482 is zero or one 20489*a*.

The SubHierarchyDefinitionIndicator 20490*a* indicates whether or not the property creates hierarchies for the subordinate hierarchy level (see "Constraints"). For the SubHierarchy DefinitionIndicator 20490*a*, the Category is Element 20491*a*, the Object Class is Defined Property 20492*a*, the Property is SubHierarchy 20493*a*, the Representation/Association term is Definition 20494*a*, the Type term is CCT 20495*a*, and the Type Name term is Indicator 20496*a*. The Cardinality between the GDT PropertyDefinitionClass 20400 and the DefinedProperty 20468*a* SubHierarchy DefinitionIndicator 20490*a* is zero or one 20497*a*.

The VisibilityIndicator 20498*a* indicates whether the property can be used at the current hierarchy level or not. For the VisibilityIndicator 20498*a*, the Category is Element 20499*a*, the Object Class is Defined Property 20401*b*, the Property is Visibility 20402*b*, the Representation/Association term is Indicator 20403*b*, the Type term is CCT 20404*b*, and the Type Name term is Indicator 20405*b*. The Cardinality between the GDT PropertyDefinitionClass 20400 and the DefinedProperty 20468*a* VisibilityIndicator 20498*a* is zero or one 20406*b*.

The HierarchyPropertyValuation 20407*b* is the value restriction for the properties indicated in the parent definition class as able to create hierarchies (see Integrity Conditions). For the HierarchyPropertyValuation 20407*b*, the Category is Element 20408*b*, the Object Class is Property Definition Class 20409*b*, the Property Quality term is Hierarchy 20410*b*, the Property is Property Valuation 20411*b*, the Representation/Association term is PropertyValuation 20412*b*, the Type term is GDT 20413*b*, and the Type Name term is PropertyValuation 20414*b*. The Cardinality between the GDT PropertyDefinitionClass 20400 and the HierarchyPropertyValuation 20407*b* is from zero to n 20415*b*.

See ISO13584/42 (Definition of data model for properties), available from the GDT owner, for illustrative Integrity Conditions.

In particular with regard to the hierarchy, Integrity Conditions may be observed in accordance with ISO13584/42. This form of hierarchy creation may be used to formalize the creation rules and to store these rules in the form of properties and their values. This prevents information from becoming lost and enables the hierarchies to be created both explicitly and transparently. The hierarchy may be strict (i.e., one predecessor) and without cycles.

- If a definition class is to contain subordinate definition classes, at least one of the properties contained in the class may be indicated as able to create hierarchies. The data types for these properties may contain value ranges. Value ranges may be specified for all the properties that have been indicated in the parent definition class as able to create hierarchies. Value ranges of subordinate definition classes that are created in this way for such a property may represent a decomposition of the value range for the data type of the property that creates hierarchies.
- Properties can be created for a definition class, but should first be available at lower hierarchy levels. In this case, the VisibilityIndicator is set just at the desired hierarchy level. Once the indicator has been set once for a given property, it cannot be reset at lower hierarchy levels.
- The ID of the definition class may be identical to the definition class ID of the properties contained in the class—this involves two different views for the same subject.
- The definition class is used to group together related business properties. Since the definition class belongs to the property key, the definition class ‘AUTOLACKE’ (car paint) and the definition class ‘TEXTILFARBEN’ (textile colors) can contain, e.g., the ‘FARBE’ (color) property, this then involves two different properties that can have different attributes.
- The definition class is also used as a technical aid to group together properties implicitly by business topic; e.g., the properties of a Knowledge Base in the Internet Pricing Configurator can each be mapped to one definition class. This prevents conflicts between data with the same name but from different Knowledge Bases. Another example of this would be different instances of an SAP catalog that group together different properties with the same name in different definition classes. The definition class is the starting point for distributing properties. The properties of given definition class are distributed.
- In contrast to ISO13584/42 and the Classification Management Engine, the definition class is optional in the GDTs for properties. This enables the GDTs to also be used in simple scenarios and to connect external users who are new to this data model. Some elements that are mandatory in ISO13584/42 are optional in this scheme. This is intended to enable wider use of the schema. In a variation, the definition class does not correspond to the R/3 class in R/3 classification (see Comment). The R/3 class can also group together the properties of a subject area. However, a property may be used in different classes. In that case, a property is defined in one definition class. This means that properties cannot be mapped between the concepts.

(nnnnnnn) PropertyDefinitionClassID

A GDT PropertyDefinitionClassID 20500 is a unique identifier for a property definition class. A GDT PropertyDefinitionClass 20500 is a class for defining properties (in a classification system). A PropertyDefinitionClass defines a subject area. The properties defined in a PropertyDefinitionClass represent the attributes of this subject area. An example or instance is:

```
<PropertyDefinitionClassID
schemeAgencyID="005">MY__DEF__CLASS__01</
PropertyDefinitionClassID>
    (005=ISO).
```

The structure of GDT PropertyDefinitionClassID 20500 is depicted in FIG. 205. The GDT PropertyDefinitionClassID 20500 includes attributes schemeAgencyID 20516, schemeAgencySchemeID 20532, and schemeAgencySchemeAgencyID 20550. For the GDT PropertyDefinitionClassID 20500, the Object Class is Property Definition Class 20502, the Property is Identification 20504, the Representation/Association term is Identifier 20506, the Type term is CCT 20508, the Type Name term is Identifier 20510, and the Length is from one to fifty 20512. The GDT PropertyDefinitionClassID 20500 may be a restricted GDT.

For the schemeAgencyID 20516, the Category is Attribute 20518, the Object Class is IdentificationSchemeAgency 20520, the Property is Identification 20522, the Representation/Association term is Identifier 20524, the Type term is xsd 20526, the Type Name term is Token 20528, and the Length is from one to sixty 20530. The Cardinality between the GDT PropertyDefinitionClassID 20500 and the schemeAgencyID 20516 is one 20531.

For the schemeAgencySchemeID 20532, the Category is Attribute 20534, the Object Class is IdentificationSchemeAgency 20536, the Property is Scheme 20538, the Representation/Association term is Identifier 20540, the Type term is xsd 20542, the Type Name term is Token 20544, and the Length is from one to sixty 20546. The Cardinality between the GDT PropertyDefinitionClassID 20500 and the schemeAgencySchemeID 20532 is zero or one 20548.

For the schemeAgencySchemeAgencyID 20550, the Category is Attribute 20552, the Object Class is IdentificationSchemeAgency 20554, the Property is SchemeAgency 20556, the Representation/Association term is Identifier 20558, the Type term is xsd 20560, the Type Name term is Token 20562, and the Length is three 20564. The Cardinality between the GDT PropertyDefinitionClassID 20500 and the schemeAgencySchemeAgencyID 20550 is zero or one 20566.

If there are several schemes for an Agency (e.g., the organization "ISO," "DIN," or "Siemens"), the GDT may be extended to include the schemeID attribute. The concept is defined, for example, in ISO13584/42. The GDT PropertyDefinitionClassReference is used to reference a version of a property definition class.

(ooooooo) PropertyDefinitionClassReference

A GDT PropertyDefinitionClassReference 20600 is a unique reference to a property definition class or to a version of a property definition class. A GDT PropertyDefinitionClass 20600 is a class for defining properties (in a classification system). A GDT PropertyDefinitionClass 20600 establishes a subject area. The properties defined in a GDT PropertyDefinitionClass 20600 map the attributes of this subject area. An example or instance is:

```
<PropertyDefinitionClassReference>
    <ID schemeAgencyID="005">SCREW_PROPERTIES</ID>
    <VersionID>1</VersionID>
</PropertyDefinitionClassReference>
(005=ISO).
```

The structure of GDT PropertyDefinitionClassReference 20600 is depicted in FIG. 206. The GDT PropertyDefinitionClassReference 20600 includes elements ID and VersionID. For GDT PropertyDefinitionClassReference 20600, the Object Class is Property Definition Class Reference 20602 and the Representation/Association term is Details 20604.

The ID 20606 is the identifier for the property definition class. For the ID 20606, the Category is Element 20606, the Object Class is Property Definition Class Reference 20610, the Property is Identification 20612, the Representation/Association term is Identifier 20614, the Type term is GDT 20616, and the Type Name term is PropertyDefinitionClassID 20618. The Cardinality between the GDT PropertyDefinitionClassReference 20600 and the ID 20606 is one 20620.

The VersionID 20622 is the version for the property definition class. For the VersionID 20622, the Category is Element 20624, the Object Class is Property Definition Class Reference 20626, the Property is Version Identification 20628, the Representation/Association term is Identifier 20630, the Type term is GDT 20632, and the Type Name term is VersionID 20634. The Cardinality between the GDT PropertyDefinitionClassReference 20600 and the VersionID 20622 is zero or one 20636.

For information about the property definition class, see the GDT PropertyDefinitionClass.

(ppppppp) PropertyDefinitionClassTypeCode

The DefinitionClassTypeCode 20700 is a coded representation of the nature of a definition class. This may be determined based on its business purpose, from which the attributes may be derived. An example or instance is: <DefinitionClassTypeCode>M</DefinitionClassTypeCode>.

The structure of GDT DefinitionClassTypeCode 20700 is depicted in FIG. 207. For the GDT DefinitionClassTypeCode 20700, the Object Class is Definition Class Type 20702, the Representation/Association term is Code 20704, the Type term is CCT 20706, the Type Name term is Code 20708, and the Length is one 20710. The GDT DefinitionClassTypeCode 20700 may be a restricted GDT.

In a variation, the illustrative Codes in accordance with ISO13584/42 that are permitted are as follows:

The Code I has the Name Item class. A definition class of this type can contain properties of all the specializations described below.

The Code C has the Name Component class, which is an 'Item class' specialization; the properties that are contained in this type of definition class are used to describe assemblies based on their assignment relationships.

The Code M has the Name Material class, which is an 'Item class' specialization; the properties that are contained in this type of definition class are used to describe basic materials, materials, and the like, based on their physical attributes.

The Code F has the Name Feature class, which is an 'Item class' specialization; the properties that are contained in this type of definition class are used to describe objects based on their geometry, form, and function.

(qqqqqqq) PropertyID

A GDT PropertyID 20800 is a unique identifier for a property. A property is an object attribute. An example is: <PropertyID schemeAgencyID="005">LENGTH</PropertyID>rue, (005=ISO).

The structure of GDT PropertyID 20800 is depicted in FIG. 208. The GDT PropertyID 20800 includes attributes schemeAgencyID 20816, schemeAgencySchemeID 20834, and schemeAgencySchemeAgencyID 20852. For the GDT PropertyID 20800, the Object Class is Property 20802, the Property is Identification 20804, the Representation/Association term is Identifier 20806, the Type term is CCT 20808, the Type Name term is Identifier 20810, and the Length is from one to fifty 20812. The GDT PropertyID 20800 may be a restricted GDT.

For schemeAgencyID 20816, the Category is Attribute 20818, the Object Class is Identification Scheme-Agency 20820, the Property is Identification 20822, the Representation/Association term is Identifier 20824, the Type term is xsd 20826, the Type Name term is Token 20828, and the Length is from one to sixty 20830. The Cardinality between the GDT PropertyID 20800 and the schemeAgencyID 20816 is one or one 20832.

For the schemeAgencySchemeID 20834, the Category is Attribute 20836, the Object Class is Identification Scheme-Agency 20838, the Property is Scheme 20840, the Representation/Association term is Identifier 20842, the Type term is xsd 20844, the Type Name term is Token 20846, and the Length is from one to sixty 20848. The Cardinality between the GDT PropertyID 20800 and the schemeAgencySchemeID 20834 is zero or one 20850.

For the schemeAgencySchemeAgencyID 20852, the Category is Attribute 20854, the Object Class is Identification Scheme-Agency 20856, the Property is SchemeAgency 20858, the Representation/Association. term is Identifier 20860, the Type term is xsd 20862, the Type Name term is Token 20864, and the Length is three 20866. The Cardinality between the GDT PropertyID 20800 and the schemeAgencySchemeAgencyID 20852 is zero or one 20868.

If a definition class is used, the schemeAgency may be identical to the schemeAgency of the identifier for the property definition class in which the property was defined (see GDT PropertyDefinitionClassID).

The concept is defined in ISO13584/42. Related GDTs to 20800 are Property, PropertyDataTypeIdentification, PropertyDataType, DefinitionClassIdentification, DefinitionClass, PropertyValues, and PropertyValuation. The object corresponds to the BOR object BUS1088 (characteristic) and to the Characteristic Management Engine property (CME property) from the new classification.

(rrrrrr)PropertyMultipleValueIndicator

A GDT PropertyMultipleValueIndicator 20900 indicates whether or not a property can incorporate a list of values. An example is: <PropertyMultipleValueIndicator>true</PropertyMultipleValueIndicator>.

The structure of GDT PropertyMultipleValueIndicator 20900 is depicted in FIG. 209. For the GDT PropertyMultipleValueIndicator 20900, the Object Class is Property 20902, the Property is Multiple Value 20904, the Representation/Association term is Indicator 20906, and the Type term is Indicator 20908.

Valid illustrative values for 20900 are:

1) true, meaning several values can be assigned to the property; and
2) false, meaning one value can be assigned to the property. (For the value range, see CCT: Indicator)

(sssssss) PropertyParametricSearchableIndicator

A GDT PropertyParametricSearchableIndicator 21000 indicates whether a property is suitable for a parametric search or not. A parametric search (also called an 'attribute search') is a search for an object using explicit information about which values a property in the object is to contain. For example, in the case of a parametric search for a red vehicle with 100 HP, the illustrative properties are:

1) a Color equal to "red;" and
2) a Performance equal to "100 HP," which are specified explicitly.

An example is: <PropertyParametricSearchableIndicator>true</PropertyParametricSearchableIndicator>.

The structure of GDT PropertyParametricSearchableIndicator 21000 is depicted in FIG. 210. For the GDT PropertyParametricSearchableIndicator 21000, the Object Class is Property 21002, the Property is Parametric Searchable 21004, the Representation/Association term is Indicator 21006, the Type term is CCT 21008, and the Type Name term is Indicator 21010.

Valid illustrative values for 21000 are:

1) true, meaning the property is suitable for a parametric search; and
2) false, meaning the property is not suitable for a parametric search. The GDT PropertyParametricSearchableIndicator 21000 is used in the context of the property definition.

(ttttttt) PropertyReference

A GDT PropertyReference 21100 is a unique reference to a property or a version of a property. The referenced property can have been defined in a property definition class. An example is:

```
<PropertyReference>
    <ID schemeAgencyID="005">LENGTH</ID>
    <VersionID>1</VersionID>
    <DefinitionClassReference>
        <ID schemeAgencyID="005">SCREW_PROPERTIES</ID>
    </DefinitionClassReference>
</PropertyReference>
(005 = ISO).
```

The structure of GDT PropertyReference 21100 is depicted in FIG. 211. The GDT PropertyReference 21100 includes elements ID 21106, VersionID 21122, and DefinitionClassReference 21138. For the GDT PropertyReference 21100, the Object Class is Property Reference 21102 and the Representation/Association term is Details 21104.

The ID 21106 is the identifier for the property. For the ID 21106, the Category is Element 21108, the Object Class is PropertyReference 21110, the Property is Identification 21112, the Representation/Association term is Identifier 21114, the Type term is GDT 21116, and the Type Name is PropertyID 21118. The Cardinality between the GDT PropertyReference 21100 and the ID 21106 is one or one 21120.

The VersionID 21122 is the version of the property. For the VersionID 21122, the Category is Element 21124, the Object Class is PropertyReference 21126, the Property is Version Identification 21128, the Representation/Association term is VersionID 21130, the Type term is GDT 21132, and the Type Name term is VersionID 21134. The Cardinality between the GDT PropertyReference 21100 and the VersionID 21122 is zero or one 21136.

The DefinitionClassReference 21138 is the reference to the definition class (or to a version of the definition class) of the property. If a reference exists, the property is unique within the specified definition class. For the DefinitionClassReference 21138, the Category is Element 21140, the Object Class is PropertyReference 21142, the Property is Definition Class Reference 21144, the Representation/Association term is DefinitionClassReference 21146, the Type term is GDT 21148, and the Type Name term is DefinitionClassReference 21150. The Cardinality between the GDT PropertyReference 21100 and the DefinitionClassReference 21138 is zero or one 21152.

If a definition class is used, the property issuer may be identical to the issuer of the property definition class. The conceptual context of the PropertyReference is defined in ISO13584/42. Related GDTs for 21100 are: Property, PropertyDataTypeIdentification, PropertyDataType, PropertyDefinitionClass, PropertyDefinitionClassID, PropertyValues, and PropertyValuation.

PropertyReference corresponds to the BOR object BUS1088 "Characteristic" and to the CME property from the new classification.

(uuuuuuu) PropertyValuation

The GDT PropertyValuation 21200 is the assignment of values to a property. A property valuation is performed for an object as part of the classification procedure in order to describe its attributes. An example or instance is:

Valuation of a property with a simple data type:

```
<PropertyValuation>
    <PropertyReference>
        <ID>LENGTH</ID>
        <DefinitionClassReference>
            <ID>SCREW_PROPERTIES</ID>
            <Version>1</Version>
        <DefinitionClassReference>
    <PropertyReference>
    <PropertyValue>
        <MeasureSpecification>
            <Measure unitCode="12">3</Measure>
        </MeasureSpecification>
    <PropertyValue>
</PropertyValuation>
unitCode="12" corresponds to centimeters in accordance
with UN/CEFACT Rec. #20 (Units of Measure)
```

Valuation of a property with a complex data type:

The 'VERBRAUCHSPROFIL' (consumption profile) property consists of the 'STRASSENTYP' (street type) and 'VERBRAUCH' (consumption) properties. The data type of the 'VERBRAUCHSPROFIL' property has a complex format and references the 'AUTOS' (cars) definition class that contains the component properties.

Complex (grouping) property 'VERBRAUCHSPROFIL':

```
<PropertyValuation>
    <ID>1</ID>
    <PropertyReference>
        <ID>VERBRAUCHSPROFIL</ID>
        <DefinitionClassReference>
            <ID>AUTOS</ID>
        </DefinitionClassReference>
    </PropertyReference>
</PropertyValuation>
Property 'STRASSENTYP':
<PropertyValuation>
    <ID>2</ID>
    <ParentID>1</ParentID>
    <PropertyReference>
        <ID>STRASSENTYP</ID>
        <DefinitionClassReference>
            <ID>VERBRAUCHSTYP</ID>
        </DefinitionClassReference>
    </PropertyReference>
    <PropertyValue>
        <NameSpecification>
            <Name>LANDSTRASSE</Name>
        </NameSpecification>
    </PropertyValue>
</PropertyValuation>
Property 'VERBRAUCH':
<PropertyValuation>
    <ID>3</ID>
    <ParentID>1</ParentID>
    <PropertyReference>
        <ID>VERBRAUCH</ID>
        <DefinitionClassReference>
            <ID>VERBRAUCHSTYP</ID>
        </DefinitionClassReference>
    </PropertyReference>
    <PropertyValue>
        <MeasureSpecification>
            <Measure unitCode"49">5</Measure>
        </MeasureSpecification>
    </PropertyValue>
</PropertyValuation>
```

unitCode="49" corresponds to liters in accordance with UN/CEFACT Rec. #20 (Units of Measure)

The structure of GDT Property Valuation 21200 is depicted in FIG. 212. The GDT Property Valuation 21200 includes attribute ActionCode 21206 and elements ID 21222, ParentID 21240, PropertyReference 21258, and PropertyValue 21274. For the GDT Property Valuation 21200, the Object Class is Property Valuation 21202*a* and the Representation/Association term is Details 21204.

The ActionCode 21206 is an instruction to the recipient of a message about how to process a transmitted property. For the ActionCode 21206, the Category is Attribute 21208, the Object Class is Property Valuation 21210, the Property is Action 21212, the Representation/Association term is Code 21214, the Type term is GDT 21216, and the Type Name term is ActionCode 21218. The Cardinality between the GDT Property Valuation 21200 and the ActionCode 21206 is zero or one 21220.

The ID 21222 is an unique identifier of the property valuation. The attribute may be used for valuating properties with a complex data type. ID is unique in the context of the valuated object. For the ID 21222, the Category is Element 21224, the Object Class is Property Valuation 21226, the Property is Identification 21228, the Representation/Association term is Identifier 21230, the Type term is CCT 21232, the Type Name term is Identifier 21234, and the Length is from one to ten 21236. The Cardinality between the GDT Property Valuation 21200 and the ID 21222 is zero or one 21238.

The ParentID 21240 is an identifier for the property valuation (for the valuation of a complex data type) that is a parent to the current property valuation. For the ParentID 21240, the Category is Element 21242, the Object Class is Property Valuation 21244, the Property is Parent Identification 21246, the Representation/Association term is Identifier 21248, the Type term is CCT 21250, the Type Name term is Identifier 21252, and the Length is from one to ten 21254. The Cardinality between the GDT Property Valuation 21200 and the ParentID 21240 is zero or one 21256.

The PropertyReference 21258 is a reference to the underlying property for which the property valuation is mapped. For the PropertyReference 21258, the Category is Element 21260, the Object Class is Property Valuation 21262, the Property is Property Reference 21264, the Representation/Association term is Reference 21266, the Type term is GDT 21268, and the Type Name term is PropertyReference 21270. The Cardinality between the GDT Property Valuation 21200 and the PropertyReference 21258 is one 21272.

The PropertyValue 21274 is a value of the above property. For the PropertyValue 21274, the Category is Element 21276, the Object Class is Property Valuation 21278, the Property is Property Value 21280, the Representation/Association term is Property Value 21282, the Type term is GDT 21284, and the Type Name term is PropertyValue 21286. The Cardinality between the GDT Property Valuation 21200 and the PropertyValue 21274 is from zero to n 21288.

See ISO13584/42 (Definition of data model for properties) available from the GDT owner, for illustrative integrity conditions for 21200. The valuations may correspond to the formats specified by the data type (see GDT: PropertyDataType) of the valuated property (see GDT: Property). If the data type contains a value list, valuations may be included in this value list. The number of property values in the valuation may generally correspond to the value assignment type (any, as required) defined in the property. These integrity conditions apply in the case of a final actual valuation and not in the case of specifications for a final valuation. In this case, the valuation restricts the permitted value range of the property. An example of this is the valuation of a batch material that merely specifies the valuation range for the actual batches. Several valuations can also be specified for single-value properties. In a variation, a property with a complex data type may not be valuated directly. However, the components of its data type can be. In this case, PropertyValue 21274 is empty. PropertyValue 21274 is filled for the relevant components and the ParentID 21240 contains the ID 21222 of the parent property with the complex data type.

PropertyValuation is used by classified objects such as, e.g., batch: a property valuation consists of the key of the property to be valuated and the associated values. Thus, e.g., if the 'color' (property) of a batch is 'red' (value) or its 'weight' (property) is '5 kg' (value,) the combination of property and value constitutes the property valuation. PropertyValuation is also used for a formal description of the creation of definition class hierarchies (See GDT PropertyDefinitionClass).

(vvvvvvv) PropertyValuationRequiredIndicator

A GDT PropertyValuationRequiredIndicator 21300 indicates whether or not a value has to be specified for a property. An example is: <PropertyValuationRequiredIndicator>true</PropertyValuationRequiredIndicator>.

The structure of GDT PropertyValuationRequiredIndicator 21300 is depicted in FIG. 213. For the GDT PropertyValuationRequiredIndicator 21300, the Object Class is Property 21302, the Property is Valuation Required 21304, the Representation/Association term is Indicator 21306, the Type term is CCT 21308, and the Type Name term is Indicator 21310.

Valid illustrative values for 21300 are 1) true, meaning that a value may be specified; or 2) false, meaning that a value does not have to be specified. For the value range, see CCT: Indicator.

(wwwwww) PropertyValue

A GDT PropertyValue 21400 describes a value that can be assigned to a property. The value can also be an interval. An example is:

```
<PropertyValue>
    <IntegerSpecification>
        <Value>1</Value>
    </IntegerSpecification>
    <PreferredName languageCode="DE">Eins</PreferedName>
    <PreferredName languageCode="EN">one</PreferedName>
</PropertyValue>.
```

The structure GDT Property Value 21400 is depicted in FIG. 214. The GDT Property Value 21400 includes elements AmountSpecification 21404, QuantitySpecification 21436, DecimalSpecification 21468, FloatSpecification 21404*a*, IntegerSpecification 21439*a*, DateSpecification 21474*a*, TimeSpecification 21404*b*, DateTimeSpecification 21433*b*, NameSpecification 21462*b*, IndicatorSpecification 21476*b*, and IntervalTypeCode 21490*b*. For the GDT Property Value 21400, the Category is Element 21401, the Object Class is Property Value 21402, and the Representation/Association term is Details 21403.

The AmountSpecification 21404 contains the specification of currency-based values (amounts). For the AmountSpecification 21404, the Category is Element 21405, the Object Class is Property Value 21406, the Property is Amount Specification 21407, and the Representation/Association term is Details 21408. The Cardinality between the GDT Property Value 21400 and the AmountSpecification 21404 is zero or one 21409.

The Amount 21410 is a discrete, currency-based single value or amount. The Amount 21410 is of type GDT: Amount. For the Amount 21410, the Category is Element 21411, the Object Class is Amount Specification 21412, the Property is Amount 21413, the Representation/Association term is Amount 21414, the Type term is GDT 21415, and the Type Name term is Amount 21416. The Cardinality between the GDT Property Value 21400 and the AmountSpecification 21404 Amount 21410 is between zero or one 21417.

The LowerAmount 21418 is a lower limit in a currency-based value interval. The LowerAmount 21418 is of type GDT: Amount. For the LowerAmount 21418, the Category is Element 21419, the Object Class is Amount Specification 21420, the Property Quality term is Lower 21421, the Property is Amount 21422, the Representation/Association term is Amount 21423, the Type term is GDT 21424, and the Type Name term is Amount 21425. The Cardinality between the GDT Property Value 21400 and the AmountSpecification 21404 LowerAmount 21418 is zero or one 21426.

The UpperAmount 21427 is an upper limit in a currency-based value interval. The UpperAmount is of type GDT: Amount. For the UpperAmount 21427, the Category is Element 21428, the Object Class is amount Specification 21429, the Property Quality term is Upper 21430, the Property is Amount 21431, the Representation/Association term is Amount 21432, the Type term is GDT 21433, and the Type Name term is Amount 21434. The Cardinality between the GDT Property Value 21400 and the AmountSpecification 21404 UpperAmount 21427 is zero or one 21435.

The QuantitySpecification 21436 contains the specification of quantities in a unit of measurement/measure. For the QuantitySpecification 21436, the Category is Element 21437, the Object Class is Property Value 21438, the Property is Quantity Specification 21439, and the Representation/Association term is Details 21440. The Cardinality between the GDT Property Value 21400 and the QuantitySpecification 21436 is zero or one 21441.

The Quantity 21442 is an individual quantity in a unit of measurement. The Quantity 21442 is of type GDT: Quantity. For the Quantity 21442, the Category is Element 21443, the Object Class is Quantity Specification 21444, the Property is Quantity 21445, the Representation/Association term is Quantity 21446, the Type term is GDT 21447, and the Type Name term is Quantity 21448. The Cardinality between the GDT Property Value 21400 and the QuantitySpecification 21436 Quantity 21442 is zero or one 21449.

The LowerQuantity 21450 is a lower limit in a quantity interval. The LowerQuantity 21450 is of type GDT: Quantity. For the LowerQuantity 21450, the Category is Element 21451, the Object Class is Quantity Specification 21452, the Property Quality term is Lower 21453, the Property is Quantity 21454, the Representation/Association term is Quantity 21455, the Type term is GDT 21456, and the Type Name term is Quantity 21457. The Cardinality between the GDT Property Value 21400 and the LowerQuantity 21450 is zero or one 21458.

The UpperQuantity 21459 is an upper limit in a quantity interval. The UpperQuantity 21459 is of type GDT: Quantity. For the UpperQuantity 21459, the Category is Element 21460, the Object Class is Quantity Specification 21461, the Property Quality term is Upper 21462, the Property is Quantity 21463, the Representation/Association term is Quantity 21464, the Type term is GDT 21465, and the Type Name term is Quantity 21466. The Cardinality between the GDT Property Value 21400 and the UpperQuantity 21459 is zero or one 21467.

The DecimalSpecification 21468 contains the specification of decimal numbers. For the DecimalSpecification 21468, the Category is Element 21469, the Object Class is Property Value 21470, the Property is Numeric Specification 21471, and the Representation/Association term is Details 21472. The Cardinality between the GDT Property Value 21400 and the DecimalSpecification 21468 is zero or one 21473.

The DecimalValue 21474 is a discrete decimal value. The DecimalValue 21474 is of type GDT: DecimalValue. For the DecimalValue 21474, the Category is Element 21475, the Object Class is Decimal Specification 21476, the Property is Decimal Value 21477, the Representation/Association Quality term is Decimal 21478, the Representation/Association term is Value 21479, the Type term is GDT 21480, and the Type Name term is DecimalValue 21481. The Cardinality between the GDT Property Value 21400 and the DecimalValue 21474 is zero or one 21482.

The LowerDecimalValue 21483 is a lower limit in a value interval of decimal values. The LowerDecimalValue 21483 is of type GDT: DecimalValue. For the LowerDecimalValue 21483, the Category is Element 21484, the Object Class is Decimal Specification 21485, the Property Quality term is Lower 21486, the Property is Decimal Value 21487, the Representation/Association Quality term is Decimal 21488, the Representation/Association term is Value 21489, the Type term is GDT 21490, and the Type Name term is DecimalValue

21491. The Cardinality between the GDT Property Value 21400 and the LowerDecimalValue 21483 is zero or one 21492.

The UpperDecimalValue 21493 is an upper limit in a value interval of decimal values. The UpperDecimalValue 21493 is of type GDT: DecimalValue. For the UpperDecimalValue 21493, the Category is Element 21494, the Object Class is Decimal Specification 21495, the Property Quality term is Upper 21496, the Property is Decimal Value 21497, the Representation/Association Quality term is Decimal 21498, the Representation/Association term is Value 21499, the Type term is GDT 21401, and the Type Name term is DecimalValue 21402*a*. The Cardinality between the GDT Property Value 21400 and the UpperDecimalValue 21493 is zero or one 21403*a*.

The FloatSpecification 21404*a* contains the specification of the floating point values. For the FloatSpecification 21404*a*, the Category is Element 21405*a*, the Object Class is Property Value 21406*a*, the Property is Float Specification 21407*a*, and the Representation/Association term is Details 21408*a*. The Cardinality between the GDT Property Value 21400 and the FloatSpecification 21404*a* is zero or one 21409*a*.

The FloatValue 21410*a* is a discrete floating point value. The FloatValue is type GDT: FloatValue. For the FloatValue 21410*a*, the Category is Element 21411*a*, the Object Class is Float Specification 21412*a*, the Property is FloatValue 21413*a*, the Representation/Association Quality term is Float 21414*a*, the Representation/Association term is Value 21415*a*, the Type term is GDT 21416*a*, and the Type Name term is FloatValue 21417*a*. The Cardinality between the GDT Property Value 21400 and the FloatValue 21410*a* is zero or one 21418*a*.

The LowerFloatValue 21419*a* is a lower limit in a value interval of floating point values. The LowerFloatValue 21419*a* is of type GDT: FloatValue. For the LowerFloatValue 21419*a*, the Category is Element 21420*a*, the Object Class is Float Specification 21421*a*, the Property Quality term is Lower 21422*a*, the Property is Float Value 21423*a*, the Representation/Association Quality term is Float 21424*a*, the Representation/Association term is Value 21425*a*, the Type term is GDT 21426*a*, and the Type Name term is FloatValue 21427*a*. The Cardinality between the GDT Property Value 21400 and the LowerFloatValue 21419*a* is zero or one 21428*a*.

The UpperFloatValue 21429*a* is an upper limit in a value interval of floating point values. The UpperFloatValue 21429*a* is of type GDT: FloatValue. For the UpperFloatValue 21429*a*, the Category is Element 21430*a*, the Object Class is Float Specification 21431*a*, the Property Quality term is Upper 21432*a*, the Property is Float Value 21433*a*, the Representation/Association Quality term is Float 21434*a*, the Representation/Association term is Value 21435*a*, the Type term is GDT 21436*a*, and the Type Name term is FloatValue 21437*a*. The Cardinality between the GDT Property Value 21400 and the UpperFloatValue 21429*a* is zero or one 21438*a*.

The IntegerSpecification 21439*a* contains the specification of integer values. For the IntegerSpecification 21439*a*, the Category is Element 21440*a*, the Object Class is Property Value 21441*a*, the Property is Integer Specification 21442*a*, and the Representation/Association term is Details 21443*a*. The Cardinality between the GDT Property Value 21400 and the IntegerSpecification 21439*a* is zero or one 21444*a*.

The IntegerValue 21445*a* is a discrete integer value. The IntegerValue 21445*a* is of type GDT: IntegerValue. For the IntegerValue 21445*a*, the Category is Element 21446*a*, the Object Class is Integer Specification 21447*a*, the Property is Integer Value 21448*a*, the Representation/Association Quality term is Integer 21449*a*, the Representation/Association term is Value 21450*a*, the Type term is GDT 21451*a*, and the Type Name term is IntegerValue 21452*a*. The Cardinality between the GDT Property Value 21400 and the IntegerValue 21445*a* is zero or one 21453*a*.

The LowerIntegerValue 21454*a* is a lower limit in a value interval of integer values. The LowerIntegerValue 21454*a* is of type GDT: IntegerValue. For the LowerIntegerValue 21454*a*, the Category is Element 21455*a*, the Object Class is Integer Specification 21456*a*, the Property Quality term is Lower 21457*a*, the Property is Integer Value 21458*a*, the Representation/Association Quality term is Integer 21459*a*, the Representation/Association term is Value 21460*a*, the Type term is GDT 21461*a*, and the Type Name term is IntegerValue 21462*a*. The Cardinality between the GDT Property Value 21400 and the LowerIntegerValue 21454*a* is zero or one 21463*a*.

The UpperIntegerValue 21464*a* is an upper limit in a value interval of integer values. The UpperIntegerValue 21464*a* is of type GDT: IntegerValue. For the UpperIntegerValue 21464*a*, the Category is Element 21465*a*, the Object Class is Integer Specification 21466*a*, the Property Quality term is Upper 21467*a*, the Property is Integer Value 21468*a*, the Representation/Association Quality term is Integer 21469*a*, the Representation/Association term is Value 21470*a*, the Type term is GDT 9971, and the Type Name term is IntegerValue 21472*a*. The Cardinality between the GDT Property Value 21400 and the UpperIntegerValue 21464*a* is zero or one 21473*a*.

The DateSpecification 21474*a* contains the specification of calendar days or date intervals. For the DateSpecification 21474*a*, the Category is Element 21475*a*, the Object Class is Property Value 21476*a*, the Property is Date Specification 21477*a*, and the Representation/Association term is Details 21478*a*. The Cardinality between the GDT Property Value 21400 and the DateSpecification 21474*a* is zero or one 21479*a*.

The Date 21480*a* is a calendar day. The Date 21480*a* is of type GDT: Date. For the Date 21480*a*, the Category is Element 21481*a*, the Object Class is Date Specification 21482*a*, the Representation/Association term is Date 21483*a*, the Type term is GDT 21484*a*, and the Type Name term is Date 21485*a*. The Cardinality between the GDT Property Value 21400 and the Date 21480*a* is zero or one 21486*a*.

The StartDate 21487*a* is a date that defines the start of a daily time interval. The StartDate 21487*a* is of type GDT: Date. For the StartDate 21487*a*, the Category is Element 21488*a*, the Object Class is Date Specification 21489*a*, the Property is Start 21490*a*, the Representation/Association term is Date 21491*a*, the Type term is GDT 21492*a*, and the Type Name term is Date 21493*a*. The Cardinality between the GDT Property Value 21400 and the StartDate 21487*a* is zero or one 21494*a*.

The EndDate 21495*a* is a date that defines the end of a daily time interval. The EndDate 21495*a* is of type GDT: Date. For the EndDate 21495*a*, the Category is Element 21496*a*, the Object Class is Date Specification 21497*a*, the Property is End 21498*a*, the Representation/Association term is Date 21499*a*, the Type term is GDT 21401*b*, and the Type Name term is Date 21402*b*. The Cardinality between the GDT Property Value 21400 and the EndDate 21495*a* is zero or one 21403*b*.

The TimeSpecification 21404*b* contains the specification, accurate to the second, of a particular time or time interval (time span). For the TimeSpecification 21404*b*, the Category is Element 21405b, the Object Class is PropertyValue 21406b, the Property is Time Specification 21407b, and the Representation/Association term is Details 21408b. The Cardinality between the GDT Property Value 21400 and the TimeSpecification 21404b is zero or one 21409b.

The Time 21410b is a particular time, accurate to the second. The Time 21410b is of type GDT: Time. For the Time 21410b, the Category is Element 21411b, the Object Class is Time Specification 21412b, the Representation/Association term is Time 21413b, the Type term is GTD 21414b, and the Type Name term is Time 21415b. The Cardinality between the GDT Property Value 21400 and the Time 21410b is zero or one 21416b.

The StartTime 21417b is a time that defines the start of a particular time interval, accurate to the second. The StartTime 21417b is of type GDT: Time. For the StartTime 21417b, the Category is Element 21418b, the Object Class is Time Specification 21419b, the Property is Start 21420b, the Representation/Association term is Time 21421b, the Type term is GDT 21422b, and the Type Name term is Time 21423b. The Cardinality between the GDT Property Value 21400 and the StartTime 21417b is zero and one 21424b.

The EndTime 21425b is a time that defines the end of a particular time interval, accurate to the second. The EndTime 21425b is of type GDT: Time. For the EndTime 21425b, the Category is Element 21426b, the Object Class is Time Specification 21427b, the Property is End 21428b, the Representation/Association term is Time 21429b, the Type term is GDT 21430b, and the Type Name term is Time 21431b. The Cardinality between the GDT Property Value 21400 and the EndTime 21425b is zero or one 21432b.

The DateTimeSpecification 21433b contains the specification of time stamps (date and time), accurate to the second, or the specification of a timeframe, accurate to the second. For the DateTimeSpecification 21433b, the Category is Element 21434b, the Object Class is Property Value 21435b, the Property is Date Time Specification 21436b, and the Representation/Association term is Details 21437. The Cardinality between the GDT Property Value 21400 and the DateTimeSpecification 21433b is zero or one 21438b.

The DateTime 21439b is a time stamp (date and time), accurate to the second. The DateTime 21439b is of type GDT: DateTime. For the DateTime 21439b, the Category is Element 21440b, the Object Class is Date Time Specification 21441b, the Representation/Association term is Date Time 21442b, the Type term is GDT 21443b, and the Type Name term is DateTime 21444b. The Cardinality between the GDT Property Value 21400 and the DateTime 21439b is zero or one 21445b.

The StartDateTime 21446b is a time stamp that defines the start of a time interval or timeframe. The StartDateTime 21446b is of type GDT: DateTime. For the StartDateTime 21446b, the Category is Element 21447b, the Object Class is Date Time Specification 21448b, the Property is Start 21449b, the Representation/Association term is Date Time 21450b, the Type term is GDT 21451b, and the Type Name is DateTime 21452b. The Cardinality between the GDT Property Value 21400 and the StartDateTime 21446b is zero or one 21453b.

The EndDateTime 21454b is a time stamp that defines the end of a time interval or timeframe. The EndDateTime 21454b is of type GDT: DateTime. For the EndDateTime 21454b, the Category is Element 21455b, the Object Class is Date Time Specification 21456b, the Property is End 21457b, the Representation/Association term is Date Time 21458b, the Type term is GDT 21459b, and the Type Name term is DateTime 21460b. The Cardinality between the GDT Property Value 21400 and the EndDateTime 21454b is zero or one 21461b.

The NameSpecification 21462b contains the specification of qualitative and human-readable values. For the NameSpecification 21462b, the Category is Element 21463b, the Object Class is Property Value 21464b, the Property is Name Specification 21465b, and the Representation/Association term is Details 21466b. The Cardinality between the GDT Property Value 21400 and the NameSpecification 21462b is zero or one 21467b.

The Name 21468b is an individual qualitative and human-readable value. The Name 21468b is of type GDT: Name. For the Name 21468b, the Category is Element 21469b, the Object Class is Name Specification 21470b, the Property is Name 21471b, the Representation/Association term is Name 21472b, the Type term is GDT 21473b, and the Type Name term is Name 21474b. The Cardinality between the GDT Property Value 21400 and the Name 21468b is zero or one 21475b.

The IndicatorSpecification 21476b contains the specification of binary logical values (such as, yes and no). For the IndicatorSpecification 21476b, the Category is Element 21477b, the Object Class is Property Value 21478b, the Property is Indicator Specification 21479b, and the Representation/Association term is Details 21480b. The Cardinality between the GDT Property Value 21400 and the IndicatorSpecification 21476b is zero or one 21481b.

The Indicator 21482b is an individual binary logical value. The Indicator 21482b is of type GDT: Indicator. For the Indicator 21482b, the Category is Element 21483b, the Object Class is Indicator Specification 21484b, the Property is Indicator 21485b, the Representation/Association term is Indicator 21486b, the Type term is GDT 21487b, and the Type Name term is Indicator 21488b. The Cardinality between the GDT Property Value 21400 and the Indicator 21482b is zero or one 21489b.

The IntervalTypeCode 21490b is a coded representation for typing intervals. The IntervalTypeCode 21490b is of type GDT: IntervalTypeCode. For the IntervalTypeCode 21490b, the Category is Element 21491b, the Object Class is Property Value 21492b, the Property is Interval Type 21493b, the Representation/Association term is Code 21494b, the Type term is GDT 21495b, and the Type Name term is IntervalTypeCode 21496b. The Cardinality between the GDT Property Value 21400 and the IntervalTypeCode 21490b is zero or one 21497b.

The PreferredName 21498b is a name of the value or value interval, if one exists. The PreferredName 21498b is of type GDT: Name. For the PreferredName 21498b, the Category is Element 21499b, the Object Class is Property Value 21401c, the Property is Preferred Name 21402c, the Representation/Association term is Name 21403c, the Type term is GDT 21404c, and the Type Name is Name 21405c. The Cardinality between the Property Value 21400 and the PreferredName 21498b is from zero to n 21406c.

The SynonymousName 21407c is a synonymous term for the PreferredName. The SynonymousName 21407c is of type GDT: Name. For the SynonymousName 21407c, the Category is Element 21408c, the Object Class is Property Value 21409c, the Property is Synonymous Name 21410c, the Representation/Association term is Name 21411c, the Type term is GDT 21412c, and the Type Name term is Name 21413c. The Cardinality between the Property Value 21400 and the SynonymousName 21407c is from zero to n 21414c.

The AbbreviationName 21415c is an abbreviation of the PreferredName. The AbbreviationName 21415c is of type GDT: Name. For the AbbreviationName 21415*c*, the Category is Element 21416*c*, the Object Class is Property Value 21417*c*, the Property is Abbreviation Name 21418*c*, the Representation/Association term is Name 21419*c*, the Type term is GDT 21420*c*, and the Type Name term is Name 21421*c*. The Cardinality between the Property Value 21400 and the AbbreviationName 21415*c* is from zero to n 21422*c*.

The IconAttachment 21423*c* is a graphic that illustrates the meaning of the value or value interval. The IconAttachment 21423*c* is of type GDT: Attachment. For the IconAttachment 21423*c*, the Category is Element 21424*c*, the Object Class is Property Value 21425*c*, the Property is Icon 21426*c*, the Representation/Association term is Attachment 21427*c*, the Type term is GDT 21428*c*, and the Type Name term is Attachment 21429*c*. The Cardinality between the Property Value 21400 and the IconAttachment 21423*c* is zero or one 21430*c*.

The AttachmentWebAddress 21431*c* is a reference to a WebAddress on the basis of which the value was defined. This attachment could be an explanatory drawing or a colored pattern. The AttachmentWebAddress 21431*c* is of type GDT: WebAddress. For the AttachmentWebAddress 21431*c*, the Category is Element 21432*c*, the Object Class is Property Value 21433*c*, the Property is Attachment 21434*c*, the Representation/Association term is Web Address, the Type term is GDT 21436*c*, and the Type Name term is WebAddress 21437*c*. The Cardinality between the Property Value 21400 and the AttachmentWebAddress 21431*c* is zero or one 21438*c*.

Illustrative integrity conditions for 21400 are as follows. When AmountSpecification, QuantitySpecification, DecimalSpecification, FloatSpecification, IntegerSpecification, DateSpecification, TimeSpecification, or DateTimeSpecification are used, single values may be specified by Amount, Measure, Quantity, Value, Date, Time, or DateTime. Single values and intervals cannot be specified at the same time. When LowerAmount or UpperAmount, LowerQuantity or UpperQuantity, LowerDecimal or UpperDecimal, LowerFloat or UpperFloat, LowerInteger or UpperInteger, StartDate or EndDate, StartTime or EndTime, or StartDateTime or EndDateTime are used, the respective complementary Upper or Lower field or Start or End field may be filled. The PreferredName and AbbreviationName fields may be filled once per language. IntervalTypeCode may be specified when the value is an interval (also <, <=, and the like). See for example, ISO13584/42.

Examples of AmountSpecification include defining a price interval, either a LowerAmount or UpperAmount for a product.

Examples of QuantitySpecification include valuating properties whose data types are in units, e.g., 5 pieces, 7 kg.

Examples of DecimalSpecification/FloatSpecification include valuating nondimensional, numeric properties e.g., ratios, calculation indexes, key figures, and so on.

Examples of IntegerSpecification include valuating nondimensional, integer properties, e.g., codes, indexes, and sequential numbers.

Examples of DateSpecification include an expiration date or best-before date, a date of manufacture, a filling date, a packaging date, a release date, a lock date, an order date, a delivery date, a storage period, and the like.

Examples of TimeSpecification/DateTimeSpecification include time stamp, accurate to the second, for specifying a filling time, production time, inspection time, and the like.

Examples of NameSpecification include red, green, and the like, for the color of the property.

Examples of Indicator Specification include properties that can have one of two statuses as their valuation, e.g., yes/no, on/off.

(xxxxxxx) PurchaseOrderOrderedIndicator

A GDT PurchaseOrderOrderedIndicator 21500 indicates whether a purchase order has been sent to a vendor or not. An example is: (In the context of the PurchaseOrder)

<OrderedIndicator>true</OrderedIndicator>.

The structure of GDT Purchase Order Ordered Indicator 21500 is depicted in FIG. 215. For the GDT Purchase Order Ordered Indicator 21500, the Object Class is Purchase Order 21502, the Property is Ordered Indicator 21504, the Representation/Association term is Indicator 21506, and the Type term is CCT: Indicator 21508.

The PurchaseOrderOrderedIndicator 21500 can have the following values, either 1) true, meaning that the purchase order has been sent to a vendor; or 2) false, meaning that the purchase order has not yet been sent to a vendor.

For value range, see CCT Indicator.

The PurchaseOrderOrderedIndicator 21500 indicates whether or not a purchase order has been sent to a vendor. This makes it possible to distinguish between purchase orders that have already been sent to a vendor and purchase orders that are still being processed.

(yyyyyyy) PurchasingGroupID

A GDT PurchasingGroupID 21600 is a unique identifier for a group of buyers who are responsible for certain purchasing activities. An example is: <PurchasingGroupID>1234567</PurchasingGroupID>.

The structure of GDT Purchasing Group ID 21600 is depicted in FIG. 216. For the GDT Purchasing Group ID 21600, the Object Class is Purchasing Group 21602, the Property is Identification 21604, the Representation/Association term is Identifier 21606, the Type term is CCT 21608, the Type Name term is Identifier 21610, and the Length is from one to twenty 21612.

An in-house purchasing group may be responsible for procuring a product or class of products. Externally, the group acts as a contact for vendors. The PurchasingGroupID 21600 can be a maximum of 20 alphanumerical characters long. For the external representation, role-based IDs (e.g., BuyerPurchasingGroupID) based on the CCT: Identifier can be used without additional attributes—they are unique in conjunction with the identification of the party described by the role (e.g., BuyerID). The PurchasingGroupID 21600 is used externally in cooperative business processes, in particular in the vendor-managed inventory (VMI) business process, to uniquely identify the purchasing group of the party involved. In this scenario, the buyer, such as a retail company, sends purchase order numbers to the vendor, together with its PurchasingGroupID (i.e., the "BuyerPurchasingGroupID," from the vendor's point of view) so that the purchase orders created by the vendor can be generated depending on the buyer's purchasing group identification.

(zzzzzzz) Quantity

A GDT Quantity 21700 is the non-monetary numerical specification of an amount in a unit of measurement. An example is: <OrderedQuantity unitCode="CT">100</OrderedQuantity>(CT =Carton).

The structure of GDT Quantity 21700 is depicted in FIG. 217. A quantity is the result of the numerical comparison of the number, amount, or size of a given item or attribute and a standard number, amount, or size. Depending on the item or attribute to be qualified and the business context, the comparison can be made by physically measuring or counting. Positive and negative entries are possible using the built-in data type "xsd: decimal." Negative entries may be prefixed with a negative sign ("–"). However, positive entries do not have to be prefixed with a positive sign ("+"). The GDT Quantity 21700 includes attribute unitCode 21710. For the GDT Quantity 21700, the Representation/Association term is Quantity 21702, the Type term is xsd 21704, the Type Name term is Decimal 21706, and the Length is thirteen six 21708. For the unitCode 21710, the Category is Attribute 21712, the Object Class is Quantity 21714, the Property is Unit 21716, the Representation/Association term is Coe 21718, the Type term is xsd 21720, the Type Name term is Token 21722, and the Length is from one to three 21724. The Cardinality between the GDT Quantity 21700 and the unitCode 21710 is one 21726.

The permitted variations of the "unitCode" attribute are described in more detail in the "MeasureUnitCode" GDT.

Quantity 21700 may be used to specify the amount of a (manufactured, ordered, transported, delivered, and the like) product. In each given context, a decision may be made as to whether an amount (Quantity) or a physical measurement (Measure) is being specified. For this purpose, the physical units (PhysicalMeasureUnits) used in Measure form a subset of the measurement units (MeasureUnits) used in Quantity.

MeasureUnitCode helps to determine the "unitCode 21710" attribute.

(aaaaaaaa) QuantityDiscrepancyCode

The GDT QuantityDiscrepancyCode 21800 is a coded representation of the cause of or reason for a quantity discrepancy. An example is:

<QuantityDiscrepancyCode>AE</QuantityDiscrepancyCode>.

The structure of GDT QuantityDiscrepancyCode 21800 is depicted in FIG. 218. For the GDT QuantityDiscrepancyCode 21800, the Object Class is Quantity 21802, the Property is Discrepancy 21804, the Representation/Association term is Code 21806, the Type term is CCT 21808, the Type Name term is Code 21810, and the Length is from one to four 21812. The GDT QuantityDiscrepancyCode 21800 may be a restricted GDT.

Illustrative GDT QuantityDiscrepancyCode 21800 values in the "goods receipt process" are as follows: 1) AC, which represents an over delivery (on receipt of the goods, a surplus quantity was established in relation to the previously notified delivery); 2) AE, which represents goods delivered but not notified (on receipt of the goods, quantities of goods were established that were delivered without prior notification in the form of a shipping notification); 3) AF, which represents delivered goods are damaged (on receipt of the goods, damaged quantities were found); and 4) AG, which represents goods delivered too late (on receipt of the goods, quantities of goods were established that were already notified in an earlier delivery).

The GDT QuantityDiscrepancyCode 21800 refers to UN/EDIFACT 4221 (Discrepancy nature identification code) and contains the codes from this list that are relevant for quantity discrepancies. The GDT QuantityDiscrepancyCode 21800 describes the cause of a quantity discrepancy in a delivery that was established in the goods receipt process (generally with regard to a location product.) This coded information may be returned to the sender of the goods by means of a goods receipt notification. The codes for indicating under deliveries of goods and goods that are delivered too late could not be found in the current UN/EDIFACT code list. These two codes may still need to be requested and added as list values.

(bbbbbbbb) QuantityTimeSeries

A CDT QuantityTimeSeries 21900 is time series information that consists of items that each contain a period with a start time and end time and a period-based quantity. An example is:

```
<QuantityTimeSeries>
    <Item>
        <ValidityPeriod>
            <StartDateTime>2002-04-
19T15:00:00Z</StartDateTime>
            <EndDateTime>2002-04-
19T17:00:00Z</EndDateTime>
        </ValidityPeriod>
        <Quantity unitCode="PC" >150</Quantity>
    </Item>
</QuantityTimeSeries>.
```

The structure of GDT Quantity-TimeSeries 21900 is depicted in FIG. 219. The GDT Quantity-TimeSeries 21900 includes element Item 21914. For the GDT Quantity-TimeSeries 21900, the Object Class Quality term is Quantity 21902, the Object Class is TimeSeries 21904, the Representation/Association term is Details 21906, the Type term is GDT 21908, and the Type Name term is TimeSeries 21910. The GDT Quantity-TimeSeries 21900 may be a restricted GDT.

The QuantityTimeSeriesItem 21914 is an item in a time series and can be repeated as often as required. For the Item 21914, the Category is Element 21916, the Object Class is TimeSeries 21918, the Property is Item 21920, and the Representation/Association term is Details 21922. The Cardinality between the GDT Quantity-TimeSeries 21900 and the Item 21914 is from one to n 21924.

The ValidityPeriod 21926 describes the validity period of the time series item with a start time stamp and an end time stamp. For the Validity Period 21926, the Category is Element 21928, the Object Class is TimeSeries 21930, the Property is ValidityPeriod 21932, the Representation/Association term is Details 21934, the Type term is GDT 21936, and the Type Name term is DateTimePeriod 21938. The Cardinality between the GDT Quantity-TimeSeries 21900 and the Item 21914 Validity Period 21926 is one 21940.

The Quantity 21942 describes the quantity connected with the time series item. For the Quantity 21942, the Category is Element 21944, the Object Class is TimeSeries 21946, the Property is Quantity 21948, the Representation/Association term is Quantity 21950, the Type term is GDT 21952, and the Type Name term is Quantity 21954. The Cardinality between the GDT Quantity-TimeSeries 21900 and the Quantity 21942 is one 21956.

The FixedIndicator 21958 describes whether the corresponding item is blocked for changes or not. For the FixedIndicator 21958, the Category is Element 21960, the Object Class is TimeSeries 21962, the Property is FixedIndicator 21964, the Representation/Association term is Indicator 21966, the Type term is GDT 21968, and the Type Name term is FixedIndicator 21970. The Cardinality between the GDT Quantity-TimeSeries 21900 and the Fixed-Indicator 21958 is zero or one 21972.

CDT QuantityTimeSeries 21900 is used as a generic data type that can have various specifications in an interface depending on the context category used, e.g., "Sales," to describe sales quantities; "Consumption," to describe consumption quantities, and the like.

(cccccccc) QuantityTolerance

A GDT QuantityTolerance 22000 is the tolerated difference between a requested and an actual quantity (e.g., a delivery quantity) as a percentage. An example is:

```
<QuantityTolerance>
    <OverPercent>33.0</OverPercent>
    <UnderPercent>1.0</UnderPercent>
</QuantityTolerance>.
```

The structure of GDT QuantityTolerance 22000 is depicted in FIG. 220. The GDT QuantityTolerance 22000 includes elements OverPercent 22008, OverPercentUnlimitedIndicator 22024, and UnderPercent 22040. For the GDT QuantityTolerance 22000, the Object Class is QuantityTolerance 22002, the Property is Details 22004, and the Representation/Association term is Details 22006. GDT QuantityTolerance 22000 comprises the three elements OverPercent 22008 and UnderPercent 22040 from "CCT: Numeric" and OverPercentUnlimitedIndicator from the CCT: Indicator.

For the OverPercent 22008, the specification of a value x in this field means that for an ordered quantity of Y, up to x % of Y are accepted additionally. Therefore, the specification in this field is to be understood as a percentually relative specification. The specification is made as a decimal with a total of 4 digits, including one position after the decimal point, without plus/minus sign (e.g., 15.5). A specification of 0 in OverPercent 22008 means that the ordered quantity may not be exceeded. If the OverPercent 22008 and also the OverPercentUnlimitedIndicator 22024 are not specified, this also means that the ordered quantity may not be exceeded. For example, for an ordered quantity of 50 pieces and an OverPercent 22008 entry equal to 10, up to 5 more pieces would be accepted, thus altogether a maximum quantity of 55 pieces. For the OverPercent 22008, the Category is Element 22010, the Object Class is QuantityTolerance 22012, the Property is Over 22014, the Representation/Association term is Percent 22016, the Type term is GDT 22018, and the Type Name term is GDT: Percent 22020. The Cardinality between the GDT QuantityTolerance 22000 and the OverPercent 22008 is zero or one 22022.

For the OverPercentUnlimitedIndicator 22024, making an entry in this field means that no limitations may be made regarding the degree of fulfillment upwards. The OverPercentUnlimitedIndicator 22024 applies to the upper limit. The OverPercent 22008 and the OverPercentUnlimitedIndicator 22024 cannot be specified at the same time; however, the UnderPercent 22040 and the OverPercentUnlimitedIndicator 22024 can be set simultaneously. For the OverPercentUnlimitedIndicator 22024, the Category is Element 22026, the Object Class is QuantityTolerance 22028, the Property is OverPercentUnlimited 22030, the Representation/Association term is Indicator 22032, the Type term is GDT 22034, and the Type Name term is GDT: ValueUnlimitedIndicator 22036. The Cardinality between the GDT QuantityTolerance 22000 and the OverPercentUnlimitedIndicator 22024 is zero or one 22038.

If no OverPercentUnlimitedIndicator 22024 is set, the default value may be "false." The specification is made as a Boolean entry of length 1. The following illustrative values are allowed: 1) true, meaning that any overrun is accepted; and 2) false, meaning that overruns are not accepted.

For the UnderPercent 22040, the entry of a value x in this field means that for an ordered quantity of Y, up to x % of Y less are accepted. Therefore, the specification in this field is to be understood as a percentually relative specification. The specification is made as a decimal with a total of 4 digits, including one position after the decimal point, without plus/minus sign (e.g., 15.5). A specification of 0 in UnderPercent 22040 means that the ordered quantity may not be short. If the UnderPercent 22040 is not entered, this also means that the ordered quantity may not be short. For example: For an ordered quantity of 50 pieces and an UnderPercent 22040 entry=10, up to 5 pieces less would be accepted, so altogether at least 45 pieces. Using a separate entry of OverPercent 22008 and UnderPercent 22040, it is possible, e.g., to accept too high a quantity as this could perhaps be covered by a particular stock, but to reject the delivery of too small a quantity, e.g., to avoid a production standstill. For the UnderPercent 22040, the Category is Element 22042, the Object Class is QuantityTolerance 22044, the Property is Under 22046, the Representation/Association term is Percent 22048, the Type term is GDT 22050, and the Type Name term is GDT: Percent 22052. The Cardinality between the GDT QuantityTolerance 22000 and the UnderPercent 22040 is zero or one 22054.

The fields OverPercent and OverPercentUnlimitedIndicator are mutually exclusive, i.e., entering "true" in the OverPercentUnlimitedIndicator and, at the same time, filling the OverPercent does not make sense.

The QuantityTolerance specifies (as a percentage) the difference to be/that can be tolerated between a required or requested quantity and an actual quantity (delivery quantity). The specification is made separately for an over quantity or shortfall.

See, for example, UN/EDIFACT: Segment QVR (QUANTITY VARIANCES)—Data Elements 6064 (Quantity variance value): n . . . 15 (up to 15 numeric characters), and R/3: DEC 3.1 (calculation or amount field with comma and plus/minus sign).

(dddddddd) Recurrence

A GDT Recurrence 22100 is a representation for the repeated occurrence of an event within a time period or within a timeframe. There may be four types of recurrence: 1) a number of recurrences within a time period; 2) the recurrences each take place after a determined period duration within a time period; 3) a number of recurrences within a timeframe; and 4) the recurrences each take place after a determined period duration within a timeframe.

The structure of GDT Recurrence 22100 is depicted in FIG. 221. The GDT Recurrence 22100 includes Duration 22106 and Value 22120. For GDT Recurrence 22100, the Object Class is Recurrence 22102 and the Representation/Association term is Details 22104.

A timeframe (duration) is a time without reference to a specific starting point or end point. Examples of a time frame include: "Day," "Week," or "Year." A time period (period) is a concrete time in terms of a starting point and/or an end point. Examples of a time period include: "Jan. 10, 2003 to Jan. 20, 2003" or "40 days starting on Jan. 2, 2004." The 4 cases listed in the definition of 22100 differ in terms of the type of basic range that the recurrences refer to (time period or timeframe), and the type in which the recurrences are specified (fixed number or specification of a period duration for which a recurrence occurs).

In summary, the Time period has a Fixed number of Case a) and a Period duration of Case b). The Timeframe has a Fixed number of Case c) and a Period duration of Case d). See the table below.

| | Fixed number | Period duration |
|---|---|---|
| Time period | Case a) | Case b) |
| Timeframe | Case c) | Case d) |

Examples of the 4 types of Recurrence 22100 are as follows:

Type 1: "4 recurrences between Jul. 1, 2003 and Oct. 15, 2003."

Type 2: "weekly recurrences between 12.4.2004 and 6.6.2004."

Type 3: "2 recurrences in one month," "8 recurrences in 50 days."

Type 4: "weekly recurrences in one month," "daily recurrences in 50 days."

The timeframe as "abstract" time specification should not be confused with time period as the "concrete" time specification. The number of recurrences in a timeframe is valid for each "occurrence" of this timeframe. For example, after one week, the same number of recurrences also takes place in the following week.

Since a time period is a concrete time and may not occur more than once, the number of recurrences relates to this time period. A recurrence does not have to be regular. The Recurrence 22100 covers both regular and irregular recurrences.

Below is an example (instance):

```
<Recurrence>
    <Duration>P7D</Duration>
    <Value>1</Value>
</Recurrence>
```

The structure of GDT Recurrence 22100 is depicted in FIG. 221. The GDT first supports type 3 from the types of recurrence specified in the definition. The GDT Recurrence 22100 includes Duration 22106 and Value 22120. For GDT Recurrence 22100, the Object Class is Recurrence 22102 and the Representation/Association term is Details 22104.

The Duration 22106 specifies the timeframe within which the specified number of recurrences takes place. For the Duration 22106, the Object Class is Recurrence 22108, the Property is Duration 22110, the Representation/Association term is Duration 22112, the Type term is GDT 22114, and the Type Name term is Duration 22116. The Cardinality between the GDT Recurrence 22100 and the Duration 22106 is one 22118.

The Value 22120 specifies the number of recurrences (in terms of the timeframe). For the Value 22120, the Object Class is Recurrence 22122, the Property is Value 22124, the Representation/Association term is Value 22126, the Type term is GDT 22128, the Type Name is IntegerValue 22130, and the Length is from one to three 22132. The Cardinality between the GDT Recurrence 22100 and the Value 22120 is one 22134.

The timeframe, or duration, may not be a timeframe in the sense of a validity duration.

(eeeeeeee) RegionCode

The GDT RegionCode 22200 is a coded representation of logically or physically linked geographical or political regions that have one or more attributes in common. An example is: <RegionCode>BW</RegionCode>.

The structure of GDT RegionCode 22200 is depicted in FIG. 222. The default setting of RegionCode is the list of Country Subdivision Codes according to ISO 3166-2. If the region is not available within ISO 3166-2, the code list from the relevant country or the issuing agency should be used instead. The GDT RegionCode 22200 includes attributes listID 22212, listVersionID 22230, listAgencyID 22248, listAgencySchemeID 22266, and listAgencySchemeAgencyID 22284. For the GDT RegionCode 22200, the Object Class is Region 22202, the Property is Identification 22204, the Representation/Association term is Code 22206, the Type term is CCT 22208, and the Type Name term is Code 22210.

The listID 22212 identifies a list of the codes that belong together. The listID 22212 is unique within the agency that manages this code list. For the listID 22212, the Category is Attribute 22214, the Object Class is CodeList 22216, the Property is Identification 22218, the Representation/Association term is Identifier 22220, the Type term is xsd 22222, the Type Name term is Token 22224, and the Length is from one to sixty 22226. The Cardinality between the GDT RegionCode 22200 and the listID 22212 is zero or one 22228.

The listVersionID 22230 identifies the version of a code list. For the listVersionID 22230, the Category is Attribute 22232, the Object Class is CodeList 22234, the Property is Version 22236, the Representation/Association term is Identifier 22238, the Type term is xsd 22240, the Type Name term is Token 22242, and the Length is from one to fifteen 22244. The Cardinality between the GDT RegionCode 22200 and the listVersionID 22230 is zero or one 22246.

The listAgencyID 22248 identifies the agency that manages the code list. The agencies from DE 3055 may be used as the default, but in a variation the roles defined in DE 3055 may not be used. For the listAgencyID 22248, the Category is Attribute 22250, the Object Class is CodeListAgency 22252, the Property is Identification 22254, the Representation/Association term is Identifier 22256, the Type term is xsd 22258, the Type Name term is Token 22260, and the Length is from one to sixty 22262. The Cardinality between the GDT RegionCode 22200 and the listAgencyID 22248 is zero or one 22264.

The listAgencySchemeID 22266 identifies the identification scheme that represents the context for agency identification. For the listAgencySchemeID 22266, the Category is Attribute 22268, the Object Class is CodeListAgency 22270, the Property is Scheme 22272, the Representation/Association term is Identifier 22274, the Type term is xsd 22276, the Type Name term is Token 22278, and the Length is from one to sixty 22280. The Cardinality between the GDT RegionCode 22200 and the listAgencySchemeID 22266 is zero or one 22282.

The listAgencySchemeAgencyID 22284 identifies the agency that manages the listAgencySchemeID. This attribute can contain values from DE 3055 (excluding roles). For the listAgencySchemeAgencyID 22284, the Category is Attribute 22286, the Object Class is CodeListAgency 22288, the Property is SchemeAgency 22290, the Representation/Association term is Identifier 22292, the Type term is xsd 22294, the Type Name term is Token 22296, and the Length is three 22298. The Cardinality between the GDT RegionCode 22200 and the listAgencySchemeAgencyID 22284 is zero or one 22201.

Examples of the RegionCode are: structure regions (e.g., Munich metropolitan area); program regions (e.g., promotion programs), settlements, administrative regions (e.g., federal states), grid squares, economic regions, and the like.

The RegionCode may be restricted to ISO 3166-2. However, to ensure that further code lists can be used, the optional attributes "listID 22212," "listVersionID 22230," "listAgency 22248," "listAgencySchemeID 22266," and "listAgency- SchemeAgencyID 22284" are also included in that illustrative case. For more details, see the "SAP Core Component Types" specification document.

(ffffffff) RequiredIndicator

A GDT RequiredIndicator 22300 indicates whether something is required or not. The word "something" generally stands for specific procedures, operations or events. An example is: <SeparatorSignRequiredIndicator>true</SeparatorSignRequiredIndicator>.

The structure of GDT RequiredIndicator 22300 is depicted in FIG. 223.

The RequiredIndicator can have the following values, either 1) true, meaning that something is required; or 2) false, meaning that something is not required. (For value range, see CCT: Indicator.)

For each GDT RequiredIndicator 22300, what is required or not required is specified. This is reflected in an appropriate name prefix. For example, a SeparatorSignRequiredIndicator indicates whether a separator is required or not. The GDT RequiredIndicator 22300 can be used, e.g., to indicate whether prices always have to be specified with a thousands separator. In the context of an interface, the business significance of "what is required" may be. described for the GDT RequiredIndicator 22300 in addition to its name prefix (see Integrity Conditions).

(gggggggg) RevisionQuantityTimeSeries

A GDT RevisionQuantityTimeSeries 22400 is revised time series information that consists of items that each contain a period with a start time and end time, a period-based quantity, and the reason for the changes. An example or instance is:

```
<RevisionQuantityTimeSeries>
    <Item>
        <ValidityPeriod>
            <StartDateTime>2002-04-
19T15:00:00Z</StartDateTime>
            <EndDateTime>2002-04-
19T17:00:00Z</EndDateTime>
            <ValidityPeriod>
            <Quantity unitCode="PC" >150</Quantity>
  <AdjustmentReasonCode>Cancelled_Promotion</
  AdjustmentReasonCode>
    <Item>
</RevisionQuantityTimeSeries>.
```

The structure of GDT RevisionQuantityTimeSeries 22400 is depicted in FIG. 224. The GDT RevisionQuantity-TimeSeries 22400 includes elements Item 22414, Validity Period 22426, StartDateTime 22442, EndDateTime 22458, Quantity 22474, Fixed-Indicator 22490, Adjustment-ReasonCode 22407, and Note 22423. For the GDT Revision-QuantityTimeSeries 22400, Object Class Quality term is RevisionQuantity 22402, the Object Class is TimeSeries 22404, the Representation/Association term is Details 22406, the Type term is GDT 22408, and the Type Name term is TimeSeries 22410. The GDT RevisionQuantityTimeSeries 22400 may be a restricted GDT.

RevisionQuantityTimeSeriesItem 22414 is an item in a time series and can be repeated as often as required. For the Item 22414, the Category is Element 22416, the Object Class is TimeSeries 22418, the Property is Item 22420, and the Representation/Association term is Details 22422. The Cardinality between the GDT RevisionQuantityTimeSeries 22400 and the Item 22414 is from one to n 22424.

ValidityPeriod 22426 describes the validity period of the time series item. For the Validity Period 22426, the Category is Element 22428, the Object Class is TimeSeries 22430, the Property is ValidityPeriod 22432, the Representation/Association term is Details 22434, the Type term is GDT 22436, and the Type Name term is DateTimePeriod 22438. The Cardinality between the GDT RevisionQuantityTimeSeries 22400 and the Validity Period 22426 is one 22440. For the StartDateTime 22442, the Category is Element 22444, the Object Class is TimeSeries 22446, the Property is ValidityPeriodStart 22448, the Representation/Association term is DateTime 22450, the Type term is GDT 22452, and the Type Name term is DateTime 22454. The Cardinality between the GDT RevisionQuantityTimeSeries 22400 and the StartDateTime 22442 is one 22456. For the EndDateTime 22458, the Category is Element 22460, the Object Class is TimeSeries 22462, the Property is ValidityPeriodEnd 22464, the Representation/Association term is DateTime 22466, the Type term is GDT 22468, and the Type Name term is DateTime 22470. The Cardinality between the GDT RevisionQuantity-TimeSeries 22400 and the EndDateTime 22458 is one 22472.

Quantity 22474 describes the quantity connected with the time series item. For the Quantity 22474, the Category is Element 22476, the Object Class is TimeSeries 22478, the Property is Quantity 22480, the Representation/Association term is Quantity 22482, the Type term is GDT 22484, and the Type Name term is Quantity 22486. The Cardinality between the GDT RevisionQuantityTimeSeries 22400 and the Quantity 22474 is one 22488.

FixedIndicator 22490 indicates whether the corresponding item is blocked for changes or not. For the Fixed-Indicator 22490, the Category is Element 22492, the Object Class is TimeSeries 22494, the Property is FixedIndicator 22496, the Representation/Association term is Indicator 22498, the Type term is GDT 22401, and the Type Name term is FixedIndicator 22403. The Cardinality between the GDT RevisionQuantityTimeSeries 22400 and the Fixed-Indicator 22490 is zero or one 22405.

AdjustmentReasonCode 22407 describes the reason for a change to the item, if there is one. For the Adjustment-ReasonCode 22407, the Category is Element 22409, the Object Class is TimeSeries 22411, the Property is AdjustmentReason 22413, the Representation/Association term is Code 22415, the Type term is GDT 22415, the Type Name term is AdjustmentReasonCode 22419. The Cardinality between the GDT RevisionQuantityTimeSeries 22400 and the Adjustment-ReasonCode 22407 is zero or one 22421.

For the Note 22423, the Category is Element 22425, the Object Class is TimeSeries 22427, the Property is Note 22429, the Representation/Association term is Note 22431, the Type term is GDT 22433, the Type Name term is Note 22435. The Cardinality between the GDT RevisionQuantity-TimeSeries 22400 and the Note 22423 is zero or one 22437.

RevisionQuantityTimeSeries is used for the revision of a QuantityTimeSeries or of a RevisionQuantityTimeSeries itself. In an interface, the data type can have various specifications, depending on the context category used, e.g., "Sales," to describe sales quantities; "Consumption," to describe consumption quantities, and the like.

(hhhhhhhh) ScaleAxisIntervalBoundaryTypeCode

The GDT ScaleAxisIntervalBoundaryTypeCode 22500 is a coded representation of the typing of the discrete values in a scale axis as interval boundaries. An example is: <ScaleAxisIntervalBoundaryTypeCode>2</ScaleAxisIntervalBoundaryTypeCode>.

The structure of GDT Scale Axis Interval Boundary Type Code 22500 is depicted in FIG. 225. For the GDT Scale Axis Interval Boundary Type Code 22500, the Object Class is Scale Axis 22502, the Property is Interval Boundary Type Code 22504, the Representation/Association term is Code 22506, the Type term is CCT 22508, the Type Name term is Code 22510, and the Length is one 22512. The GDT Scale Axis Interval Boundary Type Code 22500 may be a restricted GDT.

An element of type GDT ScaleAxisIntervalBoundaryTypeCode 22500 can have the following illustrative values:

1) The value 1 represents the "lower boundary of an interval" from the current scale axis value to the next highest scale axis value, but excluding the next higher scale axis value; and 2) The value 2 represents the "upper boundary of an interval" to the current scale axis value from the next lowest scale axis value, but excluding the next lower scale axis value.

The scale axis values of a scale may be of the same GDT ScaleAxisIntervalBoundaryTypeCode 22500. It may be possible to arrange the scale axis values of a scale axis uniquely.

The meaning of scale axis values, determined via the ScaleAxisIntervalBoundaryTypeCode, is described as "scale axis type" in the context of pricing scales. It is used in this context in the following way. A scale axis is used to determine the "domain" of a (one-dimensional) pricing scale. In this context, the values of the scale axis are described as scale levels. The pricing scale defines a scale rate for each scale level (e.g., net price, or discount). Consequently, a pricing scale comprises the scale levels as "input values" and the scale rates defined for the levels as "output values." The "output values" of a pricing scale are accessed using the scale level(s) to determine conditions in the context of pricing, on values such as, e.g., the order quantity.

A scale level and the scale axis type jointly determine the interval to which the scale rate applies, either 1) from the current scale level up to the next higher level, but excluding the subsequent next level, or 2) up to the current scale level, from the next lowest level, but excluding the next lower level. In the first case, the pricing scale is called the "from-pricing scale," in the second case it is called the "to-pricing scale". Scales axes for pricing scales may explicitly have a minimum and maximum scale axis value.

The scale levels of a pricing scale may be defined in terms of a pricing scale base type. The scale levels for the scale base types quantity, gross value, and number are scale quantity with scale quantity unit, scale rate with scale currency, and scale quantity without unit, respectively. Scale levels are divided into the scale axis of a pricing scale (or the dimension of the pricing scale represented by it). The scale type is valid for all scale levels of a pricing scale, i.e., the different scale levels of a (one-dimensional) pricing scale are always interpreted in the same way as interval boundaries.

The scale levels of a pricing scale may imply disconnected and consuming intervals. For variations of the input value, a scale level (and therefore, the interval implied) is relevant for determining the scale amount when using scale types "lower boundary" and "upper boundary."

The following is an example of a one-dimensional pricing scale of scale type "2" or "upper boundary" with scale base type quantity.

| Scale level as "input value"<br>Scale quantity | Scale unit | Scale rate with currency, price unit and unit of measure as "output value" |
|---|---|---|
| 10 | Pieces | 10 €/1 piece |
| 100 | Pieces | 9 €/piece |
| 1000 | Pieces | 8 €/1 piece |
| 10000 | Pieces | 8 €/1 piece |

When determining a pricing condition for an order quantity of, e.g., 150 pieces, the third scale level is used and the price (150 ST×8 €/1 pc) equal to 1200 € is determined based on the scale type "upper boundary."

The ScaleAxisIntervalBoundaryTypeCode may be a proprietary code list with fixed predefined values. Changes to the permitted values involve changes to the interface. The focus here is on one-dimensional pricing scales, even if multi-dimensional pricing scales can be used for the scale type and possess one scale type per dimension. The same concepts as for pricing conditions are used for scales for free goods and rebate conditions, i.e., the ScaleAxisIntervalBoundaryTypeCode can also be used for these scales. (See also pricing conditions and pricing scales.)

(iiiiiii) ScheduleLineCommitmentCode

The GDT ScheduleLineCommitmentCode 22600 is a coded representation that describes the planning-related meaning of the schedule line information for a purchase order, such as a delivery schedule, and thus determines the (legal) binding nature for the ordered quantity and specified delivery dates for a material/product. An example is: <ScheduleLineCommitmentCode>AE</ScheduleLineCommitmentCode>.

The structure of GDT ScheduleLineCommitmentCode 22600 is depicted in FIG. 226. For the GDT ScheduleLineCommitmentCode 22600, the Object Class is ScheduleLine 22602, the Property is Commitment 22604, the Representation/Association term is Code 22606, the Type term is CCT 22608, the Type term is Code 22610, and the Length is from one to three 22612. The GDT ScheduleLineCommitmentCode 22600 may be a restricted GDT.

The following illustrative values of the ScheduleLineCommitmentCode are in the framework of "scheduling-agreement-based release order":

1) Fixed dates and quantities, which indicates that the schedule line information regarding the specified product quantities and dates is fixed.

2) Production and material go-ahead, which authorizes the vendor to start manufacturing the required products.

3) Material go-ahead, which authorizes the vendor to order the required material for the products to be delivered.

4) Forecast/preview, which represents a non-binding forecast of future purchase orders that currently depend on planned requirements.

5) Shortfall quantity/backlog, which represents a product quantity that has already been ordered but did not arrive by the planned delivery date and therefore may be delivered subsequently.

10) Immediate requirement, which represents an immediately required product quantity that may be included immediately in the next delivery.

The ScheduleLineCommitmentCode refers to the representation UN/EDIFACT 4017: Delivery plan commitment level code. The ScheduleLineCommitmentCode is used to inform a vendor about the binding nature and the meaning of the schedule line information of a release order/forecast delivery schedule. It may be used, for example, in the automotive industry.

(jjjjjjj) ScoreCardID

A GDT ScoreCardID 22700 is the identification of a scorecard. A scorecard is a procedure for assessing a party or subject using different characteristics. An example is: <ScoreCardID>A</ScoreCardID>.

The structure of GDT ScoreCardID 22700 is depicted in FIG. 227. For the GDT ScoreCardID 22700, the Object Class is Score Card 22702, the Property is Identification 22704, the Representation/Association term is Identifier 22706, the Type term is CCT 22708, the Type Name is Identifier 22710, and the Length is from one to twenty 22712. The GDT ScoreCardID 22700 may be a restricted GDT.

The following may apply to 22700:

1) Scorecards are internal to a company and confidential; and

2) The company that specifies the scorecard assigns an ID.

ScoreCardID is unique in the context of the company that specifies the scorecard. Scorecards are used, e.g., by credit agencies to rate companies. In this case, the credit agency assigns the IDs; ScoreCardID is then unique in the context of a credit agency. Another possible use is the company internal identification of a scorecard that is created as part of the "Balanced Scorecard" concept for determining business performance.

(kkkkkkkk) SubContractingIndicator

A GDT SubContractingIndicator 22800 indicates whether the transaction form is subcontracting or not. An example is: <SubContractingIndicator>true</SubContractingIndicator>.

The structure of GDT SubContractingIndicator 22800 is depicted in FIG. 228. The GDT SubContractingIndicator 22800 is from the core component type Indicator. For the GDT SubContracting Indicator 22800, the Object Class is Sub Contracting 22802, the Property is Indicator 22804, the Representation/Association term is 22806, the Type term is CCT 22808, and the Type Name term is Indicator 22810.

The SubContractingIndicator can have the following illustrative values, either 1) true, meaning that the transaction is subcontracting; or 2) false, meaning that the transaction is not subcontracting. "Subcontracting" is a transaction form in which the vendor receives an order to produce the final product from the delivered materials components.

(llllllll) SubHierarchyDefinitionIndicator

A GDT SubHierarchyDefinitionIndicator 22900 indicates whether something is used to establish a subhierarchy or not. The word "something" as used in this context may generally relate to specific properties or facts. An example is: <PropertySubHierarchyDefinitionIndicator>true</PropertySubHierarchyDefinitionIndicator>.

The structure of GDT SubHierarchyDefinitionIndicator 22900 is depicted in FIG. 229. For the GDT SubHierarchyDefinitionIndicator, the Property is SubHierarchyDefinition 22902, the Representation/Association term is Indicator 22904, the Type term is CCT 22906, and the Type Name term is Indicator 22908.

The GDT SubHierarchyDefinitionIndicator 22900 can have the following illustrative values, either 1) true, meaning that something is used to establish a subhierarchy; or 2) false, meaning that something is not used to establish a subhierarchy. (For value range, see CCT: Indicator.)

For each SubHierarchyDefinitionIndicator, there may be defined what is used or not used to define a subhierarchy. This may be reflected in an appropriate name prefix. For example, a PropertySubHierarchyDefinitionIndicator indicates whether a property is used to define a subhierarchy. The SubHierarchyDefinitionIndicator can be used, for example, with a training catalog to indicate which of the properties "Training Contents," "Training Location," "Training Language," and the like, are used to define a subhierarchy of the training offering.

(mmmmmmmm) SubjectAreaCode

The GDT SubjectAreaCode 23000 is a coded representation of a subject area. An example is: <SubjectAreaCode>25.040.40</SubjectAreaCode>. 25.040.40 stands for 'Industrial process measurement and control'; this classifies ISO13584/42, e.g., where the property is defined.

The structure of GDT SubjectAreaCode 23000 is depicted in FIG. 230. For GDT SubjectAreaCode 23000, the Object Class is Subject Area 23002, the Representation/Association term is Code 23004, the Type term is CCT 23006, the Type Name term is DCode 23008, and the Length is nine 23010. The GDT SubjectAreaCode 23000 is a restricted GDT.

The possible illustrative values for the GDT SubjectAreaCode 23000 can be found in the 'International Classification for Standards' (ICS). These standards were created under the overall control of ISO. For explanations and values, see the "World Standards Service Network" at www.wssn.net/WSSN/RefDocs/ics2001-en.pdf. For a comprehensive alphabetical index of subject areas, go to www.wssn.net/WSSN/RefDocs/ics01index-en.pdf.

GDT SubjectAreaCode 23000 is used for classifying normative documents and standardized objects, and for classifying an object, e.g., a property, into subject areas (nnnnnnnn) TaxJurisdictionCode The GDT TaxJurisdictionCode 23100 is the tax jurisdiction code part of the address. This code is used in various countries and can be derived uniquely from the address. However, it may depend on the code list of the provider. A country can have multiple code-list providers. An example is: <TaxJurisdictionCode listID="VeraZip System," listVersionID="," listAgencyID="Taxware," listAgencySchemeID="," listAgencySchemeAgencyID=" ">PA 1914101</TaxJurisdictionCode>.

The structure of GDT TaxJurisdictionCode 23100 is depicted in FIG. 231. The GDT TaxJurisdictionCode 23100 includes attributes listID 23116, listVersionID 23136, listAgencyID 23156, listAgencySchemeID 23176, and listAgencySchemeAgencyID 23196. For the GDT TaxJurisdictionCode 23100, the Category is Element 23102, the Object Class is TaxJurisdiction-Code 23104, the Property is Tax-JurisdictionCode 23106, the Representation/Association term is Code 23108, the Type term is CCT 23110, the Type Name term is Code 23112, and the Length is from one to fifteen 23114. For the listID 23116, the Category is Attribute 23118, the Object Class is CodeList 23120, the Property is Identification 23122, the Representation/Association term is Identifier 23124, the Type term is xsd 23126, the Type Name term is Token 23128, and the Length is from one to sixty 23130. The Cardinality between the GDT TaxJurisdictionCode 23100 and the listID 23116 is zero or one 23132. The listID 23116 may be optional 23134. For the listVersionID 23136, the Category is Attribute 23138, the Object Class is CodeList 23140, the Property is Version 23142, the Representation/Association term is Identifier 23144, the Type term is xsd 23146, the Type Name term is Token 23148, and the Length is from one to fifteen 23150. The Cardinality between the GDT TaxJurisdictionCode 23100 and the listVersionID 23136 is zero or one 23152. The listVersionID 23136 may be optional 23154. For the listAgencyID 23156, the Category is Attribute 23158, the Object Class is CodeListAgency 23160, the Property is Identification 23162, the Representation/Association term is Identifier 23164, the Type term is xsd 23166, the Type Name term is Token 23188, and the Length is from one to sixty 23170. The Cardinality between the GDT TaxJurisdictionCode 23100 and the listAgencyID 23156 is zero or one 23172. The listAgencyID 23156 may be optional 23174. For the listAgencySchemeID 23176, the Category is Attribute 23178, the Object Class is CodeListAgency 23180, the Property is Scheme 23182, the Representation/Association term is Identifier 23184, the Type term is xsd 23186, the Type Name term is Token 23188, and the Length is from one to sixty 23190. The Cardinality between the GDT TaxJurisdictionCode 23100 and the listAgencySchemeID 23176 is zero or one 23192. The listAgencySchemeID 23176 may be optional 23194. For the listAgencySchemeAgencyID 23196, the Category is Attribute 23198, the Object Class is CodeListAgency 23101, the Property is SchemeAgency 23103, the Representation/Association term is Identifier 23105, the Type term is xsd 23107, the Type Name term is Token 23109, and the Length is three 23111. The Cardinality between the GDT TaxJurisdictionCode 23100 and the listAgencySchemeAgencyID 23196 is zero or one 23113. The listAgencySchemeAgencyID 23196 may be optional 23115.

The GDT TaxJurisdictionCode 23100 specifies the tax jurisdiction code and has a maximum length of 15 characters. The meaning of the attributes listID, listVersionID, listAgencyID, listAgencySchemeID, and listAgencySchemeAgencyID is described in the definition of the CCT Code. For example, in the USA there are many providers of software for calculating taxes that manage TaxJurisdictionCodes. The name of one of these providers is specified in the listAgencyID attribute. The GDT TaxJurisdictionCode 23100 specifies the tax jurisdiction code for a physical address.

(oooooooo) TextSearchableIndicator

A GDT TextSearchableIndicator 23200 indicates whether or not an object is available for text search. A search is performed for a text that is contained either entirely or in part in objects indicated by the indicator. An example is: <TextSearchableIndicator>true</TextSearchableIndicator>.

The structure of GDT TextSearchIndicator 23200 is depicted in FIG. 232. For the GDT TextSearchIndicator 23200, the Property is Text Searchable 23202, the Representation/Association term is Indicator 23204, the Type term is CCT 23206, and the Type Name term is Indicator 23208.

Valid illustrative values for the 23200 are either: 1) true, meaning that the object is suitable for "text search," or 2) false, meaning that the object is not suitable for "text search."

Both parametric searches and text searches can be possible for an object and one does not preclude the other.

(pppppppp) Time

A GDT Time 23300 represents the time in a 24 hour day. An example is: <WakeUpTime>08:00:00+01:00</WakeUpTime>.

The structure of GDT Time 23300 is depicted in FIG. 233. For the GDT Time 23300, the Property is Time 23302, the Representation/Association term is DateTime 23304, the Type term is CCT 23306, and the Type Name term is Time 23308.

GDT Time 23300 uses the W3C "built-in data type" xsd: time. This is structured according to the extended representation of ISO 8601 (see www.w3.org/TR/NOTE-datetime).

The extended representation is as follows: 1) hh:mm:ss (.sss)Z; or 2) hh:mm:ss(.sss)(+/−)hh:mm. An example for GDT Time 23300 is: 1) 15:30:00Z; or 2) 10:30:00+05:00.

The extended representation for GDT Time 21800 uses the following literals:

1) "hh" for hours, 00-23;
2) "mm" for minutes, 00-59;
3) "ss" for seconds, 00-59;
4) ".sss" where one or more characters after the decimal point represent fractions of a second, where the representation is limited to a maximum of three decimal places, i.e., it is possible to be accurate up to one hundredth of a second;
5) ":" where there may be a colon between the hours, minutes, and seconds;
6) "Z" which may be specified when the represented time is also the UTC time;
7) "+hh:mm" which may be specified when the represented time is a local time that is ahead of UTC time; and
8) "−hh:mm" which may be specified when the represented time is a local time that is behind UTC time.

The following value ranges are defined for GDT Time 21800:

1) Time, which represents exactly 24 hours (0-23);
2) Minutes, which represents exactly 60 minutes (0-59);
3) Seconds, which represents exactly 60 seconds (0-59); and
4) Time zone, which is usually expressed in UTC (Coordinated Universal Time). If GDT Time 23300 represents a local time, the time difference with respect to UTC time may be specified.

Time is used to represent a time on any day. Examples of times are wake-up times each day or the time start and end time of a period of time such as the working day or lunch hour.

The time can also be specified without the additional information (Z, +hh:mm, −hh:mm) relating to the coordinated world time (UTC time).

(qqqqqqqq) TimePeriod

A GDT TimePeriod 23400 is a period that is defined by two points in time. These points in time are expressed by a time of day. This time period is determined by a start time and an end time, a start time with a duration, or a duration with an end time. An example is:

```
<WorkingTimePeriod>
    <StartTime>08:00:00</StartTime>
    <EndTime>16:00:00</EndTime>
</WorkingTimePeriod>
```

The structure GDT TimePeriod 23400 is depicted in FIG. 234. The GDT TimePeriod 23400 includes elements StartTime 23406, EndTime 23422, and Duration 23438. For the GDT TimePeriod 23400, the Object Class is Time Period 23402 and the Property is Details 23404.

The GDT TimePeriod 23400 is an aggregation and includes the following sub-elements: 1) StartTime 23406, 2) EndTime 23422, and 3) Duration 23438.

The StartTime 23406 represents the start time in the time period according to the extended representation of ISO 8601. For the StartTime 23406, the Category is Element 23408, the Object Class is Time Period 23410, the Property is Start Time 23412, the Representation/Association term is Time 23414, the Type term is GDT 23416, and the Type Name term is Time 23418. The Cardinality between the GDT TimePeriod 23400 and the StartTime 23406 is zero or one 23420.

The EndTime 23422 represents the end time in the time period according to the extended representation of ISO 8601. For the EndTime 23422, the Category is Element 23424, the Object Class is Time Period 23426, the Property is End Time 23428, the Representation/Association term is Time 23430, the Type term is GDT 23432, and the Type Name term is Time 23434. The Cardinality between the GDT TimePeriod 23400 and the EndTime 23422 is zero or one 23436.

The Duration 23438 may represent the relative duration according to the ISO 8601 convention. The following time conventions may be used: hours (nH), minutes (nM), and seconds (n.nnnS). For the Duration 23438, the Category is Element 23440, the Object Class is Time Period 23442, the Property is Duration 23444, the Representation/Association term is Duration 23446, the Type term is GDT 23448, and the Type Name term is Duration 23450. The Cardinality between the GDT TimePeriod 23400 and the Duration 23438 is zero or one 23452. An example of Duration 23438 is as follow: <Duration>P12H10M13.3S</Duration>.

The GDT TimePeriod 23400 may contain, for example, two different times. The following illustrative combinations are possible: 1) StartTime 23406+EndTime 23422; 2) StartTime 23406+Duration 23438; and 3) EndTime 23422+Duration 23438. StartTime 23406 and EndTime 23422 cannot be more than 24 hours apart. For example, if StartTime 23406 is "18:00" and EndTime 23422 "06:00," then the value in EndTime automatically refers to the next day.

An example of StartTime 23406 and EndTime 23422 is as follows: <StartTime>18:00:00</StartTime><EndTime>06:00:00</EndTime>.

The period of time represented by Duration 23438 can be more than 24 hours. Note that the largest value that can be specified is, for example, hours (nH). In other words, multiple days can be expressed in terms of hours.

An example of Duration 23438 is as follows: <Duration>P76H</Duration>. P76H corresponds to a duration of 3 days and 4 hours.

GDT TimePeriod 23400 can be used to express periods of time in hours, minutes, and seconds. For example, it can define the daily start time and end time for the working day or the start time and duration of a transport.

The value in GTD TimePeriod 23400 is a relative value and is not a day-related representation of a time period that is determined by a time. If the optional reference to coordinated world time (UTC time) is not specified, then the time should be either in the same time zone or implicitly interpreted in the same way by the business partner so as to avoid confusion. The term "Time" in the "Object Class" of the CDT is redundant. Therefore, it consists of the term "Period." This is because the term "Time" is given by the "Property" of the sub-elements. As a result, the semantic of this CDT is unique.

(rrrrrrr) TimeSeries

A GDT TimeSeries 23500 is time series information that consists of items that each contain a period with a start time and an end time, and a period-based quantity or price. An example is:

```
<TimeSeries>
    <Item>
            <ValidityPeriod>
            <StartDateTime>2002-04-19T15:00:00Z</StartDateTime>
            <EndDateTime>2002-04-19T17:00:00Z</EndDateTime>
            </ValidityPeriod>
            <Quantity unitCode="PC" >150</Quantity>
    </Item>
</TimeSeries>.
```

The structure of GTD TimeSeries 23500 is depicted in FIG. 235.

The TimeSeriesItem 23506 is an item in a time series and can be repeated as often as required.

The ValidityPeriod 23518 describes the validity period of the time series item with a start time stamp and an end time stamp.

The Quantity 23534 is of type GDT: Quantity and describes the quantity connected with the time series item.

The Price 23550 describes the price connected with the time series item.

The FixedIndicator 23566 describes whether the corresponding item is blocked for changes or not.

The AdjustmentReasonCode 23582 describes the reason for a change that has been made.

The Note 23596 is a short note for the time series item. This can be a note for the entire time series item or a note for a part of the time series item, e.g., a more detailed explanation of an AdjustmentReasonCode.

For the Integrity Conditions for 23500, a element Quantity or Price may be filled. The TimeSeries 23500 is used as a generic data type that can have various specifications in an interface depending on the context category used, e.g., "Sales," to describe sales quantities; "Consumption," to describe consumption quantities, and the like.

(sssssss) TimeZoneDifferenceValue

A GDT TimeZoneDifferenceValue 23600 is the difference (in hours) between the local time zone and UTC (Coordinated Universal Time), which is given as a point of reference. An example is: <TimeZoneDifferenceValue>4.5</TimeZoneDifferenceValue >.

The structure of GDT TimeZoneDifferenceValue 23600 is depicted in FIG. 236. For the GDT TimeZoneDifferenceValue 23600, the Property is Time Zone Difference 23602, the Representation/Association term is Value 23604, the Type term is GDT 23606, the Type Name term is DecimalValue 23608, and the Length is two 23610. The GDT TimeZoneDifferenceValue 23600 has, for example, a maximum value of twelve and a minimum value of twelve 23612.

Since the W3C built-in data type "xsd: decimal" is used for TimeZoneDifference, the hours precede the comma and the minutes follow it. Positive values do not need to be prefixed with a positive sign (+). However, negative values may be prefixed with a negative sign (−). The minutes after the comma are expressed in hundredths of a minute. For example, the value "0.5" corresponds to 30 minutes. A facet "xsd: enumeration" is created for each valid time zone value. In this way, values in valid time zones are supported.

TimeZoneDifferenceValue is used to determine the local time zone of the relevant business partner or to determine the current time zone. Minutes are also displayed in the time difference. This is because some countries or regions are divided into half-hour or three-quarters of an hour time zones. For example, Afghanistan (4,5), northern Australia (9,5), southern Australian (10,5), India (5,5), Nepal (5, 75), and the like.

(ttttttt) TotalNumberValue

A GDT TotalNumberValue 23700 is the total number of elements contained in a set. An example is: <TotalNumberValue>20</TotalNumberValue>.

The structure of GDT TotalNumberValue 23700 is depicted in FIG. 237. In a variation, non-negative, whole numbers smaller than one billion are permitted (0-999999999) for GDT TotalNumberValue 23700. TotalNumberValue can be used, e.g., to specify the number of objects contained in a list. The structure of GDT TotalNumberValue 23700 is depicted in FIG. 237. For the GDT TotalNumberValue 23700, the Representation/Association Quality term is Total Number 23702, the Representation/Association term is Value 23704, the Type term is xsd 23706, the Type Name term is nonNegativeInteger 23708, and the Length is from one to nine 23710.

(uuuuuuuu) TransmissionID

A GDT TransmissionID 23800 is a unique identifier for a transmission. Transmission is the transfer of information that belongs together by a sequence of (sub) messages. The sequence can comprise a single message. An example is: <TransmissionID>4/7_CatalogXYZ</TransmissionID>.

The structure of GDT TransmissionID 23800 is depicted in FIG. 238.

GDT TransmissionID 23800 is a string with a maximum of forty characters. The following illustrative values are permitted: 1) Upper case letters from A to Z (without German umlauts); 2) Digits from 0 to 9; 3) – (minus sign); 4) _ (underscore); 5)/(forward slash); 6) \ (back slash); and 7) . (period). It may be ensured that the sender and receiver use the same GDT TransmissionID 23800 once in the communication. The structure of GDT TransmissionID 23800 is depicted in FIG. 238. For the GDT TransmissionID 23800, the Object Class is Transmission 23802, the Property is Identification 23804, the Representation/Association term is Identifier 23806, the Type term is CCT 23808, the Type Name term is Identifier 23810, and the Length is from one to forty 23812. The GDT TransmissionID 23800 may be a restricted GDT.

GDT TransmissionID 22300 is used to transfer objects that can be divided up and sent in multiple messages due to their large size. GDT TransmissionID can be used in such cases in the following illustrative messages: I) In the (sub) messages, which actually transmit the object, to identify uniquely a sequence of (sub) messages that belong together; 2) In messages that confirm the receipt and processing of individual (sub) messages; 3) In messages that confirm the receipt and processing of the complete sequence of (sub) messages and therefore of the complete object; and 4) In messages that display the cancellation of the transmission.

(vvvvvvvv) TransportMeans

A GDT TransportMeans 23900 is the description of a means of transport and can also include information for a more detailed identification. An example is:

```
<TransportMeans>
    <ID>HD - ES 1234</ID>
    <DescriptionCode>31</DescriptionCode>
</TransportMeans>.
```

The structure of GDT TransportMeans 23900 is depicted in FIG. 239. GDT TransportMeans 23900 is composed of the two sub-elements TransportMeansID 23908 and TransportMeansDescriptionCode 23928 from the Global Data Type TransportMeansDescriptionCode 23928. The GDT TransportMeans 23900 includes elements ID 23908 and DescriptionCode 23928. For the GDT TransportMeans 23900, the Object Class is Transport-Means 23902, the Property is Details 23904, and the Representation/Association term is Details 23906.

The TransportMeansID 23908 is used to identify the means of transport. The TransportMeansID 23908 can be, e.g., a license number for a truck or the identification number of a container. For the ID 23908, the Category is Element 23910, the Object Class is Transport-Means 23912, the Property is Identification 23914, the Representation/Association term is Identifier 23916, the Type term is CCT 23918, the Type Name term is Identifier 23920, and the Length is from one to twenty 23922. The Cardinality between the GDT TransportMeans 23900 and the ID 23908 is zero or one 23924. The ID 23908 may be restricted.

The TransportMeansDescriptionCode 23928 is a coded representation of the transport means description (see also GDT: TransportMeansDescriptionCode). For the DescriptionCode 23928, the Category is Element 23930, the Object Class is Transport-Means 23932, the Property is Description 23934, the Representation/Association term is Code 23936, the Type term is GDT 23938, and the Type Name term is TransportMeansDescriptionCode 23940. The Cardinality between the GDT TransportMeans 23900 and the DescriptionCode 23928 is one 23942.

The TransportMeansID 23908 can have a maximum of 20 characters, taking into account the restrictions defined in the xsd: token. The TransportMeansID 23908 refers to the transport means description specified using the TransportMeansDescriptionCode 23928. For the Integrity Conditions for TransportMeansDescriptionCode 23928, see its documentation.

The GDT: TransportMeans 23900 is used within the shipping notification to provide a goods recipient the description and exact identification of the means of transport with which the goods are delivered. The TransportMeansID 23908 corresponds to the "Means of transport ID" (TRAID) used in the R/3 in the IDOC DELVRY03. The TransportMeansDescriptionCode 23928 corresponds with the "Means of Transport Type" (TRATY) used in the R/3 in the IDOC DELVRY03.

(wwwwwwww) TransportMeansDescriptionCode

The GDT TransportMeansDescriptionCode 24000 is a coded representation of the transport means type with which goods or persons are to be transported (e.g., road tanker, barge, airplane, or refrigerated road tanker.) An example is:

```
<TransportMeansDescriptionCode>
    1
<TransportMeansDescriptionCode>.
```

Transportation per barge with equipment for loading and transportation of liquid chemicals.

The structure of GDT TransportMeansDescriptionCode 24000 is depicted in FIG. 240. The GDT TransportMeansDescriptionCode 24000 is of the CoreComponentType "Code." For the GDT TransportMeansDescriptionCode 24000, the Object Class is TransportMeans 24002, the Property is Description 24004, the Representation/Association term is Code 24006, the Type term is CCT 24008, the Type Name term is Code 24010, and the Length is from one to four 24012. The GDT TransportMeansDescriptionCode 24000 may be a restricted GDT.

According to the UN/EDIFACT: Data Element 8179 is the "Transport means description code" allowing up to 8 alphanumeric characters. The Code Values for the 24000 (as copied from UN/EDIFACT) are as follows:

1) 1 Barge chemical tanker—

A barge equipped to transport liquid chemicals;

2) 2 Coaster chemical tanker—

A coaster vessel equipped to transport liquid chemicals;

3) 3 Dry bulk carrier—

Vessel designed to carry dry bulk (expellers);

4) 4 Deep sea chemical tanker—

An ocean-going vessel equipped to transport liquid chemicals;

5) 5 Gas tanker—

A vessel equipped to transport gas;

6) 6 Aircraft—
A machine capable of flight;
7) 7 Car with caravan—
A caravan towed by a car;
8) 8 Container ship—
Vessel capable of carrying containers and other cargo;
9) 9 Exceptional transport—
Transport for which common characteristics are not applicable (e.g. big transformers requiring special wagons, special tackles, special routing and the like.);
10) 10 Bus—
To specify that the means of transportation is a bus;
11) 11 Ship—
A large vessel navigating deep water;
12) 12 Ship tanker—
A large vessel equipped to transport liquids;
13) 13 Ocean vessel—
An ocean-going vessel that is not a ship;
14) 14 Flatbed trailer—
A means of transport identification code indicating a flatbed trailer;
Note:
1. This code value will be removed effective with directory D.02B;
15) 15 Taxi—
A means of transport identification code indicating a taxi;
16) 16 Barge—
A category of boat used to transport material over water;
17) 17 Customer determined means of transport—
The type of means of transport is to be determined by the customer;
18) 18 Seller determined means of transport—
The type of means of transport is to be determined by the seller;
19) 19 Tip-up truck—
A truck capable of tipping up in order to deliver its load;
20) 20 Furniture truck—
A truck used explicitly for the conveyance of furniture;
21) 21 Rail tanker—
A rail wagon equipped to transport liquids;
22) 22 Rail silo tanker—
Self explanatory;
Note:
1. This code value will be removed effective with directory D.04B;
23) 23 Rail bulk car—
A rail wagon equipped to transport bulk cargo;
24) 24 Customer rail tanker—
A customer-owned rail wagon equipped to transport liquids;
25) 25 Rail express—
Description to be provided;
Note:
1. This code value will be removed effective with directory D.04B;
26) 26 Tip-up articulated truck—
An articulated truck capable of tipping up in order to deliver its load;
27) 27 Rigid truck with tank—
A rigid truck fitted with a tank capable of carrying liquids or bulk goods;
28) 28 Refrigerated truck and trailer—
A combined truck and trailer equipped to maintain refrigerated temperatures;
29) 29 Freezer truck and trailer—
A combined truck and trailer equipped to maintain freezing temperatures;
30) 30 Tautliner 25 ton, combined with 90 cubic meter trailer with removable roof—
A truck with non-ridged sides, 25 ton capacity combined with a 90 cubic meter trailer with removable roof;
31) 31 Truck—
An automotive vehicle for hauling goods;
32) 32 Road tanker—
An over-the-road tank trucker or trailer;
33) 33 Road silo tanker—
Description to be provided;
Note:
1. This code value will be removed effective with directory D.04B;
34) 34 Tautliner truck—
A truck with non-ridged sides;
35) 35 Truck/trailer with tilt—
A truck and trailer combination with a tilting capability;
36) 36 Pipeline—
A line of pipes for conveying water, gas, oil, and the like.;
37) 37 Hydrant cart—
Vehicle used at large airports with installed distribution systems to make into-plane deliveries of fuel; distinguished from other types of fuelling vehicles;
38) 38 Car—
Car;
39) 39 Tautliner truck with removable roof—
A truck with non-ridged sides and removable roof;
40) 40 Truck with opening floor—
A truck with an opening floor mechanism which is used to discharge the cargo;
41) 41 Freezer truck—
A truck equipped to maintain freezing temperatures;
42) 42 Isothermic truck—
A truck equipped to maintain controlled temperatures;
43) 43 Refrigerated truck—
A truck equipped to maintain refrigerated temperatures;
44) 44 Freezer van—
A small rigid covered vehicle for conveying frozen goods;
45) 45 Isothermic van—
A small rigid covered vehicle for conveying temperature controlled goods;
46) 46 Refrigerated van—
A small rigid covered vehicle for conveying refrigerated goods;
47) 47 Bulk truck—
A truck suitable for transporting bulk goods;
48) 48 Van—
A small vehicle suitable for carrying small volume loads;
49) 49 Roadrailer—
Used for shipments that travel by multimodal rail or highway trailer (roadrailer);
50) 50 Passenger vessel—
Vessel for carrying passengers;
51) 51 Cargo and passenger vessel—
Vessel for carrying cargo and passengers;
52) 52 General cargo vessel—
Vessel for carrying general cargo;
53) 53 Crude oil tanker—
Vessel for carrying crude oil;
54) 54 Liquefied Petroleum Gas (LPG) carrier—
Vessel for carrying Liquefied Petroleum Gas (LPG);
55) 55 Liquefied Natural Gas (LNG) carrier—
Vessel for carrying Liquefied Natural Gas (LNG);
56) 56 Grain carrier—
Vessel for carrying grain;
57) 57 Timber or log carrier—
Vessel for carrying timber or logs;

58) 58 Wood chip carrier—

Vessel for carrying wood chips;

59) 59 Steel products vessel—

Vessel for carrying steel products;

60) 60 Gravel vessel—

Vessel for carrying gravel;

61) 61 Cement vessel—

Vessel for carrying cement in bulk;

62) 62 Coal vessel—

Vessel for carrying coal;

63) 63 Ore carrier—

Vessel for carrying ore in bulk;

64) 64 Car carrier—

Vessel for carrying complete cars and/or their knock-down parts;

65) 65 Container only vessel—

Vessel for carrying containers only;

66) 66 Roll on-roll off vessel—

A vessel capable of carrying roll on-roll off cargo;

67) 67 Ferry—

A means of transport for carrying passengers and/or vehicles on a regular basis;

68) 68 Fishing vessel—

Vessel used in the catching of fish;

69) 69 Work vessel;

A vessel engaged in "port and harbor work," which means construction, improvement, maintenance or rehabilitation of port and harbor facilities. Dredger, floating crane, sand carrier with grab bucket are included in this type of the means of transport.

70) 70 Patrol vessel—

A vessel to patrol port or coastal area;

71) 71 Tug and/or push boat—

A vessel to push and/or pull other vessels;

72) 72 Train with one wagon—

A train with a single wagon used to carry goods;

73) 73 Train with more than one and less than 20 wagons—

A train with more than one and less than 20 wagons used to carry goods;

74) 74 Train with 20 or more wagons—

A train with 20 or more wagons used to carry goods;

75) 75 Oil products tanker—

A vessel for carrying products derived from crude oil;

76) 76 Training vessel—

A vessel for learning maritime skills;

77) 77 Freezer truck and isothermic trailer—

A combined freezer truck and isothermic trailer;

78) 78 Isothermic truck and isothermic trailer—

A truck and a trailer equipped to maintain controlled temperatures;

79) 79 Refrigerated truck and isothermic trailer—

A combined refrigerated truck and isothermic trailer;

80) 80 Freezer truck and refrigerated trailer—

A combined freezer truck and refrigerated trailer;

81) 81 Isothermic truck and refrigerated trailer—

A combined isothermic truck and refrigerated trailer;

82) 82 Rigid truck with tank and tank trailer—

A combined rigid truck with tank and tank trailer;

83) 83 Bulk truck and tank trailer—

A combined truck capable of carrying liquids or bulk goods and a tank trailer;

84) 84 Rigid truck with tank and bulk trailer—

A combined rigid truck with tank and a trailer capable of carrying liquids or bulk goods;

85) 85 Bulk truck and bulk trailer—

A combined truck and a trailer both capable of carrying liquids or bulk goods;

86) 86 Tautliner truck and extendable trailer—

A combined tautliner truck and extendable trailer;

87) 87 Tautliner truck with removable roof and extendable trailer—

A combined tautliner truck with removable roof and extendable trailer;

88) 88 Truck with opening floor and extendable trailer—

A combined truck with opening floor and extendable trailer;

89) 89 Bulk truck and extendable trailer—

A combined truck capable of carrying liquids or bulk goods and an extendable trailer;

90) 90 Isothermic truck and freezer trailer—

A combined isothermic truck and freezer trailer;

91) 91 Refrigerated truck and freezer trailer—

A combined refrigerated truck and freezer trailer;

92) 92 Tip-up truck and gondola trailer—

A combined tip-up truck and gondola trailer. A gondola trailer is a split level trailer suitable for the transport of heavy machinery;

93) 93 Tautliner truck and gondola trailer—

A combined tautliner truck and gondola trailer. A gondola trailer is a split level trailer suitable for the transport of heavy machinery;

94) 94 Tautliner truck with removable roof and gondola trailer—

A combined tautliner truck with removable roof and gondola trailer. A gondola trailer is a split level trailer suitable for the transport of heavy machinery;

95) 95 Truck with opening floor and gondola trailer—

A combined truck with opening floor and gondola trailer. A gondola trailer is a split level trailer suitable for the transport of heavy machinery;

96) 96 Bulk truck and gondola trailer—

A combined truck capable of carrying liquids or bulk goods and a gondola trailer. A gondola trailer is a split level trailer suitable for the transport of heavy machinery;

97) 97 Tip-up truck and extendable gondola trailer—

A combined tip-up truck with extendable gondola trailer. An extendable gondola trailer is a trailer fitted with a rear axle which can be extended to cater for variable length and is suitable for the transport of heavy machinery;

98) 98 Tautliner truck and extendable gondola trailer—

A combined tautliner truck and extendable gondola trailer. An extendable gondola trailer is a trailer fitted with a rear axle that can be extended to cater for variable length and is suitable for the transport of heavy machinery;

99) 99 Tautliner truck with removable roof and extendable gondolatrailer—

A combined tautliner truck with removable roof and extendable gondola trailer. An extendable gondola trailer is a trailer fitted with a rear axle that can be extended to cater for variable length and is suitable for the transport of heavy machinery;

100) 100 Truck with opening floor and extendable gondola trailer—

A combined truck with opening floor and extendable gondola trailer. An extendable gondola trailer is a trailer fitted with a rear axle that can be extended to cater for variable length and is suitable for the transport of heavy machinery;

101) 101 Bulk truck and extendable gondola trailer—

A combined truck capable of carrying liquids or bulk goods and a extendable gondola trailer. An extendable gondola trailer is a trailer fitted with a rear axle that can be extended to cater for variable length and is suitable for the transport of heavy machinery;

102) 102 Tip-up truck and trailer with opening floor—

A combined tip-up truck and trailer with opening floor;

103) 103 Tautliner truck and trailer with opening floor—

A combined tautliner truck and trailer with opening floor;

104) 104 Tautliner truck with removable roof and trailer with opening floor—

A combined tautliner truck with removable roof and trailer with opening floor;

105) 105 Truck and trailer with opening floor—

A combined truck and a trailer with an opening floor;

106) 106 Bulk truck and trailer with opening floor—

A combined truck capable of carrying liquids or bulk goods and a trailer with opening floor;

107) 107 Removal truck and trailer—

A combined truck and trailer capable of carrying household effects;

108) 108 Tautliner truck and removal trailer—

A combined tautliner truck and trailer capable of carrying household effects;

109) 109 Tautliner truck with removable roof and removal trailer—

A combined tautliner truck with a removable roof and a trailer capable of carrying household effects; and 110) 110 Vessel, temperature controlled cargo—

A vessel to carry temperature controlled cargo.

The TransportMeansDescriptionCode is used to determine concrete means of transportation. (See R/3: Means-of-Transport Type: CHAR 4).

(xxxxxxxx) TransportModeCode

The GDT TranportModeCode 24100 is a coded representation of the mode of transportation used for delivery. An example is:

```
<TransportModeCode>
    1
<\TransportModeCode>
```

Conveyance per transportation by sea

The structure of GDT TransportModeCode 24100 is depicted in FIG. 241. For the GDT TransportModeCode 24100, the Object Class is Transport Mode 24102, the Property is Code 24104, the Representation/Association term is Code 24106, the Type term is CCT 24108, the Type Name term is Code 24110, and the Length is from one to two 24112. The GDT TransportModeCode 24100 may be a restricted GDT.

See UN/EDIFACT: Data Element 8067 ("Transport mode name code"): an . . . 3 (up to 3 alpha-numeric characters), Code values as UN/EDIFACT Recommendation 19 ("Code for Modes of Transport").

This code list can be represented in a 2-character field. Therefore, the field is defined here as a 2-character field using the corresponding R/3 applications to avoid mapping problems.

The GDT TranportModeCode 24100 can contain codes that are included in the following code list.

| | |
|---|---|
| 0 | Transport mode not specified<br>Transport mode has not been specified<br>Notes:<br>1) This code can be used when the mode is not known or when information on it is not available at the time of issuing the document concerned. |
| 1 | Maritime transport<br>Transport of goods and/or persons is by sea. |
| 2 | Rail transport<br>Transport of goods and/or persons is by rail. |
| 3 | Road transport<br>Transport of goods and/or persons is by sea. |
| 4 | Air transport<br>Transport of goods and/or persons is by air. |
| 5 | Mail<br>Method to convey goods is by mail<br>Notes:<br>1) This code is provided for practical reasons, despite the fact that mail is not a genuine mode of transport. In many countries, the value of merchandise exported and imported by mail is considerable, but the exporter or importer concerned would be unable to state by which mode postal items had been conveyed. |
| 6 | Multimodal transport<br>Method to convey goods and/or persons is by multimodal transport.<br>Notes:<br>1) This code is provided for practical reasons, despite the fact that multimodal transport is not a genuine mode of transport. It can be used when goods are carried by at least two different modes from a place at which the goods are taken in charge by a transport operator to a place designated for delivery, on the basis of one transport contract. (Operations of pick-up and delivery of goods carried out in the performance of a single mode of transport, as defined in such a contract, shall not be considered as multimodal transport). |
| 7 | Fixed transport installation<br>Transport of item is via a fixed transport installation.<br>Notes:<br>1) This code applies to installations for continuous transport such as pipelines, ropeways and electric power lines. |
| 8 | Inland water transport<br>Transport of goods and/or persons is by inland water. |
| 9 | Transport mode not applicable<br>The mode of transport is not applicable. |

With the specification of the TransportMode, other conditions are usually linked in the general business conditions that are implicitly agreed upon/defined by specifying a TransportMode (e.g., price, time during which delivery can be made, or any service agent. The TransportModeCode acts for the executing partner/vendor as a criterion for grouping deliveries into transports and for route determination in R/3, for example. Furthermore, it is the basis for determining concrete transportation routes, means of transport, and responsible organization units (e.g., materials planning point). The TransportMode "MaritimeTransport" implies a sea route and the necessity of customs/port procedures, for example. These specifications may also be required for contractual reasons. In many countries, they are required for customs clearance and statistical purposes.

The 24100 illustratively corresponds to R/3: Shipping Type: CHAR 2. The GDT TranportModeCode 24100 is included in the ordered service. It may not define any concrete route or means of transportation.

(yyyyyyyy) TransportServiceLevelCode

The GDT TransportServiceLevelCode 24200 is a coded representation of the agreed/defined services in terms of the delivery of goods with respect to the speed of the delivery (as part of the ordered service). An example or instance is:

<TransportServiceLevelCode>01<\TransportServiceLevelCode>.

Customer wants express transportation and accepts the associated increased cost of transport. Delivery made in 24 hours by the latest."

The structure of GDT TransportServiceLevelCode 24200 is depicted in FIG. 242. For the GDT TransportServiceLevelCode 24200, the Object Class is Transport 24202, the Property is ServiceLevelCode 24204, the Representation/Association term is Code 24206, the Type term is CCT 24208, the Type Name term is Code 24210, and the Length is from one to two 24212. The GDT TransportServiceLevelCode 24200 may be a restricted GDT. (Comment: Length 2 using the analogous field in R/3)

The GDT TransportServiceLevelCode 24200 is represented by a 2-character string and can include codes from the following code list:. (UN/EDIFACT: Data Element 4219 ("Transport service priority code"): an . . . 3 (up to 3 alphanumeric characters) BUT). This code list can be represented in a 2-character field. Therefore, the field is defined here as a 2-character field in accordance with the corresponding R/3 applications to avoid mapping problems. The code list includes the following codes:

1) 1—Express which is for express treatment (if by rail, legal express regime for parcels transport).
2) 2—High speed which is for transport under legal international rail convention (CIM) concluded between rail organizations and based on fast routing and specified timetables.
3) 3—Normal speed which is for Transport under legal international rail convention (CIM) concluded between rail organizations.
4) 4—Post service which is for Transport under conditions specified by UPU (Universal Postal Union) and Rail organizations (parcels transport only).

With the specification of the GDT TranportServiceLevelCode 24200, other conditions may be linked in the general business conditions that are implicitly agreed on/defined by specifying a TransporServiceLevel (e.g., price, guaranteed time during which delivery may be made, any agent, entitlements in case of non-compliance).

The buyer and seller/service agent use the GDT TransportServiceLevelCode 24200 to agree on the modalities to be used for delivery and the buyer accepts the corresponding conditions.

Using this specification, the seller can determine (depending on the business process) the internal shipping point to be used for this delivery, which service agent is to be used under what conditions, and the like.

In the framework of this agreement, the service agent/seller guarantees the customer a maximum period (e.g., 24 hours) within which delivery is to be made, and the like. If these conditions are breached, liability claims against the seller may arise.

In R/3, a TransportServiceLevelCode is assigned either to a sales document type or to a sold-to party.

Depending on the specified TransportServiceLevelCode (along with loading group and plant), a suitable shipping point can be determined that is responsible for the corresponding process.

Along with the country and the geographic zone of the shipping point, the ship-to party and the transportation group, a suitable route can be determined. (The same applies to deliveries—the geography of the seller and the goods receiving point determines the transportation group and shipping conditions.)

The 24200 may correspond to R/3: Shipping Condition: CHAR 2. The difference between PriorityCode and TransportServiceLevelCode is that when using the PriorityCode an urgency, from the buyer's perspective, is assigned to an object (e.g., an item) in terms of delivery, e.g., from which a ServiceLevel may be derived within the business process at the seller. When specifying a TransportServiceLevel, a business agreement with the partner occurs. For example, when the buyer gives his seller a priority. Seller agrees on a Service Level with his transportation service provider according to buyer's priority.

(zzzzzzzz) TransportTracking

A GDT TransportTracking 24300 contains transport-related information that can be used for tracking deliveries, e.g., in the framework of goods deliveries. An example or instance is:

```
<TransportTracking>
<ID>4711</ID>
    <WebAddress>www.mayerexpressdienst.com/
TrackingHomePage.htm</WebAddress>
</TransportTracking>.
```

The structure of GDT TransportTracking 24300 is depicted in FIG. 243. The GDT TransportTracking 24300 includes elements ID 24308 and WebAddress 24326. For the GDT TransportTracking 24300, the Object Class is TransportTracking 24302, the Property is Details 24304, and the Representation/Association term is Details 24306.

The GDT TransportTrackingID 24308 is a unique identifier of a shipment, for example, a package or a container. For the ID 24308, the Category is Element 24310, the Object Class is TransportTracking 24312, the Property is Identification 24314, the Representation/Association term is Identifier 24316, the Type term is CCT 24318, the Type Name term is Identifier 24320, and the Length is from one to thirty-five 24322. The Cardinality between the GDT TransportTracking 24300 and the ID 24308 is one 24323. The ID 24308 may be restricted 24324. The TransportTrackingWebAddress 24326 specifies an address in the World Wide Web that can be used to track delivery with the TransportTrackingID. For the WebAddress 24326, the Category is Element 24328, the Object Class is TransportTracking 24330, the Property is WebAddress 24332, the Representation/Association term is ElectronicAddress 24334, the Type term is GDT 24336, and the Type Name term is WebAddress 24338. The Cardinality between the GDT TransportTracking 24300 and the WebAddress 24326 is zero or one 24340.

If a courier, express, and package service provider is responsible for the goods delivery, it may determine the format of the TransportTrackingID. The TransportTrackingWebAddress includes, e.g., the homepage of the supplier of the delivery tracking service.

The TransportTrackingID can have a maximum of 35 characters, taking into account the restrictions defined in the xsd: token. The TransportTrackingID is unique in connection with the business partner providing the delivery tracking service. The identification of the business partner is carried out as context information in the message. It can also take place using the TransportTrackingWebAddress.

The TransportTrackingWebAddress can include every URI (see also the definition of GDT: WebAddress) and can have a maximum 255-character string.

The GDT TransportTracking is used in the framework of the shipping notification to provide a goods recipient an identification and an Internet address for the online delivery tracking of the current delivered goods. The TransportTrackingID corresponds to the Tracking Number (TRACKN) used in the R/3 in the IDOC DELVRY03. The TransportTrackingWebAddress may correspond to the "URL for Forwarding Agent" (XSIURL_MULTI_TRACK) used in the R/3 in the IDOC DELVRY03.

(aaaaaaaaa) TupleLengthValue

A GDT TupleLengthValue 24400 is the number of entries in a tuple. A tuple is a linear set with a fixed number of elements. The elements of a tuple are also referred to as entries and can be of different types. An example is: <TupleLengthValue>7</TupleLengthValue>.

The structure of GDT TupleLengthValue 24400 is depicted in FIG. 244. For the GDT TupleLengthValue 24400, the Representation/Association Quality term is Tuple Length 24402, the Representation/Association term is Value 24404, the Type term is xsd 24406, the Type Name term is nonNegativeInteger 24408, and the Length is from one to two 24410.

The GDT TupleLengthValue 24400 is a qualified basic GDT based on the secondary Representation/Association Value of the CCT Numeric and a restriction of xsd: decimal. In a variation, non-negative whole numbers less than one hundred are permitted. The tuple length indicates whether a tuple is a pair (length=2), triple (length=3), quadruple (length=4), quintuple (length=5), and the like. Tuple lengths greater than 3 are usually referred to as 4-tuples, 5-tuples, and so on (or generally as n-tuples). A list differs from a tuple in that its length is flexible. An array is different from a tuple in that its elements can be indexed and in that it can have a higher dimension (2-dimensional arrays, 3-dimensional arrays, and the like). Furthermore, the entries in a list and the elements in an array are usually of the same type. A vector is a special instance of a one-dimensional array that is subject to additional mathematical rules (such as, e.g., vector addition).

(bbbbbbbbb) UnplannedItemPermissionCode

The GDT UnplannedItemPermissionCode 24500 is a coded representation of the permission to enter additional, unplanned items in a business follow-up document. An example is: <UnplannedItemPermissionCode>01</UnplannedItemPermissionCode>.

The structure of GDT Unplanned Item Permission Code 24500 is depicted in FIG. 245. For the GDT Unplanned Item Permission Code 24500, the Object Class is Unplanned Item 24502, the Property is Permission Code 24504, the Representation/Association term is Code 24506, the Type term is CCT 24508, the Type Name term is Code 24510, and the Length is two 24512. The GDT Unplanned Item Permission Code 24500 may be a restricted GDT.

UnplannedItemPermissionCode can have the following illustrative values: 1) "01" which means NotAllowed. In follow-up documents, unplanned items are not allowed to refer to an item indicated in this way. 2) "02" which means WithContractReferenceOnly. In follow-up documents, unplanned items with a contract reference are allowed to refer to an item indicated in this way. 3) "03" which means Allowed. In follow-up documents, unplanned items are allowed to refer to an item indicated in this way.

The GDT UnplannedItemPermissionCode 24500 is used to show business partners whether or not they are allowed to enter additional items for an item in a document in a subsequent process. For example, in a purchase order, the buyer informs the seller whether or not it can specify additional unplanned items for a purchase order item in the invoice. This is useful if the requirements are unknown at the time of ordering. This can be the case for repairs, where the spare parts required are not known until the repair has been made. The GDT UnplannedItemPermissionCode 24500 may be a proprietary code list with fixed predefined values. Changes to the permitted values may involve changes to the interface.

(ccccccccc) ValueDifferenceIndicator

A GDT ValueDifferenceIndicator 24600 indicates whether or not a value-related difference exists. An example is: <ValueDifferenceIndicator>true</ValueDifferenceIndicator>.

The structure of GDT ValueDifferenceIndicator 24600 is depicted in FIG. 246. For the GDT ValueDifferenceIndicator 24600, the Property is ValueDifference 24602, the Representation/Association term is Indicator 24604, the Type term is CCT 24606, and the Type Name term is Indicator 246808.

The GDT ValueDifferenceIndicator 24600 can have the following illustrative values: 1) true, which means the difference is value-related; or 2) false, which means the difference is not value-related. (See CCT: Indicator for value range).

Each ValueDifferenceIndicator may refer to a business object or to a list of similar business objects. This relationship is reflected in a corresponding refinement of the "value" name prefix. This name prefix is omitted when actually used in tag names. For example, an AmountDifferenceIndicator is the specification of whether there is a value-related difference for a money amount. Other possible forms are QuantityDifferenceIndicator, MeasureDifferenceIndicator, and PriceDifferenceIndicator.

The ValueDifferenceIndicator can be used to display whether the current value is specified for a business variable or the difference to an earlier value. Another possible use is the specification of whether it is an actual or a target value or the difference between the two. In the context of an interface, the business meaning of the values for the ValueDifferenceIndicator may be described in addition to the name prefix (see Integrity Conditions) being specified.

(ddddddddd) ValueUnlimitedIndicator

A GDT ValueUnlimitedIndicator 24700 indicates whether a value is unlimited or not. An example is: <ValueUnlimitedIndicator>true</ValueUnlimitedIndicator>.

The structure of GDT Value Unlimited Indicator 24700 is depicted in FIG. 247. For the GDT Value Unlimited Indicator 24700, the Object Class is Value 24702, the Property is Unlimited Indicator 24704, the Representation/Association term is Indicator 24706, the Type term is CCT 24708, and the Type Name term is Indicator 24710.

The ValueUnlimitedIndicator can have the following illustrative values: 1) true, which means a value is unlimited; or 2) false, which means a value is not unlimited. (See CCT Indicator for value range).

The default for a ValueUnlimitedIndicator may be 'false' so that when ValueUnlimitedIndicator is not present it is equal to a ValueUnlimitedIndicator with the value 'false'. If a ValueUnlimitedIndicator has the value 'true', then the corresponding numerical element may be nonexistent, empty or initial. A ValueUnlimitedIndicator is used with reference to a numerical element if this element can have values that are unlimited in size. The reference to a particular element may be apparent when using ValueUnlimitedIndicator. The relationship to a numerical element is reflected in a corresponding refinement of the "value" name prefix. This name prefix is omitted when actually used in tag names. A good example of the use of the ValueUnlimitedIndicator is the QuantityTolerance GDT. The ValueUnlimitedIndicator is used in this GDT to display any size tolerance.

(eeeeeeeee) VersionID

A GDT VersionID 24800 is a unique identifier for a version. A version is a differentiation of objects of an object type in accordance with the sequence in which they were created. An example is: <VersionID>1.1.5<VersionID>.

The structure of GDT VersionID 24800 is depicted in FIG. 248. For the GDT VersionID 24800, the Category is Element 24802, the Object Class is Version 24804, the Property is Identification 24806, the Representation/Association term is Identifier 24808, the Type term is CCT 24810, the Type Name term is Identifier 24812, and the Length is from one to thirty-two 24814. The GDT VersionID 24800 may be a restricted GDT.

Versions can be differentiated using the criteria before-after. They are sorted "in turn." A version can be referenced directly externally by specifying the object and its GDT VersionID 23300. It has the following characteristics: 1) It describes different characteristics of an object for external users; 2) It represents a significant change compared to other versions from a user perspective; 3) It is independent and self-contained, i.e., changes to one version do not affect other versions; 4) Versions can be developed further in parallel; and 5) The format of the version is up to the application in which the object is located. Examples are X.Y.Z or a time stamp. A variant is the differentiation of objects of an object type at the same point in time.

(fffffffff) VisibleIndicator

A GDT VisibleIndicator 24900 indicates whether something is visible or not. The word "something" generally stands for specific characters, documents, properties, or facts. An example is: <PropertyVisibleIndicator>true</PropertyVisibleIndicator>.

The structure of GDT VisibleIndicator 24900 is depicted in FIG. 249. For the GDT VisibleIndicator 24900, the Property is Visible 24902, the Representation/Association term is Indicator 24904, the Type term is CCT 24906, and the Type Name term is Indicator 24908.

The GDT VisibleIndicator 24900 can have the following values: 1) true, which means something is visible; or 2) false, which means something is not visible. (For value range, see CCT: Indicator)

For each GDT VisibleIndicator 24900, there may be specified what is visible or not visible. This is reflected in an appropriate name prefix. For example, a PropertyVisibleIndicator indicates whether a property is visible or not. The GDT VisibleIndicator 24900 can be used, e.g., to indicate whether certain properties of a product are to be visible to a customer. In the context of an interface, the business significance of "what is visible" may be described in greater detail for the GDT VisibleIndicator 24900 in addition to its name prefix (see Integrity Conditions).

(ggggggggg) WebAddress

A GDT WebAddress 25000 is a unique digital address for a document that is available on the World Wide Web. The document contains information required by the user and is based on hypertext technology. An example is:

<WebAddress> www.sap.com/GlobalDataTypes.htm

</WebAddress>

The structure of GDT Web Address 25000 is depicted in FIG. 250. The GDT Web Address 25000 includes attribute language Code 25016. For the GDT Web Address 25000, the Object Class is WebAddress 25002, the Property is Address 25004, the Representation/Association term is Electronic Address 13506, the Type term is CCT 25008, the Type Name term is Electronic Address 25010, and the Length is from one to two-hundred fifty-five 25012.

The syntax of the built-in data type "xsd: anyURI" is defined in the IETF RFC 2396 recommendation. For more details, see the "SAP Core Component Types" specification document.

The following URI schemes can be used from the list of available URI schemes (see also Uniform Resource Identifier (URI) Schemes):

| Scheme Name | Description | Reference |
|---|---|---|
| ftp | File Transfer Protocol | [IETF RFC 1738] |
| http | Hypertext Transfer Protocol | [IETF RFC 2616] |
| Gopher | The Gopher Protocol | [IETF RFC 1738] |
| News | USENET news | [IETF RFC 1738] |
| nntp | USENET news using NNTP access | [IETF RFC 1738] |
| wais | Wide Area Information Servers | [IETF RFC 1738] |
| File | Host-specific file names | [IETF RFC 1738] |
| prospero | Prospero Directory Service | [IETF RFC 1738] |
| Service | service location | [IETF RFC 2609] |
| Nfs | network file system protocol | [IETF RFC 2224] |
| https | Hypertext Transfer Protocol Secure | [IETF RFC 2818] |

The following attribute can be used for the GDT WebAddress 25000:

languageCode, which defines the language of the hypertext contents in accordance with the RFC 3066 recommendation. The language code can also be included if a translation service is to be automatically triggered at the receiver. For the language Code 25016, the Category is Attribute 25018, the Object Class is WebAddress 25020, the Property is Language Code 25022, the Representation/Association term is code 25024, the Type term is xsd 25026, the Type Name term is Language 25028, and the Length is from two to nine 25030. The Cardinality between the GDT Web Address 25000 and the language Code 25016 is zero or one 25032.

GDT WebAddress 25000 may be used for linking to further information for the user. For example, the information might be detailed, hypertext-based information about a product, organization, or company. In a variation, the hypertext documents linked to by means of WebAddress may not be used for further process-dependent processing.

(hhhhhhhhh) WorkAgreementID

A GDT WorkAgreementID 25100 is a unique ID for a work agreement. A work agreement is an agreement between an employee and an employer. The employee agrees to perform work and the employer agrees to provide remuneration for the work performed. A work agreement comprises numerous other obligations, in addition to the main obligation (remuneration for work), e.g., obligations in terms of loyalty, reporting, and benefits. Examples of work agreements include employment contracts, placement contracts, traineeships, and training contracts. An example is: <WorkAgreementID>1234567890123456</WorkAgreementID>.

The structure of GDT WorkAgreementID 25100 is depicted in FIG. 251.

The schemeID indicates the scheme according to which the identifier was assigned. Currently, the following illustrative schemes are supported: 1) WorkAgreementGUID, which identifies the work agreement using a Global Unique Identifier, and 2) WorkAgreementID, which identifies the work agreement using an internal identifier of the schemeAgency.

The schemeAgencyID specifies the business system in which the ID was assigned. If the "WorkAgreementGUID" is used for the schemeID, the WorkAgreementID may comprise one to forty places. If the WorkAgreementID is used, the WorkAgreementID may comprise 1 to 16 places and may be alphanumeric.

If the schemeID or schemeAgencyID have not been specified, it may be possible to determine them from the context. The WorkAgreementID may be used in the same way as the personnel number in the R/3 System.

(iiiiiiiii) BusinessTransactionDocumentItemProcessingTypeCode

A BusinessTransactionDocumentItemProcessingTypeCode 31800 is the coded representation of the way in which an item in a business document is processed. In a variation, a BusinessTransactionDocumentItemProcessingTypeCode 31800 is defined as a transaction item type in the business transaction of the SAP CRM/EBP 4.0 object model. The code can control the internal behavior of a document and its structure, among other things. An example (instance) of BusinessTransactionDocumentItemProcessingTypeCode 31800 is:

<BusinessTransactionDocumentItemProcessingTypeCode>DLV</BusinessTransactionDocumentItemProcessingTypeCode>.

The GDT BusinessTransactionDocumentItemProcessingTypeCode 31800 is depicted in FIG. 318. For the GDT BusinessTransactionDocumentItemProcessingTypeCode 318, the Object Class term is Business Transaction Document Item 31802, the Property term is Processing Type 31804, the Representation/Association term is Code 31806, the Type term is CCT 31808, the Type Name term is Code 31810, and the Length is from one to four 31812.

The BusinessTransactionDocumentItemProcessingTypeCode 31800 is a customer-specific code list. In a variation, a BusinessTransactionDocumentItemProcessingTypeCode 31800 refers to a single BusinessTransactionDocumentItemTypeCode. A BusinessTransactionDocumentProcessingTypeCode may be used for business objects. The BusinessTransactionDocumentItemProcessingTypeCode 31800 can be used to control the processes relating to a document item (defined by the BusinessTransactionDocumentItemTypeCode). The following are examples of code semantics:

Delivery: DLV Standard delivery item type

Delivery: RET Standard returns item type

Sales order: TAN Standard order item type

In an illustrative examples, delivery item type, purchase order item type, order item type, or CRM/SRM item type are equivalents in R/3 and CRM/SRM. A GDT length of four was selected, in line with these.

The code differs from the BusinessTransactionDocumentItemTypeCode as follows: BusinessTransactionDocumentItemTypeCode is the coded representation of an item type in a document occurring in the context of business transactions. The document item type describes the (business) nature of document items that are similar and defines the basic properties of document items of this type. The code differs from the DeliveryTypeCode as follows: DeliveryTypeCode is the coded representation of a delivery type, which describes the business nature and basic properties of the delivery for the purposes of its logistical processing.

(jjjjjjjjj) BusinessTransactionDocumentProcessingTypeCode

The GDT BusinessTransactionDocumentProcessingTypeCode 31900 is the coded representation of the way in which a business document is processed. In a variation, the GDT BusinessTransactionDocumentProcessingTypeCode 31900 is a transaction type in the business transaction of the SAP CRM/EBP 4.0 object model. The code can control the internal behavior of a document and its structure, among other things. An example of GDT BusinessTransactionDocumentProcessingTypeCode 31900 is:

<BusinessTransactionDocumentProcessingTypeCode>DLVO</BusinessTransactionDocumentProcessingTypeCode>

The GDT BusinessTransactionDocumentProcessingTypeCode 31900 is depicted in FIG. 319. For the GDT BusinessTransactionDocumentProcessingTypeCode 31900, the Object Class term is Business Transaction Document 31902, the Property term is Processing Type 31904, the Representation/Association term is Code 31906, the Type term is CCT 31908, the Type Name term is Code 31910, and the Length is from one to four 31912.

The BusinessTransactionDocumentProcessingTypeCode 31900 is a customer-specific code list and refers to a single BusinessTransactionDocumentTypeCode. A BusinessTransactionDocumentProcessingTypeCode 31900 may be used for business objects. The BusinessTransactionDocumentProcessingTypeCode 31900 may be used to control the methods of processing a document (defined by the BusinessTransactionDocumentTypeCode). The following are examples of code semantics:

Delivery: Standard delivery type (DLVO)

Sales order: Standard order type (TA)

In a variation, delivery type, purchase order type, order type, or CRM/SRM transaction type are equivalents in R/3 and CRM/SRM. A GDT length of four was selected, in line with these.

The BusinessTransactionDocumentProcessingTypeCode 31900 differs from BusinessTransactionDocumentTypeCode as follows: BusinessTransactionDocumentTypeCode is the coded representation of a type of document occurring in the context of business transactions. The document type describes the (business) nature of documents that are very similar and defines the basic properties of documents of this type. The BusinessTransactionDocumentTypeCode is a prefix for references, among other things.

The BusinessTransactionDocumentProcessingTypeCode 31900 differs from BusinessTransactionTypeCode as follows: BusinessTransactionTypeCode is the coded representation of a business transaction type. BusinessTransactionTypeCode is cross-BTD and describes the business transaction as such.

The BusinessTransactionDocumentProcessingTypeCode 31900 differs from DeliveryTypeCode as follows: Delivery- TypeCode is the coded representation of a delivery type, which describes the business nature and basic properties of the delivery for the purposes of its logistical processing.

(kkkkkkkkk) CancellationReasonCode

The GDT CancellationReasonCode 32000 is a coded representation for the reason for a cancellation. An example (instance) for the GDT CancellationReasonCode 32000 is:

```
<ReplenishmentOrder>
    . . .
    <Item>
        <CancellationReasonCode>1</CancellationReasonCode>
    </Item>
    . . .
</ReplenishmentOrder>.
```

The GDT CancellationReasonCode 32000 is depicted in FIG. 320. For the GDT CancellationReasonCode 320, the Property term is Cancellation Reason 32002, the Representation/Association term is Code 32004, the Type term is CCT 32006, the Type Name term is Code 32008, and the Length is from one to four 32010.

In a variation, the CancellationReasonCode 32000 may be, for example, a SAP-owned code list. Illustrative values (tailored first to the logistics demand) may be as shown in the following table:

| Code | Name | Description |
|---|---|---|
| 1 | Delivery date too late | The delivery date is too late for the successful processing of the business transaction. |
| 2 | Delivery date too early | The delivery date is too early for the successful processing of the business transaction. |
| 3 | Delivery quantity too large | The delivery quantity is too large for the successful processing of the business transaction. |
| 4 | Delivery quantity too small | The delivery quantity is too small for the successful processing of the business transaction. |
| 5 | Quality of the substitute product is inadequate | The quality of the substitute product is inadequate for successful processing of the business transaction. |

For each type of BusinessTransactionDocument it may be specified which CancellationReasonCodes 32000 are permitted. The CancellationReasonCode 32000 is used to motivate a cancellation from a business point of view. A reason for the cancellation may be specified, in particular in the case of document changes on the basis of previous confirmations by the business partner.

In an example, in SAP R/3, the data element ABGRU (cancellation reason code for quotations and orders) may correspond to the CancellationReasonCode 32000.

(lllllllll) CashDiscountDeductibleIndicator

The GDT CashDiscountDeductibleIndicator 32100 specifies whether a cash discount can be deducted from something or not. That "something" may be, for example, an invoice, credit memo, purchase order, sales order, or a corresponding item. An example (instance) for the GDT CashDiscountDeductibleIndicator 32100 is:

<CashDiscountDeductibleIndicator>true</CashDiscountDeductibleIndicator>.

The GDT CashDiscountDeductibleIndicator 32100 is depicted in FIG. 321. For the GDT CashDiscountDeductibleIndicator 32100, the Property term is CashDiscountDeductible 32102, the Representation/Association term is Indicator 32104, the Type term is CCT 32106, and the Type Name term is Indicator 32108.

Illustrative values of the CashDiscountDeductibleIndicator 32100 may be as follows:

true: Discount can be deducted.

false: Discount cannot be deducted.

(for the value range, see CCT: Indicator).

CashDiscountDeductibleIndicator 32100 may be used to specify whether a cash discount can be deducted, for example, from an invoice item at the time of payment.

(mmmmmmmmm) CustomsCommodityClassificationCode

The GDT CustomsCommodityClassificationCode 32200 is a coded representation of the customs-related classification of trading goods. An example (instance) of the GDT CustomsCommodityClassificationCode 32200 is:

<CustomsCommodityClassificationCode>85281252000</CustomsCommodityClassificationCode>.

In the above example, the code stands for "Television receivers, color, with integral tube, with a screen width/height ratio kl. 1, 5, with a diagonal measurement of the screen of kl.=42 cm (excluding incorporating video-recording or reproducing apparatus and video monitors)."

The GDT CustomsCommodityClassificationCode 32200 is depicted in FIG. 322. For the GDT CustomsCommodityClassificationCode 32200, the Object Class term is Customs 32202, the Property term is CommodityClassification 32204, the Representation/Association term is Code 32206, the Type term is CCT 32208, the Type Name term is Code 32210, and the Length is between four and eleven 32212. The GDT CustomsCommodityClassificationCode 32200 may be restricted 32214.

In a variation, all character strings from four to 11 characters are allowed as value ranges. The CustomsCommodityClassificationCode 32200 may be structured as follows:

One-two characters: Chapter (for example, clothing made of woven fabric—Chapter 62)

Three-four characters: Item (for example, ladies' coats—Item 6202)

Five-six characters: Subitem Harmonized System (for example, ladies' coats made of wool—Subitem 6202 11)

Seven-eight characters: Combined Nomenclature (for example, ladies' coats made of wool, hand-made—6202 11 00)

Nine-11 characters: International and National Features (for example, ladies' coats made of wool, hand-made, ponchos—6202 11 00 0)

The basis for the first six characters of the code may be the Harmonized System (HS) that is managed by the World Customs Organization (WCO) and may provide an internationally valid classification for all trading goods. The WCO has the entry "1" in the DE3055. However, attributes such as schemeAgencyID may be optional.

In the example, the characters seven to 11 are used to classify products nationally or internationally (for example, see europa.eu.int/comm/taxation_customs/dds/en/tarhome.htm or TARIC).

The CustomsCommodityClassificationCode 32200 may be used primarily for classifying trading goods with tariff code numbers and for implementing regulatory measures.

(nnnnnnnnn) CustomsPreferentialStatementStatusCode

The GDT CustomsPreferentialStatementStatusCode 32300 is a coded representation of the status of a customs preferential statement of a vendor. An example (instance) of the GDT CustomsPreferentialStatementStatusCode 32300 is:

<CustomsPreferentialStatementStatusCode>02</CustomsPreferentialStatementStatusCode>.

The GDT CustomsPreferentialStatementStatusCode 32300 is depicted in FIG. 323. For the GDT CustomsPreferentialStatementStatusCode 32300, the Object Class term is Customs 32302, the Property term is Preferential Statement Status 32304, the Representation/Association term is Code 32306, the Type term is CCT 32308, the Type Name term is Code 32310, and the Length is two 32312. The GDT CustomsPreferentialStatementStatusCode 32300 may be a restricted GDT 32314.

In a variation, the CustomsPreferentialStatementStatusCode 32300 may have the following values:

| Code | Name | Description |
|---|---|---|
| 01 | Negative | Negative VendorDeclaration |
| 02 | Detailed Negative | Detailed Negative VendorDeclaration |
| 03 | Positive | Positive VendorDeclaration |

(ooooooooo) DeliveryTypeCode

The GDT DeliveryTypeCode 32400 is a coded representation of the type of a delivery. This type describes the (business) nature and basic features of the delivery for its logistical processing. An example (instance) of the GDT DeliveryType Code 32400 is:

<DeliveryTypeCode>0002</DeliveryTypeCode>.

The GDT DeliveryTypeCode 32400 is depicted in FIG. 324. For the GDT DeliveryTypeCode 32400, the Object Class term is Delivery 32402, the Property term is Type 32402, the Representation/Association term is Code 32406, the Type term is CCT 32408, the Type Name term is Code 32410, and the Length is four 32412.

In a variation, illustrative values may be as follows:

| Code | Name | Description |
|---|---|---|
| 0001 | Delivery of new goods | Delivery of new undamaged products or products in their original packaging with the relevant logistical handling (such as use of special transport packaging, consideration of special picking instructions). |
| 0002 | Delivery of damaged goods or new goods requiring repair | Delivery of new but damaged products or products requiring repair with the relevant logistical handling (such as use of special transport packaging, consideration of special picking instructions). |
| 0003 | Delivery of used goods | Delivery of used products with the relevant logistical handling (such as use of simple transport packaging, no consideration of picking instructions). |
| 0004 | Delivery of scrap | Delivery of products for scrapping with the relevant logistical handling (such as no use of transport packaging, no consideration of picking instructions). |

The DeliveryTypeCode 32400 describes the features of the delivery that have an affect on its logistical processing; for example, on the type and quality of the packaging, the selection of the means of transport, and the handling of the goods in transit. The DeliveryTypeCode 32400 can be used for the ascertainment of goods for inbound and outbound deliveries. It can also be used to describe return deliveries.

In a variation, if there is communication with SAP R/3, the attributes of the DeliveryTypeCode 32400 can correspond to the SAP R/3 delivery types. The GDT may be defined with four digits in accordance with the LFART (CHAR4) field.

(ppppppppp) DueClearingIndicator

The GDT DueClearingIndicator 32500 indicates whether receivables and payables are cleared against each other or not. An example (instance) of the GDT DueClearingIndicator 32500 is <DueClearingIndicator>true</DueClearingIndicator>.

The GDT DueClearingIndicator 32500 is depicted in FIG. 325. For the GDT DueClearingIndicator 32500, the Category is element 32502, the Object Class term is Due 32504, the Property term is Clearing 32506, the Representation/Association term is Indicator 32508, the Type term is CCT 32510, and the Type Name term is Indicator 32512.

In a variation, the DueClearingIndicator 32500 can have the following values:

'true' Receivables and payables are cleared against each other.

'false' Receivables and payables are not cleared against each other.

With the DueClearingIndicator 32500, the tax office can be informed in a tax return whether an existing receivable to the tax office is to be reimbursed by it or cleared against existing or future payables.

(qqqqqqqqq) KanbanCardID

The CDT KanbanCardID 32600 is a unique identifier of a kanban card. In a variation, a kanban card is a reusable card with which a production area requests material "just-in-time" from a supplying location in the context of production and material flow control (Kanban is the Japanese word for "card"). An example (instance) for the CDT KanbanCardID 32600 is:

<KanbanCardID schemeAgencyID="MPL__002"> 4711</Kanban CardID>.

In the example, schemeAgencyID="MPL__002" indicates that the scheme was assigned by the business system "MPL__002".

The CDT KanbanCardID 32600 is depicted in FIG. 326. The CDT KanbanCardID 32600 includes attribute schemeAgencyID 32616. For the CDT KanbanCardID 32600, the Object Class term is Kanban Card 32602, the Property term is Identification 32604, the Representation/Association term is Identifier 32606, the Type term is CCT 32608, the Type Name term is Identifier 32610, and the Length is from one to ten 32612. The CDT KanbanCardID 32600 may be restricted 32614.

For the schemeAgencyID 32616, the Category is attribute 32618, the Object Class term is IdentificationSchemeAgency 32620, the Representation/Association term is Identifier 32622, the Type term is xsd 32624, the Type Name term is token 32626, and the Length is from one to sixty 32628. The cardinality between the schemeAgencyID 32616 and the CDT KanbanCardID 32600 is either zero or one 32630. The schemeAgencyID 32616 is optional 32632.

KanbanCardID 32600 is an alphanumeric identifier (with no distinction between uppercase and lowercase) that is compliant with the rules for xsd: token. SchemeAgencyID is the business system in which the identifier was assigned.

KanbanCardIDs 32600 are used, for example, in purchase orders and forecast delivery schedules that have been generated within the context of kanban-based replenishment control.

Identifiers such as SchemeID may be included.

(rrrrrrrrr) Log

The CDT Log 32700 is a sequence of messages that result when an application executes a task. An example (instance) of the CDT Log 32700 is:

<Log>
<MaximumLogItemSeverityCode>3</MaximumLogItemSeverityCode>
<Item>
<TypeID>001(/CCM/)</TypeID>
<SeverityCode>3</SeverityCode>
<Note>Catalog cameras could not be published</Note>
</Item>
<Item>
<TypeID>002(/CCM/)</TypeID>
<SeverityCode>1</SeverityCode>
<Note>Catalog cell phones successfully published</Note>
</Item>
</Log>.

The CDT Log 32700 is depicted in FIG. 327. The CDT Log 32700 includes elements MaximumLogItemSeverityCode 32706 and Item 32724. For the CDT Log 32700, the Object Class term is Log 32702 and the Representation/Association term is Details 32704.

For the MaximumLogItemSeverityCode 32706, the Category is element 32708, the Object Class term is Log 32710, the Property Qualifier term is Maximum 32712, the Property term is LogItem Severity 32714, the Representation/Association term is Code 32716, the Type term is GDT 32718, and the Type Name term is LogItemSeverityCode 32720. The cardinality between the MaximumLogItemSeverityCode 32706 and the CDT Log 32700 is either zero or one 32722.

For the Item 32724, the Category is element 32726, the Object Class is Log 32728, the Property term is Item 32730, the Representation/Association term is Details 32732, the Type term is GDT 32734, and the Type Name term is LogItem 327336. The cardinality between the Item 32724 and CDT Log 32700 is one or more 32738.

MaximumLogItemSeverityCode 32706 is the coded representation of the maximum severity of a log message in a given log. Item 32724 is an individual log message (see GDT LogItem).

A Log 32700 can be used to transmit log messages with different levels of severity such as warnings and errors.

(sssssssss) NaturalPersonIndicator

The GDT NaturalPersonIndicator 32800 specifies whether the party is a natural person or not. In a variation, people are natural persons. An example (instance) of the GDT NaturalPersonIndicator 32800 is: <NaturalPersonIndicator>true</NaturalPersonIndicator>.

The GDT NaturalPersonIndicator 32800 is depicted in FIG. 328. For the GDT NaturalPersonIndicator 32800, the Property term is Natural Person 32802, the Representation/Association term is Indicator 32804, the Type term is CCT 32806, and the Type Name term is Indicator 32808.

In a variation, illustrative values of the NaturalPersonIndicator 32800 may be:

'True' The party is a natural person.

'False' The party is not a natural person.

(See the CCT: Indicator for the value range).

The GDT NaturalPersonIndicator 32800 is used to indicate that a party is a natural person or a legal person.

In a variation, the following dictionary objects are assigned to this GDT in mySAP systems:

Data element: BU_NATURAL_PERSON

Domain: BU_NATURAL_PERSON (tttttttt) PackingListID

The GDT PackingListID 32900 is a unique identifier for a packing list. In a variation, a packing list is a list of packing data for the products from one or more delivery items. The packing list may contain data for the load carriers used to pack these products (such as crates or mesh box pallets), as well as for the weight, volume and quantity of the packed products. An example (instance) of the GDT PackingListID 32900 is:

<PackingListID>XYZ1234AZ5</PackingListID>.

The GDT PackingListID 32900 is depicted in FIG. 329. For the GDT PackingListID 32900, the Object Class term is Packing List 32902, the Property term is Identification 32904, the Representation/Association term is Identifier 32906, the Type term is CCT 32908, the Type Name term is Identifier 32910, and the Length is from one to thirty-five 32912. The GDT PackingListID 32900 may be a restricted GDT 32914.

In a variation, the vendor creates packing lists for the products of one or more delivery items. These lists accompany the physical shipment but may not exist as independent documents in the application systems. The PackingListID 32900 assigned by the vendor can be used to identify the packing lists that belong to a delivery. In contrast to the HandlingUnit, which has data for packaging materials and a packing hierarchy, a packing list contains simplified, but sufficient, packing information for products from a delivery.

(uuuuuuuuu) PartyTaxID

The GDT PartyTaxID 33000 is an identifier for a taxpayer assigned by a tax authority. An example (instance) for the GDT PartyTaxID 33000 is:

<BuyerParty>
<TaxID schemeID="DE0">DE118618422</TaxID>
</BuyerParty>.

The GDT PartyTaxID 33000 is depicted in FIG. 330. The GDT PartyTaxID 33000 includes attribute schemeID 33018. For the GDT PartyTaxID 33000, the Object Class term is Party 33002, the Property Qualifier term is Tax 33004, the Property term is Identification 33006, the Representation/Association term is Identifier 33008, the Type term is CCT 33010, the Type Name term is Identifier 33012, and the Length is from one to twenty 33014. The GDT PartyTaxID 33000 may be a restricted GDT 33016.

For the schemeID 33018, the Category is attribute 33020, the Object Class term Identification Scheme 33022, the Property term is Identification 33024, the Representation/Association term is Identifier 33026, the Type term is xsd 33028, the Type Name term is token 33030, and the Length is from three to four 33032. The cardinality between the schemeID 33018 and the GDT PartyTaxID 33000 is one.

PartyTaxID 33000 contains a tax number that is up to 20 characters long. The schemeID 33018 attribute specifies what kind of tax number the tax number is. The schemeIDs 33018 may be defined in the GDT TaxIdentificationNumberTypeCode, for example, by DE0 for a German VAT registration number.

Tax numbers are used to identify taxpayers. A taxpayer may have more than one tax number, since there are various types of tax numbers. In certain countries, for example, the tax number may be provided when filing a tax return or remitting taxes, as well as on invoices.

(vvvvvvvvv) PriceSpecificationElement

The GDT PriceSpecificationElement 33100 is the specification of a price, discount or surcharge that depends on a combination of properties, and that is valid for a specific period of time. An example (instance) of the GDT PriceSpecificationElement 33100 for a special product is:

A special price of 29.99 EUR per piece (without scales) is agreed upon for the product that is represented by the identifier 4711. The price agreement is valid from Jan. 1, 2004 to Dec. 31, 2006.

(Note: In the example, TypeCode 1010 represents the specification of a special price according to GDT: PriceSpecificationElementTypeCode; unitCode C62 is one piece according to UN/ECE Recommendation 20).

```
<PriceSpecificationElement>
<TypeCode>1010</TypeCode>
<ValidityPeriod>
    <StartDate>2004-01-01</StartDate>
    <EndDate>2006-12-31</EndDate>
</ValidityPeriod>
<PropertyDefinitionClassID>SALES</PropertyDefinitionClassID>
<Property Valuation>
    <PriceSpecificationElementPropertyReference>
<PriceSpecificationElementPropertyID>PRODUCT_ID</
PriceSpecificationElementPropertyID>
    </PriceSpecificationElementPropertyReference>
    <PriceSpecificationElementPropertyValue>
        <ID>4711</ID>
    </PriceSpecificationElementPropertyValue>
</PropertyValuation>
<Price>
    <Amount currencyCode="EUR">29.99</Amount>
    <BaseQuantity unitCode="C62">1</Base Quantity>
</Price>
</PriceSpecificationElement>
```

An example (instance) of the GDT PriceSpecificationElement 33100 for the specification of a discount for a product depending on the delivery location is as follows:

The product that is represented by the identifier 4711 is granted a 5% discount for deliveries to Paris (represented by the identifier for location F75). The discount agreement is valid from Jan. 1, 2004 to Dec. 31, 2006.

(Note: In the example, TypeCode 2200 represents the specification of a discount or surcharge as a result of special properties in the master data used according to GDT PriceSpecificationElementTypeCode.)

```
<PriceSpecificationElement>
<TypeCode>2200</TypeCode>
<ValidityPeriod>
    <StartDate>2004-01-01</StartDate>
    <EndDate>2006-12-31</EndDate>
</ValidityPeriod>
<PropertyDefinitionClassID>SALES</PropertyDefinitionGlassID>
<PropertyValuation>
    <PriceSpecificationElementPropertyReference>
<PriceSpecificationElementPropertyID>PRODUCT_ID</
PriceSpecificationElementPropertyID>
    </PriceSpecificationElementPropertyReference>
    <PriceSpecificationElementPropertyValue>
        <ID>4711</ID>
    </PriceSpecificationElementPropertyValue>
</PropertyValuation>
<PropertyValuation>
    <PriceSpecificationElementPropertyReference>
<PriceSpecificationElementPropertyID>LOCATION_ID</
PriceSpecificationElementPropertyID>
    </PriceSpecificationElementPropertyReference>
    <PriceSpecificationElementPropertyValue>
        <ID>F75</ID>
    </PriceSpecificationElementPropertyValue>
</PropertyValuation>
<Percent>-5</Percent>
</PriceSpecificationElement>.
```

The GDT PriceSpecificationElement 33100 is depicted in FIG. 331. The GDT PriceSpecificationElement 33100 includes elements TypeCode 33106, ValidityPeriod 33122, PropertyDefinitionClassID 33138, PropertyValuation 33154, Price 33170, Percent 33186, FixedAmount 33102A, and ScaleLine 33118A. For the GDT PriceSpecificationElement 33100, the Object Class term is PriceSpecificationElement 33102 and the Representation/Association term is Details 33104.

For the TypeCode 33106, the Category is element 33108, the Object Class term is PriceSpecificationElement 33110, the Property term is Type 33112, the Representation/Association term is Code 33114, the Type term is GDT 33116, and the Type Name term is PriceSpecificationElementTypeCode 33118. The cardinality between the TypeCode 33106 and the GDT PriceSpecificationElement 33100 is one.

For the ValidityPeriod 33122, the Category is element 33124, the Object Class term is PriceSpecificationElement 33126, the Property term is Validity Period 33128, the Representation/Association term is Period 33130, the Type term is GDT 33132, and the Type Name term is DateTimePeriod 33134. The cardinality between the ValidityPeriod 33122 and the GDT PriceSpecificationElement 33100 is one.

For the PropertyDefinitionClassID 33138, the Category is element 33140, the Object Class term is PriceSpecificationElement 33142, the Property term is PropertyDefinitionClassIdentification 33144, the Representation/Association term is Identifier 33146, the Type term is GDT 33148, and the Type Name term is PriceSpecificationElementPropertyDefinitionClassID 33150. The cardinality between the PropertyDefinitionClassID 33138 and the GDT PriceSpecificationElement 33100 is either zero or one.

For the PropertyValuation 33154, the Category is element 33156, the Object Class term is PriceSpecificationElement 33158, the Property term is PropertyValuation 33160, the Representation/Association term is PriceSpecificationElementPropertyValuation 33162, the Type term is GDT 33164, and the Type Name term is PriceSpecificationElementPropertyValuation 33166. The cardinality between the PropertyValuation 33154 and the GDT PriceSpecificationElement 33100 is one or more.

For the Price 33170, the Category is element 33172, the Object Class term is Value 33174, the Property term is Price 33176, the Representation/Association term is Price 33178, the Type term is GDT 33180, and the Type Name term is Price 33182. The cardinality between the Price 33170 and the GDT PriceSpecificationElement 33100 is either zero or one.

For the Percent 33186, the Category is element 33188, the Object Class term is Value 33190, the Property term is Percent 33192, the Representation/Association term is Percent 33194, the Type term is GDT 33196, the Type Name term is Percent 33198. The cardinality between the Percent 33186 and the GDT PriceSpecificationElement 33100 is either zero or one.

For the FixedAmount 33102A, the Category is element 33104A, the Object Class term is Value 33106A, the Property term is Fixed amount 33108A, the Representation/Association term is Amount 33111A, the Type term is GDT 33112A, and the Type Name term is Amount 33114A. The cardinality between the FixedAmount 33102A and the GDT PriceSpecificationElement 33100 is either zero or one.

For the ScaleLine 33118A, the Category is element 33120A, the Object Class term is PriceSpecificationElement 33122A, the Property term is ScaleLine 33124A, the Representation/Association term is PriceSpecificationElementScaleLine 33126A, the Type term is GDT 33128A, and the Type Name term is PriceSpecificationElementScaleLine 33130A. The cardinality between the ScaleLine 33118A and the GDT PriceSpecificationElement 33100 is either zero or unbounded.

PriceSpecificationElement 33100 has the following elements:

TypeCode—Coded representation of the type of specification of the price, discount or surcharge.

ValidityPeriod—Validity period for the specification of the price, discount or surcharge.

PropertyDefinitionClassID—Identifier of the property definition class for which several properties are defined. It identifies the business area according to the functional unit in an enterprise, in which the specification of the price, discount or surcharge is used, and which is responsible for the respective activities (regardless of the underlying organizational structure). In a variation, permitted properties in the GDT: PriceSpecificationElement include:

| | |
|---|---|
| PURCHASE | Purchasing |
| SALES | Sales and Distribution (Sales/Service). |

PropertyValuation—Property valuation on whose combination the agreement of price, discount or surcharge depends. Permitted properties may be specified via the respective property definition class. The property valuation can identify or characterize the specification of the price, discount or surcharge. The combination of identifying property valuations may be unique for the specification of the price, discount or surcharge together with the type of specification and the end of the validity period.

Price—Specification of a price (without scales).

Percent—Specification of percent for discount or surcharge (without scales).

FixedAmount—Fixed amount for discounts or surcharges (without scales).

ScaleLine—Scale line for the specification of price, discount or surcharge.

The specification of a property definition class in the PropertyDefinitionClassID element may be optional, if the business area for specifying the price, discount or surcharge, or the respective property definition class from the application that uses the GDT: PriceSpecificationElement is known. A property definition class in the PropertyDefinitionClassID element may have higher priority than that which is known from the business area of the application.

The element PropertyValuation may contain value assignments for properties for which a property reference is defined using the property definition class that is known. In a variation, each of these property references are not be contained in more than one PropertyValuation element. At least one PropertyValuation element may be identifying, that is, with a value of "1" for PriceSpecificationElement/PropertyValuation/TypeIndicator.

In a variation, either at least one Price, Percent or FixedAmount element is specified, or at least one or more ScaleLine elements exists. If one of the Price, Percent or FixedAmount elements is specified, a ScaleLine element may not exist. If at least one ScaleLine element is specified, none of the Price, Percent or FixedAmount elements may exist. The same type for the scale rate PriceSpecificationElement/ScaleLine/Price, PriceSpecificationElement/Scale-Line/Percent or PriceSpecificationElement/ScaleLine/FixedAmount may be specified in the ScaleLine elements. Further, the number of PriceSpecificationElement/ScaleLine/AxisStep elements may correspond in the ScaleLine elements. PriceSpecificationElement/ScaleLine/AxisStep/IntervalBoundaryTypeCode may be the same in the ScaleLine elements for PriceSpecificationElement/ScaleLine/AxisStep with the same PriceSpecificationElement/ScaleLine/AxisStep/ScaleAxisBaseCode.

(wwwwwwwww) PriceSpecificationElementPropertyDefinitionClassID

The GDT PriceSpecificationElementPropertyDefinitionClassID 33200 is a unique identifier for a property definition class for specifying a price, discount or surcharge. The GDT PriceSpecificationElementPropertyDefinitionClass 33200 classifies a class for defining properties for which the specification of a price, discount, or surcharge is possible. It defines the business environment according to the functional unit in an organization in which the specification of a price, discount, or surcharge is used, and which, (regardless of the underlying organizational structure), is responsible for the respective activities. The properties defined in GDT PriceSpecificationElementPropertyDefinitionClass 33200 represent the characteristics of this business environment for the specification of a price, discount, or surcharge. An example (instance) is as follows:

```
</PriceSpecificationElementPropertyDefinitionClassID>
    SALES
</PriceSpecificationElementPropertyDefinitionClassID>.
```

The GDT PriceSpecificationElementPropertyDefinitionClassID 33200 is depicted in FIG. 332. For the GDT PriceSpecificationElementPropertyDefinitionClassID 33200, the Object Class term is PriceSpecificationElementPropertyDefinitionClass 33202, the Property term is Identification 33204, the Representation/Association term is Identifier 33206, the Type term is CCT 33208, the Type Name term is Identifier 33210, and the Length is from one to fifty 33212. The GDT PriceSpecificationElementPropertyDefinitionClassID may be a restricted GDT 33214.

For a description of ranges, see CCT Identifier above. In a variation, permitted values for GDT PriceSpecificationElementPropertyDefinitionClassID include:

| | |
|---|---|
| PURCHASE | Purchasing |
| SALES | Sales and Distribution (Sales/Service). |

(xxxxxxxxx) PricingPriceSpecificationElementPropertyID

The GDT PricingPriceSpecificationElementPropertyID 33300 is a unique identifier of a property for the specification of a price, discount or surcharge. Properties are determining elements on whose combination the agreement of a price, discount or surcharge is dependent. An example (instance) of the GDT PricingPriceSpecificationElementPropertyID 33300 is:

```
<PriceSpecificationElementPropertyID>
    PRODUCT_ID
</PriceSpecificationElementPropertyID>.
```

The GDT PricingPriceSpecificationElementPropertyID 33300 is depicted in FIG. 333. For the GDT PricingPriceSpecificationElementPropertyID 33300, the Object Class term is PriceSpecificationElementProperty 33302, the Property term is Identification 33304, the Representation/Association term is Identifier 33306, the Type term is CCT 33308, the Type Name term is Identifier 33310, and the Length is from one to thirty 33312. The GDT PricingPriceSpecificationElementPropertyID 33300 may be a restricted GDT 33314.

For illustrative values, see CCT Identifier above. The property that is described by the identifier may be unique within the PriceSpecificationElementPropertyDefinitionClass property definition class. The property can be assigned to several property definition classes.

(yyyyyyyyy) PriceSpecificationElementPropertyReference

The GDT PriceSpecificationElementPropertyReference 33400 is the unique reference of a property for the specification of a price, discount or surcharge within a property definition class. An example (instance) of the GDT PriceSpecificationElementPropertyReference 33400 is:

```
<PriceSpecificationElementPropertyReference>
    <PriceSpecificationElementPropertyID>
        PRODUCT_ID
    </PriceSpecificationElementPropertyID>
    <PriceSpecificationElementPropertyDefinitionClassID>
        SALES
    </PriceSpecificationElementPropertyDefinitionClassID>
</PriceSpecificationElementPropertyReference>.
```

The GDT PriceSpecificationElementPropertyReference 33400 is depicted in FIG. 334. The GDT PriceSpecificationElementPropertyReference 33400 includes elements PriceSpecificationElementPropertyID 33406 and PriceSpecificationElementPropertyDefinitionClassID 33422. For the GDT PriceSpecificationElementPropertyReference 33400, the Object Class term is PriceSpecificationElementPropertyReference 33402 and the Representation/Association term is Details 33404.

For the PriceSpecificationElementPropertyID 33406, the Category is element 33408, the Object Class term is PriceSpecificationElementPropertyReference 33410, the Property term is PriceSpecificationElementPropertyIdentification 33412, the Representation/Association term is Identifier 33414, the Type term is GDT 33416, and the Type Name term is PriceSpecificationElementPropertyID 33418. The cardinality between the PriceSpecificationElementPropertyID 33406 and the GDT PriceSpecificationElementPropertyReference 33400 is one.

For the PriceSpecificationElementPropertyDefinitionClassID 33422, the Category is element 33424, the Object Class term is PriceSpecificationElementPropertyReference 33426, the Property term is PriceSpecificationElementPropertyDefinitionClassIdentification 33428, the Representation/Association term is Identifier 33430, the Type term is GDT 33432, and the PriceSpecificationElementPropertyDefinitionClassID 33434. The cardinality between the PriceSpecificationElementPropertyDefinitionClassID 33422 and the GDT PriceSpecificationElementPropertyReference 33400 is either zero or one.

PriceSpecificationElementPropertyID is an identifier of a property for the specification of a price, discount or surcharge. PriceSpecificationElementPropertyDefinitionClassID is an identifier of a property definition class for the specification of a price, discount or surcharge. The referenced property is defined for a property definition class. Specification of the PriceSpecificationElementPropertyDefinitionClassID element may be optional, if the property definition class is known uniquely in the respective context.

(zzzzzzzzz) PriceSpecificationElementPropertyValuation

The GDT PriceSpecificationElementPropertyValuation 33500 is the assignment of a value to a property for the specification of a price, discount or surcharge. A property valuation may be carried out when specifying a price, discount or surcharge to determine the specification. The property valuation can identify or characterize the specification. The combination of properties with an identifying property valuation is unique together with the validity period and the type of specification. Examples of the GDT PriceSpecificationElementPropertyValuation 33500 are:

```
<PriceSpecificationElementPropertyValuation>
    <PriceSpecificationElementPropertyReference>
        <PriceSpecificationElementPropertyID>
            PRODUCT_ID
        </PriceSpecificationElementPropertyID>
        <PriceSpecificationElementPropertyDefinitionClassID>
            SALES
        </PriceSpecificationElementPropertyDefinitionClassID>
    </PriceSpecificationElementPropertyReference>
    <PriceSpecificationElementPropertyValue>
        <ID schemeID="Kuhlschranke">4711</ID>
    <PriceSpecificationElementPropertyValue>
</PriceSpecificationElementPropertyValuation>.
```

The GDT PriceSpecificationElementPropertyValuation 33500 is depicted in FIG. 335. The GDT PriceSpecificationElementPropertyValuation 33500 includes elements TypeIndicator 33506, PriceSpecificationElementPropertyReference 33522, and PriceSpecificationElementPropertyValue 33538. For the GDT PriceSpecificationElementPropertyValuation 33500, the Object Class term is PriceSpecificationElementPropertyValuation 33502 and the Representation/Association term is Details 33504.

For the TypeIndicator 33506, the Category is element 33508, the Object Class term is PriceSpecificationElementPropertyValuation 33510, the Property term is IType 33512, the Representation/Association term is Indicator 33514, the Type term is GDT 33516, and the Type Name term is Indicator 33518. The cardinality between the TypeIndicator 33506 and the GDT PriceSpecificationElementPropertyValuation 33500 is either zero or one.

For the PriceSpecificationElementPropertyReference 33522, the Category is element 33524, the Object Class term is PriceSpecificationElementPropertyValuation 33526, the Property term is PriceSpecificationElementProperty Reference 33528, the Representation/Association term is PriceSpecificationElementPropertyReference 33530, the Type term is GDT 33532, and the Type Name term is PriceSpecificationElementPropertyReference 33534. The cardinality between the PriceSpecificationElementPropertyReference 33522 and the GDT PriceSpecificationElementPropertyValuation 33500 is one 33536.

For the PriceSpecificationElementPropertyValue 33538, the Category is element 33540, the Object Class term is PriceSpecificationElementPropertyValuation 33542, the Property term is PriceSpecificationElementPropertyValue 33544, the Representation/Association term is PriceSpecificationElementPropertyValue 33546, the Type term is GDT 33548, and the Type Name term is PriceSpecificationElementPropertyValue 33550. The cardinality between the PriceSpecificationElemenPropertyValue 33538 and the GDT PriceSpecificationElementPropertyValuation 33500 is one 33552.

TypeIndicator is an indicator that specifies if the respective property valuation identifies or characterizes the specification of the price, discount or surcharge. In a variation, the values include:

| | |
|---|---|
| 1 | identifying property valuation |
| 0 | characterizing property valuation |

In a variation, the default value is "1", if the element is not used.

PriceSpecificationElementPropertyReference is a reference to the underlying property for which the property valuation should be represented.

PriceSpecificationElementPropertyValue is the value of the referenced property.

(aaaaaaaaaa) PriceSpecificationElementPropertyValue

The GDT PriceSpecificationElementPropertyValue 33600 is a value that is assigned to a property for the specification of a price, discount or surcharge. An example (instance) for the GDT PriceSpecificationElementPropertyValue 33600 is:

```
<PriceSpecificationElementPropertyValue>
    <IntegerValue>
        1
    </IntegerValue>
</PriceSpecificationElementPropertyValue>.
```

The GDT PriceSpecificationElementPropertyValue 33600 is depicted in FIG. 336. The GDT PriceSpecificationElementPropertyValue 33600 includes elements Code 33608, ID 33626, IntegerValue 33644, Date 33662, Time 33678, and Indicator 33694. For the GDT PriceSpecificationElementPropertyValue33600, the Category is element 33602, the Object Class term is PriceSpecificationElementPropertyValue 33604, and the Representation/Association term is Details 33606.

For the Code 33608, the Category is element 33610, the Object Class term is PriceSpecificationElementPropertyValue 33612, the Property term is Code 33614, the Representation/Association term is Code 33616, the Type term is CCT 33618, the Type Name term is Code 33620, and the Length is from one to fifty 33622. The cardinality between the Code 33608 and the GDT PriceSpecificationElementPropertyValue 33600 is either zero or one 33624.

For the ID 33626, the Category is element 33628, the Object Class term is PriceSpecificationElementPropertyValue 33630, the Property term is Identification 33632, the Representation/Association term is Identifier 33634, the Type term is CCT 33636, the Type Name term is Identifier 33638, and the Length is from one to fifty 33640. The cardinality between the ID 33626 and the GDT PriceSpecificationElementPropertyValue 33600 is either zero or one 33642.

For the IntegerValue 33644, the Category is element 33646, the Object Class term is PriceSpecificationElementPropertyValue 33648, the Property term is Integer Value 33650, the Representation/Association Qualifier term is Integer 33652, the Representation/Association term is Value 33654, the Type term is GDT 33656, and the Type Name term is IntegerValue 33658. The cardinality between the IntegerValue 33644 and the GDT PriceSpecificationElementPropertyValue 33600 is either zero or one 33660.

For the Date 33662, the Category is element 33664, the Object Class term is PriceSpecificationElementPropertyValue 33666, the Property term is Date 33668, the Representation/Association term is Date 33670, the Type term is GDT 33672, and the TypeName term is Date 33674.

The cardinality between the Date 33662 and the GDT PriceSpecificationElementPropertyValue 33600 is either zero or one 33676.

For the Time 33678, the Category is element 33680, the Object Class term is PriceSpecificationElementPropertyValue 33682, the Property term is Time 33684, the Representation/Association term is Time 33686, the Type term is GDT 33688, and the Type Name term is Time 33690. The cardinality between the Time 33678 and the GDT PriceSpecificationElementPropertyValue 33600 is either zero or one 33692.

For the Indicator 33694, the Category is element 33696, the Object Class term is PriceSpecificationElementPropertyValue 33698, the Property term is Indicator 33600A, the Representation/Association term is Indicator 33602A, the Type term is GDT 33604A, and the Type Name term is Indicator 33606A. The cardinality between the Indicator 33694 and the GDT PriceSpecificationElementPropertyValue 33600 is either zero or one 33608A.

The structure of the GDT PriceSpecificationElementPropertyValue 33600 represents meta-information for property values. Hence the elements of GDT PriceSpecificationElementPropertyValue represent types of actual values:

Code—Specification of the coded representation of information.

ID—Specification of the identification of an object.

IntegerValue—Specification of a discrete, integer value.

Date—Specification of a calendar day.

Time—Specification of a point in time to the nearest second (time).

Indicator—Specification of a binary logical value.

In a variation, one element from the quantity Code, ID, IntegerValue, Date, Time or Indicator may be specified. The element that is appropriate for the type of the actual value is used.

The following is an example of the use of Code:

Example: Specification of a color code, for example red metallic vehicle paint (code 0042) (Colors can be used as properties within specifications for prices, discounts or surcharges: 1000 EUR surcharge for red metallic vehicle paint (code 0042).)

The following is an example of the use of ID:

Specification of an identifier for the location, for example location of a branch office in Hamburg (ID 4711) or Paris (ID 4712) (Identifiers for the location can be used as properties within specifications for prices, discounts or surcharges: 5% discount for deliveries to the branch office in Hamburg (ID 4711), 100 EUR surcharge for deliveries to the branch office in Paris (ID 4712).)

The following is an example of the use of IntegerValue:

Valuation of non-dimensional, integer properties, such as codes, indexes, consecutive numbers.

The following is an example of the use of Date:

Expiry date, sell-by date, date of manufacturing, filling or packaging, date of release, locking, order or delivery, and so on.

The following is an example of the use of Time:

Timestamp for specification to the nearest second of when a product is filled, produced, or certified, and so on.

The following is an example of the use of Indicator:

Properties with only two statuses: yes/no, on/off, and so on.

(bbbbbbbbbb) PriceSpecificationElementScaleLine

The GDT PriceSpecificationElementScaleLine 33700 is a scale line for the specification of a price, discount or surcharge. A single or two dimensional scale can be used when specifying a price, discount or surcharge. The scale comprises scale lines that define a price, discount or surcharge for each scale step. An example (instance) of the GDT PriceSpecificationElementScaleLine 33700 for the scale line for the specification of a price is as follows:

The scale is a one-dimensional 'from' price scale. The price is 29.99 EUR per piece from 10 pieces.

(Note: ScaleAxisBaseCode 1 represents a quantity according to GDT: ScaleAxisBaseCode;

IntervalBoundaryTypeCode 1 represents a 'from' price scale according to GDT: ScaleAxisStepIntervalBoundaryTypeCode;

unitCode C62 is one piece according to UN/ECE Recommendation 20.)

```
<PriceSpecificationElementScaleLine>
<ScaleAxisStep>
    <ScaleAxisBaseCode>1</ScaleAxisBaseCode>
    <IntervalBoundaryTypeCode>1</IntervalBoundaryTypeCode>
    <Quantity unitCode="C62">10</Quantity>
</ScaleAxisStep>
<Price>
    <Amount currencyCode="EUR">29.99</Amount>
    <BaseQuantity unitCode="C62">1</BaseQuantity>
</Price>
</PriceSpecificationElementScaleLine>.
```

The GDT PriceSpecificationElementScaleLine 33700 is depicted in FIG. 337. The GDT PriceSpecificationElementScaleLine 33700 includes elements ScaleAxisStep 33706, Price 33722, Percent 33738, and FixedAmount 33754. For the GDT PriceSpecificationElementScaleLine 33700, the Object Class term is PriceSpecificationElementScaleLine 33702 and the Representation/Association term is Details 33704.

For the ScaleAxisStep 33706, the Category is element 33708, the Object Class term is PriceSpecificationElementScaleLine 33710, the Property term is ScaleAxisStep 33712, the Representation/Association term is ScaleAxisStep 33714, the Type term is GDT 33716, and the Type Name term is ScaleAxisStep 33718. The cardinality between the ScaleAxisStep 33706 and the GDT PriceSpecificationElementScaleLine 33700 is either one or two 33720.

For the Price 33722, the Category is element 33724, the Object Class term is PriceSpecificationElementScaleLine 33726, the Property term is Price 33728, the Representation/Association term is Price 33730, the Type term is GDT 33732, and the Type Name term is Price 33734. The cardinality between the Price 33722 and the GDT PriceSpecificationElementScaleLine 33700 is either zero or one 33736.

For the Percent 33738, the Category is element 33740, the Object Class term is PriceSpecificationElementScaleLine 33742, the Property term is Percent 33744, the Representation/Association term is Percent 33746, the Type term is GDT 33748, and the Type Name term is Percent 33750. The cardinality between the Percent 33738 and the GDT PriceSpecificationElementScaleLine 33700 is either zero or one 33752.

For the FixedAmount 33754, the Category is element 33756, the Object Class term is PriceSpecificationElementScaleLine 33758, the Property term is FixedAmount 33760, the Representation/Association term is Amount 33762, the Type term is GDT 33764, and the Type Name term is Amount 33766. The cardinality between the FixedAmount 33754 and the GDT PriceSpecificationElementScaleLine 33700 is either zero or one 33768.

GDT PriceSpecificationElementScaleLine 33700 has the following elements:

ScaleAxisStep—Axis Step (scale dimension value) of a dimension of the scale step for which the scale line is defined for the specification of a price, discount or surcharge.

Price—Scale rate as specification of a price.

Percent—Scale rate for specifying the percent for discounts or surcharges.

FixedAmount—Scale rate for specifying a fixed amount for discounts or surcharges.

In a variation, the same PriceSpecificationElementScaleLine/ScaleAxis-Step/ScaleAxisBaseCode is not be specified for different PriceSpecificationElementScaleLine/AxisStep elements. One of the Price, Percent or FixedAmount elements may exist. If an element that is classified by the GDT PriceSpecificationElementScaleLine has cardinality >1, the same type may be specified in all instances for the scale rate Price, Percent or FixedAmount. If an element that is classified by the GDT PriceSpecificationElementScaleLine has cardinality >1, the PriceSpecificationElementScaleLine/ScaleAxisStep elements may be specified in all instances with the same number of and the same characteristics for PriceSpecificationElementScaleLine/ScaleAxis-Step/ScaleAxisBaseCode.

For additional usage information for PriceSpecificationElementScaleLine 33700 see GDT PriceSpecificationElement above.

(cccccccccc) PriceSpecificationElementTypeCode

The GDT PriceSpecificationElementTypeCode 33800 is the coded representation of the type of specification of a price, discount or surcharge. An example (instance) of the GDT PriceSpecificationElementTypeCode 33800 is:

Specifies a special % or absolute discount based on the 50$^{th}$ anniversary of a company:

```
<PriceSpecificationElementTypeCode>
    2310
</PriceSpecificationElementTypeCode>.
```

The GDT PriceSpecificationElementTypeCode 33800 is depicted in FIG. 338. For the GDT PriceSpecificationElementTypeCode 33800, the Object Class term is PriceSpecificationElement 33802, the Property term is Type 33804, the Representation/Association term is Code 33806, the Type term is CCT 33808, the Type Name term is Code 33810, and the Length is four 33812. The GDT PriceSpecificationElementTypeCode 33800 may be a restricted GDT 33814.

In a variation, illustrative possible properties of the GDT PriceSpecificationElementTypeCode are as shown in the following table:

| Code | Name | Description |
|---|---|---|
| 1000 | Price | Specifies a price (not specified further) |
| 1010 | Special Price | Specifies a special price (not specified further)<br>E.g.: Price entered manually |
| 1100 | Basic Price | Specifies a basic price (not specified further)<br>E.g.: Catalog price, price from a price list, price per quantity |

-continued

| Code | Name | Description |
|---|---|---|
| 1110 | Recommended Price | Specifies a price based on a recommended price<br>E.g.: Recommended retail price |
| 1120 | Price Requirement | Specifies a price based on a price requirement<br>E.g.: Cost price |
| 1200 | Price Property | Specifies a price based on special properties of the master data used (not specified further) |
| 1210 | Partner Group Price | Specifies a price based on group membership of the business partner.<br>E.g.: Price for a major customer, price for a vendor or customer group |
| 1220 | Product Group Price | Specifies a price based on group membership of the product<br>E.g.: OEM price, special price for a product or price group |
| 1230 | Product Configuration Price | Specifies a price based on a specific product configuration<br>E.g.: Special price for metallic paint, for size "XL", or a special edition |
| 1300 | Promotion Price | Specifies a price based on a promotion (not specified further) |
| 1310 | Event Price | Specifies a price based on a one-time sales event that is restricted to a certain time period<br>E.g.: Branch opening price, anniversary price |
| 1320 | Periodic Promotion Price | Specifies a price based on a recurring promotion that is restricted to a certain time period<br>E.g.: Christmas price, Easter sales promotion, summer sale |
| 1400 | Business Process Price | Specifies a price based on business processes that deviate from the business standard (not specified further) |
| 1410 | Value Limit Price | Specifies a price for a quantity of a product or the total document as a result of exceeding or falling short of a value limit<br>E.g.: Reserve price, minimum sales order value |
| 1420 | Quantity Limit Price | Specifies a price for the quantity of a product or the total document as a result of exceeding or falling short of a quantity limit<br>E.g.: Pallet price |
| 1430 | Agreement Price | Specifies a price for the quantity of a product or the total document as a result of a binding agreement, for example when ordering or when signing a contract<br>E.g.: Contract price |
| 2000 | Discount/ Surcharge | Specifies a discount or surcharge (not specified further) |
| 2010 | Special Discount/ Surcharge | Specifies a special discount or surcharge (not specified further)<br>E.g.: Discount entered manually |
| 2100 | Base Value Discount/ Surcharge | Specifies a base value discount or surcharge (not specified further)<br>E.g.: Absolute discount, discount from a price list |
| 2200 | Property Discount/ Surcharge | Specifies a discount or surcharge based on special properties of the master data used (not specified further) |
| 2210 | Partner Group Discount/ Surcharge | Specifies a discount or surcharge based on the group membership of the business partner<br>E.g.: Major customer discount, special discount for a vendor or customer group |
| 2220 | Product Group Discount/ Surcharge | Specifies a discount or surcharge based on the group membership of the product<br>E.g.: OEM surcharge for a product, special discount for a product or price group |
| 2230 | Product Configuration Discount/ Surcharge | Specifies a discount or surcharge based on product configuration<br>E.g.: Surcharge for metallic paint, surcharge for size "XL", discount for a special edition |
| 2300 | Promotion Discount/ Surcharge | Specifies a discount or surcharge based on a promotion (not specified further) |
| 2310 | Event Discount/ Surcharge | Specifies a discount or surcharge based on a one-time sales event that is restricted to a certain time period. E.g.: Branch opening discount, anniversary discount |
| 2320 | Periodic Promotion Discount/ Surcharge | Specifies a discount or surcharge based on a recurring promotion that is restricted to a certain time period<br>E.g.: Christmas discount, Easter promotion, anniversary discount |
| 2340 | Coupon Discount/ Surcharge | Specifies a discount or surcharge based on a coupon or voucher<br>E.g.: Coupon that is valid for manufacturer sales promotion |
| 2400 | Business Process Discount/ Surcharge | Specifies a discount or surcharge based on business processes that deviate from the business standard (not specified further) |

-continued

| Code | Name | Description |
|---|---|---|
| 2410 | Value Limit Discount/ Surcharge | Specifies a discount or surcharge for the quantity of a product or the total document as a result of exceeding or falling short of the value limit E.g.: Minimum sales order value surcharge |
| 2420 | Quantity Limit Discount/ Surcharge | Specifies a price for a quantity of a product or the total document as a result of exceeding or falling short of the quantity limit E.g.: Pallet discount, surcharge for incomplete pallet |
| 2430 | Agreement Discount/ Surcharge | Specifies a discount or surcharge for the quantity of a product or the total document as a result of a binding agreement, for example when ordering or when signing a contract E.g.: Contract discount |
| 2500 | Calculative Processing Discount/ Surcharge | Specifies a discount or surcharge based on special calculative processing (not specified further) |
| 2510 | Free Goods | Specifies a discount based on free goods E.g.: 100% discount |
| 2520 | Rounding Difference | Specifies a discount or surcharge based on the clearing of rounding differences |
| 4000 | Transport Costs | Specifies transport costs (not specified further) |
| 4100 | Packaging | Specifies packaging (not further specified) |
| 4200 | Freight | Specifies freight (not further specified) |
| 5100 | Customs Duty | Specifies customs duty (not further specified) |
| 6000 | Terms of Payment | Specifies special terms of payment (not specified further) |
| 6100 | Cash Discount | Cash Discount (not specified further) |

The semantics for grouping code list entries are not fixed.

In a variation, the GDT PriceSpecificationElementTypeCode 33800 may be a proprietary code list with fixed predefined values. In that case, changes to the permitted values may involve changes to the interface.

In a variation, related standardized code list, such as Price.Type.Code (UN/CEFACT 5375), or Price.Specification.Code (UN/CEFACT 5387) are not used, as their semantics may differ. In the first case, categorization according to particular specifications takes on importance for the quality of products, while in the second case, it is the business circumstances leading to the determination of prices that are important.

(dddddddddd) ProductAttributeGroupID

The GDT ProductAttributeGroupID 33900 is a unique identifier for a product attribute group. In a variation, a product attribute group may arrange product attributes together in a group to describe the characteristics of a product and enables attributes that are associated with each other to be maintained together. See for example, SapTerm: Set Type at help.sap.com/saphelp_crm40srl/helpdata/de/35/2cd77bd7705394e 10000009b387c12/frameset.htm.

An example (instance) of the GDT ProductAttributeGroupID 33900 is:

<ProductAttributeGroupID>SERVICEPLAN</ProductAttributeGroupID>.

The GDT ProductAttributeGroupID 33900 is depicted in FIG. 339. For the GDT ProductAttributeGroupID 33900, the Object Class term is Product AttributeGroup 33902, the Property term is Identification 33904, the Representation/Association term is Identifier 33906, the Type term is CCT 33908, the Type Name term is Identifier 33910, and the Length is from one to sixteen 33912. The GDT ProductAttributeGroupID may be a restricted GDT 33914.

For GDT ProductAttributeGroupID 33900, alphanumeric character strings may be used. The GDT ProductAttributeGroupID 33900 may be used in business objects and their replication messages. Attributes stored in a product attribute group can be assigned to several products and can therefore be re-used. Product attributes may be grouped according to subjective business criteria. In an example, a product attribute group is for administrative attributes such as Date and Created by. In another example, a product attribute group is for units of measure and their conversion factors to the base unit of measure.

In a variation, in SAP product master, the ProductAttributeGroupID is represented by the data element COMT_FRGTYPE_ID.

(eeeeeeeeee) PromotionInternalID

The GDT PromotionInternalID 34000 is a proprietary identifier for a promotion. In a variation, a promotion may be a marketing activity between the consumer goods industry and retail for a limited time period to increase brand equity, product awareness, and market share, to boost sales volumes, or to position new products or product groups. Examples of the GDT PromotionInternalID 34000 are:

<PromotionInternalID schemeAgencyID="MPL__002">1C743CEC501F6A4D</PromotionInternalID> schemeAgencyID="MPL__002" indicates that the scheme was assigned by the business system "MPL__002".

The GDT PromotionInternalID 34000 is depicted in FIG. 340. The GDT PromotionInternalID 34000 includes attribute schemeAgencyID 34018. For the GDT PromotionInternalID 34000, the Object Class term is Promotion 34002, the Property Qualifier term is Internal 34004, the Property term is Identification 34006, the Representation/Association term is Identifier 34008, the Type term is GDT 34010, the Type Name term is PromotionID 34012, and the Length is from one to thirty-five 34014. The GDT PromotionInternalID may be a restricted GDT 34016.

For the schemeAgencyID 34018, the Category is attribute 34020, the Object Class term is IdentificationSchemeAgency 34022, the Property term is Identification 34024, the Representation/Association term is Identifier 34026, the Type term is xsd 34028, the Type Name term is Token 34030, and the Length is from one to sixty 34032. The cardinality between the schemeAgencyID 34018 and the GDT PromotionInternalID 34000 is either zero or one 34034.

The schemeAgencyID 34018 attribute identifies the business system in which the identifier was assigned. The GDT PromotionInternalID 34000 is a projection of the GDT PromotionID that contains the schemeAgencyID attribute for describing an internally assigned ID. If an attribute is not specified explicitly in the use of the GDT, it may be specified through the context.

The PromotionInternalID 34000 may be used when both sender and recipient have access to shared master data; for example, during internal communication in an enterprise.

(ffffffffff) PromotionPartyID

The GDT PromotionPartyID 34100 is an identifier for a promotion assigned by a party. In a variation, a promotion may be a marketing activity between the consumer goods industry and retail for a limited time period to increase brand equity, product awareness, and market share, to boost sales volumes, or to position new products or product groups. An example (instance) of the GDT PromotionPartyID 34100 is:

<PromotionVendorID>B232-6HS</PromotionVendorID>.

The GDT PromotionPartyID 34100 is depicted in FIG. 341. For the GDT PromotionPartyID 34100, the Object Class term is Promotion 34102, the Property Qualifier term is Party 34104, the Property term is Identification 34106, the Representation/Association term is Identifier 34108, the Type term is GDT 34110, the Type Name term is PromotionID 34112, and the Length is from one to thirty-five 34114. The GDT PromotionPartyID 34100 may be a restricted GDT 34116.

The PromotionPartyID may be a proprietary identifier. In the context of a message, the expression "Party" in PromotionPartyID may be replaced by the role of the party assigning the identifier; for example, PromotionSellerID if the identifier for the promotion is assigned by the SellerParty. When there is a need to distinguish between several schemes, schemeID and schemeVersionID may be included as attributes.

(gggggggggg) ReceivedQuantityAccumulation

The GDT ReceivedQuantityAccumulation 34200 are values for cumulated received quantities. An example (instance) of the GDT ReceivedQuantityAccumulation 34200 is:

```
<ReceivedQuantityAccumulation>
  <ReferencePeriod>
    <StartDateTime>2004-01-01T00:00:00Z</StartDateTime>
    <EndDateTime>2004-12-31T23:59:59Z </EndDateTime>
  </ReferencePeriod>
  <Quantity unitCode="CT">10000</Quantity>
  <ReconciliationDateTime>2005-01-01T00:00:00Z</
ReconciliationDateTime>
  <ReconciliationQuantity unitCode="CT">0</ReconciliationQuantity>
</ReceivedQuantityAccumulation>.
```

The GDT ReceivedQuantityAccumulation 34200 is depicted in FIG. 342. The GDT ReceivedQuantityAccumulation 34200 includes elements ReferencePeriod 34208, Quantity 34224, ReconciliationDateTime 34242, and ReconciliationQuantity 34258. For the GDT ReceivedQuantityAccumulation 34200, the Object Class term is Received Quantity Accumulation 34202, the Property term is Details 34204, and the Representation/Association term is Details 34206.

For the ReferencePeriod 34208, the Category is Element 34210, the Object Class term is Received Quantity Accumulation 34212, the Property term is ReferencePeriod 34214, the Representation/Association term is Details 34216, the Type term is GDT 34218, and the Type Name term is DateTimePeriod 34220. The cardinality between the ReferencePeriod 34208 and the GDT ReceivedQuantityAccumulation 34200 is either zero or one 34222.

For the Quantity 34224, the Category is Element 34226, the Object Class term is Received Quantity Accumulation 34228, the Property term is Quantity 34230, the Representation/Association term is Quantity 34232, the Type term is GDT 34234, the Type Name term is Quantity 34236, and the Length is thirteen digits with six post decimal digits 34238. The cardinality between the Quantity 34224 and the GDT ReceivedQuantityAccumulation 34200 is one 34240.

For the ReconciliationDateTime 34242, the Category is Element 34244, the Object Class term is Received Quantity Accumulation 34246, the Property term is Reconciliation 34248, the Representation/Association term is DateTime 34250, the Type term is GDT 34252, and the Type Name term is DateTime 34254. The cardinality between the ReconciliationDateTime 34242 and the GDT ReceivedQuantityAccumulation 34200 is either zero or one 34256.

For the ReconciliationQuantity 34258, the Category is Element 34260, the Object Class term is Received Quantity Accumulation 34262, the Property term is Reconciliation 34264, the Representation/Association term is Quantity 34266, the Type term is GDT 34268, and the Type Name term is Quantity 34270. The cardinality between the ReconciliationQuantity 34258 and the GDT ReceivedQuantityAccumulation 34200 is either zero or one 34272.

ReferencePeriod is a reference period for the accumulation.

Quantity is the received quantity that has been cumulated in the specified reference period up until the time that comes from the use context of the GDT. This quantity value is also described as the "cumulative received quantity" in certain industries.

ReconciliationDateTime is the time of completion of the accumulation, which can differ from the end date of the reference period. This time value is also described as the "reconciliation date" in certain industries. When the accumulation is completed for the ReconciliationDateTime, the accumulation quantity may be reset or set to zero. For example, several deliveries of goods are arranged in a calendar year (=period). The last delivery for this period takes place on December 22, however (=ReconciliationDateTime). A further delivery, which arrives on December 30 (therefore, after the reconciliation date), must then be added to the following calendar year as a new accumulation period.

ReconciliationQuantity is the accumulated received quantity at the end of the reference period in accordance with the time specified in the ReconciliationDateTime. This quantity, which is also called "agreed cumulative quantity" in specific industries, may be used for the legally binding fixing of the received quantities at the sold-to party.

If the ReferencePeriod is not specified explicitly, the reference period for the accumulation may come from the use context of the GDT. This can be set up, for example, using a reference to a contract item (such as SchedulingAgreementReference). The ReconciliationDateTime may be used together with the ReconciliationQuantity. If the ReconciliationDateTime has not been specified, the ReconciliationQuantity refers to the end time of the ReferencePeriod.

The ReceivedQuantityAccumulation may be used for information purposes and for the (legally binding) synchronization of the goods recipient's received goods and the vendor's shipped goods. The transmission of cumulated quantity values may be used, in particular, in release orders or forecast delivery schedules (DeliveryScheduleNotification) in the high-tech and automotive industry.

Additional values for the cumulated received quantities, for instance, for the affected products and parties, may be described in the use context of the GDT.

(hhhhhhhhhh) ReleasedIndicator

The GDT ReleasedIndicator 34300 specifies whether something is released or not. The word "something" as used above may stand for an object. An example (instance) of the GDT ReleasedIndicator 34300 is: <ReleasedIndicator>true</ReleasedIndicator>.

The GDT ReleasedIndicator 34300 is depicted in FIG. 343. For the GDT ReleasedIndicator 34300, the Property term is Released Indicator 34302, the Representation/Association term is Indicator 34304, the Type term is CCT 34306, and the Type Name term is Indicator 34308.

In a variation, the values of the ReleasedIndicator may include:

'True' Something is released

'False' Something is not released

The ReleasedIndicator may be used for identifying objects that, for example, are explicitly released or not released through a validation for processes. In the context of use, a description may be given as to which object the Released-Indicator refers. Something that is not released can still be active from a business point of view.

(iiiiiiiiii) RelevanceIndicator

The GDT RelevanceIndicator 34400 indicates whether or not something is to be considered. The word "something" as used above may refer to specific objects, procedures, actions or transactions. An Example (Instance) of the GDT RelevanceIndicator is:

<PlanningRelevanceIndicator>true</PlanningRelevance-Indicator>.

The GDT RelevanceIndicator 34400 is depicted in FIG. 344. For the GDT RelevanceIndicator 34400, the Property term is Relevance 34402, the Representation/Association term is Indicator 34404, and the Type term is CCT: Indicator 34406.

In a variation, the RelevanceIndicator may have the following attributes:

True: Something is to be considered

False: Something is not to be considered.

For additional description of the value for RelevanceIndicator, see CCT: Indicator above.

For each RelevanceIndicator 34400, precise details may be given of what is or is not to be considered. A naming prefix (qualifier) may be used for this purpose. For example, the following qualifiers may be used:

PlanningRelevanceIndicator: The PlanningRelevance-Indicator specifies whether or not something is to be considered during planning.

ConfirmationRelevanceIndicator: The ConfirmationRelevanceIndicator indicates whether or not something is confirmation-relevant.

The RelevanceIndicator can be used to indicate that an order item is to be considered during a requirement calculation.

(jjjjjjjjjj) ReturnsIndicator

The GDT ReturnsIndicator 34500 specifies whether or not something is returned. An example (instance) of the GDT ReturnsIndicator 34500 is:

<ReturnsIndicator>true</ReturnsIndicator>.

The GDT ReturnsIndicator 34500 is depicted in FIG. 345. For the GDT ReturnsIndicator 34500, the Property term is Returns 34502, the Representation/Association term is Indicator 34504, and the Type term is CCT: Indicator 34506.

The ReturnsIndicator 34500 may have the following attributes:

True: This is a return.

False: This is not a return.

For additional description of the value for ReturnsIndicator, see CCT: Indicator above.

The ReturnsIndicator can be used in requirements planning to indicate whether or not the order item in question is a return.

(kkkkkkkkkk) ReturnMaterialAuthorisationID

The GDT ReturnMaterialAuthorisationID 34600 is a unique identifier for authorizing the return of a product (of the type material). An example (instance) of the GDT ReturnMaterialAuthorisationID is:

<ReturnMaterialAuthorisationID>XYZ1234AZ5</ReturnMaterialAuthorisationID>.

For the GDT ReturnMaterialAuthorisationID 34600, the Object Class term is Return Material Authorization 34602, the Property term is Identification 34604, the Representation/Association term is Identifier 34606, the Type term is CCT 34608, the Type Name term is Identifier 34610, and the Length is from one to twenty 34612.

For additional information on the values for GDT ReturnMaterialAuthorisationID 34600, see CCT: Identifier above.

The ReturnMaterialAuthorisationID may be assigned by the goods recipient—in the case of third-party deals, also by the original buyer or ordering party. The party performing the (return) delivery may use the ReturnMaterialAuthorisationID to prove authorization for the return of the material; for example, when a return delivery is announced via the DespatchedDeliveryNotification message.

(llllllllll) RevocationIndicator

The GDT RevocationIndicator 34700 indicates whether something is revoked or not. The word "something" used above generally describes, for example, a legally binding statement, agreement or authority. An example (instance) of the GDT RevocationIndicator 34700 is:

<CollectionAuthorisationRevocationIndicator>true
</CollectionAuthorisationRevocationIndicator>.

The GDT RevocationIndicator 34700 is depicted in FIG. 347. For the GDT RevocationIndicator 34700, the Category is Element 34702, the Property term is Revocation 34704, the Representation/Association term is Indicator 34706, the Type term is CCT 34708, and the Type Name term is Indicator 34710.

In a variation, the RevocationIndicator can include the following values:

| | |
|---|---|
| 'true' | Something is revoked |
| 'false' | Something is not revoked |

The RevocationIndicator 34700 can be used, for example, in a tax return or purchase order to display whether or not a collection authorization is revoked.

The context of an interface may contain a description of what is revoked with the RevocationIndicator 34700. This may be reflected in an appropriate prefix such as "CollectionAuthorisation".

(mmmmmmmmmm) ScaleAxisStep

The GDT ScaleAxisStep 34800 is a step (scale dimension value) of a scale axis. A dimension of the definition area of a scale is known as a scale axis. It may be defined as a scale dimension. That is, it may be defined via the completeness of the specified (discrete) scale dimension values as steps. The combination of one step of each scale axis makes up the scale step. An example (instance) of the GDT ScaleAxisStep 34800 is:

Axis step of a (one-dimensional) 'from' quantity scale:

The scale axis has the scale base type "quantity". The axis step amounts to 10 pieces.

(Note:

ScaleAxisBaseCode 1 represents a quantity according to GDT: ScaleAxisBaseCode;

IntervalBoundaryTypeCode 1 represents the lower limit of an interval (from the scale dimension value under consideration to the next highest scale dimension value, but excluding the next highest scale dimension value) according to the GDT: ScaleAxisStepIntervalBoundaryTypeCode;

unitCode C62 is one piece according to UN/ECE Recommendation 20.)

```
<ScaleAxisStep>
    <ScaleAxisBaseCode>1</ScaleAxisBaseCode>
    <IntervalBoundaryTypeCode>1</IntervalBoundaryTypeCode >
    <Quantity unitCode="C62">10</Quantity>
</ScaleAxisStep>.
```

The GDT ScaleAxisStep 34800 is depicted in FIG. 348. The GDT ScaleAxisStep 34800 includes elements ScaleAxisBaseCode 34806, IntervalBoundaryTypeCode 34822, Amount 34838, Quantity 34854, DecimalValue 34870, and IntegerValue 34886. For the GDT ScaleAxisStep 34800, the Object Class term is ScaleAxisStep 34802, and the Representation/Association term is Details 34804.

For the ScaleAxisBaseCode 34806, the Category is Element 34808, the Object Class term is ScaleAxisStep 34810, the Property term is ScaleAxisBase 34812, the Representation/Association term is Code 34814, the Type term is GDT 34816, and the Type Name term is ScaleAxisBaseCode 34818. The cardinality between the ScaleAxisBaseCode 34806 and the GDT ScaleAxisStep 34800 is one 34820.

For the IntervalBoundaryTypeCode 34822, the Category is Element 34824, the Object Class term is ScaleAxisStep 34826, the Property term is Interval Boundary Type 34828, the Representation/Association term is Code 34830, the Type term is GDT 34832, and the Type Name term is ScaleAxisStepIntervalBoundaryTypeCode 34834. The cardinality between the IntervalBoundaryTypeCode 32822 and the GDT ScaleAxisStep 34800 is one 34836.

For the Amount 34838, the Category is Element 34840, the Object Class term is ScaleAxisStep 34842, the Property term is Amount 34844, the Representation/Association term is Amount 34846, the Type term is GDT 34848, and the Type Name term is Amount 34850. The cardinality between the Amount 34838 and the GDT ScaleAxisStep 34800 is either zero or one 34852.

For the Quantity 34854, the Category is Element 34856, the Object Class term is ScaleAxisStep 34858, the Property term is Quantity 34860, the Representation/Association term is Quantity 34862, the Type term is GDT 34864, and the Type Name term is Quantity 34866. The cardinality between the Quantity 34854 and the GDT ScaleAxisStep 34800 is either zero or one 34868.

For the DecimalValue 34870, the Category is Element 34872, the Object Class term is ScaleAxisStep 34874, the Property term is DecimalValue 34876, the Representation/Association term is DecimalValue 34878, the Type term is GDT 34880, and the Type Name term is DecimalValue 34882. The cardinality between the DecimalValue 34870 and the GDT ScaleAxisStep 34800 is either zero or one 34884.

For the IntegerValue 34886, the Category is Element 34888, the Object Class term is ScaleAxisStep 34890, the Property term is IntegerValue 34892, the Representation/Association term is IntegerValue 34894, the Type term is GDT 34896, and the Type Name term is IntegerValue 34898. The cardinality between the IntegerValue 34886 and the GDT ScaleAxisStep 34800 is either zero or one 34800A.

ScaleAxisStep 34800 has the following elements: ScaleAxisBaseCode is the coded representation of the scale base type of the scale axis; IntervalBoundaryTypeCode is the coded representation for the classification of the step (that is the discrete scale dimension value) as an interval boundary; Amount is the scale dimension value of the axis step as an amount; Quantity is the scale dimension value of the axis step as a quantity; DecimalValue is the scale dimension value of the axis step as the numeric value in decimal representation; IntegerValue is the scale dimension value of the axis step as the numeric value in decimal representation without decimal places.

ScaleAxisStep may contain one of the Amount, Quantity, DecimalValue or IntegerValue elements. The element appropriate for the scale dimension value may be used. ScaleAxisBaseCode may correspond to the same scale axis for all axis steps. For additional description on the use of ScaleAxisStep, see GDT: PriceSpecificationElementScaleLine.

(nnnnnnnnnn) SearchText

The GDT SearchText 34900 is a text that is searched for within a particular data content. The word "text" here refers to, for example, a character string. It can also contain special characters (*, ', ", etc.) to control the search. An Example of the GDT SearchText is:

<SearchText>Peter Müller</SearchText>.

The GDT SearchText 34900 is depicted in FIG. 349. For the GDT SearchText 34900, the Representation/Association Qualifier term is Search 34902, the Representation/Association term is Text 34904, the Type term is xsd 34906, and the Type Name term is string 34908. In a variation, there is no restriction on the length of the SearchText.

The SearchText can be used to look for instances of a given business object. For example, the SearchText "Peter Müller" can be used to find the invoices made from a company to the customer "Peter Müller". The data content in this case consists of attributes of the invoice object and attributes of the associated customer object.

In a variation, SearchText is a generic selection field of a query core service within SAP Enterprise Service Infrastructure (ESI).

(oooooooooo) SerialID

The GDT SerialID 35000 (serial number) is a unique identifier for an individual item that is assigned in the context of production. The "individual item" may be the instance of a product. The identifier of a product instance may be unique in the context of a product or a product category. For that reason, the SerialID may be the same for instances of different products. An example (instance) of the GDT SerialID is:

Identification of a vehicle number (vehicle identification number)

<SerialID>WVWZZZ1JZYP1749179</SerialID>.

The GDT SerialID 35000 is depicted in FIG. 350. For the GDT SerialID 35000, the Property term is Serial Identification 35002, the Representation/Association term Identifier 35004, the Type term is CCT 35006, the Type Name term is Identifier 35008, and the Length is from one to thirty 35010. The GDT SerialID may be a restricted GDT 35012.

A SerialID is an alphanumeric identifier (with may have no distinction between uppercase and lowercase) that is assigned to a product instance for its lifetime. For that reason, in a variation, it is not be assigned again to another instance of the same product during the (anticipated) lifetime of the product instance. The SerialID may be specified in connection with the related product identification ("product number" or "product category") because the combination of product identification and SerialID may be unique.

A SerialID may be used in addition to the product identification if individual items of the product are to be identified or must be identified. Serial numbers can be used for industry and consumer products and also, for example, for banknotes. In contrast to the equipment or asset number, the serial number is assigned and transmitted in the context of production.

(pppppppppp) ShippedQuantityAccumulation

The GDT ShippedQuantityAccumulation 35100 are values for cumulated shipped quantities. An example (instance) of the GDT ShippedQuantityAccumulation 35100 is:

```
<ShippedQuantityAccumulation>
    <ReferencePeriod>
        <StartDateTime>2004-01-01T00:00:00Z</StartDateTime>
        <EndDateTime>2004-12-31T23:59:59Z </EndDateTime>
    </ReferencePeriod>
    <Quantity unitCode="CT">10000</Quantity>
</ShippedQuantityAccumulation>.
```

The GDT ShippedQuantityAccumulation 35100 is depicted in FIG. 351. The GDT ShippedQuantityAccumulation 35100 includes elements ReferencePeriod 35108 and Quantity 35124. For the GDT ShippedQuantityAccumulation 35100, the Object Class term is Shipped Quantity Accumulation 35102, the Property term is Details 35104, and the Representation/Association term is Details 35106.

For the ReferencePeriod 35108, the Category is Element 35110, the Object Class term is Shipped Quantity Accumulation 35112, the Property term is ReferencePeriod 35114, the Representation/Association term is Details 35116, the Type term is GDT 35118, and the Type Name term is DateTimePeriod 35120. The cardinality between the ReferencePeriod 35108 and the GDT ShippedQuantityAccumulation 35100 is either zero or one 35122.

For the Quantity 35124, the Category is Element 35126, the Object Class term is Shipped Quantity Accumulation 35128, the Property term is Quantity 35130, the Representation/Association term is Quantity 35132, the Type term is GDT 35134, the Type Name term is Quantity 35136, and the Length is thirteen digits with six post-decimal digits 35138. The cardinality between the Quantity 35124 and the GDT ShippedQuantityAccumulation 35100 is one 35140.

ReferencePeriod is the reference period for the accumulation. Quantity is the shipped quantity that has been cumulated in the specified reference period up until the time that comes from the use context of the GDT. This quantity value may be also described as the "cumulative delivered quantity" in certain industries.

If the ReferencePeriod is not specified explicitly, the reference period for the accumulation may come from the use context of the GDT. This can be set up, for example, using a reference to a contract item (such as SchedulingAgreementReference).

The ShippedQuantityAccumulation may be used for information purposes and for the (legally binding) synchronization of the goods recipient's received goods and the vendor's shipped goods. The transmission of cumulated quantity values may be used, for example, in advanced shipping notifications (DespatchedDeliveryNotification) in the high-tech and automotive industry.

Additional values for the cumulated shipped goods, for instance, for the affected products and parties, may be described in the use context of the GDT.

(qqqqqqqqqq) SupplyChainExceptionStatusCode

The GDT SupplyChainExceptionStatusCode 35200 is a coded representation for the status of an exception that occurs in the supply chain during logistics planning or logistics execution. An example (instance) of the GDT SupplyChainExceptionStatusCode 35200 is:

```
<SupplyChainException>
    <StatusCode>RESOLVED</StatusCode>
</SupplyChainException>.
```

The GDT SupplyChainExceptionStatusCode 35200 is depicted in FIG. 352. For the GDT SupplyChainExceptionStatusCode 35200, the Object Class term is SupplyChainException 35202, the Property term is Status 35204, the Representation/Association term is Code 35206, the Type term is CCT 35208, the Type Name term is Code 35210, and the Length is from one to fifteen 35212. The GDT SupplyChainExceptionStatusCode may be a restricted GDT 35214.

In a variation, the values of the SupplyChainExceptionStatusCode may include values in the "Exception Status Code List" of the "EAN.UCC XML Business Message Standards, Version 1.3 (July 2003)". These are as follows:

| Code | Name | Description |
|---|---|---|
| ACKNOWLEDGED | Acknowledged | The exception has been acknowledged. |
| NEW | New | The exception is new. |
| RESOLVED | Resolved | The problem indicated by the exception has been resolved. |
| SUPERSEDED | Superseded | The original exception has been replaced by a modified exception. |
| UNRESOLVABLE | Unresolvable | The problem indicated by the exception cannot be resolved. |

In an example, schemeAgencyID may be included as an attribute. In a variation, if different code lists are supported, the schemeAgencyID="9" (EAN, International Article Numbering Association) or "113" (UCC, Uniform Code Council) International Numbering Association) from the DE 3055 may be specified to identify the code list given above.

The SupplyChainExceptionStatusCode may be set to "NEW" in the initial transmission of an exception. The other possible code values may be transmitted for the status of an exception when subsequent changes are made. For example, if an exception with the status code "NEW" occurs for "production standstill", and this problem is then resolved, the status code of the exception is "RESOLVED" in a subsequent message.

(rrrrrrrrrr) SupplyChainExceptionTypeID

The GDT SupplyChainExceptionTypeID 35300 is a unique identifier for the type of exception that can occur in a supply chain during logistics planning or logistics execution. A type of a supply chain exception describes the (business) nature and basic features of the exception. The type definition can be based upon generally-accepted logistic key figures as well as industry-specific or proprietary business-specific criteria. Examples are "forecast deviation", "product shortage", "production standstill", or "delivery delay".

An Example (Instance) of the GDT SupplyChainExceptionTypeID is:

```
<SupplyChainException>
  . . .
<TypeID schemeAgencyID="SCM_001">4711</TypeID>
  . . .
</SupplyChainException>.
```

The GDT SupplyChainExceptionTypeID 35300 is depicted in FIG. 353. The GDT SupplyChainExceptionTypeID 35300 includes attribute schemeAgencyID 35316. For the GDT SupplyChainExceptionTypeID 35300, the Object Class term is SupplyChainException 35302, the Property term is Type 35304, the Representation/Association term is Identifier 35306, the Type term is CCT 35308, the Type Name term is Identifier 35310, and the Length is from one to four 35312. The GDT SupplyChainExceptionTypeID 35300 may be a restricted GDT 35314.

For the schemeAgencyID 35316, the Category is Attribute 35318, the Object Class term is IdentificationSchemeAgency 35320, the Property term is Identification 35322, the Representation/Association term is Identifier 35324, the Type term is XSD 35326, the Type Name term is Token 35328, and the Length is from one to sixty 35330. The cardinality between the schemeAgencyID 35316 and the GDT SupplyChainExceptionTypeID 35300 is either zero or one 35332.

The schemeAgencyID indicates the business system in which the ID was assigned. If the schemeAgencyID has not been specified, it may be determined from the context.

The SupplyChainExceptionTypeID may be used to describe the various exception types that can occur in the supply chain during logistics planning and logistics execution.

In a variation, in RosettaNet PIP 4A6 "NotifyOfForecastingException" the following code lists exists for different categories of SupplyChainExceptions: "ComparisonExceptionTypeCode", "IncidentExceptionTypeCode", "InformationExceptionTypeCode", and "ThresholdExceptionTypeCode". Through mapping, the GDT SupplyChainExceptionTypeID can also cover these codes. However, since there are a great number of industry-specific or business-specific requirements for the occurring SupplyChainExceptions, the GDT SupplyChainExceptionTypeID may use the identification concept instead of the code list concept.

The EAN.UCC "Exception Notification" may be restricted to a rough categorization of SupplyChainExceptions and may not use standardized code lists.

(ssssssssss) SystemAdministrativeData

The GDT SystemAdministrativeData 35400 is administrative data that is stored in a system. This data includes system users and change dates/times. An example (instance) of the GDT SystemAdministrativeData is:

```
<SystemAdministrativeData>
  <CreationDateTime>2004-04-19T11:11Z+01:00</CreationDateTime>
  <CreationUserAccountID>Bach</CreationUserAccountID>
  <LastChangeDateTime>2004-04-19T12:21Z+01:00
  </LastChangeDateTime>
  <LastChangeUserAccountID>Bach</LastChangeUserAccountID>
</SystemAdministrativeData>.
```

The GDT SystemAdministrativeData 35400 is depicted in FIG. 354. The GDT SystemAdministrativeData 35400 includes elements CreationDateTime 35406, CreationUserAccountID 35422, LastChangeDateTime 35438, and LastChangeUserAccountID 35454. For the GDT SystemAdministrativeData 35400, the Object Class term is System Administrative Data 35402 and the Representation/Association term is Details 35404.

For the CreationDateTime 35406, the Category is Element 35408, the Object Class term is System Administrative Data 35410, the Property term is Creation Date Time 35412, the Representation/Association term is DateTime 35414, the Type term is GDT 35416, and the Type Name term is DateTime 35418. The cardinality between the CreationDateTime 35406 and the GDT SystemAdministrativeData 35400 is one 35420.

For the CreationUserAccountID 35422, the Category is Element 35424, the Object Class term is System Administrative Data 35426, the Property term is Creation User Account ID 35428, the Representation/Association term is Identifier 35430, the Type term is GDT 35432, and the Type Name term is UserAccountID 35434. The cardinality between the CreationUserAccountID 35422 and the GDT SystemAdministrativeData 35400 is one 35436.

For the LastChangeDateTime 35438, the Category is Element 35440, the Object Class term is System Administrative Data 35442, the Property term is Last Change Date Time 35444, the Representation/Association term is DateTime 35446, the Type term is GDT 35448, and the Type Name term is DateTime 35450. The cardinality between the LastChangeDateTime 35438 and the GDT SystemAdministrativeData 35400 is either zero or one 35452.

For the LastChangeUserAccountID 35454, the Category is Element 35456, the Object Class term is System Administrative Data 35458, the Property term is Last Change User Account ID 35460, the Representation/Association term is Identifier 35462, the Type term is GDT 35464, and the Type Name term UserAccountID 35466. The cardinality between the LastChangeUserAccountID 35454 and the GDT SystemAdministrativeData 35400 is either zero or one 35468.

SystemAdministrativeData contains the following elements: CreationDateTime is the creation date/time (date and time stamp); CreationUserAccountID is the creator; LastChangeDateTime is the time (date and time stamp) of last change; and LastChangeUserAccountID is the last changed by.

SystemAdministrativeData may be used in Business Objects, Business Document Objects, or in any of their parts. When using the GDT SystemAdministrativeData, a description may be used regarding to which administrative information reference is made. This may be expressed by using an appropriate prefix, for example, PurchaseOrder.

(tttttttttt) TaxAuthorityParty

The CDT TaxAuthorityParty 35500 is a party that collects and manages taxes. Examples (instances) for the CDT TaxAuthorityParty 35500 are:

```
<VATDeclaration>
. . .
<TaxAuthorityParty>
    <ID>2832</ID>
    <CountryCode>DE</CountryCode>
    <Address>
        <OrganisationFormattedName>Finanzamt Heidelberg</
OrganisationFormattedName >
            . . .
```

-continued

```
        </Address>
    </TaxAuthorityParty>
    . . .
    </VATDeclaration>.
```

The CDT TaxAuthorityParty 35500 is depicted in FIG. 355. The CDT TaxAuthorityParty 35500 includes elements ID 35506, CountryCode 35526, RegionCode 35542, and Address 35558. For the CDT TaxAuthorityParty 35500, the Object Class term is Tax Authority Party 35502 and the Representation/Association term is Details 35504.

For the ID 35506, the Category is Element 35508, the Object Class term is Tax Authority Party 35510, the Property term is Identification 35512, the Representation/Association term is Identifier 35514, the Type term is CCT 35516, the Type Name term is Identifier 35518, and the Length is twenty 35520. The cardinality between the ID 35506 and the CDT TaxAuthorityParty 35500 is either zero or one 35522. The ID may be restricted 35524.

For the CountryCode 35526, the Category is Element 35528, the Object Class term is Tax Authority Party 35530, the Property term is Country 35532, the Representation/Association term is Code 35534, the Type term is GDT 35536, and the Type Name term is CountryCode 35538. The cardinality between the CountryCode 35526 and the CDT TaxAuthorityParty 35500 is one 35540.

For the RegionCode 35542, the Category is Element 35544, the Object Class term is Tax Authority Party 35546, the Property term is Region 35548, the Representation/Association term is Code 35550, the Type term is GDT 35552, and the Type Name term is RegionCode 35554. The cardinality between the RegionCode 35542 and the CDT TaxAuthorityParty 35500 is either zero or one 35556.

For the Address 35558, the Category is Element 35560, the Object Class term is Tax Authority Party 35562, the Property term is Address 35564, the Representation/Association term is Address 35566, the Type term is GDT 35568, and the Type Name term is Address 35570. The cardinality between the Address 35558 and the CDT TaxAuthorityParty 35500 is either zero or one 35572. The Address may be restricted 35574.

ID is an identifier of the tax authority (tax authority number). Country code is the country of the tax authority. RegionCode is the region of the tax authority. Address is the company address of the tax authority. The unique identification of a tax authority may vary from country to country. In many countries, a tax authority number is used for identification, that is, the "ID" element (in Germany it is called the "Finanzamtsnummer"). "ID" may be unique in the context of the country of the tax authority (in the "CountryCode" element). In some countries, the region and/or company address is used for identification, that is, the "RegionCode" and "Address" elements. In the United States, for example, the IRS (Internal Revenue Service) in Washington D.C. is identified as the federal tax authority by "Address", whereas for the tax authorities of some states, "RegionCode" and "Address" are required. One example of this is CA BOE (California State Board of Equalization). Therefore, depending on the country, either the "ID" or a combination of "RegionCode" and "Address" may be specified.

The GDT TaxAuthorityParty contains information about a tax authority which may be used in A2A or B2B messages, for example, in the electronic tax return for tax on sales/purchases (VATDeclaration) to a tax authority.

(uuuuuuuuuu) TaxIdentificationNumberTypeCode

The GDT TaxIdentificationNumberTypeCode 35600 is a coded representation of the type of a tax number. An Example of the GDT TaxIdentificationNumberTypeCode 35600 is: <TaxIdentificationNumberTypeCode>DE0</TaxIdentificationNumberTypeCode>.

The GDT TaxIdentificationNumberTypeCode 35600 is depicted in FIG. 356. For the GDT TaxIdentificationNumberTypeCode 35600, the Object Class term is Tax Identification Number 35602, the Property term is Type 35604, the Representation/Association term is Code 35606, the Type term is CCT 35608, the Type Name term is Code 35610, and the Length is from three to four 35612.

Each country may have its own TaxIdentificationNumberTypeCodes. There may be different codes for different regions, different taxes or groups of taxes, or different types of taxpayers.

In a variation, SAP supplies the values in the form of the illustrative list presented in the table below. The first two characters in the code are the two-letter ISO code for the country (ISO 3166-1). The name of the TaxIdentificationNumberTypeCode is the official name used in the country in question (or its transcription).

| Code | Name | Description |
|---|---|---|
| AR0 | Código Único de Identificación Tributaria (CUIT) | Argentina: CUIT Number |
| AR1 | Clave Única de Identificación Laboral (CUIL) | Argentina: CUIL Number |
| AR2 | Número impuesto sobre renta | Argentina: Income Tax Number |
| AR3 | Número impuesto regional | Argentina: NIP Number or CM Number |
| AT0 | Umsatzsteuer-Identifikationsnummer (UID) | Austria: VAT Registration Number |
| AU0 | Australian Business Number (ABN) | Australia: ABN |
| BE0 | In French: Le numéro d'identification à la taxe sur la valeur ajoutée (N° TVA)<br>In Dutch: BTW-Nummer (BTW-nr) | Belgium: VAT Registration Number |
| BE1 | In French: Numéro d'identification Ministère des Finances<br>In Dutch: MiniFin-Nummer | Belgium: Ministry Of Finance Registration Number |
| BE2 | In French: Le numéro d'identification à la taxe sur la valeur ajoutée (N° TVA)<br>In Dutch: BTW-Nummer (BTW-nr) | Belgium: VAT Registration Number |

-continued

| Code | Name | Description |
|---|---|---|
| BG1 | Edinen Identifikacionen kod | Bulgaria: Unified ID Code |
| BG2 | Edinen Grazhdanski Nomer | Bulgaria: Personal ID |
| BG3 | Osiguritelen nomer | Bulgaria: Social Security Number |
| BR1 | Cadastro Nacional de Pessoa Jurídica (CNPJ) | Brazil: CNPJ Number |
| BR2 | Cadastro de Pessoa Física (CPF) | Brazil: CPF Number |
| BR3 | Inscrição Estadual | Brazil: State Tax Number |
| BR4 | Inscrição Municipal | Brazil: Municipal Tax Number |
| CH1 | Mehrwertsteuer-Nummer (MwSt) | Switzerland: VAT Number |
| CL1 | Número de rol unico tributario (RUT) | Chile: RUT Number |
| CN1 | customer's (客户的增值税税号)-(ke hu de zeng zhi shui shui hao), vendor's (供应商的增值税税号)-(gong ying shang de zeng zhi shui shui hao) | China: Tax Number |
| CO1 | Número de identificación tributaria (NIT) | Colombia: NIT Number |
| CZ0 | danové identifikacní císlo (DIC) | Czech Republic: VAT Registration Number |
| CZ1 | danové identifikacní císlo (DIC) | Czech Republic: DIC Number |
| CZ2 | identifikacní císlo organizace (ICO) | Czech Republic: ICO Number |
| DE0 | Umsatzsteuer-ID-Nr. (USt-IdNr) | Germany: VAT Registration Number |
| DE1 | Ertragssteuernummer (§48) | Germany: Income Tax Number (§48) |
| DE2 | Umsatzsteuernr. (Gutschriftsverf. §14) | Germany: VAT Number (Credit Procedure §14) |
| DE3 | Elster Steuernummer | Germany: Elster Tax Number |
| DE4 | Steuernummer | Germany: Tax Number |
| DK0 | Det Centrale Virksomhedsregister Nummer (CRV-nummer) | Denmark: VAT Registration Number |
| EE0 | käibemaksukohustuslase registreerimisnumber (KMKR number) | Estonia: VAT Registration Number |
| ES0 | El número de identificación a efectos del Impuesto sobre el Valor Anadido | Spain: VAT Registration Number |
| ES1 | Número de Identificación Fiscal (NIF) | Spain: NIF Number |
| ES2 | Número de documento nacional de identidad (DNI) | Spain: DNI Number |
| FI0 | Arvonlisäveronumero (ALV-nro) | Finland: VAT Registration Number |
| FR0 | Le numéro d'identification à la taxe sur la valeur ajoutée (ID. TVA) | France: VAT Registration Number |
| FR1 | Numéro: identifier 1'établissement de 1'entreprise (SIRET) | France: SIRET Number |
| FR2 | Numéro: Système National Informatique pour le Répertoire des Entreprises et des Etablissements (SIREN) | France: SIREN Number |
| GB0 | VAT Registration Number (VAT Reg. No) | United Kingdom: VAT Registration Number |
| GB2 | National Insurance Number | United Kingdom: National Insurance Number |
| GR0 | Arithmos Forologikou Mitroou FPA | |
| GR0 | (A.ф.M) | Greece: VAT Registration Number |
| GR1 | arithmos taytotetas | Greece: Personal ID |
| GR2 | arithmos phoroaogikoy metrooy. | Greece: AFM Number |
| HR1 | Jedinstveni Matični Broj Građana (JMBG) | Croatia: JMBG Number |
| HU0 | közösségi adószám | Hungary: VAT Registration Number |
| HU1 | adóazonosító szám | Hungary: Tax Number |
| ID1 | Nomor Pokok Wajib Pajak (NPWP) | Indonesia: NPWP Number |
| ID3 | Nomor Pengukuhan Pengusaha Kena Pajak (NPPKP) | Indonesia: NPPKP Number |
| IE0 | VAT Registration Number (VAT Reg. No) | Ireland: VAT Registration Number |
| IT0 | Codice IVA (Numero di Partita IVA, P. IVAT) | Italy: VAT. Registration Number |
| IT1 | Codice Fiscale | Italy: Codice Fiscale |
| IT2 | Partita IVA | Italy: IVA Code |
| KR1 | Corporation Number | South Korea: Corporation ID |
| KR2 | Personal/Business Identification Number | South Korea: VAT Registration Number |
| KZ1 | Registratzionnyj Nomer Nalogoplatelschika (PHH) | Kazakhstan: RNN Number |
| LT0 | Pridetines vertes mokescio mokėtojo kodas (PVM moketojo kodas) | Lithuania: VAT Registration Number |

-continued

| Code | Name | Description |
|---|---|---|
| LU0 | Le numéro d'identification à la taxe sur la valeur ajoutée (ID. TVA) | Luxembourg: VAT Registration Number |
| LV0 | PVN maksataja reģistrācijas numurs (PVN reģistrācijas numurs) | Latvia: VAT Registration Number |
| MC0 | Le numéro d'identification à la taxe sur la valeur ajoutée (ID. TVA) | Monaco: VAT Registration Number |
| MT0 | numru ta'l-identifikazzjoni tat-taxxa fuq il-valur miżjud | Malta: VAT Registration Number |
| MX1 | Registro Federal de Contribuyentes (RFC) | Mexico: RFC Number |
| MX2 | Clave Unica de Registro de | Mexico: VAT Liability |
| MX3 | Poblacion (CURP) | Mexico: CURP Number |
| NL0 | BTW-identificatienummer (BTW-Nr.) | Netherlands: VAT Registration Number |
| NO2 | Foretaksnummer | Norway: Tax Number |
| PE1 | Número de registro unico de contribuyentes (RUC) | Peru: RUC Number |
| PH1 | Taxpayer Identification Number (TIN) | Philippines: Taxpayer ID Number |
| PL0 | Numer identyfikacji podatkowej (NIP) | Poland: VAT Registration Number |
| PL1 | Numer identyfikacji podatkowej (NIP) | Poland: NIP Number |
| PT0 | Número de identificação fiscal (NIPC) | Portugal: VAT Registration Number |
| RO1 | cod de identificare fiscala | Romania: Tax Number |
| RU1 | Individualnij Nalogovyj Numer (INN) | Russia: INN |
| RU2 | Obscherossijsky Klassifikator Predprijatij u Organizatchij (OKPO) | Russia: OKPO Code |
| RU3 | Kod Prichiny Postanovki na Uchjot (KPP) | Russia: KPP Number |
| RU4 | Kod Organizatchii v Organe | Russia: OFK Number |
| SE0 | Federal'nogo Kaznatchejstva (OFK) Momsregistreringsnummer (Moms Reg. Nr.) | Sweden: VAT Registration Number |
| SE2 | Organisationsnummer | Sweden: Organization Registration Number |
| SG1 | GST Registration Number | Singapore: GST Registration Number |
| SI0 | identifikacijska številka za DDV | Slovenia: VAT Registration Number |
| SI1 | davčna številka | Slovenia: Tax Number |
| SK0 | Identifikačne čislo pre daň (IČ DPH) | Slovakia: VAT Registration Number |
| SK1 | Daňové identifikačné čislo (DIC) | Slovakia: DIC Number |
| SK2 | Identifikačné čislo organizácie (ICO) | Slovakia: ICO Number |
| TH1 | Personal Identification Number (เลขประจำตัวผู้เสียภาษีอากร ประเภทบุคคลธรรมดา) | Thailand: Personal ID |
| TH2 | Registered Tax Identification Number (เลขประจำตัวผู้เสียภาษีอากร) | Thailand: Tax ID |
| TR1 | | Turkey: Tax Office |
| TR2 | vergi numarasi | Turkey: Tax Number |
| TW1 | Tong Yi Bian Hao | Taiwan: GUI Registration Number |
| TW2 | Shuei Ji Bian Hao | Taiwan: Tax Registration Number |
| UA1 | Individualnij Nalogovyj Numer (INN) индивидуальных номеров налогоплательщиков(ИHH) | Ukraine: INN |
| UA2 | Identifikatsionnyj kod platelschika po Edinomu Gosudarstvennomu Reestru Predprijatij i Organizhatsij Ukrainy (EGRPOU) | Ukraine: EDRPOU Number |
| UA3 | Identifikatsionnyj kod platelschika po Gosudarstvennomu Reestru Fizhicheskih Lits (GRFL) Державного реєстру фізичних осіб (код ДРФО) | Ukraine: DRFO Number |
| UA4 | Identifikatsionnyj kod platelschika dlja Sovmestnyh Predprijatij (SP) | Ukraine: Joint Venture Registration Number |
| US1 | Social Security Number | United States: Social Security Number |
| US2 | Employer Identification Number | United States: Employer ID Number |
| VE1 | Registro identificación fiscal (RIF) | Venezuela: RIF Number |
| VE2 | Número identificación tributaria (NIT) | Venezuela: NIT Number |

The data type may be used in conjunction with the tax number.

(vvvvvvvvvv) TestDataIndicator

The GDT TestDataIndicator 35700 indicates whether the specified data is test data or not. An example (instance) for the GDT TestDataIndicator 35700 is:

<TestDataIndicator>true</TestDataIndicator>.

The GDT TestDataIndicator 35700 is depicted in FIG. 357. For the GDT TestDataIndicator 35700, the Category is Element 35702, the Property term is Test Data 35704, the Representation/Association term is Indicator 35706, the Type term is CCT 35708, and the Type Name term is Indicator 35710.

In a variation, the TestDataIndicator may include the following values:

| | |
|---|---|
| 'true' | The specified data is test data |
| 'false' | The specified data is not test data |

The TestDataIndicator may be used as part of the BusinessDocumentMessageHeader to display whether the data contained in the message is test data or not. The context of an interface may describe the business meaning of the 'true' and 'false' values of the TestDataIndicator.

(wwwwwwwwww) UserAccountID

The GDT UserAccountID 35800 is a unique identifier for a system's user account. An example (instance) for the GDT UserAccountID 35800 is:

<UserAccountID>smith</UserAccountID>.

The GDT UserAccountID 35800 is depicted in FIG. 358. The GDT UserAccountID 35800 includes attributes schemeAgencyID 35814 and schemeAgencySchemeAgencyID 35832. For the GDT UserAccountID 35800, the Object Class term is User Account 35802, the Property term is Identification 35804, the Representation/Association term is Identifier 35806, the Type term is CCT 35808, the Type Name term is Identifier 35810, and the Length is from one to two hundred fifty-five 35812.

For the schemeAgencyID 35814, the Category is Attribute 35816, the Object Class term is IdentificationSchemeAgency 35818, the Property term is Identification 35820, the Representation/Association term is Identifier 35822, the Type term is xsd 35824, the Type Name term is token 35826, and the Length is from one to sixty 35828. The cardinality between the schemeAgencyID 35814 and the GDT UserAccountID 35800 is either zero or one 35830.

For the schemeAgencySchemeAgencyID 35832, the Category is Attribute 35834, the Object Class term is IdentificationSchemeAgency 35836, the Property term is SchemeAgency 35838, the Representation/Association term is Identifier 35840, the Type term is xsd 35842, the Type Name term is token 35844, and the Length is three 35846. The cardinality between the schemeAgencySchemeAgencyID 35832 and the GDT UserAccountID 35800 is either zero or one 35848.

SchemeAgencyID identifies the system that defined the identifier. SchemeAgencySchemeAgencyID may be mutually defined.

(xxxxxxxxxx) AccountDeterminationHouseBankGroupCode

A GDT AccountDeterminationHouseBankGroupCode 35800AA is a coded representation of a group of house banks based on the viewpoint of a similar determination of accounts in accounting. An example of GDT AccountDeterminationHouseBankGroupCode 35800AA is:

<AccountDeterminationHouseBankGroupCode>1</AccountDeterminationHouseBankGroupCode>

The structure of GDT AccountDeterminationHouseBankGroupCode 35800AA is depicted in FIG. 358AA. For the GDT AccountDeterminationHouseBankGroupCode 35800AA, the Object Class Term Qualifier is Account Determination 35802AA, the Object Class Term is House Bank Group 35804AA, the Representation/Association is Code 35806AA, the Type is CCT 35808AA, the Type Name is Code 35810AA and the Length is from one to four 35812AA. The remark 35814AA shows that the GDT AccountDeterminationHouseBankGroupCode 35800AA may be restricted.

A customer-specific code list is assigned to a code. A customer can determine the codes in a code list. The attributes of the code are assigned the following values: listAgencyID—ID of the Customer (ID from DE 3055, if listed there), listVersionID—version of the particular code list. Assigned and managed by the Customer, listAgencySchemeID—ID of the scheme if the listAgencyID does not come from DE 3055, or listAgencySchemeAgencyID—ID of the organization from DE 3055 that manages the listAgencySchemeID scheme The data type GDT AccountDeterminationHouseBankGroupCode 35800AA may use the following codes: domestic house banks, i.e., house banks with headquarters in home country or foreign house banks, i.e., house banks with headquarters abroad.

For the purposes of proper financial reporting, in some variations, the value-based representation of business transactions in accounting must use different accounts. The AccountDeterminationHouseBankGroupCode may be used in the business object models and in A2A messages.

(yyyyyyyyyy) AccountDeterminationBusinessPartnerGroupCode

A GDT AccountDeterminationBusinessPartnerGroupCode 35800AB is a coded representation of a group of business partners based on the viewpoint of a similar derivation of accounts in accounting. An example of GDT AccountDeterminationBusinessPartnerGroupCode 35800AB is:

<AccountDeterminationBusinessPartnerGroupCode>1</AccountDeterminationBusinessPartnerGroupCode>

The structure of GDT AccountDeterminationBusinessPartnerGroupCode 35800AB is depicted in FIG. 358AB. For the GDT AccountDeterminationBusinessPartnerGroupCode 35800AB, the Object Class is Account Determination Business Partner Group 35802AB, the Representation/Association is Code 35804AB, the Type is CCT 35806AB, the Type Name is Code 35808AB, and the Length is from one to ten 35810AB. The remark 35812AB shows that the GDT AccountDeterminationBusinessPartnerGroupCode 35800AB may be restricted The data type GDT AccountDeterminationBusinessPartnerGroupCode 35800AB may use the following codes: domestic business partners, i.e., business partners with headquarters in home country or foreign business partners, i.e., business partners with headquarters abroad. A customer can determine the codes in the code list. The attributes of the code are assigned the following values: listID="10317," listAgencyID—ID of the Customer (ID from DE 3055, if listed there), listVersionID—version of the particular code list, listAgencySchemeID—ID of the scheme if the listAgencyID does not come from DE 3055, and listAgencySchemeAgencyID—ID of the organization from DE 3055 that manages the listAgencySchemeID scheme. For the purposes of proper financial reporting, in some variations, the value-based representation of business transactions in accounting must use different accounts.

(zzzzzzzzzz) AccountDeterminationExpenseGroupCode

A GDT AccountDeterminationExpenseGroupCode 35800AC is the coded representation of a group of expenses from the perspective of an identical or similar determination of an account in accounting. An example of GDT AccountDeterminationExpenseGroupCode 35800AC is:

<AccountDeterminationExpenseGroupCode>110</AccountDeterminationExpenseGroupCode>

The structure of GDT AccountDeterminationExpenseGroupCode 35800AC is depicted in FIG. 358AC. For GDT Account Determination Expense Group Code 35800AC, the Object Class Term Qualifier is Account Determination 35802AC, the Object Class Term is Expense Group 35804AC, the Representation/Association is Code 35806AC, the Type is CCT 35808AC, the Type Name is Code 35810AC, and the Length is from one to four 35812AC. The remark 35814AC shows that the GDT AccountDeterminationExpenseGroupCode 35800AC may be restricted.

The data type AccountDeterminationExpenseGroupCode 35800AC may use codes for costs for meals, costs for accommodations, travel costs for attending a seminar or costs for domestic trips to name a few examples. A customer-specific code list is assigned to the code. The AccountDeterminationExpenseGroupCode 35800AC may be used in the business object models and in A2A messages. The attributes of the code are assigned the following values: listID="10319," listAgencyID—ID of the Customer (ID from DE 3055, if listed there), listVersionID—version of the particular code list. Assigned and managed by the Customer, listAgencySchemeID—ID of the scheme if the listAgencyID does not come from DE 3055, and listAgencySchemeAgencyID—ID of the organization from DE 3055 that manages the listAgencySchemeID scheme.

(aaaaaaaaaaa) AccountDeterminationFixedAssetClassGroupCode

A GDT AccountDeterminationFixedAssetClassGroupCode 35800AD is the coded representation of a group of fixed asset classes based on the viewpoint of a similar derivation of accounts in accounting. An example of a GDT AccountDeterminationFixedAssetClassGroupCode 35800AD is:

<AccountDeterminationFixedAssetClassGroupCode>1</AccountDeterminationFixedAssetClassGroupCode>

The structure of GDT AccountDeterminationFixedAssetClassGroupCode 35800AD is depicted in FIG. 358AD. For GDT Account Determination Fixed Asset Class Group Code 35800AD, the Object Class is Account Determination Fixed Asset Class Group 35802AD, the Representation/Association is Code 35804AD, the Type is CCT 35806AD, the Type Name is Code 35808AD, and the Length is from one to ten 35810AD. The remark 35810AD shows that the GDT AccountDeterminationFixedAssetClassGroupCode 35800AD may be restricted.

The data type GDT AccountDeterminationFixedAssetClassGroupCode 35800AD may use codes for codes for vehicle fleets, such as cars and vans or real estate, to name a few examples. The AccountDeterminationFixedAssetClassGroupCode may be used in the business object models and in A2A messages.

A customer can determine the codes in the code list. The attributes of the code are assigned the following values: listID="10320," listAgencyID—ID of the Customer (ID from DE 3055, if listed there), listVersionID—version of the particular code list, listAgencySchemeID—ID of the scheme if the listAgencyID does not come from DE 3055, and listAgencySchemeAgencyID—ID of the organization from DE 3055 that manages the listAgencySchemeID scheme (bbbbbbbbbbb) AccountDeterminationMaterialLedgerAccountGroupCode A GDT AccountDeterminationMaterialLedgerAccountGroupCode 35800AE is the coded representation of a group of material ledger accounts based on the viewpoint of a similar derivation of accounts in accounting. An example of a GDT AccountDeterminationMaterialLedgerAccountGroupCode 35800AE is:

<AccountDeterminationMaterialLedgerAccountGroupCode>1</AccountDeterminationMaterialLedgerAccountGroupCode>

The structure of GDT AccountDeterminationMaterialLedgerAccountGroupCode 35800AE is depicted in FIG. 358AE. For GDT AccountDeterminationMaterialLedgerAccountGroupCode 35800AE, the Object Class Term Qualifier is Account Determination 35802AE, the Object Class is Material Ledger Account Group 35804AE, the Representation/Association is Code 35806AE, the Type is CCT 35808AE, the Type Name is Code 35810AE, and the Length is from one to ten 35812AE. The remark 35814AE shows that the GDT AccountDeterminationMaterialLedgerAccountGroupCode 35800AE may be restricted.

The data type GDT AccountDeterminationMaterialLedgerAccountGroupCode 35800AE may use codes for raw materials, such as materials that have not undergone processing or finished products that are ready for sale. The AccountDeterminationMaterialLedgerAccountGroupCode 35800AE may be used in the business object models and in A2A messages.

A customer can determine the codes in the code list. The attributes of the code are assigned the following values: listID="10321," listAgencyID—ID of the Customer (ID from DE 3055, if listed there), listVersionID—version of the particular code list. Assigned and managed by the Customer, listAgencySchemeID—ID of the scheme if the listAgencyID does not come from DE 3055, and listAgencySchemeAgencyID—ID of the organization from DE 3055 that manages the listAgencySchemeID scheme.

(ccccccccccc) AccountDeterminationServiceProductGroupCode

A GDT AccountDeterminationServiceProductGroupCode 35800AF is the coded representation of a group of service products from the viewpoint of identical determination of accounts in accounting. An example of the GDT AccountDeterminationServiceProductGroupCode 35800AF is:

<AccountDeterminationServiceProductGroupCode>1</AccountDeterminationServiceProductGroupCode>

The structure of the GDT AccountDeterminationServiceProductGroupCode 35800AF is depicted in FIG. 358AF. For GDT AccountDeterminationServiceProductGroupCode 35800AF, the Object Class Term Qualifier is Account Determination 35802AF, the Object Class Term is Service Product Group 35804AF, the Representation/Association is Code 35806AF, the Type is CCT 35808AF, the Type Name is Code 35810AF, and the Length is from one to four 35812AF. The remark 35814AF shows that the GDT AccountDeterminationServiceProductGroupCode 35800AF may be restricted.

A customer-specific code list is assigned to the code. A customer can determine the codes in the code list. The attributes of the code are assigned the following values: listID="10323," listAgencyID—ID of the Customer (ID from DE 3055, if listed there), listVersionID—version of the particular code list. Assigned and managed by the Customer, listAgencySchemeID—ID of the scheme if the listAgencyID does not come from DE 3055, and listAgencySchemeAgencyID—ID of the organization from DE 3055 that manages the listAgencySchemeID scheme.

The AccountDeterminationServiceProductGroupCode 35800AF may be used in the business object models and in A2A messages.

(dddddddddd) AccountingObjectSetAssignment

A GDT AccountingObjectSetAssignment 35800AG is the assignment of something to a set of accounting objects. For example, the entities assigned may be an amount known from the context, a quantity, or a company resource, such as office space or working time. An example of GDT AccountingObjectSetAssignment 35800AG is:

```
<InvoiceItem>
    . . .
    <NetAmount @currencyCode="EUR">100</NetAmount>
    . . .
    <AccountingObjectSetAssignment>
        <Percent>40</Percent>
        <AccountingObjectSet>
            <CostCentreID>CC1000</CostCentreID>
        </AccountingObjectSet>
    </AccountingObjectSetAssignment>
    <AccountingObjectSetAssignment>
        <Percent>60</Percent>
        <AccountingObjectSet>
            <CostCentreID>CC2000</CostCentreID>
        </AccountingObjectSet>
    </AccountingObjectSetAssignment>
</InvoiceItem>
```

The structure of the GDT AccountingObjectSetAssignment 35800AG is depicted in FIG. 358AG. For the GDT AccountingObjectSetAssignment 35800AG, the Object Class is Accounting Object Set Assignment 35802AG, and the Property is Details 358AG.

FIG. 358AG uses the terms percent, amount and quantity to represent specific features of a GDT. The term percent represents a percentage share of an entity known from the context that is assigned to an AccountingObjectSet. The term amount represents an amount that is assigned to an AccountingObjectSet. The term quantity represents a quantity that is assigned to an AccountingObjectSet. In some variations, either percent, amount, or quantity may be specified. A combination of these is not permitted. If more than one AccountingObjectSetAssignment can be used to assign percentage shares of a total amount known from the context or percentage shares of a total quantity, for example, to different AccountingObjectSets, the following conditions apply: all percentage values must add up to a total of 100, all amount values must add up to the total amount, and all quantity values must add up to the total quantity.

For the Percent 35806AG, the Category is Element (E) 35808AG, the Object Class is Accounting Object Set Assignment 35810AG, the Property is Percent 35812AG, the Representation/Association is Percent 35814AG, the Type is GDT 35816AG, the Type Name is Percent 35818AG, and the Cardinality is from zero to one 35820AG.

For the Amount 35822AG, the Category is Element (E) 35824AG, the Object Class is Accounting Object Set Assignment 35826AG, the Property is Amount 35828AG, the Representation/Association is Amount 35830AG, the Type is GDT 35832AG, the Type Name is Amount 35834AG, and the Cardinality is from zero to one 35836AG.

For the Quantity 35838AG, the Category is Element (E) 35840AG, the Object Class is Accounting Object Set Assignment 35842AG, the Property is Quantity 35844AG, the Representation/Association is Quantity 35846AG, the Type is GDT 35848AG, the Type Name is Quantity 35850AG, and the Cardinality is from zero to one 35852AG.

For the Accounting Object Set 35854AG, the Category is Element (E) 35856AG, the Object Class is Accounting Object Set Assignment 35858AG, the Property Accounting Object Set 35860AG, the Representation/Association is Accounting Object Set 35862AG, the Type is GDT 35864AG, the Type Name is Accounting Object Set 35866AG, and the Cardinality is one 35868AG.

The data type AccountingObjectSetAssignment 35800AG can be used for multiple account assignments, that is, to assign something to multiple Accounting Object Sets. The entity to be assigned can be distributed across the Accounting Object Sets using shares relating to percentages, amounts, or quantities. For example, expenses from the purchase of office supplies can be transferred to Accounting once an incoming invoice for the materials has been checked.

(eeeeeeeeee) AccountingPeriodID

A GDT AccountingPeriodID 35800AH is a unique identifier for an accounting period in a fiscal year. An example of GDT Accounting Period ID 35800AH is:

<AccountingPeriodID>12</AccountingPeriodID>

The structure of GDT AccountingPeriodID 35800AH is depicted in FIG. 358AH. An accounting period is a subdivision of a fiscal year for which the operating results are determined and financial statements are prepared. For GDT AccountingPeriodID 35800AH, the Object Class is AccountingPeriod 35802AH, the Property is Identification 35804AH, the Representation/Association is Identifier 35806AH, the Type is CCT 35808AH, the Type Name is Identifier 35810AH, and the Length is from one to three 35812AH.

The data type GDT AccountingPeriodID 35800AH provides a 3 digit positive number (by a restriction of CCT Identifier). The remark 35814AH shows that the GDT AccountingPeriodID 35800AH may be restricted.

(ffffffffff) AuthorityTypeCode

A GDT AuthorityTypeCode 35800AI is the code indicating the type of authority. The code defines the employment agency for an appropriate country (i.e., DE for Germany). The code can be used in Personnel Administration to fulfill the legal obligations with regard to the contributions for severely disabled persons. An example of GDT AuthorityTypeCode 35800AI is:

<AuthorityTypeCode listID=20501 listAgencyID=310>1</AuthorityTypeCode>

AuthorityTypeCode may represent multiple authority sources, such as, for example: Code 1 is when the authority is an employment agency, Code 2 is when the authority is the department of family and social services, Code 3 is when the authority is a trade association Code 4 is when the authority is the welfare office, a division within the social services department, Code 5 is when the authority is the department for integration, which is responsible for the integration of severely disabled persons into the general labor market, Code 6 is when the authority is the regional employment office and Code 7 is when the authority is the regional board.

The structure of GDT AuthorityTypeCode 35800AI is depicted in FIG. 358AI. For GDT AuthorityTypeCode 35800AI, the Object Class is Authority Type 35802AI, the Representation/Association is Code 35804AI, the Type is CCT 35806AI and the Length is from one to two. The remark 35812AI shows that .GDT AuthorityTypeCode 35800AI can be restricted. For example, some code values of GDT AuthorityTypeCode 35800AI may be restricted according to an environment during use.

The GDT AuthorityTypeCode 35800AI includes an element ListID 35814AI, For ListID 35814AI, the Category is Attribute (A) 35816AI, the Object Class is CodeList 35818AI, the Property is Identification 35820AI, the Representation/Association is Identifier 35822AI, the Type is XSD 35824AI, the Type Name is token 35826AI, and the Cardinality between GDT AuthorityTypeCode 35800AI and ListID 35814AI is from zero to one 35828AI.

The GDT AuthorityTypeCode 35800AI includes an element ListAgencyID 35830AI, For ListAgencyID 35830AI, the Category is Attribute (A) 35832AI, the Object Class is CodeListAgency 35834AI, the Property is Identification 35836AI, the Representation/Association is Identifier 35838AI, the Type is XSD 35840AI, the Type Name is token 35842AI, and the Cardinality between GDT AuthorityTypeCode 35800AI and ListAgencyID 35844AI is from zero to one 35844AI.

The GDT AuthorityTypeCode 35800AI includes an element ListVersionID 35846AI, For ListVersionID 35846AI, the Category is Attribute (A) 35848AI, the Object Class is CodeList 35850AI, the Property is Version 35852AI, the Representation/Association is Identifier 35854AI, the Type is XSD 35856AI, the Type Name is token 35858AI, and the Cardinality between GDT AuthorityTypeCode 35800AI and ListVersionID 35846AI is from zero to one 35860AI.

The GDT AuthorityTypeCode 35800AI includes an element ListAgencySchemeID 35862AI, For ListAgencySchemeID 35862AI, the Category is Attribute (A) 35864AI, the Object Class is CodeListAgency 35866AI, the Property is Scheme 35868AI, the Representation/Association is Identifier 35870AI, the Type is XSD 35872AI, the Type Name is token 35874AI, and the Cardinality between GDT AuthorityTypeCode 35800AI and ListAgencySchemeID 35862AI is from zero to one 35876AI.

The GDT AuthorityTypeCode 35800AI includes an element ListAgencySchemeAgencyID 35878AI, For ListAgencySchemeAgencyID 35878AI, the Category is Attribute (A) 35880AI, the Object Class is CodeListAgency 35882AI, the Property is Scheme Agency 35884AI, the Representation/Association is Identifier 35886AI, the Type is XSD 35888AI, the Type Name is token 35890AI, and the Cardinality between GDT AuthorityTypeCode 35800AI and ListAgencySchemeAgencyID 35878AI is from zero to one 35892AI.

Several fixed, country-specific code lists, which can be different at runtime, can be assigned to the code. The individual code lists and the values and attributes can be: listID=20501, and listAgencyID=310.

The AuthorityTypeCodeContextElements defines a dependency or an environment in which the AuthorityTypeCode appears. The environment is described by context categories. With the context categories in AuthorityTypeCodeContextElements, the valid portion of code values of AuthorityTypeCode is restricted according to an envi-ronment during use.

(ggggggggggg) Bank

A GDT Bank 35800AJ is a business entity that performs financial investment services and payment transactions. The GDT Bank represents the attributes of a bank that identify a bank within the requirements of the payment transaction. It may not be suitable for representing the organizational structure of a credit institution. A GDT Bank 35800AJ may be a branch of a bank with a registered office in Germany with information about the SWIFT code and the bank number. An example of a GDT Bank 35800AJ is:

```
<Bank>
    <InternalID>Comdirect Bank Quickborn</InternalID>
    <StandardID>COBADEHDXXX</StandardID>
    <RoutingID>20041111</RoutingID>
    <RoutingIDTypeCode>BL</RoutingIDTypeCode>
```

-continued

```
    <CountryCode>DE<CountryCode>
</Bank>
```

The structure of GDT Bank 35800AJ is depicted in FIG. 358AJ. For GDT Bank 35800AJ, the Object Class is Bank 35802AJ and the Representation/Association is Details 35804AJ.

Several terms are used in FIG. 358AJ to describe the architecture. These include:

InternalID—proprietary identifier for the bank that can be used when both sender and recipient can access shared master data (extended enterprise).

StandardID—Bank Identification Code (BIC) of the Society for Worldwide Interbank Financial Telecommunications (S.W.I.F.T.), see GDT BankStandardID.

RoutingID—Number of the bank in a clearing system (see GDT BankRoutingID).

RoutingIDTypeCode—Type of RoutingID (see GDT BankRoutingIDTypeCode).

CountryCode—bank country, the country in which the bank identified earlier goes about its business. If the bank is a member in a national clearing system, the country to which this clearing system belongs is entered here.

Address—Address of the bank

BranchAddress—Address of the branch of the bank

GDT Bank 35800AJ includes an element InternalID 35806AJ. For Internal ID 35806AJ, the Category is E 35808AJ, the Object Class is Bank 35810AJ, the Property is Internal Identification 35812AJ, the Representation/Association is Identifier 35814AJ, the Type is GDT 35816AJ, the Type Name is BankInternalID 35818AJ and the Cardinality between GDT Bank 35800AJ and InternalID 35806AJ is from zero to one 35820AJ.

GDT Bank 35800AJ includes an element StandardID 35822AJ. For StandardID 35822AJ, the Category is E 35824AJ, the Object Class is Bank 35826AJ, the Property is Standard Identification 35828AJ, the Representation/Association is Identifier 35830AJ, the Type is GDT 35832AJ, the Type Name is BankStandardID 35834AJ and the Cardinality between GDT Bank 35800AJ and StandardID 35822AJ is from zero to one 35836AJ.

GDT Bank 35800AJ includes an element RoutingID 35838AJ. For RoutingID 35838AJ, the Category is E 35840AJ, the Object Class is Bank 35842AJ, the Property is Routing Identification 35844AJ, the Representation/Association is Identifier 35846AJ, the Type is GDT 35848AJ, the Type Name is BankRoutingID 35850AJ and the Cardinality between GDT Bank 35800AJ and RoutingID 35838AJ is from zero to one 35852AJ.

GDT Bank 35800AJ includes an element RoutingIDTypeCode 35854AJ. For RoutingIDTypeCode 35854AJ, the Category is E 35856AJ, the Object Class is Bank 35858AJ, the Property is Routing Identification Type 35860AJ, the Representation/Association is Code 35862AJ, the Type is GDT 35864AJ, the Type Name is BankRoutingIDTypeCode 35866AJ and the Cardinality between GDT Bank 35800AJ and RoutingIDTypeCode 35854AJ is from zero to one 35868AJ.

GDT Bank 35800AJ includes an element CountryCode 35870AJ. For CountryCode 35870AJ, the Category is E 35872AJ, the Object Class is Bank 35874AJ, the Property is Country 35876AJ, the Representation/Association is Code 35878AJ, the Type is GDT 35880AJ, the Type Name is CountryCode 35881AJ and the Cardinality between GDT Bank 35800AJ and CountryCode 35870AJ is from zero to one 35882AJ.

GDT Bank 35800AJ includes an element Address 35883AJ. For Address 35883AJ, the Category is E 35884AJ, the Object Class is Bank 35885AJ, the Property is Address 35886AJ, the Representation/Association is Details 35887AJ, the Type is GDT 35888AJ, the Type Name is Address 35889AJ and the Cardinality between GDT Bank 35800AJ and Address 35883AJ is from zero to one 35890AJ.

GDT Bank 35800AJ includes an element BranchAddress 35891AJ. For BranchAddress 35891AJ, the Category is E 35892AJ, the Object Class is Bank 35893AJ, the Property is Branch Address 35894AJ, the Representation/Association is Details 35895AJ, the Type is GDT 35896AJ, the Type Name is Address 35897AJ and the Cardinality between GDT Bank 35800AJ and BranchAddress 35891AJ is from zero to n 35898AJ.

The GDT Bank 35800AJ represents the attributes of a bank that identify a bank within the requirements of the payment transaction. It is not suitable for representing the organizational structure of a credit institution.

To identify a bank, at least the StandardID, the RoutingID, or the InternalID may be entered, or at least the Organsiation-FormattedName and PhysicalAddress.CityName may be entered in the address.

If the bank is only identified by the InternalID, the RoutingID, or by entering the name and location in the address, the CountryCode may be entered. The CountryCode can be omitted if the StandardID is entered. The RoutingIDTypeCode may be entered if the RoutingID is filled and if there are multiple clearing systems in the country of the bank.

(hhhhhhhhhhh) BankAccountBalance

A GDT BankAccountBalance 35800AK is the difference between the relevant debit and credit turnover for a bank account at a certain point in time. An example of GDT BankAccountBalance 35800AK is:

```
<BankAccountBalance>
    <TypeCode>100</TypeCode>
    <CreationDateTime>2005-01-01</CreationDateTime>
    <Amount currencyCode="EUR">100.55</Amount>
</BankAccountBalance>
```

The structure of GDT BankAccountBalance 35800AK is depicted in FIG. 358AK. For GDT BankAccountBalance 35800AK, the Object Class is Bank Account Balance 35802AK and the Representation/Association is Details 35804AK.

GDT BankAccountBalance 35800AK includes an element TypeCode 35806AK. For TypeCode 35806AK, the Category is Element (E) 35807AK, the Object Class is Bank Account Balance 35808AK, the Property is Type 35810AK, the Representation/Association is Code 35812AK, the Type is GDT 35814AK, the Type Name is Bank Account Balance type Code 35816AK, and the Cardinality between GDT BankAccountBalance 35800AK and TypeCode 35806AK is from zero to one 35818AK.

GDT BankAccountBalance 35800AK includes an element CreationDateTime 35820AK. For CreationDateTime 35820AK, the Category is Element (E) 35821AK, the Object Class is Bank Account Balance 35822AK, the Property is DateTime 35824AK, the Representation/Association is DateTime 35826AK, the Type is GDT 35828AK, the Type Name is DateTime 35830AK and the Cardinality between GDT BankAccountBalance 35800AK and CreationDateTime 35820AK is one 35832AK.

GDT BankAccountBalance 35800AK includes an element Amount 35834AK. For Amount 35834AK, the Category is Element (E) 35835AK, the Object Class is Bank Account Balance 35836AK, the Property is Amount 35838AK, the Representation/Association is Amount 35840AK, the Type is GDT 35842AK, the Type Name is Amount 35844AK and the Cardinality between GDT BankAccountBalance 35800AK and Amount 35834AK is one 35846AK.

The GDT BankAccountBalance 35800AK may contain a TypeCode element to specify the type of bank account balance, a CreationDateTime element to specify the balance at a certain point in time, and an Amount element to specify the balance of a bank account.

(iiiiiiiiii) BankAccountBalanceTypeCode

A GDT BankAccountBalanceTypeCode 35800AL is the coded representation of a type of bank account balance. Turnover on an account may be categorized according to various criteria. An example of GDT BankAccountBalanceTypeCode 35800AL is:

<BankAccountBalanceTypeCode>100</BankAccount-BalanceTypeCode>

The structure of GDT BankAccountBalanceTypeCode 35800AL is depicted in FIG. 358AL. For GDT BankAccountBalanceTypeCode 35800AL, the Object Class is Bank Account Balance 35802AL, the Property is Type 35804AL, the Representation/Association is Code 35806AL, the Type is CCT 35808AL, the Type Name is Code 35810AL, and the Length is from one to thirty 35812AL. The remark 35814AL shows that GDT BankAccountBalanceTypeCode 35800AL can be restricted.

GDT BankAccountBalanceTypeCode 35800AL includes an element ListID 35816AL. For element ListID 35816AL, the Category is Attribute (A) 35818AL, the Object Class is CodeList 35820AL, the Property is Identification 35822AL, the Representation/Association is Identifier 35824AL, the Type is XSD 35826AL, the Type Name is token 35828AL, the Length is from one to sixty 35830AL, and the Cardinality between GDT BankAccountBalanceTypeCode 35800AL and the element ListID 35816BG is from zero to one 35832AL.

GDT BankAccountBalanceTypeCode 35800AL includes an element ListVersionID 35834AL. For ListVersionID 35834AL, the Category is Attribute (A) 35836AL, the Object Class is CodeList 35838AL, the Property is Version 35840AL, the Representation/Association is Identifier 35842AL, the Type is XSD 35844AL, the Type Name is token 35846AL, the Length is from one to fifteen 35848AL, and the Cardinality between GDT BankAccountBalanceTypeCode 35800AL and the element ListVersionID 35834AL is from zero to one 35850AL.

GDT BankAccountBalanceTypeCode 35800AL includes an element ListAgencyID 35852AL. For ListAgencyID 35852AL, the Category is Attribute (A) 35854AL, the Object Class is CodeListAgency 35856AL, the Property is Identification 35858AL, the Representation/Association is Identifier 35860AL, the Type is XSD 35862AL, the Type Name is token 35864AL, the Length is from one to sixty 35868AL, and the Cardinality between GDT BankAccountBalanceTypeCode 35800AL and the element ListAgencyID 35852AL is from zero to one 35868AL.

GDT BankAccountBalanceTypeCode 35800AL includes an element ListAgencySchemeID 35870AL. For ListAgencySchemeID 35870AL, the Object Class is CodeListAgency 35874AL, the Property is Scheme 35876AL, the Representation/Association is Identifier 35878AL, the Type is XSD

35880AL, the Type Name is token 35882AL, the Length is from one to sixty 35884AL, and the Cardinality between GDT BankAccountBalanceTypeCode 35800AL and the element ListAgencySchemeID 35870AL is from zero to one 35886AL.

GDT BankAccountBalanceTypeCode 35800AL includes an element ListAgencySchemeAgencyID 35888AL. For ListAgencySchemeAgencyID 35888AL, the Object Class is CodeListAgency 35892AL, the Property is Scheme Agency 35894AL, the Representation/Association is Identifier 35895AL, the Type is XSD 35896AL, the Type Name is token 35897AL, the Length is from one to three 35898AL and the Cardinality between GDT BankAccountBalanceTypeCode 35800AL and the element ListAgencySchemeAgencyID 35888AL is from zero to one 35899AL.

A customer can determine the codes in the code list. The attributes of the codes can be assigned the following values: listID="10326," listAgencyID—ID of the Customer (ID from DE 3055, if listed there), listVersionID—version of the particular code list. Assigned and managed by the Customer, listAgencySchemeID—ID of the scheme if the listAgencyID does not come from DE 3055, and listAgencySchemeAgencyID—ID of the organization from DE 3055 that manages the listAgencySchemeID scheme The data type GDT BankAccountBalanceTypeCode 35800AL may have different types of bank account balance values. For example, a value of 100, 200, 3000, or PL02 may indicate a request for the balance of salary deposits, a balance of cash deposits, a notice lock period balance or a balance of debit memo deposits, respectively.

(jjjjjjjjjjj) BankAccountDifferentiatorID

A GDT BankAccountDifferentiatorID 35800AM is a unique identifier to differentiate between bank accounts. An example of GDT BankAccountDifferentiatorID 35800AM is:

<BankAccountDifferentiatorID>USD</BankAccount-DifferentiatorID>

The structure of the GDT BankAccountDifferentiatorID 35800AM is depicted in FIG. 358AM. For GDT BankAccountDifferentiatorID 35800AM, the Object Class is Bank Account 35802AM, the Property is Differentiator Identification 35804AM, the Representation/Association is Identifier 35806AM, the Type is CCT 35808AM, the Type Name is Identifier 35810AM, and the Length is from one to twenty 35812AM. The remark shows that the GDT BankAccountDifferentiatorID 35800AM can be restricted.

The GDT BankAccountDifferentiatorID 35800AM can be used to differentiate between bank accounts that are managed under one bank account number. More particularly, the BankAccountDifferentiatorID can be used to differentiate between bank accounts that are managed under one account number. For example: various terms for time deposits (monthly, quarterly, and annual fixed interest periods) managed under one account number, accounts in different currencies managed under one account number, or various products (checking, deposit, savings, time deposit account) managed under one account number. The differentiation may be accomplished by using a different two-digit end number for each individual account.

(kkkkkkkkkkk) BankAccountHolderName

A GDT BankAccountHolderName 35800AN is the name of the account holder of a bank account. The GDT BankAccountHolderName 35800AN contains the name of the account holder in the form as defined at the bank. The BankAccountHolderName corresponds to the data elements KOINH_FI and BU_KOINH in SAP ERP. An example of the GDT BankAccountHolderName 35800AN is:

<BankAccountHolderName>Max Mustermann</BankAccountHolderName>

The structure of GDT BankAccountHolderName 35800AN is depicted in FIG. 358AN. For GDT BankAccountHolderName 35800AN, the Object Class is Bank Account 35802AN, the Property is Holder 35804AN, the Representation/Association is Name 35806AN, the Type is GDT 35808AN, and the Length is from one to eighty 35812AN. The remark 35814AN shows that the GDT BankAccountHolderName 35800AN can be restricted.

The GDT BankAccountHolderName 35800AN contains the name of the account holder in the form as defined at the bank and may correspond to the data elements KOINH_FI, BU_KOINH in SAP ERP.

(lllllllllll) BankAccountID

A GDT BankAccountID 35800AO is the unique identifier assigned to a bank account by the account managing bank (i.e., Basic Bank Account Number, BBAN). The BankAccountID corresponds to the data type BNKN35 in SAP ERP. An example of GDT BankAccountID 35800AO is:

```
<BankAccountID>
  0078400542
</BankAccountID>
```

The structure of the GDT BankAccountID 35800AO is depicted in FIG. 358AO. For GDT BankAccountID 35800AO, the Object Class is BankAccount 35802AO, the Property is Identification 35804AO, the Representation/Association is Identifier 35806AO, the Type is CCT 35808AO, and the Length is from one to thirty-five 35812AO. The remark 35814AO shows that the GDT BankAccountID 35800AO can be restricted.

(mmmmmmmmmmm) BankAccountIDCheckDigitValue

A GDT BankAccountIDCheckDigitValue 35800AP is a check digit for a bank account number. Check digits are normally numerical. There are some exceptions, for example, Italian bank account numbers may include a check digit that is alphanumeric. An example of GDT BankAccountIDCheckDigitValue 35800AP is:

<BankAccountIDCheckDigitValue>42</BankAccountIDCheckDigitValue>

The structure of GDT BankAccountIDCheckDigitValue 35800AP is depicted in FIG. 358AP. For GDT BankAccountIDCheckDigitValue 35800AP, the Object Class is Bank Account 35802AP, the Property is Identifier Check Digit 35804AP, the Representation/Association is Value 35804AP, the Type is XSD 35808AP, the Type Name is String 35810AP, and the Length is from one to two.

The data type GDT BankAccountIDCheckDigitValue 35800AP can be used to display the check digit separate from the bank account number. In some account numbers, the check digit is a fixed part of the account number. In this case, GDT BankAccountIDCheckDigitValue 35800AP is not used.

Separate check digits may be stored in the control key (data element BKONT). In countries which do not use any separate check digits, the control key may be filled with other data.

(nnnnnnnnnnn) BankAccountInternalID

A GDT BankAccountInternalID 35800AQ is a proprietary identifier for a bank account. The GDT BankAccountInternalID 35800AQ attributes may include schemeID, such as Bank ID and schemeAgencyID, such as a business system in which the identifier was assigned. An example of GDT BankAccountInternalID 35800AQ is:

<BankAccountInternalID schemeAgencyID="VV4_ 000">DE_COBA_GIRO_EUR</BankAccountInternalID>

The structure of GDT BankAccountInternalID 35800AQ is depicted in FIG. 358AQ. For GDT BankAccountInternalID 35800AQ, the Object Class is Bank Account 35802AQ, the Property Qualifier is Internal 35804AQ, the Property is Identification 35806AQ, the Representation/Association is Identifier 35808AQ, the Type is CCT 35810AQ, the Type Name is Identifier 35812AQ, and the Length is from one to thirty-two 35814AQ. The remark 35816AQ shows that the GDT BankAccountInternalID 35800AQ can be restricted.

The GDT BankAccountInternalID 35800AQ includes an element SchemeAgencyID 35818AQ. For SchemeAgencyID 35818AQ, the Category is Attribute (A) 35820AQ, the Object Class is Identification Scheme Agency 35822AQ, the Property Qualifier is Identification 35824AQ, the Property is Identification 35826AQ, the Representation/Association is Identifier 35828AQ, the Type is XSD 35830AQ, the Type Name is token 35832AQ, the Length is from one to sixty 35834AQ, and the Cardinality between GDT BankAccountInternalID 35800AQ and SchemeAgencyID 35818AQ is from zero to one 35836AQ.

The GDT BankAccountInternalID 35800AQ may be used when both sender and recipient have access to shared master data, for example, during internal communication within an enterprise. In an ERP system, BankAccountInternalID contains the key fields BUKRS, HBKID, and HKTID of table T012K.

(ooooooooooo) BankAccountStandardID

A GDT BankAccountStandardID 35800AR is the International Bank Account Number (IBAN), that is, a standardized identifier for a bank account. For example, GDT the BankAccountStandardID 35800AR corresponds to the data type IBAN in SAP ERP. An example of the GDT BankAccountStandardID 35800AR is:

```
<BankAccountStandardID>
    DE24200411110078400542
</BankAccountStandardID>
```

The structure of GDT BankAccountStandardID 35800AR is depicted in FIG. 358AR. For GDT BankAccountStandardID 35800AR, the object class is Bank Account 35802AR, the Property Qualifier is Standard 35804AR, the Property is Identification 35806AR, the Representation/Association is Identifier 35808AR, the Type is CCT 35810AR, the Type Name is Identifier 35812AR and the Length is from one to thirty-four 35814AR. The remark 35816AR shows that the GDT BankAccountStandardID 35800AR can be restricted.

The attributes of the CCT Identifier may be filled with the following values, which identify the standard ISO 13616: the schemeID is "13616" and the schemeAgencyID is "5." The BankAccountStandardID corresponds to the data type IBAN in SAP ERP.

(ppppppppppp) BankAccountTypeCode

A GDT BankAccountTypeCode 35800AS is the coded representation of the type of a bank account. An example of GDT BankAccountTypeCode 35800AS is:

<BankAccountTypeCode>3</BankAccountTypeCode>

The structure of GDT BankAccountTypeCode 35800AS is depicted in FIG. 358AS. For GDT BankAccountTypeCode 35800AS, the Object Class is Bank Account 35801AS, the Property is Type 35804AS, the Representation/Association is Code 35806AS, the Type is CCT 35808AS, the Type Name is Code 35810AS, and the Length is from one to three. The remark 35814AS shows that the GDT BankAccountTypeCode 35800AS can be restricted.

The GDT BankAccountTypeCode 35800AS may be used to specify the type of a bank account, such as current account, loan account, and savings account. It can also be used for specific business transactions. Typically, one standard code list (ANSI X12 569) is assigned to the code. The attributes can be assigned values as follows: the listID is "569" and the listAgencyID is "116."

(qqqqqqqqqqq) BankChargeBearerCode

A GDT BankChargeBearerCode 35800AT is the coded representation of the bearer of the charges of a bank transaction. An example of GDT BankChargeBearerCode 35800AT is:

<BankChargeBearerCode>OUR</BankChargeBearerCode>

The structure of GDT BankChargeBearerCode 35800AT GDT is depicted in FIG. 358AT. For GDT BankChargeBearerCode 35800AT, the Object Class is Bank Charge Bearer 35802AT, the Representation/Association is Code 35804AT, the Type is CCT 35806AT, the Type Name is Code 35808AT, and the Length is from one to four. The remark 35812AT shows that GDT BankChargeBearerCode 35800AT can be restricted.

The data type GDT BankChargeBearerCode 35800AT may be used to describe the distribution of costs between the initiator and the recipient of a payment transaction. Typically, one fixed standard code list is assigned to the code. The attributes can be assigned values as follows: the listID is "ChargeBearerCode," the listAgencyID is "117," and the listVersionID is the version of the particular code list. The code list and its values include OUR, BEN and SHA. OUR indicates an Initiator bears the cost of a payment transaction. BEN indicates a Beneficiary bears the cost of a payment transaction. SHA indicates a sharing of costs.

(rrrrrrrrrrr) BankInternalID

A GDT BankInternalID 35800AU is a proprietary identifier for a bank. For example, the GDT BankInternalID 35800AU may correspond to the field bank key (e.g. data element BANKK). An example of GDT BankInternalID 35800AU is:

<BankInternalID schemeAgencyID="Vv4_ 000">COBA</BankInternalID>

The structure of GDT BankInternalID 35800AU is depicted in FIG. 358AU. For GDT BankInternalID 35800AU, the Object Class is Bank 35804AU, the Property is Internal Identification 35806AU, the Representation/Association is Identifier 35808AU, the Type is CCT 35810AU, the Type Name is Identifier 35812AU, and the Length is from one to eighteen 35814AU. The remark 35816AU shows that GDT BankInternalID 35800AU can be restricted.

GDT BankInternalID 35800AU includes an element SchemeAgencyID 35818AU. For SchemeAgencyID 35818AU, the Category is Attribute (A) 35820AU, the Object Class is Identification Scheme Agency 35822AU, the Property is Identification 35824AU, the Representation/Association is Identifier 35826AU, the Type is XSD 35828AU, the Type Name is Token 35830AU, the Length is from one to sixty 35832AU, and the Cardinality between GDT BankInternalID 35800AU and SchemeAgencyID 35818AU is from zero to one 35834AU.

The data type GDT BankInternalID 35800AU can be used when both sender and recipient have access to shared master data, for example during internal communication within an enterprise. In an SAP ERP system, BankInternalID corresponds to the field bank key (e.g. data element BANKK).

(sssssssssss) BankRoutingID

A GDT BankRoutingID 35800AV identifies a bank by its number in a clearing system. A clearing system is an electronic system with which the participating banks eliminate (balance) their non-cash payment flows with each other and clear receivables and payables. An example of a GDT BankRoutingID 35800AV is:

<BankRoutingID>20041111</BankRoutingID>

The structure of GDT BankRoutingID 35800AV is depicted in FIG. 358AV. For GDT BankRoutingID 35800AV, the Object Class is Bank 35802AV, the Property is Routing Identification 35804AV, the Representation/Association is Identifier 35806AV, the Type is CCT 35808AV, The Type Name is Identifier 35810AV, and the Length is from one to thirty-five 35812AV. The remark 35814AV shows that GDT BankRoutingID 35800AV can be restricted.

The data type GDT BankRoutingID 35800AV is the routing number of a bank in a clearing system. For example, a bank number, a sort code, an ABA Routing Number or a CHIPS Participant Number. The maximum length and the form of the ID may be dependent on the clearing system. The GDT BankRoutingID 35800AV is unique within one clearing system. In some countries there is only one (national) clearing system. If this is the case and the bank country is known from the context, the BankRoutingIDTypeCode may not be entered.

(ttttttttttt) BankRoutingIDTypeCode

A GDT BankRoutingIDTypeCode 35800AW is a coded representation of the type of a bank number. An example of GDT BankRoutingIDTypeCode 35800AW is:

<BankRoutingIDTypeCode>BL</BankRoutingIDTypeCode>

The structure of GDT BankRoutingIDTypeCode 35800AW is depicted in FIG. 358AW. For GDT BankRoutingIDTypeCode 35800AW, the Object Class is Bank Routing Identifier 35802AW, the Property is Type 35804AW, the Representation/Association is Code 35806AW, the Type is CCT 35808AW, The Type Name is Code 35810AW, and the Length is from one to three 35812AW. The remark 35814AW shows that GDT BankRoutingIDTypeCode 35800AW can be restricted.

The data type GDT BankRoutingIDTypeCode 35800AW may be used to enter the type of a bank number and thus identify the clearing system implicitly. Each type of a bank number belongs to a different clearing system. There can be multiple clearing systems in some countries (for example in the United States). To uniquely identify a bank using a bank number, the country of the bank may not be sufficient in these cases.

(uuuuuuuuuuu) BankStandardID

A GDT BankStandardID 35800AX is a standardized identifier for a bank according to the worldwide identification scheme of the Society For Worldwide Interbank Financial Telecommunications (S.W.I.F.T.) organization. The GDT BankStandardID 35800AX may correspond to the data element SWIFT in SAP ERP. An example of GDT BankStandardID 35800AX is:

<BankStandardID>COBADEHDXXX</BankStandardID>

The structure of GDT BankStandardID 35800AX is depicted in FIG. 358AX. For GDT BankStandardID 35800AX, the Object Class is Bank 35802AX, the Property Qualifier is Standard 35804AX, the Property is Identification 35806AX, the Representation/Association is Identifier 35808AX, the Type is CCT 35810AX, The Type Name is Identifier 35812AX, and the Length is from eight to eleven 35814AX. The remark 35816AX shows that GDT BankStandardID 35800AX can be restricted.

The attributes of the CCT Identifier are implicitly filled with the following values to identify the S.W.I.F.T organization: schemeAgencyID="17." The BankStandardID corresponds to the data element SWIFT in SAP ERP. Permitted values for BankStandardID 35800AX are codes according to ISO 9362.

(vvvvvvvvvvv) BlockingReasonCode

A GDT BlockingReasonCode 35800AY is a coded representation for the reason why a processing of a document is blocked. For example, in messages, GDT BlockingReasonCode 35800AY can be used when both sender and recipient have access to shared or harmonized Business Configuration, such as, during internal communication in an enterprise. An example of GDT BlockingReasonCode 35800AY is:

<BlockingReasonCode>1</BlockingReasonCode>

The structure of GDT BlockingReasonCode 35800AY is depicted in FIG. 358AY. For GDT BlockingReasonCode 35800AY, the Object Class is Blocking Reason 35802AY, the Representation/Association is Code 35806AY, the Type is CCT 35808AY, The Type Name is Code 35810AY, and the Length is from one to two 35812AY. The remark 35814AY shows that GDT BlockingReasonCode 35800AY can be restricted.

The data type BlockingReasonCode 35800AY is customer specific. Multiple code lists are allowed and differentiated by their attributes. The ID of the code list may include a billing or delivery listID. The other attributes listAgencyID, listVersionID, listAgencySchemeID, listAgencySchemeAgencyID are omitted because they would contain constant, customer specific values during runtime.

The GDT BlockingReasonCode 35800AY may be used to state why the document processing is blocked for a particular business partner. It states that the processing of document is blocked for the partner for the entire company or only for selected sales areas. Examples for the semantics of the code list are: In billing scenarios (ListID='BILLING'); for Calculation Missing, further processing is blocked due to missing calculation; for Completion Confirmation Missing, further processing is blocked due to missing completion confirmation; for Prices Incomplete, further processing is blocked due to incomplete prices; for Political Reasons, further processing is blocked due to political reasons;, for Bottleneck Material, further processing is blocked due to a bottleneck in supply of material.

In messages, GDT BlockingReasonCode 35800AY can be used when both sender and recipient have access to shared or harmonized Business Configuration, for example, during internal communication in an enterprise.

(wwwwwwwwwww) BusinessPartnerBankDetailsID

In the context of the business partner, a GDT BusinessPartnerBankDetailsID 35800AZ unambiguously identifies bank details. In addition to specifying an account, the bank details of a business partner may also contain administrative information. The following are examples of administrative information for bank details: the validity of the bank details, additional information for the bank details, identification of the bank details in an external system, an indicator showing whether collection authorization has been granted, a description of the bank details themselves, or information about whether a change to different bank details took place, and if so, when this occurred. An example of GDT BusinessPartnerBankDetailsID 35800AZ is:

<BusinessPartnerBankDetailsID>A1W3</BusinessPartnerBankDetailsID>

The structure of GDT BusinessPartnerBankDetailsID 35800AZ is depicted in FIG. 358AZ. For GDT BusinessPartnerBankDetailsID 35800AZ, the Object Class is Business Partner Bank Details 35802AZ, the Property is Identification 35804AZ, the Representation/Association is Identifier 35806AZ, the Type is CCT 35808AZ, the Type Name is Identifier 35810AZ, and the Length is from one to four 35812AZ. The remark 35814AZ shows that GDT BusinessPartnerBankDetailsID 35800AZ can be restricted.

The data type GDT BusinessPartnerBankDetailsID 35800AZ may be used in order to identify the bank details of a business partner. The dictionary object BU_BKVID is assigned to BusinessPartnerBankDetailsID 358000AZ.

(xxxxxxxxxxx) BusinessPartnerCategoryCode

A GDT BusinessPartnerCategoryCode 35800BA is the description, in the form of a code, of a business partner category. A business partner category may describe the nature of a business partner and establishes the category of the business partner. The following categories exist: Natural person, Organization and Business partner group. The categories represent a classification of business partners that is both complete and disjoint. An example of GDT BusinessPartnerCategoryCode 35800BA is:

<BusinessPartnerCategoryCode>2</BusinessPartnerCategoryCode>

The structure of GDT BusinessPartnerCategoryCode 35800BA is depicted in FIG. 358BA. For GDT BusinessPartnerCategoryCode 35800BA, the Object Class is Business Partner 35802BA, the Property is Category 35804BA, the Representation/Association is Code 35806BA, the Type is CCT 35808BA, the Type Name is Code 35810BA, and the Length is one 35812BA. The remark 35814BA shows that GDT BusinessPartnerCategoryCode 35800BA can be restricted.

The data type GDT BusinessPartnerCategoryCode 35800BA may be used to distinguish a business partner as a natural person, an organization or a group. Depending on the category of the business partner, different information can be stored, or different data can be entered when a business partner is created.

The BusinessPartnerCategoryCode is a fixed SAP code list. The following instances are possible: 1 (Person)—the business partner is a natural person, 2 (Organization)—the business partner is an organization or 3 (Group) the business partner is a group of natural persons or organizations. The attributes have the following values: ListID="10046," listAgencyID="310," and ListVersionID—version of the relevant code list.

(yyyyyyyyyyy) BusinessPartnerRelationshipCategoryCode

A GDT BusinessPartnerRelationshipCategoryCode 35800BB is the description, in the form of a code, of a business partner relationship. A category of a business partner relationship describes the nature of relationships between business partners, and establishes the basic characteristics for relationships of this category. An example of GDT BusinessPartnerRelationshipCategoryCode 35800BB is:

<BusinessPartnerRelationshipCategoryCode>12WE45</BusinessPartnerRelationshipCategoryCode>

The structure of GDT BusinessPartnerRelationshipCategoryCode 35800BB is depicted in FIG. 358BB. For GDT BusinessPartnerRelationshipCategoryCode 35800BB, the Object Class is Business Partner Relationship 35802BB, the Property is Category 35804BB, the Representation/Association is Code 35806BB, the Type is CCT 35808BB, the Type Name is Code 35810BB, and the Length is from one to six 35812BB. The remark 35814BB shows that GDT BusinessPartnerRelationshipCategoryCode 35800BB can be restricted.

GDT BusinessPartnerRelationshipCategoryCode 35800BB includes an element ListID 35816BB. For element ListID 35816BB, the Category is Attribute (A) 35818BB, the Object Class is CodeList 35820BB, the Property is Identification 35822BB, the Representation/Association is Identifier 35824BB, the Type is XSD 35826BB, the Type Name is token 35828BB, and the Cardinality between GDT BusinessPartnerRelationshipCategoryCode 35800BB and the element ListID 35816BB is from zero to one 35830BB.

GDT BusinessPartnerRelationshipCategoryCode 35800BB includes an element ListAgencyID 35832BB. For ListAgencyID 35832BB, the Category is Attribute (A) 35834BB, the Object Class is CodeListAgency 35836BB, the Property is Identification 35838BB, the Representation/Association is Identifier 35840BB, the Type is XSD 35842BB, the Type Name is token 35844BB, and the Cardinality between GDT BusinessPartnerRelationshipCategoryCode 35800BB and the element ListAgencyID 35832BB is from zero to one 35846BB.

GDT BusinessPartnerRelationshipCategoryCode 35800BB includes an element ListVersionID 35848BB. For ListVersionID 35848BB, the Category is Attribute (A) 35850BB, the Object Class is CodeList 35852BB, the Property is Version 35854BB, the Representation/Association is Identifier 35856BB, the Type is XSD 35858BB, the Type Name is token 35860BB, and the Cardinality between GDT BusinessPartnerRelationshipCategoryCode 35800BB and the element ListVersionID 35848BB is from zero to one 35862BB.

GDT BusinessPartnerRelationshipCategoryCode 35800BB includes an element ListAgencySchemeID 35864BB. For ListAgencySchemeID 35864BB, the Category is Attribute (A) 35866BB, the Object Class is CodeListAgency 35868BB, the Property is Scheme 35870BB, the Representation/Association is Identifier 35872BB, the Type is XSD 35874BB, the Type Name is token 35876BB, and the Cardinality between GDT BusinessPartnerRelationshipCategoryCode 35800BB and the element ListAgencySchemeID 35864BB is from zero to one 35878BB.

GDT BusinessPartnerRelationshipCategoryCode 35800BB includes an element ListAgencySchemeAgencyID 35880BB. For ListAgencySchemeAgencyID 35880BB, the Category is Attribute (A) 35882BB, the Object Class is CodeListAgency 35884BB, the Property is Scheme Agency 35886BB, the Representation/Association is Identifier 35888BB, the Type is XSD 35890BB, the Type Name is token 35892BB, and the Cardinality between GDT BusinessPartnerRelationshipCategoryCode 35800BB and the element ListAgencySchemeAgencyID 35880BB is from zero to one 35894BB.

The data type GDT BusinessPartnerRelationshipCategoryCode 35800BB may be used in scenarios where a business partner A is a contact person of a business partner B, or in scenarios where a business partner A is a shareholder of a business partner B.

There are alternative code lists that differ at configuration and/or runtime. SAP delivers the following code list for the GDT:

| Code | Name | Description |
|---|---|---|
| BUR001 | Contact Person Relationship | Business partner A has business partner B as contact person |
| BUR002 | Activity partner relationship | Business partner A has business partner B as activity partner |
| BUR003 | Shared living arrangement relationship | A shared living arrangement (business partner A) has business partner B as a member. |
| BUR004 | Marriage relationship | Business partner A is married to business partner B |
| BUR006 | Alias (identity) relationship | Business partner A is identical to business partner B |
| BUR010 | Employee relationship | An organization (business partner A) has business partner B as an employee. |
| BUR011 | Employee responsible relationship | An organization (business partner A) has business partner B as the employee responsible. |
| BUR013 | Replacement relationship | Business partner A is replaced by business partner B |
| BUR020 | Department relationship | Business partner A has business partner B as a department |
| BUR021 | Parent-child relationship | Business partner A has business partner B as a child |
| BUR022 | Guardian relationship | Business partner A is the guardian of business partner B |
| BUR023 | Relative relationship | Business partner A is related to business partner B |
| BUR024 | Marriage partnership relationship | Business partner B is a member of the marriage partnership (business partner A) |
| BURC01 | Shareholder Relationship | Business partner A is a shareholder of business partner B |

(zzzzzzzzzzz) BusinessTransactionDocumentBankAccount

A GDT BusinessTransactionDocumentBankAccount 35800BC contains the information exchanged in business documents about a bank account involved in business transactions. A bank account may record a customer's bank transactions. An example of GDT BusinessTransactionDocumentBankAccount 35800BC is:

```
<BusinessTransactionDocumentBankAccount>
    <ID>0078400542</ID>
    <CurrencyCode>EUR</CurrencyCode>
    <HolderName>Max Mustermann</HolderName>
    <Bank>
        <StandardID>COBADEHDXXX</StandardID>
        <RoutingID>20041111</RoutingID>
        <RoutingIDTypeCode>BL</ RoutingIDTypeCode>
        <CountryCode>DE<CountryCode>
    </Bank>
</BusinessTransactionDocumentBankAccount>
```

</BusinessTransactionDocumentBankAccount>

The structure of GDT BusinessTransactionDocumentBankAccount 35800BC is depicted in FIG. 358BC. For GDT BusinessTransactionDocumentBankAccount 35800BC the Object Class is Business Transaction Document Bank Account 35802BC and the Representation/Association is Details 35804BC.

GDT BusinessTransactionDocumentBankAccount 35800BC includes an element ID 35806BC. For ID 35806BC, the Category is Element (E) 35808BC, the Object Class is Business Transaction Document Bank Account 35810BC, the Property is Identification 35812BC, the Representation/Association is Identifier 35814BC, the Type is GDT 35816BC, the Type Name is BankAccountID 35818BC, and the Cardinality between GDT Business Transaction Document Bank Account 35802BC and ID 35806BC is from zero to one 35820BC.

GDT BusinessTransactionDocumentBankAccount 35800BC includes an element ID Check Digit Value 35822BC. For ID Check Digit Value 35822BC, the Category is Element (E) 35824BC, the Object Class is Business Transaction Document Bank Account 35826BC, the Property is IDCheckDigit 35828BC, the Representation/Association is Value 35830BC, the Type is GDT 35832BC, the Type Name is BankAccountIDCheckDigitValue 35834BC, and the Cardinality between GDT Business Transaction Document Bank Account 35802BC and ID Check Digit Value 35822BC is from zero to one 35836BC.

GDT BusinessTransactionDocumentBankAccount 35800BC includes an element Internal ID 35838BC. For Internal ID 35838BC, the Category is Element (E) 35840BC, the Object Class is Business Transaction Document Bank Account 35842BC, the Property is Internal Identification 35844BC, the Representation/Association is Identifier 35846BC, the Type is GDT 35848BC, the Type Name is BankAccountInternalID 35850BC, and the Cardinality between GDT Business Transaction Document Bank Account 35802BC and Internal ID 35838BC is from zero to one 35852BC.

GDT BusinessTransactionDocumentBankAccount 35800BC includes an element Standard ID 35854BC. For Standard ID 35854BC, the Category is Element (E) 35856BC, the Object Class is Business Transaction Document Bank Account 35858BC, the Property is Standard Identification 35860BC, the Representation/Association is Identifier 35862BC, the Type is GDT 35864BC, the Type Name is BankAccountStandardID 35866BC, and the Cardinality between GDT Business Transaction Document Bank Account 35802BC and Standard ID 35854BC is from zero to one 35868BC.

GDT BusinessTransactionDocumentBankAccount 35800BC includes an element TypeCode 35870BC. For Type Code 35870BC, the Category is Element (E) 35872BC, the Object Class is Business Transaction Document Bank Account 35874BC, the Property is Type 35876BC, the Representation/Association is Code 35878BC, the Type is GDT 35880BC, the Type Name is BankAccountTypeCode 35881BC, and the Cardinality between GDT Business Transaction Document Bank Account 35802BC and Type Code 35870BC is from zero to one 35882BC.

(aaaaaaaaaaaa) CentralBankReportItem

A GDT CentralBankReportItem 35800BD is a single report to the central bank during a foreign payment. An example of GDT CentralBankReportItem 35800BD is:

```
<CentralBankReportItem>
    <ReportingCountryCode>DE</CountryCode>
    <SupplyingCountryCode >US</VendorCountryCode>
    <Amount currencyCode="USD">2500.00</ Amount>
    <ReasonClassificationCode>2</ClassificationCode>
    <ReasonCode>520</Code>
    <ReasonDescription> Repay for independent work </Description>
</CentralBankReportItem>
```

The structure of GDT CentralBankReportItem 35800BD is depicted in FIG. 358BD. For GDT CentralBankReportItem 35800BD the Object Class is Central Bank Report Item 35802BD and the Representation/Association is Details 35804BD.

GDT CentralBankReportItem 35800BD includes an element ReportingCountryCode 35806BD. For ReportingCountryCode 35806BD, the Object Class is Central Bank Report Item 35810BD, the Property is Reporting Country 35812BD, the Representation/Association is Code 35814BD, the Type is GDT 35816BD, the Type Name is CountryCode 35818BD, and the Cardinality between GDT CentralBankReportItem 35800BD and ReportingCountryCode 35806BD is one 35820BD.

GDT CentralBankReportItem 35800BD includes an element SupplyingCountryCode 35822BD. For SupplyingCountryCode 35822BD, the Object Class is Central Bank Report Item 35826BD, the Property is Supplying Country 35828BD, the Representation/Association is Code 35830BD, the Type is GDT 35832BD, the Type Name is CountryCode 35834BD, and the Cardinality between GDT CentralBankReportItem 35800BD and SupplyingCountryCode 35822BD is from zero to one 35836BD.

GDT CentralBankReportItem 35800BD includes an element Amount 35838BD. For Amount 35838BD, the Object Class is Central Bank Report Item 35842BD, the Property is Amount 35844BD, the Representation/Association is Amount 35846BD, the Type is GDT 35848BD, the Type Name is Amount 35850BD, and the Cardinality between GDT CentralBankReportItem 35800BD and Amount 35838BD is one 35852BD.

GDT CentralBankReportItem 35800BD includes an element Reason Classification Code 35854BD. For Reason Classification Code 35854BD, the Object Class is Central Bank Report Item 35858BD, the Property is Reason Classification 35860BD, the Representation/Association is Code 35862BD, the Type is GDT 35864BD, the Type Name is Central Bank Report Reason Classification Code 35866BD, and the Cardinality between GDT CentralBankReportItem 35800BD and Reason Classification Code 35854BD is from zero to one 35868BD.

GDT CentralBankReportItem 35800BD includes an element ReasonCode 35870BD. For ReasonCode 35870BD, the Object Class is Central Bank Report Item 35874BD, the Property is Reason 35876BD, the Representation/Association is Code 35878BD, the Type is GDT 35880BD, the Type Name is Central Bank Report Reason Code 35881BD, and the Cardinality between GDT CentralBankReportItem 35800BD and ReasonCode 35870BD is from zero to one 35882BD.

GDT CentralBankReportItem 35800BD includes an element Reason Description 35889BD. For Reason Description 35889BD, the Object Class is Central Bank Report Item 35890BD, the Property is Reason 35891BD, the Representation/Association is Description 35892BD, the Type is GDT 35893BD, the Type Name is Description 35894BD, and the Cardinality between GDT CentralBankReportItem 35800BD and Reason Description 35889BD is from zero to one 35895BD.

These integrity conditions are valid in the following countries: Germany: ReasonClassificationCode and ReasonCode may be specified, Japan: Only ReasonCode is specified, and Netherlands: Only ReasonClassificationCode is specified (bbbbbbbbbbbb) CentralBankReportReasonClassificationCode A GDT CentralBankReportReasonClassificationCode 35800BE is the coded representation of the classification of reasons for a report to the state central bank (i.e., reasons for notification). An example of GDT CentralBankReportReasonClassificationCode 35800BE is:

<CentralBankReportReasonClassificationCode>2</CentralBankReportReasonClassificationCode>

The structure of GDT CentralBankReportReasonClassificationCode 35800BE is depicted in FIG. 358BE. For GDT CentralBankReportReasonClassificationCode 35800BE, the Object Class is Central Bank Report Reason 35802BE, the Property is Classification 35804BE, the Representation/Association is Code 35806BE, the Type is CCT 35808BE, the Type Name is Code 35810BE, and the Length is one 35812BE. The remark 35814BE shows that GDT CentralBankReportReasonClassificationCode 35800BE can be restricted.

The GDT CentralBankReportReasonClassificationCode 35800BE may be used in CentralBankReportItem. The country of the code list is the reporting country (CentralBankReportItem.CountryCode).

In foreign payment transactions in Germany, the CentralBankReportReasonClassificationCode is specified using the document type. In the data medium exchange (format DTAZV), the document type is transferred in field W3, the values 2 and 4 are possible. The document type is also used during the crea-tion of the Z4 form. The code list includes the following values:

| Code | Description |
|---|---|
| 1 | Services, transfers for incoming payment |
| 2 | Services, transfers for outgoing payment |
| 3 | Capital transactions, income on investment for incoming payment |
| 4 | Capital transactions, income on investment for outgoing payment |
| 5 | Transit trade for incoming payment |
| 6 | Transit trade for outgoing payment |

CentralBankReportReasonCode

A GDT CentralBankReportReasonCode 35800BF is the coded representation of the reason for a report to the state central bank (i.e., reasons for notification). Several fixed, country-specific code lists, which are different at runtime, may be assigned to the code. An example of GDT CentralBankReportReasonCode 35800BF is:

<CentralBankReportReasonCode schemeAgencyID="DE">520</CentralBankReportReasonCode>

The structure of GDT CentralBankReportReasonCode 35800BF is depicted in FIG. 358BF. For GDT CentralBankReportReasonCode 35800BF, the Object Class is Central Bank Report 35802BF, the Property is Reason 35804BF, the Representation/Association is Code 35806BF, the Type is CCT 35808BF, the Type Name is Code 35810BF, and the Length is from one to three 35812BF. The remark 35814BF shows that GDT CentralBankReportReasonCode 35800BF can be restricted.

The data type GDT CentralBankReportReasonCode 35800BF may be used in CentralBankReportItem. The country of the code list is the reporting country (CentralBankReportItem.CountryCode).

The attributes in the code list for CentralBankReportReasonCode 35800BF are: listID="22001," listAgencyID=nn, listVersionID=[version of the code list. Assigned by the standardization organization (if available)], listAgencySchemeID=[Scheme used to assign the listAgencyID (for example EAN, DUNS)], listAgencySchemeAgencyID=[Organization according to DE 3055 that manages the scheme].

(ccccccccccc) CommissionProductGroupCode

A GDT CommissionProductGroupCode 35800BG is the coded representation of a group of products for which a certain commission is granted. An example of GDT CommissionProductGroupCode 35800BG is:

<CommissionProductGroupCode>1</CommissionProductGroupCode>

The structure of GDT CommissionProductGroupCode 35800BG is depicted in FIG. 358BG. For GDT CommissionProductGroupCode 35800BG, the Object Class Qualifier is Commission 35802BG, the Object Class is Product Group 35804BG, the Representation/Association is Code 35806BG, the Type is CCT 35808BG, the Type Name is Code 35810BG, and the Length is from one to two 35812BG.

GDT CommissionProductGroupCode 35800BG includes an element ListID 35816BG. For element ListID 35816BG, the Category is Attribute (A) 35818BG, the Object Class is CodeList 35820BG, the Property is Identification 35822BG, the Representation/Association is Identifier 35824BG, the Type is XSD 35826BG, the Type Name is token 35828BG, and the Cardinality between GDT CommissionProductGroupCode 35800BG and the element ListID 35816BG is from zero to one 35830BG.

GDT CommissionProductGroupCode 35800BG includes an element ListAgencyID 35832BG. For ListAgencyID 35832BG, the Category is Attribute (A) 35834BG, the Object Class is CodeListAgency 35836BG, the Property is Identification 35838BG, the Representation/Association is Identifier 35840BG, the Type is XSD 35842BG, the Type Name is token 35844BG, and the Cardinality between GDT CommissionProductGroupCode 35800BG and the element ListAgencyID 35832BG is from zero to one 35846BG.

GDT CommissionProductGroupCode 35800BG includes an element ListVersionID 35848BG. For ListVersionID 35848BG, the Category is Attribute (A) 35850BG, the Object Class is CodeList 35852BG, the Property is Version 35854BG, the Representation/Association is Identifier 35856BG, the Type is XSD 35858BG, the Type Name is token 35860BG, and the Cardinality between GDT CommissionProductGroupCode 35800BG and the element ListVersionID 35848BG is from zero to one 35862BG.

GDT CommissionProductGroupCode 35800BG includes an element ListAgencySchemeID 35864BG. For ListAgencySchemeID 35864BG, the Category is Attribute (A) 35866BG, the Object Class is CodeListAgency 35868BG, the Property is Scheme 35870BG, the Representation/Association is Identifier 35872BG, the Type is XSD 35874BG, the Type Name is token 35876BG, and the Cardinality between GDT CommissionProductGroupCode 35800BG and the element ListAgencySchemeID 35864BG is from zero to one 35878BG.

GDT CommissionProductGroupCode 35800BG includes an element ListAgencySchemeAgencyID 35880BG. For ListAgencySchemeAgencyID 35880BG, the Category is Attribute (A) 35882BG, the Object Class is CodeListAgency 35884BG, the Property is Scheme Agency 35886BG, the Representation/Association is Identifier 35888BG, the Type is XSD 35890BG, the Type Name is token 35892BG, and the Cardinality between GDT CommissionProductGroupCode 35800BG and the element ListAgencySchemeAgencyID 35880BG is from zero to one 35894BG.

A customer can determine the codes in the code list. The attributes of the code are assigned the following values: listID="10331," listAgencyID—ID of the Customer (ID from DE 3055, if listed there), listVersionID—version of the particular code list. Assigned and managed by the Customer, listAgencySchemeID—ID of the scheme if the listAgencyID does not come from DE 3055, and listAgencySchemeAgencyID—ID of the organization from DE 3055 that manages the listAgencySchemeID scheme.

The data type GDT CommissionProductGroupCode 35800BG may be used for price determination and analysis in sales and billing documents. Examples of the possible semantics of the codes are products for which the maximum commission applies or products for which the minimum commission applies. The CommissionProductGroupCode may currently be used in business objects and A2A messages. The following dictionary objects can be assigned to CommissionProductGroupCode 35800BG: Data element: CRMT_PROD_PR_GROUP, Domain: CRM_COMM_GROUP.

(ddddddddddd) CommunicationMediumTypeCode

A GDT CommunicationMediumTypeCode 35800BH is the coded representation of the type of a medium used for communication. An example of GDT CommunicationMediumTypeCode 35800BH is:

<CommunicationMediumTypeCode>MA</CommunicationMediumTypeCode>

The structure of GDT CommunicationMediumTypeCode 35800BH is depicted in FIG. 358BH. For GDT CommunicationMediumTypeCode 35800BH, the Property is Communication Medium Type 35802BH, the Representation/Association is Code 35804BH, the Type is CCT 35806BH, the Type Name is Code 35808BH, and the Length is from one to two 35810BH. The remark 35812BH shows that GDT CommunicationMediumTypeCode 35800BH can be restricted.

GDT CommunicationMediumTypeCode 35800BH includes an element ListID 35814BH. For element ListID 35814BH, the Category is Attribute (A) 35816BH, the Object Class is CodeList 35818BH, the Property is Identification 35820BH, the Representation/Association is Identifier 35822BH, the Type is XSD 35824BH, the Type Name is token 35826BH, and the Cardinality between GDT CommunicationMediumTypeCode 35800BH and the element ListID 35814BH is from zero to one 35828BH.

GDT CommunicationMediumTypeCode 35800BH includes an element ListAgencyID 35830BH. For ListAgencyID 35830BH, the Category is Attribute (A) 35832BH, the Object Class is CodeListAgency 35834BH, the Property is Identification 35836BH, the Representation/Association is Identifier 35838BH, the Type is XSD 35840BH, the Type Name is token 35842BH, and the Cardinality between GDT CommunicationMediumTypeCode 35800BH and the element ListAgencyID 35830BH is from zero to one 35844BH.

GDT CommunicationMediumTypeCode 35800BH includes an element ListVersionID 35846BH. For ListVersionID 35846BH, the Category is Attribute (A) 35848BH, the Object Class is CodeList 35850BH, the Property is Version 35852BH, the Representation/Association is Identifier 35854BH, the Type is XSD 35856BH, the Type Name is token 35858BH, and the Cardinality between GDT CommunicationMediumTypeCode 35800BH and the element ListVersionID 35846BH is from zero to one 35860BH.

In the system configuration, GDT CommunicationMediumTypeCode 35800BH may be used to control which medium will be used for which purpose. For instance, a dunning schema might lay down that a letter may be used for legally effective dunning while email is appropriate for a mere reminder. In an overview of a dispute history GDT CommunicationMediumTypeCode 35800BH may show which media were used in all the communication steps. In the address maintenance PreferredCommunicationMediumTypeCode can be used to describe with which media an addressee or business partner wants to be contacted. In the procurement process SupplierProcurementDocumentExchangeCommunicationMediumTypeCode can be used to describe which medium can be used to exchange business documents between the supplier and the purchasing company or its purchasing units.

(eeeeeeeeeeee) ContactAllowedCode

A GDT ContactAllowedCode 35800BI is the coded description of contact permission. The GDT ContactAllowedCode 35800BI is a code list implicitly given attributes listID="10050", listAgencyID="310" and a listVersionID. The following instances may be possible: 1 (contact is allowed), 2 (contact is not allowed), or 3 (check whether contact is allowed). An example of GDT ContactAllowedCode 35800BI is:

<ContactAllowedCode>1</ContactAllowedCode>

The structure of GDT ContactAllowedCode 35800BI is depicted in FIG. 358BI. For GDT ContactAllowedCode 35800BI, the Property is contact allowed 35802BI, the Representation/Association is Code 35804BI, the Type is CCT 35806BI, the Type Name is Code 35808BI, and the Length is one 35810BI. The remark 35812BI shows that GDT ContactAllowedCode 35800BI can be restricted.

The GDT ContactAllowedCode 35800BI may be used to confirm whether contact with a particular person or company is allowed or not.

(ffffffffffff) ContactPersonFunctionTypeCode

A GDT ContactPersonFunctionTypeCode 35800BJ represents, in the form of a code, the type of function that a contact person has. This may refer to the functions within the organization where the contact person is employed. An example of GDT ContactPersonFunctionTypeCode 35800BJ is:

<ContactPersonFunctionTypeCode>1</ContactPersonFunctionTypeCode>

The structure of GDT ContactPersonFunctionTypeCode 35800BJ is depicted in FIG. 358BJ. For GDT ContactPersonFunctionTypeCode 35800BJ, the Object Class is Contact Person 35802BJ, the Property is Function Type 35804BJ, the Representation/Association is Code 35806BJ, the Type is CCT 35808BJ, the Type Name is Code 35810BJ, and the Length is from one to four 35812BJ. The remark 35814BJ shows that GDT ContactPersonFunctionTypeCode 35800BJ can be restricted.

GDT ContactPersonFunctionTypeCode 35800BJ includes an element ListID 35816BJ. For element ListID 35816BJ, the Category is Attribute (A) 35818BJ, the Object Class is CodeList 35820BJ, the Property is Identification 35822BJ, the Representation/Association is Identifier 35824BF, the Type is XSD 35826BJ, the Type Name is token 35828BJ, and the Cardinality between GDT CentralBankReportReasonCode 35800BF and the element ListID 35816BJ is from zero to one 35830BJ.

GDT ContactPersonFunctionTypeCode 35800BJ includes an element ListAgencyID 35832BJ. For ListAgencyID 35832BJ, the Category is Attribute (A) 35834BJ, the Object Class is CodeListAgency 35836BJ, the Property is Identification 35838BJ, the Representation/Association is Identifier 35840BF, the Type is XSD 35842BJ, the Type Name is token 35844BJ, and the Cardinality between GDT CentralBankReportReasonCode 35800BF and the element ListAgencyID 35832BJ is from zero to one 35846BJ.

GDT ContactPersonFunctionTypeCode 35800BJ includes an element ListVersionID 35848BJ. For ListVersionID 35848BJ, the Category is Attribute (A) 35850BJ, the Object Class is CodeList 35852BJ, the Property is Version 35854BJ, the Representation/Association is Identifier 35856BF, the Type is XSD 35858BJ, the Type Name is token 35860BJ, and the Cardinality between GDT CentralBankReportReasonCode 35800BF and the element ListVersionID 35848BJ is from zero to one 35862BJ.

GDT ContactPersonFunctionTypeCode 35800BJ includes an element ListAgencySchemeID 35864BJ. For ListAgencySchemeID 35864BJ, the Category is Attribute (A) 35866BJ, the Object Class is CodeListAgency 35868BJ, the Property is Scheme 35870BJ, the Representation/Association is Identifier 35872BF, the Type is XSD 35874BJ, the Type Name is token 35876BJ, and the Cardinality between GDT CentralBankReportReasonCode 35800BF and the element ListAgencySchemeID 35864BJ is from zero to one 35878BJ.

GDT ContactPersonFunctionTypeCode 35800BJ includes an element ListAgencySchemeAgencyID 35880BJ. For ListAgencySchemeAgencyID 35880BJ, the Category is Attribute (A) 35882BJ, the Object Class is CodeListAgency 35884BJ, the Property is Scheme Agency 35886BJ, the Representation/Association is Identifier 35888BF, the Type is XSD 35890BJ, the Type Name is token 35892BJ, and the Cardinality between GDT CentralBankReportReasonCode 35800BF and the element ListAgencySchemeAgencyID 35880BJ is from zero to one 35894BJ.

A customer-specific code list may be assigned to the code. The attributes of the code are assigned the following values: the listID is "10333," the listAgencyID is the ID of the Customer (ID from DE 3055, if listed there), the listVersionID is the version of the particular code list, the listAgencySchemeID is the ID of the scheme if the listAgencyID does not come from DE 3055, the listAgencySchemeAgencyID is the ID of the organization from DE 3055 that manages the listAgencySchemeID scheme. For example, the contact person may be a member of executive board or the purchasing manager.

(gggggggggggg) CorrespondenceBankTypeCode

A GDT CorrespondenceBankTypeCode 35800BK is the coded representation of the type of a correspondence bank. A correspondence bank is a bank (typically abroad) to which a bank has a business relationship. Correspondence banks are involved in particular in foreign trade, for example, when processing payment transactions, cashing foreign securities, and trading with foreign notes and coins. An example of GDT CorrespondenceBankTypeCode 35800BK is CorrespondenceBankTypeCode>1</Correspondence-BankTypeCode>

The structure of GDT CorrespondenceBankTypeCode 35800BK is depicted in FIG. 358BK. For GDT CorrespondenceBankTypeCode 35800BK, the Object Class is Correspondence Bank 35802BK, the Property is Type 35804BK, the Representation/Association is Code 35806BK, the Type is CCT 35808BK, the Type Name is Code 35810BK, and the Length is one 35812BK. The remark 35814BK shows that GDT CorrespondenceBankTypeCode 35800BK can be restricted.

The GDT CorrespondenceBankTypeCode 35800BK is a code list that may have the following values: 1 (correspondence bank of the payer bank), 2 (intermediary bank or a correspondence bank between 1 Sender and 3 Recipient), or 3 (correspondence bank of the recipient bank).

The data type GDT CorrespondenceBankTypeCode 35800BK may be used, for example, to specify the type of a correspondence bank during a payment order with a foreign payee.

(hhhhhhhhhhhh) CostCentreTypeCode

A GDT CostCentreTypeCode 35800BL is the coded representation of the nature of a cost center. An example of GDT CostCentreTypeCode 35800BL is:

<CostCentreTypeCode>1</CostCentreTypeCode>

The structure of GDT CostCentreTypeCode 35800BL is depicted in FIG. 358BL. For GDT CostCentreTypeCode 35800BL, the Object Class is Cost Center 35802BL, the Property is Type 35804BL, the Representation/Association is Code 35806BL, the Type is CCT 35808BL, the Type Name is Code 35810BL, and the Length is from one to four 35812BL. The remark 35814BL shows that GDT CostCentreTypeCode 35800BL can be restricted.

The data type GDT CostCentreTypeCode 35800BL may make it possible to define sets of cost centers on the basis of the value of the CostCentreTypeCode. Reference can then be made to these sets in the assessment, overhead costing, or settlement. Examples of possible code semantics include: the cost center having type "Production," the cost center having type "Personnel," and the cost center having type "Administration."

A customer can determine the codes in the code list. The attributes of the code are assigned the following values: listID="10334," listAgencyID—ID of the Customer (ID from DE 3055, if listed there), listVersionID—version of the particular code list. Assigned and managed by the Customer, listAgencySchemeID—ID of the scheme if the listAgencyID does not come from DE 3055, and listAgencySchemeAgencyID—ID of the organization from DE 3055 that manages the listAgencySchemeID scheme.

(iiiiiiiiiiii) CreditAgencyReportTypeCode

A GDT CreditAgencyReportTypeCode 35800BM is the coded display of the type of credit information by source and scope. Credit information is information about the creditworthiness of a party provided by a credit agency. An example of GDT CreditAgencyReportTypeCode 35800BM is:

<CreditAgencyReportTypeCode>2</CreditAgencyReportTypeCode>

The structure of GDT CreditAgencyReportTypeCode 35800BM is depicted in FIG. 358BM. For GDT CreditAgencyReportTypeCode 35800BM, the Object Class is Credit Agency Report 35802BM, the Property is Type 35804BM, the Representation/Association is Code 35806BM, the Type is CCT 35808BM, the Type Name is Code 35810BM, and the Length is two 35812BM. The remark 35814BM shows that GDT CreditAgencyReportTypeCode 35800BM can be restricted.

GDT CreditAgencyReportTypeCode 35800BM includes an element ListAgencyID 35816BM. For element ListAgencyID 35816BM, the Category is Attribute (A) 35818BM, the Object Class is CodeListAgency 35820BM, the Property is Identification 35822BM, the Representation/Association is Identifier 35824BM, the Type is XSD 35826BM, the Type Name is token 35828BM, and the Cardinality between GDT CreditAgencyReportTypeCode 35800BM and the element ListAgencyID 35816BM is from zero to one 35830BM.

GDT CreditAgencyReportTypeCode 35800BM includes an element ListVersionID 35832BM. For ListVersionID 35832BM, the Category is Attribute (A) 35834BM, the Object Class is CodeList 35836BM, the Property is Version 35838BM, the Representation/Association is Identifier 35840BM, the Type is XSD 35842BM, the Type Name is token 35844BM, and the Cardinality between GDT CreditAgencyReportTypeCode 35800BM and the element ListVersionID 35832BM is from zero to one 35846BM.

GDT CreditAgencyReportTypeCode 35800BM includes an element ListAgencySchemeID 35848BM. For ListAgencySchemeID 35848BM, the Category is Attribute (A) 35850BM, the Object Class is CodeListAgency 35852BM, the Property is Scheme 35854BM, the Representation/Association is Identifier 35856BM, the Type is XSD 35858BM, the Type Name is token 35860BM, and the Cardinality between GDT CreditAgencyReportTypeCode 35800BM and the element ListAgencySchemeID 35848BM is from zero to one 35862BM.

GDT CreditAgencyReportTypeCode 35800BM includes an element ListAgencySchemeAgencyID 35864BM. For ListAgencySchemeAgencyID 35864BM, the Category is Attribute (A) 35866BM, the Object Class is CodeListAgency 35868BM, the Property is Scheme Agency 35870BM, the Representation/Association is Identifier 35872BM, the Type is XSD 35874BM, the Type Name is token 35876BM, and the Cardinality between GDT CreditAgencyReportTypeCode 35800BM and the element ListAgencySchemeAgencyID 35864BM is from zero to one 35878BM.

The data type GDT CreditAgencyReportTypeCode 35800BM may be used in the business object CreditAgencyReport where it may sort credit information by source and scope.

(jjjjjjjjjjjj) AddressUsageTypeCode

A GDT AddressUsageTypeCode 35800BN is the coded representation of the usage of an address. An example of GDT AddressUsageTypeCode 35800BN is:

<AddressUsageTypeCode>XXDEFAULT</AddressUsageTypeCode>

The structure of GDT AddressUsageTypeCode 35800BN is depicted in FIG. 358BN. For GDT AddressUsageTypeCode 35800BN, the Object Class is Address 35802BN, the Property Qualifier is Usage 35804BN, the Property is Type 35806BN, the Representation/Association is Code 35808BN, the Type is CCT 35810BN, the Type Name is Code 35812BN, and the Length is from one to ten 35814BN. The remark 35815BN shows that GDT AddressUsageTypeCode 35800BN can be restricted.

GDT AddressUsageTypeCode 35800BN includes an element ListAgencyID 35816BN. For element ListAgencyID 35816BN, the Category is Attribute (A) 35818BN, the Object Class is CodeListAgency 35820BN, the Property is Identification 35822BN, the Representation/Association is Identifier 35824BN, the Type is XSD 35826BN, the Type Name is token 35828BN, and the Cardinality between GDT AddressUsageTypeCode 35800BN and the element ListAgencyID 35816BN is from zero to one 35830BN.

GDT AddressUsageTypeCode 35800BN includes an element ListVersionID 35832BN. For ListVersionID 35832BN, the Category is Attribute (A) 35834BN, the Object Class is CodeList 35836BN, the Property is Version 35838BN, the Representation/Association is Identifier 35840BN, the Type is XSD 35842BN, the Type Name is token 35844BN, and the Cardinality between GDT AddressUsageTypeCode 35800BN and the element ListVersionID 35832BN is from zero to one 35846BN.

GDT AddressUsageTypeCode 35800BN includes an element ListAgencySchemeID 35848BN. For ListAgencySchemeID 35848BN, the Category is Attribute (A) 35850BN, the Object Class is CodeListAgency 35852BN, the Property is Scheme 35854BN, the Representation/Association is Identifier 35856BN, the Type is XSD 35858BN, the Type Name is token 35860BN, and the Cardinality between GDT AddressUsageTypeCode 35800BN and the element ListAgencySchemeID 35848BN is from zero to one 35862BN.

GDT AddressUsageTypeCode 35800BN includes an element ListAgencySchemeAgencyID 35864BN. For ListAgencySchemeAgencyID 35864BN, the Category is Attribute (A) 35866BN, the Object Class is CodeListAgency 35868BN, the Property is Scheme Agency 35870BN, the Representation/Association is Identifier 35872BN, the Type is XSD 35874BN, the Type Name is token 35876BN, and the Cardinality between GDT AddressUsageTypeCode 35800BN and the element ListAgencySchemeAgencyID 35864BN is from zero to one 35878BN.

The data type GDT AddressUsageTypeCode 35800BN can, for example, be used to record that an address of a business partner is suitable as a delivery address, such as an invoice address or a correspondence address.

(kkkkkkkkkkkk) ActivityInitiatorCode

A GDT ActivityInitiatorCode 35800BO is the coded representation of the initiator of the activity. It specifies, if the activity was triggered internally or externally. For example the activity could be accepting a phone call, or sending an e-mail. An example of GDT ActivityInitiatorCode 35800BO is:

<ActivityInitiatorCode listAgencyId="310">1</ActivityInitiatorCode>

The structure of GDT ActivityInitiatorCode 35800BO is depicted in FIG. 358BO. For GDT ActivityInitiatorCode 35800BO, the Object Class is Activity 35802BO, the Property is Initiator 35804BO, the Representation/Association is Code 35806BO, the Type is CCT 35808BO, the Type Name is Code 35810BO, and the Length is one 35812BO. The remark 35814BO shows that GDT ActivityInitiatorCode 35800BO can be restricted.

The GDT ActivityInitiatorCode 35800BO is a code list that may have the following values: 1 (not specified), 2 (activity was initiated by customer, prospect, and so on), or 3 (activity was initiated from within enterprise).

The GDT ActivityInitiatorCode 35800BO may be used for defining business objects and electronic messages, (for example, Groupware synchronization). If an external party cannot transfer an ActivityInitiatorCode, the default code (1) can be used. This code is particularly used in reporting in order to group business objects in terms of whether an activity was initiated from within an enterprise, or initiated by a customer or prospect.

(llllllllllll) BatchID

A GDT BatchID 35800BP is a unique identifier for a batch in the context of a material number. A batch is a homogenous subset of a material that is managed separately from other subsets of the same material. Individual batches may differ in their characteristics. The individual batches are either created together in one production process or purchased together in one order. An example of GDT BatchID 35800BP is:

<BatchID>CH20021015</BatchID>

The structure of GDT BatchID 35800BP is depicted in FIG. 358BP. For GDT BatchID 35800BP, the Category is Complex Type 35802BP, the Object Class is Batch 35804BP, the Property is Identification 35806BP, the Representation/Association is Identifier 35808BP, the Type is CCT 35810BP, the Type Name is Identifier 35812BP, and the Length is from one to ten 35814BP.

GDT BatchID 35800BP includes an element SchemeID 35816BP. For element SchemeID 35816BP, the Category is Attribute (A) 35818BP, the Object Class is Identification Scheme 35820BP, the Property is Identification 35822BP, the Representation/Association is Identifier 35824BF, the Type is XSD 35826BP, the Type Name is token 35828BP, and the Cardinality between GDT BatchID 35800BP and the element SchemeID 35816BP is from zero to one 35830BP.

GDT BatchID 35800BP includes an element SchemeVersionID 35832BP. For SchemeVersionID 35832BP, the Category is Attribute (A) 35834BP, the Object Class is Identification Scheme 35836BP, the Property is Version 35838BP, the Representation/Association is Identifier 35840BF, the Type is XSD 35842BP, the Type Name is token 35844BP, and the Cardinality between GDT BatchID 35800BP and the element SchemeVersionID 35832BP is from zero to one 35846BP.

GDT BatchID 35800BP includes an element SchemeAgencyID 35848BP. For SchemeAgencyID 35848BP, the Category is Attribute (A) 35850BP, the Object Class is Identification Scheme Agency 35852BP, the Property is Identification 35854BP, the Representation/Association is Identifier 35856BF, the Type is XSD 35858BP, the Type Name is token 35860BP, and the Cardinality between GDT BatchID 35800BP and the element SchemeAgencyID 35848BP is from zero to one 35862BP.

GDT BatchID 35800BP includes an element SchemeAgencySchemeID 35864BP. For SchemeAgencySchemeID 35864BP, the Category is Attribute (A) 35866BP, the Object Class is Identification Scheme Agency 35868BP, the Property is Scheme 35870BP, the Representation/Association is Identifier 35872BF, the Type is XSD 35874BP, the Type Name is token 35876BP, and the Cardinality between GDT BatchID 35800BP and the element SchemeAgencySchemeID 35864BP is from zero to one 35878BP.

GDT BatchID 35800BP includes an element SchemeAgencySchemeAgencyID 35880BP. For SchemeAgencySchemeAgencyID 35880BP, the Category is Attribute (A) 35882BP, the Object Class is Identification Scheme Agency 35884BP, the Property is Scheme Agency 35886BP, the Representation/Association is Identifier 35888BF, the Type is XSD 35890BP, the Type Name is token 35892BP, and the Cardinality between GDT BatchID 35800BP and the element SchemeAgencySchemeAgencyID 35880BP is from zero to one 35894BP.

The data type GDT BatchID 35800BP may be used to identify batches. By default, the system may assume that the batch identified by the BatchID is a manufacturer batch and therefore no attributes are required.

(mmmmmmmmmmmm) BillOfOperationsConnectionTypeCode

A GDT BillOfOperationsConnectionTypeCode 35800BQ is the coded display of the type of a connection in a bill of operations. A connection element is an element used to structure the "feeder" or "junction" processing paths. A processing path may be linked to another processing path using a connection element.

```
<BillOfOperationsConnectionTypeCode>1
</BillOfOperationsConnectionTypeCode>
```

The structure of GDT BillOfOperationsConnectionTypeCode 35800BQ is depicted in FIG. 358BQ. For GDT BillOfOperationsConnectionTypeCode 35800BQ, the Object Class is Bill of Operations Connection 35802BQ, the Property is Type 35804BQ, the Representation/Association is Code 35806BQ, the Type is CCT 35808BQ, the Type Name is Code 35810BQ, and the Length is from one to two 35812BQ. The remark 35814BQ shows that GDT BillOfOperationsConnectionTypeCode 35800BQ can be restricted.

The data type GDT BillOfOperationsConnectionTypeCode 35800BQ may indicate that the feeder describes the joining of one or several parallel processing paths to another processing path. Additionally, the GDT BillOfOperationsConnectionTypeCode 35800BQ may indicate the junction describes the separation of one or several processing paths from another processing path.

BillofOperationsElementID

The GDT BillofOperationsElementID 35800BR is a unique identifier of an element of a bill of operations. An element is a part of a process description with which the basic structure of a process is defined along with its hierarchical and processing-specific dependencies. An example of GDT BillofOperationsElementID 35800BR <BillOfOperationsElementID>ASSEMBLY</BillOfOperationsElementID>

The structure of GDT BillofOperationsElementID 35800BR is depicted in FIG. 358BR. For GDT BillofOperationsElementID 35800BR, the Object Class is Bill of Operations Element 35802BR, the Property is Identification 35804BR, the Representation/Association is Identifier 35806BR, the Type is CCT 35808BR, the Type Name is Identifier 35810BR, and the Length is from one to forty 35812BR. The remark 35814BR shows that GDT BillofOperationsElementID 35800BR can be restricted.

The data type GDT BillofOperationsElementID 35800BR may be explicit in the context of a bill of operations.

(nnnnnnnnnnnn) BillOfOperationsElementTypeCode

A GDT BillOfOperationsElementTypeCode 35800BS is the coded display of the type of an element in the bill of operations. The type may specialize the element that can occur in the following specializations: Operation, Sequence, Branching, Connection and Mark. An example of a GDT BillOfOperationsElementTypeCode 35800BS is:

<BillOfOperationsElementTypeCode>1</BillOfOperationsElementTypeCode>

The structure of GDT BillOfOperationsElementTypeCode 35800BS is depicted in FIG. 358BS. For GDT BillOfOperationsElementTypeCode 35800BS, the Object Class is Bill of Operations Element 35802BS, the Property is Type 35804BS, the Representation/Association is Code 35806BS, the Type is CCT 35808BS, the Type Name is Code 35810BS, and the Length is from one to two 35812BS. The remark 35814BS shows that GDT BillOfOperationsElementTypeCode 35800BS can be restricted.

The GDT BillOfOperationsElementTypeCode 35800BS is a code list that may have the following values: 1 (a sequence), 2 (a branching), 3 (a connection), 4 (an operation), or 5 (a mark). The sequence is a grouping of linear elements of the bill of operations. The branching is an element used to structure the bill of operations that defines the splitting of a process into several process paths. The connection is an element used to structure the bill of operations that defines "feeder" or "junction" processing paths. The operation is the description of a self-contained process section at a main resource. The mark is an element used to structure the bill of operations that marks the start or the end of a section in the bill of operations and thus assigns this section a certain function.

(oooooooooooo) BillofOperationsID

A GDT BillofOperationsID 35800BT is a unique identifier of a bill of operations. A bill of operations is the definition of a process description in logistics. The following types of bills of operations exist: a production bill of operations, a production bill of operations template, and a site logistics bill of operations. An example of GDT BillofOperationsID 35800BT is:

<BillOfOperationsID>ENGINEPRODUCTION</BillOfOperationsID>

The structure of GDT BillofOperationsID 35800BT is depicted in FIG. 358BT. For GDT BillofOperationsID 35800BT, the Object Class is Bill of Operations 35802BT, the Property is Identification 35804BT, the Representation/Association is Identifier 35806BT, the Type is CCT 35808BT, the Type Name is Identifier 35810BT, and the Length is from one to forty 35812BT. The remark 35814BT shows that GDT BillofOperationsID 35800BT can be restricted.

(pppppppppppp) BillofOperationsTemplateTypeCode

A GDT BillofOperationsTemplateTypeCode 35800BU is the coded display of the type of a bill of operations template. A bill of operations template is a pattern used to create process descriptions in logistics. The type of the bill of operations template can be used to differentiate whether a complex process description or an individual operation is described. An example of GDT BillofOperationsTemplateTypeCode 35800BU is:

<BillOfOperationsTemplateTypeCode>1</BillOfOperationsTemplateTypeCode>

The structure of GDT BillofOperationsTemplateTypeCode 35800BU is depicted in FIG. 358BU. For GDT BillofOperationsTemplateTypeCode 35800BU, the Object Class is Bill of Operations Template 35802BU, the Property is Type 35804BU, the Representation/Association is Code 35806BU, the Type is CCT 35808BU, the Type Name is Code 35810BU, and the Length is from one to two 35812BU. The remark 35814BU shows that GDT BillofOperationsTemplateTypeCode 35800BU can be restricted.

The GDT BillofOperationsTemplateTypeCode 35800BU is a code list that may have the following values: 1 (bill of operations template for a complex process description) or 2 (bill of operations template for a single operation).

(qqqqqqqqqqqq) BusinessTransactionDocumentItemScheduleLineTypeCode

A GDT BusinessTransactionDocumentItemScheduleLineTypeCode 35800BV is the coded representation of a type of schedule line of an item in a document. The schedule line type of a schedule line in a document item specifies which quantity and which date/time is involved in the schedule line. An example of GDT BusinessTransactionDocumentItemScheduleLineTypeCode 35800BV is:

```
<SalesOrderItemScheduleLineTypeCode>1
</SalesOrderItemScheduleLineTypeCode>
```

The structure of GDT BusinessTransactionDocumentItemScheduleLineTypeCode 35800BV is depicted in FIG. 358BV. For GDT BusinessTransactionDocumentItemScheduleLineTypeCode 35800BV, the Object Class is Business Transaction Document Item Schedule Line, 35802BV, the Property is Type 35804BV, the Representation/Association is Code 35806BV, the Type is CCT 35808BV, the Type Name is Code 35810BV, and the Length is from one to two 35812BV. The remark 35814BV shows that GDT BusinessTransactionDocumentItemScheduleLineTypeCode 35800BV can be restricted.

The data type GDT BusinessTransactionDocumentItemScheduleLineTypeCode 35800BV is a code list that may have the following values: 1 (requested), 2 (confirmed) or 3 (promised). A requested value may indicate the quantity and date or time, requested by the customer, for delivery of goods or provision of services. A confirmed value may indicate the quantity and date or time, confirmed by planning, for delivery of goods or provision of services. A promised value may indicate the minimum quantity or latest promised date or time for delivery of goods or provision of services.

The data type GDT BusinessTransactionDocumentItemScheduleLineTypeCode 35800BV can be used, for example, in the sales order item, to represent the date or time and quantity requested by the customer, and the planned delivery date or time and quantity.

ChartOfAccountsID

A GDT ChartOfAccountsID 35800BW is an identifier for a chart of accounts. A chart of accounts is an ordered repository of account numbers for which a general ledger account can be created in the General Ledger for each company. The items of the chart of accounts determine the account number as well as the type of value-based changes made in the general ledger accounts. An example of GDT ChartOfAccountsID 35800BW is:

<ChartOfAccountsID schemeAgencyID="FIN__001">0001</ChartOfAccountsID>

The structure of GDT ChartOfAccountsID 35800BW is depicted in FIG. 358BW. For GDT ChartOfAccountsID 35800BW, the Object Class is Chart of Accounts 35802BW, the Property is Identification 35804BW, the Representation/Association is Identifier 35806BW, the Type is CCT 35808BW, the Type Name is Identifier 35810BW, and the Length is from one to four 35812BW. The remark 35814Bw shows that GDT ChartOfAccountsID 35800BW can be restricted.

GDT ChartOfAccountsID 35800BW includes an element SchemeAgencyID 35816BW. For element SchemeAgencyID 35816BW, the Category is Attribute (A) 35818BW, the Object Class is Identification Scheme Agency 35820BW, the Property is Identification 35822BW, the Representation/Association is Identifier 35824BW, the Type is XSD 35826BW, the Type Name is token 35828BW, and the Cardinality between GDT ChartOfAccountsID 35800BW and the element SchemeAgencyID 35816BW is from zero to one 35830BJ.

The data type GDT ChartOfAccountsID 35800BW may be used in the GDT GeneralLedgerAccount, for example, to identify the chart of accounts for the general ledger account.

(rrrrrrrrrrr) LogisticsPackageTypeCode

A GDT LogisticsPackageTypeCode 35800BX is the coded representation of the type of a package as it can be used in logistics for storing and shipping goods. An example of a GDT LogisticsPackageTypeCode 35800BX is:

<LogisticsPackageTypeCode>1</LogisticsPackageTypeCode>

The structure of GDT LogisticsPackageTypeCode 35800BX is depicted in FIG. 358BX. For the GDT LogisticsPackageTypeCode 35800BX, the Object Class is Logistics Package 35802BX, the Property is Type 35804BX, the Representation/Association is Code 35806BX, the Type is CCT 35808BX, the Type Name is Code 35810BX, and the Length is one 35812BX. The Cardinality is one 35814BX. The remark 35816BX shows that GDT LogisticsPackageTypeCode 35800BX may be restricted.

The attributes are used as follows: listID=10071, listAgencyID=310, and listVersionID is the version of the relevant code list assigned and managed by SAP AG. The LogisticsPackageTypeCode is a fixed SAP code list. The attributes, listID, listAgencyID, listVersionID are missing from the structure as they have constant values during runtime.

Possible code values for the GDT LogisticsPackageTypeCode 35800BX are one and two. One describes a Handling Unit. The Handling Unit is a Logistics Package that can be identified individually, for example a uniquely labeled container. Two describes a Logistics Unit. The Logistics Unit is a Logistics Package that cannot be identified individually, for example boxes in a certain storage bin.

In Logistics, the GDT LogisticsPackageTypeCode 35800BX defines the type of a packed unit in more detail.

(sssssssssss) LogisticsBranchingID

A GDT LogisticsBranchingID 35800BY is a unique identifier of a branching in a process description in logistics. A branching is a way of structuring a process description in logistics that splits a process into several process paths. A processing path describes a directed material flow in logistics. In addition to a common starting point, the branched processing paths also have a common end point where the different paths join again. An example of a GDT LogisticsBranchingID 35800BY is:

<LogisticsBranchingID>R2D2</LogisticsBranchingID>

The structure of GDT LogisticsBranchingID 35800BY is depicted in FIG. 358BY. For the GDT LogisticsBranchingID 35800BY, the Object Class is Logistics Branching 35802BY, the Property is Identification 35804BY, the Representation/Association is Identifier 35806BY, the Type is CCT 35808BY, the Type Name is Identifier 35810BY, and the Length is from one to forty 35812BY. The remark 35814BY shows that GDT LogisticsBranchingID 35800BY may be restricted.

The GDT LogisticsBranchingID 35800BY may be unique in the usage context.

(ttttttttttt) LogisticsConfirmationMethodCode

A GDT LogisticsConfirmationMethodCode 35800BZ is the coded representation of the method used for confirmations in logistics. A logistic confirmation records the progress of a logistic process, for example, goods movement or component consumption. An example of a GDT LogisticsConfirmationMethodCode 35800BZ is:

<LogisticsConfirmationMethodCode>1</LogisticsConfirmationMethodCode>

The structure of GDT LogisticsConfirmationMethodCode 35800BZ is depicted in FIG. 358BZ. For the GDT LogisticsConfirmationMethodCode 35800BZ, the Object Class is Logistics Confirmation 35802BZ, the Property is Method 35804BZ, the Representation/Association is Code 35806BZ, the Type is CCT 35808BZ, the Type Name is Code 35810BZ, and the Length is from one to two 35812BZ. The remark 35814BZ shows that GDT LogisticsConfirmationMethodCode 35800BZ may be restricted.

Exactly one fixed SAP code list has been assigned to the code. The attributes are as follows: listID="10139", listAgencyID="310", and listVersionID which is the version of the relevant code list assigned and managed by SAP AG and to be determined.

Possible code values for the GDT LogisticsConfirmationMethodCode 35800BZ are one and two. One is a Backflush. Backflush is where the quantities or durations are determined some time later, that is, they are calculated and reported depending on another value reported. Which value can be used as the basis for calculating the quantities and durations depends on the context. Two is an Explicit. Explicit is where quantities or durations may be confirmed explicitly.

The code can be used to determine which procedure is to be used for logistic confirmations, such as material consumptions and receipts. The consumption of expensive materials or materials that cannot be procured easily will usually be confirmed explicitly, whereas cheaper materials will be reported later when the completion of an intermediate product quantity is reported, using the backflush code.

(uuuuuuuuuuuu) LogisticUnitGroupID

A GDT LogisticUnitGroupID 35800CA is a unique identifier for a logistic unit group.

A logistic unit group specifies for a Logistic Unit Usage a classification to which logistic units can be assigned. The logistic units that can be assigned to a group have similar attributes relevant for the purposes of the Logistic Unit Usage. A Logistic Unit Usage is a logistics purpose for which Logistic Units are grouped. The Logistic Unit Usage can represent a process or an activity, such as conveying, packing, or storing. An example of a GDT LogisticUnitGroupID 35800CA is:

<LogisticUnitGroupID>12345678901234567890</LogisticUnitGroupID>

<LogisticUnitGroupID>HIGH_PALLETS</LogisticUnitGroupID>

The structure of GDT LogisticUnitGroupID 35800CA is depicted in FIG. 358CA. For the GDT LogisticUnitGroupID 35800CA, the Category is Element (E) 35801CA, the Object Class is Logistic Unit Group 35802CA, the Property is Identification 35803CA, the Representation/Association is Identifier 35804CA, the Type is CCT 35805CA, the Type Name is Identifier 35806CA and the Length is from one to forty 35807CA.

For the scheme ID 35808CA, the Category is Attribute (A) 34509CA, the Object Class is Identification Scheme 35810CA, the Property is Identification 35811CA, the Representation/Association is Identifier 35812CA, the Type is XSD 35813CA, the Type Name is token 35814CA, and the Length is from one to sixty 35815CA. The Cardinality is zero or one 35816CA.

For the scheme Version ID 35817CA, the Category is Attribute (A) 34518CA, the Object Class is Identification Scheme 35819CA, the Property is Version 35820CA, the Representation/Association is Identifier 35821CA, the Type is XSD 35822CA, the Type Name is token 35823CA, and the Length is from one to fifteen 35824CA. The Cardinality is zero or one 35825CA.

For the scheme Agency ID 35826CA, the Category is Attribute (A) 34527CA, the Object Class is Identification Scheme-Agency 35828CA, the Property is Identification 35829CA, the Representation/Association is Identifier 35830CA, the Type is XSD 35831CA, the Type Name is token 35832CA, and the Length is from one to sixty 35833CA. The Cardinality is zero or one 35834CA.

For the scheme Agency-Scheme ID 35835CA, the Category is Attribute (A) 34536CA, the Object Class is Identification Scheme-Agency 35837CA, the Property is Scheme 35838CA, the Representation/Association is Identifier 35839CA, the Type is XSD 35840CA, the Type Name is token 35841CA, and the Length is from one to sixty 35842CA. The Cardinality is zero or one 35843CA.

For the scheme Agency-Scheme Agency ID 35844CA, the Category is Attribute (A) 34545CA, the Object Class is Identification Scheme-Agency 35846CA, the Property is Scheme Agency 35847CA, the Representation/Association is Identifier 35848CA, the Type is XSD 35849CA, the Type Name is token 358450CA, and the Length is from one to three 35851CA. The Cardinality is zero or one 35852CA.

The GDT LogisticUnitGroupID 35800CA includes many attributes. A scheme ID 35808CA is an ID of the ID scheme. It is released and maintained by the responsible organization of the ID scheme. The GDT owner must retrieve the correct ID from the responsible organization. If there is no unique ID available, the name of the identifier or identifier type may be entered, which can be used in the corresponding standard, specification, or scheme of the responsible organization.

A scheme Agency ID 35826CA is the ID of the organization maintaining the ID scheme. This identification is released by an organization, for example DUNS, EAN or SWIFT. The GDT owner must retrieve the correct ID from the responsible organization.

A scheme Version ID 35817CA is a version of the ID scheme. It is released and maintained by the organization, which is named in scheme Agency ID 35826CA. The GDT owner must retrieve the relevant version ID from the responsible organization. If there is no version for the ID scheme, the version of the standard, the specification, or the scheme can be used.

A scheme Agency-Scheme ID 35835CA is the identification of the schema, which identifies the organization named in scheme Agency ID 35826CA. It's a certain scheme ID of partners, companies or members, for example DUNS+4, of an organization named in scheme Agency-Scheme Agency ID 35844CA, for example DUNS, EAN or SWIFT.

A scheme Agency-Scheme Agency ID 35844CA is an identification of the maintaining organization, for example DUNS, EAN or SWIFT which is responsible for the identification of the organization named in scheme Agency ID 35826CA.

(vvvvvvvvvvvv) LogisticUnitID

A GDT LogisticUnitID 35800CB is a unique identifier for a LogisticUnit.

A Logistic Unit is an item established for logistics operations, such as storage, movement, and packing. A Logistic Unit represents all physical units handled in the same manner during logistic operations, whether they be packed or unpacked goods. Examples of a Logistic Unit may include a high pallet or a liter milk carton. An example of a GDT LogisticUnitID 35800CB is:

<LogisticUnitID>12345678901234567890</LogisticUnitID>

<LogisticUnitID>2_METER_PALLET</LogisticUnitID>

The structure of GDT LogisticUnitID 35800CB is depicted in FIG. 358CB. For the GDT LogisticUnitID 35800CB, the Category is Element (E) 35801CB, the Object Class is Logistic Unit 35802CB, the Property is Identification 35803CB, the Representation/Association is Identifier 35804CB, the Type is CCT 35805CB, the Type Name is Identifier 35806CB and the Length is from one to forty 35807CB.

For the scheme ID 35808CB, the Category is Attribute (A) 34509CB, the Object Class is Identification Scheme 35810CB, the Property is Identification 35811CB, the Representation/Association is Identifier 35812CB, the Type is XSD 35813CB, the Type Name is token 35814CB, and the Length is from one to sixty 35815CB. The Cardinality is zero or one 35816CB.

For the scheme Version ID 35817CB, the Category is Attribute (A) 34518CB, the Object Class is Identification Scheme 35819CB, the Property is Version 35820CB, the Representation/Association is Identifier 35821CB, the Type is XSD 35822CB, the Type Name is token 35823CB, and the Length is from one to fifteen 35824CB. The Cardinality is zero or one 35825CB.

For the scheme Agency ID 35826CB, the Category is Attribute (A) 34527CB, the Object Class is Identification Scheme-Agency 35828CB, the Property is Identification 35829CB, the Representation/Association is Identifier 35830CB, the Type is XSD 35831CB, the Type Name is token 35832CB, and the Length is from one to sixty 35833CB. The Cardinality is zero or one 35834CB.

For the scheme Agency-Scheme ID 35835CB, the Category is Attribute (A) 34536CB, the Object Class is Identification Scheme-Agency 35837CB, the Property is Scheme 35838CB, the Representation/Association is Identifier 35839CB, the Type is XSD 35840CB, the Type Name is token 35841CB, and the Length is from one to sixty 35842CB. The Cardinality is zero or one 35843CB.

For the scheme Agency-Scheme Agency ID 35844CB, the Category is Attribute (A) 34545CB, the Object Class is Identification Scheme-Agency 35846CB, the Property is Scheme Agency 35847CB, the Representation/Association is Identifier 35848CB, the Type is XSD 35849CB, the Type Name is token 358450CB, and the Length is from one to three 35851CB. The Cardinality is zero or one 35852CB.

The GDT LogisticUnitID 35800CB includes many attributes. A scheme ID 35808CB is an ID of the ID scheme. It is released and maintained by the responsible organization of the ID scheme. The GDT owner must retrieve the correct ID from the responsible organization. If there is no unique ID available, the name of the identifier or identifier type may be entered, which can be used in the corresponding standard, specification, or scheme of the responsible organization.

A scheme Agency ID 35826CB is the ID of the organization maintaining the ID scheme. This identification is released by an organization, for example DUNS, EAN or SWIFT. The GDT owner must retrieve the correct ID from the responsible organization.

A scheme Version ID 35817CB is a version of the ID scheme. It is released and maintained by the organization, which is named in scheme Agency ID 35826CB. The GDT owner must retrieve the relevant version ID from the responsible organization. If there is no version for the ID scheme, the version of the standard, the specification, or the scheme can be used.

A scheme Agency-Scheme ID 35835CB is the identification of the schema, which identifies the organization named in scheme Agency ID 35826CB. It's a certain scheme ID of partners, companies or members, for example DUNS+4, of an organization named in scheme Agency-Scheme Agency ID 35844CB, for example DUNS, EAN or SWIFT.

A scheme Agency-Scheme Agency ID 35844CB is an identification of the maintaining organization, for example DUNS, EAN or SWIFT which is responsible for the identification of the organization named in scheme Agency ID 35826CB.

(wwwwwwwwwwwww) LogisticUnitShapeCode

A GDT LogisticUnitShapeCode 35800CC is a coded representation of the logistic unit's physical exterior shape, which may be used for handling purposes. A Logistic Unit is an item established for logistics operations, such as storage, movement, and packing. A Logistic Unit represents all physical units handled in the same manner during logistic operations, whether they be packed or unpacked goods. Examples of a Logistic Unit may include a high pallet or a liter milk carton. An example of a GDT LogisticUnitShapeCode 35800CC is:

<LogisticUnitShapeCode>1</LogisticUnitShapeCode>

The structure of GDT LogisticUnitShapeCode 35800CC is depicted in FIG. 358CC. For the GDT LogisticUnitShapeCode 35800CC, the Category is Element (E) 35802CC, the Object Class is Logistic Unit Shape 35804CC, the Property is Shape 35806CC, the Representation/Association is Code 35808CC, the Type is CCT 35810CC, the Type Name is Code 35812CC and the Length is from one to two 35814CC.

For the list Agency ID 35816CC, the Category is Attribute (A) 34518CC, the Object Class is Code List Agency 35820CC, the Property is Identification 35822CC, the Representation/Association is Identifier 35824CC, the Type is XSD 35826CC, and the Type Name is token 35828CC. The Cardinality is zero or one 35830CC.

For the list Version ID 35832CC, the Category is Attribute (A) 34534CC, the Object Class is Code List 35836CC, the Property is Version 35838CC, the Representation/Association is Identifier 35840CC, the Type is XSD 35842CC, and the Type Name is token 35844CC. The Cardinality is zero or one 35846CC.

For the list Agency-Scheme ID 35848CC, the Category is Attribute (A) 34550CC, the Object Class is Code List Agency 35852CC, the Property is Scheme 35854CC, the Representation/Association is Identifier 35856CC, the Type is XSD 35858CC, and the Type Name is token 35860CC. The Cardinality is zero or one 35862CC.

For the list Agency-Scheme Agency ID 35864CC, the Category is Attribute (A) 34566CC, the Object Class is Code List Agency 35868CC, the Property is Scheme Agency 35870CC, the Representation/Association is Identifier 35872CC, the Type is XSD 35874CC, and the Type Name is token 35876CC. The Cardinality is zero or one 35878CC.

A customer-specific code list, containing codes defined by A customer, is assigned to the GDT LogisticUnitShapeCode 35800CC. There are no predefined values of the code values. The attributes of the GDT LogisticUnitShapeCode 35800CC can be assigned the following values: listID="10041", listAgencyID which is the ID of the Customer (ID from DE 3055, if listed there), listVersionID which is assigned and managed by the Customer, listAgencySchemeID which is the ID of the scheme if the listAgencyID does not come from DE 3055, and the listAgencySchemeAgencyID which is the ID of the organization from DE 3055 that manages the listAgencySchemeID scheme.

The GDT LogisticUnitShapeCode 35800CC can be used by a logistic unit to specify its physical form. Examples for customer-specific code semantics include a Box-shaped which specifies the Logistic Unit is box-shaped, a Barrel-shaped which specifies the Logistic Unit is barrel-shaped and a Container-shaped which specifies the Logistic Unit is container-shaped.

(xxxxxxxxxxxx) LogisticUnitUsageID

A GDT LogisticUnitUsageID 35800CD is a unique identifier for a Logistic Unit Usage.

A Logistic Unit Usage is a logistics purpose for which Logistic Units are grouped. The Logistic Unit Usage can represent a process or an activity, such as conveying, packing, or storing. An example of a GDT LogisticUnitUsageID 35800CD is:

<LogisticUnitUsageID>12345678901234567890</LogisticUnitUsageID>
<LogisticUnitUsageID>CONVEYING</LogisticUnitUsageID>

The structure of GDT LogisticUnitUsageID 35800CD is depicted in FIG. 358CD. For the GDT LogisticUnitUsageID 35800CD, the Category is Element (E) 35801CD, the Object Class is Logistic Unit Group 35802CD, the Property is Identification 35803CD, the Representation/Association is Identifier 35804CD, the Type is CCT 35805CD, the Type Name is Identifier 35806CD and the Length is from one to forty 35807CD.

For the scheme ID 35808CD, the Category is Attribute (A) 34509CD, the Object Class is Identification Scheme 35810CD, the Property is Identification 35811CD, the Representation/Association is Identifier 35812CD, the Type is XSD 35813CD, the Type Name is token 35814CD, and the Length is from one to sixty 35815CD. The Cardinality is zero or one 35816CD.

For the scheme Version ID 35817CD, the Category is Attribute (A) 34518CD, the Object Class is Identification Scheme 35819CD, the Property is Version 35820CD, the Representation/Association is Identifier 35821 CD, the Type is XSD 35822CD, the Type Name is token 35823CD, and the Length is from one to fifteen 35824CD. The Cardinality is zero or one 35825CD.

For the scheme Agency ID 35826CD, the Category is Attribute (A) 34527CD, the Object Class is Identification Scheme-Agency 35828CD, the Property is Identification 35829CD, the Representation/Association is Identifier 35830CD, the Type is XSD 35831CD, the Type Name is token 35832CD, and the Length is from one to sixty 35833CD. The Cardinality is zero or one 35834CD.

For the scheme Agency-Scheme ID 35835CD, the Category is Attribute (A) 34536CD, the Object Class is Identification Scheme-Agency 35837CD, the Property is Scheme 35838CD, the Representation/Association is Identifier 35839CD, the Type is XSD 35840CD, the Type Name is token 35841 CD, and the Length is from one to sixty 35842CD. The Cardinality is zero or one 35843CD.

For the scheme Agency-Scheme Agency ID 35844CD, the Category is Attribute (A) 34545CD, the Object Class is Identification Scheme-Agency 35846CD, the Property is Scheme Agency 35847CD, the Representation/Association is Identifier 35848CD, the Type is XSD 35849CD, the Type Name is token 358450CD, and the Length is from one to three 35851CD. The Cardinality is zero or one 35852CD.

The GDT LogisticUnitUsageID 35800CD includes many attributes. A scheme ID 35808CD is an ID of the ID scheme. It is released and maintained by the responsible organization of the ID scheme. The GDT owner must retrieve the correct ID from the responsible organization. If there is no unique ID available, the name of the identifier or identifier type may be entered, which can be used in the corresponding standard, specification, or scheme of the responsible organization.

A scheme Agency ID 35826CD is the ID of the organization maintaining the ID scheme. This identification is released by an organization, for example DUNS, EAN or SWIFT The GDT owner must retrieve the correct ID from the responsible organization.

A scheme Version ID 35817CD is a version of the ID scheme. It is released and maintained by the organization, which is named in scheme Agency ID 35826CD. The GDT owner must retrieve the relevant version ID from the responsible organization. If there is no version for the ID scheme, the version of the standard, the specification, or the scheme can be used.

A scheme Agency-Scheme ID 35835CD is the identification of the schema, which identifies the organization named in scheme Agency ID 35826CD. It's a certain scheme ID of partners, companies or members, for example DUNS+4, of an organization named in scheme Agency-Scheme Agency ID 35844CD, for example DUNS, EAN or SWIFT.

A scheme Agency-Scheme Agency ID 35844CD is an identification of the maintaining organization, for example DUNS, EAN or SWIFT which is responsible for the identification of the organization named in scheme Agency ID 35826CD.

(yyyyyyyyyyyy) LogisticsBranchingJoinID

A GDT LogisticsBranchingJoinID 35800CE is a unique identifier of a joining of a branching in a process description in logistics. At a join, the alternative production and transportation paths that were split by a branching are reunited in one common path. An example of a GDT LogisticsBranchingJoinID 35800CE is:

<LogisticsBranchingJoinID>C3PO</LogisticsBranchingJoinID>

The structure of GDT LogisticsBranchingJoinID 35800CE is depicted in FIG. 358CE. For the GDT LogisticsBranchingJoinID 35800CE, the Object Class is Logistics Branching Join 35802CE, the Property is Identification 35804CE, the Representation/Association is Identifier 35806CE, the Type is CCT 35808CE, the Type Name is Identifier 35810CE, and the Length is from one to forty 35812CE. The remark 35814CE shows that GDT LogisticsBranchingJoinID 35800CE may be restricted.

The GDT LogisticsBranchingJoinID 35800CE may be unique in the usage context.

(zzzzzzzzzzzz) LogisticsBranchingPathID

A GDT LogisticsBranchingPathID 35800CF is a unique identifier of a path of a branching in a process description in logistics. A path is a linear sequence of operations in a process description in logistics. An example of a GDT LogisticsBranchingPathID 35800CF is:

<LogisticsBranchingPathID>F3335</LogisticsBranchingPathID>

The structure of GDT LogisticsBranchingPathID 35800CF is depicted in FIG. 358CF. For the GDT LogisticsBranchingPathID 35800CF, the Object Class is Logistics Branching Path 35802CF, the Property is Identification 35804CF, the Representation/Association is Identifier 35806CF, the Type is CCT 35808CF, the Type Name is Identifier 35810CF, and the Length is from one to forty 35812CF. The remark 35814CF shows that GDT LogisticsBranchingPathID 35800CF may be restricted.

The GDT LogisticsBranchingPathID 35800CF may be unique in the usage context.

(aaaaaaaaaaaaa) LogisticsTaskFolderRegistrantTypeCode

A GDT LogisticsTaskFolderRegistrantTypeCode 35800CG is the coded representation of the type of object registered at a logistics task folder. A logistics task folder is a folder for storing and grouping of logistics tasks according to business criteria. It determines the business assignment criteria that a logistics task must meet to be stored in a specific folder and contains details about the processors that are registered at the folder. An example of a GDT LogisticsTaskFolderRegistrantTypeCode 35800CG is:

<LogisticsTaskFolderRegistrantTypeCode>1</LogisticsTaskFolderRegistrantTypeCode>

The structure of GDT LogisticsTaskFolderRegistrantTypeCode 35800CG is depicted in FIG. 358CG. For the GDT LogisticsTaskFolderRegistrantTypeCode 35800CG, the Object Class is Logistics Task Folder Registrant 35802CG, the Property is Type 35804CG, the Representation/Association is Code 35806CG, the Type is CCT 35808CG, the Type Name is Code 35810CG, and the Length is from one to two 35812CG. The remark 35814CG shows that GDT LogisticsTaskFolderRegistrantTypeCode 35800CG may be restricted.

Exactly one fixed SAP code list has been assigned to the GDT LogisticsTaskFolderRegistrantTypeCode 35800CG. The attributes are as follows: listID=10155, listAgencyID=310, listVersionID which is the version of the relevant code list assigned and managed by SAP AG.

Possible code values for the GDT LogisticsTaskFolderRegistrantTypeCode 35800CG are one and two. One describes a User, which is the object registered by a user. Two describes an End-user device, which is the object registered is an end-user device.

(bbbbbbbbbbbbb) LogisticsTaskFolderTypeCode

A GDT LogisticsTaskFolderTypeCode 35800CH is the coded representation of the type of the logistics task folder. A logistics task folder is a folder for storing and grouping of logistics tasks according to business criteria. It determines the business assignment criteria that a logistics task must meet to be stored in a specific folder and contains details about the processors that are registered at the folder. An example of a GDT LogisticsTaskFolderTypeCode 35800CH is:

<LogisticsTaskFolderTypeCode>1</LogisticsTaskFolderTypeCode>

The structure of GDT LogisticsTaskFolderTypeCode 35800CH is depicted in FIG. 358CH. For the GDT LogisticsTaskFolderTypeCode 35800CH, the Object Class is Logistics Task Folder 35802CH, the Property is Type 35804CH, the Representation/Association is Code 35806CH, the Type is CCT 35808CH, the Type Name is Code 35810CH, and the Length is from one to two 35812CH. The remark 35814CH shows that GDT LogisticsTaskFolderTypeCode 35800CH may be restricted.

The GDT LogisticsTaskFolderTypeCode 35800CH can be used to restrict what a logistics task folder can be used for and how it behaves.

Exactly one fixed SAP code list has been assigned to GDT LogisticsTaskFolderTypeCode 35800CH. The attributes are as follows: listID=10154, listAgencyID=310, listVersionID which is the version of the relevant code list assigned and managed by SAP AG which is to be determined.

Possible code values for the GDT LogisticsTaskFolderTypeCode 35800CH are one, two and three. One describes a Standard, which is a folder for storing tasks that can be assigned. Two describes an Exception, which is a folder for storing tasks that cannot be assigned initially. Three describes a Template, which is a template for creating new folders.

(ccccccccccccc) LogisticsTaskTypeCode

A GDT LogisticsTaskTypeCode 35800CI is the coded representation of the type of a logistics task. A logistics task is a task that a processor executes at a specific time at a predefined work step within a production or site logistics process. An example of a GDT LogisticsTaskTypeCode 35800CI is:

<LogisticsTaskTypeCode>1</LogisticsTaskTypeCode>

The structure of GDT LogisticsTaskTypeCode 35800CI is depicted in FIG. 358CI. For the GDT LogisticsTaskTypeCode 35800CI, the Object Class is Logistics Task 35802CI, the Property is Type 35804CI, the Representation/Association is Code 35806CI, the Type is CCT 35808CI, the Type Name is Code 35810CI, and the Length is from one to two 35812CI. The remark 35814CI shows that GDT LogisticsTaskTypeCode 35800CI may be restricted.

The GDT LogisticsTaskTypeCode 35800CI can be used to restrict what a logistics task folder can be used for and how it behaves.

Exactly one fixed SAP code list has been assigned to GDT LogisticsTaskFolderTypeCode 35800CH. The attributes are as follows: listID=10153, listAgencyID=310, listVersionID which is the version of the relevant code list assigned and managed by SAP AG which is to be determined.

Possible code values for the GDT LogisticsTaskTypeCode 35800CI are one and two. One describes a Production Task, which is a task used in production. Two describes aSite Logistics Task, which is a task used in site logistics.

(ddddddddddddd) MaritalStatusCode

A GDT MaritalStatusCode 35800CJ is the coded description of marital status. An example of a GDT MaritalStatusCode 35800CJ is:

<MaritalStatusCode>2</MaritalStatusCode>

The structure of GDT MaritalStatusCode 35800CJ is depicted in FIG. 358CJ. For the GDT MaritalStatusCode 35800CJ, the Property is Marital Status 35802CJ, the Representation/Association is Code 35804CJ, the Type is CCT 35806CJ, the Type Name is Code 35808CJ and the Length is one 35810CJ. The remark 35812CJ shows that GDT MaritalStatusCode 35800CJ may be restricted.

For the list ID 35814CJ, the Category is Attribute (A) 34516CJ, the Object Class is Code List 35818CJ, the Property is Identification 35820CJ, the Representation/Association is Identifier 35822CJ, the Type is XSD 35824CJ, and the Type Name is token 35826CJ. The Cardinality is zero or one 35828CJ.

For the list Agency ID 35830CJ, the Category is Attribute (A) 34532CJ, the Object Class is Code List Agency 35834CJ, the Property is Identification 35836CJ, the Representation/Association is Identifier 35838CJ, the Type is XSD 35840CJ, and the Type Name is token 35842CJ. The Cardinality is zero or one 35844CJ.

For the list Version ID 35846CJ, the Category is Attribute (A) 34548CJ, the Object Class is Code List 35850CJ, the Property is Version 35852CJ, the Representation/Association is Identifier 35854CJ, the Type is XSD 35856CJ, and the Type Name is token 35858CJ. The Cardinality is zero or one 35860CJ.

For the list Agency-Scheme ID 35862CJ, the Category is Attribute 34564CJ, the Object Class is Code List Agency 35866CJ, the Property is Scheme 35868CJ, the Representation/Association is Identifier 35870CJ, the Type is XSD 35872CJ, and the Type Name is token 35874CJ. The Cardinality is zero or one 35876CJ.

For the list Agency-Scheme Agency ID 35878CJ, the Category is Attribute 34580CJ, the Object Class is Code List Agency 35882CJ, the Property is Scheme Agency 35884CJ, the Representation/Association is Identifier 35886CJ, the Type is XSD 35888CJ, and the Type Name is token 35890CJ. The Cardinality is zero or one 35892CJ.

A customer-specific code list is assigned to the code. A customer can determine the codes in the code list. The attributes of the code are assigned the following values: listID="10357", listAgencyID which is the ID of the Customer (ID from DE 3055, if listed there), listVersionID which is the version of the particular code list assigned and managed by the Customer, listAgencySchemeID which is the ID of the scheme if the listAgencyID does not come from DE 3055, listAgencySchemeAgencyID which is the ID of the organization from DE 3055 that manages the listAgencySchemeID scheme.

Examples of possible codes are Married, indicating the person is married and Single, indicating the person is single.

The following dictionary objects can be assigned to this GDT in mySAP systems: Data element: BU_MARST and Domain: BU_MARST.

(eeeeeeeeeeeee) MaterialInputID

A GDT MaterialInputID 35800CK is a unique identifier for a material input in logistics. A material input is a quantitative input of a material that is required for the execution of a logistic process. An example of a GDT MaterialInputID 35800CK is:

<MaterialInputID>4711</MaterialInputID>

The structure of GDT MaterialInputID 35800CK is depicted in FIG. 358CK. For the GDT MaterialInputID 35800CK, the Object Class is Material Input 35802CK, the Property is Identification 35804CK, the Representation/Association is Identifier 35806CK, the Type is CCT 35808CK, the Type Name is Identifier 35810CK, and the Length is from one to six 35812CK. The remark 35814CK shows that GDT MaterialInputID 35800CK may be restricted.

The GDT MaterialInputID 35800CK is unique in the context of the business object to which it belongs.

(fffffffffffff) MaterialOutputID

A GDT MaterialOutputID 35800CL is a unique identifier for a material output in logistics. A material output is a quantitative output of a material that is the planned result of a logistic process. An example of a GDT MaterialOutputID 35800CL is:

<MaterialOutputID>4711</MaterialOutputID>

The structure of GDT MaterialOutputID 35800CL is depicted in FIG. 358CL. For the GDT MaterialOutputID 35800CL, the Object Class is Material Output 35802CL, the Property is Identification 35804CL, the Representation/Association is Identifier 35806CL, the Type is CCT 35808CL, the Type Name is Identifier 35810CL, and the Length is from one to six 35812CL. The remark 35814CL shows that GDT MaterialOutputID 35800CL may be restricted.

The GDT MaterialOutputID 35800CL is unique in the context of the business object to which it belongs.

(ggggggggggggg) MaterialRoleCode

A GDT MaterialRoleCode 35800CM is the code indicating the role of a material. An example of a GDT MaterialRoleCode 35800CM is:

<MaterialRoleCode>2</MaterialRoleCode>

The structure of GDT MaterialRoleCode 35800CM is depicted in FIG. 358CM. For the GDT MaterialRoleCode 35800CM, the Object Class is Material 35802CM, the Property is Role 35804CM, the Representation/Association is Code 35806CM, the Type is CCT 35808CM, the Type Name is Code 35810CM, and the Length is from one to two 35812CM. The remark 35814CM shows that GDT MaterialRoleCode 35800CM may be restricted.

The GDT MaterialRoleCode 35800CM can be used to describe the role of a material in a process.

Exactly one fixed SAP code list has been assigned to the GDT MaterialRoleCode 35800CM. The attributes are as follows: listID="10158", and listAgencyID="310".

Qualified GDT MaterialRoleCode 35800CM qualifiers include JointProductionMaterialRoleCode, MaterialInputMaterialRoleCode, and MaterialOutputMaterialRoleCode. JointProductionMaterialRoleCode is defined as the role of the created material in a joint production process. Joint production is the production of several materials in one manufacturing process. MaterialInputMaterialRoleCode is defined as the role of the incoming material an a production or packaging process. MaterialOutputMaterialRoleCode is defined as the role of the outgoing material an a production or packaging process.

Possible code values for the GDT MaterialRoleCode 35800CM are one, two, three and four. One describes a Main Product. The main product is the material to be produced. Two describes a Co-Product. The co-product is a desirable material that is produced during the production of the main product. Three describes a By-Product. The by-product is an undesirable material that is produced during the production of the main product. Four describes Packaging Material. The packaging material is a removable wrapping that can be used to protect another material during shipment, for example.

(hhhhhhhhhhhhh) MaternityProtectionDeliveryTypeCode

A GDT MaternityProtectionDeliveryTypeCode 35800CN is the coded representation of the type of a delivery of a child according to maternity protection regulations. An example of a GDT MaternityProtectionDeliveryTypeCode 35800CN is:

<MaternityProtectionDeliveryTypeCode>1</MaternityProtectionDeliveryTypeCode

The structure of GDT MaternityProtectionDeliveryTypeCode 35800CN is depicted in FIG. 358CN. For the GDT MaternityProtectionDeliveryTypeCode 35800CN, the Object Class is Maternity Protection 35801CN, the Property is Delivery Type 35802CN, the Representation/Association is Code 35804CN, the Type is CCT 35806CN, the Type Name is Code 35808CN and the Length is from one to two 35810CN. The remark 35812CN shows that GDT MaternityProtectionDeliveryTypeCode 35800CN may be restricted.

For the list ID 35814CN, the Category is Attribute (A) 34516CN, the Object Class is Code List 35818CN, the Property is Identification 35820CN, the Representation/Association is Identifier 35822CN, the Type is XSD 35824CN, and the Type Name is token 35826CN. The Cardinality is zero or one 35828CN.

For the list Agency ID 35830CN, the Category is Attribute (A) 34532CN, the Object Class is Code List Agency 35834CN, the Property is Identification 35836CN, the Representation/Association is Identifier 35838CN, the Type is XSD 35840CN, and the Type Name is token 35842CN. The Cardinality is zero or one 35844CN.

For the list Version ID 35846CN, the Category is Attribute (A) 34548CN, the Object Class is Code List 35850CN, the Property is Version 35852CN, the Representation/Association is Identifier 35854CN, the Type is XSD 35856CN, and the Type Name is token 35858CN. The Cardinality is zero or one 35860CN.

For the list Agency-Scheme ID 35862CN, the Category is Attribute (A) 34564CN, the Object Class is Code List Agency 35866CN, the Property is Scheme 35868CN, the Representation/Association is Identifier 35870CN, the Type is XSD 35872CN, and the Type Name is token 35874CN. The Cardinality is zero or one 35876CN.

For the list Agency-Scheme Agency ID 35878CN, the Category is Attribute (A) 34580CN, the Object Class is Code List Agency 35882CN, the Property is Scheme Agency 35884CN, the Representation/Association is Identifier 35886CN, the Type is XSD 35888CN, and the Type Name is token 35890CN. The Cardinality is zero or one 35892CN.

Several fixed, country-specific code lists, which are different at runtime, can be assigned to the GDT MaternityProtectionDeliveryTypeCode 35800CN. The GDT MaternityProtectionDeliveryTypeCode 35800CN can be used, for example, in the calculation of the Maternity Protection period according to various delivery types. The Maternity Protection period can be calculated differently, as provided by the national law, for the various delivery types.

GDT MaternityProtectionDeliveryTypeCode 35800CN for 'DE' (Germany) is as follows: listID="10090", listAgencyID="310", listVersionID which is the version for the current code list administered by SAP AG.

Possible code values for the GDT MaternityProtectionDeliveryTypeCode 35800CN are one, two and three. One is for Normal, representing a normal delivery of a child defined as not premature or stillborn. Two is for Preterm Delivery, representing a premature birth. The premature still birth will be considered as a still birth not a premature birth. Three is for Still Birth, representing a still birth where the child is born dead.

(iiiiiiiiiiii) MileageReimbursementVehicleClassCode

A GDT MileageReimbursementVehicleClassCode 35800CO is the coded representation of a vehicle class to which the same statutory, contractual, or company-specific expense regulations apply regarding the reimbursement of travel costs. An example of a GDT MileageReimbursementVehicleClassCode 35800CO is:

<MileageReimbursementVehicleClassCode>1</MileageReimbursementVehicleClassCode>

The structure of GDT MileageReimbursementVehicleClassCode 35800CO is depicted in FIG. 358CO. For the GDT MileageReimbursementVehicleClassCode 35800CO, the Object Class is Mileage Reimbursement Vehicle 35802CO, the Property is Class 35804CO, the Representation/Association is Code 35806CO, the Type is CCT 35808CO, the Type Name is Code 35810CO, and the Length is from one to two 35812CO. The remark 35814CO shows that GDT MileageReimbursementVehicleClassCode 35800CO may be restricted.

The GDT MileageReimbursementVehicleClassCode 35800CO may currently be used with business objects.

A customer-specific code list is assigned to the code. A customer can determine the codes in the code list. The attributes of the code are assigned the following values: listID="10358", listAgencyID which is the ID of the Customer (ID from DE 3055, if listed there), listVersionID which is the version of the particular code list assigned and managed by the Customer, listAgencySchemeID which is the ID of the scheme if the listAgencyID does not come from DE 3055, and listAgencySchemeAgencyID which is the ID of the organization from DE 3055 that manages the listAgencySchemeID scheme.

An example for the use of the GDT MileageReimbursementVehicleClassCode 35800CO is the legal regulation in Great Britain that stipulates four classes. These classes are cars with engines up to 1000 cc, cars with engines from 1001 to 1500 cc. cars with engines from 1501 to 2000 cc, and cars with engines over 2000 cc.

(jjjjjjjjjjjj) MileageReimbursementVehicleTypeCode

A GDT MileageReimbursementVehicleTypeCode 35800CP is the coded representation of a vehicle type to which the same statutory, contractual, or company-specific expense regulations apply regarding the reimbursement of travel costs. An example of a GDT MileageReimbursementVehicleTypeCode 35800CP is:

<MileageReimbursementVehicleTypeCode>1</MileageReimbursementVehicleTypeCode>

The structure of GDT MileageReimbursementVehicleTypeCode 35800CP is depicted in FIG. 358CP. For the GDT MileageReimbursementVehicleTypeCode 35800CP, the Object Class is Mileage Reimbursement Vehicle 35802CP, the Property is Type 35804CP, the Representation/Association is Code 35806CP, the Type is CCT 35808CP, the Type Name is Code 35810CP, and the Length is from one to two 35812CP. The remark 35814CP shows that GDT MileageReimbursementVehicleTypeCode 35800CP may be restricted.

The GDT MileageReimbursementVehicleTypeCode 35800CP may currently be used with business objects.

A customer-specific code list is assigned to the code. A customer can determine the codes in the code list. The attributes of the code are assigned the following values: listID="10359", listAgencyID which is the ID of the Customer (ID from DE 3055, if listed there), listVersionID which is the version of the particular code list assigned and managed by the Customer, listAgencySchemeID which is the ID of the scheme if the listAgencyID does not come from DE 3055, and listAgencySchemeAgencyID which is the ID of the organization from DE 3055 that manages the listAgencySchemeID scheme.

An example for the use of the GDT MileageReimbursementVehicleTypeCode 35800CP is a passenger motor vehicle, which applies to most statutory expense regulations. Other examples for the use of the GDT MileageReimbursementVehicleTypeCode 35800CP is the Norwegian law which includes other types of transportation means. Examples of these types include a motor scooter, a bicycle, on foot, a passenger motor vehicle, a large boat, a small boat, a motorcycle, other land or water vehicles, and a snowmobile.

(kkkkkkkkkkkk) NumberingMethodCode

A GDT NumberingMethodCode 35800CQ represents a numbering method in the form of a code.

A numbering method is the way in which numbering takes place. Numbering is understood to mean "the formation, assignment, management and usage of numbers" for numbering objects. Numbering objects, in this definition, can be objects, data carriers, persons or facts. A number, in the context of numbering, is an established sequence of characters, such as letters, digits or special characters. The number created does not have to be unique. Therefore, a number can be used several times within a particular numbering method.

Numbering, as described above, is not the same as the numbering of a set in a computability theory. It is also not the same as coding. An example of a GDT NumberingMethodCode 35800CQ is:

<NumberingMethodCode>1</NumberingMethodCode>

The structure of GDT NumberingMethodCode 35800CQ is depicted in FIG. 358CQ. For the GDT NumberingMethodCode 35800CQ, the Object Class is Numbering 35804CQ, the Property is Method 35806CQ, the Representation/Association is Code 35808CQ, the Type is GDT 35810CQ, the Type Name is Code 35812CQ and the Length is from one to ten 35814CQ. The remark 35815CP shows that GDT NumberingMethodCode 35800CQ may be restricted.

For the list Agency ID 35816CQ, the Category is Attribute (A) 34518CQ, the Object Class is Code List Agency 35820CQ, the Property is Identification 35822CQ, the Representation/Association is Identifier 35824CQ, the Type is XSD 35826CQ, and the Type Name is token 35828CQ. The Cardinality is zero or one 35830CQ.

For the list Version ID 35832CQ, the Category is Attribute (A) 34534CQ, the Object Class is Code List 35836CQ, the Property is Version 35838CQ, the Representation/Association is Identifier 35840CQ, the Type is XSD 35842CQ, and the Type Name is token 35844CQ. The Cardinality is zero or one 35846CQ.

For the list Agency-Scheme ID 35848CQ, the Category is Attribute (A) 34550CQ, the Object Class is Code List Agency 35852CQ, the Property is Scheme 35854CQ, the Representation/Association is Identifier 35856CQ, the Type is XSD 35858CQ, and the Type Name is token 35860CQ. The Cardinality is zero or one 35862CQ.

For the list Agency-Scheme Agency ID 35864CQ, the Category is Attribute (A) 34566CQ, the Object Class is Code List Agency 35868CQ, the Property is Scheme Agency 35870CQ, the Representation/Association is Identifier 35872CQ, the Type is XSD 35874CQ, and the Type Name is token 35876CQ. The Cardinality is zero or one 35878CQ.

There are alternative code lists that differ at configuration and/or runtime. Possible code values for the GDT NumberingMethodCode 35800CQ are one, two and three. One represents a Number Range. The number is taken from a number range. The number range is an area in which numbers that refer to business objects can be assigned. Examples of business objects may include business partners, general ledger accounts, orders, posting documents or materials. Every number range consists of one or more number range intervals. Whether the number is assigned internally or externally is stated for every number range interval. In the case of internal number assignment, the system automatically assigns a consecutive number that occurs within the relevant number range interval. In the case of external number assignment, the number for the object is assigned by the user or by an external system. It is important that the number occurs in the relevant number range interval. The number range object and number range interval constitute the input parameters of the method.

Two represents a Numbering Scheme. The number is created using a numbering scheme. The numbering scheme describes the formal construction of a classification system with regard to the number of hierarchy levels, as well as the meaning and the numbering of hierarchy elements. The numbering scheme to be used is the input parameter of the method.

Three represents a Universal Unique Identifier (UUID). The number is created as a UUID. The method does not have any input parameters.

The attributes have the following values: listID="10075", listAgencyID="310", and listVersionID is the version of the relevant code list assigned and managed by SAP AG which is to be determined.

The customer can extend the code list attributes. A list Agency ID 35816CQ is the ID of the customer. An ID assigned by an organization may be used. Examples of this are the business IDs assigned by DUNS, EAN and SWIFT.

A list Version ID 35832CQ is a version of the relevant code list. It is assigned and administered by the customer listed in the list Agency ID 35816CQ. A list Agency-Scheme ID 35848CQ is an ID of the scheme by which the customer listed in the list Agency ID 35816CQ is identified. It is a particular identification scheme for partners, businesses, and members, for example DUNS+4, of an administering organization, for example, EAN, DUNS and SWIFT, that is listed in a list Agency-Scheme Agency ID 35864CQ. The list Agency-Scheme Agency ID 35864CQ is the ID of the administering organization, for example DUNS, EAN or SWIFT, that is responsible for identifying the organization listed in the list Agency ID 35816CQ.

If the numbering method ensures that a number is created only once, the number created can be used to identify objects. The GDT NumberingMethodCode 35800CQ can be used to determine the method used for numbering objects.

An example of the use of the GDT NumberingMethodCode 35800CQ is where business partner numbers are taken from a number range. In the case of external number assignment, the number is checked against a number range. Another example involves product category numbers that can be created using a numbering scheme (COMM_SCHEMET) that is assigned to the product category hierarchy, which determines how it is constructed.

(llllllllllll) NumberRangeIntervalBusinessPartnerGroupCode

A GDT NumberRangeIntervalBusinessPartnerGroupCode 35800CR is the coded representation of a group of business partners for whom the numbers can be assigned from the same number range. A number range interval is an interval of successive alphanumeric characters within a number range. There can be several non-overlapping number range intervals within a number range. An example of a GDT NumberRangeIntervalBusinessPartnerGroupCode 35800CR is:

<NumberRangeIntervalBusinessPartnerGroupCode>1</NumberRangeIntervalBusinessPartnerGroupCode>

The structure of GDT NumberRangeIntervalBusinessPartnerGroupCode 35800CR is depicted in FIG. 358CR. For the GDT NumberRangeIntervalBusinessPartnerGroupCode 35800CR, the Object Class Qualifier is Number Range Interval 35802CR, the Object Class is Business Partner Group 35804CR, the Representation/Association is Code 35806CR, the Type is CCT 35808CR, the Type Name is Code 35810CR, and the Length is from one to four 35812CR. The remark 35814CR shows that GDT NumberRangeIntervalBusinessPartnerGroupCode 35800CR may be restricted.

A customer-specific code list is assigned to the code. A customer can determine the codes in the code list. The attributes of the code are assigned the following values: listID="10360", listAgencyID which is the ID of the Customer (ID from DE 3055, if listed there), listVersionID which is the version of the particular code list assigned and managed by the Customer, listAgencySchemeID which is the ID of the scheme if the listAgencyID does not come from DE 3055, and listAgencySchemeAgencyID which is the ID of the organization from DE 3055 that manages the listAgencySchemeID scheme.

Examples of the codes for the GDT NumberRangeIntervalBusinessPartnerGroupCode 35800CR may be major customers and legacy customers. Major customers are major customers with internal number assignment. Legacy customers are legacy customers with external number assignment.

The following dictionary objects can be assigned to this GDT in mySAP systems, the Data element: BU_GROUP.

(mmmmmmmmmmmmm) OccupationCode

A GDT OccupationCode 35800CS represents the occupation of a person in the form of a code. An example of a GDT OccupationCode 35800CS is:

<OccupationCode>1</OccupationCode>

The structure of GDT OccupationCode 35800CS is depicted in FIG. 358CS. For the GDT OccupationCode 35800CS, the Property is Occupation 35802CS, the Representation/Association is Code 35804CS, the Type is CCT 35806CS, the Type Name is Code 35808CS and the Length is from one to four 35810CS. The remark 35812CS shows that GDT OccupationCode 35800CS may be restricted.

For the list ID 35814CS, the Category is Attribute (A) 34516CS, the Object Class is Code List 35818CS, the Property is Identification 35820CS, the Representation/Association is Identifier 35822CS, the Type is XSD 35824CS, and the Type Name is token 35826CS. The Cardinality is zero or one 35828CS.

For the list Agency ID 35830CS, the Category is Attribute (A) 34532CS, the Object Class is Code List Agency 35834CS, the Property is Identification 35836CS, the Representation/Association is Identifier 35838CS, the Type is XSD 35840CS, and the Type Name is token 35842CS. The Cardinality is zero or one 35844CS.

For the list Version ID 35846CS, the Category is Attribute (A) 34548CS, the Object Class is Code List 35850CS, the Property is Version 35852CS, the Representation/Association is Identifier 35854CS, the Type is XSD 35856CS, and the Type Name is token 35858CS. The Cardinality is zero or one 35860CS.

For the list Agency-Scheme ID 35862CS, the Category is Attribute (A) 34564CS, the Object Class is Code List Agency 35866CS, the Property is Scheme 35868CS, the Representation/Association is Identifier 35870CS, the Type is XSD 35872CS, and the Type Name is token 35874CS. The Cardinality is zero or one 35876CS.

For the list Agency-Scheme Agency ID 35878CS, the Category is Attribute (A) 34580CS, the Object Class is Code List Agency 35882CS, the Property is Scheme Agency 35884CS, the Representation/Association is Identifier 35886CS, the Type is XSD 35888CS, and the Type Name is token 35890CS. The Cardinality is zero or one 35892CS.

A customer-specific code list is assigned to the code. A customer can determine the codes in the code list. The attributes of the code are assigned the following values: listID="10362", listAgencyID which is the ID of the Customer (ID from DE 3055, if listed there), listVersionID which is the version of the particular code list assigned and managed by the Customer, listAgencySchemeID which is the ID of the scheme if the listAgencyID does not come from DE 3055, and listAgencySchemeAgencyID which is the ID of the organization from DE 3055 that manages the listAgencySchemeID scheme.

Examples of the GDT OccupationCode 35800CS are teacher and student. The code is set to teacher if the person is a teacher. The code is set to student if the person is a student.

(nnnnnnnnnnnnn) CreditCommitmentTypeCode

A GDT CreditCommitmentTypeCode 35800CT is a coded representation of the type of a payment obligation (liability). An example of GDT CreditCommitmentTypeCode 35800CT is:

<CreditCommitmentTypeCode>001</CreditCommitmentTypeCode>

The structure of GDT CreditCommitmentTypeCode 35800CT is depicted in FIG. 358CT. For the GDT CreditCommitmentTypeCode 35800CT, the Object Class is Credit Commitment 35804CT, the Property is Type 35806CT, the Representation/Association is Code 35808CT, the Type is CCT 35810CT, the Type Name is Code 35812CT, and the Length is three 35814CT.

The data type GDT CreditCommitmentTypeCode 35800CT may be used to inform central credit management about the type of payment obligation. The data type GDT CreditCommitmentTypeCode 35800CT may use the following codes: 001 (i.e., liability from a sales order), 002 (i.e., liability from an accounting open item, for example, a receivable from delivery and service), 003 (i.e., liability from a special general ledger transaction, for example, a down payment or collateral), 004 (i.e., liability from a delivery), 005 (i.e., liability from a billing document).

The CreditCommitmentTypeCode is an SAP proprietary code list with fixed predefined values. Changes to the permitted values involve changes to the interface. This code list corresponds to the entries in table UKM_COMM_TYPE in SAP FSCM Credit Management.

(ooooooooooooo) CurrencyUsageCode

A GDT CurrencyUsageCode 35800CU is a coded representation of how a currency can be used. An example of GDT CurrencyUsageCode 35800CU is:

<CurrencyUsageCode>1</CurrencyUsageCode>

The structure of GDT CurrencyUsageCode 35800CU is depicted in FIG. 358CU. For the GDT CurrencyUsageCode 35800CU, the Property is Currency Usage 35806CU, the Representation/Association is Code 35808CU, the Type is CCT 35810CU, the Type Name is Code 35812CU, and the Length is from one to three 35814CU. The remark 35818CU shows that the GDT CurrencyUsageCode 35800CU may be restricted.

The data type GDT CurrencyUsageCode 35800CU is a fixed code list. The attributes listID="10051", listAgencyID="310", listVersionID=(to be defined) are missing in the structure as they would be filled with constant values at runtime. The data type GDT CurrencyUsageCode 35800CU may use the following codes: 1 (i.e., a currency can be used for the payment of wages), 2 (i.e., a currency can be used for transactions with customers or vendors).

(ppppppppppppp) CustomerPriceListTypeCode

A GDT CustomerPriceListTypeCode 35800CV is a coded representation of a price list type for customers. For example, a price list type may describe the underlying structure of a price list according to its characteristic usage. An example of GDT CustomerPriceListTypeCode 35800CV is:

<CustomerPriceListTypeCode>1</CustomerPriceListTypeCode>

The structure of GDT CustomerPriceListTypeCode 35800CV is depicted in FIG. 358CV. For the GDT CustomerPriceListTypeCode 35800CV, the Object Class is Customer Price List Type 35804CV, the Representation/Association is Code 35808CV, the Type is CCT 35810CV, the Type Name is Code 35812CV, and the Length is from one to two 35814CV. The remark 35818CV shows that the GDT CustomerPriceListTypeCode 35800CV may be restricted.

The data type GDT CustomerPriceListTypeCode 35800CV may use the following codes: Wholesale (i.e., the price list is for wholesale customers), Retail (i.e., the price list is for retail customers), Public Sector (i.e., the price list is for public sector customers), Internet (i.e., the price list is for internet sales).

A customer-specific code list is assigned to the code. A customer may determine the codes in the code list. The attributes of the code are assigned the following values: listID="10336," listAgencyID—ID of the Customer (ID from DE 3055, if listed there), listVersionID—version of the particular code list. Assigned and managed by the Customer, listAgencySchemeID—ID of the scheme if the listAgencyID does not come from DE 3055, and listAgencySchemeAgencyID—ID of the organization from DE 3055 that manages the listAgencySchemeID scheme.

In messages, CustomerPriceListTypeCode 35800CV may be used when both sender and recipient have access to shared or harmonized Business Configuration, for example, during internal communication in an enterprise.

The data type CustomerPriceListTypeCode may be used to define price list type for customers based on price lists that have the same features. Examples for semantics of the code are: Wholesale—the price list is for wholesale customers, Retail—the price list is for retail customers, Public sector—the price list is for public sector customers or Internet—the price list is for internet sales.

(qqqqqqqqqqqqq) DataOriginTypeCode

A GDT DataOriginTypeCode 35800CW is a coded description of where the data originates. An example of GDT DataOriginTypeCode 35800CW is:

<DataOriginTypeCode>1</DataOriginTypeCode>

The structure of GDT DataOriginTypeCode 35800CW is depicted in FIG. 358CW. For the GDT DataOriginTypeCode 35800CW, the Property Qualifier is Data 35802CW, the Property is Origin Type 35803CW, the Representation/Association is Code 35804CW, the Type is CCT 35805CW, the Type Name is Code 35806CW, and the Length is from one to four 35807CW. The remark 35809CW shows that the GDT DataOriginTypeCode 35800CW may be restricted.

For the ListID 35810CW, the Category is Attribute (A) 35811CW, the Object Class is CodeList 35812CW, the Property is Identification 35813CW, the Representation/Association is Identifier 35814CW, the Type is XSD 35815CW, the Type Name is Token 35816CW, and the Cardinality is zero or one 35818CW.

For the ListAgencyID 35820CW, the Category is Attribute (A) 35821CW, the Object Class is CodeListAgency 35822CW, the Property is Identification 35823CW, the Representation/Association is Identifier 35824CW, the Type is XSD 35825CW, the Type Name is Token 35826CW, and the Cardinality is zero or one 35828CW.

For the ListVersionID 35830CW, the Category is Attribute (A) 35831CW, the Object Class is CodeList 35832CW, the Property is Version 35833CW, the Representation/Association is Identifier 35834CW, the Type is XSD 35835CW, the Type Name is Token 35836CW, and the Cardinality is zero or one 35838CW.

For the ListAgency-SchemeID 35840CW, the Category is Attribute (A) 35841CW, the Object Class is CodeListAgency 35842CW, the Property is Scheme 35843CW, the Representation/Association is Identifier 35844CW, the Type is XSD 35845CW, the Type Name is Token 35846CW, and the Cardinality is zero or one 35848CW.

For the ListAgency-SchemeAgencyID 35850CW, the Category is Attribute (A) 35851CW, the Object Class is CodeListAgency 35852CW, the Property is SchemeAgency 35853CW, the Representation/Association is Identifier 35854CW, the Type is XSD 35855CW, the Type Name is Token 35856CW, and the Cardinality is zero or one 35858CW.

The data type GDT DataOriginTypeCode 35800CW may use the following codes: legacy data transfer (i.e., the data comes from the transfer of legacy data), address purchase (i.e., the data comes from the purchase of addresses).

A customer-specific code list is assigned to the code. A customer can determine the codes in the code list. The attributes of the code are assigned the following values: listID="10337," listAgencyID—ID of the Customer (ID from DE 3055, if listed there), listVersionID—version of the particular code list. Assigned and managed by the Customer, listAgencySchemeID—ID of the scheme if the listAgencyID does not come from DE 3055, and listAgencySchemeAgencyID—ID of the organization from DE 3055 that manages the listAgencySchemeID scheme.

The DataOriginTypeCode 35800CW can be used to display the origin of the data that is saved in a data processing system. Examples of the possible semantics of the codes are: Legacy data transfer where the data comes from the transfer of legacy data and Address purchase where the data comes from the purchase of addresses.

The following dictionary objects can be assigned to this GDT in mySAP systems: Data element: BU_SOURCE and Domain: BU_SOURCE.

(rrrrrrrrrrrr) DebitCreditCode

A GDT DebitCreditCode 35800CX is a coded representation of a credit or debit side of an account. An example of GDT DebitCreditCode 35800CX is:

<DebitCreditCode>1</DebitCreditCode>

The structure of GDT DebitCreditCode 35800CX is depicted in FIG. 358CX. For the GDT DebitCreditCode 35800CX, the Object Class is Debit Credit 35804CX, the Representation/Association is Code 35808CX, the Type is CCT 35810CX, the Type Name is Code 35812CX, and the Length is one 35814CX. The remark 35818CX shows that the GDT DebitCreditCode 35800CX may be restricted.

The data type GDT DebitCreditCode 35800CX may use the following codes: 1 (i.e., Debit), 2 (i.e., Credit). The DebitCreditCode 35800CX may be used for a G/L account posting, for example, to denote whether an amount is posted to the G/L account as a credit or a debit posting. The DebitCreditCode may be used for a G/L account posting, for example, to denote whether an amount is posted to the G/L account as a credit or a debit posting.

(sssssssssssss) DisabledPersonCertificateTypeCode

A GDT DisabledPersonCertificateTypeCode 35800CY is a code indicating the type of certificate relating to a person's disability. An example of GDT DisabledPersonCertificateTypeCode 35800CY is:

<DisabledPersonCertificateTypeCode>4</DisabledPersonCertificateTypeCode>

The structure of GDT DisabledPersonCertificateTypeCode 35800CY is depicted in FIG. 358CY. For the GDT DisabledPersonCertificateTypeCode 35800CY, the Object Class is DisabledPersonCertificate 35804CY, the Property is Type 35806CY, the Representation/Association is Code 35808CY, the Type is CCT 35810CY, the Type Name is Code 35812CY, and the Length is from one to two 35814CY. The remark 35818CY shows that the GDT DisabledPersonCertificateTypeCode 35800CY may be restricted.

The data type GDT DisabledPersonCertificateTypeCode 35800CY may use the following codes: 1 (i.e., this certificate is an ID for a severe disability or a letter documenting the recognized disability), 2 (i.e., this certificate is a letter documenting that the person is on a par with a disabled person), 3 (i.e., this certificate is a letter documenting that a disabled person can be calculated several times), 4 (i.e., this certificate is a letter documenting that the person is or has been a miner and has a disability). The DisabledPersonCertificateTypeCode 35800CY may be used in Personnel Administration to fulfill the employer's legal obligations with regard to the contributions for severely disabled persons, for example, in a country such as Germany.

The attributes of the code list are as follows: listID="10048", listAgencyID="310" and listVersionID—Version of the relevant code list. Assigned and managed by SAP AG.

(tttttttttttt) DisabledPersonStatisticExceptionReasonCode

A GDT DisabledPersonStatisticExceptionReasonCode 35800CZ is a code indicating the reason for an exception when entering the statistic data for a disabled person. An example of GDT DisabledPersonStatisticExceptionReasonCode 35800CZ is:

<DisabledPersonStatisticExceptionReasonCode>3</DisabledPersonStatisticExceptionReasonCode>

The structure of GDT DisabledPersonStatisticExceptionReasonCode 35800CZ is depicted in FIG. 358CZ. For the GDT DisabledPersonStatisticExceptionReasonCode 35800CZ, the Object Class is Disabled Person 35804CZ, the Property is Statistic Exception Reason 35806CZ, the Representation/Association is Code 35808CZ, the Type is CCT 35810CZ, the Type Name is Code 35812CZ, and the Length is from one to two 35814CZ. The remark 35818CZ shows that the GDT DisabledPersonStatisticExceptionReasonCode 35800CZ may be restricted.

The data type GDT DisabledPersonStatisticExceptionReasonCode 35800CZ may use the following codes: 1 (i.e., the employer, natural person, is excluded from the statistical data entry if the employer is severely disabled), 2 (i.e., disabled persons who participate in measures in the company for rehabilitation purposes are excluded from the statistical data entry), 3 (i.e., persons who can only work part-time for less than 18 hours due to their severe disability are excluded from the statistical data entry), 4 (i.e., persons who are severely disabled and are employed for re-familiarization purposes are excluded from the statistical data entry), 5 (i.e., persons who were selected after continual practice in their jobs are excluded from the statistical data entry), 6 (i.e., persons who are severely disabled and are entitled to a job are excluded from the statistical data entry), 7 (i.e., persons who are severely disabled and participate in job-creating measures are excluded from the statistical data entry), 8 (i.e., persons who are severely disabled and are in a work relationship that does not serve primarily as an acquisition but rather is motivated predominantly for charitable reasons are excluded from the statistical data entry), 9 (i.e., persons who are severely disabled and are in a work relationship that does not serve primarily as an acquisition but rather is motivated predominantly for religious reasons are excluded from the statistical data entry), 10 (i.e., persons who are severely disabled and are in a work relationship that lasts for a maximum of eight weeks and only if not employed marginally or for a short time) are excluded from the statistical data entry), 11 (i.e., severely disabled persons that are not relevant for the survey are excluded from the statistical data entry), 12 (i.e., severely disabled persons are excluded from the statistical data entry if their part-time job may be attributed as a work center and position reserved for severely disabled persons), 13 (i.e., severely disabled persons are excluded from the statistical data entry if their work relationship is suspended due to military or non-military service, parental leave, or unpaid leave, or due to drawing a temporary annuity or during semi-retirement in the release phase, provided that a replacement employee is hired for them), 14 (i.e., severely disabled persons whose work relationship is defined in Creation of Employment Opportunities of the Federal Social Security Act, BSHG, are excluded from the statistical data entry), 15 (i.e., severely disabled persons are excluded from the statistical data entry if they have a short-term work relationship for which a position reserved for severely disabled persons is specified).

There are exception rules that apply for certain person groups when creating statistics. For example, severely disabled employees, who are only allowed to work part-time (less than 18 hours/week) due to their disability, are processed differently for statutory statistical purposes. The DisabledPersonStatisticExceptionReasonCode 35800CZ can be used to describe these exceptions.

(uuuuuuuuuuuuu) DisabledPersonWorkCapabilityLimitationCode

A GDT DisabledPersonWorkCapabilityLimitationCode 35800DA is a coded representation of the limitation of a disabled person's work capability. An example of GDT DisabledPersonWorkCapabilityLimitationCode 35800DA is:

<DisabledPersonWorkCapabilityLimitationCode listID=4711 listAgencyID=310>1</DisabledPersonWorkCapabilityLimitationCode>

The structure of GDT DisabledPersonWorkCapabilityLimitationCode 35800DA is depicted in FIG. 358DA. For the GDT DisabledPersonWorkCapabilityLimitationCode 35800DA, the Object Class is Disabled Person 35801DA, the Property is Work Capability Limitation 35803DA, the Representation/Association is Code 35804DA, the Type is CCT 35805DA, the Type Name is Code 35806DA, and the Length is from one to two 35807DA. The remark 35809DA shows that the GDT DisabledPersonWorkCapabilityLimitationCode 35800DA may be restricted.

For the ListID 35810DA, the Category is Attribute (A) 35811DA, the Object Class is CodeList 35812DA, the Property is Identification 35813DA, the Representation/Association is Identifier 35814DA, the Type is XSD 35815DA, the Type Name is Token 35816DA, and the Cardinality is zero or one 35818DA.

For the ListAgencyID 35820DA, the Category is Attribute (A) 35821DA, the Object Class is CodeListAgency 35822DA, the Property is Identification 35823DA, the Representation/Association is Identifier 35824DA, the Type is XSD 35825DA, the Type Name is Token 35826DA, and the Cardinality is zero or one 35828DA.

For the ListVersionID 35830DA, the Category is Attribute (A) 35831DA, the Object Class is CodeList 35832DA, the Property is Version 35833DA, the Representation/Association is Identifier 35834DA, the Type is XSD 35835DA, the Type Name is Token 35836DA, and the Cardinality is zero or one 35838DA.

For the ListAgency-SchemeID 35840DA, the Category is Attribute (A) 35841DA, the Object Class is CodeListAgency 35842DA, the Property is Scheme 35843DA, the Representation/Association is Identifier 35844DA, the Type is XSD 35845DA, the Type Name is Token 35846DA, and the Cardinality is zero or one 35848DA.

For the ListAgency-SchemeAgencyID 35850DA, the Category is Attribute (A) 35851DA, the Object Class is CodeListAgency 35852DA, the Property is SchemeAgency 35853DA, the Representation/Association is Identifier 35854DA, the Type is XSD 35855DA, the Type Name is Token 35856DA, and the Cardinality is zero or one 35858DA.

The data type GDT DisabledPersonWorkCapabilityLimitationCode 35800DA may use the following codes: 1 (i.e., the person's work capability is not limited), 2 (i.e., the person's work capability is not limited), 3 (i.e., the person can only work in a seated position).

(vvvvvvvvvvvvv) DisagioDeductionEventTypeCode

A GDT DisagioDeductionEventTypeCode 35800DB is a coded representation of a group of house banks based on the viewpoint of a similar determination of accounts in accounting. For example, the entities may be. An example of GDT DisagioDeductionEventTypeCode 35800DB is:

<DisagioDeductionEventTypeCode>1</DisagioDeductionEventTypeCode>

The structure of GDT DisagioDeductionEventTypeCode 35800DB is depicted in FIG. 358DB. For the GDT DisagioDeductionEventTypeCode 35800DB, the Object Class is Disagio 35804DB, the Property is Deduction Event Type 35806DB, the Representation/Association is Code 35808DB, the Type is CCT 35810DB, the Type Name is Code 35812DB, and the Length is from one to two 35814DB. The remark 35818DB shows that the GDT DisagioDeductionEventTypeCode 35800DB may be restricted.

The data type GDT DisagioDeductionEventTypeCode 35800DB may use the following codes: 1 (i.e., the disagio deduction is made with the first partial disbursement of a loan), 2 (i.e., the disagio deduction is made proportionally for each partial disbursement of a loan), 3 (i.e., the disagio deduction is made with the last partial disbursement of a loan). The DisagioDeductionEventTypeCode may be used in the context of loan contracts.

The DisagioDeductionEventTypeCode uses an SAP proprietary code list with predefined values. In the SAP ERP system the DisagioDeductionTypeCode is based on the data element SDISEIN in the software component EA-FINSERV.

(wwwwwwwwwwwww) DisagioPercent

A GDT DisagioPercent 35800DC is a percentage amount by which the exchange rate of a security or loan commitment capital, or the parity of a currency lies below the nominal value. An example of GDT DisagioPercent 35800DC is:

<DisagioPercent>2.5</DisagioPercent>

The structure of GDT DisagioPercent 35800DC is depicted in FIG. 358DC. For the GDT DisagioPercent 35800DC, the Category is Element (E) 35802DC, the Object Class is Disagio 35804DC, the Representation/Association is Percent 35808DC, the Type is GDT 35810DC, the Type Name is Percent 35812DC, and the Length is a maximum of three digits with three places after the decimal point 35814DC. The remark 35818DC shows that the GDT DisagioPercent 35800DC may be restricted.

The DisagioPercent 35800DC is stated as a positive percentage. The DisagioPercent 35800DC may be used to calculate either the disbursement obligation for a loan granted or the exchange rate of a security.

(xxxxxxxxxxxxx) DistributionChannelCode

A GDT DistributionChannelCode 35800DD is a coded representation of a distribution channel. For example, a distribution channel may be a channel via which goods or services reach the customer. An example of GDT DistributionChannelCode 35800DD is:

<DistributionChannelCode>1</DistributionChannelCode>

The structure of GDT DistributionChannelCode 35800DD is depicted in FIG. 358DD. For the GDT DistributionChannelCode 35800DD, the Object Class is Distribution Channel 35801DD, the Representation/Association is Code 35804DD, the Type is CCT 35805DD, the Type Name is Code 35806DD, and the Length is from one to two 35807DD. The remark 35809DD shows that the GDT DistributionChannelCode 35800DD may be restricted.

For the ListID 35810DD, the Category is Attribute (A) 35811DD, the Object Class is CodeList 35812DD, the Property is Identification 35813DD, the Representation/Association is Identifier 35814DD, the Type is XSD 35815DD, the Type Name is Token 35816DD, and the Cardinality is zero or one 35818DD.

For the ListAgencyID 35820DD, the Category is Attribute (A) 35821DD, the Object Class is CodeListAgency 35822DD, the Property is Identification 35823DD, the Representation/Association is Identifier 35824DD, the Type is XSD 35825DD, the Type Name is Token 35826DD, and the Cardinality is zero or one 35828DD.

For the ListVersionID 35830DD, the Category is Attribute (A) 3583 IDD, the Object Class is CodeList 35832DD, the Property is Version 35833DD, the Representation/Association is Identifier 35834DD, the Type is XSD 35835DD, the Type Name is Token 35836DD, and the Cardinality is zero or one 35838DD.

For the ListAgency-SchemeID 35840DD, the Category is Attribute (A) 35841DD, the Object Class is CodeListAgency 35842DD, the Property is Scheme 35843DD, the Representation/Association is Identifier 35844DD, the Type is XSD 35845DD, the Type Name is Token 35846DD, and the Cardinality is zero or one 35848DD.

For the ListAgency-SchemeAgencyID 35850DD, the Category is Attribute (A) 35851DD, the Object Class is CodeListAgency 35852DD, the Property is SchemeAgency 35853DD, the Representation/Association is Identifier 35854DD, the Type is XSD 35855DD, the Type Name is Token 35856DD, and the Cardinality is zero or one 35858DD.

The data type GDT DistributionChannelCode 35800DD may use the following codes: Retail Sales (i.e., goods or services reach the customer via the distribution channel "Retail Sales"), Direct Sales (i.e., goods or services reach the customer via the distribution channel "Direct Sales"), Internet Sales (i.e., goods or services reach the customer via the distribution channel "Internet Sales").

(yyyyyyyyyyyyy) DivisionCode

A GDT DivisionCode 35800DE is a coded representation of a division. For example, a division may define the responsibility for sales or profits for salable materials or services. An organizational unit may have a division; however, a division is not an organizational unit. An example of GDT DivisionCode 35800DE is:

<DivisionCode>1</DivisionCode>

The structure of GDT DivisionCode 35800DE is depicted in FIG. 358DE. For the GDT DivisionCode 35800DE, the Object Class is Division 35801DE, the Representation/Association is Code 35804DE, the Type is CCT 35805DE, the Type Name is Code 35806DE, and the Length is from one to two 35807DE. The remark 35809DE shows that the GDT DivisionCode 35800DE may be restricted.

For the ListID 35810DE, the Category is Attribute (A) 35811DE, the Object Class is CodeList 35812DE, the Property is Identification 35813DE, the Representation/Association is Identifier 35814DE, the Type is XSD 35815DE, the Type Name is Token 35816DE, and the Cardinality is zero or one 35818DE.

For the ListAgencyID 35820DE, the Category is Attribute (A) 35821DE, the Object Class is CodeListAgency 35822DE, the Property is Identification 35823DE, the Representation/Association is Identifier 35824DE, the Type is XSD 35825DE, the Type Name is Token 35826DE, and the Cardinality is zero or one 35828DE.

For the ListVersionID 35830DE, the Category is Attribute (A) 35831DE, the Object Class is CodeList 35832DE, the Property is Version 35833DE, the Representation/Association is Identifier 35834DE, the Type is XSD 35835DE, the Type Name is Token 35836DE, and the Cardinality is zero or one 35838DE.

For the ListAgency-SchemeID 35840DE, the Category is Attribute (A) 35841DE, the Object Class is CodeListAgency 35842DE, the Property is Scheme 35843DE, the Representation/Association is Identifier 35844DE, the Type is XSD 35845DE, the Type Name is Token 35846DE, and the Cardinality is zero or one 35848DE.

For the ListAgency-SchemeAgencyID 35850DE, the Category is Attribute (A) 35851DE, the Object Class is CodeListAgency 35852DE, the Property is SchemeAgency 35853DE, the Representation/Association is Identifier 35854DE, the Type is XSD 35855DE, the Type Name is Token 35856DE, and the Cardinality is zero or one 35858DE.

The data type GDT DivisionCode 35800DE may use the following codes: cars (i.e., division for the sale of cars), trucks (i.e., division for the sale of trucks), buses (i.e., division for the sale of buses). A customer-specific code list is assigned to the DivisionCode. A customer defines the codes in the code list.

The attributes of DivisionCode can be assigned the following values: listID="10114," listAgencyID—ID of the Customer (ID from DE 3055 if listed there), listVersionID—Assigned and managed by the Customer, listAgencySchemeID—ID of the scheme if the listAgencyID is not taken from DE 3055, and listAgencySchemeAgencyID—ID of the organization (taken from DE 3055) that manages the scheme of the listAgencySchemeID.

(zzzzzzzzzzzzz) DueCategoryCode

A GDT DueCategoryCode 35800DF is a coded representation of the category (receivable or payable) of an item due for payment. An example of GDT DueCategoryCode 35800DF is:

<DueCategoryCode>1</DueCategoryCode>

The structure of GDT DueCategoryCode 35800DF is depicted in FIG. 358DF. For the GDT DueCategoryCode 35800DF, the Object Class is Due 35804DF, the Property is Category 35806DF, the Representation/Association is Code 35808DF, the Type is CCT 35810DF, the Type Name is Code 35812DF, and the Length is one 35814DF. The remark 35818DF shows that the GDT DueCategoryCode 35800DF may be restricted.

The data type GDT DueCategoryCode 35800DF may use the following codes: 1 (i.e., a payable is debts incurred either as a result of a service claimed or a down payment or an incoming payment), 2 (i.e., a receivable is the claim to payment for a service provided). The DueCategoryCode 35800DF can be used in DueItemManagement to differentiate an item due for payment by receivables and payables.

(aaaaaaaaaaaaaa) DurationValueRecurrence

A GDT DurationValueRecurrence 35800DG is a representation for a number of recurrences within a time frame. For example, two recurrences in one month or eight recurrences in 50 days. An example of GDT DurationValueRecurrence 35800DG is:

```
<DurationValueRecurrence>
    <Duration>P7D</Duration>
    <Value>1</Value>
</DurationValueRecurrence>
```

The structure of GDT DurationValueRecurrence 35800DG is depicted in FIG. 358DG. For the GDT DurationValueRecurrence 35800DG, the Object Class is DurationValueRecurrence 35801DG, and the Representation/Association is Details 35804DG.

For the Duration 35810DG, the Object Class is DurationValueRecurrence 35812DG, the Property is Duration 35813DG, the Representation/Association is Duration 35814DG, the Type is GDT 35815DG, the Type Name is Duration 35816DG, and the Cardinality is one 35818DG.

For the Value 35820DG, the Object Class is DurationValueRecurrence 35822DG, the Property is Value 35823DG, the Representation/Association is Value 35824DG, the Type is GDT 35825DG, the Type Name is Integer Value 35826DG, the Length is from one to three 35827DG, and the Cardinality is one 35828DG.

The Duration 35810DG indicates the time frame within which the specified number of recurrences takes place. The Value 35820DG is the number of recurrences (in terms of the time frame).

(bbbbbbbbbbbbbb) EffectiveYieldCalculationMethodCode

A GDT EffectiveYieldCalculationMethodCode 35800DH is a coded representation of the method for calculating the effective interest rate. For example, the effective interest rate indicates the actual profitability of a capital investment or the actual costs of a loan. In addition to the nominal interest rate, other factors such as disagio, fees, and repayment type, are used to calculate the effective interest rate. An example of GDT EffectiveYieldCalculationMethodCode 35800DH is:

<EffectiveYieldCalculationMethodCode>1</EffectiveYieldCalculationMethodCode

The structure of GDT EffectiveYieldCalculationMethodCode 35800DH is depicted in FIG. 358DH. For the GDT EffectiveYieldCalculationMethodCode 35800DH, the Object Class is Effective Yield 35804DH, the Property is Calculation Method 35806DH, the Representation/Association is Code 35808DH, the Type is CCT 35810DH, the Type Name is Code 35812DH, and the Length is from one to two 35814DH.

The data type GDT EffectiveYieldCalculationMethodCode 35800DH may use the following codes: 1 (i.e., effective interest rate calculation according to price regulations, PAngV), 2 (i.e., effective interest rate calculation according to AIBD/ISMA), 3 (i.e., effective interest rate calculation according to Braess), 4 (i.e., effective interest rate calculation according to Moosmüller), 5 (i.e., effective interest rate calculation according to US American method), 6 (i.e., effective interest rate calculation on current daily basis, EU Act/365), 8 (i.e., effective interest rate calculation on monthly basis, EU 30.42/365), 9 (i.e., linear effective interest rate calculation).

(cccccccccccccc) EmployeeTimeAccountLineItemTypeCode

A GDT EmployeeTimeAccountLineItemTypeCode 35800DI is a coded representation of the type of a line item of an employee time account according to criteria resulting from laws, agreements, company requirements, control tasks, etc. For example, the line item may contain a quantitative change of an employee time account on a certain date. A line item may be characterized by a type. An example of GDT EmployeeTimeAccountLineItemTypeCode 35800DI is:

<EmployeeTimeAccountLineItemTypeCode>1</EmployeeTimeAccountLineItemTypeCode>

The structure of GDT EmployeeTimeAccountLineItemTypeCode 35800DI is depicted in FIG. 358DI. For the GDT EmployeeTimeAccountLineItemTypeCode 35800DI, the Object Class is EmployeeTimeAccountLineItem 35801DI, the Property is Type 35803DI, the Representation/Association is Code 35804DI, the Type is CCT 35805DI, the Type Name is Code 35806DI, and the Length is from one to six 35807DI. The remark 35809DI shows that the GDT EmployeeTimeAccountLineItemTypeCode 35800DI may be restricted.

For the ListID 35810DI, the Category is Attribute (A) 35811DI, the Object Class is CodeList 35812DI, the Property is Identification 35813DI, the Representation/Association is Identifier 35814DI, the Type is XSD 35815DI, the Type Name is Token 35816DI, the Length is from one to sixty 35817DI, and the Cardinality is zero or one 35818DI.

For the ListAgencyID 35820DI, the Category is Attribute (A) 35821DI, the Object Class is CodeListAgency 35822DI, the Property is Identification 35823DI, the Representation/Association is Identifier 35824DI, the Type is XSD 35825DI, the Type Name is Token 35826DI, the Length is from one to sixty 35827DI, and the Cardinality is zero or one 35828DI.

For the ListVersionID 35830DI, the Category is Attribute (A) 35831DI, the Object Class is CodeList 35832DI, the Property is Version 35833DI, the Representation/Association is Identifier 35834DI, the Type is XSD 35835DI, the Type Name is Token 35836DI, the Length is from one to fifteen 35837DI, and the Cardinality is zero or one 35838DI.

For the ListAgency-SchemeID 35840DI, the Category is Attribute (A) 35841 DI, the Object Class is CodeListAgency 35842DI, the Property is Scheme 35843DI, the Representation/Association is Identifier 35844DI, the Type is XSD 35845DI, the Type Name is Token 35846DI, the Length is from one to sixty 35847DI, and the Cardinality is zero or one 35848DI.

For the ListAgency-SchemeAgencyID 35850DI, the Category is Attribute (A) 35851DI, the Object Class is CodeListAgency 35852DI, the Property is SchemeAgency 35853DI, the Representation/Association is Identifier 35854DI, the Type is XSD 35855DI, the Type Name is Token 35856DI, the Length is from one to three 35857DI, and the Cardinality is zero or one 35858DI.

The data type GDT EmployeeTimeAccountLineItemTypeCode 35800DI may use the following codes: deduction (i.e., the type of an employee time account line item that reduces the balance of the account, such as, a vacation), entitlement (i.e., the type of an employee time account line item that increased the balance of the account, such as, the yearly entitlement for vacations). The EmployeeTimeAccountLineItemTypeCode 35800DI can be used for capturing the semantic meaning of the line item in the employee time account. This type code defines the business usage of the corresponding data of the line item for other applications as well. For example, this data may be further used for reporting purposes or for additional business processes like the payroll process.

(dddddddddddddd) EmployeeTimeAccountTypeCode

A GDT EmployeeTimeAccountTypeCode 35800DJ is a coded representation of the type of an employee time account according to criteria resulting from laws, agreements, company requirements, control tasks, etc. For example, an employee time account may be a summary of valuation results. The valuation results may be recorded in employee time accounts in the form of line items. An example of GDT EmployeeTimeAccountTypeCode 35800DJ is:

<EmployeeTimeAccountTypeCode>1</EmployeeTimeAccountTypeCode>

The structure of GDT EmployeeTimeAccountTypeCode 35800DJ is depicted in FIG. 358DJ. For the GDT EmployeeTimeAccountTypeCode 35800DJ, the Object Class is EmployeeTimeAccount 35801DJ, the Property is Type 35803DJ, the Representation/Association is Code 35804DJ, the Type is CCT 35805DJ, the Type Name is Code 35806DJ, and the Length is from one to six 35807DJ. The remark 35809DJ shows that the GDT EmployeeTimeAccountTypeCode 35800DJ may be restricted.

For the ListID 35810DJ, the Category is Attribute (A) 35811DJ, the Object Class is CodeList 35812DJ, the Property is Identification 35813DJ, the Representation/Association is Identifier 35814DJ, the Type is XSD 35815DJ, the Type Name is Token 35816DJ, the Length is from one to sixty 35817DJ, and the Cardinality is zero or one 35818DJ.

For the ListAgencyID 35820DJ, the Category is Attribute (A) 35821DJ, the Object Class is CodeListAgency 35822DJ, the Property is Identification 35823DJ, the Representation/Association is Identifier 35824DJ, the Type is XSD 35825DJ, the Type Name is Token 35826DJ, the Length is from one to sixty 35827DJ, and the Cardinality is zero or one 35828DJ.

For the ListVersionID 35830DJ, the Category is Attribute (A) 35831DJ, the Object Class is CodeList 35832DJ, the Property is Version 35833DJ, the Representation/Association is Identifier 35834DJ, the Type is XSD 35835DJ, the Type Name is Token 35836DJ, the Length is from one to fifteen 35837DJ, and the Cardinality is zero or one 35838DJ.

For the ListAgency-SchemeID 35840DJ, the Category is Attribute (A) 35841DJ, the Object Class is CodeListAgency 35842DJ, the Property is Scheme 35843DJ, the Representation/Association is Identifier 35844DJ, the Type is XSD 35845DJ, the Type Name is Token 35846DJ, the Length is from one to sixty 35847DJ, and the Cardinality is zero or one 35848DJ.

For the ListAgency-SchemeAgencyID 35850DJ, the Category is Attribute (A) 35851DJ, the Object Class is CodeListAgency 35852DJ, the Property is SchemeAgency 35853DJ, the Representation/Association is Identifier 35854DJ, the Type is XSD 35855DJ, the Type Name is Token 35856DJ, the Length is from one to three 35857DJ, and the Cardinality is zero or one 35858DJ.

The data type GDT EmployeeTimeAccountTypeCode 35800DJ may use the following codes: paid vacation account (i.e., the type of an employee time account that holds vacations the employee is paid for), overtime account (i.e., the type of an employee time account that holds working times exceeding the normal working time of an employee), sick leave account (i.e., the type of an employee time account that holds absences caused by illness).

A customer-specific code list is assigned to the code. A customer can determine the codes in the code list. The attributes of the code are assigned the following values: listID="10342," listAgencyID—ID of the Customer (ID from DE 3055, if listed there), listVersionID—version of the particular code list. Assigned and managed by the Customer, listAgencySchemeID—ID of the scheme if the listAgencyID does not come from DE 3055 and listAgencySchemeAgencyID—ID of the organization from DE 3055 that manages the listAgencySchemeID scheme.

(eeeeeeeeeeeeee) EnterpriseMealsReimbursementExpenseReporterGroupCode

A GDT EnterpriseMealsReimbursementExpenseReporterGroupCode 35800DK is a coded representation of a group of expense reporters to whom the same company provisions apply regarding reimbursement of expenses for meals. An example of GDT EnterpriseMealsReimbursementExpenseReporterGroupCode 35800DK is:

<EnterpriseMealsReimbursementExpenseReporterGroupCode>1</EnterpriseMealsReimbursementExpenseReporterGroupCode>

The structure of GDT EnterpriseMealsReimbursementExpenseReporterGroupCode 35800DK is depicted in FIG. 358DK. For the GDT EnterpriseMealsReimbursementExpenseReporterGroupCode 35800DK, the Property is Enterprise_MealsReimbursement_ExpenseReporterGroup 35806DK, the Representation/Association is Code 35808DK, the Type is CCT 35810DK, the Type Name is Code 35812DK, and the Length is from one to two 35814DK. The remark 35818DK shows that the GDT EnterpriseMealsReimbursementExpenseReporterGroupCode 35800DK may be restricted.

The data type GDT EnterpriseMealsReimbursementExpenseReporterGroupCode 35800DK may use the following codes: frequent traveler (i.e., business travelers who travel an average of 10 days per month or more), occasional travelers (i.e., business travelers who travel an average of less than 10 days per month). For EnterpriseMealsReimbursementExpenseReporterGroupCode 35800DK there is a corresponding StatutoryMealsReimbursementExpenseReporterGroupCode as a coded representation of a group of expense reporters to whom the same statutory or agreement-based provisions apply regarding reimbursement of expenses for meals.

The attributes of the code are assigned the following values: listID="10344," listAgencyID—ID of the Customer (ID from DE 3055, if listed there), listVersionID—version of the particular code list. Assigned and managed by the Customer, listAgencySchemeID—ID of the scheme if the listAgencyID does not come from DE 3055, and listAgencySchemeAgencyID—ID of the organization from DE 3055 that manages the listAgencySchemeID scheme.

(ffffffffffffff) EnterpriseMileageReimbursementExpenseReporterGroupCode

A GDT EnterpriseMileageReimbursementExpenseReporterGroupCode 35800DL is a coded representation of a group of expense reporters to whom the same company provisions apply regarding reimbursement of travel costs. For example, the entities may be. An example of GDT EnterpriseMileageReimbursementExpenseReporterGroupCode 35800DL is:

<EnterpriseMileageReimbursementExpenseReporterGroupCode>1</EnterpriseMileageReimbursementExpenseReporterGroupCode>

The structure of GDT EnterpriseMileageReimbursementExpenseReporterGroupCode 35800DL is depicted in FIG. 358DL. For the GDT EnterpriseMileageReimbursementExpenseReporterGroupCode 35800DL, the Property is Enterprise_MileageReimbursement_ExpenseReporterGroup 35806DL, the Representation/Association is Code 35808DL, the Type is CCT 35810DL, the Type Name is Code 35812DL, and the Length is from one to two 35814DL. The remark 35818DL shows that the GDT EnterpriseMileageReimbursementExpenseReporterGroupCode 35800DL may be restricted.

The data type GDT EnterpriseMileageReimbursementExpenseReporterGroupCode 35800DL may use the following codes: office employees with private car (i.e., employees who are mainly office-based and use a private car), field employees with private car (i.e., employees who work mainly in the field and use a private car). For EnterpriseMileageReimbursementExpenseReporterGroupCode 35800DL there is a corresponding StatutoryMileageReimbursementExpenseReporterGroupCode as a coded representation of a group of expense reporters to whom the same statutory or agreement-based provisions apply regarding reimbursement of expenses for travel costs.

The attributes of the code are assigned the following values: listID="10344," listAgencyID—ID of the Customer (ID from DE 3055, if listed there), listVersionID—version of the particular code list. Assigned and managed by the Customer, listAgencySchemeID—ID of the scheme if the listAgencyID does not come from DE 3055, and listAgencySchemeAgencyID—ID of the organization from DE 3055 that manages the listAgencySchemeID scheme.

(gggggggggggggg) ExpenseClassificationFunctionalAreaCode

A GDT ExpenseClassificationFunctionalAreaCode 35800DM is a coded representation of a functional area to which costs can be assigned in the profit and loss statements using cost of sales accounting ("classification of expenses by function"). For example, a functional area may correspond to a subtask involved in achieving the company goal, such as procurement, production, administration, or marketing, and does not represent an organizational unit. An example of GDT ExpenseClassificationFunctionalAreaCode 35800DM is:

<ExpenseClassificationFunctionalAreaCode>PROD </ExpenseClassificationFunctionalAreaCode>

The structure of GDT ExpenseClassificationFunctionalAreaCode 35800DM is depicted in FIG. 358DM. For the GDT ExpenseClassificationFunctionalAreaCode 35800DM, the Property is ExpenseClassification_Functional Area 35803DM, the Representation/Association is Code 35804DM, the Type is CCT 35805DM, the Type Name is Code 35806DM, and the Length is from one to four 35807DM. The remark 35809DM shows that the GDT ExpenseClassificationFunctionalAreaCode 35800DM may be restricted.

For the ListAgencyID 35810DM, the Category is Attribute (A) 35811DM, the Object Class is CodeListAgency 35812DM, the Property is Identification 35813DM, the Representation/Association is Identifier 35814DM, the Type is XSD 35815DM, the Type Name is Token 35816DM, and the Cardinality is zero or one 35818DM.

For the ListVersionID 35820DM, the Category is Attribute (A) 35821DM, the Object Class is CodeList 35822DM, the Property is Version 35823DM, the Representation/Association is Identifier 35824DM, the Type is XSD 35825DM, the Type Name is Token 35826DM, and the Cardinality is zero or one 35828DM.

For the ListAgency-SchemeID 35830DM, the Category is Attribute (A) 35831DM, the Object Class is CodeListAgency 35832DM, the Property is Scheme 35833DM, the Representation/Association is Identifier 35834DM, the Type is XSD 35835DM, the Type Name is Token 35836DM, and the Cardinality is zero or one 35838DM.

For the ListAgency-SchemeAgencyID 35840DM, the Category is Attribute (A) 35841DM, the Object Class is CodeListAgency 35842DM, the Property is SchemeAgency 35843DM, the Representation/Association is Identifier 35844DM, the Type is XSD 35845DM, the Type Name is Token 35846DM, and the Cardinality is zero or one 35848DM.

The data type GDT ExpenseClassificationFunctionalAreaCode 35800DM may use the following codes: 1 (i.e., production costs of the activities performed to obtain the sales revenue), 2 (i.e., sales costs), 3 (i.e., general administration costs).

The data type GDT ExpenseClassificationFunctionalAreaCode 35800DM is an extendable SAP code list. Customers can change this code list. In its unchanged state, the SAP code list has the following attributes: listID="10074," listAgencyID="310," and listVersionID=Version of the relevant code list. Assigned and managed by SAP AG.

If A customer makes changes to the SAP code list, the values of the attributes are changed as follows: listAgencyID—ID of the Customer (ID from DE 3055 if listed there), listVersionID—Assigned and managed by Customer, listAgencySchemeID—ID of the scheme if the listAgencyID is not taken from DE 3055, and listAgencySchemeAgencyID—ID of the organization (taken from DE 3055) that managed the scheme of the listAgencySchemeID (hhhhhhhhhhhhhh) ExpenseReportActivityStayTypeCode A GDT ExpenseReportActivityStayTypeCode 35800DN is a coded representation of an activity-specific stay type within an expense report. For example, an activity-specific stay type may be a classification within an expense report of stays for a business trip based on the tasks for which the expense reporter submits an expense report. An example of GDT ExpenseReportActivityStayTypeCode 35800DN is:

<ExpenseReportActivityStayTypeCode>1</ExpenseReportActivityStayTypeCode>

The structure of GDT ExpenseReportActivityStayTypeCode 35800DN is depicted in FIG. 358DN. For the GDT ExpenseReportActivityStayTypeCode 35800DN, the Object Class is ExpenseReportActivity_StayType 35804DN, the Representation/Association is Code 35808DN, the Type is CCT 35810DN, the Type Name is Code 35812DN, and the Length is from one to two 35814DN. The remark 35818DN shows that the GDT ExpenseReportActivityStayTypeCode 35800DN may be restricted.

The data type GDT ExpenseReportActivityStayTypeCode 35800DN may use the following codes: customer visit (i.e., visiting a customer), seminar visit (i.e., attending a seminar), trade show visit (i.e., attending a trade show).

A customer-specific code list is assigned to the code. A customer can determine the codes in the code list. The attributes of the code are assigned the following values: listID="10346," listAgencyID—ID of the Customer (ID from DE 3055, if listed there), listVersionID—version of the particular code list. Assigned and managed by the Customer, listAgencySchemeID—ID of the scheme if the listAgencyID does not come from DE 3055, and listAgencySchemeAgencyID—ID of the organization from DE 3055 that manages the listAgencySchemeID scheme.

(iiiiiiiiiiiii) ExpenseReportEnterpriseStayTypeCode

A GDT ExpenseReportEnterpriseStayTypeCode 35800DO is a coded representation of an enterprise-specific stay type within an expense report. For example, an enterprise-specific stay type may classify within an expense report the stays for a business trip based on criteria that can be defined individually by the company. An example of GDT ExpenseReportEnterpriseStayTypeCode 35800DO is:

<ExpenseReportEnterpriseStayTypeCode>1</ExpenseReportEnterpriseStayTypeCode>

The structure of GDT ExpenseReportEnterpriseStayTypeCode 35800DO is depicted in FIG. 358DO. For the GDT ExpenseReportEnterpriseStayTypeCode 35800DO, the Object Class is Expense Report Enterprise_Stay Type 35804DO, the Representation/Association is Code 35808DO, the Type is CCT 35810DO, the Type Name is Code 35812DO, and the Length is from one to two 35814DO. The remark 35818DO shows that the GDT ExpenseReportEnterpriseStayTypeCode 35800DO may be restricted.

The data type GDT ExpenseReportEnterpriseStayTypeCode 35800DO may use the following codes: stay onsite (i.e., trip between sites), stay at a location greater than 100 km from the site, stay at a location 50 to 100 km from the site, stay at a location less than 50 km from the site.

The attributes of the code are assigned the following values: listID="10347," listAgencyID—ID of the Customer (ID from DE 3055, if listed there), listVersionID—version of the particular code list. Assigned and managed by the Customer, listAgencySchemeID—ID of the scheme if the listAgencyID does not come from DE 3055 and listAgencySchemeAgencyID—ID of the organization from DE 3055 that manages the listAgencySchemeID scheme.

(jjjjjjjjjjjjj) ExpenseReportExpenseCategoryCode

A GDT ExpenseReportExpenseCategoryCode 35800DP is a coded representation of an expense category within an expense report. For example, an expense category may be a collection of expense types based on commonalties in the settlement procedure, dialog behavior, or statistical evaluation. An example of GDT ExpenseReportExpenseCategoryCode 35800DP is:

<ExpenseReportExpenseCategoryCode>2</ExpenseReportExpenseCategoryCode>

The structure of GDT ExpenseReportExpenseCategoryCode 35800DP is depicted in FIG. 358DP. For the GDT ExpenseReportExpenseCategoryCode 35800DP, the Object Class is ExpenseReportExpense 35804DP, the Property is Category 35806DP, the Representation/Association is Code 35808DP, the Type is CCT 35810DP, the Type Name is Code 35812DP, and the Length is one 35814DP. The remark 35818DP shows that the GDT ExpenseReportExpenseCategoryCode 35800DP may be restricted.

The data type GDT ExpenseReportExpenseCategoryCode 35800DP may use the following codes: 1 (i.e., accommodations receipts), 2 (i.e., meals receipts), 3 (i.e., travel costs receipts), 4 (i.e., other receipts), 5 (i.e., meals receipts whose daily total is compared against a maximum rate).

The value range of the ExpenseReportExpenseCategoryCode is an SAP code list with fixed, predefined values. The values are listed in the Appendix. The attributes of the CCT Code are filled implicitly with the following values: listID="0083," listAgencyID="310," and listVersionID—Version of the code list. Assigned and administered by SAP AG.

(kkkkkkkkkkkkk) ExpenseReportExpenseTypeCode

A GDT ExpenseReportExpenseTypeCode 35800DQ is a coded representation of an expense type within an expense report. For example, an expense type may be a classification of the expenses of an expense reporter based on commonalities in the settlement procedure, dialog behavior, payment behavior, posting behavior, or statistical evaluation. An example of GDT ExpenseReportExpenseTypeCode 35800DQ is:

<ExpenseReportExpenseTypeCode>HOTL</ExpenseReportExpenseTypeCode>

The structure of GDT ExpenseReportExpenseTypeCode 35800DQ is depicted in FIG. 358DQ. For the GDT ExpenseReportExpenseTypeCode 35800DQ, the Object Class is ExpenseReportExpense 35804DQ, the Property is Type 35806DQ, the Representation/Association is Code 35808DQ, the Type is CCT 35810DQ, the Type Name is Code 35812DQ, and the Length is from one to four 35814DQ. The remark 35818DQ shows that the GDT ExpenseReportExpenseTypeCode 35800DQ may be restricted.

The data type GDT ExpenseReportExpenseTypeCode 35800DQ may use the following codes: train (i.e., train ticket), gasoline (i.e., gasoline receipt), entertainment (i.e., entertainment receipt), flight (i.e., airline receipt), hotel (i.e., hotel receipt), rental car (i.e., rental car receipt), parking fee, postage, private share to be paid back to the company, other (i.e., other receipt), taxi (i.e., taxi receipt), telephone (i.e., telephone receipt), tip, toll sticker, visa.

The attributes of the code are assigned the following values: listID="10348," listAgencyID—ID of the Customer (ID from DE 3055, if listed there), listVersionID—version of the particular code list. Assigned and managed by the Customer, listAgencySchemeID—ID of the scheme if the listAgencyID does not come from DE 3055, and listAgencySchemeAgencyID—ID of the organization from DE 3055 that manages the listAgencySchemeID scheme.

(lllllllllllll) ExpenseReportID

A GDT ExpenseReportID 35800DR is an identifier for an expense report of an expense reporter. An example of GDT ExpenseReportID 35800DR is:

<ExpenseReportID>8021963</ExpenseReportID>

The structure of GDT ExpenseReportID 35800DR is depicted in FIG. 358DR. For the GDT ExpenseReportID 35800DR, the Object Class is ExpenseReport 35804DR, the Property is Identification 35806DR, the Representation/Association is Identifier 35808DR, the Type is CCT 35810DR, the Type Name is Identifier 35812DR, and the Length is from one to ten 35814DR. The remark 35818DR shows that the GDT ExpenseReportID 35800DR may be restricted. An ExpenseReportID 35800DR may be represented as a 10-digit number.

(mmmmmmmmmmmmm) ExpenseReportItinerarySegmentID

A GDT ExpenseReportItinerarySegmentID 35800DS is a unique identifier for a segment of an itinerary within an expense report. For example, a segment of an itinerary may specify the arrival time at a destination, or another time relevant to settlement, within a business trip of an expense reporter. An example of GDT ExpenseReportItinerarySegmentID 35800DS is:

<ExpenseReportItinerarySegmentID>1</ExpenseReportItinerarySegmentID>

The structure of GDT ExpenseReportItinerarySegmentID 35800DS is depicted in FIG. 358DS. For the GDT ExpenseReportItinerarySegmentID 35800DS, the Object Class is ExpenseReportItinerarySegment 35804DS, the Property is Identification 35806DS, the Representation/Association is Identifier 35808DS, the Type is CCT 35810DS, the Type Name is Identifier 35812DS, and the Length is from one to three 35814DS. The remark 35818DS shows that the GDT ExpenseReportItinerarySegmentID 35800DS may be restricted. An ExpenseReportItinerarySegmentID 35800DS may be represented as a three-digit number.

(nnnnnnnnnnnnnn) ExpenseReportItinerarySegmentTypeCode

A GDT ExpenseReportItinerarySegmentTypeCode 35800DT is a coded representation of a segment type of an itinerary within an expense report. For example, a segment type of an itinerary may be a classification of the segments of an itinerary based on statutory or business criteria. A segment of an itinerary may specify the arrival time at a destination, or another time relevant to settlement, within a business trip of an expense reporter. An example of GDT ExpenseReportItinerarySegmentTypeCode 35800DT is:

<ExpenseReportItinerarySegmentTypeCode>1</ExpenseReportItinerarySegmentTypeCode>

The structure of GDT ExpenseReportItinerarySegmentTypeCode 35800DT is depicted in FIG. 358DT. For the GDT ExpenseReportItinerarySegmentTypeCode 35800DT, the Object Class is ExpenseReportItinerarySegment 35804DT, the Property is Type 35806DT, the Representation/Association is Code 35808DT, the Type is CCT 35810DT, the Type Name is Code 35812DT, and the Length is from one to two 35814DT. The remark 35818DT shows that the GDT ExpenseReportItinerarySegmentTypeCode 35800DT may be restricted.

The data type GDT ExpenseReportItinerarySegmentTypeCode 35800DT may use the following codes: 1 (i.e., start of trip), 2 (i.e., end of trip), 3 (i.e., border crossing from domestic country into foreign country), 4 (i.e., border crossing for return to domestic country), 5 (i.e., landing at first destination), 6 (i.e., start with return flight), 7 (i.e., first destination, start of trip), 8 (i.e., additional destination, arrival at destination).

The attributes of the CCT Code are filled implicitly with the following values: listID="10084," listAgencyID=310, and listVersionID—Version of the code list. Assigned and administered by SAP.

An example of ExpenseReportSegments within an itinerary may include the following list:

"Segment type B start of trip: Jun. 1, 2005 9:30 AM departure from Walldorf

Segment type M first destination: Jun. 1, 2005 9:30 AM Darmstadt, Germany, visit company A, Schillerstrasse 3, 64297 Darmstadt Segment type N second destination: Jun. 3, 2005 6:00 PM Mol, Belgium, visit company B, Vareselaan 126, 2400 Mol Segment type N third destination: Jun. 5, 2005 1:00 PM Nancy, France, visit company C, Rue de l'Oratoire 34, 54000 Nancy Segment type R border crossing: Jun. 8, 2005 4:00 PM return to domestic country Segment type E end of trip: Jun. 8, 2005 6:30 PM arrival in Walldorf"

(oooooooooooooo) AG.ExpenseReportMileageCumulationPeriodTypeCode

A GDT ExpenseReportMileageCumulationPeriodTypeCode 35800DU is a coded representation of the type of a calendar-based period of time for which mileage cumulation takes place in a expense report. For example, a mileage cumulation may be the sum of the distances of the trip segments covered by an expense reporter for the purpose of determining a distance-scaled travel flat rate within a calendar-based period of time. An example of GDT ExpenseReportMileageCumulationPeriodTypeCode 35800DU is:

<ExpenseReportMileageCumulationPeriodTypeCode>1</ExpenseReportMileageCumulationPeriodTypeCode>

The structure of GDT ExpenseReportMileageCumulationPeriodTypeCode 35800DU is depicted in FIG. 358DU. For the GDT ExpenseReportMileageCumulationPeriodTypeCode 35800DU, the Object Class is ExpenseReportMileageCumulationPeriod 35801DU, the Property is Type 35803DU, the Representation/Association is Code 35804DU, the Type is CCT 35805DU, the Type Name is Code 35806DU, the Length is one 35807DU, and the Cardinality is one 35808DU. The remark 35809DU shows that the GDT ExpenseReportMileageCumulationPeriodTypeCode 35800DU may be restricted.

For the ListAgencyID 35810DU, the Category is Attribute (A) 35811DU, the Object Class is CodeListAgency 35812DU, the Property is Identification 35813DU, the Representation/Association is Identifier 35814DU, the Type is XSD 35815DU, the Type Name is Token 35816DU, and the Cardinality is zero or one 35818DU.

For the ListVersionID 35820DU, the Category is Attribute (A) 35821DU, the Object Class is CodeList 35822DU, the Property is Version 35823DU, the Representation/Association is Identifier 35824DU, the Type is XSD 35825DU, the Type Name is Token 35826DU, and the Cardinality is zero or one 35828DU.

For the ListAgency-SchemeID 35830DU, the Category is Attribute (A) 35831DU, the Object Class is CodeListAgency 35832DU, the Property is Scheme 35833DU, the Representation/Association is Identifier 35834DU, the Type is XSD 35835DU, the Type Name is Token 35836DU, and the Cardinality is zero or one 35838DU.

For the ListAgency-SchemeAgencyID 35840DU, the Category is Attribute (A) 35841DU, the Object Class is CodeListAgency 35842DU, the Property is SchemeAgency 35843DU, the Representation/Association is Identifier 35844DU, the Type is XSD 35845DU, the Type Name is Token 35846DU, and the Cardinality is zero or one 35848DU.

The data type GDT ExpenseReportMileageCumulationPeriodTypeCode 35800DU may use the following codes: 1 (i.e., yearly cumulation of mileage), 2 (i.e., monthly cumulation of mileage), 3 (i.e., weekly cumulation of mileage).

An extensible SAP code list is assigned to the ExpenseReportMileageCumulationPeriodTypeCode. A Customer can change this code list. In an unchanged SAP code list, the attributes are allocated as follows: listID=[ID of the code list], listAgencyID="310," and listVersionID=[version of the code list]. If a Customer makes changes to the SAP code list, the allocation of the attributes changes as follows: listAgencyID—ID of Customer (ID from DE 3055 if listed there), listVersionID—assigned and managed by the Customer, listAgencySchemeID—ID of scheme if the listAgencyID does not come from DE 3055, and listAgencySchemeAgencyID—ID of the organization from DE 3055 that manages the scheme of the listAgencySchemeID.

(pppppppppppppp) ExpenseReportMileageID

A GDT ExpenseReportMileageID 35800DV is a unique identifier for the mileage within an expense report. For example, the entities may be. An example of GDT ExpenseReportMileageID 35800DV is:

<ExpenseReportMileageID>1</ExpenseReportMileageID>

The structure of GDT ExpenseReportMileageID 35800DV is depicted in FIG. 358DV. For the GDT ExpenseReportMileageID 35800DV, the Object Class is ExpenseReportMileage 35804DV, the Property is Identification 35806DV, the Representation/Association is Identifier 35808DV, the Type is CCT 35810DV, the Type Name is Identifier 35812DV, and the Length is from one to three 35814DV. The remark 35818DV shows that the GDT ExpenseReportMileageID 35800DV may be restricted. An ExpenseReportMileageID 35800DV may be represented as a three-digit number.

(qqqqqqqqqqqqqq) ExpenseReportProvisionVariantCode

A GDT ExpenseReportProvisionVariantCode 35800DW is a coded representation of a variant of expense report provisions based on the territory or expense reporting method. For example, an expense report provision may be a rule for determining the reimbursement of expenses and their taxation. An example of GDT ExpenseReportProvisionVariantCode 35800DW is:

<ExpenseReportProvisionVariantCode>1</ExpenseReportProvisionVariantCode>

The structure of GDT ExpenseReportProvisionVariantCode 35800DW is depicted in FIG. 358DW. For the GDT ExpenseReportProvisionVariantCode 35800DW, the Object Class is ExpenseReportProvisionVariant 35804DW, the Representation/Association is Code 35808DW, the Type is CCT 35810DW, the Type Name is Code 35812DW, and the Length is from one to four 35814DW. The remark 35818DW shows that the GDT ExpenseReportProvisionVariantCode 35800DW may be restricted.

The data type GDT ExpenseReportProvisionVariantCode 35800DW may use the following codes: German accounting (i.e., expense reporting based on German law), US accounting (i.e., expense reporting based on United States law).

The attributes of the code are assigned the following values: listID="10349," listAgencyID—ID of the Customer (ID from DE 3055, if listed there), listVersionID—version of the particular code list. Assigned and managed by the Customer, listAgencySchemeID—ID of the scheme if the listAgencyID does not come from DE 3055, and listAgencySchemeAgencyID—ID of the organization from DE 3055 that manages the listAgencySchemeID scheme.

(rrrrrrrrrrrrrr) ExpenseReportReceiptID

A GDT ExpenseReportReceiptID 35800DX is a unique identifier for an expense receipt within an expense report. For example, an expense receipt may be proof of an expense incurred for the company. An example of GDT ExpenseReportReceiptID 35800DX is:

<ExpenseReportReceiptID>1</ExpenseReportReceiptID>

The structure of GDT ExpenseReportReceiptID 35800DX is depicted in FIG. 358DX. For the GDT ExpenseReportReceiptID 35800DX, the Object Class is ExpenseReportReceipt 35804DX, the Property is Identification 35806DX, the Representation/Association is Identifier 35808DX, the Type is CCT 35810DX, the Type Name is Identifier 35812DX, and the Length is from one to three 35814DX. The remark 35818DX shows that the GDT ExpenseReportReceiptID 35800DX may be restricted. An ExpenseReportReceiptID 35800DX may be represented as a three-digit number.

(ssssssssssssss) ExpenseReportStatutoryStayTypeCode

A GDT ExpenseReportStatutoryStayTypeCode 35800DY is a coded representation of a statutory stay type within an expense report. For example, a statutory stay type may classify within an expense report the stays for a business trip based on statutory criteria. An example of GDT ExpenseReportStatutoryStayTypeCode 35800DY is:

<ExpenseReportStatutoryStayTypeCode>1</ExpenseReportStatutoryStayTypeCode>

The structure of GDT ExpenseReportStatutoryStayTypeCode 35800DY is depicted in FIG. 358DY. For the GDT ExpenseReportStatutoryStayTypeCode 35800DY, the Object Class is Expense Report 35804DY, the Property is Statutory_Stay Type 35806DY, the Representation/Association is Code 35808DY, the Type is CCT 35810DY, the Type Name is Code 35812DY, and the Length is from one to two 35814DY. The remark 35818DY shows that the GDT ExpenseReportStatutoryStayTypeCode 35800DY may be restricted.

The data type GDT ExpenseReportStatutoryStayTypeCode 35800DY may use the following codes: business trip (i.e., trip taken for business reasons), private stay (i.e., private stay within a business trip, no reimbursement of per diems).

The attributes of the code are assigned the following values: listID="10350," listAgencyID—ID of the Customer (ID from DE 3055, if listed there), listVersionID—version of the particular code list, listAgencySchemeID—ID of the scheme if the listAgencyID does not come from DE 3055, and listAgencySchemeAgencyID—ID of the organization from DE 3055 that manages the listAgencySchemeID scheme.

(tttttttttttttt) ExpenseReportTypeCode

A GDT ExpenseReportTypeCode 35800DZ is a coded representation of the type of an expense report. For example, an expense report may be a list of receipts indicating the expenses incurred for the company that are to be reimbursed to the expense reporter. In the case of a business trip, the expense report may also contain relevant general information on the trip such as destinations, dates and times, and mileages. An example of GDT ExpenseReportTypeCode 35800DZ is:

<ExpenseReportTypeCode>1</ExpenseReportTypeCode>

The structure of GDT ExpenseReportTypeCode 35800DZ is depicted in FIG. 358DZ. For the GDT ExpenseReportTypeCode 35800DZ, the Object Class is ExpenseReport 35804DZ, the Property is Type 35806DZ, the Representation/Association is Code 35808DZ, the Type is CCT 35810DZ, the Type Name is Code 35812DZ, and the Length is from one to two 35814DZ. The remark 35818DZ shows that the GDT ExpenseReportTypeCode 35800DZ may be restricted.

The data type GDT ExpenseReportTypeCode 35800DZ may use the following codes: domestic business trip (i.e., business trip where the traveler remains in his or her domestic country), international business trip (i.e., business trip where the traveler spends part or all of the time in a foreign country), expense report without business trip (i.e., accounting for expenses that were not incurred in connection with a business trip).

The attributes of the code are assigned the following values: listID="10351," listAgencyID—ID of the Customer (ID from DE 3055, if listed there), listVersionID—version of the particular code list. Assigned and managed by the Customer, listAgencySchemeID—ID of the scheme if the listAgencyID does not come from DE 3055, and listAgencySchemeAgencyID—ID of the organization from DE 3055 that manages the listAgencySchemeID scheme.

(uuuuuuuuuuuuuu) ExpenseReporterGroupCode

A GDT ExpenseReporterGroupCode 35800EA is a coded representation of a group of expense reporters for the purpose of expense reporting. An example of GDT ExpenseReporterGroupCode 35800EA is:

<ExpenseReporterGroupCode>1</ExpenseReporterGroupCode>

The structure of GDT ExpenseReporterGroupCode 35800EA is depicted in FIG. 358EA. For the GDT ExpenseReporterGroupCode 35800EA, the Object Class is ExpenseReporterGroup 35804EA, the Representation/Association is Code 35808EA, the Type is CCT 35810EA, the Type Name is Code 35812EA, and the Length is from one to four 35814EA. The remark 35818EA shows that the GDT ExpenseReporterGroupCode 35800EA may be restricted.

The data type GDT ExpenseReporterGroupCode 35800EA may use the following codes: office employees (i.e., employees who are mainly office-based), field employees (i.e., employees who work mainly in the field).

The attributes of the code are assigned the following values: listID="10352," listAgencyID—ID of the Customer (ID from DE 3055, if listed there), listVersionID—version of the particular code list, listAgencySchemeID—ID of the scheme if the listAgencyID does not come from DE 3055, and listAgency-SchemeAgencyID—ID of the organization from DE 3055 that manages the listAgencySchemeID scheme.

(vvvvvvvvvvvvvvv) FiscalYearValue

A GDT FiscalYearValue 35800EB is a numerical value that designates a fiscal year. For example, a fiscal year (business year) may be a specific period of time designated by a numerical year value for which the profit and loss of a company is regularly accounted (inventory and balance sheet). An example of GDT FiscalYearValue 35800EB is:

<FiscalYearValue>2005</FiscalYearValue>

The structure of GDT FiscalYearValue 35800EB is depicted in FIG. 358EB. For the GDT FiscalYearValue 35800EB, the Object Class is FiscalYear 35804EB, the Representation/Association is Value 35808EB, the Type is Xsd 35810EB, the Type Name is nonNegativeInteger 35812EB, and the Length is four 35814EB.

A FiscalYearValue 35800EB may be represented by a four digit positive number. A FiscalYearValue 35800EB may be used, for example, to assign transactions to legal reporting periods. A financial statement may be reported for a specific fiscal year. A fiscal year contains a number of designated accounting periods. The fiscal year of a company is not necessarily identical with a calendar year, for example, the fiscal year "2005" of a company may begin on Oct. 1, 2004 and end on Sep. 30, 2005.

(wwwwwwwwwwwwwww) HandlingUnitID

A GDT HandlingUnitID 35800EC is a unique identifier for a HandlingUnit. For example, a HandlingUnit may be a physical unit that is handled individually and only occurs once in the real world. The HandlingUnit may describe the logistical and physical aspects of products or packaging units. An example of GDT HandlingUnitID 35800EC is:

<HandlingUnitID schemeID="SSCC" schemeAgencyID="9">254222298765432106</HandlingUnitID>

The structure of GDT HandlingUnitID 35800EC is depicted in FIG. 358EC. For the GDT HandlingUnitID 35800EC, the Object Class is HandlingUnit 35801EC, the Property is Identification 35803EC, the Representation/Association is Identifier 35804EC, the Type is CCT 35805EC, the Type Name is Identifier 35806EC, and the Length is from one to forty 35807EC. The remark 35809EC shows that the GDT HandlingUnitID 35800EC may be restricted.

For the SchemeID 35810EC, the Category is Attribute (A) 35811EC, the Object Class is IdentificationScheme 35812EC, the Property is Identification 35813EC, the Representation/Association is Identifier 35814EC, the Type is XSD 35815EC, the Type Name is Token 35816EC, the Length is from one to sixty 35817EC, and the Cardinality is zero or one 35818EC.

For the SchemeAgencyID 35820EC, the Category is Attribute (A) 35821EC, the Object Class is Identification-Scheme-Agency 35822EC, the Property is Identification 35823EC, the Representation/Association is Identifier 35824EC, the Type is XSD 35825EC, the Type Name is Token 35826EC, the Length is from one to sixty 35827EC, and the Cardinality is zero or one 35828EC.

For the SchemeAgencySchemeID 35830EC, the Category is Attribute (A) 35831EC, the Object Class is Identification-Scheme-Agency 35832EC, the Property is Procedure 35833EC, the Representation/Association is Identifier 35834EC, the Type is XSD 35835EC, the Type Name is Token 35836EC, the Length is from one to sixty 35837EC, and the Cardinality is zero or one 35838EC.

For the SchemeAgencySchemeAgencyID 35840EC, the Category is Attribute (A) 35841EC, the Object Class is IdentificationScheme-Agency 35842EC, the Property is SchemeAgency 35843EC, the Representation/Association is Identifier 35844EC, the Type is XSD 35845EC, the Type Name is Token 35846EC, the Length is from one to three 35847EC, and the Cardinality is zero or one 35848EC.

A handling unit can consist of an empty load carrier. It may be necessary to specify the HandlingUnitID and the load carrier, whereas packed products (loads), lower-level handling units, packaging materials, and additional packaging materials are optional.

(xxxxxxxxxxxxxxx) HandlingUnitInternalID

A GDT HandlingUnitInternalID 35800ED is a proprietary identifier for a HandlingUnit. For example, a HandlingUnit may be a physical unit that is handled individually and only occurs once in the real world. The HandlingUnit may describe the logistical and physical aspects of products or packaging units. An example of GDT HandlingUnitInternalID 35800ED is:

```
<HandlingUnitInternalID schemeID="HandlingUnitID"
schemeAgencyID="MPL_002">01234567890123456789
</HandlingUnitInternalID>
```

The structure of GDT HandlingUnitInternalID 35800ED is depicted in FIG. 358ED. For the GDT HandlingUnitInternalID 35800ED, the Object Class is HandlingUnit 35801ED, the Property Qualifier is Internal 35802ED, the Property is Identification 35803ED, the Representation/Association is Identifier 35804ED, the Type is GDT 35805ED, the Type Name is HandlingUnitID 35806ED, and the Length is from one to forty 35807ED. The remark 35809ED shows that the GDT HandlingUnitInternalID 35800ED may be restricted.

For the SchemeID 35810ED, the Category is Attribute (A) 35811ED, the Object Class is IdentificationScheme 35812ED, the Property is Identification 35813ED, the Representation/Association is Identifier 35814ED, the Type is XSD 35815ED, the Type Name is Token 35816ED, the Length is from one to sixty 35817ED, and the Cardinality is zero or one 35818ED.

For the SchemeAgencyID 35820ED, the Category is Attribute (A) 35821ED, the Object Class is Identification-Scheme-Agency 35822ED, the Property is Identification 35823ED, the Representation/Association is Identifier 35824ED, the Type is XSD 35825ED, the Type Name is Token 35826ED, the Length is from one to sixty 35827ED, and the Cardinality is zero or one 35828ED.

The attributes of HandlingUnitInternalID 35800ED are filled as follows: schemeID, HandlingUnitID (Identification of a HandlingUnit using an identifier) and sche-meAgencyID (Business system in which the identifier was assigned).

(yyyyyyyyyyyyyy) HandlingUnitStandardID

A GDT HandlingUnitStandardID 35800EE is a standardized identifier for a HandlingUnit. For example, a HandlingUnit may be a physical unit that is handled individually and only occurs once in the real world. The HandlingUnit may describe the logistical and physical aspects of products or packaging units. An example of GDT HandlingUnitStandardID 35800EE is:

<HandlingUnitStandardID schemeID="SSCC" schemeAgencyID="9">254222298765432106</HandlingUnitStandardID>

The structure of GDT HandlingUnitStandardID 35800EE is depicted in FIG. 358EE. For the GDT HandlingUnitStandardID 35800EE, the Object Class is HandlingUnit 35801EE, the Property Qualifier is Standard 35802EE, the Property is Identification 35803EE, the Representation/Association is Identifier 35804EE, the Type is CCT 35805EE, the Type Name is HandlingUnitID 35806EE, and the Length is from one to forty 35807EE. The remark 35809EE shows that the GDT HandlingUnitStandardID 35800EE may be restricted.

For the SchemeID 35810EE, the Category is Attribute (A) 35811EE, the Object Class is IdentificationScheme 35812EE, the Property is Identification 35813EE, the Representation/Association is Identifier 35814EE, the Type is XSD 35815EE, the Type Name is Token 35816EE, the Length is from one to sixty 35817EE, and the Cardinality is zero or one 35818EE.

For the SchemeAgencyID 35820EE, the Category is Attribute (A) 35821EE, the Object Class is Identification-Scheme-Agency 35822EE, the Property is Identification 35823EE, the Representation/Association is Identifier 35824EE, the Type is XSD 35825EE, the Type Name is Token 35826EE, the Length is from one to sixty 35827EE, and the Cardinality is zero or one 35828EE.

The following codes and schemes are supported: "SchemeAgencyID" identifies the agency that manages the identification scheme, 9 (EAN.UCC, International Numbering Association) for schemeID, SSCC—the Serial Shipping Container Code, which is up to 18 characters long, and GRAI—the Global Returnable Asset Identifier, which is up to 30 characters long.

(zzzzzzzzzzzzzz) Indicator

A GDT Indicator 35800EF is a binary encoded specification of a fact that has the value "0" or "1", which may represent, for example, "true" or "false". An example of GDT Indicator 35800EF is:

<Indicator>true</Indicator>

The structure of GDT Indicator 35800EF is depicted in FIG. 358EF. For the GDT Indicator 35800EF, the Category is simpleType 35801EF, the Property is Indicator 35806EF, the Representation/Association is Content 35808EF, the Type is XSD 35810EF, and the Type Name is Boolean 35812EF. "Indicator" may be used for binary classifications, indicators, flags, etc. The representation term for the CCT "Indicator" is Indicator.

(aaaaaaaaaaaaaa) IndividualProductGroupID

A GDT IndividualProductGroupID 35800EG is a unique identifier for a group of individual products. For example, an individual product may be a single unit of a product. It may be globally unique and the single unit may be identified by an identifier, such as a serial ID or a vehicle identification number (VIN). An example of GDT IndividualProductGroupID 35800EG is:

<IndividualProductGroupID>0601</IndividualProductGroupID>

The structure of GDT IndividualProductGroupID 35800EG is depicted in FIG. 358EG. For the GDT IndividualProductGroupID 35800EG, the Object Class is Individual Product Group 35804EG, the Property is Identification 35806EG, the Representation/Association is Identifier 35808EG, the Type is CCT 35810EG, the Type Name is Identifier 35812EG, and the Length is from one to four 35814EG. The remark 35818EG shows that the GDT IndividualProductGroupID 35800EG may be restricted.

The data type GDT IndividualProductGroupID 35800EG may use the following codes: refrigerators (i.e., a group of individual products whose single units are identified by their refrigerator serial numbers), vehicles (i.e., a group of individual products whose single units are identified by their vehicle identification numbers).

(bbbbbbbbbbbbbb) IndustrialSectorCode

A GDT IndustrialSectorCode 35800EH is a coded description of an industry. For example, an industry may be the classification of a company according to the main focus of its business activities. Retail, banking, services, industry, health service, public sector, media, and so on, may be defined as industries. An example of GDT IndustrialSectorCode 35800EH is:

<IndustrialSectorCode listID="ISIC Rev.3.1" listAgencyID="United Nations Statistics Division">9000</IndustrialSectorCode>

The structure of GDT IndustrialSectorCode 35800EH is depicted in FIG. 358EH. For the GDT IndustrialSectorCode 35800EH, the Property is Industrial Sector 35803EH, the Representation/Association is Code 35804EH, the Type is CCT 35805EH, the Type Name is Code 35806EH, and the Length is from one to ten 35807EH. The remark 35809EH shows that the GDT IndustrialSectorCode 35800EH may be restricted.

For the ListID 35810EH, the Category is Attribute (A) 35811EH, the Object Class is CodeList 35812EH, the Property is Identification 35813EH, the Representation/Association is Identifier 35814EH, the Type is XSD 35815EH, the Type Name is Token 35816EH, and the Cardinality is zero or one 35818EH.

For the ListAgencyID 35820EH, the Category is Attribute (A) 35821EH, the Object Class is CodeListAgency 35822EH, the Property is Identification 35823EH, the Representation/Association is Identifier 35824EH, the Type is XSD 35825EH, the Type Name is Token 35826EH, and the Cardinality is zero or one 35828EH.

For the ListVersionID 35830EH, the Category is Attribute (A) 35831EH, the Object Class is CodeList 35832EH, the Property is Version 35833EH, the Representation/Association is Identifier 35834EH, the Type is XSD 35835EH, the Type Name is Token 35836EH, and the Cardinality is zero or one 35838EH.

For the ListAgency-SchemeID 35840EH, the Category is Attribute (A) 35841EH, the Object Class is CodeListAgency 35842EH, the Property is Scheme 35843EH, the Representation/Association is Identifier 35844EH, the Type is XSD 35845EH, the Type Name is Token 35846EH, and the Cardinality is zero or one 35848EH.

For the ListAgency-SchemeAgencyID 35850EH, the Category is Attribute (A) 35851EH, the Object Class is CodeListAgency 35852EH, the Property is SchemeAgency 35853EH, the Representation/Association is Identifier 35854EH, the Type is XSD 35855EH, the Type Name is Token 35856EH, and the Cardinality is zero or one 35858EH.

The data type GDT IndustrialSectorCode 35800EH may use the following codes: retail sector (i.e., companies in this industry work primarily in the retail sector), wholesale sector (i.e., companies in this industry work primarily in the wholesale sector).

If the GDT IndustrialSectorCode (industry) can be used in the context of the GDT IndustryClassificationSystemCode (industry system), the code value of the instance of the IndustryClassificationSystemCode determines the attributes of the instance of IndustrialSectorCode.

he attributes of the code can be assigned the following values: listID="10353," listAgencyID—ID of the Customer (ID from DE 3055, if listed there), listVersionID—version of the particular code list. As-signed and managed by the Customer, listAgencySchemeID—ID of the scheme if the listAgencyID does not come from DE 3055, and listAgencySchemeAgencyID—ID of the organization from DE 3055 that manages the listAgencySchemeID scheme.

(cccccccccccccc) IndustryClassificationSystemCode

A GDT IndustryClassificationSystemCode 35800EI is a coded description of an industry system. For example, an industry system may be a list of industries that is organized systematically and, if required, hierarchically. Each of the following standards listed may represent a possible code value from a code list for industry systems: the International Standard Industrial Classification of United Nations Statistics Division, the NACE code (i.e., the economic classification of the European Union). An example of GDT IndustryClassificationSystemCode 35800EI is:

<IndustryClassificationSystemCode>123</IndustryClassificationSystemCode>

The structure of GDT IndustryClassificationSystemCode 35800EI is depicted in FIG. 358EI. For the GDT IndustryClassificationSystemCode 35800EI, the Property is Industry Classification System 35803EI, the Representation/Association is Code 35804EI, the Type is CCT 35805EI, the Type Name is Code 35806EI, and the Length is from one to four 35807EI. The remark 35809EI shows that the GDT IndustryClassificationSystemCode 35800EI may be restricted.

For the ListID 35810EI, the Category is Attribute (A) 35811EI, the Object Class is CodeList 35812EI, the Property is Identification 35813EI, the Representation/Association is Identifier 35814EI, the Type is XSD 35815EI, the Type Name is Token 35816EI, and the Cardinality is zero or one 35818EI.

For the ListAgencyID 35820EI, the Category is Attribute (A) 35821EI, the Object Class is CodeListAgency 35822EI, the Property is Identification 35823EI, the Representation/Association is Identifier 35824EI, the Type is XSD 35825EI, the Type Name is Token 35826EI, and the Cardinality is zero or one 35828EI.

For the ListVersionID 35830EI, the Category is Attribute (A) 35831EI, the Object Class is CodeList 35832EI, the Property is Version 35833EI, the Representation/Association is Identifier 35834EI, the Type is XSD 35835EI, the Type Name is Token 35836EI, and the Cardinality is zero or one 35838EI.

For the ListAgency-SchemeID 35840EI, the Category is Attribute (A) 35841EI, the Object Class is CodeListAgency 35842EI, the Property is Scheme 35843EI, the Representation/Association is Identifier 35844EI, the Type is XSD 35845EI, the Type Name is Token 35846EI, and the Cardinality is zero or one 35848EI.

The data type GDT IndustryClassificationSystemCode 35800EI may use the following codes: timber processing industries (i.e., this industry system includes the industries involved in using timber such as joinery, carpentry, furniture manufacturers, and so on), agricultural industries (i.e., this industry system includes those industries that can be linked to agriculture in its broadest sense such as forestry enterprises, breeding establishments, garden nurseries and farms).

(dddddddddddddd) InspectionResultValuationTypeCode

A GDT InspectionResultValuationTypeCode 35800EJ is a coded representation of a type of automatic valuation for an inspection result. For example, the valuation type may define how an inspection result is valuated. The valuation may be performed based on nonconforming units or based on the number of defects. An example of GDT InspectionResultValuationTypeCode 35800EJ is:

<InspectionResultValuationTypeCode>1</InspectionResultValuationTypeCode>

The structure of GDT InspectionResultValuationTypeCode 35800EJ is depicted in FIG. 358EJ. For the GDT InspectionResultValuationTypeCode 35800EJ, the Object Class is Inspection 35804EJ, the Property is Result_Valuation Type 35806EJ, the Representation/Association is Code 35808EJ, the Type is CCT 35810EJ, the Type Name is Code 35812EJ, and the Length is one 35814EJ. The remark 35818EJ shows that the GDT InspectionResultValuationTypeCode 35800EJ may be restricted.

The data type GDT InspectionResultValuationTypeCode 35800EJ may use the following codes: 1 (i.e., automatic valuation based on nonconforming units), 2 (i.e., automatic valuation based on the number of defects). The InspectionResultValuationTypeCode 35800EJ may be used in the context of an inspection. The InspectionResultValuationTypeCode 35800EJ may provide information about the valuation type used during an automatic valuation of the inspection result. An automatic valuation based on nonconforming units could, for example, lead to a rejection of an inbound delivery if there are more than three nonconforming units.

(eeeeeeeeeeeeee) InspectionScopeCode

A GDT InspectionScopeCode 35800EK is a coded representation of an inspection scope. For example, initially, the inspection scope may define if an inspection is to take place or not. If an inspection is to be performed, the inspection scope may define whether it is a 100% inspection or a sampling inspection. An example of GDT InspectionScopeCode 35800EK is:

<InspectionScopeCode>C</InspectionScopeCode>

The structure of GDT InspectionScopeCode 35800EK is depicted in FIG. 358EK. For the GDT InspectionScopeCode 35800EK, the Object Class is InspectionScope 35804EK, the Representation/Association is Code 35808EK, the Type is CCT 35810EK, the Type Name is Code 35812EK, and the Length is one 35814EK. The remark 35818EK shows that the GDT InspectionScopeCode 35800EK may be restricted.

The data type GDT InspectionScopeCode 35800EK may use the following codes: N (i.e., no inspection is performed for an object), C (i.e., every object of the total inspection quantity is inspected), S (i.e., a number of objects of the total inspection quantity are inspected, the number being defined in accordance with specific criteria).

The attributes contains the following values: listID="10093," listAgencyID="310," and listVersionID—Version of the relevant code list. Assigned and managed by SAP AG. In the SAP system with the QIE, InspectionScopeCode is represented by the following dictionary objects: Data element: QIE_TV_INSP_PROC and Domain: QIE_INSP_PROC.

(ffffffffffffff) InspectionStageID

A GDT InspectionStageID 35800EL is an identifier for an inspection stage. For example, within a dynamic modification rule (see DynamicModificationRuleCode), the inspection stage may define whether an inspection is to be performed or skipped. The inspection stage may also define the inspection severity (see InspectionSeverityCode) with which the inspection is performed and may contain the conditions for a change to another inspection stage. In some implementations, the inspection severity is only relevant for inspections with a sampling scheme. Typically, a change of inspection stage brings about a reduction of the inspection scope. The dynamic modification rule may contain possible inspection stages for a particular process of inspection scope reduction. An example of GDT InspectionStageID 35800EL is:

<InspectionStageID>3</InspectionStageID>

The structure of GDT InspectionStageID 35800EL is depicted in FIG. 358EL. For the GDT InspectionStageID 35800EL, the Object Class is InspectionStage 35804EL, the Property is Identification 35806EL, the Representation/Association is Identifier 35808EL, the Type is CCT 35810EL, the Type Name is Identifier 35812EL, and the Length is from one to fifteen 35814EL. The remark 35818EL shows that the GDT InspectionStageID 35800EL may be restricted. The InspectionStageID 35800EL may be unique within an inspection rule.

(ggggggggggggggg) InstallationPointID

A GDT InstallationPointID 35800EM is a unique identifier for an installation point. For example, an installation point may be the physical or logical location at which a business object, for example a material or software, is installed during a certain period of time. An installation point may have a multilevel structure. An example of GDT InstallationPointID 35800EM is:

<InstallationPointID>4711</InstallationPointID>

The structure of GDT InstallationPointID 35800EM is depicted in FIG. 358EM. For the GDT InstallationPointID 35800EM, the Object Class is Installation Point 35801EM, the Property is Identification 35803EM, the Representation/Association is Identifier 35804EM, the Type is CCT 35805EM, the Type Name is Identifier 35806EM, and the Length is from one to eighteen 35807EM. The remark 35809EM shows that the GDT InstallationPointID 35800EM may be restricted.

For the SchemeID 35810EM, the Category is Attribute (A) 35811EM, the Object Class is IdentificationScheme 35812EM, the Property is Identification 35813EM, the Representation/Association is Identifier 35814EM, the Type is XSD 35815EM, the Type Name is Token 35816EM, the Length is from one to sixty 35817EM, and the Cardinality is zero or one 35818EM.

For the SchemeAgencyID 35820EM, the Category is Attribute (A) 35821EM, the Object Class is Identification-Scheme-Agency 35822EM, the Property is Identification 35823EM, the Representation/Association is Identifier 35824EM, the Type is XSD 35825EM, the Type Name is Token 35826EM, the Length is from one to sixty 35827EM, and the Cardinality is zero or one 35828EM.

The data type GDT InstallationPointID 35800EM may use, for example, numeric characters, such as, any sequence of characters from the character set {0, 1, 2, 3, 4, 5, 6, 7, 8, 9} with a length of 18. In some implementations, character strings containing only zeroes or leading zeroes are not allowed. The attributes may be used as follows. The schemeID 35810EM identifies an identification scheme. The identification scheme represents the context that can be used to identify an object. The schemeID 35810EM may be unique within the agency that manages this identification scheme. The schemeAgencyID 35820EM identifies the agency that manages an identification scheme.

The attributes of the code list are used as follows: schemeID—identifies an identification scheme and schemeAgencyID—identifies the agency that manages an identification scheme. In SAP systems, the InstallationPointID is described by the following dictionary objects: Data element: IB_INSTANCE and domain: IB_INSTANCE.

(hhhhhhhhhhhhhhh) InstalledBaseCategoryCode

A GDT InstalledBaseCategoryCode 35800EN is a coded representation of the category of an installed base and is differentiated by customer specific criteria. For example, an installed base may be structured after a functional arrangement of business objects at a logical or physical place. An example of GDT InstalledBaseCategoryCode 35800EN is:

<InstalledBaseCategoryCode>1</InstalledBaseCategoryCode>

The structure of GDT InstalledBaseCategoryCode 35800EN is depicted in FIG. 358EN. For the GDT InstalledBaseCategoryCode 35800EN, the Object Class is InstalledBase 35801EN, the Property is Category 35803EN, the Representation/Association is Code 35804EN, the Type is CCT 35805EN, the Type Name is Code 35806EN, and the Length is from one to two 35807EN. The remark 35809EN shows that the GDT InstalledBaseCategoryCode 35800EN may be restricted.

For the ListAgencyID 35810EN, the Category is Attribute (A) 35811 EN, the Object Class is CodeListAgency 35812EN, the Property is Identification 35813EN, the Representation/Association is Identifier 35814EN, the Type is XSD 35815EN, the Type Name is Token 35816EN, and the Cardinality is zero or one 35818EN.

For the ListVersionID 35820EN, the Category is Attribute (A) 35821EN, the Object Class is CodeList 35822EN, the Property is Version 35823EN, the Representation/Association is Identifier 35824EN, the Type is XSD 35825EN, the Type Name is Token 35826EN, and the Cardinality is zero or one 35828EN.

For the ListAgency-SchemeID 35830EN, the Category is Attribute (A) 35831EN, the Object Class is CodeListAgency 35832EN, the Property is Scheme 35833EN, the Representation/Association is Identifier 35834EN, the Type is XSD 35835EN, the Type Name is Token 35836EN, and the Cardinality is zero or one 35838EN.

For the ListAgency-SchemeAgencyID 35840EN, the Category is Attribute (A) 35841EN, the Object Class is CodeListAgency 35842EN, the Property is SchemeAgency 35843EN, the Representation/Association is Identifier 35844EN, the Type is XSD 35845EN, the Type Name is Token 35846EN, and the Cardinality is zero or one 35848EN.

The data type GDT InstalledBaseCategoryCode 35800EN may use the following codes: building (i.e., the installed base comprises a building), machines (i.e., the installed base comprises machines).

(iiiiiiiiiiiii) InstalledBaseID

A GDT InstalledBaseID 35800EO is a unique identifier for an installed base. For example, an installed base may be a functionally-structured arrangement of business objects at a logical or physical location. An example of GDT InstalledBaseID 35800EO is:

<InstalledBaseID>4711</InstalledBaseID>

The structure of GDT InstalledBaseID 35800EO is depicted in FIG. 358EO. For the GDT InstalledBaseID 35800EO, the Object Class is Installed Base 35801EO, the Property is Identification 35803EO, the Representation/Association is Identifier 35804EO, the Type is CCT 35805EO, the Type Name is Identifier 35806EO, and the Length is from one to eighteen 35807EO. The remark 35809EO shows that the GDT InstalledBaseID 35800EO may be restricted.

For the SchemeID 35810EO, the Category is Attribute (A) 35811EO, the Object Class is IdentificationScheme 35812EO, the Property is Identification 35813EO, the Representation/Association is Identifier 35814EO, the Type is XSD 35815EO, the Type Name is Token 35816EO, the Length is from one to sixty 35817EO, and the Cardinality is zero or one 35818EO.

For the SchemeAgencyID 35820EO, the Category is Attribute (A) 35821EO, the Object Class is Identification-Scheme-Agency 35822EO, the Property is Identification 35823EO, the Representation/Association is Identifier 35824EO, the Type is XSD 35825EO, the Type Name is Token 35826EO, the Length is from one to sixty 35827EO, and the Cardinality is zero or one 35828EO.

The data type GDT InstalledBaseID 35800EO may use, for example, numeric characters, such as, any sequence of characters from the character set {0, 1, 2, 3, 4, 5, 6, 7, 8, 9} with a length of 18. In some implementations, character strings containing only zeroes or leading zeroes are not allowed. The attributes may be used as follows. The schemeID 35810EO identifies an identification scheme. The identification scheme represents the context that can be used to identify an object. The schemeID 35810EO is only unique within the agency that manages this identification scheme. The schemeAgencyID 35820EO identifies the agency that manages an identification scheme.

The attributes are used as follows: schemeID—identifies an identification scheme. and schemeAgencyID—identifies the agency that manages an identification scheme.

(jjjjjjjjjjjjjj) IntegratedProductionProcessModelID

A GDT IntegratedProductionProcessModelID 35800EP is a unique identifier for an integrated production process model. For example, an IntegratedProductionProcessModel may be a grouping of one or more ProductionSegments for a production process. A ProductionSegment may be a section in the production of a material in a LogisticsDivision. An example of GDT IntegratedProductionProcessModelID 35800EP is:

<IntegratedProductionProcessModelID>CPRD_1</IntegratedProductionProcessModelID>

The structure of GDT IntegratedProductionProcessModelID 35800EP is depicted in FIG. 358EP. For the GDT IntegratedProductionProcessModelID 35800EP, the Object Class is IntegratedProductionProcessModel 35804EP, the Property is Identification 35806EP, the Representation/Association is Identifier 35808EP, the Type is CCT 35810EP, the Type Name is Identifier 35812EP, and the Length is from one to forty 35814EP. The remark 35818EP shows that the GDT IntegratedProductionProcessModelID 35800EP may be restricted.

(kkkkkkkkkkkkkk) IntegratedSiteLogisticsProcessModelID

A GDT IntegratedSiteLogisticsProcessModelID 35800EQ is a unique identifier for an IntegratedSiteLogisticsProcessModel. For example, an IntegratedSiteLogisticsProcessModel may be a model that defines a logistic process managed by a logistics division, for example, by specifying a sequence of process segments. An example of GDT IntegratedSiteLogisticsProcessModelID 35800EQ is:

<IntegratedSiteLogisticsProcessModelID>STANDARD_RECEIVING</IntegratedSiteLogisticsProcessModelID>

The structure of GDT IntegratedSiteLogisticsProcessModelID 35800EQ is depicted in FIG. 358EQ. For the GDT IntegratedSiteLogisticsProcessModelID 35800EQ, the Object Class is Integrated Site Logistics Process Model 35804EQ, the Property is Identification 35806EQ, the Representation/Association is Identifier 35808EQ, the Type is CCT 35810EQ, the Type Name is Identifier 35812EQ, and the Length is from one to forty 35814EQ. The remark 35818EQ shows that the GDT IntegratedSiteLogisticsProcessModelID 35800EQ may be restricted.

(llllllllllllll) InventoryResponsibleOrganisationalUnitTypeCode

A GDT InventoryResponsibleOrganisationalUnitTypeCode 35800ER is a coded representation of the type of an organizational unit that is responsible for an inventory. For example, an inventory may be the quantity of all materials at a location with their reservations for consumers. An example of GDT InventoryResponsibleOrganisationalUnitTypeCode 35800ER is:

<InventoryResponsibleOrganisationalUnitTypeCode>1</InventoryResponsibleOrganisationalUnitTypeCode>

The structure of GDT InventoryResponsibleOrganisationalUnitTypeCode 35800ER is depicted in FIG. 358ER. For the GDT InventoryResponsibleOrganisationalUnitTypeCode 35800ER, the Object Class is Inventory 35804ER, the Property is Responsible Organizational Unit Type 35806ER, the Representation/Association is Code 35808ER, the Type is CCT 35810ER, the Type Name is Code 35812ER, the Length is one 35814ER, and the Cardinality is one 35816ER. The remark 35818ER shows that the GDT InventoryResponsibleOrganisationalUnitTypeCode 35800ER may be restricted.

The data type GDT InventoryResponsibleOrganisationalUnitTypeCode 35800ER may use the following codes: 1 (i.e., organizational unit responsible for inventory at a site), 2 (i.e., organizational unit responsible for inventory in a logistics division), 3 (i.e., organizational unit responsible for inventory in a logistics area), 4 (i.e., organizational unit responsible for inventory at a resource, for example, a shelf but not an employee). The InventoryResponsibleOrganisationalUnitTypeCode 35800ER defines the organizational unit responsible for inventory management in more detail.

The attributes of the code list are used as follows: listID="10080," listAgencyID="310," and listVersionID—Version of the relevant code list. Assigned and managed by SAP AG.

(mmmmmmmmmmmmmm) InventorySeparatingValues

A GDT InventorySeparatingValues 35800ES are values of stock-separating attributes that are required for stock posting. For example, stock-separating attributes may be criteria that are used to differentiate one stock from other stocks. An example of GDT InventorySeparatingValues 35800ES is:

```
<InventorySeparatingValues>
<MaterialUUID>42d3cfca-5996-57b0-e100-00000a44201b</
MaterialUUID>
<BatchUUID>32d3cfca-8796-57b0-e100-00000a42201a</
BatchUUID>
<OwnerPartyUUID>51d3cfca-1996-57b0-e100-
00000a42201c</OwnerPartyUUID>
<SupplyPlanningAreaUUID>35d3cfca-3996-57b0-e100-
00000a42201d
</SupplyPlanningAreaUUID>
<InventoryUsabilityStatusCode>1</InventoryUsabiltiyStatusCode>
<ConsignmentIndicator>1</ConsignmentIndicator
<SubcontractingIndicator></SubcontractingIndicator>
<PackagingMaterialTiedIndicator></
PackagingMaterialTiedIndicator>
</InventorySeparatingValues>
```

The structure of GDT InventorySeparatingValues 35800ES is depicted in FIG. 358ES. For the GDT InventorySeparatingValues 35800ES, the Object Class is Inventory Separating Values 35801ES, and the Representation/Association is Details 35804ES.

For the MaterialUUID 35810ES, the Category is Element (E) 35811ES, the Object Class is Inventory Separating Values 35812ES, the Property is Material 35813ES, the Representation/Association is Identifier 35814ES, the Type is GDT 35815ES, the Type Name is UUID 35816ES, the Length is thirty-six 35817ES, and the Cardinality is one 35818ES.

For the BatchUUID 35820ES, the Category is Element (E) 35821ES, the Object Class is Inventory Separating Values 35822ES, the Property is Batch 35823ES, the Representation/Association is Identifier 35824ES, the Type is GDT 35825ES, the Type Name is UUID 35826ES, the Length is thirty-six 35827ES, and the Cardinality is zero or one 35828ES.

For the OwnerPartyUUID 35830ES, the Category is Element (E) 35831ES, the Object Class is Inventory Separating Values 35832ES, the Property is Owner Party 35833ES, the Representation/Association is Identifier 35834ES, the Type is GDT 35835ES, the Type Name is UUID 35836ES, the Length is thirty-six 35837ES, and the Cardinality is one 35838ES.

For the SupplyPlanningAreaUUID 35840ES, the Category is Element (E) 35841ES, the Object Class is Inventory Separating Values 35842ES, the Property is Supply Planning Area 35843ES, the Representation/Association is Identifier 35844ES, the Type is GDT 35845ES, the Type Name is UUID 35846ES, the Length is thirty-six 35847ES, and the Cardinality is zero or one 35848ES.

For the InventoryUsabilityStatusCode 35850ES, the Category is Element (E) 35851ES, the Object Class is Inventory Separating Values 35852ES, the Property is Inventory Usability Status 35853ES, the Representation/Association is Code 35854ES, the Type is GDT 35855ES, the Type Name is InventoryUsabilityStatusCode 35856ES, the Length is from one to two 35857ES, and the Cardinality is one 35858ES.

For the ConsignmentIndicator 35860ES, the Category is Element (E) 35861ES, the Object Class is Inventory Separating Values 35862ES, the Property is Consignment 35863ES, the Representation/Association is Indicator 35864ES, the Type is GDT 35865ES, the Type Name is ConsignmentIndicator 35866ES, and the Cardinality is zero or one 35868ES.

For the SubcontractionIndicator 35870ES, the Category is Element (E) 35871ES, the Object Class is Inventory Separating Values 35872ES, the Property is Subcontracting 35873ES, the Representation/Association is Indicator 35874ES, the Type is GDT 35875ES, the Type Name is SubcontractingIndicator 35876ES, and the Cardinality is zero or one 35878ES.

For the PackagingMaterialTiedIndicator 35880ES, the Category is Element (E) 35881ES, the Object Class is Inventory Separating Values 35882ES, the Property is Packaging Material Tied 35883ES, the Representation/Association is Indicator 35884ES, the Type is GDT 35885ES, the Type Name is PackagingMaterialTiedIndicator 35886ES, and the Cardinality is zero or one 35888ES.

In some implementations, the MaterialUUID 35810ES may be a unique, global identifier for a material. The BatchUUID 35820ES may be a unique, global identifier for a batch (homogeneous partial quantity of a material). The OwnerPartyUUID 35830ES may be a unique, global identifier for the inventory owner. The SupplyPlanningAreaUUID 35840ES may be a unique, global identifier for an area in planning for which the availability of products on time is guaranteed. The InventoryUsabilityStatusCode 35850ES may be coded information on the use of the inventory (such as locked for further business processes, or quality inspection). The ConsignmentIndicator 35860ES may be a consignment stock indicator. The SubcontractingIndicator 35870ES may be an indicator for stock with subcontractor. The PackagingMaterialTiedIndicator 35880ES may indicate whether or not a packaging material (load carrier, additional packaging material) is a physical part of a HandlingUnit or a LogisticsUnit.

(nnnnnnnnnnnnnn) OperationActivityID

A GDT OperationActivityID 35800ET is a unique identifier of an activity in an operation. An activity is a processing or transportation section of a process description in logistics on a lower-level than the operation. An example of a GDT OperationActivityID 35800ET is:

<OperationActivityID>ASSEMBLY__023</OperationActivityID>

The structure of GDT OperationActivityID 35800ET is depicted in FIG. 358ET. For the GDT OperationActivityID 35800ET, the Object Class is Operation Activity 35802ET, the Property is Identification 35804ET, the Representation/Association is Identifier 35806ET, the Type is CCT 35808ET, the Type Name is Identifier 35810ET, and the Length is from one to forty 35812ET. The remark 35814ET shows that GDT OperationActivityID 35800ET may be restricted.

The GDT OperationActivityID 35800ET is explicit in the context of an operation.

(ooooooooooooooo) OperationActivityStepID

A GDT OperationActivityStepID 35800EU is a unique identifier of a work step of an activity in an operation. A work step is the description of a detailed work instruction of a process description in logistics. An example of a GDT OperationActivityStepID 35800EU is:

<OperationActivityStepID>STEP__10</OperationActivityStepID>

The structure of GDT OperationActivityStepID 35800EU is depicted in FIG. 358EU. For the GDT OperationActivityStepID 35800EU, the Object Class is Operation Activity Step 35802EU, the Property is Identification 35804EU, the Representation/Association is Identifier 35806EU, the Type is CCT 35808EU, the Type Name is Identifier 35810EU, and the Length is from one to forty 35812EU. The remark 35814EU shows that GDT OperationActivityStepID 35800EU may be restricted.

The GDT OperationActivityStepID 35800EU is explicit in the context of an operation.

(ppppppppppppppp) OperationActivityTypeCode

A GDT OperationActivityTypeCode 35800EV is the coded representation of a categorization of operations. An activity is a processing or transportation section of a process description in logistics on a lower-level than the operation. An example of a GDT OperationActivityTypeCode 35800EV is:

<OperationActivityTypeCode>1</OperationActivityTypeCode>

The structure of GDT OperationActivityTypeCode 35800EV is depicted in FIG. 358EV. For the GDT OperationActivityTypeCode 35800EV, the Object Class is Operation Activity 35804EV, the Property is Type 35806EV, the Representation/Association is Code 35808EV, the Type is CCT 35810EV, the Type Name is Code 35812EV and the Length is from one to four 35814EV. The remark 35815CP shows that GDT OperationActivityTypeCode 35800EV may be restricted.

For the list Agency ID 35816EV, the Category is Attribute (A) 34518EV, the Object Class is Code List Agency 35820EV, the Property is Identification 35822EV, the Representation/Association is Identifier 35824EV, the Type is XSD 35826EV, and the Type Name is token 35828EV. The Cardinality is one 35830EV.

For the list Version ID 35832EV, the Category is Attribute (A) 34534EV, the Object Class is Code List 35836EV, the Property is Version 35838EV, the Representation/Association is Identifier 35840EV, the Type is XSD 35842EV, and the Type Name is token 35844EV. The Cardinality is one 35846EV.

For the list Agency-Scheme ID 35848EV, the Category is Attribute (A) 34550EV, the Object Class is Code List Agency 35852EV, the Property is Scheme 35854EV, the Representation/Association is Identifier 35856EV, the Type is XSD 35858EV, and the Type Name is token 35860EV. The Cardinality is zero or one 35862EV.

For the list Agency-Scheme Agency ID 35864EV, the Category is Attribute (A) 34566EV, the Object Class is Code List Agency 35868EV, the Property is Scheme Agency 35870EV, the Representation/Association is Identifier 35872EV, the Type is XSD 35874EV, and the Type Name is token 35876EV. The Cardinality is zero or one 35878EV.

An extendable SAP code list is assigned to the GDT OperationActivityTypeCode 35800EV. Customers can change this code list. In its unchanged state, the SAP code list has the following attributes: listID="10130", listAgencyID="310", listVersionID=Version of the relevant code list assigned and managed by SAP AG. If A customer makes changes to the SAP code list, the values of the attributes are changed as follows: listAgencyID which is the ID of the Customer (ID from DE 3055 if listed there), listVersionID which is assigned and managed by the Customer, listAgencySchemeID which is the ID of the scheme if the listAgencyID is not taken from DE 3055, and listAgencySchemeAgencyID which is the ID of the organization (taken from DE 3055) that manages the scheme of the listAgencySchemeID.

Every GDT OperationActivityTypeCode 35800EV has to be assigned to exactly one OperationActivityCategoryCode. The customer can extend the code list, for example, to include the code: Clean.

Possible code values for the GDT OperationActivityTypeCode 35800EV are one through nine. Setup is code one. Setup is an activity that prepares the work center for the operations to be executed. Produce is code two. Produce is a processing of a material at a work center. Setup and tear down are not a part of processing. Tear Down is code three. Tear Down is an activity that returns the work center to its original state after processing the operations. Single Move is code four. Single Move is a single transport of materials or logistics units from one location to another target location. Collective Move is code five. Collective Move is a collective transport of materials or logistics units from several locations to another target location. Distributed Move is code six. Distributed Move is a distributed transport of materials or logistics units from one location to several target locations. Pack is code seven. Pack is a packing of materials or logistics units in a logistics unit. Unpack is code eight. Unpack is an unpacking of materials or logistics units from a logistics unit. Homogeneous Pack is code nine. Homogeneous Pack is a packing of a quantity of one material or exactly one logistics unit into a logistics unit.

(qqqqqqqqqqqqqqq) OperationID

A GDT OperationID 35800EW is a unique identifier of an operation. An operation is a self-contained section of a process in a logistics process description that is always completely executed on one or more resources that represent the main resources. An example of a GDT OperationID 35800EW is:

<OperationID>OP42</OperationID>

The structure of GDT OperationID 35800EW is depicted in FIG. 358EW. For the GDT OperationID 35800EW, the Object Class is Operation 35802EW, the Property is Identification 35804EW, the Representation/Association is Identifier 35806EW, the Type is CCT 35808EW, the Type Name is Identifier 35810EW, and the Length is from one to forty 35812EW. The remark 35814EW shows that GDT OperationID 35800EW may be restricted.

The GDT OperationID 35800EW may be unique in the usage context.

(rrrrrrrrrrrrrr) OperationTypeCode

A GDT OperationTypeCode 35800EX is the coded representation of a categorization of operations. The type categorizes operations according to task. An operation is a self-contained process section in a logistics process description that is always completely executed on one or more resources that represent the main resources. An example of a GDT OperationTypeCode 35800EX is:

<OperationTypeCode>1</OperationTypeCode>

The structure of GDT OperationTypeCode 35800EX is depicted in FIG. 358EX. For the GDT OperationTypeCode 35800EX, the Object Class is Operation 35804EX, the Property is Type 35806EX, the Representation/Association is Code 35808EX, the Type is CCT 35810EX, the Type Name is Code 35812EX and the Length is from one to four 35814EX. The remark 35815CP shows that GDT OperationTypeCode 35800EX may be restricted.

For the list Agency ID 35816EX, the Category is Attribute (A) 34518EX, the Object Class is Code List Agency 35820EX, the Property is Identification 35822EX, the Representation/Association is Identifier 35824EX, the Type is XSD 35826EX, and the Type Name is token 35828EX. The Cardinality is one 35830EX.

For the list Version ID 35832EX, the Category is Attribute (A) 34534EX, the Object Class is Code List 35836EX, the Property is Version 35838EX, the Representation/Association is Identifier 35840EX, the Type is XSD 35842EX, and the Type Name is token 35844EX. The Cardinality is one 35846EX.

For the list Agency-Scheme ID 35848EX, the Category is Attribute (A) 34550EX, the Object Class is Code List Agency 35852EX, the Property is Scheme 35854EX, the Representation/Association is Identifier 35856EX, the Type is XSD 35858EX, and the Type Name is token 35860EX. The Cardinality is zero or one 35862EX.

For the list Agency-Scheme Agency ID 35864EX, the Category is Attribute (A) 34566EX, the Object Class is Code List Agency 35868EX, the Property is Scheme Agency 35870EX, the Representation/Association is Identifier 35872EX, the Type is XSD 35874EX, and the Type Name is token 35876EX. The Cardinality is zero or one 35878EX.

An extendable SAP code list is assigned to the GDT OperationTypeCode 35800EX. Customers can change this code list. In its unchanged state, the SAP code list has the following attributes: listID="10132", listAgencyID="310", listVersionID=Version of the relevant code list assigned and managed by SAP AG. If A customer makes changes to the SAP code list, the values of the attributes are changed as follows: listAgencyID which is the ID of the Customer (ID from DE 3055 if listed there), listVersionID which is assigned and managed by the Customer, listAgencySchemeID which is the ID of the scheme if the listAgencyID is not taken from DE 3055, and listAgencySchemeAgencyID which is the ID of the organization (taken from DE 3055) that manages the scheme of the listAgencySchemeID.

Every GDT OperationTypeCode 35800EX has to be assigned to exactly one OperationCategoryCode. Together with the OperationCategoryCode this code builds up a two-level classification of operations. While the OperationCategoryCode with its fixed code list determines the business logic, the code list for the OperationTypeCode is extendable.

Example customer specific code values for the GDT OperationTypeCode 35800EX are one through seven. Make is code one. Make is a production operation. Pack is code two. Pack is a packing operation that can mean packing or unpacking. Move is code three. Move is a transportation operation. Material Count is code four. Material Count is an operation for counting the material physical inventory. In a material count, the quantity of materials is recorded. Logistic Unit Count is code five. Logistic Unit Count is an operation for counting the logistic unit physical inventory. In a logistic unit count, the quantity of logistic units is recorded. Handling Unit Count is code six. Handling Unit Count is an operation for counting the handling unit physical inventory. In a handling unit count, the IDs of the handling units are recorded. Count Approval is code seven. Count Approval is an operation for approving the result of a count operation.

(ssssssssssssss) OrganisationalCentreBusinessCharacterCode

A GDT OrganisationalCentreBusinessCharacterCode 35800EY is the coded representation of a business role of an organizational unit. An example of a GDT OrganisationalCentreBusinessCharacterCode 35800EY is:

<OrganisationalCentreBusinessCharacterCode>1</OrganisationalCentreBusinessCharacterCode>

The structure of GDT OrganisationalCentreBusinessCharacterCode 35800EY is depicted in FIG. 358EY. For the GDT OrganisationalCentreBusinessCharacterCode 35800EY, the Object Class is Organisational Centre 35802EY, the Property is Business Character 35804EY, the Representation/Association is Code 35806EY, the Type is CCT 35808EY, the Type Name is Code 35810EY, and the Length is from one to two 35812EY. The remark 35814EY shows that GDT OrganisationalCentreBusinessCharacterCode 35800EY may be restricted.

The GDT OrganisationalCentreBusinessCharacterCode 35800EY is an SAP code list. The GDT OrganisationalCentreBusinessCharacterCode 35800EY is a fixed code list. The attributes listID="10056", listAgencyID="310", listVersionID=(to be defined) are missing in the structure as they would be filled with constant values at run-time.

The GDT OrganisationalCentreBusinessCharacterCode 35800EY can include twelve codes. Code one is Company. For code one, the business role, Company, is assigned to the organizational unit. Code two is Segment. For code two, the business role, Segment, is assigned to the organizational unit. Code three is Profit center. For code three, the business role, Profit center, is assigned to the organizational unit. Code four is Cost center. For code four, the business role, Cost center, is assigned to the organizational unit. Code five is Site. For code five, the business role, Site, is assigned to the organizational unit. Code six is Logistics division. For code six, the business role, Logistics division, is assigned to the organizational unit. Code seven is Sales unit. For code seven, the business role, Sales unit, is assigned to the organizational unit. Code eight is Service unit. For code eight, the business role, Service unit, is assigned to the organizational unit. Code nine is Reporting line unit. For code nine, the business role, Reporting line unit, is assigned to the organizational unit. Code ten is Purchasing unit. For code ten, the business role, Purchasing unit, is assigned to the organizational unit. Code eleven is Shipping point. For code eleven, the business role, Shipping point, is assigned to the organizational unit. Code twelve is Program. For code twelve, the business role, Program, is assigned to the organizational unit.

The GDT OrganisationalCentreBusinessCharacterCode 35800EY is not used in cross-enterprise communication.

(tttttttttttttt) OrganisationalCentreHierarchyTypeCode

A GDT OrganisationalCentreHierarchyTypeCode 35800EZ is the coded representation of the nature of an organizational hierarchy. An example of a GDT OrganisationalCentreHierarchyTypeCode 35800EZ is:

<OrganisationalCentreHierarchyTypeCode>2</OrganisationalCentreHierarchyTypeCode>

The structure of GDT OrganisationalCentreHierarchyTypeCode 35800EZ is depicted in FIG. 358EZ. For the GDT OrganisationalCentreHierarchyTypeCode 35800EZ, the Object Class is Organisational Centre 35802EZ, the Property is Hierarchy Type 35804EZ, the Representation/Association is Code 35806EZ, the Type is CCT 35808EZ, the Type Name is Code 35810EZ, and the Length is from one to four 35812EZ. The remark 35814EZ shows that GDT OrganisationalCentreHierarchyTypeCode 35800EZ may be restricted.

A customer-specific code list is assigned to the code. A customer can determine the codes in the code list. The attributes of the code are assigned the following values: listID="10363", listAgencyID which is the ID of the Customer (ID from DE 3055, if listed there), listVersionID which is the version of the particular code list assigned and managed by the Customer, listAgencySchemeID which is the ID of the scheme if the listAgencyID does not come from DE 3055, listAgencySchemeAgencyID which is the ID of the organization from DE 3055 that manages the listAgencySchemeID scheme.

Examples of possible code uses for the code GDT OrganisationalCentreHierarchyTypeCode 35800EZ may include a code for organizational structure. For example, an organizational hierarchy is an organizational structure. Another code may be for a financial structure. An organizational hierarchy can also be a financial structure. Another code may be for a structure of a sales organization. An organizational hierarchy is a structure of a sales organization.

The GDT OrganisationalCentreHierarchyTypeCode 35800EZ must not be used in cross-enterprise communication.

(uuuuuuuuuuuuuu) OrganisationalCentreID

A GDT OrganisationalCentreID 35800FA is a unique identifier of an organizational unit.

An organizational unit is a business unit of an organizational structure, for example, an organizational structure or a financial structure, of an enterprise.

An organizational unit can take on one or several different business roles, for example, a company, a cost center, a permanent establishment or a reporting line unit. As a rule, an organizational unit is a business unit of the enterprise itself. However, it can also belong to a collaborative partner, if it is treated like an organizational unit of the enterprise itself in business processes.

An example of a GDT OrganisationalCentreID 35800FA is:

<OrganisationalCentreID>ABC4711</OrganisationalCentreID>

The structure of GDT OrganisationalCentreID 35800FA is depicted in FIG. 358FA. For the GDT OrganisationalCentreID 35800FA, the Object Class is Organisational Centre 35802FA, the Property is Identification 35804FA, the Representation/Association is Identifier 35806FA, the Type is CCT 35808FA, the Type Name is Identifier 35810FA, and the Length is from one to twenty 35812FA. The remark 35814FA shows that GDT OrganisationalCentreID 35800FA may be restricted.

The GDT OrganisationalCentreID 35800FA can be used when sender and recipient access reconciled master data. The GDT OrganisationalCentreID 35800FA must not be used in cross-enterprise communication. Explicit GDTs should be used here for the different business roles.

(vvvvvvvvvvvvvv) OrganisationalCentreTypeCode

A GDT OrganisationalCentreTypeCode 35800FB is the coded representation of the nature of an organizational unit. An example of a GDT OrganisationalCentreTypeCode 35800FB is:

<OrganisationalCentreTypeCode>1</OrganisationalCentreTypeCode>

The structure of GDT OrganisationalCentreTypeCode 35800FB is depicted in FIG. 358FB. For the GDT OrganisationalCentreTypeCode 35800FB, the Object Class is Organisational Centre 35802FB, the Property is Type 35804FB, the Representation/Association is Code 35806FB, the Type is CCT 35808FB, the Type Name is Code 35810FB, and the Length is from one to four 35812FB. The remark 35814FB shows that GDT OrganisationalCentreTypeCode 35800FB may be restricted.

A customer-specific code list is assigned to the code. A customer can determine the codes in the code list. The attributes of the code are assigned the following values: listID="10364", listAgencyID which is the ID of the Customer (ID from DE 3055, if listed there), listVersionID which is the version of the particular code list assigned and managed by the Customer, listAgencySchemeID which is the ID of the scheme if the listAgencyID does not come from DE 3055, listAgencySchemeAgencyID which is the ID of the organization from DE 3055 that manages the listAgencySchemeID scheme.

A customer can define its own types of organizational units. These types contain the assignment of different business roles, and preset attribute values, for example.

Examples of possible code values for the GDT OrganisationalCentreTypeCode 35800FB are Department, Store and Branch. Department is an organizational unit that has the nature of a department. Store is an organizational unit that has the nature of a store. Branch is an organizational unit that has the nature of a branch.

The GDT OrganisationalCentreTypeCode 35800FB must not be used in cross-enterprise communication.

(wwwwwwwwwwwwwww) PackingBillOfMaterialID

A GDT PackingBillOfMaterialID 35800FC is a unique identifier of a packing bill of material. A packing bill of material is a complete and structured list of components that defines the packing structure of logistic units (LUs). An example of a GDT PackingBillOfMaterialID 35800FC is:

<PackingBillOfMaterialID>12345678901234567890</PackingBillOfMaterialID>

The structure of GDT PackingBillOfMaterialID 35800FC is depicted in FIG. 358FC. For the GDT PackingBillOfMaterialID 35800FC, the Object Class is Packing Bill Of Material 35802FC, the Property is Identification 35804FC, the Representation/Association is Identifier 35806FC, the Type is CCT 35808FC, the Type Name is Identifier 35810FC, and the Length is from one to twenty 35812FC. The remark 35814FC shows that GDT PackingBillOfMaterialID 35800FC may be restricted.

For the scheme Agency ID 35816FC, the Category is Attribute (A) 34518FC, the Object Class is Identification Scheme-Agency 35820FC, the Property is Identification 35822FC, the Representation/Association is Identifier 35824FC, the Type is XSD 35826FC, the Type Name is token 35828FC, and the Length is from one to sixty 35830FC. The Cardinality is zero or one 35832FC.

The scheme Agency ID 35816FC is the Business System in which the identifier was assigned. The GDT is defined with a length of twenty characters in accordance with the /SCWM/DE_PSID (CHAR20).

(xxxxxxxxxxxxxxx) PackingBillOfMaterialItemID

A GDT PackingBillOfMaterialItemID 35800FD is a unique identifier of an item of a packing bill of material. An item of a packing bill of material is either a certain quantity of content to be packed or a packaging material that can be used for packaging. An example of a GDT PackingBillOfMaterialItemID 35800FD is:

<PackingBillOfMaterialItemID>5</PackingBillOfMaterialItemID>

The structure of GDT PackingBillOfMaterialItemID 35800FD is depicted in FIG. 358FD. For the GDT PackingBillOfMaterialItemID 35800FD, the Object Class is Packing Bill Of Material Item 35802FD, the Property is Identification 35804FD, the Representation/Association is Identifier 35806FD, the Type is CCT 35808FD, the Type Name is Identifier 35810FD, and the Length is from one to eight 35812FD. The remark 35814FD shows that GDT PackingBillOfMaterialItemID 35800FD may be restricted.

The GDT PackingBillOfMaterialItemID 35800FD is a sequence of numbers with a maximum length of eight characters. Leading zeros are not significant. The GDT PackingBillOfMaterialItemID 35800FD can be used to enumerate the several items of a packing bill of material. The GDT is defined with a length of eight characters in accordance with the data element/SCWM/DE_PS_CONTENT_SEQ (CHAR8).

(yyyyyyyyyyyyyyy) PartialDeliveryControlCode

A GDT PartialDeliveryControlCode 35800FE is the coded representation of the partial delivery control. The partial delivery control specifies whether and in which form a customer allows partial deliveries. An example of a GDT PartialDeliveryControlCode 35800FE is:

<PartialDeliveryControlCode>1</PartialDeliveryControlCode>

The structure of GDT PartialDeliveryControlCode 35800FE is depicted in FIG. 358FE. For the GDT PartialDeliveryControlCode 35800FE, the Object Class is Partial Delivery 35802FE, the Property is Control 35804FE, the Representation/Association is Code 35806FE, the Type is CCT 35808FE, the Type Name is Code 35810FE, and the Length is from one to two 35812FE. The remark 35814FE shows that GDT PartialDeliveryControlCode 35800FE may be restricted.

The GDT PartialDeliveryControlCode 35800FE is a fixed SAP code list. The attributes are as follows: listID="10095", listAgencyID="310", and listVersionID which is the version of the relevant code list assigned and managed by SAP AG.

The code list for the GDT PartialDeliveryControlCode 35800FE includes values from one to seven. This code list is fixed and may not be changed by the customer.

Code one is partial delivery indicating that partial deliveries are allowed. Code two is one-time delivery on requested delivery date/time, indicating that only one delivery on the requested delivery date/time is allowed. Code three is complete delivery indicating that only a complete delivery, i.e. the entire quantity, is allowed. Code four is complete delivery of order indicating, for the order that only a complete delivery, i.e. the entire quantity, is allowed. Code five is one-time delivery of order on requested delivery date/time. This indicates that for the order only one delivery on the requested delivery date/time is allowed. Code six is one-time delivery of item on requested delivery date/time. This indicates that for the item only one delivery on the requested delivery date/time is allowed. Partial deliveries for the order are allowed. Code seven is complete delivery item. This indicates that for the item only a complete delivery, i.e. the entire quantity, is allowed. Partial deliveries for the order are allowed.

The GDT PartialDeliveryControlCode 35800FE may currently be used in business objects and A2A messages. In the code list only one value for describing partial delivery agreements is allowed. Codes 1, 2, 3 are to be used only for documents. Codes 4, 5, 6, 7 are to be used for master data. The GDT PartialDeliveryControlCode 35800FE can be used, for example, in the sales order and in the customer master. The individual characteristics of the partial delivery control specify basic delivery agreements with reference to the maximum number of partial deliveries, date/time and quantity tolerances, and delivery groups that may be taken into consideration when deliveries are created.

(zzzzzzzzzzzzzzz) PaymentAdviceTypeCode

A GDT PaymentAdviceTypeCode 35800FF is the coded representation of the type of a payment advice note. An example of a GDT PaymentAdviceTypeCode 35800FF is:

<PaymentAdviceTypeCode>1</PaymentAdviceTypeCode>

The structure of GDT PaymentAdviceTypeCode 35800FF is depicted in FIG. 358FF. For the GDT PaymentAdviceTypeCode 35800FF, the Object Class is Payment Advice 35802FF, the Property is Type 35804FF, the Representation/Association is Code 35806FF, the Type is CCT 35808FF, the Type Name is Code 35810FF, and the Length is from one to two 35812FF. The remark 35814FF shows that GDT PaymentAdviceTypeCode 35800FF may be restricted.

The GDT PaymentAdviceTypeCode 35800FF is an SAP code list with the implicitly given attributes listID="10058", listAgencyID="310" and listVersionID="tbd".

The code list for the GDT PaymentAdviceTypeCode 35800FF includes codes one, two and three. Code one indicates a business partner payment advice note, which is a payment advice note from the business partner. Code two indicates a debit payment advice note. A debit payment advice note is a payment advice note from the house bank which notifies of a debit of the receiver's bank account. Code three indicates a credit memo payment advice note. A credit memo payment advice note is a payment advice note from the house bank which notifies of a cash receipt to the receiver's bank account.

The GDT PaymentAdviceTypeCode 35800FF can be used to specify the type of a payment advice note. In the liquidity forecast, assumptions can be made about the time and probability of an incoming payment of the notified amount.

A payment advice note message with the PaymentAdviceTypeCode 1 corresponds to the IDoc message type REMADV.A payment advice note message with the PaymentAdviceTypeCode 2 corresponds to the IDoc message type DEBADV. A payment advice note message with the PaymentAdviceTypeCode 3 corresponds to the IDoc message type CREADV.

(aaaaaaaaaaaaaaaa) PaymentBlock

A GDT PaymentBlock 35800FG specifies the reason and time for a business document block in payment transactions. An example of a GDT PaymentBlock 35800FG is:

```
<PaymentBlock>
<BlockingReasonCode>1</BlockingReasonCode>
<ExpirationDateTime>2004-04-19T12:21Z</ExpirationDateTime>
<CreationUserAccountID>4711</CreationUserAccountID>
<CreationDateTime>2004-04-19T12:21Z</CreationDateTime>
</PaymentBlock>
```

The structure of GDT PaymentBlock 35800FG is depicted in FIG. 358FG. For the GDT PaymentBlock 35800FG, the Object Class is Payment Block 35802FG, the Representation/Association is Details 35804FG, and the Type is GDT 35806FG.

For the Blocking Reason Code 35808FG, the Category is Element (E) 34510FG, the Object Class is Payment Block 35812FG, the Property is Blocking Reason Code 35814FG, the Representation/Association is Code 35816FG, the Type is GDT 35818FG, and the Type Name is Blocking Reason Code 35820FG. The Cardinality is zero or one 35822FG.

For the Expiration Date Time 35824FG, the Category is Element (E) 34526FG, the Object Class is Payment Block 35828FG, the Property is Expiration Date Time 35830FG, the Representation/Association is Date Time 35832FG, the Type is GDT 35834FG, and the Type Name is Date Time 35836FG. The Cardinality is one 35838FG.

For the Creation User Account ID 35840FG, the Category is Element (E) 34542FG, the Object Class is Payment Block 35844FG, the Property is Creation User Account ID 35846FG, the Representation/Association is Identifier 35848FG, the Type is GDT 35850FG, and the Type Name is User Account ID 35852FG. The Cardinality is zero or one 35854FG.

For the Creation Date Time 35856FG, the Category is Element (E) 34558FG, the Object Class is Payment Block 35860FG, the Property is Creation Date Time 35862FG, the Representation/Association is Date Time 35864FG, the Type is GDT 35866FG, and the Type Name is Date Time 35868FG. The Cardinality is zero or one 35870FG.

The Blocking Reason Code 35808FG specifies the reason for the PaymentBlock. The Expiration Date Time 35824FG specifies the date and time until the block is valid. The Creation User Account ID 35840FG specifies the user ID of the person who has set the PaymentBlock. The Creation Date Time 35856FG specifies the date and time when the PaymentBlock was set.

A time stamp 9999-12-31T23:59:59Z in the Expiration Date Time 35824FG means that the block is valid indefinitely. The PaymentBlock can be used, for example, in invoices to block them for payment.

(bbbbbbbbbbbbbbbb) PaymentCardCategoryCode

A GDT PaymentCardCategoryCode 35800FH is the coded representation of the category of a payment card. Payment cards are divided into a few categories according to the criteria acceptance and function, for example, in credit cards and customer cards. An example of a GDT PaymentCardCategoryCode 35800FH is:

<PaymentCardCategoryCode>1</PaymentCardCategoryCode>

The structure of GDT PaymentCardCategoryCode 35800FH is depicted in FIG. 358FH. For the GDT PaymentCardCategoryCode 35800FH, the Object Class is Payment Card 35802FH, the Property is Category 35804FH, the Representation/Association is Code 35806FH, the Type is CCT 35808FH, the Type Name is Code 35810FH, and the Length is from one to two 35812FH. The remark 35814FH shows that GDT PaymentCardCategoryCode 35800FH may be restricted.

The GDT PaymentCardCategoryCode 35800FH is a fixed SAP code list. The attributes of the CCT Code are filled implicitly with the following values: listID="10059", listAgencyID="310", and listVersionID which is the version of the code list assigned and administered by SAP AG.

The GDT PaymentCardCategoryCode 35800FH can be used in the GDT PaymentCard. Possible code values for the GDT PaymentCardCategoryCode 35800FH are one, two and three. One is a credit card indicating that the payment card is a credit card. Two is a debit card indicating the payment card is a payment card on the basis of sufficient funds. Three is a customer card indicating the payment card is a customer card with payment function.

(cccccccccccccccc) PaymentCardTypeCode

A GDT PaymentCardTypeCode 35800FI is the coded representation of the type of payment card. An example of a GDT PaymentCardTypeCode 35800FI is:

<PaymentCardTypeCode>3</PaymentCardTypeCode>

The structure of GDT PaymentCardTypeCode 35800FI is depicted in FIG. 358FI. For the GDT PaymentCardTypeCode 35800FI, the Object Class is Payment Card 35802FI, the Property is Payment Card Type 35804FI, the Representation/Association is Code 35806FI, the Type is CCT 35808FI, the Type Name is Code 35810FI, and the Length is from one to four 35812FI. The remark 35814FI shows that GDT PaymentCardTypeCode 35800FI may be restricted.

The GDT PaymentCardTypeCode 35800FI can be used in the GDT PaymentCard. There can be five code values for the GDT PaymentCardTypeCode 35800FI. One is American Express for an American Express card. Two is VISA for a VISA card. Three is Mastercard for a Mastercard card. Four is Diners for a Diners card. Five is maestro for maestro.

The GDT PaymentCardTypeCode 35800FI is a fixed SAP code list. The attributes of the CCT Code are filled implicitly with the following values: listID="10060", listAgencyID="310", and listVersionID which is the version of the code list assigned and administered by SAP AG.

(dddddddddddddddd) PaymentDifferenceReasonCode

A GDT PaymentDifferenceReasonCode 35800FJ is the coded representation of the reason for a payment difference. A payment difference is the amount-based difference between the expected payment and the actual payment. A reason for a payment difference may be the deduction of freight costs. An example of a GDT PaymentDifferenceReasonCode 35800FJ is:

<PaymentDifferenceReasonCode>40</PaymentDifferenceReasonCode>

The structure of GDT PaymentDifferenceReasonCode 35800FJ is depicted in FIG. 358FJ. For the GDT PaymentDifferenceReasonCode 35800FJ, the Object Class is Payment Difference 35802FJ, the Property is Reason 35804FJ, the Representation/Association is Code 35806FJ, the Type is CCT 35808FJ, the Type Name is Code 35810FJ, and the Length is from one to three 35812FJ. The remark 35814FJ shows that GDT PaymentDifferenceReasonCode 35800FJ may be restricted.

Exactly one fixed standard code list UN/EDIFACT 4465 is permitted (www.unece.org/trade/untdid/d00a/tred/tred4465.htm) is to be assigned to the code. The attributes can be assigned values as follows: listID="4465", listAgencyID="6", listVersionID=[version of the code list which is assigned by the standardization organization (if available)].

(eeeeeeeeeeeeeeee) PaymentInstruction

A GDT PaymentInstruction 35800FK is an instruction about how a payment should be carried out or which additional activities should be carried out within a payment. An example of a GDT PaymentInstruction 35800FK is:

Payee should be called:

```
<PaymentInstruction>
    <ID>1</ID>
    <Code listID="MT103" listAgencyID="17">PHOB</Code>
    <CodeDescription>Telephone notification to beneficiary</
    CodeDescription>
<Note>+49 6227 747474</Note>
</PaymentInstruction>
Payment should only take place after the payee has been identified:
<PaymentInstruction>
    <ID>2</ID>
```

-continued

```
    <Code listID="MT103" listAgencyID="17">HOLD</Code>
    <CodeDescription>Payment only after identification</
    CodeDescription>
</PaymentInstruction>
```

The structure of GDT PaymentInstruction 35800FK is depicted in FIG. 358FK. For the GDT PaymentInstruction 35800FK, the Representation/Association is Details 35802FK.

For the ID 35804FK, the Representation/Association is Identifier 35806FK, the Type is CCT 35808FK, the Type Name is Identifier 35810FK, and the Length is one 358312FK. The Cardinality is one 35814FK For the Code 35816FK, the Representation/Association is Code 35818FK, the Type is GDT 35820FK, the Type Name is Payment Instruction Code 35822FK. The Cardinality is one 35824FK.

For the Code Description 35826FK, the Representation/Association is Text 35828FK, the Type is GDT 35830FK, the Type Name is Description 35832FK. The Cardinality is zero or one 35834FK.

For the Note 35836FK, the Representation/Association is Text 35838FK, the Type is GDT 35840FK, the Type Name is Note 35842FK. The Cardinality is zero or one 35844FK.

The ID 35804FK is an identifier for an instruction, i.e. position number. Up to four instructions are possible for a payment order in payment transactions. The position number identifies these instructions. In some countries, the code of the instruction can be interpreted together with the position number. The Code 35816FK is a type of instruction. The Code Description 35826FK is a description of the type of instruction. The Note 35836FK is an additional note with textual information that can be interpreted by an accounting clerk dependent on the GDT PaymentInstruction 35800FK.

Instructions can be entered with a payment order to note that the recipient wants to be called by his bank as soon as the payment arrives or to note that the payment can be carried out if the recipient can identify himself.

(ffffffffffffffff) PaymentInstructionCode

A GDT PaymentInstructionCode 35800FL is the coded representation of an instruction for a payment. An example of a GDT PaymentInstructionCode 35800FL is:

<PaymentInstructionCode>PHON</PaymentInstructionCode>

The structure of GDT PaymentInstructionCode 35800FL is depicted in FIG. 358FL. For the GDT PaymentInstructionCode 35800FL, the Object Class is Payment Instruction 35802FL, the Representation/Association is Code 35804FL, the Type is CCT 35806FL, the Type Name is Code 35808FL and the Length is from one to ten 35810FL. The remark 35812FL shows that GDT PaymentInstructionCode 35800FL may be restricted.

For the list ID 35814FL, the Category is Attribute (A) 34516FL, the Object Class is Code List 35818FL, the Property is Identification 35820FL, the Representation/Association is Identifier 35822FL, the Type is XSD 35824FL, the Type Name is token 35826FL, and the Length is from one to ten 35827FL. The Cardinality is optional 35828FL.

For the list Agency ID 35830FL, the Category is Attribute (A) 34532FL, the Object Class is Code List Agency 35834FL, the Property is Identification 35836FL, the Representation/Association is Identifier 35838FL, the Type is XSD 35840FL, the Type Name is token 35842FL, and the Length is from one to sixty 35843FL. The Cardinality is optional 35844FL.

For the list Agency-Scheme Agency ID 35846FL, the Category is Attribute (A) 34548FL, the Object Class is Code List Agency 35850FL, the Property is Scheme Agency 35852FL, the Representation/Association is Identifier 35854FL, the Type is XSD 35856FL, the Type Name is token 35858FL, and the Length is from one to three 35859FL. The Cardinality is optional 35860FL.

Examples of code lists that may be used with the GDT PaymentInstructionCode 35800FL are standard code lists, country-specific code lists and a proprietary code list.

The attributes are filled as follows to identify standard code lists: listAgencyID=Entry of the organization that the code list assigns in DE3055. The following code lists for the listAgencyID are supported at present: listAgencyID="17" for the code lists according to S.W.I.F.T. guide, and listID=<Name of the SWIFT message format for this instruction code> such as "MT103". The listAgencySchemeAgencyID is not applicable The attributes are filled as follows to identify country-specific code lists: listAgencyID=ISO code of the country according to ISO 3166-1, and listAgencySchemeAgencyID="5" (entry for ISO in DE3055). The attributes are filled as follows to identify the SAP proprietary code list: listID="100611", listAgencyID="310", and listAgencySchemeAgencyID is not applicable.

A code list consists of a Payment Instruction Code associated with a position. The position describes the position number of the instruction in which a code can be used. There are fifty-seven Payment Instruction Codes. Payment Instruction Code one is located at position one and indicates a letter (AT). Payment Instruction Code two is located at position two and indicates a letter/airmail (AT). Payment Instruction Code three is located at position one and indicates a printed matter (AT). Payment Instruction Code four is located at position two and indicates a printed matter/airmail (AT). Payment Instruction Code five is located at positions one to three and indicates certified mail (AT). Payment Instruction Code six is located at position two and indicates certified mail/airmail (AT). Payment Instruction Code seven is located at position four and indicates normal (AT). Payment Instruction Code eight is located at position three and indicates standard normal (AT). Payment Instruction Code nine is located at position one and indicates a collection (BR). Payment Instruction Code ten is located at position one and indicates due date is changed (BR). Payment Instruction Code eleven is located at position one and indicates field 'Seu numero' changed (BR). Payment Instruction Code twelve is located at position one and indicates field 'Uso da empresa' changed (BR). Payment Instruction Code thirteen is located at position one and indicates rebate (abatimento) (BR). Payment Instruction Code fourteen is located at position one and indicates rebate is cancelled (BR). Payment Instruction Code fifteen is located at position one and indicates carried out by notary (BR). Payment Instruction Code sixteen is located at position one and indicates cancellation (BR). Payment Instruction Code seventeen is located at position one and indicates regular payment order (FI). Payment Instruction Code eighteen is located at position one and indicates S.W.I.F.T. check (FI). Payment Instruction Code nineteen is located at position one and indicates transfer to an account at the same bank (FI). Payment Instruction Code twenty is located at position one and indicates Mail transfer (M.T.) (JP). Payment Instruction Code twenty-one is located at position three and indicates hedged exchange rate (JP). Payment Instruction Code twenty-two is located at position three and indicates current rate of exchange (JP). Payment Instruction Code twenty-three is located at position three and indicates current rate of exchange: payment in JPY equivalent (JP). Payment Instruction Code twenty-four is located at position three and indicates current rate of exchange: payment in PYCUR equivalent (JP). Payment Instruction Code twenty-five is located at position one and indicates telegraphic transfer (T.T.) (JP). Payment Instruction Code twenty-six is located at position two and indicates payment to account (JP). Payment Instruction Code twenty-seven is located at position three and indicates payment in Japanese yen (JP). Payment Instruction Code twenty-eight is located at position two and indicates payment following notification (JP). Payment Instruction Code thirty is located at position one and indicates AutoGiro with notification (NO). Payment Instruction Code thirty-one is located at position one and indicates AutoGiro without notification (NO). Payment Instruction Code thirty-two is located at position two and indicates generate bank check (post office bank, NO). Payment Instruction Code thirty-three is located at position two and indicates payment internal to post office bank (NO). Payment Instruction Code thirty-four is located at position two and indicates payment via Nordpay (post office bank, NO). Payment Instruction Code thirty-five is located at position two and indicates rapid money transfer (post office bank, NO). Payment Instruction Code thirty-six is located at positions one to four and indicates notification to beneficiary's bank on best method (SWIFT: "TELE"). Payment Instruction Code thirty-seven is located at positions one to four and indicates notification to beneficiary on best method (SWIFT: "TELB"). Payment Instruction Code thirty-eight is located at positions one to four and indicates notification to intermediary bank on best method (SWIFT: "TELI"). Payment Instruction Code thirty-nine is located at positions one to four and indicates confirmation of time and day of payment was made (SWIFT: "CONFIRM"). Payment Instruction Code forty is located at positions one to four and indicates telephone notification to beneficiary's bank (SWIFT: "PHON"). Payment Instruction Code forty-one is located at positions one to four and indicates telephone notification to beneficiary (SWIFT: "PHOI"). Payment Instruction Code forty-two is located at positions one to four and indicates telephone notification to intermediary bank (SWIFT: "PHOB"). Payment Instruction Code forty-three is located at positions one to four and indicates payment to beneficiary only (SWIFT: "BONL"). Payment Instruction Code forty-four is located at positions one to four and indicates payment by check only (SWIFT: "CHQB"). Payment Instruction Code forty-five is located at positions one to four and indicates payment only after identification (SWIFT: "HOLD"). Payment Instruction Code forty-six is located at positions one to four and indicates payment in settlement of a trade (SWIFT: "CORT"). Payment Instruction Code forty-seven is located at positions one to four and indicates payment between companies from the same group (SWIFT: "INTC"). Payment Instruction Code forty-eight is located at positions one to four and indicates immediate payment/express payment order (SWIFT: "URGP"). Payment Instruction Code forty-nine is located at positions one to four and indicates payment by agreed instruction (SWIFT: "OTHR"). Payment Instruction Code fifty is located at positions one to four and indicates payment using gross settlement system (SWIFT: "RTGS"). Payment Instruction Code fifty-one is located at positions one to four and indicates payment using net settlement system (SWIFT: "NETS"). Payment Instruction Code fifty-two is located at positions one to four and indicates same day value date at the beneficiary (SWIFT: "SDVA"). Payment Instruction Code fifty-three is located at positions one to four and indicates following instructions are for beneficiary's bank (SWIFT: "ACC"). Payment Instruction Code fifty-four is located at positions one to four and indicates following instructions are for recipient's correspondent bank (SWIFT: "REC"). Payment Instruction Code fifty-five is located at positions one to four and indicates following instructions are for intermediary bank (SWIFT: "INT"). Payment Instruction Code fifty-six is located at positions one to four and indicates instructing institution (SWIFT: "INS"). Payment Instruction Code fifty-seven is located at positions one to four and indicates information for the beneficiary (SWIFT: "BNF").

Some country-specific instruction codes can be interpreted together with the position number of the instruction. In this case, the country-specific code lists contain the position number and instruction code. The GDT PaymentInstructionCode 35800FL may be used in the GDT PaymentInstruction.

(gggggggggggggggg) InventoryValuationProcedureCode

A GDT InventoryValuationProcedureCode 35800FM is the coded representation of a valuation procedure for an inventory. An inventory valuation procedure is a procedure that determines the monetary value of an inventory. This procedure describes the influence of a business transaction on the inventory value and consequently on the calculation of the inventory price. An example of GDT InventoryValuationProcedureCode 35800FM is:

<InventoryValuationProcedureCode>1</InventoryValuationProcedureCode

The structure of GDT InventoryValuationProcedureCode 35800FM is depicted in FIG. 358FM. For the GDT InventoryValuationProcedureCode 35800FM, the Object Class is Inventory Valuation Procedure 35802FM, the Representation/Association is Code 35804FM, the Type is CCT 35806FM, the Type Name is Code 35808FM and the Length is from one to three 35810FM.

A customer-specific code list is assigned to a code. A customer can determine the codes in a code list. The attributes of the code are assigned the following values: listAgencyID which is the ID of the Customer (ID from DE 3055, if listed there), listVersionID which is the version of the particular code list. Assigned and managed by the Customer, listAgencySchemeID which is the ID of the scheme if the listAgencyID does not come from DE 3055, or listAgencySchemeAgencyID which is the ID of the organization from DE 3055 that manages the listAgencySchemeID scheme Only one code list is allowed for a GDT InventoryValuationProcedureCode 35800FM. This code list is supplied by SAP and must not be changed by the customer. The attributes of the code are assigned the following values: listID="10054", listAgencyID="310", and listVersionID is the version of the code list which is assigned and administered by SAP AG and is to be determined.

The value range of the GDT InventoryValuationProcedureCode 35800FM may comprise a proprietary code list. Possible values are one and two. One describes the Standard Price valuation procedure. The Standard Price procedure valuates the inventory at a constant inventory price. This price is usually calculated in standard cost planning. Two describes the Moving Average Price valuation procedure. The Moving Average Price procedure valuates the inventory at a moving average price. The moving average price is recalculated after each business transaction.

(hhhhhhhhhhhhhhhh) LegalEntityTypeCode

A GDT LegalEntityTypeCode 35800FN can represent, in the form of a code, a type of legal entity. A legal entity or legal person is a legal construct with rights and obligations, such as the possibility to sign a contract, and to sue or be sued.

This construct is generally an organization, such as a company or a government, that is composed exclusively of natural persons and that is treated under certain circumstances as a person in the eyes of the law. This person does not, however, correspond to the persons of which it is composed.

The legal personality of a legal person, including any rights, obligations, commitments and transactions, exists independently of every legal or natural person of which it is composed. Thus, the legal liability of a legal entity does not correspond to the legal liability of the natural persons involved. The following are examples of legal entities: Cooperatives, associations, banks, stock corporations, joint stock companies, corporations, government institutions, municipalities, states, political parties, trade unions, trust companies. An example of a GDT LegalEntityTypeCode 35800FN is:

<LegalEntityTypeCode>2</LegalEntityTypeCode>

The structure of GDT LegalEntityTypeCode 35800FN is depicted in FIG. 358FN. For the GDT LegalEntityTypeCode 35800FN, the Property is Legal Entity Type 35802FN, the Representation/Association is Code 35804FN, the Type is CCT 35806FN, the Type Name is Code 35808FN and the Length is from one to two 35810FN. The remark 35812FN shows that GDT LegalEntityTypeCode 35800FN may be restricted.

For the list ID 35814FN, the Category is Attribute 34516FN, the Object Class is Code List 35818FN, the Property is Identification 35820FN, the Representation/Association is Identifier 35822FN, the Type is XSD 35824FN, and the Type Name is token 35826FN. The Cardinality is zero or one 35828FN.

For the list Agency ID 35830FN, the Category is Attribute 34532FN, the Object Class is Code List Agency 35834FN, the Property is Identification 35836FN, the Representation/Association is Identifier 35838FN, the Type is XSD 35840FN, and the Type Name is token 35842FN. The Cardinality is zero or one 35844FN.

For the list Version ID 35846FN, the Category is Attribute 34548FN, the Object Class is Code List 35850FN, the Property is Version 35852FN, the Representation/Association is Identifier 35854FN, the Type is XSD 35856FN, and the Type Name is token 35858FN. The Cardinality is zero or one 35860FN.

For the list Agency-Scheme ID 35862FN, the Category is Attribute 34564FN, the Object Class is Code List Agency 35866FN, the Property is Scheme 35868FN, the Representation/Association is Identifier 35870FN, the Type is XSD 35872FN, and the Type Name is token 35874FN. The Cardinality is zero or one 35876FN.

For the list Agency-Scheme Agency ID 35878FN, the Category is Attribute 34580FN, the Object Class is Code List Agency 35882FN, the Property is Scheme Agency 35884FN, the Representation/Association is Identifier 35886FN, the Type is XSD 35888FN, and the Type Name is token 35890FN. The Cardinality is zero or one 35892FN.

A customer-specific code list is assigned to the code. A customer can determine the codes in the code list. The attributes of the code are assigned the following values: listID="10354", listAgencyID which is the ID of the Customer (ID from DE 3055, if listed there), listVersionID which is the version of the particular code list assigned and managed by the Customer, listAgencySchemeID which is the ID of the scheme if the listAgencyID does not come from DE 3055, and listAgencySchemeAgencyID which is the ID of the organization from DE 3055 that manages the listAgencySchemeID scheme.

The GDT LegalEntityTypeCode 35800FN is essentially used to classify the legal entities of institutions, events, companies, archives, public authorities, natural parks, campaigns (Bread for the World), institutions, and so on. One of its uses with regard to the Business Partner, for example, is in the context of statutory reporting by insurance companies in Germany to the Federal Financial Supervisory Authority (BaFin). Business partners or their legal entities are thereby classified according to BaFin guidelines. The BaFin uses this information to analyze risk spreading. Examples of the possible semantics of the codes are: Central bank where the legal entity is a central bank, Association of local authorities where the legal entity is an association of local authorities, Society where the legal entity is a society, and Individual enterprise where the legal entity is an individual enterprise.

The following dictionary objects can be assigned to this GDT in mySAP systems: Data element: BU_LEGAL_ORG and Domain: BU_LEGAL_ORG.

(iiiiiiiiiiiiiii) LoanAmortizementCondition

A GDT LoanAmortizementCondition 35800FO is a repayment condition for a loan. It regulates the conditions to which a loan is to be repaid. A loan can be repaid in the form of regular partial amounts or as a single amount. Types of repayment that are possible include final repayment where the loan is repaid at the end of its term in one amount. Another type of repayment is annuity repayment where annuity comprises initial repayment and interest amount. Over time the repayment amount increases and the interest amount decreases. Installment repayment is a type of repayment where the loan is repaid in equal installments. An example of a GDT LoanAmortizementCondition 35800FO is:

```
<LoanAmortizementCondition>
    <CalculationDateRecurrence>
        <Period>
                <StartDate>2005-01-01</StartDate>
    <EndDate>2010-01-01</EndDate>
</Period>
            <Duration>P1M</Duration>
            <DaysValue>31</DaysValue>
    </CalculationDateRecurrence>
    <DueDateRecurrence>
            <Duration>P1M</Duration>
    <Period>
                <StartDate>2005-01-01</StartDate>
                <EndDate>2010-01-01</EndDate>
    </Period>
    </DueDateRecurrence>
    <AnnuityRatePercent>3</AnnuityRatePercent>
</LoanAmortizementCondition>
```

The repayment condition is valid for the period from Jan. 1, 2005-Jan. 1, 2010. An initial repayment of 3% has been agreed. The repayment is calculated at the end of the month. The first due date for repayment is Jan. 1, 2005.

The structure of GDT LoanAmortizementCondition 35800FO is depicted in FIG. 358FO. For the GDT LoanAmortizementCondition 35800FO, the Object Class is Loan Amortizement Condition 35801FO, the Property is Details 35802FO.

For the Calculation Date Recurrence 35803FO, the Category is Element 35804FO, the Object Class is Loan Amortizement Condition 35805FO, the Property is Calculation Date 35806FO, the Representation/Association is Recurrence 35807FO, the Type is GDT 35808FO, and the Type Name is Period Duration Day Recurrence 35809FO. The Cardinality is zero or one 35810FO.

For the Due Date Recurrence 35811FO, the Category is Element 34512FO, the Object Class is Loan Amortizement Condition 35813FO, the Property is Due Date 35814FO, the Representation/Association is Recurrence 35815FO, the Type is GDT 35816FO, and the Type Name is Period Duration Day Recurrence 35817FO. The Cardinality is zero or one 35818FO.

For the Total Amorizement Indicator 35819FO, the Category is Element 34520FO, the Object Class is Loan Amortizement Condition 35821FO, the Property is Total Amorizement 35822FO, the Representation/Association is Indicator 35823FO, the Type is GDT 35824FO, and the Type Name is Total Amorizement Indicator 35825FO. The Cardinality is zero or one 35826FO.

For the Annuity Rate Percent 35827FO, the Category is Element 34528FO, the Object Class is Loan Amortizement Condition 35829FO, the Property is Annuity Rate 35830FO, the Representation/Association is Percent 35831FO, the Type is GDT 35832FO, and the Type Name is Percent 35833FO. The Cardinality is zero or one 35834FO.

For the Annuity Rate Amount 35835FO, the Category is Element 34536FO, the Object Class is Loan Amortizement Condition 35837FO, the Property is Annuity Rate 35838FO, the Representation/Association is Amount 35839FO, the Type is GDT 35840FO, and the Type Name is Amount 35841FO. The Cardinality is zero or one 35842FO.

For the Installment Rate Percent 35843FO, the Category is Element 34544FO, the Object Class is Loan Amortizement Condition 35845FO, the Property is Installment Rate 35846FO, the Representation/Association is Percent 35847FO, the Type is GDT 35848FO, and the Type Name is Percent 35849FO. The Cardinality is zero or one 35850FO.

For the Installment Rate Amount 35851FO, the Category is Element 34552FO, the Object Class is Loan Amortizement Condition 35853FO, the Property is Installment Rate 35854FO, the Representation/Association is Amount 35855FO, the Type is GDT 35856FO, and the Type Name is Amount 35857FO. The Cardinality is zero or one 35858FO.

The Amortizement Condition may include seven elements. Calculation Date Recurrence indicates the regular recurring date when repayment is calculated. Due Date Recurrence indicates the regular recurring date for the due date for a repayment. Total Amortizement Indicator is an indicator showing that the loan is repaid at the end of the term in a single amount. Annuity Rate Percent indicates an annuity repayment as a percentage. Annuity Rate Amount indicates an annuity repayment as an amount. Installment Rate Percent indicates an installment repayment as a percentage. Installment Rate Amount indicates a repayment amount when paying in installments.

One of the following optional elements: Total Amortizement Indicator. Annuity Rate Percent, Annuity Rate Amount, Installment Rate Percent, Installment Rate Amount may need to be stated.

(jjjjjjjjjjjjjjjj) LoanFeeCondition

A GDT LoanFeeCondition 35800FP is the fee condition for a loan. Lenders charge fees for managing a loan account. The fees are either due as a single payment or in a payment cycle. An example of a GDT LoanFeeCondition 35800FP is:

```
<LoanFeeCondition>
    <LoanFeeTypeCode>4711</LoanFeeTypeCode>
    <CalculationDateRecurrence>
    <Period>
            <StartDate>2005-01-01</StartDate>
            <EndDate>2010-01-01</EndDate>
    </Period>
        <Duration>P1Y</Duration>
        <OffsetDuration>P1Y</OffsetDuration>
    </CalculationDateRecurrence>
```

-continued

```
<DueDateRecurrence>
<Period>
    <StartDate>2005-01-01</StartDate>
    <EndDate>2010-01-01</EndDate>
</Period>
  <Duration>P1Y</Duration>
  <OffsetDuration>P1Y</OffsetDuration>
</DueDateRecurrence>
<RateAmount currencyCode="EUR">5</RateAmount>
</LoanFeeCondition>
```

Fee condition 4711 is valid for the period from Jan. 1, 2005-Jan. 1, 2010. It amounts to 5 Euro per year. The calculation will take place on Jan. 1, 2006 for the first time. The fee is due on Jan. 1, 2006 for the first time.

The structure of GDT LoanFeeCondition 35800FP is depicted in FIG. 358FP. For the GDT LoanFeeCondition 35800FP, the Representation/Association is Details 35802FP.

For the Loan Fee Type Code 35804FP, the Category is Attribute 35806FP, the Object Class is Loan Fee Condition 35808FP, the Property is Loan Fee Type 35810FP, the Representation/Association is Code 35812FP, the Type is GDT 35814FP, and the Type Name is Loan Fee Type Code 35816FP. The Cardinality is one 35818FP.

For the Calculation Date Recurrence 35820FP, the Category is Element 35822FP, the Object Class is Loan Fee Condition 35824FP, the Property is Calculation 35826FP, the Representation/Association is Recurrence 35828FP, the Type is GDT 35830FP, and the Type Name is Period Duration Day Recurrence 35832FP. The Cardinality is one 35834FP.

For the Due Date Recurrence 35836FP, the Category is Element 35838FP, the Object Class is Loan Fee Condition 35840FP, the Property is Due Date 35842FP, the Representation/Association is Recurrence 35844FP, the Type is GDT 35846FP, and the Type Name is Period Duration Day Recurrence 35848FP. The Cardinality is zero or one 35850FP.

For the Rate Percent 35852FP, the Category is Element 35854FP, the Object Class is Loan Fee Condition 35856FP, the Property is Rate 35858FP, the Representation/Association is Percent 35860FP, the Type is GDT 35862FP, and the Type Name is Percent 35864FP. The Cardinality is zero or one 35866FP.

For the Rate Amount 35868FP, the Category is Element 35870FP, the Object Class is Loan Fee Condition 35872FP, the Property is Rate 35874FP, the Representation/Association is Amount 35876FP, the Type is GDT 35878FP, and the Type Name is Amount 35880FP. The Cardinality is zero or one 35882FP.

The GDT LoanFeeCondition 35800FP may include five elements. Loan Fee Type Code specifies the type of fee. Calculation Date Recurrence indicates the regular recurring date when the fee is to be calculated. Due Date Recurrence indicates the regular recurring date when the fee is due. Rate Percent specifies a relative fee based on the loan amount. Rate Amount represents the absolute fee.

One of the following optional elements may be stated: Rate Percent or Rate Amount. The GDT LoanFeeCondition 35800FP can be used to specify the fee condition for a loan.

(kkkkkkkkkkkkkkkk) LoanFeeTypeCode

A GDT LoanFeeTypeCode 35800FQ is the coded representation of the type of loan fee. An example of a GDT LoanFeeTypeCode 35800FQ is:

<LoanFeeTypeCode>1101</LoanFeeTypeCode>

The structure of GDT LoanFeeTypeCode 35800FQ is depicted in FIG. 358FQ. For the GDT LoanFeeTypeCode 35800FQ, the Object Class is Loan Fee 35802FQ, the Property is Type 35804FQ, the Representation/Association is Code 35806FQ, the Type is CCT 35808FQ, the Type Name is Code 35810FQ and the Length is from one to ten 35812FQ. The remark 35814FQ shows that GDT LoanFeeTypeCode 35800FQ may be restricted.

A customer-specific code list is assigned to the code. A customer can determine the codes in the code list. The attributes of the code are assigned the following values: listID="10355", listAgencyID which is the ID of the Customer (ID from DE 3055, if listed there), listVersionID which is the version of the particular code list assigned and managed by the Customer, listAgencySchemeID which is the ID of the scheme if the listAgencyID does not come from DE 3055, and listAgencySchemeAgencyID which is the ID of the organization from DE 3055 that manages the listAgencySchemeID scheme.

Examples of types of loan fees include account management fees, fees for subscribing to a magazine published by a building and loan association, fees for viewing the usage object, and contribution for credit life insurance.

In the SAP ERP system the GDT LoanFeeTypeCode 35800FQ is based on the data element/domain SKOART in the software component EA-FINSERV. The value range for the domain is defined by entries from an underlying Customizing table. SAP does not supply Customizing for this table.

(llllllllllllllll) LoanInterestCondition

A GDT LoanInterestCondition 35800FR is a condition for calculating the interest on a loan. The interest calculation represents the price for the capital transferred. An example of a GDT LoanInterestCondition 35800FR is:

```
<LoanInterestCondition>
  <CalculationRecurrence>
  <Period>
      <StartDate>2005-01-01</StartDate>
      <EndDate>2010-01-01</EndDate>
  </Period>
    <Duration>P1M</Duration>
    <DaysValue>31</DaysValue>
  </CalculationRecurrence>
  <DueDateRecurrence>
  <Period>
      <StartDate>2005-01-01</StartDate>
      <EndDate>2010-01-01</EndDate>
  </Period>
    <Duration>P1M</Duration>
    <OffsetDuration>P1M</OffsetDuration>
  </DueDateRecurrence>
  <FixedInterestRatePercent>8</FixedInterestRatePercent>
</LoanInterestCondition>
```

The interest condition is valid for the period from Jan. 1, 2005-Jan. 1, 2010. The interest rate amounts to 8% per year. Interest is calculated monthly. The interest is calculated for the first time on Jan. 31, 2005. Interest is due for the first time on Feb. 1, 2005. It is an interest payment in arrears.

The structure of GDT LoanInterestCondition 35800FR is depicted in FIG. 358FR. For the GDT LoanInterestCondition 35800FR the Object Class is Loan Interest Condition 35802FR, and the Property is Details 35804FR.

For the Calculation Date Recurrence 35806FR, the Category is Element 35808FR, the Object Class is Loan Interest Condition 35810FR, the Property is Calculation Date 35812FR, the Representation/Association is Recurrence 35814FR, the Type is GDT 35816FR, and the Type Name is Period Duration Day Recurrence 35818FR. The Cardinality is one 35820FR.

For the Due Date Recurrence 35822FR, the Category is Element 35824FR, the Object Class is Loan Interest Condition 35826FR, the Property is Due Date 35828FR, the Representation/Association is Recurrence 35830FR, the Type is GDT 35832FR, and the Type Name is Period Duration Day Recurrence 35834FR. The Cardinality is zero or one 35836FR.

For the Fixed Interest Rate Percent 35838FR, the Category is Element 35840FR, the Object Class is Loan Interest Condition 35842FR, the Property is Fixed Interest Rate 35844FR, the Representation/Association is Percent 35846FR, the Type is GDT 35848FR, and the Type Name is Percent 35850FR. The Cardinality is zero or one 35852FR.

For the Variable Interest Rate Percent 35854FR, the Category is Element 35856FR, the Object Class is Loan Interest Condition 35858FR, the Property is Variable Interest Rate 35860FR, the Representation/Association is Variable Interest Rate 35862FR, the Type is GDT 35864FR, and the Type Name is Variable Interest Rate 35866FR. The Cardinality is zero or one 35868FR.

The GDT LoanInterestCondition 35800FR includes four elements. Calculation Date Recurrence indicates the regular recurring date for calculating interest payments. Due Date Recurrence indicates the regular recurring date when interest payments are due. Fixed Interest Rate Percent defines a fixed interest rate. Variable Interest Rate defines a variable interest rate.

One of the following optional sub-elements needs to be stated: Fixed Interest Rate Percent or Variable Interest Rate. You can use the GDT LoanInterestCondition 35800FR to specify the interest conditions for the capital transferred, for example, a loan.

(mmmmmmmmmmmmmmmmmmm) LoanKeyFigureTypeCode

A GDT LoanKeyFigureTypeCode 35800FS is the coded representation of the type of key figures for a loan. An example of a GDT LoanKeyFigureTypeCode 35800FS is:

<LoanKeyFigureTypeCode>1</LoanKeyFigureTypeCode>

The structure of GDT LoanKeyFigureTypeCode 35800FS is depicted in FIG. 358FS. For the GDT LoanKeyFigureTypeCode 35800FS, the Object Class is Load Key FIG. 35802FS, the Property is Type 35804FS, the Representation/Association is Code 35806FS, the Type is CCT 35808FS, the Type Name is Code 35810FS, and the Length is from one to two 35812FS. The remark 35814FS shows that GDT LoanKeyFigureTypeCode 35800FS may be restricted.

Valid code list values include the following five codes. Code one, commitment capital, describes the commitment capital for a loan. Code two, term, describes the term of a loan. Code three, installment, describes the installment for a loan. Code four, effective interest rate, describes the effective interest rate for a loan. Code five, payment schedule, describes the payment schedule for a loan.

Loan figures are needed to create loan offers. The GDT LoanKeyFigureTypeCode 35800FS can be used to request the calculation of concrete figures for a loan from a loan calculation service.

The LoanKeyFigureTypeCode is a SAP proprietary code list with predefined values. If you change permitted values then you also have to make changes to interfaces.

(nnnnnnnnnnnnnnn) LoanPaymentPlanItem

A GDT LoanPaymentPlanItem 35800FT is a loan payment planned for a key date. An example of a GDT LoanPaymentPlanItem 35800FT is:

```
<LoanPaymentPlanItem>
    <PaymentDate>2005-02-01</PaymentDate>
    <InstalmentAmount currencyCode="EUR"> 3101.00</
    InstalmentAmount>
    <InterestAmount currencyCode="EUR">2100.01</InterestAmount>
    <RepaymentAmount currencyCode=
    "EUR">1000.99<RepaymentAmount>
    <FeeAmount currencyCode="EUR">0.00</FeeAmount>
    <BalanceAmount currencyCode=
    "EUR">122354.43 </BalanceAmount>
</LoanPaymentPlanIterm>
```

The structure of GDT LoanPaymentPlanItem 35800FT is depicted in FIG. 358FT. For the GDT LoanPaymentPlanItem 35800FT, the Property is Loan Payment Plan Item 35801FT, and the Representation/Association is Details 35802FT.

For the Payment Due 35803FT, the Category is Element 35804FT, the Object Class is Loan Payment Plan Item 35805FT, the Property is Payment 35806FT, the Representation/Association is Date 35807FT, the Type is GDT 35808FT, and the Type Name is Date 35809FT. The Cardinality is one 35810FT.

For the Installment Amount 35811FT, the Category is Element 35812FT, the Object Class is Loan Payment Plan Item 35813FT, the Property is Installment 35814FT, the Representation/Association is Amount 35815FT, the Type is GDT 35816FT, and the Type Name is Amount 35817FT. The Cardinality is zero to one 35818FT.

For the Interest Amount 35819FT, the Category is Element 35820FT, the Object Class is Loan Payment Plan Item 35821FT, the Property is Interest 35822FT, the Representation/Association is Amount 35823FT, the Type is GDT 35824FT, and the Type Name is Amount 35825FT. The Cardinality is zero to one 35826FT.

For the Repayment Amount 35827FT, the Category is Element 35828FT, the Object Class is Loan Payment Plan Item 35829FT, the Property is Repayment 35830FT, the Representation/Association is Amount 35831FT, the Type is GDT 35832FT, and the Type Name is Amount 35833FT. The Cardinality is zero to one 35834FT.

For the Fee Amount 35835FT, the Category is Element 35836FT, the Object Class is Loan Payment Plan Item 35837FT, the Property is Fee 35838FT, the Representation/Association is Amount 35839FT, the Type is GDT 35840FT, and the Type Name is Amount 35841FT. The Cardinality is zero to one 35842FT.

For the Balance Amount 35843FT, the Category is Element 35844FT, the Object Class is Loan Payment Plan Item 35845FT, the Property is Balance 35846FT, the Representation/Association is Amount 35847FT, the Type is GDT 35848FT, and the Type Name is Amount 35849FT. The Cardinality is one 35850FT.

The GDT LoanPaymentPlanItem 35800FT can include six elements. A Payment Date represents the payment date. An Installment Amount represents the installment to be paid which is the total of the interest and repayment. An Interest Amount represents the interest amount to be paid. A Repayment Amount represents the repayment amount to be paid. Fee Amount represents the fees to be paid. A Balance Amount represents the remaining debt on the loan, which is the balance amount.

(ooooooooooooooo) LoanPurposeCode

A GDT LoanPurposeCode 35800FU is a coded representation of the purpose of a loan. An example of a GDT LoanPurposeCode 35800FU is:

<LoanPurposeCode>2</LoanPurposeCode>

The structure of GDT LoanPurposeCode 35800FU is depicted in FIG. 358FU. For the GDT LoanPurposeCode 35800FU, the Object Class is Loan 35802FU, the Property is Purpose 35804FU, the Representation/Association is Code 35806FU, the Type is CCT 35808FU, the Type Name is Code 35810FU and the Length is from one to two 35812FU. The remark 35814FU shows that GDT LoanPurposeCode 35800FU may be restricted.

A customer-specific code list is assigned to the code. A customer can determine the codes in the code list. The attributes of the code are assigned the following values: listID="10356", listAgencyID which is the ID of the Customer (ID from DE 3055, if listed there), listVersionID which is the version of the particular code list assigned and managed by the Customer, listAgencySchemeID which is the ID of the scheme if the listAgencyID does not come from DE 3055, and listAgencySchemeAgencyID which is the ID of the organization from DE 3055 that manages the listAgencySchemeID scheme.

Examples of loan purposes include the purchase of real estate, refinancing, home improvement and extension work. Real estate is where the loan can be used to purchase real estate, for example a house or condominium. Refinancing is where the loan can be used for refinancing. Home improvement is where the loan can be used to make improvements to real estate. Extension work is where the loan can be used to make extensions to real estate.

In the SAP ERP system the LoanPurposeCode is based on the data element/domain SVZWECK from the software component EA-FINSERV.

(pppppppppppppppp) PaymentProcedureCode

A GDT PaymentProcedureCode 35800FV is the coded representation of the payment procedure. A payment procedure is a technically oriented characteristic of a payment transaction, which is in turn a specialization of the payment form. An example of a GDT PaymentProcedureCode 35800FV is:

<PaymentProcedureCode>1</PaymentProcedureCode>

The structure of GDT PaymentProcedureCode 35800FV is depicted in FIG. 358FV. For the GDT PaymentProcedureCode 35800FV, the Object Class is Payment 35802FV, the Property is Procedure 35804FV, the Representation/Association is Code 35806FV, the Type is CCT 35808FV, the Type Name is Code 35810FV, and the Length is from one to five 35812FV. The remark 35814FV shows that GDT PaymentProcedureCode 35800FV may be restricted.

The GDT PaymentProcedureCode 35800FV is an SAP code list that can be extended by the customers with the implicitly given attributes listID="10062", listAgencyID="310" and listVersionID="tbd".

Possible code values for the GDT PaymentProcedureCode 35800FV are one through eight. One describes a domestic bank transfer. The domestic bank transfer is a payment that consists of a bank transfer from one back account to another in the same country. Two describes a foreign bank transfer. The foreign bank transfer is a payment that consists of a bank transfer from one back account to another in different countries. Three describes an EU internal transfer. The EU internal transfer is a payment that consists of a bank transfer from one back account to another in the Euro zone. Four is a bank check. The bank check is a payment with a check which is printed and sent by the bank. This is not to be confused with a check confirmed by the bank. Five is a bank check for foreign payment. The bank check for foreign payment is a foreign payment with a check which is printed and sent by the bank. This is not to be confused with a check confirmed by the bank. Six is a check printing. Check printing is a payment with a check where you do the printing yourself. The bank does not print the check. Seven is a bank direct debit. The bank direct debit is a debit memo in which the payer's bank is authorized to carry out a direct debit for the payee. Eight is a bank direct debit. The bank direct debit is a debit memo in which the payee has an automatic debit authorization of the payer.

The GDT PaymentProcedureCode 35800FV can be used, for example, to inform a house bank about the specific formats and forms for payments.

(qqqqqqqqqqqqqqqq) PaymentTransactionReferenceID

A GDT PaymentTransactionReferenceID 35800FW is a reference number for a transaction in payment transactions. An example of a GDT PaymentTransactionReferenceID 35800FW is:

```
<PaymentTransactionReferenceID>0000001405
</PaymentTransactionReferenceID>
```

The structure of GDT PaymentTransactionReferenceID 35800FW is depicted in FIG. 358FW. For the GDT PaymentTransactionReferenceID 35800FW, the Object Class is Payment Transaction 35802FW, the Property is Reference 35804FW, the Representation/Association is Identifier 35806FW, the Type is CCT 35808FW, the Type Name is Identifier 35810FW, and the Length is from one to thirty-five 35812FW.

The GDT PaymentTransactionReferenceID 35800FW is assigned by a bank or a party to uniquely identify a transaction in payment transactions. It is only unique in the context of the bank or party and is also only interpreted by them. For this reason, the scheme ID and scheme Agency ID attributes are not required. The bank or party that has assigned the reference may be known in the context.

The GDT PaymentTransactionReferenceID 35800FW can be used in a bank statement, for example, to convey a unique identification of the business transaction that was assigned by the bank. This has led to a turnover on the account, for example, a payment or a debit by account maintenance charges. The GDT PaymentTransactionReferenceID 35800FW can be used to identify the business transaction in the case of queries that may be made at the bank.

There does not have to be a business document, i.e. a BusinessTransactionDocument, for the business transaction which is referenced with the GDT PaymentTransactionReferenceID 35800FW.

(iiiiiiiiiiiiiii) PaymentTransactionTypeCode

A GDT PaymentTransactionTypeCode 35800FX is the coded representation of the type of a payment transaction. An example of a GDT PaymentTransactionTypeCode 35800FX is:

```
<PaymentTransactionTypeCodelistAgencyID="310">1
</PaymentTransactionTypeCode>
```

The structure of GDT PaymentTransactionTypeCode 35800FX is depicted in FIG. 358FX. For the GDT PaymentTransactionTypeCode 35800FX, the Object Class is Payment Transaction 35802FX, the Property is Type 35803FX, the Representation/Association is Code 35804FX, the Type is CCT 35806FX, the Type Name is Code 35808FX and the Length is from one to four 35810FX. The remark 35812FX shows that GDT PaymentTransactionTypeCode 35800FX may be restricted.

For the list ID 35814FX, the Category is Attribute (A) 34516FX, the Object Class is Code List Agency 35818FX, the Property is Identification 35820FX, the Representation/Association is Identifier 35822FX, the Type is XSD 35824FX, the Type Name is token 35826FX, and the Length is from one to sixty 35827FX. The Cardinality is optional 35828FX.

For the list Agency Scheme Agency ID 35830FX, the Category is Attribute (A) 34532FX, the Object Class is Code List Agency 35834FX, the Property is Identification 35836FX, the Representation/Association is Identifier 35838FX, the Type is XSD 35840FX, the Type Name is token 35842FX, and the Length is from one to three 35843FX. The Cardinality is optional 35844FX.

For the list Agency-Scheme Agency ID 35846FX, the Category is Attribute (A) 34548FX, the Object Class is Code List Agency 35850FX, the Property is Scheme Agency 35852FX, the Representation/Association is Identifier 35854FX, the Type is XSD 35856FX, the Type Name is token 35858FX, and the Length is from one to three 35859FX. The Cardinality is optional 35860FX.

The attributes are filled as follows to identify standard code lists: listAgencyID=Entry of the organization that the code list assigns in DE3055. The following code lists are supported at present: listAgencyID="17" for the code list according to S.W.I.F.T. guide, listAgencyID="131" for the code list of the central credit committee of the Association of German Banks, listAgencyID="tbd" for the code list of the Bankers Association of America, listAgencySchemeAgencyID is not applicable. The attributes are filled as follows to identify bank-specific code lists: listAgencyID=SWIFT Bank Identification Code (BIC) of the bank (see GDT BankStandardID), listAgencySchemeAgencyID="17" (entry for S.W.I.F.T. in DE 3055). The attributes are filled as follows to identify the SAP proprietary code list: listID="10042" (for documentation only), listAgencyID="310" (entry for SAP in DE 3055), listAgencySchemeAgencyID is not applicable.

Examples of code lists that may be used with the GDT PaymentTransactionTypeCode 35800FX are standard code lists, bank-specific code lists, and a proprietary code list. A code list may consist of seventeen codes. Code one is a bank transfer order which is an outgoing payment by transfer to another bank account, internally initiated. Code two is a bank transfer credit which is an incoming payment by externally initiated bank transfer. Code three is a debit memo, i.e. direct debit, which is an outgoing payment by externally initiated debit memo. Code four is a debit memo deposit which is a collection from one bank account to another bank account, i.e. direct debit, internally initiated. Code five is cashed checks which is an outgoing payment by cashing an outgoing check, also known as check payment confirmation. Code six is a check encashment which is an incoming payment by cashing an incoming check. Code seven is a bill of exchange collection which is an incoming payment by bill of exchange presentation. Code eight is a payment by bill of exchange which is an outgoing payment by payment by bill of exchange. Code nine is a card payment which is an incoming payment by card payment. Code ten is a cash withdrawal. Code eleven is a cash deposit. Code twelve is a lockbox which is an incoming payment by lockbox. Code ninety-one is a credit interest which is an incoming payment by credit interest. Code ninety-two is a debit interest which is an incoming payment by debit interest. Code ninety-three is a charge which is an outgoing payment by bank charges. Code nine hundred ninety-eight is for other incoming payments. Code nine hundred ninety-nine is for other outgoing payments.

The GDT PaymentTransactionTypeCode 35800FX can be used to specify the type of turnover for a bank statement item in a bank statement without going into bank and country-specific details. To give a user as much detailed information as possible about a bank statement, the original bank-specific codes for the type of a transaction are transferred. Information that could be useful for the user to understand the bank statement would possibly be lost when mapping to the code list.

(ssssssssssssssss) PeriodDurationDayRecurrence

A GDT PeriodDurationDayRecurrence 35800FY is a representation for the repeated occurrence of an event within a time period whereby the recurrence takes place at the end of a determined duration period or at a time specified in relation to the beginning of a period. The event is nonrecurring and excludes recurring time periods.

The element Period describes the time period. The element InteriorDuration describes the time frames, i.e. duration period, within this time period. Examples of a GDT PeriodDurationDayRecurrence 35800FY are:

Example 1

```
<PeriodDurationDayRecurrence>
    <Period>
            <StartDate>2004-04-12</StartDate>
            <EndDate>2004-04-06</EndDate>
    </Period>
        <InteriorDuration>P7T</InteriorDuration>
</ PeriodDurationDayRecurrence>
Weekly recurrences between 4/12/2004 and 6/6/2004
```

```
<PeriodDurationDayRecurrence>
    <Period>
            <StartDate>2005-02-15</StartDate>
            <EndDate>2010-02-14</EndDate>
    </Period>
        <InteriorDuration>P1M</InteriorDuration>
        <MonthDayValue>31</MonthDayValue>
</ PeriodDurationDayRecurrence>
```

Monthly recurrences at the end of each month between Feb. 15, 2005 and Feb. 14, 2010", that is on Feb. 28, 2005, Mar. 31, 2005, and Apr. 30, 2005, and so on.

Example 3

```
<PeriodDurationDayRecurrence>
    <Period>
            <StartDate>2005-01-01</StartDate>
            <EndDate>2009-12-31</EndDate>
    </Period>
        <InteriorDuration>P1M</InteriorDuration>
        <OffsetDuration>P2M</OffsetDuration>
        <MonthDayValue>31</MonthDayValue>
</ PeriodDurationDayRecurrence >
```

Event first occurs on: Mar. 31, 2005. The following events take place monthly on: Apr. 30, 2005, May 31, 2005, and so on.

The structure of GDT PeriodDurationDayRecurrence 35800FY is depicted in FIG. 358FY. For the GDT PeriodDurationDayRecurrence 35800FY the Object Class is Period Duration Day Recurrence 35802FY, and the Representation/Association is Details 35804FY.

For the Period 35806FY, the Category is Element (E) 35808FY, the Object Class is Period Duration Day Recurrence 35810FY, the Property is Period 35812FY, the Representation/Association is Date Period 35814FY, the Type is GDT 35816FY, and the Type Name is Date Period 35818FY. The Cardinality is one 35820FY.

For the Interior Duration 35822FY, the Category is Element (E) 35824FY, the Object Class is Period Duration Day Recurrence 35826FY, the Property is Interior 35828FY, the Representation/Association is Duration 35830FY, the Type is GDT 35832FY, and the Type Name is Duration 35834FY. The Cardinality is one 35836FY.

For the Offset Duration 35838FY, the Category is Element (E) 35840FY, the Object Class is Period Duration Day Recurrence 35842FY, the Property is Offset 35844FY, the Representation/Association is Duration 35846FY, the Type is GDT 35848FY, and the Type Name is Duration 35850FY. The Cardinality is zero or one 35852FY.

For the Month Day Value 35854FY, the Category is Element (E) 35856FY, the Object Class is Period Duration Day Recurrence 35858FY, the Property is Month Day 35860FY, the Representation/Association is Value 35862FY, the Type is GDT 35864FY, and the Type Name is Integer Value 35866FY. The Cardinality is zero or one 35868FY.

The GDT PeriodDurationDayRecurrence 35800FY may include four elements. A Period indicates the time period within which recurrences take place. An Interior Duration indicates the time frame after which, or in relation to the beginning of which, recurrences take place. An Offset Duration indicates the time frame in which an event takes place after a specified period has begun. A Month Day Value indicates the calendar day within a month on which the event takes place. The GDT PeriodDurationDayRecurrence 35800FY may contain the element Month Day Value where a value equal to thirty-one indicates the end of the month. The value range for the Offset Duration is limited to the period of time defined in the GDT Duration. You cannot use time ranges.

The combinatorics for Offset Duration and Month Day Value for the GDT PeriodDurationDayRecurrence 35800FY are explained. If neither Offset Duration nor Month Day Value can be used then the first event occurs at the end of a period, given by element Interior Duration. If only Offset Duration can be used then the event takes place a certain length of time after the start of a period and this time frame is given by element Offset Duration. If only Month Day Value can be used then a calendar month is fixed by the beginning of an Interior Duration. The event takes place on the calendar day of the fixed month that is given by the element Month Day Value. If Offset Duration and Month Day Value are used then a calendar month is fixed by the beginning of an Interior Duration plus the element Offset Duration. The event takes place on the calendar day of the fixed month that is given by element Month Day Value.

Qualifiers for the GDT PeriodDurationDayRecurrence 35800FY are Declaration Period Duration Day Recurrence and Payment Period Duration Day Recurrence.

(ttttttttttttttt) PersonDisabilityCertificateID

A GDT PersonDisabilityCertificateID 35800FZ is a unique identifier for a certificate describing a person's disability. The GDT PersonDisabilityCertificateID 35800FZ is assigned by the authority that created the certificate describing a person's disability. The ID is also called the reference number. An example of a GDT PersonDisabilityCertificateID 35800FZ is:

<PersonDisabilityCertificateID>20003000xyz__01012005</PersonDisabilityCertificateID>

The structure of GDT PersonDisabilityCertificateID 35800FZ is depicted in FIG. 358FZ. For the GDT PersonDisabilityCertificateID 35800FZ, the Object Class is Person Disability Certificate 35802FZ, the Property is Identification 35804FZ, the Representation/Association is Identifier 35806FZ, the Type is CCT 35808FZ, the Type Name is Identifier 35810FZ, and the Length is from one to twenty 35812FZ. The remark 35814FZ shows that GDT PersonDisabilityCertificateID 35800FZ may be restricted.

The GDT PersonDisabilityCertificateID 35800FZ may be unique within the used context. Therefore, no other attributes are necessary. This data type can be used in Personnel Administration to identify the certificate submitted by an employee describing the employee's disability.

(uuuuuuuuuuuuuuu) PersonnelEventReasonCode

A GDT PersonnelEventReasonCode 35800GA is the coded representation of the reason for a personnel event. A personnel event is an event in an employee's professional or private life that needs to be documented for the company. You can assign a reason to personnel events that relate to the employee, the employment, or the work agreement. The reason depends on the requirements of the company and the country. For example, in the case of the event type Notice, the reason could be Better career opportunities. An example of a GDT PersonnelEventReasonCode 35800GA is:

<PersonnelEventReasonCode>1</PersonnelEventReasonCode>

The structure of GDT PersonnelEventReasonCode 35800GA is depicted in FIG. 358GA. For the GDT PersonnelEventReasonCode 35800GA, the Object Class is Personnel Event 35804GA, the Property is Reason 35806GA, the Representation/Association is Code 35808GA, the Type is CCT 35810GA, the Type Name is Code 35812GA and the Length is from one to four 35814GA. The remark 35815CE shows that GDT PersonnelEventReasonCode 35800GA may be restricted.

For the list Agency ID 35816GA, the Category is Attribute (A) 34518GA, the Object Class is Code List Agency 35820GA, the Property is Identification 35822GA, the Representation/Association is Identifier 35824GA, the Type is XSD 35826GA, and the Type Name is token 35828GA. The Cardinality is zero or one 35830GA.

For the list Version ID 35832GA, the Category is Attribute (A) 34534GA, the Object Class is Code List 35836GA, the Property is Version 35838GA, the Representation/Association is Identifier 35840GA, the Type is XSD 35842GA, and the Type Name is token 35844GA. The Cardinality is zero or one 35846GA.

For the list Agency-Scheme ID 35848GA, the Category is Attribute (A) 34550GA, the Object Class is Code List Agency 35852GA, the Property is Scheme 35854GA, the Representation/Association is Identifier 35856GA, the Type is XSD 35858GA, and the Type Name is token 35860GA. The Cardinality is zero or one 35862GA.

For the list Agency-Scheme Agency ID 35864GA, the Category is Attribute (A) 34566GA, the Object Class is Code List Agency 35868GA, the Property is Scheme Agency 35870GA, the Representation/Association is Identifier 35872GA, the Type is XSD 35874GA, and the Type Name is token 35876GA. The Cardinality is zero or one 35878GA.

A customer-specific code list is assigned to the GDT PersonnelEventReasonCode 35800GA. A customer defines the codes in the code list. Only alternative code lists exist that are differentiated at configuration and/or runtime. The attributes of PersonnelEventReasonCode can be assigned the following values: listID="10104", listAgencyID which is the ID of the Customer (ID from DE 3055 if listed there), listVersionID which is assigned and managed by the Customer, listAgencySchemeID which is the ID of the scheme if the listAgencyID is not taken from DE 3055, and listAgencySchemeAgencyID which is the ID of the organization (taken from DE 3055) that manages the scheme of the listAgencySchemeID.

The GDT PersonnelEventReasonCode 35800GA distinguishes between different reasons for personnel events. Examples of the possible codes used for these events may include better career opportunities, health reasons, lacking qualifications, and reorganization. Better career opportunities can occur when the employee resigns because of better career opportunities elsewhere. Health reasons can occur when the employee resigns for health reasons. Lacking qualifications can occur when the employer dismisses the employee due to a lack of qualification. Reorganization can occur when the employer dismisses the employee due to a reorganization within the company.

(vvvvvvvvvvvvvvvv) StockLevelControlRequirementTypeCode

A GDT StockLevelControlRequirementTypeCode 35800GB is a coded representation of a requirement type for examining stock quantities and controlling stock shortages and surpluses. For example, a StockLevelControlRequirementType may describe the essential nature of a stock level control requirement according to the processes that have to be initiated to meet the requirement. An example of GDT StockLevelControlRequirementTypeCode 35800 GB is:

<StockLevelControlRequirementTypeCode>1</StockLevelControlRequirementTypeCode>

The structure of GDT StockLevelControlRequirementTypeCode 35800GB is depicted in FIG. 358GB. For the GDT StockLevelControlRequirementTypeCode 35800GB, the Object Class is Stock Level Control Requirement 35804GB, the Property is Type 35806GB, the Representation/Association is Code 35808GB, the Type is CCT 35810GB, the Type Name is Code 35812GB, and the Length is one 35814GB. The remark 35818GB shows that the GDT StockLevelControlRequirementTypeCode 35800GB may be restricted.

The data type GDT StockLevelControlRequirementTypeCode 35800GB may use the following codes: 1 (i.e., a requirement for initiation of a replenishment process in order to avoid stock shortage by verifying that the stock quantity is above a predefined stock level), 2 (i.e., a requirement for initiation of a cleanup process in order to avoid stock surplus by verifying that the stock quantity is below a predefined stock level), 3 (i.e., a general requirement for initiation of a cleanup or replenishment process in order to adjust the stock quantity to a predefined stock level).

One fixed SAP code list is typically assigned to the StockLevelControlRequirementTypeCode. The attributes can be assigned values as follows: listID="10168," listAgencyID="310," and listVersionID=ID of the particular code list. Assigned and man-aged by SAP AG.

(wwwwwwwwwwwwwwwwwww) SubledgerAccountGranularityCode

A GDT SubledgerAccountGranularityCode 35800GC is a coded representation of a granularity of a subledger account. For example, a granularity of a subledger account may establish criteria in addition to the company that serve to differentiate the SubledgerAccounts (such as material and batch for a MaterialSubledgerAccount). An example of GDT SubledgerAccountGranularityCode 35800GC is:

<SubledgerAccountGranularityCode>1</SubledgerAccountGranularityCode>

The structure of GDT SubledgerAccountGranularityCode 35800GC is depicted in FIG. 358GC. For the GDT SubledgerAccountGranularityCode 35800GC, the Object Class is SubledgerAccountGranularity 35804GC, the Representation/Association is Code 35808GC, the Type is CCT 35810GC, the Type Name is Code 35812GC, and the Length is from one to three 35814GC.

The data type GDT SubledgerAccountGranularityCode 35800GC may use the following code: 1 (i.e., the subledger granularity Material/LogisticsDivision establishes the criteria Company, Material, and Logis-ticsDivision to differentiate SubledgerAccounts). The attributes of the CCT identifier are defined implicitly as follows: listID="10068," listAgencyID="310," and listVersionID—Version of the code list.

(xxxxxxxxxxxxxxxx) WithholdingTax

A GDT WithholdingTax 35800GD is a tax that a paying party pays directly instead of the payee. For example, withholding taxes may be withheld by the payer of remuneration and paid directly to the responsible tax authority. They may be advance payments on taxes owed by the payee or satisfy a tax liability of the payee. An example of GDT WithholdingTax 35800GD is:

```
<WithholdingTax>
<CountryCode>DE</CountryCode>
<TypeCode listID="20301">002</TypeCode>
<BaseAmount currencyCode="EUR">100</BaseAmount>
<Rate>15</Rate>
<Amount currencyCode="EUR">15</Amount>
</WithholdingTax>
```

The structure of GDT WithholdingTax 35800GD is depicted in FIG. 358GD. For the GDT WithholdingTax 35800GD the Representation/Association is Details 35804GD.

For the CountryCode 35810GD, the Category is Element (E) 35811GD, the Object Class is WithholdingTax 35812GD, the Property is Country 35813GD, the Representation/Association is Code 35814GD, the Type is GDT 35815GD, the Type Name is CountryCode 35816GD, and the Cardinality is zero or one 35818GD.

For the TypeCode 35820GD, the Category is Element (E) 35821GD, the Object Class is WithholdingTax 35822GD, the Property is Type 35823GD, the Representation/Association is Code 35824GD, the Type is GDT 35825GD, the Type Name is TaxTypeCode 35826GD, and the Cardinality is zero or one 35828GD.

For the BaseAmount 35830GD, the Category is Element (E) 35831GD, the Object Class is WithholdingTax 35832GD, the Representation/Association is Amount 35834GD, the Type is GDT 35835GD, the Type Name is Amount 35836GD, and the Cardinality is one 35838GD.

For the Percent 35840GD, the Category is Element (E) 35841GD, the Object Class is WithholdingTax 35842GD, the Representation/Association is Percent 35844GD, the Type is GDT 35845GD, the Type Name is Percent 35846GD, and the Cardinality is zero or one 35848GD.

For the Amount 35850GD, the Category is Element (E) 35851GD, the Object Class is WithholdingTax 35852GD, the Representation/Association is Amount 35854GD, the Type is GDT 35855GD, the Type Name is Amount 35856GD, and the Cardinality is zero or one 35858GD.

In some implementations, the CountryCode 35810GD and the TypeCode 35820GD do not have to be specified on the item level of a business document or message if they can be derived from the Withholding-Tax on a super-ordinate level. There may be rules as to which withholding taxes can be shown as totals and which have to be itemized are determined on a county-by-country basis in accordance with the applicable laws. In some implementations, if the tax rate or tax amount is shown, the tax type (TypeCode 35820GD) must also be specified. The GDT WithholdingTax 35800GD can be used to show the different withholding taxes in the payment of remunerations or to initiate tax returns or tax payments by a company to the relevant tax authorities.

(yyyyyyyyyyyyyyyy) TaxTypeCode

A GDT TaxTypeCode 35800GE is a coded representation of the type of a tax. An example of GDT TaxTypeCode 35800GE is:

<TaxTypeCode listID="20301" listAgencyID="310">001</TaxTypeCode>

The structure of GDT TaxTypeCode 35800GE is depicted in FIG. 358GE. For the GDT TaxTypeCode 35800GE, the Object Class is Tax 35801GE, the Property is Type Code 35803GE, the Representation/Association is Code 35804GE, the Type is CCT 35805GE, the Type Name is Code 35806GE, and the Length is three 35807GE. The remark 35809GE shows that the GDT TaxTypeCode 35800GE may be restricted.

For the ListID 35810GE, the Category is Attribute (A) 35811GE, the Object Class is CodeList 35812GE, the Property is Identification 35813GE, the Representation/Association is Identifier 35814GE, the Type is XSD 35815GE, the Type Name is Token 35816GE, the Length is from one to forty 35817GE, and the Cardinality is one 35818GE.

For the ListAgencyID 35820GE, the Category is Attribute (A) 35821GE, the Object Class is CodeListAgency 35822GE, the Property is Identification 35823GE, the Representation/Association is Identifier 35824GE, the Type is XSD 35825GE, the Type Name is Token 35826GE, the Length is from one to three 35827GE, and the Cardinality is zero or one 35828GE.

The data type GDT TaxTypeCode 35800GE may use the following codes for ListID 20301 (DE): 001 (i.e., VAT levied in Germany), 002 (i.e., withholding tax for construction work as per paragraph 48 of the German Income Tax Act). The data type GDT TaxTypeCode 35800GE may use the following codes for ListID 20302 (US): 001 (i.e., sales tax levied by states in the USA), 002 (i.e., sales tax levied by local governments in US states, such as, a county sales tax or a city sales tax). For SAP code lists for the TaxTypeCode, specify the listAgencyID="310" (according to DE 3055).

(zzzzzzzzzzzzzzzz) TransshipmentMethodCode

A GDT TransshipmentMethodCode 35800GF is a coded representation of the logistics procedure for goods transfer. For example, in this context, "goods transfer" may cover goods receipt, intermediate storage, and merchandise distribution. An example of GDT TransshipmentMethodCode 35800GF is:

<TransshipmentMethodCode>1</TransshipmentMethodCode>

The structure of GDT TransshipmentMethodCode 35800GF is depicted in FIG. 358GF. For the GDT TransshipmentMethodCode 35800GF, the Object Class is Transshipment Method 35804GF, the Representation/Association is Code 35808GF, the Type is CCT 35810GF, the Type Name is Code 35812GF, and the Length is from one to two 35814GF.

The data type GDT TransshipmentMethodCode 35800GF may use the following codes: 1 (i.e., The goods are put away and transferred later to another customer or warehouse.), 2 (i.e., The goods arrive in the distribution center or warehouse in the recipient-related (store or customer) combination defined in logistics planning. From the point of goods receipt until they reach the final warehouse or customer, the goods are moved through one or more warehouses without being put away), 3 (i.e., The goods arrive in the distribution center or warehouse in the recipient-related (store or customer) combination defined in logistics planning. From the point of goods receipt until they reach the final warehouse or customer, the goods are moved through one or more warehouses without being put away. However, the goods recipient here is not the one originally specified in logistics planning. The decision for this unplanned recipient change could be based, for example, on one or more backordered orders.), 4 (i.e., Goods are sent without put-away taking place. The quantity defined in logistics planning is first moved to a storage type used for cross-docking, where it is split up into recipient-specific amounts and then sent.).

For example, if intermediate storage of goods in a storage location or distribution center is very costly or if goods have a very short shelf life, put-away is not performed. Instead, the goods are prepared for distribution immediately and then sent to the final point of sale.

(aaaaaaaaaaaaaaaaa) TaxRateTypeCode

A GDT TaxRateTypeCode 35800GG is a code that represents the type of tax rate as defined by the law for the classification of tax rates. An example of GDT TaxRateTypeCode 35800GG is:

```
<TaxRateTypeCode listID=20201 listAgencyID=310>
001</TaxRateTypeCode>
```

The structure of GDT TaxRateTypeCode 35800GG is depicted in FIG. 358GG. For the GDT TaxRateTypeCode 35800GG, the Object Class is Tax Rate 35801GG, the Property is Type 35803GG, the Representation/Association is Code 35804GG, the Type is CCT 35805GG, the Type Name is Code 35806GG, and the Length is five 35807GG. The remark 35809GG shows that the GDT TaxRateTypeCode 35800GG may be restricted.

For the ListID 35810GG, the Category is Attribute (A) 35811GG, the Object Class is CodeList 35812GG, the Property is Identification 35813GG, the Representation/Association is Identifier 35814GG, the Type is XSD 35815GG, the Type Name is Token 35816GG, the Length is from one to forty 35817GG, and the Cardinality is one 35818GG.

For the ListAgencyID 35820GG, the Category is Attribute (A) 35821GG, the Object Class is CodeListAgency 35822GG, the Property is Identification 35823GG, the Representation/Association is Identifier 35824GG, the Type is XSD 35825GG, the Type Name is Token 35826GG, the Length is from one to three 35817GG, and the Cardinality is zero or one 35828GG.

The data type GDT TaxRateTypeCode 35800GG may use the following codes for ListID 20201 (DE): 001 (i.e., full sales tax rate), 002 (i.e., reduced sales tax rate), 003 (i.e., tax-exempt). The data type GDT TaxRateTypeCode 35800GG may use the following codes for ListID 20202 (US): 001 (i.e., full sales tax rate), 002 (i.e., tax-exempt).

For certain taxes, such as VAT, there are one or more tax rates within its spatial and temporal scope of application. A concrete tax rate is derived from the TaxRateTypeCode 35800GG in connection with a scope of application. The TaxRateTypeCode 35800GG code list may be determined by national tax legislation. The typing of tax rates makes it possible to formulate the texts of laws and regulations pertaining to taxes independently of the concrete tax rates, which can change over time. In other words: If a tax rate is raised or lowered at some point in time, the corresponding TaxRateTypeCode 35800GG does not change. If additional new tax rates are introduced, new TaxRateTypeCodes 35800GG may also be introduced.

(bbbbbbbbbbbbbbbbb) TripServiceProviderCode

A GDT TripServiceProviderCode 35800GH is a coded representation of the provider of a service associated with a trip. An example of GDT TripServiceProviderCode 35800GH is:

<TripServiceProviderCode>MC</TripServiceProviderCode>

The structure of GDT TripServiceProviderCode 35800GH is depicted in FIG. 358GH. For the GDT TripServiceProviderCode 35800GH, the Object Class is TripServiceProvider 35804GH, the Representation/Association is Code 35808GH, the Type is CCT 35810GH, the Type Name is Code 35812GH, and the Length is from one to two 35814GH. The remark 35818GH shows that the GDT TripServiceProviderCode 35800GH may be restricted.

The data type GDT TripServiceProviderCode 35800GH may use the following codes: 1 (i.e., car rental industry: Alamo), 2 (i.e., hotel industry: Marriot).

(ccccccccccccccccc) Text

A GDT Text 35800GI is a character string with an optional language specification. An example of GDT Text 35800GI is:

```
<Text languageCode="DE">Text is a character string with
optional language specification.</Text>
```

The structure of GDT Text 35800GI is depicted in FIG. 358GI. For the GDT Text 35800GI, the Category is complexType 35801GI, the Object Class is Text 35802GI, the Representation/Association is Content 35804GI, the Type is XSD 35805GI, the Type Name is String 35806GI, and the Length is unlimited 35807GI.

For the language-Code 35810GI, the Category is Attribute (A) 35811GI, the Object Class is Text 35812GI, the Property is Language 35813GI, the Representation/Association is Code 35814GI, the Type is XSD 35815GI, the Type Name is language 35816GI, the Length id from two to nine 35817GI, and the Cardinality is zero or one 35818GI. The remark 35819GI shows that the language-Code 35810GI may be optional.

Text 35800GI comprises the following attributes: languageCode 35810GI. For example, if the attachment is a document or text, this can be used to show the language of the attachment in accordance with IETF RFC 1766 or IETF RFC 3066.

(ddddddddddddddddd) UUID

A GDT UUID 35800GJ is a globally unique identifier for an object. For example, "globally unique" may mean that no two objects have the same identifier in all probability. An example of GDT UUID 35800GJ is:

<ProductUUID>f81d4fae-7dec-1d0-a765-00a0c91e6bf6</ProductUUID>

The structure of GDT UUID 35800GJ is depicted in FIG. 358GJ. For the GDT UUID 35800GJ, the Property Qualifier is Universally Unique 35804GJ, the Property is Identification 35806GJ, the Representation/Association is Identifier 35808GJ, the Type is CCT 35810GJ, the Type Name is Identifier 35812GJ, and the Length is thirty-six 35814GJ. The remark 35818GJ shows that the GDT UUID 35800GJ may be restricted.

In some implementations, the UUID 35800GJ is a number in hexadecimal notation, which is "mathematically guaranteed" unique due to its generation algorithm. The UUID 35800GJ may be represented according to the following schema: groups of 8, 4, 4, 4, and 12 characters (0-9, a-f) with hyphens between the groups:

dddddddd-dddd-dddd-dddd-dddddddddddd.

The representation may, for example, correspond to ISO 11578:1996 and IETF RFC 4122.

(eeeeeeeeeeeeeeeee) VariableInterestRate

A GDT VariableInterestRate 35800GK is an interest rate that changes. Unlike a fixed interest rate, a variable interest rate may be based on a reference interest rate that continually changes over time. For example, variable interest rates may be agreed for loans. Variable may mean that the concrete interest rate is determined depending on a reference interest rate curve. Upper and lower levels of interest rates (caps and floors) may also be agreed. An example of GDT VariableInterestRate 35800GK is:

```
<VariableInterestRate>
<ReferenceInterestCurveCode listID="221" listAgencyID="17">
LIBO</ ReferenceInterestCurveCode>
<AdjustmentRecurrence>
<Period>
<StartDate>2005-01-01</StartDate>
<EndDate>2010-01-01</EndDate>
</Period>
<Duration>P1M</Duration>
</AdjustmentRecurrence>
<MarginPercent>0.1</ MarginPercent>
<FluctuationMarginPercent>0.2</ FluctuationMarginPercent>
<CapPercent>8.75</CapPercent>
<FloorPercent>6.35</FloorPercent>
</VariableInterestRate>
```

The structure of GDT VariableInterestRate 35800GK is depicted in FIG. 358GK. For the GDT VariableInterestRate 35800GK, the Object Class is Variable Interest Rate 35801GK, and the Property is Details 35803GK.

For the ReferenceInterestCurveCode 35810GK, the Category is Element (E) 35811GK, the Object Class is Variable Interest Rate 35812GK, the Property is Reference Interest Curve 35813GK, the Representation/Association is Code 35814GK, the Type is GDT 35815GK, the Type Name is ReferenceInterestCurveCode 35816GK, and the Cardinality is one 35818GK.

For the AdjustmentRecurrence 35820GK, the Category is Element (E) 35821GK, the Object Class is Variable Interest Rate 35822GK, the Property is Adjustment 35823GK, the Representation/Association is Recurrence 35824GK, the Type is GDT 35825GK, the Type Name is PeriodDurationDayRecurrence 35826GK, and the Cardinality is zero or one 35828GK.

For the BeforeAdjustmentIDaysValue 35830GK, the Category is Element (E) 35831GK, the Object Class is Variable Interest Rate 35832GK, the Property is Before Adjustment 35833GK, the Representation/Association Qualifier is Days 35837GK, the Representation/Association is Value 35834GK, the Type is GDT 35835GK, the Type Name is IntegerValue 35836GK, and the Cardinality is zero or one 35838GK.

For the InitialRatePercent 35840GK, the Category is Element (E) 35841GK, the Object Class is Variable Interest Rate 35842GK, the Property is Initial Rate 35843GK, the Representation/Association is Percent 35844GK, the Type is GDT 35845GK, the Type Name is Percent 35846GK, and the Cardinality is zero or one 35848GK.

For the MarginPercent 35850GK, the Category is Element (E) 35851GK, the Object Class is Variable Interest Rate 35852GK, the Property is Margin 35853GK, the Representation/Association is Percent 35854GK, the Type is GDT 35855GK, the Type Name is Percent 35856GK, and the Cardinality is zero or one 35858GK.

For the FluctuationMarginPercent 35860GK, the Category is Element (E) 35861GK, the Object Class is Variable Interest Rate 35862GK, the Property is Fluctuation Margin 35863GK, the Representation/Association is Percent 35864GK, the Type is GDT 35865GK, the Type Name is Percent 35866GK, and the Cardinality is one 35868GK.

For the CapPercent 35870GK, the Category is Element (E) 35871GK, the Object Class is Variable Interest Rate 35872GK, the Property is Cap 35873GK, the Representation/Association is Percent 35874GK, the Type is GDT 35875GK, the Type Name is Percent 35876GK, and the Cardinality is zero or one 35878GK.

For the FloorPercent 35880GK, the Category is Element (E) 35881GK, the Object Class is Variable Interest Rate 35882GK, the Property is Floor 35883GK, the Representation/Association is Percent 35884GK, the Type is GDT 35885GK, the Type Name is Percent 35886GK, and the Cardinality is zero or one 35888GK.

The ReferenceInterestCurveCode 35810GK is a coded representation of the reference interest rate. The AdjustmentRecurrence 35820GK defines the recurring date for adjusting a variable interest rate. The BeforeAdjustmentDaysValue 35830GK defines how many days before the determination you have to ascertain the new interest rate. The InitialRatePercent 35840GK describes the initial interest rate. The MarginPercent 35850GK describes the reduction or increase compared to the market interest rate as a percentage. The FluctuationMarginPercent 35860GK the FluctuationMargin determines the maximum amount by which the rate can differ from the current rate as a percentage. The CapPercent 35870GK represents the upper level of interest rate that is permitted. The FloorPercent 35880GK represents the lower level of interest rate that is permitted. Loans with a variable interest rate may use a reference interest rate (LIBOR, for example) to determine their rate of interest. They may be adjusted periodically within the upper and lower levels of interest rate. The development of the underlying reference interest rate may be a factor when making this adjustment.

(fffffffffffffffff) VIPReasonCode

A GDT VIPReasonCode 35800GL is an explanation of the VIP (Very Important Person) characteristics of a person. The explanation is represented by a code. An example of GDT VIPReasonCode 35800GL is:

<VIPReasonCode>1</VIPReasonCode>

The structure of GDT VIPReasonCode 35800GL is depicted in FIG. 358GL. For the GDT VIPReasonCode 35800GL, the Property is VIP Reason 35803GL, the Representation/Association is Code 35804GL, the Type is CCT 35805GL, the Type Name is Code 35806GL, and the Length is one 35807GL. The remark 35809GL shows that the GDT VIPReasonCode 35800GL may be restricted.

For the ListID 35810GL, the Category is Attribute (A) 35811GL, the Object Class is CodeList 35812GL, the Property is Identification 35813GL, the Representation/Association is Identifier 35814GL, the Type is XSD 35815GL, the Type Name is Token 35816GL, and the Cardinality is zero or one 35818GL.

For the ListAgencyID 35820GL, the Category is Attribute (A) 35821GL, the Object Class is CodeListAgency 35822GL, the Property is Identification 35823GL, the Representation/Association is Identifier 35824GL, the Type is XSD 35825GL, the Type Name is Token 35826GL, and the Cardinality is zero or one 35828GL.

For the ListVersionID 35830GL, the Category is Attribute (A) 35831GL, the Object Class is CodeList 35832GL, the Property is Version 35833GL, the Representation/Association is Identifier 35834GL, the Type is XSD 35835GL, the Type Name is Token 35836GL, and the Cardinality is zero or one 35838GL.

For the ListAgency-SchemeID 35840GL, the Category is Attribute (A) 35841GL, the Object Class is CodeListAgency 35842GL, the Property is Scheme 35843GL, the Representation/Association is Identifier 35844GL, the Type is XSD 35845GL, the Type Name is Token 35846GL, and the Cardinality is zero or one 35848GL.

For the ListAgency-SchemeAgencyID 35850GL, the Category is Attribute (A) 35851GL, the Object Class is CodeListAgency 35852GL, the Property is SchemeAgency 35853GL, the Representation/Association is Identifier 35854GL, the Type is XSD 35855GL, the Type Name is Token 35856GL, and the Cardinality is zero or one 35858GL.

The data type GDT VIPReasonCode 35800GL may use the following codes: managing director (i.e., this person is indicated as a VIP because he or she is the managing director), company partner (i.e., this person is indicated as a VIP because he or she is a partner in the company).

(gggggggggggggggggg) WithholdingTaxEventTypeCode

A GDT WithholdingTaxEventTypeCode 35800GM is a coded representation of the type of taxable income which is connected with the withholding tax in the payment of remunerations. For example, taxable income may refer to an event in which a combination of properties is the basis for a tax liability, tax reduction or tax exemption of a particular type and amount according to the tax laws of a particular country. An example of GDT WithholdingTaxEventTypeCode 35800GM is:

<WithholdingTaxEventTypeCode listID=21001>100</WithholdingTaxEventTypeCode>

The structure of GDT WithholdingTaxEventTypeCode 35800GM is depicted in FIG. 358GM. For the GDT WithholdingTaxEventTypeCode 35800GM, the Object Class is Withholding Tax Event 35801GM, the Property is Type 35803GM, the Representation/Association is Code 35804GM, the Type is CCT 35805GM, the Type Name is Code 35806GM, and the Length is from one to three 35807GM. The remark 35809GM shows that the GDT WithholdingTaxEventTypeCode 35800GM may be restricted.

For the ListID 35810GM, the Category is Attribute (A) 35811GM, the Object Class is CodeList 35812GM, the Property is Identification 35813GM, the Representation/Association is Identifier 35814GM, the Type is XSD 35815GM, the Type Name is Token 35816GM, the Length is from one to forty 35817GM, and the Cardinality is one 35818GM.

The data type GDT WithholdingTaxEventTypeCode 35800GM may use the following codes: 1 (i.e., withholding tax-liable construction work as per paragraph 48 of the German Income Tax Act), 2 (i.e., construction work with certificate of exemption as per paragraph 48 of the German Income Tax Act).

Taxable income properties in the sense of tax law is the taxable unit (legal entity liable to pay the tax) and the taxable object (object, activity or status on which a tax is levied). The type and number of properties to be considered for particular business transactions are determined by the tax laws of a country. These laws or their enforcement provisions generally do not prescribe specific codes. The codes are therefore set by the respective software manufacturers. WithholdingTaxTypeCode is assigned multiple fixed country-specific code lists; these are distinguished at runtime. The WithholdingTaxEventTypeCode 35800GM can be used in the calculation of taxes for the determination of type and rate of the respective tax. Furthermore, the tax registry decides on the basis of the WithholdingTaxEventTypeCodes 35800GM how and when taxes are to be reported and paid to the tax authorities.

(hhhhhhhhhhhhhhhhh) StartendCode

A GDT StartendCode 35800GN is the coded representation for the start or the end of something. In logistics, for example, "something" typically stands for a process segment. An example (instance) of the GDT StartendCode 35800GN is:

<StartEndCode>1</StartEndCode>

The structure of GDT StartendCode 35800GN is depicted in FIG. 358GN. For the GDT StartendCode 35800GN, the Object Class term is Start End 35802GN, the Representation/Association term is Code 35804GN, the Type term is CCT 35806GN, the Type Name term is Code 35808GN, and the Length is either one or two 35810GN. The GDT StartendCode 35800GN may be restricted 35812GN.

The GDT StartendCode 35800GN may be used, for example, in the bill of operations to indicate the start and the end of a processing path.

(iiiiiiiiiiiiiiii) PersonnelEventTypeCode

A GDT PersonnelEventTypeCode 35800GO is a coded representation of the type of a personnel event. A personnel event is an event in an employee's professional or private life that needs to be documented for the company. The GDT PersonnelEventType 35800GO is the classification of personnel events according to the type of change to the work relationship, the work agreement, or the employee-related data. An example of GDT PersonnelEventTypeCode 35800GO is:

<PersonnelEventTypeCode listAgencyID='310'listVersionID='1.0'>1</PersonnelEventTypeCode>

The structure of GDT PersonnelEventTypeCode 35800GO is depicted in FIG. 358GO. The GDT PersonnelEventTypeCode 35800GO includes attributes listAgencyID 35814GO, listVersionID 35830GO, listAgencySchemeID 35846GO, and listAgencySchemeAgencyID 35862GO. For the GDT PersonnelEventTypeCode 35800GO, the Object Class term is Personnel Administration 35802GO, the Representation/Association term is Code 35804GO, the Type term is CCT 35806GO, the Type Name term is Code 35808GO, and the Length is from one to four 35810GO. The PersonnelEventTypeCode 35800GO may be restricted 35812GO.

For the listAgencyID 35814GO, the Category is Attribute 35816GO, the Object Class term is CodeListAgency 35818GO, the Property term is Identification 35820GO, the Representation/Association term is Identifier 35822GO, the Type term is XSD 35824GO, and the Type Name term is token 35826GO. The Cardinality between the listAgencyID 35830GO and the GDT PersonnelEventTypeCode 35800GO is either zero or one 35832GO.

For the listVersionID 35830GO, the Category is Attribute 35832GO, the Object Class term is CodeList 35834GO, the Property term is Version 35836GO, the Representation/Association term is Identifier 35838GO, the Type term is XSD 35840GO, and the Type Name term is token 35842GO. The cardinality between the listVersionID 35830GO and the GDT PersonnelEventTypeCode 35800GO is either zero or one 35844GO.

For the listAgencySchemeID 35846GO, the Category is Attribute 35848GO, the Object Class term is CodeListAgency 35850GO, the Property term is Scheme 35852GO, the Representation/Association term is Identifier 35854GO, the Type term is XSD 35856GO, and the Type Name term is token 35858GO. The cardinality between the listAgencySchemeID 35846GO and the GDT PersonnelEventTypeCode 35800GO is either zero or one 35860GO.

For the listAgencySchemeAgencyID 35862GO, the Category is Attribute 35864GO, the Object Class term is CodeListAgency 35866GO, the Property term is SchemeAgency 35868GO, the Representation/Association term is Identifier 35870GO, the Type term is XSD 35872GO, and the Type Name term is token 35874GO. The cardinality between the listAgencySchemeAgencyID 35862GO and the GDT PowerOfAttorneyTypeCode 35800GO is either zero or one 35876GO.

In some implementations, several country-specific code lists may be predefined to the GDT PersonnelEventTypeCode 35800GO. If a customer makes changes to the predefined code lists, for example, the values of the attributes may be changed as follows:

listAgencyID—ID of the Customer (ID from DE 3055 if listed there)

listVersionID—Assigned and managed by the Customer listAgencySchemeID—ID of the scheme if the listAgencyID is not taken from DE 3055 listAgencySchemeAgencyID—ID of the organization (taken from DE 3055) that manages the scheme of the listAgencySchemeID A customer can use the GDT PersonnelEventTypeCode 35800GO to distinguish between different event types in personnel administration. In some implementations, the GDT PersonnelEventTypeCode 35800GO may include a code list with international event types. Additionally, customers and countries can modify the list.

Some examples of the possible semantics of the codes are:

Hiring—This type contains the information that the event is an "Employee Hiring".

Resignation—This type contains the information that the event is an "Employee Resignation".

Maternity Protection—This type contains the information that the event is an "Employee Maternity Protection".

(jjjjjjjjjjjjjjjjj) PersonRaceEthnicityCode

A GDT PersonRaceEthnicityCode 35800GP is a code indicating the racial or ethnic background of a person. For example, the code may be defined according to the U.S. Office of Management and Budget and U.S. Bureau of Consensus. An example (instance) of the GDT PersonRaceEthnicityCode 35800GP is:

<PersonRaceEthnicityCode listID="1109" listAgencyID="116" listVersionID="X12.3">C</PersonRaceEthnicityCode>

In the United States, this is the code identifying the racial background of the person as Caucasian, according to ANSI X12.3.

The structure of GDT PersonRaceEthnicityCode 35800GP is depicted in FIG. 358GP. The GDT PersonRaceEthnicityCode 35800GP includes attributes listID 35814IF, listAgencyID 35830IF, and listVersionID 35846IF. For the GDT PersonRaceEthnicityCode 35800GP, the Object Class term is Person 35802GP, the Property term is Race Ethnicity 35804GP, the Representation/Association term is Code 35806GP, the Type term is CCT 35808GP, the Type Name term is Code 35810GP, and the Length is either one or two 35812GP. The PersonRaceEthnicityCode 35800GP may be restricted 35814GP.

For the listID 35816GP, the Category is Attribute 35818GP, the Object Class term is CodeList 35820GP, the Property term is Identification 35822GP, the Representation/Association term is Identifier 35822GP, the Type term is XSD 35826GP, and the Type Name term is token 35828GP. The cardinality between the listID 35816GP and the GDT ProductUsage-Code 35800GP is either zero or one 35830GP.

For the listAgencyID 35832GP, the Category is Attribute 35834GP, the Object Class term is CodeListAgency 35836GP, the Property term is Identification 35838GP, the Representation/Association term is Identifier 35840GP, the Type term is XSD 35842GP, and the Type Name term is token 35844GP. The Cardinality between the listAgencyID 35832GP and the GDT ProductUsageCode 35800GP is either zero or one 35846GP.

For the listVersionID 35848GP, the Category is Attribute 35850GP, the Object Class term is CodeList 35852GP, the Property term is Version 35854GP, the Representation/Association term is Identifier 35856GP, the Type term is XSD 35858GP, and the Type Name term is token 35860GP. The cardinality between the listVersionID 35848GP and the GDT ProductUsageCode 35800GP is either zero or one 35862GP.

In some implementations, several fixed, country-specific code lists, which are different at runtime, may be assigned to the code.

An employer may use the GDT ProductUsageCode 35800GP to ensure that an employee is not discriminated against on the basis of his or her racial or ethnic background. In some location, such as the United States, there is a legal regulation stipulating that the racial background information may be entered separately from the ethnic background information. For example, the GDT PersonRaceEthnicityCode 35800GP for the country US according to ANSI X12.3-1109 may have attributes as follows:

listID="1109" (Race or Ethnicity Code)

listAgencyID="116" (US ANSI X12)

listVersionID="X12.3"

The GDT PersonRaceEthnicityCode 35800GP is displayed in accordance with the ANSI X12.3-1109. The following table includes some of the possible code in the ANSI X12.3-1109 code list.

| Code | Name | Description |
|---|---|---|
| 7 | Not Provided | The code is not provided. |
| 8 | Not Applicable | The code is not applicable. |
| A | Asian or Pacific Islander | The person is Asian or Pacific Islander. |
| B | Black | The person is Black. |
| C | Caucasian | The person is Caucasian. |
| D | Subcontinent Asian American | The person is Subcontinent Asian American. |
| E | Other Race or Ethnicity | The person is of another race or ethnicity. |
| F | Asian Pacific American | The person is Asian Pacific American. |
| G | Native American | The person is native American. |
| H | Hispanic | The person is Hispanic. |
| I | American Indian or Alaskan Native | The person is American Indian or Alaskan Native. |
| J | Native Hawaiian | The person is native Hawaiian. |
| N | Black (Non-Hispanic) | The person is Black (Non-Hispanic). |
| O | White (Non-Hispanic) | The person is White (Non-Hispanic). |
| P | Pacific Islander | The person is Pacific Islander. |
| Q | Black or African American | The person is Black or African American. |
| R | Hispanic or Latino | The person is Hispanic or Latino. |
| S | White | The person is White. |
| T | American Indian or Alaska Native | The person is American Indian or Alaska Native. |
| U | Asian | The person is Asian. |
| V | Native Hawaiian or Other Pacific Islander | The person is native Hawaiian or other Pacific Islander. |
| W | Not Hispanic or Latino | The person is not Hispanic or Latino. |
| Z | Mutually Defined | The code is mutually defined. |

As another example, the GDT PersonRaceEthnicityCode 35800GP PersonRaceEthnicityCode according to GB/T 3304-1991 may have attributes as follows:

listID="GB/T 3304" (Race or Ethnicity Code)

listAgencyID="CN"

listVersionID="1991"

listAgencySchemeID=ISO 3166-1.

listAgencySchemeAgencyID="5" (ISO)

(kkkkkkkkkkkkkkkkk) PriorityValue

A GDT PriorityValue 35800GQ is the value-based specification of a priority. An example (instance) of the GDT PriorityValue 35800GQ is:

<PriorityValue>1</PriorityValue>

The structure of GDT PriorityValue 35800GQ is depicted in FIG. 358GQ. For the GDT PriorityValue 35800GQ, the Property term is Priority 35802GQ, the Representation/Association term is Code 35804GQ, the Type term is CCT 35806GQ, the Type Name term is Numeric 35808GQ, and the Length is maximum thirteen digits with two places after the decimal point 35810GQ. The PriorityValue 35800GQ may be restricted 35812GQ.

In some variations, the GDT PriorityValue 35800GQ may only be used if variable priorities have to be used. For example, in the business object, integrated Production Process Model, the GDT PriorityValue 35800GQ can be used to define the priority with which a source of supply, created based on an integrated Production Process Model, is to be taken into account in procurement planning.

(llllllllllllllll) ProcessBranchingTypeCode

A GDT ProcessBranchingTypeCode 35800GR is the coded representation of the type of a process branching. A branching is a way of structuring a process description that splits a process into several process paths. In addition to a common starting point, the branched processing paths also have a common end point where the different paths join again. An example (instance) of the GDT ProcessBranchingTypeCode 35800GR is:

<ProcessBranchingTypeCode>1</ProcessBranchingTypeCode>

The structure of GDT ProcessBranchingTypeCode 35800GR is depicted in FIG. 358GR. For the GDT ProcessBranchingTypeCode 35800GR, the Object Class term is Process Branching 35802GR, the Property term is Type 35804GR, the Representation/Association term is Code 35806GR, the Type term is CCT 35808GR, the Type Name term is Code 35810GR, and the Length is from one to two 35812GR. The GDT ProcessBranchingTypeCode 35800GR may be restricted 35814GR.

In some implementations, one fixed code list may be predefined to the GDT ProcessBranchingTypeCode 35800GR. For example, the GDT ProcessBranchingTypeCode 35800GR may include attributes as follows:

listID is "10131"

listAgencyID is "310"

listVersionID may be a version of the relevant code list.

In some examples, the GDT ProcessBranchingTypeCode 35800GR can be used to control how the quantity to be processed flows through the processing paths of the branching. In a production process, the processed quantity is a production lot and in an authorization process, it is the quantity of the requests to be authorized. An exemplary code list is depicted as follows:

| Code | Name | Description |
|---|---|---|
| 1 | Alternative | Indicates a branching in processing paths at which the processing quantity can be split. |
| 2 | Exclusive Alternative | Indicates a branching in processing paths whereby the complete process may be completed on one path only. |
| 3 | Parallel | Indicates a branching in processing paths whereby the complete process can be completed on all available paths. |

(mmmmmmmmmmmmmmmmm) RegistrantRoleCode

A GDT RegistrantRoleCode 35800GS is the coded representation of the role of a person, device, or system that is registered for something. An example (instance) of the GDT RegistrantRoleCode 35800GS is:

<RegistrantRoleCode>1</RegistrantRoleCode>

The structure of GDT RegistrantRoleCode 35800GS is depicted in FIG. 358GS. For the GDT RegistrantRoleCode 35800GS, the Object Class term is Registrant 35802GS, the Property term is Role 35804GS, the Representation/Association term is Code 35806GS, the Type term is CCT 35808GS, the Type Name term is Code 35810GS, and the Length is from one to two 35812GS. The GDT RegistrantRoleCode 35800GS may be restricted 35814GS.

In some implementations, one fixed code list may be predefined to the GDT RegistrantRoleCode 35800GS. For example, the GDT RegistrantRoleCode 35800GS may include attributes as follows:

listID is 10156 listAgencyID is 310 listVersionID may be a version of the relevant code list.

As an example, the GDT RegistrantRoleCode 35800GS may define a code list that the code 1 represents that a registrant is responsible, and the code 2 represents that a registrant is interested.

(nnnnnnnnnnnnnnnnn) ReportingPointID

A GDT ReportingPointID 35800GT is a unique identifier of a reporting point in a process description. A reporting point is a point in a process description at which data is recorded that documents the progress of production. An example (instance) of the GDT ReportingPointID 35800GT is:

<ReportingPointID>RP4711</ReportingPointID>

The structure of GDT ReportingPointID 35800GT is depicted in FIG. 358GT. For the GDT ReportingPointID 35800GT, the Object Class term is Reporting Point 35802GT, the Property term is Identification 35804GT, the Representation/Association term is Identifier 35806GT, the Type term is CCT 35808GT, the Type Name term is Identifier 35810GT, and the Length is from one to forty 35812GT. The GDT ReportingPointID 35800GT may be restricted 35814GT. In some implementations, the GDT ReportingPointID 35800GT may be unique in the usage context.

(ooooooooooooooooo) SalesCycleCode

A GDT SalesCycleCode 35800GU is the coded representation of the sales cycle. The sales cycle of a product or a service starts with the recognition of an opportunity, that is with a potential sales opportunity, and ends with a customer's order or cancellation. The sales cycle for an opportunity is made up of various phases, for example, project identification, qualification, quote, and so on. The duration of a sales cycle is determined by the start and expected end date of an opportunity. An example (instance) of the GDT SalesCycleCode 35800GU is:

<SalesCycleCode listAgencyID=310>2</SalesCycleCode>

The structure of GDT SalesCycleCode 35800GU is depicted in FIG. 358GU. The GDT SalesCycleCode 35800GU includes attributes listID 35812GU, listAgencyID 35828GU, listVersionID 35846GU, listAgencySchemeID 35864GU, and listAgencySchemeAgencyID 35880GU. For the GDT SalesCycleCode 35800GU, the Object Class term is Sales Cycle 35802GU, the Representation/Association term is Code 35804GU, the Type term is CCT 35806GU, the Type Name term is Code 35808GU, and the Length is from one to five 35810GU.

For the listID 35812GU, the Category is Attribute 35814GU, the Object Class term is CodeList 35816GU, the Property term is Identification 35817GU, the Representation/Association term is Identifier 35818GU, the Type term is XSD 35820GU, and the Type Name term is token 35822GU. The cardinality between the listID 35812GU and the GDT SalesCycleCode 35800GU is either zero or one 35824GU. The listID 35812GU may be at least document 35826GU.

For the listAgencyID 35828GU, the Category is Attribute 35830GU, the Object Class term is CodeListAgency 35832GU, the Property term is Identification 35834GU, the Representation/Association term is Identifier 35836GU, the Type term is XSD 35838GU, and the Type Name term is token 35840GU. The Cardinality between the listAgencyID 35828GU and the GDT SalesCycleCode 35800GU is either zero or one 35842GU. The listAgencyID 35812GU may be at least document 35844GU.

For the listVersionID 35846GU, the Category is Attribute 35848GU, the Object Class term is CodeList 35850GU, the Property term is Version 35852GU, the Representation/Association term is Identifier 35854GU, the Type term is XSD 35856GU, and the Type Name term is token 35858GU. The cardinality between the listVersionID 35846GU and the GDT SalesCycleCode 35800GU is either zero or one 35860GU. The listVersionID 35812GU may be at least document 35862GU.

For the listAgencySchemeID 35864GU, the Category is Attribute 35866GU, the Object Class term is CodeListAgency 35868GU, the Property term is Scheme 35870GU, the Representation/Association term is Identifier 35872GU, the Type term is XSD 35874GU, and the Type Name term is token 35876GU. The cardinality between the listAgencySchemeID 35864GU and the GDT SalesCycleCode 35800GU is either zero or one 35878GU.

For the listAgencySchemeAgencyID 35880GU, the Category is Attribute 35882GU, the Object Class term is CodeListAgency 35884GU, the Property term is SchemeAgency 35886GU, the Representation/Association term is Identifier 35888GU, the Type term is XSD 35890GU, and the Type Name term is token 35892GU. The cardinality between the listAgencySchemeAgencyID 35880GU and the GDT SalesCycleCode 35800GU is either zero or one 35894GU.

In some implementations, several codes lists may be defined for the GDT SalesCycleCode 35800GU. In some implementations, a default code list may be predefined in the GDT SalesCycleCode 35800GU. Additionally, in some implementations, customers can add additional code lists. For example, attributes may be allocated as follows:

listID may be an ID of the respective code list.

listAgencyID is 310 listVersionID may be a version of the respective code list.

For example, a set of possible characteristic values may be selected that a code of 1 represents a customer care sales cycle and a code of 2 represents a new business sales cycle. The customer sales cycle may describe the phases required for existing customers, in order that an opportunity can be completed successfully. The new business sales cycle may describe the phases required for new customers, in order that an opportunity be completed successfully. In some implementations, the new business sales cycle may be considered to be more complex than the customer sales cycle. For example, important contact persons and decision makers within the new business may need to be identified.

As an example, the attributes can be used as follows:

listID—ID of the respective code list. Provided and administered by the responsible organization of the code list, that is not included in DE 3055. The exact ID has to be obtained by the GDT Owner at the responsible organization. If a unique ID is not available, the name of the respective code list or code type has to be entered that can be used in the corresponding standard, specification or scheme of the responsible organization.

listAgencyID—ID of the administering organization of the code list. This identifier is assigned by the organization from DE 3055, (for example, DUNS number or EAN number of an enterprise). The relevant ID has to be obtained by the GDT Owner of the responsible organization.

listVersionID—Version of the respective code list. Provided and administered by the organization that is listed in the listAgencyID. The relevant version ID may be obtained by the GDT Owner of the responsible organization. If a version has not been provided for the code list, the version of the standard, scheme or procedure should be used.

listAgencySchemeID—The identification of the scheme, according to which, the organization that is listed in the listAgencyID has been identified. This is an example of a specific identification scheme of partners, enterprises, corporations, members, and so on, (for example, DUNS+4), of the administering organization listed in the "listAgencySchemeAgencyID". (e.g., EAN, DUNS, SWIFT, and so on).

listAgencySchemeAgencyID—The identification of the administering organization, (for example, DUNS, EAN, SWIFT), that is responsible for the identification of the organization that is listed in the listAgencyID. This has to be included in DE 3055.

As an example, the GDT SalesCycleCode 35800GU is mainly used for modeling business objects. It defines its own view of a sales process, and, for this reason, may not be used in an electronic message exchange with external parties.

In some implementations, the GDT SalesCycleCode 35800GU is mainly used in Presales in order to assign an opportunity to the sales cycle. The individual phases of the cycle are determined depending on the sales cycle.

(ppppppppppppppppp) SalesCyclePhaseCode

A GDT SalesCyclePhaseCode 35800GV is the coded representation of a sales cycle phase. A sales cycle phase is a section of the sales cycle in which specific activities are carried out, for example, pre-selection, initial contact, presentation, drawing up a quotation. The GDT SalesCyclePhaseCode 35800GV is:

<SalesCyclePhaseCode listAgencyID=310>1</SalesCyclePhaseCode>

The structure of GDT SalesCyclePhaseCode 35800GV is depicted in FIG. 358GV. The GDT SalesCyclePhaseCode 35800GV includes attributes listID 35814GV, listAgencyID 35832GV, listVersionID 35850GV, listAgencySchemeID 35868GV, and listAgencySchemeAgencyID 35886GV. For the GDT SalesCyclePhaseCode 35800GV, the Object Class term is Sales Cycle 35802GV, the Property term is Phase 35804GT, the Representation/Association term is Code 35806GV, the Type term is CCT 35808GV, the Type Name term is Code 35810GV, and the Length is from one to three 35812GV.

For the listID 35814GV, the Category is Attribute 35816GV, the Object Class term is CodeList 35818GV, the Property term is Identification 35820GV, the Representation/Association term is Identifier 35822GV, the Type term is XSD 35824GV, and the Type Name term is token 35826GV. The cardinality between the listID 35814GV and the GDT SalesCyclePhaseCode 35800GV is either zero or one 35828GV. The listID 35814GV may be a record at least 35831GV.

For the listAgencyID 35832GV, the Category is Attribute 35834GV, the Object Class term is CodeListAgency 35836GV, the Property term is Identification 35838GV, the Representation/Association term is Identifier 35840GV, the Type term is XSD 35842GV, and the Type Name term is token 35844GV. The Cardinality between the listAgencyID 35832GV and the GDT SalesCyclePhaseCode 35800GV is either zero or one 35848GV. The listAgencyID 35812GV may be a record at least 35849GV.

For the listVersionID 35850GV, the Category is Attribute 35852GV, the Object Class term is CodeList 35854GV, the Property term is Version 35856GV, the Representation/Association term is Identifier 35858GV, the Type term is XSD 35860GV, and the Type Name term is token 35862GV. The cardinality between the listVersionID 35846GV and the GDT SalesCyclePhaseCode 35800GV is either zero or one 358666GV. The listVersionID 35812GV may be a record at least 35867GV.

For the listAgencySchemeID 35868GV, the Category is Attribute 35870GV, the Object Class term is CodeListAgency 35872GV, the Property term is Scheme 35874GV, the Representation/Association term is Identifier 35876GV, the Type term is XSD 35878GV, and the Type Name term is token 35880GV. The cardinality between the listAgencySchemeID 35864GV and the GDT SalesCyclePhaseCode 35800GV is either zero or one 35884GV.

For the listAgencySchemeAgencyID 35886GV, the Category is Attribute 35888GV, the Object Class term is CodeListAgency 35890GV, the Property term is SchemeAgency 35892GV, the Representation/Association term is Identifier 35894GV, the Type term is XSD 35896GV, and the Type Name term is token 35897GV. The cardinality between the listAgencySchemeAgencyID 35886GV and the GDT SalesCyclePhaseCode 35800GV is either zero or one 35899GV.

Several code lists may be used for the GDT SalesCyclePhaseCode 35800GV. Additionally, a predefined code list may be delivered. In some implementations, other code lists can be added by the customer. An example of attributes in the GDT SalesCyclePhaseCode 35800GV are defined as follows:

listID—ID of corresponding code list.

listAgencyID=310 listID—Version of corresponding code list.

Some possible values are:

| Code | Name | Description |
|---|---|---|
| 1 | Project identification | In this phase, general information is collected on the customer, contacts are determined, and a requirements catalog is compiled. |
| 2 | Qualification | In this phase, the feasibility is determined. A decision is made on whether to terminate the opportunity, or pursue it further. |
| 3 | Value selling | In this phase, a customer-specific use analysis and a competitor strategy is drawn up. |
| 4 | Quotation | In this phase, a customer-specific quotation is drawn up and presented to the customer. |
| 5 | Decision | In this phase, feedback is obtained on the quotation, and unresolved items are clarified, the goal being to obtain non-binding confirmation from the customer that a contract will be concluded. |
| 6 | Conclusion | In this phase, either a contract is negotiated with the customer, or the reasons for failure are analyzed, depending on the outcome. |

A customer may define a code list using the attributes as follows:

listID—ID of corresponding code list. Assigned and managed by the organization responsible for the code list, which is not listed in DE 3055. If no unique ID is available, enter the name of the corresponding code list or code type that can be used in the corresponding standard, specification, or scheme of the responsible organization.

listAgencyID—ID of the organization managing the code list. This ID is assigned by the organization based on DE 3055 (for example, a company's DUNS or EAN number).

listID—Version of corresponding code list. Assigned and managed by the organization specified in the listAgencyID. The relevant version ID may be obtained by the GDT owner from the responsible organization. If no version was assigned for the code list, use the version outlined in the corresponding standard, specification, or scheme.

listAgencySchemeID—The scheme ID used to identify the organization specified in the listAgencyID. This is a specific identification scheme for partners, companies, members, and so on—for example DUNS+4—of the managing organization specified in the listAgencySchemeAgencyID—for example EAN, DUNS, SWIFT.

listAgencySchemeAgencyID—The ID of the managing organization—for example, DUNS, EAN, SWIFT—that is responsible for identifying the organization specified in the listAgencyID.

In some implementations, the GDT SalesCyclePhaseCode 35800GV is primarily used to model business objects. It defines a separate view of a sales process, and may not be used in electronic message exchange with external parties.

The GDT SalesCyclePhaseCode 35800GV is primarily used in Presales, to describe the phases in a sales cycle used in a business transaction.

An example of customer-specific code is a business alignment code that is a coordination of strategy together with the quotation partners. In another example of customer-specific code is a competitor analysis code that is a determination of the strengths and weaknesses of competitor products.

(qqqqqqqqqqqqqqqqq) SalutationText

A GDT SalutationText 35800GW is a salutation. A salutation is the courteous greeting on meeting another person. Here, meeting represents personal or non-personal (phone call, letter, telegram) contact. With this greeting the person offering the greeting demonstrates his view of the relationship with the greeted person. The salutations depend on culture, time and fashion. Using the GDT SalutationText 35800GW, a user can store, for example, an individual salutation that can be used instead of a generated salutation, if required. An example (instance) of the GDT SalutationText 35800GW is:

<SalutationText>Dear Friends</SalutationText>

The structure of the GDT SalutationText 35800GW is depicted in FIG. 358GW. The GDT SalutationText 35800GW includes an attribute LanguageCode 35816GW. For the GDT SalutationText 35800GW, the Property term is Salutation 35802GW, the Representation/Association term is Text 35804GW, the Type term is GDT 35806GW, the Type Name term is Text 35808GW, and the Length is from zero to fifty 35810GW. The Cardinality of the SalutationText 35800GW is one 35812GW. The GDT SalutationText 35800GW may be restricted 35814GW.

For the LanguageCode 35816GW, the Category is Attribute 35818GW, the Property term is Language 38020GW, the Representation/Association term is Code 35822GW, the Type term is XSD 35824GW, the Type Name term is Language 35826GW, the Length is from two to nine 35828GW. The Cardinality between the LanguageCode 35816GW and the GDT SalutationText 35800GW is either zero or one 38530GW. The LanguageCode 35816GW may be optional.

(rrrrrrrrrrrrrrrr) SampleDrawingTypeCode

A GDT SampleDrawingTypeCode 35800GX is the coded representation of a sample-drawing type. The sample-drawing type defines how samples are to be drawn. They can be drawn based on a time interval or quantity interval, depending on the container used, or based on customer-specific rules. An example (instance) of the GDT SampleDrawingTypeCode 35800GX is:

<SampleDrawingType>2</SampleDrawingTypeCode>

The structure of GDT SampleDrawingTypeCode 35800GX is depicted in FIG. 358GX. For the GDT SampleDrawingTypeCode 35800GX, the Object Class term is Sample Drawing 35802GX, the Property term is Type 35804GX, the Representation/Association term is Code 35806GX, the Type term is CCT 35808GX, the Type Name term is Code 35810GX, and the Length is one 35812GX. The GDT SampleDrawingTypeCode 35800GX may be restricted 35814GX.

The GDT SampleDrawingTypeCode 35800GX may include a fixed code list. An example of the attributes include the following values:

listID="10111"

listAgencyID="310"

listVersionID—Version of the relevant code list.

The GDT SampleDrawingTypeCode 35800GX can be used to define whether samples are taken from a material based on time (for example, every two hours), based on quantity (for example, every 3rd unit), based on the container (for example, every tank of a tanker), or based on customer-specific rules. For example, a code list may be defined as:

| Code | Name | Description |
|---|---|---|
| 1 | Time | Time-based sample-drawing |
| 2 | Quantity | Quantity-based sample drawing |
| 3 | Container | Container-based sample drawing |
| 4 | Individual | Individual sample-drawing - specified by the user |

(ssssssssssssssss) ShiftCalendarDeterminationRuleCode

A GDT ShiftCalendarDeterminationRuleCode 35800GY is the coded representation of a rule based on which a shift calendar is determined. A shift calendar contains information on machine runtimes, non-production times, and shift durations. An example (instance) of the ShiftCalendarDeterminationRuleCode 35800GY is:

<ShiftCalendarDeterminationRuleCode>1</ShiftCalendarDeterminationRuleCode>

The structure of GDT ShiftCalendarDeterminationRuleCode 35800GY is depicted in FIG. 358GY. For the GDT ShiftCalendarDeterminationRuleCode 35800GY, the Object Class term is Shift Calendar 35802GY, the Property term is Determination Rule 35804GY, the Representation/Association term is Code 35806GY, the Type term is CCT 35808GY, the Type Name term is Code 35810GY, and the Length is one 35812GY. The GDT ShiftCalendarDeterminationRuleCode 35800GY may be restricted 35814GY.

The GDT ShiftCalendarDeterminationRuleCode 35800GY can be used in production to define how the relevant shift calendar is found. For example, a code list may be defined that a code of 1 represents that a UseNoShiftCalendar can be used, and a code of 2 represents that a UseLogisticsDivisionShiftCalendar can be used. When the UseNoShiftCalendar is selected, then no shift calendar can be used, meaning machine runtimes, non-production times, or shift durations are not taken into account. When the UseLogisticsDivisionShiftCalendar is selected, then the shift calendar that is assigned to the logistics division can be used.

(tttttttttttttttt) PowerOfAttorneyTypeCode

A GDT PowerOfAttorneyTypeCode 35800GZ is a coded representation of the type of rights or power of attorney that someone has. An example of GDT PowerOfAttorneyTypeCode 35800GZ is:

<PowerOfAttorneyTypeCode>1</PowerOfAttorneyTypeCode>

The structure of GDT PowerOfAttorneyTypeCode 35800GZ is depicted in FIG. 358GZ. The GDT PowerOfAttorneyTypeCode 35800GZ includes attributes listID 35814GZ, listAgencyID 35830GZ, listVersionID 35846GZ, listAgencySchemeID 35862GZ, and listAgencySchemeAgencyID 35878GZ. For the GDT PowerOfAttorneyTypeCode 35800GZ, the Property term is Power of Attorney Type 35802GZ, the Representation/Association term is Code 35804GZ, the Type term is CCT 35806GZ, the Type Name term is Code 35808GZ, and the Length is one 35810GZ. The PowerOfAttorneyTypeCode 35800GZ may be restricted.

For the listID 35814GZ, the Category is Attribute 35816GZ, the Object Class term is CodeList 35818GZ, the Property term is Identification 35820GZ, the Representation/Association term is Identifier 35822GZ, the Type term is XSD 35824GZ, and the Type Name term is token 35826GZ. The cardinality between the listID 35814GZ and the GDT PowerOfAttorneyTypeCode 35800GZ is either zero or one 35828GZ.

For the listAgencyID 35830GZ, the Category is Attribute 35832GZ, the Object Class term is CodeListAgency 35834GZ, the Property term is Identification 35836GZ, the Representation/Association term is Identifier 35838GZ, the Type term is XSD 35840GZ, and the Type Name term is token 35842GZ. The Cardinality between the listAgencyID 35830GZ and the GDT PowerOfAttorneyTypeCode 35800GZ is either zero or one 35844GZ.

For the listVersionID 35846GZ, the Category is Attribute 35848GZ, the Object Class term is CodeList 35850GZ, the Property term is Version 35852GZ, the Representation/Association term is Identifier 35854GZ, the Type term is XSD 35856GZ, and the Type Name term is token 35858GZ. The cardinality between the listVersionID 35846GZ and the GDT PowerOfAttorneyTypeCode 35800GZ is either zero or one 35860GZ.

For the listAgencySchemeID 35862GZ, the Category is Attribute 35864GZ, the Object Class term is CodeListAgency 35866GZ, the Property term is Scheme 35868GZ, the Representation/Association term is Identifier 35870GZ, the Type term is XSD 35872GZ, and the Type Name term is token 35874GZ. The cardinality between the listAgencySchemeID 35862GZ and the GDT PowerOfAttorneyTypeCode 35800GZ is either zero or one 35876GZ.

For the listAgencySchemeAgencyID 35878GZ, the Category is Attribute 35880GZ, the Object Class term is CodeListAgency 35882GZ, the Property term is SchemeAgency 35884GZ, the Representation/Association term is. Identifier 35886GZ, the Type term is XSD 35888GZ, and the Type Name term is token 35890GZ. The cardinality between the listAgencySchemeAgencyID 35878GZ and the GDT PowerOfAttorneyTypeCode 35800GZ is either zero or one 35892GZ.

The ListID 35814GZ of the relevant code list is assigned and administered by a customer. The customer is responsible for the values of the ListID 35814GZ in question. The ListAgencyID 35830GZ is the ID of the customer. The ListVersionID 35846GZ is a version of the relevant code list that is assigned and administered by the customer listed in the ListAgencyID 35830GZ. The ListAgencySchemeID 35862GZ is the ID of the scheme by which the customer listed in the ListAgencyID is identified. The ListAgencySchemeID 35862GZ is a particular identification scheme for partners, businesses, and members and so on, of an administering organization that is listed in the ListAgencySchemeAgency ID. The ListAgencySchemeAgencyID 35878GZ is the ID of the administering organization that is responsible for identifying the organization listed in the ListAgencyID 35830GZ.

The GDT PowerOfAttorneyTypeCode 35800GZ can be used to express which power of attorney a person has in a company, for example, a general power of attorney and a general commercial power of attorney.

(uuuuuuuuuuuuuuuu) PriceComponentInactivityReasonCode

The GDT PriceComponentInactivityReasonCode 35800HA is a coded representation of the reason why a pricing element is inactive. A pricing element is inactive if it is not used to calculate subsequent pricing elements in a pricing rule in the context of price calculation. An example (instance) of the GDT PriceComponentInactivityReasonCode 35800HA is:

<PriceComponentInactivityReasonCode>02</PriceComponentInactivityReasonCode>

The GDT PriceComponentInactivityReasonCode 35800HA is depicted in FIG. 358HA. For the GDT PriceComponentInactivityReasonCode 35800HA, the Object Class term is Price Component 35802HA, the Property term is Inactivity Reason 35804HA, the Representation/Association term is Code 35806HA, the Type term is CCT 35808HA, the Type Name term is Code 35810HA, and the Length is from one to two 35812HA. The GDT SupplyChainExceptionStatusCode 35800HA may be a restricted GDT 35814HA.

There is one code list and the GDT PriceComponentInactivityReasonCode 35800HA is a fixed code list. The attributes of PriceComponentInactivityReasonCode have the following values: listID is 10125, listAgencyID is 310, and listVersionID is the version of the relevant code list, which is assigned and managed by SAP AG.

(vvvvvvvvvvvvvvvv) PriceDetailLevelCode

The GDT PriceDetailLevelCode 35800HB is a coded representation of the level of detail of a price. An example (instance) of the GDT PriceDetailLevelCode 35800HB is:

<PriceDetailLevelCode>1</PriceDetailLevelCode>

The GDT PriceDetailLevelCode 35800HB is depicted in FIG. 358HB. For the GDT PriceDetailLevelCode 35800HB include a listVersionID 35816HB attribute. For the GDT PriceDetailLevelCode 35800HB, the object class term is Price 35802HB, the Property Term is Detail Level 35804HB, the Representation/Association term is Code 35806HB, the Type term is CCT 35808HB, the Type Name term is Code 35810HB, and the Length is from one to two 35812HB. The GDT PriceDetailLevelCode 35800HB may be a restricted GDT 35814HB.

For the listVersionID 35816HB, the Category is Attribute 35818HB, the Object Class term is CodeList 35820HB, the Property term is Version 35822HB, the Representation/Association term is Identifier 35824HB, the Type term is XSD 35826HB, and the Type Name term is token 35828HB. The cardinality between the listVersionID 35816HB and the GDT PriceDetailLevelCode 35800HB is either zero or one 35830HB.

The GDT PriceDetailLevelCode 35800HB is a SAP code list with fixed predefined values. Changes to the permitted values involve changes to the interface. The attributes of the GDT PriceDetailLevelCode 35800HB have the following values: listID is "10102", listAgencyID is "310", and listVersionID is an ID of the particular code list that is assigned and managed by SAP AG.

The GDT GDT PriceDetailLevelCode 35800HB is, for example, used in a bidding process to show business partners which level of detail is expected regarding the price information. In some implementations, a code list may include values as follows:

| Code | Name | Description |
|---|---|---|
| 1 | Simple Price | A price defined by an amount and a base quantity. |
| 2 | Complex Price | A price defined using DO PriceSpecification. It can define validity dates, scales or discounts. |
| 3 | No Price | No price is defined. |

(wwwwwwwwwwwwwwwww) PriceSpecificationBaseCode

The GDT PriceSpecificationBaseCode 35800HC is the coded representation of the measurement on which the amount component of a price, discount, or surcharge specification is based. Examples of measurement characteristics are gross weight, net weight, or volume. An example (instance) of the GDT PriceSpecificationBaseCode 35800HC is:

<Price SpecificationBaseCode>1</PriceSpecificationBaseCode>

The structure of GDT PriceSpecificationBaseCode 35800HC is depicted in FIG. 358HC. For the GDT PriceSpecificationBaseCode 35800HC, the Object Class term is Price Specification 35802HC, the Property term is Base 35804HC, the Representation/Association term is Code 35806HC, the Type term is CCT 35808HC, the Type Name term is Code 35810HC, and the Length is from one to two 35812HB. The PriceSpecificationBaseCode 35800HC may be restricted.

In some implementations, there is exactly one code list. The GDT PriceSpecificationBaseCode 35800HC is a fixed code list. An exemplary description of the attributes are a listID that is "10082," or a listAgencyID that is "310," a listID The GDT PriceSpecificationBaseCode 35800HC can be used for maintaining sales or purchasing price specifications. The PriceSpecificationBaseCode 35800HC influences the method of price calculation in a business transaction. The calculation of the price, discount, or surcharge is done on the basis of the specification of the price, discount, or surcharge by means of the GDT PriceSpecificationBaseCode 35800HC, and on the basis of the document data provided by the calling system.

In some implementations, the GDT PriceSpecificationBaseCode 35800HC may correspond to the SAP R/3 and SAP CRM fields KRECH. For example, the GDT PriceSpecificationBaseCode 35800HC may be an SAP code list with fixed predefined values. Changes to the valid characteristics necessitate changes to the interfaces. An example of the code list is shown as follows:

| Code | Name | Description |
|---|---|---|
| 1 | Percentage (of one hundred) | The discount or surcharge (general) is provided as a part of the basic amount in percent, that is, as a percentage. The basic amount is the amount that is determined until now in the price calculation. |

-continued

| Code | Name | Description |
|---|---|---|
| 2 | Fixed Amount | The price, discount, or surcharge is not based on a measurement, but is just an amount. |
| 3 | Quantity | The price, discount, or surcharge is based on a quantity (for example, the sales quantity of the product in a sales order item). |
| 4 | Gross Weight | The price, discount, or surcharge is based on a gross weight (for example, the gross weight of the product in a sales order item). |
| 5 | Net Weight | The price, discount, or surcharge is based on a net weight (for example, the net weight of the product in a sales order item). |

(xxxxxxxxxxxxxxxxx) PriceSpecificationCustomerGroupCode

The GDT PriceSpecificationCustomerGroupCode 35800HD is the coded representation of a group of customers for whom the same price determination applies. An example (instance) of the GDT PriceSpecificationCustomerGroupCode 35800HD is:

<PriceSpecificationCustomerGroupCode>1</PriceSpecificationCustomerGroupCode>

The structure of GDT PriceSpecificationCustomerGroupCode 35800HD is depicted in FIG. 358HD. The GDT PriceSpecificationCustomerGroupCode 35800HD includes attributes listID 35814HD, listAgencyID 35830HD, listVersionID 35846HD, listAgencySchemeID 35862HD, and listAgencySchemeAgencyID 35878HD. For the GDT PriceSpecificationCustomerGroupCode 35800HD, the Object Class Qualifier term is Price Specification 35802HD, the Object Class term is Customer Group 35804HD, the Representation/Association Term is Code 35806HD, the Type term is CCT 35808GZ, the Type Name term is Code 35810HD, and the Length is either one or two 35812HD.

For the listID 35814HD, the Category is Attribute 35816HD, the Object Class term is CodeList 35818HD, the Property term is Identification 35820HD, the Representation/Association term is Identifier 35822HD, the Type term is XSD 35824HD, and the Type Name term is token 35826HD. The cardinality between the listID 35814HD and the GDT PriceSpecificationCustomerGroupCode 35800HD is either zero or one 35828HD.

For the listAgencyID 35830HD, the Category is Attribute 35832HD, the Object Class term is CodeListAgency 35834HD, the Property term is Identification 35836HD, the Representation/Association term is Identifier 35838HD, the Type term is XSD 35840HD, and the Type Name term is token 35842HD. The cardinality between the listAgencyID 35830HD and the GDT PriceSpecificationCustomerGroupCode 35800HD is either zero or one 35844HD.

For the listVersionID 35846HD, the Category is Attribute 35848HD, the Object Class term is CodeList 35850HD, the Property term is Version 35852HD, the Representation/Association term is Identifier 35854HD, the Type term is XSD 35856HD, and the Type Name term is token 35858HD. The cardinality between the listVersionID 35846HD and the GDT PriceSpecificationCustomerGroupCode 35800HD is either zero or one 35860HD.

For the listAgencySchemeID 35862HD, the Category is Attribute 35864HD, the Object Class term is CodeListAgency 35866HD, the Property term is Scheme 35868HD, the Representation/Association term is Identifier 35870HD, the Type term is XSD 35872HD, and the Type Name term is token 35874HD. The cardinality between the listAgencySchemeID 35862HD and the GDT PriceSpecificafionCustomerGroupCode 35800HD is either zero or one 35876HD.

For the listAgencySchemeAgencyID 35878HD, the Category is Attribute 35880HD, the Object Class term is CodeListAgency 35882HD, the Property term is SchemeAgency 35884HD, the Representation/Association term is Identifier 35886HD, the Type term is XSD 35888HD, and the Type Name term is token 35890HD. The cardinality between the listAgencySchemeAgencyID 35878HD and the GDT PriceSpecificationCustomerGroupCode 35800HD is either zero or one 35892HD.

The GDT PriceSpecificationCustomerGroupCode 35800HD is a customer-specific code. For each administering organization (agency) only one code list is allowed. The attribute listID 35814HD is an ID of the relevant code list that is assigned and administered by a customer. The customer is responsible for the values of the ID in question. The attribute listAgencyID 35830HD is an ID of the customer. The attribute listVersionID 35846HD is a version of the relevant code list that is assigned and administered by the customer listed in the attribute listAgencyID 35846HD. The attribute listAgencySchemeID 35862HD is the ID of the scheme by which the customer listed in the listAgencyID is identified. The attribute listAgencyID 35862HD is a particular identification scheme for partners, businesses, and members (such as DUNS+4), and so on, of an administering organization (such as EAN, DUNS, and SWGZT) that is listed in the listAgencySchemeAgencyID. The attribute listAgencySchemeAgencyID 35878HD is an ID of the administering organization (such as DUNS, EAN, or SWGZT) that is responsible for identifying the organization listed in the listAgencyID. It has to be listed in DE 3055.

The GDT PriceSpecificationCustomerGroupCode 35800HD may currently be used only in business objects and A2A messages. The GDT PriceSpecificationCustomerGroupCode 35800HD can be used, for example, for price determination in sales orders, in order to determine prices that apply to the customer. In one example, a possible semantic of the codes is Bulk buyers, meaning customers who are granted a price for bulk buyers. In another example, a possible semantic of the codes is Occasional buyers, meaning customers who are not granted a discount. In yet another example, a possible semantic of the codes is New customers, meaning customers who are granted a discount for new customers.

(yyyyyyyyyyyyyyyyy) PriceSpecificationElementPropertyID

The GDT PricingPriceSpecificationElementPropertyID 35800HE is a unique identifier of a property for the specification of a price, discount or surcharge. Properties are determining elements on the agreement of price, discount or surcharge. An example (instance) of the GDT PricingPriceSpecificationElementPropertyID 35800HE is:

```
<PriceSpecificationElementPropertyID>
    PRODUCT_ID
</PriceSpecificationElementPropertyID>
```

The structure of GDT PricingPriceSpecificationElementPropertyID 35800HE is depicted in FIG. 358HE. For the GDT PricingPriceSpecificationElementPropertyID 35800HE, the Object Class term is PriceSpecificationElementProperty 35802HE, the Property term is Identification 35804HE, the Representation/Association term is Identifier 35806HE, the Type term is CCT 35808HE, the Type Name term is Identifier 35810HE, and the Length is from one to thirty 35812HE. The GDT PricingPriceSpecificationElementPropertyID 35800HE may be restricted 35814HE.

A property that is described by the GDT PricingPriceSpecificationElementPropertyID 35800HE may be unique within the PriceSpecificationElementPropertyDefinitionClass property definition class. The property can be assigned to several property definition classes.

(zzzzzzzzzzzzzzzz) PriceSpecificationElementScaleLine

A GDT PriceSpecificationElementScaleLine 35800HF is a scale line for the specification of a price, discount or surcharge. To define a price, discount, or surcharge specification, you can use a one or two-dimensional scale. This scale consists of scale lines, which define a price, discount, or surcharge as a scale value for each scale level. An example (instance) of the GDT PriceSpecificationElementScaleLine 35800HF is:

```
<PriceSpecificationElementScaleLine>
    <ScaleAxisStep>
    <ScaleAxisBaseCode>1</ScaleAxisBaseCode>
    <IntervalBoundaryTypeCode>1</IntervalBoundaryTypeCode>
    <Quantity unitCode="C62">10</Quantity>
    </ScaleAxisStep>
    <Rate>
        <Value>29.99</Value>
        <CurrencyCode>EUR</CurrencyCode>
        <BaseMeasureUnitCode>C62</BaseMeasureUnitCode>
    </Rate>
    </PriceSpecificationElementScaleLine>
```

In this example, the scale may be a scale line for a price specification that scale is a one-dimensional 'from' price scale. For example, the price is EUR 29.99 EUR per piece from 10 pieces. A ScaleAxisBaseCode 1 represents a quantity according to GDT: ScaleAxisBaseCode. An IntervalBoundaryTypeCode 1 represents a 'from' price scale according to GDT: ScaleAxisStepIntervalBoundaryTypeCode. A unitCode C62 is a piece according to UN/ECE Recommendation #20.

The structure of GDT PriceSpecificationElementScaleLine 35800HF is depicted in FIG. 358HF. The GDT PriceSpecificationElementScaleLine 35800HF includes elements ScaleAxisStep 35806HF, Rate 35822HF, Percent 35838HF, and Fixed Amount 35854HF. For the GDT PriceSpecificationElementScaleLine 35800HF, the Object Class term is Price Specification Element Scale Line 35802HF. The Representation/Association term is Details 35804HF.

For the ScaleAxisStep 35806HF, the Category is Element 35808HF. The Object Class term is Price Specification Element Scale Line 35810HF. The Property term is ScaleAsixStep 35812HF. The Representation/Association term is ScaleAxisStep 35814HF. The Type term is GDT 35816HF. The Type Name term is ScaleAxisStep 35818HF. The Cardinality between the ScaleAxisStep 35814HF and the GDT PriceSpecificationElementScaleLine 35800HF is either one or two 35820HF.

For the Rate 35822HF, the Category is Element 35824HF. The Object Class term is Price Specification Element Scale Line 35826HF. The Property term is Rate 35828HF. The Representation/Association term is Rate 35830HF. The Type term is GDT 35832HF. The Type Name term is Rate 35834HF. The Cardinality between the Rate 35822HF and the GDT PriceSpecificationElementScaleLine 35800IF is either zero or one 35836HF.

For the Percent 35838HF, the Category is Element 35840HF. The Object Class term is Price Specification Element Scale Line 35842HF. The Property term is Percent 35844HF. The Representation/Association term is Percent 35846HF. The Type term is GDT 35848HF. The Type Name term is Percent 35850HF. The Cardinality between the Percent 35838HF and the GDT PriceSpecificationElementScaleLine 35800HF is either zero or one 35852HF.

For the FixedAmount 35854HF, the Category is Element 35856HF. The Object Class term is Price Specification Element Scale Line 35858HF. The Property term is FixedAmount 35860HF. The Representation/Association term is Amount 35862HF. The Type term is GDT 35864HF. The Type Name term is Amount 35866HF. The Cardinality between the FixedAmount 35854HF and the GDT PriceSpecificationElementScaleLine 35800HF is either zero or one 35868HF.

The GDT PriceSpecificationElementScaleLine 35800HF has the following elements:

ScaleAxisStep—Axis Step (scale dimension value) of a dimension of the scale level for which the scale line is defined for the price, discount or surcharge specification.

Rate—Scale value as a monetary rate for prices, discounts or surcharges. In principle, the rate can also be a percentage or a fixed amount.

Percent—Scale value as a percentage for discounts or surcharges.

FixedAmount—Scale value as a fixed amount for discounts or surcharges.

In some implementations, in the GDT PriceSpecificationElementScaleLine 35800HF, the same ScaleAxisStep/ScaleAxisBaseCode may not be specified for different ScaleAxisStep elements. Also, exactly one of the elements Rate, Percent or FixedAmount may be available. Additionally, the numerator of the Rate element may not be non-dimensional. The numerator dimension may be a currency or a percentage. If the Rate element represents a percentage or a fixed amount, the elements Rate/BaseValue, Rate/BaseMeasureUnitCode and Rate/BaseCurrencyCode must not be specified.

In some implementations, if an element that is typed by the GDT PriceSpecificationElementScaleLine 35800HF has cardinality greater than one, then the same type of scale value Rate, Percent, or FixedAmount has to be specified in all instances.

In some implementations, if an element that is typed by the GDT PriceSpecificationElementScaleLine 35800HF has cardinality greater than one, the elements ScaleAxisStep have to be specified with the same number and the same values of ScaleAxisStep/ScaleAxisBaseCode in all instances.

(aaaaaaaaaaaaaaaaaa) PriceSpecificationProductGroupCode

The GDT PriceSpecificationProductGroupCode 35800HG is the coded representation of a group of products for which the same price determination applies. An example (Instance) of the GDT PriceSpecificationProductGroupCode 35800HG is:

<PriceSpecificationProductGroupCode>1</PriceSpecificationProductGroupCode>

The structure of GDT PriceSpecificationProductGroupCode 35800HG is depicted in FIG. 358HG. The GDT PriceSpecificationProductGroupCode 35800HG includes attributes listID 35814HG, listAgencyID 35830HG, listVersionID 35846HG, listAgencySchemeID 35862HG, and listAgencySchemeAgencyID 35878HG. For the GDT PriceSpecificationProductGroupCode 35800HG, the Property term is Price Specification 35802HG, the Object Class term is Product Group 35804HG, the Representation/Association term is Code 35806HG, the Type term is CCT 35808HG, the Type Name term is Code 35810HG, and the Length is either one or two 35812HG.

For the listID 35814HG, the Category is Attribute 35816HG, the Object Class term is CodeList 35818HG, the Property term is Identification 35820HG, the Representation/Association term is Identifier 35822HG, the Type term is XSD 35824HG, and the Type Name term is token 35826HG. The cardinality between the listID 35814HG and the GDT PriceSpecificationProductGroupCode 35800HG is either zero or one 35828HG.

For the listAgencyID 35830HG, the Category is Attribute 35832HG, the Object Class term is CodeListAgency 35834HG, the Property term is Identification 35836HG, the Representation/Association term is Identifier 35838HG, the Type term is XSD 35840HG, and the Type Name term is token 35842HG. The Cardinality between the listAgencyID 35830HG and the GDT PriceSpecificationProductGroupCode 35800HG is either zero or one 35844HG.

For the listVersionID 35846HG, the Category is Attribute 35848HG, the Object Class term is CodeList 35850HG, the Property term is Version 35852HG, the Representation/Association term is Identifier 35854HG, the Type term is XSD 35856HG, and the Type Name term is token 35858HG. The cardinality between the listVersionID 35846HG and the GDT PriceSpecificationProductGroupCode 35800HG is either zero or one 35860HG.

For the listAgencySchemeID 35862HG, the Category is Attribute 35864HG, the Object Class term is CodeListAgency 35866HG, the Property term is Scheme 35868HG, the Representation/Association term is Identifier 35870HG, the Type term is XSD 35872HG, and the Type Name term is token 35874HG. The cardinality between the listAgencySchemeID 35862HG and the GDT PriceSpecificationProductGroupCode 35800HG is either zero or one 35876HG.

For the listAgencySchemeAgencyID 35878HG, the Category is Attribute 35880HG, the Object Class term is CodeListAgency 35882HG, the Property term is SchemeAgency 35884HG, the Representation/Association term is Identifier 35886HG, the Type term is XSD 35888HG, and the Type Name term is token 35890HG. The cardinality between the listAgencySchemeAgencyID 35878HG and the GDT PriceSpecificationProductGroupCode 35800HG is either zero or one 35892HG.

The GDT PriceSpecificationProductGroupCode 35800HG is a customer-specific code. For each administering organization (agency) only one code list is allowed. In some implementations, the attributes are used as follows:

listID—ID of the relevant code list. It is assigned and administered by a customer. The customer is responsible for the values of the ID in question.

listAgencyID—ID of the customer. An ID assigned by an organization listed in the DE 3055 may be used (such as the business IDs assigned by DUNS, EAN, and SWGZT).

listVersionID—Version of the relevant code list. It is assigned and administered by the customer listed in the listAgencyID.

listAgencySchemeID—ID of the scheme by which the customer listed in the listAgencyID is identified. It is a particular identification scheme for partners, businesses, and members (such as DUNS+4), and so on, of an administering organization (such as EAN, DUNS, and SWGZT) that is listed in the listAgencySchemeAgencyID.

listAgencySchemeAgencyID—ID of the administering organization (such as DUNS, EAN, or SWGZT) that is responsible for identifying the organization listed in the listAgencyID. It has to be listed in DE 3055.

In some implementations, the GDT PriceSpecificationProductGroupCode 35800HG may currently be used only in business objects and A2A messages.

In some implementations, the GDT PriceSpecificationProductGroupCode 35800HG can be used, for example, for price determination in sales orders, in order to determine prices that apply to the product. Examples of the possible semantics of the codes are, standard parts, which are products for which standard price determination should apply, and spare parts, which are products for which price determination for the spare parts should apply.

(bbbbbbbbbbbbbbbbbb) PricingProcedureCode

A GDT PricingProcedureCode 35800HH is a coded representation of the procedure used for the price calculation. The procedure is defined by a number of pricing element definitions arranged in sequence, and can be used to control the price calculation. In general, the procedure is specified for the combination of business transaction type and business partner type. An example of GDT PricingProcedureCode 35800HH is:

<PricingProcedureCode>1</PricingProcedureCode>

The structure of GDT PricingProcedureCode 35800HH is depicted in FIG. 358HH. The GDT PricingProcedureCode 35800HH includes attributes listID 35814HH, listAgencyID 35830HH, listVersionID 35846HH, listAgencySchemeID 35862HH, and listAgencySchemeAgencyID 35878HH. For the GDT PricingProcedureCode 35800HH, the Object Class term is Power of Pricing Procedure 35802HH, the Representation/Association term is Code 35804HH, the Type term is CCT 35806HH, the Type Name term is Code 35808HH, and the Length is from one to four 35810HH. The GDT PricingProcedureCode 35800HH may be restricted 35812HH.

For the listID 35814HH, the Category is Attribute 35816HH, the Object Class term is CodeList 35818HH, the Property term is Identification 35820HH, the Representation/Association term is Identifier 35822HH, the Type term is XSD 35824HH, and the Type Name term is token 35826HH. The cardinality between the listID 35814HH and the GDT PricingProcedureCode 35800HH is either zero or one 35828HH.

For the listAgencyID 35830HH, the Category is Attribute 35832HH, the Object Class term is CodeListAgency 35834HH, the Property term is Identification 35836HH, the Representation/Association term is Identifier 35838HH, the Type term is XSD 35840HH, and the Type Name term is token 35842HH. The Cardinality between the listAgencyID 35830HH and the GDT PricingProcedureCode 35800HH is either zero or one 35844HH.

For the listVersionID 35846HH, the Category is Attribute 35848HH, the Object Class term is CodeList 35850HH, the Property term is Version 35852HH, the Representation/Association term is Identifier 35854HH, the Type term is XSD 35856HH, and the Type Name term is token 35858HH. The cardinality between the listVersionID 35846HH and the GDT PricingProcedureCode 35800HH is either zero or one 35860HH.

For the listAgencySchemeID 35862HH, the Category is Attribute 35864HH, the Object Class term is CodeListAgency 35866HH, the Property term is Scheme 35868HH, the Representation/Association term is Identifier 35870HH, the Type term is XSD 35872HH, and the Type Name term is token 35874HH. The cardinality between the listAgencySchemeID 35862HH and the GDT PricingProcedureCode 35800HH is either zero or one 35876HH.

For the listAgencySchemeAgencyID 35878HH, the Category is Attribute 35880HH, the Object Class term is CodeListAgency 35882HH, the Property term is SchemeAgency 35884HH, the Representation/Association term is Identifier 35886HH, the Type term is XSD 35888HH, and the Type Name term is token 35890HH. The cardinality between the listAgencySchemeAgencyID 35878HH and the GDT PricingProcedureCode 35800HH is either zero or one 35892HH.

A customer-specific code list is assigned to the GDT PricingProcedureCode 35800HH. For example, a customer can define the codes in the customer-specific code list.

The attributes of the GDT PricingProcedureCode 35800HH correspond to those of the CCT Code. As an example, the attributes of the GDT PricingProcedureCode 35800HH can be assigned the following values: the listID is “10141,” the listAgencyID is the ID of the customer, the listVersionID is the assigned and managed by the customer, the listAgencySchemeID is the ID of the scheme if the listAgencyID is not taken from DE 3055, and the listAgencySchemeAgencyID is the ID of the organization (taken from DE 3055) that manages the scheme of the listAgencySchemeID.

For example, some of the possible semantics of the codes are Internet Sales that is calculation rule for business transactions in Internet Sales, Wholesale Trade that is calculation rule for business transactions in wholesale trade, and Wholesale Trade Export that is calculation rule for business transactions in wholesale trade for export.

In some implementations, the GDT PricingProcedureCode 35800HH is represented by the pricing procedure in the ERP system.

(cccccccccccccccccc) PricingProcedureDeterminationCode

The GDT PricingProcedureDeterminationCode 35800HI is a coded representation of the determination of a pricing procedure. A pricing procedure describes the means, and, in particular, the sequence, by which price specifications are taken into consideration during price determination. An example of the GDT PricingProcedureDeterminationCode 35800HI is:

<PricingProcedureDeterminationCode>1</PricingProcedureDeterminationCode>

The structure of GDT PricingProcedureDeterminationCode 35800HI is depicted in FIG. 358HI. For the GDT PricingProcedureDeterminationCode 35800HI, the Object Class term is Pricing Procedure Determination 35802HI, the Representation/Association term is Code 35804HI, the Type term is CCT 35806HI, the Type Name term is Code 35808HI, the Length is one 35810HI.

The GDT PricingProcedureDeterminafionCode 35800HI is a fixed, specific code list. The attributes listID, listAgencyID, listVersionID, listAgencySchemeID, listAgencySchemeAgencyID are omitted in the structure table, because they would contain only constant, specific values during runtime.

In some implementations, the GDT PricingProcedureDeterminationCode 35800HI should only be used when both sender and recipient have access to shared or harmonized Business Configuration, for example during internal communication in an enterprise.

The GDT PricingProcedureDeterminationCode 35800HI can be used to determine a pricing procedure for a customer in a sales document. Some examples for semantics of the code list are:

Standard—standard pricing procedure applies

Standard incl. sales tax—standard pricing procedure including sales tax applies (dddddddddddddddddd) ProductCategoryHierarchyUsageCode The GDT ProductCategoryHierarchyUsageCode 35800HJ represents, in the form of a code, the usage of a product category hierarchy. A product category hierarchy is a classification system for products. The product category hierarchy describes a hierarchical ordering of product categories that exist on both higher and lower levels in relation to one another, and whose structure can be represented as a tree. An example (instance) of the GDT ProductCategoryHierarchyUsageCode 35800HJ is:

<ProductCategoryHierarchyUsageCode>1</ProductCategoryHierarchyUsageCode>

The structure of GDT ProductCategoryHierarchyUsageCode 35800HJ is depicted in FIG. 358HJ. For the ProductCategoryHierarchyUsageCode 35800HJ, the Object Class term is Product Category Hierarchy 35802HJ, the Property term is Usage 35804HJ, the Representation/Association term is Code 35806HJ, the Type term is CCT 35808HJ, the Type Name term is Code 35810HJ, and the Length is from one to twenty 35812HJ. The GDT ProductCategoryHierarchyUsageCode 35800HJ may be restricted 35814HJ.

Several code lists are allowed for the GDT ProductCategoryHierarchyUsageCode 35800HJ. For example, a first code list and additional code lists that depend on the implemented applications may be provided by SAP AG in Walldorf Germany. Also, customers can add other code lists. As an example, the attributes have the following values:

listID=“10065”

listAgencyID=“310”

listVersionID—version of the relevant code list.

In some implementations, the attributes are used as follows:

ListID—ID of the relevant code list. It is assigned and administered by a customer. The customer is responsible for the values of ID in question.

ListAgencyID—The ID of the customer. An ID assigned by an organization listed in the DE 3055 may be used.

ListVersionID—version of the relevant code list. It is assigned and administered by the customer listed in the ListAgencyID.

ListAgencySchemeID—the ID of the scheme by which the customer listed in the ListAgencyID is identified. It is a particular identification scheme for partners, businesses, and members and so on, of an administering organization that is listed in the ListAgencySchemeAgency ID.

ListAgencySchemeAgencyID—the ID of the administering organization that is responsible for identifying the organization listed in the ListAgencyID. It has to be listed in DE 3055.

During product maintenance the number of maintainable product category hierarchies, and thus the number of product attributes, is limited when you enter a ProductCategoryHierarchyUsageCode.

An exemplary code List is shown in the following table:

| Code | Name | Description |
|---|---|---|
| 1 | Sales | Product category hierarchy can be used to represent the sales data for a product |
| 2 | Purchasing | Product category hierarchy can be used to represent the purchasing data for a product |
| 3 | Basic Data | Product category hierarchy can be used to represent the basic data for a product |

(eeeeeeeeeeeeeeeee) ProductDimensions

The GDT ProductDimensions 35800HK contains the dimensions of a product in length, width and height in one single unit of measurement. An example (instance) of the ProductDimensions 35800HK is:

```
<ProductDimensions measureUnitCode="CM">
    <LengthMeasure>100,3</LengthMeasure >
    <WidthMeasure>51,6</WidthMeasure >
    <HeightMeasure>22,7</HeightMeasure >
</ProductDimensions>
```

The structure of GDT ProductDimensions 35800HK is depicted in FIG. 358HK. The GDT ProductDimensions 35800HK includes an attribute MeasureUnitCode 35808HK, and elements LengthMeasure 35824HK, WidthMeasure 35840HK, and HeightMeasure 35856HK. For the GDT ProductDimensions 35800HK, the Object Class term is Product Dimensions 35802HK, the Property term is Details 35804HK, and the Representation/Association term is Details 35806HK.

For the MeasureUnitCode 35808HK, the Category is Attribute 35810HK. The Object Class term is Product Dimensions 35812HK. The Property term is Measure Unit 35814HK. The Representation/Association term is Code 35816HK. The Type term is GDT 35818HK. The Type Name term is MeasureUnitCode 35820HK. The Cardinality between the MeasureUnitCode 35808HK and the GDT ProductDimensions 35800HK is one 35822HK.

For the LengthMeasure 35824HK, the Category is Element 35826HK. The Object Class term is Product Dimension 35828HK. The Property term is Length 35830HK. The Representation/Association term is Measure 35832HK. The Type term is GDT 35834HK. The Type Name term is Measure 35836HK. The Cardinality between the LengthMeasure 35824HK and the GDT ProductDimensions 35800HK is either zero or one 35838HK.

For the WidthMeasure 35840HK, the Category is Element 35842HK. The Object Class term is Product Dimension 35844HK. The Property term is Width 35846HK. The Representation/Association term is Measure 35848HK. The Type term is GDT 35850HK. The Type Name term is Measure 35852HK. The Cardinality between the WidthMeasure 35840HK and the GDT ProductDimensions 35800HK is either zero or one 35854HK.

For the HeightMeasure 35856HK, the Category is Element 35858HK. The Object Class term is Product Dimension 35860HK. The Property term is Height 35862HK. The Representation/Association term is Measure 35864HK. The Type term is GDT 35866HK. The Type Name term is Measure 35868HK. The Cardinality between the HeightMeasure 35856HK and the GDT ProductDimensions 35800HK is either zero or one 35870HK.

In some implementations, the GDT ProductDimensions 35800HK may have least one dimension, length, width, or height, be specified. Depending on the character and use of the product, not all dimensions have to be specified. The plausibility of the dimensions can only be checked in the context of each application.

(fffffffffffffffff) ProductionSegmentID

A GDT ProductionSegmentID 35800HL is a unique identifier for a production segment. A ProductionSegment is a section in the production of a material in a LogisticsDivision. An example (instance) of the GDT ProductionSegmentID 35800HL is:

<ProductionSegmentID>WPRD_1</ProductionSegmentID>

The structure of GDT ProductionSegmentID 35800HL is depicted in FIG. 358HL. For the ProductionSegmentID 35800HL, the Object Class term is Product Segment 35802HL, the Property term is Identification 35804HL, the Representation/Association term is Identifier 35806HL, the Type term is CCT 35808HL, the Type Name term is Identifier 35810HL, and the Length is from one to forty 35812HL. The GDT ProductionSegmentID 35800HL may be restricted 35814HL.

(ggggggggggggggggg) ProductModelID

A GDT ProductModelID 35800HM is a unique identifier for a model of a product. A model signifies the specific construction type of a material product that can also be produced or provided in another, related construction type. There can be several models for one product. An example (instance) of the GDT ProductModelID 35800HM is:

<ProductModelID>MAN-10003<ProductModelID>

The structure of GDT ProductModelID 35800HM is depicted in FIG. 358HM. For the ProductModelID 35800HM, the Object Class term is Product Model 35802HM, the Property term is Identification 35804HM, the Representation/Association term is Identifier 35806HM, the Type term is CCT 35808HM, the Type Name term is Identifier 35810HM, and the Length is from one to forty 35812HM. The GDT ProductModelID 35800HM may be restricted 35814HM.

In some implementations, aModelID is unique in the context of the manufacturer and a ProductID. As an example, a car manufacturer may specify his models by size, cubic capacity, engine type, body style. A customer can then represent the size by a letter, a number or a name, the cubic capacity by a number, the engine type by letters and the body style by a name. An example of such values would be 435DI Caravan, 435S Coupe, or B22S Coupe.

(hhhhhhhhhhhhhhhhh) ProductPartyID

A GDT ProductPartyID 35800HN is an identifier for a product assigned by a party. A product is either a tangible or intangible good, and is a part of the business activities of a company. It can be traded and contributes directly or indirectly to value added. An example (instance) of the GDT ProductPartyID 35800HN is:

<ProductSellerID>B 1165 HS</ProductSellerID>

The structure of GDT ProductPartyID 35800HN is depicted in FIG. 358HN. For the GDT ProductPartyID 35800HN, the Object Class term is Product 35802HN, the Property Qualifier term is Party 35804HN, the Property term is Identification 35806HN, the Representation/Association term is Identifier 35808HN, the Type term is GDT 35810HN, the Type Name term is ProductID 35812HN, and the Length is from one to sixty 35814HN. The GDT ProductPartyID 35800HN may be restricted 35816HN.

The GDT ProductPartyID 35800HN is the proprietary identifier assigned by a business partner. The business partner (in its role) that assigned this identifier must derive from the business context of the message that the GDT ProductPartyID 35800HN uses.

The use of the GDT ProductPartyID 35800HN is role-dependent (for example, as an ID assigned by the Buyer). The party is specified by its role. "Party" is replaced with the "partner role type" (for example, ProductSellerID).

(iiiiiiiiiiiiiiii) ProductTax

A GDT ProductTax 35800HO is a tax that is incurred during product-related business transactions such as purchase, sales or consumption. An example (instance) of a GDT ProductTax 35800HO used in TaxDueNotification is:

```
<ProductTax>
    <CountryCode>DE</CountryCode>
    <TypeCode>VAT</TypeCode>
    <TypeDescription>Value added tax</TypeDescription>
    <BaseAmount currencyCode="EUR">100</BaseAmount>
    <Percent>16</Percent>
    <Amount currencyCode="EUR">116</Amount>
    BusinessTransactionDocumentItemGroupID>1</BusinessTransaction
    DocumentItemGroupID>
</ProductTax>
```

The structure of GDT ProductTax 35800HO is depicted in FIG. 358HOi and FIG. 358HOii. The GDT ProductTax 35800HO includes elements CountryCode 35803HO, JurisdictionCode 35811HO, TypeCode 35819HO, TypeDescription 35827HO, BaseAmount 35835HO, Percent 35843HO, Amount 35851HO, NonDeductiblePercent 358559HO, NonDeductibleAmount 35867HO, BusinessTransactionDocumentItemGroupID 35875HO, TriangulationIndicator 35883HO, and LegallyRequiredPhrase 35892HO. For the GDT ProductTax 35800HO, the Object Class term is Product Tax 35801HO, and the Representation/Association term is Details 35802HO.

For the CountryCode 35803HO, the Category is Element 35804HO. The Object Class term is Product Tax 35805HO. The Property term is Country Code 35806HO. The Representation/Association term is Code 35807HO. The Type term is GDT 35808HO. The Type Name term is Country Code 35809HO. The Cardinality between the CountryCode 35803HO and the GDT ProductTax 35800HO is either zero or one 35810HO.

For the JurisdictionCode 35811HO, the Category is Element 35812HO. The Object Class term is Product Tax 35813HO. The Property term is Tax Jurisdiction Code 35814HO. The Representation/Association term is Code 35815HO. The Type term is GDT 35816HO. The Type Name term is Tax Jurisdiction Code 35817HO. The Cardinality between the JurisdictionCode 35811HO and the GDT ProductTax 35800HO is either zero or one 35818HO.

For the TypeCode 35819HO, the Category is Element 35820HO. The Object Class term is Product Tax 35821HO. The Property term is Type Code 35822HO. The Representation/Association term is Code 35823HO. The Type term is GDT 35824HO. The Type Name term is Product tax Type Code 35825HO. The Cardinality between the TypeCode 35819HO and the GDT ProductTax 35800HO is either zero or one 35826HO.

For the TypeDescription 35827HO, the Category is Element 35828HO. The Object Class term is Product Tax 35829HO. The Property term is Type Description 35830HO. The Representation/Association term is Text 35831HO. The Type term is GDT 35832HO. The Type Name term is Description 35833HO. The Cardinality between the TypeDescription 35827HO and the GDT ProductTax 35800HO is either zero or one 35834HO.

For the BaseAmount 35835HO, the Category is Element 35836HO. The Object Class term is Product Tax 35837HO. The Property term is Base Amount 35838HO. The Representation/Association term is Amount 35839HO. The Type term is GDT 35840HO. The Type Name term is Amount 35841HO. The Cardinality between the BaseAmount 35835HO and the GDT ProductTax 35800HO is either zero or one 35842HO.

For the Percent 35843HO, the Category is Element 35844HO. The Object Class term is Product Tax 35845HO. The Property term is Percent 35846HO. The Representation/Association term is Percent 35847HO. The Type term is GDT 35848HO. The Type Name term is Percent 35849HO. The Cardinality between the Percent 35843HO and the GDT ProductTax 35800HO is either zero or one 35850HO.

For the Amount 35851HO, the Category is Element 35852HO. The Object Class term is Product Tax 35853HO. The Property term is Amount 35854HO. The Representation/Association term is Amount 35855HO. The Type term is GDT 35856HO. The Type Name term is Amount 35857HO. The Cardinality between the Amount 35851HO and the GDT ProductTax 35800HO is either zero or one 35858HO.

For the NonDeductiblePercent 35859HO, the Category is Element 35860HO. The Object Class term is Product Tax 35861HO. The Property term is Non Deductible Percent 35862HO. The Representation/Association term is Decimal 35863HO. The Type term is GDT 35864HO. The Type Name term is Percent 35865HO. The Cardinality between the NonDeductiblePercent 35861HO and the GDT ProductTax 35800HO is either zero or one 35866HO.

For the NonDeductibleAmount 35867HO, the Category is Element 35868HO. The Object Class term is Product Tax 35869HO. The Property term is Non Deductible Amount 35870HO. The Representation/Association term is Amount 35871HO. The Type term is GDT 35872HO. The Type Name term is Amount 35873HO. The Cardinality between the Amount 35867HO and the GDT ProductTax 35800HO is either zero or one 35874HO.

For the BusinessTransactionDocumentItemGroupID 35875HO, the Category is Element 35876HO. The Object Class term is Product Tax 35877HO. The Property term is Business Transaction Document Item Group Identification 35878HO. The Representation/Association term is Identifier 35879HO. The Type term is GDT 35880HO. The Type Name term is BusinessTransactionDocumentItemGroupID 35881HO. The Cardinality between the Amount 35875HO and the GDT ProductTax 35800HO is either zero or one 35882HO.

For the TriangulationIndicator 35883HO, the Category is Element 35884HO. The Object Class term is Product Tax 35885HO. The Property term is Triangulation 35886HO. The Representation/Association term is Indicator 35887HO. The Type term is CCT 35888HO. The Type Name term is Indicator 35889HO. The Cardinality between the Amount 35883HO and the GDT ProductTax 35800HO is either zero or one 35890HO.

For the LegallyRequiredPhrase 35891HO, the Category is Element 35892HO. The Object Class term is Product Tax 35893HO. The Property term is Legally Required Phrase 35894HO. The Representation/Association term is Text 35895HO. The Type term is CCT 35896HO. The Type Name term is Text 35897HO. The Cardinality between the Amount 35891HO and the GDT ProductTax 35800HO is either zero or one 35899HO.

In this example, the following elements are used in the GDT ProductTax 35800HO:

CountryCode—Country code (HMO 3166-1) defines the country in which the tax is incurred.

JurisdictionCode—used for some countries (in particular the US) to identify the responsible tax authorities.

TypeCode—(tax code), see GDT ProductTaxTypeCode.

TypeDescription—short description of tax (e.g. for the tax code "OTH—Other taxes, unspecified, miscellaneous tax charges").

BaseAmount—Base amount on which tax was calculated (assessment basis).

Percent—Tax rate, level of tax in percent.

Amount—Tax amount that is due for the underlying base amount.

NonDeductibleAmount—Percentage rate (portion) of tax that is non-deductible.

NonDeductibleAmount—Amount of tax that is non-deductible.

BusinessTransactionDocumentItemGroupID—groups items of a BusinessTransactionDocument that are taxed in the same way. There is no global code list, the possible values are arbitrary and may be used consistently within a document (e.g., an invoice). The BTDItemGroupID can optionally be used to relate the taxes at item level to the summary tax lines at document level. The BTDItemGroupID assists during invoice verification.

TriangulationIndicator—Yes/no indicator that specifies whether the transaction is a triangular transaction.

LegallyRequiredPhrase—A legally required phrase that may be printed on the invoice.

The segment "ProductTax" is always connected with an amount from which the base amount to be taxed is calculated. Exact rules on which taxes may be reported in summary form or at item level are country-dependent and are derived from the relevant legal requirements. For example, German sales tax may be reported in an invoice in summarized form for each tax rate. Non-deductible taxes are only relevant for incoming invoices and credit memos. When tax rate or tax amount is reported, the tax type (TypeCode) must also be specified.

The GDT ProductTax 35800HO can be used to report different tax portions in invoice amounts or to initiate tax returns and payments of a company to the responsible tax authorities. A tax is a mandatory public payment that a community levies on natural and legal persons in its territory at a unilaterally fixed level (unlike fees and contributions) without providing a service in return.

The tax jurisdiction code of a natural or legal person is part of the address data. Tax calculation depends on the tax jurisdiction code of the ship-from or ship-to party in certain countries, e.g., the US, Brazil.

(jjjjjjjjjjjjjjjj) ProductUsageCode

A GDT ProductUsageCode 35800HP is the coded representation of the usage of a product in a process. An example (instance) of the GDT ProductUsageCode 35800HP is:

<ProductUsageCode>1</ProductUsageCode>

The structure of GDT ProductUsageCode 35800HP is depicted in FIG. 358HP. The GDT ProductUsageCode 35800HP includes attributes listID 35816HP, listAgencyID 35832HP, listVersionID 35846HP, listAgencySchemeID 35864HP, and listAgencySchemeAgencyID 35880HP. For the GDT ProductUsageCode 35800HP, the Object Class term is Product 35802HP, the Property term is Usage 35804HP, the Representation/Association term is Code 35806HP, the Type term is CCT 35808HP, the Type Name term is Code 35810HP, and the Length is either one or three 35812HP. The GDT ProductUsageCode 35800HP may be restricted 35814HP.

For the listID 35816HP, the Category is Attribute 35818HP, the Object Class term is CodeList 35820HP, the Property term is Identification 35822HP, the Representation/Association term is Identifier 35822HP, the Type term is XSD 35826HP, and the Type Name term is token 35828HP. The cardinality between the listID 35816HP and the GDT ProductUsageCode 35800HP is either zero or one 35830HP.

For the listAgencyID 35832HP, the Category is Attribute 35834HP, the Object Class term is CodeListAgency 35836HP, the Property term is Identification 35838HP, the Representation/Association term is Identifier 35840HP, the Type term is XSD 35842HP, and the Type Name term is token 35844HP. The Cardinality between the listAgencyID 35832HP and the GDT ProductUsageCode 35800HP is either zero or one 35846HP.

For the listVersionID 35848HP, the Category is Attribute 35850HP, the Object Class term is CodeList 35852HP, the Property term is Version 35854HP, the Representation/Association term is Identifier 35856HP, the Type term is XSD 35858HP, and the Type Name term is token 35860HP. The cardinality between the listVersionID 35848HP and the GDT ProductUsageCode 35800HP is either zero or one 35862HP.

For the listAgencySchemeID 35864HP, the Category is Attribute 35866HP, the Object Class term is CodeListAgency 35868HP, the Property term is Scheme 35870HP, the Representation/Association term is Identifier 35872HP, the Type term is XSD 35874HP, and the Type Name term is token 35876HP. The cardinality between the listAgencySchemeID 35864HP and the GDT ProductUsageCode 35800HP is either zero or one 35878HP.

For the listAgencySchemeAgencyID 35880HP, the Category is Attribute 35882HP, the Object Class term is CodeListAgency 35884HP, the Property term is SchemeAgency 35886HP, the Representation/Association term is Identifier 35888HP, the Type term is XSD 35890HP, and the Type Name term is token 35892HP. The cardinality between the listAgencySchemeAgencyID 35880HP and the GDT ProductUsageCode 35800HP is either zero or one 35894HP.

The GDT ProductUsageCode 35800HP is a customer-specific code. For each administering organization (agency) only one code list is allowed. The attributes are used as follows:

listID—ID of the relevant code list. It is assigned and administered by a customer. The customer is responsible for the values of the ID in question.

listAgencyID—ID of the customer. An ID assigned by an organization listed in the DE 3055 may be used (such as the business IDs assigned by DUNS, EAN, and SWGZT).

listVersionID—Version of the relevant code list. It is assigned and administered by the customer listed in the listAgencyID.

listAgencySchemeID—ID of the scheme by which the customer listed in the listAgencyID is identified. It is a particular identification scheme for partners, businesses, and members (such as DUNS+4), and so on, of an administering organization (such as EAN, DUNS, and SWGZT) that is listed in the listAgencySche-meAgencyID.

listAgencySchemeAgencyID—ID of the administering organization (such as DUNS, EAN, or SWGZT) that is responsible for identifying the organization listed in the listAgencyID. It has to be listed in DE 3055.

The GDT ProductUsageCode 35800HP can be used, for example, in sales orders, to define the usage for which a product is sold. Examples of the possible semantics of the codes are:

Spare part—the product can be used as a spare part.

Sample—the product can be used as a sample.

Series product—the product can be used for repetitive manufacturing.

ProductWeights

A GDT ProductWeights 35800HQ specifies the gross, net and tare weight of a product in a particular unit of measurement. An example of the GDT ProductWeights 35800HQ is:

```
<ProductWeights measureUnitCode="KGM">
    <GrossWeightMeasure>10.3</GrossWeightMeasure>
    <NetWeightMeasure>10.1</NetWeightMeasure>
    <TareWeightMeasure>0.2</TareWeightMeasure>
<ProductWeights>
```

The structure of GDT ProductWeights 35800HQ is depicted in FIG. 358HQ. The GDT ProductWeights 35800HQ includes an attribute MeasureUnitCode 35808HQ, and elements GrowwWeightMeasure 35824HQ, NetWeightMeasure 35840HQ, and TareWeightMeasure 35856HQ. For the GDT ProductWeights 35800HQ, the Object Class term is Product Weight 35802HQ, the Property term is Details 35804HQ, and the Representation/Association term is Details 35806HQ.

For the MeasureUnitCode 35808HQ, the Category is Attribute 35810HQ. The Object Class term is Product Weights 35812HQ. The Property term is Measure Unit 35814HQ. The Representation/Association term is Code 35816HQ. The Type term is GDT 35818HQ. The Type Name term is MeasureUnitCode 35820HQ. The Cardinality between the MeasureUnitCode 35808HQ and the GDT ProductWeights 35800HQ is one 35822HQ.

For the GrossWeightMeasure 35824HQ, the Category is Element 35826HQ. The Object Class term is Product Weight 35828HQ. The Property term is Gross Weight 35830HQ. The Representation/Association term is Measure 35832HQ. The Type term is GDT 35834HQ. The Type Name term is Measure 35836HQ. The Cardinality between the GrossWeightMeasure 35824HQ and the GDT ProductWeights 35800HQ is either zero or one 35838HQ.

For the NetWeightMeasure 35840HQ, the Category is Element 35842HQ. The Object Class term is Product Weight 35844HQ. The Property term is Net Weight 35846HQ. The Representation/Association term is Measure 35848HQ. The Type term is GDT 35850HQ. The Type Name term is Measure 35852HQ. The Cardinality between the NetWeightMeasure 35840HQ and the GDT ProductWeights 35800HQ is either zero or one 35854HQ.

For the TareWeightMeasure 35856HQ, the Category is Element 35858HQ. The Object Class term is Product Weight 35860HQ. The Property term is Tare Weight 35862HQ. The Representation/Association term is Measure 35864HQ. The Type term is GDT 35866HQ. The Type Name term is Measure 35868HQ. The Cardinality between the TareWeightMeasure 35856HQ and the GDT ProductWeights 35800HQ is either zero or one 35870HQ.

In some implementations, at least one weight in the GDT ProductWeights 35800HQ may be specified. Depending on how the GDT ProductWeights 35800HQ can be used, one of the weight details can be omitted since it can be calculated using the other two weights. If all weights are specified, then it may be according to the formula Gross Weight=Net Weight+Tare Weight. The plausibility of the weights can be checked in the context of each application.

The GDT ProductWeights 35800HQ can be used to calculate the total weight of several products. In one example, the gross weight is important for selecting the method of transport since goods are normally transported in their packaging. In another example, the net weight is important for the maximum load bearing of a floor since the product is normally installed without its packaging. For example, the packaging weight can be specified instead of the gross weight, for example, to save weighing the product once it is packed. The gross weight can then be calculated from the specified packaging weight.

(kkkkkkkkkkkkkkkkkk) ProfitCentreTypeCode

The GDT ProfitCentreTypeCode 35800HR is the coded representation of the nature of a profit center. An example (instance) of the GDT ProfitCentreTypeCode 35800HR is:

<ProfitCentreTypeCode>1</ProfitCentreTypeCode>

The structure of GDT ProfitCentreTypeCode 35800HR is depicted in FIG. 358HR. For the GDT ProfitCentreTypeCode 35800HR, the Object Class term is Product Centre 35802HR, the Property term is Type 35804HR, the Representation/Association term is Code 35806HR, the Type term is CCT 35808HR, the Type Name term is Code35810HR, and the Length is from one to four 35812HR. The GDT ProfitCentreTypeCode 35800HR may be restricted 35814HR.

The GDT ProfitCentreTypeCode 35800HR is a customer-specific code list. The GDT ProfitCentreTypeCode 35800HR is a fixed code list. The attributes listID, listAgencyID, listVersionID, listAgencySchemeID, listAgencySchemeAgencyID are missing in the structure as they would be filled with constant, customer-specific values at run-time.

The GDT ProfitCentreTypeCode 35800HR makes it possible to define sets of profit centers on the basis of the value of the GDT ProfitCentreTypeCode 35800HR. Reference can then be made to these sets in the assessment, overhead costing, or settlement, for example.

Some examples of possible code semantics are:

Production: The profit center has the nature of "Production".

Sales and Distribution: The profit center has the nature of "Sales and Distribution".

Research and Development: The profit center has the nature of "Research and Development".

(llllllllllllllllll) ProjectElementAssignment

The GDT ProjectElementAssignment 35800HS is the assignment between two elements of a project. An example (instance) of the GDT ProjectElementAssignment 35800HS is:

```
<ProjectElementAssignment>
    <FromProjectReference>
        <ID>33FAEB7C03D0AF4CA09ECE33B3296C6D</ID>
<ElementID>548A8B7F39D8B618F40AB8154015D306</ElementID>
        <ElementTypeCode>2</ElementTypeCode>
    </FromReference>
    <ToProjectReference>
        <ID>33FAEB7C03D0AF4CA09ECE33B3296C6D</ID>
<ElementID>57F39D8B618F40AB8154015D306FF33A</ElementID>
        <ElementTypeCode>1</ElementTypeCode>
```

-continued

```
    </ToProjectReference>
</ProjectElementAssignment>
```

The structure of the GDT ProjectElementAssignment 35800HS is depicted in FIG. 358HS. The GDT ProjectElementAssignment 35800HS includes elements FromProjectReference 35810HS and ToProjectReference 35826HS. For the GDT ProjectElementAssignment 35800HS, the Object Class term is Project Element Assignment 35802HS, the Representation/Association term is Details 35804HS, the Type term is GDT 35806HS, and the TypeName term is ProjectElementAssignment 35808HS.

For the FromProjectReference 35810HS, the Category is Element 35812HS, the Object Class term is Project Element Assignment 35814HS, the Property term is FromProjectReference 35816HS, the Representation/Association term is Details 35818HS, the Type term is GDT 35820HS, and the TypeName term is ProjectReference 35822HS. The Cardinality between the FromProjectReference 35810HS and the GDT ProjectElementAssignment 35800HS is one 35824HS.

For the ToProjectReference 35826HS, the Category is Element 35828HS, the Object Class term is Project Element Assignment 35830HS, the Property term is ToProjectReference 35832HS, the Representation/Association term is Details 35834HS, the Type term is GDT 35836HS, and the TypeName term is ProjectReference 35838HS. The Cardinality between the ToProjectReference 35826HS and the GDT ProjectElementAssignment 35800HS is one 35840HS.

The FromProjectReference 35810HS is a reference to the element in a project from which another element is to be assigned. The ToProjectReference 35826HS is a reference to the element in a project to which another element is to be assigned.

In some implementations, only assignments between elements of projects are allowed, that is, FromProjectReference and ToProjectReference must contain references to elements in projects and not simply references to projects as a whole.

For example, the FromProjectReference may be a role and ToProjectReference may be a task in the same project—the task is assumed by the role (or more precisely, by a specific person who fills the role). A role can assume multiple tasks and a task can be performed by multiple roles.

Generally, a ProjectElementAssignment can be used to assign two elements of the same project to each other. The significance of the assignment is dependent on the type of the elements involved.

(mmmmmmmmmmmmmmmmmmm) ProjectElementID

A GDT ProjectElementID 35800HT is a unique identifier for an element in a project. An element in a project is a component of the project of a specific type, for example, a task or a role. An example (instance) of the GDT ProjectElementID 35800HT is:

```
    <ProjectElementID>57F39D8B618F40AB8154015D306FF33A
</ProjectElementID>
```

The structure of GDT ProjectElementID 35800HT is depicted in FIG. 358HT. The GDT ProjectElementID 35800HT includes attributes SchemeID 35814HT, SchemeAgencyID 35832HT, and schemeAgencySchemeAgencyID 35848HT. For the GDT ProjectElementID 35800HT, the Object Class term is Project Element 35802HT, the Property term is Identification 35804HT, the Representation/Association term is Identifier 35804HT, the Type term is CCT 35806HT, the Type Name term is Identifier 35808HT, the TypeName term is Identifier 35010HT, and the Length is from one to thirty-two 35812HT. The GDT ProjectElementID 35800HT may be restricted 35814HT.

For the schemeID 35816HT, the Category is Attribute 35818HT, the Object Class term is IdentificationScheme 35820HT, the Property term is Identification 35822HT, the Representation/Association term is Identifier 35824HT, the Type term is XSD 35826HT, and the Type Name term is Token 35828HT, and the Length is from one to sixty 35830HT. The cardinality between the schemeID 35816HT and the GDT ProjectElementID 35800HT is either zero or one 35832HT.

For the schemeAgencyID 35834HT, the Category is Attribute 35836HT, the Object Class term is IdentificationSchemeAgency 35838HT, the Property term is Identification 35840HT, the Representation/Association term is Identifier 35842HT, the Type term is XSD 35844HT, and the Type Name term is Token 35846HT, and the Length is from one to sixty 35848HT. The cardinality between the schemeAgencyID 35834HT and the GDT ProjectElementID 35800HT is either zero or one 35850HT.

For the schemeAgencySchemeAgencyID 35852HT, the Category is Attribute 35854HT, the Object Class term is IdentificationSchemeAgency 35856HT, the Property term is Scheme Agency 35858HT, the Representation/Association term is Identifier 35860HT, the Type term is XSD 35862HT, and the Type Name term is Token 35864HT, and the Length is from one to three 35848HT. The cardinality between the schemeAgencySchemeAgencyID 35852HT and the GDT ProjectElementID 35800HT is either zero or one 35850HT.

The GDT ProjectElementID 35800HT may consist of a character sequence with a maximum of 32 characters, taking into account the restrictions defined in XSD. The attributes of a ProjectElementID are filled as follows:

schemeID:

ProjectElementID—Identification by means of an identifier

ProjectElementGUID—Identification by means of a Global Unique Identifier schemeAgencyID: Business system in which the identifier has been assigned schemeAgencySchemeAgencyID: mutually defined The ID in the context of these attribute values may be unique together with the related ProjectID.

The GDT ProjectElementID 35800HT can be used in order to uniquely identify an element in a project in a business process. In a first step—for example, on creation or first transfer of data on a business transaction—one partner uses a ProjectElementID to inform the other partner of his identification for an element in a project. The second partner can use this identifier in the follow-on process to reference the element.

(nnnnnnnnnnnnnnnnnn) ProjectElementTypeCode

A GDT ProjectElementTypeCode 35800HU is the coded representation of the type of an element in a project. The element type describes the nature of elements in projects according to their business significance. An example (instance) of the GDT ProjectElementTypeCode 35800HU is:

<ProjectElementTypeCode>1</ProjectElementTypeCode>

The structure of GDT ProjectElementTypeCode 35800HU is depicted in FIG. 358HU. For the ProjectElementTypeCode 35800HU, the Object Class term is Project Element 35802HU, the Property term is Type 35804HU, the Representation/Association term is Code 35806HU, the Type term is CCT 35808HU, the Type Name term is Code 35810HU, and the Length is from one to three 35812HU. The GDT ProjectElementTypeCode 35800HU may be restricted 35814HU.

In one example, the GDT ProjectElementTypeCode 35800HU can be used to describe the type of an element in a project that is identified by means of a ProjectElementID. In some implementations, the GDT ProjectElementTypeCode 35800HU is an SAP-proprietary code list with fixed pre-defined attributes. Changes to the permitted attributes result in interface changes.

(oooooooooooooooooo) ProjectID

The GDT ProjectID 35800HV is a unique identifier for a project. A project is a business plan with a defined objective that is to be achieved with predefined financial means, with the planned resources, at an agreed quality level, and by an agreed time. The project is characterized by its uniqueness, its risk character and its organizational significance. An example (instance) of the GDT ProjectID 35800HV is:

```
<ProjectID schemeID="ProjectGUID" schemeAgencyID=
"SYS_010" schemeAgencySchemeAgencyID=
"ZZZ">33FAEB7C03D0AF4CA09ECE33B3296C6D</ProjectID>
```

The structure of GDT ProjectID 35800HV is depicted in FIG. 358HV. The GDT ProjectID 35800HV includes attributes SchemeID 35814HV, SchemeAgencyID 35832HV, and schemeAgencySchemeAgencyID 35848HV. For the GDT ProjectID 35800HV, the Object Class term is Project 35802HV, the Property term is Identification 35804HV, the Representation/Association term is Identifier 35804HV, the Type term is CCT 35806HV, the Type Name term is Identifier 35808HV, the TypeName term is Identifier 35010HV, and the Length is from one to thirty-two 35812HV. The GDT ProjectID 35800HV may be restricted 35814HV.

For the schemeID 35816HV, the Category is Attribute 35818HV, the Object Class term is IdentificationScheme 35820HV, the Property term is Identification 35822HV, the Representation/Association term is Identifier 35824HV, the Type term is XSD 35826HV, and the Type Name term is Token 35828HV, and the Length is from one to sixty 35830HV. The cardinality between the schemeID 35816HV and the GDT ProjectID 35800HV is either zero or one 35832HV.

For the schemeAgencyID 35834HV, the Category is Attribute 35836HV, the Object Class term is IdentificationSchemeAgency 35838HV, the Property term is Identification 35840HV, the Representation/Association term is Identifier 35842HV, the Type term is XSD 35844HV, and the Type Name term is Token 35846HV, and the Length is from one to sixty 35848HV. The cardinality between the schemeAgencyID 35834HV and the GDT ProjectID 35800HV is either zero or one 35850HV.

For the schemeAgencySchemeAgencyID 35852HV, the Category is Attribute 35854HV, the Object Class term is IdentificationSchemeAgency 35856HV, the Property term is Scheme Agency 35858HV, the Representation/Association term is Identifier 35860HV, the Type term is XSD 35862HV, and the Type Name term is Token 35864HV, and the Length is from one to three 35848HV. The cardinality between the schemeAgencySchemeAgencyID 35852HV and the GDT ProjectID 35800HV is either zero or one 35850HV.

The GDT ProjectID 35800HV may consist of a character sequence with a maximum of 32 characters, taking into account the restrictions defined in XSD. References to projects are to be stored in applications as 32-character sequences.

The attributes of a ProjectID are filled as follows:

schemeID: Present fix "ProjectGUID", further allowed values can be supplemented in future.

schemeAgencyID: Business system in which the identifier has been assigned schemeAgencySchemeAgencyID: mutually defined In the context of these attribute values, the ID may be unique.

The GDT ProjectID 35800HV can be used in order to uniquely identify a project in a business process. In a first step—for example, on creation or first transfer of data on a business transaction—one partner uses a ProjectID to inform the other partner of his identification for a project. The second partner can use this identifier in the follow-on process to reference the project.

(pppppppppppppppppp) ProjectReference

A GDT ProjectReference 35800HW is a unique reference to a project or to an element within a project. An example (instance) of the GDT ProjectReference 35800HW is:

```
<ProjectReference>
    <ProjectID>33FAEB7C03D0AF4CA09ECE33B3296C6D</
    ProjectID>
    <ProjectElementID>57F39D8B618F40AB8154015D306FF33A
    </ProjectElementID>
    <ProjectElementTypeCode>1</ProjectElementTypeCode>
</ProjectReference>
```

The structure of GDT ProjectReference 35800HW is depicted in FIG. 358HW. The GDT ProjectReference 35800HW includes elements ProjectID 35806HW, ProjectElementID 35822HW, ProjectElementTypeCode 35838HW. For the GDT ProjectReference 35800HW, the Object Class term is Project Reference 35802HW. The Representation/Association term is Details 35804HW.

For the ProjectID 35806HW, the Category is Element 35808HW, the Object Class term is Project Reference 35810HW, the Property term is Identification 35812HW, the Representation/Association term is Identification 35812HW, the Type term is GDT 35814HW, and the Type Name term is ProjectID 35818HW. The Cardinality between the ProjectID 35806HW and the GDT ProjectReference 35800HW is either zero or one 35820HW.

For the ProjectElementID 35822HW, the Category is Element 35824HW, the Object Class term is Project Reference 35826HW, the Property term is Identification 35828HW, the Representation/Association term is Element Identification 35830HW, the Type term is GDT 35832HW, and the Type Name term is ProjectElementID 35834HW. The Cardinality between the ProjectElementID 35806HW and the GDT ProjectReference 35800HW is either zero or one 35836HW.

For the ProjectElementTypeCode 35838HW, the Category is Element 35840HW, the Object Class term is Project Reference 35842HW, the Property term is Element Type Code 35844HW, the Representation/Association term is Code 35846HW, the Type term is GDT 35848HW, and the Type Name term is ProjectElementTypeCode 35850HW. The Cardinality between the ProjectID 35806HW and the GDT ProjectReference 35800HW is either zero or one 35852HW.

In some implementations, a ProjectID is an ID of the referenced project, a ProjectElementID is an ID of an element within the referenced project, and a ProjectElementTypeCode is a Type of the element identified via ProjectElementID.

For referencing an element in a project, the ProjectID, the ProjectElementID and the ProjectElementTypeCode should be filled. If the ProjectElementID is clear even without specifying the ProjectElementTypeCode in a project, then it is sufficient to fill only the ProjectID and the ProjectElementID. If the ProjectElementID is clear even without specifying the related project, then it is sufficient to fill only the ProjectElementID (and the ProjectElementTypeCode if required).

(qqqqqqqqqqqqqqqqqq) Rate

A GDT Rate 35800HX is a fraction whose numerator and denominator are quantities, values, or dimensionless factors, independently from each other. An example (instance) of the GDT Rate 35800HX is:

```
<DiscountRate>
    <DecimalValue>-29.99</DecimalValue>
    <CurrencyCode>EUR</CurrencyCode>
    <BaseMeasureUnitCode>C62</BaseMeasureUnitCode>
</DiscountRate>
```

The structure of GDT Rate 35800HX is depicted in FIG. 358HX. The GDT Rate 35800HX includes elements DecimalValue 35806HX, MeasureUnitCode 35822HX, CurrencyCode 35840HX, BaseDecimalValue 35858HX, BaseMeasureUnitCode 35878HX, and BaseCurrencyCode 35891HX. For the GDT Rate 35800HX, the Object Class term is Rate 35802HX, and the Representation/Association term is Details 35804HX.

For the DecimalValue 35806HX, the Category is Element 35808HX, the Object Class term is Rate 35810HX, the Property term is Decimal Value 35812HX, the Representation/Association term is Value 35814HX, the Type term is GDT 35816HX, and the Type Name term is Decimal Value 35818HX. The Cardinality between the DecimalValue 35806HX and the GDT Rate 35800HX is one 35820HX.

For the MeasureUnitCode 35822HX, the Category is Element 35824HX, the Object Class term is Rate 35826HX, the Property term is Measure Unit 35828HX, the Representation/Association term is Code 35830HX, the Type term is GDT 35832HX, the Type Name term is Measure Unit Code 35834HX, and the Length is from one to three 35836HX. The Cardinality between the MeasureUnitCode 35822HX and the GDT Rate 35800HX is either zero or one 35838HX.

For the CurrencyCode 35840HX, the Category is Element 35842HX, the Object Class term is Rate 35844HX, the Property term is Currency 35846HX, the Representation/Association term is Code 35848HX, the Type term is GDT 35850HX, the Type Name term is Currency Code 35852HX, and the Length is three 35854HX. The Cardinality between the CurrencyCode 35840HX and the GDT Rate 35800HX is either zero or one 35856HX.

For the BaseDecimalValue 35858HX, the Category is Element 35860HX, the Object Class term is Rate 35862HX, the Property term is Base Decimal Value 35864HX, the Representation/Association term is Value 35866HX, the Type term is GDT 35868HX, and the Type Name term is Decimal Value 35870HX. The Cardinality between the BaseDecimalValue 35858HX and the GDT Rate 35800HX is either zero or one 35874HX. The default value of the BaseDecimalValue 35858HX is one 35876HX.

For the BaseMeasureUnitCode 35878HX, the Category is Element 35880HX, the Object Class term is Rate 35882HX, the Property term is Base Measure Unit 35884HX, the Representation/Association term is Code 35886HX, the Type term is GDT 35887HX, the Type Name term is Measure Unit Code 35888HX, and the Length is from one to three 35889HX. The Cardinality between the BaseMeasureUnitCode 35878HX and the GDT Rate 35800HX is either zero or one 35890HX.

For the BaseCurrencyCode 35891HX, the Category is Element 35892HX, the Object Class term is Rate 35893HX, the Property term is Base Currency 35894HX, the Representation/Association term is Code 35895HX, the Type term is GDT 35896HX, the Type Name term is Currency Code 35897HX, and the Length is three 35898HX. The Cardinality between the BaseCurrencyCode 35891HX and the GDT Rate 35800HX is either zero or one 35899HX.

The GDT Rate 35800HX has the following elements:

DecimalValue is the numerical value of the rate, or the numerical value of the numerator of the rate.

MeasureUnitCode is the coded representation of the unit of measure of the numerator according to the UN/ECE Recommendation #20.

CurrencyCode is the coded representation of the currency unit of the numerator according to the triple-character code used in HMO 4217.

BaseDecimalValue is the numerical value of the denominator of the rate. The default value is "1" if the element is omitted.

BaseMeasureUnitCode is the coded representation of the unit of measure of the denominator according to the UN/ECE Recommendation #20.

BaseCurrencyCode is the coded representation of the currency unit of the denominator according to the triple-character code used in HMO 4217.

In some implementations, the GDT Rate 35800HX may include some or all of the following constraints. At the most, only one of the elements MeasureUnitCode and CurrencyCode may be specified. At the most, only one of the elements BaseMeasureUnitCode and BaseCurrencyCode may be specified. The element BaseDecimalValue only has to be specified if the value of the denominator is not equal to "1".

The GDT Rate 35800HX specifies a rate between two factors with specific units of measure, for example, the daily turnover of a business.

Special cases of the GDT Rate **35800*j***D should be depicted with the corresponding GDTs, for example:

Percentages according to a GDT Percent

Amounts according to a GDT Amount

Quantities according to a GDT Quantity

Exchange rates according to a GDT ExchangeRate

However, if the GDT Rate 35800HX can be used, there may be an appropriate business reason in the particular context.

For a purely numerical ratio where the numerator and the denominator are used without units of measure, the GDT Ratio should be used in accordance with UN/CEFACT CCTS V.2.01.

(rrrrrrrrrrrrrrrrr) RebateProductGroupCode

A GDT RebateProductGroupCode 35800HY is the coded representation of a group of products for which a certain rebate applies. A rebate is paid out to the customer retroactively. An example (instance) of the GDT RebateProductGroupCode 35800HY is:

<RebateProductGroupCode>1</RebateProductGroupCode>

The structure of GDT RebateProductGroupCode 35800HY is depicted in FIG. 358HY. The GDT RebateProductGroupCode 35800HY includes attributes listID 35814HY, listAgencyID 35830HY, listVersionID 35846HY, listAgencySchemeID 35862HY, and listAgency-SchemeAgencyID 35878HY. For the GDT RebateProduct-GroupCode 35800HY, the Object Class Qualifier term is Price 35802HY, the Object Class term is Product Group 35804HY, the Representation/Association Term is Code 35806HY, the Type term is CCT 35808GZ, and the Type Name term is Code 35810HY, and the Length is either one or two 35812HY.

For the listID 35814HY, the Category is Attribute 35816HY, the Object Class term is CodeList 35818HY, the Property term is Identification 35820HY, the Representation/Association term is Identifier 35822HY, the Type term is XSD 35824HY, and the Type Name term is token 35826HY. The cardinality between the listID 35814HY and the GDT RebateProductGroupCode 35800HY is either zero or one 35828HY.

For the listAgencyID 35830HY, the Category is Attribute 35832HY, the Object Class term is CodeListAgency 35834HY, the Property term is Identification 35836HY, the Representation/Association term is Identifier 35838HY, the Type term is XSD 35840HY, and the Type Name term is token 35842HY. The cardinality between the listAgencyID 35830HY and the GDT RebateProductGroupCode 35800HY is either zero or one 35844HY.

For the listVersionID 35846HY, the Category is Attribute 35848HY, the Object Class term is CodeList 35850HY, the Property term is Version 35852HY, the Representation/Association term is Identifier 35854HY, the Type term is XSD 35856HY, and the Type Name term is token 35858HY. The cardinality between the listVersionID 35846HY and the GDT RebateProductGroupCode 35800HY is either zero or one 35860HY.

For the listAgencySchemeID 35862HY, the Category is Attribute 35864HY, the Object Class term is CodeListAgency 35866HY, the Property term is Scheme 35868HY, the Representation/Association term is Identifier 35870HY, the Type term is XSD 35872HY, and the Type Name term is token 35874HY. The cardinality between the listAgencySchemeID 35862HY and the GDT RebatePro-ductGroupCode 35800HY is either zero or one 35876HY.

For the listAgencySchemeAgencyID 35878HY, the Category is Attribute 35880HY, the Object Class term is CodeListAgency 35882HY, the Property term is SchemeAgency 35884HY, the Representation/Association term is Identifier 35886HY, the Type term is XSD 35888HY, and the Type Name term is token 35890HY. The cardinality between the listAgencySchemeAgencyID 35878HY and the GDT RebateProductGroupCode 35800HY is either zero or one 35892HY.

The GDT RebateProductGroupCode 35800HY is a customer-specific code. For each administering organization (agency) only one code list is allowed. The attributes are used as follows:

listID—ID of the relevant code list. It is assigned and administered by a customer. The customer is responsible for the values of the ID in question.

listAgencyID—ID of the customer. An ID assigned by an organization listed in the DE 3055 may be used (such as the business IDs assigned by DUNS, EAN, and SWGZT).

listVersionID—Version of the relevant code list. It is assigned and administered by the customer listed in the listAgencyID.

listAgencySchemeID—ID of the scheme by which the customer listed in the listAgencyID is identified. It is a particular identification scheme for partners, businesses, and members (such as DUNS+4), and so on, of an administering organization (such as EAN, DUNS, and SWGZT) that is listed in the listAgencySche-meAgencyID.

listAgencySchemeAgencyID—ID of the administering organization (such as DUNS, EAN, or SWGZT) that is responsible for identifying the organization listed in the listAgencyID. It has to be listed in DE 3055.

The GDT RebateProductGroupCode 35800HY can be used, for example, in sales and billing documents, to group products and to determine prices that apply in the rebate agreement. Examples of the possible semantics of the codes are:

Maximum rebate—products for which a maximum rebate applies

Minimum rebate—products for which a minimum rebate applies

For example, the following dictionary objects can be assigned to this GDT in mySAP CRM:

Data element: CRMT_REBATE_GROUP

Domain: CRM_REBATE_GROUP

ReferenceInterestCurveCode

A GDT ReferenceInterestCurveCode 35800HZ is the coded representation of the description of a reference interest curve. The reference interest curve serves as a guideline for the amount when determining which contractual interest rate is to be used for financial transactions. An example (instance) of the GDT ReferenceInterestCurveCode 35800HZ is:

<ReferenceInterestCurveCode listID="221" listAgencyID="17">LIBO</ReferenceInterestCurveCode> where listID="221" means Swift Codeliste 221, listAgencyID="17" means S.W.I.F.T., which is Society for Worldwide Interbank Financial Telecommunications s.c., LIBO is a reference interest curve LIBOR.

The structure of GDT ReferenceInterestCurveCode 35800HZ is depicted in FIG. 358HZ. The GDT Reference-InterestCurveCode 35800HZ includes attributes listID 35814HZ, listAgencyID 35832HZ, listVersionID 35850HZ, listAgencySchemeID 35868HZ, and listAgency-SchemeAgencyID 35886HZ. For the GDT ReferenceInter-estCurveCode 35800HZ, the Object Class term is Reference Interest 35802HZ, the Representation/Association Term is Code 35804HZ, the Type term is CCT 35806HZ, the Type Name term is Code 35808HZ, and the Length is from one to ten 35810HZ. The GDT ReferenceInterestCurveCode 35800HZ may be restricted.

For the listID 35814HZ, the Category is Attribute 35816HZ, the Object Class term is CodeList 35818HZ, the Property term is Identification 35820HZ, the Representation/Association term is Identifier 35822HZ, the Type term is XSD 35824HZ, and the Type Name term is token 35826HZ, and the Length is from one to sixty 35828HZ. The cardinality between the listID 35814HZ and the GDT ReferenceInterest-CurveCode 35800HZ is either zero or one 35830HZ.

For the listAgencyID 35832HZ, the Category is Attribute 35834HZ, the Object Class term is CodeListAgency 35836HZ, the Property term is Identification 35838HZ, the Representation/Association term is Identifier 35840HZ, the Type term is XSD 35842HZ, the Type Name term is token 35844HZ, and the Length is from one to sixty 35846HZ. The Cardinality between the listAgencyID 35836HZ and the GDT ReferenceInterestCurveCode 35800HZ is either zero or one 35848HZ.

For the listVersionID 35850HZ, the Category is Attribute 35852HZ, the Object Class term is CodeList 35854HZ, the Property term is Version 35856HZ, the Representation/Association term is Identifier 35858HZ, the Type term is XSD 35860HZ, the Type Name term is token 35862HZ, and the Length is from one to fifteen 35864HZ. The cardinality between the listVersionID 35850HZ and the GDT ReferenceInterestCurveCode 35800HZ is either zero or one 35866HZ.

For the listAgencySchemeID 35868HZ, the Category is Attribute 35870HZ, the Object Class term is CodeListAgency 35872HZ, the Property term is Scheme 35874HZ, the Representation/Association term is Identifier 35876HZ, the Type term is XSD 35878HZ, the Type Name term is token 35880HZ, and the Length is from one to sixty 35882HZ. The cardinality between the listAgencySchemeID 35868HZ and the GDT ReferenceInterestCurveCode 35800HZ is either zero or one 35884HZ.

For the listAgencySchemeAgencyID 35886HZ, the Category is Attribute 35888HZ, the Object Class term is CodeListAgency 35890HZ, the Property term is SchemeAgency 35892HZ, the Representation/Association term is Identifier 35894HZ, the Type term is XSD 35896HZ, the Type Name term is token 35897HZ, and the Length is from one to three 35898HZ. The cardinality between the listAgencySchemeAgencyID 35878HZ and the GDT ReferenceInterestCurveCode 35800HZ is either zero or one 35892HZ.

(sssssssssssssssss) ScaleAxisBaseCode

A GDT ScaleAxisBaseCode 35800IA is the coded representation of the scale base type for a scale axis. An example (instance) of the ScaleAxisBaseCode 35800IA is:

<BaseCode>3</BaseCode>

The structure of GDT ScaleAxisBaseCode 35800IA is depicted in FIG. 358IA. For the GDT ScaleAxisBaseCode 35800IA, the Object Class term is Scale Axis 35802IA, the Property term is Base 35804IA, the Representation/Association term is Code 35806IA, the Type term is CCT 35808IA, the TypeName term is Code 35810A, and the Length is from one to three 35812IA. The GDT ScaleAxisBaseCode 35800IA may be restricted 35814IA.

The possible values for the GDT: ScaleAxisBaseCode are:

| Code | Name | Meaning |
|---|---|---|
| 1 | Quantity | Item quantity in a document |
| 2 | Shipping quantity | Item shipping quantity |
| 3 | Net value | Net value: Price including discounts and surcharges, as well as freight, but before tax |
| 4 | Gross weight | Item gross weight |
| 5 | Net weight | Item net weight |
| 6 | Volume | Item volume |
| 7 | Number of points | Non-dimensional number of points of an item |
| 8 | Distance | Distance, for example, between ship-to party and plant |
| 9 | Time stamp | UTC time stamp |
| 10 | Year | Number of years |
| 11 | Month | Number of months |
| 12 | Week | Number of weeks |
| 13 | Day | Number of days |

The GDT ScaleAxisBaseCode 35800IA is a proprietary code list with fixed predefined values. Changes to the permitted values involve changes to the interface.

(ttttttttttttttttt) ScaleAxisStepIntervalBoundaryTypeCode

A GDT ScaleAxisStepIntervalBoundaryTypeCode 35800IB is the coded representation of the typing of an interval boundary that is defined for a scale axis step. Scale axis steps are represented by discrete scale dimension values. An example (instance) of the GDT ScaleAxisStepIntervalBoundaryTypeCode 35800IB is:

<ScaleAxisStepIntervalBoundaryTypeCode>2</ScaleAxisStepIntervalBoundaryTypeCode>

The structure of GDT ScaleAxisStepIntervalBoundaryTypeCode 35800IB is depicted in FIG. 358IB. For the GDT ScaleAxisStepIntervalBoundaryTypeCode 35800IB, the Object Class term is Scale Axis Step 35802IB, the Property term is Interval Boundary Type Code 35804IB, the Representation/Association term is Code 35806IB, the Type term is CCT 35808IB, the TypeName term is Code 35810IB, and the Length is from one 35812IB. The GDT ScaleAxisStepIntervalBoundaryTypeCode 35800IB may be restricted 35814IB.

An element of the GDT ScaleAxisStepIntervalBoundaryTypeCode 35800IB can represent the lower limit of an interval (e.g., from a respective scale dimension value up to, but excluding the next higher scale dimension value), or the GDT ScaleAxisStepIntervalBoundaryTypeCode 35800IB can also represent the upper limit of an interval (e.g., up to a respective scale dimension value, from but excluding the next lowest scale dimension value).

The meaning of scale dimension values, determined via the GDT ScaleAxisStepIntervalBoundaryCode 35800IB is described within the context of pricing scales as a "scale dimension type", though additional constraints apply there so that scale dimension values all have the same GDT ScaleAxisStepIntervalBoundaryTypeCode 35800IB. A scale dimension can be used to determine the domain of a one-dimensional pricing scale. In this context, the values of scale dimensions are described as scale steps. A pricing scale defines a scale rate (for example, net price, discount, and so on) for each scale step. Consequently, a pricing scale comprises the scale levels as input values and the scale rates defined for the steps as "output values". Output values of the pricing scale are accessed using the scale step(s) to determine conditions in the context of pricing, depending on values, such as the order quantity.

A scale level and scale dimension type both determine for which interval the scale rate applies:

From the current scale step, up to, but not including the next higher step.

To the current scale step, from, but not including the next lower step.

In the first case, the pricing scale is known as the "from" pricing scale, in the second case, it is known as the "to" pricing scale. From pricing scales may explicitly have a minimal pricing scale. To pricing scales may have a maximal pricing scale.

The scale steps of a pricing scale are always defined in terms of a pricing scale base type. The scale steps for the scale base types quantity, gross value, and number are scale quantity with scale quantity unit, scale rate with scale currency and scale quantity without unit respectively. The scale steps are divided into the scale dimensions for a pricing scale or the dimension of the pricing scale represented by it. The scale dimension type is valid for all scale steps of a pricing scale, which is the different scale steps of a one-dimensional pricing scale are always interpreted in the same way as interval boundaries.

The scale steps of a pricing scale always imply disconnected and consuming intervals. For every characteristic value of the input value, exactly one scale step (and therefore the interval implied) is relevant for determining the scale rate when using scale dimension types "lower boundary" and "upper boundary".

The same concepts as for pricing conditions are used for scales, for free goods and for rebate conditions, that is the GDT ScaleAxisStepIntervalBoundaryTypeCode 35800IB can also be used for these scales.

(uuuuuuuuuuuuuuuuuu) ServiceWorkingConditionsCode

A GDT ServiceWorkingConditionsCode 35800IC is the coded representation of working conditions under which a service is carried out. For example, a service can be carried out at certain working times (for example, at weekends, during public holidays, at night, etc.), or under difficult circumstances (for example, bonus for dirty work). An example of the GDT ServiceWorkingConditionsCode 35800IC is:

<ServiceWorkingConditionsCode>1</ServiceWorkingConditionsCode>

The structure of GDT ServiceWorkingConditionsCode 35800IC is depicted in FIG. 358IC. The GDT S ServiceWorkingConditionsCode 35800IC includes attributes listID 35816IC, listAgencyID 35832IC, listVersionID 35846IC, listAgencySchemeID 35864IC, and listAgencySchemeAgencyID 35880IC. For the GDT ProductUsageCode 35800IC, the Object Class term is Service 35802IC, the Property term is Working Conditions 35804IC, the Representation/Association term is Code 35806IC, the Type term is CCT 35808IC, the Type Name term is Code 35810IC, and the Length is from one to four 35812IC. The GDT ProductUsageCode 35800IC may be restricted 35814IC.

For the listID 35816IC, the Category is Attribute 35818IC, the Object Class term is CodeList 35820IC, the Property term is Identification 35822IC, the Representation/Association term is Identifier 35822IC, the Type term is XSD 35826IC, and the Type Name term is token 35828IC. The cardinality between the listID 35816IC and the GDT ServiceWorkingConditionsCode 35800IC is either zero or one 35830IC.

For the listAgencyID 35832IC, the Category is Attribute 35834IC, the Object Class term is CodeListAgency 35836IC, the Property term is Identification 35838IC, the Representation/Association term is Identifier 35840IC, the Type term is XSD 35842IC, and the Type Name term is token 35844IC. The Cardinality between the listAgencyID 35832IC and the GDT ServiceWorkingConditionsCode 35800IC is either zero or one 35846IC.

For the listVersionID 35848IC, the Category is Attribute 35850IC, the Object Class term is CodeList 35852IC, the Property term is Version 35854IC, the Representation/Association term is Identifier 35856IC, the Type term is XSD 35858IC, and the Type Name term is token 35860IC. The cardinality between the listVersionID 35848IC and the GDT ServiceWorkingConditionsCode 35800IC is either zero or one 35862IC.

For the listAgencySchemeID 35864IC, the Category is Attribute 35866IC, the Object Class term is CodeListAgency 35868IC, the Property term is Scheme 35870IC, the Representation/Association term is Identifier 35872IC, the Type term is XSD 35874IC, and the Type Name term is token 35876IC. The cardinality between the listAgencySchemeID 35864IC and the GDT ServiceWorkingConditionsCode 35800IC is either zero or one 35878IC.

For the listAgencySchemeAgencyID 35880IC, the Category is Attribute 35882IC, the Object Class term is CodeListAgency 35884IC, the Property term is SchemeAgency 35886IC, the Representation/Association term is Identifier 35888IC, the Type term is XSD 35890IC, and the Type Name term is token 35892IC. The cardinality between the listAgencySchemeAgencyID 35880IC and the GDT ServiceWorkingConditionsCode 35800IC is either zero or one 35894IC.

There are only alternative code lists that differ at configuration and/or runtime. The GDT ServiceWorkingConditionsCode 35800IC is a customer-specific code list. Examples of the possible semantics of the codes can be found under the heading "Use". The attributes are used as follows:

listID is "10137"

listAgencyID—The ID of the customer. An ID assigned by an organization listed in the DE 3055 may be used (such as the business IDs assigned by DUNS, EAN and SWGZT).

listVersionID—Version of the relevant code list. It is assigned and administered by the customer listed in the listAgencyID.

listAgencySchemeID—ID of the scheme by which the customer listed in the listAgencyID is identified. It is a particular identification scheme for partners, businesses, and members (such as DUNS+4, and so on), of an administering organization (such as EAN, DUNS, and SWGZT) that is listed in the listAgencySche-meAgencyID.

listAgencySchemeAgencyID—the ID of the administering organization (such as DUNS, EAN, or SWGZT) that is responsible for identifying the organization listed in the ListAgencyID. It has to be listed in DE 3055.

The GDT ServiceWorkingConditionsCode 35800IC can be used for pricing, in order to calculate surcharges or discounts for the customer. The surcharges and discounts can be an absolute or a percentage value. For example, if a service with a base price of 100 Euro has to be carried out on a public holiday, a surcharge of 50% can be defined for this service. In this case, a total price of 150 Euro can be charged to the customer. In one example, a weekend is the service should be carried out on the weekend, or has already been carried out on the weekend. In another example, a public holiday is the service should be carried out on a public holiday, or has already been carried out on a public holiday.

(vvvvvvvvvvvvvvvvvv) PaidByCompanyIndicator

A GDT PaidByCompanyIndicator specifies whether something was paid by the company or not.

(wwwwwwwwwwwwwwwwww) PaymentTransactionDescription

A GDT PaymentTransactionDescription is a description of a payment card. For example, operation specifies a course of action to be carried out by a resource or group of resources. For the GDT PaymentTransactionDescription, the Type is MEDUIM_Description.

(xxxxxxxxxxxxxxxxxx) ReasonDescription

A GDT ReasonDescription 35800 is a description of a reason. For the GDT ReasonDescription, the Type is MEDIUM_Description.

(yyyyyyyyyyyyyyyyyy) ReceiptDescription

A GDT ReceiptDescription is a description of a receipt. For the GDT ReceiptDescription, the Type is MEDIUM_Description.

(zzzzzzzzzzzzzzzzzz) ReconciliationPeriodCounterValue

A GDT ReconciliationPeriodCounterValue is a number of reconciliation periods. For example, a reconciliation period is the time span between two successive reconciliation messages of the same sequence context. A reconciliation message creates a common synchronization point between a sender and a receiver. To achieve this, the sender sends the receiver a current copy of the business object instance affected. This copy contains all data relevant for the receiver. A sequence context is defined by the receiver instance and the union of all nodes of a business object instance that are sent to this receiver instance for reconciliation purposes.

The GDT ReconciliationPeriodCounterValue is a counter value with a minimum value of 1. If the GDT ReconciliationPeriodCounterValue is used as an element of a GDT (or a message), it may only occur once in the complete substructure of the element.

The GDT ReconciliationPeriodCounterValue is used when reconciliation messages are the means for ensuring restartability. The reconciliation period refers to exactly one sequence context. This sequence context spans all those nodes of a business object instance that are sent to the same receiver instance using reconciliation messages. For a given receiver instance, every node of a business object instance belongs to one sequence context at most. Thus for a given receiver instance, every node also belongs to at most one reconciliation period. The counter value of the first reconciliation period is 1; every reconciliation message increases it by 1. In every message containing information from a node of a particular sequence context, the receiver must be able to determine uniquely the corresponding reconciliation period. This is achieved with the following rule: if an element of a message contains the GDT ReconciliationPeriodCounterValue as child element, this counter value denotes the reconciliation period of all business object nodes contained in the substructure of this element.

An example of GDT ReconciliationPeriodCounterValue is:

```
<ProductionProgressMessage>
    . . .
    <ProductionProgress>
        <ID>4711</ID>
        <ProductionRequestFulfillment>
            <ReconciliationCounterValue
>2</ReconciliationCounterValue >
            <ProductionRequestID>0815</ ProductionRequestID>
            <ProductionOperation>
            . . .
            </ProductionOperation>
        </ProductionRequestFulfillment>
        <InventoryChangeItem>
            <ID>77432</ID>
            <Outbound>
                <ReconciliationCounterValue
>87451</ReconciliationCounterValue >
                <Location>
                    <InternalID>1000CWM</InternalID>
                </Location>
                <Product>
                    <IternalID>100-100</InternalID>
                </Product>
                <Quantity>20</Quantity>
            </Outbound>
            <ID>77432</ID>
            <Inbound>
                <ReconciliationCounterValue
>2327</ReconciliationCounterValue >
                . . .
                <Quantity>5</Quantity>
            </Inbound>
        </InventoryChangeItem>
    </ProductionProgress>
</ProductionProgressMessage>
```

All nodes contained in ProductionRequestFulfillment including ProductionRequestID belong to the same sequence context. The reconciliation period of this sequence context is 2. The consumed material (Outbound) whose node is uniquely determined by location and product ID makes up a separate sequence context, which is in reconciliation period 87451. The produced material (Inbound) constitutes another sequence context with reconciliation period 2327.

(aaaaaaaaaaaaaaaaaa) RoundTripIndicator

A GDT RoundTripIndicator indicates whether or not a trip is to a single destination and starts and ends at the same location.

(bbbbbbbbbbbbbbbbbb) StayDescription

A GDT StayDescription is a description of a stay. For the GDT StayDescription, the Type is MEDIUM_Description.

(cccccccccccccccccc) SubstitutionAllowedIndicator

A GDT SubstitutionAllowedIndicator indicates whether it is allowed to substitute something or not. The GDT SubstitutionAllowedIndicator may be used for instance in logistics to determine whether certain elements of a sales order item may be substituted within the logistic processing of the order. Such a substitution may be desired for instance in order to achieve an earlier delivery date. As an example, the GDT SubstitutionAllowedIndicator indicates if the requested material may be substituted by an appropriate substitute material.

(dddddddddddddddddd) TechnicalUserDescription

A GDT TechnicalUserDescription is a description of a technical user. For the GDT TechnicalUserDescription, the Type is MEDIUM_Description.

(eeeeeeeeeeeeeeeeee) TransportationTermsDescription

A GDT TransportationTermsDescription is a natural-language representation of the characteristics of the transport For the GDT TransportationTermsDescription, the Type is LONG_Description.

(ffffffffffffffffff) VehicleDescription

A GDT VehicleDescription is a description of a vehicle. For the GDT VehicleDescription, the Type is LONG_Description.

(gggggggggggggggggg) VehicleMakeName

A GDT VehicleMakeName is a Name of the manufacturer of a vehicle. For the GDT VehicleMakeName, the Type is SHORT_Description (hhhhhhhhhhhhhhhhhh) WomanOwnedIndicator A GDT WomanOwnedIndicator indicates whether something is owned by a woman or a group of women. The GDT WomanOwnedIndicator is used, for example, if within a certain procurement process, the desired business partner with this characteristic should be chosen. In almost all US states, there are special regulations for the advancement of companies owned by women; in some, they must then be specially considered in an RFQ. In others, a specified set amount of the requirement must be procured from such a firm. These regulations refer to public facilities or government agencies, though private companies are also obligated to comply with these requirements (Code of Business).

A company can receive woman-owned status from the official agency, if at least 51% of the company is owned a woman or group of women (DOD Policy on Small Disadvantaged Business Utilization (FAR/DFARS Part 19.9)); they are then added to the official register (Directory of woman/minority owned business: http://www.sba8a.com/).

The above-mentioned regulations deal with the implementation of the following edicts and federal laws of the USA: the Small Business Administration 8(a) program 1968, full utilization of Women-Owned Businesses in Federal Acquisition, Executive order 12138, May 18, 1979, women's Business Ownership Act, public law 100-533, Oct. 25, 1988, and the Federal Acquisition Streamlining Act (FASA) section 7106, 1994.

In the context of use, a description may be given as to which object the WomanOwnedIndicator refers. Examples may include: BusinessPartnerWomanOwnedIndicator, CompanyWomanOwnedIndicator, BankWomanOwnedIndicator and so on.

(iiiiiiiiiiiiiiiiii) LocationName

A GDT LocationName is a Name of a location. For the GDT LocationName, the Type is MEDIUM_Name.

(jjjjjjjjjjjjjjjjjj) PackagingMaterialTiedIndicator

A GDT PackagingMaterialTiedIndicator specifies whether or not a packaging material (load carrier, additional packaging material) is tied to a packaging unit. For example, a packaging unit is a HandlingUnit or a LogisticsUnit.

Expensive load carriers (such as pallets) and additional packaging material may be inventory-managed materials.

Then the GDT PackagingMaterialTiedIn-dicator expresses whether or not a load carrier, for example, is a physical part of a packaging unit ("tied").

(kkkkkkkkkkkkkkkkkkk) AutomaticallyGeneratedIndicator

The automatic generation by a system is understood as the opposite of a manual or a user-triggered generation. For example, a HandlingUnit can be moved from one storage location to another. To document this stock change, an inventory change item is created. As a result of this movement, the other materials contained in the HandlingUnit and Sub-HandlingUnits are also moved. To document these other materials' movements and the sub-HandlingUnits, additional inventory change item are created that all have the AutomaticallyGeneratedIndicator: These additional document items are created by the system automatically with no queries to the user.

(lllllllllllllllllll) BlockedIndicator

Specify exactly what is blocked/not blocked for every BlockedIndicator. This is reflected in a corresponding name prefix. For example, AccountBlockedIndicator specifies whether an account is blocked or not. The BlockedIndicator is required for indicating objects that can be blocked or not blocked, such as credit cards, accounts, escalators and streets. In addition to the name prefix entry, the business meaning of the block must also be specified for the BlockedIndicator (compare to Integrity Conditions).

(mmmmmmmmmmmmmmmmmmm) ApplyIndicator

An AppliedIndicator also exists. The AppliedIndicator specifies whether something was used whereas the ApplyIndicator specifies whether something should be used.

(nnnnnnnnnnnnnnnnnnn) BusinessPartnerBankDetailsName

A BusinessPartnerBankDetailsName is a word, or a combination of words, designating or describing the bank details of a business partner. In addition to specifying an account, the bank details of a business partner also contain administrative information (see GDT BusinessPartnerBankDetailsID).

(ooooooooooooooooooo) BusinessPartnerPartnerGroupName

A BusinessPartnerPartnerGroupName is a word, or a combination of words, designating or describing a partner group. By party group we mean persons or organizations that have merged. This merger can be the result of a common purpose or the occurrence of an event. Partner groups are mapped as business partners of the category group (GDTBusinessPartnerCategoryCode).

(ppppppppppppppppppp) BusinessPurposeDescription

A GDT BusinessPurposeDescription is a description of a business purpose.

(qqqqqqqqqqqqqqqqqqq) ChangeAllowedIndicator

A ChangeAllowedIndicator indicates whether something can be changed or not. Comment: The word "something" usually stands for values or objects.

(rrrrrrrrrrrrrrrrrrr) CheckedIndicator

A CDT qualifier CheckedIndicator specifies whether something was checked or not. A CheckedIndicator does not say anything about the result of the check.

(sssssssssssssssssss) CompleteIndicator

A CompleteIndicator specifies whether or not something is complete. The word "something" usually refers to processes or objects. A CompletedIndicator is the information on whether an object is completed in a business sense or not. In general, a CompletedIndicator relates to business transactions (for example, invoice creation, delivery, sourcing) or to objects that have the character of a transaction (for example, product catalog transfer in multiple steps).

(ttttttttttttttttttt) CorrespondenceBrailleRequiredIndicator

A CorrespondenceBrailleRequiredIndicator indicates whether or not correspondence should be written in Braille.

(uuuuuuuuuuuuuuuuuuu) DeductionIndicator

A DeductionIndicator specifies whether something is a deduction or not.

(vvvvvvvvvvvvvvvvvvv) EnabledIndicator

An EnabledIndicator indicates whether or not something has been enabled.

The word "something" usually stands for specific attributes or processes.

(wwwwwwwwwwwwwwwwwww) FlatRateReimbursementIndicator

A FlatRateReimbursementIndicator specifies whether there is a flat rate reimbursement or not.

(xxxxxxxxxxxxxxxxxxx) IdentifierIssuingAgencyName

An IdentifierIssuingAgencyName is a word, or a combination of words, designating or describing an agency that assigns an ID number (identifier). The agency can be an authority (such as the office for the registration of residents), a company (Dun & Bradstreet), or an organization (UN).

(yyyyyyyyyyyyyyyyyyy) InstallationPointName

An InstallationPointName is a word or combination of words used to designate an installation point.

(zzzzzzzzzzzzzzzzzzz) LimitViolationIndicator

A LimitViolationIndicator specifies whether a limit was violated or not.

(aaaaaaaaaaaaaaaaaaaa) MinorityOwnedIndicator

A MinorityOwnedIndicator specifies whether something is owned by a minority or not. The MinorityOwnedIndicator is used, for example, if within a certain procurement process, the desired business partner with this characteristic should be chosen.

In almost all US states, there are special regulations for the advancement of companies owned by minorities; in some, they must then be specially considered in an RFQ; in others, a specified set amount of the requirement must be procured from such a firm. These regulations refer to public facilities or government agencies, though private companies are also obligated to comply with these requirements (Code of Business).

A company can receive minority status from the official agency, if at least 51% of the company is owned by people or group considered to be a minority (DOD Policy on Small Disadvantaged Business Utilization (FAR/DFARS Part 19)); they are then added to the official register (Directory of woman/minority owned business: http://www.sba8a.com/).

The above-mentioned regulations deal with the implementation of edicts and federal laws of the USA, such as The Small Business Administration 8(a) program, Minority Business Enterprise Program, Executive Order 11458, 5 Mar. 1969, Support of Minority Business Enterprise, Executive Order 11625, 1971, and Full utilization of Small Disadvantaged Business (SDB), public law 95-507, 24 Oct. 1978 to name a few examples.

In the context of use, a description must be given as to which object the MinorityOwnedIndicator refers. (e.g., BusinessPartnerMinorityOwnedIndicator, CompanyMinorityOwnedIndicator, BankMinorityOwnedIndicator, etc.)

(bbbbbbbbbbbbbbbbbbbb) AcademicTitleCode

A GDT AcademicTitleCode 35800ID can represent, in the form of a code, an academic title. An example of a GDT AcademicTitleCode 35800ID is:

<AcademicTitleCode listAgencyID=310>0001</AcademicTitleCode>

The structure of GDT AcademicTitleCode 35800ID is depicted in FIG. 358ID. For the GDT AcademicTitleCode 35800ID, the Property is Academic Title 35802ID, the Representation/Association is Code 35804ID, the Type is CCT 35806ID, the Type Name is Code 35808ID and the Length is from one to four 35810ID. The Cardinality is zero or one 35812ID.

For the list ID 35814ID, the Category is Attribute 34516ID, the Object Class is Code List 35818ID, the Property is Identification 35820ID, the Representation/Association is Identifier 35822ID, the Type is xsd 35824ID, and the Type Name is token 35826ID. The Cardinality is zero or one 35828ID.

For the list Agency ID 35830ID, the Category is Attribute 34532ID, the Object Class is Code List Agency 35834ID, the Property is Identification 35836ID, the Representation/Association is Identifier 35838ID, the Type is xsd 35840ID, and the Type Name is token 35842ID. The Cardinality is zero or one 35844ID.

For the list Version ID 35846ID, the Category is Attribute 34548ID, the Object Class is Code List 35850ID, the Property is Version 35852ID, the Representation/Association is Identifier 35854ID, the Type is xsd 35856ID, and the Type Name is token 35858ID. The Cardinality is zero or one 35860ID.

For the list Agency-Scheme ID 35862ID, the Category is Attribute 34564ID, the Object Class is Code List Agency 35866ID, the Property is Scheme 35868ID, the Representation/Association is Identifier 35870ID, the Type is xsd 35872ID, and the Type Name is token 35874ID. The Cardinality is zero or one 35876ID.

For the list Agency-Scheme Agency ID 35878ID, the Category is Attribute 34580ID, the Object Class is Code List Agency 35882ID, the Property is Scheme Agency 35884ID, the Representation/Association is Identifier 35886ID, the Type is xsd 35888ID, and the Type Name is token 35890ID. The Cardinality is zero or one 35892ID.

An extendable SAP code list is assigned to the GDT AcademicTitleCode 35800ID. SAP customers can change this code list.

In its unchanged state, the SAP code list has the following attributes: listID="10115", listAgencyID="310", listVersionID which is the version of the relevant code list assigned and managed by SAP AG. If an SAP customer makes changes to the SAP code list, the values of the attributes are changed as follows: listAgencyID which is the ID of the SAP customer (ID from DE 3055 if listed there), listVersionID which is assigned and managed by the SAP customer, listAgencySchemeID which is the ID of the scheme if the listAgencyID does not come from DE 3055, and listAgencySchemeAgencyID which is the ID of the organization from DE 3055 that manages the listAgencySchemeID scheme.

The GDT AcademicTitleCode 35800ID is used as part of a name of a person. The following dictionary objects are assigned to this GDT in mySAP systems: Data element: AD_TITLE1 and Domain: AD_TITLE1. The possible values for GDT AcademicTitleCode 35800ID are maintained in table TSAD2.

The code list can include six values. Code 001, Dr., describes a Doctor. Code 0002, Prof., describes a Professor. Code 0003, Prof. Dr., describes a Professor Doctor. Code 0004, B.A., describes a Bachelor of Arts. Code 0005, MBA, describes a Master of Business Administration. Code 0006, PhD, describes a Doctor of Philosophy.

(ccccccccccccccccccc) AccountDeterminationCompanyGroupCode

A GDT AccountDeterminationCompanyGroupCode 35800IE is the coded representation of a group of companies from the viewpoint of identical determination of accounts in accounting. For the purposes of proper financial reporting, the value-based representation of business transactions in accounting must use different accounts. An example of a GDT AccountDeterminationCompanyGroupCode 35800IE is:

<AccountDeterminationCompanyGroupCode>1</AccountDeterminationCompanyGroupCode>

The structure of GDT AccountDeterminationCompanyGroupCode 35800IE is depicted in FIG. 358IE. For the GDT AccountDeterminationCompanyGroupCode 35800IE, the Object Class Term Qualifier is Account Determination 35802IE, the Object Class Term is Company Group 35804IE, the Representation/Association is Code 35806IE, the Type is CCT 35808IE, the Type Name is Code 35810IE, and the Length is from one to four 35812IE. The remark 35814IE shows that GDT AccountDeterminationCompanyGroupCode 35800IE may be restricted.

The code list involved is a custom code list. The GDT AccountDeterminationCompanyGroupCode 35800IE is used only in the business object models and in A2A messages. Examples of possible codes are domestic companies and foreign companies.

(ddddddddddddddddddd) AccountDeterminationResourceGroupCode

A GDT AccountDeterminationResourceGroupCode 35800IF is the coded representation of a group of resources from the viewpoint of identical determination of accounts in accounting. For the purposes of proper financial reporting, the value-based representation of business transactions in accounting must use different general ledger accounts. An example of a GDT AccountDeterminationResourceGroupCode 35800IF is:

<AccountDeterminationResourceGroupCode>1</AccountDeterminationResourceGroupCode>

The structure of GDT AccountDeterminationResourceGroupCode 35800IF is depicted in FIG. 358IF. For the GDT AccountDeterminationResourceGroupCode 35800IF, the Object Class is Account Determination Resource Group 35802IF, the Representation/Association is Code 35806IF, the Type is CCT 35808IF, the Type Name is Code 35810IF and the Length is from one to ten 35812IF. The remark 35814IF shows that GDT AccountDeterminationResourceGroupCode 35800IF may be restricted.

The GDT AccountDeterminationResourceGroupCode 35800IF is used only in the business object models and in A2A messages. Examples of possible codes include machines, workers, consultants, and equipment (eeeeeeeeeeeeeeeeeee) AccountingBusinessTransactionTypeCode A GDT AccountingBusinessTransactionTypeCode 35800IG is the coded representation of the type of business transaction from the accounting view. A business transaction is a self-contained, logically coherent business event that results in a change in quantity or value. An example of a GDT AccountingBusinessTransactionTypeCode 35800IG is:

<AccountingBusinessTransactionTypeCode>104</AccountingBusinessTransactionTypeCode>

The structure of GDT AccountingBusinessTransactionTypeCode 35800IG is depicted in FIG. 358IG. For the GDT AccountingBusinessTransactionTypeCode 35800IG, the Object Class is Accounting Business Transaction 35802IG, the Property is Type 35804IG, the Representation/Association is Code 35806IG, the Type is CCT 35808IG, the Type Name is Code 35810IG and the Length is from one to four 35812IG. The remark 35814IG shows that GDT AccountingBusinessTransactionTypeCode 35800IG may be restricted.

A fixed SAP code list has been assigned to GDT AccountingBusinessTransactionTypeCode 35800IG. The attributes of the CCT code are listID=10007 and listAgencyID="310".

The GDT AccountingBusinessTransactionTypeCode 35800IG is used to categorize all business transactions that are relevant for accounting and is used in accounting, for example, for account determination or to valuate business transactions correctly.

Each process component describes its processes using the GDT BusinessProcessVariantTypeCode. This GDT is transferred in messages to the process component It is then used in accounting, possibly in combination with other information, to determine the GDT AccountingBusinessTransactionTypeCode 35800IG. Examples of business transactions with the type "Goods Receipt from Vendor", from the accounting view, are goods receipt for an order in the warehouse (in the process component SiteLogisticsProcessing) and manually entered confirmation of goods receipt of consumable materials (in the process component GoodsAndServiceAcknowledgement).

Business transactions generate or change business transaction documents. The data types GDT AccountingBusinessTransactionTypeCode 35800IG and BusinessTransactionDocumentTypeCode are therefore closely related. Since complex business transactions (such as the confirmation of a production order) generate or change more than one business transaction document, it is not possible to create a simple (1:1 or 1:n) relationship between the code lists of these data types.

The GDT BusinessTransactionTypeCode is obsolete and is replaced by this GDT in accounting.

The code list and its values are as follows: code 101 is an incoming bank transfer, code 102 as an Incoming Direct Debit, code 103 is an Incoming Check Payment, code 104 is an Incoming Cash Payment, code 105 is an Incoming BoE Payment, code 106 is an Incoming Payment Request, code 107 is an Incoming Payment Advice, code 108 is an Incoming Credit Card Payment, code 109 is an Incoming Lockbox Payment, code 141 is an Outgoing Bank Transfer, code 142 is an Outgoing Direct Debit, code 143 is an Outgoing Check Payment, code 144 is an Outgoing Cash Payment, code 145 is an Outgoing BoE Payment, code 146 is an Outgoing Payment Request, code 147 is an Outgoing Payment Advice, code 148 is a Credit Card Settlement, code 181 is a Check Deposit, code 182 is a BoE Submission, code 183 is a Cash Transfer, code 184 is a Bank Account Statement, code 201 is an Incoming Invoice, code 212 is an Outgoing Invoice, code 301 is a Goods Receipt from Vendor, code 302 is a Goods Receipt from Customer, code 303 is a Goods Receipt from Production, code 304 is a Goods Receipt without Reference (Sender), code 341 is a Goods Issue for Customer, code 342 is a Goods Issue for Transfer, code 343 is a Goods Issues for Vendor, code 344 is a Goods Issue for Production, code 345 is a Goods Issue for Consumption, code 346 is a Goods Issue without Reference, code 381 is a Goods Transfer, code 401 is a Service Receipt from Vendor, code 402 is a Service Confirmation for Sales, code 403 is an Internal Service Confirmation, code 501 is a Maintain Purchase Order, code 502 is a Maintain Production Lot, code 503 is a Maintain Sales Order, code 504 is a Maintain Customer Return, code 505 is a Maintain Service Order, code 506 is a Maintain Service Contract, code 507 is a Maintain Service Confirmation, code 508 is a Maintain Service Request and code 509 is a Maintain Project.

(fffffffffffffffffff) AccountingDocumentTypeCode

A GDT AccountingDocumentTypeCode 35800IH is a coded representation of the type of accounting document. For example, the type of accounting document is based on customer-defined criteria. A unique GDT AccountingDocumentTypeCode 35800IH is assigned to each AccountingDocument. An accounting documentGlobal Data Types—Definitionen is the representation of changes to values resulting from a business transaction and relating to a company and a set of books. An example of the GDT AccountingDocumentTypeCode 35800IH is:

<AccountingDocumentTypeCode>1</AccountingDocumentTypeCode>

The structure of the GDT AccountingDocumentTypeCode 35800IH is depicted in FIG. 358IH. For the GDT AccountingDocumentTypeCode 35800IH, the Object Class is Accounting Document 35804IH, the Property is Type 35806IH, the Representation/Association is Code 35808IH, the Type is CCT 35810IH, the Type Name is Code 35812IH, and the Length is from one to five 35814IH. The remark 35818IH shows that the GDT AccountingDocumentTypeCode 35800IH may be restricted.

The GDT AccountingDocumentTypeCode 35800IH is a customer-defined code list. Examples of the possible semantics of the codes can be found under "Use". AccountingDocumentTypeCode may currently only be used in business objects and A2A messages.

For business transactions that are entered in the operational system and transferred to Accounting, the GDT AccountingDocumentTypeCode 35800IH is derived from the GDT BusinessTransactionTypeCode. For a more refined derivation, other characteristics for the business transaction may be included in the derivation.

For business transactions that are entered in Accounting, the GDT AccountingDocumentTypeCode 35800IH is entered. Examples of customer-defined codes: Customer Invoice—Accounting document that represents an outgoing invoice, Vendor Invoice—Accounting document that represents an incoming invoice, Goods Movement—Accounting document that represents a movement of goods, and Depreciation of Fixed Assets—Accounting document that represents the depreciation of a fixed asset.

There is an n:m relationship between GDT AccountingDocumentTypeCode 35800IH and business transaction types (BusinessTransactionTypeCode). Some business transaction types may have a very similar meaning (for example, in Inventory Accounting), in which case it can be useful to summarize them as Accounting DocumentTypeCodes. On the other hand, there are business transaction types that are of a more general nature (such as a basic G/L account posting). For such business transaction types, it can be useful from the customer perspective to differentiate further using AccountingDocumentTypeCodes.

(ggggggggggggggggggg) AddressID

A GDT AddressID 35800II is a unique identifier of an address. An example of GDT AddressID 35800II is:

<AddressID>ADACR3000001051300000010512</AddressID>

The structure of GDT AddressID 35800II is depicted in FIG. 358II. For the GDT AddressID 35800II, the Object Class is Address 35804II, the Property is Identification 35806II, the Representation/Association is Identifier 35808II, the Type is CCT 35810II, the Type Name is Identifier 35812II, and the Length is from one to forty 35814II. The remark 35818II shows that the GDT AddressID 35800II may be restricted.

(hhhhhhhhhhhhhhhhhhhh) AddressPersonID

A GDT AddressPersonID 35800IJ is a clear proprietary identifier of the person part of an address. An example of the GDT AddressPersonID 35800IJ is:

<AddressPersonID>0000010512</AddressPersonID>

The structure of the GDT AddressPersonID 35800IJ is depicted in FIG. 358IJ. For the GDT AddressPersonID 35800IJ, the Object Class is Address Person 35804IJ, the Property is Identification 35806IJ, the Representation/Association is Identifier 35808IJ, the Type is CCT 35810IJ, the Type Name is Identifier 35812IJ, and the Length is from one to ten 35814IJ. The remark 35818IJ shows that the GDT AddressPersonID 35800IJ may be restricted.

The GDT AddressPersonID 35800IJ is required to uniquely identify personal addresses and workplace addresses because these are not identified uniquely by the GDT AddressPostalAddressID alone.

(iiiiiiiiiiiiiiiiii) AddressTypeCode

A GDT AddressTypeCode 35800IK is a coded representation of the type of an address. For example, the address type describes the basic features of an address by means of the type of address data. An example of the GDT AddressTypeCode 35800IK is:

<AddressTypeCode listAgencyId='3110'>1</AddressTypeCode>

The structure of the GDT AddressTypeCode 35800IK is depicted in FIG. 358IK. For the GDT AddressTypeCode 35800IK, the Property is Address Type 35806IK, the Representation/Association is Code 35808IK, the Type is CCT 35810IK, the Type Name is Code 35812IK, and the Length is from one 35814IK. The remark 35818IK shows that the GDT AddressTypeCode 35800IK may be restricted.

The GDT AddressTypeCode 35800IK is assigned a code list. The attributes are filled as follows: listID="10087", and listAgencyID="310". The data type GDT AddressTypeCode 35800IK is used to determine the address type in addresses. The following dictionary objects are assigned to this GDT: Data element: ADDR_ADDRESS_TYPE, and Domain: ADDR_ADDRESS_TYPE.

The data type GDT AddressTypeCode 35800IK may use the following codes: 1 (i.e., organization address), 2 (i.e., person address), 3 (i.e., workplace address), 4 (i.e., communication data without postal address), 5 (i.e., personal address without postal address).

(jjjjjjjjjjjjjjjjjj) BatchID

A GDT BatchID 35800IL is a unique identifier for a batch in the context of a material number. For example, a batch is a homogenous subset of a material that is managed separately from other subsets of the same material. Individual batches can differ in their characteristics. The individual batches are either created together in one production process or purchased together in one order. An example of the GDT BatchID 35800IL is:

<BatchID>CH20021015</BatchID>

The structure of the GDT BatchID 35800IL is depicted in FIG. 358IL. For the GDT BatchID 35800IL, the Category is Complex Type 35801ILNN, the Object Class is Batch 35802IL, the Property Term is Identifier 35803IL, the Representation Term is Identifier 35804IL, the Type is CCT 35805IL, the Type Name is Identifier 35806IL, and the Length is from one to ten 35807IL. The remark 35809IL shows that the GDT BatchID 35800IL may be restricted.

For the SchemeID 35810IL, the Category is Attribute (A) 35811IL, the Object Class is IdentificationScheme 35812IL, the Property is Identification 35813IL, the Representation Term is Identifier 35814IL, the Type is XSD 35815IL, the Type Name is Token 35816IL, and the Cardinality is zero or one 35818IL.

For the SchemeVersionID 35820IL, the Category is Attribute (A) 35821IL, the Object Class is IdentificationScheme 35822IL, the Property is Identification 35823IL, the Representation/Association is Identifier 35824IL, the Type is XSD 35825IL, the Type Name is Token 35826IL, and the Cardinality is zero or one 35828IL.

For the SchemeAgencyID 35830IL, the Category is Attribute (A) 35831IL, the Object Class is IdentificationSchemeAgency 35832IL, the Property is Version 35833IL, the Representation/Association is Identifier 35834IL, the Type is XSD 35835IL, the Type Name is Token 35836IL, and the Cardinality is zero or one 35838IL.

For the SchemeAgencySchemeID 35840IL, the Category is Attribute (A) 35841IL, the Object Class is IdentificationSchemeAgency 35842IL, the Property is Scheme 35843IL, the Representation Term is Identifier 35844IL, the Type is XSD 35845IL, the Type Name is Token 35846IL, and the Cardinality is zero or one 35848IL.

For the SchemeAgencySchemeAgencyID 35850IL, the Category is Attribute (A) 35851IL, the Object Class is IdentificationSchemeAgency 35852IL, the Property is Scheme 35853IL, the Representation Term is Identifier 35854IL, the Type is XSD 35855IL, the Type Name is Token 35846IL, and the Cardinality is zero or one 35858IL. The GDT BatchID 35800IL has a maximum length of 10 characters and can comprise letters, numbers, and displayable special characters, with the exception of "*", "&", and ",". The identifier must be uppercase. The GDT BatchID 35800IL must not begin with blank characters or contain consecutive blank characters. The GDT BatchID 35800IL value range includes any combinations of the permitted characters up to a maximum length of 10 characters. The SchemeID identifies an identification scheme. The identification scheme represents the context that is used to identify an object. The SchemeID is unique only within the agency that manages this identification scheme. The SchemeVersionID identifies the version of an identification scheme. The SchemeAgencyID identifies the agency that manages an identification scheme. The agencies from DE 3055 are used as the default, but the roles defined in DE 3055 must not be used. The GDT BatchID 35800IL is unique only within the identification scheme that is managed by schemeAgencyID. The SchemeAgencySchemeID identifies the identification scheme that represents the context for agency identification. The SchemeAgencySchemeAgencyID identifies the agency that manages the SchemeAgencySchemeID. This attribute can only contain values from DE 3055 (excluding roles).

The BatchID is used only to identify batches. See the documentation for the core component type CCT: Identifier for information about how the attributes are used. Specifying attributes is optional. By default, the system assumes that the batch identified by the BatchID is a manufacturer batch and therefore no attributes are required.

(kkkkkkkkkkkkkkkkkkkk) BuildingID

A GDT BuildingID 35800IM is a unique identifier of a building or part of a building. An example of the GDT BuildingID 35800IM is:

<BuildingID>WDF03</BuildingID>

The structure of the GDT BuildingID 35800IM is depicted in FIG. 358IM. For the GDT BuildingID 35800IM, the Object Class is Building 35804IM, the Property is Identification 35806IM, the Representation/Association is Identifier 35808IM, the Type is CCT 35810IM, the Type Name is Identifier 35812IM, and the Length is from one to ten 35814IM. The remark 35818IM shows that the GDT BuildingID 35800IM may be restricted.

The GDT BuildingID 35800IM may be unique in the usage context. The GDT BuildingID 35800IM is used in addresses. The following dictionary objects are assigned to this GDT: Data element—BU_BLDNG, and Domain—TEXT20.

(llllllllllllllllllll) BusinessIntelligenceFilterID

A GDT BusinessIntelligenceFilterID 35800IN is a unique ID for a filter in Business Intelligence. For example, business Intelligence (BI) is a software solution for the support of business decisions. The business Intelligence (BI) software enables access to enterprise data in a specially formatted form or formats the data itself. A filter is a set of conditions that delimits a dataset. An example of GDT BusinessIntelligenceFilterID 35800IN is:

<BusinessIntelligenceFilterID schemeAgencyID="Q12__003">MY_FILTER</BusinessIntelligenceFilterID>

The structure of GDT BusinessIntelligenceFilterID 35800IN is depicted in FIG. 358IN. For the GDT BusinessIntelligenceFilterID 35800IN, the Object Class is BusinessIntelligenceFilter 35801IN, the Property is Identification 35803IN, the Representation/Association is Identifier 35804IN, the Type is CCT 35805IN, the Type Name is Identifier 35806IN, and the Length is from one to sixty 35807IN. The remark 35809IN shows that the GDT BusinessIntelligenceFilterID 35800IN may be restricted.

For the SchemeAgencyID 35810IN, the Category is Attribute (A) 35811IN, the Object Class is BusinessIntelligenceFilter 35812IN, the Property is Identification 35813IN, the Representation/Association is Identifier 35814IN, the Type is CCT 35815IN, the Type Name is Identifier 35816IN, the Length is from one to sixty 35817IN, and the Cardinality is zero or one 35818IN.

The attribute of the GDT BusinessIntelligenceFilterID 35800IN is filled as follows: schemeAgencyID: business system in which the ID was assigned.

(mmmmmmmmmmmmmmmmmmmm) BusinessIntelligenceInformationObjectID

A GDT BusinessIntelligenceInformationObjectID 35800IO is a unique ID for an elementary information object in Business Intelligence. For example, Business Intelligence (BI) is a software solution for the support of business decisions. The Business Intelligence (BI) software enables access to enterprise data in a specially formatted form or formats the data itself. An elementary information object in Business Intelligence contains master data or a key figure. An example of the GDT BusinessIntelligenceInformationObjectID 35800IO is:

<BusinessIntelligenceInformationObjectID schemeAgencyID="Q12__003">MY_OBJECT</BusinessIntelligenceInformationObjectID>

The structure of the GDT BusinessIntelligenceInformationObjectID 35800IO is depicted in FIG. 358IO. For the GDT BusinessIntelligenceInformationObjectID 35800IO, the Object Class is BusinessIntelligenceInformationObject 35801IO, the Property is Identification 35803IO, the Representation/Association is Identifier 35804IO, the Type is CCT 35805IO, the Type Name is Identifier 35806IO, and the Length is from one to sixty 35807IO. The remark 35809IO shows that the GDT BusinessIntelligenceInformationObjectID 35800IO may be restricted.

For the SchemeAgencyID 35810IO, the Category is Attribute (A) 35811IO, the Object Class is IdentificationSchemeAgency 35812IO, the Property is Identification 35813IO, the Representation/Association is Identifier 35814IO, the Type is XSD 35815IO, the Type Name is Token 35816IO, the Length is from one to sixty 35817IO, and the Cardinality is zero or one 35818IO.

The attribute of the GDT BusinessIntelligenceInformationObjectID 35800IO is filled as follows: schemeAgencyID—business system in which the ID was assigned.

(nnnnnnnnnnnnnnnnnnnn) BusinessIntelligenceInformationProviderID

A GDT BusinessIntelligenceInformationProviderID 35800IM is a unique ID for an information provider in Business Intelligence. For example, the Business Intelligence (BI) is a software solution for the support of business decisions. The Business Intelligence (BI) software enables access to enterprise data in a specially formatted form or formats the data itself. An example of the GDT BusinessIntelligenceInformationProviderID 35800IM is:

```
<BusinessIntelligenceInformationProviderID schemeAgencyID =
"Q12_003">MY_PROVIDER
</BusinessIntelligenceInformationProviderID>
```

The structure of the GDT BusinessIntelligenceInformationProviderID 35800IM is depicted in FIG. 358IM. For the GDT BusinessIntelligenceInformationProviderID 35800IM, the Object Class is Business Intelligence Information Provider 35801IM, the Property is Identification 35803IM, the Representation/Association is Identifier 35804IM, the Type is CCT 35805IM, the Type Name is Identifier 35806IM, and the Length is from one to sixty 35807IM. The remark 35809IM shows that the GDT BusinessIntelligenceInformationProviderID 35800IM may be restricted.

For the SchemeAgencyID 35810IM, the Category is Attribute (A) 35811IM, the Object Class is IdentificationSchemeAgency 35812IM, the Property is Identification 35813IM, the Representation/Association is Identifier 35814IM, the Type is XSD 35815IM, the Type Name is Token 35816IM, the Length is from one to sixty 35817IM, and the Cardinality is zero or one 35818IM.

The attribute of the GDT BusinessIntelligenceInformationProviderID 35800IM is filled as follows: schemeAgencyID—business system in which the ID was assigned.

(oooooooooooooooooooo) BusinessIntelligencePlanningSequenceID

A GDT BusinessIntelligencePlanningSequenceID 35800IQ is a unique ID for a planning sequence in Business Intelligence. For example, Business Intelligence (BI) is a software solution for the support of business decisions. The Business Intelligence (BI) software enables access to enterprise data in a specially formatted form or formats the data itself. A planning sequence is a list of planning functions and filters that are processed in the order in which they occur in the list. A planning function generates or changes planning data. A filter is a set of conditions that delimits a dataset. An example of the GDT BusinessIntelligencePlanningSequenceID 35800IQ is:

```
<BusinessIntelligencePlanningSequenceID schemeAgencyID =
"Q12_003">MY_SEQUENCE
</BusinessIntelligencePlanningSequenceID>
```

The structure of the GDT BusinessIntelligencePlanningSequenceID 35800IQ is depicted in FIG. 358IQ. For the GDT BusinessIntelligencePlanningSequenceID 35800IQ, the Object Class is BusinessIntelligencePlan-ningSequence 35801IQ, the Property is Identification 35803IQ, the Representation/Association is Identifier 35804IQ, the Type is CCT 35805IQ, the Type Name is Identifier 35806IQ, and the Length is from one to sixty 35807IQ. The remark 35809IQ shows that the GDT BusinessIntelligencePlanningSequenceID 35800IQ may be restricted.

For the SchemeAgencyID 35810IQ, the Category is Attribute (A) 35811IQ, the Object Class is Identification-SchemeAgency 35812IQ, the Property is Identification 35813IQ, the Representation/Association is Identifier 35814IQ, the Type is XSD 35815IQ, the Type Name is Token 35816IQ, the Length is from one to sixty 35817IQ, and the Cardinality is zero or one 35818IQ.

The attribute of the GDT BusinessIntelligencePlanning-SequenceID 35800IQ is filled as follows: schemeAgencyID—business system in which the ID was assigned.

(pppppppppppppppppppp) BusinessObjectTypeCode

A GDT BusinessObjectTypeCode 35800IR is a coded representation of the type of business object. For example, a business object is a representation of a type of a uniquely identifiable business entity described by a structural model, an internal process model, and one or more service interfaces. An example of GDT BusinessObjectTypeCode 35800IR is:

<BusinessObjectTypeCode>4</BusinessObjectType-Code>

The structure of GDT BusinessObjectTypeCode 35800IR is depicted in FIG. 358IR. For the GDT BusinessObjectType-Code 35800IR, the Object Class is BusinessObject 35804IR, the Property is Type 35806IR, the Representation/Association is Code 35808IR, the Type is CCT 35810IR, the Type Name is Code 35812IR, and the Length is from one to four 35814IR. The remark 35818IR shows that the GDT BusinessObjectTypeCode 35800IR may be restricted.

Exactly one fixed code list has been assigned to the code. The attributes are as follows: listID="10315", listAgencyID="310", and listVersionID=/[Version of the relevant code list].

The data type GDT BusinessObjectTypeCode 35800IR may use the following codes 6 (i.e., a AccountingDocument-Global Data Types—Definitionen is the representation of changes to values resulting from a business transaction, and relating to a company and financial accounting), 7 (i.e., a Global Data Types—Definitionen AccountingEntry is a business transaction entered in the terms of Financial Accounting, and concerning changes in value to the asset and equity structure of a company ac-cording to the rules of one or more accounting principles. The entry is made in relation to the accounts of the general ledger and of the subledgers), 8 (i.e., an AccountingNotification is a notification sent to Financial Accounting by an operational component regarding a business transaction. It represents this operational business transaction in a standardized form for all business transaction documents, and contains the data needed to valuate the business transaction), 9 (i.e., something), 14 (i.e., a bank payment order is an instruction to a house bank to make a transfer or direct debit from a specified house bank account), 15 (i.e., a BankStatement is a legally binding notification from the house bank about the revenues (items) within a specific time period at a house bank account (HouseBankAccount) with a defined starting and closing bal-ance.), 23 (i.e., a Clearing-HousePaymentOrder is an instruction to a clearing house (clearing center for card payments) to settle an incoming card payment using a ClearingHouseAccount. A ClearingHouse-PaymentOrder is generated to fulfill an internal payment order), 26 (i.e., authorized incoming credit card payment, that will be sent to the clearing house), 27 (i.e., a complaint made by a customer regarding an experience that the customer had with a sales or service employee), 28 (i.e., CustomerComplaint contains parties involved in this complaint, such as the customer, items, as well as sales, service and invoicing-specific information, its status, as well as references; Customer-Complaint itself contains identifying and administrative information), 29 (i.e., a CustomerInvoiceRequest is a request to create one or more CustomerInvoices, or to take data from the business transaction upon which this is based into consideration when creating the CustomerInvoice), 30 (i.e., a CustomerQuote is a quote by a vendor to a customer regarding the delivery of goods, or the provision of services at a specific price, quantity and date.), 32 (i.e., a CustomerReturn is a request by the customer to the vendor to take delivered goods back, and to cancel the purchase), 33 (i.e., representation of possible liabilities and receivables from bails, payment guarantees, and other guarantees for third persons, deficiency suretyship, limited bails, directly enforceable guarantee, cosuretyship), 34 (i.e., a Demand Forecast is a forecast from the material requirements planning about the demand for a material at a particular location, in a particular area of material requirements planning), 35 (i.e., a DemandPlanningForecast is the quantitative forecast of the sale of products within a planning period that is created according to the requirement on product, brand, or customer group level.), 36 (i.e., a group of receivables and payables for clearing), 37 (i.e., a payment request or payment confirmation with regard to trade receivables and payables), 42 (i.e., evaluation of time management documents for an internal or external employee. The documents are evaluated according to business factors such as availability, time accounts, or transfer of data to payroll or other target applications), 43 (i.e., an EmployeeCompensationAgreement is the set of rules governing an employee's compensation), 44 (i.e., an EmployeeTimeAgreement contains the statutory time management provisions and those agreed with an employee), 47 (i.e., an ExpenseReport is a list of receipts for the expenses incurred for the company (Company) within a certain period of time that are to be reimbursed to an expense reporter (Employee). In the case of a business trip, the ExpenseReport also contains the reason for the trip and relevant general information on the trip such as destinations, dates and times, and mileages), 48 (i.e., an ExpenseArrangement is a definition by the company of parameters for an employee that are needed for an expense report. It contains parameters relevant for the determination of per diem amounts, the type of standard vehicle, and the standard cost distribution), 49 (i.e., the business object Factoring represents the sales of financial claims from goods and services deals), 55 (i.e., a confirmation of physical changes to inventory (for example, goods movements, HU/LU movements) and the usage of activities in Logistics Execution), 60 (i.e., an IncomingCheque is a check issued by a business partner for a company (incoming check)), 64 (i.e., a Lead is a business transaction that describes the potential or projected business interests of a business partner and the interactions based on this over a period of time), 66 (i.e., forecast of the medium- to long-term development of the liquidity situation of a company or a group of companies), 67 (i.e., an ExpectedLiquidityItem is an expected inflow or outflow of liquidity in a company), 69 (i.e., a MaterialCostEstimate is a statement of the costs that are calculated for the procurement or production of a material. It contains both the complete result of costing, as well as details of individual cost items, such as the usage of materials, resources, or the usage of external or internal services), 70 (i.e., a MaterialInspection is the document that describes the execution of an inspection for a particular material, and that is used to record this inspection), 71 (i.e., a MaterialInspectionSample is the sample required for an examination in the context of a material inspection. The sample is the subject of examination for inspection procedures. A sample can be drawn from a material independently of a material inspection and, if necessary, it can later be assigned to a material inspection), 75 (i.e., an OutgoingCheque is a check issued by a company for a business partner for the fulfillment of an internal PaymentOrder), 80 (i.e., a PaymentAdvice is the notification of a payment transaction by a business partner that specifies reasons), 81 (i.e., a PaymentAllocation is the assignment of a payment item (an item of the business object Payment) to the payment reason from which the payment item originated), 83 (i.e., a PersonnelHiring is the first hiring, rehiring, or closing of another work agreement of an employee), 84 (i.e., a PersonnelTransfer is the organizational reassignment of an employee within the company), 85 (i.e., a PersonnelTransfer is the organizational reassignment of an employee within the company), 89 (i.e., a ProcurementPlanningOrder is a planned order for procuring materials that is to be placed with an external vendor. It defines the required quantities and availability dates), 90 (i.e., a PlannedIndependentRequirement is a planned requirement for a material for a particular time period without reference to a sales order), 91 (i.e., Description of a material flow from one planned receipt to one planned requirement for a predetermined quantity at a specific point in time in the future), 9 (i.e., something), 92 (i.e., a ProductionPlanningOrder is a request made to a planning area (SupplyPlanningArea) to initiate the pro-duction of a particular quantity of a material on a defined date), 93 (i.e., a PlanningViewOnPurchaseOrder is the planning view of planning of materials, dates, quantities, delivery conditions, parties, and sources of supply of a purchase order that are relevant to planning), 97 (i.e., a ProductionOrder is an order for the production of a specific quantity of a particular material within a pre-defined time. A ProductionOrder contains all information required for the actual execution of production), 100 (i.e., a ProductionTask is a task in production that a processor executes at a predefined production step within a production process. It also represents the request to the processor to carry out the activities described by the production task at a certain point in time), 103 (i.e., a ProjectCostEstimate is a statement of the costs that are calculated to carry out a project. It contains both the overall result of the cost estimate and details of individual cost items, such as the usage of resources or external/internal services), 9 (i.e., something), 9 (i.e., something), 104 (i.e., PlanningViewOnInventory is the planning-related view of a stock), 109 (i.e., a PurchaseRequisition is a request to purchasing for the external procurement of a requirement planned in logistics. The PurchaseRequisition is derived from the PlannedExternalProcurementOrder and describes which products are to be procured in what quantities, and at what time), 114 (i.e., a SalesOrder is an agreement between a vendor and a customer concerning the sale and delivery of goods, plus any associated services, for a specific date, for a specific quantity, and at a specific price), 115 (i.e., a ServiceConfirmation is the confirmation by a service technician regarding working time spent and spare parts used when performing a service for a customer), 116 (i.e., a ServiceContract is an agreement concluded between a service provider and a customer for a specific time period, specifying the scope of services, their prices, and specific service levels that are used as a ba-sis for processing ServiceRequests and ServiceOrders. A ServiceContract is valid for a specified period of time), 117 (i.e., a ServiceOrder is an agreement between a service provided and a customer regarding the execution of services at a specific time and for a specific price. A service order also contains the planning personnel, spare parts and other effort required to carry out these services), 118 (i.e., ServiceRequest is a customer request to a service provider for clarification of a concern regarding a pro-duct. In addition to the description and categorization of the concern, the ServiceRequest contains the do-cumentation and results of the clarification, as well as the resulting effort), 124 (i.e., a SiteLogisticsTask is a task for executing a logistics operation or activity within a site. It represents a piece of work to be performed by a person or an automated system), 130 (i.e., a SupplyPlanningException reports a problem or error in supply planning), 131 (i.e., a SupplyPlanningRequirement is a requirement that is derived from a business document and to which details on the anticipated availability date have been added. It contains the material quantities required on specific dates as well as information on which quantities are available on which dates), 143 (i.e., an AccountsReceivablePayableLedgerAccount is a subledger account that records valuated payables and receivables of a company for a specific business partner. This record serves the purpose of proper financial reporting of these payables and receivables, and/or profit and loss statement of a company), 147 (i.e., a business partner is a person, organization, or group of people in which a company has a business interest), 149 (i.e., a CashLedgerAccount is a record of valuated liquid assets of a company. This record serves the purpose of proper financial reporting of liquid assets, and/or profit and loss statement of a company), 151 (i.e., a ChequeStorage is the storage location for incoming checks that a company receives from its business partners (for example, customers)), 153 (i.e., a ClearingHouseAccount is the internal representation of an account that is set up and managed at a clearing house for card payments on the basis of an agreement between the company and the clearing house), 154 (i.e., a company is a financially and legally independent, geographically unbound organizational center regis-tered under business law), 155 (i.e., a CompensationComponentType describes the employee compensation components in the context of Human Resources), 156 (i.e., a CompensationComponentTypeCatalogueGlobal Data Types—Definitionen is a structured index of Com-pensationComponentTypes), 157 (i.e., a CompensationStructure is an organized structure of pay grade ranges. A pay grade range reflects the value of tasks and activities in the company. Employees can be assigned to a pay grade range based on the tasks and activities they perform. A CompensationStructure can be company-specific or can be prede-fined according to pay scale regulations), 158 (i.e., a CostCentre is an organizational center that represents a clearly defined location at which costs arise, and for which costs are entered separately. The definition can be based on functional requirements, allocation criteria, physical location, and responsibility for costs), 159 (i.e., in addition to the business transaction-related individual movements, it also contains totals that summarize the individual movements), 163 (i.e., a DemandHistory is the quantitative representation of sales or consumption of products within a historical period. This also includes corrections to demand quantities. The demand history is subdivided according to characteristics such as brand, sales region, etc. as well as combinations of them), 165 (i.e., a DistributionCentre is an organizational unit that is responsible for the organization and handling of incoming and outgoing delivery processes and site logistics processes), 9 (i.e., something), 9 (i.e., something), 166 (i.e., a document is a carrier of unstructured information and additional control and monitoring information), 167 (i.e., an Employee is a person who contributes or has contributed to the creation of goods or services for a company. There are internal and external employees. Unlike external employees, internal employees are bound by the instructions and are subject to the control of the labor organization), 168 (i.e., an EmployeeTime is a document of the working times of an internal or external employee. In addition to planned and actual working times and activities carried out for the company, it also documents absence times, break times, and availability times), 170 (i.e., an EmployeeTime- Calendar is the calendar representation of the evaluation results determined by time evaluation from recorded time documents for an employee), 181 (i.e., a house bank account is the internal representation of a company's bank account at a house bank. It contains all control information required for processing payment-relevent processes), 183 (i.e., an IndividualMaterial is a material that only occurs once in the real world and therefore describes a uniquely identifiable material. It can also be a material that will only exist in the future), 184 (i.e., an InspectionRule contains the specifications for an inspection as to whether an object or procedure meets predefined requirements), 185 (i.e., an InstallationPoint is the physical or logical location at which a business object, for example a material or software, is installed during a certain period of time. The installation point contains descriptive information about its installed object, for example, the quantity of materials incorporated, and can additionally be structured on multiple levels and hierarchically-related to other installation points), 186 (i.e., from a functional perspective, an InstalledBase is a structural arrangement of business objects at a logical or physical location), 9 (i.e., something), 187 (i.e., Inventory (Root) is the quantity of all the materials in a certain location including the material reservations at this location), 193 (i.e., a LogisticsTaskFolder is a folder for storing and grouping of logistics task according to business criteria. It determines the business assignment criteria that a logistics task must meet in order to be stored in a specific folder, and contains details about the processors that are registered in the folder), 194 (i.e., a material is a tangible product that can be created and then represents a business value. Its creation/production is time-independent on its sale and consumption/use. A material can be traded, used in manufacture, consumed, or produced), 195 (i.e., a MaterialInspectionQualityLevel represents the current quality level determined by the material inspection for an inspection area that is specified by a combination of: Material, Supplier, Receiving Plant, and Receiving Logistics Area (Distribution Department)), 198 (i.e., a MaterialLedgerAccount is the record of quantities, values and prices regarding materials in a company that are relevant for evaluation. This record serves the purpose of proper financial reporting of the inventory or profit and loss statement of a company), 200 (i.e., an OrganisationalCentre is a business unit within an organizational structure (for example, organizational plan, financial structure, geographical structure) of a company), 201 (i.e., record for a Company based on the principle of double-entry bookkeeping that shows the effects of business transactions on other direct costs. In addition to individual account movements related to business transactions, it contains period-based totals that summarize the movements), 203 (i.e., an OverheadCostLedgerAccount Global Data Types—Definitionen is a record of the costs incurred by the provision of resources. This record serves the purpose of proper financial reporting of the profit and loss statement of a Company, and contains the costs that cannot be assigned directly to market segments), 206 (i.e., a PaymentAgreement is an agreement between a company and a business partner regarding the handling of payments. It defines, for example, the payment methods allowed and which bank details or credit cards should be used), 207 (i.e., a PaymentCard is an issued identification card that authorizes the holder to pay an invoice without cash at an authorized location), 208 (i.e., a directory of all internally initiated and externally initiated incoming and outgoing payments of a company), 209 (i.e., a PermanentEstablishment is an organizational centre that represents a geographically bound area of a company whose business activity is subject to uniform tax processing), 210 (i.e., a Position Global Data Types—Definitionen is an organizational element that represents an area of responsibility within the organizational structure of an enterprise. Its tasks, competencies and responsibilities can be taken care of permanently by one or more suitable employees), 221 (i.e., a product category hierarchy is a hierarchical arrangement of product categories according to objective business aspects. Subordinate product categories represent a semantic refinement of the respective higher level product category), 223 (i.e., a ProductionBillOfOperations is the description of a production process for manufacturing a product), 224 (i.e., a ProductionBillOfOperationsTemplate is a pattern for creating complex production processes or individual production operations. The template can be included in one or more ProductionBillOfOperations by copying), 225 (i.e., a ProductionCentre is an organizational center that is responsible for the organization and handling of the processes in production), 226 (i.e., a ProductionLedgerAccount is the record of quantities and values regarding good being manufactured that are relevant for valuation within a company. This record serves the purpose of proper financial reporting of the inventory or profit and loss statement of a company), 227 (i.e., a ProductionModel is a model of a production process in a production center that is determined by a net-work of production segments), 229 (i.e., ProfitCentre is an organizational center that represents a company area for which a separate period based profit is determined and used for evaluating and regulating the activities of the company area in a profit-oriented manner), 230 (i.e., Programme is an organizational center for administrating a group of projects or subprograms. Programme represents a complex, time restricted endeavor for reaching higher-level goals within a far-reaching strategy), 231 (i.e., Business plan with a defined goal that is to be attained in a specified time frame. It is to be achieved using predefined funds and planned resources, while reaching an agreed quality level. The project is characterized by the fact that it is unique and that it involves an element of risk), 234 (i.e., Snapshot of a project that documents the state of a project. A project snapshot cannot be changed), 235 (i.e., Business plan with a defined goal that is to be attained in a specified time frame. It is to be achieved using predefined funds and planned resources, while reaching an agreed quality level. The project is characterized by the fact that it is unique and that it involves an element of risk), 238 (i.e., a PurchaseLedgerAccount is a record of quantities and values that are relevant to valuation for business processes in which material goods or services are procured), 239 (i.e., PurchasingUnit is an organizational center responsible for strategic and/or operational purchasing), 245 (i.e., ReportingLineUnit is an organizational center in the personnel reporting line of the company. A reporting line unit typically has a personnel manager who is responsible for defining the objectives and salaries of the directly or indirectly assigned holders), 247 (i.e., a Sales Arrangement is an agreement between a sales unit and a customer that is used for sales transactions. This agreement contains, for example, payment conditions, invoice currency and incoterms. This agreement is not a contract with the customer), 248 (i.e., a SalesLedgerAccount is a record of quantities and values that are relevant to valuation and that reference sales and distribution processes. The record is used for proper reporting of the company's income statement and for accruing revenue recognition. The record is also the basis of evaluations in profitability analysis), 251 (i.e., a SalesUnit is an organizational centre responsible for planning, realizing and administering sales processes), 252 (i.e., a SampleDrawingProcedure is a procedure that defines how samples are to be taken. It contains data for the sample-drawing frequency, sample size, and sample quantity), 255 (i.e., An SupportRequest is a request to eliminate an error in an IT solution. The request is ei-ther triggered by a user, or by the system itself. It documents the error, the solution process, and the solutions found. The SupportRequest contains data on the requester, the nature and context of the error. It can also contain a description of the symptom, attributes for classification of errors, problem, cause, meaning and so on. It permits an appropriate reaction, prioritization and sequence in processing), 256 (i.e., Segment is an organizational center that represents a company area whose business activities result in revenue and expenditure, and whose operating income is regularly monitored by the main decision makers for the purpose of assigning resources and evaluating performance. Financial information is available for a segment), 257 (i.e., a ServiceCategoryCatalogue is a structured directory of issue categories that describe business cases in Customer Service from an objective or a subjective point of view), 258 (i.e., a Service Product is an intangible product that describes the provision of a service. A service is provided at the time of its use), 259 (i.e., a ServiceUnit is an organizational centre responsible for processes covering all aspects of a customer ser-vice and support centre's business), 260 (i.e., a SiteLogisticsBillofOperations is the description of a process for the company-internal movement of goods, goods receipt, or goods issue), 264 (i.e., a SourceOfSupply is a source of supply for the external and internal procurement of materials), 266 (i.e., a supplier is a business partner who offers/makes available materials or services), 267 (i.e., a SupplyPlanningArea is an area in which planning is executed separately to guarantee the availability of products on time. To achieve this, the SupplyPlanningArea groups requirements, stocks, and further requirement coverage elements of a site for consumption in the net requirements calculation in material requirements planning), 269 (i.e., a SupplyQuotaArrangement defines the distribution of material requirements or material issues to different sources of supply, business partners, or internal organizational units), 270 (i.e., a specification between a Company and a Tax Authority for a tax type (TaxTypeCode), based on legal re-quirements. The specification includes data that is relevant for creating legal tax declarations, such as, for example, the tax number or the contact person), 272 (i.e., a TaxLedgerAccount is the recording of valuated payables and receivables from sales tax and excise duty for a company with regard to the tax authorities and relating to a tax type and other tax characteristics. This record serves the purpose of proper financial reporting for sales tax and excise duty for a company), 273 (i.e., Structure element of Due Item Processing for data entry and reporting of all trade receivables or trade payables of a company from or to a business partner), 274 (i.e., Trade receivables/payables from goods and services of a company from/to its business partners), 275 (i.e., Relationship between two locations or transportation zones that specifies which materials can be trans-ported between the locations or transportation zones, and which means of transport can be used), 276 (i.e., a zone containing geographical locations that may be considered collectively for modeling or planning transportation routes or transportations), 278 (i.e., a business object Warranty is a guarantee to vouch for defects or faults in the product purchased and is valid for a specific period of time. The type and scope of these services (such as repairing the defect for free or taking the product back) is defined in the warranty), and 279 (i.e., a WorkAgreement is the contract between employer and employee by means of which the employee is obliged to provide his or her labor. The activities and responsibilities of the employee are specified in the work agreement. This agreement establishes an employment. It is the foundation for further particulars such as working time and salary details specified in other objects.).

(qqqqqqqqqqqqqqqqqqqqq) ChequeStorageInternalID

A GDT ChequeStorageInternalID 35800IT is a unique proprietary identifier for the storage for incoming checks. An example of the GDT ChequeStorageInternalID 35800IT is:

<ChequeStorageInternalID schemeAgencyID="VV4_000">DWDF01/3.12</ChequeStorageInternalID> The structure of GDT ChequeStorageInternalID 35800IT is depicted in FIG. 358IT. For the GDT ChequeStorageInternalID 35800IT, the Object Class is Cheque Storage 35801IT, the Property Qualification is something Internal 35802ITNN, the Property is Identification 35803IT, the Representation/Association is Identifier 35804IT, the Type is CCT 35805IT, the Type Name is Identifier 35806IT, and the Length is from one to thirty two 35807IT. The remark 35809IT shows that the GDT ChequeStorageInternalID 35800IT may be restricted.

For the SchemeAgencyID 35810IT, the Category is Attribute (A) 35811IT, the Object Class is IdentificationSchemeAgency 35812IT, the Property is Identification 35813IT, the Representation/Association is Identifier 35814IT, the Type is XSD 35815IT, the Type Name is Token 35816IT, the Length is from one to sixty 35817IT, and the Cardinality is zero or one 35818IT.

The attributes of the GDT ChequeStorageInternalID 35800IT are filled as follows: schemeID—"ChequeStorageID" (implicit), and schemeAgencyID—Business system in which the identifier was assigned (rrrrrrrrrrrrrrrrrrr) ExceptionFolderID A GDT ExceptionFolderID 35800JE is an identifier for an exception folder. For example, an ExceptionFolder may be a folder for storing and grouping exceptions according to business criteria. The ExceptionFolder may define the business criteria that an exception must meet to be stored in a particular folder. It may also contain information about the processors or users that are registered for the folder. Based on the assignment criteria defined in the exception folder, exceptions can be put into a folder (push) or collected using a folder (pull). Whether a folder is filled by pushing or by pulling exceptions depends on the type of folder. An example of GDT ExceptionFolderID 35800JE is:

<ExceptionFolderID>RCUE_IN_0001</ExceptionFolderID>

The structure of GDT ExceptionFolderID 35800JE is depicted in FIG. 358JE. For the GDT ExceptionFolderID 35800JE, the Object Class is Exception Folder 35801JE, the Property is Identification 35803JE, the Representation/Association is Identifier 35804JE, the Type is CCT 35805JE, the Type Name is Identifier 35806JE, and the Length is from one to forty 35807JE. The remark 35809JE shows that the GDT ExceptionFolderID 35800JE may be restricted.

For the SchemeAgencyID 35810JE, the Category is Attribute (A) 35811JE, the Object Class is Identification-Scheme-Agency 35812JE, the Property is Identification 35813JE, the Representation/Association is Identifier 35814JE, the Type is XSD 35815JE, the Type Name is Token 35816JE, the Length is from one to sixty 35817JE, and the Cardinality is zero or one 35818JE.

The attributes of ExceptionFolderID are filled as follows: schemeID is an "ExceptionFolderID" (implicit), SchemeAgencyID is a Business system in which the identifier was defined. The ID of an exception folder is the unique identifying description of an exception folder.

(sssssssssssssssssss) ExceptionKeyFigure

A GDT ExceptionKeyFigure 35800JF is a key figure that describes the seriousness of an exception from a business viewpoint. For example, an exception may be a means of reporting problems or errors. The key figure is the result of the calculation or measurement of a deviation from a target value, where this deviation from a target value is the cause of the exception. An example of GDT ExceptionKeyFigure 35800JF is:

<ExceptionKeyFigure>
<Code>1</Code>
<Value>
<Percent> 13.5 </Percent>
</Value>
</ExceptionKeyFigure>

The structure of GDT ExceptionKeyFigure 35800JF is depicted in FIG. 358JF. For the GDT ExceptionKeyFigure 35800JF, the Object Class is Exception Key FIG. 35801JF and the Representation/Association is Details 35804JF.

For the Code 35810JF, the Category is Element (E) 35811JF, the Object Class is Exception Key FIG. 35812JF, the Property is Code 35813JF, the Representation/Association is Code 35814JF, the Type is GDT 35815JF, the Type Name is ExceptionKeyFigureCode 35816JF, and the Cardinality is one 35818JF.

For the Value 35820JF, the Category is Element (E) 35821JF, the Object Class is Exception Key FIG. 35822JF, the Property is Value 35823JF, the Representation/Association is Value 35824JF, the Type is GDT 35825JF, the Type Name is ExceptionKeyFigureValue 35826JF, and the Cardinality is one 35828JF.

The Code is a coded representation of the key figure, for example, "deviation from target value". The Value is a Key figure value, which represents the actual value of the key figure.

(ttttttttttttttttttt) ExceptionKeyFigureCode

A GDT ExceptionKeyFigureCode 35800JG is a coded representation of the key figure that describes the seriousness of an exception from a business viewpoint. For example, an exception may be a means of reporting problems or errors. An example of GDT ExceptionKeyFigureCode 35800JG is:

<ExceptionKeyFigureCode>1</ExceptionKeyFigure-Code>

The structure of GDT ExceptionKeyFigureCode 35800JG is depicted in FIG. 358JG. For the GDT ExceptionKeyFigureCode 35800JG, the Object Class is Exception 35804JG, the Property is KeyFigure 35806JG, the Representation/Association is Code 35808JG, the Type is CCT 35810JG, the Type Name is Code 35812JG, and the Length is from one to two 35814JG. The remark 35818JG shows that the GDT ExceptionKeyFigureCode 35800JG may be restricted.

An example of a coded representation of an exception key figure is "Overload". The actual key figure of an exception of the type "Capacity Overload in Bucket" that uses this code would then be "Overload by 13%". This could, for example, be triggered by a resource overload of 13% on resource "XYZ".

The attributes of the data type GDT ExceptionKeyFigureCode 35800JG are as follows: listID of 10229, listAgencyID of 310, listVersionID is a version of the relevant code list. The data type GDT ExceptionKeyFigureCode 35800JG may use the following codes: 1 (i.e., Key figure of an exception for a quantity-based deviation between the actual quantity and the required quantity), 2 (i.e., Key figure of an exception for a deviation of the actual stock quantity from a target stock quantity), 3 (i.e., Key figure of an exception for a capacity overload), 4 (i.e., Key figure of an exception for a capacity underload), 5 (i.e., Exception key figure for the actual utilization), 6 (i.e., Exception key figure for a delay in relation to a target date), 7 (i.e., Exception key figure for earliness in relation to a target date), 8 (i.e., Exception key figure for a deviation from a required time interval), 9 (i.e., Exception key figure for a deviation from a required days' supply).

(uuuuuuuuuuuuuuuuuuu) ExceptionKeyFigureValue

A GDT ExceptionKeyFigureValue 35800JH is a key figure value of an exception from a business viewpoint. For example, an exception may be a means of reporting problems or errors. The key figure value may be the result of the calculation or measurement of a deviation from a target value, where this deviation from a target value is the cause of the exception. An example of GDT ExceptionKeyFigureValue 35800JH is:

<ExceptionKeyFigureValue>
<Percent>13,5</Percent>
</ExceptionKeyFigureValue>

The structure of GDT ExceptionKeyFigureValue 35800JH is depicted in FIG. 358JH. For the GDT ExceptionKeyFigureValue 35800JH, the Object Class is Exception Key Figure Value 35801JH and the Representation/Association is Details 35804JH.

For the Quantity 35810JH, the Category is Element (E) 35811JH, the Property is Quantity 35813JH, the Representation/Association is Quantity 35814JH, the Type is GDT 35815JH, the Type Name is Quantity 35816JH, the Length indicates that the number may have thirteen places with six places past the decimal 35817JH, and the Cardinality is zero or one 35818JH.

For the Percent 35820JH, the Category is Element (E) 35821JH, the Property is Percent 35823JH, the Representation/Association is Percent 35824JH, the Type is GDT 35825JH, the Type Name is Percent 35826JH, the Length indicates that the number may have ten places with six places past the decimal 35827JH, and the Cardinality is zero or one 35828JH.

For the Duration 35830JH, the Category is Element (E) 35831JH, the Property is Duration 35833JH, the Representation/Association is Duration 35834JH, the Type is GDT 35835JH, the Type Name is Duration 35836JH, and the Cardinality is zero or one 35838JH.

The Quantity is the absolute quantity used to describe the seriousness of an exception. The Percent is the percentage used to describe the seriousness of an exception. The Duration is the time-based deviation used to describe the seriousness of an exception. In some implementations, at least one element from the set that includes quantity, percentage, or duration must be specified.

(vvvvvvvvvvvvvvvvvvv) FamilyNamePrefixCode

A GDT FamilyNamePrefixCode 35800JI is a coded representation of one or more prefix words for the name of a person. An example of GDT FamilyNamePrefixCode 35800JI is:

<FamilyNamePrefixCode>0001</FamilyNamePrefix-Code>

The structure of GDT FamilyNamePrefixCode 35800JI is depicted in FIG. 358JI. For the GDT FamilyNamePrefixCode 35800JI, the Object Class is Person 35801JI, the Property is Family Name Prefix 35803JI, the Representation/Association is Code 35804JI, the Type is CCT 35805JI, the Type Name is Code 35806JI, and the Length is from one to four 35807JI.

For the ListAgencyID 35810JI, the Category is Attribute (A) 35811JI, the Object Class is CodeListAgency 35812JI, the Property is Identification 35813JI, the Representation/Association is Identifier 35814JI, the Type is XSD 35815JI, the Type Name is Token 35816JI, and the Cardinality is zero or one 35818JI.

For the ListVersionID 35820JI, the Category is Attribute (A) 35821JI, the Object Class is CodeList 35822JI, the Property is Version 35823JI, the Representation/Association is Identifier 35824JI, the Type is XSD 35825JI, the Type Name is Token 35826JI, and the Cardinality is zero or one 35828JI.

For the ListAgency-SchemeID 35830JI, the Category is Attribute (A) 35831JI, the Object Class is CodeListAgency 35832JI, the Property is Scheme 35833JI, the Representation/Association is Identifier 35834JI, the Type is XSD 35835JI, the Type Name is Token 35836JI, and the Cardinality is zero or one 35838JI.

For the ListAgency-SchemeAgencyID 35840JI, the Category is Attribute (A) 35841JI, the Object Class is CodeListAgency 35842JI, the Property is SchemeAgency 35843JI, the Representation/Association is Identifier 35844JI, the Type is XSD 35845JI, the Type Name is Token 35846JI, and the Cardinality is zero or one 35848JI.

There is a code list for the FamilyNamePrefixCode. Customers can create their own code list. The attributes for the FamilyNamePrefixCode have the following values: listID of "10163", listAgencyID of "310" assigned by the customer for the customer code list, listVersionID is a version of the relevant code list assigned and administered by the organization listed in the ListAgencyID, listAgencySchemeID is the identification of the scheme once the organization listed in the listAgencyID is identified (It is a particular identification scheme for partners, businesses, and members, such as DUNS+4, and so on, of an administering organization, such as EAN, DUNS, and SWIFT, that is listed in the listAgency-SchemeAgencyID.), listAgencySchemeAgencyID is a blank for the code list (otherwise it is the ID of the managing organization, for example, DUNS, EAN, SWIFT, that is responsible for identification of the organization listed in the listAgencyID. It may be listed in DE 3055).

The data type FamilyNamePrefixCode is used as part of the name in the representation of the name of a person. A FamilyNamePrefixCode can represent a title such as 'von'.

The data type GDT FamilyNamePrefixCode 35800JI may use the following codes: 0001 (i.e., von), 0002 (i.e., von der), 0003 (i.e., van), 0004 (i.e., van der), 0005 (i.e., da), 0006 (i.e., de), 0007 (i.e., de la), 0008 (i.e., dos), 0009 (i.e., du), 0010 (i.e., el).

(wwwwwwwwwwwwwwwwwwww) FloorID

A GDT FloorID 35800JJ is a unique identifier of a floor within a building. An example of GDT FloorID 35800JJ is:

<FloorID>3</FloorID>

The structure of GDT FloorID 35800JJ is depicted in FIG. 358JJ. For the GDT FloorID 35800JJ, the Object Class is Floor 35804JJ, the Property is Identification 35806JJ, the Representation/Association is Identifier 35808JJ, the Type is CCT 35810JJ, the Type Name is Identifier 35812JJ, and the Length is from one to ten 35814JJ. The remark 35818JJ shows that the GDT FloorID 35800JJ may be restricted.

The FloorID may be unique for each building. The building is known from the context. The FloorID is used in address and business partner.

(xxxxxxxxxxxxxxxxxxxx) GenderCode

A GDT GenderCode 35800JK is a coded representation of a person's gender An example of GDT GenderCode 35800JK is: <GenderCode>1</GenderCode>

The structure of GDT GenderCode 35800JK is depicted in FIG. 358JK. For the GDT GenderCode 35800JK, the Property is Gender 35806JK, the Representation/Association is Code 35808JK, the Type is CCT 35810JK, the Type Name is Code 35812JK, and the Length is one 35814JK. The remark 35818JK shows that the GDT GenderCode 35800JK may be restricted.

The GDT GenderCode 35800JK is assigned exactly one standard code list as per ISO code 5218. The attributes are as follows: listID ('5218'), listAgencyID ('5'). The data type GDT GenderCode 35800JK may use the following codes: 1 (i.e., gender is unknown), 2 (i.e., gender is male), 3 (i.e., gender is female g), 4 (i.e., gender is not determined).

(yyyyyyyyyyyyyyyyyyyy) GeneralLedgerAccountAlias-Code

A GDT GeneralLedgerAccountAliasCode 35800JL is a coded representation of an alias for a G/L account For example, The alias may represent a G/L account independently of a chart of accounts An example of GDT GeneralLedgerAccountAliasCode 35800JL is:

<GeneralLedgerAccountAliasCode>231100</GeneralLedgerAccountAliasCode>

The structure of GDT GeneralLedgerAccountAliasCode 35800JL is depicted in FIG. 358JL. For the GDT GeneralLedgerAccountAliasCode 35800JL, the Object Class is General Ledger Account 35801JL, the Property is Alias 35803JL, the Representation/Association is Code 35804JL, the Type is CCT 35805JL, the Type Name is Code 35806JL, and the Length is from one to ten 35807JL. The remark 35809JL shows that the GDT GeneralLedgerAccountAlias-Code 35800JL may be restricted.

For the ListID 35810JL, the Category is Attribute (A) 35811JL, the Object Class is CodeList 35812JL, the Property is Identification 35813JL, the Representation/Association is Identifier 35814JL, the Type is XSD 35815JL, the Type Name is Token 35816JL, and the Cardinality is zero or one 35818JL.

For the ListAgencyID 35820JL, the Category is Attribute (A) 35821JL, the Object Class is CodeListAgency 35822JL, the Property is Identification 35823JL, the Representation/Association is Identifier 35824JL, the Type is XSD 35825JL, the Type Name is Token 35826JL, and the Cardinality is zero or one 35828JL.

For the ListVersionID 35830JL, the Category is Attribute (A) 35831JL, the Object Class is CodeList 35832JL, the Property is Version 35833JL, the Representation/Association is Identifier 35834JL, the Type is XSD 35835JL, the Type Name is Token 35836JL, and the Cardinality is zero or one 35838JL.

For the ListAgency-SchemeID 35840JL, the Category is Attribute (A) 35841JL, the Object Class is CodeListAgency 35842JL, the Property is Scheme 35843JL, the Representation/Association is Identifier 35844JL, the Type is XSD 35845JL, the Type Name is Token 35846JL, and the Cardinality is zero or one 35848JL.

For the ListAgency-SchemeAgencyID 35850JL, the Category is Attribute (A) 35851JL, the Object Class is CodeListAgency 35852JL, the Property is SchemeAgency 35853JL, the Representation/Association is Identifier 35854JL, the Type is XSD 35855JL, the Type Name is Token 35856JL, and the Cardinality is zero or one 35858JL.

The data type GDT GeneralLedgerAccountAliasCode 35800JL is a customer-specific code list.

The attributes may be as follows: listID ("10277"), listAgencyID (ID of the SAP customer), listVersionID (assigned and managed by the SAP customer), listAgencySchemeID (ID of the scheme), listAgencySchemeAgencyID (ID of the organization that manages the scheme of the listAgencySchemeID).

The alias for a G/L account may be used in applications that are external to Accounting and in which assignments are to be made directly to a G/L account, such as in the case of an invoice without order reference. It simplifies entry because a chart of accounts does not need to be specified and any multiple charts of accounts outside of Accounting are not made visible.

The assignment to a G/L account (GDT GeneralLedgerAccountReference) and the representation on accounts of other charts of accounts does not occur in Accounting until the posting is made.

(zzzzzzzzzzzzzzzzzzzz) IncotermsClassificationCode

A GDT IncotermsClassificationCode 35800JM is a coded representation for the characterization of delivery conditions for Incoterms. For example, Incoterms may be typical contract formulations for delivery conditions that correspond to the rules defined by the International Chamber of Commerce (ICC). An example of GDT IncotermsClassificationCode 35800JM is:

<IncotermsClassificationCode>FOB </IncotermsClassificationCode>

The structure of GDT IncotermsClassificationCode 35800JM is depicted in FIG. 358JM. For the GDT IncotermsClassificationCode 35800JM, the Object Class is Incoterms 35804JM, the Property is Classification 35806JM, the Representation/Association is Code 35808JM, the Type is CCT 35810JM, the Type Name is Code 35812JM, and the Length is three 35814JM. The remark 35818JM shows that the GDT IncotermsClassificationCode 35800JM may be restricted.

One fixed standard code list is assigned to the code. The attributes are as follows: listID (DE4053), listAgencyID (6).

The GDT IncotermsClassificationCode 35800JM is part of the Incoterms. Most codes, with the exception of 'EXW' and 'CPT', must always be used together with an IncotermsTransferLocation.

The GDT IncotermsClassificationCode 35800JM is used during the determination of delivery conditions in Incoterms.

The data type GDT IncotermsClassificationCode 35800JM may use the following codes: EXW (i.e., the transfer of risks to the importer occurs directly Ex Works of the exporter. The importer transports the goods entirely at his own costs), FCA (i.e., the transfer of costs and risks takes place at a place of lading as specified by the importer. The costs for the main transport are carried by the importer. Applicable for all transport types), FAS (i.e., the exporter pays the costs up to the quay of the port of lading, and up when the goods are cleared for export. The transfer of risks to the importer takes place when the goods are loaded onto the ship. Costs for transport insurance are carried by the importer. Applicable for maritime and inland shipping), FOB (i.e., except for the costs, like FAS; the exporter also carries the loading costs. The transfer of risks to the importer only occurs when the ship's rail is crossed), CFR (i.e., something) (i.e., the exporter carries all costs up to when the port of destination is reached. Costs for transport insurance are carried by the importer. The transfer of risks to the importer occurs when the ship's rail is crossed/at the port of shipment ), CIF (i.e., like CFR, however the exporter carries the costs for transport insurance), CPT (i.e., the exporter carries all transport costs for the goods up to the place of destination, as well as the costs for arranging the export. The importer covers the costs for transport insurance. The transfer of risks to the importer occurs when the goods are transferred to the carrier. Applicable for all transport types), CIP (i.e., like CPT, however the exporter carries the costs for transport insurance), DAF (i.e., the exporter carries the transport costs for the shipment up to a place of destination at the border, as well as for arranging the export. The transfer of risks to the importer occurs at the border, Applicable for all transport types), DES (i.e., the exporter carries all transport costs up to the port of destination; he also carries the costs for transport insurance, if this has been agreed upon. The transfer of risks to the importer occurs as soon as the ship has reached its port of destination. The importer also pays import duty, and carries the costs for unloading and subsequent transport. Applicable for maritime and inland shipping), DEQ (i.e., the exporter carries all transport costs up to the quay of the port of destination; he also carries the costs for transport insurance, if this has been agreed upon. The exporter also carries the risks connected with transporting the goods to the port of destination, and with unloading the goods to the quay. The importer has to clear the goods for import, and is responsible for the costs, formalities, duties and taxes that occur as a result), DDU (i.e., the exporter carries the transport costs up to the place of destination, the importer pays import duty. The exporter also carries the risks up to the place of destination), DDP (i.e., like DDU, however the exporter also pays the import duty).

(aaaaaaaaaaaaaaaaaaaa) InhouseMailID

A GDT InhouseMailID 35800JM is a unique identifier of a mail depot for postal shipping within the company An example of GDT InhouseMailID 35800JM is:

<InhouseMailID>16</InhouseMailID>

The structure of GDT InhouseMailID 35800JM is depicted in FIG. 358JM. For the GDT InhouseMailID 35800JM, the Object Class is InhouseMail 35804JM, the Property is Indentification 35806JM, the Representation/Association is Identifier 35808JM, the Type is CCT 35810JM, the Type Name is Identifier 35812JM, and the Length is from one to ten 35814JM. The remark 35818JM shows that the GDT InhouseMailID 35800JM may be restricted.

The data type GDT InhouseMailID 35800JM must be unique in the usage context.

(bbbbbbbbbbbbbbbbbbbb) PaymentRegisterGroupingCriterionCode

A GDT PaymentRegisterGroupingCriterionCode 35800JO is a coded representation of a criterion for grouping payments An example of GDT PaymentRegisterGroupingCriterionCode 35800JO is:

```
<PaymentRegisterGroupingCriterionCode>1
</PaymentRegisterGroupingCriterionCode>
```

The structure of GDT PaymentRegisterGroupingCriterionCode 35800JO is depicted in FIG. 358JO. For the GDT PaymentRegisterGroupingCriterionCode 35800JO, the Object Class is PaymentRegister 35801JO, the Property is GroupingCriterion 35803JO, the Representation/Association is Code 35804JO, the Type is CCT 35805JO, the Type Name is Code 35806JO, and the Length is from one to two 35807JO. The remark 35809JO shows that the GDT PaymentRegisterGroupingCriterionCode 35800JO may be restricted.

For the ListAgencyID 35810JO, the Category is Attribute (A) 35811JO, the Object Class is CodeListAgency 35812JO, the Property is Identification 35813JO, the Representation/Association is Identifier 35814JO, the Type is XSD 35815JO, the Type Name is Token 35816JO, and the Cardinality is zero or one 35818JO.

For the ListVersionID 35820JO, the Category is Attribute (A) 35821JO, the Object Class is CodeList 35822JO, the Property is Version 35823JO, the Representation/Association is Identifier 35824JO, the Type is XSD 35825JO, the Type Name is Token 35826JO, and the Cardinality is zero or one 35828JO.

For the ListAgency-SchemeID 35830JO, the Category is Attribute (A) 35831JO, the Object Class is CodeListAgency 35832JO, the Property is Scheme 35833JO, the Representation/Association is Identifier 35834JO, the Type is XSD 35835JO, the Type Name is Token 35836JO, and the Cardinality is zero or one 35838JO.

For the ListAgency-SchemeAgencyID 35840JO, the Category is Attribute (A) 35841JO, the Object Class is CodeListAgency 35842JO, the Property is SchemeAgency 35843JO, the Representation/Association is Identifier 35844JO, the Type is XSD 35845JO, the Type Name is Token 35846JO, and the Cardinality is zero or one 35848JO.

An extendable SAP code list may be assigned to the GDT PaymentRegisterGroupingCriterionCode 35800JO. SAP customers can change this code list.

In its unchanged state, the SAP code list has the following attributes: listID ("10251"), listAgencyID ("310"), listVersionID (version of the relevant code list).

If an SAP customer makes changes to the SAP code list, the values assigned to the attributes change as follows: listAgencyID (ID of the SAP customer), listVersionID (assigned and managed by the SAP customer), listAgencySchemeID (ID of the scheme), listAgencySchemeAgencyID (ID of the organization).

A Definition of the GDT PaymentRegisterGroupingCriterionCode 35800JO may be used to define further grouping criteria in addition to the process-specific grouping criteria for payments.

Only existing attributes of the business object PaymentRegister can be used.

Process-specific grouping criteria are grouping criteria that must always be considered within a business process for a grouping. Examples of process-specific grouping criteria for a payment are house bank account and payment procedure.

During the grouping of payments, payments that match in all grouping criteria are summarized.

There can be a default PaymentRegisterGroupingCriterionCode in a company. An alternative PaymentRegisterGroupingCriterionCode can be entered for individual business partners (for example, a grouping by business origin of the payment at specific customers).

(cccccccccccccccccccc) PersonNameSupplementCode

A GDT PersonNameSupplementCode 35800JQ is a coded representation of a name supplement An example of GDT PersonNameSupplementCode 35800JQ is:

<PersonNameSupplementCode>0003</PersonNameSupplementCode>

The structure of GDT PersonNameSupplementCode 35800JQ is depicted in FIG. 358JQ. For the GDT PersonNameSupplementCode 35800JQ, the Property is Person Name Supplement 35803JQ, the Representation/Association is Code 35804JQ, the Type is CCT 35805JQ, the Type Name is Code 35806JQ, and the Length is from one to four 35807JQ.

For the ListID 35810JQ, the Category is Attribute (A) 35811JQ, the Object Class is CodeList 35812JQ, the Property is Identification 35813JQ, the Representation/Association is Identifier 35814JQ, the Type is XSD 35815JQ, the Type Name is Token 35816JQ, and the Cardinality is zero or one 35818JQ.

For the ListAgencyID 35820JQ, the Category is Attribute (A) 35821JQ, the Object Class is CodeListAgency 35822JQ, the Property is Identification 35823JQ, the Representation/Association is Identifier 35824JQ, the Type is XSD 35825JQ, the Type Name is Token 35826JQ, and the Cardinality is zero or one 35828JQ.

For the ListVersionID 35830JQ, the Category is Attribute (A) 35831JQ, the Object Class is CodeList 35832JQ, the Property is Version 35833JQ, the Representation/Association is Identifier 35834JQ, the Type is XSD 35835JQ, the Type Name is Token 35836JQ, and the Cardinality is zero or one 35838JQ.

For the ListAgency-SchemeID 35840JQ, the Category is Attribute (A) 35841JQ, the Object Class is CodeListAgency 35842JQ, the Property is Scheme 35843JQ, the Representation/Association is Identifier 35844JQ, the Type is XSD 35845JQ, the Type Name is Token 35846JQ, and the Cardinality is zero or one 35848JQ.

For the ListAgency-SchemeAgencyID 35850JQ, the Category is Attribute (A) 35851JQ, the Object Class is CodeListAgency 35852JQ, the Property is SchemeAgency 35853JQ, the Representation/Association is Identifier 35854JQ, the Type is XSD 35855JQ, the Type Name is Token 35856JQ, and the Cardinality is zero or one 35858JQ.

An extendable SAP code list may be assigned to the data type GDT PersonNameSupplementCode 35856JQ. SAP customers can change this code list. In its unchanged state, the SAP code list has the following attributes: listID ("10119"), listAgencyID ("310"), listVersionID(version of the relevant code list)

If an SAP customer makes changes to the SAP code list, the values of the attributes are changed as follows: listAgencyID (ID of the SAP customer), listVersionID (assigned and managed by the SAP customer), listAgencySchemeID (ID of the scheme), listAgencySchemeAgencyID (ID of the organization that manages the scheme of the listAgencySchemeID).

The data type GDT PersonNameSupplementCode 35856JQ may be used as part of the name in the representation of the name of a person.

The data type GDT PersonNameSupplementCode 35800JQ may use the following codes: 0001 (i.e., Graf), 0002 (i.e., Gräfin), 0003 (i.e., Freiherr), 0004 (i.e., Freifrau), 0005 (i.e., Earl), 0006 (i.e., Sir), 0007 (i.e., Member of the Bundestag), 0008 (i.e., Member of the Landtages).

(dddddddddddddddddddd) POBoxID

A GDT POBoxID 35800JR is a unique identifier of a PO Box For example, something. An example of GDT POBoxID 35800JR is:

<POBoxID>14711</POBoxID>

The structure of GDT POBoxID 35800JR is depicted in FIG. 358JR. For the GDT POBoxID 35800JR, the Object Class is POBox 35804JR, the Property is Identification 35806JR, the Representation/Association is Identifier 35808JR, the Type is CCT 35810JR, the Type Name is Identifier 35812JR, and the Length is from one to ten 35814JR. The remark 35818JR shows that the GDT POBoxID 35800JR may be restricted.

A PO Box number may be used as part of the address.

In the GDT POBoxIDCreditCommitmentTypeCode 35800JR, only the number of the PO Box is to be entered. The text "PO Box" is determined language-specifically when the address is printed. The recipient language is used for this purpose.

When the address is printed, a distinction is made between the categories "Street address" and "PO Box address". The print program specifies which category is to take precedence if both values are maintained in one address record.

Besides the PO Box number, the following fields are taken into consideration for the PO Box address: Postcode of the PO Box (if filled, otherwise the normal postcode), City of the PO Box (if filled, otherwise the normal city), Region of the PO Box (if filled, otherwise the normal region), Country of the PO Box (if filled, otherwise the normal country).

If only the “PO Box” information (without number) applies in the address, then the “PO Box” field is not to be filled. Instead, the indicator “PO Box without number” is to be selected.

Instead of PO Box information, a company postcode can also be maintained in a special, separate field for organizational addresses.

(eeeeeeeeeeeeeeeeeeeee) PostalCode

A GDT PostalCode 35800JS is a coded representation of a postcode. An example of GDT PostalCode 35800JS is:

<PostalCode>69190</PostalCode>

The structure of GDT PostalCode 35800JS is depicted in FIG. 358JS. For the GDT PostalCode 35800JS, the Object Class is PostalCode 35804JS, the Representation/Association is Code 35808JS, the Type is CCT 35810JS, the Type Name is Code 35812JS, and the Length is from one to ten 35814JS. The remark 35818JS shows that the GDT PostalCode 35800JS may be restricted.

The data type GDT PostalCode 35800JS may be used to specify a postcode in an address.

PostalCode can be used to represent different postcodes. There is a unique code list for each country. The code list may use the following codes: StreetPostalCode (i.e., postcode of a street address), POBoxPostalCode (i.e., postcode of a PO Box address), CompanyPostalCode (i.e., postcode that is directly assigned to a company).

(fffffffffffffffffffff) PriceSpecificationElementTypeCode

A GDT PriceSpecificationElementTypeCode 35800JT is a coded representation of the type of specification of a price, discount or surcharge. For example, the GDT PriceSpecificationElementTypeCode 35800JT may specify a special percent or absolute discount based on the 50th anniversary of a company. An example of GDT PriceSpecificationElementTypeCode 35800JT is:

<PriceSpecificationElementTypeCode>2310</PriceSpecificationElementTypeCode>

The structure of GDT PriceSpecificationElementTypeCode 35800JT is depicted in FIG. 358JT. For the GDT PriceSpecificationElementTypeCode 35800JT, the Object Class is PriceSpecificationElement 35804JT, the Property is Type 35806JT, the Representation/Association is Code 35808JT, the Type is CCT 35810JT, the Type Name is Code 35812JT, and the Length is four 35814JT. The remark 35818JT shows that the GDT PriceSpecificationElementTypeCode 35800JT may be restricted.

The data type GDT PriceSpecificationElementTypeCode 35800JT may use the following codes: 1000 (i.e., specifies a price ), 1010 (i.e., specifies a special price), 1100 (i.e., specifies a basic price), 1110 (i.e., specifies a price based on a recommended price), 1120 (i.e., Specifies a price based on a price requirement), 1200 (i.e., specifies a price based on special properties of the master data used), 1210 (i.e., specifies a price based on group membership of the business partner), 1220 (i.e., specifies a price based on group membership of the product ), 1230 (i.e., Specifies a price based on a specific product configuration), 1300 (i.e., specifies a price based on a promotion), 1310 (i.e., specifies a price based on a one-time sales event that is restricted to a certain time period), 1320 (i.e., specifies a price based on a recurring promotion that is restricted to a certain time period), 1400 (i.e., specifies a price based on business processes that deviate from the business standard ), 1410 (i.e., specifies a price for a quantity of a product or the total document as a result of exceeding or falling short of a value limit), 1420 (i.e., specifies a price for the quantity of a product or the total document as a result of exceeding or falling short of a quantity limit), 1430 (i.e., specifies a price for the quantity of a product or the total document as a result of a binding agreement, for example when ordering or when signing a contract), 2000 (i.e., specifies a discount or surcharge), 2010 (i.e., specifies a special discount or surcharge), 2100 (i.e., specifies a base value discount or surcharge), 2200 (i.e., specifies a discount or surcharge based on special properties of the master data used), 2210 (i.e., specifies a discount or surcharge based on the group membership of the business partner), 2220 (i.e., specifies a discount or surcharge based on the group membership of the product), 2230 (i.e., specifies a discount or surcharge based on product configuration), 2300 (i.e., specifies a discount or surcharge based on a promotion), 2310 (i.e., specifies a discount or surcharge based on a one-time sales event that is restricted to a certain time period), 2320 (i.e., specifies a discount or surcharge based on a recurring promotion that is restricted to a certain time period), 2340 (i.e., specifies a discount or surcharge based on a coupon or voucher), 2400 (i.e., Specifies a discount or surcharge based on business processes that deviate from the business standard), 2410 (i.e., specifies a discount or surcharge for the quantity of a product or the total document as a result of exceeding or falling short of the value limit), 2420 (i.e., specifies a price for a quantity of a product or the total document as a result of exceeding or falling short of the quantity limit), 2430 (i.e., specifies a discount or surcharge for the quantity of a product or the total document as a result of a binding agreement, for example when ordering or when signing a contract), 2500 (i.e., specifies a discount or surcharge based on special calculative processing), 2510 (i.e., specifies a discount based on free goods), 2520 (i.e., specifies a discount or surcharge based on the clearing of rounding differences), 4000 (i.e., specifies transport costs), 4100 (i.e., specifies packaging), 4200 (i.e., specifies freight ), 5100 (i.e., specifies customs duty), 6000 (i.e., specifies special terms of payment), 6100 (i.e., cash discount).

(ggggggggggggggggggggg) PriceTypeCode

A GDT PriceTypeCode 35800JU is a coded representation of a price type For example, the price type may specify the business relevance of a price An example of GDT PriceTypeCode 35800JU is:

<PriceTypeCode listAgencyID=“310”>1</PriceTypeCode>

The structure of GDT PriceTypeCode 35800JU is depicted in FIG. 358JU. For the GDT PriceTypeCode 35800JU, the Object Class is Price 35804JU, the Property is Type 35806JU, the Representation/Association is Code 35808JU, the Type is CCT 35810JU, the Type Name is Code 35812JU, and the Length is from one to three 35814JU. The remark 35818JU shows that the GDT PriceTypeCode 35800JU may be restricted.

For the ListID 35810JU, the Category is Attribute (A) 35811JU, the Object Class is CodeList 35812JU, the Property is Identification 35813JU, the Representation/Association is Identifier 35814JU, the Type is XSD 35815JU, the Type Name is Token 35816JU, and the Cardinality is zero or one 35818JU.

For the ListAgencyID 35820JU, the Category is Attribute (A) 35821JU, the Object Class is CodeListAgency 35822JU, the Property is Identification 35823JU, the Representation/

Association is Identifier 35824JU, the Type is XSD 35825JU, the Type Name is Token 35826JU, and the Cardinality is zero or one 35828JU.

For the ListVersionID 35830JU, the Category is Attribute (A) 35831JU, the Object Class is CodeList 35832JU, the Property is Version 35833JU, the Representation/Association is Identifier 35834JU, the Type is XSD 35835JU, the Type Name is Token 35836JU, and the Cardinality is zero or one 35838JU.

For the ListAgency-SchemeID 35840JU, the Category is Attribute (A) 35841JU, the Object Class is CodeListAgency 35842JU, the Property is Scheme 35843JU, the Representation/Association is Identifier 35844JU, the Type is XSD 35845JU, the Type Name is Token 35846JU, and the Cardinality is zero or one 35848JU.

For the ListAgency-SchemeAgencyID 35850JU, the Category is Attribute (A) 35851JU, the Object Class is CodeListAgency 35852JU, the Property is SchemeAgency 35853JU, the Representation/Association is Identifier 35854JU, the Type is XSD 35855JU, the Type Name is Token 35856JU, and the Cardinality is zero or one 35858JU.

Multiple code lists are allowed for the GDT PriceTypeCode 35800JU. A default code list is delivered by SAP. The customer can add other code lists.

The default code list attributes are as follows: listID ("10064"), listAgencyID ("310"), listVersionID (version of the relevant code list).

The data type GDT PriceTypeCode 35800JU may use the following codes: 1 (i.e., the price type Material Inventory Price describes the price determined from the inventory value of a MaterialSubledgerAccount), 2 (i.e., the price type Material Standard Price describes the material price that is used over an extended length of time without being changed. This price is usually calculated in standard cost planning and normally represents a target that should not be exceeded).

The attributes may be used as follows: listID (ID of the relevant code list. It is assigned and administered by a customer. The customer is responsible for the values of the ID in question), listAgencyID (The ID of the customer), listVersionID (version of the relevant code list. This is assigned and administered by the customer listed in the listAgencyID), listAgencySchemeID(the ID of the scheme by which the customer listed in the listAgencyID is identified. It is a particular identification scheme for partners, businesses, and members, and so on, of an administering organization that is listed in the listAgencySchemeAgencyID), listAgencySchemeAgencyID (ID of the administering organization that is responsible for identifying the organization listed in the listAgencyID).

Examples of custom codes: Purchase price (price at which a product is procured), Material price based on commercial code (price at which a material is valuated based on the commercial code), Material price based on tax code (price at which a material is valuated based on the tax code), Planned price (planned price used to valuate an internal activity).

(hhhhhhhhhhhhhhhhhhhhh) ProjectTypeCode

A GDT ProjectTypeCode 35800JV is a coded representation of a project type For example, the key characteristics of a project type are the process category, the scheduling type, permitted project tasks, and permitted check lists. An example of GDT ProjectTypeCode 35800JV is:

<ProjectTypeCode>DEV_INTERNAL </ProjectTypeCode>

The structure of GDT ProjectTypeCode 35800JV is depicted in FIG. 358JV. For the GDT ProjectTypeCode 35800JV, the Object Class is Project 35801JV, the Property is Type 35803JV, the Representation/Association is Code 35804JV, the Type is CCT 35805JV, the Type Name is Code 35806JV, and the Length is from one to fifteen 35807JV. The remark 35809UV shows that the GDT ProjectTypeCode 35800JV may be restricted.

For the ListAgencyID 35810JV, the Category is Attribute (A) 35811JV, the Object Class is CodeListAgency 35812JV, the Property is Identification 35813JV, the Representation/Association is Identifier 35814JV, the Type is XSD 35815JV, the Type Name is Token 35816JV, and the Cardinality is zero or one 35818JV.

For the ListVersionID 35820JV, the Category is Attribute (A) 35821JV, the Object Class is CodeList 35822JV, the Property is Version 35823JV, the Representation/Association is Identifier 35824JV, the Type is XSD 35825JV, the Type Name is Token 35826JV, and the Cardinality is zero or one 35828JV.

For the ListAgency-SchemeID 35830JV, the Category is Attribute (A) 35831JV, the Object Class is CodeListAgency 35832JV, the Property is Scheme 35833JV, the Representation/Association is Identifier 35834JV, the Type is XSD 35835JV, the Type Name is Token 35836JV, and the Cardinality is zero or one 35838JV.

For the ListAgency-SchemeAgencyID 35840JV, the Category is Attribute (A) 35841JV, the Object Class is CodeListAgency 35842JV, the Property is SchemeAgency 35843JV, the Representation/Association is Identifier 35844JV, the Type is XSD 35845JV, the Type Name is Token 35846JV, and the Cardinality is zero or one 35848JV. A customer-specific code list may be assigned to the data type GDT ProjectTypeCode 35800JV. An SAP customer defines the codes in the code list.

Values may be assigned to the attributes of data type GDT ProjectTypeCode 35800JV as follows: listID ("10223"), listAgencyID (ID of the SAP customer), listVersionID (assigned and managed by the SAP customer), listAgencySchemeID (ID of the scheme), listAgencySchemeAgencyID (ID of the organization that manages the scheme of the listAgencySchemeID).

Examples of customer-specific code semantics: Research project (research into a new product), Investment project (construction of a dam), Consultancy project (provision of support during the course of a larger project), Organizational project (planning of major events), Development project (development of a new software application), Servicing project (maintenance of technical assets).

(iiiiiiiiiiiiiiiiiii) PurchaseLedgerAccountTypeCode

A GDT PurchaseLedgerAccountTypeCode 35800JW is a coded representation of the type of a PurchaseLedgerAccount For example, the GDT PurchaseLedgerAccountTypeCode 35800JW may be a record of quantities and values that are relevant to valuation for business processes in which material goods or services are procured. This record serves the purpose of proper financial reporting of the inventory or profit and loss statement of a company. An example of GDT PurchaseLedgerAccountTypeCode 35800JW is:

<PurchaseLedgerAccountTypeCode>1</PurchaseLedgerAccountTypeCode>

The structure of GDT PurchaseLedgerAccountTypeCode 35800JW is depicted in FIG. 358JW. For the GDT PurchaseLedgerAccountTypeCode 35800JW, the Object Class is PurchaseLedgerAccount 35804JW, the Property is Type 35806JW, the Representation/Association is Code 35808JW, the Type is CCT 35810JW, the Type Name is Code 35812JW, and the Length is from one to two 35814JW. The remark 35818JW shows that the GDT PurchaseLedgerAccountTypeCode 35800JW may be restricted.

The attributes may be as follows: listID ("10212"), listAgencyID ("310"), listVersionID (Version of the respective code list).

The data type GDT PurchaseLedgerAccountTypeCode 35800JW may use the following codes: 1 (i.e., a PurchasingObject is a purchase ledger whose record refers to a business transaction document of Purchasing (purchase order, purchasing contract)), 2 (i.e., a PurchasingSegment is a purchase ledger whose record refers to a section of the procurement process. The PurchasingSegment represents an accounting view of procurement processes that were not posted for a business transaction document of Purchasing. This section is defined by product and supplier characteristics (such as product and supplier) and organizational characteristics).

(jjjjjjjjjjjjjjjjjjjj) AccountDeterminationIncomeGroupCode

A GDT AccountDeterminationIncomeGroupCode 35800KG is the coded representation of a group of revenues from the perspective of an identical or similar determination of an account in accounting. For the purposes of proper financial reporting, the value-based representation of business transactions in accounting must use different accounts. An example of the GDT AccountDeterminationIncomeGroupCode 35800KG is:

| |
|---|
| <AccountDeterminationIncomeGroupCode>10 </AccountDeterminationIncomeGroupCode> |

The structure of GDT AccountDeterminationIncomeGroupCode 35800KF is depicted in FIG. 358KF. For the GDT AccountDeterminationIncomeGroupCode 35800KF, the Object Class term Qualifier is Account Determination 35802KF, the Object Class term is Income Group 35804KF, the Representation/Association term is Code 35806KF, the Type term is CCT 35808KF, the Type Name term is Code 35810KF, and the Length is from one to four 35812KF. The GDT AccountDeterminationIncomeGroupCode 35800KF may be restricted 35814KF.

In some variations, a customer-specific code list can be assigned to the code. The customer can define the codes in the code list. As an example, the attributes of the code may include assigned values as follows:

listID="10400"

listAgencyID—ID of the customer listVersionID—Assigned and managed by the customer listAgencySchemeID—ID of the scheme listAgencySchemeAgencyID—ID of the organization that manages the scheme of the listAgencySchemeID In some implementations, the GDT AccountDeterminationIncomeGroupCode 35800KF is used in the business object models and in A2A messages. Some examples of possible codes are Revenue from employee sales and Revenue from sale of old PCs.

(kkkkkkkkkkkkkkkkkkkk) AccountingClosingStepCode

A GDT AccountingClosingStepCode 35800KG is the coded representation of a step in an accounting closing. Closing in accounting describes a consolidated status on the key date in the books in accounting. Closing is divided into steps that are processed in a logical order from the business view. An example of the GDT AccountingClosingStepCode 35800KG is:

<AccountingClosingStepCode>10</AccountingClosingStepCode>

The structure of GDT AccountingClosingStepCode 35800KG is depicted in FIG. 358KG. For the GDT AccountingClosingStepCode 35800KG, the Object Class term is Accounting Closing Step 35802KG, the Representation/Association term is Code 35804KG, the Type term is CCT 35806KG, the Type Name term is Code 35808KG, and the Length is from one to fifteen 35810KG. The AccountingClosingStepCode 35800KG may be restricted 35812KG.

In some variations, the AccountingClosingStepCode 35800KG is a customer-specific code list. For example, the attribute "listID" can be filled implicitly with "10109." The AccountingClosingStepCode 35800KG may not currently be used in A2A or B2B messages.

The definition of a step in closing is meant by AccountingClosingStepCode 35800KG and not an "instance", that is, not a concrete posting in a concrete closing.

Some examples of customer-specific codes includes posting of a depreciation posting run as a closing process of the period/quarter/fiscal year, posting of a material price valuation as a closing process of the period/quarter/fiscal year, posting of a regrouping of receivables and payables as a closing process of the period/quarter/fiscal year, posting of an assessment as a closing process of the period/quarter/fiscal year, and manual correction by the head of accounting at the end of the period, for example, manual accrual.

In some implementations, an initial AccountingClosingStepCode 35800KG represents a business transaction that takes place outside Accounting, for example, invoice issue or receipt, goods issue or receipt.

(llllllllllllllllllll) InspectionContainerTypeCode

A GDT InspectionContainerTypeCode 35800KH is the coded representation of the container in which the inspection sample is transported and stored for inspection purposes. An example of GDT InspectionContainerTypeCode 35800KH is:

<InspectionContainerTypeCode>1</InspectionContainerTypeCode>

The structure of GDT InspectionContainerTypeCode 35800KH is depicted in FIG. 358KH. The GDT InspectionContainerTypeCode 35800KH includes attributes listAgencyID 35814KH, listVersionID 35830KH, listAgencySchemeID 35846KH, and listAgencySchemeAgencyID 35862KH. For the GDT InspectionContainerTypeCode 35800KH, the Object Class term is Inspection 35802KH, the Representation/Association term is Code 35804KH, the Type term is xsd 35806KH, the Type Name term is token 35808KH, and the Length is from one to fifteen 35810KH. The InspectionContainerTypeCode 35800KH may be restricted 35812KH.

For the listAgencyID 35814KH, the Category is Attribute 35816KH, the Object Class term is CodeListAgency 35818KH, the Property term is Identification 35820KH, the Representation/Association term is Identifier 35822KH, the Type term is xsd 35824KH, and the Type Name term is token 35826KH. The cardinality between the listAgencyID 35814KH and the GDT InspectionContainerTypeCode 35800KH is either zero or one 35828KH.

For the listVersionID 35830KH, the Category is Attribute 35832KH, the Object Class term is CodeList 35834KH, the Property term is Version 35836KH, the Representation/Association term is Identifier 35838KH, the Type term is xsd 35840KH, and the Type Name term is token 35842KH. The cardinality between the listVersionID 35830KH and the GDT InspectionContainerTypeCode 35800KH is either zero or one 35844KH.

For the listAgencySchemeID 35846KH, the Category is Attribute 35848KH, the Object Class term is CodeListAgency 35850KH, the Property term is Scheme 35852KH, the Representation/Association term is Identifier 35854KH, the Type term is xsd 35856KH, and the Type Name term is token 35858KH. The cardinality between the listAgencySchemeID 35862KH and the GDT InspectionContainerTypeCode 35800KH is either zero or one 35860KH.

For the listAgencySchemeAgencyID 35862KH, the Category is Attribute 35864KH, the Object Class term is CodeListAgency 35866KH, the Property term is Scheme 35868KH, the Representation/Association term is Identifier 35870KH, the Type term is xsd 35872KH, and the Type Name term is token 35874KH. The cardinality between the listAgencySchemeAgencyID 35862KH and the GDT InspectionContainerTypeCode 35800KH is either zero or one 35876KH.

The attributes of Code are assigned values as follows:

listID="10402"

listAgencyID—ID of the SAP customer (ID from DE 3055 if listed there)

listVersionID—Assigned and managed by the SAP customer listAgencySchemeID—ID of the scheme if the listAgencyID is not taken from DE 3055 listAgencySchemeAgencyID—ID of the organization (taken from DE 3055) that manages the scheme of the listAgencySchemeID The InspectionContainerTypeCode can, for example, be used to describe transport containers for samples in the context of a material inspection. In some variations, the InspectionContainerTypeCode 35800KH is represented by the following dictionary objects: Data element: QIE_TV_CONTAINER_ID.

(mmmmmmmmmmmmmmmmmmmmmm) InspectionDecisionCode

An InspectionDecisionCode 35800KI is the coded representation of the decision that is made as part of an inspection regarding the acceptance or rejection of the inspected object. An example of the InspectionDecisionCode 35800KI is:

<InspectionDecisionCode>1</InspectionDecisionCode>

The structure of GDT InspectionDecisionCode 35800KI is depicted in FIG. 358KI. The GDT InspectionDecisionCode 35800KI includes attributes listAgencyID 35814KI, listVersionID 35830KI, listAgencySchemeID 35846KI, and listAgencySchemeAgencyID 35862KI. For the GDT InspectionDecisionCode 35800KI, the Object Class term is Inspection 35802KI, the Representation/Association term is Code 35804KI, the Type term is xsd 35806KI, the Type term is token 35808KI, the Type Name term is Code 35810KI, and the Length is from one to fifteen 35810KI. The InspectionDecisionCode 35800KI may be restricted 35812KI.

For the listAgencyID 35814KI, the Category is Attribute 35816KI, the Object Class term is CodeListAgency 35818KI, the Property term is Identification 35820KI, the Representation/Association term is Identifier 35822KI, the Type term is xsd 35824KI, and the Type Name term is token 35826KI. The cardinality between the listAgencyID 35814KI and the GDT InspectionDecisionCode 35800KI is either zero or one 35828KI.

For the listVersionID 35830KI, the Category is Attribute 35832KI, the Object Class term is CodeList 35834KI, the Property term is Version 35836KI, the Representation/Association term is Identifier 35838KI, the Type term is xsd 35840KI, and the Type Name term is token 35842KI. The cardinality between the listVersionID 35830KI and the GDT InspectionDecisionCode 35800KI is either zero or one 35844KI.

For the listAgencySchemeID 35846KI, the Category is Attribute 35848KI, the Object Class term is CodeListAgency 35850KI, the Property term is Scheme 35852KI, the Representation/Association term is Identifier 35854KI, the Type term is xsd 35856KI, and the Type Name term is token 35858KI. The cardinality between the listAgencySchemeID 35862KI and the GDT InspectionDecisionCode 35800KI is either zero or one 35860KI.

For the listAgencySchemeAgencyID 35862KI, the Category is Attribute 35864KI, the Object Class term is CodeListAgency 35866KI, the Property term is Scheme 35868KI, the Representation/Association term is Identifier 35870KI, the Type term is xsd 35872KI, and the Type Name term is token 35874KI. The cardinality between the listAgencySchemeAgencyID 35862KI and the GDT InspectionDecisionCode 35800KI is either zero or one 35876KI.

As an example, the attributes of Code can be assigned values as follows:

listID="10403"

listAgencyID—ID of the customer listVersionID—Assigned and managed by the customer listAgencySchemeID—ID of the scheme if the listAgencyID is not taken from DE 3055 listAgencySchemeAgencyID—ID of the organization (taken from DE 3055) that manages the scheme of the listAgencySchemeID The GDT InspectionDecisionCode 35800KI can, for example, be used in the context of a material inspection. This code is used to document the decision about whether the inspected material is accepted or rejected for the further production process.

Some examples of customer-specific code semantics are:

"OK"—Accepted

"OK with Restrictions"—Accepted with restrictions

"Not OK"—Rejected, material should not be used (nnnnnnnnnnnnnnnnnnnn) InspectionDecisionCodeListID A GDT InspectionDecisionCodeListID 35800KJ is an identifier for a list of codes that are used to valuate the inspection object. An InspectionDecisionCodeList is a list of codes that are valid for a decision in an inspection regarding the acceptance or rejection of the inspected object. An example of the GDT InspectionDecisionCodeListID 35800KJ is:

<InspectionDecisionCodeListID>123456789012345</InspectionDecisionCodeListID>

The structure of GDT InspectionDecisionCodeListID 35800KJ is depicted in FIG. 358KJ. The GDT InspectionDecisionCodeListID 35800KJ includes attributes SchemeID 35816KJ and SchemeAgencyID 35834KJ. For the GDT InspectionDecisionCodeListID 35800KJ, the Object Class term is Inspection Decision Code List 35802KJ, the Property term is Identification 35804KJ, the Representation/Association term is Identifier 35806KJ, the Type term is CCT 35808KJ, the Type Name term is Identifier 35810KJ, and the Length is from one to fifteen 35812KJ. The GDT InspectionDecisionCodeListID 35800KJ may be restricted 35814KJ.

For the SchemeID 35816KJ, the category is attribute 35818KJ, the Object Class is Identification Scheme 35820KJ, the Property term is Identification 35822KJ, the Representation/Association term is Identifier 35824KJ, the Type term is xsd 35826KJ, the Type Name term is token 35828KJ, and the Length is from one to sixty 35830KJ. The cardinality between the SchemeID 35816KJ and the GDT InspectionDecisionCodeListID 35800ID is either zero or one 35832KJ.

For the SchemeAgencyID 35834KJ, the category is attribute 35836KJ, the Object Class is Identification Scheme Agency 35838KJ, the Property term is Identification 35840KJ, the Representation/Association term is Identifier 35842KJ, the Type term is xsd 35844KJ, the Type Name term is token 358646KJ, and the Length is from one to sixty 35848KJ. The cardinality between the SchemeAgencyID 35834KJ and the GDT InspectionDecisionCodeListID 35800ID is either zero or one 35850KJ.

The attributes of InspectionDecisionCodeListID are filled as follows:

schemeID=InspectionDecisionCodeList<Qualifier>ID schemeAgencyID: Business system in which the identifier was assigned.

In some examples, the GDT InspectionDecisionCodeListID 35800KK can identify a list of decision codes in a material inspection.

(oooooooooooooooooooo) InspectionDynamicModificationCriterionCode

The GDT InspectionDynamicModificationCriterionCode 35800KK is the coded representation of a dynamic modification criterion used for the dynamic modification of an inspection. The dynamic modification criterion determines the properties according to which inspections are dynamically modified. A dynamic modification criterion can, for example, define that the properties color of a bottle and volume of a bottle are used in the dynamic modification of the inspection. An example (Instance) of the GDT InspectionDynamicModificationCriterionCode 35800KK is:

<InspectionDynamicModificationCriterionCode>DMODCRIT01</InspectionDynamicModificationCriterionCode>

The structure of GDT InspectionDynamicModificationCriterionCode 35800KK is depicted in FIG. 358KK. For the GDT InspectionDynamicModificationCriterionCode 35800KK, the Object Class term is Inspection Dynamic Modification Criterion 35802KK, the Representation/Association term is Code 35804KK, the Type term is CCT 35806KK, the Type Name term is Code 35808KK, and the Length is from one to fifteen 35810KK. The GDT InspectionDynamicModificationCriterionCode 35800KK may be restricted 35812KK.

In some variations, a customer-specific code list can be assigned to the GDT InspectionDynamicModificationCriterionCode 35800KK. For example, a customer can define the codes in the code list. As an example, the attributes of the GDT InspectionDynamicModificationCriterionCode 35800KK may be assigned values as follows:

listID—ID of a relevant code list.

listAgencyID—ID of a customer listVersionID—Assigned and managed by a customer listAgencySchemeID—ID of the scheme if the listAgencyID is not taken from DE 3055 listAgencySchemeAgencyID—ID of an organization that managed the scheme of the listAgencySchemeID The InspectionModificationCriterionCode 35800KK is used as a key for differentiating the quality level in the context of an inspection. Some examples of codes are:

| | |
|---|---|
| DMODCRIT01 | Dynamic modification related to material |
| DMODCRIT02 | Dynamic modification related to material and vendor |
| DMODCRIT03 | Dynamic modification related to material and customer |

(pppppppppppppppppppp) InspectionLevelCode

The GDT InspectionLevelCode 35800KL is the coded representation of an inspection level. In a sampling inspection using a sampling scheme in accordance with DIN ISO 2859, the inspection level is a factor in the determination of the sample size based on the quantity (lot quantity) that is to be inspected. For the same inspection quantity, a low inspection level will usually give rise to a sample size in the lower range, a higher inspection level will give rise to a sample size in the higher range. An example (Instance) of the GDT InspectionLevelCode 35800KL is:

<InspectionLevelCode>3</InspectionLevelCode>

The structure of GDT InspectionLevelCode 35800KL is depicted in FIG. 358KL. For the GDT InspectionLevelCode 35800KL, the Object Class term is Inspection 35802KL, the Property term is Level 35804KL, the Representation/Association term is Code 35806KL, the Type term is CCT 35808KL, the Type Name term is Code 35810KL, and the Length is one 35812KL. The GDT InspectionLevelCode 35800KL may be restricted 35814KL.

The GDT InspectionLevelCode 35800KL can include one fixed code list. For example, the attributes may contain the following values:

listID="10098"

listAgencyID="310"

listVersionID—Version of the relevant code list.

The values of this code list are based on the DIN ISO standard 2859. The standard does not contain a code list for this purpose.

The GDT InspectionLevelCode 35800KL can be used in the context of an inspection and provides information regarding the inspection level based on DIN ISO 2859. For inspection level S-1, the sample size tends to be the lowest and for inspection level III it tends to be the highest.

In some variations, the GDT InspectionLevelCode 35800KL can be represented by the following dictionary objects:

Data element: QIE_TV_INSP_LEVEL

Domain: QIE_INSP_LEVEL

An example code list can be described by the following table:

| Code | Name | Description |
|---|---|---|
| 1 | Inspection level S-1 | Name of the inspection level S-1 according to DIN ISO 2859 |
| 2 | Inspection level S-2 | Name of the inspection level S-2 according to DIN ISO 2859 |
| 3 | Inspection level S-3 | Name of the inspection level S-3 according to DIN ISO 2859 |
| 4 | Inspection level S-4 | Name of the inspection level S-4 according to DIN ISO 2859 |
| 5 | Inspection level I | Name of the inspection level I according to DIN ISO 2859 |
| 6 | Inspection level II | Name of the inspection level II according to DIN ISO 2859 |
| 7 | Inspection level III | Name of the inspection level III according to DIN ISO 2859 |

(qqqqqqqqqqqqqqqqqqqq) InspectionQualityLevelHistoryItemTypeCode

The GDT InspectionQualityLevelHistoryItemTypeCode 35800KM is the coded representation of a type of history item of a quality level. A history item describes an event that has affected the history of a quality level, and has led to a change in the quality level. A quality level represents the current state of inspection effort reduction for inspections of the same type and specifies the inspection stage for the next inspection of the same type. Inspections of the same type are inspections that have, for example, the same combination of material and supplier for material deliveries. An example of the GDT InspectionQualityLevelHistoryItemTypeCode 35800KM is:

<InspectionQualityLevelHistoryItemTypeCode>2</InspectionQualityLevelHistoryItemTypeCode>

The structure of GDT InspectionQualityLevelHistoryItemTypeCode 35800KM is depicted in FIG. 358KM. For the GDT InspectionQualityLevelHistoryItemTypeCode 35800KM, the Object Class term is Inspection Quality Level History Item 35802KM, the Property term is Type 35804KM, the Representation/Association term is Code 35806KM, the Type term is CCT 35808KM, the Type Name term is Code 35810KM, and the Length is one 35812KM. The GDT InspectionQualityLevelHistoryItemTypeCode 35800KM may be restricted 35814KM.

In some implementations, one fixed code list can be assigned to the GDT InspectionQualityLevelHistoryItemTypeCode 35800KM. An example of the attributes may be as follows:

SAP Code List:

listID=10387 listAgencyID="310"

For a quality level in the context of an inspection, the GDT InspectionQualityLevelHistoryItemTypeCode 35800KM can differentiate, for example, between three history item types that affect the progression of the quality level. The history allows you to make projections regarding the future progression of the quality level, and to depict the process of inspection effort reduction.

An example of a code list can be defined as:

| Code | Name | Description |
|---|---|---|
| 1 | Intervention | Intervention to adjust the quality level |
| 2 | Newly Created Inspection | A new inspection has been created. |
| 3 | Inspection Decision | Decision regarding the acceptance or rejection of the inspection quantity for further use |

(rrrrrrrrrrrrrrrrrrrr) InspectionRuleComponentCode

The GDT InspectionRuleComponentCode 35800KN is the coded representation of a component of an inspection rule. An inspection rule (business object inspection rule) contains the specifications for the inspection. The inspection is used to check whether an object or procedure meets predefined requirements. A component of the inspection rule is one single specification in the inspection rule. An example of the GDT InspectionRuleComponentCode 35800KN is:

<InspectionRuleComponentCode>2</InspectionRuleComponentCode>

The structure of GDT InspectionRuleComponentCode 35800KN is depicted in FIG. 358KN. The GDT InspectionRuleComponentCode 35800KN includes attributes listAgencyID 35814KN, listVersionID 35830KN, listAgencySchemeID 35846KN, and listAgencySchemeAgencyID 35862KN. For the GDT InspectionRuleComponentCode 35800KN, the Object Class term is Inspection Rule Component 35802KN, the Representation/Association term is Code 35804KN, the Type term is xsd 35806KN, the Type term is token 35808KN, the Type Name term is Code 35810KN, and the Length is from one to three 35810KN. The InspectionRuleComponentCode 35800KN may be restricted 35812KN.

For the listAgencyID 35814KN, the Category is Attribute 35816KN, the Object Class term is CodeListAgency 35818KN, the Property term is Identification 35820KN, the Representation/Association term is Identifier 35822KN, the Type term is xsd 35824KN, and the Type Name term is token 35826KN. The cardinality between the listAgencyID 35814KN and the GDT InspectionRuleComponentCode 35800KN is either zero or one 35828KN.

For the listVersionID 35830KN, the Category is Attribute 35832KN, the Object Class term is CodeList 35834KN, the Property term is Version 35836KN, the Representation/Association term is Identifier 35838KN, the Type term is xsd 35840KN, and the Type Name term is token 35842KN. The cardinality between the listVersionID 35830KN and the GDT InspectionRuleComponentCode 35800KN is either zero or one 35844KN.

For the listAgencySchemeID 35846KN, the Category is Attribute 35848KN, the Object Class term is CodeListAgency 35850KN, the Property term is Scheme 35852KN, the Representation/Association term is Identifier 35854KN, the Type term is xsd 35856KN, and the Type Name term is token 35858KN. The cardinality between the listAgencySchemeID 35862KN and the GDT InspectionRuleComponentCode 35800KN is either zero or one 35860KN.

For the listAgencySchemeAgencyID 35862KN, the Category is Attribute 35864KN, the Object Class term is CodeListAgency 35866KN, the Property term is Scheme 35868KN, the Representation/Association term is Identifier 35870KN, the Type term is xsd 35872KN, and the Type Name term is token 35874KN. The cardinality between the listAgencySchemeAgencyID 35862KN and the GDT InspectionRuleComponentCode 35800KN is either zero or one 35876KN.

In some variations, an extendable code list can be assigned to the GDT InspectionRuleComponentCode 35800KN. Customers can change this code list. In its unchanged state, the assigned code list has, as an example, the following attributes:

listID="10164"

listAgencyID="310"

listVersionID=Version of the relevant code list.

If a customer makes changes to the assigned code list, the values assigned to the attributes change as follows:

listAgencyID—ID of the customer listVersionID—Assigned and managed by the customer listAgencySchemeID—ID of the scheme if the listAgencyID is not taken listAgencySchemeAgencyID—ID of the organization that manages the scheme of the listAgencySchemeID The GDT InspectionRuleComponentCode 35800KN is used to identify the individual components of an inspection rule. An example for customer-specific code semantics is an InspectionRuleSampleDrawingTool, which is a tool for taking samples.

An example of a code list is presented in the following table:

| Code | Name | Description |
|---|---|---|
| 1 | InspectionRuleInspectionScopeCode Inspection scope | |
| 2 | InspectionRuleInspectionDynamicModificationRuleCode | Dynamic modification rule |
| 3 | InspectionRuleInspectionDynamicModificationCriterion | Dynamic modification criterion |
| 4 | InspectionRuleQualityInspectionDecisionCodeListID | Decision code list |

-continued

| Code | Name | Description |
|---|---|---|
| 5 | InspectionRuleInspectionSampleSizeDeterminationCode | Type of determination used for the sample size |
| 6 | InspectionRuleSampleSizeNumberValue | Specified sample size |
| 7 | InspectionRuleSampleSizePercent | Sample size as a percentage of the total quantity |
| 8 | InspectionRuleSampleQuantity | Sample quantity that can be divided up into several primary or reserve samples |
| 9 | InspectionRuleSampleQuantityPercent | Sample quantity as a percentage of the total quantity |
| 10 | InspectionRuleMaximumAcceptedDefectsIntegerValue | Maximum acceptable number of nonconforming units or defects |
| 11 | InspectionRuleMaximumAcceptedDefectsPercent | Maximum acceptable percentage of nonconforming units or defects in an inspection |
| 12 | InspectionRuleSamplingSchemeCode | Sampling scheme |
| 13 | InspectionRuleInspectionLevelCode | Inspection level |
| 14 | InspectionRuleInspectionSeverityCode | Inspection severity |
| 15 | InspectionRuleAcceptableQualityLevelNumeric | Acceptable quality level |
| 16 | InspectionRuleSampleSizeQuantityCalculationRuleName | Individual rule for determining the sample size |
| 17 | InspectionRuleInspectionResultValuationTypeCode | Valuation type for the inspection result |
| 18 | InspectionRuleSubsetQualityInspectionDecisionCodeListID | List of inspection decision codes for a subset |
| 19 | InspectionRuleQualityInspectionSampleTypeCode | Sample type |
| 20 | InspectionRuleSampleDrawingProcedureUUID | Sample-drawing procedure |
| 21 | InspectionRuleSampleDrawingUnitUUID | Sample-drawing unit |
| 22 | InspectionRuleSampleQualityInspectionDecisionCodeListID | List of inspection decision codes for samples |
| 23 | InspectionRuleFindingTypeCode | Finding type |

(ssssssssssssssssssss) InspectionSampleCategoryCode

The GDT InspectionSampleCategoryCode 35800KO is the coded representation of the category of a sample in the context of an inspection. An example of the GDT InspectionSampleCategoryCode 35800KO is:

<InspectionSampleCategoryCode>1</InspectionSampleCategoryCode>

The structure of GDT InspectionSampleCategoryCode 35800KO is depicted in FIG. 358KO. The GDT InspectionSampleCategoryCode 35800KO includes attributes listversionID 35814KO, listVersionID 35830KO, listAgencySchemeID 35846KO, and listAgencySchemeAgencyID 35862KO. For the GDT InspectionSampleCategoryCode 35800KO, the Object Class term is Inspection Rule Component 35802KO, the Representation/Association term is Code 35804KO, the Type term is xsd 35806KO, the Type term is token 35808KO, the Type Name term is Code 35810KO, and the Length is from one to three 35810KO. The InspectionSampleCategoryCode 35800KO may be restricted 35812KO.

For the listVersionID 35814KO, the Category is Attribute 35816KO, the Object Class term is CodeListAgency 35818KO, the Property term is Version 35820KO, the Representation/Association term is Identifier 35822KO, the Type term is xsd 35824KO, and the Type Name term is token 35826KO. The cardinality between the listVersionID 35814KO and the GDT InspectionSampleCategoryCode 35800KO is either zero or one 35828KO.

In some implementations, one fixed code list may be assigned to the code. For example, the attributes may be as follows:

listID="10404"

listAgencyID="310"

listVersionID=Version of the relevant code list.

In the context of a material inspection, the InspectionSampleCategoryCode 35800KO can define whether a sample is a primary sample, pooled sample, or reserve sample. An example of a code list for the GDT InspectionSampleCategoryCode 35800KO is:

| Code | Name | Description |
|---|---|---|
| 1 | Primary Sample | Sample that is taken directly from the material to be examined |
| 2 | Pooled Sample | Sample that consists of a mixture of at least two primary samples |
| 3 | Reserve Sample | Sample that must be stored for a specific time period for documentation purposes |

(tttttttttttttttttttt) InspectionSeverityCode

The GDT InspectionSeverityCode 35800KP is the coded description of an inspection severity. In a sampling inspection using a sampling scheme according to DIN ISO 2859, the sample size is determined based on the inspection severity, the inspection level, and the quantity to be inspected (lot size). If the inspection is not a sampling inspection according to DIN ISO 2859, the sample size is determined directly based on the inspection severity and the quantity to be inspected (lot size). In this case, the inspection level is not taken into consideration. The inspection severity is used to adjust the sample size. A reduced inspection severity gives rise to a smaller sample size, a tightened inspection severity gives rise to a larger sample size. An example (Instance) of the GDT InspectionSeverityCode 35800KP is:

<InspectionSeverityCode>2</InspectionSeverityCode>

The structure of GDT InspectionSeverityCode 35800KP is depicted in FIG. 358KP. For the GDT InspectionSeverityCode 35800KP, the Object Class term is Inspection 35802KP, the Property term is Severity 35804KP, the Representation/Association term is Code 35806KP, the Type term is CCT 35808KP, the Type Name term is Code 35810KP, and the Length is one 35812KP. The GDT InspectionSeverityCode 35800KP may be restricted 35814KP.

The GDT InspectionSeverityCode 35800KP may include one fixed code list. Since this is a fixed code list, no attributes are needed. In some variations, the attributes contains the following values:

listID="10099"

listAgencyID="310"

listVersionID—Version of the relevant code list.

The InspectionSeverityCode 35800KP is used in the context of inspections and provides information about the inspection severity based on DIN ISO 2859. An exemplary code list is presented as follows:

| Code | Name | Description |
|---|---|---|
| 1 | Normal | Normal inspection according to ISO 2859 |
| 2 | Tightened | Tightened inspection according to ISO 2859 |
| 3 | Reduced | Reduced inspection according to ISO 2859 |

(uuuuuuuuuuuuuuuuuuuuu) AmountTolerance

A GDT AmountTolerance 35800KQ is the acceptable deviation between an expected and an actual monetary amount. An example (Instance) of the GDT AmountTolerance 35800KQ is:

```
<LowerVarianceAmountCurrencyCode="EUR">5
</LowerVarianceAmount>
<LowerVarianceAmountUnlimitedIndicator>false
</LowerVarianceAmountUnlimitedIndicator>
<UpperVarianceAmount
currencyCode="EUR">10 </UpperVarianceAmount>
<UpperVarianceAmountUnlimitedIndicator>false
</UpperVarianceAmountUnlimitedIndicator>
<LowerVariancePercent>3.5</LowerVariancePercent>
<UpperVariancePercent>4</UpperVariancePercent>
<UpperVariancePercentUnlimitedIndicator>false
</UpperVariancePercentUnlimitedIndicator>
</AmountTolerance>
```

The structure of the GDT AmountTolerance 35800KQ is depicted in FIG. 358KQ. The GDT AmountTolerance 35800KQ includes a Lower Variance Amount 35806KQ, a Lower Variance Amount Unlimited indicator 35822KQ, an Upper Variance Amount 35838KQ, and an Upper Variance Amount Unlimited Indicator 35854KQ, and a Lower Variance Percent 35870KQ. For the GDT AmountTolerance 35800KQ, the Object Class term is Amount Tolerance 35802KQ and the Representation/Association term is Details 35804KQ.

For the Lower Variance Amount 35806KQ, the Category is Element 35806KQ, the Object Class term is Amount Tolerance 35810KQ, the Property Qualifier term is Lower 35812KQ, the Property term is Variance 35814KQ, the Representation/Association Qualifier term is Amount 35816KQ, the Type term is GDT 35818KQ, and the Type Name term is Amount 35820KQ. The cardinality between the Lower Variance Amount 35806KQ and the GDT AmountTolerance 35800KQ is either zero or one 35821KQ.

For the Lower Variance Amount Unlimited indicator 35822KQ, the Category is Element 35824KQ, the Object Class term is Amount Tolerance 35826KQ, the Property Qualifier term is Lower Variance Amount 35828KQ, the Property term is Unlimited 35830KQ, the Representation/Association Qualifier term is Indicator 35832KQ, the Type term is GDT 35834KQ, and the Type Name term is Indicator 35836KQ. The cardinality between the Lower Variance Amount Unlimited indicator 35822KQ and the GDT AmountTolerance 35800KQ is either zero or one 35837KQ.

For the Upper Variance Amount 35838KQ, the Category is Element 35840KQ, the Object Class term is Amount Tolerance 35842KQ, the Property Qualifier term is Upper 35844KQ, the Property term is Variance 35846KQ, the Representation/Association Qualifier term is Amount 35848KQ, the Type term is GDT 35850KQ, and the Type Name term is Amount 35852KQ. The cardinality between the Upper Variance Amount 35838KQ and the GDT AmountTolerance 35800KQ is either zero or one 35853KQ.

For the Upper Variance Amount Unlimited Indicator 35854KQ, the Category is Element 35856KQ, the Object Class term is Amount Tolerance 35858KQ, the Property Qualifier term is Upper Variance Amount 35860KQ, the Property term is Unlimited 35862KQ, the Representation/Association Qualifier term is Indicator 35864KQ, the Type term is GDT 35866KQ, and the Type Name term is Indicator 35868KQ. The cardinality between the Upper Variance Amount Unlimited Indicator 35854KQ and the GDT AmountTolerance 35800KQ is either zero or one 35869KQ.

For the Lower Variance Percent 35870KQ, the Category is Element 35872KQ, the Object Class term is Amount Tolerance 35874KQ, the Property Qualifier term is Lower 35876KQ, the Property term is Variance 35878KQ, the Representation/Association Qualifier term is Percent 35880KQ, the Type term is GDT 35882KQ, and the Type Name term is Percent 35884KQ. The cardinality between the Lower Variance Percent 35870KQ and the GDT AmountTolerance 35800KQ is either zero or one 35886KQ.

In some variations, the LowerVarianceAmount specifies a value x, which means that an amount y is accepted if y is less than z minus x. For example, in a purchase order, an item worth 50€ is ordered, in which the LowerVarianceAmount is set at 10, and the currency is set to Euro, so a purchase order confirmation will only be accepted if the entered value is at least 40€ (in relation to LowerVarianceAmount). The LowerVarianceAmountUnlimitedIndicator indicates that amount y must be well below expected amount z. The UpperVarianceAmount specifies a value x, which means that an amount y is accepted if y is more than z minus x. For example, in a purchase order, an item worth 50€ is ordered, in which the UpperVarianceAmount is set at 5, and the currency is set to Euro, so a purchase order confirmation will only be accepted if the entered value is at least 55€ (in relation to UpperVarianceAmount). The UpperVarianceAmountUnlimitedIndicator indicates that amount y must be well above expected amount z. The LowerVariancePercent specifies a value x, which means that an amount y is accepted if y is less than z minus x percent. For example, in a purchase order, an item worth 50€ is ordered, in which the LowerVariancePercent is set at 10, and the currency is set to Euro, so a purchase order confirmation will only be accepted if the entered value is at least 45€ (in relation to LowerVariancePercent ). The UpperVariancePercent specifies a value x in this means that amount y is accepted if y is more than z minus x percent. For example, in a purchase order, an item worth 50€ is ordered, in which the UpperVariancePercent is set at 5, and the currency is set to Euro, so a purchase order confirmation will only be accepted if the entered value is at least 52.50€ (in relation to UpperVariancePercent). The UpperVariancePercentUnlimitedIndicator indicates that amount y as a percentage must be well above expected amount z In some implementations, variances (based on amount or percentage) are not affected by sign (plus or minus), which is why negative amounts or percentages are not allowed. The maximum value for LowerVariancePercent allowed is 100 since the threshold value of an amount can not be more than 100%. Additionally, there may be unlimited indicators that are not specified will be interpreted as 'false'. The indicators have priority over eventual maintained values, that means that if UpperVarianceAmountUnlimitedIndicator has the value true, then the value of the attribute UpperVarianceAmount will not be evaluated (this applies for the other unlimited indicators as well).

In some variations, if no absolute or percentage value for the variance upwards or downwards is entered, then the relevant variance is not allowed. If an absolute or percentage value for an upwards or downwards variation is maintained, then both values are consulted for verification of the variance (this involves a AND relationship of the absolute and percentage conditions). If only one absolute value or only one percentage value for the upwards or downwards variance is maintained (the respective other value is '0'), then only the values differing from null are consulted for verification (in this case, the value '0' is interpreted as user-defined).

The GDT AmountTolerance 35800KQ is used in business documents, for example to determine if specified value of goods in the vendor order confirmation are accepted or not, based on the specified value in the order. In the above example, the AmountTolerance 35800KQ can be assigned by a buyer—this is equal to an authorization that the buyer can accept variances up to the entered variances for AmountTolerance 35800KQ—or assigned by a vendor—in this case it is a type of control function that variances outside of the AmountTolerance 35800KQ are not accepted.

(vvvvvvvvvvvvvvvvvvvvv) InspectionSubsetID

The GDT InspectionSubsetID 35800KR is the unique identification of a subset in the context of an inspection. An example (Instance) of the GDT InspectionSubsetID 35800KQ is:

<InspectionSubsetID>Subset0001</InspectionSubsetID>

The structure of GDT InspectionSubsetID 35800KR is depicted in FIG. 358KR. The GDT InspectionSubsetID 35800KR includes attributes SchemeID 35816KR and SchemeAgencyID 35834KR. For the GDT InspectionSubsetID 35800KR, the Object Class term is Inspection Subset 35802KR, the Property term is Identification 35804KR, the Representation/Association term is Identifier 35806KR, the Type term is CCT 35808KR, the Type Name term is Identifier 35810KR, and the Length is from one to fifteen 35812KR. The GDT InspectionSubsetID 35800KR may be restricted 35814KR.

For the SchemeID 35816KR, the category is attribute 35818KR, the Object Class is Identification Scheme 35820KR, the Property term is Identification 35822KR, the Representation/Association term is Identifier 35824KR, the Type term is xsd 35826KR, the Type Name term is token 35828KR, and the Length is from one to sixty 35830KR. The cardinality between the SchemeID 35816KR and the GDT InspectionSubsetID 35800ID is either zero or one 35832KR.

For the SchemeAgencyID 35834KR, the category is attribute 35836KR, the Object Class is Identification Scheme Agency 35838KR, the Property term is Identification 35840KR, the Representation/Association term is Identifier 35842KR, the Type term is xsd 35844KR, the Type Name term is token 358646KR, and the Length is from one to sixty 35848KR. The cardinality between the SchemeAgencyID 35834KR and the GDT InspectionSubsetID 35800ID is either zero or one 35850KR.

In some variations, the attributes of the InspectionSubsetID 35800KR are filled as follows:

schemeID=InspectionSubset<Qualifier>ID schemeAgencyID: Business system in which the identifier was assigned.

In the context of, for example, a material inspection, the InspectionSubsetID 35800KR can be used to identify a subset of the material that is to be inspected.

(wwwwwwwwwwwwwwwwwwwww) InspectionTypeCode

The GDT InspectionTypeCode 35800KS is the coded representation of the type of an inspection. An example of the InspectionTypeCode 35800KS is:

<InspectionTypeCode>1</InspectionTypeCode>

The structure of GDT InspectionTypeCode 35800KS is depicted in FIG. 358KS. The GDT InspectionTypeCode 35800KS includes attributes listAgencyID 35814KS, listVersionID 35830KS, listAgencySchemeID 35846KS, and listAgencySchemeAgencyID 35862KS. For the GDT InspectionTypeCode 35800KS, the Object Class term is Inspection Type 35802KS, the Representation/Association term is Code 35804KS, the Type term is xsd 35806KS, the Type term is token 35808KS, the Type Name term is Code 35810KS, and the Length is from one to four 35810KS. The InspectionTypeCode 35800KS may be restricted 35812KS.

For the listAgencyID 35814KS, the Category is Attribute 35816KS, the Object Class term is CodeListAgency 35818KS, the Property term is Identification 35820KS, the Representation/Association term is Identifier 35822KS, the Type term is xsd 35824KS, and the Type Name term is token 35826KS. The cardinality between the listAgencyID 35814KS and the GDT InspectionTypeCode 35800KS is either zero or one 35828KS.

For the listVersionID 35830KS, the Category is Attribute 35832KS, the Object Class term is CodeList 35834KS, the Property term is Version 35836KS, the Representation/Association term is Identifier 35838KS, the Type term is xsd 35840KS, and the Type Name term is token 35842KS. The cardinality between the listVersionID 35830KS and the GDT InspectionTypeCode 35800KS is either zero or one 35844KS.

For the listAgencySchemeID 35846KS, the Category is Attribute 35848KS, the Object Class term is CodeListAgency 35850KS, the Property term is Scheme 35852KS, the Representation/Association term is Identifier 35854KS, the Type term is xsd 35856KS, and the Type Name term is token 35858KS. The cardinality between the listAgencySchemeID 35862KS and the GDT InspectionTypeCode 35800KS is either zero or one 35860KS.

For the listAgencySchemeAgencyID 35862KS, the Category is Attribute 35864KS, the Object Class term is CodeListAgency 35866KS, the Property term is Scheme 35868KS, the Representation/Association term is Identifier 35870KS, the Type term is xsd 35872KS, and the Type Name term is token 35874KS. The cardinality between the listAgencySchemeAgencyID 35862KS and the GDT InspectionTypeCode 35800KS is either zero or one 35876KS.

The type of an inspection defines the process and the object for which inspection documents can be created. This type could, for example, describe a material inspection in the goods receipt process. It is the central controlling element of the inspection.

In some variations, an extendable code list may be assigned to the code. Customers may replace the assigned code lists with their own code list. In its unchanged state, the assigned code list has the following attributes:

listID="10407"

listAgencyID="310"

listVersionID=Version of the relevant code list.

If a customer creates a code list, the attributes change as follows:

listAgencyID—ID of the customer listVersionID—Assigned and managed by the customer listAgencySchemeID—ID of the scheme listAgencySchemeAgencyID—ID of the organization that manages the scheme of the listAgencySchemeID As an example, an assigned code list and its values can be:

| Code | Name | Description |
|---|---|---|
| 1 | Goods Receipt Inspection | Material inspection in goods receipt process |
| 2 | Returns Inspection | Inspection of material that a customer has complained about and that has been returned |

(xxxxxxxxxxxxxxxxxxxxx) BusinessPartnerID

A GDT BusinessPartnerID 35800KT is a unique identifier for a business partner. A business party is a person, organization, or group of people/organizations in which a company has a business interest. An example (Instance) of the GDT BusinessPartnerID 35800KT is:

<BusinessPartnerID>065055766</BusinessPartnerID>

The structure of GDT BusinessPartnerID 35800KT is depicted in FIG. 358KT. For the GDT BusinessPartnerID 35800KT, the Object Class term is Business Partner 35802KT, the Property term is Identification 35804KT, the Representation/Association term is Code 35806KT, the Type term is CCT 35808KT, the Type Name term is Identification 35810KT, and the Length is from one to sixty 35812KT. The GDT BusinessPartnerID 35800KT may be restricted 35814KT.

In some variations, the GDT BusinessPartnerID 35800KT may be used to represent an alternative business partner number. This GDT may not be used in messages. In message, the GDT PartyID may be used instead. When mapping from BusinessPartnerID 35800KT to PartyID the attributes are transferred 1:1. The contents of the scheme attributes are determined by the type of alternative business partner number (see GDT PartyIDTypeCode). If, for example, the alternative business partner number is a DUNS, the values would be as follows:

| | |
|---|---|
| SchemeID | "DUNS" |
| SchemeAgencyID | "16" |

(yyyyyyyyyyyyyyyyyyyyy) BusinessPartnerInternalID

A GDT BusinessPartnerInternalID 35800KU is a person, organization, or group of people/organizations in which a company has a business interest. An example (Instance) of the GDT BusinessPartnerInternalID 35800KU is:

<BusinessPartnerInternalID>12345</BusinessPartnerInternalID>

The structure of GDT BusinessPartnerInternalID 35800KU is depicted in FIG. 358KU. For the GDT BusinessPartnerInternalID 35800KU, the Object Class term is Business Partner 35802KU, the Qualifier Property term is Internal 35804KU, the Property term is Identification 35806KU, the Representation/Association term is Identifier 35808KU, the Type term is GDT 35810KU, the Type Name term is BusinessPartnerID 35812KU, and the Length is from one to ten 35814KU. The GDT BusinessPartnerInternalID 35800KU may be restricted 35816KU.

In some variationst, the GDT BusinessPartnerInternalID cab be used to map the 10-character SAP-owned business partner numbers. This GDT may not be used in messages. The GDT PartyInternalID or PartyID may be instead. The scheme attributes have the following values:

| Map to PartyInternalID | |
|---|---|
| SchemeID | "PartyID" |
| SchemeAgencyID | Business system in which the indicator was assigned. |
| **Map to PartyID** | |
| SchemeID | "PartyID" |
| SchemeAgencyID | Business system in which the indicator was assigned. |
| schemeAgencyschemeAgencyID | "ZZZ" |

(zzzzzzzzzzzzzzzzzzzzz) BusinessPartnerPartnerGroupTypeCode

A GDT BusinessPartnerPartnerGroupTypeCode 35800KV is the code indicating the type of partner group that occurs as a business partner. By party group we mean persons or organizations that have merged. This merger can be the result of a common purpose or the occurrence of an event. Partner groups are mapped as business partners of the category group (GDTBusinessPartnerCategoryCode). An example (Instance) of the GDT BusinessPartnerPartnerGroupTypeCode 35800KV is:

<BusinessPartnerPartnerGroupTypeCode>1234 </BusinessPartnerPartnerGroupTypeCode>

The GDT BusinessPartnerPartnerGroupTypeCode 35800KV is depicted in FIG. 358KV. The GDT BusinessPartnerPartnerGroupTypeCode 35800KV include a listVersionID 35816KV, a listAgencyID 35832KV, a listAgencySchemeID 35848KV, and a listAgencySchemeAgencyID 358064KV. For the GDT BusinessPartnerPartnerGroupTypeCode 35800KV, the object class term is BusinessPartner 35802KV, the Property Term is PartnerGroup 35804KV, the Property term is 35806KV, the Representation/Association term is Code 35808KV, the Type term is CCT 35810KV, the Type Name term is Code 35812KV, and the Length is from one to four 35814KV. The GDT BusinessPartnerPartnerGroupTypeCode 35800KV may be a restricted GDT 35815KV.

For the listVersionID 35816KV, the Category is Attribute 35818KV, the Object Class term is CodeList 35820KV, the Property term is Version 35822KV, the Representation/Association term is Identifier 35824KV, the Type term is xsd 35826KV, and the Type Name term is token 35828KV. The cardinality between the listVersionID 35816KV and the GDT BusinessPartnerPartnerGroupTypeCode 35800KV is either zero or one 35830KV.

For the listAgencyID 35832KV, the Category is Attribute 35834KV, the Object Class term is CodeListAgency 35836KV, the Property term is Identification 35838KV, the Representation/Association term is Identifier 35840KV, the Type term is xsd 35842KV, and the Type Name term is token 35844KV. The Cardinality between the listAgencyID 35832KV and the GDT ProductUsageCode 35800KV is either zero or one 35846KV.

For the listVersionID 35848KV, the Category is Attribute 35850KV, the Object Class term is CodeList 35852KV, the Property term is Version 35854KV, the Representation/Association term is Identifier 35856KV, the Type term is xsd 35858KV, and the Type Name term is token 35860KV. The cardinality between the listVersionID 35848KV and the GDT ProductUsageCode 35800KV is either zero or one 35862KV.

For the listAgencySchemeID 35864KV, the Category is Attribute 35866KV, the Object Class term is CodeListAgency 35868KV, the Property term is Scheme 35870KV, the Representation/Association term is Identifier 35872KV, the Type term is xsd 35874KV, and the Type Name term is token 35876KV. The cardinality between the listAgencySchemeID 35864KV and the GDT ProductUsageCode 35800KV is either zero or one 35878KV.

For the listAgencySchemeAgencyID 35880KV, the Category is Attribute 35882KV, the Object Class term is CodeListAgency 35884KV, the Property term is SchemeAgency 35886KV, the Representation/Association term is Identifier 35888KV, the Type term is xsd 35890KV, and the Type Name term is token 35892KV. The cardinality between the listAgencySchemeAgencyID 35880KV and the GDT ProductUsageCode 35800KV is either zero or one 35894KV.

In some variations, the BusinessPartnerPartnerGroupTypeCode 35800KV may be a customer-specific code list. For example, the attributes may be used as follows:

listID="10092"

listAgencyID—The ID of the customer.

listVersionID—Version of the relevant code list.

listAgencySchemeID—The ID of the scheme by which the customer listed in the listAgencyID is identified. This may be a particular identification scheme for partners, businesses, and members (such as DUNS+4) and so on, from an administering organization (such as EAN, DUNS and SWIFT) that is listed in the ListAgencySchemeAgency ID.

ListAgencySchemeAgencyID—the ID of the administering organization (such as DUNS, EAN or SWIFT) that is responsible for identifying the organization listed in the ListAgencyID.

In one example, a possible semantics for codes is Household, which is the partner group would be the persons living in a household. In another example, a possible semantics for codes is Joint heirship, which is the partner group would be the members of a joint heirship.

(aaaaaaaaaaaaaaaaaaaaa) LiquidityItemBusinessTransactionDocumentStatusCategoryCode The GDT LiquidityItemBusinessTransactionDocumentStatusCategoryCode 35800KX is the coded representation of the category of a liquidity item depending on the status of the base document in a business transaction. Liquidity forecast items are realized or expected cash flows of a company on which one or more (aggregation) operational business processes are based. The LiquidityItemBusinessTransactionDocumentStatusCategory represents the classification of liquidity forecast items regarding the status of the base document in a business transaction. An example of the GDT LiquidityItemBusinessTransactionDocumentStatusCategoryCode 35800KX is:

<LiquidityItemBusinessTransactionDocumentStatusCategoryCode>1</LiquidityItemBusinessTransactionDocumentStatusCategoryCode>

The structure of GDT LiquidityItemBusinessTransactionDocumentStatusCategoryCode 35800KX is depicted in FIG. 358KX. The GDT LiquidityItemBusinessTransactionDocumentStatusCategoryCode 35800KX includes attributes listAgencyID 35814KX, listVersionID 35830KX, listAgencySchemeID 35846KX, and listAgencySchemeAgencyID 35862KX. For the GDT LiquidityItemBusinessTransactionDocumentStatusCategoryCode 35800KX, the Object Class term is Liquidity Item 35802KX, the Representation/Association term is Business Transaction Document Status Category 35804KX, the Type term is xsd 35806KX, the Type term is token 35808KX, the Type Name term is Code 35810KX, and the Length is from one to three 35810KX. The LiquidityItemBusinessTransactionDocumentStatusCategoryCode 35800KX may be restricted 35812KX.

For the listAgencyID 35814KX, the Category is Attribute 35816KX, the Object Class term is CodeListAgency 35818KX, the Property term is Identification 35820KX, the Representation/Association term is Identifier 35822KX, the Type term is xsd 35824KX, and the Type Name term is token 35826KX. The cardinality between the listAgencyID 35814KX and the GDT LiquidityItemBusinessTransactionDocumentStatusCategoryCode 35800KX is either zero or one 35828KX.

For the listVersionID 35830KX, the Category is Attribute 35832KX, the Object Class term is CodeList 35834KX, the Property term is Version 35836KX, the Representation/Association term is Identifier 35838KX, the Type term is xsd 35840KX, and the Type Name term is token 35842KX. The cardinality between the listVersionID 35830KX and the GDT LiquidityItemBusinessTransactionDocumentStatusCategoryCode 35800KX is either zero or one 35844KX.

For the listAgencySchemeID 35846KX, the Category is Attribute 35848KX, the Object Class term is CodeListAgency 35850KX, the Property term is Scheme 35852KX, the Representation/Association term is Identifier 35854KX, the Type term is xsd 35856KX, and the Type Name term is token 35858KX. The cardinality between the listAgencySchemeID 35862KX and the GDT LiquidityItemBusinessTransactionDocumentStatusCategoryCode 35800KX is either zero or one 35860KX.

For the listAgencySchemeAgencyID 35862KX, the Category is Attribute 35864KX, the Object Class term is CodeListAgency 35866KX, the Property term is Scheme 35868KX, the Representation/Association term is Identifier 35870KX, the Type term is xsd 35872KX, and the Type Name term is token 35874KX. The cardinality between the listAgencySchemeAgencyID 35862KX and the GDT LiquidityItemBusinessTransactionDocumentStatusCategoryCode 35800KX is either zero or one 35876KX.

In some variations, an extendable code list may be assigned to the GDT LiquidityItemBusinessTransactionDocumentStatusCategoryCode 35800KX. In some variations, customers can change this code list. In its unchanged state, the SAP code list has the following attributes:

listID=10289 listAgencyID="310"

listVersionID=Version of the relevant code list.

If a customer makes changes to the assigned code list, the values assigned to the attributes change as follows:

listAgencyID—ID of the SAP customer listVersionID—Assigned and managed by the customer listAgencySchemeID—ID of the scheme listAgencySchemeAgencyID—ID of the organization that manages the scheme of the listAgencySchemeID In some variations, the GDT LiquidityItemBusinessTransactionDocumentStatusCategoryCode 35800KX can be used to classify liquidity forecast items using the status of the base business transaction document (business object). In one example, a sales order can be blocked because of doubts about the creditworthiness of the customer. In another example, a vendor invoice can be blocked because a smaller quantity than agreed has been delivered. The status of both business transaction documents (business object) named can be classified in the GDT LiquidityItemBusinessTransactionDocumentStatusCategoryCode 35800KX.

Some examples of customer-specific code semantics are "unclear," meaning business transactions where it is unclear when and whether they will be continued in the value chain, and "dispute," meaning a purchase order where the credit card authorization failed.

An exemplary code list and its values are provided is:

| Code | Name | Description |
|---|---|---|
| 1 | Standard | The base process object is in standard processing |
| 2 | Blocked | The base process object has been blocked (such as payment block) |
| 3 | To be released | The base process object is waiting to be released |
| 4 | Confirmed | The base process object has been confirmed finally |
| 5 | In Transfer | The base process object is waiting to be transferred (such as between presenting a bank transfer at the bank and debiting the bank account) |
| 6 | Planned | The base process object has been planned |

(bbbbbbbbbbbbbbbbbbbbb) LiquidityItemGroupCode

The GDT LiquidityItemGroupCode 35800KY is the coded representation of a group of liquidity items mapped according to business criteria. Liquidity items are realized or expected cash flows of a company on which one or more (aggregation) operational business processes are based. An example of the GDT LiquidityItemGroupCode 35800KY is:

<LiquidityItemGroupCode>1</LiquidityItemGroupCode>

The GDT LiquidityItemBusinessTransactionDocumentStatusCategoryCode 35800KX is the coded representation of the category of a liquidity item depending on the status of the base document in a business transaction. Liquidity forecast items are realized or expected cash flows of a company on which one or more (aggregation) operational business processes are based. The LiquidityItemBusinessTransactionDocumentStatusCategory represents the classification of liquidity forecast items regarding the status of the base document in a business transaction. An example of the GDT LiquidityItemBusinessTransactionDocumentStatusCategoryCode 35800KX is:

<LiquidityItemBusinessTransactionDocumentStatusCategoryCode>1</LiquidityItemBusinessTransactionDocumentStatusCategoryCode>

The structure of GDT LiquidityItemGroupCode 35800KY is depicted in FIG. 358KY. The GDT LiquidityItemGroupCode 35800KY includes attributes listAgencyID 35814KY, listVersionID 35830KY, listAgencySchemeID 35846KY, and listAgencySchemeAgencyID 35862KY. For the GDT LiquidityItemGroupCode 35800KY, the Object Class term is Liquidity Item Group 35802KY, the Representation/Association term is Business Transaction Document Status Category 35804KY, the Type term is xsd 35806KY, the Type term is token 35808KY, the Type Name term is Code 35810KY, and the Length is from one to four 35810KY. The LiquidityItemGroupCode 35800KY may be restricted 35812KY.

For the listAgencyID 35814KY, the Category is Attribute 35816KY, the Object Class term is CodeListAgency 35818KY, the Property term is Identification 35820KY, the Representation/Association term is Identifier 35822KY, the Type term is xsd 35824KY, and the Type Name term is token 35826KY. The cardinality between the listAgencyID 35814KY and the GDT LiquidityItemGroupCode 35800KY is either zero or one 35828KY.

For the listVersionID 35830KY, the Category is Attribute 35832KY, the Object Class term is CodeList 35834KY, the Property term is Version 35836KY, the Representation/Association term is Identifier 35838KY, the Type term is xsd 35840KY, and the Type Name term is token 35842KY. The cardinality between the listVersionID 35830KY and the GDT LiquidityItemGroupCode 35800KY is either zero or one 35844KY.

For the listAgencySchemeID 35846KY, the Category is Attribute 35848KY, the Object Class term is CodeListAgency 35850KY, the Property term is Scheme 35852KY, the Representation/Association term is Identifier 35854KY, the Type term is xsd 35856KY, and the Type Name term is token 35858KY. The cardinality between the listAgencySchemeID 35862KY and the GDT LiquidityItemGroupCode 35800KY is either zero or one 35860KY.

For the listAgencySchemeAgencyID 35862KY, the Category is Attribute 35864KY, the Object Class term is CodeListAgency 35866KY, the Property term is Scheme 35868KY, the Representation/Association term is Identifier 35870KY, the Type term is xsd 35872KY, and the Type Name term is token 35874KY. The cardinality between the listAgencySchemeAgencyID 35862KY and the GDT LiquidityItemGroupCode 35800KY is either zero or one 35876KY.

In some variations, an extendable code list may be assigned to the GDT LiquidityItemGroupCode 35800KY. In some implementations, customers can change this code list. In its unchanged state, the assigned code list has the following attributes:

listID=10290 listAgencyID="310"

listVersionID=Version of the relevant code list.

If a customer makes changes to the assigned code list, the values assigned to the attributes change as follows:

listAgencyID—ID of the SAP customer listVersionID—Assigned and managed by the customer listAgencySchemeID—ID of the scheme listAgencySchemeAgencyID—ID of the organization that manages the scheme of the listAgencySchemeID The GDT LiquidityItemGroupCode 35800KY is used to group liquidity items using relevant business criteria that the customer can define. In some implementations, a LiquidityItem is in exactly one group.

An example for customer-specific code semantics is Kerosene. The material kerosene is the most important item in the purchasing process for an airline. The time-based fluctuations in price are much greater than the differences between different vendors. For this reason, the category "kerosene" could be much more important for liquidity analyses than the categorization by vendors (such as domestic vendors, foreign vendors).

An exemplary assigned code list and its values are:

| Code | Name | Description |
|---|---|---|
| 1 | Vendors | Grouping of liquidity items by vendors |
| 2 | Domestic vendors | Grouping of liquidity items by vendors with headquarters at home |
| 3 | Foreign vendors | Grouping of liquidity items by vendors with headquarters abroad |
| 4 | Vendors: Affiliated Company | Grouping of liquidity items by vendors that are affiliated with the company |
| 5 | Customers | Grouping of liquidity items by customers |

-continued

| Code | Name | Description |
|---|---|---|
| 6 | Domestic customers | Grouping of liquidity items by domestic customers |
| 7 | Foreign customers | Grouping of liquidity items by foreign customers |
| 8 | Customers: Affiliated Company | Grouping of liquidity items by customers that are affiliated with the company |
| 9 | Domestic banks | Grouping of liquidity items by banks with headquarters at home |
| 10 | Foreign banks | Grouping of liquidity items by banks with headquarters abroad |

(cccccccccccccccccccccc) BusinessPartnerPaymentCardDetailsID

A GDT BusinessPartnerPaymentCardDetailsID 35800KZ is a unique identifier for the business partner payment card details. PaymentCardDetails contain the relationship of business partner with a payment or credit card. Such a relationship includes a payment card and other details that describe the significance of the payment card for the business partner. An example (Instance) of the GDT BusinessPartnerPaymentCardDetailsID 35800KZ is:

<BusinessPartnerPaymentCardDetailsID>123456</BusinessPartnerPaymentCardDetailsID>

The structure of GDT BusinessPartnerPaymentCardDetailsID 35800KZ is depicted in FIG. 358KZ. For the GDT BusinessPartnerPaymentCardDetailsID 35800KZ, the Object Class term is Business Partner Payment Card Details 35802KZ, the Property term is Identification 35804KZ, the Representation/Association term is Identifier 35806KZ, the Type term is CCT 35808KZ, the Type Name term is Identifier 35810KZ, and the Length is from one to six 35812KZ. The GDT BusinessPartnerPaymentCardDetailsID 35800KZ may be restricted 35814KZ.

In some variations, the GDT BusinessPartnerPaymentCardDetailsID 35800LZ can be used to identify the payment card details of a business partner.

(dddddddddddddddddddddd) LockModeCode

A GDT LockModeCode 35800LA is a coded representation of mode of an object lock. For example, locks protect data in different modes (as shared or exclusive locks) from simultaneous access by multiple users. An example of GDT LockModeCode 35800LA is:

<LockModeCode>1</LockModeCode>

The structure of GDT LockModeCode 35800LA is depicted in FIG. 358LA. For the GDT LockModeCode 35800LA, the Property is Lock Mode 35806LA, the Representation/Association is Code 35808LA, the Type is CCT 35810LA, the Type Name is Code 35812LA, and the Length is one 35814LA. The remark 35818LA shows that the GDT LockModeCode 35800LA may be restricted.

A particular fixed code list is assigned to the LockModeCode. The attributes have the following values: listID=10243, listAgencyID=310. The code list and its values are presented in the "Appendix—Code List".

The LockModeCode defines whether a lock is a shared or an exclusive lock. A shared lock allows other users to set additional shared locks but no concur-rent exclusive locks for the locked data. An exclusive lock, by contrast, locks an object exclusively and thus prevents other users from setting additional shared or exclusive locks for the locked data.

The data type GDT LockModeCode 35800LA may use the following codes: 1 (i.e., a shared lock prevents other users from setting an exclusive lock to change the object for the duration of the shared lock. Additional shared locks, however, are allowed), 2 (i.e., an exclusive lock locks an object exclusively for one user. Other users can set neither shared nor exclusive locks for that object).

(eeeeeeeeeeeeeeeeeeeeee) LogisticPackageContentTypeCode

A GDT LogisticPackageContentTypeCode 35800LB is a coded representation of the type of the content of a logistic package. An example of GDT LogisticPackageContentTypeCode 35800LB is:

<LogisticPackageContentTypeCode>1</LogisticPackageContentTypeCode>

The structure of GDT LogisticPackageContentTypeCode 35800LB is depicted in FIG. 358LB. For the GDT LogisticPackageContentTypeCode 35800LB, the Object Class is LogisticPackageContent 35804LB, the Property is Type 35806LB, the Representation/Association is Code 35808LB, the Type is CCT 35810LB, the Type Name is Code 35812LB, and the Length is from one to two 35814LB. The remark 35818LB shows that the GDT LogisticPackageContentTypeCode 35800LB may be restricted.

The LogisticPackageContentTypeCode is a codelist with the implicitly given attributes listID="10089", and listAgencyID="310". The data type GDT LogisticPackageContentTypeCode 35800LB may use the following codes: 1 (i.e., the content of the logistic package is a material), 2 (i.e., the content of the logistic package is a logistic unit.

(ffffffffffffffffffffff) LogisticsDeviationReasonCode

A GDT LogisticsDeviationReasonCode 35800LC is a coded representation of the reason for a deviation between the result of a logistics process and the expected result. An example of GDT LogisticsDeviationReasonCode 35800LC is:

<LogisticsDeviationReasonCode>1</LogisticsDeviationReasonCode>

The structure of GDT LogisticsDeviationReasonCode 35800LC is depicted in FIG. 358LC. For the GDT LogisticsDeviationReasonCode 35800LC, the Object Class is LogisticsDeviation 35802LC, the Property is Reason 35803LC, the Representation/Association is Code 35804LC, the Type is CCT 35805LC, the Type Name is Code 35806LC, and the Length is from one to three 35807LC. The remark 35809LC shows that the GDT LogisticsDeviationReasonCode 35800LC may be restricted.

For the ListAgencyID 35811LC, the Category is Attribute (A) 35812LC, the Object Class is CodeListAgency 35813LC, the Property is Identification 35814LC, the Representation/Association is Identifier 35815LC, the Type is XSD 35816LC, the Type Name is Token 35817LC, and the Cardinality is zero or one 35818LC.

For the ListVersionID 35821LC, the Category is Attribute (A) 35822LC, the Object Class is CodeList 35823LC, the Property is Version 35824LC, the Representation/Association is Identifier 35825LC, the Type is XSD 35826LC, the Type Name is Token 35827LC, and the Cardinality is zero or one 35828LC.

For the ListAgency-SchemeID 35831 LC, the Category is Attribute (A) 35832LC, the Object Class is CodeListAgency 35833LC, the Property is Scheme 35834LC, the Representation/Association is Identifier 35835LC, the Type is XSD 35836LC, the Type Name is Token 35837LC, and the Cardinality is zero or one 35838LC.

For the ListAgency-SchemeAgencyID 35841LC, the Category is Attribute (A) 35842LC, the Object Class is CodeListAgency 35843LC, the Property is SchemeAgency 35844LC, the Representation/Association is Identifier 35845LC, the Type is XSD 35846LC, the Type Name is Token 35847LC, and the Cardinality is zero or one 35848LC.

A customer-specific code list is assigned to the code and the determines the codes in the code list. The LogisticsDeviationReasonCodeSomethingName 35800LCNN is used to document the reason for a difference between expected and actual data reported in a logistics process (for example, in a production or a site logistics process). The deviation reason may trigger a follow up action to resolve the problem that caused the deviation. For example, a logistics deviation reason could be: Blocked Bin—Deviation is caused by a bin that cannot be accessed, or Damaged Material—Deviation is caused by a damaged material.

(gggggggggggggggggggggg) LogisticsPlanningDetailLevelCode

A GDT LogisticsPlanningDetailLevelCode 35800LD is a coded representation of the level of detail for planning in logistics. An example of GDT LogisticsPlanningDetailLevelCode 35800LD is:

<LogisticsPlanningDetailLevelCode>1</LogisticsPlanningDetailLevelCode>

The structure of GDT LogisticsPlanningDetailLevelCode 35800LD is depicted in FIG. 358LD. For the GDT LogisticsPlanningDetailLevelCode 35800LD, the Object Class is Logistics Planning 35804LD, the Property is Detail Level 35806LD, the Representation/Association is Code 35808LD, the Type is CCT 35810LD, the Type Name is Code 35812LD, and the Length is one 35814LD. The remark 35818LD shows that the GDT LogisticsPlanningDetailLevelCode 35800LD may be restricted.

A fixed code list has been assigned to the code. The attributes are as follows: listID="10276", listAgencyID="310". The code list and its values are provided in the "Appendix—Code List." The data type GDT LogisticsPlanningDetailLevelCode 35800LD may use the following codes: 1 (i.e., Low level of detail).

(hhhhhhhhhhhhhhhhhhhhhh) MailNonDeliveryReasonCode

A GDT MailNonDeliveryReasonCode 35800LE is a coded representation why a postal item could not be delivered. An example of GDT MailNonDeliveryReasonCode 35800LE is:

<MailNonDeliveryReasonCode>0001</MailNonDeliveryReasonCode>

The structure of GDT MailNonDeliveryReasonCode 35800LE is depicted in FIG. 358LE. For the GDT MailNonDeliveryReasonCode 35800LE, the Object Class is Address 35802LE, the Property is Mail Non Delivery Reason 35803LE, the Representation/Association is Code 35804LE, the Type is CCT 35805LE, the Type Name is Code 35806LE, and the Length is from one to four 35807LE. The remark 35809LE shows that the GDT MailNonDeliveryReasonCode 35800LE may be restricted.

For the ListAgencyID 35811LE, the Category is Attribute (A) 35812LE, the Object Class is CodeListAgency 35813LE, the Property is Identification 35814LE, the Representation/Association is Identifier 35815LE, the Type is XSD 35816LE, the Type Name is Token 35817LE, and the Cardinality is zero or one 35818LE.

For the ListVersionID 35821LE, the Category is Attribute (A) 35822LE, the Object Class is CodeList 35823LE, the Property is Version 35824LE, the Representation/Association is Identifier 35825LE, the Type is XSD 35826LE, the Type Name is Token 35827LE, and the Cardinality is zero or one 35828LE.

For the ListAgency-SchemeID 35831LE, the Category is Attribute (A) 35832LE, the Object Class is CodeListAgency 35833LE, the Property is Scheme 35834LE, the Representation/Association is Identifier 35835LE, the Type is XSD 35836LE, the Type Name is Token 35837LE, and the Cardinality is zero or one 35838LE.

For the ListAgency-SchemeAgencyID 35841LE, the Category is Attribute (A) 35842LE, the Object Class is CodeListAgency 35843LE, the Property is SchemeAgency 35844LE, the Representation/Association is Identifier 35845LE, the Type is XSD 35846LE, the Type Name is Token 35847LE, and the Cardinality is zero or one 35848LE.

An extendable code list is assigned to the MailNonDeliveryReasonCode. The customers may change this code list. In its unchanged state, the code list has the following attributes: listID="10175", listAgencyID="310", and listVersionID=[Version of the relevant code list]. The MailNonDeliveryReasonCode 35800LE may be used to specify why a postal item could not be delivered to an address. The MailNonDeliveryReasonCode 35800LE may further be used for street addresses and PO Box addresses. The corresponding qualifiers are: non delivery reason for a street address, and non delivery reason for a PO box address The data type GDT MailNonDeliveryReasonCode 35800LE may use the following codes: 1 (i.e., the recipient is unknown), 2 (i.e., the recipient has moved away to an unknown address—a new address is not known), 3 (i.e., the address is incomplete), 4 (i.e., the address is unreadable), 5 (i.e., there is no mailbox), 6 (i.e., the PO box is not available or locked), 7 (i.e., acceptance was refused)., 8 (i.e., the recipient is deceased), 9 (i.e., the recipient company no longer exists).

(iiiiiiiiiiiiiiiiiiiiii) MaterialFlowElementTypeCode

A GDT MaterialFlowElementTypeCode 35800LF is a MaterialFlowElementTypeCode is the coded representation of the type of an element in the flow of materials. For example, the material flow describes how materials are passed on in a logistical process. An example of GDT MaterialFlowElementTypeCode 35800LF is:

<MaterialFlowElementTypeCode>1</MaterialFlowElementTypeCode>

The structure of GDT MaterialFlowElementTypeCode 35800LF is depicted in FIG. 358LF. For the GDT MaterialFlowElementTypeCode 35800LF, the Object Class is Material Flow Element 35804LF, the Property is Type 35806LF, the Representation/Association is Code 35808LF, the Type is CCT 35810LF, the Type Name is Code 35812LF, and the Length is from one to two 35814LF. The remark 35818LF shows that the GDT MaterialFlowElementTypeCode 35800LF may be restricted.

Exactly one fixed code list has been assigned to the code. The attributes are as follows: listID=10232, listAgencyID=310. The data type GDT MaterialFlowElementTypeCode 35800LF may use the following codes: 1 (i.e., operation), 2 (i.e., branching of a logistical process into several processing paths), 3 (i.e., the rejoining of a previously branched logistical process back into one processing path), 4 (i.e., item of stock), 5 (i.e., schedule line of a planned external procurement order)., 6 (i.e., material output of a planned production order), 7 (i.e., schedule line of a supply planning requirement), 8 (i.e., material input of a planned production order), 9 (i.e., planned independent requirement).

(jjjjjjjjjjjjjjjjjjjjjj) MaterialInputGroupID

A GDT MaterialInputGroupID 35800LG is a unique ID for a group of interrelated material inputs. For example, a material input is a quantitative input of a material used in the execution of a production activity in a manufacturing process. A group of material inputs originates within the context of an instance of a business object (for example, a ProductionRequest) as a result of the common reference of all affected material inputs to a BOM item. An example of GDT MaterialInputGroupID 35800LG is:

<MaterialInputGroupID>4712</MaterialInputGroupID>

The structure of GDT MaterialInputGroupID 35800LG is depicted in FIG. 358LG. For the GDT MaterialInputGroupID 35800LG, the Object Class is Material Input Group 35804LG, the Property is Identification 35806LG, the Representation/Association is Identifier 35808LG, the Type is CCT 35810LG, the Type Name is Identifier 35812LG, and the Length is from one to six 35814LG. The remark 35818LG shows that the GDT MaterialInputGroupID 35800LG may be restricted.

MaterialInputGroupID is unique within the context of an instance of a business object.

(kkkkkkkkkkkkkkkkkkkkkk) MaterialOutputGroupID

A GDT MaterialOutputGroupID 35800LH is a unique ID for a group of interrelated material outputs. For example, a material output is a quantitative output of a material that represents the desired result of a manufacturing process. A group of material outputs originates within the context of an instance of a business object (for example, a ProductionRequest) as a result of the common reference of all affected material outputs to a BOM item. An example of GDT MaterialOutputGroupID 35800LH is:

<MaterialOutputGroupID>4711</MaterialOutputGroupID>

The structure of GDT MaterialOutputGroupID 35800LH is depicted in FIG. 358LH. For the GDT MaterialOutputGroupID 35800LH, the Object Class is Material Output Group 35804LH, the Property is Identification 35806LH, the Representation/Association is Identifier 35808LH, the Type is CCT 35810LH, the Type Name is Identifier 35812LH, and the Length is from one to six 35814LH. The remark 35818LH shows that the GDT MaterialOutputGroupID 35800LH may be restricted. MaterialOutputGroupID is unique within the context of an instance of a business object.

(llllllllllllllllllllll) NumberValue

A GDT NumberValue 35800LI is a number. An example of GDT NumberValue 35800LI is:

<NumberValue>42</NumberValue>

The structure of GDT NumberValue 35800LI is depicted in FIG. 358LI. For the GDT NumberValue 35800LI, the Rep./Ass. Qual. is Number 35807LI, the Representation/Association is Value 35808LI, the Type is XSD 35810LI, the Type Name is nonNegativeInteger 35812LI, and the Length is from one to nine 35814LI.

Only nonnegative integers that are less than one billion are allowed (0-999999999). NumberValue may be used, for example, to specify the number of objects contained in a list. NumberValue always appears in a specific business role. In the element name, these roles may be given as qualifiers that are written as prefixes to the name "NumberValue". The following roles are allowed: number of something that provides a basis for something, number of days, number of digits in the representation of a real number or a whole number, for example, the total number of digits or the number of decimal places for decimal numbers, or the length of the mantissa for numbers with floating points, number of flat rates, maximum number of elements in a quantity, number of meals, number of participants, number of passengers, number of receipts, number of elements of a total number, and sample size (i.e., describes the number of units to be taken in a sample test).

(mmmmmmmmmmmmmmmmmmmmmm) Operation AlternativeID

A GDT OperationAlternativeID 35800LJ is a unique identifier of an alternative operation in an operation. For example, an alternative operation defines default values for an alternative execution of an operation. An example of GDT OperationAlternativeID 35800LJ is:

<OperationAlternativeID>10</OperationAlternativeID>

The structure of GDT OperationAlternativeID 35800LJ is depicted in FIG. 358LJ. For the GDT OperationAlternativeID 35800LJ, the Object Class is OperationAlternative 35804LJ, the Property is Identification 35806LJ, the Representation/Association is Identifier 35808LJ, the Type is CCT 35810LJ, the Type Name is Identifier 35812LJ, and the Length is from one to five 35814LJ. The remark 35818LJ shows that the GDT OperationAlternativeID 35800LJ may be restricted. An OperationAlternativeID is explicit in the context of an operation.

(nnnnnnnnnnnnnnnnnnnnnn) OrganisationName

A GDT OrganisationName 35800LK is a name of an organization in structured form, including the form of address. An example of GDT OrganisationName 35800LK is:

```
<OrganisationName>
    <FirstLineName>SAP AG</FirstLineName>
    <SecondLineName>Geschaftsstelle Berlin</SecondLineName>
</OrganisationName>
```

The structure of GDT OrganisationName 35800LK is depicted in FIG. 358LK. For the GDT OrganisationName 35800LK, the Object Class is Organisation Name 35803LK, the Representation/Association is Details 35804LK, For the FormOfAddressCode 35811LK, the Category is Element (E) 35812LK, the Object Class is Organisation Name 35813LK, the Property is FormOfAddress 35814LK, the Representation/Association is Code 35815LK, the Type is GDT 35816LK, the Type Name is FormOfAddressCode 35816LK, , and the Cardinality is zero or one 35818LK.

For the FirstLineName 35821LK, the Category is Element (E) 35822LK, the Object Class is OrganisationName-Agency 35823LK, the Property is FirstLine 35824LK, the Representation/Association is Name 35825LK, the Type is GDT 35826LK, the Type Name is _MEDIUM_Name 35827LK, and the Cardinality is zero or one 35828LK.

For the SecondLineName 35831LK, the Category is Element (E) 35832LK, the Object Class is OrganisationName-Agency 35833LK, the Property is SecondLine 35834LK, the Representation/Association is Name 35835LK, the Type is GDT 35836LK, the Type Name is _MEDIUM_Name 35837LK, and the Cardinality is zero or one 35838LK.

For the ThirdLineName 35841LK, the Category is Element (E) 35842LK, the Object Class is OrganisationName-Agency 35843LK, the Property is ThirdLine 35844LK, the Representation/Association is Name 35845LK, the Type is GDT 35846LK, the Type Name is _MEDIUM_Name 35847LK, and the Cardinality is zero or one 35848LK.

For the FourthLineName 35851LK, the Category is Element (E) 35852LK, the Object Class is OrganisationName-Agency 35853LK, the Property is FourthLine 35854LK, the Representation/Association is Name 35855LK, the Type is GDT 35856LK, the Type Name is _MEDIUM_Name 35857LK, and the Cardinality is zero or one 35858LK.

OrganisationName 35800LK consists of the following subelements: FormOfAddressCode: The form of address of the organization, FirstLineName: The name components of the organization that appear in the first name line in address formatting, SecondLineName: The name components of the organization that appear in the second name line in address formatting, ThirdLineName: The name components of the organization that appear in the third name line in address formatting, and FourthLineName: The name components of the organization that appear in the fourth name line in address formatting.

(oooooooooooooooooooooo) OverheadCostLedgerAccountTypeCode

A GDT OverheadCostLedgerAccountTypeCode 35800LL is a coded representation of the type of an overhead cost ledger account based on the cost object. For example, an overhead cost ledger account (business object OverheadCostLedgerAccount) Global Data Types—Definition is a record of the costs incurred by the provision of resources. An example of GDT OverheadCostLedgerAccountTypeCode 35800LL is:

<OverheadCostLedgerAccountTypeCode>1</OverheadCostLedgerAccountTypeCode>

The structure of GDT OverheadCostLedgerAccountTypeCode 35800LL is depicted in FIG. 358LL. For the GDT OverheadCostLedgerAccountTypeCode 35800LL, the Object Class is Overhead Cost Ledger Account 35804LL, the Property is Type 35806LL, the Representation/Association is Code 35808LL, the Type is CCT 35810LL, the Type Name is Code 35812LL, and the Length is from one to two 35814LL. The remark 35818LL shows that the GDT OverheadCostLedgerAccountTypeCode 35800LL may be restricted.

A fixed SAP code list has been assigned to OverheadCostLedgerAccountTypeCode. The attributes are as follows: listID="10206", and listAgencyID="310". OverheadCostLedgerAccountTypeCode is used to differentiate between different types of overhead cost ledger accounts. These accounts are differentiated by the object that carries the overhead, such as a cost center or project.

The data type GDT OverheadCostLedgerAccountTypeCode 35800LL may use the following codes: 1 (i.e., overhead cost ledger account for a cost center), 2 (i.e., overhead cost ledger account for a resource), 3 (i.e., overhead cost ledger account for a project).

(pppppppppppppppppppppp) PackagingMaterialTypeCode

A GDT PackagingMaterialTypeCode 35800LM is a coded representation of the type of a packaging material. For example, a packaging material is a material that is destined to surround or contain materials that are to be packed. An example of GDT PackagingMaterialTypeCode 35800LM is:

<PackagingMaterialTypeCode>1</PackagingMaterialTypeCode>

The structure of GDT PackagingMaterialTypeCode 35800LM is depicted in FIG. 358LM. For the GDT PackagingMaterialTypeCode 35800LM, the Object Class is PackagingMaterial 35804LM, the Property is Type 35806LM, the Representation/Association is Code 35808LM, the Type is CCT 35810LM, the Type Name is Code 35812LM, and the Length is from one 35814LM. The remark 35818LM shows that the GDT PackagingMaterialTypeCode 35800LM may be restricted.

The PackagingMaterialTypeCode may be a codelist with the implicitly given attributes listID="10081", listAgencyID="310" and listVersionID="tbd". The data type GDT PackagingMaterialTypeCode 35800LM may use the following codes: 1 (i.e., a Load Carrier is a packaging material in or on which all the content of a packing operation is finally placed.), 2 (i.e., an Additional Packaging Material is a packaging material which is used to wrap or protect content of a packing operation).

PackagingMaterialTypeCode may be used to differentiate between several categories of usage of packaging material items within the packaging operation. PackagingMaterialTypeCode may further be used to differentiate the packaging materials in a packing bill of material where a packing bill of material is a complete and structured list of components that defines the packing structure of logistic units. The packaging material type codes Load Carrier and Additional Packaging Material correspond to the attributes of GDT HandlingUnit.

(qqqqqqqqqqqqqqqqqqqqqq) BusinessPartnerRelationshipSubCategoryCode

A GDT BusinessPartnerRelationshipSubCategoryCode 35800LN represents, in the form of a code, a subcategory of a business partner relationship category (BusinessPartnerRelationshipCategoryCode). The GDT BusinessPartnerRelationshipSubCategoryCode 35800LN represents a refinement of the business partner relationship category (GDT BusinessPartnerRelationshipCategoryCode). An example of the GDT BusinessPartnerRelationshipSubCategoryCode 35800LN is:

<BusinessPartnerRelationshipSubCategoryCode>1A3</BusinessPartnerRelationshipSubCategoryCode>

The structure of GDT BusinessPartnerRelationshipSubCategoryCode 35800LN is depicted in FIG. 358LN. The GDT BusinessPartnerRelationshipSubCategoryCode 35800LN includes attributes listID 35816LN, listAgencyID 35832LN, listVersionID 35848LN, listAgencySchemeID 35864LN, and listAgencySchemeAgencyID 35880LN. For the GDT BusinessPartnerRelationshipSubCategoryCode 35800LN, the Object Class term is Business Partner Relationship 35802LN, the Property term is Sub Category 35804LN, the Representation/Association term is Code 35806LN, the Type term is CCT 35808LN, the Type Name term is Code 35810LN, and the Length is either one or four 35812LN. The GDT BusinessPartnerRelationshipSubCategoryCode 35800LN may be restricted 35814LN.

For the listID 35816LN, the Category is Attribute 35818LN, the Object Class term is CodeList 35820LN, the Property term is Identification 35822LN, the Representation/Association term is Identifier 35822LN, the Type term is xsd 35826LN, and the Type Name term is token 35828LN. The cardinality between the listID 35816LN and the GDT BusinessPartnerRelationshipSubCategoryCode 35800LN is either zero or one 35830LN.

For the listAgencyID 35832LN, the Category is Attribute 35834LN, the Object Class term is CodeListAgency 35836LN, the Property term is Identification 35838LN, the Representation/Association term is Identifier 35840LN, the Type term is xsd 35842LN, and the Type Name term is token 35844LN. The Cardinality between the listAgencyID 35832LN and the GDT BusinessPartnerRelationshipSubCategoryCode 35800LN is either zero or one 35846LN.

For the listVersionID 35848LN, the Category is Attribute 35850LN, the Object Class term is CodeList 35852LN, the Property term is Version 35854LN, the Representation/Association term is Identifier 35856LN, the Type term is xsd 35858LN, and the Type Name term is token 35860LN. The cardinality between the listVersionID 35848LN and the GDT BusinessPartnerRelationshipSubCategoryCode 35800LN is either zero or one 35862LN.

For the listAgencySchemeID 35864LN, the Category is Attribute 35866LN, the Object Class term is CodeListAgency 35868LN, the Property term is Scheme 35870LN, the Representation/Association term is Identifier 35872LN, the Type term is xsd 35874LN, and the Type Name term is token 35876LN. The cardinality between the listAgencySchemeID 35864LN and the GDT BusinessPartnerRelationshipSubCategoryCode 35800LN is either zero or one 35878LN.

For the listAgencySchemeAgencyID 35880LN, the Category is Attribute 35882LN, the Object Class term is CodeListAgency 35884LN, the Property term is SchemeAgency 35886LN, the Representation/Association term is Identifier 35888LN, the Type term is xsd 35890LN, and the Type Name term is token 35892LN. The cardinality between the listAgencySchemeAgencyID 35880LN and the GDT BusinessPartnerRelationshipSubCategoryCode 35800LN is either zero or one 35894LN.

Only alternative code lists exist that differ at configuration and/or runtime.

The BusinessPartnerRelationshipSubCategoryCode is a customer-specific code list. The attributes are used as follows:

listID="10327"

listAgencyID—The ID of the customer. An ID assigned by an organization listed in the DE 3055 must be used (such as the business IDs assigned by DUNS, EAN and SWIFT).

listVersionID—Version of the relevant code list. This is assigned and administered by the customer listed in the listAgencyID.

listAgencySchemeID—The ID of the scheme by which the customer listed in the listAgencyID is identified. This is a particular identification scheme for partners, businesses, and members (such as DUNS+4) and so on, from an administering organization (such as EAN, DUNS and SWIFT) that is listed in the ListAgencySchemeAgency ID.

ListAgencySchemeAgencyID—the ID of the administering organization (such as DUNS, EAN or SWIFT) that is responsible for identifying the organization listed in the ListAgencyID. This must be listed in DE 3055.

Integrity Conditions

1) A code value of BusinessPartnerRelationshipSubCategoryCode must be assigned to a code value of BusinessPartnerRelationshipCategoryCode.

2) A code value of BusinessPartnerRelationshipSubCategoryCode can only be assigned to a code value of BusinessPartnerRelationshipCategoryCode.

In some variations, the GDT BusinessPartnerRelationshipSubCategoryCode 35800LO can be used to differentiate a business partner relationship category in more detail. However, a subcategory does not necessarily have to be assigned to a business partner relationship category. Some examples of possible semantics for codes are:

Minority shareholding The shareholder relationship is based on minority shareholding Majority shareholding The shareholder relationship is based on majority shareholding Reciprocal shareholding The shareholder relationship is based on reciprocal shareholding Co-guardianship The guardianship relationship is based on co-guardianship; meaning that guardianship is carried out jointly with another guardian For example, a type of supervisory guardianship that exists in German law, Gegenvormundschaft. The guardianship relationship is based on supervisory guardianship; meaning that the purpose of this guardianship is to monitor how the guardian does his job.

(rrrrrrrrrrrrrrrrrrrrr) ChartOfAccountsItemID

A GDT ChartOfAccountsItemID 35800LO is an identifier for an item in the chart of accounts. A chart of accounts item groups together assets, payables, stockholders' equity, revenues, or expenses and is used to enter and represent for accounting purposes any changes to these values resulting from business transactions. An example of the GDT ChartOfAccountsItemID 35800LO is:

<ChartOfAccountsItemID>400000</ChartOfAccountsItemID>

The structure of GDT ChartOfAccountsItemID 35800LO is depicted in FIG. 358LO. For the GDT ChartOfAccountsItemID 35800LO, the Object Class term is Chart Of Accounts Item 35802LO, the Property term is Identification 35804LO, the Representation/Association term is Identifier 35806LO, the Type term is CCT 35808LO, the Type Name term is Identifier 35810LO, and the Length is from one to ten 35812LO. The GDT ChartOfAccountsItemID 35800LO may be restricted 35814LO.

A chart of accounts item is identified uniquely by specifying a ChartOfAccountsID and a ChartOfAccountsItemID 35800LO. Note, therefore, that the ChartOfAccountsItemID 35800LO is only unique in the context of the chart of accounts. For this reason, the GDT ChartOfAccountsItemKey should usually be used to identify a chart of accounts item because it contains both elements.

If, however, the chart of accounts is known from the context (such as from a superordinate element), a chart of accounts item can also be identified solely by specifying the ChartOfAccountsItemID 35800LO.

(sssssssssssssssssssss) ChequeID

A GDT ChequeID 35800LP is a unique identifier for a check. A check is an instruction to a bank to debit the amount named from the check issuer's account when the check is presented and to pay it to the check recipient or credit the check recipient's account. An example of the GDT ChequeID 35800LP is:

<ChequeID>0000550766555</ChequeID>

The structure of GDT ChequeID 35800LP is depicted in FIG. 358LP. For the GDT ChequeID 35800LP, the Object Class term is Cheque Item 35802LP, the Property term is Identification 35804LP, the Representation/Association term is Identifier 35806LP, the Type term is CCT 35808LP, the Type Name term is Identifier 35810LP, and the Length is from one to twenty 35812LP.

A check number identifies a check uniquely if the bank and the bank account number are known in the context. In some variations, the GDT ChequeID 35800LP can be used, for example, to identify incoming bank checks with which invoices can be paid.

(ttttttttttttttttttttt) CompanyLegalFormCode

A GDT CompanyLegalFormCode 35800LQ is a code that indicates the legal form of a company. The legal form defines the legal framework of a company that operates commercially in one form or another. An example of the GDT CompanyLegalFormCode 35800LQ is:

<CompanyLegalFormCode>1</CompanyLegalFormCode>

The structure of GDT CompanyLegalFormCode 35800LQ is depicted in FIG. 358LQ. The GDT CompanyLegalFormCode 35800LQ includes attributes listID 35816LQ, listAgencyID 35832LQ, listVersionID 35848LQ, listAgencySchemeID 35864LQ, and listAgencySchemeAgencyID 35880LQ. For the GDT CompanyLegalFormCode 35800LQ, the Property Qualifier term is Company 35802LQ, the Property term is Legal Form 35804LQ, the Representation/Association term is Code 35806LQ, the Type term is CCT 35808LQ, the Type Name term is Code 35810LQ, and the Length is either one or four 35812LQ. The GDT CompanyLegalFormCode 35800LQ may be restricted 35814LQ.

For the listID 35816LQ, the Category is Attribute 35818LQ, the Object Class term is CodeList 35820LQ, the Property term is Identification 35822LQ, the Representation/Association term is Identifier 35822LQ, the Type term is xsd 35826LQ, and the Type Name term is token 35828LQ. The cardinality between the listID 35816LQ and the GDT CompanyLegalFormCode 35800LQ is either zero or one 35830LQ.

For the listAgencyID 35832LQ, the Category is Attribute 35834LQ, the Object Class term is CodeListAgency 35836LQ, the Property term is Identification 35838LQ, the Representation/Association term is Identifier 35840LQ, the Type term is xsd 35842LQ, and the Type Name term is token 35844LQ. The Cardinality between the listAgencyID 35832LQ and the GDT CompanyLegalFormCode 35800LQ is either zero or one 35846LQ.

For the listVersionID 35848LQ, the Category is Attribute 35850LQ, the Object Class term is CodeList 35852LQ, the Property term is Version 35854LQ, the Representation/Association term is Identifier 35856LQ, the Type term is xsd 35858LQ, and the Type Name term is token 35860LQ. The cardinality between the listVersionID 35848LQ and the GDT CompanyLegalFormCode 35800LQ is either zero or one 35862LQ.

For the listAgencySchemeID 35864LQ, the Category is Attribute 35866LQ, the Object Class term is CodeListAgency 35868LQ, the Property term is Scheme 35870LQ, the Representation/Association term is Identifier 35872LQ, the Type term is xsd 35874LQ, and the Type Name term is token 35876LQ. The cardinality between the listAgencySchemeID 35864LQ and the GDT CompanyLegalFormCode 35800LQ is either zero or one 35878LQ.

For the listAgencySchemeAgencyID 35880LQ, the Category is Attribute 35882LQ, the Object Class term is CodeListAgency 35884LQ, the Property term is SchemeAgency 35886LQ, the Representation/Association term is Identifier 35888LQ, the Type term is xsd 35890LQ, and the Type Name term is token 35892LQ. The cardinality between the listAgencySchemeAgencyID 35880LQ and the GDT CompanyLegalFormCode 35800LQ is either zero or one 35894LQ.

There are only alternative code lists that differ at configuration and/or runtime.

The GDT CompanyLegalFormCode 35800LQ is a customer-specific code list. In some variations, the attributes are used as follows:

listID="10332"

listAgencyID—The ID of the customer. An ID assigned by an organization listed in the DE 3055 must be used (such as the business IDs assigned by DUNS, EAN and SWIFT).

listVersionID—Version of the relevant code list.

listAgencySchemeID—The ID of the scheme by which the customer listed in the listAgencyID is identified. This is a particular identification scheme for partners, businesses, and members (such as DUNS+4) and so on, from an administering organization (such as EAN, DUNS and SWIFT) that is listed in the ListAgencySchemeAgency ID.

ListAgencySchemeAgencyID—the ID of the administering organization (such as DUNS, EAN or SWIFT) that is responsible for identifying the organization listed in the ListAgencyID.

Some examples of possible semantics for codes are:

| | |
|---|---|
| PLC | The legal form is that of a public limited company. |
| Ltd | The legal form is that of a company with limited liability. |

(uuuuuuuuuuuuuuuuuuuuu) CustomerGroupCode

A GDT CustomerGroupCode 35800LR is the coded representation of a group of customers. An example of the GDT CustomerGroupCode 35800LR is:

<CustomerGroupCode>1</CustomerGroupCode>

The structure of GDT CompanyLegalFormCode 35800LR is depicted in FIG. 358LR. The GDT CompanyLegalFormCode 35800LR includes attributes listID 35816LR, listAgencyID 35832LR, listVersionID 35848LR, listAgencySchemeID 35864LR, and listAgencySchemeAgencyID 35880LR. For the GDT CompanyLegalFormCode 35800LR, the Object Class term is Customer Group 35802LR, the Representation/Association term is Code 35806LR, the Type term is CCT 35808LR, the Type Name term is Code 35810LR, and the Length is either one or two 35812LR.

For the listID 35816LR, the Category is Attribute 35818LR, the Object Class term is CodeList 35820LR, the Property term is Identification 35822LR, the Representation/Association term is Identifier 35822LR, the Type term is xsd 35826LR, and the Type Name term is token 35828LR. The cardinality between the listID 35816LR and the GDT CompanyLegalFormCode 35800LR is either zero or one 35830LR.

For the listAgencyID 35832LR, the Category is Attribute 35834LR, the Object Class term is CodeListAgency 35836LR, the Property term is Identification 35838LR, the Representation/Association term is Identifier 35840LR, the Type term is xsd 35842LR, and the Type Name term is token 35844LR. The Cardinality between the listAgencyID 35832LR and the GDT CompanyLegalFormCode 35800LR is either zero or one 35846LR.

For the listVersionID 35848LR, the Category is Attribute 35850LR, the Object Class term is CodeList 35852LR, the Property term is Version 35854LR, the Representation/Association term is Identifier 35856LR, the Type term is xsd 35858LR, and the Type Name term is token 35860LR. The cardinality between the listVersionID 35848LR and the GDT CompanyLegalFormCode 35800LR is either zero or one 35862LR.

For the listAgencySchemeID 35864LR, the Category is Attribute 35866LR, the Object Class term is CodeListAgency 35868LR, the Property term is Scheme 35870LR, the Representation/Association term is Identifier 35872LR, the Type term is xsd 35874LR, and the Type Name term is token 35876LR. The cardinality between the listAgencySchemeID 35864LR and the GDT CompanyLegalFormCode 35800LR is either zero or one 35878LR.

For the listAgencySchemeAgencyID 35880LR, the Category is Attribute 35882LR, the Object Class term is CodeListAgency 35884LR, the Property term is SchemeAgency 35886LR, the Representation/Association term is Identifier 35888LR, the Type term is xsd 35890LR, and the Type Name term is token 35892LR. The cardinality between the listAgencySchemeAgencyID 35880LR and the GDT CompanyLegalFormCode 35800LR is either zero or one 35894LR.

In some variations, a customer-specific code list can be assigned to the code. A customer determines the codes in the code list. For example, the attributes of the code are assigned the following values:

listID="10335"

listAgencyID—ID of the SAP customer (ID from DE 3055, if listed there)

listVersionID—version of the particular code list. Assigned and managed by the SAP customer listAgencySchemeID—ID of the scheme if the listAgencyID does not come from DE 3055 listAgencySchemeAgencyID—ID of the organization from DE 3055 that manages the listAgencySchemeID scheme In some implementations, the GDT CustomerGroupCode 35800LR can be used, for example, in the sales order for pricing and statistics purposes. Some examples of the possible semantics of the codes are an Industrial enterprise, which is aCustomer group that includes industrial enterprises, a Commercial enterprise, which is a Customer group that includes commercial enterprises, and a Private customer, which is a Customer group that includes private customers.

(vvvvvvvvvvvvvvvvvvvvvv) DueTypeCode

A GDT DueTypeCode 35800LS is the coded representation of the type of due item. A due item is a receivable or a payable.

<DueTypeCode>PAYMT</DueTypeCode>

The structure of GDT DueTypeCode 35800LS is depicted in FIG. 358LS. The GDT DueTypeCode 35800LS includes attributes listID 35816LS, listAgencyID 35832LS, listVersionID 35848LS, listAgencySchemeID 35864LS, and listAgencySchemeAgencyID 35880LS. For the GDT DueTypeCode 35800LS, the Object Class term is Due 35802LS, the Property term is TYpe 35804LS, the Representation/Association term is Code 35806LS, the Type term is CCT 35808LS, the Type Name term is Code 35810LS, and the Length is from one to five 35812LS.

For the listID 35816LS, the Category is Attribute 35818LS, the Object Class term is CodeList 35820LS, the Property term is Identification 35822LS, the Representation/Association term is Identifier 35822LS, the Type term is xsd 35826LS, and the Type Name term is token 35828LS. The cardinality between the listID 35816LS and the GDT DueTypeCode 35800LS is either zero or one 35830LS.

For the listAgencyID 35832LS, the Category is Attribute 35834LS, the Object Class term is CodeListAgency 35836LS, the Property term is Identification 35838LS, the Representation/Association term is Identifier 35840LS, the Type term is xsd 35842LS, and the Type Name term is token 35844LS. The Cardinality between the listAgencyID 35832LS and the GDT DueTypeCode 35800LS is either zero or one 35846LS.

For the listVersionID 35848LS, the Category is Attribute 35850LS, the Object Class term is CodeList 35852LS, the Property term is Version 35854LS, the Representation/Association term is Identifier 35856LS, the Type term is xsd 35858LS, and the Type Name term is token 35860LS. The cardinality between the listVersionID 35848LS and the GDT DueTypeCode 35800LS is either zero or one 35862LS.

For the listAgencySchemeID 35864LS, the Category is Attribute 35866LS, the Object Class term is CodeListAgency 35868LS, the Property term is Scheme 35870LS, the Representation/Association term is Identifier 35872LS, the Type term is xsd 35874LS, and the Type Name term is token 35876LS. The cardinality between the listAgencySchemeID 35864LS and the GDT DueTypeCode 35800LS is either zero or one 35878LS.

For the listAgencySchemeAgencyID 35880LS, the Category is Attribute 35882LS, the Object Class term is CodeListAgency 35884LS, the Property term is SchemeAgency 35886LS, the Representation/Association term is Identifier 35888LS, the Type term is xsd 35890LS, and the Type Name term is token 35892LS. The cardinality between the listAgencySchemeAgencyID 35880LS and the GDT DueTypeCode 35800LS is either zero or one 35894LS.

In some variations, the GDT DueTypeCode 35800LS is a customer-specific code. Only one code list is permitted for each administrative organization (agency).

The attributes listID (="10338"), listAgencyID, listVersionID, listAgencySchemeID, listAgencySchemeAgencyID are filled during runtime with constant values that are customer-specific.

In some variations, the GDT DueTypeCode 35800LS is used to distinguish between different types of trade payables and receivables. This makes it possible to have different views of the due items in the system. The differentiation generated in this way can be used in Financial Accounting to display the due items for specific G/L accounts. The legal requirements of the respective country determine for which DueTypeCodes it is necessary to display the due items for specific G/L accounts. This is then specified in the configuration.

Some examples of the possible semantics of the codes are:

Invoice due item. An invoice due item is a due item that results from an invoice.

Payment due item. A payment due item is a due item that results from a payment.

Down payment due item. A down payment due item is a due item that results from a down payment (payment made before the service is provided).

Security retention amount. A security retention amount is a due item resulting from an invoice of which a specific part cannot be paid to the payee and must be retained (due to legal regulations).

(wwwwwwwwwwwwwwwwwwwwww) DurationRoleCode

A GDT DurationRoleCode 35800LT is a coded representation of the business role of a duration. An example of the GDT DurationRoleCode 35800LT is:

<DurationRoleCode>1</DurationRoleCode>

The structure of GDT DurationRoleCode 35800LT is depicted in FIG. 358LT. The GDT DurationRoleCode 35800LT includes attributes listAgencyID 35814LT, listVersionID 35830LT, listAgencySchemeID 35846LT, and listAgencySchemeAgencyID 35862LT. For the GDT DurationRoleCode 35800LT, the Property term is Duration Role 35802LT, the Representation/Association term is Code 35804LT, the Type term is xsd 35806LT, the Type term is token 35808LT, the Type Name term is Code 35810LT, and the Length is from one to three 35810LT. The DurationRoleCode 35800LT may be restricted 35812LT.

For the listAgencyID 35814LT, the Category is Attribute 35816LT, the Object Class term is CodeListAgency 35818LT, the Property term is Identification 35820LT, the Representation/Association term is Identifier 35822LT, the Type term is xsd 35824LT, and the Type Name term is token 35826LT. The cardinality between the listAgencyID 35814LT and the GDT DurationRoleCode 35800LT is either zero or one 35828LT.

For the listVersionID 35830LT, the Category is Attribute 35832LT, the Object Class term is CodeList 35834LT, the Property term is Version 35836LT, the Representation/Association term is Identifier 35838LT, the Type term is xsd 35840LT, and the Type Name term is token 35842LT. The cardinality between the listVersionID 35830LT and the GDT DurationRoleCode 35800LT is either zero or one 35844LT.

For the listAgencySchemeID 35846LT, the Category is Attribute 35848LT, the Object Class term is CodeListAgency 35850LT, the Property term is Scheme 35852LT, the Representation/Association term is Identifier 35854LT, the Type term is xsd 35856LT, and the Type Name term is token 35858LT. The cardinality between the listAgencySchemeID 35862LT and the GDT DurationRoleCode 35800LT is either zero or one 35860LT.

For the listAgencySchemeAgencyID 35862LT, the Category is Attribute 35864LT, the Object Class term is CodeListAgency 35866LT, the Property term is Scheme 35868LT, the Representation/Association term is Identifier 35870LT, the Type term is xsd 35872LT, and the Type Name term is token 35874LT. The cardinality between the listAgencySchemeAgencyID 35862LT and the GDT DurationRoleCode 35800LT is either zero or one 35876LT.

In some variations, an extensible code list can be assigned to the code. A customer can replace this SAP code list with his own one. If the assigned code list remains unchanged, the attributes are assigned the following values:

listID="10396"

listAgencyID="310"

listVersionID=version of the particular code list

If a customer creates his own code list, the values assigned to the attributes change as follows:

listAgencyID—ID of the SAP customer (ID from DE 3055, if listed there)

listVersionID—version of the particular code list. Assigned and managed by the customer listAgencySchemeID—ID of the scheme if the listAgencyID does not come from DE 3055 listAgencySchemeAgencyID—ID of the organization from DE 3055 that manages the listAgencySchemeID scheme The DurationRoleCode 35800LT is used to specify the semantic of a duration during runtime. Durations are typed with Duration or Quantity.

The DurationRoleCodes 35800LT cover all the business semantics of durations. As a result, the codes do also include all qualifiers of GDT Durations and those qualifiers of Quantity that are used for a time duration. The DurationRoleCode 35800LT does not include the type name; a restriction to a subset of the available time-point types is not possible. Identical Qualifiers and RoleCodes must have the same business semantic. As an example, the follow code may be used:

| Code | Name | Description |
|---|---|---|
| 1 | ArrearsDuration | |
| 2 | AverageDuration | |
| 3 | ConfirmDuration | |
| 4 | ConfirmedDuration | |
| 5 | DefaultDuration | |
| 6 | DeliveryDuration | |
| 7 | FixedDuration | |
| 8 | FloatDuration | |
| 9 | IssueDuration | |
| 10 | LagDuration | |
| 11 | LeadTimeDuration | |
| 12 | LockDuration | |
| 13 | MaximumDuration | |
| 14 | MinimumDuration | |
| 15 | NetDuration | |
| 16 | OrderToPickupDuration | |
| 17 | PersonnelTimeDuration | |
| 18 | PlannedDuration | |
| 19 | ProbationPeriodDuration | |
| 20 | ProcessingDuration | |
| 21 | ProductionDuration | |
| 22 | ReceiptDuration | |
| 23 | ShippingDuration | |
| 24 | TotalDuration | |
| 25 | TotalConfirmedDuration | |
| 26 | VariableDuration | |

(xxxxxxxxxxxxxxxxxxxxxx) PaymentAllocationItemTypeCode

A GDT PaymentAllocationItemTypeCode 35800LU is a coded representation of the type of a PaymentAllocationItem. For example, a PaymentAllocationItem may be the allocation of part of a payment register item (an Item of the business object PaymentRegister) to a payment reason on the basis of which part of the payment register item occurred. A payment register item (an Item of the business object PaymentRegister) may be a payment from a base payment business transaction that can consist of multiple parts with different payment reasons. An example of GDT PaymentAllocationItemTypeCode 35800LU is:

<PaymentAllocationItemTypeCode>1</PaymentAllocationItemTypeCode>.

The structure of GDT PaymentAllocationItemTypeCode 35800LU is depicted in FIG. 358LU. For the GDT PaymentAllocationItemTypeCode 35800LU, the Object Class is PaymentAllocationItem 35804LU, the Property is Type 35806LU, the Representation/Association is Code 35808LU, the Type is CCT 35810LU, the Type Name is Code 35812LU, and the Length is from one to two 35814LU. The remark 35818LU shows that the GDT PaymentAllocationItemTypeCode 35800LU may be restricted.

The data type GDT PaymentAllocationItemTypeCode 35800LU may have the following attributes: listID (10095), listAgencyID (310), listVersionID (version of the relevant code list; assigned and managed by SAP AG).

The data type GDT PaymentAllocationItemTypeCode 35800LU may use the following codes: 1 (i.e., partial deliveries are allowed), 2 (i.e., only one delivery on the requested delivery date/time is allowed), 3 (i.e., only a complete delivery (the entire quantity) is allowed), 4 (i.e., or the order only a complete delivery (the entire quantity) is allowed), 5 (i.e., for the order only one delivery on the requested delivery date/time is allowed), 6 (i.e., for the item only one delivery on the requested delivery date/time is allowed; partial deliveries for the order are allowed), 7 (i.e., for the item only a complete delivery (the entire quantity) is allowed; partial deliveries for the order are allowed).

(yyyyyyyyyyyyyyyyyyyyyy) PaymentExplanationItemID

A GDT PaymentExplanationItemID 35800LV may be a unique identifier for an item of a payment explanation. For example, an item of a payment explanation could contain the payment amount and information used to identify a business document (such as, contract, invoice, credit memo, or sales order) that has initiated the payment transaction. An example of GDT PaymentExplanationItemID 35800LV is:

<PaymentExplanationItemID>001</PaymentExplanationItemID>

The structure of GDT PaymentExplanationItemID 35800LV is depicted in FIG. 358LV. For the GDT PaymentExplanationItemID 35800LV, the Object Class is PaymentExplanationItem 35804LV, the Property is Identification 35806LV, the Representation/Association is Identifier 35808LV, the Type is CCT 35810LV, the Type Name is Identifier 35812LV, and the Length is from one to three 35814LV. The remark 35818LV shows that the GDT PaymentExplanationItemID 35800LV may be restricted.

The data type GDT PaymentExplanationItemID 35800LV may uniquely identify an item of a payment explanation together with the ID of the higher-level object (contract, invoice, credit memo, or sales order) or the payment ID.

(zzzzzzzzzzzzzzzzzzzzzz) PaymentMediumFormatSpecificFieldValue

A GDT PaymentMediumFormatSpecificFieldValue 35800LW is the value of a payment medium format-specific field that is not contained in the scope of the fields provided by default for payment mediums. An example of GDT PaymentMediumFormatSpecificFieldValue 35800LW is:

<PaymentMediumFormatSpecificFieldValue><Code>SPRI </Code></PaymentMediumFormatSpecificFieldValue>

The structure of GDT PaymentMediumFormatSpecificFieldValue 35800LW is depicted in FIG. 358LW. For the GDT PaymentMediumFormatSpecificFieldValue 35800LW, the Object Class is PaymentMediumFormatSpecificFieldValue 35801LW, the Representation/Association is Details.

For the Code 35808LW, the Category is E 35809LW, the Object Class is PaymentMediumFormatSpecificFieldValue 35810LW, the Property is Code 35811LW, the Representation/Association is Code 35812LW, the Type is GDT 35813LW, the Type Name is PaymentMediumFormatSpecificFieldValueCode 35814LW, and the Cardinality is zero or one 35815LW.

For the ID 35817LW, the Category is Attribute(E) 35818LW, the Object Class is PaymentMediumFormatSpecificFieldValue 35819LW, the Property is Identification 35820LW, the Representation/Association is Identifier 35821 LW, the Type is GDT 35822LW, the Type Name is PaymentMediumFormatSpecificFieldValueID 35823LW, and the Cardinality is zero or one 35824LW.

For the Text 35826LW, the Category is Attribute(E) 35827LW, the Object Class is PaymentMediumFormatSpecificFieldValue 35828LW, the Property is Text 35829LW, the Representation/Association is Text 35830LW, the Type is GDT 35831LW, the Type Name is PaymentMediumFormatSpecificFieldValueID 35832LW, and the Cardinality is zero or one 35833LW.

For the IntegerValue 35835LW, the Category is Attribute (E) 35836LW, the Object Class is PaymentMediumFormatSpecificFieldValue 35837LW, the Property is Integer Value 35838LW, the Representation/Association is Value 35839LW, the Type is GDT 35840LW, the Type Name is Integer Value 35841LW, and the Cardinality is zero or one 35842LW.

For the Date 35844LW, the Category is Attribute(E) 35845LW, the Object Class is PaymentMediumFormatSpecificFieldValue 35846LW, the Property is Date 35847LW, the Representation/Association is Date 35848LW, the Type is GDT 35849LW, the Type Name is Date 35850LW, and the Cardinality is zero or one 35851LW.

For the Time 35853LW, the Category is Attribute(E) 35854LW, the Object Class is PaymentMediumFormatSpecificFieldValue 35855LW, the Property is Time 35856LW, the Representation/Association is Time 35857LW, the Type is GDT 35858LW, the Type Name is Time 35859LW, and the Cardinality is zero or one 35860LW.

For the Indicator 35862LW, the Category is Attribute(E) 35863LW, the Object Class is PaymentMediumFormatSpecificFieldValue 35864LW, the Property is Indicator 35865LW, the Representation/Association is Indicator 35866LW, the Type is GDT 35867LW, the Type Name is Indicator 35868LW, and the Cardinality is zero or one 35869LW.

The data type GDT PaymentMediumFormatSpecificFieldValue 35800LW may use the following codes: Code (entry of a coded representation of an issue), ID(entry of an identification of an object), Text (text entry), IntegerValue (entry of an integral value), Date (entry of a calendar day), Time (entry of an exact time in seconds), Indicator (entry of a binary logical value), Amount (amount entry) Exactly one element from the quantity Code, ID, Text, IntegerValue, Date, Time, Indicator, or Amount must be entered.

The GDT PaymentMediumFormatSpecificFieldValue 35800LWNN is used together with PaymentMediumFormatSpecificFieldID to make special entries required for creating a valid payment medium. This fills fields in the payment medium that are required depending on the respective data medium format and that have different semantics. This means that they cannot be standardized due to the number of different semantics (such as the entry of the service level in an electronic bank transfer in S.W.I.F.T. MT 103 format).

(aaaaaaaaaaaaaaaaaaaaaa) PaymentMediumFormatSpecificFieldValueCode

A GDT PaymentMediumFormatSpecificFieldValueCode 35800LX is a coded representation of any issue as a value of a payment medium format-specific field. An example of GDT PaymentMediumFormatSpecificFieldValueCode 35800LX is:

<PaymentMediumFormatSpecificFieldValueCode>SPRI </PaymentMediumFormatSpecificFieldValueCode>

The structure of GDT PaymentMediumFormatSpecificFieldValueCode 35800LX is depicted in FIG. 358LX. For the GDT PaymentMediumFormatSpecificFieldValueCode 35800LX, the Object Class is Payment Medium Format Specific Field Value 35804LX, the Representation/Association is Code 35808LX, the Type is CCT 35810LX, the Type Name is Code 35812LX, and the Length is from one to thirty 35814LX. The remark 35818LX shows that the GDT PaymentMediumFormatSpecificFieldValueCode 35800LX may be restricted.

The data type GDT PaymentMediumFormatSpecificFieldValueCode 35800LX may be used to represent a coded issue that is required according to payment medium format specification to create a valid payment medium. However, it is not contained in the default elements of the business object BankPaymentOrder.

(bbbbbbbbbbbbbbbbbbbbbb) PaymentMedium FormatSpecificFieldValueID

A GDT PaymentMediumFormatSpecificFieldValueID 35800LY is a unique identifier for any issue as a value of a payment medium format-specific field. For example, S.W.I.F.T. code of a bank to which a S.W.I.F.T. payment message should be forwarded. An example of GDT PaymentMediumFormatSpecificFieldValueID 35800LY is:

<PaymentMediumFormatSpecificFieldValueID>
COBADE01</PaymentMediumFormatSpecificFieldValueID>

The structure of GDT PaymentMediumFormatSpecificFieldValueID 35800LY is depicted in FIG. 358LY. For the GDT PaymentMediumFormatSpecificFieldValueID 35800LY, the Object Class is Payment Medium Format Specific Field Value 35804LY, the Property is Identification 35806LY, the Representation/Association is Identifier 35808LY, the Type is CCT 35810LY, the Type Name is Identifier 35812LY, and the Length is from one to thirty-five 35814LY. The remark 35818LY shows that the GDT PaymentMediumFormatSpecificFieldValueID 35800LY may be restricted.

The data type GDT PaymentMediumFormatSpecificFieldValueID 35800LY may only be used in the GDT PaymentMediumFormatSpecificFieldValue 35800LW.

The data type GDT PaymentMediumFormatSpecificFieldValueID 35800LY may be used to identify an issue that is required according to payment medium formation specification to create a valid payment medium. However, it is not contained in the default elements of the business object BankPaymentOrder.

(cccccccccccccccccccccc) RoomID

A GDT RoomID 35800LZ is a unique identifier of a room within a building or complex. An example of GDT RoomID 35800LZ is:

<RoomID>K2.01</RoomID>

The structure of GDT RoomID 35800LZ is depicted in FIG. 358LZ. For the GDT RoomID 35800LZ, the Object Class is Room 35804LZ, the Property is Identification 35806LZ, the Representation/Association is Identifier 35808LZ, the Type is CCT 35810LZ, the Type Name is Identifier 35812LZ, and the Length is from one to ten 35814LZ. The remark 35818LZ shows that the GDT RoomID 35800LZ may be restricted.

The data type GDT RoomID 35800LZ may be used in addresses.

(dddddddddddddddddddddd) SamplingSchemeCode

A GDT SamplingSchemeCode 35800MA is a coded representation of a sampling scheme. For example, a sampling scheme is a collection of sampling plans. The sampling plan defines the sample size and the acceptance and rejection numbers. In doing so, it takes the total quantity to be inspected, the inspection severity (InspectionSeverityCode), and the Acceptable Quality Level (AQL) into consideration. An example of GDT SamplingSchemeCode 35800MA is:

<SamplingSchemeCode>S_PLAN01__2859-1</SamplingSchemeCode>

The structure of GDT SamplingSchemeCode 35800MA is depicted in FIG. 358MA. For the GDT SamplingSchemeCode 35800MA, the Object Class is Sampling Scheme 35801MA, the Representation/Association is Code 35804MA, the Type is CCT 35805MA, the Type Name is Code 35806MA, and the Length is from one to fifteen 35807MA. The remark 35809MA shows that the GDT SamplingSchemeCode 35800MA may be restricted.

For the listAgencyID 35810MA, the Category is Attribute (A) 35811MA, the Object Class is CodeListAgency 35812MA, the Property is Identification 35813MA, the Representation/Association is Identifier 35814MA, the Type is XSD 35815MA, the Type Name is Token 35816MA, and the Cardinality is zero or one 35818MA.

For the ListVersionID 35820MA, the Category is Attribute (A) 35821MA, the Object Class is CodeListAgency 35822MA, the Property is Identification 35823MA, the Representation/Association is Identifier 35824MA, the Type is XSD 35825MA, the Type Name is Token 35826MA, and the Cardinality is zero or one 35828MA.

For the ListVersionID 35830MA, the Category is Attribute (A) 35831MA, the Object Class is CodeList 35832MA, the Property is Version 35833MA, the Representation/Association is Identifier 35834MA, the Type is XSD 35835MA, the Type Name is Token 35836MA, and the Cardinality is zero or one 35838MA.

For the ListAgency-SchemeID 35840MA, the Category is Attribute (A) 35841 MA, the Object Class is CodeListAgency 35842MA, the Property is Scheme 35843MA, the Representation/Association is Identifier 35844MA, the Type is XSD 35845MA, the Type Name is Token 35846MA, and the Cardinality is zero or one 35848MA.

For the ListAgency-SchemeAgencyID 35850MA, the Category is Attribute (A) 35851MA, the Object Class is CodeListAgency 35852MA, the Property is SchemeAgency 35853MA, the Representation/Association is Identifier 35854MA, the Type is XSD 35855MA, the Type Name is Token 35856MA, and the Cardinality is zero or one 35858MA.

The data type GDT SamplingSchemeCode 35800MA may use the following codes: listID ("10165"), listAgencyID (ID of the SAP customer (ID from DE 3055 if listed there)), listVersionID (assigned and managed by the SAP customer), listAgencySchemeID (ID of the scheme if the listAgencyID is not taken from DE 3055), listAgencySchemeAgencyID (ID of the organization (taken from DE 3055) that manages the scheme of the listAgencySchemeID).

For a sampling inspection using a sampling scheme, the data type GDT SamplingSchemeCode 35800MA contains the sampling scheme that is to be used.

(eeeeeeeeeeeeeeeeeeeeee) ScheduleActivityEndDateTimeConstraintTypeCode

A GDT ScheduleActivityEndDateTimeConstraintTypeCode 35800MB is a coded representation of the constraint for the end date/time of an activity. For example, an activity may be a task in a network or an operation in a bill of operations. It has a defined start and a defined end. Types would then be allocated according to the way in which a reference date/time restricts the end date/time. An example of GDT ScheduleActivityEndDateTimeConstraintTypeCode 35800MB is:

```
<ScheduleActivityEndDateTimeConstraintTypeCode>1
</ScheduleActivityEndDateTimeConstraintTypeCode>
```

The structure of GDT ScheduleActivityEndDateTimeConstraintTypeCode 35800MB is depicted in FIG. 358MB. For the GDT ScheduleActivityEndDateTimeConstraintTypeCode 35800MB, the Object Class is ScheduleActivity 35804MB, the Property is EndDateTimeConstraintType 35806MB, the Representation/Association is Code 35808MB, the Type is CCT 35810MB, the Type Name is Code 35812MB, and the Length is one 35814MB. The remark 35818MB shows that the GDT ScheduleActivityEndDateTimeConstraintTypeCode 35800MB may be restricted.

The value range of the data type GDT ScheduleActivityEndDateTimeConstraintTypeCode 35800MBCT is an SAP-specific code list with fixed predefined values. The attributes of the CCT code are filled implicitly with the following values: listID ("10286"), listAgencyID (310), listVersionID (version of the relevant code list assigned and managed by SAP AG).

The data type GDT ScheduleActivityEndDateTimeConstraintTypeCode 35800MB may use the following codes: 1 (i.e., the end date/time must occur on/at the latest possible date/time), 2 (i.e., the end date/time is predefined), 3 (i.e., the end date/time may not occur before a predefined date/time), 4 (i.e., the end date/time may not occur after a predefined date/time).

(ffffffffffffffffffffff) ScheduleActivityStartDateTimeConstraintTypeCode

A GDT ScheduleActivityStartDateTimeConstraintTypeCode 35800MC is a coded representation of the type of constraint for the start date/time of an activity For example, an activity is a task in a network or an operation in a bill of operations. It has a defined start and a defined end. Types are allocated according to the way in which a reference date/time restricts the start date/time. An example of GDT ScheduleActivityStartDateTimeConstraintTypeCode 35800MC is:

```
<ScheduleActivityStartDateTimeConstraintTypeCode>1
</ScheduleActivityStartDateTimeConstraintTypeCode>
```

The structure of GDT ScheduleActivityStartDateTimeConstraintTypeCode 35800MC is depicted in FIG. 358MC. For the GDT ScheduleActivityStartDateTimeConstraintTypeCode 35800MC, the Object Class is ScheduleActivity 35804MC, the Property is StartDateTimeConstraintType 35806MC, the Representation/Association is Code 35808MC, the Type is CCT 35810MC, the Type Name is Code 35812MC, and the Length is one 35814MC. The remark 35818MC shows that the GDT ScheduleActivityStartDateTimeConstraintTypeCode 35800MC may be restricted.

The value range of GDT ScheduleActivityStartDateTimeConstraintTypeCode 35800MC is an SAP-specific code list with fixed predefined values. The attributes of the CCT code are filled implicitly with the following values: listID ("10285"), listAgencyID (310), listVersionID (version of the relevant code list).

The data type GDT ScheduleActivityStartDateTimeConstraintTypeCode 35800MC may use the following codes: 1 (i.e., the start date/time must occur on/at the earliest possible date/time.), 2 (i.e., the start date/time is predefined), 3 (i.e., the start date/time may not occur before a predefined date/time), 4 (i.e., the start date/time may not occur after a predefined date/time).

(gggggggggggggggggggggg) ServiceProductBasedValuationIndicator

Accounting is informed about internal service provisions so that it can valuate and document them for the purposes of proper bookkeeping. This valuation is normally based on the resource consumption, but it can also be based on the service product provided.

The ServiceProductBasedValuationIndicator is used in the line items of the accounting record regarding business transactions involving overhead costs (business object OverheadCostLedgerAccount). It is set during the creation of accounting documents and has no control function, serving to explain the valuation in the document.

(hhhhhhhhhhhhhhhhhhhhhhh) SkipIndicator

The SkipIndicator can be used to display whether a material inspection is to be skipped.

(iiiiiiiiiiiiiiiiiiiii) SkippedIndicator

The SkippedIndicator can be used to show that a quality inspection has been skipped.

(jjjjjjjjjjjjjjjjjjjjj) SetOfBooksCode

A GDT SetOfBooksCode 35800MD is a coded representation of a set of books. For example, a set of books mat be a complete, self-contained, and consistent set of accounting figures within accounting. Complete means that postings and relevant information on items in the balance sheet and profit and loss statement are included. Self-contained means that no external reference to other posted information in accounting is needed to explain the content of a set of books. Consistent means that the posted data of a set of books are comparable as regards the structure (fiscal year variant, currency, chart of accounts) and the semantics (that is, based on an accounting principle or other rules or exceptions). An example of GDT SetOfBooksCode 35800MD is:

<SetOfBooksCode>L0</SetOfBooksCode>

The structure of GDT SetOfBooksCode 35800MD is depicted in FIG. 358MD. For the GDT SetOfBooksCode 35800MD, the Object Class is SetOfBooks 35801MD, the Representation/Association is Code 35804MD, the Type is CCT 35805MD, the Type Name is Code 35806MD, and the Length is from one to four 35807MD. The remark 35809MD shows that the GDT SetOfBooksCode 35800MD may be restricted.

For the ListID 35810MD, the, Category is Attribute (A) 35811MD, the Object Class is CodeList 35812MD, the Property is Identification 35813MD, the Representation/Association is Identifier 35814MD, the Type is XSD 35815MD, the Type Name is Token 35816MD, and the Cardinality is zero or one 35818MD.

For the ListAgencyID 35820MD, the Category is Attribute (A) 35821MD, the Object Class is CodeListAgency 35822MD, the Property is Identification 35823MD, the Representation/Association is Identifier 35824MD, the Type is XSD 35825MD, the Type Name is Token 35826MD, and the Cardinality is zero or one 35828MD.

For the ListVersionID 35830MD, the Category is Attribute (A) 35831MD, the Object Class is CodeList 35832MD, the Property is Version 35833MD, the Representation/Association is Identifier 35834MD, the Type is XSD 35835MD, the Type Name is Token 35836MD, and the Cardinality is zero or one 35838MD.

For the ListAgency-SchemeID 35840MD, the Category is Attribute (A) 35841MD, the Object Class is CodeListAgency 35842MD, the Property is Scheme 35843MD, the Representation/Association is Identifier 35844MD, the Type is XSD 35845MD, the Type Name is Token 35846MD, and the Cardinality is zero or one 35848MD.

For the ListAgency-SchemeAgencyID 35850MD, the Category is Attribute (A) 35851MD, the Object Class is CodeListAgency 35852MD, the Property is SchemeAgency 35853MD, the Representation/Association is Identifier 35854MD, the Type is XSD 35855MD, the Type Name is Token 35856MD, and the Cardinality is zero or one 35858MD.

SetOfBooksCode is a customer-defined code list. The attributes are used as follows:

The listID is an ID of the relevant code list. This is assigned and administered by the organization responsible for the code list, which is not listed in DE 3055. GDT owner must obtain the exact ID from the organization responsible. If no unique ID is available, the name of the relevant code list or code type used in the corresponding standard, specification, or scheme of the responsible organization must be entered.

The listAgencyID is an ID of the administrative organization of the code list. This ID is provided by the organization and is taken from DE 3055. (For exam-ple, the DUNS number or EAN number of a company). GDT owner must obtain the relevant ID from the organization responsible.

The listVersionID is a version of the relevant code list. This is assigned and administered by the organization listed in the listAgencyID. GDT owner must obtain the relevant versions ID from the organization responsible. If no version has been issued for the code list, the version of the standard, the specification, or the scheme must be used.

The listAgencySchemeID is the identification of the scheme once the organization listed in the listAgencyID is identified. It is a particular identification scheme for partners, businesses, and members (such as DUNS+4), and so on, of an administering organization (such as EAN, DUNS, and SWIFT) that is listed in the listAgencySchemeAgencyID.

The listAgencySchemeAgencyID is the ID of the managing organization (for example, DUNS, EAN, SWIFT) that is responsible for identification of the organization listed in the listAgencyID. It has to be listed in DE 3055.

In some implementations, the SetOfBooksCode may only be used in business objects and A2A messages. The set of books supports the integration between the general ledger and the subledgers as well as cost accounting and profitability analysis. The subledgers, cost accounting, and profitability analysis may be known to the set of books, and documents may be assigned to a single set of books.

The data type GDT SetOfBooksCode 35800MD may use the following codes: Tax Close (i.e., Set of books for tax purposes), Local Close (i.e., Set of books in compliance with local laws).

(kkkkkkkkkkkkkkkkkkkkkk) SourceOfSupplyBaseObjectTypeCode

A GDT SourceOfSupplyBaseObjectTypeCode 35800ME is a coded representation of the object a SourceOfSupply is based on. For example, a SourceOfSupply may be based on a business object or the part of a business object that is considered as source of supply in source of supply determination. The SourceOfSupply may copy the information that is relevant for source of supply determination from the business object or from the part of the business object that it is based on. An example of GDT SourceOfSupplyBaseObjectTypeCode 35800ME is:

<SourceOfSupplyBaseObjectTypeCode>1</SourceOfSupplyBaseObjectTypeCode>

The structure of GDT SourceOfSupplyBaseObjectTypeCode 35800ME is depicted in FIG. 358ME. For the GDT SourceOfSupplyBaseObjectTypeCode 35800ME, the Object Class is Source Of Supply_Base Object 35804ME, the Property is Type 35806ME, the Representation/Association is Code 35808ME, the Type is CCT 35810ME, the Type Name is Code 35812ME, and the Length is from one to two 35814ME. The remark 35818ME shows that the GDT SourceOfSupplyBaseObjectTypeCode 35800ME may be restricted.

The attributes of the data type GDT SourceOfSupplyBaseObjectTypeCode 35800ME are as follows: listID of "10401", listAgencyID of "310", and listVersionID is a version of the relevant code list. The data type GDT SourceOfSupplyBaseObjectTypeCode 35800ME may use the following codes: 1 (i.e., The source of supply is based on the valid materials of a transportation lane.), 2 (i.e., The source of supply is based on an item of a purchasing contract.), 3 (i.e., The source of supply is based on a purchasing contract.), 4 (i.e., The source of supply is based on a production model.), 5 (i.e., The source of supply is based on a released planning production model.).

(llllllllllllllllllllll) SourcesOfSupplySpecificationDetailLevelCode

A GDT SourcesOfSupplySpecificationDetailLevelCode 35800MF is a coded representation of the level of detail of data for sources of supply. Whether a certain source of supply or a group of sources of supply is specified depends on the level of detail. For example, something. An example of GDT SourcesOfSupplySpecificationDetailLevelCode 35800MF is:

```
<SourcesOfSupplySpecificationDetailLevelCode>1
</SourcesOfSupplySpecificationDetailLevelCode>
```

The structure of GDT SourcesOfSupplySpecificationDetailLevelCode 35800MF is depicted in FIG. 358MF. For the GDT SourcesOfSupplySpecificationDetailLevelCode 35800MF, the Object Class is Sources Of Supply Specification 35804MF, the Property is Detail Level 35806MF, the Representation/Association is Code 35808MF, the Type is CCT 35810MF, the Type Name is Code 35812MF, and the Length is one 35814MF. The remark 35818MF shows that the GDT SourcesOfSupplySpecificationDetailLevelCode 35800MF may be restricted.

A SupplyQuotaArrangement can be defined for a logistical relationship of a source of supply, for a specific source of supply, for all sources of supply that belong to a particular location or for all sources of supply that belong to a particular party. The SourcesOfSupplySpecificationLevelCode can for example be used to define this relationship.

The attributes of the data type GDT SourcesOfSupplySpecificationDetailLevelCode 35800MF are as follows: listID of "10399", listAgencyID of "310", and listVersionID is a version of the particular code list. The data type GDT SourcesOfSupplySpecificationDetailLevelCode 35800MF may use the following codes: 1 (i.e., A logistical relationship of a source of supply is specified. A logistical relationship is a relationship between two locations that is used to procure and produce products. It defines logistical characteristics.), 2 (i.e., A particular source of supply is specified.), 3 (i.e., All sources of supply are specified based on a location.), 4 (i.e., All sources of supply are specified based on a party.).

(mmmmmmmmmmmmmmmmmmmmmm) StreetName

A GDT StreetName 35800MG is a word or combination of words that describe(s) a street name. An example of GDT StreetName 35800MG is:

<StreetName>Dietmar-Hopp-Allee</StreetName>

The structure of GDT StreetName 35800MG is depicted in FIG. 358MG. For the GDT StreetName 35800MG, the Property is Street 35806MG, the Representation/Association is Name 35808MG, the Type is GDT 35810MG, the Type Name is Name 35812MG, the Length is from one to sixty 35814MG, the cardinality is zero or one 35816MG. The remark 35818MG shows that the GDT StreetName 35800MG may be restricted.

StreetName is not language dependent. The data type StreetName is used in postal addresses.

(nnnnnnnnnnnnnnnnnnnnn) SubledgerAccountChargeTypeCode

A GDT SubledgerAccountChargeTypeCode 35800MH is a coded representation of the type of debit or credit of a subledger account. An example of GDT SubledgerAccountChargeTypeCode 35800MH is:

<SubledgerAccountChargeTypeCode>1</SubledgerAccountChargeTypeCode>

The structure of GDT SubledgerAccountChargeTypeCode 35800MH is depicted in FIG. 358MH. For the GDT SubledgerAccountChargeTypeCode 35800MH, the Object Class is Subledger Account 35804MH, the Property is Charge_Type 35806MH, the Representation/Association is Code 35808MH, the Type is CCT 35810MH, the Type Name is Code 35812MH, and the Length is from one to three 35814MH. The remark 35818MH shows that the GDT SubledgerAccountChargeTypeCode 35800MH may be restricted.

SubledgerAccountChargeTypeCode is used to describe the type of debit or credit in different subledger accounts. The attributes of the data type GDT SubledgerAccountChargeTypeCode 35800MH are as follows: listID of "10112", listAgencyID of "310", and listVersionID is the version of the relevant code list. The data type GDT SubledgerAccountChargeTypeCode 35800MH may use the following codes: 1 (i.e., A credit on the subledger account that is not one of the types described by the other codes.), 2 (i.e., A debit on the subledger account.), 3 (i.e., A credit on the subledger account that resulted from a goods receipt.), 4 (i.e., A credit on the subledger account that resulted from a clearing run.).

(ooooooooooooooooooooooo) SupplyPlanningCostFunctionCode

A GDT SupplyPlanningCostFunctionCode 35800MI is a coded representation of a cost function in procurement planning. For example, the business cost function in procurement planning may group abstract costs for a particular quantity of a product. An example of GDT SupplyPlanningCostFunctionCode 35800MI is:

<SupplyPlanningCostFunctionCode>1</SupplyPlanningCostFunctionCode>

The structure of GDT SupplyPlanningCostFunctionCode 35800MI is depicted in FIG. 358MI. For the GDT SupplyPlanningCostFunctionCode 35800MI, the Object Class is Supply Planning_Cost Function 35801MI, the Representation/Association is Code 35804MI, the Type is CCT 35805MI, the Type Name is Code 35806MI, and the Length is from one to two 35807MI. The remark 35809MI shows that the GDT SupplyPlanningCostFunctionCode 35800MI may be restricted.

For the ListAgencyID 35810MI, the Category is Attribute (A) 35811MI, the Object Class is CodeListAgency 35812MI, the Property is Identification 35813MI, the Representation/Association is Identifier 35814MI, the Type is XSD 35815MI, the Type Name is Token 35816MI, and the Cardinality is zero or one 35818MI.

For the ListVersionID 35820MI, the Category is Attribute (A) 35821MI, the Object Class is CodeList 35822MI, the Property is Version 35823MI, the Representation/Association is Identifier 35824MI, the Type is XSD 35825MI, the Type Name is Token 35826MI, and the Cardinality is zero or one 35828MI.

For the ListAgency-SchemeID 35830MI, the Category is Attribute (A) 35831MI, the Object Class is CodeListAgency 35832MI, the Property is Scheme 35833MI, the Representation/Association is Identifier 35834MI, the Type is XSD 35835MI, the Type Name is Token 35836MI, and the Cardinality is zero or one 35838MI.

A customer-specific code list is assigned to the Code. The customer defines the codes in the code list. The attributes of Code are assigned values as follows: listID of 10393, listAgencyID of the ID of the SAP customer (ID from DE 3055 if listed there), listVersionID is assigned and managed by the customer, listAgencySchemeID is the ID of the scheme if the listAgencyID is not taken from DE 3055, listAgencySchemeAgencyID is the ID of the organization (taken from DE 3055) that manages the scheme of the listAgencySchemeID. In procurement planning, abstract costs can be assigned to sources of supply in order to weight these sources of supply. During source of supply determination, sources of supply can be selected on the basis of these costs. In the business configuration settings, cost function can be defined for the materials that are to be procured, for example. The SupplyPlanningCostFunctionCode is used to identify cost functions of this type. These costs are costs in an abstract sense. They are not costs from financial accounting or controlling. The data type GDT SupplyPlanningCostFunctionCode 35800MI may use the following codes: TransportMaterial A (i.e., Cost function for the transport of material A).

(pppppppppppppppppppppp) TaxDeclarationTypeCode

A GDT TaxDeclarationTypeCode 35800MJ is a coded representation of the type of a tax declaration. For example, a tax declaration may be the declaration to a tax authority of tax payables and tax receivables of a company. An example of GDT TaxDeclarationTypeCode 35800MJ is:

<TaxDeclarationTypeCode listID=21401>1</TaxDeclarationTypeCode>

The structure of GDT TaxDeclarationTypeCode 35800MJ is depicted in FIG. 358MJ. For the GDT TaxDeclarationTypeCode 35800MJ, the Object Class is Tax Declaration 35801MJ, the Property is Type 35803MJ, the Representation/Association is Code 35804MJ, the Type is CCT 35805MJ, the Type Name is Code 35806MJ, and the Length is from one to three 35807MJ. The remark 35809MJ shows that the GDT TaxDeclarationTypeCode 35800MJ may be restricted.

For the ListID 35810MJ, the Category is Attribute (A) 35811MJ, the Object Class is CodeList 35812MJ, the Property is Identification 35813MJ, the Representation/Association is Identifier 35814MJ, the Type is XSD 35815MJ, the Type Name is Token 35816MJ, and the Cardinality is zero or one 35818MJ.

Several fixed, country-specific code lists that are distinguished at runtime are assigned to the TaxDeclarationTypeCode. The two-character country code according to ISO-3166-1 is used in the code list name. The listAgencyID="310" (according to DE 3055) must be specified. The TaxDeclarationTypeCode specifies the type of tax declaration, and in this way defines implicitly which information is required and must be reported to the tax authority.

For DE, listID of "21401", and listAgencyID of "310", the data type GDT TaxDeclarationTypeCode 35800MJ may use the following codes: 1 (i.e., Periodic VAT declaration), 2 (i.e., Annual VAT declaration), 3 (i.e., Declaration of supplies to other EU Member States of goods that are subject to VAT), 4 (i.e., Declaration of withholding tax that must be withheld immediately on payment).

For US, listID of "21402", and listAgencyID of "310", the data type GDT TaxDeclarationTypeCode 35800MJ may use the following codes: 1 (i.e., Declaration of sales tax to the US state tax authorities), 2 (i.e., Income according to form "1099 Misc"), 3 (i.e., Income according to form "1042S"), 4 (i.e., Income according to form "10991NT"), 5 (i.e., Income according to form "1099G").

TaxDeclarationTypeCodeContextElements define a dependency or an environment in which the TaxDeclarationTypeCode appears. The environment is described by context categories. With the context categories in TaxDeclarationTypeCodeContext the valid set of code values of TaxDeclarationTypeCode is restricted according to an environment during use. The Country Code is a context category that defines the context country. This determines the valid code values for a specific country. The TaxTypeCode is a context category that defines the context tax type. This determines the valid code values for a specific tax type.

(qqqqqqqqqqqqqqqqqqqqqq) TaxExemption

A GDT TaxExemption 35800MK is a party's complete or partial exemption from a tax. An example of GDT TaxExemption 35800MK is:

```
<TaxExemption>
<CertificateID >49314159123</ CertificateID >
<ValidityPeriod >
<StartDate>2005-01-01</StartDate>
<EndDate>2005-12-31</EndDate>
</ValidityPeriod >
</TaxExemption>
```

The structure of GDT TaxExemption 35800MK is depicted in FIG. 358MK. For the GDT TaxExemption 35800MK, the Object Class is Tax Exemption 35801MK and the Representation/Association is Details 35804MK.

For the CertificateID 35810MK, the Category is Element (E) 35811MK, the Object Class is Tax Exemption 35812MK, the Property Qualifier is Certificate 35817MK, the Property is Identification 35813MK, the Representation/Association is Identifier 35814MK, the Type is GDT 35815MK, the Type Name is TaxExemptionCertificateID 35816MK, and the Cardinality is one 35818MK.

For the ValidityPeriod 35820MK, the Category is Element (E) 35821MK, the Object Class is Tax Exemption 35822MK, the Property Qualifier is Validity 35827MK, the Property is Period 35823MK, the Representation/Association is DateTimePeriod 35824MK, the Type is GDT 35825MK, the Type Name is DateTimePeriod 35826MK, and the Cardinality is zero or one 35828MK.

For the Percent 35830MK, the Category is Element (E) 35831MK, the Object Class is Tax Exemption 35832MK, the Property is Exempt Amount 35833MK, the Representation/Association is Percent 35834MK, the Type is GDT 35835MK, the Type Name is Percent 35836MK, and the Cardinality is zero or one 35839MK.

For the Amount 35840MK, the Category is Element (E) 35841MK, the Object Class is Tax Exemption 35842MK, the Property is Exempt 35843MK, the Representation/Association is Amount 35844MK, the Type is GDT 35845MK, the Type Name is Amount 35846MK, and the Cardinality is zero or one 35848MK.

TaxExemption contains the following elements: CertificateID is the identifier of the tax exemption certificate provided by the tax authority, ValidityPeriod is the validity period of the tax exemption, Percent is the portion of the tax base rate that is exempt from tax and expressed as a percent, Amount is the portion of the tax base rate that is exempt from tax and expressed as an amount. Since tax exemption is based on a certain tax type, the tax type may result from the context in which the GDT is used. The GDT TaxExemption is used to report a tax exemption that may exist after tax determination. This GDT is also used for tax exemption at the business partner.

(rrrrrrrrrrrrrrrrrrrrr) TaxExemptionCertificateID

A GDT TaxExemptionCertificateID 35800ML is a unique identifier for a tax exemption certificate. For example, a tax exemption certificate may be a certificate that a tax authority issues for a certain party to grant this party a tax exemption. An example of GDT TaxExemptionCertificateID 35800ML is:

<TaxExemptionCertificateID>49314159123</TaxExemptionCertificateID>

The structure of GDT TaxExemptionCertificateID 35800ML is depicted in FIG. 358ML. For the GDT TaxExemptionCertificateID 35800ML, the Object Class is Tax Exemption Certificate 35804ML, the Property is Identification 35806ML, the Representation/Association is Identifier 35808ML, the Type is CCT 35810ML, the Type Name is Identifier 35812ML, and the Length is from one to thirty 35814ML.

Since a tax authority is responsible for issuing the identifier, this identifier is unique for a particular tax type within a specific country. The country and the tax type may be derived from the context in which the GDT is used. If necessary, the issuing tax authority may be identified. A company that is exempted from tax sends the tax exemption certificate to its suppliers, who then take this tax exemption into consideration when they invoice the company. In some countries the TaxExemptionCertificateID may be printed on invoices with tax exemption.

(sssssssssssssssssssssss) TaxExemptionReasonCode

A GDT TaxExemptionReasonCode 35800MM is a coded representation of the reason for a tax exemption. For example, something. An example of GDT TaxExemptionReasonCode 35800MM is:

```
<TaxExemptionReasonCode listID="21501" listAgencyID="310">
01
</TaxExemptionReasonCode>
```

The structure of GDT TaxExemptionReasonCode 35800MM is depicted in FIG. 358MM. For the GDT TaxExemptionReasonCode 35800MM, the Object Class is Tax Exemption 35801MM, the Property is Reason 35803MM, the Representation/Association is Code 35804MM, the Type is CCT 35805MM, the Type Name is Code 35806MM, and the Length is from one to three 35807MM. The remark 35809MM shows that the GDT TaxExemptionReasonCode 35800MM may be restricted.

For the ListID 35810MM, the Category is Attribute (A) 35811MM, the Object Class is CodeList 35812MM, the Property is Identification 35813MM, the Representation/Association is Identifier 35814MM, the Type is XSD 35815MM, the Type Name is Token 35816MM, the Length is from one to forty 35817MM, and the Cardinality is one 35818MM.

For the ListAgencyID 35820MM, the Category is Attribute (A) 35821MM, the Object Class is CodeListAgency 35822MM, the Property is Identification 35823MM, the Representation/Association is Identifier 35824MM, the Type is XSD 35825MM, the Type Name is Token 35826MM, the Length is from one to three 35827MM, and the Cardinality is zero or one 35828MM.

Several fixed, country-specific code lists that are distinguished at runtime are assigned to the TaxExemptionReasonCode. Information on the reason for the tax exemption may be needed for certain legally required tax declarations, for example. The code lists can contain official, legally specified codes and other codes. For the US tax authority IRS (US, listID of "21501", listAgencyID of "310") the data type GDT TaxExemptionReasonCode 35800MM may use the following legally required codes: 1 (i.e., Income effectively connected with a U.S. trade or business), 2 (i.e., Exempt under an Internal Revenue Code section, income other than portfolio interest), 3 (i.e., Income is not from U.S. sources), 4 (i.e., Exempt under tax treaty), 5 (i.e., Portfolio interest exempt under an Internal Revenue Code section), 6 (i.e., Qualified intermediary that assumes primary withholding responsibility), 7 (i.e.; Withholding foreign partnership or withholding foreign trust), 8 (i.e., U.S. branch treated as a U.S. person), 9 (i.e., Qualified intermediary represents income is exempt), 99 (i.e., Special), 00 (i.e., Special).

(ttttttttttttttttttttt) ExpenseReportLocationCategoryCode

A GDT ExpenseReportLocationCategoryCode 35800MN is the coded representation of the category of a location based on its meaning in an expense report. An example of the GDT ExpenseReportLocationCategoryCode 35800MN is:

<ExpenseReportLocationCategoryCode>1</ExpenseReportLocationCategoryCode>

The structure of GDT ExpenseReportLocationCategoryCode 35800MN is depicted in FIG. 358MN. For the GDT ExpenseReportLocationCategoryCode 35800MN, the Object Class term is Expense Report Location 35802MN, the Property term is Category 35804MN, the Representation/Association term is Code 35808MN, the Type term is CCT 35808MN, the Type Name term is Code 35810MN, and the Length is from one to fifteen 35812MN. The ExpenseReportLocationCategoryCode 35800MN may be restricted 35814MN.

In some variations, the value range of ExpenseReportLocationCategoryCode (listID="10169") can consist of a customer-specific code list. In some implementations, the ExpenseReportLocationCategoryCode 35800MN can currently be used only in business objects. Some examples of ExpenseReportLocationCategoryCodes 35800MN are at home, representing a city of the residence of the expense reporter, and work center, representing a city of the permanent work center of the expense reporter.

(uuuuuuuuuuuuuuuuuuuuuu) TradeReceivablesPayablesRegisterGroupingCriterionCode

A GDT TradeReceivablesPayablesRegisterGroupingCriterionCode 35800MO is a coded representation of a criterion to group trade receivables and payables from goods and services. An example of GDT TradeReceivablesPayablesRegisterGroupingCriterionCode 35800MO is:

<TradeReceivablesPayablesRegisterGroupingCriterionCode>1</TradeReceivablesPayablesRegisterGroupingCriterionCode>

The structure of GDT TradeReceivablesPayablesRegisterGroupingCriterionCode 35800MO is depicted in FIG. 358MO. For the GDT TradeReceivablesPayablesRegisterGroupingCriterionCode 35800MO, the Object Class is Trade Receivables Payables Register 35801MO, the Property is Grouping Criterion 35803MO, the Representation/Association is Code 35804MO, the Type is CCT 35805MO, the Type Name is Code 35806MO, and the Length is from one to two 35807MO. The remark 35809MO shows that the GDT TradeReceivablesPayablesRegisterGroupingCriterionCode 35800MO may be restricted.

For the ListAgencyID 35810MO, the Category is Attribute (A) 35811MO, the Object Class is CodeListAgency 35812MO, the Property is Identification 35813MO, the Representation/Association is Identifier 35814MO, the Type is XSD 35815MO, the Type Name is Token 35816MO, and the Cardinality is zero or one 35818MO.

For the ListVersionID 35820MO, the Category is Attribute (A) 35821MO, the Object Class is CodeList 35822MO, the Property is Version 35823MO, the Representation/Association is Identifier 35824MO, the Type is XSD 35825MO, the Type Name is Token 35826MO, and the Cardinality is zero or one 35828MO.

For the ListAgency-SchemeID 35830MO, the Category is Attribute (A) 35831MO, the Object Class is CodeListAgency 35832MO, the Property is Scheme 35833MO, the Representation/Association is Identifier 35834MO, the Type is XSD 35835MO, the Type Name is Token 35836MO, and the Cardinality is zero or one 35838MO.

For the ListAgency-SchemeAgencyID 35840MO, the Category is Attribute (A) 35841MO, the Object Class is CodeListAgency 35842MO, the Property is SchemeAgency 35843MO, the Representation/Association is Identifier 35844MO, the Type is XSD 35845MO, the Type Name is Token 35846MO, and the Cardinality is zero or one 35848MO.

An extendable code list is assigned to the TradeReceivablesPayablesRegisterGroupingCriterionCode. Customers can change this code list. In its unchanged state, the code list has the following attributes: listID of "10252", listAgencyID of "310", listVersionID is a version of the relevant code list. If a customer makes changes to the code list, the values assigned to the attributes change as follows: listAgencyID is the ID of the customer (ID from DE 3055 if listed there), listVersionID is assigned and managed by the customer, listAgencySchemeID is the ID of the scheme if the listAgencyID is not taken from DE 3055, listAgencySchemeAgencyID is the ID of the organization (taken from DE 3055) that manages the scheme of the listAgencySchemeID.

A TradeReceivablesPayablesRegisterGroupingCriterionCode is used to define further grouping criteria in addition to the process-specific grouping criteria for open items. Existing attributes of the business object TradeReceivablesPayablesRegister can be used. Process-specific grouping criteria are grouping criteria that may be considered within a business process for a grouping. Examples of process-specific grouping criteria with an open item are payment recipient and payment sender. During the grouping of open items, open items that match in grouping criteria are summarized. There can be a default TradeReceivablesPayablesRegisterGroupingCriterionCode in a company. An alternative TradeReceivablesPayablesRegisterGroupingCriterionCode can be entered for individual business partners (for example, a grouping by contracts at specific customers).

The data type GDT TradeReceivablesPayablesRegisterGroupingCriterionCode 35800MO may use the following codes: 1 (i.e., Grouping by contract).

(vvvvvvvvvvvvvvvvvvvvvvv) TransportationZoneID

A GDT TransportationZoneID 35800MP is a unique identifier for a TransportationZone. For example, a TransportationZone may be a zone containing geographical locations that may be considered collectively for modelling or planning transportation routes or transportations. An example of GDT TransportationZoneID 35800MP is:

<TransportationZoneID>DE-POSTAL3-691XX</TransportationZoneID>

The structure of GDT TransportationZoneID 35800MP is depicted in FIG. 358MP. For the GDT TransportationZoneID 35800MP, the Object Class is TransportationZone 35804MP, the Property is Identification 35806MP, the Representation/Association is Identifier 35808MP, the Type is CCT 35810MP, the Type Name is Identifier 35812MP, and the Length is from one to twenty 35814MP. The remark 35818MP shows that the GDT TransportationZoneID 35800MP may be restricted.

(wwwwwwwwwwwwwwwwwwwwwww) WorkAgreementTypeCode

A GDT WorkAgreementTypeCode 35800MQ is a coded representation of the type of a work agreement, differentiated by the rights and obligations of the employer and the employee. An example of GDT WorkAgreementTypeCode 35800MQ is:

<WorkAgreementTypeCode>5</WorkAgreementTypeCode>

The structure of GDT WorkAgreementTypeCode 35800MQ is depicted in FIG. 358MQ. For the GDT WorkAgreementTypeCode 35800MQ, the Object Class is WorkAgreement 35804MQ, the Property is Type 35806MQ, the Representation/Association is Code 35808MQ, the Type is CCT 35810MQ, the Type Name is Code 35812MQ, and the Length is from one to four 35814MQ. The remark 35818MQ shows that the GDT WorkAgreementTypeCode 35800MQ may be restricted.

The classification of work agreements into work agreement types is required, for example, for headcount recording purposes. The WorkAgreementTypeCode is a code list with fixed predefined values: listID of "10091", listAgencyID of "310", and listVersionID is a version of the relevant code list. The data type GDT WorkAgreementTypeCode 35800MQ may use the following codes: 1 (i.e., A permanent work agreement entered into by employer and employee. The agreement terminates upon notice, dismissal, death, or retirement.), 2 (i.e., A work contract entered into by employer and employee for a fixed term.), 3 (i.e., The executive contract regulates the internal terms of service between the senior executive and the company, in other words, the conditions of the employment relationship.), 4 (i.e., The training agreement regulates the company traineeship and is entered into by the company and the trainee.), 5 (i.e., This agreement regulates the rights and obligations of student workers, including students of vocational schools. A prerequisite for a student worker agreement is that the student is a full-time student and only a part-time worker.), 6 (i.e., The retirement agreement regulates the benefits provided by the employer to the employee on reaching retirement age.).

(xxxxxxxxxxxxxxxxxxxxxxx) WorkingDayCalendarcode

A GDT WorkingDayCalendarCode 35800MR is a coded representation of a working day calendar. For example, a working day calendar may specify the working and non workings days in a region or country. It may consider public holidays and general working days in a week. An example of GDT WorkingDayCalendarCode 35800MR is:

<WorkingDayCalendarCode>1</WorkingDayCalendar-Code>

The structure of GDT WorkingDayCalendarCode 35800MR is depicted in FIG. 358MR. For the GDT WorkingDayCalendarCode 35800MR, the Object Class is WorkingDayCalendar 35801MR, the Representation/Association is Code 35804MR, the Type is CCT 35805MR, the Type Name is Code 35806MR, and the Length is from one to six 35807MR. The remark 35809MR shows that the GDT WorkingDayCalendarCode 35800MR may be restricted.

For the ListID 35810MR, the Category is Attribute (A) 3581 1MR, the Object Class is CodeList 35812MR, the Property is Identification 35813MR, the Representation/Association is Identifier 35814MR, the Type is XSD 35815MR, the Type Name is Token 35816MR, and the Cardinality is zero or one 35818MR.

For the ListAgencyID 35820MR, the Category is Attribute (A) 35821MR, the Object Class is CodeListAgency 35822MR, the Property is Identification 35823MR, the Representation/Association is Identifier 35824MR, the Type is XSD 35825MR, the Type Name is Token 35826MR, and the Cardinality is zero or one 35828MR.

For the ListVersionID 35830MR, the Category is Attribute (A) 35831MR, the Object Class is CodeList 35832MR, the Property is Version 35833MR, the Representation/Association is Identifier 35834MR, the Type is XSD 35835MR, the Type Name is Token 35836MR, and the Cardinality is zero or one 35838MR.

For the ListAgency-SchemeID 35840MR, the Category is Attribute (A) 35841MR, the Object Class is CodeListAgency 35842MR, the Property is Scheme 35843MR, the Representation/Association is Identifier 35844MR, the Type is XSD 35845MR, the Type Name is Token 35846MR, and the Cardinality is zero or one 35848MR.

For the ListAgency-SchemeAgencyID 35850MR, the Category is Attribute (A) 35851MR, the Object Class is CodeListAgency 35852MR, the Property is SchemeAgency 35853MR, the Representation/Association is Identifier 35854MR, the Type is XSD 35855MR, the Type Name is Token 35856MR, and the Cardinality is zero or one 35858MR.

The attribute listAgencySchemeID and listAgencySchemeAgencyID can be omitted if the publishers of the code lists are listed in DE 3055. The attribute listVersionID can be omitted if the code lists are not versioned. An extensible code list is assigned to the code. A customer can replace this code list with their own. If the code list remains unchanged, the attributes are assigned the following values: listID is the ID of the particular code list assigned by the Coaching Team, listAgencyID of "310", listVersionID is the version of the particular code list. If a customer creates their own code list, the values assigned to the attributes change as follows: listAgencyID is the ID of the customer (ID from DE 3055, if listed there), listVersionID is the version of the particular code list, listAgencySchemeID is the ID of the scheme if the listAgencyID does not come from DE 3055, listAgencySchemeAgencyID is the ID of the organization from DE 3055 that manages the listAgencySchemeID scheme.

WorkingDayCalendarCode is used when the handling of working and non working days is needed. The WorkingDayCalendarCode is used to identify the definition of a working day calendar as well as the runtime object that allows performing calculations. In some Systems the Working Day Calendar identifies a Factory Calendar.

The data type GDT WorkingDayCalendarCode 35800MR may use the following codes: US (i.e., Working days are Mon-Fri, not on US public holidays).

(yyyyyyyyyyyyyyyyyyyyyyy) ExpenseTypeExpenseReporterGroupCode

A GDT ExpenseTypeExpenseReporterGroupCode 35800MV is the coded representation of a group of expense reporters, whereby the group is based on the expense types allowed for the expense report. An example of the GDT ExpenseTypeExpenseReporterGroupCode 35800MV is:

<ExpenseTypeExpenseReporterGroupCode>1</ExpenseTypeExpenseReporterGroupCode>

The structure of GDT ExpenseTypeExpenseReporterGroupCode 35800MV is depicted in FIG. 358MV. For the GDT ExpenseTypeExpenseReporterGroupCode 35800MV, the Object Class term is Expense Type Expense Reporter Group 35802MV, the Representation/Association term is Code 35804MV, the Type term is CCT 35806MV, the Type Name term is Code 35808MV, and the Length is one 35810MV. The ExpenseTypeExpenseReporterGroupCode 35800MV may be restricted 35812MV.

In some implementations, a customer-specific code list can be assigned to the ExpenseTypeExpenseReporterGroupCode 35800MV. A customer can define the codes in the code list.

As an example, the customer can set the Attribute of the GDT ExpenseTypeExpenseReporterGroupCode 35800MV to be:

listID=10282 listAgencyID—ID of the customer listVersionID—Assigned and managed by the customer listAgencySchemeID—ID of the scheme listAgencySchemeAgencyID—ID of the organization that manages the scheme of the listAgencySchemeID In some variations, the ExpenseTypeExpenseReporterGroupCode 35800MV can currently be used only in business objects. Some examples of ExpenseTypeExpenseReporterGroupCodes are expense reporters who are not allowed to submit entertainment receipts, and expense reporters who are allowed to submit receipts of all expense types.

(zzzzzzzzzzzzzzzzzzzzzzz) FindingTypeCode

A GDT FindingTypeCode 35800MW is a coded representation of the type of a finding. A finding is the result of an examination in the context of an inspection. The inspection can, for example, be a material inspection. An example of the GDT FindingTypeCode 35800MW is:

<FindingTypeCode>2</FindingTypeCode>

The structure of GDT FindingTypeCode 35800MW is depicted in FIG. 358MW. For the GDT FindingTypeCode 35800MW, the Object Class term is Finding 35802MW, the Property term is Type 35804MW, the Representation/Association term is Code 35806MW, the Type term is CCT 35808MW, the Type Name term is Code 35810MW, and the Length is from one to fifteen 35812MW. The GDT FindingTypeCode 35800MW may be restricted 35814MW.

In some variations, the GDT FindingTypeCode 35800MW can be a customer-specific code list. Examples of the possible semantics of codes, as well as an example code list are contained in section 1.1.7 Use. The attributes listID ("10162"), listAgencyID, listVersionID, listAgencySchemeID, listAgencySchemeAgencyID are missing from the structure, as they were reserved for customer-specific values during the runtime.

In some variations, the FindingTypeCode 35800MW can be used for the definition and delimitation of a finding type. It describes the properties required to record findings. These properties include the assignment of a code list or a number range assignment. Some examples of possible code values are Goods receipt finding, representing finding for a goods receipt inspection for delivered materials, Invoice finding, representing finding for cases where there is a discrepancy in an invoice, and complaint finding, representing finding for a customer complaint due to a defect in a product.

(aaaaaaaaaaaaaaaaaaaaaaa) FixedAssetCalculationPeriodID

A GDT FixedAssetCalculationPeriodID 35800MX is a unique ID for a calculation period in Asset Accounting within a fiscal year. The FixedAssetCalculationPeriodID 35800MX is used to divide the fiscal year into calculation periods for value calculation in Asset Accounting. The calculation periods can be different to the posting periods of Financial Accounting. An example (Instance) of the GDT FixedAssetCalculationPeriodID 35800MX is:

<FixedAssetCalculationPeriodID>123</FixedAssetCalculationPeriodID>

The structure of GDT FixedAssetCalculationPeriodID 35800MX is depicted in FIG. 358MX. For the GDT FixedAssetCalculationPeriodID 35800MX, the Object Class term is Fixed Asset Calculation Period 35802MX, the Property term is Identification 35804MX, the Representation/Association term is Identifier 35806MX, the Type term is CCT 35808MX, the Type Name term is Identifier 35810MX, and the Length is from one to three 35812MX. The GDT FixedAssetCalculationPeriodID 35800MX may be restricted 35814MX.

In some variations, the GDT FixedAssetCalculationPerioDID 35800MX may be represented by a positive three-digit number. For example, the value range is from 1 to 366. The GDT FixedAssetCalculationPeriodID 35800MX can currently be used only in business objects.

(bbbbbbbbbbbbbbbbbbbbbbb) FixedAssetClassCode

A GDT FixedAssetClassCode 35800NA is the coded representation of a fixed asset class. The fixed asset class is a classification of fixed assets (FixedAssets) according to their type of valuation using fixed asset valuation views (FixedAssetValuationViews). This is the main criterion in the grouping of fixed assets in accordance with business criteria and legal requirements. An example of the GDT FixedAssetClassCode 35800NA is:

<FixedAssetClassCode>3000</FixedAssetClassCode>

The structure of GDT FixedAssetClassCode 35800NA is depicted in FIG. 358NA. For the GDT FixedAssetClassCode 35800NA, the Object Class term is Fixed Asset 35802NA, the Property term is Class 35804NA, the Representation/Association term is Code 35806NA, the Type term is CCT 35808NA, the Type Name term is Code 35810NA, and the Length is from one to eight 35812NA. The GDT FixedAssetClassCode 35800NA may be restricted 35814NA.

In some implementations, a customer-specific code list can be assigned to the FixedAssetClassCode 35800NA. A customer can define the codes in the code list.

The attributes of the FixedAssetValuationViewCode 35800NA are not required because they would be assigned to constant values in a customer system at runtime. For example, they can be implicitly assigned in the following way:

listID="10142"

In some implementations, the FixedAssetClassCode can be used only in Business Object models. Some examples of possible codes are Buildings, Data processing/hardware, and Machines with the declining-balance method of depreciation.

(ccccccccccccccccccccccc) FixedAssetID

A GDT FixedAssetID 35800NB is an ID for a fixed asset in the fixed assets of a company (Company). A fixed asset that is a view, defined for the purposes of Financial Accounting, of usually one or more physical object, rights or other economic goods belonging to a company. These are in long-term use, are recognized in the financial statements at closing, and must be individually identifiable. It also includes the recording of the values for this view. An example (Instance) of the GDT FixedAssetID 35800NB is:

<FixedAssetID>1</FixedAssetID>

The structure of GDT FixedAssetID 35800NB is depicted in FIG. 358NB. For the GDT FixedAssetID 35800NB, the Object Class term is Fixed Asset 35802NB, the Property term is Identification 35804NB, the Representation/Association term is Identifier 35806NB, the Type term is CCT 35808NB, the Type Name term is Identifier 35810NB, and the Length is from one to four 35812NB. The GDT FixedAssetID 35800NB may be restricted 35814NB.

In some variations, the FixedAssetID 35800NB can be uniquely identified by the MasterFixedAssetID from one or several fixed assets in the context of the company (Company) and of a business unit. The fixed asset has a unique number in a company (Company). This number has two parts—a main part and a sub-part (MasterFixedAssetID and FixedAssetID) The user can use these parts to group fixed assets semantically. Using the FixedAssetID 35800NB it is possible to manage subsequent acquisitions for a fixed asset separately represent comprehensive complex fixed assets using sub-assets.

(ddddddddddddddddddddddd) FixedAssetValuationViewCode

A GDT FixedAssetValuationViewCode 35800NC is the coded representation of a fixed asset valuation view. A fixed asset valuation view is a legally stipulated or calculation for cost accounting view for the valuation of a part of fixed assets in a set of books. An example (Instance) of the GDT FixedAssetValuationViewCode 35800NC is:

<FixedAssetValuationViewCode>1</FixedAssetValuationViewCode>

The structure of GDT FixedAssetValuationViewCode 35800NC is depicted in FIG. 358NC. For the GDT FixedAssetValuationViewCode 35800NC, the Object Class term is Fixed Asset 35802NC, the Property term is Valuation View 35804NC, the Representation/Association term is Code 35806NC, the Type term is CCT 35808NC, the Type Name term is Code 35810NC, and the Length is from one to six 35812NC. The GDT FixedAssetValuationViewCode 35800NC may be restricted 35814NC.

In some variations, a customer-specific code list can be assigned to the FixedAssetValuationViewCode 35800NC. A customer can define the codes in the code list. The attributes of the FixedAssetValuationViewCode 35800NC may not be required because they would be assigned to constant values in a customer system at runtime. They are implicitly assigned in the following way:

listID="10143"

The FixedAssetValuationViewCode 35800NC is used only in the business object models and in configuration. Some examples of possible codes are:

GCC—valuation view for fixed assets in accordance with the German Commercial Code (GCC).

GCC Tax—valuation view for fixed assets in accordance with the Germany Commercial Code (GCC) taking account of the tax law.

GCC Calc—calculation for cost accounting valuation view for internal Accounting.

IAS Group Valuation—valuation view for fixed assets in accordance with the International Accounting Standard (IAS) for parallel valuation.

In many countries, in the local set of books, in addition to balance sheet-relevant reporting of fixed assets, another type of reporting is required for tax purposes. This is based on the same acquisition and production costs, however there are different depreciation methods. As these are local requirements and the identification of the acquisition and production costs is necessary for the local financial statements, this data must be managed in the same set of books and is distinguished by the fixed asset valuation view.

(eeeeeeeeeeeeeeeeeeeeeeee) FromOfAddressCode

A GDT FromOfAddressCode 35800ND is the coded representation of a form of address. An example of the GDT FromOfAddressCode 35800ND is:

<FormOfAdressCode listAgencyID=310>0001</FormOfAdressCode>

The structure of GDT FormOfAddressCode 35800ND is depicted in FIG. 358ND. The GDT FormOfAddressCode 35800ND includes attributes listID 35816ND, listAgencyID 35832ND, listVersionID 35848ND, listAgencySchemeID 35864ND, and listAgencySchemeAgencyID 35880ND. For the GDT FormOfAddressCode 35800ND, the Object Class term is Person 35802ND, the Property term is Form of Address 35804ND, the Representation/Association term is Code 35806ND, the Type term is CCT 35808ND, the Type Name term is Code 35810ND, and the Length is either one or four 35812ND.

For the listID 35816ND, the Category is Attribute 35818ND, the Object Class term is CodeList 35820ND, the Property term is Identification 35822ND, the Representation/Association term is Identifier 35822ND, the Type term is xsd 35826ND, and the Type Name term is token 35828ND. The cardinality between the listID 35816ND and the GDT ProductUsageCode 35800ND is either zero or one 35830ND.

For the listAgencyID 35832ND, the Category is Attribute 35834ND, the Object Class term is CodeListAgency 35836ND, the Property term is Identification 35838ND, the Representation/Association term is Identifier 35840ND, the Type term is xsd 35842ND, and the Type Name term is token 35844ND. The Cardinality between the listAgencyID 35832ND and the GDT FormOfAddressCode 35800ND is either zero or one 35846ND.

For the listVersionID 35848ND, the Category is Attribute 35850ND, the Object Class term is CodeList 35852ND, the Property term is Version 35854ND, the Representation/Association term is Identifier 35856ND, the Type term is xsd 35858ND, and the Type Name term is token 35860ND. The cardinality between the listVersionID 35848ND and the GDT FormOfAddressCode 35800ND is either zero or one 35862ND.

For the listAgencySchemeID 35864ND, the Category is Attribute 35866ND, the Object Class term is CodeListAgency 35868ND, the Property term is Scheme 35870ND, the Representation/Association term is Identifier 35872ND, the Type term is xsd 35874ND, and the Type Name term is token 35876ND. The cardinality between the listAgencySchemeID 35864ND and the GDT FormOfAddressCode 35800ND is either zero or one 35878ND.

For the listAgencySchemeAgencyID 35880ND, the Category is Attribute 35882ND, the Object Class term is CodeListAgency 35884ND, the Property term is SchemeAgency 35886ND, the Representation/Association term is Identifier 35888ND, the Type term is xsd 35890ND, and the Type Name term is token 35892ND. The cardinality between the listAgencySchemeAgencyID 35880ND and the GDT FormOfAddressCode 35800ND is either zero or one 35894ND.

In some variations, an extendable code list can be assigned to the FormOfAddressCode 35800ND. Customers can change this code list. In its unchanged state, the code list may have, for example, the following attributes:

listID="10120"

listAgencyID="310"

listVersionID=Version of the relevant code list

If a customer makes changes to the assigned code list, the values of the attributes are changed as follows:

listAgencyID—ID of the SAP customer (ID from DE 3055 if listed there)

listVersionID—Assigned and managed by the SAP customer listAgencySchemeID—ID of the scheme if the listAgencyID is not taken from DE 3055 listAgencySchemeAgencyID—ID of the organization (taken from DE 3055) that manages the scheme of the listAgencySchemeID In some variations, the GDT FormOfAdressCode 35800ND can be used for the form of address of a person, organization or group in addresses and business partners.

| Code | Name | Description |
|---|---|---|
| 0001 | Ms. | Ms. |
| 0002 | Mr. | Mr. |
| 0003 | Company | Company |
| 0004 | Mr. and Mrs. | Mr. and Mrs. |

(ffffffffffffffffffffffff) GeneralLedgerAccountTypeCode

A GDT GeneralLedgerAccountTypeCode 35800NE is the coded representation of the type of a G/L account. A G/L account is a structure for storing changes in value relating to assets, payables, stockholders' equity, revenues, or expenses of a company. A G/L account relates to exactly one item in a chart of accounts. G/L accounts are used essentially in the creation of financial statements. Examples of G/L accounts: Trade receivables or cumulated depreciation on buildings. An example of the GDT GeneralLedgerAccountTypeCode 35800NE is:

<GeneralLedgerAccountTypeCode>110</GeneralLedgerAccountTypeCode>

The structure of GDT GeneralLedgerAccountTypeCode 35800NE is depicted in FIG. 358NE. For the GDT GeneralLedgerAccountTypeCode 35800NE, the Object Class term is General Ledger Account 35802NE, the Property term is Type 35804NE, the Representation/Association term is Code 35806NE, the Type term is CCT 35808NE, the Type Name term is Code 35810NE, and the Length is from one to six 35812NE. The GDT GeneralLedgerAccountTypeCode 35800NE may be restricted 35814NE.

In some variations, he GeneralLedgerAccountTypeCode may be a customer-specific code list. Additinally, the attribute "listID" may be filled implicitly, for example, with "10110". The GeneralLedgerAccountTypeCode 35800NE is currently only used in business objects.

Some examples of the possible semantics of the codes are:

| | |
|---|---|
| Fixed Asset | Account for fixed assets |
| Inventory | Account for material inventories |
| Loans taken | Account for loans taken |
| Overhead Costs | Account for overhead costs |

The GeneralLedgerAccountTypeCode 35800NE can be used to subdivide the general ledger, such as into fixed asset accounts, accounts for material inventories, or accounts for overhead costs. The subdivision is more refined that the division into balance sheet accounts and accounts for the profit and loss statement. A GeneralLedgerAccountTypeCode 35800NE can be used to derive whether an account is an assets account or a liability account in the balance sheet or whether it is an expense account or a revenue account in the profit and loss statement.

(gggggggggggggggggggggggg) GeneralLedgerAccountID

A GDT GeneralLedgerAccountID 35800NF is an identifier for a G/L account.

A G/L account is a structure for storing changes in value relating to assets, payables, stockholders' equity, revenues, or expenses of a company. A G/L account relates to exactly one item in a chart of accounts. G/L accounts are used essentially in the creation of financial statements. Some examples of G/L accounts are Trade receivables or cumulated depreciation on buildings. An example (Instance) of the GDT GeneralLedgerAccountID 35800NF is:

<GeneralLedgerAccountID>400000</GeneralLedgerAccountID>

The structure of GDT GeneralLedgerAccountID 35800NF is depicted in FIG. 358NF. For the GDT GeneralLedgerAccountID 35800NF, the Object Class term is General Ledger Account 35802NF, the Property term is Type 35804NF, the Representation/Association term is Code 35806NF, the Type term is CCT 35808NF, the Type Name term is Code 35810NF, and the Length is from one to ten 35812NF. The GDT GeneralLedgerAccountID 35800NF may be restricted 35814NF.

In some implementations, a GeneralLedgerAccountID may be a character string not exceeding ten characters. A G/L account is identified uniquely by specifying, for example, a ChartOfAccountsID and a GeneralLedgerAccountID. Note, therefore, that the GeneralLedgerAccountID 35800NF is only unique in the context of the chart of accounts. For this reason, the GDT GeneralLedgerAccountReference containing both elements should usually be used to identify a G/L account.

If, however, the chart of accounts is known from the context (such as from a superordinate element), a G/L account can also be identified by specifying the GDT GeneralLedgerAccountID 35800NF on its own.

(hhhhhhhhhhhhhhhhhhhhhhhhh) GeneralLedgerMovementTypeCode

A GDT GeneralLedgerMovementTypeCode 35800NG is the coded representation of the type of movement on a G/L account within General Ledger Accounting.

<GeneralLedgerMovementTypeCode></GeneralLedgerMovementTypeCode>

The structure of GDT GeneralLedgerMovementTypeCode 35800NG is depicted in FIG. 358NG. For the GDT GeneralLedgerMovementTypeCode 35800NG, the Object Class term is General Ledger Account 35802NG, the Property term is Type 35804NG, the Representation/Association term is Code 35806NG, the Type term is CCT 35808NG, the Type Name term is Code 35810NG, and the Length is from one six 35812NG. The GDT GeneralLedgerMovementTypeCode 35800NG may be restricted 35814NG.

In some variations, the GDT GeneralLedgerMovementTypeCode 35800NG (listID="10394") can be a customer-specific code list.

The GDT GeneralLedgerMovementTypeCode 35800NG may currently only be used in business objects and A2A messages. Reporting requirements make it necessary for changes to the balance of certain G/L accounts to be represented at a greater level of refinement than as debit and credit. General ledger movement types describe movements from and to a G/L account in greater detail. Such details are required for the explanation of the difference between the opening balance and the closing balance of a given period. General ledger movement types always relate to the movement of the individual item of a business transaction and can therefore differ from one item to another item. Some examples of the possible semantics of the codes are:

| | |
|---|---|
| Increase | The inventory value increases due to an operational business transaction. |
| Decrease | The inventory value decreases due to an operational business transaction. |
| Write-up | The inventory value increases due to a valuation in accounting. |

The GDT GeneralLedgerMovementTypeCodes 35800 NG are related to DebitCreditTypeCodes (debit and credit) but are not subordinated to them hierarchically. Depending on the account to which the posting is made, increases/write-ups are usually posted in credit or debit, and decreases/depreciation are posted on the opposite side of the account. Furthermore, some legal requirements for specifying the DebitCreditTypeCodes may switch this relationship in some cases.

(iiiiiiiiiiiiiiiiiiiii) DueTypeCode

A GDT DueTypeCode 35800NH is the coded representation of the type of due item. A due item is a receivable or a payable. An example of the GDT DueTypeCode 35800NH is:

<DueTypeCode>PAYMT</DueTypeCode>

The structure of GDT DueTypeCode 35800NH is depicted in FIG. 358NH. The GDT DueTypeCode 35800NH includes attributes listID 35816NH, listAgencyID 35832NH, listVersionID 35848NH, listAgencySchemeID 35864NH, and listAgencySchemeAgencyID 35880NH. For the GDT DueTypeCode 35800NH, the Object Class term is Due 35802NH, the Property term is Type of Address 35804NH, the Representation/Association term is Code 35806NH, the Type term is CCT 35808NH, the Type Name term is Code 35810NH, and the Length is either one or four 35812NH.

For the listID 35816NH, the Category is Attribute 35818NH, the Object Class term is CodeList 35820NH, the Property term is Identification 35822NH, the Representation/Association term is Identifier 35822NH, the Type term is xsd 35826NH, and the Type Name term is token 35828NH. The cardinality between the listID 35816NH and the GDT ProductUsageCode 35800NH is either zero or one 35830NH.

For the listAgencyID 35832NH, the Category is Attribute 35834NH, the Object Class term is CodeListAgency 35836NH, the Property term is Identification 35838NH, the Representation/Association term is Identifier 35840NH, the Type term is xsd 35842NH, and the Type Name term is token 35844NH. The Cardinality between the listAgencyID 35832NH and the GDT DueTypeCode 35800NH is either zero or one 35846NH.

For the listVersionID 35848NH, the Category is Attribute 35850NH, the Object Class term is CodeList 35852NH, the Property term is Version 35854NH, the Representation/Association term is Identifier 35856NH, the Type term is xsd 35858NH, and the Type Name term is token 35860NH. The cardinality between the listVersionID 35848NH and the GDT DueTypeCode 35800NH is either zero or one 35862NH.

For the listAgencySchemeID 35864NH, the Category is Attribute 35866NH, the Object Class term is CodeListAgency 35868NH, the Property term is Scheme 35870NH, the Representation/Association term is Identifier 35872NH, the Type term is xsd 35874NH, and the Type Name term is token 35876NH. The cardinality between the listAgencySchemeID 35864NH and the GDT DueTypeCode 35800NH is either zero or one 35878NH.

For the listAgencySchemeAgencyID 35880NH, the Category is Attribute 35882NH, the Object Class term is CodeListAgency 35884NH, the Property term is SchemeAgency 35886NH, the Representation/Association term is Identifier 35888NH, the Type term is xsd 35890NH, and the Type Name term is token 35892NH. The cardinality between the listAgencySchemeAgencyID 35880NH and the GDT DueTypeCode 35800NH is either zero or one 35894NH.

In some variations, the DueTypeCode 35800NH is a customer-specific code. Only one code list is permitted for each administrative organization (agency). The attributes listID (="10338"), listAgencyID, listVersionID, listAgencySchemeID, listAgencySchemeAgencyID are filled during runtime with constant values that are customer-specific. The DueTypeCode 35800NH is used to distinguish between different types of trade payables and receivables. This makes it possible to have different views of the due items in the system.

The differentiation generated in this way can be used in Financial Accounting to display the due items for specific G/L accounts. The legal requirements of the respective country determine for which the DueTypeCodes 35800NH it is necessary to display the due items for specific GIL accounts. This is then specified in the configuration. Some examples of the possible semantics of the codes are an Invoice due item, which is an invoice due item is a due item that results from an invoice, a Payment due item, which is a payment due item is a due item that results from a payment, a Down payment due item, which is a down payment due item is a due item that results from a down payment (payment made before the service is provided), and a Security retention amount, which is a security retention amount is a due item resulting from an invoice of which a specific part cannot be paid to the payee and must be retained (due to legal regulations).

(jjjjjjjjjjjjjjjjjjjjjj) IdentityID

A GDT IdentityID 35800NI is an identifier for an Identity. An Identity is the combination of all user accounts of a person in a system landscape as well as of the settings required for system access and the associated user rights and restrictions. An example of the GDT IdentityID 35800NI is:

<IdentityID>ACHIMMUELLER</IdentityID>

The structure of GDT IdentityID 35800NI is depicted in FIG. 358NI. The GDT IdentityID 35800NI includes attributes SchemeID 35816NI, SchemeVersionID 35834NI, SchemeAgencyID 35852NI, schemeAgencySchemeID 35870NI, and SchemeAgencySchemeAgencyID 35886NI. For the GDT IdentityID 35800NI, the Object Class term is Identity 35802NI, the Property term is Identification 35804NI, the Representation/Association term is Identifier 35806NI, the Type term is CCT 35808NI, the Type Name term is Identifier 35810NI, the TypeName term is Identifier 35012NI, and the Length is from one to fourty 35812NI. The GDT IdentityID 35800NI may be restricted 35814NI.

For the schemeID 35816NI, the Category is Attribute 35818NI, the Object Class term is IdentificationScheme 35820NI, the Property term is Identification 35822NI, the Representation/Association term is Identifier 35824NI, the Type term is xsd 35826NI, and the Type Name term is Token 35828NI, and the Length is from one to sixty 35830NI. The cardinality between the schemeID 35816NI and the GDT IdentityID 35800NI is either zero or one 35832NI.

For the schemeVersionID 35834NI, the Category is Attribute 35836NI, the Object Class term is IdentificationScheme 35838NI, the Property term is Version 35840NI, the Representation/Association term is Identifier 35842NI, the Type term is xsd 35844NI, and the Type Name term is Token 35846NI, and the Length is from one to fifteen 35848NI. The cardinality between the schemeVersionID 35834NI and the GDT IdentityID 35800NI is either zero or one 35850NI.

For the schemeAgencyID 35852NI, the Category is Attribute 35854NI, the Object Class term is IdentificationSchemeAgency 35856NI, the Property term is Identification 35858NI, the Representation/Association term is Identifier 35860NI, the Type term is xsd 35862NI, and the Type Name term is Token 35864NI, and the Length is from one to sixty 35866NI. The cardinality between the schemeAgencyID 35852NI and the GDT IdentityID 35800NI is either zero or one 35868NI.

For the schemeAgencySchemeID 35870NI, the Category is Attribute 35872NI, the Object Class term is IdentificationSchemeAgency 35874NI, the Property term is Scheme 35876NI, the Representation/Association term is Identifier 35878NI, the Type term is xsd 35880NI, and the Type Name term is Token 35882NI, and the Length is from one to three 35883NI. The cardinality between the schemeAgencySchemeID 35870NI and the GDT IdentityID 35800NI is either zero or one 35884NI.

For the schemeAgencySchemeAgencyID 35886NI, the Category is Attribute 35888NI, the Object Class term is IdentificationSchemeAgency 35890NI, the Property term is Scheme Agency 35892NI, the Representation/Association term is Identifier 35894NI, the Type term is xsd 35896NI, and the Type Name term is Token 35897NI, and the Length is from one to three 35898NI. The cardinality between the schemeAgencySchemeAgencyID 35886NI and the GDT IdentityID 35800NI is either zero or one 35899NI.

In some variations, the values of the attributes of IdentityID 35800NI are assigned as follows:

schemeID—ID of the ID scheme. Released and maintained by the responsible organization of the ID scheme. The GDT owner must retrieve the correct ID from the responsible organization. If there is no unique ID available, the name of the identifier or identifier type must be entered, which is used in the corresponding standard, specification, or scheme of the responsible organization.

schemeVersionID—Version of the ID scheme. Released and maintained by the organization, which is named in schemeAgencyID. The owner must retrieve the relevant version ID from the responsible organization. If there is no version for the ID scheme, the version of the standard, the specification, or the scheme is used.

schemeAgencyID—ID of the organization maintaining the ID scheme. This identification is released by an organization contained in, for example, DE 3055 (e.g. DUNS, EAN . . . ).

schemeAgencySchemeID—the identification of the schema which identifies the organization named in schemeAgencyID. It's a certain scheme ID of partners, companies, members etc. (e.g. DUNS+4) of an organization named in schemeAgencySchemeAgencyID (Bsp. EAN, DUNS, SWIFT, etc.)

schemeAgencySchemeAgencyID—identification of the maintaining organization (e.g. DUNS, EAN, SWIFT, etc.) which is responsible for the identification of the organization named in schemeAgencyID.

An IdentityID 35800NI is used for logging on to internet transactions. It is optional and valid across several systems.

(kkkkkkkkkkkkkkkkkkkkkkkk) Incoterms

A GDT Incoterms 35800NJ are typical contract formulations for delivery conditions that correspond to the rules defined by the International Chamber of Commerce (ICC). An example of the GDT Incoterms 35800NJ is:

```
<Incoterms>
<ClassificationCode>FOB</ClassificationCode >
<TransferLocationName>Hamburg</TransferLocationName>
</Incoterms>
```

The structure of GDT Incoterms 35800NJ is depicted in FIG. 358NJ. The GDT Incoterms 35800NJ includes elements Classification Code 35806NJ and TransferLocation 35822NJ. For the GDT Incoterms 35800NJ, the Object Class term is Incoterms 35802NJ and the Representation/Association term is Details 35804NJ.

For the Classification Code 35806NJ, the Category is element 35808NJ, the Object Class term is Incoterms 35810NJ, the Property is Classification 35812NJ, the Representation/Association term is Code 35814NJ, the Type term is Code 35816NJ, and the Type Name term is Incoterms Classification Code 35818NJ. The Cardinality between the Classification Code 35806NJ and the GDT Incoterms 35800NJ is one 35820NJ. The Classification Code 35806NJ may be restricted 35821NJ.

For the TransferLocation 35822NJ, the Category is element 35824NJ, the Object Class term is Incoterms 35826NJ, the Property is TransferLocation 35828NJ, the Representation/Association term is Name 35830NJ, the Type term is GDT 35832NJ, the Type Name term is Incoterms Transfer Location Name 35834NJ, and the Length is from one to twenty-eight 35836NJ. The Cardinality between the Classification Code 35822NJ and the GDT Incoterms 35800NJ is from zero or one 35838NJ. The Classification Code 35806NJ may be restricted 35840NJ.

In some variations, the ClassificationCode may a coded representation of the internationally used abbreviation for characterizing delivery conditions, and the TransferLocationName may be Place (place, port of shipment, port of destination, place of destination) to which the above code refers, for example, the port of shipment in the case of FOB.

In some variations, the GDT Incoterms 35800NJ can be used when a purchase order is transferred, in order to specify delivery conditions to which the business partners have agreed.

(llllllllllllllllllllllll) IndividualMaterialInventoryID

A GDT IndividualMaterialInventoryID 35800NK is a unique ID for an individual material that is stocked as physical inventory. Not all individual material has to be stocked as inventory and have an inventory number. An example of the GDT IndividualMaterialInventoryID 35800NK is:

<IndividualMaterialInventoryID>669-ICK#15</IndividualMaterialInventoryID>

The structure of GDT IndividualMaterialInventoryID 35800NK is depicted in FIG. 358NK. For the GDT IndividualMaterialInventoryID 35800NK, the Object Class term is Individual Material 35802NK, the Property term is Inventory Identification 35804NK, the Representation/Association term is Identifier 35806NK, the Type term is CCT 35808NK, the Type Name term is Code 35810NK, and the Length is from one to twenty-five 35812NK. The GDT IndividualMaterialInventoryID 35800NK may be restricted 35814NK.

The IndividualMaterialInventoryID 35800NK is used only in Business Objects. In one example, the GDT IndividualMaterialInventoryID 35800NK may be used in inventory to report on the current stock (amounts and values) of the inventory. In another example, the GDT IndividualMaterialInventoryID 35800NK may be used in the Business Object Individual Material in addition to the ProductID as an alternative ID to show that it is stocked in the inventory.

(mmmmmmmmmmmmmmmmmmmmmmmm) ActivityGroupCode

A GDT ActivityGroupCode 35800NM is a group of activities grouped using subjective criteria. An activity is used in Activity Management, to document interactions with external business partners. Activities include receiving telephone calls, sending e-mails, and agreeing dates. An example of GDT ActivityGroupCode 35800NM is:

<ActivityGroupCode listAgencyId="310">1</ActivityGroupCode>

The structure of GDT ActivityGroupCode 35800NM is depicted in FIG. 358NM. For the GDT ActivityGroupCode 35800NM, the Object Class is Acitivity 35801NM, the Property is Group 35802NM, the Representation/Association is Code 35803NM, the Type is CCT 35804NM, the Type Name is Code 35805NM, and the Length is from one to four 35806NM. For listID, the category is A (Attribute) 35811NM, the object class is CodeList 35812NM, the property is Identification 35813NM, the Representation/Association is Identifier 35814NM, the type is xsd 35815NM, the type name is token 35816NM, and the cardinality is from zero to one 35818NM. For listAgencyID 35820NM, the category is A 35811NM, the object class is CodeListAgency 35822NM, the property is Identification 35823NM, the Representation/Association is Identifier 35824NM, the type is xsd 35825NM, the type name is token 35826NM, and the cardinality is from zero to one 35828NM. For listVersionID 35830NM, the category is A35831NM, the object class is CodeList35832NM, the property is Version 35833NM, the Representation/Association is Identifier 35834NM, the type is xsd 35835NM, the type name is token 35836NM, and the cardinality is from zero to one 35838NM. For listAgencySchemeID 35840NM, the category is A 35841NM, the object class is CodeListAgency 35842NM, the property is Scheme 35843NM, the Representation/Association is Identifier 35844NM, the type is xsd 35845NM, the type name is token 35846NM, and the cardinality is from zero to one 35848NM. For listAgencySchemeAgencyID 35850NM, the category is A 35851NM, the object class is CodeListAgency 35852NM, the property is SchemeAgency 35853NM, the Representation/Association is Identifier 35854NM, the type is xsd 35855NM, the type name is token 35856NM, and the cardinality is from zero to one 35858NM.

The data type GDT ActivityGroupCode 35800NM may use the following codes: 1 Miscellaneous (i.e. Other information), 2 Customer Care (i.e. Activities for maintaining existing customers) and 3 New Business (i.e. Activities for acquiring new customers). The attributes are used as follows:

listID—ID of corresponding code list assigned and managed by the organization responsible for the code list, which is not listed in DE 3055. The exact ID must be obtained by the GDT owner from the responsible organization;

listAgencyID—ID of the organization managing the code list. This ID is assigned by the organization based on DE 3055 (for example, a company's DUNS or EAN number). The relevant ID must be obtained by the GDT owner from the responsible organization;

listID—Version of corresponding code list assigned and managed by the organization specified in the listAgencyID. The relevant version ID must be obtained by the GDT owner from the responsible organization;

listAgencySchemeID—The scheme ID used to identify the organization specified in the listAgencyID; and listAgencySchemeAgencyID—The ID of the managing organization—for example, DUNS, EAN, SWIFT—that is responsible for identifying the organization specified in the listAgencyID.

The data type ActivityGroupCode is primarily used in reporting. The ActivityGroupCode should not be used for coding communication channels. A number of business objects are available to this end. A Miscellaneous category should be defined in addition to the defined categories.

An example for the possible semantics of customer-specific code is Key Customer where the ActivityGroupCode groups activities according to key customers. This code is based on the Category property of RFC2445.

(nnnnnnnnnnnnnnnnnnnnnnn) InspectionDynamicModificationRuleCode

A GDT InspectionDynamicModificationRuleCode 35800NN is a coded representation of a dynamic modification rule. For example, the dynamic modification rule contains the rules that regulate the dynamic modification of a particular inspection process. It contains all of the possible inspection stages for this process. Dynamic modification is used to reduce the scope of inspections and thereby reduce costs related to quality assurance. An example of the GDT InspectionDynamicModificationRuleCode 35800NN is:

```
<InspectionDynamicModificationRuleCode>3
</InspectionDynamicModificationRuleCode>
```

The structure of GDT InspectionDynamicModificationRuleCode 35800NN is depicted in FIG. 358NN. For the GDT InspectionDynamicModificationRuleCode 35800NN, the Object Class is Inspection Dynamic Modification Rule 35804NN, the Representation/Association is Code 35808NN, the Type is CCT 35810NN, the Type Name is Code 35812NN, and the Length is from one to fifteen 35814NN. The remark 35818NN shows that the GDT InspectionDynamicModificationRuleCode 35800NN may be restricted.

A customer-specific code list may be assigned to the GDT InspectionDynamicModificationCriterionCode 35800NN. A customer may define the codes in the code list. The attributes of the GDT InspectionDynamicModificationCriterionCode 35800NN may be assigned values as follows: listID="10146", listAgencyID—ID of the custome, listVersionID—Assigned and managed by customer, listAgencySchemeID—ID of the scheme, and listAgencySchemeAgencyID—ID of the organization that managed the scheme of the listAgencySchemeID.

(ooooooooooooooooooooooo) InspectionSampleSizeDeterminationTypeCode

A GDT InspectionSampleSizeDeterminationTypeCode 35800NO is a coded representation of a type of determination used to determine the sample size for an inspection. An example of the GDT InspectionSampleSizeDeterminationTypeCode 35800NO is:

```
<InspectionSampleSizeDeterminationTypeCode>2
</InspectionSampleSizeDeterminationTypeCode>
```

The structure of the GDT InspectionSampleSizeDeterminationTypeCode 35800NO is depicted in FIG. 358NO. For the GDT InspectionSampleSizeDeterminationTypeCode 35800NO, the Object Class is Inspection Sample Size Determination 35804NO, the Property is Type 35806NO, the Representation/Association is Code 35808NO, the Type is CCT 35810NO, the Type Name is Code 35812NO, and the Length is one 35814NO. The remark 35818NO shows that the GDT InspectionSampleSizeDeterminationTypeCode 35800NO may be restricted.

The GDT InspectionSampleSizeDeterminationTypeCode 35800NOCT consists of one fixed code list. The attributes contain the following values: listID="10096", listAgencyID="310", listVersionID—Version of the relevant code list. The InspectionSampleSizeDeterminationTypeCode 35800NOCT is used in the context of an inspection and provides information about how the sample size is determined.

The data type GDT InspectionSampleSizeDeterminationTypeCode 35800NO may use the following codes: 1 (i.e., the sample size is predefined with a fixed value), 2 (i.e., the sample size is calculated as a percentage of the inspection quantity), 3 (i.e., the sample size that is to be determined based on the sampling scheme), and 4 (i.e., the sample size is determined individually by the customer).

(ppppppppppppppppppppppp) InspectionSubsetTypeCode

A GDT InspectionSubsetTypeCode 35800NP is a coded representation of the type of a subset in the context of an inspection. An example of the GDT InspectionSubsetTypeCode 35800NP is:

<InspectionSubsetTypeCode>1</InspectionSubsetTypeCode>

The structure of the GDT InspectionSubsetTypeCode 35800NP is depicted in FIG. 358NP. For the GDT InspectionSubsetTypeCode 35800NP, the Object Class is InspectionSubsetType 35801NP the Representation/Association is Code 35804NP, the Type is XSD35805NP, the Type Name is Token 35806NP, and the Length is from one to three 35807NP. The remark 35809NP shows that the GDT InspectionSubsetTypeCode 35800NP may be restricted.

For the ListAgencyID 35810NP, the Category is Attribute (A) 35811NP, the Object Class is CodeListAgency 35812NP, the Property is Identification 35813NP, the Representation/Association is Identifier 35814NP, the Type is XSD 35815NP, the Type Name is Token 35816NP, and the Cardinality is zero or one 35818NP.

For the ListVersionID 35820NP, the Category is Attribute (A) 35821NP, the Object Class is CodeList 35822NP, the Property is Version 35823NP, the Representation/Association is Identifier 35824NP, the Type is XSD 35825NP, the Type Name is Token 35826NP, and the Cardinality is zero or one 35828NP.

For the ListAgency-SchemeID 35830NP, the Category is Attribute (A) 35831NP, the Object Class is CodeListAgency 35832NP, the Property is Scheme 35833NP, the Representation/Association is Identifier 35834NP, the Type is XSD 35835NP, the Type Name is Token 35836NP, and the Cardinality is zero or one 35838NP.

For the ListAgency-SchemeAgencyID 35840NP, the Category is Attribute (A) 35841NP, the Object Class is CodeListAgency 35842NP, the Property is SchemeAgency 35843NP, the Representation/Association is Identifier 35844NP, the Type is XSD 35845NP, the Type Name is Token 35846NP, and the Cardinality is zero or one 35848NP.

An extendable code list may be assigned to the code. The customers may replace lists with their own. In its unchanged state, the code list has the following attributes: listID="10406", listAgencyID="310", listVersionID=[Version of the relevant code list. If the customer creates a code list, the attributes change as follows: listAgencyID—ID of the customer, listVersionID—Assigned and managed by the customer, listAgencySchemeID—ID of the scheme, listAgencySchemeAgencyID—ID of the organization that manages the scheme of the listAgencySchemeID. The InspectionSubsetTypeCode describes the process in which the inspection quantity is to be divided into subsets and where this process takes place. In the context of a material inspection, for example, subsets may be formed in the goods receipt or goods issue processes.

The data type GDT InspectionSubsetTypeCode 35800NP may use the following codes: 1 (i.e., subsets are formed in the material inspection in the goods receipt process), and 2 (i.e., subsets are formed in the material inspection in the goods issue process).

(qqqqqqqqqqqqqqqqqqqqqqqq) LeadQualificationLevelCode

A GDT LeadQualificationLevelCode 35800NQ is a coded representation of the qualification level of a Lead. For example, a Lead is a business transaction that describes the potential or projected business interests of a business partner and the interactions based on this over a period of time. A qualification level is the result of the qualification process. The qualification process is the determination of the business partner's interest in a product, or the business partner's willingness to purchase a product; this takes place on the basis of collected information and different interactions with the business partner. An example of the GDT LeadQualificationLevelCode 35800NQ is:

<LeadQualificationLevelCode>1</LeadQualificationLevelCode>

The structure of the GDT LeadQualificationLevelCode 35800NQ is depicted in FIG. 358NQ. For the GDT LeadQualificationLevelCode 35800NQ, the Object Class is Lead 35804NQ, the Property is QualificationLevel 35806NQ, the Representation/Association is Code 35808NQ, the Type is CCT 35810NQ, the Type Name is Code 35812NQ, and the Length is from one to two 35814NQ. The remark 35818NQ shows that the GDT LeadQualificationLevelCode 35800NQ may be restricted.

A fixed code list may be assigned to the GDT LeadQualificationLevelCode 35800NQ. The attributes may be as follows: listID="10297", listAgencyID="310". The data type GDT LeadQualificationLevelCode 35800NQ may use the following codes: 1 (i.e., the customer has little potential interest), 2 (i.e., the customer has a potential interest), and 3 (i.e., the customer has a great potential interest).

(rrrrrrrrrrrrrrrrrrrrrrr) LegallyRequiredPhraseText

A GDT LegallyRequiredPhraseText 35800NR is a legally required phrase that must be printed on the invoice. An example of the GDT LegallyRequiredPhraseText 35800NR is:

<LegallyRequiredPhraseText>eine Phrase </LegallyRequiredPhraseText>

The structure of the GDT LegallyRequiredPhraseText 35800NR is depicted in FIG. 358NR. For the GDT LegallyRequiredPhraseText 35800NR, the Rep./Ass.Qual. is Legally Required Phrase 35806NR, the Representation/Association is Type 35808NR, the Type is GDT 35810NR, the Type Name is Text 35812NR, and the Length is from one to two hundred fifty five 35814NR.

The GDT LegallyRequiredPhraseText 35800NR may only be used within the GDT ProductTax.

(sssssssssssssssssssssss) LocationRoleCategoryCode

A GDT LocationRoleCategoryCode 35800NS is a coded representation of a LocationRoleCategory. For example, a LocationRoleCategory is a division of LocationRoles according to process-controlling criteria. A LocationRole with the same name exists for each LocationRoleCategory. An example of the GDT LocationRoleCategoryCode 35800NS is:

<LocationRoleCategoryCode>1</LocationRoleCategoryCode>

The structure of the GDT LocationRoleCategoryCode 35800NS is depicted in FIG. 358NS. For the GDT LocationRoleCategoryCode 35800NS, the Object Class is Location 35804NS, the Property is Role 35806NS, the Representation/Association is Code 35808NS, the Type is CCT 35810NS, the Type Name is Code 35812NS, and the Length is from one to three 35814NS.

A fixed code list may be assigned to the GDT LocationRoleCategoryCode 35800NS. The attributes may be as follows: listID="10300", listAgencyID="310", and listVersionID=Version of the relevant code list.

The data type GDT LocationRoleCategoryCode 35800NS may use the following codes: 1 (i.e., a ShipToLocation is a location to which the goods are to be delivered (in particular B2B communication)), 2 (i.e., a ShipFromLocation is a location from which the goods are to be delivered (in particular B2B communication)), 3 (i.e., a MeetingPlace is a location that specifies a meeting point), 4 (i.e., a ReceivingLocation is a location to which the goods are to be delivered (from a macro-logistic perspective)), 5 (i.e., a SendingLocation is a location from which the goods are to be delivered (from a macro-logistic perspective)), and 8 (i.e., a ServicePoint is a location at which a service is provided).

(ttttttttttttttttttttttt) LocationRoleCode

A GDT LocationRoleCode 35800NT is a coded representation of a LocationRole. For example, a LocationRole specifies the significance of the Location for a business objectGlobal Data Types—Definitionen and corresponding processes. A LocationRole is assigned to exactly one LocationRoleCategory and refines its semantics. An example of the GDT LocationRoleCode 35800NT is:

<LocationRoleCode>1</LocationRoleCode>

The structure of the GDT LocationRoleCode 35800NT is depicted in FIG. 358NT. For the GDT LocationRoleCode 35800NT, the Object Class is Location 35801NT, the Property is Role 35803NT, the Representation/Association is Code 35804NT, the Type is CCT 35805NT, the Type Name is Code 35806NT, and the Length is from one to ten 35807NT. The remark 35809NT shows that the GDT LocationRoleCode 35800NT may be restricted.

For the ListAgencyID 35810NT, the Category is Attribute (A) 35811NT, the Object Class is CodeListAgency 35812NT, the Property is Identification 35813NT, the Representation/Association is Identifier 35814NT, the Type is XSD 35815NT, the Type Name is Token 35816NT, and the Cardinality is zero or one 35818NT.

For the ListVersionID 35820NT, the Category is Attribute (A) 35821NT, the Object Class is CodeList 35822NT, the Property is Version 35823NT, the Representation/Association is Identifier 35824NT, the Type is XSD 35825NT, the Type Name is Token 35826NT, and the Cardinality is zero or one 35828NT.

For the ListAgency-SchemeID 35830NT, the Category is Attribute (A) 35831NT, the Object Class is CodeListAgency 35832NT, the Property is Scheme 35833NT, the Representation/Association is Identifier 35834NT, the Type is XSD 35835NT, the Type Name is Token 35836NT, and the Cardinality is zero or one 35838NT.

For the ListAgency-SchemeAgencyID 35840NT, the Category is Attribute (A) 35841NT, the Object Class is CodeListAgency 35842NT, the Property is SchemeAgency 35843NT, the Representation/Association is Identifier 35844NT, the Type is XSD 35845NT, the Type Name is Token 35846NT, and the Cardinality is zero or one 35848NT.

An extendable code list may be assigned to the GDT LocationRoleCode 35800NT. The customers may replace the lists with their own. In its unchanged state, the code list may have the following attributes: listID=10301, listAgencyID="310", llistVersionID=[Version of the relevant code list]. If a customer creates a code list, the attributes change as follows: listAgencyID—ID of the customer, listVersionID—Assigned and managed by the customer, listAgencySchemeID—ID of the scheme, and listAgencySchemeAgencyID—ID of the organization that manages the scheme of the listAgencySchemeID.

The data type GDT LocationRoleCode 35800NT may use the following codes: 1 (i.e., a ShipToLocation is a location to which a good is to be delivered), 2 (i.e., a ShipFromLocation is a location from which a good is to be delivered), 3 (i.e., a MeetingPlace is a location that specifies a meeting point), 4 (i.e., a ReceivingLocation is a location to which the goods are to be delivered (from a macro-logistic perspective)), 5 (i.e., A SendingLocation is a location from which the goods are to be delivered (from a macro-logistic perspective)), and 8 (i.e., a ServicePoint is a location at which a service is provided).

(uuuuuuuuuuuuuuuuuuuuuuuuu) MasterFixedAssetID

A GDT MasterFixedAssetID 35800NU identifies a business unit within a company from one or several fixed assets that are depreciated individually, but it must be possible to represent their values together and maintain their data together. The first fixed asset has a special role. The master data is maintained in it. This data can be copied to additional corresponding fixed assets. For example, a fixed asset that is a view, defined for the purposes of Financial Accounting, of usually one or more physical object, rights or other economic goods belonging to a company. These are in long-term use, are recognized in the financial statements at closing, and must be individually identifiable. It also includes the recording of the values for this view. An example of the GDT MasterFixedAssetID 35800NU is:

<MasterFixedAssetID>1</MasterFixedAssetID>

The structure of the GDT MasterFixedAssetID 35800NU is depicted in FIG. 358NU. For the GDT MasterFixedAssetID 35800NU, the Object Class is Master Fixed Asset 35804NU, the Property is Identification 35806NU, the Representation/Association is Identifier 35808NU, the Type is CCT 35810NU, the Type Name is Identifier 35812NU, and the Length is from one to twelve 35814NU. The remark 35818NU shows that the GDT MasterFixedAssetID 35800NU may be restricted.

The fixed asset has a unique number in a company (Company). This number may have two parts—a main part and a sub-part (MasterFixedAssetID 35800NU and FixedAssetID). The user may use these parts to group fixed assets semantically.

(vvvvvvvvvvvvvvvvvvvvvvvv) MaternityProtectionDeliveryTypeCode

A GDT MatemityProtectionDeliveryTypeCode 35800NV is a coded representation of the type of a delivery of a child according to maternity protection regulations. An example of the GDT MaternityProtectionDeliveryTypeCode 35800NV is:

<MaternityProtectionDeliveryTypeCode>1</MaternityProtectionDeliveryTypeCode>

The structure of the GDT MatemityProtectionDeliveryTypeCode 35800NV is depicted in FIG. 358NV. For the GDT MatemityProtectionDeliveryTypeCode 35800NV, the Object Class is Maternity Protection 35801NV, the Property is Delivery Type 35803NV, the Representation/Association is Code 35804NV, the Type is CCT 35805NV, the Type Name is Code 35806NV, and the Length is from one to two 35807NV. The remark 35809NV shows that the GDT MatemityProtectionDeliveryTypeCode 35800NV may be restricted.

For the ListID 35810NV, the Category is Attribute (A) 35811NV, the Object Class is CodeList 35812NV, the Property is Identification 35813NV, the Representation/Association is Identifier 35814NV, the Type is XSD 35815NV, the Type Name is Token 35816NV, and the Cardinality is zero or one 35818NV.

For the ListAgencyID 35820NV, the Category is Attribute (A) 35821NV, the Object Class is CodeListAgency 35822NV, the Property is Identification 35823NV, the Representation/Association is Identifier 35824NV, the Type is XSD 35825NV, the Type Name is Token 35826NV, and the Cardinality is zero or one 35828NV.

For the ListVersionID 35830NV, the Category is Attribute (A) 35831NV, the Object Class is CodeList 35832NV, the Property is Version 35833NV, the Representation/Association is Identifier 35834NV, the Type is XSD 35835NV, the Type Name is Token 35836NV, and the Cardinality is zero or one 35838NV.

For the ListAgency-SchemeID 35840NV, the Category is Attribute (A) 35841NV, the Object Class is CodeListAgency 35842NV, the Property is Scheme 35843NV, the Representation/Association is Identifier 35844NV, the Type is XSD 35845NV, the Type Name is Token 35846NV, and the Cardinality is zero or one 35848NV.

For the ListAgency-SchemeAgencyID 35850NV, the Category is Attribute (A) 35851NV, the Object Class is CodeListAgency 35852NV, the Property is SchemeAgency 35853NV, the Representation/Association is Identifier 35854NV, the Type is XSD 35855NV, the Type Name is Token 35856NV, and the Cardinality is zero or one 35858NV.

Several fixed, country-specific code lists, which are different at runtime, are assigned to the GDT MatemityProtectionDeliveryTypeCode 35800NV. The GDT MatemityProtectionDeliveryTypeCode 35800NV can be used, for example, in the calculation of the Maternity Protection period according to various delivery types. The Maternity Protection period can be calculated differently (as provided by the national law) for the various delivery types.

The GDT MaternityProtectionDeliveryTypeCode 35800NV for 'DE' (Germany): listID="10090", listAgencyID="310". The data type GDT MaternityProtectionDeliveryTypeCode 35800NV may use the following codes: 1 (i.e., the normal delivery of a child (It should not be premature or Still birth)), and 2 (i.e., the premature birth (The premature still birth will be considered as still birth not a premature), and 3 (i.e., the still birth (child is born dead).

(wwwwwwwwwwwwwwwwwwwwwwwww) PartyIdentifierCategoryCode

A GDT PartyIdentifierCategoryCode 35800NW is a code of a category for an identifier of a party. An example of the GDT PartyIdentifierCategoryCode 35800NW is:

<PartyIdentifierCategoryCode>11</PartyIdentifierCategoryCode>

The structure of the GDT PartyIdentifierCategoryCode 35800NW is depicted in FIG. 358NW. For the GDT PartyIdentifierCategoryCode 35800NW, the Category is Party 35801NW, the Object Class is Identifier 35801NW, the Property is Category 35803NW, the Representation/Association is Code 35804NW, the Type is CCT 35805NW, the Type Name is Code 35806NW, and the Length is from one to six 35807NW. The remark 35809NW shows that the GDT PartyIdentifierCategoryCode 35800NW may be restricted.

For the ListID 35810NW, the Category is Attribute (A) 35811NW, the Object Class is CodeList 35812NW, the Property is Identification 35813NW, the Representation/Association is Identifier 35814NW, the Type is XSD 35815NW, the Type Name is Token 35816NW, and the Cardinality is zero or one 35818NW.

For the ListAgencyID 35820NW, the Category is Attribute (A) 35821NW, the Object Class is CodeListAgency 35822NW, the Property is Identification 35823NW, the Representation/Association is Identifier 35824NW, the Type is XSD 35825NW, the Type Name is Token 35826NW, and the Cardinality is zero or one 35828NW.

For the ListVersionID 35830NW, the Category is Attribute (A) 35831NW, the Object Class is CodeList 35832NW, the Property is Version 35833NW, the Representation/Association is Identifier 35834NW, the Type is XSD 35835NW, the Type Name is Token 35836NW, and the Cardinality is zero or one 35838NW.

For the ListAgency-SchemeID 35840NW, the Category is Attribute (A) 35841NW, the Object Class is CodeListAgency 35842NW, the Property is Scheme 35843NW, the Representation/Association is Identifier 35844NW, the Type is XSD 35845NW, the Type Name is Token 35846NW, and the Cardinality is zero or one 35848NW.

For the ListAgency-SchemeAgencyID 35850NW, the Category is Attribute (A) 35851NW, the Object Class is CodeListAgency 35852NW, the Property is SchemeAgency 35853NW, the Representation/Association is Identifier 35854NW, the Type is XSD 35855NW, the Type Name is Token 35856NW, and the Cardinality is zero or one 35858NW.

An extendable code list may be assigned to the GDT PartyIdentifierCategoryCode 35800NW. The customers amy only extend this code list. In its unchanged state, the code list has the following attributes: listID="10283", listAgencyID="310", listVersionID=[Version of the relevant code list]. If a customer makes changes to the code list, the values assigned to the attributes change as follows: listAgencyID—ID of the customer, listVersionID—Assigned and managed by the customer, listAgencySchemeID—ID of the scheme, listAgencySchemeAgencyID—ID of the organization that manages the scheme of the listAgencySchemeID.

One or more PartyIdentifierTypes can be assigned to a PartyIdentifierCategory. However, only one PartyIdentifierCategory can be assigned to a PartyIdentifierType. The GDT PartyIdentifierCategoryCode can be used to determine with which category of identification papers a person can identify him- or herself. Examples of the possible semantics of the codes are: Official document—Identification using official documents (such as passport, diplomatic passport or identity card), Photo identification—Identification using a photo ID. The following dictionary objects are assigned to this GDT insystems: Data element: BU_ID_CATEGORY, and Domain: BU_ID_CATEGORY.

The data type GDT PartyIdentifierCategoryCode 35800NW may use the following codes: BUP001 (i.e., identification using Dun & Bradstreet number), BUP002 (i.e., identification using commercial register number), BUP003 (i.e., identification using register of associations number), BUP004 (i.e., identification using public register of cooperatives number), BUP005 (i.e., identification using a Global Location Number (GLN)), BUP006 (i.e., identification using a Standard Carrier Alpha Code), FS000 (i.e., identification using an ID card), and FS0002 (i.e., identification using a passport).

(xxxxxxxxxxxxxxxxxxxxxxxx) PartyIdentifierTypeCode

A GDT PartyIdentifierTypeCode 35800NX is a code for a type of party identifier. An example of the GDT PartyIdentifierTypeCode 35800NX is:

<PartyIdentifierTypeCode>11</PartyIdentifierTypeCode>

The structure of the GDT PartyIdentifierTypeCode 35800NX is depicted in FIG. 358NX. For the GDT PartyIdentifierTypeCode 35800NX, the Object Class Qualifier is Party 35801NX, the Object Class is Identifier 35802NX, the Property is Type 35803NX, the Representation/Association is Code 35804NX, the Type is CCT 35805NX, the Type Name is Code 35806NX, and the Length is from one to six 35807NX. The remark 35809NX shows that the GDT PartyIdentifierTypeCode 35800NX may be restricted.

For the ListAgencyID 35810NX, the Category is Attribute (A) 35811NX, the Object Class is CodeListAgency 35812NX, the Property is Identification 35813NX, the Representation/Association is Identifier 35814NX, the Type is XSD 35815NX, the Type Name is Token 35816NX, and the Cardinality is zero or one 35818NX.

For the ListVersionID 35820NX, the Category is Attribute (A) 35821NX, the Object Class is CodeList 35822NX, the Property is Version 35823NX, the Representation/Association is Identifier 35824NX, the Type is XSD 35825NX, the Type Name is Token 35826NX, and the Cardinality is zero or one 35828NX.

For the ListAgency-SchemeID 35830NX, the Category is Attribute (A) 35831NX, the Object Class is CodeListAgency 35832NX, the Property is Scheme 35833NX, the Representation/Association is Identifier 35834NX, the Type is XSD 35835NX, the Type Name is Token 35836NX, and the Cardinality is zero or one 35838NX.

For the ListAgency-SchemeAgencyID 35840NX, the Category is Attribute (A) 35841NX, the Object Class is CodeListAgency 35842NX, the Property is SchemeAgency 35843NX, the Representation/Association is Identifier 35844NX, the Type is XSD 35845NX, the Type Name is Token 35846NX, and the Cardinality is zero or one 35848NX.

An extendable code list may be assigned to the GDT PartyIdentifierTypeCode 35800NX. The customers may change this code list. In its unchanged state, the code list has the following attributes: listID="10118", listAgencyID="310", and listVersionID=[Version of the relevant code list]. If acustomer makes changes to the code list, the values assigned to the attributes change as follows: listAgencyID—ID of the customer, listVersionID—Assigned and managed by the customer, listAgencySchemeID—ID of the scheme if the listAgencyID, and listAgencySchemeAgencyID—ID of the organization that manages the scheme of the listAgencySchemeID.

If the instance value of the GDT PartyIdentifierTypeCode 35800NX represents a standardized identification scheme (such as DUNS), the SchemeAttributes can be derived for an instance of the GDT PartyID. One or more PartyIdentifierTypes can be assigned to a PartyIdentifierCategory. However, only one PartyIdentifierCategory can be assigned to a PartyIdentifierType.

The data type GDT PartyIdentifierCategoryCode 35800NW may use the following codes: BUP001 (i.e., identification using Dun & Bradstreet number), BUP002 (i.e., identification using commercial register number), BUP003 (i.e., identification using register of associations number), BUP004 (i.e., identification using public register of cooperatives number), BUP005 (i.e., identification using a Global Location Number (GLN)), BUP006 (i.e., identification using a Standard Carrier Alpha Code), FS0001 (i.e., identification using an ID card), and FS0002 (i.e., identification using a passport).

(yyyyyyyyyyyyyyyyyyyyyyyy) PartyRoleCategoryCode

A GDT PartyRoleCategoryCode 35800NY is a coded representation of a PartyRoleCategory. For example, a PartyRoleCategory is a grouping of PartyRoles according to process-controlling critieria. A PartyRole with the same name exists for each PartyRoleCategory. An example of the GDT PartyRoleCategoryCode 35800NY is:

<PartyRoleCategoryCode>12</PartyRoleCategory-Code>

The structure of the GDT PartyRoleCategoryCode 35800NY is depicted in FIG. 358NY. For the GDT PartyRoleCategoryCode 35800NY, the Object Class is Party 35804NY, the Property is Role Category 35806NY, the Representation/Association is Code 35808NY, the Type is CCT 35810NY, the Type Name is Code 35812NY, and the Length is from two to three 35814NY. A fixed code list/standard code list may be assigned to the PartyRoleCode. The attributes are as follows: listID="10014", and listAgencyID="310".

BusinessPartnerRoleCategoryCodes and OrganisationalCentreBusinessCharacterCodes are assigned to the GDT PartyRoleCategoryCode 35800NY. The party must have at least one corresponding business partner role types and/or OrganisationCentreBusinessCharacter.

The data type GDT PartyRoleCategoryCode 35800NY may use the following codes: 1 (i.e., a BuyerParty is a party that buys goods or services), 2 (i.e., a SellerParty is a party that sells goods or services), 3 (i.e., a CreditorParty is a party that is authorized to require a service as a result of an obligation), 4 (i.e., a DebitorParty is a party that is required to provide a service as a result of an obligation), 5 (i.e., a ProductRecipientParty is a party to which goods are delivered or for whom services are provided), 6 (i.e., a VendorParty is a party that delivers goods or provides services), 7 (i.e., a ManufacturerParty is a party that manufactures goods), 8 (i.e., a PayerParty is a party that pays for goods or services), 9 (i.e., a PayeeParty is a party that receives payment for goods or services provided), 10 (i.e., a BillToParty is a party to which the invoice for goods or services is sent), 11 (i.e., a BillFromParty is a party that issues an invoice for goods or services providedt), 12 (i.e., a CarrierParty is a party that provides the transport goods), 13 (i.e., a RequestorParty is a party that requests the procurement of goods or services), 14 (i.e., a PortalProviderParty is a party that runs a portal that brings business partners together for a business transaction), 15 (i.e., a CatalogueProviderParty is a party that compiles a catalog), 16 (i.e., a BidderParty is a party that bids for goods or services), 17 (i.e., an OwnerParty is a party that owns tangible or intangible goods), 18 (i.e., a TaxPayerParty is a party that is subject to taxation), 19 (i.e., a TaxOperatorParty is a party that takes care of tax issues for a TaxPayerParty), 20 (i.e., a ContractReleaseAuthorisedParty is a part that is authorized to release goods or services from a contract.), 21 (i.e., a BorrowerParty is a party that takes out a loan), 22 (i.e., a LenderParty is a party that grants a loan), 23 (i.e., a BrokerParty is a party that is a facilitator in a business transaction), 24 (i.e., a BailsmanParty is a party that provides a debt guarantee for a loan), 25 (i.e., a CopyMessageToParty is a party that receives a copy of a message), 26 (i.e., a BlindCopyMessageToParty is a party that receives a copy of a message, without other recipients being informed of this), 27 (i.e., a QualityInspectionProcessorParty is a party that carries out a quality check), 28 (i.e., a ServiceSupportTeamParty is a party that is responsible for the processing of service requests and customer complaints as well as the planning and preparation of service orders), 29 (i.e., a SalesPartnerParty is a party that initiates and implements business transactions for another company), 30 (i.e., a CompetitorParty is a party that is a competitor in terms of business), and 31 (i.e., a ProspectParty is a party that has a business interest or that is suspected of having a business interest).

(zzzzzzzzzzzzzzzzzzzzzzzz) PartyRoleCode

A GDT PartyRoleCode 35800NZ is a coded representation of a PartyRole. For example, a PartyRole specifies which rights and obligations the Party has regarding the business objectGlobal Data Types—Definitionen and corresponding processes. A PartyRole is assigned to exactly one PartyRoleCategory and refines its semantics. An example of the GDT PartyRoleCode 35800NZ is:

<PartyRoleCode>14</PartyRoleCode>

The structure of the GDT PartyRoleCode 35800NZ is depicted in FIG. 358NZ. For the GDT PartyRoleCode 35800NZ, the Object Class is Party 35804NZ, the Property is Role 35806NZ, the Representation/Association is Code 35808NZ, the Type is CCT 35810NZ, the Type Name is Code 35812NZ, and the Length is from one to ten 35814NZ.

An extendable code list is assigned to the GDT PartyRoleCode 35800NZ. The customers may change this code list. In its unchanged state, the code list has the following attributes: listID="10034", listAgencyID="310", and listVersionID=[Version of the relevant code list]. If a customer makes changes to the code list, the values assigned to the attributes change as follows: listAgencyID—ID of the customer, listVersionID—Assigned and managed by the customer, listAgencySchemeID—ID of the scheme, and listAgencySchemeAgencyID—ID of the organization that manages the scheme of the listAgencySchemeID.

Use is primarily the differentiation of a PartyRoleCategory in various processes. For example, the PartyRole "ServiceRecipient" can be used for the PartyRoleCategory "ProductRecipient" in a service process, and "GoodsRecipient" in a sales process.

The data type GDT PartyRoleCode 35800NZ may use the following codes: 1 (i.e., a BuyerParty is a party that buys goods or services), 2 (i.e., a SellerParty is a party that sells goods or services), 3 (i.e., a CreditorParty is a party that is authorized to require a service as a result of an obligation), 4 (i.e., a DebitorParty is a party that is required to provide a service as a result of an obligation), 5 (i.e., a ProductRecipientParty is a party to which goods are delivered or for whom services are provided), 6 (i.e., a VendorParty is a party that delivers goods or provides services), 7 (i.e., a ManufacturerParty is a party that manufactures goods), 8 (i.e., a PayerParty is a party that pays for goods or services), 9 (i.e., a PayeeParty is a party that receives payment for goods or services provided), 10 (i.e., a BillToParty is a party to which the invoice for goods or services is sent), 11 (i.e., a BillFromParty is a party that issues an invoice for goods or services providedt), 12 (i.e., a CarrierParty is a party that provides the transport goods), 13 (i.e., a RequestorParty is a party that requests the procurement of goods or services), 14 (i.e., a PortalProviderParty is a party that runs a portal that brings business partners together for a business transaction), 15 (i.e., a CatalogueProviderParty is a party that compiles a catalog), 16 (i.e., a BidderParty is a party that bids for goods or services), 17 (i.e., an OwnerParty is a party that owns tangible or intangible goods), 18 (i.e., a TaxPayerParty is a party that is subject to taxation), 19 (i.e., a TaxOperatorParty is a party that takes care of tax issues for a TaxPayerParty), 20 (i.e., a ContractReleaseAuthorisedParty is a part that is authorized to release goods or services from a contract.), 21 (i.e., a BorrowerParty is a party that takes out a loan), 22 (i.e., a LenderParty is a party that grants a loan), 23 (i.e., a BrokerParty is a party that is a facilitator in a business transaction), 24 (i.e., a Bailsman-Party is a party that provides a debt guarantee for a loan), 25 (i.e., a CopyMessageToParty is a party that receives a copy of a message), 26 (i.e., a BlindCopyMessageToParty is a party that receives a copy of a message, without other recipients being informed of this), 27 (i.e., a QualityInspectionProcessorParty is a party that carries out a quality check), 28 (i.e., a ServiceSupportTeamParty is a party that is responsible for the processing of service requests and customer complaints as well as the planning and preparation of service orders), 29 (i.e., a SalesPartnerParty is a party that initiates and implements business transactions for another company), 30 (i.e., a CompetitorParty is a party that is a competitor in terms of business), and 31 (i.e., a ProspectParty is a party that has a business interest or that is suspected of having a business interest).

(aaaaaaaaaaaaaaaaaaaaaaaa) PersonnelEventTypeCode

A GDT PersonnelEventTypeCode 35800OA is a coded representation of the type of a personnel event. For example, a personnel event is an event in an employee's professional or private life that needs to be documented for the company. The PersonnelEventType is the classification of personnel events according to the type of change to the work relationship, the work agreement, or the employee-related data. An example of the GDT PersonnelEventTypeCode 35800OA is:

```
<PersonnelEventTypeCode listAgencyID='310' listVersionID =
'1.0'>1</PersonnelEventTypeCode>
```

The structure of the GDT PersonnelEventTypeCode 35800OA is depicted in FIG. 358OA. For the GDT PersonnelEventTypeCode 35800OA, the Object Class is Personnel Administration 35801OA, the Representation/Association is Code 35804OA, the Type is CCT 35805OA, the Type Name is Code 35806OA, and the Length is from one to four 35807OA. The remark 35809OA shows that the GDT PersonnelEventTypeCode 35800OA may be restricted.

For the ListAgencyID 35810OA, the Category is Attribute (A) 35811OA, the Object Class is CodeListAgency 35812OA, the Property is Identification 35813OA, the Representation/Association is Identifier 35814OA, the Type is XSD 35815OA, the Type Name is Token 35816OA, and the Cardinality is zero or one 35818OA.

For the ListVersionID 35820OA, the Category is Attribute (A) 35821OA, the Object Class is CodeList 35822OA, the Property is Version 35823OA, the Representation/Association is Identifier 35824OA, the Type is XSD 35825OA, the Type Name is Token 35826OA, and the Cardinality is zero or one 35828OA.

For the ListAgency-SchemeID 35830OA, the Category is Attribute (A) 35831OA, the Object Class is CodeListAgency 35832OA, the Property is Scheme 35833OA, the Representation/Association is Identifier 35834OA, the Type is XSD 35835OA, the Type Name is Token 35846OA, and the Cardinality is zero or one 35838OA.

For the ListAgency-SchemeAgencyID 35840OA, the Category is Attribute (A) 35841OA, the Object Class is CodeListAgency 35842OA, the Property is SchemeAgency 35843OA, the Representation/Association is Identifier 35844OA, the Type is XSD 35845OA, the Type Name is Token 35846OA, and the Cardinality is zero or one 35848OA.

Several country-specific code lists that are different at runtime are assigned to the GDT PersonnelEventTypeCode 35800OA. The customers may change these code lists. If a customer makes changes to the code lists, the values of the attributes are changed as follows: listAgencyID—ID of the customer, listVersionID—Assigned and managed by the customer, listAgencySchemeID—ID of the scheme, and listAgencySchemeAgencyID—ID of the organizationthat manages the scheme of the listAgencySchemeID.

The data type GDT PersonnelEventTypeCode 35800OA may use the following codes: 1 (i.e., hiring of an employee), 2 (i.e., transfer of an employee), 3 (i.e., dismissal by employer), 4 (i.e., resignation by employee), 5 (i.e., long-term leave), 6 (i.e., military service), 7 (i.e., employee's maternity protection), and 8 (i.e., employee's parental leave).

(bbbbbbbbbbbbbbbbbbbbbbbb) QualityManagementSystemStandardCode

A GDT QualityManagementSystemStandardCode 35800OB is a coded representation of a standard for the quality management system. For example, a quality management system is the summary of the technical and organizational means needed for the implementation of the quality management. Different standards exist for the quality management system. An example of the GDT QualityManagementSystemStandardCode 35800OB is:

```
<QualityManagementSystemStandardCode>1
</QualityManagementSystemStandardCode>
```

The structure of the GDT QualityManagementSystemStandardCode 35800OB is depicted in FIG. 358OB. For the GDT QualityManagementSystemStandardCode 35800OB, the Property Qualifier is Quality Management System 35802OB, the Property is Standard 35803OB, the Representation/Association is Code 35804OB, the Type is CCT 35805OB, the Type Name is Code 35806OB, and the Length is from one to four 35807OB. The remark 35809OB shows that the GDT QualityManagementSystemStandardCode 35800OB may be restricted.

For the ListID 35810OB, the Category is Attribute (A) 35811OB, the Object Class is CodeList 35812OB, the Property is Identification 35813OB, the Representation/Association is Identifier 35814OB, the Type is XSD 35815OB, the Type Name is Token 35816OB, and the Cardinality is zero or one 35818OB.

For the ListAgencyID 35820OB, the Category is Attribute (A) 35821OB, the Object Class is CodeListAgency 35822OB, the Property is Identification 35823OB, the Representation/Association is Identifier 35824OB, the Type is XSD 35825OB, the Type Name is Token 35826OB, and the Cardinality is zero or one 35828OB.

For the ListVersionID 35830OB, the Category is Attribute (A) 35831OB, the Object Class is CodeList 35832OB, the Property is Version 35833OB, the Representation/Association is Identifier 35834OB, the Type is XSD 35835OB, the Type Name is Token 35836OB, and the Cardinality is zero or one 35838OB.

For the ListAgency-SchemeID 35840OB, the Category is Attribute (A) 35841OB, the Object Class is CodeListAgency 35842OB, the Property is Scheme 35843OB, the Representation/Association is Identifier 35844OB, the Type is XSD 35845OB, the Type Name is Token 35846OB, and the Cardinality is zero or one 35848OB.

For the ListAgency-SchemeAgencyID 35850OB, the Category is Attribute (A) 35851OB, the Object Class is CodeListAgency 35852OB, the Property is SchemeAgency 35853OB, the Representation/Association is Identifier 35854OB, the Type is XSD 35855OB, the Type Name is Token 35856OB, and the Cardinality is zero or one 35858OB.

A customer-specific code list is assigned to the GDT QualityManagementSystemStandardCode 35800OB. A customer defines the codes in the code list. The attributes of the GDT QualityManagementSystemStandardCode 35800OB are assigned values as follows: listID="10157", listAgencyID—ID of the customer, listVersionID—Assigned and managed by the customer, listAgencySchemeID—ID of the scheme, and listAgencySchemeAgencyID—ID of the organization that manages the scheme of the listAgencySchemeID Some companies, especially public authorities and large-scale companies may require verification from the vendor that there is an appropriate quality management system described, implemented and operative. Many companied have earned relevant certificates from accredited Institutes. Type and area of the required display of quality management systems vary depending on each company. Examples of customer-specific code semantics: ISO certification: Certificate in accordance with IS09001:2000, and Technical Inspection Authority: Certificate 'Tested Data Integrity'. In some instances within the RFQ process certain goods are only accepted from specific vendors, who are assigned to the specific GDT QualityManagementSystemStandardCode 35800OB, this means that the vendor is certified for this standard, or manufacture in accordance with this standard.

(cccccccccccccccccccccccc) ResponsibilityTypeCode

A GDT ResponsibilityTypeCode 35800OC is a coded representation of a Responsibility type. For example, a responsibility type defines the characteristic features of a particular responsibility, e.g. surnames of employees, product categories, organizational centres etc. A responsibility describes specific rights and duties of an acting agent responsible such as a person or an organizational centre etc. An example of the GDT ResponsibilityTypeCode 35800OC is:

<ResponsibilityTypeCode>ActingRLUForPayment</ResponsibilityTypeCode>

The structure of the GDT ResponsibilityTypeCode 35800OC is depicted in FIG. 358OC. For the GDT ResponsibilityTypeCode 35800OC, the Object Class is Responsibility 35801OC, the Property is Type 35803OC, the Representation/Association is Code 35804OC, the Type is CCT 35805OC, the Type Name is Code 35806OC, and the Length is from one to five 35807OC. The remark 35809OC shows that the GDT ResponsibilityTypeCode 35800OC may be restricted.

For the ListAgencyID 35810OC, the Category is Attribute (A) 35811OC, the Object Class is CodeListAgency 35812OC, the Property is Identification 35813OC, the Representation/Association is Identifier 35814OC, the Type is XSD 35815OC, the Type Name is Token 35816OC, and the Cardinality is zero or one 35818OC.

For the ListVersionID 35820OC, the Category is Attribute (A) 35821OC, the Object Class is CodeList 35822OC, the Property is Version 35823OC, the Representation/Association is Identifier 35824OC, the Type is XSD 35825OC, the Type Name is Token 35826OC, and the Cardinality is zero or one 35828OC.

For the ListAgency-SchemeID 35830OC, the Category is Attribute (A) 35831OC, the Object Class is CodeListAgency 35832OC, the Property is Scheme 35833OC, the Representation/Association is Identifier 35834OC, the Type is XSD 35835OC, the Type Name is Token 35836OC, and the Cardinality is zero or one 35838OC.

For the ListAgency-SchemeAgencyID 35840OC, the Category is Attribute (A) 35841OC, the Object Class is CodeListAgency 35842OC, the Property is SchemeAgency 35843OC, the Representation/Association is Identifier 35844OC, the Type is XSD 35845OC, the Type Name is Token 35846OC, and the Cardinality is zero or one 35848OC.

An extendible code list may be assigned to the code. A customer can replace the list by his/her own list. An unchanged Code list has the following attributes: listID="10244", listAgencyID="310", and listVersionID=[Version of the codes list in question.] If the customer creates his/her own code list, the attributes change as follows: listAgencyID—ID of the customer, listVersionID—Assigned and managed by the customer, listAgencySchemeID—ID of the scheme, and listAgencySchemeAgencyID—ID of the organization that manages the scheme of the listAgencySchemeID.

The GDT ResponsibilityTypeCode 35800OC may be used to determine acting agents responsible (in responsibility queries) in order to narrow down the responsibility that is to be found. For example, the agent responsible for the responsibility type "authorization of leave request" needs to be determined.

The data type GDT ResponsibilityTypeCode 35800OC may use the following codes: 1 (i.e., responsibility type for authorizing leave requests), 2 (i.e., responsibility type for authorizing purchase orders), and 3 (i.e., responsilbility type for unit of payment in Due Payment).

(dddddddddddddddddddddddd) ResponsibleAgent

A GDT ResponsibleAgent 35800OD is an acting agent with specific rights and duties. For example, a ResponsibleAgent can be e.g. an employee or an Organisational Centre. An example of the GDT ResponsibleAgent 35800OD is:

```
<ResponsibleAgent>
    <UUID>f81d4fae-7dec-1d0-a765-00a0c91e6bf6</UUID>
    <BusinessObjectTypeCode>1001</BusinessObjectTypeCode>
</ResponsibleAgent>
```

The structure of the GDT ResponsibleAgent 35800OD is depicted in FIG. 358OD. For the GDT ResponsibleAgent 35800OD, the Object Class is Responsible Agent 35801OD, the Representation/Association is Details 35804OD, For the UUID 35810OD, the Category is Element (E) 35811OD, the Object Class is Responsible Agent 35812OD, the Property is Univeral Unique_Identification 35813OD, the Representation/Association is Identifier 35814OD, the Type is GDT 35815OD, the Type Name is UUID 35816OD, and the Cardinality is one 35818OD.

For the BusinessObjectTypeCode 35820OD, the Category is Element (E) 35821OD, the Object Class is Responsible Agent 35822OD, the Property is Business Object Type 35823OD, the Representation/Association is Code 35824OD, the Type is GDT 35825OD, the Type Name is BusinessObjectTypeCode 35826OD, and the Cardinality is one 35828OD.

The data type GDT ResponsibleAgent 35800OD may use the following codes: 1001 (i.e., master data object BusinessPartner), 1002 (i.e., master data object Customer), 1003 (i.e., master data object Supplier), 1004 (i.e., master data object Employee), 1005 (i.e., master data object Company), 1006 (i.e., master data object CostCentre), 1007 (i.e., master data object SalesUnit), 1008 (i.e., master data object ServiceUnit), 1009 (i.e., master data object PurchasingUnit), 1010 (i.e., master data object ReportingLineUnit), 1011 (i.e., master data object Location), and 1012 (i.e., master data object DistributionCentre).

One or more ResponsibleAgents are always the result of responsibility query. The GDT ResponsibleAgent 35800OD is also used when maintaining responsibilities for e.g. a position, in order to show that the responsibilities being maintained currently refer to one person, but may be transferred to a different person, if in future the position is filled by someone else.

(eeeeeeeeeeeeeeeeeeeeeeeee) ServiceIssueCategoryCatalogueID

A GDT ServiceIssueCategoryCatalogueID 35800OE is an identifier for a catalog of issue categories in customer service. For example, a catalog of issue categories is a structured directory of categories that describe an issue in a business process in customer service. The hierarchical struc-ture is used to depict dependencies between the categories. Depending on how detailed the description of the issues must be, additional, more specific categories are defined underneath the main categories. The number of hierarchy levels in the structure is unlimited. An example of the GDT ServiceIssueCategoryCatalogueID 35800OE is:

<ServiceIssueCategoryCatalogueID> SOFTWARE_COMPONENTS /ServiceIssueCategoryCatalogueID>

The structure of the GDT ServiceIssueCategoryCatalogueID 35800OE is depicted in FIG. 358OE. For the GDT ServiceIssueCategoryCatalogueID 35800OE, the Object Class is Service Issue Category Catalogue 35804OE, the Property is Identification 35806OE, the Representation/Association is Identifier 35808OE, the Type is GDT 35810OE, the Type Name is Identifier 35812OE, and the Length is from one to twenty five 35814OE. The remark 35818OE shows that the GDT ServiceIssueCategoryCatalogueID 35800OE may be restricted.

The ServiceIssueCategoryCatalogueID does not have any identifying attributes, since (multiple) identification schemes are not supported. A catalogue of issue categories is used in customer service in order to provide a predefined collection of categories for controlling business processes and for classifying relevant business documents. These business documents are usually service transactions (service requests, service orders, service confirmations).

(fffffffffffffffffffffffff) ServiceIssueCategoryID

A GDT ServiceIssueCategoryID 35800OF is an identifier for an issue category in customer service. For example, an issue category is a classification of issues in a business process in customer service, according to objective or subjective criteria. See also ServiceIssueCategoryHierarchyID. An example of the GDT ServiceIssueCategoryID 35800OF is:

<ServiceIssueCategoryID>CRM-CIC </ServiceIssueCategoryID>

The structure of the GDT ServiceIssueCategoryID 35800OF is depicted in FIG. 358OF. For the GDT ServiceIssueCategoryID 35800OF, the Object Class is Service Issue Category 35804OF, the Rep./Ass. Qual. is Identifiction 35806OF, the Representation/Association is Identifier 35808OF, the Type is GDT 35810OF, the Type Name is Identifier 35812OF, and the Length is from one to twenty five 35814OF. The remark 35818OF shows that the GDT ServiceIssueCategoryID 35800OF may be restricted.

The GDT ServiceIssueCategoryID 35008OF does not have any identifying attributes, since (multiple) identification schemes are not supported. The GDT ServiceIssueCategoryID 35008OF can currently not be used in A2A- or B2B Messages. Issue categories can be used, for example, for processing service requests, in order to allocate the type of request, problem, or cause. Depending on the individual categorization of the service request, solutions that are linked to the category can be proposed automatically. In addition, once again depending on the categorization, follow-up actions can be automated, for example: forward a service request to a single expert or a group of experts, check the entitlements of a customer (for example the existence of a valid warranty), and propose a special e-mail template to answer the customer inquiry.

A ProcessServiceCategoryID is an identifier for a category in customer service that is used to characterize and control a business process. An IncidentServiceCategoryID is an identifier for a category in customer service that is used to descibe an individual issue and to contribute towards its resolution. An issue is typically a problem and its cause or causes.

(ggggggggggggggggggggggggg) ServiceIssueCategoryTypeCode

A GDT ServiceIssueCategoryTypeCode 35800OG is a coded representation of the type of an issue category in customer service. For example, an issue category in customer service is a characteristic of a specific issue that categorizes a business transaction document according to an objective or a subjective point of view. An example of the GDT ServiceIssueCategoryTypeCode 35800OG is:

<ServiceIssueCategoryTypeCode>1</ServiceIssueCategoryTypeCode>

The structure of the GDT ServiceIssueCategoryTypeCode 35800OG is depicted in FIG. 358OG. For the GDT ServiceIssueCategoryTypeCode 35800OG, the Object Class is Service Issue Category 35801OG, the Property is Type 35803OG, the Representation/Association is Code 35804OG, the Type is CCT 35805OG, the Type Name is Code 35806OG, and the Length is from one to two 35807OG. The remark 35809OG shows that the GDT ServiceIssueCategoryTypeCode 35800OG may be restricted.

For the ListAgencyID 35810OG, the Category is Attribute (A) 35811OG, the Object Class is CodeListAgency 35812OG, the Property is Identification 35813OG, the Representation/Association is Identifier 35814OG, the Type is XSD 35815OG, the Type Name is Token 35816OG, and the Cardinality is zero or one 35818OG.

For the ListVersionID 35820OG, the Category is Attribute (A) 35821OG, the Object Class is CodeList 35822OG, the Property is Version 35823OG, the Representation/Association is Identifier 35824OG, the Type is XSD 35825OG, the Type Name is Token 35826OG, and the Cardinality is zero or one 35828OG.

For the ListAgency-SchemeID 35830OG, the Category is Attribute (A) 35831OG, the Object Class is CodeListAgency 35832OG, the Property is Scheme 35833OG, the Representation/Association is Identifier 35834OG, the Type is XSD 35835OG, the Type Name is Token 35836OG, and the Cardinality is zero or one 35838OG.

For the ListAgency-SchemeAgencyID 35840OG, the Category is Attribute (A) 35841OG, the Object Class is CodeListAgency 35842OG, the Property is SchemeAgency 35843OG, the Representation/Association is Identifier 35844OG, the Type is XSD 35845OG, the Type Name is Token 35846OG, and the Cardinality is zero or one 35848OG.

An extendable code list is assigned to the GDT ServiceIssueCategoryTypeCode 35800OF. The customers can change this code list. In its unchanged state, the code list has the following attributes: listID="10226", listAgencyID="310", listVersionID=[Version of the relevant code list]. If a customer makes changes to the code list, the values assigned to the attributes change as follows: listAgencyID—ID of the customer, listVersionID—Assigned and managed by the customer, listAgencySchemeID—ID of the scheme, and listAgencySchemeAgencyID—ID of the organization that manages the scheme of the listAgencySchemeID.

(hhhhhhhhhhhhhhhhhhhhhhhh) ServiceValuationCode

A GDT ServiceValuationCode 35800OH is a coded representation of a service valuation. For example, a service can be evaluated in different ways, for example, as follows: according to qualifications (for example, master craftsman, specialist, apprentice, etc.), or according to valuation records (for example, billing records for consultants: L1-L6). An example of the GDT ServiceValuationCode 35800OH is:

<ServiceValuationCode>1</ServiceValuationCode>

The structure of the GDT ServiceValuationCode 35800OH is depicted in FIG. 358OH. For the GDT ServiceValuationCode 35800OH, the Object Class is Service 35801OH, the Property is Valuation 35803OH, the Representation/Association is Code 35804OH, the Type is CCT 35805OH, the Type Name is Code 35806OH, and the Length is from one to six 35807OH. The remark 35809OH shows that the GDT ServiceValuationCode 35800OH may be restricted.

For the ListID 35810OH, the Category is Attribute (A) 358110OH, the Object Class is CodeList 35812OH, the Property is Identification 35813OH, the Representation/Association is Identifier 35814OH, the Type is XSD 35815OH, the Type Name is Token 35816OH, and the Cardinality is zero or one 35818OH.

For the ListAgencyID 35820OH, the Category is Attribute (A) 35821OH, the Object Class is CodeListAgency 35822OH, the Property is Identification 35823OH, the Representation/Association is Identifier 35824OH, the Type is XSD 35825OH, the Type Name is Token 35826OH, and the Cardinality is zero or one 35828OH.

For the ListVersionID 35830OH, the Category is Attribute (A) 35831OH, the Object Class is CodeList 35832OH, the Property is Version 35833OH, the Representation/Association is Identifier 35834OH, the Type is XSD 35835OH, the Type Name is Token 35836OH, and the Cardinality is zero or one 35838OH.

For the ListAgency-SchemeID 35840OH, the Category is Attribute (A) 358410OH, the Object Class is CodeListAgency 35842OH, the Property is Scheme 35843OH, the Representation/Association is Identifier 35844OH, the Type is XSD 35845OH, the Type Name is Token 35846OH, and the Cardinality is zero or one 35848OH.

For the ListAgency-SchemeAgencyID 35850OH, the Category is Attribute (A) 35851OH, the Object Class is CodeListAgency 35852OH, the Property is SchemeAgency 35853OH, the Representation/Association is Identifier 35854OH, the Type is XSD 35855OH, the Type Name is Token 35856OH, and the Cardinality is zero or one 35858OH.

There are only alternative code lists that differ at configuration and/or runtime. The ServiceValuationCode is a customer-specific code list. Examples of the possible semantics of the codes can be found under the heading "Use". The attributes are used as follows: listID—ID of the relevant code list. It is assigned and administered by a customer where the customer is responsible for the values of the ID in question, listAgencyID—ID of the customer where an ID assigned by an organization may be used (such as the business IDs assigned by DUNS, EAN, and SWIFT), listVersionID—Version of the relevant code list that may be assigned and administered by the customer listed in the listAgencyID, listAgencySchemeID—ID of the scheme by which the customer listed in the listAgencyID is identified that may be a particular identification scheme for partners, businesses, and members (such as DUNS+4), and so on, of an administering organization (such as EAN, DUNS, and SWIFT) that is listed in the listAgencySchemeAgencyID, and listAgencySchemeAgencyID—ID of the administering organization (such as DUNS, EAN, or SWIFT) that is responsible for identifying the organization listed in the ListAgencyID.

The GDT ServiceValuatonCode 35800OH may be used for pricing, in order to calculate surcharges or discounts for the customer. The surcharges and discounts can be an absolute or a percentage value. For example, if a service with a base price of 100 Euro has to be carried out by a specialist, a surcharge of 50% can be defined for this service. In this case, a total price of 150 Euro can be charged to the customer.

(iiiiiiiiiiiiiiiiiiiiiii) StatutoryMealsReimbursementExpenseReporterGroupCode

A GDT StatutoryMealsReimbursementExpenseReporterGroupCode 35800OI is a coded representation of a group of expense reporters to whom the same statutory or contractual expense regulations apply regarding the reimbursement of meal expenses. An example of the GDT StatutoryMealsReimbursementExpenseReporterGroupCode 35800OI is:

<StatutoryMealsReimbursementExpenseReporterGroupCode>1
</StatutoryMealsReimbursementExpenseReporterGroupCode >

The structure of the GDT StatutoryMealsReimbursementExpenseReporterGroupCode 35800OI is depicted in FIG. 358OI. For the GDT StatutoryMealsReimbursementExpenseReporterGroupCode 35800OI, the Object Class is Statutory_MealsReimbursement_ExpenseReporterGroup 35804OI, the Representation/Association is Code 35808OI, the Type is CCT 35810OI, the Type Name is Code 35812OI, and the Length is from one to two 35814OI. The remark 35818OI shows that the GDT StatutoryMealsReimbursementExpenseReporterGroupCode 35800OI may be restricted.

The value range of the GDT StatutoryMealsReimbursementExpenseReporterGroupCode 35800OI may consist of a customer-specific code list. The GDT StatutoryMealsReimbursementExpenseReporterGroupCode 35800OI may currently be used only in BOs. Examples of the GDT StatutoryMealsReimbursementExpenseReporterGroupCode 35800OI are the four employee groups of the Italian banking collective agreement with a per diem that varies according to the employee hierarchy level: 1. area professionale—Employee hierarchy level 1, 2. area professionals 1.e 2. livello retributivo—Employee hierarchy level 2, 3. area professionals e 2. area professionale 3. livello retributive—Employee hierarchy level 3, and Quadri Direttivi 1.-4. livello—Employee hierarchy level 4.

For the GDT StatutoryMealsReimbursementExpenseReporterGroupCode 35800OI there is the corresponding GDT EnterpriseMealsReimbursementExpenseReporterGroupCode as the coded representation of a group of expense reporters to whom the same company-specific expense regulations apply regarding the reimbursement of meal expenses.

(jjjjjjjjjjjjjjjjjjjjjjj) StatutoryMileageReimbursementExpenseReporterGroupCode

A GDT StatutoryMileageReimbursementExpenseReporterGroupCode 35800OJ is a coded representation of a group of expense reporters to whom the same statutory or contractual expense regulations apply regarding the reimbursement of travel costs. An example of the GDT StatutoryMileageReimbursementExpenseReporterGroupCode 35800OJ is:

```
<StatutoryMileageReimbursementExpenseReporterGroupCode>1
</StatutoryMileageReimbursementExpenseReporterGroupCode>
```

The structure of the GDT StatutoryMileageReimbursementExpenseReporterGroupCode 35800OJ is depicted in FIG. 358OJ. For the GDT StatutoryMileageReimbursementExpenseReporterGroupCode 35800OJ, the Object Class is Statutory_MileageReimbursement_ExpenseReporterGroup 35804OJ, the Representation/Association is Code 35808OJ, the Type is CCT 35810OJ, the Type Name is Code 35812OJ, and the Length is from one to two 35814OJ. The remark 35818OJ shows that the GDT StatutoryMileageReimbursementExpenseReporterGroupCode 35800OJ may be restricted.

The value range of the GDT StatutoryMileageReimbursementExpenseReporterGroupCode 35800OJ may consist of a customer-specific code list. The GDT StatutoryMileageReimbursementExpenseReporterGroupCode 35800OJ may currently be used only in BOs. Examples of the GDT StatutoryMileageReimbursementExpenseReporterGroupCode 35800OJ are the two employee groups of the Italian banking collective agreement: group of employees who are allowed to use a private automobile, and group of employees who are not allowed to use a private automobile (no reimbursement of travel costs).

For the GDT StatutoryMileageReimbursementExpenseReporterGroupCode 35800OJ there may be the corresponding GDT EnterpriseMileageReimbursementExpenseReporterGroupCode as the coded representation of a group of expense reporters to whom the same company-specific expense regulations apply regarding the reimbursement of travel costs.

(kkkkkkkkkkkkkkkkkkkkkkkkk) SubledgerAccountLineItemTypeCode

A GDT SubledgerAccountLineItemTypeCode 35800OK is a coded representation of the type of line item of a subledger account. For example, the line items of the subledger accounts are generated during the posting of business transactions. An example of the GDT SubledgerAccountLineItemTypeCode 35800OK is:

<SubledgerAccountLineItemTypeCode>1</SubledgerAccountLineItemTypeCode>

The structure of the GDT SubledgerAccountLineItemTypeCode 35800OK is depicted in FIG. 358OK. For the GDT SubledgerAccountLineItemTypeCode 35800OK, the Object Class is SubledgerAccountLineItem 35804OK, the Property is TypeCode 35806OK, the Representation/Association is Code 35808OK, the Type is CCT 35810OK, the Type Name is Code 35812OK, and the Length is from four to five 35814OK. The remark 35818OK shows that the GDT SubledgerAccountLineItemTypeCode 35800OK may be restricted.

The GDT SubledgerAccountLineItemTypeCode 35800OK is a fixed code list. The attributes of the CCT identifier have the following values: listID="10069", listAgencyID="310", and listVersionID—Version of the relevant code list.

The data type GDT SubledgerAccountLineItemTypeCode 35800OK may use the following codes: 5001 (i.e., a customer line item is the representation of a change in value regarding a business partner who is in an accounts receivable relationship to your company), and 5002 (i.e., a vendor line item is the representation of a change in value regarding a business partner who is in an accounts payable relationship to your company).

The semantics for grouping code list entries are not fixed. Applications may not use the semantics in their program logic. SubledgerAccountLineItemTypeCode is used, for example, to categorize the line items in the business object AccountsReceivablePayableSubledgerAccount. Each SubledgerAccountLineItemTypeCode is assigned to exactly one SubledgerAccount.

(lllllllllllllllllllllllll) SubledgerAccountTypeCode

A GDT SubledgerAccountTypeCode 35800OL is a coded representation of the type of subledger. For example, a subledger is a disjoint subdivision of Financial Accounting. An example of the GDT SubledgerAccountTypeCode 35800OL is:

<SubledgerAccountTypeCode>1</SubledgerAccountTypeCode>

The structure of the GDT SubledgerAccountTypeCode 35800OL is depicted in FIG. 358OL. For the GDT SubledgerAccountTypeCode 35800OL, the Object Class is Subledger Account 35804OL, the Property is Type 35806OL, the Representation/Association is Code 35808OL, the Type is CCT 35810OL, the Type Name is Code 35812OL, and the Length is from one to two 35814OL. The remark 35818OL shows that the GDT SubledgerAccountTypeCode 35800OL may be restricted.

The data type GDT SubledgerAccountTypeCode 35800OL may use the following codes: 1 (i.e., subledger account for tangible assets and intangible assets), 2 (i.e., subledger account for materials), 3 (i.e., subledger account for work in process), 4 (i.e., subledger account for purchase orders), 5 (i.e., subledger account for customers and vendors), 6 (i.e., subledger account for taxes), 7 (i.e., subledger account for liquid funds), 8 (i.e., subledger account for sales processes), and 9 (i.e., subledger account for overhead costs).

The attributes of the CCT code are filled implicitly with the following values: listID="10070", listAgencyID="310", and listVersionID—Version of the relevant code list.

(mmmmmmmmmmmmmmmmmmmmmmmmm) TaxDeductibilityCode

A GDT TaxDeductibilityCode 35800OM is a coded representation of the tax deductibility. For example, the deductibility specifies the portion of VAT that can be deducted from purchases. An example of GDT TaxDeductibilityCode 35800OM is:

<TaxDeductibilityCode listID=21701 listAgencyID=310>1</TaxDeductibilityCode>The structure of the GDT TaxDeductibilityCode 35800OM is depicted in FIG. 358OM. For the GDT TaxDeductibilityCode 35800OM, the Object Class is Tax Deductibility 35801OM, the Representation/Association is Code 35804OM, the Type is CCT 35805OM, the Type Name is Code 35806OM, and the Length is from one to four 35807OM. The remark 35809OM shows that the GDT TaxDeductibilityCode 35800OM may be restricted.

For the ListID 35810OM, the Category is Attribute (A) 35811OM, the Object Class is CodeList 35812OM, the Property is Identification 35813OM, the Representation/Association is Identifier 35814OM, the Type is XSD 35815OM, the Type Name is Token 35816OM, and the Cardinality is zero or one 35818OM.

For the ListAgencyID 35820OM, the Category is Attribute (A) 35821OM, the Object Class is CodeListAgency 35822OM, the Property is Identification 35823OM, the Representation/Association is Identifier 35824OM, the Type is XSD 35825OM, the Type Name is Token 35826OM, and the Cardinality is zero or one 35828OM.

For the ListVersionID 35830OM, the Category is Attribute (A) 35831OM, the Object Class is CodeList 35832OM, the Property is Version 35833OM, the Representation/Association is Identifier 35834OM, the Type is XSD 35835OM, the Type Name is Token 35836OM, and the Cardinality is zero or one 35838OM.

For the ListAgency-SchemeID 35840OM, the Category is Attribute (A) 35841OM, the Object Class is CodeListAgency 35842OM, the Property is Scheme 35843OM, the Representation/Association is Identifier 35844OM, the Type is XSD 35845OM, the Type Name is Token 35846OM, and the Cardinality is zero or one 35848OM.

For the ListAgency-SchemeAgencyID 35850OM, the Category is Attribute (A) 35851OM, the Object Class is CodeListAgency 35852OM, the Property is SchemeAgency 35853OM, the Representation/Association is Identifier 35854OM, the Type is XSD 35855OM, the Type Name is Token 35856OM, and the Cardinality is zero or one 35858OM.

Several extensible, country-specific code lists, which may be distinguished at runtime, are assigned to the code. The customers may replace lists with their own. If SAP customers create their own code lists in order to replace those from SAP, the allocation of attributes changes as follows: listAgencyID—ID of the customer, listVersionID—Assigned and managed by the customer, listAgencySchemeID—ID of the scheme, and listAgencySchemeAgencyID—ID of the organization that manages the scheme of the listAgencySchemeID. Examples of customer-specific code semantics include input tax deduction according to individual agreement with tax authorities.

The classification of deductibility may permit the formulation of legal texts, and tax assignments, regardless of actual current percentage rates that can be changed. In other words, if a percentage rate is increased or decreased as of a specific date, the corresponding TaxDeductibilityCode does not change. If additional new percentage rates are introduced for deductibility, these also lead to new TaxDeductibilityCodes. Non-deductibility is regulated individually between company and tax authority.

TaxDeductibilityCode for EN (SAP code list): listID="21701", listAgencyID="310", and listVersionID=[Version of the relevant code list].

The data type GDT TaxDeductibilityCode 35800OM may use the following codes: 1 (i.e., the sales tax on purchases is fully deductible), 2 (i.e., the sales tax on purchases is not deductible), and 3 (i.e., VAT on purchases is partly deductible (according to legal regulations governing deductibility of tax for travel expenses).

(nnnnnnnnnnnnnnnnnnnnnnnnn) TransportationTerms

A GDT TransportationTerms 35800ON are a collection of the conditions and agreements that apply when transporting the ordered goods and providing the necessary services and activities for this. An example of the GDT TransportationTerms 35800ON is:

```
<TransportationTerms>
    <TransportServiceLevelCode listID="DE 4219"
listVersionID="D.02B" listAgencyID="6"> 1
</TransportServiceLevelCode>
    <TransportModeCode listID="DE 8067" listVersionID="D.02B"
listAgencyID="6"> 1 </TransportModeCode>
```

-continued

```
    <TransportMeans>
        <ID>HD AA-123</ID>
        <MeansDescriptionCode listID="DE 8179"
listVersionID="D.02B" listAgencyID="6"> 4 </MeansDescriptionCode>
    </TransportMeans>
    <Description langCode="de">
        This is a German description text.
    </Description>
<TransportationTerms>
```

depicted in FIG. 358ON. For the GDT TransportationTerms 35800ON, the Object Class is TransportationTerms 35801ON, the Representation/Association is Details 35804ON, the For the TransportServiceLevel Code 35810ON, the Category is Element (E) 35811ON, the Object Class is TransportationTerms_Transport 35812ON, the Property is ServiceLevel 35813ON, the Representation/Association is Code 35814ON, the Type is GDT 35815ON, the Type Name is TransportServiceLevelCode 35816ON, and the Cardinality is zero or one 35818ON.

For the TransportModeCode 35820ON, the Category is Element (E) 35821ON, the Object Class is TransportationTerms_TransportMode 35822ON, the Representation/Association is Code 35824ON, the Type is GDT 35825ON, the Type Name is TransportModeCode 35826ON, and the Cardinality is zero or one 35828ON.

For the TransportMeans 35830ON, the Category is Element (E) 35831ON, the Object Class is TransportationTerms_TransportMeans 35832ON, the Representation/Association is Details 35834ON, the Type is GDT 35835ON, the Type Name is TransportMeans 35836ON, and the Cardinality is zero or one 35838ON.

For the Description 35840ON, the Category is Element (E) 35841ON, the Object Class is TransportationTerms 35842ON, the Representation/Association is Text 35844ON, the Type is GDT 35845ON, the Type Name is Long_Description 35846ON, and the Cardinality is zero or one 35848ON.

The GDT TransportationTerms 35800ON contain detailed specifications on the agreed means of transportation (such as shipping/transport type and means of transport to be used). Moreover, additional information can also be specified in the form of free text. The specification of each structural element is optional (the specification of an empty structure TransportaionTerms is not possible). The specifications for TransportModeCode and TransportMeansDescriptionCode may not contradict each other (business integrity; for example, ModeCode="Maritime Transport" und MeansDescriptionCode="Train with 20 or more wagons").

With the information in the GDT TransportationTerms 35800ON, the involved business partners (purchaser and seller) agree on the conditions regarding the transportation of the ordered products/goods in the form of orders or purchase orders. They determine and influence the flow of the subsequent logistical processes (for example, they influence the selection of the transportation service providers and the conditions to be negotiated with them, selection of a logistical organizational unit for the delivery, and so on).

The data type GDT TransportationTerms 35800ON may use the following codes: 1 (i.e., something), 2 (i.e., something), 3 (i.e., something), 4 (i.e., something), 5 (i.e., something).

(ooooooooooooooooooooooooo) ValueAdjustmentBusinessPartnerGroupCode

A GDT ValueAdjustmentBusinessPartnerGroupCode 35800OO is a coded representation of a group of business partners for whom the same value adjustment requirements apply. For example, a value adjustment is applied in a balance sheet to receivables for which there is a definite probability that they will not be paid. The amount of the value adjustment depends on the level of probability of non-payment and is calculated using a set of rules elaborated for the business partner group. The actual probability is dictated by the business partner to whom the receivable is due. An example of the GDT ValueAdjustmentBusinessPartnerGroupCode 35800OO is:

<ValueAdjustmentBusinessPartnerGroupCode>LOW/ ValueAdjustmentBusinessPartnerGroupCode>

The structure of the GDT ValueAdjustmentBusinessPartnerGroupCode 35800OO is depicted in FIG. 358OO. For the GDT ValueAdjustmentBusinessPartnerGroupCode 35800OO, the Object Class is Value Adjustment 35804OO, the Property is Business Partner Group 35806OO, the Representation/Association is Code 35808OO, the Type is CCT 35810OO, the Type Name is Code 35812OO, and the Length is from one to five 35814OO. The remark 35818OO shows that the GDT ValueAdjustmentBusinessPartnerGroupCode 35800OO may be restricted.

The GDT ValueAdjustmentBusinessPartnerGroupCode 35800OO is a customer-specific code list. The attributes are used as follows: listID="10380", listAgencyID—ID of the administrative organization of the code list, listVersionID—Version of the relevant code list, listAgencySchemeID—The identification of the scheme once the organization listed in the listAgencyID is identified, and listAgencySchemeAgencyID—The ID of the managing organization (for example, DUNS, EAN, SWIFT) that is responsible for identification of the organization listed in the listAgencyID.

Examples of the possible semantics of the codes are: Domestic end customers, foreign end customers, and foreign business customers. The preceding examples assume that the general payment behavior differs between end customers and business customers as well as between domestic and foreign business partners.

(ppppppppppppppppppppppppp) WarrantyDependencyTypeCode

A GDT WarrantyDependencyTypeCode 35800OP is a coded representation of the type of warranty dependency. For example, the warranty dependency defines which criterium specifies the validity of the warranty. An example of GDT WarrantyDependencyTypeCode 35800OP is:

<WarrantyDependencyTypeCode>1</WarrantyDependencyTypeCode>

The structure of GDT WarrantyDependencyTypeCode 35800OP is depicted in FIG. 358OP. For the GDT WarrantyDependencyTypeCode 35800OP, the Object Class is Warranty 35804OP, the Property is Dependency Type 35806OP, the Representation/Association is Code 35808OP, the Type is CCT 35810OP, the Type Name is Code 35812OP, and the Length is from one 35814OP. The remark 35818OP shows that the GDT WarrantyDependencyTypeCode 35800OP may be restricted.

A fixed code list has been assigned to the GDT WarrantyDependencyTypeCode 35800OP. The attributes are as follows: listID="10105", listAgencyID="310", and listVersionID=Version of the relevant code list.

Examples for the use of the GDT WarrantyDependencyTypeCode 35800OP are: for a warranty with reference to time (i.e., 2 years' warranty from purchase date), for a warranty with reference to counter (i.e., free of charge spare parts for the engine for the first 1000 kilometers), and or a warranty with reference to time and counter (i.e., 3 years' warranty and 100,000 kilometers).

The data type GDT WarrantyDependencyTypeCode 35800OP may use the following codes: 1 (i.e., the warranty is time-based), 2 (i.e., the warranty is counter-based), and 3 (i.e., the warranty is time-based and counter-based).

(qqqqqqqqqqqqqqqqqqqqqqqqq) WarrantyGoodwillCode

A GDT WarrantyGoodwillCode 35800OQ is a coded representation stating to what extent something is seen as a case for warranty or goodwill. For example, the word "something" usually stands for provision of a service or a material. An example of the GDT WarrantyGoodwillCode 35800OQ is:

<WarrantyGoodwillCode>1</WarrantyGoodwillCode>

The structure of the GDT WarrantyGoodwillCode 35800OQ is depicted in FIG. 358OQ. For the GDT WarrantyGoodwillCode 35800OQ, the Property is Warranty Goodwill 35803OQ, the Representation/Association is Code 35804OQ, the Type is CCT 35805OQ, the Type Name is Code 35806OQ, and the Length is from one to two 35807OQ. The remark 35809OQ shows that the GDT WarrantyGoodwillCode 35800OQ may be restricted.

For the ListID 35810OQ, the Category is Attribute (A) 35811OQ, the Object Class is CodeList 35812OQ, the Property is Identification 35813OQ, the Representation/Association is Identifier 35814OQ, the Type is XSD 35815OQ, the Type Name is Token 35816OQ, and the Cardinality is zero or one 35818OQ.

For the ListAgencyID 35820OQ, the Category is Attribute (A) 35821OQ, the Object Class is CodeListAgency 35822OQ, the Property is Identification 35823OQ, the Representation/Association is Identifier 35824OQ, the Type is XSD 35825OQ, the Type Name is Token 35826OQ, and the Cardinality is zero or one 35828OQ.

For the ListVersionID 35830OQ, the Category is Attribute (A) 35831OQ, the Object Class is CodeList 35832OQ, the Property is Version 35833OQ, the Representation/Association is Identifier 35834OQ, the Type is XSD 35835OQ, the Type Name is Token 35836OQ, and the Cardinality is zero or one 35838OQ.

For the ListAgency-SchemeID 35840OQ, the Category is Attribute (A) 35841OQ, the Object Class is CodeListAgency 35842OQ, the Property is Scheme 35843OQ, the Representation/Association is Identifier 35844OQ, the Type is XSD 35845OQ, the Type Name is Token 35846OQ, and the Cardinality is zero or one 35848OQ.

For the ListAgency-SchemeAgencyID 35850OQ, the Category is Attribute (A) 35851OQ, the Object Class is CodeListAgency 35852OQ, the Property is SchemeAgency 35853OQ, the Representation/Association is Identifier 35854OQ, the Type is XSD 35855OQ, the Type Name is Token 35856OQ, and the Cardinality is zero or one 35858OQ.

There are only alternative code lists that may differ at configuration and/or runtime. The GDT WarrantyGoodwillCode 35800OQ may be a customer-specific code list.

The attributes are used as follows: listID—ID of the relevant code list, listAgencyID—The ID of the customer, listVersionID—Version of the relevant code list, listAgencySchemeID—The ID of the scheme by which the customer listed in the listAgencyID is identified, and listAgencySchemeAgencyID—The ID of the managing organization (for example, DUNS, EAN, SWIFT) that is responsible for identification of the organization listed in the listAgencyID.

The GDT WarrantyGoodwillCode 35800OQ can be used in the following ways: for service orders or confirmation items, to specify whether they are covered by a warranty, or to what extent they are covered by goodwill, and in financial accounting, to separate the declaration of costs incurred and revenue obtained according to warranty or goodwill.

Examples of codes with certain business semantics are: Warranty (i.e., the services or spare parts are completely covered by the warranty), 100% goodwill (i.e., the services or spare parts are not covered by the warranty. However, the customer is extended goodwill in the form of a price discount of 100%), and 50% goodwill (i.e., the services or spare parts are not covered by the warranty. However, the customer is extended goodwill in the form of a price discount of 50%).

(rrrrrrrrrrrrrrrrrrrrrr) WithholdingTaxationC haracteristicsCode

A GDT WithholdingTaxationCharacteristicsCode 35800OR is a coded representation of the main characteristics that form the basis of a withholding taxation. For example, main characteristics are the type of product tax (WithholdingTaxEventTypeCode), and the type of tax rate (TaxRateTypeCode) for each type of tax (Tax-TypeCode) related thereto. An example of the GDT WithholdingTaxationCharacteristicsCode 35800OR is:

<WithholdingTaxationCharacteristicsCode listID=21901 listAgencyID=310>1</WithholdingTaxtationCharacteristicsCode>

The structure of the GDT WithholdingTaxationCharacteristicsCode 35800OR is depicted in FIG. 358OR. For the GDT WithholdingTaxationCharacteristicsCode 35800OR, the Object Class is WithholdingTaxationCharacteristics 35801OR, the Representation/Association is Code 35804OR, the Type is CCT 35805OR, the Type Name is Code 35806OR, and the Length is from one to four 35807OR. The remark 35809OR shows that the GDT WithholdingTaxationCharacteristicsCode 35800OR may be restricted.

For the ListID 35810OR, the Category is Attribute (A) 35811OR, the Object Class is CodeList 35812OR, the Property is Identification 35813OR, the Representation/Association is Identifier 35814OR, the Type is XSD 35815OR, the Type Name is Token 35816OR, and the Cardinality is zero or one 35818OR.

For the ListAgencyID 35820OR, the Category is Attribute (A) 35821OR, the Object Class is CodeListAgency 35822OR, the Property is Identification 35823OR, the Representation/Association is Identifier 35824OR, the Type is XSD 35825OR, the Type Name is Token 35826OR, and the Cardinality is zero or one 35828OR.

For the ListVersionID 35830OR, the Category is Attribute (A) 35831OR, the Object Class is CodeList 35832OR, the Property is Version 35833OR, the Representation/Association is Identifier 35834OR, the Type is XSD 35835OR, the Type Name is Token 35836OR, and the Cardinality is zero or one 35838OR.

For the ListAgency-SchemeID 35840OR, the Category is Attribute (A) 35841OR, the Object Class is CodeListAgency 35842OR, the Property is Scheme 35843OR, the Representation/Association is Identifier 35844OR, the Type is XSD 35845OR, the Type Name is Token 35846OR, and the Cardinality is zero or one 35848OR.

For the ListAgency-SchemeAgencyID 35850OR, the Category is Attribute (A) 35851OR, the Object Class is CodeListAgency 35852OR, the Property is SchemeAgency 35853OR, the Representation/Association is Identifier 35854OR, the Type is XSD 35855OR, the Type Name is Token 35856OR, and the Cardinality is zero or one 35858OR.

Several extensible, country-specific code lists, which are distinguished at runtime, may be assigned to the code. If customers create their own code lists the allocation of attributes changes as follows: listAgencyID—ID of the customer, listVersionID—Assigned and managed by the customer, listAgencySchemeID—ID of the scheme, and listAgencySchemeAgencyID—ID of the organization that manages the scheme of the listAgencySchemeID. Although code lists provided may include all combinations of WithholdingTaxEventTypeCode and TaxRateTypeCode, it may still be possible to enhance code lists, in order to provide users the possibility to use in-house codes.

The GDT WithholdingTaxationCharacteristicsCode 35800OR for EN (SAP code list): listID="21901", listAgencyID="310", and listVersionID=[Version of the relevant code list.].

The data type GDT WithholdingTaxationCharacteristicsCode 35800OR may use the following codes: 1 (i.e., construction work subject to withholding tax, at the full tax rate), and 2 (i.e., construction work exempt from withholding tax).

(ssssssssssssssssssssssss) AddressPostalAddressID

A GDT AddressPostalAddressID 35800OS is a unique, proprietary identifier of the postal address part of an address. An example of GDT AddressPostalAddressID 35800OS is:

<AddressPostalAddressID>0000010512</AddressPostalAddressID>

The structure of GDT AddressPostalAddressID 35800OS is depicted in FIG. 358OS. For the GDT AddressPostalAddressID 35800OS, the object class is Address Postal Address 35802OS, the property is Identification 35804OS, the Representation/Association is Identifier 35806OS, the Type is CCT 35808OS, the Type Name is Identifier 35810OS, and the length is from one to ten 35812OS. The remark 35814OS shows that the GDT AddressPostalAddressID 35800OS can be restricted.

The data type AddressPostalAddressID 35800OS is required to uniquely identify personal addresses and workplace addresses because these are not identified uniquely by the AddressPersonID alone. The following dictionary objects are assigned to this GDT in mySAP systems: Data element: ADDR_ADDRNUM Domain: AD_ADDRNUM.

(tttttttttttttttttttttt) AddressRepresentationCode

A GDT AddressRepresentationCode 35800OT is the code for the representation of an address. Other representations can be maintained for an address, for example, in other languages. An example of GDT AddressRepresentationCode 35800OT is:

<AddressRepresentationCode listAgencyID=310>K</AddressRepresentationCode>

The structure of GDT AddressRepresentationCode 35800OT is depicted in FIG. 358OT. For GDT AddressRepresentationCode 35800OT, the object class is address 35801OT, the Property is Representation 35802OT, the Representation/Association is Code 35803OT, the Type is CCT 35804OT, the Type Name is Code 35805OT, the Length is one 35806OT. For listAgencyID 35820OT, the category is A 35811OT, the object class is CodeListAgency 35822OT, the property is Identification 35823OT, the Representation/Association is Identifier 35824OT, the type is xsd 35825OT, the type name is token 35826OT, and the cardinality is from zero to one 35828OT. For listVersionID 35830OT, the category is A 35831OT, the object class is CodeList 35832OT, the property is Version 35833OT, the Representation/Association is Identifier 35834OT, the type is xsd 35835OT, the type name is token 35836OT, and the cardinality is from zero to one 35838OT. For listAgencySchemeID 35840OT, the category is A 35841OT, the object class is CodeListAgency 35842OT, the property is Scheme 35843OT, the Representation/Association is Identifier 35844OT, the type is xsd 35845OT, the type name is token 35846OT, and the cardinality is from zero to one 35848OT. For listAgencySchemeAgencyID 35850OT, the category is A 35851OT, the object class is CodeListAgency 35852OT, the property is SchemeAgency 35853OT, the Representation/Association is Identifier 35854OT, the type is xsd 35855OT, the type name is token 35856OT, and the cardinality is from zero to one 35858OT.

An extendable SAP code list is assigned to the AddressRepresentafionCode. SAP customers can change this code list. In its unchanged state, the SAP code list has the following attributes: listID="10181," listAgencyID="310," and listVersionID. If an SAP customer makes changes to the SAP code list, the values assigned to the attributes change as follows:

listAgencyID—ID of the SAP customer (ID from DE 3055 if listed there)

listVersionID—Assigned and managed by the SAP customer listAgencySchemeID—ID of the scheme listAgencySchemeAgencyID—ID of the organization The data type AddressRepresentationCode 35800OT may be used in the administration of address data to indicate different address representations. A value for the AddressAlternativeRepresentationCode is flagged as "Active" in the table TSADVC. The following codes are possible: (A Arabic)—Arabic address representation; (B Hebrew)—Hebrew address representation; (C Chinese)—Chinese address representation; (G Greek)—Greek address representation; (H Hangul)—Address representation in Hangul (Korean); (I International)—International address representation (Latin characters); (K Kanji)—Address representation in Kanji (Japanese); (M Traditional Chinese)—Address representation in traditional Chinese characters; (N Katakana)—Address representation in Katakana (Japanese); (R Cyrillic)—Address representation in Cyrillic (Russian); (T Thai)—Thai address representation.

(uuuuuuuuuuuuuuuuuuuuuuuuu) BusinessSystemID

A GDT BusinessSystemID 35800OU is a unique identifier for a business system. A business system is one that participates in message exchange either as a sending or receiving system. An example of GDT BusinessSystemID 35800OU is:

<BusinessSystemID>AE1_805</BusinessSystemID>

The structure of GDT BusinessSystemID 35800OU is depicted in FIG. 358OU. For GDT BusinessSystemId 35800OU, the Property is Business System 35806OU, the Representation/Association is Identification 35808OU, the Type is Identifier 35810OU, the Type Name is CCT 35812OU, the Length is from one to sixty 35814OU.

The BusinessSystemID is designated for use within a system landscape and is used to identify the source and target system of data. For example, in the SAP System Landscape Directory (SLD), the BusinessSystemID is the unique identification of a system in a system landscape. In SAP systems the BusinessSystemID is represented by the data element SLD_BSKEY.

(vvvvvvvvvvvvvvvvvvvvvvvvv) BusinessTransactionDocumentParty

A GDT BusinessTransactionDocumentParty 35820OVi contains the information that is exchanged—in accordance with common business understanding—in business documents about a party involved in business transactions. This information is used to identify the party and the party's address, as well as the party's contact person and the contact person's address. This identification can take place using an internal ID, a standardized ID, or IDs assigned by the parties involved.

For example, a party may be a natural person, organization, or business partner group in which a company has a business or intra-enterprise interest. This could be a person, organization, or group within or outside of the company. An ID assigned by a party identifies in the name the role the assigning party plays in the business transaction. At present, the roles are Buyer, Seller, ProductRecipient, Vendor, BillTo, BillFrom and Bidder.

The examples show the xml instance of the GDT BusinessTransactionDocumentParty within a purchase order for different identification types (standard ID, party IDs, internal ID). Here, the party assumes the role of Buyer. According to the rule Rx, the GDT name BusinessTransactionDocumentParty is converted in the XML instance as shown in the following examples. Example 1 contains a Standard ID and PartyIDs.

```
<PurchaseOrder>
. . .
<BuyerParty>
<StandardID schemeAgencyID="016">4711</StandardID>
<BuyerID>9873</BuyerID>
<SellerID>487847</SellerID>
<Address>. . .</Address>
<ContactPerson>
<BuyerID>9874</BuyerID>
<SellerID>487848</SellerID>
<Address>. . .</Address>
</ContactPerson>
</BuyerParty>
</PurchaseOrder>
```

The schemeAgencyID of "016" corresponds to Dun&Bradstreet according to code list D3055 that means that the DUNS number is assigned by Dun&Bradstreet.

Example 2 contains an Internal ID.

```
<PurchaseOrder>
. . .
<BuyerParty>
<InternalID schemeID="PartyID" schemeAgencyID="BPL_300">747
</InternalID>
<Address>. . .</Address>
<ContactPerson>
<InternalID schemeID="PartyID" schemeAgencyID="BPL_300">737
</InternalID>
<Address>. . .</Address>
</ContactPerson>
</BuyerParty>
<PurchaseOrder>
```

The schemeID of "PartyID" indicates that the scheme "PartyID" was used to identify the party. The schemeAgencyID=of "BPL__300" indicates that the scheme was assigned by the CMDM system "BPL__300".

The structure of GDT BusinessTransactionDocumentParty 35820OVI is depicted in FIGS. 358OVi-iii. For the GDT BusinessTransactionDocumentParty 35820OVi, the Object Class is BusinessTransactionDocumentParty 35821OVi and the Representation/Association is Details 35822OVi.

For the InternalID 35823OVi, the Category is Element (E) 35827OVi, the Object Class is BusinessTransactionDocumentParty 35824OVi, the PropertyQualifier is Internal 35825OVi, the Property is Identification 35826OVi, the Representation/Association is Identifier 35828OVi, the Type is CDT 35830OVi, the Type Name is PartyInternalID 35831OVi, and the Cardinality is zero or one 35832OVi.

For the StandardID 35833OVi, the Category is Element (E) 35837OVi, the Object Class is BusinessTransactionDocumentParty 35834OVi, the PropertyQualifier is Standard 35835OVi, the Property is Identification 35836OVi, the Representation/Association is Identifier 35838OVi, the Type is CDT 35840OVi, the Type Name is PartyStandardID 35841OVi, and the Cardinality is zero or any number 35842OVi.

For the BuyerID 35843OVi, the Category is Element (E) 35844OVi, the Object Class is BusinessTransactionDocumentParty 35845OVi, the PropertyQualifier is Buyer 35846OVi, the Property is Version 35848OVi, the Representation/Association is Identifier 35850OVi, the Type is CDT 35851OVi, the Type Name is PartyPartyID 35852OVi, and the Cardinality is zero or one 35853OVi.

For the SellerID 35854OVi, the Category is Element (E) 35855OVi, the Object Class is BusinessTransactionDocumentParty 35856OVi, the PropertyQualifier is Seller 35857OVi, the Property is Identification 35858OVi, the Representation/Association is Identifier 35859OVi, the Type is CDT 35860OVi, the Type Name is PartyPartyID 35861OVi, and the Cardinality is zero or one 35862OVi.

For the ProductRecipientID 35863OVi, the Category is Element (E) 35864OVi, the Object Class is BusinessTransactionDocumentParty 35865OVi, the PropertyQualifier is ProductRecipient 35866OVi, the Property is Identification 35867OVi, the Representation/Association is Identifier 35868OVi, the Type is CDT 35869OVi, the Type Name is PartyPartyID 35870OVi, and the Cardinality is zero or one 35871OVi.

For the VendorID 35823OVii, the Category is Element (E) 35827OVii, the Object Class is BusinessTransactionDocumentParty 35824OVii, the PropertyQualifier is Vendor 35825OVii, the Property is Identification 35826OVii, the Representation/Association is Identifier 35828OVii, the Type is CDT 35830OVii, the Type Name is PartyPartyID 35831OVii, and the Cardinality is zero or one 35832OVii.

For the BillToID 35833OVii, the Category is Element (E) 35837OVii, the Object Class is BusinessTransactionDocumentParty 35834OVii, the PropertyQualifier is BillTo 35835OVii, the Property is Identification 35836OVii, the Representation/Association is Identifier 35838OVii, the Type is CDT 35840OVii, the Type Name is PartyPartyID 35841OVii, and the Cardinality is zero or one 35842OVii.

For the BillFromID 35843OVii, the Category is Element (E) 35844OVii, the Object Class is BusinessTransactionDocumentParty 35845OVii, the PropertyQualifier is BillFrom 35846OVii, the Property is Identification 35848OVii, the Representation/Association is Identifier 35850OVii, the Type is CDT 35851OVii, the Type Name is PartyPartyID 35852OVii, and the Cardinality is zero or one 35853OVii.

For the BidderID 35823OViii, the Category is Element (E) 35824OViii, the Object Class is BusinessTransactionDocumentParty 35825OViii, the PropertyQualifier is Bidder 35826OViii, the Property is Identification 35828OViii, the Representation/Association is Identifier 35830OViii, the Type is CDT 35831OViii, the Type Name is PartyPartyID 35832OViii, and the Cardinality is zero or one 35833OViii.

For the TaxID 35834OViii, the Object Class is BusinessTransactionDocumentParty 35835OViii, the Property is TaxIdentification 35836OViii, the Representation/Association is Identifier 35838OViii, the Type is GDT 35840OViii, the Type Name is PartyTaxID 35841OViii, and the Cardinality is zero or one 35842OViii.

For the Address 35843OViii, the Category is Element (E) 35844OViii, the Object Class is BusinessTransactionDocumentParty 35845OViii, the Property is Address 35848OViii, the Representation/Association is Address 35850OViii, the Type is GDT 35851OViii, the Type Name is Address 35852OViii, and the Cardinality is zero or one 35853OViii.

For the ContactPerson 35854OViii, the Category is Element (E) 35855OViii, the Object Class is BusinessTransactionDocumentParty 35856OViii, the Property is ContactPerson 35858OViii, the Representation/Association is ContactPerson 35859OViii, the Type is GDT 35860OViii, the Type Name is ContactPerson 35861OViii, and the Cardinality is zero or one 35862OViii.

The InternalID is the proprietary identifier that is used when both sender and recipient can access shared master data (extended enterprise). The StandardID is the standardized identifier for this party, whose identification scheme is managed by an agency from the DE 3055 code list. The BuyerID is the identifier that is used by the BuyerParty for this party. The SellerID is the identifier that is used by the SellerParty for this party. The ProductRecipientIDis the identifier that is used by the ProductRecipientParty for this party. The VendorID is the identifier that is used by the VendorParty for this party. The BillToID is the identifier that is used by the BillToParty for this party. The BillFromID is the identifier that is used by the BillFromParty for this party. The BidderID is the identifier that is used by the BidderParty for this party. The TaxID is the identifier issued by an tax authority for a party. The Address is the address of the party. The ContactPerson is the contact person of the party.

In some implementations, the different IDs of a BusinessTransactionDocumentParty always identify the same party. A party is identified in the following (complementary) ways: InternalID (when sender and recipient can access shared master data), StandardID (when sender and recipient can manage standardized identifiers), PartytPartyIDs (when sender and recipient are interested in the PartyIDs assigned by the parties involved). Of the IDs available to the sender, generally only IDs that the recipient is expected to understand are used in a message. The CDT BusinessTransactionDocumentParty can only be used in business documents (BusinessTransactionDocuments). The CDT BusinessTransactionDocumentParty is used in messages for internal and external communication to transmit required information about the parties involved.

(wwwwwwwwwwwwwwwwwwwwwwwwww) CommunicationAddressUsage

A GDT CommunicationAddressUsage 35800OW is a time-dependent usage of a communication address. A communication address can, for example, be a telephone number, a fax number or an e-mail address. An example of GDT CommunicationAddressUsage 35800OW is:

```
<CommunicationAddressUsage>
<Code>AD_DEFAULT</Code>
<ValidityPeriod>
<StartDate>2004-01-01</StartDate>
<EndDate>2005-09-30</EndDate>
</ValidityPeriod>
</CommunicationAddressUsage>
```

The structure of GDT CommunicationAddressUsage 35800OW is depicted in FIG. 358OW. For the GDT CommunicationAddressUsage 35800OW, the Object Class is CommunicationAddressUsage 35801OW and the Representation/Association is Details 35804OW.

For the Code 35810OW, the Category is Element (E) 35811OW, the Object Class is CommunicationAddressUsage 35812OW, the Property is Usage 35813OW, the Representation/Association is Date 35814OW, the Type is GDT 35815OW, the Type Name is CommunicationAddressUsageCode 35816OW, and the Cardinality is one 35818OW.

For the ValidityPeriod 35820OW, the Category is Element (E) 35821OW, the Object Class is CommunicationAddressUsage 35822OW, the Property is Validity 35823OW, the Representation/Association is DatePeriod 35824OW, the Type is GDT 35825OW, the Type Name is DatePeriod 35826OW, and the Cardinality is zero or one 35828OW.

CommunicationAddressUsage consists of the following sub-elements: Code (The code for indicating the usage) and ValidityPeriod (Period of validity for using the communication address). The GDT CommunicationAddressUsage is used to assign a particular usage to the communication details for a period of time.

(xxxxxxxxxxxxxxxxxxxxxxxxx) CommunicationAddressUsageCode

A GDT CommunicationAddressUsageCode 35800OX is the coded representation for the usage of a communication address. A communication address can, for example, be a telephone number, a fax number or an e-mail address. An example of GDT CommunicationAddressUsageCode 35800OX is:

| |
|---|
| <CommunicationAddressUsageCodelistAgencyID=310> AD_DEFAULT</CommunicationAddressUsageCode> |

For listAgencyID 35820OX, the category is A 35811OX, the object class is CodeListAgency 35822OX, the property is Identification 35823OX, the Representation/Association is Identifier 35824OX, the type is xsd 35825OX, the type name is token 35826OX, and the cardinality is from zero to one 35828OX. For listVersionID 35830OX, the category is A35831OX, the object class is CodeList35832OX, the property is Version 35833OX, the Representation/Association is Identifier 35834OX, the type is xsd 35835OX, the type name is token 35836OX, and the cardinality is from zero to one 35838OX. For listAgencySchemeID 35840OX, the category is A 35841OX, the object class is CodeListAgency 35842OX, the property is Scheme 35843OX, the Representation/Association is Identifier 35844OX, the type is xsd 35845OX, the type name is token 35846OX, and the cardinality is from zero to one 35848OX. For listAgencySchemeAgencyID 35850OX, the category is A 35851OX, the object class is CodeListAgency 35852OX, the property is SchemeAgency 35853OX, the Representation/Association is Identifier 35854OX, the type is xsd 35855OX, the type name is token 35856OX, and the cardinality is from zero to one 35858OX.

An extendable SAP code list is assigned to the CommunicationAddressUsageCode. SAP customers can extend this code list by additional entries; how-ever, the already-existing entries may not be removed from this SAP code list The attributes are as follows: listID="10261," listAgencyID="310," If an SAP customer makes changes to the SAP code list, the values assigned to the attributes change as follows: listAgencyID—ID of the SAP customer (ID from DE 3055 if listed there), listVersionID—Assigned and managed by the SAP customer, listAgencySchemeID—ID of the scheme if the listAgencyID is not taken from DE 3055, listAgencySchemeAgencyID (yyyyyyyyyyyyyyyyyyyyyyyyy) CriticalityCode The GDT CriticalityCode 35800OY is a coded representation of how critical a status is. An example of GDT CriticalityCode 35800OY is:

<CriticalityCode>1</CrificalityCode>

The structure of GDT CriticalityCode 35800OY is depicted in FIG. 358OY. For GDT CriticalityCode 35800OY, the Property is Criticality 35802OY, the Representation/Association is Code 35804OY, the Type is CCT 35806OY, the Type Name is Code 35808OY, and the Length is one 35810OY. The remark 35812OY shows that the GDT CriticalityCode 35800OY can be restricted.

One fixed SAP code list is assigned to the CriticalityCode. The attributes are as follows: listID="10264," listAgencyID="310," and listVersionID. The CriticalityCode is used to specify whether a status is critical, partially critical or not critical. The following codes may be used: 1 (Critical) The status is viewed as critical, 2 (Partially critical) The status is viewed as partially critical, and 3 (Not critical) The status is viewed as non-critical.

(zzzzzzzzzzzzzzzzzzzzzzzzz) OpportunityGroupCode

A GDT OpportunityGroupCode 35800PC is the coded representation of a group of opportunities for sales displayed according to subjective criteria. A sales opportunity is used in CRM in order to document recognized sales opportunities, and to support the professional sales person in converting this opportunity. An example of the GDT OpportunityGroupCode 35800PC is:

<OpportunityGroupCode >1</OpportunityGroupCode >

The structure of GDT OpportunityGroupCode 35800PC is depicted in FIG. 358PC. The GDT OpportunityGroupCode 35800PC includes attributes listID 35816PC, listAgencyID 35832PC, listVersionID 35848PC, listAgencySchemeID 35864PC, and listAgencySchemeAgencyID 35880PC. For the GDT OpportunityGroupCode 35800PC, the Object Class term is Opportunity 35802PC, the Property term is Group 35804PC, the Representation/Association term is Code 35806PC, the Type term is CCT 35808PC, the Type Name term is Code 35810PC, and the Length is from one to four 35812PC.

For the listID 35816PC, the Category is Attribute 35818PC, the Object Class term is CodeList 35820PC, the Property term is Identification 35822PC, the Representation/Association term is Identifier 35822PC, the Type term is xsd 35826PC, and the Type Name term is token 35828PC. The cardinality between the listID 35816PC and the GDT OpportunityGroupCode 35800PC is either zero or one 35830PC.

For the listAgencyID 35832PC, the Category is Attribute 35834PC, the Object Class term is CodeListAgency 35836PC, the Property term is Identification 35838PC, the Representation/Association term is Identifier 35840PC, the Type term is xsd 35842PC, and the Type Name term is token 35844PC. The Cardinality between the listAgencyID 35832PC and the GDT OpportunityGroupCode 35800PC is either zero or one 35846PC.

For the listVersionID 35848PC, the Category is Attribute 35850PC, the Object Class term is CodeList 35852PC, the Property term is Version 35854PC, the Representation/Association term is Identifier 35856PC, the Type term is xsd 35858PC, and the Type Name term is token 35860PC. The cardinality between the listVersionID 35848PC and the GDT OpportunityGroupCode 35800PC is either zero or one 35862PC.

For the listAgencySchemeID 35864PC, the Category is Attribute 35866PC, the Object Class term is CodeListAgency 35868PC, the Property term is Scheme 35870PC, the Representation/Association term is Identifier 35872PC, the Type term is xsd 35874PC, and the Type Name term is token 35876PC. The cardinality between the listAgencySchemeID 35864PC and the GDT OpportunityGroupCode 35800PC is either zero or one 35878PC.

For the listAgencySchemeAgencyID 35880PC, the Category is Attribute 35882PC, the Object Class term is CodeListAgency 35884PC, the Property term is SchemeAgency 35886PC, the Representation/Association term is Identifier 35888PC, the Type term is xsd 35890PC, and the Type Name term is token 35892PC. The cardinality between the listAgencySchemeAgencyID 35880PC and the GDT OpportunityGroupCode 35800PC is either zero or one 35894PC.

In some variations, multiple code lists are allowed for OpportunityGroupCode 35800PC. The customer can add other code lists. In some variations, the attributes may be as follows:

listID="10055"

listAgencyID="310"

listVersionID—version of the relevant code list.

In some implementations, the attributes can be used as follows:

ListID—ID of the relevant code list. This is assigned and administered by the organization responsible for the code list, which is not listed in DE 3055. GDT owner must obtain the exact ID from the organization responsible. If no unique ID is available, the name of the relevant code list or code type used in the corresponding standard, specification, or scheme of the responsible organization must be entered.

listAgencyID—ID of the administrative organization of the code list. This ID is provided by the organization and is taken from DE 3055. (For example, the DUNS number or EAN number of a company). GDT owner must obtain the relevant ID from the organization responsible.

ListVersionID—version of the relevant code list. This is assigned and administered by the organization listed in the listAgencyID. GDT owner must obtain the relevant versions ID from the organization responsible. If no version has been issued for the code list, the version of the standard, the specification, or the scheme must be used.

listAgencySchemeID—The identification of the scheme once the organization listed in the listAgencyID is identified. It is a particular identification scheme for partners, businesses, and members (such as DUNS+4), and so on, of an administering organization (such as EAN, DUNS, and SWIFT) that is listed in the listAgencySchemeAgencyID.

ListAgencySchemeAgencyID—the ID of the administering organization (such as DUNS, EAN or SWIFT) that is responsible for identifying the organization listed in the ListAgencyID. It has to be listed in DE 3055.

The GDT OpportunityGroupCode 35800PC can be used primarily in reporting. As an example, a possible customer-specific code semantics can be Strategic Project, which the OpportunityGroupCode groups sales opportunities according to strategic projects.

An exemplary code list may be:

| Code | Name | Description |
|---|---|---|
| 1 | Miscellaneous | Other |
| 2 | Customer Care | The sales opportunity serves to maintain existing customers |
| 3 | New Business | The sales opportunity serves to win new customers |

(aaaaaaaaaaaaaaaaaaaaaaaaa) OpportunityOriginTypeCode

A GDT OpportunityoriginTypeCode 35800PD is the coded representation regarding the origin type for an opportunity. The origin type does not refer to the technical origin, but a place, a communication channel, and so on that represents the type of origin of a sales opportunity. An example of the GDT OpportunityoriginTypeCode 35800PD is:

<OpportunityoriginTypeCode>1</Opportunityorigin-TypeCode>

The structure of GDT OpportunityoriginTypeCode 35800PD is depicted in FIG. 358PD. The GDT Opportunity-originTypeCode 35800PD includes attributes listID 35816PD, listAgencyID 35832PD, listVersionID 35848PD, listAgencySchemeID 35864PD, and listAgency-SchemeAgencyID 35880PD. For the GDT OpportunityoriginTypeCode 35800PD, the Object Class term is Opportunity 35802PD, the Property term is OriginType 35804PD, the Representation/Association term is Code 35806PD, the Type term is CCT 35808PD, the Type Name term is Code 35810PD, and the Length is from one to three 35812PD.

For the listID 35816PD, the Category is Attribute 35818PD, the Object Class term is CodeList 35820PD, the Property term is Identification 35822PD, the Representation/Association term is Identifier 35822PD, the Type term is xsd 35826PD, and the Type Name term is token 35828PD. The cardinality between the listID 35816PD and the GDT OpportunityoriginTypeCode 35800PD is either zero or one 35830PD.

For the listAgencyID 35832PD, the Category is Attribute 35834PD, the Object Class term is CodeListAgency 35836PD, the Property term is Identification 35838PD, the Representation/Association term is Identifier 35840PD, the Type term is xsd 35842PD, and the Type Name term is token 35844PD. The Cardinality between the listAgencyID 35832PD and the GDT OpportunityoriginTypeCode 35800PD is either zero or one 35846PD.

For the listVersionID 35848PD, the Category is Attribute 35850PD, the Object Class term is CodeList 35852PD, the Property term is Version 35854PD, the Representation/Association term is Identifier 35856PD, the Type term is xsd 35858PD, and the Type Name term is token 35860PD. The cardinality between the listVersionID 35848PD and the GDT OpportunityOriginTypeCode 35800PD is either zero or one 35862PD.

For the listAgencySchemeID 35864PD, the Category is Attribute 35866PD, the Object Class term is CodeListAgency 35868PD, the Property term is Scheme 35870PD, the Representation/Association term is Identifier 35872PD, the Type term is xsd 35874PD, and the Type Name term is token 35876PD. The cardinality between the listAgencySchemeID 35864PD and the GDT OpportunityOriginTypeCode 35800PD is either zero or one 35878PD.

For the listAgencySchemeAgencyID 35880PD, the Category is Attribute 35882PD, the Object Class term is CodeListAgency 35884PD, the Property term is SchemeAgency 35886PD, the Representation/Association term is Identifier 35888PD, the Type term is xsd 35890PD, and the Type Name term is token 35892PD. The cardinality between the listAgencySchemeAgencyID 35880PD and the GDT OpportunityOriginTypeCode 35800PD is either zero or one 35894PD.

In some variations, multiple code lists can be allowed for the GDT OpportunityOriginTypeCode 35800PD. The customer can add other code lists. In some variations, the attributes are as follows:

listID="10076"

listAgencyID="310"

ListVersionID—version of the relevant code list.

The attributes are used as follows:

ListID—ID of the relevant code list. This is assigned and administered by the organization responsible for the code list, which is not listed in DE 3055. GDT owner must obtain the exact ID from the organization responsible. If no unique ID is available, the name of the relevant code list or code type used in the corresponding standard, specification, or scheme of the responsible organization must be entered.

listAgencyID—ID of the administrative organization of the code list. This ID is provided by the organization and is taken from DE 3055. (For example, the DUNS number or EAN number of a company). GDT owner must obtain the relevant ID from the organization responsible.

ListVersionID—version of the relevant code list. This is assigned and administered by the organization listed in the listAgencyID. GDT owner must obtain the relevant versions ID from the organization responsible. If no version has been issued for the code list, the version of the standard, the specification, or the scheme must be used.

listAgencySchemeID—The identification of the scheme once the organization listed in the listAgencyID is identified. It is a particular identification scheme for partners, businesses, and members (such as DUNS+4), and so on, of an administering organization (such as EAN, DUNS, and SWIFT) that is listed in the listAgencySchemeAgencyID.

ListAgencySchemeAgencyID—the ID of the administering organization (such as DUNS, EAN or SWIFT) that is responsible for identifying the organization listed in the ListAgencyID. It has to be listed in DE 3055.

The OpportunityoriginTypeCode 35800PD is used primarily in reporting. An example of possible customer-specific code semantic may be a Public invitation to tender, which is a business transaction originates from a public invitation to tender.

An Exemplary Code List May be:

| Code | Name | Description |
|---|---|---|
| 1 | Trade Fair | The opportunity originates from a trade fair. |
| 2 | External Partner | The opportunity originates from contact with an external partner. |
| 3 | Campaign | The opportunity originates from a campaign. |
| 4 | Telephone Inquiry | The opportunity originates from a telephone inquiry. |
| 5 | Roadshow | The opportunity originates from a roadshow. |

(bbbbbbbbbbbbbbbbbbbbbbbbb) PersonNameFormatCode

A GDT PersonNameFormatCode 35800PE is the coded representation of the rule used for formatting the complete name of a person using its name components. An example of the GDT PersonNameFormatCode 35800PE is <PersonNameFormatCode listAgencyID=310>01</PersonNameFormatCode>

The structure of GDT PersonNameFormatCode 35800PE is depicted in FIG. 358PE. The GDT PersonNameFormatCode 35800PE includes attributes listID 35816PE, listAgencyID 35832PE, listVersionID 35848PE, listAgencySchemeID 35864PE, and listAgencySchemeAgencyID 35880PE. For the GDT PersonNameFormatCode 35800PE, the Property term is Person Name Format 35802PE, the Representation/Association term is Code 35804PE, the Type term is CCT 35806PE, the Type Name term is Code 35808PE, and the Length is either one or two 35810PE.

For the listID 35816PE, the Category is Attribute 35818PE, the Object Class term is CodeList 35820PE, the Property term is Identification 35822PE, the Representation/Association term is Identifier 35822PE, the Type term is xsd 35826PE, and the Type Name term is token 35828PE. The cardinality between the listID 35816PE and the GDT PersonNameFormatCode 35800PE is either zero or one 35830PE.

For the listAgencyID 35832PE, the Category is Attribute 35834PE, the Object Class term is CodeListAgency 35836PE, the Property term is Identification 35838PE, the Representation/Association term is Identifier 35840PE, the Type term is xsd 35842PE, and the Type Name term is token 35844PE. The Cardinality between the listAgencyID 35832PE and the GDT PersonNameFormatCode 35800PE is either zero or one 35846PE.

For the listVersionID 35848PE, the Category is Attribute 35850PE, the Object Class term is CodeList 35852PE, the Property term is Version 35854PE, the Representation/Association term is Identifier 35856PE, the Type term is xsd 35858PE, and the Type Name term is token 35860PE. The cardinality between the listVersionID 35848PE and the GDT PersonNameFormatCode 35800PE is either zero or one 35862PE.

For the listAgencySchemeID 35864PE, the Category is Attribute 35866PE, the Object Class term is CodeListAgency 35868PE, the Property term is Scheme 35870PE, the Representation/Association term is Identifier 35872PE, the Type term is xsd 35874PE, and the Type Name term is token 35876PE. The cardinality between the listAgencySchemeID 35864PE and the GDT PersonNameFormatCode 35800PE is either zero or one 35878PE.

For the listAgencySchemeAgencyID 35880PE, the Category is Attribute 35882PE, the Object Class term is CodeListAgency 35884PE, the Property term is SchemeAgency 35886PE, the Representation/Association term is Identifier 35888PE, the Type term is xsd 35890PE, and the Type Name term is token 35892PE. The cardinality between the listAgencySchemeAgencyID 35880PE and the GDT PersonNameFormatCode 35800PE is either zero or one 35894PE.

In some variations, several extensible, country-specific code lists, which are distinguished at runtime, are assigned to the PersonNameFormatCode. Customers can change these code lists. If a customer makes changes to one of the code lists, the values assigned to the attributes change as follows:

listAgencyID—ID of the customer (ID from DE 3055 if listed there)

listVersionID—Assigned and managed by the customer listAgencySchemeID—ID of the scheme if the listAgencyID is not taken from DE 3055 listAgencySchemeAgencyID—ID of the organization (taken from DE 3055) that manages the scheme of the listAgencySchemeID In some variations, the data type PersonNameFormatCode 35800PE is used in the names of persons. In one example, a "PersonNameFormatCode for DE" code list can be:

listID="20901"

listAgencyID="310"

listVersionID=Version of the relevant code list.

| Code | Name | Description |
|---|---|---|
| 01 | | Form of address, first name, additional name, last name |
| 02 | | Academic title, first name, name prefix, last name |

In another example, a "PersonNameFormatCode for JP" code list can be:

listID="20902"

listAgencyID="310"

listVersionID=Version of the relevant code list.

| Code | Name | Description |
|---|---|---|
| 01 | | First name, last name |

In another example, a “PersonNameFormatCode for US” code list can be:

listID=“20903”

listAgencyID=“310”

listVersionID=Version of the relevant code list.

| Code | Name | Description |
|---|---|---|
| 01 | | Form of address, first name, initials, last name, academic title |

(cccccccccccccccccccccccccc) PriceComponentFixationCode

A GDT PriceComponentFixationCode 35800PF is the coded representation of the fixation of a price component. The fixation specifies how elements of a price component are fixed when a price component is recalculated. An example of the GDT PriceComponentFixationCode 35800PF is:

<PriceComponentFixationCode>1</PriceComponentFixationCode>

The structure of GDT PriceComponentFixationCode 35800PF is depicted in FIG. 358PF. For the GDT PriceComponentFixationCode 35800PF, the Object Class term is PriceComponent 35802PF, the Property term is Fixation 35804PF, the Representation/Association term is Code 35806PF, the Type term is CCT 35808PF, the Type Name term is Code 35810PF, and the Length is from one to two 35812PF. The GDT PriceComponentFixationCode 35800PF may be restricted 35814PF.

The GDT PriceSpecificationBaseCode 35800PF can be a fixed code list. For example, the attributes of PriceComponentFixationCode may have the following values:

listID=10126 listAgencyID=310 listVersionID=Version of the relevant code list. Assigned and managed by SAP AG.

In some variations, the PriceComponentFixationCode can be a proprietary code list with fixed predefined values. Changes to the permitted values involve changes to the interface. An exemplary code list is:

| Code | Name | Description |
|---|---|---|
| 1 | Basis | Fixation of the basis of the price component |
| 2 | Value | Fixation of the calculated value of the price component |
| 3 | Basis-Value | Fixation of the basis and the calculated value of the price component |
| 4 | Rate-Basis Value | Fixation of the rate, the basis, and the calculated value of the price component |
| 5 | All | Fixation of the entire price component |

(dddddddddddddddddddddddddd) PriceComponentItemHierarchyEvaluationMethodCode

A GDT PriceComponentItemHierarchyEvaluationMethodCode 35800PG is the coded representation of the method used to evaluate the hierarchy of items in the underlying business transaction document for this price component. Exactly one item of the underlying business transaction document is assigned to a price component on item level. If this item has a hierarchical structure, then the method describes the influence that the relevant price component of the higher-level item or subitem has on the price component of the actual item, for the purpose of evaluating the item hierarchy. An example (Instance) of the GDT PriceComponentItemHierarchyEvaluationMethodCode 35800PG is:

<PriceComponentItemHierarchyEvaluationMethodCode>1</PriceComponentItemHierarchyEvaluationMethodCode>

The structure of GDT PriceComponentItemHierarchyEvaluationMethodCode 35800PG is depicted in FIG. 358PG. For the GDT PriceComponentItemHierarchyEvaluationMethodCode 35800PG, the Object Class term is Price Component 35802PG, the Property term is Item Hierarchy Evaluation Method 35804PG, the Representation/Association term is Code 35806PG, the Type term is CCT 35808PG, the Type Name term is Code 35810PG, and the Length is from one to two 35812PG. The GDT PriceComponentItemHierarchyEvaluationMethodCode 35800PG may be restricted 35814PG.

In some variations, the GDT PriceComponentItemHierarchyEvaluationMethodCode 35800PG can be a fixed Codelist. For example, the attributes of the GDT PriceComponentItemHierarchyEvaluationMethodCode 35800PG can have the following values:

listID=10124 listAgencyID=310 listVersionID=Version of the relevant code list.

In some variations, subitems are used in bills of material, for example. In this case, the bill of material header forms the main item. A discount (for example, 10%) that is entered manually on the bill of material header should be copied to all subitems. Conversely, the net price is usually cumulated from the subitems to the bill of material header.

The GDT PriceComponentItemHierarchyEvaluationMethodCode 35800PG is a proprietary code list with fixed predefined values. Changes to the permitted values involve changes to the interface. For example, a code list can be:

| Code | Name | Description |
|---|---|---|
| 1 | Duplication | The fixing of the price, discount, or surcharge based on the price claculation is duplicated by the higher-level item. |
| 2 | Cumulation | The price component is calculated by aggregating all subitems. |

(eeeeeeeeeeeeeeeeeeeeeeeeee) PriceComponentOriginCode

A GDT PriceComponentOriginCode 35800PH is the coded representation of the origin of the price component. A price component can be created manually or automatically; it can be created automatically from several data sources. An example of the GDT PriceComponentOriginCode 35800PH is:

<PriceComponentOriginCode>1</PriceComponentOriginCode>

The structure of GDT PriceComponentOriginCode 35800PH is depicted in FIG. 358PH. For the GDT PriceComponentOriginCode 35800PH, the Object Class term is Price Component 35802PH, the Property term is Origin 35804PH, the Representation/Association term is Code 35806PH, the Type term is CCT 35808PH, the Type Name term is Code 35810PH, and the Length is from one to two 35812PH. The GDT PriceComponentOriginCode 35800PH may be restricted 35814PH.

In some variations, there is exactly one code list and the GDT PriceComponentOriginCode 35800PH is a fixed code list. As an example, the attributes of PriceComponentOriginCode 35800PH have the following values:

listID=10123 listAgencyID=310 listVersionID=Version of the relevant code list.

In some implementations, the PriceComponentOriginCode 35800PH may a proprietary code list with fixed predefined values. Changes to the permitted values involve changes to the interface.

| Code | Name | Description |
|---|---|---|
| 1 | From external source | The entire price component was created externally with reference to the item of the business transaction that is assigned to the price component. |
| 2 | Manually | The input data that is used to calculate the price component was created manually. |
| 3 | From the item | The input data that is used to calculate the price component was created with reference to the item that is assigned to the price component, or with reference to all items of the business transaction. |
| 4 | From the business transaction | The input data that is used to calculate the price component was created with reference to the business transaction document. |
| 5 | From another business transaction | The input data that is used to calculate the price component was created with reference to another business transaction document. |

(ffffffffffffffffffffffffff) ProductCategoryHierarchyID

A GDT ProductCategoryHierarchyID 35800PK is a unique identifier for a product category hierarchy. A product category hierarchy is a classification system for products. It describes a hierarchical order of product categories that exist on both higher and lower levels in relation to one another, and whose structure can be represented as a tree (also see ProductCategoryID ). An example of the GDT ProductCategoryHierarchyID 35800PK is:

<ProductCategoryHierarchyID>BASE_FIN</ProductCategoryHierarchyID>

The structure of GDT ProductCategoryHierarchyID 35800PK is depicted in FIG. 358PK. For the GDT ProductCategoryHierarchyID 35800PK, the Object Class term is Product Category Hierarchy 35802PK, the Property term is Identification 35804PK, the Representation/Association term is Identifier 35806PK, the Type term is GDT 35808PK, the Type Name term is Identifier 35810PK, and the Length is from one to ten 35812PK. The GDT ProductCategoryHierarchyID 35800PK may be restricted 35814PK.

In some variations, the ProductCategoryHierarchyID 35800PK may be used in business objects.

(gggggggggggggggggggggggggg) ProductRelationshipTypeCode

A GDT ProductRelationshipTypeCode 35800PL is the code for the nature of the product relationship with regard to the type and function of the objects involved. An example of the GDT ProductRelationshipTypeCode 35800PL is:

<ProductRelationshipTypeCode>ACCESS</ProductRelationshipTypeCode>

The structure of GDT ProductRelationshipTypeCode 35800PL is depicted in FIG. 358PL. The GDT ProductRelationshipTypeCode 35800PL includes attributes listAgencyID 35814PL, listVersionID 35830PL, listAgencySchemeID 35846PL, and listAgencySchemeAgencyID 35862PL. For the GDT ProductRelationshipTypeCode 35800PL, the Object Class term is Product 35801PL, the Property term is Type 35802PL, the Representation/Association term is Code 35804PL, the Type term is CCT 35806PL, the Type Name term is Code 35808PL, and the Length is from one to six 35810PL. The ProductRelationshipTypeCode 35800PL may be restricted 35812PL.

For the listAgencyID 35814PL, the Category is Attribute 35816PL, the Object Class term is CodeListAgency 35818PL, the Property term is Identification 35820PL, the Representation/Association term is Identifier 35822PL, the Type term is xsd 35824PL, and the Type Name term is token 35826PL. The cardinality between the listAgencyID 35814PL and the GDT ProductRelationshipTypeCode 35800PL is either zero or one 35828PL.

For the listVersionID 35830PL, the Category is Attribute 35832PL, the Object Class term is CodeList 35834PL, the Property term is Version 35836PL, the Representation/Association term is Identifier 35838PL, the Type term is xsd 35840PL, and the Type Name term is token 35842PL. The cardinality between the listVersionID 35830PL and the GDT ProductRelationshipTypeCode 35800PL is either zero or one 35844PL.

For the listAgencySchemeID 35846PL, the Category is Attribute 35848PL, the Object Class term is CodeListAgency 35850PL, the Property term is Scheme 35852PL, the Representation/Association term is Identifier 35854PL, the Type term is xsd 35856PL, and the Type Name term is token 35858PL. The cardinality between the listAgencySchemeID 35862PL and the GDT ProductRelationshipTypeCode 35800PL is either zero or one 35860PL.

For the listAgencySchemeAgencyID 35862PL, the Category is Attribute 35864PL, the Object Class term is CodeListAgency 35866PL, the Property term is Scheme 35868PL, the Representation/Association term is Identifier 35870PL, the Type term is xsd 35872PL, and the Type Name term is token 35874PL. The cardinality between the listAgencySchemeAgencyID 35862PL and the GDT ProductRelationshipTypeCode 35800PL is either zero or one 35876PL.

In some variations, an extensible code list can be assigned to the ProductRelationshipTypeCode 35800PL. Customers can change this code list. In its unchanged state, the SAP code list may have, for example, the following attributes:

listID="10033"

listAgencyID="310"

listVersionID=Version of the relevant code list.

If a customer makes changes to the assigned code list, the values assigned to the attributes change as follows:

listAgencyID—ID of the customer (ID from DE 3055 if listed there)

listVersionID—Assigned and managed by the customer listAgencySchemeID—ID of the scheme if the listAgencyID is not taken from DE 3055 listAgencySchemeAgencyID—ID of the organization (taken from DE 3055) that manages the scheme of the listAgencySchemeID As an example, the ProductRelationshipTypeCode 35800PL can be used in the product master to represent the type of relationship between a product and other business entities. For example, a customer-specific code semantics may be "Product->Competitor," meaning a Relationship of a product with its competitors. An exemplary code list is shown as follows:

| Code | Name | Description |
|---|---|---|
| ACCESS | Product Accessories | Relationship of a product with an accessory product |
| PRDCPN | Product Customer Product | Relationship of a product with customer-specific product data |
| PRDCTP | Product Contenct Provider | Relationship of a product with a content provider |
| PRDMPN | Product Manufacturer | Relationship of a product with manufacturer-specific product data |
| PRDVND | Product Vendor | Relationship of a product with vendor-specific product data |
| PROREF | Product Reference Product | Relationship of a material with a reference product for an individual material |
| SERVI | Product Service | Relationship of a product with a service product |
| SPARE | Product Spare Part | Relationship of a product with a spare part |

(hhhhhhhhhhhhhhhhhhhhhhhhhh) QuantityRatio

A GDT QuantityRatio 35800PM represents the relationship between two quantities that have different quantity units. An example (Instance) of the GDT QuantityRatio 35800PM is:

```
<QuantityRatio>
<Quantity unitCode="PCE">4</Quantity>
<CorrespondingQuantity unitCode="KGM">20</CorrespondingQuantity>
<QuantityRatio>
```

The structure of GDT QuantityRatio 35800PM is depicted in FIG. 358PM. The QuantityRatio 35800PM includes a Quantity 35806PM element and a CorrespondingQuantity 35838PM element. For the GDT QuantityRatio 35800PM, the Object Class term is 35802PM and the Representation/Association term is Details 35804PM.

The Quantity 35806PM includes an attribute UnitCode 35822PM. For the Quantity 35806PM, the Category is Element 35808PM, the Object Class term is QuantityRatio 35810PM, the Property term is Quantity 35812PM, the Representation/Association term is Quantity 35814PM, the Type term is GDT 35816PM, the Type Name term is Quantity 35818PM. The Cardinality between the Quantity 35806PM and the QuantityRatio 35800PM is one 35820PM. The Quantity 35806PM may be restricted 35821PM.

For the UnitCode 35822PM, the Category is Attribute 35824PM, the Object Class term is QuantityRatio 35826PM, the Property term is Unit 35828PM, the Representation/Association term is Code 35830PM, the Type term is GDT 35832PM, the Type Name term is MeasureUnitCode 35834PM. The Cardinality between the UnitCode 35822PM and the Quantity 35806PM is one 35836PM.

The CorrespondingQuantity 35838PM includes an attribute UnitCode 35854PM. For the CorrespondingQuantity 35838PM, the Category is Element 35840PM, the Object Class term is QuantityRatio 35842PM, the Property term is CorrespondingQuantity 35844PM, the Representation/Association term is Quantity 35846PM, the Type term is GDT 35848PM, the Type Name term is Quantity 35850PM. The Cardinality between the CorrespondingQuantity 35838PM and the QuantityRatio 35800PM is one 35852PM. The Quantity 35806PM may be restricted 35853PM.

For the UnitCode 35854PM, the Category is Attribute 35856PM, the Object Class term is QuantityRatio 35858PM, the Property term is Unit 35860PM, the Representation/Association term is Code 35862PM, the Type term is GDT 35864PM, the Type Name term is MeasureUnitCode 35866PM. The Cardinality between the UnitCode 35854PM and the CorrespondingQuantity 35838PM is one 35868PM.

In some variations, the Quantity may be an amount with unit of measure (such as the base unit of measure), and the CorrespondingQuantity may be a corresponding amount in an alternative unit of measure.

In some implementations, the GDT QuantityRatio 35800PM can specify how many units in a unit of measure are equal to a number of units in another unit of measure. For example, if a product has Piece (ISO: PCE) as its base unit of measure and the sales unit is kilograms (ISO: KGM), the following values may be possible:

4 pieces=20 kilograms 1 piece=5 kilograms

The attribute UnitCode can be declared as mandatory in the GDT QuantityRatio 35800PM and may be checked by the application because it is optional in the GDT Quantity, and restrictions of elementary GDTs in complex GDTs are currently not supported by the repository.

(iiiiiiiiiiiiiiiiiiiiiiii) SalesCyclePhaseStepCode

A GDT SalesCyclePhaseStepCode 35800PN is the description of a step in a sales cycle phase. The sales cycle of a product or service begins with the recognition of an opportunity, that is with the possible sales opportunity, and ends with an order or rejection by the customer. The sales cycle of an opportunity is made up of different phases, such as for example, project identification, qualification, quote, and so on, and each phase is made up of different steps. A step is a task that should be carried out in a sales cycle phase. An example of the GDT SalesCyclePhaseStepCode 35800PN is:

<SalesCyclePhaseStepCode listAgencyID=310>1</SalesCyclePhaseStepCode>

The structure of GDT SalesCyclePhaseStepCode 35800PN is depicted in FIG. 358PN. The GDT SalesCyclePhaseStepCode 35800PN includes attributes listAgencyID 35814PN, listVersionID 35830PN, listAgencySchemeID 35846PN, and listAgencySchemeAgencyID 35862PN. For the GDT SalesCyclePhaseStepCode 35800PN, the Object Class term is Sales Cycle Phase 35801PN, the Property term is Step 35802PN, the Representationl/Association term is Code 35806PN, the Type term is CCT 35808PN, the Type Name term is Code 35810PN, and the Length is from one to three 35810PN. The SalesCyclePhaseStepCode 35800PN may be restricted 35812PN.

For the listAgencyID 35814PN, the Category is Attribute 35816PN, the Object Class term is CodeListAgency 35818PN, the Property term is Identification 35820PN, the Representation/Association term is Identifier 35822PN, the Type term is xsd 35824PN, and the Type Name term is token 35826PN. The cardinality between the listAgencyID 35814PN and the GDT SalesCyclePhaseStepCode 35800PN is either zero or one 35828PN.

For the listVersionID 35830PN, the Category is Attribute 35832PN, the Object Class term is CodeList 35834PN, the Property term is Version 35836PN, the Representation/Association term is Identifier 35838PN, the Type term is xsd 35840PN, and the Type Name term is token 35842PN. The cardinality between the listVersionID 35830PN and the GDT SalesCyclePhaseStepCode 35800PN is either zero or one 35844PN.

For the listAgencySchemeID 35846PN, the Category is Attribute 35848PN, the Object Class term is CodeListAgency 35850PN, the Property term is Scheme 35852PN, the Representation/Association term is Identifier 35854PN, the Type term is xsd 35856PN, and the Type Name term is token 35858PN. The cardinality between the listAgencySchemeID 35862PN and the GDT SalesCyclePhaseStepCode 35800PN is either zero or one 35860PN.

For the listAgencySchemeAgencyID 35862PN, the Category is Attribute 35864PN, the Object Class term is CodeListAgency 35866PN, the Property term is Scheme 35868PN, the Representation/Association term is Identifier 35870PN, the Type term is xsd 35872PN, and the Type Name term is token 35874PN. The cardinality between the listAgencySchemeAgencyID 35862PN and the GDT SalesCyclePhaseStepCode 35800PN is either zero or one 35876PN.

In some variations, an extendable code list can be assigned to the SalesCyclePhaseStepCode. Customers may replace lists with their own. In its unchanged state, the assigned code list has the following attributes:

listID=10013 listAgencyID="310"

listVersionID=Version of the relevant code list.

If an customer creates a code list, the attributes can be changed as follows:

listAgencyID—ID of the customer (ID from DE 3055 if listed there)

listVersionID—Assigned and managed by the customer listAgencySchemeID—ID of the scheme if the listAgencyID is not taken from DE 3055 listAgencySchemeAgencyID—ID of the organization (taken from DE 3055) that manages the scheme of the listAgencySchemeID In some examples, the GDT SalesCyclePhaseStepCode 35800PN can be used primarily in Presales in order to describe individual steps within a sales cycle phase. For example, a customer-specific code semantics may be Retrieve advertised biddings, which is used to determine public biddings of a customer or prospect.

In some implementations, the GDT SalesCyclePhaseStepCode 35800PN is used primarily for modeling business objects. It defines its own view on a sales process, and should therefore not be used in electronic message exchange with external parties. An example of an assigned code list may be:

| Code | Name | Description |
|---|---|---|
| 1 | Gather Customer Information | In this step, information regarding the customer or prospect is gathered. |
| 2 | Identify Entry Point | In this step, the customer or prospect's contact person is identified. |
| 3 | Obtain and Prepare Visit | In this step, a visit to the customer or prospect is arranged and carried out. |
| 4 | Initial Needs Analysis | In this step, the initial needs are analyzed. |
| 5 | Clarify Feasibility | In this step, the feasibility is clarified internally. |
| 6 | Identify Customer's Time Schedule | In this step, the customer's time schedule is identified. |
| 7 | Understand Decision-Making Process | In this step, the customer's decision makers are identified. |
| 8 | Define Selling Team | In this step, the sales team is defined. |
| 9 | Make go/no-go decision | In this step, a Go/No-Go decision is made. |
| 10 | Define Strategy and Action Plan | In this step, the strategy and action plan is defined. |
| 11 | Align Selling Team | In this step, the sales team is assigned to the customer's project team. |
| 12 | Establish Relationship with all Influential Members | In this step, contact is established with all relevant influential members. |
| 13 | Identify Individual Goals and Decision Criteria | In this step, individual goals and decision criteria is identified. |

(jjjjjjjjjjjjjjjjjjjjjjjjjj) SupplyPlanningAreaID

A GDT SupplyPlanningAreaID 35800PO is a unique identifier of a SupplyPlanningArea. An area in which planning is executed separately to guarantee the availability of products on time. To achieve this, the SupplyPlanningArea groups requirements, stocks, and further requirement coverage elements of a Location for consumption in the net requirements calculation in material requirements planning. An example of the GDT SupplyPlanningAreaID 35800PO is:

<SupplyPlanningAreaID>Hamburg</SupplyPlanningAreaID>

<SupplyPlanningAreaID>spare parts</SupplyPlanningAreaID>

The structure of GDT SupplyPlanningAreaID 35800PO is depicted in FIG. 358PO. For the GDT SupplyPlanningAreaID 35800PO, the Object Class term is Supply Planning Area 35802PO, the Property term is Identification 35804PO, the Representation/Association term is Identifier 35806PO, the Type term is CCT 35808PO, the Type Name term is Identifier 35810PO, and the Length is from one to twenty 35812PO. The GDT SupplyPlanningAreaID 35800PO may be restricted 35814PO.

(kkkkkkkkkkkkkkkkkkkkkkkkkk) AutomaticNumberingindicator

An AutomaticNumberingIndicator specifies whether or not identifiers are assigned automatically. In some variations, the AutomaticNumberingIndicator may only be used in business objects and/or their replication messages. In other variations, the AutomaticNumberingIndicator is used mainly for numerical or alphanumerical identifiers;

The AutomaticNumberingIndicator can be used to control whether or not identifiers (such as document numbers or product numbers) are assigned automatically. For example, in some Product master, product category identifiers can be assigned automatically.

(llllllllllllllllllllllllll) ChartOfAccountsItemDescription

A ChartOfAccountsItemDescription is a description of an item in the chart of accounts. A chart of accounts item groups together assets, payables, stockholders' equity, revenues, or expenses and is used to enter and represent for accounting purposes any changes to these values resulting from business transactions.

(mmmmmmmmmmmmmmmmmmmmmmmmmm) ClassificationSystemName

A ClassificationSystemName is a word, or a combination of words describing a classification system.

(nnnnnnnnnnnnnnnnnnnnnnnnnn) DepartmentName

A DepartmentName is a name of a department.

(oooooooooooooooooooooooooo) GroupedIndicator

A GroupedIndicator is the indicator whether the price component should be grouped with the corresponding price component of the other items in the same business transaction document and therefore processed together, or not. In some variations, the GroupedIndicator may indicate whether something is grouped or not.

(pppppppppppppppppppppppppp) InheritedIndicator

An InheritedIndicator is used to show whether or not an object inherits the characteristics or functions of another object. For example, in a Product master, the product attribute groups can be assigned to product categories, which in turn are arranged hierarchically in a product category hierarchy.

Each product can be assigned in a product category hierarchy to a single product category whose attribute groups it directly inherits. The parent product categories that are in the product category hierarchy tree and their attribute groups may then be assigned to the product through inheritance. As an example, the InheritedIndicator may show whether product categories and their product attributes groups are inherited or not.

In some implementations, the InheritedIndicator is only permitted as an element and not as an attribute of a GDT. In the context of use, a description must be given as to which objects or functions the InheritedIndicator refers.

In some implementations, a DefaultIndicator specifies whether or not something has been designated as a default. An InheritedIndicator specifies whether or not an object has been inherited from another object. By object, we generally mean a business object (such as a product category).

(qqqqqqqqqqqqqqqqqqqqqqqqqq) MessageFromName

A MessageFromName is a name of an object that is assigned to the sender.

(rrrrrrrrrrrrrrrrrrrrrrrrrr) MobilePhoneNumberIndicator

A MobilePhoneNumberIndicator specifies whether a telephone number is a mobile number or not.

(ssssssssssssssssssssssssss) POBoxIndicator

A POBoxIndicator specifies whether there is a PO Box address or not. This indicator is necessary if a PO Box number is not specified within a PO Box address.

(tttttttttttttttttttttttttt) ProductConfigurableIndicator

A configurable product is used when a lot of variants can exist due to the diversity of combinations that are possible in the product characteristics. All the characteristics of a particular product are combined in a variant piece list. For example, product characteristics for a particular vehicle type can be engine capacity, gearbox type, color, upholstery, type of glass, sunroof, radio model, number of wing mirrors, ashtray(s).

(uuuuuuuuuuuuuuuuuuuuuuuuuu) PropertyParametricSearchableIndicator

A ProductConfigurableIndicator specifies whether or not a product can be configured. In some variations, the PropertyParametricSearchableIndicator is used in the context of the property definition.

(vvvvvvvvvvvvvvvvvvvvvvvvvv) ServicePointIndicator

A ServicePointIndicator specifies whether something is a service point or not.

(wwwwwwwwwwwwwwwwwwwwwwwwww) ChequeLot1ID

A GDT ChequeLot1ID 35800PP is an identifier for a check lot. A check lot describes a restricted quantity of unissued outgoing checks for a house bank account by a number interval. An example (Instance) of the GDT ChequeLot1ID 35800PP is:

<ChequeLot1ID>Lot1</ChequeLot1ID>

The structure of GDT ChequeLot1ID 35800PP is depicted in FIG. 358PP. For the GDT ChequeLot1ID 35800PP, the Object Class term is Check Lot 35802PP, the Property term is Identification 35804PP, the Representation/Association term is Identifier 35806PP, the Type term is CCT 35808PP, the Type Name term is Identifier 35810PP, and the Length is from one to eight 35812PP. The GDT ChequeLot1ID 35800PP may be restricted 35814PP.

In some embodiments, the GDT ChequeLot1ID 35800PP is unique per house bank account. For example, the GDT ChequeLot1ID 35800PQ can be stored in the field STAPL of table PCEC in an SAP R/3 system provided by the SAP AG in Waldorf, Germany.

(xxxxxxxxxxxxxxxxxxxxxxxxxx) EnterpriseAccommodationReimbursementExpenseReporterGroupCode A GDT EnterpriseAccommodationReimbursementExpenseReporterGroupCode 35800PQ is the coded representation of a group of expense reporters to whom the same company-specific expense regulations apply regarding the reimbursement of accommodation expenses. An Example (Instance) of the GDT EnterpriseAccommodationReimbursementExpenseReporterGroupCode 35800PQ is:

<EnterpriseAccommodationReimbursementExpenseReporterGroupCode>1</EnterpriseAccommodationReimbursementExpenseReporterGroupCode>

The structure of GDT EnterpriseAccommodationReimbursementExpenseReporterGroupCode 35800PQ is depicted in FIG. 358PQ. For the GDT EnterpriseAccommodationReimbursementExpenseReporterGroupCode 35800PQ, the Object Class term is Enterprise Accommodation Reimbursement Expense Reporter Group 35802PQ, the Representation/Association term is Code 35804PQ, the Type term is CCT 35806PQ, the Type Name term is Code 35808PQ, and the Length is from one to two 35810PQ. The GDT EnterpriseAccommodationReimbursementExpenseReporterGroupCode 35800PQ may be restricted 35812PQ.

In some embodiments, the value range of the GDT EnterpriseAccommodationReimbursementExpenseReporterGroupCode 35800PQ (e.g., listID="10267") may include a customer-specific code list.

In some implementations, the GDT EnterpriseAccommodationReimbursementExpenseReporterGroupCode 35800PQ can currently only be used in BOs.

As an example, the GDT EnterpriseAccommodationReimbursementExpenseReporterGroupCodes 35800PQ may be an Extended Management Board Members of the extended management board that includes Senior Executives and Salaried Employees.

For the GDT EnterpriseAccommodationReimbursementExpenseReporterGroupCode 35800PQ, there can be a corresponding StatutoryAccommodationReimbursementExpenseReporterGroupCode as the coded representation of a group of expense reporters to whom the same statutory or contractual expense regulations apply regarding the reimbursement of accommodation expenses.

(yyyyyyyyyyyyyyyyyyyyyyyyyy) HouseID

A GDT HouseID 35800PR is a unique identifier of a building or building section within a street by means of a house number. An example of GDT HouseID 35800PR is:

<HouseID>16</HouseID>

The structure of GDT HouseID 35800PR is depicted in FIG. 358PR. For the GDT HouseID 35800PR, the Object Class is House 35802PR, the Property is Identification 35804PR, the Representation/Association is Identifier 35806PR, the Type is CCT 35808PR, the Type Name is Identifier 35810PR, and the Length is from one to ten 35812PR. The remark 35814PR shows that the GDT HouseID 35800PR may be restricted.

The value list of the HouseID 35800PR is unique for each street. The street is known from the context. The HouseID 35800PR is used in the postal address. The following dictionary objects are assigned to this GDT in mySAP systems: Data element: BU_HSNM1 and Domain: TEXT10.

(zzzzzzzzzzzzzzzzzzzzzzzzzz) GeneralLedgerAccountReference

A GDT GeneralLedgerAccountTypeCode 35800PS is the coded representation of the type of a general ledger account. A general ledger account is a structure for storing changes in value relating to assets, payables, stockholders' equity, revenues, or expenses of a company. A general ledger account relates to exactly one item in a chart of accounts. Examples of general ledger accounts are: trade receivables or cumulated depreciation on buildings. An example of GDT GeneralLedgerAccountTypeCode 35800PS is:

<GeneralLedgerAccountTypeCode>10</GeneralLedgerAccountTypeCode>

The structure of GDT GeneralLedgerAccountTypeCode 35800PS is depicted in FIG. 358PS. For the GDT GeneralLedgerAccountTypeCode 35800PS, the Object Class is General Ledger Account 35802CPS, the Property is Type 35804PS, the Representation/Association is Code 35806PS, the Type is CCT 35808PS, the Type Name is Code 35810PS, and the Length is from one to six 35812PS . The remark 35814PS shows that the GDT GeneralLedgerAccountTypeCode 35800PS may be restricted.

The GeneralLedgerAccountTypeCode is a customer-specific code list. The attribute "listID" is filled implicitly with "10110". The GDT GeneralLedgerAccountTypeCode 35800PS is currently used in business objects. Examples of the possible semantics of the codes are: (Fixed Asset)—Account for fixed assets, (Inventory)—Account for material inventories, (Loans taken)—Account for loans taken, and (Overhead Costs)—Account for overhead costs The GDT GeneralLedgerAccountTypeCode 35800PS may be used to subdivide the general ledger, such as into fixed asset accounts, accounts for material inventories, or accounts for overhead costs. The subdivision is more refined that the division into balance sheet accounts and accounts for the profit and loss statement. A GDT GeneralLedgerAccountTypeCode 35800PS can be used to derive whether an account is an assets account or a liability account in the balance sheet or whether it is an expense account or a revenue account in the profit and loss statement.

(aaaaaaaaaaaaaaaaaaaaaaaaaaa) InventoryMovementDirectionCode

A GDT InventoryMovementDirectionCode 35800PT is a coded representation of the direction of an inventory movement (receipt, issue). For example, inventory may be the quantity of all the materials in a certain location including the material allocations at this location. An example of GDT InventoryMovementDirectionCode 35800PT is:

<InventoryMovementDirectionCode>1</InventoryMovementDirectionCode>

The structure of GDT InventoryMovementDirectionCode 35800PT is depicted in FIG. 358PT. For the GDT InventoryMovementDirectionCode 35800PT, the Object Class is Inventory Movement 35804PT, the Property is Direction 35806PT, the Representation/Association is Code 35808PT, the Type is CCT 35810PT, the Type Name is Code 35812PT, and the Length is one 35814PT. The remark 35818PT shows that the GDT InventoryMovementDirectionCode 35800PT may be restricted.

The value range of the InventoryMovementDirectionCode corresponds to the values of the code 4501 ("Inventory Movement Direction Code") of the EDIFACT code list D04B. The data type GDT InventoryMovementDirectionCode 35800PT may use the following codes: 1 (i.e., an inventory issue is the quantitative change of the total inventory caused by the withdrawal of a partial inventory.), 2 (i.e., an inventory receipt is the quantitative change of the total inventory caused by the receipt of inventory).

(bbbbbbbbbbbbbbbbbbbbbbbbbbb) ProfitCentreID

A GDT ProfitCentreID 35800PU is a unique identifier for a profit center. The following are examples of GDT ProfitCentreID 35800PU. ID of profit center "SALES_01" in Business-System "FIN_001":

```
<ProfitCentreID schemeID="ProfitCentreID"
schemeAgencyID="FIN_001">
```

-continued

```
0001SALES_01
</ProfitCentreID>
GUID of organizational center's profit center from MOM:
<ProfitCentreID schemeID="OrganisationalCentreID"
schemeAgencyID="MOM_001">
D2E40E4157AC6511E10000000A155064
</ProfitCentreID >
```

The structure of GDT ProfitCentreID 35800PU is depicted in FIG. 358PU. For the GDT ProfitCentreID 35800PU, the Object Class is ProfitCentre 35801PU, the Property is Identification 35803PU, the Representation/Association is Identifier 35804PU, the Type is CCT 35805PU, the Type Name is Identifier 35806PU, and the Length is from one to thirty-two 35807PU. The remark 35809PU shows that the GDT ProfitCentreID 35800PU may be restricted.

For the SchemeID 35810PU, the Category is Attribute (A) 35811PU, the Object Class is IdentificationScheme 35812PU, the Property is Identification 35813PU, the Representation/Association is Identifier 35814PU, the Type is XSD 35815PU, the Type Name is Token 35816PU, the Length is sixty 35817PU, and the Cardinality is zero or one 35818PU.

For the SchemeAgencyID 35820PU, the Category is Attribute (A) 35821PU, the Object Class is Identification-Scheme-Agency 35822PU, the Property is Identification 35823PU, the Representation/Association is Identifier 35824PU, the Type is XSD 35825PU, the Type Name is Token 35826PU, the Length is sixty 35827PU, and the Cardinality is zero or one 35828PU.

The ProfitCentreGroupID attributes are filled as follows: schemeID is the "ProfitCentreID" for an ID of a profit center or the "OrganisationalCentreID" for a GUID of on organizational center with profit responsibility of a MOM, schemeAgencyID is the business system in which the ID was assigned. In some ERP implementations, the ID of a profit centre includes a cost centre's number range (4 characters) and profit centre (10 characters).

(cccccccccccccccccccccccccc) StatutoryAccommodationReimbursementExpenseReporterGroupCode A GDT StatutoryAccommodationReimbursementExpenseReporterGroupCode 35800PV is a coded representation of a group of expense reporters to whom the same statutory or contractual expense regulations apply regarding the reimbursement of accommodation expenses. An example of GDT StatutoryAccommodationReimbursementExpenseReporterGroupCode 35800PV is:

<StatutoryAccommodationReimbursementExpenseReporterGroupCode>1</StatutoryAccommodationReimbursementExpenseReporterGroupCode>

The structure of GDT StatutoryAccommodationReimbursementExpenseReporterGroupCode 35800PV is depicted in FIG. 358PV. For the GDT StatutoryAccommodationReimbursementExpenseReporterGroupCode 35800PV, the Object Class is Statutory_AccommodationReimbursement_ExpenseReporterGroup 35804PV, the Representation/Association is Code 35808PV, the Type is CCT 35810PV, the Type Name is Code 35812PV, and the Length is from one to two 35814PV. The remark 35818PV shows that the GDT StatutoryAccommodationReimbursementExpenseReporterGroupCode 35800PV may be restricted.

The value range of StatutoryAccommodationReimbursementExpenseReporterGroupCode consists of a customer-specific code list. In some implementations, StatutoryAccommodationReimbursementExpenseReporterGroupCode can only be used in Business Objects. Examples of StatutoryAccommodationReimbursement-ExpenseReporterGroupCodes are the four employee groups of the Italian banking collective agreement with a per diem that varies according to the employee hierarchy level: 1—area professionale (Employee hierarchy level 1), 2—area professionale 1. e 2. livello retributivo (Employee hierarchy level 2), 3—area professionale e 2. area professionale 3. livello retributivo (Employee hierarchy level 3), 4—Quadri Direttivi 1.-4. livello (Employee hierarchy level 4). For StatutoryAccommodationReimbursementExpenseReporterGroupCode there is a corresponding EnterpriseAccommodationReimbursementExpenseReporterGroupCode as the coded representation of a group of expense reporters to whom the same company-specific expense regulations apply regarding the reimbursement of accommodation expenses.

(dddddddddddddddddddddddddd) InspectionSampleTypeCode

A GDT InspectionSampleTypeCode 35800PW is a coded representation of the type of a sample in the context of an inspection. An example of GDT InspectionSampleTypeCode 35800PW is:

<InspectionS ampleTypeCode>1</InspectionSampleTypeCode>

The structure of GDT InspectionSampleTypeCode 35800PW is depicted in FIG. 358PW. For the GDT InspectionSampleTypeCode 35800PW, the Object Class is InspectionSampleType 35801PW, the Representation/Association is Code 35804PW, the Type is XSD 35805PW, the Type Name is Token 35806PW, and the Length is from one to three 35807PW. The remark 35809PW shows that the GDT InspectionSampleTypeCode 35800PW may be restricted.

For the ListAgencyID 35810PW, the Category is Attribute (A) 35811PW, the Object Class is CodeListAgency 35812PW, the Property is Identification 35813PW, the Representation/Association is Identifier 35814PW, the Type is XSD 35815PW, the Type Name is Token 35816PW, and the Cardinality is zero or one 35818PW.

For the ListVersionID 35820PW, the Category is Attribute (A) 35821PW, the Object Class is CodeList 35822PW, the Property is Version 35823PW, the Representation/Association is Identifier 35824PW, the Type is XSD 35825PW, the Type Name is Token 35826PW, and the Cardinality is zero or one 35828PW.

For the ListAgency-SchemeID 35830PW, the Category is Attribute (A) 35831PW, the Object Class is CodeListAgency 35832PW, the Property is Scheme 35833PW, the Representation/Association is Identifier 35834PW, the Type is XSD 35835PW, the Type Name is Token 35836PW, and the Cardinality is zero or one 35838PW.

For the ListAgency-SchemeAgencyID 35840PW, the Category is Attribute (A) 35841PW, the Object Class is CodeListAgency 35842PW, the Property is SchemeAgency 35843PW, the Representation/Association is Identifier 35844PW, the Type is XSD 35845PW, the Type Name is Token 35846PW, and the Cardinality is zero or one 35848PW.

An extendable code list is assigned to the code. Customers may replace lists with their own. In its unchanged state, the code list has the following attributes: listID of "10405", listAgencyID of "310", listVersionID is the version of the relevant code list. If a customer creates a code list, the attributes change as follows: listAgencyID is the ID of the customer (ID from DE 3055 if listed there), listVersionID is assigned and managed by the customer, listAgencySchemeID is the ID of the scheme if the listAgencyID is not taken from DE 3055, listAgencySchemeAgencyID is the ID of the organization (taken from DE 3055) that manages the scheme of the listAgencySchemeID. The InspectionSampleTypeCode allocates in which process a sample for an object is to be inspected. For example, a particular sample type could represent samples that are taken from a delivered material in a goods receipt. The data type GDT InspectionSampleTypeCode 35800PW may use the following codes: 1 (i.e., Sample that is taken during the goods receipt process), 2 (i.e., Sample that is taken during the goods issue process), 3 (i.e., Sample of a material from a customer complaint).

(eeeeeeeeeeeeeeeeeeeeeeeeeee) QualityInspectionSample

A QualityInspectionSample is an optional, planned element for the segmentation of a quality inspection in discrete units.

(fffffffffffffffffffffffffff) QualityInspectionSampleID

A QualityInspectionSampleID is an indentifier for a quality inspection sample. For example, a quality inspection sample may be an optional, planned element for the segmentation of a quality inspection in discrete units.

(ggggggggggggggggggggggggggg) QualityInspectionStatusCode

A QualityInspectionStatusCode is a coded representation of a quality inspection's status. For example, a quality inspection may be a document that describes the execution of an inspection for a particular material, and that is used to record this inspection.

(hhhhhhhhhhhhhhhhhhhhhhhhhhh) QualityInspectionSubset

A QualityInspectionSubset is a subset of an entirety, which is processed in a quality inspection. For example, a quality inspection may be a document that describes the execution of an inspection for a particular material, and that is used to record this inspection.

(iiiiiiiiiiiiiiiiiiiiiiiiiii) InspectionContainerTypeCode

A GDT InspectionContainerTypeCode 35800PX is the coded representation of the container in which the inspection sample is transported and stored for inspection purposes. An example of the GDT InspectionContainerTypeCode 35800PX is:

<InspectionContainerTypeCode>1</InspectionContainerTypeCode>

The structure of GDT InspectionContainerTypeCode 35800PX is depicted in FIG. 358PX. The GDT InspectionContainerTypeCode 35800PX includes attributes listAgencyID 35814PX, listVersionID 35830PX, listAgencySchemeID 35846PX, and listAgencySchemeAgencyID 35862PX. For the GDT InspectionContainerTypeCode 35800PX, the Object Class term is Inspection 35802PX, the Representation/Association term is Code 35804PX, the Type term is xsd 35806PX, the Type term is token 35808PX, the Type Name term is Code 35810PX, and the Length is from one to fifteen 35810PX. The InspectionContainerTypeCode 35800PX may be restricted 35812PX.

For the listAgencyID 35814PX, the Category is Attribute 35816PX, the Object Class term is CodeListAgency 35818PX, the Property term is Identification 35820PX, the Representation/Association term is Identifier 35822PX, the Type term is xsd 35824PX, and the Type Name term is token 35826PX. The cardinality between the listAgencyID 35814PX and the GDT InspectionContainerTypeCode 35800PX is either zero or one 35828PX.

For the listVersionID 35830PX, the Category is Attribute 35832PX, the Object Class term is CodeList 35834PX, the Property term is Version 35836PX, the Representation/Association term is Identifier 35838PX, the Type term is xsd 35840PX, and the Type Name term is token 35842PX. The cardinality between the listVersionID 35830PX and the GDT InspectionContainerTypeCode 35800PX is either zero or one 35844PX.

For the listAgencySchemeID 35846PX, the Category is Attribute 35848PX, the Object Class term is CodeListAgency 35850PX, the Property term is Scheme 35852PX, the Representation/Association term is Identifier 35854PX, the Type term is xsd 35856PX, and the Type Name term is token 35858PX. The cardinality between the listAgencySchemeID 35862PX and the GDT InspectionContainerTypeCode 35800PX is either zero or one 35860PX.

For the listAgencySchemeAgencyID 35862PX, the Category is Attribute 35864PX, the Object Class term is CodeListAgency 35866PX, the Property term is Scheme 35868PX, the Representation/Association term is Identifier 35870PX, the Type term is xsd 35872PX, and the Type Name term is token 35874PX. The cardinality between the listAgencySchemeAgencyID 35862PX and the GDT InspectionContainerTypeCode 35800PX is either zero or one 35876PX.

In some embodiments, a customer-specific code list is assigned to the Code. A customer can define the codes in the code list. As an example, attributes of a Code may be assigned values as follows:

listID="10402"

listAgencyID—ID of the customer (ID from DE 3055 if listed there)

listVersionID—Assigned and managed by the customer listAgencySchemeID—ID of the scheme if the listAgencyID is not taken from DE 3055 listAgencySchemeAgencyID—ID of the organization (taken from DE 3055) that manages the scheme of the listAgencySchemeID The GDT InspectionContainerTypeCode 35800PX can, for example, be used to describe transport containers for samples in the context of a material inspection.

(jjjjjjjjjjjjjjjjjjjjjjjjjjj) InspectionDecisionCode

A GDT InspectionDecisionCode 35800PY is the coded representation of the decision that is made as part of an inspection regarding the acceptance or rejection of the inspected object. An example of the GDT InspectionDecisionCode 35800PY is:

<InspectionDecisionCode>1</InspectionDecisionCode>

The structure of GDT InspectionDecisionCode 35800PY is depicted in FIG. 358PY. The GDT InspectionDecisionCode 35800PY includes attributes listAgencyID 35814PY, listVersionID 35830PY, listAgencySchemeID 35846PY, and listAgencySchemeAgencyID 35862PY. For the GDT InspectionDecisionCode 35800PY, the Object Class term is Inspection Decision 35802PY, the Representation/Association term is Code 35804PY, the Type term is xsd 35806PY, the Type term is token 35808PY, the Type Name term is Code 35810PY, and the Length is from one to fifteen 35810PY. The InspectionDecisionCode 35800PY may be restricted 35812PY.

For the listAgencyID 35814PY, the Category is Attribute 35816PY, the Object Class term is CodeListAgency 35818PY, the Property term is Identification 35820PY, the Representation/Association term is Identifier 35822PY, the Type term is xsd 35824PY, and the Type Name term is token 35826PY. The cardinality between the listAgencyID 35814PY and the GDT InspectionDecisionCode 35800PY is either zero or one 35828PY.

For the listVersionID 35830PY, the Category is Attribute 35832PY, the Object Class term is CodeList 35834PY, the Property term is Version 35836PY, the Representation/Association term is Identifier 35838PY, the Type term is xsd 35840PY, and the Type Name term is token 35842PY. The cardinality between the listVersionID 35830PY and the GDT InspectionDecisionCode 35800PY is either zero or one 35844PY.

For the listAgencySchemeID 35846PY, the Category is Attribute 35848PY, the Object Class term is CodeListAgency 35850PY, the Property term is Scheme 35852PY, the Representation/Association term is Identifier 35854PY, the Type term is xsd 35856PY, and the Type Name term is token 35858PY. The cardinality between the listAgencySchemeID 35862PY and the GDT InspectionDecisionCode 35800PY is either zero or one 35860PY.

For the listAgencySchemeAgencyID 35862PY, the Category is Attribute 35864PY, the Object Class term is CodeListAgency 35866PY, the Property term is Scheme 35868PY, the Representation/Association term is Identifier 35870PY, the Type term is xsd 35872PY, and the Type Name term is token 35874PY. The cardinality between the listAgencySchemeAgencyID 35862PY and the GDT InspectionDecisionCode 35800PY is either zero or one 35876PY.

In some embodiments, a customer-specific code list is assigned to the Code. A customer can define the codes in the code list. As an example, attributes of a Code are assigned values as follows:

listID="10403"

listAgencyID—ID of the customer (ID from DE 3055 if listed there)

listVersionID—Assigned and managed by the customer listAgencySchemeID—ID of the scheme if the listAgencyID is not taken from DE 3055 listAgencySchemeAgencyID—ID of the organization (taken from DE 3055) that manages the scheme of the listAgencySchemeID The InspectionDecisionCode 35800PY can, for example, be used in the context of a material inspection. This code is used to document the decision about whether the inspected material is accepted or rejected for the further production process. Some examples of customer-specific code semantics are "OK," meaning Accepted, "OK with Restrictions," meaning Accepted with restrictions, and "Not OK," meaning Rejected, material should not be used.

(kkkkkkkkkkkkkkkkkkkkkkkkkkkk) InspectionDecisionCodeListID

A GDT InspectionDecisionCodeListID 35800PZ is an identifier for a list of codes that are used to valuate the inspection object. An InspectionDecisionCodeList is a list of codes that are valid for a decision in an inspection regarding the acceptance or rejection of the in-spected object. An example of the GDT InspectionDecisionCodeListID 35800PZ is:

<InspectionDecisionCodeListID>123456789012345</InspectionDecisionCodeListID>

The structure of GDT InspectionDecisionCodeListID 35800PZ is depicted in FIG. 358PZ. The GDT InspectionDecisionCodeListID 35800PZ includes attributes SchemeID 35816PZ and SchemeAgencyID 35834PZ. For the GDT InspectionDecisionCodeListID 35800PZ, the Object Class term is Inspection Decision Code List 35802PZ, the Property term is Identification 35804PZ, the Representation/Association term is Identifier 35806PZ, the Type term is CCT 35808PZ, the Type Name term is Identifier 35810PZ, the TypeName term is Identifier 35012PZ, and the Length is from one to fifteen 35812PZ. The GDT InspectionDecisionCodeListID 35800PZ may be restricted 35814PZ.

For the schemeID 35816PZ, the Category is Attribute 35818PZ, the Object Class term is IdentificationScheme 35820PZ, the Property term is Identification 35822PZ, the Representation/Association term is Identifier 35824PZ, the Type term is xsd 35826PZ, and the Type Name term is Token 35828PZ, and the Length is from one to sixty 35830PZ. The cardinality between the schemeID 35816PZ and the GDT InspectionDecisionCodeListID 35800PZ is either zero or one 35832PZ.

For the SchemeAgencyID 35834PZ, the Category is Attribute 35836PZ, the Object Class term is IdentificationScheme Agency 35838PZ, the Property term is Identification 35840PZ, the Representation/Association term is Identifier 35842PZ, the Type term is xsd 35844PZ, and the Type Name term is Token 35846PZ, and the Length is from one to sixty 35848PZ. The cardinality between the SchemeAgencyID 35834PZ and the GDT InspectionDecisionCodeListID 35800PZ is either zero or one 35850PZ.

In some embodiments, the attributes of InspectionDecisionCodeListID may be filled as follows:

schemeID=InspectionDecisionCodeList<Qualifier>ID schemeAgencyID: Business system in which the identifier was assigned.

The GDT InspectionDecisionCodeListID 35800PZ can identify a list of decision codes in a material inspection.

(llllllllllllllllllllllllllll) InspectionSampleCategoryCode

The GDT InspectionSampleCategoryCode 35800QA is the coded representation of the category of a sample in the context of an inspection. An example of GDT InspectionSampleCategoryCode 35800QA is:

<InspectionSampleCategoryCode>1</InspectionSampleCategoryCode>

The structure of GDT InspectionSampleCategoryCode 35800QA is depicted in FIG. 358QA. For the GDT InspectionSampleCategoryCode 35800QA, the Object class is InsepctionSampleCategory 35802QA, the Representation/Association is Code 35804QA, the Type is xsd 35806QA, the Type Name is Token 35808QA and the Length is from one to three 35810QA. The remark 35812QA shows that GDT InspectionSampleCategoryCode 35800QA can be restricted. The GDT InspectionSampleCategoryCode 35800QA includes an attribute listVersionID 35814QA. For listVersionID 35814QA, the Category is A 35816QA, the Object Class is CodeList 35818QA, the Property is Version 35820QA, the Representation/Association is Identifier 35822QA, the Type is xsd 35824QA, the Type Name is Token 35826QA and the cardinality is from zero to one 35828QA.

One fixed SAP code list has been assigned to the code. The attributes are as follows:

listID="10404," listAgencyID="310," and listVersionID=[Version of the relevant code list. The code list includes (1) Primary Sample—Sample that is taken directly from the material to be examined, (2) Pooled Sample—Sample that consists of a mixture of at least two primary samples, and (3) Reserve Sample—Sample that must be stored for a specific time period for documentation purposes.

In the context of a material inspection, GDT InspectionSampleCategoryCode 35800QA can define whether a sample is a primary sample, pooled sample, or reserve sample. In the SAP system that runs the QIE, InspectionSampleCategoryCode is represented by the following dictionary objects: Data element: QIE_TV_ELEM_SUB_CATEGORY and Domain: QIE_TV_ELEM_SUB_CATEGORY.

(mmmmmmmmmmmmmmmmmmmmmmmmmmmm) InspectionSampleTypeCode

The GDT InspectionSampleTypeCode 35800QB is the coded representation of the type of a sample in the context of an inspection. An example of GDT InspectionSampleTypeCode 35800QB is:

<InspectionSampleTypeCode>1</InspectionSample-TypeCode>

The structure of GDT InspectionSampleTypeCode 35800QB is depicted in FIG. 358QB. For the GDT InspectionSampleTypeCode 35800QB, the Object Class is InspectionSampleType 35801QB, the Representation/Association is Code 35802QB, the Type is xsd 35803QB, and the Type Name is Token 35804QB. The remark 35806QB shows that GDT InspectionSampleTypeCode 35800QB can be restricted.

The GDT InspectionSampleTypeCode 35800QB includes the following attributes: listAgencyID 35807QB, listVersionID 35816QB, listAgencySchemeID 35826QB, and listAgencySchemeAgencyID 35836QB. For listAgencyID 35807QB, the Category is A 35808QB, the Object Class is CodeListAgency 35809QB, the Property is Identification 35810QB, the Representation/Association is Identifier 35811QB, the Type is xsd 35812QB, the Type Name is Token 35813QB, and the cardinality is from zero to one 35815QB. For listVersionID 35816QB, the Category is A 35818QB, the Object Class is CodeList 35820QB, the Property is Version 35821QB, the Representation/Association is Identifier 35822QB, the Type is xsd 35823QB, the Type Name is Token 35824QB, and the cardinality is from zero to one 35825QB. For listAgencySchemeID 35826QB, the Category is A 35828QB, the Object Class is CodeListAgency 35830QB, the Property is Scheme 35831QB, the Representation/Association is Identifier 35832QB, the Type is xsd 35833QB, the Type Name is Token 35834QB, and the cardinality is from zero to one 35835QB. For listAgencySchemeAgencyID 35836QB, the Category is A 35836QB, the Object Class is CodeListAgency 35840QB, the Property is SchemeAgency 35841QB, the Representation/Association is Identifier 35842QB, the Type is xsd 35843QB, the Type Name is Token 35844QB, and the cardinality is from zero to one 35845QB.

An extendable SAP code list is assigned to the code. SAP customers may replace SAP lists with their own. In its unchanged state, the SAP code list has the following attributes: listID="10405," listAgencyID="310," and listVersionID. If an SAP customer creates a code list, the attributes change as follows: listAgencyID—ID of the SAP customer listVersionID—Assigned and managed by the SAP customer, listAgencySchemeID—ID of the scheme if the listAgencyID is not taken from DE 3055, and listAgencySchemeAgencyID—ID of the organization (taken from DE 3055) that manages the scheme of the listAgencySchemeID. The SAP code list and its values are provided in "Appendix—Code List". Semantic examples of customer-specific codes are provided in the "Use" section.

The GDT InspectionSampleTypeCode 35800QB may allocate a process in which a sample for an object is to be inspected. For example, a particular sample type could represent samples that are taken from a delivered material in a goods receipt.

The code list may have the following values: (1) Goods Receipt Sample—Sample that is taken during the goods receipt process, (2) Goods Issue Sample—Sample that is taken during the goods issue process, or (3) Returns Sample—Sample of a material from a customer complaint.

(nnnnnnnnnnnnnnnnnnnnnnnnnn) InspectionSubsetID

A GDT InspectionSubsetID 35800QC is a unique identification of a subset in the context of an inspection. An example of GDT InspectionSubsetID 35800QC is:

<InspectionSubsetID>Subset0001</InspectionSubsetID>

The structure of GDT InspectionSubsetID 35800QC is depicted in FIG. 358QC. For the GDT InspectionSubsetID 35800QC, the Object Class is InspectionSubset 35801QC, the Property is Identification 35803QC, the Representation/Association is Identifier 35804QC, the Type is XSD 35805QC, the Type Name is Token 35806QC, and the Length is from one to thirty-five 35807QC. The remark 35809QC shows that the GDT InspectionSubsetID 35800QC may be restricted.

For the SchemeID 35810QC, the Category is Attribute (A) 35811QC, the Object Class is IdentificationScheme 35812QC, the Property is Identification 35813QC, the Representation/Association is Identifier 35814QC, the Type is XSD 35815QC, the Type Name is Token 35816QC, the Length is from one to sixty 35817QC, and the Cardinality is zero or one 35818QC.

For the SchemeAgencyID 35820QC, the Category is Attribute (A) 35821QC, the Object Class is Identification-Scheme-Agency 35822QC, the Property is Identification 35823QC, the Representation/Association is Identifier 35824QC, the Type is XSD 35825QC, the Type Name is Token 35826QC, the Length is from one to sixty 35827QC, and the Cardinality is zero or one 35828QC.

The attributes of InspectionSubsetID are filled as follows: schemeID is the InspectionSubset<Qualifier>ID, schemeAgencyID is the Business system in which the identifier was assigned. In the context of a material inspection, InspectionSubsetID can be used to identify a subset of the material that is to be inspected.

(oooooooooooooooooooooooooo) InspectionSubset-TypeCode

A GDT InspectionSubsetTypeCode 35800QD is a coded representation of the type of a subset in the context of an inspection. An example of GDT InspectionSubsetTypeCode 35800QD is:

<InspectionSubsetTypeCode>1</InspectionSubsetType-Code>

The structure of GDT InspectionSubsetTypeCode 35800QD is depicted in FIG. 358QD. For the GDT InspectionSubsetTypeCode 35800QD, the Object Class is InspectionSubsetType 35801QD, the Representation/Association is Code 35804QD, the Type is XSD 35805QD, the Type Name is Token 35806QD, and the Length is from one to three 35807QD. The remark 35809QD shows that the GDT InspectionSubsetTypeCode 35800QD may be restricted.

For the ListAgencyID 35810QD, the Category is Attribute (A) 35811QD, the Object Class is CodeListAgency 35812QD, the Property is Identification 35813QD, the Representation/Association is Identifier 35814QD, the Type is XSD 35815QD, the Type Name is Token 35816QD, and the Cardinality is zero or one 35818QD.

For the ListVersionID 35820QD, the Category is Attribute (A) 35821QD, the Object Class is CodeList 35822QD, the Property is Version 35823QD, the Representation/Association is Identifier 35824QD, the Type is XSD 35825QD, the Type Name is Token 35826QD, and the Cardinality is zero or one 35828QD.

For the ListAgency-SchemeID 35830QD, the Category is Attribute (A) 35831QD, the Object Class is CodeListAgency 35832QD, the Property is Scheme 35833QD, the Representation/Association is Identifier 35834QD, the Type is XSD 35835QD, the Type Name is Token 35836QD, and the Cardinality is zero or one 35838QD.

For ListAgency-SchemeAgencyID 35840QD, the Category is Attribute (A) 35841QD, the Object Class is CodeListAgency 35842QD, the Property is SchemeAgency 35843QD, the Representation/Association is Identifier 35844QD, the Type is XSD 35845QD, the Type Name is Token 35846QD, and the Cardinality is zero or one 35848QD.

An extendable code list is assigned to the code. Customers may replace lists with their own. In its unchanged state, the code list has the following attributes: llistID of “10406”, listAgencyID of “310”, listVersionID is the version of the relevant code list. If a customer creates a code list, the attributes change as follows: listAgencyID is the ID of the customer (ID from DE 3055 if listed there), listVersionID is assigned and managed by the customer, listAgency-SchemeID is the ID of the scheme if the listAgencyID and is not taken from DE 3055, listAgencySchemeAgencyID is the ID of the organization (taken from DE 3055) that manages the scheme of the listAgencySchemeID. The InspectionSubset-TypeCode describes the process in which the inspection quantity is to be divided into subsets and where this process takes place. In the context of a material inspection, for example, subsets may be formed in the goods receipt or goods issue processes. The data type GDT InspectionSubsetType-Code 35800QD may use the following codes: 1 (i.e., Subsets are formed in the material inspection in the goods receipt process), 2 (i.e., Subsets are formed in the material inspection in the goods issue process).

(pppppppppppppppppppppppppp) InspectionTypeCode

A GDT InspectionTypeCode 35800QE is a coded representation of the type of an inspection. An example of GDT InspectionTypeCode 35800QE is:

<InspectionTypeCode>1</InspectionTypeCode>

The structure of GDT InspectionTypeCode 35800QE is depicted in FIG. 358QE. For the GDT InspectionTypeCode 35800QE, the Object Class is InspectionType 35801QE, the Representation/Association is Code 35804QE, the Type is XSD 35805QE, the Type Name is Token 35806QE, and the Length is from one to four 35807QE. The remark 35809QE shows that the GDT InspectionTypeCode 35800QE may be restricted.

For the ListAgencyID 35810QE, the Category is Attribute (A) 35811QE, the Object Class is CodeListAgency 35812QE, the Property is Identification 35813QE, the Representation/Association is Identifier 35814QE, the Type is XSD 35815QE, the Type Name is Token 35816QE, and the Cardinality is zero or one 35818QE.

For the ListVersionID 35820QE, the Category is Attribute (A) 35821QE, the Object Class is CodeList 35822QE, the Property is Version 35823QE, the Representation/Association is Identifier 35824QE, the Type is XSD 35825QE, the Type Name is Token 35826QE, and the Cardinality is zero or one 35828QE.

For the ListAgency-SchemeID 35830QE, the Category is Attribute (A) 35831QE, the Object Class is CodeListAgency 35832QE, the Property is Scheme 35833QE, the Representation/Association is Identifier 35834QE, the Type is XSD 35835QE, the Type Name is Token 35836QE, and the Cardinality is zero or one 35838QE.

For ListAgency-SchemeAgencyID 35840QE, the Category is Attribute (A) 35841QE, the Object Class is CodeListAgency 35842QE, the Property is SchemeAgency 35843QE, the Representation/Association is Identifier 35844QE, the Type is XSD 35845QE, the Type Name is Token 35846QE, and the Cardinality is zero or one 35848QE.

An extendable code list is assigned to the code. Customers may replace lists with their own. In its unchanged state, the code list has the following attributes: IlistID of “10407”, listAgencyID of “310”, listVersionID is the version of the relevant code list. If a customer creates a code list, the attributes change as follows: listAgencyID is the ID of the customer (ID from DE 3055 if listed there), listVersionID is assigned and managed by the customer, listAgency-SchemeID is the ID of the scheme if the listAgencyID and is not taken from DE 3055, listAgencySchemeAgencyID is the ID of the organization (taken from DE 3055) that manages the scheme of the listAgencySchemeID. The type of an inspection defines the process and the object for which inspection documents can be created. This type could, for example, describe a material inspection in the goods receipt process. It is the central controlling element of the inspection. The data type GDT InspectionTypeCode 35800QE may use the following codes: 1 (i.e., Material inspection in goods receipt process), 2 (i.e., Inspection of material that a customer has complained about and that has been returned).

(qqqqqqqqqqqqqqqqqqqqqqqqqq) CostCentreID

A GDT CostCentreID 35800QF is an identifier for a cost center. For example, CostCentre may be an organizational center that represents a clearly defined location at which costs arise, and for which costs are entered separately. The definition can be based on functional requirements, allocation criteria, physical location, and responsibility for costs. Examples of GDT CostCentreID 35800QF are:

```
<CostCentreID schemeID=”CostCentreID”
schemeAgencyID=”FIN_001”>
0001BOARD
</CostCentreID>
<CostCentreID schemeID=”OrganisationalCentreID”
schemeAgencyID=”MOM_001”>
D55B17417854D208E10000000A155064
</CostCentreID>
```

The structure of GDT CostCentreID 35800QF is depicted in FIG. 358QF. For the GDT CostCentreID 35800QF, the Object Class is CostCentre 35801QF, the Property is Identification 35803QF, the Representation/Association is Identifier 35804QF, the Type is CCT 35805QF, the Type Name is Identifier 35806QF, and the Length is from one to thirty-two 35807QF. The remark 35809QF shows that the GDT CostCentreID 35800QF may be restricted.

For the SchemeID 35810QF, the Category is Attribute (A) 35811QF, the Object Class is IdentificationScheme 35812QF, the Property is Identification 35813QF, the Representation/Association is Identifier 35814QF, the Type is XSD 35815QF, the Type Name is Token 35816QF, the Length is sixty 35817QF, and the Cardinality is zero or one 35818QF.

For the SchemeAgencyID 35820QF, the Category is Attribute (A) 35821QF, the Object Class is Identification-Scheme-Agency 35822QF, the Property is Identification 35823QF, the Representation/Association is Identifier 35824QF, the Type is XSD 35825QF, the Type Name is Token 35826QF, the Length is sixty 35827QF, and the Cardinality is zero or one 35828QF.

(rrrrrrrrrrrrrrrrrrrrrrrrrr) TaxDeclarationKeyNumber-TypeCode

A GDT TaxDeclarationKeyNumberTypeCode 35800QG is a coded representation of a tax declaration key number type. For example, a tax declaration key number may be a criterion of the type of entry in a tax report given by tax authorities. An example of GDT TaxDeclarationKeyNumber-TypeCode 35800QG is:

```
<TaxDeclarationKeyNumberTypeCode listID=”20xyz.1”
listVersionID=”200401”>
61
</TaxDeclarationKeyNumberTypeCode>
```

The structure of GDT TaxDeclarationKeyNumberTypeCode 35800QG is depicted in FIG. 358QG. For the GDT TaxDeclarationKeyNumberTypeCode 35800QG, the Category is Element (E) 35802QG, the Object Class is Tax Declaration 35801QG, the Property is Key Number Type 35803QG, the Representation/Association is Code 35804QG, the Type is CCT 35805QG, the Type Name is Code 35806QG, and the Length is from one to ten 35807QG. The remark 35809QG shows that the GDT TaxDeclarationKeyNumberTypeCode 35800QG may be restricted.

For the ListID 35810QG, the Category is Attribute (A) 35811QG, the Object Class is CodeList 35812QG, the Property is Identification 35813QG, the Representation/Association is Identifier 35814QG, the Type is XSD 35815QG, the Type Name is Token 35816QG, the Length is from three to four 35817QG, and the Cardinality is zero or one 35818QG.

For the ListAgencyID 35820QG, the Category is Attribute (A) 35821QG, the Object Class is CodeListAgency 35822QG, the Property is Identification 35823QG, the Representation/Association is Identifier 35824QG, the Type is XSD 35825QG, the Type Name is Token 35826QG, the Length is from one to six 35827QG, and the Cardinality is zero or one 35828QG.

b) Entities

Entities are discrete business elements that are used during a business transaction. Entities are not to be confused with business entities or the components that interact to perform a transaction. Rather, “entities” are one of the layers of the business object model and the interfaces. For example, a Catalogue entity is used in a Catalogue Publication Request and a Purchase Order is used in a Purchase Order Request. These entities are created using the data types defined above to ensure the consistent representation of data throughout the entities.

A list of entities that are contained in the illustrative business object model, along with a description of each of these entities, is provided below. The entities that do not have a corresponding global data type may be derived from the global data type of a related entity. For example AddressCommunication and AddressOffice are defined within and can be derived from the Address global data type. This is easily discernable from the global data type previously described.

| Entity | Definition | Global Data Type |
|---|---|---|
| Accounting Cancellation | ACCOUNTINGCANCELLATION is the complete cancellation of posting information previously sent to Accounting. | |
| Address | ADDRESS contains structured information about the types of addresses. This information includes details about addressees, the postal address, and the physical location and communication connections. | Address |
| Address Communication | ADDRESSCOMMUNICATION contains details about the ways of contacting a person or organization. | |
| AddressGeo Coordinates | ADDRESSGEOCOORDTNATES contain the geographical data, in other words longitude and latitude specified as per the WGS84 reference system, which enables you to determine a position on the globe. | GeoCoordinates |
| AddressOffice | ADDRESSOFFICE contains details that describe the working environment of a contact person as well as details for addressing or identifying this person within the organization. | |
| AddressPerson Name | ADDRESSPERSONNAME contains the parts of a legal person’s name. | PersonName |
| Address Physical Address | ADDRESSPHYSICALADDRESS contains the postal address data of a physical location. | |
| Attachment | An ATTACHMENT is a document of arbitrary type that is assigned to an interface object as an attachment. | Attachment |
| BTD Accounting ObjectSet | BTDAccountingObjectSet is a set of different account assignment objects. An account assignment object is a business object to which changes in value from business transactions are assigned in accounting. | AccountingObject Set |
| BTD Attachment | An ATTACHMENT is a document of arbitrary type that is assigned to a BUSINESSTRANSACTIONDOCUMENT or a BTDITEM as an appendix. | Attachment |
| BTD AttachmentWeb Address | A BTDInternalAttachmentWebAddress is a Web address for a document of any type that is assigned to a BUSINESSTRANSACTIONDOCUMENT or a BTDITEM as an attachment. | AttachmentWeb Address |
| BTDBidder Party | A BTDBidderParty is a party that bids for goods or services. | Business Transaction DocumentParty |
| BTDBidder PortalProvider Party | A BTDBidderPortalProviderParty is a party that runs a portal that brings business partners together for a business transaction. | BTDParty |
| BTDBillFrom Party | A BTDBillFromParty is the company or person executing the invoicing process for a product or service. | Business Transaction DocumentParty |
| BTDBillTo Party | A BTDBillToParty is the company or person to which/whom the invoice is to be sent for deliveries received or services provided. | Business Transaction DocumentParty |

-continued

| Entity | Definition | Global Data Type |
|---|---|---|
| BTDBuyerParty | A BTDBuyerParty is the company or person authorizing the deliveries or services. | Business Transaction DocumentParty |
| BTDBuyer Product Catalogue Reference | A BTDBuyerProductCatalogueReference is a reference to a product catalog of a buyer or to an item within such a catalog. | Catalogue Reference |
| BTDCarrier Party | A BTDCarrierParty is the company or person that transports the goods. | Business Transaction DocumentParty |
| BTDCash DiscountTerms | BTDCASHDISCOUNTTERMS are payment conditions for goods and services. | CashDiscount Terms |
| BTDCash DiscountTerms Maximum Discount | BTDCashDiscountTermsMaximumDiscount is the maximum cash discount in the context of payment conditions that is granted during a sales transaction when payment takes place within a certain number of days after the baseline date for payment has passed. | CashDiscount |
| BTDCash DiscountTerms Normal Discount | BTDCashDiscountTermsNormalDiscount is the usual cash discount in the context of payment conditions that is granted during a sales transaction. | CashDiscount |
| BTDCatalogue ProviderParty | A BTDCATALOGUEPROVIDERPARTY is a party that compiles a catalogue. | Business Transaction DocumentParty |
| BTD Confirmation Description | BTDConfirmationDescription is a text in natural language which is visible for parties and is related to a confirmation. | Description |
| BTDConfirmed Price | A BTDCOFIRMEDPRICE is a price which has been confirmed. | |
| BTDContract Release AuthorisedParty | The BTDContractReleaseAuthorisedParty is a party that is authorized to effect releases from a purchasing contract. | BTDParty |
| BTDCreation Log | BTDCreationLog is a sequence of log messages about the creation of a BusinessTransactionDocument. | |
| BTDCreation LogItem | BTDCreationLogItem is a log message about the creation of a BusinessTransactionDocument. | LogItem |
| BTDCredit AgencyReport Scoring | A BTDCreditAgencyReportScoring is the result of the rating of a party with regard to their creditworthiness using a scorecard specified by a credit agency. A scorecard is a schema for rating a party using different characteristics. | CreditAgency ReportScoring |
| BTDCredit Limit | BTDCREDITLIMIT is the credit limit valid for a business partner for a specific period of validity. | |
| BTDCreditor Party | A BTDCreditorParty is a party that, due to an obligation, is authorized to claim goods, services or payment. | Business Transaction DocumentParty |
| BTDCredit Rating | BTDCREDITRATING is the score determined by a credit agency or a credit management for a party for a specific period of validity. | |
| BTDCreditRisk Class | BTDCREDITRISKCLASS is the risk class of a party determined by a credit agency or a credit management for a party for a specific period of validity. | |
| BTDDebtor Party | A BTDDebtorParty is a party that, due to an obligation, is obliged to provide goods, services or payment. | Business Transaction DocumentParty |
| BTDDelivery Control | The BTDDeliveryControl is the set of internal controlling delivery parameters for one or more requested deliveries in a delivery process. | |
| BTDDelivery Reference | A BTDDeliveryReference is a reference to a delivery (delivery note ID) or to an item within a delivery. | Business Transaction Document Reference |
| BTDDelivery Terms | The BTDDeliveryTerms are the conditions and agreements that are to be valid for executing the delivery and transporting the ordered goods and for the necessary services and activities. | DeliveryTerms |
| BTDDelivery Terms Description | A BTDDeliveryTermsDescription is a text in natural language for specification of legible additional information for delivery terms. | Description |
| BTDDelivery TermsIncoterms | BTDDeliveryTermsIncoterms are commercial contract formulae for the delivery conditions that correspond with the rules compiled by the International Chamber of Commerce (ICC). | Incoterms |
| BTDDelivery TermsPartial Delivery | BTDDeliveryTermsPartialDelivery is the maximum number of partial deliveries that may/can be carried out to deliver the ordered quantity of an item. | PartialDelivery |
| BTDDelivery | BTDDeliveryTermsQuantityTolerance is the tolerated | Quantity |

-continued

| Entity | Definition | Global Data Type |
|---|---|---|
| TermsQuantity Tolerance | difference between a requested and an actual quantity (for example, a delivery quantity) as a percentage. | Tolerance |
| BTDDelivery TermsTransport | BTDDeliveryTermsTransport provides information for the transport of goods. This includes, for example, speed of delivery, the way of doing the transport, the transportation mode, and the transport category. | |
| BTD Description | BTDConfirmationDescription is a text in natural language which is visible for parties. | Description |
| BTD Despatched Delivery Notification Reference | A BTDDespatchedDeliveryNotificationReference is the reference to a shipping notification. | Business Transaction Document Reference |
| BTDFollowUp BillingDue Notification | The BTDFollowUpBillingDueNotification is information about whether an invoice is to be created during the subsequent process and whether the delivery data is required for invoice creation. | |
| BTDFollowUp Despatched Delivery Notification | The BTDFollowUpDespatchedDeliveryNotification is information about how and if the buyer would like to be informed by the seller of a delivery and specifies if an advanced shipping notification (ASN) is expected or is to be sent. | |
| BTDFollowUp InvoiceRequest | BTDFollowUpInvoiceRequest is information about whether the buyer expects to receive an invoice from the seller. | |
| BTDFollowUp InvoicingDue Notification | The BTDFollowUpInvoicingDueNotification is information about whether an invoice is expected during the subsequent process and if the delivery data is required for invoice verification. | |
| BTDFollowUp Purchase Contract | A BTDFollowUpPurchaseContract is information about whether the buyer expects a purchase contract as the result of the request for quotation process. | |
| BTDFollowUp PurchaseOrder | A BTDFollowUpPurchaseOrder is information about whether the buyer expects a purchase order as a result of the request for quotation process. | |
| BTDFollowUp PurchaseOrder Confirmation | BTDFollowUpPurchaseOrderConfirmation is information about whether and in what form the buyer expects to receive confirmation of the purchase order from the seller. | |
| BTDFollowUp Purchasing Contract | A BTDFollowUpPurchasingContract is information about whether the buyer expects a purchase contract as the result of the request for quotation process. | |
| BTDFollowUp SalesOrder Fulfillment Confirmation | A BTDFollowUpSalesOrderFulfillmentConfirmation is information about whether the seller expects a confirmation of a SalesOrderFulfillment from the procurement planning component. | |
| BTDFollowUp Service Acknowledgement Request | BTDFollowUpServiceAcknowledgementRequest is information about whether the buyer wants to be informed by the seller of any services provided. | |
| BTDHandling Unit | BTDHandlingUnit is a physical unit of packaging materials (load carrier, additional packaging materials) and the packaged products (of type “Material”). | HandlingUnit |
| BTDIBatch | BTDIBatch is a batch with its properties. A batch is a non-reproducible, homogeneous subset of a product. The subset’s chracteristics lie within the batch characteristics defined for the product. | Batch |
| BTDI Consignment Inventory | BTDConsignmentInventory is the consignment store stock of a product; in other words, the part of the stock that remains the property of the vendor until it is procured (and paid for). | |
| BTDIInventory | BTDInventory is the warehouse stock of a product. | |
| BTDInbound Delivery Reference | BTDDeliveryReference is the reference to an incoming delivery or one of its items. | Business Transaction Document Reference |
| BTDInternal AttachmentWeb Address | A BTDInternalAttachmentWebAddress is a Web address for a document of any type that is assigned to a BUSINESSTRANSACTIONDOCUMENT or a BTDITEM as an attachment. It is not visible for parties. | AttachmentWeb Address |
| BTDInternal Description | A BTDINTERNALDESCRIPTION is a text in natural language which is not visible for external parties. It is intended for internal use only. | Description |

-continued

| Entity | Definition | Global Data Type |
|---|---|---|
| BTDInvoice Reference | A BTDInvoiceReference is the reference to the invoice of the invoicing party. | Business Transaction Document Reference |
| BTDI Preferential Statement | A BTDIPreferentialStatement is the legally binding statement of vendors on goods they have delivered, which allows the buyer to claim customs tariff preferences for these goods. | |
| BTDI Preferential Statement NonPreferential Product Constituent | A NonPreferentialProductConstituent is a specification on parts or precursor materials of a product for which no customs tariff preferences can be claimed. | |
| BTDIPrevious Release | A BTDIPreviousRelease is a statement about the identification and validity of the last release instance previously transferred in a delivery schedule. | |
| BTDIPromotion | A BTDIPromotion is a marketing activity between the consumer goods industry and retail over a limited time frame to increase brand capital, name recognition, and market share, to boost sales volumes, or to position new products or product groups. | |
| BTDIRelease | A BTDIRelease is a statement about the identification and validity of a release instance transferred in a delivery schedule item. | |
| BTDItem | BTDITEM is an Item of a BusinessTransactionDocument. In general it describes a product or subject of business activities. Quantities and/or dates are specified by means of the BTDItemScheduleLine. | |
| BTDItem Confirmed ScheduleLine | A BusinessTransactionDocumentItemScheduleLine is a confirmed subdivision of items of a business transaction document according to dates and the product quantity associated with each date. | PurchaseOrder Item ScheduleLine SalesOrder FulfillmentItem ScheduleLine |
| BTDItem Hierarchy Relationship | BTDHierarchyRelationship is the relationship between a subitem and a higher-level parent item in an item hierarchy. | |
| BTDItem ScheduleLine | A BusinessTransactionDocumentItemScheduleLine is a subdivision of items of a business transaction document according to dates and the product quantity associated with each date. | PurchaseOrder ItemScheduleLine SalesOrder FulfillmentItem ScheduleLine |
| BTDItem ScheduleLine DeliveryPeriod | The BTDItemScheduleLineDeliveryPeriod is the date or the period for the delivery of goods or the provision of services. | DateTimePeriod |
| BTDLegal Document Attachment | A LegalDocumentAttachment is an attachment that contains the legal text of a business transaction document. | Attachment |
| BTDLegal Event | A BTDLEGALEVENT is a legal transaction or a legal event. | |
| BTDLoan Amortizement Condition | A BTDLoanAmortizementCondition is a repayment condition for a loan. It regulates the conditions to which a loan is to be repaid. | Loan Amortizement Condition |
| BTDLoanFee Condition | A BTDLoanFeeCondition is the fee condition for a loan. | LoanFee Condition |
| BTDLoan Interest Condition | A BTDLoanInterestCondition is a condition for calculating the interest on a loan. | LoanInterest Condition |
| BTDLoan PaymentPlan | A BTDLoanPaymentPlan contains the planned payments for a loan. | |
| BTDLoan PaymentPlan Item | A BTDLoanPaymentPlanItem is a payment planned for a key date for a loan. | LoanPaymentPlan Item |
| BTDLocation | A BusinessTransactionDocumentLocation contains the information that is exchanged in business documents about a location relevant for business transactions. These specifications contain the identification of the location and its address. The identification may be a company-internal ID, a standardized ID, or one or several partner-specific IDs. A location is a logical or a physical place. | Business Transaction Document Location |
| BTDLocation Address | A BTDLocationAddress assigns an address to a BTDLocation. | |
| BTD Manufacturer Party | A ManufacturerParty is a party that manufactures goods. | Business Transaction DocumentParty |

-continued

| Entity | Definition | Global Data Type |
|---|---|---|
| BTDNet PurchasePrice | The BTDNetPurchasePrice refers to the net purchase price specified by the requester or the buyer (relating to the quantity ordered) for the product or service. This price forms the basis for order optimizing in the planning system. | Price |
| BTD Operational Purchasing Contract Reference | The BTDOperationalPurchasingContractReference is the reference to an operational purchasing contract or to an item within an operational purchasing contract. | Business Transaction Document Reference |
| BTDOrigin Invoice Reference | A BTDOriginInvoiceReference is a reference to an origin invoice. | Business Transaction Document Reference |
| BTDOrigin PrimaNota Reference | BTDOriginPrimaNotaReference is the reference to the origin document of the sender on which posting information previously sent to Accounting - and now to be cancelled - is based. | Business Transaction Document Reference |
| BTDOrigin PurchaseOrder Reference | A BTDOriginPurchaseOrderReference is a reference to an origin purchase order or to an item within an origin purchase order. | Business Transaction Document Reference |
| BTDOrigin VendorInvoice Reference | A BTDOriginVendorInvoiceReference is the reference to an origin vendor invoice. | Business Transaction Document Reference |
| BTDOwner Party | An BTDOwnerParty is a party that has tangible or intangible commodity as property. | Business Transaction DocumentParty |
| BTDParty | A BusinessTransactionDocumentParty contains the information that is exchanged - in accordance with common business understanding - in business documents about a party involved in business transactions.<br>This information is used to identify the party and the party's address, as well as the party's contact person and the contact person's address.<br>This identification can take place using an internal ID, a standardized ID, or IDs assigned by the involved parties. | Business Transaction DocumentParty |
| BTDParty Address | A BTDPartyAddress assigns an address to a BTDParty. | Address |
| BTDParty ContactPerson | A BTDPARTYCONTACTPERSON is a contact person of a party. A ContactPerson is a natural person who acts as a contact person during the processing of business processes. The ContactPerson includes details of the ContactPerson's identification as well as the ContactPerson's address. Identification can take place using an internal ID and using ID's assigned by the involved parties. | Business Transaction DocumentParty |
| BTDParty ContactPerson Address | A BTDPartyContactPersonAddress assigns an address to a BTDPartyContactPerson. | |
| BTDPayeeParty | A BTDPayeeParty is a party that receives a payment for goods or services. | Business Transaction DocumentParty |
| BTDPayerParty | A BTDPayerParty is a party that pays for goods or services. | Business Transaction DocumentParty |
| BTDPayment Form | A BTDPAYMENTFORM is the way in which, for example, goods or services are paid for. | |
| BTDPayment FormPayment Card | A BTDPAYMENTFORMPAYMENTCARD is an identification card suited for a certain payment form. It authorizes the holder to settle invoices without cash with contract companies connected to the payment system. | PaymentCard |
| BTDPending Delivery Reference | PendingDeliveryReference is the reference to an item in a delivery that is to be executed or is expected. | Business Transaction Document Reference |
| BTDPortal ProviderParty | A BTDPortalProviderParty is a party that runs a portal that brings business partners together for a business transaction. | Business Transaction DocumentParty |
| BTDPrice | A BTDPrice is a remuneration for a product, which is valid for a base quantity, for a certain period and ship-to location, and which can be scaled according to quantity. | |

-continued

| Entity | Definition | Global Data Type |
|---|---|---|
| BTDPrice Component | A BTDPriceComponent is a non-fiscal part of a price that was calculated for the quantity of a product. | PriceComponent |
| BTDPriceScale | A BTDPriceScale is a set of price scale lines arranged linearly in accordance with a scale (axis) base type. | |
| BTDPriceScale Line | A PriceScaleLine is the price of a product depending on the quantity. | |
| BTDPrice Specification Element | A BTDPriceSpecificationElement is the definition of a price, a discount or a surcharge that is dependent on a combination of properties and that is valid for a certain period of time. | PriceSpecification Element |
| BTDPrimaNota Reference | BTDPrimaNotaReference is the reference to the document of the sender which represents the cancellation request to Accounting. | Business Transaction Document Reference |
| BTD Procurement CostUpperLimit | A ProcurementCostUpperLimit is a cost upper limit for different types of procurement costs. | ProcurementCost UpperLimit |
| BTDProduct | A BusinessTransactionDocumentProduct contains the information that is exchanged - in accordance with common business understanding - in business documents about a product. These are the details for identifying a product, product type as well as the description of the product. This identification can take place using an internal ID, a standardized ID, or IDs assigned by the involved parties. | Business Transaction DocumentProduct |
| BTDProduct Category | A BusinessTransactionDocumentProductCategory contains the information that is exchanged - in accordance with common business understanding - in business documents about a product category. It includes details for identifying the product category using an internal ID, a standard ID along with IDs assigned by involved parties. | Business Transaction DocumentProduct Category |
| BTDProduct RecipientParty | A BTDProductRecipientParty is a party to which goods are delivered or services are provided. | Business Transaction DocumentParty |
| BTDProduct Tax | A BTDProductTax is a tax that is incurred when products are purchased, sold, or consumed. | ProductTax |
| BTDProposed SellerParty | A ProposedSellerParty is a preferred party for selling goods or services. | BTDParty |
| BTDPurchase Order Reference | A BTDPurchaseOrderReference is a reference to a purchase order or item in a purchase order. | Business Transaction Document Reference |
| BTDPurchasing Contract Reference | A BTDPurchasingContractReference is a reference to a purchase contract or item in a purchase contract. | Business Transaction Document Reference |
| BTDQuote Reference | A BTDQUOTEREFERENCE is a reference to a quotation or item in a quotation. | Business Transaction Document Reference |
| BTDRequest ForQuotation Reference | A BTDRequestForQuotationReference is a reference to a request for quotation or item in a request for quotation. | Business Transaction Document Reference |
| BTDRequestor Party | A BTDRequestorParty is a party that requests the procurement of goods or services. | Business Transaction DocumentParty |
| BTDSales Contract Reference | A BTDSALESCONTRACTREFERENCE is a reference to a sales contract or item in a sales contract. | Business Transaction Document Reference |
| BTDSalesOrder Reference | A BTDSalesOrderReference is a reference to a sales order or item of a sales order. | Business Transaction Document Reference |
| BTDScheduling | A BTDSCHEDULING groups together time intervals in order to define a schedule, for example, for ordering, delivering, or picking up products. | |
| BTDScheduling Agreement Reference | A BTDSchedulingAgreementReference is a reference to a scheduling agreement or item in a scheduling agreement. | Business Transaction Document Reference |
| BTDSellerParty | A BTDSELLERPARTY is a party that sells goods or services. | Business Transaction DocumentParty |
| BTDSeller | A BTDSellerProductCatalogueReference is a reference | Catalogue |

-continued

| Entity | Definition | Global Data Type |
|---|---|---|
| Product Catalogue Reference | to a seller product catalogue or item in a seller product catalogue. | Reference |
| BTDService Acknowledgement Reference | A BTDServiceAcknowledgementReference is a reference to a service acknowledgement or item in a service acknowledgement. | Business Transaction Document Reference |
| BTDShipFrom Location | A BTDShipFromLocation contains the information that is exchanged in business documents about a location relevant for business transactions, and from where goods or services are shipped. These specifications contain the identification of the location, its address and, if necessary, a different loading location. The identification may be a company-internal ID, a standardized ID, or one or several partner-specific IDs. | Business Transaction DocumentShip FromLocation |
| BTDShipment Reference | A BTDShipmentReference is a reference to a shipment or item in a shipment. | Business Transaction Document Reference |
| BTDShipTo Location | A BTDShipToLocation contains the information that is exchanged in business documents about a location relevant for business transactions, and to which goods or services are shipped. These specifications contain the identification of the location, its address and, if necessary, a different unloading location. The identification may be a company-internal ID, a standardized ID, or one or several partner-specific IDs. | Business Transaction DocumentShipTo Location |
| BTDTax AuthorityParty | A TaxAuthorityParty is a party that collects and manages taxes. | TaxAuthority Party |
| BTDTax OperatorParty | A BTDTaxOperatorParty is a party that processes tax affairs for a BTDTaxPayerParty. | BTDParty |
| BTDTaxPayer Party | A BTDTaxPayerParty is a party that is liable to tax. | BTDParty |
| BTDTransport Means | BTDTransportMeans is the description of a means of transport and also can include information for a more detailed identification. | TransportMeans |
| BTDTransport Tracking | BTDTransportTracking contains transport-related information that can be used for tracking deliveries, for example, in goods deliveries. | Transport Tracking |
| BTD Transshipment Location | A BusinessTransactionDocumentTransshipment Location contains the information that is exchanged in business documents about a relevant location for business transactions where goods are transshipped (unloaded and reloaded). This information identifies the location, its address, a loading location, and an unloading location. The identification may be a company-internal ID, a standardized ID, or one or more partner-specific IDs. | BTD Transshipment Location |
| BTDValidation Log | A BTDValidationLog is a series of log messages from the tax authority that is has received and validated a tax return for tax on sales/purchases. | |
| BTDValidation LogItem | A ValidationLogItem is a log message on the receipt and validation of a tax return for tax on sales/purchases. | LogItem |
| BTDVendor Party | A BTDVendorParty is a party which delivers goods or provides services. | Business Transaction DocumentParty |
| BTDVendor Product Category | A BTDVendorProductCategory is a company-specific or vendor-specific schedule line for a vendor's entire range of products (vendor subrange). The VendorProductCategory provides the vendor view. | Business Transaction Document ProductCategory |
| BusinessPartner | A BusinessPartner is a person, an organization, or a group of persons in which a company has a business interest. | |
| Business Transaction Document | A BUSINESSTRANSACTIONDOCUMENT is a document that occurs or is created in the context of a business transaction. It represents for a point in time information about<br>Planning<br>Execution/fulfillment<br>Negotiations or agreements<br>Flows of values or goods<br>regarding the involved parties and products, or subjects of a business activity.<br>This can be planned information, targeted information, or actual information. | |

-continued

| Entity | Definition | Global Data Type |
|---|---|---|
| | The BUSINESSTRANSACTIONDOCUMENT contains the structures required for business transactions. In general, the basic structure of a BUSINESSTRANSACTIONDOCUMENT is subdivided into items, which in turn are subdivided into schedule lines according to dates and the product quantity associated with each date. | |
| BuyerProduct Catalogue | A BUYERPRODUCTCATALOGUE is a product catalogue of a buyer. | |
| Catalogue | A Catalogue is a structured directory of Catalogue items. Each item represents an object, and provides information about it. The Catalogue consists of global-, model-and content information. The global information provides information relevant to the entire Catalogue. The model information defines the structure of the Catalogue content and the properties used to describe this content. Content information contains the items of the Catalogue and their structural assignment within the Catalogue structure. It also can be the confirmation whether the publication of a Catalogue or the deletion of an already published Catalogue was successful or not. | |
| Catalogue Content | A CatalogueContent specifies the list of business objects included in the catalogue, together with their relationships and descriptions according to the catalogue's schemas, and the views that are used to restrict the catalogue's information content for certain purposes. The Catalogue content specifies the items contained in the Catalogue and their classification (that is, their assignment to Catalogue sections). The items can be arranged by defining relationships with a specific semantics between them. Specific (usage-dependent) Catalogue views can be defined for a Catalogue. Such a view specifies a subset of the Catalogue structure and/or the Catalogue content. | CatalogueContent |
| Catalogue Content CatalogueItem | A CatalogueContentCatalogueItem specifies information about an object included and to be classified within the Catalogue, and in a way according to the Catalogue's schema. A CatalogueContentCatalogueItem can contain one or more Descriptions which describe the item. The item can be classified by one or more Classifications. Furthermore, it can contain one or more PropertyValuations valid for this item. | CatalogueItem |
| Catalogue Content CatalogueItem Classification | A CatalogueContentCatalogueItemClassification classifies an item by assigning it to a Section within one of the Catalogue's schemas which the item belongs to. | CatalogueItem Classification |
| Catalogue Content CatalogueItem Description | A CatalogueContentCatalogueItemDescription provides a description for an item in a locale (language). | Description |
| Catalogue Content CatalogueItem Property Valuation | A CatalogueContentCatalogueItemPropertyValuation specifies the value of a property that can be attributed to the object the item represents, according to one of the Catalogue schemas. | Property Valuation |
| Catalogue Content CatalogueItem Relationship | A CatalogueContentCatalogueItemRelationship specifies a relationship with certain semantics between any two Catalogue items. | CatalogueItem Relationship |
| Catalogue Content CatalogueView | A CatalogueContentCatalogueView defines a restricted subset of a Catalogue by specifying schemas, sections, Catalogue items and item relationship types to be included and properties to be excluded. A CatalogueContentCatalogueView can contain one or more CatalogueViewSchemas, CatalogueViewItems and CatalogueViewItemRelationshipTypes which specify schemas, items and item relationship types included in the view. In addition, a CatalogueContentCatalogueView can contain one or more CatalogueViewExcludedProperty which specify properties not included in the view. | CatalogueView |

-continued

| Entity | Definition | Global Data Type |
|---|---|---|
| Catalogue Content CatalogueView Excluded Property | A CatalogueContentCatalogueViewExcludedProperty specifies a property that is not included in the Catalogue view. | CatalogueView ExcludedProperty |
| Catalogue Content CatalogueView Item | A CatalogueContentCatalogueViewItem specifies a Catalogue item to be included in the Catalogue view. | CatalogueView Item |
| Catalogue Content CatalogueView ItemRelationship Type | A CatalogueContentCatalogueViewItemRelationship Type specifies a Catalogue item relationship type. All Catalogue item relationships of this type are to be included in the Catalogue view. | CatalogueView ItemRelationship Type |
| Catalogue Content CatalogueView Schema | A CatalogueContentCatalogueViewSchema specifies a schema and a list of sections belonging to the schema that are to be included in a Catalogue view. A CatalogueContentCatalogueViewSchema is subdivided into one or more CatalogueViewSchemaSections which specify Sections included in the view. | CatalogueView Schema |
| Catalogue Content CatalogueView SchemaSection | A CatalogueContentCatalogueViewSchemaSection specifies a Section of the referenced Catalogue schema to be included in the Catalogue view. | CatalogueView SchemaSection |
| Catalogue Model | A CatalogueModel describes and structures the catalogue content using systems of categories to group catalogue items and properties that can be attributed to the catalogue items or the categories themselves (or both). The CatalogueModel is the information concerning how the catalogue content is structured and defined. The CatalogueModel defines properties, their (technical) data types and allowed values, which are used to describe Catalogue sections and/or the items contained in the Catalogue. Additionally the CatalogueModel specifies one or more schemas, which define the structural composition of the Catalogue content by means of sections and relationships between these sections. The Sections of a schema are a dividing up of Catalogue items and they specify properties which are used to describe the items assigned to the section. Schemas are defined for a specific purpose. Therefore, multiple schemas for one Catalogue can exist. | CatalogueModel |
| Catalogue Model CatalogueItem Property | A CatalogueModelCatalogueItemProperty specifies a property pertaining to each catalogue item together with its position in the full list of properties attributed to a catalogue item. | |
| Catalogue Model Catalogue Schema | A CatalogueModelCatalogueSchema defines a structural composition of the Catalogue content regarding a certain purpose. A CatalogueModelCatalogueSchema can contain one or more ItemProperty for the description of catalogue items of this schema. In addition, a Schema is subdivided into one or more Sections and SectionRelationships which define its structure. | CatalogueSchema |
| Catalogue Model Catalogue Schema CatalogueItem Property | A CatalogueModelCatalogueSchemaCatalogueItem Property specifies a property pertaining to a Catalogue item together with its position in the full list of properties attributed to a Catalogue item. | Property |
| Catalogue Model Catalogue Schema Catalogue Section | A CatalogueModelCatalogueSchemaCatalogueSection is a dividing up of Catalogue items according to the schema. A section specifies properties which can be used to describe such Items. A CatalogueModelCatalogueSchemaSection can contain one ore more PropertyValuations which describe the section. In addition it can contain one or more ItemProperty for the description of catalogue items of this section. | |
| Catalogue Model Catalogue | A CatalogueModelCatalogueSchemaSectionItem Property specifies a property pertaining to the Catalogue items (objects) belonging to the Section, | Property |

-continued

| Entity | Definition | Global Data Type |
|---|---|---|
| Schema Catalogue Section CatalogueItem Property | together with the property's position in the full list of properties attributed to a Catalogue item. | |
| Catalogue Model Catalogue Schema Catalogue SectionProperty Valuation | A CatalogueModelCatalogueSchemaCatalogueSection PropertyValuation contains the value of a property that can be attributed to or is used to describe the Section according to its Section type. | Property Valuation |
| Catalogue Model Catalogue Schema Catalogue Section Relationship | A CatalogueModelCatalogueSchemaCatalogueSection Relationship specifies a connection between two catalogue sections within a Catalogue schema. | |
| Catalogue Model Catalogue SectionType | A CatalogueModelCatalogueSectionType describes the nature of Catalogue sections by defining properties for the description of sections of this type. A CatalogueModelCatalogueSectionType can contain one or more SectionProperty for the description of sections of this type. | CatalogueSection Type |
| Catalogue Model Catalogue SectionType SectionProperty | A CatalogueModelCatalogueSectionTypeSectionProperty specifies a property pertaining to a Section type together with its position in the list of properties. This property has to be attributed to all sections of this Section type. | CatalogueSection TypeSection Property |
| Catalogue Model Property | A CatalogueModelProperty specifies a property and additional information for it that can be used to describe and differentiate between items contained or sections used within the Catalogue. | Property |
| Catalogue Model Property DataType | A CatalogueModelPropertyDataType defines the data type of properties (and information about its change) used in the Catalogue. | PropertyData Type |
| Catalogue ModelProperty DefinitionClass | A CatalogueModelPropertyDefinitionClass defines the scope of properties used in the Catalog. | Property DefinitionClass |
| Catalogue Provider Property Valuation | A CatalogueProviderPropertyValuation valuates properties provided by the Catalogue provider to provide additional information about the Catalogue (e.g., any information about the vendor's, Catalogue creation date, or Note.). | Property Valuation |
| Catalogue Publication | A CataloguePublication is a new, changed or deleted catalogue for publishing. | Transmission Catalogue |
| Catalogue Publication Confirmation | A CataloguePublicationConfirmation is the confirmation whether the publication of a Catalogue or the deletion of a (published) Catalogue was successful or not. | Catalogue Publication Confirmation |
| Catalogue Publication Transmission | A CATALOGUEPUBLICATIONTRANSMISSION is information concerning the transmission of a catalogue publication. This can be information about the reception of a package of the catalogue publication transmission and the validity of its content or the request to cancel the transmission of a catalogue publication or the confirmation of such a request or the request to lock single items of a catalogue publication transmission or the confirmation of such a lock request. | |
| Catalogue Publication Transmission Cancellation Confirmation | The CataloguePublicationTransmissionCancellation Confirmation is the confirmation whether the transmission of a Catalogue has been cancelled successfully and an earlier published state of this catalogue (if such exists) has been restored or not. The entity CataloguePublicationTransmission contains information about a catalogue | Catalogue Publication Transmission Cancellation Confirmation |
| Catalogue Publication Transmission Cancellation Request | A CataloguePublicationTransmissionCancellationRequest is the request to cancel the transmission of a Catalogue and to restore an earlier published state (if such exists) of the Catalogue. Moreover, no more packages are sent for this transmission. | Catalogue Publication Transmission Cancellation Request |
| Catalogue Publication Transmission | A CataloguePublicationTransmissionContentChange Confirmation is the confirmation of Catalog Search Engine (the publishing system) to Catalog Authoring | |

-continued

| Entity | Definition | Global Data Type |
|---|---|---|
| ContentChange Confirmation | whether a limited number of catalog items contained in the catalog publication transmission could be changed, created or deleted as requested by a CataloguePublicationTransmissionContentChange Request or not. | |
| Catalogue Publication Transmission ContentChange Request | A CataloguePublicationTransmissionContentChange Request is the request of Catalog Authoring to Catalog Search Engine to change, create or to delete a limited number of catalog items contained in the catalog publication transmission. | |
| Catalogue Publication Transmission ItemLock Confirmation | A CataloguePublicationTransmissionItemLock Confirmation is the confirmation whether single items of the catalogue contained in the catalogue publication transmission could be locked or not. To lock means: If the catalogue is not yet published the items must not be published. If the catalogue is already published, the publication of these items must be revoked. | Catalogue Publication TransmissionItem Lock Confirmation |
| Catalogue Publication Transmission ItemLock Request | A CataloguePublicationTransmissionItemLockRequest is the request to lock single items of the catalogue contained in the catalogue publication transmission. To lock means: If the catalogue is not yet published the items must not be published. If the catalogue is already published, the publication of these items must be revoked. | Catalogue Publication TransmissionItem LockRequest |
| Catalogue Publication Transmission Package | A CataloguePublicationTransmissionPackage specifies a package of a Catalogue publication transmission and information about the reception of this package and the validity of its content. | Catalogue Publication Transmission Package |
| Catalogue Update | A CatalogueUpdate is a new, changed or deleted catalogue. | Transmission Catalogue |
| CreditAgency Report | A CREDITAGENCYREPORT is the credit information issued by the credit agency for a party. CREDITAGENCYREPORT contains the credit information required about a party, with details about the creation of this information. | CreditAgency Report |
| CreditAgency ReportQuery | A CREDITAGENCYREPORTQUERY is the query to a credit agency for credit information about a party. CREDITAGENCYREPORTQUERY contains details about the party for whom credit information is required, together with a specification of the service required by the agency. | CreditAgency ReportQuery |
| CreditAgency ReportQuery Service | A CREDITAGENCYREPORTQUERYSERVICE specifies the type and scope of the service required from the credit agency. | |
| Credit Worthiness | CREDITWORTHINESS specifies the creditworthiness of a business partner, if required with details of the score, risk class, and credit limit. | CreditWorthiness |
| Credit Worthiness Query | A CREDITWORTHINESSQUERY is the query regarding the creditworthiness of a business partner. | CreditWorthiness Query |
| Cumulative Delivery | A CumulativeDelivery contains the cumulated quantities of all the deliveries for a product in the specified validity period. | |
| CustomsVendor Declaration | A CustomsVendorDeclaration is the legally binding declaration of the vendors concerning the goods they delivered to a buyer which allows the buyer to claim customs tariff preferences. A vendor declaration can be made as an individual declaration for an individual delivery or as a long-term declaration that is, in general, valid for one year. | |
| CustomsVendor DeclarationItem | A CustomsVendorDeclarationItem is the summary of all the specifications that vendors make in the CustomsVendorDeclaration on a product they deliver. | |
| Delivery | A Delivery is a collection of goods that is to be staged for shipment or is to be received - after shipment - for further use within a company. Delivery specifies when and where certain quantities of products are delivered. It also may inform about the status of execution of a delivery. | Delivery |
| Delivery Execution Period | A DELIVERYEXECUTIONPERIOD is the planned or current period or time at which a particular step of the delivery process is to be completed or has been completed. | |
| Delivery Execution Request | A DeliveryExecutionRequest is a request to supply chain execution (Logistics, the warehouse) to stage goods and to deliver them or prepare goods arrivals and receive incoming goods. DeliveryExecutionRequest | Delivery ExecutionRequest |

-continued

| Entity | Definition | Global Data Type |
|---|---|---|
| | contains request items with the requested products, partners, locations, and schedule lines. This specifies when and where, and by whom, products are to be staged and delivered (from and to) and received. | |
| Delivery ExecutionRequestItem | A DeliveryExecutionRequestItem is the part of a delivery request that contains an actual product, its quantities, and dates as well as the location to which the product is to be delivered. | Delivery ExecutionRequest Item |
| Delivery ExecutionStatus | A DELIVERYEXECUTIONSTATUS specifies the type and execution status of delivery processing reached for all the items or the delivery as a whole. | |
| Delivery Information | A DeliveryInformation is a message about the creation of a delivery, changes made to a delivery, and the execution status of a delivery. DeliveryInformation is divided into delivery items (DeliveryItems), which describe the execution status and execution period for delivering a particular quantity of a product or batch. References to relevant business documents can be specified for a delivery item. For the delivery as a whole, the ship-from/to location, shipment details, and references to any relevant business documents can be specified alongside the delivering party, recipient, and shipping party. | |
| Delivery Information Item | A DeliveryInformationItem is a quantity of a product in the delivery and contains additional information about its delivery processing status along with any references to previous business documents. | |
| DeliveryItem | A DELIVERYITEM is an item that specifies a quantity of a product to be delivered and contains additional information about its delivery processing status along with any references to previous business documents. | DeliveryItem |
| DeliveryItem Variance | DeliveryItemVariance describes a variance in the received quantity of a product and type of and reason for the variance. | |
| Delivery Schedule | A DeliverySchedule is a tool that is used by a customer to notify a vendor about the quantity of a material from a scheduling agreement item that is to be delivered and at what time. | |
| Delivery ScheduleItem | DeliveryScheduleItem is a statement regarding the requirement for a specific product at a ship-to location with reference to a scheduling agreement ("Scheduling Agreement"). | |
| Despatched DeliveryItem | DespatchedDeliveryItem describes what quantity of a product is to be delivered/picked up. | |
| Despatched Delivery Notification | A DespatchedDeliveryNotification is a notice for a goods recipient about the planned arrival/pickup/issue date for a ready-to-send delivery including details about the contents of the delivery. In general, a DespatchedDeliveryNotification contains several items, which refer to the specifications for the quantity, weight, and volume for each delivered product, as well as preceding documents and/or outline agreements. | Despatched Delivery |
| Inbound Delivery | An InboundDelivery is an incoming delivery. | |
| Incoterms | Incoterms are commercial contract formulae for the delivery conditions that correspond with the rules compiled by the International Chamber of Commerce (ICC). | Incoterms |
| Inventory Change | InventoryChange summarizes changes in warehouse stock.<br>An InventoryChange consists of individual changes in warehouse stock which Accounting or Logistics Planning must be informed of. All of the stock changes summarized in a message are of the same transaction type (goods receipt, goods issue, physical stock, transfer posting, and so on). | InventoryChange |
| Inventory Change Accounting Cancellation | An INVENTORYCHANGEACCOUNTING CANCELLATION is the full cancellation of posting information previously sent to Accounting with respect to a goods movement. | |
| Inventory ChangeItem | An InventoryChangeItem is an individual warehouse stock change. | InventoryChange Item |
| Inventory ChangeItem Inbound | An InventoryChangeItemInbound characterizes a receipt of warehouse stock by means of the receiving location, receiving owner, received quantity, and received material. | InventoryChange ItemInbound |

-continued

| Entity | Definition | Global Data Type |
|---|---|---|
| Inventory ChangeItem Outbound | An InventoryChangeItemOutbound characterizes an issue of warehouse stock by means of the ship-from location, issuing owner, issued quantity, and issued material. | InventoryChange ItemOutbound |
| Invoice | An Invoice is a binding request from an invoicing party (such as vendor) to an invoice recipient (such as a sold-to-party) to make payment for the type and quantity of products or services received as a result of previous business transactions by a predefined date. Invoice not only specifies the remuneration and tax to be paid by the participating business partners for products and services provided, but also gives detailed information about the payment conditions and delivery terms. | Invoice |
| Invoice Accounting | An InvoiceAccounting is the preparation of an invoice or credit memo for Accounting. For an invoice or credit memo uniquely identified as the underlying business document, InvoiceAccounting contains item information about receivables and payables, taxes on sales and purchases, and expenses and revenues. In addition, the business partners involved are named. | Invoice Accounting |
| Invoice Accounting Cancellation | An INVOICEACCOUNTINGCANCELLATION is the full cancellation of posting information previously sent to Accounting for an incoming or outgoing invoice or credit memo. | |
| Invoice AccountingDue Item | An InvoiceAccountingDueItem is the information relevant for Accounting about receivables or payments from deliveries and services that are listed in an invoice or credit memo item. | Invoice AccountingDue Item |
| Invoice Accounting Expense RevenueItem | An InvoiceAccountingExpenseRevenueItem is the information relevant for Accounting about an expense or revenue that was listed in an invoice or credit memo item. | Invoice Accounting ExpenseRevenue Item |
| Invoice AccountingItem | An InvoiceAccountingItem is the information relevant for Accounting about an account receivable or payable from deliveries and services that are listed in an invoice or credit memo item. | |
| Invoice AccountingTax Item | An InvoiceAccountingTaxItem is the information relevant for Accounting about an account receivable or payable from taxes on sales and purchases that are listed in an invoice or credit memo item. | Invoice AccountingTax Item |
| InvoiceDue | An InvoiceDue summarizes the details regarding a business transaction that are relevant for settling (creating billing documents and checking and creating incoming invoices) this business transaction. InvoiceDue consists of InvoiceDueItems, which represent items of the base business document for the future settlement. An InvoiceDueItem usually consists of information about the quantity of a product that has been ordered or delivered, as well as the business partners, locations, terms of delivery and payment involved and the other business documents to be taken into account when the product is settled. | InvoiceDue |
| InvoiceDue Cancellation | An InvoiceDueCancellation is a request to exclude business document data that has already been sent from the settlement. | |
| InvoiceDueItem | An InvoiceDueItem summarizes the information from a business document item that is to be taken into account in the future settlement. An InvoiceDueItem usually consists of information about the quantity of a product that has been ordered or delivered, as well as the business partners, locations, terms of delivery and payment conditions involved, and the other business documents to be taken into account when the product is settled. | InvoiceDueItem |
| InvoiceIssued | An InvoiceIssued summarizes the invoice information relevant for contract management/sales. InvoiceIssued contains information about which order items, items in credit and debit memo requests or delivery items have been billed and to what extent. | InvoiceIssued |
| InvoiceIssued Item | An InvoiceIssuedItem specifies the quantity or the partial value of a product billed with respect to a business transaction. | InvoiceIssued Item |
| InvoiceItem | An InvoiceItem is part of an invoice containing the prices and taxes for the quantity of a product that has been delivered or for a service that has been provided. In addition, to the information about prices and taxes, InvoiceItem comprises information about the | InvoiceItem |

-continued

| Entity | Definition | Global Data Type |
|---|---|---|
| | participating business partners, the payment conditions, and the delivery terms, if they differ from the information provided in the invoice header. | |
| Loan Calculation | A LoanCalculation describes the results of a loan calculation. | |
| Loan Calculation Query | A LoanCalculationQuery describes the query requesting a loan calculation. It contains information about the loan to be calculated, loan conditions, and type of calculation to be made. | |
| LoanContract | A LoanContract contains all of the information that is required for creating a loan contract. The loan is based on loan conditions. These define the interest rate, repayment, and fees. Structurally speaking the loan contract is made up as follows:<br>Description of parties to the contract (lender, borrower, and possibly PayerParty, LoanBrokerParty, and GuarantorParty).<br>Key loan attributes such as start and end of loan as well as reason for loan, and so on.<br>Payment information<br>Conditions (Interest, Repayment, Fees)<br>Fundamental agreements and documents such as general terms and conditions, financial statements, personal information, information about the financing object, collateral agreement. | |
| LoanContract Item | A LoanContractItem defines the conditions of a loan. Conditions can be:<br>Interest conditions<br>Repayment conditions<br>Fees | |
| Location | A location is a physical place. | |
| OrderID Assignment | An OrderIDAssignment represents an assignment of order numbers to a vendor/seller by a buyer or, more generally, to an agent by an ordering party. | |
| OrderID Assignment Item | An OrderIDAssignmentItem describes the order numbers that are permissible and should be used to identify orders created by the seller for a specific combination of delivery location, marketing promotion, and purchasing group at the buyer. | |
| Organisational Centre | Building block of the enterprise model, which represents a node in an organizational structure of the extended enterprise. It incorporates different business roles that are defined in detail by specializing the org centre into business characters. | |
| PaymentDue | PaymentDue indicates the type of due payments (for payment or expected) and their amounts. For each invoice or credit memo that is uniquely identified as the base business document, PaymentDue receives one or more due date items (PaymentDueItems) with details of the type and amount of the payment due, the payment terms and the business partners involved. | PaymentDue |
| PaymentDue Item | A PaymentDueItem describes a due date item (receivable or payable). PaymentDueItem can contain additional details on payment terms and participating business partners as well as the type and amount of payment due. | PaymentDueItem |
| Pending Delivery | A PENDINGDELIVERY is a planned delivery. | |
| PersonnelTime Sheet | PersonnelTimeSheet groups together the personnel times or personnel time events recorded for a personnel resource. The PersonnelTimeSheet includes one or more PersonnelTimeSubsheets, which contain the personnel times and personnel time events for one work agreement. | PersonnelTime Sheet |
| PersonnelTime Subsheet | A PersonnelTimeSubsheet is a set of personnel times and personnel time events that have been recorded during a particular period for a personnel resource regarding a work agreement. | PersonnelTime Subsheet |
| PersonnelTime Subsheet PersonnelTime | A PersonnelTimeSubsheetPersonnelTime is a period of a personnel resource that is characterized by business, pay scale, or legal criteria. | PersonnelTime |
| PersonnelTime Subsheet PersonnelTime Event | A personnel time event is a change in the execution of services of a personnel resource with which one personnel time ends and another personnel time begins. Such changes can include, for example, the start of work, interruption of work, or end of work. A | PersonnelTime Event |

-continued

| Entity | Definition | Global Data Type |
|---|---|---|
| | personnel time event is characterized by a type such as "clock-in entry", "clock-out entry", or "start of break". | |
| Previous Delivery | PreviousDelivery contains data about the physical delivery that was last received. | |
| Product | A product is a commodity that is the object of the business of a company and serves to create value for this company. A product can be tangible or intangible, and can contain other products or belong to another product (such as a set). A product can have relationships to other products or objects. For example, a service can exist for a product that is specially manufactured or financing for a particular category of products. | |
| ProductActivity | ProductActivity contains specifications about the stock, demand, and consumption of products of a buyer (retailers, wholesalers, or manufacturers) at a ship-to location, and about the involved parties, for other relevant business documents and (optionally) for a ship-from location. | ProductActivity |
| ProductActivity Item | A ProductActivityItem contains specifications about the stock, demand, and/or consumption of a product in reference to a ship-to location and (optionally) a ship-from location. | ProductActivity Item |
| Product Category | A product category is a division of products according to objective business-specific criteria. | |
| Product Category Hierarchy | A Product Category Hierarchy is a hierarchy for structuring product categories. Depending on the business context, products are assigned to categories and arranged in hierarchies in order to group similar products. | |
| ProductDemand Influencing Event | A ProductDemandInfluencingEvent describes a demand influencing event and its effects on the demand. A ProductDemandInfluencingEvent specifies event dates and participating business partners. It is divided up into items that each contain the effects of the event on the expected sales quantities with regard to a ship-to party location and a product. | |
| ProductDemand Influencing EventItem | A ProductDemandInfluencingEventItem specifies for a ship-from location (optional), a ship-to location, and a product the sales quantities expected on the basis of the demand influencing event in the form of a time series. | |
| ProductForecast | A ProductForecast is a forecast (or the revision of such a forecast) of the sale/demand of products in the form of time series between business partners. A ProductForecast consists of several items which can contain information about the sales quantities predicted by the forecast for each ship-to location and product. | ProductForecast |
| ProductForecast Item | A ProductForecastItem specifies (or revises) for a ship-from location (optional), a ship-to location, and a product the forecasted sales quantities in the form of a time series. | ProductForecast Item |
| ProductForecast Notification | A ProductForecastNotification is a notice about future product sales or demands (forecasts). | ProductForecast |
| ProductForecast Notification Item | A ProductForecastNotificationItem specifies for a ship-from location (optional), a ship-to location, and a product the forecasted sales quantities in the form of a time series. | ProductForecast Item |
| ProductForecast Revision | A ProductForecastRevision is a revision of a forecast of the sale/demand of products in the form of time series between business partners. A ProductForecastRevision consists of several items, which can contain information about the sales quantities predicted by the forecast for each ship-to location and product. | ProductForecast |
| ProductForecast RevisionItem | A ProductForecastRevisionItem specifies for a ship-from location (optional), a ship-to location, and a product the revision of the forecasted sales and purchase order quantities in the form of a time series. | |
| Property | A PROPERTY is an object attribute. | Property |
| PropertyData Type | PROPERTYDATATYPE is the data type of a property. It describes the syntax of the values and can contain a list of permitted values. | PropertyData Type |
| Property DefinitionClass | A PROPERTYDEFINITIONCLASS is a class for defining properties (in a classification system). | Property DefinitionClass |
| PurchaseOrder | A PurchaseOrder is a buyer's request to a seller to provide or deliver certain quantities of products at one or several dates. This can include a change (including | |

-continued

| Entity | Definition | Global Data Type |
|---|---|---|
| | confirmation or cancellation) of a purchase order or information about the status of the purchase order. The PurchaseOrder is divided into PurchaseOrderItems that each specify an ordered product or additional information relevant for such a product, such as information about bills of material (BOMs) or discount or value limits. In addition, to the buying party and the seller, additional parties can be involved in the PurchaseOrder. Locations can be specified for the purchase order delivery. Delivery and payment terms also are agreed. Notes or references to attachments can be specified for the PurchaseOrder. The types of follow-up documents that are expected with regard to the PurchaseOrder package also can be specified. | |
| PurchaseOrder Cancellation | A PurchaseOrderCancellation is a buying party's (buyer's) request to a provider (seller) to cancel a purchase order. | PurchaseOrder Cancellation |
| PurchaseOrder Change | A PurchaseOrderChange is a change made to the buyer's request to the seller to deliver goods or provide services. | PurchaseOrder |
| PurchaseOrder Confirmation | A PurchaseOrderConfirmation is a confirmation, partial confirmation, or a change sent from the seller to the buyer concerning the requested delivery of goods or provision of services. | PurchaseOrder |
| PurchaseOrder Information | A PurchaseOrderInformation is the information about the status of a purchase order. This includes a purchase order change, confirmation, or cancellation. | PurchaseOrder Information |
| PurchaseOrder Information Item | A PurchaseOrderInformationItem specifies a product ordered by the purchase order or additional information about ordered products. This information includes specifications on discounts in kind, substitute products, and value limits. The PurchaseOrderInformationItem contains detailed information about a particular product and its price. The quantity of the product and (delivery) dates are specified in the schedule line. For the PurchaseOrderInformationItem (compared to the information of the PurchaseOrderInformation), deviating parties, locations, and delivery terms can be defined. The PurchaseOrderInformationItem can contain references to other business documents that are relevant for the item. Notes or references to attachments also can be specified for the PurchaseOrderInformationItem. A PurchaseOrderInformationItem can be subordinate to another PurchaseOrderInformationItem within a hierarchy to represent a business relationship between the two items. This could be information about a discount in kind or substitute product for an ordered product, for example. This relationship also can be used to group together purchase order items; that is, a PurchaseOrderInformationItem can group together other PurchaseOrderInformationItems. | PurchaseOrder InformationItem |
| PurchaseOrder Item | A PurchaseOrderItem specifies a product ordered by the PurchaseOrder or additional information about such a product. This information includes specifications on discounts in kind, substitute products, and value limits. The PurchaseOrderItem contains detailed information about a particular product and its price. The quantity of the product and (delivery) dates are specified in the schedule line. For the PurchaseOrderItem (compared to the information of the PurchaseOrder), deviating parties, locations, and delivery terms can be defined. The PurchaseOrderItem can contain references to other business documents that are relevant for the item. Notes or references to attachments also can be specified for the item. A PurchaseOrderItem can be subordinate to another PurchaseOrderInformationItem within a hierarchy to represent a business relationship between the two items. This could be information about a discount in kind or substitute product for an ordered product, for example. This relationship also can be used to group together PurchaseOrder items; that is, a PurchaseOrderItem can group together other PurchaseOrderItems. | PurchaseOrder Item |
| PurchaseOrder Request | A PurchaseOrderRequest is a buyer's request to the seller to deliver goods or provide services. | PurchaseOrder |

-continued

| Entity | Definition | Global Data Type |
|---|---|---|
| PurchaseOrder Update | A PurchaseOrderUpdate is a buyer's request to a seller to provide or deliver certain quantities of products on one or several dates. This can include a change or a confirmation of such a purchase order. | PurchaseOrder |
| Purchase Requirement | A PurchaseRequirement is a requirement for procuring products (materials or services). The PurchaseRequirement is subdivided into PurchaseRequirementItems that each specify an ordered product or additional information relevant for such a product, such as information about product category or value limits. In addition, to the buying party and the seller as well as the proposed seller, additional parties can be involved in the PurchaseRequirement. Locations can be specified for the PurchaseRequirement delivery. | Purchase Requirement |
| Purchase Requirement Confirmation | A PurchaseRequirementConfirmation is a confirmation of the buyer that informs the requester of the extent to which a requisition has been fulfilled. | |
| Purchase Requirement Confirmation Item | A PurchaseRequirementConfirmationItem provides the extent to which an item of a requisition has been fulfilled. | Purchase Requirement ConfirmationItem |
| Purchase Requirement Confirmation ItemExecuting PurchaseOrder | A PurchaseRequirementConfirmationItemExecuting PurchaseOrder is information on a PurchaseOrderItem, which originates from a PurchaseRequirementItem. | |
| Purchase Requirement Item | A PurchaseRequirementItem specifies a product requested by the PurchaseRequirement or provides additional information about such a product. The PurchaseRequirementItem contains detailed information about a particular product and its price. The quantity of the product and (delivery) dates/times are specified in the schedule line. For the PurchaseRequirementItem (compared to the information of the PurchaseRequirement), deviating parties or locations can be defined. The PurchaseRequirementItem can contain references to other business documents that are relevant for the item. Notes or references to attachments also can be specified for the item. A PurchaseRequirementItem can be subordinate to another PurchaseRequirementItem within a hierarchy to represent a business relationship between the two items. This could be information about a substitute product for an ordered product, for example. This relationship also can be used to group together PurchaseRequirement items; that is, a PurchaseRequirementItem can group together other PurchaseRequirementItems. | Purchase RequirementItem |
| Purchasing Contract | A PurchasingContract is a framework agreement with a seller regarding the supply of products in acertain period of time. | |
| Purchasing ContractRelease | A PurchasingContractRelease (purchasing contract release) is a notification from purchasing to con-tract management regarding a performed release with reference to a purchasing contract. | |
| Purchasing ContractRelease Item | A PurchasingContractReleaseItem specifies a certain item in a PurchasingContractRelease item or provides additional information on such an item. This includes information on release quantities and release amounts. | |
| Quote | A Quote is a quotation submitted by a bidder to a buyer in response to a request for quotation (RFQ) issued for a product by the buyer. The Quote is subdivided into QuoteItems, which contain the concrete quotation submitted by the bidder with reference to the relevant item in the buyer's REQ. | Quote |
| QuoteItem | A QuoteItem contains the bidder's quotation for a product tendered in an item of a request for quotation (RFQItem) or additional information about this product. Quantities and delivery dates also can be specified here. | QuoteItem |
| Received Delivery | A ReceivedDelivery is the detailed confirmation of the receipt of a delivery. | ReceivedDelivery |
| Received DeliveryItem | A ReceivedDeliveryItem describes which quantity of a product was received. | |

-continued

| Entity | Definition | Global Data Type |
|---|---|---|
| Replenishment Order | A ReplenishmentOrder is an order that is planned by a vendor with the objective of replenishing products for a customer. | |
| Replenishment OrderItem | A ReplenishmentOrderItem is an item in a replenishment order that is planned and executed by a vendor for his or her customer. The dates and quantities for delivering a certain product are described in the individual items and schedule lines. The business partners involved and (where applicable) references to other relevant business documents are also listed. | |
| Replenishment OrderProposal | A ReplenishmentOrderProposal is a proposal for a source location (for example, a vendor) to deliver certain quantities of products to a target location (goods recipient, for example, distribution center) at a spe-cific time, for replenishment purposes. | |
| Replenishment OrderProposal Item | A ReplenishmentOrderProposalItem groups all information, the type, quantity and dates for the products proposed for the replenishment purchase order. | |
| RequestFor Quotation (RFQ) | A RequestForQuotation (RFQ) is a request from a buyer to a bidder to submit a quotation for the products (goods or services) specified in the RFQ. This can include a change or a cancellation of such a RFQ. The RFQ is subdivided into RFQItems, which each contain a product specified for the RFQ or additional information for this product. In addition, to the buying party and the bidder, additional parties can be involved in the RFQ. The delivery location also can be specified. Delivery and payment terms also are agreed upon. The RFQ can contain a reference to a Quote if the bidder has a question or if the buyer has changed the RFQ. Notes or references to attachments can be specified for the RFQ. | |
| RequestFor QuotationItem | An RFQItem specifies a product tendered by an RFQ (request for quotation) with additional information on such a product. The RFQItem contains detailed information about a particular product. The quantity of the product and (delivery) dates/times are specified in the schedule line. For the RFQItem (compared to the information of the RFQ), deviating parties, locations, and delivery terms can be defined. The RFQItem can contain references to other business documents that are relevant for the item. Notes or references to attachments also can be specified for the RFQItem. An RFQItem can be subordinate to another RFQItem within a hierarchy in order to represent a business relationship between the two items. | RFQItem |
| RFQ Cancellation | An RFQCancellation is a cancellation of an RFQ (request for quotation) to a bidder by a buyer. | RFQCancellation |
| RFQChange | An RFQChange is a change to the buyer's request to a bidder to submit a quotation for the products (goods or services) specified in the RFQ (request for quotation). | RFQ |
| RFQRequest | An RFQRequest is a request from a buyer to a bidder to submit a quotation for the products (goods or services) specified in the RFQ (request for quotation). | RFQ |
| RFQResult | An RFQResult is the acceptance or the rejection of a bidder's quotation by the buyer. | RFQResult |
| RFQResultItem | An RFQResultItem specifies the rejection or the extent of the acceptance of a bidder's quotation for a product of an RFQ item. | RFQResultItem |
| RFQUpdate | An RFQ Update is a request (or a change to a request) from a buyer to a bidder to submit a quotation for the products (goods or services) specified in the RFQ (request for quotation). | RFQ |
| SalesContract | A SalesContract is a framework agreement with a customer concerning the supply of products in a certain period. | |
| SalesOrder | A SalesOrder is the request (or change or confirmation of such a request) to deliver certain quantities of products to a customer at one or several points in time. | |
| SalesOrder Fulfillment | A SalesOrderFulfillmentRequest is a request (or change and cancellation of such a request) to fulfill a sales order and in doing so to take into account the logistical requirements (availability check, scheduling, requirements planning, procurement, delivery, ...) of a sales order. The SalesOrderFulfillment is divided up into SalesOrderFulfillmentItems that each specify the | SalesOrder Fulfillment |

-continued

| Entity | Definition | Global Data Type |
|---|---|---|
| | product that is to be fulfilled or additional information for such a product such as BOM information. Alongside the purchasing party and the seller, other parties can be involved in the SalesOrderFulfillment. For the fulfillment of the SalesOrderFulfillment, locations can be determined and delivery methods can be agreed upon. Notes or references to attachments can be added to the SalesOrderFulfillment. Furthermore, it is possible to specify which types of follow-up documents are expected with regard to the SalesOrderFulfillment. | |
| SalesOrder FulfillmentItem | A SaleOrderFulfillmentItem specifies a product transferred by the SalesOrderFulfillment or additional information on such a product. The SalesOrderFulfillmentItem contains detailed information on a product and its batch. The quantity of the product and the (delivery) dates are specified in the schedule line. Deviating parties, locations and delivery methods can be specified for the SalesOrderFulfillmentItem (compared to the information of the SalesOrderFulfillment). The SalesOrderFulfillmentItem can contain references to other business documents that are relevant for the item. Furthermore, notes or references to attachments can be added. A SalesOrderFulfillmentItem can be subordinate to another SalesOrderFulfillmentItem within a hierarchy in order to represent a business connection between the two items. This might, for example, be the addition of a free-goods discount or a substitute product to an ordered product. | SalesOrder FulfillmentItem |
| Scheduling Agreement | SchedulingAgreement is an outline agreement between the customer and vendor that sets out the conditions regarding quantities, time periods and prices for the purchasing and delivery of goods. | |
| SellerProduct Catalogue | A SELLERPRODUCTCATALOGUE is a product catalogue of a seller. | |
| Service Acknowledgement | A ServiceAcknowledgement is a request from the seller asking the buyer to acknowledge a service that has been entered (or the buyer's acknowledgement of the entered service). The ServiceAcknowledgement is subdivided into ServiceAcknowledgementItems, each of which specifies a service that has been entered or additional information relevant for this service, such as hierarchy information. In addition, to the buyer and seller, other parties can participate in the ServiceAcknowledgement. Locations can be defined for entering the ServiceAcknowledgement. Notes or references to attachments can be included in the ServiceAcknowledgement. | Service Acknowledgement |
| Service AcknowledgementItem | A ServiceAcknowledgementItem specifies a service (service product) entered by the ServiceAcknowledgement or additional information about the service (service product). In addition, to service products, materials that are required for fulfilling a service can be specified. The ServiceAcknowledgementItem contains detailed information about a product, its price, quantity, and date. For the ServiceAcknowledgementItem (compared to the information of the ServiceAcknowledgement), deviating parties and locations can be defined. The ServiceAcknowledgementItem can contain references to other business documents relevant for the item. Notes or references to attachments also can be specified. A ServiceAcknowledgementItem can be subordinate to another ServiceAcknowledgementItem within a hierarchy, thereby establishing a business relationship between the two items. This relationship also can be used to group together ServiceAcknowledgement items; that is, a ServiceAcknowledgementItem can group together other ServiceAcknowledgementItems. | Service AcknowledgementItem |
| Shipment | A Shipment is a collection of products that are transported together from a ship-from location to ship-to location. | |

-continued

| Entity | Definition | Global Data Type |
|---|---|---|
| SourceOf Supply | A SourceOfSupply is a procurement option for a particular product or product category. In particular, it includes information about prices and ship-to/ship-from locations. | SourceOfSupply |
| TaxDue | A TaxDue is information from a business document that is required in order to report or pay tax due to the tax authorities. TaxDue contains information about the business partners subject to tax, the tax events based to which the business partners are subject to tax/tax exempt, and about the type and amount of tax due. | TaxDue |
| TaxDueItem | A TaxDueItem is information from an item of a business document that is required in order to report or pay tax due to the tax authorities. TaxDueItem contains information about the business partners subject to tax, the tax events based on which the business partners are subject to tax/tax exempt, and about the type and amount of tax due. | TaxDueItem |
| Transmission Catalogue | A TRANSMISSIONCATALOGUE is a new, changed or deleted Catalogue for the purpose of transmission. | Transmission Catalogue |
| VAT Declaration | A VATDeclaration is a tax return for tax on sales/purchases to a tax authority. | |
| VAT DeclarationItem | A VATDeclarationItem is detailed information on the type and scope of reported taxes on sales/purchases. | |
| Vendor GeneratedOrder | A VendorGeneratedOrder is a purchase order that is planned and initiated by a vendor for a customer and is intended to trigger a replenishment delivery for the customer. | |
| Vendor GeneratedOrder Item | A VendorGeneratedOrderItem describes when and where certain quantities of a product that is listed in a VendorGeneratedOrder will be delivered or can be picked up. | |
| VendorInvoice | A VendorInvoice is an incoming invoice. | |

c) Packages

Packages group the entities in the business object model and the resulting interfaces into groups of semantically associated information. Packages also may include "sub"-packages, i.e., the packages may be nested.

Figure 252:
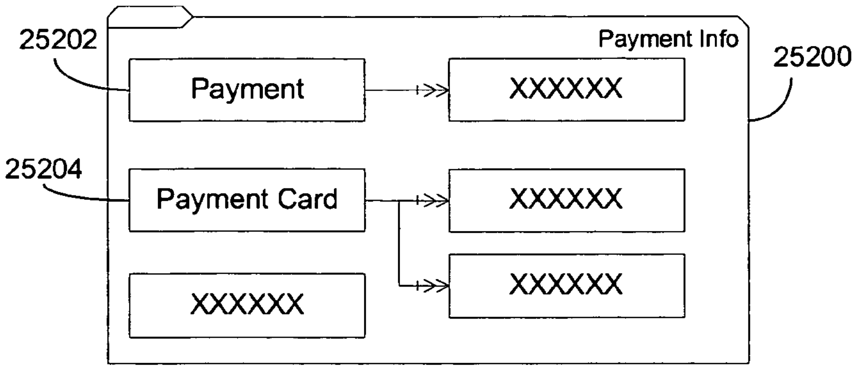
FIG. 252 depicts an example of a package in accordance with methods and systems consistent with the subject matter described herein.

Packages may group elements together based on different factors, such as elements that occur together as a rule with regard to a business-related aspect. For example, as depicted in FIG. 252, in a Purchase Order, different information regarding the purchase order, such as the type of payment 25202, and payment card 25204, are grouped together via the PaymentInformation package 25200.

Figure 253:
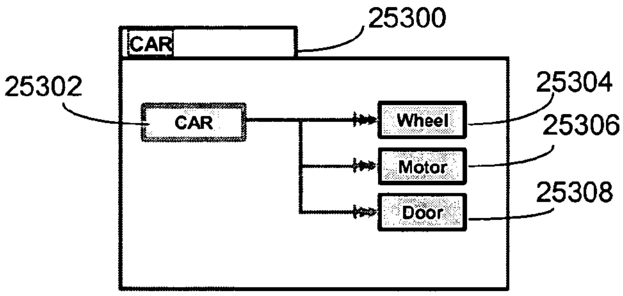
FIG. 253 depicts another example of a package in accordance with methods and systems consistent with the subject matter described herein.

Packages also may combine different components that result in a new object. For example, as depicted in FIG. 253, the components wheels 25304, motor 25306, and doors 25308 are combined to form a composition "Car" 25302. The "Car" package 25300 includes the wheels, motor and doors as well as the composition "Car."

Figure 254:
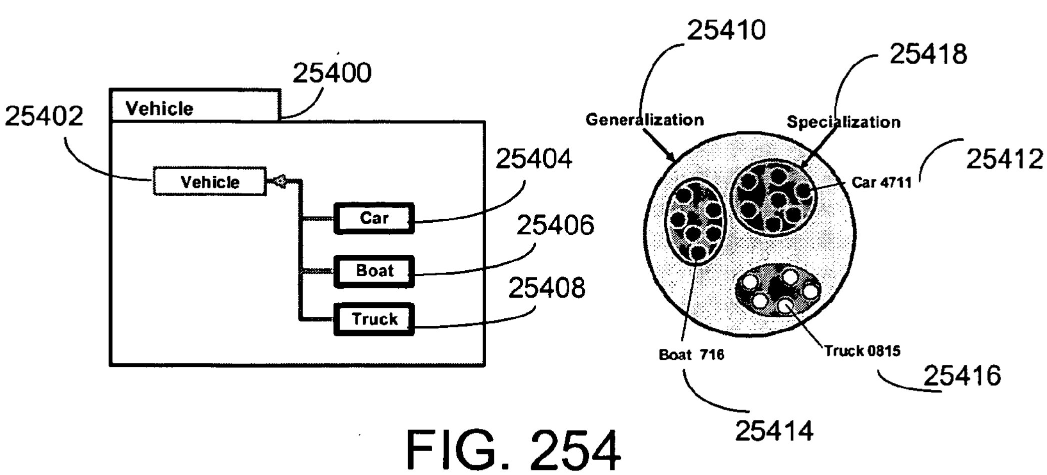
FIG. 254 depicts a third example of a package in accordance with methods and systems consistent with the subject matter described herein.

Another grouping within a package may be subtypes within a type. In these packages, the components are specialized forms of a generic package. For example, as depicted in FIG. 254, the components Car 25404, Boat 25406, and Truck 25408 can be generalized by the generic term Vehicle 25402 in Vehicle package 25400. Vehicle in this case is the generic package 25410, while Car 25412, Boat 25414, and Truck 25416 are the specializations 25418 of the generalized vehicle 25410.

Figure 255:
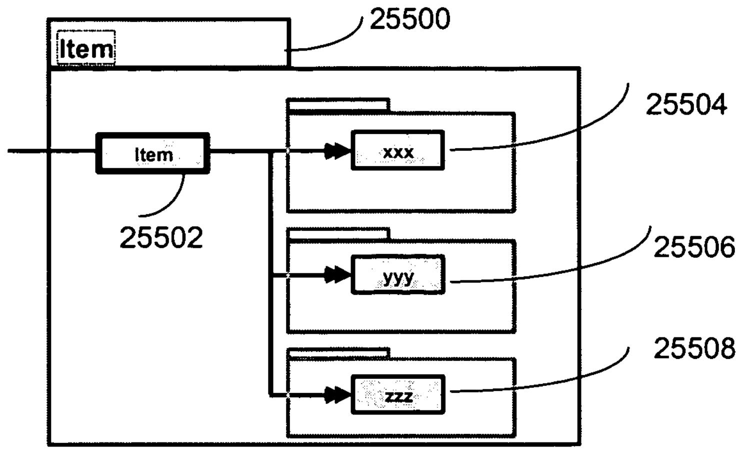
FIG. 255 depicts a fourth example of a package in accordance with methods and systems consistent with the subject matter described herein.

Packages also may be used to represent hierarchy levels. For example, as depicted in FIG. 255, the Item Package 25500 includes Item 25502 with subitem xxx 25504, subitem yyy 25506, and subitem zzz 25508.

Figure 256:
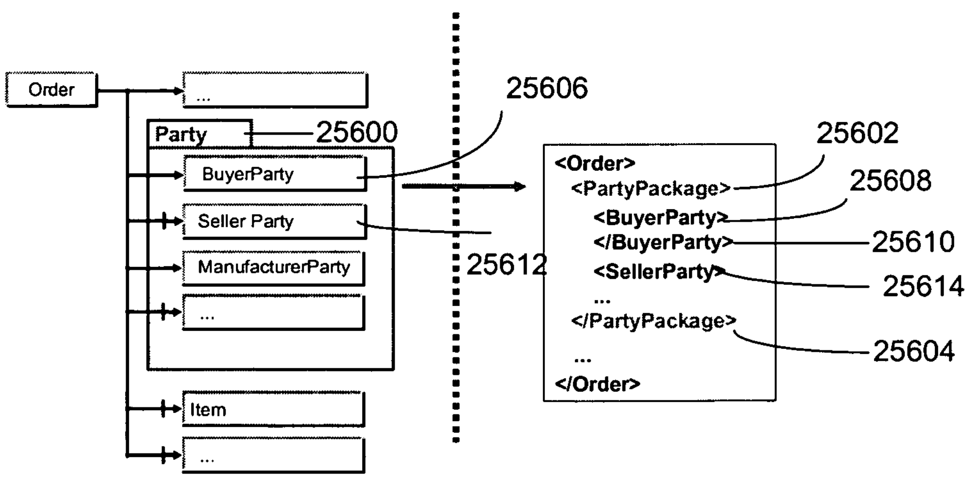
FIG. 256 depicts the representation of a package in the XML schema in accordance with methods and systems consistent with the subject matter described herein.

Packages can be represented in the XML schema as a comment. One advantage of this grouping is that the document structure is easier to read and is more understandable. The names of these packages are assigned by including the object name in brackets with the suffix "Package." For example, as depicted in FIG. 256, Party package 25600 is enclosed by <PartyPackage> 25602 and </PartyPackage> 25604. Party package 25600 illustratively includes a Buyer Party 25606, identified by <BuyerParty> 25608 and </BuyerParty> 25610, and a Seller Party 25612, identified by <SellerParty> 25614 and </SellerParty>, etc.

d) Relationships

Relationships describe the interdependencies of the entities in the business object model, and are thus an integral part of the business object model.

(1) Cardinality of Relationships

Figure 257:
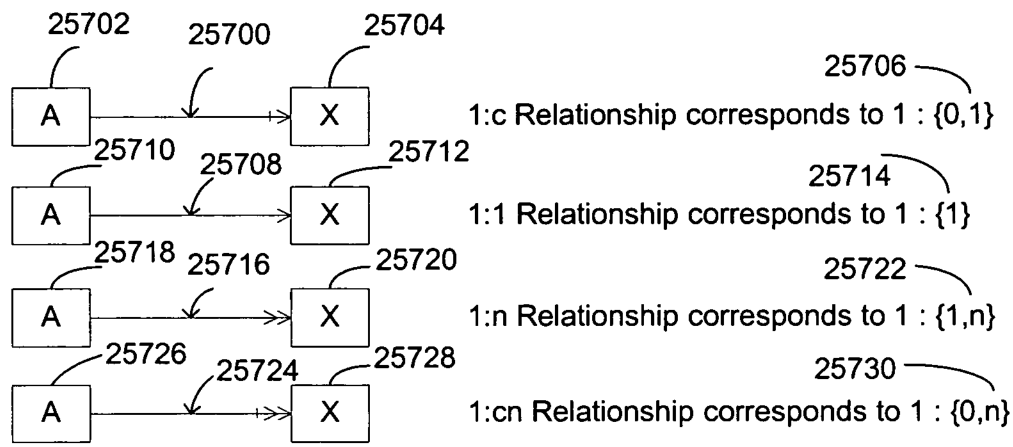
FIG. 257 depicts a graphical representation of cardinalities between two entities in accordance with methods and systems consistent with the subject matter described herein.

FIG. 257 depicts a graphical representation of the cardinalities between two entities. The cardinality between a first entity and a second entity identifies the number of second entities that could possibly exist for each first entity. Thus, a 1:c cardinality 25700 between entities A 25702 and X 25704 indicates that for each entity A 25702, there is either one or zero 25706 entity X 25704. A 1:1 cardinality 25708 between entities A 25710 and X 25712 indicates that for each entity A 25710, there is exactly one 25714 entity X 25712. A 1:n cardinality 25716 between entities A 25718 and X 25720 indicates that for each entity A 25718, there are one or more 25722 entity Xs 25720. A 1:cn cardinality 25724 between entities A 25726 and X 25728 indicates that for each entity A 25726, there are any number 25730 of entity Xs 25728 (i.e., 0 through n Xs for each A).

(2) Types of Relationships (a) Composition

Figure 258:
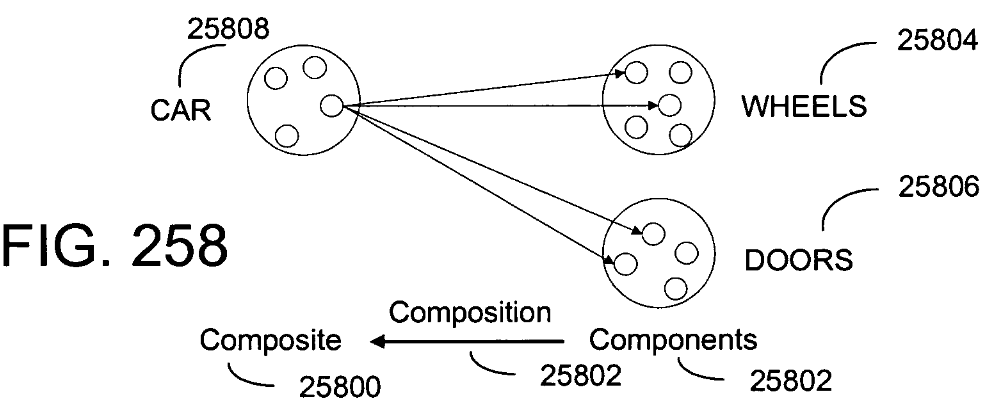
FIG. 258 depicts an example of a composition in accordance with methods and systems consistent with the subject matter described herein.
Figure 259:
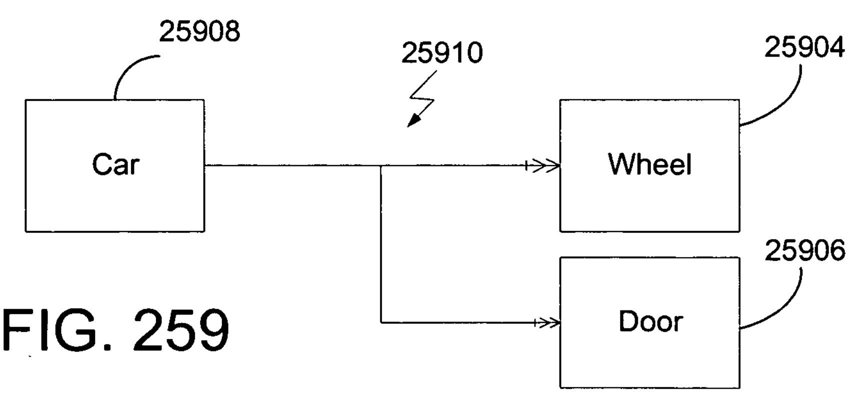
FIG. 259 depicts an example of a hierarchical relationship in accordance with methods and systems consistent with the subject matter described herein.

A composition or hierarchical relationship type is a strong whole-part relationship which is used to describe the structure within an object. The parts, or dependent entities, represent a semantical refinement or partition of the whole, or less dependent entity. For example, as depicted in FIG. 258, the components 25802 wheels 25804 and doors 25806 may be combined to form the composite 25800 "Car" 25808 using the composition 25810. FIG. 259 depicts a graphical representation of the composition 25910 between composite Car 25908 and components wheel 25904 and door 25906.

(b) Aggregation

Figure 260:
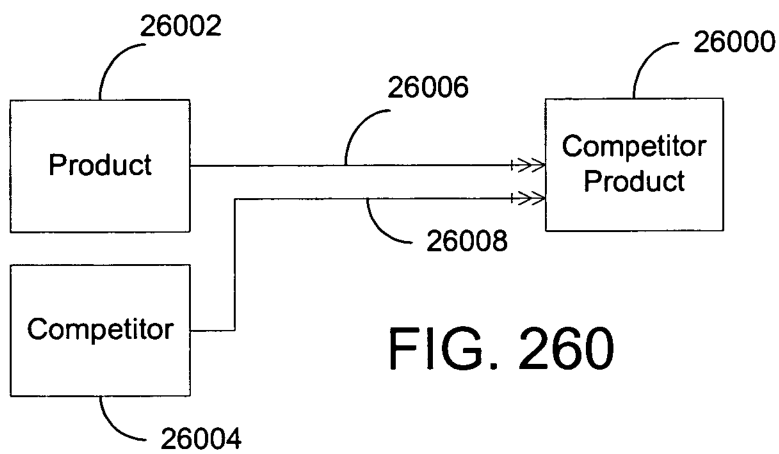
FIG. 260 depicts an example of an aggregating relationship in accordance with methods and systems consistent with the subject matter described herein.

An aggregation or an aggregating relationship type is a weak whole-part relationship between two objects. The dependent object is created by the combination of one or several less dependent objects. For example, as depicted in FIG. 260, the properties of a competitor product 26000 are determined by a product 26002 and a competitor 26004. A hierarchical relationship 26006 exists between the product 26002 and the competitor product 26000 because the competitor product 26000 is a component of the product 26002. Therefore, the values of the attributes of the competitor product 26000 are determined by the product 26002. An aggregating relationship 26008 exists between the competitor 26004 and the competitor product 26000 because the competitor product 26000 is differentiated by the competitor 26004. Therefore the values of the attributes of the competitor product 26000 are determined by the competitor 26004.

(c) Association

Figure 261:
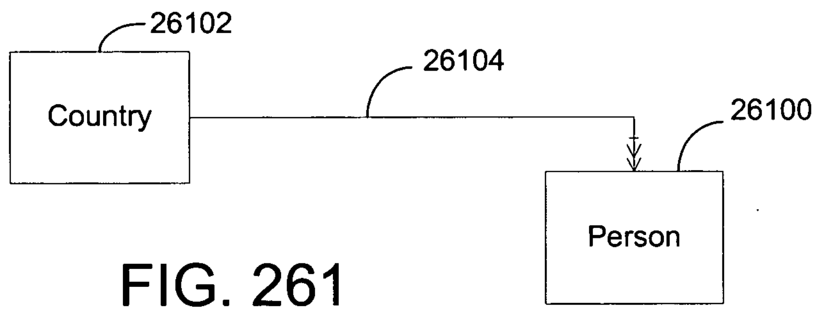
FIG. 261 depicts an example of an association in accordance with methods and systems consistent with the subject matter described herein.

An association or a referential relationship type describes a relationship between two objects in which the dependent object refers to the less dependent object. For example, as depicted in FIG. 261, a person 26100 has a nationality, and thus, has a reference to its country 26102 of origin. There is an association 26104 between the country 26102 and the person 26100. The values of the attributes of the person 26100 are not determined by the country 26102.

(3) Specialization

Figure 262:
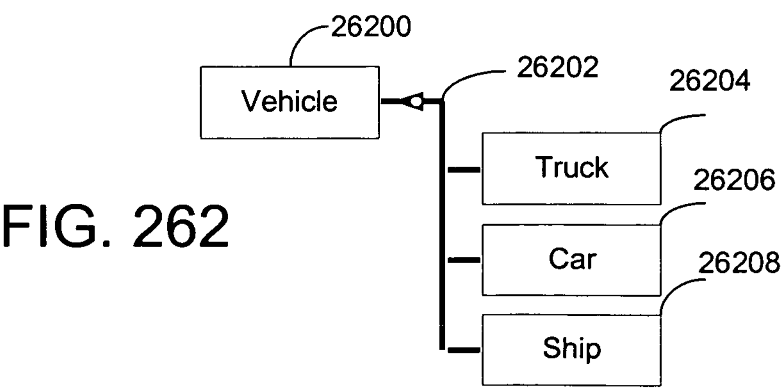
FIG. 262 depicts an example of a specialization in accordance with methods and systems consistent with the subject matter described herein.

Entity types may be divided into subtypes based on characteristics of the entity types. For example, FIG. 262 depicts an entity type "vehicle" 26200 specialized 26202 into subtypes "truck" 26204, "car" 26206, and "ship" 26208. These subtypes represent different aspects or the diversity of the entity type.

Subtypes may be defined based on related attributes. For example, although ships and cars are both vehicles, ships have an attribute, "draft," that is not found in cars. Subtypes also may be defined based on certain methods that can be applied to entities of this subtype and that modify such entities. For example, "drop anchor" can be applied to ships. If outgoing relationships to a specific object are restricted to a subset, then a subtype can be defined which reflects this subset.

Figure 263:
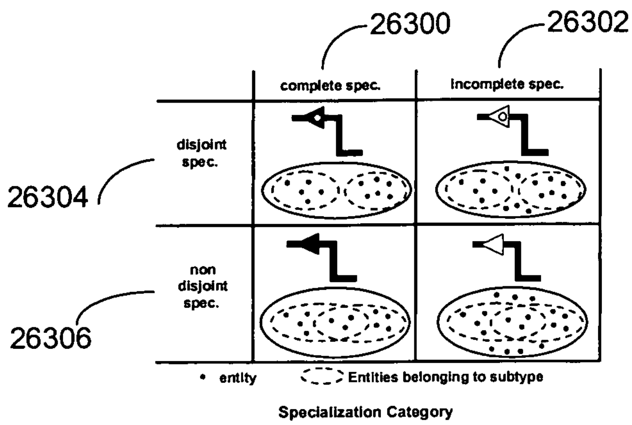
FIG. 263 depicts the categories of specializations in accordance with methods and systems consistent with the subject matter described herein.

As depicted in FIG. 263, specializations may further be characterized as complete specializations 26300 or incomplete specializations 26302. There is a complete specialization 26300 where each entity of the generalized type belongs to at least one subtype. With an incomplete specialization 26302, there is at least one entity that does not belong to a subtype. Specializations also may be disjoint 26304 or nondisjoint 26306. In a disjoint specialization 26304, each entity of the generalized type belongs to a maximum of one subtype. With a nondisjoint specialization 26306, one entity may belong to more than one subtype. As depicted in FIG. 263, four specialization categories result from the combination of the specialization characteristics.

e) Structural Patterns (1) Item

An item is an entity type which groups together features of another entity type. Thus, the features for the entity type chart of accounts are grouped together to form the entity type chart of accounts item. For example, a chart of accounts item is a category of values or value flows that can be recorded or represented in amounts of money in accounting, while a chart of accounts is a superordinate list of categories of values or value flows that is defined in accounting.

The cardinality between an entity type and its item is either 1:n or 1:cn. In the case of the entity type chart of accounts, there is a hierarchical relationship of the cardinality 1:n with the entity type chart of accounts item since a chart of accounts has at least one item in all cases.

(2) Hierarchy

Figure 264:
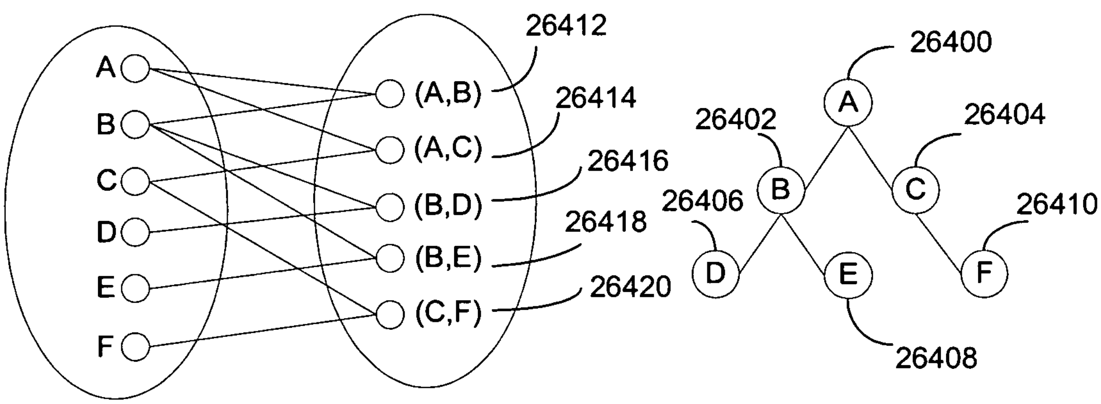
FIG. 264 depicts an example of a hierarchy in accordance with methods and systems consistent with the subject matter described herein.

A hierarchy describes the assignment of subordinate entities to superordinate entities and vice versa, where several entities of the same type are subordinate entities that have, at most, one directly superordinate entity. For example, in the hierarchy depicted in FIG. 264, entity B 26402 is subordinate to entity A 26400, resulting in the relationship (A,B) 26412. Similarly, entity C 26404 is subordinate to entity A 26400, resulting in the relationship (A,C) 26414. Entity D 26406 and entity E 26408 are subordinate to entity B 26402, resulting in the relationships (B,D) 26416 and (B,E) 26418, respectively. Entity F 26410 is subordinate to entity C 26404, resulting in the relationship (C,F) 26420.

Figure 265:
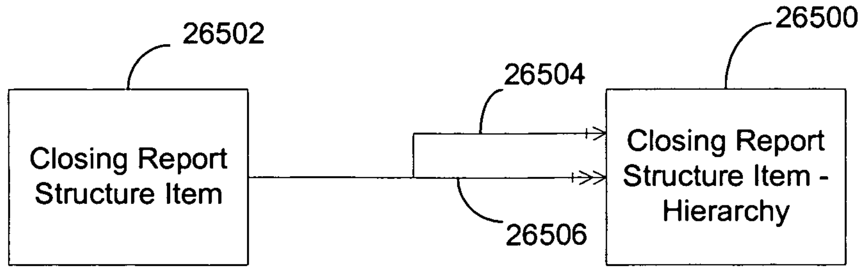
FIG. 265 depicts a graphical representation of a hierarchy in accordance with methods and systems consistent with the subject matter described herein.

Because each entity has at most one superordinate entity, the cardinality between a subordinate entity and its superordinate entity is 1:c. Similarly, each entity may have 0, 1 or many subordinate entities. Thus, the cardinality between a superordinate entity and its subordinate entity is 1:cn. FIG. 265 depicts a graphical representation of a Closing Report Structure Item hierarchy 26500 for a Closing Report Structure Item 26502. The hierarchy illustrates the 1:c cardinality 26504 between a subordinate entity and its superordinate entity, and the 1:cn cardinality 26506 between a superordinate entity and its subordinate entity.

3. Creation of the Business Object Model

FIGS. 266A-B depict the steps performed using methods and systems consistent with the subject matter described herein to create a business object model. Although some steps are described as being performed by a computer, these steps may alternatively be performed manually, or computer-assisted, or any combination thereof. Likewise, although some steps are described as being performed by a computer, these steps may also be computer-assisted, or performed manually, or any combination thereof.

As discussed above, the designers create message choreographies that specify the sequence of messages between business entities during a transaction. After identifying the messages, the developers identify the fields contained in one of the messages (step 26600, FIG. 266A). The designers then determine whether each field relates to administrative data or is part of the object (step 26602). Thus, the first eleven fields identified below in the left column are related to administrative data, while the remaining fields are part of the object.

| | |
|---|---|
| MessageID | Admin |
| ReferenceID | |
| CreationDate | |
| SenderID | |
| AdditionalSenderID | |
| ContactPersonID | |
| SenderAddress | |
| RecipientID | |
| AdditionalRecipientID | |
| ContactPersonID | |
| RecipientAddress | |
| ID | Main Object |
| AdditionalID | |
| PostingDate | |
| LastChangeDate | |

-continued

AcceptanceStatus
Note
CompleteTransmission
Indicator
Buyer
BuyerOrganisationName
Person Name
FunctionalTitle
DepartmentName
CountryCode
StreetPostalCode
POBox Postal Code
Company Postal Code
City Name
DistrictName
PO Box ID
PO Box Indicator
PO Box Country Code
PO Box Region Code
PO Box City Name
Street Name
House ID
Building ID
Floor ID
Room ID
Care Of Name
AddressDescription
Telefonnumber
MobileNumber
Facsimile
Email
Seller
SellerAddress
Location
LocationType
DeliveryItemGroupID
DeliveryPriority
DeliveryCondition
TransferLocation
NumberofPartialDelivery
QuantityTolerance
MaximumLeadTime
TransportServiceLevel
TranportCondition
TransportDescription
CashDiscountTerms
PaymentForm
PaymentCardID
PaymentCardReferenceID
SequenceID
Holder
ExpirationDate
AttachmentID
AttachmentFilename
DescriptionofMessage
ConfirmationDescriptionof
Message
FollowUpActivity
ItemID
ParentItemID
HierarchyType
ProductID
ProductType
ProductNote
ProductCategoryID
Amount
BaseQuantity
ConfirmedAmount
ConfirmedBaseQuantity
ItemBuyer
ItemBuyerOrganisationName
Person Name
FunctionalTitle
DepartmentName
CountryCode
StreetPostalCode
POBox Postal Code
Company Postal Code
City Name
DistrictName -continued PO Box ID
PO Box Indicator
PO Box Country Code
PO Box Region Code
PO Box City Name
Street Name
House ID
Building ID
Floor ID
Room ID
Care Of Name
AddressDescription
Telefonnumber
MobilNumber
Facsimile
Email
ItemSeller
ItemSellerAddress
ItemLocation
ItemLocationType
ItemDeliveryItemGroupID
ItemDeliveryPriority
ItemDeliveryCondition
ItemTransferLocation
ItemNumberofPartialDelivery
ItemQuantityTolerance
ItemMaximumLeadTime
ItemTransportServiceLevel
ItemTranportCondition
ItemTransportDescription
ContractReference
QuoteReference
CatalogueReference
ItemAttachmentID
ItemAttachmentFilename
ItemDescription
ScheduleLineID
DeliveryPeriod
Quantity
ConfirmedScheduleLineID
ConfirmedDeliveryPeriod
ConfirmedQuantity Next, the designers determine the proper name for the object according to the ISO 11179 naming standards (step 26604). In the example above, the proper name for the "Main Object" is "Purchase Order." After naming the object, the system that is creating the business object model determines whether the object already exists in the business object model (step 26606). If the object already exists, the system integrates new attributes from the message into the existing object (step 26608), and the process is complete.

If at step 26606 the system determines that the object does not exist in the business object model, the designers model the internal object structure (step 26610). To model the internal structure, the designers define the components. For the above example, the designers may define the components identified below.

| | | |
|---|---|---|
| ID | Purchase | |
| AdditionalID | Order | |
| PostingDate | | |
| LastChangeDate | | |
| AcceptanceStatus | | |
| Note | | |
| CompleteTransmission | | |
| Indicator | | |
| Buyer | | Buyer |
| BuyerOrganisationName | | |
| Person Name | | |
| FunctionalTitle | | |
| DepartmentName | | |
| CountryCode | | |

-continued

| | | |
|---|---|---|
| StreetPostalCode | | |
| POBox Postal Code | | |
| Company Postal Code | | |
| City Name | | |
| DistrictName | | |
| PO Box ID | | |
| PO Box Indicator | | |
| PO Box Country Code | | |
| PO Box Region Code | | |
| PO Box City Name | | |
| Street Name | | |
| House ID | | |
| Building ID | | |
| Floor ID | | |
| Room ID | | |
| Care Of Name | | |
| AddressDescription | | |
| Telefonnumber | | |
| MobileNumber | | |
| Facsimile | | |
| Email | | |
| Seller | Seller | |
| SellerAddress | | |
| Location | Location | |
| LocationType | | |
| DeliveryItemGroupID | Delivery | |
| DeliveryPriority | Terms | |
| DeliveryCondition | | |
| TransferLocation | | |
| NumberofPartialDelivery | | |
| QuantityTolerance | | |
| MaximumLeadTime | | |
| TransportServiceLevel | | |
| TranportCondition | | |
| TransportDescription | | |
| CashDiscountTerms | | |
| PaymentForm | Payment | |
| PaymentCardID | | |
| PaymentCardReferenceID | | |
| SequenceID | | |
| Holder | | |
| ExpirationDate | | |
| AttachmentID | | |
| AttachmentFilename | | |
| DescriptionofMessage | | |
| ConfirmationDescriptionof Message | | |
| FollowUpActivity | | |
| ItemID | Purchase | |
| ParentItemID | Order | |
| HierarchyType | Item | |
| ProductID | | Product |
| ProductType | | |
| ProductNote | | |
| ProductCategoryID | | ProductCategory |
| Amount | | |
| BaseQuantity | | |
| ConfirmedAmount | | |
| ConfirmedBaseQuantity | | |
| ItemBuyer | | Buyer |

-continued

| | |
|---|---|
| ItemBuyerOrganisation | |
| Name | |
| Person Name | |
| FunctionalTitle | |
| DepartmentName | |
| CountryCode | |
| StreetPostalCode | |
| POBox Postal Code | |
| Company Postal Code | |
| City Name | |
| DistrictName | |
| PO Box ID | |
| PO Box Indicator | |
| PO Box Country Code | |
| PO Box Region Code | |
| PO Box City Name | |
| Street Name | |
| House ID | |
| Building ID | |
| Floor ID | |
| Room ID | |
| Care Of Name | |
| AddressDescription | |
| Telefonnumber | |
| MobilNumber | |
| Facsimile | |
| Email | |
| ItemSeller | Seller |
| ItemSellerAddress | |
| ItemLocation | Location |
| ItemLocationType | |
| ItemDeliveryItemGroupID | |
| ItemDeliveryPriority | |
| ItemDeliveryCondition | |
| ItemTransferLocation | |
| ItemNumberofPartial Delivery | |
| ItemQuantityTolerance | |
| ItemMaximumLeadTime | |
| ItemTransportServiceLevel | |
| ItemTranportCondition | |
| ItemTransportDescription | |
| ContractReference | Contract |
| QuoteReference | Quote |
| CatalogueReference | Catalogue |
| ItemAttachmentID | |
| ItemAttachmentFilename | |
| ItemDescription | |
| ScheduleLineID | |
| DeliveryPeriod | |
| Quantity | |
| ConfirmedScheduleLineID | |
| ConfirmedDeliveryPeriod | |
| ConfirmedQuantity | |

During the step of modeling the internal structure, the designers also model the complete internal structure by identifying the compositions of the components and the corresponding cardinalities, as shown below.

| | | | | |
|---|---|---|---|---|
| PurchaseOrder | | | | 1 |
| | Buyer | | | 0..1 |
| | | Address | | 0..1 |
| | | ContactPerson | | 0..1 |
| | | | Address | 0..1 |
| | Seller | | | 0..1 |
| | Location | | | 0..1 |
| | | Address | | 0..1 |
| | DeliveryTerms | | | 0..1 |
| | | Incoterms | | 0..1 |
| | | PartialDelivery | | 0..1 |
| | | QuantityTolerance | | 0..1 |
| | | Transport | | 0..1 |
| | CashDiscountsTerms | | | 0..1 |
| | | MaximumCashDiscount | | 0..1 |

-continued

| | | | |
|---|---|---|---|
| | NormalCashDiscount | | 0..1 |
| PaymentForm | | | 0..1 |
| | PaymentCard | | 0..1 |
| Attachment | | | 0..n |
| Description | | | 0..1 |
| Confirmation Description | | | 0..1 |
| Item | | | 0..n |
| | HierarchyRelationship | | 0..1 |
| | Product | | 0..1 |
| | ProductCategory | | 0..1 |
| | Price | | 0..1 |
| | | NetUnitPrice | 0..1 |
| | ConfirmedPrice | | 0..1 |
| | | NetUnitPrice | 0..1 |
| | Buyer | | 0..1 |
| | Seller | | 0..1 |
| | Location | | 0..1 |
| | DeliveryTerms | | 0..1 |
| | Attachment | | 0..n |
| | Description | | 0..1 |
| | ConformationDescription | | 0..1 |
| | ScheduleLine | | 0..n |
| | | DeliveryPeriod | 1 |
| | ConfirmedScheduleLine | | 0..n |

After modeling the internal object structure, the developers identify the subtypes and generalizations for all objects and components (step 26612). For example, the Purchase Order may have subtypes Purchase Order Update, Purchase Order Cancellation and Purchase Order Information. Purchase Order Update may include Purchase Order Request, Purchase Order Change, and Purchase Order Confirmation. Moreover, Party may be identified as the generalization of Buyer and Seller. The subtypes and generalizations for the above example are shown below.

| | | | | | |
|---|---|---|---|---|---|
| PurchaseOrder | | | | | 1 |
| | PurchaseOrder Update | | | | |
| | | PurchaseOrder Request | | | |
| | | PurchaseOrder Change | | | |
| | | PurchaseOrder Confirmation | | | |
| | PurchaseOrder Cancellation | | | | |
| | PurchaseOrder Information | | | | |
| | Party | | | | |
| | | BuyerParty | | | 0 . . . 1 |
| | | | Address | | 0 . . . 1 |
| | | | ContactPerson | | 0 . . . 1 |
| | | | | Address | 0 . . . 1 |
| | | SellerParty | | | 0 . . . 1 |
| | Location | | | | |
| | | ShipToLocation | | | 0 . . . 1 |
| | | | Address | | 0 . . . 1 |
| | | ShipFromLocation | | | 0 . . . 1 |
| | | | Address | | 0 . . . 1 |
| | DeliveryTerms | | | | 0 . . . 1 |
| | | Incoterms | | | 0 . . . 1 |
| | | PartialDelivery | | | 0 . . . 1 |
| | | QuantityTolerance | | | 0 . . . 1 |
| | | Transport | | | 0 . . . 1 |
| | CashDiscount Terms | | | | 0 . . . 1 |
| | | MaximumCash Discount | | | 0 . . . 1 |
| | | NormalCashDiscount | | | 0 . . . 1 |
| | PaymentForm | | | | 0 . . . 1 |
| | | PaymentCard | | | 0 . . . 1 |
| | Attachment | | | | 0 . . . n |
| | Description | | | | 0 . . . 1 |
| | Confirmation Description | | | | 0 . . . 1 |
| | Item | | | | 0 . . . n |
| | | HierarchyRelationship | | | 0 . . . 1 |
| | | Product | | | 0 . . . 1 |
| | | ProductCategory | | | 0 . . . 1 |
| | | Price | | | 0 . . . 1 |

-continued

| | | | |
|---|---|---|---|
| | | NetUnitPrice | 0 . . . 1 |
| | ConfirmedPrice | | 0 . . . 1 |
| | | NetUnitPrice | 0 . . . 1 |
| | Party | | |
| | | BuyerParty | 0 . . . 1 |
| | | SellerParty | 0 . . . 1 |
| | Location | | |
| | | ShipTo Location | 0 . . . 1 |
| | | ShipFrom Location | 0 . . . 1 |
| | DeliveryTerms | | 0 . . . 1 |
| | Attachment | | 0 . . . n |
| | Description | | 0 . . . 1 |
| | Confirmation Description | | 0 . . . 1 |
| | ScheduleLine | | 0 . . . n |
| | | Delivery Period | 1 |
| | ConfirmedScheduleLine | | 0 . . . n |

After identifying the subtypes and generalizations, the developers assign the attributes to these components (step 26614). The attributes for a portion of the components are shown below.

| | | | | |
|---|---|---|---|---|
| Purchase Order | | | | 1 |
| | ID | | | 1 |
| | SellerID | | | 0 . . . 1 |
| | BuyerPosting DateTime | | | 0 . . . 1 |
| | BuyerLast ChangeDate Time | | | 0 . . . 1 |
| | SellerPosting DateTime | | | 0 . . . 1 |
| | SellerLast ChangeDate Time | | | 0 . . . 1 |
| | Acceptance StatusCode | | | 0 . . . 1 |
| | Note | | | 0 . . . 1 |
| | ItemList Complete Transmission Indicator | | | 0 . . . 1 |
| | BuyerParty | | | 0 . . . 1 |
| | | StandardID | | 0 . . . n |
| | | BuyerID | | 0 . . . 1 |
| | | SellerID | | 0 . . . 1 |
| | | Address | | 0 . . . 1 |
| | | ContactPerson | | 0 . . . 1 |
| | | | BuyerID | 0 . . . 1 |
| | | | SellerID | 0 . . . 1 |
| | | | Address | 0 . . . 1 |
| | SellerParty | | | 0 . . . 1 |
| | Product RecipientParty | | | 0 . . . 1 |
| | VendorParty | | | 0 . . . 1 |
| | Manufacturer Party | | | 0 . . . 1 |
| | BillToParty | | | 0 . . . 1 |
| | PayerParty | | | 0 . . . 1 |
| | CarrierParty | | | 0 . . . 1 |
| | ShipTo Location | | | 0 . . . 1 |
| | | StandardID | | 0 . . . n |
| | | BuyerID | | 0 . . . 1 |
| | | SellerID | | 0 . . . 1 |
| | | Address | | 0 . . . 1 |
| | ShipFrom Location | | | 0 . . . 1 |

The system then determines whether the component is one of the object nodes in the business object model (step 26616, FIG. 266B). If the system determines that the component is one of the object nodes in the business object model, the system integrates a reference to the corresponding object node from the business object model into the object (step 26618). In the above example, the system integrates the reference to the Buyer party represented by an ID and the reference to the ShipToLocation represented by an into the object, as shown below. The attributes that were formerly located in the PurchaseOrder object are now assigned to the new found object party. Thus, the attributes are removed from the PurchaseOrder object.

| | | |
|---|---|---|
| PurchaseOrder | | |
| | ID | |
| | SellerID | |
| | BuyerPostingDateTime | |
| | BuyerLastChangeDateTime | |
| | SellerpostingDateTime | |
| | SellerLastChangeDateTime | |
| | AcceptanceStatusCode | |
| | Note | |
| | ItemListComplete | |
| | TransmissionIndicator | |
| | BuyerParty | |
| | | ID |
| | SellerParty | |
| | ProductRecipientParty | |
| | VendorParty | |
| | ManufacturerParty | |
| | BillToParty | |
| | PayerParty | |
| | CarrierParty | |
| | ShipToLocation | |
| | | ID |
| | ShipFromLocation | |

During the integration step, the designers classify the relationship (i.e., aggregation or association) between the object node and the object being integrated into the business object model. The system also integrates the new attributes into the object node (step 26620). If at step 26616, the system determines that the component is not in the business object model, the system adds the component to the business object model (step 26622).

Regardless of whether the component was in the business object model at step 26616, the next step in creating the business object model is to add the integrity rules (step 26624). There are several levels of integrity rules and constraints which should be described. These levels include consistency rules between attributes, consistency rules between components, and consistency rules to other objects. Next, the designers determine the services offered, which can be accessed via interfaces (step 26626). The services offered in the example above include PurchaseOrderCreateRequest, PurchaseOrderCancellationRequest, and PurchaseOrderReleaseRequest. The system then receives an indication of the location for the object in the business object model (step 26628). After receiving the indication of the location, the system integrates the object into the business object model (step 26630).

4. Structure of the Business Object Model

The business object model, which serves as the basis for the process of generating consistent interfaces, includes the elements contained within the interfaces. These elements are arranged in a hierarchical structure within the business object model.

FIGS. 267A-NN depict an exemplary Business Object Model in accordance with methods and systems consistent with the subject matter described herein. The business object model includes a BusinessObjectModel package 26700, which includes a BusinessObjectModel—Customizing package 26702, a BusinessObjectModel—Strategic package 26704, and a BusinessObjectModel—Operative package 26706.

The BusinessObjectModel—Customizing package 26702 includes an Incoterrns package 26708. The Incoterms package 26708 includes an Incoterms entity 26710.

The BusinessObjectModel—Strategic package 26704 includes a PropertyDefinitionClass package 26712, a PropertyDataType package 26714, a Property package 26716, a Catalogue package 26718, an Address package 26720, and an Attachment package 26722. The PropertyDefinitionClass package 26712 includes a PropertyDefinitionClass entity 26724. The PropertyDataType package 26714 includes a PropertyDataType entity 26726. There is a 1:n relationship 26728 between the PropertyDefinitionClass entity 26724 and the PropertyDataType entity 26726. There is a 1:c relationship 26730 between the PropertyDataType entity 26728 and the PropertyDefinitionClass entity 26724. Thus, in some cases, there is an instance of the PropertyDataType entity 26728 with a reference to the PropertyDefinitionClass entity 26724.

The Property package includes a Property entity 26734. There is a 1:cn relationship 26734 between the PropertyDataType entity 26728 and the Property entity 26732. There is also a 1:c referential relationship 26736 between the PropertyDataType entity 26728 and the Property entity 26736.

The Address package 26720 includes an Address entity 26737. The Address entity 26737 includes an AddressPersonName entity 26738, an AddressOffice entity 26740, an AddressPhysicalAddress entity 26742, an AddressGeoCoordinates entity 26744, and an AddressCommunication entity 26746. There is a 1:c relationship 26748 between the Address entity 26737 and the AddressPersonName entity 26738. There is a 1:c relationship 26750 between the Address entity 26737 and the AddressOffice entity 26740. There is a 1:c relationship 26752 between the Address entity 26737 and the AddressPhysicalAddress entity 26742. There is a 1:c relationship 26754 between the Address entity 26737 and the AddressGeoCoordinates entity 26744. There is a 1:c relationship 26756 between the Address entity 26737 and the AddressCommunication entity 26746.

The Attachment package 26722 includes an Attachment entity 26758.

The Catalogue package 26718 includes a CatalogueGlobalInformation package 26760, a CatalogueModel package 26762, and a CatalogueContent package 26764. The Catalogue package 26718 also includes a Catalogue entity 26766. The Catalogue entity 26766 is specialized into a TransmissionCatalogue entity 26768 and a CataloguePublicationConfirmation entity 26770, which are disjoint complete specializations 26772 of the Catalogue entity 26766. The TransmissionCatalogue entity 26768 is specialized into a CatalogueUpdate entity 26774 and a CataloguePublication entity 26776, which are disjoint complete specializations 26778 of the TransmissionCatalogue entity 26768. The Catalogue entity 26766 is also specialized into a BuyerProductCatalogue entity 26780 and a SellerProductCatalogue entity 26782, which are disjoint complete specializations 26784 of the Catalogue entity 26766.

The CatalogueGlobalInformation package 26760 includes a CatalogueProviderPropertyValuation entity 26786. There is a 1:cn relationship 26788 between the Catalogue entity 26766 and the CatalogueProviderPropertyValuation entity 26786.

The CatalogueModel package 26762 includes a CatalogueModel entity 26790. There is a 1:c relationship 26792 between the Catalogue entity 26766 and the CatalogueModel entity 26790.

The CatalogueContent package 26764 includes a CatalogueContent entity 26794. There is a 1:c relationship 26796 between the Catalogue entity 26766 and the CatalogueContent entity 26794.

The CatalogueModel package 26762 includes a CatalogueModelPropertyDefinitionClass package 26798, a CatalogueModelPropertyDataType package 26700A, a CatalogueModelProperty package 26702A, a CatalogueModelCatalogueItemProperty package 26704A, a CatalogueModelCatalogueSectionType package 26706A, and a CatalogueModelCatalogueSchema package 26708A.

The CatalogueModelPropertyDefinitionClass package 26798 includes a CatalogueModelPropertyDefinitionClass entity 26710A. There is a 1:cn relationship 26714A between the PropertyDefinitionClass entity 26724 and the CatalogueModelPropertyDefinitionClass entity 26710A, and a 1:cn relationship 26712A between the CatalogueModel entity 26790 and the CatalogueModelPropertyDefinitionClass entity 26710A.

The CatalogueModelPropertyDataType package 26700A includes a CatalogueModelPropertyDataType entity 26716A. There is a 1:cn relationship 26718A between the CatalogueModel entity 26790 and the CatalogueModelPropertyDataType entity 26716A. There is a 1:cn relationship 26720A between the PropertyDataType entity 26726 and the CatalogueModelPropertyDataType entity 26716A.

The CatalogueModelProperty package 26702A includes a CatalogueModelProperty entity 26722A. There is a 1:cn relationship 26726A between the Property entity 26732 and the CatalogueModelProperty entity 26722A. There is a 1:cn relationship 26724A between the CatalogueModel entity 26790 and the CatalogueModelProperty entity 26722A.

The CatalogueModelCatalogueItemProperty package 26704A includes a CatalogueModelPropertyDataType entity 26728A. There is a 1:cn relationship 26730A between the CatalogueModel entity 26790 and the CatalogueModelPropertyDataType entity 26728A.

The CatalogueModelCatalogueSectionType package 26706A includes a CatalogueModelCatalogueSectionType entity 26732A. There is a 1:cn relationship 26734A between the CatalogueModel entity 26790 and the CatalogueModelCatalogueSectionType entity 26732A. The CatalogueModelCatalogueSectionType entity 26732A includes a Catalogue- ModelCatalogueSectionTypeSectionProperty entity 26736A. There is a 1:cn relationship 26738A between the CatalogueModelCatalogueSectionType entity 26732A and the CatalogueModelCatalogueSectionTypeSectionProperty entity 26736A.

The CatalogueModelCatalogueSchema package 26708A includes a CatalogueModelCatalogueSchema entity 26740A. There is a 1:cn relationship 26742A between the CatalogueModel entity 26790 and the CatalogueModelCatalogueSchema entity 26740A. The CatalogueModelCatalogueSchema entity 26740A includes a CatalogueModelCatalogueSchemaItemProperty entity 26744A, a CatalogueModelCatalogueSchemaSection entity 26746A, and a CatalogueModelCatalogueSchemaSectionRelationship entity 26748A. There is a 1:cn relationship 26750A between the CatalogueModelCatalogueSchema entity 26740A and the CatalogueModelCatalogueSchemaItemProperty entity 26744A. There is a 1:cn relationship 26752A between the CatalogueModelCatalogueSchema entity 26740A and the CatalogueModelCatalogueSchemaSection entity 26746A. There is a 1:cn relationship 26754A between the CatalogueModelCatalogueSchema entity 26740A and the CatalogueModelCatalogueSchemaSectionRelationship entity 26748A.

The CatalogueModelCatalogueSchemaSection entity 26746A includes a CatalogueModelCatalogueSchemaSectionPropertyValuation entity 26756A and a CatalogueModelCatalogueSchemaSectionItemProperty entity 26758A. There is a 1:cn relationship 26760A between the CatalogueModelCatalogueSchemaSection entity 26746A and the CatalogueModelCatalogueSchemaSectionPropertyValuation entity 26756A. There is a 1:cn relationship 26762A between the CatalogueModelCatalogueSchemaSection entity 26746A and the CatalogueModelCatalogueSchemaSectionItemProperty entity 26758A.

The CatalogueContent package 26764 includes a CatalogueContentCatalogueItem package 26764A and a CatalogueContentCatalogueView package 26766A.

The CatalogueContentCatalogueItem package 26764A includes a CatalogueContentCatalogueItem entity 26768A and a CatalogueContentCatalogueItemRelationship entity 26774A. There is a 1:cn relationship 26772A between the CatalogueContent entity 26794 and the CatalogueContentCatalogueItem entity 26768A. There is a 1:cn relationship 26774A between the CatalogueContent entity 26794 and the CatalogueContentCatalogueItemRelationship entity 26770A. The CatalogueContentCatalogueItem entity 26768A includes a CatalogueContentCatalogueItemDescription entity 26776A, a CatalogueContentCatalogueItemPropertyValuation entity 26778A, and a CatalogueContentCatalogueItemClassification entity 26780A. There is a 1:cn relationship 26782A between the CatalogueContentCatalogueItem entity 26768A and the CatalogueContentCatalogueItemDescription entity 26776A. There is a 1:cn relationship 26784A between the CatalogueContentCatalogueItem entity 26768A and the CatalogueContentCatalogueItemPropertyValuation entity 26778A. There is a 1:cn relationship 26786A between the CatalogueContentCatalogueItem entity 26768A and the CatalogueContentCatalogueItemClassification entity 26780A.

The CatalogueContentCatalogueView package 26766A includes a CatalogueContentCatalogueView entity 26788A. There is a 1:cn relationship 26790A between the CatalogueContent entity 26794 and the CatalogueContentCatalogueView entity 26788A.

The CatalogueContentCatalogueView entity 26788A includes a CatalogueContentCatalogueViewSchema entity 26792A, a CatalogueContentCatalogueViewItem entity 26794A, a CatalogueContentCatalogueViewItemRelationshipType entity 26796A, and a CatalogueContentCatalogueViewExcludedProperty entity 26798A. There is a 1:cn relationship 26700B between the CatalogueContentCatalogueView entity 26788A and the CatalogueContentCatalogueViewSchema entity 26792A. There is a 1:cn relationship 26702B between the CatalogueContentCatalogueView entity 26788A and the CatalogueContentCatalogueViewItem entity 26794A. There is a 1:cn relationship 26704B between the CatalogueContentCatalogueView entity 26788A and the CatalogueContentCatalogueViewItemRelationshipType entity 26796A. There is a 1:cn relationship 26706B between the CatalogueContentCatalogueView entity 26788A and the CatalogueContentCatalogueViewExcludedProperty entity 26798A.

The CatalogueContentCatalogueViewSchema entity 26792A includes a CatalogueContentCatalogueViewSchemaSection entity 26780A. There is a 1:cn relationship 26710B between the CatalogueContentCatalogueViewSchema entity 26792A and the CatalogueContentCatalogueViewSchemaSection entity 26780A.

The Business Object Model Operative package 26706 includes a BusinessTransactionDocument package 26712B, and a CataloguePublicationTransmission package 26714B.

The BusinessTransactionDocument package 26712B includes a BTDCreditWorthinessInformation package 26718B, a BTDCreditAgencyReportQueryService package 26720B, a BTDLegalInformation package 26722B, a BTDScheduling package 26724B, a BTDTransportInformation package 26726B, a BTDHandlingUnit package 26728B, a BTDLog package 26730B, a BTDFollowUpBusinessTransactionDocument package 26732B, a BTDFollowUpMessage package 26734B, a BTDLoanPaymentPlan pakcage 26735B, a BTDItem package 26736B, a BTDPriceInformation package 26738B, a BTDPaymentInformation package 26740B, a BTDTax package 26742B, a BTDDeliveryInformation package 26744B, a BTDDeliveryExecutionInformation package 26746B, a BTDAccountingObjectSet package 26748B, a BTDBusinessDocumentObjectReference package 26750B, a BTDAttachment package 26752B, a BTDDescription package 26754B, a BTDParty package 26756B, a BTDLocation package 26758B, a BTDProductInformation package 26759B, a BTDLoanConditionInformation package 26760B, and a PersonnelTimeSubsheet package 26761B.

The BusinessTransactionDocument package 26712B also includes a BusinessTransactionDocument entity 26762B. The BusinessTransactionDocument entity 26762B is specialized into an InventoryChange entity 26764B, a SourceOfSupply entity 26766B, a CreditAgencyReportQuery entity 26768B, a CreditAgencyReport entity 26770B, a CreditWorthinessQuery entity 26772B, a CreditWorthiness entity 26774B, a ProductActivity entity 26776B, a ProductDemandInfluencingEvent entity 26778B, a ProductForecast entity 26780B, a RequestForQuotation (RFQ) entity 26782B, an RFQResult entity 26784B, a Quote entity 26786B, a SalesContract entity 26788B, a PurchaseContract entity 26790B, a SchedulingAgreement entity 26792B, a PurchaseRequirement entity 26794B, a PurchaseRequirementConfirmation entity 26796B, a PurchaseOrder entity 26798B, a SalesOrder entity 26700C, a SalesOrderFulfillment entity 26702C, a ServiceAcknowledgement entity 26704C, a DeliveryExecutionRequest entity 26706C, a Delivery entity 26708C, a Shipment entity 26710C, a PaymentDue entity 26712C, an InvoiceDue entity 26714C, an InvoiceDueCancellation entity 26716C, an Invoice entity 26718C, an InvoiceIssued entity 26720C, an InvoiceAccounting entity 26722C, an AccountingCancellation entity 26724C, a VendorInvoice entity 26726C, and a TaxDue entity 26728C, which are disjoint complete specializations 26730C of the BusinessTransactionDocument entity 26762B.

The ProductForecast entity 26780B is specialized into a ProductForecastNotification entity 26732C and a ProductForecastRevision entity 26734C, which are disjoint complete specializations 26736C of the ProductForecast entity 26780B.

The RFQ entity 26782B is specialized into a RFQUpdate entity 26738C and a RFQCancellation entity 26740C, which are nondisjoint complete specializations 26742C of the RFQ entity 26782B. The RFQUpdate entity 26738C is specialized into a RFQRequest entity 26744C and a RFQCharge entity 26746C, which are nondisjoint complete specializations 26748C of the RFQUpdate entity 26738C.

The PurchaseOrder entity 26798B is specialized into a PurchaseOrderUpdate entity 26750C, a PurchaseOrderCancellation entity 26752C, and a PurchaseOrderInformation entity 26754C, which are nondisjoint complete specializations 26756C of the PurchaseOrder entity 26798B. The PurchaseOrderUpdate entity 26750C is specialized into a PurchaseOrderRequest entity 26758C, a PurchaseOrderChange entity 26760C, and a PurchaseOrderConfirmation entity 26762C, which are nondisjoint complete specializations 26764C of the PurchaseOrderUpdate entity 26750C.

The Delivery entity 26708C is specialized into a PendingDelivery entity 26766C, an InboundDelivery entity 26768C, a ReceivedDelivery entity 26770C, a DeliveryInformation entity 26772C, and a DespatchedDeliveryNotification entity 26774C, which are nondisjoint complete specializations 26776C of the Delivery entity 26708C.

The AccountingCancellation entity 26724C is specialized into an InventoryChargeAccountingCancellation entity 26778C and an InvoiceAccountingCancellation entity 26780C, which are disjoint complete specializations 26782C of the AccountingCancellation entity 26724C.

The BTDCreditWorthinessInformation package 26718B includes a BTDCreditRating entity 26784C, a BTDCreditRiskClass entity 26786C, a BTDCreditAgencyReportScoring entity 26788C, and a BTDCreditLimit entity 26790C. There is a 1:1 relationship 26792C between the BusinessTransactionDocument entity 26762B and the BTDCreditRating entity 26784C. There is a 1:c relationship 26794C between the BusinessTransactionDocument entity 26762B and the BTDCreditRiskClass entity 26786C. There is a 1:cn relationship 26796C between the BusinessTransactionDocument entity 26762B and the BTDCreditAgencyReportScoring entity 26788C. There is a 1:cn relationship 26798C between the BusinessTransactionDocument entity 26762B and the BTDCreditLimit entity 26790C.

The BTDCreditAgencyReportQueryService package 26720B includes a CreditAgencyReportQueryService entity 26700D. There is a 1:1 relationship 26702D between the BusinessTransactionDocument entity 26762B and the CreditAgencyReportQueryService entity 26700D.

The BTDLegalInformation package 26722B includes a BTDLegalEvent entity 26704D. There is a 1:cn relationship 26706D between the BusinessTransactionDocument entity 26762B and the BTDLegalEvent entity 26704D.

The BTDScheduling package 26724B includes a BTDScheduling entity 26708D. There is a 1:c relationship 26710D between the BusinessTransactionDocument entity 26762B and the BTDScheduling entity 26708D.

The BTDTransportInformation package 26726B includes a BTDTransportMeans entity 26712D and a BTDTransportTracking entity 26714D. There is a 1:c relationship 26716D between the BusinessTransactionDocument entity 26762B and the BTDTransportMeans entity 26712D. There is a 1:c relationship 26718D between the BusinessTransactionDocument entity 26762B and the BTDTransportTracking entity 26714D.

The BTDHandlingUnit package 26728B includes a BTDHandlingUnit entity 26720D. There is a 1:cn relationship 26722D between the BusinessTransactionDocument entity 26762B and the BTDHandlingUnit entity 26720D.

The BTDLog package 26730B includes a BTDCreationLog entity 26724D. There is a 1:c relationship 26726D between the BusinessTransactionDocument entity 26762B and the BTDCreationLog entity 26724D. The BTDCreationLog entity 26724D includes a BTDCreationLogItem entity 26728D. There is a 1:n relationship 26730D between the BTDCreationLog entity 26724D and the BTDCreationLogItem entity 26728D.

The BTDFollowUpBusinessTransactionDocument package 26732B includes a BTDFollowUpPurchaseOrder entity 26732D and a BTDFollowUpPurchasingContract entity 26734D. There is a 1:c relationship 26736D between the BusinessTransactionDocument entity 26762B and the BTDFollowUpPurchaseOrder entity 26732D. There is a 1:c relationship 26738D between the BusinessTransactionDocument entity 26762B and the BTDFollowUpPurchasingContract entity 26734D.

The BTDFollowUpMessage package 26734B includes a BTDFollowUpPurchaseOrderConfirmation entity 26740D, a BTDFollowUpSalesOrderFulfillmentConfirmation entity 26742D, a BTDFollowUpServiceAcknowledgementRequest entity 26744D, a BTDFollowUpDespatchedDeliveryNotification entity 26746D, a BTDFollowUpInvoiceRequest entity 26748D, a BTDFollowUpBillingDueNotification entity 26750D, and a BTDFollowUpInvoiceDueNotification entity 26752D. There is a 1:c relationship 26754D between the BusinessTransactionDocument entity 26762B and the BTDFollowUpPurchaseOrderConfirmation entity 26740D. There is a 1:c relationship 26756D between the BusinessTransactionDocument entity 26762B and the BTDFollowUpSalesOrderFulfillmentConfirmation entity 26742D. There is a 1:c relationship 26758D between the BusinessTransactionDocument entity 26762B and the BTDFollowUpServiceAcknowledgementRequest entity 26744D. There is a 1:c relationship 26760D between the BusinessTransactionDocument entity 26762B and the BTDFollowUpDespatchedDeliveryNotification entity 26746D. There is a 1:c relationship 26761 D between the BusinessTransactionDocument entity 26762B and the BTDFollowUpInvoiceRequest entity 26748D. There is a 1:c relationship 26762D between the BusinessTransactionDocument entity 26762B and the BTDFollowUpBillingDueNotification entity 26750D. There is a 1:c relationship 26763D between the BusinessTransactionDocument entity 26762B and the BTDFollowUpInvoiceDueNofification entity 26752D.

The BTDLoanPaymentPlan package 26735B includes a BTDLoanPaymentPlan entity 26764D. There is a 1:c relationship 26765D between the BusinessTransactionDocument entity 26762B and the BTDLoanPaymentPlan entity 26764D. The BTDLoanPaymentPlan entity 26764D includes a BTDLoanPaymentPlanItem entity 26766D. There is a 1:n relationship between the BTDLoanPaymentPlan entity 26764D and the BTDLoanPaymentPlanItem entity 26766D.

The BTDItem package 26736B includes a BTDItem entity 26768D. There is a 1:cn relationship between the BusinessTransactionDocument entity 26762B and the BTDItem entity 26768D. BTDItems are arranged hierarchically using a Hierarchy Relationship 26772D. The Hierarchy Relationship 26772D is the relationship between a sub-item and a higher-level parent item in an item hierarchy. There is a 1:cn relationship 26774D between the BTDItem entity 26768D and its subordinate entities, and a 1:c relationship 26776D between the BTDItem entity 26768D and its superordinate entities.

The BTDItem entity 26768D is specialized into an InventoryChangeItem entity 26778D, a ProductActivityItem entity 26780D, an InvoiceAccountingItem entity 26782D, a ProductDemandInfluencingEventItem entity 26784D, a ProductForecastItem entity 26786D, a RequestForQuotationItem entity 26788D, an RFQResultItem entity 26790D, a QuoteItem entity 26792D, a PurchaseRequirementItem entity 26794D, a PurchaseRequirementConfirmationItem entity 26796D, a PurchaseOrderItem entity 26798D, a SalesOrderFulfillmentItem entity 26700E, a ServiceAcknowledgementItem entity 26702E, a DeliveryExecutionRequestItem entity 26704E, a DeliveryItem entity 26706E, a PaymentDueItem entity 26708E, an InvoiceDueItem entity 26710E, an InvoiceItem entity 26712E, a TaxDueItem entity 26714E, an InvoiceIssuedItem entity 26716E, which are disjoint complete specializations 26718E of the BTDItem entity 26768D.

The InvoiceAccountingItem entity 26782D is specialized into an InvoiceAccountingExpenseRevenueItem entity 26720E, an InvoiceAccountingDueItem entity 26722E, and an InvoiceAccountingTaxItem entity 26724E, which are disjoint complete specializations 26726E of the InvoiceAccountingItem entity 26782D.

The ProductForecastItem entity 26786D is specialized into a ProductForecastNotificationItem entity 26728E and a ProductForecastRevisionItem entity 26730E, which are disjoint complete specializations 26732E of the ProductForecastItem entity 26786D.

The PurchaseOrderItem entity 26798D is specialized into a PurchaseOrderInformationItem entity 26734E, which is a disjoint complete specialization 26736E of the ProductForecastItem entity 26798D.

The DeliveryItem entity 26706E is specialized into a DespatchedDeliveryItem entity 26738E, a ReceivedDeliveryItem entity 26740E, and a DeliveryInformationItem entity 26742E, which are disjoint complete specializations 26744E of the DeliveryItem entity 26706E.

The BTDItem package 26736B includes a BTDItemScheduleLine package 26746E. The BTDItemScheduleLine package 26746E includes a BTDItemScheduleLine entity 26762E. There is a 1:cn relationship 26764E between the BTDItem entity 26768D and the BTDItemScheduleLine entity 26762E.

The BTDItemScheduleLine entity 26762E includes a BTDItemScheduleLineDeliveryPeriod entity 26770E. There is a 1:c relationship 26772E between the BTDItemScheduleLine entity 26762E and the BTDItemScheduleLineDeliveryPeriod entity 26770E. The BTDItemScheduleLine entity 26762E is specialized into a BTDConfirmedScheduleLine entity 26766E, which is a disjoint incomplete specialization 26768E of the BTDItemScheduleLine entity 26762E.

The BTDItem package 26736B also includes a BTDIBatch package 26748E, a BTDIRelease package 26750E, a BTDIPromotion package 26752E, a BTDIInventory package 26754E, a PurchaseRequirementConfirmationItemExecutingPurchaseOrder package 26756E, an InventoryChangeItemInbound package 26758E, and an InventoryChangeItemOutbound package 26760E. The BTDIBatch package 26748E includes a BTDIBatch entity 26774E. There is a 1:c relationship 26776E between the BTDItem entity 26768D and the BTDIBatch entity 26774E. The BTDIRelease package 26750E includes a BTDIRelease entity 26778E and a BTDIPreviousRelease entity 26780E. There is a 1:c relationship 26782E between the BTDItem entity 26768D and the BTDIRelease entity 26778E. There is a 1:c relationship 26784E between the BTDItem entity 26768D and the BTDIPreviousRelease entity 26780E. The BTDIPromotion entity 26752E includes a BTDIPromotion entity 26786E. There is a 1:c relationship 26788E between the BTDItem entity 26768D and the BTDIPromotion entity 26786E. The BTDIInventory package 26754E includes a BTDIInventory entity 26790E and a BTDIConsignmentInventory entity 26792E. There is a 1:c relationship 26794E between the BTDItem entity 26768D and the BTDIInventory entity 26790E. There is a 1:c relationship 26796E between the BTDItem entity 26768D and the BTDIConsignmentInventory entity 26792E. The PurchaseRequirementConfirmationItemExecutingPurchaseOrder package 26756E includes a PurchaseRequirementConfirmationItemExecutingPurchaseOrder entity 26798E. There is a 1:cn relationship 26700F between the BTDItem entity 26768D and the PurchaseRequirementConfirmationItemExecutingPurchaseOrder entity 26798E. The InventoryChangeItemInbound package 26758E includes an InventoryChangeItemInbound entity 26702F. There is a 1:c relationship 26704F between the BTDItem entity 26768D and the InventoryChangeItemInbound entity 26702F. The InventoryChangeItemOutbound package 26760E includes an InventoryChangeItemOutbound entity 26706F. There is a 1:c relationship 26708F between the BTDItem entity 26768D and the InventoryChangeItemOutbound entity 26706F.

The BTDPriceInformation package 26738B includes a BTDProcurementCostUpperLimit entity 26710F, a BTDPrice entity 26712F and a BTDConfirmedPrice entity 26714F. There is a 1:c relationship 26716F between the BTDItem entity 26768D and the BTDProcurementCostUpperLimit entity 26710F. There is a 1:c relationship 26718F between the BTDItem entity 26768D and the BTDPrice entity 26712F. There is a 1:cn relationship 26720F between the BusinessTransactionDocument entity 26762B and the BTDPrice entity 26712F. There is a 1:c relationship 26722F between the BTDItem entity 26768D and the BTDConfirmedPrice entity 26714F. The BTDPrice entity 26712F includes a BTDPriceComponent entity 26724F and a BTDPriceScale entity 26726F. There is a 1:cn relationship 26728F between the BTDPrice entity 26712F and the BTDPriceComponent entity 26724F. There is a 1:c relationship 26730F between the BTDPrice entity 26712F and the BTDPriceScale entity 26726F. The BTDPriceScale entity 26726F includes a BTDPriceScaleLine entity 26732F. There is a 1:n relationship 26734F between the BTDPriceScale entity 26726F and the BTDPriceScaleLine entity 26732F.

The BTDPaymentInformation package 26740B includes a BTDCashDiscountTerms entity 26736F and a BTDPaymentForm entity 26738F. There is a 1:c relationship 26740F between the BTDItem entity 26768D and the BTDCashDiscountTerns entity 26736F. There is a 1:c relationship 26742F between the BTDCashDiscountTerms entity 26736F and the BTDItem entity 26768D. There is a 1:c relationship 26744F between the BusinessTransactionDocument entity 26762B and the BTDCashDiscountTerms entity 26736F. There is a 1:c relationship 26746F between the BTDItem entity 26768D and the BTDPaymentForm entity 26738F. There is a 1:c relationship 26748F between the BTDPaymentForm entity 26738F and the BTDItem entity 26768D. There is a 1:c relationship 26750F between the BusinessTransactionDocument entity 26762B and the BTDPaymentForm entity 26738F.

The BTDTax package 26742B includes a BTDProductTax entity 26764F. There is a 1:cn relationship 26766F between the BTDItem entity 26768D and the BTDProductTax entity 26764F. There is a 1:cn relationship 26768F between the BusinessTransactionDocument entity 26762B and the BTDProductTax entity 26764F.

The BTDDeliveryInformation package 26744B includes a BTDDeliveryTerms entity 26770F, a DeliveryItemVariance entity 26772F, and a BTDDeliveryControl entity 26774F. There is a 1:c relationship 26776F between the BTDItem entity 26768D and the BTDDeliveryTerms entity 26770F. There is a 1:c relationship 26778F between the BTDDeliveryTerms entity 26770F and the BTDItem entity 26768D. There is a 1:c relationship 26780F between the BusinessTransactionDocument entity 26762B and the BTDDeliveryTemms entity 26770F. There is a 1:cn relationship 26782F between the BTDItem entity 26768D and the DeliveryItemVariance entity 26772F. There is a 1:c relationship 26784F between the BTDItem entity 26768D and the BTDDeliveryControl entity 26774F. There is a 1:c relationship 26786F between the BTDDeliveryControl entity 26774F and the BTDItem entity 26768D. There is a 1:c relationship 26788F between the BusinessTransactionDocument entity 26762B and the BTDDeliveryControl entity 26774F.

The BTDDeliveryTerms entity 26770F includes a BTDDeliveryTermsIncoterrns entity 26790F, a BTDDeliveryTermsPartialDelivery entity 26792F, a BTDDeliveryTermsQuantityTolerance entity 26794F, a BTDDeliveryTermsTransport entity 26796F, and a BTDDeliveryTermsDescription entity 26798F. There is a 1:cn relationship 26700G between the Incoterms entity 26710 and the BTDDeliveryTermsIncoterms entity 26790F. There is a 1:c relationship 26702G between the BTDDeliveryTerms entity 26770F and the BTDDeliveryTermslncoterms entity 26790F. There is a 1:c relationship 26704G between the BTDDeliveryTerms entity 26770F and the BTDDeliveryTernsPartialDelivery entity 26792F. There is a 1:c relationship 26706G between the BTDDeliveryTerms entity 26770F and the BTDDeliveryTermsQuantityTolerance entity 26794F. There is a 1:c relationship 26708G between the BTDDeliveryTerms entity 26770F and the BTDDeliveryTermsTransport entity 26796F. There is a 1:c relationship 26710G between the BTDDeliveryTerms entity 26770F and the BTDDeliveryTermsDescription entity 26798F.

The BTDDeliveryExecutionInformation package 26746B includes a DeliveryExecutionPeriod entity 26712G and a DeliveryExecutionStatus entity 26714G. There is a 1:cn relationship 26716G between the BTDItem entity 26768D and the DeliveryExecutionPeriod entity 26712G. There is a 1:c relationship 26718G between the DeliveryExecutionPeriod entity 26712G and the BTDItem entity 26768D. There is a 1:cn relationship 26720G between the BusinessTransactionDocument entity 26762B and the DeliveryExecutionPeriod entity 26712G. There is a 1:cn relationship 26722G between the BTDItem entity 26768D and the DeliveryExecutionStatus entity 26714G. There is a 1:c relationship 26723G between the DeliveryExecutionStatus entity 26714G and the BTDItem entity 26768D. There is a 1:cn relationship 26724G between the BusinessTransactionDocument entity 26762B and the DeliveryExecutionStatus entity 26714G.

The BTDAccountingObjectSet package 26748B includes a BTDAccountingObjectSet entity 26726G. There is a 1:c relationship 26728G between the BTDItem entity 26768D and the BTDAccountingObjectSet entity 26726G.

The BTDBusinessDocumentObjectReference package 26750B includes a BTDRequestForQuotationReference entity 26730G, a BTDSchedulingAgreementReference entity 26732G, a BTDSellerProductCatalogueReference entity 26734G, a BTDBuyerProductCatalogueReference entity 26736G, a BTDPurchasingContractReference entity 26738G, a BTDSalesContractReference entity 26740G, a BTDOriginPurchaseOrderReference entity 26742G, a BTDQuoteReference entity 26744G, a BTDPurchaseOrderReference entity 26746G, a BTDSalesOrderReference entity 26748G, a BTDServiceAcknowledgementReference entity 26750G, a BTDPendingDeliveryReference entity 26752G, a BTDDeliveryReference entity 26754G, a BTDInboundDeliveryReference entity 26756G, a BTDDespatchedDeliveryNotificationReference entity 26758G, a BTDShipmentReference entity 26760G, a BTDOriginInvoiceReference entity 26762G, a BTDOriginVendorInvoiceReference entity 26764G, a BTDPrimaNotaReference entity 26766G, and a BTDOriginPrimaNotaReference entity 26768G. There is a 1:c relationship 26770G between the BusinessTransactionDocument entity 26762B and the BTDRequestForQuotationReference entity 26730G. There is a 1:cn association 26772G between the RFQ Specialization 26782B and the BTDRequestForQuotationReference entity 26730G. There is a 1:c relationship 26774G between the BTDItem entity 26768D and the BTDSchedulingAgreementReference entity 26732G, and a 1:c relationship 26776G between the BTDSchedulingAgreementReference entity 26732G and the BTDItem entity 26768D. There is a 1:c relationship 26778G between the BusinessTransactionDocument entity 26762B and the BTDSchedulingAgreementReference entity 26732G. There is a 1:cn association 26780G between the SchedulingAgreement entity 26792B and the BTDSchedulingAgreementReference entity 26732G. There is a 1:c relationship 26782G between the BTDItem entity 26768D and the BTDSellerProductCatalogueReference entity 26734G. There is a 1:cn association 26784G between the SellerProductCatalogue entity 26782 and the BTDSellerProductCatalogueReference entity 26734G. There is a 1:c relationship 26786G between the BTDItem entity 26768D and the BTDBuyerProductCatalogueReference entity 26736G. There is a 1:cn association 26788G between the BuyerProductCatalogue entity 26780 and the BTDBuyerProductCatalogueReference entity 26736G. There is a 1:cn relationship 26790G between the BTDItem entity 26768D and the BTDPurchasingContractReference entity 26738G, and a 1:c relationship 26792G between the BTDPurchasingContractReference entity 26738G and the BTDItem entity 26768D. There is a 1:c relationship 26794G between the BusinessTransactionDocument entity 26762B and the BTDPurchasingContractReference entity 26738G. There is a 1:cn association 26796G between the PurchaseContract entity 26790B and the BTDPurchasingContractReference entity 26738G. There is a 1:cn relationship 26798G between the BTDItem entity 26768D and the BTDSalesContractReference entity 26740G. There is a 1:cn association 26700H between the SalesContract entity 26788B and the BTDSalesContractReference entity 26740G. There is a 1:c relationship 26702H between the BTDItem entity 26768D and the BTDOriginPurchaseOrderReference entity 26742G. There is a 1:cn association 26704H between the PurchaseOrderRequest entity 26758C and the BTDOriginPurchaseOrderReference entity 26742G.

There is a 1:c relationship 26706H between the BTDItem entity 26768D and the BTDQuoteReference entity 26744G, and a 1:c relationship 26708H between the BTDQuoteReference entity 26744G and the BTDItem entity 26768D. There is a 1:c relationship 26710H between the BusinessTransaction- Document entity 26762B and the BTDQuoteReference entity 26744G. There is a 1:cn association 26712H between the Quote entity 26786B and the BTDQuoteReference entity 26744G. There is a 1:cn relationship 26714H between the BTDItem entity 26768D and the BTDPurchaseOrderReference entity 26746G. There is a 1:cn association 26716H between the PurchaseOrderRequest entity 26758C and the BTDPurchaseOrderReference entity 26746G. There is a 1:cn relationship 26718H between the BTDItem entity 26768D and the BTDSalesOrderReference entity 26748G. There is a 1:cn association 26720H between the SalesOrder entity 26700C and the BTDSalesOrderReference entity 26748G. There is a 1:c relationship 26722H between the BTDItem entity 26768D and the BTDServiceAcknowledgementReference entity 26750G. There is a 1:cn association 26724H between the ServiceAcknowledgement entity 26704C and the BTDServiceAcknowledgementReference entity 26750G. There is a 1:cn relationship 26726H between the BTDItem entity 26768D and the BTDPendingDeliveryReference entity 26752G. There is a 1:cn association 26728H between the PendingDelivery entity 26766C and the BTDPendingDeliveryReference entity 26752G. There is a 1:c relationship 26730H between the BTDItem entity 26768D and the BTDDeliveryReference entity 26754G. There is a 1:cn association 26732H between the Delivery Specialization 26708C and the BTDDeliveryReference entity 26754G. There is a 1:cn relationship 26734H between the BusinessTransactionDocument entity 26762B and the BTDInboundDeliveryReference entity 26756G. There is a 1:cn association 26736H between the InboundDelivery entity 26768C and the BTDInboundDeliveryReference entity 26756G.

There is a 1:c relationship 26738H between the BTDItem entity 26768D and the BTDDespatchedDeliveryNotificationReference entity 26758G, and a 1:c relationship 26740H between the BTDDespatchedDeliveryNotificationReference entity 26758G and the BTDItem entity 26768D. There is a 1:c relationship 26742H between the BusinessTransactionDocument entity 26762B and the BTDDespatchedDeliveryNotificationReference entity 26758G. There is a 1:cn association 26744H between the DespatchedDeliveryNotification entity 26774C and the BTDDespatchedDeliveryNotificationReference entity 26758G. There is a 1:c relationship 26746H between the BTDItem entity 26768D and the BTDShipmentReference entity 26760G, and a 1:c relationship 26748H between the BTDShipmentReference entity 26760G and the BTDItem entity 26768D. There is a 1:c relationship 26750H between the BusinessTransactionDocument entity 26762B and the BTDShipmentReference entity 26760G. There is a 1:cn association 26752H between the Shipment entity 26710C and the BTDShipmentReference entity 26760G. There is a 1:c relationship 26754H between the BTDItem entity 26768D and the BTDOriginInvoiceReference entity 26762G. There is a 1:cn association 26756H between the Invoice entity 26718C and the BTDOriginInvoiceReference entity 26762G. There is a 1:c relationship 26758H between the BusinessTransactionDocument entity 26762B and the BTDOriginVendorInvoiceReference entity 26764G. There is a 1:c association 26760H between the VendorInvoice entity 26726C and the BTDOriginVendorInvoiceReference entity 26764G. There is a 1:c relationship 26762H between the BusinessTransactionDocument entity 26762B and the BTDPrimaNotaReference entity 26766G. There is a 1:c relationship 26764H between the BusinessTransactionDocument entity 26762B and the BTDOriginPrimaNotaReference entity 26768G.

The BTDAttachment package 26752B includes a BTDAttachment entity 26766H, a BTDAttachmentWebAddress entity 26768H, and a BTDInternetAttachmentWebAddress entity 26770H. There is a 1:cn relationship 26772H between the BTDItem entity 26768D and the BTDAttachment entity 26766H, and a 1:c relationship 26774H between the BTDAttachment entity 26766H and the BTDItem entity 26768D. There is a 1:cn relationship 26776H between the BusinessTransactionDocument entity 26762B and the BTDAttachment entity 26766H. There is a 1:cn association 26778H between the Attachment entity 26758 and the BTDAttachment entity 26766H. There is a 1:cn relationship 26780H between the BTDItem entity 26768D and the BTDAttachmentWebAddress entity 26768H. There is a 1:cn relationship 26782H between the BusinessTransactionDocument entity 26762B and the BTDAttachmentWebAddress entity 26768H. There is a 1:cn relationship 26784H between the BTDItem entity 26768D and the BTDInternetAttachmentWebAddress entity 26770H. There is a 1:cn relationship 26786H between the BusinessTransactionDocument entity 26762B and the BTDInternetAttachmentWebAddress entity 26770H.

The BTDDescription package 26754B includes a BTDDescription entity 26788H, a BTDInternalWebAddress entity 26790H, and a BTDConfirmationDescription entity 26792H. There is a 1:cn relationship 26794H between the BTDItem entity 26768D and the BTDDescription entity 26788H. There is a 1:c relationship 26796H between the BTDDescription entity 26788H and the BTDItem entity 26768D. There is a 1:cn relationship 26798H between the BusinessTransactionDocument entity 26762B and the BTDDescription entity 26788H. There is a 1:c relationship 26700I between the BTDItem entity 26768D and the BTDInternalWebAddress entity 26790H. There is a 1:c relationship 26702I between the BTDInternalWebAddress entity 26790H and the BTDItem entity 26768D. There is a 1:c relationship 26704I between the BusinessTransactionDocument entity 26762B and the BTDInternalWebAddress entity 26790H. There is a 1:c relationship 26706I between the BTDItem entity 26768D and the BTDConfirmationDescription entity 26792H. There is a 1:c relationship 26708I between the BTDConfirmationDescription entity 26792H and the BTDItem entity 26768D. There is a 1:c relationship 26710I between the BusinessTransactionDocument entity 26762B and the BTDConfirmationDescription entity 26792H.

Figure 267F:
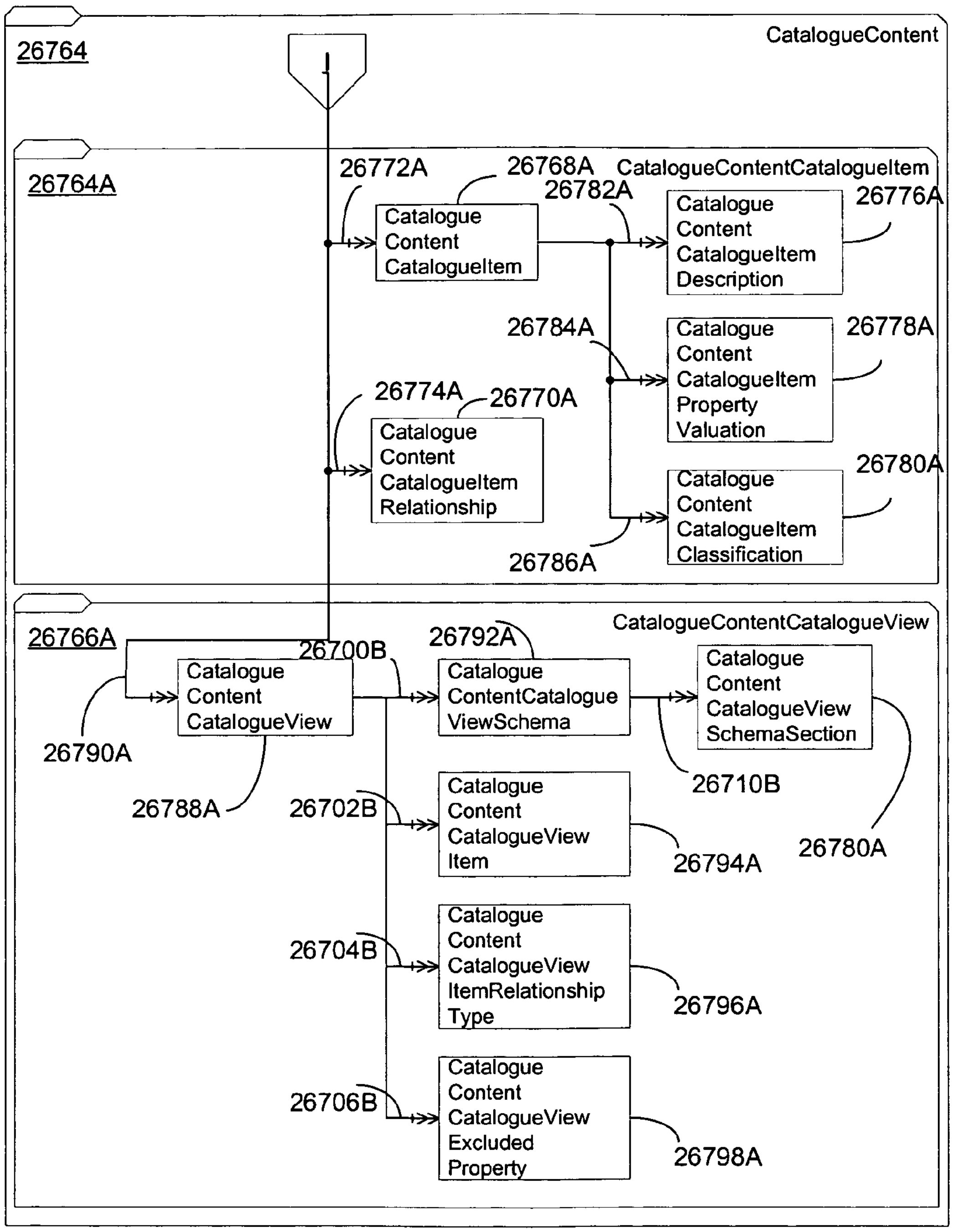
Figure 267G:
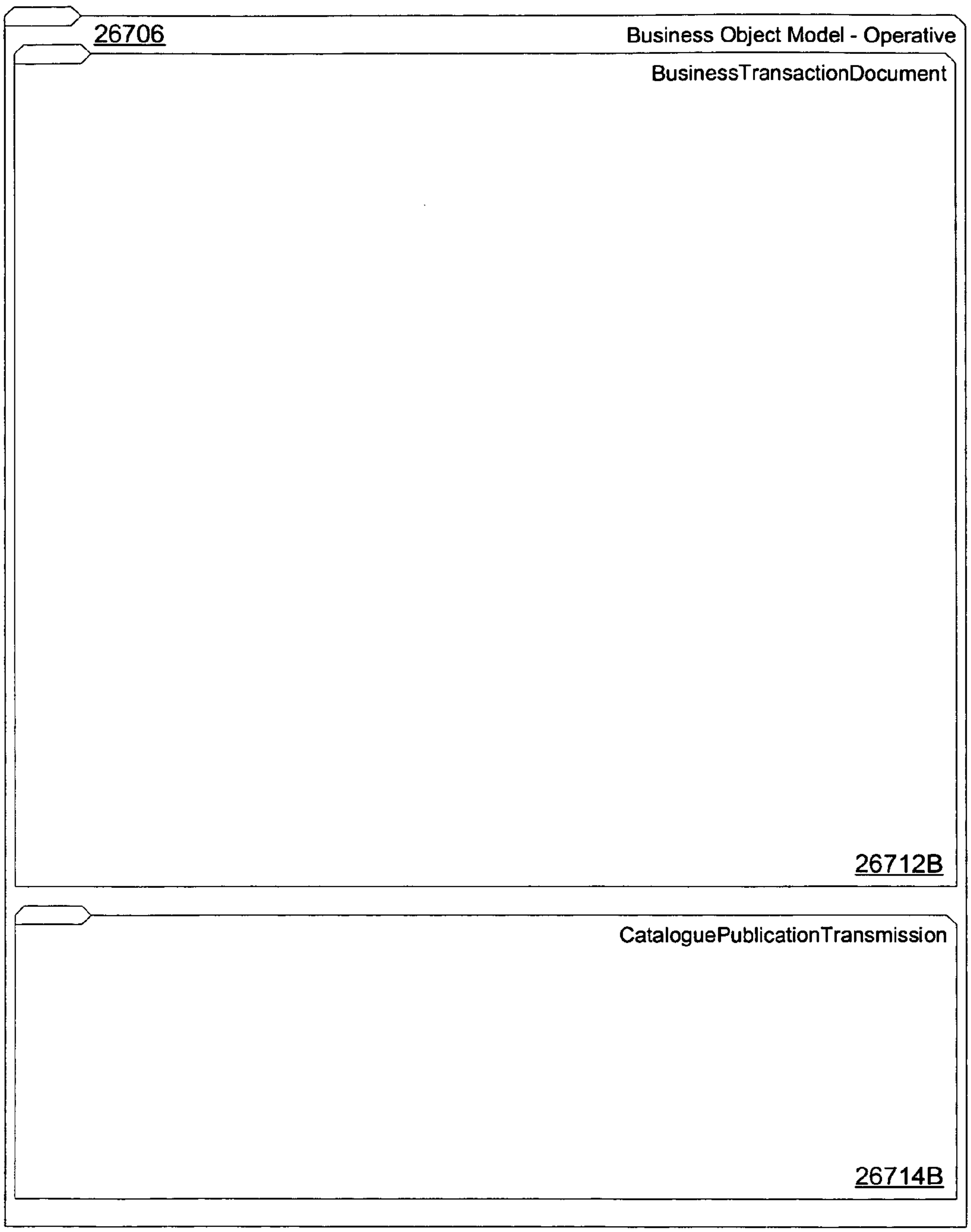
Figure 267H:

The BTDParty package 26756B includes a BTDParty entity 26712I. The details regarding the relationships 26713I to the BTDParty entity 26712I are depicted in FIG. 267FF. There is a 1:1 relationship 26714I between the InventoryChangeItemInbound entity 26702F and the BTDParty entity 26712I, and a 1:c relationship 26716I between the BTDParty entity 26712I and the InventoryChangeItemInbound entity 26702F. There is a 1:1 relationship 26718I between the InventoryChangeItemOutbound entity 26706F and the BTDParty entity 26712I, and a 1:c relationship 26720I between the BTDParty entity 26712I and the InventoryChangeItemOutbound entity 26706F. There is a 1:cn relationship 26722I between the BTDItem entity 26768D and the BTDParty entity 26712I, and a 1:c relationship 26724I between the BTDParty entity 26712I and the BTDItem entity 26768D. There is a 1:cn relationship 26726I between the BusinessTransactionDocument entity 26762B and the BTDParty entity 26712I.

The BTDParty entity 26712I includes a BTDPartyContactPerson entity 26728I and a BTDPartyAddress entity 26730I. There is a 1:c relationship 26732I between the BTDParty entity 26712I and the BTDPartyContactPerson entity 26728I. There is a 1:c relationship 26734I between the BTDParty entity 26712I and the BTDPartyAddress entity 26730I. There is a 1:cn relationship 26736I between the BusinessTransactionDocument entity 26762B and the BTDPartyAddress entity 26730I.

The BTDParty entity 26712I is specialized into a BTDBuyerParty entity 26744I, a BTDCreditorParty entity 26746I, a BTDSellerParty entity 26748I, a BTDDebtorParty entity 26750I, a BTDProductRecipientParty entity 26752I, a BTDVendorParty entity 26754I, a BTDManufacturerParty entity 26756I, a BTDPayerParty entity 26758I, a BTDPayeeParty entity 26760I, a BTDBillToParty entity 26762I, a BTDBillFromParty entity 26764I, a BTDCarrierParty entity 26766I, a BTDRequestorParty entity 26767I, a BRDPortalProviderParty entity 26768I, a BTDCatalogueProvider entity 26769I, a BTDBidderParty entity 26770I, a BTDOwnerParty entity 26771I, a BTDTaxPayerParty entity 26772I, a BTDTaxAuthorityParty 26773I, a BTDTaxOperatorParty 26774I, a BTDContractReleaseAuthorisedParty 26775I, a BTDProposedSellerParty 26776I, and a BTDBidderPortalProviderParty 26777I, which are nondisjoint complete specializations 26778I of the BTDParty entity 26712I.

Figure 267I:
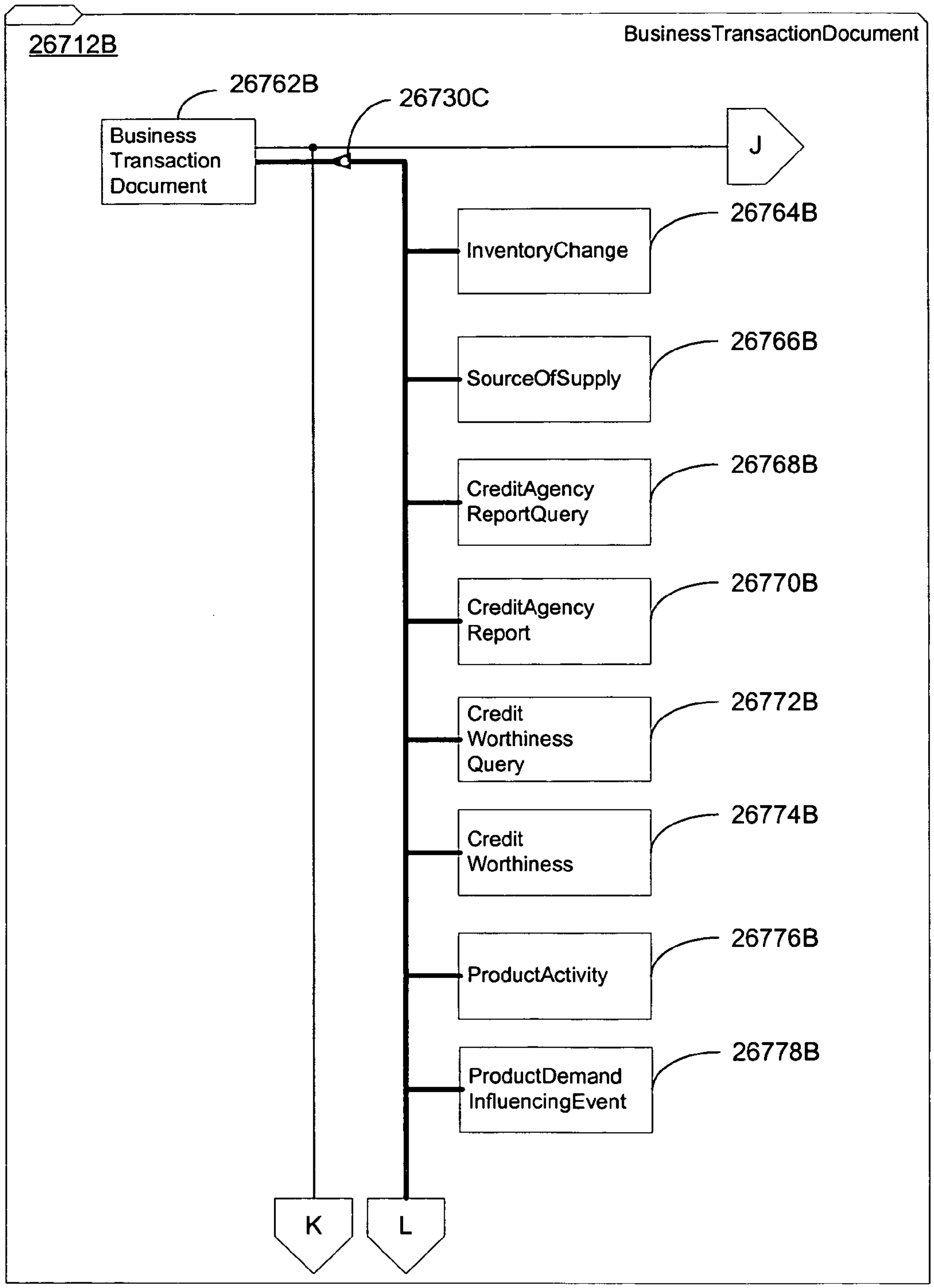

The BTDLocation package 26758B includes a BTDLocation entity 26780I. The details regarding the relationships 26781I to the BTDLocation entity 26780I are depicted in FIG. 267II. There is a 1:cn relationship 26782I between the InventoryChangeItemInbound entity 26702F and the BTDLocation entity 26780I, and a 1:c relationship 26784I between the BTDLocation entity 26780I and the InventoryChangeItemInbound entity 26702F. There is a 1:cn relationship 26786I between the InventoryChangeItemOutbound entity 26706F and the BTDLocation entity 26780I, and a 1:c relationship 26788I between the BTDLocation entity 26780I and the InventoryChangeItemOutbound entity 26706F. There is a 1:cn relationship 26790I between the BTDItem entity 26768D and the BTDLocation entity 26780I, and a 1:c relationship 26792I between the BTDLocation entity 26780I and the BTDItem entity 26768D. There is a 1:cn relationship 26794I between the BusinessTransactionDocument entity 26762B and the BTDLocation entity 26780I.

The BTDLocation entity 26780I includes a BTDLocationAddress entity 26796I. There is a 1:cn relationship 26798I between the Address entity 26737 and the BTDLocationAddress entity 26796I. There is a 1:c relationship 26700J between the BTDLocation entity 26780I and the BTDLocationAddress entity 26796I. The BTDLocation entity 26780I is specialized into a BTDShipToLocation entity 26702J and a BTDShipFromLocation entity 26704J, which are nondisjoint incomplete specializations 26706J of the BTDLocation entity 26780I.

Figure 267J:
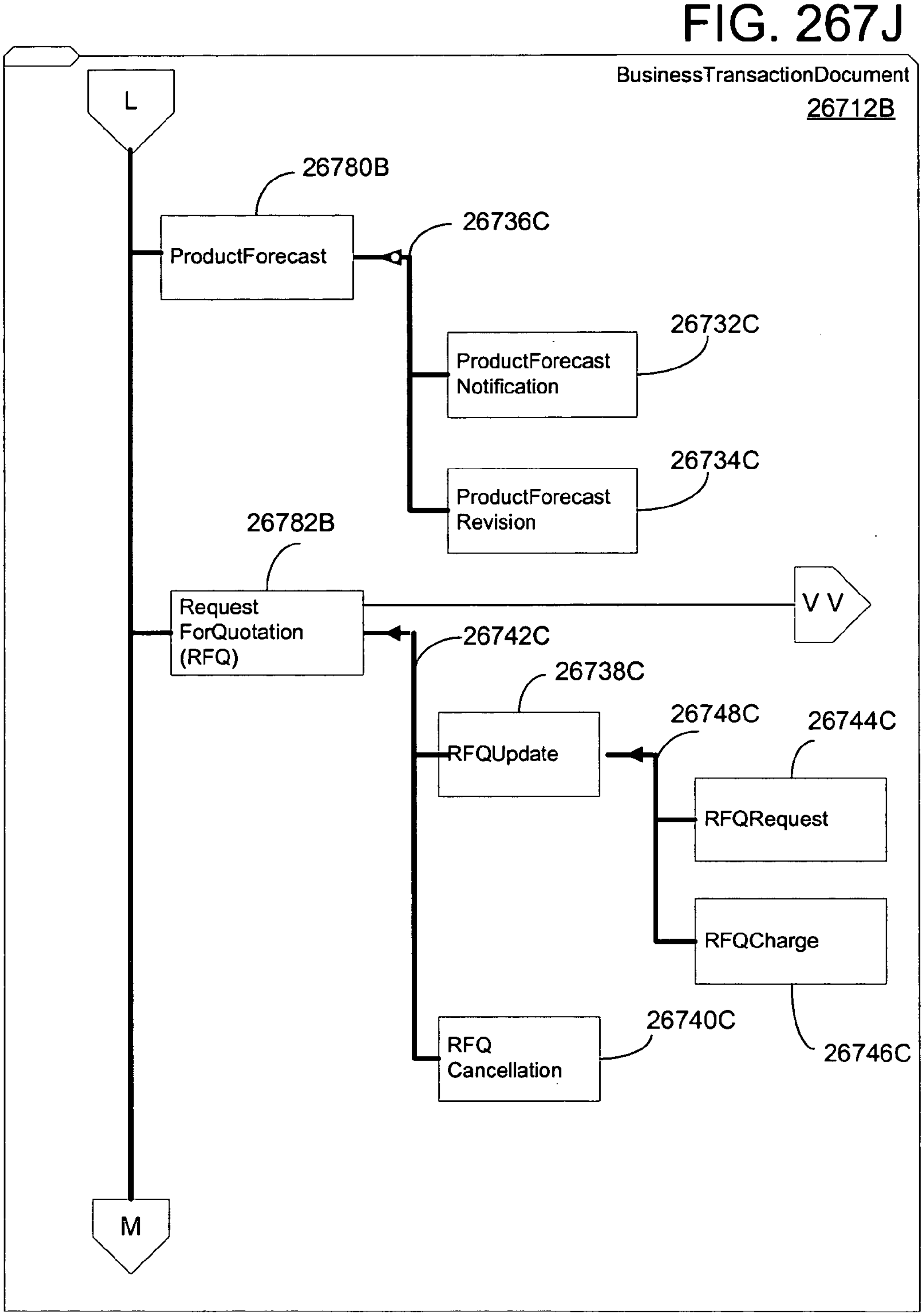
Figure 267K:
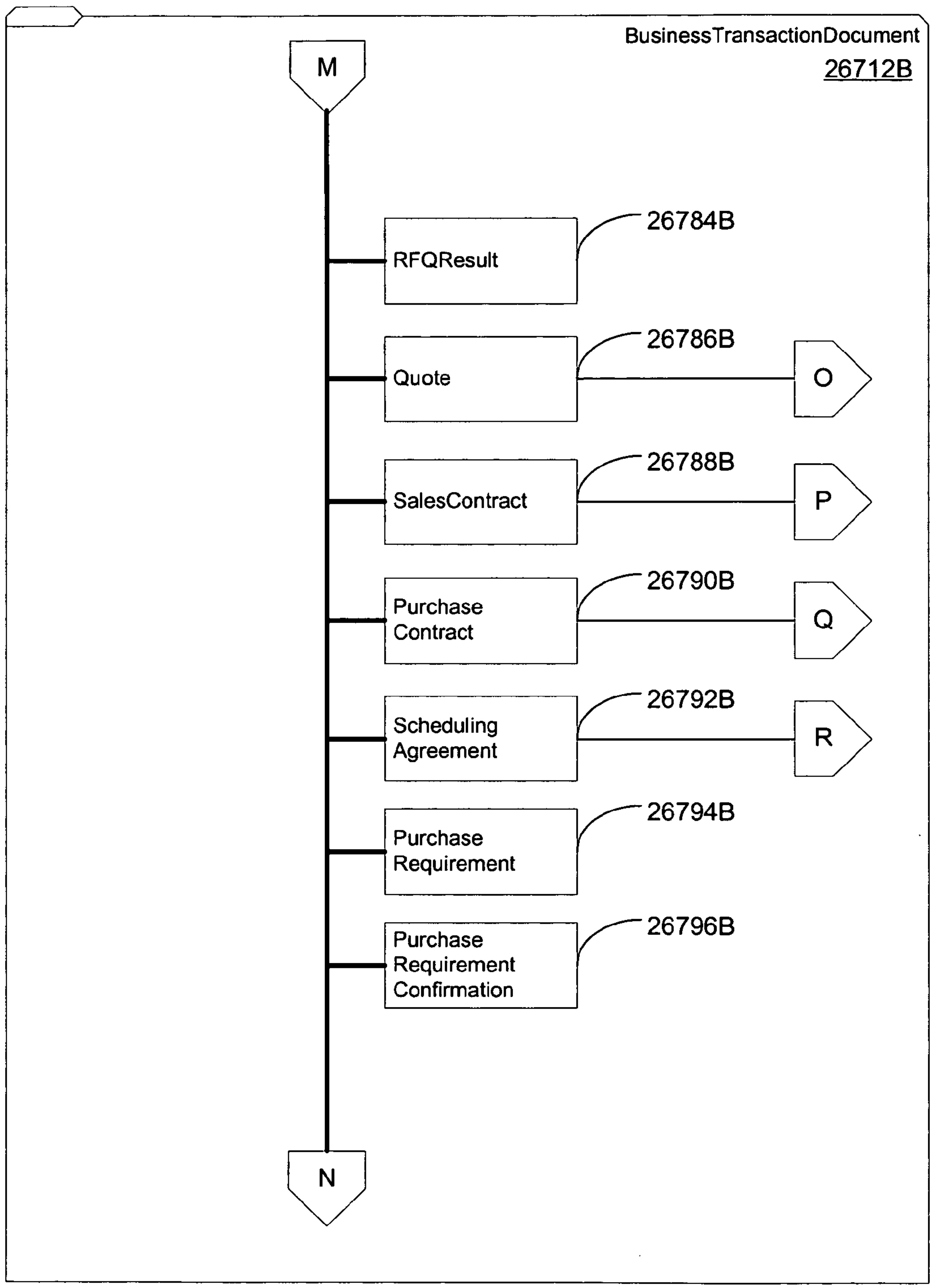
Figure 267L:
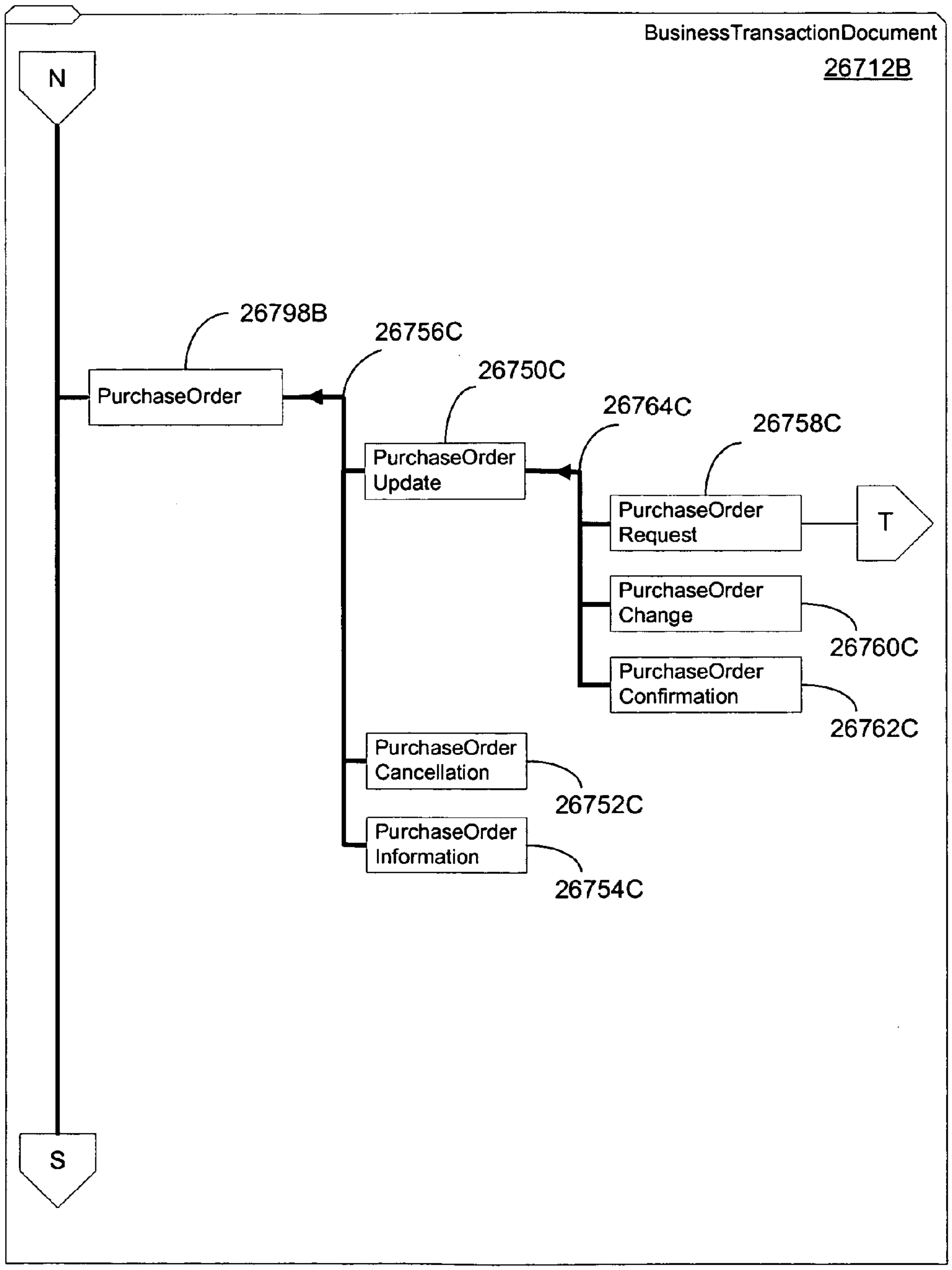
Figure 267M:
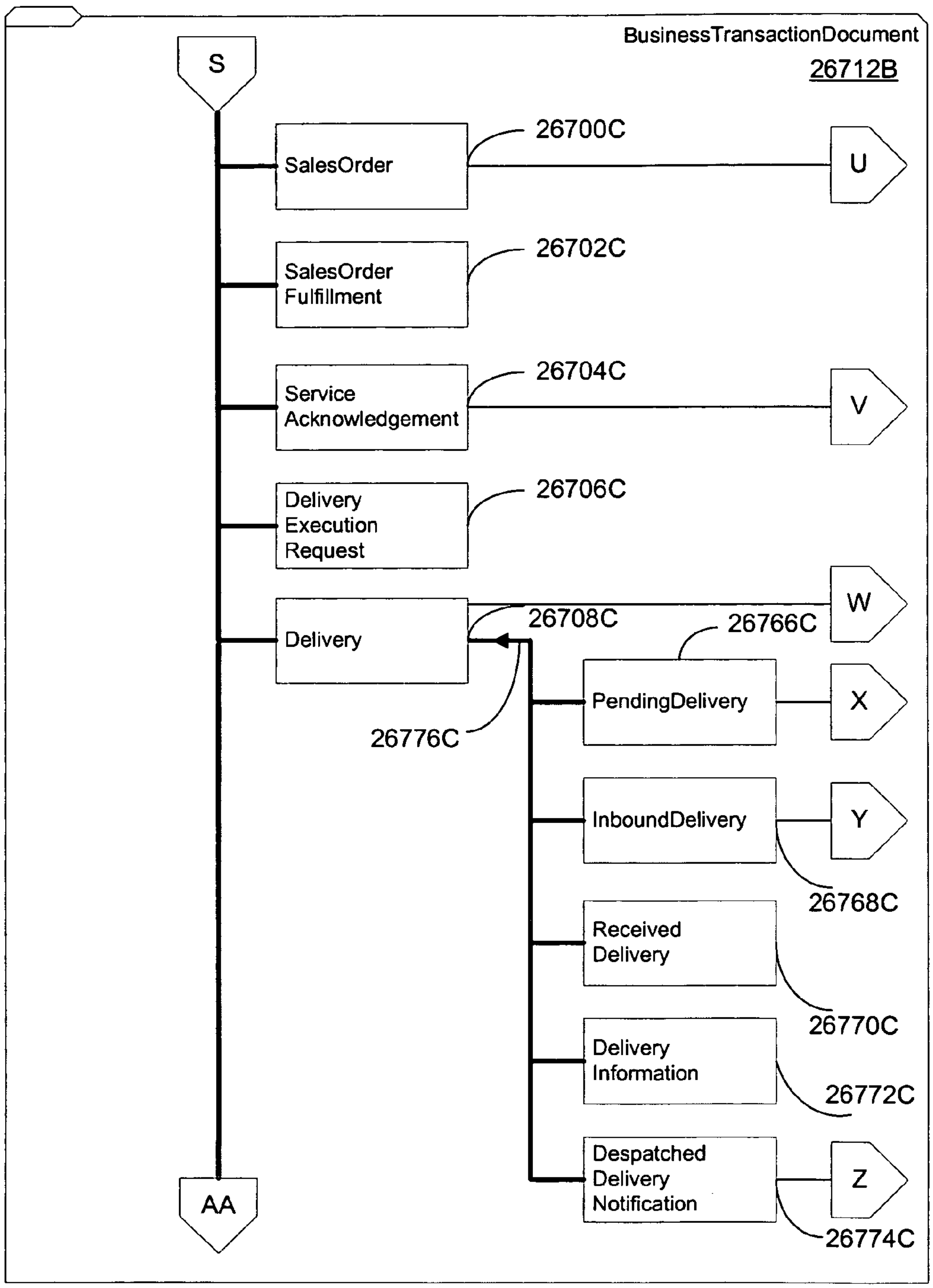
Figure 267N:
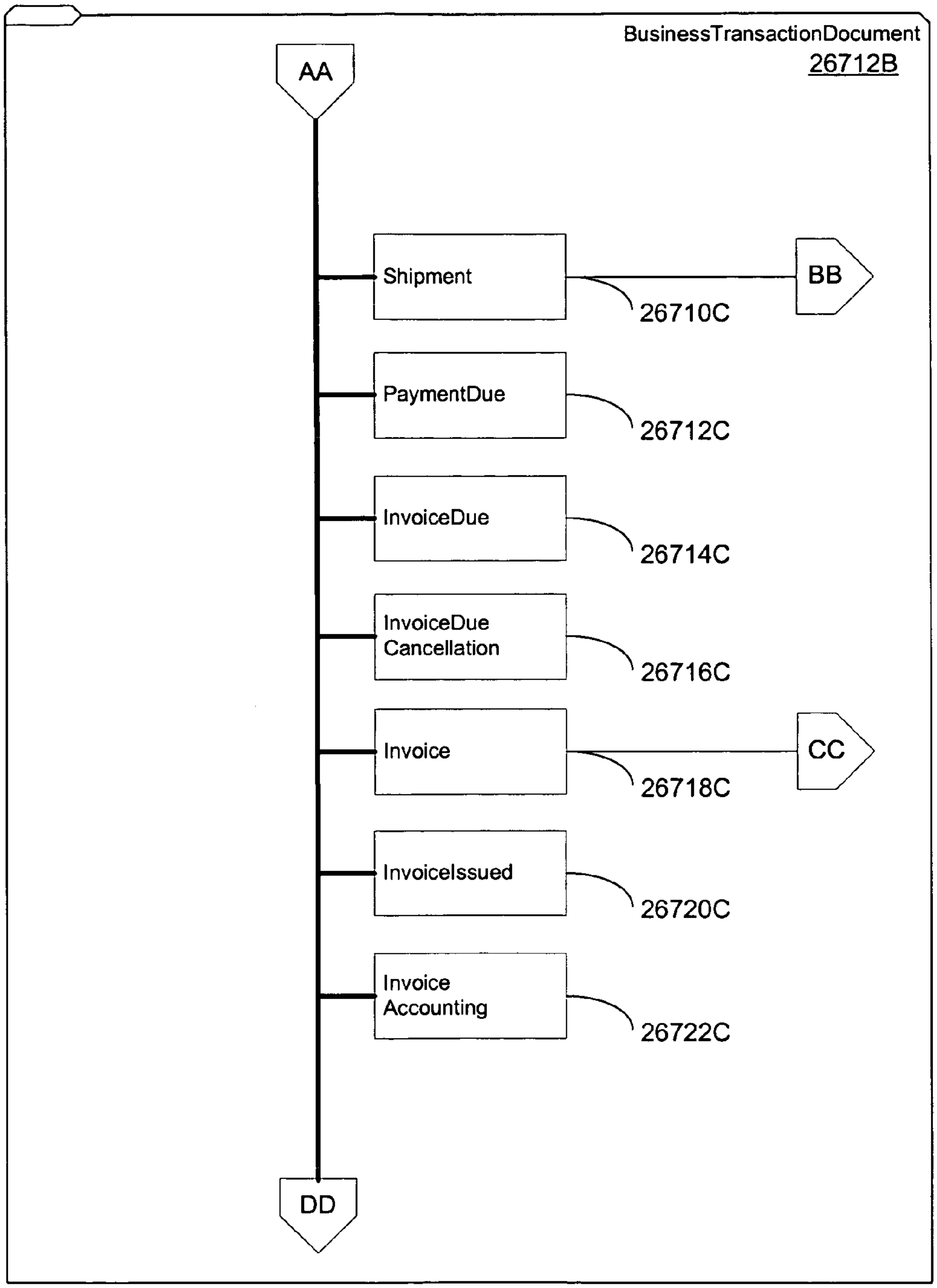
Figure 267O:
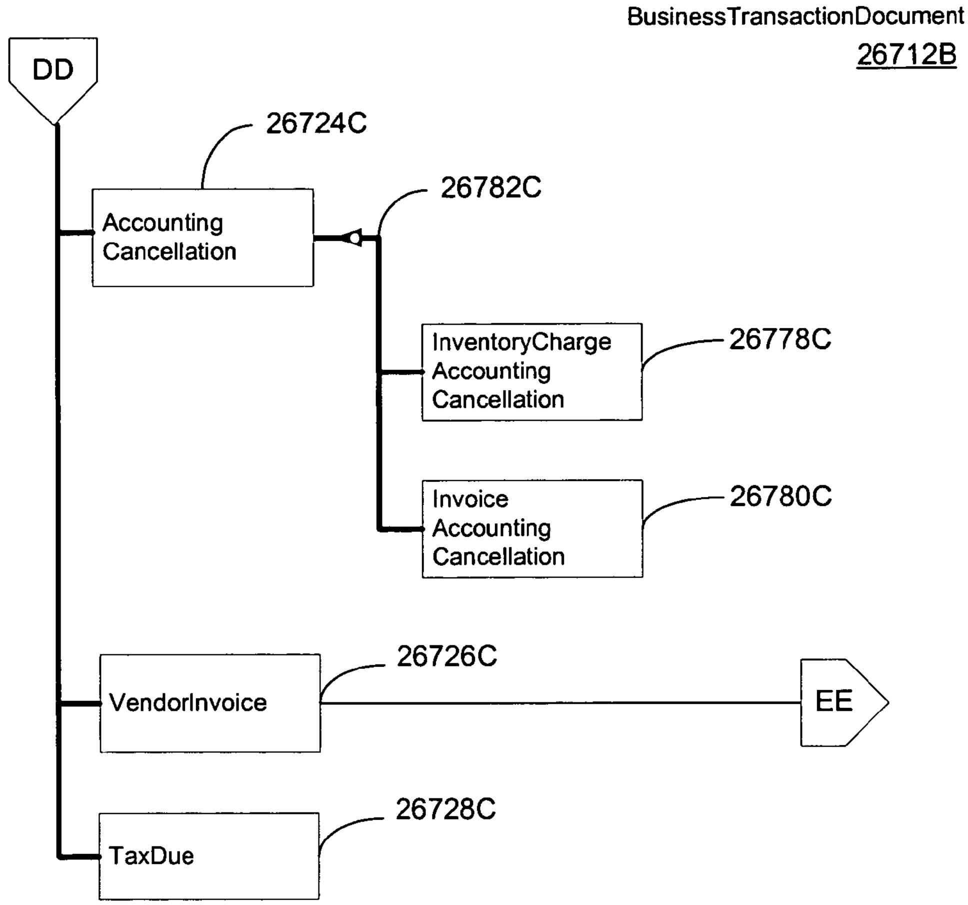
Figure 267P:
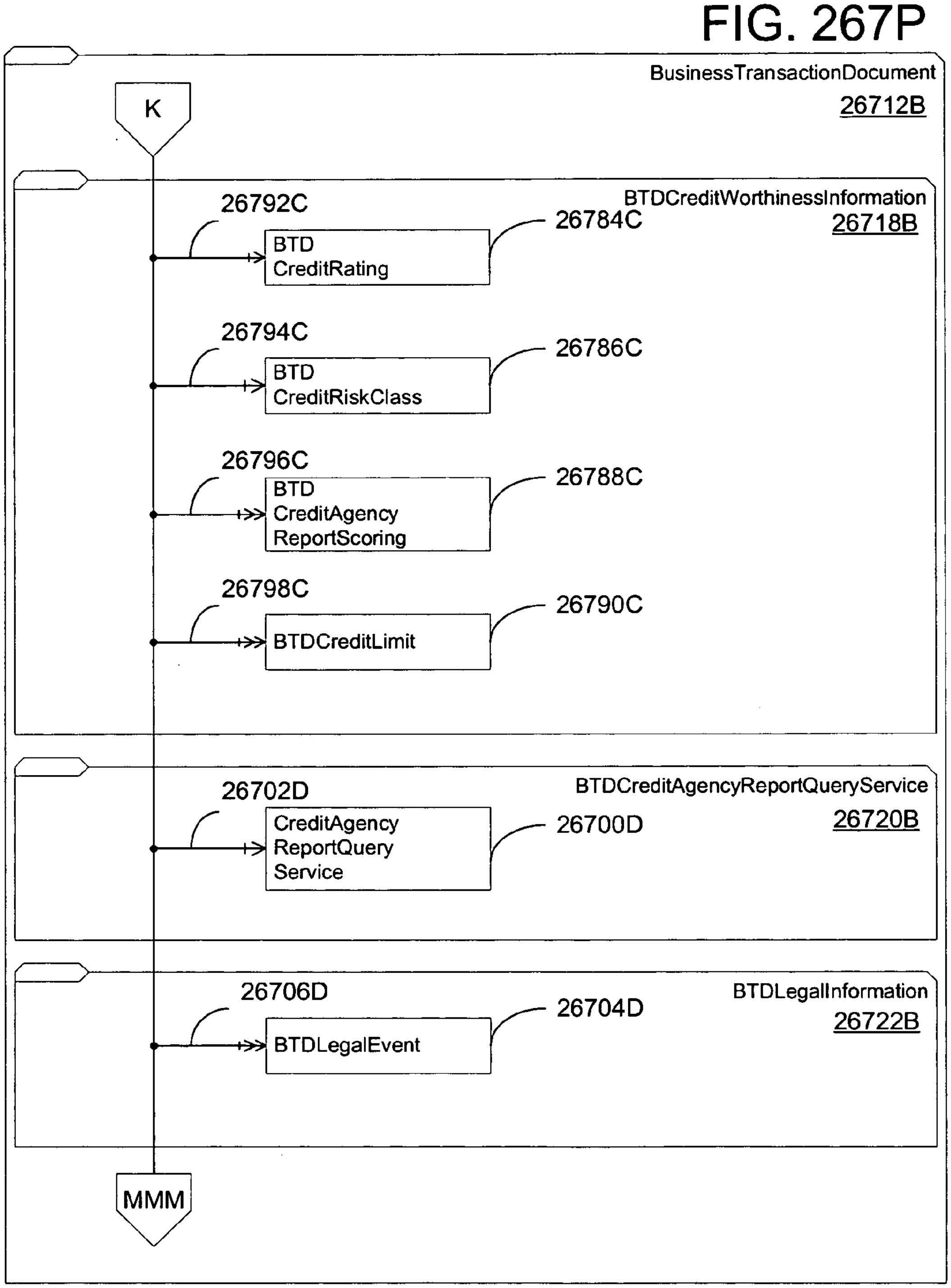
Figure 267Q:
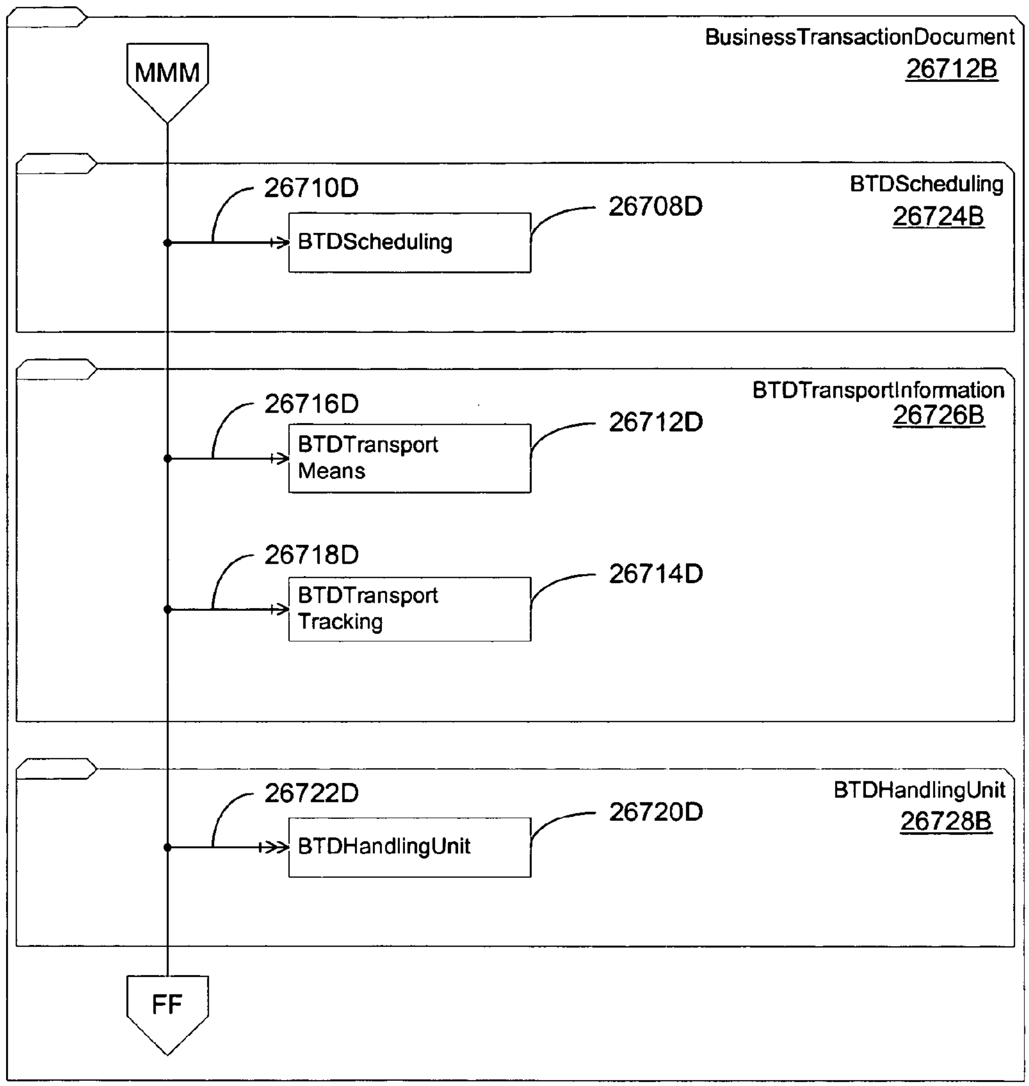
Figure 267R:
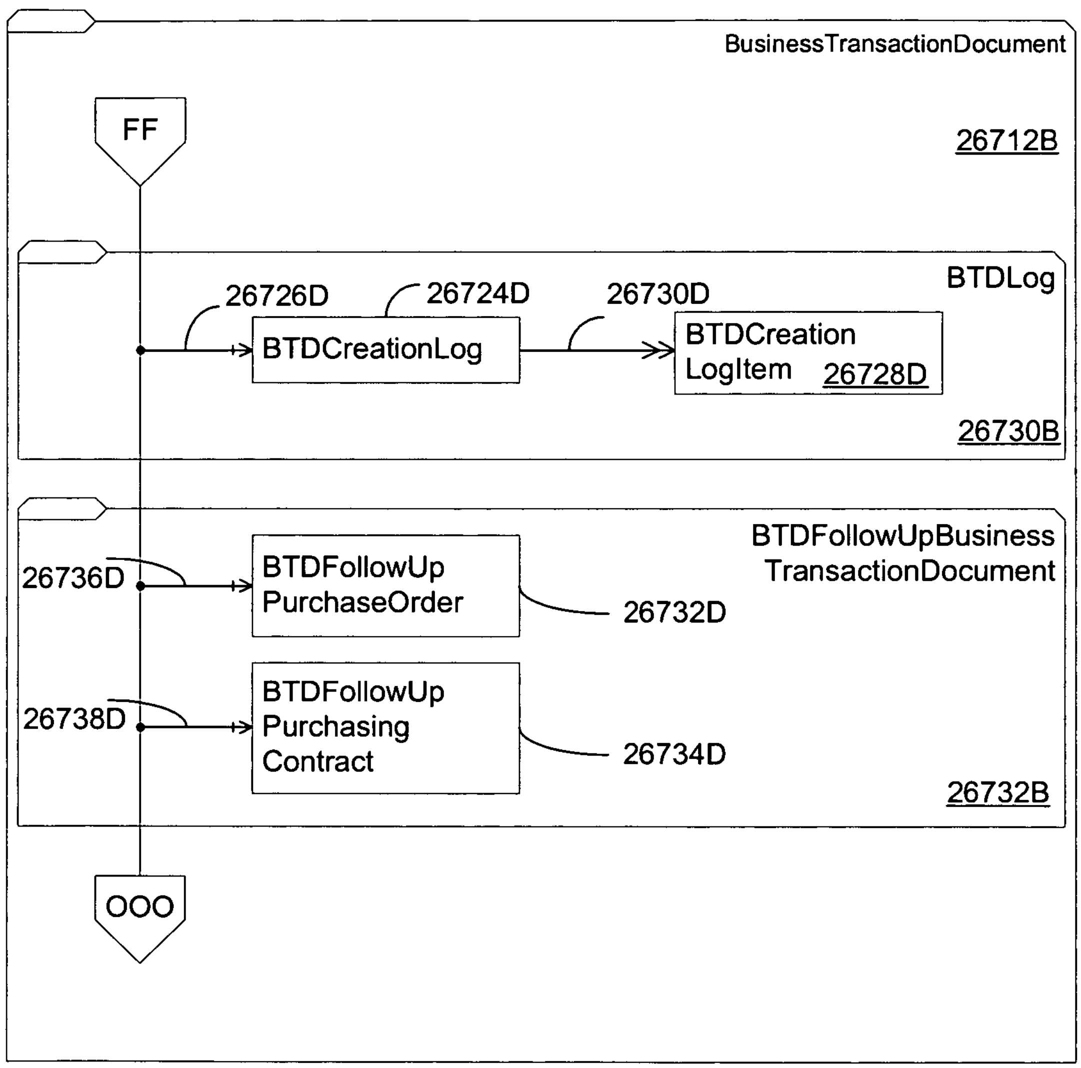
Figure 267S:
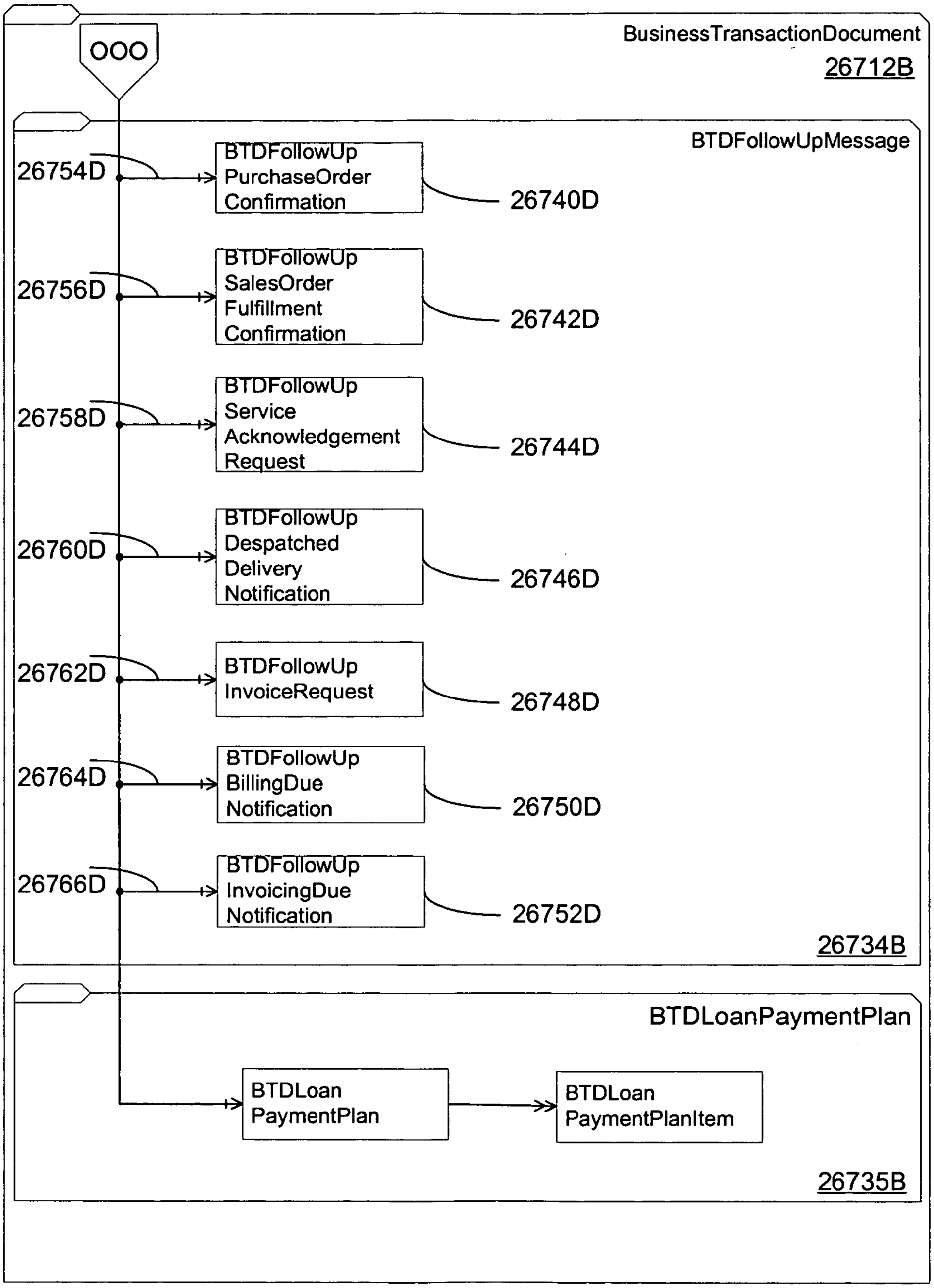
Figure 267T:
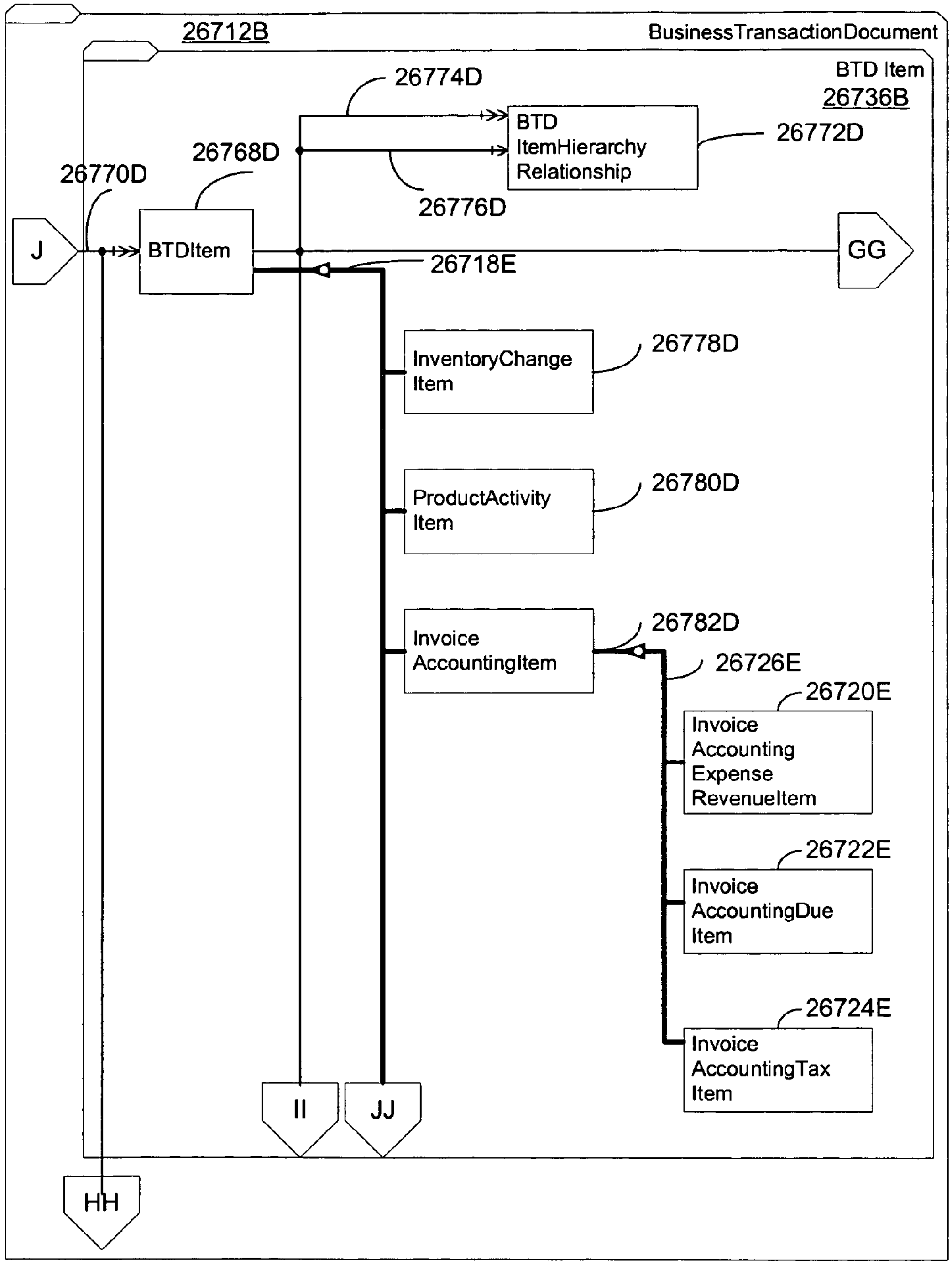
Figure 267U:
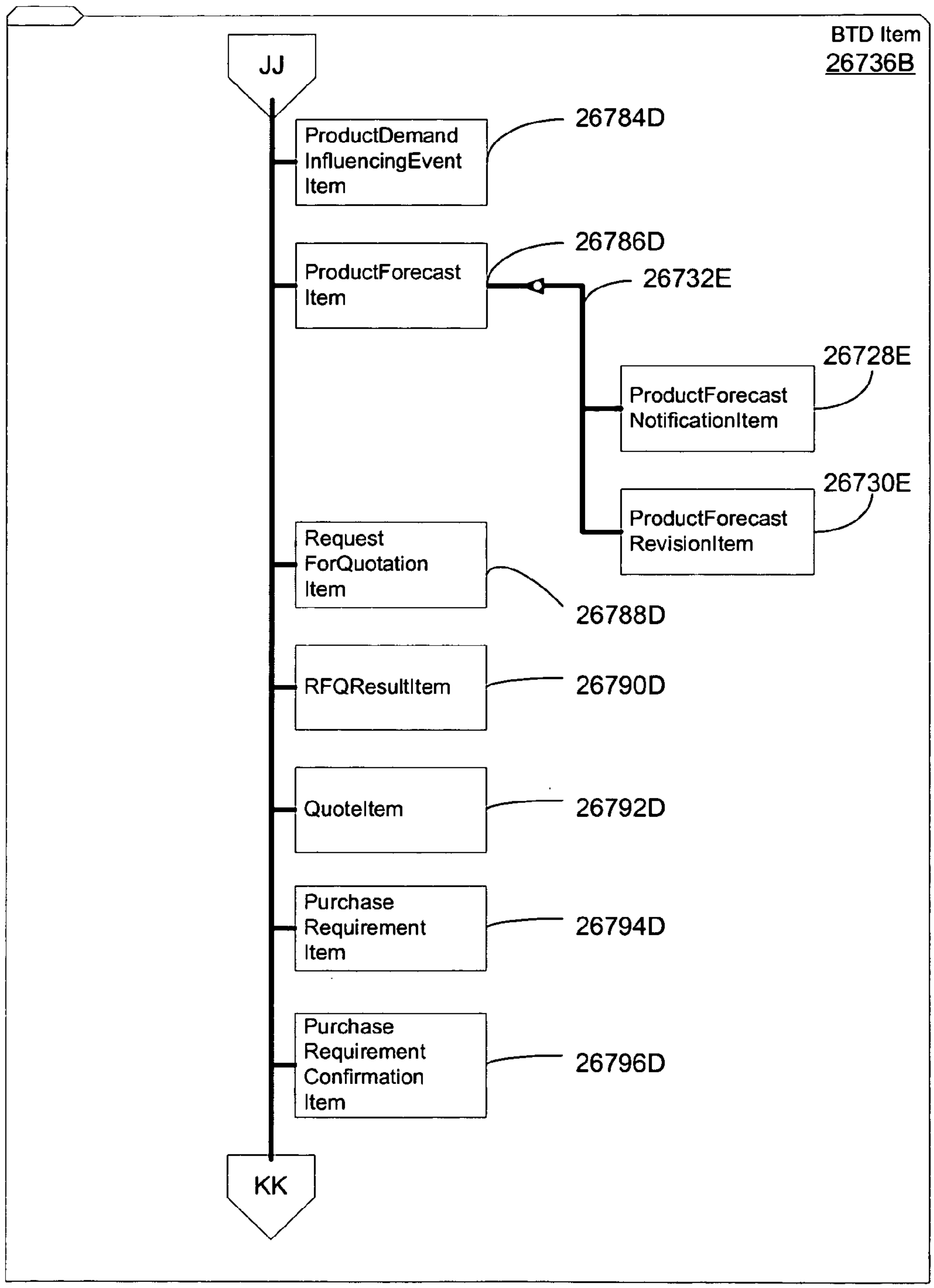
Figure 267V:
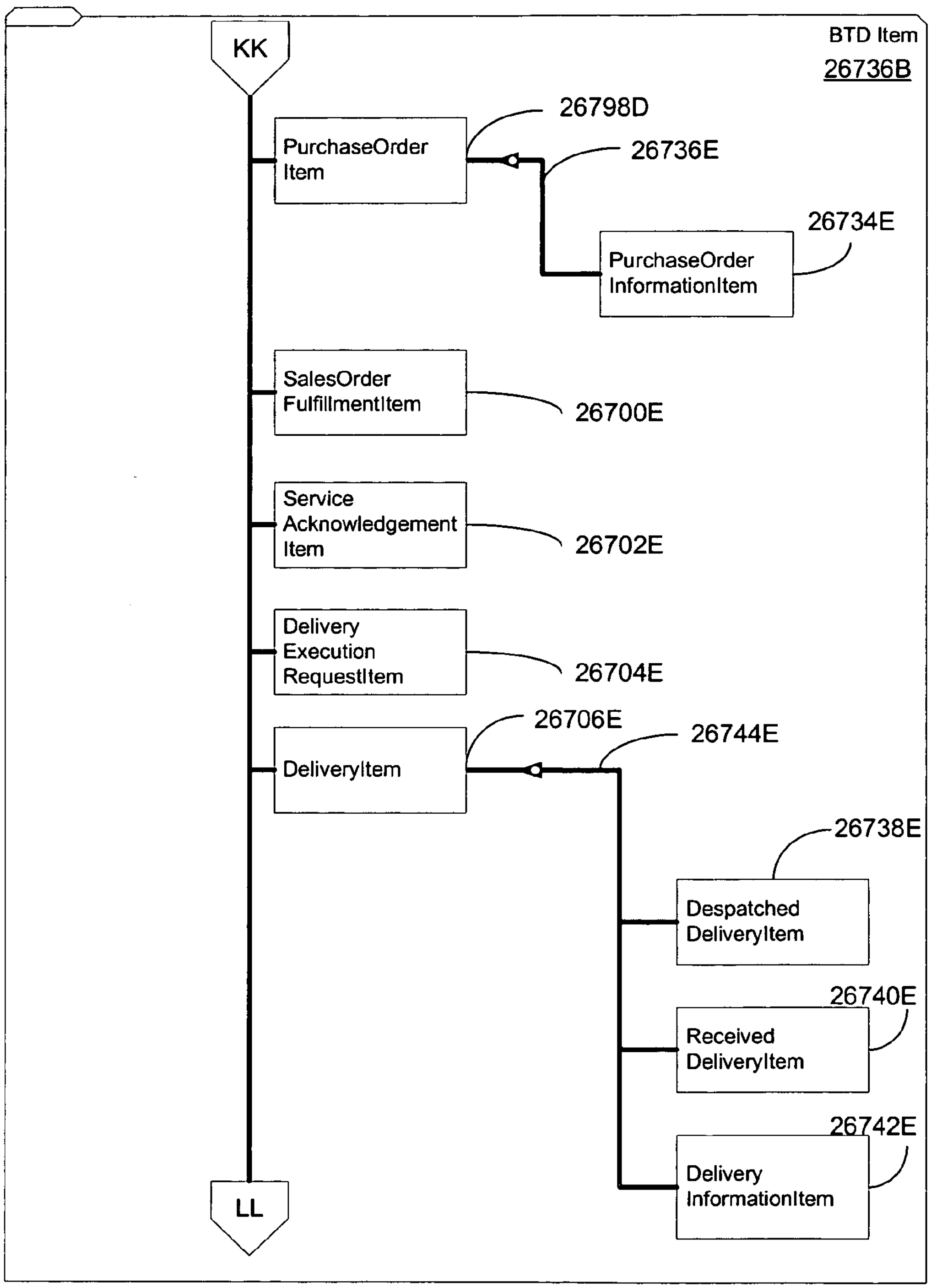
Figure 267W:
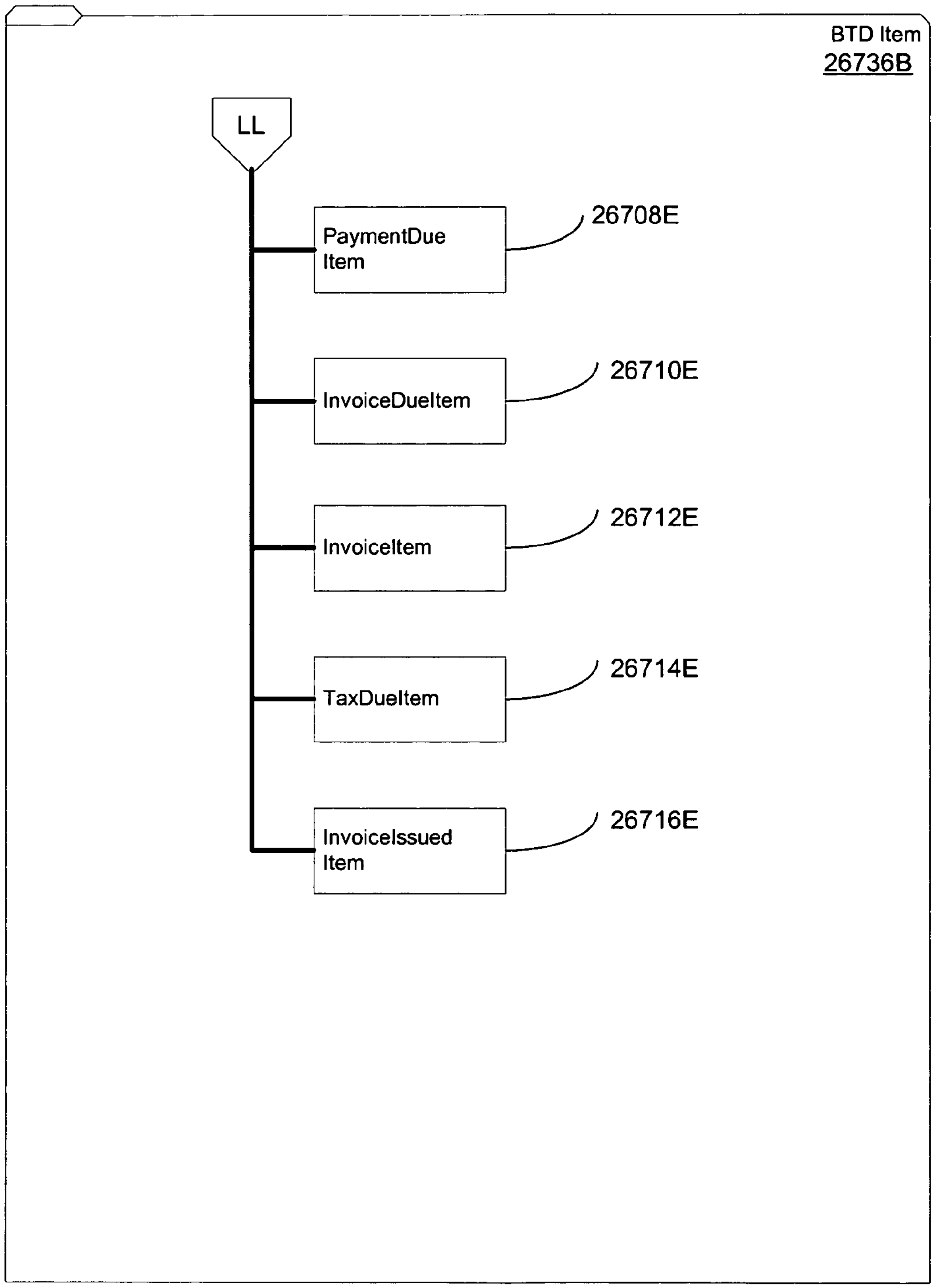
Figure 267X:
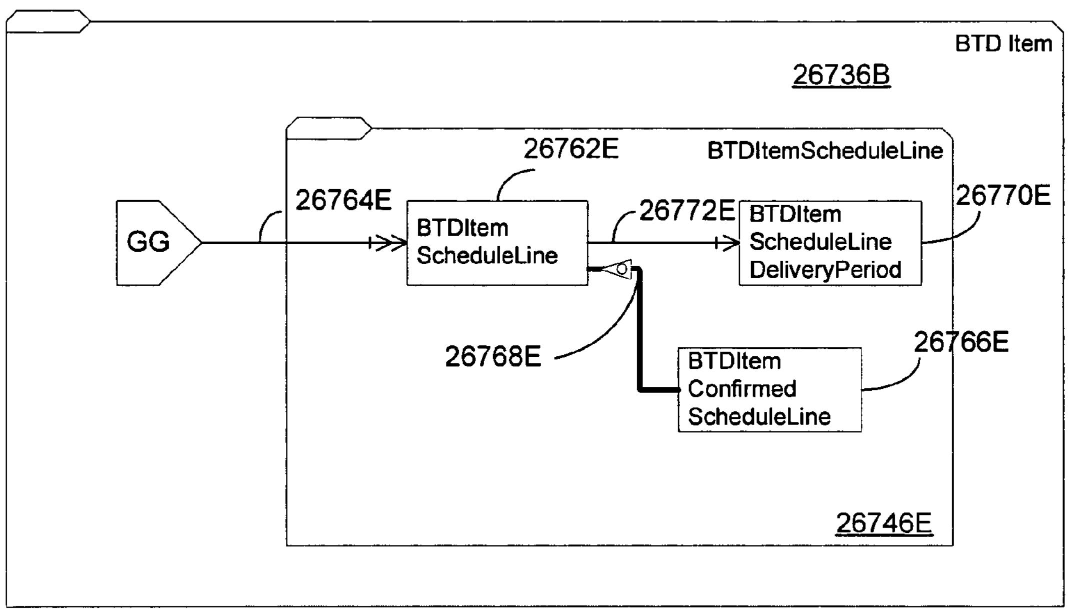
Figure 267Y:
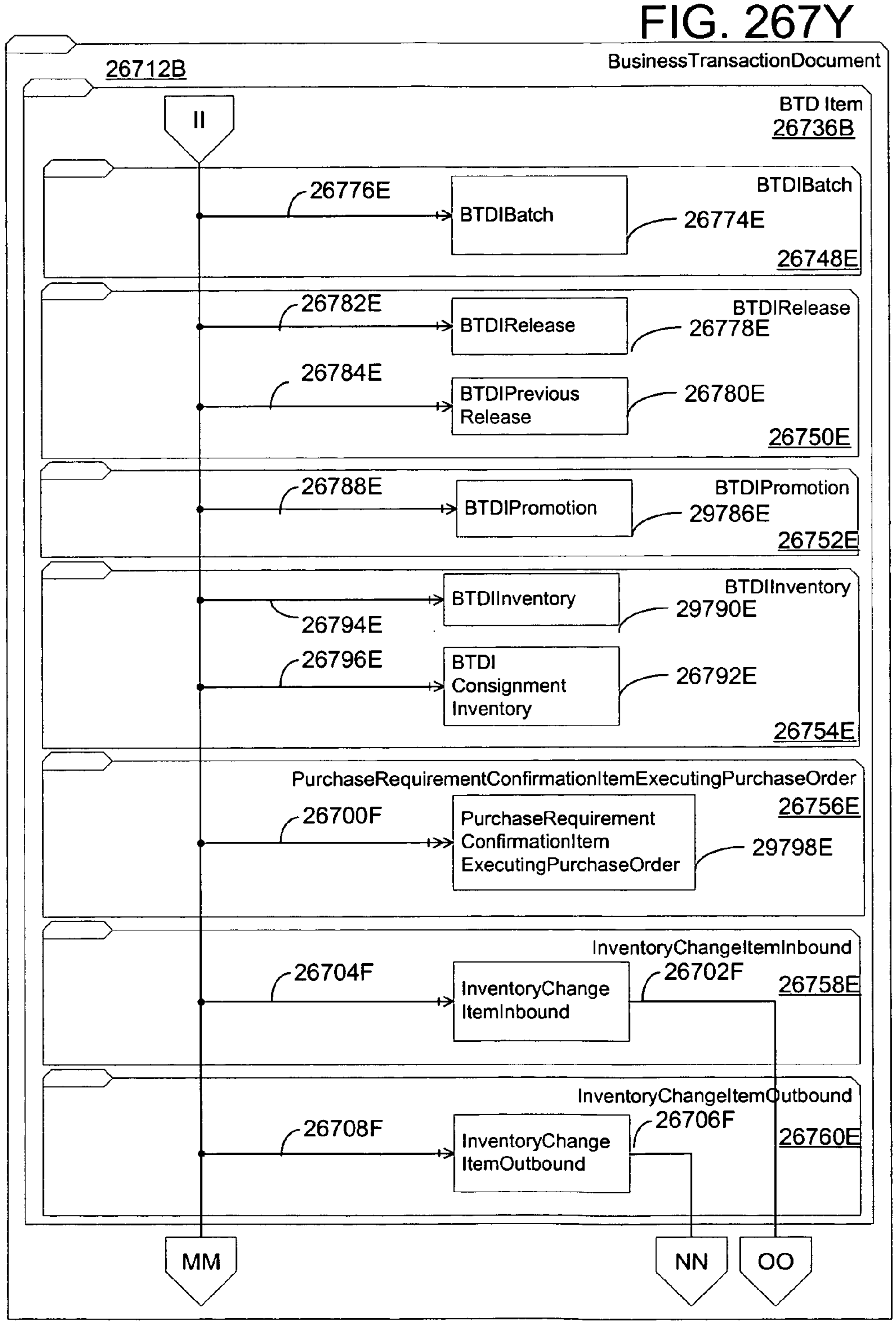
Figure 267Z:
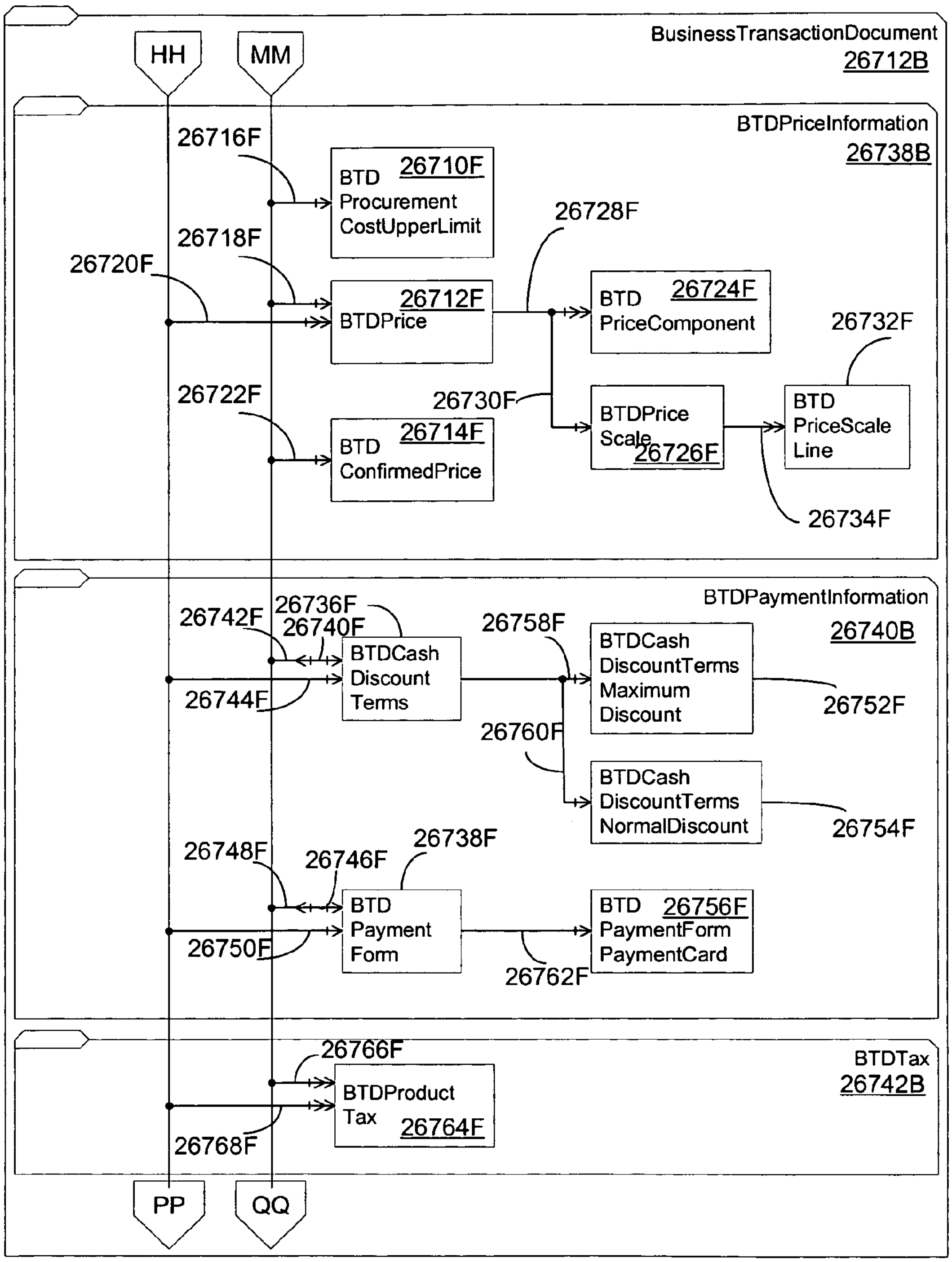
Figure 267A:
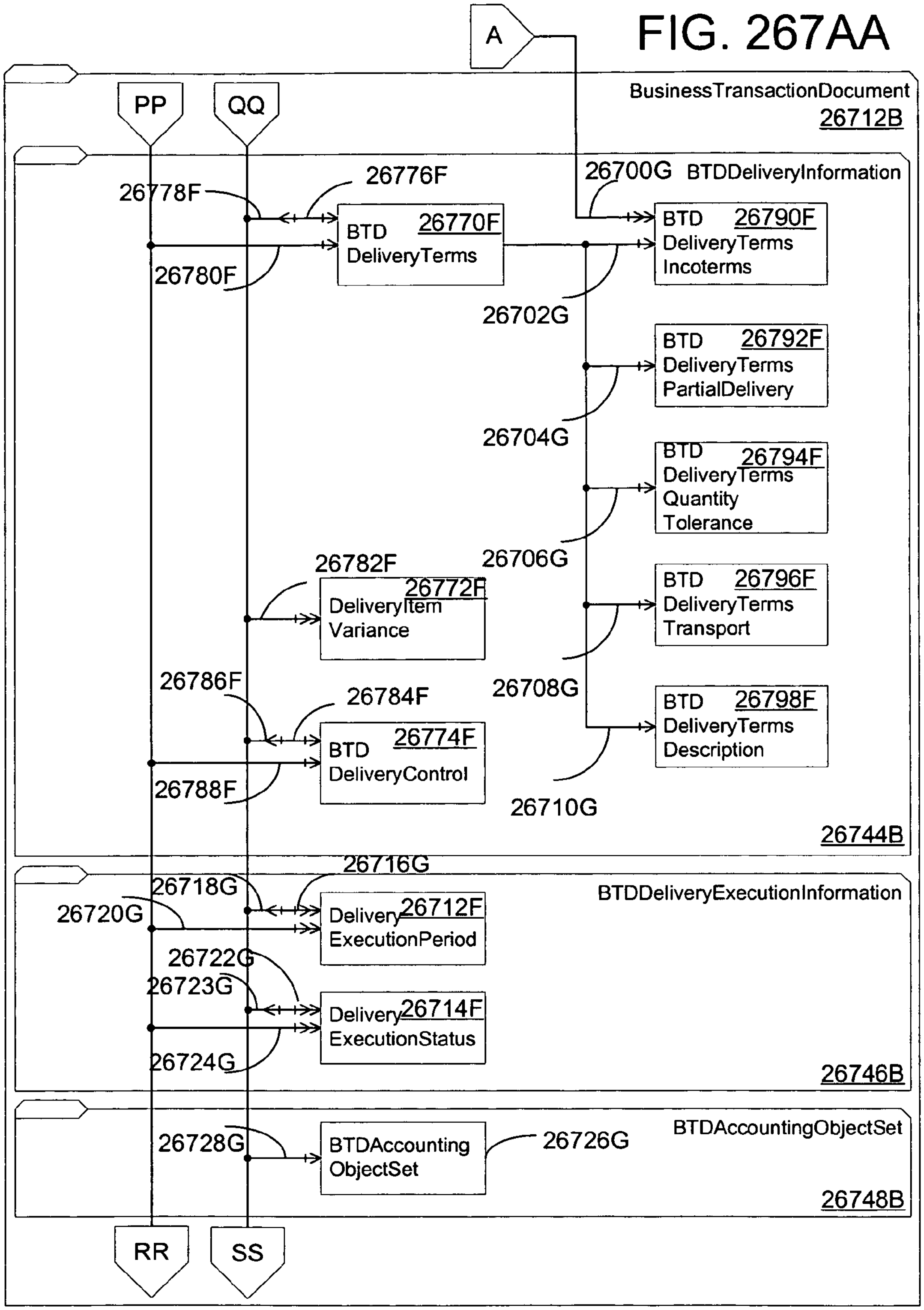
Figure 267B:
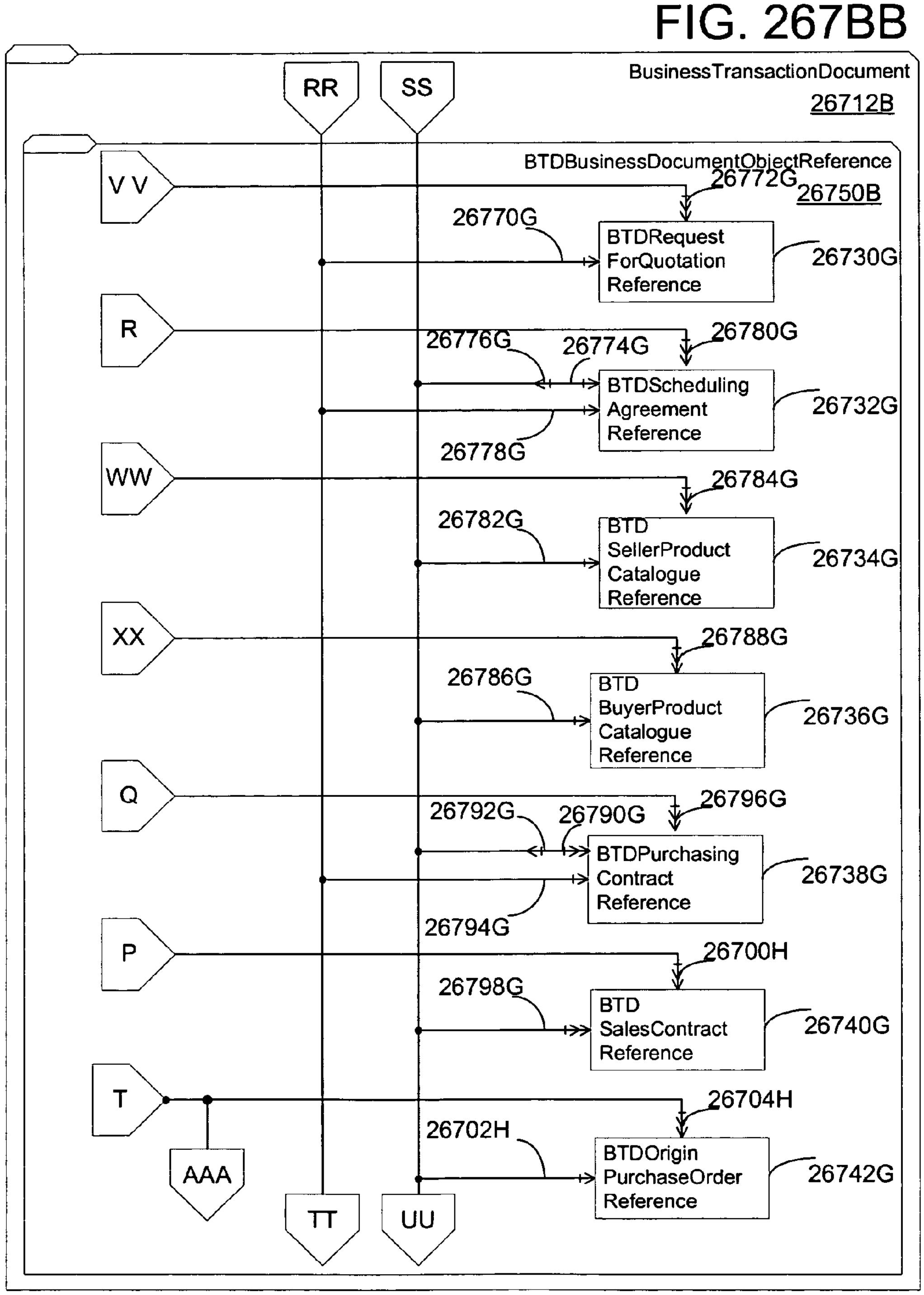
Figure 267C:
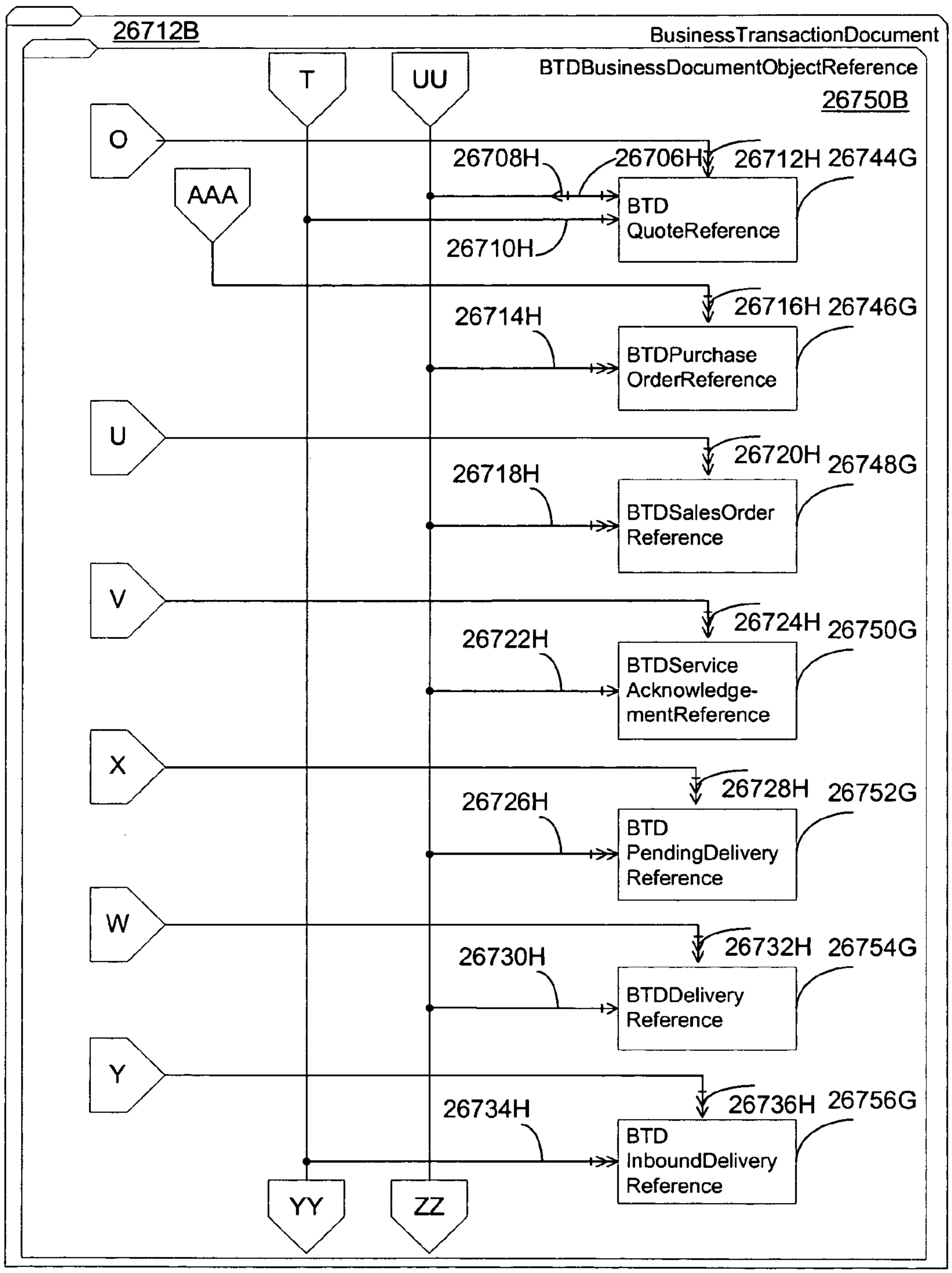
Figure 267D:
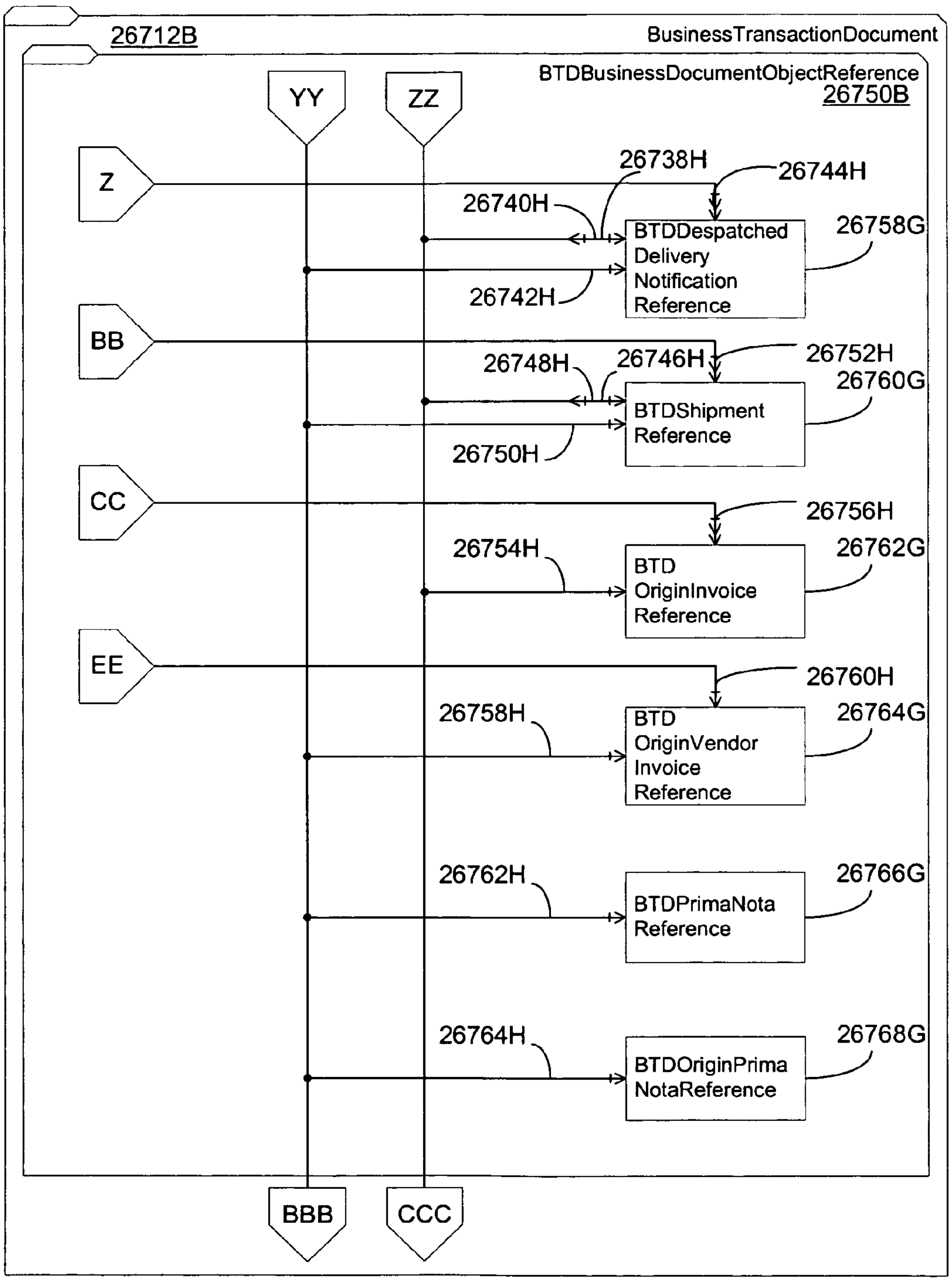
Figure 267E:
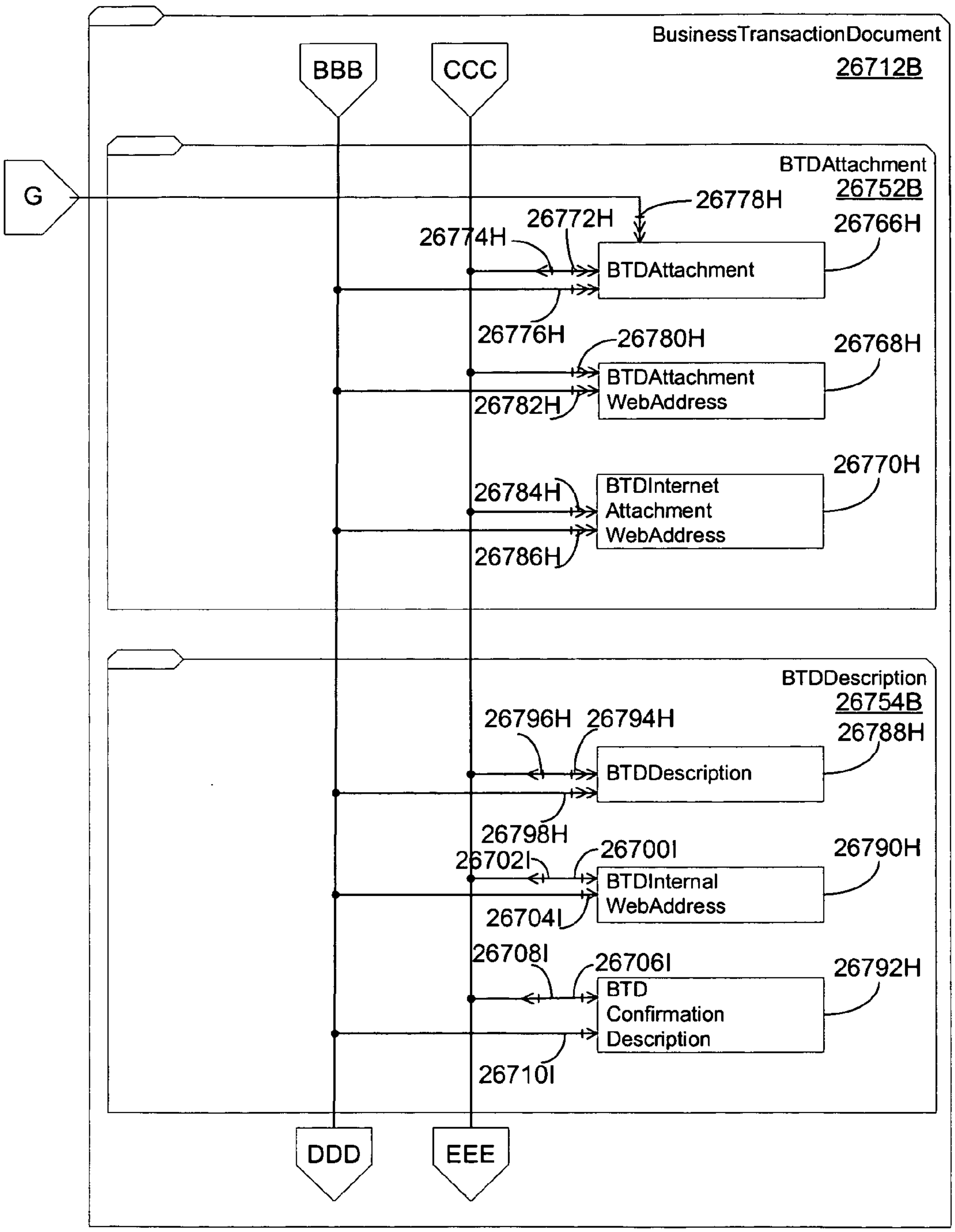
Figure 267F:
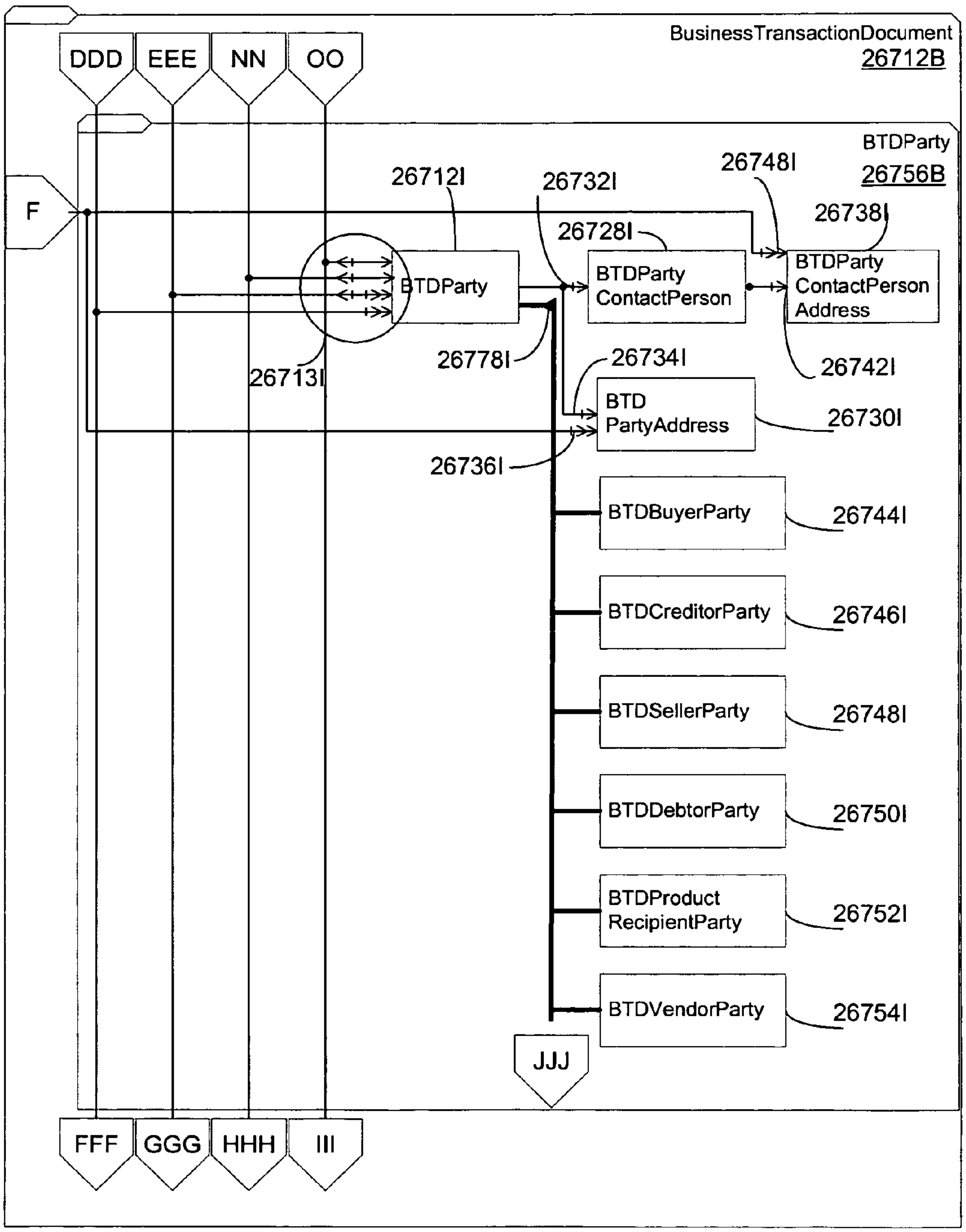
Figure 267G:
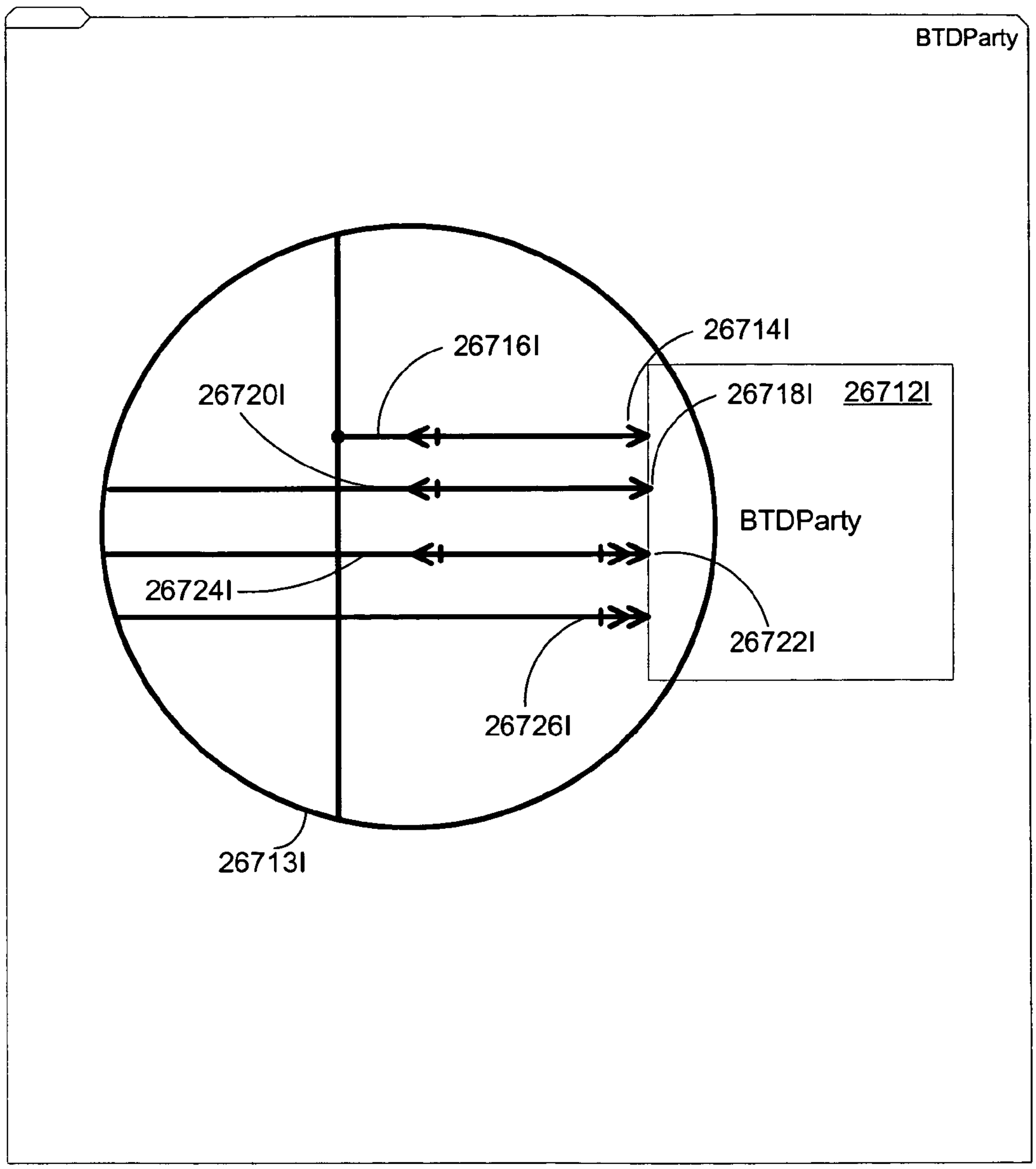
Figure 267H:
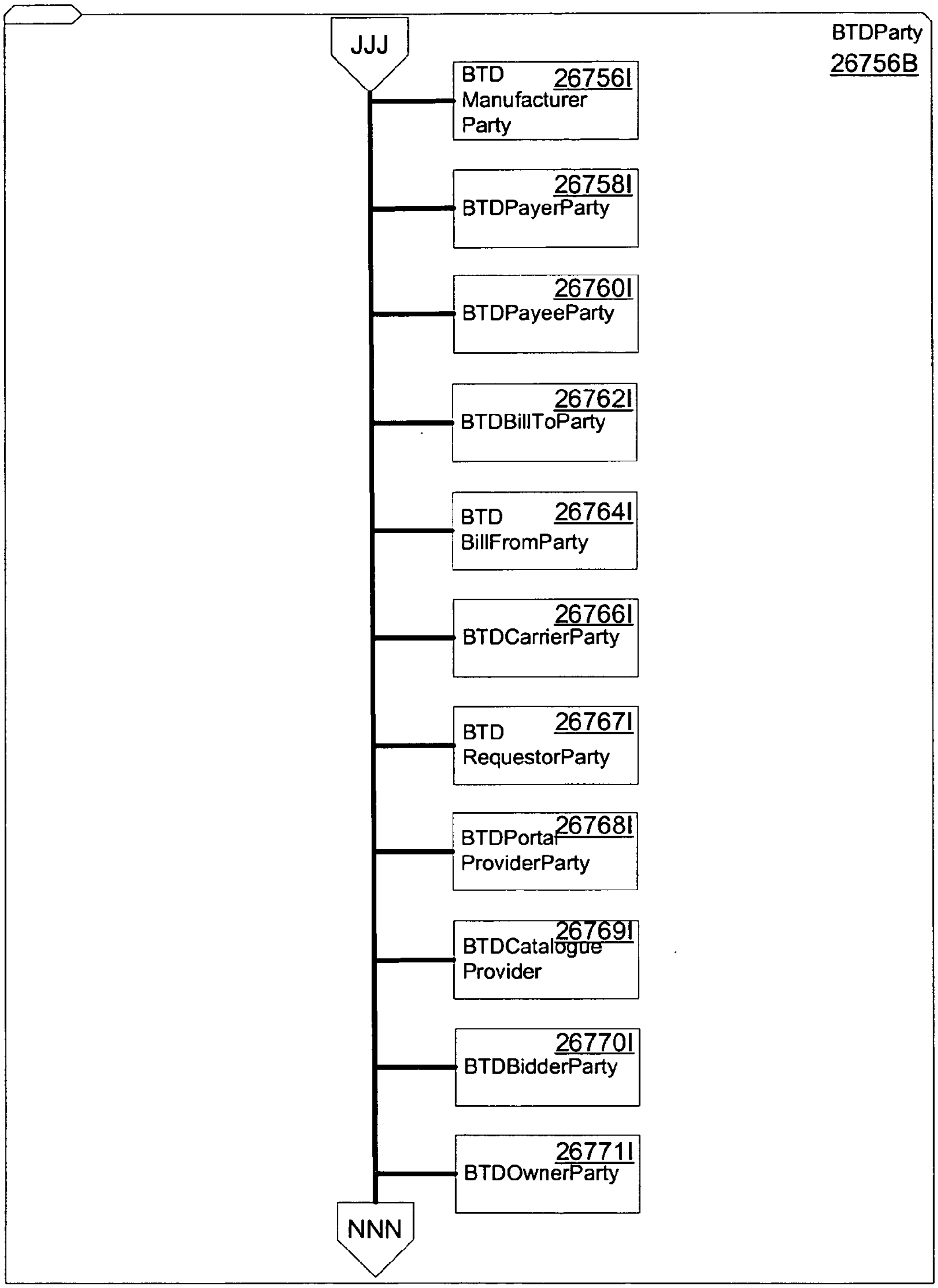
Figure 267I:
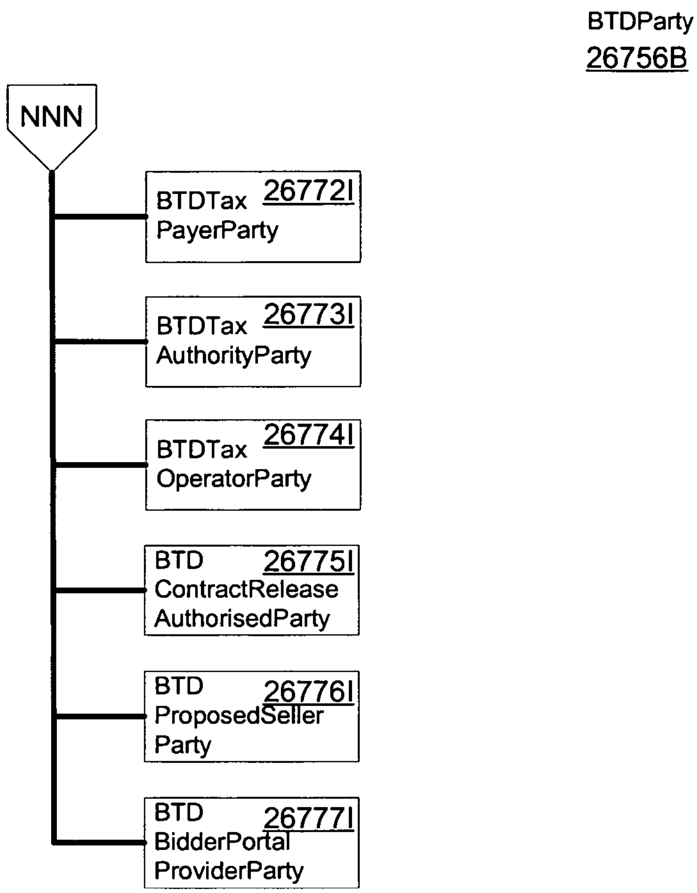
Figure 267J:
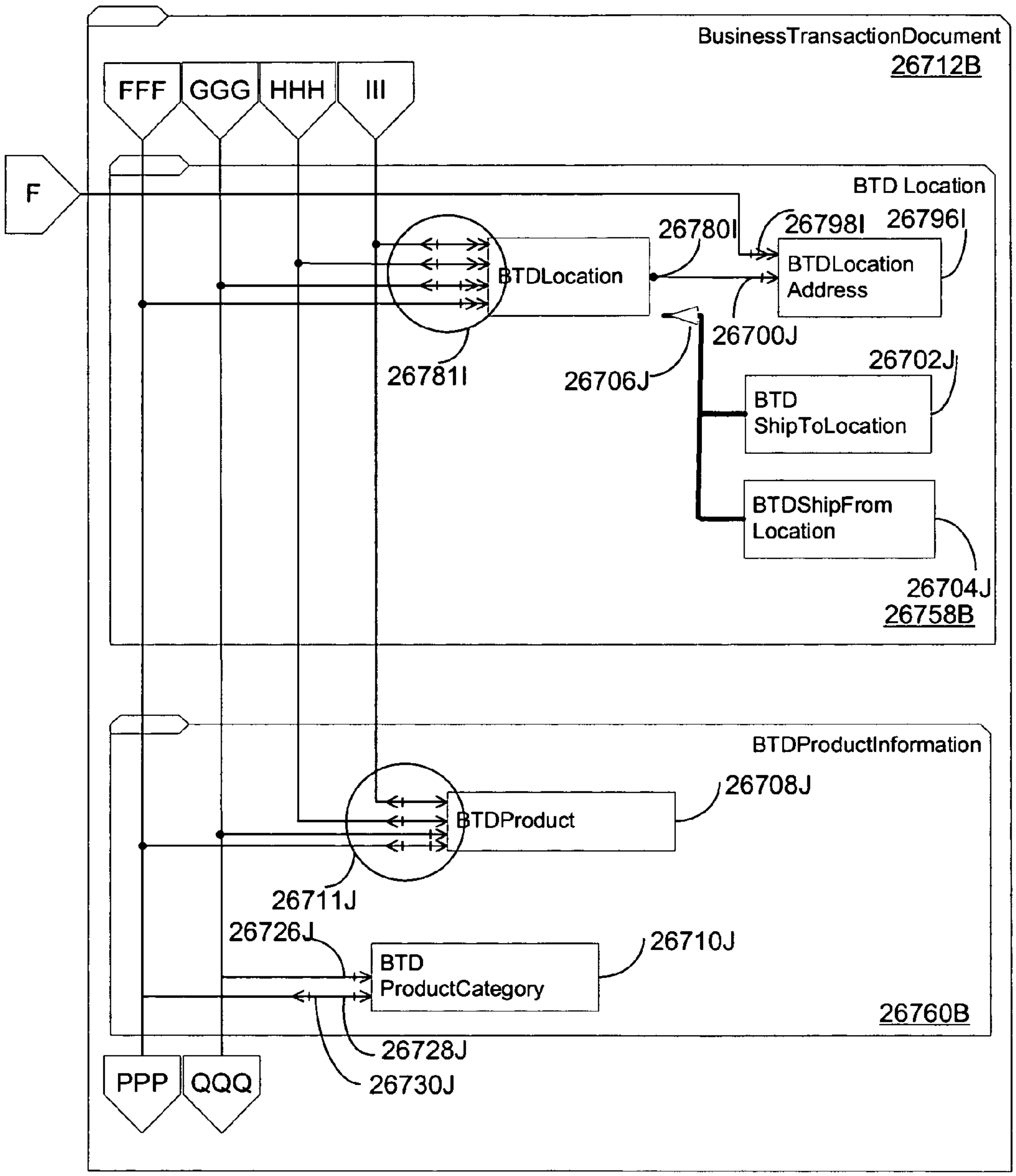
Figure 267K:
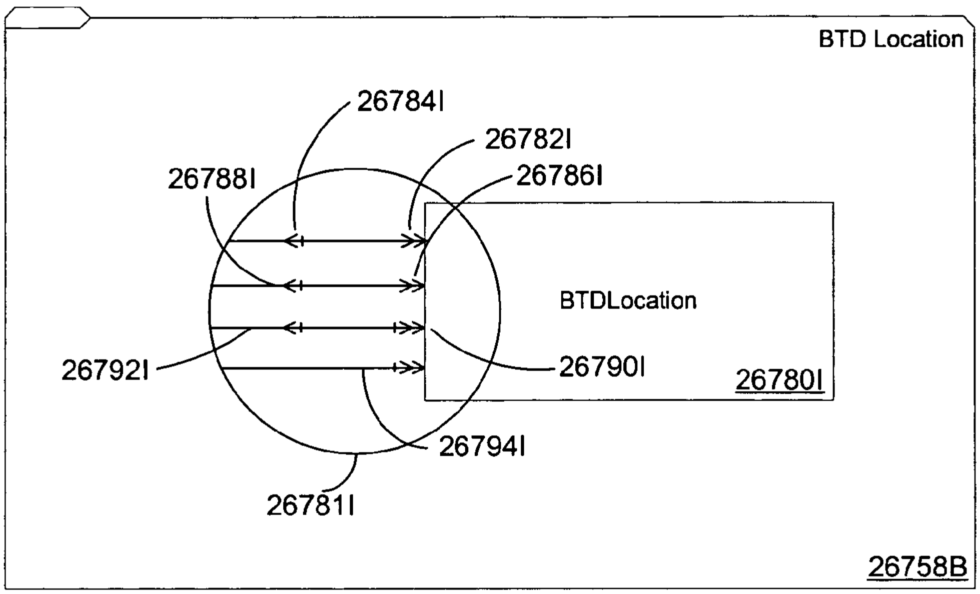
Figure 267L:
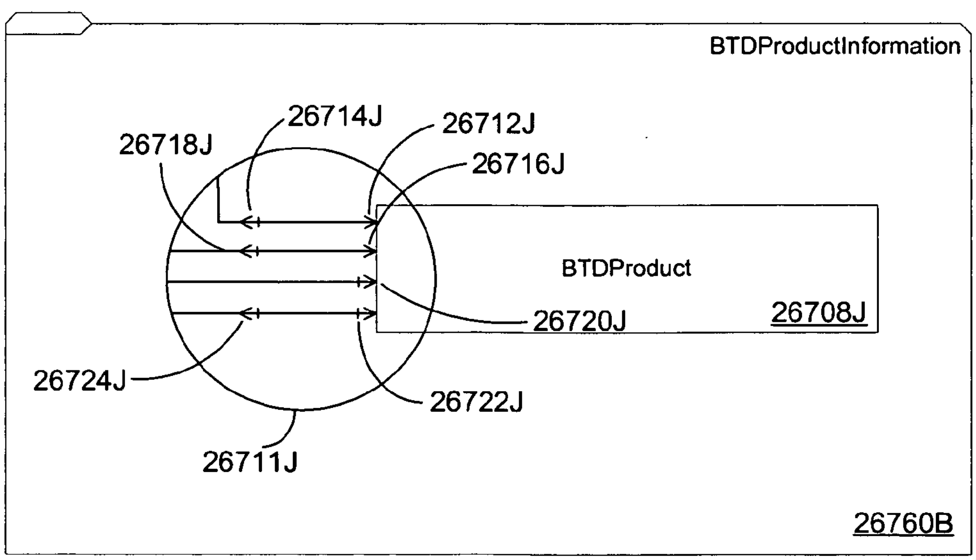
Figure 267M:
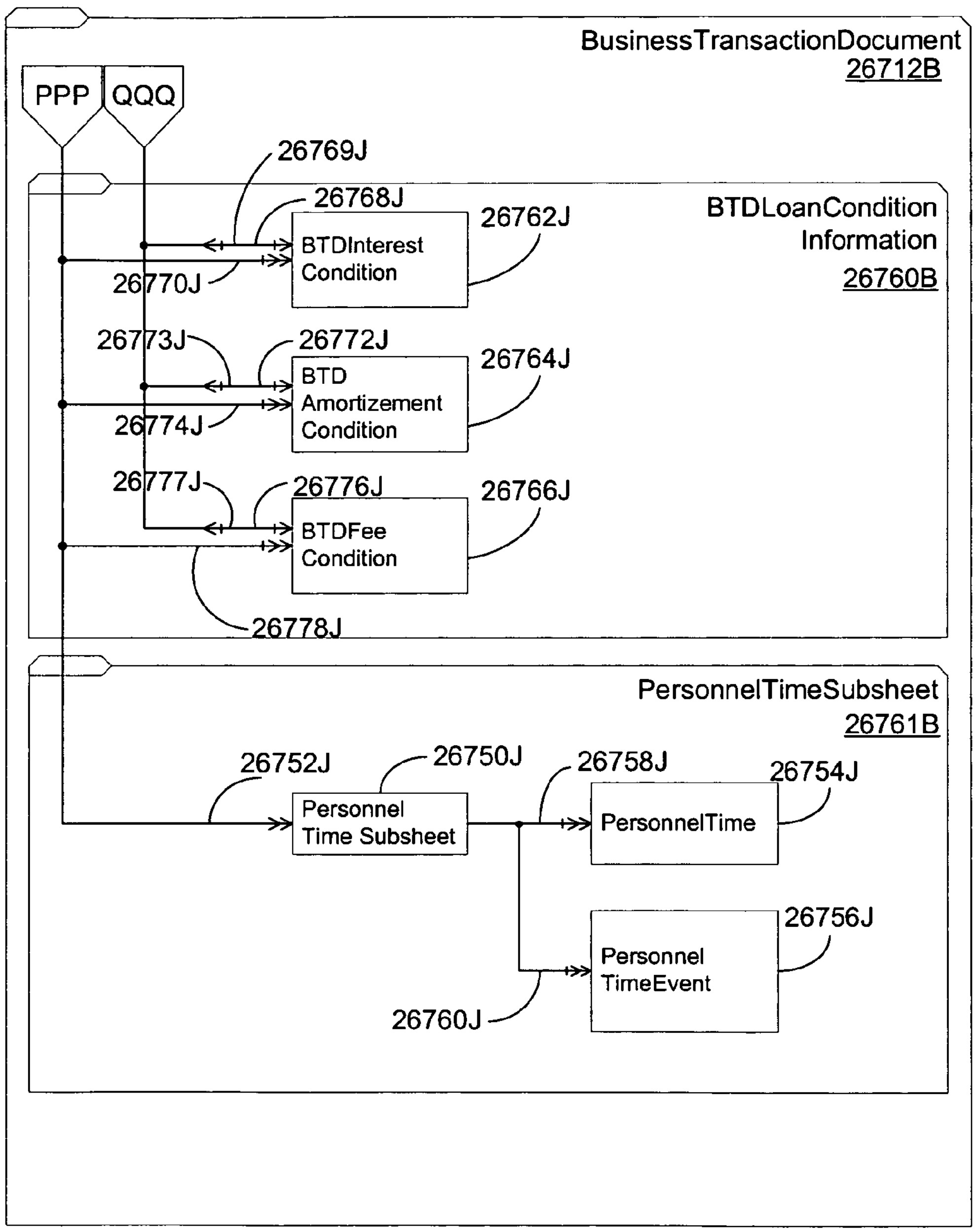
Figure 267N:
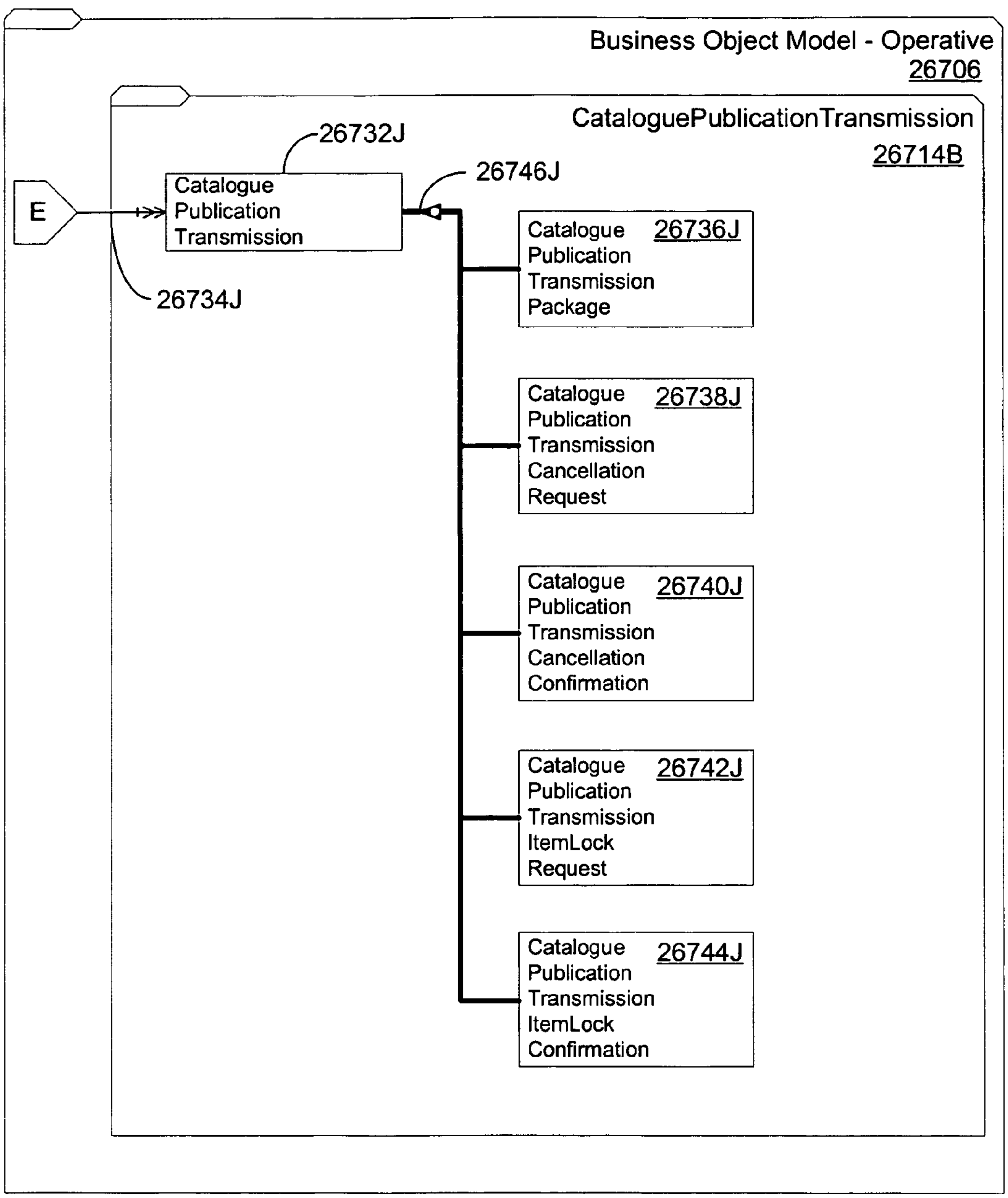

The BTDProductInformation package 26759B includes a BTDProduct entity 26708J and a BTDProductCategory entity 26710J. The details regarding the relationships 26711J to the BTDProduct entity 26708J are depicted in FIG. 267JJ. There is a 1:1 relationship 26712J between the InventoryChangeItemInbound entity 26702F and the BTDProduct entity 26708J, and a 1:c relationship 26714J between the BTDProduct entity 26708J and the InventoryChangeItemInbound entity 26702F. There is a 1:1 relationship 26716J between the InventoryChangeItemOutbound entity 26706F and the BTDProduct entity 26708J, and a 1:c relationship 26718J between the BTDProduct entity 26708J and the InventoryChangeItemOutbound entity 26706F. There is a 1:c relationship 26720J between the BTDItem entity 26768D and the BTDProduct entity 26708J. There is a 1:c relationship 26722J between the BusinessTransactionDocument entity 26762B and the BTDProduct entity 26708J, and a 1:c relationship 26724J between the BTDProduct entity 26708J and the BusinessTransactionDocument entity 26762B. There is a 1:c relationship 26726J between the BTDItem entity 26768D and the BTDProductCategory entity 26710J. There is a 1:c relationship 26728J between the BusinessTransactionDocument entity 26762B and the BTDProductCategory entity 26710J, and a 1:c relationship 26730J between the BTDProductCategory entity 26710J and the BusinessTransactionDocument entity 26762B.

The BTDLoanConditionInformation package includes a BTDInterestCondition entity 26762J, a BTDAmortizementCondition entity 26764J, and a BTDFeeCondition entity 26766J. There is a 1:c relationship 26768J between the BTDItem entity 26768D and the BTDInterestCondition entity 26762J, and a 1:c relationship 26769J between the BTDInterestCondition entity 26762J and the BTDItem entity 26768D. There is a 1:cn relationship 26770J between the BusinessTransactionDocument entity 26762B and the BTDInterestCondition entity 26762J. There is a 1:c relationship 26772J between the BTDItem entity 26768D and the BTDAmortizementCondition entity 26764J, and a 1:c relationship 26773J between the BTDAmortizementCondition entity 26764J and the BTDItem entity 26768D. There is a 1:cn relationship 26774J between the BusinessTransactionDocument entity 26762B and the BTDAmortizementCondition entity 26764J. There is a 1:c relationship 26776J between the BTDItem entity 26768D and the BTDFeeCondition entity 26766J, and a 1:c relationship 26777J between the BTDFeeCondition entity 26766J and the BTDItem entity 26768D. There is a 1:cn relationship 26778J between the BusinessTransactionDocument entity 26762B and the BTDFeeCondition entity 26766J.

The PersonnelTimeSubheet package 26761B includes a PersonnelTimeSubSheet entity 26750J. There is a 1:n relationship 26752J between the BusinessTransactionDocument entity 26762B and the PersonnelTimeSubSheet entity 26750J. The PersonnelTimeSubSheet entity 26750J includes a PersonnelTime entity 26754J and a PersonnelTimeEvent entity 26756J. There is a 1:cn relationship 26758J between the PersonnelTimeSubSheet entity 26750J and the PersonnelTime entity 26754J. There is a 1:cn relationship 26760J between the PersonnelTimeSubSheet entity 26750J and the PersonnelTimeEvent entity 26756J.

The CataloguePublicationTransmission package 26714B includes a CataloguePublicationTransmission entity 26732J. There is a 1:cn relationship 26734J between the Catalogue entity 26766 and the CataloguePublicationTransmission entity 26732J. The CataloguePublicationTransmission entity 26732J is specialized into a CataloguePublicationTransmissionPackage entity 26736J, a CataloguePublicationTransmissionCancellationRequest entity 26738J, a CataloguePublicationTransmissionCancellationConfirmation entity 26740J, a CataloguePublicationTransmissionItemLockRequest entity 26742J and a CataloguePublicationTransmissionItemLockConfirmation entity 26744J, which are disjoint complete specializations 26746J of the CataloguePublicationTransmission entity 26732J.

5. Interfaces Derived from Business Object Model

Interfaces are the starting point of the communication between two business entities. The structure of each interface determines how one business entity communicates with another business entity. The business entities may act as a unified whole when, based on the business scenario, the business entities know what an interface contains from a business perspective and how to fill the individual elements or fields of the interface.

Figure 313:
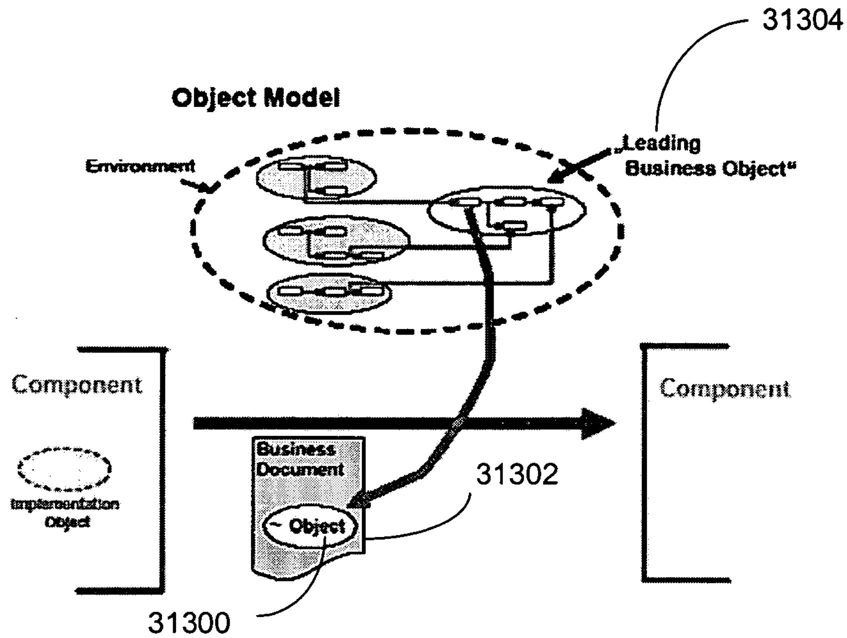

Communication between components takes place via messages that contain business documents. The business document ensures a holistic business-related understanding for the recipient of the message. As depicted in FIG. 313, the object 31300 contained in the business document 31302 (i.e., the "business document object") refers in its semantics to a "leading" business object 31304, which represents a view of the business object and its environment.

The business documents are created and accepted or consumed by interfaces, specifically by inbound and outbound interfaces. The interface structure and, hence, the structure of the business document are derived by a mapping rule. This mapping rule is known as "hierarchization." An interface structure thus has a hierarchical structure created based on the leading business object. The interface represents a usage-specific, hierarchical view of the underlying usage-neutral object model.

Figure 314:
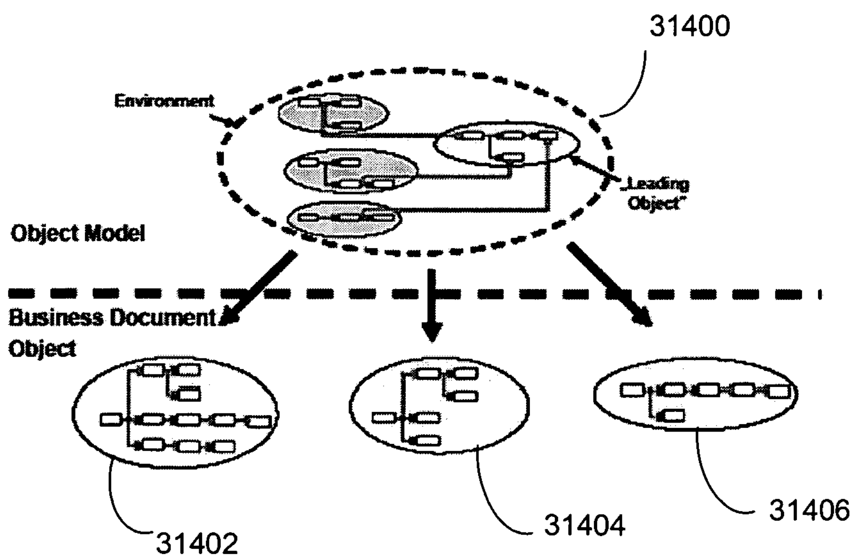

As illustrated in FIG. 314, several business document objects 31402, 31404, and 31406 as overlapping views may be derived for a given leading object 31400. Each business document object results from the object model by hierarchization.

Figure 315:
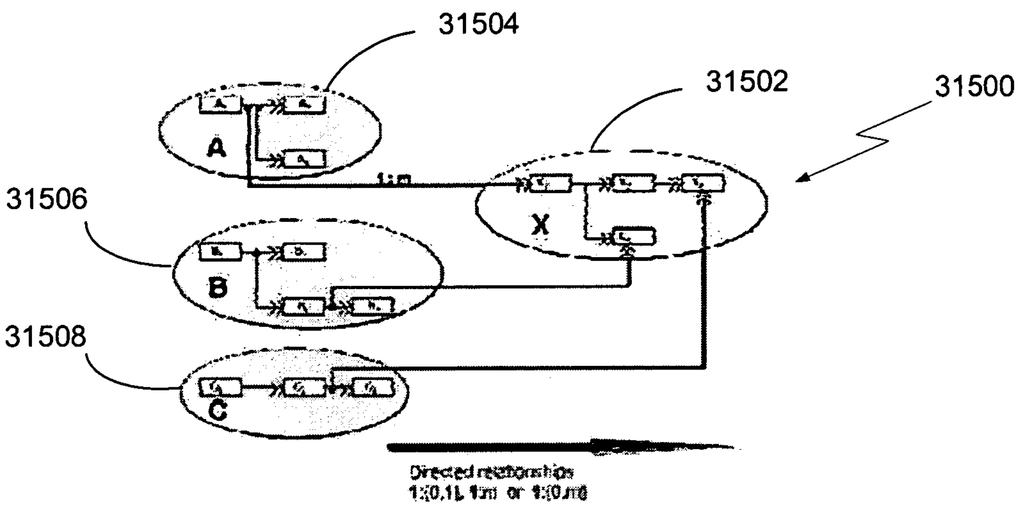

To illustrate the hierarchization process, FIG. 315 depicts an example of an object model 31500 (i.e., a portion of the business object model) that is used to derive a service operation signature (business document object structure). As depicted, leading object X 31502 in the object model 31500 is integrated in a net of object A 31504, object B 31506, and object C 31508, each of which objects 31504, 31506, 31508. Initially, the parts of the leading object 31502 that are required for the business object document are adopted. In one variation, all parts required for a business document object are adopted from leading object 31502 (making such an operation a maximal service operation). Based on these parts, the relationships to the superordinate objects (i.e., objects A, B, and C from which object X depends) are inverted. In other words, these objects are adopted as dependent or subordinate objects in the new business document object.

For example, object A 31504, object B 31506, and object C 30508 have information that characterize object X. Because object A 31504, object B 31506, and object C 30508 are superordinate to leading object X 31502, the dependencies of these relationships change so that object A 31504, object B 31506, and object C 30508 become dependent and subordinate to leading object X 31502. This procedure is known as "derivation of the business document object by hierarchization."

Business-related objects generally have an internal structure (parts). This structure can be complex and reflect the individual parts of an object and their mutual dependency. When creating the operation signature, the internal structure of an object is strictly hierarchized. Thus, dependent parts keep their dependency structure, and relationships between the parts within the object that do not represent the hierarchical structure are resolved by prioritizing one of the relationships.

Relationships of object X to external objects that are referenced and whose information characterizes object X are added to the operation signature. Such a structure can be quite complex (see, for example, FIG. 316). The cardinality to these referenced objects is adopted as 1:1 or 1:C, respectively. By this, the direction of the dependency changes. The required parts of this referenced object are adopted identically, both in their cardinality and in their dependency arrangement.

Figure 316:
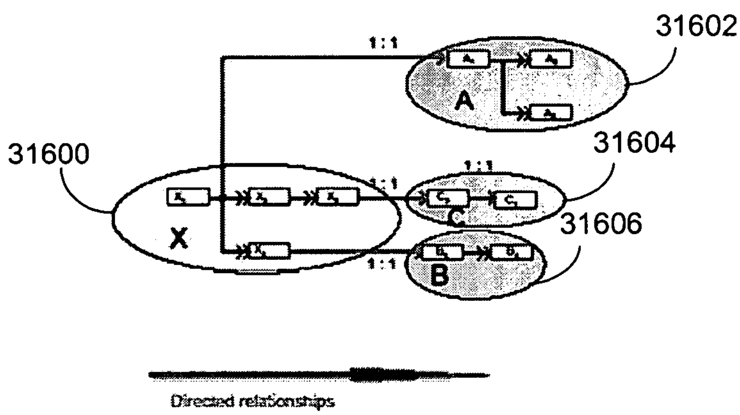

The newly created business document object contains all required information, including the incorporated master data information of the referenced objects. As depicted in FIG. 316, components Xi in leading object X 31600 are adopted directly. The relationship of object X 31600 to object A 31602, object B 31604, and object C 31606 are inverted, and the parts required by these objects are added as objects that depend from object X 31600. As depicted, all of object A 31602 is adopted. B3 and B4 are adopted from object B 31604, but B1 is not adopted. From object C 31606, C2 and C1 are adopted, but C3 is not adopted.

Figure 317:
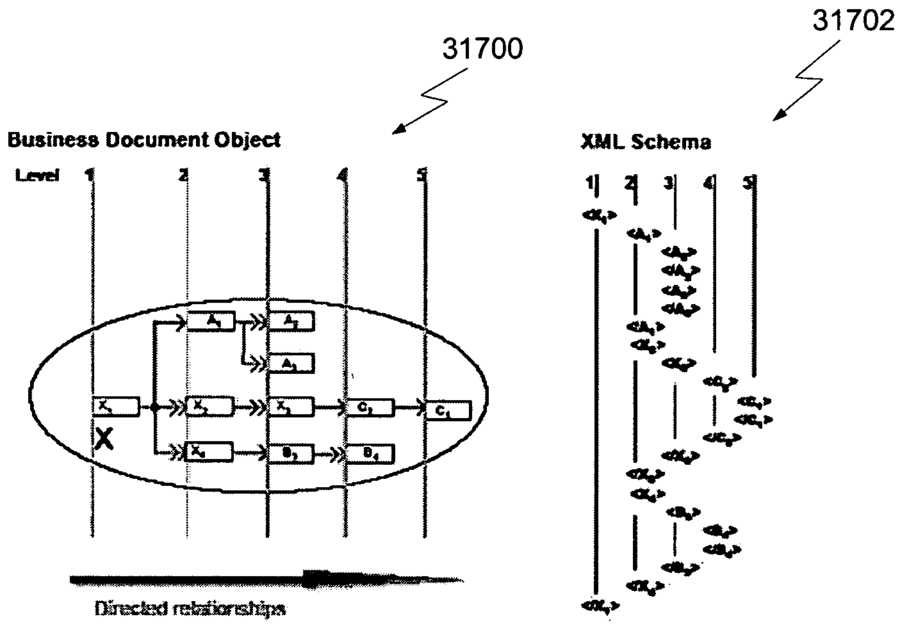

FIG. 317 depicts the business document object X 31700 created by this hierarchization process. As shown, the arrangement of the elements corresponds to their dependency levels, which directly leads to a corresponding representation as an XML structure 31702.

The following provides certain rules that can be adopted singly or in combination with regard to the hierarchization process:

- A business document object always refers to a leading business document object and is derived from this object.
- The name of the root entity in the business document entity is the name of the business object or the name of a specialization of the business object or the name of a service specific view onto the business object.
- The nodes and elements of the business object that are relevant (according to the semantics of the associated message type) are contained as entities and elements in the business document object.
- The name of a business document entity is predefined by the name of the corresponding business object node. The name of the superordinate entity is not repeated in the name of the business document entity. The "full" semantical name results from the concatenation of the entity names along the hierarchical structure of the business document object.
- The structure of the business document object is, except for deviations due to hiearchization, the same as the structure of the business object.
- The cardinalities of the business document object nodes and elements are adopted identically or more restrictively to the business document object.
- An object from which the leading business object is dependent can be adopted to the business document object. For this arrangement, the relationship is inversted, and the object (or its parts, respectively) are hierarchically subordinated in the business document object.
- Nodes in the business object representing generalized business information can be adopted as explicit entities to the business document object (generally speaking, multiply TypeCodes out). When this adoption occurs, the entities are named according to their more specific semantic (name of TypeCode becomes prefix).
  - Party nodes of the business object are modeled as explicit entities for each party role in the business document object. These nodes are given the name <Prefix><Party Role>Party, for example, BuyerParty, ItemBuyerParty.
  - BTDReference nodes are modeled as separate entities for each reference type in the business document object. These nodes are given the name <Qualifier><BO><Node>Reference, for example SalesOrderReference, OriginSalesOrderReference, SalesOrderItemReference.
  - A product node in the business object comprises all of the information on the Product, ProductCategory, and Batch. This information is modeled in the business document object as explicit entities for Product, ProductCategory, and Batch.
- Entities which are connected by a 1:1 relationship as a result of hierarchization can be combined to a single entity, if they are semantically equivalent. Such a combination can often occurs if a node in the business document object that results from an assignment node is removed because it does not have any elements.

The message type structure is typed with data types.

Elements are typed by GDTs according to their business objects.

Aggregated levels are typed with message type specific data types (Intermediate Data Types), with their names being built according to the corresponding paths in the message type structure.

The whole message type structured is typed by a message data type with its name being built according to the root entity with the suffix "Message".

For the message type, the message category (e.g., information, notification, query, response, request, confirmation, etc.) is specified according to the suited transaction communication pattern.

In one variation, the derivation by hierarchization can be initiated by specifiying a leading business object and a desired view relevant for a selected service operation. This view determines the business document object. The leading business object can be the source object, the target object, or a third object. Thereafter, the parts of the business object required for the view are determined. The parts are connected to the root node via a valid path along the hierarchy. Thereafter, one or more independent objects (object parts, respectively) referenced by the leading object which are relevant for the service may be determined (provided that a relationship exists between the leading object and the one or more independent objects).

Once the selection is finalized, relevant nodes of the leading object node that are structurally identifcal to the message type structure can then be adopted. If nodes are adopted from independent objects or object parts, the relationships to such independent objects or object parts are inverted. Linearization can occur such that a business object node containing certain TypeCodes is represented in the message type structure by explicit entities (an entity for each value of the TypeCode). The structure can be reduced by checking all 1:1 cardinalities in the message type structure. Entities can be combined if they are semantically equivalent, one of the entities carries no elements, or an entity solely results from an n:m assignment in the business object.

After the hierarchization is completed, information regarding transmission of the business document object (e.g., CompleteTransmissionIndicator, ActionCodes, message category, etc.) can be added. A standardized message header can be added to the message type structure and the message structure can be typed. Additionally, the message category for the message type can be designated.

Invoice Request and Invoice Confirmation are examples of interfaces. These invoice interfaces are used to exchange invoices and invoice confirmations between an invoicing party and an invoice recipient (such as between a seller and a buyer) in a B2B process. Companies can create invoices in electronic as well as in paper form. Traditional methods of communication, such as mail or fax, for invoicing are cost intensive, prone to error, and relatively slow, since the data is recorded manually. Electronic communication eliminates such problems. The motivating business scenarios for the Invoice Request and Invoice Confirmation interfaces are the Procure to Stock (PTS) and Sell from Stock (SFS) scenarios. In the PTS scenario, the parties use invoice interfaces to purchase and settle goods. In the SFS scenario, the parties use invoice interfaces to sell and invoice goods. The invoice interfaces directly integrate the applications implementing them and also form the basis for mapping data to widely-used XML standard formats such as RosettaNet, PIDX, xCBL, and CIDX.

The invoicing party may use two different messages to map a B2B invoicing process: (1) the invoicing party sends the message type InvoiceRequest to the invoice recipient to start a new invoicing process; and (2) the invoice recipient sends the message type InvoiceConfirmation to the invoicing party to confirm or reject an entire invoice or to temporarily assign it the status "pending."

An InvoiceRequest is a legally binding notification of claims or liabilities for delivered goods and rendered services—usually, a payment request for the particular goods and services. The message type InvoiceRequest is based on the message data type InvoiceMessage. The InvoiceRequest message (as defined) transfers invoices in the broader sense. This includes the specific invoice (request to settle a liability), the debit memo, and the credit memo.

InvoiceConfirmafion is a response sent by the recipient to the invoicing party confirming or rejecting the entire invoice received or stating that it has been assigned temporarily the status "pending." The message type InvoiceConfirmation is based on the message data type InvoiceMessage. An InvoiceConfirmation is not mandatory in a B2B invoicing process, however, it automates collaborative processes and dispute management.

FIG. 268 depicts the message choreography for the Invoice interface. The choreography involves two business entities: Billing 26802 and Invoicing 26804. Billing 26802 sends an InvoiceRequest message 26806 to Invoicing 26804. The message type 26808 of the InvoiceRequest message 26806 is 0401. Invoicing 26804 then sends Billing 26802 an InvoiceConfirmation message 26810. The message type 26812 of the Confirmation message 26810 is 0402.

Usually, the invoice is created after it has been confirmed that the goods were delivered or the service was provided. The invoicing party (such as the seller) starts the invoicing process by sending an InvoiceRequest message. Upon receiving the InvoiceRequest message, the invoice recipient (for instance, the buyer) can use the InvoiceConfirmation message to completely accept or reject the invoice received or to temporarily assign it the status "pending." The InvoiceConfirmation is not a negotiation tool (as is the case in order management), since the options available are either to accept or reject the entire invoice. The invoice data in the InvoiceConfirmation message merely confirms that the invoice has been forwarded correctly and does not communicate any desired changes to the invoice. Therefore, the InvoiceConfirmation includes the precise invoice data that the invoice recipient received and checked. If the invoice recipient rejects an invoice, the invoicing party can send a new invoice after checking the reason for rejection (AcceptanceStatus and ConfirmationDescription at Invoice and InvoiceItem level). If the invoice recipient does not respond, the invoice is generally regarded as being accepted and the invoicing party can expect payment.

FIGS. 269A-F depict a flow diagram of the steps performed by methods and systems consistent with the subject matter described herein to generate an interface from the business object model. Although described as being performed by a computer, these steps may alternatively be performed manually, or using any combination thereof. The process begins when the system receives an indication of a package template from the designer, i.e., the designer provides a package template to the system (step 26900).

Package templates specify the arrangement of packages within a business transaction document. Package templates are used to define the overall structure of the messages sent between business entities. Methods and systems consistent with the subject matter described herein use package templates in conjunction with the business object model to derive the interfaces.

The system also receives an indication of the message type from the designer (step 26902). The system selects a package from the package template (step 26904), and receives an indication from the designer whether the package is required for the interface (step 26906). If the package is not required for the interface, the system removes the package from the package template (step 26908). The system then continues this analysis for the remaining packages within the package template (step 26910).

Figure 269A:
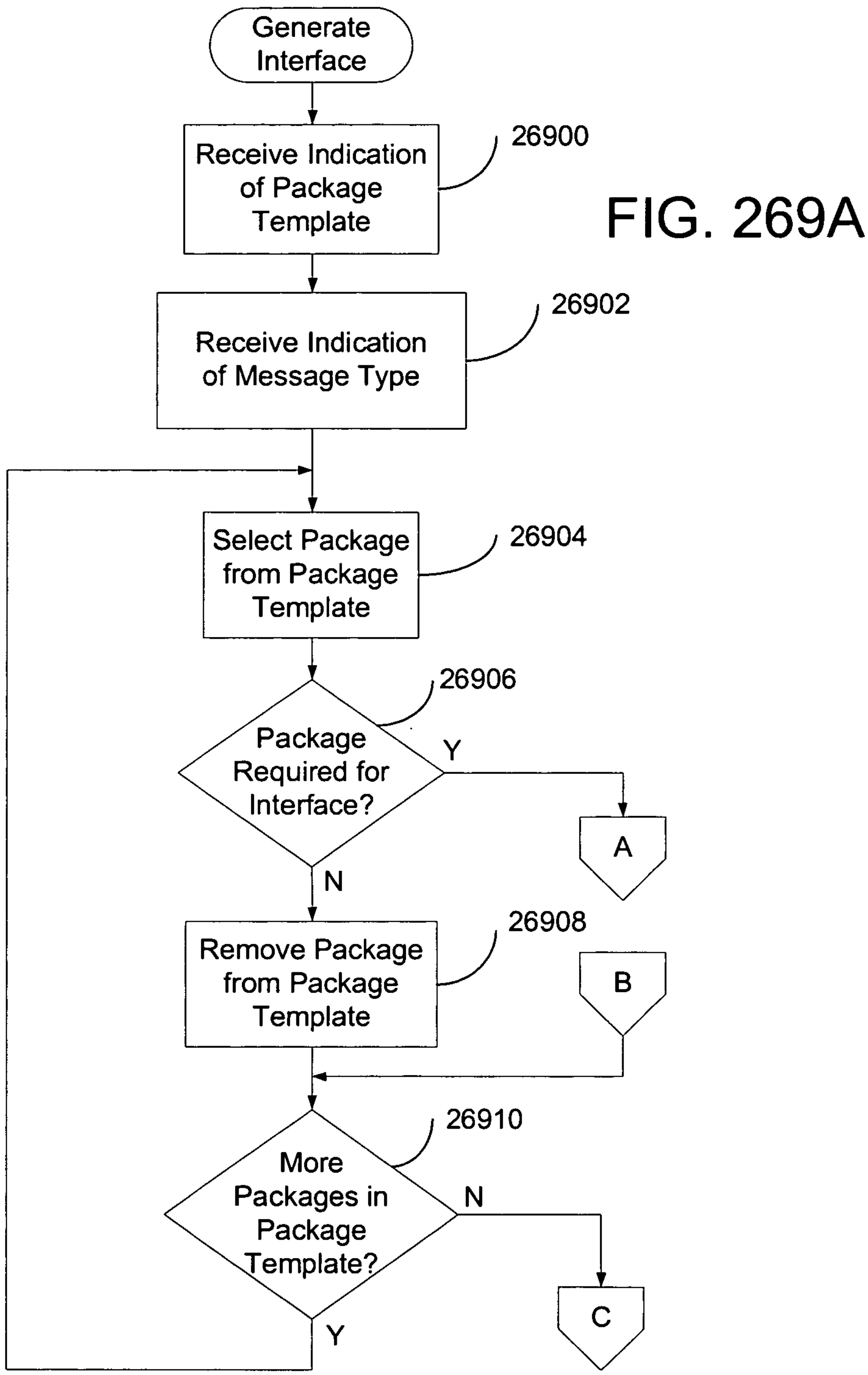
Figure 269B:
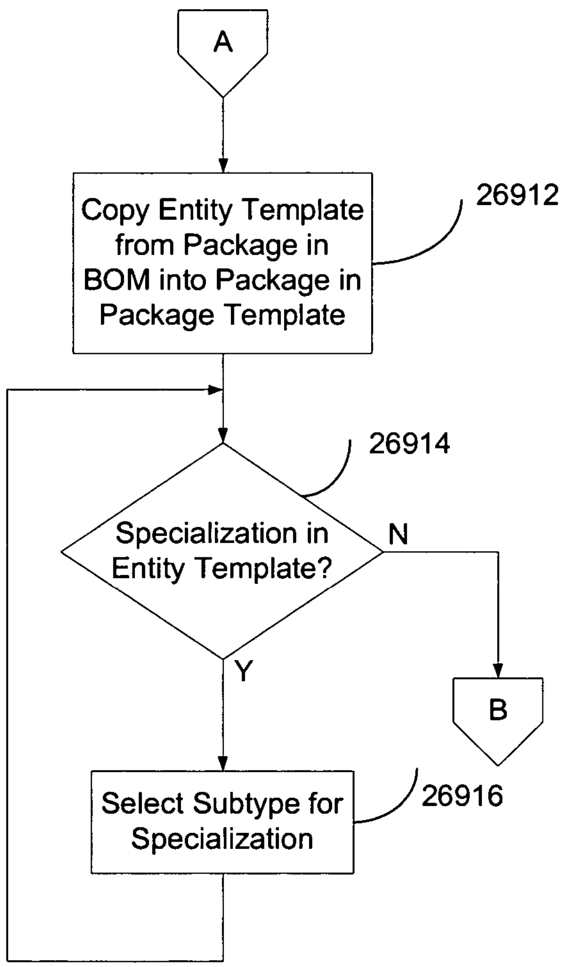
Figure 269C:
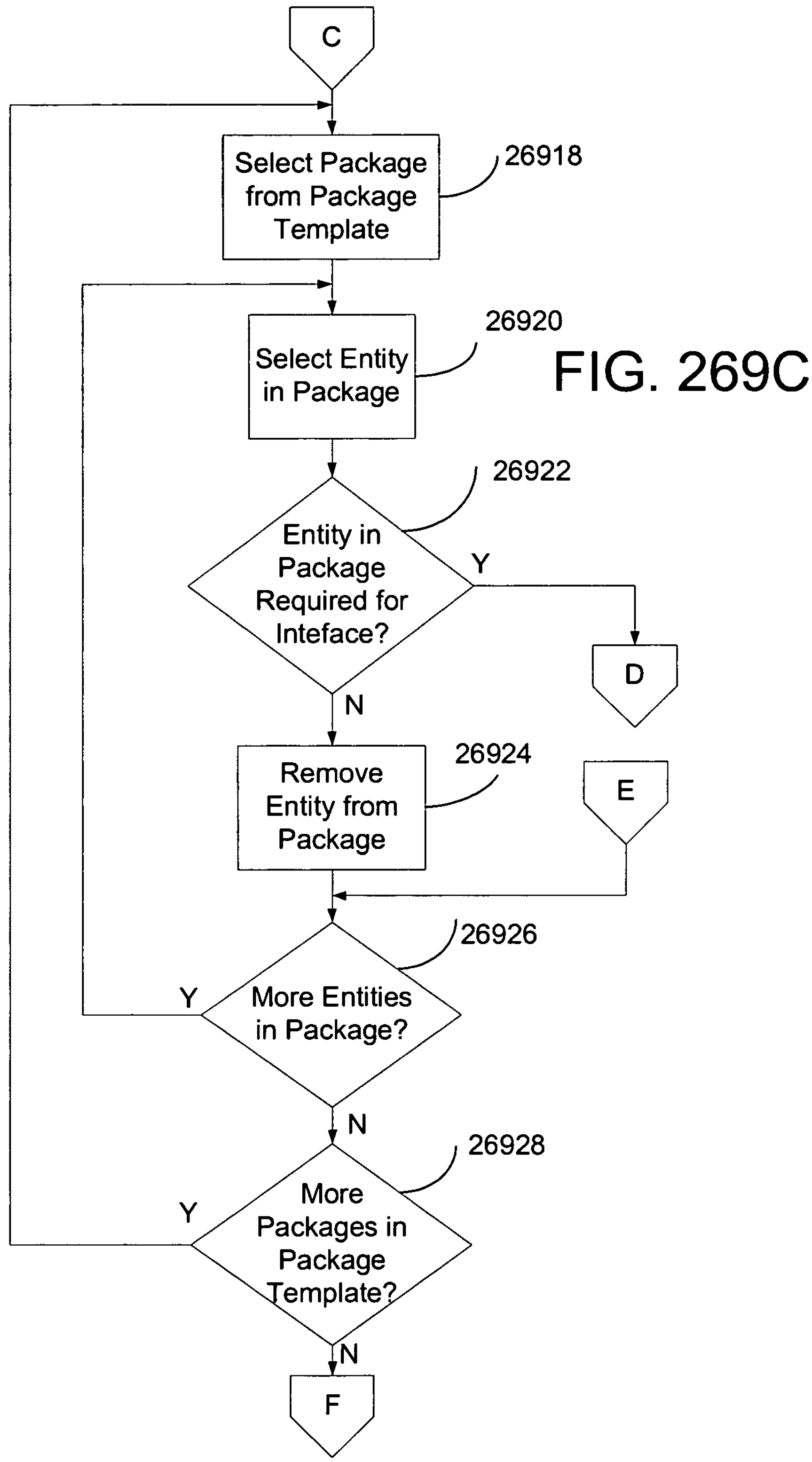

If, at step 26906, the package is required for the interface, the system copies the entity template from the package in the business object model into the package in the package template (step 26912, FIG. 269B). The system determines whether there is a specialization in the entity template (step 26914). If the system determines that there is a specialization in the entity template, the system selects a subtype for the specialization (step 26916). The system may either select the subtype for the specialization based on the message type, or it may receive this information from the designer. The system then determines whether there are any other specializations in the entity template (step 26914). When the system determines that there are no specializations in the entity template, the system continues this analysis for the remaining packages within the package template (step 26910, FIG. 269A).

At step 26910, after the system completes its analysis for the packages within the package template, the system selects one of the packages remaining in the package template (step 26918, FIG. 269C), and selects an entity from the package (step 26920). The system receives an indication from the designer whether the entity is required for the interface (step 26922). If the entity is not required for the interface, the system removes the entity from the package template (step 26924). The system then continues this analysis for the remaining entities within the package (step 26926), and for the remaining packages within the package template (step 26928).

Figure 269D:
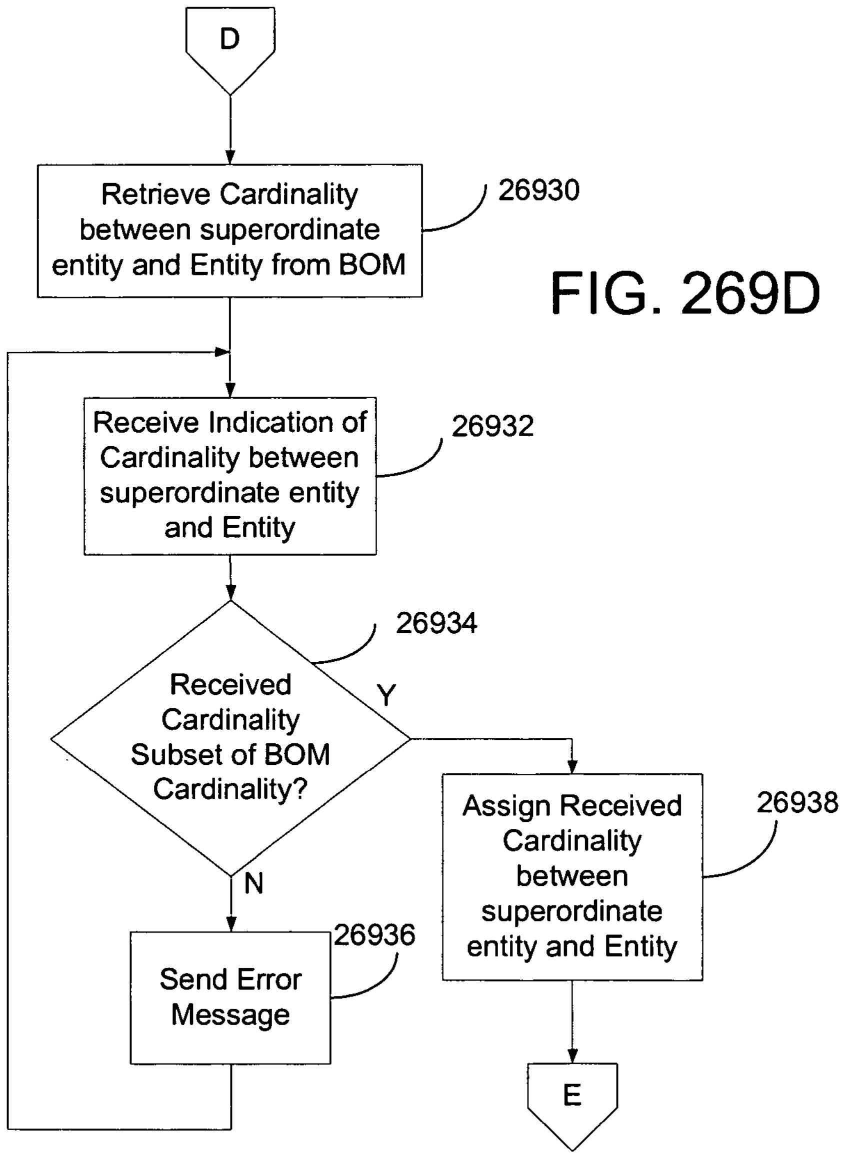

If, at step 26922, the entity is required for the interface, the system retrieves the cardinality between a superordinate entity and the entity from the business object model (step 26930, FIG. 269D). The system also receives an indication of the cardinality between the superordinate entity and the entity from the designer (step 26932). The system then determines whether the received cardinality is a subset of the business object model cardinality (step 26934). If the received cardinality is not a subset of the business object model cardinality, the system sends an error message to the designer (step 26936). If the received cardinality is a subset of the business object model cardinality, the system assigns the received cardinality as the cardinality between the superordinate entity and the entity (step 26938). The system then continues this analysis for the remaining entities within the package (step 26926, FIG. 269C), and for the remaining packages within the package template (step 26928).

Figure 269E:
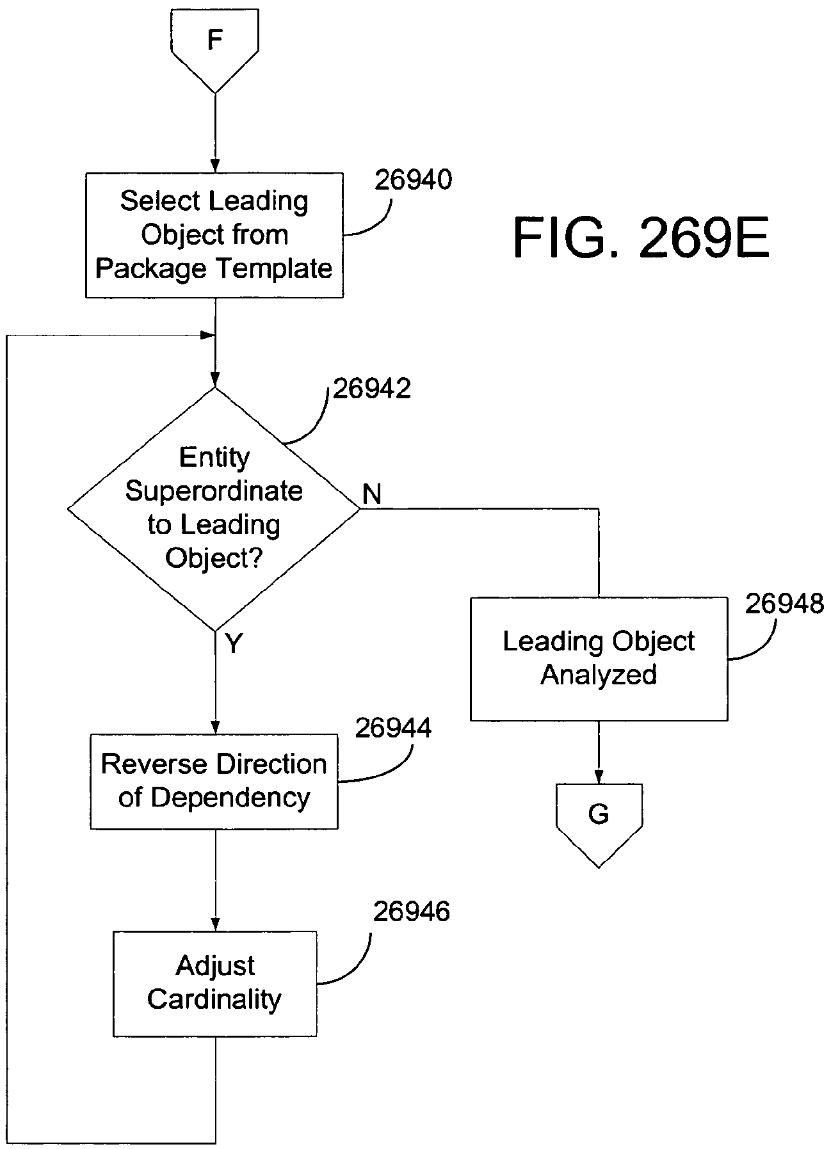
Figure 269F:
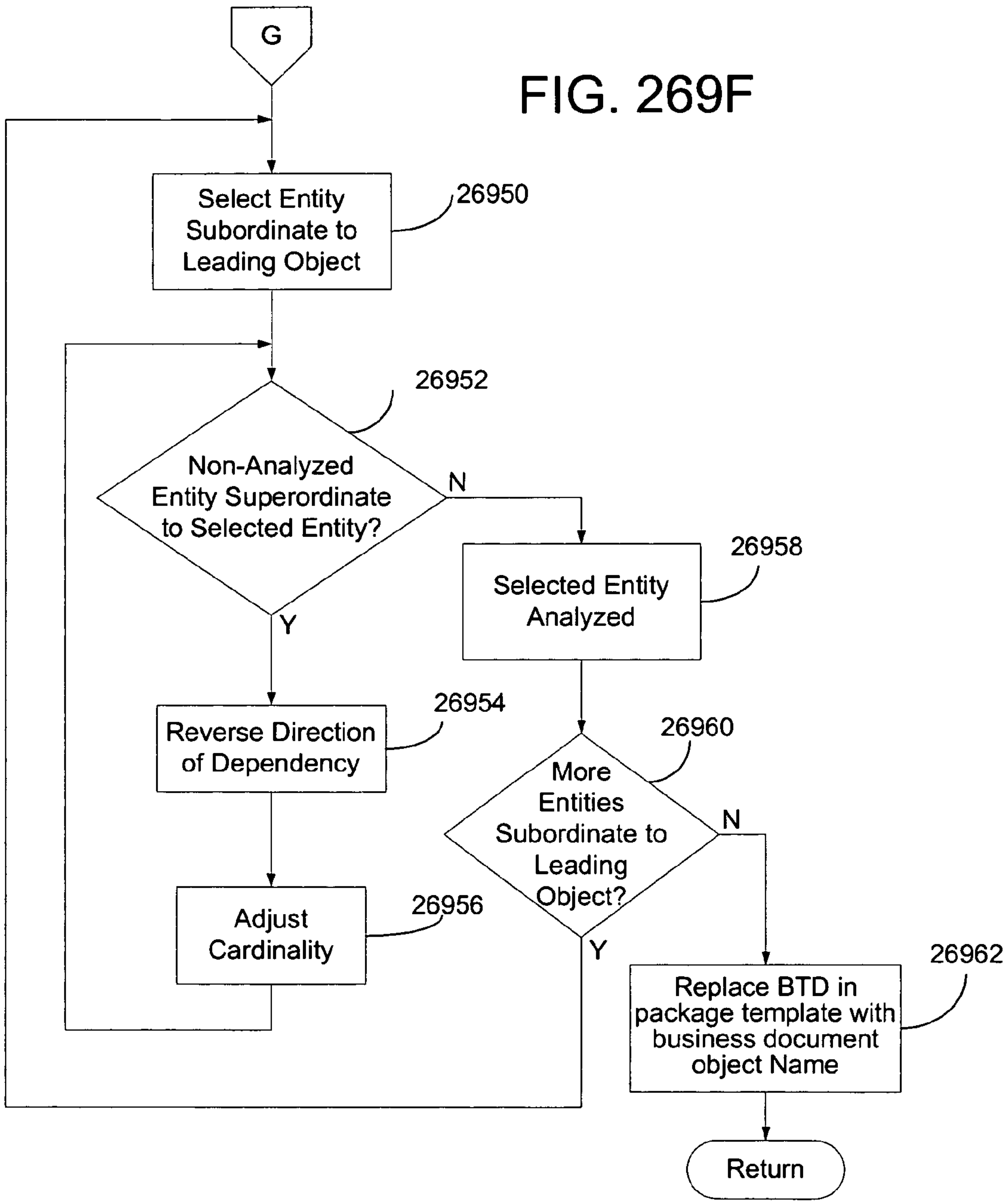

The system then selects a leading object from the package template (step 26940, FIG. 269E). The system determines whether there is an entity superordinate to the leading object (step 26942). If the system determines that there is an entity superordinate to the leading object, the system reverses the direction of the dependency (step 26944) and adjusts the cardinality between the leading object and the entity (step 26946). The system performs this analysis for entities that are superordinate to the leading object (step 26942). If the system determines that there are no entities superordinate to the leading object, the system identifies the leading object as analyzed (step 26948).

The system then selects an entity that is subordinate to the leading object (step 26950). The system determines whether any non-analyzed entities are superordinate to the selected entity (step 26952). If a non-analyzed entity is superordinate to the selected entity, the system reverses the direction of the dependency (step 26954) and adjusts the cardinality between the selected entity and the non-analyzed entity (step 26956). The system performs this analysis for non-analyzed entities that are superordinate to the selected entity (step 26952). If the system determines that there are no non-analyzed entities superordinate to the selected entity, the system identifies the selected entity as analyzed (step 26958), and continues this analysis for entities that are subordinate to the leading object (step 26960). After the packages have been analyzed, the system substitutes the BusinessTransactionDocument ("BTD") in the package template with the name of the interface (step 26962). This includes the "BTD" in the BTDItem package and the "BTD" in the BTDItemScheduleLine package.

For example, FIG. 270A depicts an illustrative package template for a BusinessTransactionDocument 27000. Methods and systems consistent with the subject matter described herein use this package template to derive the interfaces unless otherwise specified. The package template includes a BusinessTransactionDocumentItem package 27002, a Log package 27004, a DeliveryExecutionInformation package 27006, a Party package 27008, a Location package 27010, a ProductInformation package 27012, a TransportInformation package 27014, a DeliveryInformation package 27016, a Scheduling package 27018, a CreditAgencyReportQueryService package 27020, a CreditWorthinessInformation package 27022, a LegalInformation package 27024, a LoanConditionInformation package 27026, a LoanPaymentPlan package 27028, a PaymentInformation package 27030, a PriceInformation package 27032, a Tax package 27034, a BusinessDocumentObjectReference package 27036, a FollowUpBusinessTransactionDocument package 27038, an AmountAccountingObjectSetAssignment package 27040, an Attachment package 27042, a Description package 27044, a FollowUpMessage package 27046, a HandlingUnit package 27048, and a PersonnelTimeSubsheet package 27050. The BusinessTransactionDocumentItem package 27002 includes a BusinessTransactionDocumentItemScheduleLine package 27052, a Log package 27054, a DeliveryExecutionInformation package 27056, a ProductInformation package 27058, a PriceInformation package 27060, a Batch package 27062, a Configuration package 27064, an Inventory package 27066, an InventoryChangeItemOutbound package 27068, an InventoryChangeItemInbound package 27070, a PropertyValuation package 27072, a LoanConditionInformation package 27074, a Tax package 27076, a Party package 27078, a Location package 27080, a Promotion package 27082, a PurchaseRequirementConfirmationItemExecutingPurchaseOrder package 27084, a CustomsInformation package 27086, a DeliveryInformation package 27088, a PaymentInformation package 27090, a BusinessDocumentObjectReference package 27092, an AmountAccountingObjectSetAssignment package 27094, an Attachment package 27096, and a Description package 27098.

FIG. 270B depicts an illustrative package template for a BusinessTransactionDocument 27000B for an SCM. The package template includes a BusinessTransactionDocumentItem package 27002B, a Party package 27004B, a Location package 27006B, a DeliveryInformation package 27008B, a Scheduling package 27010B, a PaymentInformation package 27012B, a BusinessDocumentObjectReference package 27014B, and a HandlingUnit package 27016B. The BusinessTransactionDocumentItem package 27002B includes a BusinessTransactionDocumentItemScheduleLine package 27018B, a BusinessTransactionDocumentItemScheduleLine package 27020B, a Release package 27022B, a Party package 27024B, a Location package 27026B, a ProductInformation package 27028B, a Batch package 27030B, an Inventory package 27032B, a Promotion package 27034B, a DeliveryInformation package 27036B, a PriceInformation package 27038B, a PropertyValuation package 27040B, and a Log package 27042B.

FIG. 270C depicts an illustrative package template for Master Data. The CataloguePublicationTransmission package template 27000C includes a Catalogue package 27002C. The Catalogue package 27002C includes a GlobalInformation package 27004C, a Model package 27006C, and a Content package 27008C. The Model package 27006C includes a PropertyDefinitionClass package 27010C, a PropertyDataType package 27012C, a Property package 27014C, a CatalogueItemProperty package 27016C, a CatalogueSectionType package 27018C, and a CatalogueSchema package 27020C. The Content package 27008C includes a CatalogueItem package 27022C and a CatalogueView package 27024C.

For example, to generate an Invoice Request using the BusinessTransactionDocument package template 27000 in FIG. 270A, the system initially selects the Log package 27004. After receiving an indication from the designer that the Log package 27004 is not required for the Invoice Request, the system removes the package from the package template. The system then selects the DeliveryExecutionInformation package 27006. After receiving an indication from the designer that the DeliveryExecutionInformation package 27006 is not required for the Invoice Request, the system removes this package from the package template, resulting in the BusinessTransactionDocument package depicted in FIG. 271. The system then selects the Party package 27008. After receiving an indication from the designer that the Party package 27008 is required for an Invoice Request, the system copies the entity template from the business object model into the Party package, as depicted in FIG. 272. The Party package entity template 27200 includes a BTDParty entity 27202, which is specialized into subtypes BTDBuyerParty entity 27204, BTDCreditorParty entity 27206, BTDSellerParty entity 27208, BTDDebtorParty entity 27210, BTDProductRecipientParty entity 27212, BTDVendorParty entity 27214, BTDManfacturerParty entity 27216, BTDPayerParty entity 27218, BTDPayeeParty entity 27220, BTDBillToParty entity 27222, BTDBillFromParty entity 27224, BTDCarrierParty entity 27226, BTDRequestorParty entity 27228, BTDPortalProviderParty entity 27230, BTDCatalogueProviderParty entity 27232, BTDBidderParty entity 27234, and BTDOwnerParty entity 27236.

The system starts by selecting the BTDBuyerParty entity 27204. After receiving an indication from the designer that the BTDBuyerParty entity 27204 is required in the Invoice Request, the system proceeds to the next entity, the BTDCreditorParty entity 27206. After receiving an indication from the designer that the BTDCreditorParty entity 27206 is not required for the Invoice Request, the system removes this entity from the Party package, resulting in the Party package depicted in FIG. 273. The system continues with the remaining entities of the Party package, and ultimately removes the BTDCreditorParty entity 27206, the BTDDebtorParty entity 27210, the BTDRequestorParty entity 27228, the BTDPortalProviderParty entity 27230, the BTDCatalogueProviderParty entity 27232, the BTDBidderParty entity 27234, and the BTDOwnerParty entity 27236. FIG. 274 depicts the Party package after the system removes the nonessential entities for the Invoice Request.

The system then retrieves the cardinality between the business transaction document and the entity from the business object model. In this example, the relevant portions of the business object model are depicted in FIG. 275. As depicted, the BusinessTransactionDocument package 27500 includes a BTDItem package 27502 and a BTDParty package 27504. The cardinality between the BusinessTransactionDocument entity 27506 and the BTDItem entity 27508, depicted by line 27510, indicates that there is a 1:cn relationship between the BusinessTransactionDocument entity 27506 and the BTDItem entity 27508 in the business object model. Because the designer may select a subset of this cardinality, the designer may select any cardinality between the BusinessTransactionDocument entity 27506 and the BTDItem entity 27508 in the Invoice Request. For the Invoice Request, the designer selects a 1:n relationship between the BusinessTransactionDocument entity 27604 and the BTDItem entity 27606, as depicted by the cardinality 27608, as depicted in FIG. 276.

The cardinality between the BusinessTransactionDocument entity 27506 and the BTDParty entity 27512, depicted by line 27514, indicates that there is a 1:cn relationship between the BusinessTransactionDocument entity 27506 and the BTDParty entity 27512. Thus, the designer may select any cardinality between the BusinessTransactionDocument entity 27506 and the BTDParty entity 27512 in the Invoice Request. As depicted in FIG. 276, the designer selects a 1:1 relationship between the BusinessTransactionDocument entity 27604 and the BillToParty entity 27610, as depicted by the cardinality 27608. The designer also selects a 1:1 relationship between the BusinessTransactionDocument entity 27604 and the BillFromParty entity 27614, as depicted by the cardinality 27610. The designer selects a 1:c relationship between the BusinessTransactionDocument entity 27604 and the BuyerParty entity 27618, the SellerParty entity 27622, the ProductRecipientParty entity 27626, the VendorParty entity 27630, the ManufacturerParty entity 27634, the PayerParty entity 27638, the PayeeParty entity 27642, and the CarrierParty entity 27646 as depicted by the cardinalities 27616, 27620, 27624, 27628, 27632, 27636, 27640, and 27644, respectively.

The system then selects the next package from the package template 27000 depicted in FIG. 271, i.e., the Location package 27010, and continues removing packages that are not required in an Invoice Request. The system ultimately removes the Log package 27004, the DeliveryExecutionInformation package 27006, the ProductInformation package 27012, the TransportInformation package 27014, the Scheduling package 27018, the CreditAgencyReportQueryService package 27020, the CreditWorthinessInformation package 27022, the LegalInformation package 27024, the LoanConditionInformation package 27026, the LoanPaymentPlan package 27028, the BusinessDocumentObjectReference package 27036, the FollowUpBusinessTransactionDocument package 27038, the AmountAccountingObjectSetAssignment package 27040, the FollowUpMessage package 27046, the HandlingUnit package 27048, and the PersonnelTimeSubsheet package 27050 from the BusinessTransactionDocument package 27000, and the Log package 27054, the DeliveryExecutionInformation package 27056, the Batch package 27062, the Configuration package 27064, the Inventory package 27066, the InventoryChangeItemOutbound package 27068, the InventoryChangeItemInbound package 27070, the PropertyValuation package 27072, the LoanConditionInformation package 27074, the Promotion package 27082, the PurchaseRequirementConfirmationItemExecutingPurchaseOrder package 27084, the CustomsInformation package 27086, the PaymentInformation package 27090, the AmountAccountingObjectSetAssignment package 27094, and the BusinessTransactionDocumentItemScheduleLine package 27052, from the BusinessTransactionDocumentItem package 27002. FIG. 277 depicts the package template after the system removes nonessential packages for the Invoice Request. FIG. 278 depicts the InvoiceRequest package after the system substitutes the "BusinessTransactionDocument" in the package template with "Invoice Request," i.e., the name of the interface.

Each interface may be represented either as a data model or an element structure. The data model depicts the layout of the interface. Thus, the data model illustrates the arrangement of the various elements within the interface. The element structure, on the other hand, provides the details regarding each of the elements of the interface.

The complete data model for the Invoice Request and Invoice Confirmation is depicted in FIGS. 279A-N. The data model includes an InvoiceMessage package 27900. The InvoiceMessage package 27900 includes a MessageHeader package 27902 and an Invoice package 27904. The InvoiceMessage package 27900 also includes an InvoiceMessage entity 27906. The message data type InvoiceMessage makes the structure available for the message types InvoiceRequest and InvoiceConfirmation, and the relevant interfaces.

A MessageHeader package groups together the business information that is relevant for sending a business document in a message. The MessageHeader package 27902 includes a MessageHeader entity 27908. There is a 1:c relationship 27910 between the InvoiceMessage entity 27906 and the MessageHeader entity 27908.

A MessageHeader entity 27908 groups business information from the perspective of the sending application to identify the business document in a message, to provide information about the sender, and to provide any information about the recipient. The MessageHeader entity 27908 is of type GDT BusinessDocumentMessageHeaderParty. The MessageHeader entity 27908 includes an ID, a ReferenceID, and a CreationDateTime. The ID is the identifier of a business document in a technical message, and is of type GDT BusinessDocumentMessageID. The ReferenceID is the identifier of another instance of a business document in a technical message that the business document references, and is of type GDT BusinessDocumentMessageID. The CreationDateTime is the creation date of a business document in the technical message, and is of type GDT DateTime. The MessageID is set by the sending application.

The MessageHeader entity 27908 also includes a SenderParty entity 27912 and a RecipientParty entity 27914. The SenderParty entity 27912 is the party responsible for sending a business document at the business application level. The SenderParty entity 27912 is of type GDT BusinessDocumentMessageHeaderParty. A RecipientParty entity 27914 is the party responsible for receiving a business document at business application level. The RecipientParty entity 27914 is of type GDT BusinessDocumentMessageHeaderParty. The SenderParty entity 27912 and the RecipientParty 27914 entity include additional information required by the parties 27916, 27918, as discussed in detail below. There is a 1:c relationship 27920 between the MessageHeader entity 27908 and the SenderParty entity 27912A, and a 1:c relationship 27922 between the MessageHeader entity 27908 and the RecipientParty entity 27914.

The Invoice package 27904 is a summary of the invoicing information required for the invoicing process. The Invoice package 27904 includes a Party package 27924, a Location package 27926, a DeliveryInformation package 27928, a PaymentInformation package 27930, a PriceInformation package 27932, a Tax package 27934, an Attachment package 27936, a Description package 27938, and an Item package 27940. The Invoice package 27904 also includes an Invoice entity 27942. There is a 1:1 relationship 27944 between the InvoiceMessage entity 27906 and the Invoice entity 27942.

The Invoice entity 27942 is a binding request from an invoicing party (such as vendor) to an invoice recipient (such as a sold-to-party) to make payment for the type and quantity of products or services received as a result of previous business transactions by a predefined date. The Invoice entity 27942 does not only specify the remuneration and tax to be paid by the participating business partners for products and services provided, but also gives detailed information about the payment conditions and delivery terms.

The Invoice entity 27942 includes an ID, a BillToID, a TypeCode, a DateTime, a CancellationInvoiceIndicator, an AcceptanceStatusCode, and a Note. The ID is the invoice number; a unique identifier that is assigned to the invoice by the invoicing party, and is of type GDT BusinessTransactionDocumentID. The BillToID is a unique identifier that is assigned to the invoice by the invoice recipient, and is of type GDT BusinessTransactionDocumentPartyID. The TypeCode is a coded representation for the invoice type (a specific invoice/payment request, debit memo, or credit memo), and is of type GDT BusinessTransactionDocumentTypeCode. The DateTime is the invoice date, and is of type GDT DateTime. The CancellationInvoiceIndicator is an indicator that specifies whether the invoice is a cancellation invoice or not, and is of type GDT InvoiceCancellationInvoiceIndicator. The AcceptanceStatusCode is a coded representation for the status of the invoice recipient's acceptance of the invoice, and is of type GDT AcceptanceStatusCode. The Note is a short description/name of the invoice, and is of type GDT Note. The Invoice is of type GDT Invoice.

The Party package 27924 groups together the business partners that can be involved in an invoicing process. The Party package 27924 includes a BillToParty entity 27946, a BillFromParty entity 27948, a BuyerParty entity 27950, a SellerParty entity 27952, a ProductRecipientParty entity 27954, a VendorParty entity 27956, a ManufacturerParty entity 27958, a PayerParty entity 27960, a PayeeParty entity 27962, and a CarrierParty entity 27964. There is a 1:1 relationship 27966 between the Invoice entity 27942 and the BillToParty entity 27946. There is a 1:1 relationship 27968 between the Invoice entity 27942 and the BillFromParty entity 27948. There is a 1:c relationship 27970 between the Invoice entity 27942 and the BuyerParty entity 27950. There is a 1:c relationship 27972 between the Invoice entity 27942 and the SellerParty entity 27952. There is a 1:c relationship 27974 between the Invoice entity 27942 and the ProductRecipientParty entity 27954. There is a 1:c relationship 27976 between the Invoice entity 27942 and the VendorParty entity 27956. There is a 1:c relationship 27978 between the Invoice entity 27942 and the ManufacturerParty entity 27958. There is a 1:c relationship 27980 between the Invoice entity 27942 and the PayerParty entity 27960. There is a 1:c relationship 27982 between the Invoice entity 27942 and the PayeeParty entity 27962. There is a 1:c relationship 27984 between the Invoice entity 27942 and the CarrierParty entity 27964.

The BillToParty is the company or person to which/whom the invoice is to be sent for deliveries received or services provided. The BillToParty entity 27946 is of type GDT BusinessTransactionDocumentParty. The BillToParty also can fulfill the functions of the BuyerParty, ProductRecipientParty, and PayerParty. The BillToParty entity 27946 includes an Address entity 27986 and a Contact entity 27988. There is a 1:c relationship 27990 between the BillToParty entity 27946 and the Address entity 27986. There is a 1:c relationship 27992 between the BillToParty entity 27946 and the Contact entity 27988.

The Address entity 27986 includes a PersonName entity 27994, an Office entity 27996, a PhysicalAddress entity 27998, a GeoCoordinates entity 27900A, and a Communication entity 27902A. There is a 1:c relationship 27904A between the Address entity 27986 and the PersonName entity 27994. There is a 1:c relationship 27906A between the Address entity 27986 and the Office entity 27996. There is a 1:c relationship 27908A between the Address entity 27986 and the PhysicalAddress entity 27998. There is a 1:c relationship 27910A between the Address entity 27986 and the GeoCoordinates entity 27900A. There is a 1:c relationship 27912A between the Address entity 27986 and the Communication entity 27902A.

The Contact entity 27988 includes an Address entity 27914A. There is a 1:c relationship 27916A between the Contact entity 27988 and the Address entity 27914A. Similar to the Address entity in the BillToParty entity 27946 discussed above, the Address entity 27914A in the Contact entity 27988 includes a PersonName entity 27918A, an Office entity 27920A, a PhysicalAddress entity 27922A, a GeoCoordinates entity 27924A, and a Communication entity 27926A. There is a 1:c relationship 27928A between the Address entity 27914A and the PersonName entity 27918A. There is a 1:c relationship 27930A between the Address entity 27914A and the Office entity 27920A. There is a 1:c relationship 27932A between the Address entity 27914A and the PhysicalAddress entity 27922A. There is a 1:c relationship 27934A between the Address entity 27914A and the GeoCoordinates entity 27924A. There is a 1:c relationship 27936A between the Address entity 27914A and the Communication entity 27926A.

Each of the BillFromParty entity 27948, the BuyerParty entity 27950, the SellerParty entity 27952, the ProductRecipientParty entity 27954, the VendorParty entity 27956, the ManufacturerParty entity 27958, the PayerParty entity 27960, the PayeeParty entity 27962, and the CarrierParty entity 27964 includes the same elements as that described for the BillToParty entity 27946 as denoted by ellipses 27938A, 27940A, 27942A, 27944A, 27946A, 27948A, 27950A, 27952A, and 27954A.

The BillFromParty is the company or person executing the invoicing process. The BillFromParty entity 27948 is of type GDT BusinessTransactionDocumentParty. The BillFromParty also can fulfill the function of the SellerParty, VendorParty, and PayeeParty.

The BuyerParty is the company or person authorizing the deliveries or services. The BuyerParty entity 27950 is of type GDT BusinessTransactionDocumentParty. If a BuyerParty is not specified explicitly in an invoice, the BillToParty also acts as the BuyerParty.

The SellerParty is the company or person selling (sales/service area). The SellerParty entity 27952 is of type GDT BusinessTransactionDocumentParty. If a SellerParty is not specified explicitly in an invoice, the BillFromParty also acts as the SellerParty.

The ProductRecipientParty is the company or person to which/whom goods are delivered or for which/whom services are provided. The ProductRecipientParty entity 27954 is of type GDT BusinessTransactionDocumentParty. If a ShipToLocation is not specified explicitly in an invoice, the address of the ProductRecipientParty is the delivery address. If a ProductRecipientParty is not specified explicitly in an invoice, the BuyerParty is also the ProductRecipientParty.

The VendorParty is the company or person delivering the goods or providing the service. The VendorParty entity 27956 is of type GDT BusinessTransactionDocumentParty. If a ShipFromLocation is not specified explicitly in an invoice, the address of the VendorParty is the ship-from address. If a VendorParty is not explicitly specified in an invoice, the SellerParty is also the VendorParty. The CarrierParty, not the VendorParty, is the company or person that is solely responsible for transporting the goods.

The ManufacturerParty is the company or person which/who produced the goods being invoiced. The ManufacturerParty entity 27958 is of type GDT BusinessTransactionDocumentParty. The ManufacturerParty can be used for invoice items relating to materials, and can be used to uniquely define the context of a ManufacturerProductID.

The PayerParty is the company or person that pays for the goods or services provided. The PayerParty entity 27960 is of type GDT BusinessTransactionDocumentParty. If a PayerParty is not specified explicitly in an invoice, the BillToParty also acts as the PayerParty.

The PayeeParty is the company or person that receives payment for the goods or services provided. The PayeeParty entity 27962 is of type GDT BusinessTransactionDocumentParty. If a PayeeParty is not specified explicitly in an invoice, the BillFromParty also acts as the PayeeParty.

The CarrierParty is the company or person that transported the goods. The CarrierParty entity 27964 is of type GDT BusinessTransactionDocumentParty. The CarrierParty is to be used for invoice items relating to materials; it can be ignored by the recipient in the case of items relating to services. In certain business transactions involving delivery across countries, the CarrierParty is required for fiscal law purposes.

The Location package 27926 groups together the of the locations that can occur in an invoicing process. The Location package 27926 includes a ShipToLocation entity 27956A and a ShipFromLocation entity 27958A. There is a 1:c relationship 27960A between the Invoice entity 27942 and the ShipToLocation entity 27956A. There is also a 1:c relationship 27962A between the Invoice entity 27942 and the ShipFromLocation entity 27958A.

The invoicing system uses locations that are specified at the Invoice level for the items for which corresponding locations are not explicitly transferred. The invoicing system can use the ShipToLocation entity 27956A and the ShipFromLocation entity 27958A to provide a more detailed description of the flow of goods between the delivery point and the dispatch point. In certain countries, such as the United States, this detailed information is required for calculating taxes.

The ShipToLocation is the location to which goods were delivered or where services were provided. The ShipToLocation entity 27956A is of type GDT BusinessTransactionDocumentLocation. For example, if a BuyerParty headquartered in California orders steel beams for a building located in Arizona, the tax amount is calculated using the tax rates that are valid in Arizona.

The ShipToLocation entity 27956A includes an Address entity 27964A. There is a 1:c relationship 27966A between the ShipToLocation entity 27956A and the Address entity

27964A. The Address entity 27964A includes a PersonName entity 27968A, an Office entity 27970A, a PhysicalAddress entity 27972A, a GeoCoordinates entity 27974A, and a Communication entity 27976A. There is a 1:c relationship 27978A between the Address entity 27964A and the PersonName entity 27968A. There is a 1:c relationship 27980A between the Address entity 27964A and the Office entity 27970A. There is a 1:c relationship 27982A between the Address entity 27964A and the PhysicalAddress entity 27972A. There is a 1:c relationship 27984A between the Address entity 27964A and the GeoCoordinates entity 27974A. There is a 1:c relationship 27986A between the Address entity 27964A and the Communication entity 27976A.

The ShipFromLocation 27958A is the location from which goods were shipped. The ShipFromLocation entity 27958A is of type GDT BusinessTransactionDocumentLocation. The ShipFromLocation entity 27958A includes the same entities 27988A as the ShipToLocation entity 27956A.

The DeliveryInformation package 27928 summarizes the information for a delivery in the invoicing process. The Delivery Information package 27928 includes a DeliveryTerms entity 27990A. There is a 1:c relationship 27992A between the Invoice entity 27942 and the DeliveryTerms entity 27990A. The DeliveryTerms are the conditions and agreements that are valid for executing the delivery and transporting the ordered goods and for the necessary services and activities. The DeliveryTerms entity 27990A is of type GDT DeliveryTerms.

The DeliveryTerms entity 27990A includes an Incoterms entity 27994A. There is a 1:c relationship 27996A between the DeliveryTerms entity 27990A and the Incoterms entity 27994A.

The PaymentInformation package 27930 summarizes the payment information in the invoicing process. The PaymentInformation package 27930 includes a CashDiscountTerms entity 27998A and a PaymentForm entity 27900B. There is a 1:c relationship 27902B between the Invoice entity 27942 and the CashDiscountTerms entity 27998A. There is a 1:c relationship 27904B between the Invoice entity 27942 and the PaymentForm entity 27900B.

The CashDiscountTerms includes the payment conditions (cash discount rates and payment deadlines). The CashDiscountTerms entity 27998A is of type GDT CashDiscountTerms. The CashDiscountTerms entity 27998A includes a MaximumDiscount entity 27906B and a NormalDiscount entity 27908B. There is a 1:c relationship 27910B between the CashDiscountTerms entity 27998A and the MaximumDiscount entity 27906B. There is a 1:c relationship 27912B between the CashDiscountTerms entity 27998A and the NormalDiscount entity 27908B.

The PaymentForm specifies the method of payment for a product. The PaymentForm entity 27900B includes the element PaymentFormCode, which is the coded representation of the payment form and is of type GDT PaymentFormCode. The PaymentForm entity 27900B includes a PaymentCard entity 27914B. There is a 1:c relationship 27916B between the PaymentForm entity 27900B and the PaymentCard entity 27914B.

The PriceInformation package 27932 summarizes the information about the total amount invoiced for the provided products or services, which are listed at item level. The Price is the total amount invoiced for products and services delivered or provided, including the tax and net portions. The Price entity includes a GrossAmount, a NetAmount, and a TaxAmount. The GrossAmount is the gross amount of an invoice (net amount plus tax amount), and is of type GDT Amount. The NetAmount is the net amount of an invoice, and is of type GDT Amount. The TaxAmount is the tax amount of an invoice, and is of type GDT Amount. The PriceInformation package 27932 includes a Price entity 27918B. There is a 1:c relationship 27920B between the Invoice entity 27942 and the Price entity 27918B.

The Tax package 27934 summarizes the information about the tax price components in the total amount invoiced for products delivered or services provided. The Tax package 27934 includes a ProductTax entity 27922B. There is a 1:cn relationship 27924B between the Invoice entity 27942 and the ProductTax entity 27922B. The ProductTax is the tax amount invoiced for products or services delivered or provided, cumulated for the invoice items. The ProductTax entity 27922B is of type GDT ProductTax.

The Attachment package 27936 groups together the attachment information relating to the invoice. The Attachment package 27936 includes an Attachment entity 27926B. There is a 1:cn relationship 27928B between the Invoice entity 27942 and the Attachment entity 27926B. The Attachment entity 27926B is a document of any type that relates to the invoice and is transferred with it, and is of type GDT Attachment.

The Description package 27938 groups together the explanatory texts relating to an invoice. The Description package 27938 includes a Description entity 27930B and a ConfirmationDescription entity 27932B. There is a 1:c relationship 27934B between the Invoice entity 27942 and the Description entity 27930B, and a 1:c relationship 27936B between the Invoice entity 27942 and the ConfirmationDescription entity 27932B. The Description is a natural language text relating to the invoice, which is visible to business parties. The Description entity 27930B is of type GDT Description. The Description can be used for the textual information relating to the invoice transferred. An example of this would be information stating that the Sales employee responsible is on vacation as of a specific date and indicating the name and telephone number of a substitute as of this date.

The ConfirmationDescription is a natural language text relating to the invoice confirmation, which is visible to business parties. The ConfirmationDescription entity 27932B is of type GDT Description. The invoicing system does not use ConfirmationDescription in an InvoiceRequest. The invoicing system can use the ConfirmationDescription for the textual information relating to the invoice confirmation. An example of this would be the invoice recipient's justification for rejecting a particular invoice.

The InvoiceItem package ("Item package") 27940 groups together the information about the amounts invoiced or credited for products, broken down according to the type and scope of the goods delivered or the services provided. The Item package 27940 includes a ProductInformation package 27938B, a PriceInformation package 27940B, a Tax package 27942B, a Party package 27944B, a Location package 27946B, a DeliveryInformation package 27948B, a BusinessTransactionDocumentReference package 27950B, an Attachment package 27952B, and a Description package 27954B. The Item package 27940 also includes an Item entity 27956B. There is a 1:n relationship 27958B between the Invoice entity 27942 and the Item entity 27956B. InvoiceItems 27956B are arranged hierarchically using a HierarchyRelationship 27960B. The HierarchyRelationship 27960B is the relationship between a sub-item and a higher-level parent item in an item hierarchy. There is a 1:cn relationship 27962B between the Item entity 27956B and its subordinate entities. There is a 1:c relationship 27964B between the Item entity 27956B and its superordinate entities.

HierarchyRelationship includes a ParentItemID, a ParentItemBillToID, and a TypeCode. The ParentitemID is the reference to a parent item with the item number assigned by the invoicing party. InvoiceItemHierarchyRelationshipParentItemID is of type GDT BusinessTransactionDocumentItemID. The ParentItemBillToID is the reference to a parent item with the item number assigned by the invoice recipient. InvoiceItemHierarchyRelationshipParentItemID is of type GDT BusinessTransactionDocumentItemID. The TypeCode is a coded representation of the hierarchical relationship between the sub-item and its higher-level parent item. InvoiceItemHierarchyRelationshipTypeCode is of type GDT BusinessTransactionDocumentItemHierarchyRelati onshipTypeC ode.

The InvoiceItem is part of an invoice containing the prices and taxes for the quantity of a product that has been delivered or for a service that has been provided. In addition, to the information about prices and taxes, the InvoiceItem includes information about the participating business partners, the payment conditions, and the delivery terms, if they differ from the information provided in the invoice header.

The InvoiceItem entity 27956B includes an ID, a BillToID, a TypeCode, a DeliveryPeriod, and a Quantity. The ID is an invoice item number; a unique identifier that is assigned to the invoice item by the invoicing party, and is of type GDT BusinessTransactionDocumentItemID. The BillToID is a unique identifier that is assigned to the invoice item by the invoice recipient, and is of type GDT BusinessTransactionDocumentItemPartyID. The TypeCode is a coded representation for the invoice item type (a specific invoice item, credit memo item, or shipping costs item), and is of type GDT BusinessTransactionDocumentItemTypeCode. The DeliveryPeriod is the delivery date of the products invoiced or the time period in which the service was provided, and is of type GDT DateTimePeriod. The Quantity is the quantity invoiced, and is of type GDT Quantity.

The InvoiceItemProductInformation package ("ProductInformation package") 27938B summarizes the information for identifying, describing, and classifying a product in an invoice item. The ProductInformation package 27938B includes a Product entity 27966B and a ProductCategory entity 27968B. There is a 1:c relationship 27970B between the Item entity 27956B and the Product entity 27966B. There is a 1:c relationship 27972B between the Item entity 27956B and the ProductCategory entity 27968B.

The Product identifies, describes, and classifies the product that has been invoiced. The Product entity 27966B is of type GDT BusinessTransactionDocumentProduct. With the exception of grouping hierarchy items, at least either the product number or product description (note) is specified when a new item is created. If both the product number and description are specified, the description is merely additional information in the message and can be ignored by the recipient.

The ProductCategory is the assignment of an invoiced product to a higher-level, business-specific category. The ProductCategory entity 27968B is of type GDT BusinessTransactionDocumentProductCategory. The product category is derived directly from the product if a product number is specified for the product. It can differ for the buyer and seller if they have classified the same product differently. This is allowed and should be tolerated by the systems involved.

The InvoiceItemPriceInformation package ("PriceInformation package") 27940B summarizes the information about the amount invoiced for a product delivered or a service provided, including the price components. The PriceInformation package 27940B includes a Price entity 27974B. There is a 1:1 relationship 27976B between the Item entity 27956B and the Price entity 27974B. The Price is the amount invoiced for a delivered product or a service provided, including the tax and net portions. The Price includes a GrossAmount, a NetAmount, a TaxAmount, a NetUnitPrice, an ExchangeRate, and a PricingDate. The GrossAmount is the gross amount of an item (net amount plus tax amount), and is of the type GDT Amount. The NetAmount is the net amount of an item, and is of the type GDT Amount. The TaxAmount is the tax amount of an item, and is of the type GDT Amount. The NetUnitPrice is the net price for the base quantity of a product and that was used to calculate the net amount. For example: € 10 for 5 pieces. The NetUnitPrice is of the type GDT Price. The ExchangeRate is information about the exchange rate, and is of the type GDT ExchangeRate. The PricingDate is the date on which the price is calculated, and is of the type GDT Date.

The Price entity 27974B also includes a Component entity 27978B. There is a 1:cn relationship 27980B between the Price entity 27974B and the Component entity 27978B. The invoicing system specifies the elements NetAmount and GrossAmount if the invoice item specified is not a grouping hierarchy item.

The Component is a non-fiscal part of a price in an invoice item. The Component entity 27978B is of type GDT PriceComponent. An invoice item can contain several price components. A detailed list of the price components (including, for instance, rounding difference clearing) is provided to help the invoice recipient understand the composition of the amount invoiced. In B2B standards, such as RosettaNet (PIP 3C3 version 1.1) or xCBL 3.0, price components are not available in this form. As a result, the usual elements in B2B standards, namely, GrossAmount and NetAmount, are stressed explicitly and are shown redundantly alongside the detailed list that includes price components. Taxes also are price components that are shown explicitly because of legal aspects. Tax information (ProductTax) is not shown redundantly. The Price entity includes a Component entity. There is a 1:cn relationship between the Price entity and the Component entity.

The InvoiceItemTax package ("Tax package") 27942B summarizes the information about the tax price components in the total amount invoiced for delivered products or services provided. The Tax package 27942B includes a ProductTax entity 27982B. There is a 1:cn relationship 27984B between the Item entity 27956B and the ProductTax entity 27982B. The ProductTax is a tax price component of an invoice item that is incurred for each tax type and rate. The ProductTax entity 27982B is of type GDT ProductTax.

The InvoiceItemParty package ("Party package") 27944B groups together the business partners that can be involved in an invoice item. These parties are different from the partners specified at the Invoice level. The Party package 27944B in the Item package 27940 includes a BuyerParty entity 27986B, a SellerParty entity 27988B, a ProductRecipientParty entity 27990B, a VendorParty entity 27992B, a ManufacturerParty entity 27994B, and a CarrierParty entity 27996B. There is a 1:c relationship 27998B between the Item entity 27956B and the BuyerParty entity 27986B. There is a 1:c relationship 27900C between the Item entity 27956B and the SellerParty entity 27988B. There is a 1:c relationship 27902C between the Item entity 27956B and the ProductRecipientParty entity 27990B. There is a 1:c relationship 27904C between the Item entity 27956B and the VendorParty entity 27992B. There is a 1:c relationship 27906C between the Item entity 27956B and the ManufacturerParty entity 27994B. There is a 1:c relationship 27908C between the Item entity 27956B and the CarrierParty entity 27996B. Each of these parties includes the same elements as those described for the BillToParty entity 27946 as denoted by ellipses 27910C, 27912C, 27914C, 27916C, 27918C, 27920C.

The Location package 27946B in the Item package 27940 includes a ShipToLocation entity 27922C and a ShipFromLocation entity 27924C. There is a 1:c relationship 27926C between the Item entity 27956B and the ShipToLocation entity 27922C. There is a 1:c relationship 27928C between the Item entity 27956B and the ShipFromLocation entity 27924C. The ShipToLocation entity 27922C and the ShipFromLocation entity 27924C include the same elements as those described for the ShipToLocation entity 27956A as denoted by ellipses 27930C, 27932C.

The DeliveryInformation package 27948B in the Item package 27940 includes a DeliveryTerms entity 27934C. There is a 1:c relationship 27936C between the Item entity 27956B and the DeliveryTerms entity 27934C. The DeliveryTerms entity 27934C includes an Incoterms entity 27938C. There is a 1:c relationship 27940C between the DeliveryTerms entity 27934C and the Incoterms entity 27938C.

The InvoiceItemBusinessTransactionDocumentReference package ("BusinessTransactionDocumentReference package") 27950B groups together the references to business documents that can be required in the invoicing process at item level. The BusinessTransactionDocumentReference package 27950B in the Item package 27940 includes a PurchaseOrderReference entity 27942C, a SalesOrderReference entity 27944C, a DeliveryReference entity 27946C, a ServiceAcknowledgementReference entity 27948C, an OriginInvoiceReference entity 27950C, a PurchaseContractReference entity 27952C, a SalesContractReference entity 27954C, a BuyerProductCatalogueReference entity 27956C, and a VendorProductCatalogueReference entity 27958C. There is a 1:cn relationship 27960C between the Item entity 27956B and the PurchaseOrderReference entity 27942C. There is a 1:cn relationship 27962C between the Item entity 27956B and the SalesOrderReference entity 27944C. There is a 1:c relationship 27964C between the Item entity 27956B and the DeliveryReference entity 27946C. There is a 1:c relationship 27966C between the Item entity 27956B and the ServiceAcknowledgementReference entity 27948C. There is a 1:c relationship 27968C between the Item entity 27956B and the OriginInvoiceReference entity 27950C. There is a 1:c relationship 27970C between the Item entity 27956B and the PurchaseContractReference entity 27952C. There is a 1:c relationship 27972C between the Item entity 27956B and the SalesContractReference entity 27954C. There is a 1:c relationship 27974C between the Item entity 27956B and the BuyerProductCatalogueReference entity 27956C. There is a 1:c relationship 27976C between the Item entity 27956B and the VendorProductCatalogueReference entity 27958C.

The PurchaseOrderReference is the reference to a purchase order or an item within a purchase order. The PurchaseOrderReference entity 27942C is of type GDT BusinessTransactionDocumentReference. The PurchaseOrderReference includes the purchase order number and purchase order item number assigned by the buyer. There can be more than one PurchaseOrderReference.

The SalesOrderReference is the reference to an order or an item within an order. The SalesOrderReference entity 27944C is of type GDT BusinessTransactionDocumentReference. The SalesOrderReference includes the order number and order item number assigned by the seller. There can be more than one SalesOrderReference.

The DeliveryReference is the reference to a delivery. The DeliveryReference entity 27946C is of type GDT BusinessTransactionDocumentReference. The DeliveryReference includes the delivery note number assigned by the seller.

The ServiceAcknowledgementReference is the reference to a confirmation that a service has been provided, which was created by the seller (for example, in the service entry system). The ServiceAcknowledgementReference entity 27948C is of type GDT BusinessTransactionDocumentReference. ServiceAcknowledgementReference includes the service acknowledgment number assigned by the service provider.

The OriginInvoiceReference is the reference to an invoice previously sent. The OriginInvoiceReference entity 27950C is of type GDT BusinessTransactionDocumentReference. An OriginInvoiceReference includes the invoice number assigned by the invoicing party. This reference is required if a credit memo is issued for an amount that has been invoiced.

The PurchaseContractReference is the reference to a purchase contract or an item within a purchase contract. The PurchaseContractReference entity 27952C is of type GDT BusinessTransactionDocumentReference. Provided it has not been agreed otherwise, the seller is responsible for determining the correct SalesContractReference for a specified PurchaseContractReference.

The SalesContractReference is the reference to a sales contract or an item within a sales contract. The SalesContractReference entity 27954C is of type GDT BusinessTransactionDocumentReference.

The BuyerProductCatalogueReference is the reference to a buyer's product Catalogue or an item within such a catalogue. The BuyerProductCatalogueReference entity 27956C is of type GDT CatalogueReference. The BuyerProductCatalogueReference is filled if an invoice item refers to a Catalogue whose number and item numbers were assigned by the buyer.

The VendorProductCatalogueReference is the reference to a seller's product Catalogue or an item within such a catalogue. The VendorProductCatalogueReference entity 27958C is of type GDT CatalogueReference. The invoicing system always fills VendorProductCatalogueReference if an invoice item refers to a Catalogue whose number and item numbers were assigned by the seller.

The Attachment package 27952B in the Item package 27940 includes an Attachment entity 27978C. There is a 1:cn relationship 27980C between the Item entity 27956B and the Attachment entity 27978C.

The Description package 27954B in the Item package 27940 includes a Description entity 27982C and a ConfirmationDescription entity 27984C. There is a 1:c relationship 27986C between the Item entity 27956B and the Description entity 27982C and a 1:c relationship 27988C between the Item entity 27956B and the ConfirmationDescription entity 27984C.

FIGS. 280A-K depict the element structure for the Invoice interfaces. The element structure is similar to the data model, but provides additional information regarding the details of the interface. The element structure identifies the different packages 28000 in the interface, and represents the entities at various levels within the interface. As depicted in FIGS. 280A-K, the Interface interfaces include five levels 28002, 28004, 28006, 28008, 28010. The element structure identifies the cardinality or occurrence 28012 between the entities and/or attributes of the interface, and provides information (i.e., type 28014 and name 28016) regarding the data type that provides the basis for the entity and/or attribute. The outermost package of this interface is an InvoiceMessage package 28018, which includes an InvoiceMessage entity 28020 at the first level 28002. The InvoiceMessage entity 28020 is of type message data type ("MDT") 28022 "InvoiceMessage" 28024.

The InvoiceMessage package 28018 includes a MessageHeader package 28026 and an Invoice package 28028. The MessageHeader package 28026 includes a MessageHeader entity 28030, which is of type generic data type ("GDT") 28034 "MessageHeader" 28036. There is one or zero 28032 MessageHeader entity 28030 for each InvoiceMessage entity 28020.

The MessageHeader entity 28030 includes a MessageID 28038, a ReferenceMessageID 28046, and a CreationDateTime 28054. The MessageID 28038 is of type GDT 28042 MessageID 28044. The ReferenceMessageID 28046 is of type GDT 28050 MessageID 28052. The CreationDateTime 28054 is of type GDT 28058 DateTime 28060. There is one 28040 MessageID 28038 for each MessageHeader entity 28030, one or zero 28048 ReferenceMessageID 28046 for each MessageHeader entity 28030, and one 28056 CreationDateTime 28054 for each MessageHeader entity 28030.

The MessageHeader entity 28030 also includes a SenderParty entity 28062 and a RecipientParty entity 28070. The SenderParty entity 28062 is of type GDT 28066 BusinessDocumentMessageHeaderParty 28068. The RecipientParty entity 28070 is also of type GDT 28074 BusinessDocumentMessageHeaderParty 28076. There is one or zero 28064 SenderParty entity 28062 for each MessageHeader entity 28030, and there is one or zero 28072 RecipientParty entity 28070 for each MessageHeader entity 28030.

The Invoice package 28028 includes an Invoice entity 28078. The Invoice entity 28078 is of type GDT 28080 Invoice 28081. There is one 28079 Invoice entity 28078 for each InvoiceMessage entity 28020. The Invoice entity 28078 includes an ID 28082, a BillToID 28090, a TypeCode 28098, a DateTime 28006A, a CancellationInvoiceIndicator 28014A, an AcceptanceStatusCode 28022A, and a Note 28030A. The ID 28082 is of type GDT 28086 BusinessTransactionDocumentID 28088. The BillToID 28090 is of type GDT 28094 BusinessTransactionDocumentID 28096. The TypeCode 28098 is of type GDT 28002A BusinessTransactionDocumentTypeCode 28004A. The DateTime 28006A is of type GDT 28010A DateTime 28012A. The CancellationInvoiceIndicator 28014A is of type GDT 28018A InvoiceCancellationInvoiceIndicator 28020A. The AcceptanceStatusCode 28022A is of type GDT 28026A AcceptanceStatusCode 28028A. The Note 28030A is of type GDT 28034A Note 28036A. There is one 28084 ID 28082 for each Invoice entity 28078. There is one or zero 28092 BillToID 28090 for each Invoice entity 28078. There is one 28000A TypeCode 28098 for each Invoice entity 28078. There is one 28008A DateTime 28006A for each Invoice entity 28078. There is one or zero 28016A CancellationInvoiceIndicator 28014A for each Invoice entity 28078. There is one or zero 28024A AcceptanceStatusCode 28022A for each Invoice entity 28078. There is one or zero 28032A Note 28030A for each Invoice entity 28078.

The Party package 28038A includes a BillToParty entity 28056A, a BillFromParty entity 28064A, a BuyerParty entity 28072A, a SellerParty entity 28080A, a ProductRecipientParty entity 28088A, a VendorParty entity 28096A, a ManufacturerParty entity 28004B, a PayerParty entity 28012B, a PayeeParty entity 28020B, and a CarrierParty entity 28028B. The BillToParty entity 28056A is of type GDT 28060A BusinessTransactionDocumentParty 28062A. There is one 28058A BillToParty entity 28056A for each Invoice entity 28078. The BillFromParty entity 28064A is of type GDT 28068A BusinessTransactionDocumentParty 28070A. There is one 28066A BillFromParty entity 28064A for each Invoice entity 28078. The BuyerParty entity 28072A is of type GDT 28076A BusinessTransactionDocumentParty 28078A. There is one or zero 28074A BuyerParty entity 28072A for each Invoice entity 28078. The SellerParty entity 28080A is of type GDT 28084A BusinessTransactionDocumentParty 28086A. There is one or zero 28082A SellerParty entity 28080A for each Invoice entity 28078. The ProductRecipientParty entity 28088A is of type GDT 28092A BusinessTransactionDocumentParty 28094A. There is one or zero 28090A ProductRecipientParty entity 28088A for each Invoice entity 28078. The VendorParty entity 28096A is of type GDT 28000B BusinessTransactionDocumentParty 28002B. There is one or zero 28098A VendorParty entity 28096A for each Invoice entity 28078. The ManufacturerParty entity 28004B is of type GDT 28008B BusinessTransactionDocumentParty 28010B. There is one or zero 28006B ManufacturerParty entity 28004B for each Invoice entity 28078. The PayerParty entity 28012B is of type GDT 28016B BusinessTransactionDocumentParty 28018B. There is one or zero 28014B PayerParty entity 28012B for each Invoice entity 28078. The PayeeParty entity 28020B is of type GDT 28024B BusinessTransactionDocumentParty 28026B. There is one or zero 28022B PayeeParty entity 28020B for each Invoice entity 28078. The CarrierParty entity 28028B is of type GDT 28032B BusinessTransactionDocumentParty 28034B. There is one or zero 28030B CarrierParty entity 28028B for each Invoice entity 28078.

The Location package 28040A includes a ShipToLocation entity 28036B and a ShipFromLocation entity 28044B. The ShipToLocation entity 28036B is of type GDT 28040B BusinessTransactionDocumentLocation 28042B. There is one or zero 28038B ShipToLocation entity 28036B for each Invoice entity 28078. The ShipFromLocation entity 28044B is of type GDT 28048B BusinessTransactionDocumentLocation 28050B. There is one or zero 28046B ShipFromLocation entity 28044B for each Invoice entity 28078.

The DeliveryInformation package 28042A includes a DeliveryTerms entity 28052B, which is of type GDT 28056B DeliveryTerms 28058B. There is one or zero 28054B DeliveryTerms entity 28052B for each Invoice entity 28078.

The PaymentInformation package 28044A includes a CashDiscountTerms entity 28060B, which is of type GDT 28064B CashDiscountTerms 28066B. There is one or zero 28062B CashDiscountTerms entity 28060B for each Invoice entity 28078. The PaymentInformation package 28044A also includes a PaymentForm entity 28068B, which if of type GDT 28071B PaymentForm 28072B. There is one or zero 28070B PaymentForm entity 28068B for each Invoice entity 28078.

The PriceInformation package 28046A includes a Price entity 28088B. There is one 28090B Price entity 28088B for each Invoice entity 28078. The Price entity 28088B includes a GrossAmount 28092B, a NetAmount 28000C, a TaxAmount 28008C and an ExchangeRate 28016C. The GrossAmount 28092B is of type GDT 28096B Amount 28098B. There is one 28094B GrossAmount 28092B for each Price entity 28088B. The NetAmount 28000C is of type GDT 28004C Amount 28006C. There is one or zero 28002C NetAmount 28000C for each Price entity 28088B. The TaxAmount 28008C is of type GDT 28012C Amount 28014C. There is one or zero 28010C TaxAmount 28008C for each Price entity 28088B. The ExchangeRate 28016C is of type GDT 28020C ExchangeRate 28022C. There is one or zero 28018C ExchangeRate 28016C for each Price entity 28088B.

The Tax package 28048A includes a ProductTax entity 28024C, which is of type GDT 28028C ProductTax 28030C. There are any number 28026C of ProductTax entities 28024C for each Invoice entity 28078.

The Attachment package 28050A includes an Attachment entity 28032C, which is of type GDT 28036C Attachment 28038C. There are any number 28034C of Attachment entities 28032C for each Invoice entity 28078.

The Description package 28052A includes a Description entity 28040C and a ConfirmedDescription entity 28048C. The Description entity 28040C is of type GDT 28044C Description 28046C. There is one or zero 28042C Description entity 28040C for each Invoice entity 28078. The ConfirmedDescription entity 28048C is of type GDT 28052C Description 28054C. There is one or zero 28050C ConfirmedDescription entity 28048C for each Invoice entity 28078.

The Item package 28054A includes an Item entity 28056C, which is of type GDT 28058C InvoiceItem 28059C. There is one or more 28057C Item entities 28056C for each Invoice entity 28078. The Item entity 28056C includes an ID 28060C, a BillToID 28068C, a TypeCode 28076C, a Quantity 28084C, a HierarchyRelationship 28092C, and a DeliveryPeriod 28012D. The ID 28060C is of type GDT 28064C BusinessTransactionDocumentItemID 28066C, and there is one 28062C ID 28060C for each Item entity 28056C. The BillToID 28068C is of type GDT 28072C BusinessTransactionDocumentItemPartyID 28074C, and there is one or zero 28070C BillToID 28068C for each Item entity 28056C. The TypeCode 28076C is of type GDT 28080C BusinessTransactionDocumentItemTypeCode 28082C, and there is one 28078C TypeCode 28076C for each Item entity 28056C. The Quantity 28084C is of type GDT 28088C Quantity 28090C, and there is one or zero 28086C Quantity 28090C for each Item entity 28056C. There is one or zero 28094C HierarchyRelationship 28092C for each Item entity 28056C. The HierarchyRelationship 28092C includes a ParentItemID 28096C, which is of type GDT 28000D BusinessTransactionDocumentItemID 28002C, and a TypeCode 28004D, which is of type CDT 28008D ItemHierarchyRelationshipTypeCode 28010D. There is one 28098C ParentItemID 28096C for each HierarchyRelationship 28092C, and there is one 28006D TypeCode 28004D for each HierarchyRelationship 28092C. The DeliveryPeriod entity 28012D is of type GDT 28016D DateTimePeriod 28018D, and there is one or zero 28014D DeliveryPeriod entity 28012D for each Item entity 28056C. The Item package 28054A also includes a ProductInformation package 28020D, a PriceInformation package 28022D, a Tax package 28024D, a Party package 28026D, a Location package 28028D, a DeliveryInformation package 28030D, a BusinessTransactionDocumentReference package 28032D, an Attachment package 28034D and a Description package 28036D.

The ProductInformation package 28020D includes a Product entity 28038D and a Product Category entity 28046D. The Product entity 28038D is of type GDT 28042D Product 28044D. There is one or zero 28040D Product entity 28038D for each Item entity 28056C. The ProductCategory entity 28046D is of type GDT 28050D ProductCategory 28052D. There is one or zero 28048D ProductCategory entity 28046D for each Item entity 28056C.

The PriceInformation package 28022D includes a Price entity 28054D. There is one or zero 28056D Price entity 28054D for each Item entity 28056C. The Price entity 28054D includes a GrossAmount 28058D, a NetAmount 28066D, a TaxAmount 28074D, and a NetUnitPrice 28082.

The GrossAmount 28058D is of type GDT 28062D Amount 28064D, and there is one or zero 28060D GrossAmounts 28058D for each Price entity 28054D. The NetAmount 28066D is of type GDT 28070D Amount 28072D, and there is one 28068D NetAmount 28066D for each Price entity 28054D. The TaxAmount 28074D is of type GDT 28078D Amount 28080D, and there is one or zero 28076D TaxAmount 28074D for each Price entity 28054D. The NetUnitPrice 28082D is of type GDT 28086D Price 28088D, and there is one or zero 28084D NetUnitPrice 28082D for each Price entity 28054D. The Price entity 28054D also includes a Component entity 28006E. There are any number 28008E of Component entities 28006E for each Price entity 28054D.

The Tax package 28024D includes a ProductTax entity 28014E, which is of type GDT 28018E ProductTax 28020E. There are any number 28016E of ProductTax entities 28014E for each Item entity 28056C.

The Party package 28026D includes a BuyerParty entity 28022E, a SellerParty entity 28030E, a ProductRecipientParty entity 28038E, a VendorParty entity 28046E, a ManufacturerParty entity 28054E, and a CarrierParty entity 28062E. The BuyerParty entity 28022E is of type GDT 28026E BusinessTransactionDocumentParty 28028E. There is one or zero 28024E BuyerParty entity 28022E for each Item entity 28056C. The SellerParty entity 28030E is of type GDT 28034E BusinessTransactionDocumentParty 28036E. There is one or zero 28032E SellerParty entity 28030E for each Item entity 28056C. The ProductRecipientParty entity 28038E is of type GDT 28042E BusinessTransactionDocumentParty 28044E. There is one or zero 28040E ProductRecipientParty entity 28038E for each Item entity 28056C. The VendorParty entity 28046E is of type GDT 28050E BusinessTransactionDocumentParty 28052E. There is one or zero 28048E VendorParty entity 28046E for each Item entity 28056C. The ManufacturerParty entity 28054E is of type GDT 28058E BusinessTransactionDocumentParty 28060E. There is one or zero 28056E ManufacturerParty entity 28054E for each Item entity 28056C. The CarrierParty entity 28062E is of type GDT 28066E BusinessTransactionDocumentParty 28068E. There is one or zero 28064E CarrierParty entity 28062E for each Item entity 28056C.

The Location package 28028D includes a ShipToLocation entity 28070E and a ShipFromLocation entity 28078E. The ShipToLocation entity 28070E is of type GDT 28074E BusinessTransactionDocumentLocation 28076E, and there is one or zero 28072E ShipToLocation entity 28070E for each Item entity 28056C. The ShipFromLocation entity 28078E is of type GDT 28082E BusinessTransactionDocumentLocation 28084E, and there is one or zero 28080E ShipFromLocation entity 28078E for each Item entity 28056C.

The DeliveryInformation package 28030D includes a DeliveryTerms entity 28086E, which is of type GDT 28090E DeliveryTerms 28092E. There is one or zero 28088E DeliveryTerms entity 28086E for each Item entity 28056C.

The BusinessTransactionDocumentReference package 28032D includes a PurchaseOrderReference entity 28094E, a SalesOrderReference entity 28002F, a DeliveryReference entity 28010F, a ServiceAcknowledgementReference entity 28018F, an OriginInvoiceReference entity 28026F, a PurchaseContractReference entity 28034F, a SalesContractReference entity 28042F, a BuyerProductCatalogueReference entity 28050F, and a SellerProductCatalogueReference entity 28058F. The PurchaseOrderReference entity 28094E is of type GDT 28098E BusinessTransactionDocumentReference 28000F. There are any number 28096E of PurchaseOrderReference entities 28094E for each Item entity 28056C. The SalesOrderReference entity 28002F is of type GDT 28006F BusinessTransactionDocumentReference 28008F. There are any number 28004F of SalesOrderReference entities 28002F for each Item entity 28056C. The DeliveryReference entity 28010F is of type GDT 28014F BusinessTransactionDocumentReference 28016F. There is one or zero 28012F DeliveryReference entity 28010F for each Item entity 28056C. The ServiceAcknowledgementReference entity 28018F is of type GDT 28022F BusinessTransactionDocumentReference 28024F. There is one or zero 28020F ServiceAcknowledgementReference entity 28018F for each Item entity 28056C. The OriginInvoiceReference entity 28026F is of type GDT 28030F BusinessTransactionDocumentReference 28032F. There is one or zero 28028F OriginInvoiceReference entity 28026F for each Item entity 28056C. The PurchaseContractReference entity 28034F is of type GDT 28038F BusinessTransactionDocumentReference 28040F. There is one or zero 28036F PurchaseContractReference entity 28034F for each Item entity 28056C. The SalesContractReference entity 28042F is of type GDT 28046F BusinessTransactionDocumentReference 28048F. There is one or zero 28044F SalesContractReference entity 28042F for each Item entity 28056C. The BuyerProductCatalogueReference entity 28050F is of type GDT 28054F CatalogueReference 28056F. There is one or zero 28052F BuyerProductCatalogueReference entity 28050F for each Item entity 28056C. The SellerProductCatalogueReference entity 28058F is of type GDT 28062F CatalogueReference 28064F. There is one or zero 28060F SellerProductCatalogueReference entity 28058F for each Item entity 28056C.

The Attachment package 28034D includes an Attachment entity 28066F, which is of type GDT 28070F Attachment 28072F. There are any number 28068F of Attachment entities 28066F for each Item entity 28056C.

The Description package 28038D includes a Description entity 28074F and a ConfirmedDescription entity 28082F. The Description entity 28074F is of type GDT 28078F Description 28080F. There is one or zero 28076F Description entity 28074F for each Item entity 28056C. The ConfirmedDescription entity 28082F is of type GDT 28086F Description 28088F. There is one or zero 28084F ConfirmedDescription entity 28082F for each Item entity 28056C.

An example of an Invoice Request message in XML is provided below:

```
<?xml version="1.0" encoding="utf-8" ?>
- <nr1:InvoiceRequest xmlns:nr1="sap.com/xi/SAPGlobal/Global">
- <MessageHeader>
  <ID schemeID="0402">00000004440000000020040723063339</ID>
  <CreationDateTime>2004-07-23T06:33:39Z</CreationDateTime>
- <SenderParty>
  <InternalID schemeID="PartnerID"
schemeAgencyID="E5S_300">6</InternalID>
  </SenderParty>
- <RecipientParty>
  <InternalID schemeID="PartnerID"
schemeAgencyID="E5S_300">1000</InternalID>
  </RecipientParty>
  </MessageHeader>
- <Invoice>
  <ID>NB1_LIM2</ID>
  <TypeCode>004</TypeCode>
  <DateTime>2004-06-30T12:00:00Z</DateTime>
  <Note>Nachbelastung zu Rechnung 442</Note>
- <BillToParty>
  <BillToID>6</BillToID>
  </BillToParty>
- <BillFromParty>
  <BillToID>1999</BillToID>
  </BillFromParty>
```

-continued

```
- <SellerParty>
  <BillToID>1000</BillToID>
  </SellerParty>
- <ProductRecipientParty>
  <BillToID>10754</BillToID>
  </ProductRecipientParty>
- <Price>
  <GrossAmount currencyCode="EUR">1.16</GrossAmount>
  </Price>
- <ProductTax>
  <TypeCode>VAT</TypeCode>
  <TypeDescription languageCode="de">16 %</TypeDescription>
  <BaseAmount currencyCode="EUR">1.0</BaseAmount>
  <Percent>16.0</Percent>
  <Amount currencyCode="EUR">0.16</Amount>
  <BusinessTransactionDocumentItemGroupID>V1
</BusinessTransactionDocumentItemGroupID>
  </ProductTax>
- <Item>
  <ID>1</ID>
  <TypeCode>002</TypeCode>
- <Product>
  <TypeCode>1</TypeCode>
  <Note>a1</Note>
  </Product>
- <ProductCategory>
  <BillToID>LOC01</BillToID>
  </ProductCategory>
  <Quantity unitCode="PCE">1.0</Quantity>
- <Price>
  <NetAmount currencyCode="EUR">1.0</NetAmount>
- <NetUnitPrice>
  <Amount currencyCode="EUR">1.0</Amount>
  <BaseQuantity unitCode="PCE">1.0</BaseQuantity>
  </NetUnitPrice>
- <ExchangeRate>
  <UnitCurrency>EUR</UnitCurrency>
  <QuotedCurrency>USD</QuotedCurrency>
  <Rate>1.16</Rate>
  </ExchangeRate>
  </Price>
- <ProductTax>
  <TypeCode>VAT</TypeCode>
  <TypeDescription languageCode="de">16 %</TypeDescription>
  <BaseAmount currencyCode="EUR">0.0</BaseAmount>
  <Amount currencyCode="EUR">0.0</Amount>
  <BusinessTransactionDocumentItemGroupID>V1
</BusinessTransactionDocumentItemGroupID>
  </ProductTax>
- <PurchaseOrderReference>
  <ID>6500000123</ID>
  <ItemID>1</ItemID>
  </PurchaseOrderReference>
  </Item>
  </Invoice>
  </nr1:InvoiceRequest>
```

6. Use of an Interface

The XI stores the interfaces (as an interface type). At runtime, the sending party's program instantiates the interface to create a business document, and sends the business document in a message to the recipient. The messages are preferably defined using XML. In the example depicted in FIG. 281, the Buyer 28100 uses an application 28106 in its system to instantiate an interface 28108 and create an interface object or business document object 28110. The Buyer's application 28106 uses data that is in the sender's component-specific structure and fills the business document object 28110 with the data. The Buyer's application 28106 then adds message identification 28112 to the business document and places the business document into a message 28102. The Buyer's application 28106 sends the message 28102 to the Vendor 28104. The Vendor 28104 uses an application 28114 in its system to receive the message 28102 and store the business document into its own memory. The Vendor's application 28114 unpacks the message 28102 using the corresponding interface 28116 stored in its XI to obtain the relevant data from the interface object or business document object 28118.

From the component's perspective, the interface is represented by an interface proxy 28200, as depicted in FIG. 282. The proxies 28200 shield the components 28202 of the sender and recipient from the technical details of sending messages 28204 via XI. In particular, as depicted in FIG. 283, at the sending end, the Buyer 28300 uses an application 28310 in its system to call an implemented method 28312, which generates the outbound proxy 28306. The outbound proxy 28306 parses the internal data structure of the components and converts them to the XML structure in accordance with the business document object. The outbound proxy 28306 packs the document into a message 28302. Transport, routing and mapping the XML message to the recipient 28304 is done by the routing system (XI, Netweaver, etc.).

When the message arrives, the recipient's inbound proxy 28308 calls its component-specific method 28314 for creating a document. The proxy 28308 at the receiving end downloads the data and converts the XML structure into the internal data structure of the recipient component 28304 for further processing.

As depicted in FIG. 284, a message 28400 includes a message header 28402 and a business document 28404. The message 28400 also may include an attachment 28406. For example, the sender may attach technical drawings, detailed specifications or pictures of a product to a purchase order for the product. The business document 28404 includes a business document message header 28408 and the business document object 28410. The business document message header 28408 includes administrative data, such as the message ID and a message description. As discussed above, the structure 28412 of the business document object 28410 is derived from the business object model 28414. Thus, there is a strong correlation between the structure of the business document object and the structure of the business object model. The business document object 28410 forms the core of the message 28400.

In collaborative processes as well as Q&A processes, messages should refer to documents from previous messages. A simple business document object ID or object ID is insufficient to identify individual messages uniquely because several versions of the same business document object can be sent during a transaction. A business document object ID with a version number also is insufficient because the same version of a business document object can be sent several times. Thus, messages require several identifiers during the course of a transaction.

As depicted in FIG. 285, the message header 28502 in message 28500 includes a technical ID ("ID4") 28506 that identifies the address for a computer to route the message. The sender's system manages the technical ID 28506.

The administrative information in the business document message header 28508 of the payload or business document 28504 includes a BusinessDocumentMessageID ("ID3") 28512. The business entity or component 28516 of the business entity manages and sets the BusinessDocumentMessageID 28512. The business entity or component 28516 also can refer to other business documents using the BusinessDocumentMessageID 28512. The receiving component 28516 requires no knowledge regarding the structure of this ID. The BusinessDocumentMessageID 28512 is, as an ID, unique. Creation of a message refers to a point in time. No versioning is expressed by the ID. Besides the BusinessDocumentMessageID 28512, there also is a business document object ID 28514, which may include versions.

The component 28516 also adds its own component object ID 28518 when the business document object is stored in the component. The component object ID 28518 identifies the business document object when it is stored within the component. However, not all communication partners may be aware of the internal structure of the component object ID 28518. Some components also may include a versioning in their ID 28518.

The ReferencedMessageID refers to a previous message. For example, as depicted in FIG. 286, a response 28602 to a message 28600 includes a referenced message ID 28604 referring to the original message. Moreover, documents from previous transactions may be referenced in a message. The BusinessDocumentMessageID 28606 refers to such documents. For example, as depicted in FIG. 287, an order response or order change 28700 includes an ID 28702 referring to the original Quote 28704 or an ID 28706 referring to the original Vendor Contract 28708 within the Business Transaction Document ID.

7. Use of Interfaces Across Industries

Methods and systems consistent with the subject matter described herein provide interfaces that may be used across different business areas for different industries. For example, FIG. 310 depicts the message choreography 31000 for an Order to Invoice scenario between a buyer 31002 and seller 31004. The buyer 31002 creates a purchase order request 31006, and sends a PurchaseOrderRequest 31008 to the seller 31004 to deliver goods or render services. The message type 31010 of the PurchaseOrderRequest 31008 is 0101, as defined above. In response, the seller 31004 confirms the purchase order request 31012, and sends a PurchaseOrderConfirmation 31014 to the buyer 31002. The message type 31016 of the PurchaseOrderConfirmation 31014 is 0104.

The buyer 31002 may change the purchase order 31018 by sending a PurchaseOrderChangeRequest 31020 to the seller 31004. The message type 31022 of the PurchaseOrderChangeRequest 31020 is 0102. In response, the seller 31004 may confirm the purchase order 31024 by sending a PurchaseOrderConfirmation 31026 to the buyer 31002. The message type 31028 of the PurchaseOrderConfirmation 31026 is 0104.

The seller 31004 may change a purchase order 31030 by sending a PurchaseOrderConfirmation 31032 to the buyer 31002. The message type 31034 of the PurchaseOrderConfirmation 31032 is 0104. In response, the buyer updates the purchase order request 31036.

The buyer 31002 may cancel a purchase order 31038 by sending a PurchaseOrderCancellationRequest 31040 to the seller 31004. The message type 31042 of the PurchaseOrderCancellationRequest 31040 is 0103. In response, the seller 31004 may confirm the purchase order cancellation 31044 by sending a PurchaseOrderConfirmation 31046 to the buyer 31002. The message type 31048 of the PurchaseOrderConfirmation 31046 is 0104.

The seller 31004 may create a despatched delivery 31050 and send a DespatchedDeliveryNotification 31052 to the buyer 31002. The message type 31054 of the DespatchedDeliveryNotification 31052 is 0202. In response the buyer 31002 receives the despatched delivery 31056.

The seller 31004 may create an invoice 31058 and send an InvoiceRequest 31060 to the buyer 31002. The message type 31062 of the InvoiceRequest 31060 is 0401. In response, the buyer 31002 receives the invoice 31064, and may send an InvoiceConfirmation 31066 to the seller 31004. The message type 31068 of the InvoiceConfirmation 31066 is 0401.

The buyer 31002 may create payment advice 31070 and send a PaymentAdviceNotification 31072 to the seller 31004, who receives the payment advice 31076. The message type 31074 of the PaymentAdviceNotification 31072 is 0442. The buyer 31002, after receiving delivery 31078, may send a ReceiptDeliveryNotification 31080 to the seller 31004 to confirm delivery 31084. The message type 31082 of the ReceiptDeliveryNotification 31080 is 0203.

The interfaces derived using methods and systems consistent with the subject matter described herein also may be mapped for use under various standards. For example, FIG. 311 depicts the message choreography 31100 for an Order to Invoice scenario provided by RosettaNet, i.e., the high tech industry standard. As shown, the buyer 31102 creates a purchase order (requisition) 31106, and sends a PurchaseOrderRequest 31108 to the seller 31104. The message type of the PurchaseOrderRequest 31108 is 0101, which corresponds to RosettaNet's PIP3A4 message type 31110. In response, the seller 31104 confirms the purchase order request 31112, and sends a PurchaseOrderConfirmation 31114 to the buyer 31102. The message type of the PurchaseOrderConfirmation 31114 is 0104, which corresponds to RosettaNet's PIP3A4 message type 31116.

The buyer 31102 may then change the purchase order 31118 by sending a PurchaseOrderChangeRequest 31120 to the seller 31104. The message type of the PurchaseOrderChangeRequest 31120 is 0102, which corresponds to RosettaNet's PIP3A8 message type 31122. In response, the seller 31104 may confirm the purchase order 31124 by sending a PurchaseOrderConfirmation 31126 to the buyer 31102. The message type of the PurchaseOrderConfirmation 31126 is 0104, which corresponds to RosettaNet's PIP3A8 message type 31128.

The seller 31104 may change a purchase order 31130 by sending a PurchaseOrderConfirmation 31132 to the buyer 31102. The message type of the PurchaseOrderConfirmation 31132 is 0104, which corresponds to RosettaNet's PIP3A7 message type 31134. In response, the buyer 31102 updates the purchase order request 31136.

The buyer 31102 may cancel a purchase order 31138 by sending a PurchaseOrderCancellationRequest 31140 to the seller 31104. The message type of the PurchaseOrderCancellationRequest 31140 is 0103, which corresponds to RosettaNet's PIP3A9 message type 31142. In response, the seller 31104 may confirm the purchase order cancellation 31144 by sending a PurchaseOrderConfirmation 31146 to the buyer 31102. The message type of the PurchaseOrderConfirmation 31146 is 0104, which corresponds to RosettaNet's PIP3A9 message type 31148.

The seller 31104 may create an ASN 31150 and send a DespatchedDeliveryNotification 31152 to the buyer 31102. The message type of the DespatchedDeliveryNotification 31152 is 0202, which corresponds to RosettaNet's PIP3B2 message type 31154. In response, the buyer 31102 receives the ASN 31156.

The seller 31104 may create an invoice 31158 and send an InvoiceRequest 31160 to the buyer 31102. The message type of the InvoiceRequest 31160 is 0401, which corresponds to RosettaNet's PIP3C3 message type 31162. In response, the buyer 31102 receives the invoice 31164.

The buyer 31102 may create a remittance 31166 and send a PaymentAdviceNotification 31168 to the seller 31104, who receives the payment advice 31172. The message type of the PaymentAdviceNotification 31168 is 0442, which corresponds to RosettaNet's PIP3C6 message type 31170.

FIG. 312 depicts the message choreography 31200 for an Order to Invoice scenario provided by CIDX, i.e., the chemical industry standard. As shown, the buyer 31202 creates a purchase order (requisition) 31206, and sends a PurchaseOrderRequest 31208 to the seller 31204. The message type of the PurchaseOrderRequest 31208 is 0101, which corresponds to CIDX's OrderCreate message 31210. In response, the seller 31204 confirms the purchase order 31212, and sends a PurchaseOrderConfirmation 31214 to the buyer 31202. The message type of the PurchaseOrderConfirmation 31214 is 0104, which corresponds to CIDX's OrderResponse message 31216.

The buyer 31202 may change the purchase order 31218 by sending a PurchaseOrderChangeRequest 31220 to the seller 31204. The message type of the PurchaseOrderChangeRequest 31220 is 0102, which corresponds to CIDX's OrderChange message 31222. In response, the seller 31204 may confirm the purchase order 31224 by sending a PurchaseOrderConfirmation 31226 to the buyer 31202. The message type of the PurchaseOrderConfirmation 31226 is 0104, which corresponds to CIDX's OrderResponse message 31228.

The seller 31204 may change a purchase order 31230 by sending a PurchaseOrderConfirmation 31232 to the buyer 31202. The message type of the PurchaseOrderConfirmation 31232 is 0104, which corresponds to CIDX's OrderResponse message 31234. In response, the buyer 31202 updates the purchase order request 31236.

The seller may create an ASN 31238 and send a DespatchedDeliveryNotification 31240 to the buyer 31202. The message type of the DespatchedDeliveryNotification 31240 is 0202, which corresponds to CIDX's ShipNotice message 31242. In response the buyer 31202 receives the ASN 31244.

The seller 31204 may create an invoice 31246 and send an InvoiceRequest 31248 to the buyer 31202. The message type of the InvoiceRequest 31248 is 0401, which corresponds to CIDX's Invoice message 31250. In response, the buyer 31202 receives the invoice 31252, and may send an InvoiceConfirmation 31254 to the seller 31204. The message type of the InvoiceConfirmation 31254 is 0203, which corresponds to CIDX's InvoiceResponse message 31256.

After receiving delivery 31258, the buyer 31202 may send a ReceiptDeliveryNotification 31260 to the seller 31204, who confirms delivery 31264. The message type of the ReceiptDeliveryNotification 31260 is 0203, which corresponds to CIDX's ReceiptNotice message 31262.

A table identifying the relationship between the interfaces derived using methods and systems consistent with the subject matter described herein and the interfaces provided by RosettaNet and CIDX is shown below. The number in the brackets identifies the number of fields within the interface.

| Interface | RosettaNet | CIDX |
|---|---|---|
| MT101 PurchaseOrderRequest | PIP3A4 PurchaseOrder Request (557) | OrderCreate (1030) |
| MT102 PurchaseOrderChangeRequest | PIP3A8 PurchaseOrder ChangeRequest (627) | OrderChange (1000) |
| MT103 PurchaseOrderCancellationRequest | PIP3A9 PurchaseOrder CancellationRequest (31) | OrderChange (all Items deleted) |

-continued

| Interface | RosettaNet | CIDX |
|---|---|---|
| MT104 PurchaseOrderConfirmation | PIP3A4 PurchaseOrder Confirmation (712) | OrderResponse (1020) |
| MT104 PurchaseOrderConfirmation | PIP3A8 PurchaseOrder ChangeConfirmation (743) | |
| MT104 PurchaseOrderConfirmation | PIP3A7 PurchaseOrder UpdateNotification (745) | |
| MT104 PurchaseOrderConfirmation | PIP3A9 PurchaseOrder CancellationConfirmation (34) | |
| MT202 DespatchedDeliveryNotification | PIP3B2 AdvanceShipment otification (253) | ShipNotice (1000) |
| MT203 ReceivedDeliveryNotification | | ReceiptNotice (640) (Delivery Receipt, Delivery Receipt Response) |
| MT401 InvoiceRequest | PIP3C3 InvoiceNotification (391) | Invoice (800) |
| MT402 InvoiceConfirmation | | InvoiceResponse (350) |
| MT442 PaymentAdviceNotification | PIP3C6 RemittanceAdvice otification (117) | |

As illustrated above, the interfaces derived using methods and systems consistent with the subject matter described herein may be mapped onto the interfaces of different industry standards. Unlike the interfaces provided by any given standard that do not include the interfaces required by other standards, methods and systems consistent with the subject matter described herein provide a set of consistent interfaces that correspond to the interfaces provided by different industry standards. Due to the different fields provided by each standard, the interface from one standard does not easily map onto another standard. By comparison, to map onto the different industry standards, the interfaces derived using methods and systems consistent with the subject matter described herein include most of the fields provided by the interfaces of different industry standards. Any missing fields may easily be included into the business object model. Thus, by derivation, the interfaces can be extended consistently by these fields. Thus, methods and systems consistent with the subject matter described herein provide consistent interfaces that can be used across different industry standards.

C. Exemplary Interfaces a) Purchase Requirement Interfaces

Purchase requirement interfaces are used to exchange purchase requisitions for products (materials, services) between a requester (in the PTS scenario, an MRP controller, for example) and a buyer, and confirmations that these requisitions have been fulfilled.

The motivating business scenario for the PurchaseRequirementRequest and PurchaseRequirementConfirmation interfaces is the Procure to Stock (PTS) scenario. In the PTS scenario, a planning system (SCP) or the "requester," generates purchase requisitions that are procured externally by a procurement system (SRM) or the "buyer."

(1) Message Types

Two messages types are available for mapping an A2A requisition process: (1) the message type PurchaseRequirementRequest is sent from the requester (a requirements planner in the PTS scenario or a planning/requirements system, for example) to the buyer and is used to start a new requirements process. From now on, this document will simply use the terms 'requester' and 'buyer'; and (2) the message type PurchaseRequirementConfirmation is sent from the buyer to the requester. It informs the requester of the extent to which the requirement has been fulfilled.

(a) Purchase Requirement Request

A PurchaseRequirementRequest is a request from a requester asking a buyer to procure products (materials or services) externally. The structure of the message type PurchaseRequirementRequest is specified by the message data type PurchaseRequirementMessage. A PurchaseRequirementRequest message results in the relevant requisition being created or changed in the procurement system. The procurement system accepts changes made to a requisition (except for technical errors). If the procurement system (buyer) cannot procure a requisition or partial quantity of a requisition (rejection), the procurement system indicates this by outputting the PurchaseRequirementConfirmation message.

(b) Purchase Requirement Confirmation

A PurchaseRequirementConfirmation is a confirmation of the buyer that informs the requester of the extent to which a requisition has been fulfilled. The structure of the message type PurchaseRequirementConfirmation is specified by the message data type PurchaseRequirementMessage. If a procurement system (buyer) cannot fulfil a requisition or partial quantity of a requisition, the buyer indicates this by outputting the PurchaseRequirementConfirmation message. The buyer cannot cancel a rejection of a requisition.

(2) Message Choreography

FIG. 288 depicts the message choreography for an exemplary purchase requisition process. The purchase requisition process uses purchase requirement interfaces to exchange purchase requisitions for products (such as materials and/or services) between a requester 28802 (such as, an MRP controller, for example in the PTS scenario) and a buyer 28804, and to exchange confirmations that these requisitions have been fulfilled. The buyer 28804 may then interface with a supplier 28806 for actual purchase of the requested products.

The requester 28802 starts the requisition process by sending a PurchaseRequirementRequest message 28808 to the buyer 28804. The PurchaseRequirementRequest message 28808 requests the buyer 28804 to fulfil a requisition generated by the requester 28802. The requisition system uses the PurchaseRequirementRequest message 28808 when requisitions are created or changed. The buyer 28804 uses the PurchaseRequirementConfirmation message 28810 to tell the requester 28802 the status of the requisition. For example, the PurchaseRequirementConfirmation message 28810 may indicate which follow-on documents for each item have been created and how much of the required quantity has been procured. The PurchaseRequirementConfirmation message 28810 may also include information regarding whether a requisition or partial quantity of a requisition can no longer be fulfilled.

The PurchaseRequirementConfirmation message 28810 may need to be communicated in specified circumstances. If the requirements-generating system manages the relevant follow-on documents itself or receives a copy of them and can carry out quantity offsetting in the requisition (as in the PTS scenario), the requirements-generating system requires the PurchaseRequirementConfirmation message 28810 if the requisition or a remaining quantity can no longer be procured. The procurement system sends the PurchaseRequirement-Confirmation message 28810 if a purchase requisition item has been changed (once a purchase order with reference to a requisition has been created or changed, for example). The current procurement status may be transferred in full with every PurchaseRequirementRequest message 28808.

(3) Message Data Type Purchase Requirement Message

FIG. 289 shows a data model for the Purchase Requirement Request. The message data type PurchaseRequirementMessage includes a PurchaseRequirementMessage package 28900 that groups together the business information relevant for sending a business document in a message and the PurchaseRequirement object in the business document. It includes a MessageHeader package 28902, a PurchaseRequirement package 28904, and a PurchaseRequirementMessage entity 28906.

The MessageHeader package 28902 groups together the business information relevant for sending a business document in a message. This package is typically not used and, therefore, typically remains empty.

The PurchaseRequirement package 28904 groups together a Party package 28908, a Location package 28910, an Item package 28912, and a PurchaseRequirement entity 28914. There is a 1:1 relationship between the PurchaseRequirementMessage entity 28906 and the PurchaseRequirement entity 28914.

A PurchaseRequirement entity 28914 is a requirement for procuring products (materials or services). The PurchaseRequirement entity 28914 is subdivided into PurchaseRequirementItems entities 28964 that each specify an ordered product or additional information relevant for such a product, such as information about product category or value limits. In addition to the buying party and the seller as well as the proposed seller, additional parties can be involved in the PurchaseRequirement. Locations can be specified for the PurchaseRequirement delivery. PurchaseRequirement entity 28914 is of type GDT: PurchaseRequirement.

The PurchaseRequirement entity 28914 includes an ID, a CreationDateTime, and a Note. The ID is a unique identifier assigned by the requisition system for the requisition. The ID is of type GDT: BusinessTransactionDocumentID. The CreationDateTime is the time at which the requisition was created in the requisition system. The CreationDateTime is of type GDT: DateTime. The Note is a short description/name for the requisition. The Note is of type GDT: Note.

(a) Purchase Requirement Party Package

Party package 28908 groups together the business parties involved in the PurchaseRequirement. It includes a BuyerParty entity 28916, a SellerParty entity 28918, a ProposedSellerParty entity 28920, a RequestorParty entity 28922, a ProductRecipientParty entity 28924, and a ManufacturerParty entity 28926. There is a 1:c relationship 28928 between the PurchaseRequirement entity 28914 and the BuyerParty entity 28916. There is a 1:c relationship 28930 between the PurchaseRequirement entity 28914 and the SellerParty entity 28918. There is a 1:c relationship 28932 between the PurchaseRequirement entity 28914 and the ProposedSellerParty entity 28920. There is a 1:c relationship 28934 between the PurchaseRequirement entity 28914 and the RequestorParty entity 28922. There is a 1:c relationship 28936 between the PurchaseRequirement entity 28914 and the ProductRecipientParty entity 28924. There is a 1:c relationship 28938 between the PurchaseRequirement entity 28914 and the ManufacturerParty entity 28926.

Either the ID or the ID and address can be transferred for each party. If the ID is transferred, the ID address defined in the master data is used. If the ID and address are transferred, the ID identifies the party and the address is deemed to be a document address that is different to the master data address. Where possible, the ID and address should be sent to avoid misunderstandings. The receiving application should implement a suitable optimization strategy to prevent many identical document addresses from being created.

A default logic is used for parties: from the header to the items and within item hierarchies. Parties specified in the header are valid for the items for which a corresponding party is not explicitly transferred and that are directly assigned to the header. In accordance with the same logic, parties transferred at item level are used for subitems assigned to the relevant item in an item hierarchy. The default logic applies for the party as a whole, including the contact person. Parts of a party specified at header level or for a hierarchy item cannot be specified in more detail at item level. The default logic is a simplified version of the transferred message. As regards logic, parties at header level and for hierarchy items behave as if they have been explicitly transferred for the subitems of the message.

(i) Buyer Party

A BuyerParty entity 28916 is a party that buys goods or services. The BuyerParty entity 28916 is of type GDT: BusinessTransactionDocumentParty, although it includes the StandardID and InternalID elements, as well as the Address and ContactPerson entities. The ContactPerson includes the InternalID element and the Address entity.

The BuyerParty is specified if more than one company processes its purchases in the recipient system (hosting scenario). In the other cases, the BuyerParty is unique and does not need to be specified. Changes can be made to the BuyerParty/Contact and a different BuyerParty/Contact can exist for each item. Changes can be made to the address of the BuyerParty, but different addresses are not permitted for each item. If the ShipToLocation, ShipToParty, and RequestorParty have not been explicitly specified in the requisition process, the address of the BuyerParty is used as the ship-to address.

(ii) Seller Party

A SellerParty entity 28918 is a party that sells goods or services. The SellerParty entity 28918 is of type GDT: BusinessTransactionDocumentParty, although it includes the StandardID and InternalID elements, as well as the Address and ContactPerson entities. The ContactPerson includes the InternalID element and the Address entity. If the SellerParty and ShipFromLocation have not been explicitly specified in the requisition process, the address of the SellerParty is used as the ship-from address. If the SellerParty is specified, it is used as the vendor when the requirement is generated in the procurement system (unlike the preferred vendor). The SellerParty is normally specified when the vendor was identified in the requirements system by a source of supply. In this case, the relevant source of supply is also specified in the corresponding BusinessTransactionDocumentReferencePackage entity.

(iii) Proposed Seller Party

A ProposedSellerParty entity 28920 is a preferred party for selling goods or services. The ProposedSellerParty entity 28920 is of type GDT: BusinessTransactionDocumentParty, although it includes the StandardID and InternalID elements, as well as the Address and ContactPerson entities. The ContactPerson includes the InternalID element and the Address entity. When a requisition is created, a user can specify a preferred vendor. In the procurement system, the professional buyer can use the preferred vendor as the actual vendor.

(iv) Requestor Party

A RequestorParty entity 28922 is a party that requests the procurement of goods or services. The RequestorParty entity 28922 is of type GDT: BusinessTransactionDocumentParty, although it includes the StandardID and InternalID elements, as well as the Address and ContactPerson entities. The ContactPerson includes the InternalID element and the Address entity. If a ShipToLocation and ProductRecipientParty are not explicitly specified in the requisition process, the RequestorParty address is used as the ship-to address. In the purchasing process, the RequestorParty (requestor) carries out different follow-up actions. For this reason, it is specified explicitly (and not just as the Contact). In a SelfService process, the RequestorParty could enter and approve a goods receipt and invoice, for example.

(v) Product Recipient Party

A ProductRecipientParty entity 28924 is a party to which goods are delivered or for whom services are provided. The ProductRecipientParty entity 28924 is of type GDT: BusinessTransactionDocumentParty, although it includes the StandardID and InternalID elements, as well as the Address and ContactPerson entities. The ContactPerson includes the InternalID element and the Address entity. If a ShipToLocation is not specified explicitly in a requisition process, the address of the ProductRecipientParty is used as the delivery address. If the ProductRecipientParty (goods recipient) is not specified at item or header level, the RequestorParty is also used as the ProductRecipientParty. For a direct material item, the ProductRecipientParty is optional. The ShipToLocation, however, is mandatory. In the third-party process (see BusinessTransactionDocumentItemThirdPartyDealIndicator), the ProductRecipientParty is the customer. The ProductRecipientParty is not synonymous with the ShipToLocation and is to be used when the ProductRecipientParty (company or person) is actually different from the BuyerParty.

(vi) Manufacturer Party

A ManufacturerParty entity 28926 is a party that manufactures goods. The ManufacturerParty entity 28926 is of type GDT: BusinessTransactionDocumentParty, although it includes the StandardID and InternalID elements, as well as the Address and ContactPerson entities. The ContactPerson includes the InternalID element and the Address entity. The ManufacturerParty can be used for Material items with regard to the ManufacturerParty, the default logic (from header to item to subitems) is used for material items; for other items, the ManufacturerParty is ignored. The ManufacturerParty can be used to uniquely define the context of a ManufacturerProductID.

(b) Purchase Requirement Location Package

The Location package 28910 groups together the locations that are relevant for the requisition. The LocationPackage 28910 includes a ShipToLocation entity 28940 and a ShipFromLocation entity 28942. There is a 1:c relationship 28944 between the PurchaseRequirement entity 28914 and the ShipToLocation entity 28940. There is a 1:c relationship 28946 between the PurchaseRequirement entity 28914 and the ShipFromLocation entity 28942.

A similar default logic to that used for Parties is also used for locations. Either the ID or the address, or both can be transferred for each location. If the ID is transferred, the ID address defined in the master data is used (if necessary, a new master record is created for the message recipient). If the address is transferred, it is this address that is used (if necessary, a location is assigned at the address recipient). If the ID and address are transferred, the ID identifies the location and the address is deemed to be a document address that is different to the master data address. Where possible, the ID and address should be sent to avoid misunderstandings. The receiving application should implement a suitable optimization strategy to prevent many identical document addresses from being created.

(i) Ship To Location

A ShipToLocation entity 28940 is the location to which goods are to be delivered or where services are to be provided. The ShipToLocation entity 28940 is of type GDT: BusinessTransactionDocumentLocation, although it includes the StandardID and InternalID elements, as well as the Address entity. In a direct material item, the ShipToLocation ID is specified.

(ii) Ship From Location

A ShipFromLocation entity 28942 is the location from where goods are to be shipped. The ShipFromLocation entity 28942 is of type GDT: BusinessTransactionDocumentLocation, although it includes the StandardID and InternalID elements, as well as the Address entity. The ShipFromLocation can be used for material items the default logic from header to item to subitems is used for the ShipFromLocation for material items; for the other items, the ShipFromLocation is ignored.

(c) Purchase Requirement Package

A PurchaseRequirementItem package 28912 includes a ProductInformation package 28948, a PriceInformation package 28950, a Party package 25952, a Location package 28954, a BusinessTransactionDocumentReference package 28956, an Attachment package 28958, a Description package 28960, a ScheduleLine package 28962, and a PurchaseRequirementItem (or Item) entity 28964. There is a 1:n relationship 28966 between the PurchaseRequirement entity 28914 and the Item entity 28964. PurchaseRequirementItem entities 28964 are arranged hierarchically using a HierarchyRelationship 28968. The HierarchyRelationship 28968 is the relationship between a sub-item and a higher-level parent item in an item hierarchy. There is a 1:cn relationship 28970 between the Item entity 28964 and its subordinate entities. There is a 1:c relationship 28972 between the Item entity 28964 and its superordinate entities.

(i) Purchase Requirement Item

A PurchaseRequirementItem entity 28964 specifies a product requested by the PurchaseRequirement or provides additional information about such a product. The PurchaseRequirementItem entity 28964 includes detailed information about a particular product (see ProductInformation package 28948) and its price (see PriceInformation package 28950). The quantity of the product and (delivery) dates/times are specified in the schedule line (see ScheduleLine package). For the PurchaseRequirementItem entity 28964 (compared to the information of the PurchaseRequirement entity 28914), deviating parties or locations can be defined (see Party package 28952 and Location package 28954). The PurchaseRequirementItem entity 28964 can contain references to other business documents that are relevant for the item (see BusinessTransactionDocumentReference package 28956). Notes or references to attachments can also be specified for the item (see Description package 28960 and Attachment package 28958). A PurchaseRequirementItem entity 28964 can be subordinate to another PurchaseRequirementItem entity 28964 within a hierarchy to represent a business relationship between the two items. This could be information about a substitute product for an ordered product, for example. This relationship can also be used to group together PurchaseRequirement items, that is, a PurchaseRequirementItem can group together other PurchaseRequirementItems. The PurchaseRequirementItem entity 28964 is of type GDT: PurchaseRequirementItem.

The PurchaseRequirementItem entity 28964 includes an ID, a ThirdPartyDealIndicator, and a DirectMaterialIndicator. The ID is the requisition item number; a unique identifier assigned by the requester for the purchase requisition item. The ID is of type GDT: BusinessTransactionDocumentItemID. The ThirdPartyDealIndicator specifies that the purchase requisition item is used as part of a third-party process. The ThirdPartyDealIndicator is of type GDT: BusinessTransactionDocumentItemThirdPartyDealIndicator. The DirectMaterialIndicator specifies whether the material in the purchase requisition item is used as part of a direct material process. The DirectMaterialIndicator is of type GDT: DirectMaterialIndicator.

From a semantic point of view, items can contain other items. Item hierarchies are mapped in this way. From a technical point of view, the item type is not defined recursively, since this cannot be handled by some commonly-used XML tools. The hierarchies are mapped using the entity HierarchyRelationship. There are various item categories, which are governed by a variety of constraints. An item can have several constraint types. In this case, the item satisfies the constraints of its constraint types. Which constraint types can be combined with one another and how, is specified in the description of the constraint types. The following constraint types exist:

(1) Standard items are the items to which no lower-level items have been assigned in the hierarchy. An item that is not referenced by the ParentItemID of another item is a standard item.

(2) Hierarchy items are items to which at least one other lower-level item has been assigned in the hierarchy. An item that is referenced by the ParentItemID of at least one other item is a hierarchy item. Items are either standard or hierarchy items.

(3) Subitems are items that are assigned below a hierarchy item and not directly assigned to the requisition header. Subitems can be both standard items and hierarchy items. Each item that references another item by the ParentItemID is a subitem.

(4) Material items are items whose product is a material. Items whose ProductTypeCode is "1" (Material) are Material items.

(5) DirectMaterial items are material items that are used as part of a direct material process (see DirectMaterialIndicator).

(6) Service items are items whose product is a service. Items whose ProductTypeCode is "2" (service) are service items.

(7) Limit items are items with a cost limit. Limit items are used as placeholders in a requisition if the exact requirements are unknown at the time the requisition is issued. This can be the case for repairs, where the time and spare parts required are not known until the repair has been made.

(8) Grouping hierarchy items are hierarchy items that logically group together other items. Multilevel grouping hierarchies are permitted, that is, a grouping hierarchy item can contain subitems that are also grouping hierarchy items. Hierarchy items whose subitems have HierarchyRelationshipTypeCode "002" (group) are grouping hierarchy items; subitems with a different HierarchyRelationshipTypeCode are not permitted. Grouping hierarchy items are not permitted as subitems of other types of hierarchy items.

(9) BOM hierarchy items are hierarchy items that group together other items in a BOM. Multilevel BOM hierarchies are permitted. Hierarchy items with at least one subitem with HierarchyRelationshipTypeCode "001" (bill of material) are BOM hierarchy items; additional subitems are permitted with the HierarchyRelationshipTypeCode "003" (discount in kind).

(10) Discount in kind hierarchy items are hierarchy items for which a goods discount is granted in the form of an inclusive or exclusive bonus quantity. Multilevel discount in kind hierarchies are not permitted, that is, no discount in kind can be granted for discount in kind. The goods discount is described in the form of one or more subitems in the discount in kind hierarchy item. Hierarchy items with at least one subitem with HierarchyRelationshipTypeCode "003" (discount in kind) are discount in kind hierarchy items; additional subitems are permitted with the HierarchyRelationshipTypeCode "001" (bill of material). Hierarchy items are grouping, BOM, or discount in kind hierarchy items. A hierarchy item can be both BOM and a discount in kind hierarchy item, if a discount in kind has been granted for a BOM.

(ii) Hierarchy Relationship

A HierarchyRelationship is the relationship between a subitem and a higher-level parent item in an item hierarchy. The HierarchyRelationship includes a ParentItemID and a TypeCode. The ParentItemID is a reference to a parent item. The ParentItemID is of type GDT: BusinessTransactionDocumentItemID. The TypeCode represents the hierarchical relationship between the subitem and its higher-level parent item. The TypeCode is of type GDT: BusinessTransactionDocumentItemHierarchyRelationshipTypeCode.

The ParentItemID is not changed once an item has been created. The TypeCode is not changed once an item has been created.

(iii)Purchase Requirement Item Product Information Package

A ProductInformation package 28948 groups together the information for identifying, describing, and classifying a product in a purchase requisition item. It includes a Product entity 28974 and a ProductCategory entity 28976. There is a 1:c relationship 28978 between the Item entity 28964 and the Product entity 28974. There is a 1:c relationship 28980 between the Item entity 28964 and the ProductCategory entity 28976. The ProductInformation package 28948 is not used in grouping hierarchy items.

(a) Product

A Product entity 28974 includes the details about a product as generally understood from a commercial point of view in business documents. These are the details for identifying a product and product type, and the description of the product. The Product entity 28974 is of type GDT: BusinessTransactionDocumentProduct, although it includes the StandardID, InternalID, TypeCode, and Note elements.

For limit items, the description (note) can be used in the Product entity 28974; the product number and ProductTypeCode are not used. Except in limit items, either a product number or a description along with the ProductTypeCode (material or service) is always specified. The ProductTypeCode is not changed once an item has been created. With the exception of grouping hierarchy items, at least the product number or the product description (Note) is specified when a new item is created. If both the product number and description are specified, the description is merely additional information in the message and can be ignored by the recipient. In substitution product subitems, the ProductTypeCode does not differ from the parent item ProductTypeCode.

(b) Product Category

A ProductCategory entity 28976 includes the details about a product category as generally understood from a commercial point of view in business transaction documents. It includes details for identifying the product category using an internal ID, a standard ID, and IDs assigned by involved parties. The ProductCategory entity 28976 is of type GDT: BusinessTransactionDocumentProductCategory, although it includes the StandardID and InternalID elements. The product category is derived directly from the product if a product number is specified for the product.

(iv) Purchase Requirement Item Price Information Package

A PriceInformation package 28950 groups together price-relevant information. It includes a Price entity 28982 and a ProcurementCostUpperLimit entity 28984. There is a 1:c relationship 28986 between the Item entity 28964 and the Price entity 28982. There is a 1:c relationship 28988 between the Item entity 28964 and the ProcurementCostUpperLimit entity 28984. The Price package for a purchase requisition item includes prices; it does not contain any information about how the prices are calculated (pricing scales, and so on).

(a) Price

A Price entity 28982 is the purchase order price specified by the requester or buyer. The Price entity 28982 includes a NetUnitPrice, which is the net price (without tax or cash discount) specified by the buyer for the base quantity of the service or material. The NetUnitPrice is of type GDT: Price.

In BOM hierarchies, the following rules apply for the Price entity 28982: (1) if the price is specified for the item at the top of the BOM hierarchy and not the subitems, this price applies; (2) if the price is specified for standard items (end nodes in the hierarchy tree) in the BOM hierarchy, these prices apply. The price of the entire BOM is the total of the individual prices; and (3) if a price is specified at different levels in the BOM hierarchy, the price that appears above the others in the tree always applies. Differences between the total of the individual prices and the price at the next highest hierarchy level are permissible. These may be caused by discounts for the entire BOM.

(b) Procurement Cost Upper Limit

A ProcurementCostUpperLimit entity 28984 is the cost upper limit for different types of procurement costs. The ProcurementCostUpperLimit entity 28984 is of type GDT: ProcurementCostUpperLimit. If a limit is specified, this implies that the purchase requisition item is a limit item; in other words, the requisition item indicates a requirement for a certain quantity of a particular product or service within a certain period. Limit items are used as placeholders in a requisition if the exact requirements are unknown at the time the requisition is issued. This can be the case for repairs, where the time and spare parts required are not known until the repair has been made.

(v) Purchase Requirement Item Party Package

The ItemParty package 28952 is similar to the Party package 28908 in the PurchaseRequirement package 28904. The ItemParty package 28952 also includes a BuyerParty entity 28990, a SellerParty entity 28992, a ProposedSellerParty entity 28994, a RequestorParty entity 28996, a ProductRecipientParty entity 28998, and a ManufacturerParty entity 28900A. There is a 1:c relationship 28902A between the Item entity 28964 and the BuyerParty entity 28990. There is a 1:c relationship 28904A between the Item entity 28964 and the SellerParty entity 28992. There is a 1:c relationship 28906A between the Item entity 28964 and the ProposedSellerParty entity 28994. There is a 1:c relationship 28908A between the Item entity 28964 and the RequestorParty entity 28996. There is a 1:c relationship 28910A between the Item entity 28964 nd the ProductRecipientParty entity 28998. There is a 1:c relationship 28912A between the Item entity 28964 and the ManufacturerParty entity 28900A.

(vi) Purchase Requirement Item Location Package

The ItemLocation package 28954 is similar to the Location package 28910 in the PurchaseRequirement package 28904. The ItemLocation package 28954 also includes a ShipToLocation entity 28914A and a ShipFromLocation entity 28916A. There is a 1:c relationship 28918A between the Item entity 28964 and the ShipToLocation entity 28914A. There is a 1:c relationship 28920A between the Item entity 28964 and the ShipFromLocation entity 28916A.

(vii) Purchase Requirement Item Business Transaction Document Reference Package

A BusinessTransactionDocumentReference package 28956 groups together references to business documents that are relevant for the PurchaseRequirementItem and have a business relationship with the item. It includes a PurchaseContractReference entity 28922A and an OriginPurchaseOrderReference entity 28924A. None of the entities in the BusinessTransactionDocumentReference package 28956 can be used in grouping hierarchy items.

If possible, individual items in business documents should be referenced in the requisition message from item level (contract item 10 is directly referenced from purchase requisition item 1, for example). If an item assignment is not recognized, an entire document can be referenced (contract 4711 is referenced in its entirety from purchase requisition item 1, for example). In this case, the recipient cannot demand that the item numbers in both documents be the same (that item 1 in requisition 4712 be the same as item 1 in contract 4711, for example). It is the responsibility of the recipient to try this assignment using other criteria that are not necessarily unique, such as the product number.

(a) Purchase Contract Reference

A PurchaseContractReference entity 28922A is a reference to a purchase contract or item in a purchase contract. The PurchaseContractReference entity 28922A is of type GDT: BusinessTransactionDocumentReference.

Contract references are not permitted in limit items; these are included in the ProcurementCostUpperLimit entity. A PurchaseContractReference entity 28922A can reference one item, that is, one ItemID is permissible.

(b) Origin Purchase Order Reference

The OriginPurchaseOrderReference entity 28924A is a reference to the origin purchase order or to an item within the origin purchase order in a third-party process. The OriginPurchaseOrderReference entity 28924A is of type GDT: BusinessTransactionDocumentReference.

The OriginPurchaseOrderReference entity 28924A can reference one item, that is, one ItemID is permissible. The OriginPurchaseOrderReference entity 28924A is used for third-party purchase orders.

The OriginPurchaseOrderReference entity 28924A is passed on to the purchase orders in a third-party deal, so that the seller can reference the original purchase order of the ShipToParty with the OriginPurchaseOrderReference.

(viii) Purchase Requirement Item Attachment Package

The Attachment package 28958 groups together the relevant attachments with reference to the purchase requisition item. It includes an AttachmentWebAddress entity 28930A.

There is a 1:cn relationship 28932A between the Item entity 28964 and the AttachmentWebAddress entity 28930A.

The AttachmentWebAddress entity 28930A is a Web address for a document of any type that is related to the transmitted message or a part of the message, but is not itself transferred as part of the message. The AttachmentWebAddress entity 28930A is of type GDT: AttachmentWebAddress.

(ix) Purchase Requirement Item Description Package

A Description package 28960 groups together the texts relating to the purchase requisition item. It includes a Description entity 28934A and an InternalDescription entity 28936A.

The Description entity 28934A is a natural-language text regarding the purchase requisition item, which is visible to the parties. The Description entity 28934A is of type GDT: Description. The Description entity 28934A can be used for the textual information about the transferred requisition and not just the current message. An example of this would be information that the Purchasing employee responsible is on vacation as of a specific date, and indicating the name and telephone number of a substitute as of this date.

An InternalDescription entity 28936A is a natural-language text regarding the purchase requisition item, which is visible to the parties within the company. The InternalDescription entity 28936A is of type GDT: Description. The InternalDescription entity 28936A can be used for the textual information about the transferred requisition and not just the current message. An example of this is a note indicating that the requisition is required for a particular internal purpose. Unlike the Description, the InternalDescription is not included in a message that would be sent to the vendor.

(x) Purchase Requirement Item Schedule Line Package

A ScheduleLine package 28962 groups the quantity and date information about a PurchaseRequirementItem entity 28964. The ScheduleLine package 28962 includes a ScheduleLine entity 28942A. There is a 1:1 relationship 28944A between the Item entity 28964 and the ScheduleLine entity 28942A.

A ScheduleLine entity 28942A is a line containing the quantity and dates of the performance period requested in a requisition. The ScheduleLine entity 28942A includes a DeliveryPeriod 28946A and a Quantity 28950A. The DeliveryPeriod is the period in which the requester expects a product to be delivered or service provided. The DeliveryPeriod is of type GDT: DateTimePeriod. The Quantity is the required quantity. The Quantity is of type GDT: Quantity. The quantity is specified, unless the item in question is a limit item, in which case it can be left empty. Exactly one ScheduleLine is provided in the PurchaseRequirementItem.

(4) Message Data Type Element Structure

FIG. 290 depicts the element structure for PurchaseRequirementRequest. The element structure identifies the different packages 29000 in the interface, and represents the entities at various levels within the interface. As shown in FIG. 290, the interface for PurchaseRequirementRequest includes five levels 29002, 29004, 29006, 29008, 29010. The element structure identifies the number of occurrences 29012 of each element and provides a Datatype name 29014 for each element.

The outermost package of this interface is PurchaseRequirementMessage package 29016, which includes a PurchaseRequirementMessage entity 29018 at the first level 29002. The PurchaseRequirementMessage entity 29018 is of data type MDT: PurchaseRequirementMessage 29020.

The PurchaseRequirementMessage package 29016 includes a PurchaseRequirement package 29022, which includes a PurchaseRequirement entity 29024. The PurchaseRequirement entity 29024 has one occurrence 29026 and is of data type PurchaseRequirement 29028.

The PurchaseRequirement entity 29024 includes an ID 29030, a CreationDateTime 29036 and a Note 29042. The ID 29030 has one occurrence 29032 and is of data type BusinessTransactionDocumentID 29034. The CreationDateTime 29036 has one occurrence 29038 and is of data type DateTime 29040. The Note 29042 has one or zero occurrences 29044 and is of data type Note 29046.

The PurchaseRequirement entity 29024 also includes a Party package 29048, a Location package 29050, and an Item package 29052. The Party package 29048 includes a BuyerParty entity 29054, a SellerParty entity 29096, a ProposedSellerParty entity 29002A, a RequestorParty entity 29008A, a ShipToParty entity 29014A, and a ManufacturerParty entity 29020A.

The BuyerParty entity 29054 has one or zero occurrences 29056 and is of data type BusinessTransactionDocumentParty 29058. The BuyerParty entity 29054 also includes a StandardID 29060, an InternalID 29066, an Address 29072, and a ContactPerson 29078.

The StandardID 29060 of the BuyerParty entity 29054 has zero or n occurrences 29062 and having a data type of PartyStandardID 29064. The InternalID 29066 has zero or one occurrences 29068 and a data type of PartyStandardID 29070. The Address 29072 has zero or one occurrences 29074 and a data type of Address 29076. The ContactPerson 29078 also includes an InternalID 29084 and an Address 29090. The InternalID 29084 of the ContactPerson 29078 has zero or n occurrences 29086 and a data type of ContactPersonID 29088. The Address 29090 of the ContactPerson 29078 has one or zero occurrences 29092 and a data type of Address 29094.

The SellerParty 29096 of the PurchaseRequirement entity 29024 has one or zero occurrences 29098 and a data type of BusinessTransactionDocumentParty 29000A. The ProposedSellerParty 29002A has one or zero occurrences 29004A and a data type of BusinessTransactionDocumentParty 29006A. The RequestorParty 29008A has one or zero occurrences 29010A and a data type of BusinessTransactionDocumentParty 29012A. The ShipToParty 29014A has one or zero occurrences 29016A and a data type of BusinessTransactionDocumentParty 29018A. The ManufacturerParty 29020A has one or zero occurrences 29022A and a data type of BusinessTransactionDocumentParty 29024A.

The Location package 29050 includes a ShipToLocation entity 29026A and a ShipFromLocation entity 29050A. The ShipToLocation entity 29026A has zero or one occurrences 29028A with a data type of BusinessTransactionDocumentLocation 29030A. The ShipToLocation entity 29026A also includes a StandardID 29032A, an InternalID 29038A and an Address 29044A. The StandardID 29032A has zero or one occurrences 29034A with a data type of LocationStandardID 29036A. The InternalID 29038A has zero or one occurrences 29040A with a data type of LocationStandardID 29042A. The Address 29044A has zero or one occurrences 29046A with a data type of Address 29048A. The ShipFromLocation entity 29050A has zero or one occurrences 29052A with a data type of BusinessTransactionDocumentLocation 29054A.

The Item package 29052 of the PurchaseRequirement entity 29024 includes a Product package 29096A, a Price package 29098A, a Party package 29000B, a Location package 29002B, a BusinessTransactionDocumentReference package 29004B, an Attachment package 29006B, a Description package 29008B, and a ScheduleLine package 29010B.

The Item entity 29056A has a one or n occurrences 29058A with a data type of PurchaseRequirementItem 29060A.

The Item package 29052 also includes an Item entity 29056A, which includes an ID 29062A, a ThirdPartyDealIndicator 29068A, a DirectMaterialIndicator 29074A, and a HierarchyRelationship 29080A. The ID 29062A has one occurrence 29064A with a data type of BusinessTransactionDocumentItemID 29066A. The ThirdPartyDealIndicator 29068A has one or zero occurrences 29070A with a data type of BusinessTransactionDocumentItemThirdPartyDealIndicator 29072A. The DirectMaterialIndicator 29074A has a zero or one occurrence 29076A with a data type of DirectMaterialIndicator 29078A. The HierarchyRelationship 29080A includes a ParentItemID 29084A and a TypeCode 29090A. The HierarchyRelationship 29080A has a zero or one occurrence 29082A. The ParentItemID 29084A has one occurrence 29086A with a data type of BusinessTransactionDocumentItemID 29088A. The TypeCode 29090A has one occurrence 29092A with a data type of BusinessTransactionDocumentItemHierarchyRelationshipTypeCode 29094A.

The Product Package 29096A includes a Product entity 29012B and a ProductCategory entity 29042B. The Product entity 29012B has one or zero occurrences 29014B with a data type of BusinessTransactionDocumentProduct 29016B. The Product entity 29012B also includes a StandardID 29018B, an InternalID 29024B, a TypeCode 29030B, and a Note 29036B. The StandardID 29018B has one or n occurrences 29020B with a data type of ProductStandardID 29022B. The InternalID 29024B has zero or one occurrences 29026B with a data type of ProductInternalID 29028B. The TypeCode 29030B has zero or one occurrences 29032B with a data type of ProductTypeCode 29034B. The Note 29036B has zero or one occurrences 29038B with a data type of Note 29040B.

The ProductCategory entity 29042B has zero or one occurrences 29044B with a data type of BusinessTransactionDocumentProductCategory 29046B. The ProductCategory entity 29042B also has a StandardID 29048B and an InternalID 29054B. The StandardID 29048B has zero or n occurrences 29050B with a data type of ProductCategoryStandardID 29052B. The InternalID 29054B has zero or n occurrences 29056B with a data type of ProductCategoryInternalID 29058B.

The Product package 29096A also includes a Price package 29098A, a Party package 29000B, a Location package 29002B, a BusinessTransactionDocumentReference package 29004B, an Attachment package 29006B, a Description package 29008B and a ScheduleLine package 29010B.

The Price package 29098A has one or zero occurrences 29062B and includes a NetUnitPrice 29064B. The NetUnitPrice 29064B has one or zero occurrences 29066B with a data type of Price 29068B. The Price package 29098A also includes a ProcurementCostUpperLimit entity 29070B having zero or one occurrences 29072B and a data type of ProcurementUpperLimit 29074B.

The Party package 29000B includes a BuyerParty 29076B, a SellerParty 29082B, a ProposedSellerParty 29088B, a RequestorParty 29094B, a ShipToParty 29000C and a Manufacturer 29006C. The BuyerParty 29076B has a one or zero occurrences 29078B with a data type of BusinessTransactionDocumentParty 29080B. The SellerParty 29082B has zero or one occurrences 29084B with a data type of BusinessTransactionDocument Party 29086B. The ProposedSellerParty 29088B has zero or one occurrences 29090B with a data type of BusinessTransactionDocumentParty 29092B. The RequestorParty 29094B has one or zero occurrences 29096B with a data type of BusinessTransactionDocumentParty 29098B. The ShipToParty 29000C has a zero or one occurrences 29002C with a data type of BusinessTransactionDocumentParty 29004C. The Manufacturer 29006C has zero or one occurrences 29008C with a data type of BusinessTransactionDocumentParty 29010C.

The Location package 29002B includes a ShipFromLocation entity 29012C and a ShipToLocation entity 29018C. The ShipFromLocation entity 29012C has one or zero occurrences 29014C with a data type of BusinessTransactionDocumentLocation 29016C. The ShipToLocation 29018C has one or zero occurrences 29020C with a data type of BusinessTransactionDocumentLocation 29022C.

The BusinessTransactionDocumentReference package 29004B includes a PurchaseContractReference entity 29024C and an OriginPurchaseOrderReference entity 29030C. The PurchaseContractReference entity 29024C has zero or one occurrence 29026C with a data type of BusinessTransactionDocumentReference 29028C. The OriginPurchaseOrderReference entity 29030C has one or zero occurrences 29032C with a data type of BusinessTransactionDocumentReference 29034C.

The Attachment package 29006B has an AttachmentWebAddress entity 29036C having one or zero occurrences 29038C with a data type of AttachmentWebAddress 29040C.

The Description package 29008B has a Description entity 29042C and an InternalDescription entity 29048C. The Description entity 29042C has zero or one occurrences 29044C with a data type of Description 29046C. The InternalDescription entity 29048C has zero or one occurrences 29050C with a data type of Description 29052C.

The ScheduleLine package 29010B includes a ScheduleLine entity 29054C having a DeliveryPeriod 29058C and a Quantity 29064C. The ScheduleLine entity 29054C has one occurrence 29056C. The DeliveryPeriod 29058C has one occurrence 29060C with a data type of DateTimePeriod 29062C. The Quantity 29064C has zero or one occurrences 29066C with a data type of Quantity 29068C.

b) Source of Supply Notification Interface

A SourceOfSupplyNotification is a message sent to supply planning (Supply Chain Planning) about the available sources of supply. The motivating business scenario for the source of supply notification is the Procure to Stock (PTS) scenario. Once a purchase contract has been released in Supplier Relationship Management (SRM), a message with sources of supply resulting from the purchase contract data is sent to Supply Chain Planning (SCP) so that it can be taken into account during sourcing.

A SourceOfSupplyNotification is a message sent to SCP about the available sources of supply. The message type SourceOfSupplyNotification is based on the message data type SourceOfSupplyMessage. Information about sources of supply and changes to sources of supply is sent in its entirety (CompleteTransmission).

(1) Message Choreography

FIG. 291 depicts a graphical representation 29100 of a Source Of Supply Notification 29102 between two business entities in accordance with methods and systems consistent with the subject matter described herein. In the implementation shown in FIG. 291, the first business entity is a supply source manager (or Supplier Relationship Management 29104) and the second business entity is a supply planner (or Supply Chain Planning 29106). The Source Of Supply Notification 29102 is a message sent from the Supplier Relationship Management 29104 to Supply Chain Planning 29106 about the available sources of supply. The Source of Supply Notification 29102 may identify a Procure to Stock (PTS)

scenario to the Supply Chain Planning 29106. For example, once a purchase contract (not shown in FIG. 291) has been released in or to Supplier Relationship Management 29104, a message 29102 with sources of supply resulting from the purchase contract data is sent to Supply Chain Planning 29106 so that Supply Chain Planning 29106 is able to take into account the sources of supply during the stocking or sourcing process. In this implementation, the Source Of Supply Notification 29102 is sent once a purchase contract has been released.

The Source Of Supply Notification 29102 is a message type based on the message data type SourceOfSupplyMessage 29200 shown in FIG. 292. A message based on the message data type SourceOfSupplyMessage 29200 is implemented by two message operations: a SourceOfSupplyNotification_Out operation and a SourceOfSupplyNotification_In operation. The SourceOfSupplyNotification_Out operation is in Supplier Relationship Management 29104, and the SourceOfSupplyNotification_In operation is in Supply Chain Planning 29106.

(2) Message Data Type Source of Supply Message

The message data type SourceOfSupplyMessage 29200 includes the SourceOfSupply Message entity 29202 in the business document or the business information that is relevant for sending a business document in a message. As shown in FIG. 292, the message data type SourceOfSupplyMessage 29200 includes a MessageHeader package 29204 and a SourceOfSupply package 29206. The message data type SourceOfSupplyMessage 29200 provides the structure for the message type SourceOfSupplyNotification 29102.

(a) Message Header Package

A MessageHeader package 29204 groups the business information that is relevant for sending a business document in a message. In one implementation, the MessageHeader package 29204 may not be relevant for implementing the SourceOfSupplyNotification 29102.

(b) Source of Supply Package

The SourceOfSupply package 29206 groups information about one or more sources of supply, and includes a SourceOfSupply entity 29208, a BusinessTransactionDocumentReference package 29210, a Party package 29212, a Location package 29214, a ProductInformation package 29216, and a PriceInformation package 29218. There is a 1:n relationship 29209 between the SourceOfSupplyMessage object 29202 and the SourceOfSupply entity 29208.

The SourceOfSupply entity 29208 identifies the procurement option for a particular product or product category. In particular, the SourceOfSupply entity 29208 includes information about prices and ship-to/ship-from locations. The SourceOfSupply 29208 is of type GDT: SourceOfSupply.

As discussed in further detail below, the SourceOfSupply entity 29208 includes an ActiveIndicator, a DeletedIndicator, a SourcingPriorityCode, a ValidityPeriod, a TargetQuantity, a TargetAmount, a GoodsReceiptProcessingDuration, and a PlannedDeliveryDuration. The ActiveIndicator indicates whether a source of supply may be used for supply planning, and is of type GDT: ActiveIndicator. The DeletedIndicator indicates whether or not a source of supply is logically deleted, and is of type GDT: DeletedIndicator. The SourcingPriorityCode indicates the priority of a source of supply during sourcing. The sourcing priority may be defined in the purchase contract so that, for example, reference sources of supply may be determined. The SourcingPriorityCode is of type GDT: BusinessTransactionPriorityCode. The ValidityPeriod indicates the period in which a source of supply is valid, and is of type GDT: DateTimePeriod. The TargetQuantity identifies the notified total quantity of a product. The Buyer and Seller agreed upon this quantity as part of a purchase contract for a source of supply. The TargetQuantity is of type GDT: Quantity. The TargetAmount identifies the notified total value of a product. The Buyer and Seller agreed upon this amount as part of a purchase contract for a source of supply. The TargetAmount is of type GDT: Amount. The GoodsReceiptProcessingDuration indicates the time that elapses from when a product is received to when it is made available for the purpose of procurement. The goods receipt processing duration is required for checking the product and placing it in storage, for example. It is taken into account during scheduling. The GoodsReceiptProcessingDuration is of type GDT: Duration. The PlannedDeliveryDuration indicates the planned time required for delivering the product from an external source of supply. The planned delivery duration may be specified in the purchase contract so that the earliest availability date may be checked and the release date for a purchase requisition calculated. The PlannedDeliveryDuration is of type GDT: Duration.

A source of supply 29208 determines which quantities of which products may be procured from which locations, at what price, and when. The source of supply 29208 may be external (e.g., a vendor) or internal (e.g., a firm's own plant). The source of supply is used for supply planning. The sources of supply listed in a SourceOfSupplyNotification 29102 are derived from one base business document. The sources of supply 29208 normally correspond to the purchase contract items for individual products or product categories.

The following example will be used to clarify the information included in the SourceOfSupply 29208. DaimlerChrysler and Bosch conclude a purchase contract for the delivery of servo pumps. They agree to a total purchase quantity of 500,000 items totalling EUR 50 million. Bosch may offer a price of EUR 90 for purchase orders for more than 500 items. The agreement is valid for DaimlerChrysler ship-to locations in Stuttgart and Boblingen. DaimlerChrysler and Bosch agree to the special price of EUR 90 for Stuttgart. With the conclusion of the purchase contract, DaimlerChrysler has a procurement option for servo pumps.

(i) Business Transaction Document Reference

The BusinessTransactionDocumentReference package 29210 groups the references to business documents on which a source of supply may be based. The Business TransactionDocumentReference package 29210 includes a PurchaseContractReference entity 29220 and a SchedulingAgreementReference entity 29222.

(c) Purchase Contract Reference

The PurchaseContractReference entity 29220 is a reference to an outline agreement governing the supply of materials or services by the supplier as required within a certain period. The PurchaseContractReference entity 29220 is of type GDT: BusinessTransactionDocumentReference. There is a 1:c relationship 29221 between the SourceOfSupply entity 29208 and the PurchaseContractReference entity 29220. In the example above, the number of the purchase contract concluded between DaimlerChrysler and Bosch is specified by the PurchaseContractReference entity 29220.

(a) Scheduling Agreement Reference

The SchedulingAgreementReference entity 29222 is a reference to an outline agreement governing the procurement of materials on predefined dates within a certain period. The SchedulingAgreementReference entity 29222 is of type GDT: BusinessTransactionDocumentReference. There is also a 1:c relationship 29223 between the SourceOfSupply entity 29208 and the SchedulingAgreementReference entity 29222.

(ii) Party

The Party package 29212 groups the business partners who may be involved with a base business document of a source of supply. The Party package 29212 includes a BuyerParty entity 29224 and a SellerParty entity 29226. If the flow of goods does not take place between the locations defined for the BuyerParty entity 29224 and the SellerParty entity 29226, the source of supply 29208 may be specified with ShipToLocation 29228 and ShipFromLocation 29230 entities in the location package 29214. If a source of supply 29208 refers to a purchase contract, the contract partners are listed in the respective BuyerParty entity 29224 and SellerParty entity 29226. Continuing with the previous example, DaimlerChrysler as the buyer is listed in the BuyerParty entity 29224 and Bosch as the seller is listed in the SellerParty entity 29226.

(a) Buyer Party

The BuyerParty entity 29224 identifies the company or person that purchases goods or services. The BuyerParty entity 29224 is of type GDT: BusinessTransactionDocumentParty, where the "InternalID" is used. A BuyerParty 29224 does not have to be listed for an internal source of supply 29208. There is a 1:c relationship 29225 between the SourceOfSupply entity 29208 and the BuyerParty entity 29224.

(b) Seller Party

The SellerParty entity 29226 identifies the company or person that sells goods or services. The SellerParty entity 29226 is of type GDT: BusinessTransactionDocumentParty, where the "InternalID" is used. A SellerParty 29226 does not have to be listed for an internal source of supply 29208. There is a 1:c relationship 29227 between the SourceOfSupply entity 29208 and the SellerParty entity 29226.

(iii) Location

The Location package 29214 includes information about the locations between which goods may flow. The Location package 29214 includes a ShipToLocation entity 29228 and a ShipFromLocation entity 29230. If more than one ship-to or ship-from location is specified, the source of supply 29208 is valid for all combinations of these locations. In other words, the ship-from locations listed are valid sources of supply for the ship-to locations. In the example above, for DaimlerChrysler, Stuttgart and Boblingen are listed as ship-to locations 29228 for a source of supply 29208. In this example, if servo pumps are required for the production location in Hungary, the specified source of supply 29208 cannot be used.

The ShipToLocation entity 29228 identifies the location to which goods are to be delivered or where services are to be provided. The ShipToLocation entity 29228 is of type GDT: BusinessTransactionDocumentLocation, where the "InternalID" is used. The ship-to location 29228 is specified if the ship-to address differs from the BuyerParty address and is required for accurately specifying the source of supply 29208. There is a 1:cn relationship 29229 between the SourceOfSupply entity 29208 and the ShipToLocation entity 29228.

The ShipFromLocation entity 29230 identifies the location from which goods may be shipped. The ShipFromLocation entity 29230 is of type GDT: BusinessTransactionDocumentLocation, where the "InternalID" is used. The ship-from location 29230 is specified if the ship-from address differs from the SellerParty address and is required for accurately specifying the source of supply. There is also a 1:cn relationship 29231 between the SourceOfSupply entity 29208 and the ShipFromLocation entity 29230.

(iv) Product Information

The ProductInformation package 29216 groups the information required for identifying, describing, and classifying a product that may be procured from a source of supply 29208. The ProductInformation package 29216 includes a Product entity 29232 and a ProductCategory entity 29234. In one implementation, either a product 29232 or product category 29234 is specified in a source of supply 29208.

The Product entity 29232 identifies, describes, and classifies the product or service. The Product entity 29232 is of type GDT: BusinessTransactionDocumentProduct, where the "InternalID" is used. There is a 1:c relationship 29233 between the SourceOfSupply entity 29208 and the Product entity 29232.

The ProductCategory entity 29134 identifies the product category for the product or service. The ProductCategory entity 29134 is of type GDT: BusinessTransactionDocumentProduct Category, where the "InternalID" is used. There is a 1:c relationship 29235 between the SourceOfSupply entity 29208 and the ProductCategory entity 29234.

(v) Price Information

The PriceInformation package 29218 groups the information required for calculating the payment due for a product that may be procured from a source of supply 29208. The PriceInformation package 29218 includes a Price entity 29236, a Scale entity 29238, and a Line entity 29240. The PriceInformation package 29218 may be used to transfer an effective price function for a source of supply 29208. During sourcing, this information may be used in Supply Chain Planning 29106 to determine the cheapest source of supply if a decision has to be made between more than one SourceOfSupply 29208.

(a) Price

The Price entity 29236 identifies the remuneration for a product, which is valid for a certain period and ship-to location, and may be scaled according to quantity. The price entity 29136 includes a ShipToLocation (e.g., in the ShipToLocation entity 29228), a ValidityPeriod, a FixedCostsAmount, and a NetUnitPrice. The ShipToLocation identifies the ship-to location for which the pricing scale is valid, and is of type GDT: BusinessTransactionDocumentLocation. The ValidityPeriod identifies the validity period for the pricing scale, and is of type GDT: DateTimePeriod. The FixedCostsAmount identifies the fixed costs for a procurement transaction, and is of type GDT: Amount. The NetUnitPrice identifies the net price for a base quantity of a product, and is of type GDT: Price. As shown in FIG. 292, there is a 1:cn relationship 29237 between the SourceOfSupply entity 29208 and the Price entity 29236.

The Price entity 29236 may reference or include a PriceScale or Scale entity 29238 and a PriceScaleLine or Line entity 29240. The NetUnitPrice is specified as an element of the Price entity 29236 if a pricing scale has not been specified. If a ship-to location-specific price is specified, the ship-to location is also listed in the Location package 29214 and specified with the same identifiers (such as "InternalID"). As shown in FIG. 292, there is a 1:c relationship 29239 between the Price entity 29236 and the Scale entity 29238.

(b) Price Scale

The PriceScale entity 29238 includes a set of price scale lines arranged linearly in accordance with a scale (axis) base type. The Scale 29238 includes a AxisIntervalBoundaryTypeCode, which is a coded representation for typing the discrete values on a scale as interval boundaries. The PriceScale entity 29238 delivers the interpretation of scale axis values (scale levels) in a price scale. The AxisIntervalBoundaryTypeCode is of type GDT: ScaleAxisIntervalBoundaryTypeCode. The PriceScale 29238 may also reference or include a Line entity 29240.

(c) Price Scale Line

The PriceScaleLine entity (or Line entity 29240) identifies the price of a product depending on the quantity. The Line entity 29240 includes a Quantity and a NetUnitPrice. The Quantity is the quantity of the product in the base unit of measure (scale quantity), and is of type GDT: Quantity. The NetUnitPrice is the net price for the quantity of the product, in the base unit of measure, which is defined in Quantity, and is of type GDT: Price. A PriceScaleLine 29240 consists of a price scale axis value or price scale level ("Quantity") and a price scale rate ("NetUnitPrice"). As shown in FIG. 292, there is a 1:n relationship 29241 between the Scale entity 29238 and the Line entity 29240.

(3) Message Data Type Element Structure

FIGS. 293A-D depict the element structure for the Source Of Supply Notification 29102. The element structure is similar to the above described data model of the Source Of Supply Notification as reflected in FIG. 292, but provides additional information regarding the details for interfacing with or implementing a Source Of Supply Notification. As shown in FIGS. 293A-D, the element structure identifies the different packages 29300 that may be in a respective Source Of Supply Notification 29102. The element structure for the Source Of Supply Notification includes six levels 29302, 29304, 29306, 29308, 29310, and 29312 associated with a respective package 29300. The element structure for a Source Of Supply Notification also identifies the cardinality 29314 and data type 29316 for the elements at respective levels 29302, 29304, 29306, 29308, 29310, and 29312 in a package 29300.

The outermost package of this interface is a SourceOfSupplyMessage package 29318, which includes a SourceOfSupplyMessage entity 29320 at the first level 29302. The SourceOfSupplyMessage entity is of message data type SourceOfSupplyMessage 29322.

The SourceOfSupplyMessage package 29318 includes a SourceOfSupply package 29324 that has a SourceOfSupply entity 29326. There is one or more 29328 SourceOfSupply entities 29326, each being of global data type ("GDT"): SourceOfSupply. As shown in FIGS. 293A-B, each SourceOfSupply entity 29326 includes an ActiveIndicator 29332, a DeletedIndicator 29338, a SourcingPriorityCode 29344, a ValidityPeriod 29350, a TargetQuantity 29356, a TargetAmount 29362, a GoodsReceiptProcessingDuration 29368, and a PlannedDeliveryDuration 29374. The ActiveIndicator 29332 is of type GDT: ActiveIndicator. The DeletedIndicator 29338 is of type GDT: DeletedIndicator 29342. The SourcingPriorityCode 29344 is of type GDT: BusinessTransactionPriorityCode 29348. The ValidityPeriod 29350 is of type GDT: DateTimePeriod 29354. The TargetQuantity 29356 is of type GDT: Quantity 29360. The TargetAmount 29364 is of type GDT: Amount 29366. The GoodsReceiptProcessing Duration 29368 is of type GDT: Duration 29372. The PlannedDeliveryDuration 29374 is also of type GDT: Duration 29378. For each SourceOfSupply entity 29326, there is as follows: one 29334 ActiveIndicator 29332; one 29340 DeletedIndicator 29338; zero or one 29346 SourcingPriorityCode 29344; one 29352 ValidityPeriod 29350; zero or one 29358 TargetQuantity 29356; zero or one 29364 TargetAmount 29364; zero or one 29370 GoodsReceiptProcessing Duration 29368; and zero or one 29376 PlannedDeliveryDuration 29374.

The SourceOfSupply package 29324 also includes a BusinessTransactionDocument Reference package 29380, a Party package 29382, a Location package 29386, a Product Information package 29388, and a Price Information package 29388.

The BusinessTransactionDocumentReference package 29380 includes a PurchaseContractReference entity 29390 of type GDT: BusinessTransactionDocumentReference 29394 and a SchedulingAgreementReference entity 29396 of type GDT: BusinessTransactionDocumentReference 29300A. There is zero or one 29392 PurchaseContractReference entity 29390 for each SourceOfSupply entity 29324. Similarly, there is zero or one 29398 SchedulingAgreementReference entity 29396 for each SourceOfSupply entity 29324.

The Party package 29382 includes a BuyerParty entity 29302A of type GDT: BusinessTransactionDocumentParty 29306A and a SellerParty entity 29308A of type GDT: BusinessTransactionDocumentParty 29312A. There is zero or one 29304A BuyerParty entity 29390 for each SourceOfSupply entity 29324. Similarly, there is zero or one 29310A SellerParty entity 29396 for each SourceOfSupply entity 29324.

The Location package 29384 includes a ShipToLocation entity 29314A of type GDT: BusinessTransactionDocumentLocation 29318A and a ShipFromLocation entity 29320A of type GDT: BusinessTransactionDocumentLocation 29324A. There is any number 29316A of ShipToLocation entities 29314A for each SourceOfSupply entity 29324. Similarly, there is any number 29322A of ShipFromLocation entities 29320A for each SourceOfSupply entity 29324.

The Product Information package 29386 includes a Product entity 29326A of type GDT: BusinessTransactionDocumentProduct 29330A and a ProductCategory entity 29332A of type GDT: ProductCategory 29336A. There is zero or one 29328A Product entities 29329114A and zero or one 29334A Product Categories 29332A for each SourceOfSupply entity 29324.

As shown in FIG. 293C, the Price Information package 29388 includes a Price entity 29338. There is any number 29340A of Price entities 38A for each SourceOfSupply entity 29324. Each Price entity 29236 includes: a ShipToLocation entity 29342A of a type GDT: BusinessTransactionDocumentLocation 29346A; a ValidityPeriod 29348A of a type GDT: DateTimePeriod 29352A; a FixedCostsAmount entity 29354A of a type GDT: Amount 29358A; and a NetUnitPrice 29360A of a type GDT: Price 29364A. For each SourceOfSupply entity 29324, there is zero or one 29344A ShipToLocation 29342A, one 29350A ValidityPeriod 29348A, zero or one 29356A FixedCostsAmount 29354A, and zero or one 29360A NetUnitPrice 29360A.

Each Price entity 29338 also includes zero or one 29368A PriceScales or Scale entities 29368A. Each Scale 29366A includes one 29172A AxisIntervalBoundary Type Code 29370A of a type GDT: ScaleAxisIntervalBoundaryTypeCode 29374A. Each Price entity 29338 may also include one or more 29378A of Price Scale Line entities 29376A. Each Line entity 29376A includes a Quantity 29380A of a type GDT: Quantity 29384A and a NetUnitPrice 29386A of a type GDT: Price 29390A.

c) Purchase Order Interfaces

PurchaseOrder interfaces are the interfaces that are required in a B2B process to exchange purchase orders and order confirmations between a buyer and a seller. Traditional methods of communication during an ordering process, such as via mail or fax, are cost intensive, prone to error, and relatively slow, since the data has to be entered manually. Electronic communication between the procurement system and a sales system eliminates such problems. Purchase order interfaces directly integrate the applications that implement the interfaces and form a basis for mapping data to widely-used standard formats, such as RosettaNet. More than just a simple interface structure, the purchase order interfaces define the underlying corporate significance and, at the same time, dispense with the need to exchange proprietary information during straightforward ordering processes. In this way, applications that implement purchase order interfaces can be integrated without the need for complex project work.

(1) Message Types

There are a total of four message types for mapping a B2B ordering process: (1) PurchaseOrderRequest; (2) PurchaseOrderChangeRequest; (3) PurchaseOrderCancellationRequest; and (4) PurchaseOrderConfirmation. The PurchaseOrderRequest is sent from a buyer to a seller, and is used to initiate a new ordering process. The PurchaseOrderChangeRequest is sent from a buyer to a seller, and is used to change a purchase order during an ordering process. Changing a purchase order includes creating new items, changing existing items, and cancelling items. The PurchaseOrderCancellationRequest is sent from a buyer to a seller, and is used to cancel a purchase order. The PurchaseOrderConfirmation is sent from a buyer to a seller, and is used to confirm a purchase order. It can be sent in direct response to a PurchaseOrderRequest, a PurchaseOrderChangeRequest, or a PurchaseOrderCancellationRequest message, or without an immediately preceding message to display changes to the purchase order or its confirmation status. The seller can change a purchase order by creating new items or by changing or rejecting existing items.

(a) Purchase Order Request

A PurchaseOrderRequest is a buyer's request to the seller to deliver goods or provide services. The structure of the message type PurchaseOrderRequest is specified in the message data type PurchaseOrderMessage. Portions of the maximum PurchaseOrderMessage structure are used. The PurchaseOrderRequest is the message that a buyer uses to start a new ordering process with a seller.

(b) Purchase Order Change Request

A PurchaseOrderChangeRequest is a change made to the buyer's request to the seller to deliver goods or provide services. The structure of the message type PurchaseOrderChangeRequest is specified in the message data type PurchaseOrderMessage. Portions of the maximum PurchaseOrderMessage structure are used. The PurchaseOrderChangeRequest is the message that a buyer uses to inform the seller of change requests during an ordering process. In a PurchaseOrderChangeRequest, the buyer can change header data, add new items, and change or cancel existing items.

(c) Purchase Order Cancellation Request

A PurchaseOrderCancellationRequest is a cancellation of the buyer's request to the seller to deliver goods or provide services. The structure of the message type PurchaseOrderCancellationRequest is specified in the message data type PurchaseOrderCancellationMessage. The PurchaseOrderCancellationRequest is the message that a buyer uses to inform the seller of a purchase order cancellation request during an ordering process.

(d) Purchase Order Confirmation

A PurchaseOrderConfirmation is a confirmation, partial confirmation, or a change sent from the seller to the buyer concerning the requested delivery of goods or provision of services. The structure of the message type PurchaseOrderConfirmation is specified in the message data type PurchaseOrderMessage. Portions of the maximum PurchaseOrderMessage structure are used. The PurchaseOrderConfirmation is the message that a seller uses to confirm a purchase order with the buyer, or to inform the buyer of any purchase order change requests during an ordering process.

The seller can use the PurchaseOrderConfirmation message in three ways. First, the seller can explicitly confirm planned delivery dates/times, quantities, and prices with the buyer and propose substitute products. Second, the seller can inform the buyer of any purchase order change requests. Third, the seller can inform the buyer of the confirmation status of the purchase order. Possible statuses include "AP" (Accepted), "AJ" (Pending), and "RE" (Rejected). The confirmation status can be set at the header or item level. Rejection at the header level also signifies rejection of all items. Acceptance at the header level signifies general acceptance of the purchase order, while individual items can be accepted, open, or rejected. The same logic applies from items to subitems in item hierarchies. There are no restrictions for changes to the confirmation status, e.g., a change from "AP" (Accepted) to "RE" (Rejected) is permitted. The confirmation status indicates whether a seller will fulfil a purchase order. Accordingly, the seller has to confirm cancellation of a purchase order with the status "RE" (Rejected). If the confirmation status "AP" (Accepted) is set for a purchase order but no additional information is provided about confirmed delivery dates/times, quantities, etc., the purchase order is regarded as "confirmed as ordered."

Each PurchaseOrderConfirmation reflects the status of an item. Thus, if the status of a given PurchaseOrderConfirmation item is "AP" (Accepted), the relevant purchase order ("PURCHASE ORDER") item is confirmed "as ordered." If a change was requested for this item in a different PurchaseOrderConfirmation message, that change request is invalid.

(2) Message Choreography

The interaction between the purchase order interfaces in an ordering process is described in detail below. FIG. 294 depicts the message choreography for the purchase order interface. The choreography involves three business entities: Supply Chain Planning 29402, Supplier Relationship Mgmt Purchasing 29404, and Supplier 29406. The Supplier Relationship Mgmt Purchasing 29404 sends a SourceOfSupplyNotification 29408 to SupplyChain Planning 29402. SupplyChain Planning 29402 sends a PurchaseRequirementRequest 29410 to Supplier Relationship Mgmt Purchasing 29404. Supplier Relationship Mgmt Purchasing 29404 sends a PurchaseOrderRequest 29412, a PurchaseOrderChangeRequest 29414, and/or a PurchaseOrderCancellationRequest 29416 to Supplier 29406. Supplier 29406 sends a PurchaseOrderConfirmation 29418 to Supplier Relationship Mgmt Purchasing 29404. Supplier Relationship Mgmt Purchasing 29404 sends a PurchaseRequirementConfirmation 29420 and a PurchaseOrder Information 29422 to SupplyChain Planning 29402. Supplier Relationship Mgmt Purchasing 29404 sends a PurchaseOrder Information 29424 to Any System 29426.

(a) Process Flow

The buyer starts an ordering process by sending a PurchaseOrderRequest message. Once the ordering process has been started, the buyer can use a PurchaseOrderChangeRequest message to send a change request or a PurchaseOrderCancellationRequest message to send a purchase order cancellation request to the seller at any time. After receiving the PurchaseOrderRequest message, the seller can use a PurchaseOrderConfirmation message to inform the buyer of the status of the purchase order or to send change requests at any time. Once an ordering process has been started, there are no restrictions with regard to the order in which particular messages have to be sent. The buyer does not have to wait for confirmation from the seller before being allowed to send purchase order change requests, using a PurchaseOrderChangeRequest message.

In each PurchaseOrderRequest or PurchaseOrderChangeRequest message, the buyer can explicitly request a PurchaseOrderConfirmation message from the vendor by setting the FollowUpPurchaseOrderConfirmation/RequirementCode to "Expected." In this case, the seller should send a PurchaseOrderConfirmation in response to the receipt of a PurchaseOrderRequest, PurchaseOrderChangeRequest, or PurchaseOrderCancellationRequest message. To ensure that the response is sent as promptly as possible, no user interaction is required on the seller side. If a buyer's request cannot be automatically accepted or rejected, the confirmation status "AJ" (Pending) can be set. A PurchaseOrderConfirmation in response to a PurchaseOrderChangeRequest reconfirms all the items that were transferred with the PurchaseOrderChangeRequest. The seller should also send a PurchaseOrderConfirmation if the confirmation status of the entire purchase order or of a particular item is changed or if quantities, prices, or deadlines can be explicitly confirmed, or if changes are made to confirmations that have already been sent.

A PurchaseOrderConfirmation is sent by the seller if the seller rejects individual items or the entire purchase order, or if the seller requests changes to the purchase order.

The buyer uses a PurchaseOrderChangeRequest message to confirm the seller's change requests (by accepting the seller's requests as changes) or to reject them (by not accepting the seller's requests). To avoid endless loops, the buyer should not be permitted to use a PurchaseOrderChangeRequest message to automatically respond to mere changes to the confirmation status or to the explicit confirmation of delivery dates/times, quantities, and prices.

(b) Error Handling

A recipient system accepts every formally correct incoming purchase order message. The buyer resolves business problems using a PurchaseOrderchangeRequest or PurchaseOrderCancellationRequest message, and the seller resolves business problems using a PurchaseOrderConfirmation message. It is up to the recipient system to distinguish between technical and business errors. Borderline cases include incorrect ISO codes for currencies, or languages.

A procurement system cannot reject a PurchaseOrderConfirmation automatically. Instead, the procurement system uses a PurchaseOrderChangeRequest or provide other suitable mechanisms to avoid endless loops, i.e., to avoid having the procurement system continuously reject every confirmation of each rejection.

In order to restart an ordering process that is corrupt as a result of a failed message, the procurement system may provide an option for transferring the current status of the purchase order, together with all of the associated data, at any time using a PurchaseOrderChangeRequest message. In this message, the ItemCompleteTransmissionIndicator may be set to "true." The sales and distribution ("SD") system may provide the same functions for the PurchaseOrderConfirmation. In order to restart a process following a failed PurchaseOrderRequest message, the procurement system should be able to restart an ordering process at any time using a PurchaseOrderRequest message.

(c) Message Operations

The purchase order messages are implemented by eight message operations, four on the buyer side and four on the seller side. The buyer side operations are PurchaseOrderRequest_Out, PurchaseOrderChangeRequest_Out, PurchaseOrderCancellationRequest_Out, and PurchaseOrderConfirmation_In, and the seller side operations are PurchaseOrderRequest_In, PurchaseOrderChangeRequest_In, PurchaseOrderCancellationRequest_In, and PurchaseOrderConfirmation_Out.

(3) Message Data Type Purchase Order Message

The message data type PurchaseOrderMessage groups together the business information that is relevant for sending a business document in a message and the PurchaseOrder object in the business document. This message data type groups together the MessageHeader package and the PurchaseOrder package, described in detail below.

(a) Message Header Package

A MessageHeader package 29502 groups together the business information that is relevant for sending a business document in a message. It includes a MessageHeader entity 29508. There is a 1:1 relationship between the PurchaseOrderMessage entity 29506 and the MessageHeader entity 29508.

(i) Message Header

The MessageHeader groups together business information from the perspective of the sending application to identify the business document in a message, to provide information about the sender, and to provide any information about the recipient.

The MessageHeader entity 29508 includes a SenderParty entity 29510 and a RecipientParty entity 29512. There is a 1:cn relationship between the MessageHeader entity 29508 and the RecipientParty entity 29512. The MessageHeader entity 29508 is of type GDT: BusinessDocumentMessageHeader.

The MessageHeader entity 29508 also includes an ID, a ReferenceID, and a CreationDateTime. The MessageID is set by the sending application. With the ReferencedMessageID, reference is made in the current BusinessDocument to a previous BusinessDocument.

(ii) Sender Party

The SenderParty is the party responsible for sending a business document at business application level. The SenderParty entity 29510 is of type GDT: BusinessDocumentMessageHeaderParty. The SenderParty entity 29510 can be filled by the sending application to name a contact person for any problems with the message. This is particularly useful if an additional infrastructure (such as a marketplace) is located between the sender and the recipient. The SenderParty entity 29510 is used to transfer the message, and may be ignored by the receiving application. It should be filled by the sender if the PurchaseOrder package cannot be used to transfer the participating parties. The SenderParty entity 29510 includes the standard information included with parties, as discussed below, as denoted by ellipses 29514.

(iii) Recipient Party

The RecipientParty is the party responsible for receiving a business document at business application level. The RecipientParty entity 29512 is of type GDT: BusinessDocumentMessageHeaderParty. The RecipientParty entity 29512 may be filled by the sending application to name a contact person for any problems that occur with the message. This is particularly useful if an additional infrastructure (such as a marketplace) is located between the sender and the recipient. The RecipientParty entity 29512 is used to transfer the message, and may be ignored by the receiving application. It should be filled by the sender if the PurchaseOrder package cannot be used to transfer the participating parties. The RecipientParty entity 29512 includes the standard information included with parties, as discussed below, as denoted by ellipses 29516.

(b) Purchase Order Package

The PurchaseOrder package 29504 includes a Party package 29518, a Location package 29520, a DeliveryInformation package 29522, a PaymentInformation package 29524, a PriceInformation package 29523, an Attachment package 29526, a Description package 29528, a FollowUpBusinessTransactionDocument package 29530, an Item package 29532, and a PurchaseOrder entity 29534. There is a 1:1 relationship between the PurchaseOrderMessage entity 29506 and the PurchaseOrder entity 29534.

(i) Purchase Order

A PurchaseOrder is a buyer's request (or a change to or confirmation of such a request) to a seller to provide or deliver certain quantities of products at one or several dates. This includes purchase order change, confirmation, or cancellation. The PurchaseOrder is divided into PurchaseOrderItems that each specify an ordered product or additional information relevant for such a product, such as information about bills of material (BOMs) or discount or value limits (see PurchaseOrderItem package). In addition to the buying party and the seller, additional parties can be involved in the PurchaseOrder (see Party package). Locations can be specified for the purchase order delivery (see Location package). Delivery and payment terms are also agreed (see DeliveryInformation package and PaymentInformation package). Notes or references to attachments can be specified for the PurchaseOrder (see Description package and Attachment package).

The types of follow-up documents that are expected with regard to the PurchaseOrder package can also be specified (see FollowUpBusinessTransactionDocument package). The PurchaseOrder entity 29534 is of type GDT: PurchaseOrder. The PurchaseOrder entity 29534 includes an ID, SellerID, a BuyerPostingDateTime, a BuyerLastChangeDateTime, SellerPostingDateTime, SellerLastChangeDateTime, AcceptanceStatusCode, Note, and ItemListCompleteTransmissionIndicator. The ID is a unique identifier specified by the buyer for the purchase order. The SellerID is the unique identifier specified by the seller for the purchase order. The BuyerPostingDateTime is the creation date/time of the purchase order at the buyer. The BuyerPostingDateTime is of type GDT: DateTime. The BuyerLastChangeDateTime is the date/time of the last change made to the purchase order by the buyer. The BuyerLastChangeDateTime is of type GDT: DateTime. The SellerPostingDateTime is the creation date/time of the sales order at the seller. The SellerPostingDateTime is of type GDT: DateTime. The SellerLastChangeDateTime is the date/time of the last change made to the sales order by the seller. The SellerLastChangeDateTime is of type GDT: DateTime. The AcceptanceStatusCode is the coded representation for the status of the seller's acceptance of a purchase order. The AcceptanceStatusCode is of type GDT: AcceptanceStatusCode. The Note is a short description or the title of the purchase order. It is generally used to provide the user with a simple method for searching for a particular purchase order. The Note is of type GDT: Note. The ItemListCompleteTransmissionIndicator specifies whether all purchase order items are always to be transmitted (items that are not transmitted are implicitly classed as canceled) or whether only new, changed purchase order items that have been canceled since the last transmission are to be transmitted. The ItemListCompleteTransmissionIndicator is of type GDT: CompleteTransmissionIndicator.

Within any given purchase order, monetary amounts and prices are typically in the same currency. Preferably, the ID must not be changed once a purchase order has been created, the SellerID must not be changed once a purchase order has been created, the BuyerPostingDateTime must not be changed once a purchase order has been created, the BuyerLastChangeDateTime can be changed by the buyer only, the SellerPostingDateTime must not be changed once a purchase order has been created, and the Note can be changed by the buyer only.

In variations of the Message Type PurchaseOrderRequest, the SellerID must not be used, the SellerPostingDateTime must not be used, the SellerLastChangeDateTime must not be used, the AcceptanceStatusCode must not be used, the ItemListCompleteTransmissionIndicator must be set to "true," the ActionCode for all items must be set to "01" (Create), the header and all the items that are to be ordered must be transmitted, together with all the associated data, and items that were deleted at the buyer before the purchase order was first sent to the seller must not be transmitted.

In variations of the Message Type PurchaseOrderChangeRequest, The SellerID must not be used, the SellerPostingDateTime must not be used, the SellerLastChangeDateTime must not be used, and the AcceptanceStatusCode must not be used. If an ItemListCompleteTransmissionIndicator is set to "true," the ActionCode for all items must be set to "01" (Create) the header and all the items must be transmitted, together with all the associated data, and items that are not transmitted are implicitly classed as canceled. If an ItemListCompleteTransmissionIndicator is set to "false," the ActionCode for the transmitted items must be set to "01" (Create), "02" (Change), or "03" (Delete), the ActionCode "01" (Create) must be set if the item is being transmitted for the first time, "02" (Change) if the item has been changed since the last transmission, and "03" (Delete) if the item has been canceled since the last transmission. In variations where it is set to "false," the header must be transmitted, together with all the associated data; new or changed items must be transmitted, together with all the associated data, canceled items must be transmitted, together with the ID and ActionCode, and should be transmitted without any additional data; and items that are not transmitted are classed as unchanged and are not implicitly classed as canceled.

In variations of the Message Type PurchaseOrderConfirmation, the AcceptanceStatusCode at header and item level must be set to "AP" (Accepted), "AJ" (Pending), or "RE" (Rejected). If an ItemListCompleteTransmissionIndicator is set to "true," the ActionCode for all items must be set to "01" (Create); the header and all items must be transmitted, together with all the associated data; and Items that are not transmitted are implicitly classed as canceled.

In some variations, if an ItemListCompleteTransmissionIndicator is set to "false," the ActionCode for the transmitted items must be set to "01" (Create) or "02" (Change). Then, the ActionCode "01" (Create) must be set if the item is being transmitted for the first time and "02" (Change) if the item has been changed by the seller since the last transmission. In those variations, the seller cannot cancel items by setting the ActionCode to "03" (Delete), but can reject items by setting the AcceptanceStatusCode "RE" (Rejected). If the header contains changes, it must be transmitted, together with all the associated data. Otherwise, the ID and the AcceptanceStatusCode must be transmitted, but not the header data. If an item contains changes, it must be transmitted, together with all the associated data, including the ID, ActionCode, AcceptanceStatusCode, ConfirmedNetUnitPrice, and ConfirmedScheduleLines. If the confirmed values in ConfirmedNetUnitPrice or ConfirmedScheduleLine have changed, an item must be transmitted, together with the ID, ActionCode, AcceptanceStatusCode, ConfirmedNetUnitPrice, and ConfirmedScheduleLines; the item data should not be transmitted. If the confirmation status has changed, an item must be transmitted, together with the ID, ActionCode, and AcceptanceStatusCode. ConfirmedNetUnitPrice and ConfirmedSheduleLines should be transmitted, but not the item data. An unchanged item should not be transmitted. Items that are not transmitted are classed as unchanged and are not implicitly classed as canceled.

In some implementations, if items are not transmitted, the confirmation status "AP" (Accepted) or "RE" (Rejected) is copied from the header to all items, that is, to accept or reject an entire purchase order, only the purchase order number and the AcceptanceStatusCode have to be transmitted at header level.

The PurchaseOrder object in the message data type PurchaseOrderMessage provides a structure that is not used only for purchase order messages but also for changing and confirming a purchase order. The semantic of the PurchaseOrder object is, therefore, more generic in order to cover these aspects.

(ii) Purchase Order Party Package

The Party package 29518 groups together the business parties involved in the purchase order. It includes a BuyerParty entity 29536, a SellerParty entity 29538, a ProductRecipientParty entity 29540, a VendorParty entity 29542, a ManufacturerParty entity 29544, a BillToParty entity 29546, a PayerParty entity 29548, and a CarrierParty entity 29550.

Either the ID or the ID and address may be transferred for each party. If the ID is transferred, the ID address defined in the master data is used. If the ID and address are transferred, the ID identifies the party and the address is deemed to be a document address that is different from the master data address. A default logic is used for the parties from the header to the items and within item hierarchies. Parties specified in the header are used for the items for which a corresponding party is not explicitly transferred and that are directly assigned to the header. In accordance with the same logic, parties transferred at the item level are used for the subitems assigned to the relevant item in an item hierarchy. The default logic is used for the party as a whole, including the contact person. Parts of a party specified at the header level or for a hierarchy item should not be specified in more detail at the item level. The default logic is a simplified version of the transferred message. As regards logic, parties at the header level and for hierarchy items behave as if they have been explicitly transferred for the subitems of the message.

(a) Buyer Party

The BuyerParty is a party that buys goods or services. The BuyerParty entity 29536 is of type GDT: BusinessTransactionParty. The BuyerParty entity 29536 includes an Address entity 29552 and a ContactPerson entity 29554.

The Address entity 29552 includes a PersonName entity 29556, an Office entity 29558, a PhysicalAddress entity 29560, a GeoCoordinates entity 29562, and a Communication entity 29564.

The ContactPerson entity 29554 includes an Address entity 29566. The Address entity 29566 includes a PersonName entity 29568, an Office entity 29570, a PhysicalAddress entity 29572, a GeoCoordinates entity 29574, and a Communication entity 29576.

The same BuyerParty may be used for all of the items in a purchase order. The BuyerParty typically does not change once a purchase order has been created. The BuyerParty should typically be specified.

Changes can be made to the BuyerParty/Contact, and a different BuyerParty/Contact is permitted for each item. Changes can be made to the address of the BuyerParty, but different addresses should not be permitted for each item. If a ProductRecipientParty is not specified in the ordering process, the BuyerParty may also be used as the ProductRecipientParty. If a ProductRecipientParty and ShipToLocation are not specified in the ordering process, the BuyerParty address may be used as the ship-to address. If a BillToParty is not specified in the ordering process, the BuyerParty may also be used as the BillToParty. If a BillToParty and PayerParty are not specified in the ordering process, the BuyerParty may also be used as the PayerParty.

(b) Seller Party

The SellerParty is a party that sells goods or services. The SellerParty entity 29538 is of type GDT: BusinessTransactionDocumentParty. The SellerParty entity 29538 includes the same type of information as the BuyerParty entity 29536, as denoted by ellipses 29578.

The same Seller Party may be used for the items in a purchase order. The Seller Party should not be changed once a purchase order has been created. The Seller Party should typically be specified.

Changes can be made to the SellerParty/Contact and a different SellerParty/Contact is permitted for each item. Changes can be made to the address of the Seller Party, but different addresses should not be permitted for each item. If a VendorParty is not specified in the ordering process, the Seller Party may also be used as the VendorParty. If a VendorParty and ShipFromLocation are not specified in the ordering process, the address of the SellerParty may also be used as the ship-from address for the material items.

(c) Product Recipient Party

The ProductRecipientParty is a party to which goods are delivered or for whom services are provided. The ProductRecipientParty entity 29540 is of type GDT: BusinessTransactionDocumentParty. The ProductRecipientParty entity 29540 includes the same type of information as the BuyerParty entity 29536, as denoted by ellipses 29580.

If a ShipToLocation is not explicitly specified in the ordering process, the ProductRecipientParty address may be used as the ship-to address. The ProductRecipientParty is not synonymous with the ShipToLocation and should be used when the ProductRecipientParty (company or person) is different than the BuyerParty.

(d) Vendor Party

The VendorParty is a party that delivers goods or provides services. The VendorParty entity 29542 is of type GDT: BusinessTransactionDocumentParty. The VendorParty entity 29542 includes the same type of information as the BuyerParty entity 29536, as denoted by ellipses 29582.

If a ShipFromLocation is not specified in the ordering process, the address of the VendorParty may be used as the ship-from address for the material items. The VendorParty is not the company or person that is solely responsible for transporting the goods. Rather, the CarrierParty is responsible for this. The VendorParty is not synonymous with the ShipFromLocation and should be used when the VendorParty (company or person) is different than the SellerParty.

(e) Manufacturer Party

The ManufacturerParty is a party that manufactures goods. The ManufacturerParty entity 29544 is of type GDT: BusinessTransactionDocumentParty. The ManufacturerParty entity 29544 includes the same type of information as the BuyerParty entity 29536, as denoted by ellipses 29584.

The ManufacturerParty entity 29544 may be used for material items. The default logic (from header to item to subitems) is used for material items. For other items, the ManufacturerParty is typically ignored. The ManufacturerParty can be used to uniquely define the context of a ManufacturerProductID.

(f) Bill To Party

The BillToParty is a party to which the invoice for goods or services is sent. The BillToParty entity 29546 is of type GDT:

BusinessTransactionDocumentParty. The BillToParty entity 29546 includes the same type of information as the BuyerParty entity 29536, as denoted by ellipses 29586.

If a PayerParty is not specified in the ordering process, the BillToParty may also be used as the PayerParty. Conversely, the BillToParty may not be explicitly derived from the PayerParty.

(g) Payer Party

The PayerParty is a party that pays for goods or services. The PayerParty entity 29548 is of type GDT: BusinessTransactionDocumentParty. The PayerParty entity 29548 includes the same type of information as the BuyerParty entity 29536, as denoted by ellipses 29588.

(h) Carrier Party

The CarrierParty is a party that transports goods. The CarrierParty entity 29550 is of type GDT: BusinessTransactionDocumentParty. The CarrierParty entity 29550 includes the same type of information as the BuyerParty entity 29536, as denoted by ellipses 29590.

The CarrierParty can be used for material items. The default logic (from header to item to subitems) is typically used for material items.

(iii) Purchase Order Location Package

The Location package 29520 groups together the locations relevant for the purchase order. It includes a ShipToLocation entity 29592 and a ShipFromLocation entity 29594.

A similar default logic to that used for Parties is also used for locations. Either the ID or the address, or both can be transferred to each location. If the ID is transferred, the ID address defined in the master data is used. If the address is transferred, it is this address that is used (if necessary, a location is assigned at the address recipient). If the ID and address are transferred, the ID identifies the location and the address is deemed to be a document address that is different to the master data address.

(a) Ship To Location

The ShipToLocation is the location to which goods are to be delivered or where services are to be provided. The ShipToLocation entity 29592 is of type GDT: BusinessTransactionDocumentLocation. The ShipToLocation entity 29592 includes an Address entity 29596.

The Address entity 29596 includes a PersonName entity 29598, an Office entity 29500A, a PhysicalAddress entity 29502A, a GeoCoordinates entity 29504A, and a Communication entity 29506A.

(b) Ship From Location

The ShipFromLocation is the location from which goods are to be shipped. The ShipFromLocation entity 29594 is of type GDT: BusinessTransactionDocumentLocation. The ShipFromLocation entity 29594 includes the same type of information as the ShipToLocation entity 29592, as denoted by ellipses 29508A.

The ShipFromLocation entity 29594 may be used for material items. The default logic (from header to item to subitems) is typically used for material items. For the other items, the ShipFromLocation may be ignored.

(iv) Purchase Order Delivery Information Package

The DeliveryInformation package 29522 groups together the information for a delivery required for a purchase order. The DeliveryInformation package 29522 includes a DeliveryTerms entity 29510A. A similar default logic to that used for Parties is also used for DeliveryTerms.

The DeliveryTerms entity 29510A includes an Incoterms entity 29512A, a PartialDelivery entity 29514A, a QuantityTolerance entity 29516A, a Transport entity 29518A, and a Description entity 29520A.

The DeliveryTerms are the conditions and agreements that are valid for executing the delivery and transporting the ordered goods and for the necessary services and activities. The DeliveryTerms entity 29510A is of type GDT: DeliveryTerms. Within the DeliveryTerms, the Incoterms and the transport may be used for material items.

(v) Purchase Order Payment Information Package

The PaymentInformation package 29524 groups together the payment information about the purchase order. The PaymentInformation package 29524 includes a CashDiscountTerms entity 29522A and a PaymentForm entity 29524A.

The CashDiscountTerms are the terms of payment in an ordering process. The CashDiscountTerms entity 29522A is of type GDT: CashDiscountTerms. The CashDiscountTerms entity 29522A includes a MaximumDiscount entity 29526A and a NormalDiscount entity 29528A.

The PaymentForm is the payment form together with the data required. The PaymentForm entity 29524A includes a PaymentFormCode, which is the coded representation of the payment form. The PaymentFormCode is of type GDT: PaymentFormCode. The PaymentForm entity 29524A also includes a PaymentCard entity 29530A. The PaymentCard entity 29530A is of type GDT: PaymentCard, and is a credit card or a customer card.

(vi) Purchase Order Price Information Package

A PriceInformation package 29552A groups all price information about the purchase order. The PriceInformation package 29552A includes the Price entity 29573A.

The Price entity 29573A is the purchase order price specified by the buyer for the entire order. The Price entity 29573A includes the element NetAmount. The NetAmount element is the net amount for the ordered products without taxes and without cash discount and is of type GDT: Amount. In one implementation, the NetAmount on header level must equal the sum of the NetAmount of all items, taking into consideration the rules for the NetAmount in the item hierarchies.

(vii) Purchase Order Attachment Package

The Attachment package 29526 groups together the attachment information regarding the purchase order. It includes an Attachment entity 29532A and an AttachmentWebAddress entity 29534A. There is a 1:cn relationship between the PurchaseOrder entity 29534 and the Attachment entity 29532A, and a 1:cn relationship between the PurchaseOrder entity 29534 and the AttachmentWebAddress entity 29534A.

The Attachment 29532A is any document that refers to the purchase order. The Attachment entity 29532A is of type GDT: Attachment.

The AttachmentWebAddress 29534A identifies the address of a document that relates to the order. The document can be of any type. The AttachmentWebAddress entity 29534A is of type GDT: AttachmentWebAddress.

(viii) Purchase Order Description Package

The Description package 29528 groups together the texts regarding the purchase order. The Description package29528 includes a Description entity 29536A and an ConfirmationDescription entity 29538A. There is a 1:c relationship between the PurchaseOrder entity 29534 and the Description entity 29536A, and a 1:c relationship between the PurchaseOrder entity 29534 and the ConfirmationDescription entity 29538A.

The Description is a natural-language text regarding the purchase order, which is visible to business parties. The Description entity 29536A is of type GDT: Description. The Description can be used for the types of textual information about the transferred purchase order and not just the current message. An example of this would be information stating that the Purchasing employee responsible is on vacation as of a specific date, and indicating the name and telephone number of a substitute as of this date.

A ConfirmationDescription is a natural-language text regarding the purchase order, which is not visible to business parties. The ConfirmationDescription entity 29538A is of type GDT: Description. In variations of the Message Type PurchaseOrderRequest and PurchaseOrderChangeRequest, the ConfirmationDescription must not be used. The ConfirmationDescription can be used for all types of textual information about the order confirmation. An example of this would be the seller's justification for rejecting a particular purchase order.

(ix) Purchase Order Follow-Up Message Package

The FollowUpMessage package 29530 groups together the information about subsequent messages that the buyer expects to receive from the seller with regard to the purchase order. The FollowUpMessage package 29530 includes a FollowUpPurchaseOrderConfirmation entity 29540A, a FollowUpDespatchedDeliveryNotification entity 29542A, a FollowUpServiceAcknowledgementRequest entity 29544A, and a FollowUpInvoiceRequest entity 29546A. There is a respective 1:c relationship between the PurchaseOrder entity 29534 and the FollowUpPurchaseOrderConfirmation entity 29540A, the FollowUpDespatchedDeliveryNotification entity 29542A, the FollowUpServiceAcknowledgementRequest entity 29544A, and the FollowUpInvoiceRequest entity 29546A.

The FollowUpPurchaseOrderConfirmation identifies information about whether and in what form the buyer expects to receive confirmation of the purchase order from the seller. The FollowUpPurchaseOrderConfirmation entity 29540A includes a RequirementCode, which is a coded representation of information about whether the buyer expects to receive confirmation of the purchase order from the seller. The RequirementCode is of type GDT: FollowUpMessageRequirementCode. The RequirementCode may have the values "02" (Expected) and "04" (Unexpected). In variations, if a buyer changes a RequirementCode from "Unexpected" to "Expected" during an ordering process, the seller should send the current confirmation status, even for purchase order items that have already been delivered or invoiced. If the buyer changes the RequirementCode from "Expected" to "Unexpected," the seller should not send any more confirmations, except if the purchase order is canceled or if the seller changes it. The seller can transfer the order confirmation either electronically using a PurchaseOrderConfirmation message or by traditional methods of communication, such as e-mail or fax.

The FollowUpDespatchedDeliveryNotification identifies information about whether the buyer wants to be informed by the seller of any outbound deliveries. The FollowUpDespatchedDeliveryNotification entity 29542A includes a RequirementCode, which is a coded representation of information about whether the buyer expects the seller to send notification of any outbound deliveries of the ordered goods. The RequirementCode is of type GDT: FollowUpMessageRequirementCode. The RequirementCode may have the values "02" (Expected) and "04" (Unexpected). In variations, if the buyer changes the RequirementCode from "Unexpected" to "Expected" during an ordering process, the seller should inform the buyer of all the new outbound deliveries for the purchase order once the change has been received. If the buyer changes the RequirementCode from "Expected" to "Unexpected," the seller should not send any further information about outbound deliveries. The seller can transfer the confirmation of the outbound delivery either electronically using a DespatchedDeliveryNotification message or by traditional methods of communication, such as e-mail or fax. Confirmation of the outbound delivery can be sent for material items only, that is, the RequirementCode "Expected" can be ignored for service items.

The FollowUpServiceAcknowledgementRequest identifies information about whether the buyer wants to be informed by the seller of any services provided. The FollowUpServiceAcknowledgementRequest entity 29544A includes a RequirementCode, which is a coded representation of information about whether the buyer wants to be informed by the seller of any services provided. The RequirementCode is of type GDT: FollowUpMessageRequirementCode. The RequirementCode may have the values "02" (Expected) and "04" (Unexpected). The RequirementCode may be changed by the buyer. If the buyer changes the RequirementCode from "Unexpected" to "Expected" during an ordering process, the seller should inform the buyer of the new services provided once the change has been received. If the buyer changes the RequirementCode from "Expected" to "Unexpected," the seller should not send any further information about services provided. The seller can transfer the confirmation of the services either electronically using a ServiceAcknowledgementRequest message or by traditional methods of communication, such as e-mail or fax. In addition to service items, a confirmation of a service also can contain planned or unplanned material items for materials that were required when the service was provided. In variations, if the buyer changes the RequirementCode from "Unexpected" to "Expected" during an ordering process, the seller should inform the buyer of all the new services provided once the change has been received. If the buyer changes the RequirementCode from "Expected" to "Unexpected," the seller should not send any further information about services provided. The seller can transfer the confirmation of the services either electronically using a ServiceAcknowledgementRequest message or by traditional methods of communication, such as e-mail or fax. In addition to service items, a confirmation of a service can also contain planned or unplanned material items for materials that were required when the service was provided.

The FollowUpInvoiceRequest identifies information about whether the buyer expects to receive an invoice from the seller. The FollowUpInvoiceRequest entity 29546A includes a RequirementCode and an EvaluatedReceiptSettlementIndicator. The RequirementCode is a coded representation of information about whether the buyer expects to receive an invoice from the seller. The RequirementCode is of type GDT: FollowUpMessageRequirementCode. The EvaluatedReceiptSettlementIndicator indicates whether or not the purchase order settlement is to be processed automatically by the goods receipt, without an invoice. The EvaluatedReceiptSettlementIndicator is of type GDT: EvaluatedReceiptSettlementIndicator. The RequirementCode may have the values "0" (Required) and "05" (Forbidden). If the EvaluatedReceiptSettlementIndicator is set to "true," the RequirementCode should be set to "Forbidden." In variations, if the buyer changes the RequirementCode from "Forbidden" to "Required" during an ordering process, the buyer and seller must agree upon what exactly has to be invoiced. If the buyer changes the RequirementCode from "Required" to "Forbidden," the seller must not send any further invoices once the change has been received. The seller can transfer the invoice either electronically using an InvoiceRequest message or by traditional methods of communication, such as mail or fax. Whether or not the buyer expects to receive an invoice from the seller does not depend on the type of payment method. There are two typical cases in which the buyer does not expect to receive an invoice from the seller (1) purchase orders for goods that are free-of-charge, such as test samples, and (2) purchase orders that are to be settled using the evaluated receipt settlement (ERS) procedure (see EvaluatedReceiptSettlementIndicator).

(x) Purchase Order Item Package

The PurchaseOrderItem package 29532 includes a ScheduleLine package 29548A, a ProductInformation package 29550A, a PriceInformation package 29552A, a Party package 29554A, a Location package 29556A, a DeliveryInformation package 29558A, a BusinessTransactionDocumentReference package 29560A, an Attachment package 29562A, a Description package 29564A, a FollowUpMessage package 29559A, and a PurchaseOrderItem entity 29566A. There is a 1:cn relationship between the PurchaseOrder entity 29534 and the PurchaseOrderItem entity 29566A. Items are arranged hierarchically using a Hierarchy Relationship 29568A. The Hierarchy Relationship 29568A is the relationship between a sub-item and a higher-level parent item in an item hierarchy. There is a 1:cn relationship between the Item entity 29566A and its subordinate entities, and a 1:c relationship between the Item entity 29566A and its superordinate entities.

(a) Purchase Order Item

The PurchaseOrderItem specifies a product ordered by the purchase order or additional information about ordered products. This information includes specifications on discounts in kind, substitute products, and value limits. The PurchaseOrderItem entity 29574 includes detailed information about a particular product (see Product package) and its price (see PriceInformation package). The quantities of the product and (delivery) dates are specified in the schedule line (see ScheduleLine package).

For the PurchaseOrderItem entity 29566A (compared to the information of the PurchaseOrder), deviating parties, locations, and delivery terms may be defined (see Party package, Location package, and DeliveryInformation package). The PurchaseOrderItem entity 29566A may contain references to other business documents that are relevant for the item (see BusinessTransactionDocumentReference package). Notes or references to attachments can also be specified for the PurchaseOrderItem (see Description package and Attachment package).

A PurchaseOrderItem entity 29566A can be subordinate to another PurchaseOrderItem within a hierarchy to represent a business relationship between the two items. This could be information about a discount in kind or substitute product for an ordered product, for example. This relationship can also be used to group together purchase order items, that is, a PurchaseOrderItem can group together other PurchaseOrderItems. The PurchaseOrderItem 29566A is of type GDT: PurchaseOrderItem.

The PurchaseOrderItem entity 29566A includes the following elments: ID; SellerID; ActionCode; AcceptanceStatusCode; UnplannedItemPermissionCode; UnconfirmedQuantityCanceledIndicator; and GoodsReceiptBasedInvoiceVerificationIndicator.

The ID elment is the ID is the identifier assigned by the buyer to a purchase order item and is of type GDT: BusinessTransactionDocumentItemID. The identifier is unique within a particular purchase order and is of type GDT: BusinessTransactionDocumentItemID.

The SellerID element is the identifier assigned by the seller to a purchase order item. The identifier is unique within a particular purchase order.

The ActionCode is the coded representation of the actions used to create, change, and delete items in an ordering process at the message recipient. The ActionCode is of type GDT: ActionCode.

The AcceptanceStatusCode is the coded representation for the status of the seller's acceptance of a purchase order and is of type GDT: AcceptanceStatusCode.

The UnplannedItemPermissionCode specifies whether unplanned service entry, goods receipt, and invoice items are permitted for a purchase order item later on in the process. The UnplannedItemPermissionCode is of type GDT: UnplannedItemPermissionCode.

The UnconfirmedQuantityCanceledIndicator indicates that the seller no longer plans to confirm any quantities that have not yet been confirmed.

The GoodsReceiptBasedInvoiceVerificationIndicator indicates whether invoices for the order item should be checked against the goods entry. In the subsequent process, the biller can use this information to decide when to send the invoice (for example, immediately when the goods are issued or later, when the bill recipient should already have received the goods).

In one implementation and with respect to the Message Data Type, the ID element must not be changed once an item has been created; the SellerID element must not be changed once an item has been created; and the UnplannedItemPermissionCode element must not be changed once an item has been created.

In one implementation and with respect to the Message Type PurchaseOrderRequest, the SellerID must not be used; the AcceptanceStatusCode must not be used; and the UnconfirmedQuantityCanceledIndicator must not be used.

In one implementation and with respect to the Message Type PurchaseOrderChangeRequest, the AcceptanceStatusCode must not be used and the UnconfirmedQuantityCanceledIndicator must not be used.

From a semantic point of view, items can contain other items. This enables item hierarchies to be mapped. From a technical point of view, the item type is not defined recursively, since this cannot be handled by some commonly-used XML tools. The hierarchies are mapped using the entity HierarchyRelationship. There are various item categories, which are governed by a variety of constraints. An item can have several constraint types. In this case, the item satisfies the constraints of its constraint types. Which constraint types can be combined with one another and how is specified in the description of the constraint types. The following constraint types exist: (1) Standard items are the items to which no lower-level items have been assigned in the hierarchy. An item that is not referenced by another item, using the ParentItemID is a standard item; (2) Hierarchy items are items to which at least one other lower-level item has been assigned in the hierarchy. An item that is referenced by at least one other item, using the ParentItemID is a hierarchy item. Items are typically either standard or hierarchy items; (3) Subitems are items that have been assigned below a hierarchy item and not directly to the purchase order header. Subitems can be both standard items and hierarchy items. A subitem is an item that references another item using the ParentItemID; (4) Material items are items whose product is a material. Items whose ProductTypeCode is "1" (Material) are material items; (5) Service items are items whose product is a service. Items whose ProductTypeCode is "2" (Service) are service items; (6) Unspecified product items are items for which it is not specified whether they refer to a material or a service. Items whose ProductTypeCode is not specified are unspecified product items. Items are material, service, or unspecified product items. An unspecified product item satisfies the constraints of a material, service, or limit item; (7) Grouping hierarchy items are hierarchy items that logically group together other items. Multilevel grouping hierarchies are permitted, that is, a grouping hierarchy item can contain subitems that are also grouping hierarchy items. Hierarchy items whose subitems have HierarchyRelationshipTypeCode "002" (Group) are grouping hierarchy items; subitems with a different HierarchyRelationshipTypeCode are not permitted. Grouping hierarchy items are not permitted to be subitems of other types of hierarchy items; (8) Substitute product hierarchy items are hierarchy items for which at least one subitem with a substitute product exists. Multilevel substitute product hierarchies are not permitted, that is, a substitute product cannot be substituted. Hierarchy items whose subitems have HierarchyRelationshipTypeCode "006" (Substitute Product) are substitute product hierarchy items; subitems with a different HierarchyRelationshipTypeCode are not permitted. Substitute product hierarchy items can be used as subitems in grouping hierarchies. Substitute product subitems can be transferred in the PurchaseOrderConfirmation message. The buyer can reject proposed substitute products by cancelling the entire associated substitute product hierarchy item; (9) BOM hierarchy items are hierarchy items that group together other items in a BOM. Multilevel BOM hierarchies are permitted. Hierarchy items with at least one subitem with HierarchyRelationshipTypeCode "001" (Bill of Material) are BOM hierarchy items; additional subitems are permitted with the HierarchyRelationshipTypeCode "003" (Discount in Kind); (10) Discount in kind hierarchy items are hierarchy items for which a goods discount is granted in the form of an inclusive or exclusive bonus quantity. Multilevel discount in kind hierarchies are not permitted, that is, no discount in kind can be granted for discount in kind. The goods discount is described in the form of one or more subitems in the discount in kind hierarchy item. Hierarchy items with at least one subitem with HierarchyRelationshipTypeCode "003" (Discount in Kind) are discount in kind hierarchy items; additional subitems are permitted with the HierarchyRelationshipTypeCode "001" (Bill of Material). Hierarchy items are grouping, BOM, or discount in kind hierarchy items. A hierarchy item can be both a BOM and discount in kind hierarchy item, if a discount in kind has been granted for a BOM; (11) Limit items are both standard and unspecified product items for which the exact requirements are unknown at the time of ordering. Items with a ProcurementCostUpperLimit are limit items. Limit items are not permitted to be subitems of BOM or discount in kind hierarchy items. No substitute product subitems are permitted for limit items. Dependencies between elements or entities of this item category are described under "Notes" for the relevant element or entity.

(b) Hierarchy Relationship

A HierarchyRelationship is the relationship between a subitem and a higher-level parent item in an item hierarchy. The HierarchyRelationship 29568A includes a ParentItemID and a TypeCode. The ParentItemID is the reference to the parent item with the item number assigned by the buyer. The ParentItemID is of type GDT: BusinessTransactionDocumentItemID. The TypeCode represents the hierarchical relationship between the subitem and its higher-level parent item. The TypeCode is of type GDT: BusinessTransactionDocumentItemHierarchyRelationshipTypeCode. The ParentItemID and the TypeCode typically do not changed once an item has been created.

(c) Purchase Order Item Product Information Package

The ProductInformation package 29550A groups together the information for identifying, describing, and classifying a product in an ordering process. It includes a Product entity 29570A and a ProductCategory entity 29572A. There is a 1:c relationship between the PurchaseOrderItem entity 29566A and the Product entity 29570A, and a 1:c relationship between the PurchaseOrderItem entity 29566A and the ProductCategory entity 29572A. The product package is not used in grouping hierarchy items.

The Product includes the details about a product as generally understood from a commercial point of view in business documents. These are the details for identifying a product and product type, and the description of the product. The Product entity 29570A is of type GDT: BusinessTransactionDocumentProduct. For limit items, the description (Note) can be used in the Product entity 29570A. The product number and ProductTypeCode are typically not used. The ProductTypeCode typically does not change once an item has been created. With the exception of grouping hierarchy items, at least the product number or the product description (Note) is specified when a new item is created. If both the product number and description are specified, the description is additional information in the message and can typically be ignored by the recipient. In substitute product subitems, the ProductTypeCode is the same as the parent item ProductTypeCode. In substitute product subitems, the product is the substitute product proposed by the vendor for the product ordered in the associated substitute product hierarchy item.

The ProductCategory includes the details about a product category as generally understood from a commercial point of view in business transaction documents. It includes details for identifying the product category using an internal ID, a standard ID, and IDs assigned by involved parties. The ProductCategory entity 29572A is of type GDT: BusinessTransactionDocumentProductCategory.

(d) Purchase Order Item Price Information Package

The PriceInformation package 29552A groups together the price information in an order item. The Price package includes a Price entity 29574A, a ConfirmedPrice entity 29576A, and a ProcurementCostUpperLimit entity 29578A. There is a respective 1:c relationship 29575A, 29577A, and 29579A between the PurchaseOrderItem entity 29566A and the Price entity 29574A, the ConfirmedPrice entity 29576A, and the ProcurementCostUpperLimit entity 29578A.

The Price is typically not used in grouping hierarchy and discount in kind items. The ProcurementCostUpperLimit is typically used for limit items, whereas the Price and the Confirmed Price are typically not used. The ProcurementCostUpperLimit is typically not used for any items other than limit items. The PriceInformation package 29552A for a purchase order item includes prices; it typically does not contain any information about how the prices are calculated (pricing scales, and so on).

(i) Price

The Price is the order price specified by the buyer. The Price entity 29574A includes a NetUnitPrice, which is the net price specified by the buyer for the base quantity (without tax or cash discount) of the product. The NetUnitPrice is of type GDT: Price. The Price entity 29574A also includes a NetAmount, which is an amount specified by the buyer for the ordered products without taxes and without cash discount. The NetAmount is of type GDT: Amount.

In BOM hierarchies: (1) if the price is specified for the item at the top of the BOM hierarchy and not for the subitems, this price applies; (2) if the price is specified for standard items (end nodes in the hierarchy tree) in the BOM hierarchy, these prices apply, where the price of the entire BOM is the total of the individual prices; and (3) if a price is specified at different levels in the BOM hierarchy, the price that appears above the others in the tree applies. Differences between the total of the individual prices and the price at the next highest hierarchy level are permissible. These may be caused by discounts for the entire BOM. In substitute product subitems, the Price can be used to transfer substitute product prices. The same rules apply here as for the Price in BOM hierarchies.

(ii) Confirmed Price

The ConfirmedPrice is the purchase order price confirmed by the seller. The ConfirmedPrice entity 29576A includes a NetUnitPrice, which is the net price (without tax or cash discount) confirmed by the seller for the base quantity of the product. The NetUnitPrice is of type GDT: Price. In BOM and substitute product hierarchies, the same rules apply for the ConfirmedPrice as for the Price.

(e) Purchase Order Item Party Package

The PurchaseOrderItemParty Package 29554A is similar to the Party package 29518 at the header level. The PurchaseOrderItemParty Package 29554A includes a BuyerParty entity 29580A, a SellerParty entity 29582A, a ProductRecipientParty entity 29584A, a VendorParty entity 29586A, a ManufacturerParty entity 29588A, a BillToParty entity 29590A, a PayerParty entity 29592A, and a CarrierParty entity 29594A. There is a respective 1:c relationship 29581A, 29583A, 29585A, 29587A, 29589A, 29591A, 29593A, and 29595A between the PurchaseOrderItem entity 29566A and the BuyerParty entity 29580A, the SellerParty entity 29582A, the ProductRecipientParty entity 29584A, the VendorParty entity 29586A, the ManufacturerParty entity 29588A, the BillToParty entity 29590A, the PayerParty entity 29592A, and the CarrierParty entity 29594A. Each of the BuyerParty entity 29580A, the SellerParty entity 29582A, the ProductRecipientParty entity 29584A, the VendorParty entity 29586A, the ManufacturerParty entity 29588A, the BillToParty entity 29590A, the PayerParty entity 29592A, and the CarrierParty entity 29594A includes the same type of information as the BuyerParty entity 29536 above, as denoted by ellipses.

(f) Purchase Order Item Location Package

The PurchaseOrderItemLocation Package 29556A is similar to the Location package 29520 at the header level. The PurchaseOrderItemLocation Package 29556A includes a ShipToLocation entity 29512B and a ShipFromLocation entity 29514B. There is a 1:c relationship between the PurchaseOrderItem entity 29566A and the ShipToLocation entity 29512B, and there is a 1:c relationship between the PurchaseOrderItem entity 29566A and the ShipFromLocation entity 29514B. The ShipToLocation entity 29512B and the ShipFromLocation entity 29514B include the same type of information as the ShipToLocation entity 29592, as denoted by ellipses 29516B and 29518B.

(g) Purchase Order Item Delivery Information Package

The PurchaseOrderDeliveryLocation Package 29556A is similar to the DeliveryInformation package 29522 at the header level. The PurchaseOrderDeliveryLocation Package 29556A includes DeliveryTerms entity 29520B. There is a 1:c relationship between the PurchaseOrderItem entity 29566A and the DeliveryTerms entity 29520B.

The DeliveryTerms entity 29520B includes an Incoterms entity 29522B, a PartialDelivery entity 29524B, a QuantityTolerance entity 29526B, a Transport entity 29528B, and a Description entity 29530B. There is a 1:c relationship between the DeliveryTerms entity 29520B and the Incoterms entity 29522B. There is a 1:c relationship between the DeliveryTerms entity 29520B and the PartialDelivery entity 29524B. There is a 1:c relationship between the DeliveryTerms entity 29520B and the QuantityTolerance entity 29526B. There is a 1:c relationship between the DeliveryTerms entity 29520B and the Transport entity 29528B. There is a 1:c relationship between the DeliveryTerms entity 29520B and the Description entity 29530B.

(h) Purchase Order Item Business Transaction Document Reference Package

The BusinessTransactionDocumentReference package 29560A groups together the references to business documents that are relevant for the PurchaseOrderItem and have a business relationship with the item. The BusinessTransactionDocumentReference package 29560A includes a QuoteReference entity 29532B, a PurchaseContractReference entity 29534B, SalesContractReference entity 29535B, an OriginPurchaseOrderReference entity 29536B, a BuyerProductCatalogueReference entity 29538B, and a SellerProductCatalogueReference entity 29540B. There is a respective 1:c relationship between the PurchaseOrderItem entity 29566A and the QuoteReference entity 29532B, the PurchaseContractReference entity 29534B, the OriginPurchaseOrderReference entity 29536B, the BuyerProductCatalogueReference entity 29538B, and the SellerProductCatalogueReference entity 29540B. None of the entities in the BusinessTransactionDocumentReference package 29560A should be used in grouping hierarchy items.

Individual items in business documents should be referenced in the purchase order messages from the item level. If an item assignment is not recognized, an entire document can be referenced. In this case, the recipient cannot demand that the item numbers in both documents be the same. It is the responsibility of the recipient to try to make this assignment using other criteria that are not necessarily unique, such as the product number. References are used for establishing relationships between different documents. If a reference has been provided, the data relevant to the purchase order is transferred from the document referenced in the purchase order message (the product number in a purchase order item is transferred even if the product number can be derived directly from a bid reference). The data in the purchase order message can differ in any number of ways from the referenced documents. The recipient is able to respond appropriately to such deviations.

A QuoteReference is a reference to a quotation or an item within a quotation. The QuoteReference entity 29532B is of type GDT: BusinessTransactionDocumentReference. The QuoteReference entity 29532B may reference one item, that is, one ItemID is permissible.

A PurchaseContractReference is a reference to a purchase contract or item in a purchase contract. The PurchaseContractReference entity 29534B is of type GDT: BusinessTransactionDocumentReference. In limit items, multiple contract references are possible; a maximum of one contract reference is permissible in other item types. A PurchaseContractReference entity 29534B can reference one item, that is, one ItemID is permissible. Unless otherwise agreed, the seller is responsible for determining the correct PurchaseContractReference for a specified SellerContractReference.

An OriginPurchaseOrderReference is a reference to the origin purchase order or to an item within the origin purchase order in a third-party deal. The OriginPurchaseOrderReference entity 29536B is of type GDT: BusinessTransactionDocumentReference. An OriginPurchaseOrderReference entity 29536B can reference one item, that is, one ItemID is permissible. The OriginPurchaseOrderReference 29536B is used in the purchase orders in a third-party deal, so that the seller can reference the original purchase order of the ShipToParty with the OriginPurchaseOrderReference.

A BuyerProductCatalogueReference is a reference to the buyer's product catalogue or an item within the buyer's product catalogue. The BuyerProductCatalogueReference entity 29538B is of type GDT: CatalogueReference. A BuyerProductCatalogueReference entity 29538B can reference one item, that is, one ItemID is permissible. The BuyerProductCatalogueReference entity 29538B should be filled if a purchase order item refers to a catalogue whose number and item numbers were assigned by the buyer. In the ordering process, the BuyerProductCatalogueReference can be used as a substitute product number if the product is defined in a catalogue rather than having its own master record.

A SellerProductCatalogueReference is a reference to the seller's product catalogue or an item within the seller's product catalogue. The SellerProductCatalogueReference entity 29540B is of type GDT: CatalogueReference. A SellerProductCatalogueReference entity 29540B can reference one item, that is, one ItemID is permissible. The SellerProductCatalogueReference entity 29540B should be filled if a purchase order item refers to a catalogue whose number and item numbers were assigned by the seller. In the ordering process, the SellerProductCatalogueReference can be used as a substitute product number if the product is defined in a catalogue rather than having its own master record.

(i) Purchase Order Item Attachment Package

The PurchaseOrderItemAttachment Package is similar to the Attachment package 29526 at the header level. The PurchaseOrderItemAttachment Package 29562A includes an Attachment entity 29542B and an AttachmentWebAddress entity 29544B. There is a 1:cn relationship between the PurchaseOrderItem entity 29566A and the AttachmentWebAddress entity 29544B, and a 1:cn relationship between the PurchaseOrderItem entity 29566A and Attachment entity 29542B.

(j) Purchase Order Item Description Package

The PurchaseOrderItemDescription Package 29564A is similar to the Description package 29528 at the header level. The PurchaseOrderItemDescription Package 29564A includes a Description entity 29546B and a ConfirmationDescription entity 29548B. There is a 1:c relationship between the PurchaseOrderItem entity 29566A and the Description entity 29546B, and a 1:c relationship between the PurchaseOrderItem entity 29566A and the ConfirmationDescription entity 29548B.

(k) Purchase Order Item Follow-Up Message Package

The FollowUpMessage package 29559A groups together the information about subsequent messages that the buyer expects to receive from the seller with regard to the purchase order. The FollowUpMessage package 29559A includes a FollowUpPurchaseOrderConfirmation entity 29500C, a FollowUpDespatchedDeliveryNotification entity 29502C, a FollowUpServiceAcknowledgementRequest entity 29504C, and a FollowUpInvoiceRequest entity 29506C. There is a respective 1:c relationship between the PurchaseOrderItem entity 29566A and the FollowUpPurchaseOrderConfirmation entity 29500C, the FollowUpDespatchedDeliveryNotification entity 29502C, the FollowUpServiceAcknowledgementRequest entity 29504C, and the FollowUpInvoiceRequest entity 295406C.

(l) Purchase Order Item Schedule Line Package

A ScheduleLine package 29548A groups together the quantity and date information about a PurchaseOrderItem. The ScheduleLine package 29548A includes a ScheduleLine entity 29550B and a ConfirmedScheduleLine entity 29552B. There is a 1:n relationship between the PurchaseOrderItem entity 29566A and the ScheduleLine entity 29550B, and a 1:cn relationship between the PurchaseOrderItem entity 29566A and the ConfirmedScheduleLine entity 29552B.

There is no direct relationship between the ScheduleLine entity 29550B and the ConfirmedScheduleLine entity 29552B. This has the advantage that the case "10 pieces for 01/01 and 10 pieces for 02/01" ordered as "20 pieces for 02/01" can be confirmed simply and without interpretation on the part of the applications.

(i) Schedule Line

A ScheduleLine is a line containing the quantity and date of a performance schedule required by the buyer for a purchase order. The ScheduleLine entity 29550B is of type GDT: PurchaseOrderItemScheduleLine. The ScheduleLine entity 29550B includes a DeliveryPeriod entity 29554B. There is a 1:c relationship 29555B between the ScheduleLine entity 29550B and the DeliveryPeriod entity 29554B.

The ScheduleLine 29550B also includes an ID, SellerID, a DeliveryPeriod, and a Quantity. The ID is the ScheduleLine number assigned by the procurement system. The ID is of type GDT: ScheduleLineID. The SellerID is the ScheduleLine number assigned by the sales system. The SellerID is of type GDT: ScheduleLineID. The DeliveryPeriod is the period in which the buyer expects a product to be delivered or service provided. The DeliveryPeriod is of type GDT: DateTimePeriod. The Quantity is the purchase order quantity. The Quantity is of type GDT: Quantity.

Multiple ScheduleLines for a purchase order item with identical DeliveryPeriod should not be permitted. All of the ScheduleLines for a particular item typically use the same unit of measure. ScheduleLines should not be used for grouping hierarchy items. In this case, the ScheduleLines is explicitly specified for the subitems. ScheduleLines do not have to be specified for limit items. At least one ScheduleLine is specified for the other item types. Within a ScheduleLine, the quantity is not used for limit items. For the other types of items, the quantity is specified. In the ScheduleLines of subitems for discount in kind and BOM hierarchy items, the DeliveryPeriod of the subitems is identical to the DeliveryPeriod of the relevant parent items. In the ScheduleLines of substitute product subitems, the DeliveryPeriod of the subitems is identical to the DeliveryPeriod of the relevant parent items. The quantities and confirmed quantities of the subitems should be added to the quantities of the parent items, and where deviations occur, the quantities of subitems are typically regarded as the valid quantities. The ID is optional; i.e., a procurement system does not have to number the ScheduleLines.

(ii) Confirmed Schedule Line

A ConfirmedScheduleLine is a line containing the quantity and date of a performance schedule confirmed by the seller for a purchase order. The ConfirmedScheduleLine entity 29552B is of type GDT: PurchaseOrderItemScheduleLine. There is a 1:cn relationship between the PurchaseOrderItem entity 29566A and the ConfirmedScheduleLine entity 29552B. The ConfirmedScheduleLine entity 29552B includes a DeliveryPeriod entity 29556B. There is a 1:c relationship between the ConfirmedScheduleLine entity 29552B and the DeliveryPeriod entity 29556B.

The ConfirmedScheduleLine entity 29552B also includes an ID, a DeliveryPeriod, and a Quantity. The ID is the ConfirmedScheduleLine number assigned by the procurement system. The ID is of type GDT: ScheduleLineID. The DeliveryPeriod is the period in which the seller provides the buyer with confirmation of a delivery or the provision of a service. The DeliveryPeriod is of type GDT: DateTimePeriod. The Quantity is the quantity confirmed by the seller. The Quantity is of type GDT: Quantity.

Multiple ConfirmedScheduleLines are typically not permitted for a purchase order item with identical DeliveryPeriod. The same rules apply for the use of the ConfirmedScheduleLine for the various item types as described for the ScheduleLine. Confirmation of a partial quantity does not mean cancellation of the remaining quantity. It simply means that the seller has agreed to this partial quantity and has not yet made a decision about the remaining quantity. In order to cancel a remaining quantity, the seller reduces the quantity of the ScheduleLine (not that of the ConfirmedScheduleLine) accordingly.

(4) Message Data Type Purchase Order Cancellation Message

The message data type PurchaseOrderCancellationMessage groups together the business information that is relevant for sending a business document in a message and the PurchaseOrderCancellation object in the business document. The message data type PurchaseOrderCancellationMessage includes a PurchaseOrderCancellationMessage package 29602, which includes a PurchaseOrderCancellationMessage entity 29604, a BusinessDocumentMessageHeader package 29606 and a PurchaseOrderCancellation package 29608. The message data type PurchaseOrderMessage makes the structure available for the message types PurchaseOrderCancellationRequest and the relevant interfaces.

The MessageHeader package 29606 includes a MessageHeader entity 29610. There is a 1:c relationship 29612 between the PurchaseOrderCancellationMessage entity 29604 and the MessageHeader entity 29610. The ReferenceID element of the BusinessDocumentMessageHeader entity establishes the reference to the purchase order to be cancelled.

The MessageHeader entity 29610 includes a SenderParty entity 29614 and a RecipientParty entity 29616. There is a 1:c relationship 29618 between the MessageHeader entity 29610 and the SenderParty entity 29614. There is a 1:c relationship 29620 between the MessageHeader entity 29610 and the RecipientParty entity 29616. The SenderParty entity 29614 and the RecipientParty entity 29616 include the same elements as those described for the Party entity in the Purchase Order Message as denoted by ellipses 29622 and 29624.

A PurchaseOrderCancellation package 29608 groups together the PurchaseOrderCancellation data type, which is a buyer's request to a seller to cancel a purchase order. PurchaseOrderCancellation package 29608 includes a PurchaseOrderCancellation entity 29626. There is a 1:1 relationship 29628 between the PurchaseOrderCancellationMessage entity 29604 and the PurchaseOrderCancellation entity 29626. The PurchaseOrderCancellation entity 29626 includes an ID, which is a unique identifier specified by the buyer for the purchase order.

FIGS. 297A-ZA depict the element structure for Purchase Order Interfaces. The element structure is similar to the data model, but provides additional information regarding the details of the interface. The element structure identifies the different packages 29700 in the interface, and represents the entities and/or attributes at various levels within the interface. As depicted in FIGS. 297A-ZA, the interface for Purchase Order Interface includes seven levels 29702, 29704, 29706, 29708, 29710, 29712, and 29714. The element structure identifies the cardinality or occurrence 29716 between the entities and/or attributes of the interface, and provides information (i.e., type 29718 and name 29720) regarding the data type that provides the basis for the entity and/or attributes. The outermost package of this interface is an PurchaseOrderMessage package 29722, which includes PurchaserOrderMessages entity 29724 at the first level 29702. The PurchaserOrderMessages entity 29724 is of type message data type ("MDT") 29726 "Purchase Order Message" 29728.

The PurchaseOrderMessage package 29722 includes a MessageHeader package 29730 and a PurchaseOrder package 29732. The MessageHeader package 29730 includes MessageHeader entity 29734, which is of type AGDT 29738 BusinessDocumentMessageHeader 29740. There is one 29736 MessageHeader entity 29734 for each PurchaseOrderMessage entity 29724.

The MessageHeader entity 29734 includes a MessageID 29742, a ReferenceID 29750, and a CreationDateTime 29758. MessageID 29742 is of type GDT 29746 BusinessDocumentMessageID 29748. ReferenceID 29750 is of type GDT 29754 BusinessDocumentMessageID 29756. CreationDateTime 29758 is of type GDT 29762 DateTime 29764. There is one 29744 MessageID 29742 for each MessageHeader entity 29734, one or zero 29752 ReferenceID for each MessageHeader entity 29734, and one 29760 CreationDateTime 29758 for each MessageHeader entity 29734.

The MessageHeader entity 29734 also includes a SenderParty entity 29766 and a RecipientParty entity 29722A. The SenderParty entity 29766 is of type AGDT 29770 BusinessDocumentMessageHeaderParty 29772, and RecipientParty entity 29722A is of type AGDT 29726A BusinessDocumentMessageHeaderParty 29728A. There is one or zero 29768 SenderParty entity 29766 for each MessageHeader entity 29734. There is any number 29724A of RecipientParty entities 29722A for each MessageHeader entity 29734.

The SenderParty entity 29766 includes an InternalID 29774, a StandardID 29782, and a ContactPerson 29790. The InternalID 29774 is of type CDT 29778 PaymentInternalID 29780. StandardID 29782 is of type CDT 29786 PartyStandardID 29788. ContactPerson 29790 is of type CDT 29794 ContactPerson 29796. There is zero or one 29776 InternalID 29774 for each SenderParty entity 29766. There is any number 29784 of StandardID 29782 for each SenderParty entity 29766. There is zero or one 29792 ContactPerson 29790 for each SenderParty entity 29766.

The ContactPerson 29790 includes a BuyerID 29798, a SellerID 29706A, and an Address 29714A. The BuyerID 29798 is of type CDT 29702A ContactPersonPartyID 29704A. The SellerID 29706A is of type CDT 29710A ContactPersonPartyID 29712A. The Address 29714A is of type AGDT 29718A Address 29720A. There is respectively one or zero 29700A, 29708A, and 29716A BuyerID 29798, SellerID 29706A, and Address 29714A for each ContactPerson 29790.

The PurchaseOrder package 29732 includes a Party package 29710B, a Location package 29712B, a DeliveryInformation package 29714B, a PaymentInformation package 29716B, an Attachment package 29718B, a Description package 29720B, a FollowUpBusinessTransactionDocument package 29722B, and an Item package 29724B. The PurchaseOrder package 29732 also includes a PurchaseOrder entity 29730A. The PurchaseOrder entity 29730A is of type AGDT 29734A PurchaseOrder 29736A. There is one 29732A PurchaseOrder entity 29730A for each PurchaseOrderMessage entity 29724.

The PurchaseOrder entity 29730A includes an ID 29738A, a SellerID 29746A, a BuyerPostingDateTime 29754A, a BuyerLastChangeDateTime 29762A, a SellerPostingDateTime 29770A, a SellerLastChangeDateTime 29778A, an AcceptanceStatusCode 29786A, a Note 29794A, and an ItemListCompleteTransmissionIndicator 29702B. ID is of type GDT 29742A BusinessTransactionDocumentID 29744A. SellerID 29746A is of type GDT 29750A BusinessTransactionDocumentID 29752A. BuyerPostingDateTime 29754A is of type GDT 29758A DateTime 29760A. BuyerLastChangeDateTime 29762A is of type GDT 29766A DateTime 29768A. SellerPostingDateTime 29770A is of type GDT 29774A DateTime 29776A. SellerLastChange- DateTime 29778A is of type GDT 29782A DateTime 29784A. AcceptanceStatusCode 29786A is of type GDT 29790A AcceptanceStatusCode 29792A. Note 29794A is of type GDT 29798A Note 29700B. ItemListCompleteTransmissionIndicator 29702B is of type GDT 29706B CompleteTransmissionIndicator 29708B. There is one 29740A ID 29738A for each PurchaseOrder entity 29730A. There is respectively zero or one 29748A, 29756A, 29764A, 29772A, 29780A, 29788A, 29796A, and 29704B SellerID 29746A, BuyerPostingDateTime 29754A, BuyerLastChangeDateTime 29762A, SellerPostingDateTime 29770A, SellerLastChangeDateTime 29778A, AcceptanceStatusCode 29786A, Note 29794A, and ItemListCompleteTransmissionIndicator 29702B for each PurchaseOrder entity 29730A.

The Party package 29710B includes a BuyerParty entity 29726B, a SellerParty entity 29714C, a ProductRecipientParty entity 29724C, a VendorParty entity 29732C, a ManufacturerParty entity 29740C, a BillToParty entity 29748C, a PayerParty entity 29756C, and a CarrierParty entity 29764C.

The BuyerParty entity 29726B is of type AGDT 29730B BusinessTransactionDocumentParty 29732B. The SellerParty entity 29714C is of type AGDT 29720C BusinessTransactionDocumentParty 29722C. The ProductRecipientParty entity 29724C is of type AGDT 29728C BusinessTransactionDocumentParty 29730C. The VendorParty entity 29732C is of type AGDT 29736C BusinessTransactionDocumentParty 29738C. The ManufacturerParty entity 29740C is of type AGDT 29744C BusinessTransactionDocumentParty 29746C. The BillToParty entity 29748C is of type AGDT 29752C BusinessTransactionDocumentParty 29754C. The PayerParty entity 29756C is of type AGDT 29760C BusinessTransactionDocumentParty 29762C. The CarrierParty entity 29764C is of type AGDT 29768C BusinessTransactionDocumentParty 29770C. There is zero or one 29728B BuyerParty entity 29726B for each PurchaseOrder entity 29730A. There is zero or one 29716C SellerParty entity 29714C for each PurchaseOrder entity 29730A. There is zero or one 29726C ProductRecipientParty entity 29724C for each PurchaseOrder entity 29730A. There is zero or one 29734C VendorParty entity 29732C for each PurchaseOrder entity 29730A. There is zero or one 29742C ManufacturerParty entity 29740C for each PurchaseOrder entity 29730A. There is zero or one 29750C BillToParty entity 29748C for each PurchaseOrder entity 29730A. There is zero or one 29758C PayerParty entity 29756C for each PurchaseOrder entity 29730A. There is zero or one 29766C CarrierParty entity 29764C for each PurchaseOrder entity 29730A.

The BuyerParty entity 29726B includes a StandardID 29734B, a BuyerID 29742B, a SellerID 29750B, an Address 29758B, and a ContactPerson 29766B. The StandardID 29734B is of type CDT 29738B PartyStandardID 29740B. The BuyerID 29742B is of type CDT 29746B PartyPartyID 29748B. The SellerID 29750B is of type CDT 29754B PartyPartyID 29756B. The Address 29758B is of type AGDT 29762B Address 29764B. The ContactPerson 29766B is of type CDT 29770B ContactPerson 29772B. There are any number 29736B of StandardID 29734B for each BuyerParty 29726B. There is zero or one 29744B BuyerID 29742B for each BuyerParty 29726B. There is zero or one 29752B SellerID 29750B for each BuyerParty 29726B. There is zero or one 29760B Address 29758B for each BuyerParty 29726B. There is zero or one 29768B ContactPerson 29766B for each BuyerParty 29726B.

The ContactPerson 29766B includes a BuyerID 29790B, a SellerID 29798B, and an Address 29706C. The BuyerID is of type CDT 29794B ContactPersonPartyID 29796B. The SellerID 29798B is of type CDT 29702C ContactPersonPartyID 29704C. The Address 29706C is of type AGDT 29710C Address 29712C. There is zero or one 29792B BuyerID 29790B for each ContactPerson 29766B. There is zero or one 29700C SellerID 29798B for each ContactPerson 29766B. There is zero or one 29708C Address 29706C for each ContactPerson 29766B.

The Location package 29712B includes a ShipToLocation entity 29772C and a ShipFromLocation entity 29712D. The ShipToLocation entity 29772C is of type AGDT 29776C BusinessTransactionDocumentShipToLocation 29778C, and the ShipFromLocation entity 29712D is of type AGDT BusinessTransactionDocumentShipFromLocation 29718D. There is zero or one 29774C ShipToLocation entity 29772C for each PurchaseOrder entity 29730A, and zero or one 29714D ShipFromLocation entity 29712D for each PurchaseOrder entity 29730A.

The ShipToLocation entity 29772C includes a StandardID 29780C, a BuyerID 29788C, a SellerID 29796C, and an Address 29704D. There are any number 29782C of Standard ID 29780C for each ShipToLocation entity 29772C, zero or one 29790C BuyerID 29788C for each ShipToLocation entity 29772C, zero or one 29798C SellerID 29796C for each ShipToLocation entity 29772C, and zero or one 29706D Address 29704D for each ShipToLocation entity 29772C. The StandardID 29780C is of type CDT 29784C LocationStandardID 29786C. The BuyerID 29788C is of type CDT 29792C LocationPartyID 29794C. The SellerID 29796C is of type CDT 29700D LocationPartyID 29702D. The Address 29704D is of type AGDT 29708D Address 29710D.

The DeliveryInformation package 29714B includes a DeliveryTerms entity 29720D. The DeliveryTerms entity 29720D includes a DeliveryItemGroupID 29728D, a DeliveryPriorityCode 29736D, an Incoterms 29744D, a PartialDelivery 29760D, a QuantityTolerance 29780D, a MaximumLeadTimeDuration 29712E, a Transport 29720E, and a Description 29748E. The DeliveryItemGroupID 29728D has an occurrence of zero or one 29730D for each DeliveryTerms entity 29720D, and is of type GDT 29732D BusinessTransactionDocumentItemGroupID 29734D. The DeliveryPriorityCode 29736D has an occurrence of zero or one 29738D for each DeliveryTerms entity 29720D, and is of type GDT 29740D BusinessTransactionPriorityCode 29742D. The Incoterms 29744D has an occurrence of zero or one 29746D for each DeliveryTerms entity 29720D, and is of type GDT 29748D Incoterms 29750D. The PartialDelivery 29760D has an occurrence of zero or one 29762D for each DeliveryTerms entity 29720D, and is of type AGDT 29764D PartialDelivery 29766D. The QualityTolerance 29780D has an occurrence of zero or one 29782D for each DeliveryTerms entity 29720D, and is of type AGDT 29784D QuantityTolerance 29786D. The MaximumLeadTimeDuration 29712E has an occurrence or zero or one 29714E for each DeliveryTerms entity 29720D, and is of type GDT 29716E Duration 29718E. The Transport 29720E has an occurrence of zero or one 29722E for each DeliveryTerms entity 29720D. The Description 29748E has an occurrence of zero or one 29750E for each DeliveryTerms entity 29720D, and is of type GDT 29752E Description 29754E.

The Incoterms entity 29744D includes a ClassificationCode 29752D and a TransferLocationName 29756D. There is one 29754D ClassificationCode 29752D for each Incoterm 29744D, and zero or one 29758D TransferLocationName 29756D for each Incoterm 29744D.

The PartialDelivery 29760D includes a MaximalNumber 29768D and an UnlimitedIndicator 29772D. There is zero or one 29770D MaximalNumber 29768D for each PartialDelivery 29760D, and zero or one 29774D UnlimitedIndicator 29772D for each PartialDelivery 29760D. The UnlimitedIndicator 29772D is of type GDT 29776D UnlimitedIndicator 29778D.

The QualityTolerance 29780D includes an OverPercent 29788D, an OverPercentUnlimitedIndicator 29796D, and an UnderPercent 29704E. The OverPercent 29788D is of type GDT 29792D Percent 29794D, the OverPercentUnlimitedIndicator 29796D is of type GDT 29700E UnlimitedIndicator 29702E, and the UnderPercent 29704E is of type GDT 29708E Percent 29710E. There is zero or one 29790D Overpercent 29788D for each QualityTolerance 29780D, zero or one 29798D OverPercentUnlimitedIndicator 29796D for each QualityTolerance 29780D, and zero or one 29706E UnderPercent 29704E for each QualityTolerance 29780D.

The Transport 29772E includes a ServiceLevelCode 29724E, a ModeCode 29732E, and a MeansDescriptionCode 29740E. The ServiceLevelCode 29724E has an occurrence of zero or one 29726E for each Transport 29720E, and is of type GDT 29728E TransportServiceLevelCode 29730E. The ModeCode 29732E has an occurrence of zero or one 29734E for each Transport 29720E, and is of type GDT 29736E TransportModeCode 29738E. The MeansDescriptionCode 29740E has an occurrence of zero or one 29742E for each Transport 29720E, and is of type GDT 29744E TransportMeansDescriptionCode 29746E.

The Description 29748E includes a LanguageCode 29756E. There is one 29758E LanguageCode 29756E for each Description 29748E.

The Payment Information package 297146B includes a CashDiscountTerms 29758E. The CashDiscountTemms 29758E is of type AGDT 29762E CashDiscountTerms 29764E. There is zero or one 29760E CashDiscountTerns 29758E for each PurchaseOrder 29730A.

The CashDiscountTerms 29758E includes a PaymentBaseLineDate 29766E, a MaximumCashDiscount 29774E, a NornalCashDiscount 29790E, and a FullPaymentDueDaysValue 29710F. The PaymentBaseLineDate 29766E is of type GDT 29770E Date 29772E. There is zero or one 29768E PaymentBaseLineDate 29766E for each CashDiscountTerms 29758E. The MaximumCashDiscount 29774E is of type GDT 29778E CashDiscount 29780E. There is zero or one 29776E MaximumCashDiscount 29774E for each CashDiscountTerms 29758E. The NormalCashDiscount 29790E is of type GDT 29794E CashDiscount 29796E. There is zero or one 29792E NormalCashDiscount 29790E for each CashDiscountTerms 29758E. There is zero or one 29712F FullPaymentDueDaysValue 29710F for each CashDiscountTerms 29758E.

The MaximumCashDiscount 29774E includes a DaysValue 29782E and a Percent 29784E. There is one 29783E DaysValue 29782E for each MaximumCashDiscount 29774E, and one 29785E Percent 29784E for each MaximumCashDiscount 29774E. Percent 29784E is of type GDT 29786E Percent 29788E.

The NormalCashDiscount 29790E includes a DaysValue 29798E and a Percent 29702F. There is one 29700F DaysValue 29798E for each NormalCashDiscount 29790E, and one 29704F Percent 29702F for each NornalCashDiscount 29790E. Percent 29702F is of type GDT 29706F Percent 29708F.

The PaymentInformation package 29716B further includes a PaymentForm entity 29714F. There is one or zero 29716F PaymentForm entity 29714F for each PurchaseOrder entity 29730A.

The PaymentForm entity 29714F includes a Code 29718F and a PaymentCard 29726F. There is one occurrence 29720F of Code 29718F for each PaymentForm entity 29714F, and there is zero or one occurrence 29728F of PaymentCard 29726F for each PaymentForm entity 29714F. The Code 29718F is of type GDT 29722F PaymentFormCode 29724F. The PaymentCard 29726F is of type AGDT 29730F PaymentCard 29732F.

The PaymentCard 29732F includes an ID 29734F, a ReferenceID 29742F, a SequenceID 29746F, a Holder 29750F, and an ExpirationDate 29754F. There is one 29736F ID 29734F for each PaymentCard 29726F, zero or one 29744F ReferenceID 29742F for each PaymentCard 29726F, zero or one 29748F SequenceID 29746F for each PaymentCard 29726F, zero or one 29752F Holder 29750F for each PaymentCard 29726F, and one 29756F ExpirationDate 29754F for each PaymentCard 29726F. The ID is of type GDT 29738F PaymentCardID 29740F. The ExpirationDate 29754F is of type GDT 29758F Date 29760F.

The Attachment package 29718B includes an Attachment entity 29762F, of type GDT 29766F Attachment 29768F and an AttachmentWebAddress entity 29762FA of type AttachmentWebAddress 29762FC. There are any number 29764F of Attachment entities 29762F AttachmentWebAddress entities 29762FA or for each PurchaseOrder entity 29730A.

The Attachment entity 29762F includes an ID 29770F and a Filename 29774F. There is one 29772F ID 29770F for each Attachment entity 29762F, and zero or one 29776F Filename 29774F for each Attachment entity 29762F.

The Description package 29720B includes a Description entity 29778F and a ConfirmationDescription entity 29790F. There is zero or one occurrence 29780F of the Description entity 29778F for each PurchaseOrder entity 29730A, and zero or one 29792F ConfirmationDescription entity 29790F for each Attachment entity 29762F. The Description 29778F is of type GDT 29782F Description 29784F. The ConfirmationDescription 29790F is of type GDT 29794F Description 29796F. The Description 29778F includes a LanguageCode 29786F, and there is one LanguageCode 29786F for each Description 29778F. Similarly, the ConfirmationDescription 29790F includes a LanguageCode 29798F, and there is one LanguageCode 29798F for each ConfirmationDescription 29790F.

The FollowUpMessage 29722B includes a FollowUpPurchaseOrderConfirmation 29702G, a FollowUpDespatchedDeliveryNotification 29714G, a FollowUpServiceAcknowledgementRequest 29726G, and a FollowUpInvoiceRequest 29742G. There is zero or one 29704G FollowUpPurchaseOrderConfirmation 29702G for each PurchaseOrder 29730A. There is zero or one 29716G FollowUpDespatchedDeliveryNotification 29714G for each PurchaseOrder 29730A. There is zero or one 29728G FollowUpServiceAcknowledgementRequest 29726G for each PurchaseOrder 29730A. There is zero or one 29744G FollowUpInvoiceRequest 29742G for each PurchaseOrder 29730A.

The FollowUpPurchaseOrderConfirmation 29702G includes a RequirementCode 29706G, which is of type GDT 29710G FollowUpMessageRequirementCode 29712G. There is one RequirementCode 29706G for each FollowUpPurchaseOrderConfirmation 29702G.

The FollowUpDespatchedDeliveryNotification 29714G includes a RequirementCode 29718G, which is of type GDT 29722G FollowUpMessageRequirementCode 29724G. There is one 29720G RequirementCode 29718G for each FollowUpDespatchedDeliveryNotification 29714G.

The FollowUpServiceAcknowledgementRequest 29726G includes a RequirementCode 29734G, which is of type GDT 29738G FollowUpMessageRequirementCode 29740G. There is one 29736G RequirementCode 29734G for each FollowUpServiceAcknowledgementRequest 29726G.

The FollowUpInvoiceRequest 29742G includes a RequirementCode 29746G, which is of type GDT 29750G FollowUpMessageRequirementCode 29752G. There is one 29748G RequirementCode 29746G for each FollowUpInvoiceRequest 29742G. The FollowUpInvoiceRequest 29742G also includes an EvaluatedReceiptSettlementIndicator 29754G, which is of type GDT 29758G EvaluatedReceiptSettlementIndicator 29760G. There is zero or one 29756G EvaluatedReceiptSettlementIndicator 29754G for each FollowUpInvoiceRequest 29742G.

The Item package 29724B includes an Item entity 29762G, which is of type AGDT 29766G PurchaseOrderItem 29768H. There are any number 29764G of Item entities 29762 for each PurchaseOrder entity 30A. The Item entity 29762G includes an ID 29770G, a SellerID 29778G, an ActionCode 29778G, an AcceptanceStatusCode 29794G, an UnplannedItemPermissionCode 29702H, and a HierarchyRelationship 29710H. ID 29770G has an occurrence of zero or one 29772G for each Item entity 29762G, and is of type GDT 29774G BusinessTransactionDocumentItemID 29776G. SellerID 29778G has an occurrence of zero or one 29780G for each Item entity 29762G, and is of type GDT 29782G BusinessTransactionDocumentItemID 29784G. ActionCode 29786G has an occurrence of one 29788G for each Item entity 29762G, and is of type GDT 29790G ActionCode 29792G. AcceptanceStatusCode 29794G has an occurrence of zero or one 29796G for each Item entity 29762G, and is of type GDT 29798G AcceptanceStatusCode 29700H. UnplannedItemPermissionCode 29702H has an occurrence of zero or one 29704H for each Item entity 29762G, and is of type GDT 29706H UnplannedItemPermissionCode 29708H. HierarchyRelationship 29711H has an occurrence of zero or one 29712H. The Item entity 29724B further includes an UnconfirmrdQuantityCancelledIndicator 29702HA of type GDT 29706HA CancelledIndicator 29708HA, and a GoodsReceiptBasedInvoiceVerificationIndicator 29702HB of type GDT 29706HB GoodsReceiptBasedInvoiceVerificationIndicator 29708HB. There are zero or one of GoodsReceiptBasedInvoiceVerificationIndicator 29702HB or UnconfirmrdQuantityCancelledIndicator 29702HA for each Item entity 29724B.

The HierarchyRelationship 29710H includes a ParentItemID 29714H, a ParentItemSellerID 29722H, and a TypeCode 29730H. There is zero or one 29716H ParentItemID 29714H for each HierarchyRelationship 29711H. There is zero or one 29724H ParentItemSellerID 29722H for each HierarchyRelationship 29710H. There is one 29732H TypeCode 29730H for each HierarchyRelationship 29710H. ParentItemID 29714H is of type GDT 29718H BusinessTransactionDocumentItemID 29720H. ParentItemSellerID 29722H is of type GDT 29726H BusinessTransactionDocumentItemID 29728H. TypeCode 29730H is of type GDT 29734H BusinessTransactionDocumentItemHierarchyRelationshipTypeCode 29736H.

The Item package 29724B includes a ProductInformation package 29738H, a PriceInformation package 29739H, a Party package 29740H, a Location package 29741H, a DeliveryInformation package 29742H, a BusinessTransactionDocumentReference package 29743H, an Attachment package 29744H, a Description package 29746H, and a ScheduleLine package 29748H.

The ProductInformation package 29738H includes a Product entity 29750H and a ProductCategory entity 29790H. The Product entity 29750H is of type GDT 29754H BusinessTransactionDocumentProduct 29756H, and there is one or zero 29752 Product entity 29750H for each Item entity 29762G. The ProductCategory entity 29790H is of type GDT 29794H BusinessTransactionDocumentProductCategory 29796H, and there is one or zero 29792H ProductCategory entity 29790H for each Item entity 29762G.

The Product entity 29750H includes a StandardID 29754H, a BuyerID 29758H, a SellerID 29762H, a ManufacturerID 29766H, a TypeCode 29774H, and a Note 29782H. The StandardID 29754 is of type CDT 29756H ProductStandardID 29757H. The BuyerID 29758H is of type CDT 29760H ProductPartyID 29761H. The SellerID 29762H is of type CDT 29764H ProductPartyID 29765H. The ManufacturerID 29766H is of type CDT 29770H ProductPartyID 29772H. The TypeCode 29774H is of type GDT 29778H ProductTypeCode 29780H. The Note 29782H is of type GDT 29786H Note 29788H. There are any number 29755H of StandardID 29754H for each Product entity 29750H. There is zero or one 29759H BuyerID 29758H for each Product entity 29750H. There is zero or one 29763H SellerID 29762H for each Product entity 29750H. There is zero or one 29768H ManufacturerID 29766H for each Product entity 29750H. There is zero or one 29776H TypeCode 29774H for each Product entity 29750H. There is zero or one 29784H Note 29782H for each Product entity 29750H.

The ProductCategory entity 29790H includes a StandardID 29798H, a BuyerID 29706I, and a SellerID 29714I. There is any number of StandardID 29798H for each ProductCategory entity 29790H. There is zero or one 29708I BuyerID 29706I for each ProductCategory entity 29790H. There is zero or one 29716I SellerID 29714I for each ProductCategory entity 29790H. The StandardID is of type CDT 29702I ProductCategoryStandardID 29704I. The BuyerID 29706I is of type CDT 29710I ProductCategoryPartyID 29712I. The SellerID 29714I is of type CDT 29718I ProductCategoryPartyID 29710I.

The PriceInformation package 29739H includes a Price entity 29722I. There is zero or one 29728I Price entity 29722I for each Item entity 29762G.

The Price entity 29722I includes a NetUnitPrice 29726I. There is zero or one 29728I NetUnitPrice 29726I for each Price entity 29722I. The NetUnitPrice 29726I is of type AGDT 29730I Price 29732I.

The NetUnitPrice 29726I includes an Amount 29734I and a BaseQuantity 29744I. There is one 29736I Amount 29734I for each NetUnitPrice 29726I, and one 29746I BaseQuantity 29744I for each NetUnitPrice 29726I. Amount 29734I is of type GDT 29738I Amount 29740I, and BaseQuantity 29744I is of type GDT 29748I Quantity 29750I. Amount 29734I includes a CurrencyCode 29742I, and there is one CurrencyCode 29742I for each Amount 29734I. BaseQuantity 29744I includes a UnitCode 29752I, and there is one UnitCode 29752I for each BaseQuantity 29744I.

The PriceInformation package 29739H also includes a ConfirmedPrice entity 29756I. There is zero or one 29758I ConfirmedPrice 29756I for each Item entity 29762G. The ConfirmedPrice entity 29756I includes a NetUnitPrice 29760I, which is of type AGDT 29764I Price 297766I. There is zero or one 29762I NetUnitPrice 29760I for each ConfirmedPrice entity 29756I.

The NetUnitPrice 29760I includes an Amount 29768I and a BaseQuality 29782I. The Amount is of type GDT 29772I Amount &74I, and there is one 29770I Amount &68I for each NetUnitPrice 29760I. The BaseQuality 29782I is of type GDT 29786I Quantity 29788I, and there is one 29784I BaseQuality 29782I for each NetUnitPrice 29760I. The Amount 29768 includes a CurrencyCode 29776I, and there is one 29778I CurrencyCode 29776I for each Amount 29768I. The BaseQuality 29782I includes a UnitCode 29790I, and there is one 29792I UnitCode 29790I for each BaseQuality 29782I.

The Party package 29740H includes a BuyerParty entity 29794I, a SellerParty entity 29702J, a ProductRecipientParty entity 29710J, a VendorParty entity 29718J, a ManufacturerParty entity 29726J, a BillToParty entity 29734J, a PayerParty entity 29742J, and a CarrierParty entity 29750J. The BuyerParty entity 29794I has an occurrence of zero or one 29796I for each Item entity 29762G, and is of type AGDT 29798I BusinessTransactionDocumentParty 29700J. The SellerParty entity 29702J has an occurrence of zero or one 29704J for each Item entity 29762G, and is of type AGDT 29706J BusinessTransactionDocumentParty 29708J. The ProductRecipientParty entity 29710J has an occurrence of zero or one 29712J for each Item entity 29762G, and is of type AGDT 29714J BusinessTransactionDocumentParty 29716J. The VendorParty entity 29718J has an occurrence of zero or one 29720J for each Item entity 29762G, and is of type AGDT 29722J BusinessTransactionDocumentParty 29724J. The ManufacturerParty entity 29726J has an occurrence of zero or one 29728J for each Item entity 29762G, and is of type AGDT 29730J BusinessTransactionDocumentParty 29732J. The BillToParty entity 29734J has an occurrence of zero or one 29736J for each Item entity 29762G, and is of type AGDT 29738J BusinessTransactionDocumentParty 29740J. The PayerParty entity 29742J has an occurrence of zero or one 29744J for each Item entity 29762G, and is of type AGDT 29746J BusinessTransactionDocumentParty 29748J. The CarrierParty entity 29750J has an occurrence of zero or one 29752J for each Item entity 29762G, and is of type AGDT 29754J BusinessTransactionDocumentParty 29756J.

The Location package 29741H includes a ShipToLocation 29758H and a ShipFromLocation 29766J. The ShipToLocation 29758J is of type AGDT 29762J BusinessTransactionDocumentShipToLocation 29764J, and there is zero or one 29760J ShipToLocation 29764J for each Item entity 29762G. The ShipFromLocation 29766J is of type AGDT 29770J BusinessTransactionDocumentShipFromLocation 29772J, and there is zero or one 29768H ShipFromLocation 29766J for each Item entity 29762G.

The DeliveryInformation package 29742H includes DeliveryTerms 29774J. There is zero or one 29776J DeliveryTerms 29774J for each Item entity 29762G. The DeliveryTerms 29774J is of type AGDT 29778J DeliveryTerms 29780J.

The BusinessTransactionDocumentReference package 29743H includes a QuoteReference 29782J, a PurchaseContractReference 29706K, a SalesContractReference 29730K, an OriginPurchaseOrderReference 29754K, a BuyerProductCatalogueReference 29778K, and a SellerProductCatalogueReference 29702L. There is one or zero 29784J QuoteReference 29782J for each Item entity 29762G. There is any number of PurchaseContractReference 29706K for each Item entity 29762G. There is any number of SalesContractReference 29730K for each Item entity 29762G. There is zero or one 29756K OriginPurchaseOrderReference 29754K for each Item entity 29762G. There is zero or one 29780K BuyerProductCatalogueReference 29778K for each Item entity 29762G. There is zero or one 29704L SellerProductCatalogueReference 29702L for each Item entity 29762G.

QuoteReference 29782J is of type AGDT 29786J BusinessTransactionDocumentReference 29788J. QuoteReference 29782J includes an ID 29790J and an ItemID 29798J. There is one ID for each QuoteReference 29782J, and any number of ItemID 29798J for each QuoteReference 29782J. The ID is of type GDT 29794J BusinessTransactionDocumentID 29796J, and the ItemID 29798J is of type GDT 29702K BusinessTransactionDocumentItemID 29704K.

PurchaseContractReference 29706K is of type AGDT 29710K BusinessTransactionDocumentReference 29712K. PurchaseContractReference 29706K includes an ID 29714K, which is of type GDT 29718K BusinessTransactionDocumentID, and an ItemID 29722, which is of type BusinessTransactionDocumentItemID 29728K. There is one 29716K ID for each PurchaseContractReference 29706K, and any number of ItemID 29722K for each PurchaseContractReference 29706K.

SalesContractReference 29730K is of type AGDT 29734K BusinessTransactionDocumentReference 29736K. SalesContractReference 29730K includes an ID 29738K and an ItemID 29746K. There is one ID 29738K for each SalesContractReference 29730K, and any number of ItemID 29746K for each SalesContractReference 29730K. ID is of type GDT 29742K BusinessTransactionDocument ID 29744K, and ItemID 29746K is of type BusinessTransactionDocumentReference 29760K.

OriginPurchaseOrderReference 29754K is of type AGDT 29758K BusinessTransactionDocumentReference 29760K. OriginPurchaseOrderReference 29754K includes an ID 29762K, which is of type GDT BusinessTransactionDocumentID, and an ItemID 29770K, which is of type GDT 29774K BusinessTransactionDocumentItemID 29776K. There is one 29764K ID 29762K for each OriginPurchaseOrderReference 29754K, and any number 29772K of ItemID 29770K for each OriginPurchaseOrderReference 29754K.

BuyerProductCatalogueReference 29778K is of type AGDT 29782K CatalogueReference 29784K. BuyerProductCatalogueReference 29778K includes an ID 29786K and an ItemID 29794K. There is one 29788K ID 29786K for each BuyerProductCatalogueReference 29778K, and any number 29796K of ItemID 29794K for each BuyerProductCatalogueReference 29778K. ID is of type GDT 29790K CatalogueID 29792K, and ItemID 29794K is of type GDT 29798K CatalogueItemID 29700L.

SellerProductCatalogueReference 29702L is of type AGDT 29706L CatalogueReference 29708L. SellerProductCatalogueReference 29702L includes an ID 29710L and an ItemID 29718L. There is one 29712L ID 29710L for each SellerProductCatalogueReference 29702L, and any number 29720L of ItemID 29718L for each SellerProductCatalogueReference 29702L. ID is of type GDT 29714L CatalogueID 29716L, and ItemID 29718L is of type GDT 29722L CatalogueItemID 29724L.

The Attachment package 29744H includes an Attachment entity 29726L, which is of type AGDT 29732L Attachment 29734L. There is any number 29728L of Attachment entities 29726L for each Item entity 29762G. The Attachment package 29744H further includes an AttachmentWebAddress 29726LA of type AGDT 29732LA AttachmentWebAddress 29734LA. There are zero or more AttachmentWebAddress entities 29726LA for each Attachment package 29744H.

The Description package 29746H includes a Description entity 29736L and a ConfirmationDescription entity 29748L. There is one or zero 29738L Description entity 29736L for each Item entity 29762G, and one or zero 29750L ConfirmationDescription entity 29748L for each Item entity 29762G. Description 29736L is of type GDT 29740L Description 29742L, and ConfirmationDescription 29748L is of type GDT 29752L Description 29754L. Description 29736L includes a LanguageCode 29744L, and there is one 29746L LanguageCode 29744L for each Description 29736L. ConfirmationDescription 29748L includes a LanguageCode 29756L, and there is one 29758L LanguageCode 29756L for each ConfirmationDescription 29748L.

The ScheduleLine package 29748H includes a ScheduleLine entity 29760L and a ConfirmedScheduleLine entity 29728M. There is any number 29762L of ScheduleLine entity 29760L for each Item entity 29762G, and any number 29730M of ConfirmedScheduleLine entity 29728M for each Item entity 29762G. ScheduleLine entity 29760L is of type AGDT 29764L PurchaseOrderItemScheduleLine 29766L, and ConfirmedScheduleLine entity 29728M is of type AGDT 29732M PurchaseOrderItemScheduleLine 29734M. ScheduleLine entity 29760L includes an ID 29768L, a SellerID 29776L, a DeliveryPeriod 29784L, and a Quantity 29716M. ID 29768L is of type GDT 29772L BusinessTransactionDocumentItemScheduleLineID 29774L. There is one or zero 29770L ID 29768L for each ScheduleLine 29760L. SellerID 29776L is of type GDT 29780L BusinessTransactionDocumentItemScheduleLineID 29782L. There is one or zero 29778L SellerID 29776L for each ScheduleLine 29760L. DeliveryPeriod 29784L is of type AGDT 29788L DateTimePeriod 29790L. There is one 29786L DeliveryPeriod 29784L for each ScheduleLine 29760L. Quantity 29716M is of type GDT 29720M Quantity 29722M. There is one or zeero 29718M Quantity 29716M for each ScheduleLine 29760L.

DeliveryPeriod 29784L includes a StartDateTime 29792L, an EndDateTime 29700M, and a Duration 29708M. StartDateTime 29792L is of type GDT 29796L DateTime 29798L, EndDateTime 29700M is of type GDT 29704M DateTime 29706M, and Duration 29708M is of type GDT 29712M Duration 29714M. There is a respective one or zero 29794L, 29702M, and 29710M StartDateTime 29792L, EndDateTime 29700M, and Duration 29708M for each DeliveryPeriod 29784L.

The Item package 29724D further includes a FollowUpPurchaseOrderConfirmation entity 29744HA, a FollowUpDespatchedDeliveryNotification entity 29754HA, a FollowUpServiceAcknowledgementRequest entity 29766HA, and a FollowUpInvoiceRequest entity 29776HA at the third level 29706. There is zero or one 29746HAA FollowUpPurchaseOrderConfirmation entity 29744HA for each PurchaseOrder entity 29730A. FollowUpPurchaseOrderConfirmation entity 29744HA includes a RequirementCode 29748HA at the fourth level 29708. The RequirementCode 29748HA is of type GDT FollowUpMessageRequirementCode 29752HA, and there is one 29750HA RequirementCode 29748HA for each FollowUpPurchaseOrderConfirrnation entity 29744HA.

There is zero or one 29756HA FollowUpDespatchedDeliveryNotification entity 29754HA for each PurchaseOrder entity 29730A. FollowUpDespatchedDeliveryNotification entity 29754HA includes a RequirementCode 29760HA at the fourth level 29708. The RequirementCode 29760HA is of type GDT FollowUpMessageRequirementCode 29764HA, and there is one 29762HA RequirementCode 29722D for each FollowUpDespatchedDeliveryNotification entity 29754HA.

There is zero or one 29768HA FollowUpServiceAcknowledgementRequest entity 29766HA for each PurchaseOrder entity. FollowUpServiceAcknowledgementRequest entity 29766HA includes a RequirementCode 29770HA at the fourth level 29708. The RequirementCode 29770HA is of type GDT FollowUpMessageRequirementCode 29774HA, and there is one 29772HA RequirementCode 29770HA for each FollowUpServiceAcknowledgementRequest entity 29766HA.

There is zero or one 29778HA FollowUpInvoiceRequest entity 29776HA for each PurchaseOrder entity 29730A. FollowUpInvoiceRequest entity 29776HA includes a RequirementCode 29780HA and an EvaluatedReceiptSettlementIndicator 29786HA at the fourth level 29708. The RequirementCode 29780HA is of type GDT FollowUpMessageRequirementCode 29784HA, and there is one 29782HA RequirementCode 29780HA for each FollowUpInvoiceRequest entity 29776HA. The EvaluatedReceiptSettlementIndicator 29786HA is of type GDT EvaluatedReceiptSettlementIndicator 29790HA, and there is zero or one 29788HA EvaluatedReceiptSettlementIndicator 29786HA for each FollowUpInvoiceRequest entity 29776HA.

d) Service Acknowledgement Interfaces

In B2B processes, service acknowledgement interfaces are required for sending services entered by the seller so that they can be acknowledged by the buyer. Traditional methods of communication in an ordering process, such as mail or fax, are cost intensive, prone to error, and relatively slow, since data has to be entered manually. Electronic communication between the procurement and sales system largely eliminates such problems.

The Service Acknowledgement interfaces were developed for the Service Procurement business scenario. In the Service Procurement scenario, services are purchased, which are then acknowledged and confirmed using the Service Acknowledgement interfaces. The messages Service Acknowledgement Request and Service Acknowledgement Confirmation directly integrate the applications that implement the interfaces and form a basis for mapping data to widely-used XML standard formats, such as PIDX or CIDX.

More than just a simple interface structure, the service acknowledgement interfaces define underlying corporate significance and, at the same time, dispense with the need to exchange proprietary information in straightforward purchasing processes. In this way, applications that implement the service acknowledgement interfaces can be integrated without the need for complex project work.

Three message types exist for mapping a B2B service acknowledgement process. The message type "ServiceAcknowledgementRequest" is sent by the service provider to the buyer. It is used for sending services that have been entered. The message type "ServiceAcknowledgementConfirmation" is sent by the buyer to the seller. It is used for acknowledging a service that has been entered. It is a direct response to a ServiceAcknowledgementRequest. The buyer sends the A2A message of message type "Service Acknowledgement Information" to all parties interested in the confirmation of the service. It is used to inform these parties that an entered service has been confirmed.

The two messages types ServiceAcknowledgementRequest and ServiceAcknowledgementConfirmation are based on the same structure, the message data type ServiceAcknowledgementMessage. The message data type ServiceAcknowledgement is a subset of the message data type ServiceAcknowledgementInformation. The message type ServiceAcknowledgementInformation is based on the message data ServiceAcknowledgementInformation.

A ServiceAcknowledgementRequest is a request from the seller asking the buyer to acknowledge services that have been entered. The structure of the message type ServiceAcknowledgementRequest is specified by the message data type ServiceAcknowledgementMessage. In one implementation, only parts of the maximum ServiceAcknowledgementMessage structure are used. The ServiceAcknowledgementRequest is used for invoice verification and for automatically settling a purchase order without the seller's invoice.

A ServiceAcknowledgementConfirmation is a confirmation (or rejection) of the service entered. The structure of the message type ServiceAcknowledgementConfirmation is specified by the message data type ServiceAcknowledgementMessage. In one implementation, only parts of the maximum ServiceAcknowledgementMessage structure are used. The ServiceAcknowledgementConfirmation is the message used by the buyer to inform the seller that the service acknowledgement is confirmed, pending decision, or rejected. The buyer can use the ServiceAcknowledgement-Confirmation message as follows. The buyer can inform the seller of the confirmation status of the service. Possible statuses are "AP" (accepted), "AJ" (pending), and "RE" (rejected). The confirmation status can be set at header level only. Rejection at header level also signifies rejection of all items. The data in the ServiceAcknowledgementRequest must not be changed. In addition to the confirmation status, only a free text (ConfirmedDescription) can be entered at header and item level. A ServiceAcknowledgementConfirmation is not absolutely necessary in a B2B service acknowledgement process.

A ServiceAcknowledgementInformation is a notification of the acknowledgement (or rejection) of an entered service. The structure of the message type ServiceAcknowledgement-Information is defined by the message data type ServiceAcknowledgementInformationMessage. The ServiceAcknowledgementInformation is the notification with which the buyer informs all parties interested in the acknowledgement of the service.

(1) Message Choreography

FIG. 298 depicts the message choreography for Service Acknowledgement Interfaces. The choreography involves interested applications of any system 29800 and two business entities: a seller or service provider (supplier) 29802 and a buyer (Purchasing or SRM) 29804. In the implementation shown in FIG. 298, the seller 29802 sends a "ServiceAcknowledgementRequest" message 29806 to the buyer 29804. The ServiceAcknowledgementRequest message 29806 is used for sending one or more entered services. The buyer 29804 then sends a "ServiceAcknowledgementConfirmation" message 29808 to the seller 29802. The ServiceAcknowledgementConfirmation message 29808 is a direct response to a ServiceAcknowledgementRequest 29806 message and is used to acknowledge a service that has been entered.

Both the ServiceAcknowledgementRequest 29806 and the ServiceAcknowledgementConfirmation message 29808 use the same structure of message data type ServiceAcknowledgementMessage. As discussed below, however, each message 29806 and 29808 may use parts of the ServiceAcknowledgementMessage structure.

In one implementation, the ServiceAcknowledgementRequest 29806 is a request from the seller or Purchasing 29802 asking the buyer or Supplier 29804 to acknowledge one or more services that have been entered. The ServiceAcknowledgementRequest 29806 is used for ServiceAcknowledgement verification and for automatically settling a purchase order without the seller's ServiceAcknowledgement.

In one implementation, the ServiceAcknowledgement-Confirmation 29808 is a confirmation (or rejection) of the service entered. The ServiceAcknowledgementConfirmation 29808 is the message used by the buyer or Supplier 29804 to inform the seller or Purchasing 29802 that the service acknowledgement is confirmed, pending decision, or rejected. The buyer 29804 may use the ServiceAcknowledgementConfirmation message 29808 as follows.

(1) The buyer 29804 may inform the seller 29802 of the confirmation status of the service. Possible statuses are "AP" (accepted), "AJ" (pending), and "RE" (rejected). The confirmation status may be set at header level only. Rejection at header level also signifies rejection of the items.

(2) The data in the ServiceAcknowledgementRequest 29806 is not changed. In addition to the confirmation status, a free text (ConfirmedDescription) may be entered at the header and item level as further explained below.

In one implementation, the ServiceAcknowledgement-Confirmation 29808 is not required to be sent in response to the ServiceAcknowledgementRequest 29806 in the B2B service acknowledgement process.

In accordance with methods and systems consistent with the subject matter described herein, a service entry sheet is normally entered once an ordered service has been provided. The seller 29802 then sends a ServiceAcknowledgementRequest message 29806 requesting the buyer 29804 to acknowledge this service, which begins the service acknowledgement process. Once the ServiceAcknowledgementRequest message 29806 has been received by the buyer 29804, the buyer 29804 may use the ServiceAcknowledgementConfirmation message 29808 to accept or reject the service provided, or to assign it the temporary status "pending." The ServiceAcknowledgement Confirmation 29808 is not a negotiation tool (as is the case with order management), since the entire service may be accepted or rejected. The primary function of the ServiceAcknowledgement Confirmation message 29808 is to confirm that the service acknowledgement request has been sent correctly; providing information about required changes to the service acknowledgement is a secondary function. The ServiceAcknowledgementConfirmation 29808, therefore, includes the data received and checked by the buyer 29804. When a ServiceAcknowledgementRequest 29806 is rejected, however, the seller 29802 may be informed about change requests in free texts at header and item level in the Service-AcknowledgementConfirmation message 29808. If the buyer 29804 rejects a service acknowledgement, the seller 29802 may send a new ServiceAcknowledgementRequest 29806. If the seller 29802 does not receive a response (e.g., another ServiceAcknowledgementConfirmation message 29808) from the buyer 29804, the service is considered to have been accepted.

The seller 29802 informs the interested applications of any system 29800 about accepted service acknowledgements in the form of a ServiceAcknowledgementInformation message 29810.

The ServiceAcknowledgement messages are implemented by the following message interfaces. On the buyer's side, the ServiceAcknowledgement messages are implemented by ServiceAcknowledgementRequest_In, ServiceAcknowledgementConfirmation_Out, and ServiceAcknowledgementInformation_Out message interfaces. On the seller's side, the ServiceAcknowledgement messages are implemented by ServiceAcknowledgementConfirmation_In and ServiceAcknowledgementRequest_Out message interfaces. For applications that are interested in the entry of the service, the ServiceAcknowledgement message is implemented by the ServiceAcknowledgementInformation_In message interface.

(2) Message Data Type Service Acknowledgement Information Message

The data model for the message data type ServiceAcknowledgementInformationMessage used to implement a ServiceAcknowledgementRequest message 29806, a ServiceAcknowledgementConfinnation message 29808, and a ServiceAcknowledgementInformation message 29810 is depicted in FIG. 299.

The message data type ServiceAcknowledgementInformationMessage 29900 groups the business information that is relevant for sending a business document in a message. It includes a MessageHeader package 29902, a ServiceAcknowledgement package 29904, and the object ServiceAcknowledgementInformationMessage 29906 in the view that is required for the ServiceAcknowledgementInformation. The message data type ServiceAcknowledgementInformationMessage therefore provides the structure for the message type ServiceAcknowledgementInformation and the interface that is based on it. The message data type ServiceAcknowledgementInformationMessage is also the template message data type for the message data type ServiceAcknowledgementMessage and the message types and interfaces that are based on it. The ServiceAcknowledgementMessage is derived as a structural view from ServiceAcknowledgementInformationMessage.

In one implementation, the following rules must be observed to ensure that all the elements and entities in the message data type ServiceAcknowledgementMessage are used correctly with regard to their changeability in the acknowledgement process:

(1) In the ServiceAcknowledgementConfirmation, no data must be changed vis-à-vis the ServiceAcknowledgementRequest. Only the service acknowledgement status and a description of the buyer are specified in addition.

(2) If certain elements or entities in the message data type ServiceAcknowledgementMessage are not to be used in all the message types based on the message data type ServiceAcknowledgementMessage.

Methods and systems consistent with the subject matter described herein use the package template for a BusinessTransactionDocument for an SCM Master Data depicted in FIG. 270B to derive the ServiceAcknowledgementInformationMessage interface. There is a 1:c relationship between entities in this Interface unless otherwise noted herein or indicated in the Figures.

(a) Message Header Package

A MessageHeader package 29902 groups together the business information that is relevant for sending a business document in a message. The MessageHeader package 29902 includes a MessageHeader entity 29908. There is a 1:1 relationship between the ServiceAcknowledgementMessage entity 29906 and the MessageHeader entity 29908.

A MessageHeader entity 29908 groups together business information from the perspective of the sending application to identify the business document in a message, to provide information about the sender, and to provide any information about the recipient. The MessageHeader entity 29908 is of type GDT: BusinessDocumentMessageHeader. The MessageHeader entity 29908 includes an ID, a ReferencedID, and a CreationDateTime. The MessageHeader entity 29908 includes a SenderParty entity 29910 and a RecipientParty 29912. There is a 1:cn relationship between the MessageHeader entity 29908 and the RecipientParty entity 29912.

The SenderParty is the party responsible for sending a BusinessDocument at the business application level. The SenderParty entity 29910 is of type GDT: BusinessDocumentMessageHeaderParty. The SenderParty entity 29910 may be filled by the sending application to name a contact person for any problems with the message. This is particularly useful if an additional infrastructure (such as a marketplace) is located between the SenderParty entity 29910 and the RecipientParty entity 29912. The SenderParty entity 29910 is simply used to transfer the message and may be ignored by the receiving application. In one implementation, it is to be filled by the sender particularly if the participating partners are not transferred with the ServiceAcknowledgement package 29904.

The RecipientParty is the party responsible for receiving a business document at the business application level. The RecipientParty entity 29912 is of type GDT: BusinessDocumentMessageHeaderParty. The RecipientParty entity 29912 may be filled by the sending application to name a contact person for any problems with the message. The Recipient entity 29912 is simply used to transfer the message and can be ignored by the receiving application. In one implementation, it is to be filled by the sender particularly if the participating partners are not transferred with the ServiceAcknowledgement package 29904.

The SenderParty entity 29910 and the RecipientParty entity 29910 include additional information as denoted by ellipses 29914 and 29916, respectively.

In one implementation, the MessageHeader package 29902 is not needed and therefore remains empty.

(b) Service Acknowledgement Package

The ServiceAcknowledgement package 29904 includes a Party package 299220, a Location package 29922, an Attachment package 29924, a Description package 29926, and an Item package 29928. The ServiceAcknowledgement package 29904 also includes a ServiceAcknowledgement entity 29918. There is a 1:1 relationship between the ServiceAcknowledgementInformationMessage entity 29906 and the ServiceAcknowledgement entity 29918. The ServiceAcknowledgement in the view that is required for the ServiceAcknowledgementInformation message is information about the purchaser's confirmation of an entered service.

In addition to the buyer and seller, other parties identified in the Party package 29920 may participate in the ServiceAcknowledgement. The ServiceAcknowledgement entity 29918 is of type GDT: ServiceAcknowledgementInformation and includes an ID, a BuyerID, a CreationDateTime, a CancellationServiceAcknowledgementIndicator, a AcceptanceStatusCode, and a Note. The ID is a unique identifier assigned by the seller for the service acknowledgement and is of type GDT: BusinessTransactionDocumentID. The BuyerID is a unique identifier assigned by the buyer for the service acknowledgement and is of type GDT: BusinessTransactionDocumentID. The CreationDateTime is the time at which the seller created the service acknowledgement and is of type GDT: DateTime. The CancellationServiceAcknowledgementIndicator indicates whether or not a service acknowledgement is a cancellation and is of type GDT: ServiceAcknowledgementCancella-tionServiceAcknowledgementIndicator. The AcceptanceStatusCode is the coded representation for the status of the seller's agreement to the service acknowledgement and is of type GDT: AcceptanceStatusCode. The Note is a short description or the title of the service acknowledgement. It is generally used to provide the user with a simple method for searching for a particular service acknowledgement. The Note is of type GDT: Note.

(i) Service Acknowledgement Party Package

The Party package 29920 groups together the business parties involved in the service acknowledgement. The Party package 29920 includes a BuyerParty entity 29930, a SellerParty entity 29932, a ProductRecipientParty entity 29934, a VendorParty entity 29936, and a ManufacturerParty entity 29938. There is a 1:1 relationship between the ServiceAcknowledgement entity 29934 and the BuyerParty entity 29938. Each of the SellerParty entity 29932, the ProductRecipientParty entity 29934, the VendorParty entity 29936, and the ManufacturerParty entity 29938 includes the same elements as those described below for the BuyerParty entity 29930, as denoted by ellipses 29966, 29968, 29970, and 29972.

Either the ID or the ID and address may be transferred for each party 29930, 29932, 29934, 29936, and 29938. If the ID is transferred, the ID address defined in the master data is used. If the ID and address are transferred, the ID identifies the party and the address is deemed to be a document address that is different to the master data address. For the parties 29930, 29932, 29934, 29936, and 29938, a default logic applies for transferring data from the document header to the items and within item hierarchies. Parties specified in the header are used for the items for which a corresponding party is not explicitly transferred and that are directly assigned to the header. In accordance with the same logic, parties transferred at item level are used for the subitems assigned to the relevant item in an item hierarchy. The default logic applies for the party as a whole, including the contact person. Parts of a party specified at header level or for a hierarchy item cannot be specified in more detail at item level.

The BuyerParty is a party that buys goods or services. The BuyerParty entity 29930 is of type GDT: BusinessTransactionParty. The BuyerParty entity 29930 includes an Address entity 29940 and a ContactPerson entity 29942.

The Address entity 29940 includes a PersonName entity 29944, an Office entity 29946, a PhysicalAddress entity 29948, a GeoCoordinates entity 29950, and a Communication entity 29952.

The ContactPerson entity 29942 includes an Address entity 29954. Similar to the Address entity 29940 in the BuyerParty 29930 discussed above, the Address entity 29954 includes a PersonName entity 29956, an Office entity 29958, a PhysicalAddress 29960, a GeoCoordinates entity 29962, and a Communication entity 29964.

The same BuyerParty entity 29930 may be used for the ServiceAcknowledgement items. In one implementation, the Contact for BuyerParty entity 29930 is permitted to change from item to item and different addresses in each item are not permitted.

The SellerParty is the party that sells goods or services. The SellerParty entity 29932 is of type GDT: BusinessTransactionParty. In one implementation, the same SellerParty entity 29932 is used for the service acknowledgement items. A different SellerParty entity 29932 may be used in each item. If a VendorParty entity 29936 is not explicitly specified in an ordering process, the SellerParty entity 29932 may also be used as the VendorParty entity 29936.

The ProductRecipientParty is a party to which goods are delivered or for whom services are provided. The ProductRecipientParty entity 29934 is of type GDT: BusinessTransactionDocumentParty. If a ShipToLocation is not explicitly specified in a service acknowledgement process, the ProductRecipientParty entity 29934 address is used as the ship-to address. The ProductRecipientParty is not synonymous with the ShipToLocation and in one implementation is to be used when the ProductRecipientParty (company or person) is actually different from the BuyerParty entity 29930.

The VendorParty is a party that delivers goods or provides services. The VendorParty entity 29936 is of type GDT: BusinessTransactionDocumentParty.

The ManufacturerParty is a party that manufactures goods. The ManufacturerParty entity 29938 is of type GDT: BusinessTransactionDocumentParty. The ManufacturerParty entity 29938 may be used for Material items. The ManufacturerParty entity 29938 may be used for uniquely defining the context of a ManufacturerProductID. Since material items may also appear in this message, they may also be specified in the message (although the messages are within the service process).

(ii) Service Acknowledgement Location Package

The Location package 29922 groups together the locations relevant for the service acknowledgement. The Location package 29922 includes a ShipToLocation entity 29972. The ShipToLocation entity 29972 is the location at which goods have been delivered or a service provided. The ShipToLocation entity 29972 is of type GDT: BusinessTransactionDocumentLocation.

The ShipToLocation entity 29972 includes an Address entity 29974. The Address entity 29974 includes a PersonName entity 29976, an Office entity 29978, a PhysicalAddress 29980, a GeoCoordinates entity 29982, and a Communication entity 29984.

(iii) Service Acknowledgement Attachment Package

The Attachment package 29924 groups together the attachments relevant for the service acknowledgement. The Attachment package 29928 includes an Attachment entity 29986. There is a 1:cn relationship between the ServiceAcknowledgement entity 29918 and the Attachment entity 29986. The Attachment entity 29986 is any document that refers to the service acknowledgement. The Attachment entity 29986 is of type GDT: Attachment.

(iv) Service Acknowledgement Description Package

The Description package 29926 groups together the texts relevant for the service acknowledgement. The Description package 29926 includes a Description entity 29988 and a ConfirmationDescription entity 29990.

The Description is a natural-language text regarding the service acknowledgement, which is visible to the business partner. The Description entity 29988 is of type GDT: Description. The Description entity 29988 may be used for the textual information about the transferred purchase order and not just the current message. An example of this is a note stating that the Purchasing employee responsible is on vacation as of a specific date and indicating the name and telephone number of a substitute as of this date.

The ConfirmationDescription is a natural-language text regarding the service acknowledgement confirmation, which is visible to the business partner. The ConfirmationDescription entity 29990 is of type GDT: Description. The ConfirmationDescription entity 29990 may be used for the textual information about the service acknowledgement confirmation. Reasons may be specified in the ConfirmationDescription entity 29990 as to why the entry has been rejected, for example.

(v) Service Acknowledgement Item Package

The Item package 29928 includes the Item entity 29992, a ProductInformation package 29994, a PricingInformation package 29996, a Party package 29998, a Location package 29900A, a BusinessDocumentObjectReference package 29902A, an Attachment package 29904A, and a Description package 29906A. There is a 1:n relationship between the ServiceAcknowledgement entity 29918 and the ServiceAcknowledgementItem entity 29992.

ServiceAcknowledgementItem entities are arranged hierarchically using a Hierarchy Relationship 29910A. The Item Hierarchy Relationship 28810A is the relationship between a sub-item and a higher-level parent item in an item hierarchy. There is a 1:cn relationship between the ServiceAcknowledgementItem entity 29992 and its subordinate entities. The ServiceAcknowledgementItem entity 29992 is of type GDT: ServiceAcknowledgementItem.

The ServiceAcknowledgementItem specifies a service (service product) entered by the ServiceAcknowledgement or additional information about the service (service product). The ServiceAcknowledgementItem entity 29992 includes detailed information about a product, the price of the product, quantity, and date. The ServiceAcknowledgementItem entity 29992 may contain references to other business documents relevant for the item. As described above, a Item ServiceAcknowledgementItem entity 29992 may be subordinate to another ServiceAcknowledgementItem entity 29992 within a hierarchy, thereby establishing a business relationship between the two items.

The ServiceAcknowledgementItem entity 29992 includes an ID, a BuyerID, a ServiceEntryCompletedIndicator, a DeliveryPeriod, and a Quantity. The ID is an identifier assigned by the seller to a service acknowledgement item. The ID identifier is unique within a particular service acknowledgement and is of type GDT: BusinessTransactionDocumentItemID. The BuyerID is an identifier assigned by the buyer to a service acknowledgement item. The BuyerID identifier is unique within a particular service acknowledgement and is of type GDT: BusinessTransactionDocumentItemID. The ServiceEntryCompletedIndicator specifies whether or not confirmation for the referenced service acknowledgement item is complete and is of type GDT: BusinessTransactionCompletedIndicator. The DeliveryPeriod is a period for which the service was entered and is of type GDT: DateTimePeriod. The Quantity is the quantity entered and is of type GDT: Quantity.

ServiceAcknowledgementItem entities 29992 are arranged hierarchically using a HierarchyRelationship 29910A. There are various item categories, which are governed by a variety of constraints. A ServiceAcknowledgementItem entity 29992 may have several constraint types. The description of the constraint types specifies which constraint types may be combined with each other and how.

Methods and systems consistent with the subject matter described herein contemplate the following constraint types: (1) Standard items; (2) Hierarchy items; (3) Subitems; (4) Material items; (5) Service items; (6) Unspecified product items; (7) Grouping hierarchy items; and (8) BOM hierarchy items.

Standard items are the items to which no lower-level items have been assigned in the hierarchy. An item that is not referenced by the ParentItemID of another item is a standard item.

Hierarchy items are items to which at least one other lower-level item has been assigned in the hierarchy. An item that is referenced by the ParentItemID of at least one other item is a hierarchy item. The items are either standard or hierarchy items.

Subitems are items that have been assigned below a hierarchy item and not directly to the purchase order header. Subitems may be both standard items and hierarchy items. Each item that references another item by the ParentItemID is a subitem.

Material items are items whose product is a material. Items whose ProductTypeCode is “1” (Material) are Material items.

Service items are items whose product is a service. Items whose ProductTypeCode is “2” (service) are service items.

Unspecified product items are items for which it is not specified whether they refer to a material or a service. Items whose ProductTypeCode is not specified are unspecified product items. The items are either material, service, or unspecified product items. An unspecified product item fulfills the constraints of a material or service.

Grouping hierarchy items are hierarchy items that logically group together other items. Multilevel grouping hierarchies are permitted, that is, a grouping hierarchy item may contain subitems that are also grouping hierarchy items. Hierarchy items whose subitems have HierarchyRelationshipTypeCode “002” (group) are grouping hierarchy items; subitems with a different HierarchyRelationshipTypeCode are not permitted. Grouping hierarchy items are not permitted as subitems of other types of hierarchy items.

BOM hierarchy items are hierarchy items that group together other items in a BOM. Multilevel BOM hierarchies are permitted. Hierarchy items with at least one subitem with HierarchyRelationshipTypeCode “001” (BOM) are BOM hierarchy items; other subitems are permitted with HierarchyRelationshipTypeCode “003” (discount in kind).

(a) Hierarchy Relationship

The HierarchyRelationship 29910A is the relationship between a subitem and a higher-level parent item in an item hierarchy. The HierarchyRelationship 29910A includes a ParentItemID, a ParentItemBuyerID, and a TypeCode. The ParentItemID is the reference to a parent item with the item number assigned by the seller, and is of type GDT: BusinessTransactionDocumentItemID. The ParentItemBuyerID is the reference to a parent item with the item number assigned by the buyer, and is of type GDT: BusinessTransactionDocumentItemID. The TypeCode represents the hierarchical relationship between the subitem and its higher-level parent item, and is of type GDT: BusinessTransactionDocumentItemHierarchyRelationshipTypeCode.

(b) Service Acknowledgement Item Product Information Package

The ProductInformation package 29994 groups together the information required for identifying, describing, and classifying a product or service acknowledgement item. The ProductInformation package 29994 includes a Product entity 29912A and a ProductCategory entity 29914A. In one implementation, the ProductInformation package 29994 is not used in grouping hierarchy items.

The Product entity 29912A includes the details about a product as generally understood from a commercial point of view in business documents. The Product entity 29912A is of type GDT: BusinessTransactionDocumentProduct. With the exception of grouping hierarchy items, at least the product number or the product description is specified when a new item is created. If both the product number and description are specified, the description is merely additional information in the message and may be ignored by the recipient.

The ProductCategory entity 29914A includes the details about a product category as generally understood from a commercial point of view in business transaction documents. The ProductCategory entity 29914A includes details for identifying the product category using an internal ID, a standard ID, and IDs assigned by involved parties. The ProductCategory entity 29914A is of type GDT: BusinessTransactionDocumentProductCategory. The product category is derived directly from the product if a product number is specified for the product. It may differ for the buyer and seller if they have classified the same product differently.

(c) Service Acknowledgement Item Price Information Package

The PriceInformation package 29996 groups together the price information for a service acknowledgement item. The PriceInformation package 29996 includes a Price entity 29916A. The PriceInformation package 29916A is not used in the grouping hierarchy. In one implementation, the PriceInformation package 29996 for a service item includes prices only; it does not contain any information about how the prices are calculated.

The Price entity 29916A is the price specified by the seller for the service provided or material used. The Price entity 29916A includes a NetUnitPrice, which is the net price (without tax or cash discount) specified by the seller for the base quantity of the service or material, and is of type GDT: Price.

In BOM hierarchies, the following rules may apply for the Price:

(1) If the price is specified for the item at the top of the BOM hierarchy and not the subitems, this price applies.

(2) If the price is specified for standard items (end nodes in the hierarchy tree) in the BOM hierarchy, these prices apply. The price of the entire BOM is the total of the individual prices.

(3) If a price is specified at different levels in the BOM hierarchy, the price that appears above the others in the tree applies. Differences between the total of the individual prices and the price at the next highest hierarchy level are permissible. These may be caused by discounts for the entire BOM.

(d) Service Acknowledgement Item Party Package

The SeviceAcknowledgementItem Party package 29998 includes elements similar at header level to the ServiceAcknowledgement Party package 29920, such as a BuyerParty entity 29918A, a SellerParty entity 29920A, a ProductRecipientParty entity 29922A, a VendorParty entity 29924A, and a ManufacturerParty entity 29926A.

Each of the BuyerParty entity 29918A, the SellerParty entity 29920A, the ProductRecipientParty entity 29922A, the VendorParty entity 29924A, and the ManufacturerParty entity 29926A of Party package 29998 includes the same elements as those described above for the BuyerParty entity 29930 of Party package 29920, as denoted by ellipses 29928A, 29930A, 29932A, 29934A, and 29936A in Party package 29998.

(e) Service Acknowledgement Item Location Package

The SeviceAcknowledgementItem Location package 29900A includes elements similar at header level to the ServiceAcknowledgement Location package 29922, such as a ShipToLocation entity 29938A. The ShipToLocation entity 29938A is of type GDT: BusinessTransactionDocumentLocation. ShipToLocation entity 29938A of Location package 29900A includes the same elements as those described above for the ShipToLocation entity 29922 of Location package 29922 as denoted by ellipse 29924B in Location package 29900A.

(f) Service Acknowledgement Item Business Document Object Reference Package

The ServiceAcknowledgementItemBusinessDocumentObjectReference package ("BusinessDocumentObjectReference package") 29902A groups together references to business documents that are relevant for the ServiceAcknowledgementItem entity 29992 and have a business relationship with the item. The BusinessDocumentObjectReference package 29902A includes a PurchaseOrderReference entity 29942A, an OriginServiceAcknowledgementReference entity 29944A, a PurchaseContractReference entity 29946A, a SalesContractReference entity 29948A, a BuyerProductCatalogueReference entity 29950A, a SellerProductCatalogueReference entity 29952A, a ProjectReference entity 29954A, and a ProjectElementAssignment entity 29956A. In one implementation, none of the entities in the BusinessDocumentObjectReference package may be used in grouping hierarchy items.

The PurchaseOrderReference entity 29942A is a reference to a purchase order or item in a purchase order. The PurchaseOrderReference entity 29942A is of type GDT: BusinessTransactionDocumentReference. In one implementation, the PurchaseOrderReference entity 29926B references one item such that one ItemID is required.

The OriginServiceAcknowledgementReferenceentity 29944A is the reference to a service acknowledgement that was sent previously. The OriginServiceAcknowledgementReference entity 29944A is of type GDT: BusinessTransactionDocumentReference. In one implementation, the contraints on the message data type is that an OriginServiceAcknowledgementReference can reference one item only; therefore, no more than one ItemID is permissible.

The PurchaseContractReference entity 29946A is a reference to a purchase contract or item in a purchase contract. The PurchaseContractReference entity 29946A is of type GDT: BusinessTransactionDocumentReference. In one implementation, the PurchaseContractReference entity 29946A references one item such that one ItemID is required. Provided it has not been agreed otherwise, the seller is responsible for determining the correct SalesContractReference entity 29948A for a specified PurchaseContractReference entity 29946A.

The SalesContractReference entity 29946A is a reference to a sales contract or an item within a sales contract. The SalesContractReference entity 29946A is of type GDT: BusinessTransactionDocumentReference. In one implementation, the SalesContractReference entity 29930B references one item such that one ItemID is required.

The BuyerProductCatalogueReference entity 29950A is a reference to the buyer's product catalog or an item within the buyer's product catalog. The BuyerProductCatalogueReference entity 29950A is of type GDT: CatalogueReference. In one implementation, the BuyerProductCatalogueReference entity 29950A references one item such that one ItemID is required. The BuyerProductCatalogueReference entity 29950A is filled when a service acknowledgement item refers to a catalog whose number and item numbers were assigned by the buyer. In the service acknowledgement process, the BuyerProductCatalogueReference entity 29950A may be used as a substitute product number if a separate master record has not been created for a product and the product is defined in a catalog.

The SellerProductCatalogueReference entity 29952A is a reference to the seller's product catalog or an item within the seller's product catalog. The SellerProductCatalogueReference entity 29952A is of type GDT: CatalogueReference. The SellerProductCatalogueReference entity 29952A references one item such that one ItemID is required. The SellerProductCatalogueReference entity 29952A is filled when a service acknowledgement item refers to a catalog whose number and item numbers were assigned by the seller. In the service acknowledgement process, the SellerProductCatalogueReference entity 29952A may be used as a substitute product number if a separate master record has not been created for a product and the product is defined in a catalog.

The ProjectReference entity 29954A is a unique reference to a project or an element within project. The ProjectReference entity 29954A is of type GDT: ProjectReference. In one implementation, the ProjectReference entity 29954A is not used in the ServiceAcknowledgementMessage.

The ProjectElementAssignment entity 29956A is the assignment of two elements within a project that is referred to by an item of the service acknowledgement. The ProjectElementAssignment entity 29956A is of type GDT: ProjectElementAssignment. In one implementation, the ProjectElementAssignment entity 29956A is not used in the InvoiceMessage. In one implementation, either a ProjectReference entity 29954A or a ProjectElementAssignment 29956A may be specified. In this case, only one role (e.g., ProjectElementTypeCodes="2") may be assigned to a task (e.g., ProjectElementTypeCodes="1"). The ProjectElementAssignment entity 29956A is passed along a purchasing process through to the goods receipt, service entry, and invoicing, so that a project system can always be informed about the ongoing development of the request.

(g) Service Acknowledgement Item Accounting Package

The ServiceAcknowledgementItemAccountingObjectSetAssignment package 29904A groups the account assignment information that is needed for financial accounting. It contains the AccountingObjectSetAssignment entity 29958A. The ServiceAcknowledgementItemAccountingObjectSetAssignment package 29904A contains all information about the account assignment objects in financial accounting that the service acknowledgement item refers to. The amount can be distributed by percentages and assigned to different objects (such as cost center, order, and so on). The sum of all account assignments must equal 100%.

The AccountingObjectSetAssignment entity 29958A is the assignment of an item net amount from a service acknowledgement or of partial amounts (based on percentage, value, or quantity) to a set of account assignment objects (AccountingObjectSet). The AccountingObjectSetAssignment entity 29958A is of type GDT: AccountingObjectSetAssignment. There is a 1:cn relationship between the AccountingObjectSetAssignment entity 29958A and the ServiceAcknowledgementItem entity 29992. In one implementation, the AccountingObjectSetAssignment is not used in the ServiceAcknowledgementMessage. For example, 40% of the item amount of a service acknowledgement can be assigned to cost center CC1000 and profit center PC3050, while 60% of the item amount is assigned to customer order 100002345.

(h) Service Acknowledgement Item AttachmentPackage

The SeviceAcknowledgementItemAttachment package 29960A includes elements similar at header level to the ServiceAcknowledgementAttachment package 29924, such as an Attachment entity 29960A. There is a 1:cn relationship between the Attachment entity 29960A and the ServiceAcknowledgementItem entity 29992. The Attachment entity 29960A is of type GDT: BusinessTransactionDocumentLocation.

(i) Service Acknowledgement Item Description Package

The Description package 29908A groups together the explanatory texts regarding a service acknowledgement item. The Description package 29908A includes a Description entity 299562A and a ConfirmationDescription entity 29964A.

The Description entity 29962Ais a natural-language text regarding a service acknowledgement that may be visible to the business partner. The Description entity 29962A is of type GDT: Description. The Description may be used for the types of textual information about the service acknowledgement item. An example is an accurate description of a fault in need of repair.

The ConfirmationDescription entity 29964A is a natural-language text regarding the confirmation of a service acknowledgement item that may be visible to the business partner. The ConfirmationDescription entity 29964A is of type GDT: Description. The ConfirmationDescription entity 29964A may be used for the textual information about the confirmation of a service acknowledgement item. An example of this would be the seller's justification for rejecting a particular service acknowledgement item.

(3) Message Data Type Element Structure

FIGS. 300A-L depict the element structure for a SeviceAcknowledgementRequest and a ServiceAcknowledgementConfirmation. The element structure is similar to the above described data model of the message data type ServiceAcknowledgementMessage as reflected in FIGS. 299A-J, but provides additional information regarding the details for interfacing with or implementing a ServiceAcknowledgementMessage, such as a SeviceAcknowledgementRequest and a ServiceAcknowledgementConfirmation. As shown in FIGS. 300A-L, the element structure identifies the different packages 30000 that may be in a respective ServiceAcknowlegementRequest and ServiceAcknowledgementConfirmation. The element structure for the ServiceAcknowlegementRequest and ServiceAcknowledgementConfirmation includes five levels 30002, 30004, 30006, 30008 and 30010 each of associated with a respective package 30000. The element structure identifies the cardinality 30012 and data type information (i.e., type 30014 and name 30016) for the elements at the respective levels 30002, 30004, 30006, 30008 and 30010 in a package 30000.

The outermost package of this interface is a ServiceAcknowledgement package 30020, which includes a ServiceAcknowledgementMessage entity 30022 at the first level 30002. The ServiceAcknowledgementMessage entity 30022 is of message data type ("MDT") 30024 ServiceAcknowledgementMessage 30026.

The ServiceAcknowledgementMessage package 30020 includes a MessageHeader package 30028 and a ServiceAcknowledgement package 30030. The MessageHeader package 30028 includes a MessageHeader entity 30032, which is of type generic data type ("AGDT") 30036 "BusinessDocumentMessageHeader" 30038. There is one 30034 MessageHeader entity for each ServiceAcknowledgementMessage entity 30022.

The MessageHeader entity 30032 includes an ID 30040, a Reference ID 30048, and a CreationDateTime 30056. The ID 30040 is of type GDT 30044 BusinessDocumentMessageID 30046. The ReferenceID 30048 is of type GDT 30052 BusinessDocumentMessageID 30054. The CreationDateTime 30056 is of type GDT 30060 DateTime 30062. There is one 30042 ID 30040 for each MessageHeader entity 30032, one or zero 30050 ReferenceID 30052 for each MessageHeader entity 30032, and one 30058 CreationDateTime 30056 for each MessageHeader entity 30032.

The MessageHeader entity 30032 also includes a SenderParty entity 30064 and a RecipientParty entity 30020A. The SenderParty entity 30064 is of type AGDT 30068 BusinessDocumentMessageHeaderParty 30070. The RecipientParty entity 30020A is also of type AGDT 30024A BusinessDocumentMessageHeaderParty 30026A. There is one or zero 30066 SenderParty entity 30064 for each MessageHeader entity 30032, and there is any number 30022A of RecipientParty entities 30020A for each MessageHeader entity 30032.

The SenderParty entity 30064 includes an InternalID 30072, a StandardID 30080, and a ContactPerson 30088. The InternalID 30072 is of type GDT 30076 PartyInternalID 30078. The StandardID 30080 is of type GDT 30084 PartyStandardlID 30086. The ContactPerston 30088 is of type AGDT 30092 ContactPerson 30094. There is one or zero 30074 InternalID 30072 for each SenderParty entity 30064, any number 30082 of StandardIDs 30080 for each SenderParty entity 30064, and one or zero 30090 ContactPerson 30088 for each SenderParty entity 30064.

The ContactPerson 30088 includes a BuyerID 30096, a VendorID 30004A, and an Address 30012A. The BuyerID 30096 is of type CDT 30000A ContactPersonPartyID 30002A. The VendorID 30004A is of type CDT 30006A ContactPersonPartyID 30010A. The Address 30012A is of type AGDT 30016A Address 30018A. There is one or zero 30098 BuyerID 30096 for each ContactPerson 30088, one or zero 30006A of VendorID 30004A for each ContactPerson 30088, and one or zero 30014A Address 30012A for each ContactPerson 30088.

The ServiceAcknowledgement package 30030 includes a ServiceAcknowledgement entity 30028A. There is one 30030A ServiceAcknowledgement entity 30028A for each ServiceAcknowledgementMessage entity 30022A. The ServiceAcknowledgement entity 30028A is of type AGDT 30032A ServiceAcknowledgement 30034A. The ServiceAcknowledgement entity 30028A includes an ID 30036A, a BuyerID 30046A, a CreationDateTime 30054A, a CancellationServiceAcknowledgementIndicator 30051A, an AcceptanceStatusCode 30064A, and a Note 30074A. The ID 30036A is of type GDT 30040A BusinessTransactionDocumentID 30042. The BuyerID 30046A is of type GDT 30050A BusinessTransactionDocumentID 30052A. The CreationDateTime 30054A is of type GDT 30058A DateTime 30060A. The CancellationServiceAcknowledgementIndicator 30051A is of type GDT 30055A CancellationServiceAcknowledgementIndicator 30057A. The AcceptanceStatusCode 30064A is of type GDT 30068A AcceptanceStatusCode 30070A. The Note 30074A is of type GDT 30078A Note 30080A. There is one 30038A ID 30036A for each ServiceAcknowledgement entity 30028A. There is one or zero 30048A BuyerID 30046A for each ServiceAcknowledgement entity 30028A. There is zero or one 30056A CreationDateTime 30054A for each ServiceAcknowledgement entity 30028A. There is zero or one 30053A CancellationServiceAcknowledgementIndicator 30057A for each ServiceAcknowledgement entity 30028A. There is zero or one 30066A AcceptanceStatusCode 30064A for each ServiceAcknowledgement entity 30028A. There is one or zero 30076A Note 30074A for each ServiceAcknowledgement entity 30028A. ID 30036A may be associated with PIDX element FieldTicketProperties-FieldTicketNumber 30044A. CreationDateTime 30054A may be associated with PIDX element FieldTicketProperties-FieldTicketDate 30062A. AcceptanceStatusCode 30064A may be associated with PIDX element FieldTicketResponseLineItem-LineStatusCode 30072A.

The ServiceAcknowledgement package 30030 also includes a Party package 30082A, a Location package 30084A, an Attachment package 30086A, a Description package 30088A, and an Item package 30090A.

The Party package 30082A includes a BuyerParty entity 30092A, a SellerParty entity 30066B, a ProductRecipientParty entity 30076B, a VendorParty entity 30086B, and a ManufacturerParty entity 30096B. The BuyerParty entity 30092A is of type AGDT 30096A BusinessTransactionDocumentParty 30098A. There is one or zero 30094A BuyerParty entity 30092A for each ServiceAcknowledgement entity 30028A. The SellerParty entity 30066B is of type AGDT 30070B BusinessTransactionDocumentParty 30072B. There is one or zero 30068B SellerParty entity 30066B for each ServiceAcknowledgement entity 30028A. The ProductRecipientParty entity 30076B is of type AGDT 30080B BusinessTransactionDocumentParty 30082B. There is one or zero 30078B ProductRecipientParty entity 30076B for each ServiceAcknowledgement entity 30028A. The VendorParty entity 30086B is of type AGDT 30090B BusinessTransactionDocumentParty 30092B. There is one or zero 30088B VendorParty entity 30086B for each ServiceAcknowledgement entity 30028A. The ManufacturerParty entity 30096B is of type AGDT 30000C BusinessTransactionDocumentParty 30002C. There is one or zero 30098B ManufacturerParty entity 30096B for each ServiceAcknowledgement entity 30028A. BuyerParty 30092A may be associated with PIDX element PartnerInformation (all Parties) 30000B. SellerParty 30066B may be associated with PIDX element PartnerInformation 30074B. ProductRecipientParty 30076B may be associated with PIDX element PartnerInformation 30084B. VendorParty 30086B may be associated with PIDX element PartnerInformation and CountryOfOrigin 30094B. ManufacturerParty 30096B may be associated with PIDX element PartnerInformation 30004C.

The BuyerParty entity 30092A includes a StandardID entity 30002B, a BuyerID entity 30010B, a SellerID entity 30018D, an Address entity 30026B and a ContractPerson entity 30034B. The StandardID entity 30002B is of type CDT 30006B PartyStandardID 30008D. The BuyerID entity 30010B is of type CDT 30014B PartyPartyID 30008D. The SellerID entity 30018D is of type CDT 30022B PartyPartyID 30024B. The Address entity 30026B is of type AGDT 30030B Address 30032B. The ContactPerston entity 30034B is of type AGDT 30038B ContractPerson 30040B. There is any number 30004B of StandardID entities 30002B for each BuyerParty entity 30092A, one or zero 30012B BuyerID entity 30010B for each BuyerParty entity 30092A, one or zero 30020B SellerID entity 30018B for each BuyerParty entity 30092A, one or zero 30028B Address entity 30026B for each BuyerParty entity 30092A, and one or zero 30036B ContractPerson entity 30034B for each BuyerParty entity 30092A.

The ContractPerson entity 30034B includes a BuyerID entity 30042B, a SellerID entity 30050B, and an Address entity 30058B. The BuyerID entity 30042B is of type CDT 30046B ContactPersonPartyID 30048B. The SellerID entity 30050B is of type CDT 30054B ContactPersonPartyID 30056B. The Address entity 30058B is of type AGDT 30062B Address 30064B. There is one or zero 30044B BuyerID entity 30042B for each ContractPerson entity 30034A, one or zero 30052B SellerID entity 30050B for each ContractPerson entity 30034B, and one or zero 30060B Address entity 30058B for each ContractPerson entity 30034B.

The Location Package 30084A includes a ShipToLocation entity 30006C. The ShipToLocation entity 30006C is of type AGDT 30010C BusinessTransactionDocumentLocation 30012C. There is one or zero 30008C ShipToLocation entity 30006C for each ServiceAcknowledgement entity 30028A.

The ShipToLocation entity 30006C includes a StandardID entity 30016C, a BuyerID entity 30024C, a SellerID entity 30032C, and an Address entity 30040C. The StandardID entity 30016C is of type CDT 30020C LocationStandardID 30022C. The BuyerID entity 30024C is of type CDT 30028C LocationPartyID 30030C. The SellerID entity 30032C is of type CDT 30036C LocationPartyID 30038C. The Address entity 30040C is of type AGDT 30044C Address 30046C. There is any number 30018C of StandardID entities 30016C for each ShipToLocation entity 30006C, one or zero 30026C BuyerID entity 30024C for each ShipToLocation entity 30006C, one or zero 30034C SellerID entity 30032C for each ShipToLocation entity 30006C, and one or zero 30042C Address entities 30040C for each ShipToLocation entity 30006C. ShipToLocation 30006C may be associated with PIDX element CountryOfFinalDestination 30014C.

The Attachment package 30086A includes an Attachment entity 30048C, which is of type AGDT 30052C Attachment 30054C. There is any number 30050C of Attachment entities 30048C for each ServiceAcknowledgement entity 30028A. Attachment 30048C may be associated with PIDX element FieldTicketProperties-Attachment 30056C.

The Description package 30088A includes a Description entity 30058C and a ConfirmedDescription entity 30068C. The Description entity 30058C is of type GDT 30062C Description 30064C. There is one or zero 30060C Description entity 30058C for each ServiceAcknowledgement entity 30028A. The ConfirmedDescription entity 30068C is of type GDT 30072C Description 30074C. There is one or zero 30070C ConfirmedDescription entity 30068C for each ServiceAcknowledgement entity 30028A. Description 30058C may be associated with PIDX element FieldTicketProperties-Comment and -JobSummary 30066C.

The Item package 30090A includes an Item entity 30076C. There is one or more 28060C Item entities 28058C for each ServiceAcknowledgement entity 30028A. The Item entity 30076C is of type AGDT 30080C ServiceAcknowledgementItem 30082C.

The Item entity 30076C includes an ID 30084C, a BuyerID 30094C, a ServiceEntryCompletedIndicator 30002D, a DeliveryPeriod 30010D, a Quantity 30020D, and a HierarchyRelationship 30030D. The ID 30084C is of type GDT 30088C BusinessTransactionDocumentItemID 30090C, and there is one 30086C ID 30084C for each Item entity 30076C. The BuyerID 30094C is of type GDT 30098C BusinessTransactionDocumentItemPartyID 30000D, and there is one or zero 30096C BuyerID 30094C for each Item entity 30076C. The ServiceEntryCompletedIndicator 30002D is of type GDT 30006D BusinessTransactionCompletedIndicator 30008D, and there is one or zero 30004D ServiceEntryCompletedIndicators 30002D for each Item entity 30076C. The DeliveryPeriod entity 30010D is of type GDT 30014D DateTimePeriod 30016D, and there is one or zero 30012D DeliveryPeriod entity 30010D for each Item entity 30076C. The Quantity 30020D is of type GDT 30024D Quantity 30026D, and there is one or zero 30022D Quantity 30026D for each Item entity 30076C. There is one or zero 30032D HierarchyRelationship 30030D for each Item entity 30076C. The HierarchyRelationship 30030D includes a ParentItemID 30036D, which is of type GDT 30040D BusinessTransactionDocumentItemID 30042D, a ParentItemBuyerID 30044D, which is of type GDT 30048D BusinessTransactionDocumentItemID 30050D, and a TypeCode 30052D, which is of type GDT 30056D BusinessTransactionDocumentItemHierarchyRelationshipTypeCode 30058D. There is one or zero 30038D ParentItemID 30036D for each HierarchyRelationship 30030D. There is one or zero 30046D ParentItemBuyerID 30044C for each HierarchyRelationship 30030D. There is one 30054D TypeCode 30052D for each HierarchyRelationship 30030D. ID 30084C may be associated with PIDX element FieldTicketLineItem-LineItemNumber 30092C. DeliveryPeriod 30010D may be associated with PIDX element FieldTicketLineItem-ServiceDateTime 30018D. Quantity 30020D may be associated with PIDX element FieldTicketProperties-FieldTicketQuantity 30028D. HierarchyRelationship 30030D may be associated with PIDX element FieldTicketSubLineItem 30034D.

The Item package 30090A also includes a ProductInformation package 30060D, a PriceInformation package 30062D, a Party package 30064D, a Location package 30066D, a BusinessTransactionDocumentReference package 30068D, an Attachment package 30070D and a Description package 30072D.

The ProductInformation package 30060D includes a Product entity 30074D and a ProductCategory entity 30032E. The Product entity 30074D is of type AGDT 30078D BusinessTransactionDocumentProduct 30080D. There is one or zero 30076D Product entity 30074D for each Item entity 30076C. The ProductCategory entity 30032E is of type AGDT 30036E BusinessTransactionDocumentProductCategory 30038E. There is one or zero 30034E ProductCategory entity 30032E for each Item entity 30076C.

The Product entity 30074D includes a StandardID entity 30084D, a BuyerID entity 30092D, a SellerID entity 30000E, a ManufacturerID 30008E, a TypeCode entity 30016E and a Note entity 30024E. The StandardID entity 30084D is of type CDT 30088D ProductStandardID 30090D. The BuyerID entity 30092D is of type CDT 30096D ProductPartyID 30098D. The SellerID entity 30000E is of type CDT 30004E ProductPartyID 30006E. The ManufacturerID entity 30008E is of type CDT 30012E ProductPartyID 30014E. The TypeCode entity 30016E is of type GDT 30020E ProductTypeCode 30022E. The Note entity 30024E is of type GDT 30028E Note 30030E. There is any number 30086D of StandardID entities 30084D for each Product entity 30074D, one or zero 30094D BuyerID entity 30092D for each Product entity 30074D, one or zero 30002E SellerID entity 30000E for each Product entity 30074D, one or zero 30010E The ManufacturerID entity 30008E for each Product entity 30074D, one or zero 30018E TypeCode entity 30016E for each Product entity 30074D and one or zero 30026E Note entity 30024E for each Product entity 30074D.

The ProductCategory entity 30032E includes a StandardID entity 30040E, a BuyerID entity 30048E, and a SellerID entity 30056E. The StandardID entity 30040E is of type CDT 30044E ProductCategoryStandardID 30046E. The BuyerID entity 30048E is of type CDT 30052E ProductCategoryPartyID 30054E. The SellerID entity 30056E is of type CDT 30060E ProductCategoryPartyID 30062E. There is any number 30042E of StandardID entities 30040E for each ProductCategory entity 30032E, one or zero 30050E BuyerID entity 30048E for each ProductCategory entity 30032E, and one or zero 30058E SellerID entity 30056E for each ProductCategory entity 30032E. Product 30074D may be associated with PIDX element FieldTicketProperties-LineItemInformation 30082D.

The PriceInformation package 30062D includes a Price entity 30064E. There is one or zero 30066E Price entity 30064E for each Item entity 30076C. The Price entity 30064E includes a NetUnitPrice 30070E. The NetUnitPrice 30070E is of type AGDT 30074E Price 30076E. There is one or zero 30072E NetUnitPrice 30070E for each Price entity 30064E. Price 30064E may be associated with PIDX element FieldTicketLineItem-Pricing 30068E. NetUnitPrice 30070E may be associated with PIDX element PrimaryCurrency 30078E. The Price entity 30064E includes a NetAmount 30071E. The NetAmount 30071E is of type GDT 30075E Amount 30077E. There is one or zero 30073E NetAmount 30071E for each Price entity 30064E.

The Party package 30064D includes a BuyerParty entity 30080E, a SellerParty entity 30090E, a ProductRecipientParty entity 30000F, a VendorParty entity 30010F, and a ManufacturerParty entity 30020F. The BuyerParty entity 30080E is of type AGDT 30084E BusinessTransactionDocumentParty 30086E. There is one or zero 30082E BuyerParty entity 30080E for each Item entity 30076C. The SellerParty entity 30090E is of type AGDT 30094E BusinessTransactionDocumentParty 30096E. There is one or zero 30092E SellerParty entity 30090E for each Item entity 30076C. The ProductRecipientParty entity 30000F is of type AGDT 30004F BusinessTransactionDocumentParty 30006F. There is one or zero 30002F ProductRecipientParty entity 30000F for each Item entity 30076C. The VendorParty entity 30010F is of type AGDT 30014F BusinessTransactionDocumentParty 30016F. There is one or zero 30012F VendorParty entity 30010F for each Item entity 30076C. The ManufacturerParty entity 30020F is of type AGDT 30024F BusinessTransactionDocumentParty 30026F. There is one or zero 30022F ManufacturerParty entity 30020F for each Item entity 30076C. BuyerParty 30080E may be associated with PIDX element PartnerInformation 30088E. SellerParty 30090E may be associated with PIDX element PartnerInformation 30098E.

ProductRecipientParty 30000F may be associated with PIDX element PartnerInformation 30008F. VendorParty 30010F may be associated with PIDX element PartnerInformation and CountryOfOrigin 30018F. ManufacturerParty 30020F may be associated with PIDX element PartnerInformation 30028F.

The Location package 30066D includes a ShipToLocation entity 30030F. The ShipToLocation entity 30030F is of type AGDT 30034F BusinessTransactionDocumentLocation 30036F, and there is one or zero 30032F ShipToLocation entity 30030F for each Item entity 30076C.

The BusinessTransactionDocumentReference package 30068D includes a PurchaseOrderReference entity 30038F, a OriginServiceAcknowledgementReference 30061F, a PurchaseContractReference entity 30048F, a SalesContractReference entity 30058F, a BuyerProductCatalogueReference entity 30066F, and a SellerProductCatalogueReference entity 30074F. The PurchaseOrderReference entity 30038F is of type AGDT 30042F BusinessTransactionDocumentReference 30044F. There one or zero 30040F of PurchaseOrderReference entities 30038F for each Item entity 30076C. The PurchaseContractReference entity 30048F is of type AGDT 30052F BusinessTransactionDocumentReference 30054F. There is one or zero 30050F PurchaseContractReference entity 30048F for each Item entity 30076C. The OriginServiceAcknowledgementReference 30061F is of type GDT 30065F BusinessTransactionDocumentReference 30067F. There is one or zero 30063F OriginServiceAcknowledgementReference 30061F for each Item entity 30076C. The SalesContractReference entity 30058F is of type AGDT 30062F BusinessTransactionDocumentReference 30064F. There is one or zero 30060F SalesContractReference entity 30058F for each Item entity 30076C. The BuyerProductCatalogueReference entity 30066F is of type AGDT 30070F CatalogueReference 30072F. There is one or zero 30068F BuyerProductCatalogueReference entity 30066F for each Item entity 30076C. The SellerProductCatalogueReference entity 30074F is of type AGDT 30078F CatalogueReference 30080F. There is one or zero 30076F SellerProductCatalogueReference entity 30074F for each Item entity 30076C. PurchaseOrderReference 30028F may be associated with PIDX element FieldTicketLineItem-PurchaseOrderInformation 30046F. PurchaseContractReference 30048F may be associated with PIDX element FieldTicketLineItem-ReferenceInformation 30056F.

The Accounting package 30071D includes an AccountingObjectSetAssignment 30083FF, which is of type GDT 30087F AccountingObjectSet 30089F. There is one or zero 30085F AccountingObjectSetAssignment 30083FF for each Item entity 30076C.

The Attachment package 30070D includes an Attachment entity 30082F, which is of type AGDT 30086F Attachment 30088F. There is one or zero 30084F Attachment entities 30082F for each Item entity 30076C. Attachment 30082F may be associated with PIDX element FieldTicketLineItem-Attachment 30090F.

The Description package 30072D includes a Description entity 30092F and a ConfirmedDescription entity 30002G. The Description entity 30092F is of type GDT 30096F Description 30098F. There is one or zero 30094F Description entity 30092F for each Item entity 30076C. The ConfirmedDescription entity 30002G is of type GDT 30006G Description 30008G. There is one or zero 30004G ConfirmedDescription entity 30002G for each Item entity 30076C. Description 30092F may be associated with PIDX element FieldTicketLineItem-Comment and -JobSummary 30000G.

e) RFQ, RFQ Cancellation, RFQ Result, Quote Interfaces

Request for quotation ("RFQ") interfaces are the interfaces that are required in a B2B process to exchange RFQs and quotations between a buyer and a bidder and finally to communicate the quotation acceptance. More than just a simple interface structure, the RFQ interfaces define the underlying business logic and, at the same time, dispense with the need to exchange proprietary information in straightforward RFQ processes. In this way, applications that implement the RFQ interfaces can be integrated without the need for complex project work.

(1) Message Choreography

FIG. 301 depicts the message choreography for the RFQ Interfaces. The choreography involves two business entities: a buyer (Purchasing or SRM) 30102 and a bidder (Supplier) 30104. In one implementation, there are five messages that are used to map a B2B RFQ process: (1) RFQRequest; (2) RFQChangeRequest; (3) RFQCancellationRequest; (4) QuoteNotification; and (5) RFQResultNotification. In the implementation shown in FIG. 301, the buyer 30102 sends an RFQRequest message 30106 to the bidder 30104, which is used to start a new RFQ process. In response, the bidder 30104 may send an RFQAcceptanceConfirmation message 30108 to the buyer 30102 to inform the buyer 30102 whether the bidder 30104 intends to submit a quotation. This provides the buyer 30102 with an early indication of whether the bidders that were expected to participate are in fact participating. In the case of a public RFQ process, the bidder 30104 can also use this message to apply to participate and to ask for the RFQ documents to be sent.

The buyer 30102 may send an RFQChangeRequest message 30110 to the bidder 30104, which is used to change an RFQ during an RFQ process. Changing an RFQ includes creating new items, changing existing items, and deleting items. This message is also used when a buyer returns the bidder's quotation for revision.

The buyer 30102 may also send an RFQCancellationRequest message 30112 to the bidder 30104, which is used to cancel an RFQ that is no longer required.

The bidder 30104 may send a QuoteNotification message 30114 to the buyer 30102, which includes the bidder's quotation in response to the buyer's invitation to submit a quotation. The buyer 30102 may send a RFQResultNotification message 30116 to the bidder 30104, which either includes a notification about the RFQ items for which the bidder's quotation has been accepted including the extent of the award or a negative notification if the bidder's quotation was not successful. In response, the bidder 30104 may send an RFQResultAcceptanceConfirmation message 30118 to the buyer 30102 and includes the bidder's acceptance or rejection of the quotation accepted by the buyer 30102. This message may be used particularly if the quotation accepted by the buyer represents a part of the bidder's quotation, since individual items and/or partial quantities in the RFQ are being distributed to several bidders.

The structures of the first five message types to be implemented are specified in the four message data types RFQMessage, RFQCancellationMessage, QuoteMessage, and RFQResultMessage. The structure of the two message types RFQRequest and RFQChangeRequest is specified by the message data type RFQMessage. The parts of the structure that are used differ depending on the message. The description of the RFQMessage below specifies which parts are used in which message.

The structure of the message type RFQCancellationRequest is specified in the message data type RFQCancellationRequest, which has a relatively simple structure. In one implementation, this message type includes the RFQ number.

The structure of the message type QuoteNotification is specified in the message data type QuoteMessage. The structure of the message type RFQResultNotification is specified in the message data type RFQResultMessage.

An RFQRequest is a request from a buyer to a bidder to participate in an RFQ process for a product. The structure of the message type RFQRequest is specified in the message data type RFQMessage. The RFQRequest is sent once for each invited bidder. Since the RFQ can be used for contractual negotiations, the structure may also include contract-specific fields. These fields contain information for creating a contract from a successful quotation. The addressee for a message can also be a tendering platform, for example, which means that the actual bidders are not known when the RFQRequest is issued. RFQs issued by public authorities are published with general access. Rather than being invited directly, bidders may apply to participate, via the platform. One aim of the platform may be to avoid giving certain bidders preferential treatment as a result of not inviting or informing, or by implicitly excluding, other bidders.

An RFQChangeRequest is a change to the buyer's request to a bidder to participate in an RFQ process for a product. The structure of the message type RFQChangeRequest is specified in the message data type RFQMessage. The RFQChangeRequest is sent once for each invited bidder in one implementation. This is independent of whether a quotation has already been submitted. In the case of a publication platform (such as a bulletin board), which is used to publish an RFQ, the RFQChangeRequest is sent to the platform and to the bidders who have already submitted a quotation. In the case of a tendering platform, in one implementation, which also manages the quotation process (such as in the public sector), the RFQChangeRequest is sent to the tendering platform. The platform then provides the bidders with information. The scenario that applies depends on the configuration. In one implementation, an RFQChangeRequest can be sent as often as required and at any time, provided that RFQCancellationRequest or RFQResultNotification messages have not been sent. This message can be used to return a quotation from a particular bidder to this bidder for revision. This message asks the bidder in question to revise the quotation and resubmit it, before the buyer can consider it. The RFQChangeRequest is the basis for remaining quotations. Any quotations that have already been submitted are returned to the bidders as a result of this message. Regardless of whether the changes affect the submitted quotation, a quotation is resubmitted in one implementation. The revised quotation might be identical to the quotation that was submitted before the RFQ was changed.

An RFQCancellationRequest is a cancellation of an RFQ for a product by a buyer. The structure of the message type RFQCancellationRequest is specified in the message data type RFQCancellationMessage. The RFQCancellationRequest can be sent at any time up to the submission deadline. After the RFQCancellationRequest has been sent, no further messages are expected. This message is sent to the invited bidders, regardless of whether a quotation already exists. In the case of a tendering platform, the RFQCancellationRequest is sent to the tendering platform and to the bidders who have already submitted a quotation. The RFQCancellationRequest message has its own structure, that is, the structure of the RFQCancellationMessage, with the object ID of the cancelled RFQ.

A QuoteNotification is a quotation submitted by a bidder to a buyer in response to the RFQ for a product issued by the buyer. The structure of the message type QuoteNotification is specified in the message data type QuoteMessage. In one implementation, each invited bidder can submit precisely one quotation. If the bidder wants to make changes to a submitted quotation, the bidder asks the buyer who issued the RFQ to return the quotation for revision. The QuoteNotification can be submitted up to the submission deadline. A quotation can be exchanged between the buyer and the bidder as many times as required, up to the submission deadline. The QuoteNotification message has a separate structure, the QuoteMessage. One reason behind having another structure in addition to the RFQMessage is to encourage bidders to submit quotations on their own initiative, not necessarily in response to an RFQRequest.

An RFQResultNotification is a notification by a buyer to a bidder of the type and extent of the acceptance or rejection of the quotation. The structure of the message type RFQResultNotification is specified in the message data type RFQResultMessage. The RFQResultNotification is sent once for each bidder to the bidders that have submitted a quotation. Successful bidders are sent precise information about the quotation acceptance. Unsuccessful bidders are sent a standard rejection. In the case of a tendering platform, a copy of the RFQResultNotification for the successful bidders can also be sent to the tendering platform so that the result can be published. In the public sector, the decision regarding whose quotation has been accepted is made public.

The interaction between the RFQ interfaces in an RFQ process is described in detail below. Generally, the buyer initiates the RFQ process and invites bidders to submit quotations. Up to the submission deadline, the bidder and buyer exchange quotations, queries, revised quotations, and changes to the RFQ. Once the submission deadline has passed, the buyer compares the quotations and decides to accept the quotation submitted by one particular bidder or several bidders. The buyer can also decide to reject all quotations.

The buyer starts an RFQ process by sending an RFQRequest message. Each invited bidder or addressed public platform receives a separate invitation. Once the RFQ process has been started, the buyer can send change requests at any time, using an RFQChangeRequest message. Quotations that have already been submitted are then resent automatically to the bidder in question. The bidder then resubmits the quotation, in one implementation, before it can be considered by the buyer (even if the RFQChangeRequest does not affect the bidder's quotation).

At any time up to the submission deadline, the buyer can end the RFQ process by sending an RFQCancellationRequest message. If the submission deadline has already passed, the RFQCancellationRequest is no longer used. However, the buyer can decide against all the quotations submitted and therefore reject them. Provided the RFQ has not been set to complete, the buyer can make changes to the RFQ in order to obtain additional quotations or revisions to the submitted quotations by extending the submission deadline. Alternatively, the buyer can create a new RFQ with the same contents or with different contents.

After receiving the RFQRequest message, the bidder can send a quotation to the buyer, using the QuoteNotification message. In one implementation, each invited bidder is allowed to submit one quotation in response to an RFQRequest. To make changes to a submitted QuoteNotification, the bidder asks the buyer who issued the RFQ to return the quotation for revision. The bidder can enter any queries in the quotation and wait for the quotation to be returned, together with a note from the buyer. The quotation can be exchanged any number of times. To withdraw the quotation, the bidder contacts the buyer, who then deletes the quotation.

The buyer can also take the initiative and return a submitted quotation to the bidder, using the RFQChangeRequest, asking for revisions to be made. In this case, the bidder resubmits the quotation for it to be considered in the quotation comparison.

At any time up to the submission deadline, changes and quotations can be exchanged as often as required. However, while the buyer is allowed to send an RFQChangeRequest at any time, or several RFQChangeRequests in succession, an RFQChangeRequest is followed by the QuoteNotification. In one implementation, the QuoteNotification cannot be sent several times in succession.

The quotation process is completed either as a result of the RFQCancellationRequest being sent or the submission deadline passing. Once the submission deadline has passed, the buyer compares the quotations that have been submitted and decides to accept the quotation(s) from one bidder or several bidders. The buyer can also decide to reject all of the submitted quotations. The buyer can split the order quantities as required, up to item level.

In the case of public authority tendering platforms, the steps that stipulate that the buyer is allowed to view the quotations before the submission deadline no longer apply. The quotations are not transferred to the buyer until the opening date of the quotation comparison. Prior to this, the quotations may be kept in encrypted form. In one implementation, the bidder can ask for the quotation to be returned for revision or for it to be deleted because the bidder wants to withdraw it. The result of the RFQ is communicated using the RFQResultNotification message. This message informs the successful bidders which quotation has been accepted and details the specific items and the order quantity involved. Unsuccessful bidders are sent a rejection.

In the RFQ process, messages may be transferred exactly once in order ("EOIO") and serialized using message queues. Each RFQ process may have its own message queue (as opposed to one queue for all RFQ processes) so that one failed message does not block the other RFQ messages in the entire system.

A recipient system may accept every formally correct incoming RFQ message. Business problems are resolved on the buyer side, using an RFQChangeRequest or RFQCancellationRequest message, and on the seller side, using a QuoteNotification message. It is up to the recipient system to distinguish between technical and business errors. Borderline cases may include incorrect ISO codes for currencies, and languages. In order to restart an RFQ process that is corrupt as a result of a failed message, the procurement system provides an option for transferring the current status of the RFQ, together with the associated data, at any time using an RFQChangeRequest message. In order to restart a process following a failed RFQRequest message, the procurement system should be able to restart an RFQ process at any time using an RFQRequest message. The RFQResultNotification has legal implications. Following a failed RFQResultNotification, the procurement system should therefore be able to repeat this message.

(2) Message Data Type RFQ Message

The message data type RFQMessage groups together the business information relevant for sending a business document in a message and the RFQ object in the document. As depicted in FIG. 302, the RFQMessage package 30202 includes a MessageHeader package 30204, an RFQ package 30206 and an RFQMessage entity 30208.

(a) Message Header Package

A MessageHeader package 30208 groups together the business information that is relevant for sending a business document in a message. It includes a MessageHeader entity 30210. There is a 1:1 relationship 30212 between the RFQMessage 30208 and the MessageHeader entity 30210.

A MessageHeader entity 30210 groups the business information from the perspective of the sending application to identify the business document in a message, to provide information about the sender, and to provide any information about the recipient. The MessageHeader entity 30210 includes a SenderParty entity 30214 and a RecipientParty entity 30216. There is a 1:c relationship 30218 between the MessageHeader entity 30210 and the SenderParty entity 30214. There is a 1:cn relationship 30220 between the MessageHeader entity 30210 and the RecipientParty entity 30216. The MessageHeader entity 30210 is of type GDT: BusinessDocumentMessageHeader. The MessageHeader entity 30210 includes an ID, a ReferenceID, and a CreationDateTime.

The MessageID is set by the sending application. With the ReferenceMessageID, reference is made in the current BusinessDocument to a previous BusinessDocument. The ReferenceMessageID should be filled in order to avoid inconsistencies that can arise as a result of sending messages in the pipeline at the same time, e.g., the buyer changes the RFQ and sends the message with the changes (RFQChangeRequest) to the bidders. At the same time, a bidder sends a QuoteNotification. Without the ReferenceMessageID in the message header in the QuoteNotification and in the case of longer transmission times for the messages, it may no longer be possible to determine clearly whether the QuoteNotification sent by the bidder refers to the old RFQ or to the new, changed RFQ.

The SenderParty is the party responsible for sending a business document at business application level. The SenderParty entity 30214 is of type GDT: BusinessDocumentMessageHeader-Party. The SenderParty entity 30214 can be filled by the sending application to name a contact person for any problems with the message. This is particularly useful if an additional infrastructure (such as a marketplace or a tendering platform) is located between the sender and the recipient. The SenderParty entity 30214 is used to transfer the message and can be ignored by the receiving application. It should be filled by the sender particularly if the participating parties are not transferred with the RFQ package 30206.

The RecipientParty is the party responsible for receiving a business document at business application level. The RecipientParty entity 30216 is of type GDT: BusinessDocumentMessageHeaderParty. The RecipientParty entity 30216 can be filled by the sending application to name a contact person for any problems that occur with the message. This is particularly useful if an additional infrastructure (such as a marketplace or a tendering platform) is located between the sender and the recipient. The RecipientParty entity 30216 is used to transfer the message and can be ignored by the receiving application. It should be filled by the sender particularly if the participating parties are not transferred with the RFQ package 30206.

(i) RFQ Package

The RFQ package 30206 includes a Party package 30222, a Location package 30224, a DeliveryInformation package 30226, a PaymentInformation package 30228, a ProductInformation package 30230, a PriceInformation package 30239, a BusinessTransactionDocumentReference package 30232, a FollowUpBusinessTransactionDocument package 30234, an Attachment package 30236, a Description package 30238, and an Item package 30240. The RFQ package 30206 also includes an RFQ entity 30244. There is a 1:1 relationship 30246 between the RFQMessage entity 30208 and the RFQ entity 30244.

The RFQ entity 30244 is a request (or a change to a request) from a buyer to a bidder to submit a quotation for the products (goods or services) specified in the RFQ. In addition to the buying party and the bidder, additional parties can be involved in the RFQ entity 30244 (see Party package 30222 below). The delivery location can also be specified (see Location package 30224 below). Delivery and payment terms are also agreed upon (see DeliveryInformation package 30226 and PaymentInformation package 30228 below). The RFQ entity 30244 can contain a reference to a Quote if the bidder has a question or if the buyer has changed the RFQ entity 30244 (see BusinessTransactionDocumentReference package 30232 and FollowUpBusinessTransactionDocumentReference package 30234 below). Notes or references to attachments can be specified for the RFQ (see Attachment package 30236 and Description package 30238 below). The RFQ entity 30244 is of type GDT: RFQ.

The RFQ entity 30244 includes an ID, a VersionID, a PostingDateTime, a LastChangeDateTime, a PublishDateTime, a DisplayDateTime, a BiddingStartDateTime, a QuoteSubmissionDateTime, a QuoteOpeningDateTime, a QuoteBindingDateTime, a ContractValidityDateTimePeriod, a Note, an RFQPublicIndicator, a QuoteChangeAllowedIndicator, a QuoteUnplannedItemPermissionCode, a QuotePriceBiddingCondition-Code, a QuoteQuantityBiddingConditionCode, a QuoteItemBiddingConditionCode, RequestedQuoteCurrencyCode, and a ContractTargetAmount. The ID is a unique identifier specified by the buyer for the RFQ. The ID is of type GDT: BusinessTransactionDocumentID. The VersionID is the unique identifier that the buyer assigns to the version fo a RFQ. The VersionID is of type GDT: VersionID.

The PostingDateTime is the creation date/time of the RFQ at the buyer. The PostingDateTime is of type GDT: DateTime, as are the following elements in this paragraph. The LastChangeDateTime is the date/time of the last change made to the RFQ by the buyer. The PublishDateTime is the date/time when the RFQ is sent. The DisplayDateTime is the date/time as of which the published RFQ is displayed on a tendering platform. The BiddingStartDateTime is the date/time as of which quotations can be submitted. The QuoteSubmissionDateTime is the date/time after the BiddingStartDateTime up to which quotations can be submitted. The QuoteOpeningDateTime is the date/time when the quotations are opened and displayed for the quotation comparison. The QuoteBindingDateTime is the date/time up to which bidders are bound to the quotations they have submitted.

The ContractValidityDateTimePeriod is the validity period of the contract that is to be assigned using the RFQ. The ContractValidityDateTimePeriod is of type GDT: DateTimePeriod. The Note is a short description or the title of the RFQ. It is generally used to provide the user with a simple method for searching for a particular RFQ. The Note is of type GDT: Note. The RFQPublicIndicator specifies whether the RFQ process is a closed RFQ process with bidders that have been explicitly invited or an open RFQ process in which bidders who have not been explicitly invited can also participate. The RFQPublicIndicator is of type GDT: BusinessTransactionDocumentPublicIndicator. The QuoteChangeAllowedIndicator is indicator that the buyer assigns to an RFQ to indicate whether the bidder may change quotes after they have been issued. In one implementation, "True" means that quotes may be changed and "False" means that only quotes that have not been changed are valid. The QuoteChangeAllowedIndicator is of type GDT: AllowedIndicator. The QuoteUnplannedItem-PermissionCode specifies whether the bidder's quotation is allowed to contain own items with alternative quotations. The QuoteUnplannedItemPermissionCode is of type GDT: UnplannedItemPermissionCode. The QuotePriceBiddingConditionCode specifies whether the bidder is allowed to specify pricing information. If the RFQ is used to check the bidder's ability to meet certain technical requirements, for example, prices might not be required. The QuoteQuantityBiddingConditionCode specifies whether the bidder is allowed to enter in the quotation a quantity other than the requested quantity. The QuoteItemBiddingConditionCode specifies whether the bidder has to submit a quotation for all items. The QuotePriceBidding-ConditionCode and QuoteItemBiddingConditionCode are of type GDT: BiddingConditionCode. The ContractTargetAmount is the target amount in contractual negotiations. The ContractTargetAmount is of type GDT: Amount. The RequestedQuoteCurrencyCode is the currency that the buyer defines in the RFQ. The bidder's quote must be in this currency. The RequestedQuoteCurrencyCode is of type GDT: CurrencyCode.

The ContractTargetAmount in the QuoteNotification is information provided to the buyer by the bidder. The ContractTarget-Amount is used if a contract is to be negotiated and assigned using an RFQ. Differences between the RFQ-ContractTargetAmount and the QuoteContractTargetAmount are allowed and are subject to the business framework of the negotiation process as defined by the buyer and bidder. There are no dependencies between how the ContractTargetAmount is used at header and/or item level. The bidder decides which information to supply to the buyer.

(ii) RFQ Party Package

The Party package 30222 groups together the business parties that occur in one of the RFQ messages. The party package 30222 includes a BuyerParty entity 30248, a BidderParty entity 30250, a BidderPortalProviderParty entity 30252, a ProductRecipientParty entity 30254, a VendorParty entity 30256, a ManufacturerParty entity 30258, and a PayerParty entity 30260. There is a respective 1:c relationship 30262, 30264, 30266, 30268, 30270, 30272, and 30274 between the RFQ entity 30244 and the BuyerParty entity 30248, the BidderParty entity 30250, the BidderPortalProviderParty entity 30252, the ProductRecipientParty entity 30254, the VendorParty entity 30256, the ManufacturerParty entity 30258, and the PayerParty entity 30260.

In one implementation, either the ID or the ID and address can be transferred for each party. If the ID is transferred, the ID address defined in the master data is used. If the ID and address are transferred, the ID identifies the party and the address is deemed to be a document address that is different to the master data address. The ID and address may be sent to avoid misunderstandings. The receiving application may implement a suitable optimization strategy to ensure that the system does not create many identical document addresses.

A default logic is used for the parties: from the header to the items and within item hierarchies. Parties specified in the header are used for the items for which a corresponding party is not explicitly transferred and that are directly assigned to the header. In accordance with the same logic, parties transferred at item level are used for subitems assigned to the relevant item in an item hierarchy. The default logic is used for the party as a whole, including the contact person. In one implementation, parts of a party specified at header level or for a hierarchy item cannot be specified in more detail at item level. The default logic may be a simplified version of the transferred message. As regards logic, parties at header level and for hierarchy items behave as if they have been explicitly transferred for the subitems of the message. This also means that if changed items are transmitted rather than all items, the parties are used for the transmitted items. Changes made to parties also apply to items relevant for the party in question.

A BuyerParty is a party that buys goods or services. The BuyerParty entity 30248 is of type GDT: BusinessTransactionParty. The same BuyerParty entity 30248 is used for all the items in an RFQ in one implementation. The BuyerParty is not changed once an RFQ has been created. Changes can be made to the BuyerParty/Contact entity and a different BuyerParty/Contact entity is permitted for each item. Changes can be made to the address of the BuyerParty, but different addresses are not permitted for each item. If a ProductRecipientParty is not explicitly specified in an RFQ process, the BuyerParty is also used as the ProductRecipientParty. If a ProductRecipientParty and ShipToLocation are not explicitly specified in the RFQ process, the BuyerParty address is also used as the ship-to address. If a PayerParty is not explicitly specified in an RFQ process, the BuyerParty is also used as the PayerParty.

The BuyerParty entity 30248 includes an Address entity 30276 and a Contact entity 30278. There is a 1:c relationship 30280 between the BuyerParty entity 30248 and the Address entity 30276, and there a 1:c relationship 30282 between the BuyerParty entity 30248 and Contact entities 30278. The Address entity 30276 includes a PersonName entity 30284, an Office entity 30286, a PhysicalAddress entity 30288, a GeoCoordinates entity 30290 and a Communication entity 30292. There is a respective 1:c relationship 30294, 30296, 30298, 30200A, and 30202A between the Address entity 30276 and the PersonName entity 30284, the Office entity 30286, the PhysicalAddress entity 30288, the GeoCoordinates entity 30290 and the Communication entity 30292.

The Contact entity 30278 includes an Address entity 30204A. There is a 1:c relationship 30205A between the Contact entity 30278 and the Address entity 30204A. The Address entity 30204A includes a PersonName entity 30206A, an Office entity 30208A, a PhysicalAddress entity 30210A, a GeoCoordinates entity 30212A, and a Communication entity 30214A. There is a respective 1:c relationship 30216A, 30218A, 30220A, 30222A, and 30224A between the Address entity 30204A and the PersonName entity 30206A, the Office entity 30208A, the PhysicalAddress entity 30210A, the GeoCoordinates entity 30212A, and the Communication entity 30214A.

The BidderParty is a party that bids for goods or services. The BidderParty entity 30250 is of type GDT: BusinessTransactionDocumentParty. The same BidderParty entity 30250 may be used for all the items in an RFQ. The BidderParty entity 30250 is not changed once an RFQ has been created. Changes can be made to the BidderParty/Contact entity and a different BidderParty/Contact entity is permitted for each item. Changes can be made to the address of the BidderParty, but different addresses are not permitted for each item. If a VendorParty is not explicitly specified in an RFQ process, the BidderParty is also used as the VendorParty. If a VendorParty and ShipFromLocation are not explicitly specified in an RFQ process, the address of the BidderParty is used as the ship-from address for the material items. The BidderParty entity 30250 includes the same elements as that described above for the BuyerParty entity 30248, as denoted by ellipses 30226A.

A BidderPortalProviderParty is a party that runs a portal that brings business partners together for a business transaction. The BidderPortalProviderParty entity 30252 is of type GDT: BusinessTransactionDocumentParty. The BidderPortalProviderParty entity 30252 is explicitly specified if an RFQ is to be sent to a public tendering platform. The BidderPortalProviderParty entity 30252 includes the same elements as that described above for the BuyerParty entity 30248, as denoted by ellipses 30228A.

The ProductRecipientParty is the party to which goods are delivered or for whom services are provided. The ProductRecipientParty entity 30254 is of type GDT: BusinessTransactionDocumentParty. If a ShipToLocation is not explicitly specified in an RFQ process, the ProductRecipientParty entity 30254 address is used as the ship-to address. The ProductRecipientParty is not synonymous with the ShipToLocation and should be used when the ProductRecipientParty (company or person) is different than the BuyerParty. The ProductRecipientParty entity 30254 includes the same elements as that described above for the BuyerParty entity 30248, as denoted by ellipses 30230A.

A VendorParty is a party that delivers goods or provides services. The VendorParty entity 30256 is of type GDT: BusinessTransactionDocumentParty. If a ShipFromLocation is not explicitly specified in an RFQ process, the address of the VendorParty entity 30256 is used as the ship-from address for the material items. The VendorParty entity 30256 is not the company or person that is responsible for transporting the goods. The CarrierParty entity is responsible for this; however, this party is not typically used in the RFQ interfaces. The VendorParty is not synonymous with the ShipFromLocation and should be used when the VendorParty (company or person) is actually different than the BidderParty. The VendorParty entity 30256 includes the same elements as that described above for the BuyerParty entity 30248, as denoted by ellipses 30232A.

A ManufacturerParty is a party that manufactures goods. The ManufacturerParty entity 30258 is of type GDT: BusinessTransactionDocumentParty. The ManufacturerParty entity 30258 can be used for material items. With regard to the ManufacturerParty entity 30258, the default logic (from header to item to subitems) is used for material items; for other items, the ManufacturerParty entity 30258 is ignored. The ManufacturerParty entity 30258 can be used to uniquely define the context of a ManufacturerProductID entity. The ManufacturerParty entity 30258 includes the same elements as that described above for the BuyerParty entity 30248, as denoted by ellipses 30234A.

A PayerParty is a party that pays for goods or services. The PayerParty entity 30260 is of type GDT: BusinessTransactionDocumentParty. The PayerParty is used for the ContractPayer. The ContractPayer is the party paying for contractual negotiations. The PayerParty entity 30260 includes the same elements as that described above for the BuyerParty entity 30248, as denoted by ellipses 30236A.

(iii)RFQ Location Package

A Location package 30224 groups together the locations that can occur in one of the RFQ messages. The Location package 30224 includes a ShipToLocation entity 30238A. There is a 1:c relationship 30240A between the RFQ entity 30244 and the ShipToLocation entity 30238A. The ShipToLocation entity 30238A includes an Address entity 30242A. There is a 1:c relationship 30244A between the ShipToLocation entity 30238A and the Address entity 30242A.

A similar default logic to that used for Parties is also used for locations. In one implementation, either the ID or the address, or both can be transferred to each location. If the ID is transferred, the ID address defined in the master data is used. If the address is transferred, it is this address that is used (if necessary, a location is assigned at the address recipient). If the ID and address are transferred, the ID identifies the location and the address is deemed to be a document address that is different to the master data address. The ID and address may be sent to avoid misunderstandings. The receiving application should implement a suitable optimization strategy to ensure that the system does not create many identical document addresses.

The ShipToLocation is the location to which goods are to be delivered or where services are to be provided. The ShipToLocation entity 30238A is of type GDT: BusinessTransaction-DocumentLocation.

The Address entity 30242A includes a PersonName entity 30246A, an Office entity 30248A, a PhysicalAddress entity 30250A, a GeoCoordinates entity 30252A, and a Communication entity 30254A. There is a respective 1:c relationship 30256A, 30258A, 30260A, 30262A, and 30264A between the Address entity 30242A and the PersonName entity 30246A, the Office entity 30248A, the PhysicalAddress entity 30250A, the GeoCoordinates entity 30252A, and the Communication entity 30254A.

(iv) RFQ Delivery Information Package

A DeliveryInformation package 30226 groups together the information about a required delivery in an RFQ process. The DeliveryInformation package 30226 includes a DeliveryTerms entity 30266A. There is a 1:c relationship 30268A between the RFQ entity 30244 and the DeliveryTerms entity 30266A.

The DeliveryTerms is the condition and agreement that is valid for executing the delivery and transporting the tendered goods and for the necessary services and activities. The DeliveryTerms entity 30266A is type GDT: DeliveryTerms. It includes an Incoterms entity 30270A. There is a 1:c relationship 30272A between the DeliveryTerms entity 30266A and the Incoterms entity 30270A. The Incoterms is allowed to be used for material items. The default logic takes the Incoterms entity into account for material items. For other items, Incoterms may be ignored.

(v) RFQ Payment Information Package

A PaymentInformation package 30228 groups together the payment information in an RFQ process. The PaymentInformation package 30228 includes a CashDiscountTerms entity 30274A and a PaymentForm entity 30276A. There is a 1:c relationship 30278A between the RFQ entity 30244 and the CashDiscountTerms entity 30274A, and a 1:c relationship 30280A between the RFQ entity 30244 and the PaymentForm entity 30276A.

The CashDiscountTerms is the term of payment in an RFQ process. The CashDiscountTerms entity 30274A is type GDT: CashDiscountTerms.

A PaymentForm is the payment form together with the data required. The PaymentForm entity 30276A includes a PaymentFormCode, which is the coded representation of the payment form. The PaymentFormCode is of type GDT: PaymentFormCode.

(vi) RFQ Price Information Package

The PriceInformation package 30239 groups together all price information in a quotation item. It contains a PriceSpecification Element 30203B. The PriceInformation package 30239 for an RFQ item contains only prices; it does not contain any information about how the prices are calculated (pricing scales, and so on).

(vii) RFQ Product Information Package

The ProductInformation package 30230 groups together the product category. The ProductInformation package 30230 includes a ProductCategory entity 30282A. There is a 1:c relationship 30284A between the RFQ entity 30244 and the ProductCategory entity 30282A.

The ProductCategory includes the details about a product category as generally understood from a commercial point of view in business transaction documents. The ProductCategory entity 30282A includes details for identifying the product category using an internal ID, a standard ID, and IDs assigned by involved parties. The ProductCategory entity 30282A is of type GDT: BusinessTransactionDocument-ProductCategory. The product category at header level can be used to classify the RFQ and provide the bidders with an initial indication of what is involved in the RFQ. The product category can differ between the buyer and seller.

(viii) RFQ Business Transaction Document Reference Package

The BusinessTransactionDocumentReference package 30232 groups together business document references that can occur in one of the RFQ messages. The BusinessTransaction-DocumentReference package 30232 includes a QuoteReference entity 30286A. There is a 1:c relationship 30288A between the RFQ entity 30244 and the QuoteReference entity 30286A.

A QuoteReference is a reference to a quotation. The QuoteReference entity 30286A is of type GDT: BusinessTransactionDocument-Reference.

In one implementation, a QuoteReference can reference one quotation, that is, one ID is permissible. As far as the referenced quotation is concerned, there are no conflicts with a QuoteReference at item level. If a reference is used at both header and item level, it refers to one (the same) quotation.

The reference to a quotation is required at both header and item level, since RFQs do not always have item data. The QuoteReference is used when questions and answers are exchanged between the bidder and buyer and if the RFQ is changed.

(ix) RFQ Follow-Up Business Transaction Document Package

A FollowUpBusinessTransactionDocument package 30234 groups together the information about which business transaction documents the buyer is expecting as a result of the RFQ process. The FollowUpBusinessTransactionDocument entity 30234 includes a FollowUpPurchaseOrder entity 30290A and a FollowUpPurchaseContract entity 30292A. There is a 1:c relationship 30294A between the RFQ entity 30244 and the FollowUpPurchaseOrder entity 30290A, and a 1:c relationship 30296A between the RFQ entity 30244 and the FollowUpPurchaseContract entity 30292A. In the FollowUpBusinessTransactionDocument package 30234, the buyer provides the bidders with information about whether the RFQ is to result in a contract or a purchase order. However, the buyer can also leave this open by not providing any information.

The FollowUpPurchaseOrder provides information about whether the buyer expects a purchase order as a result of the RFQ process. The FollowUpPurchaseOrder entity 30290A includes a RequirementCode, which is a coded representation of information about whether the buyer expects a purchase order as a result of the RFQ process. The RequirementCode is of type GDT: FollowUpBusinessTransaction-DocumentRequirementCode. The RequirementCode entity can be changed by the buyer.

The FollowUpPurchaseContract provides information about whether the buyer expects a contract as the result of the RFQ process. The FollowUpPurchaseContract entity 30292A includes a RequirementCode, which is a coded representation of information about whether the buyer expects a contract as a result of the RFQ process. The RequirementCode is of type GDT: FollowUpBusinessTransaction-DocumentRequirementCode. The RequirementCode can be changed by the buyer.

(x) RFQ Attachment Package

The Attachment package 30236 groups together the attachment information regarding the RFQ. The Attachment package 30236 includes an Attachment entity 30298A. The Attachment is any document that refers to the RFQ. The Attachment entity 30298A is of type GDT: Attachment. There is a 1:c relationship 30200B between the RFQ entity 30244 and the Attachment entity 30298A.

(xi) RFQ Description Package

The Description package 30238 groups together the texts regarding the RFQ. The Description package 30238 includes a Description entity 30202B. The Description is a natural-language text regarding the RFQ, which is visible to parties. The Description entity 30202B is of type GDT: Description. There is a 1:c relationship 30203B between the RFQ entity 30244 and the Description entity 30202B.

The Description can be used for textual information about the transferred RFQ and not just the current message. An example of this would be information stating that the employee responsible in Purchasing will be on vacation as of a specific date, and indicating the name and telephone number of a substitute as of this date. The Description can also be used for communication between the buyer and bidder in order to process queries, for example. In the case of a public tendering platform, measures are taken to ensure that individual communications with individual bidders, which contain explanatory information about the RFQ, are also made available to other RFQ participants. This is ensured by sending a copy of the description to the tendering platform, where it is published.

(xii) RFQ Item Package

An RFQItem package 30240 includes a ProductInformation package 30204B, a Party package 30206B, a Location package 30208B, a DeliveryInformation package 30210B, a BusinessTransactionDocumentReference package 30212B, an Attachment package 30214B, a Description package 30216B, a PartyInforamation Package 30217B, and a ScheduleLine package 30218B. The Item package 30240 also includes an RFQItem entity 30220B. There is a 1:cn relationship 30222B between the RFQ entity 30244 and the RFQItem entity 30220B. RFQItem entities are arranged hierarchically using a Hierarchy Relationship 30224B. The Hierarchy Relationship 30224B is the relationship between a sub-item and a higher-level parent item in an item hierarchy. There is a 1:cn relationship 30226B between the RFQItem entity 30220B and its subordinate entities, and there is a 1:c relationship 30228B between the RFQItem entity 30220B and its superordinate entities.

The RFQItem specifies a product tendered by an RFQ with additional information on such a product. The RFQItem entity 30220B includes detailed information about a particular product (see ProductInformation package 30204B). The quantity of the product and (delivery) dates/times are specified in the schedule line. For the RFQItem (compared to the information of the RFQ), deviating parties, locations, and delivery terms can be defined (see Party package 30206B, Location package 30208B, and DeliveryInformation package 30210B). The RFQItem can contain references to other business documents that are relevant for the item (see BusinessTransactionDocumentReference package 30212B). Notes or references to attachments can also be specified for the RFQItem (see Attachment package 30214B and Description package 30216B). The RFQItem entity 30220B is of type GDT: RFQItem.

The RFQItem entity 30220B includes an ID and a ContractTargetAmount. The ID is a unique identifier specified by the buyer for an item within an RFQ. The ID is of type GDT: BusinessTransactionDocumentItemID. The ContractTargetAmount is the target amount in contractual negotiations. The ContractTargetAmount is of type GDT: Amount.

A HierarchyRelationship 30224B includes a ParentItemBuyerID, a ParentItemVendorID, and a TypeCode. The ParentItemBuyerID is the reference to a parent item with the item number assigned by the buyer. The ParentItemBuyerID is of type GDT: BusinessTransactionDocumentItemID. The ParentItemVendorID is the reference to a parent item with the item number assigned by the seller. The ParentItemVendorID is of type GDT: BusinessTransactionDocumentItemID. The TypeCode represents the hierarchical relationship between the subitem and its higher-level parent item. The TypeCode is of type GDT: BusinessTransactionDocumentItemHierarchyRelationshipTypeCode. The ParentItemBuyerID, ParentItemVendorID and TypeCode are generally not changed once an item has been created. Either the ParentItemBuyerID or the ParentItemVendorID is specified.

(a) RFQ Item Product Information Package

A ProductInformation package 30204B groups together the product and the product category. The ProductInformation package 30204B includes a Product entity 30230B and a ProductCategory entity 30232B. There is a 1:c relationship 30234B between the Item entity 30220B and the Product entity 30230B, and a 1:c relationship 30236B between the Item entity 30220B and the ProductCategory entity 30232B.

A Product includes the details about a product as generally understood from a commercial point of view in business documents. These are the details for identifying a product and product type, and the description of the product. The Product entity 30230B is of type GDT: BusinessTransactionDocumentProduct.

A ProductCategory includes the details about a product category as generally understood from a commercial point of view in business transaction documents. The ProductCategory entity 30232B includes details for identifying the product category using an internal ID, a standard ID, and IDs assigned by involved parties. The ProductCategory entity 30232B is of type GDT: BusinessTransaction-DocumentProductCategory. The product category is derived directly from the product if a product number is specified for the product. It can differ for the buyer and seller if they have classified the same product differently. This is allowed and should be tolerated by the systems involved. The product category at item level can differ from the product category at header level.

(xiii) RFQ Price Information Package

The PriceInformation package 30217B groups together all price information in a quotation item. It contains a PriceSpecification Element 30208C. The PriceInformation package 30217B for an RFQ item contains only prices; it does not contain any information about how the prices are calculated (pricing scales, and so on).

(a) RFQ Item Party Package

The Party package 30206B groups together the business parties that can occur in one of the RFQ messages at the item level and represents part of the Party package 30222 at the header level. The party package 30206B includes a BuyerParty entity 30238B, a BidderParty entity 30240B, a ProductRecipientParty entity 30242B, a VendorParty entity 30244B, and a ManufacturerParty entity 30246B. There is a respective 1:c relationship 30248B, 30250B, 30252B, 30254B, and 30256B between the Item entity 30220B and the BuyerParty entity 30238B, the BidderParty entity 30240B, the ProductRecipientParty entity 30242B, the VendorParty entity 30244B, and the ManufacturerParty entity 30246B. Each of the BuyerParty entity 30238B, the BidderParty entity 30240B, the ProductRecipientParty entity 30242B, the VendorParty entity 30244B, and the ManufacturerParty entity

30246B includes the same elements as that described above for the BuyerParty entity 30248 as denoted by ellipses 30258B, 30260B, 30262B, 30264B, and 30266B.

(b) RFQ Item Location Package

Similar to the Location package 30224 at the header level, the Location package 30208B at the item level includes a ShipToLocation entity 30268B. There is a 1:c relationship 30270B between the Item entity 30220B and the ShipToLocation entity 30268B. The ShipToLocation entity 30268B includes the same elements as that described above for the ShipToLocation entity 30238A as denoted by ellipses 30272B.

(c) RFQ Item Delivery Information Package

Similar to the DeliveryInformation package 30226 at the header level, the DeliveryTerms package 30210B at the item level includes a DeliveryTerms entity 30274B. There is a 1:c relationship 30276B between the Item entity 30220B and the DeliveryTerms entity 30274B. The DeliveryTerms contains a MaximumLeadTimeDuration, which is the maximum lead time from the time of the order to the receipt of the delivery. This duration can be agreed in RFQs or contractual negotiations and represents the basis (that is binding) for the calculation of the received delivery date for an order date. The MaximumLeadTimeDuration is of type GDT: Duration.

The DeliveryTerms entity 30274B includes an Incoterms entity 30278B. There is a 1:c relationship 30280B between the DeliveryTerms entity 30274B and the Incoterms entity 30278B.

(d) RFQ Item Business Transaction Document Reference Package

The BusinessTransactionDocumentReference package 30212B groups together the business document references that can occur in one of the RFQ messages. The BusinessTransaction-DocumentReference package 30212B includes a QuoteReference entity 30282B, a PurchaseContractReference entity 30284B, and a BuyerProductCatalogueReference entity 30286B. There is a respective 1:c relationship 30288B, 30290B, and 30292B between the Item entity 30220B and the QuoteReference entity 30282B, the PurchaseContractReference entity 30284B, and the BuyerProductCatalogueReference entity 30286B.

A QuoteReference is a reference to the quotation or the item within the quotation. The QuoteReference entity 30282B is of type GDT: BusinessTransactionDocumentReference. In one implementation, a QuoteReference entity 30282B can reference one item, that is, one ItemID is permissible. As far as the referenced quotation is concerned, there are no conflicts with a QuoteReference entity 30286A at the header level. If a quotation reference is maintained at both the header and item levels, it refers to one (the same) quotation.

The PurchaseContractReference is a reference to a purchase contract or item in a purchase contract. The PurchaseContractReference entity 30284B is of type GDT: BusinessTransaction-DocumentReference. In one implementation, a PurchaseContractReference entity 30284B can reference one item, that is, one ItemID is permissible. Unless otherwise agreed, the seller is responsible for determining the correct PurchaseContractReference for a specified SellerContractReference.

A BuyerProductCatalogueReference is a reference to the buyer's product catalog or an item within the buyer's product catalog. The BuyerProductCatalogueReference entity 30286B is of type GDT: CatalogueReference. In one implementation, a BuyerProductCatalogueReference entity 30286B can reference one item, that is, one ItemID is permissible. The BuyerProductCatalogueReference entity 30286B should be filled if an RFQItem entity 30220B refers to a catalog whose number and item numbers were assigned by the buyer. In the RFQ process, the BuyerProductCatalogueReference entity 30286B can be used as a substitute product number if the product is defined in a catalog rather than having its own master record.

(e) RFQ Item Attachment Package

The RFQItemAttachment package 30214B includes an Attachment entity 30294B. There is a 1:c relationship 30296B between the Item entity 30220B and the Attachment entity 30294B.

(f) RFQ Item Description Package

The RFQItemDescription package 30216B includes a Description entity 30298B. There is a 1:c relationship 30200C between the Item entity 30220B and the Description entity 30298B.

(g) RFQ Item Schedule Line Package

The ScheduleLine package 30218B groups together the quantity and date information about an RFQItem. The ScheduleLine package 30218B includes a ScheduleLine entity 30202C. There is a 1:c relationship 30204C between the Item entity 30220B and the ScheduleLine entity 30202C.

A ScheduleLine is a line containing the quantity and date of the performance schedule requested by the buyer in an RFQ. The ScheduleLine entity 30202C is of type GDT: RFQItem-ScheduleLine. The ScheduleLine entity 30202C includes a DeliveryPeriod entity 30206C. There is a 1:1 relationship 30208C between the ScheduleLine entity 30202C and the DeliveryPeriod entity 30206C.

The ScheduleLine entity 30202C includes an ID, a DeliveryPeriod, and a Quantity. The ID is the ScheduleLine number assigned by the procurement system. The ID is of type GDT: BusinessTransactionDocumentItemScheduleLineID. The DeliveryPeriod is the period in which the buyer expects a product to be delivered or service provided. The DeliveryPeriod is of type GDT: DateTimePeriod. The Quantity is the RFQ quantity or the target quantity in contractual negotiations. The Quantity is of type GDT: Quantity.

In one implementation, one ScheduleLine is allowed for each RFQ item. When used more than once, the information in the ScheduleLine and DeliveryInformation is consistent (for example, if used twice, the delivery date is identical in both cases). The ID is optional; a procurement system does not have to number the ScheduleLine entities.

(3) Message Data Type RFQ Cancellation Message

The message data type RFQCancellationMessage groups together the business information relevant for sending a business document in a message and the RFQCancellation object in the document. As depicted in FIG. 303, the RFQMessage package 30302 includes a MessageHeader package 30304, an RFQCancellation package 30306, and an RFQCancellationMessage entity 30308. The message data type RFQCancellationMessage makes the structure available for the message type RFQCancellationRequest and the relevant interfaces.

(a) Message Header Package

The MessageHeader package 30304 includes a MessageHeader entity 30310. There is a 1:1 relationship 30312 between the RFQCancellationMessage entity 30308 and the MessageHeader entity 30310. The MessageHeader entity 30310 includes a SenderParty entity 30314 and a RecipientParty entity 30316. There is a 1:c relationship 30318 between the MessageHeader entity 30310 and the SenderParty entity 30314. There is a 1:cn relationship 30320 between the MessageHeader entity 30310 and the RecipientParty entity 30316.

(b) RFQ Cancellation Package

The RFQCancellation package 30306 groups together the RFQCancellations. The RFQCancellation is a cancellation of an RFQ from a buyer to a bidder.

The RFQCancellation package 30306 includes an RFQ-Cancellation entity 30322. There is a 1:1 relationship 30324 between the RFQCancellationMessage entity 30308 and the RFQCancellation entity 30322. The RFQCancellation entity 30322 is of type GDT: RFQCancellation. The RFQCancellation entity 30322 includes an ID, which is a unique identifier specified by the buyer for the RFQ. The ID is of type GDT: BusinessTransactionDocumentID.

(4) Message Data Type Quote Message

The message data type QuoteMessage groups together the business information relevant for sending a business document in a message and the Quote object in the document. As depicted in FIG. 304, the QuoteMessage package 30402 includes a MessageHeader package 30404, a Quote package 30406, and a QuoteMessage entity 30408. The message data type QuoteMessage makes the structure available for the message type QuoteNotification and the relevant interfaces.

(a) Message Header Package

The MessageHeader package 30404 includes a MessageHeader entity 30410. There is a 1:1 relationship 30412 between the QuoteMessage entity 30408 and the MessageHeader entity 30410. The MessageHeader entity 30410 includes a SenderParty entity 30414 and a RecipientParty entity 30416. There is a 1:c relationship 30418 between the MessageHeader entity 30410 and the SenderParty entity 30414. There is a 1:cn relationship 30420 between the MessageHeader entity 30410 and the RecipientParty entity 30416.

(b) Quote Package

The Quote package 30406 includes a Party package 30422, a Location package 30424, a DeliveryInformation package 30426, a PaymentInformation package 30428, a ProductInformation package 30430, a PriceSpecification package 30435, a BusinessTransactionDocumentReference package 30432, an Attachment package 30434, a Description package 30436, and an Item package 30438. The Quote package 30406 also includes a Quote entity 30440. There is a 1:1 relationship 30442 between the QuoteMessage entity 30408 and the Quote entity 30440.

The Quote is a quotation submitted by a bidder to a buyer in response to an RFQ issued for a product by the buyer. The Quote entity 30440 is subdivided into QuoteItems, which contain the concrete quotation submitted by the bidder with reference to the relevant item in the buyer's RFQ. The structure of the packages in the Quote is the same as the structure of the packages in the RFQ. The Quote entity 30440 is of type GDT: Quote. The Quote entity 30440 includes an ID, a PostingDateTime, a LastChangeDateTime, a BindingDateTime, a Note, and a ContractTargetAmount. The ID is a unique identifier specified by the buyer for the quotation. The ID is of type GDT: BusinessTransactionDocumentID. The PostingDateTime is the creation date/time of the quotation at the bidder. The PostingDateTime is of type GDT: DateTime. The LastChangeDateTime is the date/time of the last change made to the quotation by the bidder. The LastChangeDateTime is of type GDT: DateTime. The BindingDateTime is the date/time up to which bidders are bound to the quotations they have submitted. The BindingDateTime is of type GDT: DateTime. The Note is a short description or the title of the quotation. It is generally used to provide the user with a simple method for searching for a particular quotation. The Note is of type GDT: Note. The ContractTargetAmount is the target amount in contractual negotiations. The ContractTargetAmount is of type GDT: Amount. In one implementation, the Quote entity 30440 is used as a quotation from a bidder who has taken the initiative to submit a quotation without an RFQ being issued beforehand.

(i) Quote Party Package

The Party package 30422 groups together the business parties that occur in one of the Quote messages. The Party package 30422 includes a BuyerParty entity 30444, a BidderParty entity 30446, a BidderPortalProviderParty entity 30448, a ProductRecipientParty entity 30450, a VendorParty entity 30452, a ManufacturerParty entity 30454, and a PayerParty entity 30456. There is a respective 1:c relationship 30458, 30460, 30462, 30464, 30466, 30468, and 30470 between the Quote entity 30440 and the BuyerParty entity 30444, the BidderParty entity 30446, the BidderPortalProviderParty entity 30448, the ProductRecipientParty entity 30450, the VendorParty entity 30452, the ManufacturerParty entity 30454, and the PayerParty entity 30456.

The BuyerParty entity 30444 includes an Address entity 30472 and a Contact entity 30474. There is a 1:c relationship 30476 between the BuyerParty entity 30444 and the Address entity 30472, and a 1:c relationship 30478 between the BuyerParty entity 30444 and the Contact entity 30474.

The Address entity 30472 includes a PersonName entity 30480, an Office entity 30482, a PhysicalAddress entity 30484, a GeoCoordinates entity 30486, and a Communication entity 30488. There is a respective 1:c relationship 30490, 30492, 30494, 30496, and 30498 between the Address entity 30472 and the PersonName entity 30480, the Office entity 30482, the PhysicalAddress entity 30484, the GeoCoordinates entity 30486, and the Communication entity 30488.

The Contact entity 30474 includes an Address entity 30400A. There is a 1:c relationship 30402A between the Contact entity 30474 and the Address entity 30400A.

The Address entity 30400A includes a PersonName entity 30404A, an Office entity 30406A, a PhysicalAddress entity 30408A, a GeoCoordinates entity 30410A, and a Communication entity 30412A. There is a respective 1:c relationship 30414A, 30416A, 30418A, 30420A, and 30422A between the Address entity 30400A and the PersonName entity 30404A, the Office entity 30406A, the PhysicalAddress entity 30408A, the GeoCoordinates entity 30410A, and the Communication entity 30412A.

Each of the BidderParty entity 30446, the BidderPortalProviderParty entity 30448, the ProductRecipientParty entity 30450, the VendorParty entity 30452, the ManufacturerParty entity 30454, and the PayerParty entity 30456 includes the same elements as that described above for the BuyerParty entity 30444, as denoted by ellipses 30424A, 30426A, 30428A, 30430A, 30432A, and 30434A.

(ii) Quote Location Package

A Location package 30424 groups together the locations that can occur in one of the Quote messages. The Location package 30424 includes a ShipToLocation entity 30436A. There is a 1:c relationship 30438A between the Quote entity 30440 and the ShipToLocation entity 30436A. The ShipToLocation entity 30436A includes an Address entity 30440A. There is a 1:c relationship 30442A between the ShipToLocation entity 30436A and the Address entity 30440A.

The Address entity 30440A includes a PersonName entity 30444A, an Office entity 30446A, a PhysicalAddress entity 30448A, a GeoCoordinates entity 30450A, and a Communication entity 30452A. There is a respective 1:c relationship 30454A, 30456A, 30458A, 30460A, and 30462A between the Address entity 30440A and the PersonName entity 30444A, the Office entity 30446A, the PhysicalAddress entity 30448A, the GeoCoordinates entity 30450A, and the Communication entity 30452A.

(iii) Quote Delivery Information Package

A DeliveryInformation package 30426 groups together the information about a required delivery in a Quote process. The DeliveryInformation package 30426 includes a DeliveryTerms entity 64A. There is a 1:c relationship 30466A between the Quote entity 30440 and the DeliveryTerms entity 30464A.

The DeliveryTerms entity 30464A includes an Incoterms entity 30468A. There is a 1:c relationship 30470A between the DeliveryTerms entity 30464A and the Incoterms entity 30468A.

(iv) Quote Payment Information Package

A PaymentInformation package 30428 groups together the payment information in a Quote process. The PaymentInformation package 30428 includes a CashDiscountTerms entity 30472A and a PaymentForm entity 30474A. There is a 1:c relationship 30476A between the Quote entity 30440 and the CashDiscountTerms entity 30472A, and a 1:c relationship 30478A between the Quote entity 30440 and the PaymentForm entity 30474A.

(v) Quote Price Information package

The PriceInformation package 30435 groups together all price information in a quotation item. It contains a PriceSpecification Element 30493A. The PriceInformation package 30435 for an RFQ item contains only prices; it does not contain any information about how the prices are calculated (pricing scales, and so on).

(vi) Quote Product Information Package

The ProductInformation package 30430 groups together the product category. The ProductInformation package 30430 includes a ProductCategory entity 30480A. There is a 1:c relationship 30482A between the Quote entity 30440 and the ProductCategory entity 30480A.

(vii) Quote Business Transaction Document Reference Package

The BusinessTransactionDocumentReference package 30432 groups together the business document references that can occur in the Quote message. The BusinessTransactionDocumentReference package 30432 includes an RFQReference entity 30484A. There is a 1:c relationship 30486A between the Quote entity 30440 and RFQReference entity 30484A.

The RFQReference is a reference to a request for quotation or item in a request for quotation. The RFQReference entity 30484A is of type GDT: BusinessTransactionDocumentReference. In one implementation, an RFQReference entity 30484A can reference one RFQ, that is, one ID is permissible. As far as the referenced RFQ is concerned, there are no conflicts with an RFQReference at the item level. If a reference is used at both the header and item levels, it refers to one (the same) RFQ.

In one implementation, the reference to an RFQ is required at both the header and item levels, since RFQs do not always have item data. Unless otherwise agreed, the bidder uses the RFQID assigned by the buyer.

(viii) Quote Attachment Package

The Attachment package 30434 groups together the attachment information regarding the Quote. The Attachment package 30434 includes an Attachment entity 30488A. The Attachment is any document that refers to the Quote. The Attachment entity 30488A is of type GDT: Attachment. There is a 1:cn relationship 30490A between the Quote entity 30440 and the Attachment entity 30488A.

(ix) Quote Description Package

The Description package 30436 groups together the texts regarding the Quote. The Description package 30436 includes a Description entity 30492A. The Description entity 30492A is of type GDT: Description. There is a 1:c relationship 30494A between the Quote entity 30440 and the Description entity 30492A.

(x) Quote Item Package

A QuoteItem package 30438 includes a QuoteItem entity 30496A. There is a 1:cn relationship 30498A between the Quote entity 30440 and the QuoteItem entity 30496A.

QuoteItem entities are arranged hierarchically using a Hierarchy Relationship 30400B. The Hierarchy Relationship 30400B is the relationship between a sub-item and a higher-level parent item in an item hierarchy. There is a 1:cn relationship 30402B between the Item entity 30496A and its subordinate entities, and there is a 1:c relationship 30404B between the Item entity 30496A and its superordinate entities.

The QuoteItem includes the bidder's quotation for a product tendered in an item of a request for quotation (RFQItem) or additional information about this product. Quantities and delivery dates can also be specified here. The structure is the same as the structure of the RFQItem. The QuoteItem entity 30496A is of type GDT: QuoteItem. The QuoteItem entity 30496A includes an ID and a ContractTargetAmount. The ID is a unique identifier specified by the buyer for a quotation item within an RFQ. The ID is of type GDT: BusinessTransactionDocumentItemID. The ContractTargetAmount is the target amount in contractual negotiations. The ContractTargetAmount is of type GDT: Amount.

The QuoteItem package 30438 also includes a ProductInformation package 30406B, a PriceInformation package 30408B, a Party package 30410B, a Location package 30412B, a DeliveryInformation package 30414B, a BusinessTransactionDocumentReference package 30416B, an Attachment package 30418B, a Description package 30420B, and a ScheduleLine package 30422B.

(a) Quote Item Product Information Package

A ProductInformation package 30406B groups together the product and the product category. The ProductInformation package 30406B includes a Product entity 30424B and a ProductCategory entity 30426B. There is a 1:c relationship 30428B between the Item entity 30496A and the Product entity 30424B, and a 1:c relationship 30430B between the Item entity 30496A and the ProductCategory entity 30426B.

(b) Quote Item Price Information Package

The PriceInformation package 30408B groups together all price information in a quotation item. It contains a PriceSpecification Element 30432B. The PriceInformation package 30408B for an RFQ item contains only prices; it does not contain any information about how the prices are calculated (pricing scales, and so on).

(c) Quote Item Party Package

The Party package 30410B includes a BuyerParty entity 30436B, a BidderParty entity 30438B, a ProductRecipientParty entity 30440B, a VendorParty entity 30442B, and a ManufacturerParty entity 30444B. There is a respective 1:c relationship 30446B, 30448B, 30450B, 30452B, and 30454B between the Item entity 30496A and the BuyerParty entity 30436B, the BidderParty entity 30438B, the ProductRecipientParty entity 30440B, the VendorParty entity 30442B, and the ManufacturerParty entity 30444B. Each of the BuyerParty entity 30436B, the BidderParty entity 30438B, the ProductRecipientParty entity 30440B, the VendorParty entity 30442B, and the ManufacturerParty entity 30444B includes the same elements as that described above for the BuyerParty entity 30444 as denoted by ellipses 30456B, 30458B, 30460B, 30462B, and 30464B. In one implementation, the Quote is used as a quotation from a bidder who has taken the initiative to submit a quotation without an RFQ being issued beforehand.

(d) Quote Item Location Package

Similar to the Location package 30224 at the header level, the Location package 30412B at the item level includes a ShipToLocation entity 30466B. There is a 1:c relationship 30468B between the Item entity 30496A and the ShipToLocation entity 30466B. The ShipToLocation entity 30488B includes the same elements as that described above for the ShipToLocation entity 36A as denoted by ellipses 30470B.

(e) Quote Item Delivery Information Package

Similar to the DeliveryInformation package 30426 at the header level, the DeliveryTerms package 30414B at the item level includes a DeliveryTerms entity 30472B. There is a 1:c relationship 30474B between the Item entity 30496A and the DeliveryTerms entity 30472B. The DeliveryTerms entity 30472B includes an Incoterms entity 30476B. There is a 1:c relationship 30478B between the DeliveryTerms entity 30472B and the Incoterms entity 30476B.

(f) Quote Item Business Transaction Document Reference Package

A BusinessTransactionDocumentReference package 30416B groups together the business document references that can occur in the QuoteNotification message. It includes an RFQReference entity 30480B. There is a 1:c relationship 30482B between the Item entity 30496A and the RFQReference entity 30480B.

An RFQReference is a reference to the RFQ or the item within the RFQ. The RFQReference entity 30480B is of type GDT: BusinessTransactionDocumentReference.

In one implementation, an RFQReference entity 30480B can reference one item, that is, one ItemID is permissible. As far as the referenced RFQ is concerned, there are no conflicts with an RFQReference at the header level. If an RFQ reference is maintained at both header and item level, it refers to one (the same) RFQ. Unless otherwise agreed, the bidder uses the RFQID and RFQItemID assigned by the buyer.

(g) Quote Item Attachment Package

The QuoteItemAttachment package 30418B includes an Attachment entity 30484B. There is a 1:c relationship 30486B between the Item entity 30496A and the Attachment entity 30484B.

(h) Quote Item Description Package

The QuoteItemDescription package 30420B includes a Description entity 30488B. There is a 1:c relationship 30490B between the Item entity 30496A and the Description entity 30488B.

(i) Quote Item Schedule Line Package

The QuoteItemScheduleLinePackage 30422B includes a ScheduleLine entity 30492B. There is a 1:c relationship 30494B between the Item entity 30496A and the ScheduleLine entity 30492B. The ScheduleLine entity 30492B includes a DeliveryPeriod entity 30496B. There is a 1:1 relationship 30498B between the ScheduleLine entity 30492B and the DeliveryPeriod entity 30496B.

(5) Message Data Type RFQ Result Message

The message data type RFQResultMessage groups together the business information relevant for sending a business document in a message and the RFQResult object in the document. As depicted in FIG. 305, the RFQResultMessage package 30502 includes a MessageHeader package 30504 and a RFQResult package 30506. The RFQResultMessage package 30502 also includes an RFQResultMessage entity 30508. The message data type RFQResultMessage makes the structure available for the message type RFQResultMessage and the relevant interfaces.

(a) Message Header Package

The MessageHeader package 30504 includes a MessageHeader entity 30510. There is a 1:1 relationship 30512 between the RFQResultMessage entity 30508 and the MessageHeader entity 30510. The MessageHeader entity 30510 includes a SenderParty entity 30514 and a RecipientParty entity 30516. There is a 1:c relationship 30518 between the MessageHeader entity 30510 and the SenderParty entity 30514, and a 1:cn relationship 30520 between the MessageHeader entity 30510 and the RecipientParty entity 30516.

(b) RFQ Result Package

The RFQResult package 30506 includes a Party package 30522, a Description package 30524, and an Item package 30526. The RFQResult package 30506 also includes an RFQResult entity 30528. There is a 1:1 relationship 30529 between the RFQResultMessage entity 30508 and the RFQResult entity 30528. The RFQResult is the acceptance or rejection of a bidder's quotation by the buyer. The RFQResult entity 30528 is of type GDT: RFQResult. The RFQResult entity 30528 includes an ID, which is a unique identifier specified by the buyer for the RFQ.

(i) RFQ Result Party Package

The Party package 30522 groups together the parties that can occur in one of the RFQResult messages. The Party package 30522 includes a BidderParty entity 30530. There is a 1:c relationship 30532 between the RFQResult entity 30528 and the BidderParty entity 30530.

A BidderParty is a party that bids for goods or services. The BidderParty entity 30530 is of type GDT: BusinessTransactionDocumentParty. The BidderParty entity 30530 is required for the RFQResult message if the result of the RFQ is to be published on a tendering platform. The configuration determines whether this scenario applies.

(ii) RFQ Result Description Package

The RFQ Result Description package 30524 includes a Description entity 30534. There is a 1:c relationship 30536 between the RFQResult entity 30528 and the Description entity 30534.

(iii) RFQ Result Item Package

The RFQResultItem package 30526 includes a BusinessTransactionDocumentReference package 30538 and a ScheduleLine package 30540. The RFQResultItem package 30526 also includes an RFQResultItem entity 30542. There is a 1:cn relationship 30544 between the RFQResult entity 30528 and the RFQResultItem entity 30542. RFQResultItem entities are arranged hierarchically using a Hierarchy Relationship 30546. The Hierarchy Relationship 30546 is the relationship between a sub-item and a higher-level parent item in an item hierarchy. There is a 1:cn relationship 30548 between the Item entity 30542 and its subordinate entities, and there is a 1:c relationship 30550 between the Item entity 30542 and its superordinate entities.

An RFQResultItem specifies the rejection or the extent of the acceptance of a bidder's quotation for a product of an RFQ item. The RFQResultItem entity 30542 is of type GDT: RFQResultItem. The RFQResultItem entity 30542 includes an ID, which is an identifier assigned by the buyer to an RFQ item. The identifier is unique within a particular RFQ. The ID is of type GDT: BusinessTransactionDocumentItemID.

(a) RFQ Result Item Business Transaction Document Reference Package

A BusinessTransactionDocumentReference package 30538 groups together the business document references that occur in one of the RFQResult messages. The BusinessTransactionDocumentReference package 30538 includes a QuoteReference entity 30552. There is a 1:c relationship 30554 between the Item entity 30542 and the QuoteReference entity 30552.

The QuoteReference is a reference to the quotation or the item within the quotation. The QuoteReference entity 30552 is of type GDT: BusinessTransactionDocumentReference. In one implementation, a QuoteReference entity 30552 can reference one item, that is, one ItemID is permissible.

(b) RFQ Result Item Schedule Line Package

The RFQResultItemScheduleLine Package 30540 includes a ScheduleLine entity 30558. There is a 1:c relationship 30560 between the Item entity 30542 and the ScheduleLine entity 30558. The ScheduleLine entity 30558 includes a DeliveryPeriod entity 30562. There is a 1:1 relationship 30564 between the ScheduleLine entity 30558 and the DeliveryPeriod entity 30562.

(6) Message Data Type Element Structure (a) Data Type RFQ Message

FIGS. 306A-O depict the element structure for RFQRequest and RFQChangeRequest. The element structure is similar to the data model, but provides additional information regarding the details of the interface. The element structure identifies the different packages 30600 in the interface, and represents the entities at various levels within the interface. As depicted in FIGS. 306A-O, the interface for RFQRequest and RFQChangeRequest includes six levels 30602, 30604, 30606, 30608, 30610, and 30612. The element structure identifies the cardinality or occurrence 30614 between the entities and/or attributes of the interface, and provides information (i.e., type 30616 and name 30618) regarding the data type that provides the basis for the entity and/or attribute. The outermost package of this interface is an RFQMessage package 30620, which includes an RFQMessage entity 30622 at the first level 30602. The RFQMessage entity 30622 is of type message data type ("MDT") 30624 "RFQMessage" 30626.

The RFQMessage package 30620 includes a MessageHeader package 30628 and an RFQ package 30630. The MessageHeader package 30628 includes a MessageHeader entity 30632, which is of type generic data type ("AGDT") 30636 "BusinessDocumentMessageHeader" 30638. There is one 30634 MessageHeader entity 30632 for each RFQMessage entity 30622.

The MessageHeader entity 30632 includes an ID 30640, a Reference ID 30648, and a CreationDateTime 30656. The ID 30640 is of type GDT 30644 BusinessDocumentMessageID 30646. The ReferenceID 30648 is of type GDT 30652 BusinessDocumentMessageID 30654. The CreationDateTime 30656 is of type GDT 30660 DateTime 30662. There is one 30642 ID 30640 for each MessageHeader entity 30632, one or zero 30650 ReferenceID 30648 for each MessageHeader entity 30632, and one 30658 CreationDateTime 30656 for each MessageHeader entity 30632.

The MessageHeader entity 30632 also includes a SenderParty entity 30664 and a RecipientParty entity 30628A. The SenderParty entity 30664 is of type AGDT 30668 BusinessDocumentMessageHeaderParty 30670. The RecipientParty entity 30628A is also of type AGDT 30632A BusinessDocumentMessageHeaderParty 30634A. There is one or zero 30666 SenderParty entity 30664 for each MessageHeader entity 30632, and there is any number 30630A of RecipientParty entities 30628A for each MessageHeader entity 30632.

The SenderParty entity 30664 includes an InternalID 30672, a StandardID 30680, and a ContactPerson 30688. The InternalID 30672 has zero or one occurrences 30674 for each SenderParty entity 30664 and a data type CDT 30676 of PartyInternalID 30678. The StandardID 30680 has any number occurrences 30682 for each SenderParty entity 30664 and has a data type of CDT 30684 PartyStandardID 30686. The ContactPerson 30688 has zero or one occurrences 30690 for each SenderParty entity 30664 and is of data type AGDT 30692 ContactPerson 30694. The ContactPerson 30688 also includes an InternalID 30696, BuyerID 30604A, BidderID 30612A, and an Address 30620A. The InternalID 30696 has any number occurrences 30698 for each ContactPerson 30688 and a data type of CDT 30600A ContactPersonInternalID 30694. The BuyerID 30604A has zero or one occurrences 30606A for each ContactPerson 30688 and a data type of CDT 30608A ContactPersonPartyID 30610A. The BidderID 30612A has zero or one occurrences 30614A for each ContactPerson 30688 and a data type of CDT 30616A ContactPersonPartyID 30618A. The Address 30620A has one or zero occurrences 30622A for each ContactPerson 30688 and a data type of AGDT 30624A Address 30626A.

The RFQ package 30630 includes an RFQ entity 30636A. There is one 30638A RFQ entity 30636A for each RFQMessage entity 30622. The RFQ entity 30636A has a data type of AGDT 30640A BusinessTransactionDocumentID 30642A. The RFQ entity 30636A includes an ID 30644A, a PostingDateTime 30652A, a LastChangeDateTime 30630A, a PublishDateTime 30668A, a DisplayDateTime 30676A, an BiddingStartDateTime 30684A, QuoteSubmissionDateTime 30692A, QuoteOpeningDateTime 30600B, QuoteBindingDateTime 306708B, ContractValidityPeriod 30616B, a Note 30624B, an RFQPublicIndicator 30632B, a QuoteUnplannedItemPernissionCode 30640B, a QuotePriceBiddingConditionCode 30648B, a QuoteQuantityBiddingConditionCode 30656B, a QuoteItemBiddingConditionCode 30664B, and ContractTargetAmount 30672B.

There is one 30646A ID 30644A for each RFQ entity 30636A. The ID 30644A is of type GDT 30648A BusinessTransactionDocumentID 30650A. A PostingDateTime 30652A has zero or one occurrences 30654A for each RFQ entity 30636A and is of type GDT 30656A DateTime 30658A. A VersionID 30641A has one occurrence 30643A for each RFQ entity 30636A and is of type GDT 30645A VersionID 30647A. LastChangeDateTime 30660A has zero or one occurrences 30662A for each RFQ entity 30636A and is of type GDT 30664A DateTime 30666A. PublishDateTime 30668A has zero or one occurrences 30670A for each RFQ entity 30636A and is of type GDT 30672A DateTime 30674A. DisplayDateTime 30676A has zero or one occurrences 30678A for each RFQ entity 30636A and is of type GDT 30680A DateTime 30682A. BiddingStartDateTime 30684A has zero or one occurrences 30686A for each RFQ entity 30636A and is of type GDT 30688A DateTime 30690A. QuoteSubmissionDateTime 30692A has one occurrence 30694A for each RFQ entity 30636A and is of type GDT 30696A DateTime 30698A. QuoteOpeningDateTime 30600B has zero or one occurrences 30602B for each RFQ entity 30636A and is of type GDT 30604B DateTime 30606B. QuoteBindingDateTime 30608B has zero or one occurrences 30610B for each RFQ entity 30636A and is of type GDT 30612B DateTime 30614B. ContractValidityPeriod 30616B has zero or one occurrences 30618B for each RFQ entity 30636A and is of type GDT 30620B DateTimePeriod 30622B. Note 30624B has zero or one occurrences 30626B for each RFQ entity 30636A and is of type GDT 30628B Note 30630B. RFQPublicIndicator 30632B has one occurrence 30634B for each RFQ entity 30636A and is of type GDT 30636B BusinessTransactionDocumentPublicIndicator 30638B. QuoteChargeAllowIndicator 30641B has zero to one occurrence 30643B for each RFQ entity 30636A and is of type GDT 30645B AllowIndicator

30647B. QuoteUnplannedItemPermissionCode 30640B has zero or one occurrences 30642B for each RFQ entity 30636A and is of type GDT 30644B UnplannedItemPermissionCode 30646B. QuotePriceBiddingConditionCode 30648B has zero or one occurrences 30650B for each RFQ entity 30636A and is of type GDT 30652B BiddingConditionCode 30654B, the QuoteQuantityBiddingConditionCode 30656B has one occurrence 30658B for each RFQ entity 30636A and is of type GDT 30660B BiddingConditionCode 30662B. RequestedQuoteCurrencyCode 30661B has one to n occurrences 30663B for each RFQ entity 30636A and a data type GDT 30665B CurrencyCode 30667B. QuoteItemBiddingConditionCode 30664B has one occurrence 30666B for each RFQ entity 30636A and a data type GDT 30668B BiddingConditionCode 30670B, and ContractTargetAmount 30672B has zero or one occurrences 30674B for each RFQ entity 30636A and is of type GDT 30676B Amount 30678B.

The Party package 30680B includes a BuyerParty entity 30600C, a BidderParty entity 30672C, a BidderPortalPartyProvider entity 30680C, a ProductRecipientParty entity 30688C, a VendorParty entity 30696C, a ManufacturerParty entity 30604D, and a PayerParty entity 30612D.

The BuyerParty entity 30600C is of type AGDT 30604C BusinessTransactionDocumentParty 30606C. There is one or zero 30602C BuyerParty entity 30600C for each RFQ entity 30636A. The BidderParty entity 30672C is of type AGDT 30676C BusinessTransactionDocumentParty 30678C. There is zero or one 30674C BidderParty entity 30672C for each RFQ entity 30636A. The BidderPortalPartyProvider entity 30680C is of type AGDT 30684C BusinessTransactionDocumentParty 30686C. There is zero or one 30682C BidderPortalPartyProvider entity 30680C for each RFQ entity 30636A. The ProductRecipientParty entity 30688C is of type AGDT 30692C BusinessTransactionDocumentParty 30694C. There is one or zero 30690C ProductRecipientParty entity 30688C for each RFQ entity 30636A. The VendorParty entity 30696C is of type AGDT 30600D BusinessTransactionDocumentParty 30602D. There is one or zero 30698C VendorParty entity 30696C for each RFQ entity 30636A. The ManufacturerParty entity 30604D is of type AGDT 30608D BusinessTransactionDocumentParty 30610D. There is one or zero 30606D ManufacturerParty entity 30604D for each RFQ entity 30636A. The PayerParty entity 30612D is of type AGDT 30616D BusinessTransactionDocumentParty 30618D. There is one or zero 30614D PayerParty entity 30612D for each RFQ entity 30636A.

The BuyerParty entity 30600C includes a StandardID 30608C, a BuyerID 30616C, a BidderID 30624C, an Address 30632C, and a ContactPerson 30640C. The StandardID 30608C has any number occurrences 30610C for each BuyerParty entity 30600C and a data type of CDT 30612C PartyStandardID 30614C. The BuyerID 30616C has zero or one occurrences 30618C for each BuyerParty entity 30600C and a data type of CDT 30620C PartyPartyID 30622C. The BidderID 30624C has zero or one occurrences 30626C for each BuyerParty entity 30600C and a data type of CDT 30628C PartyPartyID 30630C. The Address 30632C has zero or one occurrences 30634C for each BuyerParty entity 30600C and a data type of AGDT 30636C Address 30638C. The ContactPerson 30640C has zero or one occurrences 30642C for each BuyerParty entity 30600C and a data type of AGDT 30644C ContactPerson 30646C. The ContactPerson 30640C also includes a BuyerID 30648C, BidderID 30656C and an Address 30664C. The BuyerID 30648C has zero or one occurrences 30650C for each ContactPerson 30640C and a data type of CDT 30652C ContactPersonPartyID 30654C. The BidderID 30656C has zero or one occurrences 30658C for each ContactPerson 30640C and a data type of CDT 30660C ContactPersonPartyID 30662C. The Address 30664C has one or zero occurrences 30666C for each ContactPerson 30640C and a data type of AGDT 30668C Address 30670C.

The Location package 30682B includes a ShipToLocation entity 30620D. The ShipToLocation entity 30620D is of type AGDT 30624D BusinessTransactionDocumentLocation 30626D. There is one or zero 30622D ShipToLocation entity 30620D for each RFQ entity 30636A. The ShipToLocation entity 30620D includes a StandardID 30628D, a BuyerID 30636D, a BidderID 30644D, and an Address 30652D. The StandardID 30628D has any number occurrences 30630D for each ShipToLocation entity 30620D and a data type of CDT 30632D LocationStandardID 30634D. The BuyerID 30636D has zero or one occurrences 30638D for each ShipToLocation entity 30620D and a data type of CDT 30640D LocationPartyID 30642D. The BidderID 30644D has zero or one occurrences 30646D for each ShipToLocation entity 30620D and a data type of CDT 30648D LocationPartyID 30650D. The Address 30652D has zero or one occurrences 30654D for each ShipToLocation entity 30620D and a data type of AGDT 30656D Address 30658D.

The DeliveryInformation package 30684D includes a DeliveryTerms entity 30660D. The DeliveryTerms entity 30660D is of type AGDT 30664D DeliveryTerms 30666D. There is one or zero 30662D Delivery Terms entity 30660D for each RFQ entity 30636A. The DeliveryTerms entity 30660D includes an Incoterms entity 30668D, which is of type GDT 30672D Incoterms 30674D. There is one or zero 30670D Incoterms entity 30668 for each DeliveryTerms entity 30660D.

The PaymentInformation package 30684D includes a CashDiscountTerms entity 30676D, which is of type AGDT 30680D CashDiscountTerms 30682D. There is one or zero 30678D CashDiscountTerms entity 30676D for each RFQ entity 30636A.

The PaymentInformation package 30684B also includes a PaymentForm entity 30604E. There is one or zero 30606E PaymentForm entity 30684B for each RFQ entity 30636A. The PaymentForm entity 30604E includes a Code 30608E that is of type GDT 30612E PaymentFormCode 30614E. There is one 30610E Code 30608E for each PaymentForm entity 30604E.

The CashDiscountTerms entity 30676D includes a MaximumCashDiscount entity 30684D, and a NormalCashDiscount entity 30692D, and FullPaymentDueDaysValue entity 30600E. There is one or zero occurrences 30686D of the MaximumCashDiscount entity 30684D for each CashDiscountTerms entity 30676D. The MaximumCashDiscount entity 30684D is of type GDT 30688D CashDiscount 30690D. There is one or zero occurrences 30694D of the NormalCashDiscount entity 30692D for each CashDiscountTerms entity 30676D. The NormalCashDiscount entity 30692D is of type GDT 30696D CashDiscount 30698D. There is one or zero occurrences 30602E of the FullPaymentDueDaysValue entity 30600E for each CashDiscountTerms entity 30676D.

The PriceInformation package 30681B includes a PriceSpecificationElement entity 30607E. The PriceSpecificationElement entity 30607E is of type GDT 30611E PriceSpecificationElement 30613E. There is one or n 30609E PriceSpecificationElement entity 30607E for each RFQ entity 30636A.

The ProductInformation package 30688B includes a ProductCategory entity 30616E. The ProductCategory entity 30616E is of type GDT 30620E. BusinessTransactionDocumentProductCategory 30622E. There is one or zero 30618E ProductCategory entity 30616E for each RFQ entity 30636A. The ProductCategory entity 30616E includes a StandardID 30624E, a BuyerID 30632E, and a BidderID 30640E. The StandardID 30624E of has any number occurrences 30626E for each ProductCategory entity 30616E and a data type of CDT 30628E ProductCategoryStandardID 30630E. The BuyerID 30632E has zero or one occurrences 30634E for each ProductCategoryStandard 30616E and a data type of CDT 30636E ProductCategoryPartyID 30638E. The BidderID 30640E has zero or one occurrences 30642E and a data type of CDT 30644E ProductCategoryPartyID 30646E.

The BusinessTransactionDocumentReference package 30690B includes a QuoteReference entity 30648E. The QuoteReference entity 30648E is of type GDT 30652E BusinessTransactionDocumentReference 30654E. There is one or zero 30650E QuoteReference entities 30648E for each RFQ entity 30636A. The QuoteReference entity 30648E include an ID 30656E, and there is one occurrence 30658E of the ID 30656E for each Quote by 30648E. The ID is of type GDT 30660E BusinessTransactionID 30662E.

The FollowUpBusinessTransactionDocument package 30692B includes a FollowUpPurchaseOrder entity 30664E and a FollowUpPurchaseDocument 30676E. There is zero or one occurrence 30666E of the FollowUpPurchaseOrder entity 30664E for each RFQ entity 30636A and one or zero occurrences 30678E of the FollowUpPurchaseDocument entity 30676E for each RFQ entity 30636A. The FollowUpPurchaseOrder entity 30664E includes a RequirementCode 30668E which has one occurrence 30670E for each RFQ entity 30636A and is of type GDT 30672E FollowUpBusinessTransactionDocumentRequirementCode 30674E. The FollowUpPurchaseDocument entity 30676E includes a RequirementCode entity 30680E which has one occurrence 30682E for each FollowUpPurchaseDocument entity 30676E and is of type GDT 30684E FollowUpBusinessTransactionDocumentRequirementCode 30686E.

The Attachment package 30694B includes an Attachment entity 30688E, which is of type GDT 30692E Attachment 30694E. There is any number 30690E Attachment entities 30688E for each RFQ entity 30636A.

The Description package 30696B includes a Description entity 30696B. The Description entity 30696E is of type GDT 30600F Description 30602F. There is one or zero 30698E Description entities 30696E for each RFQ entity 30636A.

The Item package 30698B includes an Item entity 30604F which is of type AGDT 30608F RFQItem 30616F. There is any number 30606F or Item entities 30604F for each RFQ entity 30636A. The Item entity 30604F includes an ID 30612F, a ContractTargetAmount 30620F, and a HierarchyRelationship 30628F. The ID 30612F is of type GDT 30616F BusinessTransactionDocumentItemID 30618F, and there is one 30614F ID 30612F for each Item entity 30604F. The ContractTargetAmount 30620F is of type GDT 30624F Amount 30626F, and there is one or zero 30622F ContractTargetAmount 30620F for each Item entity 30604F. There is one or zero 30630F HierarchyRelationship 30628F for each Item entity 30604F. The HierarchyRelationship 30628F includes a ParentItemID 30632F, which is of type GDT 30636F BusinessTransactionDocumentItemID 30638F, and a TypeCode 30640F, which is of type GDT 30644F BusinessTransactionDocumentHierarchyRelationshipTypeCode 30646F. There is one 30634F ParentItemID 30632F for each HierarchyRelationship 30628F, and there is one 30642F TypeCode 30640F for each HierarchyRelationship 30628F.

The Item package 30698B also includes a ProductInformation package 30648F, a Party package 30656F, a Location package 30652F, a DeliveryInformation package 30654F, a BusinessTransactionDocumentReference package 30656F, a PriceInformation package 30649F, an Attachment package 30658F, a Description package 30660F, and a ScheduleLine package 30662F.

The ProductInformation package 30648F includes a Product entity 30664F and a ProductCategory entity 30620G. The Product entity 30664F is of type GDT 30668F BusinessTransactionDocumentProduct 30670F. There is one or zero 30666F Product entity 30664F for each Item entity 30604F. The ProductCategory entity 30620G is of type GDT 30624G BusinessTransactionDocumentProductCategory 30626G. There is one or zero 30622G ProductCategory entity 30620G for each Item entity 30604F.

The Product entity 30664F includes a StandardID 30672F, a BuyerID 30680F, a BidderID 30688F, an ManufacturerID 30696F, TypeCode 30604G and a Note 30612G. The StandardID 30672F Product entity 30664F has any number occurrences 30674F for each Product entity 30664F and has a data type of CDT 30684F ProductStandardID 30686F. The BuyerID 30688F has zero or one occurrences 30682F for each Product entity 30664F a data type of CDT 30684F ProductPartyID 30686F. The BidderID 30688F has zero or one occurrences 30690F for each Product entity 30664F and a data type of CDT 30692F ProductPartyID 30694F. The ManufacturerID 30696F has zero or one occurrences 30698F for each Product entity 30664F and a data type of CDT 30600G ProductPartyID 30602G. The TypeCode 30604G has zero or one occurrences 30606G for each Product entity 30664F and a data type of GDT 30608G ProductTypeCode 30610G. The Note 30612G has zero or one occurrences 30614G and a data type of GDT 30616G Note 30618G.

The ProductCategory entity 30620G includes a StandardID 30628G, a BuyerID 30636G, and a BidderID 30644G. The StandardID 30628G has any number of occurrences 30630G and a data type of CDT 30632G ProductCategoryStandardID 30642G. The BuyerID 30636G has zero or one occurrences 30636G and a data type of CDT 30638G for each ProductCategory entity 30620G ProductCategoryPartyID 30642G. The BidderID 30644G has zero or one occurrences 30646G for each ProductCategory entity 30620G and a data type of CDT 30648G ProductCategoryPartyID 30650G.

The PriceInformation package 30649F includes a PriceSpecificationElement entity 30651F. The PriceSpecificationElement entity 30651F is of type GDT 30655F PriceSpecificationElement 30657F. There is one or n 30653F PriceSpecificationElement entity 30651F for each RFQ entity 30636A.

The Party package 30650F includes a BuyerParty entity 30652G, a BidderParty entity 30660G, a ProductRecipientParty entity 30668G, a VendorParty entity 30676G, and a ManufacturerParty entity 30684G.

The BuyerParty entity 30652G is of type AGDT 30652G BusinessTransactionDocumentParty 30658G. There is one or zero 30654G BuyerParty entity 30652G for each Item entity 30604F. The BidderParty entity 30660G is of type AGDT 30664G BusinessTransactionDocumentParty 30666G. There is zero or one 30662G BidderParty entity 30660G for each Item entity 30604F. There is zero or one 30670G ProductRecipientParty entity 30668G for each Item entity 30604F. The ProductRecipientParty entity 30668G is of type AGDT 30672G BusinessTransactionDocumentParty 30674G. The VendorParty entity 30676G is of type AGDT 30680G BusinessTransactionDocumentParty 30682G. There is one or zero 30678G VendorParty entity 30676G for each Item entity 30604F. The ManufacturerParty entity 30684G is of type AGDT 30688G BusinessTransactionDocumentParty 30690G. There is one or zero 30686G ManufacturerParty entity 30684G for each Item entity 30604F.

The Location package 30652F includes a ShipToLocation entity 30692G. The ShipToLocation entity 30692G is of type AGDT 30692G BusinessTransactionDocumentLocation 30698G. There is one or zero 30694G ShipToLocation entity 30692G for each Item entity 30604F. The ShipToLocation entity 30692G includes a StandardID 30600H, a BuyerID 30608H, a BidderID 30616H, and an Address 30624H. The StandardID 30600H of the has any number of occurrences 30602 for each ShipToLocation entity 30692G and a data type of CDT 30604H LocationStandardID 30606H. The BuyerID 30608H has zero or one occurrences 30610H for each ShipToLocation entity 30692G and a data type of CDT 30612H LocationPartyID 30614H. The BidderID 30616H has zero or one occurrences 30618H for each ShipToLocation entity 30692G and a data type of CDT 30620H LocationPartyID 30622H. The Address 30624H has zero or one occurrences 30626H for each ShipToLocation entity 30692G and a data type of AGDT 30628H Address 30630H.

The DeliveryInformation package 30654F includes a DeliveryTerms entity 30632H, which is of type AGDT 30636H DeliveryTerms 30638H. There is one or zero 30634H DeliveryTerms entity 30632H for each Item entity 30604F. The DeliveryTerms entity 30632H includes an MaximumLeadTimeDuration entity 30640H which is of type GDT 30644H Duration 30646H, and there is one or zero occurrences 30642 for each DeliveryInformation package 30654F. The DeliveryTerms entity 30632H also includes an Incoterms entity 30648H which is of type GDT 30652H Incoterms 30654H. There is one or zero 30650H Incoterms entity 30648H for each DeliveryInformation package 30654F.

The BusinessTransactionDocumentReference package 30656F includes a QuoteReference entity 30656H. The QuoteReference entity 30656H is of type GDT 30660H BusinessTransactionDocumentReference 30662H. There is one or zero 30658H QuoteReference entities 30656H for each Item entity 30604F. The QuoteReference entity 30686H includes an ID 30664H. There is one 30666H ID 30664H for each QuoteReference entity 30656H the ID 30664H is of type GDT 30668H BusinessTransactionDocumentID 30670H. The QuoteReference entity 30656H also includes an ItemID 30672H. There is any number 30674H of ItemID for each Quote Reference entity 30656H. The ItemID is or type GDT 30676H BusinessTransactionDocumentItemID 30678H.

The BusinessTransactionDocumentReference package 30656F also includes a PurchaseContractReference entity 30680H. The PurchaseContractReference entity 30680H is of type GDT 30684H BusinessTransactionDocumentReference 30686H. There is one or zero 30682H PurchaseContractReference entities 30680N for each Item entity 30604F. The PurchaseContractReference entity 30680H includes an ID 30688H. There is one ID 30688H for each PurchaseContractReference entity 30680H. The ID 30688H is of type GDT 30692H BusinessTransactionDocumentID 30694H. The PurchaseContractReference entity 30680H includes an ItemID entity 30696H. There is any number 30698H of ItemID 30696H for each PurchaseContractReference entity 30680H. The ItemID 30696H is of type GDT 30600I BusinessTransactionDocumentItemID 30602I.

The BusinessTransactionDocumentReference package 30656F further includes a BuyerProductCatalogueReference entity 30604I. The BuyerProductCatalogueReference entity 30604I is of type AGDT 30608I CatalogueReference 30610I. There is one or zero 30606I BuyerProductCatalogueReference entities 30604I for each Item entity 30604F. The BuyerProductCatalogueReference entity 30604I includes an ID 30612I. There is one ID 30612I for each BuyerProductCatalogueReference entity 30604I is of type GDT 30616I CatalogueID 30618A. The BuyerProductCatalogueReference entity 30604I includes an ItemID 30620I. There is any number 30622I of ItemID 30620I for each BuyerProductCatalogueReference entity 30604I is of type GDT 30624I CatalogueItemID 30626I.

The Attachment package 30658F includes an Attachment entity 30628I, which is of type GDT 30632I Attachment 30634I. There is any number 30630I of attachment entities 30628I for each Item entity 30604F.

The Description package 30660F includes a Description entity 30636I. The Description entity 30636I is of type GDT 30640I Description 30642I. There is one or zero 30638I Description entity 30636I for each Item entity 30604F.

The ScheduleLine package 30662F includes a ScheduleLine entity 30644I having an ID 30652I, DeliveryPeriod 30660I, and Quantity 30668I. The ScheduleLine entity 30644I has zero or one occurrence 30646I for each Item entity 30604F. The ScheduleLine entity 30644I is of data type AGDT 30648I RFQItemScheduleLine 30650I. The ID 30652I has one or zero occurrence 30654I for each ScheduleLine entity 30644I with a data type of GDT 30656I BusinessTransactionDocumentItemScheduleLineID 30658I. The DeliveryPeriod 30660I has one occurrence 30662I for each ScheduleLine entity 30644I and a data type of AGDT 30664I DateTimePeriod 30666I. The Quantity 30668I has one or zero occurrences 30670I for each ScheduleLine entity 30644I a data type of GDT 30672I Quantity 30674I.

(b) Data Type RFQ Cancellation Message

FIGS. 307A-C depict the element structure for RFQCancellationRequest. The element structure is similar to the data model, but provides additional information regarding the details of the interface. The element structure identifies the different packages 30700 in the interface, and represents the entities at various levels within the interface. As depicted in FIGS. 307A-C, the interface for RFQCancellationRequest includes five levels 30702, 30704, 30706, 30708, and 30710. The element structure identifies the cardinality 30712 between the entities and/or attributes of the interface, and provides information (i.e., type 30714 and name 30716) regarding the data type that provides the basis for the entity and/or attribute. The outermost package of this interface is an RFQCancellationMessage package 30718, which includes an RFQCancellationMessage entity 30720 at the first level 30702. The RFQCancellationMessage entity 30720 is of type message data type ("MDT") 30722 "RFQCancellationMessage" 30724.

The RFQCancellationMessage package 30718 includes a MessageHeader package 30726 and an RFQCancellation package 30728. The MessageHeader package 30726 includes a MessageHeader entity 30730, which is of type generic data type ("AGDT") 30734 "BusinessDocumentMessageHeader" 30736. There is one 30732 MessageHeader entity 30730 for each RFQCancellatiorMessage entity 30720.

The MessageHeader entity 30730 includes an ID 30738, a ReferenceID 30746, and a CreationDateTime 30754. The ID 30738 is of type GDT 30742 BusinessDocumentMessageID 30744. The ReferenceID 30746 is of type GDT 30750 BusinessDocumentMessageID 30752. The CreationDateTime 30754 is of type GDT 30758 DateTime 30760. There is one 30740 ID 30738 for each MessageHeader entity 30730, one or zero 30748 ReferenceID 30786 for each MessageHeader entity 30730, and one 30756 CreationDateTime 30754 for each MessageHeader entity 30730.

The MessageHeader entity 30730 also includes a SenderParty entity 30762 and a RecipientParty entity 30726A. The SenderParty entity 30762 is of type AGDT 30766 BusinessDocumentMessageHeaderParty 30768. The RecipientParty entity 30726A is also of type AGDT 30730A BusinessDocumentMessageHeaderParty 30732A. There is one or zero 30764 SenderParty entity 30762 for each MessageHeader entity 30730, and there is any number 30728A of RecipientParty entity 30726A for each MessageHeader entity 30730.

The SenderParty entity 30762 includes an InternalID 30770, a StandardID 30778, and a Contact 30786. The InternalID 30770 has zero or one occurrences 30772 for each SenderParty entity 30762 and a data type CDT 30774 of PartyInternalID 30776. The StandardID 30778 has any number of occurrences 30780 for each SenderParty entity 30762 and a data type of CDT 30782 PartyStandardID 30784. The Contact 30786 has zero or one occurrences 30788 for each SenderParty entity 30762 and is of data type GDT 30790 ContactPerson 30792. The Contact 30786 also includes an InternalID 30794, BuyerID 30702A, Bidder ID 30710A and an Address 30718A. The InternalID 30794 Person has any number of occurrences 30796 for each SenderParty entity 30762 and a data type of CDT 30798 ContactPersonInternalID 30700A. The BuyerID 30702A has zero or one occurrences 30704A for each SenderParty entity 30762 and a data type of CDT 30706 ContactPersonPartyID 30708A. The BidderID 30710A has zero or one occurrences 30712A for each SenderParty entity 30714A and a data type of CDT 30714A ContactPersonPartyID 30716A. The Address 30718A has zero or one occurrences 30720A for each SenderParty entity 30762 and a data type of AGDT 30722A Address 30724A.

The RFQCancellation package 30728 includes an RFQCancellation entity 30734A. The RFQCancellation entity 30734A is of type GDT 30738A RFQCancellation 30740A. There is one 30736A RFQCancellation entity 30734A for each RFQCancellationMessage entity 30720. The RFQCancellation entity 30734A includes an ID 30742A. There is one 30744A ID 30742A for each RFQCancellation entity 30734A. The ID 30742A is of type GDT 30746A BusinessTransactionDocumentID 30748A.

(c) Data Type Quote Message

FIGS. 308A-M depict the element structure for QuoteNotification. The element structure is similar to the data model, but provides additional information regarding the details of the interface. The element structure identifies the different packages 30800 in the interface, and represents the entities at various levels within the interface. As depicted in FIGS. 308A-M, the interface for QuoteNotification includes six levels 30802, 30804, 30806, 30808, 30810, and 30812. The element structure identifies the cardinality 30814 between the entities and/or attributes of the interface, and provides information (i.e., type 30816 and name 30818) regarding the data type that provides the basis for the entity and/or attribute. The outermost package of this interface is an QuoteMessage package 30800, which includes an QuoteMessage entity 30822 at the first level 30802. The QuoteMessage entity 30822 is of type message data type ("MDT") 30824 "QuoteMessage" 30826.

The QuoteMessage package 30820 includes a MessageHeader package 30828 and a Quote package 30830. The MessageHeader package 30828 includes a MessageHeader entity 30832, which is of type generic data type ("AGDT") 30836 "BusinessDocumentMessageHeader" 30838. There is one 30834 MessageHeader entity 30832 for each QuoteMessage entity 30822.

The MessageHeader entity 30832 includes an ID 30840, a Reference ID 30848, and a CreationDateTime 30856. The ID 30840 is of type GDT 30844 BusinessDocumentMessageID 30846. The ReferenceID 30848 is of type GDT 30852 BusinessDocumentMessageID 30854. The CreationDateTime 30856 is of type GDT 30860 DateTime 30862. There is one 30842 ID 30840 for each MessageHeader entity 30832, one or zero 30850 ReferenceID 30848 for each MessageHeader entity 30832, and one 30858 CreationDateTime 30856 for each MessageHeader entity 30832.

The MessageHeader entity 30832 also includes a SenderParty entity 30864 and a RecipientParty entity 30828A. The SenderParty entity 30864 is of type AGDT 30868 BusinessDocumentMessageHeaderParty 30870. The RecipientParty entity 30828A is also of type AGDT 30832A BusinessDocumentMessageHeaderParty 30834A. There is one or zero 30866 SenderParty entity 30864 for each MessageHeader entity 30832, and there is any number 30830A of RecipientParty entity 30828A for each MessageHeader entity 30832.

The SenderParty entity 30864 includes an InternalID 30872, a StandardID 30880, and a Contact 30888. The InternalID 30872 has zero or one occurrences 30874 for each SenderParty entity 30864 and a data type CDT 30876 of PartyInternalID 30878. The StandardID 30880 has any number of occurrences 30882 for each SenderParty entity 30864 and a data type of CDT 30884 PartyStandardID 30856. The Contact 30888 has zero or one occurrences 30890 SenderParty entity 30864 and is of data type GDT 30892 Contact 30894. The Contact 30888 also includes an InternalID 30896, BuyerID 30804A, Bidder ID 30812A and an Address 30820A. The InternalID 30896 has any number of occurrences 30898 for each Contact 30888 and a data type of CDT 30800A ContactPersonInternalID 30802A. The BuyerID 30804A has zero or one occurrences 30806A for each Contact 30888 and a data type of CDT 30808A ContactPersonPartyID 30810A. The BidderID 30812A has zero or one occurrences 30814A and a data type of CDT 30816A ContactPersonPartyID 30818A. The Address 30820A has one or zero occurrences 30822A for each Contact 30888 and a data type of AGDT 30824A Address 30826A.

The Quote package 30830 includes a Quote entity 30836A. There is one 30838A Quote entity 30836A for each QuoteMessage entity 30822. The Quote entity 30836A has a data type of AGDT 30840A Quote 30842A. The Quote entity 30836A includes an ID 30844A, a PostingDateTime 30852A, a LastChangeDateTime 30860A, a BindingDateTime 30868A, a Note 30876A, and a ContractTargetAmount 30884A.

There is one 30846A ID 30844A for each Quote entity 30836A. The ID 30844A is of type GDT 30848A BusinessTransactionDocumentID 30850A. A PostingDateTime 30852A has zero or one occurrences 30854A for each Quote entity 30836A and is of type GDT 30856A DateTime 30858A. LastChangeDateTime 30860A has zero or one occurrences 30862A for each Quote entity 30836A and is of type GDT 30864A DateTime 30866A. BindingDateTime 30868A has zero or one occurrences 30870A for each Quote entity 30836A and is of type GDT 30880A DateTime 30874A. Note 30876A has zero or one occurrences 30878A for each Quote entity 30836A and is of type GDT 30880A Note 30882A. ContractTargetAmount 30884A has zero or one occurrences 30886A and is of type GDT 30888A Amount 30890A.

The Party package 30892A includes a BuyerParty entity 30810B, a BidderParty entity 30882B, a BidderPortalPartyProvider entity 30890B, a ProductRecipientParty entity 30898B, a VendorParty entity 30806C, a ManufacturerParty entity 30814C, a PayerParty entity 30822C.

The BuyerParty entity 30810B is of type GDT 30814B BusinessTransactionDocumentParty 30816B. There is one or zero 30812B BuyerParty entity 30810B for each Quote entity

30836A. The BidderParty entity 30882B is of type AGDT 30886B BusinessTransactionDocumentParty 30888B. There is zero or one 30884B BidderParty entity 30882B for each Quote entity 30836A. The BidderPortalPartyProvider entity 30890B is of type AGDT 30894B BusinessTransactionDocumentParty 30896B. There is zero or one 30892B BidderPortalPartyProvider entity 30890B for each Quote entity 30836A. The ProductRecipientParty entity 30898B is of type AGDT 30802C BusinessTransactionDocumentParty 30804C. There is one or zero 30800C ProductRecipientParty entity 30898B for each Quote entity 30836A. The VendorParty entity 30806C is of type AGDT 30810C BusinessTransactionDocumentParty 30812C. There is one or zero 30808C VendorParty entity 30806C for each Quote entity 30836A. The ManufacturerParty entity 30814C is of type AGDT 30818C BusinessTransactionDocumentParty 30820C. There is one or zero 30816C ManufacturerParty entity 30814C for each Quote entity 30836A. The PayerParty entity 30822C is of type AGDT 30826C BusinessTransactionDocumentParty 30828C. There is one or zero 30824C PayerParty entity 30822C for each Quote entity 30836A.

The BuyerParty entity 30810B includes a StandardID 30818B, a BuyerID 30826B, a BidderID 30834B, an Address 30842B, and a Contact 30850B. The StandardID 30818B has any number of occurrences 30820 B for each BuyerParty entity 30810B and a data type of CDT 30822B PartyStandardID 30824B. The BuyerID 30826B has zero or one occurrences 30828B for each BuyerParty entity 30810B and a data type of CDT 30830B PartyPartyID 30840B. The BidderID 30834B has zero or one occurrences 30836B for each BuyerParty entity 30810B and a data type of CDT 30838B PartyPartyID 30840B. The Address 30842B has occurrences 30844B for each BuyerParty entity 30810B and a data type of AGDT 30846B Address 30848B. The Contact 30850B has zero or one occurrences 30852B for each BuyerParty entity 30810B and a data type of AGDT 30854B ContactPerson 30856B. The Contact 30850B also includes a BuyerID 30858B, BidderID 30866B and an Address 30874B. The BuyerID 30858B has zero or one occurrences 30860B for each Contact 30850B and a data type of CDT 30862B PartyPartyID 30864B. The BidderID 30866B has zero or one occurrences 30868B for each Contact 30850B and a data type of CDT 30870B PartyPartyID 30872B. The Address 30874B has one or zero occurrences 30876 for each Contact 30850B and a data type of AGDT 30878B Address 30880B.

The Location package 30894A includes a ShipToLocation entity 30830C. The ShipToLocation entity 30830C is of type AGDT 30834C BusinessTransactionDocumentLocation 30836C. There is one or zero 30832C ShipToLocation entity 30830C for each Quote entity 30836A. The ShipToLocation entity 30830C includes a StandardID 30838C, a BuyerID 30846C, a BidderID 30854C, and an Address 30862C. The StandardID 30838C has any number of occurrences 30840C and a data type of CDT 30842C LocationStandardID 30844C. The BuyerID 30846C has zero or one occurrences 30848C for each ShipToLocation entity 30830C and a data type of CDT 30850C LocationPartyID 30852C. The BidderID 30854C has zero or one occurrences 30856C for each ShipToLocation entity 30830C and a data type of CDT 30858C LocationPartyID 30860C. The Address 30862C has zero or one occurrences 30864C for each ShipToLocation entity 30830C and a data type of AGDT 30866C Address 30868C.

The DeliveryInformation package 30896A includes a DeliveryTerms entity 30870C, which is of type AGDT 30874C DeliveryTerms 30876C. There is one or zero 30872C DeliveryTerms entity 30870C for each Quote entity 30836A. The DeliveryTerms entity 30870C includes an Incoterms entity 30878C which is of type GDT 30882C Incoterms 30884C. There is one or zero 308C Incoterms entity 30878C for each DeliveryTerms entity 30870C.

The PaymentInformation package 30898A includes a CashDiscountTerms entity 30886C, which is of type AGDT 30890C CashDiscountTerms 30892C. There is one or zero 30888C CashDiscountTerms entity 30886C for each Quote entity 30836A. The PaymentInformation package 30898A also includes a PaymentForm entity 30814D. There is one or zero 30816D PaymentForm entity 30814D for each Quote entity 30836A. The PaymentForm entity 30814D includes a Code 30818D that is of type GDT 30822D PaymentFormCode 30824D. There is one 30820D Code 30818D for each PaymentForm entity 30814D.

The CashDiscountTerms entity 30886C includes a MaximumCashDiscount 30894C, and a NormalCashDiscount 30862D, and FullPaymentDueDaysValue 30810D. There is one or zero occurrences 30896C of the MaximumCashDiscount entity 30894C is of type GDT 30898C CashDiscount 30800D. There is one or zero occurrences 30896C of the NormalCashDiscount entity 30802D is of type GDT 30806D CashDiscount 30808D. There are one or zero occurrences 30812D of the FullPaymentDueDaysValue entity 30810D for each CashDiscount Terms entity 30886C.

The PriceInformation package 30801B includes a PriceSpecificationElement entity 30841D. The PriceSpecificationElement entity 30841D is of type GDT 30845D PriceSpecificationElement 30841D. There is one or n 30843D PriceSpecificationElement entity 30841D for each RFQ entity 30636A.

The ProductInformation package 30800B includes a ProductCategory entity 30826D. The ProductCategory entity 30826D is of type GDT 30830D BusinessTransactionDocumentProductCategory 30832D. There is one or zero 30828D ProductCategory entity 30826D for each Quote entity 30836A. The ProductCategory entity 30826D includes a StandardID 30834D, a BuyerID 30840D, and a BidderID 30846D. The StandardID 30834D of has a data type of CDT 30836D ProductCategoryStandardID 30838D. The BuyerID 30840D has a data type of CDT 30842D ProductCategoryPartyID 30844D. The BidderID 30846D has a data type of CDT 30848D ProductCategoryPartyID 30850D.

The BusinessTransactionDocumentReference package 30802B includes a RFQReference entity 30852D. The RFQReference entity 30852D is of type GDT 30856D BusinessTransactionDocumentReference 30858D. There is one or zero 30854D RFQReference entities 30852D for each Quote entity 30836A. The RFQReference entity 30852D includes an ID 30860D, and there is one 30862D ID 30860D RFQReference entity 30852D is of type GDT 30864D BusinessTransactionDocumentID 30866D.

The Attachment package 30804B includes an Attachment entity 30868D, which is of type GDT 30872D Attachment 30874D. There is any number 30870D Attachment entities 30868D for each Quote entity 30836A.

The Description package 30806B includes a Description entity 30876D. The Description entity 30876D is of type GDT 30880D Description 30882D. There is one or zero 30878D Description entities 30876D for each Quote entity 30836A.

The Item package 30808B includes an Item entity 30884D which is of data type AGDT 30888D QuoteItem 30890D. There is any number 30886D of Item entities 30884D for each Quote entity 30836A. The Item entity 30884D includes an ID 30892D, a ContractTargetAmount 30800E, and a HierarchyRelationship 30808E. The ID 30892D is of type GDT 30896D BusinessTransactionDocumentItemID 30898D, and there is one 30894D ID 30892D for each Item entity 30884D. The ContractTargetAmount 30800E is of type GDT 30804E Amount 30806E, and there is one or zero 30802E ContractTargetAmount 30800E for each Item entity 30884D. There is one or zero 30810E HierarchyRelationship 30808E for each Item entity 30884D. The HierarchyRelationship 30808E includes a ParentItemID 30812E, which is of type GDT 30816E BusinessTransactionDocumentItemID 30818E, and a TypeCode 30820E, which is of type GDT 30824E BusinessTransactionDocumentItem-HierarchyRelationshipTypeCode 30826E. There is one 30814E ParentItemID 30812E for each HierarchyRelationship 30808E, and there is one 30822E TypeCode 30820E for each HierarchyRelationship 30808E.

The Item package 30808B also includes a ProductInformation package 30828E, a Party package 30832E, a Location package 30834E, a DeliveryInformation package 30836E, a BusinessTransactionDocumentReference package 30838E, a PriceInformation package 30830E, an Attachment package 30840E, a Description package 30842E, and a ScheduleLine package 30844E.

The ProductInformation package 30828E includes a Product entity 30846E and a ProductCategory entity 30800F. The Product entity 30846E is of type BusinessTransactionDocumentProduct 30850E. There is one or zero 30848E Product entity for each Item entity 30884D. The ProductCategory entity 30800F is of type BusinessTransactionDocumentProductCategory 30804F. There is one or zero 30802F ProductCategory entity 30800F for each Item entity 30884D.

The Product entity 30846E includes a StandardID 30852E, a BuyerID 30860E, a BidderID 30868E, an ManufacturerID 30876E, TypeCode 30884E and a Note 30892E. The StandardID 30852E has any number of occurrences 30854E Product entity 30846E and has a data type of CDT 30856E ProductStandardID 30858E. The BuyerID 30860E has zero or one occurrences 30862E for each Product entity 30846E and a data type of CDT 30864E ProductPartyID 30866E. The BidderID 30868E has zero or one occurrences 30870E for each Product entity 30846E and a data type of CDT 30872E ProductPartyID 30874E. The ManufacturerID 30876E has zero or one occurrences 30878E for each Product entity 30846E and a data type of CDT 30880E ProductPartyID 30882E. The TypeCode 30884E has zero or one occurrences 30886E for each Product entity 30846E and a data type of GDT 30888E ProductTypeCode 30890E. The Note 30892E has zero or one occurrences 30894E for each Product entity 30846E and a data type of GDT 30896E Note 30898E.

The ProductCategory entity 30800F includes a StandardID 30806F, a BuyerID 30814F, and a BidderID 30822F. The StandardID 30806F of has any number occurrences 30808F for each Product entity 30846E and has a data type of CDT 30810F ProductCategoryStandardID 30812F. The BuyerID 30814F has zero or one occurrences 30816 for each Product entity 30846E and a data type of CDT 30818F ProductCategoryPartyID 30820F. The BidderID 30822F has a data type of CDT 30824F ProductCategoryPartyID 30826F.

The PriceInformation package 30830E includes a PriceSpecificationElement entity 30828F. The PriceSpecificationElement entity 30828F is of type GDT 30831F PriceSpecificationElement 30841D. There is one or n 30830F PriceSpecificationElement entity 30828F for each Item entity 30884D.

The PriceInformation package 30830E includes a Price entity 30828F. There is one or zero 30830F Price entity 30828F for each Item entity 30884D. The Price entity 30828F includes a NetUnitPrice 30832F. The NetUnitPrice 30832F is of type AGDT 30836F Price 30838F. There is one or zero 30834F NetUnitPrice 30832F for each Price entity 30828F.

The Party package 30832E includes a BuyerParty entity 30840F, a BidderParty entity 30848F, a ProductRecipientParty entity 30856F, a VendorParty entity 30864F, and a ManufacturerParty entity 30872F.

The BuyerParty entity 30840F is of type AGDT 30844F BusinessTransactionDocumentParty 30846F. There is one or zero 30842F BuyerParty entity 30840F for each Item entity 30884D. The BidderParty entity 30848F is of type AGDT 30852F BusinessTransactionDocumentParty 30854F. There is zero or one 30850F BidderParty entity 30848F for each Item entity 30884D. There is zero or one 30858F ProductRecipientParty entity 30856F for each Item entity 30884D. The ProductRecipientParty entity 30856F is of type AGDT 30860F BusinessTransactionDocumentParty 30862F. The VendorParty entity 30864F is of type AGDT 30868F BusinessTransactionDocumentParty 30870F. There is one or zero 30866F VendorParty entity 30864F for each Item entity 30884D. The ManufacturerParty entity 30872F is of type AGDT 30876F BusinessTransactionDocumentParty 30878F. There is one or zero 30874F ManufacturerParty entity 30872F for each Item entity 30884D.

The Location package 30834E includes a ShipToLocation entity 30880F. The ShipToLocation entity 30880F is of type AGDT 30884F BusinessTransactionDocumentLocation 30886F. There is one or zero 30882F ShipToLocation entity 30880F for each Item entity 30884D. The ShipToLocation entity 30880F includes a StandardID 30888F, a BuyerID 30896F, a BidderID 30896F, and an Address 30812G. The StandardID 30888F has any number of occurrences 30890F for each ShipToLocation 30880F and a data type of CDT 30892F LocationStandardID 30894F. The BuyerID 30896F has zero or one occurrences 30898F for each ShipToLocation entity 30880F and a data type of CDT 30800G LocationPartyID 30802G. The BidderID 30804G has zero or one occurrences 30806G for each ShipToLocation 30880F and a data type of CDT 30808G LocationPartyID 30810G. The Address 30812G has zero or one occurrences 30814G for each ShipToLocation 30880F and a data type of AGDT 30816G Address 30818G.

The DeliveryInformation package 30836E includes a DeliveryTerms entity 30820G, which is of type AGDT 30824G DeliveryTerms 30826G. There is one or zero 30822G DeliveryTerms entity 30820G for each Item entity 30884D. The DeliveryTerms entity 30820G includes a MaximumLeadTimeDuration entity 30828G which is of type GDT 30832G Duration 30834G, and there is one or zero occurrences 30830G for each DeliveryTerms entity 30820G. The DeliveryTerms entity 30820G includes an Incoterms entity 30836G which is of type GDT 30840G Incoterms 30842G. There is one or zero 30838G Incoterms entity 30836 for each DeliveryTerms entity 30820G.

The BusinessTransactionDocumentReference package 30838E includes a RFQReference entity 30844G. The RFQReference entity 30844G is of type GDT 30848G BusinessTransactionDocumentReference 30850G. There is one or zero 30846G RFQReference entities 30844G for each Item entity 30884D. The RFQReference entity 30844G includes an ID 30852G. There is one 30854G ID entity 30852 for each RFQReference entity 30844G is of type GDT 30856G BusinessTransactionDocumentID 30858G. The RFQReference entity 30844G includes an ItemID 30860G. There is any number 30862G of ItemID 30860G the ItemID is of type GDT 30864G BusinessTransactionDocumentItemID 30866G.

The Attachment package 30840E includes an Attachment entity 30868G, which is of type GDT 30872G Attachment 30874G. There is any number 30870G of Attachment entities 30868G for each Item entity 30884D.

The Description package 30842E includes a Description entity 30876G. The Description entity 30876G is of type GDT 30880G Description 30882G. There is one or zero 30878G Description entity 30876G for each Item entity 30884D.

The ScheduleLine package 30844E includes a ScheduleLine entity 30884G having an ID 30892G, DeliveryPeriod 30800H, and Quantity 30808H. The ScheduleLine entity 30884G has zero or one occurrence 30886G for each Item entity 30884D, and a data type AGDT 30888G ItemScheduleLine 30890G. The ID 30892G has one or zero occurrence 30894G for each ScheduleLine entity 30884G and a data type of GDT 30896G BusinessTransactionDocumentItemScheduleLineID 30898G. The DeliveryPeriod 30800H has one occurrence 30802H a data type of AGDT 30804H DateTimePeriod 30806H. The Quantity 30808H has one or zero occurrences 30810H for each ScheduleLine entity 30884G a data type of GDT 30812H Quantity 30814H.

(d) Data Type RFQ Result Message

FIGS. 309A-D depict the element structure for RFQResultNotification. The element structure is similar to the data model, but provides additional information regarding the details of the interface. The element structure identifies the different packages 30900 in the interface, and represents the entities at various levels within the interface. As depicted in FIGS. 309A-D, the interface for RFQResultNotification includes six levels 30902, 30904, 30906, 30908, 30910, and 30912. The element structure identifies the cardinality 30914 between the entities and/or attributes of the interface, and provides information (i.e., type 30916 and name 30918) regarding the data type that provides the basis for the entity and/or attributes. The outermost package of this interface is an RFQResultMessage package 30920, which includes an RFQResultMessage entity 30922 at the first level 30902. The RFQResultMessage entity 30922 is of type message data type ("MDT") 30924 "RFQResultMessage" 30926.

The RFQResultMessage package 30920 includes a MessageHeader package 30928 and an RFQResult package 30930. The MessageHeader package 30928 includes a MessageHeader entity 30932, which is of type generic data type ("AGDT") 30936 "BusinessDocumentMessageHeader" 30938. There is one 30934 MessageHeader entity 30932 for each RFQMessageResult entity 30922.

The MessageHeader entity 30932 includes an ID 30940, a Reference ID 30948, and a CreationDateTime 30956. The ID 30940 is of type GDT 30944 BusinessDocumentMessageID 30946. The ReferenceID 30948 is of type GDT 30952 BusinessDocumentMessageID 30954. The CreationDateTime 30956 is of type GDT 30960 DateTime 30962. There is one 30942 ID 30940 for each MessageHeader entity 30932, one or zero 30950 ReferenceID 30948 for each MessageHeader entity 30932, and one 30958 CreationDateTime 30956 for each MessageHeader entity 30932.

The MessageHeader entity 30932 also includes a SenderParty entity 30964 and a RecipientParty entity 30928A. The SenderParty entity 30964 is of type AGDT 30968 BusinessDocumentMessageHeaderParty 30970. The RecipientParty entity 30928A is also of type AGDT 30932A BusinessDocumentMessageHeaderParty 30934A. There is one or zero 30966 SenderParty entity 30964 for each MessageHeader entity 30932, and there any number 30930A of RecipientParty entity 30928A for each MessageHeader entity 30932.

The SenderParty entity 30964 includes an InternalID 30972, a StandardID 30980 and a Contact 30988. The InternalID 30972 has zero or one occurrences 30974 for each SenderParty entity 30964 and a data type CDT 30976 of PartyInternalID 30978. The StandardID 30980 has any number of occurrences 30982 for each SenderParty 30964 and has a data type of CDT 30984 PartyStandardID 30986. The Contact 30988 has zero or one occurrences 30990 for each SenderParty entity 30964 and is of data type GDT 30992 ContactPerson 30994. The Contact 30988 also includes an InternalID 30996, BuyerID 30904A, BidderID 30912A and an Address 30920A. The InternalID 30996 has any number of occurrences 30998 for each Contact 30988 and a data type of CDT 30900A ContactPersonInternalID 30902A. The BuyerID 30904A has any zero or one occurrences 30906A for each Contact 30988 and a data type of CDT 30908A ContactPersonPartyID 30910A. The BidderID 30912A has zero or one occurrences 30914A for each Contact 30988 and a data type of CDT 30916A ContactPersonPartyID 30918A. The Address 30920A has one or zero occurrences 30922A for each Contact 30988 and a data type of AGDT 30924A Address 30926A.

The RFQResult package 30930 includes a party package 30952A, a description package 30954A, and an Item package 30956A. The RFQResult package 30930 also includes an RFQResult entity 30936A. The RFQResult entity 30936A is of type AGDT 30940A RFQ Result 30942A. There is one 30938A RFQResult entity 30936A for each RFQResultMessage entity 30922. The RFQResult entity 30936A includes an ID 30944A. There is one 30946A ID 30944A for each RFQResult entity 30936A. The ID 30944A is of type GDT 30948A BusinessTransactionDocumentID 30950A.

The Party package 30952A includes a BidderParty entity 30958A. The BidderParty entity 30958A is of type AGDT 30962A BusinessTransactionDocumentParty 30964A. There is zero or one 30960A BidderParty entity 30958A for each RFQResult entity 30936A.

The Description package 30954A includes a Description entity 30966A. The Description entity 30966A is of type GDT 30970A Description 30972A. There is one or zero occurrences 30968A of Description entities 30966A for each RFQResult entity 30936A.

The Item package 30956A includes a BusinessTranslationDocumentReference package 30910B 30910B and a ScheduleLine package 30912B. The Item package 30956A also includes an Item entity 30974A. There is any number 30976A of Item entities 30974A for each RFQResult entity 30936A. The Item entity 30974A includes an ID 30982A and a HierarchyRelationship 30990A. The ID 30982A is of type GDT 30986A BusinessTransactionDocumentItemID 30988A, and there is one 30984A ID 30982A for each Item entity 30974A. There is one or zero 30992A HierarchyRelationship 30990A for each Item entity 30974A. The HierarchyRelationship 30990A includes a ParentitemID 30994A, which is of type GDT 30998A BusinessTransactionDocumentItemID 30900B, and a TypeCode 30902B which is of type GDT 30906B BusinessTransactionDocumentItemHierarchyRelationshipTypeCode 30908B. There is one 30996A ParentItemID 30994A for each HierarchyRelationship 30990A, and there is one 30904B TypeCode 30902B for each HierarchyRelationship 30990A.

The BusinessTransactionDocumentReference package 30910B includes a QuoteReference entity 30914B. The QuoteReference entity 30914B is of type GDT 30918B BusinessTransactionDocumentReference 30920B. There is one or zero 30916B QuoteReference entities 30914B for each Item entity 30974A. The QuoteReference entity 30914B includes an ID 30922B, is one 24B ID 30922B for each QuoteReference entity 30914B is of type GDT 30926B BusinessTransactionDocumentID 30928B. The QuoteReference entity 30914B also includes an ItemID 30930B. There is any number of ItemID entity 30930B for each QuoteReference entity 30914B. The ItemID is of type GDT 30934B BusinessTransactionDocumentItemID 30936B.

The ScheduleLine package 30912B includes a ScheduleLine entity 30938B having an ID 30946B, a DeliveryPeriod 30954B, and a Quantity 30962B. The ScheduleLine entity 30938B has zero or one occurrence 30940B for each Item entity 30974A, and a data type AGDT 30942B RFQResultItemScheduleLine 30944B. The ID 30946B has one or zero occurrence 30948B for each QuoteReference entity 30914B and a data type of GDT 30950B BusinessTransactionDocumentItemScheduleLineID 30952B. The DeliveryPeriod 30954B has one occurrence 30956B for each QuoteReference entity 30914B a data type of AGDT 30958B DateTimePeriod 30960B. The Quantity 30962B has one or zero occurrences 30964B for each QuoteReference entity 30914B a data type of GDT 30966B Quantity 30968B.

f) Catalogue Interfaces

The Catalogue interfaces, such as the CatalogueUpdateNotification interface and the CataloguePublicationRequest interface, allow for the creation of a catalogue from other catalogues and the management of electronic publication or viewing of the catalogue for a company or enterprise. In particular, the CatalogueUpdateNotification interface allows a catalogue to be received from an external source (e.g., a supplier or other external catalogue provider) and loaded into a Catalogue Authoring Tool (CAT). The CatalogueUpdateNotification interface is compatible to other international standardized interfaces such as eCX and BMEcat and may be considered a B2B interface. The CataloguePublicationRequest interface allows the Catalogue Authoring Tool or company-internal authoring environment to publish the catalogue to a Catalogue Search Engine for employees, customers, or other users to access the catalogue in accordance with the CataloguePublicationRequest. In addition, another set of Catalogue interfaces described herein allows for the confirmation of the catalogue transmission to the Catalogue Search Engine and for the catalogue publication by the Catalogue Search Engine. Yet another set of Catalogue interfaces allows for the cancellation of the catalogue transmission to the Catalogue Search Engine and for locking or revoking publication of identified items of the catalogue by the Catalogue Search Engine.

Catalogues may be of interest for various business scenarios, each scenario usually leading to somewhat different types of catalogues and different types of objects described within the catalogues. In accordance with methods and systems consistent with the present invention, Catalogue interfaces are provided for managing the content of catalogues, such as product catalogues used for purchasing or supplier catalogues for selecting and managing suppliers. For example, a company may use catalogues for the procurement of various products for company employees. Employees may enter the procurement portal associated with the Catalogue Search Engine, browse through a catalogue supported by the Catalogue Search Engine, and add selected products to their respective shopping basket. As discussed below, an internal company catalogue produced by the Catalogue Authoring Tool may include items of several supplier catalogues. To produce the internal catalogue, the Catalogue Manager may upload the supplier catalogues into the Catalogue Authoring Tool and build the internal company catalogue using the Catalogue Authoring Tool. The Catalogue Manager, via the Catalogue Authoring Tool, may structure the catalogue into sections and identify which items to include from the supplier catalogues. In addition, the Catalogue Manager, via the Catalogue Authoring Tool, may enrich the internal catalogue data by, for example, adding suitable descriptions, graphics and characteristics in association with a catalogue item before sending a CataloguePublicationRequest to the Catalogue Search Engine to publish the catalogue.

(1) Message Types

There are eight message types in total that are used in order to transmit and maintain catalogues in accordance with the present invention. Methods and systems consistent with the present invention use the package template for Master Data depicted in FIG. 270C to derive the Catalogue interfaces.

(a) Catalogue Update Notification

A CatalogueUpdateNotification message is a notification about a new, changed or deleted catalogue by a Catalogue Provider to an interested party, such as the Catalogue Authoring Tool and the Catalogue Manager. The structure of message type CatalogueUpdateNotification message is generated based on the structure of message data type CatalogueUpdateMessage. A CatalogueUpdateNotification message may be split into several transmission packages.

(b) Catalogue Publication Request

A CataloguePublicationRequest message is the request from the Catalogue Authoring Tool to the Catalogue Search Engine (or publishing system) to publish a new or changed catalogue or to delete an already published catalogue. The structure of message type CataloguePublicationRequest message is generated based on the structure of message data type CataloguePublicationMessage. The CataloguePublicationRequest message may be split into several transmission packages.

(c) Catalogue Publication Transmission Package Notification

A CataloguePublicationTransmissionPackageNotification message is the notification of the Catalogue Search Engine to Catalogue Authoring Tool about a package of a Catalogue publication transmission and information about the reception of the package and the validity of the package's content. The structure of message type CataloguePublicationTransmissionPackageNotification message is generated based on the structure of message data type CataloguePublicationTransmissionPackageMessage.

(d) Catalogue Publication Confirmation

A CataloguePublicationConfirmation message is the confirmation by the Catalogue Search Engine to the Catalogue Authoring Tool whether the publication or deletion of a catalogue identified by a CataloguePublicationRequest message was successful or not. The structure of message type CataloguePublicationConfirmation message is generated based on the structure of message data type CataloguePublicationConfirmationMessage in FIG. 367.

(e) Catalogue Publication Transmission Cancellation Request

A CataloguePublicationTransmissionCancellationRequest message is the request of the Catalogue Authoring Tool to the Catalogue Search Engine to cancel the transmission of a catalogue and to restore an earlier published state (if such exists) of the catalogue. The structure of the CataloguePublicationTransmissionCancellationRequest message is generated based on the structure of message data type CataloguePublicationTransmissionCancellationRequestMessage. In one implementation, the CataloguePublicationTransmissionCancellationRequest message is used to cancel an ongoing publication and not to de-publish an already successfully published catalogue.

(f) Catalogue Publication Transmission Cancellation Confirmation

A CataloguePublicationTransmissionCancellationConfirmation message is the confirmation of Catalogue Search Engine whether the transmission of a catalogue has been cancelled successfully and an earlier published state of this Catalogue (if such exists) has been restored or not. The structure of message type CataloguePublicationTransmissionCancellationConfirmation is generated based on the structure of message data type CataloguePublicationTransmissionCancellationConfirnationMessage.

(g) Catalogue Publication Transmission Item Lock Request

A CataloguePublicationTransmissionItemLockRequest message is the request of Catalogue Authoring Tool to lock identified items of the catalogue included in the catalogue publication transmission. To lock means that if the catalogue is not yet published, the identified items are not published, and if the catalogue is already published, the publication of the identified items is revoked. The structure of message type CataloguePublicationTransmissionItemLockRequest message is generated based on the structure of message data type CataloguePublicationTransmissionItemLockRequestMessage.

(h) Catalogue Publication Transmission Item Lock Confirmation

A CataloguePublicationTransmissionItemLockConfirmation message is the confirmation of the Catalog Search Engine to the Catalog Authoring Tool whether identified items of the catalogue included in the catalog publication transmission are locked or not. The structure of message type CataloguePublicationTransmissionItemLockConfirmation message is generated based on the structure of message data type CataloguePublicationTransmissionItemLockConfirmationMessage.

(i) Catalogue Publication Transmission Content Change Request

A CataloguePublicationTransmissionContentChangeRequest is the request of Catalog Authoring to Catalog Search Engine to change, create or to delete a limited number of catalog items contained in the cata-log publication transmission. A message type CataloguePublicationTransmissionContentChangeRequest has the structure of message data type CataloguePublicationTransmissionContentChangeRequestMessage.

Several CataloguePublicationTransmissionContentChangeRequests may run in parallel if they are disjoint. The sending application may have to ensure that this is the case. A CataloguePublicationTransmissionContentChangeRequest should not run in parallel with a CataloguePublicationRequest for the same catalog.

This request should not be split into several messages—in contrast to the transmission of an entire catalog using a CatalogPublicationRequest. The sender must ensure that the number of items is small enough to allow communicating and processing the request as a single message. This request does not result in a new catalog version—in contrast to the CatalogPublication Re-quest. Locks on items resulting from one or more predecessor messages CataloguePublicationTransmissionItemLockRequest can be removed—if there exist any.

(j) Catalogue Publication Transmission Content Change Confirmation

A CataloguePublicationTransmissionContentChange-Confirmation is the confirmation of Catalog Search Engine (the publishing system) to Catalog Authoring whether a limited number of catalog items contained in the catalog publication transmission could be changed, created or deleted as requested by a CataloguePublicationTransmissionContentChangeRequest or not. Structure The structure of message type CataloguePublicationTransmissionContentChangeConfirmation is given by the structure of message data type CataloguePublicationTransmissionContentChangeConfirmationMessage. Either all Items could be updated, created, deleted, or none.

(2) Message Choreography

FIG. 359 depicts the message choreography for Catalog Interfaces. The choreography involves three business entities a Catalogue Provider 35902, a Catalogue Authoring Tool (CAT) 35904, and a Catalogue Search Engine (CSE) 35906. The following message choreography describes the possible sequence of the messages that can be used to realize the scenario between the Catalog Provider server 35900, a Catalog Authoring Tool server 35902, and the Catalog Search Engine server 35904. A CatalogueUpdateNotification message 35906 is sent from the Catalog Provider server 35900 to the Catalog Authoring Tool server 35902. The CatalogueUpdateNotification message 35906 is a notice from a catalogue provider to an interested party about a new catalogue transmitted in the message or about changes to an existing catalogue transmitted in the message.

A CataloguePublicationRequest message 35908 is sent from the Catalog Authoring Tool server 35902 to the Catalog Search Engine server 35904. The CataloguePublicationRequest message 35908 is a request from catalogue authoring to the Catalogue Search Engine (the publishing system) to publish a new or changed catalogue or to delete an already published catalogue (the catalogue is possibly split into several transmission packages).

A message 35910 is sent from the Catalog Search Engine server 35904 to the Catalog Authoring Tool server 35902. The CataloguePublicationTransmissionPackageNotification is the notification of the Catalogue Search Engine (the publishing system) to Catalogue Authoring about a package of a catalogue publication transmission and information about the reception of this package and the validity of its content.

A CataloguePublicationConfirmation message 35912 is sent from the Catalog Search Engine server 35904 to the Catalog Authoring Tool server 35902. The CataloguePublicationConfirmation message 35912 is the confirmation of the Catalogue Search Engine (the publishing system) to Catalogue Authoring whether the publication or deletion of a catalogue requested by a CataloguePublicationRequest was successful or not.

A CataloguePublicationTransmissionCancellationRequest message 35914 is sent from the Catalog Authoring Tool server 35902 to the Catalog Search Engine server 35904. The CataloguePublicationTransmissionCancellationRequest message 35914 is the request of Catalogue Authoring to Catalogue Search Engine (the publishing system) to cancel the transmission of a catalogue and to restore an earlier published state (if such exists) of the catalogue. Moreover, no more packages are sent for this transmission.

A CataloguePublicationTransmissionCancellationConfirmation message 35916 is sent from the Catalog Search Engine server 35904 to the Catalog Authoring Tool server 35902. The CataloguePublicationTransmissionCancellationConfirmation message 35916 is the confirmation of Catalogue Search Engine (the publishing system) whether the transmission of a catalogue has been cancelled successfully and an earlier published state of this catalogue (if such exists) has been restored or not.

A CataloguePublicationTransmissionItemLockRequest message 35918 is sent from the Catalog Authoring Tool server 35902 to the Catalog Search Engine server 35904. The CataloguePublicationTransmissionItemLockRequest message 35918 is the request of Catalogue Authoring to lock single items of the catalogue contained in the catalogue publication transmission.

A CataloguePublicationTransmissionItemLockConfirmation message 35920 is sent from the Catalog Search Engine server 35904 to the Catalog Authoring Tool server 35902. The CataloguePublicationTransmissionItemLockConfirmation message 35920 is the confirmation of Catalogue Search Engine (the publishing system) to Catalogue Authoring whether single items of the catalogue contained in the catalogue publication transmission could be locked or not. To lock means that if the catalogue is not yet published the items must not be published and if the catalogue is already published, the publication of these items must be revoked.

A CataloguePublicationTransmissionContentChangeRequest message 35922 is sent from the Catalog Authoring Tool server 35902 to the Catalog Search Engine server 35904. The CataloguePublicationTransmissionContentChangeRequest message 35922 is the request of Catalogue Authoring to change items of the catalogue contained in the catalogue publication transmission.

A CataloguePublicationTransmissionContentChangeConfirmation message is sent from the Catalog Search Engine server 35904 to the Catalog Authoring Tool server 35902. The CataloguePublicationTransmissionContentChangeConfirmation message is the confirmation of Catalogue Search Engine (the publishing system) to Catalogue Authoring whether single items of the catalogue contained in the catalogue publication transmission could be changed or not.

(3) Message Serialization

All messages may be asynchronous in nature. Request messages may be sent to an Exchange Infrastructure (not shown in FIG. 359) with quality of service EQIO (exactly once, in order) so that the messages of the same type (e.g., CataloguePublicationRequest message 35910) are received in the Catalogue Search Engine 35906 in the order they were sent out of the Catalogue Authoring Tool 35904.

(4) Error Handling

Each response message (e.g., CataloguePublicationTransmissionPackageNotification message) from the Catalogue Search Engine 35906 may include a 'BusinessTransactionCompletedIndicator' which specifies whether the corresponding request message was processed successfully. If the request message was not processed successfully, a 'TransmissionLog' includes information identifying why the message was not processed, i.e. processing errors that occurred. The request messages (e.g., CataloguePublicationRequest message 35912) may specify in 'MinimumRequestedLogItemSeverityCode' what level of information shall be returned by the response messages, i.e. detailed information on successful processing, warnings, application errors, or aborts.

(5) Message Data Type Catalogue Update Message

The data model for the message data type CatalogueUpdateMessage used to implement a CatalogueUpdateNotification 35908 is depicted in FIG. 360. The message data type CatalogueUpdateMessage includes a CatalogueUpdateMessage package 36002. The CatalogueUpdateMessage package 36002 includes a MessageHeader package 36004, a TransmissionInformation package 36006, a Catalogue package 36008, and a CatalogueupdateMessage entity 36010.

(a) Message Header Package

The MessageHeader package 36004 groups the business-related information relevant for sending a Business Document in a message. The MessageHeader package 36004 includes a MessageHeader entity 36012. There is a 1:1 relationship 36014 between the CatalogueUpdateMessage entity 36010 and the MessageHeader entity 36012. The MessageHeader entity 36012 includes a SenderParty entity 36016. There is a 1:c relationship 36018 between the MessageHeader entity 36012 and the SenderParty entity 36016.

The MessageHeader groups the business-related information from the sending application's point of view for identifying the Business Document in a message, information about the sender, and potentially information about the receiver. The MessageHeader entity 36012 is of type GDT BusinessDocumentMessageHeader.

The SenderParty is the party responsible for sending of a business document on a business-related application level. The SenderParty entity 36016 is of type GDT BusinessDocumentMessageHeaderParty.

(b) Transmission Information Package

The TransmissionInformation package 36006 groups the information pertaining to the transmission of the object or entity (e.g., the CatalogueUpdateMessage entity 36010) included in the message. The TransmissionInformation package 36006 includes a TransmissionHeader entity 36020. There is a 1:c relationship 36022 between the CatalogueUpdateMessage entity 36010 and the TransmissionHeader entity 36020. A TransmissionHeader entity 36020 provides information about the identification of a transmission (and one or more of the TransmissionHeader entity's packages). Additionally the minimum requested severity of events occurring during the processing of the transmission which have to be logged and returned may be specified. The TransmissionHeader entity 36020 includes an ID, a PackageOrdinalNumberValue, a PackageTotalNumberValue, and a MinimumRequestedLogItemSeverityCode.

The ID is a unique identification number grouping several data packages into one Catalogue transmission, and is of type GDT Transmission ID. The PackageOrdinalNumberValue specifies the sequence number identifying a data package in a multiple data package transmission, and is of type GDT OrdinalNumberValue. The PackageTotalNumberValue specifies the total number of data packages making up a Catalogue transmission, and is of type GDT TotalNumberValue. The MinimumRequestedLogItemSeverityCode specifies the severity of log items to be returned by messages CataloguePublicationTransmissionPackageNotification and CataloguePublicationConfirmation, and is of type GDT LogItemSeverityCode.

Catalogues often contain such a large amount of data that they may not be exchanged in one single message. Large catalogues are therefore split into smaller part messages (e.g., CatalogueUpdateNotification messages) each of which is transmitted separately.

(c) Catalogue Package

The Catalogue package 36008 groups the information necessary to describe the structure and content of a Catalogue. The Catalogue package 36008 includes a GlobalInformation package 36024, a CatalogueModel ("Model") package 36026, a CatalogueContent ("Content") package 36028, and a Catalogue entity 36030. There is a 1:1 relationship 36032 between the CatalogueUpdateMessage entity 36010 and the Catalogue entity 36030.

(i) Catalogue Entity

The Catalogue entity 36030 may correspond to a new, changed or deleted Catalogue. A Catalogue entity 36030 is a structured directory of Catalogue items. Each item represents an object, and provides information about the object. The Catalogue entity 36030 references global information (e.g., as implemented in the GlobalInformation package), model information (e.g., as implemented in the CatalogueModel package) and content information (e.g., as implemented in the GlobalInformation package). The global information provides information relevant to the entire Catalogue. The model information defines the structure of the Catalogue content and the properties used to describe this content. Content information includes the items of the Catalogue and each of the items structural assignment within the Catalogue structure.

The Catalogue entity 36030 may include the following elements or attributes:

1) @LanguageCode, which specifies the language for a description or name associated with the Calalogue. The @LanguageCode is of type GDT: LanguageCode.

2) @currencyCode, which specifies the currency in an element Amount. The @currencyCode is of type GDT: CurrencyCode.

3) @unitCode, which specifies the unit code in an element Quantity. The @unitCode is of type GDT: MeasureUnitCode 4) @actionCode, which specifies the operation to be performed on the complete catalogue. The @actionCode is of type GDT: ActionCode.

5) ID, which identifies the Catalogue being transmitted. The ID is of type GDT: CatalogueID.

6) VersionID, which identifies the version of the Catalogue being transmitted. The VersionID is of type GDT: VersionID.

7) Name, which identifies a name for the entire Catalogue in a language identified by @LanguageCode. The Name is of type GDT: Name.

8) TypeCode, which specifies the type of Catalogue being transmitted. For example, TypeCode may indicate the type as a supplier catalogue or purchasing catalogue. The TypeCode is of type GDT: CatalogueTypeCode.

9) ValidityPeriod, which specifies the period during which the Catalogue is valid. The ValidityPeriod is of type GDT: DateTimePeriod.

For example, the Catalogue may be a products or parts Catalogue that corresponds to a directory of objects of type "product" providing information about products. In this example, the Catalogue facilitates finding products matching certain criteria specified by an actor (e.g., a catalogue user) and that may then be used in an associated business process. The business process may be for example "procurement," in which case the Catalogue is a "purchasing catalogue" or a "spare parts catalogue," or "sales catalogue." In case of a "sales catalogue," information from the Catalogue may be provided such that the products seem especially appealing to the target group the Catalogue addresses. Alternatively, the Catalogue may correspond to a supplier directory of objects of type "supplier" used in a procurement process.

(ii) Catalogue Global Information Package

The GlobalInformation package 36024 groups the information relevant to the entire catalogue. The GlobalInformation package 36024 includes a ProviderPropertyValuation entity 36034. There is a 1:cn relationship 36036 between the Catalogue entity 36030 and the ProviderPropertyValuation entity 36034.

The ProviderPropertyValuation valuates properties provided by the Catalogue provider to provide additional information about the Catalogue (e.g., any information about the vendor/s, Catalogue creation date, or Notes). The ProviderPropertyValuation entity 36034 is of type GDT: PropertyValuation, and uses PropertyReference and PropertyValue elements. The PropertyReference specifies the property that is being valuated. The PropertyReference is of type GDT: PropertyReference. The PropertyValue specifies the value of the property. The PropertyValue is of type GDT PropertyValue. As further discussed below, the PropertyValue includes the following elements: AmountSpecification, QuantitySpecification, DecimalSpecification, FloatSpecification, IntegerSpecification, DateTimeSpecification, NameSpecification, and IndicatorSpecification.

(iii) Catalogue Model Package

The CatalogueModel package 36026 includes a PropertyDefinitionClass package 36037, a PropertyDataType package 36038, a Property package 36040, a CatalogueItemProperty 36041, a CatalogueSectionType package 36042, a CatalogueSchema package 36044, and CatalogueModel entity 36046. There is a 1:c relationship 36048 between the Catalogue entity 36030 and the CatalogueModel entity 36046.

(a) Catalogue Model

The CatalogueModel describes and structures the Catalogue content using systems of categories to group Catalogue items and properties that may be attributed to the Catalogue items or the categories themselves or both. The CatalogueModel entity 36046 identifies information regarding how the Catalogue content is structured and defined. The Catalogue Model entity 36046 defines properties, the data types of the properties, and allowed values, which are used to describe catalogue sections and/or the items included in the Catalogue as identified in associated PropertyDataType package 36038 and Property package 36040. Additionally, the Catalogue Model entity 36046 specifies one or more schemas as identified in associated CatalogueSchema package 36044, which defines the structural composition of the Catalogue content by means of sections and relationships between these sections. The sections of a schema correspond to divided up Catalogue items and include properties used to describe the Catalogue items assigned to the respective schema section. The CatalogueModel entity 36046 may have multiple schemas. The CatalogueModel entity 36046 includes a PropertyDataTypeListCompleteTransmissionIndicator, a PropertyListCompleteTransmissionIndicator, a CatalogueSectionTypeListCompleteTransmissionIndicator, and a CatalogueSchemaListCompleteTransmissionIndicator. The PropertyDataTypeListCompleteTransmissionIndicator specifies whether the list of PropertyDataTypes has been transmitted completely. The PropertyDataTypeListCompleteTransmissionIndicator is of type GDT: CompleteTransmissionIndicator. The PropertyListCompleteTransmissionIndicator specifies whether the list of Properties has been transmitted completely. The PropertyListCompleteTransmissionIndicator is of type GDT: CompleteTransmissionIndicator. The CatalogueSectionTypeListCompleteTransmissionIndicator specifies whether the list of SectionTypes has been transmitted completely. The CatalogueSectionTypeListCompleteTransmissionIndicator is of type GDT: CompleteTransmissionIndicator. The CatalogueSchemaListCompleteTransmissionIndicator specifies whether the list of Schemas has been transmitted completely. The CatalogueSchemaListCompleteTransmissionIndicator is of type GDT: CompleteTransmissionIndicator.

(b) Catalogue Model Property Definition Class Package

The PropertyDefinitionClass package groups all information pertaining to property definition classes. It contains the PropertyDefinitionClass entity.

(i) Property Definition Class

A PropertyDefinitionClass defines the scope of properties used in the Catalog. The PropertyDefinitionClass is of type GDT PropertyDefinitionClass, where the elements/attributes ID, PrefferedName, and DefinedProperty (Reference and OrdinalNumberValue are used) are used. The element PropertyDefinitionClass may be restried to use only for properties that are components of a structured Property Data Type and acts only as a construct to bundle these properties. In variations, the sender of the message can not assume that the message receiver persists the transmitted ID's (e.g., assume they are transient).

(c) Catalogue Model Property Data Type Package

The PropertyDataType package 36038 groups the information pertaining to property data types. The PropertyDataType package 36038 includes a PropertyDataType entity 36050. The PropertyDataType defines the data type of properties used in the Catalogue to describe Catalogue sections and Catalogue items. The PropertyDataType entity 36050 is of type GDT PropertyDataType. There is a 1:cn relationship 36052 between the CatalogueModel entity 36046 and the PropertyDataType entity 36050.

The PropertyDataType entity 36050 includes an @actionCode, which specifies the operation to be performed on the Property, an ID, a PreferredName, a FormatCode, a MaximumTotalDigitNumberValue, and a FractionalDigitNumberValue. The PropertyDataType entity 36050 may also include an AllowedPropertyValueElement that has a PropertyValue.

(d) Catalogue Model Property Package

The Property package 36040 groups the information pertaining to properties used in the catalogue. The Property package 36040 includes a Property entity 36054. There is a 1:cn relationship 36056 between the CatalogueModel entity 36046 and the PropertyDataType entity 36054.

The Property specifies a property and additional information for it that may be used to describe and differentiate between items included or sections used within the catalogue. The Property entity 36054 is of type GDT Property, and includes the following elements: an @actionCode; an ID; a PreferredName; a PropertyDataTypeReference; an AspectID, which identifies an aspect in which the Property is used; a TargetInterfaceElementID, which identifies an element of an interface the Property may be mapped to; a MultipleValueIndicator, which indicates whether the Property may contain multiple values; a TextSearchableIndicator, which indicates whether the Property is qualified for "Text Search"; a ParametricSearchableIndicator, which indicates whether the Property is qualified for "Parametric Search"; and a ValuationRequiredIndicator, which indicates whether a valuation is mandatory on the object which includes this Property. The @actionCode specifies the operation to be performed on the Property.

(e) Catalogue Model Catalog Item Property Package

The CatalogueItemProperty package 36041 groups all information pertaining to catalog item properties used in the catalog. It contains the CatalogueItemProperty entity 36055.

(i) Catalogue Item Property

A CatalogueItemProperty entity 36055 specifies a property pertaining to each catalogue item together with its position in the full list of properties attributed to a catalogue item. It includes the elements PropertyReference and OrdinalNumberValue. PropertyReference, of type GDT PropertyReference, specifies a property, and only the element ID is used. OrdinalNumberValue, of type GDT OrdinalNumberValue, specifies the position of the property in the full list. In variations, only properties which are not component properties (see, e.g., GDT Property) may be assigned. It has a cardinality of 1:cn, as denoted by the relationship 36057.

(f) Catalogue Model Section Type Package

The CatalogueModelSectionType or CatalogueSectionType package 36042 groups the information necessary to define a section type. The CatalogueSectionType package 36042 includes a CatalogueSectionType entity 36058. The CatalogueSectionType entity 36058 describes the nature of Catalogue sections by defining properties for the description of sections of this type. There is a 1:cn relationship 36060 between the CatalogueModel entity 36046 and the CatalogueSectionType entity 36058. A CatalogueSectionType entity 36058 may include one or more SectionProperty entities 36062 each of which describes a respective Catalogue section of the CatalogueSectionType entity 36058. Thus, there is a 1:cn relationship 36064 between the CatalogueSectionType entity 36058 and each Property entity 36062.

The CatalogueSectionType entity 36058 includes the following elements: an @actionCode, an ID, and a Name. The @actionCode is of type GDT: Action Code and specifies the operation to be performed on the CatalogueSectionType. The ID is of type GDT: SectionTypeID and identifies the CatalogueSectionType. The Name is of type GDT: Name and provides a name for the CatalogueSection type in a language identified by @LanguageCode of the Catalogue.

The SectionProperty specifies a property pertaining to a Section type together with its position in the list of properties. This property should be attributed to the sections of this Section type. The SectionProperty entity 36062 includes a PropertyReference and a OrdinalNumberValue. The PropertyReference is of type GDT: PropertyReference and includes an ID that identifies the property. The OrdinalNumberValue is of type GDT: OrdinalNumberValue and provides the information about the place in the list of SectionProperty entities 36062.

(g) Catalogue Model Schema Package

The CatalogueModelSchema or CatalogueSchema package 36044 groups the information pertaining to a Catalogue schema. It includes a CatalogueSchema entity 36066. The CatalogueSchema entity 36066 defines a structural composition of the Catalogue content in accordance with a pre-determined purpose. There is a 1:cn relationship 36068 between the CatalogueModel entity 36046 and the CatalogueSchema entity 36066. The CatalogueSchema entity 36066 may include one or more CatalogueItemProperty entities 36070, each of which describes a respective Catalogue item of the CatalogueSchema entity 36066. In addition, the CatalogueSchema entity 36066 also may include one or more CatalogueSection entities 36072 and one or more CatalogueSectionRelationship entities 36074. There is a 1:cn relationship 36076 between the CatalogueSchema entity 36066 and the CatalogueItemProperty entity 36070. There is a 1:cn relationship 36078 between the CatalogueSchema entity 36066 and the CatalogueSection entity 36072. There is a 1:cn relationship 36080 between the CatalogueSchema entity 36066 and the CatalogueSectionRelationship entity 36074.

The CatalogueSchema entity 36066 includes an @actionCode, an ID, a TypeCode, a Name, a SectionListCompleteTransmissionIndicator, and a SectionRelationshipListCompleteTransmissionIndicator. The @actionCode is of type GDT: ActionCode and specifies the operation to be performed on the CatalogueSchema entity 36066. The ID is of type GDT: CatalogueSchemaID and identifies the CatalogueSchema entity 36066. The TypeCode is of type GDT: CatalogueSchemaTypeCode and specifies the nature of the catalogue schema. The Name is of type GDT: Name and provides a name for a schema in a language identified by @Language- Code of the Catalogue. The SectionListCompleteTransmissionIndicator is of type GDT: CompleteTransmissionIndicator and specifies whether the list of sections has been transmitted completely. The SectionRelationshipListCompleteTransmissionIndicator is of type GDT: CompleteTransmissionIndicator and specifies whether the list of SectionRelationships has been transmitted completely. The CatalogueSchema supports a specific business process or addresses a specific target group. Thus, the CatalogueSchema may include multiple schemas.

(i) Catalogue Item Property

The CatalogueItemProperty entity 36070 specifies a property pertaining to a catalogue item and the CatalogueItemProperty's 36070 position in the list of properties attributed to the catalogue item. The CatalogueItemProperty entity 36070 includes a PropertyReference of type GDT: PropertyReference and an OrdinalNumberValue of type GDT: OrdinalNumberValue. The PropertyReference has an ID that identifies the property associated with the catalogue item. The OrdinalNumberValue specifies the CatalogueItemProperty's position in the list of properties attributed to the catalogue item.

(ii) Catalogue Section

Each CatalogueSection entity 36072 corresponds to a respective set of catalogue items in accordance with the CatalogueSchema 36066. Each CatalogueSection entity 36072 specifies properties which may be used to describe the set of catalogue items. Each CatalogueSection entity 36072 may include one more PropertyValuation entities 36082 and one or more CatalogueItemProperty entities 36084. Thus, there is a 1:cn relationship 36086 between the CatalogueSection entity 36072 and the PropertyValuation entity 36082. There is also a 1:cn relationship 36088 between the CatalogueSection entity 36072 and the CatalogueItemProperty entity 36084.

Each CatalogueSection entity 36072 may also include an @actionCode, a @propertyValuationListCompleteTransmissionIndicator, an ID, a TypeID, and a Name. The @actionCode is of type GDT: ActionCode and specifies the operation to be performed on the respective CatalogueSection entity 36072. The ID is of type GDT: CatalogueSectionID and identifies respective CatalogueSection entity 36072. The @propertyValuationListCompleteTransmissionIndicator specifies whether the list of PropertyValuations is transmitted completely and is of type GDT: CompleteTransmissionIndicator. The TypeID is of type GDT: CatalogueSectionTypeID and identifies a Section type to which the respective CatalogueSection entity 36072 belongs. The Name is of type GDT: Name and provides a name for the respective CatalogueSection entity 36072 in a language identified by @LanguageCode of the Catalogue entity 36030.

(iii) Catalogue Section Property Valuation

Each Property Valuation or CatalogueSectionPropertyValuation entity 36082 includes the value of a property that may be attributed to or is used to describe the CatalogueSection entity 36072 in accordance with a CatalogueSection type. The CatalogueSectionPropertyValuation entity 36082 is of type GDT PropertyValuation and has a PropertyReference of type GDT: PropertyReference and a PropertyValue of type GDT: PropertyValue. The PropertyReference references a valuated property defined in the CatalogueSectionType corresponding to the CatalogueSection.

(iv) Catalogue Section Catalogue Item Property

Each CatalogueItemProperty or CatalogueSectionCatalogueItemProperty entity 36084 specifies a property pertaining to the catalogue items or objects associated with the respective CatalogueSection. The CatalogueSectionCatalogueItemProperty entity 36084 also specifies the property's position in the full list of properties attributed to a catalogue item. The CatalogueSectionCatalogueItemProperty entity 36084 includes a PropertyReference of type GDT: PropertyReference and an OrdinalNumberValue of type GDT: OrdinalNumberValue. Each CatalogueSectionCatalogueItemProperty entity 36084 refers to a property defined as part of the CatalogueModel and may not be attributed to the catalogue items within the Catalogue.

(v) Catalogue Section Relationship

Each CatalogueSectionRelationship entity 36074 specifies a connection between two CatalogueSection entities 36072 within a CatalogueSchema entity 36066. In one implementation, each CatalogueSectionRelationship entity 36074 corresponds to a parent-child connection between two CatalogueSection entities 36072, providing a hierarchical structure to the Catalogue entity 36030. The CatalogueSectionRelationship entity 36074 includes an @actionCode, a SourceCatalogueSectionID, and a TargetCatalogueSectionID. The @actionCode is of type GDT: ActionCode and specifies the operation to be performed on the corresponding CatalogueSectionRelationship entity 36074. The SourceCatalogueSectionID is of type GDT: CatalogueSectionID and identifies a source CatalogueSection entity 36072. The TargetCatalogueSectionID is of type GDT: CatalogueSectionID and identifies a target CatalogueSection entity 36072.

(iv) Catalogue Content Package

The Content or CatalogueContent package 36028 includes a CatalogueItem package 36090, a CatalogueView package 36092, and a CatalogueContent entity 36094. There is a 1:c relationship 36096 between the Catalogue entity 36030 and the CatalogueContent entity 36094. The CatalogueContent entity 36094 specifies the list of business objects included in the catalogue reflected by the Catalogue entity 36030, together with their relationships and descriptions according to the catalogue's schemas reflected by the CatalogueSchema entity 36066, and the views (e.g., CatalogueView) that are used to restrict the catalogue's information content for certain purposes. The CatalogueContent entity 36094 also specifies the items (e.g., CatalogueItem) included in the Catalogue entity 36030 and each item's classification or assignment to Catalogue sections reflected by the one or more CatalogueSection entities 36072. The CatalogueContent entity 36094 includes a CatalogueItemListCompleteTransmissionIndicator, a CatalogueItemRelationshipListCompleteTransmissionIndicator, a CatalogueViewListCompleteTransmissionIndicator, and a CatalogueSchemaID. The CatalogueItemListCompleteTransmissionIndicator is of type GDT: CompleteTransmissionIndicator and specifies whether the list of items (e.g., CatalogueItem entities 36098) has been transmitted completely. The CatalogueItemRelationshipListCompleteTransmissionIndicator is of type GDT: CompleteTransmissionIndicator and specifies whether the list of ItemRelationships (e.g., CatalogueItemRelationship entities 36000A) has been transmitted completely. The CatalogueViewListCompleteTransmissionIndicator is of type GDT: CompleteTransmissionIndicator and specifies whether the list of Views (e.g., CatalogueView entities 36018A) has been transmitted completely. The CatalogueSchemaID identifies a catalogue schema (e.g., a CatalogueSchema entity 36072) to which the respective CatalogueContent entity 36094 is assigned. In one implementation, The CatalogueSchemaID of a first of the CatalogueContent entities 36094 functions as a default value for remaining CatalogueContent entities 36094 without a specified CatalogueSchemaID.

(a) Catalogue Content Catalogue Item Package

The CatalogueItem package 36090 groups the information pertaining to catalogue items. The CatalogueItem package 36090 includes a CatalogueItem entity 36098 and a CatalogueItemRelationship entity 36000A. There is a 1:cn relationship 36002A between the CatalogueContent entity 36094 and the CatalogueItem entity 36098. There is a 1:cn relationship 36004A between the CatalogueContent entity 36094 and the CatalogueItemRelationship entity 36000A.

(i) Catalogue Item

The CatalogueItem entity 36098 specifies information about an object included and to be classified within the Catalogue entity 36030 in accordance with the Catalogue entity's 36030 schema as reflected by the CatalogueSchema entity 36066. The CatalogueItem entity 36098 includes a CatalogueItemDescription entity 36006A that describes the item reflected by the CatalogueItem entity 36098. The CatalogueItem entity 36098 may also include a CatalogueItemPropertyValuation entity 36008A and a CatalogueItemClassification entity 36010A. The CatalogueItem entity 36098 may further include an @actionCode and an ID. The @actionCode is of type GDT: ActionCode and specifies the operation to be performed on the item. The ID is of type GDT: CatalogueItemID and identifies the respective CatalogueItem entity 36098.

(ii) Catalogue Item Description

The CatalogueItemDescription entity 36006A is of type GDT: Description and provides a description for an item in a specified language. There is a 1:cn relationship 36012A between the CatalogueItem entity 36098 and the CatalogueItemDescription entity 36006A.

(iii) Catalogue Item Classification

The CatalogueItemClassification entity 36010A assigns the CatalogueItem entity 36098 to a respective CatalogueSection entity 36072 within one of the CatalogueSchema entities 36066 associated with the Catalogue entity 36030. The CatalogueItemClassification entity 36010A includes a SchemaID and a SectionID. The SchemaID is of type GDT: CatalogueSchemaID and identifies the schema (e.g., one of the CatalogueSchema entities 36066) that the CatalogueItem entity 36098 references. The SectionID is of type GDT: CatalogueSectionID and identifies the section (e.g., one of the CatalogueSection entities 36072) that the CatalogueItem entity 36098 references. There is a 1:cn relationship 36016A between the CatalogueItem entity 36098 and the CatalogueItemClassification entity 36006A.

(iv) Catalogue Item Property Valuation

The CatalogueItemPropertyValuation entity 36008A is of type GDT: PropertyValuation and specifies the value of a property that may be attributed to the object the CatalogueItem entity 36098 represents in accordance with one of the CatalogueSchema entities 36066. The CatalogueItemPropertyValuation entity 36008A includes a PropertyReference and a PropertyValue. The PropertyReference is of type GDT: PropertyReference and is the reference to the property to be valuated for the CatalogueItem entity 36098. The PropertyValue is of type GDT: PropertyValue and is the value of the property reflected by the PropertyReference. There is a 1:cn relationship 36014A between the CatalogueItem entity 36098 and the CatalogueItemPropertyValuation entity 36008A.

(v) Catalogue Item Relationship

The CatalogueItemRelationship entity 36000A specifies a relationship with certain semantics between any two CatalogueItem entities 36098. The CatalogueItemRelationship entity 36000A includes an @actionCode, a SourceCatalogueItemID, a TargetCatalogueItemID, and a TypeCode. The @actionCode is of type GDT: ActionCode and specifies the operation to be performed on the relationship between the two CatalogueItem entities 36098. The SourceCatalogueItemID is of type GDT: CatalogueItemID and identifies the source CatalogueItem entity 36098. The TargetCatalogueItemID is of type GDT: CatalogueItemID and identifies the target CatalogueItem entity 36098. The TypeCode is of type GDT: ObjectStructureRelationshipTypeCode and specifies the semantics of the relationship existing between the source CatalogueItem entity 36098 and the target CatalogueItem entity 36098.

(b) Catalogue Content Catalogue View Package

The CatalogueView package 36092 groups the information pertaining to Catalogue views. The CatalogueView package 36092 includes a CatalogueView entity 36018A. There is a 1:cn relationship 36020A between the CatalogueContent entity 36094 and the CatalogueView entity 36018A.

(i) Catalogue View

The CatalogueView entity 36018A defines a subset of a Catalogue by specifying schemas, sections, Catalogue items and item relationship types to be included and properties to be excluded from a catalogue view. The CatalogueView entity 36018A may include a CatalogueViewSchema entity 36022A, a CatalogueViewItem entity 36024A and a CatalogueViewItemRelationshipType entity 36026A. In addition, the CatalogueView entity 36018A may include a CatalogueViewExcludedProperty entity 36028A, which specifies properties not to be included in the view. The CatalogueView entity 36018A includes an @actionCode, an ID, a Name, an ItemListCompleteTransmissionIndicator, an ItemRelationshipTypeListCompleteTransmissionIndicator, and an ExcludedPropertyListCompleteTransmissionIndicator. The @actionCode is of type GDT: ActionCode and specifies the operation to be performed on the CatalogueView entity 36018A. The ID is of type GDT: CatalogueViewID and identifies a view ID. The Name is of type GDT: Name and provides a name for the view in various languages. The ItemListCompleteTransmissionIndicator is of type GDT: CompleteTransmissionIndicator and specifies whether the item list has been transmitted completely. The ItemRelationshipTypeListCompleteTransmissionIndicator is of type GDT: CompleteTransmissionIndicator and specifies whether the list of item relationships has been transmitted completely. The ExcludedPropertyListCompleteTransmissionIndicator is of type GDT: CompleteTransmissionIndicator and specifies whether the list of excluded properties has been transmitted completely. There is a 1:cn relationship 36030A between the CatalogueView entity 36018A and the CatalogueViewSchema entity 36022A. There is a 1:cn relationship 36032A between the CatalogueView entity 36018A and the CatalogueViewItem entity 36024A. There is a 1:cn relationship 36034A between the CatalogueView entity 36018A and the CatalogueViewItemRelationshipType entity 36026A. There is a 1:cn relationship 36036A between the CatalogueView entity 36018A and the CatalogueViewExcludedProperty entity 36026A.

(ii) Catalogue View Schema

The CatalogueViewSchema entity 36022A specifies a schema and a list of sections belonging to the schema that are to be included in a CatalogueView entity 36018A. The CatalogueViewSchema entity 36022A is subdivided into one or more CatalogueViewSchemaSection entities 36038A that specify Sections included in the CatalogueView entity 36018A. There is a 1:cn relationship 36040A between the CatalogueViewSchema entity 36022A and the CatalogueViewSchemaSection entity 36038A. The CatalogueViewSchema entity 36022A includes an ID and a SectionListCompleteTransmissionIndicator. The ID is of type GDT: CatalogueSchemaID and identifies the respective CatalogueViewSchema entity 36022A. The SectionListCompleteTransmissionIndicator is of type GDT: CompleteTransmissionIndicator and specifies whether the list of sections (e.g., one or more CatalogueViewSchemaSections) has been transmitted completely.

(iii) Catalogue View Schema Section

The CatalogueViewSchemaSection entity 36022 specifies a section of the referenced catalogue schema (e.g., CatalogueViewSchema entity 36022A) to be included in the catalogue view. The CatalogueViewSchemaSection entity 36022 includes an @actionCode is of type GDT: ActionCode and an ID is of type GDT: CatalogueSectionID. The @actionCode specifies the operation to be performed on the CatalogueViewSchemaSection entity 36022 identified by the ID.

(iv) Catalogue View Item

The CatalogueViewItem entity 36024A specifies a CatalogueItem entity 36098 to be included in the catalogue view. The CatalogueViewItem entity 36024A includes an @actionCode of type GDT: ActionCode and an ID of type GDT: CatalogueItemID. The @actionCode specifies the operation to be performed on the CatalogueViewItem entity 36024A identified by the ID.

(v) Catalogue View Item Relationship Type

The CatalogueViewItemRelationshipType entity 36026A specifies a catalogue item relationship type. In one implementation, the catalogue item relationships of the CatalogueViewItemRelationshipType entity 36026A are included in the catalogue view. CatalogueViewItemRelationshipType entity 36026A includes an @actionCode of type GDT: ActionCode and a Code of type GDT: ObjectStructureRelationshipType Code. The @actionCode specifies the operation to be performed on the item relationship type identified by the Code.

(vi) Catalogue View Excluded Property

The CatalogueViewExcludedProperty 36028A specifies a property that is not included in the catalogue view. For example, a CatalogueViewExcludedProperty "Price" is defined in the CatalogueContent entity 36094 means that users that have access to the content of the respective catalogue reflected by the Catalogue entity 36030 may not see the price of catalogue items (e.g., CatalogueItem entities 36098) of the catalogue. The CatalogueViewExcludedProperty 36028A includes an @actionCode of type GDT: ActionCode and a PropertyReference of type GDT: PropertyReference. The @actionCode specifies the operation to be performed on an excluded property identified by the PropertyReference.

(d) Message Data Type—Element Structure

FIGS. 361A-AA depict the element structure for a CatalogueUpdateNotification message 3598. The element structure is similar to the data model, but provides additional information regarding the details of the interface. The element structure identifies the different packages 36100 in the interface, and represents the entities at various levels within the interface. As depicted in FIG. 361, the interface for CatalogueUpdateMessage includes six levels 36102, 36104, 36106, 36108, 36110, 36112, and 36114. The outermost package 36100 of this interface is a CatalogueUpdateMessage package 36120, which includes a CatalogueUpdateMessage entity 36122 at the first level 36102, a MessageHeader package 36128, a TransmissionInformation package 36162, and a Catalogue package 36104A. The CatalogueUpdateMessage entity 36122 is of a type MDT 36124 "CatalogueUpdateMessage" 36126.

The MessageHeader package 36128 includes a MessageHeader entity 36130 at the second level 36104. The MessageHeader entity 36130 is of a type GDT 36134 BusinessDocumentMessageHeader 36136, and there is one 36132 MessageHeader entity 36130 for each MessageHeader 36128.

The MessageHeader entity 36130 includes an ID 36138, CreationDateTime 36146, and SenderParty 36154 at the third level 36106. The ID 36138 is of a type GDT 36142 "BusinessDocumentMessageID" 36144 and there is one 36140 ID 36138 in a MessageHeader entity 36130. The CreationDateTime 36146 is of a type GDT 36150 "DateTime" 36152 and there is one 36148 CreationDateTime 36146 in a MessageHeader entity 36130. The SenderParty 36154 is of a type GDT 36158 "BusinessDocumentMessageHeaderParty" 36160 and there is zero or one 36156 SenderParty 36154 in a MessageHeader entity 36130.

The TransmissionInformation package 36162 includes TransmissionHeader entity 36164 at the second level 36104. The TransmissionHeader entity 36164 is of a type "BusinessDocumentTransmissionHeader" 36170 and there is zero or one 36166 TransmissionHeader entity 36164 in a TransmissionInformation package 36162.

The TransmissionInformationHeader 36164 includes an ID 36172, a PackageOrdinalNumberValue 36180, a PackageTotalNumberValue 36188, and a MinumumRequestedLogItemServerityCode 36196 at the third level 36106. The ID 36172 is of a type GDT 36176 "TransmissionID" 36178 and there is one 36174 ID 36172 in a TransmissionHeader 36164. The PackageOrdinalNumberValue 36180 is of a type GDT 36184 "OrdinalNumberValue" and there is one 36182 PackageOrdinalNumberValue 36180 in a TransmissionHeader 36164. The PackageTotalNumberValue 36186 is of a type GDT 36192 "TotalNumberValue" 36194 and there is zero or one 36190 PackageTotalNumberValue 36188 in a TransmissionHeader 36164. The MinimumRequestedLogItemServerityCode 36196 is of a type GDT 36100A "LogItemSeverityCode" 36102A and there is zero or one 36198 MinimumRequestedLogItemServerityCode in a TransmissionHeader 36164.

The Catalogue package 36104A includes a Catalogue entity 36106A at the second level 36104 and a GlobalInformation package 36118B, Model package 36190D, and Content package 36102K. The Catalogue entity 36106A is of a type "TransmissionCatalogue" 36112A and there is one 36108A in a Catalogue package 36104A.

The Catalogue entity 36106A includes an @actionCode 36114A, an @completeTransmissionIndicator 36122A, an @providerPropertyValuationListCompleteTransmissionIndicator 36130A, an @languageCode 36138A, an @currencycode 36146A, an @unitCode 36154A, an ID 36162A, a version ID 36170A, a Name 36178A, a TypeCode 36186A, and a ValidityPeriod 36194A at the third level 36106. The @actionCode 36114A is of a type GDT 36118A "ActionCode" 36120A, and there is zero or one 36116A @actionCode 36114A in a Catalogue entity 36106A. The @completeTransmissionIndicator 36122A is of a type GDT 36126A "CompleteTransmissionIndicator" 36128A, and there is zero or one 36124A @completeTransmissionIndicator 36122A in a Catalogue entity 36106A. The @providerPropertyValuationListCompleteTransmissionIndicator 36130A is of a type GDT 36134A "CompleteTransmissionIndicator" 36136A, and there is zero or one 36132A @providerPropertyValuationListCompleteTransmissionIndicator 36130A in a Catalogue entity 36106A. The @languageCode 36138A is of a type GDT 36142A "LanguageCode" 36144A, and there is zero or one 36140A @languageCode 36138A in a Catalogue entity 36106A. The @currencyCode 36146A is of a type GDT 36150A "CurrencyCode" 36152A, and there is zero or one 36148A @currencyCode 36146A in a Catalogue entity 36106A. The @unitCode 36154A is of a type GDT 36158A "MeasureUnitCode" 36160A, and there is zero or one 36156A @unitCode 36154A in a Catalogue entity 36106A. The ID 36162A is of a type GDT 36166A "CatalogueID" 36168A, and there is one 36164A ID 36162A in a Catalogue entity 36106A. The VersionID 36170A is of a type GDT 36174A "VersionID" 36176A, and there is zero or one 36172A VersionID 36170A in a Catalogue entity 36106A. The Name 36178A is of a type GDT 36182A "Name" 36184A, and there is any number of 36180A Name 36178A in a Catalogue entity 36106A. The TypeCode 36186A is of a type GDT 36190A "CatalogueTypeCode" 36192A, and there is one 36188A TypeCode 36186A in a Catalogue entity 36106A. The ValidityPeriod 36194A is of a type GDT 36198A "DateTimePeriod" 36100B, and there is zero or one 36196A ValidityPeriod 36194A in a Catalogue entity 36106A.

The ValidityPeriod 36194A includes a StartDateTime 36102B and an EndDateTime 36110B at the fourth level 36108. The StartDateTime 36102B is of a type GDT 36106B "DateTime" 36108B, and there is zero or one 36104B StartDateTime 36102B in a ValidityPeriod 36194A. The EndDateTime 36110B is of a type GDT 36114B "DateTime" 36116B, and there is zero or one 36112B EndDateTime 36110B in a ValidityPeriod 36194A.

The GlobalInformation package 36118B includes a ProviderPropertyValuation 36120B at the third level 36106. The ProviderPropertyValuation 36120B is of a type GDT 36124B "PropertyValuation" 36126B, and there is any number of 36122B ProviderPropertyValuation 36120B in a GlobalInformation 36118B.

The ProviderPropertyValuation 36120B includes an @actionCode 36128B, a PropertyReference 36136B, and a ValueGroup 36152B at the fourth level 36108. The @actionCode 36128B is of a type GDT 36132B "ActionCode" 36134B, and there is zero or one 36130B @actionCode 36128B in a ProviderPropertyValuation 36120B. The PropertyReference 36136B is of a type GDT 36140B "PropertyReference" 36142B, and there is one 36138B PropertyReference 36136B in a ProviderPropertyValuation 36120B.

The PropertyReference 36136B includes an ID 36144 B at the fifth level 36110. The ID 36144B is of a type GDT 36148B "PropertyID" 36150B, and there is one 36146B ID 36144B in a PropertyReference 36136B.

The ValueGroup 36152B is of a type GDT 36156B "PropertyValueIterator" 36158B, and there is any number 36154B of ValueGroup 36152B in a ProviderPropertyValuation 36120B.

The ValueGroup 36152B includes an ID 36160B, a ParentID 36168B, an OrdinalNumberValue 36176B, and a PropertyValue 36184B of the fifth level 36110. The ID 36160B is of a type CCT 36164B "Identifier" 36166B, and there is zero or one 36162B ID 36160B in a ValueGroup 36152B. The ParentID 36168B is of a type CCT 36172B "Identifier" 36174B, and there is zero or one 36170B ParentID 36168B in a ValueGroup 36152B. The OrdinalNumberValue 36176B is of a type GDT 36180B "OrdinalNumberValue" 36182B, and there is zero or one 36178B OrdinalNumberValue 36176B in a ValueGroup 36152B. The PropertyValue 36184B is of a type GDT 36188B "PropertyValue" 36190B, and there is any number of 36186B PropertyValue 36184B in a ValueGroup 36152B.

The PropertyValue 36184B includes an AmountSpecification 36192B, a Quantity Specification 36120C, a DecimalSpecification 36148C, a FloatSpecification 36176C, an IntegerSpecification 36104D, a DateTimeSpecification 36132D, a NameSpecification 36160D, and an IndicatorSpecification 36178D at the sixth level 36112. There is zero or one 36194B AmountSpecification 36192B in a PropertyValue 36184B.

The AmountSpecification 36192B includes an amount 36196B, a LowerAmount 36104C, and an UpperAmount 36112C of the seventh level 36114. The Amount 36196B is of a type GDT 36100C "Amount" 36102C, and there is zero or one 36198B Amount 36196B in a AmountSpecification 36192B. The LowerAmount 36104C is of a type GDT 36108C "Amount" 3611C, and there is zero or one 36106C LowerAmount 36104C in a AmountSpecification 36192B. The UpperAmount 36112C is of a type GDT 36116C "Amount" 36118C, and there is zero or one 36114C UpperAmount 36112C in a AmountSpecification 36192B.

There is zero or one 36122C QuantitySpecification 36120C in a PropertyValue 36184B. The QuantitySpecification 36120C includes a Quantity 36124C, a LowerQuantity 36132C, and an UpperQuantity 36140C at the seventh level 36114. The Quantity 36124C is of a type GDT 36128C "Quantity" 36130C, and there is zero or one 36126C Quantity 36124C in a QuantitySpecification 36120C. The LowerQuantity 36132C is of a type GDT 36136C "Quantity" 36138C, and there is zero or one 36134C LowerQuantity 36132C in a QuantitySpecification 36120C. The UpperQuantity 36140C is of a type GDT 36144C "Quantity" 36146C, and there is zero or one 36142C UpperQuantity 36140C in a QuantitySpecification 36120C.

There is zero or one 36150C DecimalSpecification 36148C in a PropertyValue 36184B. The DecimalSpecification 36148C includes a DecimalValue 36152C, a LowerDecimalValue 36160C, and an UpperDecimalValue 36168C at the seventh level 36114. The DecimalValue 36152C is of a type GDT 36156C "DecimalValue" 36158C, and there is zero or one 36154C DecimalValue 36152C in a DecimalSpecification 36148C. The LowerDecimalValue 36160C is of a type GDT 36164C "DecimalValue" 36166C, and there is zero or one 36162C LowerDecimalValue 36160C in a DecimalSpecification 36148C. The UpperDecimalValue 36168C is of a type GDT 36172C "DecimalValue" 36174C, and there is zero or one 36170C UpperDecimalValue 36168C in a DecimalSpecification 36148C.

There is zero or one 36178C FloatSpecification 36176C in a PropertyValue 36184B. the FloatSpecification 36176 includes a FloatValue 36180C, a LowerFloatValue 36188C, and an UpperFloatValue 36196C at the seventh level 36114. The FloatValue 36180C is of a type GDT 36184C "FloatValue" 36186C, and there is zero or one 36182 CFloatValue 36180C in a FloatSpecification 36176C. The LowerFloatValue 36188C is of a type GDT 36192C "FloatValue" 36194C, and there is zero or one 36190C LowerFloatValue 36188C in a FloatSpecification 36176C. The UpperFloatValue 36196C is of a type GDT 36100D "FloatValue" 36102D, and there is zero or one 36198C UpperFloatValue 36196C in a FloatSpecification 36176C.

There is zero or one 36106D IntegerSpecification 36104D in a PropertyValue 36184B. The IntegerSpecificaton 36104D includes an IntegerValue 36108D, a LowerIntegerValue 36116D, and an UpperIntegerValue 36124D at the seventh level 36114. The IntegerValue 36108D is of a type GDT 36112D "IntegerValue" 36114D, and there is zero or one 36110 DIntegerValue 36108D in a IntegerSpecification 36104D. The LowerIntegerValue 36116D is of a type GDT 36120D "IntegerValue" 36122D, and there is zero or one 36118D LowerIntegerValue 36116D in a IntegerSpecification 36104D. The UpperIntegerValue 36124D is of a type GDT 36128D "IntegerValue" 36130D, and there is zero or one 36126D UpperIntegerValue 36124D in a IntegerSpecification 36104D.

There is zero or one 36134D DateTimeSpecification 36132D in a PropertyValue 36184B. The DateTimeSpecification 36132D includes a DateTime 36136D, a StartDateTime 36144D, and an EndDateTime 36152D at the seventh level 36114. The DateTime 36136D is of a type GDT 36140D "DateTime" 36142D, and there is zero or one 36138D DateTime 36136D in a DateTimeSpecification 36132D. The StartDateTime 36144D is of a type GDT 36148D "DateTime" 36150D, and there is zero or one 36146D StartDateTime 36144D in a DateTimeSpecification 36132D. The EndDateTime 36152D is of a type GDT 36156D "DateTime" 36158D, and there is zero or one 36154D EndDateTime 36152D in a DateTimeSpecification 36132D.

There is zero or one 36162D NameSpecification 36160D in a PropertyValue 36184B. The NameSpecification 36160D includes a Name 36164D at the seventh level 36114. The Name 36164D is of a type GDT 36168D "Name" 36170D, and there is zero or one 36166D Name 36164D in a NameSpecification 36160D.

There is zero or one 36180D IndicatorSpecification 36178D in a PropertyValue 36184B. The The IndicatorSpecification 36178D includes an Indicator 36182D. The Indicator 36182D is of a type GDT 36186D "Indicator" 36188D, and there is zero or one 36184D Indicator 36182D in a IndicatorSpecification 36178D.

The Model package 36190D includes a Model entity 36192D at the third level 36106 and a PropertyDefinitionClass 36132E, a PropertyDataType package 36186E, a Propery package 36180F, a CatalogueItemProperty package 36194G, a CatalogueSectionType package 36128H, and a CatalogueSchema package 36194H. The Model entity 36192D is of a type "Catalogue Model" 36198D, and there is zero or one 36194D Model entity 36192D in a Model package 36190D.

The Model entity 36192D includes an @propertyDataTypeListCompleteTransmissionIndicator 36100E, an @propertyListCompleteTransmissionIndicator 36108E, an @catalogueSectionTypeListCompleteTransmissionIndicator 36116E, and an @catalogueSchemaListCompleteTransmissionIndicator 36124E at the fourth level 36108. The @propertyDataTypeListCompleteTransmissionIndicator 36100E is of a type GDT 36104E "CompleteTransmissionIndicator" 36106E, and there is zero or one 36102E @propertyDataTypeListCompleteTransmissionIndicator 36100E in a Model entity 36192D. The @propertyListCompleteTransmissionIndicator 36108E is of a type GDT 36112E "CompleteTransmissionIndicator" 36114E, and there is zero or one 36110E@propertyListCompleteTransmissionIndicator 36108E in a Model entity 36192D. The @catalogueSectionTypeListCompleteTransmissionIndicator 36116E is of a type GDT 36120E "CompleteTransmissionIndicator" 36122E, and there is zero or one 36118E @catalogueSectionTypeListCompleteTransmissionIndicator 36116E in a Model entity 36192D. The @catalogueSchemaListCompleteTransmissionIndicator 36124E is of a type GDT 36128E "CompleteTransmissionIndicator" 36130E, and there is zero or one 36126E @catalogueSchemaListCompleteTransmissionIndicator 36124E in a Model entity 36192D.

The PropertyDefinitionClass package 36132E includes a PropertyDefinitionClass entity 36134E at the fourth level 36108. The PropertyDefinitionClass entity 36134E is of a type GDT 36138E "PropertyDefinitionClass" 36140E, and there is any number of 36136E PropertyDefinitionClass entity 36134E in a PropertyDefinitionClass package 36132E.

The PropertyDefinitionClass 36134E includes an ID 36142E, a PreferredName 36150E, and a DefinedProperty 36158E at the fifth level 36110. The ID 36142E is of a type GDT 36146E "PropertyDefinitionClassID" 36148E, and there is one 36144E ID 36142E in a PropertyDefinitionClass 36134E. The PreferredName 36150E is of a type GDT 36154E "Name" 36156E, and there is one 36152E PreferredName 36150E in a PropertyDefinitionClass 36134E. There is any number of 36160E DefinedProperty 36158E in a PropertyDefinitionClass 36134E.

The DefinedProperty 36158E includes a Reference 36162E and an OrdinalNumberValue 36178E of the sixth level 36112. The Reference 36162E is of a type GDT 36166E "PropertyReference" 36168E, and there is one 36164E Reference 36162E in a DefinedProperty 36158E.

The Reference 36162E includes an ID 36170E at the seventh level. The ID 36170E is of a type GDT 36174E "PropertyID" 36176E, and there is one 36172E ID 36170E in a Reference 36162E.

The OrdinalNumberValue 36178E is of a type GDT 36182E "OrdinalNumberValue" 36184E, and there is zero or one 36180E OrdinalNumberValue 36178E in a DefinedProperty 36158E.

The PropertyDataType entity 36188E is of a type GDT 36192E "PropertyDataType" 36194E, and there is any number of 36190E PropertyDataType entity 36188E in a PropertyDataType package 36186E.

The PropertyDataType package 36186E includes a PropertyDataType entity 36188E at the fifth level 36110. The PropertyDataType entity 36188E is of a type GDT 36192E "PropertyReference" 36194E, and there is any number 36190E of PropertyDataType entity 36188E in a PropertyDataType package 36186E.

The PropertyDataType 36188E includes an @actionCode 36196E, an ID 36104F, a PreferredName 36112F, a FormatCode 36128F, a MaximumTotalDigitNumberValue 36136F, a FractionalDigitNumberValue 36144F, a PropertyDefinitionClassReference 36152F, and an AlloedPropertyValueElement 36168F at the fifth level 36110. The @actionCode 36196E is of a type GDT 36100F "ActionCode" 36102F, and there is zero or one 36198E @actionCode 36196E in a PropertyDataType 36188E. The ID 36104F is of a type GDT 36108F "PropertyDataTypeID" 36100F, and there is zero or one 36106F ID 36104F in a PropertyDataType 36188E. The PreferredName 36112F is of a type GDT 36116F "Name" 36118F, and there is one or more 36114F PreferredName 36112F in a PropertyDataType 36188E.

The PreferredName 36112F includes an @languageCode 36120F at the sixth level 36112. The @languageCode 36120F is of a type GDT 36124F "LanguageCode" 36126F, and there is zero or one 36122F@languageCode 36120F in a PreferredName 36112F.

The FormatCode 36128F is of a type GDT 36132F "PropertyDataTypeFormatCode" 36134F, and there is one 36130F FormatCode 36128F in a PropertyDataType 36188E. The MaximumTotalDigitNumberValue 36136F is of a type GDT 36140F "DigitNumberValue" 36142F, and there is zero or one 36138F MaximumTotalDigitNumberValue 36136F in a PropertyDataType 36188E. The FractionalDigitNumberValue 36144F is of a type GDT 36148F "DigitNumberValue" 36150F, and there is zero or one 36146F FractionalDigitNumberValue 36144F in a PropertyDataType 36188E. The PropertyDefinitionClassReference 36152F is of a type GDT 36156F "PropertyDefinitionClassReference" 36158F, and there is zero or one 36154F PropertyDefinitionClassReference 36152F in a PropertyDataType 36188E.

The PropertyDefinitionClassReference 36152F includes an ID 36160F at the sixth level 36112. The ID 36160F is of a type GDT 36164F "PropertyDefinitionClassID" 36166F, and there is one 36162F ID 36160F in a PropertyDefinitionClassReference 36152F.

There is any number of 36170F AllowedPropertyValueElement 36168F in a PropertyDataType 36188E. The AllowedPropertyValueElement 36168F includes a PropertyValue 36172F at the sixth level 36112. The PropertyValue 36172F is of a type GDT 36176F "PropertyValue" 36178F, and there is one 36174F PropertyValue 36172F in a AllowedPropertyValueElement 36168F.

The Property package 36180F includes a Property entity 36182F at the fourth level 36108. The Property entity 36182F is of a type GDT 36186F "Property" 36188F, and there is any number of 36184F Property entity 36182F in a Property package 36180F.

The Property entity 36182F includes an @actionCode 36190F, an ID 36198F, a DefinitionClassReference 36106G, a PreferredName 36122G, a PropertyDataTypeReference 36130G, an AspectID 36146 G, a TargetInterfaceElementID 36154G, a MultipleValueIndicator 36162G, a TextSearchableIndicator 36170G, a ParametricSearchAbleIndicator 36178G, and a ValuationRequiredIndicator 36186G. The @actionCode 36190F is of a type GDT 36194F "ActionCode" 36196F, and there is zero or one 36192F @actionCode 36190F in a Property entity 36182F. The ID 36198F is of a type GDT 36102G "PropertyID" 36104G, and there is one 36100G ID 36198F in a Property entity 36182F. The DefinitionClassReference 36106G is of a type GDT 36110G "PropertyDefinitionClassReference" 36112G, and there is zero or one 36108G DefinitionClassReference 36106G in a Property entity 36182F.

The DefinitionClassReference 36106G includes an ID 36114G at the sixth level 36112. The ID 36114G is of a type GDT 36118G "PropertyDefinitionClassID" 36120G, and there is one 36116G ID 36114G in a DefinitionClassReference 36106G.

The PreferredName 36122G is of a type GDT 36126G "Name" 36128G, and there is at least one 36124G PreferredName 36122G in a Property entity 36182F. The PropertyDataTypeReference 36130G is of a type GDT 36134G "PropertyDataTypeReference" 36136G, and there is one 36132G PropertyDataTypeReference 36130G in a Property entity 36182F.

The PropertyDataTypeReference 36130G includes an ID 36138G at the sixth level 36112. The ID 36138G is of a type GDT 36142G "PropertyDataTypeID" 36144G, and there is one 36140G ID 36138G in a PropertyDataTypeReference 36130G. The AspectID 36146G is of a type GDT 36150G "AspectID" 36152G, and there is any number of 36148G AspectID 36146 G in a Property entity 36182F. The TargetInterfaceElementID 36154G is of a type GDT 36158G "InterfaceElementID" 36160G, and there is any number of 36156G TargetInterfaceElementID 36154G in a Property entity 36182F. The MultipleValueIndicator 36162G is of a type GDT 36166G "PropertyMultipleValueIndicator" 36168G, and there is zero or one 36164G MultipleValueIndicator 36162G in a Property entity 36182F. The TextSearchableIndicator 36170G is of a type GDT 36174G "TextSearchableIndicator" 36176G, and there is zero or one 36172G TextSearchableIndicator 36170G in a Property entity 36182F. The ParametricSearchableIndicator 36178G is of a type GDT 36182G "PropertyParametricSearchableIndicator" 36184G, and there is zero or one 36180G ParametricSearchableIndicator 36178G in a Property entity 36182F. The ValuationRequiredIndicator 36186G is of a type GDT 36190G "PropertyValuationRequiredIndicator" 36192G, and there is zero or one 36188G ValuationRequiredIndicator 36186G in a Property entity 36182F.

The CatalogueItemProperty package 36194G includes a CatalogueItemProperty entity 96G. The CatalogueItemProperty entity 36196G is of a type "CatalogueItemProperty" 36102H, and there is any number of 36198G CatalogueItemProperty entity 36196G in a CatalogueItemProperty package 36194G.

The CatalogueItemProperty entity 36196G includes a ProptertyReference 36104H and an OrdinalNumberValue 36120H at the fifth level 36110. The PropertyReference 36104H is of a type GDT 36108H "PropertyReference" 36110H, and there is one 36106H PropertyReference 36104H in a CatalogueItemProperty entity 36196G.

The PropertyReference 36104H includes an ID 36112H at the sixth level 36112. The ID 36112H is of a type GDT 36116H "PropertyID" 36118H, and there is one 36114H ID 36112H in a PropertyReference 36104H.

The OrdinalNumberValue 36120H is of a type GDT 36124H "OrdinalNumberValue" 36126H, and there is one 36122H OrdinalNumberValue 36120H in a CatalogueItemProperty entity 36196G.

The CatalogueSectionType package 36128H includes a CatalogueSectionType entity 36130H at the forth level 36108. The CatalogueSectionType entity 36130H is of a type "Catalogue Section Type" 36136H, and there is any number of 36132H CatalogueSectionType entities 36130H in a CatalogueSectionType package 36128H.

The CatalogueSectionType entity 36130H includes an @actionCode 36138H, an ID 36146H, aName 36154H, and a SectionProperty 36162H at the fifth level 36110. The @actionCode 36138H is of a type GDT 36142H "ActionCode" 36144H, and there is zero or one 36140H@actionCode 36138H in a CatalogueSectionType 36130H. The ID 36146H is of a type GDT 36150H "CatalogueSectionTypeID" 36152H, and there is one 36148H ID 36146H in a CatalogueSectionType 36130H. The Name 36154H is of a type GDT 36158H "Name" 36160H, and there is any number of 36156H Name 36154H in a CatalogueSectionType 36130H. The SectionProperty 36162H is of a type "CatalogueSectionTypeSectionProperty" 36168H, and there is any number of 36164H SectionProperty 36162H in a CatalogueSectionType 36130H.

The SectionProperty 36162H includes a PropertyReference 36170H and an OrdinalNumberValue 36186H at the sixth level 36112. The PropertyReference 36170H is of a type GDT 36174H "PropertyReference" 36176H, and there is one 36172H PropertyReference 36170H in a SectionProperty 36162H.

The PropertyReference 36170H includes an ID 36178H at the seventh level 36114. The ID 36178H is of a type GDT 36182H "PropertyID" 36184H, and there is one 36180H ID 36178H in a PropertyReference 36170H.

The OrdinalNumberValue 36186H is of a type GDT 36190H "OrdinalNumberValue" 36192H, and there is one 36188H OrdinalNumberValue 36186H in a SectionProperty 36162H.

The CatalogueSchemea package 36194H includes a CatalogueSchema entity 36196H at the fourth level 36108. The CatalogueSchema entity 36196H is of a type "Catalogue Schema" 361021, and there is any number of 36198H CatalogueSchema entity 36196H in a CatalogueSchema package 36194H.

The CatalogueSchema entity 36196H includes an @actionCode 36104I, an @catalogueSectionListCompleteTransmissionIndicator 36112I, an @catalogueSectionRelationshipListCompleteTransmissionIndicator 36120I, an ID 36128I, a TypeCode 36136I, a Name 36144I, a CatalogueItemProperty 36152I, a CatalogueSection 36184I, and a CatalogueSectionRelationship 36170J at the fifth level 36110. The @actionCode 36104I is of a type GDT 36108I "ActionCode" 36110I, and there is zero or one 36106I@actionCode 36104I in a CatalogueSchema 36196H. The @catalogueSectionListCompleteTransmissionIndicator 36112I is of a type GDT 36116I "CompleteTransmissionIndicator" 36118I, and there is zero or one 36114I@catalogueSectionListCompleteTransmissionIndicator 36112I in a CatalogueSchema 36196H. The @catalogueSectionRelationshipListCompleteTransmissionIndicator 36120I is of a type GDT 36124I "CompleteTransmissionIndicator" 36126I, and there is zero or one 36122I@catalogueSectionRelationshipListCompleteTransmissionIndicator 36120I in a CatalogueSchema 36196H. The ID 36128I is of a type GDT 36132I "CatalogueSchemaID" 36134I, and there is one 36130I ID 36128I in a CatalogueSchema 36196H. The TypeCode 36136I is of a type GDT 36140I "CatalogueSchemaTypeCode" 36142I, and there is zero or one 36138I TypeCode 36136I in a CatalogueSchema 36196H. The Name 36144I is of a type GDT 36148I "Name" 36150I, and there is any number of 36146I Name 36144I in a CatalogueSchema 36196H. The CatalogueItemProperty 36152I is of a type "CatalogueSchemaCatalogueItemProperty" 36158I, and there is any number of 36154I CatalogueItemProperty 36152I in a CatalogueSchema 36196H.

The CatalogueItemProperty 36152I includes a PropertyReference 36160I and an OrdinalNumberValue 36176I at the sixth level 36112. The PropertyReference 36160I is of a type GDT 36164I "PropertyReference" 36166I, and there is one 36162I PropertyReference 36160I in a CatalogueItemProperty 36152I.

The PropertyRefernce 36160I includes an ID 36168I at the seventh level 36114. The ID 36168I is of a type GDT 36172I "PropertyID" 36174I, and there is one 36170I ID 36168I in a PropertyReference 36160I.

The OrdinalNumberValue 36176I is of a type GDT 36180I "OrdinalNumberValue" 36182I, and there is one 36178I OrdinalNumberValue 36176I in a CatalogueItemProperty 36152I.

The CatalogueSection 36184I is of a type "CatalogueSection" 36190I, and there is any number of 36186I CatalogueSection 36184I in a CatalogueSchema 36196H.

The CatalogueSection 36184I includes an @actionCode 36192I, an @propertyValuationListCompleteTransmissionIndicator 36100J, an ID 36108J, a TypeID 36116J, a Name 36124J, a PropertyValuation 36132J, and a CatalogueItemProperty 36140J The @actionCode 36192I is of a type GDT 36196I "ActionCode" 36198I, and there is zero or one 36194I@actionCode 36192I in a CatalogueSection 36184I. The @propertyValuationListCompleteTransmissionIndicator 36100J is of a type GDT 36104J "CompleteTransmissionIndicator" 36106J, and there is zero or one 36102J @propertyValuationListCompleteTransmissionIndicator 36100J in a CatalogueSection 36184I. The ID 36108J is of a type GDT 36112J "CatalogueSectionID" 36114J, and there is one 36110J ID 36108J in a CatalogueSection 36184I. The TypeID 36116J is of a type GDT 36120J "CatalogueSectionTypeID" 36122J, and there is zero or one 36118J TypeID 36116J in a CatalogueSection 36184I. The Name 36124J is of a type GDT 36128J "Name" 36130J, and there is any number of 36126J Name 36124J in a CatalogueSection 36184I. The PropertyValuation 36132J is of a type GDT 36136J "PropertyValuation" 36138J, and there is any number of 36134J PropertyValuation 36132J in a CatalogueSection 36184I. The CatalogueItemProperty 36140J is of a type "CatalogueSectionCatalogueItemProperty" 36146J, and there is any number of 36142J CatalogueItemProperty 36140J in a CatalogueSection 36184I.

The CatalogueItemProperty 36140 J includes a PropertyReference 36148J, and an OrdinalNumberValue 36162J at the seventh level 36114. The PropertyReference 36148J is of a type GDT 36152J "PropertyReference" 36154J, and there is one 36150J PropertyReference 36148J in a CatalogueItemProperty 36140J. The OrdinalNumberValue 36162J is of a type GDT 36166J "OrdinalNumberValue" 36168J, and there is one 36164J OrdinalNumberValue 36162J in a CatalogueItemProperty 36140J.

The CatalogueSectionRelationship 36170J is of a type "CatalogueSectionRelationship" 36176J, and there is any number of 36172J CatalogueSectionRelationship 36170J in a CatalogueSchema 36196H.

The CatalogueSectionRelationship 36170J includes an @actionCode 36178J, a SourceCatalogueSectionID 36186J, and a TargetCatalogueSectionID 36194J at the sixth level 36112. The @actionCode 36178J is of a type GDT 36182J "ActionCode" 36184J, and there is zero or one 36180J @actionCode 36178J in a CatalogueSectionRelationship 36170J. The SourceCatalogueSectionID 36186J is of a type GDT 36190J "CatalogueSectionID" 36192J, and there is one 36188J SourceCatalogueSectionID 36186J in a CatalogueSectionRelationship 36170J. The TargetCatalogueSectionID 36194J is of a type GDT 36198J "CatalogueSectionID" 36100K, and there is one 36196J TargetCatalogueSectionID 36194J in a CatalogueSectionRelationship 36170J.

The Content package 36102K includes a Content entity 36104K at the third level, a CatalogueItem package 36144K, and a CatalogueView package 36158L. The Content entity 36104K is of a type "CatalogueContent" 36110K, and there is zero or one 36106K Content entity 36104K in a Content package 36102K.

The Content entity 36104K includes an @catalogueItemListCompleteTransmissionIndicator 36112K, an @catalogueItemRelationshipListCompleteTransmissionIndicator 36120K, an @catalogueViewListCompleteTransmissionIndicator 36128K, and a CatalogueSchemaID 36136K at the fourth level 36108. The @catalogueItemListCompleteTransmissionIndicator 36112K is of a type GDT 36116K "CompleteTransmissionIndicator" 36118K, and there is zero or one 36114K @catalogueItemListCompleteTransmissionIndicator 36112K in a Content 36104K. The @catalogueItemRelationshipListCompleteTransmissionIndicator 36120K is of a type GDT 36124K "CompleteTransmissionIndicator" 36126K, and there is zero or one 36122K@catalogueItemRelationshipListCompleteTransmissionIndicator 36120K in a Content 36104K. "The @catalogueViewListCompleteTransmissionIndicator 36128K is of a type GDT 36132K "CompleteTransmissionIndicator" 36134K, and there is zero or one 36130K @catalogueViewListCompleteTransmissionIndicator 36128K in a Content 36104K. The CatalogueSchemaID 36136K is of a type GDT 36140K "CatalogueSchemaID" 36142K, and there is zero or one 36138K CatalogueSchemaID 36136K in a Content 36104K.

The CatalogueItem package 36144K includes a CatalogueItem entity 36146K and a CatalogueItemRelationship 36118L at the fourth level 36108. The CatalogueItem entity 36146K is of a type "Catalogue Item" 36152K, and there is any number of 36148K CatalogueItem entity 36146K in a CatalogueItem package 36144K.

The CatalogueItem entity 36146K includes an @actionCode 36154K, an @propertyValuationListCompleteTransmissionIndicator 36162K, an ID 36170K, a Description 36178K, a Classification 36186K, and a PropertyValuation 36110L at the fifth level 36110. The @actionCode 36154K is of a type GDT 36158K "Action- Code" 36160K, and there is zero or one 36156K @actionCode 36154K in a CatalogueItem 36146K. The @propertyValuationListCompleteTransmissionIndicator 36162K is of a type GDT 36166K "CompleteTransmissionIndicator" 36168K, and there is zero or one 36164K @propertyValuationListCompleteTransmissionIndicator 36162K in a CatalogueItem 36146K. The ID 36170K is of a type GDT 36174K "CatalogueItemID" 36176K, and there is one 36172K ID 36170K in a CatalogueItem 36146K. The Description 36178K is of a type GDT 36182K "Description" 36184K, and there is any number of 36180K Description 36178K in a CatalogueItem 36146K. The Classification 36186K is of a type "CatalogueItemClassification" 36192K, and there is any number of 36188K Classification 36186K in a CatalogueItem 36146K.

The Classification 36186K includes a CatalogueSchemaID 36194K and a CatalogueSectionID 36102L at the sixth level 36112. The CatalogueSchemaID 36194K is of a type GDT 36198K "CatalogueSchemaID" 36100L, and there is zero or one 36196K CatalogueSchemaID 36194K in a Classification 36186K. The CatalogueSectionID 36102L is of a type GDT 36106L "CatalogueSectionID" 36108L, and there is one 36104L CatalogueSectionID 36102L in a Classification 36186K.

The PropertyValuation 36110L is of a type GDT 36114L "PropertyValuation" 36116L, and there is any number of 36112L PropertyValuation 36110L in a CatalogueItem 36146K.

The CatalogueItemRelationship 36118L is of a type "CatalogueItemRelationship" 36124L, and there is any number of 36120L CatalogueItemRelationship 36118L in a Content 36104K.

The CatalogueItemRelationship 36118L includes an @actionCode 36126L, a SourceCatalogueItemID 36134L, a TargetCatalogueItemID 36142L, and a TypeCode 36150L at the fifth level 36110. The @actionCode 36126L is of a type GDT 36130L "ActionCode" 36132L, and there is zero or one 36128L @actionCode 36126L in a CatalogueItemRelationship 36118L. The SourceCatalogueItemID 36134L is of a type GDT 36138L "CatalogueItemID" 36140L, and there is one 36136L SourceCatalogueItemID 36134L in a CatalogueItemRelationship 36118L. The TargetCatalogueItemID 36142L is of a type GDT 36146L "CatalogueItemID" 36148L, and there is one 36144L TargetCatalogueItemID 36142L in a CatalogueItemRelationship 36118L. The TypeCode 36150L is of a type GDT 36154L "ObjectStructureRelationshipTypeCode" 36156L, and there is one 36152L TypeCode 36150L in a CatalogueItemRelationship 36118L.

The CatalogueView Package includes a CatalogueView entity 36160L at the fourth level 36108. The CatalogueView entity 36160L is of a type "CatalogueView" 36166L, and there is any number of 36162L CatalogueView entity 36160L in a CatalogueView package 36158L.

The CataloguView entity includes an @actionCode 36168L, an @itemListCompleteTransmissionIndicator 36176L, an @itemRelationshipTypeListCompleteTransmissionIndicator 36184L, an @excludedPropertyListCompleteTransmissionIndicator 36192L, an ID 36100M, a Name 36108M, a Schema 36116M, an Item 36164M, an ItemRelationshipType 36188M, and an ExcludedProperty 36112N at the fifth level 36110. The @actionCode 36168L is of a type GDT 36172L "ActionCode" 36174L, and there is zero or one 36170L @actionCode 36168L in a CatalogueView 36160L. The @itemListCompleteTransmissionIndicator 36176L is of a type GDT 36180L "CompleteTransmissionIndicator" 36182L, and there is zero or one 36178L @itemListCompleteTransmissionIndicator 36176L in a CatalogueView 36160L. The @itemRelationshipTypeListCompleteTransmissionIndicator 36184L is of a type GDT 36188L "CompleteTransmissionIndicator" 36190L, and there is zero or one 36186L @itemRelationshipTypeListCompleteTransmissionIndicator 36184L in a CatalogueView 36160L. The @excludedPropertyListCompleteTransmissionIndicator 36192L is of a type GDT 36196L "CompleteTransmissionIndicator" 36198L, and there is zero or one 36194L @excludedPropertyListCompleteTransmissionIndicator 36192L in a CatalogueView 36160L. The ID 36100M is of a type GDT 36104M "CatalogueViewID" 36106M, and there is one 36102M ID 36100M in a CatalogueView 36160L. The Name 36108M is of a type GDT 36112M "Name" 36114M, and there is any number of 36100M Name 36108M in a CatalogueView 36160L. The Schema 36116M is of a type "CatalogueViewSchema" 36122M, and there is any number of 36118M Schema 36116M in a CatalogueView 36160L.

The Schema 36116M includes an @sectionListCompleteTransmissionIndicator 36124M, a CatalogueSchemaID 36132M, and a Section 36140M at the sixth level 36112. The @sectionListCompleteTransmissionIndicator 36124M is of a type GDT 36128M "CompleteTransmissionIndicator" 36130M, and there is zero or one 36126M @sectionListCompleteTransmissionIndicator 36124M in a Schema 36116M. The CatalogueSchemaID 36132M is of a type GDT 36136M "CatalogueSchemaID" 36138M, and there is one 36134M CatalogueSchemaID 36132M in a Schema 36116M. The Section 36140M is of a type "CatalogueViewSchemaSection" 36146M, and there is any number of 36142M Section 36140M in a Schema 36116M.

The Section 36140M includes an @actionCode 36148 and a CatalogueSectionId 36156M at the seventh level 36114. The @actionCode 36148M is of a type GDT 36152M "ActionCode" 36154M, and there is zero or one 36150M @actionCode 36148M in a Section 36140M. The CatalogueSectionID 36156M is of a type GDT 36160M "CatalogueSectionID" 36162M, and there is one 36158M CatalogueSectionID 36156M in a Section 36140M.

The Item 36164M is of a type "CatalogueViewItem" 36170M, and there is any number of 36166M Item 36164M in a CatalogueView 36160L.

The Item 36164M includes an @actionCode 36172M and a CatalogueItemID 36180M at the sixth level 36112. The @actionCode 36172M is of a type GDT 36176M "ActionCode" 36178M, and there is zero or one 36174M @actionCode 36172M in a Item 36164M. The CatalogueItemID 36180M is of a type GDT 36184M "CatalogueItemID" 36186M, and there is one 36182M CatalogueItemID 36180M in a Item 36164M.

The ItemRelationshipType 36188M is of a type "CatalogueViewItemRelationshipType" 36194M, and there is any number of 36190M ItemRelationshipType 36188M in a CatalogueView 36160L.

The ItemRelationshipType 36188M includes an @actionCode 36196M and a CatalogueItemRelationshipTypeCode 36104N at the sixth level 36112. The @actionCode 36196M is of a type GDT 36100N "ActionCode" 36102N, and there is zero or one 36198M @actionCode 36196M in a ItemRelationshipType 36188M. The CatalogueItemRelationshipTypeCode 36104N is of a type GDT 36108N "ObjectStructureRelationshipTypeCode" 36110N, and there is one 36106N CatalogueItemRelationshipTypeCode 36104N in a ItemRelafionshipType 36188M.

The ExcludedProperty 36112N is of a type "CatalogueViewExcludedProperty" 36118N, and there is any number of 36114N ExcludedProperty 36112N in a CatalogueView 36160L.

The ExcludedProperty 36112N includes an @actionCode 36120N and a PropertyReference 36128N at the sixth level 36112. The @actionCode 36120N is of a type GDT 36124N "ActionCode" 36126N, and there is zero or one 36122N@actionCode 36120N in a ExcludedProperty 36112N. The PropertyReference 36128N is of a type GDT 36132N "PropertyReference" 36134N, and there is one 36130N PropertyReference 36128N in a ExcludedProperty 36112N.

The PropertyReference 36128N includes an ID 36135N at the seventh level. The ID 36136N is of a type GDT 36140N "PropertyID" 36142N, and there is one 36138N ID 36136N in a PropertyReference 36128N.

(6) Message Data Type Catalogue Publication Message

The data model for the message data type CataloguePublicationMessage used to implement a CataloguePublicationRequest 35910 is depicted in FIG. 362. The data model for the message data type CataloguePublicationMessage is similar to the data model for the message data type CatalogueUpdateMessage as discussed above. The message data type CataloguePublicationMessage includes a CataloguePublicationMessage package 36202. The CataloguePublicationMessage package 36202 includes a MessageHeader package 36204, a TransmissionInformation package 36206, a Catalogue package 36208, and a CataloguePublicationMessage entity 36210.

(a) Message Header Package

A MessageHeader package 36204 groups the business-related information relevant for sending a Business Document in a message. The MessageHeader package 36204 includes a MessageHeader entity 36212 and a SenderParty entity 36216. There is a 1:1 relationship 36214 between the MessageHeader entity 36212 and the CataloguePublicationMessage entity 36210. There is a 1:c relationship 36218 between the MessageHeader entity 36212 and the SenderParty entity 36216.

The MessageHeader entity 36212 groups the business-related information from the sending application's point of view for identifying the Business Document in a message, information about the sender, and potentially information about the receiver. The MessageHeader entity 36212 is of type GDT BusinessDocumentMessageHeader.

The SenderParty entity 36216 is the party responsible for sending of a business document on a business-related application level. The SenderParty entity 36216 is of type GDT BusinessDocumentMessageHeaderParty.

(b) Transmission Information Package

The TransmissionInformation package 36206 groups the information pertaining to the transmission of the object or entity (e.g., the CataloguePublicationMessage entity 36210) included in the message. The TransmissionInformation package 36206 includes a TransmissionHeader entity 36220. There is a 1:c relationship 36222 between the CataloguePublicationMessage entity 36210 and the TransmissionHeader entity 36220. A TransmissionHeader entity 36220 provides information about the identification of a transmission (and one or more of the TransmissionHeader entity's 36218 packages). Additionally the minimum requested severity of events occurring during the processing of the transmission which have to be logged and returned may be specified. The TransmissionHeader entity 36220 includes an ID, a PackageOrdinalNumberValue, a PackageTotalNumberValue, and a MinimumRequestedLogItemSeverityCode.

The ID is a unique identification number grouping several data packages into one Catalogue transmission, and is of type GDT Transmission ID. The PackageOrdinalNumberValue specifies the sequence number identifying a data package in a multiple data package transmission, and is of type GDT OrdinalNumberValue. The PackageTotalNumberValue specifies the total number of data packages making up a Catalogue transmission, and is of type GDT TotalNumberValue. The MinimumRequestedLogItemSeverityCode specifies the severity of log items to be returned by messages CataloguePublicationTransmissionPackageNotification and CataloguePublicationConfirmation, and is of type GDT LogItemSeverityCode.

Catalogues often contain such a large amount of data that they may not be exchanged in one single message. Large catalogues are therefore split into smaller part messages (e.g., CataloguePublication Notification messages 35910) each of which is transmitted separately.

(c) Catalogue Package

The Catalogue package 36208 groups the information necessary to describe the structure and content of a Catalogue. The Catalogue package 36208 includes a GlobalInformation package 36224, a CatalogueModel ("Model") package 36226, a CatalogueContent ("Content") package 36228, and a Catalogue entity 36230. There is a 1:1 relationship 36232 between the CataloguePublicationMessage entity 36210 and the Catalogue entity 36230.

(i) Catalogue Entity

A Catalogue entity 36230 included in a CataloguePublication Message 36202 may correspond to a new, changed or deleted Catalogue. A Catalogue entity 36230 is a structured directory of Catalogue items. Each item represents an object, and provides information about the object. The Catalogue entity 36230 references global information (e.g., as implemented in the GlobalInformation package 36224), model information (e.g., as implemented in the CatalogueModel package 36226) and content information (e.g., as implemented in the GlobalInformation package 36228). The global information provides information relevant to the entire Catalogue entity 36230. The model information defines the structure of the Catalogue entity 36230 content and the properties used to describe this content. Content information includes the items of the Catalogue entity 36230 and each of the items structural assignment within the Catalogue entity 36230 structure.

The Catalogue entity 36230 may include the following elements or attributes:

1) @LanguageCode, which specifies the language for a description or name associated with the Calalogue entity 36222. The @LanguageCode is of type GDT: LanguageCode.

2) @currencyCode, which specifies the currency in an element Amount. The @currencyCode is of type GDT: CurrencyCode.

3) @unitCode, which specifies the unit code in an element Quantity. The @unitCode is of type GDT: MeasureUnitCode 4) @actionCode, which specifies the operation to be performed on the complete catalogue. The @actionCode is of type GDT: ActionCode.

5) @completeTransmissionIndicator, which indicates whether all data of the catalog is included or not. The @completeTransmissionIndicator is of type GDT: CompleteTransmissionIndicator.

6) @providerPropertyValuationListCompleteTransmissionIndicator, which indicates whether the list of ProviderPropertyValuation is transmitted completely or not. The @providerPropertyValuationListCompleteTransmissionIndicator is of type GDT: CompleteTransmissionIndicator.

7) ID, which identifies the Catalogue entity 36230 being transmitted. The IDis of type GDT: CatalogueID.

8) VersionID, which identifies the version of the Catalogue entity 36230 being transmitted. The VersionID is of type GDT: VersionID.

9) Name, which identifies a name for the entire Catalogue in a language identified by @LanguageCode. The Name is of type GDT: Name.

10) TypeCode, which specifies the type of Catalogue entity 36230 being transmitted. For example, TypeCode may indicate the type as a supplier catalogue or purchasing catalogue. The TypeCode is of type GDT: CatalogueTypeCode.

11) ValidityPeriod, which specifies the period during which the Catalogue entity 36230 is valid. The ValidityPeriod is of type GDT: DateTimePeriod.

For example, the Catalogue entity 36230 may be a products or parts Catalogue that corresponds to a directory of objects of type "product" providing information about products. In this example, the Catalogue entity 36230 facilitates finding products matching certain criteria specified by an actor (e.g., a catalogue user) and that may then be used in an associated business process. The business process may be for example "procurement," in which case the Catalogue entity 36230 is a "purchasing catalogue" or a "spare parts catalogue," or "sales catalogue." In case of a "sales catalogue," information from the Catalgoue entity 36222 may be provided such that the products seem especially appealing to the target group the Catalogue addresses. Alternatively, the Catalogue entity 36230 may correspond to a supplier directory of objects of type "supplier" used in a procurement process.

(ii) Catalogue Global Information Package

The GlobalInformation package 36224 groups the information relevant to the entire catalogue. The GlobalInformation package 36224 includes a ProviderPropertyValuation entity 36234. There is a 1:cn relationship 36236 between the CataloguePublicationMessage entity 36210 and the Catalogue entity 36230.

A ProviderPropertyValuation entity 36234 valuates properties provided by the Catalogue provider 35902 to provide additional information about the Catalogue entity 36230 (e.g., any information about the vendor/s, Catalogue creation date, or Notes). ProviderPropertyValuation entity 36234 is of type GDT: PropertyValuation, and uses PropertyReference and PropertyValue elements. The PropertyReference specifies the property that is being valuated. The PropertyReference is of type GDT: PropertyReference. The PropertyValue specifies the value of the property. The PropertyValue is of type GDT PropertyValue. As further discussed below, the PropertyValue includes the following elements: AmountSpecification, QuantitySpecification, DecimalSpecification, FloatSpecification, IntegerSpecification, DateTimeSpecification, NameSpecification, and IndicatorSpecification.

(iii) Catalogue Model Package

The CatalogueModel package 36226 includes a PropertyDataType package 36238, a Property package 36240, a CatalogueItemProperty package 36241, a CatalogueSectionType package 36242, and a CatalogueSchema package 36244, and CatalogueModel entity 36246. There is a 1:c relationship 36248 between the Catalogue entity 36230 and the CatalogueModel entity 36246.

(a) Catalogue Model

A CatalogueModel entity 36246 describes and structures the Catalogue content using systems of categories to group Catalogue items and properties that may be attributed to the Catalogue items or the categories themselves or both. The CatalogueModel entity 36246 is the information how the Catalogue content is structured and defined. The Catalogue Model entity 36246 defines properties, the data types of the proprerties, and allowed values, which are used to describe catalogue sections and/or the items included in the Catalogue as identified in associated PropertyDataType package 36238 and Property package 36240. Additionally, the Catalogue Model entity 36246 specifies one or more schemas as identified in associated CatalogueSchema package 36244, which defines the structural composition of the Catalogue content by means of sections and relationships between these sections. The sections of a schema correspond to divided up Catalogue items and include properties used to describe the Catalogue items assigned to the respective schema section. The CatalogueModel entity 36246 may have multiple schemas. The CatalogueModel entity 36246 includes a @PropertyDataTypeListCompleteTransmissionIndicator, a @PropertyListCompleteTransmissionIndicator, a @CatalogueSectionTypeListCompleteTransmissionIndicator, and a @CatalogueSchemaListCompleteTransmissionIndicator. The @PropertyDataTypeListCompleteTransmissionIndicator specifies whether the list of PropertyDataTypes has been transmitted completely. The @PropertyDataTypeListCompleteTransmissionIndicator is of type GDT: CompleteTransmissionIndicator. The @PropertyListCompleteTransmissionIndicator specifies whether the list of Properties has been transmitted completely. The @PropertyListCompleteTransmissionIndicator is of type GDT: CompleteTransmissionIndicator. The @CatalogueSectionTypeListCompleteTransmissionIndicator specifies whether the list of SectionTypes has been transmitted completely. The @CatalogueSectionTypeListCompleteTransmissionIndicator is of type GDT: CompleteTransmissionIndicator. The @CatalogueSchemaListCompleteTransmissionIndicator specifies whether the list of Schemas has been transmitted completely. The @CatalogueSchemaListCompleteTransmissionIndicator is of type GDT: CompleteTransmissionIndicator.

(b) Catalogue Model Property Data Type Package

The PropertyDataType package 36238 groups the information pertaining to property data types. The PropertyDataType package 36238 includes a PropertyDataType entity 36250. A PropertyDataType entity 36250 defines the data type of properties used in the Catalogue entity 36230 to describe Catalogue sections and Catalogue items. The PropertyDataType entity 36250 is of type GDT PropertyDataType. There is a 1:cn relationship 36252 between the CatalogueModel entity 36246 and the PropertyDataType entity 36250.

The PropertyDataType entity 36250 includes an @actionCode, which specifies the operation to be performed on the Property, an ID, a PreferredName, a FormatCode, a MaximumTotalDigitNumberValue, and a FractionalDigitNumberValue. The PropertyDataType entity 36250 may also include an AllowedPropertyValueElement that has a PropertyValue.

(c) Catalogue Model Property Package

The Property package 36240 groups the information pertaining to properties used in the catalogue. The Property package 36240 includes a Property entity 36254. There is a 1:cn relationship 36252 between the CatalogueModel entity 36246 and the PropertyDataType entity 36250. There is a 1:cn relationship 36256 between the CatalogueModel entity 36246 and the Property entity 36254.

The Property entity 36254 specifies a property and additional information for it that may be used to describe and differentiate between items included or sections used within the catalogue. The Property entity 36254 is of type GDT Property, and includes the following elements: an @action-code; an ID; a PreferredName; a PropertyDataTypeReference; an AspectID, which identifies an aspect in which the Property entity 36254 is used; a TargetInterfaceElementID, which identifies an element of an interface the Property entity 36254 may be mapped to; a MultipleValueIndicator, which indicates whether the Property entity 36254 may contain multiple values; a TextSearchableIndicator, which indicates whether the Property entity 36254 is qualified for "Text Search"; a ParametricSearchableIndicator, which indicates whether the Property entity 36254 is qualified for "Parametric Search"; and a ValuationRequiredIndicator, which indicates whether a valuation is mandatory on the object which includes this Property entity 36254. The @actionCode specifies the operation to be performed on the Property entity 36254.

(d) Catalogue Model Catalog Item Property Package

The CatalogueItemProperty package 36041 groups all information pertaining to catalog item properties used in the catalog. It contains the CatalogueItemProperty entity 36055.

(i) Catalogue Item Property

A CatalogueItemProperty entity 36055 specifies a property pertaining to each catalogue item together with its position in the full list of properties attributed to a catalogue item. It includes the elements PropertyReference and OrdinalNumberValue. PropertyReference, of type GDT PropertyReference, specifies a property, and only the element ID is used. OrdinalNumberValue, of type GDT OrdinalNumberValue, specifies the position of the property in the full list. In variations, only properties which are not component properties (see, e.g., GDT Property) may be assigned. It has a cardinality of 1:cn, as denoted by the relationship 36057.

(e) Catalogue Model Section Type Package

The CatalogueModelSectionType or CatalogueSectionType package 36242 groups the information necessary to define a section type. The CatalogueSectionType package 36242 includes a CatalogueSectionType entity 36258. The CatalogueSectionType entity 36258 describes the nature of Catalogue sections by defining properties for the description of sections of this type. There is a 1:cn relationship 36260 between the CatalogueModel entity 36246 and the CatalogueSectionType entity 36258. A CatalogueSectionType entity 36258 may include one or more SectionProperty entities 36262 each of which describes a respective Catalogue section of the CatalogueSectionType entity 36258. Thus, there is a 1:cn relationship 36264 between the CatalogueModel entity 36246 and each Property entity 36262.

The CatalogueSectionType entity 36258 includes the following elements: an @actionCode, an ID, and a Name. The @actionCode is of type GDT: Action Code and specifies the operation to be performed on the CatalogueSectionType entity 36258. The ID is of type GDT: SectionTypeID and identifies the CatalogueSectionType entity 36258. The Name is of type GDT: Name and provides a name for the CatalogueSection type in a language identified by @LanguageCode of the Catalogue entity 36230.

A SectionProperty 36262 specifies a property pertaining to the CatalogueSectionType entity 36258 and the SectionProperty's 36262 position in the list of SectionProperty entities 36262 associated with the CatalogueSectionType entity 36258. The SectionProperty 36262 includes a PropertyReference and a OrdinalNumberValue. The PropertyReference is of type GDT: PropertyReference and includes an ID that identifies the SectionProperty 36262. The OrdinalNumberValue is of type GDT: OrdinalNumberValue and provides the SectionProperty's 36262 position in the list of SectionProperty entities 36262.

(f) Catalogue Model Schema Package

The CatalogueModelSchema or CatalogueSchema package 36244 groups the information pertaining to a Catalogue schema. It includes a CatalogueSchema entity 36266. The CatalogueSchema entity 36266 defines a structural composition of the Catalogue content in accordance with a pre-determined purpose. There is a 1:cn relationship 36268 between the CatalogueModel entity 36246 and the CatalogueSchema entity 36266. The CatalogueSchema entity 36266 may include one or more CatalogueItemProperty entities 36270 each of which describes a respective Catalogue item of the CatalogueSchema entity 36266. In addition, the CatalogueSchema entity 36266 also may include one or more CatalogueSection entities 36272 and one or more CatalogueSectionRelationship entities 36274. There is a 1:cn relationship 36276 between the CatalogueSchema entity 36266 and each CatalogueItemProperty entity 36270. There is a 1:cn relationship 36278 between the CatalogueSchema entity 36266 and each CatalogueSection entity 36272. There is a 1:cn relationship 36280 between the CatalogueSchema entity 36266 and each CatalogueSectionRelationship entity 36274.

The CatalogueSchema entity 36266 includes an @actionCode, an ID, a TypeCode, a Name, a SectionListCompleteTransmissionIndicator, and a SectionRelationshipListCompleteTransmissionIndicator. The @actionCode is of type GDT: ActionCode and specifies the operation to be performed on the CatalogueSchema entity 36266. The ID is of type GDT: CatalogueSchemaID and identifies the CatalogueSchema entity 36266. The TypeCode is of type GDT: CatalogueSchemaTypeCode and specifies the nature of the catalogue schema. The Name is of type GDT: Name and provides a name for a schema in a language identified by @LanguageCode of the Catalogue entity 36230. The SectionListCompleteTransmissionIndicator is of type GDT: CompleteTransmissionIndicator and specifies whether the list of sections has been transmitted completely. The SectionRelationshipListCompleteTransmissionIndicator is of type GDT: CompleteTransmissionIndicator and specifies whether the list of SectionRelationships has been transmitted completely. The CatalogueSchema entity 36266 supports a specific business process or addresses a specific target group. Thus, the CatalogueSchema entity 36266 may include multiple schemas.

(i) Catalogue Item Property

The CatalogueItemProperty entity 36270 specifies a property pertaining to a catalogue item and the CatalogueItemProperty's 36270 position in the list of properties attributed to the catalogue item. The CatalogueItemProperty entity 36270 includes a PropertyReference of type GDT: PropertyReference and an OrdinalNumberValue of type GDT: OrdinalNumberValue. The PropertyReference has an ID that identifies the property associated with the catalogue item. The OrdinalNumberValue specifies the CatalogueItemProperty's 36270 position in the list of properties attributed to the catalogue item.

(ii) Catalogue Section

Each CatalogueSection entity 36272 corresponds to a respective set of catalogue items in accordance with the CatalogueSchema 36266. Each CatalogueSection entity 36272 specifies properties which may be used to describe the set of catalogue items. Each CatalogueSection entity 36272 may include one more more PropertyValuation entities 36282 and one or more CatalogueItemProperty entities 36284. Thus, there is a 1:cn relationship 36286 between the CatalogueSection entity 36272 and each PropertyValuation entity 36282.

There is also a 1:cn relationship 36288 between the CatalogueSection entity 36272 and each CatalogueItemProperty entity 36284.

Each CatalogueSection entity 36272 may also include an @actionCode, an ID, a TypeID, and a Name. The @actionCode is of type GDT: ActionCode and specifies the operation to be performed on the respective CatalogueSection entity 36272. The ID is of type GDT: CatalogueSectionID and identifies respective CatalogueSection entity 36272. The TypeID is of type GDT: CatalogueSectionTypeID and identifies a Section type to which the respective CatalogueSection entity 36272 belongs. The Name is of type GDT: Name and provides a name for the respective CatalogueSection entity 36272 in a language identified by @LanguageCode of the Catalogue entity 36230.

(iii) Catalogue Section Property Valuation

Each Property Valuation or CatalogueSectionPropertyValuation 36282 includes the value of a property that may be attributed to or is used to describe the CatalogueSection entity 36272 in accordance with a CatalogueSection type 36258. The CatalogueSectionPropertyValuation entity 36282 is of type GDT PropertyValuation and has a PropertyReference of type GDT: PropertyReference and a PropertyValue of type GDT: PropertyValue. The PropertyReference references a valuated property defined in the CatalogueSectionType entity 36258 corresponding to the CatalogueSection 36272.

(iv) Catalogue Section Catalogue Item Property

Each CatalogueItemProperty or CatalogueSectionCatalogueItemProperty entity 36284 specifies a property pertaining to the catalogue items or objects associated with the respective CatalogueSection entity 36272. The CatalogueSectionCatalogueItemProperty entity 36284 also specifies the property's position in the full list of properties attributed to a catalogue item. The CatalogueSectionCatalogueItemProperty entity 36284 includes a PropertyReference of type GDT: PropertyReference and an OrdinalNumberValue of type GDT: OrdinalNumberValue. Each CatalogueSectionCatalogueItemProperty entity 36284 refers to a property defined as part of the CatalogueModel entity 36246 and may not be attributed to the catalogue items within the Catalogue entity 36230.

(v) Catalogue Section Relationship

Each CatalogueSectionRelationship entity 36274 specifies a connection between two CatalogueSection entities 36272 within a CatalogueSchema entity 36266. In one implementation, each CatalogueSectionRelationship entity 36274 corresponds to a parent-child connection between two CatalogueSection entities 36272, providing a hierarchical structure to the Catalogue entity 36230. The CatalogueSectionRelationship entity 36274 includes an @actionCode, a SourceCatalogueSectionID, and a TargetCatalogueSectionID. The @actionCode is of type GDT: ActionCode and specifies the operation to be performed on the corresponding CatalogueSectionRelationship entity 36274. The SourceCatalogueSectionID is of type GDT: CatalogueSectionID and identifies a source CatalogueSection entity 36272. The TargetCatalogueSectionID is of type GDT: CatalogueSectionID and identifies a target CatalogueSection entity 36272.

(iv) Catalogue Content Package

The Content or CatalogueContent package 36228 includes a CatalogueItem package 36290 and a CatalogueView package 36292, and a CatalogueContent entity 36294. There is a 1:c relationship 36296 between the Catalogue entity 36230 and the CatalogueContent entity 36294. The CatalogueContent entity 36294 specifies the list of business objects included in the catalogue reflected by the Catalogue entity 36230, together with their relationships and descriptions according to the catalogue's schemas reflected by the CatalogueSchema entity 36266, and the views (e.g., CatalogueView entities 36298) that are used to restrict the catalogue's information content for certain purposes. The CatalogueContent entity 36294 also specifies the items (e.g., CatalogueItem entities 36298) included in the Catalogue entity 36230 and each item's classification or assignment to Catalogue sections reflected by the one or more CatalogueSection entities 36272. The CatalogueContent entity 36294 includes a CatalogueItemListCompleteTransmissionIndicator, a CatalogueItemRelationshipListCompleteTransmissionIndicator, a CatalogueViewListCompleteTransmissionIndicator, and a CatalogueSchemaID. The CatalogueItemListCompleteTransmissionIndicator is of type GDT: CompleteTransmissionIndicator and specifies whether the list of items (e.g., CatalogueItem entities 36298) has been transmitted completely. The CatalogueItemRelationshipListCompleteTransmissionIndicator is of type GDT: CompleteTransmissionIndicator and specifies whether the list of ItemRelationships (e.g., CatalogueItemRelationship entities 36200A) has been transmitted completely. The CatalogueViewListCompleteTransmissionIndicator is of type GDT: CompleteTransmissionIndicator and specifies whether the list of Views (e.g., CatalogueView entities 36218A) has been transmitted completely. The CatalogueSchemaID identifies a catalogue schema (e.g., a CatalogueSchema entity 36272) to which the respective CatalogueContent entity 36294 is assigned. In one implementation, The CatalogueSchemaID of a first of the CatalogueContent entities 36294 functions as a default value for remaining CatalogueContent entities 36294 without a specified CatalogueSchemaID.

(a) Catalogue Content Catalogue Item Package

The CatalogueItem package 36290 groups the information pertaining to catalogue items. The CatalogueItem package 36290 includes a CatalogueItem entity 36298 and a CatalogueItemRelationship entity 36200A. There is a 1:cn relationship 36202A between the CatalogueContent entity 36294 and the CatalogueItem entity 36298. There is a 1:cn relationship 36204A between the CatalogueContent entity 36294 and the CatalogueItemRelationship entity 36200A.

(i) Catalogue Item

The CatalogueItem entity 36298 specifies information about an object included and to be classified within the Catalogue entity 36230 in accordance with the Catalogue entity's 36230 schema as reflected by the CatalogueSchema entity 36266. The CatalogueItem entity 36298 includes a CatalogueItemDescription entity 36206A that describes the item reflected by the CatalogueItem entity 36298. The CatalogueItem entity 36298 may also include a CatalogueItemPropertyValuation entity 36208A and a CatalogueItemClassification entity 36210A. The CatalogueItem entity 36298 may further include an @actionCode and an ID. The @actionCode is of type GDT: ActionCode and specifies the operation to be performed on the item. The ID is of type GDT: CatalogueItemID and identifies the respective CatalogueItem entity 36298.

(ii) Catalogue Item Description

The CatalogueItemDescription entity 36206A is of type GDT: Description and provides a description for an item in a specified language. There is a 1:cn relationship 36212A between the CatalogueItem entity 36298 and the CatalogueItemDescription entity 36206A.

(iii) Catalogue Item Classification

The CatalogueItemClassification entity 36210A assigns the CatalogueItem entity 36298 to a respective CatalogueSection entity 36272 within one of the CatalogueSchema entities 36266 associated with the Catalogue entity 36230. The CatalogueItemClassification entity 36210A includes a SchemaID and a SectionID. The SchemaID is of type GDT: CatalogueSchemaID and identifies the schema (e.g., one of the CatalogueSchema entities 36266) that the CatalogueItem entity 36298 references. The SectionID is of type GDT: CatalogueSectionID and identifies the section (e.g., one of the CatalogueSection entities 36272) that the CatalogueItem entity 36298 references. There is a 1:cn relationship 36214A between the CatalogueItem entity 36298 and the CatalogueItemClassification entity 36206A.

(iv) Catalogue Item Property Valuation

The CatalogueItemPropertyValuation entity 36208A is of type GDT: PropertyValuation and specifies the value of a property that may be attributed to the object the CatalogueItem entity 36298 represents in accordance with one of the CatalogueSchema entities 36266. The CatalogueItemPropertyValuation entity 36208A includes a PropertyReference and a PropertyValue. The PropertyReference is of type GDT: PropertyReference and is the reference to the property to be valuated for the CatalogueItem entity 36298. The PropertyValue is of type GDT: PropertyValue and is the value of the property reflected by the PropertyReference. There is a 1:cn relationship 36216A between the CatalogueItem entity 36298 and the CatalogueItemPropertyValuation entity 36208A.

(v) Catalogue Item Relationship

The CatalogueItemRelationship entity 36200A specifies a relationship with certain semantics between any two CatalogueItem entities 36298. The CatalogueItemRelationship entity 36200A includes an @actionCode, a SourceCatalogueItemID, a TargetCatalogueItemID, and a TypeCode. The @actionCode is of type GDT: ActionCode and specifies the operation to be performed on the relationship between the two CatalogueItem entities 36298. The SourceCatalogueItemID is of type GDT: CatalogueItemID and identifies the source CatalogueItem entity 36298. The TargetCatalogueItemID is of type GDT: CatalogueItemID and identifies the target CatalogueItem entity 36298. The TypeCode is of type GDT: ObjectStructureRelationshipTypeCode and specifies the semantics of the relationship existing between the source CatalogueItem entity 36298 and the target CatalogueItem entity 36298.

(b) Catalogue Content Catalogue View Package

The CatalogueView package 36292 groups the information pertaining to Catalogue views. The CatalogueView package 36292 includes a CatalogueView entity 36218A. There is a 1:cn relationship 36220A between the CatalogueContent entity 36294 and the CatalogueView entity 36218A.

(i) Catalogue View

The CatalogueView entity 36218A defines a subset of a Catalogue by specifying schemas, sections, Catalogue items and item relationship types to be included and properties to be excluded from a catalogue view. The CatalogueView entity 36218A may include a CatalogueViewSchema entity 36222A, a CatalogueViewItem entity 36224A and a CatalogueViewItemRelationshipType entity 36226A. In addition, the CatalogueView entity 36218A may include a CatalogueViewExcludedProperty entity 36228A, which specify properties not to be included in the view. The CatalogueView entity 36218A includes an @actionCode, an ID, a Name, an ItemListCompleteTransmissionIndicator, an ItemRelationshipTypeListCompleteTransmissionIndicator, and an ExcludedPropertyListCompleteTransmissionIndicator. The @actionCode is of type GDT: ActionCode and specifies the operation to be performed on the CatalogueView entity 36218A. The ID is of type GDT: CatalogueViewID and identifies a view ID. The Name is of type GDT: GDT Name and provides a name for the view in various languages. The ItemListCompleteTransmissionIndicator is of type GDT: CompleteTransmissionIndicator and specifies whether the item list has been transmitted completely. The ItemRelationshipTypeListCompleteTransmissionIndicator is of type GDT: CompleteTransmissionIndicator and specifies whether the list of item relationships has been transmitted completely. The ExcludedPropertyListCompleteTransmissionIndicator is of type GDT: CompleteTransmissionIndicator and specifies whether the list of excluded properties has been transmitted completely. There is a 1:cn relationship 36230A between the CatalogueView entity 36218A and the CatalogueViewSchema entity 36222A. There is a 1:cn relationship 36232A between the CatalogueView entity 36218A and the CatalogueViewItem entity 36224A. There is a 1:cn relationship 36234A between the CatalogueView entity 36218A and the CatalogueViewItemRelationshipType entity 36226A. There is a 1:cn relationship 36236A between the CatalogueView entity 36218A and the CatalogueViewItemRelationshipType entity 36226A.

(ii) Catalogue View Schema

The CatalogueViewSchema entity 36222A specifies a schema and a list of sections belonging to the schema that are to be included in a CatalogueView entity 36218A. The CatalogueViewSchema entity 36222A is subdivided into one or more CatalogueViewSchemaSection entities 36238A that specify Sections included in the CatalogueView entity 36218A. The CatalogueViewSchema entity 36222A includes an ID and a SectionListCompleteTransmissionIndicator. The ID is of type GDT: CatalogueSchemaID and identifies the respective CatalogueViewSchema entity 36222A. The SectionListCompleteTransmissionIndicator is of type GDT: CompleteTransmissionIndicator and specifies whether the list of sections (e.g., one or more CatalogueViewSchemaSections 36222A) has been transmitted completely.

(iii) Catalogue View Schema Section

The CatalogueViewSchemaSection entity 36222 specifies a section of the referenced catalogue schema (e.g., CatalogueViewSchema entity 36222A) to be included in the catalogue view. The CatalogueViewSchemaSection entity 36222 includes an @actionCode is of type GDT: ActionCode and an ID is of type GDT: CatalogueSectionID. The @actionCode specifies the operation to be performed on the CatalogueViewSchemaSection entity 36222 identified by the ID.

(iv) Catalogue View Item

The CatalogueViewItem entity 36224A specifies a CatalogueItem entity 36298 to be included in the catalogue view. The CatalogueViewItem entity 36224A includes an @acfionCode of type GDT: ActionCode and an ID of type GDT: CatalogueItemID. The @actionCode specifies the operation to be performed on the CatalogueViewItem entity 36224A identified by the ID.

(v) Catalogue View Item Relationship Type

The CatalogueViewItemRelationshipType entity 36226A specifies a catalogue item relationship type. In one implementation, the catalogue item relationships of the CatalogueViewItemRelationshipType entity 36226A are included in the catalogue view. CatalogueViewItemRelationshipType entity 36226A includes an @actionCode of type GDT: ActionCode and a Code of type GDT: ObjectStructureRelationshipType Code. The @actionCode specifies the operation to be performed on the item relationship type identified by the Code.

(vi) Catalogue View Excluded Property

The CatalogueViewExcludedProperty 36228A specifies a property that is not included in the catalogue view. For example, a CatalogueViewExcludedProperty "Price" is defined in the CatalogueContent entity 36294 means that users that have access to the content of the respective catalogue reflected by the Catalog entity 36230 may not see the price of catalogue items (e.g., CatalogueItem entities 36298) of the catalogue. The CatalogueViewExcludedProperty 36228A includes an @actionCode of type GDT: ActionCode and a PropertyReference of type GDT: PropertyReference. The @actionCode specifies the operation to be performed on an excluded property identified by the PropertyReference.

(d) Message Data Type—Element Structure

FIGS. 363A-AA depict the element structure for a CataloguePublicationRequest message 35910. The element structure is similar to the data model, but provides additional information regarding the details of the interface. The element structure identifies the different packages 36300 in the interface, and represents the entities at various levels within the interface. As depicted in FIG. 363, the interface for CataloguePublicationMessage includes six levels 36302, 36304, 36306, 36308, 36310, 36312, and 36314. The outermost package 36300 of this interface is a CataloguePublicationMessage package 36320, which includes a CataloguePublicationMessage entity 36322 at the first level 36302, a MessageHeader package 36328, a TransmissionInformation package 36362, and a Catalogue package 36304A. The CataloguePublicationMessage entity 36322 is of a type MDT 36324 "CataloguePublicationMessage" 36326.

The MessageHeader package 36328 includes a MessageHeader entity 36330 at the second level 36304. The MessageHeader entity 36330 is of a type GDT 36334 BusinessDocumentMessageHeader 36336, and there is one 36332 MessageHeader entity 36330 for each MessageHeader 36328.

The MessageHeader entity 36330 includes an ID 36338, CreationDateTime 36346, and SenderParty 36354 at the third level 36306. The ID 36338 is of a type GDT 36342 "BusinessDocumentMessageID" 36344 and there is one 36340 ID 36338 in a MessageHeader entity 36330. The CreationDateTime 36346 is of a type GDT 36350 "DateTime" 36352 and there is one 36348 CreationDateTime 36346 in a MessageHeader entity 36330. The SenderParty 36354 is of a type GDT 36358 "BusinessDocumentMessageHeaderParty" 36360 and there is zero or one 36356 SenderParty 36354 in a MessageHeader entity 36330.

The TransmissionInformation package 36362 includes TransmissionHeader entity 36364 at the second level 36304. The TransmissionHeader entity 36364 is of a type "BusinessDocumentTransmissionHeader" 36370 and there is zero or one 36366 TransmissionHeader entity 36364 in a TransmissionInformation package 36362.

The TransmissionInformationHeader 36364 includes an ID 36372, a PackageOrdinalNumberValue 36380, a PackageTotalNumberValue 36388, and a MinumumRequestedLogItemServerityCode 36396 at the third level 36306. The ID 36372 is of a type GDT 36376 "TransmissionID" 36378 and there is one 36374 ID 36372 in a TransmissionHeader 36364. The PackageOrdinalNumberValue 36380 is of a type GDT 36384 "OrdinalNumberValue" and there is one 36382 PackageOrdinalNumberValue 36380 in a TransmissionHeader 36364. The PackageTotalNumberValue 36386 is of a type GDT 36392 "TotalNumberValue" 36394 and there is zero or one 36390 PackageTotalNumberValue 36388 in a TransmissionHeader 36364. The MinimumRequestedLogItemServerityCode 36396 is of a type GDT 36300A "LogItemSeverityCode" 36302A and there is zero or one 36398 MinimumRequestedLogItemServerityCode in a TransmissionHeader 36364.

The Catalogue package 36304A includes a Catalogue entity 36306A at the second level 36304 and a GlobalInformation package 36318B, Model package 36390D, and Content package 36302K. The Catalogue entity 36306A is of a type "TransmissionCatalogue" 36312A and there is one 36308A in a Catalogue package 36304A.

The Catalogue entity 36306A includes an @actionCode 36314A, an @completeTransmissionIndicator 36322A, an @providerPropertyValuationListCompleteTransmissionIndicator 36330A, an @languageCode 36338A, an @currencycode 36346A, an @unitCode 36354A, an ID 36362A, a version ID 36370A, a Name 36378A, a TypeCode 36386A, and a ValidityPeriod 36394A at the third level 36306. The @actionCode 36314A is of a type GDT 36318A "ActionCode" 36320A, and there is zero or one 36316A@actionCode 36314A in a Catalogue entity 36306A. The @completeTransmissionIndicator 36322A is of a type GDT 36326A "CompleteTransmissionIndicator" 36328A, and there is zero or one 36324A @completeTransmissionIndicator 36322A in a Catalogue entity 36306A. The @providerPropertyValuationListCompleteTransmissionIndicator 36330A is of a type GDT 36334A "CompleteTransmissionIndicator" 36336A, and there is zero or one 36332A @providerPropertyValuationListCompleteTransmissionIndicator 36330A in a Catalogue entity 36306A. The @languageCode 36338A is of a type GDT 36342A "LanguageCode" 36344A, and there is zero or one 36340A @languageCode 36338A in a Catalogue entity 36306A. The @currencyCode 36346A is of a type GDT 36350A "CurrencyCode" 36352A, and there is zero or one 36348A @currencyCode 36346A in a Catalogue entity 36306A. The @unitCode 36354A is of a type GDT 36358A "MeasureUnitCode" 36360A, and there is zero or one 36356A@unitCode 36354A in a Catalogue entity 36306A. The ID 36362A is of a type GDT 36366A "CatalogueID" 36368A, and there is one 36364A ID 36362A in a Catalogue entity 36306A. The VersionID 36370A is of a type GDT 36374A "VersionID" 36376A, and there is zero or one 36372A VersionID 36370A in a Catalogue entity 36306A. The Name 36378A is of a type GDT 36382A "Name" 36384A, and there is any number of 36380A Name 36378A in a Catalogue entity 36306A. The TypeCode 36386A is of a type GDT 36390A "CatalogueTypeCode" 36392A, and there is one 36388A TypeCode 36386A in a Catalogue entity 36306A. The ValidityPeriod 36394A is of a type GDT 36398A "DateTimePeriod" 36300B, and there is zero or one 36396A ValidityPeriod 36394A in a Catalogue entity 36306A.

The ValidityPeriod 36394A includes a StartDateTime 36302B and an EndDateTime 36310B at the fourth level 36308. The StartDateTime 36302B is of a type GDT 36306B "DateTime" 36308B, and there is zero or one 36304B StartDateTime 36302B in a ValidityPeriod 36394A. The EndDateTime 36310B is of a type GDT 36314B "DateTime" 36316B, and there is zero or one 36312B EndDateTime 36310B in a ValidityPeriod 36394A.

The GlobalInformation package 36318B includes a ProviderPropertyValuation 36320B at the third level 36306. The ProviderPropertyValuation 36320B is of a type GDT 36324B "PropertyValuation" 36326B, and there is any number of 36322B ProviderPropertyValuation 36320B in a GlobalInformation 36318B.

The ProviderPropertyValuation 36320B includes an @actionCode 36328B, a PropertyReference 36336B, and a ValueGroup 36352B at the fourth level 36308. The @actionCode 36328B is of a type GDT 36332B "ActionCode" 36334B, and there is zero or one 36330B @actionCode 36328B in a ProviderPropertyValuation 36320B. The PropertyReference 36336B is of a type GDT 36340B "Property- Reference" 36342B, and there is one 36338B PropertyReference 36336B in a ProviderPropertyValuation 36320B.

The PropertyReference 36336B includes an ID 36344 B at the fifth level 36310. The ID 36344B is of a type GDT 36348B "PropertyID" 36350B, and there is one 36346B ID 36344B in a PropertyReference 36336B.

The ValueGroup 36352B is of a type GDT 36356B "PropertyValueIterator" 36358B, and there is any number 36354B of ValueGroup 36352B in a ProviderPropertyValuation 36320B.

The ValueGroup 36352B includes an ID 36360B, a ParentID 36368B, an OrdinalNumberValue 36376B, and a PropertyValue 36384B of the fifth level 36310. The ID 36360B is of a type CCT 36364B "Identifier" 36366B, and there is zero or one 36362B ID 36360B in a ValueGroup 36352B. The ParentID 36368B is of a type CCT 36372B "Identifier" 36374B, and there is zero or one 36370B ParentID 36368B in a ValueGroup 36352B. The OrdinalNumberValue 36376B is of a type GDT 36380B "OrdinalNumberValue" 36382B, and there is zero or one 36378B OrdinalNumberValue 36376B in a ValueGroup 36352B. The PropertyValue 36384B is of a type GDT 36388B "PropertyValue" 36390B, and there is any number of 36386B PropertyValue 36384B in a ValueGroup 36352B.

The PropertyValue 36384B includes an AmountSpecification 36392B, a Quantity Specification 36320C, a DecimalSpecification 36348C, a FloatSpecification 36376C, an IntegerSpecification 36304D, a DateTimeSpecification 36332D, a NameSpecification 36360D, and an IndicatorSpecification 36378D at the sixth level 36312. There is zero or one 36394B AmountSpecification 36392B in a PropertyValue 36384B.

The AmountSpecification 36392B includes an amount 36396B, a LowerAmount 36304C, and an UpperAmount 36312C of the seventh level 36314. The Amount 36396B is of a type GDT 36300C "Amount" 36302C, and there is zero or one 36398B Amount 36396B in a AmountSpecification 36392B. The LowerAmount 36304C is of a type GDT 36308C "Amount" 36310C, and there is zero or one 36306C LowerAmount 36304C in a AmountSpecification 36392B. The UpperAmount 36312C is of a type GDT 36316C "Amount" 36318C, and there is zero or one 36314C UpperAmount 36312C in a AmountSpecification 36392B.

There is zero or one 36322C QuantitySpecificafion 36320C in a PropertyValue 36384B. The QuantitySpecification 36320C includes a Quantity 36324C, a LowerQuantity 36332C, and an UpperQuantity 36340C at the seventh level 36314. The Quantity 36324C is of a type GDT 36328C "Quantity" 36330C, and there is zero or one 36326C Quantity 36324C in a QuantitySpecification 36320C. The LowerQuantity 36332C is of a type GDT 36336C "Quantity" 36338C, and there is zero or one 36334C LowerQuantity 36332C in a QuantitySpecification 36320C. The UpperQuantity 36340C is of a type GDT 36344C "Quantity" 36346C, and there is zero or one 36342C UpperQuantity 36340C in a QuantitySpecification 36320C.

There is zero or one 36350C DecimalSpecification 36348C in a PropertyValue 36384B. The DecimalSpecification 36348C includes a DecimalValue 36352C, a LowerDecimalValue 36360C, and an UpperDecimalValue 36368C at the seventh level 36314. The DecimalValue 36352C is of a type GDT 36356C "DecimalValue" 36358C, and there is zero or one 36354C DecimalValue 36352C in a DecimalSpecification 36348C. The LowerDecimalValue 36360C is of a type GDT 36364C "DecimalValue" 36366C, and there is zero or one 36362C LowerDecimalValue 36360C in a DecimalSpecification 36348C. The UpperDecimalValue 36368C is of a type GDT 36372C "DecimalValue" 36374C, and there is zero or one 36370C UpperDecimalValue 36368C in a DecimalSpecification 36348C.

There is zero or one 36378C FloatSpecification 36376C in a PropertyValue 36384B. the FloatSpecification 36376 includes a FloatValue 36380C, a LowerFloatValue 36388C, and an UpperFloatValue 36396C at the seventh level 36314. The FloatValue 36380C is of a type GDT 36384C "FloatValue" 36386C, and there is zero or one 36382 CFloatValue 36380C in a FloatSpecification 36376C. The LowerFloatValue 36388C is of a type GDT 36392C "FloatValue" 36394C, and there is zero or one 36390C LowerFloatValue 36388C in a FloatSpecification 36376C. The UpperFloatValue 36396C is of a type GDT 36300D "FloatValue" 36302D, and there is zero or one 36398C UpperFloatValue 36396C in a FloatSpecification 36376C.

There is zero or one 36306D IntegerSpecification 36304D in a PropertyValue 36384B. The IntegerSpecificaton 36304D includes an IntegerValue 36308D, a LowerIntegerValue 36316D, and an UpperIntegerValue 36324D at the seventh level 36314. The IntegerValue 36308D is of a type GDT 36312D "IntegerValue" 36314D, and there is zero or one 36310 DIntegerValue 36308D in a IntegerSpecification 36304D. The LowerIntegerValue 36316D is of a type GDT 36320D "IntegerValue" 36322D, and there is zero or one 36318D LowerIntegerValue 36316D in a IntegerSpecification 36304D. The UpperIntegerValue 36324D is of a type GDT 36328D "IntegerValue" 36330D, and there is zero or one 36326D UpperIntegerValue 36324D in a IntegerSpecification 36304D.

There is zero or one 36334D DateTimeSpecification 36332D in a PropertyValue 36384B. The DateTimeSpecification 36332D includes a DateTime 36336D, a StartDateTime 36344D, and an EndDateTime 36352D at the seventh level 36314. The DateTime 36336D is of a type GDT 36340D "DateTime" 36342D, and there is zero or one 36338D DateTime 36336D in a DateTimeSpecification 36332D. The StartDateTime 36344D is of a type GDT 36348D "DateTime" 36350D, and there is zero or one 36346D StartDateTime 36344D in a DateTimeSpecification 36332D. The EndDateTime 36352D is of a type GDT 36356D "DateTime" 36358D, and there is zero or one 36354D EndDateTime 36352D in a DateTimeSpecification 36332D.

There is zero or one 36362D NameSpecification 36360D in a PropertyValue 36384B. The NameSpecification 36360D includes a Name 36364D at the seventh level 36314. The Name 36364D is of a type GDT 36368D "Name" 36370D, and there is zero or one 36366D Name 36364D in a NameSpecification 36360D.

There is zero or one 36380D IndicatorSpecification 36378D in a PropertyValue 36384B. The The IndicatorSpecification 36378D includes an Indicator 36382D. The Indicator 36382D is of a type GDT 36386D "Indicator" 36388D, and there is zero or one 36384D Indicator 36382D in a IndicatorSpecification 36378D.

The Model package 36390D includes a Model entity 36392D at the third level 36306 and a PropertyDefinitionClass 36332E, a PropertyDataType package 36386E, a Propery package 36380F, a CatalogueItemProperty package 36394G, a CatalogueSectionType package 36328H, and a CatalogueSchema package 36394H. The Model entity 36392D is of a type "Catalogue Model" 36398D, and there is zero or one 36394D Model entity 36392D in a Model package 36390D.

The Model entity 36392D includes an @propertyDataTypeListCompleteTransmissionIndicator 36300E, an @propertyListCompleteTransmissionIndicator 36308E, an @catalogueSectionTypeListCompleteTransmissionIndicator 36316E, and an @catalogueSchemaListCompleteTransmissionIndicator 36324E at the fourth level 36308. The @propertyDataTypeListCompleteTransmissionIndicator 36300E is of a type GDT 36304E "CompleteTransmissionIndicator" 36306E, and there is zero or one 36302E @propertyDataTypeListCompleteTransmissionIndicator 36300E in a Model entity 36392D. The @propertyListCompleteTransmissionIndicator 36308E is of a type GDT 36312E "CompleteTransmissionIndicator" 36314E, and there is zero or one 36310E@propertyListCompleteTransmissionIndicator 36308E in a Model entity 36392D. The @catalogueSectionTypeListCompleteTransmissionIndicator 36316E is of a type GDT 36320E "CompleteTransmissionIndicator" 36322E, and there is zero or one 36318E @catalogueSectionTypeListCompleteTransmissionIndicator 36316E in a Model entity 36392D. The @catalogueSchemaListCompleteTransmissionindicator 36324E is of a type GDT 36328E "CompleteTransmissionIndicator" 36330E, and there is zero or one 36326E @catalogueSchemaListCompleteTransmissionIndicator 36324E in a Model entity 36392D.

The PropertyDefinitionClass package 36332E includes a PropertyDefinitionClass entity 36334E at the fourth level 36308. The PropertyDefinitionClass entity 36334E is of a type GDT 36338E "PropertyDefinitionClass" 36340E, and there is any number of 36336E PropertyDefinitionClass entity 36334E in a PropertyDefinitionClass package 36332E.

The PropertyDefinitionClass 36334E includes an ID 36342E, a PreferredName 36350E, and a DefinedProperty 36358E at the fifth level 36310. The ID 36342E is of a type GDT 36346E "PropertyDefinitionClassID" 36348E, and there is one 36344E ID 36342E in a PropertyDefinitionClass 36334E. The PreferredName 36350E is of a type GDT 36354E "Name" 36356E, and there is one 36352E PreferredName 36350E in a PropertyDefinitionClass 36334E. There is any number of 36360E DefinedProperty 36358E in a PropertyDefinitionClass 36334E.

The DefinedProperty 36358E includes a Reference 36362E and an OrdinalNumberValue 36378E of the sixth level 36312. The Reference 36362E is of a type GDT 36366E "PropertyReference" 36368E, and there is one 36364E Reference 36362E in a DefinedProperty 36358E.

The Reference 36362E includes an ID 36370E at the seventh level. The ID 36370E is of a type GDT 36374E "PropertyID" 36376E, and there is one 36372E ID 36370E in a Reference 36362E.

The OrdinalNumberValue 36378E is of a type GDT 36382E "OrdinalNumberValue" 36384E, and there is zero or one 36380E OrdinalNumberValue 36378E in a DefinedProperty 36358E.

The PropertyDataType entity 36388E is of a type GDT 36392E "PropertyDataType" 36394E, and there is any number of 36390E PropertyDataType entity 36388E in a PropertyDataType package 36386E.

The PropertyDataType package 36386E includes a PropertyDataType entity 36388E at the fifth level 36310. The PropertyDataType entity 36388E is of a type GDT 36392E "PropertyReference" 36394E, and there is any number 36390E of PropertyDataType entity 36388E in a PropertyDataType package 36386E.

The PropertyDataType 36388E includes an @actionCode 36396E, an ID 36304F, a PreferredName 36312F, a FormatCode 36328F, a MaximumTotalDigitNumberValue 36336F, a FractionalDigitNumberValue 36344F, a PropertyDefinitionClassReference 36352F, and an AlloedPropertyValueElement 36368F at the fifth level 36310. The @actionCode 36396E is of a type GDT 36300F "ActionCode" 36302F, and there is zero or one 36398E @actionCode 36396E in a PropertyDataType 36388E. The ID 36304F is of a type GDT 36308F "PropertyDataTypeID" 36310F, and there is zero or one 36306F ID 36304F in a PropertyDataType 36388E. The PreferredName 36312F is of a type GDT 36316F "Name" 36318F, and there is one or more 36314F PreferredName 36312F in a PropertyDataType 36388E.

The PreferredName 36312F includes an @languageCode 36320F at the sixth level 36312. The @languageCode 36320F is of a type GDT 36324F "LanguageCode" 36326F, and there is zero or one 36322F@languageCode 36320F in a PreferredName 36312F.

The FormatCode 36328F is of a type GDT 36332F "PropertyDataTypeFormatCode" 36334F, and there is one 36330F FormatCode 36328F in a PropertyDataType 36388E. The MaximumTotalDigitNumberValue 36336F is of a type GDT 36340F "DigitNumberValue" 36342F, and there is zero or one 36338F MaximumTotalDigitNumberValue 36336F in a PropertyDataType 36388E. The FractionalDigitNumberValue 36344F is of a type GDT 36348F "DigitNumberValue" 36350F, and there is zero or one 36346F FractionalDigitNumberValue 36344F in a PropertyDataType 36388E. The PropertyDefinitionClassReference 36352F is of a type GDT 36356F "PropertyDefinitionClassReference" 36358F, and there is zero or one 36354F PropertyDefinitionClassReference 36352F in a PropertyDataType 36388E.

The PropertyDefinitionClassReference 36352F includes an ID 36360F at the sixth level 36312. The ID 36360F is of a type GDT 36364F "PropertyDefinitionClassID" 36366F, and there is one 36362F ID 36360F in a PropertyDefinitionClassReference 36352F.

There is any number of 36370F AllowedPropertyValueElement 36368F in a PropertyDataType 36388E. The AllowedPropertyValueElement 36368F includes a PropertyValue 36372F at the sixth level 36312. The PropertyValue 36372F is of a type GDT 36376F "PropertyValue" 36378F, and there is one 36374F PropertyValue 36372F in an AllowedPropertyValueElement 36368F.

The Property package 36380F includes a Property entity 36382F at the fourth level 36308. The Property entity 36382F is of a type GDT 36386F "Property" 36388F, and there is any number of 36384F Property entity 36382F in a Property package 36380F.

The Property entity 36382F includes an @actionCode 36390F, an ID 36398F, a DefinitionClassReference 36306G, a PreferredName 36322G, a PropertyDataTypeReference 36330G, an AspectID 36346G, a TargetInterfaceElementID 36354G, a MultipleValueIndicator 36362G, a TextSearchableIndicator 36370G, a ParametricSearchAbleIndicator 36378G, and a ValuationRequiredIndicator 36386G. The @actionCode 36390F is of a type GDT 36394F "ActionCode" 36396F, and there is zero or one 36392F @actionCode 36390F in a Property entity 36382F. The ID 36398F is of a type GDT 36302G "PropertyID" 36304G, and there is one 36300G ID 36398F in a Property entity 36382F. The DefinitionClassReference 36306G is of a type GDT 36310G "PropertyDefinitionClassReference" 36312G, and there is zero or one 36308G DefinitionClassReference 36306G in a Property entity 36382F.

The DefinitionClassReference 36306G includes an ID 36314G at the sixth level 36312. The ID 36314G is of a type GDT 36318G "PropertyDefinitionClassID" 36320G, and there is one 36316G ID 36314G in a DefinitionClassReference 36306G.

The PreferredName 36322G is of a type GDT 36326G "Name" 36328G, and there is at least one 36324G Preferred- Name 36322G in a Property entity 36382F. The PropertyDataTypeReference 36330G is of a type GDT 36334G "PropertyDataTypeReference" 36336G, and there is one 36332G PropertyDataTypeReference 36330G in a Property entity 36382F.

The PropertyDataTypeReference 36330G includes an ID 36338G at the sixth level 36312. The ID 36338G is of a type GDT 36342G "PropertyDataTypeID" 36344G, and there is one 36340G ID 36338G in a PropertyDataTypeReference 36330G. The AspectID 36346G is of a type GDT 36350G "AspectID" 36352G, and there is any number of 36348G AspectID 36346 G in a Property entity 36382F. The TargetInterfaceElementID 36354G is of a type GDT 36358G "InterfaceElementID" 36360G, and there is any number of 36356G TargetInterfaceElementID 36354G in a Property entity 36382F. The MultipleValueIndicator 36362G is of a type GDT 36366G "PropertyMultipleValueIndicator" 36368G, and there is zero or one 36364G MultipleValueIndicator 36362G in a Property entity 36382F. The TextSearchableIndicator 36370G is of a type GDT 36374G "TextSearchableIndicator" 36376G, and there is zero or one 36372G TextSearchableIndicator 36370G in a Property entity 36382F. The ParametricSearchableIndicator 36378G is of a type GDT 36382G "PropertyParametricSearchableIndicator" 36384G, and there is zero or one 36380G ParametricSearchableIndicator 36378G in a Property entity 36382F. The ValuationRequiredIndicator 36386G is of a type GDT 36390G "PropertyValuationRequiredIndicator" 36392G, and there is zero or one 36388G ValuationRequiredIndicator 36386G in a Property entity 36382F.

The CatalogueItemProperty package 36394G includes a CatalogueItemProperty entity 96G. The CatalogueItemProperty entity 36396G is of a type "CatalogueItemProperty" 36302H, and there is any number of 36398G CatalogueItemProperty entity 36396G in a CatalogueItemProperty package 36394G.

The CatalogueItemProperty entity 36396G includes a ProptertyReference 36304H and an OrdinalNumberValue 36320H at the fifth level 36310. The PropertyReference 36304H is of a type GDT 36308H "PropertyReference" 36310H, and there is one 36306H PropertyReference 36304H in a CatalogueItemProperty entity 36396G.

The PropertyReference 36304H includes an ID 36312H at the sixth level 36312. The ID 36312H is of a type GDT 36316H "PropertyID" 36318H, and there is one 36314H ID 36312H in a PropertyReference 36304H.

The OrdinalNumberValue 36320H is of a type GDT 36324H "OrdinalNumberValue" 36326H, and there is one 36322H OrdinalNumberValue 36320H in a CatalogueItemProperty entity 36396G.

The CatalogueSectionType package 36328H includes a CatalogueSectionType entity 36330H at the forth level 36308. The CatalogueSectionType entity 36330H is of a type "Catalogue Section Type" 36336H, and there is any number of 36332H CatalogueSectionType entities 36330H in a CatalogueSectionType package 36328H.

The CatalogueSectionType entity 36330H includes an @actionCode 36338H, an ID 36346H, a Name 36354H, and a SectionProperty 36362H at the fifth level 36310. The @actionCode 36338H is of a type GDT 36342H "ActionCode" 36344H, and there is zero or one 36340H@actionCode 36338H in a CatalogueSectionType 36330H. The ID 36346H is of a type GDT 36350H "CatalogueSectionTypeID" 36352H, and there is one 36348H ID 36346H in a CatalogueSectionType 36330H. The Name 36354H is of a type GDT 36358H "Name" 36360H, and there is any number of 36356H Name 36354H in a CatalogueSectionType 36330H. The SectionProperty 36362H is of a type "CatalogueSectionTypeSectionProperty" 36368H, and there is any number of 36364H SectionProperty 36362H in a CatalogueSectionType 36330H.

The SectionProperty 36362H includes a PropertyReference 36370H and an OrdinalNumberValue 36386H at the sixth level 36312. The PropertyReference 36370H is of a type GDT 36374H "PropertyReference" 36376H, and there is one 36372H PropertyReference 36370H in a SectionProperty 36362H.

The PropertyReference 36370H includes an ID 36378H at the seventh level 36314. The ID 36378H is of a type GDT 36382H "PropertyID" 36384H, and there is one 36380H ID 36378H in a PropertyReference 36370H.

The OrdinalNumberValue 36386H is of a type GDT 36390H "OrdinalNumberValue" 36392H, and there is one 36388H OrdinalNumberValue 36386H in a SectionProperty 36362H.

The CatalogueSchemea package 36394H includes a CatalogueSchema entity 36396H at the fourth level 36308. The CatalogueSchema entity 36396H is of a type "Catalogue Schema" 36302I, and there is any number of 36398H CatalogueSchema entity 36396H in a CatalogueSchema package 36394H.

The CatalogueSchema entity 36396H includes an @actionCode 36304I, an @catalogueSectionListCompleteTransmissionIndicator 36312I, an @catalogueSectionRelationshipListCompleteTransmissionIndicator 36320I, an ID 36328I, a TypeCode 36336I, a Name 36344I, a CatalogueItemProperty 36352I, a CatalogueSection 36384I, and a CatalogueSectionRelationship 36370J at the fifth level 36310. The @actionCode 36304I is of a type GDT 36308I "ActionCode" 36310I, and there is zero or one 36306I@actionCode 36304I in a CatalogueSchema 36396H. The @catalogueSectionListCompleteTransmissionIndicator 36312I is of a type GDT 36316I "CompleteTransmissionIndicator" 36318I, and there is zero or one 36314I@catalogueSectionListCompleteTransmissionIndicator 36312I in a CatalogueSchema 36396H. The @catalogueSectionRelationshipListCompleteTransmissionIndicator 36320I is of a type GDT 36324I "CompleteTransmissionIndicator" 36326I, and there is zero or one 36322I@catalogueSectionRelationshipListCompleteTransmissionIndicator 36320I in a CatalogueSchema 36396H. The ID 36328I is of a type GDT 36332I "CatalogueSchemaID" 36334I, and there is one 36330I ID 36328I in a CatalogueSchema 36396H. The TypeCode 36336I is of a type GDT 36340I "CatalogueSchemaTypeCode" 36342I, and there is zero or one 36338I TypeCode 36336I in a CatalogueSchema 36396H. The Name 36344I is of a type GDT 36348I "Name" 36350I, and there is any number of 36346I Name 36344I in a CatalogueSchema 36396H. The CatalogueItemProperty 36352I is of a type "CatalogueSchemaCatalogueItemProperty" 36358I, and there is any number of 36354I CatalogueItemProperty 36352I in a CatalogueSchema 36396H.

The CatalogueItemProperty 36352I includes a PropertyReference 36360I and an QrdinalNumberValue 36376I at the sixth level 36312. The PropertyReference 36360I is of a type GDT 36364I "PropertyReference" 36366I, and there is one 36362I PropertyReference 36360I in a CatalogueItemProperty 36352I.

The PropertyRefernce 36360I includes an ID 36368I at the seventh level 36314. The ID 36368I is of a type GDT 36372I "PropertyID" 36374I, and there is one 36370I ID 36368I in a PropertyReference 36360I.

The OrdinalNumberValue 36376I is of a type GDT 36380I "OrdinalNumberValue" 36382I, and there is one 36378I OrdinalNumberValue 36376I in a CatalogueItemProperty 36352I.

The CatalogueSection 36384I is of a type "CatalogueSection" 36390I, and there is any number of 36386I CatalogueSection 36384I in a CatalogueSchema 36396H.

The CatalogueSection 36384I includes an @actionCode 36392I, an @propertyValuationListCompleteTransmissionIndicator 36300J, an ID 36308J, a TypeID 36316J, a Name 36324J, a PropertyValuation 36332J, and a CatalogueItemProperty 36340J The @actionCode 36392I is of a type GDT 36396I "ActionCode" 36398I, and there is zero or one 36394I@actionCode 36392I in a CatalogueSection 36384I. The @propertyValuationListCompleteTransmissionIndicator 36300J is of a type GDT 36304J "CompleteTransmissionIndicator" 36306J, and there is zero or one 36302J @propertyValuationListCompleteTransmissionIndicator 36300J in a CatalogueSection 36384I. The ID 36308J is of a type GDT 36312J "CatalogueSectionID" 36314J, and there is one 36310J ID 36308J in a CatalogueSection 36384I. The TypeID 36316J is of a type GDT 36320J "CatalogueSectionTypeID" 36322J, and there is zero or one 36318J TypeID 36316J in a CatalogueSection 36384I. The Name 36324J is of a type GDT 36328J "Name" 36330J, and there is any number of 36326J Name 36324J in a CatalogueSection 36384I. The PropertyValuation 36332J is of a type GDT 36336J "PropertyValuation" 36338J, and there is any number of 36334J PropertyValuation 36332J in a CatalogueSection 36384I. The CatalogueItemProperty 36340J is of a type "CatalogueSectionCatalogueItemProperty" 36346J, and there is any number of 36342J CatalogueItemProperty 36340J in a CatalogueSection 36384I.

The CatalogueItemProperty 36340 J includes a PropertyReference 36348J, and an OrdinalNumberValue 36362J at the seventh level 36314. The PropertyReference 36348J is of a type GDT 36352J "PropertyReference" 36354J, and there is one 36350J PropertyReference 36348J in a CatalogueItemProperty 36340J. The OrdinalNumberValue 36362J is of a type GDT 36366J "OrdinalNumberValue" 36368J, and there is one 36364J OrdinalNumberValue 36362J in a CatalogueItemProperty 36340J.

The CatalogueSectionRelationship 36370J is of a type "CatalogueSectionRelationship" 36376J, and there is any number of 36372J CatalogueSectionRelationship 36370J in a CatalogueSchema 36396H.

The CatalogueSectionRelationship 36370J includes an @actionCode 36378J, a SourceCatalogueSectionID 36386J, and a TargetCatalogueSectionID 36394J at the sixth level 36312. The @actionCode 36378J is of a type GDT 36382J "ActionCode" 36384J, and there is zero or one 36380J @actionCode 36378J in a CatalogueSectionRelationship 36370J. The SourceCatalogueSectionID 36386J is of a type GDT 36390J "CatalogueSectionID" 36392J, and there is one 36388J SourceCatalogueSectionID 36386J in a CatalogueSectionRelationship 36370J. The TargetCatalogueSectionID 36394J is of a type GDT 36398J "CatalogueSectionID" 36300K, and there is one 36396J TargetCatalogueSectionID 36394J in a CatalogueSectionRelationship 36370J.

The Content package 36302K includes a Content entity 36304K at the third level, a CatalogueItem package 36344K, and a CatalogueView package 36358L. The Content entity 36304K is of a type "CatalogueContent" 36310K, and there is zero or one 36306K Content entity 36304K in a Content package 36302K.

The Content entity 36304K includes an @catalogueItemListCompleteTransmissionIndicator 36312K, an @catalogueItemRelationshipListCompleteTransmissionIndicator 36320K, an @catalogueViewListCompleteTransmissionIndicator 36328K, and a CatalogueSchemaID 36336K at the fourth level 36308. The @catalogueItemListCompleteTransmissionIndicator 36312K is of a type GDT 36316K "CompleteTransmissionIndicator" 36318K, and there is zero or one 36314K @catalogueItemListCompleteTransmissionIndicator 36312K in a Content 36304K. The @catalogueItemRelationshipListCompleteTransmissionIndicator 36320K is of a type GDT 36324K "CompleteTransmissionIndicator" 36326K, and there is zero or one 36322K@catalogueItemRelationshipListCompleteTransmissionIndicator 36320K in a Content 36304K. "The @catalogueViewListCompleteTransmissionIndicator 36328K is of a type GDT 36332K "CompleteTransmissionIndicator" 36334K, and there is zero or one 36330K @catalogueViewListCompleteTransmissionIndicator 36328K in a Content 36304K. The CatalogueSchemaID 36336K is of a type GDT 36340K "CatalogueSchemaID" 36342K, and there is zero or one 36338K CatalogueSchemaID 36336K in a Content 36304K.

The CatalogueItem package 36344K includes a CatalogueItem entity 36346K and a CatalogueItemRelationship 36318L at the fourth level 36308. The CatalogueItem entity 36346K is of a type "Catalogue Item" 36352K, and there is any number of 36348K CatalogueItem entity 36346K in a CatalogueItem package 36344K.

The CatalogueItem entity 36346K includes an @actionCode 36354K, an @propertyValuationListCompleteTransmissionIndicator 36362K, an ID 36370K, a Description 36378K, a Classification 36386K, and a PropertyValuation 36310L at the fifth level 36310. The @actionCode 36354K is of a type GDT 36358K "ActionCode" 36360K, and there is zero or one 36356K @actionCode 36354K in a CatalogueItem 36346K. The @propertyValuationListCompleteTransmissionIndicator 36362K is of a type GDT 36366K "CompleteTransmissionIndicator" 36368K, and there is zero or one 36364K @propertyValuationListCompleteTransmissionIndicator 36362K in a CatalogueItem 36346K. The ID 36370K is of a type GDT 36374K "CatalogueItemID" 36376K, and there is one 36372K ID 36370K in a CatalogueItem 36346K. The Description 36378K is of a type GDT 36382K "Description" 36384K, and there is any number of 36380K Description 36378K in a CatalogueItem 36346K. The Classification 36386K is of a type "CatalogueItemClassification" 36392K, and there is any number of 36388K Classification 36386K in a CatalogueItem 36346K.

The Classification 36386K includes a CatalogueSchemaID 36394K and a CatalogueSectionID 36302L at the sixth level 36312. The CatalogueSchemaID 36394K is of a type GDT 36398K "CatalogueSchemaID" 36300L, and there is zero or one 36396K CatalogueSchemaID 36394K in a Classification 36386K. The CatalogueSectionID 36302L is of a type GDT 36306L "CatalogueSectionID" 36308L, and there is one 36304L CatalogueSectionID 36302L in a Classification 36386K.

The PropertyValuation 36310L is of a type GDT 36314L "PropertyValuation" 36316L, and there is any number of 36312L PropertyValuation 36310L in a CatalogueItem 36346K.

The CatalogueItemRelationship 36318L is of a type "CatalogueItemRelationship" 36324L, and there is any number of 36320L CatalogueItemRelationship 36318L in a Content 36304K.

The CatalogueItemRelationship 36318L includes an @actionCode 36326L, a SourceCatalogueItemID 36334L, a TargetCatalogueItemID 36342L, and a TypeCode 36350L at the fifth level 36310. The @actionCode 36326L is of a type GDT 36330L "ActionCode" 36332L, and there is zero or one 36328L @actionCode 36326L in a CatalogueItemRelationship 36318L. The SourceCatalogueItemID 36334L is of a type GDT 36338L "CatalogueItemID" 36340L, and there is one 36336L SourceCatalogueItemID 36334L in a CatalogueItemRelationship 36318L. The TargetCatalogueItemID 36342L is of a type GDT 36346L "CatalogueItemID" 36348L, and there is one 36344L TargetCatalogueItemID 36342L in a CatalogueItemRelationship 36318L. The TypeCode 36350L is of a type GDT 36354L "ObjectStructureRelationshipTypeCode" 36356L, and there is one 36352L TypeCode 36350L in a CatalogueItemRelationship 36318L.

The CatalogueView Package includes a CatalogueView entity 36360L at the fourth level 36308. The CatalogueView entity 36360L is of a type "CatalogueView" 36366L, and there is any number of 36362L CatalogueView entity 36360L in a CatalogueView package 36358L.

The CataloguView entity includes an @actionCode 36368L, an @itemListCompleteTransmissionIndicator 36376L, an @itemRelationshipTypeListCompleteTransmissionIndicator 36384L, an @excludedPropertyListCompleteTransmissionIndicator 36392L, an ID 36300M, a Name 36308M, a Schema 36316M, an Item 36364M, an ItemRelationshipType 36388M, and an ExcludedProperty 36312N at the fifth level 36310. The @actionCode 36368L is of a type GDT 36372L "ActionCode" 36374L, and there is zero or one 36370L @actionCode 36368L in a CatalogueView 36360L. The @itemListCompleteTransmissionIndicator 36376L is of a type GDT 36380L "CompleteTransmissionIndicator" 36382L, and there is zero or one 36378L @itemListCompleteTransmissionIndicator 36376L in a CatalogueView 36360L. The @itemRelationshipTypeListCompleteTransmissionIndicator 36384L is of a type GDT 36388L "CompleteTransmissionIndicator" 36390L, and there is zero or one 36386L @itemRelationshipTypeListCompleteTransmissionIndicator 36384L in a CatalogueView 36360L. The @excludedPropertyListCompleteTransmissionIndicator 36392L is of a type GDT 36396L "CompleteTransmissionIndicator" 36398L, and there is zero or one 36394L @excludedPropertyListCompleteTransmissionIndicator 36392L in a CatalogueView 36360L. The ID 36300M is of a type GDT 36304M "CatalogueViewID" 36306M, and there is one 36302M ID 36300M in a CatalogueView 36360L. The Name 36308M is of a type GDT 36312M "Name" 36314M, and there is any number of 36310M Name 36308M in a CatalogueView 36360L. The Schema 36316M is of a type "CatalogueViewSchema" 36322M, and there is any number of 36318M Schema 36316M in a CatalogueView 36360L.

The Schema 36316M includes an @sectionListCompleteTransmissionIndicator 36324M, a CatalogueSchemaID 36332M, and a Section 36340M at the sixth level 36312. The @sectionListCompleteTransmissionIndicator 36324M is of a type GDT 36328M "CompleteTransmissionIndicator" 36330M, and there is zero or one 36326M @sectionListCompleteTransmissionIndicator 36324M in a Schema 36316M. The CatalogueSchemaID 36332M is of a type GDT 36336M "CatalogueSchemaID" 36338M, and there is one 36334M CatalogueSchemaID 36332M in a Schema 36316M. The Section 36340M is of a type "CatalogueViewSchemaSection" 36346M, and there is any number of 36342M Section 36340M in a Schema 36316M.

The Section 36340M includes an @actionCode 36348 and a CatalogueSectionId 36356M at the seventh level 36314. The @actionCode 36348M is of a type GDT 36352M "ActionCode" 36354M, and there is zero or one 36350M @actionCode 36348M in a Section 36340M. The CatalogueSectionID 36356M is of a type GDT 36360M "CatalogueSectionID" 36362M, and there is one 36358M CatalogueSectionID 36356M in a Section 36340M.

The Item 36364M is of a type "CatalogueViewItem" 36370M, and there is any number of 36366M Item 36364M in a CatalogueView 36360L.

The Item 36364M includes an @actionCode 36372M and a CatalogueItemID 36380M at the sixth level 36312. The @actionCode 36372M is of a type GDT 36376M "ActionCode" 36378M, and there is zero or one 36374M @actionCode 36372M in a Item 36364M. The CatalogueItemID 36380M is of a type GDT 36384M "CatalogueItemID" 36386M, and there is one 36382M CatalogueItemID 36380M in a Item 36364M.

The ItemRelationshipType 36388M is of a type "CatalogueViewItemRelationshipType" 36394M, and there is any number of 36390M ItemRelationshipType 36388M in a CatalogueView 36360L.

The ItemRelationshipType 36388M includes an @actionCode 36396M and a CatalogueItemRelationshipTypeCode 36304N at the sixth level 36312. The @actionCode 36396M is of a type GDT 36300N "ActionCode" 36302N, and there is zero or one 36398M @actionCode 36396M in a ItemRelationshipType 36388M. The CatalogueItemRelationshipTypeCode 36304N is of a type GDT 36308N "ObjectStructureRelationshipTypeCode" 36310N, and there is one 36306N CatalogueItemRelationshipTypeCode 36304N in a ItemRelationshipType 36388M.

The ExcludedProperty 36312N is of a type "CatalogueViewExcludedProperty" 36318N, and there is any number of 36314N ExcludedProperty 36312N in a CatalogueView 36360L.

The ExcludedProperty 36312N includes an @actionCode 36320N and a PropertyReference 36328N at the sixth level 36312. The @actionCode 36320N is of a type GDT 36324N "ActionCode" 36326N, and there is zero or one 36322N@actionCode 36320N in a ExcludedProperty 36312N. The PropertyReference 36328N is of a type GDT 36332N "PropertyReference" 36334N, and there is one 36330N PropertyReference 36328N in a ExcludedProperty 36312N.

The PropertyReference 36328N includes an ID 36335N at the seventh level. The ID 36336N is of a type GDT 36340N "PropertyID" 36342N, and there is one 36338N ID 36336N in a PropertyReference 36328N.

(7) Message Data Type Catalogue Publication Transmission Package Message

The data model for the message data type CataloguePublicationTransmissionPackage Message used to implement a CataloguePublicationTransmissionPackageNotification message 35912 is depicted in FIG. 364. The message data type CataloguePublicationTransmissionPackageMessage includes a CataloguePublicationTransmissionPackageMessage package 36402. The CataloguePublicationTransmissionPackageMessage package 36402 includes a MessageHeader package 36404, a TransmissionInformation package 36406, a CataloguePublicationTransmission 36408, and a CataloguePublicationTransmissionPackageMessage object or entity 36410.

(a) Message Header Package

The MessageHeader package 36404 groups the business-related information relevant for sending a Business Document in a message. The MessageHeader package 36404 includes a MessageHeader entity 36412 and a SenderParty entity 36416. There is a 1:1 relationship 36414 between the MessageHeader entity 36412 and the CatalogueUpdateMessage entity 36410. There is a 1:c relationship 36418 between the MessageHeader entity 36412 and the SenderParty entity 36416.

As discussed above, the MessageHeader entity 36412 groups the business-related information from the sending application's point of view for identifying the Business Document in a message, information about the sender, and potentially information about the receiver. The MessageHeader entity 36412 is of type GDT BusinessDocumentMessageHeader.

The SenderParty entity 36416 is the party responsible for sending of a business document on a business-related application level. The SenderParty entity 36416 is of type GDT BusinessDocumentMessageHeaderParty.

(b) Transmission Information Package

The TransmissionInformation package 36406 groups the information pertaining to the transmission of the object or entity (e.g., the CataloguePublicationTransmissionPackageMessage entity 36410) included in the message. The TransmissionInformation package 36406 includes a TransmissionLog entity 36420, which is a collection of events that occurred during processing of the transmitted business document object. The TransmissionLog is subdivided into one or more TransmissionLogItem ("Item") entities 36424. Each TransmissionLogItem entity 36424 provides information about an event that occurred during processing of the respective transmitted business document object. Each TransmissionLogItem entity 36424 is of type GDT: LogItem. The MinimumRequestedLogItemSeverityCode stated in message CataloguePublicationRequest 35910 determines which LogItems are to be returned by specifying their severity. There is a 1:c relationship 36422 between the CataloguePublicationTransmissionPackageMessage entity 36410 and the TransmissionLog entity 36420 and a 1:n relationship 36426 between the TransmissionLog entity 36420 and each TransmissionLogItem entity 36424. A TransmissionLog entity 36420 provides information about the identification of a transmission.

(c) Catalogue Publication Transmission Package

The CataloguePublicationTransmission package 36408 groups information pertaining to a Catalogue publication transmission. The CataloguePublicationTransmission package 36408 includes a CataloguePublicationTransmission entity 36428. There is a 1:1 relationship 36430 between the CatalogueUpdateMessage entity 36410 and the CataloguePublicationTransmission entity 36428.

(i) CataloguePublicationTransmission Entity

The CataloguePublicationTransmission entity 36428 specifies a package of a catalogue publication transmission (e.g., all or portion of a CataloguePublicationRequest message 35910) and information about the reception of this package and the validity of the package's content. The CataloguePublicationTransmission entity 36428 includes an ID, a PackageOrdinalNumberValue, and a PackageCompletedIndicator. The ID is of type GDT: TransmissionID and identifies the transmission to which the package belongs. The PackageOrdinalNumberValue is of type GDT: OrdinalNumberValue and identifies the package in the transmission. The PackageCompletedIndicator is of type GDT: BusinessTransactionCompletedIndicator and specifies whether the transmission package sent as part of a CataloguePublicationRequest message 35910 was successfully received and if the package includes valid data or not.

(d) Message Data Type—Element Structure

FIGS. 365A-B depict the element structure for a CataloguePublicationTransmissionPackageNotification message 35912. The element structure is similar to the data model, but provides additional information regarding the details of the interface.

The element structure is similar to the above described data model of the message data type CataloguePublicationTransmissionPackageNotification message as reflected in FIG. 364, but provides additional information regarding the details for interfacing with or implementing a CataloguePublicationTransmissionPackageMessage, such as a CataloguePublicationTransmissionPackageNotification message 35912. As shown in FIG. 365A, the element structure identifies the different packages 36500 that may be in a respective CataloguePublicationTransmissionPackageNotification message 35912. The element structure for the CataloguePublicationTransmissionPackageNotification message 35912 includes three levels 36502, 36504 and 36506 each of which is associated with a respective package 36500. The element structure identifies the occurrence or cardinality 36508 and data type information (i.e., type 36510 and name 36512) for the elements at the respective levels 36502, 36504, and 36506.

The outermost package of this interface is a CataloguePublicationTransmissionPackageMessage package 36516, which includes a CataloguePublicationTransmissionPackageMessage entity 36518 at the first level 36502. The CataloguePublicationTransmissionPackageMessage entity 36518 is of generic data type ("GDT") 36520 CataloguePublicationTransmissionPackageMessage 36522.

The CataloguePublicationTransmissionPackageMessage package 36516 includes a MessageHeader package 36524, a TransmissionInformation package 36526, and a CataloguePublicationTransmission package 36528. The MessageHeader package 36524 includes a MessageHeader entity 36530, which is of type GDT 36534 BusinessDocumentMessageHeader 36536. There is one 36532 MessageHeader entity 36530 for each CataloguePublicationTransmissionPackageMessage entity 36518.

The MessageHeader entity 36530 includes an ID 36540 and a CreationDateTime 36548. The ID 36540 is of type GDT 36544 BusinessDocumentMessageID 36546. The CreationDateTime 36548 is of type GDT 36552 DateTime 36554. There is one 36542 ID 36540 for each MessageHeader entity 36530 and one 36550 CreationDateTime 36548 for each MessageHeader entity 36530.

The MessageHeader entity 36530 also includes a SenderParty entity 36556. The SenderParty entity 36556 is of type GDT 36560 BusinessDocumentMessageHeaderParty 36562. There is one or zero 36558 SenderParty entity 36556 for each MessageHeader entity 36530.

The TransmissionInformation package 36526 includes a TransmissionLog 36564. There is one or zero 36176 TransmissionLog 36564 for each CataloguePublicationTransmissionPackageMessage entity 36518. The TransmissionLog 36564 includes an Item 36568 of type GDT 36572 LogItem 36574. There is one or more 36570 Items 36568 for each TransmissionLog 36564.

The CataloguePublicationTransmission package 36528 includes a CataloguePublicationTransmission entity 36576. The CataloguePublicationTransmission entity 36576 is of type GDT 36580 CataloguePublicationTransmissionPackage 36582. There is one 36578 CataloguePublicationTransmission entity 36576 for each CataloguePublicationTransmissionPackageMessage entity 36518. The CataloguePublicationTransmission entity 36576 includes an ID 36584, a PackageOrdinalNumberValue 36592, and a PackageCompletedIndicator 36500A. The ID 36584 is of type GDT 36588 TransmissionID 36590. The PackageOrdinalNumberValue 36592 is of type GDT 36596 OrdinalNumberValue 36598. The PackageCompletedIndicator 36500A is of type GDT 36504A BusinessTransactionCompletedIndicator 36506A. There is one 36586 ID 36584 for each CataloguePublicationTransmission entity 36576. There is one 36594 PackageOrdinalNumberValue 36592 for each CataloguePublicationTransmission entity 36576. There is one 36502A PackageCompleted Indicator 36500A for each CataloguePublicationTransmission entity 36576.

(8) Message Data Type Catalogue Publication Confirmation Message

The data model for the message data type CataloguePublicationConfirmationMessage used to implement a CataloguePublicationConfirmation message 35914 is depicted in FIG. 366A. The message data type CataloguePublicationConfirmationMessage includes a CataloguePublicationConfirmationMessage package 36602. The CataloguePublicationConfirmationMessage package 36602 includes a MessageHeader package 36604, a TransmissionInformation package 36506, a Catalogue package 36608, and a CataloguePublicationConfirmationMessage object or entity 36610.

(a) Message Header Package

The MessageHeader package 36604 includes a MessageHeader entity 36612 and a SenderParty entity 36616. There is a 1:1 relationship 36614 between the MessageHeader entity 36612 and the CataloguePublicationConfirmationMessage entity 36610. There is a 1:c relationship 36618 between the MessageHeader entity 36612 and the SenderParty entity 36616.

As discussed above, the MessageHeader entity 36612 groups the business-related information from the sending application's or business entity's point of view for identifying the Business Document in a message, information about the sender, and potentially information about the receiver. The MessageHeader entity 36612 is of type GDT BusinessDocumentMessageHeader.

The SenderParty entity 36616 is the party responsible for sending of a business document on a business-related application level. The SenderParty entity 36616 is of type GDT BusinessDocumentMessageHeaderParty.

(b) Transmission Information Package

The TransmissionInformation package 36606 groups the information pertaining to the transmission of the object or entity (e.g., the CataloguePublicationConfirmationMessage entity 36610) included in the message. The TransmissionInformation package 36606 includes a TransmissionHeader entity 36620 and a TransmissionLog entity 36622. The TransmissionHeader entity 36620 provides information about the identification of a transmission. The TransmissionHeader entity 36620 includes an ID of type GDT: TransmissionID. The TransmissionLog entity 36622 is a collection of events that occurred during processing of the transmitted business document object (e.g., the CataloguePublicationConfirnationMessage entity 36610). There is a 1:c relationship 36624 between the CataloguePublicationConfirmationMessage entity 36610 and the TransmissionHeader entity 36620. There is also a 1:c relationship 36626 between the CataloguePublicationConfirmationMessage entity 36610 and the TransmissionLog entity 36622. The TransmissionLog is subdivided into one or more TransmissionLogItem ("Item") entities 36628. Each TransmissionLogItem entity 36628 provides information about an event that occurred during processing of a CataloguePublicationRequest message 35910. Each TransmissionLogItem entity 36628 is of type GDT: LogItem. The MinimumRequestedLogItemSeverityCode stated in message CataloguePublicationRequest 35910 determines which LogItems are to be returned by specifying their severity. There is a 1:n relationship 36630 between the TransmissionLog entity 36622 and each TransmissionLogItem entity 36628.

(c) Catalogue Package

The catalogue package 36608 groups the information pertaining to a catalogue. The catalogue package 36608 includes a Catalogue entity 36632. There is a 1:1 relationship 36634 between the CataloguePublicationConfirmationMessage entity 36610 and the Catalogue entity 36632.

(i) CataloguePublicationTransmission Entity

The Catalogue entity 36632 in a CataloguePublicationConfirmation message 36614 provides confirmation whether the publication or deletion of a catalogue was successful or not. The Catalogue entity 36632 includes an ID and a PackageCompletedIndicator. The ID is of type GDT :CatalogueID and identifies the catalogue upon which publication or deletion is being confirmed. The PublicationCompletedIndicator is of type GDT BusinessTransactionCompletedIndicator and specifies whether the publishing or deletion of the catalogue was successful or not.

(d) Message Data Type—Element Structure

FIGS. 367A-C depict the element structure for a CataloguePublicationConfirmation message 35914. The element structure is similar to the above described data model of the message data type CataloguePublicationConfirmationMessage as reflected in FIG. 366, but provides additional information regarding the details for interfacing with or implementing a CataloguePublicationConfirmationMessage, such as a CataloguePublicationConfirmation message 35914. The element structure identifies the different packages 36700 in the interface, and represents the entities at various levels within the interface. As depicted in FIG. 367, the interface for CataloguePublicationConfirmationMessage includes three levels 36702, 36704, and 36706. The outermost package 36700 of this interface is a CataloguePublicationConfirmationMessage package 36714, which includes a CataloguePublicationConfirmationMessage entity 36716 at the first level 36702, a MessageHeader package 36722, a TransmissionInformation package 36756, and a Catalogue package 36786. The CataloguePublicationConfirmationMessage entity 36716 is of a type MDT 36718 "CataloguePublicationConfirmationMessage" 36720.

The MessageHeader package 36722 includes a MessageHeader entity 36724 at the second level 36704. The MessageHeader entity 36724 is of a type GDT 36728 "BusinessDocumentMessageHeader" 36730, and there is one 36732 MessageHeader entity 36724 for each MessageHeader package 36722.

The MessageHeader entity 36724 includes an ID 36732, CreationDateTime 36740, and SenderParty 36748 at the third level 36706. The ID 36732 is of a type GDT 36736 "BusinessDocumentMessageID" 36738 and there is one 36740 ID 36734 in a MessageHeader entity 36724. The CreationDateTime 36740 is of a type GDT 36744 "DateTime" 36746 and there is one 36742 CreationDateTime 36740 in a MessageHeader 36724. The SenderParty 36748 is of a type GDT 36752 "BusinessDocumentMessageHeaderParty" 36754 and there is zero or one 36750 SenderParty 36748 in a MessageHeader 36724.

The TransmissionInformation package 36756 includes TransmissionHeader 36758 and a TransmissionLog 36774 at the second level 36704. The TransmissionHeader 36758 is of a type "BusinessDocumentTransmissionHeader" 36764 and there is zero or one 36760 TransmissionHeader 36758 in a TransmissionInformation package 36756.

The TransmissionInformationHeader 36758 includes an ID 36766 at the third level 36706. The ID 36766 is of a type GDT 36770 "TransmissionID" 36772 and there is one 36768 ID 36766 in a TransmissionHeader 36758.

There is zero or one 36776 TransmissionLog 36774 in a TransmissionInformation package 36756. The TransmissionLog 36774 includes an Item 36778 at the third level 36706. The Item 36778 is of a type GDT 36782 "LogItem" 36784, and there is one or more Item 36778 in a TransmissionLog 36774.

The Catalogue package 36786 includes a Catalogue entity 36788 at the second level 36704. The Catalogue entity 36788 is of a type "CataloguePublicationConfirmation" 36794 and there is one 36790 Catalogue entity 36788 in a Catalogue package 36786.

The Catalogue entity 367088 includes an ID 36796 and a PublicationCompletedIndicator 36704A. The ID 36796 is of a type GDT 36700A "CatalogueID" 36702A, and there is one 36798 ID 36796 in a Catalogue entity 36788. The PublicationCompletedIndicator 36704A is of a type GDT 36708A "BusinessTransactionCompletedIndicator" 36710A, and there is one 36706A PublicationCompletedIndicator 36704A in a Catalogue entity 36788.

(9) Message Data Type Catalogue Publication Transmission Cancellation Request Message The data model for the message data type CataloguePublicationTransmissionCancellation RequestMessage used to implement a CataloguePublicationTransmissionCancellationRequest message 35916 is depicted in FIG. 368A. The message data type CataloguePublicationTransmissionCancellationRequestMessage includes a CataloguePublicationTransmissionCancellationRequestMessage package 36802. The CataloguePublicationTransmissionCancellationRequestMessage package 36802 includes a MessageHeader package 36804, a TransmissionInformation package 36506, a CataloguePublicationTransmission package 36808, and a CataloguePublicationTransmissionCancellationRequestMessage object or entity 36810.

(a) Message Header Package

The MessageHeader package 36804 includes a MessageHeader entity 36812 and a SenderParty entity 36816. There is a 1:1 relationship 36814 between the MessageHeader entity 36812 and the CataloguePublicationTransmissionCancellationRequestMessage entity 36810. There is a 1:c relationship 36818 between the MessageHeader entity 36812 and the SenderParty entity 36816.

As discussed above, the MessageHeader entity 36812 groups the business-related information from the sending application's or business entity's point of view for identifying the Business Document in a message, information about the sender, and potentially information about the receiver. The MessageHeader entity 36812 is of type GDT BusinessDocumentMessageHeader.

The SenderParty entity 36816 is the party responsible for sending of a business document on a business-related application level. The SenderParty entity 36816 is of type GDT BusinessDocumentMessageHeaderParty.

(b) Transmission Information Package

The TransmissionInformation package 36806 groups the information pertaining to the transmission of the object or entity (e.g., the CataloguePublicationTransmissionCancellationRequestMessage entity 36810) included in the message. The TransmissionInformation package 36806 includes a TransmissionHeader entity 36820. The TransmissionHeader entity 36820 provides information about the identification of a transmission. The TransmissionHeader entity 36820 includes a MinimalRequestedLogItemSeverityCode of type GDT: LogItemSeverityCode. The MininmalRequestedLogItemSeverityCode specifies the severity of log items to returned by a CataloguePublicationTransmissionCancellationConfirmation message 35918. There is a 1:c relationship 36822 between the CataloguePublicationTransmissionCancellationRequestMessage entity 36810 and the TransmissionHeader entity 36820.

(c) CataloguePublicationTransmission Package

The CataloguePublicationTransmission package 36808 groups the information pertaining to a catalogue publication transmission. The CataloguePublicationTransmission package 36808 includes a Catalogue package 36824 and a CataloguePublicationTransmission entity 36826. There is a 1:1 relationship 36828 between the CataloguePublicationTransmissionCancellationRequestMessage entity 36810 and the CataloguePublicationTransmission entity 36826.

(i) CataloguePublicationTransmission Entity

The CataloguePublicationTransmission entity 36826 in a CataloguePublicationTransmissionCancellationRequest message 36814 is the request to cancel the transmission of a catalogue and to restore an earlier published state (if such exists) of the catalogue. Moreover, no more packages are sent for this transmission. The CataloguePublicationTransmission entity 36826 includes an ID of type GDT :TransmissionID that identifies the catalogue transmission of the original catalogue publication request.

(ii) Catalogue Package

The Catalogue package 36824 groups the information pertaining to the catalogue to be restored. The Catalogue package 36824 includes a Catalogue entity 36830. There is a 1:1 relationship 36832 between the CataloguePublicationTransmission entity 36826 and the Catalogue entity 36830.

(iii) Catalogue

The Catalogue entity 36830 specifies the information about a catalogue necessary in the context of a CataloguePublicationTransmissionCancellationRequest so that, for example, the Catalogue Search Engine is able to restore the catalogue identified by the Catalogue entity 36830. The Catalogue entity 36830 includes an ID of type GDT :CatalogueID, which identifies the catalogue.

(d) Message Data Type—Element Structure

FIGS. 369A-C depict the element structure for a CataloguePublicationTransmissionCancellationRequest message 35916. The element structure is similar to the above described data model of the message data type CataloguePublicationTransmissionCancellationRequestMessage as reflected in FIG. 368A, but provides additional information regarding the details for interfacing with or implementing a CataloguePublicationTransmissionCancellationRequestMessage data type, such as a CataloguePublicationTransmissionCancellationRequest message 35916. As shown in FIG. 369A, the element structure identifies the different packages 36900 that may be in a respective CataloguePublicationTransmissionCancellationRequest message 35916. The element structure for the CataloguePublicationTransmissionCancellationRequest message 35916 includes four levels 36902, 36904, 36906, and 36908 each of which is associated with a respective package 36900. The element structure identifies the occurrence or cardinality 36910 and data type information (i.e., type 36912 and name 36914) for the elements at the respective levels 36902, 36904, 36906, and 36908.

The outermost package of this interface is a CataloguePublicationTransmissionCancellationRequestMessage package 36918, which includes a CataloguePublicationTransmissionCancellationRequestMessage entity 36918 at the first level 36902. The CataloguePublicationTransmissionCancellationRequestMessage entity 36918 is of generic data type ("GDT") 36922 CataloguePublicationTransmissionCancellationRequestMessage 36924.

The CataloguePublicationTransmissionCancellationRequestMessage package 36918 includes a MessageHeader package 36926, a TransmissionInformation package 36928, and a CataloguePublicationTransmission package 36930. The MessageHeader package 36926 includes a MessageHeader entity 36932, which is of type GDT 36936 BusinessDocumentMessageHeader 36938. There is one 36934 MessageHeader entity 36932 for each CataloguePublicationTransmissionCancellationRequestMessage entity 36920.

The MessageHeader entity 36932 includes an ID 36942 and a CreationDateTime 36950. The ID 36942 is of type GDT 36946 BusinessDocumentMessageID 36948. The CreationDateTime 36950 is of type GDT 36954 DateTime 36956. There is one 36944 ID 36942 for each MessageHeader entity 36932 and one 36952 CreationDateTime 36950 for each MessageHeader entity 36932.

The MessageHeader entity 36932 also includes a SenderParty entity 36958. The SenderParty entity 36958 is of type GDT 36962 BusinessDocumentMessageHeaderParty 36964. There is one or zero 36960 SenderParty entity 36958 for each MessageHeader entity 36932.

The TransmissionInformation package 36928 includes a TransmissionHeader entity 36966. The TransmissionHeader entity 36966 is of type GDT 36970 BusinessDocumentTransmissionHeader 36972. There is one or zero 36968 TransmissionHeader entity 36966 for each CataloguePublicationTransmissionCancellationRequestMessage entity 36920. The TransmissionHeader entity 36966 includes a MinimalRequestedLogItemSeverityCode 36976 of type GDT 36980 LogItemSeverityCode 36982. There is one or zero 36978 MinimalRequestedLogItemSeverityCode 36976 for each TransmissionHeader entity 36966.

The CataloguePublicationTransmission package 36930 includes a CataloguePublicationTransmission entity 36984. The CataloguePublicationTransmission entity 36984 is of type GDT 36988 CataloguePublicationTransmissionCancellationRequest 36990. There is one 36986 CataloguePublicationTransmission entity 36984 for each CataloguePublicationTransmissionCancellationRequestMessage entity 36918. The CataloguePublicationTransmission entity 36984 includes an ID 36992. The ID 36992 is of type GDT 36996 TransmissionID 36998. There is one 36994 ID 36992 for each CataloguePublicationTransmission entity 36984.

The CataloguePublicationTransmission package 36930 also includes a Catalogue package 36900A. The Catalogue package 36900A includes a Catalogue entity 36902A. In one implementation, there is one 36904A Catalogue entity 36902A for each CataloguePublicationTransmission entity 36984. The Catalogue entity 36902A includes an ID 36906A. The ID 36906A is of type GDT 36910A CatalogueID 36912A. There is one 36906A ID 36906A for each Catalogue entity 36902A.

(10) Message Data Type Catalogue Publication Transmission Cancellation Confirmation Message The data model for the message data type CataloguePublicationTransmissionCancellation ConfirmationMessage used to implement a CataloguePublicationTransmissionCancellationConfirmation message 35918 is depicted in FIG. 370A. The message data type CataloguePublicationTransmissionCancellationConfirmationMessage includes a CataloguePublicationTransmissionCancellationConfirmationMessage package 37002. The CataloguePublicationTransmissionCancellationConfirmationMessage package 37002 includes a MessageHeader package 37004, a TransmissionInformation package 37006, a CataloguePublicationTransmission package 37008, and a CataloguePublicationTransmissionCancellationConfirmationMessage object or entity 37010.

(a) Message Header Package

The MessageHeader package 37004 includes a MessageHeader entity 37012 and a SenderParty entity 37016. There is a 1:1 relationship 37014 between the MessageHeader entity 37012 and the CataloguePublicationTransmissionCancellationConfirmationMessage entity 37010. There is a 1:c relationship 37018 between the MessageHeader entity 37012 and the SenderParty entity 37016. The MessageHeader entity 37012 is of type GDT BusinessDocumentMessageHeader. The SenderParty entity 37016 is of type GDT BusinessDocumentMessageHeaderParty.

(b) Transmission Information Package

The TransmissionInformation package 37006 groups the information pertaining to the transmission of the object or entity (e.g., the CataloguePublicationTransmissionConfirmationCancellationMessage entity 37010) included in the message. The TransmissionInformation package 36406 includes a TransmissionLog entity 37020, which is a collection of events that occurred during processing of the transmitted business document object. The TransmissionLog entity 37020 includes one or more TransmissionLogItem ("Item") entities 37024. Each TransmissionLogItem entity 37024 provides information about an event that occurred during processing of the respective transmitted business document object. Each TransmissionLogItem entity 37024 is of type GDT: LogItem. The MinimumRequestedLogItemSeverityCode stated in a CataloguePublicationTransmissionCancellationRequest message 35916 determines which LogItems are to be returned by specifying their severity. There is a 1:c relationship 37022 between the CataloguePublicationTransmissionConfirmationCancellation Message entity 37010 and the TransmissionLog entity 37020 and a 1:n relationship 37026 between the TransmissionLog entity 37020 and each TransmissionLogItem entity 37024.

(c) CataloguePublicationTransmission Package

The CataloguePublicationTransmission package 37008 groups the information pertaining to a catalogue publication transmission. The CataloguePublicationTransmission package 37008 includes a Catalogue package 37028 and a CataloguePublicationTransmission entity 37030. There is a 1:1 relationship 37032 between the CataloguePublicationTransmissionCancellationConfirmationMessage entity 37010 and the CataloguePublicationTransmission entity 37030.

(i) CataloguePublicationTransmission Entity

The CataloguePublicationTransmission entity 37030 in a CataloguePublicationTransmissionCancellationConfirmation message 37018 is the confirmation whether the transmission of a catalogue has been cancelled successfully and an earlier published state of this catalogue (if such exists) has been restored or not. The CataloguePublicationTransmission entity 37030 includes an ID of type GDT :TransmissionID that identifies the transmission of the catalogue publication request which was requested to be cancelled. The CataloguePublicationTransmission entity 37030 also includes a CancellationCompletedIndicator of type GDT: BusinessTransactionCompletedIndicator that specifies whether the catalogue publication transmission was cancelled successfully or not. As previously discussed, CataloguePublicationTransmissionCancellationConfirmation message 37018 is sent by the Catalogue Search Engine 3596 to the Catalogue Authoring Tool 3594 in order to signal that the publication has been cancelled successfully or not.

(ii) Catalogue Package

The Catalogue package 37028 groups the information pertaining to the catalogue to be restored. The Catalogue package 37028 includes a Catalogue entity 37034. There is a 1:1 relationship 37036 between the CataloguePublicationTransmission entity 37030 and the Catalogue entity 37034.

(iii) Catalogue

The Catalogue entity 37030 specifies the information about a catalogue in the context of a CataloguePublicationTransmissionCancellationConfirmation message 35918 to confirm cancellation by the Catalogue Search Engine 3596 to the Catalogue Authoring Tool 3594. The Catalogue entity 37030 includes an ID of type GDT :CatalogueID, which identifies the catalogue.

(d) Message Data Type—Element Structure

FIGS. 371A-C depict the element structure for a CataloguePublicationTransmissionCancellationConfirmation message 35918. The element structure is similar to the above described data model of the message data type CataloguePublicationTransmissionCancellationConfirmationMessage as reflected in FIG. 369A, but provides additional information regarding the details for interfacing with or implementing a CataloguePublicationTransmissionCancellationConfirmationMessage data type, such as a CataloguePublicationTransmissionCancellationConfirmation message 35918. As shown in FIG. 371A, the element structure identifies the different packages 37100 that may be in a respective CataloguePublicationTransmissionCancellationConfirmation message 35918. The element structure for the CataloguePublicationTransmissionCancellationConfirmation message 35918 includes four levels 37102, 37104, 37106, and 37108 each of which is associated with a respective package 37100. The element structure identifies the occurrence or cardinality 37110 and data type information (i.e., type 37112 and name 37114) for the elements at the respective levels 37102, 37104, 37106, and 37108.

The outermost package of this interface is a CataloguePublicationTransmissionCancellationConfirmationMessage package 37118, which includes a CataloguePublicationTransmissionCancellationConfirmationMessage entity 37120 at the first level 37102. The CataloguePublicationTransmissionCancellationConfirmationMessage entity 37120 is of generic data type ("GDT") 37122 CataloguePublicationTransmissionCancellationConfirmationMessage 37124.

The CataloguePublicationTransmissionCancellationConfirmationMessage package 37118 includes a MessageHeader package 37126, a TransmissionInformation package 37128, and a CataloguePublicationTransmission package 37130. The MessageHeader package 37126 includes a MessageHeader entity 37132, which is of type GDT 37136 BusinessDocumentMessageHeader 37138. There is one 37134 MessageHeader entity 37132 for each CataloguePublicationTransmissionCancellationConfirmationMessage entity 37120.

The MessageHeader entity 37132 includes an ID 37142 and a CreationDateTime 37150. The ID 37142 is of type GDT 37146 BusinessDocumentMessageID 37148. The CreationDateTime 37150 is of type GDT 37154 DateTime 37156. There is one 37144 ID 37142 for each MessageHeader entity 37132 and one 37152 CreationDateTime 37150 for each MessageHeader entity 37132.

The MessageHeader entity 37132 also includes a SenderParty entity 37158. The SenderParty entity 37158 is of type GDT 37162 BusinessDocumentMessageHeaderParty 37164. There is one or zero 37160 SenderParty entity 37158 for each MessageHeader entity 37132.

The TransmissionInformation package 37128 includes a TransmissionLog entity 37166. There is one or zero 37168 TransmissionLog entity 37166 for each CataloguePublicationTransmissionCancellationConfirmationMessage entity 37120. The TransmissionLog 37166 includes an Item 37170 of type GDT 37174 LogItem 37176. There is one or more 37172 Items 37170 for each TransmissionLog entity 37166.

The CataloguePublicationTransmission package 37130 includes a CataloguePublicationTransmission entity 37178. The CataloguePublicationTransmission entity 37178 is of type GDT 37182 CataloguePublicationTransmissionCancellationConfirtnation 37184. There is one 37180 CataloguePublicationTransmission entity 37178 for each CataloguePublicationTransmissionCancellationConfirmationMessage entity 37120. The CataloguePublicationTransmission entity 37178 includes an ID 37186. The ID 37186 is of type GDT 37190 TransmissionID 37192. There is one 37188 ID 37186 for each CataloguePublicationTransmission entity 37178.

The CataloguePublicationTransmission entity 37178 also includes a PackageCompletedIndicator 37194. The PackageCompletedIndicator 37194 is of type GDT 37198 BusinessTransactionCompletedIndicator 37100A. There is one 37196 PackageCompleted Indicator 37194 for each CataloguePublicationTransmission entity 37178.

The CataloguePublicationTransmission package 37130 further includes a Catalogue package 37102A. The Catalogue package 37102A includes a Catalogue entity 37104A. In one implementation, there is one 37106A Catalogue entity 37104A for each CataloguePublicationTransmission entity 37178. The Catalogue entity 37104A includes an ID 37108A. The ID 37108A is of type GDT 37112A CatalogueID 37114A. There is one 37110A ID 37108A for each Catalogue entity 37104A.

(11) Message Data Type Catalogue Publication Transmission Item Lock Request Message The data model for the message data type CataloguePublicationTransmissionItemLock RequestMessage used to implement a CataloguePublicationTransmissionItemLockRequest message 35920 is depicted in FIG. 372A. The message data type CataloguePublicationTransmissionItemLockRequestMessage includes a CataloguePublicationTransmissionItemLockRequestMessage package 37202. The CataloguePublicationTransmissionItemLockRequestMessage package 37202 includes a MessageHeader package 37204, a TransmissionInformation package 36506, a CataloguePublicationTransmission package 37208, and a CataloguePublicationTransmissionItemLockRequestMessage object or entity 37210.

(a) Message Header Package

The MessageHeader package 37204 includes a MessageHeader entity 37212 and a SenderParty entity 37216. There is a 1:1 relationship 37214 between the MessageHeader entity 37212 and the CataloguePublicationTransmissionItemLockRequestMessage entity 37210. There is a 1:c relationship 37218 between the MessageHeader entity 37212 and the SenderParty entity 37216. The MessageHeader entity 37212 is of type GDT BusinessDocumentMessageHeader. The SenderParty entity 37216 is of type GDT BusinessDocumentMessageHeaderParty.

(b) Transmission Information Package

The TransmissionInformation package 37206 groups the information pertaining to the transmission of the object or entity (e.g., the CataloguePublicationTransmissionItemLockRequestMessage entity 37210) included in the message. The TransmissionInformation package 37206 includes a TransmissionHeader entity 37220. The TransmissionHeader entity 37220 provides information about the identification of the transmission. The TransmissionHeader entity 37220 includes a MinimalRequestedLogItemSeverityCode of type GDT: LogItemSeverityCode. The MininmalRequestedLogItemSeverityCode specifies the severity of log items to returned by the CataloguePublicationTransmissionItemLockConfirmation message 35920. There is a 1:c relationship 37222 between the CataloguePublicationTransmissionItemLockRequestMessage entity 37210 and the TransmissionHeader entity 37220.

(c) CataloguePublicationTransmission Package

The CataloguePublicationTransmission package 37208 groups the information pertaining to a catalogue publication transmission. The CataloguePublicationTransmission package 37208 includes a Catalogue package 37224 and a CataloguePublicationTransmission entity 37226. There is a 1:1 relationship 37228 between the CataloguePublicationTransmissionItemLockRequestMessage entity 37210 and the CataloguePublicationTransmission entity 37226.

(i) CataloguePublicationTransmission Entity

The CataloguePublicationTransmission entity 37226 in a CataloguePublicationTransmissionItemLockRequest message 37214 is the request to lock single items of the catalogue included in the catalogue publication transmission. To lock means if the catalogue is not yet published the items are not published; if the catalogue is already published, the publication of these items is revoked. The CataloguePublicationTransmission entity 37226 includes an ID of type GDT :TransmissionID that identifies the CataloguePublicationTransmission of which the items are to be locked.

(ii) Catalogue Package

The Catalogue package 37224 groups the information pertaining to the catalogue. The Catalogue package 37224 includes a Content package 37230 and a Catalogue entity 37232. There is a 1:c relationship 37234 between the CataloguePublicationTransmission entity 37226 and the Catalogue entity 37232.

(iii) Catalogue

The Catalogue entity 37232 specifies the information about a catalogue necessary in the context of a CataloguePublicationTransmissionItemLockRequest so that, for example, the Catalogue Search Engine is able to lock the identified catalogue items. The Catalogue entity 37232 includes an ID of type GDT :CatalogueID, which identifies the catalogue from which selected items are to be locked.

(iv) Catalogue Publication Transmission Catalogue Content Package

The CatalogueContent package 37230 includes a CatalogueItem package 37236 and a Content entity 37238, which specifies the list of business objects or entitites which are to be locked. There is a 1:1 relationship 37240 between the Catalogue entity 37232 and the Content entity 37238.

(a) Catalogue Publication Transmission Catalogue Content Catalogue Item Package

The CatalogueItem package 37236 groups the information pertaining to the items to be locked. The CatalogueItem package 37236 includes a CatalogueItem entity 37242, which includes the information about an identified catalogue item to allow the Catalogue Search Engine 3596 to lock the identified catalogue item. The CatalogueItem entity 37242 includes an ID, which identifies the catalogue item to be locked. There is a 1:n relationship 37244 between the Content entity 37238 and the CatalogueItem entity 37242.

(d) Message Data Type—Element Structure

FIGS. 373A-C depict the element structure for a CataloguePublicationTransmissionItemLockRequest message 35920. The element structure is similar to the above described data model of the message data type CataloguePublicationTransmissionItemLockRequestMessage as reflected in FIG. 372A, but provides additional information regarding the details for interfacing with or implementing a CataloguePublicationTransmissionItemLockRequestMessage data type, such as a CataloguePublicationTransmissionItemLockRequest message 35920. As shown in FIG. 373A, the element structure identifies the different packages 37300 that may be in a respective CataloguePublicationTransmissionItemLockRequest message 35920. The element structure for the CataloguePublicationTransmissioniItemLockRequest message 35920 includes six levels 37302, 37304, 37306, 37308, 37310, and 37312 each of which is associated with a respective package 37300. The element structure identifies the occurrence or cardinality 37314 and data type information (i.e., type 37316 and name 37318) for the elements at the respective levels 37302, 37304, 37306, 37308, 37310, and 37312.

The outermost package of this interface is a CataloguePublicationTransmissionItemLockRequestMessage package 37320, which includes a CataloguePublicationTransmissionItemLockRequestMessage entity 37322 at the first level 37302. The CataloguePublicationTransmissionItemLockRequestMessage entity 37322 is of generic data type ("GDT") 37323 CataloguePublicationTransmissionItemLockRequestMessage 37324.

The CataloguePublicationTransmissionItemLockRequestMessage package 37320 includes a MessageHeader package 37326, a TransmissionInformation package 37328, and a CataloguePublicationTransmission package 37330. The MessageHeader package 37326 includes a MessageHeader entity 37332, which is of type GDT 37336 BusinessDocumentMessageHeader 37338. There is one 37334 MessageHeader entity 37332 for each CataloguePublicationTransmissionItemLockRequestMessage entity 37322.

The MessageHeader entity 37332 includes an ID 37340 and a CreationDateTime 37348. The ID 37340 is of type GDT 37344 BusinessDocumentMessageID 37346. The CreationDateTime 37348 is of type GDT 37352 DateTime 37354. There is one 37342 ID 37340 for each MessageHeader entity 37332 and one 37350 CreationDateTime 37348 for each MessageHeader entity 37332.

The MessageHeader entity 37332 also includes a SenderParty entity 37356. The SenderParty entity 37356 is of type GDT 37360 BusinessDocumentMessageHeaderParty 37362. There is one or zero 37358 SenderParty entity 37356 for each MessageHeader entity 37332.

The TransmissionInformation package 37328 includes a TransmissionHeader entity 37364. The TransmissionHeader entity 37364 is of type GDT 37368 BusinessDocumentTransmissionHeader 37370. There is one or zero 37366 TransmissionHeader entity 37364 for each CataloguePublicationTransmissionItemLockRequestMessage entity 37322. The TransmissionHeader entity 37364 includes a MinimalRequestedLogItemSeverityCode 37372 of type GDT 37376 LogItemSeverityCode 37378. There is one or zero 37374 MinimalRequestedLogItemSeverityCode 37372 for each TransmissionHeader entity 37364.

The CataloguePublicationTransmission package 37330 includes a CataloguePublicationTransmission entity 37380. The CataloguePublicationTransmission entity 37380 is of type GDT 37384 CataloguePublicationTransmissionItemLockRequest 37386. There is one 37382 Catalogue- PublicationTransmission entity 37380 for each CataloguePublicationTransmissionItemLockRequestMessage entity 37322. The CataloguePublicationTransmission entity 37380 includes an ID 37388. The ID 37388 is of type GDT 37392 TransmissionID 37394. There is one 37390 ID 37388 for each CataloguePublicationTransmission entity 37380.

The CataloguePublicationTransmission package 37330 also includes a Catalogue package 37396. The Catalogue package 37396 includes a Catalogue entity 37398. In one implementation, there is one 37300A Catalogue entity 37398 for each CataloguePublicationTransmission entity 37380. The Catalogue entity 37398 includes an ID 37302A. The ID 37302A is of type GDT 37306A CatalogueID 37308A. There is one 37304A ID 37302A for each Catalogue entity 37398.

The Catalogue package 37396 also includes a Content package 37310A. The Content package 37310A includes a Content entity 37312A and an Itempackage 37316A. In one implementation, there is one 37314A Content entity 37312A for each Catalogue entity 37398.

The Item package 37316A includes an Item entity 37318A. There is one or more 37320A Item entities 37318A for each Content entity 37312A. Each Item entity 37318A includes an ID 37322A. The ID 37322A is of type GDT 37326A CatalogueItemID 37328A. There is one 37324A ID 37322A for each Item entity 37316A.

(12) Message Data Type Catalogue Publication Transmission Item Lock Confirmation Message The data model for the message data type CataloguePublicationTransmissionCancellation ConfirmationMessage used to implement a CataloguePublicationTransmissionItemLockConfirmation message 35920 is depicted in FIG. 374A. The message data type CataloguePublicationTransmissionItemLockConfirmationMessage includes a CataloguePublicationTransmissionItemLockConfirmationMessage package 37402. The CataloguePublicationTransmissionItemLockConfirmationMessage package 37402 includes a MessageHeader package 37404, a TransmissionInformation package 37406, a CataloguePublicationTransmission package 37408, and a CataloguePublicationTransmissionItemLockConfirmationMessage object or entity 37410.

(a) Message Header Package

The MessageHeader package 37404 includes a MessageHeader entity 37412 and a SenderParty entity 37416. There is a 1:1 relationship 37414 between the MessageHeader entity 37412 and the CataloguePublicationTransmissionItemLockConfirmationMessage entity 37410. There is a 1:c relationship 37418 between the MessageHeader entity 37412 and the SenderParty entity 37416. The MessageHeader entity 37412 is of type GDT BusinessDocumentMessageHeader. The SenderParty entity 37416 is of type GDT BusinessDocumentMessageHeaderParty.

(b) Transmission Information Package

The TransmissionInformation package 37406 groups the information pertaining to the transmission of the object or entity (e.g., the CataloguePublicationTransmissionConfirmationCancellationMessage entity 37410) included in the message. The TransmissionInformation package 36406 includes a TransmissionLog entity 37420, which is a collection of events that occurred during processing of the transmitted business document object. The TransmissionLog entity 37420 includes one or more TransmissionLogItem ("Item") entities 37424. Each TransmissionLogItem entity 37424 provides information about an event that occurred during processing of the respective transmitted business document object. Each TransmissionLogItem entity 37424 is of type GDT: LogItem. The MinimumRequestedLogItemSeverityCode provided in a CataloguePublicationTransmissionItemLockRequest message 35920 determines which TransmissionLogItems are to be returned by specifying their severity. There is a 1:c relationship 37422 between the CataloguePublicationTransmissionConfirmationCancellation Message entity 37410 and the TransmissionLog entity 37420 and a 1:n relationship 37426 between the TransmissionLog entity 37420 and each TransmissionLogItem entity 37424.

(c) CataloguePublicationTransmission Package

The CataloguePublicationTransmission package 37408 groups the information pertaining to a catalogue publication transmission. The CataloguePublicationTransmission package 37408 includes a Catalogue package 37428 and a CataloguePublicationTransmission entity 37430. There is a 1:1 relationship 37432 between the CataloguePublicationTransmissionItemLockConfirmationMessage entity 37410 and the CataloguePublicationTransmission entity 37430.

(i) CataloguePublicationTransmission Entity

The CataloguePublicationTransmission entity 37430 in a CataloguePublicationTransmissionItemLockConfirmation message 35920 is the confirmation whether identified items of the catalogue included in the catalogue publication transmission could be locked or not. To lock means: if the catalogue is not yet published the items are not published; if the catalogue is already published, the publication of these items is revoked. The CataloguePublicationTransmission entity 37430 includes an ID of type GDT :TransmissionID that identifies the Catalogue publication transmission or the original catalogue publication request of which items where requested to be locked. The CataloguePublicationTransmission entity 37430 also includes a ItemLockCompletedIndicator of type GDT: BusinessTransactionCompletedIndicator that specifies whether the identified items were locked or not.

(ii) Catalogue Package

The Catalogue package 37428 groups the information pertaining to the catalogue. The Catalogue package 37428 includes a Catalogue entity 37434. There is a 1:c relationship 37436 between the CataloguePublicationTransmission entity 37430 and the Catalogue entity 37434.

(iii) Catalogue

The Catalogue entity 37434 specifies the information about a catalogue in the context of a message 35922 to confirm to the Catalogue Authoring Tool 3594 that an identified item is locked by the Catalogue Search Engine 3596. The Catalogue entity 37430 includes an ID of type GDT :CatalogueID, which identifies the catalogue from which the identified items are to be locked.

(d) Message Data Type—Element Structure

FIGS. 375A-C depict the element structure for a CataloguePublicationTransmissionItemLockConfirmation message 35920. The element structure is similar to the above described data model of the message data type CataloguePublicationTransmissionItemLockConfirmationMessage as reflected in FIG. 374A, but provides additional information regarding the details for interfacing with or implementing a CataloguePublicationTransmissionItemLockConfirmationMessage data type, such as a CataloguePublicationTransmissionItemLockConfirmation message 35920. As shown in FIG. 375A, the element structure identifies the different packages 37500 that may be in a respective CataloguePublicationTransmissionItemLockConfirmation message 35920. The element structure for the CataloguePublicationTransmissionItemLockConfirmation message 35920 includes four levels 37502, 37504, 37506, and 37508 each of which is associated with a respective package 37500. The element structure identifies the occurrence orcardinality 37510 and data type information (i.e., type 37512 and name 37514) for the elements at the respective levels 37502, 37504, 37506, and 37508.

The outermost package of this interface is a CataloguePublicationTransmissionItemLockConfirmationMessage package 37518, which includes a CataloguePublicationTransmissionItemLockConfirmationMessage entity 37520 at the first level 37502. The CataloguePublicationTransmissionItemLockConfirmationMessage entity 37520 is of generic data type ("GDT") 37522 CataloguePublicationTransmissionItemLockConfirmationMessage 35920.

The CataloguePublicationTransmissionItemLockConfirmationMessage package 37518 includes a MessageHeader package 37526, a TransmissionInformation package 37528, and a CataloguePublicationTransmission package 37530. The MessageHeader package 37526 includes a MessageHeader entity 37532, which is of type GDT 37536 BusinessDocumentMessageHeader 37538. There is one 37534 MessageHeader entity 37532 for each CataloguePublicationTransmissionItemLockConfinnationMessage entity 37520.

The MessageHeader entity 37532 includes an ID 37542 and a CreationDateTime 37550. The ID 37542 is of type GDT 37546 BusinessDocumentMessageID 37548. The CreationDateTime 37550 is of type GDT 37554 DateTime 37556. There is one 37544 ID 37542 for each MessageHeader entity 37532 and one 37552 CreationDateTime 37550 for each MessageHeader entity 37532.

The MessageHeader entity 37532 also includes a SenderParty entity 37558. The SenderParty entity 37558 is of type GDT 37562 BusinessDocumentMessageHeaderParty 37564. There is one or zero 37560 SenderParty entity 37558 for each MessageHeader entity 37532.

The TransmissionInformation package 37528 includes a TransmissionLog entity 37566. There is one or zero 37568 TransmissionLog entity 37566 for each CataloguePublicationTransmissionItemLockConfirmationMessage entity 37520. The TransmissionLog 37566 includes an Item 37570 of type GDT 37574 LogItem 37576. There is one or more 37572 Items 37570 for each TransmissionLog entity 37566.

The CataloguePublicationTransmission package 37530 includes a CataloguePublicationTransmission entity 37578. The CataloguePublicationTransmission entity 37578 is of type GDT 37582 CataloguePublicationTransmissionItemLockConfirmation 37584. There is one 37580 CataloguePublicationTransmission entity 37578 for each CataloguePublicationTransmissionItemLockConfirmationMessage entity 37520. The CataloguePublicationTransmission entity 37578 includes an ID 37586. The ID 37586 is of type GDT 37590 TransmissionID 37592. There is one 37588 ID 37586 for each CataloguePublicationTransmission entity 37578.

The CataloguePublicationTransmission entity 37578 also includes an ItemLockCompletedIndicator 37594. The ItemLockCompletedIndicator 37594 is of type GDT 37598 BusinessTransactionCompletedIndicator 37500A. There is one 37596 ItemLockCompleted Indicator 37594 for each CataloguePublicationTransmission entity 37578.

The CataloguePublicationTransmission package 37530 further includes a Catalogue package 37502A. The Catalogue package 37502A includes a Catalogue entity 37504A. In one implementation, there is one 37506A Catalogue entity 37504A for each CataloguePublicationTransmission entity 37578. The Catalogue entity 37504A includes an ID 37508A. The ID 37508A is of type GDT 37512A CatalogueID 37514A. There is one 37510A ID 37508A for each Catalogue entity 37504A.

(13) Message Data Type Catalogue Publication Transmission Content Change Request Message The message data type CataloguePublicationTransmissionContentChangeRequestMessage 375A02 includes the object CataloguePublicationTransmission contained in the business document in the view required for the CataloguePublicationTransmissionContentChangeRequest, and the business-related information relevant for sending of a business document in a message.

The message data type CataloguePublicationTransmissionContentChangeRequestMessage 375A02 contains the MessageHeader package 375A04, TransmissionInformation package 375A06, and CataloguePublicationTransmission package 375A08. The message data type CataloguePublicationTransmissionContentChangeRequestMessage 375A02 provides a structure for message type CataloguePublicationTransmissionContentChangeRequest.

(a) Message Header Package

The CataloguePublicationTransmissionContentMessageHeader package 375A04 is similar to the CatalogueUpdateMessage message header.

(b) Transmission Information Package

The TransmissionInformation package 375A06 groups information pertaining to the transmission of the object (CataloguePublicationTransmission) contained in the message and contains the TransmissionHeader entity. The TransmissionHeader entity 375A16 specifies a minimum requested severity of events occurring during processing of a transmission which has to be logged and returned. The TransmissionHeader entity 375A16 contains a MinimumRequestedLogItemSeverityCode that specifies the severity of log items to be returned by message CataloguePublicationTransmissionItemLockConfirmation. (GDT LogItemSeverityCode). Also within the TransmissionInformation package 375A06 is the CataloguePublicationTransmission package 375A08.

(c) Catalogue Publication Transmission Package

CataloguePublicationTransmission Package 375A08 groups information pertaining to a catalogue publication transmission (e.g., it groups the CataloguePublicationTransmission with its package, Catalogue).

(i) Catalogue Publication Transmission Entity

A CataloguePublicationTransmission in the view required for the CataloguePublicationTransmissionContentChangeRequest contains the information that is necessary to request the update of catalog items of the catalog publication transmission. The entity CataloguePublicationTransmission 375A18 contains an ID element that identifies the CataloguePublicationTransmission of which the items should be updated. The ID is of type GDT TransmissionID.

(ii) Catalogue Publication Transmission Catalogue Package

The CataloguePublicationTransmissionCatalogue Package 375A20 contains the package CatalogueContent 375A22.

(iii) Catalogue

A Catalogue 375A24 in the view required for the CataloguePublicationTransmissionContentChangeRequest contains all information necessary to update (change, delete and create) catalog items.

A catalog (in general) can be a structured directory of catalog items, where each item represents an object, and provides information about the object. The Catalogue 375A24 can contain catalogue header information and content information, where content information contains the items of the catalog and their structural assignment within the catalog structure (see package CatalogueContent). The Catalogue 375A24 can contain the elements/attributes: @completeTransmissionIndicator, @languageCode, @currencyCode, @unitCode, and ID.

@completeTransmissionIndicator can indicate whether all data of the catalog is included or not. The value should be "false" (GDT CompleteTransmissionIndicator). @languageCode can specify the language for a specific description/name, where the value is the default (GDT LanguageCode). @currencyCode can specify the currency in element Amount, where the value is the default (GDT CurrencyCode). @unitCode can specify a unit code in element Quantity, where the value is the default (GDT MeasureUnitCode). ID can identify the catalog from which the items should be changed, deleted or created (GDT CatalogueID). In variations, @actionCode is not needed as default "02" (CHANGE) can be used as deletion and replacement of catalog is not allowed via this message.

(iv) Catalogue Publication Transmission Catalogue Content Package

CataloguePublicationTransmissionCatalogueContent Package groups a CatalogueContent package 375A22 with the packages CatalogueItem 375A26, CatalogueView 375A28, and a CatalogueContent entity 375A30. Content specifies the list of items, which have to be updated (changed, deleted or created). The CatalogContent 375A30 contains the elements CatalogueItemListCompleteTransmissionIndicator, CatalogueItemRelationshipListCompleteTransmissionIndicator, CatalogueViewListCompleteTransmissionIndicator, and CatalogueSchemaID.

CatalogueItemListCompleteTransmissionIndicator can specify whether the list of Items is transmitted completely. The value should be "false" (GDT CompleteTransmissionIndicator). CatalogueItemRelationshipListCompleteTransmissionIndicator can specify whether the list of ItemRelationships is transmitted completely. The value should be "false". (GDT CompleteTransmissionIndicator). CatalogueViewListCompleteTransmissionIndicator can specify whether the list of Views is transmitted completely. The value should be "false" (GDT CompleteTransmissionIndicator). CatalogueSchemaID can identify a catalogue schema to which the content belongs, and act as a default value for objects without a specified CatalgueSchemaID on a level beyond that (GDT CatalogueSchemaID).

The CataloguePublicationTransmissionCatalogueContentCatalogueItem Package 375A26 groups the CatalogueItems to be updated with their relationships. The CatalogueItem package 375A26 contains the entities CatalogueItem 375A32 and CatalogueItemRelationship 375A34. A CatalogueItem 375A32 contains all information about a catalogue item necessary to change, delete or update it and contains the elements/attributes @actionCode, PropertyValuationListCompleteTransmissionIndicator, and ID.

@actionCode can specify the operation to be performed on the item. This value can also be effectual for all objects underneath unless another @actionCode redefines this value (GDT ActionCode). PropertyValuationListCompleteTransmissionIndicator can indicate whether the list of PropertyValuation is transmitted completely or not (GDT CompleteTransmissionIndicator). ID can identify a catalogue item (GDT CatalogueItemID). In any case, the catalogue item ID should not be confused with the identifier of the business object the item represents.

A CatalogueItemDescription 375A36 provides a description for an item in various locales (e.g., in different languages). CatalogueItemDescription 375A36 is of type GDT Description.

A CatalogueItemClassification 375A38 can classify an item by assigning it to a Section within one of the catalog's schemas which the item belongs to. A CatalogueItemClassification 375A38 contains the elements SchemaID, which can identify the schema that the item references (GDT CatalogueSchemaID); and SectionID, which can identify the Section that the item references. (GDT CatalogueSectionID). A system may enforce that an Item may only be classified within a schema of the catalog, and only once per schema. However, an item need not be classified in every schema explicitly. The Section specified by the SectionID should be defined in the Schema specified by the CatalogueSchemaID.

A CatalogueItemPropertyValuation 375A40 can specify the value of a property that can be attributed to the object the item represents, according to one of the catalog schemas. CatalogueItemPropertyValuation 375A38 is of type GDT: PropertyValuation, where the elements used are @actionCode, which can specify the operation to be performed on the property; PropertyReference; and ValueGroup with elements ID, ParentID, OrdinalNumberValue and PropertyValue (which can specify the value of the property/component).

PropertyValue is of type GDT PropertyValue, where the elements used are AmountSpecification, QuantitySpecification, Decimal Specification, FloatSpecification, IntegerSpecification, DateTimeSpecification, NameSpecification, IndicatorSpecification, and Integrity. Each property valuation should refer to a property defined in the Schema or SchemaSection to which the Item belongs.

A CatalogueItemRelationship 375A34 can specify a relationship with certain semantics between any two catalog items and can contain the elements/attributes @actionCode, (GDT ActionCode), SourceCatalogueItemID, TargetCatalogueItemID, and TypeCode.

@actionCode can specify the operation to be performed on an item relationship. This value can be effectual for all objects underneath unless another @actionCode redefines this value (GDT ActionCode). SourceCatalogueItemID can identify the source item (GDT CatalogueItemID). TargetCatalogueItemID can identify the target item (GDT CatalogueItemID). TypeCode can specify the semantics of the relationship existing between two items (GDT ObjectStructureRelationshipTypeCode).

The CatalogueContentCatalogueView Package 375A28 groups all information pertaining to catalog views, and contains the entity CatalogueView. A CatalogueView entity 375A42 defines a restricted subset of a catalog by specifying catalog items to be included. A CatalogueView 375A42 can contain one or more CatalogueViewItems 375A44 which specify items included in the view, and contains the elements/attributes @actionCode, ID, Name, and ItemListCompleteTransmissionIndicator.

@actionCode can specify the operation to be performed on a view. This value is also effectual for all objects underneath unless another @actionCode redefines this value. Here the @actionCode has to be of value "02" (CHANGE) (GDT ActionCode). ID can identify a view ID (GDT CatalogueViewID). Name can provide a name for the view in various languages (GDT Name). ItemListCompleteTransmissionIndicator can specify whether the item list is transmitted completely, where the value should be "false" (GDT CompleteTransmissionIndicator).

A CatalogueViewItem 375A44 specifies a catalog item to be included in the catalogue view. A CatalogueViewItem 375A44 can contain the elements/attributes @actionCode and ID. @actionCode can specify the operation to be performed on an item of a view. This value can also be effectual for all objects underneath unless another @actionCode redefines this value (GDT ActionCode). ID can identify an item to be included in the catalogue view(GDT CatalogueItemID). The item referred to should be included in the catalogue using an appropriate catalogue item (either within the same transmission or an earlier transmission).

(d) Message Data Type—Element Structure

FIGS. 375CA-CL depict the element structure for a CataloguePublicationTransmission-ContentChangeRequestMessage. As shown in FIG. 375CA, the element structure identifies the different packages 375C00 that may be in a respective CataloguePublication-TransmissionContentChangeRequestMessage. The element structure for the CataloguePublicationTransmissionContentchangeRequestMessage includes nine levels 375C01, 375C02, 375C03, 375C04, 375C05, 375C06, 375C07, 375C08, and 375C09 each of which is associated with a respective package 375C00. The element structure identifies the occurrence or cardinality 375C10 and data type information (i.e., name 375C11) for the elements at the respective levels 375C01, 375C02, 375C03, 375C04, 375C05, 375C06, 375C07, 375C08, and 375C09.

The outermost package of this interface is a CataloguePublicationTransmissionContentChangeRequestMessage package 375C12, which includes a CataloguePublicationTransmissionContentChangeRequestMessage entity 375C13 at the first level 375C01. The CataloguePublicationTransmissionContentChangeRequestMessage entity 375C13 is of generic data type ("GDT") CataloguePublicationTransmissionContentChangeRequestMessage 375C14.

The CataloguePublicationTransmissionContentChange-RequestMessage package 375C12 includes a Message-Header package 375C15, a TransmissionInformation package 375C28, and a CataloguePublicationTransmission package 375C35. The MessageHeader package 375C16 includes a MessageHeader entity 375C16 at the second level 375C02, which is of type GDT BusinessDocumentMessageHeader 375C18. There is one 375C17 MessageHeader entity 375C16 for each CataloguePublicationTransmissionContent-ChangeRequestMessage entity 375C13.

The MessageHeader entity 375C16 includes an ID 375C19 and a CreationDateTime 375C22 at the third level 375C03. The ID 375C19 is of type GDT BusinessDocumentMessageID 375C21. The CreationDateTime 375C22 is of type GDT DateTime 375C24. There is one 375C20 ID 375C19 for each MessageHeader entity 375C16 and one 375C23 CreationDateTime 375C22 for each MessageHeader entity 375C16.

The MessageHeader entity 375C16 also includes a SenderParty 375C25 at the third level 375C03. The SenderParty 375C25 is of type GD26BusinessDocumentMessageHeaderParty 375C27. There is one or zero 375C60 SenderParty 375C25 for each MessageHeader entity 375C16.

The TransmissionInformation package 375C28 includes a TransmissionHeader entity 375C29 at the second level 375C02. There is one or zero 375C30 TransmissionHeader entity 375C29 for each CataloguePublicationTransmissionContentChangeRequestMessage entity 375C13. The TransmissionHeader 375C29 includes a MinimalRequested-LogItemSeverityCode 375C32 of type GDT LogItemSeverityCode 375C34. There is one or more 375C33 MinimalRequestedLogItemSeverityCode 375C32 for each TransmissionHeader entity 375C29.

The CataloguePublicationTransmission package 375C35 includes a CataloguePublicationTransmission entity 375C36 at the second level 375C02. The CataloguePublicationTransmission entity 375C36 is of type GDT CataloguePublicationTransmissionContentChangeRequest-375C38. There is one 375C37 CataloguePublicationTransmission entity 375C36 for each CataloguePublicationTransmissionContentChangeRequestMessage entity 375C13. The CataloguePublicationTransmission entity 375C36 includes an ID 375C39. The ID 375C39 is of type GDT TransmissionID 375C41. There is one 375C40 ID 375C39 for each CataloguePublicationTransmission entity 375C36.

The CataloguePublicationTransmission package 375C35 further includes a Catalogue package 375C42. The Catalogue package 375C42 includes a Content package 375C61. The Catalogue package 375C42 includes a Catalogue entity 375C43 at the third level 375C03. The Catalogue entity 375C43 is of type GDT CataloguePublicationTransmissionContentChangeRequestCatalogue 375C45. There is one 375C44 Catalogue entity 375C43 for each CataloguePublicationTransmission entity 375C36.

The Catalogue entity 375C43 includes a @completeTransmissionIndicator 375C46, a @languageCode 375C49, a @currencyCode 375C52, a @unitCode375C55 and an ID 375C58 at the forth level 375C04. The @completeTransmissionIndicator 375C46 is of type GDT CompleteTransmissionIndicator 375C48. There is one 375C47 @completeTrans-missionIndicator 375C46 for each Catalogue entity 375C43. The @languageCode 375C49 is of type GDT LanguageCode 375C51. There is zero or one 375C50 @languageCode 375C49 for each Catalogue entity 375C43. The @currencyCode 375C52 is of type GDT CurrencyCode 375C54. There is zero or one 375C53 @currencyCode 375C52 for each Catalogue entity 375C43. The @unitCode375C55 is of type GDT MeasureUnitCode 375C57. There is zero or one 375C56 @unitCode375C55 for each Catalogue entity 375C43. The ID 375C58 is of type GDT CatalogueID 375C60. There is one 375C59 ID 375C58 for each Catalogue entity 375C43.

The Content package 375C61 includes a CatalogItem package 375C76 and a CatalogView package 375C60A. The Content package 375C61 includes a Content entity 375C62 at the forth level 375C04. The Content package 375C61 is of type GDT CataloguePublicationTransmissionContentChangeRequestCatalogueContent 375C64. There is one 375C44 Content package 375C61 for each CataloguePublicationTransmission entity 375C36. The Catalogue entity 375C43 includes a @catalogueItemListComplete TransmissionIndicator 375C65, a @catalogueItemRelationshipListCompleteTransmissionIndicator 375C68, a @catalogueViewListCompleteTransmissionIndicator 375C71, and a CatalogueSchemaID 375C74 at the fifth level 375C05. The @catalogueItemList-CompleteTransmissionIndicator 375C65 is of type GDT CompleteTransmissionIndicator 375C67. There is one 375C66 @catalogueItemListComplete TransmissionIndicator 375C65 for each Catalogue entity 375C43. The @catalogueItemRelationshipListCompleteTransmissionIndicator 375C68 is of type GDT CompleteTransmissionIndicator 375C70. There is zero or one 375C69 @catalogueItemRelationshipListCompleteTransmissionIndicator 375C68 for each Catalogue entity 375C43. The @catalogueViewList-CompleteTransmissionIndicator 375C71 is of type GDT CompleteTransmissionIndicator 375C73. There is zero or one 375C72 @catalogueViewListCompleteTransmissionIndicator 375C71 for each Catalogue entity 375C43. The CatalogueSchemaID 375C74 is of type GDT CatalogueSchemaID 375C76. There is zero or one 375C75 CatalogueSchemaID 375C74 for each Catalogue entity 375C43

The CatalogItem package 375C76 includes a CatalogueItem 375C78, and a CatalogueRelationship 375C45A at the fifth level 375C05. The CatalogueItem 375C78 includes a @actionCode 375C81, a @propertyValuationListCompleteTransmissionIndicator 375C84, an ID375C87, a Description 375C90, a Classification 375C93, and a PropertyValuation 375C02A. The @actionCode 375C81 is of type GDT ActionCode 375C83. There is zero or one 375C82 @actionCode 375C81 for each Catalogue entity 375C43. The @propertyValuationListCompleteTransmissionIndicator 375C84 is of type GDT CompleteTransmissionIndicator 375C86. There is zero or one 375C85 @propertyValuationListCompleteTransmissionIndicator 375C84 for each Catalogue entity 375C43. The ID 375C87 is of type GDT CatalogueItemID 375C89. There is one 375C88 ID375C87 for each ID entity 375C87. The Description 375C90 is of type GDT CatalogueItemClassification 375C95. There is zero to n 375C94 Description 375C90 for each each Catalogue entity 375C43. The Classification 375C93 is of type GDT CatalogueItemClassification 375C95. There is zero to n 375C94 Classification 375C93 for each each Catalogue entity 375C43.

The Classification 375C93 includes a CatalogueSchemaID 375C96 and a CatalogueSectionID 375C99 at the seventh level 375C07. The CatalogueSchemaID 375C96 is of type GDT CatalogueSchemaID 375C98. There is zero to n 375C74 CatalogueSchemaID 375C96 for each each Catalogue entity 375C43. The CatalogueSectionID 375C99 is of type GDT CatalogueSectionID375COlA. There is one 375C00A CatalogueSectionID 375C99 for each each Catalogue entity 375C43.

The PropertyValuation 375C02A includes an @actionCode 375C05A, a PropertyReference 375C08A, and a ValueGroup 375C14A at the seventh level 375C07. The PropertyValuation 375C02A is of type GDT PropertyValuation 375C04A. There is zero or n 375C03A PropertyValuation 375C02A for each Catalogue entity 375C43. The @actionCode 375C05A is of type GDT ActionCode 375C07A. There is zero or one 375C06A @actionCode 375C05A for each Catalogue entity 375C43. The PropertyReference 375C08A is of type GDT PropertyReference 375C10A. There is one 375C09A PropertyReference 375C08A for each Catalogue entity 375C43. The PropertyReference 375C08A includes an ID 375C11A at the eight level 36708. The ID 375C11A is oftype GDT PropertyID 375C13A. There is one 375C012A ID 375C11A for each Catalogue entity 375C43.

The ValueGroup 375C14A includes an ID 375C17A, a ParentID 375C20A, an OrdinalNumberValue 375C23A and a Property Value 375C26A at level eight 375C08. The ValueGroup 375C14A is of type GDT PropertyValueIterator 375C16A. There is one 375C012A ValueGroup 375C14A for each Catalogue entity 375C43. The ID 375C17A is of type GDT Identifier375Cl9A. There is zero to one 375C018A ID 375C17A for each Catalogue entity 375C43. The ParentID 375C20A is of type GDT Identifier 375C22A. There is zero to one 375C21A ParentID 375C20A for each Catalogue entity 375C43. The OrdinalNumberValue 375C23A is of type GDT OrdinalNumberValue 375C25A. There is zero to one 375C24A OrdinalNumberValue 375C23A for each Catalogue entity 375C43. The Property Value 375C26A is of type GDT Property Value 375C28A. There is zero to n 375C027A Property Value 375C26A for each Catalogue entity 375C43.

The Property Value 375C26A includes a AmountSpecification 375C29A, a QuantitySpecification 375C31A, a DecimalSpecification 375C33A, a FloatSpecification 375C35A, an IntegerSpecification 375C37A, DateTimeSpecification 375C39A, a NameSpecification 375C41A, and a IndicatorSpecification 375C43A at level nine 375C09. The AmountSpecification 375C29A is of type GDT Property Value 375C28A and there is zero to 1 375C027A for each Catalogue entity 375C43. The QuantitySpecification 375C31A is of type GDT Property Value 375C28A and there is zero to 1 375C027A for each Catalogue entity 375C43. The DecimalSpecification 375C33A is of type GDT Property Value 375C28A and there is zero to 1 375C027A for each Catalogue entity 375C43. The FloatSpecification 375C35A is of type GDT Property Value 375C28A and there is zero to 1 375C027A for each Catalogue entity 375C43. The IntegerSpecification 375C37A is of type GDT Property Value 375C28A and there is zero to 1 375C027A for each Catalogue entity 375C43. The DateTimeSpecification 375C39A is of type GDT Property Value 375C28A and there is zero to 1 375C027A for each Catalogue entity 375C43. The NameSpecification 375C41A is of type GDT Property Value 375C28A and there is zero to 1 375C027A for each Catalogue entity 375C43. The IndicatorSpecification 375C43A is of type GDT Property Value 375C28A and there is zero to 1 375C027A for each Catalogue entity 375C43. The Property Value 375C26A is of type GDT Property Value 375C28A. There is zero to n 375C027A Property Value 375C26A for each Catalogue entity 375C43.

The CatalogueItemRelationship 375C45A includes an @actionCode 375C48A, a SourceDatalogueItem 375C51A, a TargetCatalogueItemID 375C54A, and a TypeCode 375C57A at level 6 375C06. The CatalogueItemRelationship 375C45A is of type GDT CatalogueItemRelationship 375C47A. There is zero to n 375C46A OrdinalNumberValue 375C23A for each Catalogue entity 375C43. The @actionCode 375C48A is of type GDT ActionCode 375C50A. There is zero to n 375C49A @actionCode 375C48A for each Catalogue entity 375C43. The SourceDatalogueItem 375C51A is of type GDT SourceDatalogueItem 375C53A. There is one 375C52A SourceDatalogueItem 375C51A for each Catalogue entity 375C43. The TargetCatalogueItemID 375C54A is of type GDT CatalogueItemID 375C56A. There is one 375C55A TargetCatalogueItemID 375C54A for each Catalogue entity 375C43. The TypeCode 375C57A is of type GDT ObjectStructureRelationshipTypeCode375C59A. There is one 375C58A TypeCode 375C57A for each Catalogue entity 375C43.

The CatalogueView 375C61A includes an @actionCode 375C64A, an @itemListCompleteTransmissionIndicator 375C67A, an ID 375C70A, a Name 375C73A, and an Item 375C67A at level 6 375C06. The CatalogueView 375C61A is of type GDT CataloguePublicationTransmissionContentChangeRequestCatalogueView 375C63A. There is one to n 375C62A CatalogueView 375C61A for each Catalogue entity 375C43. The @actionCode 375C64A is of type GDT ActionCode 375C66A. There is zero to n 375C65A @actionCode 375C64A for each CatalogueView 375C61A. The @itemListCompleteTransmissionIndicator 375C67A is of type GDT CatalogueView 375C61A. There is zero to one 375C69A @itemListCompleteTransmissionIndicator 375C67A for each CatalogueView 375C61A. The ID 375C70A is of type GDT CatalogueViewID 375C72A. There is one 375C71A ID 375C70A for each CatalogueView 375C61A. The Name 375C73A is of type GDT Name 375C75A. There is zero to n 375C74A Name 375C73A for each CatalogueView 375C61A. The Item 375C67A is of type GDT CatalogueViewItem 375C81A. There is zero ton 375C77A for each CatalogueView 375C61A.

The Item 375C67A includes an @actionCode 375C79A and a CatalogueItemID 375C82A at level 7. The Item 375C67A is of type GDT CatalogueViewItem375C78A. There is zero to n 375C77A Item 375C67A for each Item 375C67A. The @actionCode 375C79A is of type GDT ActionCode 375C81A. There is zero to one 375C80A @actionCode 375C79A for each Item 375C67A. The CatalogueItemID 375C82A is of type GDT CatalogueItemID 375C84A. There is one 375C83A CatalogueItemID 375C82A for each Item 375C67A.

(14) Message Data Type Catalogue Publication Transmission Content Change Confirmation Message The message data type CataloguePublicationTransmissionContentChangeConfirmationMessage includes the object CataloguePublicationTransmission in the view required for the CataloguePublicationTransmissionContentChangeConfirmation information concerning the transmission of the object and the general business-related information relevant for sending the message.

The message data type contains the packages MessageHeader package 375B04, TransmissionInformation package 375B06, and CataloguePublicationTransmission package 375B08. The message data type CataloguePublicationTransmissionContentChangeConfirmationMessage provides the structure for message type CataloguePublicationTransmissionContentChangeConfirmation. This message is the response to message CataloguePublicationTransmissionContentChangeRequest 375B02.

(a) Message Header Package

In the Header Package 375B04, an element ReferenceID can be used, which references the corresponding message CataloguePublicationTransmissionContentChangeRequest, to which this message is the Confirmation. The MessageHeader package includes a message header entity 375B12 and may include a SenderParty entity 375B14.

(b) Transmission Information Package

The TransmissionInformation package 375B06 groups information pertaining to the transmission of the object (CataloguePublicationTransmission) contained in the message, and contains the entity TransmissionLog 375B20, which can contain one or more of an Item entity 375B22.

(i) Transmission Log

A TransmissionLog 375B20 is a collection of events that occurred during processing of the transmitted business document object. It can contain the entity TransmissionLogItem 375B22.

(ii) TransmissionLogItem

A TransmissionLogItem 375B22 is the information about an event that occurred during processing of the transmitted business document object. TransmissionLogItem 375B22 is of type GDT LogItem. The MinimumRequestedLogItemSeverityCode stated in message CataloguePublicationTransmissionContentChangeRequest determines which LogItems are to be returned by specifying their severity.

(c) Catalogue Publication Transmission Package

The CataloguePublicationTransmission package 375B08 groups the CataloguePublicationTransmission with the package Catalogue 375B28.

(i) CataloguePublicationTransmission

A CataloguePublicationTransmission entity 375B30 in the view required for CataloguePublicationTransmissionContentChangeConfirmation contains the information that may be necessary to confirm whether single items of the catalogue contained in the CataloguePublicationTransmissionContentChangeRequest could be created, changed, or deleted. The entity CataloguePublicationTransmission 375B30 contains the elements ID and ContentChangeCompletedIndicator.

ID can identify the Catalogue publication transmission of which items where requested to be created, changed or deleted (GDT TransmissionID). ContentChangeCompletedIndicator can specify whether the items could be created, changed, or deleted (GDT BusinessTransactionCompletedIndicator).

Also, the CataloguePublicationTransmission package 375B08 can contain the package Catalogue 375B28. The CataloguePublicationTransmission should be the same as in the corresponding message CataloguePublicationTransmissionContentChangeRequest, to which this message is the Confirmation. Either all Items could be updated or none.

(ii) Catalogue Publication Transmission Catalogue Package

The CataloguePublicationTransmissionCatalogue Package 375B28 groups the catalogue.

(iii) Catalogue

A Catalogue 375B32 in the view required for CataloguePublicationTransmissionContentChangeConfirmation can specify the catalog of which the items have been updated. The Catalogue package 375B28 contains the element CatalogueID, which can identify the catalogue of the transmission of which the items could be created, updated, or deleted (GDT CatalogueID). The Catalogue 375B32 should be the same as in the corresponding message CataloguePublicationTransmissionContentChangeRequest, to which this message is the Confirmation.

(d) Message Data Type—Element Structure

FIGS. 375DA-B depict the element structure for a CataloguePublicationTransmission-ContentChangeConfirmationMessage. As shown in FIG. 375DA, the element structure identifies the different packages 375D00 that may be in a respective CataloguePublicationTransmissionContentChangeConfirmationMessage. The element structure for the CataloguePublicationTransmissionContentChangeConfirmationMessage includes four levels L1 375D01, L2 375D02, L3 375D03, and L4 375D04 each of which is associated with a respective package 375D00. The element structure identifies the occurrence or cardinality 375D05 and data type information (i.e., name 375D06) for the elements at the respective levels 375D01, 375D02, 375D03, and 375D04.

The outermost package of this interface is a CataloguePublicationTransmissionContentChangeConfirmationMessage package 375D07, which includes a CataloguePublicationTransmissionContentChangeConfirmationMessage entity 375D08 at the first level 375D01. The CataloguePublicationTransmissionContentChangeConfirmationMessage entity 375D08 is of generic data type ("GDT") CataloguePublicationTransmissionContentChangeConfirmationMessage 375D09.

The CataloguePublicationTransmissionContentChangeConfirmationMessage package 375D07 includes a MessageHeader package 375D10, a TransmissionInformation package 375D26, and a CataloguePublicationTransmission package 375D32. The MessageHeader package 375D10 includes a MessageHeader entity 375D11 at the second level 375D02, which is of type GDT BusinessDocumentMessageHeader 375D13. There is one 375D12 MessageHeader entity 375D11 for each CataloguePublicationTransmissionContentChangeConfirmationMessage package 375D07.

The MessageHeader entity 375D11 includes an ID 375D14, a Reference ID 375D17, and a CreationDateTime

375D20 at the third level 375D03. The ID 375D14 is of type GDT BusinessDocumentMessageID 375D16. There is one 375D15 ID 375D19 for each MessageHeader entity 375D11. The Reference ID 375D17 is of type GDT BusinessDocumentMessageID 375D19. There is one 375D18 Reference ID 375D17 for each MessageHeader entity 375D11. The CreationDateTime 375D20 is of type GDT DateTime 375D22. There is one 375D21 CreationDateTime 375D20 for each MessageHeader entity 375D11.

The MessageHeader entity 375D11 also includes a SenderParty 375D23 at the third level 375D03. The SenderParty 375D23 is of type GD26BusinessDocumentMessageHeaderParty 375D25. There is one or zero 375D24 SenderParty 375D23 for each MessageHeader entity 375D11.

The TransmissionInformation package 375D26 includes a TransmissionHeader entity 375D27 at the second level 375D02. There is one or zero 375D26 TransmissionHeader entity 375D27 for each CataloguePublicationTransmissionContentChange ConfirmationMessage entity 375D08. The TransmissionHeader 375D29 includes an Item 375D29 of type GDT LogItem 375D31. There is one or more 375D30 Item 375D29 for each TransmissionHeader entity 375D27.

The CataloguePublicationTransmission package 375D32 includes a CataloguePublicationTransmission entity 375D33 at the second level 375D02. The CataloguePublicationTransmission entity 375D33 is of type GDT CataloguePublicationTransmissionContentChangeConfirmationMessage. There is one 375D34 CataloguePublicationTransmission entity 375D33 for each CataloguePublicationTransmissionContentChangeConfirmationMessage entity 375D08. The CataloguePublicationTransmission entity 375D33 includes an ID 375D36 and a ContentChangeCompletedIndicator 375D39. The ID 375D36 is of type GDT TransmissionID 375D38. There is one 375D37 ID 375D36 for each CataloguePublicationTransmission entity 375D33. The ContentChangeCompletedIndicator 375D39 is of type GDT BusinessTransactionCompletedIndicator375D41. There is one 375D40 ContentChangeCompletedIndicator 375D39 for each CataloguePublicationTransmission entity 375D33.

The CataloguePublicationTransmission package 375D32 further includes a Catalogue package 375D42. The Catalogue package 375D42 includes a Catalogue entity 375D43 at the third level 375D03. The Catalogue entity 375D43 is of type GDT CatalogueContentChangeConfirmation 375D45. There is one 375D44 Catalogue entity 375D43 for each CataloguePublicationTransmission entity 375D33.

The Catalogue entity 375D43 includes an ID 375D46. The ID 375D36 is of type GDT CatalogueID 375D48. There is one 375D47 ID 375D47 for each CataloguePublicationTransmission entity 375D33.

(15) An Application Catalog Content Management (CCM)

The context in which the exchange of Catalog data takes place can assist in understanding the Catalogue interfaces. An application Catalog Content Management (CCM) can be an ABAP Add-On built on an Web Application Server (e.g., SAP's Web Application Server). The application can contain the subcomponents a) a Catalog Authoring Tool (CAT), and b) a Catalog Search Engine (CSE).

FIG. 375BB shows the two CCM components CAT 375B36 and CSE 375B38, and how the components relate to each other. CAT 375B36 and CSE 375B38 are independent of each other, meaning that they can be replaced by a similar component and still communicate with each other. This is provided that the applications conform to a Catalog XML interface (e.g., the SAP Catalog XML 1.0 interface) for communication. This XML-based communication is facilitated by XI, regardless of the deployment scenario.

(a) Catalog Authoring Tool (CAT)

CAT 375B36 enables a content manager to manage the structure and contents of a Catalog. Structure refers to the categorization schemes used to classify items (such as products) in a Catalog. Management of Catalog content entails tasks such as uploading an external Catalog, mapping the external categorization schemes into internal ones, enriching the Catalog with, say, images and text, and publishing approved Catalog objects (such as sections and items) to CSE.

(b) Catalog Search Engine (CSE)

CSE 375B38 enables a Catalog user to navigate efficiently through a published Catalog, access the desired information in the most efficient manner and add the selected items to an external shopping cart. In addition, CSE 375B38 allows the publishing (replication) of an already published Catalog from one system to another.

g) Purchase Order Information Interfaces

The A2A PurchaseOrder interface is the interface that is used to inform interested applications about creating, changing, confirming, and deleting a purchase order. From the perspective of the PurchaseOrderLegalDocument this interface is also used to transmit information for creation of a legal text document or to transmit the legal text document itself.

Numerous complex processes exist that run in distributed system landscapes and that are dependent on information about purchase orders. Examples of these are planning processes that have to be informed of the amount of MRP-relevant products ordered and logistics processes that have to be informed of expected goods receipts in good time. The standard system already provides for many of these processes, which are covered by specialized messages. However, there will always be customer-specific processes that are implemented at the project level. The PurchaseOrderInformation Interface serves as a generic interface for implementing such customer-specific processes that depend on purchase order information. From the perspective of the PurchaseOrderLegalDocument, the PurchaseOrderInformation Interface also offers direct integration with a document management (specifically, this is the application "Document Builder" that we shall refer to generally from here on as Document Management). This generates a legal text document with corresponding legal clauses using the business data framework of the purchase order and sends this as an attachment back to the procurement system.

(1) Message Types

The PurchaseOrderInformation Interface combines the message types PurchaseorderInformation, PurchaseOrderLegalDocumentRequest and PurchaseOrderLegalDocumentNotification. PurchaseOrderInformation is based on the message data type PurchaseOrderInformationMessage whereas the other two message types are based on the message data type PurchaseOrderLegalDocumentMessage. Both message data types have in common that they contain the BusinessDocumentObject PurchaseOr-der in the PurchaseOrderInformation perspective. This view contains all the purchase order data that is required for A2A purchase order scenarios since a comprehensive transmission of purchase order information is desirable.

(a) Message Type Purchase Order Information

PurchaseOrderInformation is the information from a procurement system for interested recipients about the status of a purchase order (PurchaseOrder). This includes purchase order changes, order confirmations, and order cancellations.

The structure of the PurchaseOrderInformation message is the structure of the PurchaseOrderInformationMessage.

(b) Purchase Order Legal Document Request

A PurchaseOrderLegalDocumentRequest is the request from Purchasing to Document Management to generate a legal text document from the purchase order. The message type PurchaseOrderLegalDocumentRequest can be predetermined by the message data type PurchaseOrderLegalDocumentMessage which contains the object PurchaseOrder in the PurchaseOrderInformation view. A PurchaseOrderLegalDocumentRequest message can place a purchase order at the disposal of the Document Management System. In the Document Management System enhancements are made and added in the form of attachments. The business object purchase order remains unchanged in structure. The process ownership remains in the procurement system.

(c) PurchaseOrderLegalDocumentNotification

A PurchaseOrderLegalDocumentNotification is a notification from Document Management to Purchasing with a legal text document for a PurchaseOrder. The message type PurchaseOrderLegalDocumentNotification can be predetermined by the message data type PurchaseOrderLegalDocumentMessage which contains the object PurchaseOrder in the PurchaseOrderInformation view. A generated legal text document can be transmitted as structure element LegalDocumentAttachment. The other structure elements of the MDT PurchaseOrderLegalDocumentMessage might not be used.

(2) Message Choreography

FIG. 376 shows the interaction between the represented Purchase Order Information interfaces in a contract process. The following message choreography describes the possible logical sequence of the messages that might be necessary to realize a scenario between a Sales server 37600, a Purchasing server 37602, a Fulfillment Coordination server 37604, a Supply Chain Planning server 37606, a Supply Chain Execution server 37608, and a Document Management System server 37610.

A PurchaseOrderRequest message 37612 is sent from the Purchasing server 37602 to the Sales server 37600. The PurchaseOrderRequest message 37612 is a request from a purchaser to a seller to deliver goods or provide services. A PurchaseOrderConfirmation message 37614 is sent from the Sales server 37600 to the Purchasing server 37602. The PurchaseOrderConfirmation message 37614 is a confirmation, partial confirmation, or change from a seller to the purchaser, regarding the requested delivery of goods or provision of services. A PurchaseOrderInformation message 37616 is sent from the Purchasing server 37602 to the Fulfillment Coordination server 37604. The PurchaseOrderInformation message 37616 is information from a purchasing system for interested recipients about the current state of a purchase order when creating or changing a purchase order, confirming a purchase order or canceling a purchase order. The PurchaseOrderInformation message 37616 can also be sent from the Fulfillment Coordination server 37604 to the Supply Chain Planning server 37606.

A DeliveryExecutionRequest message 37618 is sent from the Fulfillment Coordination server 37604 to the Supply Chain Execution server 37608. The DeliveryExecutionRequest message 37618 is a request to a warehouse or supply chain execution to prepare and execute the outbound delivery of goods or the acceptance of an expected or announced inbound delivery. Optionally, the DeliveryExecutionRequest message 37618 can be sent from the Purchasing server 37602 to the Supply Chain Execution server 37608.

A DeliveryInformation message 37620 is sent from the Fulfillment Coordination server 37604 to the Purchasing server 37602 and to the Supply Chain Planning server 37606. The DeliveryInformation message 37620 is a message about the creation, change, and execution status of a delivery. A PurchaseOrderLegalDocumentRequest message 37622 is sent from the Purchasing server 37602 to the Document Management System server 37610. The PurchaseOrderLegalDocumentRequest message 37622 is the request from Purchasing to Document Management to generate a legal text document from the purchase order. A PurchaseOrderLegalDocumentNotification message 37624 is sent from the Document Management System server 37610 to the Purchasing server 37602. The PurchaseOrderLegalDocumentNotification message 37624 is the notification from Document Management to Purchasing with a legal text document for a purchase order.

The PurchaseOrderInformation message can be sent regardless of the type of communication with the vendor, that is, PurchaseOrderInformation is sent if the purchase order is sent to the vendor by fax or if a pur-chase order is confirmed by e-mail and created manually in the procurement system on the user inter-face. The current purchase order status can be transmitted in full with every PurchaseOrderInformation message. Data that has not been transmitted is implicitly considered deleted. This is especially the case for items that have not been transmitted.

The initiative for creation of the legal text document can come from the purchaser (PurchaseOrderLegal-Document scenario). In some instances, a legal department is called on in parallel and with manual coordina-tion, to come up with the legal wording based on the business data framework of the purchase order. On agreement, the legal wording is signed and is usually filed as an unstructured text document on a file server. This manual process of coordination between a structured document in the procurement system and a legal text document is being converted to a system-integrated process by means of the messages PurchaseOrderLegalDocumentRequest and PurchaseOrderLegalDocumentNotification.

In the framework of the purchase order process, Purchasing can send the current status of the structured business document at certain times to Document Management using the PurchaseOrderLegalDocumen-tRequest. The conditions that trigger sending of the status are determined by the Document Management user. Document Management then creates the legal text document from the structured data framework. Here Document Management can avail of predefined contract clauses and text passages in order to make the legal department's internal process more efficient. The resulting legal text document is then returned to Purchasing in the form of an attachment with the PurchaseOrderLegalDocumentNotification, where the structure of the business object Purchase Order does not change.

(a) Serializing Messages

All PurchaseOrderInformation messages can be sent exactly once in order (EOIO) and serialized using message queues. Each purchase order should have its own message queue (as opposed to one queue for all purchase orders) so that one failed message does not block all the other PurchaseOrderInformation mes-sages in the entire system.

(b) Error Handling

In order to restart a process that is corrupt as a result of a failed message, the procurement system must provide an option for transmitting the current status of a purchase order at any time using a PurchaseOr-derInformation message.

(c) Interfaces

The PurchaseOrderInformation messages can be implemented in the procurement system by means of the following message interfaces: PurchaseOrderInformation_Out, PurchaseOrderLegalDocumentRequest_Out, and PurchaseOrderLegalDocumentNotification_In.

(3) Message Data Type Data Model—PurchaseOrderInformationMessage

FIG. 377 depicts the data model for the PurchaseOrderInformationMessage. The message data type PurchaseOrderInformationMessage groups together the business information that is relevant for sending a business document in a message and the PurchaseOrderInformation object in the business document. It includes a PurchaseOrderInformationMessage package 37700, which includes a PurchaseOrder package 37704 and a PurchaseOrderInformationMessage entity 37706. Optionally, a PurchaseOrderInformationMessage package 37700 includes a MessageHeader package (not shown).

To ensure that the elements and entities in the message data type PurchaseOrderInformationMessage are used correctly with regard to their changeability in an ordering process, if it is specified that an element or entity is not changed, changes might not permitted once the element or entity has been created. The element or entity can be assigned a new value when a purchase order or a new item within a purchase order is created; this value can no longer be changed in other messages. The message data type PurchaseOrderInformationMessage makes the structure available for the message types PurchaseOrderInformation and the relevant interfaces.

Methods and systems consistent with the subject matter described herein use the package template for a BusinessTransactionDocument for an SCM Master Data depicted in FIG. 270B to derive the PurchaseOrderInformationMessage interface. There is a 1:c relationship between entities in this Interface unless otherwise noted herein or indicated in the Figures.

(a) Purchase Order Package

The PurchaseOrder package 37704 includes a Party package 37718, a Location package 37720, a DeliveryInformation package 37722, a PaymentInformation package 37724, an Attachment package 37726, a Description package 37728, a FollowUpMessage package 37730, an Item package 37732, and a PurchaseOrder entity 37734. There is a 1:1 relationship between the PurchaseOrderInformationMessage entity 37706 and the PurchaseOrder entity 37734.

(i) Purchase Order

The PurchaseOrder identifies the information about the status of a purchase order. This includes purchase order change, confirmation, or cancellation. The PurchaseOrder entity 37734 is divided into PurchaseOrderItems that each specify an ordered product or additional information relevant for such a product, such as information about bills of material (BOMs) or discount and value limits (see PurchaseOrderInformationItem package).

In addition to the buying party and the seller, additional parties may be involved in the purchase order (see Party package). Locations may be specified for the purchase order delivery (see Location package). Delivery and payment terms may also be agreed upon (see DeliveryInformation package and PaymentInformation package).

Notes or references to attachments may be specified for the purchase order (see Description package and Attachment package). The types of follow-up documents that are expected may also be specified (see FollowUpMessage package).

The PurchaseOrder entity 37734 is of type GDT: PurchaseOrderInformation. The PurchaseOrder entity 37734 includes an ID, a BuyerPostingDateTime, a BuyerLastChangeDateTime, and a Note. The ID is a unique identifier specified by the buyer for the purchase order. The BuyerPostingDateTime is the creation date/time of the purchase order at the buyer. The BuyerPostingDateTime is of type GDT: DateTime. The BuyerLastChangeDateTime is the date/time of the last change made to the purchase order by the buyer. The BuyerLastChangeDateTime is of type GDT: DateTime. The Note is a short description or the title of the purchase order. It is generally used to provide the user with a simple method for searching for a particular purchase order. The Note is of type GDT: Note.

Within any given purchase order, monetary amounts and prices are typically in the same currency. Preferably, the ID will not change once a purchase order has been created and the BuyerPostingDateTime will not change once a purchase order has been created.

(ii) Purchase Order Party Package

The Party package 37718 groups together the business parties involved in the purchase order. It includes a BuyerParty entity 37736, a SellerParty entity 37738, a ProductRecipientParty entity 37740, a VendorParty entity 37742, a ManufacturerParty entity 37744, a BillToParty entity 37746, a PayerParty entity 37748, and a CarrierParty entity 37750.

Either the ID or the ID and address may be transferred for each party. If the ID is transferred, the ID address defined in the master data is used. If the ID and address are transferred, the ID identifies the party and the address is deemed to be a document address that is different from the master data address. A default logic is used for the parties from the header to the items and within item hierarchies. Parties specified in the header are used for the items for which a corresponding party is not explicitly transferred and that are directly assigned to the header. In accordance with the same logic, parties transferred at the item level are used for the subitems assigned to the relevant item in an item hierarchy. The default logic is used for the party as a whole, including the contact person. Parts of a party specified at the header level or for a hierarchy item should not be specified in more detail at the item level. The default logic is a simplified version of the transferred message. As regards logic, parties at the header level and for hierarchy items behave as if they have been explicitly transferred for the subitems of the message.

(a) Buyer Party

The BuyerParty is a party that buys goods or services. The BuyerParty entity 37736 is of type GDT: BusinessTransactionParty. The same BuyerParty may be used for all of the items in a purchase order. The BuyerParty typically does not change once a purchase order has been created. The BuyerParty should typically be specified.

Changes can be made to the BuyerParty/Contact, and a different BuyerParty/Contact is permitted for each item. Changes can be made to the address of the BuyerParty, but different addresses should not be permitted for each item. If a ProductRecipientParty is not specified in the ordering process, the BuyerParty may also be used as the ProductRecipientParty. If a ProductRecipientParty and ShipToLocation are not specified in the ordering process, the BuyerParty address may be used as the ship-to address. If a BillToParty is not specified in the ordering process, the BuyerParty may also be used as the BillToParty. If a BillToParty and PayerParty are not specified in the ordering process, the BuyerParty may also be used as the PayerParty.

(b) Seller Party

The SellerParty is a party that sells goods or services. The SellerParty entity 37738 is of type GDT: BusinessTransactionDocumentParty. The same Seller Party may be used for the items in a purchase order. The Seller Party should not be changed once a purchase order has been created. The Seller Party should typically be specified.

Changes can be made to the SellerParty/Contact and a different SellerParty/Contact is permitted for each item. Changes can be made to the address of the Seller Party, but different addresses should not be permitted for each item. If a VendorParty is not specified in the ordering process, the Seller Party may also be used as the VendorParty. If a VendorParty and ShipFromLocation are not specified in the ordering process, the address of the SellerParty may also be used as the ship-from address for the material items.

(c) Product Recipient Party

The ProductRecipientParty is a party to which goods are delivered or for whom services are provided. The ProductRecipientParty entity 37740 is of type GDT: BusinessTransactionDocumentParty. The ProductRecipientParty entity 37740 includes the same type of information as the BuyerParty entity 37736.

If a ShipToLocation is not explicitly specified in the ordering process, the ProductRecipientParty address may be used as the ship-to address. The ProductRecipientParty is not synonymous with the ShipToLocation and should be used when the ProductRecipientParty (company or person) is different than the BuyerParty.

(d) Vendor Party

The VendorParty is a party that delivers goods or provides services. The VendorParty entity 37742 is of type GDT: BusinessTransactionDocumentParty. The VendorParty entity 37742 includes the same type of information as the BuyerParty entity 37736.

If a ShipFromLocation is not specified in the ordering process, the address of the VendorParty may be used as the ship-from address for the material items. The VendorParty is not the company or person that is solely responsible for transporting the goods. Rather, the CarrierParty is responsible for this. The VendorParty is not synonymous with the ShipFromLocation and should be used when the VendorParty (company or person) is different than the SellerParty.

(e) Manufacturer Party

The ManufacturerParty is a party that manufactures goods. The ManufacturerParty entity 37744 is of type GDT: BusinessTransactionDocumentParty. The ManufacturerParty entity 37744 includes the same type of information as the BuyerParty entity 37736.

The ManufacturerParty entity 37744 may be used for material items. The default logic (from header to item to subitems) is used for material items. For other items, the ManufacturerParty is typically ignored. The ManufacturerParty can be used to uniquely define the context of a ManufacturerProductID.

(f) Bill To Party

The BillToParty is a party to which the invoice for goods or services is sent. The BillToParty entity 37746 is of type GDT: BusinessTransactionDocumentParty. The BillToParty entity 37746 includes the same type of information as the BuyerParty entity 37736.

If a PayerParty is not specified in the ordering process, the BillToParty may also be used as the PayerParty. Conversely, the BillToParty may not be explicitly derived from the PayerParty.

(g) Payer Party

The PayerParty is a party that pays for goods or services. The PayerParty entity 37748 is of type GDT: BusinessTransactionDocumentParty. The PayerParty entity 37748 includes the same type of information as the BuyerParty entity 37736.

(h) Carrier Party

The CarrierParty is a party that transports goods. The CarrierParty entity 37750 is of type GDT: BusinessTransactionDocumentParty. The CarrierParty entity 37750 includes the same type of information as the BuyerParty entity 37736.

The CarrierParty can be used for material items. The default logic (from header to item to subitems) is typically used for material items.

(iii) Purchase Order Location Package

The Location package 37720 groups together the locations relevant for the purchase order. It includes a ShipToLocation entity 37792 and a ShipFromLocation entity 37794.

A similar default logic to that used for Parties is also used for locations. Either the ID or the address, or both can be transferred to each location. If the ID is transferred, the ID address defined in the master data is used. If the address is transferred, it is this address that is used (if necessary, a location is assigned at the address recipient). If the ID and address are transferred, the ID identifies the location and the address is deemed to be a document address that is different to the master data address.

(a) Ship To Location

The ShipToLocation is the location to which goods are to be delivered or where services are to be provided. The ShipToLocation entity 37792 is of type GDT: BusinessTransactionDocumentLocation.

(b) Ship From Location

The ShipFromLocation is the location from which goods are to be shipped. The ShipFromLocation entity 37794 is of type GDT: BusinessTransactionDocumentLocation. The ShipFromLocation entity 37794 may be used for material items. The default logic (from header to item to subitems) is typically used for material items. For the other items, the ShipFromLocation may be ignored.

(iv) Purchase Order Delivery Information Package

The DeliveryInformation package 37722 groups together the information for a delivery required for a purchase order. The DeliveryInformation package 37722 includes a DeliveryTerms entity 37710A. A similar default logic to that used for Parties is also used for DeliveryTerms.

The DeliveryTerms entity 37710A includes an Incoterms entity 37712A, a PartialDelivery entity 37714A, a QuantityTolerance entity 37716A, a Transport entity 37718A, and a Description entity 37720A.

The DeliveryTerms are the conditions and agreements that are valid for executing the delivery and transporting the ordered goods and for the necessary services and activities. The DeliveryTerms entity 37710A is of type GDT: DeliveryTerms. Within the DeliveryTerms, the Incoterms and the transport may be used for material items.

(v) Purchase Order Payment Information Package

The PaymentInformation package 37724 groups together the payment information about the purchase order. The PaymentInformation package 37724 includes a CashDiscountTerms entity 37722A and a PaymentForm entity 37724A.

The CashDiscountTerms are the terms of payment in an ordering process. The CashDiscountTerms entity 37722A is of type GDT: CashDiscountTerms. The CashDiscountTerms entity 37722A includes a MaximumDiscount entity 37726A and a NormalDiscount entity 37728A.

The PaymentForm is the payment form together with the data required. The PaymentForm entity 37724A includes a PaymentFormCode, which is the coded representation of the payment form. The PaymentFormCode is of type GDT: PaymentFormCode. The PaymentForm entity 37724A also includes a PaymentCard entity 37730A. The PaymentCard entity 37730A is of type GDT: PaymentCard, and is a credit card or a customer card.

(vi) Purchase Order Attachment Package

The Attachment package 37726 groups together the attachment information regarding the purchase order. It includes an Attachment entity 37732A, an AttachmentWebAddress entity 37734A, and a LegalDocumentAttachment37736A. There is a 1:cn relationship between the PurchaseOrder entity 37734 and the Attachment entity 37732A, and a 1:cn relationship between the PurchaseOrder entity 37734 and the AttachmentWebAddress entity 37734A.

The Attachment 37732A is any document that refers to the purchase order. The Attachment entity 37732A is of type GDT: Attachment.

The AttachmentWebAddress 37734A identifies the address of a document that relates to the order. The document can be of any type. The AttachmentWebAddress entity 37734A is of type GDT: AttachmentWebAddress.

LegalDocumentAttachment37736A is an attachment that contains the legal contract text of the purchase order.

(vii) Purchase Order Description Package

The Description package 37728 groups together the texts regarding the purchase order. The Description package37728 includes a Description entity 37736A and an InternalDescription entity 37738A. There is a 1:c relationship between the PurchaseOrder entity 37734 and the Description entity 37736A, and a 1:c relationship between the PurchaseOrder entity 37734 and the InternalDescription entity 37738A.

The Description is a natural-language text regarding the purchase order, which is visible to business parties. The Description entity 37736A is of type GDT: Description. The Description can be used for the types of textual information about the transferred purchase order and not just the current message. An example of this would be information stating that the Purchasing employee responsible is on vacation as of a specific date, and indicating the name and telephone number of a substitute as of this date.

An InternalDescription is a natural-language text regarding the purchase order, which is not visible to business parties. The InternalDescription entity 37738A is of type GDT: Description.

(viii) Purchase Order Follow-Up Message Package

The FollowUpMessage package 37730 groups together the information about subsequent messages that the buyer expects to receive from the seller with regard to the purchase order. The FollowUpMessage package 37730 includes a FollowUpPurchaseOrderConfirmation entity 37740A, a FollowUpDespatchedDeliveryNotification entity 37742A, a FollowUpServiceAcknowledgementRequest entity 37744A, and a FollowUpInvoiceRequest entity 37746A. There is a respective 1:c relationship between the PurchaseOrder entity 37734 and the FollowUpPurchaseOrderConfirmation entity 37740A, the FollowUpDespatchedDeliveryNotification entity 37742A, the FollowUpServiceAcknowledgementRequest entity 37744A, and the FollowUpInvoiceRequest entity 37746A.

The FollowUpPurchaseOrderConfirmation identifies information about whether and in what form the buyer expects to receive confirmation of the purchase order from the seller. The FollowUpPurchaseOrderConfirmation entity 37740A includes a RequirementCode, which is a coded representation of information about whether the buyer expects to receive confirmation of the purchase order from the seller. The RequirementCode is of type GDT: FollowUpMessageRequirementCode. The RequirementCode may have the values “02” (Expected) and “04” (Unexpected).

The FollowUpDespatchedDeliveryNotification identifies information about whether the buyer wants to be informed by the seller of any outbound deliveries. The FollowUpDespatchedDeliveryNotification entity 37742A includes a RequirementCode, which is a coded representation of information about whether the buyer expects the seller to send notification of any outbound deliveries of the ordered goods. The RequirementCode is of type GDT: FollowUpMessageRequirementCode. The RequirementCode may have the values “02” (Expected) and “04” (Unexpected).

The FollowUpServiceAcknowledgementRequest identifies information about whether the buyer wants to be informed by the seller of any services provided. The FollowUpServiceAcknowledgementRequest entity 37744A includes a RequirementCode, which is a coded representation of information about whether the buyer wants to be informed by the seller of any services provided. The RequirementCode is of type GDT: FollowUpMessageRequirementCode. The RequirementCode may have the values “02” (Expected) and “04” (Unexpected). The RequirementCode may be changed by the buyer. If the buyer changes the RequirementCode from “Unexpected” to “Expected” during an ordering process, the seller should inform the buyer of the new services provided once the change has been received. If the buyer changes the RequirementCode from “Expected” to “Unexpected,” the seller should not send any further information about services provided. The seller can transfer the confirmation of the services either electronically using a ServiceAcknowledgement-Request message or by traditional methods of communication, such as e-mail or fax. In addition to service items, a confirmation of a service also can contain planned or unplanned material items for materials that were required when the service was provided.

The FollowUpInvoiceRequest identifies information about whether the buyer expects to receive an invoice from the seller. The FollowUpInvoiceRequest entity 37746A includes a RequirementCode and an EvaluatedReceiptSettlementIndicator. The RequirementCode is a coded representation of information about whether the buyer expects to receive an invoice from the seller. The RequirementCode is of type GDT: FollowUpMessageRequirementCode. The EvaluatedReceiptSettlementIndicator indicates whether or not the purchase order settlement is to be processed automatically by the goods receipt, without an invoice. The EvaluatedReceiptSettlementIndicator is of type GDT: EvaluatedReceiptSettlementIndicator. The RequirementCode may have the values “01” (Required) and “05” (Forbidden). If the EvaluatedReceiptSettlementIndicator is set to “true,” the RequirementCode should be set to “Forbidden.”

(ix) Purchase Order Item Package

The PurchaseOrderItem package 37732 includes a ScheduleLine package 37748A, a ProductInformation package 37750A, a PriceInformation package 37752A, a Party package 37754A, a Location package 37756A, a DeliveryInformation package 37758A, a BusinessTransactionDocumentReference package 37760A, an Attachment package 37762A, a Description package 37764A, and a PurchaseOrderItem entity 37766A. There is a 1:cn relationship between the PurchaseOrder entity 37734 and the PurchaseOrderItem entity 37766A. Items are arranged hierarchically using a Hierarchy Relationship 37768A. The Hierarchy Relationship 37768A is the relationship between a sub-item and a higher-level parent item in an item hierarchy. There is a 1:cn relationship between the Item entity 37766A and its subordinate entities, and a 1:c relationship between the Item entity 37766A and its superordinate entities.

(a) Purchase Order Item

The PurchaseOrderItem specifies a product ordered by the purchase order or additional information about ordered products. This information includes specifications on discounts in kind, substitute products, and value limits. The PurchaseOrderItem entity 37766A includes detailed information about a particular product (see Product package) and its price (see PriceInformation package). The quantities of the product and (delivery) dates are specified in the schedule line (see ScheduleLine package).

For the PurchaseOrderItem entity 37766A (compared to the information of the PurchaseOrder), deviating parties, locations, and delivery terms may be defined (see Party package, Location package, and DeliveryInformation package). The PurchaseOrderItem entity 37766A may contain references to other business documents that are relevant for the item (see BusinessTransactionDocumentReference package). Notes or references to attachments can also be specified for the PurchaseOrderItem (see Description package and Attachment package).

A PurchaseOrderItem entity 37766A can be subordinate to another PurchaseOrderItem within a hierarchy to represent a business relationship between the two items. This could be information about a discount in kind or substitute product for an ordered product, for example. This relationship can also be used to group together purchase order items, that is, a PurchaseOrderItem can group together other PurchaseOrderItems. The PurchaseOrderItem 37766A is of type GDT: PurchaseOrderItem.

The PurchaseOrderItem entity 37766A includes the elments ID and ConfirmedInformationOutdatedIndicator.

The ID elment is the ID is the identifier assigned by the buyer to a purchase order item and is of type GDT: BusinessTransactionDocumentItemID. The identifier is unique within a particular purchase order and is of type GDT: BusinessTransactionDocumentItemID. A ConfirmedInformationOutdatedIndicator indicates whether the confirmation information Con-firmedPrice and ConfirmedScheduleLine transmitted with the item refers to the current purchase order status or whether it is outdated because changes have been made to the purchase order. ConfirmedInformationOutdatedIndicator is of type GDT: InformationOutdatedIndicator.

In one implementation and with respect to the Message Data Type, the ID element must not be changed once an item has been created; the SellerID element must not be changed once an item has been created; and the UnplannedItemPermissionCode element must not be changed once an item has been created.

In one implementation and with respect to the Message Type PurchaseOrderRequest, the SellerID must not be used; the AcceptanceStatusCode must not be used; and the UnconfirmedQuantityCanceledIndicator must not be used.

In one implementation and with respect to the Message Type PurchaseOrderChangeRequest, the AcceptanceStatusCode must not be used and the UnconfirmedQuantityCanceledIndicator must not be used.

From a semantic point of view, items can contain other items. This enables item hierarchies to be mapped. From a technical point of view, the item type is not defined recursively, since this cannot be handled by some commonly-used XML tools. The hierarchies are mapped using the entity HierarchyRelationship. There are various item categories, which are governed by a variety of constraints. An item can have several constraint types. In this case, the item satisfies the constraints of its constraint types. Which constraint types can be combined with one another and how is specified in the description of the constraint types. The following constraint types exist: (1) Standard items are the items to which no lower-level items have been assigned in the hierarchy. An item that is not referenced by another item, using the ParentItemID is a standard item; (2) Hierarchy items are items to which at least one other lower-level item has been assigned in the hierarchy. An item that is referenced by at least one other item, using the ParentItemID is a hierarchy item. Items are typically either standard or hierarchy items; (3) Subitems are items that have been assigned below a hierarchy item and not directly to the purchase order header. Subitems can be both standard items and hierarchy items. A subitem is an item that references another item using the ParentItemID; (4) Material items are items whose product is a material. Items whose ProductTypeCode is “1” (Material) are material items; (5) Service items are items whose product is a service. Items whose ProductTypeCode is “2” (Service) are service items; (6) Unspecified product items are items for which it is not specified whether they refer to a material or a service. Items whose ProductTypeCode is not specified are unspecified product items. Items are material, service, or unspecified product items. An unspecified product item satisfies the constraints of a material, service, or limit item; (7) Grouping hierarchy items are hierarchy items that logically group together other items. Multilevel grouping hierarchies are permitted, that is, a grouping hierarchy item can contain subitems that are also grouping hierarchy items. Hierarchy items whose subitems have HierarchyRelationshipTypeCode “002” (Group) are grouping hierarchy items; subitems with a different HierarchyRelationshipTypeCode are not permitted. Grouping hierarchy items are not permitted to be subitems of other types of hierarchy items; (8) Substitute product hierarchy items are hierarchy items for which at least one subitem with a substitute product exists. Multilevel substitute product hierarchies are not permitted, that is, a substitute product cannot be substituted. Hierarchy items whose subitems have HierarchyRelationshipTypeCode “006” (Substitute Product) are substitute product hierarchy items; subitems with a different HierarchyRelationshipTypeCode are not permitted. Substitute product hierarchy items can be used as subitems in grouping hierarchies. Substitute product subitems can be transferred in the PurchaseOrderConfirmation message. The buyer can reject proposed substitute products by cancelling the entire associated substitute product hierarchy item; (9) BOM hierarchy items are hierarchy items that group together other items in a BOM. Multilevel BOM hierarchies are permitted. Hierarchy items with at least one subitem with HierarchyRelationshipTypeCode “001” (Bill of Material) are BOM hierarchy items; additional subitems are permitted with the HierarchyRelationshipTypeCode “003” (Discount in Kind); (10) Discount in kind hierarchy items are hierarchy items for which a goods discount is granted in the form of an inclusive or exclusive bonus quantity. Multilevel discount in kind hierarchies are not permitted, that is, no discount in kind can be granted for discount in kind. The goods discount is described in the form of one or more subitems in the discount in kind hierarchy item. Hierarchy items with at least one subitem with HierarchyRelationshipTypeCode “003” (Discount in Kind) are discount in kind hierarchy items; additional subitems are permitted with the HierarchyRelationshipTypeCode “001” (Bill of Material). Hierarchy items are grouping, BOM, or discount in kind hierarchy items. A hierarchy item can be both a BOM and discount in kind hierarchy item, if a discount in kind has been granted for a BOM; (11) Limit items are both standard and unspecified product items for which the exact requirements are unknown at the time of ordering. Items with a ProcurementCostUpperLimit are limit items. Limit items are not permitted to be subitems of BOM or discount in kind hierarchy items. No substitute product subitems are permitted for limit items. Dependencies between elements or entities of this item category are described under “Notes” for the relevant element or entity.

The PurchaseOrderItem contains the HierarchyRelationship entity.

(b) Hierarchy Relationship

A HierarchyRelationship is the relationship between a subitem and a higher-level parent item in an item hierarchy. The HierarchyRelationship 37768A includes a ParentItemID and a TypeCode. The ParentItemID is the reference to the parent item with the item number assigned by the buyer. The ParentItemID is of type GDT: BusinessTransactionDocumentItemID. The TypeCode represents the hierarchical relationship between the subitem and its higher-level parent item. The TypeCode is of type GDT: BusinessTransactionDocumentItemHierarchyRelationshipTypeCode. The ParentItemID and the TypeCode typically do not changed once an item has been created.

(c) Purchase Order Item Product Information Package

The ProductInformation package 37750A groups together the information for identifying, describing, and classifying a product in an ordering process. It includes a Product entity 37770A and a ProductCategory entity 37772A. There is a 1:c relationship between the PurchaseOrderItem entity 37766A and the Product entity 37770A, and a 1:c relationship between the PurchaseOrderItem entity 37766A and the ProductCategory entity 37772A. The product package is not used in grouping hierarchy items.

The Product includes the details about a product as generally understood from a commercial point of view in business documents. These are the details for identifying a product and product type, and the description of the product. The Product entity 37770A is of type GDT: BusinessTransactionDocumentProduct. For limit items, the description (Note) can be used in the Product entity 37770A. The product number and ProductTypeCode are typically not used. The ProductTypeCode typically does not change once an item has been created. With the exception of grouping hierarchy items, at least the product number or the product description (Note) is specified when a new item is created. If both the product number and description are specified, the description is additional information in the message and can typically be ignored by the recipient. In substitute product subitems, the ProductTypeCode is the same as the parent item ProductTypeCode. In substitute product subitems, the product is the substitute product proposed by the vendor for the product ordered in the associated substitute product hierarchy item.

The ProductCategory includes the details about a product category as generally understood from a commercial point of view in business transaction documents. It includes details for identifying the product category using an internal ID, a standard ID, and IDs assigned by involved parties. The ProductCategory entity 37772A is of type GDT: BusinessTransactionDocumentProductCategory.

(d) Purchase Order Item Price Information Package

The PriceInformation package 37752A groups together the price information in an order item. The Price package includes a Price entity 37774A, a ConfirmedPrice entity 37776A, and a ProcurementCostUpperLimit entity 37778A. There is a respective 1:c relationship between the PurchaseOrderItem entity 37766A and the Price entity 37774A, the ConfirmedPrice entity 37776A, and the ProcurementCostUpperLimit entity 37778A.

The Price is typically not used in grouping hierarchy and discount in kind items. The ProcurementCostUpperLimit is typically used for limit items, whereas the Price and the Confirmed Price are typically not used. The ProcurementCostUpperLimit is typically not used for any items other than limit items. The PriceInformation package 37752A for a purchase order item includes prices; it typically does not contain any information about how the prices are calculated (pricing scales, and so on).

(i) Price

The Price is the order price specified by the buyer. The Price entity 37774A includes a NetUnitPrice, which is the net price specified by the buyer for the base quantity (without tax or cash discount) of the product. The NetUnitPrice is of type GDT: Price. The Price entity 37774A also includes a NetAmount, which is an amount specified by the buyer for the ordered products without taxes and without cash discount. The NetAmount is of type GDT: Amount.

In BOM hierarchies: (1) if the price is specified for the item at the top of the BOM hierarchy and not for the subitems, this price applies; (2) if the price is specified for standard items (end nodes in the hierarchy tree) in the BOM hierarchy, these prices apply, where the price of the entire BOM is the total of the individual prices; and (3) if a price is specified at different levels in the BOM hierarchy, the price that appears above the others in the tree applies. Differences between the total of the individual prices and the price at the next highest hierarchy level are permissible. These may be caused by discounts for the entire BOM. In substitute product subitems, the Price can be used to transfer substitute product prices. The same rules apply here as for the Price in BOM hierarchies.

(ii) Confirmed Price

The ConfirmedPrice is the purchase order price confirmed by the seller. The ConfirmedPrice entity 37776A includes a NetUnitPrice, which is the net price (without tax or cash discount) confirmed by the seller for the base quantity of the product. The NetUnitPrice is of type GDT: Price. In BOM and substitute product hierarchies, the same rules apply for the ConfirmedPrice as for the Price.

(e) Purchase Order Item Party Package

The PurchaseOrderItemParty Package 37754A is similar to the Party package 37718 at the header level. The PurchaseOrderItemParty Package 37754A includes a BuyerParty entity 37780A, a SellerParty entity 37782A, a ProductRecipientParty entity 37784A, a VendorParty entity 37786A, a ManufacturerParty entity 37788A, a BillToParty entity 37790A, a PayerParty entity 37792A, and a CarrierParty entity 37794A. There is a respective 1:c relationship between the PurchaseOrderItem entity 37766A and the BuyerParty entity 37780A, the SellerParty entity 37782A, the ProductRecipientParty entity 37784A, the VendorParty entity 37786A, the ManufacturerParty entity 37788A, the BillToParty entity 37790A, the PayerParty entity 37792A, and the CarrierParty entity 37794A. Each of the BuyerParty entity 37780A, the SellerParty entity 37782A, the ProductRecipientParty entity 37784A, the VendorParty entity 37786A, the ManufacturerParty entity 37788A, the BillToParty entity 37790A, the PayerParty entity 37792A, and the CarrierParty entity 37794A includes the same type of information as the BuyerParty entity 37736 above.

(f) Purchase Order Item Location Package

The PurchaseOrderItemLocation Package 37756A is similar to the Location package 37722 at the header level. The PurchaseOrderItemLocation Package 37756A includes a ShipToLocation entity 37712B and a ShipFromLocation entity 37714B. There is a 1:c relationship between the PurchaseOrderItem entity 37766A and the ShipToLocation entity 37712B, and there is a 1:c relationship between the PurchaseOrderItem entity 37766A and the ShipFromLocation entity 37714B. The ShipToLocation entity 37712B and the ShipFromLocation entity 37714B include the same type of information as the ShipToLocation entity 37792.

(g) Purchase Order Item Delivery Information Package

The PurchaseOrderDeliveryInformation Package 37758A is similar to the DeliveryInformation package 37722 at the header level. The PurchaseOrderDeliveryLocation Package 37758A includes DeliveryTerms entity 37720B. There is a 1:c relationship between the PurchaseOrderItem entity 37766A and the DeliveryTerms entity 37720B.

The DeliveryTerms entity 37720B includes an Incoterms entity 37722B, a PartialDelivery entity 37724B, a QuantityTolerance entity 37726B, a Transport entity 37728B, and a Description entity 37730B. There is a 1:c relationship between the DeliveryTerms entity 37720B and the Incoterms entity 37722B. There is a 1:c relationship between the DeliveryTerms entity 37720B and the PartialDelivery entity 37724B. There is a 1:c relationship between the DeliveryTerms entity 37720B and the QuantityTolerance entity 37726B. There is a 1:c relationship between the DeliveryTerms entity 37720B and the Transport entity 37728B. There is a 1:c relationship between the DeliveryTerms entity 37720B and the Description entity 37730B.

(h) Purchase Order Item Business Transaction Document Reference Package

The BusinessTransactionDocumentReference package 37760A groups together the references to business documents that are relevant for the PurchaseOrderItem and have a business relationship with the item. The BusinessTransactionDocumentReference package 37760A includes a QuoteReference entity 37732B, a PurchaseContractReference entity 37734B, an OriginPurchaseOrderReference entity 37736B, a BuyerProductCatalogueReference entity 37738B, and a SellerProductCatalogueReference entity 37740B. There is a respective 1:c relationship between the PurchaseOrderItem entity 37766A and the QuoteReference entity 37732B, the PurchaseContractReference entity 37734B, the OriginPurchaseOrderReference entity 37736B, the BuyerProductCatalogueReference entity 37738B, and the SellerProductCatalogueReference entity 37740B. None of the entities in the BusinessTransactionDocumentReference package 37760A should be used in grouping hierarchy items.

Individual items in business documents should be referenced in the purchase order messages from the item level. If an item assignment is not recognized, an entire document can be referenced. In this case, the recipient cannot demand that the item numbers in both documents be the same. It is the responsibility of the recipient to try to make this assignment using other criteria that are not necessarily unique, such as the product number. References are used for establishing relationships between different documents. If a reference has been provided, the data relevant to the purchase order is transferred from the document referenced in the purchase order message (the product number in a purchase order item is transferred even if the product number can be derived directly from a bid reference). The data in the purchase order message can differ in any number of ways from the referenced documents. The recipient is able to respond appropriately to such deviations.

A QuoteReference is a reference to a quotation or an item within a quotation. The QuoteReference entity 37732B is of type GDT: BusinessTransactionDocumentReference. The QuoteReference entity 37732B may reference one item, that is, one ItemID is permissible.

A PurchaseContractReference is a reference to a purchase contract or item in a purchase contract. The PurchaseContractReference entity 37734B is of type GDT: BusinessTransactionDocumentReference. In limit items, multiple contract references are possible; a maximum of one contract reference is permissible in other item types. A PurchaseContractReference entity 37734B can reference one item, that is, one ItemID is permissible. Unless otherwise agreed, the seller is responsible for determining the correct PurchaseContractReference for a specified SellerContractReference.

An OriginPurchaseOrderReference is a reference to the origin purchase order or to an item within the origin purchase order in a third-party deal. The OriginPurchaseOrderReference entity 37736B is of type GDT: BusinessTransactionDocumentReference. An OriginPurchaseOrderReference entity 37736B can reference one item, that is, one ItemID is permissible. The OriginPurchaseOrderReference 37736B is used in the purchase orders in a third-party deal, so that the seller can reference the original purchase order of the ShipToParty with the OriginPurchaseOrderReference.

A BuyerProductCatalogueReference is a reference to the buyer's product catalogue or an item within the buyer's product catalogue. The BuyerProductCatalogueReference entity 37738B is of type GDT: CatalogueReference. A BuyerProductCatalogueReference entity 37738B can reference one item, that is, one ItemID is permissible. The BuyerProductCatalogueReference entity 37738B should be filled if a purchase order item refers to a catalogue whose number and item numbers were assigned by the buyer. In the ordering process, the BuyerProductCatalogueReference can be used as a substitute product number if the product is defined in a catalogue rather than having its own master record.

A SellerProductCatalogueReference is a reference to the seller's product catalogue or an item within the seller's product catalogue. The SellerProductCatalogueReference entity 37740B is of type GDT: CatalogueReference. A SellerProductCatalogueReference entity 37740B can reference one item, that is, one ItemID is permissible. The SellerProductCatalogueReference entity 37740B should be filled if a purchase order item refers to a catalogue whose number and item numbers were assigned by the seller. In the ordering process, the SellerProductCatalogueReference can be used as a substitute product number if the product is defined in a catalogue rather than having its own master record.

(i) Purchase Order Item Attachment Package

The PurchaseOrderItemAttachment Package is similar to the Attachment package 37726 at the header level. The PurchaseOrderItemAttachment Package 37762A includes an Attachment entity 37742B and an AttachmentWebAddress entity 37744B. There is a 1:cn relationship between the PurchaseOrderItem entity 37766A and the AttachmentWebAddress entity 37744B, and a 1:cn relationship between the PurchaseOrderItem entity 37766A and Attachment entity 37742B.

(j) Purchase Order Item Description Package

The PurchaseOrderItemDescription Package 37764A is similar to the Description package 37728 at the header level. The PurchaseOrderItemDescription Package 37764A includes a Description entity 37746B and an InternalDescription entity 37748B. There is a 1:c relationship between the PurchaseOrderItem entity 37766A and the Description entity 37746B, and a 1:c relationship between the PurchaseOrderItem entity 37766A and the InternalDescription entity 37748B.

(k) Purchase Order Item Schedule Line Package

A ScheduleLine package 37748A groups together the quantity and date information about a PurchaseOrderItem. The ScheduleLine package 37748A includes a ScheduleLine entity 37750B and a ConfirmedScheduleLine entity 37752B. There is a 1:n relationship between the PurchaseOrderItem entity 37766A and the ScheduleLine entity 37750B, and a 1:cn relationship between the PurchaseOrderItem entity 37766A and the ConfirmedScheduleLine entity 37752B.

There is no direct relationship between the ScheduleLine entity 37750B and the ConfirmedScheduleLine entity 37752B. This has the advantage that the case "10 pieces for 01/01 and 10 pieces for 02/01" ordered as "20 pieces for 02/01" can be confirmed simply and without interpretation on the part of the applications.

(i) Schedule Line

A ScheduleLine is a line containing the quantity and date of a performance schedule required by the buyer for a purchase order. The ScheduleLine entity 37750B is of type GDT: PurchaseOrderItemScheduleLine. The ScheduleLine entity 37750B includes a DeliveryPeriod entity 37754B. There is a 1:c relationship between the ScheduleLine entity 37750B and the DeliveryPeriod entity 37754B.

The ScheduleLine 37750B also includes an ID, a DeliveryPeriod, and a Quantity. The ID is the ScheduleLine number assigned by the procurement system. The ID is of type GDT: ScheduleLineID. The DeliveryPeriod is the period in which the buyer expects a product to be delivered or service provided. The DeliveryPeriod is of type GDT: DateTimePeriod. The Quantity is the purchase order quantity. The Quantity is of type GDT: Quantity.

Multiple ScheduleLines for a purchase order item with identical DeliveryPeriod should not be permitted. All of the ScheduleLines for a particular item typically use the same unit of measure. ScheduleLines should not be used for grouping hierarchy items. In this case, the ScheduleLines is explicitly specified for the subitems. ScheduleLines do not have to be specified for limit items. At least one ScheduleLine is specified for the other item types. Within a ScheduleLine, the quantity is not used for limit items. For the other types of items, the quantity is specified. In the ScheduleLines of subitems for discount in kind and BOM hierarchy items, the DeliveryPeriod of the subitems is identical to the DeliveryPeriod of the relevant parent items. In the ScheduleLines of substitute product subitems, the DeliveryPeriod of the subitems is identical to the DeliveryPeriod of the relevant parent items. The quantities and confirmed quantities of the subitems should be added to the quantities of the parent items, and where deviations occur, the quantities of subitems are typically regarded as the valid quantities. The ID is optional; i.e., a procurement system does not have to number the ScheduleLines.

(ii) Confirmed Schedule Line

A ConfirmedScheduleLine is a line containing the quantity and date of a performance schedule confirmed by the seller for a purchase order. The ConfirmedScheduleLine entity 37752B is of type GDT: PurchaseOrderItemScheduleLine. There is a 1:cn relationship between the PurchaseOrderItem entity 37766A and the ConfirmedScheduleLine entity 37752B. The ConfirmedScheduleLine entity 37752B includes a DeliveryPeriod entity 37756B. There is a 1:c relationship between the ConfirmedScheduleLine entity 37752B and the DeliveryPeriod entity 37756B.

The ConfirmedScheduleLine entity 37752B also includes an ID, a DeliveryPeriod, and a Quantity. The ID is the ConfirmedScheduleLine number assigned by the procurement system. The ID is of type GDT: ScheduleLineID. The DeliveryPeriod is the period in which the seller provides the buyer with confirmation of a delivery or the provision of a service. The DeliveryPeriod is of type GDT: DateTimePeriod. The Quantity is the quantity confirmed by the seller. The Quantity is of type GDT: Quantity.

Multiple ConfirmedScheduleLines are typically not permitted for a purchase order item with identical DeliveryPeriod. The same rules apply for the use of the ConfirmedScheduleLine for the various item types as described for the ScheduleLine. Confirmation of a partial quantity does not mean cancellation of the remaining quantity. It simply means that the seller has agreed to this partial quantity and has not yet made a decision about the remaining quantity. In order to cancel a remaining quantity, the seller reduces the quantity of the ScheduleLine (not that of the ConfirmedScheduleLine) accordingly.

(4) Message Data Type Element Structure

The message data type element structure for the Purchase Order Information message is depicted in FIG. 378A. The element structure is similar to the data model, but provides additional information regarding the details of the interface. The element structure identifies the different packages 37800 in the interface, and represents the entities at various levels within the interface. As depicted in FIG. 378A, the interface for PurchaseOrderInformationMessage includes five levels 37802, 37804, 37806, 37808, and 37810. The outermost package of this interface is a PurchaseOrderInformationMessage package 37816, which includes a PurchaseOrderInformationMessage entity 37818 at the first level 37802. The PurchaseOrderInformationMessage entity 37818 has a data type name "PurchaseOrderInformationMessage" 37820.

The PurchaseOrderInformationMessage package 37816 includes a MessageHeader package 37822 and a PurchaseOrderInformation package 37896. The MessageHeader package 37822 includes a MessageHeader entity 37824 at the second level 37804.

The MessageHeader entity 37824 has a data type name "BusinessDocumentMessageHeader" 37828. There is one 37826 MessageHeader entity 37824 for each MessageHeader package 37822. The MessageHeader entity 37824 includes an ID entity 37830, a ReferenceID entity 37836, a CreationDateTime entity 37842, a SenderParty entity 37848, and a RecipientParty entity 37890 at the third level 37806. The ID entity 37830 has a data type name "BusinessDocumentMessageID" 37834. There is one 37832 ID entity 37830 for a MessageHeader entity 37824. The ReferenceID entity 37836 has a data type name "BusinessDocumentMessageID" 37840. There is zero or one 37838 ReferenceID entity 37836 for a MessageHeader entity 37824. The CreationDateTime entity 37842 has a data type name "DateTime" 37846. There is one 37844 CreationDateTime entity 37842 for a MessageHeader entity 37824.

The SenderParty entity 37848 has a data type name "BusinessDocumentMessageParty" 37852. There is zero or one 37850 SenderParty entity 37848 for a MessageHeader entity 37824. The SenderParty entity 37848 includes an InternalID entity 37854, a StandardID entity 37860, and a ContactPerson entity 37866 at the fourth level 37808. The InternalID entity 37854 has a data type name "PartyInternalID" 37858. There is zero or one 37856 InternalID entity 37854 for a SenderParty entity 37848. The StandardID entity 37860 has a data type name "PartyStandardID" 37864. There is any number of 37862 StandardID entity 37860 for a SenderParty entity 37848.

The ContactPerson entity 37866 has a data type name "ContactPerson" 37870. There is zero or one 37868 ContactPerson entity 37866 for a SenderParty entity 37848. The ContactPerson entity 37866 includes a BuyerID entity 37872, a SellerID entity 37878, and an Address entity 37884 at the fifth level 37810. The BuyerID entity 37872 has a data type name "ContactPersonPartyID" 37876. There is zero or one 37874 BuyerID entity 37872 for a ContactPerson entity 37866. The SellerID entity 37878 has a data type name "ContactPersonPartyID" 37882. There is zero or one 37880 SellerID entity 37878 for a ContactPerson entity 37866. The Address entity 37884 has a data type name “Address” 37888. There is zero or one 37886 Address entity 37884 for a ContactPerson entity 37866.

The RecipientParty entity 37890 has a data type name “BusinessDocumentMessageParty” 37894. There is any number of 37892 RecipientParty entity 37890 for a MessageHeader entity 37824.

The PurchaseOrderInformation package 37896 includes a PurchaseOrderInformation entity 37898 at the second level 37804, a Party package 37828A, a Location Package 37856B, a DeliveryInformation package 37864B, a PaymentInformation package 37830C, an Attachment package 37876C, a Description package 37890C, a FollowUpMessage package 37804D, and an Item package 37852D. The PurchaseOrderInformation entity 37898 has a data type name “PurchaseOrderInformation” 37802A. There is one 37800A PurchaseOrderInformation entity 37898 for each PurchaseOrderInformation package 37896. The PurchaseOrderInformation entity 37898 includes an ID entity 37804F, a PostingDateTime entity 37810A, a LastChangeDateTime entity 37816A, and a Note entity 37822A at the third level 37803. The ID entity 37804F has a data type name “BusinessTransactionDocumentID” 37808A. There is one 37806A ID entity 37804F for a PurchaseOrderInformation entity 37898. The PostingDateTime entity 37810A has a data type name “DateTime” 37814A. There is zero or one 37812A PostingDateTime entity 37810A for a PurchaseOrderInformation entity 37898. The LastChangeDateTime entity 37816A has a data type name “DateTime” 37820A. There is zero or one 37818A LastChangeDateTime entity 37816A for a PurchaseOrderInformation entity 37898. The Note entity 37822A has a data type name “Note” 37826A. There is zero or one 37824A Note entity 37822A for a PurchaseOrderInformation entity 37898.

The Party package 37828A includes a BuyerParty entity 37830A, a SellerParty entity 37884A, a ProductRecipientParty entity 37890A, a VendorParty entity 37896A, a ManufacturerParty entity 37802B, a BillToParty entity 37808B, a PayerParty entity 37814B, a CarrierParty entity 37820B, and a ShipToLocation entity 37826B at the third level 37806.

The BuyerParty entity 37830A has a data type name “BusinessTransactionDocumentParty” 37834A. There is one 37832A BuyerParty entity 37830A for each Party package 37828A. The BuyerParty entity 37830A includes a StandardID entity 37836A, a BuyerID entity 37842A, a SellerID entity 37848A, an Address entity 37854A, and a ContactPerson entity 37860A at the fourth level 37808. The StandardID entity 37836A has a data type name “PartyStandardID” 37840A. There is any number of 37838A StandardID entity 37836A for a BuyerParty entity 37830A. The BuyerID entity 37842A has a data type name “PartyPartyID” 37846A. There is zero or one 37844A BuyerID entity 37842A for a BuyerParty entity 37830A. The SellerID entity 37848A has a data type name “PartyPartyID” 37852A. There is zero or one 37850A SellerID entity 37848A for a BuyerParty entity 37830A. The Address entity 37854A has a data type name “Address” 37858A. There is zero or one 37856A Address entity 37854A for a BuyerParty entity 37830A.

The ContactPerson entity 37860A has a data type name “ContactPerson” 37864A. There is zero or one 37862A ContactPerson entity 37860A for a BuyerParty entity 37830A. The ContactPerson entity 37860A includes a BuyerID entity 37866A, a SellerID entity 37872A, and an Address entity 37878A at the fifth level 37810. The BuyerID entity 37866A has a data type name “ContactPersonPartyID” 37870A. There is zero or one 37868A BuyerID entity 37866A for a ContactPerson entity 37860A. The SellerID entity 37872A has a data type name “ContactPersonPartyID” 37876A. There is zero or one 37874A SellerID entity 37872A for a ContactPerson entity 37860A. The Address entity 37878A has a data type name “Address” 37882A. There is zero or one 37880A Address entity 37878A for a ContactPerson entity 37860A.

The SellerParty entity 37884A has a data type name “BusinessTransactionDocumentParty” 37888A. There is one 37886A SellerParty entity 37884A for each Party package 37828A. The ProductRecipientParty entity 37890A has a data type name “BusinessTransactionDocumentParty” 37894A. There is zero or one 37892A ProductRecipientParty entity 37890A for each Party package 37828A. The VendorParty entity 37896A has a data type name “BusinessTransactionDocumentParty” 37800B. There is zero or one 37898A VendorParty entity 37896A for each Party package 37828A. The ManufacturerParty entity 37802B has a data type name “BusinessTransactionDocumentParty” 37806B. There is zero or one 37804B ManufacturerParty entity 37802B for each Party package 37828A. The BillToParty entity 37808B has a data type name “BusinessTransactionDocumentParty” 37812B. There is zero or one 37810B BillToParty entity 37808B for each Party package 37828A. The PayerParty entity 37814B has a data type name “BusinessTransactionDocumentParty” 37818B. There is zero or one 37816B PayerParty entity 37814B for each Party package 37828A. The CarrierParty entity 37820B has a data type name “BusinessTransactionDocumentParty” 37824B. There is zero or one 37822B CarrierParty entity 37820B for each Party package 37828A.

The ShipToLocation entity 37826B has a data type name “BusinessTransactionDocumentLocation” 37830B. There is zero or one 37828B ShipToLocation entity 37826B for each Party package 37828A. The ShipToLocation entity 37826B includes a StandardID entity 37832B, a BuyerID entity 37838B, a SellerID entity 37844B, and an Address entity 37850B at the fourth level 37808. The StandardID entity 37832B has a data type name “LocationStandardID” 37836B. There is any number of 37834B StandardID entity 37832B for a ShipToLocation entity 37826B. The BuyerID entity 37838B has a data type name “LocationPartyID” 37842B. There is zero or one 37840B BuyerID entity 37838B for a ShipToLocation entity 37826B. The SellerID entity 37844B has a data type name “LocationPartyID” 37848B. There is zero or one 37846B SellerID entity 37844B for a ShipToLocation entity 37826B. The Address entity 37850B has a data type name “Address” 37854B. There is zero or one 37852B Address entity 37850B for a ShipToLocation entity 37826B.

The Location Package 37856B includes a ShipFromLocation entity 37858B at the third level 37806. The ShipFromLocation entity 37858B has a data type name “BusinessTransactionDocumentLocation” 37862B. There is zero or one 37860B ShipFromLocation entity 37858B for each Location Package 37856B.

The DeliveryInformation package 37864B includes a DeliveryTerms entity 37866B at the third level 37806. The DeliveryTerms entity 37866B has a data type name “DeliveryTerms” 37870B. There is zero or one 37868B DeliveryTerms entity 37866B for each DeliveryInformation package 37864B. The DeliveryTerms entity 37866B includes a DeliveryItemGroupID entity 37872B, a DeliveryPriorityCode entity 37878B, an Incoterms entity 37884B, a PartialDelivery entity 37890B, a QuantityTolerance entity 37896B, a Transport entity 37802C, and a Description entity 37824C at the fourth level 37808.

The DeliveryItemGroupID entity 37872B has a data type name "BusinessTransactionDocumentItemGroupID" 37876B. There is zero or one 37874B DeliveryItemGroupID entity 37872B for a DeliveryTerms entity 37866B. The DeliveryPriorityCode entity 37878B has a data type name "BusinessTransactionPriorityCode" 37882B. There is zero or one 37880B DeliveryPriorityCode entity 37878B for a DeliveryTerms entity 37866B. The Incoterms entity 37884B has a data type name "Incoterms" 37888B. There is zero or one 37886B Incoterms entity 37884B for a DeliveryTerms entity 37866B. The PartialDelivery entity 37890B has a data type name "PartialDelivery" 37894B. There is zero or one 37892B PartialDelivery entity 37890B for a DeliveryTerms entity 37866B. The QuantityTolerance entity 37896B has a data type name "QuantityTolerance" 37800C. There is zero or one 37898B QuantityTolerance entity 37896B for a DeliveryTerms entity 37866B.

The Transport entity 37802C includes a ServiceLevelCode entity 37806C, a ModeCode entity 37812C, and a MeansDescriptionCode entity 37818C at the fifth level 37810. There is zero or one 37804C Transport entity 37802C for a DeliveryTerms entity 37866B. The ServiceLevelCode entity 37806C has a data type name "TransportServiceLevelCode" 37810C. There is zero or one 37808C ServiceLevelCode entity 37806C for a Transport entity 37802C. The ModeCode entity 37812C has a data type name "TransportModeCode" 37816C. There is zero or one 37814C ModeCode entity 37812C for a Transport entity 37802C. The MeansDescriptionCode entity 37818C has a data type name "TransportMeansDescriptionCode" 37822C. There is zero or one 37820C MeansDescriptionCode entity 37818C for a Transport entity 37802C.

The Description entity 37824C has a data type name "Description" 37828C. There is zero or one 37826C Description entity 37824C for a DeliveryTerms entity 37866B.

The PaymentInformation package 37830C includes a CashDiscountTerms entity 37832C and a PaymentForm entity 37860C at the third level 37806. The CashDiscountTerms entity 37832C has a data type name "CashDiscountTerms" 37836C. There is zero or one 37834C CashDiscountTerms entity 37832C for each PaymentInformation package 37830C. The CashDiscountTerms entity 37832C includes a PaymentBaselineDate entity 37838C, a MaximumCashDiscount entity 37844C, a NormalCashDiscount entity 37850C, and a FullPaymentDueDaysValue entity 37856C at the fourth level 37808. The PaymentBaselineDate entity 37838C has a data type name "Date" 37842C. There is zero or one 37840C PaymentBaselineDate entity 37838C for a CashDiscountTerms entity 37832C. The MaximumCashDiscount entity 37844C has a data type name "CashDiscount" 37848C. There is zero or one 37846C MaximumCashDiscount entity 37844C for a CashDiscountTerms entity 37832C. The NormalCashDiscount entity 37850C has a data type name "CashDiscount" 37854C. There is zero or one 37852C NormalCashDiscount entity 37850C for a CashDiscountTerms entity 37832C. There is zero or one 37858C FullPaymentDueDaysValue entity 37856C for a CashDiscountTerms entity 37832C.

The PaymentForm entity 37860C includes a Code entity 37864C and a PaymentCard entity 37870C at the fourth level 37808. There is zero or one 37862C PaymentForm entity 37860C for each PaymentInformation package 37830C. The Code entity 37864C has a data type name "PaymentFormCode" 37868C. There is one 37866C Code entity 37864C for a PaymentForm entity 37860C. The PaymentCard entity 37870C has a data type name "PaymentCard" 37874C. There is zero or one 37872C PaymentCard entity 37870C for a PaymentForm entity 37860C.

The Attachment package 37876C includes an AttachmentWebAddress entity 37878C and an InternalAttachmentWebAddress entity 37884C in the third level 37806. The AttachmentWebAddress entity 37878C has a data type name "AttachmentWebAddress" 37882C. There is any number of 37880C AttachmentWebAddress entity 37878C for each Attachment package 37876C. The InternalAttachmentWebAddress entity 37884C has a data type name "AttachmentWebAddress" 37888C. There is any number of 37886C InternalAttachmentWebAddress entity 37884C for each Attachment package 37876C.

The Description package 37890C includes a Description entity 37892C and an InternalDescription entity 37898C at the third level 37806. The Description entity 37892C has a data type name "Description" 37896C. There is zero or one 37894C Description entity 37892C for each Description package 37890C. The InternalDescription entity 37898C has a data type name "Description" 37802D. There is zero or one 37800D InternalDescription entity 37898C for each Description package 37890C.

The FollowUpMessage package 37804D includes a FollowUpPurchaseOrderConfirmation entity 37806D, a FollowUpDespatchedDeliveryNotification entity 37816D, a FollowUpServiceAcknowledgementRequest entity 37826D, and a FollowUpInvoiceRequest entity 37836D at the third level 37806. The FollowUpPurchaseOrderConfirmation entity 37806D includes a RequirementCode entity 37810D at the fourth level 37808. There is zero or one 37808D FollowUpPurchaseOrderConfirmation entity 37806D for each FollowUpMessage package 37804D. The RequirementCode entity 37810D has a data type name "FollowUpMessageRequirementCode" 37814D. There is one 37812D RequirementCode entity 37810D for a FollowUpPurchaseOrderConfirmation entity 37806D.

The FollowUpDespatchedDeliveryNotification entity 37816D includes a RequirementCode entity 37820D at the fourth level 37808. There is zero or one 37818D FollowUpDespatchedDeliveryNotification entity 37816D for each FollowUpMessage package 37804D. The RequirementCode entity 37820D has a data type name "FollowUpMessageRequirementCode" 37824D. There is one 37822D RequirementCode entity 37820D for a FollowUpDespatchedDeliveryNotification entity 37816D.

The FollowUpServiceAcknowledgementRequest entity 37826D includes a RequirementCode entity 37830D at the fourth level 37808. There is zero or one 37828D FollowUpServiceAcknowledgementRequest entity 37826D for each FollowUpMessage package 37804D. The RequirementCode entity 37830D has a data type name "FollowUpMessageRequirementCode" 37834D. There is one 37832D RequirementCode entity 37830D for a FollowUpServiceAcknowledgementRequest entity 37826D.

The FollowUpInvoiceRequest entity 37836D includes a RequirementCode entity 37840D and an EvaluatedReceiptSettlementIndicator 37846D at the fourth level 37808. There is zero or one 37838D FollowUpInvoiceRequest entity 37836D for each FollowUpMessage package 37804D. The RequirementCode entity 37840D has a data type name "FollowUpMessageRequirementCode" 37844D. There is one 37842D RequirementCode entity 37840D for a FollowUpInvoiceRequest entity 37836D.

The EvaluatedReceiptSettlementIndicator 37846D has a data type name "EvaluatedReceiptSettlementIndicator"

37850D. There is zero or one 37848D EvaluatedReceiptSettlementIndicator 37846D for a FollowUpInvoiceRequest entity 37836D.

The Item package 37852D includes an Item entity 37854D at the third level 37806, a ProductInformation package 37888D, a PriceInformation package 37856E, a Party package 37884E, a Location package 37834F, a DeliveryInformation package 37848F, a BusinessTransactionDocumentReference package 37856F, an Attachment package 37848G, a Description package 37862G, and a ScheduleLine package 37876G. The Item entity 37854D has a data type name "PurchaseOrderInformationItem" 37858D. There is any number of 37856D Item entity 37854D for each Item package 37852D. The Item entity 37854D includes an ID entity 37860D, a ConfirmedInformationOutdatedIndicator entity 37866D, and a HierarchyRelationship entity 37872D at the fourth level 37808. The ID entity 37860D has a data type name "BusinessTransactionDocumentItemID" 37864D. There is one 37862D ID entity 37860D for an Item entity 37854D. The ConfirmedInformationOutdatedIndicator entity 37866D has a data type name "InformationOutdatedIndicator" 37870D. There is zero or one 37868D ConfirmedInformationOutdatedIndicator entity 37866D for an Item entity 37854D.

The HierarchyRelationship entity 37872D includes a ParentItemID entity 37876D and a TypeCode entity 37882D at the fifth level 37810. There is zero or one 37874D HierarchyRelationship entity 37872D for an Item entity 37854D. The ParentItemID entity 37876D has a data type name "BusinessTransactionDocumentItemID" 37880D. There is one 37878D ParentItemID entity 37876D for a HierarchyRelationship entity 37872D. The TypeCode entity 37882D has a data type name "BusinessTransactionDocumentItemHierarchyRelationshipTypeCode" 37886D. There is one 37884D TypeCode entity 37882D for a HierarchyRelationship entity 37872D.

The ProductInformation package 37888D includes a Product entity 37890D and a ProductCategory entity 37832E at the fourth level 37808. The Product entity 37890D has a data type name "BusinessTransactionDocumentProduct" 37894D. There is zero or one 37892D Product entity 37890D for each ProductInformation package 37888D. The Product entity 37890D includes a StandardID entity 37896D, a BuyerID entity 37802E, a SellerID entity 37808E, a ManufacturerID entity 37814E, a TypeCode entity 37820E, and a Note entity 37826E at the fifth level 37810.

The StandardID entity 37896D has a data type name "ProductStandardID" 37800E. There is any number of 37898D StandardID entity 37896D for a Product entity 37890D. The BuyerID entity 37802E has a data type name "ProductPartyID" 37806E. There is zero or one 37804E BuyerID entity 37802E for a Product entity 37890D. The SellerID entity 37808E has a data type name "ProductPartyID" 37812E. There is zero or one 37810E SellerID entity 37808E for a Product entity 37890D. The ManufacturerID entity 37814E has a data type name "ProductPartyID" 37818E. There is zero or one 37816E ManufacturerID entity 37814E for a Product entity 37890D. The TypeCode entity 37820E has a data type name "ProductTypeCode" 37824E. There is zero or one 37822E TypeCode entity 37820E for a Product entity 37890D. The Note entity 37826E has a data type name "Note" 37830E. There is zero or one 37828E Note entity 37826E for a Product entity 37890D.

The ProductCategory entity 37832E has a data type name "BusinessTransactionDocumentProductCategory" 37836E. There is zero or one 37834E ProductCategory entity 37832E for each ProductInformation package 37888D. The ProductCategory entity 37832E includes a StandardID entity 37838E, a BuyerID entity 37844E, and a SellerID entity 37850E at the fifth level 37810. The StandardID entity 37838E has a data type name "ProductCategoryStandardID" 37842E. There is any number of 37840E StandardID entity 37838E for a ProductCategory entity 37832E. The BuyerID entity 37844E has a data type name "ProductCategoryPartyID" 37848E. There is zero or one 37846E BuyerID entity 37844E for a ProductCategory entity 37832E. The SellerID entity 37850E has a data type name "ProductCategoryPartyID" 37854E. There is zero or one 37852E SellerID entity 37850E for a ProductCategory entity 37832E.

The PriceInformation package 37856E includes a Price entity 37858E, a ConfirmedPrice entity 37868E, and a ProcurementCostUpperLimit entity 37878E at the fourth level 37808. The Price entity 37858E includes a NetUnitPrice entity 37862E at the fifth level 37810. There is zero or one 37860E Price entity 37858E for each PriceInformation package 37856E. The NetUnitPrice entity 37862E has a data type name "Price" 37866E. There is zero or one 37864E NetUnitPrice entity 37862E for a Price entity 37858E.

The ConfirmedPrice entity 37868E includes a NetUnitPrice entity 37872E at the fifth level 37810. There is zero or one 37870E Price entity 37858E for each PriceInformation package 37856E. The NetUnitPrice entity 37872E has a data type name "Price" 37876E. There is zero or one 37874E NetUnitPrice entity 37862E for a Price entity 37858E.

The ProcurementCostUpperLimit entity 37878E has a data type name "ProcurementCostUpperLimit" 37882E. There is zero or one 37880E ProcurementCostUpperLimit entity 37878E for each PriceInformation package 37856E.

The Party package 37884E includes a BuyerParty entity 37886E, a SellerParty entity 37892E, a ProductRecipientParty entity 37898E, a VendorParty entity 37804F, a ManufacturerParty entity 37810F, a BillToParty entity 37816F, a PayerParty entity 37822F, and a CarrierParty entity 37828F at the fourth level 37808. The BuyerParty entity 37886E has a data type name "BusinessTransactionDocumentParty" 37890E. There is zero or one 37888E BuyerParty entity 37886E for each Party package 37884E. The SellerParty entity 37892E has a data type name "BusinessTransactionDocumentParty" 37896E. There is zero or one 37894E SellerParty entity 37892E for each Party package 37884E. The ProductRecipientParty entity 37898E has a data type name "BusinessTransactionDocumentParty" 37802F. There is zero or one 37800F ProductRecipientParty entity 37898E for each Party package 37884E. The VendorParty entity 37804F has a data type name "BusinessTransactionDocumentParty" 37808F. There is zero or one 37806F VendorParty entity 37804F for each Party package 37884E. The ManufacturerParty entity 37810F has a data type name "BusinessTransactionDocumentParty" 37814F. There is zero or one 37812F ManufacturerParty entity 37810F for each Party package 37884E. The BillToParty entity 37816F has a data type name "BusinessTransactionDocumentParty" 37820F. There is zero or one 37818F BillToParty entity 37816F for each Party package 37884E. The PayerParty entity 37822F has a data type name "BusinessTransactionDocumentParty" 37826F. There is zero or one 37824F PayerParty entity 37822F for each Party package 37884E. The CarrierParty entity 37828F has a data type name "BusinessTransactionDocumentParty" 37832F. There is zero or one 37830F CarrierParty 37828F for each Party package 37884E.

The Location package 37834F includes a ShipToLocation entity 37836F and a ShipFromLocation entity 37842F at the fourth level 37808. The ShipToLocation entity 37836F has a data type name "BusinessTransactionDocumentLocation"

37840F. There is zero or one 37838F ShipToLocation entity 37836F for each Location package 37834F. The ShipFromLocation entity 37842F has a data type name "BusinessTransactionDocumentLocation" 37846F. There is zero or one 37844F ShipFromLocation entity 37842F for each Location package 37834F.

The DeliveryInformation package 37848F includes a DeliveryTerms entity 37850F at the fourth level 37808. The DeliveryTerms entity 37850F has a data type name "DeliveryTerms" 37854F. There is zero or one 37852F DeliveryTerms entity 37850F for each DeliveryInformation package 37848F.

The BusinessTransactionDocumentReference package 37856F includes a QuoteReference entity 37858F, a PurchaseContractReference entity 37876F, an OriginPurchaseOrderReference entity 37894F, a BuyerProductCatalogReference entity 37812G, and a SellerProductCatalogReference entity 37830G at the fourth level 37808. The QuoteReference entity 37858F has a data type name "BusinessTransactionDocumentReference" 37862F. There is zero or one 37860F QuoteReference entity 37858F for each BusinessTransactionDocumentReference package 37856F. The QuoteReference entity 37858F includes an ID entity 37864F and an ItemID entity 37870F at the fifth level 37810. The ID entity 37864F has a data type name "BusinessTransactionDocumentID" 37868F. There one 37866F ID entity 37864F for a QuoteReference entity 37858F. The ItemID entity 37870F has a data type name "BusinessTransactionDocumentItemID" 37874F. There is any number of 37872F ItemID entity 37870F for a QuoteReference entity 37858F.

The PurchaseContractReference entity 37876F has a data type name "BusinessTransactionDocumentReference" 37880F. There is any number of 37878F PurchaseContractReference entity 37876F for each BusinessTransactionDocumentReference package 37856F. The PurchaseContractReference entity 37876F includes an ID entity 37882F and an ItemID entity 37888F at the fifth level 37810. The ID entity 37882F has a data type name "BusinessTransactionDocumentID" 37886F. There one 37884F ID entity 37882F for a PurchaseContractReference entity 37876F. The ItemID entity 37888F has a data type name "BusinessTransactionDocumentItemID" 37892F. There is any number of 37890F ItemID entity 37888F for a PurchaseContractReference entity 37876F.

The OriginPurchaseOrderReference entity 37894F has a data type name "BusinessTransactionDocumentReference" 37898F. There is zero or one 37896F OriginPurchaseOrderReference entity 37894F for each BusinessTransactionDocumentReference package 37856F. The OriginPurchaseOrderReference entity 37894F includes an ID entity 37800G and an ItemID entity 37806G at the fifth level 37810. The ID entity 37800G has a data type name "BusinessTransactionDocumentID" 37804G. There one 37802G ID entity 37800G for an OriginPurchaseOrderReference entity 37894F. The ItemID entity 37806G has a data type name "BusinessTransactionDocumentItemID" 37810G. There is any number of 37808G ItemID entity 37806G for an OriginPurchaseOrderReference entity 37894F.

The BuyerProductCatalogReference entity 37812G has a data type name "CatalogReference" 37816G. There is zero or one 37814G BuyerProductCatalogReference entity 37812G for each BusinessTransactionDocumentReference package 37856F. The BuyerProductCatalogReference entity 37812G includes an ID entity 37818G and an ItemID entity 37824G at the fifth level 37810. The ID entity 37818G has a data type name "CatalogID" 37822G. There one 37820G ID entity 37818G for a BuyerProductCatalogReference entity 37812G. The ItemID entity 37824G has a data type name "CatalogItemID" 37828G. There is any number of 37826G ItemID entity 37824G for a BuyerProductCatalogReference entity 37812G.

The SellerProductCatalogReference entity 37830G has a data type name "CatalogReference" 37834G. There is zero or one 37832G SellerProductCatalogReference entity 37830G for each BusinessTransactionDocumentReference package 37856F. The SellerProductCatalogReference entity 37830G includes an ID entity 37836G and an ItemID entity 37842G at the fifth level 37810. The ID entity 37836G has a data type name "CatalogID" 37840G. There one 37838G ID entity 37836G for a SellerProductCatalogReference entity 37830G. The ItemID entity 37842G has a data type name "CatalogItemID" 37846G. There is any number of 37844G ItemID entity 37842G for a SellerProductCatalogReference entity 37830G.

The Attachment package 37848G includes an AttachmentWebAddress entity 37850G and an InternalAttachmentWebAddress entity 37856G at the fourth level 37808. The AttachmentWebAddress entity 37850G has a data type name "WebAddress" 37854G. There is any number of 37852G AttachmentWebAddress entity 37850G for each Attachment package 37848G. The InternalAttachmentWebAddress entity 37856G has a data type name "WebAddress" 37860G. There is any number of 37858G InternalAttachmentWebAddress entity 37856G for each Attachment package 37848G.

The Description package 37862G includes a Description entity 37864G and an InternalDescription entity 37870G at the fourth level 37808. The Description entity 37864G has a data type name "Description" 37868G. There is zero or one 37866G Description entity 37864G for each Description package 37862G.

The InternalDescription entity 37870G has a data type name "InternalDescription" 37874G. There is zero or one 37872G InternalDescription entity 37870G for each Description package 37862G.

The ScheduleLine package 37876G includes a ScheduleLine entity 37878G and a ConfirmedScheduleLine entity 37802H at the fourth level 37808. The ScheduleLine entity 37878G has a data type name "PurchaseOrderInformationItemScheduleLine" 37882G. There is any number of 37880G ScheduleLine entity 37878G for each ScheduleLine package 37876G. The ScheduleLine entity 37878G includes an ID entity 37884G, a DeliveryPeriod entity 37890G, and a Quantity entity 37896G at the fifth level 37810. The ID entity 37884G has a data type name "BusinessTransactionDocumentItemScheduleLineID" 37888G. There is zero or one 37886G ID entity 37884G for a ScheduleLine entity 37878G. The DeliveryPeriod entity 37890G has a data type name "DateTimePeriod" 37894G. There is one 37892G DeliveryPeriod entity 37890G for a ScheduleLine entity 37878G. The Quantity entity 37896G has a data type name "Quantity" 37800H. There is zero or one 37898G Quantity entity 37896G for a ScheduleLine entity 37878G.

The ConfirmedScheduleLine entity 37802H has a data type name "PurchaseOrderInformationItemScheduleLine" 37806H. There is any number of 37804H ConfirmedScheduleLine entity 37802H for each ScheduleLine package 37876G.

(5) Message Data Type Purchase Order Legal Document Message

The message data type PurchaseOrderLegalDocumentMessage contains: the object PurchaseOrder contained in the business document in the view required for PurchaseOrderLegalDocument and the business information that is relevant for the sending of a business document in a message. The PurchaseOrderLegalDocument Message package contains a MessageHeader package and a PurchaseOrder package (see above). The message data type PurchaseOrderLegalDocumentMessage can provide the structure for the message type PurchaseOrderLegalDocument and the interfaces that are based on it.

(a) MessageHeader Package

A message header package groups business information from the perspective of the sending application. In variations, this package is not necessary, so, the package is empty or not included.

(b) PurchaseOrder Package

The PurchaseOrderPackage for the PurchaseOrderLegalDocument message is similar the PurchaseOrder package for the PurchaseOrderInformationMessage, described above. Differences between the message types can include that the InternalAttachmentWebAddress of a PurchaseOrderAttachment Package, InternalAttachmentWebAddress of a PurchaseOrderItemAttachment Package, and the InternalDescription of the PurchaseOrderDescription Package are not included in the PurchaseOrderLegalDocument message. This can be due to those entities not being intended for transmission to Document Management.

(6) Message Data Type Element Structure

The message data type element structure for the Purchase Order Legal Document message is depicted in FIG. 378AA-R. The element structure is similar to the data model, but provides additional information regarding the details of the interface. The element structure identifies the different packages 378A00 in the interface, and represents the entities at various levels within the interface. As depicted in FIG. 378AA, the interface for PurchaseOrderLegalDocumentMessage includes five levels 378A02, 378A04, 378A06, 378A08, and 378A10. The outermost package of this interface is a PurchaseOrderLegalDocumentMessage package 378A16, which includes a PurchaseOrderLegalDocumentMessage entity 378A18 at the first level 378A02. The PurchaseOrderLegalDocumentMessage entity 378A18 is of a type MDT 378A20 "PurchaseOrderLegalDocumentMessage" 378A22.

The PurchaseOrderLegalDocumentMessage package 378A16 includes a PurchaseOrderLegalDocument package 378A24. The PurchaseOrderLegalDocument package 378A24 includes a PurchaseOrder entity 378A26 at the second level 378A04, a Party package 378A56, a Location package 378A44A, a DeliveryInformation package 378A58A, a PaymentInformation package 378A26B, an Attachment package 378A72B, a Description package 378A92B, a FollowUpMessage package 378A08C, and an Item package 378A56C.

The PurchaseOrder entity 378A26 has a data type name "PurchaseOrderInformation" 378A30. There is one 378A28 PurchaseOrder entity 378A26 for each PurchaseOrderLegalDocument package 378A24. The PurchaseOrder entity 378A26 includes an ID entity 378A32, a PostingDateTime entity 378A38, a LastChangeDateTime entity 378A44, and a Note entity 378A50 at the third level 378A06. The ID entity 378A32 has a data type name "BusinessTransactionDocumentID" 378A36. There is one 378A34 ID entity 378A32 for a PurchaseOrder entity 378A26. The PostingDateTime entity 378A38 has a data type name "DateTime" 378A42. There is zero or one 378A40 PostingDateTime entity 378A38 for a PurchaseOrder entity 378A26. The LastChangeDateTime entity 378A44 has a data type name "DateTime" 378A48. There is zero or one 378A46 LastChangeDateTime entity 378A44 for a PurchaseOrder entity 378A26. The Note entity 378A50 has a data type name "Note" 378A54. There is zero or one 378A52 Note entity 378A50 for a PurchaseOrder entity 378A26.

The Party package 378A56 includes a BuyerParty entity 378A58, a SellerParty entity 378A02A, a ProductRecipientParty entity 378A08A, a VendorParty entity 378A14A, a ManufacturerParty entity 378A20A, a BillToParty entity 378A26A, a PayerParty entity 378A32A, and a CarrierParty entity CC38A at the third level 378A06.

The BuyerParty entity 378A58 has a data type name "BusinessTransactionDocumentParty" 378A62. There is zero or one 378A60 BuyerParty entity 378A58 for each Party package 378A56. The BuyerParty entity 378A58 includes an InternalID entity 378A64, a StandardID entity 378A70, an Address entity 378A76, and a ContactPerson entity 378A82 at the fourth level 378A08. The InternalID entity 378A64 has a data type name "PartyInternalID" 378A68. There is zero or one 378A66 InternalID entity 378A64 for a BuyerParty entity 378A58. The StandardID entity 378A70 has a data type name "PartyStandardID" 378A74. There is any number of 378A72 StandardID entity 378A70 for a BuyerParty entity 378A58. The Address entity 378A76 has a data type name "Address" 378A80. There is zero or one 378A78 Address entity 378A76 for a BuyerParty entity 378A58.

The ContactPerson entity 378A82 has a data type name "ContactPerson" 378A86. There is zero or one 378A84 ContactPerson entity 378A82 for a BuyerParty entity 378A58. The ContactPerson entity 378A82 includes an InternalID entity 378A88 and an Address entity 378A94 at the fifth level 378A10. The InternalID entity 378A88 has a data type name "ContactPersonID" 378A92. There is zero or one 378A90 InternalID entity 378A88 for a ContactPerson entity 378A82. The Address entity 378A94 has a data type name "Address" 378A98. There is zero or one 378A96 Address entity 378A94 for a ContactPerson entity 378A82.

The SellerParty entity 378A02A has a data type name "BusinessTransactionDocumentParty" 378A06A. There is zero or one 378A04A SellerParty entity 378A02A for each Party package 378A56. The ProductRecipientParty entity 378A08A has a data type name "BusinessTransactionDocumentParty" 378A12A. There is zero or one 378A10A ProductRecipientParty entity 378A08A for each Party package 378A56. The VendorParty entity 378A14A has a data type name "BusinessTransactionDocumentParty" 378A18A. There is zero or one 378A16A VendorParty entity 378A14A for each Party package 378A56. The ManufacturerParty entity 378A20A has a data type name "BusinessTransactionDocumentParty" 378A24A. There is zero or one 378A22A ManufacturerParty entity 378A20A for each Party package 378A56. The BillToParty entity 378A26A has a data type name "BusinessTransactionDocumentParty" 378A30A. There is zero or one 378A28A BillToParty entity 378A26A for each Party package 378A56. The PayerParty entity 378A32A has a data type name "BusinessTransactionDocumentParty" 378A36A. There is zero or one 378A34A PayerParty entity 378A32A for each Party package 378A56. The CarrierParty entity CC38A has a data type name "BusinessTransactionDocumentParty" 378A42A. There is zero or one 378A40A CarrierParty entity CC38A for each Party package 378A56.

The Location package 378A44A includes a ShipToLocation entity 378A46A and a ShipFromLocation entity 378A52A at the third level 378A06. The ShipToLocation entity 378A46A has a data type name "BusinessTransactionDocumentShipToLocation" 378A50A. There is zero or one 378A48A ShipToLocation entity 378A46A for each Location package 378A44A. The ShipFromLocation entity

378A52A has a data type name "BusinessTransactionDocumentShipFromLocation" 378A56A. There is zero or one 378A54A ShipFromLocation entity 378A52A for each Location package 378A44A.

The DeliveryInformation package 378A58A includes a DeliveryTerms entity 378A60A at the third level 378A06. The DeliveryTerms entity 378A60A has a data type name "DeliveryTerms" 378A64A. There is zero or one 378A62A DeliveryTerms entity 378A60A for each DeliveryInformation package 378A58A. The DeliveryTerms entity 378A60A includes a DeliveryItemGroupID entity 378A66A, a DeliveryPriorityCode entity 378A72A, an Incoterms entity 378A78A, a PartialDelivery entity 378A84A, a QuantityTolerance entity 378A90A, a Transport entity 378A96A, and a Description entity 378A20B at the fourth level 378A08. The DeliveryItemGroupID entity 378A66A has a data type name "BusinessTransactionDocumentItemGroupID" 378A70A. There is zero or one 378A68A DeliveryItemGroupID entity 378A66A for a DeliveryTerms entity 378A60A. The DeliveryPriorityCode entity 378A72A has a data type name "BusinessTransactionPriorityCode" 378A76A. There is zero or one 378A74A DeliveryPriorityCode entity 378A72A for a DeliveryTerms entity 378A60A. The Incoterms entity 378A78A has a data type name "Incoterms" 378A82A. There is zero or one 378A80A Incoterms entity 378A78A for a DeliveryTerms entity 378A60A. The PartialDelivery entity 378A84A has a data type name "PartialDelivery" 378A88A. There is zero or one 378A86A PartialDelivery entity 378A84A for a DeliveryTerms entity 378A60A. The QuantityTolerance entity 378A90A has a data type name "QuantityTolerance" 378A94A. There is zero or one 378A92A QuantityTolerance entity 378A90A for a DeliveryTerms entity 378A60A.

There is zero or one 378A98A Transport entity 378A96A for a DeliveryTerms entity 378A60A. The Transport entity 378A96A includes a ServiceLevelCode entity 378A02B, a ModeCode entity 378A08B, and a MeansDescriptionCode entity 378A14B at the fifth level 378A10. The ServiceLevelCode entity 378A02B has a data type name "TransportServiceLevelCode" 378A06B. There is zero or one 378A04B ServiceLevelCode entity 378A02B for a Transport entity 378A96A. The ModeCode entity 378A08B has a data type name "TransportModeCode" 378A12B. There is zero or one 378A10B ModeCode entity 378A08B for a Transport entity 378A96A. The MeansDescriptionCode entity 378A14B has a data type name "TransportMeansDescriptionCode" 378A18B. There is zero or one 378A16B MeansDescriptionCode entity 378A14B for a Transport entity 378A96A.

The Description entity 378A20B has a data type name "Description" 378A24B. There is zero or one 378A22B Description entity 378A20B for a DeliveryTerms entity 378A60A.

The PaymentInformation package 378A26B includes a CashDiscountTerms entity 378A28B and a PaymentForm entity 378A56B at the third level 378A06.

The CashDiscountTerms entity 378A28B has a data type name "CashDiscountTerms" 378A32B. There is zero or one 378A30B CashDiscountTerms entity 378A28B for each PaymentInformation package 378A26B. The CashDiscountTerms entity 378A28B includes a PaymentBaselineDate entity 378A34B, a MaximumCashDiscount entity 378A40B, a NormalCashDiscount entity 378A46B, and a FullPaymentDueDaysValue entity 378A52B at the fourth level 378A08. The PaymentBaselineDate entity 378A34B has a data type name "Date" 378A38B. There is zero or one 378A36B PaymentBaselineDate entity 378A34B for a CashDiscountTerms entity 378A28B. The MaximumCashDiscount entity 378A40B has a data type name "CashDiscount" 378A44B. There is zero or one 378A42B MaximumCashDiscount entity 378A40B for a CashDiscountTerms entity 378A28B. The NormalCashDiscount entity 378A46B has a data type name "CashDiscount" 378A50B. There is zero or one 378A48B NormalCashDiscount entity 378A46B for a CashDiscountTerms entity 378A28B. There is zero or one 378A54B FullPaymentDueDaysValue entity 378A52B for a CashDiscountTerms entity 378A28B.

The PaymentForm entity 378A56B includes a Code entity 378A60B and a PaymentCard entity 378A66B at the fourth level 378A08. There is zero or one 378A58B PaymentForm entity 378A56B for each PaymentInformation package 378A26B. The Code entity 378A60B has a data type name "PaymentFormCode" 378A64B. There is one 378A62B Code entity 378A60B for a PaymentForm entity 378A56B. The PaymentCard entity 378A66B has a data type name "PaymentCard" 378A70B. There is zero or one 378A68B PaymentCard entity 378A66B for a PaymentForm entity 378A56B.

The Attachment package 378A72B includes an AttachmentWebAddress entity 378A74B, an InternalAttachmentWebAddress entity 378A80B, and a LegalDocumentAttachment entity 378A86B at the third level 378A06. The AttachmentWebAddress entity 378A74B has a data type name "AttachmentWebAddress" 378A78B. There is any number of 378A76B AttachmentWebAddress entity 378A74B for each Attachment package 378A72B. The InternalAttachmentWebAddress entity 378A80B has a data type name "AttachmentWebAddress" 378A84B. There is any number of 378A82B InternalAttachmentWebAddress entity 378A80B for each Attachment package 378A72B. The LegalDocumentAttachment entity 378A86B has a data type name "Attachment" 378A90B. There is any number of 378A88B LegalDocumentAttachment entity 378A86B for each Attachment package 378A72B.

The Description package 378A92B includes a Description entity 378A94B and an InternalDescription entity 378A02C at the third level 378A06. The Description entity 378A94B has a data type name "Description" 378A98B. There is zero or one 378A96B Description entity 378A94B for each Description package 378A92B. The InternalDescription entity 378A02C has a data type name "Description" 378A06C. There is zero or one 378A04C InternalDescription entity 378A02C for each Description package 378A92B.

The FollowUpMessage package 378A08C includes a FollowUpPurchaseOrderConfirmation entity 378A10C, a FollowUpDespatchedDeliveryNotification entity 378A20C, a FollowUpServiceAcknowledgementRequest entity 378A30C, and a FollowUpInvoiceRequest entity 378A40C at the third level 378A06.

The FollowUpPurchaseOrderConfirmation entity 378A10C includes a RequirementCode entity 378A14C at the fourth level 378A08. There is zero or one 378A12C FollowUpPurchaseOrderConfirmation entity 378A10C for each FollowUpMessage package 378A08C. The RequirementCode entity 378A14C has a data type name "FollowUpMessageRequirementCode" 378A18C. There is one 378A16C RequirementCode entity 378A14C for a FollowUpPurchaseOrderConfirmation entity 378A10C.

The FollowUpDespatchedDeliveryNotification entity 378A20C includes a RequirementCode entity 378A24C at the fourth level 378A08. There is zero or one 378A22C FollowUpDespatchedDeliveryNotification entity 378A20C for each FollowUpMessage package 378A08C. The RequirementCode entity 378A24C has a data type name "FollowUpMessageRequirementCode" 378A28C. There is one 378A26C RequirementCode entity 378A24C for a FollowUpDespatchedDeliveryNotification entity 378A20C.

The FollowUpServiceAcknowledgementRequest entity 378A30C includes a RequirementCode entity 378A34C at the fourth level 378A08. There is zero or one 378A32C FollowUpServiceAcknowledgementRequest entity 378A30C for each FollowUpMessage package 378A08C. The RequirementCode entity 378A34C has a data type name "FollowUpMessageRequirementCode" 378A38C. There is one 378A36C RequirementCode entity 378A34C for a FollowUpServiceAcknowledgementRequest entity 378A30C.

The FollowUpInvoiceRequest entity 378A40C includes a RequirementCode entity 378A34C and an EvaluatedReceiptSettlementIndicator entity 378A50C at the fourth level 378A08. There is zero or one 378A42C FollowUpInvoiceRequest entity 378A40C for each FollowUpMessage package 378A08C. The RequirementCode entity 378A44C has a data type name "FollowUpMessageRequirementCode" 378A48C. There is one 378A46C RequirementCode entity 378A44C for a FollowUpInvoiceRequest entity 378A40C. The EvaluatedReceiptSettlementIndicator entity 378A50C has a data type name "EvaluatedReceiptSettlementIndicator" 378A54C. There is zero or one 378A52C EvaluatedReceiptSettlementIndicator entity 378A50C for a FollowUpInvoiceRequest entity 378A40C.

The Item package 378A56C includes an Item entity 378A58C at the third level 378A06, a ProductInformation package 378A86C, a PriceInformation package 378A44D, a Party package 378A72D, a Location package 378A24E, a DeliveryInformation package 378A38E, a BusinessDocumentObjectReference package 378A46E, an Attachment package 378A22F, a Description package 378A36F, and a ScheduleLine package 378A50F.

The Item entity 378A58C has a data type name "PurchaseOrderInformationItem" 378A62C. There is any number of 378A60C Item entity 378A58C for each Item package 378A56C. The Item entity 378A58C includes an ID entity 378A64C, a HierarchyRelationship entity 378A70C, a ParentItemID entity 378A74C, and a TypeCode entity 378A80C at the fourth level 378A08. The ID entity 378A64C has a data type name "BusinessTransactionDocumentItemID" 378A68C. There is one ID entity 378A64C for an Item entity 378A58C. There is zero or one 378A72C HierarchyRelationship entity 378A70C for an Item entity 378A58C. The ParentItemID entity 378A74C has a data type name "BusinessTransactionDocumentItemID" 378A78C. There is one 378A76C ParentItemID entity 378A74C for an Item entity 378A58C. The TypeCode entity 378A80C has a data type name "BusinessTransactionDocumentItemHierarchyRelationshipTypeCode" 378A84C. There is one 378A82C TypeCode entity 378A80C for an Item entity 378A58C.

The ProductInformation package 378A86C includes a Product entity 378A88C and a ProductCategory entity 378A26D at the fourth level 378A08.

The Product entity 378A88C has a data type name "BusinessTransactionDocumentProduct" 378A92C. There is zero or one 378A90C Product entity 378A88C for each ProductInformation package 378A86C. The Product entity 378A88C includes an InternalID entity 378A94C, a StandardID entity 378A02D, a ManufacturerID entity 378A08D, a TypeCode entity 378A14D, and a Note entity 378A20D at the fifth level 378A10. The InternalID entity 378A94C has a data type name "ProductInternalID" 378A98C. There is zero or one 378A96C InternalID entity 378A94C for a Product entity 378A88C. The StandardID entity 378A02D has a data type name "ProductStandardID" 378A06D. There is any number of 378A04D StandardID entity 378A02D for a Product entity 378A88C. The ManufacturerID entity 378A08D has a data type name "ProductPartyID" 378A12D. There is zero or one 378A10D ManufacturerID entity 378A08D for a Product entity 378A88C. The TypeCode entity 378A14D has a data type name "ProductTypeCode" 378A18D. There is zero or one 378A16D TypeCode entity 378A14D for a Product entity 378A88C. The Note entity 378A20D has a data type name "Note" 378A24D. There is zero or one 378A22D Note entity 378A20D for a Product entity 378A88C.

The ProductCategory entity 378A26D has a data type name "BusinessTransactionDocumentProductCategory" 378A30D. There is zero or one 378A28D ProductCategory entity 378A26D for each ProductInformation package 378A86C. The ProductCategory entity 378A26D includes an InternalID entity 378A32D and a StandardID entity 378A38D at the fifth level 378A10. The InternalID entity 378A32D has a data type name "ProductCategoryInternalID" 378A36D. There is zero or one 378A34D InternalID entity 378A32D for a ProductCategory entity 378A26D. The StandardID entity 378A38D has a data type name "ProductCategoryStandardID" 378A42D. There is any number of 378A40D StandardID entity 378A38D for a ProductCategory entity 378A26D.

The PriceInformation package 378A44D includes a Price entity 378A46D, a ConfirmedPrice entity 378A56D, and a ProcurementCostUpperLimit entity 378A66D at the fourth level 378A08. The Price entity 378A46D includes a NetUnitPrice entity 378A50D at the fifth level 378A10. There is zero or one 378A48D Price entity 378A46D for each PriceInformation package 378A44D. The NetUnitPrice entity 378A50D has a data type name "Price" 378A54D. There is zero or one 378A52D NetUnitPrice entity 378A50D for a Price entity 378A46D. The ConfirmedPrice entity 378A56D includes a NetUnitPrice entity 378A60D at the fifth level 378A10. There is zero or one 378A58D ConfirmedPrice entity 378A56D for each PriceInformation package 378A44D. The NetUnitPrice entity 378A60D has a data type name "Price" 378A64D. There is zero or one 378A62D NetUnitPrice entity 378A60D for a ConfirmedPrice entity 378A56D. The ProcurementCostUpperLimit entity 378A66D has a data type name "ProcurementCostUpperLimit" 378A70D. There is zero or one 378A68D ProcurementCostUpperLimit entity 378A66D for each PriceInformation package 378A44D.

The Party package 378A72D includes a BuyerParty entity 378A74D, a SellerParty entity 378A80D, a ProductRecipientParty entity 378A86D, a VendorParty entity 378A92D, a ManufacturerParty entity 378A98D, a BillToParty entity 378A06E, a PayerParty entity 378A12E, and a CarrierParty entity 378A18E at the fourth level 378A08. The BuyerParty entity 378A74D has a data type name "BusinessTransactionDocumentParty" 378A78D. There is zero or one 378A76D BuyerParty entity 378A74D for each Party package 378A72D. The SellerParty entity 378A80D has a data type name "BusinessTransactionDocumentParty" 378A84D. There is zero or one 378A82D SellerParty entity 378A80D for each Party package 378A72D. The ProductRecipientParty entity 378A86D has a data type name "BusinessTransactionDocumentParty" 378A90D. There is zero or one 378A88D ProductRecipientParty entity 378A86D for each Party package 378A72D. The VendorParty entity 378A92D has a data type name "BusinessTransactionDocumentParty" 378A96D. There is zero or one 378A94D VendorParty entity 378A92D for each Party package 378A72D. The ManufacturerParty entity 378A98D has a data type name "BusinessTransactionDocumentParty" 378A04E. There is zero or one 378A02E ManufacturerParty entity 378A98D for each Party package 378A72D. The BillToParty entity 378A06E has a data type name "BusinessTransactionDocumentParty" 378A10E. There is zero or one 378A08E BillToParty entity 378A06E for each Party package 378A72D. The PayerParty entity 378A12E has a data type name "BusinessTransactionDocumentParty" 378A16E. There is zero or one 378A14E PayerParty entity 378A12E for each Party package 378A72D. The CarrierParty entity 378A18E has a data type name "BusinessTransactionDocumentParty" 378A22E. There is zero or one 378A20E CarrierParty entity 378A18E for each Party package 378A72D.

The Location package 378A24E includes a ShipToLocation entity 378A26E and a ShipFromLocation entity 378A32E at the fourth level 378A08. The ShiptoLocation entity 378A26E has a data type name "BusinessTransactionDocumentShipToLocation" 378A30E. There is zero or one 378A28E ShiptoLocation entity 378A26E for each Location package 378A24E. The ShipFromLocation entity 378A32E has a data type name "BusinessTransactionDocumentShipFromLocation" 378A36E. There is zero or one 378A34E ShipFromLocation entity 378A32E for each Location package 378A24E.

The DeliveryInformation package 378A38E includes a DeliveryTerms entity 378A40E at the fourth level 378A08. The DeliveryTerms entity 378A40E has a data type name "DeliveryTerms" 378A44E. There is zero or one 378A42E DeliveryTerms entity 378A40E for each DeliveryInformation package 378A38E.

The BusinessDocumentObjectReference package 378A46E includes a QuoteReference entity 378A48E, a PurchaseContractReference entity 378A66E, an OriginPurchaseOrderReference entity 378A84E, and a BuyerProductCatalogueReference entity 378A04F at the fourth level 378A08. The QuoteReference entity 378A48E has a data type name "BusinessTransactionDocumentReference" 378A52E. There is zero or one 378A50E QuoteReference entity 378A48E for each BusinessDocumentObjectReference package 378A46E. The QuoteReference entity 378A48E includes an ID entity 378A54E and an ItemID entity 378A60E at the fifth level 378A10. The ID entity 378A54E has a data type name "BusinessTransactionDocumentID" 378A58E. There is one 378A56E ID entity 378A54E for a QuoteReference entity 378A48E. The ItemID entity 378A60E has a data type name "BusinessTransactionDocumentItemID" 378A64E. There is any number of 378A62E ItemID entity 378A60E for a QuoteReference entity 378A48E.

The PurchaseContractReference entity 378A66E has a data type name "BusinessTransactionDocumentReference" 378A70E. There is any number of 378A68E PurchaseContractReference entity 378A66E for each BusinessDocumentObjectReference package 378A46E. The PurchaseContractReference entity 378A66E includes an ID entity 378A72E and an ItemID entity 378A78E at the fifth level 378A10. The ID entity 378A72E has a data type name "BusinessTransactionDocumentID" 378A76E. There is one 378A74E ID entity 378A72E for a PurchaseContractReference entity 378A66E. The ItemID entity 378A78E has a data type name "BusinessTransactionDocumentItemID" 378A82E. There is any number of 378A80E ItemID entity 378A78E for a PurchaseContractReference entity 378A66E.

The OriginPurchaseOrderReference entity 378A84E has a data type name "BusinessTransactionDocumentReference" 378A88E. There is zero or one 378A86E OriginPurchaseOrderReference entity 378A84E for each BusinessDocumentObjectReference package 378A46E. The OriginPurchaseOrderReference entity 378A84E includes an ID entity 378A90E and an ItemID entity 378A96E at the fifth level 378A10. The ID entity 378A90E has a data type name "BusinessTransactionDocumentID" 378A94E. There is one 378A92E ID entity 378A90E for an OriginPurchaseOrderReference entity 378A84E. The ItemID entity 378A96E has a data type name "BusinessTransactionDocumentItemID" 378A02F. There is any number of 378A98E ItemID entity 378A96E for an OriginPurchaseOrderReference entity 378A84E.

The BuyerProductCatalogueReference entity 378A04F has a data type name "CatalogueReference" 378A08F. There is zero or one 378A06F BuyerProductCatalogueReference entity 378A04F for each BusinessDocumentObjectReference package 378A46E. The BuyerProductCatalogueReference entity 378A04F includes an ID entity 378A10F and an ItemID entity 378A16F at the fifth level 378A10. The ID entity 378A10F has a data type name "CatalogueID" 378A14F. There is one 378A12F ID entity 378A10F for a BuyerProductCatalogueReference entity 378A04F. The ItemID entity 378A16F has a data type name "CatalogueItemID" 378A20F. There is any number of 378A1 8F ItemID entity 378A16F for a BuyerProductCatalogueReference entity 378A04F.

The Attachment package 378A22F includes an AttachmentWebAddress entity 378A24F and an InternalAttachmentWebAddress entity 378A30F at the fourth level 378A08. The AttachmentWebAddress entity 378A24F has a data type name "AttachmentWebAddress" 378A28F. There is any number of 378A26F AttachmentWebAddress entity 378A24F for each Attachment package 378A22F. The InternalAttachmentWebAddress entity 378A30F has a data type name "AttachmentWebAddress" 378A34F. There is any number of 378A32F InternalAttachmentWebAddress entity 378A30F for each Attachment package 378A22F.

The Description package 378A36F includes a Description entity 378A38F and an InternalDescription entity 378A44F at the fourth level 378A08. The Description entity 378A38F has a data type name "Description" 378A42F. There is zero or one 378A40F Description entity 378A38F for each Description package 378A36F. The InternalDescription entity 378A44F has a data type name "Description" 378A48F. There is zero or one 378A46F InternalDescription entity 378A44F for each Description package 378A36F.

The ScheduleLine package 378A50F includes a ScheduleLine entity 378A52F and a ConfirmedScheduleLine entity 378A76F at the fourth level 378A08. The ScheduleLine entity 378A52F has a data type name "PurchaseOrderInformationItemScheduleLine" 378A56F. There is any number of 378A54F ScheduleLine entity 378A52F for each ScheduleLine package 378A50F. The ScheduleLine entity 378A52F includes an ID entity 378A58F, a DeliveryPeriod entity 378A64F, and a Quantity entity 378A70F at the fifth level 378A10. The ID entity 378A58F has a data type name "BusinessTransactionDucomentItemScheduleLineID" 378A62F. There is zero or one 378A60F ID entity 378A58F for a ScheduleLine entity 378A52F. The DeliveryPeriod entity 378A64F has a data type name "DateTimePeriod" 378A68F. There is one 378A66F DeliveryPeriod entity 378A64F for a ScheduleLine entity 378A52F. The Quantity entity 378A70F has a data type name "Quantity" 378A74F. There is zero or one 378A72F Quantity entity 378A70F for a ScheduleLine entity 378A52F. The ConfirmedScheduleLine entity 378A76F has a data type name "PurchaseOrderInformationItemScheduleLine" 378A80F. There is any number of 378A78F ConfirmedScheduleLine entity 378A76F for each ScheduleLine package 378A50F.

h) Tax Due Notification Interface

A TaxDueNotification interface is an interface that is used to transfer information about the tax that is due in a company to a tax register. The tax register collects the company's receivables and payables vis-a-vis the tax authorities (tax offices) responsible. Tax is declared and the process of paying taxes triggered from the tax register in accordance with legal time limits and requirements.

In the business scenarios SFS (Sale From Stock) and PTS (Procure To Stock), goods are sold to customers and goods are bought from suppliers. Depending on the country concerned, the outgoing invoices sent and incoming invoices received during this process identify the sales tax or similar tax that is transferred to the tax-register. From a tax perspective, credit memos are handled in the same way as invoices. Legal requirements may also stipulate how a discount taken by the payer is treated for tax purposes. In accordance with methods and systems consistent with the subject matter described herein, a correction for the outgoing or incoming payment may be transferred to the tax register.

(1) Message Type Tax Due Notification

Both the TaxDueNotification message and the TaxDueCancellationRequest are implemented or instantiated based on the message data type TaxDueMessage.

(2) Message Choreography

FIG. 378 depicts the message choreography for a TaxDueNotification interface. The choreography involves two business entities: a tax determination or calculation entity 37802 and a tax register entity 37804. The tax calculations entity 37802 and the tax register entity 37804 each may be a department of a company, a separate business entity engaged by the company, or tax authorities (tax offices) that determine and calculate a company's taxes.

In the implementation shown in FIG. 378, the tax calculation entity 37802 sends a "TaxDueNotification" message 37806 to the tax register entity 37804 to transfer the data relevant for tax reports and tax payments to the tax register 37804 of the company. The tax calculation entity 37802 may also send a "TaxDueCancellationRequest" message 37808 to the tax register entity 37804 to transfer cancellations of invoices, credit memos, and payments previously sent to the tax register 37804 as part of a TaxDueNotification message 37806.

(3) Message Data Type Tax Due Message

The data model for the message data type TaxDueMessage used to implement a TaxDueNotification message 37806 and a TaxDueCancellationRequest message 37808 is depicted in FIGS. 380. The message data type TaxDueMessage includes a TaxDueMessage package 38000. The TaxDueMessage package 38000 includes a MessageHeader package 38002, a TaxDue package 38004, and a TaxDueMessage object or entity 38006, which may be included in the business document and the business information that is relevant for sending a business document in a message.

(a) Message Header Package

A MessageHeader package 38002 groups the business information that is relevant for sending a business document in a message. The MessageHeader package 38002 is not required to implement the TaxDueNotification message 37806. In one implementation, an invoice or credit memo may be transferred via a TaxDueNotification message 37806 to the tax register 37804 once. In this implementation, a message ID in a Message Header is not required, since the reference can be established with the ID of the invoice or credit memo. In this implementation, the sender is known by the "System ID." Without a ReferenceID in the Message Header, the recipient of the TaxDueNotification message may not be identified within the associated Message Header. However, Invoice and Billing entities (e.g., Tax Calculation entities 37802) recognize that this message is to be sent to the Tax Register 37804.

(b) Tax Due Package

The TaxDue package 38004 includes the summary of the information from a business document that is required for reporting or paying tax due to the tax authorities. The TaxDue package 38004 includes a Party Package 38008, a Tax Package 38010, an Item Package 38012, and a TaxDue entity 38014. There is a 1:1 relationship 38016 between the TaxDueMessage entity 38006 and the TaxDue entity 38014.

(i) Tax Due

The TaxDue is the information from a business document that is required to report or pay due tax to the tax authorities. The TaxDue entity 38014 includes information about the business partners subject to tax, the tax events based to which the business partners are subject to tax/tax exempt, and about the type and amount of tax due.

As further described below, the TaxDue entity 38014 includes a BaseBusinessTransactionDocumentID, a BaseBusinessTransactionDocumentTypeCode, a BaseBusinessTransactionDocumentDate, and a ProductTaxEventTypeCode. The BaseBusinessTransactionDocumentID is the identifier for the base business document for the tax due date. The BaseBusinessTransactionDocumentID also may be used for auditing purposes, and is of type GDT: BusinessTransactionDocumentID. The BaseBusinessTransactionDocumentTypeCode identifies the type of base business document for the tax due date. Examples of such types of base business documents include incoming and outgoing invoices, incoming and outgoing credit memos, incoming and outgoing payments, and cancellations of the types specified. The BaseBusinessTransactionDocumentTypeCode is of type GDT: BusinessTransactionDocumentTypeCode. The BaseBusinessTransactionDocumentDate identifies the date of the base business document for the tax due date. The BaseBusinessTransactionDocumentDate depends on the type of business document. For example, if the business document is an incoming invoice or an outgoing invoice, the BaseBusinessTransactionDocumentDate is the invoice date. If the business document is an incoming credit memo or an outgoing credit memo, the BaseBusinessTransactionDocumentDate is the credit memo date. If the business document is an Incoming payment, the BaseBusinessTransactionDocumentDate is the date of the incoming payment. Finally, if the business document is an outgoing payment, the BaseBusinessTransactionDocumentDate is date of the outgoing payment. The BaseBusinessTransactionDocumentDate is of type GDT: Date. The ProductTaxEventTypeCode identifies the type of tax event that characterizes the circumstances of the purchase, sale, or consumption of a product. The ProductTaxEventTypeCode is based on country-specific tax laws, such as the German turnover tax law (UStG), and is of type GDT: ProductTaxEventTypeCode.

(ii) Party Package

The Party Package 38008 groups together the business partners that are subject to a tax or tax exemption because of their function in the tax event. The Party Package 38008 includes a BuyerParty entity 38018, a SellerParty entity 38020, a ProductRecipientParty entity 38022, a VendorParty entity 38024, a DebitorParty entity 38020, and a CreditorParty entity 38028. The partners that represent the service provider and the service recipient from a tax point of view may be specified. In an invoice, the SellerParty typically identifies the service provider and the BuyerParty typically identifies the service recipient. In a payment, the CreditorParty typically identifies the service provider, and the DebitorParty typically identifies the service recipient. The attributes required for a tax report may be derived from the information about the business partners included in the Party Package 38008. These attributes are the VAT registration numbers and similar tax-relevant identification numbers for the business partners.

(a) Buyer Party

The BuyerParty identifies a company or a person that purchases goods or services. The BuyerParty entity 38018 is of type GDT: BusinessTransactionDocumentParty. There is a 1:c relationship 38030 between the TaxDue entity 38014 and the BuyerParty entity 38018. If a BuyerParty entity 38018 is not specified in an invoice, the ProductRecipientParty entity 38022 may be considered to be the service recipient from a tax point of view and may therefore be specified.

(b) Seller Party

The SellerParty identifies a company or a person that sells goods or services. The SellerParty entity 38020 is of type GDT: BusinessTransactionDocumentParty. There is a 1:c relationship 38032 between the TaxDue entity 38014 and the SellerParty entity 38020. If a SellerParty entity 38020 is not specified in an invoice, the VendorParty entity 38024 may be considered to be the service provider from a tax point of view and may therefore be specified.

(c) Product Recipient Party

The ProductRecipientParty identifies a company or a person to whom goods are delivered or for whom services are provided. The ProductRecipientParty entity 38022 is of type GDT: BusinessTransactionDocumentParty. There is a 1:c relationship 38034 between the TaxDue entity 38014 and the ProductRecipientParty entity 38022.

(d) Vendor Party

The VendorParty identifies a company or a person that delivers goods or provides services. The VendorParty entity 38024 is of type GDT: BusinessTransactionDocumentParty. There is a 1:c relationship 38036 between the TaxDue entity 38014 and the VendorParty entity 38024.

(e) Debitor Party

The DebitorParty identifies a company or a person who owes money for goods or services provided. The Debitorparty entity 38026 is of type GDT: BusinessTransactionDocumentParty. There is a 1:c relationship 38038 between the TaxDue entity 38014 and the DebitorParty entity 38026. In a payment, the DebitorParty entity 38026 may be considered to be the service recipient from a tax point of view and may therefore be specified.

(f) Creditor Party

The CreditorParty entity 38028 is a company or a person to whom money is owing for goods or services provided. The Creditorparty entity 38028 is of type GDT: BusinessTransactionDocumentParty. There is a 1:c relationship 38040 between the TaxDue entity 38014 and the CreditorParty entity 38028. In a payment, the Creditorparty entity 38028 may be considered to be the service provider from a tax point of view and may therefore be specified.

(iii) Tax Package

The Tax Package 38010 includes a summary of the information about types and totals amounts of the tax in the base business document for the tax due. The Tax Package 38010 includes a ProductTax entity 38042. The ProductTax entity 38042 is of type GDT: ProductTax. There is a 1:cn relationship 38044 between the TaxDue entity 38014 and the ProductTax entity 38042.

The ProductTax includes a description of the tax that is incurred when products are purchased, sold, and consumed. If a ProductTax entity 38042 is specified, the ProductTax entity 38042 represents totals of the tax base amount and the tax amount, which are shown for specific countries for each tax type and tax rate. If total amounts are required by law, they are specified at the TaxDue entity 38014 level. Otherwise, the information about the tax due at the item entity level described below is sufficient. The specified country (CountryCode) and jurisdiction code (JurisdictionCode) (usually required for the United States, Canada, and Brazil) also may apply at the item level of the TaxDueNotification message. NonDeductibleAmount and NonDeductiblePercentage are filled if, in the case of incoming invoices and incoming credit memos, the entire tax amount cannot be claimed from the tax authorities (input tax deduction). This is relevant for particular countries and tax types (VAT—value added tax). Triangulationindicator specifies whether intra-community triangulation exists, as described under §25b UStG (or under the relevant paragraphs for the other member states of the European Union).

In one implementation, the currency communicated in the ProductTax entity 38042 entity from the tax calculation entity to the tax register entity is the reporting currency. Thus, in this implementation, the tax calculation entity determines the reporting currency.

(iv) Tax Due Item Package

The TaxDueItem ("Item") package 38012 includes a summary of the information about tax due from the items in the base business document for the TaxDueNotification message. The Item package 38012 includes a TaxDueItemParty package 38046, a TaxDueItemTax package 38048, and a TaxDueItem entity 38050.

(a) Tax Due Item

The TaxDueItem identifies information from an item of a business document that is required to report or pay due tax to the tax authorities. The TaxDueItem entity 38050 includes information about the business partners subject to tax, the tax events based on which the business partners are subject to tax/tax exempt, and about the type and amount of tax due. There is a 1:cn relationship 38052 between the TaxDue entity 38014 and the TaxDueItem entity 38050.

The TaxDueItem entity 38050 includes a BaseBusinessTransactionDocumentItemID, a BaseBusinessTransactionDocumentItemTypeCode, a BaseBusinessTransactionDocumentItemDeliveryDate, and a ProductTaxEventTypeCode as described herein. The BaseBusinessTransactionDocumentItemID is the identifier for the item in the base business document for the specified item in the TaxDueNotification message, and is of type GDT: BusinessTransactionDocumentItemID. The BaseBusinessTransactionDocumentItemTypeCode identifies the type of item specified in the business document, and is of type GDT: BusinessTransactionDocumentItemTypeCode. The BaseBusinessTransactionDocumentItemDeliveryDate identifies the date on which the invoiced quantity of a product was delivered, according to the item in the base business document, and is of type GDT: Date.

When values are transferred at the item level in accordance with methods and systems consistent with the subject matter described herein, the tax register entity will then aggregate the data in line with legal requirements. Aggregated data may be transferred at the document level if permitted by legal requirements. The BaseBusinessTransactionDocumentItemTypeCode may be specified if it has a different type to that of the base business document, for example, when an invoice includes a credit memo item. In one implementation, the ItemDeliveryDate is filled when required by law, such as in Germany, where the date on which the taxes are due to be paid to the tax office is derived from the ItemDeliveryDate. In one implementation, the ProductTaxEventTypeCode is filled when the tax event at item level is not the "main" tax event specified above.

For each item in the base business document that is relevant for tax purposes, there are one or more TaxDueItem entities 38050. For example, there may be several items if several tax types are due or if taxes are due in several jurisdictions, as in the United States.

(b) Tax Due Item Party Package

Similar to the Party Package 38008, the TaxDueItemParty Package 38046 includes a BuyerParty entity 38054, a SellerParty entity 38056, a ProductRecipientParty entity 38058, a VendorParty entity 38060, a DebitorParty entity 38062, and a CreditorParty entity 38064. The TaxDueItemParty package 38046 groups together the business partners that differ from the business partners grouped together in the Party Package 38008.

(c) Buyer Party

The BuyerParty entity 38054 is of type GDT: BusinessTransactionDocumentParty. There is a 1:c relationship 38066 between the TaxDueItem entity 38050 and the BuyerParty entity 38054.

(d) Seller Party

The SellerParty entity 38056 is of type GDT: BusinessTransactionDocumentParty. There is a 1:c relationship 38068 between the TaxDueItem entity 38050 and the SellerParty entity 38056.

(e) Product Recipient Party

The ProductRecipientParty entity 38058 is of type GDT: BusinessTransactionDocumentParty. There is a 1:c relationship 38070 between the TaxDueItem entity 38050 and the ProductRecipientParty entity 38058.

(f) Vendor Party

The VendorParty entity 38060 is of type GDT: BusinessTransactionDocumentParty. There is a 1:c relationship 38072 between the TaxDueItem entity 38050 and the VendorParty entity 38060.

(g) Debitor Party

The DebitorParty entity 38062 is of type GDT: BusinessTransactionDocumentParty. There is a 1:c relationship 38074 between the TaxDueItem entity 38050 and the DebitorParty entity 38062

(h) Creditor Party

The CreditorParty entity 38064 is of type GDT: BusinessTransactionDocumentParty. There is a 1:c relationship 38076 between the TaxDueItem entity 38050 and the CreditorParty entity 38064.

(i) Tax Due Item Tax Package

Similar to the Tax Package 38010, the TaxDueItemTax Package 38048 includes a ProductTax entity 38078. The ProductTax entity 38078 is of type GDT: ProductTax. There is a 1:n relationship 38080 between the TaxDueItem entity 38050 and the ProductTax entity 38078.

(4) Message Data Type Element Structure

FIGS. 381 A-D depict the element structure for a TaxDueNotification and a TaxDueCancellationRequest. The element structure is similar to the above described data model of the message data type TaxDueMessage as reflected in FIG. 380, but provides additional information regarding the details for interfacing with or implementing a TaxDueMessage, such as a TaxDueNotification. As shown in FIGS. 381A-D, the element structure identifies the different packages 38100 that may be in a respective TaxDueNotification and a TaxDueCancellationRequest. The element structure for the TaxDueNotification and a TaxDueCancellationRequest includes four levels 38102, 38104, 38106, and 38108, each of which is associated with a respective package 38100. The element structure identifies the cardinality or occurrence 38110 and the data type 38112 information for the elements at the respective levels 38102, 38104, 38106, and 38108 in the respective package 38100.

The outermost package of this interface is a TaxDueMessage package 38114, which includes a TaxDueMessage entity 38116 at the first level 38102. The TaxDueMessage entity 38116 is of type GDT: TaxDueMessage 38118.

The TaxDueMessage package 38114 also includes a TaxDue Package 38120. The TaxDue Package 38120 includes a TaxDue entity 38122. There is one 38124 TaxDue entity 38122 for each The TaxDueMessage entity 38116. The TaxDue entity 38122 is of type GDT: TaxDue 38126.

The TaxDue entity 38122 includes a BaseBusinessTransactionDocumentID 38128, a BaseBusinessTransactionDocumentTypeCode 38134, a BaseBusinessTransactionDocumentDate 38140, and a ProductTaxEventTypeCode 38146. The BaseBusinessTransactionDocumentID 38128 is of type GDT: BusinessTransactionDocumentID 38132. The BaseBusinessTransactionDocumentTypeCode 38134 is of type GDT: BusinessTransactionDocumentTypeCode 38138. The BaseBusinessTransactionDocumentDate 38140 is of type GDT: Date 38144. The ProductTaxEventTypeCode 38146 is of type GDT: ProductTaxEventTypeCode 38150. There is one 38130 BaseBusinessTransactionDocumentID 38128 for each TaxDue entity 38122. There is one 38136 BaseBusinessTransactionDocumentTypeCode 38134 for each TaxDue entity 38122. There is one 38142 BaseBusinessTransactionDocumentDate 38140 for each TaxDue entity 38122. There is zero or one 38148 ProductTaxEventTypeCode 38146 for each TaxDue entity 38122.

The TaxDue package 38120 also includes a Party package 38152, a Tax package 38154, and an Item package 38156.

The Party package 38152 includes a BuyerParty entity 38158, a SellerParty entity 38164, a ProductRecipientParty entity 38170, a VendorParty entity 38176, a DebitorParty entity 38182, and a CreditorParty entity 38188. The BuyerParty entity 38158 is of type GDT: BusinessTransactionDocumentParty 38162. There is one or zero 38160 BuyerParty entity 38158 for each TaxDue entity 38122. The SellerParty entity 38164 is of type GDT: BusinessTransactionDocumentParty 38168. There is one or zero 38166 SellerParty entity 38164 for each TaxDue entity 38122. The ProductRecipientParty entity 38170 is of type GDT: BusinessTransactionDocumentParty 38174. There is one or zero 38172 ProductRecipientParty entity 38170 for each TaxDue entity 38122. The VendorParty entity 38176 is of type GDT: BusinessTransactionDocumentParty 38180. There is one or zero 38178 VendorParty entity 38176 for each TaxDue entity 38122. The DebitorParty entity 38182 is of type GDT: BusinessTransactionDocumentParty 38186. There is one or zero 38184 DebitorParty entity 38182 for each TaxDue entity 38122. The CreditorParty entity 38188 is of type GDT: BusinessTransactionDocumentParty 38192. There is one or zero 38190 CreditorParty entity 38188 for each TaxDue entity 38122.

The Tax package 38154 includes a ProductTax entity 38194. The ProductTax entity 38194 is of type GDT: ProductTax 38198. There is one ormore 38190 ProductTax entities 38194 for each TaxDue entity 38122.

The Item package 38156 includes an Item entity 38100A. The Item entity 38100A is of type GDT: TaxDueItem 38104A. There is one or more 38102A Item entities 38100A for each TaxDue entity 38122.

The Item entity 38100A includes a BaseBusinessTransactionDocumentItemID 38106A, a BaseBusinessTransactionDocumentItemTypeCode 38112A, a BaseBusinessTransactionDocumentDeliveryDate 38118A, and a ProductTaxEventTypeCode 38124A. The BaseBusinessTransactionDocumentItemID 38106A is of type GDT: BusinessTransactionDocumentItemID 38110A. The BaseBusinessTransactionDocumentItemTypeCode 38112A is of type GDT: BusinessTransactionDocumentItemTypeCode 38116A. The BaseBusinessTransactionDocumentDeliveryDate 38118A is of type GDT: Date 38122A. The ProductTaxEventTypeCode 38124A is of type GDT: ProductTaxEventTypeCode 38128A. There is one 38108A BaseBusinessTransactionDocumentItemID 38106A for each Item entity 38100A. There is one or zero 38114A BaseBusinessTransactionDocumentItemTypeCode 38112A for each Item entity 38100A. There is one or zero 38120A BaseBusinessTransactionDocumentDeliveryDate 38118A for each Item entity 38100A. There is zero or one 38126A ProductTaxEventTypeCode 38124A for each Item entity 38100A.

The Item package 38156 also includes a Party package 38130A (i.e., a TaxDueItemParty package) and a Tax package 38132A (e.g., a TaxDueItemParty package).

Similar to the Party package 38152 in the TaxDue package 38120, the TaxDueItemParty package 38130A includes a BuyerParty entity 38134A, a SellerParty entity 38140A, a ProductRecipientParty entity 38146A, a VendorParty entity 38152A, a DebitorParty entity 38158A, and a CreditorParty entity 38164A. The BuyerParty entity 38134A is of type GDT: BusinessTransactionDocumentParty 38138A. There is one or zero 38136A BuyerParty entity 38134A for each Item entity 38100A. The SellerParty entity 38140A is of type GDT: BusinessTransactionDocumentParty 38144A. There is one or zero 38142A SellerParty entity 38140A for each Item entity 38100A. The ProductRecipientParty entity 38146A is of type GDT: BusinessTransactionDocumentParty 38150A. There is one or zero 38148A ProductRecipientParty entity 38146A for each Item entity 38100A. The VendorParty entity 38152A is of type GDT: BusinessTransactionDocumentParty 38156A. There is one or zero 38154A VendorParty entity 38152A for each Item entity 38100A. The DebitorParty entity 38158A is of type GDT: BusinessTransactionDocumentParty 38162A. There is one or zero 38160A DebitorParty entity 38158A for each Item entity 38100A. The CreditorParty entity 38164A is of type GDT: BusinessTransactionDocumentParty 38168A. There is one or zero 38166A CreditorParty entity 38164A for each Item entity 38100A.

Similar to the Tax package 38154 in the TaxDue package 38120, the TaxDueItemTax package 38132A includes a ProductTax entity 38170A. The ProductTax entity 38170A is of type GDT: ProductTax 38174A. There is one or more 38172A ProductTax entities 38170A for each Item entity 38100A.

i) Delivery Information

A DeliveryInformation provides information about the (planned) execution and execution status of an outbound delivery or an inbound delivery. It can result from a (confirmed) sales order, a (confirmed) purchase order, a (confirmed) forecast delivery schedule, or a shipping notification, and contains the deadlines to be defined, such as delivery creation, processing completion in the warehouse, goods movement posting, and so on. In this Interface, the term "delivery" refers to both inbound and outbound deliveries, that is, the direction in which the goods flow is not relevant for the interface structure described.

The motivating business scenarios for the DeliveryInformation interface are the "SellFromStock" and "ProcureToStock" scenarios. In the "SellFromStock" scenario, goods purchase orders are accepted by the customer and generate a request to Logistics to fulfill the order. In this scenario, the order is fulfilled by delivering the ordered goods to the customer from a warehouse. A delivery request to the relevant warehouse is generated, which results in a delivery to be executed. The planning system, for example, is informed about this delivery to be executed. At a certain point, delivery execution begins and the delivery to be executed becomes the actual delivery, along with its various processing stages. At various stages, information about the delivery processing status is provided for the benefit of the applications involved (such as the sales order system or planning system). In this way, for example, customers can use the sales order system to find out the current status of their delivery and the best possible planned delivery date on the basis of the latest data.

In the "ProcureToStock" scenario, goods are ordered from a vendor. The purchase order or confirmation of the purchase order by the vendor generates a request to Logistics to receive the goods on the required or confirmed date and place them in storage. By sending a shipping notice via the vendor, the request to the warehouse regarding quantities and deadlines can be finalized further. Planning, for example, is informed about this pending delivery. At a certain time, the goods arrive at the warehouse and the pending delivery becomes the actual delivery, along with its various processing stages. At various stages, information about the delivery processing status is provided for the benefit of the applications involved (such as the planning system). It is possible to use the SAP Inventory Collaboration Hub (SAP ICH) to provide a vendor with the current delivery status based on the most recent information.

DeliveryInformation is information about the (planned) execution and the execution status of a delivery. The message type DeliveryInformation is based on the message data type DeliveryInformationMessage. The DeliveryInformation covers the entire delivery process. For example, the following delivery statuses can be published: removed from storage/placed in storage; packed/unpacked; loaded/unloaded; and goods issue posted/goods receipt posted. Methods and systems consistent with the subject matter described herein use the package template for a BusinessTransactionDocument for an SCM Master Data depicted in FIG. 270B to derive the DeliveryInformation interface.

(1) Message Choreography

FIG. 382 depicts a message choreography that describes a logical sequence of messages that can be used to realize a scenario between Sales ("CRM") 38200, Fulfillment Coordination ("FC") 38202, Supply Chain Planning ("SCP") 38204 and Supply Chain Execution ("SCE") 38206. CRM 38200 initially sends a SalesOrderFulfillmentRequest 38208 to FC 38202. The FC 38202 then sends a DeliveryExecutionRequest 38210 to SCE 38206. In response, SCE 38206 sends DeliveryInformation 38212 to FC 38202. FC 38202 then sends DeliveryInformation 38214 to SCP 38204, and sends DeliveryInformation 38216 to CRM 38200. The basis for the delivery creation can be an external delivery request (MessageDeliveryRequest), a shipping notification (Message DespatchedDeliveryNotification) or the manual creation of a delivery. Information about the (planned) delivery execution and status is provided in messages of type DeliveryInformation.

(2) Message Data Type Data Model

FIG. 383 depicts the data model for the DeliveryInformationMessage. The message data type DeliveryInformationMessage includes a DeliveryInformationMessage package 38300, which includes a DeliveryInformationMessage entity 38302. The DeliveryInformationMessage package 38300 also includes a MessageHeader package 38304 and a Delivery package 38306. The message data type DeliveryInformationMessage makes the structure available for the message type DeliveryInformation and relevant interfaces.

There is a 1:c relationship between entities in this Interface unless otherwise noted herein or indicated in the Figures.

(a) Message Header Package

The MessageHeader package 38304 groups together the business information that is relevant for sending a business document in a message. It may include a MessageHeader entity 38308, which groups together the business information from the viewppoint of the sending application to identify the business document in a message, information about the sender, and information about the recipient. The MessageHeader entity 38308 may be divided up into a SenderParty 38310 and a RecipientParty 38312, and is of type GDT: BusinessDocumentMessageHeaderParty. The MessageHeader entity 38308 may also include an ID, which is identification of the business document in the technical message, and a CreationDateTime, which is creation date of the business document in the technical message. A MessageHeader is optional.

(b) Delivery Package

The Delivery package 38306 groups together a Delivery entity 38314 and its packages: a DeliveryBusinessTransactionDocumentationReference package 38316, a DeliveryParty package 38318; a DeliveryLocation package 38320; a DeliveryExecution package 38322, a DeliveryTransportInformation package 38324, a DeliveryInformation package 38326, a DeliveryAttachment package 38328, an DeliveryLog package 38330, a DeliveryItem package 38332, and a DeliveryHandlingUnit package 38334. There is a 1:1 relationship between the DeliveryInformationMessage entity 38302 and the Delivery entity 38314.

A Delivery is a planned or physical combination of goods that is to be made available for transportation and, after transportation, received for further use within a company. The Delivery entity 38314 is divided into delivery items (DeliveryItems), which describe the execution status and performance period for delivering a quantity of a product or batch. References to relevant business documents can be specified for a delivery item. For the delivery as a whole, the ship-from/to location, transportation details, and any references to relevant business documents can be specified alongside the delivering party, recipient, and transporting party.

A Delivery entity 38314 includes the attribute ActionCode and the following elements: an ID, a VendorID, a TypeCode, a CreationDateTime, a LastChangeDateTime, a ThirdPartyDealIndicator, a ReturnesIndicator, a ProductRecipientInitiatedActionIndicator, a GrossWeightMeasure, a NetWeightMeasure, a GrossVolumeMeasure, a GroupID, a WayBillID, a FreightInvoiceID, a DangerousGoodsIndicator, and a Note.

The ActionCode is a coded representation of an instruction to the message recipient as to how he or she should process the delivery document electronically (new creation, change, or deletion). Only the strict semantic with the ActionCodes "01" (Create), "02" (Change), and "03" (Delete) are supported. It might be necessary to change a delivery due to quantity changes during picking, for example. The ActionCode is of type GDT: ActionCode.

The ID is a unique ID for a delivery assigned by the goods recipient and is of type GDT: BusinessTransactionDocumentID. The VendorID is a unique ID for a delivery assigned by the vendor and is of a type GDT: BusinessTransactionDocumentID. The TypeCode is the type of delivery (inbound/outbound) and is of type GDT: BusinessTransactionDocumentTypeCode. The CreationDateTime is the date on which the delivery was created and is of type GDT: DateTime. The LastChangeDateTime is the date on which the delivery was changed and is of type GDT: DateTime. The ThirdPartyDealIndicator is a display to denote that the delivery is part of a third-party scenerio and is of type GDT: BusinessTransactionDocumentThirdPartyDealIndicator. The ReturnesIndicator specifies whether the delivery is a return delivery or not and is of type GDT: ReturnsIndicator. The ProductRecipientInitiatedActionIndicator is specifies whether the action specified in the delivery was triggered by the goods recipient or not, and is of type GDT: PartyInitiatedActionIndicator. The GrossWeightMeasure is the gross total weight of the delivery, and is of type GDT: Measure. The NetWeightMeasure is the net total weight of the delivery, and is of type GDT: Measure. The GrossVolumeMeasure is the gross total volume of the delivery, and is of type GDT: Measure. The GroupID is the ID of the group to which the delivery belongs and is of type GDT: BusinessTransactionDocumentGroupID. Deliveries with the same delivery group can be processed together in subsequent processes, which can result in a display of deliveries that have been grouped together in one shipment. The WayBillID is a unique identifier for the bill of lading and is of type GDT: BusinessTransactionDocumentID. A bill of lading can be understood as a document that provides evidence of completion of a freight contract by means of transportation of goods from the Vendor to the ProductRecipient. The FreightInvoiceID is a unique ID of the freight invoice and is of type GDT: BusinessTransactionDocumentID. A freight invoice can be understood as an invoice for the certified transportation of goods from Vendor to GoodsRecipient as specified in the bill of lading. The DangerousGoodsIndicator is a specification as to whether or not the delivery contains dangerous goods and is of type GDT: DangerousGoodsIndicator. The Note is a note for delivery and is of type GDT: Note.

The values "Inbound Delivery" and "Outbound Delivery" are permitted as the TypeCode. If the DeletedIndicator is set, the items do not have to be transferred; they are implicitly classified as deleted.

(i) Delivery Businesss Transaction Document Reference package

The DeliveryBusinesssTransactionDocumentReference package 38316 groups together all business document references that can occur in the delivery process. It includes an OutboundDeliveryReference entity 38336, an InboundDeliveryReference entity 38338 and a ShipmentReference entity 38340.

An OutboundDeliveryReference 38336 is the reference to an outbound delivery. The OutboundDeliveryReference 38336 is of type GDT: BusinessTransactionDocumentReference; however, only the ID is used. In variations, the OutboundDeliveryReference 38336 is only specified in the case of outbound deliveries if the predecessor document of the current delivery is also an outbound delivery. This can occur in the case of a delivery split.

An InboundDeliveryReference entity 38338 is the reference to an inbound delivery. The InboundDeliveryReference entity 38338 is of type GDT: BusinessTransactionDocumentReference; however, only the ID is used. The InboundDeliveryReference entity 38338 is only specified in the case of inbound deliveries if the predecessor document of the current delivery is also an inbound delivery. This occurs in particular in the case of a shipping notification that was previously sent by the vendor, or in the case of a delivery split.

A ShipmentReference entity 38340 is the reference to a shipment. The ShipmentReference entity 38340 is of type GDT: BusinessTransactionDocumentReference. Shipment refers to the quantity of goods consolidated by the vendor at a shipping location that are transported together on the delivery date to the recipient and unloaded at the point of destination.

(ii) Delivery Party Package

The DeliveryParty package 38318 groups together the business partners that can be involved in a business delivery process. The DeliveryParty package 38318 includes a BuyerParty entity 38342, a VendorParty entity 38344, a ProductRecipientParty entity 38346, a CarrierParty entity 38348, and a BillToParty entity 38350. The DeliveryParty package 38318 may also include a SellerParty entity, a PayerParty entity, a BillFromParty entity, and a PayeeParty entity for deliveries without a reference for an order. This data is normally entered or determined in the base order and is not relevant for delivery processing. In particular, it cannot be changed while the delivery is being processed.

The BuyerParty entity 38342 is the company or person that/who bought the products specified in the delivery. The BuyerParty 38342 is type GDT: BusinessTransactionDocumentParty, whereby only the InternalID, the StandardID, and Address are used. Either the InternalID or the Standard ID can be used; however, one of these IDs must be used. Due to various options for ID use, all ID elements of the particular "Party" are optional.

The VendorParty 38344 is the company or person who is to deliver goods and is of type GDT: BusinessTransactionDocumentParty, whereby the InternalID, the StandardID, and Address are used. Either the InternalID or the Standard ID can be used; however, one of these IDs must be used. Due to various options for ID use, all ID elements of the particular "Party" are optional. In a delivery process in supply chain execution, the address of the VendorParty 38344 is not intended to be used as the outbound delivery address. The ShipFromLocation is intended for this. An important part of the VendorParty 38344 in the delivery process, however, is the specified contact person for any queries relating to a delivery.

The ProductRecipientParty 38346 is the company or person to which goods are to be delivered and is of type GDT: BusinessTransactionDocumentParty, whereby the InternalID, the StandardID, and Address are used. Either the InternalID or the Standard ID can be used; however, one of these IDs must be used. Due to various options for ID use, all ID elements of the particular "Party" are optional. In a delivery process in supply chain execution, the address of the ProductRecipientParty entity 38346 is not intended to be used as the delivery address. The ShipToLocation is provided for this purpose.

The CarrierParty 38348 is the company or person who transports the goods and is of type GDT: BusinessTransactionDocumentParty, whereby the InternalID, the StandardID, and Address are used. Either the InternalID or the Standard ID can be used; however, in some implementations, one of these IDs must be used. Due to various options for ID use, all ID elements of the particular "Party" are optional.

The BillToParty 38350 is the company or the person to whom the invoice for the deliverd products is sent and is of type GDT: BusinessTransactionDocumentParty, whereby the InternalID, the StandardID, and Address are used.

(iii) Delivery Location Package

The DeliveryLocation package 38320 groups together the locations that can occur in a delivery process. It includes a ShipFromLocation entity 38352, a TransshipmentLocation entity 38354 and a ShipToLocation entity 38356. There is a 1:1 relationship between the Delivery entity 38314 and the ShipFromLocation entity 38352. There is a 1:1 relationship between the Delivery entity 38314 and the ShipToLocation entity 38356. The ShipFromLocation, TransshipmentLocation, and the ShipToLocation can be used to provide a detailed description of the flow of goods (between the ship-from and ship-to location).

The ShipFromLocation is the place from which goods are shipped. The ShipFromLocation entity 38352 is of type GDT: BusinessTransactionDocumentLocation, whereby the InternalID, the StandardID, LoadingLocation, and Address are used. Either the InternalD or the Standard ID can be used. However, one of these IDs must be used. Due to the various options for ID use, all ID elements of the particular "Location" are optional.

The TransshipmentLocation is the location at which the delivered products are transshipped on their way to the product recipient. The TransshipmentLocation entity 38354 is type GDT: BusinessTransactionDocumentTransshipmentLocation, and the InternalID, the StandardID, UnLoadingLocation, LoadingLocation and Address are used. Either the InternalID or the Standard ID can be used. However, one of these IDs must be used. Due to the various options for ID use, all ID elements of the particular "Location" are optional.

The ShipToLocation is the location to which goods are shipped. The ShipToLocation entity 38356 is of type GDT: BusinessTransactionDocumentLocation, and the InternalID, the StandardID, UnloadingLocation, and Address are used. Either the InternalID or the Standard ID can be used. However, one of these IDs must be used. Due to the various options for ID use, all ID elements of the particular "Location" are optional.

(iv) Delivery Execution Information Package

The DeliveryExecutionInformation package 38322 groups together information abou the (planned and actual) delivery execution. The DeliveryExecutionInformation package 38322 includes a PlannedExecution entity 38358 and ActualExecution entity 38360.

The PlannedExecution entity 38358 specifies information about the planned period in which a certain delivery process is to be executed. The PlannedExecution entity 38358 contains the following elements: IssuePeriod, CarrierHandoverPeriod, and ArrivalPeriod. The IssuePeriod is the planned issue period of the delivery and is of type GDT DateTimePeriod. The CarrierHandoverPeriod is the planned period for the handover of goods to the carrier is of type GDT DateTimePeriod. The ArrivalPeriod is the planned arrival period of delivery is of type GDT DateTimePeriod. In the case of an inbound delivery, the planned period can be based on the specifications of a vendor, for example, which have been transferred with the help of a shipping notification (Message DespatchedDeliveryNotification).

The ActualExecution entity 38360 refers to information about the actual period or time in which a certain delivery process was executed. The ActualExecution entity 38360 contains the following elements: IssuePeriod, PickingPeriod, PackingPeriod, LoadingPeriod, YardDepartureDateTime, ShippingPeriod, YardArrivalDateTime, UnloadingPeriod, UnpackingPeriod, PutawayPeriod, and ReceiptPeriod.

The IssuePeriod is the issue period for the complete delivery and is of type CDT DateTimePeriod. The PickingPeriod is the picking period for the complete delivery and is of type GDT DateTimePeriod. The PackingPeriod is the packing period for the complete delivery and is of type GDT DateTimePeriod. The LoadingPeriod is the loading period for the complete delivery and is of type GDT DateTimePeriod. The YardDepartureDateTime is the time of departure from an exclusive area outside of the warehouse where vehicles are processed, are ready for processing, or are ready to be picked up by an external carrier. The YardDepartureDateTime is of type GDT: DateTime. The ShippingPeriod is the period in which goods are shipped (between ship-from location, ship-to location, and possibly transshipment location) and is of type GDT: DateTimePeriod. The YardArrivalDateTime is the time of arrival at an exclusive area outside of the warehouse where vehicles are processed, are ready for processing, or are ready to be picked up by an external carrier and is of type GDT: DateTime. The UnloadingPeriod is the unloading period for the complete delivery and is of type GDT DateTimePeriod. The UnpackingPeriod is the unpacking period for the complete delivery and is of type GDT DateTimePeriod. The PutawayPeriod is the putaway period for the complete delivery and is of type GDT DateTimePeriod. The ReceiptPeriod is the receipt period for the complete delivery and is of type GDT DateTimePeriod.

As the times specified may only be valid for the complete delivery, periods can be specified. If, for example, one item is put away at 10 o'clock, and a second item at 12 o'clock, the putaway period for the complete delivery is from 10 until 12 o'clock.

(v) Delivery Transport Information Package

The DeliveryTransportInformation package 38324 groups together the transport information for a delivery. The DeliveryTransportInformation package 38324 includes a TransportMeans entity 38362 and a TransportTracking entity 38364.

The TransportMeans entity 38362 is the description of a means of transport and can also include information for a more detailed identification and is of type GDT: TransportMeans.

The TransportTracking entity 38364 delivers transport-related information that can be used for tracking deliveries, for example, in goods deliveries and is of type GDT: TransportTracking.

(vi) Delivery Information Package

The DeliveryInformation package 38326 groups together all delivery conditions that might be relevant in the context of the shipping notification. The DeliveryInformation package 38326 includes a Incoterms entity 38366. Incoterms are commercial contract formulae for the delivery conditions that correspond with the rules compiled by the International Chamber of Commerce (ICC). The Incoterms entity 38366 is of type GDT: Incoterms.

(vii) Deliverty Attachment Package

The DeliveryAttachment package 38328 groups together all the Attachment information relating to the delivery. The DeliveryAttachment package 38328 includes the AttachmentWebAddress entity 38368. The AttachmentWebAddress entity 38368 is a reference to an Attachment and is of type GDT: WebAddress. There is a 1:cn relationship between the AttachmentWebAddress entity 38368 and the Delivery item 38314.

(viii) Delivery Log Package

The DeliveryLog Package 38330 groups together all the logs relating to the delivery. The DeliveryLog Package 38330 includes the Validation Log entity 38370. The ValidationLog is a log for the logistics planning or logistics execution process check. This checks the consistency of the delivery data. The ValidationLog entity 38370 is of type GDT: Log.

(ix) Delivery Item Package

The DeliveryItem package 38332 groups together all the data that describes the item of the delivery using a quantity of a product or a batch. It includes a DeliveryBusinessTransactionDocumentReference package 38372, a DeliveryParty package 38374, a DeliveryProductInformation package 38376, a DeliveryBatch package 38378, DeliveryExecutionInformation package 38380, a DeliveryInformation package 38382, a DeliveryAttachment package 38384, and a DeliveryLog package 38386. The DeliveryItem package 38332 also includes a DeliveryItem entity 38388.

The DeliveryItem entity 38388 is a quantity of a product in the delivery that contains additional information about its delivery processing status and any references to previous business documents. There is a 1:n relationship between the Delivery entity 38314 and the DeliveryItem entity 38388. The DeliveryItem entity 38388 includes an ID, a VendorID, a CreationDateTime, a LastChangeDateTime, a ConsignmentIndicator, a ProductRecipientInitiatedActionIndicator, a CompletedIndicator, a ShippedQuantityAccumulation, a ReceivedQuantityAccumulation, a GroupID, a PackingListID, a GrossWeightMeasure, a NetWeightMeasure, a GrossVolumeMeasure, a Quantity, optionally a variance of Quantity (includind a QuantityDiscrepancyCode), SalesOrderQuantity, a PurchaseOrderQuantity, an InventoryQuantity, a ReceivedQuantity, Dangerous Goods, and a Note.

The ID is a unique ID for a delivery item assigned by the goods recipient and is of type GDT: BusinessTransactionDocumentItemID. The VendorID is a unique ID for a delivery item assigned by the vendor and is of type GDT: BusinessTransactionDocumentID. The CreationDateTime—the date on which a delivery item was created and is of type GDT: DateTime. The LastChangeDateTime is the change date of a delivery item and is of GDT: DateTime. The ConsignmentIndicator is the specification as to whether the item is or is not intended for the consignment stock and is of the type GDT: ConsignmentIndicator. The ProductRecipientInitiatedActionIndicator specifies whether the action specified in the delivery was triggered by the goods recipient or not and is of type GDT: PartyInitiatedActionIndicator. The CompletedIndicator specifies whether the delivery item has been completed or not and is of type GDT: CompletedIndicator. This information can be used to find out, for example, if no more goods receipts are expected although only one part of the ordered quantity has been notified or delivered. The ShippedQuantityAccumulation is information about cumulated shipped quantities of the product described in the delivery item and is of type GDT: ShippedQuantityAccumulation. ShippedQuantityAccumulation may only be used for deliveries within forecast delivery schedule scenarios. For this reason, references to scheduling agreement items must be made using SchedulingAgreementReference. The ReceivedQuantityAccumulation is information about cumulated received quantities of the product described in the delivery item and is of type GDT: ReceivedQuantityAccumulation. ReceivedQuantityAccumulation may only be used for deliveries within forecast delivery schedule scenarios. For this reason, references to scheduling agreement items must be made using SchedulingAgreementReference. The GroupID is the ID of the delivery group to which the delivery item belongs and is of type GDT: BusinessTransactionDocumentItemGroupID. Delivery items with the same delivery group can be processed together in subsequent processes. It is thus possible to display delivery items that have been grouped together in one shipment. The PackingListID is a unique ID for the packing list with the packing specifications for the products from one or more delivery items and is of type GDT: PackingListID. More than one packing list can exist for each delivery. However, only packing-relevant delivery items must be listed in the packing lists. The GrossWeightMeasure is the gross weight of products in the delivery item and is of type GDT: Measure. The NetWeightMeasure is the net weight of products in the delivery item and is of type GDT: Measure. The GrossVolumeMeasure is the gross volume of products in the delivery item is of type GDT: Measure. The Quantity is the delivery quantity in delivery unit of measure and is of type GDT: Quantity. The SalesOrderQuantity is the delivery quantity in sales unit of measure and is of type GDT: Quantity The PurchaseOrderQuantity is the delivery quantity in purchase unit of measure and is of type GDT: Quantity. The InventoryQuantity the delivery quantity in inventory unit of measure and is of type GDT: Quantity. The ReceivedQuantity is the delivery quantity posted in goods receipt in delivery unit of measure and is of type GDT: Quantity. The Dangerous Goods is a classification of dangerous goods in the delivery item and is of type GDT: DangerousGoods. The Note is a note for item of the delivery and is of the type GDT: Note.

Optionally, a Variance exists for Quantity. The Variance includes the following elements: Quantity and QuantityDiscrepancyCode. The Quantity is the quantity deviation from the shipping notification (difference) and is of type GDT: Quantity. This is specified without a plus/minus sign. One can tell whether too much or too little was delivered from the following QuantityDiscrepancyCode. The QuantityDiscrepancyCode is a coded representation of the type of and reason for the discrepancy for the received product, and is of the type GDT: QuantityDiscrepancyCode.

The DeliveryItemBusinessTransactionDocumentReference package 38372 groups together all the business document references that can occur in the delivery process for a delivery item or product that has been delivered. The DeliveryItemBusinessTransactionDocumentReference package 38372 includes a PurchaseOrderReference entity 38390, a OriginPurchaseOrderReference entity 38392, a SchedulingAgreementReference entity 38394, a SalesOrderReference entity 38396, and a ShipmentReference entity 38398.

A PurchaseOrderReference entity 38390 is the reference to a purchase order or an item in a purchase order and is of type GDT: BusinessTransactionDocumentReference. The PurchaseOrderReference entity 38390 contains the purchase order number and purchase order item number specified by the purchaser or purchasing system. The PurchaseOrderReference entity 38390 contains the reference to the base purchase order item to which the delivery item refers. This reference (if it exists) must always be unique. For this reason, the SalesOrderReference entity 38396 must not be filled when the PurchaseOrderReference entity 38390 is specified.

An OriginPurchaseOrderReference entity 38392 is the reference to the original purchase order or to an item within the original purchase order and is of type GDT: BusinessTransactionDocumentReference. The OriginPurchaseOrderReference entity 38392 may only be used for third-party purchase orders. The OriginPurchaseOrderReference entity 38392 is used in all the purchase orders in a third-party deal, so that the seller or vendor can reference the original purchase order of the ProductRecipientParty entity 38346 with the OriginPurchaseOrderReference entity 38392 when the delivery is made.

A SchedulingAgreementReference entity 38394 is the reference to an outline agreement item and is of type GDT: BusinessTransactionDocumentReference. According to the rules of the outline agreement, products are procured on predefined dates within a time period.

A SalesOrderReference entity 38396 is the reference to an item in a sales order and is of type GDT: BusinessTransactionDocumentReference. The SalesOrderReference entity 38396 contains the unique order number assigned by the seller or sales system. The SalesOrderReference entity 38396 contains the reference to the base order item to which the delivery item refers. This reference (if it exists) must always be unique. For this reason, the PurchaseOrderReference entity 38390 must not be filled when the SalesOrderReference entity 38396 is specified.

A ShipmentReference entity 38398 is the reference to a shipment and is of type GDT: BusinessTransactionDocumentReference. If the items in a delivery can be assigned to the items in a shipment, the corresponding reference is specified only at this point and not in the DeliveryInformation package 38326 in the Delivery package 38306.

The DeliveryItemParty package 38374 groups together the business partners that might be relevant in a delivery item. The DeliveryItemParty package 38374 includes a BuyerParty entity 38300A.

A BuyerParty entity 38300A is the company or person that bought the product specified in the delivery item and is type GDT: BusinessTransactionDocumentParty, whereby the InternalID, the StandardID, and Address are used. Either the InternalD or the Standard ID can be used. However, one of these IDs must be used. Due to the various options for ID use, all ID elements of the particular "Party" are optional. In the case of BuyerParty entity 38300A, a default logic exists at header level for the items. This means that the BuyerParty entity 38300A specified at header level is valid for all items as long as the information specified at item level does not contradict this.

The DeliveryItemProductInformation package 38376 groups together all the information for identifying and describing a product in a delivery item. The DeliveryItemProductInformation package 38376 includes a Product entity 38302A. The Product entity 38302A identifies and describes the product that is to be delivered/that has already been delivered and is of type GDT: BusinessTransactionDocumentProduct, whereby the InternalID, the StandardID, and the ChangeID are used. Either the InternalID or the Standard ID can be used. However, one of these IDs must be used. Due to the various options for ID use, both of the ID elements in "Product" are optional. There is a 1:1 relationship between a Product entity 38302A and a DeliveryItem entity 38388.

The DeliveryItemBatch package 38378 groups together all the information that identifies and describes a batch in a delivery item. The DeliveryItemBatch package 38378 includes a Batch entity 38304A.

A Batch entity 38304A is a batch in the delivery item and includes the following elements: an InternalID, a ManufacturingDate, a BestBeforeDate, and an OriginCountryCode. The InternalID is a proprietary identifier for the batch and is of type GDT: BatchID. The ManufacturingDate is the date of manufacture of the batch and is of type GDT: Date. The BestBeforeDate is the best-before date of the batch and is of type GDT: Date. The OriginCountryCode is a coded representation of country of origin of the batch and is of type GDT: CountryCode.

The DeliveryInformation package 38382 is the summary of delivery information about a product. The DeliveryInformation package 38382 includes a Variance entity 38308A. The Variance entity 38308A describes a variance in the received quantity of a product and the type of and reason for the variance.

The Variance entity 38308A includes the following elements: Quantity and QuantityDiscrepancyCode. The Quantity is the quantity deviation from the shipping notification (difference) is of type GDT: Quantity. This is specified without a plus/minus sign. One can tell whether too much or too little was delivered from the following QuantityDiscrepancyCode. The QuantityDiscrepancyCode is the coded representation of the type of and reason for the discrepancy for the received product and is of type GDT: QuantityDiscrepancyCode.

A DeliveryItemExecution package 38380 groups together information about the (planned and actual) execution of a delivery item. The DeliveryItemExecution package 38380 includes an ActualExecution entity 38306A. The ActualExecution entity 38306A refers to information about the actual period or time in which a certain process of a delivery item was executed.

The ActualExecution entity 38306A contains the following elements: IssuePeriod, PickingPeriod, PackingPeriod, LoadingPeriod, UnloadingPeriod, UnpackingPeriod, PutawayPeriod, and RecipientPeriod. The IssuePeriod is the issue time/period for the delivery item and is of type GDT DateTimePeriod. The PickingPeriod is the picking period for the delivery item and is of type GDT DateTimePeriod. The PackingPeriod is the packing period for the delivery item and is of type GDT DateTimePeriod. The LoadingPeriod is the loading period for the delivery item and is of type GDT DateTimePeriod. The UnloadingPeriod is the unloading period for the delivery item and is of type GDT DateTimePeriod. The UnpackingPeriod is the unpacking period for the delivery item and is of type GDT DateTimePeriod. The PutawayPeriod is the putaway period for the delivery item and is of type GDT DateTimePeriod. The ReceiptPeriod is the receipt time/period for the delivery item and is of type GDT DateTimePeriod.

As the times specified may only be valid for the complete delivery item, periods and not times can be partly specified here. If, for example, a handling unit for an item is put away at 10 o'clock, and a second at 12 o'clock, the putaway period for the complete delivery item is from 10 until 12 o'clock.

The DeliveryItemAttachment package 38384 groups together Attachment information relating to the delivery item. The DeliveryItemAttachment package 38384 includes an AttachmentWebAddress entity 38310A. The AttachmentWebAddress entity 38310A is a reference to an Attachment and is of type GDT: WebAddress. There is a 1:cn relationship between the AttachmentWebAddress entity 38310A and a DeliveryItem entity 38388.

The DeliveryItemLog package 38386 groups together logs relating to a delivery item. The DeliveryItemLog package 38386 includes a ValidationLog entity 38312A.

The ValidationLog is a log for the process of the logistics planning or logistics execution check of a delivery item and is of type GDT: Log.

(x) Delivery Handling Unit Package

The DeliveryHandlingUnit package entity 38334 groups together the information that characterizes in detail how the delivery is packed or is to be packed. The DeliveryHandlingUnit package entity 38334 includes a HandlingUnit entity 38314A.

A HandlingUnit entity 38314A is a physical unit of packaging materials (load carrier, additional packaging materials) and the packaged products (of type "material") and is of type GDT: HandlingUnit. There is a 1:cn relationship between HandlingUnit entity 38314A and a DeliveryItem entity 38388.

(3) Element Structure of Delivery Information Message

The message data type element structure for the delivery information message is depicted in FIG. 384A-K. The element structure is similar to the data model, but provides additional information regarding the details of the interface. The element structure identifies the different packages 38400 in the interface, and represents the entities at various levels within the interface. The interface loan contract create request message includes six five 38402, 38404, 38406, 38408, and 38410. As depicted in 384A, the outermost package of this interface is a DeliveryInformationMessage 38416 package 38418, which includes a Delivery Information Message 38418 at the first level with the name Delivery Information 38420. A MessageHeader package 38422 is also included at the second level. The MessageHeader package 38422 includes a MessageHeader entity 38426 with a cardinality of zero or one 38428, and the name MessageHeader 38430. The MessageHeader entity 38426 includes an ID entity 38440E, a CreationDate Time entity 38446E, and a SenderParty entity 38452E. The ID entity 38440E has a cardinality of one 38442E, and the name is MessageID 38444E. The CreationDate Time entity 38446E has a cardinality of one 38448E, and the name is DateTime 38450E. The SenderParty entity 38452E has a cardinality of zero or one 38454E, and the name is BusinessDocumentMessageHeaderParty 38456E. The SenderParty entity 38452E includes an InternalID entity 38458E and a StandardID entity 38464E. The InternalID entity 38458E has a cardinality of zero or one 38460E, and the name is PartyInternalID 38462E. The StandardIDentity 38464E has a cardinality of zero or one 38466E, and the name is PartyStandardID 38468E. The MessageHeader package 38422 also includes a RecipientParty entity 38470E at the third level 38406 with the cardinality of zero or one 38472E and the name BusinessDocumentMessageHeaderParty 38474E. The RecipientParty entity 38470E includes an InternalID entity 38476E and a StandardID entity 38482E at the fourth level 38408. The InternalID entity 38476E has a cardinality of zero or one 38478E and the name is PartyInternalID 38480E. The StandardID entity 38482E has a cardinality of zero or one 38484E and the name is PartyStandardID 38486E.

As depicted in FIG. 384B, the DeliveryInformationMessage package 38416 includes a Delivery package 38424. The Delivery package 38424 includes a Delivery entity 38432 at the first level 38402 with a cardinality of one 38434. The Delivery entity 38432 includes an actionCodeID entity 38448, an ID entity 38436, a VendorID entity 38488E, a TypeCode entity 38442, a CreationDateTime entity 38454, a LastChangeDateTime entity 38460, a ThirdPartyDealIndicator entity 38488E, and a ReturnsIndicator entity 38494E. The actionCodeID entity 38448 has a cardinality of zero or one 38450, and the name is ActionCode 38452. The ID entity 38436 has a cardinality of one 38438, and the name is BusinessTransaction DocumentID 38440. The VendorID entity 38488Ehas a cardinality of zero or one 38490E, and the name is BusinessTransaction DocumentID 38492E. The TypeCode entity 38442 has a cardinality of one 38444, and the name is BusinessTransaction DocumentTypeCode 38446. The CreationDateTime entity 38454 has a cardinality of one 38456, and the name is DateTime 38458. The LastChangeDateTime entity 38460 has a cardinality of zero or one 38462, and the name is DateTime 38464. The ThirdPartyDealIndicator entity 38488E has a cardinality of zero or one 38490E, and the name is BusinessTransactionDocumentThirdPartyDealIndicator 38492E. The ReturnsIndicator entity 38494E has a cardinality of zero or one 38496E, and the name is ReturnsIndicator 38498E.

As depicted in FIG. 384C, the Delivery package 38424 also includes a VendorIndicatedActionIndicator entity 38460, a GroupID entity 38466, a GrossWeightMeasure entity 38472, a NetWeightMeasure entity 38478, a GrossVolumeMeasure entity entity 38484, a WayBillID entity 38400F, a FreightInvoiceID entity 38406F, a DangerousGoodsIndicator entity 38412F, and a Note 38400H. The VendorIndicatedActionIndicator entity 38460 has a cardinality of zero or one 38462 and the name is PartyInitiatedAction Indicator 38464. The GroupID entity 38466 has a cardinality of zero or one 38468 and the nameis BusinessTransaction DocumentGroupID 38470. The GrossWeightMeasure entity 38472 has a cardinality of zero or one 38474 and the name is Measure 38476.

The NetWeightMeasure entity 38478 has a cardinality of zero or one 38480 and the name is Measure 38482. The GrossVolumeMeasure entity 38484 has a cardinality of zero or one 38486 and the name is Measure 38488. The WayBillID entity 38400F has a cardinality of zero or one 38402F and the name is BusinessTransaction DocumentID 38404F. The FreightInvoiceID entity 38406F has a cardinality of zero or one 38408F and the name is BusinessTransaction DocumentID 38410F. The DangerousGoodsIndicator entity 38412F has a cardinality of zero or one 38414F and the name is DangerousGoodsIndicator 38416F. The Note 38400H has a cardinality of zero or one 38402H and the name is Note 38404H.

As depicted in FIG. 384D, the DeliveryInformationMessage 38416 includes a PlannedExecution entity 38406A at the third level 38406 with a cardinality of zero or one 38408A. The PlannedExecution entity 38406A includes an IssuePeriod entity 38410A, a CarrierHandoverPeriod entity 38416A, an ArrivalPeriod entity 38422A, and a ReceiptExecution StatusCode entity 38434A. The IssuePeriod entity 38410A has a cardinality of zero or one 38412A and the name is DateTimePeriod 38414A. The CarrierHandoverPeriod entity 38416A has a cardinality of zero or one 38418A and the name is DateTimePeriod 38420A. The ArrivalPeriod entity 38422A has a cardinality of zero or one 38424A and the name is DateTimePeriod 38426A.

The DeliveryInformationMessage 38416 also includes an ActualExecution entity 38440A at the third level 38406 with a cardinality of zero or one 38442A. The ActualExecution entity 38440A includes a PickingPeriod entity 38444A, an IssuePeriod entity 38450A, a PackingPeriod entity 38456A, a PutawayPeriod entity 38462A, and a ReceiptPeriod entity 38468A. The PickingPeriod entity 38444A has a cardinality of zero or one 38446A and the name is DateTimePeriod 38448A. The IssuePeriod entity 38450A has a cardinality of zero or one 38452A and the name is DateTimePeriod 38454A. The PackingPeriod entity 38456A has a cardinality of zero or one 38458A and the name is DateTimePeriod 38460A. The PutawayPeriod entity 38462A has a cardinality of zero or one 38464A and the name is DateTimePeriod 38466A. The ReceiptPeriod entity 38468A has a cardinality of zero or one 38470A and the name is DateTimePeriod 38472A.

As depicted in FIG. 384E, the DeliveryInformationMessage package 38416 includes an Execution Information package 38490. The Execution Information package 38490 includes a LoadingPeriod entity 38418F, a YardDepartureDateTime entity 38424F, a ShippingPeriod entity 38430F, a YardArrivalDateTime entity 38436F, an UnloadingPeriod entity 38442F and an UnpackingPeriod entity 38448F. The LoadingPeriod entity 38418F has a cardinality of zero or one 38420F and the name is DateTimePeriod 38422F. The YardDepartureDateTime 38424F has a cardinality of zero or one 38426F and the name is DateTimePeriod 38428F. The ShippingPeriod 38430F has a cardinality of zero or one 38432F and the name is DateTimePeriod 38434F. The YardArrivalDateTime 38436F has a cardinality of zero or one 38438F and the name is DateTimePeriod 38440F. The UnloadingPeriod 38442F has a cardinality of zero or one 38444F and the name is DateTimePeriod 38446F. The UnpackingPeriod 38448F has a cardinality of zero or one 38450F and the name is DateTimePeriod 38452F.

As depicted in FIG. 384F, the DeliveryInformationMessage package 38416 includes a Party package 38492. The Party package 38492 includes a BuyerParty entity 38474A with a cardinality of zero or one 38476A and the name BusinessTransactionDocumentParty 38478A. The BuyerParty entity 38474A includes an InternalID entity 38480A, an Address entity 38486A, and a StandardID entity 38492A. The InternalID entity 38480A has a cardinality of zero or one 38482A and the name is PartyInternalID 38484A. The Address 38486A has a cardinality of zero or one 38488A and the name is Address 38490A. The StandardID 38492A has a cardinality of zero or one 38494A and the name is PartyStandardID 38496A.

The Party package 38492 also includes a VendorParty entity 38410B with a cardinality of zero or one 38414B and the name BusinessTransactionDocumentParty 38416B. The VendorParty 38410B includes an InternalID entity 38498A, an Address entity 38404B, and a StandardID entity 38412A. The InternalID entity 38498A has a cardinality of zero or one 38400B and the name is PartyInternalID 38402B. The Address entity 38404B has a cardinality of zero or one 38406B and the name is Address 38408B. The StandardID entity 38412A has a cardinality of zero or one 38430F and the name is PartyStandardID 38432F. The Party package 38492 also includes a ProductRecipientParty entity 38434F, a CarrierParty entity 38442F, and a BillToParty 38450F. The ProductRecipientParty entity 38434F has a cardinality of zero or one 38438F and the name is BusinessTransactionDocumentParty 38440F. The CarrierParty entity 38442F has a cardinality of zero or one 38446F and the name is BusinessTransactionDocumentParty 38448F. The BillToParty entity 38450F has a cardinality of zero or one 38454F and the name is BusinessTransactionDocumentParty 38456F.

As depicted in FIG. 384G, the DeliveryInformationMessage package 38416 includes a Location package 38494. The Location package 38494 includes a ShipFromLocation entity 38426B at the third level 38406 with a cardinality of zero or one 38428B and the name BusinessTransactionDocumentLocation 38430B. The ShipFromLocation entity 38426B includes an InternalID entity 38432B, a StandardID entity 38458F, a LoadingLocation entity 38464F, and an Address entity 38438B. The InternalID entity 38432B has a cardinality of zero or one 38434B and the name is LocationInternalID 38436B. The StandardID entity 38458F has a cardinality of zero or one 38460F and the name is LocationInternalID 38462F. The LoadingLocation entity 38464F has a cardinality of zero or one 38466F. The LocationInternalID entity 38462F includes an InternalID entity 38468F and a StandardID entity 38474F. The InternalID entity 38468F has a cardinality of zero or one 38470F and the name is LocationInternalID 38472F. The StandardID entity 38474F has a cardinality of zero or one 38476F and the name is LocationInternalID 38478F. The Address entity 38438B has a cardinality of zero or one 38440B and the name is Address 38442B.

The Location package 38494 also includes a TransshipmentLocation entity 38444B and a ShipToLocation entity 38450B. The TransshipmentLocation entity 38444B has a cardinality of zero or one 38448B and the name is BusinessTransaction DocumentLocation 38480F. The ShipToLocation 38450B has a cardinality of zero or one 38454B and the name is BusinessTransaction DocumentLocation 38456B.

As depicted in FIG. 384H, the Delivery package 38424 includes a Transportation Information package 38496, a BusinessTrans-actionDocumentReference package 38498, an Attachment package 38400A, a Log package 38402A, a HandlingUnit package 38408G, and a DeliveryInformation package 38404A. The Transportation Information package 38496 includes a TransportMeans entity 38458B and a TransportTracking entity 38480G. The TransportMeans entity 38458B has a cardinality of zero or one 38460B and the name is TransportMeans 38462B. The TransportTracking entity 38480G has a cardinality of zero or one 38480H and the name is TransportTracking 38480I. The BusinessTrans-action-DocumentReference 38498 includes an OutboundDelivery-Reference entity 38464B, an InboundDeliveryReference entity 38482F, and a ShipmentReference entity 38470B. The OutboundDeliveryReference entity 38464B has a cardinality of zero or one 38466B and the name is BusinessTransaction DocumentReference 38468B. The InboundDeliveryReference entity 38482F has a cardinality of zero or one 38484F and the name is BusinessTransaction DocumentReference 38486F. The ShipmentReference entity 38470B has a cardinality of zero or one 38472B and the name is BusinessTransactionDocumentReference 38474B. The AttachmentWebAddress entity 38476B may have any number 38478B of AttachmentWebAddress entities 38476B for a Delivery package 38424 and the name is WebAddress 38480B. The ValidationLog entity 38482B may have any number 38484B of ValidationLog entities 38482B for a Delivery package 38424 and the name is Log 38486B. The HandlingUnit entity 38410G may have any number 384712G of HandlingUnit entities 38410G for a Delivery package 38424 and the name is HandlingUnit 38414G. The IncoTerms entity 38488B has a cardinality of zero or one 38490B and the name is IncoTerms 38488F.

As depicted in FIG. 384I, the Delivery package 38424 includes a DeliveryItem package 38404A. The DeliveryItem package 38404A includes an Item entity 38490F with a cardinality of any number 38492F of Item entities 38490 for a Delivery Item and named DeliveryItem_Information 38494F. The Item entity 38490F includes an ID entity 38492B, a CreationDateTime entity 38404C, a LastChangeDateTime entity 38410C, a ConsignmentIndicator entity 38498B, a VendorInitiatedActionIndicator entity 38404C, a CompletedIndicator entity 38496F, aShippedQuantityAccumulation entity 38402G, and a ReceivedQuantityAccumulation entity 38406G. The ID entity 38492B has a cardinality of one 38494B and the name is BusinessTransactionDocumentItemID 38496B. The CreationDateTime entity 38404C has a cardinality of one 38406C and the name is DateTime 38408C. The LastChangeDateTime entity 38410C has a cardinality of zero or one 38412C and the name is DateTime 38414C. The ConsignmentIndicator entity 38498B has a cardinality of zero or one 38400C and the name is ConsigmnentIndicator 38402C. The VendorInitiatedActionIndicator entity 38404C has a cardinality of one 38406C and the name is PartyInitiatedActionIndicator 38408C. The CompletedIndicator entity 38496F has a cardinality of zero or one 38498F and the name is CompletedIndicator 38400G. The ShippedQuantityAccumulation entity 38402G has a cardinality of zero or one 38404G. The ReceivedQuantityAccumulation entity 38406G has a cardinality of zero or one 38408G.

As depicted in FIG. 384J, the DeliveryItem package 38404A includes a GroupID 38416C, a PackingListID 38414G, a GrossWeightMeasure 38420G, a NetWeightMeasure 38426G, a GrossVolumeMeasure 38432G, a Quantity 38438G, a SalesOrderQuantity 38444G, a PurchaseOrderQuantity 38450G, an InventoryQuantity 38456G, and a ReceivedQuantity 38462C. The GroupID 38416C has a cardinality of zero or one 38418C and the name is BusinessTransactionDocumentItemGroupID 38420C. The PackingListID 38414G has a cardinality of zero or one 38416G and the name is PackingListID 38418G. The GrossWeightMeasure 38420G has a cardinality of zero or one 38422G and the name is Measure 38424G. The NetWeightMeasure 38426G has a cardinality of zero or one 38428G and the name is Measure 38430G. The GrossVolumeMeasure 38432G has a cardinality of zero or one 38434G and the name is Measure 38436G. The Quantity 38438G has a cardinality of one 38440G and the name is Quantity 38442G. The SalesOrderQuantity 38444G has a cardinality of zero or one 38446G and the name is Quantity 38448G. The PurchaseOrderQuantity 38450G has a cardinality of zero or one 38452G and the name is Quantity 38454G. The InventoryQuantity 38456G has a cardinality of zero or one 38458G and the name is Quantity 38460G. The ReceivedQuantity 38462C has a cardinality of zero or one 38464C and the name is Quantity 38466C.

As depicted in FIG. 384K, the DeliveryInformationMessage package 38416 includes an Execution Information package 38468C. The Execution Information package 38468C includes an ActualExecution entity 38480C with a cardinality of zero or one 38482C. The ActualExecution entity 38480C includes an IssuePeriod 38484C, a PickingPeriod 38490C, a PackingPeriod 38496C, a LoadingPeriod 38402D, a YardDepartureDateTime 38408D, a ShippingPeriod 38414D, a YardArrivalDateTime 38418D, and an UnloadingPeriod 38424D. The IssuePeriod 38484C has a cardinality of zero or one 38486C and the name is DateTimePeriod 38488C. The PickingPeriod 38490C has a cardinality of zero or one 38492C and the name is DateTimePeriod 38494C. The PackingPeriod 38496C has a cardinality of zero or one 38498C and the name is DateTimePeriod 38400D. The LoadingPeriod 38402D has a cardinality of zero or one 38404D and the name is DateTimePeriod 38406D. The YardDepartureDateTime 38408D has a cardinality of zero or one 38410D and the name is DateTimePeriod 38412D. The ShippingPeriod 38414D has a cardinality of zero or one 38416D and the name is DateTimePeriod 38416G. The YardArrivalDateTime 38418D has a cardinality of zero or one 38420D and the name is DateTimePeriod 38422D. The UnloadingPeriod 38424D has a cardinality of zero or one 38426D and the name is DateTimePeriod 38428D.

As depicted in FIG. 384L, the DeliveryItem package 38404A includes an Execution Information package 38468C. The Execution Information package 38468C includes an UnpackingPeriod 38442D with the cardinality of zero or one 38444D and the name DateTimePeriod 38446D; a ReceiptPeriod 38430D with the cardinality of zero or one 38432D and the name DateTimePeriod 38434D; a PutawayPeriod 38436D with the cardinality of zero or one 38438D and the name DateTimePeriod 38440D.

The DeliveryInformation package 38424G includes a Variance entity 38426G with the acardinality of zero or one 38428G. The Variance entity 38426G includes a Quantity 38430G with the cardinality of one 38432G and the name Quantity 38434G. The QuantityDiscrepancyCode 38436G has a cardinality of one 38438G and the name is QuantityDiscrepancyCode 38440G. A Product Information package 38470C includes a Product entity 38448D with a cardinality of one 38450D and the name BusinessTransactionDocument Product 38452D. The Product entity 38448D includes an InternalID 38454D, a StandardID 38460D, and a ChangeID 38466D. The InternalID 38454D has a cardinaliiy of zero or one 38456D and the name is ProductInternalID 38458D. The StandardID 38460D has a cardinality of zero or one 38462D and the name is ProductStandardID 38464D. The ChangeID 38466D has a cardinality of zero or one 38468D and the name is ProductChangeID 38470D.

As depicted in FIG. 384M, the Party package 38418G includes a BuyerParty entity 38420G that has a cardinality of zero or one 38422G and the name is BusinessTransactionDocumentParty 38424G. The BuyerParty entity 38420G includes an InternalID 38426G, a StandardID 38432G, and an Address 38438G. The InternalID 38426G has a cardinality of zero or one 38428G and the name is PartyInternalID 38430G. The StandardID 38432G has a cardinality of zero or one 38434G and the name is PartyStandardID 38436G. The Address 38438G has a cardinality of zero or one 38440G and the name is Address 38442G.

The Party package 38418G also includes a Batch package 38472C. The Batch package 38472C includes a Batch entity 38483D. The Batch entity 38483D includes a ManufacturingDate 38472D, a BestBeforeDate 38478D, an OriginCountryCode 38418G, and an InternalID 38490D. The ManufacturingDate 38472D has a cardinality of zero or one 38474D and the name is Date 38476D. The BestBeforeDate 38478D has a cardinality of zero or one 38480D and the name is Date 38482D. The OriginCountryCode 38418G has a cardinality of zero or one 38420G and the name is CountryCode 38422G. The InternalID 38490D has a cardinality of zero or one 38492D and the name is BatchID 38494D.

The DeliveryItem package 38404A includes a BusinessTransactionDocumentReference package 38474C. The BusinessTransactionDocumentReference package 38474C includes a PurchaseOrderReference 38496D, a SalesOrderReference 38402E, an OriginPurchaseOrderReference 38408E, a SchedulingAgreementReference 38414E, and a ShipmentReference 38420E. The PurchaseOrderReference 38496D has a cardinality of zero or one 38498D and the name is BusinessTransactionDocument Reference 38400E. The SalesOrderReference 38402E has a cardinality of zero or one 38404E and the name is BusinessTransactionDocument Reference 38406E. The OriginPurchaseOrderReference 38408E has any number 38410E of OriginPurchaseOrderReference entities 38408E for a BusinessTransactionDocumentReference package 38474C. The name is BusinessTransactionDocument Reference 38412E. The SchedulingAgreementReference 38414E has a cardinality of zero or one 38416E and the name is BusinessTransactionDocument Reference 38418E. The ShipmentReference 38420E has a cardinality of zero or one 38422E and the name is BusinessTransactionDocument Reference 38424E.

The Attachment package 38476C includes an AttachmentWebAddress 38426E that has a cardinality of any number 38428E of AttachmentWebAddress 38426E for an Attachment package 38476C. The name is WebAddress 38430E. The Log package 38478C includes a ValidationLog 38432E with a cardinality of zero or one 38434E, and the name is Log 38436E.

j) Personnel Time Sheet Information Interface

The "Personnel Time Recording" scenario is the motivating business scenario for the PersonnelTimeSheetInformation interface. The scenario comprises the recording of personnel times and personnel time events, and the transfer of this data to target components. Data can be recorded in a Personnel Time Management system or in a standalone Personnel Time Recording system. In the latter case, data is transferred to Personnel Time Management using the PersonnelTimeSheetInfomnation interface.

(1) Message Type Personnel Time Sheet Information

PersonnelTimeSheetInformation is a message used to transfer recorded personnel times and personnel time events from a standalone Personnel Time Recording system to Personnel Time Management. The structure of the PersonnelTimeSheetInformation message is described by the message data type PersonnelTimeSheetInformationMessage. This message type corresponds to the Timecard standard of the HR-XML consortium.

(2) Message Choreography

FIG. 385 depicts the Message Choreography for the PersonalTimesheetInformation interface established between the PersonnelTimeRecording application 38502 and the PersonnelTimeManagement application 38504. The PersonnelTimeRecording 38502 sends a PersonnelTimesheetInformation 38506 to the PersonnelTimeManagement application 38504. Personnel Time Recording uses the PersonnelTimeSheetInformation to post the recorded personnel times and personnel time events to Personnel Time Management.

(3) Message Type Personnel Time Sheet Message

The PersonnelTimeSheetMessage is a message regarding recorded personnel times and personnel time events that is sent to Personnel Time Management. The PersonnelTimeSheetMessage includes a PersonnelTimeSheetMessage package 38602, which includes a MessageHeader package 38604, a PersonnelTimeSheet package 38606, and a PersonnelTimeSheetMessage entity 38608. The PersonnelTimeSheetMessage entity 38608 is of type GDT: PersonnelTimeSheetMessage.

(a) Message Header Package

The MessageHeader Package 38604 groups non-technical, administrative data for a PersonnelTimeSheetMessage. It includes a MessageHeader entity 38610. There is a 1:c relationship 38612 between the PersonnelTimeSheetMessage entity 38608 and the MessageHeader entity 38610.

(i) Message Header

The MessageHeader identifies a set of non-technical, administrative information in a PersonnelTimeSheetMessage. The MessageHeader entity 38610 includes a SenderParty entity 38614 and a RecipientParty entity 38616. There is a 1:c relationship 38618 between the MessageHeader entity 38610 and the SenderParty entity 38614, and a 1:c relationship 38620 between the MessageHeader entity 38610 and the RecipientParty entity 38616.

The MessageHeader entity 38610 also includes a MessageID and a CreationDateTime. The MessageID is the message ID is a unique ID of the BusinessDocument, and is of type GDT: MessageID. The CreationDateTime refers to the time at which the BusinessDocument was created, and is of type GDT: DateTime. The MessageID is typically set by the sending application.

(ii) Sender Party

The SenderParty is the business sender of a message. The SenderParty entity 38614 is of type GDT: BusinessDocumentMessageHeaderParty. The SenderParty entity 38614 can be filled by the sender application to name a contact person for any problems that occur with the message. This is particularly useful if an additional infrastructure, such as a marketplace, is located between the sender and the recipient. The SenderParty entity 38614 may be used to transfer the message and may be ignored by the receiving application. It should be filled by the sender if the PersonnelTimeSheet package is not used to transfer the participating partners. The SenderParty entity 38614 includes the standard information included with parties, as denoted by ellipses 38622.

(iii) Recipient Party

The RecipientParty is the business recipient of a message. The RecipientParty entity 38616 is of type GDT: BusinessDocumentMessageHeaderParty. The RecipientParty entity 38616 can be filled by the sender application to name a contact person for any problems that occur with the message. This is particularly useful if an additional infrastructure, such as a marketplace, is located between the sender and the recipient. The RecipientParty entity 38616 may be used to transfer the message and may be ignored by the receiving application. It should be filled by the sender if the PersonnelTimeSheet package is not used to transfer the participating partners. The RecipientParty entity 38616 includes the standard information included with parties, as denoted by ellipses 38624.

(b) Personnel Time Sheet Package

The PersonnelTimeSheet package 38606 groups together the personnel times or personnel time events recorded for a personnel resource. The PersonnelTimeSheet package 38606 includes a PersonnelTimeSubsheet package 38626 and a PersonnelTimeSheet entity 38628. There is a 1:1 relationship 38630 between the PersonnelTimeSheetMessage entity 38608 and the PersonnelTimeSheet entity 38628.

(i) Personnel Time Sheet

The PersonnelTimeSheet groups together the personnel times or personnel time events recorded for a personnel resource. The PersonnelTimeSheet entity 38628 includes a PersonnelResourceID, which is a unique ID of the personnel resource for which the included personnel times and personnel time events have been recorded. A personnel resource identifies a person or a group of persons (such as a department) that contributes to the execution of services at an enterprise. The PersonnelResourceID is of type GDT: PartyInternalID.

(ii) Personnel Time Subsheet Package

The PersonnelTimeSubsheet package 38626 includes the personnel times and personnel time events recorded for a work agreement. The PersonnelTimeSubsheet package 38626 includes a PersonnelTimeSubsheet entity 38632. There is a 1:n relationship 38634 between the PersonnelTimeSheet entity 38628 and the PersonnelTimeSubsheet entity 38632.

(a) Personnel Time Subsheet

The PersonnelTimeSubsheet is a set of personnel times and personnel time events that have been recorded during a particular period for a personnel resource regarding a work agreement. The PersonnelTimeSubsheet entity 38632 includes a Period and a WorkAgreementID. The Period is the period of the PersonnelTimeSubsheet specifies the period for which personnel times and personnel time events exist, and is of type GDT: DatePeriod. The WorkAgreementID is an ID of the work agreement according to which the personnel times and personnel time events have been recorded. An ID may not be needed if the personnel resource has one work agreement. In this case, the work agreement can be derived from the resource. A work agreement is an agreement between an employee and an employer. The employee agrees to perform work and the employer agrees to provide remuneration for the work performed. A work agreement comprises numerous other obligations, in addition to the main obligation (remuneration for work), including loyalty, reporting, and benefits. Examples of work agreements include employment contracts, placement contracts, traineeships, and training contracts. The WorkAgreementID is of type GDT: WorkAgreementID.

The PersonnelTimeSubsheet entity 38632 includes a PersonnelTime entity 38636 and a PersonnelTimeEvent entity 38638. There is a 1:cn relationship 38640 between the PersonnelTimeSubsheet entity 38632 and the PersonnelTime entity 38636, and a 1:cn relationship 38642 between the PersonnelTimeSubsheet entity 38632 and the PersonnelTimeEvent entity 38638. The period of each personnel time occurs within the period of the TimeSubsheet. The time of each personnel time event also occurs within this period. In one implementation, at least one PersonnelTime entity 38636 or PersonnelTimeEvent entity 38638 is specified.

(b) Personnel Time

The PersonnelTime is a period of a personnel resource that is characterized by business, pay scale, or legal criteria. The period can be entered as a duration (such as 8 hours on Nov. 10, 2003) or as clock times (such as 8:10 to 17:30 on Nov. 10, 2003). The PersonnelTime entity 38636 is characterized by a personnel time type (such as "working time," "leave," "overtime," "availability for work," "illness" or "work break").

The PersonnelTime entity 38636 includes an ID, a PersonnelTimeTypeID, a DateTimePeriod, a DatePeriod, a Duration, and a EvaluationRelevantDate. The ID is a unique ID for this personnel time. This entry is optional and exists if the standalone recording system assigns an ID. The ID is of type GDT: PersonnelTimeID. The PersonnelTimeTypeID is the ID for the personnel time type. A personnel time type is a classification of personnel times according to enterprise-specific, pay scale, or legal criteria. Depending on whether the employee is at work or absent, this classification can be made according to payment-relevant or further personnel time management criteria. Examples include "working time," "leave," "overtime, "availability for work," "illness" or "work break." The PersonnelTimeTypeID is of type GDT: PersonnelTimeTypeID. The DateTimePeriod is the period of this personnel time as an interval based on a specific time. This entry is optional. The DateTimePeriod is of type GDT: DateTimePeriod. The DatePeriod is the period of this personnel time as a date. This entry is optional. The DatePeriod is of type GDT: DatePeriod. The Duration is the duration of this personnel time. It specifies the duration between a clock time or date period. Examples (including period) are: "10 hours on Oct. 1, 2003" or "30 minutes between 10 and 11 o'clock on Oct. 1, 2003." If no duration is entered, the duration between the clock times or dates applies. The Duration is of type GDT: Duration. The EvaluationRelevantDate identifies a date that is relevant for the valuation of the personnel time. This entry may be required if, for valuation purposes, a personnel time is to be assigned to a different day than the calendar day to which it currently belongs. For example, to generate a Sunday bonus, a time in the early hours of Monday morning is to be assigned to the previous Sunday. The assignment dictates that other rules are used for the valuation and the results may be assigned to different days. The date for the valuation may need to be entered if the business logic cannot derive this automatically based on the calendar entries. The EvaluationRelevantDate is of type GDT: Date.

In one implementation, a period is specified. The entry can comprise two clock times (GDT DateTimePeriod) or two dates (GDT DatePeriod). If a duration is specified, it may not exceed the period between the clock times or dates.

(c) Personnel Time Event

The PersonnelTimeEvent identifies a change in the execution of services of a personnel resource with which one personnel time ends and another personnel time begins. Such changes can include, for example, the start of work, interruption of work, or end of work. The PersonnelTimeEvent entity 38638 is characterized by a type such as "clock-in entry," "clock-out entry," or "start of break."

The PersonnelTimeEvent entity 38638 includes an ID, a PersonnelTimeEventTypeID, a DateTime, and an EvaluationRelevantDate. The ID is a unique ID for this personnel time event. This entry is optional and exists if the standalone recording system assigns an ID. The ID is of type GDT: PersonnelTimeEventID. The PersonnelTimeEventTypeID is the ID for the type of personnel time event. A personnel time event type is a classification of personnel time events according to personnel time management criteria. A typical criterion is whether the employee is at work or absent. Examples are "clock-in entry," "clock-out entry" or "start of break." The PersonnelTimeEventTypeID is of type GDT: PersonnelTimeEventTypeID. The DateTime is the time at which this personnel time event occurs, and is of type GDT: DateTime. The EvaluationRelevantDate identifies a date to which a personnel time event is assigned for the valuation (see personnel time), and is of type GDT: Date.

(4) Message Data Type Element Structure

FIGS. 387A-C depict the element structure for PersonnelTimesheetMessage. The element structure is similar to the data model, but provides additional information regarding the details of the interface. The element structure identifies the different packages 38700 in the interface, and represents the entities at various levels within the interface. The interface for PersonnelTimesheetMessage includes five levels 38702, 38704, 38706, 38708, and 38710. The element structure identifies the cardinality or occurrence 38714 between the entities or elements, and provides information such as the data type 38714 that provides the basis for the entity or element.

The outermost package of this interface is a PersonnelTimesheetMessage package 38722, which includes a PersonnelTimesheetMessage entity 38724 at the first level 38702. The PersonnelTimesheetMessage entity 38724 is of type GDT PersonnelTimeSheetMessage 38726.

The PersonnelTimesheetMessage package 38722 also includes a MessageHeader package 38734 and a PersonnelTimesheet package 38736. The MessageHeader package 38734 includes a MessageHeader entity 38738, which is of type GDT BusinessDocumentMessageHeader 38742. There is zero or one 38740 MessageHeader entity 38738 for each PersonnelTimesheetMessage entity 38724.

The MessageHeader entity 38738 includes a MessageID 38744 and a CreationDateTime 38754. The MessageID 38744 is of type GDT MessageID 38748, and there is one 38746 MessageID 38744 for each MessageHeader entity 38738. The CreationDateTime 38754 is of type GDT DateTime 38758, and there is one 38756 CreationDateTime 38754 for each MessageHeader entity 38738.

The MessageHeader entity 38738 also includes a SenderParty entity 38766 and a RecipientParty entity 38778. The SenderParty entity 38766 is of type GDT BusinessDocumentMessageHeaderParty 38770, and there is zero or one 38768 SenderParty entity 38766 for each MessageHeader entity 38738. The RecipientParty entity 38778 is of type GDT BusinessDocumentMessageHeaderParty 38782, and there is zero or one 38780 RecipientParty entity 38778 for each MessageHeader entity 38738.

The PersonnelTimesheet package 38736 includes a PersonnelTimesheet entity 38786. There is one 38788 PersonnelTimesheet entity 38786 for each PersonnelTimesheetMessage entity 38724. The PersonnelTimesheet entity 38786 is of type GDT PersonnelTimeSheet 38790. The PersonnelTimesheet entity 38786 includes a PersonnelResourceID 38798. There is one 38700A PersonnelResourceID 38798 for each PersonnelTimesheet entity 38786. The PersonnelResourceID 38798 is of type GDT PartyInternalID 38702A.

The PersonnelTimeSubsheet package 38708A includes a PersonnelTimeSubsheet entity 38710A. There is at least one 38712A PersonnelTimeSubsheet entity 38710A for each PersonnelTimeSheet entity 38786. The PersonnelTimeSubsheet entity 38710A includes a Period 38722A, a WorkAgreementID 38734A, a PersonnelTime 38746A, and PersonnelTimeEvent 38728B. The Period 38722A has one occurrence 38724A, and is of type GDT DatePeriod 38726A. The WorkAgreementID 38734A has one or zero occurrences 38736A, and is of type GDT WorkAgreementID 38738A. The PersonnelTime 38746A has any number of occurrences 38748A, and is of type GDT PersonnelTime 38750A. The PersonnelTimeEvent 38728B has any number of occurrences 38730B, and is of type GDT PersonnelTimeEvent 38732B.

The PersonnelTime 38746A includes an ID 38758A, a TypeID 38768A, a DateTimePeriod 38780A, a DatePeriod 38782A, a Duration 38704B, and a DateForEvaluation 38716B. The ID 38758A has one or zero occurrences 38760A, and is of type GDT PersonnelTimeID 38762A. The TypeID 38768A has one occurrence 38770A, and is of type GDT PersonnelTimeTypeID 38772A. The DateTimePeriod 38780A has one or zero occurrences 38782A, and is of type GDT TimePeriod 38784A. The DataPeriod 38792A has one or zero occurrences 38794A, and is of type GDT DataPeriod 38796A. The Duration 38704B is of type GDT Duration 38708B, and has one or zero occurrences 38706B. The DataForEvaluation 38716B is of type of GDT Date 38720B, and has zero or one occurrences 38718B.

The PersonnelTimeEvent 38728B includes an ID 38740B, a TypeID 38750B, a DateTime 38762B, and a DateForEvaluation 38774B. The ID 38740B has one or zero occurrences 38742B, and is of type GDT PersonnelTimeEventID 38744B. TypeID 38750B has one occurrence 38752B, and is of type GDT PersonnelTimeEventTypeID 38754B. DateTime 38762B has one occurrence 38764B, and is of type GDT DataTime 38766B. DataForEvaluation 38774B has one or zero occurrences 38776B, and is of type GDT Data 38778B.

k) Credit Worthiness Interface

CreditWorthiness interfaces are used to request information about the creditworthiness of a party. The CreditWorthiness interfaces are based on a CreditWorthinessQuery message type and a CreditWorthinessResponse message type. The CreditWorthinessQuery provides the structure for the message requesting the creditworthiness of a party. The CreditWorthinessResponse provides the structure for the reply message that includes the details required about the creditworthiness (score and credit limit) of the party.

The credit management of a company is responsible for checking the creditworthiness of a party and for real-time monitoring of the total liability of parties using dynamic credit limits. The tasks of a credit manager include the final acceptance or refusal of a request (credit decision) and the procurement and management of collateral that reduces the risk of losses on receivables from the party. Creditworthiness checks are carried out using both internal and external information. The information about the creditworthiness can be provided on request from credit management (CreditWorthinessQuery & CreditWorthinessResponse) or as an unsolicited notification to credit management based on internal company rules (CreditWorthinessChangeInformation). Therefore, the bases for the creditworthiness checks include: (1) Credit information about a party provided by information providers (CreditAgencyReportQuery & CreditAgencyReportResponse); (2) information about existing payment obligations of the party, which can be obtained actively by Credit Management (CreditCommitmentQuery & CreditCommitmentResponse) or Credit Management may receive it, for example, from Sales according to internal company rules (CreditCommitmentRecordNotification); and (3) notifications about the payment behavior of parties that Credit Management receives from Payment (CreditPaymentRecordNotification). Credit Management can also provide information internally on request about parties whose creditworthiness is classified as critical (CreditWorthinessCriticalPartiesQuery & CreditWorthinessCriticalPartiesResponse).

The interfaces CreditWorthinessQuery and CreditWorthinessResponse are motivated by the business scenario Credit Check. An application that would request information regarding the creditworthiness of a party (for example, Financials or Sales) sends a query to Credit Management. Credit Management then provides information such as the score and recommended credit limit for the party. This information can, for example, influence the decision as to whether business transactions should take place with this party.

(1) Message Types (a) Credit Worthiness Query

A CreditWorthinessQuery is a query to Credit Management about the creditworthiness of a party. The message type CreditWorthinessQuery is based on the message data type CreditWorthinessQueryMessage.

(b) Credit Worthiness Response

A CreditWorthinessResponse is a response from Credit Management to the query about the creditworthiness of a party. The message type CreditWorthinessResponse is based on the message data type CreditWorthinessMessage.

FIG. 388 depicts the Message Choreography for the CreditWorthiness interfaces within a context of communication between five applications: Payment/Accounting 38802, Sales or Financials 38804, Billing System 38806, Credit Management 38808, and Credit Agency 38814. In this context, an application that wants to know about the creditworthiness of a party (for example, financials or sales) can send a query in a CreditWorthinessQuery to Credit Management; and Credit Management can then provide the information requested in a CreditWorthinessResponse. For example, Credit Management 38808 can send a CreditAgencyReportQuery to the Credit Agency 38810. In response, the Credit Agency 38810 sends a CreditAgencyReportResponse 38814 to Credit Management 38808. An application that requests information about the creditworthiness of a party (for Payment/Accounting, Sales/Financials, or a Billing system) sends a query (CreditWorthinessQuery) to Credit Management. Credit Management then provides the requested details (CreditWorthinessResponse). A serialization of the messages is not necessary.

(2) Message Data Type Credit Worthiness Query Message

The message data type CreditWorthinessQueryMessage groups the business information that is relevant for sending a business document in a message and the object CreditWorthinessQuery included in the business document. As depicted in FIG. 389, the CreditWorthinessQueryMessage includes a CreditWorthinessQueryMessage package 38902, which includes a MessageHeader package 38904, a CreditWorthinessQuery package 38906, and a CreditWorthinessQueryMessage entity 38908. The message data type CreditWorthinessQueryMessage provides the structure for the message type CreditWorthinessQuery.

(a) Message Header Package

The MessageHeader package 38904 groups the business information that is relevant for sending a business document in a message. The MessageHeader 38904 is optional.

(b) Credit Worthiness Query Package

The CreditWorthinessQuery package 38906 includes a Party package 38910, a Product package 38912, and a CreditWorthinessQuery entity 38914. There is a 1:1 relationship 38916 between the CreditWorthinessQueryMessage entity 38908 and the CreditWorthinessQuery entity 38914.

The CreditWorthinessQuery entity 38914 identifies the query regarding the creditworthiness of a business party, and includes a CreditSegmentInternalID, a CheckedAmount, a CheckingRuleCode, a CheckingSeverityCode, and a CreditAgencyReportRetrievalPermissionIndicator. The CreditSegmentInternalID is the proprietary identifier of the credit segment to which the creditworthiness query relates. The credit segment is a unit of the business of a company from the viewpoint of credit assignment and credit control. One of the uses of the credit segment is to monitor the credit limits of parties. CreditSegmentInternalID is of type GDT: CreditSegmentInternalID. The CheckedAmount is the amount to be checked (for example, order value), and is of type GDT: Amount. The CheckingRuleCode is an encoded representation of the procedure to be used for determining the creditworthiness, and is of type GDT: CreditWorthinessCheckingRuleCode. The CheckingSeverityCode is an encoded representation of the strength of the check procedure to be applied, and is of type GDT: CreditWorthinessCheckingSeverityCode. The CreditAgencyReportRetrievalPermissionIndicator is the specification of whether the party has given consent for credit information to be obtained about him or her, and is of type GDT: CreditAgencyReportRetrievalPermissionIndicator.

These elements can be used to make the creditworthiness query more precise. The CreditSegmentInternalID is used when both the sender and the recipient can access shared master data for the credit segment. If this is not the case, the credit segment is derived from other elements (for example, the CreditorParty, the SellerParty, or the ProductCategory, discussed below).

(i) Credit Worthiness Query Party Package

The CreditWorthinessQueryParty package 38910 includes a DebtorParty entity 38918, a CreditorParty entity 38920, and a SellerParty entity 38922. There is a 1:1 relationship 38924 between the CreditWorthinessQuery entity 38914 and the DebtorParty entity 38918. There is a 1:c relationship 38926 between the CreditWorthinessQuery entity 38914 and the CreditParty entity 38920. There is also a 1:c relationship 38928 between the CreditWorthinessQuery entity 38914 and the SellerParty entity 38922.

The DebtorParty identifies the party about whom creditworthiness information is to be provided, i.e., the debtor party. The DebtorParty entity 38918 is of type GDT BusinessTransactionDocumentParty, where the element InternalID is used. The DebtorParty entity 38918 is typically specified.

The CreditorParty identifies the party that owns a receivable due from the debtor party. The CreditorParty entity 38920 is of type GDT BusinessTransactionDocumentParty, where, in one implementation, the element InternalID is used. The CreditorParty entity 38920 determines the credit segment and is not required if the credit segment is specified via the CreditSegmentInternalID or determined from the ProductCategory.

The SellerParty identifies the party that sells a product, or plans to, to the debtor party. The SellerParty entity 38922 is of type GDT BusinessTransactionDocumentParty, where, in one implementation, the element InternalID is used. The SellerParty entity 38922 determines the credit segment and is not required if the credit segment is specified via the CreditSegmentInternalID or determined from the ProductCategory.

(ii) Credit Worthiness Query Product Information Package

The CreditWorthinessQueryProductInformation package 38912 includes a ProductCategory entity 38930. There is a 1:c relationship 38932 between the CreditWorthinessQuery entity 38914 and the ProductCategory entity 38930. The ProductCategory identifies the product category of the product sold to, or to be sold to, the debtor party. The ProductCategory entity 38930 is of type GDT BusinessTransactionDocumentProductCategory, where, in one implementation, the element InternalID is used. The ProductCategory entity 38930 determines the credit segment and is not required if the credit segment is specified via the CreditSegmentInternalID or determined using the CreditorParty 38920 or SellerParty 38922.

(3) Message Data Type Credit Worthiness Message

The message data type CreditWorthinessMessage groups the business information that is relevant for sending a business document in a message and the object CreditWorthiness included in the business document. It includes a CreditWorthinessMessage package 39002, which includes a MessageHeader package 39004, a CreditWorthinessQuery package 39006, and a CreditWorthinessMessage entity 39008. The message data type CreditWorthinessQueryMessage provides the structure for the message type CreditWorthinessQuery.

(a) Message Header Package

A MessageHeader package 39004 groups the business information that is relevant for sending a business document in a message. The MessageHeader 39004 is optional.

(b) Credit Worthiness Package

The CreditWorthiness package 39006 includes a Party package 39010, a ProductInformation package 39012, an Information package 39014, and a CreditWorthiness entity 39016. There is a 1:1 relationship 39018 between the CreditWorthinessMessage entity 39008 and the CreditWorthiness entity 39016.

The CreditWorthiness 16 identifies the creditworthiness of a party, and includes details of the score, risk class, and credit limit, if required. The CreditWorthiness entity 39016 includes an Indicator, a CheckingDescription, and a CreditSegmentInternalID. The Indicator specifies whether the creditworthiness of the party exists for the query parameters, and is of type GDT: CreditWorthinessIndicator. The CheckingDescription includes a description of the process of the creditworthiness check, and is of type GDT: Description. The CheckingDescription is optional. The CreditSegmentInternalID is the proprietary identifier of the credit segment for which the creditworthiness check is carried out. A credit segment is a unit of the business of a company from the viewpoint of credit assignment and credit control. One of the uses of a credit segment is to monitor the credit limits of parties. The CreditSegmentInternalID is of type GDT: CreditSegmentInternalID.

The CreditSegmentInternalID is used when both the sender and the recipient can access shared master data for the credit segment. If this is not the case, the credit segment is derived from other elements (for example, CreditorParty, SellerParty, or ProductCategory). The most important information about the creditworthiness of a party is retained in the element CreditWorthinessIndicator and in the entity Rating in the CreditWorthinessInformation package.

(i) Credit Worthiness Party Package

The CreditWorthinessParty package 39010 includes a DebtorParty entity 39020, a CreditorParty entity 39022, and a SellerParty entity 39024. There is a 1:1 relationship 39026 between the CreditWorthiness entity 39016 and the DebtorParty entity 39020. There is a 1:c relationship 39028 between the CreditWorthiness entity 39016 and the CreditorParty entity 39022. There is also a 1:c relationship 39030 between the CreditWorthiness entity 39016 and the SellerParty entity 39024.

The DebtorParty identifies the party whose creditworthiness was determined (i.e., the Debtor Party). The DebtorParty entity 39020 is of type GDT BusinessTransactionDocumentParty; where the element InternalID is used. The Debtor Party is typically specified.

The CreditorParty identifies the party that owns a receivable due from the Debtor Party. The CreditorParty entity 39022 is of type GDT BusinessTransactionDocumentParty; where the element InternalID is used. Parties that are assigned to the credit segment in which the creditworthiness was determined are typically specified.

The SellerParty identifies a party that can sell a product to a Debtor Party. The SellerParty entity 39024 is of type GDT BusinessTransactionDocumentParty; where, in one implementation, the element InternalID is used. Parties that are assigned to the credit segment in which the creditworthiness was determined are specified.

(ii) Credit Worthiness Query Product Information Package

The CreditWorthinessQueryProductInformation package 39012 includes a ProductCategory entity 39032, which identifies the product category of the product sold to, or to be sold to, the Debtor Party. There is a 1:c relationship 39034 between the CreditWorthiness entity 39016 and the ProductCategory entity 39032.

The ProductCategory entity 39032 is of type GDT BusinessTransactionDocumentProductCategory; where, in one implementation, the element InternalID is used. Product categories that are assigned to the credit segment in which the creditworthiness was determined are specified.

(iii) Credit Worthiness Information Package

The CreditWorthinessInformation package 39014 includes a summary of details of the creditworthiness determined for a party, and includes a CreditRating entity 39036, a CreditRiskClass entity 39038, a CreditLimit entity 39040, and a CreditExposure entity 39041. There is a 1:1 relationship 39042 between the CreditWorthiness entity 39016 and the CreditRating entity 39036. There is a 1:c relationship 39044 between the CreditWorthiness entity 39016 and the CreditRiskClass entity 39038. There is also a 1:c relationship 39046 between the CreditWorthiness entity 39016 and the CreditLimit entity 39040. There is a 1:c relationship 39047 between the CreditExposure entity 39041 and the CreditRiskClass entity 39038.

The CreditRating identifies the score of a business party determined by Credit Management, which is valid for a specific period. The CreditRating entity 39036 includes a Code and a ValidityPeriod. The Code is the encoded representation of the score value, and is of type GDT: CreditRatingCode. The ValidityPeriod is the validity period for the credit score, and is of type GDT: DateTimePeriod, where the element "Duration" is not used. Credit Management provides the list of possible CreditRatingCodes. "CreditRating" and "Rating" are used interchangeably.

The CreditRiskClass identifies the risk of non-payment determined by Credit Management, which is valid for a specific period, and may be linked to a business contract. The CreditRiskClass entity 39038 includes a RiskClass and a ValidityPeriod. The RiskClass is the encoded representation of the risk class, and is of type GDT: CreditRiskClassCode. The ValidityPeriod is the validity period for the credit risk class, and is of type GDT: DateTimePeriod, where the element "Duration" is not used. Credit Management provides the list of CreditRiskClassCodes. "CreditRiskClass" and "RiskClass" are used interchangeably.

The CreditLimit identifies the credit limit valid for a business party for a specific period. The CreditLimit entity 39040 includes an Amount and a ValidityPeriod. The Amount is the amount of the credit limit, and is of type GDT: Amount. The ValidityPeriod is the validity period for the credit limit, and is of type GDT: DateTimePeriod, where the element "Duration" is not used.

The CreditExposure entity 39041 describes how much of the credit limit for the credit account is already consumed. The Credit Exposure entity 39041 contains the element: Amount. Amount of the credit exposure GDT: Amount.

(4) Message Data Type Element Structure (a) CreditWorthiness Query

FIG. 391 depict the element structure for CreditWorthinessQuery. The element structure is similar to the data model, but provides additional information regarding the details of the interface. The element structure identifies the different packages 39100 in the interface, and represents the entities at various levels within the interface. As depicted in FIGS. 391A-B, the interface for CreditWorthinessQuery includes four levels 39102, 39104, 39106, and 39108. The element structure identifies the cardinality or occurrence 39110 between the entities of the interface, and provides information such as the data type 39112 that provides the basis for the entity or element. The outermost package 39100 of this interface is an CreditWorthinessQueryMessage package 39114, which includes a CreditWorthinessQueryMessage entity 39116 at the first level 39102. The CreditWorthinessQueryMessage entity 39116 is of type message data type ("MDT") 391 CreditWorthinessQueryMessage 39118.

The CreditWorthinessQueryMessage package 39114 includes a CreditWorthinessQuery package 39120. The CreditWorthinessQuery package 39120 includes a CreditWorthinessQuery entity 39122. There is one 39124 CreditWorthinessQuery entity 39122 for each CreditWorthinessQueryMessage entity 39116. The CreditWorthinessQuery entity 39122 is of type AGDT CreditWorthinessQuery 39126. The CreditWorthinessQuery entity 39122 includes a CreditSegmentInternalID 39128, a CheckedAmount 39134, a CheckingRuleCode 39140, a CheckingSeverityCode 39146, and a CreditAgencyReportRetrievalPermissionIndicator 39152.

There is zero or one 39130 CreditSegmentInternalID 39128 for each CreditWorthinessQuery entity 39122. The CreditSegmentInternalID 39128 is of type GDT CreditSegmentInternalID 39132. A CheckedAmount 39134 has zero or one occurrences 39136 for each CreditWorthinessQuery entity 39122, and is of type GDT Amount 39138. CheckingRuleCode 39140 has zero or one occurrences 39142 for each CreditWorthinessQuery entity 39122, and is of type GDT CreditWorthinessCheckingRuleCode 39144. CheckingSeverityCode 39146 has zero or one occurrences 39148 for each CreditWorthinessQuery entity 39122, and is of type GDT CreditWorthinessSeverityCode 39150. CreditAgencyReportRetrievalPermissionIndicator 39152 has one occurrence 39154 for each CreditWorthinessQuery entity 39122, and is of type GDT CreditAgencyReportRetrievalPermissionIndicator 39156.

The CreditWorthinessQuery package 39120 also includes a Party package 39158 and a ProductInformation package 39160. The Party package 39158 includes a DebtorParty entity 39162, a CreditorParty entity 39174, and a SellerParty entity 39186. The DebtorParty entity 39162 is of type GDT BusinessTransactionDocumentParty 39166. There is one 39164 DebtorParty entity 39162 for each CreditWorthinessQuery entity 39122. The CreditorParty entity 39174 is of type GDT BusinessTransactionDocumentParty 39178. There is zero or one 39176 CreditorParty entity 39174 for each CreditWorthinessQuery entity 39122. The SellerParty entity 39186 is of type GDT BusinessTransactionDocumentParty 39190. There is zero or one 39188 SellerParty entity 39186 for each CreditWorthinessQuery entity 39122. The DebtorParty entity 39162 includes an InternalID 39168 that has one 39170 occurrence for each DebtorParty entity 39162, and is of type GDT PartyInternalID 39172. The CreditorParty entity 39174 includes an InternalID 39180 that has one 39182 occurrence for each CreditorParty entity 39174, and is of type GDT PartyInternalID 39184. The SellerParty entity 39186 includes an InternalID 39192 that has one 39194 occurrence for each SellerParty entity 39186, and is of type GDT PartyInternalID 39190.

The ProductInformation package 39160 includes a ProductCategory entity 39198. The ProductCategory entity 39198 is of type GDT BusinessTransactionDocumentProductCategory 39102A. There is zero or one 39100A ProductCategory entity 39198 for each CreditWorthinessQuery entity 39122. The ProductCategory entity 39198 includes an InternalID 39104A having one 39106A occurrence for each ProductCategory entity 39198, and a data type of GDT ProductCategoryInternalID 39108A.

(b) CreditWorthiness Response

FIG. 390 depict the element structure for CreditWorthinessResponse. The element structure is similar to the data model, but provides additional information regarding the details of the interface. The element structure identifies the different packages 39200 in the interface, and represents the entities at various levels within the interface. As depicted in FIGS. 392A-C, the interface for CreditWorthinessResponse includes four levels 39202, 39204, 39206, and 39208. The element structure identifies the cardinality or occurrence 39210 between the entities and/or elements of the interface, and provides information such as the data type 39212 that provides the basis for the entity or element. The outermost package of this interface is a CreditWorthinessMessage package 39214, which includes an CreditWorthinessMessage entity 39216 at the first level 39202. The CreditWorthinessMessage entity 39216 is of type message data type ("MDT") CreditWorthinessMessage 39218.

The CreditWorthinessMessage package 39214 includes a CreditWorthiness package 39220. The CreditWorthiness package 39220 includes a CreditWorthiness entity 39222, a Party package 39246, a Product Information package 39248, a CreditworthinessInformation package 39250, a DebtorPartyBlockedIndicator, and a DebtorPartySpecialAttentionRequiredIndicator 39251. There is one 39224 CreditWorthiness entity 39222 for each CreditWorthinessMessage entity 39216. The CreditWorthiness entity 39222 is of type AGDT CreditWorthiness 39226. The CreditWorthiness entity 39222 includes a CreditSegmentInternalID 39228, an Indicator 39234, and a CheckingDescription 39240.

There is zero or one 39230 CreditSegmentInternalID 39228 for each CreditWorthiness entity 39222. The CreditSegmentInternalID 39228 is of type GDT CreditSegmentInternalID 39232. An Indicator 39234 has zero or one 39236 occurrences for each CreditWorthiness entity 39222, and is of type GDT CreditWorthinessIndicator 39238. CheckingDescription 39240 has any number of occurrences 39242, and is of type GDT Description 39244. The DebtorPartyBlockedIndicator 39245 has a cardinality of zero or one 39247, and the type is CDT 39249. The DebtorPartySpecialAttentionRequiredIndicator 39251 has a cardinality of zero or one 39253, and the type is CDT 39255.

The Party package 39246 includes a DebtorParty entity 39252, a CreditorParty entity 39264, and a SellerParty entity 39276. The DebtorParty entity 39252 is of type GDT BusinessTransactionDocumentParty 39256. There is one 39254 DebtorParty entity 39252 for each CreditWorthiness entity 39222. The CreditorParty entity 39264 is of type GDT BusinessTransactionDocumentParty 39268. There is any number of occurrances 39266 of the CreditorParty 39264 for each CreditWorthiness entity 39222. The SellerParty entity 39276 is of type GDT BusinessTransactionDocumentParty 39280. There is any number of occurrences 39278 of the SellerParty entity 39276 for each CreditWorthiness entity 39222. The DebtorParty entity 39252 includes an InternalID 39258 that has one 39260 occurrence for each DebtorParty entity 39252. The InternalID 39258 is of type GDT PartyInternalID 39262. The CreditorParty entity 39264 includes an InternalID 39270 that has one 39272 occurrence for each CreditorParty entity 39264. The InternalID 39270 is of type GDT PartyInternalID 39274. The SellerParty entity 39276 includes an InternalID 39282 that has one 39284 occurrence for each SellerParty entity 39276. The InternalID 39282 is of type GDT PartyInternalID 39286.

The ProductInformation package 39248 includes a ProductCategory entity 39288. The ProductCategory entity 39288 is of type GDT BusinessTransactionDocumentProductCategory 39292. There is any number of occurrances 39290 of ProductCategory entities 39288 for each CreditWorthiness entity 39222. The ProductCategory entity 39288 includes an InternalID 39294 having one 39296 occurrence. The InternalID 39294 is of type GDT ProductCategoryInternalID 39298.

The CreditworthinessInformation package 39250 includes a CreditRating 39200A, CreditRiskClass 39216A, CreditLimit 39232A, and a CreditExposure package 39248A The CreditRating 39200A has one 39202A occurrence and includes a Code 39204A and a Validity Period 39210A. The Code 39204A has one occurrence 39206A for each CreditRating 39200A, and is of type GDT CreditRatingCode 39208A. The ValidityPeriod 39210A has one or zero occurrences 39212A for each CreditRating 39200A, and is of type GDT DateTimePeriod 39214A. The CreditRiskClass entity 39216A has one or zero occurrences 39218A and includes a Code 39220A and a Validity Period 39226A. The Code 39220A has one occurrence 22A, and is of type GDT CreditRiskClassCode 39224A. The ValidityPeriod 39226A has one or zero occurrences 28A, and is of type GDT DateTimePeriod 39230A. The CreditLimit entity 39232A has one or zero occurrences 39234A, and includes an Amount 39236A and a ValidityPeriod 39242A. The Amount 39236A has one occurrence 39238A for each CreditLimit entity 39232A, and is of type GDT Amount 39240A. The ValidityPeriod 39242A has one or zero occurrences 39244A, and is of type GDT DateTimePeriod 39246A. The CreditExposure package 39248A has one zero occurances 39250A. The Amount 39252A has one occuence 39254A, and is of type GDT 39256A.

l) Credit Agency Report Interfaces

CreditAgencyReport interfaces are used to request credit information about a party from a credit agency. An agency provides business information about private or business relationships of other parties, particularly with regard to their creditworthiness (for example, Dun & Bradstreet or Schufa). With the information received about the creditworthiness assessment, about payment reliability, and other financial information, a company can then determine a creditworthiness score for the party. The CreditAgencyReport interfaces are based on two message types: (1) the CreditAgencyReportQuery structures the message for requesting credit information; and (2) the CreditAgencyReportResponse structures the response message that includes the required credit information.

In a company, credit management is responsible for checking the creditworthiness of parties and for real-time monitoring of the total liability of parties using dynamic credit limits. The tasks of a credit manager include the final acceptance or refusal of requests (credit decision) and the procurement and management of collateral that reduces the risk of losses on receivables from parties. Creditworthiness checks are carried out using both internal and external information. The information about the creditworthiness can be provided on request from credit management (CreditWorthinessQuery & CreditWorthinessResponse) or as an unsolicited notification to credit management based on internal company rules (CreditWorthinessChangeInformation).

Creditworthiness checks therefore are based on: (1) credit information about parties provided by information providers (CreditAgencyReportQuery & CreditAgencyReportResponse); (2) information about existing payment obligations of the party; this information can be obtained actively by Credit Management (CreditCommitmentQuery & CreditCommitmentResponse) or Credit Management receives it, for example, from Sales according to internal company rules (CreditCommitmentRecordNotification); and (3) notifications about the payment behavior of parties that Credit Management receives from Payment (CreditPaymentRecordNotification). Credit Management also can provide information internally on request about parties whose creditworthiness is classified as critical (CreditWorthinessCriticalPartiesQuery & CreditWorthinessCriticalPartiesResponse).

Credit Management sends a query about a party to the Web server of an agency; the agency determines the information required (for example, based on industry, size of company) and returns it. This information is processed further in the "Credit Rules Engine." A score and an internal credit limit are determined as the result of a series of flexible rules that are based on a company's own experience with the party and the creditworthiness data from the agency.

(1) Message Types (a) Credit Agency Report Query

The CreditAgencyReportQuery is an inquiry to a credit agency for credit information about a party. The message type CreditAgencyReportQuery is based on the message data type CreditAgencyReportQueryMessage. The B2B CreditAgencyReportQuery is transformed into the query format of the respective credit agency within the Exchange Infrastructure.

(b) Credit Agency Report Response

The CreditAgencyReportResponse is the response from a credit agency to the inquiry for credit information about a party. The message type CreditAgencyReportResponse is based on the message data type CreditAgencyReportMessage. The response message of the credit agency is transformed into the format of the B2B CreditAgencyReportResponse within the Exchange Infrastructure.

(2) Message Choreography

FIG. 393 depicts the message choreography for an exemplary credit agency report and query process. The choreography involves two business entities: a CreditManagement entity of a company 39302 and a CreditManagement entity 39304, which may be an agency separate from the company. The CreditManagement entity 39302 may periodically receive notifications from other departments of the company, e.g., Payment/Accounting 39306, Sales/Financials 39308, or Billing Systems 39310, about the existing payment obligations of parties or about payments received from these parties. The CreditManagement entity 39302 uses this information to answer queries from various company areas about the creditworthiness of parties, taking into account, in some circumstances, credit information from external credit agencies and querying current payment obligations. CreditManagement 39302 may also actively provide information about changes to the creditworthiness of parties or, on request, name parties whose creditworthiness is classified as critical.

As shown in FIG. 393, the CreditManagement entity 39302 sends a CreditAgencyReportQuery 39314 to the CreditAgency entity 39304 based on payment obligations of parties or about payments received from these parties received from the other company department. In response, the CreditAgency entity 39304 sends a CreditAgencyReportResponse 39316 to the CreditManagement entity 39302. In one implementation, the transmission of the messages takes place synchronously. Serialization of the message is not necessary.

(3) Message Data Type Credit Agency Report Query Message

FIG. 394 depicts the data model for the MessageDataTypeCreditAgencyReportQueryMessage used to implement a CreditAgencyReportQuery message 39314. The message data type CreditAgencyReportQueryMessage groups the business information that is relevant for sending a business document in a message and the object CreditAgencyReportQuery included in the business document. The message data type CreditAgencyReportQueryMessage includes a CreditAgencyReportQueryMessage package 39400. The CreditAgencyReportQueryMessage package 39400 includes a MessageHeader package 39402, a CreditAgencyReportQueryPackage 39404, and a CreditAgencyReportQueryMessage entity 39406.

(a) Message Header Package

The MessageHeader package 39402 groups the business information that is relevant for sending a business document in a message. The MessageHeader 39402 package includes a MessageHeader entity 39408, a SenderParty entity 39410 and a RecipientParty entity 39412. The MessageHeader entity 39408 groups business information from the viewpoint of the sending application to identify the business document in a message, information about the sender, and information about the recipient. The MessageHeader entity 39408 is of the type GDT: BusinessDocumentMessageHeader. There is a 1:c relationship 39414 between the CreditAgencyReportQueryMessage entity 39406 and the MessageHeader entity 39408. There is a 1:c relationship 39416 between the MessageHeader entity 39408 and the SenderParty entity 39410. There is a 1:cn relationship 39418 between the MessageHeader entity 39408 and the RecipientParty entity 39412.

The MessageHeader entity 39408 includes an ID and a CreationDateTime. The ID is a unique identifier for the message, and is of type GDT: MessageID. The CreationDateTime is the creation date and time of the message, and is of type GDT: DateTime The SenderParty entity 39410 identifies the party responsible for sending a business document at the business application level. The SenderParty entity 39410 is of type GDT: BusinessDocumentMessageHeaderParty. The InternalID of the data type is used.

The RecipientParty entity 39412 identifies the party responsible for receiving a business document at the business application level. The RecipientParty entity 39412 is of type GDT: BusinessDocumentMessageHeaderParty and may include an InternalID of type GDT: Party Internal ID.

(b) Credit Agency Report Query Package

The CreditAgencyReportQuery Package 39404 includes a CreditAgencyReportQueryParty or Party package 39420, a CreditAgencyReportQueryService or service package 39422, and a CreditAgencyReportQuery entity 39424. The CreditAgencyReportQuery entity 39424 identifies the query to a credit agency for credit information about a party. The CreditAgencyReportQuery entity 39424 includes details about the party for whom credit information is required, together with a specification of the service required by the agency. The CreditAgencyReportQuery entity 39424 includes a ReasonCode, which is a reason for the query to the credit agency, and is of type GDT: CreditAgencyReportQueryReasonCode. There is a 1:1 relationship 39426 between the CreditAgencyReportQueryMessage entity 39406 and the CreditAgencyReportQuery entity 39424.

(i) Credit Agency Report Query Party Package

The CreditAgencyReportQueryParty Package 39420 includes a DebtorParty entity 39428, which identifies the party about whom credit information is to be provided. There is a 1:1 relationship 39430 between the CreditAgencyReportQuery entity 39424 and the DebtorParty entity 39428. The DebtorParty entity 39428 includes a StandardID, a CreditAgencyID, an Address, an IncorporationDate, and a BirthDate. The StandardID is the standardized identifier of the party to be checked, and is of type GDT: PartyStandardID. The CreditAgencyID is the identifier given by the credit agency for the party to be checked, and is of type GDT: PartyPartyID. The Address is the address of the party to be checked, and is of type GDT: Address, where FunctionalTitleName, DepartmentName, Office, TaxJurisdictionCode, TimeZoneDifferenceValue, and GeoCoordinates need not be used. The IncorporationDate is the incorporation date of a company, if the party to be checked is a company, and is of type GDT: Date. The BirthDate is the date of birth of a natural person, if the party to be checked is a natural person, and is of type GDT: Date. The elements IncorporationDate and BirthDate need not be used together.

As many details as possible are given about a party so that it can be uniquely identified by the credit agency. Data protection considerations are pushed into the background because, firstly, the party has given consent for credit information to be obtained, and secondly, the credit agency is obliged to handle data transmitted confidentially. In addition, it is part of the service in some credit agencies (for example, Schufa) to check the details of a party (address, bank details, credit card number, and so on).

(c) Credit Agency Report Query Service Package

The CreditAgencyReportQueryService package 39422 includes a summary of all information about the type and scope of the service required from the credit agency, and includes a Service entity 39432, which specifies the type and scope of the service required from the credit agency. There is a 1:1 relationship 39434 between the CreditAgencyReportQuery entity 39424 and the Service entity 39422. The Service entity 39422 includes a CreditAgencyID and a LanguageCode. The CreditAgencyID is the identifier provided by the credit agency for the service required (according to the agency service catalog), and is of type GDT: ProductPartyID. The LanguageCode is the language in which the results of the service required are to be provided, and is of type GDT: LanguageCode.

(4) Message Data Type Credit Agency Report Message

FIGS. 395A and B depict the data model for a message data type CreditAgencyReportResponse used to implement a CreditAgencyReportResponse message 39316. The message data type CreditAgencyReportResponse includes a CreditAgencyReportMessage package 39500. The CreditAgencyReportMessage package 39500 groups the business information that is relevant for sending a business document in a message and the object CreditAgencyReport included in the business document. The CreditAgencyReportMessage package 39500 includes a MessageHeader package 39502, a CreditAgencyReport package 39504, and a CreditAgencyReportMessage entity 39506.

(a) Message Header Package

The MessageHeader package 39502 groups the business information that is relevant for sending a business document in a message. It includes a MessageHeader entity 39508, which groups together the business information from the point of view of the sending application to identify the business document in a message, information about the sender, and information about the recipient. There is a 1:c relationship 39510 between the MessageHeader entity 39508 and the CreditAgencyReportMessage entity 39506. The MessageHeader is of type GDT: BusinessDocumentMessageHeader. It includes an ID, a ReferenceID, and a CreationDateTime. The ID is a unique identifier for the message, and is of type GDT: MessageID. The ReferenceID is a unique identifier for the message for the request resulting in the CreditAgencyReportResponse, and is of type GDT: MessageID. The CreationDateTime is the creation date and time of message, and is of type GDT: DateTime.

(b) Credit Agency Report Package

The CreditAgencyReport package 39504 includes a CreditAgencyReportCreationLog or Log package 39512, a CreditAgencyReportParty or party package 39514, a CreditWorthinessInformation package 39516, a LegalInformation package 39518, and a CreditAgencyReport entity 39520. There is a 1:1 relationship 39522 between CreditAgencyReportMessage entity 39506 and the CreditAgencyReport entity 39520.

(i) Credit Agency Report

The CreditAgencyReport entity 39520 identifies the credit information issued by the credit agency for a party. The CreditAgencyReport entity 39520 includes the credit information required about a party, with details about the creation of this information.

(ii) Credit Agency Report Creation Log

The CreditAgencyReportCreationLog package 39512 includes a CreationLog entity 39524, which includes a sequence of log messages about the creation of credit information. The CreationLog entity 39524 includes an Item entity 39526. There is a 1:c relationship 39528 between the CreditAgencyReport entity 39520 and the CreationLog entity 39524. There is a 1:n relationship 39530 between the CreationLog entity 39524 and the Item entity 39526.

The Item entity 39526 includes a log message about the creation of credit information, and is of type GDT: LogItem. It includes a TypeID, a SeverityCode, and a Note. The TypeID is a unique identification of the type of a log entry (within the application that created the log). The SeverityCode is a coded representation of the severity of the log message, and is of type GDT: LogItemSeverityCode. The Note is text of the log message, and is of type GDT: Note.

(iii) Credit Agency Report Party Package

The CreditAgencyReportParty package 39514 includes a DebtorParty entity 39532, which identifies the party about whom credit information is to be provided. There is a 1:c relationship 39534 between the CreditAgencyReport entity 39520 and the DebtorParty entity 39532. The DebtorParty entity 39532 includes a StandardID, a CreditAgencyID, an Address, an IncorporationDate, and a BirthDate. The StandardID is the standardized identifier of the party to be checked, and is of type GDT: PartyStandardID. The CreditAgencyID is the identifier given by the credit agency for the party to be checked, and is of type GDT: PartyPartyID. The Address is the address of the party to be checked, and is of type GDT: Address, where FunctionalTitleName, DepartmentName, Office, TaxJurisdictionCode, TimeZoneDifferenceValue, GeoCoordinates need not be used. The IncorporationDate is the incorporation date of a company, if the party to be checked is a company, and is of type GDT: Date. The BirthDate is the date of birth of a natural person, if the party to be checked is a natural person, and is of type GDT: Date. The elements IncorporationDate and BirthDate need not be used together.

(iv) Credit Agency Report Credit Worthiness Information Package

The CreditAgencyReportCreditWorthinessInformation package 39516 includes a summary of the details regarding the creditworthiness of a party in credit information. The CreditAgencyReportCreditWorthinessInformation package 39516 includes a CreditRating entity 39536, a CreditRiskClass entity 39538, a Scoring entity 39540, and a CreditLimit entity 39542. There is a 1:1 relationship 39544 between the CreditAgencyReport entity 39520 and the CreditRating entity 39536. There is a 1:c relationship 39546 between the CreditAgencyReport entity 39520 and the CreditRiskClass entity 39538. There is a 1:cn relationship 39548 between the CreditAgencyReport entity 39520 and the Scoring entity 39540. There is a 1:cn relationship 39550 between the CreditAgencyReport entity 39520 and the CreditLimit entity 39542.

The CreditRating entity 39536 includes the score of a business party determined by the credit agency, which is valid for a specific period. The CreditRating entity 39536 includes a Code and a ValidityPeriod. The Code is the coded representation of the score value, and is of type GDT: CreditRatingCode. The ValidityPeriod is the validity period for the score value, and is of type GDT: DatePeriod.

The CreditRiskClass entity 39538 identifies the risk class of a party determined by the credit agency, which is valid for a specific period. The CreditRiskClass entity 39538 includes a Code and a ValidityPeriod. The Code is the coded representation of the risk class, and is of type GDT: CreditRiskClassCode. The ValidityPeriod is the validity period for the risk class, and is of type GDT: DatePeriod.

The Scoring entity 39540 identifies the result of the rating of a party with regard to their creditworthiness using a scorecard specified by a credit agency. The scorecard is a schema for rating a party using different characteristics. The Scoring entity 39540 is of type GDT: CreditAgencyReportScoring. Individual or few characteristics are examined for each scorecard; i.e., several scorecards or several scorings are necessary for a comprehensive rating.

The CreditLimit entity 39542 identifies the credit limit valid for a party for a specific period. The CreditLimit entity 39542 includes an Amount and a ValidityPeriod. The Amount is the amount of the credit limit, and is of type GDT: Amount. The ValidityPeriod is the validity period for the credit limit, and is of type GDT: DatePeriod. Due to the different validity periods, there may be more than one credit limit for a party.

(v) Credit Agency Report Legal Information Package

The CreditAgencyReportLegalInformation package 39518 includes a summary of the details regarding the legal facts related to the credit information. The CreditAgencyReportLegalInformation package 39518 includes a LegalEvent entity 39552, which identifies a legal event that affects the creditworthiness of a party. There is a 1:cn relationship 39554 between the CreditAgencyReport entity 39520 and the LegalEvent entity 39552. The LegalEvent entity 39552 includes a TypeCode, a Date and a Description. The TypeCode is the coded representation of the legal event, and is of type GDT: LegalEventTypeCode. The Date is the date of the legal event, and is of type GDT: Date. The Description is the description of the legal event, and is of type GDT: Description. There may be several legal events for one party. Examples of legal events include affidavits, warrants, insolvencies, and seizures.

(5) Message Data Type Element Structure

FIGS. 396A-E depict the element structure for CreditAgencyReportQuery. The element structure is similar to the above-described data model of the message data type CreditAgencyReportQuery in FIG. 394, but provides additional information regarding the details for interfacing with or implementing a CreditAgencyReportQuery. The element structure identifies the different packages 39600 in the interface, and represents the entities at various levels within the interface. As shown in FIG. 396A, the interface for a CreditAgencyReportQuery includes four levels 39602, 39604, 39606, and 39608 each of which is associated with a respective package 39600. The element structure identifies the cardinality or occurrences 39610 of each element and provides a data type name 39612 for each element.

The outermost package of this interface is CreditAgencyReportQuery package 39614, which includes a CreditAgencyReportQueryMessage entity 39616 at the first level 39602. The CreditAgencyReportQueryMessage entity 39616 is of data type MDT: CreditAgencyReportQueryMessage 39618.

The CreditAgencyReportQueryMessage package 39614 includes a MessageHeader package 39620, which includes a MessageHeader entity 39624. The MessageHeader entity 39624 is of data type GDT: MessageHeader 39628. There is one 39626 MessageHeader entity 39624 for each CreditAgencyReportQueryMessage entity 39616.

The MessageHeader entity 39624 includes an ID 39630, a Reference ID 39636, a CreationDateTime 39642, a Sender Party entity 39648 and a Recipient Party entity 39660. The ID 39630 is of data type GDT: BusinessDocumentMessageID 39634. There is one 39632 ID 39630 for each MessageHeader entity 39624. The ReferenceID 39636 is of data type GDT: BusinessDocumentMessageID 39640. There is one or zero 39638 ReferenceID 39636 for each MessageHeader entity 39624. The CreationDateTime 39642 is of data type GDT: DateTime 39646. There is one 39644 CreationTimeData 39642 for each MessageHeader 39624. The SenderParty entity 39648 includes one 39656 InternalID 39654 of the GDT: PartyInternalID 39652 and is of type of GDT: BusinessDocumentMessageHeaderParty 39652. There is one or zero 39650 SenderPartyEntity 39648 for each MessageHeader entity 39624. The RecipientParty entity 39660 includes one 39648 InternalID 39666 of type GDT: PartyInternalID 39670 and is of data type GDT: BusinessDocumentMessageHeaderParty 39664. There is any number 39662 of RecipientParty entities 39660 for each MessageHeader entity 39624.

The CreditAgencyReportQueryMessage package 39614 also includes a CreditAgencyReportQuery package 39622, which includes a CreditAgencyReportQuery entity 39672, a Party package 39684, and a Service package 39686. The CreditAgencyReportQuery entity 39672 is of data type AGDT: Item 39676. In one implementation, there is one 39674 CreditAgencyReportQuery entity for each CreditAgencyReportQueryMessageEntity 39616.

The CreditAgencyReportQuery entity 39672 includes a Reason entity 39678, which has one occurrence 39680 for each entity 39672 and has a data type GDT: CreditAgencyReportQueryReasonCode 39682.

The Party package 39684 includes a DebtorParty entity 39688 of type GDT: BusinessTransactionDocumentParty 39692. The DebtorParty entity 39688 incudes a StandardID 39694, a Credit AgencyID 39600A, an Address 39606A, an IncorporationDate 39612A, and a BirthDate 39618A. The StandardID 39694 is of type GDT: PartyStandardID 39698. The CreditAgencyID 39600A is of type of GDT: PartyPartyID 39604A. The Address 39606A is of type GDT: Address 39610A. The IncorporationDate 39612A is of type GDT: Date. The BirthDate 39618A is of type DT: Date 39622A. In one implementation, for each DebtorParty 39688, there is one or zero 39696 StandardID 39694, one or zero 39602A CreditAgencyID 39600A, one or zero 39608A Address 39606A, one or zero 39614A IncorporationDate 39612A, and one or zero 39620A BirthDate 39618A.

The Service package 39686 includes a Service entity 39624A. There is one 39626A Service entity 39624A for each CreditAgencyReportQuery entity 39672. The Service entity 39624A includes one 39630A CreditAgencyID 39628A of type GDT: ProductPartyID 39632A. There is one 39630A CreditAgencyID 39628A for each Service entity 39624A.

FIG. 397 depicts the element structure for CreditAgencyReportResponse. The element structure identifies the different packages 39700 in the interface, and represents the entities at various levels within the interface. As shown in FIG. 397, the interface for CreditAgencyReportResponse includes five levels 39702, 39704, 39706, 39708, and 39710. The element structure identifies the cardinality or number of occurrences 39712 of each element and provides a data type name 39714 for each element.

The outermost package of this interface is CreditAgencyReportMessage package 39716, which includes a CreditAgencyReportMessage entity 39718 at the first level 39702. The CreditAgencyReportMessage entity 39718 is of data type MDT: CreditAgencyReportMessage 39720.

The CreditAgencyReportMessage package 39716 includes a MessageHeader package 39722 and a CreditAgencyReport package 39724. The MessageHeader package 39722 includes a MessageHeader entity 39726, is of data type GDT: MessageHeader 39730. There is one 39728 MessageHeader entity 39726 for each CreditAgencyReportMessage entity 39718.

The MessageHeader entity 39726 includes an ID 39732, a ReferenceID 39738, a CreationDateTime 39744, a SenderParty 39750, and a RecipientParty 39762. The ID 39732 has one occurrence 39734 for each MessageHeader entity 39726 and is of data type GDT: BusinessDocumentMessageID 39736. The ReferenceID 39738 has zero or one occurrences 39740A for each MessageHeader entity 39726 and is of data type GDT: BusinessDocumentMessageID 39742. The CreationDateTime 39744 has one occurrence 39746 for each MessageHeader entity 39726 and is of data type GDT: DateTime 39748.

The SenderParty 39750 includes one 39758 InternalID 39756 of data type GDT: PartyInternalID 39760. The RecipientParty 39762 includes one 39770 InternalID 39768 of datatype GDT: PartyInternalID 39772. The RecipientParty 39762 is of data type GDT: BusinessDocumentMessageHeaderParty 39766. There is any number 39764 of RecipientParties 39762 for each MessageHeader entity 39726.

The CreditAgencyReport package 39724 includes a CreationLog package 39780, a Party package 39782, a CreditWorthinessInformation package 39784, a Legal Information package 39786, and a CreditAgencyReport entity 39774. The CreditAgencyReport entity 39774 has one occurrence 39776 for each CreditAgencyReportMessage entity 39718 and is of data type GDT: CreditAgencyReport 39778.

The CreationLog package 39780 includes a CreationLog entity 39788 in the second level L2 39704. The CreationLog entity 39788 includes an Item entity 39792 in the third level L3 39706. The Item entity 39792 has a TypeID 39798, a SeverityCode 39704A, and a Note 39710A. The CreationLog entity 39788 has zero or one occurrences 39790 for each CreditAgencyReport entity 39774. The Item entity 39792 has 1 to n occurrences 39794 for each CreationLog entity 39788 and is of data type GDT: LogItem 39796. The TypeID 39798 has zero or one occurrences 39700A for each Item entity 39792 and is of data type xsd: token 39702A. The SeverityCode 39704A has zero or one occurrences 39706A for each Item entity 39792 and is of data type GDT: LogItemSeverityCode 39708A. The Note 39710A has one occurrence 39712A for each Item entity 39792 and is of data type GDT: Note 39714A.

The Party package 39782 inclues a DebtorParty entity 39716A. The DebtorParty entity 39716A has one occurrence 39718A for each CreditAgencyReport entity 39774 and is of data type GDT: BusinessTransactionDocumentParty 39720A. The DebtorParty entity 39716A includes a StandardID 39722A, a CreditAgencyID 39728A, an Address 39734A, an IncorporationDate 39740A, and a BirthDate 39746A. The StandardID 39722A has zero to n occurrences 39724A for each DebtorParty entity 39716A and is of data type GDT: PartyStandardID 39726. The CreditAgencyID 39728A has zero or one occurrences 39730A for each DebtorParty entity 39716A and has a data type of GDT: PartyPartyID 39732A. The Address 39734A has one occurrence 39736A for each DebtorParty entity 39716A and is of data type GDT: Address 39738A. The IncorporationDate 39740A has zero or one occurrences 39742A for each DebtorParty entity 39716A and is of data type GDT: Date 39744A. The BirthDate 39746A has zero or one occurrences 39748A for each DebtorParty entity 39716A and is of data type GDT: Date 39750A.

The CreditWorthinessInformation package 39784 includes a CreditRating entity 39752A, a CreditRiskClass entity 39768A, a Scoring entity 39784A, and a CreditLimit entity 39708B. The CreditRating entity 39752A has one occurrence 39754A for each CreditAgencyReport entity 39774 and includes a Code 39756A and a ValidityPeriod 39762A. The Code 39756A has one occurrence 39758A for each CreditRating entity 39752A, and is of data type GDT: CreditRatingCode 39760A. The ValidityPeriod 39762A has zero or one occurrence 39764A for each CreditRating entity 39752A and is of data type GDT: DatePeriod 39766A. The CreditRiskClass 39768A has one or zero occurrences 39770A for each CreditAgencyReport entity 39774 and includes a Code 39772A and a ValidityPeriod 39778A. The Code 39772 has one occurrence 39774A for each CreditRiskClass entity 39768A and is of data type GDT: CreditRiskClassCode 39776A. The ValidityPeriod 39778A has zero or one occurrences 39780A for each CreditRiskClass entity 39768A and is of data type GDT: DatePeriod 39782A. The Scoring entity 39784A includes a ScoreCardID 39790A, a ResultValue 39796A, and a Description 39702B. The Scoring entity 39784A has zero to n occurrences 39786A for each CreditAgencyReport entity 39774 and is of data type GDT: CreditAgencyReport Scoring 39788A. The ScoreCardID 39790A has zero or one occurrences 39792A for each Scoring entity 39784A and is of data type 397GDT: ScoreCardID 39794A. The ResultValue 39796A has one occurrence 39798A for each Scoring entity 39784A and a data type xsd: decimal 39700A. The Description 39702B has zero or one occurrences 39704B for each Scoring entity 39784A and is of data type GDT: Description 39706B. The CreditLimit 39708B has zero or n occurrences 39710B for each CreditAgencyReport entity 39774 and includes an Amount 39712B and a ValidityPeriod 39718B. The Amount 39712B has one occurrence 39714B for each CreditLimit entity 39708B and is of data type GDT: Amount 39716B. The ValidityPeriod 39718B has zero or one occurrence 39720B for each CreditLimit entity 39708B and is of data type GDT: DatePeriod 39722B.

The LegalInformation package 39786A includes a LegalEvent entity 39724B. The LegalEvent entity 39724B includes a TypeCode 39728B, a Date 39734B, and a Description 39740B. The LegalEvent entity 39724B has zero to n occurrences 39726B for each Item entity 39774. The TypeCode 39728B has zero or one occurrences 39730B for each LegalEvent entity 39724B and is of data type GDT: LegalEventTypeCode 39732B. The Date 39734B has zero or one occurrences 39736B for each CreditLimit entity 39708B and is of data type GDT: Date 39738B. The Description 39740B has zero or one occurrences 39742B for each CreditLimit entity 39708B and is of data type GDT: Description 39744B.

m) Accounting Cancellation Request

In the business scenario Sell from Stock, a goods receipt or an outgoing invoice is executed and transferred to Accounting. It is then established that this process step is to be cancelled. In this case, a cancellation request for the original message is sent to Accounting and any further recipients affected. One feature of the cancellation message may be that the reference to the original business transaction is transferred; no additional posting information is transferred. The cancellation message defined here is to be used for cancellation of an InvoiceAccountingInformation and an InventoryChangeAccountingInformation. It may also be used for other future messages that create postings in Accounting.

(1) Message Types

For each message type used for a posting in Accounting, there is a corresponding message type for cancelling this posting. Since cancellation requests to Financial Accounting are via reference, they are based on the same message data type AccountingCancellationMessage for messages to Financial Accounting.

(a) Message Type Invoice Accounting Cancellation Request

An InvoiceAccountingCancellationRequest is a request for the cancellation of posting information previously sent to Accounting for an incoming or outgoing invoice or credit memo (InvoiceAccountingNotification). The message type InvoiceAccountingCancellationRequest is based on the message data type AccountingCancellationMessage. In one implementation, Accounting cannot reject the cancellation.

(b) Message Type Inventory Change Accounting Cancellation Request

An InventoryChangeAccountingCancellationRequest is a request for the full cancellation of posting information previously sent to Accounting with respect to a goods movement (InventoryChangeAccountingNotification). The message type InventoryChangeAccountingCancellationRequest is based on the message data type AccountingCancellationMessage. In one implementation, Accounting cannot reject the cancellation.

(2) Message Choreography

FIG. 398 depicts the Message Choreography for the AccountingCancellationRequest interface between Invoicing/Billing 39802 and Accounting 39804. Invoicing/Billing 39802 sends an InvoiceAccountingNotification 39806 to Accounting 39804. Invoicing/Billing 39802 may then send an InvoiceAccountingCancellationRequest 39808 to Accounting 39804.

The receipt of an invoice in invoice verification causes an accounting document to be posted in Accounting. The invoice received can be cancelled and, as a result, leads to a cancellation of the related invoice document in Accounting.

(3) Message Data Type Accounting Cancellation Message

The message data type AccountingCancellationMessage includes the AccountingCancellation object included in the business document and the business information that is relevant for sending a business document in a message. As depicted in FIG. 399, the message data type AccountingCancellationMessage includes an AccountingCancellationMessage package 39900, which includes a MessageHeader package 39902 and an AccountingCancellation package 39904. The AccountingCancellationMessage package 39900 also includes an AccountingCancellationMessage entity 39906. The message data type AccountingCancellationMessage provides the structure for the message type AccountingCancellation and the relevant interfaces.

(a) Message Header Package

A MessageHeader package 39902 groups the business information that is relevant for sending a business document in a message. The MessageHeader is not required for AccountingCancellationRequest. In one implementation, a cancellation is sent to Accounting once. A message ID is not required, since the reference can be established with the ID of the source document. The sender may be known as the "system ID." In one implementation, the recipient is not known; the fact that this message is to be sent to the Accounting application is known.

(b) Accounting Cancellation Package

The AccountingCancellation package 39904 is the grouping of information required for the cancellation of posting information previously sent to Accounting. It includes a BusinessTransactionDocumentReference Package 39908 and an AccountingCancellation entity 39910. There is a 1:1 relationship 39912 between the AccountingCancellationMessage entity 39906 and the AccountingCancellation entity 39910.

(i) Accounting Cancellation

The AccountingCancellation is the cancellation of posting information previously sent to Accounting. The AccountingCancellation entity 39910 identifies the business document to be cancelled by means of the reference and type of business transaction in which the document was created or involved. The AccountingCancellation entity 39910 includes an OriginBusinessTransactionTypeCode, a PostingDate, and a Description. The OriginBusinessTransactionTypeCode is a business transaction type in which the document to be cancelled was created, and is of the type GDT: BusinessTransactionTypeCode. The PostingDate is the date on which the transaction is relevant for Accounting, and is of the type GDT: Date. The Description is a description of the cancellation, and is of the type GDT: Description.

(ii) Business Transaction Document Reference Package

The BusinessTransactionDocumentReference package 39908 groups the references to business documents on which the cancellation transaction is based. The BusinessTransactionDocumentReference package 39908 includes a PrimaNotaReference entity 39914 and an OriginPrimaNotaReference entity 39916. There is a 1:c relationship 39920 between the AccountingCancellation entity 39910 and the OriginPrimaNotaReference entity 39916.

The PrimaNotaReference indicates the reference to the document of the sender which represents the cancellation request to Accounting. The PrimaNotaReference entity 39914 is of type GDT: BusinessTransactionDocumentReference, where the element "ID" is used, since there is no reference to a line item. The PrimaNotaReference entity 39914 is typically filled.

The OriginPrimaNotaReference indicates the reference to the origin document of the sender on which posting information previously sent to Accounting—and now to be cancelled—is based. The OriginPrimaNotaReference entity 39916 is of type GDT: BusinessTransactionDocumentReference where the element "ID" is used since there is no reference to a line item; for example, reference to the document for an invoice, credit memo, or payment, but also the document for an inventory change in the stockholding. The OriginPrimaNotaReference entity 39916 is typically filled.

(4) Message Data Type Element Structure.

FIGS. 400A-B depict the element structure for AccountingCancellationRequest. The element structure is similar to the data model, but provides additional information regarding the details of the interface. The element structure identifies the different packages 40000 in the interface, and represents the entities at various levels within the interface. As depicted in FIGS. 400A-B, the interface for AccountingCancellationRequest includes four levels 40002, 40004, 40006, and 40008. The element structure identifies the cardinality or occurrence 40010 between the entities of the interface, and provides information, e.g., the data type 40012, that provides the basis for the entities or elements. The outermost package of this interface is an AccountingCancellationMessage package 40014, which includes an AccountingCancellationMessage entity 40016 at the first level 40002. There is one 40018 AccountingCancellationMessage entity 40016 for each AccountingCancellationMessage package 40014.

The AccountingCancellationMessage package 40014 also includes an AccountingCancellation package 40020. The AccountingCancellation package 40020 includes an AccountingCancellation entity 40022. There is one 40024 AccountingCancellation entity 40022 for each AccountingCancellationMessage entity 40016. The AccountingCancellation entity 40022 includes an BasePrimaNotaID 40026, a PostingDate 40032, and a Note 40038. The BasePrimaNotaID 40026 is of type GDT BusinessTransactionDocumentID 40030. There is one 40028 BasePrimaNotaID 40026 for each AccountingCancellation entity 40022. The PostingDate 40032 is of type GDT Date 40036, and there is zero or one 40034 PostingDate 40032 for each AccountingCancellation entity 40022. The Note 40038 is of type GDT Note 40042, and there is zero or one 40040 Note 40038 for each AccountingCancellation entity 40022.

The AccountingCancellation package 40020 also includes a BusinessTransactionDocumentReference package 40044. The BusinessTransactionDocumentReference package 40044 includes a OriginPrimaNotaTypeCode entity 40046 and an OriginPrimaNotaReference entity 40058. The OriginPrimaNotaTypeCode entity 40046 is of type GDT BusinessTransactionDocumentTypeCode 40050. There is one 40048 OriginPrimaNotaTypeCode entity 40046 for each AccountingCancellation entity 40022. The OriginPrimaNotaReference entity 40058 is of type GDT BusinessTransactionDocumentReference 40062. There is one 40060 OriginPrimaNotaReference entity 40058 for each AccountingCancellation entity 40022. The OriginPrimaNotaReference entity 40058 includes an ID 40064, which is of type GDT BusinessTransactionDocumentID 40068. The occurrence of the ID 40064 is one 40066.

n) Invoice Due Interfaces

Invoice due interfaces are interfaces that transmits information about a business transaction to be settled to Billing (billing document creation) or Invoicing (invoice verification).

In this document, the term "settlement" refers to creating billing documents (outgoing invoices and credit memos), incoming, and "self-billing" invoices and to checking incoming invoices.

The motivating business scenarios for the invoice due interfaces are the Procure to Stock (PTS) and Sell from Stock (SFS) scenarios. Goods are purchased in the PTS scenario. After a delivery has been received and the appropriate goods receipt has been posted, the delivery data that are relevant for invoicing (with reference to the purchase order) are transmitted to Invoicing. Goods are sold in the SFS scenario. After an order has been created in Sales (BAC CRM), the elements of the contract that are relevant for billing are transmitted to Billing. This enables contract-related billing to be carried out. After the appropriate deliveries have been made and the relevant goods issues have been posted, the logistics data (with reference to the order) are transmitted to Billing. Then delivery-related billing can be carried out for the order.

(1) Message Types (a) Billing Due Notification

The BillingDueNotification is a notification about data relevant for billing to an application that carries out billing. The message type BillingDueNotification is based on the message data type InvoiceDueMessage.

This message type is used for the following business transactions: (1) Billing based on contract data (e.g., credit memo requests debit memo requests, etc.); (2) Billing of delivery data with reference to contract data (e.g., a standard order with order items relevant for delivery); (3) Billing of delivery data without reference to contract data; and (4) Billing of contract data (such as a standard order) in accordance with the delivery quantities (general delivery data).

(b) Invoicing Due Notification

The InvoicingDueNotification is a notification about data relevant structure for invoicing to an application that checks and creates incoming invoices and/or creates "self-billing" invoices (ERS). The message type InvoicingDueNotification is based on the message data type InvoiceDueMessage.

(2) Message Choreography

FIG. 401 depicts the message choreography for exemplary Billing Due Notification and Invoicing Due Notification processes.

(a) Billing Due Notification

Referring to FIG. 401, data that are relevant for billing are transmitted from Sales (CRM) 40100 and Supply Chain Execution (SCE) 40100 to Billing (invoice creation) 40106 via appropriate BillingDueNotification messages 40108 and 40110. The message is used to create and change data that are relevant for billing (the BillingDueNotification is sent again). The data are always transmitted in their entirety. Thus, Sales 40100 transmits a BillingDueNotification message 40106 to Billing 40104 while SupplyChainExecution 40102 transmits a BillingDueNotification message 40108 to Billing 40104.

(b) Invoicing Due Notification

Referring to FIG. 401, data that are subject to settlement are transmitted from Purchasing (SRM) 40110 and Supply Chain Execution (SCE) 40112 to Invoicing (invoice verification) 40114 using appropriate InvoicingDueNotification messages 40116 and 40118. The message is used to create and change data that are subject to settlement (the InvoicingDueNotification is sent again). The data are always transmitted in their entirety. Thus, Purchasing 40110 transmits an InvoicingDueNotification message 40116 to Invoicing 40114 while SupplyChainExecution 40112 transmits a InvoicingDueNotification message 40118 to Invoicing 40114.

(3) Message Data Type Data Model Invoice Due Message

FIG. 402 depicts a data model for the InvoiceDueMessage. The message data type InvoiceDueMessage includes an InvoiceDue object, which includes an InvoiceDueMessage package 40200. The InvoiceDueMessage package 40200 includes a MessageHeader package 40202, an InvoiceDue package 40204, and an InvoiceDueMessage entity 40206. The message data type InvoiceDueMessage provides the structure for the following message types: BillingDueNotification, InvoicingDueNotification and the interfaces based on them.

(a) Message Header Package

The MessageHeader package 40202 groups together the business information that is relevant for sending a business document in a message. The MessageHeader package currently does not contain any entries. The reference to the base business document is always made by establishing a reference to the purchase order, delivery, etc. The sender is also identified by means of the reference. The sender does not know who the recipient is and knows that the message is to be sent to a billing or invoicing application.

(b) Invoice Due Package

The InvoiceDue package 40204 groups all information that is required for a settlement (creation of billing documents and invoice verification). It includes a Party package 40208, a Location package 40210, a DeliveryInformation package 40212, a PaymentInformation package 40214, a PriceInformation package 40216, an AccountAssignment package 40218, an Attachment package 40220, a Description package 40222, an Item package 40224, and an InvoiceDue entity 40226. There is a 1:1 relationship 40228 between the InvoiceDueMessage entity 40206 and the InvoiceDue entity 40226.

(i) Invoice Due

An InvoiceDue package 40204 comprises information that summarizes all details about a business transaction that are relevant for settling this business transaction, where settling means the creation of billing documents and the checking and creation ("self-billing") of incoming invoices. InvoiceDue consists of InvoiceDueItems, which represent items in the base business document for the future settlement. An InvoiceDueItem usually consists of information about the quantity of a product that has been ordered or delivered, as well as the business partners, locations, terms of delivery and payment involved and the other business documents to be taken into account when the product is settled. Data that applies to (almost) all InvoiceDueItems can also be entered directly at header level.

InvoiceDue includes a BaseBusinessTransactionDocumentID, a BaseBusinessTransactionDocumentTypeCode, an ActionCode, a SettlementRelevanceIndicator, a SettlementPriorityCode, a SettlementBlockedIndicator, an ItemListCompleteTransmissionIndicator, a PlannedBillingDate, a ProposedInvoiceDate, and a DeliveryPeriod. The BaseBusinessTransactionDocumentID is a unique identifier for a base business document for the InvoiceDue, and is of type GDT: BusinessTransactionDocumentID. The BaseBusinessTransactionDocumentTypeCode is the coded representation of the type of the base business document for the InvoiceDue. The types sales order and (outgoing) delivery are currently relevant for the message type BillingDueNotification; the types purchase order, sales order, and (incoming) delivery are currently relevant for the message type InvoicingDueNotification. The BaseBusinessTransactionDocumentTypeCode is of type GDT: BusinessTransactionDocumentTypeCode. The ActionCode is the coded representation of an instruction to the recipient of the message telling it, whether to create, change or delete the InvoiceDue, and is of type GDT: ActionCode. The SettlementRelevanceIndicator specifies whether the business transaction is subject to settlement, and is of type GDT: BusinessTransactionDocumentSettlementRelevanceIndicator. The SettlementPriorityCode is the coded representation of the urgency of a due settlement, and is of type GDT: BusinessTransactionPriorityCode. The SettlementBlockedIndicator specifies whether the settlement for the transmitted data is blocked, and is of type GDT: BusinessTransactionBlockedIndicator. The ItemListCompleteTransmissionIndicator specifies whether all the items in the base business document for the InvoiceDue are to be transmitted (items that are not transmitted are implicitly classed as cancelled) or whether new items or items that have been changed since the last transmission are to be transmitted, and is of type GDT: CompleteTransmissionIndicator. The PlannedBillingDate is the planned date for billing a document in a business transaction, and is of type GDT: Date. The ProposedInvoiceDate is the date for the billing business document (invoice, credit memo, debit memo, etc.), and is of type GDT: DateTime. The DeliveryPeriod specifies the period of time during which a service is provided, and is of type GDT: DateTimePeriod.

Since the data is always transmitted in its entirety, the ItemListCompleteTransmissionIndicator has the value "true." The soft semantic (ActionCodes "04"/"05") is used for the ActionCode, since the applications receiving the data contain the data subject to settlement from the transmitted item. For the ActionCode the default-logic applies as described in the "Notes (Regarding the Message Data Type)." ActionCode "04" is interpreted by the receiving application as a change statement for the items to be transmitted, provided that they have already been transmitted by a previous message. If this is not the case, the transmitted items are created. The ActionCode "05" (REMOVE) signalizes to the receiving application that item transmitted previously for a business transaction (and cancelled now) are not relevant for settlement any more.

Initially, the information about the date is used from the ProposedInvoiceDate element; hours, minutes, and seconds are ignored. For the element ActionCode a default-logic applies. The ActionCode specified for the entity InvoiceDue is valid for all InvoiceDueItems that do not have an explicitely different ActionCode. If no ActionCode is specified explicitely for the entity InvoiceDue, the ActionCode "04" shall be assumed as default.

Notes (Regarding the Message Type InvoicingDueNotification): Default logic is not supported for the following elements: SettlementRelevanceIndicator, SettlementBlockedIndicator, ProposedBillingDate, ProposedInvoiceDate, and DeliveryPeriod. For this reason, these elements are not used at InvoiceDue level. The SettlementPriority element is initially not supported.

Notes (Regarding the Message Type BillingDueNotification): In case of an ActionCode "05" the receiving application has to decide, whether data already transmitted for a business transaction is disregarded with respect to further settlement or—in case of a settlement already done—revoked using a cancellation or credit memo. If the SettlementPriority element is used, the highest level of priority (Code '1') denotes immediate or direct billing. All other levels of priority denote background/online billing rather than immediate billing. Default logic is used for the elements SettlementRelevanceIndicator and BillingBlockedIndicator: the relevant indicators at InvoiceDue level apply to all corresponding indicators at InvoiceDueItem level for which values have not been transmitted. The following default logic is used for the DeliveryPeriod element: the date specified in the StartDateTime attribute is interpreted as being the date on which a service is provided (requested delivery date, date of the goods issue posting); all other information is ignored. If an appropriate date is transmitted at InvoiceDue level, it is used as the date at InvoiceDueItem level in the DeliveryPeriod element for which values have not been transmitted.

Example—Usually the base business transaction for an InvoiceDueMessage is an order, a purchase order, or a delivery.

(ii) Party Package

The Party package 40208 groups information relating to all business partners that might be involved in a settlement. The Party package 40208 includes a BuyerParty entity 40230, a SellerParty entity 40232, a ProductRecipientParty entity 40234, a VendorParty entity 40236, a BillToParty entity 40238, a BillFromParty entity 40240, a PayerParty entity 40242, and a PayeeParty entity 40244. There is a 1:c relationship 40246 between the InvoiceDue entity 40226 and the BuyerParty 40230. There is a 1:c relationship 40248 between the InvoiceDue entity 40226 and the SellerParty 40232. There is a 1:c relationship 40250 between the InvoiceDue entity 40226 and the ProductRecipientParty 40234. There is a 1:c relationship 40252 between the InvoiceDue entity 40226 and the VendorParty 40236. There is a 1:c relationship 40254 between the InvoiceDue entity 40226 and the BillToParty 40238. There is a 1:c relationship 40256 between the InvoiceDue entity 40226 and the BillFromParty 40240. There is a 1:c relationship 40258 between the InvoiceDue entity 40226 and the PayerParty 40242. There is a 1:c relationship 40260 between the InvoiceDue entity 40226 and the PayeeParty 40244.

Default logic is used for all business partners: business partners that are specified at InvoiceDue level are used for all the items for which a corresponding partner is not explicitly transmitted. The default logic applies for the partner as a whole, including the contact person. Parts of a partner cannot be specified in more detail at item level. The default logic is a simplified version of the transmitted message. In terms of logic, partners at InvoiceDue level behave as if they have been explicitly transmitted for all the items of the message.

(a) Buyer Party

A BuyerParty is a company or person that purchases goods or services. The BuyerParty entity 40230 is of type GDT: BusinessTransactionDocumentParty, where the "InternalID" is used. The BuyerParty entity 40230 is entered for a settlement and therefore is specified at InvoiceDue or InvoiceDueItem level in the message if the BusinessTransactionDocumentTypeCode element refers to a business transaction of type order or purchase order. The BuyerParty entity 40230 can also fulfill the functions of the ProductRecipientParty entity 40234, the BillToParty entity 40238 or the PayerParty entity 40242.

The default logic in the Party package 40208 includes a Address entity 40262 and a Contact entity 40264. There is a 1:c relationship 40266 between BuyerParty entity 40230 and Address entity 40262. There is a 1:c relationship 40268 between BuyerParty entity 40230 and Contact entity 40264.

The Address entity 40262 includes a PersonName entity 40270, an Office entity 40272, a PhysicalAddress entity 40274, a GeoCoordinates entity 40276, and a Communication entity 40278. There is a 1:c relationship 40280 between PersonName entity 40270 and Address entity 40262. There is a 1:c relationship 40282 between Office entity 40272 and Address entity 40262. There is a 1:c relationship 40284 between PhysicalAddress entity 40274 and Address entity 40262. There is a 1:c relationship 40286 between GeoCoordinates entity 40276 and Address entity 40262. There is a 1:c relationship 40288 between Communication entity 40278 and Address entity 40262.

The Contact entity 40264 includes an Address entity 40290. There is a 1:c relationship 40292 between Address entity 40290 and Contact entity 40264. The Address entity 40290 includes a PersonName entity 40294, an Office entity 40296, a PhysicalAddress entity 40298, a GeoCoordinates entity 40200A, and a Communication entity 40202A. There is a 1:c relationship 40204A between PersonName entity 40294 and Address entity 40290. There is a 1:c relationship 40206A between Office entity 40296 and Address entity 40290. There is a 1:c relationship 40208A between PhysicalAddress entity 40298 and Address entity 40290. There is a 1:c relationship 40210A between GeoCoordinates entity 40200A and Address entity 40290. There is a 1:c relationship 40212A between Communication entity 40202A and Address entity 40290.

(b) Seller Party

A SellerParty is a company or person that sells goods or services. The SellerParty entity 40232 is of type GDT: BusinessTransactionDocumentParty, where the "InternalID" is used. The SellerParty entity 40232 can also fulfill the functions of the VendorParty entity 40236, the BillFromParty entity 40240 or the PayeeParty entity 40244. The SellerParty entity 40232 is entered for a settlement and therefore is specified at InvoiceDue or InvoiceDueItem level in the message if the BusinessTransactionDocumentTypeCode element refers to a business transaction of type order or purchase order.

The SellerParty entity 40232 includes the same Address and Contact entities 40214A as found for the BuyerParty 40230.

(c) Product Recipient Party

A ProductRecipientParty is a company or person to whom goods are delivered or for whom services are provided. The ProductRecipientParty entity 40234 is of type GDT: BusinessTransactionDocumentParty, where the "InternalID" is used. If no ShipToLocation is explicitly specified, the ProductRecipientParty address is the delivery address. If no ProductRecipientParty entity 40234 is explicitly specified, the BuyerParty entity 40230 acts as ProductRecipientParty.

The ProductRecipientParty entity 40234 includes the same Address and Contact entities 40216A as found for the BuyerParty 40230.

(d) Vendor Party

A VendorParty is a company or person that delivers goods or provides services. The VendorParty entity 40236 is of type GDT: BusinessTransactionDocumentParty, where the "InternalID" is used. If no ShipFromLocation is explicitly specified, the VendorParty address is the ship-from address. If no VendorParty entity 40236 is explicitly specified, the SellerParty entity 40232 is also VendorParty. The VendorParty is not the company or person that is solely responsible for transporting the goods. The CarrierParty is responsible for this.

The VendorParty entity 40236 includes the same Address and Contact entities 40218A as found for the BuyerParty 40230.

(e) Bill To Party

A BillToParty is a company or person to which the invoice for goods or services is sent. The BillToParty entity 402 38 is of type GDT: BusinessTransactionDocumentParty, where the "InternalID" is used. If no BillToParty entity 40238 is explicitly specified, the BuyerParty acts as BillToParty.

The BillToParty entity 402 38 includes the same Address and Contact entities 40220A as found for the BuyerParty 40230.

(f) Bill From Party

A BillFromParty is a company or person that draws up the invoice for goods or services. The BillFromParty entity 40240 is of type GDT: BusinessTransactionDocumentParty, where the "InternalID" is used. If no BillFromParty entity 40240 is explicitly specified, the SellerParty entity 40232 acts as BillFromParty.

The BillFromParty entity 40240 includes the same Address and Contact entities 40222A as found for the BuyerParty 40230.

(g) Payer Party

A PayerParty is a company or person that pays for goods or services. The PayerParty entity 40242 is of type GDT: BusinessTransactionDocumentParty, where the "InternalID" is used. If no PayerParty entity 40242 is explicitly specified, the BillToParty entity 40230 acts as PayerParty.

The PayerParty entity 40242 includes the same Address and Contact entities 40224A as found for the BuyerParty 40230.

(h) Payee Party

A PayeeParty is a company or person that receives payment for goods or services. The PayeeParty entity 40244 is of type GDT: BusinessTransactionDocumentParty, where the "InternalID" is used. If no PayeeParty entity 40244 is explicitly specified, the BillFromParty entity 40240 acts as PayeeParty.

The PayeeParty entity 40244 includes the same Address and Contact entities 40226A as found for the BuyerParty 40230.

(iii) Location Package

The Location package 40210 groups all locations that can occur in a settlement. The Location package 40210 includes a ShipToLocation entity 40228A and a ShipFromLocation entity 40230A. There is a 1:c relationship 40232A between the InvoiceDue entity 40226 and the ShipToLocation entity 40228A. There is a 1:c relationship 40234A between the InvoiceDue entity 40226 and the ShipFromLocation entity 40230A.

Default logic is used for all locations: locations that are specified at InvoiceDue level are used for all items for which corresponding locations are not explicitly transmitted. ShipToLocation and ShipFromLocation can be used to provide a detailed description of the flow of goods (between the ship-to location and the ship-from location). In specific countries, this detailed information is required for calculating taxes (e.g., United States).

(a) Ship To Location

A ShipToLocation is the place to which goods are shipped or where services are provided. The ShipToLocation entity 40228A is of type GDT: BusinessTransactionDocumentLocation. A sold-to party (BuyerParty) headquartered in California in the US orders steel beams for a building. The construction site (ShipToLocation) for the building is located in Arizona. The tax amount is calculated using the tax rates that apply in Arizona.

The ShipToLocation entity 40228 includes an Address entity 40236A. There is a 1:c relationshiop 40238A between Address entity 40236A and ShipToLocation 40228A.

The Address entity 40236A includes a PersonName entity 40240A, an Office entity 40242A, a PhysicalAddress entity 40244A, a GeoCoordinates entity 40246A, and a Communication entity 40248A. There is a 1:c relationship 40250A between the PersonName entity 40240A and the Address entity 40236A. There is a 1:c relationship 40252A between the Office entity 40242A and the Address entity 40236A. There is a 1:c relationship 40254A between the PhysicalAddress entity 40244A and the Address entity 40236A. There is a 1:c relationship 40256A between the GeoCoordinates entity 40246A and the Address entity 40236A. There is a 1:c relationship 40258A between the Communication entity 40248A and the Address entity 40236A.

(b) Ship From Location

A ShipFromLocation is the place from which goods are shipped. The ShipFromLocation 40230A is of type GDT: BusinessTransactionDocumentLocation.

The ShipFromLocation 40230A includes the same Address entity information 40259A as found for the ShipToLocation entity 40228A.

(iv) Delivery Information Package

The DeliveryInformation package 40212 groups all information for a required delivery in the settlement. It includes a DeliveryTerms entity 40260A. The default logic used for DeliveryTerms is similar to that used for Parties. There is a 1:c relationship 40262A between the InvoiceDue entity 40226 and the DeliveryTerms entity 40260A.

DeliveryTerms are the conditions and agreements that are valid for executing the delivery and transporting the ordered goods and for the necessary services and activities. The DeliveryTerms entity 40260A is type GDT: DeliveryTerms. Of the DeliveryTerms, Incoterms and transport can be used for material items. The default logic takes Incoterms and transport into account for material items. For all other items, Incoterms and transport are ignored.

(v) Payment Information Package

The PaymentInformation package 40214 groups payment information in the settlement. The PaymentInformation package 40214 includes a CashDiscountTerms entity 40264A and a PaymentForm entity 40266A. There is a 1:c relationship 40268A between the InvoiceDue entity 40226 and the CashDiscountTerms entity 40264A. There is a 1:c relationship 402670A between the InvoiceDue entity 40226 and the PaymentForm entity 40266A. The default logic used for CashDiscountTerms and the PaymentForm is similar to that used for Parties. In some variations, the PaymentInformation package 40214 also includes a MaximumDiscount entity 40272A, a NormalDiscount entity 40274A, and a PaymentCard entity 40276A. There is a 1:c relationship 40278A between the CashDiscountTerms entity 40264A and the MaximumDiscount entity 40272A. There is a 1:c relationship 40280A between the CashDiscountTerms entity 40264A and the NormalDiscount entity 40274A. There is a 1:c relationship 40282A between the PaymentForm entity 40266A and the PaymentCard entity 40266A.

(a) Cash Discount Terms

The CashDiscountTerms are the terms of payment (cash discount rates and payment deadlines). The CashDiscountTerms entity 40264A is type GDT: CashDiscountTerms.

(b) Payment Form

The PaymentForm is the payment form and the data required for it. The PaymentForm entity 40266A includes the PaymentCard entity 40276A. The PaymentFormCode is the coded representation of the payment form. The valid payment form in a billing process is determined in accordance with the following rules: (1) If the payment form was transmitted explicitly with an invoice, this payment form applies, otherwise (2) If the payment form was agreed upon by both parties, this payment method applies, otherwise (3) standard payment form applies, as defined in the GDT: PaymentFormCode. PaymentCard is to be filled for the payment form "PaymentCard; for all other payment forms, it can be ignored by the recipient.

The PaymentCard is a credit card or a customer card. The PaymentCard entity 40276A is of type GDT: PaymentCard.

(vi) Price Information Package

The PriceInformation package 40216 summarizes all the information about the total amount to be settled for products and services and details all the tax price components. It includes a Price entity 40284A. There is a 1:c relationship 40286A between the InvoiceDue entity 40226 and the Price entity 40284A.

The Price entity 40270A is the total amount to be settled for products and services, including tax and net portions. The Price entity 40284A includes a GrossAmount, a NetAmount, a TaxAmount, an ExchangeRate, and a PricingDate. The GrossAmount is the gross invoice amount; net amount plus tax amount, and is of type GDT: Amount. The NetAmount is the net invoice amount, and is of type GDT: Amount. The TaxAmount is the tax amount of an invoice, and is of type GDT: Amount. The ExchangeRate is the information about the exchange rate, and is of type GDT: ExchangeRate. The PricingDate is the date on which the price is calculated, and is of type GDT: DateTime.

The gross and net amounts are specified in the same currency. If a following currency is specified in the ExchangeRate element, the following currency is the same as the currency in the gross/net amount. If the ExchangeRate element is not specified at all, the currency of the gross/net amount is set as the following and leading currency (in this case, the exchange rate would be set to the uniform rate). Specifying currencies at header level is optional. If they are specified, they are the same as the currencies specified at item level.

Currencies (following and leading currency) for a settlement do not have to be specified unless the SalesOrderReference entity is not specified (filled with values) at InvoiceDueItem level in the BusinessTransactionDocumentReference package.

(vii) Account Assigmmet Package

The AccountAssignment package 40218 groups account assignment information for accounting. It includes an AccountAssignment entity 40288A. There is a 1:nc relationship 40290A between the InvoiceDue entity 40226 and the AccountAssignment entity 40288A.

The AccountAssignment package 40218 includes all information about the account assignment objects in accounting to which the base business transaction refers. The account assignment can be distributed to various objects (such as the cost center or order) on a percentage basis. In this case, the total of the account assignments is 100%. The default logic used for the AccountAssignment package 40218 is similar to that used for Parties.

An AccountAssignment provides information about an account assignment object and the percentage rate to be used. The AccountAssignment entity 40288A is of type GDT: AccountingObjectSetDistribution.

(viii) Attachment Package

The Attachment package 40220 groups all attachment information regarding the settlement process. It includes an AttachmentWebAddress entity 40292A. There is a 1:cn relationship 40294A between the InvoiceDue entity 40226 and the AttachmentWebAddress entity 40292A.

The AttachmentWebAddress is a web address for a document of any type that relates to a settlement. The AttachmentWebAddress entity 40292A is of type GDT: AttachmentWebAddress.

(ix) Description Package

The Description package 40222 groups all explanatory texts regarding a settlement. It includes a Description entity 40296A. There is a 1:c relationship 40298A between the InvoiceDue entity 40226 and the Description entity 40296A.

The Description is natural-language text with additional information about a settlement. Description entity 40296A is of type GDT: Description.

(c) Invoice Due Item Package

The InvoiceDueItem package 40224 groups item information from the basic business document for the future settlement. It includes a ProductInformation package 40200B, a PriceInformation package 40202B, a Party package 40204B, a Location package 40206B, a DeliveryInformation package 40208B, a PaymentInformation package 40210B, a BusinessTransactionDocumentReference package 40212B, an AccountAssignment package 40214B, an Attachment package 40216B, a Description package 40218B, an Item entity 40229BB and an ItemHierarchyRelationship entity 40224B. There is a 1:n relationship 40222B between the InvoiceDue entity 40226 and the Item entity 40220B. There is a 1:c relationship 40226B or a 1:cn relationship 40228B between the Item entity 40220B and the ItemHierarchyRelationship 40224B.

(i) Invoice Due Item

An InvoiceDueItem entity 40220B summarizes all information from a business document item that is to be taken into account in the future settlement. The InvoiceDueItem entity

40220B typically consists of information about the quantity of a product that has been ordered or delivered, as well as business partners, locations, terms of delivery and payment conditions and the other business documents to be taken into account when the product is settled.

The InvoiceDueItem entity 40220B includes a BaseBusinessTransactionDocumentID, a BaseBusinessTransactionDocumentItemTypeCode, an ActionCode, a SettlementRelevanceIndicator, an EvaluatedReceiptSettlementIndicator, a SettlementBlockedIndicator, a PricingIndicator, a PlannedBillingDate, a ProposedInvoiceDate, a DeliveryPeriod, and a Quantity. The BaseBusinessTransactionDocumentID is a unique identifier for the item in the base business document for the InvoiceDue, and is of type GDT: BusinessTransactionDocumentID. The BaseBusinessTransactionDocumentItemTypeCode is the coded representation of the type of the item in which the base business document for the InvoiceDue is stored. Information about the calendar day. Currently, the types sales order item and delivery item are relevant for the message type BillingDueNotification; the types purchase order item, sales order item, and delivery item are relevant for the message type InvoicingDueNotification. The BaseBusinessTransactionDocumentItemTypeCode is of type GDT: BusinessTransactionDocumentItemTypeCode. The ActionCode is the coded representation of the request to the recipient of the InvoiceDue message to create, change, and delete InvoiceDueItems, and is of type GDT: ActionCode. The SettlementRelevanceIndicator indicates whether the specified item is subject to settlement, and is of type GDT: BusinessTransactionDocumentSettlementRelevanceIndicator. The EvaluatedReceiptSettlementIndicator is the indicator that specifies whether an invoice is to be automatically created for the item, and is of type GDT: EvaluatedReceiptSettlementIndicator. The SettlementBlockedIndicator specifies whether a settlement item is blocked for further processing, and is of type GDT: BusinessTransactionBlockedIndicator. The PricingIndicator specifies whether pricing/price determination is to be performed for the specified item, and is of type GDT: BusinessTransactionDocumentPricingIndicator. The PlannedBillingDate is the planned date for billing a specified item, and is of type GDT: Date. The ProposedInvoiceDate is the date for the billing document for a specified item, and is of type GDT: DateTime. The DeliveryPeriod specifies the exact time or the period of time during which a service is provided, and is of type GDT: DateTimePeriod. The Quantity is the quantity of the product to be settled, and is of type GDT: Quantity.

The elements BaseBusinessTransactionDocumentItemID, BusinessTransactionDocumentItemTypeCode, SettlementRelevanceIndicator, and Quantity is specified (except in the case of group hierarchy items). The soft semantic (ActionCodes "04"/"05") is used for the ActionCode, since the applications receiving the data contain the data subject to settlement from the transmitted item. ActionCode "04" is interpreted by the receiving statement as a change statement for the item to be transmitted, provided that this has already been transmitted by a previous message. If this is not the case, the transmitted item is created. The ActionCode "05" (REMOVE) signalizes to the receiving application that item transmitted previously for a business transaction (and cancelled now) are not relevant for settlement any more. Initially, this information about the calendar day is used from the ProposedInvoiceDate element; hours, minutes, and seconds are ignored.

The element EvaluatedReceiptSettlementIndicator is not used.

Default logic is used for the following elements: SettlementRelevanceIndicator, SettlementBlockedIndicator, DeletedIndicator, and DeliveryDateTimePeriod: if values are not transmitted at InvoiceDueItem level, the values from the InvoiceDue level are used. If values were not transmitted at InvoiceDue and InvoiceDueItem level, the relevant indicators are NOT set. From the DeliveryPeriod element, the date specified in the StartDateTime attribute is interpreted as being the date on which a service is provided (requested delivery date, date of the goods issue posting); all other information is ignored. From a semantic perspective, InvoiceDueItems can contain other items. This enables item hierarchies to be mapped. The hierarchies are mapped using a ParentItemID and an ItemHierarchyTypeCode.

There are various types of item, which are governed by a variety of integrity conditions. In particular, Standard items are items that are neither above nor below any other items in the hierarchy, Hierarchy items are items that are above other items in the hierarchy, and Subitems are items that are below other items in the hierarchy. The type of subitem and the way it is used is indicated using the ItemHierarchyRelationTypeCode.

(ii) Invoice Due Item Product Information Package

The InvoiceDueItemProductInformation package 40200B groups all information required for identifying, describing, and classifying a product for which an invoice is due. It includes a Product 40230B and a ProductCategory 40232B. There is a 1:c relationship 40234B between the Item entity 40220B and the Product entity 40230B. There is a 1:c relationship 40236B between the Item entity 40220B and the ProductCategory 40232B.

(a) Product

The Product entity 40230B identifies, describes, and classifies a product for which an invoice is due. The Product entity 40230B is of type GDT: Product. A product is specified when the line item instance is not a grouping or unplanned delivery costs.

(b) Product Category

The ProductCategory entity 40232B is the product category of the product/service that is being invoiced. The ProductCategory entity 40232B is of type GDT: ProductCategory. The product category derives directly from the product and can vary if the buyer and seller have assigned the same product to different categories. This is allowed and should be tolerated by the systems involved.

(iii) Invoice Due Item Price Information Package

The InvoiceDueItemPriceInformation package 40202B summarizes all the information about the amount to be settled for a product or a service, including all price components. The InvoiceDueItemPriceInformation package 40202B includes a Price entity 40238B, a NetUnitPrice entity 40246B, and a ProcurementCostUpperLimit entity 40240B. There is a 1:c relationship 40242B between the Item entity 40220B and the Price entity 40238B. There is a 1:c relationship 40244B between the Item entity 40220B and the ProcurementCostUpperLimit entity 40240B. There is a 1:c relationship 40248B between the Price entity 40238B and the NetUnitPrice entity 40246B.

(a) Price

The Price is the amount to be settled for a product or service, including tax and net portions. The Price entity 40238B includes a GrossAmount, a NetAmount, a TaxAmount, an ExchangeRate, and a PricingDate. The GrossAmount is the gross invoice amount; net amount plus tax amount, and is of type GDT: Amount. The NetAmount is the net invoice amount, and is of type GDT: Amount. The TaxAmount is the tax amount of an invoice, and is of type GDT:

Amount. The ExchangeRate is the information about the exchange rate, and is of type GDT: ExchangeRate. The PricingDate is the date on which the price is calculated, and is of type GDT: DateTime. The Price entity 40238B also includes a NetUnitPrice entity 40246B.

The elements NetAmount, GrossAmount, and TaxAmount are specified when the specified line item instance is not an item used simply for grouping purposes. The gross and net amounts for an item are in the same currency. If a following currency is specified in the ExchangeRate element, the following currency is the same as the currency of the gross/net amount. If the following and leading currencies are not specified in the ExchangeRate element, the currency of the gross/net amount is set as the following and leading currency (in this case, the exchange rate would be set to the uniform rate). Currencies specified at header/item level are the same.

NetUnitPrice is the net price for the base quantity of a product that was used to calculate the net amount. The NetUnitPrice entity 40246B is of type GDT: Price. For Example, € 10 for 5 pieces.

(b) Procurement Cost Upper Limit

The ProcurementCostUpperLimit is a quantity or value-based restriction placed on a product or service to be settled. The ProcurementCostUpperLimit 40240B is of type GDT: ProcurementCostUpperLimit.

The element ProcurementCostUpperLimit is ignored.

(iv) Invoice Due Item Party Package

The InvoiceDueItemParty package 40224 includes a BuyerParty entity 40250B, a SellerParty entity 40252B, a ProductRecipientParty entity 40254B, a VendorParty entity 40256B, a BillToParty entity 40258B, a BillFromParty entity 40260B, a PayerParty entity 40262B, and a PayeeParty entity 40264B. There is a 1:c relationship 40266B between the Item entity 40220B and the BuyerParty 40250B. There is a 1:c relationship 40268B between the Item entity 40220B and the SellerParty 40252B. There is a 1:c relationship 40270B between the Item entity 40220B and the ProductRecipientParty 40254B. There is a 1:c relationship 40272B between the Item entity 40220B and the VendorParty 40256B. There is a 1:c relationship 40274B between the Item entity 40220B and the BillToParty 40258B. There is a 1:c relationship 40276B between the Item entity 40220B and the BillFromParty 40260B. There is a 1:c relationship 40278B between the Item entity 40220B and the PayerParty 40262B. There is a 1:c relationship 40280B between the Item entity 40220B and the PayeeParty 40264B.

The InvoiceDueItemParty package 40224 is similar to the Party package 40208 at the InvoiceDue level. Thus, BuyerParty entity 40250B includes similar Address and Contact entity information 40282B as found for BuyerParty entity 40230 in the Party package 40208. Similarly, SellerParty entity 40252B includes similar Address and Contact entity information 40284B as found for SellerParty entity 40232B in the Party package 40208. Similarly, ProductRecipientParty entity 40254B includes similar Address and Contact entity information 40286B as found for ProductRecipientParty entity 40234B in the Party package 40208. Similarly, VendorParty entity 40256B includes similar Address and Contact entity information 40288B as found for VendorParty entity 40236B in the Party package 40208. Similarly, BillToParty entity 40258B includes similar Address and Contact entity information 40290B as found for BillToParty entity 40238B in the Party package 40208. Similarly, BillFromParty entity 40260B includes similar Address and Contact entity information 40292B as found for BillFromParty entity 40240B in the Party package 40208. Similarly, PayerParty entity 40262B includes similar Address and Contact entity information 40294B as found for PayerParty entity 40242B in the Party package 40208. Similarly, PayeeParty entity 40264B includes similar Address and Contact entity information 40296B as found for PayeeParty entity 40244B in the Party package 40208.

Default logic is used for all business partners: business partners that are specified at InvoiceDue level are used for all the items for which a corresponding partner is not explicitly transmitted. The default logic applies for the partner as a whole, including the contact person. Parts of a partner cannot be specified in more detail at item level. The default logic is a simplified version of the transmitted message. In terms of logic, partners at InvoiceDue level behave as if they have been explicitly transmitted for all the items of the message.

(v) Invoice Due Item Location Package

The InvoiceDueItemLocation package 40206B includes a ShipToLocation entity 40298B and a ShipFromLocation entity 40200C. The InvoiceDueItemLocation package 40206B may also include an Address entity similar to the Address entity 40236A in the Location Package 40210 at the InvoiceDue level. There is a 1:c relationship 40202C between the Item entity 40220B and the ShipToLocation 40298B. There is a 1:c relationship 40204C between the Item entity 40220B and the ShipFromLocation entity 40200C The InvoiceDueItemLocation package 40206B is similar to the Location package 40210 at InvoiceDue level. Thus, the ShipToLocation entity 40298B contains the same Address entity information 40206C as found associated with ShipToLocation entity 40228A in the Location package 40210. Similarly, the ShipFromLocation entity 40200C contains the same Address entity information 40208C as found associated with ShipFromLocation entity 40230A in the Location package 40210.

(vi) Invoice Due Item Delivery Information Package

The InvoiceDueItemDeliveryInformation package 40208B is similar to the DeliveryInformation package 40212 at InvoiceDue level. The InvoiceDueItemDeliveryInformation package 40208B includes a DeliveryTerms entity 40210C. There is a 1:c relationship 40212C between the Item entity 40220B and the DeliveryTerms entity 40210C.

(vii) Invoice Due Item Payment Information Package

The InvoiceDueItemPaymentInformation package 40210B is similar to the PaymentInformation package 40214 at InvoiceDue level. The InvoiceDueItemPaymentInformation package 40210B includes a CashDiscountTerms entity 40214C and a PaymentForm entity 40216C. There is a 1:c relationship 40218C between the Item entity 40220B and the CashDiscountTerms entity 40214C. There is a 1:c relationship 40220C between the Item entity 40220B and the PaymentForm entity 40216C. The default logic used for CashDiscountTerms and the PaymentForm is similar to that used for Parties. In some variations, the PaymentInformation package 40210B also includes a MaximumDiscount entity 40222C, a NormalDiscount entity 40224C, and a PaymentCard entity 40230C. There is a 1:c relationship 40226C between the CashDiscountTerms entity 40214C and the MaximumDiscount entity 40222C. There is a 1:c relationship 40228C between the CashDiscountTerms entity 40214C and the NormalDiscount entity 40224C. There is a 1:c relationship 40232C between the PaymentForm entity 40216C and the PaymentCard entity 40230C.

(viii) Invoice Due Item Business Transaction Document Reference Package

The InvoiceDueItemBusinessTransactionDocumentReference package 40212B groups all references to business documents that could be relevant for settling an InvoiceDueItem. The InvoiceDueItemBusinessTransactionDocumentReference package 40212B includes a PurchaseOrderReference entity 40234C, a SalesOrderReference entity 40236C, a DeliveryReference entity 40238C, a PurchaseContractReference entity 40240C, a SalesContractReference entity 40242C, a BuyerProductCatalogueReference entity 40244C, and a SellerProductCatalogueReference entity 40246C. There is a 1:c relationship 40248C between the Item entity 40220B and the PurchaseOrderReference entity 40248C. There is a 1:c relationship 40250C between the Item entity 40220B and the SalesOrderReference entity 40236C. There is a 1:c relationship 40252C between the Item entity 40220B and the DeliveryReference entity 40238C. There is a 1:c relationship 40254C between the Item entity 40220B and the PurchaseContractReference entity 40240C. There is a 1:c relationship 40256C between the Item entity 40220B and the SalesContractReference entity 40242C. There is a 1:c relationship 40258C between the Item entity 40220B and the BuyerProductCatalogueReference entity 40244C. There is a 1:c relationship 40260C between the Item entity 40220B and the VendorProductCatalogueReference entity 40246C.

(a) Purchase Order Reference

A PurchaseOrderReference is the reference to a purchase order or to an item within a purchase order. The PurchaseOrderReference entity 40234C is of type GDT: BusinessTransactionDocumentReference. The PurchaseOrderReference entity 40234C is transmitted in the BillingDueNotification from CRM Sales to Billing so that it can be output together with the invoice. The PurchaseOrderReference entity 40234C includes the purchase order number assigned by the buyer.

(b) Sales Order Reference

A SalesOrderReference is the reference to an order or an item within an order. The SalesOrderReference entity 40236C is of type GDT: BusinessTransactionDocumentReference. The SalesOrderReference entity 40236C is to be transmitted in the InvoicingDueNotification from SRM Procurement to Invoicing when the procurement system knows what the order number is (e.g., using the PurchaseOrderConfirmation). The SalesOrderReference entity 40236C includes the order number assigned by the seller.

(c) Delivery Reference

A DeliveryReference is the reference to a delivery (delivery note number) or an item within a delivery. The DeliveryReference entity 40238C is of type GDT: BusinessTransactionDocumentReference.

The DeliveryReference entity 40238C is to be transmitted in the InvoicingDueNotification from Supply Chain Execution to Invoicing when the vendor delivery note number is known.

The DeliveryReference entity 40238C includes the delivery note number assigned by the seller.

(d) Purchase Contract Reference

A PurchaseContractReference is the reference to a purchase contract or to an item within a purchase contract. The PurchaseContractReference entity 40240C, is of type GDT: BusinessTransactionDocumentReference. Provided there is no agreement to the contrary, the seller is responsible for determining the correct SellerContractReference for a corresponding BuyerContractReference.

(e) Sales Contract Reference

A SalesContractReference is the reference to a sales contract or to an item within a sales contract. The SalesContractReference entity 4024C is of type GDT: BusinessTransactionDocumentReference.

(f) Buyer Product Catalogue Reference

A BuyerProductCatalogueReference is the reference to a buyer's product catalog or to an item within this catalog. The BuyerProductCatalogueReference entity 40244C is of type GDT: CatalogueReference. The BuyerProductCatalogueReference entity 40244C is always to be filled when an invoice item refers to a catalogue whose number and whose item numbers were assigned by the buyer.

(g) Seller Product Catalogue Reference

A SellerProductCatalogueReference is the reference to a seller's product catalog or to an item within this catalog. The SellerProductCatalogueReference entity 40246C is of type GDT: CatalogueReference. SellerProductCatalogueReference entity 40246C is always to be filled when an invoice item refers to a catalog whose number and whose item numbers were assigned by the seller.

(ix) Invoice Due Item Account Assignment Package

The InvoiceDueItemAccountAssignment package 40214B is similar to the AccountAssignment package 40218 at InvoiceDue level. The AccountAssignment package 40214B groups account assignment information for accounting. The AccountAssignment package 40214B includes an AccountAssignment entity 40262C. There is a 1:nc relationship 40264C between the Item entity 40220B and the AccountAssignment entity 40262C.

The AccountAssignment package 40214B includes all information about the account assignment objects in accounting to which the base business transaction refers. The account assignment can be distributed to various objects (such as the cost center or order) on a percentage basis. In this case, the total of the account assignments is 100%. The default logic used for the AccountAssignment package 40214B is similar to that used for Parties.

An AccountAssignment provides information about an account assignment object and the percentage rate to be used. The AccountAssignment entity 40262C is of type GDT: AccountingObjectSetDistribution.

(x) Invoice Due Item Attachment Package

The InvoiceDueItemAttachment package 40216B is similar to the Attachment package 40220 at InvoiceDue level. The InvoiceDueItemAttachment package 40216B groups all attachment information regarding the settlement process. InvoiceDueItemAttachment package 40216B includes an Attachment entity 40266C. There is a 1:cn relationship 40268C between the Item entity 40220B and the Attachment entity 40266C.

The AttachmentWebAddress is a web address for a document of any type that relates to a settlement. The AttachmentWebAddress entity 40266C is of type GDT: AttachmentWebAddress.

(xi) Invoice Due Item Description Package

The InvoiceDueItemDescription package 40218B is similar to the Description package 40222 at InvoiceDue level. The Description package 40218B groups all explanatory texts regarding a settlement. It includes a Description entity 40270C. There is a 1:c relationship 40272C between the Item entity 40220B and the Description entity 40270C.

The Description is natural-language text with additional information about a settlement. The Description entity 40270C is of type GDT: Description.

(4) Message Data Type Data Model InvoiceDueCancellationRequest

FIG. 403 depicts a data model for the InvoiceDueCancellationRequest process that can be used in some business scenarios. The message data type InvoiceDueCancellationMessage includes an InvoiceDueCancellationMessage package 40302, which contains the InvoiceDueCancellation object contained in the business document and the business information that is relevant for sending a business document in a message. The InvoiceDueCancellationMessage package 40302 includes a MessageHeader package 40304, an InvoiceDueCancellation package 40306, and an InvoiceDueCancellationMessage entity 40308.

The message data type InvoiceDueCancellationMessage makes the structure available for the following message types: InvoicingDueCancellationRequest, BillingDueCancellationRequest and the relevant interfaces.

(a) MessageHeader Package

The MessageHeader package 40304 groups together the business information that is relevant for sending a business document in a message. The MessageHeader package 40304 is similar to the MessageHeader package 40202 in the InvoiceDueMessage package 40200.

(b) InvoiceDueCancellation Package

The InvoiceDueCancellation package 40306 groups together information that is required to completely cancel an InvoiceDueMessage that has already been sent and to cancel the settlement process. The InvoiceDueCancellation package 40306 includes the InvoiceDueCancellation entity 40310. There is a 1:1 relationship 40312 between the InvoiceDueCancellationMessage entity 40308 and the InvoiceDueCancellation entity 40310.

(c) InvoiceDueCancellation

The InvoiceDueCancellation entity 40310 is a request to exclude business document data that has already been sent from the settlement. The InvoiceDueCancellation 40310 includes a BaseBusinessTransactionDocumentID and a BaseBusinessTransactionDocumentTypeCode. The BaseBusinessTransactionDocumentID is a unique identifier for a base business document for an InvoiceDue Message that has already been sent. It has a data type GDT: Business TransactionDocumentID. The BaseBusinessTransactionDocumentTypeCode is a coded representation of the type of the base business document for an InvoiceDueMessage that has already been sent. The BaseBusinessTransactionDocumentTypeCode has a data type of GDT: BaseBusinessTransactionDocumentTypeCode.

(5) Message Data Type Element Structure

FIG. 404 depicts the element structure for InvoicingDueMessage. The element structure identifies the different packages 40400 in the interface, and represents the entities at various levels within the interface. As shown in FIG. 404, the interface for InvoicingDueRequest includes five levels 40402, 40404, 40406, 40408, 40410. The element structure identifies the number of occurrences 40412 of each element and provides a Datatype name 40414 for each element.

The outermost package of this interface is InvoiceDueMessage package 40416, which includes a InvoiceDueMessage entity 40418 at the first level 40402. The InvoiceDueMessage entity 40418 is of data type MDT: InvoiceDueMessage 40420.

The InvoiceDueMessage package 40416 includes an InvoiceDue package 40422, which includes an InvoiceDue entity 40424 at the second level 40404. The InvoiceDue entity 40424 has one occurrence 40426 and is of data type InvoiceDue 40428.

The InvoiceDue entity 40424 includes a BaseBusinessTransactionDocumentID 40430, a BaseBusinessDocumentTypeCode 40436, a SettlementPriorityCode 40442, a SettlementRelevanceIndicator 40448, a SettlementBlockedIndicator 40454, an ItemListCompleteTransmissionIndicator 40460, a PlannedBillingDate 40466, a DeliveryPeriod 40472, and a ProposedInvoiceDate 40478 at the third level 40406. The BaseBusinessTransactionDocumentID 40430 has one occurrence 40432 and is of data type GDT: BusinessTransaction DocumentID 40434. The BaseBusinessDocumentTypeCode 40436 has one occurrence 40438 and is of data type GDT: BusinessTransaction DocumentTypeCode 40440. The SettlementPriorityCode 40442 has zero or one occurrence 40444 and is of data type GDT: BusinessTransaction Priority Code 40446. The Settlement Relevance Indicator 40448 has zero or one occurrence 40450 and is of data type GDT: BusinessTransaction DocumentSettlement RelevanceIndicator 40452. The SettlementBlockedIndicator 40454 has zero or one occurrence 40456 and is of data type GDT: BusinessTransactionBlockedIndicator 40458. The ItemListCompleteTransmission Indicator 40460 has zero or one occurrence 40462 and is of data type GDT: CompleteTransmissionIndicator 40464. The PlannedBilling Date 40466 has zero or one occurrence 40468 and is of data type GDT: Date 40470. The DeliveryPeriod 40472 has zero or one occurrence 40474 and is of data type GDT: DateTimePeriod 40476. The ProposedInvoiceDate 40478 has zero or one occurrence 40480 and is of data type GDT: DateTime 40482.

The InvoiceDue package 40422 includes a Party package 40484, a Location package 40486, a Delivery Information package 40488, a Payment Information package 40490, a Price Information package 40492, an Account Assignment package 40494, an Attachment package 40496, a Description package 40498, and an Item package 40400A.

The Party package 40484 includes a BuyerParty entity 40402A, a SellerParty entity 40408A, a ProductRecipientParty entity 40414A, a VendorParty entity 40420A, a BillToParty entity 40426A, a BillFromParty entity 40432A, a PayerParty entity 40438A, and a PayeeParty entity 40444A at the third level 40406. The BuyerParty entity 40402A has zero or one occurrence 40404A and a data type of GDT: BusinessTransactionDocumentParty 40406A. The SellerParty entity 40408A has zero or one occurrence 40410A and a data type of GDT: BusinessTransaction DocumentParty 40412A. The ProductRecipientParty entity 40414A has zero or one occurrence 40416A and a data type of GDT: BusinessTransactionDocumentParty 40418A. The VendorParty entity 40420A has zero or one occurrence 40422A and a data type of GDT: BusinessTransactionDocumentParty 40424A. The BillToParty entity 40426A has zero or one occurrence 40428A and a data type of GDT: BusinessTransactionDocumentParty 40430A. The BillFromParty entity 40432A has zero or one occurrence 40434A and a data type of GDT: BusinessTransactionDocumentParty 40436A. The PayerParty entity 40438A has zero or one occurrence 40440A and a data type of GDT: BusinessTransactionDocumentParty 40442A. The PayeeParty entity 40444A has zero or one occurrence 40446A and a data type of GDT: BusinessTransactionDocument Party 40448A.

The Location package 40486 includes a ShipToLocation entity 40450A and a ShipFromLocation entity 40456A at the third level 40406. The ShipToLocation entity 40450A has zero or one occurrence 40452A and a data type of GDT: BusinessTransaction DocumentLocation 40454A. The ShipFromLocation entity 40456A has zero or one occurrence 40458A and a data type of GDT: BusinessTransactionDocumentLocation 40460A.

The DeliveryInformation package 40488 includes a DeliveryTerms entity 40462A at the third level 40406, which has zero or one occurrences 40464A and a data type of GDT: DeliveryTerms 40466A.

The PaymentInformation package 40490 includes a CashDiscountTerms entity 40468A and a PaymentForm entity 40474A at the third level 40406. The CashDiscountTerms entity 40468A has zero or one occurrences 40470A and a data type of GDT: CashDiscountTerms 40472A. The Payment- Form entity 40474A has zero or one occurrences 40476A and a data type of GDT: PaymentForm 40478A.

The PriceInformation package 40492 includes a Price entity 40480A at the third level 40406, which has zero or one occurrences 40482A. The Price entity 40480A includes a GrossAmount 40484A, a NetAmount 40490A, a TaxAmount 40496A, an ExchangeRate 40402B, and a PricingDate 40408B at the fourth level 40408. The GrossAmount 40484A has zero or one occurrences 40486A and a data type of GDT: Amount 40488A. The NetAmount 40490A has zero or one occurrences 40492A and a data type of GDT: Amount 40494A. The TaxAmount 40496A has zero or one occurrences 40498A and a data type of GDT: Amount 40400B. The ExchangeRate 40402B has zero or one occurrences 40404B and a data type of GDT: ExchangeDate 40406B. The PricingDate 40408B has zero or one occurrences 40410B and a data type of GDT: DateTime 40412B.

The AccountAssigrnment package 40494 includes an AccountAssigrnment entity 40414B at the third level 40406, which has zero or one occurrences 40416B and a data type of GDT: AccountingObjectSetDistribution 40418B .

The Attachment package 40496 includes an AttachmentWebAddress entity 40420B at the third level 40406, which has any number of occurrences 40422B and a data type of GDT: AttachmentWebAddress 40424B.

The Description package 40498 includes a Description entity 40426B at the third level 40406, which has zero or one occurrences 40428B and a data type of GDT: Description 40430B.

The Item package 40400A has an Item entity 40432B at the third level 40406, which has at least one occurrence 40434B and a data type of GDT: InvoiceDueItem 40436B. The Item entity 40432B includes a BaseBusinessTransaction DocumentItemID 40438B, a BaseBusinessTransaction DocumentItemTypeCode 40444B, a BaseBusinessTransaction DocumentItemDeletedIndicator 40450B, a SettlementRelevanceIndicator 40455B, an EvaluatedReceiptSettlementIndicator 40460B, a SettlementBlockedIndicator 40466B, a PricingIndicator 40472B, a PlannedBillingDate 40478B, a ProposedInvoiceDate 40484B, and a Hierarchy Relationship 40490B at the fourth level 40408.

The BaseBusinessTransaction DocumentItemID 40438B has one occurrence 40440B and a data type of GDT: BusinessTransactionDocument ItemID 40442B. The BaseBusinessTransactionDocumentItemTypeCode 40444B has one occurrence 40446B and a data type of GDT: BusinessTransactionDocument ItemTypeCode 40448B. The BaseBusinessTransactionDocumentItemDeletedIndicator 40450B has one occurrence 40452B and a data type of GDT: Deleted Indicator 40454B. The SettlementRelevanceIndicator 40455B has zero or one occurrences 40456B and a data type of GDT: BusinessTransactionDocument SettlementRelevanceIndicator 40458B. The EvaluatedReceiptSettlement Indicator 40460B has zero or one occurrences 40462B and a data type of GDT: EvaluatedReceiptSettlementIndicator 40464B. The SettlementBlockedIndicator 40466B has zero or one occurrences 40468B and a data type of GDT: BusinessTransactionBlockedIndicator 40470B. The PricingIndicator 40472B has zero or one occurrences 40474B and a data type of GDT: BusinessTransactionDocument PricingIndicator 40476B. The PlannedBillingDate 40478B has zero or one occurrences 40480B and a data type of GDT: Date 40482B. The ProposedInvoiceDate 40484B has zero or one occurrences 40486B and a data type of GDT: DateTime 40488B.

The Hierarchy Relationship 40490B has zero or one occurrences 40492B and includes a ParentItemID 40494B and a TypeCode 40400C at the fifth level 40410. The ParentItemID 40494B has one occurrence 40496B and a data type of GDT: BusinessTransactionDocumentItemID 40498B. The TypeCode 40400C has one occurrence 40402C and a data type of GDT: BusinessTransactionDocumentItemHierarchyRelationshipTypeCode 40403C.

The Item package 40400A includes a ProductInformation package 40404C, a PriceInformation package 40406C, a Party package 40408C, a Location package 40410C, a DeliveryInformation package 40412C, a PaymentInformation package 40414C, a BusinessTransactionDocumentReference package 40416C, an AccountAssignement package 40418C, an Attachment package 40420C, and a Description package 40422C.

The ProductInformation package 40404C includes a Product entity 40424C, a ProductCategory entity 40430C, a DeliveryDateTimePeriod entity 40436C, and a Quantity entity 40442C at the fourth level 40408. The Product entity 40424C has zero or one occurrences 40426C and a data type of GDT: BusinessTransactionDocument Product 40428C. The ProductCategory entity 40430C has zero or one occurrences 40432C and a data type of GDT: ProductCategory 40434C. The DeliveryDateTimePeriod entity 40436C has zero or one occurrences 40438C and a data type of GDT: DateTimePeriod 40440C. The Quantity entity 40442C has one occurrence 40444C and a data type of GDT: Quantity 40446C.

The PriceInformation package 40406C includes a Price entity 40448C and a ProcurementCostUpperLimt 40488C at the fourth level 40408. The Price entity 40448C has zero or one occurrences 40450C. The ProcurementCostUpperLimit 40488C has zero or one occurrences 40490C and a data type of GDT: ProcurementCostUpperLimit 40492C.

The Price entity 40448C includes a GrossAmount 40452C, a NetAmount 40458C, a TaxAmount 40464C, a ExchangeRate 40470C, a PricingDate 40476C, and a NetUnitPrice 40482C at the fifth level 40410. The GrossAmount 40452C has zero or one occurrences 40454C and a data type of GDT: Amount 40456C. The NetAmount 40458C has zero or one occurrences 40460C and a data type of GDT: Amount 40462C. The TaxAmount 40464C has zero or one occurrences 40466C and a data type of GDT: Amount 40468C. The ExchangeRate 40470C has zero or one occurrences 40472C and a data type of GDT: ExchangeRate 40474C. The PricingDate 40476C has zero or one occurrences 40478C and a data type of GDT: DateTime 40480C. The NetUnitPrice 40482C has zero or one occurrences 40484C and a data type of GDT: Price 40486C.

The Party package 40408C includes a BuyerParty entity 40494C, a SellerParty entity 40400D, a ProductRecipientParty entity 40406D, a VendorParty entity 40412D, a BillToParty entity 40418D, a BillFromParty entity 40424D, a PayerParty entity 40430D, and a PayeeParty entity 40436D at the fourth level 40408. The BuyerParty entity 40494C has zero or one occurrences 40496C and a data type of GDT: BusinessTransactionDocumentParty 40498C. The SellerParty entity 40400D has zero or one occurrences 40402D and a data type of GDT: BusinessTransactionDocumentParty 40404D. The ProductRecipientParty entity 40406D has zero or one occurrences 40408D and a data type of GDT: BusinessTransactionDocumentParty 40410D. The VendorParty entity 40412D has zero or one occurrences 40414D and a data type of GDT: BusinessTransactionDocumentParty 40416D. The BillToParty entity 40418D has zero or one occurrences 40420D and a data type of GDT: BusinessTransactionDocumentParty 40422D. The BillFromParty entity 40424D has zero or one occurrences 40426D and a data type of GDT: BusinessTransactionDocumentParty 40428D. The PayerParty entity 40430D has zero or one occurrences 40432D and a data type of GDT: BusinessTransactionDocumentParty 40434D. The PayeeParty entity 40436D has zero or one occurrences 40438D and a data type of GDT: BusinessTransactionDocumentParty 40440D.

The Location package 40410C includes a ShipToLocation entity 40442D and a ShipFromLocation entity 40448D at the fourth level 40408. The ShipToLocation entity 40442D has zero or one occurrences 40444D and a data type of GDT: BusinessTransactionDocumentLocation 40446D. The ShipFromLocation entity 40448D has zero or one occurrence 40450D and a data type of GDT: BusinessTransactionDocument Location 40452D.

The DeliveryInformation package 40412C includes a DeliveryTerms entity 40454D at the fourth level 40408, which has zero or one occurrences 40456D and a data type of GDT: DeliveryTerms 40458D.

The PaymentInformation package 40414C includes a CashDiscountTerns entity 40460D and a PaymentForm entity 40466D at the fourth level 40408. The CashDiscountTerms entity 40460D has zero or one occurrences 40462D and a data type of GDT: CashDiscountTerms 40464D. The PaymentForm entity 40466D has zero or one occurrences 40468D and a data type of GDT: PaymentFormCode 40470D.

The BusinessTransactionDocumentReference package 40416C includes a PurchaseOrder Reference entity 40472D, a SalesOrderReference entity 40478D, a DeliveryReference entity 40484D, a PurchaseContract Reference entity 40490D, a SalesContract Reference entity 40496D, a BuyerProduct CatalogueReference entity 40402E, and a SellerProduct CatalogueReference entity 40408E. The PurchaseOrder Reference entity 40472D has zero or one occurrences 40474D and a data type of GDT: BusinessTransactionDocumentReference 40476D. The SalesOrderReference entity 40478D has zero or one occurrences 40480D and a data type of GDT: BusinessTransactionDocumentReference 40482D. The DeliveryReference entity 40484D has zero or one occurrences 40486D and a data type of GDT: BusinessTransactionDocumentReference 40488D. The PurchaseContractReference entity 40490D has zero or one occurrences 40492D and a data type of GDT: BusinessTransactionDocumentReference 40494D. The SalesContractReference entity 40496D has zero or one occurrences 40498D and a data type of GDT: BusinessTransactionDocumentReference 40400E. The BuyerProductCatalogueReference entity 40402E has zero or one occurrences 40404E and a data type of GDT: CatalogueReference 40406E. The SellerProductCatalogueReference entity 40408E has zero or one occurrences 40410E and a data type of GDT: CatalogueReference 40412E.

The AccountAssignment package 40418C includes an AccountAssigmnent entity 40414E at the fourth level 40408, which has zero or one occurrences 40416E and a data type of GDT: AccountingObjectSetDistribution 40418E.

The Attachment package 40420C includes an AttachmentWebAddress entity 40420E at the fourth level 40408, which has any number or occurrences 40422E and a data type of GDT: AttachmentWebAddress 40424E.

The Description package 40422C includes a Description entity 40426E at the fourth level 40408, which has zero or one occurrences 40428E and a data type of GDT: Description 40430E.

o) Inventory Change Interfaces

Inventory change interfaces are interfaces that may be used to transfer information about stock changes in stockholding to interested applications, such as Logistics Planning (SCP) or Accounting. In a variation, the inventory change interfaces include the InventoryChangeNotification interface and the InventoryChangeAccountingNotification interface.

The motivating business scenarios for the InventoryChangeNotification and InventoryChangeAccountingNotification interfaces may be the Sell From Stock (SFS), Procure To Stock (PTS), and Physical Inventory scenarios. Goods are received in the PTS scenario and issued in the SFS scenario. In the Physical Inventory scenario, inventory differences can result in stock changes. All three scenarios can generally be grouped together as stock changes (InventoryChange). Information about stock changes is relevant to Accounting, as well as to other applications, such as Logistics Planning. Therefore, the InventoryChangeAccountingNotification message can be transferred to Accounting. To inform interested applications such as Planning, the InventoryChangeNotification message can be sent. In a variation, the content of the messages is prepared in Inventory Management (SCE) based on a set of rules tailored to the receiving service. For instance, in the case of stock transfers within the warehouse or changes in the stock of non-valuated material, the information may be sent to Planning but not to Accounting. The information may be sent at different times, depending on the receiving service. In an example, the information may be sent promptly to Planning, whereas Accounting is informed after a delay (such as once a month). In addition, the extent to which information is summarized in this scenario depends on the receiving service. If an order involves partial deliveries, Planning is informed of every single stock change resulting from each partial delivery. In contrast, Accounting is informed later of the total quantity delivered. Consequently, individual items of n InventoryChangeNotification messages sent at different times correspond to one item in an InventoryChangeAccountingNotification message. In a variation, SAP Business Information Warehouse (BW) could also be integrated later using another InventoryChange message (this message would be based on the same message data type, InventoryChangeMessage, as the messages described here). In this case, the information about stock changes may be summarized (for example, the sum of the goods issued for a material in a particular plant on a certain day).

(1) Message Types (a) Inventory Change Notification

An InventoryChangeNotification summarizes detailed information about stock changes in stockholding that may be required for Logistics Planning. The message type InventoryChangeNotification is based on the message data type InventoryChangeMessage.

(b) Inventory Change Accounting Notification

An InventoryChangeAccountingNotification summarizes aggregated information about stock changes in stockholding that may be required for Accounting. The message type InventoryChangeAccountingNotification is based on the message data type InventoryChangeMessage.

(2) Message Choreography

FIG. 405 depicts a graphical representation 40500 of an InventoryChangeNotification 40508 and an InventoryChangeAccountingNotification 40510 between business entities in accordance with methods and systems consistent with the subject matter described herein. The illustrative message choreography is a logical sequence of messages that is not dependent on actual scenarios. In the implementation shown in FIG. 405, the illustrative business entities include a stockholder (or Inventory Management 40502), a logistics planner (or Logistics Planning 40504), and an accountant (or Accounting 40506). In the illustrative example, Inventory Management 40502 informs interested applications, such as Logistics Planning 40504 (using InventoryChangeNotification 40508 message) or Accounting 40506 (using InventoryChangeAccountingNotification 40510), about stock changes. This information can also be cancelled by reference, in which Inventory Management 40502 sends an InventoryChangeAccountingCancellationNotification 40512 message to Accounting 40506. The reference to the original document (prima nota) can also be used in Accounting as an audit trail.

(3) Message Data Type Inventory Change Message

The message data type InventoryChangeMessage 40600 includes the InventoryChangeMessage object 40606 included in the business document and the business information that is relevant for sending a business document in a message. It includes a MessageHeader Package 40602 and an InventoryChange Package 40604. The message data type InventoryChangeMessage 40600 makes the structure available for the message type InventoryChange 40606 and the relevant interfaces InventoryChangeNotification 40508, InventoryChangeAccountingNotification 40510, and InventoryChangeAccountingCancellationRequest 40512.

(a) Message Header Package

A MessageHeader package 40602 groups together the business information that is relevant for sending a business document in a message. In one implementation, the MessageHeader package 40602 may not be relevant for implementing the InventoryChangeNotification 40508, InventoryChangeAccountingNotification 40510, or InventoryChangeAccountingCancellationRequest 40512.

(b) Inventory Change Package

The InventoryChange package 40604 summarizes changes in warehouse stock. It includes an InventoryChangeItem package 40608 and an InventoryChange entity 40610. There is a 1:1 relationship 40612 between the InventoryChangeMessage object 40606 and the InventoryChange entity 40610.

(i) Inventory Change

The InventoryChange entity 40610 summarizes changes in warehouse stock. An InventoryChange 40610 consists of individual changes in warehouse stock which Accounting or Logistics Planning is informed of. The stock changes summarized in a message may be of the same transaction type (goods receipt, goods issue, physical stock, transfer posting, and the like).

InventoryChange 40610 includes an ID and a BusinessTransactionTypeCode. The ID is a unique identifier of InventoryChange 40610, and is of type GDT: BusinessTransactionDocumentID. The BusinessTransactionTypeCode is the type of business transaction that caused the stock change, and is of type GDT: BusinessTransactionTypeCode.

In stockholding, the term "stock" refers to a certain quantity of a material kept in a particular location. Usually, other attributes are used to define the stock more precisely. The stock posted can differ from the physical warehouse stock but this can be corrected by physical inventories.

In a variation, a distinction can be made between external stock changes (goods receipt and issue) and internal stock changes (physical stock, stock transfer, and transfer posting). Stock changes are characterized by the difference between the (internal) stock prior to the change and the (internal) stock after the change. From the (internal) perspective of stockholding, each stock change involves an issue (outbound) or a receipt (inbound). In the case of goods receipt, a receipt is specified, whereas goods issue specifies an issue. Internal stock changes involve both an issue and a receipt. A stock change is transferred to Logistics Planning and Accounting as an item in an InventoryChangeNotification or an InventoryChangeAccountingNotification, respectively.

(ii) Inventory Change Item Package

The InventoryChangeItem package 40608 summarizes information about an individual warehouse stock change. It includes an InventoryChangeItem entity 40620, an InventoryChangeItemOutbound package 40614, an InventoryChangeItemInbound package 40616, and an InventoryChangeItemBusinessTransactionDocumentReference package 40618. In a variation, the InventoryChangeItem package 40608 may also include an InventoryChangeItemAccountingAssignment, which includes account assignment information for an individual warehouse stock change, such as the cost center.

InventoryChangeItem entity 40620 is an individual warehouse stock change. There is a 1:n 40622 relationship between InventoryChange entity 40610 and InventoryChangeItem entity 40620. An InventoryChangeItem entity 40620 includes an ID, a DateTime, and a Note. The ID is the item number, and is of type GDT: BusinessTransactionDocumentItemID. The DateTime is the date and time of the stock change, and is of type GDT: DateTime. The Note is a note about the stock change, and is of type GDT: Note.

(iii) Inventory Change Item Outbound Package

The InventoryChangeItemOutbound package 40614 summarizes information about an issue of warehouse stock. It includes an InventoryChangeItemOutbound entity 40624, a Location 40626, a Product 40628, and an OwnerParty 40630. There is a 1:c 40632 relationship between InventoryChangeItem 40620 and InventoryChangeItemOutbound entity 40624. There is a 1:n 40634 between InventoryChangeItemOutbound 40624 and Location 40626. There is a 1:1 40636 relationship between InventoryChangeItemOutbound 40624 and Product 40628. There is a 1:1 relationship 40638 between InventoryChangeItemOutbound 40624 and OwnerParty 40630.

(a) Inventory Change Item Outbound

An InventoryChangeItemOutbound 40624 characterizes an issue of warehouse stock by means of the ship-from location, issuing owner, issued quantity, and issued material. An InventoryChangeItemOutbound 40624 includes an InventoryUsabilityStatusCode, a ValuationQuantity, an OrderingQuantity, and an AdditionalQuantity. The InventoryUsabilityStatusCode is the usability of the stock for the company-specific business processes, and is of type GDT: InventoryUsabilityStatusCode. The ValuationQuantity is the quantity of the stock change expressed in the unit that Accounting uses to valuate stock, and is of type GDT: Quantity. The OrderingQuantity is the quantity of the stock change expressed in the unit of the purchase order (not to be confused with the ordered quantity), and is of type GDT: Quantity. The AdditionalQuantity is the quantity of the stock change in additional units used to manage stock, and is of type GDT: Quantity.

For the message data type InventoryChangeMessage, in a variation, an issue of warehouse stock is specified when goods are issued and internal stock changes occur but not when goods are received. For the message data type InventoryChangeAccounting Notification, the element AdditionalQuantity may be empty.

The stock of a material may be managed in several units of measure. A fixed conversion factor can exist between these units of measure (such as "gallons" and "liters"). This can be material-specific ("kg" and "litre") or general (material "pork halves" in the units of measure "piece" and "kg"). This information may be relevant for subsequent applications in the business process chain, such as Planning. In a variation, the moved quantities expressed in the order unit and the valuation unit of measure are relevant to Accounting. The units of measure that are permitted and used to specify the quantities can be established on the basis of the combination of material and location in each case. For instance, the material "crude oil" can be valuated in the unit of measure "litre" for the location "Hamburg" and in the unit of measure "gallon" for the location "Dallas."

Transfer postings can be made in which the InventoryUsability of the stock changes. In this case, the ship-from location, issue owner, issue quantity, and issue material are the same as for the receiving location, receipt owner, receipt quantity, and receipt material, but the issue InventoryUsability may differ from the receipt InventoryUsability.

(b) Location

A Location 40626 is the outbound location of a warehouse stock change. Location 40626 is of type GDT: BusinessTransactionDocumentLocation for which InternalID is used.

In the context of the InventoryChangeAccountingMessage, the location is the particular, valuation-relevant location of a stock change. In the context of the InventoryChangeMessage, the location may be the complete (hierarchical) specification of the location of a stock change.

Since stockholding generally uses a very fine-grained location structure (such as "storage bin 17-05-72"), this location is to be assigned to the valuation-relevant location (such as "plant 072 in Hamburg") prior to filling the InventoryChangeAccountingNotification message, as this information is of significance to Accounting. On the other hand, the entire location (such as "plant 072 in Hamburg," "warehouse 42," "storage bin 17-05-72") may be specified in the InventoryChangeNotification message, since this is of relevance to subsequent applications in the business process chain, such as Planning.

(c) Product

A Product 40628 is the issue material of a warehouse stock change. Product 40628 is of type GDT: BusinessTransactionDocumentProduct for which InternalID is used. In a variation, a material is a physical object which forms part of the business activity. In a variation, a material is traded, used during production, consumed, or produced. In particular, a material may be a product.

(d) Owner Party

An OwnerParty 40630 is the owner of the issue stock in a warehouse stock change. OwnerParty is of type GDT: BusinessTransactionDocumentParty for which InternalID is used.

(iv) Inventory Change Item Inbound Package

The InventoryChangeItemInbound package 40616 summarizes information about a receipt of warehouse stock. It includes an InventoryChangeItemInbound 40640, a Location 40642, a Product 40644, and an OwnerParty 40646. There is a 1:c 40648 relationship between InventoryChangeItem 40620 and InventoryChangeItemInbound 40640. There is a 1:n 40650 relationship between InventoryChangeItemInbound 40640 and Location 40642. There is a 1:1 40652 relationship between InventoryChangeItemInbound 40640 and Product 40644. There is a 1:1 40654 relationship between InventoryChangeItemInbound 40640 and OwnerParty 40646.

(a) Inventory Change Item Inbound

An InventoryChangeItemInbound 40640 characterizes a receipt of warehouse stock by means of the receiving location, receiving owner, received quantity, and received material. In the context of an InventoryChangeMessage, in a variation, a receipt of warehouse stock is specified when goods are received and internal stock changes occur but not when goods are issued. In the context of an InventoryChangeAccountingNotification, the element AdditionalQuantity may be empty.

(b) Location

A Location 40642 is the inbound location of a warehouse stock change. Location 40642 is of type GDT: BusinessTransactionDocumentLocation for which InternalID is used.

(c) Product

A Product 40644 is the receipt material of a warehouse stock change. Product 40644 is of type GDT: BusinessTransactionDocumentProduct for which InternalID is used.

(d) Owner Party

An OwnerParty 40646 is the owner of the receipt stock in a warehouse stock change. OwnerParty 40646 is of type GDT: BusinessTransactionDocumentParty for which InternalID is used.

(v) Inventory Change Item Business

Transaction Document Reference Package The InventoryChangeItemBusinessTransactionDocumentReference package 40618 summarizes the unique references to item lines in other documents, which are relevant in the business process for warehouse stock changes. It includes a SalesOrderReference 40656 and a PurchaseOrderReference 40658. If other scenarios, such as physical inventory, are to be mapped, additional elements could be required in this package. There is a 1:c relationship 40660 between InventoryChangeItem 40620 and SalesOrderReference 40656. There is a 1:c relationship 40662 between InventoryChangeItem 40620 and PurchaseOrderReference 40658.

(a) Sales Order Reference

A SalesOrderReference 40656 is a reference to a sales order item that triggered the change in warehouse stock. The SalesOrderReference 40656 is of type GDT: BusinessTransactionDocumentReference. The SalesOrderReference 40656 is filled in the case of a goods issue for a sales order. Subsequent applications in the business process chain may require this information to create the business context of the stock change (such as for account determination in Accounting).

(b) Purchase Order Reference

A PurchaseOrderReference 40658 is a reference to a purchase order item that triggered the stock change. The PurchaseOrderReference 40658 is of type GDT: BusinessTransactionDocumentReference. The PurchaseOrderReference 40658 is filled in the case of a goods receipt for a purchase order. Subsequent applications in the business process chain may require this information to create the business context of the stock change (such as for account determination in Accounting).

(4) Message Data Type Element Structure

FIGS. 407A-D depict the element structure for the Inventory Change, such as the InventoryChangeNotification and InventoryChangeAccountingNotification. The element structure is similar to the above described data model of the Inventory Change as reflected in FIG. 406, but provides additional information regarding the details for interfacing with or implementing an Inventory Change. As shown in FIGS. 407A-D, the element structure identifies the different packages 40700 that may be in a respective Inventory Change. The element structure for the Inventory Change includes six levels 40702, 40704, 40706, 40708, 40710, and 40712 associated with a respective package 40700. The element structure for an Inventory Change also identifies the cardinality 40714 and data type 40716 for the elements at respective levels 40702, 40704, 40706, 40708, 40710, and 40712 in a package 40700.

The outermost package of this interface is an InventoryChangeMessage package 40718, which includes an InventoryChangeMessage entity 40720 at the first level 40702. The InventoryChangeMessage entity 40720 is of message data type InventoryChangeMessage 40722.

The InventoryChangeMessage package 40718 includes an InventoryChange package 40724 that has an InventoryChange entity 40726. There is one 40728 InventoryChange entity 40726, which is of global data type ("GDT"): InventoryChange. As shown in FIG. 407A, each InventoryChange entity 40726 includes an ID 40732 and a BusinessTransactionTypeCode 40738. The ID 40732 is of type GDT: BusinessTransactionDocumentID 40736. The BusinessTransactionTypeCode 40738 is of type GDT: BusinessTransactionTypeCode 40742. For each InventoryChange entity 40726, there is one 40734 ID 40726 and one 40740 BusinessTransactionTypecode 40738.

The InventoryChange package 40724 also includes an Item package 40744. Item package 40744 includes an Item entity 40746 of type GDT: InventoryChangeItem 40750. There is one or more 40748 Item entity 40746. Each Item entity 40746 includes an ID 40752, a DateTime 40758, and a Note 40764. The ID 40752 is of type GDT: BusinessTransactionDocumentItemID 40756. The DateTime 40758 is of type GDT: DateTime 40762. The Note 40764 is of type GDT: Note 40768. For each Item entity 40746, there is one 40754 ID 40752, one 40760 DateTime 40758, and zero or one 40766 Note 40764.

The Item package 40744 also includes an Outbound package 40770, an Inbound package 40774, and a BusinessTransactionDocumentReference package 40776.

Outbound package 40770 includes an Outbound entity 40776 of type GDT: InventoryChangeItemOutbound 40780. There is zero or one Outbound entity 40776 for each InventoryChangeItem entity 40746. Outbound entity 40776 includes one or more 40784 Location entity 40782 of data type GDT: BTDLocation 40786. Location entity 40782 includes one 40790 InternalID entity 40788 of data type GDT: LocationInternalID 40792. Outbound entity also includes one 40796 Product entity 40794 of data type GDT: BTDProduct 40798. Product entity 40794 includes one 40702A InternalID 40700A of data type GDT: ProductInternalID 40704A. Outbound entity 40776 also includes one 40708A OwnerParty entity 40706A of data type GDT: BTDParty 40710A. OwnerParty entity 40706A includes one 40714A InternalID entity 40712A of data type GDT: PartyInternalID 40716A.

Outbound entity 40776 also includes an InventoryUsabilityStatusCode entity 40718A of data type GDT: InventoryUsabilityStatusCode 40722A, an OrderingQuantity entity 40724A of data type GDT: Quantity 40728A, a ValuationQuantity entity 40730A of data type GDT: Quantity 40734A, and an AdditionalQuantity 40736A of data type GDT: Quantity 40740A. For each Outbound entity 40776, there is one 40720A InventoryUsabilityStatusCode 40718A, zero or one 40726A OrderingQuantity 40724A, zero or one 40732A ValuationQuantity 40730A, and zero or more 40738A AdditionalQuantity 40736A.

Inbound package 40774 includes an Inbound entity 40742A of type GDT: InventoryChangeItemInbound 40746A. There is zero or one Inbound entity 40742A for each InventoryChangeItem entity 40746. Inbound entity 40742A includes one or more 40750A Location entity 40748A of data type GDT: BTDLocation 40752A. Location entity 40748A includes one 40756A InternalID entity 40754A of data type GDT: LocationInternalID 40758A. Inbound entity 40742A also includes one 40762A Product entity 40760A of data type GDT: BTDProduct 40764A. Product entity 40760A includes one 40768A InternalID 40766A of data type GDT: ProductInternalID 40770A. Inbound entity 40742A also includes one 40774A OwnerParty entity 40772A of data type GDT: BTDParty 40776A. OwnerParty entity 40772A includes one 40780A InternalID entity 40778A of data type GDT: PartyInternalID 40782A.

Inbound entity 40742A also includes an InventoryUsabilityStatusCode entity 40784A of data type GDT: InventoryUsabilityStatusCode 40788A, an OrderingQuantity entity 40790A of data type GDT: Quantity 40794A, a ValuationQuantity entity 40796A of data type GDT: Quantity 40700B, and an AdditionalQuantity 40702B of data type GDT: Quantity 40706B. For each Inbound 40742A, there is one 40786A InventoryUsabilityStatusCode 40784A, zero or one 40792A OrderingQuantity 40790A, zero or one 40798A ValuationQuantity 40796A, and zero or more 40704B AdditionalQuantity 40702B.

BusinessTransactionDocumentReference 40776 includes a SalesOrderReference entity 40708B of type GDT: BusinessTransactionDocumentReference 40712B and a PurchaseOrderReference entity 40714B of type GDT: BusinessTransactionDocumentReference 40718B. For each InventoryChangeItem 40746, there is zero or one 407 1OB SalesOrderReference 40708B and zero or one 40716B PurchaseOrderReference 40714B.

p) Sales Order Fulfillment Interfaces

SalesOrderFulfillment interfaces allow sales orders and availability confirmations to be exchanged in a sales order fulfillment between a selling component or business entity and a procurement planning component or business entity (e.g., fulfillment coordination, supply chain execution, logistics, availability check, requirements planning, scheduling, procurement, and other business entities). As discussed in detail below, the SalesOrderFulfillment interfaces reflect the logistical part of the PurchaseOrder messages that are sent from the customer (Buyer) to the selling component (Seller).

In the 'Sell from Stock' scenario, goods and service orders are accepted by customers and create a request to logistics to fulfill the order. In this scenario, the order is fulfilled in that the ordered goods are procured to the customer from a warehouse. An availability check and scheduling (synchronously or asynchronously) is typically not planned for in the first step. Third-party order processing is not investigated in detail. It is assumed that there will be typically one procurement planning component (fulfillment coordination) that communicates with a selling component. If there are several procurement planning components, one of them is responsible for the communication with the selling components. There may be any number of selling components.

(1) Message Types (a) Sales Order Fulfillment Request

A SalesOrderFulfillmentRequest message is a request (or change and cancellation of such a request) from a selling component to a procurement planning component to fulfill a sales order and, in doing so, to take into account the logistical requirements (availability check, scheduling, requirements planning, procurement, delivery, . . . ) of a sales order. The structure of the message type SalesOrderFulfillmentRequest is specified by the message data type SalesOrderFulfillmentMessage in FIG. 409.

(b) Sales Order Fulfillment Confirmation

A SalesQrderFulfillmentConfirmafion message is the confirmation, the partial confirmation, or the changing of the procurement planning component to the selling component with regards to the fulfillment of a sales order. The structure of the message type SalesOrderFulfillmentConfirmation is specified by the message data type SalesOrderFulfillmentMessage in FIG. 409.

The SalesOrderFulfillmentConfirmation message can be used by the procurement planning component in the following ways:

(1) The procurement planning component may inform the selling component of the confirmation status of the SalesOrderFulfillment. The confirmation status values may be 'accepted,' 'pending,' or 'rejected.' The confirmation status may be set at the header or item level of the SalesQrderFulfillmentConfirmation message as discussed in further detail below. In one implementation, a rejection at the header level equates to a rejection of all items. Acceptance at header level means acceptance of the SalesOrderFulfillment. Individual items may be accepted, opened, or rejected.

(2) The procurement planning component may explicitly confirm planned procurement schedules, quantities and other procurement elements to the selling component, and suggest substitute products.

The selling component may explicitly request a SalesOrderFulfillmentConfirmation by setting the FollowUpSalesOrderFulfillmentConfirmation/RequirementCode to 'expected.' In this implementation, the procurement planning component may send a SalesOrderFulfillmentConfirmation:

(1) as a response when a SalesOrderFulfillmentRequest message is received. In order to send the response as promptly as possible, no user interaction should be required with the procurement planning component. If it is not possible to accept or reject a request for the selling component automatically, the confirmation status 'pending' may be used.

(2) when the confirmation status of the SalesOrderFulfillment as a whole or of an item changes.

(3) when quantities or deadlines can be explicitly confirmed, or when changes to confirmations that have already been transferred occur.

A SalesOrderFulfillmentConfirmation may be sent by the procurement planning component when the procurement planning component rejects individual items or the SalesOrderFulfillment as a whole and when the procurement planning component requires changes to the sales order.

(2) Message Choreography

The interaction that takes place between the SalesOrderFulfillment interfaces is described in detail in the following section.

SalesOrderFulfillmentRequest and SalesOrderFulfillmentConfirmation are the messages that are used to represent a SalesOrderFulfillment process.

Furthermore, the selling component is interested in the actual confirmations from the procuring component: e.g., delivery created, reserved goods issued, goods packed and goods issue posted, DeliveryInfo.

(a) Process Flow

As depicted in FIG. 408, the message choreography may involve the following business entities or components: a Purchasing component 40802, a Sales component 40804, a Fulfillment coordination component 40806, a SupplyChain Planning component 40808, and a SupplyChain Execution component 40810. To start the process, the Sales component 40804 receives a PurchaseOrderRequest message 40812 from the Purchasing component 40802. In response, the Sales component 40804 starts a fulfillment process for a sales order by sending a SalesOrderFulfillmentRequest message 40814 to the Fulfillment Coordination component 40806, which in turn sends the SalesOrderFulfillmentRequest message 40814 to the SupplyChain Planning component 40816. Supply Chain Planning 40816 may respond to FulFillment Coordination 40806 with a SalesOrderFulfillmentConfirmation 40818.

After the process has started, the Sales component 40804, whether internally or triggered by the customer, is operatively configured to communicate requests for changes via a SalesOrderFulfillmentRequest message (e.g., that has an action code set to 'Change') to Fulfillment Coordination 40806. The Sales component 40804 is also operatively configured to communicate a request to delete or reject the sales order (e.g., action code set to 'Delete'). After the SalesOrderFulfillmentRequest message has been received, the procurement planning component (Fullfillment Coordination 40806) may inform the selling component (Sales component 40804) about the status of the sales order with regard to the confirmed quantities and dates via a SalesOrderFulfillmentConfirmation message 40820. Upon receiving this, the Sales component 40804 may send a PurchaseOrderConfirmation 40822 to the Purchasing component 40802.

(b) Serialization of Messages

The messages within a SalesOrderFulfillment process are transferred EOIO (exactly once in order) and serialized using message queues. In one implementation, there is one message queue per SalesOrderFulfillment process (as opposed to one queue for all SalesOrderFulfillment messages) so that if one message fails, not all other SalesOrderFulfillment messages are blocked throughout the entire system.

(c) Error Handling

A target system (e.g., the Fulfillment Coordination component) is operatively configured to accept each formally correct incoming SalesOrderFulfillment message. Business problems are solved via a SalesOrderFulfillmentRequest (change, reject) message on the selling side and via a SalesOrderFulfillmentConfirmation message on the procurement planning side. In order to avoid endless message loops, a selling system may not be allowed to reject a SalesOrderFulfillmentConfirmation automatically via a SalesOrderFulfillmentRequest, or it has to present other mechanisms to avoid endless loops (for example, maximum one consecutive rejection permitted). To restart a SalesOrderFulfillment process that is corrupt due to a failed message, the selling system should offer the possibility of transferring the current state of the SalesOrderFulfillment with a SalesOrderFulfillmentRequest message. The action codes 'Save' and 'Remove' can be used in this message. The procurement planning system should offer the same functionality for the SalesOrderFulfillmentConfirmation. In order to be able to restart a process after a failed SalesOrderFulfillmentRequest message (create), the selling system should be in a position to start a SalesOrderFulfillment process with a SalesOrderFulfillmentRequest message (change).

(3) Message Data Type Sales Order Fulfillment Message

Figure 409A:
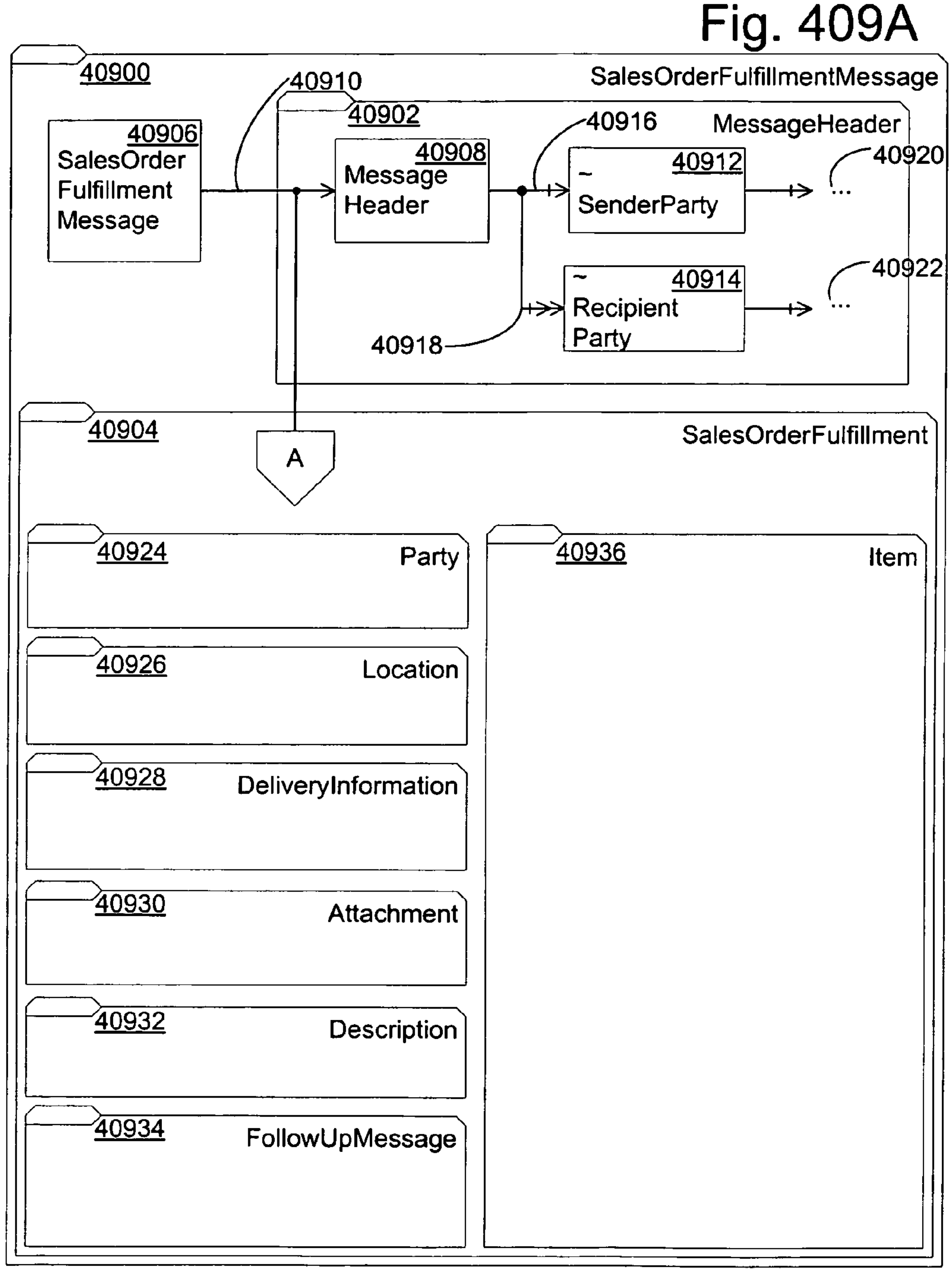

The data model for the message data type SalesOrderFulfillmentMessage used to implement a SalesOrderFulfillmentRequest message, a SalesOrderFulfillmentConfirmation message, and relevant interfaces is depicted in FIGS. 409A-L. The message data type SalesOrderFulfillmentMessage includes the object SalesOrderFulfillment included in the business document and the business information that is relevant for sending a business document in a message. As shown in FIG. 409A, the SalesOrderFulfillmentMessage 40900 includes a MessageHeader package 40902, a SalesOrderFulfillment package 40904, and a SalesOrderFulfillmentMessage object or entity 40906.

(a) Message Header Package

The MessageHeader package 40902 groups the business information that is relevant for sending a business document in a message. The MessageHeader package 40902 includes a MessageHeader entity 40908. There is a 1:1 relationship 40910 between the SalesOrderFulfillmentMessage entity 40906 and the MessageHeader entity 40908. The MessageHeader package 40902 also includes a SenderParty entity 40912 and a RecipientParty entity 40914. The MessageHeader entity 40908 has a 1:c relationship 40916 with the SenderParty entity 40912 and a 1:cn relationship 40918 with the RecipientParty entity 40914.

(i) Message Header

The MessageHeader entity 40908 groups the business information for the sending application for identifying the business document in a message, information about the sender, and potential information about the recipient. The MessageHeader entity 40908 is of type GDT: BusinessDocumentMessageHeader.

(ii) Sender Party

The SenderParty entity 40912 is responsible for sending a business document at business application level. The SenderParty entity 40912 is of type GDT: BusinessDocumentMessageHeaderParty.

(iii)Recipient Party

The RecipientParty 40914 is responsible for receiving a business document at business application level. The RecipientParty 40914 is of type GDT: BusinessDocumentMessageHeaderParty.

(b) Sales Order Fulfillment Package

Figure 409B:
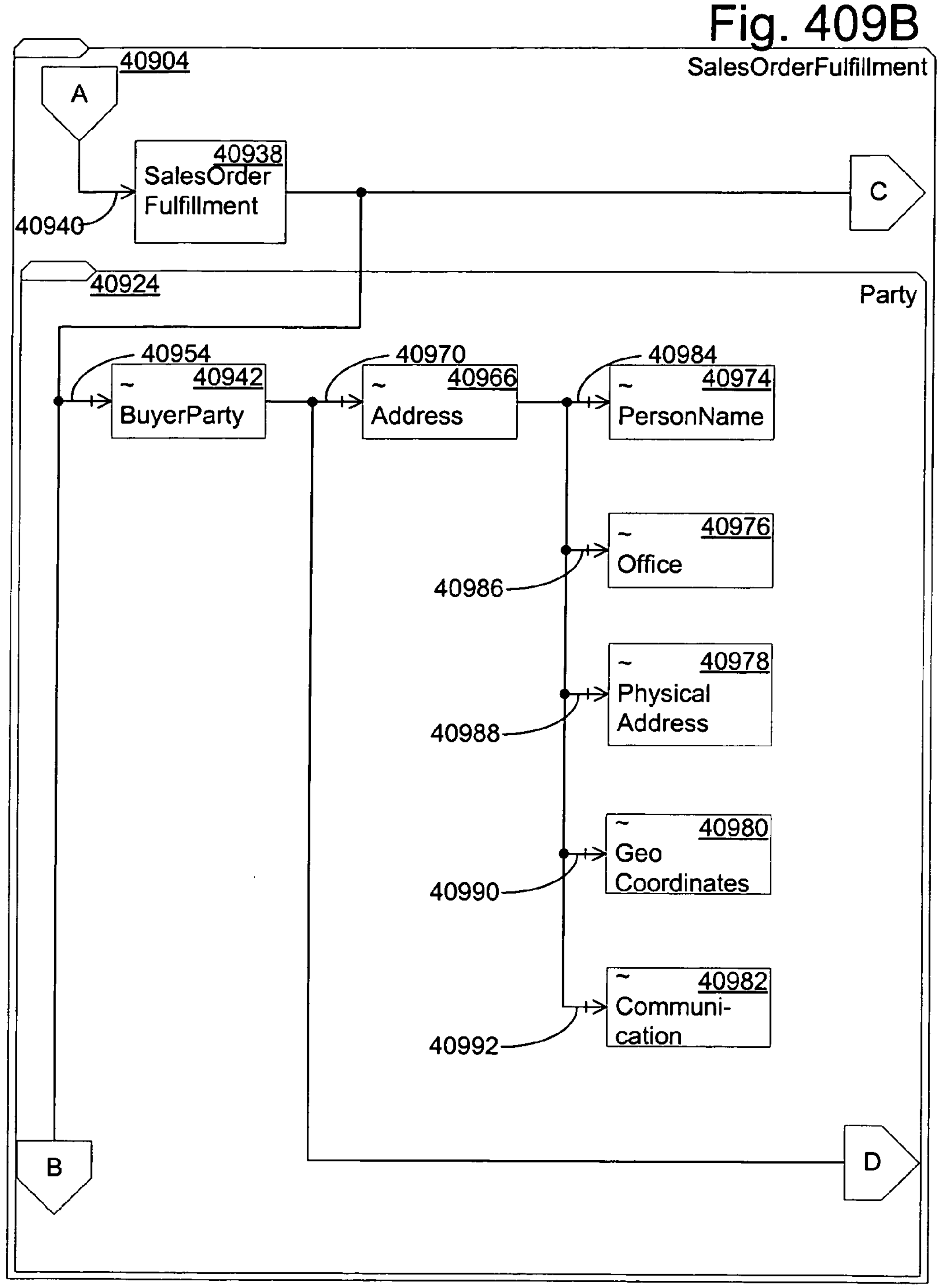
Figure 409C:
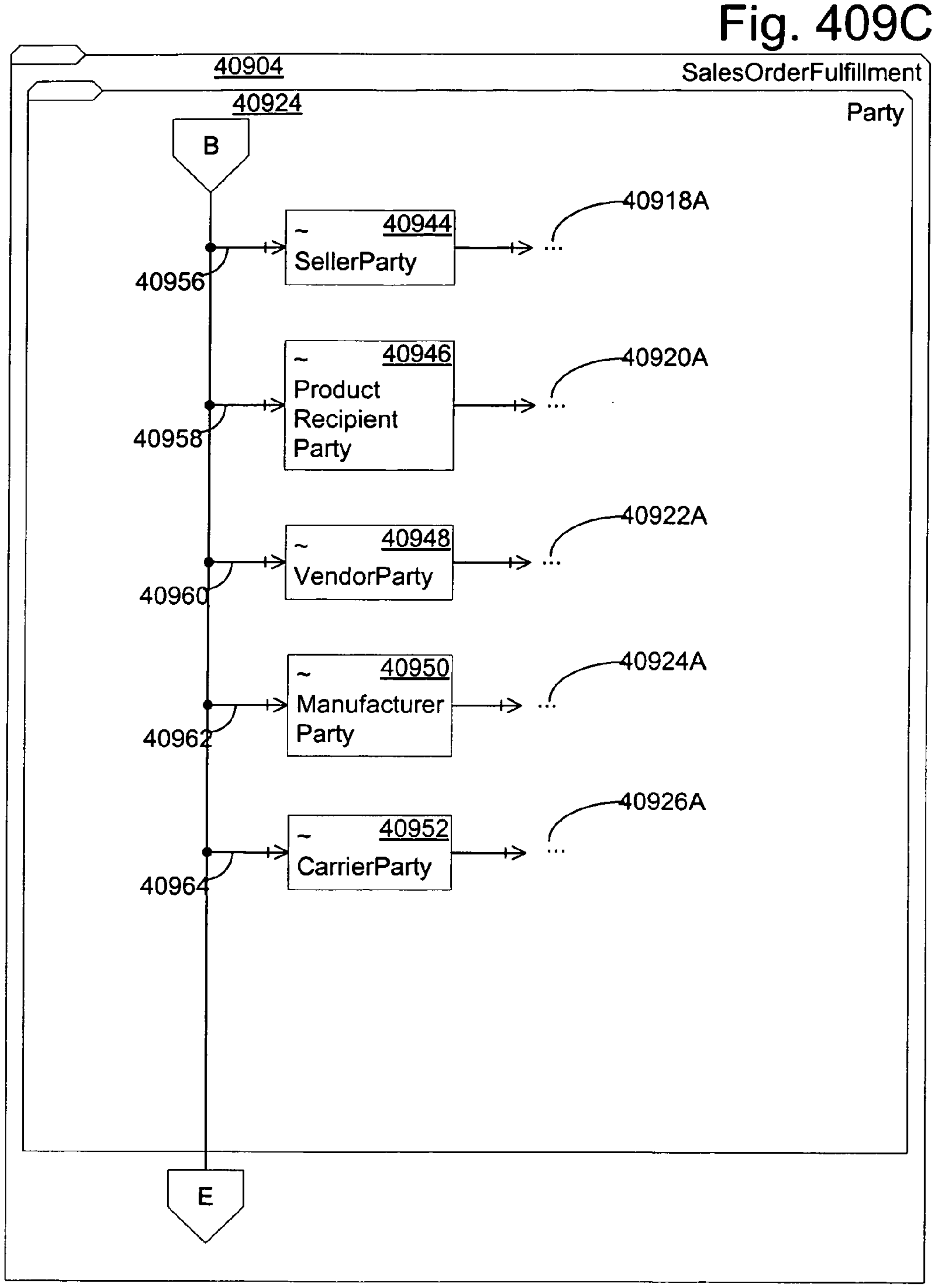
Figure 409D:
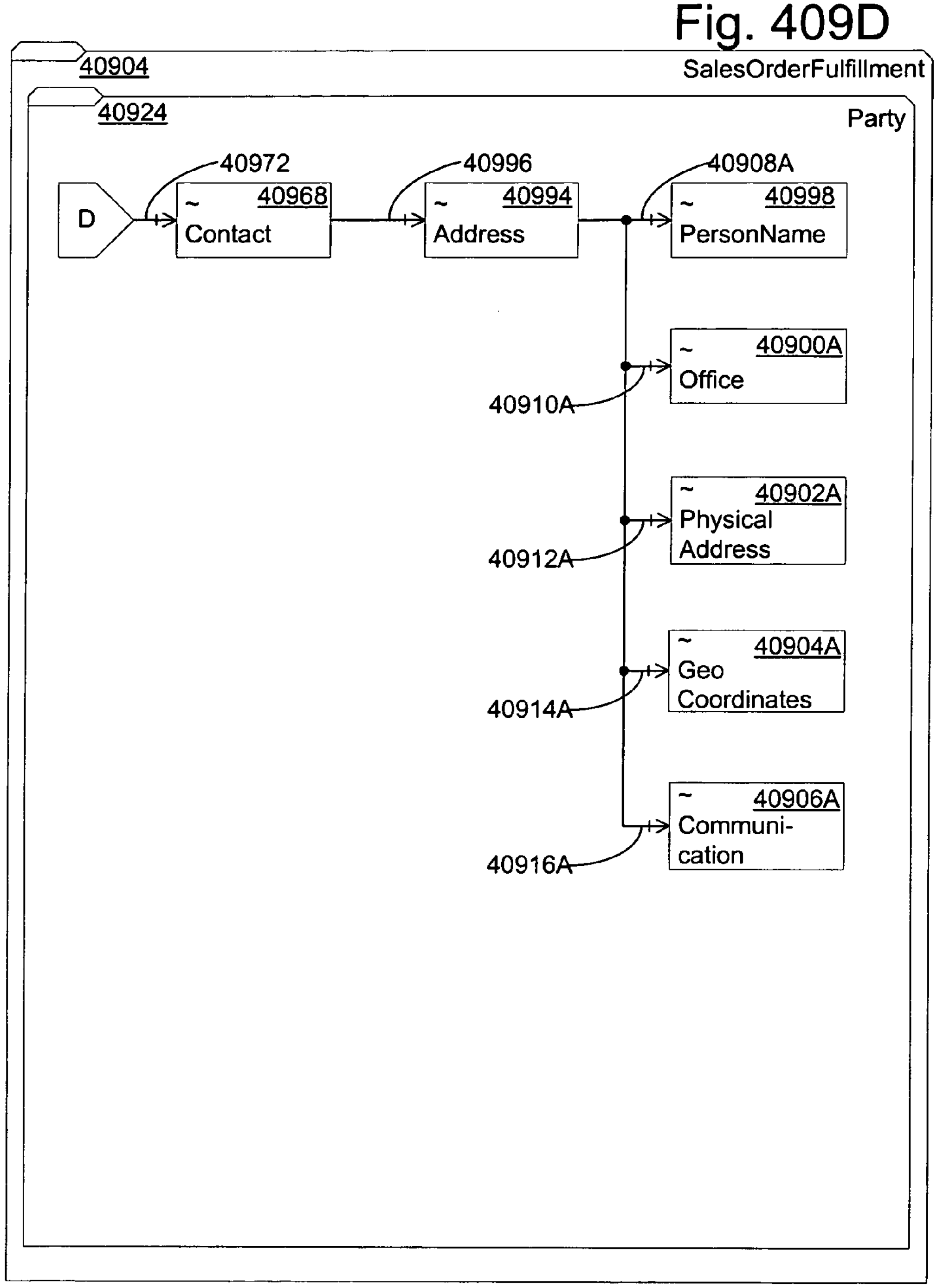

The SalesOrderFulfillment package 40904 groups the SalesOrderFulfillment with a Party Package 40924, a Location Package 40926, a DeliveryInformation Package 40928, an Attachment Package 40930, a Description Package 40932, a FollowUpBusinessTransactionDocument Package 40934, an Item Package 40936, and a SalesOrderFulfillment entity 40938 (FIG. 409B). There is a 1:1 relationship 40940 between the SalesOrderFulfillmentMessage entity 40906 and the SalesOrderFulfillment entity 40938.

(i) Sales Order Fulfillment

A SalesOrderFulfillmentRequest is a request (or change and cancellation of such a request) to fulfill a sales order and, in doing so, to take into account the logistical requirements (availability check, scheduling, requirements planning, procurement, delivery, . . . ) of a sales order. The SalesOrderFulfillment entity 40938 (FIG. 409B) is divided into SalesOrderFulfillmentItems 40932B (FIG. 409H) that each specify the product that is still to be fulfilled or additional information for such a product such as BOM information (see PurchaseOrderItem Package). The SalesOrderFulfillment entity 40938 has a 1:cn relationship 40934B with the Item entity 40932B. Alongside the purchasing party and the seller, other parties can be involved in the SalesOrderFulfillment (see Party Package 40924). For the fulfillment of the SalesOrderFulfillment, locations can be determined (see Location Package 40926), and delivery methods can be agreed upon (see DeliveryInformation Package 40928). Notes or references to attachments can be added to the SalesOrderFulfillment (see Description Package 40932 or Attachment Package 40930). Furthermore, it is possible to specify which types of follow-up documents are expected with regard to the SalesOrderFulfillment (see FollowUpBusinessTransactionDocument Package 40934). The SalesOrderFulfillment entity 40938 is of type GDT: SalesOrderFulfillment.

The SalesOrderFulfillment entity 40938 includes an ID, a BaseBusinessTransactionDocumentID, a BaseBusinessTransactionDocumentTypeCode, an ActionCode, an ItemListCompleteTransmissionIndicator, a CreationDateTime, a LastChangeDateTime, and an AcceptanceStatusCode. The ID is a unique identification issued by the seller for a SalesOrderFulfillment. The ID is of type GDT: BusinessTransactionDocumentID. The BaseBusinessTransactionDocumentID is a unique identifier of the business document underlying the SalesOrderFulfillment. The BaseBusinessTransactionDocumentID is of type GDT: BusinessTransactionDocumentID. The BaseBusinessTransactionDocumentTypeCode is the coded representation of the type of the business document underlying the SalesOrderFulfillment. The BaseBusinessTransactionDocumentTypeCode is of type GDT: BusinessTransactionDocumentTypeCode. The ActionCode is the request to newly create, change, or delete the SalesOrderFulfillment at the recipient of the SalesOrderFulfillment. The ActionCode is of type GDT ActionCode. The ItemListCompleteTransmissionIndicator specifies whether all items of the requesting document are always transferred and non-transferred items implicitly count as rejected, or whether new and changed items as well as items that have been rejected since the last transfer are transferred. The ItemListCompleteTransmissionIndicator is of type GDT CompleteTransmissionIndicator. The CreationDateTime is the creation date of the requesting document. CreationDateTime is of type GDT Date Time. The LastChangeDateTime is the change date of the requesting document. The LastChangeDateTime is of type GDT Date Time. The AcceptanceStatusCode is the coded representation of the status of the agreement of the procurement planning unit. The AcceptanceStatusCode is of type GDT: AcceptanceStatusCode.

ActionCode/CompleteTransmissionIndicator: in a SalesOrderFulfillmentRequest, items and schedule lines may be transferred with complete dates at the object level, that is to say, when an item or a schedule line is transferred, all dates of that item or schedule line specified on the interface may be transferred too. In the SalesOrderFulfillmentRequest, the ActionCode may be used at a header and an item level to display whether the SalesOrderFulfillmentRequest or individual items are to be created, changed or deleted or rejected (for example, individual schedule lines). A SalesOrderFulfillmentRequest may be configured to control whether all items are transferred or those items that have been explicitly changed via the CompleteTransmissionIndicator. One convention is that if the CompleteTransmissionIndicator is set, the ActionCode is by definition set to 'Create.' In this case, items that have not been transferred are implicitly deleted.

The AcceptanceStatusCode may be used in the SalesOrderFulfillmentConfirmation message at header and item level to describe the status of the agreement of the procurement planning component with regard to the SalesOrderFulfillment or individual items.

(ii) Sales Order Fulfillment Party Package

The Party package 40924 (FIG. 409B) is a grouping of the business parties involved in the SalesOrderFulfillment. The Party package 40924 includes a BuyerParty entity 40942, a SellerParty entity 40944 (FIG. 409C), a ProductRecipientParty entity 40946, a VendorParty entity 40948, a ManufacturerParty entity 40950, and a CarrierParty entity 40952. The SalesOrderFulfillment entity 40938 has a respective 1:c relationship 40954-64 with each of the BuyerParty entity 40942, the SellerParty entity 40944, the ProductRecipientParty entity 40946, the VendorParty entity 40948, the ManufacturerParty entity 40950, and the CarrierParty entity 40952.

(a) Buyer Party

The BuyerParty is a party that buys goods or services. The BuyerParty entity 40942 is of type GDT: BusinessTransactionDocumentParty. In one implementation, the BuyerParty entity 40942 uses an InternalID from the GDT: BusinessTransactionDocumentParty data type to identify the BuyerParty. In one implementation, the same BuyerParty applies to all items in a SalesOrderFulfillment. In SAP CRM, the BuyerParty is also referred to as the SoldToParty or the customer.

The BuyerParty entity 40942 has a 1:c relationship 40970 with an Address entity 40966 and a 1:c relationship 40972 with a Contact entity 40968. The Address entity 40966 has a respective 1:c relationship 40984-92 with each of a Person- Name entity 40974, a Office entity 40976, a PhysicalAddress entity 40978, a GeoCoordinates entity 40980, and a Communication entity 40982. Likewise, Contact entity 40968 has a respective 1:c relationship 40996 with an Address entity 40994, which in turn has a respective 1:c relationship 40908A-16A with each of a PersonName entity 40998, an Office entity 40900A, a Physical Address entity 40902A, a GeoCoordinates entity 40904A, and a Communication entity 40906A.

(b) Seller Party

A SellerParty is a party that sells goods or services. The SellerParty entity 40944 is of type GDT: BusinessTransactionDocumentParty. In one implementation, the SellerParty entity 40944 uses an InternalID from the GDT: BusinessTransactionDocumentParty data type to identify the SellerParty. In one implementation, the same SellerParty applies to all items in a SalesOrderFulfillment.

(c) Product Recipient Party

A ProductRecipientParty is a party to which goods are delivered or services are provided. The ProductRecipientParty entity 40946 is of type GDT: BusinessTransactionDocumentParty. In one implementation, the ProductRecipientParty entity 40946 uses an InternalID from the GDT: BusinessTransactionDocumentParty data type to identify the ProductRecipientParty. In one implementation, if a ShipToLocation is not explicitly specified in a SalesOrderFulfillment process, the address of the ProductRecipientParty may be used as the ShipToLocation address.

(d) Vendor Party

A VendorParty is a party which delivers goods or provides services. The VendorParty entity 40948 is of type GDT: BusinessTransactionDocumentParty. In one implementation, the VendorParty entity 40948 uses an InternalID from the GDT: BusinessTransactionDocumentParty data type to identify the VendorParty. In one implementation, if a ShipFromLocation is not explicitly specified in a SalesOrderFulfillment process, the address of the VendorParty may be used as the ShipFromLocation address. The VendorParty is not the company or the person that exclusively takes on the transport of goods. The CarrierParty is intended for this. The contact and the address of the VendorParty are used by the selling component as the contact person for the procurement planning component.

(e) Manufacturer Party

A ManufacturerParty is a party that manufactures goods. The ManufacturerParty entity 40950 is of type GDT: BusinessTransactionDocumentParty. In one implementation, the ManufacturerParty entity 40950 uses an InternalID from the GDT: BusinessTransactionDocumentParty data type to identify the ManufacturerParty.

(f) Carrier Party

A CarrierParty is a party that transports goods. The CarrierParty entity 40952 is of type GDT: BusinessTransactionDocumentParty. In one implementation, the CarrierParty entity 40952 uses an InternalID from the GDT: BusinessTransactionDocumentParty data type to identify the CarrierParty.

(iii) Sales Order Fulfillment Location Package

Figure 409E:
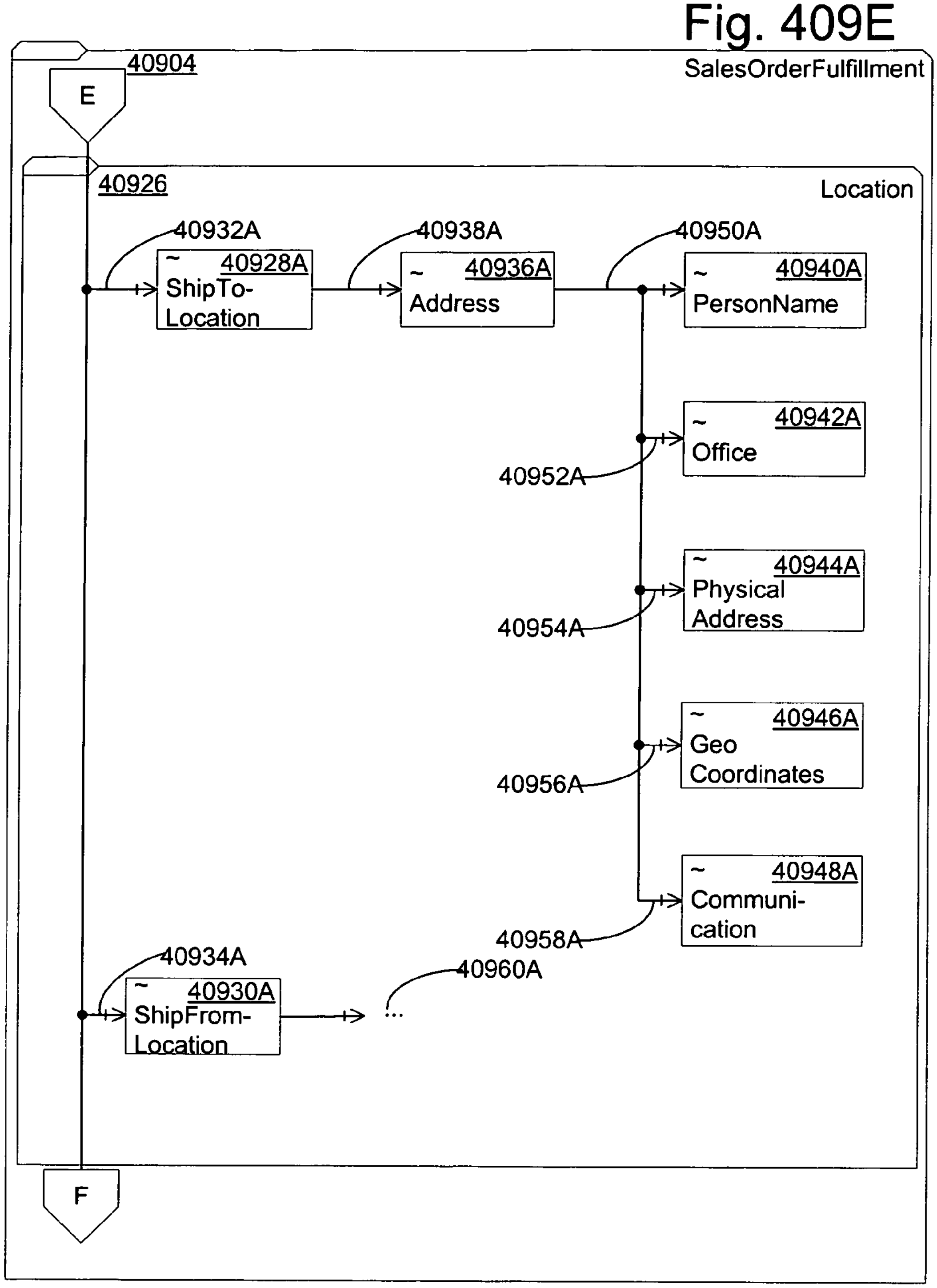
Figure 409F:
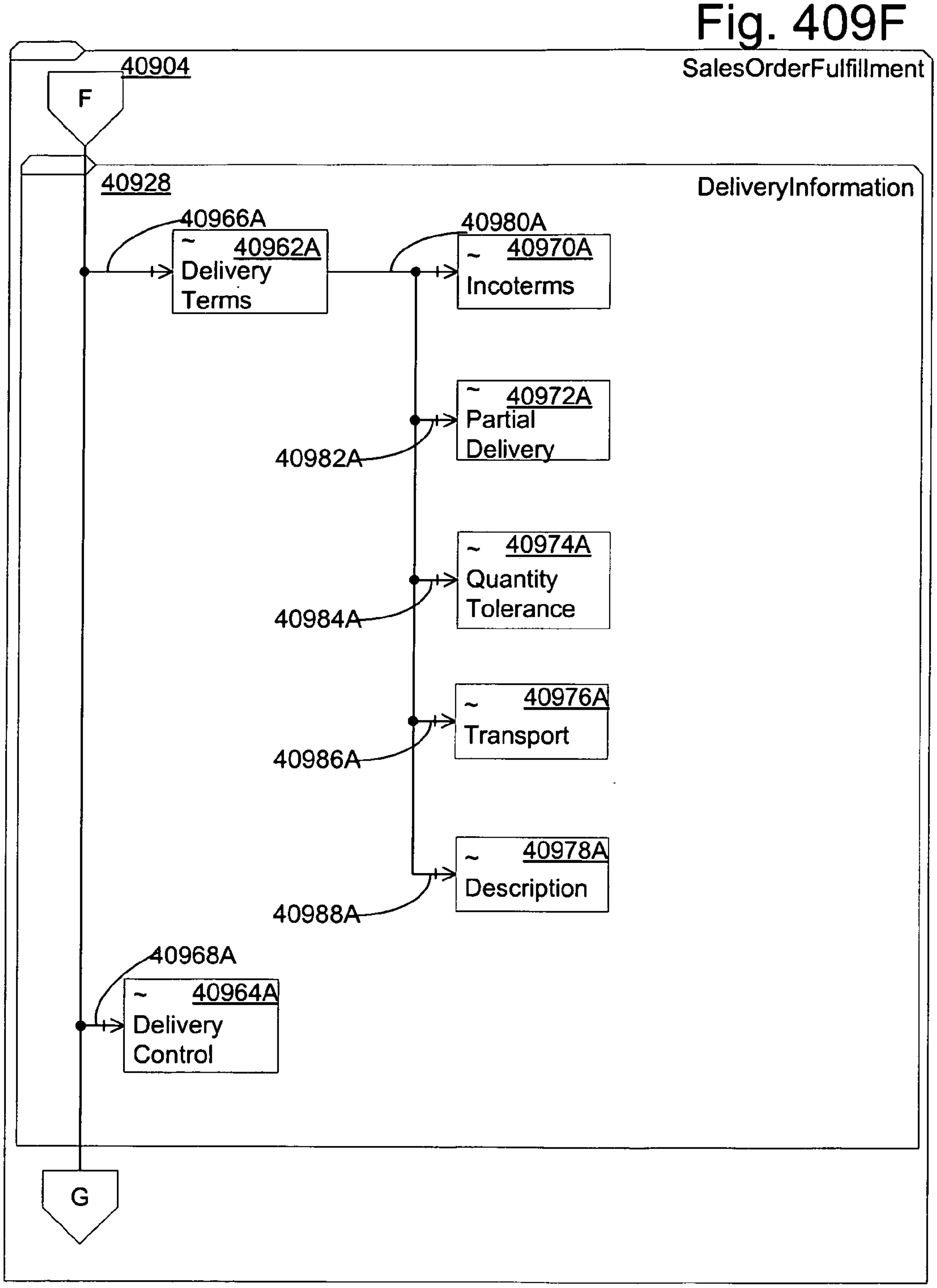
Figure 409G:
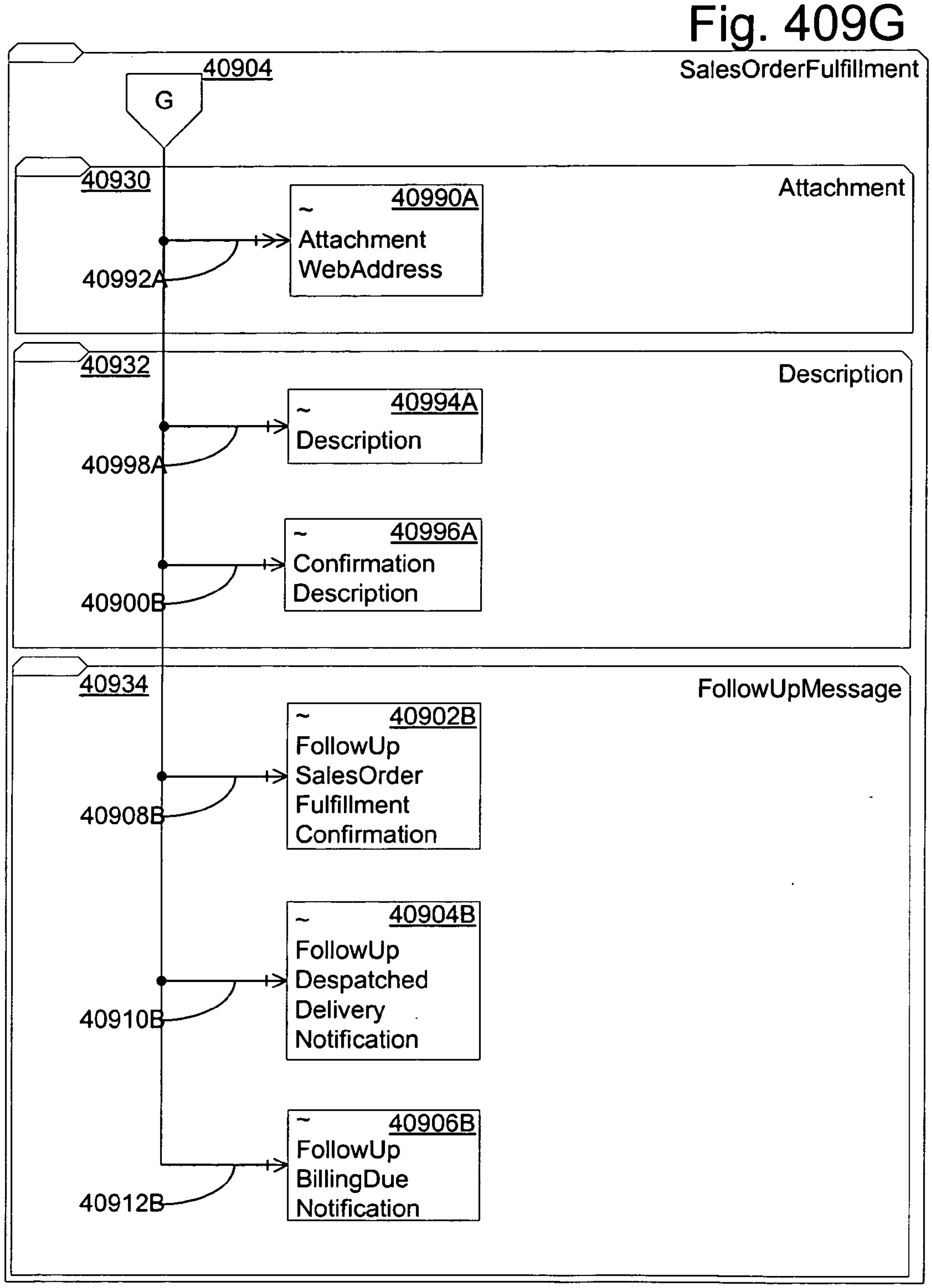
Figure 409H:
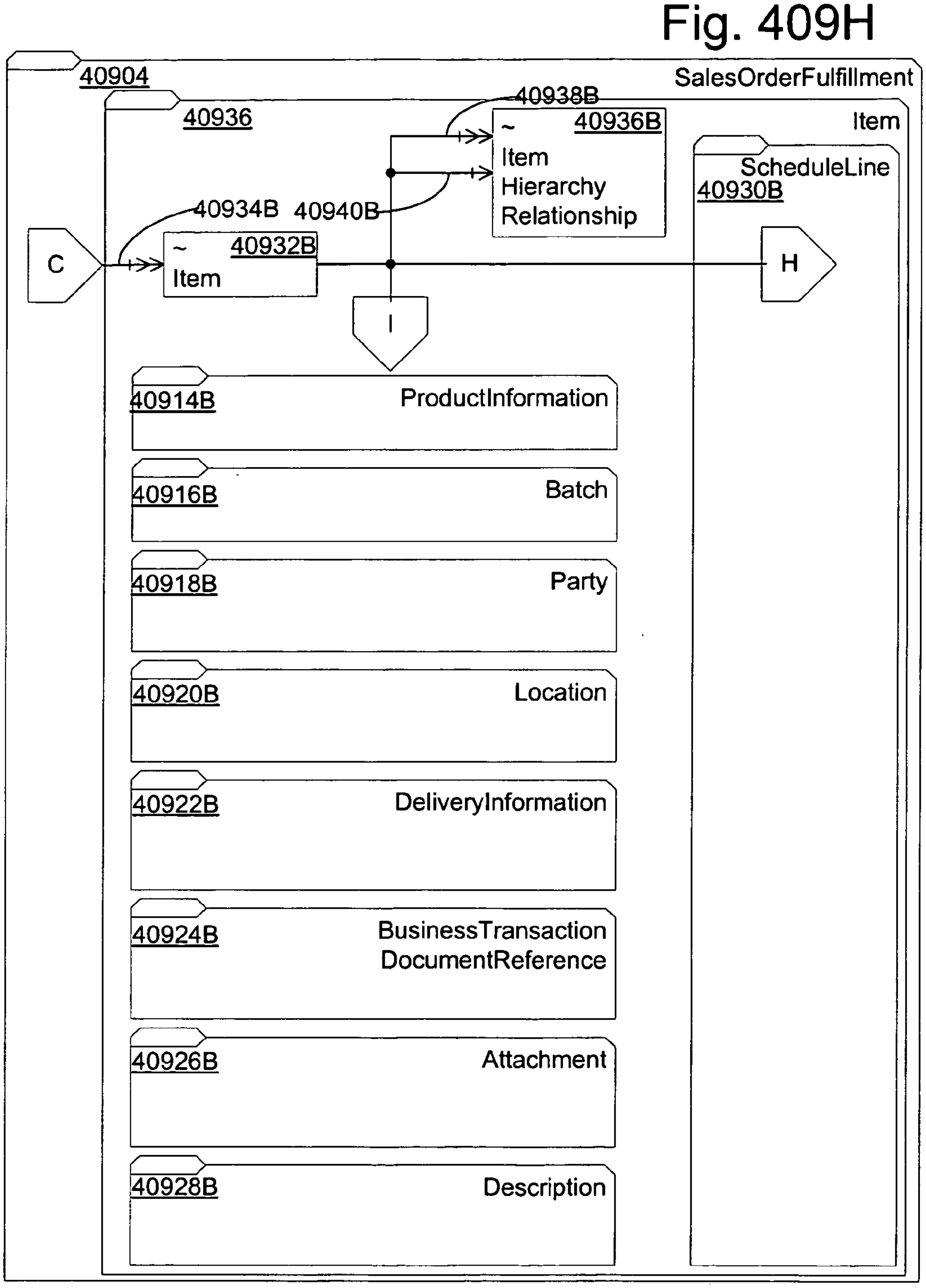
Figure 409I:
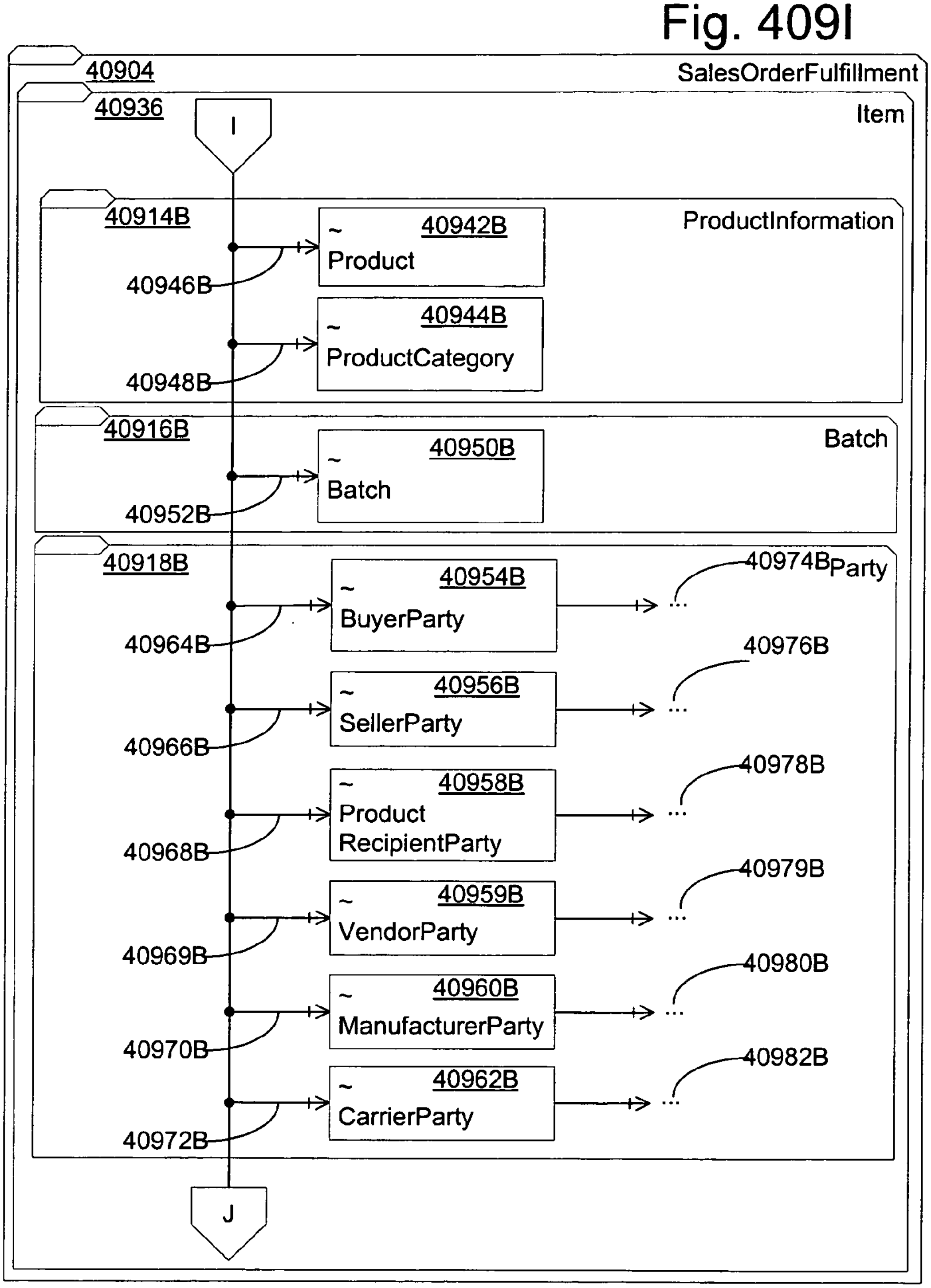
Figure 409J:
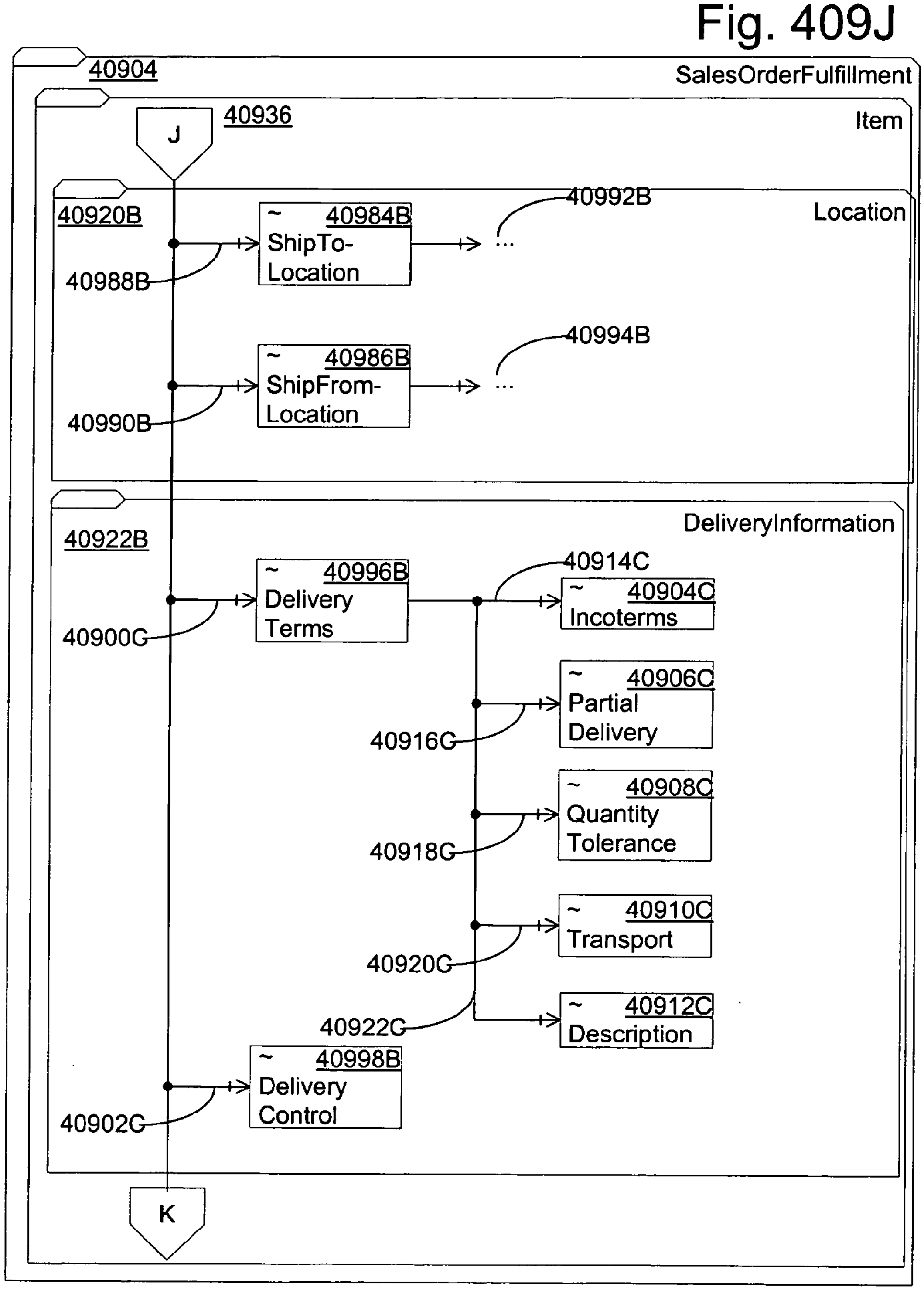
Figure 409K:
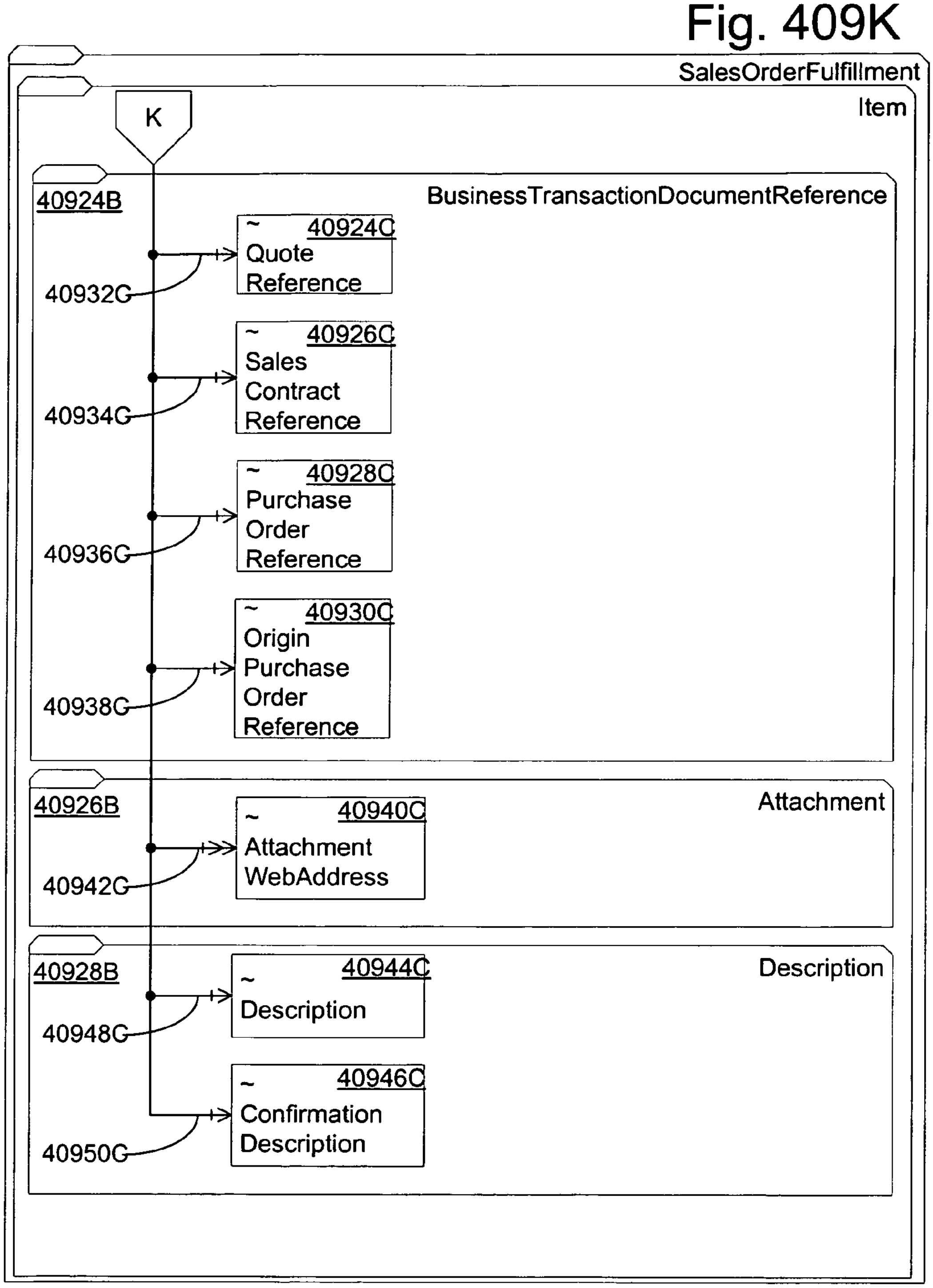
Figure 409L:
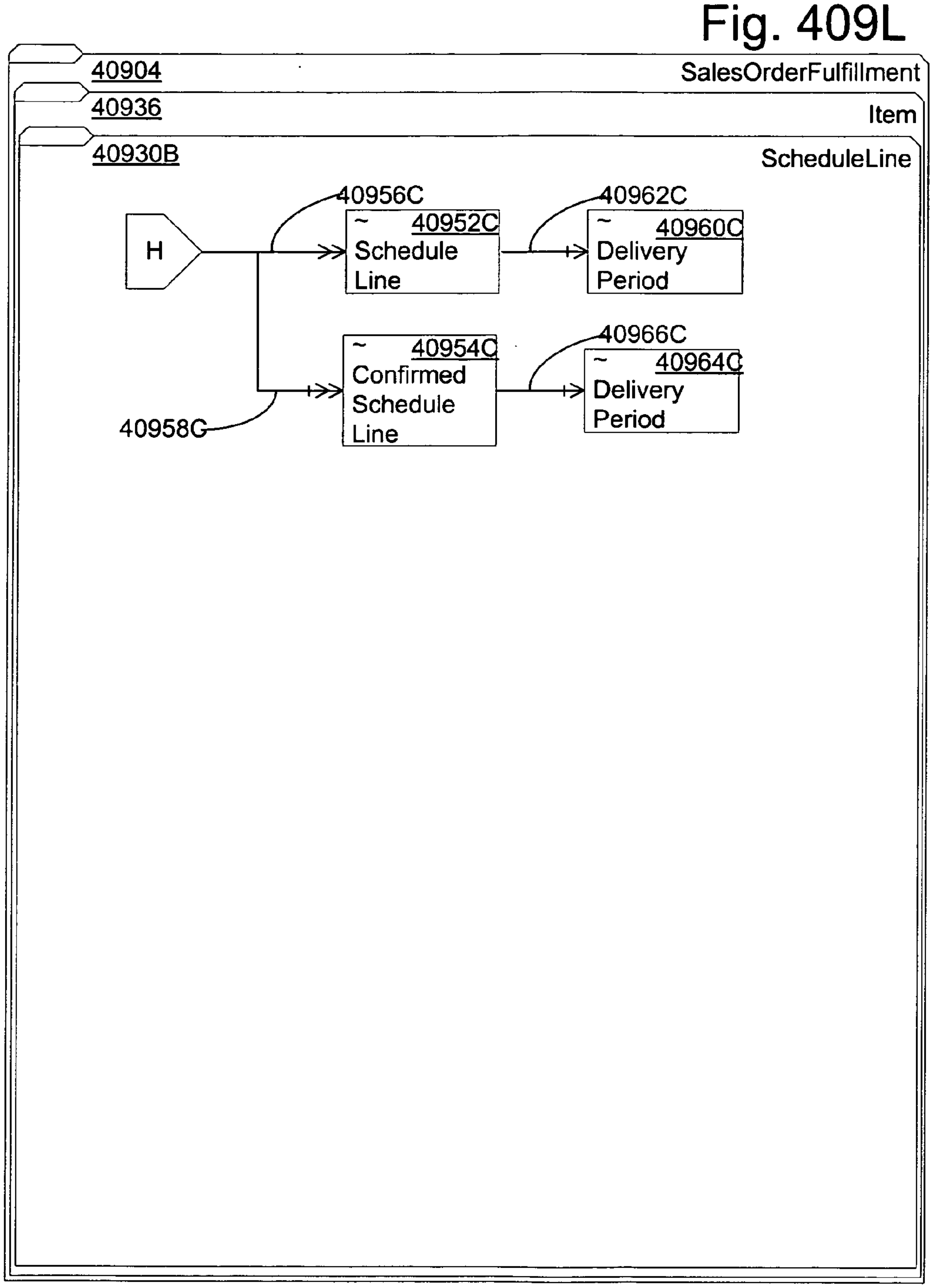

The location package 40926 groups all locations that are relevant for the SalesOrderFulfillment. As shown in FIG. 409E, the location package 40926 includes a ShipToLocation 40928A and a ShipFromLocation 40930A. The SalesOrderFulfillment entity 40938 has a respective 1:c relationship 40932A or 40934A with each of the ShipToLocation 40928A and the ShipFromLocation 40930A. Changes to locations may be changes to all items to which this location applies. For each location, an ID or the address or both may be transferred.

(a) Ship To Location

A ShipToLocation is the place to which goods should be delivered or where a service should be rendered. The ShipToLocation entity 40928A is of type GDT: BusinessTransactionDocumentParty. In one implementation, the ShipToLocation entity 40928A uses an InternaliD from the GDT: BusinessTransactionDocumentParty data type to identify the ShipToLocation. In CRM, ShipToLocation may be understood to mean the unloading point at the ProductRecipientParty. The ShipToLocation entity 40928A has a 1:c relationship 40938A with an Address entity 40936A, which has a respective 1:c relationship 40950A-58A with each of a PersonName 40940A entity, a Office entity 40942A, a PhysicalAddress entity 40944A, a GeoCoordinates entity 40946A, and a Communication entity 40948A.

(b) Ship From Location

A ShipFromLocation is the place from which goods should be delivered. The ShipFromLocation entity 40934A is of type GDT: BusinessTransactionDocumentLocation. In one implementation, the ShipFromLocation entity 40934A uses an InternalID from the GDT: BusinessTransactionDocumentParty data type to identify the ShipFromLocation. In CRM, ShipFromLocation may be understood to mean the plant of the VendorParty. As indicated by elipsis 40960A, the ShipFromLocation entity 40930A is defined to include or have similar relationships with the same elements as those described for the ShipToLocation entity 40928A.

(iv) Sales Order Fulfillment Delivery Information Package

The DeliveryInformation package 40928 groups all information on a required procurement in a SalesOrderFulfillment process. The DeliveryInformation package 40928 includes a DeliveryTerms entity 40962A and a DeliveryControl entity 40964A. The SalesOrderFulfillment entity 40938 has a 1:c relationship 40966A with the DeliveryTerms entity 40962A and a 1:c relationship 40968A with the DeliveryControl entity 40964A.

(a) Delivery Terms

DeliveryTerms are the conditions and agreements that are valid for executing the delivery and transporting the ordered goods and for the necessary services and activities. The DeliveryTerms entity 40962A is of type GDT: DeliveryTerms and has a respective 1:c relationship 40980A-88A with each of an Incoterms entity 40970A, a Partial Delivery entity 40972A, a QuantityTolerance entity 40974A, a Transport entity 40976A, and a Description entity 40978A.

(b) Delivery Control

DeliveryControl is the quantity of controlling parameters for procurement in a SalesOrderFulfillment process. The DeliveryControl entity 40964A includes a DeliveryBlockedIndicator, which indicates whether the sales order or the sales order item are blocked for delivery. DeliveryBlockedIndicator is of type GDT: BusinessTransactionBlockedIndicator.

(v) Sales Order Fulfillment Attachment Package

The Attachment package 40930 groups attachment information with reference to the requesting order. The Attachment package 40930 includes an AttachmentWebAddress entity 40990A. The SalesOrderFulfillment entity 40938 has a 1:cn relationship 40992A with the AttachmentWebAddress entity 40990A. AttachmentWebAddress entity 40990A is a reference to an attachment. The AttachmentWebAddress entity 40990A is of type GDT: WebAddress.

(vi) Sales Order Fulfillment Description Package

The Description package 40932 groups all texts to be described with reference to the SalesOrderFulfillment. The Description package 40932 includes a Description entity 40994A and a ConfirmationDescription entity 40996A. The SalesOrderFulfillment entity 40938 has a 1:c relationship 40998A with the Description entity 40994A and a 1:c relationship 40900B with the ConfirmationDescription entity 40996A.

(a) Description

A Description is a text written in normal language that can be seen by parties with reference to the SalesOrderFulfillment. The Description entity 40994A is of type GDT: Description. The Description entity 40994A may be used for all types of textual information that relates to the transferred SalesOrderFulfillment and not to the current message. An example would be a description of how the customer should be dealt with regarding the delivery.

(b) Confirmation Description

A ConfirmationDescription is a text written in normal language that can be seen by parties with reference to the SalesOrderFulfillmentConfirmation. The ConfirmationDescription entity 40996A is of type GDT: Description. The ConfirmationDescription entity 40996A may be used for all types of textual information that relates to the SalesOrderFulfillmentConfirmation. An example would be an explanation as to why a SalesOrderFulfillment was rejected.

(vii) Sales Order Fulfillment Follow-Up Message Package

The FollowUpMessage package 40934 groups information about follow up messages that the selling component expects from the procurement planning component with regard to the SalesOrderFulfillment. The FollowUpMessage package 40934 includes a FollowUpSalesOrderFulfillmentConfirmation entity 40902B, a FollowUpDespatchedDeliveryNotification entity 40904B, and a FollowUpBillingDueNotification entity 40906B. The SalesOrderFulfillment entity 40938 has a respective 1:c relationship 40908B-40912B with each of the FollowUpSalesOrderFulfillmentConfirmation entity 40902B, the FollowUpDespatchedDeliveryNotification entity 40904B, and the FollowUpBillingDueNotification entity 40906B.

(a) Follow-Up Sales Order Fulfillment Confirmation

A FollowUpSalesOrderFulfillmentConfirmation is a notice which shows whether the selling component expects a confirmation of the SalesOrderFulfillment from the procurement planning component. The FollowUpSalesOrderFulfillmentConfirmation entity 40902B includes a RequirementCode, which is a coded representation of the notice which shows whether the selling component expects a confirmation from the procurement planning component. The RequirementCode is of type GDT: FollowUpMessageCode. In one implementation, the RequirementCode of the FollowUpSalesOrderFulfillmentConfirmation entity 40902B has a value of ‘expected’ or ‘unexpected.’ In one implementation, the RequirementCode is set by the selling component.

(b) Follow-Up Despatched Delivery Notification

A FollowUpDespatchedDeliveryNotification is a notice that shows whether and, if so, how the customer would like to be informed about a delivery by the procurement planning component. The FollowUpDespatchedDeliveryNotification is passed on to the procurement planning component from the PurchaseOrderRequest. The FollowUpDespatchedDelivery Notification entity 40904B includes a RequirementCode, which is a coded representation of the notice that shows whether the purchaser expects a notification about the delivery of ordered goods from the vendor. The RequirementCode is of type GDT: FollowUpMessageCode.

In one implementation, the RequirementCode of the FollowUpDespatchedDelivery Notification entity 40904B has a value of ‘expected’ or ‘unexpected.’ In one implementation, the RequirementCode is set by the selling component.

(c) Follow-Up Billing Due Notification

A FollowUpBillingDueNotification is a notice that shows whether the selling component expects the procurement planning component to deliver logistical information after posting the goods issue in the Billing Engine (delivery-related billing document, in which commercial data from CRM and logistical data from the delivery are consolidated in the billing unit in the billing due list). The FollowUpBillingDueNotification entity 40906B includes a RequirementCode, which is a coded representation of the notice that shows whether the selling component expects the procurement planning component to deliver logistical information after posting of the goods issue in the billing unit. The RequirementCode is of type GDT: FollowUpMessageCode.

In one implementation, the RequirementCode of FollowUpBillingDueNotification entity 40906B entity 40904B has a value of ‘expected’ or ‘unexpected.’ In one implementation, the RequirementCode is set by the selling component.

(viii) Sales Order Fulfillment Item Package

The SalesOrderFulfillmentItem package 40936 groups a SalesOrderFulfillmentItem entity 40932B with the packages within the SalesOrderFulfillmentItem package 40936. The SalesOrderFulfillmentItem package 40936 includes a ProductInformation package 40914B, a Batch package 40916B, a Party package 40918B, a Location package 40920B, a DeliveryInformation package 40922B, a BusinessTransactionDocumentReference package 40924B, an Attachment package 40926B, a Description package 40928B, and a ScheduleLine package 40930B.

(a) Sales Order Fulfillment Item

The SaleOrderFulfillmentItem entity 40932B specifies a product transferred by the SalesOrderFulfillment or additional information on such a product. The SalesOrderFulfillmentItem 40932B includes detailed information on a product (see ProductInformationPackage 40914B) and its batch (see Batch Package 40916B). The quantity of the product and the (delivery) date are specified in the schedule line (see ScheduleLine Package 40930B). Deviating parties, locations and delivery methods may be specified for the SalesOrderFulfillmentItem 40932B (compared to the information of the SalesOrderFulfillment) (see Party Package 40918B, Location Package 40920B, DeliveryInformation Package 40922B). The SalesOrderFulfillmentItem may include references to other business documents that are relevant for the item (see BusinessTransactionDocumentReference Package 40924B). Furthermore, notes or references can be added as attachments (see Description Package 40928B or Attachment Package 40926B). A SalesOrderFulfillmentItem can be subordinate to another SalesOrderFulfillmentItem within a hierarchy in order to represent a business connection between the two items. This hierarchical relationship is reflected by the ItemHierarchyRelationship entity 40936B. This might, for example, be the addition of a free-goods discount or a substitute product to an ordered product.

The SalesOrderFulfillmentItem entity 40932B is of type GDT: SalesOrderFulfillmentItem. The SalesOrderFulfillmentItem entity 40932B includes an ID, a TypeCode, an ActionCode, a ScheduleLineListCompleteTransmissionIndicator, a CreationDateTime, a LastChangeDateTime, and an AcceptanceStatusCode. The ID is a unique identification issued by the seller for the item of a SalesOrderFulfillment. The ID is of type GDT: BusinessTransactionDocumentItemID. The TypeCode is the document type of the requesting document. TypeCode is of type GDT: BusinessTransactionDocumentTypeCode. The ActionCode is the coded representation of a message request to the recipient to create, change, delete, or reject business objects. The ActionCode is of type GDT ActionCode. The ScheduleLineList- CompleteTransmissionIndicator specifies whether the schedule lines of the requesting document are always transferred and non-transferred schedule lines implicitly count as rejected, or whether new and changed schedule lines as well as schedule lines that have been rejected since the last transfer are transferred. ScheduleLineListCompleteTransmissionIndicator is of type GDT CompleteTransmissionIndicator. The CreationDateTime is the creation time of the item of the requesting document. CreationDateTime is of type GDT DateTime. The LastChangeDateTime is the change date of the item of the requesting document. LastChangeDateTime is of type GDT DateTime. The AcceptanceStatusCode is the coded representation of the status of the agreement of the procurement planning unit. The AcceptanceStatusCode is of type GDT: AcceptanceStatusCode.

(b) Hierarchy Relationship

SalesOrderFulfillmentItem entities are arranged hierarchically using a Hierarchy Relationship entity 40936B. The Item Hierarchy Relationship 40936B is the relationship between a sub-item and a higher-level parent item in an item hierarchy. There is a 1:cn relationship 40938B between the SalesOrderFulfillmentItem entity 40932B and its subordinate entities, and there is a 1:c relationship 40940B between the SalesOrderFulfillmentItem entity 40932B and its superordinate entities. The HierarchyRelationship entity 40936B includes a ParentItemID and a TypeCode. The ParentItemID is the reference to the parent item. The ParentItemID is of type GDT: BusinessTransactionDocumentItemID. The TypeCode is the kind of relationship between a subitem and its hierarchically higher-level parent item. The TypeCode is of type GDT: BusinessTransactionDocument-ItemHierarchyRelationshipTypeCode.

(c) Sales Order Fulfillment Item Product Information Package

The ProductInformation Package 40914B groups the information for identifying, describing, and classifying a product. The ProductInformation Package 40914B includes a Product entity 40942B and a ProductCategory entity 40944B. The SalesOrderFulfillmentItem entity 40932B has a respective 1:c relationship 40946B or 40948B with each of the Product entity 40942B and the ProductCategory entity 40944B.

(i) Product

A product includes the details about a product as generally understood from a commercial point of view in business documents. These are the details for identifying a product, product type as well as the description of the product. The product entity 40942B is of type GDT: BusinessTransactionDocumentProduct. In one implementation, the product to be procured is not be changed by the selling component. The procurement planning component may add a product number to a product description without a product number or specify a product for a newly proposed item.

(ii) Product Category

A ProductCategory includes the details about a product category as generally understood from a commercial point of view in business transaction documents. The ProductCategory includes details for identifying the product category using an internal ID, a standard ID along with IDs assigned by involved parties. The ProductCategory entity 40944B is of type GDT: BusinessTransactionDocumentProductCategory.

(d) Sales Order Fulfillment Item Batch Package

The Batch package 40916B groups all batch information on the product specified in a SalesOrderFulfillmentItem. The Batch package 40916B includes a Batch entity 40950B. The SalesOrderFulfillmentItem entity 40932B has a 1:c relationship 40952B with the Batch entity 40950B. The batch entity 40950B is a non-reproducible, homogenous subset of a product. The subset's chracteristics lie within the batch characteristics defined for the product. The Batch entity 40950B includes a BatchID, which is of type GDT: BatchID. A batch entity 40950B is either identified directly by its ID or described by its characteristics.

(e) Sales Order Fulfillment Item Party Package

The SalesOrderFulfillment Item Party package 40918B is defined similary to Party package 40924. For example, SalesOrderFulfillment Item Party package 40918B includes a BuyerParty item 40954B, a SellerParty item 40956B, a ProductRecipientParty item 40958B, a Vendor party entity 40959B, a Manufacturer Party entity 40960B, and a CarrierParty item 40962B. Each of these entities is defined similary to their corresponding counterpart in the Party package 40924 as indicated by elipses 40974B-82B. The SalesOrderFulfillmentItem entity 40932B has a respective 1:c relationship 40964B-40972B with each of these entities 40954B, 40956B, 40958B, 40959B, 40960B, and 40962B.

(f) Sales Order Fulfillment Item Location Package

The SalesOrderFulfillment Item Location Package 40920B contains the ShipTo-Location entity 40984B and the ShipFrom-Location entity 40994B. Each of these entities 40984B and 40994B is defined similarly to their like-named counterpart in the Location Package 40926 as indicated by elipses 40992B and 40994B. The SalesOrderFulfillmentItem entity 40932B has a respective 1:c relationship 40988B, 40990B with each of the ShipTo-Location entity 40984B and the ShipFrom-Location entity 40994B.

(g) Sales Order Fulfillment Item Delivery Information Package

The SalesOrderFulfillment Item DeliveryInformation package 22B includes the DeliveryTerms entity 40996B and the DeliveryControl entity 40998B. The SalesOrderFulfillmentItem entity 40932B has a respective 1:c relationship 40900C, 40902C with each of the DeliveryTerms entity 40996B and the DeliveryControl entity 40998B. Each of DeliveryTerms entity 40996B and the DeliveryControl entity 40998B is defined similarly to their like-named counterpart in the DeliveryInformation package 40928. For example, the DeliveryTerms entity 40996B has a 1:c relationship 40914C-40922C with an Incoterms entity 40914C, an PartialDelivery entity 40906C, an QuantityTolerance entity 40908C, an Transport entity 40910C, and an Description entity 40912C. Each of these entities 40914C, 40906C, 40908C, 40910C, and 40912C is defined similary to their like-named counterpart in the DeliveryInformation package 40928.

(h) Sales Order Fulfillment Item Business Transaction Document Reference Package The BusinessTransactionDocumentReference package 40924B groups all references to business documents that can occur for the SalesOrderFulfillmentItem and have a business connection to the item. The BusinessTransactionDocumentReference package 40924B includes a QuoteReference entity 40924C, a SalesContractReference entity 40926C, a PurchaseOrderReference entity 40928C, and an OriginPurchaseOrderReference entity 40930C. The SalesOrderFulfillmentItem entity 40932B has a 1:c relationship 40932C-40938C with each of these entities 40924C, 40926C, 40928C, and 40930C.

(i) Quote Reference

The QuoteReference is the reference to a quotation or an item within a quotation. The QuoteReference entity 40924C is of type GDT: BusinessTransactionDocumentReference.

(ii) Sales Contract Reference

The SalesContractReference is the reference to a sales contract or an item within a sales contract. The SalesContractReference entity 40926C is of type GDT: BusinessTransactionDocumentReference.

(iii) Purchase Order Reference

The PurchaseOrderReference is the reference to the PurchaseOrder or to an item within the PurchaseOrder. The PurchaseOrderReference entity 40928C is of type GDT: BusinessTransactionDocumentReference. The PurchaseOrderReference entity 40928C may make reference to the Buyer's order in the procurement planning component (for example, in the DespatchedDeliveryNotifcafion).

(iv) Origin Purchase Order Reference

The OriginPurchaseOrderReference is the reference to the origin purchase order or to an item within the origin purchase order in a third-party business transaction. The OriginPurchaseOrderReference entity 40930C is of type GDT: BusinessTransactionDocumentReference. The OriginPurchaseOrderReference may be passed on through all PurchaseOrders so that the procurement planning component may refer to the original PurchaseOrder of the ProductRecipientParty via the OriginPurchaseOrderReference during the delivery.

(i) Sales Order Fulfillment Item Attachment Package

The SalesOrderFulfillment Item Attachment Package 40926B is defined similarly to the Attachment package 40930 and includes the AttachmentWebAddress entity 40940C. The SalesOrderFulfillmentItem entity 40932B has a 1:cn relationship with the AttachmentWebAddress entity 40940C.

(j) Sales Order Fulfillment Item Description Package

The description package 40928B groups the texts to be described with reference to a SalesOrderFulfillmentItem. The description package 40928B includes a Description entity 40944C and a ConfirmationDescription 40946C. The SalesOrderFulfillmentItem entity 40932B has a respective 1:c relationship 40948C, 40950C with each of the Description entity 40944C and the ConfirmationDescription entity 40946C.

(i) Description

A Description is a text written in normal language that can be seen by parties with reference to the SalesOrderFulfillmentItem. The Description entity 40944C is of type GDT: Description. The Description entity 40944C can be used for all types of textual information that relates to the SalesOrderFulfillmentConfirmation. An example would be the packaging requested by a customer.

(ii) Confirmation Description

A ConfirmationDescription is a text written in normal language that can be seen by parties with reference to the SalesOrderFulfillmentConfirmationItem. The ConfirmationDescription entity 40946C is of type GDT: Description. The ConfirmationDescription can be used for all types of textual information that relates to an item in a SalesOrderFulfillmentConfirmation. An example would be an explanation from the procurement planning component as to why a substitution subitem was created.

(k) Sales Order Fulfillment Item Schedule Line Package

The ScheduleLine Package 40930B is the grouping of the quantity and date information on a SalesOrderFulfillmentItem. The ScheduleLine Package 40930B includes a ScheduleLine entity 40952C and a ConfirmedScheduleLine entity 40954C. SalesOrderFulfillmentItem entity 40932B has a 1:n relationship 40956C with the ScheduleLine entity 40952C and a 1:cn relationship 40958C with the ConfirmedScheduleLine entity 40954C. The ScheduleLine entity 40952C has a 1:c relationship 40962C with the DeliveryPeriod entity 40960C, and the ConfirmedScheduleLine entity 40954C has a 1:c relationship 40966C with the DeliveryPeriod entity 40964C.

(i) Schedule Line

The ScheduleLine is a line with the quantity and date of the provision schedule required by the selling system. The ScheduleLine entity 40952C includes an ID, an ActionCode, a Quantity, and a DeliveryPeriod. The ID is a unique identification issued by the vendor for the schedule line of a SalesOrderFulfillmentItem, and is of type GDT BusinessTransactionDocumentItemScheduleLineID. The ActionCode is the coded representation of a message request to the recipient to create, change, delete, or reject business objects, and is of type GDT ActionCode. The Quantity is the requested or expected quantity in sales or order unit of measure, and is of type GDT Quantity. The DeliveryPeriod is the (planned) delivery period: expected or confirmed delivery date or period, and is of type GDT DateTimePeriod. The Quantity and the DeliveryPeriod may be changed by the selling component. The procurement planning component may specify a Quantity or DeliveryPeriod for an item that it has newly proposed itself.

(ii) Confirmed Schedule Line

The ConfirmedScheduleLine is a line with the quantity and date of the provision schedule confirmed via ATP and scheduling by the procurement planning component. A confirmation for a partial quantity cannot be equated with a rejection of the remaining quantity. The confirmation of a partial quantity merely means that the procurement planning component has accepted this partial quantity, and has not yet made a statement concerning the remaining quantity. The ConfirmedScheduleLine entity 40954C is defined similary to the ScheduleLine entity 40952C and has a 1:c relationship 40966C with the DeliveryPeriod entity 40964C.

(4) Message Data Type Element Structure

FIGS. 410A-M depict the element structure for a message data type SalesOrderFulfillmentMessage. The message data type SalesOrderFulfillmentMessage includes the object SalesOrderFulfillment included in the business document and the business information that is relevant for sending a business document in a message. The element structure is similar to the above described data model of the message data type SalesOrderFulfillmentMessage as reflected in FIG. 409, but provides additional information regarding the details for interfacing with or implementing a SalesOrderFulfillmentMessage, such as a SalesOrderFulfillmentRequest and a SalesOrderFulfillmentConfirmation. As shown in FIGS. 410A-D, the element structure identifies the different packages 41000 that may be in a respective SalesOrderFulfillmentRequest and a SalesOrderFulfillmentConfirmation. The element structure for a SalesOrderFulfillmentRequest and a SalesOrderFulfillmentConfirmation includes five levels 41002, 41004, 41006, 41008, and 41010 each of which is associated with a respective package 41000. The element structure identifies the cardinality or occurrence 41012 and the data type 41014 information for the elements at the respective levels 41002, 41004, 41006, 41008, and 41010 in the respective package 41000.

The outermost package of this interface is a SalesOrderFulfillment package 41016, which includes a SalesOrderFulfillmentMessage entity 41018 at the first level 41002. The SalesOrderFulfillmentMessage entity 41018 is of type MDT: SalesOrderFulfillmentMessage 41022. In one implementation, there is one 41020 SalesOrderFulfillmentMessage entity 41018 in the SalesOrderFulfillment package 41016.

The SalesOrderFulfillment package 41016 also includes a MessageHeader package 41024 and a SalesOrderFulfillment package 41026. The MessageHeader package 41024 includes a MessageHeader entity 41028 that is of type GDT: BusinessDocumentMessageHeader 41032. In one implementation, there is one or zero 41030 MessageHeader entities 41028 for each SalesOrderFulfillmentMessage entity 41018.

The SalesOrderFulfillment package 41026 includes a SalesOrderFulfillment entity 41034 of type GDT: SalesOrderFulfillment 41038. In one implementation, there is one or zero 41036 SalesOrderFulfillment entity 41034 for each SalesOrderFulfillmentMessage entity 41018. The SalesOrderFulfillment entity 41034 includes an ID 41040, a BaseBusinessTransactionDocumentID 41046, a BaseBusinessTransactionDocumentTypeCode 41052, an ActionCode 41058, an ItemListCompleteTransmissionIndicator 41064, a CreationDateTime 41070, a LastChangeDateTime 41076, and an AcceptanceStatusCode 41082. The ID 41040 is of type GDT: BusinessTransactionDocumentID 41044. The BaseBusinessTransactionDocumentID 41046 is of type GDT: BusinessTransactionDocumentID 41050. The BaseBusinessTransactionDocumentTypeCode 41052 is of type GDT: BusinessTransactionDocumentTypeCode 41056. The ActionCode 41058 is of type GDT: ActionCode 41062. The ItemListCompleteTransmissionIndicator 41064 is of type GDT: CompleteTransmissionIndicator 41068. The CreationDateTime 41070 is of type GDT: DateTime 41074. The LastChangeDateTime 41076 is of type GDT: DateTime 41080. The AcceptanceStatusCode 41082 is of type GDT: AcceptanceStatusCode 41086. In one implementation, for each SalesOrderFulfillment entity 41034, there is one 41042 ID 41040, one or zero 41048 BaseBusinessTransactionDocumentID 41046, one or zero 41054 BaseBusinessTransactionDocumentTypeCode 41052, one or zero 41060 ActionCode 41058, one or zero 41066 ItemListCompleteTransmissionIndicator 41064, one or zero 41072 CreationDateTime 41070, one or zero 41078 LastChangeDateTime 41076, and one or zero 41084 AcceptanceStatusCode 41082.

The SalesOrderFulfillment package 41026 also includes a Party package 41088, a Location package 41090, a DeliveryInformation package 41092, an Attachment package 41094, a Description package 41096, a FollowUpBusinessTransactionDocument or FollowUp package 41098, and a SalesOrderFulfillmentItem or Item Package 41000A.

As shown in FIG. 410B, the Party package 41088 includes a BuyerParty 41002A, a SellerParty 41020A, a ProductRecipientParty 41026A, a VendorParty 41032A, a ManufacturerParty 41038A, and a CarrierParty 41044A. The BuyerParty entity 41002A is of type GDT: BusinessTransactionDocumentParty 41006A. The SellerParty entity 41020A is of type GDT: BusinessTransactionDocumentParty 41024A. The ProductRecipientParty entity 41026A is of type GDT: BusinessTransactionDocumentParty 41030A. The VendorParty entity 41032A is of type. GDT: BusinessTransactionDocumentParty 41036A. The ManufacturerParty entity 41038A is of type GDT: BusinessTransactionDocumentParty 41042A. The CarrierParty 41044A is of type GDT: BusinessTransactionDocumentParty 41048A. In one implementation, for each SalesOrderFulfillment entity 41034, there is one 41004A BuyerParty 41002A, one 41022A SellerParty 41020A, one or zero 41028A ProductRecipientParty 41026A, one or zero 41034A VendorParty 41032A, one or zero 41040A ManufacturerParty 41038A, and one or zero 41046A CarrierParty 41044A.

The BuyerParty 41002A may include one 41010A InternalID 41008A of type GDT: PartyInternalID 41012A and any number 41016A of StandardIDs 41014A of type GDT: PartyInternalID 41018A. The SellerParty 41020A, the ProductRecipientParty 41026A, the VendorParty 41032A, and the ManufacturerParty 41038A, and a CarrierParty 41044A may each include elements similar to the BuyerParty 41002A, such as a respective InternalID and a respective one or more StandardIDs.

The Location package 41090 includes a ShipToLocation entity 41050A of type GDT: BusinessTransactionDocumentLocation 41054A and a ShipFromLocation entity 41062A of type GDT: BusinessTransactionDocumentLocation 41066A. In one implementation, for each SalesOrderFulfillment entity 41034, there is one or zero 41052A ShipToLocation entity 41050A and one or zero 41064A ShipFromLocation entity 41062A. The ShipToLocation entity 41050A includes one 41058A InternalID 41056A of type GDT: LocationID 41060A. The ShipFromLocation entity 41062A may include elements similar to the ShipToLocation entity 41050A, such as a respective InternalID.

The DeliveryInformation package 41092 includes a DeliveryTerms entity 41068A of type GDT: DeliveryTerms 41072A. There is one or zero 41070A DeliveryTerms entity 41068A for each SalesOrderFulfillment entity 41034. The DeliveryTerms entity 41068A includes a DeliveryItemGroupID 41074A of type GDT: BusinessTransactionDocumentGroupID 41078A, a DeliveryPriorityCode 41080A of type GDT: BusinessTransactionDocumentPriorityCode 41084A, an Incoterms entity 41086A of type GDT: Incoterms 41090A, a PartialDelivery entity 41092A of type GDT: PartialDelivery 41096A, a QuantityTolerance entity 41098A of type GDT: QuantityTolerance 41002B, a Transport entity 41004B, and a Description entity 41008B of type GDT: Description 41012B. In one implementation, for each DeliveryTerms entity 41068A, there is one or zero 41076A DeliveryItemGroupID 41074A, one or zero 41082A DeliveryPriorityCode 41080A, one or zero 41088A Incoterms entity 41086A, one or zero 41094A PartialDelivery entity 41092A, one or zero 41000B QuantityTolerance entity 41098A, one or zero 41006B Transport entity 41004B, and one or zero 41010B Description entity 41008B.

The DeliveryInformation package 41092 also includes a DeliveryControl entity 41014B. There is one or zero 41016B DeliveryControl entity 41014B for each SalesOrderFulfillment entity 41034. The DeliveryControl entity 41014B includes a DeliveryBlockedIndicator 41018B of type GDT: BusinessTransactionBlockedIndicator 41022B. There is one or zero 41020B DeliveryBlockedIndicator 41018B for each DeliveryControl entity 41014B.

The Attachment package 41094 includes an AttachmentWebAddress entity 41024B of type GDT: WebAddress 41028B. In one implementation, there is any number 41026B of AttachmentWebAddress entities 41024B for each AttachmentWebAddress entity 41024B.

The Description package 41096 includes a Description entity 41030B of type GDT: Description 41034B and a ConfirmationDescription entity 41036B of type GDT: Description 41040B. In one implementation, for each SalesOrderFulfillment entity 41034, there is one or zero 41032B Description entity 41030B and one or zero 41038B ConfirmationDescription entity 41036B.

The FollowUpMessage ("FollowUp") package 41098 includes a FollowUpSalesOrderFulfillmentConfirmation entity 41042B, a FollowUpDespatchedDeliveryNotification entity 41052B, and a FollowUpBillingDueNotification entity 41062B. In one implementation, for each SalesOrderFulfillment entity 41034, there is one or zero 41044B FollowUpSalesOrderFulfillmentConfirmation entity 41042B, one or zero 41054B FollowUpDespatchedDeliveryNotification entity 41052B, and one or zero 41064B FollowUpBillingDueNotification entity 41062B. The FollowUpSalesOrder- FulfillmentConfirmation entity 41042B may have one 41048B RequirementCode 41046B of type GDT: FollowUpMessageRequirementCode 41050B. The FollowUpDespatchedDeliveryNotification entity 41052B may also have one 41058B RequirementCode 41056B of type GDT: FollowUpMessageRequirementCode 41060B. The FollowUpBillingDueNotification entity 41062B may also have one 41068B RequirementCode 41066B of type GDT: FollowUpMessageRequirementCode 41070B.

The SalesOrderFulfillmentItem or Item package 41000A includes an SalesOrderFulfillmentItem or Item entity 41072B of type GDT: SalesOrderFulfillmentItem 41076B. There is any number 41074B of Item entities 41072B for SalesOrderFulfillment entity 41034. The Item 41072B includes an ID 41078B, a TypeCode 41084B, an ActionCode 41090B, a ScheduleLineListCompleteTransmissionIndicator 41096B, a CreationDateTime 41002C, a LastChangeDateTime 41008C, and an AcceptanceStatusCode 41014C. The ID 41078B is of type GDT: BusinessTransactionDocumentItemID 41082B. The TypeCode 41084B is of type GDT: BusinessTransactionDocumentTypeCode 41088B. The ActionCode 41090B is of type GDT: ActionCode 41094B. The ScheduleLineListCompleteTransmissionIndicator 41096B is of type GDT: CompleteTransmissionIndicator 41000C. The CreationDateTime 41002C is of type GDT: DateTime 41006C. The LastChangeDateTime 41008C is of type GDT: DateTime 41012C. The AcceptanceStatusCode 41014C is of type GDT: AcceptanceStatusCode 41018C. In one implementation, for each SalesOrderFulfillment entity 41034, there is one 41080B ID 41078B, one 41086B TypeCode 41084B, one or zero 41092B ActionCode 41090B, one or zero 41098B ScheduleLineListCompleteTransmissionIndicator 41096B, one or zero 41004C CreationDateTime 41002C, one or zero 41010C LastChangeDateTime 41008C, and one or zero 41016C AcceptanceStatusCode 41014C.

Each Item 41072B also includes a HierarchyRelationship entity 41020C. In one implementation, there is one or zero 41022C HierarchyRelationship entities 41020C for each Item 41072B of the SalesOrderFulfillment entity 41034. The HierarchyRelationship entity 41020C includes a ParentItemID 41024C of type GDT: BusinessTransactionDocumentItemID 41028C and a TypeCode 41030C of type GDT: BusinessTransactionDocumentItem-HierarchyRelationshipTypeCode 41034C. In one implementation, for each HierarchyRelationship entity 41020C, there is one or zero 41026C ParentItemID 41024C and one 41032C TypeCode 41030C.

The SalesOrderFulfillmentItem or Item package 41000A also includes a ProductInformation package 41036C, a Batch package 41038C, a Party package 41040C, a Location package 41042C, a DeliveryInformation package 41044C, a BusinessTransactionDocumentReference or Reference package 41046C, an Attachment package 41048C, a Description package 41050C, and a ScheduleLine package 41052C.

The ProductInformation package 41036C includes a Product entity 41054C of type GDT: BusinessTransactionDocumentProduct 41058C and a ProductCategory entity 41084C of type GDT: BusinessTransactionDocumentProductCategory 41088C. In one implementation, for each Item entity 41072B, there is one 41056C Product entity 41054C and one or zero 41086C ProductCategory entity 41084C. The product entity 41054C includes an ID 41060C of type GDT: ProductID 41064C, a StandardID 41066C of CDT: ProductStandardID 41070C, a PartyID 41072C of type CDT: ProductPartyID 41076C, and a Description 41078C of type GDT: Description 41082C. In one implementation, for each Product entity 41054C, there is one or zero 41062C ID 41060C, one or zero 41068C StandardID 41066C, one or zero 41074C PartyID 41072C and one or zero 41080C Description 41078C.

The ProductCategory entity 41084C an ID 41090C of type GDT: ProductCategoryID 41094C. There may be one or zero 41092C ID 41090C for each ProductCategory entity 41084C.

The Batch package 41096C includes a Batch entity 41096C. In one implementation, there is one or zero 41098C Batch entity 41096C for each Item entity 41072B. The Batch entity 41096C includes an ID 41000D of type GDT: BatchID 41004D. There is one or zero 41002D ID 41000D for each Batch entity 41096C.

The SalesOrderFulfillment Item Party package 41040C includes elements similar to Party package 41088. As shown in FIG. 410I, the Party package 41040C includes a BuyerParty 41006D, a SellerParty 41012D, a ProductRecipientParty 41018D, a VendorParty 41024D, a ManufacturerParty 41030D, and a CarrierParty 41036D. The BuyerParty entity 41006D is of type GDT: BusinessTransactionDocumentParty 41010D. The SellerParty entity 41012D is of type GDT: BusinessTransactionDocumentParty 41016D. The ProductRecipientParty entity 41018D is of type GDT: BusinessTransactionDocumentParty 41022D. The VendorParty entity 41024D is of type GDT: BusinessTransactionDocumentParty 41028D. The ManufacturerParty entity 41030D is of type GDT: BusinessTransactionDocumentParty 41034D. The CarrierParty 41036D is of type GDT: BusinessTransactionDocumentParty 41040D. In one implementation, for each SalesOrderFulfillment Item entity 41072D, there is one 41008D BuyerParty 41006D, one 41014D SellerParty 41012D, one or zero 41020D ProductRecipientParty 41018D, one or zero 41026D VendorParty 41024D, one or zero 41032 ManufacturerParty 41030D, and one or zero 41038D CarrierParty 41036D. Each of these entities is defined similarly to their corresponding counterpart in the Party package 41088.

The SalesOrderFulfillment Item Location Package 41042C includes elements similar to the Location Package 41090. The Location package 41042C includes a ShipToLocation entity 41042D of type GDT: BusinessTransactionDocumentLocation 41046D and a ShipFromLocation entity 41048D of type GDT: BusinessTransactionDocumentLocation 41052D. In one implementation, for each SalesOrderFulfillment Item entity 41072B, there is one or zero 41044D ShipToLocation entity 41042D and one or zero 41050D ShipFromLocation entity 41048D. The ShipToLocation entity 41042D and the ShipFromLocation entity 41048D has elements similar to the corresponding entities, i.e., the ShipToLocation entity 41050A and the ShipToLocation entity 41062A.

The SalesOrderFulfillment Item DeliveryInformation package 41044C includes elements similar to the DeliveryInformation package 41092. The DeliveryInformation package 41044C includes the DeliveryTerms entity 41054D of type GDT: DeliveryTerms 41058D. There is one or zero 41056D DeliveryTerms entity 41054D for each SalesOrderFulfillment Item entity 41072B. The DeliveryTerns entity 41054D includes a DeliveryItemGroupID 41060D of type GDT: BusinessTransactionDocumentGroupID 41064D, a DeliveryPriorityCode 41066D of type GDT: BusinessTransactionDocumentPriorityCode 41070D, an Incoterms entity 41072D of type GDT: Incoterms 41076D, a PartialDelivery entity 41078D of type GDT: PartialDelivery 41082D, a QuantityTolerance entity 41084D of type GDT: QuantityTolerance 41088D, a Transport entity 41090D, and a Description entity 41094D of type GDT: Description 41098D. In one implementation, for each DeliveryTerms entity 41054D, there is one or zero 41062D DeliveryItemGroupID 41060D, one or zero 41068D DeliveryPriorityCode 41066D, one or zero 41074D Incoterms entity 41072D, one or zero 41080D PartialDelivery entity 41078D, one or zero 41086D QuantityTolerance entity 41084D, one or zero 41092D Transport entity 41090D, and one or zero 41096D Description entity 41096D.

The DeliveryInformation package 41044C also includes a DeliveryControl entity 41000E. There is one or zero 41002E DeliveryControl entity 41000E for each SalesOrderFulfillment Item entity 41072B. The DeliveryControl entity 41000E includes a DeliveryBlockedIndicator 41004E of type GDT: BusinessTransactionBlockedIndicator 41008E. There is one or zero 41006E DeliveryBlockedIndicator 41004E.

The BusinessTransactionDocumentReference or Reference package 41046C includes a QuoteReference 41010E of type GDT: BusinessTransactionDocumentReference 41014E, a SalesContractReference 41016E of type GDT: BusinessTransactionDocumentReference 41020E, a PurchaseOrderReference 41022E of type GDT: BusinessTransactionDocumentReference 41026E, and an OriginPurchaseOrderReference 41034E of type GDT: BusinessTransactionDocumentReference 41038E. In one implementation, for each SalesOrderFulfillment Item 41072B, there is one or zero 41012E QuoteReference 41010E, one or zero 41018E SalesContractReference 41016E, one or zero 41024E PurchaseOrderReference 41022E, and one or zero 41036E OriginPurchaseOrderReference 41034E.

The SalesOrderFulfillment Item Attachment Package 41048C includes elements similar to the Attachment package 41094. The Attachment package 41048C includes an AttachmentWebAddress entity 41040E of type GDT: WebAddress 41044E. In one implementation, there is any number 41042E of AttachmentWebAddress entities 41040E for each AttachmentWebAddress entity 41040E.

The SalesOrderFulfillment Item Description Package 41050C includes elements similar to the Description package 41096. The Description package 41050C includes a Description entity 41046E of type GDT: Description 41050E and a ConfirrnationDescription entity 41052E of type GDT: Description 41056E. In one implementation, for each SalesOrderFulfillment Item entity 41072B, there is one or zero 41048E Description entity 41046E and one or zero 41054E ConfirmationDescription entity 41052E.

The ScheduleLine Package 41052C includes a ScheduleLine entity 41058E of type GDT: SalesOrderFulfillmentItemScheduleLine 41062E and a ConfirmedScheduleLine entity 41088E of type GDT: SalesOrderFulfillmentItemScheduleLine 41092E. In one implementation, for each SalesOrderFulfillment Item entity 41072B, there is one or more 41060E ScheduleLine entity 41058E and any number 41090E ConfirmedScheduledLine 41088E. Each ScheduleLine 41058E includes an ID 41064E of type GDT: ScheduleLineID 41068E, ActionCode 41070E of type GDT: ActionCode 41074E, Quantity 41076E of type GDT: Quantity 41080E, and DeliveryPeriod entity 41082E of type GDT: DateTimePeriod 41092E. In one implementation, for each SalesOrderFulfillment Item entity 41072B, there is one or zero 41066E ID 41064E, one or zero 41072E ActionCode 41070E, one 41078E Quantity 41076E, and one or zero 41084E DeliveryPeriod entity 41082E.

The ConfirmedScheduleLine entity 41088E includes an ID 41094E of type GDT: ScheduleLineID 41098E, ActionCode 41000F of type GDT: ActionCode 41004F, Quantity 41006F of type GDT: Quantity 41010F, and a DeliveryPeriod entity 41012F of type GDT: DateTimePeriod 41016F. In one implementation, for each SalesOrderFulfillment Item entity 41072B, there is one or zero 41096E ID 41094E, one or zero 41002F ActionCode 41000F, one 41008F Quantity 41006F, and one or zero 41014F DeliveryPeriod entity 41012F.

q) Delivery Interfaces

Delivery interfaces are used for the business scenarios Supplier Managed Inventory (SMI) and Release Processing as messages between a supplier and the Inventory Collaboration Hub (ICH) of a manufacturer and between the ICH and the back-end system of the manufacturer.

The business scenario Supplier Managed Inventory describes the planning and processing of replenishment deliveries for a manufacturer at a supplier. The supplier receives data about the existing stock and the current gross requirement for a product from the Inventory Collaboration Hub. The business scenario Release Processing is similar to the SMI scenario, regarding the message flow. However, the processing of replenishment deliveries from the manufacturer is triggered here by the publication of the manufacturer's net requirements for the products. This publication along with the receipt of the shipping notification for the resulting delivery also takes place with the Inventory Collaboration Hub.

(1) Message Types (a) Despatched Delivery Notification

A DespatchedDeliveryNotification is a notice for a goods recipient about the planned arrival/pickup/issue date for a ready-to-send delivery including details about the contents of the delivery. The structure of the message type DespatchedDeliveryNotification is specified in the message data type DespatchedDeliveryNotificationMessage 41200. The DespatchedDeliveryNotification is often also known as the "Advanced Shipping Notification" (ASN). It is sent from a vendor (VendorParty) to a product recipient (ProductRecipientParty). The message transfer is generally complete ("complete transmission").

(b) Received Delivery Notification

A ReceivedDeliveryNotification is a message to the vendor about the arrival of the delivery he sent to the goods recipient, including details about the content of the received delivery. The structure of the message type ReceivedDeliveryNotification is specified in the message data type ReceivedDeliveryNotificationMessage. The ReceivedDeliveryNotification is also often known as the "Proof of Delivery" (POD). It is sent from a product recipient to a vendor. The message is used to notify the vendor about the receipt of his delivery. The message also enables you to report quantity variances of the arrived delivery at the shipper at item level. The message transfer is generally complete ("complete transmission").

(2) Message Choreography.

The following message choreography describes a logical sequence of the message types for the scenario realization. A vendor notifies a goods recipient (Product Recipient) about his goods delivery with a DespatchedDeliveryNotification. The goods recipient (Product Recipient) confirms the receipt of a delivery from the vendor with a ReceivedDeliveryNotification.

(3) Message Data Type Despatched Delivery Notification

The message data type DespatchedDeliveryNotificationMessage 41200 (see FIG. 412) includes the business information that is relevant for sending a business document in a message and the object Delivery included in the business document in the view of a DespatchedDeliveryNotification. It includes a MessageHeader package 41202 and a Delivery Package 41204. The message data type DespatchedDelivery- NotificationMessage makes the structure available for the message type DespatchedDeliveryNotification and the interfaces based on it.

(a) Message Header Package

A MessageHeader package 41204 groups the business information that is relevant for sending a business document in a message. It includes a MessageHeader entity 41206. The DispatchDeliveryNotificationMessage entity 41208 includes the MessageHeader entity 41206 and has a 1:1 relationship with it.

(i) Message Header

A MessageHeader entity 41206 groups the business information from the view of the sending application. It includes information to identify the business document in a message, information about the sender and, possibly, information about the recipient.

The MessageHeader entity 41206 includes a SenderParty entity 41210 and a RecipientParty entity 41212. It has a respective 1:c relationship with these entities. It is of type GDT: BusinessDocumentMessageHeader.

The MessageHeader entity 41206 includes an ID, a ReferenceID, and a CreationDateTime. The ID an identifier for the business document in a (technical) message, and is of type GDT: MessageID. The ReferenceID is an identifier for another business document in another (technical) message, and is of type GDT: MessageID. The CreationDateTime is the creation date and time of message, and is of type GDT: DateTime.

(ii) Sender Party

A SenderParty entity 41210 is responsible for sending a business document at business application level. The SenderParty entity 41210 is of type GDT: BusinessDocumentMessageHeaderParty.

(iii) Recipient Party

A RecipientParty entity 41212 is responsible for receiving a business document at business application level. The RecipientParty entity 41212 is of type GDT: BusinessDocumentMessageHeaderParty.

(b) Delivery Package

The Delivery Package 41204 groups the delivery and its packages. It includes a Party Package 41214, a Location Package, a TransportInformation Package, a DeliveryInformation Package 41220, a DeliveryItem Package 41222, and a HandlingUnit Package 41224.

(i) Delivery

The delivery entity 41226 in the view of a DespatchedDeliveryNotification describes when and where from a product is to be delivered or picked up, and the quantity. The DispatchedDeliveryNotificationMessage entity 41208 includes the Delivery entity 41226 and has a 1:1 relationship with it. A delivery entity 41226 generally includes of several items, which refer to the specifications for the quantity, weight, and volume for each delivered product, as well as preceding documents and/or outline agreements. Delivery includes an ID, a CreationDateTime, a GrossWeightMeasure, a NetWeightMeasure, a VolumeMeasure, an ArrivalDateTime, an IssueDateTime, a CarrierHandoverDateTime, a GroupID, a WayBillID, a TransportModeCode, a DangerousGoodsIndicator, and a Note.

The ID is an identifier for the delivery, and is of type GDT: BusinessTransactionDocumentID. The CreationDateTime is the creation time of delivery, and is of type GDT: DateTime. The GrossWeightMeasure is the gross weight of delivery, and is of type GDT: Measure. The NetWeightMeasure is the net weight of delivery, and is of type GDT: Measure. The VolumeMeasure is the volume of delivery, and is of type GDT: Measure. The ArrivalDateTime is the (estimated) arrival date/time of delivery, and is of type GDT: DateTime. The IssueDateTime is the (estimated) shipping date/time of delivery, and is of type GDT: DateTime. The CarrierHandoverDateTime is the time of goods transfer to carrier, and is of type GDT: DateTime. The GroupID is an identifier for a group of deliveries to which the existing delivery belongs, and is of type GDT: BusinessTransactionDocumentGroupID. The WayBillID is an identifier of bill of lading, and is of type GDT: BusinessTransactionDocumentID. The TransportModeCode is the encoded representation of transportation mode, and is of type GDT: TransportModeCode. The DangerousGoodsIndicator is the specification of whether delivery includes dangerous goods or not, and is of type GDT: DangerousGoodsIndicator. The Note is the note for delivery, and is of type GDT: Note.

(ii) Party Package

The Party Package 41214 is the grouping of the business partners that may be relevant within the shipping notification. It includes a VendorParty entity 41228, a ProductRecipientParty entity 41230, and a CarrierParty entity 41232, a BuyerParty 41241, and a BilltoPayParty 31245. The Delivery entity 41226 includes these entities and has a respective 1:1 relationship with the VendorParty entities 41228 and the ProductRecipientParties entity 41230, and a 1:c relationship with the CarrierParty entities 41232. The BuyerParty 41241 is the company or person that/who has bought the notified products. The BuyerParty 31241 is type GDT: BusinessTransactionDocumentParty, whereby only the InternalID, the StandardID, the ProductRecipientID, and Address are used. The BillToParty 41245 is the company or the person to whom the bill for the notified products is sent. The BillToParty 41245 is type GDT: BusinessTransactionDocumentParty, whereby only the InternalID, the StandardID, the ProductRecipientID, and Address are used.

(a) Vendor Party

VendorParty entity 41228 is the company or the person to deliver the notified products. VendorParty entity 41228 is of type GDT: BusinessTransactionDocumentParty, whereas the InternalID, the StandardID, and the ProductRecipientID are used. For an internal communication, the InternalID is used for party entity types. For an interenterprise communication, for party entity types either the StandardID or the partner-role-specific ID of the receiving partner is used, in other words, for Supplier Collaboration scenarios the ProductRecipientID is used, and for Customer Collaboration scenarios, the VendorID is used. Due to the different possibilities for ID use, ID elements of the particular "Party" are optional.

(b) Product Recipient Party

ProductRecipientParty entity 41230 is the company or the person to take delivery of the notified products. ProductRecipientParty entity 41230 is of type GDT: BusinessTransactionDocumentParty, whereas the InternalID, the StandardID, and the ProductRecipientID are used. The use of the address of the ProductRecipientParty entity 41230 as the delivery address may not be intended in a delivery process in Supply Chain Planning and Execution. The ShipToLocation is intended for this.

(c) Carrier Party

CarrierParty entity 41232 is the company or person that/who transports the notified products. CarrierParty entity 41232 is of type GDT: BusinessTransactionDocumentParty, whereas the InternalID, the StandardID, and the ProductRecipientID are used.

(iii) Location Package

The Location Package 41216 is the grouping of the locations that may be relevant within the shipping notification. It includes a ShipFromLocation entity 41234, a ShipToLocation entity 41236, and a TransShipmentLocation 41249. The Delivery entity 41226 includes the ShipToLocation entity 41234 and the ShipFromLocation entity 41236. The Delivery entity 41226 has a 1:1 relationship with theShipToLocation entity 41234 and a 1:c relationship with the ShipFromLocation entity 41236.

(a) Ship From Location

The ShipFromLocation entity 41234 is the place where the notified products to be delivered come from. The ShipFromLocation entity 41234 is of type GDT: BusinessTransactionDocumentShipFromLocation, whereas the InternalID, the StandardID, the ProductRecipientID, and the VendorID are used. For an internal communication, the InternalID is used for location entity types. For an interenterprise communication, for location entity types, either the StandardID or the partner-role-specific ID of the receiving partner is used, in other words, for Supplier Collaboration scenarios the ProductRecipientID is used, and for Customer Collaboration scenarios, use the VendorID is used. Due to the different possibilities for ID use, ID elements of the particular "location" are optional.

(b) Ship To Location

The ShipToLocation entity 41236 is the place to where the notified products are delivered. The ShipToLocation entity 41236 is of type GDT: BusinessTransactionDocumentShipToLocation, whereas the InternalID, the StandardID, the ProductRecipientID, and the VendorID are used.

Transshipment Location

The TransshipmentLocation entity 41249 is the location at which the notified products are transferred on the way to the recipient. The TransshipmentLocation 41249 is type GDT: BusinessTransactionDocumentTransshipmentLocation, whereby the InternalID, StandardID, VendorID, ProductRecipientID, Note, and Address are used.

(iv) Transport Information Package

The TransportInformation Package 41218 is the summary of transportation information that may be relevant within the shipping notification. It includes a TransportMeans entity 41238 and a TransportTracking entity 41240. The Delivery entity 41226 includes the TransportMeans entity 41238 and the TransportTracking entity 41240. It has a 1:c relationship with these entities.

(a) Transport Means

The TransportMeans entity 41238 is the description of a means of transport and can also include information for a more detailed identification. The TransportMeans entity 41238 is of type GDT: TransportMeans.

(b) Transport Tracking

The TransportTracking entity 41240 delivers transport-related information that can be used for tracking deliveries, for example, in goods deliveries. The TransportTracking entity 41240 is of type GDT: TransportTracking.

(v) Delivery Information Package

The DeliveryInformation Package 41220 is the summary of delivery information that may be relevant within the shipping notification. It includes The Incoterms entity 41242. The Delivery entity 41226 includes the Incoterms entity 41242 and has a 1:c relationship with it.

The Incoterms entity 41242 is a commercial contract formula for the delivery conditions that correspond with the rules compiled by the International Chamber of Commerce (ICC). The Incoterms entity 41242 is of type GDT: Incoterms.

(vi) Delivery Item Package

The DeliveryItem Package 41222 is a grouping of items of a notified delivery, which includes specifications for the quantity of a product to be delivered/picked up. It includes a BusinessTransactionDocumentReference package 41244 and a ProductInformation package 41246.

(a) Delivery Item

DeliveryItem entity 41248 describes what quantity of a product is to be delivered/picked up. The DeliveryItem entity 41248 includes an ID, a ConsignmentIndicator, a GrossWeightMeasure, a NetWeightMeasure, a VolumeMeasure, a Quantity, Dangerous Goods, and a Note. The Delivery entity 41226 includes the DeliveryItem entity 41248 and has 1:cn relationship with it.

The ID is the identifier for the item in the delivery, which is of type GDT: BusinessTransactionDocumentItemID. The ConsignmentIndicator is the specification whether the item is intended for the consignment stock or not, which is of type GDT: ConsignmentIndicator. The GrossWeightMeasure is the gross weight of products in the delivery item, which is of type GDT: Measure. The NetWeightMeasure is the net weight of products in the delivery item, which is of type GDT: Measure. The VolumeMeasure is the volume of products in the delivery item, which is of type GDT: Measure. The Quantity is the quantity of product in the delivery item, which is of type GDT: Quantity. The Dangerous Goods is the classification of a dangerous goods in the delivery item, which is of type GDT: DangerousGoods. The Note is the note for item of delivery, which is of type GDT: Note.

(b) Business Transaction Document Reference Package

The BusinessTransactionDocumentReference package 41244 is a grouping of references to other business documents that may occur in the shipping notification. It includes a PurchaseOrderReference, a SchedulingAgreementReference, an OriginPurchaseOrder Reference and a SalesOrderReference. The DeliveryItem entity 41248 includes the PurchaseOrder Reference entity 41250, the SchedulingAgreementReference entity 41252 and the SalesOrderReference entity 41254 and has a respective 1:c relationship with these entities.

(i) Purchase Order Reference

The PurchaseOrderReference entity 41250 is the reference to a purchase order or an item within a purchase order. PurchaseOrderReference is of type GDT: BusinessTransactionDocumentReference. The PurchaseOrderReference entity 41250 includes the purchase order number and purchase order item number specified by the buyer.

(ii) Scheduling Agreement Reference

The SchedulingAgreementReference entity 41252 is the reference to an outline agreement. According to the rules of the outline agreement, products are procured on predefined dates within a time period. The SchedulingAgreementReference entity 41252 is of type GDT: BusinessTransactionDocumentReference.

(iii) Sales Order Reference

The SalesOrderReference entity 41254 is the reference to an order or an item within an order. The SalesOrderReference entity 41254 is of type GDT: BusinessTransactionDocumentReference. SalesOrderReference includes the order number and order item number specified by the vendor.

(iv) Origin Purchase Order Reference

The OriginPurchaseOrderReference entity 41283 is the reference to the original purchase order or to an item within the original purchase order. The OriginPurchaseOrderReference 41283 is type GDT: BusinessTransactionDocumentReference.

(v) Sales Order Reference

The SalesOrderReference entity 41254 is the reference to an order or an item within an order. The SalesOrderReference entity 41254 is of type GDT: BusinessTransactionDocumentReference. SalesOrderReference includes the order number and order item number specified by the vendor.

(c) Product Information Package

The ProductInformation package 41246 is a group of information that characterizes the product in a delivery in detail. It includes a Product entity 41256 and a Batch entity 41258. The DeliveryItem entity 41248 includes the Product entity 41256 and the Batch entity 41258, and has a 1:1 relationship with the Product entity 41256 and a 1:c relationship with the Batch entity 41258.

(i) Product

Product entity 41256 includes specifications to identify a delivered product and to track manufacture-related changes to the product. Product entity 41256 is of type GDT: BusinessTransactionDocumentProduct, whereas the InternalID, the StandardID, the ProductRecipientID, and the VendorID are used together with the ChangeNumber and, if necessary, the note. For an internal communication, the InternalID is used for product entity types. For an interenterprise communication, for product entity types, either the StandardID or the partner-role-specific ID of the receiving partner is used, in other words, for Supplier Collaboration scenarios the ProductRecipientID is used, and for Customer Collaboration scenarios the VendorID is used. Due to the different possibilities for ID use, ID elements of the particular 'product' are optional.

(ii) Batch

Batch entity 41258 is a batch in the delivery item. Batch entity 41258 includes an InternalID, a VendorID, a ProductRecipientID, a ManufacturingDate, a BestBeforeDate, and an OriginCountryCode.

The InternalID is the proprietary identifier for the batch, and is of type GDT: BatchID. The VendorID is an unique identifier used by the VendorParty for the batch, and is of type GDT: BatchID. The ProductRecipientID is an unique identifier used by the ProductRecipientParty entity 41230 for the batch, and is of type GDT: BatchID. The ManufacturingDate is the date of manufacture of the batch, and is of type GDT: Date. The BestBeforeDate is the best-before date of batch, and is of type GDT: Date. The OriginCountryCode is the encoded representation of country of origin of batch, and is of type GDT: CountryCode.

(vii) Handling Unit Package

The HandlingUnit Package 41224 is the summary of information that characterizes in detail how the delivery is packed or to be packed. It includes a HandlingUnit entity 41260. The DeliveryItem entity 41248 includes the HandlingUnit entity 41260 and has a 1:cn relationship with it.

HandlingUnit entity 41260 is a physical unit of packaging materials (load carrier, additional packaging materials) and the packaged products (of type "Material"). HandlingUnit entity 41260 is of type GDT: HandlingUnit.

(4) Message Data Type Received Delivery Notification

The message data type ReceivedDeliveryNotificationMessage groups the business information that is relevant for sending a business document in a message and the object Delivery included in the business document in the view of a ReceivedDeliveryNotification. It includes a MessageHeader package 41320 and a DeliveryPackage 41304. The message data type ReceivedDeliveryNotificationMessage makes the structure available for the message type ReceivedDeliveryNotification and the interfaces based on it.

(a) Message Header Package

A MessageHeader package 41302 groups the business information that is relevant for sending a business document in a message. The MessageHeader 41302 may not be required in the ReceivedDeliveryNotification.

(b) Delivery Package

The Delivery Package 41304 groups the delivery and its packages. It includes a Party Package 41306, a Location Package 41308, and a ReceivedDeliveryItem Package 41310.

(i) Delivery

The Delivery entity 41312 in the view of a ReceivedDeliveryNotification is the detailed confirmation of the receipt of a delivery. The ReceivedDeliveryNotificationMessage entity 41314 includes the Delivery entity 41312 and has a 1:1 relationship with it. Delivery entity 41312 includes an ID and a ReceiptDateTime. The ID is an identifier for the delivery, and is of type GDT: BusinessTransactionDocumentID. The ReceiptDateTime is the time of arrival of delivery according to the goods receipt posting, and is of type GDT: DateTime. The received delivery can vary from a delivery specified on a delivery note/previously notified by a DespatchedDeliveryNotification delivery (for example, varying quantities as a result of damages to the transport, varying arrival time).

(ii) Party Package

The Party Package 41306 is the grouping of the business partners that may be relevant within the notification about receipt of delivery. It includes a VendorParty entity 41316 and a ProductRecipientParty entity 41318. The Delivery entity 41312 includes the VendorParty entity 41316 and the ProductReipientParty entity 41318 and has a respective 1:1 relationship with these entities.

(a) Vendor Party

VendorParty entity 41316 is the company or the person that/who delivered the products. VendorParty entity 41316 is of type GDT: BusinessTransactionDocumentParty, whereas the InternalID, the StandardID, and the ProductRecipientID are used. For an internal communication, the InternalID is used for party entity types. For an interenterprise communication, for party entity types, either the StandardID or the partner-role-specific ID of the receiving partner is used, in other words, for Supplier Collaboration scenarios the ProductRecipientID is used, and for Customer Collaboration scenarios, the VendorID is used. Due to the different possibilities for ID use, ID elements of the particular "Party" are optional.

(b) Product Recipient Party

ProductRecipientParty entity 41318 is the company or the person that/who took delivery of the products. ProductRecipientParty entity 41318 is of type GDT: BusinessTransactionDocumentParty, whereas the InternalID, the StandardID, and the ProductRecipientID are used. The use of the address of the ProductRecipientParty entity 41318 as the delivery address may not be intended in a delivery process in Supply Chain Planning and Execution. The ShipToLocation is intended for this.

(iii) Location Package

The Location Package 41308 is the grouping of the locations that may be relevant within the notification about receipt of delivery. It includes a ShipFromLocation and a ShipToLocation entity 41320.

ShipToLocation entity 41320 is the place to where the products were delivered. ShipToLocation entity 41320 is of type GDT: BusinessTransactionDocumentShipToLocation, whereas the InternalID, the StandardID, the ProductRecipientID, and the VendorID are used. For an internal communication, the InternalID is used for location entity types. For an interenterprise communication, for location entity types, either the StandardID or the partner-role-specific ID of the receiving partner is used, in other words, for Supplier Collaboration scenarios the ProductRecipientID is used, and for Customer Collaboration scenarios the VendorID is used. Due to the different possibilities for ID use, ID elements of the particular "location" are optional.

(iv) Delivery Item Package

The DeliveryItem Package 41310 is a grouping of the DeliveryItem entity 41322 and its packages. It includes a ProductInformation Package 41324 and a DeliveryInformation Package 41326. The Delivery entity 41312 includes the DeliveryItem entity 41322 and has a 1:cn relationship with it.

(a) Delivery Item

DeliveryItem entity 41322 describes which quantity of a product has been received. DeliveryItem entity 41322 includes an ID, a CompletedIndicator, an InventoryStatusDateTime, and a ReceivedQuantity. The ID is an identifier for the item of the delivery received, which is of type GDT: BusinessTransactionDocumentItemID. The CompletedIndicator is the specification whether the delivery is completed from the recipient's point of view. This may also be the case if a quantity below the desired or notified quantity of the product has arrived, which is of type GDT: BusinessTransactionCompletedIndicator. The InventoryStatusDateTime is the date and time at which the goods receipt is posted into the warehouse stock, which is of type GDT: InventoryStatusDateTime. The ReceivedQuantity is the actual received quantity of the product, which is of type GDT: Quantity.

ReceiptDateTime is the time of the goods receipt posting, InventoryStatusDateTime is the time of the update for the goods receipt in the warehouse stock. As the update of the warehouse stock can take place later than the goods receipt posting, these dates may vary from each other, whereupon the InventoryStatusDateTime lies after the ReceiptDateTime. The InventoryStatusDateTime is required to ensure data consistency at the recipient of the ReceivedDeliveryNotification.

(b) Product Information Package

The ProductInformation package 41324 is a grouping of information that characterizes the product in a delivery in detail. It includes a Product entity 41328. The DeliveryItem entity 41322 includes the Product entities 41328 and has a 1:1 relationship with it.

Product entity 41328 includes the specifications for identifying a delivered product. Product is of type GDT: BusinessTransactionDocumentProduct, whereas the InternalID, the StandardID, the ProductRecipientID, and the VendorID are used. For an internal communication, the InternalID is used for product entity types. For an interenterprise communication, for product entity types, either the StandardID or the partner-role-specific ID of the receiving partner is used, in other words, for Supplier Collaboration scenarios the ProductRecipientID is used, and for Customer Collaboration scenarios, the VendorID is used. Due to the different possibilities for ID use, ID elements of the particular 'product' are optional.

(c) Delivery Information Package

The DeliveryInformation Package 41326 is the summary of delivery information about a product. It includes a Variance entity 41330. The DeliveryItem entity 41322 includes the Variance entity 41330 and has a 1:cn relationship with it. Variance describes a variance in the received quantity of a product and type of and reason for the variance. The Variance entity 41330 includes a Quantity and a QuantityDiscrepancyCode. The Quantity is the quantity deviation from the shipping notification (difference). This may be specified without a sign. It can be determined whether too much or too little was delivered from the following QuantityDiscrepancyCode, which is of type GDT: Quantity. The QuantityDiscrepancyCode is the encoded representation of type of and reason for the deviation at the received product, which is of type GDT: QuantityDiscrepancyCode.

(5) Element Structure (a) Despatched Delivery Notification

FIG. 414 depict the element structure for DespatchedDeliveryNotification. The element structure is similar to the data model, but provides additional information regarding the details of the interface. The element structure identifies the different packages 41400 in the interface, and represents the entities at various levels within the interface. As depicted in FIGS. 414-414, the interface for DespatchedDeliveryNotification includes five levels 41402, 41404, 41406, 41408, and 41410. The element structure identifies the cardinality 41412 between the entities of the interface, and provides information (i.e., type 41414) regarding the data type that provides the basis for the entity. The outermost package of this interface is a DespatchedDeliveryNotificationMessage package 41416, which includes a DespatchedDeliveryNotificationMessage entity 41418 at the first level 41402. The DespatchedDeliveryNotificationMessage entity 41418 is of type message data type ("MDT") 41414 "DespatchedDeliveryNotificationMessage" 41422 and there is one or zero 41420 occurrences.

The DespatchedDeliveryNotificationMessage package 41416 includes a MessageHeader package 41424 and a Delivery package 41426. The MessageHeader package 41424 includes a MessageHeader entity 41428, which is of type generic data type ("AGDT") 41414 "MessageHeader" 41432. There is one or zero 41430 MessageHeader entity 41428 for each DespatchedDeliveryNotificationMessage package 41424.

The MessageHeader entity 41428 includes a MessageID 41434 and a CreationDateTime 41440. The MessageID 41434 is of type GDT 41414 MessageID 41438. The CreationDateTime 41440 is of type GDT 41414 DateTime 41444. There is one 41436 MessageID 41434 for each MessageHeader entity 41428, one or zero 41442 CreationDateTime 41440 for each MessageHeader entity 41428.

The MessageHeader entity 41428 also includes a SenderParty entity 41446 and a RecipientParty entity 41452. The SenderParty entity 41446 is of type AGDT 41414 BusinessDocumentMessageHeaderParty 41450. The RecipientParty entity 41452 is also of type AGDT 41414 BusinessDocumentMessageHeaderParty 41456. There is one or zero 41448 SenderParty entity 41446 for each MessageHeader entity 41428, and there is one or zero 41454 RecipientParty entity 41452 for each MessageHeader entity 41428.

The Delivery package 41426 includes a Delivery entity 41458, a Party package 41442A, Location package 41444A, TransportInformation package 41446A, DeliveryInformation package 41448A, Item package 41450A, and HandlingUnit package 41450C. There is one 41460 Delivery entity 41458 for each DespatchedDeliveryNotificationMessage package 41426. The Delivery entity 41458 includes an ID 41464, a CreationDateTime 41470, a GrossWeightMeasure 41476, a NetWeightMeasure 41482, a VolumeMeasure 41488, an ArrivalDateTime 41494, IssueDateTime 41400A, CarrierHandoverDateTime 41406A, GroupID 41412A, WayBillID 41418A, a TransportModeCode 41424A, a DangerousGoodsIndicator 41430A, an Action Code 41467, a ProductRecipientID 41473, a ReturnsIndicator 41419A and a Note 41436A.

There is one 41466 ID 41464 for each Delivery entity 41458. The ID 41464 is of type GDT 41414 BusinessTransactionDocumentID 41474. A CreationDateTime 41470 has one 41472 occurrence and is of type GDT 41414 DateTime 41474. GrossWeightMeasure 41476 has zero or one 41478 occurrences and is of type GDT 41414 Measure41480. NetWeightMeasure 41482 has zero or one 41484 occurrences and is of type GDT 41414 Measure 41486. VolumeMeasure 41488 has zero or one 41490 occurrences and is of type GDT 41414 Measure 41492. ArrivalDateTime 41494 has zero or one 41496 occurrences and is of type GDT 41414 DateTime 41498. IssueDateTime 41400A has zero or one 41402A occurrences and is of type GDT 41414 DateTime 41404A. CarrierHandoverDateTime 41406A has zero or one 41408A occurrences and is of type GDT 41414 DateTime 41410A. GroupID 41412A has zero or one 41414A occurrences and is of type GDT 41414 BusinessTransactionDocumentGroupID 41416A. WayBillID 41418A has zero or one 41420A occurrences and is. of type GDT 41414 BusinessTransactionDocumentID 41422A. TransportModeCode 41424A has zero or one 41426A occurrences and is of type GDT 41414 TransportModeCode 41428A. DangerousGoodsIndicator 41430A has zero or one 41432A occurrences and is of type GDT 41414 DangerousGoodsIndicator 41434A. Note 41436A has zero or one 41438A occurrences and is of type GDT 41414 Note 41440A. ActionCode has zero or one 41469 occurrences of and the name is ActionCode 41471. ProductRecipientID has zero or one 41475 occurrences and the name is BusinessTransactionDocumentID 41466. ReturnIndicator 41421A has zero or one occurrences and the name is ReturnsIndicator 41423A.

The Party package 41442A includes a VendorParty entity 41452A, a ProductRecipientParty entity 41458A, a BuyerParty entity 41467A, a BillToParty entity 41400E and a CarrierParty entity 41464A. The VendorParty entity 41452A is of type AGDT 41414 BusinessTransactionDocumentParty 41456A. There is one 41454A VendorParty entity 41452A for each Party package 41442A. There is one 41460A ProductRecipientParty entity 41458A for each Party package 42A 414. The ProductRecipientParty entity 58A is of type AGDT 41414 BusinessTransactionDocumentParty 41462A. The CarrierParty entity 41464A is of type GDT 41414 BusinessTransactionDocumentParty 41468A. There is one or zero 41466A CarrierParty entity 41464A for each Party package 41442A.

The BuyerParty package 41467A includes an InternalID 41473A, a StandardID 41479A, a ProductRecipientID 41485A, and an Address 41464A. The InternalID 41473A has zero or one occurrences 41475A and the name PartyInternalID 41477A. The StandardID 41479A has any number of occurrences 41481A and the name PartyStandardID 41483A. The ProductRecipientID 41485A has zero or one occurrences 41487A and the name PartyPartyID 41489A. The Address 41464A has zero or one occurrences 41491A and the name Address 41493A. The BillToParty package 41400E includes an InternalID 41406E, a StandardID 41412E, a ProductRecipientID 41418E, and an Address 41424E. The InternalID 41406E has zero or one occurrences 41408E and the name PartyInternalID 41410E. The StandardID 41412E has any number of occurrences 41414E and the name PartyStandardID 41416E. The ProductRecipientID 41418E has zero or one occurrences 41420E and the name PartyPartyID 41422E. The Address 41424E has zero or one occurrences 41426E and the name Address 41428E.

The Location package 41444A includes a ShipFromLocation entity 41470A and a ShipToLocation entity 41476A. The ShipFromLocation entity 41470A is of type GDT 41414 BusinessTransactionDocumentShipFromLocation 41474A. There is one or zero 41472A ShipFromLocation entity 41470A for each Location package 41444A. The ShipToLocation entity 41476A is of type GDT 41414 BusinessTransactionDocumentShipToLocation 41480A. There is one 41478A ShipToLocation entity 41476A for each Location package 41444A.

The TransshipmentLocation entity 41450E includes an InternalID 41456E, a StandardID 41462E, a VendorID 41466E, a ProductRecipientID 41472E, a Note 41478E, and an Address 41486E. The InternalID 41456E has zero or one occurrences 41458E and the name TransshipmentLocation 41460E. The StandardID 41462E has any number of occurrences 41464E, and the name is LocationInternalID 41464E. The VendorID 41466E has zero or one occurrences 41468E and the name LocationStandardID 41470E. The ProductRecipientID 41472E has zero or one occurrences 41474E and the name LocationPartyID 41476E. The Note 41478E has zero or one occurrences 41480E and the name LocationPartyID 41482E. The Address 41486E has zero or one occurrences 41488E and the name Note 41490E.

The TransportInformation package 41446A includes a TransportMeans entity 41482A and a TransportTracking entity 41488A. The TransportMeans entity 41482A is of type GDT 41414 TransportMeans 41486A, and there is one or zero 41484A TransportMeans entity 41482A for each TransportInformation package 41446A. The TransportTracking entity 41488A is of type GDT 41414 TransportTracking 41492A, and there is one or zero 41490A TransportTracking entity 41488A for each TransportInformation package 41446A.

The ShipToLocation package 41476A includes an Address entity 41400F with zero or one occurrences 41402F and the name Address 41404F. The Location package 41444A includes a FreightInvoice ID 41406F with zero or one occurrences 41408F and the name BusinessTransactionDocumentID 41410F.

The DeliveryInformation package 414048A includes an Incoterms entity 41494A which is of type GDT 41414 Incoterms 41498A. There is one or zero 41496A Incoterms entity 41494A.

The Item package 41450A includes an Item entity 41400B. There is one or more 41402B Item entities 41400B for each Item package 41450A. The Item entity 41400B includes an ID 41406B, a ConsignmentIndicator 41412B, a GrossWeightMeasure 41418B, a NetWeightMeasure 41424B, a VolumeMeasure 41430B, a Quantity 41436B, a DangerousGoodsIndicator 41442B, and a Note 41448B. A CompletedIndicator entity 41417B with zero or one occurrences 41419B and the name BusinessTransaction-CompletedIndicator 41421 B is also included.

There is one or zero 41408B ID 41406B for each Item entity 41400B. The ID 41406B is of type GDT 41414 BusinessTransactionDocumentItemID 41441410B. A ConsignmentIndicator 41412B has one or zero 41414B occurrences and is of type GDT 41414 ConsignmentIndicator 41416B. GrossWeightMeasure 41418B has zero or one 41420B occurrences and is of type GDT 41414 Measure 41422B. NetWeightMeasure 41424B has zero or one 41426B occurrences and is of type GDT 41414 Measure 41428B. VolumeMeasure 41430B has zero or one 41432B occurrences and is of type GDT 41414 Measure 41434B. Quantity 41436B has zero or one 41438B occurrences and is of type GDT 41414 Quantity 41440B. DangerousGoods 41442B has zero or one 41444B occurrences and is of type GDT 41414 DangerousGoods 41446B. Note 41448B has zero or one 41450B occurrences and is of type GDT 41418 Note 41452B.

The Item package 41450B also includes a BusinessTransactionDocumentReference package 41454B and a ProductInformation package 41456B. The BusinessTransactionDocumentReference package 41454B includes a PurchaseOrderReference entity 41458B. The PurchaseOrderReference entity 41458B is of type GDT 41414 BusinessTransactionDocumentReference 41462B. There is one or zero 41460B PurchaseOrderReference entities 41458B for each BusinessTransactionDocumentReference package 41454B. The BusinessTransactionDocumentReference package 41454B includes a SchedulingAgreementReference entity 41464B. The SchedulingAgreementReference entity 41464B is of type GDT 41414 BusinessTransactionDocumentReference 41468B. There is one or zero 41466B SchedulingAgreementReference entities 41464B for each BusinessTransactionDocumentReference package 41454B. The BusinessTransactionDocumentReference package 41454B includes a SalesOrderReference entity 41470B. The SalesOrderReference entity 41470B is of type GDT 41414 SalesOrderReference 41474B. There is one or zero 41472B SalesOrderReference entities 41470B for each BusinessTransactionDocumentReference package 41454B. An OriginPurchaseOrderReference entity 41463B with zero or one occurrences 41465B and the name BusinessTransactionDocumentReference 41467B is also included.

The Item package 41450A also includes a SerialID 41420F, a ShippedQuantityAccumulation 41426F, a ReturnMaterialAuthorisationID 41432F, a KanbanCardID 41438F, a PackingListID 41444F, and an OutstandingQuantity 41450F. The SerialID 41420F may have any number of occurrences 41422F and the name is SerialID 41424F. The ShippedQuantityAccumulation 41426F has zero or one occurrences 41428F and the name ShippedQuantityAccumulation 41430F. The ReturnMaterialAuthorisationID 41432F has zero or one occurrences 41434F and the name ReturnMaterial 41436F. The KanbanCardID 41438F has zero or one occurrences 41440F and the name AuthorisationID 41442F. The PackingListID 41444F has zero or one occurrences 41446F and the name KanbanCardID 41448F. The OutstandingQuantity 41450F has zero or one occurrences 41452F and the name Quanity 41454F.

The ProductInformation package 41456B includes a Product entity 41476B and a Batch entity 41418C. The Product entity 41476B is of type GDT 41414 BusinessTransactionDocumentProduct 41480B. There is one or zero 41478B Product entity 41476B for each ProductInformation package 41456B. There is one or zero 41420C Batch entity 41418C for each ProductInformation package 41456B.

The Product entity 41476B includes an InternalID 41482B, a StandardID 41488B, a ShipperID 41494B, a ConsigneeID 41400C, a ChangeID 41406C, and a Note 41412C. The InternalID 41482B has zero or one 41484B occurrences and a data type of CDT 41414 ProductInternalID 41486B. The StandardID 41488B of the Product entity 41476B has zero or one 41490B occurrences and has a data type of CDT 41414 ProductStandardID 41492B. The ShipperID 41494B has zero or one 41496B occurrences and a data type of CDT 41414 ProductPartyID 41498B. The ConsigneeID 41400C has zero or one 41402C occurrences and a data type of CDT 41414 ProductPartyID 41404C. The ChangeID 41406C has zero or one 41408C occurrences and a data type of CDT 41414 ProductChangeID 41410C. The Note 41412C has zero or one 41414C occurrences and a data type of CDT 41414 Note 41416C.

The Batch entity 41418C includes an InternalID 41422C, a ShipperID 41428C, a ConsigneeID 41434C, a ManufacuringDate 41440C, a BestBeforeDate 41446C, and a OriginCountryCode 41452C. The InternalID 41422C has zero or one 41424C occurrences and has a data type of CDT 41414 BatchID 41426C. The ShipperID 41428C has zero or one 41430C occurrences and has a data type of CDT 41414 BatchID 41432C. The ConsigneeID 41434C has zero or one 41436C occurrences and has a data type of CDT 41414 BatchID 41438C. The ManufacturingDate 41440C has zero or one 41442C occurrences and a data type of CDT 41414 Date 41444C. The BestBeforeDate 41446C has zero or one 41448C occurrences and a data type of CDT 41414 Date 41450C. The OriginCountryCode 41452C has zero or one 41454C occurrences and a data type of CDT 41414 CountryCode 41456C.

The HandlingUnit package 41458C includes a HandlingUnit entity 41460C having any number 41441441462C of occurrences and a data type 41414 of HandlingUnit 41464C. The HandlingUnit package 41458C also includes a NetVolumeMeasure 41456F, a NetWeightMeasure 41462F, and a SerialID 41468F. The NetVolumeMeasure 41456F has zero or one occurrences 41458F and the name Measure 41460F. The NetWeightMeasure 41462F has zero or one occurrences 41464F and the name Measure 41466F. The SerialID 41468F has zero or one occurrences 41470F and the name SerialID 41472F.

(b) Received Delivery Notification

FIG. 415 depict the element structure for ReceivedDeliveryNotification. The element structure is similar to the data model, but provides additional information regarding the details of the interface. The element structure identifies the different packages 41500 in the interface, and represents the entities at various levels within the interface. As depicted in FIGS. 415-415, the interface for ReceivedDeliveryNotification includes five levels 41502, 41504, 41506, 41508, and 41510. The element structure identifies the cardinality 41512 between the entities of the interface, and provides information (i.e., type 41514) regarding the data type that provides the basis for the entity. The outermost package of this interface is a ReceivedDeliveryNotificationMessage package 41516, which includes a ReceivedDeliveryNotificationMessage entity 41518 at the first level 41502. The ReceivedDeliveryNotificationMessage entity 41518 is of type message data type ("MDT") 41514 "ReceivedDeliveryNotificationMessage" 41520 and there is one or zero 41541526 occurrences.

The ReceivedDeliveryNotificationMessage package 41516 includes a Delivery package 41522. The Delivery package 41522 includes a Delivery entity 41524, a Party package 41542, Location package 41544, and an Item package 41546. There is one 41526 Delivery entity 41524 for each Delivery package 41522. The Delivery entity 41524 includes an ID 41530, and a ReceiptDateTime 41536. There is one 41532 ID 41530 for each Delivery entity 41524. The ID 41530 is of type GDT 41514 BusinessTransactionDocumentID 41534. A ReceiptDateTime 41536 has one or zero 41538 occurrences and is of type GDT 41514 DateTime 41540.

The Party package 41542 includes a VendorParty entity 41548 and a ProductRecipientParty entity 41554. The VendorParty entity 41548 is of type AGDT 41514 BusinessTransactionDocumentParty 41552. There is one 41550 VendorParty entity 41548 for each Party package 41542. There is one 41556 ProductRecipientParty entity 41554 for each Party package 41542. The ProductRecipientParty entity 41554 is of type AGDT 41514 BusinessTransactionDocumentParty 41558.

The Location package 41544 includes a ShipToLocation entity 41560. The ShipToLocation entity 41560 is of type GDT 41514 BusinessTransactionDocumentShipToLocation 41564. There is one or zero 41562 ShipToLocation entities 41560 for each Location package 41544.

The Item package 41546 includes an Item entity 41566. There is any number 41568 of Item entities 41566 for each Item package 41546. The Item entity 41566 includes an ID 41570, a CompletedIndicator 41576, an InventoryStatusDateTime 41582, and a ReceivedQuantity 41588.

There is one or zero 41572 ID 41570 for each Item package 41546. The ID 41570 is of type GDT 41514 BusinessTransactionDocumentItemID 41574. A CompletedIndicator 41576 has one or zero 41578 occurrences and is of type GDT 41514 BusinessTransactionCompleteIndicator 41580. InventoryStatusDateTime 41582 has zero or one 41584 occurrences and is of type GDT 41514 DateTime 41586. ReceivedQuantity 41588 has one 41590 occurrence and is of type GDT 41514 Quantity 41592.

The Item package 41546 also includes a ProductInformation package 41594 and a DeliveryInformation package 41596. The ProductInformation package 41594 includes a Product entity 41598. The Product entity 41598 is of type GDT 41514 BusinessTransactionDocumentProduct 41502A. There is one 41500A Product entity 41598 for each ProductInformation package 41594.

The Product entity 41598 includes an InternalID 41504A, a StandardID 41510A, a ShipperID 41516A, and a ConsigneeID 41522A. The InternalID 41504A has zero or one 41506A occurrences and a data type of CDT 41514 ProductInternalID 41508A. The StandardID 41510A of the Product entity 41598 has zero or one 41541512A occurrences and has a data type of CDT 41514 ProductStandardID 41514A. The ShipperID 41516A has zero or one 41518A occurrences and a data type of CDT 41514 ProductPartyID 41520A. The ConsigneeID 41522A has zero or one 41524A occurrences and a data type of CDT 41514 ProductPartyID 41526A.

The DeliveryInformation package 41596 includes a Variance entity 41528A. There is any number 41530A Variance entities 41528A. The Variance entity 41528A includes a Quantity 41532A having one 41534A occurrence and having a type 41514 of Quantity 41536A. The Variance entity 41528A includes a QuantityDiscrepancyCode 41538A having one 41540A occurrence and having a type 41514 of QuantityDiscrepancyCode 41542A.

r) Invoice Accounting Interface

The motivating business scenarios for the InvoiceAccountingNotification interface are Sell from Stock and Procure from Stock. After an vendor invoice is checked in BAC Invoicing, a message is sent to BAC Accounting to update the payables to the vendors, the receivables from tax, and the expenses. Similarly, when a billing document is sent in BAC Billing, a message is sent to BAC Accounting to post the receivables from delivery, the payables from tax, and the revenues.

(1) Message Type Invoice Accounting Notification

An InvoiceAccountingNotification is a message for transferring information about incoming and outgoing payments from invoice verification and billing to Accounting. The message type InvoiceAccountingNotification is based on the message data type InvoiceAccountingMessage.

The requirements from Accounting are fulfilled with the information in the message. This includes: (1) Creation of an accounting document in the relevant legal unit in accordance with generally accepted accounting principles; (2) Assignrent of primary expenses and revenues in accordance with the requirements of cost and revenue accounting; and (3) Linking the business transactions (purchase order/order with invoice) so that, for example, audit requirements are met, but also, for example, so that variances between the order value and the invoice value can be determined and forwarded to the cost object and profitability analysis.

(2) Message Choreography

FIG. 416 depicts the message choreography for an exemplary invoice accounting notification process. The receipt or sending of an invoice is posted accordingly in Accounting. The information required is transmitted by Invoicing/Billing 41602 using an InvoiceAccountingNotification message 41606 to Accounting 41604. The invoice can be reversed, even if this could be problematic from a process view (for example, if payment has already been received). With an InvoiceAccountingCancellationRequest message 41608, in the case of an invoice reversal, Accounting 41604 can request a complete cancellation of a previously sent InvoiceAccountingNotification message 41606.

(3) Message Data Type Invoice Accounting Message

FIG. 417 shows a data model for the Invoice Accounting Notification. The message data type InvoiceAccountingMessage includes the InvoiceAccountingMessage Package 41700 included in the business document and the business information that is relevant for sending a business document in a message. The InvoiceAccountingMessage package 41700 includes a MessageHeader package 41702, an InvoiceAccounting package 41704 and an InvoiceAccountingMessage entity 41706. The message data type InvoiceAccountingMessage provides the structure for the message types InvoiceAccountingNotification and the relevant interfaces.

(a) Message Header Package

The MessageHeader package 41702 groups the business information that is relevant for sending a business document in a message. The MessageHeader 41702 is not required for InvoiceAccountingMessage. An invoice or credit memo is transferred to Accounting 41741704 once. A message ID is not required, since the reference can always be established with the ID of the invoice or credit memo. At most, the sender is known as the "system ID." The recipient is not known. Invoicing and Billing 41702 know that this message is to be sent to the Accounting 41741704 application.

(b) Invoice Accounting Package

The InvoiceAccounting package 41704 summarizes all the invoice or credit memo information relevant for Accounting. The InvoiceAccounting package 41704 includes a Party Package 41708, a BusinessTransactionDocumentReference Package 41710, an Item Package 41712 and an InvoiceAccounting entity 41714. There is a 1:1 relationship 41716 between the InvoiceAccountingMessage entity 41706 and the InvoiceAccounting entity 41714.

InvoiceAccounting is the preparation of an invoice or credit memo for Accounting. For an invoice or credit memo uniquely identified as the underlying business document, the InvoiceAccounting includes item information about receivables and payables, taxes on sales and purchases, and expenses and revenues. In addition, the business partners involved are. named. In addition, the business partners involved are named.

The InvoiceAccounting entity 41714 includes an ID, a TypeCode, a Date, and a PostingDate. The ID is the Identification of the invoice or credit memo, and is of type GDT: BusinessTransactionDocumentID. The TypeCode is the type of invoice or credit memo. These are "101 VendorInvoice" for an incoming invoice or credit memo, and "102 Invoice" for an outgoing invoice or credit memo. The differentiation between invoice and credit memo is relevant at item level for Accounting. The TypeCode is of type GDT: BusinessTransactionDocumentTypeCode. The Date is the invoice date, and is of type GDT: Date. The PostingDate is the date for which the invoice or vendor invoice is relevant for Accounting. This element is optional and has to be filled if this date is different to the invoice date. The PostingDate is of type GDT: Date.

(c) Party Package

The Party package 41708 groups together the information relevant to business partners affected by the invoice or vendor invoice. It includes a DebtorParty entity 41718 and a CreditorParty entity 41720. There is a 1:1 relationship 41722 between the InvoiceAccounting entity 41714 and the DebtorParty entity 41718. There is a 1:1 relationship 41724 between the InvoiceAccounting entity 41714 and the CreditorParty entity 41720.

(i) Debtor Party

The DebtorParty entity 41718 (customer, debtor) is the owner of payables. The DebtorParty entity 41718 is of type GDT: BusinessTransactionDocumentParty, but includes the InternalID element. No other elements are required since the master data exists in the sender and receiver system to be able to operate correctly. The DebtorParty entity 41718 is always filled.

For an vendor invoice or credit memo, the buying company (OrderingParty) is mapped in this business partner role. For an invoice or credit memo, the sold-to party is mapped in this business partner role.

(ii) Creditor Party

The CreditorParty entity 41720 (vendor, creditor) is the owner of the receivables. The CreditorParty entity 41720 is of type GDT: BusinessTransactionDocumentParty, but includes the InternalID element. No other elements are required since the master data exists in the sender and receiver system to be able to operate correctly. CreditorParty is always filled.

For an vendor invoice or credit memo, the vendor is mapped in this business partner role. For an invoice or credit memo, the own billing unit is mapped in this business partner role.

(d) Business Transaction Document Reference Package

The BusinessTransactionDocumentReferencePackage 41710 is the groups together information relevent to references to the underlying business documents for the invoice or vendor invoice that are relevant for all InvoiceAccountingItems. The BusinessTransactionDocumentReferencePackage 41710 includes an OriginInvoiceReference entity 41726 and an OriginVendorInvoiceReference entity 41728. There is a 1:c relationship 41730 between the InvoiceAccounting entity 41714 and the OriginInvoiceReference entity 41726. There is a 1:c relationship 41732 between the InvoiceAccounting entity 41714 and the OriginVendorInvoiceReference entity 41728.

(i) Origin Invoice Reference

The OriginInvoiceReference 41726 is the reference to a previous invoice to the DebtorParty entity 41718, and for which the current invoice or credit memo is a follow-on document. The OriginInvoiceReference entity 41726 is of type GDT: BusinessTransactionDocumentReference, but includes the Element ID. The ItemID element is not required since reference is made to the document and not to an item. The OriginInvoiceReference entity 41726 is filled if the current invoice or credit memo is a follow-on document for a previous invoice or credit memo. An OriginInvoiceReference 41726 may be the original invoice number of a current credit memo.

(ii) Origin Vendor Invoice Reference

The OriginVendorInvoiceReference 41728 is the reference to a previous vendor invoice for which the current invoice or credit memo is a follow-on document. The OriginVendorInvoiceReference 41728 is of type GDT: BusinessTransactionDocumentReference, but includes the Element ID. The ItemID element is not required since reference is made to the document and not to an item. The OriginVendorInvoiceReference 41728 is filled if the current invoice or credit memo is a follow-on document for an vendor invoice or credit memo. An OriginVendorInvoiceReference may be the original invoice number of a current credit memo.

(e) Invoice Accounting Item Package

The InvoiceAccountingItem package 41712 includes the information required for creating the line items of the accounting document. These are receivables or payments from deliveries and services (DueItem), receivables and payables from taxes (TaxItem), and expenses or revenues (ExpenseRevenueItem). The InvoiceAccountingItem package 41712 includes a DueItem Package 41734, a TaxItem Package 41736, and an ExpenseRevenueItem Package 41738.

The Item package 41712 belong to an invoice that may consist of several items. The total of all Items always balances to zero.

(f) Due Item Package

The DueItem package 41734 is the summary of all accounts receivable or payable from deliveries and services that are listed in an invoice or credit memo item. It includes a DueItem entity 41740. There is a 1:n relationship 41742 between the InvoiceAccounting entity 41714 and the DueItem entity 41740.

The DueItem entity 41740 is the information relevant for Accounting about receivables or payments from deliveries and services that are listed in an invoice or credit memo item. The DueItem entity 41740 includes an Amount, which is the invoice amount in transaction currency. Vendor invoices and credit memos (document type "101 VendorInvoice") are treated as payables, in other words a positive amount means increased payables and a negative amount means decreased payables. Invoices and credit memos (document type "102 Invoice") are treated as receivables, in other words a positive amount means increased receivables and a negative amount means decreased receivables. The DueItem entity 41740 is of type GDT: Amount.

There is usually exactly one DueItem entity 41740 that includes the total amount of the receivable or payable. In certain cases, several DueItem entities 41740 may be transferred (Example, Retail: Vendor invoice for drinks also includes a credit memo item for empties).

(g) Tax Item Package

The Taxitem package 41736 is the summary of all receivables or payments from taxes on sales and purchases that are listed in an invoice or credit memo item. The TaxItem package 41736 includes a TaxItem entity 41744. There is a 1:cn relationship 41741746 between the InvoiceAccounting entity 41714 and the TaxItem entity 41744.

The TaxItem entity 41744 is the information relevant for Accounting about an account receivable or payable from taxes on sales and purchases that are listed in an invoice or credit memo item.

The TaxItem entity 41744 includes an Amount and a ProductTaxEventTypeCode. The Amount is the tax amount in transaction currency. Vendor invoices and credit memos (document type "I01 VendorInvoice") are receivables from the tax authorities, in other words, a positive amount means increased receivables and a negative amount means decreased receivables. Invoices and credit memos (document type "I02 Invoice") are payables to the tax authorities, in other words, a positive amount means increased payables and a negative amount means decreased payables. The TaxItem entity 41744 is of type GDT: Amount. ProductTaxEventTypeCode is the taxable income that characterizes the circumstances of the purchase, sale, or consumption of a product, and is of type GDT: ProductTaxEventTypeCode.

There does not have to be a TaxItem entity 41744, for example, if the business transaction is not tax-relevant. However, there can be several TaxItem entities 41744 if several types of tax on sales and purchases or several tax rates are determined (example: Sales tax in USA).

(h) Expense Revenue Item Package

The ExpenseRevenueItem package 41738 is the summary of all expenses or revenues that are listed in an invoice or credit memo item. It includes an ExpenseRevenueItem entity 41754, an ExpenseRevenueItemProductInformation Package 41748, an ExpenseRevenueItemBusinessTransactionDocumentReference Package 41750, and an ExpenseRevenueItemAccountAssignment Package 41752. There is a 1:n relationship 41756 between the InvoiceAccounting entity 41714 and the ExpenseRevenueItem entity 41754.

(i) Expense Revenue Item

The ExpenseRevenueItem entity 41754 is the information relevant for Accounting about an expense or revenue that was listed in an invoice or credit memo item. The ExpenseRevenueItem entity 41754 includes an Amount, a PriceComponentTypeCode, and a Quantity. The Amount is the amount in transaction currency. Vendor invoices and credit memos (document type "I01 VendorInvoice") are an expense, in other words, a positive amount means increased expenses and a negative amount means decreased expenses. Invoices and credit memos (document type "I02 Invoice") are revenue, in other words, a positive amount means increased revenues and a negative amount means decreased revenues. The ExpenseRevenueItem entity 41754 is of type GDT: Amount. The PriceComponentTypeCode is the type of amount: Basic price, freight costs, discount, and is of type GDT: PriceComponentTypeCode. The Quantity is the quantity ordered or sold, and is of type GDT: Quantity.

There is at least one ExpenseRevenueItem entity 41754. If the invoice includes several items with different materials (products) several Items are created. If the revenues or expenses are split further (example: Discount, freight, and so on), several Items are transferred.

(ii) Expense Revenue Item Product Information Package

The ExpenseRevenueItemProductInformation package 41748 is the summary of all Accounting-relevant information from the item concerned about the project. It includes a Product entity 41758. There is a 1:c relationship between the ExpenseRevenueItem entity 41754 and the Product entity 41758.

The Product entity 41758 identifies the goods or service that the invoice item refers to. Product entity 41758 is of type GDT: BusinessTransactionDocumentProduct, but includes the InternalID element. No other elements are required since the master data exists in the sender and receiver system to be able to operate correctly.

(iii) Expense Revenue Item Business

Transaction Document Reference Package The ExpenseRevenueItemBusinessTransactionDocumentReference package 41750 is the summary of all references to business documents that substantiate the invoice or vendor invoice from the invoice item. The ExpenseRevenueItemBusinessTransactionDocumentReference package 41750 includes a PurchaseOrderReference entity 41762 and a SalesOrderReference entity 41764. There is a 1:c relationship 41766 between the ExpenseRevenueItem entity 41754 and the PurchaseOrderReference entity 41762. There is a 1:c relationship 41768 between the ExpenseRevenueItem entity 41754 and the SalesOrderReference entity 41764.

(a) Purchase Order Reference

The PurchaseOrderReference entity 41762 is the referenced order item in the invoice item. The PurchaseOrderReference entity 41762 is of type GDT: BusinessTransactionDocumentReference. In the GR/IR account, the PurchaseOrderReference entity 41762 is used to assign the vendor invoice to the goods receipt.

(b) Sales Order Reference

The SalesOrderReference entity 41764 is the referenced sales order item in the invoice item. SalesOrderReference entity 41764 is of type GDT: BusinessTransactionDocumentReference. In the goods issue/invoice issue account, the SalesOrderReference entity 41764 is used to assign the invoice to the goods issue.

(iv) Expense Revenue Item Accounting Object Set Package

The ExpenseRevenueItemAccountingObjectSet package 41752 is the summary of all account assignment information for the invoice item. It includes an AccountingObjectSet entity 41770. There is a 1:c relationship 41772 between the ExpenseRevenueItem 41754 and the AccountingObjectSet entity 41770.

Expenses or revenues from an invoice can be mapped with several different account assignments. For example, expenses for freight could be mapped to two different cost centers, 50% to each. However, the sending applications have to make this split; one account assignment can be specified for each ExpenseRevenueItem.

The AccountingObjectSet entity 41770 includes the account assignment objects to which the expenses or revenues of the invoice item are assigned. The AccountingObjectSet entity 41770 is of type GDT: AccountingObjectSet.

(4) Message Data Type Element Structure

FIG. 418 depicts the element structure for InvoiceAccountingNotification. The element structure identifies the different packages 41800 in the interface, and represents the entities at various levels within the interface. As shown in FIG. 418, the interface for InvoiceAccountingNotification includes six levels 41802, 41804, 41806, 41808, 41810, and 41812. The element structure identifies the number of occurrences 41814 of each element and provides a data type 41816 and a data type name 41818 for each element.

The outermost package of this interface is InvoiceAccountingMessage package 41820, which includes a InvoiceAccountingMessage entity 41822 at the first level 41802. The InvoiceAccountingMessage entity 41822 is of data type MDT 41824 named InvoiceAccountingMessage 41825.

The InvoiceAccountingMessage package 41820 includes a InvoiceAccounting package 41826. The InvoiceAccounting package 41826 includes a Party package 41868, a BusinessTransactionDocumentReference package 41870, an Item package 41872, and an InvoiceAccounting entity 41828 at the second level 41804. The InvoiceAccounting entity 41828 has one occurrence 41830 and is of data type AGDT 41832 named MessageHeader 41834. The Invoice Accounting entity 41828 includes an ID 41836, a TypeCode 41844, a Date 41852, and a PostingDate 41860 at the third level 41806. The ID 41836 has one occurrence 41838 and is of data type BGDT 41840 with a data type name of BusinessTransactionDocumentID 41842. The TypeCode 41844 has one occurrence 41846 and is of a data type of BGDT 41848 with a data type name of BusinessTransactionDocumentTypeCode41850. The Date 41852 has one occurrence 41854 and is of data type BGDT 41856 with a data type name of Date 41858. The PostingDate 41860 has zero or one occurrence and is of data type BGDT 41864 with a data type name of Date 41866.

The Party package 41868 includes a Debtor Party entity 41874 and a CreditorParty entity 41890 at the third level 41806. The DebtorParty entity 41874 includes an InternalID 41882 at the fourth level 41808. The DebtorParty entity 41874 has one occurrence 41876, and is of data type 418AGDT 41878 with a data type name of BusinessTransactionDocumentParty 41880. The InternalID 41882 has one occurrence 41884 and a data type of BGDT 41886 with a data type name of PartyID 41888. The CreditorParty entity 41890 also includes an InternalID 41892 at the fourth level 41808.

The CreditorParty 41890 has one occurrence 41892 and is of data type AGDT 41894 with a data type name of BusinessTransactionDocumentParty 41896. The InternalID 41898 has one occurrence 41800A with a data type of BGDT 41802A and a data type name PartyID 41804A.

The BusinessTransactionDocumentReference package 41870 includes an OriginInvoiceReference entity 41806A and an OriginVendorInvoiceReference entity 41822A at the third level 41806. The OriginInvoiceReference entity 41806A includes an ID 41814A at the fourth level 41808. The OriginVendorInvoiceReference entity 41822A includes an ID 41830A at the fourth level 41808. The OriginInvoiceReference 41806A has zero or one occurrences 41808A and is of a data type AGDT 41810A with a data type name of BusinessTransactionDocumentReference 41812A. The ID 41814A has one occurrence 41816A and is of data type BGDT 41818A with a data type name of BusinessTransactionDocumentID 41820A. The OriginVendorInvoiceReference 41822A has zero or one occurrence 41824A and is of data type AGDT 41826A with a data type name of BusinessTransactionDocumentReference 41828A. The ID 41830A has one occurrence 41832A and is of data type BGDT 41834A with a data type name of BusinessTransactionDocumentID 41836A.

The Item package 41872 includes a DueItem package 41840A, a TaxItem package 41842A, an ExpenseRevenueItem 41844A, and an Item entity 41838A at the third level 41806. The DueItem package 41840A includes a DueItem entity 41846A at the fourth level 41808. The DueItem entity 41846A includes an Amount 41854A at the fifth level 41810. The DueItem 41846A has at least one occurrence 41848A and is of data type AGDT 41850A with a data type name of InvoiceAccountingDueItem 41852A. The Amount 41854A has one occurrence 41856A and is of data type BGDT 41858A with a data type name of Amount 41860A.

The TaxItem package 41842A includes a TaxItem entity 41862A at the fourth level 41808. The TaxItem entity 41862A includes an Amount 41870A and a ProductTaxEventTypeCode 41878A at the fifth level 41810. The TaxItem entity 41862A has any number of occurrences 41864A and is of a data type AGDT 41866A with a data type name of InvoiceAccountingTaxItem 41868A. The Amount 41870A has one occurrence 41872A and is of a data type of BGDT 41874A with the data type name of Amount 41876A. The ProductTaxEventTypeCode 41878A has one occurrence 41880A and is of data type BGDT 41882A with a data type name of ProductTaxEventTypeCode 41884A.

The ExpenseRevenueItem 41844A includes a ProductInformation package 41818B, a BusinessTransactionDocumentReference package 41820B, an AccountingObjectSet package 41822B, and an ExpenseRevenueItem entity 41886A at the fourth level 41808. The Expense RevenueItem entity 41886A includes an Amount 41894A, a PriceComponentTypeCode 41802B, and a Quantity 41810B at the fifth level 41810. The ExpenseRevenueItem entity 41886A has at least one occurrence 41888A and is of data type AGDT 41890A with a data type name of InvoiceAccountingExpenseRevenueItem 41892A. The Amount 41894A has one occurrence 41896A and is of data type BGDT 41898A with a data type name of Amount 41800B. The PriceComponentTypeCode 41802B has one occurrence 41804B and is of data type BGDT 41806B with a data type name of PriceComponentTypeCode 41808B. The Quantity 41810B has zero or one occurrences 41812B and is of data type BGDT 41814B with a data type name of Quantity 41816B.

The ProductInformation package 41818B includes a Product entity 41824B at the fifth level 41810. The Product entity 41824B includes an InternalID 41832 at the sixth level 41812, which has one occurrence 41834B and is of data type BGDT 41836B with a data type name of ProductID 41838B. The Product entity 41824B has zero or one occurrences 41826B and is of data type BGDT 41828B with a data type name of BusinessTransactionDocumentProduct 41830B.

The BusinessTransactionDocumentReference package 41820B includes a PurchaseOrderReference entity 41840B and a SalesOrderReference 41848B at the fifth level 41810. The PurchaseOrderReference entity 41840B has zero or one occurrences 41842B and is of data type AGDT 41844B with a data type name of BusinessTransactionDocumentReference 41846B. The SalesOrderReference 41848B has zero or one occurrences 41850B and is of data type AGDT 41852B with a data type name of BusinessTransactionDocumentReference 41854B.

The AccountingObjectSet package 41822B includes an AccountingObjectSet entity 41856B at the fifth level 41810. The AccountingObjectSet entity 41856B has zero or one occurrences 41858B and is of data type AGDT 41860B with a data type name of AccountingObjectSet 41862B.

s) Delivery Execution Request

FIG. 419 depicts a graphical representation 41900 of a DeliveryExecutionRequest 41912 between business entities in accordance with methods and systems consistent with the subject matter described herein. The illustrative message choreography is a logical sequence of messages that is not dependent on actual scenarios. In the implementation shown in FIG. 419, the illustrative business entities include an Ordering Application 41902, a Fulfillment Coordination 41904, and a Supply Chain Execution 41906. The request to supply chain execution to carry out an action, or to make preparations to do so, can be made in the form of a DeliveryExecutionRequest 41912 via Fulfillment Coordination or directly from the order entry system or purchase order system. Deliveries to be executed or expected deliveries are created or adapted from a DeliveryExecutionRequest 41912. Interested applications are informed by DeliveryInformation 41914 that deliveries to be executed or expected deliveries have been created or changed.

Fulfillment Coordination 41904 is optional in this message choreography. Corresponding messages from the sales order system (such as SalesOrderFulfillmentRequest 41908 from CRM) can be mapped to the DeliveryRequest.

In a DeliveryExecutionRequest 41912, items and schedule lines may be transmitted with complete data at object level, i.e., if an item or a schedule line is transmitted, all data specified in the interface for the item or schedule line must be transmitted.

In a DeliveryExecutionRequest 41912, the ActionCode may be used at header level and at item level in order to display whether the DeliveryExecutionRequest 41912 or individual items are to be created, changed, or deleted. It is checked against the transmitted ActionCode. The CompleteTransmissionIndicator controls whether all items were transmitted or explicitly changed items. If the CompleteTransmissionIndicator is set, the ActionCode may be set to "Create." In this case, items not transmitted may be implicitly deleted.

A DeliveryExecutionConfirmation or a DeliveryExecutionFulfillmentNotification 41910 can be sent in order to inform the requesting system that a DeliveryExecutionRequest cannot be executed, cannot be executed in full, or that an incoming change cannot be accepted and executed. It may be sufficient to transmit the details about the delivery using the DeliveryInformation 41914, since the requesting system can decide itself, by means of completion rules or partial delivery agreements, whether a retrospective change is still being processed or has been processed.

Motivating business scenarios for the DeliveryExecutionRequest interface include "Sell From Stock" and "Procure To Stock." In the "Sell from Stock" scenario, purchase orders are accepted from the customer and generate a request to Logistics to fulfill the order. In this scenario, the order is fulfilled by delivering the ordered goods to the customer from a goods warehouse. A delivery request to the relevant goods warehouse is generated, which results in a delivery to be executed at a specific time. In the "ProcureToStock" scenario, goods are ordered from a vendor. The purchase order or confirmation of the purchase order by the vendor generates a request to Logistics to receive the goods on the requested or confirmed date and place them in storage. The vendor sends an advanced shipping notification, which specifies further details regarding quantities and dates for the request to the warehouse.

A DeliveryExecutionRequest is a request to a warehouse or to supply chain execution to prepare and execute the outbound delivery of goods or the receipt of a expected or announced inbound goods delivery. The structure of the message type DeliveryExecutionRequest is specified in the message data type DeliveryExecutionRequestMessage.

In the case of outbound deliveries (sales orders or purchase order returns to a vendor), this message type represents a request to stage goods and execute a delivery of particular products to a customer or a vendor for a particular point in time. In the case of inbound deliveries (purchase orders to a vendor or returns by a customer), this message type represents a request to prepare for goods receipt at a particular date and to accept and receive the goods. In the following relevant passages, the term "delivery" refers to outbound as well as inbound deliveries, i.e., the direction in which the goods flow is irrelevant for the basic document, but it is controlled from the context of the message by an indicator.

The message choreography describes the possible logical sequence in which different types of messages can appear. This choreography is independent of the actual process or scenario.

The request to supply chain execution to carry out an action, or make preparations to do so can be made in the form of a DeliveryExecutionRequest by Fulfillment Coordination or directly from the order entry system or purchase order system. Deliveries to be executed or expected deliveries are created or adapted from a DeliveryExecutionRequest. The interested applications are informed by DeliveryInformation that deliveries to be executed or expected deliveries have been created or changed. The corresponding messages from the sales order system (such as SalesOrderFulfillmentRequest from CRM) can be mapped to the DeliveryRequest.

In one implementation, in a DeliveryExecutionRequest, items and schedule lines are transferred with complete data at object level, i.e., if an item or a schedule line is transferred, the data specified in the interface for the item or schedule line has to be transferred. In a DeliveryExecutionRequest, the ActionCode is used at header and item level in order to display whether the DeliveryExecutionRequest or individual items are to be created, changed, or deleted. It is checked against the transferred ActionCode. The CompleteTransmissionIndicator controls whether items were transferred or explicitly changed items. If the CompleteTransmissionIndicator is set, the ActionCode by definition has to be set to "Create." In this case, items not transferred are implicitly deleted.

In order to inform the requesting system that a DeliveryExecutionRequest cannot be executed, cannot be executed in full, or that an incoming change cannot be accepted and executed, a DeliveryExecutionConfirmation or a DeliveryExecutionFulfillmentNotification can be sent. Initially, it is sufficient to transfer the details about the delivery using the DeliveryInfo, since the requesting system can decide itself by means of completion rules or partial delivery arrangements if a retrospective change is still being processed or has been processed.

(1) Message Data Type Delivery Execution Request Message

The message data type DeliveryExecutionRequestMessage is included in a Delivery Execution Request Message package 42000. The Delivery Execution Request Message package 42000 includes a DeliveryExecutionRequestMessage entity 42006, which is included in the business document and the business information that is relevant for sending a business document in a message. The message data type DeliveryExecutionRequestMessage includes a MessageHeader package 42002 and a DeliveryExecutionRequest package 42004. The message data type DeliveryExecutionRequestMessage makes the structure available for the message type DeliveryExecutionRequest and the relevant interfaces.

(a) Message Header Package

A MessageHeader package 42002 groups together the business information that is relevant for sending a business document in a message. The MessageHeader groups together the business information from the point of view of the sending application to identify the business document in a message, to provide information about the sender, and to provide any information about the recipient.

The MessageHeader entity is divided into a SenderParty entity and a RecipientParty entity, and is of type GDT: BusinessDocumentMessageHeaderParty. The MessageHeader includes an ID and a CreationDateTime. The ID is the identification of the business document in the technical message. The CreationDateTime is the creation date of a business document in the technical message. A MessageHeader is not required.

(b) Delivery Execution Request Package

The DeliveryExecutionRequest package 42004 groups together data for creating an outbound or inbound delivery. It includes a Party package 42008, a Location package 42010, a DeliveryInformation package 42012, a FollowUpMessage package 42014, an Attachment package 42016, a Description package 42018, and an Item package 42020. The DeliveryExecutionRequest package 42004 also includes a DeliveryExecutionRequest entity 42022. There is a 1:n relationship 42024 between the DeliveryExecutionRequestMessage 42006 and the DeliveryExecutionRequest entity 42022.

The DeliveryExecutionRequest entity 42022 is a request to supply chain execution (e.g., Logistics or the warehouse) to stage goods and to deliver them or prepare goods arrivals and receive incoming goods. The requests to supply chain execution can be derived from sales orders or customer returns, purchase orders or returns to vendors, service orders or the need to stage raw materials, semifinished and finished products for production. A DeliveryExecutionRequest entity 42022 operation includes request items with the requested products, partners, locations, and schedule lines. This specifies when and where, and by whom products are to be staged and delivered (from and to) and received.

The DeliveryExecutionRequest entity 42022 includes a BaseBusinessTransactionDocumentID, a BaseBusinessTransactionDocumentTypeCode, an ActionCode, a CreationDateTime, a LastChangeDateTime, and an ItemListCompleteTransmissionIndicator. The BaseBusinessTransactionDocumentID is an identifier of the base business document for the DeliveryExecutionRequest, and is of type GDT: BusinessTransactionDocumentID. The BaseBusinessTransactionDocumentTypeCode is a coded representation of the previously identified business document type, such as PurchaseOrder and SalesOrder, and is of type GDT: BusinessTransactionDocumentTypeCode. The ActionCode is a coded representation of the actions that control creating, changing, and deleting the requesting document at a message recipient, and is of type GDT: ActionCode. The CreationDateTime is the calendar day and time on which the document was created, and is of type GDT: DateTime. The LastChangeDateTime is the calendar day and time on which the document was changed, and is of type GDT: DateTime. The ItemListCompleteTransmissionIndicator is the ItemListCompleteTransmissionIndicator specifies whether the items in the document are to be transmitted (items that are not transmitted are implicitly classed as cancelled) or whether new, changed items that have been cancelled since the last transmission are to be transmitted, and is of type GDT: CompleteTransmissionIndicator. “Create,” “Change,” and “Delete” are permitted as ActionCodes.

(i) Party Package

The Party package 42008 groups together the business partners that can be involved in a business delivery process. It includes a BuyerParty entity 42026, a SellerParty entity 42028, a ProductRecipientParty entity 42030, a VendorParty entity 42032, and a CarrierParty entity 42034. A default logic is used from the header to the items for business partners. Business partners specified at the header level are used for the items for which a corresponding partner is not explicitly transferred. The default logic is used for the partner as a whole, including the contact persons. In one implementation, parts of a partner specified at header level cannot be specified in more detail at item level. The default logic is a simplified version of the transferred message. As regards logic, partners at header level behave as if they have been explicitly transferred for the items of the message. Changes to partners at header level are changes to the items for which these partners are valid.

In one implementation, either the ID or the ID and address can be transferred for each partner. If the ID is transferred, the address defined in the master data is used. If the ID and address are transferred, the ID identifies the partner and the address is deemed to be a document address that is different than the master data address.

The BuyerParty entity 42026 is the buying company or person. The BuyerParty entity 42026 is of type GDT: BusinessTransactionDocumentParty. Initially, the internal ID serves as identification, i.e., the InternalID has to and can be transferred. The BuyerParty entity 42026 includes an Address entity 42046 and a Contact entity 42048. There is a 1:c relationship 42050 between the BuyerParty entity 42026 and the Address entity 42046. There is also a 1:c relationship 42052 between the BuyerParty entity 42026 and the Contact entity 42048.

The Address entity 42046 includes a PersonName entity 42054, an Office entity 42056, a PhysicalAddress entity 42058, a GeoCoordinates entity 42060, and a Communication entity 42062. There is a 1:c relationship 42064 between the Address entity 42046 and the PersonName entity 42054. There is a 1:c relationship 42066 between the Address entity 42046 and the Office entity 42056. There is a 1:c relationship 42068 between the Address entity 42046 and the PhysicalAddress entity 42058. There is a 1:c relationship 42070 between the Address entity 42046 and the GeoCoordinates entity 42062. There is a 1:c relationship 42072 between the Address entity 42046 and the Communication entity 42062.

The Contact entity 42048 includes an Address entity 42074. There is a 1:c relationship 42076 between the Contact entity 42048 and the Address entity 42074. The Address entity 42074 in the Contact entity 42048 includes the same elements as the Address entity 42046 in the BuyerParty entity 42026. For example, Address entity 42074 includes a PersonName entity 42078, an Office entity 42080, a PhysicalAddress entity 42082, a GeoCoordinates entity 42084, and a Communication entity 42086. There is a 1:c relationship 42088 between the Address entity 42074 and the PersonName entity 42078. There is a 1:c relationship 42090 between the Address entity 42074 and the Office entity 42080. There is a 1:c relationship 42092 between the Address entity 42074 and the PhysicalAddress entity 42082. There is a 1:c relationship 42094 between the Address entity 42074 and the GeoCoordinates entity 42084. There is a 1:c relationship 42096 between the Address entity 42074 and the Communication entity 42086.

The SellerParty entity 42028 is the selling company. The SellerParty entity 42028 is of type GDT: BusinessTransactionDocumentParty. Initially, the internal ID serves as identification, i.e., the InternalID can be transferred. The SellerParty entity 42028 includes the same elements 42098 as the BuyerParty entity 42026.

The ProductRecipientParty 42030 is the company or person to which goods are to be delivered. The ProductRecipientParty entity 42030 is of type GDT: BusinessTransactionDocumentDocumentParty. In a delivery process in supply chain execution, the ShipToLocation is used as the delivery address rather than the address of the ProductRecipientParty entity 42030. Initially, the internal ID serves as identification, i.e., the InternaliD can be transferred. In one implementation, one part of the ProductRecipientParty entity 42030 in the delivery process, however, is the specified contact person for any queries relating to a delivery. The ProductRecipientParty entity 42030 includes the same elements 42000A as the BuyerParty entity 42026.

The VendorParty entity 42032 is the company or person who is to deliver goods. The VendorParty entity 42032 is of type GDT: BusinessTransactionDocumentParty. In a delivery process in supply chain execution, the ShipFromLocation is used as the delivery address rather than the address of the VendorParty entity 42032. Initially, the internal ID serves as identification, i.e., the InternalID can be transferred. In one implementation, one part of the VendorParty entity 42032 in the delivery process, however, is the specified contact person for any queries relating to a delivery. The VendorParty entity 42032 includes the same elements 42002A as the BuyerParty entity 42026.

The CarrierParty entity 42034 is the company or person that transports the goods. The CarrierParty entity 42034 is of type GDT: BusinessTransactionDocumentParty: Initially, the internal ID serves as identification, i.e., the InternalID can be transferred. The CarrierParty entity 42034 includes the same elements 42004A as the BuyerParty entity 42026.

(ii) Location Package

The Location package 42010 groups together the locations that can occur in a delivery process. It includes a ShipToLocation entity 42006A and a ShipFromLocation entity 42008A. There is a 1:c relationship 42010A between the DeliveryExecutionRequest entity and the ShipToLocation entity 42006A. Similarly, there is a 1:c relationship 42012A between the DeliveryExecutionRequest entity 42022 and the ShipFromLocation entity 42008A.

In one implementation, the Location package 42010 transfers either the ID, the address, or both the ID and address for each location. If the ID is transferred, the system uses the address defined in the master data. If the address is transferred, the system uses this address (a location may be assigned at the address recipient). If the ID and address are transferred, the ID identifies the location and the address is deemed to be a document address that is different than the master data address.

The ShipToLocation entity 42006A and the ShipFromLocation entity 42008A can be used to provide a detailed description of the flow of goods between the ship-to and ship-from location. A default logic is used for locations from the header to the items. Locations specified at header level are valid for the items for which a corresponding location is not explicitly transferred. The default logic applies for the location as a whole, including the contact persons. In one implementation, parts of a location specified at header level are not specified more precisely at the item level. The default logic is a simplified version of the transferred message. Locations at the header level act as if they have been explicitly transferred for of the items of the message. Changes to the locations at the header level are changes to the items that are valid for this location.

The ShipToLocation entity 42006A is the location to which goods are shipped. The ShipToLocation entity 42006 is of type GDT: BusinessTransactionDocumentLocation. The ShipToLocation entity 42006A is the delivery address. If the ShipToLocation entity 42006A is not specified in the header of the Order package, it is specified at item level in the Item package 42020 and vice versa. Initially, the internal ID serves as identification, i.e., the InternalID can be transferred. The ShipToLocation entity includes an Address entity. There is a 1:c relationship 42016A between the ShipToLocation entity 42006A and the Address entity 42014A. The Address entity 42014A includes a PersonName entity 42018A, an Office entity 42020A, a PhysicalAddress entity 42022A, a GeoCoordinates entity 42024A and a Communication entity 42026A. There is a 1:c relationship 42028A between the Address entity 42014A and the PersonName entity 42018A. There is a 1:c relationship between the Address entity 42014A and the Office entity. There is a 1:c relationship 42032A between the Address entity 42014A and the PhysicalAddress entity 42022A. There is a 1:c relationship 42034A between the Address entity 42014A and the GeoCoordinates entity 42024A. There is a 1:c relationship 42036A between the Address entity 42014A and the Communication entity 42026A.

The ShipFromLocation entity 42008A is the location from which goods are shipped. The ShipFromLocation entity 42008A is of type GDT: BusinessTransactionDocumentLocation. Initially, the internal ID serves as identification, i.e., the InternalID can be transferred. The ShipFromLocation entity 42008A includes the same elements 42038A as the ShipToLocation entity 42006A.

(iii) Delivery Information Package

The DeliveryInformation package 42012 groups together controlling delivery parameters for one or more requested or announced deliveries in a delivery process. It includes a DeliveryTerms entity 42040A and a DeliveryControl entity 42042A. There is a 1:c relationship 42044A between the DeliveryExecutionRequest entity 42022 and the DeliveryTerms entity 42040A. There is a 1:c relationship 42046A between the DeliveryExecutionRequest entity and the DeliveryControl entity 42042A.

The DeliveryTerms entity 42040A is the conditions and agreements that are to be valid for executing the delivery and transporting the ordered goods and for the desired services and activities. The DeliveryTerms entity 42040 Ais of type GDT: DeliveryTerms. DeliveryTerms entity 42040A uses the default logic from the header to the items. Thus, items for which a deviating DeliveryTerm entity 42040A is not explicitly transferred use the DeliveryTerms entity 42040A specified at header level. The default logic is a simplified version of the transferred message. As regards logic, DeliveryTerms entity 42040A at the header level behave as if they have been explicitly transferred for the items of the message. Changes to DeliveryTerms entity 42040A at header level are changes to the items for which these DeliveryTerms entity 42040A are valid.

The DeliveryTerms entity 42040A includes an Incoterms entity 42048A, a PartialDelivery entity 42050A, a QuantityTolerance entity, 42052A a Transport entity 42054A, and a Description entity 42056A. There is a 1:c relationship 42058A between the DeliveryTerms entity 42040A and the Incoterms entity. There is a 1:c relationship 42060A between the DeliveryTerms entity 42040A and the PartialDelivery entity 42050A. There is a 1:c relationship 42064A between the DeliveryTerms entity 42040A and the QuantityTolerance entity 42052A. There is a 1:c relationship 42066A between the DeliveryTerms entity 42040A and the Transport entity 42054A. There is a 1:c relationship 42066A between the DeliveryTerms entity 42040A and the Description entity 42056A.

The DeliveryControl entity 42042A is the set of internal controlling delivery parameters for one or more requested deliveries in a delivery process. The DeliveryControl entity 42042A is a structuring package and includes a DeliveryBlockedIndicator, which is of type GDT BusinessTransactionBlockedIndicator, and an Indicator that indicates whether the sales order or the sales order item has been blocked for delivery.

DeliveryControl entity 42042A uses the default logic from the header to the items. Thus, items for which a deviating DeliveryControl entity 42042A is not explicitly transferred use the DeliveryControl entity 42042A specified at header level. The default logic is a simplified version of the transferred message. As regards logic, DeliveryControl entity 42042A at header level behaves as if it has been explicitly transferred for the items of the message. Changes to DeliveryControl entity 42042A at header level are changes to the items for which this DeliveryControl entity 42042A is valid. An example of a DeliveryControl entity 42042A is delivery block with blocking reason, such as credit limit check.

(iv) Follow-Up Message Package

The FollowUpMessage package 42014 groups together the information that defines if or which types of follow-up messages are expected during the subsequent process. It includes a FollowUpDespatchedDeliveryNotification entity 42068A, a FollowUpBillingDueNotification entity 42070A, and a FollowUpInvoicingDueNotification entity 42072A. There is a 1:c relationship 42074A between the DeliveryExecutionRequest entity 42022 and the FollowUpDespatchedDeliveryNotification entity 42068A. There is a 1:c relationship 42076A between the DeliveryExecutionRequest entity 42022 and the FollowUpBillingDueNotification entity 42070A. There is a 1:c relationship 42078A between the DeliveryExecutionRequest entity 42022 and the FollowUpInvoicingDueNotification entity 42072A. The fact that a follow-up message is expected does not mean that the requesting partner of the delivery is informed or wants to be informed of this follow-up message.

The FollowUpDespatchedDeliveryNotification entity 42068A is information about how and if the buyer would like to be informed by the seller of a delivery and specifies if a advanced shipping notification (ASN) is expected or is to be sent. The FollowUpDespatchedDeliveryNotification entity 42068A includes a RequirementCode, which is a coded representation of the type or the extent to which a follow-up message is expected, and is of type GDT: FollowUpMessageRequirementCode. The seller can transfer the confirmation of the outbound delivery either electronically using a DespatchedDeliveryNotification message or by traditional methods of communication, such as e-mail or fax. The values "Expected" and "Unexpected" are permitted for the RequirementCode.

The FollowUpBillingNotification entity 42070A is information about whether an invoice is to be created during the subsequent process and whether the delivery data is required for invoice creation. The FollowUpBillingNotification entity 42070A includes a RequirementCode, which is a coded representation of the type or the extent to which a follow-up message is expected, and is of type GDT: FollowUpMessageRequirementCode. The values "Required" and "Forbidden" are permitted for the RequirementCode.

The FollowUpInvoicingNotification entity 42072A is information about whether an invoice is expected during the subsequent process and if the delivery data is desired for invoice verification. The FollowUpInvoicingNotification entity 42072A includes a RequirementCode, which is a coded representation of the type or the extent to which a follow-up message is expected, and is of type GDT: FollowUpMessageRequirementCode. The values "Required" and "Forbidden" are permitted for the RequirementCode.

(v) Attachment Package

The Attachment package 42016 groups together the attachment information regarding the requesting sales order. It includes an AttachmentWebAddress entity 42080A. There is a 1:cn relationship 42082A between the DeliveryExecutionRequest entity 42022 and the AttachmentWebAddress entity 42080A.

The AttachmentWebAddress entity 42080A refers to a web address for a document of any type that is assigned to a DeliveryExecutionRequest entity 42022 as an attachment. The AttachmentWebAddress entity 42080A is of type GDT: WebAddress.

(vi) Description Package

The Description package 42018 groups together the explanatory texts regarding the sales order or the purchase order or the requesting document generally. It includes an InternalDescription entity 42084A and a Description entity 42086A. There is a 1:c relationship 42088A between the DeliveryExecutionRequest entity 42022 and the InternalDescription entity 42084A. There is a 1:c relationship 42090A between the DeliveryExecutionRequest entity 42022 and the Description entity 42086A.

The InternalDescription entity 42084A is a natural-language text regarding the sales order or the purchase order. The InternalDescription entity 42084A is of type GDT: Description. The InternalDescription entity 42084A can be used for different types of textual information about the transferred sales order or the transferred purchase order and not just the current message. It is intended for "internal" use and in one implementation, is not visible to external business partners.

A Description entity 42086A is a natural-language text regarding the sales order or the purchase order, which is visible to business partners. The Description entity 42086A is of type GDT: Description. The Description entity 42086A can be used for different types of textual information about the transferred sales order or the transferred purchase order and not just the current message.

(vii) Delivery Execution Request Item Package

The DeliveryExecutionRequestItem package 42020 groups together the data that describes the delivery type, quantity, and circumstances for a product to be delivered or received. It includes a ProductInformation package 42092A, a Batch package 42094A, a Party package 42096A, a Location package 42098A, a DeliveryInformation package 42000B, an Attachment package 42002B, a Description package 42004B, and a ScheduleLine package 42006B. The DeliveryExecutionRequestItem package 42020 also includes a DeliveryExecutionRequestItem entity 42008B. There is a 1:n relationship 42010B between the DeliveryExecutionRequest entity 42022 and the DeliveryExecutionRequestItem entity 42008B. DeliveryExecutionRequestItem entities 42008B are arranged hierarchically using a Hierarchy Relationship entity 42012B. The Hierarchy Relationship entity 42012B is the relationship between a sub-item and a higher-level parent item in an item hierarchy.

DeliveryExecutionRequestItem entity 42008B is the part of a delivery request that includes an actual product, quantities, and dates as well as the location to which the product is to be delivered. The DeliveryExecutionRequestItem entity 42008B includes a BaseBusinessTransactionDocumentitemID, a BaseBusinessTransactionDocumentItemTypeCode, an ActionCode, a CreationDateTime, a LastChangeDateTime, a HierarchyRelationship, and a ScheduleLineListCompleteTransmissionIndicator.

The BaseBusinessTransactionDocumentItemID is an identifier of the item in the base business document for the DeliveryExecutionRequest, and is of type GDT: BusinessTransactionDocumentItemID. The BaseBusinessTransactionDocumentItemTypeCode is a coded representation of the previously identified item, and is of type GDT: BusinessTransactionDocumentItemTypeCode. The ActionCode is a coded representation of the actions that control creating, changing, and deleting the document items at a message recipient, and is of type GDT: ActionCode. The CreationDateTime is the calendar day and time when the item was created, and is of type GDT: DateTime. The LastChangeDateTime is the calendar day and time on which the item was changed, and is of type GDT: DateTime. HierarchyRelationship includes a ParentItemld, which is of type GDT BusinessTransactionDocumentItemID, and a TypeCode, which is of type GDT BTDItemHierarchyRelationshipTypeCode. The ScheduleLineListCompleteTransmissionIndicator specifies whether the schedule lines in the document are to be transmitted (schedule lines that are not transmitted are implicitly classed as cancelled) or whether new, changed schedule lines that have been cancelled since the last transmission are to be transmitted, and is of type GDT: CompleteTransmissionIndicator.

The TypeCode classifies the base document item. From a semantic point of view, items can recursively contain other items. Item hierarchies are mapped in this way. From a technical point of view, the item type is generally not defined recursively, since this may not be handled by some commonly-used XML tools. The hierarchies are mapped using a ParentItemID and an ItemHierarchyTypeCode.

The values "O01" (Sales Order) and "O02" (Purchase Order) are permitted as TypeCodes. The constraints in the GDT BusinessTransactionDocumentItemTypeCode in connection with the DeliveryExecutionRequestTypeCode are applicable here. "Create," "Change," and "Delete" are permitted as ActionCodes, since a hard semantic may initially be required. If the ItemListCompleteTransmissionIndicator is set, the ActionCode has to be set to "Create."

(a) Delivery Execution Request Item Product Information Package

The DeliveryExecutionRequestItemProductInformation package 42092A groups together the information for identifying and describing a product in a purchase requisition item for Logistics. It includes a Product entity 42018B. There is a 1:c relationship 42020B between the DeliveryExecutionRequestItem entity 42008B and the DeliveryExecutionRequestItemProduct entity 42018B.

The Product entity 42018B identifies and describes the product to be delivered or the announced product. The Product entity 42018B is of type GDT: BusinessTransactionDocumentProduct. Initially, the internal ID serves as identification, i.e., the InternalID can be transferred.

(b) Delivery Execution Request Item Batch Package

The DeliveryExecutionRequestItemBatch package 42094A groups together the batch information for the product ordered in a purchase order item or sales order item. It includes a Batch entity 42022B. There is a 1:c relationship 42024B between the Item entity 42008B and the Batch entity 42022B.

The Batch entity 42022B includes a batch and its properties. A batch is a partial quantity of a particular material and is a homogeneous, non-reproducible unit with particular specifications. The Batch entity 42022B includes a BatchID, which is of type GDT: BatchID.

(c) Delivery Execution Request Item Party Package

The DeliveryExecutionRequestItemParty Package 42096A is similar to the Party package 42008 at the header level. It includes a BuyerParty entity 42026B, a SellerParty entity 42028B, a ProductRecipientParty entity 42030B, a VendorParty entity 42032B, and a CarrierParty entity 42034B. There is a 1:c relationship 42036B, 42038B, 42040B, 42042B and 42044B, respectively between the DeliveryExecutionRequestItem entity 42008B and these entities. These entities have a 1:c relationship 42046B, 42048B, 42050B, 42052B and 42054B respectively with the corresponding Address entities.

(d) Delivery Execution Request Item Location Package

The Delivery Execution Request Item Location Package is similar to the Location package at the header level. The Location package 42098A includes a ShipToLocation entity 42006A and a ShipFromLocation entity 42008A. There is a 1:c relationship 42060B between the DeliveryExecutionRequestItem entity 42008B and the ShipToLocation entity 42056B. Similarly, there is a 1:c relationship 42060B between the DeliveryExecutionRequestItem entity 42008B and the ShipFromLocation entity 42058B. These entities have a 1:c relationship 42064B, 42066B, respectively with the corresponding Address entities.

(e) Delivery Execution Request Item Delivery Information Package

The Delivery Execution Request Item Delivery Information Package 42000B is similar to the DeliveryInformation package at the header level. It includes a DeliveryTerms entity 42068B and a DeliveryControl entity 42070B. There is a 1:c relationship 42044A between the DeliveryExecutionRequestItem entity 42008B and the DeliveryTerms entity 42040A. There is a 1:c relationship between the DeliveryExecutionRequestItem entity 42008B and the DeliveryControl entity 42070B.

(f) Delivery Execution Request Item Attachment Package

The Delivery Execution Request Item Attachment Package 42096B is similar to the Attachment package at the header level. It includes an AttachmentWebAddress entity 42096B. There is a 1:cn relationship 42002B between the DeliveryExecutionRequestItem entity 42008B and the AttachmentWebAddress entity 42096B.

(g) Delivery Execution Request Item Description Package

The Delivery Execution Request Item Description Package 42004B is similar to the Description package at the header level. It includes an InternalDescription entity 42000C and a Description entity 42002C. There is a 1:c relationship 42004C between the DeliveryExecutionRequestItem entity 42008B and the InternalDescription entity 42000C. There is a 1:c relationship 42006C between the DeliveryExecutionRequestItem entity 42008B and the Description entity 42002C.

(h) Delivery Execution Request Item Schedule Line Package

The DeliveryExecutionRequestItemScheduleLine package 42006B groups together the information about quantities and dates for a purchase requisition item that are relevant for a request to Logistics. It includes a ScheduleLine entity 42008C and a ConfirmedScheduleLine entity 42010C. There is a 1:n relationship 42012C between the Item entity 42008B and the ScheduleLine entity 42008C. There is a 1:n relationship 42014C between the Item entity 42008B and the ConfirmedScheduleLine entity 42010C.

The ScheduleLine entity 42008C is information about the delivery quantities and various dates of the schedule expected by Sales or Purchasing in a DeliveryExecutionRequest entity 42022. The ScheduleLine entity 42008C includes an ID, an ActionCode, a Quantity, and a DeliveryDateTimePeriod. The ID is a key for a schedule line, and is of type GDT ScheduleLineID. The ActionCode is a coded representation of the actions that control creating, changing, and deleting the schedule line at a message recipient, and is of type GDT: ActionCode. The Quantity is the required or expected quantity in the sales or order unit, and is of type GDT: Quantity. The DeliveryDateTimePeriod is the (planned) delivery period: expected or confirmed delivery date/time or delivery period, and is of type GDT: DateTimePeriod. “Create,” “Change,” and “Delete” are permitted as ActionCodes, since initially a hard semantic may be required. If ActionCodes are used, IDs are specified. If the ScheduleLineListCompleteTransmissionIndicator is set, the ActionCode is set to “Create.” The ScheduleLine entity 42008C includes a DeliveryPeriod entity 42016C. There is a 1:c relationship 42018C between the ScheduleLine entity and the DeliveryPeriod entity 42016C.

The ConfirmedScheduleLine entity 42010C is information about the delivery quantities and various dates of the schedule expected by Sales or Purchasing in a DeliveryExecutionRequest entity 42022. The ConfirmedScheduleLine entity 42010C includes a DeliveryPeriod entity 42020C. There is a 1:c relationship 42022C between the ConfirmedScheduleLine entity 42010C and the DeliveryPeriod entity 42020C.

(2) Element Structure

The message data type element structure for the DeliveryExecutionRequest message is depicted in FIG. 421. The element structure is similar to the data model, but provides additional information regarding the details of the interface. The element structure identifies the different packages 42100 in the interface, and represents the entities at various levels within the interface. As depicted in FIG. 421, the interface for DeliveryExecutionRequest includes five levels 42102, 42104, 42106, 42108, and 42110. The outermost package of this interface is a DeliveryExecutionRequestMessage package 42116, which includes a DeliveryExecutionRequestMessage entity 42118 at the first level 42102. The DeliveryExecutionRequestMessage entity 42118 is of a type "DeliveryExecutionRequestMessage" 42120. The DeliveryExecutionRequestMessage package 42116 includes a MessageHeader package 42122 and a DeliveryExecutionRequest package 42124.

The MessageHeader package 42122 includes a MessageHeader entity 42126 at the second level 42104. The MessageHeader entity 42126 is of a type "MessageHeader" 42130, and there is zero or one 42128 MessageHeader entity 42126 for each MessageHeader package 42122.

The DeliveryExecutionRequest package 42124 includes one 42134 DeliveryExecutionRequest entity 42132 at the second level 42104 and the following packages: a Party package 42174, a Location package 42176, a DeliveryInformation package 42178, a FollowUpMessage package 42180, an Attachment package 42182, a Description package 42184, and a DeliveryRequestItem package 42186.

The DeliveryExecutionRequest entity 42132 includes a BaseBusinessTransactionID entity 42138, a BaseBusinessTransactionTypeCode entity 42144, an ActionCode entity 42150, a CreationDateTime entity 42156, a LastChangeDateTime entity 42162, and an ItemListCompleteTransmissionIndicator entity 42168. The BaseBusinessTransactionID entity 42138 is of type "BusinessTransactionDocumentID" 42142, and there is one 42140 BaseBusinessTransactionID entity 42138 for each DeliveryExecutionRequest entity 42132. The BaseBusinessTransactionTypeCode entity 42144 is of type "BusinessTransactionDocumentTypeCode" 42148, and there is one 42146 BaseBusinessTransactionTypeCode 42144 for each DeliveryExecutionRequest entity 42132. The ActionCode entity 42150 is of type "ActionCode" 42154, and there is zero or one 42152 ActionCode 42150 for each DeliveryExecutionRequest entity 42132. The CreationDateTime entity 42156 is of type "DateTime" 42160, and there is zero or one 42158 CreationDateTime entity 42156 for each DeliveryExecutionRequest entity 42132. The LastChangeDateTime entity 42162 is of type "DateTime" 42166, and there is zero or one 42164 LastChangeDateTime entity 42162 for each DeliveryExecutionRequest entity 42132. The ItemListCompleteTransmissionIndicator entity 42168 is of type "CompleteTransmissionIndicator" 42172, and there is zero or one 42170 ItemListCompleteTransmissionIndicator entity 42168 for each DeliveryExecutionRequest entity 42132.

The Party package 42174 includes a BuyerParty entity 42188, a SellerParty entity 42124A, a ProductRecipientParty entity 42132A, a VendorParty entity 42140A, and a CarrierParty entity 42148A at the third level 42106.

The BuyerParty entity 42188 is of the type "BusinessTransactionDocumentParty" 42192, and there is one or zero 42190 BuyerParty entity 42188 for each Party package 42174. The SellerParty entity 42124A is of the type "BusinessTransactionDocumentParty" 42130A, and there is zero or one 42128A SellerParty entity 42124A for each Party package 42174. The ProductRecipientParty entity 42132A is of the type "BusinessTransactionDocumentParty" 42138A, and there is one or zero 42136A ProductRecipientParty entity 42132A for each Party package 42174. The VendorParty entity 42140A is of the type "BusinessTransactionDocumentParty" 42146A, and there is zero or one 42144A VendorParty entity 42140A for each Party package 42174. The CarrierParty entity 42148A is of the type "BusinessTransactionDocumentParty" 42154A, and there is zero or one 42152A CarrierParty entity 42148A for each Party package 42174.

The BuyerParty entity 42188 includes an InternalID entity 42194, an Address entity 42100A, and a Contact entity 42106A at the fourth level 42108. The InternalID entity 42194 is of the type "PartyInternalID" 42198, and there is one 42196 InternalID entity 42194 for each BuyerParty entity 42188. The Address entity 42100A is of the type "Address" 42104A, and there is zero or one 42102A Address entity 42100A for each BuyerParty entity 42104A. The Contact entity 42106A is of the type "BusinessTransactionDocumentContact" 42110A, and there is zero or one 42108A Contact entity 42106A for each BuyerParty entity 42188.

The Contact entity 42106A in BuyerParty entity 42188 includes an InternalID entity 42112A and an Address entity 42118A at the fifth level 42110. The InternalID entity 42112A is of the type "PartyInternalID" 42116A, and there is one 42114A InternalID entity 42112A for each Contact entity 42106A. The Address entity 42118A is of the type "Address" 42122A, and there is zero or one 42120A Address entity 42118A for each Contact entity 42106A.

The SellerParty entity 42124A contains the same elements 42126A at the fourth level 42108 as found for the BuyerParty entity 42188. ProductRecipientParty entity 42132A contains the same elements 42134A at the fourth level 42108 as found for the BuyerParty entity 42188. VendorParty entity 40A contains the same elements 42140A at the fourth level 42108 as found for the BuyerParty entity 42188. CarrierParty entity contains the same elements 42148A at the fourth level 42108 as found for the BuyerParty entity 42188.

The Location package 42176 includes a ShipToLocation entity 42156A and a ShipFromLocation entity 42174A at the third level 42106. The ShipToLocation entity 42156A is of a type "BusinessTransactionDocumentLocation" 42160A, and there is one or zero 42158A ShipToLocation 42156A for each Location package 42176. The ShipFromLocation entity 42174A is of a type "BusinessTransactionDocumentLocation" 42180A, and there is one 42178A ShipFromLocation entity 42174A for each Location package 42176.

The ShipToLocation entity 42186A includes an InternalID entity 42162A, and an Address entity 42168A at the fourth level 42108. The InternalID entity 42162A is of the type "LocationInternalID" 42166A, and there is one 42164A InternalID entity 42162A for each ShipToLocation entity 42156A. The Address entity 42168A is of the type "Address" 42172A, and there is zero or one 42170A Address entity 42168A for each ShipToLocation entity 42156A.

The ShipFromLocation entity 42174A contains the same elements 42176A at the fourth level 42108 as found for the ShipToLocation entity 42156A.

The DeliveryInformation package 42178 includes a DeliveryTerms entity 42182A and a DeliveryControl entity 42128B. There is one or zero 42184A DeliveryTerms entity 42182A for each DeliveryInformation package 42178. The DeliveryTerms entity 42182A is of type DeliveryTerms 42186A. The DeliveryTerms entity 42182A includes a DeliveryItemGroupID entity 42188A which is of type BusinessTransactionDocumentItemGroupID 42192A and there is one or zero occurrences 42190A. The DeliveryTerms entity 42182A includes a DeliveryPriorityCode 42194A which has one or zero occurrences 42196A and a data type of BusinessTransactionPriorityCode 42198A. The DeliveryTerms entity 42182A includes an IncoTerms 42100B which has one or zero occurrences 42102B and a data type of IncoTerms 42104B. The DeliveryTerms entity 42182A includes a PartialDelivery 42106B which has one or zero occurrences 42108B and a data type of PartialDelivery 42110B. The DeliveryTerms entity 42182A includes a QuantityTolerance 42112B which has one or zero occurrences 42114B and a data type of QuantityTolerance 42116B. The DeliveryTerms entity 42182A includes a Transport 42118B which has one or zero occurrences 42120B. The DeliveryTerms entity 42182A includes a Description 42122B which has one or zero occurrences 42124B and a data type of Description 42126B.

There is one or zero 42130B DeliveryControl entity 42128B for each DeliveryInformation package 42178. The DeliveryControl entity 42128B includes a DeliveryBlockedIndicator 42132B which is of type BusinessTransactionBlockedIndicator 42136B and there is one or zero occurrences 42134B.

The FollowUpMessage package 42180 includes a FollowUpDespatchedDeliveryNotification entity 42138B, a FollowUpBillingDueNotification entity 42148B, and a FollowUpInvoicingDueNotification entity 42158B. There is zero or one occurrence 42140B of the FollowUpDespatchedDeliveryNotification entity. The FollowUpDespatchedDeliveryNotification entity 42138B includes a RequirementCode 42142B having one occurrence 42144B and having a data type of FollowUpMessageRequirementCode 42146B. The FollowUpBillingDueNotification entity 42148B has one or zero occurrences 42150B. It includes a RequirementCode 42152B having one occurrence 42154B and having a data type of FollowUpMessageRequirementCode 42156B. The FollowUpInvoicingDueNotification entity 42158B has one or zero occurrences 42160B. It includes a RequirementCode 42162B having one occurrence 42164B and having a data type of FollowUpMessageRequirementCode 42166B.

The Attachment package 42182 includes an AttachmentWebAddress entity 42168B, which is of type WebAddress 42172B. There one or more 42170B AttachmentWebAddress entities 42168B for each Attachment 42182.

The Description package 42184 includes an InternalDescription entity 42174B and a Description entity 42180B. The InternalDescription entity 42174B is of type Description 42178B. There is one or zero 42176B of InternalDescription entities 42174B for each Description package 42184. The Description entity 42180B is of type Description 42184B. There is one or zero 42182B Description entities 42180B for each Description package 42184.

The DeliveryRequestItem package 42186 includes at least one 42188B DeliveryItem entity 42186B at the third level 42106, a ProductInformation package 42144C, a Batch package 42146C, a Party package 42148C, a Location package 42150C, an Attachment package 42154C, a Description package 42156C, and a ScheduleLine package 42158C.

The Item entity 42186B includes a BaseBusinessTransactionID entity 42192B, a BaseBusinessTransactionTypeCode entity 42198B, an ActionCode entity 42104C, a CreationDateTime entity 42110C, a LastChangeDateTime entity 42116C, a HierarchyRelationship entity 42122C and a ScheduleLineListCompleteTransmissionIndicator entity 42138C. The BaseBusinessTransactionID entity 42192B is of type BusinessTransactionDocumentID 42196B, and there is one 42194C BaseBusinessTransactionID entity 42196B for each Item entity 42186B. The BaseBusinessTransactionTypeCode entity 42198B is of type "BusinessTransactionDocumentTypeCode" 42102C, and there is one 42100C BaseBusinessTransactionTypeCode 42198B for each Item entity 42186B. The ActionCode entity 42104C is of type "ActionCode" 42108C, and there is zero or one 42106C ActionCode 42104C for each Item entity 42186B. The CreationDateTime entity 42110C is of type "DateTime" 42114C, and there is zero or one 42112C CreationDateTime entity 42110C for each Item entity 42186B. The LastChangeDateTime entity 42116C is of type "DateTime" 42120C, and there is zero or one 42118C LastChangeDateTime entity 42116C for each Item entity 42186B. There is zero or one 42124C HierarchyRelationship entity 42122C for each Item entity 42186B.

The HierarchyRelationship entity 42122C includes a ParentItemID 42126C having one or zero occurrences 42128C and a data type BusinessTransactionDocumentItemID 42130C. The HierarchyRelationship entity 42122C includes a TypeCode 42132C having one occurrence 42134C and a data type BusinessTransactionDocumentItemHierarchyRelationshipTypeCode 42136C.

The ScheduleLineListCompleteTransmissionIndicator entity 42138C is of type "CompleteTransmissionIndicator" 42142C, and there is zero or one 42140C ScheduleLineListCompleteTransmissionIndicator entity 42138C for each Item entity 42186B.

The ProductInformation package 42144C includes a Product entity 42160C at the fourth level 42108. The Product entity 42160C is of a type "BusinessTransactionDocumentProduct" 42164C, and there is one 42162C Product entity 42160C for each ProductInformation package 42144C.

The Product entity 42160C in the ProductInformation package 42144C includes an InternalID entity 42166C, and a Description entity 42172C. The InternalID entity 42166C is of a type "ProductInternalID" 42170C, and there is zero or one 42168C InternalID entity 42166C for each Product entity 42160C. The Description entity 42172C is of a type "Note" 42176C, and there is zero or one 42174C Description entity 42172C for each Product entity 42160C.

The Batch package 42146C includes a Batch entity 42178C at the fourth level 42108. The Batch entity 42178C is of a type "Batch" 42182C, and there is zero or one 42180C Batch entity 42178C for each Batch package 42146C. The Batch entity 42178C includes an ID entity 42184C at the fifth level 42110. The ID entity 42184C is of a type "BatchID" 42188C, and there is zero or one 42186C BatchID entity 42184C for each Batch entity 42178C.

The Party package 42148C includes a BuyerParty entity 42190C, a SellerParty entity 42198C, a ProductRecipientParty entity 42106D, a VendorParty entity 42114D, and a CarrierParty entity 42122D.

The BuyerParty entity 42190C is of the type "BusinessTransactionDocumentParty" 42196C, and there is one or zero 42194C BuyerParty entity 42190C for each Party package 42148C. The SellerParty entity 42198C is of the type "BusinessTransactionDocumentParty" 42104D, and there is zero or one 42102D SellerParty entity 42198C for each Party package 42148C. The ProductRecipientParty entity 42106D is of the type "BusinessTransactionDocumentParty" 42112D, and there is one or zero 42110D ProductRecipientParty entity 42106D for each Party package 42148C. The VendorParty entity 42114D is of the type "BusinessTransactionDocumentParty" 42120D, and there is zero or one 42118D VendorParty entity 42114D for each Party package 42148C. The CarrierParty entity 42122D is of the type "BusinessTransactionDocumentParty" 42128D, and there is zero or one 42126D CarrierParty entity 42122D for each Party package 42148C.

The BuyerParty entity 42190C contains the same elements 42192C at the fifth level 42110 as found in the fourth level 42108 for the BuyerParty entity 42188. The SellerParty entity 42198C contains the same elements 42100D at the fifth level 42110 as found in the fourth level 42108 for the BuyerParty entity 42188. ProductRecipientParty entity 42106D contains the same elements 42108D at the fifth level 42110 as found in the fourth level 42108 for the BuyerParty entity 42188. VendorParty entity 42114D contains the same elements 42116D at the fifth level 42110 as found in the fourth level 42108 for the BuyerParty entity 42188. CarrierParty entity 42122D contains the same elements 42124D at the fourth level 42108 as found for the BuyerParty entity 42188.

The Location package 42150C includes a ShipToLocation entity 42130D and a ShipFromLocation entity 42138D. The ShipToLocation entity 42130D is of a type "BusinessTransactionDocumentLocation" 42136D, and there is one or zero 42134D ShipToLocation 42130D for each Location package 42150C. The ShipFromLocation entity 42138D is of a type "BusinessTransactionDocumentLocation" 42144D, and there is one 42142D ShipFromLocation entity 42138D for each Location package 42150C.

The ShipToLocation entity 42130D contains the same elements 42132D at the fifth level 42110 as found in the fourth level 42108 for the ShipToLocation entity 42156A. The ShipFromLocation entity 42138D contains the same elements 42140D at the fifth level 42110 as found in the fourth level 42108 for the ShipFromLocation entity 42174A.

The DeliveryInformation package 42152C includes a DeliveryTerms entity 42146D and a DeliveryControl entity 42192D. There is one or zero 42148D DeliveryTerms entity 42146D for each DeliveryInformation package 42152C and is of type DeliveryTerms 42150D. The DeliveryTerms entity 42146D includes a DeliveryItemGroupID entity 42152D which is of type BusinessTransactionDocumentItemGroupID 42156D and there is one or zero occurrences 42154D. The DeliveryTerms entity 42146D includes a DeliveryPriorityCode 42158D which has one or zero occurrences 42154D and a data type of BusinessTransactionPriorityCode 42162D. The DeliveryTerms entity 42146D includes an Incoterms 42164D which has one or zero occurrences 42166D and a data type of Incoterms 42168D. The DeliveryTerms entity 42146D includes a PartialDelivery 42170D which has one or zero occurrences 42172D and a data type of PartialDelivery 42174D. The DeliveryTemms entity 42146D includes a QuantityTolerance 42176D which has one or zero occurrences 42178D and a data type of QuantityTolerance 42180D. The DeliveryTerms entity 42146D includes a Transport 42182D which has one or zero occurrences 42184D. The DeliveryTerms entity 42146D includes a Description 42186D which has one or zero occurrences 42188D and a data type of Description 42190D.

There is one or zero 42194D DeliveryControl entity 42192D for each DeliveryInformation package 52C. The DeliveryControl entity 42192D includes a DeliveryBlocked 42196D which is of type BusinessTransactionBlockedIndicator 42100E and there is one or zero occurrences 42198D.

The Attachment package 42154C includes an AttachmentWebAddress entity 42102E. The AttachmentWebAddress entity 42102E is of the type "WebAddress" 42106E, and there is any number 42104E of AttachmentWebAddress entities 42102E for each Attachment package 42154C.

The Description package 42156C includes an InternalDescription entity 42108E and a Description entity 42114E. The InternalDescription entity 42142008E is of type Description 42112E. There is one or zero 42110E of InternalDescription entities 42108E. The Description entity 42114E is of a type "Description" 42118E, and there is any number 42116E of Description entities 42114E for each Description package 42156C.

The ScheduleLine package 42158C includes a ScheduleLine entity 42120E having an ID 42126E, ActionCode 42132E, Quantity 42138E, and DeliveryPeriod 42144E. The ScheduleLine entity 42120E has one or more occurrences 42122E and a data type DeliveryExecutionRequestItemScheduleLine 42124E. The ID 42126E has one occurrence 42128E with a data type of ScheduleLineID 42138E. The ActionCode 42132E has one or zero occurrences 42134E with a data type of ActionCode 42136E. The Quantity 42138E has one occurrence 42140E with a data type of Quantity 42142E. The DeliveryPeriod 42144E has one or zero occurrences 42146E with a data type of DateTimePeriod 42148E.

The ScheduleLine package 42158C includes a ConfirrnedScheduleLine entity 42150E having an ID 42156E, ActionCode 42162E, Quantity 42168E, and DeliveryPeriod 42174E. The ConfirmedScheduleLine entity 42150E has zero or more occurrences 42152E and a data type DeliveryExecutionRequestItemScheduleLine 42154E. The ID 42156E has one occurrence 42158E with a data type of ScheduleLineID 42160E. The ActionCode 42162E has one or zero occurrences 42164E with a data type of ActionCode 42166E. The Quantity 42168E has one occurrence 42170E with a data type of Quantity 42172E. The DeliveryPeriod 42174E has one or zero occurrences 42176E with a data type of DateTimePeriod 42178E.

t) Delivery Schedule Interface

The DeliveryScheduleNotification message—a "delivery schedule" is also referred to as a "release"—is a tool that enables a buyer (sold-to party) to send a vendor details of his or her product requirements for deliveries in the short term and/or medium to long term. The liability of the deliveries can vary—from a binding purchase order, through authorization for production and/or material procurement release, to a forecast that is not binding. The delivery schedule refers to a scheduling agreement, that is, an outline agreement between the customer and vendor that sets out the conditions for purchase orders and deliveries. The vendor uses the DeliveryScheduleConfirmation message to confirm or reject the fulfillment of the product requirement transmitted in the delivery schedule for deliveries in the short term and/or medium to long term.

A Release Processing business scenario describes how a manufacturer's purchase orders are handled using delivery schedules. In this scenario, the manufacturer publishes the relevant delivery schedule on the "Inventory Collaboration Hub" for the vendor (supplier), who can view it over the Internet and can confirm it using the DeliveryScheduleConfirmation message. The vendor then uses the "DespatchedDeliveryNotification" to announce a delivery that is based on the entire delivery schedule or one or more items in it. After the goods have been received, the manufacturer can use the "ReceivedDeliveryNotification" message to confirm receipt of the delivery to the vendor.

(1) Message Type

A DeliveryScheduleNotification is the notification from a buyer to a vendor to notify the latter about the quantity of a product from a scheduling agreement item that is to be delivered with a certain liability on a certain date in accordance. The structure of the message type DeliveryScheduleNotification is specified in the message data type DeliveryScheduleNotificationMessage. The legal liability for the deliveries is specified by the ScheduleLineComittmentCode at schedule line level in the message. Methods and systems consistent with the subject matter herein use the package template for a BusinessTransactionDocument for an SCM Master Data depicted in FIG. 270B to derive the DeliverySchedule interface.

A DeliveryScheduleConfirmation is the confirmation from a vendor to a buyer about what quantity of a product from a scheduling agreement item is to be delivered and at what time. Changes to the delivery liability defined by the buyer are not permitted. The structure of the message type DeliveryScheduleConfirmation is specified in the message data type DeliveryScheduleConfirmationMessage.

(2) Message Choreography

FIG. 422 depicts the message choreography for an exemplary DeliveryScheduleNotification process. The choreography involves two business entities: a buyer (e.g., a manufacturer) 42202 and a vendor (e.g., a supplier) 42204. The buyer 42202 uses a delivery schedule (e.g., DeliveryScheduleNotification message 42206) to notify the vendor 42204 about the buyer's 42202 replenishment requirements. The vendor 42204 then has the option to send a purchase order confirmation (DeliveryScheduleConfirmation). The vendor then uses an advanced shipping notification (e.g. DespatchedDeliveryNotification message 42208) to announce a delivery that is based on one or more scheduling agreement items. When the goods are received, the buyer 42202 may confirm receipt of the announced delivery to the vendor via ReceivedDeliveryNotification message 42210.

(3) Message Data Type Delivery Schedule Message

The data model for the message data type DeliveryScheduleMessage depicted in FIG. 423 is used to implement a DeliveryScheduleNotification message 42206 and a DeliveryScheduleConfirmation message. The message data type DeliveryScheduleMessage groups the business information that is relevant for sending a business document in a message and the DeliverySchedule object in the business document. The message data type DeliveryScheduleMessage includes a DeliveryScheduleMessage package 42300. The DeliveryScheduleMessage 42300 includes a MessageHeader Package 42302, a DeliverySchedule Package 42304 and a DeliveryScheduleMessage entity 42306. The message data type DeliveryScheduleMessage defines a template for the Deliver (a) Message Header Package The MessageHeader package 42302 groups the business information that is relevant for sending a business document in a message. The MessageHeader package 42302 includes a MessageHeader entity 42308. There is a 1:c relationship 42310 between the DeliveryScheduleMessage entity 42306 and the MessageHeader entity 42308.

(i) Message Header

A MessageHeader package 42302 groups the business information from the perspective of the sending application to identify the business document in a message, information about the sender, and information about the recipient. The MessageHeader entity 42308 includes a SenderParty entity 42312 and a RecipientParty entity 42314. There is a respective 1:c relationship 42216 or 42218 between the MessageHeader entity 42208 and each of the SenderParty entity 42308 and a RecipientParty entity 42310. The MessageHeader entity 42308 is of type GDT: BusinessDocumentMessageHeader. The MessageHeader entity 42308 includes an ID and a CreationDateTime. The ID is identification of the business document in the message. The CreationDateTime is the creation date of the business document in the message.

(ii) Sender Party

The SenderParty entity 42312 is the party responsible for sending a business document at the business application level. The SenderParty entity 42313 is of type GDT: BusinessDocumentMessageHeaderParty.

(iii) Recipient Party

The RecipientParty entity 42304 is the party responsible for receiving a business document at the business application level. The RecipientParty entity 42314 is of type GDT: BusinessDocumentMessageHeaderParty.

(b) Delivery Schedule Package

The DeliverySchedule package 42304 summarizes data that describes the delivery dates, products, quantities, and delivery locations. The DeliverySchedule package 42304 includes a DeliverySchedule entity 42324, a Party package 42320, and a DeliveryScheduleItem package 42322.

(i) Delivery Schedule

The DeliverySchedule entity 42324 is a tool that is used by a customer to notify a vendor about the quantity of a material from a scheduling agreement item that is to be delivered and at what time. The DeliverySchedule entity 42324 includes an ID, a TypeCode, a CreationDateTime, and a Note. The ID is a unique identifier for the delivery schedule, and is of type GDT: BusinessTransactionDocumentID. The TypeCode is the coded representation of the type of a delivery schedule, and is of type GDT: DeliveryScheduleTypeCode. The CreationDateTime is the creation time of the delivery schedule, and is of type GDT: DateTime. The Note is a note for the delivery schedule, and is of type GDT: Note. There is a 1:1 relationship 42326 between the DeliveryScheduleMessage entity 42306 and the DeliverySchedule 42324.

(ii) Delivery Schedule Party Package

The Delivery Schedule Party Package 42320 is the grouping of the business partners that may be relevant within the delivery schedule. The Delivery Schedule Party Package 42320 includes a BuyerParty entity 42328, a VendorParty entity 42330 and a BillToParty entity 42331. There is a 1:1 relationship between the DeliverySchedule entity 42324 and the BuyerParty entity 42328. There is a 1:c relationship 42334 between the DeliverySchedule entity 42324 and the VendorParty entity 42330. There is a 1:1 relationship 42335 between the DeliverySchedule entity 42324 and the BillToParty entity 42331. In one implementation, the BillToParty, the Address and ContactPerson are not used in the DeliveryScheduleConfirmationMessage.

(a) Buyer Party

The BuyerParty entity 42328 is a party that buys goods or services. The BuyerParty entity 42328 is of type GDT: BusinessTransactionDocumentParty, where the InternalID, the StandardID, the BuyerID, the VendorID Address and several Contact Persons are used. For intra-enterprise communication, the InternalID is used for party entities. For intra-enterprise communication, party entities are used for either the StandardID or the partner-role-specific ID of the receiving partner, in other words, the BuyerID is used for Supplier Collaboration scenarios, and the BuyerID is used for Customer Collaboration scenarios. Due to the different possibilities for ID use, ID elements of the particular Party are optional. In one implementation, the address of the BuyerParty entity 42328 may not be intended to be used as the delivery address. In this implementation, the ShipToLocation is provided for this purpose.

(b) Vendor Party

VendorParty entity 42330 is the company or the person to deliver the goods described in the delivery schedule. VendorParty entity 42330 is of type GDT: BusinessTransactionDocumentParty, where the InternalID, the StandardID, the BuyerID, the VendorID, Address and several Contact Persons are used.

(c) BillToParty

BillToParty is the company or the person to be sent the invoice for the goods ordered in the delivery schedule. The BillToParty entity 42331 is of type GDT: BusinessTransactionDocumentParty, whereby the InternalID, the StandardId, the BuyerID, the VendorID, and Address are used.

(iii) Delivery Schedule Item Package

The DeliveryScheduleItem package 42322 groups a DeliveryScheduleItem or Item entity 42348 with its packages. The DeliveryScheduleItem package 42322 includes a BusinessTransactionDocumentReference package 42336, a Release package 42338, a Party Package 42339 a Location Package 42340, a ProductInformation Package 42342, a DeliveryInformation Package 42344, and a ScheduleLine Package 42346.

(a) Delivery Schedule Item

The DeliveryScheduleItem entity 42348 is a statement regarding the requirement for a specific product at a ship-to location with reference to a scheduling agreement. There is a 1:cn relationship 42350 between DeliverySchedule entity 42324 and the DeliveryScheduleItem entity 42348. The DeliveryScheduleItem entity 42348 has the attribute actionCode, of type GDT: ActionCode, which is a coded representation of an instruction to the message receipient as to how he or she should process the message item. DeliveryScheduleItem entity 42348 also includes an ID, a KanbanCardID, a ProductionAuthorizationPeriod, a PurchasingAuthorizationPeriod and a Note. The ID is the sequential number for the item in the DeliverySchedule document, and is of type GDT: BusinessTransactionDocumentItemID. The KanbanCardID is a unique identifier for a replenishment or production signal that is sent from a consumer to a supplier. It has a type of GDT: KanbanCardID. The ProductionAuthorizationPeriod is a Period in which the supplier is legally authorized by the buyer to product the finished products to be delivered. It has a type of GDT: DateTimePeriod. The PurchasingAuthorizationPeriod is a Period in which the supplier is legally authorized by the buyer to purchase the primary materials that are needed to produce the finished products to e delivered. It has a type of GDT: DateTimePeriod. The Note is a note for the item in the DeliverySchedule, and is of type GDT: Note. In one implementation, the KanbanID, the ProductionAuthorizationPeriod and the PurchasingAuthorizationPeriod is not used in the DeliveryScheduleConfirmationMessage.

(b) Delivery Schedule Item Business Transaction Document Reference Package

The DeliveryScheduleItem BusinessTransactionDocumentReference package 42336 groups references to business documents that are relevant for the DeliveryScheduleNotification message 42206. The DeliveryScheduleItemBusinessTransactionDocumentReference package 42336 includes a SchedulingAgreementReference entity 42356. There is a 1:1 relationship 42358 between the DeliveryScheduleItem entity 42348 and the SchedulingAgreementReference entity 42356. The SchedulingAgreementReference entity 42356 is the reference to an item in a scheduling agreement. SchedulingAgreementReference entity 42356 is of type GDT: BusinessTransactionDocumentReference and should contain both the scheduling agreement item and an ItemID.

(c) Release Package

The DeliveryScheduleItemRelease package 42338 groups the information about releases that are relevant for the DeliveryScheduleNotification message 42206. The DeliveryScheduleItemRelease package 42338 includes a Release entity 42360 and a PreviousRelease entity 42362. There is a 1:1 relationship 42364 between the DeliveryScheduleItem entity 42348 and the Release entity 42360 and a 1:1 relationship 42366 between the PreviousRelease entity 42362 and the DeliveryScheduleItem entity 42348. In one implementation, the PreviousRelease is not used in the DeliveryScheduleConfirmationMessage.

(i) Delivery Schedule Item Release

The Release entity 42360 is a statement about the identification and validity of a release instance transferred in a delivery schedule item. The Release entity 42360 includes an ID, a CreationDateTime, and a HorizonDateTime. The ID is an identifier for the release instance transferred in the delivery schedule item. The ReleaseID is valid across messages and is assigned for a release period, such as a fiscal year or quarter. The ReleaseID, therefore, does not identify a scheduling agreement item. The ID is of type GDT: BusinessTransactionDocumentID. The CreationDateTime is the creation date and time of the release instance, and is of type GDT: DateTime. The HorizonDateTime is the release horizon, that is, the end date of the release period, and is of type GDT: DateTime.

(ii) Previous Release

The PreviousRelease entity 42362 is a statement about the identification and validity of the last release instance previously transferred in a delivery schedule. The PreviousRelease entity 42362 includes an ID and a CreationDateTime. The ID is a unique identifier of the PreviousRelease entity 42362, and is of type GDT: BusinessTransactionDocumentID. The CreationDateTime is the Creation date and time of the PreviousRelease entity 42362, and is of type GDT: DateTime.

(d) Delivery Schedule Item Party Package

The Party Package 42339 is a grouping of the business partners that may be relevant within the delivery schedule. It contains the BuyerParty entity 42392 and the ProductRecipientParty entity 43294. A BuyerParty entity 42392 is a party that buys goods or services. The BuyerParty entity 42392 is type GDT: BusinessTransactionDocumentParty, whereby the InternalID, the StandardID, the BuyerID, the VendorID, and Address are used. For intra-enterprise communication, use the InternalID for party entities. For intra-enterprise communication, use for party entities either the StandardID or the partner-role-specific ID of the receiving partner; in other words, use the BuyerID for Supplier Collaboration scenarios, and use the VendorID for Customer Collaboration scenarios. Due to different possibilities for ID use, ID elements of the particular party are optional. In the case of BuyerParty, a default logic may exist at header level for the items. This means that the buyerParty specified at header level is valid for items as long as the information specified at item level does not contradict this. The ProductRecipientParty entity 43294 is the company or person who receives the goods delivery. The ProductRecipientParty entity 43294 is of type GDT: BusinessTransactionDocumentParty, whereby the InternalID, the StandardID, the BuyerID, the VendorID, and Address are used. For intra-enterprise communication (with common master data), use InternalID for party entities. For intra-enterprise communication (with business-partner-specific master data), use the StandardID or the partner-role-specific ID of the receiving partner for party entities; in other words, use the Buyerld for Supplier Collaboration scenarios, and use the VendorID for Customer Collaboration scenarios. Due to different possibilities for ID use, ID elements of the particular "Party" are optional. There is a 1:c relationship 42376 between the BuyerParty entity 42392 and the DeliveryScheduleItem entity 42348. There is a 1:1 relationship 42378 between ProductRecipientParty entity 43294 and the DeliveryScheduleItem entity 42348.

(e) Location Package

The Location Package 42340 is a grouping of the locations that may be relevant within the delivery schedule. The Location package 42340 includes a ShipFromLocation entity 42368, a TransshipmentLocation entity 42370, and a ShipToLocation entity 42372. There is a 1:c relationship 42374 between the DeliveryScheduleItem entity 42348 and the ShipFromLocation entity 42368. There is a 1:c relationship 42376 between the DeliveryScheduleItem entity 42348 and the TransshipmentLocation entity 42370. There is a 1:1 relationship 42378 between the DeliveryScheduleItem entity 42348 and the ShipToLocation entity 42372. For communication within an enterprise, the InternalID is used for location entities. For enterprisewide communication, location entities are used for either the StandardID or the partner-role-specific ID of the receiving partner. In other words, for Supplier Collaboration scenarios the BuyerID is used, and for Customer Collaboration scenarios, the VendorID is used. Due to the different possibilities for ID use, the ID elements of the particular location are optional.

(i) Ship From Location

ShipFromLocation entity 42368 is the place from where the ordered products are delivered. ShipFromLocation entity 42368 is of type GDT: BusinessTransactionDocument-ShipFromLocation, where the InternalID, StandardID, BuyerID, VendorID, and LoadingLocation and Address are used. For intra-enterprise communication, use the InternalID for location entities. For inter-enterprise communication, use for location entities the StandardID or the partner-role-specific ID of the sending or receiving partner; in other words, the BuyerID or VendorID. Due to different poeeibilities for ID use, the ID elements of each location are optional.

(ii) Transshipment Location

TransshipmentLocation entity 42370 is the location at which the ordered products are transshipped on their way to the product receipient. TransshipmentLocation entity 42370 is of type GDT: BusinessTransactionDocumentTransshipmentLocation, where the InternalID, StandardID, BuyerID, VendorID, and Address are used.

(iii) Ship To Location

ShipToLocation entity 42372 is the place to which the ordered products are delivered. ShipToLocation entity 42372 is of type GDT: BusinessTransactionDocument-ShipToLocation, where the InternalID, StandardID, BuyerID, VendorID, and UnloadingLocation and Address are used.

(f) Delivery Schedule Product Information Package

The DeliveryScheduleProductInformation package 42342 is a summary of the information that characterizes the product to be delivered in greater detail. The ProductInformation package 42342 includes a Product entity 42380. There is a 1:1 relationship 42382 between the DeliveryScheduleItem entity 42348 and the product entity 42380. The Product entity 42380 is either a tangible or intangible good that is a part of the business activities of a company. The Product entity 42380 may be traded and contributes directly or indirectly to value added. The Product entity 42380 is of type GDT: BusinessTransactionDocumentProduct, where the InternalID, the StandardID, the BuyerID, and the VendorID are used. For intra-enterprise communication, the InternalID is used for product entities. For inter-enterprise communication, product entities are used for either the StandardID or the partner-role-specific ID of the sending or the receiving partner; in other words, the BuyerID or the VendorID. Due to the different possibilities for ID use, ID elements of each particular product are optional.

(g) Delivery Schedule Item Delivery Information Package

The DeliveryInformation package 42344 summarizes the information about the delivery schedule item. The DeliveryInformation package 42344 includes a PreviousDelivery entity 42384 and a CumulativeDelivery entity 42386. There is a respective 1:c relationship 42388 or 42390 between the DeliveryScheduleItem entity 42348 and each of the PreviousDelivery entity 42384 and the CumulativeDelivery entity 42386. In one implementation, the PreviousDelivery and CumulativeDelivery are not used in the DeliveryScheduleConfirmationMessage.

(i) Previous Delivery

PreviousDelivery entity 42384 includes data about the physical delivery that was last received. PreviousDelivery entity 42384 include an ID, a ReceivedQuantity, and a ReceiptDateTime. The ID is an identifier of the delivery, and is of type GDT: BusinessTransactionDocumentID. The ReceivedQuantity is the quantity received, and is of type GDT: Quantity. The ReceiptDateTime is the time at which the delivery was received, and is of type GDT: DateTime.

(ii) Cumulative Delivery

CumulativeDelivery entity 42386 includes the cumulated quantities of the deliveries for a product in the specified validity period. CumulativeDelivery entity 42386 includes a ValidityPeriod, a ShippedQuantity a ReceivedQuantity, a ReconciliationDateTime, and a ReconciliationQuantity. The ValidityPeriod is the validity period for the cumulated delivery quantities, and is of type GDT: DateTimePeriod. The ShippedQuantity is a Cumulated shipped delivery quantity in the specified validity period. This quantity is also referred to as the cumulative issued quantity. If the validity period is not specified, the cumulated quantity refers to the period in the referenced scheduling agreement item or to the current fiscal year. It is of type GDT: Quantity. The ReceivedQuantity is the cumulated received delivery quantity in the specified validity period. This quantity is also referred to as the cumulative received quantity. If a validity period is not specified, the cumulated quantity refers to the period in the referenced scheduling agreement item or to the current fiscal year, and is of type GDT: Quantity. The ReconciliationDateTime is the date and time when the cumulative received quantity is reset or set to zero. This date is also referred to as the reconciliation date. If the ReconciliationDateTime is not specified, the agreed cumulative quantity refers to the closing date/time of the fiscal year as specified in the referenced scheduling agreement item. ReconciliationDateTime is of type GDT: DateTime. The ReconciliationQuantity is the cumulated received quantity at the end of a delivery period in accordance with the date/time specified in ReconciliationDateTime. This quantity (also referred to as the agreed cumulative quantity) is used for information purposes and to provide legally binding synchronization for the delivery quantities, that is, the goods receipts of the buyer party and the goods issues of the vendor. ReconciliationQuantity is of type GDT: Quantity.

(h) Delivery Schedule Item Schedule Line Package

The DeliveryScheduleItemScheduleLine package 42346 is a collection of one or more schedule lines for a delivery schedule item. The DeliveryScheduleItemScheduleLine package 42346 includes a DeliveryScheduleItemScheduleLine entity 42352 and a DeliveryScheduleItemConfirmedScheduleLine 42353. There is a 1:cn relationship 42354 between the DeliveryScheduleItem entity 42348 and the DeliveryScheduleItemScheduleLine entity 42352.

The DeliveryScheduleItemScheduleLine entity 42352 is a statement about the quantity of a product to be delivered with a certain liability within a certain period of time. DeliveryScheduleItemScheduleLine entity 42352 includes a CommittmentCode, a ProductChangeID, a DeliveryPeriod, a PickupPeriod, a Quantity, and a note. The CommittmentCode is the coded representation that describes the planning significance of the schedule line information and thus also specifies the (legal) liability with respect to the ordered quantities and specified delivery dates for a product. CommittmentCode is of type GDT: ScheduleLineCommittmentCode. The ProductChangeID is an identifier of a change to a product that does not affect its features observed by a user. Since the ProductChangeID can vary between the different delivery dates, it is specified at schedule line level. ProductChangeID is of type GDT: ProductChangeID. The DeliveryPeriod is the period in which the product is to be delivered, and is of type GDT: DateTimePeriod. The PickupPeriod is the period in which a product can or should be picked up from the vendor (for pickup scenarios), and is of type GDT: DateTimePeriod. The Quantity is the quantity of a product to be delivered or picked up, and is of type GDT: Quantity. The Note is a note for the schedule line in the DeliveryScheduled document, and is of type GDT: Note. In one implementation, the ScheduleLine is not required in the DeliveryScheduleConfirmationMessage.

(i) Delivery Schedule Item Confirmed Schedule Line

ConfirmedScheduleLine is a confirmation from the vendor as to which quantity of a product from a scheduling agreement item is delivered within what time period. The DeliveryScheduleItemConfirmedScheduleLine entity contains a DeliveryPeriod, PickupPeriod and Quantity. The DeliveryPeriod is a period in which the product is to be delivered, and is of type GDT: DateTimePeriod. PickupPeriod is a period in which a product can or should be picked up from the vendor (for pickup scenarios), and is of type GDT: DateTimePeriod. The Quantity is a quantity of a product to be delivered or picked up, and is of type GDT: Quantity. In one implementation, the ConfirmedScheduleLine is not required in the DeliveryScheduleNotificationMessage. The ConfirmedscheduleLine can contain different quantity and time values to the original schedule line.

(4) Element Structure of Delivery Schedule Message

FIGS. 424A-U depicts the element structure for DeliveryScheduleMessage. The element structure is similar to the data model, but provides additional information regarding the details of the interface. The element structure identifies the different packages 42400 in the interface, and represents the entities at various levels within the interface. As depicted in FIG. 424A, the interface for DeliveryScheduleMessage includes six levels 42402, 42404, 42406, 42408, 42410, and 42412. The element structure identifies the occurrence or cardinality 42414 between the entities of the interface, and provides data type information (i.e., G/CDT type 42416) regarding the data type that provides the basis for the entity. The outermost package of this interface is a DeliveryScheduleMessage package 42424, which includes a DeliveryScheduleNotificationMessage entity 42422 at the first level 42402. The DeliveryScheduleNotificationMessage entity 42422 is of type "DeliveryScheduleMessage" 42428.

The DeliveryScheduleMessage package 42424 includes a MessageHeader package 42432 and a DeliverySchedule package 42434. The MessageHeader package 42432 includes a MessageHeader entity 42436, which is of type generic data type "BusinessDocumentMessageHeader" 42440. There is one 42438 MessageHeader entity 42436 for each DeliveryScheduleMessage entity 42426.

The MessageHeader entity 42436 includes an ID 42446, a Reference ID 42456, and a CreationDateTime 42466. The ID 42446 is of type BusinessDocumentMessageID 42450. The CreationDateTime 42466 is of type DateTime 42470. There is one 42448 ID 42446 for each MessageHeader entity 42436, and one 42468 CreationDateTime 42466 for each MessageHeader entity 42436.

The MessageHeader entity 42436 also includes a SenderParty entity 42474 and a RecipientParty entity 42400A. The SenderParty entity 42474 is of type BusinessDocumentMessageHeaderParty 42478. The RecipientParty entity 42400A is also of type BusinessDocumentMessageHeaderParty 42404A. There is one or zero 42476 SenderParty entity 42474 for each MessageHeader entity 42436, and there is one or zero 42402A RecipientParty entity 42400A for each MessageHeader entity 42436.

The SenderParty entity 42474 includes an InternalID 42484 and a StandardID 42492. The InternalID 42484 has zero or one occurrences 42486 for each SenderParty entity 42474 and a data type of PartyInternalID 42488. The StandardID 42492 has zero or n occurrences 42494 for each SenderParty entity 42474 and a data type of PartyStandardID 42496. The RecipientParty entity 42400A includes an InternalID 42410A and a StandardID 42418A. The InternalID 42410A has zero or one occurrences 12A for each Recipient Party 42400A and a data type of PartyInternalID 42414A. The StandardID 42418A has zero or n occurrences 42420A for each Recipient Party 42400A and a data type of PartyStandardID 42422A.

The DeliverySchedule package 42414A includes a DeliverySchedule entity 42426A, a Party package 42462A, an Item package 42464A and a Note 42486B. There is one or zero 42488B Note, and the Note 42486B is of type Note 42490B. There is one 42428A DeliverySchedule entity 42426A for each DeliveryScheduleNotificationMessage entity 42426. The DeliverySchedule entity 42426A includes an ID 42434A, a TypeCode 42444A, and a CreationDateTime 42454A. There is one or zero 42436A ID 42434A for each DeliverySchedule entity 42426A. The ID 42434A is of type BusinessTransactionDocumentID 42438A. The TypeCode 42444A has zero or one 42446A occurrences for each DeliverySchedule entity 42426A and is of type DeliveryScheduleTypeCode 42448AA. A CreationDateTime 42454A has one occurrence 42456A for each DeliverySchedule entity 42426A and is of type DateTime 42458A.

The Party package 42462A includes a BuyerParty entity 42466A and a VendorParty entity 42426B. The BuyerParty 42466A is of type BusinessTransactionDocumentParty 42466A. There is one or zero 42468A BuyerParty entity 42466A for each DeliverySchedule entity 42426A. The VendorParty entity 42426B is of type BusinessTransactionDocumentParty 42430B. There is one 42428B VendorParty entity 42426B for each DeliverySchedule entity 42426A.

The BuyerParty entity 42466A includes an InternalID 42476A, a StandardID 42486A, a BuyerID 42496A, a VendorID 42406B, an Address 42416B, and a ContactPerson 42480H. The InternalID 42476A has zero or one occurrences 42478A for the BuyerParty entity 42466A and a data type of PartyInternalID 42480A. The StandardID 42486A has zero or n occurrences 42488A for the BuyerParty entity 42466A and a data type of PartyStandardID 42490A. The BuyerID 42496A has zero or one occurrences 42498A for the BuyerParty entity 42466A and a data type of PartyPartyID 42400B. The VendorID 42406B has zero or one occurrences 42408B for the BuyerParty entity 42466A and a data type of PartyPartyID 42410B. The Address 42416B has zero or one occurrences 42418B for each BuyerParty entity 42466A and a data type of Address 42420B. The ContactPerson 42480H has zero to n occurrences 42482H for the BuyerParty entity 42466A and a data type of ContactPerson 42484H. The ContactPerson 42480H includes an InternalID 42486H, a BuyerID 42492H, a VendorID 42498H and an Address 42404I. The InternalID 42486H has zero or one occurrences 42488H for the ContactPerson 42480H and a data type of ContactPersonInternalID 42490H. The BuyerID 42492H has zero or one occurrences 42494H for the ContactPerson 42480H and a data type of ContactPersonPartyID 42496H. The VendorID 42498H has zero or one occurrences 42400I for the ContactPerson 42480H and a data type of ContactPersoPartyID 42402I. The Address 42404I has zero or one occurrences 42406I for the ContactPerson 42480H and a data type of Address 42408I.

The VendorParty entity 42426B includes an InternalID 42436B, a StandardID 42446B, a BuyerID 42456B, a VendorID 42466B, an Address 42476B, and a ContactPerson 42410I. The InternalID 42436B has zero or one occurrences 42438B for the VendorParty entity 42426B and a data type of PartyInternalID 42440B. The StandardID 42446B has zero or n occurrences 42448B for the VendorParty entity 42426B and a data type of PartyStandardID 42450B. The BuyerID 42456B has zero or one occurrences 42458B for the VendorParty entity 42426B and a data type of PartyPartyID 42460B. The VendorID 42466B has zero or one occurrences 42468B for the VendorParty entity 42426B and a data type of PartyPartyID 42470B. The Address 42476B has zero or one occurrences 42478B for the VendorParty entity 42426B and a data type of Address 42480B. The ContactPerson 42410I has zero to n occurrences 42412I for the BuyerParty entity 42466A and a data type of ContactPerson 42414I. The ContactPerson 42410I includes an InternalID 42416I, a BuyerID 42422I, a VendorID 42428I and an Address 42434I. The InternalID 42416I has zero or one occurrences 42418I for the ContactPerson 42420I and a data type of ContactPersonInternalID 42420I. The BuyerID 42422I has zero or one occurrences 42424I for the ContactPerson 42480H and a data type of ContactPersoPartyID 42426I. The VendorID 42428I has zero or one occurrences 42430I for the ContactPerson 42480H and a data type of ContactPersonPartyID 42432I. The Address 42434I has zero or one occurrences 42036I for the ContactPerson 42480H and a data type of Address 42438I.

The BillToParty entity 42440I includes an InternalID 42446I, a StandardID 42454I, a BuyerID 42462I, a VendorID 42470I, and an Address 42478I. The InternalID 42446I has zero or one occurrences 42448I for the BillToParty entity 42440I and a data type of PartyInternalID 42450I. The StandardID 42454I has zero or n occurrences 42456I for the BillToParty entity 42440I and a data type of PartyStandardID 42458I. The BuyerID 42462I has zero or one occurrences 42464I for the BillToParty entity 42440I and a data type of PartyPartyID 42466I. The VendorID 42470I has zero or one occurrences 42472I for the BillToParty entity 42440I and a data type of PartyPartyID 42474I. The Address 42478I has zero or one occurrences 42480I for the BillToParty entity 42440I and a data type of Address 42482I.

The Item package 42464A includes an Item entity 42496B. There is one or more 42498B Item entities 42496B for each DeliverySchedule entity 42426A. The Item entity 42496B is of type DeliveryScheduleItem 42400C. The Item entity 42496B includes a @actionCode 42404C, and an ID 42414C. The @actionCode 42404C is of type ActionCode 42404C, and there is one or zero 42406C @actionCode 42404C for each Item entity 42496B. The ID 42414C is of type BusinessTransactionDocumentItemID 42418C, and there is one 42416C ID 42414C for each Item entity 42496B.

The Item package 42464A also includes a Note entity 42468H, a KanBanCardID entity 42474J, a ProductAuthorizationPeriod entity 42482J, and a PurchasingAuthorizationPeriod 42488J. The Note entity 42468H is of data type Note 42472H. There is zero or one 42470H Note entity 42468H for each Item entity 42496B. The KanBanCardID entity 42474J is of data type KanBanCardID 42478J. There is zero or one 42476J KanBanCardID entity 42474J for each Item entity 42496B. The ProductAuthorizationPeriod entity 42482J is of data type DateTimePeriod 42486J. There is zero or one 42484J ProductAuthorizationPeriod entity 42482J for each Item entity 42496B. The PurchasingAuthorizationPeriod 42488J is of data type DateTimePeriod 42492J. There is zero or one 42490J PurchasingAuthorizationPeriod 42488J for each Item entity 42496B.

The Item package 42464A also includes a BusinessTransactionDocumentReference package 42424C, a Release package 42426C, a Location package 28C, a ProductInformation package 42430C, a DeliveryInformation package 42432C, a ScheduleLine package 42434C and a PartyPackage 42472J.

The BusinessTransactionDocumentReference package 42424C includes a SchedulingAgreementReference entity 42436C of type BusinessTransactionDocumentReference 42440C. There is one 42438C SchedulingAgreementReference entity 42436C for each Item entity 42496B.

The PartyPackage 42472J includes a BuyerParty entity 42484I, and a ProductRecipientParty entity 42428J. There is zero to one 42486I BuyerParty entity 42484I for each Item entity 42496B. The BuyerParty entity 42484I is of type BusinessTransactionDocumentParty 42488I. The BuyerParty entity 42484I includes an InternalID 42490I, a StandardID 42498I, a BuyerID 42406J, a VendorID 42414J, and an Address 42422J. The InternalID 42490I has zero or one occurrences 42492I for the BuyerParty entity 42484I and a data type of PartyInternalID 42494I. The StandardID 42498I has zero or n occurrences 42400J for the BuyerParty entity 42484I and a data type of PartyStandardID 42402J. The BuyerID 42406J has zero or one occurrences 42408J for the BuyerParty entity 42484I and a data type of PartyPartyID 42410J. The VendorID 42414J has zero or one occurrences 42416J for the BuyerParty entity 42484I and a data type of PartyPartyID 42418J. The Address 42422J has zero or one occurrences 42424J for the BuyerParty entity 42484I and a data type of Address 42426J. There is zero to one 42430J ProductRecipientParty entity 42428J for each Item entity 42496B. The ProductRecipientParty entity 42428J is of type BusinessTransactionDocumentParty 42432J. The ProductRecipientParty entity 42428J includes an InternalID 42434J, a StandardID 42442J, a BuyerID 42450J, a VendorID 42458J, and an Address 42466J. The InternalID 42434J has zero or one occurrences 42436J for the ProductRecipientParty entity 42428J and a data type of PartyInternalID 42438J. The StandardID 42442J has zero or n occurrences 42444J for the ProductRecipientParty entity 42428J and a data type of PartyStandardID 42446J. The BuyerID 42450J has zero or one occurrences 42452J for the ProductRecipientParty entity 42428J and a data type of PartyPartyID 42454J. The VendorID 42458J has zero or one occurrences 42460J for the ProductRecipientParty entity 42428J and a data type of PartyPartyID 42462J. The Address 42466J has zero or one occurrences 42468J for the ProductRecipientParty entity 42428J and a data type of Address 42470J.

The Release package 42426C includes a Release entity 42444C, and a PreviousRelease entity 42476C. There is one 42446C Release entity 42444C for each Item entity 42496B. The Release entity 42444C includes an ID 42450C, a CreationDataTime 42460C and a HorizonDataTime 42468C. The ID 42450C is of type BusinessDocumentMessageID 42454C. The CreationDataTime 42460C is of type DateTime 42464C. The HorizonDataTime 42468C is of type DateTime 42472C. There is one 42452C ID 42450C for each Item entity 42496B, one or zero 42462C CreationDataTime 42460C for each Item entity 42496B, and one or zero 42470C HorizonDataTime 42468C for each Item entity 42496B. The PreviousRelease entity 42476C includes an ID 42482C, and a CreationDataTime 42492C. The ID 42482C is of type BusinessDocumentMessageID 42486C. The CreationDataTime 42492C is of type DateTime 42496C. There is one 42484C ID 42482C for each Item entity 42496B, and one or zero 42494C CreationDataTime 42492C for each Item entity 42496B.

The Location package 42428C includes a ShipFromLocation entity 42400D, and a TransshipmentLocation entity 42410E, and a ShipToLocation entity 42470E. The ShipFromLocation entity 42400D is of type BusinessTransaction- DocumentShipFromLocation 42404D. There is one or zero 42402D ShipFromLocation entity 42400D for each Item entity 42496B. The TransshipmentLocation entity 42410E is of type of BusinessTransactionDocumentTransshipmentLocation 42414E. There is one or zero 42412E TransshipmentLocation entity 42410E for each Item entity 42496B. The ShipToLocation entity 42470E is of type BusinessTransactionDocumentLocation 42474E. There is one 42472E ShipToLocation entity 42470E for each Item entity 42496B.

The ShipFromLocation entity 42400D includes an InternalID 42410D, a StandardID 42420D, a BuyerID 42430D, a VendorID 42440D, a LoadingLocation entity 42450D, and an Address 42400E. The InternalID 42410D has zero or one occurrences 42412D for the ShipFromLocation entity 42400D and a data type of LocationInternalID 42414D. The StandardID 42420D has zero or n occurrences 42422D for the ShipFromLocation entity 42400D and a data type of LocationStandardID 42424D. The BuyerID 42430D has zero or one occurrences 42432D and a data type of LocationPartyID 42434D. The VendorID 42440D has zero or one occurrences 42442D for the ShipFromLocation entity 42400D and a data type of LocationPartyID 42444D. The LoadingLocation entity 42450D has zero or one occurrences 42452D for the ShipFromLocation entity 42400D and a data type of BusinessTransactionDocumentLocation 42454D. The Address 42400E has one or zero occurrences 42402E for the ShipFromLocation entity 42400D and a data type of Address 42404E. The LoadingLocation entity 42450D includes an InternalID 42460D, a StandardID 42470D, a BuyerID 42480D, and a VendorID 42490D. The InternalID 42460D has zero or one occurrences 42462D for each LoadingLocation entity 42450D and a data type of LocationInternalID 42464D. The StandardID 42470D has zero or one occurrences 42472D for each LoadingLocation entity 42450D and a data type of LocationStandardID 42474D. The BuyerID 42480D has zero or one occurrences 42482D for each LoadingLocation entity 42450D and a data type of LocationPartyID 42484D. The VendorID 42490D has zero or one occurrences 42492D for each LoadingLocation entity 42450D and a data type of LocationPartyID 42494D.

The TransshipmentLocation entity 42410E includes an InternalID 42420E, a StandardID 42430E, a BuyerID 42440E, a VendorID 42450E and an Address 42460E. The InternalID 42420E has zero or one occurrences 42422E for each TransshipmentLocation entity 42410E and a data type of LocationInternalID 42424E. The StandardID 42430E has zero or n occurrences 42432E for each TransshipmentLocation entity 42410E and a data type of LocationStandardID 42434E. The BuyerID 42440E has zero or one occurrences 42442E for each TransshipmentLocation entity 42410E and a data type of LocationPartyID 42444E. The VendorID 42450E has zero or one occurrences 42452E for each TransshipmentLocation entity 42410E and a data type of LocationPartyID 42454E. The Address 42460E has one or zero occurrences 42472E for each TransshipmentLocation entity 42410E and a data type of Address 42464E.

The ShipToLocation entity 42470E includes an InternalID 42480E, a StandardID 42490E, a BuyerID 42400F, a VendorID 42410F and an Unloading Location entity 42420F. The InternalID 42480E has zero or one occurrences 42482E for each ShipToLocation entity 42470E and a data type of LocationInternalID 42484E. The StandardID 42490E has zero or n occurrences 42492E for each ShipToLocation entity 42470E and a data type of LocationStandardID 94E. The BuyerID 42400F has zero or one occurrences 42402F for each ShipToLocation entity 42470E and a data type of LocationPartyID 42404F. The VendorID 42410F has zero or one occurrences 42412F for each ShipToLocation entity 42470E and a data type of LocationPartyID 42414F. The Unloading Location entity 42420F has one or zero occurrences 42422F for each ShipToLocation entity 42470E and a data type of BusinessTransactionDocumentLocation 42424F.

The Unloading Location entity 42420F includes an InternalID 42430F of type LocationInternalID 42434F, a StandardID 42440F of type LocationStandardID 42444F, a BuyerID 42450F of type LocationPartyID 42454F, and a VendorID 42460F of type LocationPartyID 42464F. In one implementation, for each Unloading Location entity 42420F, there is zero or one 42432F InternalID 42430F, zero or n 42442F StandardIDs 42440F, zero or one 42452F BuyerID 42450F, and zero or one 42462F VendorID 42460F.

The ProductInformation package 42430C includes a Product entity 42480F of type BusinessTransactionDocumentProduct 42484F. There is one 42482F Product entity 42480F for each Item entity 42496B. The Product entity 42480F includes an InternalID 42490F of type ProductInternalID 42494F, a StandardID 42400G of type ProductStandardID 42404G, a BuyerID 42410G of type ProductPartyID 42414G, and a VendorID 42420G of type ProductPartyID 42424G. In one implementation, for each Product entity 42480F, there is zero or one 42492F InternalID 42490F, zero or one 42402G StandardIDs 42400G, zero or one 42412G BuyerID 42410G, and zero or one VendorID 42420G.

The DeliveryInformation package 42432C includes a PreviousDelivery entity 42430G and a CumulativeDelivery entity 42462G. There is one or zero 42432G PreviousDelivery entity 42430G for each Item entity 42496B. There is one or zero 42464G CumulativeDelivery entity 42462G for each Item entity 42496B.

The PreviousDelivery entity 42430G includes one 42438G ID entity 42436G of type BusinessTransactionDocumentID 42440G. The PreviousDelivery entity entity 42430G also includes one or zero 42448G ReceivedQuantity 42446G of type Quantity 42449G. The PreviousDelivery entity 42430G further includes one or zero 42456G ReceiptDateTime 42454G of type DateTime 42458G.

The CumulativeDelivery entity 42462G includes a ValidityPeriod 42468G of type DateTimePeriod 42472G, a ReceivedQuantity 42476G of type Quantity 42480G, a ReconcilliationDateTime 42486G of type DateTime 42490G, a ReconcilliationQuantity 42498G of type Quantity 42498G, and a ShippedQuantity 42484I of type Quantity 42488I. In one implementation, for each CumulativeDelivery entity 42462G, there is zero or one 42470G ValidityPeriod 42468G, zero or one 42486I ShippedQuantity 42484I, one 42478G ReceivedQuantity 42476G, zero or one 42488G ReconcilliationDateTime 42486G, and zero or one 42496G ReconcilliationQuantity 42498G.

The ScheduleLine package 42434C includes a ScheduleLine entity 42404H of type DeliveryScheduleItemLine 42408H. There is one or more 42406H ScheduleLine entities 42404H for each Item 96B. Each ScheduleLine entity 42404H includes a CommitrnentCode entity 42412H of type ScheduleLineCommitmentCode 42416H, a ProductChangeID 42422H of type ProductChangeID 42426H, a DeliveryPeriod 42432H of type DateTimePeriod 42436H, a PickUpPeriod 42440H of type DateTimePeriod 42444H, a Quantity 42448H of type Quantity 42452H, and a Note 42458H of type Note 42462H. In one implementation, for each ScheduleLine entity 42404H, there is one 42414H CommitmentCode entity 42412H, zero or one 42424H ProductChangeID 42422H, zero or one 42434H DeliveryPeriod 42432H, zero or one 42442H PickUpPeriod 42440H, one 42450H Quantity, and zero or one 42460H Note 42458H.

As depicted in FIG. 424K, the Schedule Line package 42434C includes a ConfirmedScheduleLine entity 42400K with any number 42402K of ConfirmedScheduleLine entities 42400K for a Schedule Line package 42434C. The name is DeliveryScheduleItem-ConfirmedScheduleLine 42404K. The ConfirmedScheduleLine entity 42400K includes a DeliveryPeriod entity 42406K, a PickUpPeriod entity 42412K, and a Quantity entity 42418K. The DeliveryPeriod entity 42406K has zero or one 42408K DeliveryPeriod entities 42406K for a Schedule Line package 42434C and the name is DateTimePeriod 42410K. The PickUpPeriod entity 42412K has zero or one 42414K PickUpPeriod entities 42412K for a Schedule Line package 42434C. The name is DateTimePeriod 42416K. The Quantity entity 42418K has one 42420K Quantity entity 42418K for a Schedule Line package 42434C. The name is Quantity 42422K.

(5) Element Structure of Delivery Schedule Notification Message

FIGS. 424AA-AU depict the element structure for DeliverySchedule. The element structure is similar to the data model, but provides additional information regarding the details of the interface. The element structure identifies the different packages 424A00 in the interface, and represents the entities at various levels within the interface. As depicted in FIG. 424AA, the interface for DeliverySchedule includes six levels 424A02, 424A04, 424A06, 424A08, 424A10, and 424A12. The element structure identifies the occurrence or cardinality 424A14 between the entities of the interface, and provides data type information (i.e., G/CDT type 424A16) regarding the data type that provides the basis for the entity. The outermost package of this interface is a DeliveryScheduleMessage package 424A24, which includes a DeliveryScheduleNotification entity 424A22 at the first level 424A02. The DeliveryScheduleNotification entity 424A22 is of type "DeliveryScheduleNotificationMessage" 424A28.

The DeliveryScheduleMessage package 424A26 includes a MessageHeader package 424A32 and a DeliverySchedule package 424A34. The MessageHeader package 424A32 includes a MessageHeader entity 424A36, which is of type generic data type "BusinessDocumentMessageHeader" 424A40. There is one 424A38 MessageHeader entity 424A36 for each DeliveryScheduleMessage entity 424A26.

The MessageHeader entity 424A36 includes an ID 424A46, a Reference ID 424A56, and a CreationDateTime 424A66. The ID 424A46 is of type BusinessDocumentMessageID 424A50. The CreationDateTime 424A66 is of type DateTime 424A70. There is one 424A48 ID 424A46 for each MessageHeader entity 424A36, and one 424A68 CreationDateTime 424A66 for each MessageHeader entity 424A36.

The MessageHeader entity 424A36 also includes a SenderParty entity 424A74 and a RecipientParty entity 424A00A. The SenderParty entity 424A74 is of type BusinessDocumentMessageHeaderParty 424A78. The RecipientParty entity 424A00A is also of type BusinessDocumentMessageHeaderParty 424A04A. There is one or zero 424A76 SenderParty entity 424A74 for each MessageHeader entity 424A36, and there is one or zero 424A02A RecipientParty entity 424A00A for each MessageHeader entity 424A36.

The SenderParty entity 424A74 includes an InternalID 424A84 and a StandardID 424A92. The InternalID 424A84 has zero or one occurrences 424A86 for each SenderParty entity 424A74 and a data type of PartyInternalID 424A88. The StandardID 424A92 has zero or n occurrences 424A94 for each SenderParty entity 424A74 and a data type of PartyStandardID 424A96. The RecipientParty entity 424A00A includes an InternalID 424A10A and a StandardID 424A18A. The InternalID 424A10A has zero or one occurrences 12A for each Recipient Party 424A00A and a data type of PartyInternalID 424A14A. The StandardID 424A18A has zero or n occurrences 424A20A for each Recipient Party 424A00A and a data type of PartyStandardID 424A22A.

The DeliverySchedule package 424A14A includes a DeliverySchedule entity 424A26A, a Party package 424A62A, an Item package 424A64A and a Note 424A86B. There is one or zero 424A88B Note, and the Note 424A86B is of type Note 424A90B. There is one 424A28A DeliverySchedule entity 424A26A for each DeliverySchedule package 424A14A. The DeliverySchedule entity 424A26A is of type DeliverySchedule_Notification 424A32A. The DeliverySchedule entity 424A26A includes an ID 424A34A, a TypeCode 424A44A, and a CreationDateTime 424A54A. There is one or zero 424A36A ID 424A34A for each DeliverySchedule entity 424A26A. The ID 424A34A is of type BusinessTransactionDocumentID 424A38A. The TypeCode 424A44A has zero or one 424A46A occurrences for each DeliverySchedule entity 424A26A and is of type DeliveryScheduleTypeCode 424A48AA. A CreationDateTime 424A54A has one occurrence 424A56A for each DeliverySchedule entity 424A26A and is of type DateTime 424A58A.

The Party package 424A62A includes a BuyerParty entity 424A66A and a VendorParty entity 424A26B. The BuyerParty 424A66A is of type BusinessTransactionDocumentParty 424A66A. There is one or zero 424A68A BuyerParty entity 424A66A for each DeliverySchedule entity 424A26A. The VendorParty entity 424A26B is of type BusinessTransactionDocumentParty 424A30B. There is one 424A28B VendorParty entity 424A26B for each DeliverySchedule entity 424A26A.

The BuyerParty entity 424A66A includes an InternalID 424A76A, a StandardID 424A86A, a BuyerID 424A96A, a VendorID 424A06B, and an Address 424A16B. The InternalID 424A76A has zero or one occurrences 424A78A for the BuyerParty entity 424A66A and a data type of PartyInternalID 424A80A. The StandardID 424A86A has zero or n occurrences 424A88A for the BuyerParty entity 424A66A and a data type of PartyStandardID 424A90A. The BuyerID 424A96A has zero or one occurrences 424A98A for the BuyerParty entity 424A66A and a data type of PartyPartyID 424A00B. The VendorID 424A06B has zero or one occurrences 424A08B for the BuyerParty entity 424A66A and a data type of PartyPartyID 424A10B. The Address 424A16B has zero or one occurrences 424A18B for each BuyerParty entity 424A66A and a data type of Address 424A20B.

The VendorParty entity 424A26B includes an InternalID 424A36B, a StandardID 424A46B, a BuyerID 424A56B, a VendorID 424A66B, and an Address 424A76B. The InternalID 424A3 6B has zero or one occurrences 424A3 8B for the VendorParty entity 424A26B and a data type of PartyInternalID 424A40B. The StandardID 424A46B has zero or n occurrences 424A48B for the VendorParty entity 424A26B and a data type of PartyStandardID 424A50B. The BuyerID 424A56B has zero or one occurrences 424A58B for the VendorParty entity 424A26B and a data type of PartyPartyID 424A60B. The VendorID 424A66B has zero or one occurrences 424A68B for the VendorParty entity 424A26B and a data type of PartyPartyID 424A70B. The Address 424A76B has zero or one occurrences 424A78B for the VendorParty entity 424A26B and a data type of Address 424A80B.

The Item package 424A64A includes an Item entity 424A96B. There is one or more 424A98B Item entities 424A96B for each DeliverySchedule entity 424A26A. The Item entity 424A96B is of type DeliveryScheduleItem_Notification 424A00C. The Item entity 424A96B includes a @actionCode 424A04C, and an ID 424A14C. The @actionCode 424A04C is of type ActionCode 424A04C, and there is one or zero 424A06C @actionCode 424A04C for each Item entity 424A96B. The ID 424A14C is of type BusinessTransactionDocumentItemID 424A18C, and there is one 424A16C ID 424A14C for each Item entity 424A96B.

The Item package 424A64A also includes a BusinessTransactionDocumentReference package 424A24C, a Release package 424A26C, a Location package 28C, a ProductInformation package 424A30C, a DeliveryInformation package 424A32C, a ScheduleLine package 424A34C and a Note entity 424A68H of data type Note 424A72H. There is zero or one 424A70H Note entity 424A68H for each Item entity 424A96B.

The BusinessTransactionDocumentReference package 424A24C includes a SchedulingAgreementReference entity 424A36C of type BusinessTransactionDocumentReference 424A40C. There is one 424A38C SchedulingAgreementReference entity 424A36Cfor each Item entity 424A96B.

The Release package 424A26C includes a Release entity 424A44C, and a PreviousRelease entity 424A76C. There is one 424A46C Release entity 424A44C for each Item entity 424A96B. The Release entity 424A44C includes an ID 424A50C, a CreationDataTime 424A60C and a HorizonDataTime 424A68C. The ID 424A50C is of type BusinessDocumentMessageID 424A54C. The CreationDataTime 424A60C is of type DateTime 424A64C. The HorizonDataTime 424A68C is of type DateTime 424A72C. There is one 424A52C ID 424A50C for each Item entity 424A96B, one or zero 424A62C CreationDataTime 424A60C for each Item entity 424A96B, and one or zero 424A70C HorizonDataTime 424A68C for each Item entity 424A96B. The PreviousRelease entity 424A76C includes an ID 424A82C, and a CreationDataTime 424A92C. The ID 424A82C is of type BusinessDocumentMessageID 424A86C. The CreationDataTime 424A92C is of type DateTime 424A96C. There is one 424A84C ID 424A82C for each Item entity 424A96B, and one or zero 424A94C CreationDataTime 424A92C for each Item entity 424A96B.

The Location package 424A28C includes a ShipFromLocation entity 424A00D, and a TransshipmentLocation entity 424A10E, and a ShipToLocation entity 424A70E. The ShipFromLocation entity 424A00D is of type BusinessTransactionDocumentShipFromLocation 424A04D. There is one or zero 424A02D ShipFromLocation entity 424A00D for each Item entity 424A96B. The TransshipmentLocation entity 424A10E is of type of BusinessTransactionDocumentTransshipmentLocation 424A14E. There is one or zero 424A12E TransshipmentLocation entity 424A10E for each Item entity 424A96B. The ShipToLocation entity 424A70E is of type BusinessTransactionDocumentLocation 424A74E. There is one 424A72E ShipToLocation entity 424A70E for each Item entity 424A96B.

The ShipFromLocation entity 424A00D includes an InternalID 424A10D, a StandardID 424A20D, a BuyerID 424A30D, a VendorID 424A40D, a LoadingLocation entity 424A50D, and an Address 424A00E. The InternalID 424A10D has zero or one occurrences 424A12D for the ShipFromLocation entity 424A00D and a data type of LocationInternalID 424A14D. The StandardID 424A20D has zero or n occurrences 424A22D for the ShipFromLocation entity 424A00D and a data type of LocationStandardID 424A24D. The BuyerID 424A30D has zero or one occurrences 424A32D and a data type of LocationPartyID 424A34D. The VendorID 424A40D has zero or one occurrences 424A42D for the ShipFromLocation entity 424A00D and a data type of LocationPartyID 424A44D. The LoadingLocation entity 424A50D has zero or one occurrences 424A52D for the ShipFromLocation entity 424A00D and a data type of BusinessTransactionDocumentLocation 424A54D. The Address 424A00E has one or zero occurrences 424A02E for the ShipFromLocation entity 424A00D and a data type of Address 424A04E. The LoadingLocation entity 424A50D includes an InternalID 424A60D, a StandardID 424A70D, a BuyerID 424A80D, and a VendorID 424A90D. The InternalID 424A60D has zero or one occurrences 424A62D for each LoadingLocation entity 424A50D and a data type of LocationInternalID 424A64D. The StandardID 424A70D has zero or one occurrences 424A72D for each LoadingLocation entity 424A50D and a data type of LocationStandardID 424A74D. The BuyerID 424A80D has zero or one occurrences 424A82D for each LoadingLocation entity 424A50D and a data type of LocationPartyID 424A84D. The VendorID 424A90D has zero or one occurrences 424A92D for each LoadingLocation entity 424A50D and a data type of LocationPartyID 424A94D.

The TransshipmentLocation entity 424A10E includes an InternalID 424A20E, a StandardID 424A30E, a BuyerID 424A40E, a VendorID 424A50E and an Address 424A60E. The InternalID 424A20E has zero or one occurrences 424A22E for each TransshipmentLocation entity 424A10E and a data type of LocationInternalID 424A24E. The StandardID 424A30E has zero or n occurrences 424A32E for each TransshipmentLocation entity 424A10E and a data type of LocationStandardID 424A34E. The BuyerID 424A40E has zero or one occurrences 424A42E for each TransshipmentLocation entity 424A10E and a data type of LocationPartyID 424A44E. The VendorID 424A50E has zero or one occurrences 424A52E for each TransshipmentLocation entity 424A10E and a data type of LocationPartyID 424A54E. The Address 424A60E has one or zero occurrences 424A72E for each TransshipmentLocation entity 424A10E and a data type of Address 424A64E.

The ShipToLocation entity 424A70E includes an InternalID 424A80E, a StandardID 424A90E, a BuyerID 424A00F, a VendorID 424A10F and an Unloading Location entity 424A20F. The InternalID 424A80E has zero or one occurrences 424A82E for each ShipToLocation entity 424A70E and a data type of LocationInternalID 424A84E. The StandardID 424A90E has zero or n occurrences 424A92E for each ShipToLocation entity 424A70E and a data type of LocationStandardID 94E. The BuyerID 424A00F has zero or one occurrences 424A02F for each ShipToLocation entity 424A70E and a data type of LocationPartyID 424A04F. The VendorID 424A10F has zero or one occurrences 424A12F for each ShipToLocation entity 424A70E and a data type of LocationPartyID 424A14F. The Unloading Location entity 424A20F has one or zero occurrences 424A22F for each ShipToLocation entity 424A70E and a data type of BusinessTransactionDocumentLocation 424A24F.

The Unloading Location entity 424A20F includes an InternalID 424A30F of type LocationInternalID 424A34F, a StandardID 424A40F of type LocationStandardID 424A44F, a BuyerID 424A50F of type LocationPartyID 424A54F, and a VendorID 424A60F of type LocationPartyID 424A64F. In one implementation, for each Unloading Location entity 424A20F, there is zero or one 424A32F InternalID 424A30F, zero or n 424A42F StandardIDs 424A40F, zero or one 424A52F BuyerID 424A50F, and zero or one 424A62F VendorID 424A60F.

The ProductInformation package 424A30C includes a Product entity 424A80F of type BusinessTransactionDocumentProduct 424A84F. There is one 424A82F Product entity 424A80F for each Item entity 424A96B. The Product entity 424A80F includes an InternalID 424A90F of type ProductInternalID 424A94F, a StandardID 424A00G of type ProductStandardID 424A04G, a BuyerID 424A10G of type ProductPartyID 424A14G, and a VendorID 424A20G of type ProductPartyID 424A24G. In one implementation, for each Product entity 424A80F, there is zero or one 424A92F InternalID 424A90F, zero or one 424A02G StandardIDs 424A00G, zero or one 424A12G BuyerID 424A10G, and zero or one VendorID 424A20G.

The DeliveryInformation package 424A32C includes a PreviousDelivery entity 424A30G and a CumulativeDelivery entity 424A62G. There is one or zero 424A32G PreviousDelivery entity 424A30G for each Item entity 424A96B. There is one or zero 424A64G CumulativeDelivery entity 424A62G for each Item entity 424A96B.

The PreviousDelivery entity 424A30G includes one 424A38G ID entity 424A36G of type BusinessTransactionDocumentID 424A40G. The PreviousDelivery entity entity 424A30G also includes one or zero 424A48G ReceivedQuantity 424A46G of type Quantity 424A49G. The PreviousDelivery entity 424A30G further includes one or zero 424A56G ReceiptDateTime 424A54G of type DateTime 424A58G.

The CumulativeDelivery entity 424A62G includes a ValidityPeriod 424A68G of type DateTimePeriod 424A72G, a ReceivedQuantity 424A76G of type Quantity 424A80G, a ReconcilliationDateTime 424A86G of type DateTime 424A90G, and a ReconcilliationQuantity 424A98G of type Quantity 424A98G. In one implementation, for each CumulativeDelivery entity 424A62G, there is zero or one 424A70G ValidityPeriod 424A68G, one 424A78G ReceivedQuantity 424A76G, zero or one 424A88G ReconcilliationDateTime 424A86G, and zero or one 424A96G ReconcilliationQuantity 424A98G.

The ScheduleLine package 424A34C includes a ScheduleLine entity 424A04H of type DeliveryScheduleItemScheduleLine_Notification 424A08H. There is one or more 424A06H ScheduleLine entities 424A04H for each Item 96B. Each ScheduleLine entity 424A04H includes a CommitmentCode entity 424A12H of type ScheduleLineCommitmentCode 424A16H, a ProductChangeID 424A22H of type ProductChangeID 424A26H, a DeliveryPeriod 424A32H of type DateTimePeriod 424A36H, a PickUpPeriod 424A40H of type DateTimePeriod 424A44H, a Quantity 424A48H of type Quantity 424A52H, and a Note 424A58H of type Note 424A62H. In one implementation, for each ScheduleLine entity 424A04H, there is one 424A14H CommitmentCode entity 424A12H, zero or one 424A24H ProductChangeID 424A22H, zero or one 424A34H DeliveryPeriod 424A32H, zero or one 424A42H PickUpPeriod 424A40H, one 424A50H Quantity, and zero or one 424A60H Note 424A58H.

(6) Element Structure of Delivery Schedule Confirmation Message

The message data type element structure for the DeliveryScheduleConfirmation message is depicted in FIG. 424BA-BH. The element structure is similar to the data model, but provides additional information regarding the details of the interface. The element structure identifies the different packages 424B00 in the interface, and represents the entities at various levels within the interface. As depicted in FIG. 424BA, the interface for DeliveryScheduleConfirmation Message includes five levels 424B013, 424B02, 424B03, 424B04, 424B05, 424B06. The outermost package of this interface is a DeliveryScheduleMessage package 424B09, which includes a DeliveryScheduleConfirmation entity 424B110 at the first level 424B0 land packages: BusinessDocumentMessageHeader 424B112 and DeliverySchedule 424B40.

The DeliveryScheduleConfirmation 424B10 is of type DeliveryScheduleConfirmationMessage 424B11.

There is one 424B14 MessageHeader 424B13 for each BusinessDocumentMessageHeader 424B12. The MessageHeader 424B13 is of type BusinessDocumentMessageHeader 424B15. The MessageHeader 424B13 includes elements: ID 424B16 and CreationDateTime 424B19. The MessageHeader 424B13 includes entities: SenderParty 424B22 and RecipientParty 424B33. There is one 424B37 ID 424B16 for each MessageHeader 424B13. The ID 424B16 is of type BusinessDocumentMess.ageID 424B18. There is one 424B20 CreafionDateTime 424B19 for each MessageHeader 424B13. The CreationDateTime 424B19 is of type DateTime 424B21. There is zero or one 424B23 SenderParty 424B22 for each MessageHeader 424B13. The SenderParty 424B22 is of type BusinessDocument-MessageHeaderParty 424B24. The SenderParty 424B22 includes elements: InternalID 424B25 and StandardID 424B28.

There is zero or one 424B26 InternalID 424B25 for each SenderParty 424B22. The InternalID 424B25 is of type PartyInternalID 424B27. There may be any number 424B29 of StandardID 424B28 for each SenderParty 424B22. The StandardID 424B28 is of type PartyStandardID 424B30.

There is zero or one 424B32 RecipientParty 424B31 for each MessageHeader 424B13. The RecipientParty 424B31 is of type BusinessDocumentMessageHeaderParty 424B33. The RecipientParty 424B31 includes elements: InternalID 424B34 and StandardID 424B37. There is zero or one 424B35 InternalID 424B34 for each RecipientParty 424B31. The InternalID 424B34 is of type PartyInternalID 424B36. There may be any number 424B38 of StandardID 424B37 for each RecipientParty 424B31. The StandardID 424B37 is of type PartyStandardID 424B39.

The DeliverySchedule 424B40 includes an entity DeliverySchedule 424B41. There is one 424B42 DeliverySchedule 424B41 for each DeliverySchedule 424B40. The DeliverySchedule 424B41 is of type DeliverySchedule_Confirmation 424B43. The DeliverySchedule 424B41 includes elements: ID 424B44, TypeCode 424B47, and CreationDateTime 424B50.

There is zero or one 424B45 ID 424B44 for each DeliverySchedule 424B41. The ID 424B44 is of type BusinessTransactionDocumentID 424B46. There is zero or one 424B48 TypeCode 424B47 for each DeliverySchedule 424B41. The TypeCode 424B47 is of type DeliveryScheduleTypeCode 424B49. There is one 424B51 CreationDateTime 424B50 for each DeliverySchedule 424B41. The CreationDateTime 424B50 is of type DateTime 424B52.

The Party package 424B53 includes entities: BuyerParty 424B54 and VendorParty 424B69. There is zero or one 424B55 BuyerParty 424B54 for each Party 424B53. The BuyerParty 424B54 is of type BusinessTransactionDocumentParty 424B56. The BuyerParty 424B54 includes elements: InternalID 424B57, StandardID 424B60, BuyerID 424B63, and VendorID 424B66.

There is zero or one 424B58 InternalID 424B57 for each BuyerParty 424B54. The InternalID 424B57 is of type PartyInternalID 424B59. There may be any number 424B61 of StandardID 424B60 for each BuyerParty 424B54. The StandardID 424B60 is of type PartyStandardID 424B62. There is zero or one 424B64 BuyerID 424B63 for each BuyerParty 424B54. The BuyerID 424B63 is of type PartyPartyID

424B65. There is zero or one 424B67 VendorID 424B66 for each BuyerParty 424B54. The VendorID 424B66 is of type PartyPartyID 424B68.

There is one 424B70 VendorParty 424B69 for each Party 424B53. The VendorParty 424B69 is of type BusinessTransactionDocumentParty 424B71. The VendorParty 424B69 includes elements: InternalID 424B72, StandardID 424B75, BuyerID 424B78, and VendorID 424B81. There is zero or one 424B73 InternalID 424B72 for each VendorParty 424B69. The InternalID 424B72 is of type PartyInternalID 424B74. There may be any number 424B76 of StandardID 424B75 for each VendorParty 424B69. The StandardID 424B75 is of type PartyStandardID 424B77. There is zero or one 424B79 BuyerID 424B78 for each VendorParty 424B69. The BuyerID 424B78 is of type PartyPartyID 424B80. There is zero or one 424B82 VendorID 424B81 for each VendorParty 424B69. The VendorID 424B81 is of type PartyPartyID 424B83.

There is zero or one 424B85 Note 424B84 for each DeliverySchedule 424B40. The Note 424B84 is of type Note 424B86.

The Item package 424B87 includes entities: Item 424B88 and Note 424B06B. The Item package 424B87 includes packages: BusinessTransactionDocumentReference 424B97, Release 424B013A, Party 424B133A, Location 424B44A, ProductInformation 424B90A, and ScheduleLine 424B09B. There is one or more 424B89 Item 424B88 for each Item 424B87. The Item 424B88 is of type DeliveryScheduleItem_Confirmation 424B90. The Item 424B88 includes elements: @actionCode 424B91 and ID 424B94.

There is zero or one 424B92 @actionCode 424B91 for each Item 424B88. The @actionCode 424B91 is of type ActionCode 424B93. There is one 424B95 ID 424B94 for each Item 424B88. The ID 424B94 is of type BusinessTransactionDocumentItemID 424B96. The BusinessTransactionDocumentReference package 424B97 includes a SchedulingAgreementReference entity 424B98. There is one 424B99 SchedulingAgreementReference 424B98 for each BusinessTransactionDocumentReference 424B97. The SchedulingAgreementReference 424B98 is of type BusinessTransactionDocumentReference 424B00A.

The Release package 424B01A includes a Release entity 424B02A.

There is one 424B03A Release 424B02A for each Release 424B01A. The Release 424B02A includes elements: ID 424B04A, CreationDateTime 424B07A, and HorizonDateTime 424B10A. There is one 424B05A ID 424B04A for each Release 424B02A. The ID 424B04A is of type BusinessTransactionDocumentID 424B06A. There is zero or one 424B08A CreationDateTime 424B07A for each Release 424B02A. The CreationDateTime 424B07A is of type DateTime 424B09A. There is zero or one 424B11A HorizonDateTime 424B10A for each Release 424B02A. The HorizonDateTime 424B10A is of type DateTime 424B12A.

The Party package 424B13A includes entities: BuyerParty 424B14A and ProductRecipientParty 424B29A. There is zero or one 424B15A BuyerParty 424B14A for each Party 424B13A. The BuyerParty 424B14A is of type BusinessTransactionDocumentParty 424B16A. The BuyerParty 424B14A includes elements: InternalID 424B17A, StandardID 424B20A, BuyerID 424B23A, and VendorID 424B26A. There is zero or one 424B18A InternalID 424B17A for each BuyerParty 424B14A. The InternalID 424B17A is of type PartyInternalID 424B19A.

There may be any number 424B21A of StandardID 424B20A for each BuyerParty 424B14A. The StandardID 424B20A is of type PartyStandardID 424B22A. There is zero or one 424B24A BuyerID 424B23A for each BuyerParty 424B14A. The BuyerID 424B23A is of type PartyPartyID 424B25A. There is zero or one 424B27A VendorID 424B26A for each BuyerParty 424B14A. The VendorID 424B26A is of type PartyPartyID 424B28A.

There is zero or one 424B30A ProductRecipientParty 424B29A for each Party 424B13A. The ProductRecipientParty 424B29A is of type BusinessTransactionDocumentParty 424B31A. The ProductRecipientParty 424B29A includes elements: InternalID 424B32A, StandardID 424B35A, BuyerID 424B38A, and VendorID 424B41A. There is zero or one 424B33A InternalID 424B32A for each ProductRecipientParty 424B29A. The InternalID 424B32A is of type PartyInternalID 424B34A. There may be any number 424B36A of StandardID 424B35A for each ProductRecipientParty 424B29A. The StandardID 424B35A is of type PartyStandardID 424B37A. There is zero or one 424B39A BuyerID 424B38A for each ProductRecipientParty 424B29A. The BuyerID 424B38A is of type PartyPartyID 424B40A. There is zero or one 424B42A VendorID 424B41A for each ProductRecipientParty 424B29A. The VendorID 424B41A is of type PartyPartyID 424B43A.

The Location package 424B44A includes entities: ShipFromLocation 424B45A, TransshhipmentLocation 424B60A, and ShipToLocation 424B75A. There is zero or one 424B46A ShipFromLocation 424B45A for each Location 424B44A. The ShipFromLocation 424B45A is of type BusinessTransaction-DocumentShipFromLocation 424B47A. The ShipFromLocation 424B45A includes elements: InternalID 424B48A, StandardID 424B51A, BuyerID 424B54A, and VendorID 424B57A. There is zero or one 424B49A InternalID 424B48A for each ShipFromLocation 424B45A. The InternalID 424B48A is of type LocationInternalID 424B50A. There may be any number 424B52A of StandardID 424B51A for each ShipFromLocation 424B45A. The StandardID 424B51A is of type LocationStandardID 424B53A. There is zero or one 424B55A BuyerID 424B54A for each ShipFromLocation 424B45A. The BuyerID 424B54A is of type LocationPartyID 424B56A. There is zero or one 424B58A VendorID 424B57A for each ShipFromLocation 424B45A. The VendorID 424B57A is of type LocationPartyID 424B59A. There is zero or one 424B61A TransshhipmentLocation 424B60A for each Location 424B44A. The TransshhipmentLocation 424B60A is of type BusinessTransactionDocumentTransshipmentLocation 424B62A. The TransshhipmentLocation 424B60A includes elements: InternalID 424B63A, StandardID 424B66A, BuyerID 424B69A, and VendorID 424B72A. There is zero or one 424B64A InternalID 424B63A for each TransshhipmentLocation 424B60A. The InternalID 424B63A is of type LocationInternalID 424B65A. There may be any number 424B67A of StandardID 424B66A for each TransshhipmentLocation 424B60A. The StandardID 424B66A is of type LocationStandardID 424B68A. There is zero or one 424B70A BuyerID 424B69A for each TransshhipmentLocation 424B60A. The BuyerID 424B69A is of type LocationPartyID 424B71A.

There is zero or one 424B73A VendorID 424B72A for each TransshhipmentLocation 424B60A. The VendorID 424B72A is of type LocationPartyID 424B74A.

There is zero or one 424B76A ShipToLocation 424B75A for each Location 424B44A. The ShipToLocation 424B75A is of type BusinessTransactionDocumentShipToLocation 424B77A. The ShipToLocation 424B75A includes elements: InternalID 424B78A, StandardID 424B81A, BuyerID 424B84A, and VendorID 424B87A.

There is zero or one 424B79A InternalID 424B78A for each ShipToLocation. The InternalID 424B78A is of type LocationInternalID 424B80A. There may be any number 424B82A of StandardID 424B81A for each ShipToLocation. The StandardID 424B81A is of type LocationStandardID 424B83A. There is zero or one 424B85A BuyerID 424B84A for each ShipToLocation. The BuyerID 424B84A is of type LocationPartyID 424B86A. There is zero or one 424B88A VendorID 424B87A for each ShipToLocation. The VendorID 424B87A is of type LocationPartyID 424B89A.

The ProductInformation package 424B90A includes an entity Product 424B91A. There is one 424B92A Product 424B91A for each ProductInformation 424B90A. The Product 424B91A is of type BusinessTransactionDocument-Product 424B93A. The Product entity 424B91A includes elements: InternalID 424B94A, StandardID 424B97A, BuyerID 424B00B, and VendorID 424B03B.

There is zero or one 424B95A InternalID 424B94A for each Product 424B91A. The InternalID 424B94A is of type ProductInternalID 424B96A. There is zero or one 424B98A StandardID 424B97A for each Product 424B91A. The StandardID 424B97A is of type ProductStandardID 424B99A. There is zero or one 424B01B BuyerID 424B00B for each Product 424B91A. The BuyerID 424B00B is of type ProductPartyID 424B02B. There is zero or one 424B04B VendorID 424B03B for each Product 424B91A. The VendorID 424B03B is of type ProductPartyID 424B05B.

There is zero or one 424B07B Note 424B06B for each Item 424B87. The Note 424B06B is of type Note 424B08B.

The ScheduleLine package 424B09B includes an entity ConfirmedScheduleLine 424B10B. There is one or more 424B11B ConfirmedScheduleLine 424B10B for each ScheduleLine 424B09B. The ConfirmedScheduleLine 424B10B is of type DeliveryScheduleItem-ConfirmedScheduleLine_Confirmation 424B12B. The ConfirmedScheduleLine entity 424B10B includes elements: DeliveryPeriod 424B13B, PickUpPeriod 424B16B, and Quantity 424B19B. There is zero or one 424B14B DeliveryPeriod 424B13B for each ConfirmedScheduleLine 424B10B. The DeliveryPeriod 424B13B is of type DateTimePeriod 424B15B. There is zero or one 424B17B PickUpPeriod 424B16B for each ConfirmedScheduleLine 424B10B. The PickUpPeriod 424B16B is of type DateTimePeriod 424B18B. There is one 424B20B Quantity 424B19B for each ConfirmedScheduleLine 424B10B. The Quantity 424B19B is of type Quantity 424B21B.

u) Invoice Issued Information

One motivating business scenario for the InvoiceIssuedInformation interface is the Sell From Stock scenario. In the Sell From Stock scenario, accepting and creating an order may be the first stage in the process. The elements of the order relevant for the delivery are communicated to the FC for the purposes of order fulfillment. At the same time, the elements of the order that are relevant for billing are transferred to the billing due list in BAC Billing. After the delivery has been made, the elements of the delivery that are relevant for billing are transferred to the billing due list in Billing, which generates invoices (and credit memos) on the basis of these.

In the Sell From Stock scenario, several specific recipients will then provide information about the invoices that have been generated. In particular Recipient: BAC CRM will provide information about the InvoiceIssuedInformation, Recipient: BAC Accounting will provide information about the InvoiceAccountingInformation, and Recipient: BAC Payment will provide information about the PaymentDueNotification.

(1) Message Type Invoice Issued

InvoiceIssuedInformation provides information about the invoice items used for billing, the services provided, the products delivered, and the credit memo or debit memo requests that have been billed, and the quantities or the values that have been billed. The message type InvoiceIssuedInformation is based on the message data type InvoiceIssuedMessage. Contract management/sales may require information about billing that has been carried out, in order to adapt the status of order items (partially billed, billed) and be able to trigger follow-up actions if they are required (for example, updating credit information).

(2) Message Choreography

FIG. 425 depicts a graphical representation 42500 of an InvoiceIssuedInformation 42510 between business entities in accordance with methods and systems consistent with the subject matter described herein. The illustrative message choreography is a logical sequence of messages that is not dependent on actual scenarios. In the implementation shown in FIG. 425, the illustrative business entities include Customer 42502, Billing 42504, and Customer Relationship Management 42506. In the illustrative example, Billing 42504 (invoice creation) uses InvoiceIssuedInformation 42510 to inform Customer Relationship Management 42506 about the contents of an invoice (InvoiceRequest 42508) that has been sent to a customer.

(3) Message Data Type Invoice Issued Message

As shown in FIG. 426, the message data type InvoiceIssuedMessage 42602 includes the InvoiceIssued object included in the business document and the business information that is relevant for sending a business document in a message. It includes a MessageHeader package 42604 and an InvoiceIssued package 42606. The message data type InvoiceIssuedMessage makes the structure available for the message type InvoiceIssued and the relevant interfaces.

(a) Message Header Package

A MessageHeader package 42604 groups together the business information that is relevant for sending a business document in a message. The MessageHeader 42604 may not be required for the InvoiceIssuedInformation because there may be no intention to reference messages or communicate with several instances of the components involved.

(b) Invoice Issued Package

The InvoiceIssued package 42606 summarizes the invoice information relevant for contract management/sales. It includes an InvoiceIssuedItem package 42610. The InvoiceIssued Message entity 42608 includes an InvoiceIssued entity 42612 and has a 1:1 relationship 42614 with it.

The InvoiceIssued entity 42612 summarizes the invoice information relevant for contract management/sales. The InvoiceIssued entity 42612 includes information about which order items, items in credit and debit memo requests or delivery items have been billed to what extent. The InvoiceIssued entity 42612 includes a BaseInvoiceID, a CancellationInvoiceIndicator, and an IntraCorporateIndicator. The BaseInvoiceID may be a unique identifier for the base invoice for the InvoiceIssueNotification, and is of type GDT: BusinessTransactionDocumentID. The CancellationInvoiceIndicator is the indicator that specifies whether the invoice is a cancellation invoice. This can affect the status of the order item. For example, canceling an invoice can sometimes mean that a billed order item is no longer billed or partially billed (milestone billing). The CancellationInvoiceIndicator is of type GDT: InvoiceCancellationInvoiceIndicator. The IntraCorporateIndicator is the indicator that specifies whether the invoice is an intracorporate invoice (intercompany billing). In contrast to a billing document, an intracorporate invoice has no effect on the status of the order item. The IntraCorporateIndicator is of type GDT: InvoiceIntraCorporateIndicator. The base invoice is specified using the BaseInvoiceID.

(c) Invoice Issued Item Package

The InvoiceIssuedItem package 42610 groups together items from an InvoiceIssued message. It includes a BusinessTransactionDocumentReference package 42616.

(i) Invoice Issued Item

An InvoiceIssuedItem entity 42618 specifies the quantity or the partial value of a product billed with respect to a business transaction. The InvoiceIssued entity 42612 includes the InvoiceIssuedItem entity 42618 and has a 1:n relationship 42620 with it. Item 42618 includes a BaseInvoiceItemID, a BilledQuantity, and a BilledValue. The BaseInvoiceItemID is the number of the item in the base invoice for the InvoiceIssued, and is of type GDT: BusinessTransactionDocumentItemID. The BilledQuantity is of type GDT: Quantity. With respect to BilledValue, in general, the net value is used to describe the billed value. However, the term NetValue is deliberately not used to emphasize the particular semantic of the "billed value." The BilledValue is of type GDT: Amount.

The BaseInvoiceItemID is specified, together with either a billed quantity or a billed value. An InvoiceIssuedItem entity 42618 is usually not regarded as being the same as an InvoiceItem. Rather it includes detailed information from an invoice item. Usually, business transactions are (partial) deliveries for an order item. However, they can also be items from credit and debit memo requests or deliveries without orders.

(ii) Business Transaction Document Reference Package

The BusinessTransactionDocumentReference package 42616 groups together the references to business documents that have been billed. It includes a SalesOrderReference entity 42622 and a DeliveryReference entity 42624. The InvoiceIssuedItem entity 42618 includes the SalesOrderReference entity 42622 and the DeliveryReference entity 42624 and has a 1:c relationship (42626 and 42628 respectively) with them.

(a) Sales Order Reference

The SalesOrderReference entity 42622 is the reference to an order or an item within an order. The SalesOrderReference entity 42622 is of type GDT: BusinessTransactionDocumentReference. The SalesOrderReference entity 42622 includes the order number assigned by the seller. The item is specified in the order. Contract management/sales uses the information to adapt the status of individual items and therefore finds out which items in the order have already been billed.

(b) Delivery Reference

The DeliveryReference entity 42624 is the reference to a delivery or an item within a delivery. The DeliveryReference entity 42624 is of type GDT: BusinessTransactionDocumentReference. In one implementation, this reference cannot be specified in the case of order-related billing.

(4) Element Structure

FIGS. 427A and B depict the element structure for InvoiceIssuedInformation. The element structure is similar to the data model, but provides additional information regarding the details of the interface. The element structure identifies the different packages 42700 in the interface, and represents the entities at various levels within the interface. As depicted in FIGS. 427A and B, the interface for InvoiceIssuedInformation includes four levels 42702, 42704, 42706, and 42708. The element structure identifies the cardinality 42710 between the entities of the interface, and provides information 42712 (i.e., type and name) regarding the data type that provides the basis for the entity. The outermost package of this interface is an InvoiceIssuedMessage package 42714, which includes an InvoiceIssuedMessage entity 42716 at the first level 42702. The InvoiceIssuedMessage entity 42716 is of type message data type ("MDT") "InvoiceIssuedMessage" 42720.

The InvoiceIssuedMessage package 42714 includes an InvoiceIssued package 42722. The InvoiceIssued package 42722 includes an InvoiceIssued entity 42724. There is one 42726 InvoiceIssued entity 42724 for each InvoiceIssuedMessage entity 42716 and the InvoiceIssued entity 42724 is of type GDT InvoiceIssued 42728. The InvoiceIssued entity 42724 includes a BaseInvoiceID 42730, a CancellationInvoiceIndicator 42736, and an IntraCorporateIndicator 42742.

There is one 42732 BaseInvoiceID 42730 for each InvoiceIssued entity 42724. The BaseInvoiceID 42730 is of type GDT BusinessTransactionDocumentID 42734. A CancellationInvoiceIndicator 42736 has one occurrence 42738 and is of type GDT InvoiceCancellationInvoiceIndicator 42740. IntraCorporateIndicator 42742 has one occurrence 42744 and is of type GDT IntraCorporateIndicator 42746.

The Item package 42748 includes an Item entity 42750. There is one or more 42752 Item entities 42750 for each InvoiceIssued entity 42724, and the Item entity 42750 is of type GDT Item 42754. The Item entity 42750 includes a BaseInvoiceItemID 42756, a BilledQuantity 42762, and a BilledValue 42768. The BaseInvoiceItemID 42756 is of type GDT BusinessTransactionDocumentItemID 42760, and there is one 42758 BaseInvoiceItemID 42756 for each Item entity 42750. The BilledQuantity 42762 is of type GDT Quantity 42769, and there is one or zero 42764 BilledQuantity 42762 for each Item entity 42750. There is one or zero 42770 BilledValue 42768 for each Item entity 42750. The BilledValue 42768 is of type GDT Amount 42772.

The Item package 42748 also includes a BusinessTransactionDocumentReference package 42774. The BusinessTransactionDocumentReference package 42774 includes a SalesOrderReference entity 42776 and a DeliveryReference entity 42782. The SalesOrderReference entity 42776 is of type GDT BusinessTransactionDocumentReference 42780. There is one or zero 42778 SalesOrderReference entities 42776 for each Item entity 42750. The DeliveryReference entity 42782 is of type GDT BusinessTransactionDocumentItemID 42786 and there is one or zero occurrences 42784.

v) Product Activity Interface

The ProductActivityNotification message is intended for planning and information purposes, generally for a supplier. It can contain individual entries and time series to specify the stock, demand, and consumption of products of a buyer (retailers, wholesalers, or manufacturers) in reference to a ship-to location. The message itself implies no authorization from the message recipient for the manufacture or shipping of products. Such an authorization can be made by scheduling agreements or other agreements.

In an interenterprise variant, the ProductActivityNotification message is sent within the Business Scenarios Responsive Replenishment and Collaborative Planning, Forecasting, and Replenishment (CPFR) from a buyer (retail company) to a vendor (consumer products manufacturer). In an intra-enterprise variant, this message is sent within the framework of the Business Scenarios Supplier Managed Inventory from an executive system (ERP) to the Inventory Collaboration Hub (ICH) for the planning and development of replenishment deliveries from the supplier. The supplier receives data about the existing stock and the forecasted consumption of a product.

(1) Message Type Product Activity Notification

A ProductActivityNotification is a message that transfers product-related activities of a buyer (retailer, wholesaler, or manufacturer) to a vendor (supplier). On that basis, the vendor can then take on the replenishment planning for the buyer. Product-related activities include, for example, current or planned product sales, current or planned product consumptions, stockouts, or open purchase order quantities.

The structure of the message type ProductActivityNotification is specified in the message data type ProductActivityMessage. Methods and systems consistent with the subject matter described herein use the package template for a BusinessTransactionDocument for an SCM Master Data depicted in FIG. 270B to derive the ProductActivity interface.

The notification transfer is complete ("complete transmission"). For the EAN.UCC, the equivalent for this notification is called a "ProductActivity."

(2) Message Choreography

FIG. 428 depicts the message choreography for scenario "CPFR." It describes the possible logical sequence of the message types necessary for the scenario realization.

As depicted in FIG. 428, a buyer 42802 sends a ProductDemandInfluencingEventNotification 42806 to a vendor 42804. The ProductDemandInfluencingEventNotification 42806 includes long to mid-term demand information that is linked to an activity. Together with the product forecast information, i.e., ProductForecastNotification 42808, that is also sent by the buyer 42802, or, with short-term incidental current sales information, i.e., ProductActivityNotification 42810, this information can be used by the vendor 42804 for the creation of a forecast for the product demands of the buyer 42802. In the case of a cooperative settlement process between the buyer 42802 and vendor 42804, the vendor 42804 can send a ProductForecastRevisionNotification 42812 back to the buyer. The ProductForecastRevisionNotification 42812 is a revision of the product forecast that was sent by the buyer 42802. In turn, the buyer 42802 can respond with a ProductForecastRevisionNotification 42814, which is an updated revision.

(3) Message Data Type Product Activity Message

The message data type ProductActivityMessage groups the business information that is relevant for sending a business document in a message and the object ProductActivity included in the business document. As depicted in FIG. 429, the message data type ProductActivityMessage includes a ProductActivityMessage package 42902, which includes a MessageHeader package 42904 and a ProductActivity package 42906. The ProductActivityMessage package 42902 also includes a ProductActivityMessage entity 42908. The structure of the message data type ProductActivity is available for the message type ProductActivityNotification and the relevant interfaces.

(a) Message Header Package

A MessageHeader package 42904 groups the business information that is relevant for sending a business document in a message. It includes a MessageHeader entity 42910. There is a 1:1 relationship 42912 between the ProductActivityMessage entity 42908 and the MessageHeader entity 42910.

(i) Message Header

The MessageHeader groups the business information from the view of the sending application. The MessageHeader entity 42910 includes information to identify the business document in a message, information about the sender, and, possibly, information about the recipient.

The MessageHeader entity 42910 includes a SenderParty entity 42914 and a RecipientParty entity 42916. There is a 1:c relationship 42918 between the MessageHeader entity 42910 and the SenderParty entity 42914, and a 1:c relationship 42920 between the MessageHeader entity 42910 and the RecipientParty entity 42916. The MessageHeader entity 42910 is of type GDT: BusinessDocumentMessageHeader. The MessageHeader entity 42910 also includes an ID and a CreationDateTime. The ID is the identification of the business document in the technical message. The CreationDateTime is the creation date of the business document in the technical message.

(ii) Sender Party

The SenderParty is responsible for sending a business document at the business application level. The SenderParty entity 42914 is of type GDT: BusinessDocumentMessageHeaderParty.

(iii) Recipient Party

The RecipientParty is responsible for receiving a business document at the business application level. The RecipientParty entity 42916 is of type GDT: BusinessDocumentMessageHeaderParty.

(b) Product Activity Package

The ProductActivity package 42906 groups the ProductActivity entity 42928 with its packages. It includes a Party package 42922, a BusinessTransactionDocumentReference package 42924, and a Product Activity Item package 42926. There is a 1:1 relationship 42930 between the ProductActivityMessage entity 42908 and the ProductActivity entity 42928.

ProductActivity includes information about the stock, demand, and consumption of products of a buyer (retailers, wholesalers, or manufacturers) at a ship-to location, and about the involved parties, for other relevant business documents and (optionally) for a ship-from location. The ProductActivity entity 42928 includes a ValidityPeriod and a Note. The ValidityPeriod is the validity period for the specifications transferred in the ProductActivityNotification, and is of type GDT: DateTimePeriod. The Note is a language-independent note, and is of type GDT: Note.

(c) Party Package

The Party Package 42922 includes the grouping of the business partners that may be relevant within the ProductActivityNotification. It includes a BuyerParty entity 42932 and a VendorParty entity 42934. There is a 1:c relationship 42936 between the ProductActivity entity 42928 and the BuyerParty entity 42932, and a 1:c relationship 42938 between the ProductActivity entity 42928 and the VendorParty entity 42934.

For an internal communication (with common master data), the InternalID for the party entities should be used. For an interenterprise communication (with business-partner-specific master data),either the StandardID or the partner-role-specific ID of the receiving partner should be used for the party entities. In other words, for Supplier Collaboration scenarios the BuyerID should be used, and for Customer Collaboration scenarios, the VendorID should be used. Due to the different possibilities for ID use, all ID elements of the particular "Party" are optional. In an internal scenario, it is not a requirement to enter the business partner in the message; both party entities are optional.

(i) Buyer Party

The BuyerParty is a company that buys goods. The BuyerParty entity 42932 is of type GDT: BusinessTransactionDocumentParty. Typically the InternalID, the StandardID, the BuyerID, and the VendorID should be used.

(ii) Vendor Party

The VendorParty is a company that delivers goods. The VendorParty entity 42934 is of type GDT: BusinessTransactionDocumentParty. Typically the InternalID, the StandardID, the BuyerID, and the VendorID should be used.

(d) Business Transaction Document Reference Package

The BusinessTransactionDocumentReference package 42924 is a grouping of references to business documents that may occur in the ProductActivityNotification. The BusinessTransactionDocumentReference package 42924 includes an InboundDeliveryReference entity 42940. There is a 1:cn relationship 42942 between the ProductActivity entity 42928 and the InboundDeliveryReference entity 42940.

The InboundDeliveryReference is the reference to an inbound delivery or an item within one. The InboundDeliveryReference entity 42940 is of type GDT: BusinessTransactionDocumentReference.

(e) Product Activity Item Package

The ProductActivityItem package 42926 groups the ProductActivityItem 42950 with its packages. It includes a Location package 42944, a ProductInformation package 42946, and an Inventory package 42948. There is a 1:n relationship 42952 between the ProductActivity entity 42928 and the ProductActivityItem entity 42950.

(i) Product Activity Item

The ProductActivityItem includes specifications about the stock, demand, and/or consumption of a product in reference to a ship-to location and (optionally) a ship-from location. The ProductActivityItem entity 42950 includes a SalesTimeSeries, a PromotionSalesTimeSeries, a SalesForecastTimeSeries, a PromotionSalesForecastTimeSeries, an OrderForecastTimeSeries, a PromotionOrderForecastTimeSeries, a ConsumptionTimeSeries, a ConsumptionForecastTimeSeries, an OnOrderTimeSeries, and an OutOfStockTimeSeries. The SalesTimeSeries is the time series for the sale of products, and is of type GDT: QuantityTimeSeries, where the FixedIndicator is not used. The PromotionSalesTimeSeries is the time series for the promotional sale of products, and is of type GDT: QuantityTimeSeries, where the FixedIndicator is not used. The SalesForecastTimeSeries is the time series for the forecasted sale of products, and is of type GDT: QuantityTimeSeries, where the FixedIndicator is not used. The PromotionSalesForecastTimeSeries is the time series for the forecasted promotional sale of products, and is of type GDT: QuantityTimeSeries, where the FixedIndicator is not used. The OrderForecastTimeSeries is the time series for the forecasted purchase orders of products, and is of type GDT: QuantityTimeSeries, where the FixedIndicator is not used. The PromotionOrderForecastTimeSeries is the time series for the forecasted promotional purchase orders of products, and is of type GDT: QuantityTimeSeries, where the FixedIndicator is not used. The ConsumptionTimeSeries is the time series for the product consumption induced by production, and is of type GDT: QuantityTimeSeries, where the FixedIndicator is not used. The ConsumptionForecastTimeSeries is the time series for the forecasted product consumption induced by production, and is of type GDT: QuantityTimeSeries, where the FixedIndicator is not used. The OnOrderTimeSeries is the time series for the open purchase orders of products, and is of type GDT: QuantityTimeSeries, where the FixedIndicator is not used. The OutOfStockTimeSeries is the time series for gaps in the warehouse stock of products that are based on the current product demand, and is of type GDT: QuantityTimeSeries, where the FixedIndicator is not used.

(ii) Location Package

The Location Package 42944 includes a summary of the specifications on locations that may be relevant for the delivery of the product specified in a ProductActivityItem. It includes a ShipFromLocation entity 42954 and a ShipToLocation entity 42956. There is a 1:c relationship 42958 between the Item entity 42950 and the ShipFromLocation entity 42954, and a 1:c relationship 42960 between the Item entity 42950 and the ShipToLocation entity 42956.

For an internal communication (with common master data), the InternalID for location entities should be used. For a B2B communication (with business-partner-specific master data), either the StandardID or the partner-role-specific ID of the receiving partner should be used for location entities. In other words, for Supplier Collaboration scenarios, the BuyerID should be used, and for Customer Collaboration scenarios, the VendorID should be used. Due to the different possibilities for ID use, ID elements of the particular "location" are optional.

(a) Ship From Location

The ShipFromLocation is the place from where the product specified in the item of the ProductActivity is to be delivered. The ShipFromLocation entity 42954 is of type GDT: BusinessTransactionDocumentShipFromLocation. The InternalID, the StandardID, the BuyerID, and the VendorID in the ShipFromLocation entity 42954 should be used.

(b) Ship To Location

The ShipToLocation is the place to where the product specified in the item of the ProductActivitiy is to be delivered. The ShipToLocation entity 42956 is of type GDT: BusinessTransactionDocumentShipToLocation. The InternalID, the StandardID, the BuyerID, and the VendorID should be used in the ShipToLocation entity 42956.

(iii) Product Information Package

The ProductInformation package 42962 includes a summary of the information that characterizes a product in detail. It includes a Product entity 42962. There is a 1:1 relationship 42964 between the Item entity 42950 and the Product entity 42962.

The Product is a tangible good for which the buyer makes specifications for the stock, demands, and/or consumption in a ProductActivityNotification. The Product entity 42962 is of type GDT: BusinessTransactionDocumentProduct. The InternalID, the StandardID, the BuyerID, the VendorID, and PackageQuantity and DiscontinuationIndicator in the Product entity 42962 should be used. For an internal communication (with common master data), the InternalID should be used for all product entities. For an interenterprise communication (with partner-specific master data), either the StandardID or the partner-role-specific ID of the receiving partner should be used for all product entities. In other words, for Supplier Collaboration scenarios, the BuyerID should be used, and for Customer Collaboration scenarios, the VendorID should be used. Due to the different possibilities for ID use, all ID elements of the particular product are optional. Generally, a product is either a tangible or intangible good, and is a part of the business activities of a company. It can be traded and contributes directly or indirectly to value added.

(iv) Inventory Package

The Inventory Package 42948 includes a summary of information about the warehouse stock of a product at a buyer. It includes an Inventory entity 42966 and a ConsignmentInventory entity 42968. There is a 1:c relationship 42970 between the Item entity 42950 and the Inventory entity 42966, and a 1:c relationship 42972 between the Item entity 42950 and the ConsignmentInventory entity 42968.

(a) Inventory

The Inventory identifies the warehouse stock of a product at a buyer. The Inventory entity 42966 includes a StatusDateTime, an UnrestrictedUseQuantity, a QualityInspectionQuantity, a BlockedQuantity, and a PromotionQuantity. The StatusDateTime is the date and time at which the warehouse stock was determined, and is of type GDT: InventoryStatusDateTime. The UnrestrictedUseQuantity is the quantity that has an unlimited use, and is of type GDT: Quantity. The QualityInspectionQuantity is the quantity intended for quality inspection, and is of type GDT: Quantity. The BlockedQuantity is the quantity that may not be used, and is of type GDT: Quantity. The PromotionQuantity is the quantity intended for promotional purposes, and is of type GDT: Quantity. The specified stock information shows absolute values, not difference values.

(b) Consignment Inventory

The ConsignmentInventory identifies the consignment store stock of a product, in other words, the part of the stock that remains the property of the vendor until it is procured (and paid for). The ConsignmentInventory entity 42968 includes a StatusDateTime, an UnrestrictedUseQuantity, a QualityInspectionQuantity, a BlockedQuantity, and a PromotionQuantity. The StatusDateTime is the date and time at which the goods receipt is posted into the warehouse stock, and is of type GDT: InventoryStatusDateTime. The UnrestrictedUseQuantity is the quantity that has an unlimited use, and is of type GDT: Quantity. The QualityInspectionQuantity is the quantity intended for quality inspection, and is of type GDT: Quantity. The BlockedQuantity is the quantity that may not be used, and is of type GDT: Quantity. The PromotionQuantity is the quantity intended for promotional purposes, and is of type GDT: Quantity. The specified stock information shows absolute values, not difference values.

(4) Element Structure of Product Activity Message

FIGS. 430A-L depict the element structure for a ProductActivityNotification. The element structure is similar to the above described data model of the message data type ProductActivity Message as reflected in FIG. 429, but provides additional information regarding the details for interfacing with or implementing a ProductActivity Message, such as a ProductActivityNotification. As shown in FIGS. 430, the element structure identifies the different packages 43000 that may be in a respective ProductActivityNotification. The element structure for the ProductActivityNotification includes six levels 43002, 43004, 43006, 43008, 43010, and 43012 each of which is associated with a respective package 43000. The element structure identifies the cardinality or occurrence 43014 and the data type 43016 information for the elements at the respective levels 43002, 43004, 43006, 43008, 43010, and 43012 in the respective package 43000.

The outermost package of this interface is a ProductActivityMessage package 43026, which includes a ProductActivityMessage entity 43028 at the first level 43002. The ProductActivityMessage entity 43028 is of type GDT: ProductActivityMessage 43030. The ProductActivityMessage package 43026 includes a MessageHeader package 43036 and a ProductActivity package 43038.

The MessageHeader package 43036 includes a MessageHeader entity 43040, which is of type BusinessDocumenMessageHeader 43044. There is one 43042 MessageHeader entity 43040 for each ProductActivityMessage entity 43028. The MessageHeader entity 43040 includes an ID 43052, a CreationDateTime 43064, a SenderParty entity 43072, and a RecipientParty entity 43002A. The ID 43052 is of type BusinessDocumentMessageID 43056, and there is one 43054 ID 43052 for each MessageHeader entity 43040. The CreationDateTime43064 is of type DateTime 43068, and there is one 43066 CreationDateTime 43064 for each MessageHeader entity 43040. The SenderParty entity 43072 is of type BusinessDocumentMessageHeaderParty 43076, and there is zero or one 43074 SenderParty entity 43072 for each MessageHeader entity 43040. The RecipientParty entity 43002A is of type BusinessDocumentMessageHeaderParty 43006A, and there is zero or one 43004A RecipientParty entity 43002A for each MessageHeader entity 43040.

The SenderParty entity 43072 includes an InternalID 43084 and a Standard ID 43092. The InternalID 43084 is of type PartyInternalID 43088, and there is zero or one 43086 InternalID 43084 for each SenderParty entity 43072. The StandardID 43092 is of type PartyStandardID 43096, and there is any number 43094 of StandardID 43092 for each SenderParty entity 43072.

The RecipientParty entity 43002A includes an InternalID 43014A and a Standard ID 43022A. The InternalID 43014A is of type PartyInternalID 43018A, and there is zero or one 43016A InternalID 43014A for each RecipientParty entity 43002A. The StandardID 43022A is of type PartyStandardID 43026A, and there is any number 43024A of StandardID 43022A for each RecipientParty entity 43002A.

The ProductActivity Package 43038 includes a ProductActivity entity 43032A of type ProductActivity 43036A. There is one 43034A ProductActivity entity 43032A for each ProductActivityMessage entity 43028. The ProductActivity entity 43032A includes a ValidityPeriod 43040A of DateTimePeriod 43044A. There is one or zero 43042A ValidityPeriod 43040A for each ProductActivity entity 43032A. The ValidityPeriod 43040A includes a StartDateTime 43052A of type DateTime 43056A and an EndDateTime 43062A of type DateTime 43066A. For each ProductActivity entity 43032A, there is one or zero 43054A StartDateTime 43052A and one or zero 43064A EndDateTime 43062A. The ProductActivey Package 43038 also includes a SubContractingIndicator entity 43067A, there is one or zero 43069A SubContractingIndicators 43067A, and the type is GDT 43071A.

The ProductActivity Package 43038 also includes a Party package 43072A, a BusinessTransactionDocumentRequest package 43074A, an Item package 43076A, and a Note 43002C. The Note 43002C is of type Note 43006C. There is one or zero 43004C Note 43002C for each ProductActivity entity 43032A.

The Party package 43072A includes a BuyerParty entity 43078A and a VendorParty entity 43036B. The BuyerParty 43078A is of type BusinessTransactionDocumentParty 43082A. There is one or zero 43080A BuyerParty entity 43078A for each ProductActivity entity 43032A. The VendorParty entity 43036B is of type BusinessTransactionDocumentParty 43040B. There is one 43038B VendorParty entity 43036B for each ProductActivity entity 43032A.

The BuyerParty entity 43078A includes an InternalID 43090A, a StandardID 43000B, a BuyerID 43012B, and a VendorID 43024B. The InternalID 43090A is of type PartyInternalID 43094A. The StandardID 43086A is of type PartyStandardID 43004B. The BuyerID 43096A is of type PartyPartyID 43016B. The VendorID 43006B is of type PartyPartyID 43028B. In one implementation, for each ProductActivity entity 43032A, there is one or zero 43092A InternalID 43090A, any number 43092A of StandardIDs 43000B, one or zero 43014B BuyerID 43012B, and one or zero 43026B VendorID 43024B.

The VendorParty entity 43036B includes an InternalID 43048B, a StandardID 43058B, a BuyerID 43070B, and a VendorID 43082B. The InternalID 43048B is of type PartyInternalID 43052B. The StandardID 43058B is of type PartyStandardID 43062B. The BuyerID 43070B is of type PartyPartyID 43074B. The VendorID 43082B is of type PartyPartyID 43086B. In one implementation, for each ProductActivity entity 43032A, there is one or zero 43050B InternalID 43048B, any number 43060B of StandardIDs

43058B, one or zero 43072B BuyerID 43070B, and one or zero 43084B VendorID 43082B.

The BusinessTransactionDocumentRequest package 43074A includes an InboundDeliveryReference entity 43094B of type BusinessTransactionDocumentReference 43098B. There is any number 43096B of InboundDeliveryReference entities 43094B for each ProductActivity entity 43032A.

The Item package 43076A includes an Item entity 43012C of type ProductActivityItem 43016C. There is one or more 43004C of Item entities 43012C for each ProductActivity entity 43032A. The Item package 43076A also includes a Location package 43022C, a ProductInformation package 42924C, and an Inventory package 42926C.

The Location package 43022C includes a ShipFromLocation entity 43028C and a ShipToLocation entity 43086C. The ShipFromLocation entity 43028C is of type BusinessTransactionDocumentShipFromLocation 43032C. There is one or zero 43030C ShipFromLocation entity 43028C for each Item entity 43012C. The ShipToLocation entity 43086C is of type BusinessTransactionDocumentLocation 43090C. There is one 43088C ShipToLocation entity 43086C for each Item entity 43012C.

The ShipFromLocation entity 43028C includes an InternalID 43040C, a StandardID 43050C, a BuyerID 43062C, and a VendorID 43074C. The InternalID 43040C is of type LocationInternalID 43044C. The StandardID 43050C is of type of LocationStandardID 43054C. The BuyerID 43062C is of type LocationPartyID 43066C. The VendorID 43074C is of type LocationPartyID 43078C. In one implementation, for each ShipFromLocation entity 43028C, there is one or zero 43042C InternalID 43040C, one or zero 43052C StandardID 43050C, one or zero 43064C BuyerID 43062C, and one or zero 43076C VendorID 43074C.

The ShipToLocation entity 43086C includes an InternalID 43098C, a StandardID 43008D, a BuyerID 43020D, and a VendorID 43032D. The InternalID 43098C is of type LocationInternalID 43002D. The StandardID 43008D is of type of LocationStandardID 43012D. The BuyerID 43020D is of type LocationPartyID 43024D. The VendorID 43032D is of type LocationPartyID 43036D. In one implementation, for each ShipFromLocation entity 43028C, there is one or zero 43000D InternalID 43098C, one or zero 43010D StandardID 43008D, one or zero 43022D BuyerID 43020D, and one or zero 43034D VendorID 43032D.

The ProductInformation package 43024C includes a Product entity 43044D of type BusinessTransactionDocumentProduct 43048D. There is one 46D Product entity 43044D for each Item entity 43012C.

The Product entity 43044D includes an InternalID 43056D, a StandardID 43066D, a BuyerID 43078D, a VendorID 43090D, a PackageQuantity 43002E, and a DiscontinuationIndicator 43012E. The InternalID 43056D is of type ProductInternalID 43060D. The StandardID 43066D is of type of ProductStandardID 43070D. The BuyerID 43078D is of type ProductPartyID 43082D. The VendorID 43090D is of type ProductPartyID 43094D. The PackageQuantity 43002E is of type Quantity 43006E. The DiscontinuationIndicator 43012E is of type ProductDiscontinuationIndicator 43016E. In one implementation, for each Product entity 43044D, there is one or zero 43058D InternalID 43056D, one or zero 43068D StandardID 43066D, one or zero 43080D BuyerID 43078D, one or zero 43092D VendorID 43090D, one or zero 43004E PackageQuantity 43002E, and one or zero 43014E DiscontinuationIndicator 43012E.

The Inventory package 42926C includes an Inventory entity 43020E of type ProductActivityItemInventory 43024E and a ConsigmentInventory entity 43082E of type ProductActivityItemInventory 43086E. There is one or zero 43022D Inventory entity 43020E for each Item entity 43012C and one or zero 43022D ConsignmentInventory entity 43082E for each Item entity 43012C.

The Inventory entity 43020E includes a VendorDependent Indicator 43023D, a StatusDateTime 43030E of type DateTime 43034E, an UnrestrictedUseQuantity 43040E of type Quantity 43044E, a QuanlityInspectionQuantity 43052E of type Quantity 43056E, a BlockedQuantity 43062E of type Quantity 43066E, and a PromotionQuantity 43072E of type Quantity 43076E. The VendorDependent Indicator 43023D has a cardanality of zero or one 43025D, and the type is GDT. In one implementation, for each Inventory entity 43020E, there is one or zero 43032E StatusDateTime 43030E, one or zero 43042E UnrestrictedUseQuantity 43040E, one or zero 43054E QuanlityInspectionQuantity 43052E, one or zero 43064E BlockedQuantity 43062E, and one or zero 43072E PromotionQuantity 43072E.

The ConsignmentInventory entity 43082E includes a StatusDateTime 43090E of type DateTime 43094E, an UnrestrictedUseQuantity 43098E of type Quantity 43002F, a QuanlityInspectionQuantity 43008F of type Quantity 43012F, a BlockedQuantity 43018E of type Quantity 43022F, and a PromotionQuantity 43028F of type Quantity 43032F. In one implementation, for each ConsignmentInventory entity 43082E, there is one or zero 43092E StatusDateTime 43090E, one or zero 43000F UnrestrictedUseQuantity 43098E, one or zero 43010F QuanlityInspectionQuantity 43008F, one or zero 43020E BlockedQuantity 43018E, and one or zero 43030F PromotionQuantity 43028F.

The Item entity 43012C includes a SalesTimeSeries 43038F, a PromotionSalesTimeSeries 43076F, a SalesForecastTimeSeries 43008G, a PromotionSalesForecastTimeSeries 43040G, an OrderForecastTimeSeries 43072G, a PromotionOrderForecastTimeSeries 43010H, a ConsumptionTimeSeries 43042H, a ConsumptionForecastTimeSeries 43074H, an OnOrderTimeSeries 43006I, and an OutofStockTimeSeries 43038I. The SalesTimeSeries 43038F is of type QuantityTimeSeries 43042F. The PromotionSalesTimeSeries 43076F is of type QuantityTimeSeries 43080F. The SalesForecastTimeSeries 43008G is of type QuantityTimeSeries 43012G. The PromotionSalesForecastTimeSeries 43040G is of type QuantityTimeSeries 43044G. The OrderForecastTimeSeries 43072G is of type QuantityTimeSeries 43076G. The PromotionOrderForecastTimeSeries 43010H is of type QuantityTimeSeries 43014H. The ConsumptionTimeSeries 43042H is of type QuantityTimeSeries 43046H. The ConsumptionForecastTimeSeries 43074H is of type QuantityTimeSeries 43078H. The OnOrderTimeSeries 43006I is of type QuantityTimeSeries 43010I. The OutofStockTimeSeries 43038I is of type QuantityTimeSeries 43042I. In one implementation, for each Item entity 43012C, there is one or zero 43040F SalesTimeSeries 43038F, one or zero 43078F PromotionSalesTimeSeries 43076F, one or zero 43010G SalesForecastTimeSeries 43008G, one or zero 43042G PromotionSalesForecastTimeSeries 43040G, one or zero 43074G OrderForecastTimeSeries 43072G, one or zero 43012H PromotionOrderForecastTimeSeries 43010H, one or zero 43044H ConsumptionTimeSeries 43042H, one or zero 43076H ConsumptionForecastTimeSeries 43074H, one or zero 43008I OnOrderTimeSeries 43006I, and one or zero 43040I OutofStockTimeSeries 43038I.

The SalesTimeSeries 43038F includes any number 43050F of SalesTimeSeries Items 43048F. Each SalesTimeSeries Item 43048F includes one 43058F ValidityPeriod

43056F of type DateTimePeriod 43060F and one 43068F Quantity 43066F of type Quantity 43070F.

The PromotionSalesTimeSeries 43076F includes any number 43078F of PromotionSalesTimeSeries Items 43086F. Each PromotionSalesTimeSeries Item 43086F includes one 43094F ValidityPeriod 43092F of type DateTimePeriod 43098F and one 43000G Quantity 43000G of type Quantity 43004G.

The SalesForecastTimeSeries 43008G includes any number 43020G of SalesForecastTimeSeries Items 43018G. Each SalesForecastTimeSeries Item 43018G includes one 43026G ValidityPeriod 43024G of type DateTimePeriod 43028G and one 43034G Quantity 43032G of type Quantity 43036G.

The PromotionSalesForecastTimeSeries 43040G includes any number 43052G of PromotionSalesForecastTimeSeries Items 43050G. Each PromotionSalesForecastTimeSeries Item 43050G includes one 43058G ValidityPeriod 43056G of type DateTimePeriod 43060G and one 43066G Quantity 43064G of type Quantity 43068G.

The OrderForecastTimeSeries 43072G includes any number 43084G of OrderForecastTimeSeries Items 43082G. Each OrderForecastTimeSeries Item 43082G includes one 43092G ValidityPeriod 43090G of type DateTimePeriod 43094G and one 43002H Quantity 43000H of type Quantity 43004H.

The PromotionOrderForecastTimeSeries 43010H includes any number 43022H of PromotionOrderForecastTimeSeries Items 43020H. Each PromotionOrderForecastTimeSeries Item 43020H includes one 43028H ValidityPeriod 43026H of type DateTimePeriod 43030H and one 43036H Quantity 43034H of type Quantity 43038H.

The ConsumptionTimeSeries 43042H includes any number 43054H of ConsumptionTimeSeries Items 43052H. Each ConsumptionTimeSeries Item 43052H includes one 43060H ValidityPeriod 43058H of type DateTimePeriod 43062H and one 43068H Quantity 43066H of type Quantity 43070H.

The ConsumptionForecastTimeSeries 43074H includes any number 43086H of ConsumptionForecastTimeSeries Items 43084H. Each ConsumptionForecastTimeSeries Item 43084H includes one 43092H ValidityPeriod 43090H of type DateTimePeriod 43094H and one 43000I Quantity 43098H of type Quantity 43002H.

The OnOrderTimeSeries 43006I includes any number 43018I of OnOrderTimeSeries Items 43016I. Each OnOrderTimeSeries Item 43016I includes one 43024I ValidityPeriod 43022I of type DateTimePeriod 43026I and one 43032I Quantity 43030I of type Quantity 43034I.

The OutofStockTimeSeries 43038I includes any number 43050I of OutofStockTimeSeries Items 43048I. Each OutofStockTimeSeries Item 43048I includes one 43058I ValidityPeriod 43056I of type DateTimePeriod 43060I and one 43068I Quantity 43066I of type Quantity 43070I.

w) Payment Due Interface

FIG. 431 depicts the message choreography for Payment Due Notification between to business entities, Invoice/Billing 43102 and Payment 43104.

The motivating business scenarios for the Payment Due Notification are the Procure to Stock and Sell from Stock (SFS) scenarios. After an incoming invoice is checked in BAC Invoicing, a message is sent to BAC Payment, generating an open payable there and thus triggering the subsequent payment process. Similarly, when a billing document is sent in BAC Billing, a message is sent to BAC Payment, generating an open receivable item there and thus enabling the assignment of incoming payments.

(1) Message Type Payment Due Notification

A PaymentDueNotification 43106 notifies an application (payment register), in which subsequent operative processing of payments takes place, about due dates (accounts receivable and accounts payable) of business partners. The message type PaymentDueNotification 43106 is based on the message data type PaymentDueMessage 43200, which is disclosed more fully in FIG. 432.

The PaymentDueNotification 43106 is used for checking an incoming invoice, creating an outgoing invoice, checking an incoming credit memo, and creating an outgoing credit memo. On receipt of a due date (accounts receivable and accounts payable) in the payment register, one or more open due date items are generated. These open items form the basis for the following process steps: (1) Clearing a business partner's receivables and payables; (2) A bank's payment orders; (3) Payment collections; (4) Assigning an incoming payment (account statement) to a receivable; (5) Dunning notices/reminders; and (6) Dispute management.

The creation and checking of an incoming invoice in Invoicing 43102 is independent of the processing of payables for payment in Payment 43104. Payables are also generated from credit memos for outgoing invoices (billing documents). Receivables are generated through the shipment of a billing document in Billing 43102 or a credit memo in Invoicing 43102. If the invoice is incorrect, for instance wrong amounts, a new invoice or credit memo is generally generated by Billing 43102 or received by Invoicing 43102 to correct the error. The sequence of messages sent to Payment 43104 is irrelevant for Payment 43104. If a reverse function is implemented in Invoicing 43102 or Billing 43102, for example to let the accounting clerk reverse an incorrect entry in an incoming invoice, this reversal can be notified to Payment 43104 with the PaymentDueCancelNotification 43108 message. This message is then processed by Payment 43104 after the related PaymentDueNotification 43106. As this is not a typical situation, serialization is not required. The reversal function and the PaymentDueCancelNotification 43108 message are not planned to be implemented initially; serialization can be avoided by tolerant coding in Payment 43104.

(2) Message Data Type Data Model

The complete data model for the Payment Due Notification is depicted in FIG. 432. The message data type PaymentDueMessage 43200 includes the PaymentDue Message entity 43202 included in the business document and the business information that is relevant for sending a business document in a message. The message data type PaymentDueMessage 43200 also includes a MessageHeader package 43204, and a PaymentDue package 43206. The message data type PaymentDueMessage 43200 makes the structure available for the message type PaymentDue and the relevant interfaces.

(a) Message Header Package

A MessageHeader package 43204 groups together the business information that is relevant for sending a business document in a message. The MessageHeader 43204 is not required for PaymentDueNotification 43106. An invoice or credit memo is transferred to Payment 43104 once. A message ID is not required since the reference can always be established with the ID of the invoice or credit memo. At most, the sender is known as the "system ID." The recipient is not known; Invoice and Billing 43102 know that this message is to be sent to the Payment 43104 application that is responsible for the payment process for the payment sender and payment recipient.

(b) Payment Due Package

The PaymentDue package 43206 groups together all the information that is required to generate due dates in a payment register. It includes a Payment Due entity 43208, a Party package 43210, a BusinessTransactionDocumentReference package 43212, and an Item package 43214.

(i) Payment Due Entity

PaymentDue entity 43208 indicates the type of due payments (for payment or expected) and their amounts. There is a 1:1 relationship 43209 between the PaymentDue entity 43208 and PaymentDueMessage 43202. For each invoice or credit memo that is uniquely identified as the base business document, PaymentDue entity 43208 receives one or more due date item (PaymentDueItems 43216; see below) with details of the type and amount of the payment due, the payment terms and the business partners involved.

PaymentDue 43208 includes a BaseBusinessTransactionDocumentID, a BaseBusinessTransactionDocumentTypeCode, and a BaseBusinessTransactionDocumentDate. The BaseBusinessTransactionDocumentID is the identification of the business document or source document on which the due date is based, and is of type GDT: BusinessTransactionDocumentID. The BaseBusinessTransactionDocumentTypeCode is the coded representation of the previously named business document or source document. Invoice and VendorInvoice are to be considered here. The BaseBusinessTransactionDocumentTypeCode is of type GDT: BusinessTransactionDocumentTypeCode. The BaseBusinessTransactionDocumentDate is the date of the business document or source document on which the due date is based, and is of type GDT: Date.

(ii) Party package

The Party package 43210 is a grouping of all business parties that may be involved in a due payment. It includes a PayerParty entity 43218, a PayeeParty entity 43220, a DebtorParty entity 43222, and a CreditorParty entity 43224. Default logic is used for all business partners: business partners who are specified at header level are used for all the items for which a corresponding partner is not explicitly transferred.

(a) Payer Party Entity

PayerParty entity 43218 (payment sender or payer) is a company or a person that pays for goods or services. PayerParty entity 43218 is of type GDT: BusinessTransactionDocumentParty, but includes the InternalID element. There is a 1:1 relationship 43219 between PaymentDue entity 43208 and PayerParty entity 43218. No other elements are required since the master data exists in the sender and receiver system to be able to operate correctly. PayerParty entity 43218 is always filled. The payment sender is always mapped in this business partner role. The role of PayerParty entity 43218 is known to CRM Billing (payer); in SRM Invoice Verification the payer party is the buying company (BuyerParty).

(b) Payee Party Entity

PayeeParty entity 43220 (payee) is a company or a person that receives payment for goods or services. PayeeParty entity 43220 is of type GDT: BusinessTransactionDocumentParty, but includes the InternalID element. There is a 1:1 relationship 43221 between PaymentDue entity 43208 and PayeeParty entity 43220. No other elements are required since the master data exists in the sender and receiver system to be able to operate correctly. PayeeParty entity 43220 is always filled. The payee is always mapped in this business partner role. The role of payee is known to SRM; in CRM Billing the payee is the billing unit.

(c) Debtor Party Entity

DebtorParty entity 43222 (customer, debtor) is the owner of payables. DebtorParty entity 43222 is of type GDT: BusinessTransactionDocumentParty, but includes the InternalID element. There is a 1:c relationship 43223 between PaymentDue entity 43208 and DebtorParty entity 43222. No other elements are required since the master data exists in the sender and receiver system to be able to operate correctly. One does not have to specify DebtorParty 43222. If DebtorParty entity 43222 is not filled, the payment sender (payer, BillFromParty) and DebtorParty entity 43222 (debtor) are identical. For an incoming invoice or credit memo, the buying company (BuyerParty) is mapped in this business partner role if it is different from the payment sender. For an outgoing invoice or credit memo, the sold-to party is mapped in this business partner role if it is different from the payment sender.

(d) Creditor Party Entity

CreditorParty entity 43224 (vendor, creditor) is the owner of the receivables. CreditorParty entity 43224 is of type GDT: BusinessTransactionDocumentParty, but includes the InternalID element. There is a 1:c relationship 43225 between PaymentDue entity 43208 and CreditorParty entity 43224. No other elements are required since the master data exists in the sender and receiver system to be able to operate correctly. One does not have to specify CreditorParty entity 43224. If CreditorParty entity 43224 is not specified, the payee and CreditorParty 43224 (vendor) are identical. For an incoming invoice or credit memo, the vendor is mapped in this business partner role if the vendor is different from the payee. For an outgoing invoice or credit memo, the billing unit is mapped in this business partner role if the billing unit is different from the payee.

(iii)Business Transaction Document Reference Package

The BusinessTransactionDocumentReference package 43212 groups all the references to business documents on which the due payments are based. It includes an OriginInvoiceReference entity 43226, an OriginVendorInvoiceReference entity 43228, and an InvoiceReference entity 43230.

(a) Origin Invoice Reference entity

OriginInvoiceReference entity 43226 is the reference to an outgoing invoice for which the business document or primary entry on which the current due date is based is a follow-up document. OriginInvoiceReference entity 43226 is of type GDT: BusinessTransactionDocumentParty, but includes the Element ID. There is a 1:c relationship 43227 between PaymentDue entity 43208 and OriginInvoiceReference entity 43226. The ItemID element is not required since reference is made to the document and not to an item. OriginInvoiceReference entity 43226 is filled if the document on which the current due date is based (BaseBusinessTransactionDocument) is a follow-on document to an outgoing invoice. An OriginInvoiceReference entity 43226 may be the original invoice number of a current credit memo.

(b) Origin Vendor Invoice Reference Entity

OriginVendorInvoiceReference entity 43228 is the reference to an incoming invoice for which the business document or primary entry on which the current due date is based is a follow-up document. OriginVendorInvoiceReference entity 43228 is of type GDT: BusinessTransactionDocumentReference, but includes the Element ID. There is a 1:c relationship 43229 between PaymentDue entity 43208 and Origin Vendor Invoice Reference entity 43228. The ItemID element is not required since reference is made to the document and not to an item. OriginVendorInvoiceReference entity 43228 is filled if the document on which the current due date is based (BaseBusinessTransactionDocument) is a follow-on document to an incoming invoice. An OriginVendorInvoiceReference entity 43228 may be the original invoice number of a current credit memo.

(c) Invoice Reference Entity

InvoiceReference entity 43230 is the reference to the invoice of the invoicing party. InvoiceReference 43230 is of type GDT: BusinessTransactionDocumentReference, but includes the Element ID. There is a 1:c relationship 43231 between PaymentDue entity 43208 and Invoice Reference entity 43230. The ItemID element is not required since reference is made to the document and not to an item. For incoming invoices, InvoiceReference entity 43230 is filled since the payment refers to this information. For incoming invoices, the ID of the incoming invoice (VendorInvoice) assigned by Invoicing is used in BaseBusinessTransactionDocumentID and not the ID of the invoice assigned by the invoicing party. For outgoing invoices, the payment references the invoice number included in this case in BaseBusinessTransactionDocumentID, and InvoiceReference entity 43230 need not be filled.

(iv) Payment Due Item Package

The PaymentDueItem package 43214 is a grouping of all information on a single due date item (receivable or payable). It includes a PaymentDueItem entity 43216, a PaymentInformation package 43232 and a Party package 43224.

(a) Payment Due Item Entity

PaymentDueItem entity 43216 describes a due date item (receivable or payable). A PaymentDueItem entity 43216 can contain additional details on payment terms and participating business partners as well as the type and amount of payment due. PaymentDueItem entity 43216 includes an Amount, a PaymentCurrency, a FixedExchangeRate, and a Group ID. The Amount is the amount to be paid in transaction currency (invoice currency). Incoming invoices and credit memos (document type "I01 VendorInvoice") are treated as payables, in other words a positive amount means increased payables and a negative amount means decreased payables. Outgoing invoices and credit memos (document type "I02 Invoice") are treated as receivables, in other words a positive amount means increased receivables and a negative amount means decreased receivables. The Amount is of type GDT: Amount. The PaymentCurrency is the payment currency, if it is different from the transaction currency, and is of type GDT: CurrencyCode. The FixedExchangeRate is used if a fixed exchange rate has been specified for payments in different currencies. The FixedExchangeRate is of type GDT: ExchangeRate. The Group ID is the payment grouping that groups multiple due date items from different PaymentDueNotifications into one payments (if this grouping is to be determined by Invoicing or Billing), and is of type GDT: BusinessTransactionDocumentItemGroupID. There is a 1:n relationship 43215 between PaymentDue entity 43208 and PaymentDueItem entity 43216.

(b) Payment Information Package

The PaymentInformation package 43232 is a grouping of all payment methods on a due date item. It includes a CashDiscountTerms entity 43236, which includes the payment conditions, and a PaymentForm entity 43238, which is the payment form.

(i) Cash Discount Terms entity

CashDiscountTerms entity 43236 includes the payment conditions of the due date item. CashDiscountTerms entity 43236 is of type GDT: CashDiscountTerms. There is a 1:1 relationship 43237 between PaymentDueItem entity 43216 and CashDiscountTerms entity 43236. CashDiscountTerms entity 43236 is always specified. The PaymentBaselineDate element is mandatory.

(ii) Payment Form Entity

PaymentForm entity 43238 is the way in which due date items are paid. This includes credit card details as well as the actual form of payment (invoice, collection, credit card, . . . ). PaymentForm entity 43238 is of type GDT: PaymentForm. There is a 1:c relationship 43239 between PaymentDueItem entity 43216 and PaymentForm entity 43238. If PaymentForm entity 43238 is not specified, the payment form stored in the master data of the business partner applies.

(c) Party Package

The Party package 43234 is a grouping of all business parties that may be involved in the due payment of an item. It includes a PayerParty entity 43240 and a PayeeParty entity 43242. The PaymentDueItemParty package 43234 is optional and overrides the header details.

(i) Payer Party Entity

PayerParty entity 43240 is the party who pays for the due items. PayerParty entity 43240 is of type GDT: BusinessTransactionDocumentParty. There is a 1:c relationship 43241 between PaymentDueItem entity 43216 and PayerParty entity 43240. PayerParty entity 43240 includes an InternalID, which is of type GDT: PartyID.

(ii) Payee Party Entity

PayeeParty entity 43242 is the party who receives payment for the due items. PayeeParty entity 43242 is of type GDT: BusinessTransactionDocumentParty. There is a 1:c relationship 43243 between PaymentDueItem entity 43216 and PayeeParty entity 43242.

(3) Message Data Type Element Structure

FIG. 433 depicts the element structure for Payment Due Notification. The element structure is similar to the data model, but provides additional information regarding the details of the interface. The element structure identifies the different packages 43300 in the interface, and represents the entities at various levels within the interface. As depicted in FIG. 433, the interface for Payment Due Notification includes five levels 43302, 43304, 43306, 43308, and 43310. The outermost package of this interface is a PaymentDueMessage package 43320, which includes a PaymentDueMessage entity 43322 at the first level 43302. The PaymentDueMessage entity 43322 is of type message data type ("MDT") 43324 "PaymentDueMessage" 43326.

Referring to FIG. 433, the PaymentDueMessage package 43320 includes a PaymentDue package 43328. The PaymentDue package 43328 includes a PaymentDue entity 43330 at the second level 43304 and the following packages: a Party package 43362, a BusinessTransactionDocumentReference 43364, and an Item package 43366.

The PaymentDue entity 43330 is of type AGDT 43334 "PaymentDue" 43336. There is one 43332 PaymentDue entity 43330 for each PaymentDue package 43328.

The PaymentDue entity 43330 includes a BaseBusinessTransactionDocumentID entity 43338, a BaseBusinessTransactionDocumentCode entity 43346, and a BaseBusinessTransactionDocumentDate entity 43354 at the third level 43306. The BaseBusinessTransactionDocumentID entity 43338 is of type BGDT 43342 "BaseBusinessTransactionDocumentID" 43344. There is one 43340 BaseBusinessTransactionDocumentID entity 43338 for each PaymentDue entity 43330. The BaseBusinessTransactionDocumentCode entity 43346 is of type BGDT 43350 "BaseBusinessTransactionDocumentCode" entity 43352. There is one 43348 BaseBusinessTransactionDocumentCode entity 43346 for each PaymentDue entity 43330. The BaseBusinessTransactionDocumentDate entity 43354 is of type BGDT 43358 "Date" 43360. There is one 43356 BaseBusinessTransactionDocumentDate entity 43354 for each PayrnentDue entity 43330.

Referring to FIG. 433, Party package 43362 includes four entities at the third level 43306: a PayerParty entity 43368, a PayeeParty entity 43384, a DebtorParty entity 43300A, and a CreditorParty entity 43316A. PayerParty entity 43368 is of the type AGDT 43372, "BusinessTransactionDocument- Party" 43374. There is one 43370 PayerParty entity 43368 for each Party package 43362. PayerParty entity 43368 includes an InternalID entity 43376 at the fourth level 43308. The InternalID entity 43376 is of the type BGDT 43380 "PartyIID" 43382. There is one 43378 InternalID entity 43376 for each PayerParty entity 43368.

The PayeeParty entity 43384 is of the type AGDT 43388, "BusinessTransactionDocumentParty" 43390. There is one 43386 PayeeParty entity 43384 for each Party package 43362. PayeeParty entity 43384 includes an InternalID entity 43392 at the fourth level 43308. The InternalID entity 43392 is of the type BGDT 43396 "PartyID" 43398. There is one 43394 InternalID entity 43392 for each PayeeParty entity 43384. The DebtorParty entity 43300A is of the type AGDT 43304A, "BusinessTransactionDocumentParty" 43306A. There is zero or one 43302A DebtorParty entity 43300A for each Party package 43362. DebtorParty entity 43300A includes an InternalID entity 43308A at the fourth level 43208. The InternalID entity 43308A is of the type BGDT 43312A "PartyID" 43314A. There is one 43310A InternalID entity 43308A for each DebtorParty entity 43300A.

The CreditorParty entity 43316A is of the type AGDT 43320A, "BusinessTransactionDocumentParty" 43322A. There is zero or one 43318A CreditorParty entity 43316A for each Party package 43362. CreditorParty entity 43316A includes an InternalID entity 43324A at the fourth level 43308. The InternalID entity 43324A is of the type BGDT 43328A "PartyID" 43330A. There is one 43326A InternalID entity 43324A for each CreditorParty 43316A.

Referring to FIG. 433, the BusinessTransactionDocumentReference package 43364 includes an OriginInvoiceReference entity 43332A, an OriginVendorInvoiceReference entity 43348A, and an InvoiceReference entity 43364A at the third level 43306.

The OriginInvoiceReference entity 43332A is of the type AGDT 43336A, "BusinessTransactionDocumentReference" 43338A. There is zero or one 43334A OriginInvoiceReference entity 43332A for each BusinessTransactionDocumentReference package 43364. OriginInvoiceReference entity 43332A includes an ID entity 43340A at the fourth level 43308. The ID entity 43340A is of the type BGDT 43344A "BusinessTransactionDocumentID" 43346A. There is one 43342A ID entity 43340A for each OriginInvoiceReference entity 43332A.

The OriginVendorInvoiceReference entity 43348A is of the type AGDT 43352A, "BusinessTransactionDocumentReference" 43354A. There is zero or one 43350A OriginVendorInvoiceReference entity 43348A for each BusinessTransactionDocumentReference package43364. OriginVendorInvoiceReference entity 43348A includes an ID entity 43356A at the fourth level 43308. The ID entity 43356A is of the type BGDT 43360A "BusinessTransactionDocumentID" 43362A. There is one 43358A ID entity 43356A for each OriginVendorInvoiceReference entity 43348A.

The InvoiceReference entity 43364A is of the type AGDT 43368A, "BusinessTransactionDocumentReference" 43370A. There is zero or one 43366A InvoiceReference entity 43364A for each BusinessTransactionDocumentReference package 43364. InvoiceReference entity 43364A includes an ID entity 43372A at the fourth level 43308. The ID entity 43372A is of the type BGDT 43376A "BusinessTransactionDocumentID" 43378A. There is one 43374A ID entity 43372A for each InvoiceReference entity 43364A.

Referring to FIG. 433, the Item package 43366 includes an Item entity 43380A at the third level 43306 and two packages: a PaymentInformation package 43320B and a Party package 43322B. The Item entity 43380A is of the type AGDT 43384A "PaymentDueItem" 43386A.

There is at least one 43382A Item entity 43380A for each Item package 43366.

The Item entity 43380A includes an Amount entity 43388A, a Payment Currency entity 43396A, a Fixed Exchange Rate entity 43304B, and a GroupID entity 43312B at the fourth level 43308. The Amount entity 43388A is of the type BGDT 43392A "Amount" 43394A. There is one 43390A Amount entity 43388A for each Item entity 43380A. The Payment Currenty entity 43396A is of the type BGDT 43300B "CurrencyCode" 43302B. There is zero or one 43398A PaymentCurrency entity 43396A for each Item entity 43380A. The Fixed Exchange Rate entity 43304B is of the type AGDT 43308B "ExchangeRate" 43310B. There is zero or one 43306B FixedExchangeRate entity 43304B for each Item entity 43380A. The GroupID entity 43312B is of the type BGDT 43316B "BusinessTransactionDocumentItemGroupID" 43318B. There is zero or one 43314B GroupID entity 43312B for each Item entity 43380A.

Referring to FIG. 433, the PaymentInformation package 43320B includes a CashDiscountTerms entity 43324B and a PaymentFormCode 43332B at the fourth level 43308. The CashDiscountTerms entity 43324B is of a type AGDT 43328B "CashDiscountTerms" 43330B. There is one 43326B CashDiscountTerrns entity 43324B for each PaymentInformation package 43320B. The PaymentFormCode 43332B is of a type AGDT 43336B "PaymentFormCode" 43338B. There is zero or one 43334B PaymentFormCode 43332B for each PaymentInformation package 43320B.

Referring to FIG. 433, the Party package 43322B includes a PayerParty entity 43340B and a PayeeParty entity 43356B at the fourth level 43308. The PayerParty entity 43340B is of a type AGDT 43344B "BusinessTransactionDocumentParty" 43346B. There is zero or one 43342B PayerParty entity 43340B for each Party package 43322B. The PayerParty entity 43340B includes an InternalID entity 43348B at the fifth level 43310. The InternalID entity 43348B is of the type BGDT 43352B "PartyID" 43354B. There is one 43350B InternalID entity 43348B for each PayerParty entity 43340B.

The PayeeParty entity 43356B is of the type AGDT 43360B "BusinessTransactionDocumentParty" 43362B. There is zero or one 43358B PayeeParty entity 43356B for each Party package 43322B.

x) Order ID Assignment Interface

The OrderIDAssignmentNotification message allows a buyer to assign a vendor order numbers for identifying "purchase orders triggered by the vendor." This situation occurs in business scenarios where companies delegate planning of replenishment deliveries to their vendors. Contrary to the standard ordering process, the purchase orders in these scenarios are created by the vendors themselves rather than being triggered by the buyer. This means that the buyer and vendor first agree on the purchase order numbers that are to be used.

The OrderIDAssignmentNotification message is exchanged between the execution system of a sold-to party (buyer) and the Inventory Collaboration Hub (ICH) of a vendor as part of the "Responsive Replenishment (RR)" business scenario. In this scenario, the ICH performs the "planning" function, while the customer's/buyer's backend system performs the "purchasing" function.

(1) Message Type Order ID Assignment Notification

OrderIDAssignmentNotification is a message that allows a buyer to assign a vendor order numbers for identifying "purchase orders triggered by the vendor." The structure of the message type OrderIDAssignmentNotification is specified in the message data type OrderIDAssignmentMessage. Methods and systems consistent with the subject matter described herein use the package template for a BusinessTransaction-Document for an SCM Master Data depicted in FIG. 270B to derive the OrderIDAssignment interface.

(2) Message Choreography

FIG. 434 shows the message choreography that describes the possible logical sequence of the messages that may be used to realize the scenario.

A buyer 43402 can use an OrderIDAssignmentNotification message 43408 to transfer valid purchase order numbers to a vendor's "Supply Chain Planning" system 43404 for creating replenishment orders. These replenishment orders are transferred from the vendor's "Supply Chain Planning" system 43404 to his "Supply Chain Execution" system 43406 using a ReplenishmentOrderNotification message 43410. The "Supply Chain Execution" system 43406 checks the availability of the required products and uses a ReplenishmentOrderConfirmation message 43412 to confirm that the replenishment orders have been fulfilled. The buyer 43402 is then informed of this with a VendorGeneratedOrderNotification message 43414. The buyer 43402 can then send an optional order confirmation to the vendor using a VendorGeneratedOrderConfirmation message 43416. If the two business partners collaborate very closely, this order confirmation might not be necessary. In this case, the VendorGeneratedOrderNotification creates a purchase order directly on the buyer side.

(3) Order ID Assignment Message Message Data Type

FIG. 435 depicts a data model of an OrderIDAssignment-Notification process. An OrderIDAssignmentMessage message package 43500 includes the OrderIDAssignment object in the business document and the business information that is relevant for sending a business document in a message. The OrderIDAssignmentMessage message package 43500 includes a MessageHeader package 43502, a OrderIDAssignment package 43504, and an OrderIDAssignmentMessage entity 43506. The OrderIDAssignmentMessage message package 43500 makes the structure available for the relevant message types and message interfaces.

(a) Message Header Package

The MessageHeader package 43502 groups together the business information that is relevant for sending a business document in a message. The MessageHeader package 43502 includes a MessageHeader entity 43508, a SenderParty entity 43512 and a RecipientParty entity 43514. There is a 1:1 relationship 43510 between the OrderIDAssignmentMessage entity 43506 and the Message Header entity 43508. There is a 1:c relationship 43516 between the Message Header entity 43508 and the SenderParty entity 43512. There is a 1:c relationship 43518 between the Message Header entity 43508 and the RecipientParty entity 43514.

(i) Message Header

The MessageHeader entity 43508 groups together the business information from the point of view of the sending application to identify the business document in a message, to provide information about the sender, and to provide any information about the recipient.

The MessageHeader entity 43508 is divided into a SenderParty entity 43512 and a RecipientParty entity 43514. The header is of type GDT: BusinessDocumentMessageHeader, and includes an ID that identifies the business document in the technical message and a CreationDateTime, which is the creation date of a business document in the technical message.

(ii) Sender Party

A SenderParty is the party responsible for sending a business document at business application level. The SenderParty entity 43512 is of type GDT: BusinessDocumentMessageHeaderParty.

(iii) Recipient Party

A RecipientParty is the party responsible for receiving a business document at business application level. The RecipientParty entity 43514 is of type GDT: BusinessDocumentMessageHeaderParty.

(b) Order ID Assignment Package

The OrderIDAssignment package 43504 groups the OrderIDAssignment and its packages. The OrderIDAssignment package 43504 includes a Party package 43520, an OrderIDAssignmentItem package 43522 and an OrderIDAssignment entity 43524. There is a 1:1 relationship 43526 between the OrderIDAssignmentMessage entity 43506 and the OrderIDAssignment entity 43524.

(i) Order ID Assignment

An OrderIDAssignment represents an assignment of order numbers from a buyer to a vendor/seller or, more generally, from an ordering party to an agent. The OrderIDAssignment entity 43524 includes a description at item level of the order numbers that can or should be used to identify orders created by the seller for a specific combination of delivery location, marketing promotion, and purchasing group at the buyer. At present, purchase orders are supported as the order category. In the future, however, production orders, stock transport orders, shipment orders, and so on, will also be possible.

(ii) Party Package

The Party package 43520 groups the business partners that are relevant for assigning order numbers. It includes a BuyerParty entity 43528 and a VendorParty entity 43530. There is a 1:1 relationship 43532 between the OrderIDAssignment entity 43524 and the BuyerParty entity 43528. There is a 1:1 relationship 43534 between the OrderIDAssignment entity 43524 and the VendorParty entity 43530.

(a) Buyer Party

BuyerParty is the purchasing company that assigns the order numbers. The BuyerParty entity 43528 is of type GDT: BusinessTransactionDocumentParty, where the StandardID, BuyerID, and VendorID are used. Either the StandardID or the partner-role-specific ID of the receiving partner is used. In other words, for Supplier Collaboration scenarios, use the BuyerID, and for Customer Collaboration scenarios, use the VendorID. Due to the different possibilities for ID use, all ID elements of the particular "Party" are optional.

(b) Vendor Party

VendorParty is the delivering company to which the order numbers are assigned. The VendorParty entity 43530 is of type GDT: BusinessTransactionDocumentParty, where the StandardID, BuyerID, and VendorID are used.

(c) ProductRecipientParty

ProductRecipientParty 43089B includes an InternalID 43091B, a StandardID 43099B, a PartyStandardID, and a BuyerID 43007C.

(iii) Order ID Assignment Item Package

The OrderIDAssignmentItem package 43522 groups the OrderIDAssignmentItem and its packages. It includes a Location package 43536, a Promotion package 43538, and an OrderIDAssignmentItem entity 43540. There is a 1:n relationship 43542 between the OrderIDAssignment entity 43524 and the OrderIDAssignmentItem entity 43540.

The OrderIDAssignmentItem entity 43540 describes the order numbers that are admissable and should be used to identify orders created by the seller for a specific combination of delivery location, marketing promotion, and purchasing group at the buyer.

The OrderIDAssignmentItem entity 43540 includes a BuyerPurchasingGroupID and a PurchaseOrderIDRange. The BuyerPurchasingGroupID is a unique identifier for a group of purchasers at the buyer who are responsible for certain purchasing activities. In-house, the purchasing group is responsible for procuring a particular product or class of products; externally, the group acts as a contact person for vendors. The BuyerPurchasingGroupID is of type GDT: PurchasingGroupID. The PurchaseOrderIDRange is the value range for permitted purchase order numbers with a FromID and a ToID. The FromID is the first purchase order permitted, and is of type GDT: BusinessTransactionDocumentID. The ToID is the last purchase order permitted, and is of type GDT: BusinessTransactionDocumentID.

(iv) Location Package

The Location package 43536 groups the locations that are relevant for assigning order numbers. It includes a ShipToLocation entity 43544. There is a 1:c relationship 43546 between the OrderIDAssignment entity 43540 and the ShipToLocation entity 43544.

The ShipToLocation is the place to which a product is to be delivered. ShipToLocation entity 43544 is of type GDT: BusinessTransactionDocumentShipToLocation, where the StandardID, BuyerID, and VendorID are used. Either the StandardID, BuyerID, or VendorID is used. Due to the different possibilities for ID use, all the ID elements are optional.

(v) Promotion Package

The Promotion package 43538 groups all the data regarding marketing promotions that are relevant for assigning order numbers. The Promotion package 43538 includes a Promotion entity 43548. There is a 1:c relationship 43550 between the OrderIDAssignmentItem entity 43540 and the Promotion entity 43548.

Promotion includes data that identifies a marketing promotion that is planned by the buyer for the product to be ordered. The Promotion entity 43548 includes an InternalID, a BuyerID, and a VendorID. The InternalID identifies the marketing promotion (for communication within the company), and is of type GDT: PromotionInternalID. The BuyerID identifies the buyer of products for the marketing promotion, and is of type GDT: PromotionPartyID. The VendoriD identifies the vendor of products for the marketing promotion, and is of type GDT: PromotionPartyID.

(4) Element Structure for the Message Data Type

FIG. 436 depicts the element structure for OrderIDAssignmentNotification. The element structure identifies the different packages 43600 in the interface, and represents the entities at various levels within the interface. As shown in FIG. 436, the interface for OrderIDAssignmentNotification includes five levels 43602, 43604, 43606, 43608, and 43610. The element structure identifies the cardinality 43612 of each element, provides a Data type name 43614 for each element, and, where relevant, provides the length 43618 for an element.

The outermost package of this interface is OrderIDAssignmentMessage package 43622, which includes an OrderIDAssignmentMessage entity 43624 at the first level 43602. The OrderIDAssignmentMessage entity 43624 is of data type 43614 OrderIDAssignmentMessage 43626.

The OrderIDAssignmentMessage package 43622 includes a MessageHeader package 43630 and an OrderIDAssignment package 43632. The MessageHeader package 43630 includes a MessageHeader entity 43634 at the second level 43604. The MessageHeader entity 43634 has a cardinality 43612 of one 43636 and a data type 43614 BusinessDocumentMessageHeader 43638.

The MessageHeader entity 43634 includes an ID 43644, a ReferenceID 43654, a CreationDateTime 43664, a SenderParty entity 43672, and a RecipientParty entity 43698 at the third level 43606. The ID 43644 has a cardinality 43612 of one 43646, a data type 43614 "BusinessDocumentMessageID 43648, and a length 43618 of 1 to 35 43650. The ReferenceID 43654 has a cardinality 43612 of zero or one 43656, a data type 43614 BusinessDocumentMessageID 43658 and a length 43618 of 1 to 35 43660. The CreationDateTime 43664 has a cardinality 43612 of one 43666 and a data type 43614 DateTime 43668. The Sender Party entity 43672 has a cardinality 43612 of zero or one 43674 and a data type 43614 BusinessDocumentMessageHeaderParty 43676. The RecipientParty entity 43698 has a cardinality 43612 of zero or one 43600A and a data type 43614 BusinessDocumentMessageHeaderParty 43602A.

The SenderParty entity 43672 includes an InternalID 43682 and a StandardID 43690 at the fourth level 43608. The InternalID 43682 has a cardinality 43612 of zero or one 43684 and a data type 43614 PartyInternalID 43686. The StandardID 43690 has a cardinality 43612 of any number 43692 and a data type 43614 PartyStandardID 43694.

The RecipientParty entity 43698 includes an InternalID 43608A and a StandardID 43616A at the fourth level 43608. The InternalID 43608A has a cardinality 43612 of zero or one 43610A and a data type 43614 PartyInternalID 43612A. The StandardID 43616A has a cardinality 43612 of any number 43618A and a data type 43614 PartyStandardID 43620A.

The OrderIDAssignment package 43632 includes an OrderIDAssignment entity 43624A at the second level 43604, a Party package 43650A, and an Item package 43652A. The OrderIDAssignment entity 43624A has a cardinality 43612 of one 43626A and a data type 43614 OrderIDAssignment 43628A. The OrderIDAssignment entity 43624A includes an ID 43632A and a CreationDateTime 43642A at the third level 43606. The ID 43632A has a cardinality 43612 of zero or one 43634A, a data type 43614 BusinessTransactionDocumentID 43636A, and a length 43618 of 1 to 35 43638A. The CreationDateTime 43642A has a cardinality 43612 of one 43644A and a data type 43614 DateTime 43646A.

The Party package 43650A includes a BuyerParty entity 43654A and a VendorParty entity 43604B at the third level 43606. The BuyerParty entity 43654A had a cardinality 43612 of one 43656A and a data type 43614 BusinessTransactionDocumentParty 43658A. The VendorParty entity 43604B had a cardinality 43612 of one 43606B and a data type 43614 BusinessTransactionDocumentParty 43608B.

The Party package 43650A also includes a ProductRecipientParty entity 43089B. The ProductRecipientParty entity 43089B includes an Internal entity 43091B, a StandardID entity 43099B, a BuyerID entity 43007C, and a VendorID 43015C. The InternalID entity 43091B with a cardinality of zero or one 43093B, and a data type GDT 43095B and a name PartyInternalID 43097B. The StandardID entity 43099B may have any number of cardinality 43001C, the data type is GDT 43003C, and the name is PartyStandardID 43005C. The BuyerID entity 43007C has a cardinality of zero or one 43009C, the type is GDT 43011C, and the name is PartyPartyID 43013C. The VendorID entity 43015C has a cardinality of zero or one 43017C, the type is GDT 43019C, and the name is PartyPartyID 43021C.

The BuyerParty entity 43654A includes an InternalID 43664A, a StandardID 43674A, a BuyerID 43684A, and a VendorID 43694A at the fourth level 43608. The InternalID 43664A has a cardinality 43612 of zero or one 43666A, a data type 43614 of PartyInternalID 43668A, and a length 43618 of 1 to 20 43670A. The StandardID 43674A has a cardinality 43612 of any number 43676A, a data type 43614 PartyStandard ID 43678A, and a length 43618 of 1 to 13 or 1 to 9 43680A. The BuyerID 43684A has a cardinality 12 of zero or one 43686A, a data type 43614 PartyPartyID 43688A, and a length 43618 of 1 to 20 43690A. The VendorID 43694A has a cardinality 43612 of zero or one 43696A, a data type 43614 PartyPartyID 43698A, and a length 43618 of 1 to 20 43600B.

The VendorParty entity 43604B includes an InternalID 43614B, a StandardID 43624B, a BuyerID 43634B, and a VendorID 43644B at the fourth level 43608. The InternalID 43614B has a cardinality 43612 of zero or one 43616B, a data type 43614 PartyInternalID 43618B, and a length 43618 of 1 to 20 43620B. The StandardID 43624B has a cardinality 43612 of any number 43626B, a data type 43614 PartyStandardID 43628B, and a length 43618 of 1 to 13 or 1 to 9 43630B. The BuyerID 43634B has a cardinality 43612 of zero or one 43636B, a data type 43614 of PartyPartyID 43638B, and a length 43618 of 1 to 20 43640B. The VendorID 43644B has a cardinality 43612 of zero or one 43646B, a data type 43614 PartyPartyID 43648B, and a length 43618 of 1 to 20 43650B.

The Item package 43652A includes a Location package 43662B and a Promotion package 43664B, as well as a BuyerPurchasingGroupID 43656C and a PurchaseOrderIDRange 43666C at the fourth level 43608. The Item package 43652A also includes an Item entity 43654B at the third level 43606. The Item entity 54B has a cardinality 43612 of at least one 43656B and a data type 43614 OrderIDAssignmentItem 43658B.

The Location package 43662B includes a ShipToLocation entity 43666B at the fourth level 43608. The ShipToLocation entity 43666B has a cardinality 43612 of zero or one 43668B and a data type 43614 BusinessTransactionDocumentShipToLocation 43670B. The ShipToLocation entity 43666B includes an InternalID 43676B, a StandardID 43686B, a BuyerID 43696B, and a VendorID 43606C at the fifth level 43610. The InternalID 43676B has a cardinality 43612 of zero or one 43678B, a data type 43614 LocationInternalID 43680B, and a length 43618 of 1 to 20 43682B. The StandardID 43686B has a cardinality 43612 of any number 43688B, a data type 43614 LocationStandardID 43690B, and a length 43618 of 1 to 13 43692B. The BuyerID 43696B has a cardinality 43612 of zero or one 43698B, a data type 43614 LocationPartyID 43600C, and a length 43618 of 1 to 20 43602C. The VendorID 43606C has a cardinality 43612 of zero or one 43608C, a data type 43614 of LocationPartyID 43610C, and a length 43618 of 1 to 20 43612C.

The Promotion package 43664B includes a Promotion entity 43616C at the fourth level 43608. The Promotion entity 43616C has a cardinality 43612 of zero or one 43618C, a data type 43614 Promotion 43620C, and a length 43618 of 1 to 35 43622C. The Promotion entity 43616C includes an InternalID 43626C, a BuyerID 43636C, and a VendorID 43646C at the fifth level 43610. The InternalID 43626C has a cardinality 43612 of zero or one 43628C, a data type 43614 PromotionInternalID 43630C, and a length 43618 of 1 to 20 43632C. The BuyerID 43636C has a cardinality 43612 of zero or one 43638C, a data type 43614 PromotionPartyID 43640C, and a length 43618 of 1 to 20 43642C. The VendorID 43646C has a cardinality 43612 of zero or one 43648C, a data type 43614 PromotionPartyID 43650C, and a length 43618 of 1 to 20 43652C.

The BuyerPurchasingGroupID 43656C at the fourth level 43608 of the Item package 52A has a cardinality 43612 of zero or one 43658C, a data type 43614 PurchasingGroupID 43660C, and a length 43618 of 1 to 20 43662C.

The PurchaseOrderIDRange 43666C at the fourth level 43608 of the Item package 52A has a cardinality 43612 of one 43668C and a data type 43614 PurchaseOrderIDRange 43670C. The PurchaseOrderIDRange 43666C includes a FromID 43674C and a ToID 43684C at the fifth level 43610. The FromID 43674C has a cardinality 43612 of one 43676C, a data type 43614 of BusinessTransactionDocumentID 43678C, and a length 43618 of 1 to 35 43680C. The ToID 43684C has a cardinality 43612 of one 43686C, a data type 43614 BusinessTransactionDocumentID 43688C, and a length 43618 of 1 to 35 43690C.

y) Product Demand Influencing-Event Interface

The ProductDemandInfluencingEventNotification message is a notification of an event that influences the demand. A ProductDemandInfluencingEvent can be a sporting event, school vacation, or a price change, for example. Usually, however, it is probably a promotional event, that is, a promotion. A promotion is a marketing activity between consumer goods industry and retail in a limited timeframe to increase brand capital, mindshare, and market share, to boost sales volumes, or to position new products or product groups. For the EAN.UCC, the equivalent of this message is called a RetailEvent.

The ProductDemandInfluencingEventNotification message is sent within the Business Scenarios "Responsive Replenishment" and "Collaborative Planning, Forecasting, and Replenishment (CPFR)" in a cross-company variant from a buyer (retail company) to a vendor (consumer products manufacturer) or in a variant within a company from a system that creates promotions to a planning system, for example.

(1) Message Type Product Demand Influencing Event Notification

A ProductDemandInfluencingEventNotification is a notice about an event that influences the sale or demand of products. The structure of the message type ProductDemandInfluencingEventNotification is specified by the message data type ProductDemandInfluencingEventMessage. Methods and systems consistent with the subject matter described herein use the package template for a BusinessTransactionDocument for an SCM Master Data depicted in FIG. 270B to derive the ProductDemandInfluencingEvent interface.

(2) Message Choreography

FIG. 437 depicts a message choreography for an exemplary product demand influencing event notification process. The message choreography of scenario "CPFR" describes the possible logical sequence of the message types necessary for the scenario realization.

A buyer 43700 sends long to mid-term demand information that is related to an event to a vendor 43702 in the form of a ProductDemandInfluencingEventNotification message 43704. Together with product forecast information in a ProductForecastNotification message 43706 sent by the buyer 43700, or with short-term incidental current sales information in a ProductActivityNotification message 43708, this information can be used by the vendor 43702 for the creation of a forecast for the product demand of the buyer 43700. In the case of a cooperative settlement process between the buyer 43700 and vendor 43702, the vendor 43702 can send a revision of the product forecast (sent by the buyer 43700) back to this buyer 43700 in a ProductForecastRevisionNotification message 43710, and in turn, the buyer 43700 can respond with an updated revision in a second ProductForecastRevisionNotification message 43712.

(3) Message Type Product Demand Influencing Event Message

FIG. 438 depicts the data model for an exemplary product demand influencing event notification. The message data type ProductDemandInfluencingEventMessage includes a ProductDemandInfluencingEventMessage package 43802 that includes the ProductDemandInfluencingEvent object included in the business document and the business information relevant for sending a business document in a message. ProductDemandInfluencingEventMessage package 43802 includes a MessageHeader package 43804, a ProductDemandInfluencingEvent package 43806, and a ProductDemandInfluencingEventMessage entity 43808. The message data type ProductDemandInfluencingEventMessage provides the structure for the message type ProductDemandInfluencingEventNotification and the relevant interfaces.

(a) Message Header Package

The MessageHeader package 43804 groups together the business information that is relevant for sending a business document in a message. It includes a MessageHeader entity 43810, a SenderParty entity 43814 and a RecipientParty entity 43816. There is a 1:1 relationship 43812 between the ProductDemandInfluencingEventMessage entity 43808 and the MessageHeader entity 43810. There is a 1:c relationship 43818 between the MessageHeader entity 43810 and the SenderParty entity 43814. There is a 1:c relationship 43820 between the MessageHeader entity 43810 and the RecipientParty entity 43816.

(i) Message Header

A MessageHeader groups together the business information from the perspective of the sending application information to identify the business document in a message, information about the sender, and any information about the recipient. The MessageHeader entity 43810 is divided into a SenderParty and a RecipientParty. It is of type GDT: BusinessDocumentMessageHeader. The MessageHeader entity 43810 includes an ID and a CreationDateTime.

(ii) Sender Party

A SenderParty is the party responsible for sending a business document at business application level. The SenderParty entity 43814 is of type GDT: BusinessDocumentMessageHeaderParty. InternalID and StandardID are used.

(iii) Recipient Party

A RecipientParty is the party responsible for receiving a business document at business application level. The RecipientParty entity 43816 is of type GDT: BusinessDocumentMessageHeaderParty. InternalID and StandardID are used.

(b) Product Demand Influencing Event Package

The ProductDemandInfluencingEvent package 43806 groups together the ProductDemandInfluencingEvent with its packages. The ProductDemandInfluencingEvent package 43806 includes a Party package 43822, a Scheduling package 43824, a ProductDemandInfluencingEventItem package 43826 and a ProductDemandInfluencingEvent entity 43828. There is a 1:1 relationship 43830 between the ProductDemandInfluencingEventMessage entity 43808 and the ProductDemandInfluencingEvent entity 43828.

(i) Product Demand Influencing Event

A ProductDemandInfluencingEvent describes a demand influencing event and its effects on the demand. The ProductDemandInfluencingEvent entity 43828 specifies event dates (see Scheduling Package) and participating business partners. The ProductDemandInfluencingEvent entity 43828 is divided into items (see ProductDemandInfluencingEventItem Package) that each contain the effects of the event on the expected sales quantities with regard to a ship-to party location and a product.

The ProductDemandInfluencingEvent entity 43828 includes an InternalID, a BuyerID, a VendorID, a Name, a TypeCode, a StatusCode, a Recurrence, a PlanningPeriod, an ExecutingPeriod, an AdvertisementPeriod, and a Note. The InternalID is of type GDT: BusinessTransactionDocumentID, and is the proprietary identifier for the event that is used when both sender and recipient can access shared master data (extended enterprise). The BuyerID is of type GDT: BusinessTransactionDocumentID, and is the identifier that is used by the BuyerParty for this event. The VendorID is of type GDT: BusinessTransactionDocumentID, and is the identifier that is used by the VendorParty for this event. The Name is of type GDT: Name, and is the name of the event. The TypeCode is of type GDT: ProductDemandInfluencingEventTypeCode, and specifies the type of event (for example, SportEvent). The StatusCode is of type GDT: ProductDemandInfluencingEventStatusCode, and specifies the status of the event (for example, Active, Completed, and so on). The Recurrence of type GDT: Recurrence, and specifies the frequency of periodically recurring events. The PlanningPeriod is of type GDT: DateTimePeriod, and is the period in which the event is planned. The ExecutingPeriod is of type GDT: DateTimePeriod, and is the period in which the event takes place. The AdvertisementPeriod is of type GDT: DateTimePeriod, and is the period in which the event is advertised. The Note is of type GDT: Note, and is a language-independent note.

(ii) Party Package

The Party package 43822 groups together the business partners between which the marketing activity (event) is to take place. The Party package 43822 includes a BuyerParty entity 43832 and a VendorParty entity 43834. There is a 1:1 relationship 43836 between the ProductDemandInfluencingEvent entity 43828 and the BuyerParty entity 43832. There is a 1:1 relationship 43838 between the ProductDemandInfluencingEvent entity 43828 and the VendorParty entity 43834.

For communication within the company (with common master data), use the InternalID for all party entity types. For cross-company communication (with business-partner-specific master data), use for all party entity types either the StandardID or the partner-role-specific ID of the receiving partner, for example, for Supplier Collaboration scenarios, use the BuyerID, and for Customer Collaboration scenarios, use the VendorID. Due to the different possibilities for ID use, all ID elements of the particular party are optional.

(a) Buyer Party

A BuyerParty is the purchasing company. The BuyerParty entity 43832 is of type GDT: BusinessTransactionDocumentParty, where the InternalID, the StandardID, the BuyerID, and the VendorID are used.

(b) Vendor Party

A VendorParty is the delivering company. The VendorParty entity 43834 is of type GDT: BusinessTransactionDocumentParty, where the InternalID, the StandardID, the BuyerID, and the VendorID are used. For a scenario within the company, it is not a requirement to specify the business partner in the message; hence both party entity types are optional.

(iii) Scheduling Package

The Scheduling package 43824 groups together specifications on time intervals that are relevant for the event. The Scheduling package 43824 includes a Scheduling entity 438408. There is a 1:c relationship 43842 between the ProductDemandInfluencingEvent entity 43828 and the Scheduling entity 43840.

A Scheduling groups together time intervals in order to define a schedule for ordering, delivering, and/or picking up the products affected by the event.

The Scheduling entity 43840 includes an OrderingPeriod, a DistributionCenterReceiptPeriod, a DistributionCenterIssuePeriod, a StoreReceiptPeriod, and a PickupPeriod. The OrderingPeriod is of type GDT: DateTimePeriod, and is the period in which the purchase order is expected. The DistributionCenterReceiptPeriod is of type GDT: DateTimePeriod, and is the period in which the goods are expected to be received at the distribution center. The DistributionCenterIssuePeriod is of type GDT: DateTimePeriod, and is the period in which the goods are expected to be issued by the distribution center. The StoreReceiptPeriod is of type GDT: DateTimePeriod, and is the period in which the goods are expected to be received at the shop. The PickupPeriod is of type GDT: DateTimePeriod, and is the period in which the goods are ready for pick up.

(iv) Product Demand Influencing Event Item Package

The ProductDemandInfluencingEventItem package 43826 groups together the ProductDemandInfluencingEventItem with its packages. The ProductDemandInfluencingEventItem package 43826 includes a Location package 43844, a ProductInformation package 43846, and Item 43848. There is a 1:n relationship 43850 between the ProductDemandInfluencingEvent entity 43828 and the Item entity 43848.

(a) Product Demand Invluencing Event Item

A ProductDemandInfluencingEventItem specifies for a ship-from location (optional), a ship-to location, and a product the sales quantities expected on the basis of the demand influencing event in the form of a time series. The ProductDemandInfluencingEventItem 43848 includes a SalesForecastTimeSeries, an OrderForecastTimeSeries, and a PlannedSalesPriceTimeSeries. The SalesForecastTimeSeries is of type CDT: QuantityTimeSeries, and is the forecasted sales quantity with regard to the event. The OrderForecastTimeSeries is of type CDT: QuantityTimeSeries, and is the forecasted order quantity with regard to the event. The PlannedSalesPriceTimeSeries is of type CDT: PriceTimeSeries, and is the planned sales prices. The FixedIndicator included in the TimeSeries mentioned above is not yet used.

(b) Location Package

The Location package 43844 groups together the locations that are affected by the marketing activity (event). The Location package 43844 includes a ShipFromLocation entity 43852 and a ShipToLocation entity 43854. There is a 1:c relationship 43856 between the Item entity 43848 and the ShipFromLocation entity 43852. There is a 1:1 relationship 43858 between the Item entity 43848 and the ShipToLocation entity 43854.

For communication within the company (with common master data), use the InternalID for location entity types. For cross-company communication (with business-partner-specific master data), use for all location entity types either the StandardID or the partner-role-specific ID of the receiving partner, for example, for Supplier Collaboration scenarios, use the BuyerID, and for Customer Collaboration scenarios, use the VendorID. Due to the different possibilities for ID use, all the ID elements of the particular location are optional.

(i) Ship From Location

A ShipFromLocation is the location from which the products affected by the marketing activity (event) are delivered. The ShipFromLocation entity 43852 is of type GDT: BusinessTransactionDocumentShipFromLocation, where the InternalID, the StandardID, the BuyerID, and the VendorID are used.

(ii) Ship To Location

A ShipToLocation is the location to which the products affected by the marketing activity (event) are delivered. The ShipToLocation entity 43854 is type GDT: BusinessTransactionDocumentShipToLocation, where the InternalID, the StandardID, the BuyerID, and the VendorID are used.

(c) Product Information Package

The ProductInformation package 43846 groups together the information that characterizes the product in greater detail. The ProductInformation package 43846 includes a Product entity 43860. There is a 1:1 relationship 43862 between the Item entity 43848 and the Product entity 43860.

A Product is either a tangible or intangible good whose sales or demand is influenced by the event. The Product entity 43860 is of type GDT: BusinessTransactionDocumentProduct, where the InternalID, the StandardID, the BuyerID, the VendorID, and the PackageQuantity are used. For communication within a company (with common master data), use the InternalID for all product entity types. For cross-company communication (with business-partner-specific master data), use for all product entity types either the StandardID or the partner-role-specific ID of the receiving partner, for example, for Supplier.Collaboration scenarios, use the BuyerID, and for Customer Collaboration scenarios, use the VendorID. Due to the different possibilities for ID use, all ID elements of the particular product are optional.

(4) Element Structure for the Message Data Type

FIG. 439 depicts the element structure for Product Demand Influencing Event Notification. The element structure identifies the different packages 43900 in the interface, and represents the entities at various levels within the interface. As shown in FIG. 439, the interface for PurchaseRequirementRequest includes seven levels 43902, 43904, 43906, 43908, 43910, 43912, and 43914. The element structure identifies the cardinality 43916 of each element and provides a type 43918, a data type name 43920, and, where applicable, a length 43924 for each element.

The outermost package of this interface is the ProductDemandInfluencingEventMessage package 43928, which includes a ProductDemandInfluencingEventMessage entity 43930 at the first level 43902. The ProductDemandInfluencingEventMessage entity 43930 has a cardinality of one 43932 and is of data type name ProductDemandInfluencingEventMessage 43934.

The ProductDemandInfluencingEventMessage package 43928 includes a MessageHeader package 43938 and a ProductDemandInfluencingEvent package 43940.

The MessageHeader package 43938 includes a MessageHeader entity 43942 at the second level 43904. The MessageHeader entity 43942 has a cardinality of zero or one 43944 and is of type GDT 43946 with a data type name of BusinessDocumentMessageHeader 43948. The MessageHeader entity 43942 includes an ID 43954, a Creation DateTime 43966, a SenderParty 43974, and a Recipient Party 43904A at the third level 43906. The ID 43954 has a cardinality of one 43956, a data type of GDT 43958 with a data type name of BusinessDocument MessageID 43960 and a length of 1 to 35 43962. The CreationDateTime 43966 has a cardinality of one 43968 and a data type of GDT 43970 with a data type name of DateTime 43972. The SenderParty 43974 has a cardinality of zero or one 43976 with a data type of GDT 43978 and a data type name of BusinessDocument MessageHeaderParty 43980. The Recipient Party 43904A has a cardinality of zero or one 43906A with a data type of GDT 43908A and a data type name of BusinessDocument MessageHeaderParty 43910A.

The SenderParty 43974 includes an InternalID 43986 and a StandardID 43994 at the fourth level 43908. The InternalID 43986 has a cardinality of zero or one 43988, a data type of GDT 43990, and a data type name of PartyInternalID 43992. The StandardID 43994 has a cardinality of any number 43996, a data type of GDT 43998, and a data type name of PartyStandardID 43900A.

The RecipientParty entity 43904A includes an InternalID 43916A and a StandardID 43924A. The InternalID 43916A has a cardinality of zero or one 43918A, a data type of GDT 43920A, and a data type name of PartyInternalID 43922A. The StandardID 43924A has a cardinality of any number 43926A, a data type of GDT 43928A, and a data type name of PartyStandardID 43930A.

The ProductDemandInfluencingEvent package 43940 includes a ProductDemandInfluencingEvent entity 43934A at the second level 43904. The ProductDemandInfluencingEvent entity 43934A has a cardinality of one 43936A, a data type of AGDT 43938A, and a data type name of ProductDemandInfluencingEvent 43940A. The ProductDemandInfluencingEvent entity 43934A includes an InternalID 43944A, a BuyerID 43954A, a VendorID 43966A, a Name 43978A, a TypeCode 43990A, a StatusCode 43902B, a Recurrence entity 43914B, a PlanningPeriod 43934B, an ExecutingPeriod 43952B, an Advertisement Period 43974B, and a Note 43990B at the third level 43906.

The InternalID 43944A has a cardinality of one or zero 43946A, a data type of GDT 43948A, a data type name of BusinessTransactionDocumentID 43950A, and a length of 1 to 35 43952A. The BuyerID 43954A has a cardinality of one or zero 43956A, a data type of GDT 43958A, a data type name of BusinessTransactionDocumentID 43960A, and a length of 1 to 35 43962A. The VendorID 43966A has a cardinality of one or zero 43968A, a data type of GDT 43970A, a data type name of BusinessTransactionDocumentID 43972A, and a length of 1 to 35 43974A. The Name 43978A has a cardinality of one or zero 43980A, a data type of GDT 43982A, a data type name of Name 43984A, and a length of 1 to 40 43986A. The TypeCode 43990A has a cardinality of one 43992A, a data type of GDT 43994A, a data type name of ProductDemandInfluencingEventTypeCode 43996A, and a length of 1 to 35 43998A. The StatusCode 43902B has a cardinality of one or zero 43904B, a data type of GDT 43906B, a data type name of ProductDemandInfluencingEventStatusCode 43908B, and a length of 1 to 35 43910B. The Recurrence 43914B has a cardinality of one or zero 43916B, a data type of GDT 43918B, a data type name of Recurrence 43920B, and a length of 1 to 3 43922B. The PlanningPeriod 43934B has a cardinality of one or zero 43936B, a data type of GDT 43938B, and a data type name of DateTimePeriod 43940B. The ExecutingPeriod 43952B has a cardinality of one or zero 43954B, a data type of GDT 43956B, and a data type name of DateTimePeriod 43958B. The Advertisement Period 43974B has a cardinality of one or zero 43976B, a data type of GDT 43978B, and a data type name of DateTimePeriod 43980B. The Note entity 43990B has a cardinality of one or zero 43992B, a data type of GDT 43994B, a data type name of Note 43996B, and a length of 1 to 132 43998B.

The Recurrence 43914B includes a Duration 43924B and a Value 43928B at the fourth level 43908. The Duration 43924B has a cardinality of one 43926B. The Value 43928B has a cardinality of one 43930B and a length of three 43932B.

The PlanningPeriod 43934B has a StartDateTime 43942B and an EndDateTime 43948B at the fourth level 43908. The StartDateTime 43942B has a cardinality of zero or one 43944B. The EndDateTime 43948B has a cardinality of zero or one 43950B.

The ExecutingPeriod 43952B includes a StartDateTime 43962B and an EndDateTime 43968B at the fourth level. The StartDateTime 43962B has a cardinality of zero or one 43964B. The EndDateTime 43968B has a cardinality of zero or one 43970B.

The AdvertisementPeriod 43974B includes a StartDateTime 43982B and an EndDateTime 43986B at the fourth level 43908. The StartDateTime 43982B has a cardinality of zero or one 43984B. The EndDateTime 43986B has a cardinality of zero or one 43988B.

The ProductDemandInfluencingEvent package 43940 includes a Party package 43902C, a Scheduling package 43904C, and an Item package 43906C. The Party package 43902C includes a BuyerParty entity 43908C and a VendorParty entity 43966C at the third level 43906. The BuyerParty entity 43908C has a cardinality of zero or one 43910C, a data type of CDT 43912C, a data type name of BusinessTransactionDocumentParty 43914C. The VendorParty entity 43966C has a cardinality of zero or one 43968C, a data type of CDT 43970C, and a data type name of BusinessTransactionDocumentParty 43972C.

The Buyer Party entity 43908C includes an InternalID 43920C, a StandardID 43930C, a BuyerID 43942C, and a VendorID 43954C at the fourth level 43908. The InternalID 43920C has a cardinality of one or zero 43922C, a data type of CDT 43924C, a data type name of PartyInternalID 43926C, and a length of 1 to 10 43928C. The StandardID 43930C has a cardinality of any number 43932C, a data type of CDT 43934C, a data type name of Party StandardID 43936C, and a length of 1 to 13 43938C. The BuyerID 43942C has a cardinality of one or zero 43944C, a data type of CDT 43946C, a data type name of PartyParty ID 43948C, and a length of 1 to 10 43950C. The VendorID 43954C has a cardinality of one or zero 43956C, a data type of CDT 43958C, a data type name of PartyParty ID 43960C, and a length of 1 to 10 43962C.

The VendorParty entity 43966C includes an InternalID 43978C, a StandardID 43988C, a BuyerID 43900D, and a VendorID 43912D at the fourth level 43908. The InternalID 43978C has a cardinality of one or zero 43980C, a data type of CDT 43982C, a data type name of PartyInternalID 43984C, and a length of 1 to 10 43986C. The StandardID 43988C has a cardinality of any number 43990C, a data type of CDT 43992C, a data type name of PartyStandardID 43994C, and a length of 1 to 13 43996C. The BuyerID 43900D has a cardinality of one or zero 43902D, a data type of CDT 43904D, a data type name of PartyParty ID 43906D, and a length of 1 to 10 43908D. The VendorID 43912D has a cardinality of one or zero 43914D, a data type of CDT 43916D, a data type name of PartyParty ID 43918D, and a length of 1 to 10 43920D.

The Scheduling package 43904C includes a Scheduling entity 43924D at the third level 43906. The Scheduling entity 43924D has a cardinality of zero or one 43926D and a data type of AGDT 43928D. The Scheduling entity 43924D includes an OrderingPeriod 43930D, a DistributionCenterReceiptPeriod 43938D, a DistributionCenterIssuePeriod 43946D, a StoreReceiptPeriod 43954D, and a PickupPeriod 43962D. The OrderingPeriod 43930D has a cardinality of zero or one 43932D and a data type of GDT 43934D with a data type name of DateTimePeriod 43936D. The DistributionCenter ReceiptPeriod 43938D has a cardinality of zero or one 43940D and a data type of GDT 43942D with a data type name of DateTimePeriod 43944D. The DistributionCenterIssuePeriod 43946D has a cardinality of zero or one 43948D and a data type of GDT 43950D with a data type name of DateTimePeriod 43952D. The StoreReceiptPeriod 43954D has a cardinality of zero or one 43956D and a data type of GDT 43958D with a data type name of DateTimePeriod 43960D. The PickupPeriod 43962D has a cardinality of zero or one 43964D and a data type of GDT 43966D and a data type name of DateTimePeriod 43968D.

The Item package 43906C includes an Item entity 43970D at the third level 43906. The Item entity 43970D has a cardinality of at least one 43972D and a data type of AGDT 43974D with a data type name of ProductDemandInfluencingEventItem 43976D. The Item package 43980D also includes a Location package 43980D and a ProductInformation package 43982D.

The Location package 43980D includes a ShipFromLocation entity 43984D and a ShipToLocation entity 43942E at the fourth level 43908. The ShipFromLocation entity 43984D has a cardinality of zero or one 43986D and a data type of CDT 43988D with a data type name of BusinessTransactionDocumentShipFromLocation 43990D. The ShipToLocation entity 43942E has a cardinality of one 43944E and a data type of CDT 43946E with a data type name of BusinessTransactionDocumentShipToLocation 43948E.

The ShipFromLocation entity 43984D includes an InternalID 43996D, a StandardID 43906E, a BuyerID 43918E, and a VendorID 43930E at the fifth level 43910. The InternalID 43996D has a cardinality of zero or one 43998D, a data type of CDT 43900E, a data type name of Location InternalID 43902E, and a length of 1 to 20 43904E. The StandardID 43906E has a cardinality of any number 43908E, a data type of CDT 43910E, a data type name of LocationStandardID 43912E, and a length of 1 to 13 43914E. The BuyerID 43918E has a cardinality of zero or one 43920E, a data type of CDT 43922E, a data type name of LocationPartyID 43924E, and a length of 1 to 20 43926E. The VendorID 3930E has a cardinality of zero or one 43932E, a data type of CDT 43934E, a data type name of LocationPartyID 43936E, and a length of 1 to 20 43938E.

The ShipToLocation entity 43942E includes an InternalID 43954E, a StandardID 43964E, a BuyerID 43976E, and a VendorID 43988E at the fifth level 43910. The InternalID 43954E has a cardinality of zero or one 43956E, a data type of CDT 43958E, a data type name of Location InternalID 43960E, and a length of 1 to 20 43962E. The StandardID 43964E has a cardinality of any number 43966E, a data type of CDT 43968E, a data type name of LocationStandardID 43970E, and a length of 1 to 13 43972E. The BuyerID 43976E has a cardinality of zero or one 43978E, a data type of CDT 43980E, a data type name of LocationPartyID 43982E, and a length of 1 to 20 43984E. The VendorID 43988E has a cardinality of zero or one 43990E, a data type of CDT 43992E, a data type name of LocationPartyID 43994E, and a length of 1 to 20 43996E.

The ProductInformation package 43982D includes a Product entity 43900F at the fourth level 43908. The Product entity 43900F has a cardinality of one 43902F and a data type of CDT 43904F with a data type name of BusinessTransactionDocumentProduct 43906F.

The Product entity 43900F includes an InternalID 43912F, a StandardID 43922F, a BuyerID 43934F, a VendorID 43946F, and a PackageQuantity entity 43958F at the fifth level 43910. The InternalID 43912F has a cardinality of zero or one 43914F and a data type of CDT 43916F with a data type name of ProductInternalID 43918F and a length of 1 to 40 43920F. The StandardID 43922F has a cardinality of zero or one 43924F and a data type of CDT 43926F with a data type name of ProductStandardID 43928F and a length of 1 to 14 43930F. The BuyerID 43934F has a cardinality of zero or one 43936F and a data type of CDT 43938F with a data type name of ProductPartyID 43940F and a length of 1 to 40 43942F. The VendorID 43946F has a cardinality of zero or one 43948F and a data type of CDT 43950F with a data type name of ProductPartyID 43952F and a length of 1 to 40 43954F. The PackageQuantity 43958F has a cardinality of zero or one 43960F and a data type of GDT 43962F with a data type name of Quantity 43964F and a length of 13 or 6 43966F.

Item package 43906C includes a SalesForecastTimeSeries 43968F, an OrderForecastTimeSeries 43916G, and a PlannedSalesPriceTimeSeries 43964G at the fourth level 43908. The SalesForecastTimeSeries 43968F has a cardinality of zero or one 43970F and a data type of CDT 43972F with a data type name of QuantityTimeSeries 43974F. The OrderForecastTimeSeries entity 43916G has a cardinality of zero or one 43918G and a data type of CDT 43920G with a data type name of QuantityTimeSeries 43922G. The PlannedSalesTimeSeries entity 43964G has a cardinality of zero or one 43966G and a data type of CDT 43968G with a data type name of PriceTimeSeries 43970G.

The SalesForecastTimeSeries 43968F includes an Item entity 43980F at the fifth level 43910. The Item entity 43980F has a cardinality of any number 43982F and includes a ValidityPeriod 43984F and a Quantity 43906G at the sixth level 43912. The ValidityPeriod 43984F has a cardinality of one 43986F, a data type of GDT 43988F, and a data type name of DateTimePeriod 43990F. The Quantity 43906G has a cardinality of one 43908G and a data type of GDT 43910G with a data type name of Quantity 43912G.

The ValidityPeriod 43984F includes a StartDateTime 43994F and an EndDateTime 43900G at the seventh level 43914. The StartDateTime 43994F has a cardinality of zero or one 43996F, and the EndDateTime 43900G has a cardinality of zero or one 43902G.

The OrderForecastTimeSeries 43916G includes an Item entity 43928G at the fifth level 43910. The Item entity 43928G has a cardinality of any number 43930G and includes a ValidityPeriod 43932G and a Quantity 43954G at the sixth level 43912. The ValidityPeriod 43932G has a cardinality of one 43934G, a data type of GDT 43936G, and a data type name of DateTimePeriod 43938G. The Quantity 43954G has a cardinality of one 43956G and a data type of GDT 43958G with a data type name of Quantity 43960G.

The ValidityPeriod 43932G includes a StartDateTime 43942G and an EndDateTime 43948G at the seventh level 43914. The StartDateTime 43942G has a cardinality of zero or one 43944G, and the EndDateTime 43948G has a cardinality of zero or one 43950G.

The PlannedSalesTimeSeries 43964G includes an Item entity 43976G at the fifth level 43910. The Item entity 43976G has a cardinality of any number 43978G, and includes a ValidityPeriod 43980G and a Price 43902H at the sixth level 43912. The ValidityPeriod 43980G has a cardinality of one 43982G and a data type of GDT 43984G with a data type name of DateTimePeriod 43986G. The Price 43902H has a cardinality of one 43904H and a data type of GDT 43906H with a data type name of Price 43908H.

The ValidityPeriod 43980G includes a StartDateTime 43990G and an EndDateTime 43996G at the seventh level 43914. The StartDateTime 43990G has a cardinality of zero or one 43992G, and the EndDateTime 43996G has a cardinality of zero or one 43998G.

z) Product Forecast Interface

The ProductForecastNotification message is used to exchange forecast of future product sale or demand. The ProductForecastNotification message is sent within the Business Scenarios “Responsive Replenishment” and “Collaborative Planning, Forecasting, and Replenishment (CPFR)” in an cross-company variant from a buyer (retail company) to a vendor (consumer products manufacturer) or in a variant within a company from one planning system to another.

(1) Message Type Product Forecast Notification

A ProductForecastNotification is a notice about future product sale or demand (forecasts). The structure of the message type ProductForecastNotification is specified by the message data type ProductForecastNotificationMessage. Methods and systems consistent with the subject matter described herein use the package template for a BusinessTransactionDocument for an SCM Master Data depicted in FIG. 270B to derive the ProductForecast interface.

(2) Message Choreography

The following message choreography of scenario "CPFR" describes exemplary logical sequence of the message types for the scenario realization.

A buyer 44002 sends long to mid-term demand information that is related to an event to a vendor 44004 (ProductDemandInfluencingEventNotification 44006). Together with product forecast information (ProductForecastNotification 44008) sent by the buyer 44002, or with short-term incidental current sales information (ProductActivityNotification 44010), this information can be used by the vendor 44004 for the creation of a forecast for the product demand of the buyer 44002. In the case of a cooperative settlement process between the buyer 44002 and vendor 44004, the vendor 44004 can send a revision of the product forecast (sent by the buyer 44002) back to this buyer 44002 (ProductForecastRevisionNotification 44012), and in turn, the buyer 44002 can respond with an updated revision (ProductForecastRevisionNotification 44014). In one implementation, this choreography differs from the Request/Confirmation procedure; rather than the original document (possibly in a different form) being confirmed here, it is replaced by other ProductForecastRevisions until the difference is sufficiently minimal.

(3) Message Data Type Product Forecast Notification Message

The message data type ProductForecastNotificationMessage includes the ProductForecast object included in the business document, with the focus on the ProductForecastNotification view and the business information that is relevant for sending a business document in a message. The ProductForecastNotificationMessage package 44102 includes a MessageHeader package 44104, a ProductForecast package 44106, and a ProductForecastNotificationMessage entity 44108. The message data type ProductForecastNotificationMessage provides the structure for the message type ProductForecastNotification and the relevant interfaces.

(a) Message Header Package

The MessageHeader package 44104 groups together the business information that is relevant for sending a business document in a message. There is a 1:1 relationship 44112 between the MessageHeader entity 44110 and the ProductForecastNotificationMessage entity 44108.

(i) Message Header

A MessageHeader entity 44110 groups together the business information from the perspective of the sending application information to identify the business document in a message, information about the sender, and any information about the recipient.

The MessageHeader entity 44110 includes a SenderParty entity 44114 and a RecipientParty entity 44116. There is a 1:c relationship 44118 between the SenderParty entity 44114 and MessageHeader entity 44110. There is a 1:c relationship 44120 between the RecipientParty entity 44116 and MessageHeader entity 44110. The MessageHeader entity 44110 is of type GDT: BusinessDocumentMessageHeader. The MessageHeader entity 44110 includes an ID and a CreationDateTime. The ID is the identification of the business document in the technical message. The CreationDateTime is the creation date of the business document in the technical message.

(ii) Sender Party

A SenderParty entity 44114 is the party responsible for sending a business document at business application level. The SenderParty entity 44114 is of type GDT: BusinessDocumentMessageHeaderParty.

(iii) Recipient Party

A RecipientParty entity 44116 is the party responsible for receiving a business document at business application level. The RecipientParty entity 44116 is of type GDT: BusinessDocumentMessageHeaderParty.

(b) Product Forecast Package

The ProductForecast package 44106 includes a Party package 44122 and a ProductForecastItem package 44124, and a ProductForecast entity 44126.

(i) Product Forecast

A ProductForecast entity 44126 (specialized/regarded) as a ProductForecastNotification is a forecast of the sale/demand of products in the form of time series between business partners. A ProductForecast includes several items (see ProductForecastItem Package 44124), which can contain information about the sales quantities predicted by the forecast for each ship-to location and product. There is a 1:1 relationship 44128 between ProductForecast entity 44126 and ProductForecastNotificationMessage entity 44108. A ProductForecast entity 44126 includes a ValidityPeriod, and a Note. The ValidityPeriod is of type GDT: DateTimePeriod, and is the validity period for the forecast. The Note is of type GDT: Note, and is the language-independent note.

(ii) Party Package

The Party package 44122 groups together the business partners between which the forecast is to be exchanged. It includes a BuyerParty entity 44130 and a VendorParty entity 44132. There is a 1:c relationship 44134 between the BuyerParty entity 44130 and ProductForecast entity 44126. There is a 1:c relationship 44136 between the VendorParty entity 44132 and ProductForecast entity 44126.

For communication within a company (with common master data), the InternalID is used for party entity types. For cross-company communication (with business-partner-specific master data), party entity types are used for either the StandardID or the partner-role-specific ID of the receiving partner, for example, for Supplier Collaboration scenarios, the BuyerID, and for Customer Collaboration scenarios, the VendorID is used. Due to the different possibilities for ID use, ID elements of the particular party are optional.

(a) Buyer Party

A BuyerParty entity 44130 identifies the purchasing company. A BuyerParty entity 44130 is of type GDT: BusinessTransactionDocumentParty, where the InternalID, the StandardID, the BuyerID, and the VendorID are used.

(b) Vendor Party

A VendorParty entity 44132 is the delivering company. The VendorParty entity 44132 is of type GDT: BusinessTransactionDocumentParty, where the InternalID, the StandardID, the BuyerID, and the VendorID are used.

(iii) Product Forecast Item Package

The ProductForecastItem package 44124 groups together the ProductForecastItem entity 44142, a Location package 44138 and a ProductInformation package 44140. There is a 1:n relationship between the ProductForecast entity 44142 and the ProductForecastItem entity 44126.

(a) Product Forecast Item

A ProductForecastItem entity 44142 (specialized/regarded) as a ProductForecastNotificationItem specifies for a ship-from location (optional), a ship-to location (see Location Package 44138), and a product (see ProductInformation Package 44140) the forecasted sales quantities in the form of a time series.

A ProductForecastItem entity 44142 includes a SalesForecastTimeSeries, a PromotionSalesForecastTimeSeries, an OrderForecastTimeSeries, and a PromotionOrderForecastTimeSeries. The SalesForecastTimeSeries is of type CDT: QuantityTimeSeries, and is the forecasted sales quantity, possibly including reason for adjustment. The PromotionSalesForecastTimeSeries is of type CDT: QuantityTimeSeries, and is the forecasted promotion order quantity.

(b) Location Package

The Location package 44138 groups together the locations that are affected by the forecast. It includes a ShipFromLocation entity 44146 and a ShipToLocation entity 44148. There is a 1:c relationship 44150 between the ProductForecastItem entity 44142 and the ShipFromLocation entity 44146. There is a 1:c relationship 44152 between the ProductForecastItem entity 44142 and the ShipToLocation entity 44148.

For communication within a company (with common master data), the InternalID is used for location entity types. For cross-company communication (with business-partner-specific master data), location entity types are used for either the StandardID or the partner-role-specific ID of the receiving partner, for example, for Supplier Collaboration scenarios, use the BuyerID, and for Customer Collaboration scenarios, the VendorID is used. Due to the different possibilities for ID use, the ID elements of the particular location are optional.

(i) Ship From Location

A ShipFromLocation entity 44146 is the location from which the product, whose sale or demand is forecasted/revised, is delivered. A ShipFromLocation entity 44146 is of type GDT: BusinessTransactionDocumentShipFromLocation, where the InternalID, the StandardID, the BuyerID, and the VendorID are used.

(ii) Ship To Location

A ShipToLocation entity 44148 is the location to which the product, whose sale or demand is forecasted/revised, is delivered. A ShipToLocation entity 44148 is of type GDT: BusinessTransactionDocumentShipToLocation, where the InternalID, the StandardID, the BuyerID, and the VendorID are used.

(c) Product Information Package

The ProductInformation package 44140 groups together the information that characterizes the product in greater detail. It includes a Product entity 44154. There is a 1:1 relationship 44156 between ProductForecastItem entity 44142 and Product entity 44154.

A Product entity 44154 is the tangible or intangible good whose forecasted sale or demand is revised. A Product entity 44154 is of type GDT: BusinessTransactionDocumentProduct, where the InternalID, the StandardID, the BuyerID, the VendorID, and the PackageQuantity are used.

For communication within a company (with common master data), the InternalID is used for product entity types. For cross-company communication (with business-partner-specific master data), product entity types are used for either the StandardID or the partner-role-specific ID of the receiving partner, for example, for Supplier Collaboration scenarios, the BuyerID is used, and for Customer Collaboration scenarios, the VendorID is used. Due to the different possibilities for ID use, ID elements of the particular product are optional.

(4) Element Structure for the Message Data Type

FIG. 442 depicts the element structure for ProductForecastNotificationMessage. The element structure is similar to the data model, but provides additional information regarding the details of the interface. The element structure identifies the different packages 44200 in the interface, and represents the entities at various levels within the interface. As depicted in FIG. 442, the interface for ProductForecastNotificationMessage includes seven levels 44202, 44204, 44206, 44208, 44210, 44212, and 44214. The element structure identifies the cardinality 442014 between the entities of the interface, provides information (i.e., type 44218 and name 44220) regarding the data type that provides the basis for the entity, and where appropriate, the length 44224 of the element. The outermost package of this interface is an ProductForecastNotificationMessage package 44228, which includes an ProductForecastNotificationMessage entity 44230 at the first level 44202. The ProductForecastNotificationMessage entity 44230 is of type message data type "ProductForecastNotificationMessage" 44234, and there is one 44232 ProductForecastNotificationMessage entity 44230 for each ProductForecastNotificationMessage package 44228.

The ProductForecastNotificationMessage package 44228 includes a MessageHeader package 44238 and a ProductForecast package 44240. The MessageHeader package 44238 includes a MessageHeader entity 44242, which is of type generic data type ("GDT") 44246 "BusinessDocumentMessageHeader" 44248. There is zero or one 44244 MessageHeader entity 44242 for each MessageHeader package 44238.

The MessageHeader entity 44242 includes an ID 44254, a CreationDateTime 442, a SenderParty 44274, and a RecipientParty 44204A. The ID 44254 is of type GDT 44246 BusinessDocumentMessageID 44248, and there is one 44256 ID 44254 for each MessageHeader entity 44242. The ID 44254 has a length 44224 of 1 to 35 44262. The CreationDateTime 44266 is of type GDT 44270 DateTime 44272. There is one 442 CreationDateTime 442 for each MessageHeader entity 44242. The SenderParty 44274 is of type GDT 44278 BusinessDocumentMessageHeaderParty 44280. The RecipientParty 44204A is also of type GDT 44208A BusinessDocumentMessageHeaderParty 44210A. There is one or zero 44276 SenderParty entity 44274 for each MessageHeader entity 44242, and there is one or zero 44206A RecipientParty entity 44204A for each MessageHeader entity 44242.

The SenderParty entity 44274 includes an InternalID 44286 and a StandardID 44294. The InternalID 44286 has zero or one occurrences 44288 and a data type GDT 44290 of PartyInternalID 44292. The StandardID 44294 of the SenderParty entity 44274 has any number of occurrences 44296 and has a data type of GDT 44298 PartyStandardID 44200A. The RecipientParty entity 44204A includes an InternalID 44216A and a StandardID 44224A. The InternalID 44216A has zero or one occurrences 44218A and a data type GDT 44220A of PartyInternalID 44222A. The StandardID 44224A of the RecipientParty entity 44204A has any number of occurrences 44226A and has a data type of GDT 44228A PartyStandardID 44230A.

The ProductForecast package 44240 includes a ProductForecast entity 44234A. There is one 44236A ProductForecast entity 44234A for each ProductForecast package 44240 and has a data type AGDT 44238A ProductForecast 44240A. The ProductForecast entity 44234A includes an ValidityPeriod 44242A that has one or zero 44244A occurrences and a data type of GDT 44246A DateTimePeriod 44248A. The ValidityPeriod 44242A includes a StartDateTime 44252A and EndDateTime 44258A, wherein each of these elements has one or zero occurrences 44254A and 44260A, respectively.

The Party package 442064A includes a BuyerParty entity 44268A, a VendorParty entity 44226B, and a Note 44284B. The BuyerParty entity 44268A is of type CDT 44272A BusinessTransactionDocumentParty 44274A. There is one or zero 44270A BuyerParty entity 44268A for each Party package 44264A. The VendorParty entity 44226B is of type DT 44230B BusinessTransactionDocumentParty 44232B. There is one or zero 44228B endorParty entity 44226B for each Party package 44264A.

The BuyerParty entity 44268A includes an InternalID 44280A, a StandardID 4290A, a BuyerID 44202B, and a VendorID 44214B. The InternalID 44280A has zero or one occurrences 44282, a data type of CDT 44284 PartyInternalID 44286 and a length 44224 of 1 to 10 44288A. The StandardID 44290A has any number of occurrences 44292A, a data type of CDT 44294A PartyStandardID 44296A, and a length 44224 of 1 to 13 44298A. The BuyerID 44202B has zero or one occurrences 44204B, a data type of CDT 44206B PartyPartyID 44208B, and a length 44224 of 1 to 10 44210B. The VendorID 44214B has zero or one occurrences 44216B, a data type of CDT 44218B PartyPartyID 44220B, and a length 44224 of 1 to 10 44222B.

The VendorParty entity 44226B includes an InternalID 44238B, a StandardID 44248B, a BuyerID 44260B, and a VendorID 44272B. The InternalID 44238B has zero or one occurrences 44240B, a data type CDT 44242B of PartyInternalID 44244B, and a length 44224 of 1 to 10 44246B. The StandardID 44248B has any number of occurrences 44250B, a data type CDT 44252B of PartyStandardID 44254B, and a length 44224 of 1 to 13 44256B. The BuyerID 44260B has zero or one occurrences 44262B, a data type CDT 44264B of PartyPartyID 44266B, and a length 44224 of 1 to 10 44268B. The VendorID 44272B has zero or one occurrences 44274B, a data type CDT 44276B of PartyPartyID 44278B, and a length 44224 of 1 to 10 44280B.

The ProductForecast package includes a Note 44284B. The Note 44284B has one or zero 44286B occurrences, a data type of GDT 44288B Note 44290, and a length 44224 of 1 to 132 44292B.

The Item package 44266A includes an Item entity 44294B, a Location package 44204C, and a ProductInformation package 44206C. There is one or more 44296B Item entities 44294B for each Item package 44266A and it is of data type AGDT 44298B ProductForecastItem 44200C.

The Location package 44204C includes a ShipFromLocation entity 44208C and a ShipToLocation entity 44266C. The ShipFromLocation entity 44208C is of type CDT 44212C BusinessTransactionDocumentShipFromLocation 44214C. There is zero or one 44210C ShipFromLocation entity 44208C for each Location package 44204C. The ShipToLocation entity 44266C is of type CDT 44268C BusinessTransactionDocumentLocation 44272C and there is zero or one 44268C ShipToLocation entity 44266C for each Location package 44204C.

The ShipFromLocation entity 44208C includes an InternalID 44220C, a StandardID 44230C, a BuyerID 44242C, and a VendorID 44254C. The InternalID 44220C has zero or one occurrences 44222C, a data type of CDT 44224C LocationInternalID 44226C, and a length 44224 of 1 to 20 44228C. The StandardID 44230C has any number of occurrences 44232C, a data type of CDT 44234C LocationStandardID 44236C, and a length 44224 of 1 to 13 44238C. The BuyerID 44242C has zero or one occurrences 44244C, a data type of CDT 44246C LocationPartyID 44248C, and a length 44224 of 1 to 20 44250C. The VendorID 44254C has zero or one occurrences 44256C, a data type of CDT 44258C LocationPartyID 44260C, and a length 44224 of 1 to 20 44262C.

The ShipToLocation entity 44266C includes an InternalID 44278C, a StandardID 44288C, a BuyerID 44200C, and a VendorID 44212C. The InternalID 44278C has zero or one occurrences 44280C, a data type of CDT 44282C LocationInternalID 44284C, and a length 44224 of 1 to 20 44286C. The StandardID 44288C has any number occurrences 44290C, a data type of CDT 44292C LocationStandardID 44294C, and a length 44224 of 1 to 13 44296C. The BuyerID 44200D has zero or one occurrences 44202D, a data type of CDT 44204D LocationPartyID 44206D, and a length 44224 of 1 to 20 44208D. The VendorID 44212D has zero or one occurrences 44214D, a data type of CDT 44216D LocationPartyID 44218D, and a length 44224 of 1 to 20 44220D.

The ProductInformation package 44206C includes a Product entity 44224D. The Product entity 44224D is of type CDT 44228D BusinessTransactionDocumentProduct 44230D, and there is one 44226D Product entity 44224D for each ProductInformation package 44206C. The ProductInformation entity 44224D includes an InternalID 44236D, a StandardID 44246D, a BuyerID 44258D, a VendorID 44270D, and a PackageQuantity 44282D. The InternalID 44236D has zero or one occurrences 44238D, a data type of CDT 44240D ProductInternalID 44242D, and a length 44224 of 1 to 40 44244D. The StandardID 44246D has zero or one occurrences 44248D, a data type of CDT 44250D ProductStandardID 44252D, and a length 44224 of 1 to 14 44254D. The BuyerID 44258D has zero or one occurrences 44260D, a data type of CDT 44262D ProductPartyID 44264D, and a length 44224 of 1 to 40 44266D. The VendorID 44270D has zero or one occurrences 44272D, a data type of CDT 44274D ProductPartyID 44276D, and a length 44224 of 1 to 40 44278D. The PackageQuantity 44282D has zero or one occurrences 44284D, a data type of GDT 44286D Quantity 44288D, and a length 44224 of 19 or 6 44290D.

The Item package 44266A also includes a SalesForecastTimeSeries 44292D, PromotionSalesForecastTimeSeries 44246E, OrderForecastTimeSeries 44200F, and PromotionOrderForecastTimeSeries 44254F. The SalesForecastTimeSeries 44292D has one or zero occurrences 44294D and a data type of CDT 44296D QuantityTimeSeries 44298D. The PromotionSalesForecastTimeSeries 44246E has one or zero occurrences 44248E and a data type of CDT 44250E QuantityTimeSeries 44252E. The OrderForecastTimeSeries 44200F has one or zero occurrences 44202F and a data type of CDT 44204F QuantityTimeSeries 44206F. The PromotionOrderForecastTimeSeries 44254F has one or zero occurrences 44256F and a data type of CDT 44258F QuantityTimeSeries 44260F.

The SalesForecastTimeSeries 44292D includes an Item 44200E. The Item 44200E has any number of occurrences 44202E. The Item 44200E includes a ValidityPeriod 44206E, a Quantity 44228E, and a FixedIndicator 44238E. The ValidityPeriod 44206E has one occurrence 44208E and a data type of GDT 44210E DateTimePeriod 44212E. The ValidityPeriod 44206E includes a StartDateTime 44216E and EndDateTime 44222E, wherein each has one or zero occurrences 44218E and 44224E, respectively. The Quantity 44228E has one occurrence 44230E and a data type of GDT 44232E Quantity 44234E. The FixedIndicator 44238E has one or zero occurrence 44240E and a data type of GDT 44242E FixedIndicator 44244E.

The PromotionSalesForecastTimeSeries 44246E includes an Item 44254E. The Item 44254E includes a ValidityPeriod 44260E, a Quantity 44282E, and a FixedIndicator 44292E. The Item 44254E has any number of occurrences 44256E. The ValidityPeriod 44260E has one occurrence 44262E and a data type of GDT 44264E DateTimePeriod 44266E. The ValidityPeriod 44260E includes a StartDateTime 44270E and EndDateTime 44276E, wherein each has one or zero occurrences 44272E and 44278E, respectively. The Quantity 44282E has one occurrence 44284E and a data type of GDT 44286E Quantity 44288E. The FixedIndicator 44292E has one or zero occurrence 44294E and a data type of GDT 44296E FixedIndicator 44298E.

The OrderForecastTimeSeries 44200F includes an Item 44208F. The Item 44208F has any number of occurrences 44210F. The Item 44208F includes a ValidityPeriod 44214F, a Quantity 44236F, and a FixedIndicator 44246F. The ValidityPeriod 44214F has 30 one occurrence 44216F and a data type of GDT 44218F DateTimePeriod 44220F. The ValidityPeriod 44214F includes a StartDateTime 44224F and EndDateTime 44230F, wherein each has one or zero occurrences 44226F and 44232F, respectively. The Quantity 44236F has one occurrence 44238F and a data type of GDT 44240F Quantity 44242F. The FixedIndicator 44246F has one or zero occurrence 44248F and a data type of GDT 44250F FixedIndicator 44252F.

The PromotionOrderForecastTimeSeries 44254F includes an Item 44262F. The Item 44262F has any number of occurrences 44264F. The Item 44262F includes a ValidityPeriod 44268F, a Quantity 44290F, and a FixedIndicator 44200G. The ValidityPeriod 44268F has one occurrence 44270F and a data type of GDT 44272F DateTimePeriod 44274F. The ValidityPeriod 44268F includes a StartDateTime 44278F and EndDateTime 44284F, wherein each has one or zero occurrences 44280F and 44286F, respectively. The Quantity 44290F has one occurrence 44292F and a data type of GDT 44294F Quantity 44296F. The FixedIndicator 44200G has one or zero occurrence 44202G and a data type of GDT 44204G FixedIndicator 44206G.

aa) Product Forecast Revision Interface

The ProductForecastRevisionNotification message is a notice of forecast revisions. Forecast revisions can be updates or confirmations of forecasts of the future sale or demand of a product, for example.

The ProductForecastRevisionNotification message is sent within the Business Scenarios "Responsive Replenishment" and "Collaborative Planning, Forecasting, and Replenishment (CPFR)" in a cross-company variant from a buyer (retail company) to a vendor (consumer products manufacturer), or vice versa. In a variant within a company, the exchange is made between two different planning systems.

(1) Message Type Product Forecast Revision Notification

A ProductForecastRevisionNotification entity is a notice about future product sale or demand (forecasts). The structure of the message type ProductForecastNotification is specified by the message data type ProductForecastRevisionNotificationMessage. Methods and systems consistent with the subject matter described herein use the package template for a BusinessTransactionDocument for an SCM Master Data depicted in FIG. 270B to derive the ProductForecastRevision interface.

(2) Messsage Choreography

The following message choreography of scenario "CPFR" describes an exemplary logical sequence of the message types for the scenario realization.

A buyer 44302 sends long to mid-term demand information that is related to an event to a vendor 44304 (ProductDemandInfluencingEventNotification 44306). Together with product forecast information (ProductForecastNotification 44308) sent by the buyer 44302, or with short-term incidental current sales information (ProductActivityNotification 44310), this information can be used by the vendor 44304 for the creation of a forecast for the product demand of the buyer 44302. In the case of a cooperative settlement process between the buyer 44302 and vendor 44304, the vendor 44304 can send a revision of the product forecast (sent by the buyer 44302) back to this buyer 44302 (ProductForecastRevisionNotification 44312), and in turn, the buyer can respond with an updated revision (ProductForecastRevisionNotification 44314).

In one implementation, this choreography differs from the Request/Confirmation procedure; rather than the original document (possibly in a different form) being confirmed here, it is replaced by other ProductForecastRevisions until the difference is sufficiently minimal.

(3) Message Data Type Product Forecast Revision Message

The message data type ProductForecastRevisionMessage includes the ProductForecast object included in the business document, with the focus on the ProductForecastRevision view and the business information that is relevant for sending a business document in a message. The ProductForecastRevisionMessage package 44402 includes the a MessageHeader package 44404, a ProductForecast package 44406, and a ProductForecastRevisionMessage entity 44408. The message data type ProductForecastRevisionMessage provides the structure for the message type ProductForecastRevisionNotification and the relevant interfaces.

(a) Message Header Package

The MessageHeader package 44404 groups together the business information that is relevant for sending a business document in a message. It includes a MessageHeader entity 44410. There is a 1:1 relationship 44412 between the ProductForecastRevisionMessage entity 44408 and the MessageHeader entity 44410.

(i) Message Header

A MessageHeader entity 44410 groups together the business information from the perspective of the sending application information to identify the business document in a message, information about the sender, and any information about the recipient.

The MessageHeader entity 44410 includes a SenderParty entity 44414 and a RecipientParty entity 44416. There is a 1:c relationship 44418 between the MessageHeader entity 44410 and the SenderParty entity 44414. There is a 1:c relationship 44420 between the MessageHeader entity 44410 and the RecipientParty entity 44416. The MessageHeader entity 44410 is of type GDT: BusinessDocumentMessageHeader. The MessageHeader entity 44410 includes an ID and a CreationDateTime. The ID is the identification of the business document in the technical message. The CreationDateTime is the creation date of the business document in the technical message.

(ii) Sender Party

A SenderParty entity 44414 is the party responsible for sending a business document at business application level. The SenderParty entity 44414 is of type GDT: BusinessDocumentMessageHeaderParty.

(iii) Recipient Party

A RecipientParty entity 44416 is the party responsible for receiving a business document at business application level. The RecipientParty entity 44416 is of type GDT: BusinessDocumentMessageHeaderParty.

(b) Product Forecast Package

The ProductForecast package entity 44406 groups the ProductForecast entity 44426, a Party package 44422 and a ProductForecastItem package 44424.

(i) Product Forecast

A ProductForecast entity 44426 (specialized/regarded) as a ProductForecastNotification is a forecast of the sale/demand of products in the form of time series between business partners. A ProductForecast entity 44426 includes several items (see ProductForecastItem Package 44424), which can contain information about the sales quantities predicted by the forecast for each ship-to location and product.

A ProductForecast entity 44426 includes an Acceptance Status Code, a ValidityPeriod and a Note. The AcceptanceStatusCode is of type GDT: AcceptanceStatusCode, and is the status of the acceptance. The ValidityPeriod is of type GDT: DateTimePeriod, and is the validity period for the forecast. The Note is of type GDT: Note, and is a language-independent note.

The AcceptanceStatusCode is valid for the time series that are specified in the ProductForecast entity 44426. On the application side, the relation is established by the validity area of the time series, that is, by the validity period, the business partners, and the locations and the product specified at item level.

(ii) Party Package

The Party package 44422 groups together the business partners between which the revised ProductForecast entity 44426 is to be exchanged. It includes a BuyerParty entity 44430 and a VendorParty entity 44432. There is a 1:c relationship 44434 between ProductForecast entity 44426 and BuyerParty entity 44430. There is a 1:c relationship 44436 between ProductForecast entity 44426 and VendorParty entity 44424.

For communication within a company (with common master data), the InternalID is used for party entity types. For cross-company communication (with business-partner-specific master data), party entity types are used for either the StandardID or the partner-role-specific ID of the receiving partner, for example, for Supplier Collaboration scenarios the BuyerID is used, and for Customer Collaboration scenarios, the VendorID is used. Due to the different possibilities for ID use, ID elements of the particular party are optional.

(a) Buyer Party

A BuyerParty entity 44430 is the purchasing company. BuyerParty entity 44430 of type GDT: BusinessTransactionDocumentParty, where the InternalID, the StandardID, the BuyerID, and the VendorID are used.

(b) Vendor Party

A VendorParty entity 44432 is the delivering company. VendorParty entity 44432 of type GDT: BusinessTransactionDocumentParty, where the InternalID, the StandardID, the BuyerID, and the VendorID are used.

(iii)Product Forecast Item Package

The ProductForecastItem package 44434 groups together the ProductForecastItem entity 44420 a Location package entity 44438, and a ProductInformation package entity 44440. There is a 1:cn relationship 44444 between ProductForecast entity 44426 and ProductForecastItem entity 44442.

(a) Product Forecast Item

A ProductForecastItem entity 44442 (specialized/regarded) as a ProductForecastNotificationItem specifies for a ship-from location (optional), a ship-to location (see Location Package 44438), and a product (see ProductInformation Package 44440) the forecasted sales quantities in the form of a time series.

A ProductForecastItem entity 444242 includes a SalesForecastTimeSeries, a PromotionSalesForecastTimeSeries, an OrderForecastTimeSeries, and a PromotionOrderForecastTimeSeries. The SalesForecastTimeSeries is of type CDT: QuantityTimeSeries, and is the forecasted sales quantity. The PromotionSalesForecastTimeSeries is of type CDT: QuantityTimeSeries, and is the forecasted promotion sales quantity. The OrderForecastTimeSeries is of type CDT: RevisionQuantityTimeSeries, and is the forecasted order quantity, possibly including reason for adjustment. The PromotionOrderForecastTimeSeries is of type CDT: RevisionQuantityTimeSeries, and is the forecasted promotion order quantity, possibly including reason for adjustment.

(b) Location Package

The Location package 44438 groups together the locations that are affected by the revised ProductForecastItem entity 44442. It includes a ShipFromLocation entity 44448 and a ShipToLocation entity 44450. There is a 1:c relationship 44452 between ProductForecastItem entity 44442 and ShipFromLocation entity 44430. There is a 1:c relationship 44454 between ProductForecastItem entity 44442 and ShipToLocation entity 44450.

For communication within a company (with common master data), the InternalID is used for location entity types. For cross-company communication (with business-partner-specific master data), location entity types are used for either the StandardID or the partner-role-specific ID of the receiving partner, for example, for Supplier Collaboration scenarios, use the BuyerID, and for Customer Collaboration scenarios, the VendorID is used. Due to the different possibilities for ID use, the ID elements of the particular location are optional.

(i) Ship From Location

A ShipFromLocation entity 44448 is the location from which the product, whose sale or demand is forecasted, is delivered. A ShipFromLocation entity 44448 is of type GDT: BusinessTransactionDocumentShipFromLocafion, where the InternalID, the StandardID, the BuyerID, and the VendorID are used.

(ii) Ship To Location

A ShipToLocation entity 44450 is the location to which the product, whose sale or demand is forecasted, is delivered. A ShipToLocation entity 44450 is of type GDT: BusinessTransactionDocumentShipToLocation, where the InternalID, the StandardID, the BuyerID, and the VendorID are used.

(c) Product Information Package

The ProductInformation package 44440 groups together the information that characterizes the product in greater detail. It includes a Product entity 44456. There is a 1:1 relationship 44458 between ProductForecastitem entity 44442 and Product entity 44456.

A Product entity 44456 is the tangible or intangible good whose sale or demand is forecasted. A Product entity 44456 is of type GDT: BusinessTransactionDocumentProduct, where the InternalID, the StandardID, the BuyerID, the VendorID, and the PackageQuantity are used.

For communication within a company (with common master data), the InternalID is used for product entity types. For cross-company communication (with business-partner-specific master data), product entity types are used for either the StandardID or the partner-role-specific ID of the receiving partner, for example, for Supplier Collaboration scenarios, the BuyerID is used, and for Customer Collaboration scenarios, the VendorID is used. Due to the different possibilities for ID use, ID elements of the particular product are optional.

(4) Element Structure of Product Forecast Revision Message

FIG. 445 depicts the element structure for PProductForecastRevisionMessage. The element structure is similar to the data model, but provides additional information regarding the details of the interface. The element structure identifies the different packages 44500 in the interface, and represents the entities at various levels within the interface. As depicted in FIGS. 445-444, the interface for ProductForecastNotification includes seven levels 44502, 44504, 44506, 44508, 44510, 44512, and 44514. The element structure identifies the cardinality 44514 between the entities of the interface, provides information (i.e., type 44518 and name 44520) regarding the data type that provides the basis for the entity, and where appropriate, a length 44524 for the element. The outermost package of this interface is a ProductForecastRevisionMessage package 44528, which includes an ProductForecastRevisionMessage entity 44530 at the first level 44502. The ProductForecastRevisionMessage entity 44530 has a message data name 44520 "ProductForecastRevisionMessage" 44534.

The ProductForecastRevisionMessage package 44528 includes a MessageHeader package 44538 and a ProductForecast package 44540. The MessageHeader package 44538 includes a MessageHeader entity 44542, which is of type generic data type ("GDT") 44546 "BusinessDocumentMessageHeader" 44548. There is one 44544 MessageHeader entity 44542 for each ProductForecastRevisionMessage package 44528.

The MessageHeader entity 44542 includes an ID 44554, a CreationDateTime 44566, a SenderParty 44574, and a RecipientParty 44502A. The ID 44554 is of type GDT 44558 BusinessDocumentMessageID 44560 and has a length 44524 of 1 to 35 44562. The CreationDateTime 44566 is of type GDT 44570 DateTime 44572. There is one 44556 ID 44554 for each MessageHeader entity 44542 and one 44568 CreationDateTime 44566 for each MessageHeader entity 44542. The SenderParty entity 44574 is of type GDT 44578 BusinessDocumentMessageHeaderParty 44580. The RecipientParty entity 44502A is also of type GDT 44506A BusinessDocumentMessageHeaderParty 44508A. There is one or zero 44576 SenderParty entity 44574 for each MessageHeader entity 44542, and there is one or zero 44504A RecipientParty entity 44502A for each MessageHeader entity 44542.

The SenderParty entity 44574 includes an InternalID 44584 and a StandardID 44592. The InternalID 44584 has zero or one occurrence 44586 and a data type GDT 44588 of PartyInternalID 445909. The StandardID 44592 of the SenderParty entity 44574 has any number of occurrences 44594 and having a data type of GDT 44596 PartyStandardID 44598. The RecipientParty entity 44502A includes an InternalID 44514A and a StandardID 44522A. The InternalID 44514A has zero or one occurrence 44516A and a data type GDT 44518A of PartyInternalID 44520A. The StandardID 44522A of the RecipientParty entity 44502A has any number of occurrences 44524A and has a data type of GDT 44526A PartyStandardID 44528A.

The ProductForecast package 44540 includes a ProductForecast entity 44532A. There is one 44534A ProductForecast entity 44532A for each ProductForecast package 44540 and is of data type AGDT 44536A ProductForecastRevision 44538A. The ProductForecast entity 44532A includes an AcceptanceStatusCode 44540A having one or zero occurrence 42A, a data type of GDT 44546A AccptanceStatusCode 44548, and a length 44528 of two 44550A. The ProductForecast entity 44532A includes a ValidityPeriod 44554A having one or zero occurrence 44556A and a data type of GDT 44558A DateTimePeriod 44560A. The ValidityPeriod 44554A includes a StartDateTime 44564A and EndDateTime 44570A, wherein each has one or zero occurrence 44566A and 72A, respectively.

The Party package 44576A includes a BuyerParty entity 44580A, a VendorParty entity 44538B, and a Note 44596B. The Buyerparty entity 44580A is of type CDT 44584A BusinessTransactionDocumentParty 44586A. There is one or zero 44582A BuyerParty entity 44580A for each Party package 44576A. The VendorParty entity 44538B is of type CDT 44542B BusinessTransactionDocumentParty 44544B. There is one or zero 44540B VendorParty entity 44538B for each Party package 44576A. The Note 44596B has one or zero occurrence 44598B, a data type of GDT 44500C Note 44502C, and a length 44524 of 1 to 132 44504C.

The BuyerParty entity 44580A includes an InternalID 44592A, a StandardID 44502B, a BuyerID 44514B, and a VendorID 44526B. The InternalID 44592A has zero or one occurrence 44594A, a data type of CDT 44596A PartyInternalID 44598A, and a length 44524 of 1 to 10 44500B. The StandardID 44502B has any number of occurrences 44504B, a data type of CDT 44506B PartyStandardID 44508B, and a length 44524 of 1 to 13. The BuyerID 44514B has zero or one occurrence 44516B, a data type of CDT 44518B PartyPartyID 44520B, and a length 44524 of 1 to 10 44522B. The VendorID 44526B has zero or one occurrence 44528B, a data type of CDT 44530B PartyPartyID 44532B and a length 44524 of 1 to 10 44534B.

The VendorParty entity 44538B includes an InternalID 44550B, a StandardID 44560B, a BuyerID 44572B, and a VendorID 44584B. The InternalID 44550B has zero or one occurrence 44552B, a data type CDT 44554B PartyInternalID 44556B, and a length 44524 of 1 to 10 44558B. The StandardID 44560B has any number of occurrences 44562B, a data type CDT 44564B PartyStandardID 44566B, and a length 44524 of 1 to 13 44568B. The BuyerID 44572B has zero or one occurrence 44574B, a data type CDT 76B PartyPartyID 44578B, and a length 44524 of 1 to 10 44580B. The VendorID 44584B has zero or one occurrence 44586B, a data type CDT 44588B PartyPartyID 44590B, and a length 44524 of 1 to 10 44592B.

The Item package 44578A includes an Item entity 44506C, a Location package 44516C, and a ProductInformation package 44518C. There is one or more 44508C Item entities 44506C for each Item package 44578A and it is of data type AGDT 44510C ProductForecastRevisionItem 44512C.

The Location package 44516C includes a ShipFromLocation entity 44520C, and a ShipToLocation entity 44578C. The ShipFromLocation entity 44520C is of type CDT 44524C BusinessTransactionDocumentShipFromLocation 44526C. There is one or zero 44522C ShipFromLocation entity 44520C for each Location package 44516C. The ShipToLocation entity 44578C is of type CDT 44582C BusinessTransactionDocumentLocation 44584C. There is one 44580C ShipToLocation entity 44578C for each Location package 44516C.

The ShipFromLocation entity 44520C includes an InternalID 44532C, a StandardID 44542C, a BuyerID 44554C, and a VendorID 44566C. The InternalID 44532C has zero or one occurrence 44534C, a data type of CDT 44536C LocationInternalID 44538C, and a length 44524 of 1 to 20 44540C. The StandardID 44542C has any number of occurrences 44544C, a data type of CDT 44546C LocationStandardID 44548C, and a length 44524 of 1 to 13 44550C. The BuyerID 44554C has zero or one occurrence 44554C, a data type of CDT 44556C LocationPartyID 44558C and a length 44524 of 1 to 20 44562C. The VendorID 44566C has zero or one occurrence 44568C, a data type of CDT 44570C LocationPartyID 44572C, and a length 44524 of 1 to 20 44574C.

The ShipToLocation entity 44578C includes an InternalID 44590C, a StandardID 44500D, a BuyerID 44512D, and a VendorID 44526D. The InternalID 44590C has zero or one occurrence 44592C, a data type of CDT 44594C LocationInternalID 44596C, and a length 44524 of 1 to 20 44598C. The StandardID 44500D has any number of occurrences 44502D, a data type of CDT 44504D LocationStandardID 44506D, and a length 44524 of 1 to 13 44508D. The BuyerID 44512D has zero or one occurrence 44514D, a data type of CDT

44516D LocationPartyID 44518D, and a length 44524 of 1 to 20 44520D. The VendorID 44526D has zero or one occurrence 44528D, a data type of CDT 44530D LocationPartyID 44532D, and a length 44524 of 1 to 20 44534D.

The ProductInformation package 44518C includes a Product entity 44538D. The Product entity 44538D is of type CDT 44542D BusinessTransactionDocumentProduct 44544D, and there is one 44540D Product entity 44538D for each ProductInformation package 44518C. The Product entity 44538D includes an InternalID 44550D, a StandardID 44560D, a BuyerID 44572D, a VendorID 44584D, and a PackageQuantity 44596D. The InternalID 44550D has zero or one occurrence 44552D, a data type of CDT 44554D ProductInternalID 44556D, and a length 44524 of 1 to 40 44558D. The StandardID 44560D has zero or one occurrence 44562D, a data type of CDT 44564D ProductStandardID 44566D, and a length 44524 of 1 to 14 44568D. The BuyerID 44572D has zero or one occurrence 44574D, a data type of CDT 44576D ProductPartyID 44578D, and a lenth 44524 of 1 to 40 44580D. The VendorID 44584D has zero or one occurrence 44586D, a data type of CDT 44588D ProductPartyID 44590D, and a length 44524 of 1 to 40 44592D. The PackageQuantity 44596D has zero or one occurrence 44598D, a data type of GDT 44500E Quantity 44502E, and a length 44524 of 19 or 6 44504E.

The Item package 44578A also includes a SalesForecastTimeSeries 44506E, PromotionSalesForecastTimeSeries 44584E, OrderForecastTimeSeries 44562F, and PromotionOrderForecastTimeSeries 44540G. The SalesForecastTimeSeries 44506E has one or zero occurrence 44508E and a data type of CDT 44510E RevisionQuantityTimeSeries 44512E. The PromotionSalesForecastTimeSeries 44584E has one or zero occurrence 44586E, and a data type of CDT 44588E RevisionQuantityTimeSeries 44590E. The OrderForecastTimeSeries 44562F has one or zero occurrence 44564F and a data type of CDT 44566F RevisionQuantityTimeSeries 44568F. The PromotionOrderForecastTimeSeries 44540G has one or zero occurrence 44542G and a data type of CDT 44544G RevisionQuantityTimeSeries 44546G.

The SalesForecastTimeSeries 44510E includes an Item 44514E. The Item 44514E has any number of occurrences 44516E. The Item 44514E includes a ValidityPeriod 44520E, a Quantity 44542E, a FixedIndicator 44552E, AdjustmentReasonCode 44560E, and a Note 44572E. The ValidityPeriod 44520E has one occurrence 44522E and a data type of GDT 44524E DateTimePeriod 44526E. The ValidityPeriod 44520E includes a StartDateTime 44530E and EndDateTime 44536E, wherein each has one or zero occurrence 44532E and 44438E, respectively. The Quantity 44542E has one occurrence 44544E and a data type of GDT 44546E Quantity 44548E. The FixedIndicator 44552E has one or zero occurrence 44554E and a data type of GDT 44556E FixedIndicator 44558E. The AdjustmentReasonCode 44560E has one or zero occurrence 44562E, a data type of GDT 44564E AdjustmentReasonCode 44566E, and a length 44524 of 1 to 35 44568E. The Note 44572E has one or zero occurrence 44574E, a data type of GDT 44576E Note 44578E, and a length 44524 of 1 to 132 44580E.

The PromotionSalesForecastTimeSeries 44584E includes an Item 44592E. The Item 44592E includes a ValidityPeriod 44598E, a Quantity 44520F, a FixedIndicator 44530F, AdjustmentReasonCode 44538F, and a Note 44550F. The Item 44592E has any number of occurrences 44594E. The ValidityPeriod 44598E has one occurrence 44500Fand a data type of GDT 44502F DateTimePeriod 44504F. The ValidityPeriod 44598E includes a StartDateTime 44508F and EndDateTime 44514F, wherein each has one or zero occurrence 44510F and 44516F, respectively. The Quantity 44520F has one occurrence 44522F and a data type of GDT 44524F Quantity 44526F. The FixedIndicator 44530F has one or zero occurrence 44532F and a data type of GDT 44534F FixedIndicator 44536F. The AdjustmentReasonCode 38F has one or zero occurrence 44540F, a data type of GDT 44542F AdjustmentReasonCode 44544F, a length 44524 of 1 to 35 44546F. The Note 44550F has one or zero occurrence 44552F, a data type of GDT 44554F Note 44556F, and a length 44524 of 1 to 132 44558F.

The OrderForecastTimeSeries 44562F includes an Item 44570F. The Item 44570F includes a ValidityPeriod 44576F, a Quantity 44598F, a FixedIndicator 44508G, AdjustmentReasonCode 44516G, and a Note 44528G. The Item 44570F has any number of occurrences 44572F. The ValidityPeriod 44576F has one occurrence 44578F and a data type of GDT 44580F DateTimePeriod 44582F. The ValidityPeriod 44576F includes a StartDateTime 44586F and EndDateTime 44592F, wherein each has one or zero occurrence 44588F and 44594F, respectively. The Quantity 44598F has one occurrence 44500G and a data type of GDT 44502G Quantity 44504G. The FixedIndicator 44508G has one or zero occurrence 44510G and a data type of GDT 44512G FixedIndicator 44514G. The AdjustmentReasonCode 44516G has one or zero occurrence 44518G, a data type of GDT 44520G AdjustmentReasonCode 44522G, and a length 44524 of 1 to 35 44524G. The Note 44528G has one or zero occurrence 44530G, a data type of GDT 44532G Note 44534G, and a length 44524 of 1 to 132 44536G.

The PromotionOrderForecastTimeSeries 44540G includes an Item 44548G. The Item 44548G includes a ValidityPeriod 44554G, a Quantity 44576G, a FixedIndicator 44586G, AdjustmentReasonCode 44594G, and a Note 44506H. The Item 44548G has any number of occurrences 44550G. The ValidityPeriod 44554G has one occurrence 44556G and a data type of GDT 44558G DateTimePeriod 44560G. The ValidityPeriod 44554G includes a StartDateTime 44564G and EndDateTime 44570G, wherein each has one or zero occurrence 44566G and 44572G, respectively. The Quantity 44576G has one occurrence 44578G and a data type of GDT 44580G Quantity 44582G. The FixedIndicator 44586G has one or zero occurrence 44588G and a data type of GDT 44590G FixedIndicator 44592G. The AdjustmentReasonCode 44594G has one or zero occurrence 44596G, a data type of GDT 44598G AdjustmentReasonCode 44500H, and a length 44524 of 1 to 35 44502H. The Note 44506H has one or zero occurrence 44508H, a data type of GDT 44510H Note 44512H, and a length 44524 of 1 to 132 44514H.

bb) Replenishment Order Interfaces

The ReplenishmentOrder messages are used by a vendor to transfer the replenishment orders which he or she has planned for a customer from logistics planning to logistics execution (ReplenishmentOrderNotification) or to confirm the fulfillment of replenishment orders to logistics planning (ReplenishmentOrderConfirmation). To enable a flexible response to customers' product requirements, the creation of replenishment orders in logistics planning is directly linked to an optimum combination of shipments and is transferred in this way to logistics execution to prepare and perform the outbound delivery.

The ReplenishmentOrderNotification and ReplenishmentOrderConfirmation messages are exchanged between the Inventory Collaboration Hub (ICH) and backend system (ERP) of a vendor as part of the "Responsive Replenishment (RR)" business scenario. In this scenario, the ICH performs the "planning" function, while the vendor's backend system performs the "execution" function.

(1) Message Types (a) Replenishment Order Notification

A ReplenishmentOrderNotification is the notification by logistics planning (SCP, vendor) to logistics execution (SCE, vendor) about a replenishment order planned for a customer/buyer to so that further order processing is triggered or the relevant goods issue is prepared. The structure of the message type ReplenishmentOrderNotification is specified by the message data type ReplenishmentOrderNotificationMessage.

(b) Replenishment Order Confirmation

A ReplenishmentOrderConfirmation is the confirmation from logistics execution (SCE, vendor) to logistics planning (SCP, vendor) that a replenishment order that is planned for a customer/buyer can be fulfilled. The structure of the message type ReplenishmentOrderConfirmation is specified by the message data type ReplenishmentOrderConfirmationMessage. The message transmission is always complete ("complete transmission").

(2) Message Choreography

The following message choreography describes the possible logical sequence of the messages that are necessary to realize the scenario between a Buyer 44600, a vendor's Supply Chain Planning system 44602, and a vendor's Supply Chain Execution system 44604, wherein there is a separation of entities 44616 as between the Buyer 44600 and the Vendor.

A Buyer 44600 can use the OrderIDAssignmentNotification message 44606 to transmit valid purchase order numbers to a vendor's Supply Chain Planning system 44602 for creating replenishment orders. These replenishment orders are transmitted from the vendor's Supply Chain Planning system 44602 to the vendor's Supply Chain Execution system 44604 using the ReplenishmentOrderNotification message 44608. The Supply Chain Execution system 44604 checks the availability of the required products and uses the ReplenishmentOrderConfirmation message 44610 to confirm that the replenishment orders have been fulfilled. The Buyer 44600 is then informed of this using the VendorGeneratedOrderNotification message 44612. The Buyer 44600 can then send an optional order confirmation to the vendor using the VendorGeneratedOrderConfirmation message 44614. If the two business partners collaborate very closely, this order confirmation might not be necessary. In this case, the VendorGeneratedOrderNotification 44612 creates a purchase order directly on the Buyer's side.

(3) Data Model of Replenishment Order Message

FIG. 447 depicts the data model for the Replenishment Order Message. The ReplenishmentOrderMessage package 44700 message data type groups together the following: (1) the business information that is relevant for sending a business document in a message and (2) the ReplenishmentOrder object 44702 in the business document. The ReplenishmentOrderMessage package 44700 message includes a ReplenishmentOrder object 44702, a MessageHeader 44704, and a ReplenishmentOrder 44706. The template message data type ReplenishmentOrderMessage is the maximum structure (template) for the following message data types: ReplenishmentOrderNotificationMessage, ReplenishmentOrderConfirmationMessage, and ReplenishmentOrderInformationMessage and the associated message types and interfaces. ReplenishmentOrderNotificationMessage, ReplenishmentOrderConfirmationMessage, and ReplenishmentOrderInformationMessage are derived from the ReplenishmentOrderMessage as structural views. Differences and/or constraints of ReplenishmentOrderNotificationMessage, ReplenishmentOrderConfirmationMessage, or ReplenishmentOrderInformationMessage with regard to the ReplenishmentOrderMessage are listed in the relevant "Integration" section.

There is a 1:c relationship between entities in these Interfaces unless otherwise noted herein or indicated in the Figures.

(a) Message Header Package

A MessageHeader package 44704 groups the business information that is relevant for sending a business document in a message. It includes a MessageHeader entity 44708. There is a 1:1 relationship between MessageHeader entity 44708 and ReplenishmentOrderMessage entity 44702.

A MessageHeader package 44704 groups business information from the perspective of the sending application to identify the business document in a message, information about the sender, and, optionally, information about the recipient.

(i) Message Header

The MessageHeader entity 44708 is divided up into a SenderParty entity 44710 and a RecipientParty entity 44712. It is of type GDT: BusinessDocumentMessageHeader. The MessageHeader entity 44708 includes an ID and a CreationDateTime. The ID refers to the identification of the business document in the technical message, and the CreationDateTime refers to the creation date of the business document in the technical message.

(ii) Sender Party

A SenderParty entity 44710 is the party responsible for sending a business document at business application level. The SenderParty entity 44712 is of type GDT: BusinessDocumentMessageHeaderParty.

(iii) Recipient Party

A RecipientParty entity 44712 is the party responsible for receiving a business document at business application level. The RecipientParty entity 44714 is of type GDT: BusinessDocumentMessageHeaderParty.

(b) Replenishment Order Package

The ReplenishmentOrder package 44706 groups the ReplenishmentOrder entity 44714 and its packages. It includes a Party package 44716, a DeliveryInformation package 44718, a PaymentInformation package 44720, a ReplenishmentOrderItem package 44722, and a HandlingUnit package 44724.

The HandlingUnit package 44724 and its contents are not required in the ReplenishmentOrderConfirmationMessage.

(i) Replenishment Order

A ReplenishmentOrder entity 44714 is a replenishment order that is planned and executed by a vendor for his or her customer. The dates and quantities for delivering a certain product are described in the items and schedule lines. The business partners involved and (where applicable) references to other relevant business documents are also listed. There is a 1:1 relationship between ReplenishmentOrder entity 44714 and ReplenishmentOrderMessage entity 44702.

Replenishment Order entity 44714 includes the following attributes: an ActionCode and ItemListCompleteTransmissionIndicator. The ActionCode is a coded representation of an instruction to the message recipient as to how he or she should process the replenishment order (new creation, change, or deletion). Coded representations that strictly conform semantically with ActionCodes "01" (Create), "02" (Change), and "03" (Delete) are supported. The ActionCode is of type GDT: ActionCode. The ItemListCompleteTransmissionIndicator specifies whether all purchase order items are always to be transmitted (i.e., items that are not transmitted are implicitly classified as canceled) or whether only new, changed purchase order items that have been canceled since the last transmission are to be transmitted. The ItemListCompleteTransmissionIndicator is of type GDT: CompleteTransmissionIndicator.

The Replenishment Order entity 44714 also includes the following elements: an ID, a CreationDateTime, a LastChangeDateTime, a TransportMeansDescriptionCode, a TransportServiceLevelCode, a GrossWeightMeasure, a NetWeightMeasure, a GrossVolumeMeasure, and a Note. The ID is the unique identifier for the ReplenishmentOrder, and is of type GDT: BusinessTransactionDocumentID. The CreationDateTime is of type GDT: DateTime. The LastChangeDateTime is the time that the last change was made to the ReplenishmentOrder, and is of type GDT: DateTime. The TransportMeansDescriptionCode is for the replenishment delivery, and is of type GDT: TransportMeansDescriptionCode. The TransportServiceLevelCode is for the replenishment delivery (and their swiftness in particular), and is of type GDT: TransportServiceLevelCode. The GrossWeightMeasure is of type GDT: Measure. The NetWeightMeasure is of type GDT: Measure. The GrossVolumeMeasure is the estimated gross volume of the resulting replenishment delivery, and is of type GDT: Measure. The Note is the note about ReplenishmentOrder, for example, an instruction for processing the order. The Note is of type GDT: Note.

(ii) Party Package

The Party package 44716 groups the business partners that are relevant for the replenishment process. It includes a BuyerParty entity 44726, SellerParty entity 44728, and a VendorParty entity 44730.

(a) Buyer Party

BuyerParty entity 44726 is the company that purchases the goods contained in the replenishment order. BuyerParty entity 44726 is of type GDT: BusinessTransactionDocumentParty, whereby, in one implementation, the InternalID, the StandardID, the BuyerID, the VendorID, and Address and, optionally, several ContactPersons with InternalID, BuyerID, VendorID, and Address are required.

For intra-enterprise communication (with common master data), the BuyerParty entity 44734 is constrained to use only InternalID for all party entities. For inter-enterprise communication (with business-partner-specific master data), the BuyerParty entity 44734 is constrained to use only the StandardID or the partner-role-specific ID of the receiving partner for all party entities; in other words, the BuyerID is used for Supplier Collaboration scenarios, and the VendorID is used for Customer Collaboration scernerios. Due to the different possibilities for ID use, all ID elements of the particular "Party" are optional.

(b) Seller Party

The SellerParty entity 44728 is the company that sells the goods contained in the replenishment order. SellerParty entity 44728 is of type GDT: BusinessTransactionDocumeniParty, whereby, in one implementation, the InternalID, the StandardID, the BuyerID, the VendorID, and Address and, optionally, several ContactPersons with InternalID, BuyerID, VendorID, and Address are required.

For intra-enterprise communication (with common master data), the SellerParty entity 44728 is constrained to use only InternalID for all party entities. For inter-enterprise communication (with business-partner-specific master data), the SellerParty entity 44728 is constrained to use only the StandardID or the partner-role-specific ID of the receiving partner for all party entities; in other words, the BuyerID is used for Supplier Collaboration scenarios, and the VendorID is used for Customer Collaboration scernerios. Due to the different possibilities for ID use, all ID elements of the particular "Party" are optional.

(c) Vendor Party

A VendorParty entity 44730 is the company that is to provide a replenishment delivery. VendorParty entity 44730 is of type GDT: BusinessTransactionDocumentParty, whereby, in one implementation, the InternalID, the StandardID, the BuyerID, the VendorID, and Address and, optionally, several ContactPersons with InternalID, BuyerID, VendorID, and Address are required.

For intra-enterprise communication (with common master data), the VendorParty entity 44730 is constrained to use only InternalID for all party entities. For inter-enterprise communication (with business-partner-specific master data), the VendorParty entity 44730 is constrained to use only the StandardID or the partner-role-specific ID of the receiving partner for all party entities; in other words, the BuyerID is used for Supplier Collaboration scenarios, and the VendorID is used for Customer Collaboration scernerios. Due to the different possibilities for ID use, all ID elements of the particular "Party" are optional.

(iii) Delivery Information Package

A DeliveryInformation package 44718 groups together all the information about a delivery for a replenishment order. It includes DeliveryTerms entity 44732.

DeliveryTerms entity 44732 are the conditions and agreements that are valid for executing the delivery and transporting the goods being delivered and for the necessary services and activities. The DeliveryTerms entity 44732 are of the type GDT: DeliveryTerms, whereby, in one implementation, "DeliveryPriorityCode," "Incoterms," and "QuantityTolerance" are required.

(iv) Payment Information Package

The PaymentInformation package 44720 groups together all the payment information for the replenishment order. It includes CashDiscountTerms 44734.

CashDiscountTerms 44734 are the payment conditions for the replenishment order. The CashDiscountTerms are of type GDT: CashDiscountTerms (with the element "Description").

(v) Replenishment Order Item Package

The ReplenishmentOrderItem package 44722 is a group of one or more items in a ReplenishmentOrder. It includes a ReplenishmentOrderItem entity 44736, a BusinessTransactionDocumentReference package 44738, a Party package 44740, a Location package 44742, a ProductInformation package 44744, a Batch package 44746, a Promotion package 44748, DeliveryInformation package 44750, a PriceInformation package 44752, and a ReplenishmentOrderScheduleLine package 44754.

(a) ReplenishmentOrderItem

A ReplenishmentOrderItem entity 44736 is an item in a replenishment order that is planned and executed by a vendor for his or her customer. The dates and quantities for delivering a certain product are described in the individual items and schedule lines. The business partners involved and (where applicable) references to other relevant business documents are also listed. There is a I :n relationship between ReplenishmentOrderItem 44736 and ReplenishmentOrder 44714.

ReplenishmentOrderItem entity 44736 includes the following attribute: ActionCode, which is the coded representation of an instruction to the message recipient as to how he or she should process the replenishment order item, and is of type GDT: ActionCode. ReplenishmentOrderItem entity 44736 also includes the following elements: an ID, a HierarchyRelationship, a SubcontractingIndicator, a VendorInitiatedActionIndicator, a BlockedIndicator, a CompletedIndicator, an AcceptanceStatusCode, a ConsignmentIndicator, a ThirdPartyDealIndicator, a CancelledIndicator, a CancellationReasonCode, a KanbanCardID, a NetWeightMeasure, a Note, a FollowUpReplenishmentOrderConfirmationRequirementCode, and FollowUpDespatchedDeliveryNotificationRequirementCode.

The ID identifies the item in the ReplenishmentOrder, and is of type GDT: BusinessTransactionDocumentItemID.

The HierarchyRelationship refers to a semantic representation that defines the hierarchies are mapped for items that contain other items. Item hierarchies are supported for substitute products, that is, items for which a subitem which has a substitute product can exist (e.g., HierarchyRelationshipTypeCode "006"). Multilevel product hierarchies for substitute products are not permitted, i.e., a substitute product that cannot itself be substituted.

The AcceptanceStatusCode is the acceptance status for executing the planned replenishment order item, and is of type GDT: AcceptanceStatusCode. The AcceptanceStatusCode is not used in the ReplenishmentOrderNotificationMessage.

The ConsignmentIndicator indicates whether or not the product quantity listed in the item belongs to the consignment stock, and is of type GDT: ConsignmentIndicator.

The ThirdPartyDealIndicator indicates whether or not the replenishment order item is used in the context of a third-party deal. This is the case, in particular, if the predecessor document of the replenishment order is a sales order that is referenced using the OriginSalesOrderReference. The ThirdPartyDealIndicator is of type GDT: BusinessTransactionDocumentItemThirdPartyDealIndicator.

The SubcontractingIndicator specifies whether or not the replenishment order item is used in the context of a subcontracting deal and is of type GDT: SubcontractingIndicator.

The VendorInitiatedActionIndicator specifies whether the instruction to the message recipient, which is specified in the "ActionCode", and which defines how the item is to be processed, was inititated by the vendor or not and is of type GDT: VendorInitiatedActionIndicator.

The BlockedIndicator specifies whether or not order execution of the replenishment order is blocked and is of type GDT: BusinessTransactionBlockedIndicator.

The CompletedIndicator specifies whether the order execution is or is not completed by the quantity of a product specified in the replenishment order item, and is of type GDT: BusinessTransactionCompletedIndicator.

The CancelledIndicator indicates whether or not the replenishment order item has been cancelled (from a business perspective), and is of type GDT: CancelledIndicator.

The CancellationReasonCode is the coded representation of the cancellation reason code of a replenishment order item, and is of type GDT: CancellationReasonCode. The CancellationReasonCode can only be used if the CancelledIndicator is set to "True".

The KanBanCardID is the unique identifier for a replenishment or production signal that is sent from a consumer to a supplier and is of type GDT: KanbanCardID.

The NetWeightMeasure is the net weight of the product quantity listed in the item, and is of type GDT: Measure.

The Note is the note on the ReplenishmentOrder item. For example, the note could be instructions for processing an item. The Note is of type GDT: Note.

The FollowUpReplenishmentOrderConfirmationRequirementCode is the coded representation of information as to whether the buyer is expecting a confirmation message from the supplier for the Replenishment Order and is of type GDT: FollowMessageRequirementCode. If the buyer changes the RequirementCode from "Forbidden" to "Required" during an ordering process, the supplier should send the current confirmation status, even for replenishment order items that have already been delivered or invoiced. If the code is changed from "Required" to "Forbidden", the supplier is allowed to send further confirmations only in the case of a cancelation. Only the values "01" (required), "03" (optional) und "04" (forbidden) are permitted for the FollowUpReplenishmentOrderConfirmationRequirementCode . The Code can be changed by the buyer only. The FollowUpReplenishmentOrderConfirmationRequirementCode is not used in the ReplenishmentOrderConfirmation.

The FollowUpDespatchedDeliveryNotificationRequirementCode is the coded representation of information as to whether or not the buyer is expecting notification from the supplier for the outbound delivery of the goods ordered and is of type CDT: FollowUpMessageRequirementCode. If the buyer changes the RequirementCode from "Forbidden" to "Required" during an ordering process, the seller should inform the buyer of all the new outbound deliveries for the replenishment order once the change has been received. If the buyer changes the RequirementCode from "Required" to "Forbidden," the seller should not send any further information about outbound deliveries. Only the values "01" (required), "03" (optional) und "04" (forbidden) are permitted for the FollowUpDespatchedDeliveryNotificationRequirementCode . The Code can be changed by the buyer only. The FollowUpDespatchedDeliveryNotificationRequirementCode is not used in the ReplenishmentOrderConfirmation.

The CancelledIndicator and the CancellationReasonCode are not used in the ReplenishmentOrderConfirmationMessage.

(b) Business Transaction Document Reference Package

The BusinessTransactionDocumentReference package 44738 is a group of references to other business documents that can occur in the replenishment process. It includes a PurchasingContractReference entity 44756, a SchedulingAgreementReference entity 44758, a PurchaseOrderReference entity 44760, an OriginPurchaseOrderReference entity 44762, a SalesOrderReference entity 44764, and an OriginSalesOrderReference entity 44766.

(i) Purchasing Contract Reference

A PurchasingContractReference entity 44756 is the reference to a purchase contract or item in a purchase contract. The PurchasingContractReference entity 44756 is of type GDT: BusinessTransactionDocumentReference.

(ii) Scheduling Agreement Reference

A SchedulingAgreementReference 44758 is the reference to a scheduling agreement or to an item in a scheduling agreement and is of type GDT: BusinessTransactionDocumentReference.

(iii) Purchase Order Reference

PurchaseOrderReference entity 447760 is the reference to the buyer's purchase order and purchase order item created by the vendor in supply chain planning. PurchaseOrderReference entity 44760 is of type GDT: BusinessTransactionDocumentReference. PurchaseOrderReference includes the purchase order number and purchase order item number assigned by the buyer (sold-to party) and transferred to the vendor's supply chain planning system with the OrderIDAssignmentNotification message. This reference is used to extend the sales order in the vendor's supply chain execution system to include the buyer's external document ID.

(iv) Origin Purchase Order Reference

An OriginPurchaseOrderReference entity 44762 is the reference to the original purchase order or to an item within the original purchase order in a third-party deal. OriginPurchaseOrderReference entity 44762 is of type GDT: BusinessTransactionDocumentReference. OriginPurchaseOrderReference entity 44762 is used for third-party deals only. The OriginPurchaseOrderReference entity 44762 is used in all the purchase order documents in a third-party deal, so that the seller or vendor can reference the original purchase order of the ProductRecipientParty with the OriginPurchaseOrderReference entity 44762 in subsequent process steps.

(v) Sales Order Reference

A SalesOrderReference entity 44764 is the reference to the sales order or sales order item created for the ReplenishmentOrder in the vendor's logistics execution system. SalesOrderReference 44764 is of type GDT: BusinessTransactionDocumentReference.

The SalesOrderReference 44764 is not required in the ReplenishmentOrderNotificationMessage in the "Responsive Replenishment" business scenario because the vendor's logistics execution system uses the order number of the replenishment order directly.

This reference is used to extend the buyer's purchase order to include the vendor's external document ID.

(vi) Origin Sales Order Reference

An OriginSalesOrderReference entity 44766 is the reference to the original sales order or to an item within the original sales order in a third-party deal. The OriginSalesOrderReference entity 44766 is of type GDT: BusinessTransactionDocumentReference.

OriginSalesOrderReference is used for third-party deals.

The OriginSalesOrderReference entity 44766 is used in all the purchase order documents in a third-party deal, so that the seller or vendor can reference the original sales order of the BuyerParty with the OriginSalesOrderReference entity 44766 in subsequent process steps.

(c) Party Package

The Party package entity 44740 groups the business partners that are relevant for the replenishment process. It includes a BuyerParty entity 44768, a ProductRecipentParty entity 44770 and a BillToParty entity 44772.

(i) Buyer Party

A BuyerParty entity 44768 is the company that purchases the goods contained in the replenishment order item. The BuyerParty 44768 is of type GDT: BusinessTransactionDocumentParty, whereby, in one implementation, the InternalID, the StandardID, the BuyerID, the VendorID, and Address are required.

For intra-enterprise communication (with common master data), use only InternalID for all party entities. For inter-enterprise communication (with business-partner-specific master data), use only the StandardID or the partner-role-specific ID of the receiving partner for all party entities; in other words, use the BuyerID for Supplier Collaboration scenarios, and use the VendorID for Customer Collaboration scenarios. Due to the different possibilities for ID use, all ID elements of the particular "Party" are optional.

In the case of the BuyerParty 44768, a default logic exists at header level for the items. This means that the BuyerParty 44768 specified at header level is valid for all items as long as the information specified at item level does not contradict this.

(ii) Product Recipient Party

A ProductRecipientParty entity 44770 is the company or person that/who receives the replenishment delivery. The ProductRecipientParty entity 44770 is of type GDT: BusinessTransactionDocumentParty, whereby, in one implementation, the InternalID, the StandardID, the BuyerID, the VendorID, and Address are required.

For intra-enterprise communication (with common master data), use only InternalID for all party entities. For inter-enterprise communication (with business-partner-specific master data), use only the StandardID or the partner-role-specific ID of the receiving partner for all party entities; in other words, use the BuyerID for Supplier Collaboration scenarios, and use the VendorID for Customer Collaboration scenarios. Due to the different possibilities for ID use, all ID elements of the particular "Party" are optional.

(iii) Bill To Party

The BillToParty entity 44772 is the company or the person to be sent the invoice for the replenishment delivery. The BillToParty entity 44772 is of type GDT: BusinessTransactionDocumentParty, whereby, in one implementation, the InternalID, the StandardID, the BuyerID, the VendorID, and Address are required.

For intra-enterprise communication (with common master data), use only InternalID for all party entities. For inter-enterprise communication (with business-partner-specific master data), use only the StandardID or the partner-role-specific ID of the receiving partner for all party entities; in other words, use the BuyerID for Supplier Collaboration scenarios, and use the VendorID for Customer Collaboration scenarios. Due to the different possibilities for ID use, all ID elements of the particular "Party" are optional.

(d) Location Package

The Location package entity 44742 groups the locations that might be relevant within the replenishment process. It includes a ShipFromLocation entity 44774, a TransshipmentLocation entity 44776, and a ShipToLocation entity 44778.

(i) Ship From Package

ShipFromLocation entity 44774 is the location from which the quantity of a product listed in the item for a ReplenishmentOrder is to be delivered. ShipFromLocation entity 44774 is of type GDT: BusinessTransactionDocumentShipFromLocation, where the InternalID, StandardID, BuyerID, VendorID, LoadingLocation, and Address are used. There is a 1:1 relationship between ShipFromLocation entity 44774 and ReplenishmentOrderItem entity 44736. For intra-enterprise communication (with common master data), use InternalID for all location entities. For inter-enterprise communication (with business-partner-specific master data), use the StandardID or the partner-role-specific ID of the sending or receiving partner for all location entities, in other words, the BuyerID or VendorID. Due to the different options for ID use, all ID elements of the particular "location" are optional.

(ii) Transshipment Location

The TransshipmentLocation entity 44776 is the location at which the quantity of a product listed in the item for a ReplenishmentOrder is to be loaded from one vehicle to another on its way to the recipient. The TransshipmentLocation entity 44776 is of type GDT: BusinessTransactionDocumentTransshipmentLocation, whereby, in one implementation, the InternalID, StandardID, BuyerID, VendorID, LoadingLocation, UnloadingLocation, and Address are required. For intra-enterprise communication (with common master data), use InternalID for all location entities. For inter-enterprise communication (with business-partner-specific master data), use the StandardID or the partner-role-specific ID of the sending or receiving partner for all location entities, in other words, the BuyerID or VendorID. Due to the different options for ID use, all ID elements of the particular "location" are optional.

(iii) Ship To Location

The ShipToLocation entity 44704A is the location to which the quantity of a product listed in the item for a ReplenishmentOrder is to be delivered. The ShipToLocation entity 44778 is of type GDT: BusinessTransactionDocumentShipToLocation, whereby, in one implementation, the InternalID, StandardID, BuyerID, VendorID, UnoadingLocation, and Address are required. There is a 1:1 relationship between ShipToLocation entity 44778 and ReplenishmentOrderItem entity 44736. For intra-enterprise communication (with common master data), use InternalID for all location entities. For inter-enterprise communication (with business-partner-specific master data), use the StandardID or the partner-role-specific ID of the sending or receiving partner for all location entities, in other words, the BuyerID or VendorID. Due to the different options for ID use, all ID elements of the particular "location" are optional.

(e) Product Information Package

The ProductInformation package 44744 groups the information that characterizes the product listed in the item of a ReplenishmentOrder in greater detail. It includes a Product entity 44780.

The Product entity 44780 includes the information for identifying a delivered product and the package quantity used. Product entity 44780 is of type GDT: BusinessTransactionDocumentProduct, where the InternalID, StandardID, BuyerID, VendorID, the ChangeID, and PackageQuantity are used. There is a 1:1 relationship between Product entity 44780 and ReplenishmentOrderItem entity 44736. For intra-enterprise communication (with common master data), use the InternalID for all product entities. For inter-enterprise communication (with business-partner-specific master data), use for all product entities either the StandardID or the partner-role-specific ID of the sending or receiving partner, in other words, the BuyerID or VendorID. Due to the different options for ID use, all ID elements of the particular "product" are optional.

(f) Batch Package

The Batch package 44746 groups the information that characterizes the batch listed in the item of a ReplenishmentOrder in greater detail. It includes a Batch entity 44782.

The Batch entity 44782 includes specifications for identifying a batch to be delivered. The Batch entity 44782 includes an InternalID, a BuyerID, a VendorID, a ManufacturingDate, a BestBeforeDate, and an OriginCountryCode. The InternalID is the proprietary identifier for the batch, and is of type GDT: BatchID. The BuyerID is the unique identifier used by the BuyerParty for the batch, and is of type GDT: BatchID. The VendorID is the unique identifier used by the VendorParty for the batch, and is of type GDT: BatchID. The ManufacturingDate is the date of manufacture of the batch, and is of type GDT: Date. The BestBeforeDate is the best-before date of the batch, and is of type GDT: Date. The OriginCountryCode is the coded representation of country of origin of the batch, and is of type GDT: CountryCode.

(g) Promotion Package

The Promotion package 44748 groups all the data regarding marketing promotions that are relevant for the product listed in a ReplenishmentOrder item. It includes a Promotion entity 447284.

The Promotion entity 44784 includes data that identifies a marketing promotion that is planned by the ordering party for the product to be delivered. A Promotion entity 44784 includes an InternalID, a BuyerID, and a VendorID. The InternalID identifies the marketing promotion (for communication within the company), and is of type GDT: PromotionInternalID. The BuyerID identifies the marketing promotion (used by BuyerParty), and is of type GDT: PromotionPartyID. The VendorID identifies the marketing promotion (used by VendorParty), and is of type GDT: PromotionPartyID.

(h) Delivery Information Package

A DeliveryInformation package 44750 groups together all the information about a requested delivery for a replenishment order item. It includes DeliveryTerms entity 44786.

DeliveryTerms entity 44786 are the conditions and agreements that are valid for executing the delivery and transporting the goods being delivered and for the necessary services and activities. The DeliveryTerms entity 44786 are of the type GDT: DeliveryTerms, whereby, in one implementation, "DeliveryPriorityCode," "Incoterms," and "QuantityTolerance" are required.

(i) Price Information Package

A PriceInformation package 44752 groups together all the price information in an item of the replenishment order. It includes a NetPrice entity 44788.

The NetPrice entity 44788 is the net price for the base quantity of the product ordered in the item without taxes and without discount. NetPrice entity 44788 is of type GDT: Price.

(j) Replenishment Order Item Schedule Line Package

The ReplenishmentOrderItemScheduleLine package 44754 groups all of the quantity and date information for a ReplenishmentOrderItem entity 44736. It includes a ScheduleLine entity 44790 and a ConfirmedScheduleLine entity 44792.

(i) Schedule Line

The ScheduleLine entity 44790 is a schedule line containing a quantity and scheduling dates planned by the vendor for his or her customer for replenishment deliveries of a product. There is a 1:n relationship between ScheduleLine entity 44790 and ReplenishmentOrderItem entity 44736.

The ScheduleLine entity 44790 includes the following attribute: ActionCode, which is a coded representation of an instruction to the message recipient as to how he or she should process the schedule lines of the replenishment order items. The ActionCode is of type GDT: ActionCode.

The ScheduleLine entity 44790 also includes the following elements: a ShipmentGroupID, a TransportPlanningPeriod, a PositioningPeriod, a LoadingPeriod, a ShippingPeriod, a DeliveryPeriod, an AvailabilityPeriod, a PickupPeriod, a Quantity, and a ReceivedQuantity. The ShipmentGroupID identifies a group of ReplenishmentOrderItems that can be combined for a shipment, and is of type GDT: BusinessTransactionDocumentGroupID. The TransportPlanningPeriod is the period in which the shipment has to be organized, and is of type GDT: DateTimePeriod. The PositioningPeriod is the period in which the products are picked and packed, and is of type GDT: DateTimePeriod. The LoadingPeriod is the period in which the products are loaded onto the means of transport, and is of type GDT: DateTimePeriod. The ShippingPeriod is the period in which the products leave the ship-from location, and is of type GDT: DateTimePeriod. The DeliveryPeriod is the period in which the products are expected to be delivered, and is of type GDT: DateTimePeriod. The AvailabilityPeriod is the period in which the products are available at the ship-to location, and is of type GDT: DateTimePeriod. The PickupPeriod is the period in which the products can be picked up, and is of type GDT: DateTimePeriod. The Quantity is the quantity of a product in a replenishment delivery to be delivered or picked up, and is of type GDT: Quantity. The ReceivedQuantity is the actual received product quantity of a replenishment delivery, and is of type GDT: Quantity.

The ScheduleLine entity 44790 also includes a ComponentRequirement entity 44794. The ComponentRequirement entity 44794 refers to the component requirements necessary to produce the product quantity of the replenishment order specified in the schedule line. There is a 1:cn relationship between a ComponentRequirement entity 44794 and the ScheduleLine entity 44790.

The ComponentRequirement entity 44794 includes a Product entity 44796 and a Quantity element, the latter of which refers to the product quantity for the component requirement. As a rule, only those component requirements that are critical, that is, either extremely expensive or, with regards to final assembly, very susceptible, are considered in planning and communicated to the producer. Permitted scrap quantities can potentially be considered here. This leads to a corresponding increase of component requirements. There is a 1:1 relationship between a Product entity 44796 and the ComponentRequirement entity 44794.

The Product entity 44796 contains specifications to identify the product for the component requirement. The Product entity 44796 is of type GDT: BusinessTransactionDocumentProduct, whereby, in one implementation, the InternalID, the StandardID, the BuyerID, and the VendorID are required. For intra-enterprise communication (with common master data), only use the InternalID for all product entities. For inter-enterprise communication (with business-partner-specific master data), use for all product entities either only the StandardID or the partner-role-specific ID of the sending or receiving partner, in other words, the BuyerID or VendorID. Due to the different options for ID use, all ID elements of the particular "product" are optional.

(ii) Confirmed Schedule Line

The ConfirmedScheduleLine entity 44792 is a schedule line with a quantity and dates from the performance schedule confirmed by the vendor's logistics execution system. The ConfirmedScheduleLine entity 44792 can contain discrepancies with regard to the original schedule line in terms of scheduling periods and delivery quantities. There is a 1:cn relationship between ConfirmedScheduleLine entity 44792 and ReplenishmentOrderItem entity 44736.

The structure of the ConfirmedScheduleLine entity 44792 is as ScheduleLine entity 44790 but without the element "ReceivedQuantity."

The ConfirmedScheduleLine entity 44792 also includes a ComponentRequirement entity 44798. The ComponentRequirement entity 44798 refers to the component requirements necessary to produce the product quantity of the replenishment order specified in the schedule line. There is a 1:cn relationship between a ComponentRequirement entity 44798 and the ConfirmedScheduleLine entity 44792.

The ConfirmedScheduleLine entity 44792 includes a Product entity 44700A and a Quantity element, the latter of which refers to the product quantity for the component requirement. As a rule, only those component requirements that are critical, that is, either extremely expensive or, with regards to final assembly, very susceptible, are considered in planning and communicated to the producer. Permitted scrap quantities can potentially be considered here. This leads to a corresponding increase of component requirements. There is a 1:1 relationship between a Product entity 44700A and the ComponentRequirement entity 44798.

The Product entity 44700A contains specifications to identify the product for the component requirement. The Product entity 44700A is of type GDT: BusinessTransactionDocumentProduct, whereby, in one implementation, the InternalID, the StandardID, the BuyerID, and the VendorID are required. For intra-enterprise communication (with common master data), only use the InternalID for all product entities. For inter-enterprise communication (with business-partner-specific master data), use for all product entities either only the StandardID or the partner-role-specific ID of the sending or receiving partner, in other words, the BuyerID or VendorID. Due to the different options for ID use, all ID elements of the particular "product" are optional.

(vi) Handling Unit Package

The HandlingUnit package 44724 groups the information that characterizes in detail how the delivery is packed or is to be packed. It includes a HandlingUnit entity 44702A.

The HandlingUnit package 44724 and HandlingUnit entity 44702A are not required in the ReplenishmentOrderConfirmationMessage.

A HandlingUnit entity 44702A is a physical unit of packaging materials (load carrier, additional packaging materials) and the packaged products (of type "material"). HandlingUnit 44702A is of type GDT: HandlingUnit. There is a 1:cn relationship between HandlingUnit entity 44702A and ReplenishmentOrder entity 44714.

The product listed in a ReplenishmentOrderItem can be distributed among several HandlingUnits and a HandlingUnit can contain products that are listed in several items. The products included in a HandlingUnit are specified by the "HandlingUnitLoad" element by means of a reference to the relevant items in the ReplenishmentOrder.

(4) Element Structure of Replenishment OrderNotification Message

The message data type element structure for the ReplenishmentOrderNotification message is depicted in FIG. 448. The element structure is similar to the data model, but provides additional information regarding the details of the interface. The element structure identifies the different packages 44800 in the interface, and represents the entities at various levels within the interface. As depicted in FIG. 448, the interface for ReplenishmentOrderNotification message includes six levels 44802, 44804, 44806, 44808, 44810, and 44812. The outermost package of this interface is a ReplenishmentOrderNotification package 44820, which includes a ReplenishmentOrderNotification entity 44822 at the first level 44802, a BusinessDocumentMessageHeader package 44828, and a ReplenishmentOrder package 44830. The BusinessDocumentMessageHeader package 44828 includes a MessageHeader entity 44832 at the second level 44804. The ReplenishmentOrder package 44830 includes a ReplenishmentOrder entity 44888 at the second level 44804; a Party package 44808A, a DeliveryInformation package 44810A; a TransportMeansDescriptionCode 44800C, a TransportServiceLevelCode 44808C, a GrossWeightMeasure 44816C, a NetWeightMeasure 44824C, a GrossVolumeMeasure 44832C at the third level 44806; a PaymentInformation package 44812A; a Note 44846C at the third level 44806; an Item package 44814A, and a HandlingUnit package 44815A.

The ReplenishmentOrderNotification entity 44822 is of a type G/CDT 44816 "ReplenishmentOrderNotification" 44826, and there is one 44824 ReplenishmentOrderNotification 44822 for each ReplenishmentOrderNotification package 44820.

The BusinessDocumentMessageHeader package 44828 includes a MessageHeader entity 44832 at the second level 44804. The MessageHeader entity 44832 is of the type G/CDT 44816 "BusinessDocumentMessageHeader 44836, and there is one 44834 MessageHeader entity 44832 for each BusinessDocumentMessageHeader package 44828. The MessageHeader entity 44832 includes an ID 44838, a CreationDateTime 44846, a SenderParty 44852, and a RecipientParty 44870 at the third level 44806. The ID 44838 is of the type G/CDT 44816 "BusinessDocumentMessageID" 44842, and there is one 44840 ID44838 for each MessageHeader entity 44832. The ID 44838 has a length 44818 of 1 to 35 44844. The CreationDateTime 44846 is of the type G/CDT 44816 "DateTime" 44850, and there is one 44848 CreationDateTime 44846 for each MessageHeader entity 44832.

The SenderParty entity 44852 in the MessageHeader entity 44832 is of the type 44816 "BusinessDocumentMessage- HeaderParty" 44856, and there is zero or one 44854 SenderParty entity 44852 for each MessageHeader entity 44832. The SenderParty entity 44852 includes an InternalID 44858 and a StandardID 44864 at the fourth level 44808. The InternalID 44858 is of the type 44816 "PartyInternalID" 44862, and there is zero or one 44860 InternalID 44858 for each SenderParty entity 44852. The StandardID 44864 is of the type 44816 "PartyStandardID" 44868, and there is any number 44866 of StandardID 44864 for each SenderParty entity 44852.

The RecipientParty entity 44870 in the MessageHeader entity 44832 is of the type 44816 "BusinessDocumentMessageHeaderParty" 44874, and there is zero or one 44872 RecipientParty entity 44870 for each MessageHeader entity 44832. The RecipientParty entity 44870 includes an InternalID 44876 and a StandardID 44882 at the fourth level 44808. The InternalID 44876 is of the type 44816 "PartyInternalID" 44880, and there is zero or one 44878 InternalID 44876 for each RecipientParty entity 44870. The StandardID 44882 is of the type 44816 "PartyStandardID" 44886, and there is any number 44884 of StandardID 44882 for each RecipientParty entity 44870.

The ReplenishmentOrder entity 44888 in the ReplenishmentOrder package 44830 is of a type G/CDT 44816 "ReplenishmentOrder" 44892, and there is one 44890 ReplenishmentOrder entity 44888 for each ReplenishmentOrder package 44830. The ReplenishmentOrder entity 44888 includes an ID 44894, an @actionCode 44894L, an @itemListCompleteTransmissionIndicator 44802M, a CreationDateTime 44802A, and a LastChangeDateTime 44808M at the third level 44806. The @actionCode 44894L is of a type G/CDT 44816 ActionCode 44898L, and there is zero to one 44896L @actionCode 44894L 44894L for each ReplenishmentOrder entity 44888. The @actionCode 44894L has a length 44816 of 2 44800M. The @itemListCompleteTransmissionIndicator 44802M is of a type G/CDT 44816 CompleteTransmissionIndicator 44806M, and there is zero to one 44804M @itemListCompleteTransmissionIndicator 44802M for each ReplenishmentOrder entity 44888. The ID entity 44894 is of a type G/CDT 44816 "BusinessTransactionDocumentID" 44898, and there is one 44896 ID 44894 for each ReplenishmentOrder entity 44888. The ID 44894 has a length 44818 of 1 to 35 44800A. The CreationDateTime 44802A is of a type G/CDT 44816 "DateTime" 44806A, and there is one 44804A CreationDateTime 44802A for each ReplenishmentOrder entity 44888. The LastChangeDateTime 44808M is of a type G/CDT 44816 "DateTime" 44812M, and there is zero to one 44810M LastChangeDateTime 44808M for each ReplenishmentOrder entity 44888.

The Party package 44808A includes a BuyerParty entity 44816A, a Seller Party entity 44814M, and a VendorParty entity 44890A at the third level 44806. The BuyerParty entity 44816A is of a type 44816 "BusinessTransactionDocumentParty" 44820A, and there is zero or one 44818A BuyerParty entity 44816A for each Party package 44808A. The SellerParty entity 44814M is of a type 44816 "BusinessTransactionDocumentParty" 44818M, and there is zero or one 448116M SellerParty entity 44814M for each Party package 44808A. The VendorParty entity 44890A is of a type 44816 "BusinessTransactionDocumentParty" 44894A, and there is zero or one 44892A VendorParty entity 44890A for each Party package 44808A.

The BuyerParty entity 44816A includes an InternalID 44822A, a StandardID 44830A, a BuyerID 44838A, a VendorID 44846A, an Address 44854A, and a ContactPerson 44860A at the fourth level 44808. The InternalID 44822A is of the type G/CDT 44816 "PartyInternalID" 44826A, and there is zero or one 44824A InternalID 44822A for each BuyerParty entity 44816A. The InternalID 44822A has a length 44818 of 1 to 10 44828A. The StandardID 44830A is of the type G/CDT 44816 "PartyStandardID" 44834A, and there is any number 44832A of StandardID 44830A for each BuyerParty entity 44816A. The StandardID 44830A has a length 44818 of 1 to 13 or 1 to 9 44836A. The BuyerID 44838A is of the type G/CDT 44816 "PartyPartyID" 44842A, and there is zero or one 44840A BuyerID 44838A for each BuyerParty entity 44816A. The BuyerID 44838A has a length 44818 of 1 to 10 44844A. The VendorID 44846A is of the type G/CDT 44816 "PartyPartyID" 44850A, and there is zero or one 44848A VendorID 44846A for each BuyerParty entity 44816A. The VendorID 44846A has a length 44818 of 1 to 10 44852A. The Address 44854A is of the type G/CDT 44816 "Address" 44858A, and there is zero or one 44856A Address 44854A for each BuyerParty entity 44816A. The ContactPerson 44860A is of the type G/CDT 44816 "ContactPerson" 44864A, and there is any number 44862A of ContactPerson 44860A for each BuyerParty entity 44816A.

The ContactPerson 44860A in the BuyerParty entity 44816A includes an InternalID 44866A, a BuyerID 44872A, a VendorID 44878A, and an Address 44884A at the fifth level 44810. The InternalID 44866A is of the type G/CDT 44816 "ContactPersonInternalID" 44870A, and there is zero or one 44868A InternalID 44866A for each ContactPerson 44860A. The BuyerID 44872A is of the type G/CDT 44816 "ContactPersonPartyID" 44876A, and there is zero or one 44874A BuyerID 44872A for each ContactPerson 44860A. The VendorID 44878A is of the type G/CDT 44816 "ContactPersonPartyID" 44882A, and there is zero or one 44880A VendorID 44878A for each ContactPerson 44860A. The Address 44884A is of the type G/CDT 44816 "Address" 44888A, and there is zero or one 44886A Address 44884A for each ContactPerson 44860A.

The SellerParty entity 44814M includes an InternalID 44820M, a StandardID 44828M, a BuyerID 44828M, a VendorID 44844M, an Address 44852M, and a ContactPerson 44858M at the fourth level 44808. The InternalID 44820M is of the type G/CDT 44816 "PartyInternalID" 44826A, and there is zero or one 44824A InternalID 44820M for each SellerParty entity 44814M. The InternalID 44820M has a length 44818 of 1 to 10 44828A. The StandardID 44828M is of the type G/CDT 44816 "PartyStandardID" 44834A, and there is any number 44832A of StandardID 44828M for each SellerParty entity 44814M. The StandardID 44828M has a length 44818 of 1 to 13 or 1 to 9 44836A. The BuyerID 44828M is of the type G/CDT 44816 "PartyPartyID" 44842A, and there is zero or one 44840A BuyerID 44828M for each SellerParty entity 44814M. The BuyerID 44828M has a length 44818 of 1 to 10 44844A. The VendorID 44844M is of the type G/CDT 44816 "PartyPartyID" 44850A, and there is zero or one 44848A VendorID 44844M for each SellerParty entity 44814M. The VendorID 44844M has a length 44818 of 1 to 10 44852A. The Address 44852M is of the type G/CDT 44816 "Address" 44858A, and there is zero or one 44856A Address 44852M for each SellerParty entity 44814M. The ContactPerson 44858M is of the type G/CDT 44816 "ContactPerson" 44864A, and there is any number 44862A of ContactPerson 44858M for each SellerParty entity 44814M.

The ContactPerson 44858M in the SellerParty entity 44814M includes an InternalID 44864M, a BuyerID 44870M, a VendorID 44876M, and an Address 44882M at the fifth level 44810. The InternalID 44864M is of the type G/CDT 44816 "ContactPersonInternalID" 44870A, and there is zero or one 44868A InternalID 44864M for each ContactPerson 44858M. The BuyerID 44870M is of the type G/CDT 44816 "ContactPersonPartyID" 44876A, and there is zero or one 44874A BuyerID 44870M for each ContactPerson 44858M. The VendorID 44876M is of the type G/CDT 44816 "ContactPersonPartyID" 44882A, and there is zero or one 44880A VendorID 44876M for each ContactPerson 44858M. The Address 44882M is of the type G/CDT 44816 "Address" 44888A, and there is zero or one 44886A Address 44882M for each ContactPerson 44858M.

The VendorParty entity 44890A includes an InternalID 44896A, a StandardID 44804B, a BuyerID 44812B, a VendorID 44820B, an Address 44828B, and a ContactPerson 44834B at the fourth level 44808. The InternalID 44896A is of the type G/CDT 44816 "PartyInternalID" 44800B, and there is zero or one 44898A InternalID 44896A for each VendorParty entity 44890A. The InternalID 44896A has a length 44818 of 1 to 10 44802B. The StandardID 44804B is of the type G/CDT 44816 "PartyStandardID" 44808B, and there is any number 44806B of StandardID 44804B for each VendorParty entity 44890A. The StandardID 44804B has a length 44818 of 1 to 13 or 1 to 9 44810B. The BuyerID 44812B is of the type G/CDT 44816 "PartyPartyID" 44816B, and there is zero or one 44814B BuyerID 44812B for each VendorParty entity 44890A. The BuyerID 44812B has a length 44818 of 1 to 10 44818B. The VendorID 44820B is of the type G/CDT 44816 "PartyPartyID" 44824B, and there is zero or one 44822B VendorID 44820B for each VendorParty entity 44890A. The VendorID 44820B has a length 44818 of 1 to 10 44826B. The Address 44828B is of the type G/CDT 44816 "Address" 44832B, and there is zero or one 44830B Address 44828B for each VendorParty entity 44890A. The ContactPerson 44834B is of the type G/CDT 44816 "ContactPerson" 44838B, and there is any number 44836B of ContactPerson 44834B for each VendorParty entity 44890A.

The ContactPerson 44834B in the VendorParty entity 44890A includes an InternalID 44840B, a BuyerID 44846B, a VendorID 44852B, and an Address 44858B at the fifth level 44810. The InternalID 44840B is of the type G/CDT 44816 "ContactPersonInternalID" 44844B, and there is zero or one 44842B InternalID 44840B for each ContactPerson 44834B. The BuyerID 44846B is of the type G/CDT 44816 "ContactPersonPartyID" 44850B, and there is zero or one 44848B BuyerID 44846B for each ContactPerson 44834B. The VendorID 44852B is of the type G/CDT 44816 "ContactPersonPartyID" 44856B, and there is zero or one 44854B VendorID 44852B for each ContactPerson 44834B. The Address 44858B is of the type G/CDT 44816 "Address" 44862B, and there is zero or one 44860B Address 44858B for each ContactPerson 44834B.

DeliveryInformation package 44810A in the ReplenishmentOrder package 44830 includes a DeliveryTerms entity 44864B at the third level 44806. DeliveryTerms entity 44864B is of a type G/CDT 44816 "DeliveryTenns" 44868B, and there is zero or one 44866B DeliveryTerms entity 44864B for each DeliveryInformation package 44810A. The DeliveryTerns entity 44864B includes a DeliveryPriorityCode 44870B, an Incoterms 44876B, and a QuantityTolerance 44882B at the fourth level 44808. The DeliveryPriorityCode 44870B is of a type G/CDT 44816 "BusinessTransactionPriorityCode" 44874B, and there is zero or one 44872B DeliveryPriorityCode 44870B for each DeliveryTerms entity 44864B. The Incoterms 44876B is of a type G/CDT 44816 "Incoterms" 44880B, and there is zero or one 44878B Incoterms 44876B for each DeliveryTerms 44864B. The QuantityTolerance 44882B is of a type G/CDT 44816 "QuantityTolerance" 44886B, and there is zero or one 44884B QuantityTolerance 44882B for each DeliveryTerms entity 44864B.

The QuantityTolerance 44882B in DeliveryTerms entity 44864B includes an OverPercent 44888B and an UnderPercent 44894B at the fifth level 44810. The OverPercent 44888B is of a type G/CDT 44816 "Percent" 44892B, and there is zero or one 44890B OverPercent 44888B for each QualityTolerance 44882B. The UnderPercent 44894B is of a type G/CDT 44816 "Percent" 44898B, and there is zero or one 44896B UnderPercent 44894B for each QualityTolerance 44882B.

The ReplenishmentOrder package 44830 includes a TransportMeansDescriptionCode 44800C, a TransportServiceLevelCode 44808C, a GrossWeightMeasure 44816C, a NetWeightMeasure 44824C, a GrossVolumeMeasure 44832C, and a Note 44846C at the third level 44806. The TransportMeansDescriptionCode 44800C is of the type G/CDT 44816 "TransportMeansDescriptionCode" 44804C, and there is zero or one 44802C TransportMeansDescriptionCode 44800C for each ReplenishmentOrder package 44830. The TransportMeansDescriptionCode 44800C has a length 44818 of 4 44806C. The TransportServiceLevelCode 44808C is of the type G/CDT 44816 "TransportServiceLevelCode" 44812C, and there is zero or one 44810C TransportServiceLevelCode 44808C for each ReplenishmentOrder package 44830. The TransportServiceLevelCode 44808C has a length 44818 of 2 44814C. The GrossWeightMeasure 44816C is of the type G/CDT 44816 "Measure" 44820C, and there is zero or one 44818C GrossWeightMeasure 44816C for each ReplenishmentOrder package 44830. The GrossWeightMeasure 44816C has a length 44818 of 19 or 6 44822C. The NetWeightMeasure 44824C is of the type G/CDT 44816 "Measure" 44828C, and there is zero or one 44826C NetWeightMeasure 44824C for each ReplenishmentOrder package 44830. The NetWeightMeasure 44824C has a length 44818 of 19 or 6 44830C. The GrossVolumeMeasure 44832C is of the type G/CDT 44816 "Measure" 44836C, and there is zero or one 44834C GrossVolumeMeasure 44832C for each ReplenishrnentOrder package 44830. The GrossVolumeMeasure 44832C has a length 44818 of 19 or 6 44838C. The Note 44846C is of the type G/CDT 44816 "Note" 44850C, and there is zero or one 44848C Note 44846C for each ReplenishmentOrder package 44830. The Note 44846C has a length 44818 of 1 to 132 44852C.

The PaymentInformation package 44812A includes a CashDiscountTerms entity 44840C at the third level 44806. The CashDiscountTerms entity 44840C is of a type G/CDT 44816 "CashDiscountTerms" 44844C, and there is zero or one 44842C CashDiscountTerms entity 44840C for each PaymentInformation package 44812A.

The Item package 14A includes an Item entity 44854C at the third level 44806, a NetWeightMeasure 44808I and a Note 44858I at the fourth level 44808, and the following packages: a BusinessTransactionDocumentReference 44818D, a Party package 44820D, a Location package 44822D, a ProductInformation package 44824D, a Batch package 44826D, a Promotion package 44828D, a DeliveryInformation package 44830D, a PriceInformation package 44832D, and a ScheduleLine package 44834D.

The Item entity 44854C is of a type G/CDT 44816 "ReplenishmentOrderItem" 44858C, and there is at least one 44856C Item entity 44854C for each Item package 44814A. The Item entity 44854C includes an ActionCode 44860C, an ID 44868C, a HierarchieRelationship 44888M, an AcceptanceStatusCode 44876C, a CompletedIndicator 44884C, a ConsignmentReasonCode 44892C, a ThirdPartyDealIndicator 44800D, a SubcontractingIndicator 44804N, a VendorInitiatedActionIndicator 44810N, a 30 BlockedIndicator 44816N, a CancelledIndicator 44806D, and a CancellationReasonCode 44812D at the fourth level 44808. The ActionCode 44860C is of a type G/CDT 44816 "ActionCode" 44864C, and there is zero or one 44862C ActionCode 44860C for each Item entity 44854C. The ActionCode 44860C has a length 44818 of 2 44866C. The ID 44868C is of a type G/CDT 44816 "BusinessTransactionDocumentItemID" 44872C, and there is one 44870C ID 44868C for each Item entity 44854C. The ID 44868C has a length 44818 of 1 to 10 44874C. The AcceptanceStatusCode 44876C is of a type G/CDT 44816 "AcceptanceStatusCode" 44880C, and there is zero or one 44878C AcceptanceStatusCode 44876C for each Item entity 44854C. The AcceptanceStatusCode 44876C has a length 44818 of two 44882C. There is zero or one HierarchieRelationship 44888M for each Item entity 44854C. The HierarchieRelationship 44888M includes elements ParentitemID 44892M and TypeCode 44898M. The ParentItemID 44892M is of a type G/CDT 44816 "BusinessTransactionDocumentReference" 44896N, and there is zero or one 44894N ParentItemID 44892M for each Item entity 44854C. The TypeCode 44898M is of a type G/CDT 44816 "BusinessTransactionDocumentReference" 44802N, and there is zero or one 44800N TypeCode 44898M for each Item entity 44854C. The AcceptanceStatusCode 44876C has a length 44818 of two 44882C. The CompletedIndicator 44884C is of a type G/CDT 44816 "BusinessTransactionCompletedIndicator" 44888C, and there is zero or one 44886C CompletedIndicator 44884C for each Item entity 44854C. The CompletedIndicator 44884C has a length 44818 of one 44890C. The ConsignmentCode 44892C is of a type G/CDT 44816 "ConsignmentIndicator" 44896C, and there is zero or one 44894C ConsignmentCode 44892C for each Item entity 44854C. The ConsignmentCode 44892C has a length 44818 of one 44898C. The ThirdPartyDealIndicator 44800D is of a type G/CDT 44816 "BusinessTransactionDocumentItemThirdPartyDealIndicator" 44804D, and there is zero or one 44802D ThirdPartyDealIndicator 44800D for each Item entity 44854D. The SubcontractingIndicator 44804N is of a type G/CDT 44816 "SubcontractingIndicator" 44808N, and there is zero or one 44806N SubcontractingIndicator 44804N for each Item entity 44854D. The VendorInitiatedActionIndicator 44810N is of a type G/CDT 44816 "PartyInitiatedActionIndicator" 44814N, and there is zero or one 44812N VendorInitiatedActionIndicator 44810N for each Item entity 44854D. The BlockedIndicator 44816N is of a type G/CDT 44816 "BusinessTransactionBlockedIndicator" 44820N, and there is zero or one 44818N BlockedIndicator 44816N for each Item entity 44854D. The CancelledIndicator 44806D is of a type G/CDT 44816 "CancelledIndicator" 44810D, and there is zero or one 44808D CancelledIndicator 44806D for each Item entity 44854C. The CancellationReasonCode 44812D is of a type G/CDT 44816 "CancellationReasonCode" 44816D, and there is zero or one 44814D CancellationReasonCode 44812D for each Item entity 44854C.

The BusinessTransactionDocumentReference package 44818D includes a PurchaseContractReference entity 44836D, a SchedulingAgreementReference 44822N, a PurchaseOrderReference entity 44842D, an OriginPurchaseOrderReference entity 44848D, a SalesOrderReference entity 44854D, and an OriginSalesOrderReference entity 44860D at the fourth level 44808. The PurchaseContractReference entity 44836D is of a type G/CDT 44816 "BusinessTransactionDocumentReference" 44840D, and there is zero or one 44838D PurchaseContractReference entity 44836D for each BusinessTransactionDocumentReference package 44818D. The SchedulingAgreementReference 44822N is of a type G/CDT 44816 "BusinessTransactionDocumentReference" 44826N, and there is zero or one 44824N SchedulingAgreementReference 44822N for each BusinessTransactionDocumentReference package 44818D. The PurchaseOrderReference entity 44842D is of a type G/CDT 44816 "BusinessTransactionDocumentReference" 44846D, and there is zero or one 44844D PurchaseContractReference entity 44842D for each BusinessTransactionDocumentReference package 44818D. The OriginPurchaseOrderReference entity 44848D is of a type G/CDT 44816 "BusinessTransactionDocumentReference" 44852D, and there is zero or one 44850D OriginPurchaseOrderReference entity 44848D for each BusinessTransactionDocumentReference package 44818D. The SalesOrderReference entity 44854D is of a type G/CDT 44816 "BusinessTransactionDocumentReference" 44858D, and there is zero or one 44856D SalesOrderReference entity 44854D for each BusinessTransactionDocumentReference package 44818D. The OriginSalesOrderReference entity44860D is of a type G/CDT 44816 "BusinessTransactionDocumentReference" 44864D, and there is zero or one 44862D OriginSalesOrderReference entity44860D for each BusinessTransactionDocumentReference package 44818D.

The Party package 44820D includes a BuyerParty entity 44828N, a ProductRecipientParty entity 44866D and a BillToParty entity 44810E at the fourth level 44808. The BuyerParty entity 44828N is of a type G/CDT 44816 "BusinessTransactionDocumentParty" 44832N, and there is zero or one 44830N BuyerParty entity 44828N for each Party package 44820D. The ProductRecipientParty entity 44866D is of a type G/CDT 44816 "BusinessTransactionDocumentReference" 44870D, and there is zero or one 44868D ProductRecipientParty entity 44866D for each Party package 44820D. The BillToParty entity 44810E is of a type G/CDT 44816 "BusinessTransactionDocumentReference" 44814E, and there is zero or one 44812E BillToParty entity 44810E for each Party package 44820D. The ProductRecipientParty entity 44866D is of a type G/CDT 44816 "BusinessTransactionDocumentReference" 44870D, and there is zero or one 44868D ProductRecipientParty entity 44866D for each Party package 44820D. The BillToParty entity 44810E is of a type G/CDT 44816 "BusinessTransactionDocumentReference" 44814E, and there is zero or one 44812E BillToParty entity 44810E for each Party package 44820D.

The BuyerParty entity 44828N includes an InternalID 44834N, a StandardID 44842N, a BuyerID 44850N, a VendorID 44860N, and an Address 44868N at the fifth level 44810. The InternalID 44834N is of a type G/CDT 44816 "PartyInternalID" 44838N, and there is zero or one 44836N InternalID 44834N for each BuyerParty entity 44828N. The InternalID 44834N has a length 44818 of 1 to 10 44840N. The StandardID 44842N is of a type G/CDT 44816 "PartyStandardID" 44846N, and there is any number 44844N of StandardID 44842N for each BuyerParty entity 44828N. The StandardID 44842N has a length 44818 of 1 to 13 or 1 to 9 44848N. The BuyerID 44850N is of a type G/CDT 44816 "PartyPartyID" 44854N, and there is zero or one 44852N BuyerID 44850N for each BuyerParty entity 44828N. The BuyerID 44850N has a length 44818 of 1 to 10 44852N. The VendorID 44860N is of a type G/CDT 44816 "PartyPartyID" 44864N, and there is zero or one 44862N VendorID 44896D for each BuyerParty entity 44828N. The VendorID 44860N has a length 44818 of 1 to 10 44866N. The Address 44868N is of a type G/CDT 44816 "Address" 44872N, and there is zero or one 44870N Address 44872N for each BuyerParty entity 44828N.

The ProductRecipientParty entity 44866D includes an InternalID 44872D, a StandardID 44880D, a BuyerID 44888D, a VendorID 44896D, and an Address 44804E at the fifth level 44810. The InternalID 44872D is of a type G/CDT 44816 "PartyInternalID" 44876D, and there is zero or one 44874D InternalID 44872D for each ProductRecipientParty entity 44866D. The InternalID 44872D has a length 44818 of 1 to 10 44878D. The StandardID 44880D is of a type G/CDT 44816 "PartyStandardID" 44884D, and there is any number 44882D of StandardID 44880D for each ProductRecipientParty entity 44866D. The StandardID 44880D has a length 44818 of 1 to 13 or 1 to 9 44886D. The BuyerID 44850N is of a type G/CDT 44816 "PartyPartyID" 44892D, and there is zero or one 44890D BuyerID 44850N for each ProductRecipientParty entity 44866D. The BuyerID 44850N has a length 44818 of 1 to 10 44894D. The VendorID 44896D is of a type G/CDT 44816 "PartyPartyID" 44800E, and there is zero or one 44898D VendorID 44896D for each ProductRecipientParty entity 44866D. The VendorID 44896D has a length 44818 of 1 to 10 44802E. The Address 44804E is of a type G/CDT 44816 "Address" 44808E, and there is zero or one 44806E Address 44804E for each ProductRecipientParty entity 44866D.

The BillToParty entity 44810E includes an InternalID 44816E, a StandardID 44824E, a BuyerID 44832E, a VendorID 44840E, and an Address 44848E at the fifth level 44810. The InternalID 44816E is of a type G/CDT 44816 "PartyInternalID" 44820E, and there is zero or one 44818E InternalID 44816E for each BillToParty entity 44810E. The InternalID 44816E has a length 44818 of 1 to 10 44822E. The StandardID 44824E is of a type G/CDT 44816 "PartyStandardID" 44828E, and there is any number 44826E of StandardID 44824E for each BillToParty entity 44810E. The StandardID 44824E has a length 44818 of 1 to 13 or 1 to 9 44830E. The BuyerID 44832E is of a type G/CDT 44816 "PartyPartyID" 44836E, and there is zero or one 44834E BuyerID 44832E for each BillToParty entity 44810E. The BuyerID 44832E has a length 44818 of 1 to 10 44838E. The VendorID 44840E is of a type G/CDT 44816 "PartyPartyID" 44844E, and there is zero or one 44842E VendorID 44840E for each BillToParty entity 44810E. The VendorID 44840E has a length 44818 of 1 to 10 44846E. The Address 44848E is of a type G/CDT 44816 "Address" 44852E, and there is zero or one 44850E Address 44848E for each BillToParty entity 44810E.

The Location package 44822D includes a ShipFromLocation entity 44854E, a TransshipmentLocation entity 44836F, and a ShipToLocation entity 44892F at the fourth level 44808. The ShipFromLocation entity 44854E is of a type 44816 G/CDT "BusinessTransactionDocumentShipFromLocation" 44858E, and there is one 44856E ShipFromLocation entity 44854E for each Location package 44822D. The TransshipmentLocation entity 44836F is of a type 44816 G/CDT "BusinessTransactionDocumentTransshipmentLocation" 44840F, and there is zero or one 44838F TransshipmentLocation entity 44836F for each Location package 44822D. The ShipToLocation entity 44892F is of a type 44816 G/CDT "BusinessTransactionDocumentShipToLocation" 44896F, and there is one 44894F ShipToLocation entity 44892F for each Location package 44822D.

The ShipFromLocation entity 44854E includes an InternalID 44860E, a StandardID 44868E, a BuyerID 44876E, a VendorID 44884E, a LoadingLocation 44892E and an Address 44830F at the fifth level 44810. The InternalID 44860E is of the type G/CDT 44816 "LocationInternalID" 44864E, and there is zero or one 44862E InternalID 44860E for each ShipFromLocation entity 44854E. The InternalID 44860E has a length 44818 of 1 to 20 44866E. The StandardID 44868E is of the type G/CDT 44816 "LocationStandardID" 44872E, and there is any number 44870E StandardID 44868E for each ShipFromLocation entity 44854E. The StandardID 44868E has a length 44818 of 1 to 13 44874E. The BuyerID 44876E is of the type G/CDT 44816 "LocationPartyID" 44880E, and there is zero or one 44878E BuyerID 44876E for each ShipFromLocation entity 44854E. The BuyerID 44876E has a length 44818 of 1 to 20 44882E. The VendorID 44884E is of the type G/CDT 44816 "LocationPartyID" 44888E, and there is zero or one 44886E VendorID 44884E for each ShipFromLocation entity 44854E. The VendorID 44884E has a length 44818 of 1 to 20 44890E. The LoadingLocation 44892E is of the type G/CDT 44816 "BusinessTransactionDocumentLocation" 44896E, and there is zero or one 44894E LoadingLocation 44892E for each ShipFromLocation entity 44854E. The Address 44830F is of the type G/CDT 44816 "Address" 44834F, and there is zero or one 44832F Address 44830F for each ShipFromLocation entity 44854E.

The LoadingLocation 44892E in the ShipFromLocation entity 44854E includes an InternalID 44898E, a StandardID 44806F, a BuyerID 44814F, and a VendorID 44822F at the sixth level 44812. The InternalID 44898E is of the type G/CDT 44816 "LocationInternalID" 44802F, and there is zero or one 44800F InternalID 44898E for each LoadingLocation 44892E. The InternalID 44898E has a length 44818 of 1 to 20 44804F. The StandardID 44806F is of the type G/CDT 44816 "LocationStandardID" 44810F, and there is any number 44808F of StandardID 44806F for each LoadingLocation 44892E. The StandardID 44806F has a length 44818 of 1 to 13 44812F. The BuyerID 44814F is of the type G/CDT 44816 "LocationPartyID" 44818F, and there is zero or one 44816F BuyerID 44814F for each LoadingLocation 44892E. The BuyerID 44814F has a length 44818 1 to 20 44820F. The VendorID 44822F is of the type G/CDT 44816 "LocationPartyID" 44826F, and there is zero or one 44824F VendorID 44822F for each LoadingLocation 44892E. The VendorID 44822F has a length 44818 of 1 to 20 44828F.

The TransshipmentLocation entity 44836F includes an InternalID 44842F, a StandardID 44850F, a BuyerID 44858F, a VendorID 44866F, a LoadingLocation 44874F, an UnloadingLocation 44880F, and an Address 44886F at the fifth level 44810. The InternalID 44842F is of the type G/CDT 44816 "LocationInternalID" 44846F, and there is zero or one 44844F InternalID 44842F for each TransshipmentLocation entity 44836F. The InternalID 44842F has a length 44818 of 1 to 20 44848F. The StandardID 44850F is of the type G/CDT 44816 "LocationStandardID" 44854F, and there is any number 44852F StandardID 44850F for each TransshipmentLocation entity 44836F. The StandardID 44850F has a length 44818 of 1 to 13 44856F. The BuyerID 44858F is of the type G/CDT 44816 "LocationPartyID" 44862F, and there is zero or one 44860F BuyerID 44858F for each TransshipmentLocation entity 44836F. The BuyerID 44858F has a length 44818 of 1 to 20 44864F. The VendorID 44866F is of the type G/CDT 44816 "LocationPartyID" 44870F, and there is zero or one 44868F VendorID 44866F for each TransshipmentLocation entity 44836F. The VendorID 44866F has a length 44818 of 1 to 20 44872F. The LoadingLocation 44874F is of the type G/CDT 44816 "BusinessTransactionDocumentLocation" 44878F, and there is zero or one 44876F LoadingLocation 44874F for each TransshipmentLocation entity 44836F. The UnloadingLocation 44880F is of the type G/CDT 44816 "BusinessTransactionDocumentLocation" 44884F, and there is zero or one 44882F UnloadingLocation

44880F for each TransshipmentLocation 44836F. The Address 44886F is of the type G/CDT 44816 "Address" 44890F, and there is zero or one 44888F Address 44886F for each TransshipmentLocation entity 44836F.

The ShipToLocation entity 44892F includes an InternalID 44898F, a StandardID 44806G, a BuyerID 44814G, a VendorID 44822G, an UnloadingLocation 44830G, and an Address 44868G at the fifth level 44810. The InternalID 44898F is of the type G/CDT 44816 "LocationInternalID" 44802G, and there is zero or one 44800G InternalID 44898F for each ShipToLocation entity 44892F. The InternalID 44898F has a length 44818 of 1 to 20 44804G. The StandardID 44806G is of the type G/CDT 44816 "LocationStandardID" 44810G, and there is any number 44808G StandardID 44806G for each ShipToLocation entity 44892F. The StandardID 44806G has a length 44818 of 1 to 13 44812G. The BuyerID 44814G is of the type G/CDT 44816 "LocationPartyID" 44818G, and there is zero or one 44816G BuyerID 44814G for each ShipToLocation entity 44892F. The BuyerID 44814G has a length 44818 of 1 to 20 44820G. The VendorID 44822G is of the type G/CDT 44816 "LocationPartyID" 44826G, and there is zero or one 44824G VendorID 44822G for each ShipToLocation entity 44892G. The VendorID 44822G has a length 44818 of 1 to 20 44828G. The UnloadingLocation 44830G is of the type G/CDT 44816 "BusinessTransactionDocumentLocation" 44834G, and there is zero or one 44832G UnloadingLocation 44830G for each ShipToLocation entity 44892G. The Address 44868G is of the type G/CDT 44816 "Address" 44872G, and there is zero or one 44870G Address 44868G for each ShipToLocation entity 44892F.

The UnloadingLocation 44830G in the ShipToLocation entity 44892F includes an InternalID 44836G, a StandardID 44844G, a BuyerID 44852G, and a VendorID 44860G at the sixth level 44812. The InternalID 44836G is of the type G/CDT 44816 "LocationInternalID" 44840G, and there is zero or one 44838G InternalID 44836G for each UnloadingLocation 44830G. The InternalID 44836G has a length 44818 of 1 to 20 44842G. The StandardID 44844G is of the type G/CDT 44816 "LocationStandardID" 44848G, and there is any number 44846G of StandardID 44844G for each UnloadingLocation 44830G. The StandardID 44844G has a length 44818 of 1 to 13 44850G. The BuyerID 44852G is of the type G/CDT 44816 "LocationPartyID" 44856G, and there is zero or one 44854G BuyerID 44852G for each UnloadingLocation 44830G. The BuyerID 44852G has a length 44818 of 1 to 20 44858G. The VendorID 44860G is of the type G/CDT 44816 "LocationPartyID" 44864G, and there is zero or one 44862G VendorID 44860G for each UnloadingLocation 44830G. The VendorID 44860G has a length 44818 of 1 to 20 44866G.

The ProductInformation package 44824D includes a Product entity 44874G at the fourth level 44808. The Product entity 44874G is of the type G/CDT 44816 "BusinessTransactionDocumentProduct" 44878G, and there is one 44876G Product entity 44874G for each ProductInformation package 44824D.

The Product entity 44874G includes an InternalID 44880G, a StandardID 44888G, a BuyerID 44896G, a VendorID 44804H, a ChangeID 44812H, and a PackageQuantity 44820H at the fifth level 44810. The InternalID 44880G is of the type G/CDT 44816 "LocationInternalID" 44884G, and there is zero or one 44882G InternalID 44880G for each Product entity 44874G. The InternalID 44880G has a length 44818 of 1 to 40 44886G. The StandardID 44888G is of the type G/CDT 44816 "LocationStandardID" 44892G, and there is zero or one 44890G StandardID 44888G for each Product entity 44874G. The StandardID 44888G has a length 44818 of 1 to 14 44894G. The BuyerID 44896G is of the type G/CDT 44816 "LocationPartyID" 44800H, and there is zero or one 44898G BuyerID 44896G for each Product entity 44874G. The BuyerID 44896G has a length 44818 of 1 to 40 44802H. The VendorID 44804H is of the type G/CDT 44816 "LocationPartyID" 44808H, and there is zero or one 44806H VendorID 44804H for each Product entity 44874G. The VendorID 44804H has a length 44818 of 1 to 40 44810H. The ChangeID 44812H is of the type G/CDT 44816 "ProductChangeID" 44816H, and there is zero or one 44814H ChangeID 44812H for each Product entity 44874G. The ChangeID 44812H has a length 44818 of 1 to 25 44818H. The PackageQuantity 44820H is of the type G/CDT 44816 "Quantity" 44824H, and there is zero or one 44822H PackageQuantity 44820H for each Product entity 44874G. The PackageQuantity 44820H has a length 44818 of 19 or 6 44826H.

The Batch package 44826D includes zero or one 44830H Batch entity 44828H at the fourth level 44808. The Batch entity 44828H includes an InternalID 44832H, a BuyerID 44840H, a VendorID 44848H, a ManufacturingDate 44856H, a BestBeforeDate 44862H, and an OriginCountryCode 44868H at the fifth level 44810. The InternalID 44832H is of the type G/CDT 44816 "BatchInternalID" 44836H, and there is zero or one 44834H InternalID 44832H for each Batch entity 44828H. The InternalID 44832H has a length 44818 of 1 to 10 44838H. The BuyerID 44840H is of the type G/CDT 44816 "BatchPartyID" 44844H, and there is zero or one 44842H BuyerID 44840H for each Batch entity 44828H. The BuyerID 44840H has a length 44818 of 1 to 10 44846H. The VendorID 44848H is of the type G/CDT 44816 "BatchPartyID" 44852H, and there is zero or one 44850H VendorID 44848H for each Batch entity 44828H. The VendorID 44848H has a length 44818 of 1 to 10 44854H. The ManufacturingDate 44856H is of the type G/CDT 44816 "Date" 44860H, and there is zero or one 44858H ManufacturingDate 44856H for each Batch entity 44828H. The BestBeforeDate 44862H is of the type G/CDT 44816 "Date" 44866H, and there is zero or one 44864H BestBeforeDate 44862H for each Batch entity 44828H. The OriginCountryCode 44868H is of the type G/CDT 44816 "CountryCode" 44872H, and there is zero or one 44870H OriginCountryCode 44868H for each Batch entity 44828H. The OriginCountryCode 44868H has a length 44818 of three 44874H.

The Promotion package 44828D includes a Promotion entity 44876H at the fourth level 44808. The Promotion entity 44876H is of the type G/CDT 44816 "Promotion" 44880H, and there is zero or one 44878H Promotion entity 44876H for each Promotion package 44828D. The Promotion entity 44876H has a length 44818 of 1 to 35 44882H. The Promotion entity 44876H includes an InternalID 44884H, a BuyerID 44892H, and a VendorID 44800I at the fifth level 44810. The InternalID 44884H is of the type G/CDT 44816 "PromotionInternalID" 44888H, and there is zero or one 44886H InternalID 44884H for each Promotion entity 44876H. The InternalID 44884H has a length 44818 of 1 to 20 44890H. The BuyerID 44892H is of the type G/CDT 44816 "PromotionPartyID" 44896H, and there is zero or one 44894H BuyerID 44892H for each Promotion entity 44876H. The BuyerID 44892H has a length 44818 of 1 to 20 44898H. The VendorID 44800I is of the type G/CDT 44816 "PromotionPartyID" 44804I, and there is zero or one 44802I VendorID 44800I for each Promotion entity 44876H. The VendorID 44800I has a length 44818 of 1 to 20 44806I.

The NetWeightMeasure 44808I at the fourth level 44808 in the Item package 44814A is of a type 44816 "Measure"

44812I, and there is zero or one 44810I NetWeightMeasure 44808I for each Item package 44814A. The NetWeightMeasure 44808I has a length 44818 of 19 or 6 44814I.

DeliveryInformation package 44830D in the Item package 44814A includes a DeliveryTerms entity 44816I at the fourth level 44808. DeliveryTerms entity 44816I is of a type G/CDT 44816 "DeliveryTerms" 44820I, and there is zero or one 44818I DeliveryTerms entity 44816I for each DeliveryInformation package 44830D.

The DeliveryTerms entity 44816I includes a DeliveryPriorityCode 44822I, an Incoterms 44828I, and a QuantityTolerance 44834I at the fifth level 44810. The DeliveryPriorityCode 44822I is of a type G/CDT 44816 "BusinessTransactionPriorityCode" 44826I, and there is zero or one 44824I DeliveryPriorityCode 44822I for each DeliveryTerms entity 44816I. The Incoterms 44828I is of a type G/CDT 44816 "Incoterms" 44832I, and there is zero or one 44830I Incoterms 44828I for each DeliveryTerms entity 44816I. The QuantityTolerance 44834I is of a type G/CDT 44816 "QuantityTolerance" 44838I, and there is zero or one 44836I QuantityTolerance 44834I for each DeliveryTerms entity 44816I.

The QuantityTolerance 44834I in DeliveryTerms entity 44816I includes an OverPercent 44840I and an UnderPercent 44846I at the sixth level 44812. The OverPercent 44840I is of a type G/CDT 44816 "Percent" 44844I, and there is zero or one 44842I OverPercent 44840I for each QualityTolerance 44834I. The UnderPercent 44846I is of a type G/CDT 44816 "Percent" 44850I, and there is zero or one 44848I UnderPercent 44846I for each QualityTolerance 44834I.

The PriceInformation package 44832D includes a NetPrice entity 44852I at the fourth level 44808. The NetPrice entity 44852I is of a type G/CDT 44816 "Price" 44856I, and there is zero or one 44854I NetPrice entity 44852I for each PriceInformation package 44832D.

A KanbanCardID 44874N at the fourth level 44808 in the Item package 44814A is of a type 44816 "KanbanCardID" 44878N, and there is zero or one 44876N KanbanCardID 44874N for each Item package 44814A. The KanbanCardID 44874N has a length 44818 of 1 to 10 44880N.

A FollowUpReplenishmentOrderConfirmationRequirementCode 44890N at the fourth level 44808 in the Item package 44814A is of a type 44816 "FollowUpMessageRequirementCode" 44894N, and there is zero or one 44892N FollowUpReplenishmentOrderConfirmationRequirementCode 44890N for each Item package 44814A.

A FollowUpDispatchedDeliveryNotificationRequirementCode 44896N at the fourth level 44808 in the Item package 44814A is of a type 44816 "FollowUpMessageRequirementCode" 44800O, and there is zero or one 44898N FollowUpDispatchedDeliveryNotificationRequirementCode 44896N for each Item package 44814A.

The Note 44858I at the fourth level 44808 in the Item package 44814A is of a type 44816 "Note" 44862I, and there is zero or one 44860I Note 44858I for each Item package 44814A. The Note 44858I has a length 44818 of 1 to 132 44864I.

The ScheduleLine package 44834D in the Item package 44814A includes a ScheduleLine entity 44866I and a ConfimmedScheduleLine entity 44838J at the fourth level 44808. The ScheduleLine entity 44866I is of a type G/CDT 44816 "ReplenishmentOrderItemScheduleLine" 44870I, and there is at least one 44868I ScheduleLine entity 44866I for each ScheduleLine package 44834D. The ConfirmedScheduleLine entity 44838J is of a type G/CDT 44816 "ReplenishmentOrderItemScheduleLine" 44842J, and there is any number 44840J of ConfirmedScheduleLine entities 44838J for each ScheduleLine package 44834D.

The ScheduleLine entity 44866I includes an @actionCode 44802O, an ID 44810O, a ShipmentGroupID 44872I, TransportPlanningPeriod 44880I, a PositioningPeriod 44886I, a LoadingPeriod 44892I, a ShippingPeriod 44898I, a DeliveryPeriod 44804J, an AvailabilityPeriod 44810J, a PickupPeriod 44816J, a Quantity 44822J, a ReceivedQuantity 44830J, and a ComponentRequirement entity 44831J at the fifth level 4481O. The @actionCode 44802O is of a type G/CDT 44816 "ActionCode" 44806O, and there is zero or one 44804O @actionCode 44802O for each ScheduleLine entity 44866I. The @actionCode 44802O has a length 44818 of 2 44808O. The ID 44810O is of a type G/CDT 44816 "BusinessTransaction DocumentItemScheduleLineID" 44814O, and there is zero or one 44812O ID 44810O for each ScheduleLine entity 44866I. The ID 44810O has a length 44818 of 1 to 4 44816O. The ShipmentGroupID 44872I is of a type G/CDT 44816 "BusinessTransactionDocumentGroupID" 44876I, and there is zero or one 44874I ShipmentGroupID 44872I for each ScheduleLine entity 44866I. The ShipmentGroupID 44872I has a length 44818 of 1 to 10 44878I. The TransportPlanningPeriod 44880I is of a type G/CDT 44816 "DateTimePeriod" 44884I, and there is zero or one 44882I TransportPlanningPeriod 44880I for each ScheduleLine entity 44866I. The PositioningPeriod 44886I is of a type G/CDT 44816 "DateTimePeriod" 44890I, and there is zero or one 44888I PositioningPeriod 44888I for each ScheduleLine entity 44866I. The LoadingPeriod 44892I is of a type G/CDT 44816 "DateTimePeriod" 44896I, and there is zero or one 44894I LoadingPeriod 44892I for each ScheduleLine entity 44866I. The ShippingPeriod 44898I is of a type G/CDT 44816 "DateTimePeriod" 44802J, and there is zero or one 44800J ShippingPeriod 44898I for each ScheduleLine entity 44866I. The DeliveryPeriod 44804J is of a type G/CDT 44816 "DateTimePeriod" 44808J, and there is zero or one 44806J DeliveryPeriod 44804J for each ScheduleLine entity 44866I. The AvailabilityPeriod 44810J is of a type G/CDT 44816 "DateTimePeriod" 44814J, and there is zero or one 44812J AvailabilityPeriod 44810J for each ScheduleLine entity 44866I. The PickupPeriod 44816J is of a type G/CDT 44816 "DateTimePeriod" 44820J, and there is zero or one 44818J PickupPeriod 44816J for each ScheduleLine entity 44866I. The Quantity 44822J is of a type G/CDT 44816 "Quantity" 44826J, and there is one 44824J Quantity 44822J for each ScheduleLine entity 44866I. The Quantity 44822J has a length 44818 of 19 of 6 44828J. The ReceivedQuantity 44830J is of a type G/CDT 44816 "Quantity" 44834J, and there is zero or one 44832J ReceivedQuantity 44830J for each ScheduleLine entity 44866I. The ReceivedQuantity 44830J has a length 44818 of 19 or 6 44836J. The ComponentRequirement entity 44831J is of a type G/CDT 44816 "ReplenishmentOrderItemScheduleLineComponentRequirement" 44835J, and there is zero to n 44833J ComponentRequirement entity 44831J for each ScheduleLine entity 44866I.

The ComponentRequirement entity 44831J includes a Product entity 44810O and a Quantity 44846O. The Product entity 44810O in the ComponentRequirement entity 44831J includes an InternalID 44816O, a StandardID 44824O, a BuyerID 44832O, and a VendorID 44838O at the sixth level 44812. The InternalID 44816O is of the type G/CDT 44816 "ProductInternalID" 44820O, and there is zero or one 44818O InternalID 44816O for each ComponentRequirement entity 44831J. The InternalID 44816O has a length 44818 of 1 to 20 44818O. The StandardID 44824O is of the type G/CDT 44816 "ProductStandardID" 44828O, and there is zero or one 44826O of StandardID 44824O for each ComponentRequirement entity 44831J. The StandardID 44824O has a length 44818 of 14 44830O. The BuyerID 44832O is of the type G/CDT 44816 "ProductBuyerID" 44834O, and there is zero or one 44832O BuyerID 44832O for each ComponentRequirement entity 44831J. The BuyerID 44832O has a length 44818 1 to 40 44836O. The VendorID 44838O is of the type G/CDT 44816 "ProductVendorID" 44842O, and there is zero or one 44840O VendorID 44838O for each ComponentRequirement entity 44831J. The VendorID 44838O has a length 44818 of 1 to 40 44852O. The Quantity 44846O is of the type G/CDT 44816 "Quantity" 44842O, and there is one 44848O Quantity 44846O for each ComponentRequirement entity 44831J. The Quantity 44846O has a length 44818 of 19 or 6 44852O.

The ConfirmedScheduleLine entity 44838J includes a @actionCode 44839J, a ShipmentGroupID 44844J, TransportPlanningPeriod 44852J, a PositioningPeriod 44858J, a LoadingPeriod 44864J, a ShippingPeriod 44870J, a DeliveryPeriod 44876J, an AvailabilityPeriod 44882J, a PickupPeriod 44888J, a Quantity 44894J and a ComponentRequirement entity 44895J at the fifth level 44810. The @actionCode 44839J is of a type G/CDT 44816 "ActionCode" 44843J, and there is zero or one 44841J @actionCode 44839J for each ConfirmedScheduleLine entity 44838J. The @actionCode 44839J has a length 44818 of 2 44845J. The ShipmentGroupID 44844J is of a type G/CDT 44816 "BusinessTransactionDocumentGroupID" 44848J, and there is zero or one 44846J ShipmentGroupID 44844J for each ConfirmedScheduleLine entity 44838J. The ShipmentGroupID 44844J has a length 44818 of 1 to 10 44850J. The TransportPlanningPeriod 44852J is of a type G/CDT 44816 "DateTimePeriod" 44856J, and there is zero or one 44854J TransportPlanningPeriod 44852J for each ConfirmedScheduleLine entity 44838J. The PositioningPeriod 44858J is of a type G/CDT 44816 "DateTimePeriod" 44862J, and there is zero or one 44860J PositioningPeriod 44858J for each ConfirmedScheduleLine entity 44838J. The LoadingPeriod 44864J is of a type G/CDT 44816 "DateTimePeriod" 44868J, and there is zero or one 44866J LoadingPeriod 44864J for each ConfirmedScheduleLine entity 44838J. The ShippingPeriod 44870J is of a type G/CDT 44816 "DateTimePeriod" 44874J, and there is zero or one 44872J ShippingPeriod 44870J for each ConfirmedScheduleLine entity 44838J. The DeliveryPeriod 44876J is of a type G/CDT 44816 "DateTimePeriod" 44880J, and there is zero or one 44878J DeliveryPeriod 44876J for each ConfirmedScheduleLine entity 44838J. The AvailabilityPeriod 44882J is of a type G/CDT 44816 "DateTimePeriod" 44886J, and there is zero or one 44884J AvailabilityPeriod 44882J for each ConfirmedScheduleLine entity 44838J. The PickupPeriod 44888J is of a type G/CDT 44816 "DateTimePeriod" 44892J, and there is zero or one 44890J PickupPeriod 44888J for each ConfirmedScheduleLine entity 44838J. The Quantity 44894J is of a type G/CDT 44816 "Quantity" 44898J, and there is one 44896J Quantity 44894J for each ConfirmedScheduleLine entity 44838J. The Quantity 44894J has a length 44818 of 19 or 6 44800K. The ComponentRequirement entity 44895J is of a type G/CDT 44816 "ReplenishmentOrderItemConfirmedScheduleLineComponentRequirement" 44899J, and there is zero to n 44897J ComponentRequirement entity 44895J for each ScheduleLine entity 44866I.

The ComponentRequirement entity 44895J includes a Product entity 44854O and a Quantity 44892O. The Product entity 44854O in the ComponentRequirement entity 44895J includes an InternalID 44860O, a StandardID 44868O, a BuyerID 44876O, and a VendorID 44884O at the sixth level 44812. The InternalID 44860O is of the type G/CDT 44816 "ProductInternalID" 44864O, and there is zero or one 44862O InternaiID 44860O for each ComponentRequirement entity 44895J. The InternalID 44860O has a length 44818 of 1 to 20 44866O. The StandardID 44868O is of the type G/CDT 44816 "ProductStandardID" 44872O, and there is zero or one 44870O of StandardID 44868O for each ComponentRequirement entity 44895J. The StandardID 44868O has a length 44818 of 14 44874O. The BuyerID 44876O is of the type G/CDT 44816 "ProductBuyerID" 44880O, and there is zero or one 44878O BuyerID 44876O for each ComponentRequirement entity 44895J. The BuyerID 44876O has a length 44818 1 to 40 44882O. The VendorID 44884O is of the type G/CDT 44816 "ProductVendorID" 44888O, and there is zero or one 44886O VendorID 44884O for each ComponentRequirement entity 44895J. The VendorID 44884O has a length 44818 of 1 to 40 44890O. The Quantity 44892O is of the type G/CDT 44816 "Quantity" 44896O, and there is one 44894O Quantity 44892O for each ComponentRequirement entity 44895J. The Quantity 44892O has a length 44818 of 19 or 6 44898O.

The HandlingUnit package 44815A of the ReplenishmentOrderMessage package 44830 includes a HandlingUnit entity 44802K at the third level 44806. The HandlingUnit entity 44802K is of a type G/CDT 44816 "HandlingUnit" 44806K, and there is any number 44804K of HandlingUnit entities 44802K for a HandlingUnit package 44815A.

The HandlingUnit entity 44802K includes an ID 44808K, a LoadCarrier 44816K, a HeightMeasure 44856K, a LengthMeasure 44864K, a WidthMeasure 44872K, a GrossVolumeMeasure 44880K, a NetVolumeMeasure 44888K, GrossWeightMeasure 44896K, a NetWeightMeasure 44804L, an AdditionalPackaging 44812L, a LowerLevelHandlingUnit 44860L, and a Load 44872L at the fourth level 44808. The ID 44808K is of a type G/CDT 44816 "HandlingUnitID" 44812K, and there is one 44810K ID 44808K for each HandlingUnit entity 44802K. The ID 44808K has a length 44818 of 1 to 20 44814K. There is one 44818K LoadCarrier 44816K for each HandlingUnit entity 44802K. The HeightMeasure 44856K is of a type G/CDT 44816 "Measure" 44860K, and there is zero or one 44858K HeightMeasure 44856K for each HandlingUnit entity 44802K. The HeightMeasure 44856K has a length 44818 of 19 or 6 44862K. The LengthMeasure 44864K is of a type G/CDT 44816 "Measure" 44868K, and there is zero or one 44866K LengthMeasure 44864K for each HandlingUnit entity 44802K. The LengthMeasure 44864K has a length 44818 of 19 or 6 44870K. The WidthMeasure 44872K is of a type G/CDT 44816 "Measure" 44876K, and there is zero or one 44874K WidthMeasure 44872K for each HandlingUnit entity 44802K. The WidthMeasure 44872K has a length 44818 of 19 or 6 44878K. The GrossVolumeMeasure 44880K is of a type G/CDT 44816 "Measure" 44884K, and there is zero or one 44882K GrossVolumeMeasure 44880K for each HandlingUnit entity 44802K. The GrossVolumeMeasure 44880K has a length of 44818 of 19 or 6 44886K. The NetVolumeMeasure 44888K is of a type G/CDT 44816 "Measure" 44892K, and there is zero or one 44890K NetVolumeMeasure 44888K for each HandlingUnit entity 44802K. The NetVolumeMeasure 44888K has a length 44818 of 19 or 6 44894K. The GrossWeightMeasure 44896K is of a type G/CDT 44816 "Measure" 44800L, and there is zero or one 44898K GrossWeightMeasure 44896K for each HandlingUnit entity 44802K. The GrossWeightMeasure 44896K has a length 44818 of 19 or 6 44802L. The NetWeightMeasure 44804L is of a type G/CDT 44816 "Measure" 44808L, and there is zero or one 44806L NetWeightMeasure 44804L for each HandlingUnit entity 44802K. The NetWeightMeasure 44804L has a length 44818 of 19 or 6 44810L. There is any number 44814L of AdditionalPackaging 44812L for each HandlingUnit entity 44802K. There is any number 44862L of LowerLevelHandlingUnit 44860L for each HandlingUnit 44802K. There is any number 44874L of Load 44872L for each HandlingUnit entity 44802K.

The LoadCarrier 44816K in the HandlingUnit entity 44802K includes one 44822K Product 44820K at the fifth level 44810. The Product 44820K includes an InternalID 44824K, a StandardID 44832K, a BuyerID 44840K, and a VendorID 44848K at the sixth level 44812. The InternalID 44824K is of the type G/CDT 44816 "ProductInternalID" 44828K, and there is zero or one 44826K InternalID 44824K for each Product 44820K. The InternalID 44824K has a length 44818 of 1 to 40 44830K. The StandardID 44832K is of the type G/CDT 44816 "ProductStandardID" 44836K, and there is zero or one 44834K StandardID 44832K for each Product 44820K. The StandardID 44832K has a length 44818 of 1 to 14 44838K. The BuyerID 44840K is of the type G/CDT 44816 "ProductPartyID" 44844K, and there is zero or one 44842K BuyerID 44840K for each Product 44820K. The BuyerID 44840K has a length 44818 of 1 to 40 44846K. The VendorID 44848K is of the type G/CDT 44816 "ProductPartyID" 44852K, and there is zero or one 44850K VendorID 44848K for each Product 44820K. The VendorID 44848K has a length 44818 of 1 to 40 44854K.

The AdditionalPackaging 44812L in the HandlingUnit entity 44802K includes one 44818L Product 44816L and one 44854L Quantity 44852L at the fifth level 44810. The Quantity 44852L is of the type G/CDT 44816 "Quantity" 44856L. The Quantity 44852L has a length 44818 of 19 or 6 44858L.

The Product 44816L in the AdditionalPackaging 44812L includes an InternalID 44820L, a StandardID 44828L, a BuyerID 44836L, and a VendorID 44844L at the sixth level 44812. The InternalID 44820L is of the type G/CDT 44816 "ProductInternalID" 44824L, and there is zero or one 44822L InternalID 44820L for each Product 44816L. The InternalID 44820L has a length 44818 of 1 to 40 44826L. The StandardID 44828L is of the type G/CDT 44816 "ProductStandardID" 44832L, and there is zero or one 44830L StandardID 44828L for each Product 44816L. The StandardID 44828L has a length 44818 of 1 to 14 44834L. The BuyerID 44836L is of the type G/CDT 44816 "ProductPartyID" 44840L, and there is zero or one 44838L BuyerID 44836L for each Product 44816L. The BuyerID 44836L has a length 44818 of 1 to 40 44842L. The VendorID 44844L is of the type G/CDT 44816 "ProductPartyID" 44848L, and there is zero or one 44846L VendorID 44844L for each Product 44816L. The VendorID 44844L has a length 44818 of 1 to 40 44850L.

The LowerHandlingUnit 44860L in the HandlingUnit entity 44802K includes an ID 44864L. The ID 44864L is of a type G/CDT 44816 "HandlingUnitID" 44868L, and there is one 44866L ID 44864L for each LowerHandlingUnit 44860L. The ID 44864L has a length 44818 of 1 to 20 44870L.

The Load 44872L in the HandlingUnit entity 44802K includes a BusinessTransactionDocumentReference 44876L and a Quantity 44886L at the fifth level 44810. The Quantity 44886L is of a type G/CDT 44816 "Quantity" 44890L, and there is one 44888L Quantity 44886L for each Load 44872L. The Quantity 44886L has a length 44818 of 19 or 6 44892L.

cc) The BusinessTransactionDocumentReference 44876L includes an ItemID 44878L at the sixth level 44812. The ItemID 44878L is of a type G/CDT 44816 "BusinessTransactionDocumentItemID" 44882L, and there is one 44880L ItemID 44878L for each BusinessTransactionDocumentReference 44876L. The ItemID 44878L has a length 44818 of 1 to 10 44884L.Vendor Generated Order Interfaces The VendorGeneratedOrderNotification is sent by a vendor to his customer (acting as a buyer). The vendor uses the message to inform his customer of a replenishment order he has planned and initiated. This replenishment order is intended to trigger the creation of a purchase order on the customer side. Contrary to the standard ordering process, this message is triggered by the vendor rather than the customer. The message is specially designed for business scenarios in which companies delegate planning for replenishment deliveries and the creation of the associated orders to their vendors, as is the case with Vendor Managed Inventory (VMI) and Responsive Replenishment. The VendorGeneratedOrderConfirmation is sent by a customer (acting as a buyer) to his vendor. The buyer uses this message either to confirm or reject the replenishment order planned by the vendor. When this confirmation is received by the vendor, it executes the replenishment delivery.

The VendorGeneratedOrderNotification and VendorGeneratedOrderConfirmation messages are exchanged between the Inventory Collaboration Hub (ICH) of a vendor and the execution system of a sold-to party as part of the "Responsive Replenishment (RR)" business scenario. In this scenario, the ICH performs the "planning" function, while the customer's/buyer's backend system performs the "purchasing" function.

(1) Message Types (a) Vendor Generated Order Notification

The VendorGeneratedOrderNotification is a message that is used by a vendor/seller to transfer the a replenishment order that he has initiated and planned to a customer/buyer so that the latter can create a purchase order. The notification sent by the vendor/seller to the customer/buyer regarding the planned replenishment order can be regarded as a "purchase order generated by the seller." The structure of the message type VendorGeneratedOrderNotification is specified by the message data type VendorGeneratedOrderNotificationMessage. The notification transfer is always complete ("complete transmission").

(b) Vendor Generated Order Confirmation

VendorGeneratedOrderConfirmation is the confirmation from a customer/buyer that a purchase order has been created for the replenishment order initiated and planned by his vendor/seller. This confirmation from the customer/buyer for a "purchase order generated by the seller" can be regarded as a "purchase order" in the traditional sense, which, in turn, triggers the corresponding fulfillment process at the vendor/seller. The structure of the message type VendorGeneratedOrderConfirmation is specified by the message data type VendorGeneratedOrderConfirmationMessage. The notification transfer is always complete ("complete transmission"). Methods and systems consistent with the subject matter described herein use the package template for a BusinessTransactionDocument for an SCM Master Data depicted in FIG. 270B to derive the VendorGeneratedOrder interfaces.

(2) Message Choreography

The following message choreography describes the possible logical sequence of the messages that can be used to realize the scenario between a Buyer 44900, a Vendor's Supply Chain Planning system 44902, and a Vendor's Supply Chain Execution system 44904, wherein the Buyer 44900 and Vendor are two separate entities 44916.

The Buyer 44900 can use the OrderIDAssignmentNotification message 44906 to transfer valid purchase order numbers to a vendor's "Supply Chain Planning" system 44902 for creating replenishment orders. These replenishment orders are transferred from the Vendor's Supply Chain Planning system 44902 to his Supply Chain Execution system 44904 using the ReplenishmentOrderNotification message 44908. The Supply Chain Execution system 44904 checks the availability of the required products and uses the ReplenishmentOrderConfirmation message 44910 to confirm that the replenishment orders have been fulfilled. The Buyer 44900 is then informed of this with the VendorGeneratedOrderNotification message 44912. The Buyer 44900 can then send an optional order confirmation to the Vendor using the VendorGeneratedOrderConfirmation message 44914. If the two business partners collaborate very closely, this order confirmation might not be necessary. In this case, the VendorGeneratedOrderNotification 44912 creates a purchase order directly on the buyer side.

(3) Data Model of Vendor Generated Order Message

FIG. 450 depicts the data model for the VendorGeneratedOrderMessage. The VendorGeneratedOrderMessage package 45000 message data type groups together the business information that is relevant for sending a business document in a message and the VendorGeneratedOrder object in the business document. The VendorGeneratedOrderMessage package 45000 includes a VendorGeneratedOrderMessage entity 45002, a MessageHeader package 45004, and a VendorGeneratedOrder package 45006.

The VendorGeneratedOrderMessage message data type makes the master structure available for the message data types VendorGeneratedOrderNotificationMessage 45012 and VendorGeneratedOrderConfirmationMessage 45014, as well as for the relevant message types and message interfaces.

(a) Message Header Package

A MessageHeader package 45004 groups together the business information that is relevant for sending a business document in a message. It includes a MessageHeader entity 45008.

(i) Message Header entity

A MessageHeader package 45004 groups business information from the perspective of the sending application to identify the business document in a message, to provide information about the sender, and to provide any information about the recipient.

The MessageHeader entity 45008 is divided into a SenderParty entity 45010 and a RecipientParty entity 45012. It is of type GDT: BusinessDocumentMessageHeader. There is a 1:1 relationship 45009 between MessageHeader entity 45008 and VendorGeneratedOrderMessage entity 45002. The MessageHeader 45008 includes an ID entity and a CreationDateTime entity. The ID entity identifies the business document in the technical message, and the CreationDateTime entity is the creation date of a business document in the technical message.

(ii) Sender Party Entity

A SenderParty entity 45010 is the party responsible for sending a business document at business application level. The SenderParty entity 45010 is of type GDT: BusinessDocumentMessageHeaderParty. There is a 1:c relationship 45011 between SenderParty entity 45010 and MessageHeader entity 45008.

(iii) Recipient Party Entity

A RecipientParty entity 45012 is the party responsible for receiving a business document at business application level. The RecipientParty entity 45012 is of type GDT: BusinessDocumentMessageHeaderParty. There is a 1:c relationship 45013 between RecipientParty entity 45012 and MessageHeader entity 45008.

(b) Vendor Generated Order Package

The VendorGeneratedOrder package 45006 groups together the VendorGeneratedOrder entity 45014, a Party package 45016, a VendorGeneratedOrderItem package 45018, and a HandlingUnit package 45020.

The HandlingUnit package 45020 and its contents are not required in the VendorGeneratedOrderConfimmationMessage 45014.

(i) Vendor Generated Order Entity

VendorGeneratedOrder entity 45014 is a purchase order that is planned and initiated by a vendor for his customer and is intended to trigger a replenishment delivery for the customer. The dates and quantities for delivering or picking up a certain product and (if necessary) how they are packed in handling units are described in the items and schedule lines of the VendorGeneratedOrder entity 45014. The business partners involved and (where applicable) references to other relevant documents are also listed.

There is a 1:1 relationship 45015 between VendorGeneratedOrder entity 45014 and VendorGeneratedOrderMessage entity 45002. VendorGeneratedOrder entity 45014 includes an ID, a CreationDateTime, a LastChangeDateTime, a TransportMeansDescriptionCode, a GrossWeightMeasure, a NetWeightMeasure, a GrossVolumeMeasure, and a Note. The ID is a unique identifier for the delivery VendorGeneratedOrder, and is of type GDT: BusinessTransactionDocumentID. The CreationDateTime is the creation time of the VendorGeneratedOrder entity 45014 at the vendor, and is of type GDT: DateTime. The LastChangeDateTime is the last change date of VendorGeneratedOrder entity 45014 by the vendor, and is of type GDT. The TransportMeansDescriptionCode is the code for the type of transport means to be used for the resulting replenishment delivery, and is of type GDT: TransportMeansDescriptionCode. The GrossWeightMeasure is the estimated gross weight of the resulting replenishment delivery, and is of type GDT: Measure. The NetWeightMeasure is the estimated net weight of the resulting replenishment delivery, and is of type GDT: Measure. The GrossVolumeMeasure is the estimated gross volume of the resulting replenishment delivery, and is of type GDT: Measure. The Note is the Note on the order, For example, instructions for processing the order. The Note is of type GDT: Note.

(ii) Party Package

The Party package 45016 groups the business partners that are relevant for the ordering process. It includes a BuyerParty entity 45022 and a VendorParty entity 45024.

For internal communication (with common master data), use the InternalID entity for all party entities. For interenterprise communication (with business-partner-specific master data), use for all party entities either the StandardID entity or the partner-role-specific ID entity of the receiving partner, in other words, for Supplier Collaboration scenarios use the BuyerID entity, and for Customer Collaboration scenarios, use the VendorID entity. Due to the different possibilities for ID use, all ID entity elements of the particular "Party" are optional.

(a) Buyer Party Entity

BuyerParty entity 45022 is the purchasing company that is to receive a replenishment delivery. BuyerParty entity 45022 is of type GDT: BusinessTransactionDocumentParty, where the InternalID, the StandardID, the BuyerID, and the VendorID are used. There is a 1:1 relationship 45023 between BuyerParty entity 45022 and VendorGeneratedOrder entity 45014.

(b) Vendor Party Entity

VendorParty entity 45024 is the company that is to provide a replenishment delivery. VendorParty entity 45024 is of type GDT: BusinessTransactionDocumentParty, where the InternalID, the StandardID, the BuyerID, and the VendorID are used. There is a 1:1 relationship 45025 between VendorParty entity 45024 and VendorGeneratedOrder entity 45014.

(iii) Vendor Generated Order Item Package

The VendorGeneratedOrder package 45006 groups the VendorGeneratedOrderItem entity 45026 and a BusinessTransactionDocumentReference package 45028, a Location package 45030, a Product package 45032, a Promotion package 45034, and a VendorGeneratedOrderItemScheduleLine package 45036.

(a) Vendor Generated Order Item Entity

VendorGeneratedOrderItem entity 45026 describes when and where certain quantities of a product that is listed in a VendorGeneratedOrder entity 45014 will be delivered or can be picked up. In addition to details regarding the products to be delivered and locations, VendorGeneratedOrderItem can contain references to other relevant business documents.

VendorGeneratedOrderItem entity 45026 includes an ID, an AcceptanceStatusCode, a ConsignmentIndicator, a NetWeightMeasure, and a Note. The ID identifies the item in the VendorGeneratedOrder 45014, and is of type GDT: BusinessTransactionDocumentItemID. There is a 1:n relationship 45027 between VendorGeneratedOrderItem entity 45026 and VendorGeneratedOrder entity 45014. The AcceptanceStatusCode is the acceptance status for executing the replenishment order item, and is of type GDT: AcceptanceStatusCode. The ConsignmentIndicator indicates whether the item belongs to the consignment stock, and is of type GDT: ConsignmentIndicator. The NetWeightMeasure is the net weight of the products in the item within the VendorGeneratedOrder entity 45014, and is of type GDT: Measure. The Note is the Note on the item in the VendorGeneratedOrder. For example, the Note includes instructions for processing an item. The Note is of type GDT: Note. The AcceptanceStatusCode is not required in the VendorGeneratedOrderNotificationMessage.

(b) Business Transaction Document Reference package

The BusinessTransactionDocumentReference package 45028 is a group of references to other business documents that can occur in the replenishment order process. It includes a PurchasingContractReference 45058 and a SalesOrderReference entity 45038.

A PurchasingContractReference 45058 is a reference to a purchase contract or item in a purchase contract. The PurchasingContractReference 45058 is of type GDT: BusinessTransactionDocumentReference.

SalesOrderReference entity 45038 is the reference to the sales order or sales order item created for the ReplenishmentOrder in the vendor's Logistics Execution system. SalesOrderReference entity 45038 is of type GDT: BusinessTransactionDocumentReference. There is a 1:c relationship 45039 between SalesOrderReference entity 45038 and VendorGeneratedOrderItem entity 45026. SalesOrderReference entity 45038 is used to extend the buyer's purchase order to include the vendor's external document ID. It is required in particular if the purchase order numbers in the buyer's Logistics Execution system are not assigned until the VendorGeneratedOrderNotification 45012 is received (as opposed to during the earlier replenishment planning stage at the vendor using the purchase order numbers allocated by the buyer). In this case, the sales order reference also is returned to the vendor in the VendorGeneratedOrderConfirmation message 45014.

(c) Location Package

The Location Package 45030 groups the locations that may be relevant within the replenishment order process. It includes a ShipFromLocation entity 45040, a TransshipmentLocation entity 45042, and a ShipToLocation entity 45044.

For internal communication (with common master data), use the InternalID for all location entities. For interenterprise communication (with business-partner-specific master data), use for all location entities either the StandardID or the partner-role-specific ID entity of the sending or receiving partner, in other words, the BuyerID entity or VendorID entity. Due to the different possibilities for ID entity use, all ID elements of the particular "location" are optional.

(i) Ship From Location Entity

ShipFromLocation entity 45040 is the location to which the quantity of a product listed in the item for a VendorGeneratedOrder is to be delivered. ShipFromLocation entity 45040 is of type GDT: BusinessTransactionDocumentShipFromLocation, where the InternalID, StandardID, BuyerID, VendorID, and LoadingLocation are used. There is a 1:1 relationship 45041 between ShipFromLocation entity 45040 and VendorGeneratedOrderItem entity 45026.

(ii) Transshipment Location Entity

TransshipmentLocation entity 45042 is the location at which the quantity of a product listed in the item for a VendorGeneratedOrder is to be loaded from one vehicle to another while being delivered to the recipient. TransshipmentLocation entity 45042 is of type GDT: BusinessTransactionDocumentTransshipmentLocation, where the InternalID, StandardID, BuyerID, VendorID, Address, LoadingLocation, and UnloadingLocation are used. There is a 1:c relationship 45043 between TransshipmentLocation entity 45042 and VendorGeneratedOrderItem entity 45026.

(iii) Ship To Location Entity

ShipToLocation entity 45044 is the location from which the quantity of a product listed in the item for a VendorGeneratedOrder is to be delivered. ShipToLocation entity 45044 is of type GDT: BusinessTransactionDocumentShipToLocation, where the InternalID, StandardID, BuyerID, VendorID, and UnloadingLocation are used. There is a 1:1 relationship 45045 between ShipToLocation entity 45044 and VendorGeneratedOrderItem entity 45026.

(d) Product Information Package

The ProductInformation package 45032 groups the information that characterizes the product listed in the item of a VendorGeneratedOrder entity 45014 in greater detail. It includes a Product entity 45046.

Product entity 45046 includes the information for identifying a delivered product and the package quantity used. Product entity 45046 is of type GDT: BusinessTransactionDocumentProduct, where the InternalID, StandardID, BuyerID, VendorID, and PackageQuantity are used. There is a 1:1 relationship 45047 between Product entity 45046 and VendorGeneratedOrderItem entity 45026. For internal communication, use the InternalID for all product entities. For interenterprise communication, use for all product entities either the StandardID or the partner-role-specific ID entity of the sending or receiving partner, in other words, the BuyerID or VendorID. Due to the different possibilities for ID entity use, all ID elements of the particular 'product' are optional.

(e) Promotion Package

The Promotion package 45034 groups all the data regarding marketing promotions that are relevant for the product listed in a VendorGeneratedOrder item 45014. It includes a Promotion entity 45048.

Promotion entity 45048 includes data that identifies a marketing promotion that is planned by the buyer for the product to be delivered. Promotion entity 45048 includes an InternalID, a BuyerID, and a VendorID. The InternalID identifies the marketing promotion (for communication within the company), and is of type GDT: PromotionInternalID. There is a 1:c relationship 45049 between Promotion entity 45048 and VendorGeneratedOrderItem entity 45026. The BuyerID identifies the marketing promotion (used by BuyerParty), and is of type GDT: PromotionPartyID. The VendorID identifies the marketing promotion (used by VendorParty), and is of type GDT: PromotionPartyID.

This additional information is required to distinguish between "standard purchase orders" and "special purchase orders" as part of the marketing activities between the consumer goods and retail industries (for example, to boost awareness of a product).

(f) Vendor Generated Order Item Schedule Line Package

The VendorGeneratedOrderItemScheduleLine package 45036 groups all of the quantity and date information for a VendorGeneratedOrderItem 45026. It includes a ScheduleLine entity 45050 and a ConfirmedScheduleLine entity 45052.

(i) Schedule Line Entity

ScheduleLine entity 45050 is a schedule line containing a quantity and scheduling dates planned by the vendor for his customer for replenishment deliveries of a product. The ScheduleLine entity 45050 includes a ShipmentGroupID, a DeliveryPeriod, a PickupPeriod, and a Quantity. There is a 1:n relationship 45051 between ScheduleLine entity 45050 and VendorGeneratedOrderItem entity 45026. The ShipmentGroupID entity identifies a group of replenishment order items that are combined for a shipment document, and is of type GDT: BusinessTransactionDocumentGroupID. The DeliveryPeriod is the period in which the products are expected to be delivered, and is of type GDT: DateTimePeriod. The PickupPeriod is the period in which the products can be picked up, and is of type GDT: DateTimePeriod. The Quantity is the quantity of a product in a replenishment delivery to be delivered or picked up, and is of type GDT: Quantity.

(ii) Confirmed Schedule Line Entity

ConfirmedScheduleLine entity 45052 is a schedule line entity containing a quantity and scheduling dates for replenishment deliveries of a product. There is a 1:cn relationship 45053 between ConfirmedScheduleLine entity 45052 and VendorGeneratedOrderItem entity 45026. The structure is the same as ScheduleLine entity 45050.

The ConfirmedScheduleLine entity 45052 is not required in the VendorGeneratedOrderNotificationMessage.

The ConfirmedScheduleLine entity 45052 can contain discrepancies with regard to the original schedule line in terms of scheduling periods and delivery quantities.

(iv) Handling Unit Package

The HandlingUnit package 45020 summarizes information that characterizes in greater detail how the replenishment delivery is packed or to be packed. It includes a HandlingUnit entity 45054.

The HandlingUnit package 45020 and HandlingUnit entity 45054 are not required in the VendorGeneratedOrderConfirmationMessage.

HandlingUnit entity 45054 is a physical unit of packaging materials (load carrier, additional packaging materials) and the packaged products (of type "Material"). HandlingUnit entity 45054 is of type GDT: HandlingUnit. There is a 1:cn relationship 45055 between HandlingUnit entity 45054 and VendorGeneratedOrder entity 45014. The product listed in a VendorGeneratedOrderItem can be distributed among several HandlingUnits 45054 and a HandlingUnit 45054 can contain products that are listed in several items. The products included in a HandlingUnit 45054 are specified by the "HandlingUnitLoad" element by means of a reference to the relevant items in the VendorGeneratedOrder.

(4) Element Structure of Vendor Generated Order Message

The message data type element structure for the VendorGeneratedOrder message is depicted in FIG. 451. The element structure is similar to the data model, but provides additional information regarding the details of the interface. The element structure identifies the different packages 45100 in the interface, and represents the entities at various levels within the interface. As depicted in FIG. 451, the interface for VendorGeneratedOrderMessage includes six levels 45102, 45104, 45106, 45108, 45110 and 45112. The outermost package of this interface is a VendorGeneratedOrder package 45124, which includes a VendorGeneratedOrder entity 45126 at the first level 45102. The VendorGeneratedOrder entity 45126 is of a type G/CDT 45116 "VendorGeneratedOrder" 45130. There is one 45128 VendorGeneratedOrder entity 45126 for each VendorGeneratedOrder package 45124.

The VendorGeneratedOrder package 45124 includes a BusinessDocumentMessageHeader package 45134 and an Order package 45136. BusinessDocumentMessageHeader package 45134 includes a MessageHeader entity 45138 at the second level 45104. The MessageHeader entity 45138 is of a G/CDT type 45116 "BusinessDocumentMessageHeader" 45142, and there is one 45140 MessageHeader entity 45138 for each BusinessDocumentMessageHeader package 45134.

The MessageHeader entity 45138 includes an ID 45148, a ReferenceID 45158, a CreationDateTime 45168, a SenderParty 45176, and a RecipientParty 45102A at the third level 45106. The ID 45148 is of a type G/CDT 45116 "BusinessDocumentMessageID" 45152, and there is one 45150 ID 45148 for a MessageHeader entity 45138. The ID 45148 has a length 45120 of 1 to 35 45154. The ReferenceID 45158 is of a type G/CDT 45116 "BusinessDocumentMessageID" 45162, and there is zero or one 45160 ReferenceID 45158 for a MessageHeader entity 45138. The ReferenceID 45158 has a length 45120 of 1 to 35 45164. The CreationDateTime 45168 is of a type G/CDT 45116 "DateTime" 45172, and there is one 45170 CreationDateTime 45168 for a MessageHeader entity 45138. The SenderParty 45176 is of a type G/CDT 45116 "BusinessDocumentMessageHeaderParty" 45180, and there is zero or one 45178 SenderParty 45176 for a MessageHeader entity 45138. The RecipientParty 45102A is of a type G/CDT 45116 "BusinessDocumentMessageHeaderParty" 45106A, and there is zero or one 45104A RecipientParty 45102A for a MessageHeader entity 45138.

The SenderParty45176 includes an InternalID 45186 and a StandardID 45194 at the fourth level 45108. The InternalID 45186 is of a type G/CDT 45116 "PartyInternalID" 45190, and there is zero or one 45188 InternalID 45186 for a SenderParty 45176. The StandardID 45194 is of a type G/CDT 45116 "PartyStandardID" 45198, and there is any number 45196 of StandardID 45194 for a SenderParty 45176.

The RecipientParty 45102A includes an InternalID 45112A and a StandardID 45120A at the fourth level 45108. The InternalID 45112A is of a type G/CDT 45116 "PartyInternalID" 45116A, and there is zero or one 45114A InternalID 45112A for a RecipientParty 45102A. The StandardID 45120A is of a type G/CDT 45116 "PartyStandardID" 45124A, and there is any number 45122A of StandardID 45120A for a RecipientParty 45102A.

The Order package 45136 includes a VenderGeneratedOrder entity 45128A at the second level 45104; a Party package 45154A; a TransportMeansDescriptionCode 45158B, a GrossWeightMeasure 45168A, a NetWeightMessure 45178A, a HandlingUnit 45188B, and a Note 45198B at the third level 45106; an Item package 45156A; and a HandlingUnit package 45166G.

The VenderGeneratedOrder entity 45128A is of a type G/CDT 45116 "VenderGeneratedOrder" 45132A, and there is one 45130A VenderGeneratedOrder entity 45128A for each Order package 45136. The VenderGeneratedOrder entity 45128A includes an ID 45136A and a CreationDateTime 45146A at the third level 45106. The ID 45136A is of a type G/CDT 45116 "BusinessTransactionDocumentID" 45140A, and there is zero or one 45138A ID 45136A for each VenderGeneratedOrder entity 45128A. The ID 45136A has a length 45120 of 1 to 35 45142A. The CreationDateTime entity 45146A is of a type G/CDT 45116 "DateTime" 45150A, and there is one 45148A CreationDateTime 45146A for each VenderGeneratedOrder entity 45128A.

The Party package 45154A includes a BuyerParty entity 45158A and a VenderParty entity 45108B at the third level 45106. The BuyerParty entity 45158A is of a type G/CDT 45116 "BusinessTransactionDocunientParty" 45162A, and there is zero or one 45160A BuyerParty entity 45158A for each Party package 45154A. The VenderParty entity 45108B is of a type G/CDT 45116 "BusinessTransactionDocument-Party" 45112B, and there is zero or one 45110B VenderParty entity 45108B for each Party package 45154A.

The BuyerParty entity 45158A includes an InternalID 45168A, a StandardID 45178A, a BuyerID 45188A, and a VendorID 45198A at the fourth level 45108. The InternalID 45168A is of a type G/CDT 45116 "PartyInternalID" 45172A, and there is zero or one 45170A InternalID entity 45168A for each BuyerParty entity 45158A. The InternalID 45168A has a length 45120 of 1 to 10 45174A. The StandardID 45178A is of a type G/CDT 45116 "PartyStandardID" 45182A, and there is any number 45180A of StandardID 45178A for each BuyerParty entity 45158A. The StandardID 45178A has a length 45120 of 1 to 13 or 1 to 9 45184A. The BuyerID 45188A is of a type G/CDT 45116 "PartyPartyID" 45192A, and there is zero or one 45190A BuyerID 45188A for each BuyerParty entity 45158A. The BuyerID 45188A has a length 45120 of 1 to 10 45194A. The VendorID entity 45198A is of a type G/CDT 45116 "PartyPartyID" 45102B, and there is zero or one 45100B VendorID entity 45198A for each BuyerParty entity 45158A. The VendorID entity 45198A has a length 45120 of 1 to 10 45104B.

The VendorParty entity 08B includes an InternalID 45118B, a StandardID 45128B, a BuyerID 45138B, and a VendorID 45148B at the fourth level 45108. The InternalID 45118B is of a type G/CDT 45116 "PartyInternalID" 45122B, and there is zero or one 45120B InternalID 45118B for each VendorParty entity 45108B. The InternalID 45118B has a length 45120 of 1 to 10 45124B. The StandardID 45128B is of a type G/CDT 45116 "PartyStandardID" 45132B, and there is any number 45130B of StandardID 45128B for each VendorParty entity 45108B. The StandardID 45128B has a length 45120 of 1 to 13 or 1 to 9 45134B. The BuyerID 45138B is of a type G/CDT 45116 "PartyPartyID" 45142B, and there is zero or one 45140B BuyerID 45138B for each VendorParty entity 45108B. The BuyerID 45138B has a length 45120 of 1 to 10 45144B. The VendorID 45148B is of a type G/CDT 45116 "PartyPartyID" 45152B, and there is zero or one 45150B VendorID 45148B for each VendorParty entity 45108B. The Vendor 45148B has a length 45120 of 1 to 10 45154B.

The Order package 45136 includes a TransportMeansDescriptionCode 45158B, a GrossWeightMeasure 45168B, a NetWeightMeasure 45178B, a HandlingUnit 45188B, and a Note 45198B at the third level 45106. The TransportMeansDescriptionCode 45158B is of a type G/CDT 45116 "TransportMeansDescriptionCode" 45162B, and there is zero or one 45160B TransportMeansDescriptionCode 45158B for each Order package 45136. The TransportMeansDescriptionCode 45158 has a length 45120 of 4 45164B. The GrossWeightMeasure 45168B is of a type G/CDT 45116 "Measure" 45172B, and there is zero or one 45170B GrossWeightMeasure 45168B for each Order package 45136. The GrossWeightMeasure 45168B has a length 45120 of 19 or 6 45174B. The NetWeightMeasure 45178B is of a type G/CDT 45116 "Measure" 45182B, and there is zero or one 45180B NetWeightMeasure 45178B for each Order package 45136. The NetWeightMeasure 45178B has a length 45120 of 19 or 6 45184B. The HandlingUnit 45188B is of a type G/CDT 45116 "Measure" 45192B, and there is zero or one 45190B HandlingUnit 45188B for each Order package 45136. The HandlingUnit 45188B has a length 45120 of 19 or 6 45194B . The Note 45198B is of a type G/CDT 45116 "Note" 45102C, and there is zero or one 45100C Note 45198B for each Order package 45136. The Note 45198B has a length 45120 of 1 to 132 45104C.

The Item package 45156A includes an Item entity 45108C at the third level 45106; a BusinessTransactionDocumentReference package 45146C; a Location package 45148C, a ProductInformation package 45150C, a Promotion package 45152C; a NetWeightMeasure 45158F and a Note 45168F at the fourth level 45108; and a ScheduleLine package 45154C.

The Item entity 45108C is of a type G/CDT 45116 "VendorGeneratedOrderItem" 45112C, and there is at least one 45110C. Item entity 45108C for each Item package 45156A. The Item entity 45108C includes an ID 45116C, a AcceptanceStatusCode 45126C, and a ConsigmentIndicator 45136C at the fourth level 45108.

The ID 45116C is of the type G/CDT 45116 "BusinesssTransactionDocumentItemID" 45120C, and there is zero or one 45118C ID 45116C for each Item entity 45108C. The ID 45116C has a length 45120 of 1 to 10 45122C. The AcceptanceStatusCode 45126C is of a type G/CDT 45116 "AcceptanceStatusCode" 45129C, and there is zero or one 451C28 AcceptanceStatusCode 45126C for each Item entity 45108C. The AcceptanceStatusCode 45126C has a length 45120 of two 45132C. The ConsignmentIndicator 45136C is of a type G/CDT 45116 "ConsignmentIndicator" 45140C, and there is zero or one 45138C ConsignmentIndicator 45136C for each Item entity 45108C. The ConsignmentIndicator 45136C has a length 45120 of one 45142C.

The BusinessTransactionDocumentReference package 45146C includes a SalesOrderReference entity 45156C at the fourth level 45108. The SalesOrderReference entity 45156C is of a type G/CDT 45116 "BusinessTransactionDocumentReference" 45160C, and there is zero or one 45158C SalesOrderReference entity 45156C for each BusinessTransactionDocumentReference package 45146C.

The Location package 45148C includes a ShipFromLocation entity 45164C, a TransshipmentLocation entity 45124D, and a ShipToLocation entity 45102E at the fourth level 45108. The ShipFromLocation entity 45164C is of the type G/CDT 45116 "BusinessTransactionDocumentShipFromLocation" 45168C, and there is zero or one 45166C ShipFromLocation entity 45164C for each Location package 45148C. The TransshipmentLocation entity 45124D is of the type G/CDT 45116 "BusinessTransactionDocumentTransshipmentLocation" 45128D, and there is zero or one 45126D TransshipmentLocation entity 45124D for each Location package 45148C. The ShipToLocation entity 45102E is of the type G/CDT 45116 "BusinessTransactionDocumentShipToLocation" 45106E, and there is one 45104E ShipToLocation entity 45102E for each Location package 45148C.

The ShipFromLocation entity 45164C includes an InternalID 45174C, a StandardID 45184C, a BuyerID 45194C, a VendorID 45104D, and a LoadingLocation 45114D at the fifth level 45110. The InternalID 45174C is of the type G/CDT 45116 "LocationInternalID" 45178C, and there is zero or one 45176C InternalID 45174C for each ShipFrom- Location entity 45164C. The InternalID 45174C has a length 45120 of 1 to 20 45180C. The StandardID 45184C is of the type G/CDT 45116 "LocationStandardlID" 45188C, and there is any number 45186C StandardID 45184C for each ShipFromLocation entity 45164C. The StandardID 45184C has a length 45120 of 1 to 13 45190C. The BuyerID 45194C is of the type G/CDT 45116 "LocationPartylID" 45198C, and there is zero or one 45196C BuyerID 45194C for each ShipFromLocation entity 45164C. The BuyerID entity 45194C has a length 45120 of 1 to 20 45100D. The VendorID 45104D is of the type G/CDT 45116 "LocationPartylID" 45108D, and there is zero or one 45106D VendorID 45104D for each ShipFromLocation entity 45164C. The VendorID 45104D has a length 45120 of 1 to 20 4511 OD. The LoadingLocation 45114D is of the type G/CDT 45116 "BusinessTransactionDocumentLocation" 45118D, and there is zero or one 45116D LoadingLocation 45114D for each ShipFromLocation entity 45164C.

The TransshipmentLocation entity 45124D includes an InternalID 45134D, a StandardID 45144D, a BuyerID 45154D, a VendorID 45164D, an Address 45174D, a LoadingLocation 45182D, and an UnloadingLocation 45192D at the fifth level 45110. The InternalID 45134D is of the type G/CDT 45116 "LocationInternalID" 45138D, and there is zero or one 45136D InternalID 45134D for each TransshipmentLocation entity 45124D. The InternalID 45134D has a length 45120 of 1 to 20 45140D. The StandardID 45144D is of the type G/CDT 45116 "LocationStandardlID" 45148D, and there is any number 45146D StandardID 45144D for each TransshipmentLocation entity 45124D. The StandardID 45144D has a length 45120 of 1 to 13 45150D. The BuyerID 45154D is of the type G/CDT 45116 "LocationPartylID" 45158D, and there is zero or one 45156D BuyerID 45154D for each TransshipmentLocation entity 45124D. The BuyerID 45154D has a length 45120 of 1 to 20 45160D. The VendorID 45164D is of the type G/CDT 45116 "LocationPartylID" 45168D, and there is zero or one 45166D VendorID 451064D for each TransshipmentLocation entity 45124D. The VendorID 45164D has a length 45120 of 1 to 20 45170D. The Address 451 74D is of the type G/CDT 45116 "Address" 45178D, and there is zero or one 45176D Address 45174D for each TransshipmentLocation entity 45124D. The LoadingLocation 45182D is of the type G/CDT 45116 "BusinessTransactionDocumentLocation" 45186D, and there is zero or one 45184D LoadingLocation 45182D for each TransshipmentLocation entity 45124D. The UnloadingLocation 45192D is of the type G/CDT 45116 "BusinessTransactionDocumentLocation" 45196D, and there is zero or one 45194D UnloadingLocation 45192D for each TransshipmentLocation entity 45124D.

The ShipToLocation entity 45102E includes an InternalID 45112E, a StandardID 45122E, a BuyerID 45132E, a VendorID 45142E, and an UnloadingLocation 45152E at the fifth level 45110. The InternalID 45112E is of the type G/CDT 45116 "LocationInternalID" 45116E, and there is zero or one 45114E InternalID 45112E for each ShipToLocation entity 45102E. The InternalID entity 45112E has a length 45120 of 1 to 20 45118E. The StandardID 45122E is of the type G/CDT 45116 "LocationStandardlID" 45126E, and there is any number 45124E StandardID 45122E for each ShipToLocation entity 45102E. The StandardID 45122E has a length 45120 of 1 to 13 45128E. The BuyerID 45132E is of the type G/CDT 45116 "LocationPartylID" 45136E, and there is zero or one 45134E BuyerID45132E for each ShipToLocation entity 45102E. The BuyerID 45132E has a length 45120 of 1 to 20 45138E. The VendorID 45142E is of the type G/CDT 45116 "LocationPartylID" 45146E, and there is zero or one 45144E VendorID 45142E for each ShipToLocation entity 45102E. The VendorID 45142E has a length 45120 of 1 to 20 45148E. The UnloadingLocation 45152E is of the type G/CDT 45116 "BusinessTransactionDocumentLocation" 45156E, and there is zero or one 45154E UnloadingLocation 45152E for each ShipToLocation entity 45102E.

ProductInformation package 45150C includes a Product entity 45162E at the fourth level 45108. The Product entity 45162E is of the type G/CDT 45116 "BusinessTransactionDocumentProduct" 45166E, and there is one 45164E Product entity 45162E for each ProductInformation package 45150C.

The Product entity 45162E includes an InternalID 45172E, a StandardID 45182E, a BuyerID 45192E, a VendorID 45102F, and a PackageQuantity 45112F at the fifth level 45110. The InternalID 45172E is of the type G/CDT 45116 "ProductInternalID" 45176E, and there is zero or one 45174E InternalID 45172E for each Product entity 45162E. The InternalID 45172E has a length 45120 of 1 to 40 45178E. The StandardID 45182E is of the type G/CDT 45116 "ProductStandardID" 45186E, and there is zero or one 45184E StandardID 45182E for each Product entity 45162E. The StandardID 45182E has a length 45120 of 1 to 14 45188E. The BuyerID 45192E is of the type G/CDT 45116 "ProductPartyID" 45196E, and there is zero or one 45194E BuyerID 45192E for each Product entity 45162E. The BuyerID 45192E has a length 45120 of 1 to 40 45198E. The VendorID 45102F is of the type G/CDT 45116 "ProductPartyID" 45106F, and there is zero or one 45104F VendorID 45102F for each Product entity 45162E. The VendorID 45102F has a length 45120 of 1 to 40 45108F. The PackageQuantity 45112F is of the type G/CDT 45116 "Quantity" 45116F, and there is zero or one 45114F PackageQuantity 45112F for each Product entity 45162E. The PackageQuantity 45112F has a length 45120 of 19 or 6 45118F.

The Promotion package 45152C includes a Promotion entity 45122F at the fourth level 45108. There is zero or one 45124F Promotion entity 45122F for each Promotion package 45152C. The Promotion entity 22F includes an InternalID 45128F, a BuyerID 45138F, and a VendorID 45148F. The InternalID 45128F is of the type G/CDT 45116 "PromotionInternalID" 45132F, and there is zero or one 45130F InternalID 45128F for each Promotion entity 22F. The InternalID 45128F has a length 45120 of 1 to 35 45134F. The BuyerID 45138F is of a type G/CDT 45116 "PromotionPartyID" 45142F, and there is zero or one 45140F BuyerID 45138F for each Promotion entity 45122F. The BuyerID 45138F has a length 45120 of 1 to 35 45144F. The VendorID 45148F is of a type G/CDT 45116 "PromotionPartyID" 45152F, and there is zero or one 45150F VendorID 45148F for each Promotion entity 45122F. The VendorID 45148F has a length 45120 of 1 to 35 45154F.

The NetWeightMeasure 45158F is of a type G/CDT 45116 "Measure" 45162F, and there is one or zero 45160F NetWeightMeasure 45158F for each Item package 45156A. The NetWeightMeasure 45158F has a length 45120 of 19 or 6 45164F.

The Note 45168F is of a type G/CDT 45116 "Note" 45172F, and there is zero or one 45170F Note 45168F for each Item package 45156A. The Note 45168F has a length 45120 1 to 132 45174F.

The ScheduleLine Package 45154C includes a ScheduleLine entity 45178F and a ConfirmedScheduleLine entity 45122G at the fourth level 45108. The ScheduleLine entity 45178F is of a type G/CDT 45116 "VendorGeneratedOrderItemScheduleLine" 45182F, and there is at least one 45180F ScheduleLine entity 45178F for each ScheduleLine package 45154C. The ConfirmedScheduleLine entity 45122G is of a type G/CDT 45116 "VendorGeneratedOrderItem-ScheduleLine" 45126G, and there is any number 45124G ConfirmedScheduleLine entities 45122G for each Schedule-Line package 45154C.

The ScheduleLine entity 45178F includes a Shipment-GroupID 45186F, a DeliveryPeriod 45196F, a PickUpPeriod 45104G, and a Quantity 45112G at the fifth level 45110. The ShipmentGroupID 45186F is of the type G/CDT 45116 "BusinessTransactionDocumentGroupID" 45190F, and there is zero or one 45188F ShipmentGroupID 45186F for each ScheduleLine entity 45178F. The ShipmentGroupID 45186F has a length 45120 of 1 to 10 45192F. The Delivery-Period 45196F is of a type G/CDT 45116 "DateTimePeriod" 45100G, and there is zero or one 45198F DeliveryPeriod 45196F for each ScheduleLine entity 45178F. The PickUp-Period 45104G is of a type G/CDT 45116 "DateTimePeriod" 45108G, and there is zero or one 45106G PickUpPeriod 45104G for each ScheduleLine entity 45178F. The Quantity 45112G is of a type G/CDT 45116 "Quantity" 45116G, and there is one 45114G Quantity 45112G for each ScheduleLine entity 45178F. The Quantity 45112G has a length 45120 of 19 or 6 45118G.

The ConfirmedScheduleLine entity 45122G includes a ShipmentGroupID 45130G, a DeliveryPeriod 45140G, a PickUpPeriod 45148G, and a Quantity 45156G at the fifth level 45110. The ShipmentGroupID 45130G is of the type G/CDT 45116 "BusinessTransactionDocumentGroupID" 45134G, and there is zero or one 45132G ShipmentGroupID 45130G for each ConfirmedScheduleLine entity 45122G. The ShipmentGroupID 45130G has a length 45120 of 1 to 10 45136G. The DeliveryPeriod 45140G is of a type G/CDT 45116 "DateTimePeriod" 45144G, and there is zero or one 45142G DeliveryPeriod 45140G for each ConfirmedSched-uleLine entity 45122G. The PickUpPeriod 45148G is of a type G/CDT 45116 "DateTimePeriod" 45152G, and there is zero or one 45150G PickUpPeriod 45148G for each Con-firmedScheduleLine entity 45122G. The Quantity 45156G is of a type G/CDT 45116 "Quantity" 45160G, and there is one 45158G Quantity 45156G for each ConfirmedScheduleLine entity 45122G. The Quantity 45156G has a length 45120 of 19 or 6 45162G.

The HandlingUnit package 45166G includes a Handlin-gUnit entity 45168G at the third level 45106. The Handlin-gUnit entity 45168G is of a type G/CDT 45116 "Handlin-gUnit" 45172G, and there is any number 45170G HandlingUnit entities 45168G for each Handling package 45166G. The HandlingUnit entity 45168G includes an ID 45178G, a LoadCarrier 45188G, a HeightMeasure 45140H, a LengthMeasure 45150H, a WidthMeasure 45160H, a Hand-lingUnit 45170H, a GrossWeightMeasure 45180H, an Addi-tionalPackaging 45190H, a LowerLevelHandlingUnit 45152I, and Load 45168I at the fourth level 45108.

The ID 45178G is of a type G/CDT 45116 "Handlin-gUnitID" 45182G, and there is one 45180G ID 45178G for each HandlingUnit entity 45168G. The ID 45178G has a length 45120 of 1 to 20 45184G.

There is one 45190G LoadCarrier 45188G for each Han-dlingUnit entity 45168G. The LoadCarrier entity 45188G includes one 45196G Product 45194G at the fifth level 45110. The Product 45194G includes an InternalID 45100H, a Stan-dardID 45110H, a BuyerID 45120H, and a VendorID 45130H at the sixth level 45112. The InternalID 45100H is of a type G/CDT 45116 "ProductInternalID" 45104H, and there is zero or one 45102H InternalID 45100I for each Product 45194G. The InternalID 45100H has a length 45120 of 1 to 40 45106H. The StandardID 45110H is of a type G/CDT 45116 "ProductStandardID" 45114H, and there is zero or one 45112H StandardID 45110H for each Product 45194G. The StandardID 451100H has a length 45120 of 1 to 14 45116H. The BuyerID 45120H is of a type G/CDT 45116 "Product-PartyID" 45124H, and there is zero or one 45122H BuyerID 45120H for each Product 45194G. The BuyerID 45120H has a length 45120 of 1 to 40 45126H. The VendorID 45130H is of a type 45116 "ProductPartyID" 45134H, and there is zero or one 45132H VendorID 45130H for each Product 45194G. The VendorID 45130H has a length 45120 of 1 to 40 45136H.

The HeightMeasure 45140H is of a type G/CDT 45116 "Measure" 45144H, and there is zero or one 45142H Height-Measure 45140H for each HandlingUnit entity 45168G. The HeightMeasure 45140H has a length 45120 of 19 or 6 45146H.

The LengthMeasure 45150H is of a type G/CDT 45116 "Measure" 45154H, and there is zero or one 45152H Length-Measure 45150H for each HandlingUnit entity 45168G. The LengthMeasure 45150H has a length 45120 of 19 or 6 45156H.

The WidthMeasure 45160H is of a type G/CDT 45116 "Measure" 45164H, and there is zero or one 45162H Width-Measure 45160H for each HandlingUnit entity 45168G. The WidthMeasure 45160H has a length 45120 of 19 or 6 45166H.

The HandlingUnit 45170H is of a type G/CDT 45116 "Measure" 45174H, and there is zero or one 45172H Hand-lingUnit 45170H for each HandlingUnit entity 45168G. The HandlingUnit 45170H has a length 45120 of 19 or 6 45176H.

The GrossWeightMeasure 45180H is of a type G/CDT 45116 "Measure" 45184H, and there is zero or one 45182H GrossWeightMeasure 45180H for each HandlingUnit entity 45168G. The GrossWeightMeasure 45180H has a length 45120 of 19 or 6 45186H.

There are any number 45192H AdditionalPackaging 45190H for each HandlingUnit entity 45168G. The Addition-alPackaging 45190H includes one 45198H Product 45196H and one 45144I Quantity 45142I at the fifth level 45110. The Quantity 45142I is of the type 45116 "Quantity" 45146I. The Quantity 45142I has a length 45120 of 19 or 6 45148I.

The Product 45196H includes an InternalID 45102I, a StandardID 45112I, a BuyerID 45122I, and a VendorID 45132I at the sixth level 45112. The InternalID 45102I is of the type G/CDT 45116 "ProductInternalID" 45106I, and there is zero or one 45104I InternalID 45102I for each Prod-uct 45196H. The InternalID 45102I has a length 45120 of 1 to 40 45108I. The StandardID 45112I is of the type G/CDT 45116 "ProductStandardID" 45116I, and there is zero or one 45114I StandardID 45112I for each Product 45196H. The StandardID 45112I has a length 45120 of 1 to 14 45118I. The BuyerID 45122I is of the type G/CDT 45116 "ProductPar-tyID" 45126I, and there is zero or one 45124I BuyerID 45122I for each Product 45196H. The BuyerID 45122I has a length 45120 of 1 to 40 45128I. The VendorID 45132I is of the type G/CDT 45116 "ProductPartyID" 45136I, and there is zero or one 45134I VendorID 45132I for each Product 45196H. The VendorID 45132I has a length 45120 of 1 to 40 45138I.

There is any number 45154I LowerLevelHandlingUnit 45152I for each HandlingUnit entity 45168G. The Lower-LevelHandlingUnit 45152I includes an ID 45158I at the fifth level 45110. The ID 45158I is of the type G/CDT 45116 "HandlingUnitID" 45162I, and there is one 45160I ID 45158I for each LowerLevelHandlingUnit 45152I. The ID 45158I has a length 45120 of 1 to 20 45164I.

There is any number 45170I of Load 45168I for each HandlingUnit entity 45168G. The Load 45168I includes a BusinessTransactionDocumentReference 45174I and a Quantity 45188I at the fifth level 45110.

The BusinessTransactionDocumentReference 45174I includes an ItemID 45178I at the sixth level 45112. The ItemID 45178I is of a type G/CDT 45116 "BusinessTransactionDocumentItemID" 45182I, and there is one 45180I ItemID 45178I for each BusinessTransactionDocumentReference 45174I. The ItemID 45178I has a length 45120 of 1 to 10 45184I.

The Quantity 45188I is of a type G/CDT 45116 "Quantity" 45192I, and there is one 45190I Quantity 45188I for each Load 45168I. The Quantity 45188I has a length 45120 of 19 or 6 45194I.

dd) Bundle Pricing Interfaces (1) Motivating Business Scenario

Bundle pricing is a scenario that contains the entire functionality for bundle pricing determination that is used for settlement charge calculation for a group of bank accounts (combined settlement).

Price determination takes place with the business-related aim of granting preferential prices for a group of accounts with various bank products and various account holders. The charges are determined on the basis of business activities of the whole group, adjusted accordingly and debited to the individual participant accounts.

The aim of bundle pricing is to reward customer loyalty and to ensure a closer connection between customers and the bank.

(2) Message Types

Methods and systems consistent with the subject matter described herein use the package template for a BusinessTransactionDocument for an SCM Master Data depicted in FIG. 270B to derive the BusinessTransactionDocumentImageRecognitionRequest interface.

(a) BankAccountBalanceReportQuery

A BankAccountBalanceReportQuery is a request made to Account Management for bank account balances. The structure of the BankAccountBalanceReportQuery message type is specified by the BankAccountBalanceReportQuery message data type.

(b) BankAccountBalanceReportResponse

A BankAccountBalanceReportResponse contains bank account balances and is the reply from Account Management to the request for this information. The structure of the BankAccountBalanceReportResponse message type is specified by the BankAccountBalanceReport message data type.

(3) Message Choreography

The following message choreography (see FIG. 452) describes the possible logical sequence of the messages that can be used to realize the scenario between Bundle Pricing 45200 and Account Management 45202.

The Bundle Pricing scenario requires account balances for a particular period of time to calculate charges for a group of bank accounts. It requests this information by sending a BankAccountBalanceReportQuery message 45204. Balances for a period, which are returned in a BankAccountBalanceReportResponse message 45206, are used (together with the account conditions defined in bundle pricing) to calculate charges for a group of bank accounts.

During the request process, the request ID is used to relate the individual messages to each other. This means that the BankAccountBalanceReportQuery message 45204 receives its own ID in the MessageHeader. The BankAccountBalanceReportResponse message 45206 refers to the request message using the ReferenceID. This method of relating individual messages is also used for the other query/response and request/confirmation message pairs within this choreography.

The Bundle Pricing scenario also requires bank account payment item counters. It requests this information by sending a BankAccountPaymentItemCounterQuery message 45208. The bank account payment item counters for a period are returned in a BankAccountPaymentItemCounterResponse message 45210.

The Bundle Pricing scenario also requires bank account attribute information. It requests this information by sending a BankAccountAttributeQuery message 45212. Bank account attribute information for a period is returned in a BankAccountAttributeResponse message 45214.

The Bundle Pricing scenario also requires bank account settlement results. It requests this information by sending a BankAccountSettlementResultQuery message 45216. Bank account settlement results for a period are returned in a BankAccountSettlementResultResponse message 45218.

The Bundle Pricing scenario also requires posting of bank account entries. It makes this request by sending a BankAccountPostRequest message 45220. The confirmation of the posted bank account entries for a period is returned in a BankAccountPostConfirmation message 45222.

The Bundle Pricing scenario also requires cancellation of posted bank account entries. It requests the cancellation by sending a BankAccountPostCancellationRequest message 45224. Confirmation of the cancellation request is returned in a BankAccountPostCancellationConfirmation message 45226.

Transmission errors are handled by the infrastructure (message broker). A receiver system accepts inbound messages that are formally correct. Problems regarding the content are solved on the receiver side.

(4) Data Model of the Bank Account Balance Report Query Message

FIG. 453 depicts the data model for the BankAccountBalanceReportQueryMessage. The BankAccountBalanceReportQueryMessage package 45300 message data type groups together the business information that is relevant for sending a business document in a message and the Bank Account Balance Report Query object in the business document. The BankAccountBalanceReportQueryMessage package 45300 includes a BankAccountBalanceReportQueryMessage entity 45302, a MessageHeader package 45304, and a BankAccountBalanceReportQuery package 45306.

(a) Message Header Package

The MessageHeader package 45304 groups the business information that is relevant for sending a business document in a message. It includes a MessageHeader entity 45308, a SenderParty entity 45310, and a RecipientParty entity 45312.

(i) Message Header Entity

The MessageHeader entity 45308 groups business information from the perspective of the sending application. This includes information to identify the business document in a message, information about the sender, and in some cases, information about the recipient. The MessageHeader entity 45308 is of type GDT: BusinessDocumentMessageHeader. There is a 1:1 relationship 45314 between the MessageHeader entity 45308 and the BankAccountBalanceReportMessage entity 45302. The MessageHeader entity 45308 includes an ID element and a Reference ID element.

(ii) Sender Party Entity

A SenderParty entity 45310 is the party responsible for sending a business document on a business application level. The SenderParty entity 45310 is of type GDT: BusinessDocumentMessageHeaderParty. There is a 1:c relationship 45316 between the SenderParty entity 45310 and MessageHeader entity 45308.

(iii) Recipient Party Entity

A RecipientParty entity 45312 is the party responsible for receiving a business document on a business application level. The RecipientParty entity 45312 is of type GDT: BusinessDocumentMessageHeaderParty. There is a 1:c relationship 45318 between the RecipientParty entity 45312 and the MessageHeader entity 45308.

(b) Bank Account Balance Report Query Package

The BankAccountBalanceReportQuery package 45306 groups together a BankAccountBalanceReportQuery entity 45320, a BankAccount package 45322, and an Item package 45324.

(i) Bank Account Balance Report Query Entity

The BankAccountBalanceReportQuery entity 45320 contains a request for balance information for a bank account. There is a 1:1 relationship 45326 between the BankAccountBalanceReportQuery entity 45320 and the BankAccountBalanceReportQueryMessage entity 45302.

(ii) Bank Account Package

The BankAccount package 45322 groups information about the bank account for which requests are to be made. The BankAccount package 45322 includes a BankAccount entity 45328 and a Differentiator entity 45330.

(a) Bank Account Entity

The BankAccount entity 45334 determines the bank account for which balance information is to be ascertained. It contains information about a participant bank account that is exchanged in business documents according to general business understanding. The BankAccount entity 45334 is of type GDT: BusinessTransactionDocumentBankAccount. There is a 1:c relationship 45332 between the BankAccount entity 45328 and the BankAccountBalanceReport entity 45330.

(b) BankAccountDifferentiator Entity

The BankAccountDifferentiator entity 45330 is used to differentiate between accounts that are managed under one account number. The BankAccountDifferentiator entity 45330 is of type GDT: BankAccountDifferentiatorID. The BankAccountDifferentiator entity 45330 contains an element BankAccountDifferentiatorID that is a unique identifier to differentiate between bank accounts. There is a 1:1 relationship 45334 between the BankAccountDifferentiator entity 45330 and the BankAccountBalanceReportQuery entity 45320.

(iii) BankAccountBalanceReportQueryItem Package

A BankAccountBalanceReportQueryItem package 45324 groups criteria that are relevant for determining bank account balances. The BankAccountBalanceReportQueryItem package 45324 contains a BankAccountBalanceReportQueryItem entity 45336.

(a) BankAccountBalanceReportQueryItem

The BankAccountBalanceReportQueryItem entity 45336 contains the criteria for determining bank account balances. The BankAccountBalanceReportQueryItem entity 45336 contains a BankAccountBalanceTypeCode element that specifies the type of bank account balance. The BankAccountBalanceTypeCode element is of type GDT: BankAccountBalanceTypeCode. The BankAccountBalanceReportQueryItem entity 45336 also contains a DatePeriod element that specifies the period for which the bank account balances are to be taken into consideration. The DataPeriod element is of type GDT: DatePeriod.

The criteria for an individual BankAccountBalanceReportQueryItem entity 45336 are linked with AND. The criteria for BankAccountBalanceReportQueryItem entity 45336 on item level are linked with OR. There is a 1:cn relationship 45338 between the BankAccountBalanceReportQueryItem entity 45336 and the BankAccountBalanceReportQuery entity 45320.

(5) Data Model of the Bank Account Balance Report Response Message

FIG. 454 depicts the data model for the BankAccountBalanceReportResponseMessage. The BankAccountBalanceReportResponseMessage package 45440 message data type groups together the business information that is relevant for sending a business document in a message and the Bank Account Balance Report object in the business document. The BankAccountBalanceReportMessage package 45440 includes a BankAccountBalanceReportresponseMessage entity 45442, a MessageHeader package 45444, and a BankAccountBalanceReport package 45446.

(a) Message Header Package

The MessageHeader package 45444 groups business information that is relevant for sending a business document in a message. It includes a MessageHeader entity 45448, a SenderParty entity 45450, and a RecipientParty entity 45452.

(i) Message Header Entity

The MessageHeader entity 45448 is of type GDT: BusinessDocumentMessageHeader. The MessageHeader entity 45448 groups business information from the perspective of the sending application. This includes information to identify the business document in a message, information about the sender, and in some cases, information about the recipient. There is a 1:1 relationship 45454 between the MessageHeader entity 45448 and the BankAccountBalanceReportResponseMessage entity 45442. The MessageHeader entity 45448 includes an ID element and a Reference ID element.

(ii) Sender Party Entity

A SenderParty entity 45450 is the party responsible for sending a business document on a business application level. The SenderParty entity 45410 is of type GDT: BusinessDocumentMessageHeaderParty. There is a 1:c relationship 45456 between the SenderParty entity 45450 and MessageHeader entity 45448.

(iii) Recipient Party Entity

A RecipientParty entity 45452 is the party responsible for receiving a business document on a business application level. The RecipientParty entity 45452 is of type GDT: BusinessDocumentMessageHeaderParty. There is a 1:c relationship 45458 between the RecipientParty entity 45452 and the MessageHeader entity 45448.

(b) Bank Account Balance Report Package

The BankAccountBalanceReport package 45406 groups together a BankAccountBalanceReport entity 45460, a Log package 45462, a BankAccount package 45464, and a BankAccountBalance package 45466.

(i) Bank Account Balance Report Entity

The BankAccountBalanceReport entity 45460 contains the information about the balances of a bank account. A bank account balance is the difference between the debit and credit side of a bank account.

There is a 1:1 relationship 45468 between the BankAccountBalanceReport entity 45460 and the BankAccountBalanceReportResponseMessage entity 45442.

(ii) Log Package

The Log package 45462 groups log information for bank account queries. It includes a Log entity 45470.

(a) Log Entity

The Log entity 45470 provides log information for bank account queries. A Log is a sequence of messages that are issued by an application when it executes a task. There is a 1:c relationship 45472 between the Log entity 45470 and the BankAccountBalanceReport entity 45460.

(iii) Bank Account Package

The BankAccount package 45464 groups information about the bank account for which requests are to be made. The BankAccount package 45464 includes a BankAccount entity 45474 and a BankAccountDifferentiator entity 45476.

(a) Bank Account Entity

The BankAccount entity 45474 contains the bank account to which the balance information belongs. The BankAccount entity 45474 is of type GDT: BusinessTransactionDocumentBankAccount. There is a 1:c relationship 45478 between the BankAccount entity 45474 and the BankAccountBalanceReport entity 45460.

(b) BankAccountDifferentiator Entity

The BankAccountDifferentiator entity 45476 is used to differentiate between accounts that are managed under one account number. The BankAccountDifferentiator entity 45476 is of type GDT: BankAccountDifferentiatorID. A BankAccountDifferentiatorID element is a unique identifier to differentiate between bank accounts. There is a 1:c relationship 45480 between the BankAccountDifferentiator entity 45476 and the BankAccountBalanceReport entity 45460.

(iv) Bank Account Balance Package

The BankAccountBalance package 45466 groups account balances. The BankAccountBalance package 45466 contains a BankAccountBalance entity 45482.

(a) Bank Account Balance Entity

The BankAccountBalance entity 45482 contains bank account balances. The BankAccountBalance entity 45482 is of type GDT: BankAccountBalance. There is a 1:cn relationship 45444 between the BankAccountBalance entity 45482 and the BankAccountBalanceReport entity 45460.

(6) Element Structure BankAccountBalanceReportResponse

The message data type element structure for the BankAccountBalanceReportResponse message is depicted in FIG. 455A-B. The element structure is similar to the data model, but provides additional information regarding the details of the interface. The element structure identifies the different packages 45500 in the interface, and represents the entities at various levels within the interface. As depicted in FIG. 455A, the interface for BankAccountBalanceReportResponse Message includes four levels 45502, 45504, 45506, and 45508. The outermost package of this interface is a BankAccountBalanceReportResponse package 45516, which includes a BankAccountBalanceReportResponse entity 45518 at the first level 45502. The BankAccountBalanceReportResponse entity 45518 is of a data type MDT 455220 "BankAccountBalanceReportResponseMessage" 45524.

The BankAccountBalanceReportResponse message package 45516 includes a MessageHeader package 45526 and a BankAccountBalanceReport 45548. The MessageHeader package 45526 includes a MessageHeader entity 45528. The MessageHeader entity 45528 is a GDT 45532 "BusinessDocumentMessageHeader" 45534, and there is either zero of one 45530 MessageHeader entity 45528 for each MessageHeader package 45526. The MessageHeader entity 45528 includes a ReferenceID 45538. The ReferenceID 45538 is a GDT 45542 "BusinessDocumentMessageID" 45544, and there is one ReferenceID 45538 for a MessageHeader entity 45528.

The BankAccountBalanceReport package 45548 includes a BankAccountBalanceReport entity 45550 at the second level. The BankAccountBalanceReport entity 45550 is a "BankAccountBalanceReport" 45556, and there is one 45552 BankAccountBalanceReport entity 45550 for each BankAccountBalanceReport package 45548.

The BankA455ountBalanceReport 45548 includes a Log package 45560, a BankAccount package 45572, and a BankAccountBalance package 45504A. The Log package includes a Log entity 45562 in the third level. The Log entity 45562 is a GDT 45566 "Log" 45568, and there is zero or one 45564 Log entity 45562 for each Log package 45560.

The BankAccount package 45572 includes a BankAccount entity 45574 and a BankAccountDifferentiator entity 45584. The BankAccount entity 45574 is a GDT 45578 "BusinessTransactionDocumentBankAccount" 45580, and there is either zero or one 45576 BankAccount entity 45574 for each BankAccount package 45572. The BankAccountDifferentiator entity 45584 is a "BankAccountDifferentiator" 45590, and there is either zero or one 45586 BankAccountDifferentiator entity 45584 for each BankAccount package 45572. The BankAccountDifferentiator entity 45584 includes an ID 45594 at the fourth level. The ID 45594 is a GDT 45598 "BankAccountDifferentiatorID 45500A, and there is either zero or one 45596 ID 45594 for a BankAccountDifferentiator entity 45584.

The BankAccountBalance package 45504A includes a BankAccountBalance entity 45506A. The BankAccountBalance entity 45506A is a GDT 45510A "BankAccountBalance" 45512A, and there is zero to any number 45508A of BankAccountBalance entity 45506A in each BankAccountBalance package 45504A.

(7) Element Structure Bank Account Balance Report Query

The message data type element structure for the BankAccountBalanceReportQuery message is depicted in FIG. 456A-B. The element structure is similar to the data model, but provides additional information regarding the details of the interface. The element structure identifies the different packages 45600 in the interface, and represents the entities at various levels within the interface. As depicted in FIG. 456A, the interface for BankAccountBalanceReportQuery Message includes five levels 45602, 45604, 45606, 45608, and 45610. The outermost package of this interface is a BankAccountBalanceReportQuery package 45618, which includes a BankAccountBalanceReportQuery entity 45620 at the first level 45602. The BankAccountBalanceReportQuery entity 45620 is of a data type MDT 45622 "BankAccountBalanceReportQueryMessage" 45624. The BankAccountBalanceReportQuery message package 45618 includes a MessageHeader package 45628 and a BankAccountBalanceReportQuery 45650. The MessageHeader package 45628 includes a MessageHeader entity 45630. The MessageHeader entity 45630 is a GDT 45634 "BusinessDocumentMessageHeader" 45636, and there is either zero of one 45632 MessageHeader entity 45630 for each MessageHeader package 45628. The MessageHeader entity 45630 includes an ID 45640. The eID 45640 is a GDT 45644 "BusinessDocumentMessageID" 45644, and there is one ID 45640 for a MessageHeader entity 45630. The BankAccountBalanceReportQuery package 45650 includes a BankAccountBalanceReportQuery entity 45652 at the second level. The BankAccountBalanceReportQuery entity 45652 is a "BankAccountBalanceReportQuery" 45658, and there is one 45654 BankAccountBalanceReportQuery entity 45652 for each BankAccountBalanceReportQuery package 45650.

The BankAccountBalanceReportQuery Package 45650 includes a BankAccount package 45662 and an Item package 45694. The BankAccount package 45662 includes a BankAccount entity 45664 and a BankAccountDifferentiator entity 45674. The BankAccount entity 45664 is a GDT 45668 "BusinessTransactionDocumentbankAccount" 45670, and there is one BankAccount entity 45664 for each BankAccount package 45662. The BankAccountDifferentiator entity 45674 is a "BankAccountDifferentiator," and there is either zero or one 45676 BankAccountDifferentiator entity 45674 for each BankAccount package 45662. The BankAccountDifferentiator entity 45674 includes an ID 45684 at the fourth level. The ID 45684 is a GDT 45688 "BankAccountDifferentiatorID" 45690, and there is either zero or one 45686 ID 45684 for each BankAccountDifferentiator entity 45674.

The Item package 45694 includes an Item entity 45696. The Item entity 45696 is a "BankAccountBalanceReportQueryItem" 45602A, and there is from one to any number 45698 Item entity 45696 for each Item package 45694. The Item entity 45696 includes BankAccountBalanceTypeCode 45606A and DatePeriod 45616A at the fourth level. The BankAccountBalanceTypeCode 45606A is a GDT 45610A "BankAccountBalanceTypeCode" 45612A, and there is one 45608A BankAccountBalanceTypeCode 45606A for each Item entity 45696. The Date Period 45616A is a GDT 45620A "DatePeriod" 45622A, and there is one 45618A DatePeriod 45616A for an Item entity 45696.

ee) Bank Account Statement Notification

A BankAccountStatementNotification is used to transmit information about turnovers of a bank account in a B2B process. The account statement can serve as a legally binding notification instrument from the bank to its customers. In some situations, if the customer raises no objection to the settlement results listed within a certain period, the results of the settlement carried out by the bank can thereby be accepted by the customer.

Motivating business scenarios for the BankAccountStatementNotification interface include the Purchase2 Pay and Order2Cash business scenarios. In both scenarios, a bank processes payment orders and the resulting bookings are booked on the bank account of a corporate customer in an account management component.

The account management component generates account statements in order to report all the movements and the start and end balance of the bank account held by the corporate customer. The account statements are sent from the bank to the PaymentProcessing component of the corporate customer using the BankAccountStatementNotification interface.

In the In-House Cash scenario, the interface BankAccountStatementNotification is a shared service center scenario. The central payment service replaces the external banks in case of intra-group transactions or transactions with external business partners. In this case, the In-House Cash center acts as a virtual bank and creates bank account statements for the affiliated companies.

A message type BankAccountStatementNotification can be a notification about a bank account statement from the bank to the bank account holder. A BankAccountStatement can be a legally binding statement of a bank about turnovers on a customer's bank account. In variations, the structure of the message type BankStatementNotification is determined by the message data type BankAccountStatementMessage. In some implementations, the receiver of the BankAccountStatementNotification and the account holder may differ.

Methods and systems consistent with the subject matter described herein use the package template for a BusinessTransactionDocument for an SCM Master Data depicted in FIG. 270B to derive the BankAccountStatementNotification interface.

(1) Message Choreography

FIG. 457 depicts a message choreography that describes the logical sequence of messages that may be necessary to realize a scenario between five systems, including an HCM Payroll system 45700, a Payment system 45702 for the payment transaction initiator, a Bank system 45704 for the payment transaction initiator party, a Bank system 45706 for the payment transaction destinated party, and a Payment system 45708 for the payment transaction destinated party. The HCM Payroll system 45700 initiates a PaymentRequest message 45710 to the Payment system 45702. Upon receipt of the PaymentRequest message 45710, the Payment system 45702 transmits a PaymentAdviceNotification message 45712 to the Payment system 45708 to advise the payment destinated transaction party of the pending payment. The Payment system 45702 also transmits a CollectivePaymentOrderRequest message 45714 to the Bank system 45704 of the payment transaction initiator party. Upon receipt of the CollectivePaymentOrderRequest message 45714, the Bank system 45704 forwards an IntraBankPayReq notification 45716 to the Bank system 45706 for the payment transaction destinated party. Subsequently, the Bank system 45704 relays a Cash flow remittance 45718 to the Bank 45706. Optionally, upon receipt of the IntraBankPayReq notification 45716, the Bank system 45706 can initiate a cash flow directed debiting order 45720 to Bank system 45704 as an alternative form of payment to Bank system 45706. After Bank system 45704 has transmitted payment to Bank system 45706, Bank system 45704 sends BankAccountStatementNotification message 45722 to the Payment system 45702. Similarly, after Bank system 45706 has received payment from Bank system 45704, Bank system 45706 sends BankAccountStatementNotification message 45724 to the Payment system 45708.

The BankAccountStatementNotificationMessage encompasses two related interfaces: BankAccountStatementNotification_Out and BankAccountStatementNotification_In. The Interface BankAccountStatementNotification_Out is used to send a BankAccountStatementNotification message asynchronously from a bank or central payment service to the bank statement receiver. The Interface BankAccountStatementNotification_In is used to receive an asynchronous BankAccountStatementNotification message.

(2) Message Data Type Data Model

Figure 458A:
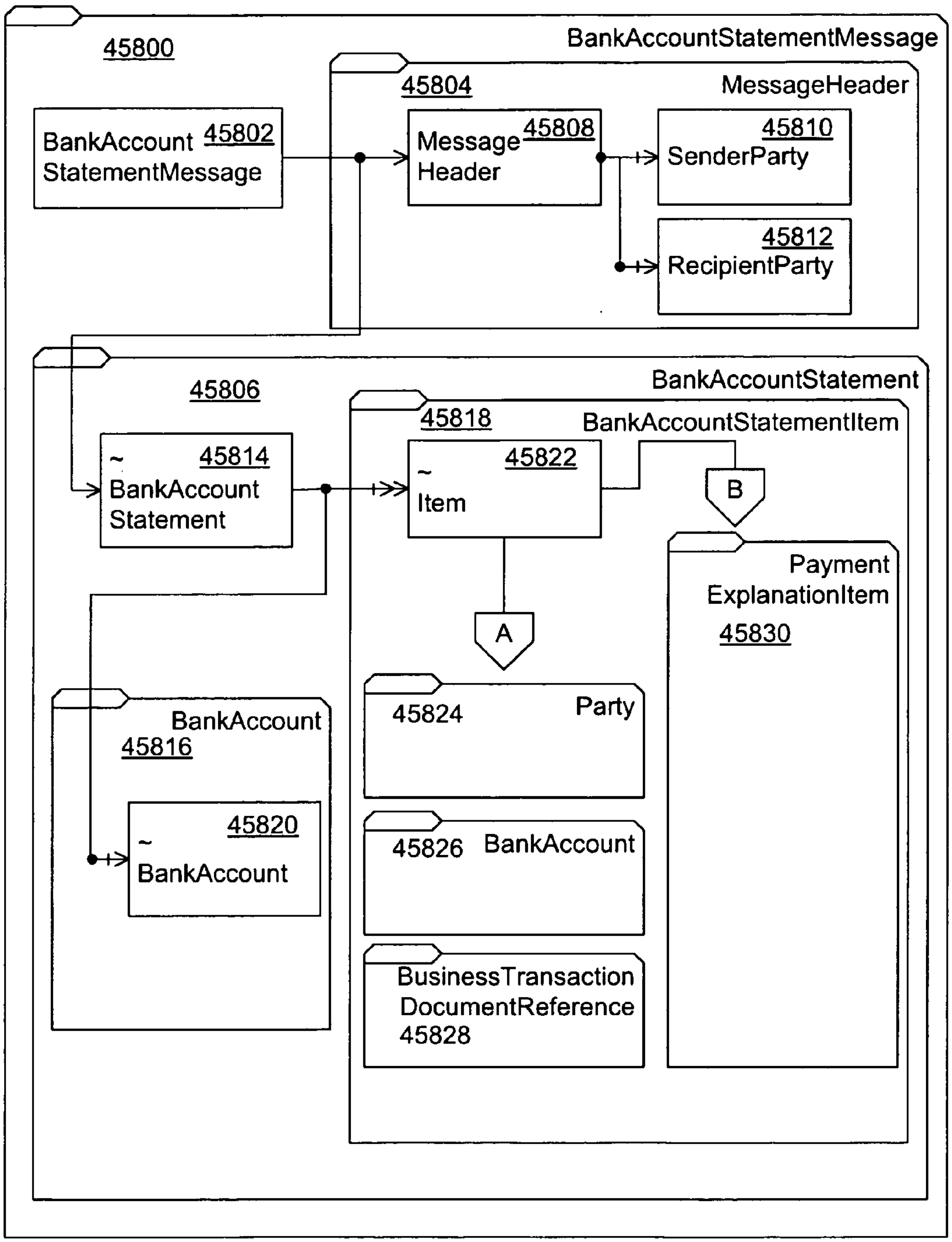

FIG. 458A depicts a data model for the BankAccountStatementNotificationMessage. The message data type BankAccountStatementNotificationMessage includes a bank account statement in a business document and business information that is relevant for sending a business document in a message.

The message data type BankAccountStatementNotificationMessage includes a BankAccountStatementMessage package 45800, which includes a BankAccountStatementMessage entity 45802. The BankAccountStatementMessage package 45800 also includes a MessageHeader package 45804 and a BankAccountStatement package 45806. The message data type BankAccountStatementMessage provides the structure for the message type BankAccountStatementNotification and the interfaces that are based on it.

There is a 1:c relationship between entities in this Interface unless otherwise noted herein or indicated in the Figures.

(a) Message Header Package

The MessageHeader package 45804 groups together the business information that is relevant for sending a business document in a message. The MessageHeader Package 45804 includes a MessageHeader entity 45808, which groups the business information from the viewpoint of the sending application to identify the business document in a message, information about the sender, and, optionally, information about the recipient. The MessageHeader entity 45808 may be divided up into a SenderParty 45810 and a RecipientParty 45812, and is of type GDT: BusinessDocumentMessageHeaderParty. The MessageHeader entity 45808 also includes an ID, which is the identification of the business document in the technical message, and a CreationDateTime, which is the creation date of the business document in the technical message. There is a 1:1 relationship between MessageHeader entity 45808 and BankAccountStatementMessage entity 45802.

A SenderParty entity 45810 is the party responsible for sending a business document at the business application level and is of type GDT: BusinessDocumentMessageHeaderParty.

A RecipientParty entity 45812 is the party responsible for receiving a business document at the business application level and is of type GDT: BusinessDocumentMessageHeaderParty.

(b) Bank Account Statement Package

The BankAccountStatement package 45806 groups the BankAccountStatement entity 45814 with its packages: a BankAccount package 45816 and a BankAccountStatementItem package 45818. There is a 1:1 relationship between the BankAccountStatement entity 45814 and the BankAccountStatementMessage entity 45802.

A BankAccountStatement can be a legally binding statement of a bank about turnovers on a customer's bank account. It includes turnovers (items) for a defined date period or the new turnovers since the previous BankAccountStatement was generated. Optionally, it additionally includes opening and closing balance information.

(i) Bank Account Statement

A BankAccountStatement entity 45814 includes header information and one or more items containing information concerning a single turnover. The BankAccountStatement entity 45814 includes the following elements: ID; Date; ValidityPeriod; OpeningBalanceAmount; ClosingBalanceAmount; TotalDebitAmount; TotalCreditAmount; and ItemTotalNumberValue.

The ID is a unique identifier for an account statement (statement number) that is created by the bank and is of type GDT: BusinessTransactionDocumentID. The Date is the date on which the statement was created and is of type GDT: Date. TheValidityPeriod is the validity period of the account statement and is of type GDT: DatePeriod. The OpeningBalanceAmount is an amount in the account before the first transaction reported that is equal to the ClosingBalanceAmount of the previous statement for this account and is of type GDT: Amount. The ClosingBalanceAmount is an amount in the account after the last transaction reported that is equal to the OpeningBalanceAmount of the next statement for this account and is of type GDT: Amount. The TotalDebitAmount is the total amount of debited items and is of type GDT: Amount. The TotalCreditAmount is the total amount of credited items and is of type GDT: Amount. The ItemTotalNumberValue is the total number of items of the actual bank statement and is of type GDT: TotalNumberValue.

In one implementation, the integrity includes the following attributes: An ID (statement number) must be a positive natural number. The ID must be continuous (i.e., without gaps) and unique within a calendar year. Finally, the numbering sequence should start with one (1). An OpeningBalanceAmount must be equal to a ClosingBalanceAmount of the previous statement for this account. A TotalDebitAmount, if used, must be equal to the total number of debit items reported in the respective bank statement. A TotalCreditAmount, if used, must be equal to the total number of credit items reported in the respective bank statement. An ItemTotalNumberValue, if used, must be equal to the total number of bank statement items for the respective bank statement.

(ii) Bank Account Package

The BankAccount package 45816 groups the information about the bank account that is reported in the subsequent BankAccountStatementItem. The BankAccount package 45816 includes a BankAccount entity 45820.

The BankAccount entity 45820 is the bank account whose activities are reported in this account statement, and is of type GDT: BusinessTransactionDocumentBankAccount. In one implementation, the BankAccount entity 45820 is mandatory.

(iii) Bank Account Statement Item Package

The BankAccountStatementItem package 45818 groups the information concerning a single turnover. It includes an Item entity 45822 with the following packages: a Party package 45824; a BankAccount package 45826; a BusinessTransactionDocumentReference package 45828, and optionally, a PaymentExplanationItem package 45830.

(a) Bank Account Statement Item

The BankAccountStatementItem entity 45822 is a single turnover (credit or debit) on the bank account. Optionally, items may be accompanied by payment explanation items. There is a 1:cn relationship between the BankAccountStatementItem entity 45822 and BankAccountStatement entity 45814. The BankAccountStatementItem includes the following elements: ID; PaymentTransactionTypeCode; PaymentTransactionTypeDescrption; BankValueDate; BankPostingDate; BankPostingTime; Amount; BankExchangeRate; BankChargeAmount; OriginalCurrencyAmount; OriginalBankChargeAmount; BankPaymentTransactionReferenceID; BankPrimaNotaNote; and Note.

The ID is a unique identifier for the item, which is preferably the item number that is created by the bank and is of type GDT: BusinessTransactionDocumentItemID. The PaymentTransactionTypeCode describes the type of the payment transaction that is reflected in this item and is of type GDT: PaymentTransactionTypeCode. The PaymentTransactionTypeDescription is a textual description of the payment transaction type and is of type GDT: Description. The BankValueDate is the date from which the bank transaction is reflected in the interest statement and is of type GDT: Date. The BankPostingDate is the bank's posting date for this item and is of type GDT: Date. The BankPostingTime is the bank's posting time for this item and is of type GDT: Time. The Amount is the amount of credit or debit in account currency and is of type GDT: Amount. The BankExchangeRate is the exchange rate applied by the bank in case the transaction currency differs from account currency and is of type GDT: ExchangeRate. The BankChargeAmount is the charge in account currency that the bank debited and deducted from the incoming payment added to the outgoing payment and is of type GDT: Amount. The OriginalCurrencyAmount is of original payment amount in original payment currency and is of type GDT: Amount. The OriginalBankChargeAmount is the charge deducted be the payment transaction initiator's house bank in original payment currency and is of type GDT: Amount. The BankPaymentTransactionReferenceID is the reference number created by the bank that identifies the payment transaction that is reflected in this item and is of type GDT: PaymentTransactionReferenceID. The BankPrimaNotaNote is the bank's daybook note that is used for organizational distinctions and is of type GDT: Note. The Note includes explanatory notes for the account holder and is of type GDT: Note.

(b) Party Package

Figure 458B:
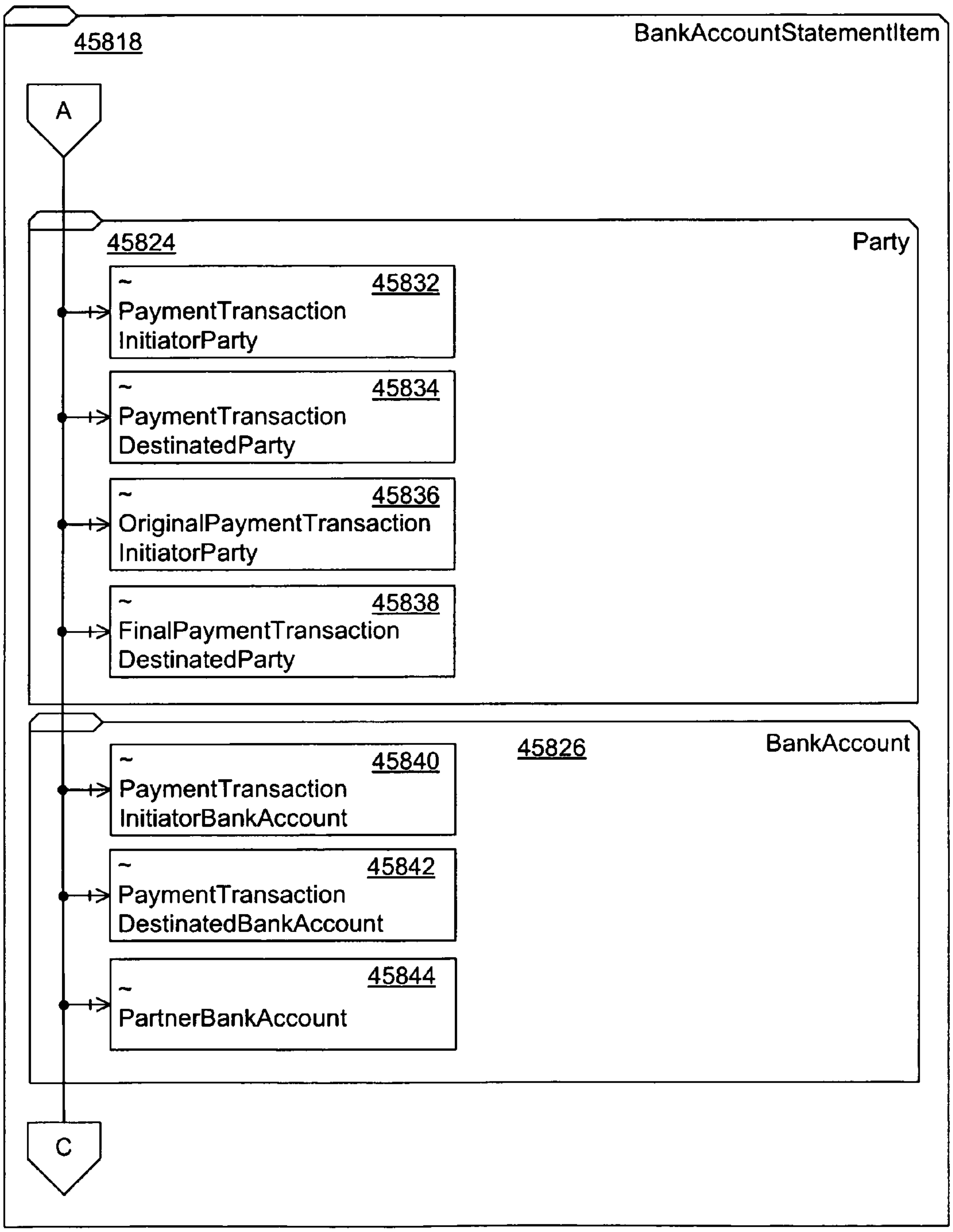
Figure 458C:
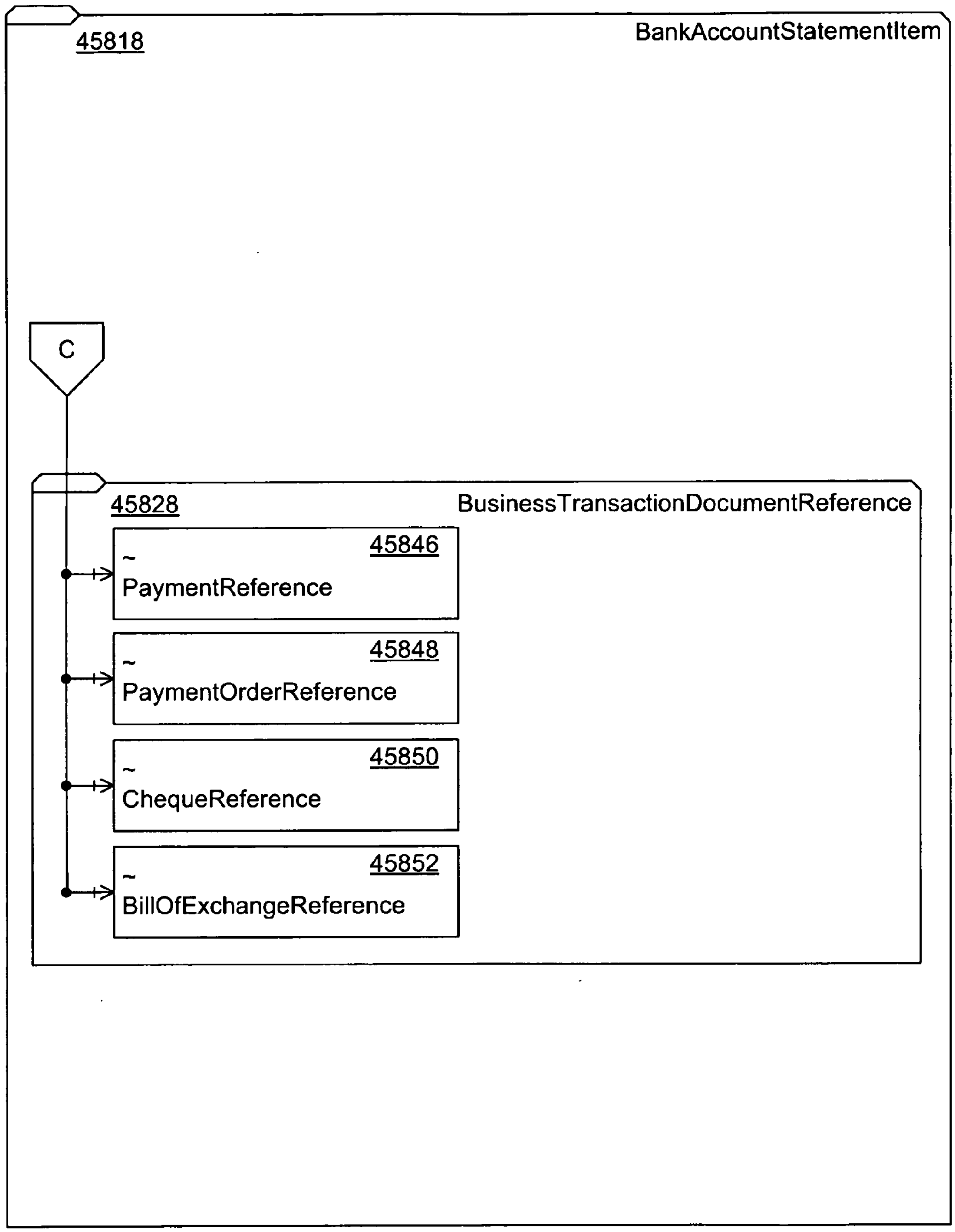
Figure 458D:
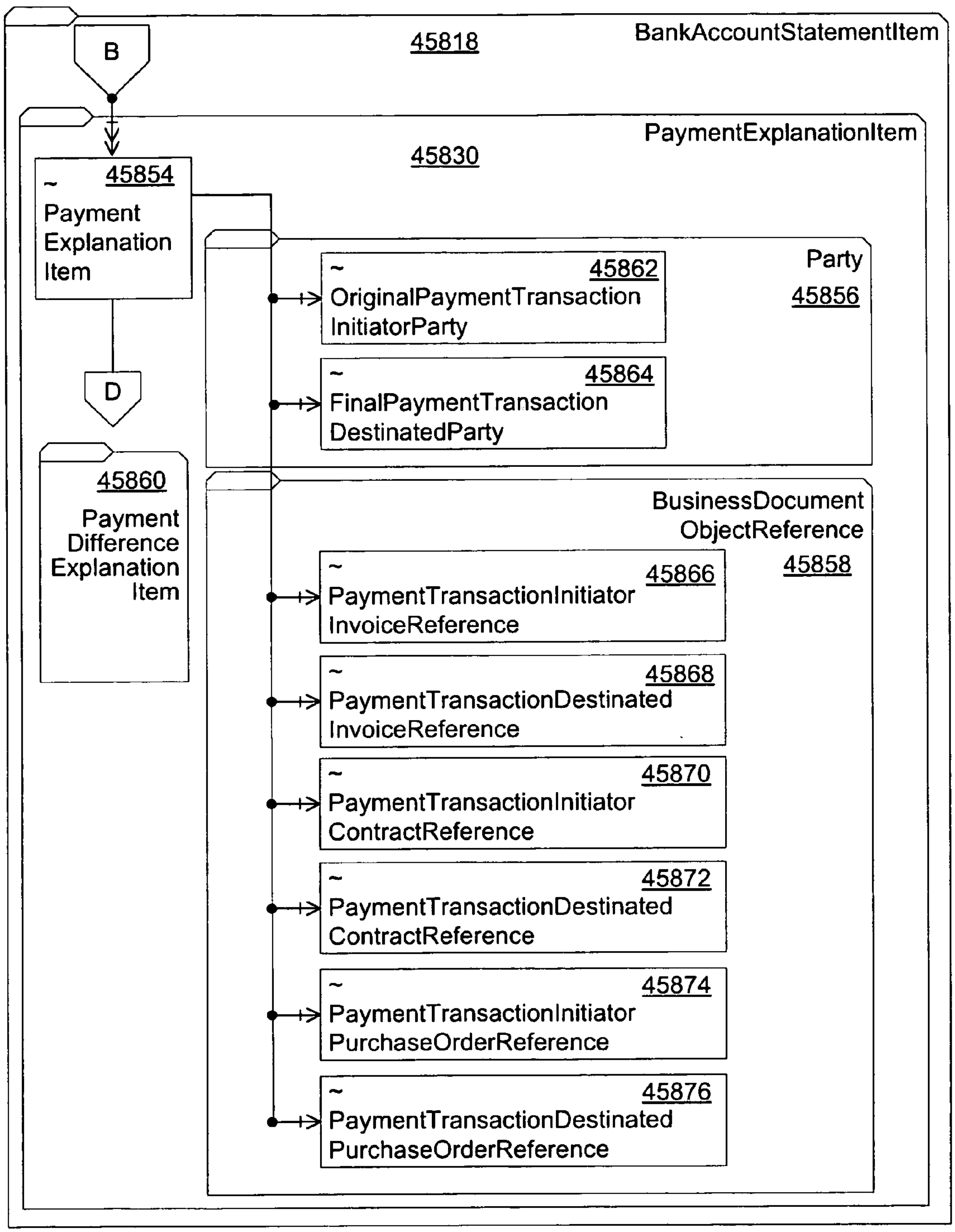
Figure 458E:
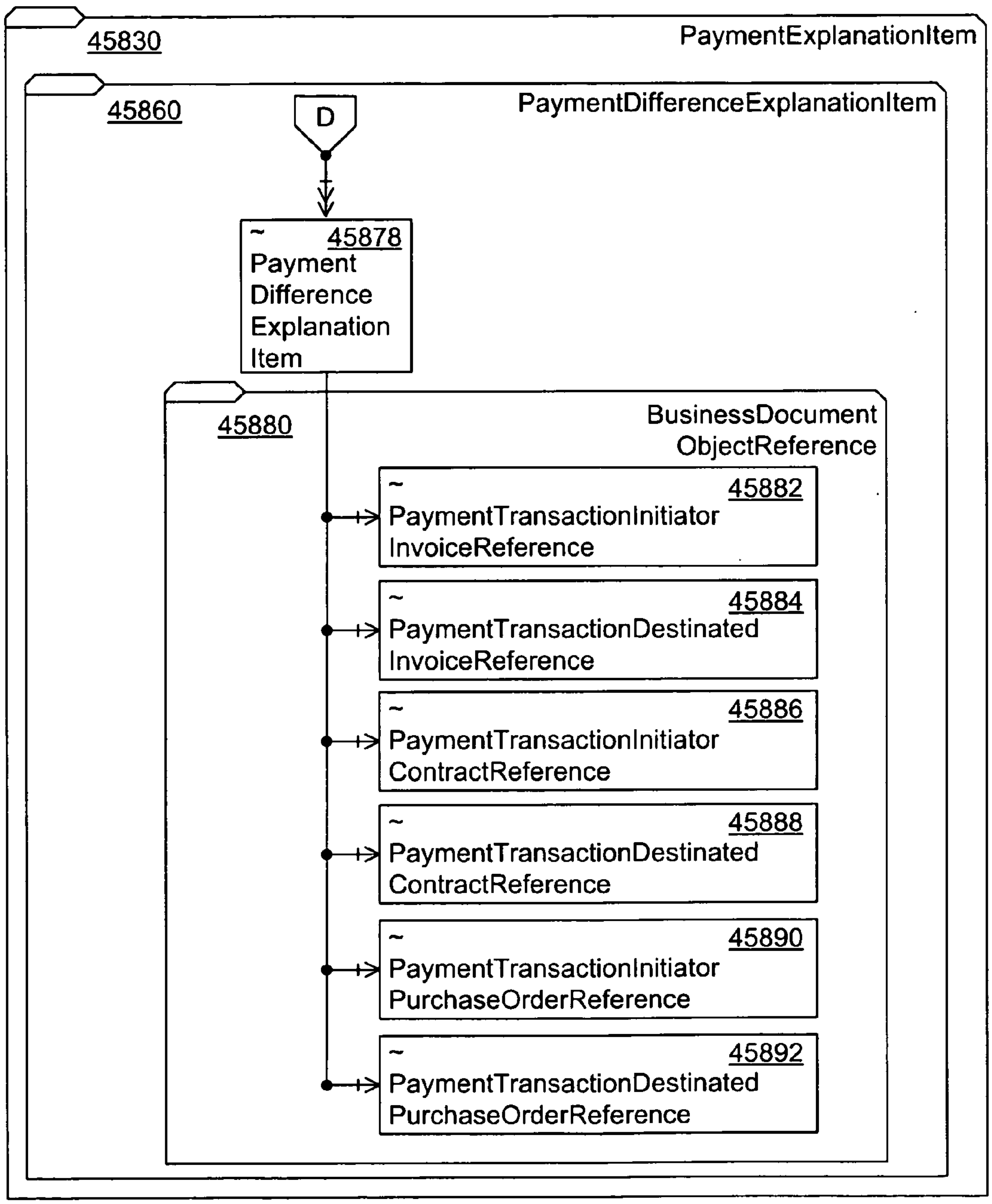

As shown in FIG. 458B, the Party package 45824 groups the information concerning the parties involved in the payment transaction. Party package 45824 includes the following entities: PaymentTransactionInitiatedParty entity 45832; PaymentTransactionDestinatedParty entity 45834; OriginalPaymentTransactionInitiatorParty 45836; and FinalPaymentTransactionDestinatedParty 45838.

A PaymentTransactionInitiatedParty entity 45832 is the party that initiated the payment (e.g., bank transfer or direct debit) and is of type GDT: BusinessTransactionDocumentParty. In one implementation, only the elements StandardID, PaymentInitiatorID, PaymentRecipientID, Address and ContactPerson are required. A PaymentTransactionInitiatedParty entity 45832 is optional.

A PaymentTransactionDestinatedParty 45834 is the party that receives the payment in case of a bank transfer or whose account is debted in case of a direct debit. The PaymentTransactionDestinatedParty 45834 is of type GDT: BusinessTransactionDocumentParty. In one implementation, only the elements StandardID, PaymentInitiatorID, PaymentRecipientID, Address and ContactPerson are required. The PaymentTransactionDestinatedParty entity 45834 is optional.

The payment transaction can optionally be executed by the PaymentTransactionInitiatorParty entity 45832 on behalf of an OriginalPaymentTransactionInitiatorParty 45836. The OriginalPaymentTransactionInitiatorParty entity 45836 is of type GDT: BusinessTransactionDocumentParty. In one implementation, only the elements StandardID, PaymentInitiatorID, PaymentRecipientID, Address and ContactPerson are required. The OriginalPaymentTransactionInitiatorParty 45836 is optional and should only be used in case the party is different from the PaymentTransactionInitiatorParty entity 45832.

The PaymentTransactionDestinatedParty entity 45834 optionally can receive a payment or be debited on behalf of a FinalPaymentTransactionDestinatedParty entity 45838. The FinalPaymentTransactionDestinatedParty entity 45838 is of type GDT BusinessTransactionDocumentParty. In one implementation, only the elements StandardID, PaymentInitiatorID, PaymentRecipientID, Address, and ContactPerson are required. The FinalPaymentTransactionDestinatedParty entity 45838 is optional and should only be supplied in case it is different from the PaymentTransactionDestinatedParty 45834.

(c) Bank Account Package

The BankAccount package 45826 groups the information concerning the bank details of the parties involved in case the item resulted from a payment transaction. The BankAccount package 45826 includes a PaymentTransactionInitiatorBankAccount entity 45840, a PaymentTransactionDestinatedBankAccount entity 45842, and a PartnerBankAccount entity 45844.

All BankAccounts are optional. In one implementation, only one BankAccount may be filled because the respective offsetting account is always the BankAccount entity 45820. If the bank is able to provide the information who initiated the payment, either PaymentTransactionInitiatorBankAccount entity 45840 or PaymentTransactionDestinatedBankAccount 45842 should be filled. In case the bank is unable to provide this information, PartnerBankAccount entity 45844 should be used instead.

The PaymentTransactionInitiatorBankAccount entity 45840 is the bank account of the PaymentTransactionInitiatorParty entity 45832 and is of type GDT: BusinessTransactionDocumentBankAccount.

The PaymentTransactionDestinatedBankAccount 45842 is the bank account of the PaymentTransactionDestinatedParty entity 45834, i.e., the party receiving the payment in case of a bank transfer or that is automatically debited in case of a direct debit. The PaymentTransactionDestinatedBankAccount 45842 is of type GDT: BusinessTransactionDocumentBankAccount.

The PartnerBankAccount entity 45844 is the bank account of the partner of a PaymentTransaction and is of type GDT: BusinessTransactionDocumentBankAccount. In one implementation, the PartnerBankAccount entity 45844 is filled in case the bank can not provide information about the payment transaction initiator.

(d) Business Transaction Document Reference Package

The Business Transaction Document Reference package 45828 groups references to business documents connected to the bank statement item (currently only a check number). The Business Transaction Document Reference package 45828 includes the PaymentReference entity 45846, the PaymentOrderReference entity 45848, the ChequeReference entity 45850, and the BillOfExchangeReference entity 45852. The BusinessTransactionDocumentReferences are optional.

The PaymentReference entity 45846 is a reference to the payment transaction initiator's payment document representing the actual payment and is of type GDT: BusinessTransactionDocumentReference. In one implementation, only the element ID is required. A payment document indicates a cash flow. The PaymentReference entity 45846 includes at least the payment procedure, the payment currency, the payment amount, the payment date, and the payment receiver. Optionally, the PaymentReference entity 45846 may include, in addition to other attributes, the parties involved and their respective bank details.

The PaymentOrderReference entity 45848 is a reference to the payment transaction initiators payment order that led to the payment transaction reflected in this account statement item. The PaymentOrderReference entity 45848 is of type GDT: BusinessTransactionDocumentReference. In one implementation, only the element ID is required. The payment order may be a single or collective payment order.

The ChequeReference entity 45850 includes the check number in case of check encashment and is of type GDT: BusinessTransactionDocumentReference. In one implementation, only the element ID is required.

The BillOfExchangeReference entity 45852 is the reference to the bill of exchange (bill of exchange number) that was used for the payment and is of type GDT: BusinessTransactionDocumentReference. In one implementation, only the element ID is required.

(e) Payment Explanation Item Package

The PaymentExplanationItem package 45830 groups the payment explanation items for the payment, in particular explaining the reason for the payment (e.g. by referring to one or more invoices), the payment amount (e.g. by giving the cash discount amounts) as well as, if necessary, the difference between the expected and the actual amount for the payment. The PaymentExplanationItem package 45830 includes a PaymentExplanationItem entity 45854 and the following packages: Party package 45856, BusinessDocumentObjectReference package 45858 and PaymentDifferenceExplanationItem package 45860.

(i) Payment Explanation Item

A PaymentExplanationItem entity 45854 provides an explanation of the payment amount for the payee and is of type GDT: PaymentExplanationItem. There is a 1:cn relationship between PaymentExplanationItem entity 45854 and BankAccountStatementItem entity 45822.

PaymentExplanationItem entity 45854 refers to one or more invoices or other business documents relevant for the payment amount, including adjustments applied by the payer. The PaymentExplanationItem entity 45854 may include information to identify the respective invoices or credit memos in the payee's financial accounting. Optionally, PaymentExplanationItem entity 45854 may provide additional information about potential differences between the invoice and the payment amount.

PaymentExplanationItem can be of type GDT: PaymentExplanationItem and contain an ID, OffsettingIndicator, BusinessTransactionDocumentDate, NetAmount, GrossAmount, TransactionCurrencyGrossAmount, CashDiscountAmount, TransactionCurrencyCashDiscountAmount, WithholdingTaxAmount, BankFeeAmount, ScandinavianPaymentReferenceID, SwissPaymentReferenceID, and Note.

In a PaymentExplanationItem entity with those items, the ID can be an identification of a PaymentExplanationItem in the context of a payment or payment advice, where the ID is a unique identification of a PaymentExplanationItem, when combined with a PaymentID or a PaymentAdviceID, and the ID can be of type GDT: BusinessTransactionDocumentID. The OffsettingIndicator can specify whether amounts contained in a given PaymentExplanationItem are offsett with amounts from other PaymentExplanationItems on the same level or whether these amounts are contained as a part in the TotalDebitAmount or TotalCreditAmount of the BankAccountStatementItem. The OffsettingIndicator can be of type GDT: Indicator. The BusinessTransactionDocumentDate can be a date of the business document related to the PaymentExplanationItem. The BusinessTransactionDocumentDate can be of type GDT: Date. The NetAmount can be a payed or transfered net amount of type GDT: Amount. The GrossAmount can be an amount as given by the business document related to the PaymentExplanation, for example the amount of an invoice or a loan contract, of type GDT: Amount. The TransactionCurrencyGrossAmount can be an amount of the business document in transaction currency and be of type GDT: Amount. The CashDiscountAmount can represent a deduced cash discount amount of type GDT: Amount. The TransactionCurrencyCashDiscountAmount can represent an amount of cash discount in transaction currency and be of type GDT: Amount. The WithholdingTaxAmount can represent deduced withholding tax and be of type GDT: Amount. The BankFeeAmount can represent a deduced bank fee and be of type GDT: Amount. The ScandinavianPaymentReferenceID can be a reference to a payment as used in Scandinavian countries (so-called KIDNO) and be of type GDT: ID. The SwissPaymentReferenceID can be a reference to a payment as used in Switzerland (so-called ESR) and be of type GDT: ID. The Note can be natural-language text that explains the payment and deduced amounts and be of type GDT: Note.

In variations, PaymentExplanationItem entity 45854 must not be filled for self-initiated items.

(ii) Payment Explanation Item Party Package

A PaymentExplanationItemParty package 45856 groups the information concerning the parties related to the explanation of a payment in a BankAccountStatement. The PaymentExplanationItemParty package 45856 includes an OriginalPaymentTransactionInitiatorParty entity 45862 and a FinalPaymentTransactionDestinatedParty entity 45864. The parties contained in PaymentExplanationItemParty package 45856 can differ from the respective parties of the BankAccountStatementItemParty package 45824.

The function and structure of OriginalPaymentTransactionInitiatorParty entity 45862 and a FinalPaymentTransactionDestinatedParty entity 45864 of PaymentExplanationItemParty package 45856 is similar to the function and structure of OriginalPaymentTransactionInitiatorParty entity 45836 and a FinalPaymentTransactionDestinatedParty entity 45838 of BankAccountStatementItemParty package 45824, respectively.

(iii) Payment Explanation Business Document Object Reference Package

A PaymentExplanationBusinessDocumentObjectReference package 45858 groups references to business documents related to invoice information, contract information, and purchase order information between the PaymentTransactionInitiatorParty entity 45862 and the PaymentTransactionDestinatedParty entity 45864. A PaymentExplanationItemBusinessDocumentObjectReference package 45858 includes a PaymentTransactionInitiatorInvoiceReference entity 45866; a PaymentTransactionDestinatedInvoiceReference entity 45868; a PaymentTransactionInitiatorContractReference entity 45870; a PaymentTransactionDestinatedContractReference entity 45872; a PaymentTransactionIntitiatorPurchaseOrderReferenc entity 45874; and a PaymentTranactionDestinatedPurchaseOrderReference entity 45876.

The PaymentTransactionInitiatorInvoiceReference 45866 is a reference to an invoice of the PaymentTransactionInitiatorParty 45862. The PaymentTransactionInitiatorInvoiceReference is of type GDT: BusinessTransactionDocumentReference, where only the element ID is used.

The PaymentTransactionDestinatedInvoiceReference 45868 is a reference to an invoice of the PaymentTransactionDestinatedParty 45864. The PaymentTransactionDestinatedInvoiceReference 45868 is of type GDT: BusinessTransactionDocumentReference, where only the element ID is used.

The PaymentTransactionInitiatorContractReference 45870 is a reference to a contract of the PaymentTransactionInitiatorParty 45862. The PaymentTransactionInitiatorContractReference 45870 is of type GDT: BusinessTransactionDocumentReference, where only the element ID is used.

The PaymentTransactionDestinatedContractReference 45872 is a reference to a contract of the PaymentTransactionDestinatedParty 45864. The PaymentTransactionDestinatedContractReference is of type GDT: BusinessTransactionDocumentReference, where only the element ID is used.

The PaymentTransactionInitiatorPurchaseOrderReference 45874 is a reference to a PurchaseOrder of the PaymentTransactionInitiatorParty. The PaymentTransactionInitiatorPurchaseOrderReference 45874 is of type GDT :BusinessTransactionDocumentReference, where only the element ID is used.

The PaymentTransactionDestinatedPurchaseOrderReference 45876 is a reference to a PurchaseOrder of the PaymentTransactionDestinatedParty 45834. The PaymentTransactionDestinatedInvoiceReference is of type GDT: BusinessTransactionDocumentReference, where only the element ID is used.

(iv) Payment Difference Explanation Item Package

A PaymentDifferenceExplanationItem package 45860 provides information, if necessary, to explain the difference between the expected and the actual amount for the payment. The PaymentDifferenceExplanationItem package 45860 includes a PaymentDifferenceExplanation entity 45878 and a BusinessDocumentObjectReference package 45880.

There is a 1:cn relationship between the PaymentDifferenceExplanation entity 45878 and PaymentExplanationItem entity 45854. The PaymentDifferenceExplanationItem entity is an explanation of the difference between the expected and the actual amount of a payment. PaymentDifferenceExplanationItem is of type GDT: PaymentDifferenceExplanationItem and contains the elements OffsettingIndicator, Amount, and PaymentDifferenceReasonCode.

OffsettingIndicator can specify whether the amounts contained in the given PaymentExplanationItem are offsetted with amounts from other PaymentExplanationItems on the same level or whether these amounts are contained as a part in another amount on this level and is of type GDT: Indicator. Amount can be an amount of the adjustment of a payment (in currency of the payment) and is of type GDT: Amount. PaymentDifferenceReasonCode can be a coded representation of the reason for a payment difference and be of type GDT: PaymentDifferenceReasonCode.

The BusinessDocumentObjectReference package 45880 groups references to business documents related to invoice information, contract information, and purchase order information between the PaymentTransactionInitiatorParty entity 45862 and the PaymentTransactionDestinatedParty entity 45864 as necessary to explain the difference between the expected and the actual amount for the payment.

A BusinessDocumentObjectReference package 45880 can include a PaymentTransactionInitiatorInvoiceReference entity 45882; a PaymentTransactionDestinatedInvoiceReference entity 45884; a PaymentTransactionInitiatorContractReference entity 45886; a PaymentTransactionDestinatedContractReference entity 45888; a PaymentTransactionInitiatorPurchaseOrderReferenc entity 45890; and a PaymentTranactionDestinatedPurchaseOrderReference entity 45892.

The PaymentTransactionInitiatorInvoiceReference 45882 is a reference to an invoice of the PaymentTransactionInitiatorParty 45882. The PaymentTransactionInitiatorInvoiceReference is of type GDT: BusinessTransactionDocumentReference, where only the element ID is used.

The PaymentTransactionDestinatedInvoiceReference 45884 is a reference to an invoice of the PaymentTransactionDestinatedParty 45864. The PaymentTransactionDestinatedInvoiceReference 45884 is of type GDT: BusinessTransactionDocumentReference, where only the element ID is used.

The PaymentTransactionInitiatorContractReference 45886 is a reference to a contract of the PaymentTransactionInitiatorParty 45862. The PaymentTransactionInitiatorContractReference 45886 is of type GDT: BusinessTransactionDocumentReference, where only the element ID is used.

The PaymentTransactionDestinatedContractReference 45888 is a reference to a contract of the PaymentTransactionDestinatedParty 45864. The PaymentTransactionDestinatedContractReference 45888 is of type GDT: BusinessTransactionDocumentReference, where only the element ID is used.

The PaymentTransactionInitiatorPurchaseOrderReference 45890 is a reference to a PurchaseOrder of the PaymentTransactionInitiatorParty. The PaymentTransactionInitiatorPurchaseOrderReference 45890 is of type GDT :BusinessTransactionDocumentReference, where only the element ID is used.

The PaymentTransactionDestinatedPurchaseOrderReference 45892 is a reference to a PurchaseOrder of the PaymentTransactionDestinatedParty 45834. The PaymentTransactionDestinatedInvoiceReference 45892 is of type GDT: BusinessTransactionDocumentReference, where only the element ID is used.

(3) Element Structure of Bank Account Statement Notification Message

The message data type element structure for the BankAccountStatementNotification message is depicted in FIG. 459A-I. The element structure is similar to the data model, but provides additional information regarding the details of the interface. The element structure identifies the different packages 45900 in the interface, and represents the entities at various levels within the interface. As depicted in FIG. 459A, the interface for BankAccountStatementNotification Message includes four levels 45902, 45904, 45906 and 45908. The outermost package of this interface is a BankAccountStatementMessage package 45914, which includes a BankAccountStatementMessage entity 45916 at the first level 45902. The BankAccountStatementMessage entity 45916 is of a data type MDT 45918 "BankAccountStatementMessage" 45920.

The BankAccountStatementMessage package 45924 includes a MessageHeader package 45922 and a BankAccountStatement package 45924. The MessageHeader package 45922 includes a MessageHeader entity 45926 at the second level 45904. The MessageHeader entity 45926 is of a data type GDT 45916 "MessageHeader" 45932, and there is one 45930 MessageHeader entity 45926 for each BankAccountStatement package 45924.

The MessageHeader entity 45926 includes an ID 45934, a CreationDateTime 45942, a SenderParty 45950, and a ReceiverParty 45958 at the third level 45906. The ID 45934 is of a type GDT 45916 "BusinessDocumentMessageID" 45940, and there is one 45936 ID 45934 for a MessageHeader entity 45926. The CreationDateTime 45942 is of a type GDT 45946 "DateTime" 45948, and there is one 45944 CreationDateTime 45942 for a MessageHeader entity 45926. The SenderParty 45950 is of a type GDT 45916 "BusinessDocumentMessageHeaderParty" 45956, and there is zero or one 45952 MessageHeader entity 45926 for a SenderParty 45950. The ReceiverParty 45958 is of a type GDT 45916 "BusinessDocumentMessageHeaderParty" 45964, and there is any number 45960 of MessageHeader entity 45926 for a ReceiverParty 45958.

The SenderParty45976 includes an InternalID 45986 and a StandardID 45994 at the fourth level 45908. The InternalID 45986 is of a type G/CDT 45916 "PartyInternalID" 45990, and there is zero or one 45988 InternalID 45986 for a SenderParty 45976. The StandardID 45994 is of a type G/CDT 45916 "PartyStandardID" 45998, and there is any number 45996 of StandardID 45994 for a SenderParty 45976.

The BankAccount entity 45924 is of a data type AGDT 45916 "BankAccountStatement" 45972, and there is one 45968 BankAccount entity 45924 for each BankAccountStatement package 45966.

As depicted in FIG. 459B, the BankAccountStatement entity 45966 includes an ID 45974, a Date 45982, a ValidityPeriod 45990, an OpeningBalanceAmount 45998, a ClosingBalanceAmount 45908A, a TotalDebitAmount 45916A, a TotalCreditAmount 24A, and an ItemTotalNumberValue 32A at the fourth level 45908. The ID is of a type GDT 45978 "BusinessTransactionDocumentID" 45980, and there is one 45976 ID 45974 for a BankAccountStatement entity 45966. The Date 45982 is of a type GDT 45986 "Date" 45988, and there is one 45984 Date 45942 for a BankAccountStatement entity 45966. The Validity Period 45990 is of a type GDT 45994 "DatePeriod" 45996, and there is zero or one 45992 of ValidityPeriod 45990 for a BankAccountStatement entity 45966. The OpeningBalanceAmount 45998 is of a type GDT 45904A "Amount" 45906A, and there is zero or one 45902A of OpeningBalanceAmount 45998 for a BankAccountStatement entity 45966.

As depicted in FIG. 459C, the ClosingBalanceAmount 45908A is of a type GDT 45912A "Amount" 45914A, and there is zero or one 45910A BankAccountStatement entity 45966 for each ClosingBalanceAmount package 45908A. The TotalDebitAmount entity 45916A is of a type GDT

45920A "Amount" 45922AA, and there is zero or one 45918A BankAccountStatement entity 45966 for each TotalDebitAmount entity 45916A. The TotalCreditAmount 45924A is of a type GDT 45928A "Amount" 45930A, and there is zero or one 45926A of TotalCreditAmount 45924A for a BankAccountStatement entity 45966. The ItemTotalNumberValue 45932A is of a type GDT 45936A "TotalNumberValue" 45938A, and there is zero or one 45934A BankAccountStatement entity 45966 for each ItemTotalNumberValue package 45932A.

As depicted in FIG. 459D, the BankAccountStatementMessage package 45924 includes a BankAccount package 45940A. The BankAccount package 45940A is of a type GDT 45946A "BusinessTransactionDocumentBankAccount" 45948A, and there is one 45944A of BankAccountStatement entity 45966 for each BankAccount 45942A.

The BankAccountStatementMessage package 45924 also includes an Item package 45970A. The Item package 45970A is of type AGDT 45976A "BankAccountStatementItem" 45978A, and there is any number 45974A of BankAccountStatement entity 45966 for each Item 45970A.

The BankAccountStatementMessage package 45924 also includes a Party package 45980A. The Party package 45980A includes an ID 45982A, a PaymentTranactionTypeCode 45990B, a PaymentTranactionTypeDescription 45998B, a ValueDate 45908B, a PostingDateTime 45916B, a PstingDate 45924B, an Amount 45932B, an Exchange Rate 45940B, a BankChargeAmount 45948B, an OriginalCurrencyAmount 45956B, an OriginalBankChargeAmount 45964B, a BankPaymentTransactionReferenceID 45972B, a BankPrimaNotaNote 45980B, a Note 45988B, a PaymentTransactionalnitiatorPart 45996B, a PaymentTransactionDestinatedParty 45906C, an OriginalPaymentTranactionInitiatorParty 45914C and a FinalPaymentTransactionDestinatedParty 45922C shown at the fourth level 45908.

As depicted in FIG. 459D, the ID 45982A is of type GDT 45986A "BusinessTransactionDocumentItemID" 45988A, and there is zero or one 45984A of PartyPackage entity 45980A for each ID 45982A. The PaymentTranactionTypeCode 45990B is of type GDT 45994A "Payment Transaction TypeCode" 45996A, and there is zero or one 45992A of PartyPackage entity 45980A for each PaymentTransactionTypeCode 45990A. The PaymentTransactionTypeDescription 45998B is of type GDT 45904B "Description" 45906B, and there is zero or one 45902B of PartyPackage entity 45980A for each PaymentTransactionDescription 45998A. The ValueDate 45908B is of type GDT 45912B "Date" 45914B, and there is zero or one 45910B of PartyPackage entity 45980A for each ValueDate 45908B. The PostingDateTime 45916B is of type GDT 45920B "DateTime" 45922B, and there is zero or one 45918B of PartyPackage entity 45980A for each PostingDateTime 45916B.

As depicted in FIG. 459E, the PostingDate 45924B is of type GDT 45928B "Date" 45930B, and there is zero or one 45926B of PartyPackage entity 45980A for each PostingDate 45924B. The Amount 45932B is of type GDT 45936B "Amount" 45938B, and there is one 45934B of PartyPackage entity 45980A for each Amount 45932B. The Exchange Rate 45940B is of type GDT 45944B "ExchangeRate" 45946B, and there is zero or one 45942B of PartyPackage entity 45980A for each ExchangeRate 45940B. The BankChargeAmount 45948B is of type GDT 45952B "Amount" 45954B, and there is zero or one 45950B of PartyPackage entity 45980A for each BankChargeAmount 45948B.

The OriginalCurrencyAmount 45956B is of type GDT 45960B "Amount" 45962B, and there is zero or one 45958B of PartyPackage entity 45980A for each OriginalCurrencyAmount 45956B.

As depicted in FIG. 459F, the OriginalBankChargeAmount 45964B is of type GDT 45968B "Amount" 45970B, and there is zero or one 45966B of PartyPackage entity 45980A for each OriginalBankChargeAmount 45964B. The BankPaymentTransactionReferenceID 45972B is of type GDT 45976B "PaymentTransactionReferenceID" 45978B, and there is zero or one 45974B of PartyPackage entity 45980A for each BankPaymentTransactionReferenceID 45972B. The BankPrimaNotaNote 45980B is of type GDT 45984B "Note" 45986B, and there is zero or one 45982B of PartyPackage entity 45980A for each BankPrimaNotaNote 45980B. The Note 45988B is of type GDT 45992B "Note" 45994B, and there is any number 45984A of PartyPackage entity 45980A for each Note 45988B. The PaymentTransactionalInitiatorPart 45996B is of type GDT 45902C "BusinessTransactionDocumentParty" 45904C, and there is zero or one 45998B of PartyPackage entity 45980A for each PaymentTrnsactionInitiatorPart 45996B.

As depicted in FIG. 459G, the PaymentTransactionDestinatedParty 45906C is of type GDT 45910C "BusinessTransactionDocumentParty" 45912C, and there is zero or one 45908C of PartyPackage entity 45980A for each PaymentTransactionDestinatedParty 45906C. The OriginalPaymentTransactionInitiatorParty 45914C is of type GDT 45918C "BusinessTransactionDocumentParty" 45920C, and there is zero or one 45916C of PartyPackage entity 45980A for each OriginalPaymentTransactionInitatorParty 45914C. The FinalPaymentTransactionDestinatedParty 45922C is of type GDT 45926C "BusinessTransactionDocumentParty" 45928C, and there is zero or one 45924C of PartyPackage entity 45980A for each FinalPaymentTransactionDestinatedParty 45928C.

As depicted in FIG. 459H, the Item package 45970A includes a BankAccount package 45930C. The BankAccount package 45930C includes a PaymentTransactionInitiatorBankAccount entity 45932C, a PaymentTransactionDestinatedBankAccountEntity 45940C, and a PartnerBankAccount entity 45948C. The PaymentTransactionInitiatorBankAccount 45932C is a data type GDT 45936C "BusinessTransactionDocumentBankAccount" 45938C, and there is zero or one 45934C of Item entity 45970A for each PaymentTransacfionInitiatorBankAccount 45932C. The PaymentTransactionDestinatedBankAccount 45940C is a data type GDT 45944C "BusinessTransactionDocumentBankAccount" 45946C, and there is zero or one 45942C of Item entity 45970A for each PaymentTransactionDestinatedBankAccount 45940C. The PartnerBankAccount 45948C is a data type GDT 45952C "BusinessTransactionDocumentBankAccount" 45954C, and there is zero or one 45950C of Item entity 45970A for each PartnerBankAccount 45948C.

The Item package 45970A also includes a BusinessTransactionDocumentReference package 45956C. The BusinessTransactionDocumentReference package 45958C includes a PaymentReference entity 45958C, a PaymentOrderReference entity 45966C, a ChequeReference entity 45974C, a BillofExchangeReference entity 45982C and a PaymentExplanationItem entity 45990C.

The PaymentReference 45958C is a data type GDT 45962C "BusinessTransactionDocumentReference" 45964C, and there is zero or one 45960C of Item entity 45970A for each PaymentReference 45958C.

As depicted in FIG. 4591, the PaymentOrderReference 45966C is a data type GDT 45970C "BusinessTransactionDocumentReference" 45972C, and there is zero or one 45968C of Item entity 45970A for each PaymentOrderReference 45966C.

The ChequeReference 45974C is a data type GDT 45978C "BusinessTransactionDocumentReference" 45980C, and there is zero or one 45976C of Item entity 45970A for each ChequeReference 45974C.

The BillofExchangeReference 45982C is a data type GDT 45986C "BusinessTransactionDocumentReference" 45988C, and there is zero or one 45984C of Item entity 45970A for each BillofExchangeReference 45982C.

The PaymentExplanationItem 45990C is a data type GDT 45994C "PaymentExplanationItem" 45996C, and there is zero or one 45992C of Item entity 45970A for each PaymentExplanationItem 45990C.

ff) Business Transaction Document Image Recognition Request

A BusinessTransactionDocumentImageRecognitionRequest is an interface that can be used to record data of a business document from an image template. The image template can be recognized either manually or via Optical Character Recognition (OCR) software.

Companies can create invoices in paper form. The paper documents can be sent to the appropriate invoice recipients by various means (fax, e-mail, post, etc.). These incoming invoices may be stored in digital form once they are received. An invoice can be recorded manually using the digitalized image. To ease recording of data in an invoice, automatic entry using OCR software may be implemented.

If OCR software is used, the software can receive messages of a type BusinessTransactionDocumentImageRecognitionRequest. The OCR software can carry out image recognition and can also structure the data. If a received document is an invoice, for example, a message of type InvoiceRequest can be generated and this can be sent to another application for further processing.

The BusinessTransactionDocumentImageRecognitionRequest interface can also be used to transfer digitalized invoice documents as images for data entry to a system.

(1) Message Type

A message type BusinessTransactionDocumentImageRecognitionRequest can be a request to record business document data either manually or automatically from an image, for example, a digital image.

Methods and systems consistent with the subject matter described herein use the package template for a BusinessTransactionDocument for an SCM Master Data depicted in FIG. 270B to derive the BusinessTransactionDocumentImageRecognitionRequest interface.

(2) Message Choreography

FIG. 460 depicts a message choreography that describes the logical sequence of messages in a scenario between two systems: an Image Recognition Initiator 46000 and an Image Recognition Executor 46002. The Image Recognition Initiator 46000 can record and digitalize the image of a business document to be recognized and trigger image recognition. To trigger image recognition, the Image Recognition Initiator 46000 can generate a BusinessTransactionDocumentImageRecognitionRequest message 46004, which can be accepted by an Image Recognition Executor 46002, charged with recognizing the image. The results of the Image Recognition Executor 46002 can be the recognition of an image. These results may not be relevant for the image-recognition-triggering Image Recognition Initiator 46000.

The Image Recognition Executor 46002 charged with recognizing the image can accept the information from the BusinessTransactionDocumentImageRecognitionRequest message 46004. Based on this information, image recognition can be carried out; and based on the result of the image recognition, a business document can be created. The Image Recognition Executor 46002 can be an application system where a person performs the image recognition manually or a system with OCR software.

(3) Message Data Type Data Model

FIG. 461 depicts a data model for the BusinessTransactionDocumentImageRecognitionRequest. The BusinessTransactionDocumentImageRecognitionRequest message data type includes the BusinessTransactionDocumentImageRecognition object contained in a business document.

The BusinessTransactionDocumentImageRecognitionRequest package 46100 includes a BusinessTransactionDocumentImageRecognitionRequestMessage entity 46102 and a BusinessTransactionDocumentImageRecognition package 46104. The message data type BusinessTransactionDocumentImageRecognitionRequestMessage entity 46102 provides the structure for the message type BusinessTransactionDocumentImageRecognitionRequest and the interfaces that are based on it.

(a) Business Transaction Document Image Recognition package

The BusinessTransactionDocumentImageRecognition package 46104 groups the Business Transaction Document Image with its packages. It can contain an Attachment package 46106 and a BusinessTransactionDocumentImageRecognitionRequest entity 46108. There is a 1:1 relationship between the BusinessTransactionDocumentImageRecognitionRequestMessage entity 46102 and the Business Transaction Document Image Recognition Request entity 46108.

(i) Business Transaction Document Image Recognition

The Business Transaction Document Image Recognition entitiy includes information related to a recording of business document data from either manual or automatic recognition from a delivered digital image. The Business Transaction Document Image Recognition entity contains details on a document type to be generated (after recognition) and an attachment with the business information, and can contain a contact person. A BusinessTransactionDocumentTypeCode is a coded representation of the type of business document and is of the type, GDT: BusinessTransactionDocumentTypeCode.

(ii) Attachment Package

The Attachment package 46106 is the grouping of all attachment information with reference to the business document to be generated. It can include an Attachment entity 46110. A BusinessTransactionDocumentImageAttachment entity 46110 includes an attachment containing the digitalized image information of a business document (e.g., a scanned invoice) and can be of the type GDT: Attachment.

(4) Element Structure of Business Transaction Document Image Recognition Request Message The message data type element structure for the business transaction document image recognition request message is depicted in FIG. 462. The element structure is similar to the data model, but provides additional information regarding the details of the interface. The element structure identifies the different packages 46200 in the interface, and represents the entities at various levels within the interface. The interface for business transaction document image recognition request message includes four levels 46202, 46204, 46206 and 46208. The outermost package of this interface is a BusinessTransactionDocumentImageRecognitionRequest Message package 46214, which includes a BusinessTransactionDocumentImageRecogntionRequest entity 46216 at the first level 46202. The BusinessTransactionDocumentImageRecognitionRequest entity 46216 is of a data type MDT 46218 "BusinessTransactionDocumentImageRecognitionRequestMessage" 46220.

A BusinessTransactionDocumentImageRecognition 46222 includes a BusinessTransactionDocumentImageRecognition entity 46224. The BusinessTransactionDocumentImageRecognition entity 46224 has one 46226 BusinessTransactionDocumentImageRecognition entity 46224 for a BusinessTransactionDocumentImageRecognition package 46222. The data type name 46212 is BusinessTransactionDecoumentImageRecognition 46236.

The BusinessTransactionDocumentImageRecognition 46222 also includes a BusinessTransactionDocumentTypeCode 46230. The BusinessTransactionDocumentTypeCode 46230 is of type GDT 46234 "BusinessTransactionDocumentTypeCode" 46236, and there may be one 46232 BusinessTransactionDocumentTypeCode entity 46230 for a BusinessTransactionDocumentTypeCode 46230.

An Attachment package 46238 inlcudes an Attachment entity 46240. The Attachment entity is of type GDT 46244 "Attachment" 46246, and there may be any number of Attachment entities 46246 for an Attachment 46238 package.

gg) CollectivePaymentOrderRequest Interface

The CollectivePaymentOrderRequest interface is used to transmit payment orders (e.g., payment or direct debit) in a B2B process. Motivating business scenarios for the CollectivePaymentOrderRequest interface include the Purchase2 Pay and Order2Cash business scenarios. In variations of those scenarios, a CollectivePaymentOrderRequest message can be sent from the PaymentProcessing component of the payment transaction initiator system (e.g., a corporate ERP system) to the bank of the payment transaction destinated party. The destinated party system (e.g., the bank) can process the CollectivePaymentOrderRequest and resulting bookings can be booked on the bank account of a corporate customer in an account management component of the bank. The account management component can generate account statements (BankAccountStatementNotification) to report all the movements and the start and end balance of the bank account held by the payment transaction initiator system (e.g., a corporate ERP system).

In an In-House Cash scenario, the interface CollectivePaymentOrderRequest can be used by a shared service center version of the above-mentioned business scenarios. In that scenario, central payment services can replace external banks in intra-group payment transactions.

(1) Message Type (a) CollectivePaymentOrderRequest

A CollectivePaymentOrderRequest is a request with instructions to a bank to carry out one or more payment transactions (e.g., bank transfer or direct debit). The structure of the message type CollectivePaymentOrderRequest is provided by the CollectivePaymentOrderMessage data type. The payment transaction initiator's bank account can be debited or credited, depending on the type of the payment (e.g. direct debit, bank transfer, etc.).

Methods and systems consistent with the subject matter disclosed herein use the package template for a BusinessTransactionDocument for an SCM Master Data depicted in FIG. 270B to derive the CollectivePaymentOrderRequest interface.

(2) Message Choreography

FIG. 463 depicts a message choreography for CollectivePaymentOrderRequest interfaces. The choreography describes the logical sequence of messages that can be used to realize a scenario between five systems, including: a HCM Payroll system 46300; a Payment system 46302 for the payment transaction initiator; a Bank system 46304 for the payment transaction initiator party; a Bank system 46306 for the payment transaction destinated party; and a Payment system 46308 for the payment transaction destinated party. The HCM Payroll system 46300 initiates a PaymentRequest message 46310 to the Payment system 46302. Upon receipt of the PaymentRequest message 46310, the Payment system 46302 transmits a PaymentAdviceNotification message 46312 to the Payment system 46308 to advise the payment destinated transaction party of the pending payment. The Payment system 46302 also transmits a CollectivePaymentOrderRequest message 46314 to the Bank system 46304 of the payment transaction initiator party. Upon receipt of the CollectivePaymentOrderRequest message 46314, the Bank system 46304 forwards an IntraBankPayReq notification 46316 to the Bank system 46306 for the payment transaction destinated party. Subsequently, the Bank system 46304 relays a Cash flow remittance 46318 to the Bank 46306. Optionally, upon receipt of the IntraBankPayReq notification 46316, the Bank system 46306 can initiate a cash flow directed debiting order 46320 to Bank system 46304 as an alternative form of payment to Bank system 46306. After Bank system 46304 has transmitted payment to Bank system 46306, Bank system 46304 sends BankAccountStatementNotification message 46322 to the Payment system 46302. Similarly, after Bank system 46306 has received payment from Bank system 46304, Bank system 46306 sends BankAccountStatementNotification message 46324 to the Payment system 46308.

The choreography includes a PaymentProcessing component of the payment transaction initiator system which includes the Payment system 46302 for the payment transaction initiator and the Bank system 46304 for the payment transaction initiator party, which is an example of a central payment service. In the implementation shown in FIG. 463, the Payment 46302 is operatively configured to send a CollectivePaymentOrderRequest 46314 to the Bank system 46304 for the payment transaction initiator party as further discussed below.

The CollectivePaymentOrderRequest encompasses two related interfaces: CollectivePaymentOrderRequest_Out and CollectivePaymentOrderRequest_In. The interface CollectivePaymentOrderRequest_Out is used to send a CollectivePaymentOrderRequest message asynchronously to a bank or central payment service. The interface CollectivePaymentOrderRequest_In is used to receive an asynchronous CollectivePaymentOrderRequest message.

(3) Message Data Type CollectivePaymentOrderMessage

Figure 464A:
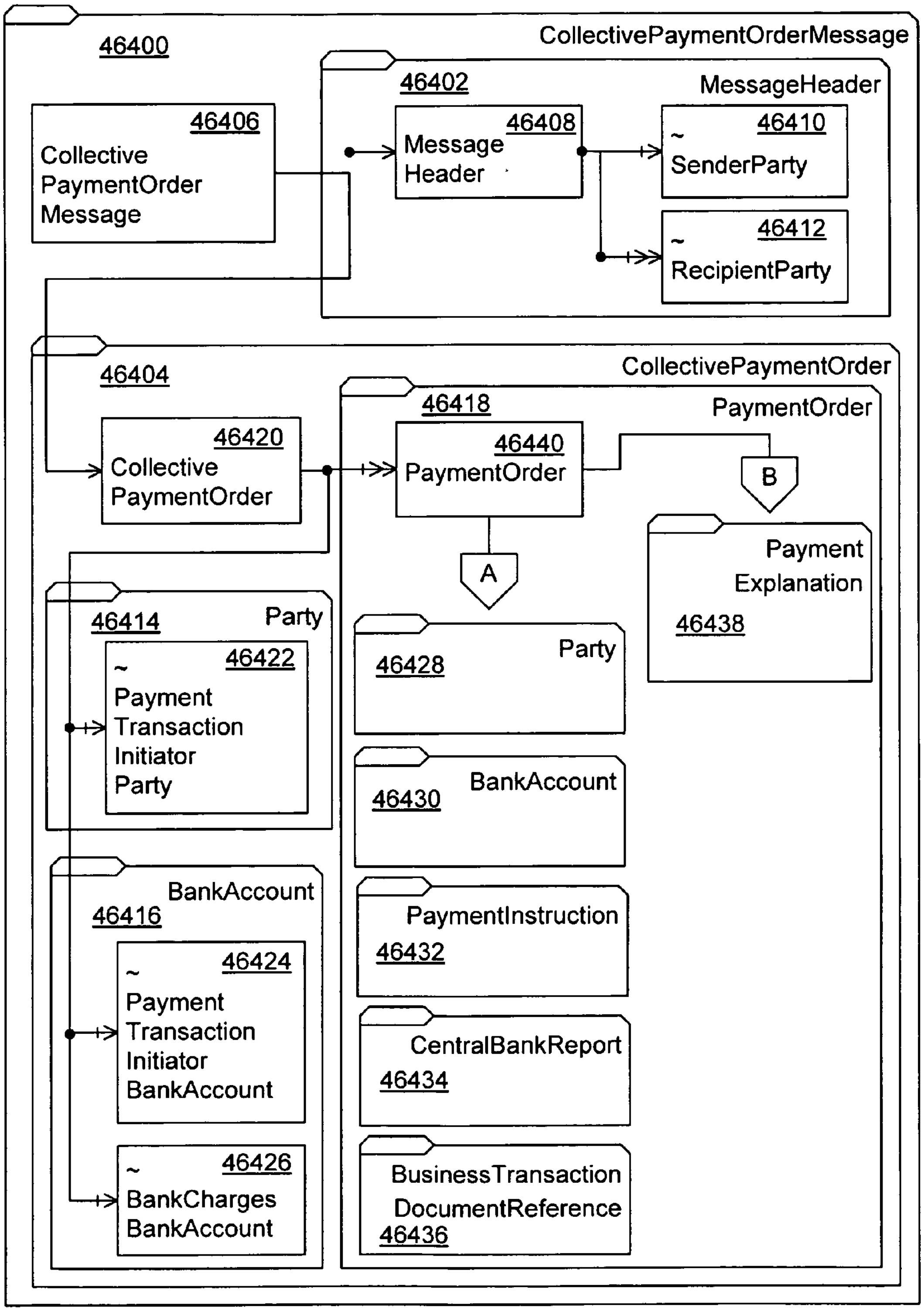

The message data type CollectivePaymentOrderRequestMessage groups the business information that is relevant for sending a business document in a message and the CollectivePaymentOrder object or entity included in the business document. The message data type CollectivePaymentOrderRequestMessage provides the structure for the message type CollectivePaymentOrderRequest. As depicted in FIG. 464A, the message data type CollectivePaymentOrderRequestMessage includes a CollectivePaymentOrderMessage package 46400, which includes a MessageHeader package 46402, a CollectivePaymentOrder package 46404, and a CollectivePaymentOrderMessage entity 46406.

(a) MessageHeader Package

The MessageHeader package 46402 groups the business information that is relevant for sending a business document in a message. The MessageHeader package 46402 includes a MessageHeader entity 46408. The grouped business information may include in the MessageHeader entity 46408, for example, information to identify the business document in a message, information about the sender, and information about the recipient. There is a 1:1 relationship between the CollectivePaymentOrderMessage entity 46406 and the MessageHeader entity 46408. Where a relationship is identified between entitites in FIG. 464A for this Interface, the respective relationship is a 1:1 relationship unless otherwise noted herein or indicated in FIG. 464A-F. The MessageHeader package 46402 also includes a SenderParty entity 46410 and a RecipientParty entity 46412. There is a 1:c relationship between the MessageHeader entity 46408 and the SenderParty entity 46410 and a 1:cn relationship between the MessageHeader entity 46408 and the RecipientParty entity 46412.

The MessageHeader entity 46408 is of type GDT: BusinessDocumentMessageHeader, where, in one implementation, the ID, CreationDateTime, and SenderParty are used.

The SenderParty is the party responsible for sending a business document at the business application level. The SenderParty entity 46410 is of type GDT: BusinessDocumentMessageHeaderParty.

The RecipientParty is the party responsible for receiving a business document at the business application level. The RecipientParty entity 46412 is of type GDT: BusinessDocumentMessageHeaderParty.

(b) CollectivePaymentOrder Package

The CollectivePaymentOrder package 46404 includes a CollectivePaymentOrderParty package 46414, which may also be referred to as the Party package 46414, a CollectivePaymentOrderBankAccount package 46416, which may also be referred to as a BankAccount package 46416, a PaymentOrder package 46418, and a CollectivePaymentOrder entity 46420. The CollectivePaymentOrder entity 46420 is an instruction to a credit institution to carry out one or more payment transactions (e.g. bank transfers or direct debits). The CollectivePaymentOrderParty Package 46414 includes the payment order initiator party (e.g., PaymentTransactionInitiatorParty entity 46422). The CollectivePaymentOrderBankAccount Package 46416 includes the bank details for the payment order initiator party. The PaymentOrder Package 46418 includes one or more instructions to a credit institution to carry out a single payment transaction (e.g. bank transfer or direct debit).

The CollectivePaymentOrder entity 46420 can include the following elements:

(1) An ID that is a unique identifier for the collective payment order that is created by the PaymentTransactionInitiatorParty entity 46422. The ID is of type GDT: BusinessTransactionDocumentID.

(2) A PaymentFormCode that identifies the form of payment (e.g. by cheque, bank transfer, direct debit) and is of type GDT: PaymentFormCode. In one implementation, the PaymentFormCode may be configured to identify each payment form except an "Invoice".

(3) A PaymentProcedureCode that identifies the payment procedure code that determines one or more technical characteristics of payment execution (e.g. EU internal payment, domestic payment, foreign payment). The PaymentProcedureCode is of type GDT: PaymentProcedureCode.

(4) An AccountDebitIndicator that indicates whether the account of the payment transaction destinated party is debited (e.g. if the payment form is direct debit) or not. The AccountDebitIndicator is of type GDT: AccountDebitIndicator.

(5) A PaymentExecutionDate that identifies the execution date for the payment. The PaymentExecutionDate is of type GDT: Date.

(6) A PaymentTransactionInitiatorBankAccountValueDate that identifies the expected value date on the payment transaction initiator's bank account. The PaymentTransactionInitiatorBankAccountValueDate is of type GDT: Date.

(7) A PaymentTransactionDestinatedBankAccountValueDate that identifies the expected value date on the payment transaction destinated party's bank account. The PaymentTransactionDestinatedBankAccountValueDate is of type GDT: Date.

(8) A TotalNetAmount that identifies the total of all net amounts included in the collective payment order and is of type GDT: Amount.

(9) A PaymentOrderTotalNumberValue that identifies the total number of all PaymentOrders included in the collective payment order. The PaymentOrderTotalNumberValue is of type GDT: TotalNumberValue.

(i) CollectivePaymentOrderParty Package

The CollectivePaymentOrderParty package 46414 groups information concerning the parties involved in the payment transaction. As noted above, the Party package 46414 includes the PaymentTransactionInitiatorParty entity 46422. The PaymentTransactionInitiatorParty entity 46422 includes the party that initiated the payment (e.g. bank transfer or direct debit). The PaymentTransactionInitiatorParty entity 46422 has a 1:c relationship with the CollectivePaymentOrder entity 46420 and is of type GDT: BusinessTransactionDocumentParty. In one implementation, only the elements StandardID, PaymentInitiatorID, PaymentRecipientID, Address and ContactPerson are used in the PaymentTransactionInitiatorParty entity 46422.

(ii) CollectivePaymentOrderBankAccount Package

The CollectivePaymentOrderBankAccount package 46416 groups the information concerning the bank details of the payment transaction initiator and the bank account to be used by the bank for bank charges. The BankAccount package 46416 includes a PaymentTransactionInitiatorBankAccount entity 46424 and a BankChargesBankAccount entity 46426.

The PaymentTransactionInitiatorBankAccount entity 46424 is the bank account of the payment transaction initiator. The PaymentTransactionInitiatorBankAccount entity 46424 is of type GDT: BusinessTransactionDocumentBankAccount. There is a 1:c relationship between the CollectivePaymentOrder entity 46420 and the PaymentTransactionInitiatorBankAccount entity 46422.

The BankChargesBankAccount entity 46426 is the bank account that shall be debited with the bank charges for the CollectivePaymentOrder 46404. The BankChargesBankAccount entity 46426 is of type GDT: BusinessTransactionDocumentBankAccount. There is a 1:c relationship between the CollectivePaymentOrder entity 46420 and the BankChargesBankAccount entity 46426. The BankChargesBankAccount entity 46426 is optional and, in one implementation, is only used if the BankChargesBankAccount entity 46426 differs from PaymentTransactionInitiatorBankAccount entity 46422.

(iii) PaymentOrder Package

The PaymentOrder package 46418 includes a PaymentOrderParty package 46428, which may also be referred to as a Party package 46428, a PaymentOrderBankAccount package 46430, which may also be referred to as a BankAccount package 46430, a PaymentOrderPaymentInstruction package 46432, which may also be referred to as a PaymentInstruction package 46432, a PaymentOrderCentralBankReport package 46434, which may also be referred to as a PaymentOrderCentralBankReport package 46434, a PaymentOrderBusinessTransactionDocumentReference package 46436, which may also be referred to as a BusinessTransactionDocumentReference package 46436 and a PaymentOrderPaymentExplanation package 46438, which may also be referred to as a PaymentExplanation package 46438. The PaymentOrder package 46418 also includes a PaymentOrder entity 46440, which is an instruction to a credit institution to carry out a single payment transaction (e.g. bank transfer or direct debit). The Party package 46428 identifies the payment order destinated party apart other parties. The BankAccout package 46430 includes the bank details for the destinated party of the payment transaction. The PaymentInstruction package 46432 includes information for the participating banks concerning the payment execution. The CentralBankReport package 46434 provides legal reporting information to the central bank and information to satisfy the legal reporting requirement for payments to foreign payees. The BusinessTransactionDocumentReference package 46436 includes references to different documents involved in the payment transaction (e.g. checks). The PaymentExplanation package 46438 provides an explanation for the purpose and the amount of the payment. The PaymentExplanation package 46438 includes references to individual invoices or credit memos.

The PaymentOrder entity 46440 includes the following elements:

(1) An ID that is a unique identifier for the PaymentOrder entity 46440 created by the payment transaction initiator party. The ID is of type GDT: BusinessTransactionDocumentID.

(2) A BillOfExchangeDueDate that identifies the bill of exchange due date in case of bill of exchange payments. The BillOfExchangeDueDate is of type GDT: Date.

(3) A NetAmount, which is the payment amount associated with the PaymentOrder entity 46440. The NetAmount is of type GDT: Amount.

(4) A GrossAmount, which is the gross amount resulting from the business documents referred to in the PaymentExplanation. The GrossAmount is of type GDT: Amount.

(5) A CashDiscountAmount, which is the cash discount deducted from the GrossAmount. The CashDiscountAmount is of type GDT: Amount.

(6) A WithholdingTaxAmount, which is the amount of withholding tax calculated for this payment transaction. The withholdingTaxAmount is of type GDT: Amount.

(7) A Note, which provides additional remarks concerning the payment and is of type GDT: Note.

(8) A BankChargeBearerCode which determines how bank charges are handled. The BankChargeBearerCode is of type GDT: BankChargeRegulationCode.

(9) A PriorityCode, which indicates whether execution of a payment is urgent. The PriorityCode is of type GDT: BusinessTransactionPriorityCode. The PriorityCode may, for example, indicate urgent or normal.

In variations, payment orders can be generated automatically when payments that are due are settled individually or collectively using the payment program.

(a) PaymentOrderParty Package

Figure 464B:
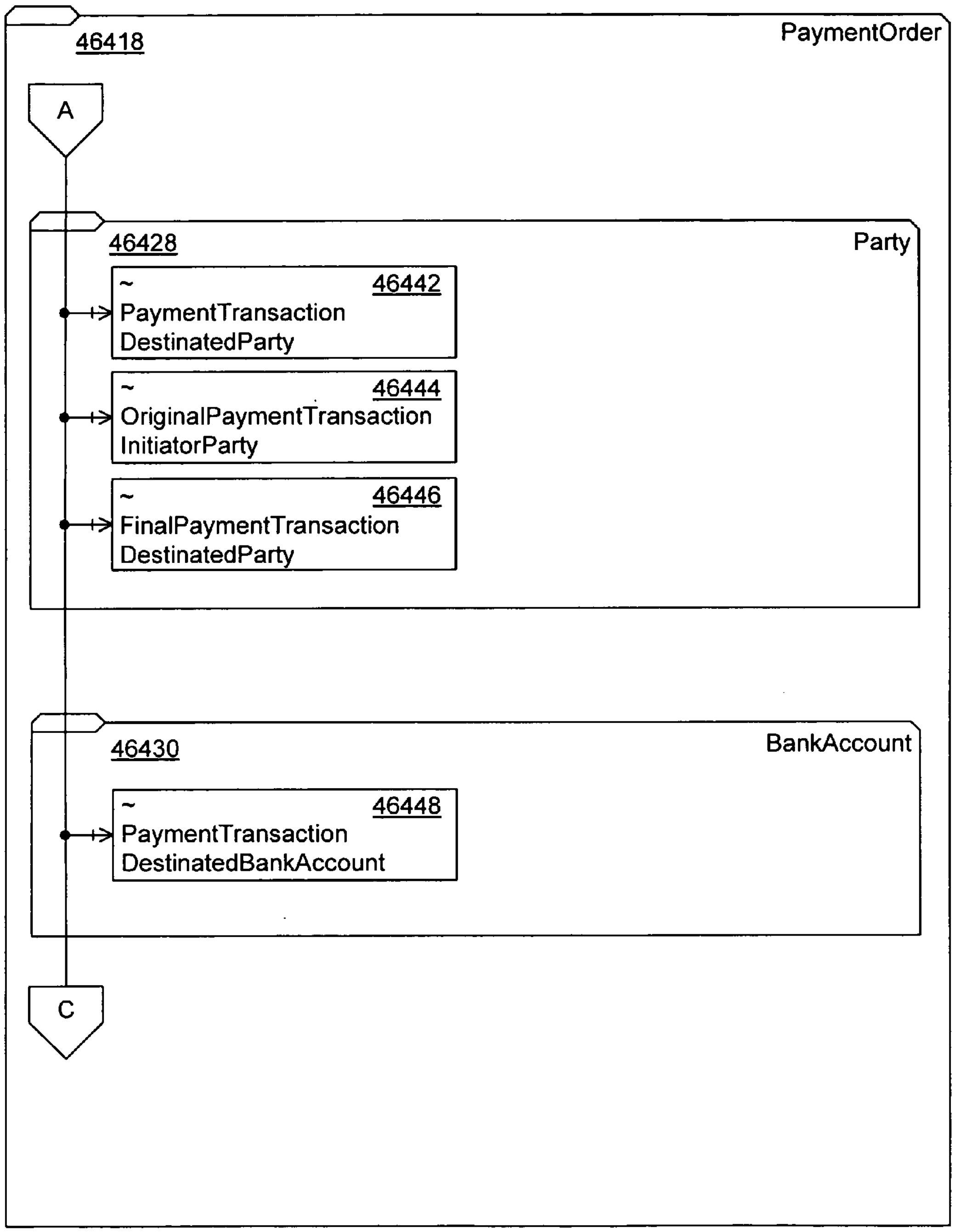

The PaymentOrderParty package 46428, as shown in FIG. 464B, groups the information concerning the parties involved in the payment transaction. The PaymentOrderParty package 46428 includes a PaymentTransactionDestinatedParty entity 46442, an OriginalPaymentTransactionInitiatorParty entity 46444, and a FinalPaymentTransactionDestinatedParty entity 46446. In variations, the PaymentTransactionDestinatedParty entity 46442 is mandatory, and the OriginalPaymentTransaction InitiatorParty entity 46444 and the FinalPaymentTransactionDestinatedParty entity 46446 are optional and may only be used in case they are different from the PaymentTransactionInitiatorParty entity 46422 or the PaymentTransactionDestinatedParty entity 46442. There is a 1:c relationship between the PaymentOrder entity 46440 and each of the PaymentTransactionDestinatedParty entity 46442, the OriginalPaymentTransactionInitiatorParty entity 46444, and the FinalPaymentTransactionDestinatedParty entity 46446.

The PaymentTransactionDestinatedParty entity 46442 is the party that receives the payment or whose account is debted. The PaymentTransactionDestinatedParty entity 46442 is of type GDT: BusinessTransactionDocumentParty. In one implementation, only the elements StandardID, PaymentInitiatorID, PaymentRecipientID, Address and ContactPerson are used in the PaymentTransactionDestinatedParty entity 46442.

The OriginalPaymentTransactionInitiatorParty entity 46444 is the party on whose behalf the payment order may be executed by the PaymentTransactionInitiatorParty entity 46442. The OriginalPaymentTransactionInitiatorParty entity 46444 is of type GDT: BusinessTransactionDocumentParty. In one implementation, only the elements StandardID, PaymentInitiatorID, PaymentRecipientID, Address and ContactPerson are used in the OriginalPaymentTransactionInitiatorParty entity 46444. The OriginalPaymentTransactionInitiatorParty entity 46444 is optional and may be used when the OriginalPaymentTransactionInitiatorParty entity 46444 is not equal to the PaymentTransactionInitiatorParty entity 46422.

The PaymentTransactionDestinatedParty entity 46442 may optionally receive a payment or be debited on behalf of the FinalPaymentTransactionDestinatedParty entity 46446. The FinalPaymentTransactionDestinatedParty entity 46446 is of type GDT: BusinessTransactionDocumentParty. In one implementation, only the elements StandardID, PaymentInitiatorID, PaymentRecipientID, Address and ContactPerson are used the FinalPaymentTransactionDestinatedParty entity 46446. The FinalPaymentTransactionDestinatedParty entity 46446 is optional and may be used when it is different from the PaymentTransactionDestinatedParty 46442.

(b) PaymentOrderBankAccount Package

The PaymentOrderBankAccount package 46430, as shown in FIG. 464B, groups the information concerning the bank details of the payment transaction destinated party. The PaymentOrderBankAccount package 46430 includes the PaymentTransactionDestinatedBankAccount entity 46448. The PaymentTransactionDestinatedBankAccount entity 46448 is the bank account of the party that the payment transaction is destined. The PaymentTransactionDestinatedBankAccount entity 46448 may be automatically debited in case of a direct debit. The PaymentTransactionDestinatedBankAccount entity 46448 is of type GDT: BusinessTransactionDocumentBankAccount and has a 1:c relationship with the PaymentOrder entity 46440.

(c) PaymentOrderPaymentInstruction Package

Figure 464C:
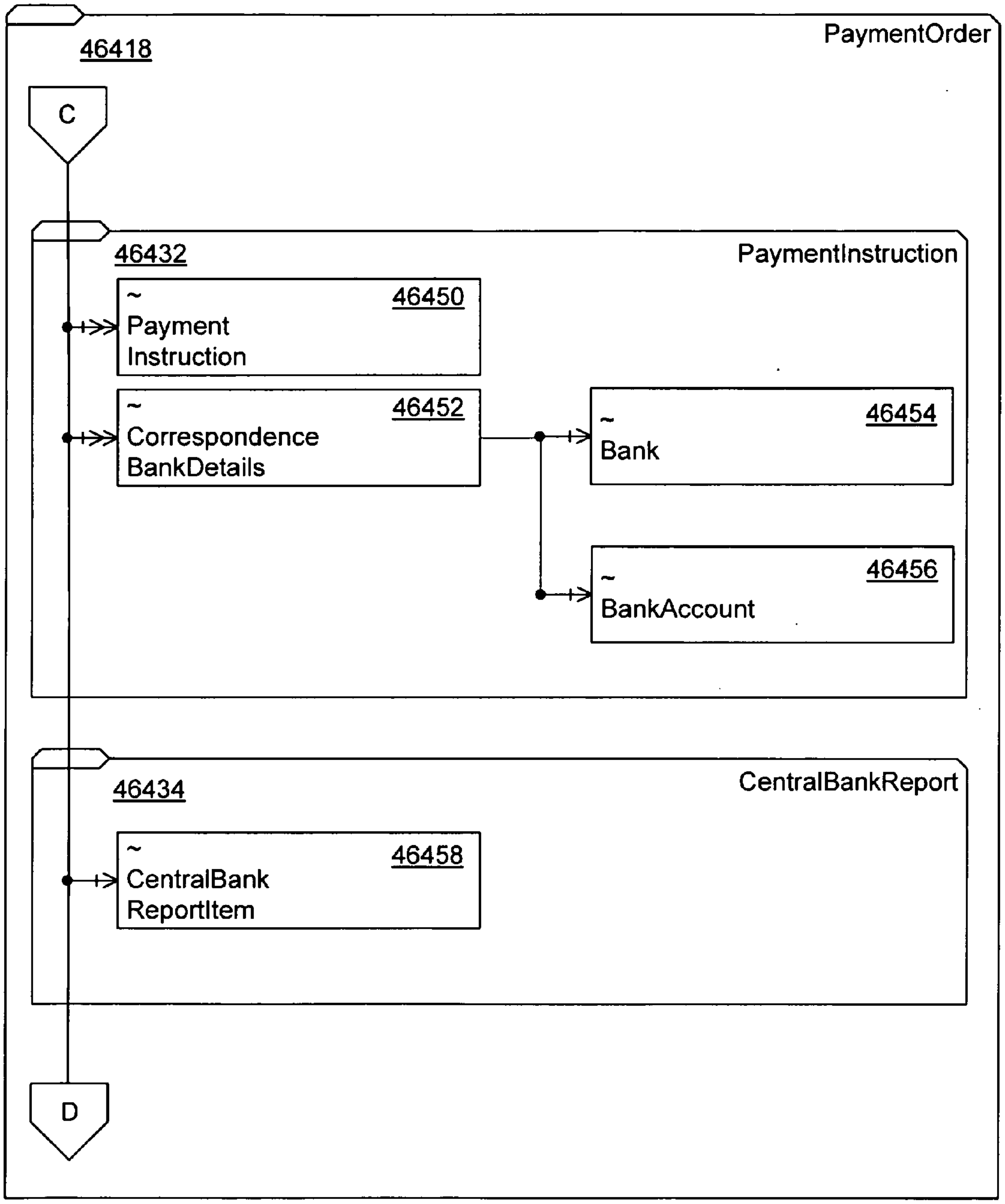

The PaymentOrderPaymentInstruction package 46432, as shown in FIG. 464C, groups the information concerning the payment instructions sent together with the payment order. The PaymentOrderPaymentInstruction package 46432 includes a PaymentInstruction entity 46450 and a CorrespondenceBankDetails entity 46452.

The PaymentInstruction entity 46450 is an instruction to the executing bank related to the payment order, for example, to send a bank advice to the payee. The PaymentInstruction entity 46450 is of type GDT: PaymentInstruction. The PaymentInstruction entity 46450 is optional. There is a 1:cn relationship between the PaymentOrder entity 46440 and the PaymentInstruction entity 46450.

The CorrespondenceBankDetails entity 46452 includes the bank details of a correspondence bank that should be used for forwarding the payment order. A correspondence bank is a bank (typically in a foreign country) to which a bank has a business connection. The correspondence bank is used as an intermediary, for example, for cross border payments. The CorrespondenceBankDetails entity 46452 includes a Bank entity 46454 and a BankAccount entity 46456. The CorrespondenceBankDetails entity 46452 contains also a CorrespondenceBankTypeCode element that is a representation of the type of correspondence bank, for example, an "intermediate bank" or "initiator's correspondence bank". The CorrespondenceBankTypeCode is of type GDT: CorrespondenceBankTypeCode. The CorrespondenceBankDetails entity 46452 is optional.

The Bank entity 46454 includes the address or identifier for the respective correspondence bank. The Bank entity 46454 is of type GDT: Bank. In one implementation, either the Bank entity 46454 or the BankAccount entity 46456 is supplied in the CorrespondenceBankDetails entity 46452 but not both at the same time.

The BankAccount entity 46456 is a correspondence bank account and is of type GDT: BusinessTransactionDocumentBankAccount.

(d) PaymentOrderCentralBankReport Package

The PaymentOrderCentralBankReport Package 46434, as shown in FIG. 464C, groups the information required for legal reporting. The PaymentOrderCentralBankReport Package 46434 includes a CentralBankReportItem entity 46458. The CentralBankReportItem entity 46458 includes information to satisfy the legal reporting to the central bank and the requirement for payments to foreign payees. The CentralBankReportItem entity 46458 is of type GDT: CentralBankReportItem. The CentralBankReportItem entity 46458 is optional.

(e) PaymentOrderBusinessTransaction DocumentReference Package

Figure 464D:
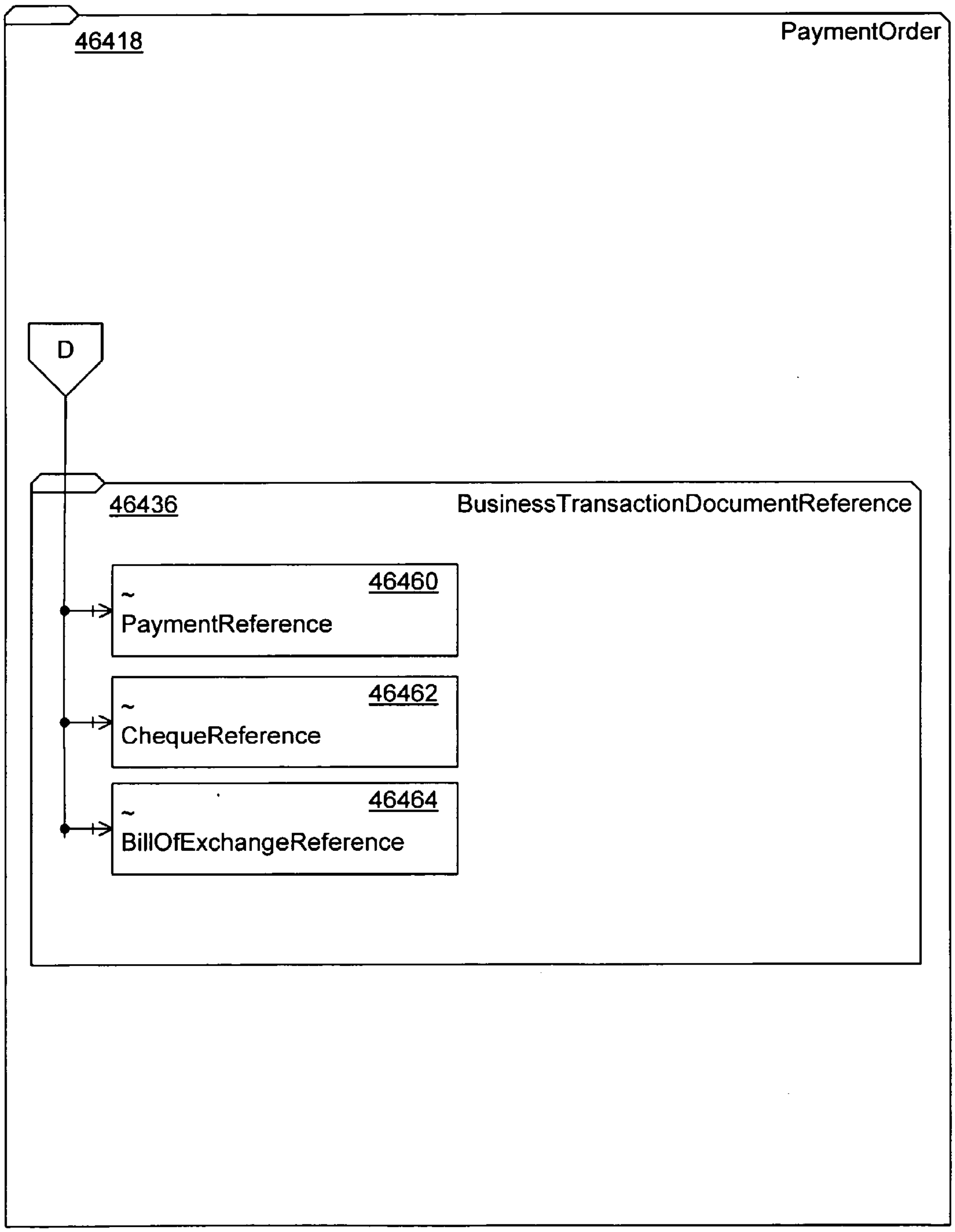
Figure 464E:
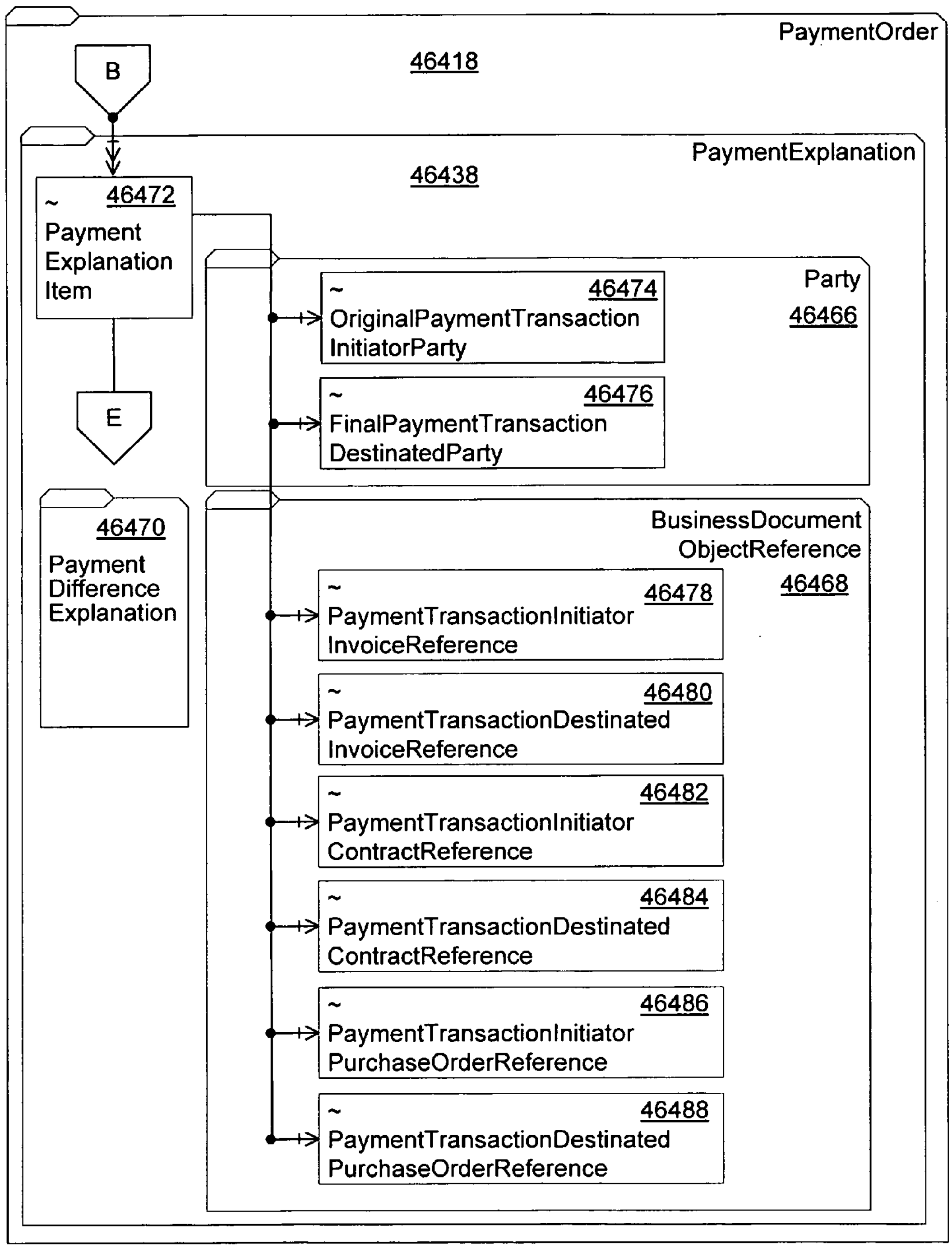
Figure 464F:
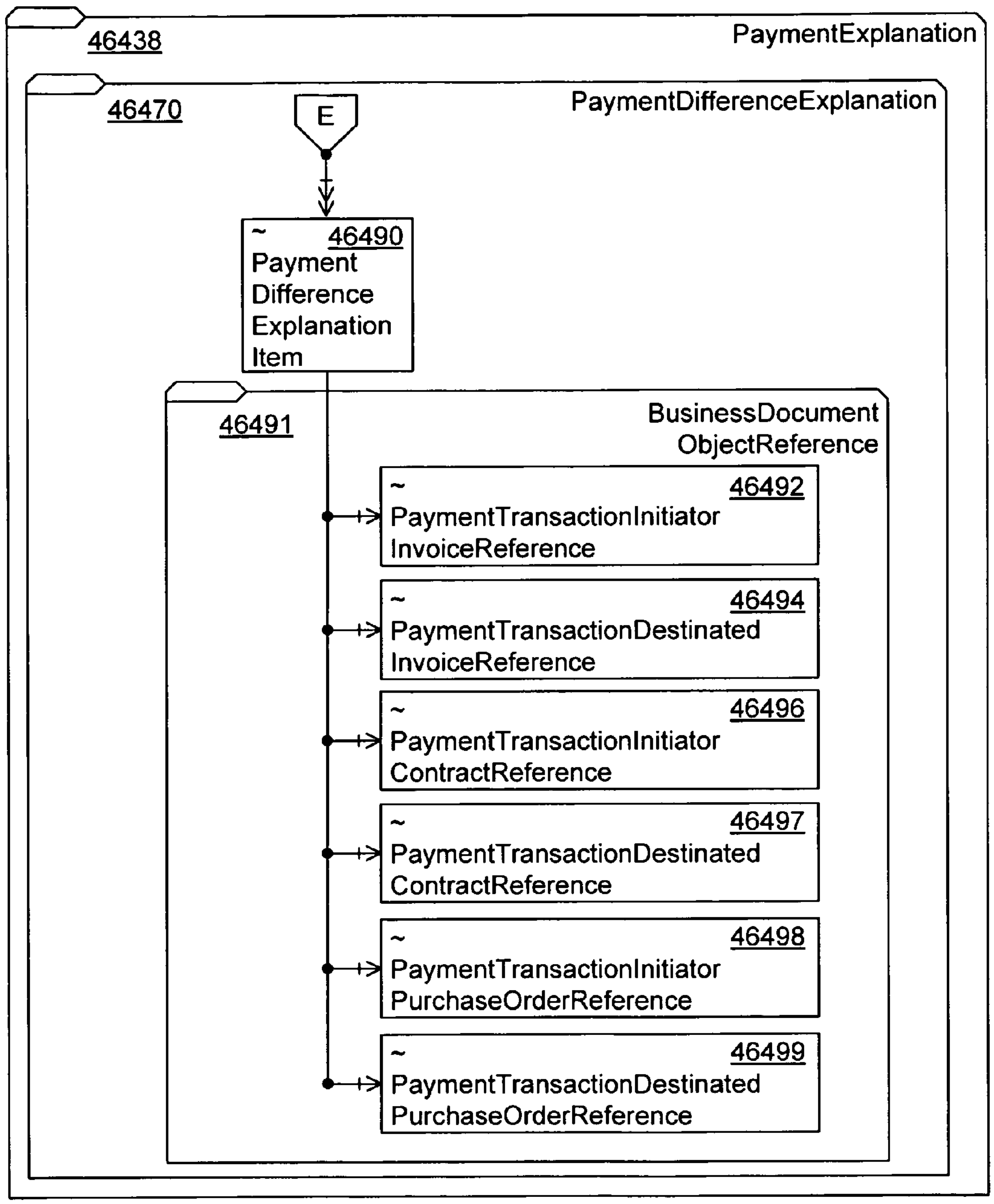

The PaymentOrderBusinessTransactionDocumentReference package 46436, as shown in FIG. 464D, groups references to business documents involved in or used for the payment transaction (e.g. a check number). The BusinessTransactionDocumentReference package 46436 is optional.

The PaymentOrderBusinessTransactionDocumentReference package 46436 includes a PaymentReference entity 46460, a ChequeReference entity 46462, and a BillOfExchangeReference entity 46464.

The PaymentReference entity 46460 is a reference to the payer's payment document representing the actual payment. The PaymentReference entity 46460 is of type GDT: BusinessTransactionDocumentReference. In one implementation, only the element ID in the PaymentReference entity 46460 is used. As a payment documents a cash flow, the PaymentReference entity 46460 includes at least the payment procedure, the payment currency, the payment amount, the payment date and the payment receiver. The PaymentReference entity 46460 may also identify the parties involved and the bank details associated with a payment.

The ChequeReference entity 46462 is the reference to the check (checknumber) that was used for payment. The ChequeReference entity 46462 is of type GDT: BusinessTransactionDocumentReference. In one implementation, only the element ID in the ChequeReference entity 46462 is used.

The BillOfExchangeReference entity 46464 is the reference to the bill of exchange (bill of exchange number) that was used for the payment. The BillOfExchangeReference entity 46464 is of type GDT: BusinessTransactionDocumentReference. In one implementation, only the element ID in the BillOfExchangeReference entity 46464 is used.

(f) Payment Order Payment Explanation Package

The PaymentOrderPaymentExplanation package 46438 groups the payment explanation items for a payment, such as the reason for the payment (e.g. by referring to one or more invoices), the payment amount (e.g. by giving the cash discount amounts) as well as, if necessary, the difference between the expected and the actual amount for the payment. The PaymentOrderPaymentExplanation package 46438 includes a Party package 46466, a BusinessDocumentObjectReference package 46468, a PaymentDifferenceExplanationItem package 46470 and a PaymentExplanationItem entity 46472.

(i) PaymentExplanationItem

The PaymentExplanationItem entity 46472 can explain the payment amount for the payee. It can refer to one or more invoices or other business documents relevant for the payment amount. This includes potential adjustments applied by the payer.

The information contained can identify the respective invoices or credit memos in the payee's financial accounting. Additionally it can explain potential differences between the invoice and the payment amount.

The parties contained in PaymentExplanationItem entity 46472 can differ from the respective parties of the PaymentOrder entity 46440. The PaymentExplanationItem entity 46472 is of type GDT: PaymentExplanationItem.

The PaymentExplanationItem entity 46472 includes the following elements:

(1) An ID that is a unique identifier for the PaymentExplanationItem entity 46472 in the context of a payment or payment advice. The ID is a unique identification of a PaymentExplanationItem entity 46472 when combined with a PaymentID or a PaymentAdviceID. The ID is of type GDT: BusinessTransactionDocumentID.

(2) An OffsettingIndicator which specifies whether the amounts contained in the given PaymentExplanationItem entity 46472 are offset with amounts from other PaymentExplanationItems on the same level or whether these amounts are contained as a part in the TotalDebitAmount or TotalCreditAmount of the PaymentOrder. The OffsettingIndicator is of the type GDT: Indicator.

(3) A BusinessTransactionDocumentDate which is the date of the business document related to the PaymentExplanationItem entity 46472. The BusinessTransactionDocumentDate is of the type GDT: Date.

(4) A NetAmount that is a payed or transfered net amount. The NetAmount is of the type GDT: Amount.

(5) A GrossAmount that is an amount as given by the business document related to the PaymentExplanation, for example the amount of an invoice or a loan contract. The GrossAmount is of the type GDT: Amount.

(6) A TransactionCurrencyGrossAmount that is the amount of the business document in transaction currency. The TransactionCurrencyGrossAmount is of the type GDT: Amount.

(7) A CashDiscountAmount that is the deduced cash discount. The CashDiscountAmount is of the typeGDT: Amount.

(8) A TransactionCurrencyCashDiscountAmount that is the amount of cash discount in transaction currency. The TransactionCurrencyCashDiscountAmount is of the type GDT: Amount.

(9) A WithholdingTaxAmount that is deduced withholding tax. The WithholdingTaxAmount is of the type GDT: Amount.

(10) A BankFeeAmount that is the deduced bank fee. The BankFeeAmount is of the type GDT: Amount.

(11) A ScandinavianPaymentReferenceID that is a reference to a payment as used in Scandinavian countries (so-called KIDNO). The ScandinavianPaymentReferenceID is of the type GDT: ID.

(12) A SwissPaymentReferenceID that is a reference to a payment as used in Switzerland (so-called ESR). The SwissPaymentReferenceID is of the type GDT: ID.

(13) A Note that is a natural-language text item that explains the payment and deduced amounts. The Note is of the type GDT: Note.

(ii) PaymentOrderPaymentExplanationParty Package

The Party Package 46466 can group the information concerning the parties related to the explanation of a payment in a PaymentOrder package 46418. These parties may differ from the parties of the PaymentOrder package 46418. The Party Package 46466 includes an OriginalPaymentTransactionInitiatorParty entity 46474 and a FinalPaymentTransactionDestinatedParty entity 46476.

The OriginalPaymentTransactionInitiatorParty entity 46474 can be the original party on behalf of which the payment transaction is executed. The OriginalPaymentTransactionInitiatorParty entity 46474 is of type GDT: BusinessTransactionDocumentParty. Only the elements StandardID, PaymentInitiatorID, PaymentRecipientID, Address and ContactPerson are used. The OriginalPaymentTransactionInitiatorParty entity 46474 is optional and may only be supplied in the case where it is not equal to the PaymentTransactionInitiatorParty entity 46422 of the PaymentOrder package 46418.

The FinalPaymentTransactionDestinatedParty entity 46476 can be the final party on behalf of which a payment is received or debited. The FinalPaymentTransactionDestinatedParty entity 46476 is of type GDT: BusinessTransactionDocumentParty. Only the elements StandardID, PaymentInitiatorID, PaymentRecipientID, Address and ContactPerson are used. The FinalPaymentTransactionDestinatedParty entity 46476 can be optional and may only be supplied in the case where it is different from PaymentTransactionDestinatedParty entity 46442 of the PaymentOrder package 46418 Party package 46428.

(iii) PaymentOrderPaymentExplanationBusinessDocumentObjectReference Package

The BusinessDocumentObjectReference Package 46468 can group references to business documents related to the explanation of a payment in a PaymentOrder package 46418. The BusinessDocumentObjectReference Package 46468 can include a PaymentTransactionInitiatorInvoiceReference entity 46478, a PaymentTransactionDestinatedInvoiceReference entity 46480, a PaymentTransactionInitiatorContractReference entity 46482, a PaymentTransactionDestinatedContractReference entity 46484, a PaymentTransactionInitiatorPurchaseOrderReference entity 46486 and a PaymentTransactionDestinatedPurchaseOrderReference entity 46488.

The PaymentTransactionInitiatorInvoiceReference entity 46478 is a reference to an invoice of the PaymentTransactionInitiatorParty entity 46422. The PaymentTransactionInitiatorInvoiceReference entity 46478 is of the type GDT: BusinessTransactionDocumentReference, where only the element ID is used.

The PaymentTransactionDestinatedInvoiceReference entity 46480 is a reference to an invoice of the PaymentTransactionDestinatedParty entity 46442. The PaymentTransactionDestinatedInvoiceReference entity 46480 is of the type GDT: BusinessTransactionDocumentReference, where only the element ID is used.

The PaymentTransactionInitiatorContractReference entity 46482 is a reference to a contract of the PaymentTransactionInitiatorParty entity 46422. The PaymentTransactionInitiatorContractReference entity 46482 is of the type GDT: BusinessTransactionDocumentReference, where only the element ID is used.

The PaymentTransactionDestinatedContractReference entity 46484 is a reference to a contract of the PaymentTransactionDestinatedParty entity 46442. The PaymentTransactionDestinatedContractReference entity 46484 is of the type GDT: BusinessTransactionDocumentReference, where only the element ID is used.

The PaymentTransactionInitiatorPurchaseOrderReference entity 46486 is a reference to a purchase order of the PaymentTransactionInitiatorParty entity 46422. The PaymentTransactionInitiatorPurchaseOrderReference entity 46486 is of the type GDT: BusinessTransactionDocumentReference, where only the element ID is used.

The PaymentTransactionDestinatedPurchaseOrderReference entity 46488 is a reference to a purchase order of the PaymentTransactionDestinatedParty entity 46442. The PaymentTransactionDestinatedInvoiceReference entity 46488 is of the type GDT: BusinessTransactionDocumentReference, where only the element ID is used.

(g) PaymentOrderPaymentExplanationPaymentDifferenceExplanation Package

The PaymentDifferenceExplanation Package 46470 can group the explanations of differences between the expected and the actual amounts of payments occuring in a PaymentOrder package 46418. The PaymentDifferenceExplanation Package 46470 includes a PaymentDifferenceExplanationItem entity 46490 and a package BusinessDocumentObjectReference Package 46491.

(i) PaymentDifferenceExplanationitem

The PaymentDifferenceExplanationItem entity 46490 is an explanation of the difference between the expected and the actual amount of a payment. The PaymentDifferenceExplanationItem entity 46490 is of the type GDT: PaymentDifferenceExplanationItem. The PaymentDifferenceExplanationItem entity 46490 includes the following elements:

(1) An OffsettingIndicator that specifies, whether the amounts contained in the given PaymentExplanationItem entity 46472 are offsetted with amounts from other PaymentExplanationItems on the same level or whether these amounts are contained as a part in another amount on this level. The OffsettingIndicator is of the type GDT: Indicator.

(2) An Amount that is the amount of the adjustment of a payment (in currency of the payment). The Amount is of the type GDT: Amount.

(3) A PaymentDifferenceReasonCode that is a coded representation of the reason for a payment difference. The PaymentDifferenceReasonCode is of the type GDT: PaymentDifferenceReasonCode.

(ii) PaymentOrderPaymentExplanationPaymentDifferenceExplanationBusinessDocumentObjectReference Package The BusinessDocumentObjectReference Package 46491 can group references to business documents related to the explanation of payment differences in a PaymentOrder package 46418. The BusinessDocumentObjectReference Package 46491 includes a PaymentTransactionInitiatorInvoiceReference entity 46492, a PaymentTransactionDestinatedInvoiceReference entity 46494, a PaymentTransactionInitiatorContractReference entity 46496, a PaymentTransactionDestinatedContractReference entity 46497,a PaymentTransactionInitiatorPurchaseOrderReference entity 46498, and a PaymentTransactionDestinatedPurchaseOrderReference entity 46499.

The PaymentTransactionInitiatorInvoiceReference entity 46492 is a reference to an invoice of the PaymentTransactionInitiatorParty entity 46422. The PaymentTransactionInitiatorInvoiceReference entity 46492 is of the type GDT: BusinessTransactionDocumentReference, where only the element ID is used.

The PaymentTransactionDestinatedInvoiceReference entity 46494 is a reference to an invoice of the PaymentTransactionDestinatedParty entity 46442. The PaymentTransactionDestinatedInvoiceReference entity 46494 is of the type GDT: BusinessTransactionDocumentReference, where only the element ID is used.

The PaymentTransactionInitiatorContractReference entity 46496 is a reference to a contract of the PaymentTransactionInitiatorParty entity 46422. The PaymentTransactionInitiatorContractReference entity 46496 is of the type GDT: BusinessTransactionDocumentReference, where only the element ID is used.

The PaymentTransactionDestinatedContractReference entity 46497 is a reference to a contract of the PaymentTransactionDestinatedParty entity 46442. The PaymentTransactionDestinatedContractReference entity 46497 is of the type GDT: BusinessTransactionDocumentReference, where only the element ID is used.

The PaymentTransactionInitiatorPurchaseOrderReference entity 46498 is a reference to a purchase order of the PaymentTransactionInitiatorParty entity 46422. The PaymentTransactionInitiatorPurchaseOrderReference entity 46498 is of the type GDT: BusinessTransactionDocumentReference, where only the element ID is used.

The PaymentTransactionDestinatedPurchaseOrderReference entity 46499 is a reference to a purchase order of the PaymentTransactionDestinatedParty entity 46442. The PaymentTransactionDestinatedInvoiceReference entity 46499 is of the type GDT: BusinessTransactionDocumentReference, where only the element ID is used.

(4) Element Structure of Collective Payment Order Request Message

The message data type element structure for the CollectivePaymentOrderRequest message is depicted in FIG. 465A-F. The element structure is similar to the data model, but provides additional information regarding the details of the interface. The element structure identifies the different packages 46500 in the interface, and represents the entities at various levels within the interface. As depicted in FIG. 465A, the interface for CollectivePaymentOrderRequest message includes five levels 46502, 46504, 46506, 46508 and 46510. The outermost package of this interface is a CollectivePaymentOrderMessage package 46516, which includes a CollectivePaymentOrderMessage entity 46518 at the first level 46502. The CollectivePaymentOrderMessage entity 46518 is of a data type MDT 46520 "CollectivePaymentOrderMessage" 46522.

The CollectivePaymentOrderMessage package 46516 includes a MessageHeader package 46524 and a CollectivePaymentOrder package 46566. The MessageHeader package 46524 includes a MessageHeader entity 46526 at the second level 46504. The MessageHeader entity 46526 is of a data type GDT 46530 "MessageHeader" 46532, and there is one 46528 MessageHeader entity 46526 for each CollectivePaymentOrderMessage package 46516.

The MessageHeader entity 46526 includes an ID 46534, a CreationDateTime 46542, a SenderParty 46550, and a ReceiverParty 46558 at the third level 46506. The ID 46534 is of a type GDT 46538 "BusinessDocumentMessageID" 46540, and there is one 46536 ID 46534 for a MessageHeader entity 46526. The CreationDateTime 46542 is of a type GDT 46546 "DateTime" 46548, and there is one 46544 CreationDateTime 46542 for a MessageHeader entity 46526. The SenderParty 46550 is of a type GDT 46554 "BusinessDocumentMessageHeaderParty" 46556, and there is zero or one 46552 SenderParty 46550 for a MessageHeader entity 46526. The ReceiverParty 46558 is of a type GDT 46562 "BusinessDocumentMessageHeaderParty" 46564, and there is any number 46560 ReceiverParty 46558 for a MessageHeader entity 46526.

As depicted in FIG. 465B, the CollectivePaymentOrder package 46566 includes a CollectivePaymentOrder entity 46568 is of a data type AGDT 46572 "CollectivePaymentOrder" 46574, and there is one 46570 CollectivePaymentOrder entity 46568 for each CollectivePaymentOrder package 46566.

The CollectivePaymentOrder entity 46568 includes an ID 46576, a PaymentFormCode 46584, a PaymentProcedureCode 46594, an AccountDebitIndicator 46502A, a PaymentExecutionDate 46510A, a PaymentTransactionInitiatorBankAccountValueDate CC 18A, a PaymentTransactionDestinated BankAccountValueDate 46526A, a TotalNetAmount 46534A, and a PaymentOrderTotalNumberValue 46542A at the third level 46506. The ID 46576 is of a type GDT 46580 "BusinessTransactionDocumentID" 46582, and there is zero or one 46578 ID 46576 for a CollectivePaymentOrder entity 46568. The PaymentFormCode 46584 is of a type GDT 46590 "PaymentFormCode" 46592, and there is one 46588 PaymentFormCode 46584 for a CollectivePaymentOrder entity 46566. The PaymentProcedureCode 46594 is of a type GDT 46598 "PaymentProcedureCode" 46500A, and there is one 46596 of PaymentProcedureCode 46594 for a CollectivePaymentOrder entity 46568. The AccountDebitIndicator 46502A is of a type GDT 46506A "AccountDebitIndicator" 46508A, and there is one 46504A of AccountDebitIndicator 46502A for a CollectivePaymentOrder entity 46568. The PaymentExecutionDate 46510A is of a type GDT 46514A "Date" 46516A, and there is one 46512A of PaymentExecutionDate 46510A for a CollectivePaymentOrder entity 46568. The PaymentTransactionInitiatorBankAccountValueDate CC18A is of a type GDT 46522A "Date" 46524A, and there is zero or one 46520A of PaymentTransactionInitiatorBankAccountValueDate CC18A for a CollectivePaymentOrder entity 46568.

As depicted in FIG. 465C, the PaymentTransactionDestinated BankAccountValueDate 46526A is of a type GDT 46530A "Date" 46532A, and there is zero or one 46528A of PaymentTransactionDestinated BankAccountValueDate 46526A for a CollectivePaymentOrder entity 46568. The TotalNetAmount 46534A is of a type GDT 46536A "Amount" 46540A, and there is zero or one 46536A of TotalNetAmount 46534A for a CollectivePaymentOrder entity 46568. The PaymentOrderTotalNumberValue 46542A is of a type GDT 46546A "TotalNumberValue" 46548A, and there is zero or one 46544A of PaymentOrderTotalNumberValue 46542A for a CollectivePaymentOrder entity 46568.

The CollectivePaymentOrder package 46566 includes a Party package 46550A that includes a PaymentTransactionInitiatorParty entity 46552A at the third level 46506. The PaymentTransactionInitiatorParty entity 46552A is of a type CDT 46556A "BusinessTransactionDocumentParty" 46558A, and there is zero or one 46554A of PaymentTransactionInitiatorParty entity 46552A for a Party package 46550A.

The CollectivePaymentOrder package 46566 includes a BankAccount package 46560A that includes a PaymentTransactionBankAccount entity 46562A and a BankChargesBankAccount entity 46570A at the third level 46506. The PaymentTransactionBankAccount entity 46562A is of a type GDT 46566A "BusinessTransactionDocumentBankAccount" 46568A, and there is zero or one 46564A of PaymentTransactionBankAccount entity 46562A for a BankAccount package 46560A. The BankChargesBankAccount entity 46570A is of a type GDT 46574A "BusinessTransactionDocumentBankAccount" 46576A, and there is zero or one 46572A of BankChargesBankAccount entity 46570A for a BankAccount package 46560A.

The CollectivePaymentOrder package 46566 includes a PaymentOrder package 46578A that includes a PaymentOrder entity 46580A at the third level 46506. The PaymentOrder entity 46580A includes an ID 46588A, a BillOfExchangeDueDate 46596A, a NetAmount 46504B, a GrossAmount 46512B, a CashDiscountAmount 46520B, a WithholdingTaxAmount 46528B, a Note 46536B, a BankChargeBearerCode 46544B and a PriorityCode 46552B, at the forth-level 46508. The PaymentOrder entity 46580A is of a type AGDT 46584A "BusinessTransactionDocumentID" 46586A, and there is at least one to an unlimited amount 46582A of PaymentOrder entity 46580A for a CollectivePaymentOrder package 46566.

The ID 46588A is of a type GDT 46592A "BusinessTransactionDocumentID" 46594A, and there is zero or one 46590A ID 46588A for a PaymentOrder 46580A. The BillOfExchangeDueDate 46596A is of a type GDT 465900B "Date" 46502B, and there is zero or one 46598A BillOfExchangeDueDate 46596A for a PaymentOrder 46580A.

As depicted in FIG. 465D, the NetAmount 46504B is of a type GDT 46508B "Amount" 46510B, and there is one 46516B NetAmount 46504B for a PaymentOrder 46580A. The GrossAmount 46512B is of a type GDT 46516B "Amount" 46518B, and there is zero or one 46514B GrossAmount 46512B for a PaymentOrder 46580A. The CashDiscountAmount 46520B is of a type GDT 46524B "Amount" 46526B, and there is zero or one 46522B CashDiscountAmount 46520B for a PaymentOrder 46580A. The WithholdingTaxAmount 46528B is of a type GDT 46532B "Amount" 46534B, and there is zero or one 46530B WithholdingTaxAmount 46528B for a PaymentOrder 46580A. The Note 46536B is of a type GDT 46540B "Note" 46542B, and there is zero or one 46538B Note 46536B for a PaymentOrder 46580A. The BankChargeBearerCode 46544B is of a type GDT 46548B "BankChargeBearerCode" 46550B, and there is zero or one 46546B BankChargeBearerCode 46544B for a PaymentOrder 46580A. The PriorityCode 46552B is of a type GDT 46556B "BusinessTransactionPriorityCode" 46558B, and there is zero or one 46554B PriorityCode 46552B for a PaymentOrder 46580A.

The PaymentOrder package 46578A includes a Party package 46560B that includes a PaymentTransactionDestinatedParty entity 46562B, an OriginalPaymentTransactionInitiatorParty entity 46570B, and a FinalPaymentTransactionlDestinatedParty entity 46578B at the forth level 46508. The PaymentTransactionDestinatedParty entity 46562B is of a type CDT 46566B "BusinessTransactionDocumentParty" 46568B, and there is zero or one 46564B PaymentTransactionDestinatedParty entity 46562B for a Party package 46560B. The OriginalPaymentTransactionInitiatorParty entity 46570B is of a type CDT 46574B "BusinessTransactionDocumentParty" 46576B, and there is zero or one 46572B OriginalPaymentTransactionInitiatorParty entity 46570B for a Party package 46560B.

As depicted in FIG. 465E, the FinalPaymentTransactionDestinatedParty 46578B is of a type CDT 46582B "BusinessTransactionDocumentParty" 46584B, and there is zero or one 46580B FinalPaymentTransactionDestinatedParty 46578B for a Party package 46560B.

The PaymentOrder package 46578A includes a BankAccount package 46586B that includes a PaymentTransactionDestinated BankAccount entity 46588B at the forth level 46508. The PaymentTransactionDestinatedBankAccount entity 46588B is of a type GDT 46592B "BusinessTransactionDocumentBankAccount" 46594B, and there is zero or one 46590B PaymentTransactionDestinatedBankAccount entity 46588B for a BankAccount package 46586B.

The PaymentOrder package 46578A includes a PaymentInstruction package 46596B that includes a PaymentInstruction entity 46598B and a CorrespondenceBankDetails entity 46506C at the forth level 46508. The PaymentInstruction entity 46598B is of a type GDT 46502C "PaymentInstruction" 46504C, and there is zero to unlimited 46500C PaymentInstruction entity 46598B for a PaymentInstruction package 46596B. The CorrespondenceBankDetails entity 46506C is of a type AGDT 46510C "PaymentOrderCorrespondenceBankDetails" 46512C, and there is zero to three 46508C CorrespondenceBankDetails entity 46506C for a PaymentInstruction package 46596B.

The CorrespondenceBankDetails entity 46506C includes a CorrespondenceBankTypeCode 46514C, a Bank 46522C, and a BankAccount 46530C at the fifth level 46510. The CorrespondenceBankTypeCode 46514C is of a type GDT 46518C "CorrespondenceBankTypeCode" 46520C, and there is one 46516C CorrespondenceBankTypeCode 46514C for a CorrespondenceBankDetails 46506C. The Bank 46522C is of a type GDT 46526C "Bank" 46528C, and there is zero to one 46524C Bank 46522C for a CorrespondenceBankDetails 46506C. The BankAccount 46530C is of a type GDT 46534C "BusinessTransactionDocumentBankAccount" 46536C, and there is zero to one 46532C BankAccount 46530C for a CorrespondenceBankDetails 46506C.

The PaymentOrder package 46578A includes a StateCentralBankReport package 46538C that includes a CentralBankReportItem entity 46540C at the forth level 46508. The CentralBankReportItem entity 46540C is of a type GDT 46544C "CentralBankReportItem" 46546C, and there are zero to unlimited 46542C CentralBankReportItem entity 46540C for a StateCentralBankReport package 46538C.

As depicted in FIG. 465F, the PaymentOrder package 46578A includes a BusinessTransactionDocumentReference package 46548C which includes a PaymentReference entity 46550C, a ChequeReference entity 46558C, and a BillOfExchangeReference entity 46566C at the forth level 46508. The PaymentReference entity 46550C is of a type GDT 46554C "BusinessTransactionDocumentReference" 46556C, and there is zero to one 46552C PaymentReference entity 46550C for a BusinessTransactionDocumentReference package 46548C. The ChequeReference entity 46558C is of a type GDT 46562C "BusinessTransactionDocumentReference" 46564C, and there are zero to one 46560C ChequeReference entity 46558C for a BusinessTransactionDocumentReference package 46548C. The BillOfExchangeReference entity 46566C is of a type GDT 46570C "BusinessTransactionDocumentReference" 46572C, and there is zero to one 46568C BillOfExchangeReference entity 46566C for a BusinessTransactionDocumentReference package 46548C.

The PaymentOrder package 46578A includes a PaymentExplanation package 46575C that includes a PaymentExplanationItem entity 46576C at the forth level 46508. The PaymentExplanationItem entity 46576C is of a type GDT 46580C "PaymentExplanationItem" 46582C, and there is zero to umlimited 46578C PaymentExplanationItem entity 46576C for a PaymentExplanation package 46575C.

hh) Credit Payment Behavior Summary Interfaces

CreditPaymenBehaviorSummary interfaces transfer information about the payment behavior of a business partner. They are based on the message type CreditPaymentBehaviorSummaryNotification. In a company, credit management is responsible for checking the creditworthiness of business partners and for real-time monitoring of the total liability of business partners using dynamic credit limits. The tasks of a credit manager include the final acceptance or refusal of requests (e.g., credit decisions) and the procurement and management of collateral that reduces the risk of losses on receivables from business partners. Creditworthiness checks are carried out using internal and external information. The information about the creditworthiness can be provided on request from credit management (CreditWorthinessQuery and Response) or as an unsolicited notification to credit management based on internal company rules (CreditWorthinessChangeInformation).

The bases for the creditworthiness checks include credit information about business partners provided by information providers (CreditAgencyReportQuery & Response). It also includes information about existing payment obligations of the business partner; this information can be obtained actively by Credit Management (CreditCommitmentQuery & Response) or Credit Management receives it, for example, from sales according to internal company rules (CreditCommitmentNotification). It also includes notifications about the payment behavior of business partners that Credit Management receives from payment (CreditPaymentBehaviorSummaryNotification).

Credit Management can also provide information internally on request about business partners whose creditworthiness is classified as critical (CreditWorthinessCriticalPartiesQuery & Response).

(1) Message Type Credit Payment Behaviour Summary Notification

The interface CreditPaymentBehaviorSummaryNotification assists the sending of information about business partners' payment behavior to Credit Management. Payment sends information about dunning notices, last payments, and remaining open items to Credit Management. This enables an overview of the total payment receivables due to a company from a business partner. A CreditPaymentBehaviorSummaryNotification is a notification to Credit Management about the payment behavior (payments made, open items, dunning notices) of a business partner. The message type CreditPaymentBehaviorSummaryNotification is based on the message data type CreditPaymentBehaviorSummaryMessage.

(2) Credit Payment Behavior Summary Choreography

FIG. 466 shows the message choreography for Credit Payment Behavior. The following message choreography describes the possible logical sequence of the messages that can be used to realize the scenario between a Financial Accounts Receivable server 46600, a Sales or Financials server 46602, a Billing System (e.g., Telco Billing System) server 46604, a Credit Management server 46606, and a Credit Agency server 46608.

A CreditCommitmentRecordNofification message 46610 is sent to the Credit Management server 46606 from the area of the company responsible for sales or financials or from Sales or Financials 46602. A CreditPaymentBehaviorSummaryNofification message 46612 is sent to the Credit Management server 46606 from Financial Accounts Receivable server 46600. A CreditWorthinessQuery message 46614 is sent to the CreditManagement server 46606 from the Sales or Financials server 46602. A CreditAgencyReportQuery message 46616 is sent to the CreditAgency server 46608 from the Credit Management server 46606. In response, a CreditAgencyReportResponse message 46618 is sent to the Credit Management server 46606 from the CreditAgency server 46608. A CreditCommitmentQuery message 46620 is sent to the Billing System (e.g., Telco Billing System) 46604 from CreditManagement server 46606. In response, a CreditCommitmentResponse message 46622 is sent to the CreditManagement server 46606 from the Billing System (e.g., Telco Billing System) 46604. A CreditWorthinessResponse message 46624 is sent to the Sales or Financials server 46602 from the Credit Management server 46606. This is in response to the CreditWorthinessQuery message 46614. A CreditWorthinessChangeInformation message 46626 is sent to the Sales or Financials server 46602 from the Credit Management server 46606. A CreditWorthinessCriticalPartiesQuery message 46628 is sent to the Credit Management server 46606 from the Sales or Financials server 46602. In response, a CreditWorthinessCriticalPartiesResponse message 46630 is sent to the Credit Management server 46606 from the Sales or Financials server 46602. Messages of these types may be transferred at specific, fixed times or in specific time intervals (for example, once daily) according to internal company rules.

(3) Message Data Type Credit Payment Behavior Message

FIG. 467 depicts the data model for the CreditPaymentBehaviorSummaryMessage. The CreditPaymentBehaviorSummaryMessage package 46700 message data type groups the business information that is relevant for sending a business document in a message and the CreditPaymentBehaviorSummaryMessage object in the business document. As shown in FIG. 467, CreditPaymentBehaviorSummaryMessage package 46700 includes a CreditPaymentBehaviorSummaryMessage entity 46702, a BusinessDocumentMessageHeader package 46704, and a CreditPaymentBehaviorSummary package 46706.

(a) Credit Payment Behavior Summary Message

The message data type CreditPaymentBehaviorSummaryMessage provides the structure for the message type CreditPaymentBehaviorSummaryNotification and interfaces based on this message type.

(b) Business Document Message Header Package

In one implementation, the BusinessDocumentMessageHeader package 46704 is not used, but it can provide intermediate elements needed between the CreditPaymentBehaviorSummaryMessage entity 46702 and the CreditPaymentBehaviorSummary package 46706.

(c) Credit Payment Behavior Summary Package

The CreditPaymentBehaviorSummary package 46706 includes a CreditPaymentBehaviorSummary entity 46708, a Party package 46710, a ProductInformation package 46712, and a PaymentInformation package 46714.

(i) Credit Payment Behavior Summary Entity

The CreditPaymentBehaviorSummary entity 46708 contains key figures regarding the payment behavior (e.g., payments made, open items, dunning notices) of a business partner. The CreditPaymentBehaviorSummary entity 46708 can contains several element including a CreditSegmentInternalID which is a proprietary identifier for a credit segment. A credit segment groups a company's business transactions from the perspective of credit assignment and control. A credit segment can also be used to monitor business partners' credit limits. A CreditPaymentBehaviourSummary assigned to a credit segment contains information about the payment behavior of a business partner with regard to transactions that belong to this credit segment. The CreditSegmentInternalID is of the GDT CreditSegmentInternalID. There is a 1:1 relationship 46716 between the CreditPaymentBehaviorSummary entity 46708 and the CreditPaymentBehaviorSummaryMessage entity 46702.

The CreditPaymentBehaviorSummary entity 46708 can contain DunningCounterValue—number of dunned, outstanding receivables due to the DebtorParty of GDT DunningCounterValue; CumulatedReceivables Amount which relates to cumulated receivables total on which interest can be calculated with a fictitious interest rate of GDT Amount.

The CreditPaymentBehaviorSummary entity 46708 can also contain DaysOfSalesOutstandingDuration—receivables total measured in days sales of transactions with the DebtorParty. Example: The total of all open items of a DebtorParty with daily sales of € 50,000 is € 1,500,000. The value for DaysOfSalesOutstandingDuration is 30 days. The DaysOfSalesOutstandingDuration can be of GDT Duration, whereby a number of days can be specified.

The CreditPaymentBehaviorSummary entity 46708 can also contain OverdueOpenItemsPercent of GDT Percent which relates to a proportion of the amount of all overdue open items to the total amount of all open items with the DebtorParty; LastTwelveMonthsMaximumCreditExposureAmount of the GDT Amount which relates to a highest exposure total of the DebtorParty in the last twelve months; LastTwelveMonthsSalesVolumeAmount of GDT Amount which relates to sales to the DebtorParty in the last twelve months; CollectionAgencySubmittedAmount of GDT Amount which relatest to an amount of all debits for the Debtor Party submitted to a collection agency; WithoutDiscountPayments; and WithDiscount Payments.

WithoutDiscountPayments relates to key figures for payments of the DebtorParty where cash discount was either not taken or only partially taken (can be a sign of missing liquidity). WithoutDiscountPayments is subdivided into the elements: AverageArrearsDuration of GDT Duration (whereby a number of days can be specified) and which relates to average payment arrears for WithoutDiscountPayments; and CurrentYearTotalAmount of GDT Amount which relates to a gross total of items cleared by WithoutDiscountPayments.

WithDiscountPayments relates to key figures for payments of the DebtorParty where maximum possible cash discount was claimed (can indicate sufficient liquidity). WithDiscountPayments is subdivided into the elements: AverageArrearsDuration of GDT Duraction (whereby a number of days should be specified) and which relatest o average payment arrears for WithDiscountPayments; and CurrentYearTotalAmount of GDT Amount which relates to a gross total of items cleared by WithDiscountPayments.

The CreditSegmentInternalID is used when both sender and recipient can access shared master data for the credit segment. If this is not the case, the credit segment must be derived from other elements (for example, Creditor, Seller, or ProductCategory).

The elements DunningCounterLevel to WithDiscountPayments are optional. However, at least one of these elements or an entity from the CreditPaymentBehaviourSummaryPaymentInformation package must be specified. A CreditPaymentBehaviourSummary with at least one of these specifications is required to provide information that can be evaluated in Credit Management.

(ii) Party Package

The Party Package 46710 is a summary of information about the parties relevant for the notification of information about payment behavior. It contains a DebtorParty entity 46718, a CreditorParty entity 46720, and a SellerParty entity 46722.

(a) Debtor Party Entity

The DebtorParty entity 46718 is the party that has to pay a payment obligation. The DebtorParty entity 46718 is of type GDT: BusinessTransactionDocumentParty. In one implementation, only the element InternalID is used. There is a 1:1 relationship 46724 between the DebtorParty entity 46718 and the CreditPaymentBehaviorSummary entity 46708.

(b) Creditor Party Entity

The CreditorParty entity 46720 is the party that owns a receivable due from the DebtorParty entity 46718. The CreditorParty entity 46720 is of type GDT: BusinessTransactionDocumentParty. In one implementation, only the element InternalID is used. The CreditorParty entity 46720 determines the credit segment and, in one implementation, is not required if the credit segment is specified via the CreditSegmentInternalID or determined from the ProductCategory. There is a 1:c relationship 46726 between the CreditorParty entity 46720 and the CreditPaymentBehaviorSummary entity 46708.

(c) Seller Party Entity

The SellerParty entity 46722 is the party that has sold a product to the DebtorParty entity 46718. The SellerParty entity 46722 is of type GDT: BusinessTransactionDocumentParty; only the element InternalID is used. The SellerParty entity 46722 determines the credit segment and, in one implementation, is not required if the credit segment is specified via the CreditSegmentInternalID or determined from the ProductCategory. There is a 1:c relationship 46728 between the SellerParty entity 46722 and the CreditPaymentBehaviorSummary entity 46708.

(iii) Product Information Package

The ProductInformation package 46712 is a summary of information about the product sold to the DebtorParty entity 46718. It contains a ProductCategory entity 46730.

(a) Product Category Entity

The ProductCategory entity 46730 is the product category of the product sold to the DebtorParty entity 46718. ProductCategory entity 46730 is of type GDT: BusinessTransactionDocumentProductCategory. In one implementation, only the element InternalID is used. The ProductCategory entity 46730 determines the credit segment and, in one implementation, is not required if the credit segment is specified via the CreditSegmentInternalID or determined using the CreditorParty entity 46720 or SellerParty entity 46722. There is a 1:c relationship 46732 between the ProductCategory entity 46730 and the CreditPaymentBehaviorSummary entity 46708.

(iv) Payment Information Package

The PaymentInformation package 46714 summarizes information about the payment behavior of a DebtorParty entity 46714. The PaymentInformation package 46714 contains a LastPayment entity 46734, an OldestOpenItem entity 46736, and a MaximumLevelDunnedOpenItem entity 46738. In one of implementation, at least one entity or one of the elements from the CreditPaymentBehaviorSummary package 46706 listed above is specified.

(a) Last Payment Entity

The LastPayment entity 46734 is the last payment received from a DebtorParty entity 46718. The LastPayment entity 46734 contains an ID, an identifier, of type GDT: BusinessTransactionDocumentID, and an Amount, a payment amount, of type GDT: Amount. It also contains a Date, a date of payment, of type GDT: Date. There is a 1:c relationship 46740 between the LastPayment entity 46734 and the CreditPaymentBehaviorSummary entity 46708.

(b) Oldest Open Item Entity

The OldestOpenItem entity 46736 is a specification of the oldest open item of a DebtorParty entity 46718. The OldestOpenItem entity 46736 contains an AccountingDocumentID, an identifier of the AccountingDocument, of type GDT: BusinessTransactionDocumentID. It also contains an AccountingDocumentItemID, an identifier of the line item within the AccountingDocument, of type GDT: BusinessTransactionDocumentItemID. It further contains an Amount, an open amount of the oldest open item, of type GDT: Amount. It additionally contains an OverdueNetDate, a due date for net payment, of type GDT: Date. An open item is an outstanding receivable. There is a 1:c relationship 46742 between the OldestOpenItem entity 46736 and the CreditPaymentBehaviorSummary entity 46708.

(c) Maximum Level Dunned Open Item Entity

The MaximumLevelDunnedOpenItem entity 46738 is the specification of the open item of the DebtorParty entity 46718 with the highest dunning level. The MaximumLevelDunnedopenItem entity 46738 contains an AccountingDocumentID, an identifier of the AccountingDocument, of type GDT: BusinessTransactionDocumentID. It contains an AccountingDocumentIternID of type GDT: BusinessTransactionDocumentItemID which is an identifier of the line item within the AccountingDocument. It further contains an Amount, an amount of the open item with the highest dunning level, of type GDT: Amount. It also includes a MaximumLevelDunningDate, a date on which the open item with the highest dunning level was last dunned, of type GDT: Date. It additionally contains a DunningLevelValue, a dunning level of the open item with the highest dunning level, of type GDT: DunningLevelValue. There is a 1:c relationship 46744 between the MaximumLevelDunnedOpenItem entity 46738 and the CreditPaymentBehaviorSummary entity 46708.

(d) Element Structure of Credit Payment Behaviour Summary Message

The message data type element structure for the CreditPaymentBehaviourSummaryMessage message is depicted in FIG. 468. The element structure is similar to the data model, but provides additional information regarding the details of the interface. The element structure identifies the different packages 46800 in the interface, and represents the entities at various levels within the interface. As depicted in FIG. 468, the interface for CreditPaymentBehaviourSummaryMessage includes five levels 46802, 46804, 46806, 46808, and 46810. The outermost package of this interface is a CreditPaymentBehaviourSummaryMessage package 46816, which includes a CreditPaymentBehaviourSummaryMessage entity 46818 at the first level 46802. The CreditPaymentBehaviourSummaryMessage entity 46818 is of a type MDT 46822 "CreditPaymentBehaviourSummaryMessage" 46824. There is one 46820 CreditPaymentBehaviourSummaryMessage entity 46818 for each CreditPaymentBehaviourSummaryMessage package 46816.

The CreditPaymentBehaviourSummaryMessage package 46816 includes a CreditPaymentBehaviourSummary package 46826. The CreditPaymentBehaviourSummary package 46826 includes a CreditPaymentBehaviourSummary entity 46828 at the second level 46804, a Party package 46842, a ProductInformation package 46892, and a PaymentInformation package 468110.

The CreditPaymentBehaviourSummary entity 46828 has a data type name "CreditPaymentBehaviourSummary" 46832, and there is one 46830 CreditPaymentBehaviourSummary entity 46828 for each CreditPaymentBehaviourSummary package 46826. The CreditPaymentBehaviourSummary entity 46828 includes a CreditSegmentInternalID entity 46834 at the third level 46806. The CreditSegmentInternalID entity 46834 is of a type GDT 46838 "CreditSegmentInternalID" 46840, and there is zero or one 46836 CreditSegmentInternalID entity 46834 for a CreditPaymentBehaviourSummary entity 46828.

The Party package 46842 includes a DebtorParty entity 46844, a CreditorParty entity 46860, and a SellerParty entity 46876 at the third level 46804. The DebtorParty entity 46844 is of a type GDT 46848 "BusinessTransactionDocumentParty" 46850, and there is one 46846 DebtorParty entity 46844 for each Party package 46842. The DebtorParty entity 46844 includes an InternalID entity 46852 at the fourth level 46808. The InternalID entity 46852 is of a type GDT 46856 "PartyInternalID" 46858, and there is one 46854 InternalID entity 46852 for a DebtorParty entity 46844.

The CreditorParty entity 46860 is of a type GDT 46864 "BusinessTransactionDocumentParty" 46866, and there is zero or one 46862 CreditorParty entity 46860 for each Party package 46842. The CreditorParty entity 46860 includes an InternalID entity 46868 at the fourth level 46808. The InternalID entity 46868 is of a type GDT 46872 "PartyInternalID" 46874, and there is one 46870 InternalID entity 46868 for a CreditorParty entity 46860.

The SellerParty entity 46876 is of a type GDT 46880 "BusinessTransactionDocumentParty" 46882, and there is zero or one 46878 SellerParty entity 46876 for each Party package 46842. The SellerParty entity 46876 includes an InternalID entity 46884 at the fourth level 46808. The InternalID entity 46884 is of a type GDT 46888 "PartyInternalID" 46890, and there is one 46886 InternalID entity 46884 for a SellerParty entity 46876.

The ProductInformation package 46892 includes a ProductCategory entity 46894. The ProductCategory entity 46894 is of a type GDT 46898 "BusinessTransactionDocumentProductCategory" 468100, and there is zero or one 46896 ProductCategory entity 46894 for each ProductInformation package 46892. The ProductCategory entity 46894 includes an InternalID entity 468102 at the fourth level 46808. The InternalID entity 468102 is of a type GDT 468106 "ProductCategoryInternalID" 468108, and there is one 468104 InternalID entity 468102 for a ProductCategory entity 46894.

The PaymentInformation package 468110 includes a LastPayment entity 468112, an OldestOpenItem entity 468142, a MeximumLevelDunnedOpenItem entity 468180, a DunningCounterValue entity 468226, a CumulatedReceivablesAmount entity 468234, a DaysofSalesOutstandingDuration entity 468242, an OverdueOpenItemsPercent entity 468250, a LastTwelveMonthsMaximumCreditExposureAmount entity 468258, a LastTwelveMonthsSalesVolumeAmount entity 468266, a CollectionAgencySubmittedAmount 468274, a WithoutDiscountPayments entity 468282, and a WithDiscountPayments entity 468304.

The LastPayment entity 468112 has a data type name "CreditPaymentBehaviourSummaryLastPayment" 468116, and there is zero or one 468114 LastPayment entity 468112 for each PaymentInformation package 468110. The LastPayment entity 468112 includes an ID entity 468118, an Amount entity 468126, and a Date entity 468134 at the fourth level 46808. The ID entity 468118 is of a type GDT 468122 "BusinessTransactionDocumentID" 468124, and there is one 468120 ID entity 468118 for a LastPayment entity 468112. The Amount entity 468126 is of a type GDT 468130 "Amount" 468132, and there is one 468128 Amount entity 468126 for a LastPayment entity 468112. The Date entity 468134 is of a type GDT 468138 "Date" 468140, and there is one 468136 Date entity 468134 for a LastPayment entity 468112.

The OldestOpenItem entity 468142 has a data type name "CreditPaymentBehaviourSummaryOldestOpenItem" 468146, and there is zero or one 468144 OldestOpenItem entity 468142 for each PaymentInformation package 468110. The OldestOpenItem entity 468142 includes an AccountingDocumentID entity 468148, an AccountingDocumentItemID entity 468156, an Amount entity 468164, and an OverdueNetDate entity 468172 at the fourth level 46808. The AccountingDocumentID entity 468148 is of a type GDT 468152 "BusinessTransactionDocumentID" 468154, and there is one 468150 AccountingDocumentID entity 468148 for an OldestOpenItem entity 468142. The AccountingDocumentItemID entity 468156 is of a type GDT 468160 "BusinessTransactionDocumentItemID" 468162, and there is one 468158 AccountingDocumentItemID entity 468156 for an OldestOpenItem entity 468142. The Amount entity 468164 is of a type GDT 468168 "Amount" 468170, and there is one 468166 Amount entity 468164 for an OldestOpenItem entity 468142. The OverdueNetDate entity 468172 is of a type GDT 468176 "Date" 468178, and there is one 468174 OverdueNetDate entity 468172 for an OldestOpenItem entity 468142.

The MaximumLevelDunnedOpenItem entity 468180 has a data type name "CreditPaymentBehaviourSummaryMaximumLevelDunnedOpenItem" 468184, and there is zero or one 468182 MaximumLevelDunnedOpenItem entity 468180 for each PaymentInformation package 468110. The MaximumLevelDunnedOpenItem entity 468180 includes an AccountingDocumentID entity 468186, an AccountingDocumentItemID entity 468194, an Amount entity 468202, a MaximumLevelDunningDate entity 468210, and a DunningLevelValue entity 468218 at the fourth level 46808. The AccountingDocumentID entity 468186 is of a type GDT 468190 "BusinessTransactionDocumentID" 468192, and there is one 468188 AccountingDocumentID entity 468186 for a MaximumLevelDunnedOpenItem entity 468180. The AccountingDocumentItemID entity 468194 is of a type GDT 468198 "BusinessTransactionDocumentItemID" 468200, and there is one 468196 AccountingDocumentItemID entity 468194 for a MaximumLevelDunnedOpenItem entity 468180. The Amount entity 468202 is of a type GDT 468206 "Amount" 468208, and there is one 468204 Amount entity 468202 for a MaximumLevelDunnedOpenItem entity 468180. The MaximumLevelDunningDate entity 468210 is of a type GDT 468214 "Date" 468216, and there is one 468212 MaximumLevelDunningDate entity 468210 for a MaximumLevelDunnedOpenItem entity 468180. The DunningLevelValue entity 468218 is of a type GDT 468222 "DunningLevelValue" 468224, and there is one 468220 DunningLevelValue entity 468218 for a MaximumLevelDunnedOpenItem entity 468180.

The DunningCounterValue entity 468226 is of a type GDT 468230 "DunningCounterValue" 468232, and there is zero or one 468228 DunningCounterValue entity 468226 for each PaymentInformation package 468110. The CumulatedReceivablesAmount entity 468234 is of a type GDT 468238 "Amount" 468240, and there is zero or one 468236 CumulatedReceivablesAmount entity 468234 for each PaymentInformation package 468110. The DaysOfSalesOutstandingDuration entity 468242 is of a type GDT 468246 "Duration" 468248, and there is zero or one 468244 DaysOfSalesOutstandingDuration entity 468242 for each PaymentInformation package 468110. The OverdueOpenItemsPercent entity 468250 is of a type GDT 468254 "Percent" 468256, and there is zero or one 468252 OverdueOpenItemsPercent entity 468250 for each PaymentInformation package 468110.

The LastTwelveMonthsMaximumCreditExposureAmount entity 468258 is of a type GDT 468262 "Amount" 468264, and there is zero or one 468260 LastTwelveMonthsMaximumCreditExposureAmount entity 468258 for each PaymentInformation package 468110.

The LastTwelveMonthsSalesVolumeAmount entity 468266 is of a type GDT 468270 "Amount" 468272, and there is zero or one 468268 LastTwelveMonthsSalesVolumeAmount entity 468266 for each PaymentInformation package 468110.

The CollectionAgencySubmittedAmount entity 468274 is of a type GDT 468278 "Amount" 468280, and there is zero or one 468276 CollectionAgencySubmittedAmount entity 468274 for each PaymentInformation package 468110.

The WithoutDiscountPayments entity 468282 has a data type name "CreditPaymentBehaviourSummaryPayments" 468286, and there is zero or one 468284 WithoutDiscountPayments entity 468282 for each PaymentInformation package 468110. The WithoutDiscountPayments entity 468282 includes an AverageArrearsDuration entity 468288 and a CurrentYearTotalAmount entity 468296 at the fourth level 46808. The AverageArrearsDuration entity 468288 is of a type GDT 468292 "Duration" 468294, and there is one 468290 AverageArrearsDuration entity 468288 for a WithoutDiscountPayments entity 468282. The CurrentYearTotalAmount entity 468296 is of a type GDT 468300 "Amount" 468302, and there is one 468298 CurrentYearTotalAmount entity 468296 for a WithoutDiscountPayments entity 468282.

The WithDiscountPayments entity 468304 has a data type name "CreditPaymentBehaviourSummaryPayments" 468308, and there is zero or one 468306 WithDiscountPayments entity 468304 for each PaymentInformation package 468110. The WithDiscountPayments entity 468304 includes an AverageArrearsDuration entity 468310 and a CurrentYearTotalAmount entity 468318 at the fourth level 46808. The AverageArrearsDuration entity 468310 is of a type GDT 468314 "Duration" 468316, and there is one 468312 AverageArrearsDuration entity 468310 for a WithDiscountPayments entity 468304. The CurrentYearTotalAmount entity 468318 is of a type GDT 468322 "Amount" 468324, and there is one 468320 CurrentYearTotalAmount entity 468318 for a WithDiscountPayments entity 468304.

ii) CustomsVendorDeclaration Interface

CustomsVendorDeclaration interfaces are used to exchange vendor declarations in an A2A process between a buyer and a vendor. The vendors guarantee their customers in a vendor declaration that the goods delivered are originating products eligible for preference according to the agreements concluded with the individual countries. These vendor declarations are required for preference processing (that is for receiving preferential customs treatment).

In customs procedures and foreign trade the origin of the goods is of considerable importance. The origin of the goods determines, among other things, which duties are levied or which trade regulations are applied.

In customs law, preferential measures represent preference processing for goods from specific countries and customs territories. This preference processing consists of the use of particular customs duty rates (preferential customs duty rates) for the import of goods. The use of customs tariff preferences is based on a large number of preference agreements concluded by countries or country groups and the autonomous preference policies that countries or country groups apply unilaterally in favor of specific countries, country groups (for example developing countries) or customs territories.

Preference processing is not merely granted on the grounds that the goods originate in the respective countries or the EU. Only goods which fulfill the respective specified prerequisites are eligible for preferences.

The CustomsVendorDeclaration is motivated by the business scenario Preference Processing. Most vendor declarations are currently sent as hard copies. The contained data or preference statement must then be maintained manually in the systems. Since vendor declarations can be very long (often more than a hundred pages for large companies) this manual maintenance means a lot of work.

With the business scenario Preference Processing, an ERP system provides information on vendor product relationships to SAP Risk Management Preference Processing. SAP GTS creates a worklist with this information so that it can be used for further processing. From the worklist, the system selects the products with their associated vendor master data for which vendor declarations do not exist.

The buyers send a CustomsVendorDeclarationCompleteRequest message for the selected products to their vendors. Most parts of the vendor declaration for the individual products are already filled out.

The vendor adds the preference status to the vendor declaration and, where necessary, additional information on the product and sends it back to the buyer using the CustomsVendorDeclarationNotification message. Next, the buyer determines if there is a valid vendor declaration for a product and aggregates the valid, invalid and missing vendor declarations. A threshold value is then determined by performing preference determination. During this process, the statements for every material are combined based on the rules and procedures in the preference agreements, irrespective of whether there are any valid or invalid vendor declarations. The results of the preference determination are saved, so that it is possible to continue monitoring them with audit trails and the Monitoring function.

Whenever an order or a billing document is created or changed in the ERP system, the system compares the threshold value with the factory price of the order item or the billing document. If the product is eligible for preferential treatment, the system sets the preference indicator. On the basis of this indicator the buyer can in turn issue vendor declarations for customers.

(1) Message Categories

A customs tariff preference is preferential treatment for the customs duty rates (reduced customs duty rates or duty free) of goods from specific countries or customs territories. The customs tariff preferences are defined in international preference agreements or autonomous national preference policies.

A vendor declaration is a legally binding declaration of a vendor concerning the goods delivered to a buyer, which allows the buyer to claim customs tariff preferences. A vendor declaration can be made in the form of an individual declaration for an individual delivery or as a long-term declaration that is, in general, valid for one year.

(i) CustomsVendorDeclaration CompleteRequest

A CustomsVendorDeclarationCompleteRequest is a request a buyer makes to a vendor to complete a long-term vendor declaration for customs purposes. The structure of the message category CustomsVendorDeclarationCompleteRequest is defined by the message data type CustomsVendorDeclarationMessage. The CustomsVendorDeclarationCompleteRequest is not required if a complete CustomsVendorDeclaration exists or has been sent (using the CustomsVendorDeclarationNotification).

(ii) CustomsVendorDeclarationNotification

A CustomsVendorDeclarationNotification is a notification from a vendor to inform a buyer of a long-term vendor declaration for customs purposes. A vendor declaration refers to goods that are delivered from the vendor to the buyer. The structure of the message category CustomsVendorDeclarationNotification is specified by the message data type CustomsVendorDeclarationMessage.

(2) Message Choreography

The following message choreography (see FIG. 469) describes the possible logical sequence of the messages that can be used to realize the scenario between a Buyer 46900 and a Vendor 46902.

For products for which no vendor declarations exist, the Buyer 46900 can send a CustomsVendorDeclarationCompleteRequest message 46904 (which is pre-filled as far as possible) to the Vendor 46902. The Vendor 46902 can add the vendor declaration and send it back to the Buyer 46900 using a CustomsVendorDeclarationNotification message 46906. When processing the CustomsVendorDeclarationNotification message 46906, the validity period resets the validity period of the information that might exist from a previous message.

During the request process, the request ID is used to relate the individual messages to each other. This means that the CustomsVendorDeclarationCompleteRequest message 46904 receives its own ID in the MessageHeader. The CustomsVendorDeclarationNotification message 46906 refers to the request message using the ReferenceID.

Transmission errors are handled by the infrastructure (message broker). A receiver system accepts inbound messages that are formally correct. Problems regarding the content are solved on the receiver side.

(3) Data Model of Customs Vendor Declaration Message

FIG. 470 depicts the data model for the CustomsVendorDeclarationMessage. The CustomsVendorDeclarationMessage package 47000 message data type groups together the business information that is relevant for sending a business document in a message and the CustomsVendorDeclaration object in the business document. The CustomsVendorDeclarationMessage package 47000 includes a CustomsVendorDeclarationMessage entity 47002, a MessageHeader package 47004, and a CustomsVendorDeclaration package 47006.

(i) Message Header Package

A MessageHeader package 47004 groups the business information that is relevant for sending a business document in a message. It includes a MessageHeader entity 47008.

(a) Message Header Entity

The MessageHeader entity 45008 is of type GDT: BusinessDocumentMessageHeader. There is a 1:1 relationship 45010 between the MessageHeader entity 47008 and CustomsVendorDeclarationMessage entity 47002. The MessageHeader entity 47008 includes an ID entity and a CreationDateTime entity.

(ii) Customs Vendor Declaration Package

The CustomsVendorDeclaration package 47006 groups together a CustomsVendorDeclaration entity 47012, a Party package 47014, an Attachment package 47016, and an Item package 47018.

(a) Customs Vendor Declaration Entity

The CustomsVendorDeclaration entity 47012 is the legally binding declaration of the vendors concerning the goods they delivered to a buyer which allows the buyer to claim customs tariff preferences. A vendor declaration can be made as an individual declaration for an individual delivery or as a long-term declaration that is, in general, valid for one year.

There is a 1:1 relationship 47020 between the CustomsVendorDeclaration entity 47012 and the CustomsVendorDeclarationMessage entity 47002. The CustomsVendorDeclaration entity 47012 includes: an ID, a Buyer ID, and a Creation Date. The ID is a unique identifier of the CustomsVendorDeclaration assigned by the vendor, and it is of type GDT: BusinessTransactionDocumentID. The BuyerID is a unique identifier of the CustomsVendorDeclaration assigned by the buyer, and it is of type GDT: BusinessTransactionDocumentID. The CreationDate is a creation date of the CustomsVendorDeclaration, and it is of type GDT: Date.

(iii) Party Package

The Party package 47014 groups the parties of a vendor declaration. It includes a VendorParty entity 47022 and a BuyerParty entity 47024.

(a) Vendor Party Entity

The VendorParty entity 47022 is the party that issues a vendor declaration for a product they must deliver. The VendorParty entity 47022 is of type GDT: BusinessTransactionDocumentParty. There is a 1:1 relationship 47026 between the VendorParty entity 47022 and the CustomsVendorDeclaration entity 47012.

(b) Buyer Party Entity

The BuyerParty entity 47024 is the party that requires a vendor declaration for a product they are going to buy. The BuyerParty entity 47024 is of type GDT: BusinessTransactionDocumentParty. There is a 1:1 relationship 47028 between the BuyerParty entity 47024 and the CustomsVendorDeclaration entity 47012.

(iv) Attachment Package

The Attachment package 47016 groups the all relevant attachments with reference to the CustomsVendorDeclaration entity 47012. The Attachment package 47016 contains the Attachment entity 47030.

(a) Attachment Entity

The Attachment entity 47030 is any type of document that refers to the CustomsVendorDeclaration entity 47012. The Attachment entity 47030 is of type GDT: Attachment. There is a 1:cn relationship 47032 between Attachment entity 47030 and the CustomsVendorDeclaration entity 47012.

(v) Item Package

The Item package 47018 is the summary of the specifications that vendors make in the CustomsVendorDeclaration entity 47012 on a product they deliver. The Item package 47018 groups an Item entity 47034, a ProductInformation package 47036, and a CustomsInformation package 47038.

(a) Item Entity

The Item entity 47034 can include the following elements: a validity period, a preferential origin country code (i.e., the country of origin of the product) and a customs commodity classification code. The country code may be the country where the last processing decisive for determining the origin of the product in the sense of the rules of origin occurred. The rules of origin determine under which conditions a product receives its origin in the respective country. Which processes should be regarded as sufficient, is fixed for the preferential customs territory in the respective processing lists (lists the processes that must be carried out for the non-originating materials without originating status to confer originating status to the manufactured products). The preferential origin country code is of type GDT: CountryCode. The customs commodity classification code represents the customs classification of trading goods in a CustomsVendorDeclaration, and is of type GDT: Cus-tomsCommodityClassificationCode. There is a 1:cn relationship 47040 between the Item entity 47034 and the CustomsVendorDeclaration entity 47012.

(vi) Product Information Package

The ProductInformation package 47036 groups product information for the CustomsVendorDeclaration entity 47012. It includes a Product entity 47042.

(a) Product Entity

The Product entity 47042 contains information on the product provided by the vendor in the CustomsVendorDeclaration entity 47012. The Product entity 47042 is of type GDT: BusinessTransactionDocumentProduct. There is a 1:1 relationship 47044 between the Product entity 47042 and the Item entity 47034.

(vii) Customs Information Package

The CustomsInformation package 47038 groups customs information which is relevant in a CustomsVendorDeclaration entity 47012. It includes a PreferentialStatement entity 47046 and a NonPreferentialProductConstituent entity 47048.

(a) Preferential Statement Entity

The PreferentialStatement entity 47046 is the legally binding statement of vendors on goods they have delivered, which allows the buyer to claim customs tariff preferences for these goods. The PreferentialStatement entity 47046 can include: a StatusCode which is a coded representation of the status of a PreferentialStatement, and is of type GDT: CustomsPreferentialStatementStatusCode; and a DestinationCountryCode, which is a country of destination of the product. The country is of type GDT: CountryCode. There is a 1:cn relationship 47050 between the PreferentialStatement entity 47046 and the Item entity 47034. For products, a PreferentialStatement entity 47046 may be specified per country of origin and destination.

(b) Non-Preferential Product Constituent Entity

The NonPreferentialProductConstituent entity 47048 is a specification on parts or precursor materials of a product for which no customs tariff preferences can be claimed. The NonPreferentialProductConstituent entity 47048 can include: an ID, which is a sequential number of a NonPreferentialProductConstituent entity 47048, and has a type of GDT: Identifier; a CustomsCommodityClassificationCode, which is a coded representation of the customs classification of a NonPreferentialProductConstituent entity 47048, and has a type of GDT: CustomsCommodityClassificationCode; and an amount which is a value of the NonPreferentialProductConstituent entity 47048, and has a type of GDT: Amount. There is a 1:cn relationship 47052 between the NonPreferentialProductConstituent entity 47048 and the Item entity 47034.

(4) Element Structure of Customs Vendor Declaration Message

The message data type element structure for the CustomsVendorDeclarationMessage is depicted in FIG. 471. The element structure is similar to the data model, but provides additional information regarding the details of the interface. The element structure identifies the different packages 47100 in the interface, and represents the entities at various levels within the interface. As depicted in FIG. 471, the interface for CustomsVendorDeclarationMessage includes six levels 47102, 47104, 47106, 47108, 47110 and 47112. The outermost package 47100 of this interface is a CustomsVendorDeclarationMessage package 47118, which includes a CustomsVendorDeclarationMessage entity 47120 at the first level 47102, a MessageHeader package 47126, and an CustomsVendorDeclaration package 47160. The CustomsVendorDeclarationMessage entity 47120 is of a type MDT 47122 "CustomsVendorDeclarationMessage" 47124.

The MessageHeader package 47126 includes a MessageHeader entity 47128 at the second level 47104. The MessageHeader 47128 is of a type GDT 47132 BusinessDocumentMessageHeader 47134, and there is one 47130 MessageHeader entity 47128 for each MessageHeader 47126.

The MessageHeader entity 47128 includes an ID 47136, ReferenceID 47144, and CreationDateTime 47152 at the third level 47106. The ID 47136 is of a type GDT 47140 "BusinessDocumentMessageID" 47142, and there is one 47138 ID 47136 for a MessageHeader 47128. The ReferenceID 47144 is of a type GDT 47148 "BusinessDocumentMessageID" 47150, and there is zero or one 47146 ReferenceID 47144 for a MessageHeader 47128. The CreationDateTime 47152 is of a type GDT 47156 "DateTime" 471058, and there is one 47154 CreationDateTime 47152 for each MessageHeader 47128.

The CustomsVendorDeclaration package 47160 includes a CustomsVendorDeclartion entity 47162 at the second level 47104, a Party package 47194, an Attachment package 47108B, and an Item package 47118B. The CustomsVendorDeclaration entity 47162 is a "CustomsVendorDeclartion" 47168, and there is one 47164 CustomesVendorDeclaration entity 47162 for each CustomsVendorDeclaration package 47160.

The CustomsVendorDeclaration 47162 includes an ID 47170, BuyerID 47178, CreationDate 47186, and BuyerParty 47196 at the third level 47106. The ID 47170 is of a type GDT 47174 "BusinessTransactionDocumentID" 47176, and there is zero or one 47172 ID 47170 for each CustomsVendorDeclaration 47162. The BuyerID 47178 is of type GDT 47182 "BusinessTransactionDocumentID 47184, and there is zero or one 47180 BuyerID 47178 for each CustomesVendorDeclaration 47162. The CreationDate 47186 is of a type GDT 47190 "Date" 47192, and there is one 47188 CreationDate 47186 for each CustomsVendorDeclaration 47162.

The Party package 47194 includes a BuyerParty 47196 and a VendorParty 47152A at the third level 47106. The BuyerParty 47196 is of a type GDT 47100A "BusinessTransactionDocumentParty" CC002A, and there is one 47198 BuyerParty 47196 for each Party 47194.

The Buyer Party 47196 includes an InternalID 47104A, BuyerID47112A, VendorID 47120A, Address 47128A and CotactPerson CC36A at the fourth level 47108. The InternalID 47104A is of a type GDT 47108A "PartyInternalID" 47110A, and there is zero or one 47106A InternalID 47104A for each BuyerParty 47196. The BuyerID 47112A is of a type GDT 47116A "PartyPartyID" 47118A, and there is zero or one 47114A BuyerID 47112A for each BuyerParty 47196. The VendorID 47120A is of a type GDT 47124A "PartyPartyID" 47126A, and there is zero or one 47122A VendorID 47120A for each BuyerParty 47196. The Address 47128A is of a type GDT 47132A "Address" 47134A, and there is one Address 47128A for each BuyerParty 47196. The ContactPerson 47136A is of a type GDT 47140A "ContactPerson" 4714A, and there is zero or one 47138A ContactPerson 47136A for each BuyerParty 47196.

The ContactPerson 47136A includes an Address 47144A at the fifth level 47110. The Address 47144A is of a type GDT 47148A "Address" 47150A, and there is one 47146A Address 47144A for each Contact Person 47136A.

The VendorParty 47152A is of a type GDT 47156A "BusinessTransactionDocumentParty" 47158A, and there is one 47154A for each Party 47194. The VendorParty 47152A includes an InternalID 47160A, a BuyerID 47168A, a VendorID 47176A, an Address 47184A, and a ContactPerson 47192A at the fourth level 47108. The InteralID 47160A is of a type GDT 47164A "PartylnteralID" 47166A, and there is zero or one 47162A InternalID 47160A for each VendorParty 47152A. The BuyerID 47168A is of a type GDT 47172A "PartyPartyID" 47174A, and there is zero or one 47170A BuyerID 47168A for each VendorParty 47152A. The VendorID 47176A is of a type GDT 47180A "PartyPartID" 47182A, and there is zero or one 47178A for each VendorParty 47152A. The Address 47184A is of a type GDT 47188A "Address" 47190A, and there is one 47186A for each VendorParty 47152A.

The ContactPerson 47192A is of a type GDT 47196A "ContactPerson" 47198A, and there is zero or one 47194A ContactPerson 47192A for each VendorParty 47152A. The ContactPerson 47192A includes an Address 471000B at the fifth level 47110. The Address 47100B is of type GDT 47104B "Address" 47106B, and there is one 47102B Address 47100B for each Contact Person 47192A.

The Attachment package 47108B includes an Attachment entity 47110B at the third level 47106. The Attachment entity 47110B is at the type GDT 47114B "Attachment" 47116B, and there is any number of 47112B Attachment entities 47110B for each Attachment package 47108B.

The Item package 47118B includes an Item entity 47120B at the third level 47106, a ProductInformation 47152B package, and a CustomsInformation 47194B package. The Item entity 47120B is of type "CustomsVendorDeclarationItem" 47126B, and there is any number of 47122B Item entities 47120B for each Item package 47118B.

The Item entity 47120B includes a ValidityPeriod 47128B, a PreferentialOriginCountryCode 47136B, and a CustomsCommodityClassificationCode 47144B at the fourth level 47108. The ValidityPeriod 47128B is of a type GDT 47132B "DatePeriod" 47134B, and there is one CC30B ValidityPeriod 47128B for each Item 47120B. The PreferentialOriginCountryCode 47136B is of a type GDT 47140B "CountryCode" 47142B, and there is zero or one 47138B for each Item 47120B. The CustomsCommodityClassificationCode 47144B is of a type GDT 47148B "CustomsCommodityClassificationCode" 47150B, and there is zero or one 47146B CustomsCommodityClassificafionCode 47144B for each Item 47120B.

The ProductInformation package 47152B includes a Product 47154B at the fourth level 47108. The Product 47154B is of a type GDT 47158B "BusinessTransactionDocumentProduct" 47160B, and there is one 47156B Product 47154B for each Productlnformafion 47152B. The Product 47154B includes an InternalID 47152B, a BuyerID 47170B, a VendorID 47178B, and a Note 47186B at the fifth level 47110. The InternalID 47162B is of a type GDT 47166B "ProductlnteralID" 47168B, and there is zero or one 47164B for each Product 47154B. The BuyerID 47170B is of a type GDT CC74B "ProductPartyID" 47176B, and there is zero or one 47172B BuyerID 47170B for each Product 47154B. The VendorID 47178B is of a type GDT 47182B "ProductPartyID" 47184B, and there is zero or one 47180B VendorID CC78B for each Product 47154B. The Note 47186B is of a type GDT 47190B "Note" 47192B, and there is zero or one 47188B Note 47186B for each Product 47154B.

The CustomsInformation package 47194B includes a PreferentialStatement 47196B at the fourth level 47108. The PreferentialStatement 47196B is of a type "CustomsVendorDeclarationItemPreferentialStatement" 47102C, and there is any number of 47198B PreferentialStatement 47196B for each CustomsInformation 47194B.

The PreferentialStatement 47196B includes a StatusCode 47104C, DestinationCountryCode 47112C, and NonPreferenetialCommodityConstituent 47122C at the fifth level 47110. The StatusCode 47104C is of a type GDT 47108C "CustomPreferentalStatementStatusCode" 47110C, and there is zero or one 47106C StatusCode 47104C for each PreferentialStaement 47196B. The DestinationCountryCode 47112C is of a type GDT 47116C "CountryCode" 47118C, and there is one 47114C for each DestinationCountryCode 47112C. The NonPreferentialCommodityConstituent 47122C is of a type "CustomsVendorDeclarationItem-PreferentialStatementNonPreferentialProductConstitutent" 47128C, and there is any number of NonPreferentialCommodityConstiturent 47122C for each PreferenetialStaement 47196B. The NonPreferentialCommodityConstituent 47122C includes an ID 47130C, CustomesCommodityClassificationCode 47138C, and Amount 47146C entities at the sixth level 47112. The ID 47130C is of a type CCT 47134C "Identifier" 47136C, and there is one 47132C ID 47130C for each NonPreferentialCommodityConstituent 47122C. The CustomsCommodityClasifiecationCode 47138C is of a type GDT 47142C "CustomsCommodityClassificationCode 47144C, and there is one 47140C CustomsCommodityClassificationCode 47138C for each NonPreferentialCommodityConstituent 47122C. The Amount 47146C is of a type GDT 47150C "Amount" 47152C, and there is one 47148C Amount 47146C for each NonPreferentialCommodityConstituent 47122C.

jj) Invoice Interfaces

The interfaces InvoiceRequest and InvoiceConfirmation exchange invoices and invoice confirmations between an invoicing party and an invoice recipient (e.g. between a seller and a buyer) in a B2B process. The InvoiceInformation message is used to inform interested applications of received, verified, and accepted invoices and of cancellations of these invoices. The InvoiceSettlementReleaseRequest message is used to request the release of an invoice for settlement.

In some implementations, companies can create invoices in electronic as well as in paper form. Traditional methods of communication, such as mail or fax, for invoicing are cost intensive, prone to error, and relatively slow, since the data must be recorded manually. Electronic communication eliminates such problems.

The motivating business scenarios for the Invoice Request and Invoice Confirmation messages are the Procure to Stock (PTS) and Sell from Stock (SFS) scenarios. In the PTS scenario, goods are purchased and settled using the invoice interfaces. In the PTS scenario, goods are sold and invoiced using the invoice interfaces.

The InvoiceRequest and InvoiceConfirmation messages directly integrate the applications implementing these interfaces, and also form the basis for mapping data to widely-used XML standard formats such as RosettaNet, PIDX (Petroleum Industry Data Exchange), xCBL (XML Common Business Library), and CIDX (Chemical Industry Data Exchange).

The SupplierInvoiceInformation, SupplierInvoiceSettlementReleaseRequest and SupplierInvoiceCancellationExecutionRequest messages are motivated by the Leasing business scenario.

Leasing is a business process that involves three parties: the lessee, lessor, and vendor. In this business process, a vendor provides the lessee with a certain item in return for a payment. The financing for this item is handled by the lessor as an intermediate party.

The details of the leasing process are as follows. A leasing contract is concluded between the lessor and lessee. The lessor orders the relevant product from the vendor. The vendor then delivers this product to the lessor and issues an invoice to the lessor. The lessor does not settle this invoice until he or she has received advance payments (for example, the first installments) from the lessee, as agreed in the leasing contract.

Since the leasing contract is usually modeled in the lessor's sales system, this system first has to be informed by Invoicing that the vendor's invoice has been verified and accepted (InvoiceInformation) before it can request that the invoice be released for settlement (InvoiceSettlementReleaseRequest). However, the lessor's sales system can also come to the conclusion that an invoice has to be cancelled because, for example, the lessee has not yet paid any of the lease installments. In this case, Invoicing has to perform suitable follow-on actions since it is the recipient of a request to cancel the invoice (SupplierInvoiceCancellationExecutionRequest).

(1) Message Types (a) InvoiceRequest

An InvoiceRequest is a legally binding notification of payables or receivables for delivered goods and rendered services and, usually, a payment request for these goods and services. The structure of the message type InvoiceRequest is specified by the message data type InvoiceMessage. The message of message type InvoiceRequest is sent from the invoicing party to the invoice recipient, and is used to start a new invoicing process. It transfers (as defined) invoices in the broader sense. This includes the specific invoice (request to settle a payable), the debit memo, and the credit memo.

(b) InvoiceConfirmation

An InvoiceConfirmation is a response sent by the recipient to the invoicing party confirming or rejecting the entire invoice received or stating that it has been assigned temporarily the status "pending". The structure of the message type InvoiceConfirmation is specified by the message data type InvoiceMessage. The message of message type InvoiceConfirmation is sent from the invoice recipient to the invoicing party. It is used to confirm or reject an entire invoice, or to assign it temporarily the status "pending". An InvoiceConfirmation is not mandatory in a B2B invoicing process. However, it helps to automate collaborative processes and dispute management.

(c) SupplierInvoiceInformation

A SupplierInvoiceInformation is a piece of information from Invoicing about an accepted invoice or its cancellation. The structure of the message type SupplierInvoiceInformation is specified by the message data type SupplierInvoiceInformationMessage.

(d) SupplierInvoiceSettlementReleaseRequest

A SupplierInvoiceSettlementReleaseRequest is the request to release an accepted invoice for settlement. The structure of the message type SupplierInvoiceSettlementReleaseRequest is specified by the message data type SupplierInvoiceSettlementReleaseRequestMessage.

(e) SupplierInvoiceCancellationExecutionRequest

A SupplierInvoiceCancellationExecutionRequest is the request to cancel a vendor invoice. The structure of the message type SupplierInvoiceCancellationExecutionRequest is specified by the message data type SupplierInvoiceCancellationExecutionRequestMessage. The receiving system decides how the cancellation request should be implemented. Depending on the extent to which the vendor invoice has been processed, it can simply be deleted and the invoicing party informed of this, for example, or it might be the case that a cancellation invoice has to be generated and posted.

(2) Message Choreography

FIG. 472 depicts an exemplary message choreography for an invoicing process between business applications or entities (e.g., Billing entity 47202, Invoicing entity 47204, and Purchasing (SRM) entity 47206) implementing Invoicing Interfaces in accordance with the subject matter described herein. In the implementation shown in FIG. 472, an invoice is created after a goods receipt or service performance has been confirmed. Billing 47202 starts the invoicing process by sending an InvoiceRequest message 47208.

Upon receiving the InvoiceRequest message 47208, Invoicing 47204 can use the InvoiceConfirmation message 47210 to completely accept or reject the invoice received or to assign it temporarily the status "pending".

The InvoiceConfirmation message 47210 is not a negotiation tool (as is the case in order management), since the only options available are either to accept or reject the entire invoice. The invoice data in the InvoiceConfirmation message 47210 merely confirms that the invoice has been forwarded correctly and does not communicate any desired changes to the invoice. Therefore, the InvoiceConfirmation message 47210 contains the precise invoice data that was received and verified by Invoicing 47204.

If Invoicing 47204 rejects an invoice, Billing 47202 can send a new invoice after checking the reason for rejection (AcceptanceStatus and ConfirmationDescription at Invoice and InvoiceItem level).

If the invoice recipient does not respond, the invoice is generally regarded as being accepted and the invoicing party can expect payment.

Interested applications are informed by Invoicing 47204 of accepted invoices (InvoiceInformation 47212) and authorized recipients of this information can request that Invoicing 47210 release the invoice for settlement (InvoiceSettlementReleaseRequest 47214). If the interested application does not accept the invoice, a request that the invoice be canceled can be created instead (SupplierInvoiceCancellationExecutionRequest 47216).

The evaluated receipt settlement (ERS) procedure is based on the data in the good receipt or service confirmation. The buyer must have agreed with the relevant seller that no invoice is to be created for the orders. Instead, the buyer or the company responsible for verifying invoices posts an invoice based on the purchase order and its confirmation. As a result, invoice variances or communication errors are avoided and transactions are completed more quickly.

In the ERS process, the partner functions of the invoice recipient and the invoicing party are swapped with regard to the invoicing process. Generally speaking, the buyer creates the invoices and then sends a credit memo for the amount of the payable concerned, using the InvoiceRequest message 47208, to either the seller or the company responsible for invoicing.

In the invoicing process, messages can be transmitted once in order (EQIO) and serialized using message queues. Each invoicing process can have its own message queue (as opposed to one queue for all invoices) so that one failed message does not block all other messages in the entire system.

In an invoicing process, the IDs of the objects and messages concerned are used to correlate the individual messages. An InvoiceRequest message 47208 is referenced by the ReferenceMessageID in an InvoiceConfirmation 47210 or in a subsequent InvoiceRequest 47208 (credit memo). The InvoiceConfirmation 47210 contains the same Invoice object as the InvoiceRequest 47208 to which it is related but has its own MessageID. This procedure can correspond to the RosettaNet standard.

In accordance with the Communication Paradigms, forward processing can be used to resolve errors. A recipient system can accept formally correct incoming messages.

In order to restart a process that is corrupt due to a failed message, the invoicing system provides an option for transmitting the current status of the invoice using an Invoice Request message 47208.

Many different business conflict scenarios are conceivable following receipt of an invoice. A few examples are: the invoice is not approved due to discrepancies in price and/or quantity; the invoice is approved, posted, and paid, but the triggering purchase order is then cancelled; invoicing occurs before goods are received; and goods that have been paid for are defective and have to be returned.

Business conflict scenarios (dispute management) are resolved using invoice confirmations and invoice cancellations (see InvoiceCancellationInvoiceIndicator). For instance, an invoice that was issued prior to goods receipt or which contains excessive price or quantity specifications can initially be assigned the status "pending" using the invoice confirmation. The invoice can then be approved and paid once the goods or credit memo has been checked. If payment has already been made or if the invoice has already been posted in Accounting, an invoice cancellation or a credit memo for partly defective products, for example, can be issued.

(3) Message Interfaces

Invoice messages are implemented by four message interfaces, two on the invoice recipient side (InvoiceRequest_In and InvoiceConfirmation_Out) and two on the invoicing party side (InvoiceRequest_Out and InvoiceConfirmation_In).

(4) Country-Specific Enhancements

Often, the invoice must be supplemented with country-specific information in order to fulfill the legal requirements of the particular region. For instance, an invoice is not recognized as being legal in Germany unless it contains the "tax evasion combat number," issued for business partners by the tax office.

Country-specific invoice information may result in the message data type Invoice being enhanced in the future or in additions made by customers according to their individual requirements. In either case, the specific information can be added to the appropriate business objects.

For example, the data type InvoiceMessage can include the country-specific element NotaFiscalTypeCode (Invoice Package). The NotaFiscalTypeCode is a coded representation of nota fiscal types. Examples of special nota fiscal types are complementary (similar to the credit or debit memo); corrections; cancellations; and conhecimento (freight invoice).

In addition, the data type InvoiceMessage can include the country-specific element PaymentReferenceID (PaymentInformation Package). The PaymentReferenceID is an identification number that sellers in Scandinavian countries include on outgoing invoices. Sellers in Switzerland, which has adopted the procedure of inpayment slips with reference numbers, also use payment reference numbers. Since the buyer indicates the payment reference number when paying the invoice, it is clear to the seller which invoice is being paid. The payment reference consists of a sequential number and a check digit. The check digits can be calculated differently in every country.

In the schemeAgencyID attribute of the PaymentReferenceID, the number of the participant using the procedure of inpayment slips with reference numbers can be specified. This identification number is issued to each participant in the procedure by the Swiss PostFinance.

(5) Message Data Type SupplierInvoiceInformationMessage

FIGS. 473A-D depict a data model of the message data type SupplierInvoiceInformationMessage. The message data type SupplierInvoiceInformationMessage contains the business information that is relevant for sending a business document in a message. The SupplierInvoiceInformationMessage package 47301 contains a MessageHeader package 47302, a SupplierInvoice package 47303, and a SupplierInvoiceInformationMessage entity 47304. The message data type SupplierInvoiceInformationMessage thus provides the structure for the message type SupplierInvoiceInformation and the interfaces that are based on it.

(a) MessageHeader Package

A MessageHeader package 47302 groups together the business information that is relevant for sending a business document in a message. The MessageHeader package 47302 is not required in the SupplierInvoiceInformationMessage. The MessageHeader package 47302 contains the MessageHeader entity 47305. There is a 1:c relationship between the SupplierInvoiceInformationMessage entity 47304 and the MessageHeader entity 47305. Where a relationship is identified between entitites in FIGS. 473A-D for this Interface, the respective relationship is a 1:c relationship unless otherwise noted herein or indicated in FIGS. 473A-D. The MessageHeader package 47302 also includes a SenderParty entity 47306 and a RecipientParty entity 47307. There is a 1:c relationship between the MessageHeader entity 47305 and the SenderParty entity 47306 and between the MessageHeader entity 47305 and the RecipientParty entity 47307.

(b) SupplierInvoice Package

The SupplierInvoice package 47303 groups together a Party package 47308, a Location package 47309, a DeliveryInformation package 47310, a PaymentInformation package 47311, a PriceInformation package 47312, a Tax package 47313, a Attachment package 47314, a Description package 47315, a Item package 47316, and a SupplierInvoice entity 47317.

(i) SupplierInvoice

The SupplierInvoice entity 47317 is a vendor's list of payables and receivables for delivered goods and rendered services which are paid for by a certain time. There is a 1:1 relationship between the SupplierInvoiceInformationMessage entity 47304 and the SupplierInvoice entity 47317. The SupplierInvoice entity 47317 provides not only the remuneration and tax to be paid by the participating business partners for products and services, but also provides detailed information about terms of payment and delivery. The SupplierInvoice entity 47317 contains the following elements: ID, BillToID, TypeCode, DateTime, CancellationInvoiceIndicator, AcceptanceStatusCode, and Note. The ID is an invoice number; a unique identifier that is assigned to the invoice by the invoicing party. The ID is of type GDT: BusinessTransactionDocumentID. The BillToID is a unique identifier that is assigned to the invoice by the invoice recipient and is of type GDT: BusinessTransactionDocumentID. The TypeCode is a coded representation for the invoice type (a specific invoice/payment request, debit memo, or credit memo) and is of type GDT: BusinessTransactionDocumentTypeCode. The DateTime is an invoice date and is of type GDT: DateTime. The CancellationInvoiceIndicator indicates whether the invoice is a cancellation invoice or not and is of type GDT: InvoiceCancellationInvoiceIndicator. The AcceptanceStatusCode is a coded representation for the status of the invoice recipient's acceptance of the invoice and is of type GDT: AcceptanceStatusCode. The Note is a short description/name of the invoice and is of type GDT: Note. The SupplierInvoice entity 47317 is of type GDT: SupplierInvoice.

In some implementations, monetary amounts and prices are in the same currency within any given invoice and the invoice number attributes are not used. In some implementations, The BillToID can be used only in the InvoiceConfirmation. In some implementations, the AcceptanceStatusCode must not be used in the InvoiceRequest. In some implementations, in the InvoiceConfirmation, the AcceptanceStatusCode must be set to one of the following options: AP (accepted—invoice has been accepted), AJ (pending—it is not yet possible to make a final decision about the invoice), and RE (rejected—the invoice has been rejected).

In some implementations, the AcceptanceStatusCode, along with the BillToID and the ConfirmationDescription are the only elements that can be used in the InvoiceConfirmation. No other data may contain discrepancies with the invoice data received.

(ii) Party Package

The Party package 47308 groups together business partners that can be involved in an invoicing process. The Party package 47308 contains the entities: BillToParty entity 47318, BillFromParty entity 47319, BuyerParty entity 47320, SellerParty entity 47321, ProductRecipientParty entity 47322, VendorParty entity 47323, ManufacturerParty entity 47324, PayerParty entity 47325, PayeeParty entity 47326, and CarrierParty entity 47327. There is a 1:1 relationship between the SupplierInvoice entity 47317 and the BillToParty entity 47318 as well as the SupplierInvoice entity 47317 and the BillFromParty entity 47319.

A default logic is used for business partners: business partners that are specified at SupplierInvoice level are used for items for which corresponding partners are not explicitly transmitted. The default logic is used for the partner as a whole, including the contact person. At item level, parts of a partner cannot be specified more precisely. The default logic is only a simplified version of the transmitted message. In terms of logic, partners at SupplierInvoice level behave as if they have been explicitly transmitted for all the items of the message.

The BillToParty entity 47318 is a company or person to which the invoice for deliveries received or services rendered is to be sent. The BillToParty entity 47318 is of type GDT: BusinessTransactionDocumentParty. The BillToParty entity 47318 can also fulfill the function of BuyerParty entity 47320, ProductRecipientParty entity 47322, and PayerParty entity 47325.

The BillFromParty entity 47319 is a company or person executing the invoicing process. The BillFromParty entity 47319 is of type GDT: BusinessTransactionDocumentParty. The BillFromParty entity 47319 can also fulfill the function of SellerParty entity 47321, VendorParty entity 47323, and PayeeParty entity 47326.

The BuyerParty entity 47320 is a company or person authorizing the deliveries or services. The BuyerParty entity 47320 is of type GDT: BusinessTransactionDocumentParty. In some implementations, the BuyerParty entity 47320 must always be specified. If no BuyerParty entity 47320 is explicitly specified in an invoice, the BillToParty entity 47318 also acts as the BuyerParty entity 47320.

The SellerParty entity 47321 is a company or person selling (sales/service area). The SellerParty entity 47321 is of type GDT: BusinessTransactionDocumentParty. In some implementations, the SellerParty entity 47321 must always be specified. If no SellerParty entity 47321 is explicitly specified in an invoice, the BillFromParty entity 47319 also acts as the SellerParty entity 47321.

The ProductRecipientParty entity 47322 is a company or person to which goods are delivered or for which services are rendered. The ProductRecipientParty entity 47322 is of type GDT: BusinessTransactionDocumentParty. If no ShipToLocation is explicitly specified in an invoice, the address of the ProductRecipientParty entity 47322 is the delivery address. If no ProductRecipientParty entity 47322 is explicitly specified in an invoice, the BuyerParty entity 47320 also acts as the ProductRecipientParty entity 47322.

The VendorParty entity 47323 is a company or person delivering the goods or providing the service. The VendorParty entity 47323 is of type GDT: BusinessTransactionDocumentParty. If no ShipFromLocation is explicitly specified in an invoice, the address of the VendorParty entity 47323 is the ship-from address. If no VendorParty entity 47323 is explicitly specified in an invoice, the SellerParty entity 47321 also acts as the VendorParty entity 47323. The CarrierParty entity 47327, not the VendorParty entity 47323, is the company or person that is solely responsible for transporting the goods.

The ManufacturerParty entity 47324 is a company or person that produced the goods being invoiced. The ManufacturerParty entity 47324 is of type GDT: BusinessTransactionDocumentParty. The ManufacturerParty entity 47324 can be used for invoice items relating to materials. The ManufacturerParty entity 47324 can be used to uniquely define the context of a ManufacturerProductID.

The PayerParty entity 47325 is a company or person that pays for the goods or services rendered. The PayerParty entity 47325 is of type GDT: BusinessTransactionDocumentParty. If no PayerParty entity 47325 is explicitly specified in an invoice, the BillToParty entity 47318 also acts as the PayerParty entity 47325.

The PayeeParty entity 47326 is a company or person that receives payment for the goods or services rendered. The PayeeParty entity 47326 is of type GDT: BusinessTransactionDocumentParty. If no PayeeParty entity 47326 is explicitly specified in an invoice, the BillFromParty entity 47319 also acts as the PayeeParty entity 47326.

The CarrierParty entity 47327 is a company or person that transported the goods. The CarrierParty entity 47327 is of type GDT: BusinessTransactionDocumentParty. In some implementations, the CarrierParty entity 47327 should only be used for invoice items relating to materials; it can be ignored by the recipient for services. The CarrierParty entity 47327 can be required for fiscal law purposes in certain business transactions involving delivery across countries.

(iii) Location Package

The Location package 47309 groups together locations that can be involved in an invoicing process. The Location package 47309 contains the entities: ShipToLocation entity 47328 and ShipFromLocation entity 47329. A default logic is used for locations: locations that are specified at SupplierInvoice level are used for items for which corresponding locations are not explicitly transmitted. ShipToLocation entity 47328 and ShipFromLocation entity 47329 can be used to provide a more detailed description of the flow of goods (between delivery point and dispatch point). In certain countries (e.g., USA) this detailed information is required for calculating taxes.

The ShipToLocation entity 47328 is a location to which goods were delivered or where services were rendered. The ShipToLocation entity 47328 is of type GDT: BusinessTransactionDocumentLocation. For example, a sold-to party (BuyerParty entity 47320) headquartered in California orders steel beams for a building. The construction site (ShipToLocation entity 47328) for the building is located in Arizona. The tax amount is calculated using the tax rates that apply in Arizona.

The ShipFromLocation entity 47329 is the location from which goods were shipped. The ShipFromLocation entity 47329 is of type GDT: BusinessTransactionDocumentLocation.

(iv) DeliveryInformation Package

The DeliveryInformation package 47310 summarizes information for a delivery in the invoicing process. The DeliveryInformation package 47310 contains the entity: DeliveryTerms entity 47330. A default logic similar to that used for parties is also used for DeliveryTerms entity 47330 (see the Party package 47308).

The DeliveryTerms entity 47330 is the conditions and agreements that apply when delivering and transporting the ordered goods and providing the necessary services and activities for this. The DeliveryTerms entity 47330 is of type GDT: DeliveryTerms. Of the GDT DeliveryTerms entity 47330, the elements Incoterms 47331 and Transport can only be used for material items. The default logic only takes Incoterms 47331 and Transport into account for material items; they are ignored for other items.

(v) PaymentInformation Package

The PaymentInformation package 47311 summarizes payment information in the invoicing process. The PaymentInformation package 47311 contains the entities: CashDiscountTerms entity 47332 and PaymentForm entity 47333.

The CashDiscountTerms entity 47332 contains the payment conditions (cash discount rates and payment deadlines). The CashDiscountTerms entity 47332 is of type GDT: CashDiscountTerms. The CashDiscountTerms entity 47332 contains MaximumDiscount 47334 and NormalDiscount 47335.

The PaymentForm entity 47333 specifies the method of payment for a product. The PaymentForm entity 47333 contains the element PaymentFormCode and the entity PaymentCard entity 47336. The PaymentFormCode is a coded representation of the payment form and is of type GDT: PaymentFormCode. The PaymentCard entity 47336 is a credit card or customer card. The PaymentCard entity 47336 is of type GDT: PaymentCard.

(vi) PriceInformation Package

The PriceInformation package 47312 summarizes information about the total amount invoiced for the products provided or services rendered, which are listed at item level. The PriceInformation package 47312 contains a Price entity 47337.

The Price entity 47337 is the total amount invoiced for products delivered and services rendered, including the tax and net portions. The Price entity 47337 contains the elements: GrossAmount, NetAmount, TaxAmount, and ExchangeRate. The GrossAmount is a gross invoice amount (net amount plus tax amount) and is of type GDT: Amount. The NetAmount is a net invoice amount and is of type GDT: Amount. The TaxAmount is a tax amount in invoice and is of type GDT: Amount. The ExchangeRate is an exchange rate information for an invoice. The exchange rate can be specified if the products ordered are settled in a currency that is different than the currency in the purchase order. This is often the case with collective invoices, for example. The ExchangeRate is of type GDT: ExchangeRate. A default logic is used for exchange rate information: exchange rates that are specified at SupplierInvoice level are used for items for which corresponding exchange rates are not explicitly transmitted.

(vii) Tax Package

The Tax package 47313 summarizes all information about tax price components in the total amount invoiced for products delivered or services rendered. The Tax package 47313 contains the ProductTax entity 47338.

The ProductTax entity 47338 is the tax amount invoiced for products delivered or services rendered, added for all invoice items. The ProductTax entity 47338 is of type GDT: ProductTax. There is a 1:cn relationship between the SupplierInvoice entity 47317 and the ProductTax entity 47338.

(viii) Attachment Package

The Attachment package 47314 groups together attachment information relating to the invoice. The Attachment package 47314 contains the Attachment entity 47339.

The Attachment entity 47339 is a document of any type that relates to the invoice and is transmitted with it. The Attachment entity 47339 is of the type GDT: Attachment. There is a 1:cn relationship between the SupplierInvoice entity 47317 and the Attachment entity 47339.

(ix) Description Package

The Description package 47315 groups together explanatory texts relating to the invoice. The Description package 47315 contains the entities: Description entity 47340 and ConfirmationDescription entity 47341.

The Description entity 47340 is a natural language text regarding the invoice, and is visible to all business parties. The Description entity 47340 is of type GDT: Description. The Description entity 47340 can be used for all types of textual information relating to the invoice transmitted. For example, the text can be information stating that a Sales employee responsible will be on vacation starting on a specific date and indicating the name and telephone number of a substitute starting on that date.

The ConfirmationDescription entity 47341 is a natural language text regarding the invoice confirmation, and is visible to business parties. The ConfirmationDescription entity 47341 is of type GDT: Description. In some implementations, in an InvoiceRequest, the ConfirmationDescription entity 47341 is not used. The ConfirmationDescription entity 47341 can be used for all types of textual information relating to the invoice confirmation. For example, an invoice recipient's reason for rejecting a particular invoice.

(c) SupplierInvoiceItem Package

The SupplierInvoiceItem package 47316 groups together information about the amounts invoiced or credited for products, broken down by type and scope of the goods delivered and/or services rendered. The SupplierInvoiceItem package 47316 contains the following packages: ProductInformation package 47342, PriceInformation package 47343, Tax package 47344, Party package 47345, Location package 47346, DeliveryInformation package 47347, BusinessTransactionDocumentReference package 47348, Accounting package 47349, Attachment package 47350, and Description package 47351. The SupplierInvoiceItem package 47316 contains the following entities: SupplierInvoiceItem entity 47352 and HierarchyRelationship entity 47353.

The SupplierInvoiceItem entity 47352 is a part of an invoice that contains the prices and taxes for the quantity of a product that has been delivered or for a service that has been rendered. In addition to the information about prices and taxes, SupplierInvoiceItem entity 47352 includes information about participating business partners, payment conditions and delivery terms, if these differ from information provided in the invoice header. There is a 1:n relationship between the SupplierInvoice entity 47317 and the SupplierInvoiceItem entity 47352. The SupplierInvoiceItem entity 47352 has the following elements: ID, BillToID, TypeCode, DeliveryPeriod, and Quantity.

The ID is an invoice item number; a unique identifier that is assigned to the invoice item by the invoicing party. The ID is of type GDT: BusinessTransactionDocumentItemID.

The BillToID is a unique identifier that is assigned to the invoice item by the invoice recipient. The BillToID is of type GDT: BusinessTransactionDocumentItemPartyID.

The TypeCode is a coded representation for the invoice item type (invoice item in the sense of a receivable, credit memo item, delivery cost item, subsequent debit item, or subsequent credit item). The TypeCode is of type GDT: BusinessTransactionDocumentItemTypeCode . In some implementations, an invoice cannot be changed for legal reasons, therefore invoices that contain errors can either be cancelled completely and reissued, or adjusted using debit and credit amounts in another invoice. In this case, only the difference amount required to correct the financial data is transferred and not, for example, the new absolute value for a product per price unit of measure. It is also important to note that the amount to be settled in a subsequent credit or debit item cannot be offset against the open purchase order or delivery quantity.

For example, in one case there may be a purchase order item such as 10 pens at € 3 each, an invoice item such as 10 pens at € 3 each, and a subsequent debit item such as 2 pens at € 0.50 each. After the bill has been issued (invoice item 10), it transpires that 2 pens cost € 3.50 rather than € 3. In this case, the invoicing party can send a subsequent debit for the 2 items in a second invoice, which represents a financial adjustment for the total settlement amount.

The DeliveryPeriod is the delivery date of the products invoiced or the time period in which the service was rendered. The DeliveryPeriod is of type GDT: DateTimePeriod.

The Quantity is the quantity invoiced. The Quantity is of type GDT: Quantity.

The SupplierInvoiceItem entities 47352 are arranged hierarchically using the HierarchyRelationship entity 47353. An invoice must contain at least one item. In some implementations, The BillToID can be used only in the InvoiceConfirmation. In some implementations, an invoice can contain either only payable items, credit memo items and delivery cost items, or subsequent debit items and subsequent credit items. In some implementations, Item categories are not combined.

The HierarchyRelationship entity 47353 is the relationship between a subitem and a higher-level parent item in an item hierarchy. There is a 1:c relationship between the SupplierInvoiceItem entity 47352 and the HierarchyRelationship entity 47353 as well as a 1:cn relationship between the SupplierInvoiceItem entity 47352 and the HierarchyRelationship entity 47353. The HierarchyRelationship entity 47353 contains the elements: ParentItemID, ParentItemBillToID, and TypeCode. The ParentItemID is a reference to a parent item with the item number assigned by the invoicing party. The SupplierInvoiceItemHierarchyRelationshipParentItemID is of type GDT: BusinessTransactionDocumentItemID. The ParentItemBillToID is a reference to a parent item with the item number assigned by the invoice recipient. The SupplierInvoiceItemHierarchyRelationshipParentItemID is of type GDT: BusinessTransactionDocumentItemID. The TypeCode is a coded representation of the type of hierarchical relationship between the subitem and its higher-level parent item. The SupplierInvoiceItemHierarchyRelationshipTypeCode is of type GDT: BusinessTransactionDocumentItemHierarchyRelationshipTypeCode.

There are various types of items, and they are governed by different integrity conditions (constraints). An item can have several integrity types. In this case, the item must satisfy all the integrity conditions for all of its integrity types. The description of the integrity types indicates which integrity types can be combined with one another and how they can be combined. The various integrity types are as follows:

Standard items are items to which no lower-level items have been assigned. An items that is not referenced by another item using the element ParentItemID in the HierarchyRelationship entity is a standard item.

Hierarchy items are items to which at least one other lower-level item has been assigned in the hierarchy. An item that is referenced by at least one other item, using the ParentItemID is a hierarchy item. Items are either standard or hierarchy items.

Subitems are items that have been assigned below a hierarchy item and not directly to the purchase order header. Subitems can be both standard items and hierarchy items. An item that references another item using the ParentItemID is a subitem.

Material items are items whose product is a material. An item whose ProductTypeCode is “1” (Material) is a material item.

Service items are items whose product is a service. An item whose ProductTypeCode is “2” (Service) is a service item.

Unspecified product items are items for which no information is provided indicating whether they refer to a material or a service. An item whose ProductTypeCode is not specified is an unspecified product item. Items are material, service, or unspecified product items. An unspecified product item must satisfy all the integrity conditions of a material, service, or limit item.

Grouping hierarchy items are hierarchy items that logically group together other items. Multilevel grouping hierarchies are permitted, i.e., a grouping hierarchy item can contain subitems that are also grouping hierarchy items. A hierarchy item whose subitems have HierarchyRelationshipTypeCode “002” (group) is a grouping hierarchy item; in some implementations, subitems with a different HierarchyRelationshipTypeCode are not permitted. Grouping hierarchy items are not permitted as subitems of other types of hierarchy items.

Substitute product hierarchy items are hierarchy items for which there is at least one subitem with a substitute product. Multilevel substitute product hierarchies are not permitted, i.e., a substitute product can itself not be substituted. A hierarchy item whose subitems all have HierarchyRelationshipTypeCode “006” (substitute product) is a substitute product hierarchy item; subitems with a different HierarchyRelationshipTypeCode are not permitted. Substitute product hierarchy items can be used as subitems in grouping hierarchies.

BOM hierarchy items are hierarchy items that group together other items in a BOM. Multilevel BOM hierarchies are permitted. A hierarchy item with at least one subitem with HierarchyRelationshipTypeCode “001” (bill of material) is a BOM hierarchy item; additional subitems are permitted with the HierarchyRelationshipTypeCode “003” (discount in kind).

Discount in kind hierarchy items are hierarchy items for which a goods discount is granted in the form of an inclusive or exclusive bonus quantity. Multilevel discount in kind hierarchies are not permitted, i.e., no discount in kind can be granted for discount in kind. The goods discount is described in the form of one or more subitems in the discount in kind hierarchy item. A Hierarchy item with at least one subitem with HierarchyRelationshipTypeCode “003” (discount in kind) is a discount in kind hierarchy item; additional subitems are permitted with the HierarchyRelationshipTypeCode “001” (bill of material). Hierarchy items are grouping, BOM, or discount in kind hierarchy items. A hierarchy item can be both a BOM and a discount-in-kind hierarchy item, if a discount in kind has been granted for a BOM.

(i) SupplierInvoiceItemProductInformation Package

The SupplierInvoiceItemProductInformation package 47342 summarizes information for identifying, describing, and classifying a product in an invoice item. The ProductInfoprmation package 47342 contains the entities: Product entity 47354 and ProductCategory entity 47355. The SupplierInvoiceItemProductInformation package 47342 can not be used in grouping hierarchy items.

The Product entity 47354 identifies, describes, and classifies the product that has been invoiced. The Product entity 47354 is of type GDT: BusinessTransactionDocumentProduct. With the exception of grouping hierarchy items, at least either the product number or product description (note) must be provided when a new item is created. If both the product number and description are provided, the description is merely additional information in the message and can be ignored by the recipient.

The ProductCategory entity 47355 is the assignment of an invoiced product to a higher-level, company-specific category. The ProductCategory entity 47355 is of type GDT: BusinessTransactionDocumentProductCategory. The product category is derived directly from the product if a product number is provided for the product. It can differ for the buyer and seller if they have classified the same product differently. This can be permitted and tolerated by the systems involved.

(ii) SupplierInvoiceItemPriceInformation Package

The SupplierInvoiceItemPriceInformation package 47343 summarizes information about the amount invoiced for a product delivered or a service rendered, including all price components. The PriceInformation package 47343 contains the Price entity 47356

The Price entity 47356 is the amount invoiced for a delivered product or a service rendered, including the tax and net portions. The Price entity 47356 contains the elements: GrossAmount, NetAmount, TaxAmount, NetUnitPrice, ExchangeRate, PricingDate and the Component entity 47357. The GrossAmount is a gross item amount (net amount plus tax amount) and is of type GDT: Amount. The NetAmount is a net item amount and is of type GDT: Amount. The TaxAmount is a tax amount for an item and is of type GDT: Amount. The NetUnitPrice is a net price for the base quantity of a product that was used to calculate the net amount (e.g. € 10 for 5 pieces) and is of type GDT: Price. The ExchangeRate is information about the exchange rate. The exchange rate can be specified if the quantity ordered of a product is settled in a currency that is different from the currency in the purchase order item. This is often the case with collective invoices, for example. The ExchangeRate is of type GDT: ExchangeRate. The PricingDate is a date on which the price is calculated and is of type GDT: Date. In some implementations, the elements NetAmount and GrossAmount are specified if the invoice item specified is not a grouping hierarchy item. A default logic is used for the exchange rate information if an exchange rate is not specified explicitly at item level or if the exchange rate at invoice level applies.

The Component entity 47357 is a non-fiscal part of a price in an invoice item. The Component entity 47357 is of type GDT: PriceComponent. An invoice item can contain several price components. There is a 1:cn relationship between the Price entity 47356 and the Component entity 47357. A detailed list of the price components (including, e.g., rounding difference clearing, etc.) is provided to help the invoice recipient understand how the amount invoiced was calculated. In B2B standards, such as RosettaNet (PIP 3C3 version 1.1) or xCBL 3.0, price components are not available in this form. As a result, the usual elements in B2B standards, namely, GrossAmount and NetAmount, are highlighted and shown (redundantly) along with the detailed list that includes price components. Taxes are also price components that can be shown explicitly because of legal aspects. Tax information (ProductTax) is not shown redundantly.

(iii) SupplierInvoiceItemTax Package

The SupplierInvoiceItemTax package 47344 summarizes information about tax price components in the total amount invoiced for products delivered or services rendered. The Tax package 47344 contains a ProductTax entity 47358.

The ProductTax entity 47358 is a tax component of an invoice item that is incurred for each tax type and rate. The ProductTax entity 47358 is of type GDT: ProductTax. There is a 1:cn relationship between the SupplierInvoiceItem entity 47352 and the ProductTax entity 47358.

(iv) SupplierInvoiceItemParty Package

The SupplierInvoiceItemParty package 47345 groups the business partners that can be involved in an invoice item and that differ from the partners specified at SupplierInvoice level. The Party package 47345 contains the entities: BuyerParty entity 47359, SellerParty entity 47360, ProductRecipientParty entity 47361, VendorParty entity 47362, ManufacturerParty entity 47363, and CarrierParty entity 47364. These entities perform operations analogous to the entities of the same name within the Party package 47308.

(v) SupplierInvoiceItemLocation Package

The SupplierInvoiceItemLocation package 47346 groups together locations that can be involved in an invoicing process and that differ from the locations specified at SupplierInvoice level. The Location package 47346 contains the entities: ShipToLocation entity 47365 and ShipFromLocation entity 47366. These entities perform operations analogous to the entities of the same name within the Location package 47309.

(vi) SupplierInvoiceItemDeliveryInformation Package

The SupplierInvoiceItemDeliveryInformation package 47347 summarizes information for a delivery in the invoicing process where the information differs from the information specified at SupplierInvoice level. The DeliveryInformation package 47347 contains a DeliveryTerms entity 47367, which contains an Incoterms entity 47368. These entities perform operations analogous to the entities of the same name within the DeliveryInformation package 47310.

(vii) SupplierInvoiceItemBusinessTransactionDocumentReference Package

The SupplierInvoiceItemBusinessTransactionDocumentReference package 47348 groups together references to business documents that can occur in the invoicing process at item level. The BusinessTransactionDocumentReference package 47348 contains the entities: PurchaseOrderReference entity 47369, SalesOrderReference entity 47370, DeliveryReference entity 47371, ServiceAcknowledgementReference entity 47372, QriginInvoiceReference entity 47373, PurchaseContractReference entity 47374, SalesContractReference entity 47375, BuyerProductCatalogueReference entity 47376, SellerProductCatalogueReference entity 47377, ProjectReference entity 47378, and ProjectElementAssignment entity 47379.

In some implementations, the entities in the BusinessTransactionDocumentReference package 47348 cannot be used in grouping hierarchy items. If possible, individual items are referenced in the invoice from item level (e.g. purchase order item 10 in purchase order 4711 is directly referenced from purchase order item 1). If an item assignment is not recognized, an entire document can be referenced (e.g., contract 0815 is referenced from purchase order 4712).

The PurchaseOrderReference entity 47369 is a reference to a purchase order or an item within a purchase order. The PurchaseOrderReference entity 47369 is of type GDT: BusinessTransactionDocumentReference. The PurchaseOrderReference entity 47369 contains the purchase order number and purchase order item number issued by the buyer. There can be more than one PurchaseOrderReference. There is a 1:cn relationship between the SupplierInvoiceItem entity 47352 and the PurchaseOrderReference entity 47369.

The SalesOrderReference entity 47370 is a reference to a sales order or an item within a sales order. The SalesOrderReference is of type GDT: BusinessTransactionDocumentReference. The SalesOrderReference entity 47370 contains the order number and order item number issued by the seller. There can be more than one SalesOrderReference. There is a 1:cn relationship between the SupplierInvoiceItem entity 47352 and the SalesOrderReference entity 47370.

The DeliveryReference entity 47371 is a reference to a delivery. The DeliveryReference entity 47371 is of type GDT: BusinessTransactionDocumentReference. The DeliveryReference entity 47371 contains the delivery note number assigned by the seller.

The ServiceAcknowledgementReference entity 47372 is a reference to a confirmation, created by the seller, that a service has been rendered (e.g., in the service entry system). The ServiceAcknowledgementReference entity 47372 is of type GDT: BusinessTransactionDocumentReference. The ServiceAcknowledgementReference entity 47372 includes the service acknowledgment number issued by the service provider.

The OriginInvoiceReference entity 47373 is a reference to an invoice previously sent. The OriginInvoiceReference entity 47373 is of type GDT: BusinessTransactionDocumentReference. The OriginInvoiceReference entity 47373 contains the invoice number issued by the invoicing party. This reference can be required if a credit memo is issued for an amount that has been invoiced. The PurchaseContractReference entity 47374 is a reference to a purchase contract or an item within a purchase contract. The PurchaseContractReference entity 47374 is of type GDT: BusinessTransactionDocumentReference. Provided there is no agreement to the contrary, the seller can be responsible for determining the correct SalesContractReference for a specified PurchaseContractReference entity 47374.

The SalesContractReference entity 47375 is a reference to a sales contract or an item within a sales contract. The SalseContractReference entity 47375 is of type GDT: BusinessTransactionDocumentReference.

The BuyerProductCatalogueReference entity 47376 is a reference to a buyer's product catalog or an item within such a catalog. The BuyerProductCatalogueReference entity 47376 is of type GDT: CatalogueReference. The BuyerProductCatalogueReference entity 47376 can be filled when an invoice item refers to a catalog whose number and item numbers were issued by the buyer.

The SellerProductCatalogueReference entity 47377 is a reference to a seller's product catalog or an item within such a catalog. The SellerProductCatalogueReference entity 47377 is of type GDT: CatalogueReference. The SellerProductCatalogueReference entity 47377 can be filled when an invoice item refers to a catalog whose number and item numbers were issued by the seller.

The ProjectReference entity 47378 is a reference to a project or an element within a project. The ProjectReference entity 47378 is of type GDT: ProjectReference. In some implementations, the ProjectReference entity 47378 is not used in the InvoiceMessage. The ProjectElementAssignment entity 47379 is an assignment between two project elements to which an invoice item refers. The ProjectElementAssignment entity 47379 is of the type GDT: ProjectElementAssignment. In some implementations, the ProjectElementAssignment entity 47379 is not used in the InvoiceMessage. Either a ProjectReference entity 47378 or a ProjectElementAssignment entity 47379 can be specified, not both. Only one assignment of a role (ProjectElementTypeCodes="2") to a task (ProjectElementTypeCodes="1") is permitted. In a procurement process, the ProjectElementAssignment entity 47379 continues to be passed on when goods are received, services entered, and invoicing occurs. This means that a project system always has access to information about the progress of a requirement/requisition.

(viii) SupplierInvoiceItemAccounting Package

The SupplierInvoiceItemAccountingObjectSetAssignment package 47349 groups together account assignment information for Accounting. The Accounting package 47349 contains an AccountingObjectSetAssignment entity 47380. The SupplierInvoiceItemAccounting package 47349 contains information about account assignment objects in Accounting to which an invoice item refers. An account assignment can be divided up (in percentage form) among different objects (e.g. cost center, order, etc.). In some implementations, the total of the various assignments must be 100%.

The AccountingObjectSetAssignment entity 47380 is the assignment of an invoice item net amount or of a partial amount (i.e. a percentage, value-based, or quantity-based amount) to a set of account assignment objects (AccountingObjectSet). The AccountingObjectSetAssignment entity 47380 is of type GDT: AccountingObjectSetAssignment. In some implementations, the AccountingObjectSetAssignment entity 47380 is not used in the InvoiceMessage. For example, 40% of the invoice item amount can be assigned to cost center CC1000 and profit center PC3050, and the remaining 60% to sales order 100002345.

(ix) SupplierInvoiceItemAttachment Package

The SupplierInvoiceItemAttachment package 47350 groups together attachment information relating to the invoice that differ from the attachment information specified at SupplierInvoice level. The Attachment package 47350 contains an Attachment entity 47381. This entity performs operations analogous to the entity of the same name within the Attachment package 47314.

(x) SupplierInvoiceItemDescription Package

The SupplierInvoiceItemDescription package 47351 groups together explanatory texts relating to the invoice that differ from the texts at SupplierInvoice level. The Description package 47351 contains the entities: Description entity 47382 and ConfirmedDescription entity 47383. These entities perform operations analogous to the entities of the same name within the Description package 47315.

(6) Message Data Type: SupplierInvoiceSettlementReleaseRequestMessage

FIG. 474 depicts a data model of the message data type SupplierInvoiceSettlementReleaseRequestMessage. The message data type SupplierInvoiceSettlementReleaseRequestMessage contains the business information that is relevant for sending a business document in a message. A SupplierInvoiceSettlementReleaseRequestMessage package 47402 contains the packages: MessageHeader package 47404 and SupplierInvoice package 47406. The SupplierInvoiceSettlementReleaseRequestMessage package 47402 also contains a SupplierInvoiceSettlementReleaseRequestMessage entity 47408. The message data type SupplierInvoiceSettlementReleaseMessage thus provides the structure for the message type SupplierInvoiceSettlementReleaseRequest and the interfaces that are based on it.

(a) MessageHeader Package

The MessageHeader package 47404 groups together the business information that is relevant for sending a business document in a message. The MessageHeader package 47404 is not required for the SupplierInvoiceSettlementReleaseRequest message.

(b) SupplierInvoice Package

The SupplierInvoice package 47406 groups together invoices. The SupplierInvoice package 47406 contains a SupplierInvoice entity 47410.

The SupplierInvoice entity 47410 in the view required for the SupplierInvoiceSettlementReleaseRequest contains the information that is necessary to request the release of an accepted invoice for settlement. There is a 1:1 relationship between the SupplierInvoiceSettlementReleaseRequestMessage entity 47408 and the SupplierInvoice entity 47410. The SupplierInvoice entity 47410 contains a BillToID element. The BillToID element is a unique identifier that is assigned to the invoice by the invoice recipient and is of type GDT: BusinessTransactionDocumentID. The SupplierInvoice entity 47410 is of type GDT: SupplierInvoiceSettlementReleaseRequest. In some implementations, the BillToID element must be specified.

(7) Message Data Type: SupplierInvoiceCancellationExecutionRequestMessage

FIG. 475 depicts a data model of the message data type SupplierInvoiceCancellationExecutionRequestMessage. The message data type SupplierInvoiceCancellationExecutionRequestMessage contains the business information that is relevant for sending a business document in a message. A SupplierInvoiceCancellationExecutionRequestMessage package 47502 contains the packages: MessageHeader package 47504 and SupplierInvoice package 47506. The message data type SupplierInvoiceCancellationMessage thus provides the structure for the message type SupplierInvoiceCancellationExecutionRequest and the interfaces that are based on it.

(a) MessageHeader Package

The MessageHeader package 47504 groups together the business information that is relevant for sending a business document in a message. The MessageHeader package 47504 is not required for the SupplierInvoiceCancellationExecutionRequest message.

(b) SupplierInvoice Package

The SupplierInvoice package 47506 groups the SupplierInvoice. The SupplierInvoice package 47506 contains a SupplierInvoice entity 47510.

The SupplierInvoice entity 47510 in the view required for the SupplierInvoiceCancellationExecutionRequest contains the information that is necessary to request the deletion of a SupplierInvoice. There is a 1:1 relationship between the SupplierInvoiceCancellationExecutionRequestMessage entity 47508 and the SupplierInvoice entity 47510. The SupplierInvoice entity 47510 contains an ID element. The ID element is a unique identifier for a procurement invoice. The ID is of type GDT: BusinessTransactionDocumentID. The SupplierInvoice entity 47510 is of type GDT: SupplierInvoiceCancellationExecutionRequest.

(8) Message Data Type: InvoiceMessage

FIGS. 476A-D depict a data model of the message data type InvoiceMessage. The message data type InvoiceMessage groups together the business information that is relevant for sending an invoice in a B2B business process between business partners. An InvoiceMessage package 47601 contains a MessageHeader package 47602 and an Invoice package 47603 as well as an InvoiceMessage entity 47604.

The following rules apply to the use and changing of elements or entities in the message data type InvoiceMessage within an invoicing process:

Data relating to the InvoiceRequest cannot be changed in the InvoiceConfirmation. The additional information passed on is the invoice confirmation status and a description of the invoice recipient.

If the use of certain elements or entities of the InvoiceMessage message data type is not permitted in a message type that is based on the InvoiceMessage message data types, this can be specified explicitly in the "Notes" section.

The message data type InvoiceMessage thus provides the structure for the message types InvoiceRequest and InvoiceConfirmation, and the interfaces that are based on them.

(a) MessageHeader Package

The MessageHeader package 47602 groups together the business information that is relevant for sending a business document in a message. The MessageHeader package 47602 contains a MessageHeader entity 47605

The MessageHeader entity 47605 groups together the following business information from the perspective of the sending application: information for identifying the business document in a message, information about the sender, and, if necessary, information about the recipient. The MessageHeader entity 47605 is broken down into the following entities: SenderParty entity 47606 and RecipientParty entity 47607. The MessageHeader entity 47605 is of type GDT: BusinessDocumentMessageHeaderParty. The MessageHeader entity 47605 contains the following elements: ID, ReferenceID, and CreationDateTime. The ID is a means of identifying a business document in a technical message and is of type GDT: BusinessDocumentMessageID. The ReferenceID is a means of identifying another instance of a business document in a technical message that the current business document references and is of type GDT: BusinessDocumentMessageID. The CreationDateTime is a date on which a business document in a technical message was generated and is of type GDT: DateTime. The MessageID is set by the sending application, and may not be required in the InvoiceInformationMessage message data type.

The SenderParty entity 47606 is the party that is responsible for sending a business document at business application level. The SenderParty entity 47606 is of type GDT: BusinessDocumentMessageHeaderParty. The SenderParty entity 47606 can be specified by the sending application; in this way, it can name a contact person for any problems that arise with the message. This can used when there is an additional infrastructure, such as a marketplace, between the sender and the recipient. The SenderParty entity 47606 only plays an auxiliary role during message transfer, and so can be ignored by the recipient application. However, it can be specified by the sender especially if the participating partners are not transmitted with the Invoice package.

The RecipientParty entity 47607 is the party that is responsible for receiving a business document at business application level. The RecipientParty entity 47607 is of type GDT: BusinessDocumentMessageHeaderParty. The RecipientParty entity 47607 can be specified by the sending application; in this way, it can name a recipient contact person for any problems that arise with the message. This can be used when there is an additional infrastructure, such as a marketplace, between the sender and the recipient. The RecipientParty entity 47607 only plays an auxiliary role during message transfer, and so can be ignored by the recipient application. However, it can be specified by the sender especially if the participating partners are not transmitted with the Invoice package.

(b) Invoice Package

The Invoice package 47603 summarizes invoice information that is required for a B2B invoicing process. The Invoice is a list of payables and receivables for delivered goods and rendered services which have to be paid for by a certain time.

Apart from "SupplierInvoice" changing to "Invoice," the Invoice package 47603 in the InvoiceMessage message data type is analogous to the SupplierInvoice package 47303 in the SupplierInvoiceInformationMessage message data type, but does not contain the following components: ProjectReference and ProjectElementAssignment entities in BusinessTransactionDocumentReference package 47648, and Accounting package in InvoiceItem package 47616.

(a) Element Structure for Invoice

The message data type element structure for the Invoice message is depicted in FIG. 477A-J. The element structure is similar to the data model, but provides additional information regarding the details of the interface. The element structure identifies the different packages 47700 in the interface, and represents the entities at various levels within the interface. As depicted in FIG. 477A, the interface for Invoice Message includes five levels 47702, 47704, 47706, 47708, and 47710. The outermost package of this interface is a Invoice package 47718, which includes a Invoice entity 47720 at the first level 47702. The Invoice entity 47720 is of a data type MDT 47722 "InvoiceMessage" 47724.

The Invoice message package 47718 includes a MessageHeader package 47728 and an Invoice package 47790. The MessageHeader package 47728 includes a MessageHeader entity 47730. The MessageHeader entity 47730 is a GDT 47734 "MessageHeader" 47736, and there is either zero of one 47732 MessageHeader entity 47730 for each MessageHeader package 47728. The MessageHeader entity 47730 includes an ID 47740, a ReferenceID 47750, a CreationDateTime 47760, a SenderParty 47770, and a Recipient 47780. The ID 47740 is a GDT 47744 "MessageID" 47744, and there is one ID 47740 for a MessageHeader entity 47730. The Reference ID 47750 is a GDT 47754 "MessageID" 47756, and there is either zero or one 47752 Reference ID 47750 for a MessageHeader entity 47730. The CreationDateTime 47760 is a GDT 47764, and there is one 47762 for a CreationDateTime 47760 MessageHeader entity 47730. The SenderParty 47770 is a GDT 47774 "BusinessDocumentMessageHeaderParty" 47776, and there is either zero or one 47772 SenderParty 47770 for a MessageHeader entity 47730. The Recipient Party 47780 is a GDT 47784 "BusinessDocumentMessageHeaderParty" 47786, and there is either zero or one 47782 RecipientParty 47780 for a MessageHeader entity 47730.

The Invoice package 47790 includes an Invoice entity 47792. There is one 47794 Invoice entity 47792 for each Invoice package 47790. The Invoice entity 47792 is an ID 47798, a BillToID 47708A, a TypeCode 47718A, a DateTime 47728A, a CancellationInvoiceIndicator 47738A, an AcceptanceStatusCode 47748A, a Note 47758A at the third level. The ID 47798 is a GDT 47702A "BusinessTransactionDocumentID" 47704A, and there is one 47700A ID 47798 for an Invoice entity 47792. The BillToID 47708A is a GDT 47712A "BusinessTransactionDocumentID" 47714A, and there is either zero or one 47710A BillToID 47708A for an Invoice entity 47792. The TypeCode 47718A is a GDT 47722A "BusinessTransactionDocumentTypeCode" 47724A, and there is one 47720A TypeCode 47718A for an Invoice entity 47792. The DateTime 47728A is GDT 47732A "DateTime" 47734A, and there is one 47720A DateTime 47728A for an Invoice entity 47792. The CancellationInvoiceIndicator 47738A is a GDT 47742A "InvoiceCancellation-Invoice" 47744A, and there is either zero or one 47740A CancellationInvoiceIndicator 47739A for an Invoice entity 47792. The AcceptanceStatusCode 47748A is a GDT 47752A "AcceptanceStatusCode" 47754A, and there is either zero or one 47750A AcceptanceStatusCode 47748A for an Invoice entity 47792. The Note 47758A is a GDT 47762A "Note" 47764A, and there is either zero or one 47760A Note 47758A for an Invoice entity 47792.

The Invoice package 47790 includes a Party package 47768A, a Location package 47770B, a Delivery Information package 47792B, a Price Information package 47742C, a Tax package 47790C, an Attachment package 47702D, a Description package 47712D, and an Item package 47734D. The Party package 47768A includes a BillToParty 47770A, a BillFromParty 47780A, a BuyerParty 47790A, a SellerParty 47700B, ProductRecipientParty 47710B, a VendorParty 47720B, a ManufacturerParty 47730B, a PayerParty 47740B, a PayeeParty 47750B, and a CarrierParty 47760B. The BillToParty 47770A is a GDT 47774A "BusinessTransactionDocumentParty" 47776A, and there is one 47772A BillToParty 47770A for each Party 47768A. The BillFromParty 47780A GDT 47784A "BusinessTransactionDocumentParty" 47776A, and there is one 47782A BillFromParty 47780A for each Party 47768A. The BuyerParty 47790A GDT 47794A "BusinessTransactionDocumentParty" 47796A, and there is either zero or one 47792A BuyerParty 47790A for each Party 47768A. The SellerParty 47700B is a GDT 47704B "BusinessTransactionDocumentParty" 47706B, and there is either zero or one 47702B SellerParty 47700B for each Party 47768A. The ProductRecipientParty 47710B GDT 47714B "BusinessTransactionDocumentParty" 47716B, and there is either zero or one 47712B ProductRecipientParty 47710B for each Party 47768A. The VendorParty 47720B GDT 47724B "BusinessTransactionDocumentParty" 47726B, and there is either zero or one 47722B VendorParty 47720B for each Party 47768A. The ManufacturerParty 47730B is a GDT 47734B "BusinessTransactionDocumentParty" 47736B, and there is either zero or one 47732B ManufacturerParty 47730B for each Party 47768A. The PayerParty 47740B is a GDT 47744B "BusinessTransactionDocumentParty" 47746B, and there is either zero or one 47762B PayerParty 47740B for each Party 47768A. The PayeeParty 47750B is a GDT 47754B "BusinessTransactionDocumentParty" 47756B, and there is either zero or one 47752B "PayeeParty 47750B for each Party 47768A. The CarrierParty 47760B is GDT 47764B "BusinessTransactionDocumentParty" 47766B, and there is either zero or one 47762B CarrierParty 47760B for each Party 47768A.

The Location package 47770B includes a ShipToLocation entity 47772B and a ShipFromLocation 47782B. The ShipToLocation entity 47772B is GDT 47776B "BusinessTransactionDocumentParty" 47778B, and there is either zero or one 47774B ShipToLocation entity 47772B for each Location package 47770B. The ShipFromLocation entity 47782B is a GDT 47786B "BusinessTransactionDocumentParty" 47788B, and there is either zero or one 47784B ShipFromLocation entity 47782B for each Location package 47770B.

The DeliveryInformation entity 47792B includes a DeliveryTerms 47794B that is a GDT 47798B "DeliveryTerms" 47700C, and there is either zero or one 47796B DeliveryTerms 47794B for each DeliveryInformation package 47792B.

The PaymentInformation package 47704C includes a CashDiscountTerms 47706C and a PaymentForm 47716C at the third level. The CashDiscountTerms entity 47706C is a GDT 47710C "CashDiscountTerms" 47712C, and there is either zero or one 47708C CashDiscountTerms entity 47706C for each PaymentInformation package 47704C. There is either zero or one 47718C PaymentForm entity 47716C for each PaymentInformation package 47704C. The PaymentForm entity includes a Code 47722C and a PaymentCard 47732C at the fourth level. The Code is a GDT 47726C "PaymentFormCode" 47728C, and there is either zero or one 47724C Code 47722C for a PaymentForm entity 47716C. The PaymentCard 47732C is a GDT 47736C "PaymentCard" 47738C, and there is either zero or one 47734C PaymentCard 47732C for a PaymentForm 47716C.

The PriceInformation package 47742C includes a Price entity 47744C at the third level. There is one 47746C Price entity 47744C for each PriceInformation package 47742C. The Price entity 47744C includes a GrossAmount 47750C, a NetAmount 47760C, a TaxAmount 47770C, and an ExchangeRate 47780C at the fourth level. The GrossAmount 47750C is a GDT 47754C "Amount" 47756C,and there is one 47752C GrossAmount 47750C for a Price 47744C. The NetAmount 47760C is a GDT 47764C "Amount" 47766C, and there is either zero or one 47762C NetAmount 47760C for a Price 47744C. The TaxAmount 47770C is a GDT 47774C "Amount" 47776C, and there is either zero or one 47772C TaxAmount 47770C for a Price 47744C. The ExchangeRate 47780C is a GDT 47784C "ExchangeRate" 47786C, and there is either zero or one 47782C ExchangeRate 47780C for a Price 47744C.

The Tax package 47790C includes a ProductTax 47792C. The ProductTax entity 47792C is a GDT 47796C "ProductTax" 47798C, and there is zero to any number 47706C ProductTax 47792C for each Tax package 47790C.

The Attachment package 47702D includes an Attachment 47704D. The Attachment entity 47704D is a GDT 47796C "Attachment" 47798C, and there is zero to any number 47706C Attachment 47704D for each Attachment package 47702D.

The Description package 47712D includes a Description 47714D and a ConfirmedDescription 47724D. The Description 47714D is a GDT 47718D "Description" 47720D, and there is either zero or one 47716D Description 47714D for each Description package 47712D. The ConfirmedDescription 47724D is a GDT 47728D "Description" 47730D, and there is either zero or one 47726D ConfirmedDescription 47724D for each Description package 47712D.

The Item package 47734D includes an Item entity 47736D. There is one to any number 47738D Item entity 47736D for each Item package 47734D. The Item entity 47736D includes an ID 47742D, a BillToID 47752D, a TypeCode 47762D, a Quantity 47772D, a Hierarchy Relationship 47782D, and a DeliveryPeriod 47708E at the fourth level. The ID 47742D is a GDT 47746D "BusinessTransactionDocumentID" 47748D, and there is one 47744D ID 47742D for an Item entity 47736D. The BillToID 47752D is a GDT 47756D "BusinessTransactionDocumentID" 47758D, and there is either zero or one 47754D BillToID 47752D for an Item entity 47736D. The TypeCode 47762D is a GDT 47746D "BusinessTransactionDocumentID" 47748D, and there is one 47764D TypeCode 47762D for an Item entity 47736D. The Quantity 47772D is a GDT 47776 "Quantity" 47778, and there is either zero or one 47674 Quantity 47772D for an Item entity 47736D. There is either zero or one Hierarchy Relationship 47586D for each Item entity 47762D.

The HierarchyRelationship 47782D includes a Parent Item ID 47788D and a Type Code 47798D at the fifth level. The Parent Item ID 47788D is a GDT 47792D "BusinessTransactionDocumentItemID" 47794D, and there is one 47790D Parent Item ID 47788D for a HierarchyRelationship 47782D. The Type Code 47798D is a CDT 47702E "BusinessTransactionDocumentItemHierarchyRelationshipTypeCode" 47704*e*, and there is one 47700E Type Code 47798D for a HierarchyRelationship 47782D.

The DeliveryPeriod 47708E is a GDT 47712E "DateTimePeriod" 47714E, and there is either zero or one 47710E DeliveryPeriod 47708E for an Item entity 47736D.

The ProductInformation package 47718E includes a Product entity 47720E and a ProductCategory entity 47730E. The Product entity 47720E is a GDT 47724E "BusinessTransactionDocumentProduct" 47726E, and there is either zero or one 47722E Product entity 47720E for each Product Information 47718E. The ProductCategory entity 47730E is a GDT 47734E "BusinessTransactionDocument-ProductCategory" 47736E, and there is either zero or one 47732E ProductCategory entity 47730E for each Product Information package 47718E.

There is one 47746C Price entity 47742E for each PriceInformation package 47740E. The Price entity 47742E includes a GrossAmount 47748E, a NetAmount 47758E, a TaxAmount 47768E, a NetUnitPrice 47778E, an ExchangeRate 47788E, a PriceDate 47798E, and a Component 47708F at the fifth level. The GrossAmount 47748E is a GDT 47752E "Amount" 47754E,and there is one 47750E GrossAmount 47748E for a Price 47742E. The NetAmount 47758E is a GDT 47762E "Amount" 47764E, and there is either zero or one 47760E NetAmount 47758E for a Price 47742E. The TaxAmount 47768E is a GDT 47772E "Amount" 47774E, and there is either zero or one 47770E TaxAmount 47768E for a Price 47742E. The NetUnitPrice 47778E is a GDT 47782E "Price" 47784E, and there is either zero or one NetUnitPrice 477C78E for a Price entity CC42E. The ExchangeRate 47788C is a GDT 47792E "ExchangeRate" 47794E, and there is either zero or one 47790E ExchangeRate 47788E for a Price 47742E. The PriceDate 47798E is a GDT 47702F "Date" 47704F, and there is either zero or one 47700F PriceDate 47798F for a Price 47742E. The Component 47708F is a GDT 47712F "PriceComponent" 47714F, and there is zero to any number 47710F Component 47708F for a Price 47742E.

The Tax package 47718F includes a ProductTax 47720F that is a GDT 47724F "ProductTax" 47726F, and there is zero to any number 47722F Product Tax 47720F for each Tax package 47718F.

The Party package 47730F includes a BuyerParty 47732F, a SellerParty 47742F, ProductRecipientParty 47752F, a VendorParty 47762F, a ManufacturerParty 47772F, and a CarrierParty 47782F. The BuyerParty 47732F GDT 47736F "BusinessTransactionDocumentParty" 47738F, and there is either zero or one 47734F BuyerParty 47732F for each Party package 47730F. The SellerParty 47742F is a GDT 47746F "BusinessTransactionDocumentParty" 47748F, and there is either zero or one 47744F SellerParty 47742F for each Party package 47730F. The ProductRecipientParty 47750F GDT 47756F "BusinessTransactionDocumentParty" 47758F, and there is either zero or one 47754F ProductRecipientParty 47752F for each Party package 47730F. The VendorParty 47762F GDT 47766F "BusinessTransactionDocument-Party" 47768F, and there is either zero or one 47764F VendorParty 47762F for each Party package 47730F. The ManufacturerParty 47772F is a GDT 47776F "BusinessTransactionDocumentParty" 47778F, and there is either zero or one 47774F ManufacturerParty 47772F for each Party package 47730F. The CarrierParty 47782F is a GDT 47786F "BusinessTransactionDocumentParty" 47788F, and there is either zero or one 47784F The CarrierParty 47782F for each Party package 47730F.

The Location package 47792F includes a ShipToLocation 47794F and a ShipFromLocation 47704G at the fourth level. The ShipToLocation 47794F is GDT 47798F "BusinessTransactionDocumentLocation" 47700G, and there is either zero or one 47796F ShipToLocation 47794F for each Location package 47792F. The ShipFromLocation 47704G is a GDT 47708G "BusinessTransactionDocumentLocation" 47710G, and there is either zero or one 47706G ShipFromLocation 47704G for each Location package 47792F.

The DeliveryInformation 47714G includes a Delivery Terms 47716G that is a GDT 47720G "DeliveryTerms" 47722G, and there is either zero or one 47718G DeliveryTerms 47716G for each Delivery Information 47714G.

The BusinessTransactionDocumentReference 47726G includes a PurchaseOrderReference 47728G, a SalesOrderReference 47738G, a DeliveryReference 47748G, a Service AcknowledgtementReference 47758G, a OriginInvoiceReference 47768G, a PurchaseContractReference 47778G, a SalesContractReference 47788G, a BuyerProductCatalogReference 47798G, and a SellerProductCatalog 47708H at the fourth level. The PurchaseOrderReference 47728G is a GDT 47732G "BusinessTransactionDocumentReference" 47734G, and there is zero to any number 47730G PurchaseOrderReference 47728G for each BusinessTransactionDocumentReference package 47726G. The SalesOrderReference 47738G is a GDT 47742G "BusinessTransactionDocumentReference" 47744G, and there is zero to any number 47740G SalesOrderReference 47738G for each BusinessTransactionDocumentReference 47726G. The DeliveryReference 47748G is a GDT 47752G "BusinessTransactionDocumentReference" 47754G, and there is either zero or one 47750G DeliveryReference 47748G for each BusinessTransactionDocumentReference 47726G. The ServiceAcknowledgementReference 47758G is a GDT 47762G "BusinessTransactionDocumentReference" 47774G, and there is either zero or one 47760G ServiceAcknowdgementReference 47758G for each BusinessTransactionDocumentReference 47726G. The OriginInvoiceReference 47768G is a GDT 47772G "BusinessTransactionDocumentReference" 47774G, and there is either zero or one 47770G OriginInvoiceReference 47768G for each BusinessTransactionDocumentReference 47726G. The PurchaseContractReference 47778G is a GDT 47782G "BusinessTransactionDocumentReference" 47784G, and there is either zero or one 47780G PurchaseContractReference 47778G for each BusinessTransactionDocumentReference 47726G. The SalesContractReference 47788G is a GDT 47792G "BusinessTransactionDocumentReference" 47794G, and there is either zero or one 47790G SalesContractReference 47788G for each BusinessTransactionDocumentReference package 47726G. The BuyerProducatCatalogReference 47798G is a GDT 47702H "CatalogueReference" 47704H, and there is either zero or one 47700H SellerProducatCatalogReference 47798G for each BusinessTransactionDocumentReference package 47726G. The SellerProducatCatalogReference 47708H is a GDT 47712H "CatalogueReference" 47701H, and there is either zero or one 4771 0H SellerProducatCatalogReference 47708H for each BusinessTransactionDocumentReference package 47726G.

The Attachment package 47718H includes an Attachment entity 47720H that is a GDT 47724H "Attachment" 47726H, and there is from zero to any number 47722H Attachment entity 47720H for each Attachment package 47718H.

The Description package 47730H includes a Description 47732H and a ConfirmedDescription 47742H. The Description 47732H is a GDT 47736H "Description" 47738H, and there is either zero or one 47734H Description 47732H for each Description package 47730H. The ConfirmedDescription 47742H is a GDT 47746H "Description" 47748H, and there is either zero or one 47744H ConfirmedDescription 47742H for each Description package 47730H.

kk) Loan Contract Interfaces

LoanContract Interfaces can be used to implement a financial services business process that provides an integrated customer-oriented solution for processing a loan contract creation request between business applications or entities (e.g., Contract Origination entity 47802 and Loan Management entity 47804 in FIG. 478). The LoanContract Interfaces are based on the following message types: a LoanCalculationQueryMessage, a LoanCalculationResponseMessage, a LoanContractCreateRequestMessage, and a LoanContractCreateConfirmationMessage.

The motivating business scenario for LoanContract Interfaces are the financial services business scenario "Contract Origination" which represents an integrated customer-oriented solution ranging from the bank counter (mySAP CRM) to the back office (mySAP Banking/mySAP Insurance). Financial contracts originate in CRM. Loan contracts are conducted as part of loan origination. Loans are processed in SAP solutions (e.g., mySAP Banking or mySAP Insurance) or in legacy systems.

(1) Message Type(s)

(a) Loan Calculation Query

A LoanCalculationQuery is a query made to a loan management system (e.g., Loan Management (CML) 47804 in FIG. 478) requesting a loan calculation. The message data type LoanCalculationQueryMessage defines the structure of the message type LoanCalculationQuery.

(b) Loan Calculation Response

A LoanCalculationResponse is a response from the loan management system to the query requesting a loan calculation. The LoanCalculationResponse includes a responsive LoanCalculation. The message data type LoanCalculationResponseMessage defines the structure of the message type LoanCalculationResponse.

(c) Loan Contract Create Request

A LoanContractCreateRequest is a request for the loan management system to create a loan contract. The message data type LoanContractCreateRequestMessage defines the structure of the message type LoanContractCreateRequest.

(d) Loan Contract Create Confirmation

A LoanContractCreateConfirmation is a confirmation from the loan management system stating whether a loan contract has been created. The message data type LoanContractCreateConfirmationMessage defines the structure of the message type LoanContractCreateConfirmation.

(2) Message Choreography

FIG. 478 depicts an exemplary message choreography for a loan contract creation process between business applications or entities (e.g., Contract Origination entity 47802 and Loan Management (or CML) entity 47804) implementing Loan Contract Interfaces in accordance with the subject matter described herein. In the implementation shown in FIG. 478, the Contract Origination entity 47802 initiates the loan contract creation process by sending a LoanCalculationQuery 47806 to the Loan Management entity 47804. In response, the Loan Management entity 47804 sends a LoanCalculationResponse 47808 to the Contract Origination entity 47802. The LoanCalculationResponse 47808 includes a responsive LoanCalculation that may be processed by the Contract Origination entity 47802 before the Contract Origination entity 47802 sends a LoanContractCreateRequest 47810 to the Loan Management 47804. In response, the Loan Management 47804 sends a LoanContractCreateConfirmation 47812 to the Contract Origination entity 47802 to confirm the loan creation in accordance with the subject matter described herein.

(3) Message Data Type Loan Calculation Query Message

FIG. 479 depicts a data model of the message data type LoanCalculationQueryMessage. The message data type LoanCalculationQueryMessage groups the Business information that is relevant for sending the business document in a message and the object LoanCalculationQuery included in the business document. As shown in FIG. 479, message data type LoanCalculationQuery Message includes a LoanCalculationQueryMessage package 47902, which includes a MessageHeader package 47904, a LoanCalculationQuery package 47906, and a LoanCalculationQueryMessage entity 47908.

(a) Message Header Package

The MessageHeader package 47904 groups business information from the point of view of the sender application (e.g., Contract Origination entity 47802) that is relevant for sending the business document in a message. The MessageHeader package 47904 includes a MessageHeader entity 47910. There is a 1:1 relationship between the LoanCalculationQueryMessage entity 47908 and the MessageHeader entity 47910. Where a relationship is identified between entitites in FIG. 479 for this Interface, the respective relationship is a 1:1 relationship unless otherwise noted herein or indicated in FIG. 479. The MessageHeader package 47904 also includes a SenderParty entity 47912 and a RecipientParty entity 47914. There is a 1:c relationship between the MessageHeader entity 47910 and the SenderParty entity 47912 and between the MessageHeader entity 47910 and the RecipientParty entity 47914.

The SenderParty 47912 is the party responsible for sending a business document at the business application level. The SenderParty entity 47912 is of type GDT: BusinessDocumentMessageHeaderParty. There is a 1:c relationship between the MessageHeader entity 47910 and the SenderParty entity 47912.

The RecipientParty 47914 is the party responsible for receiving a business document at the business application level. The RecipientParty entity 47914 is of type GDT: BusinessDocumentMessageHeaderParty. There is a 1:cn relationship between the MessageHeader entity 47910 and the RecipientParty entity 47914.

The MessageHeader entity 47910 is of the type GDT: BusinessDocumentMessageHeader and, in one implementation, uses an ID element and a ReferenceID element.

(b) Loan Calculation Query Package

The LoanCalculationQuery package 47906 includes a ProductInformation package 47916, a LoanConditionInformation package 47918, and a LoanCalculationQuery entity 47920.

The LoanCalculationQuery entity 47920 describes the query request for a loan calculation. The LoanCalculationQuery entity 47920 includes information about the loan to be calculated, loan conditions, and type of calculation to be made. In one implementation, the LoanCalculationQuery entity 47920 includes the following elements: a LoanKeyFigureTypeCode, a MaturityPeriod, a FixedInterestPeriod, an Amount, an EffectiveYieldCalculationMethodCode, a DisagioPercent, and a DisagioDeductionEventTypeCode. The LoanKeyFigureTypeCode identifies which calculation is to be made in the loan management system and is of type GDT: LoanKeyFigureTypeCode. The MaturityPeriod is a term of the requested loan and is of type GDT: DatePeriod. The FixedInterestPeriod is a fixed interest rate period for the requested loan and is of type GDT: DatePeriod. The Amount is the requested loan amount and is of type GDT: Amount. The EffectiveYieldCalculationMethodCode is a calculation method to determine the effective interest rate and is of type GDT: EffectiveYieldCalculationMethodCode. The DisagioPercent is a disagio percent (e.g., charge made for exchanging depreciated or foreign money) of the requested loan and is of type GDT: DisagioPercent. The DisagioDeductionEventTypeCode identifies an event in which a deduction corresponding to the DisagioPercent is to be applied. The DisagioDeductionEventTypeCode is of type GDT: DisagioDeductionEventTypeCode.

In one implementation, the elements LoanKeyFigureTypeCode, FixedInterestPeriod, and Amount are required and the other elements are optional.

(i) Loan Calculation Query Product Information Package

The LoanCalculationQuery ProductInformation package 47916 groups information about the product upon which the loan is based. The LoanCalculationQuery ProductInformation package 47916 includes a ProductCategory entity 47922 and a Product entity 47924.

The ProductCategory entity 47922 identifies which (financial) product category the loan is based. The ProductCategory entity 47922 may be used, for example, to differentiate between real estate and consumer loans. The ProductCategory entity 47922 is of the type GDT: BusinessTransactionDocumentProductCategory.

The Product entity 47924 identifies which (financial) product the loan is based. The Product entity 47924 may also describe the sales-relevant design (special offers for special target groups) of the loan. The Product entity 47924 is of the type GDT: BusinessTransactionDocumentProduct. There is a 1:c relationship between the LoanCalculationQuery entity 47920 and the Product entity 47924.

(ii) Loan Calculation Query Loan Condition Information Package

The LoanCalculationQuery LoanConditionInformation package 47918 groups conditions for a loan. The conditions serve as a basis for calculating a payment plan by the recipient (e.g., Loan Management 47804). The conditions, however, may differ from the conditions agreed upon in the loan contract as identified in the message data type LoanContractCreateRequest discussed below. The LoanCalculationQuery LoanConditionInformation package 47918 includes a LoanInterestCondition entity 47926, a LoanAmortizementCondition 47928, and a LoanFeeCondition entity 47930. There is a 1:cn relationship between the LoanCalculationQuery 47920 and each of the LoanInterestCondition entity 47926, the LoanAmortizementCondition 47928, and the LoanFeeCondition entity 47930.

The LoanInterestCondition entity 47926 is an interest condition for a loan and is of type GDT: LoanInterestCondition. The LoanAmortizementCondition 47928 is a repayment condition for a loan and is of type GDT: LoanAmortizementCondition. The LoanFeeCondition entity 47930 is a fee condition for a loan and is of the type GDT: LoanFeeCondition.

(4) Message Data Type Loan Calculation Response Message

FIG. 480 depicts a data model of the message data type LoanCalculationResponseMessage. The message data type LoanCalculationResponseMessage provides the structure for messages of the type LoanCalculationResponse. The message data type LoanCalculationResponseMessage groups business information that is relevant for sending the business document in a message and an object LoanCalculation contained in the business document. As shown in FIG. 480, message data type LoanCalculationResponseMessage includes a LoanCalculationMessage package 48002, which includes a MessageHeader package 48004, a LoanCalculation package 48006, and a LoanCalculationMessage entity 48008.

(a) Message Header Package

The MessageHeader package 48004 groups business information that is relevant for sending the business document in a message from the point of view of the sender (e.g., Loan Management entity 47804). The MessageHeader package 48004 includes a MessageHeader entity 48010, a SenderParty entity 48012, and a RecipientParty entity 48014, each of which are similar to and have the same relationships as the similarly named entities described above for the MessageHeader package 47904 in the LoanCalculationQueryMessage package 47902. There is a 1:1 relationship between the LoanCalculationMessage entity 48008 and the MessageHeader entity 48010. Where a relationship is identified between entitites in FIG. 480 for this Interface, the respective relationship is a 1:1 relationship unless otherwise noted herein or indicated in FIG. 480.

(b) Loan Calculation Package

The LoanCalculation package 48006 includes a PaymentPlan package 48016 and a LoanCalculation entity 48018. The LoanCalculation entity 48018 describes the results of a loan calculation responsive to the LoanCalculationQuery. The LoanCalculation entity 48018 includes the following elements: a MaturityPeriod, an EffectiveYieldPercent, an EffectiveYieldCalculationMethodCode, and an InstallmentAmount. The MaturityPeriod is a term of the loan and is of type GDT: DatePeriod. The EffectiveYieldPercent identifies an effective interest rate for the loan. The EffectiveYieldPercent is of type GDT: Percent. The EffectiveYieldCalculationMethodCode is a calculation method used to determine the effective interest rate for the loan. The EffectiveYieldCalculationMethodCode is of type GDT: EffectiveYieldCalculationMethodCode. The InstalmentAmount identifies the loan instalment for repaying the loan, including interest and the repayment amount. The InstalmentAmount is of type GDT: Amount.

(c) Loan Payment Plan Package

The LoanPaymentPlan package 48016 includes a LoanPaymentPlan entity 48020 and a LoanPaymentPlanItem entity 48022. There is a 1:c relationship between the LoanCalculation entity 48018 and the LoanPaymentPlan entity 48020 and a 1:n relationship between the LoanPaymentPlan entity 48020 and the LoanPaymentPlanItem entity 48022.

The LoanPaymentPlan 48020 includes the planned payments for the loan. The key attributes of the loan used to calculate the payment plan are: Repayment instalments, Loan amount, Nominal interest rate, Term, Fees, and Effective interest rate.

The LoanPaymentPlanItem 48022 is a payment planned for a key date for the loan. The LoanPaymentPlanItem 48022 is of the type GDT: LoanPaymentPlanItem.

(5) Message Data Type Loan Contract Create Request Message

FIG. 481A depicts a data model of the message data type LoanContractCreateRequestMessage. The message data type LoanContractCreateRequestMessage provides the structure for messages of the type LoanContractCreateRequest. The message data type LoanContractCreateRequestMessage groups business information that is relevant for sending the business document in a message and an object LoanContract included in the business document as required to process a LoanConractCreateRequest. As shown in FIG. 481A, message data type LoanContractCreateRequestMessage includes a LoanContractCreateRequestMessage package 48102, which includes a MessageHeader package 48104, a LoanContract package 48106, and a LoanContractCreateRequestMessage entity 48108.

(a) MessageHeader Package

The MessageHeader package 48104 groups business information that is relevant for sending the business document in a message from the point of view of the sender (e.g., Contract Origination entity 47802). The MessageHeader package 48104 includes a MessageHeader entity 48110, a SenderParty entity 48112, and a RecipientParty entity 48114, each of which are similar to and have the same relationships as the similarly named entities described above for the MessageHeader package 47904 in the LoanCalculationQueryMessage package 47902. There is a 1:1 relationship between the LoanContractCreateMessage entity 48108 and the MessageHeader entity 48110. Where a relationship is identified between entitites in FIGS. 481A-C for this Interface, the respective relationship is a 1:1 relationship unless otherwise noted herein or indicated in FIGS. 481A-C.

(b) Loan Contract Package

The LoanContract package 48106 includes a Party Package 48116, a ProductInformation package 48118, a PaymentInformation package 48120, an Attachment package 48122, a LoanContractItem package 48124, and a LoanContract entity 48126.

The LoanContract entity 48126, from the perspective required by the LoanContractCreateRequest, contains all of the information that is required for creating a loan contract. The loan is based on loan conditions that define the interest rate, repayment, and fees. In addition to the loan conditions, the loan contract entity 48126 includes a description of parties to the contract (e.g., a LenderParty, a BorrowerParty, and, in one implementation, a PayerParty, LoanBrokerParty, and GuarantorParty). The loan contract entity 48126 includes payment information and key loan attributes such as start date and end date of the loan as well as reason for the loan. The loan contract entity 48126 may include an alternative payer with payment information for each condition. The loan contract entity 48126 may include fundamental agreements and documents, such as general terms and conditions, financial statements, personal information, information about the financing object, and a collateral agreement.

The LoanContract entity 48126 includes the following elements: a LoanOfferID, a PaymentPlanReference, a LoanPurposeCode, a MaturityPeriod, a FixedInterestPeriod, an Amount, an EffectiveYieldPercent, an EffectiveYieldCalculationMethodCode, a DisagioPercent, and a DisagioDeductionEventTypeCode. The LoanOfferID is a unique identifier of the loan offer from the sender and is of type GDT: BusinessTransactionDocumentID. The PaymentPlanReference is a reference to the associated PaymentPlan and is of type GDT: BusinessTransactionDocumentReference. The LoanPurposeCode identifies the purpose for the loan and is of type GDT: LoanPurposeCode. The MaturityPeriod is a term of the requested loan and is of type GDT: DatePeriod. The FixedInterestPeriod is a fixed interest rate period for the requested loan and is of type GDT: DatePeriod. The Amount is the requested loan amount and is of type GDT: Amount. The EffectiveYieldPercent identifies an effective interest rate associated with the LoanContract. The EffectiveYieldPercent is of type GDT: Percent. The EffectiveYieldCalculationMethodCode is a calculation method used to determine the effective interest rate for the loan. The EffectiveYieldCalculationMethodCode is of type GDT: EffectiveYieldCalculationMethodCode. The EffectiveYieldCalculationMethodCode is a calculation method to determine the effective interest rate and is of type GDT: EffectiveYieldCalculationMethodCode. The DisagioPercent is a disagio percent (e.g., charge made for exchanging depreciated or foreign money) of the requested loan and is of type GDT: DisagioPercent. The DisagioDeductionEventTypeCode identifies an event in which a deduction corresponding to the DisagioPercent is to be applied. The DisagioDeductionEventTypeCode is of type GDT: DisagioDeductionEventTypeCode.

In one implementation, the elements FixedInterestPeriod and Amount are required and the other elements are optional.

Loan types may be a real estate loan or an installment credit. Real estate loans are loans that are granted to finance real estate and secured by a mortgage. Real estate loans are usually long-term and are provided in one amount. Real estate loans may be repaid in annuities, instalments, or in one amount upon due date.

An instalment credit is a consumer loan providing private customers with a medium-term or long-term loan in one amount. An instalment credit is repaid in equal instalments in accordance with a fixed payment plan.

(i) Loan Contract Party Package

As shown in FIG. 481B, the LoanContractParty package 48116 includes a LenderParty entity 48128, a BorrowerParty entity 48130, a PayerParty entity 48132, a BrokerParty entity 48134, and a BailsmanParty entity 48136.

The LenderParty entity 48128 is a party who grants the loan (lender). The LenderParty entity 48128 is of the type GDT: BusinessTransactionDocumentParty, where, in one implementation, only the element InternalID is required.

The BorrowerParty entity 48130 is a party who takes up the loan (borrower). The BorrowerParty entity 48130 is of the type GDT: BusinessTransactionDocumentParty, where, in one implemention, only the element InternalID is required. There is a 1:n relationship between the LoanContract entity 48126 and the BorrowerParty entity 48130. If several borrowers (BorrowerParty entities 48130) are involved in the loan, then the first BorrowerParty entity 48130 is the primary party to the contract.

The PayerParty 48132 is an alternative party to the BorrowerParty 48130 who pays interest, repayments, and fees for a loan. The BorrowerParty 48130 pays interest, repayments, and fees when no PayerParty 48132 has been specified. The PayerParty is of the type GDT: BusinessTransactionDocumentParty, where, in one implemention, only the element InternalID is required. There is a 1:c relationship between the LoanContract entity 48126 and the PayerParty entity 48132.

The BrokerParty 48134 is a party who acts as an agent for issuing the loan. The BrokerParty 48134 is of the type GDT: BusinessTransactionDocumentParty, where, in one implemention, only the element InternalID is required. There is a 1:cn relationship between the LoanContract entity 48126 and the BrokerParty 48134.

The BailsmanParty 48136 is a party who is responsible for guaranteeing the loan. The BailsmanParty 48136 is of the type GDT: BusinessTransactionDocumentParty, where, in one implemention, only the element InternalID is required. The BailsmanParty is liable to the lender if the borrower does not pay. There is a 1:cn relationship between the LoanContract entity 48126 and the BailsmanParty 48136.

(ii) Loan Contract Product Information Package

The LoanContract ProductInformation package 48118 groups information about the product upon which the loan is based. The LoanContract ProductInformation package 48118 includes a ProductCategory entity 48138 and a Product entity 48140.

The ProductCategory entity 48138 identifies which (financial) product category the loan is based. The ProductCategory entity 48138 is of the type GDT: BusinessTransactionDocumentProductCategory. The ProductCategory to differentiate between, for example, real estate and consumer loans.

The Product entity 48140 identifies which (financial) product the loan is based. The Product entity 48140 is of the type GDT: BusinessTransactionDocumentProduct. There is a 1:c relationship between the LoanContract entity 48126 and the Product entity 48140.

(iii) Loan Contract Payment Information Package

The LoanContract PaymentInformation package 48120 groups the information about payment processing associated with the loan. The LoanContract PaymentInformation package 48120 includes a PaymentForm entity 48142 and a BankAccount entity 48144.

The PaymentForm entity 48142 groups information about the payment form. The PaymentForm entity 48142 includes a Code element that is a coded representation of the payment form. The Code is of the type GDT: PaymentFormCode. The following payment forms may be identified by the Code element: a Direct debiting procedure, a Collection authorization procedure, a Check, a Bank transfer and a Cash deposit.

The BankAccount entity 48144 identifies information about the bank account associated with the payment form. In one implementation, the BankAccount entity 48144 is used with the following payment forms: Direct debiting procedure and Collection authorization procedure. The BankAccount entity 48144 is of the type GDT: BusinessTransactionDocumentBankAccount. There is a 1:c relationship between the PaymentForm entity 48142 and the BankAccount entity 48144.

(iv) Loan Contract Attachment Package

The LoanContract Attachment package 48122 groups references to documents that are relevant for the loan. The LoanContract Attachment package 48122 includes the AttachmentWebAddress entity 48146.

The AttachmentWebAddress entity 48146 includes a reference to one or more documents that are relevant for each loan (e.g., terms and conditions, collateral agreement, and financial statements). The AttachmentWebAddress is of the type GDT: AttachmentWebAddress. There is a 1:cn relationship between the LoanContract entity 48126 and the AttachmentWebAddress entity 48146.

(v) Loan Contract Item Package

As shown in FIG. 481C, the LoanContract Item package 48124 includes a LoanConditionInformation package 48148, a Party package 48150, a PaymentInformation package 48152, and a LoanContractItem entity 48154. There is a 1:n relationship between the LoanContract entity 48126 and the LoanContractItem entity 48154.

The LoanContractItem 48154 defines the conditions of the loan. The conditions may be interest conditions, repayment conditions, or fees. A PayerParty entity 48162 and/or a PaymentForm entity 48164 Code may be associated with each condition.

(a) Loan Contract Item Loan Condition Information Package

The LoanContractItem LoanConditionInformation package 48148 groups conditions for the loan. The LoanContractItem LoanConditionInformation package 48148 includes a LoanInterestCondition entity 48156, a LoanAmortizementCondition entity 48158, and a LoanFeeCondition 48160. There is a 1:c relationship between the LoanContractItem entity 48154 and each of the LoanInterestCondition entity 48156, the LoanAmortizementCondition entity 48158, and the LoanFeeCondition 48160.

The LoanInterestCondition 48156 is an interest condition for the loan. The LoanInterestCondition 48156 is of the type GDT: LoanInterestCondition.

The LoanAmortizementCondition entity 48158 is a repayment condition for the loan. The LoanAmortizementCondition is of the type GDT: LoanAmortizementCondition.

The LoanFeeCondition 48160 is a fee condition for the loan. The LoanInterestCondition is of the type GDT: LoanInterestCondition.

(b) Loan Contract Item Party Package

A LoanContractItem Party package 48150 includes a PayerParty entity 48162, which is similar to the PayerParty entity 48132 associated with the LoanContract entity 48126. There is a 1:c relationship between the LoanContractItem entity 48154 and the PayerParty entity 48162.

(c) Loan Contract Item Payment Information Package

The LoanContractItem PaymentInformation package 48152 corresponds to the LoanContract PaymentInformation package 48120 and groups the information about payment processing for the loan associated with the LoanContractItem 48154. The LoanContractItem PaymentInformation package 48152 includes a PaymentForm entity 48164 and a BankAccount entity 48166, each of which is similar to the similarly named entities in the LoanContract PaymentInformation package 48120 as described above. There is a 1:c relationship between the LoanContractItem entity 48154 and the PaymentForm entity 48164. There is also a 1:c relationship between the PaymentForm entity 48164 and the BankAccount entity 48166.

(6) Message Data Type Loan Contract Create Confirmation Message

FIG. 482 depicts a data model of the message data type LoanContractCreateConfirmationMessage. The message data type LoanContractCreateConfirmationMessage provides the structure for messages of the type LoanContractCreateConfirmation. The message data type LoanContractCreateConfirmationMessage groups business information that is relevant for sending the business document in a message and an object LoanContract included in the business document as required to process a LoanConractCreateConfirmation in accordance with the subject matter described herein. As shown in FIG. 482, message data type LoanContractCreateConfirmationMessage includes a LoanContractCreateConfirmationMessage package 48202, which includes a MessageHeader package 48204, a LoanContract package 48206, and a LoanContractCreateConfirmationMessage entity 48208.

(a) MessageHeader Package

The MessageHeader package 48204 includes a MessageHeader entity 48210, a SenderParty entity 48212, and a RecipientParty entity 48214, each of which are similar to and have the same relationships as the similarly named entities described above for the MessageHeader package 47904 in the LoanCalculationQueryMessage package 47902. There is a 1:1 relationship between the LoanContractCreateConfimmationMessage entity 48208 and the MessageHeader entity 48210.

(b) Loan Contract Package

The Loan Contract package 48206 includes a Log package 48216, a PaymentInformation package 48218, and a LoanContract entity 48220.

The LoanContract entity 48220, from the perspective required by the LoanContractCreateConfirmation, includes information about creating a loan contract in the loan management system (e.g., by the LoanManagement entity 47804). The LoanContract 48220 includes an ID element and a LoanOfferID element. The ID element is a unique identifier of the LoanContract entity 48220 in the recipient system and is of type GDT: BusinessTransactionDocumentID. The LoanOfferID is a unique identifier of the loan offer from the sender and is of type GDT: BusinessTransactionDocumentID.

(i) Loan Contract Log Package

The Log package 48216 groups the business log messages that arise when a loan is created. The Log package 48216 includes a Log entity 48222, which includes one or messages that arise when an application associated with creating the loan is executed. The Log entity 48222 is of the type GDT: Log. There is a 1:c relationship between the LoanContract entity 48220 and the Log entity 48222.

(ii) Loan Contract Payment Information Package

The LoanContract PaymentInformation package 48218 groups the information about payment processing from the perspective required by the LoanContractCreateConfirmation. LoanContract PaymentInformation package 48218 includes a BankAccount entity 48224 that includes information about the bank account that is to be used for paying the loan similar to the BankAccount entity 48166 described above. There is a 1:c relationship between the LoanContract entity 48220 and the BankAccount entity 48224.

(7) Element Structure of Loan Contract Create Request Message

The message data type element structure for the loan contract create request message is depicted in FIG. 483. The element structure is similar to the data model, but provides additional information regarding the details of the interface. The element structure identifies the different packages 48300 in the interface, and represents the entities at various levels within the interface. The interface loan contract create request message includes six levels 48302, 48304, 48306, 48308, 48310, and 48312. The outermost package of this interface is a LoanContractCreateRequestMessage package 48318, which includes a LoanContractCreateRequestMessage entity 48320 at the first level 48302, second level 48304 and the third level 48306. The LoanContractCreateRequest Message entity 48316 is of a data type MDT 48322 "LoanContract-CreateRequest Message" 48324.

The LoanContractCreateRequestMessage package 48318 also includes two nested packages: a Message Header package 48326 and a LoanContract package 48336. The Message Header package 48326 includes a Message Header entity 48328 at the second level. The Message Header entity 48328 has zero or one 48330 Message Header entity 48328 for Message Header package 48326. The Message Header entity is of type GDT 48332 "BusinessDocumentMessageHeader 48334.

The LoanContract package 48336 includes a LoanContract entity 48338 at the second level 48304. The LoanContract entity 48338 has one 48340 entity for Message Header package 48326 and has a data type name "LoanContractCreateRequest" 48342. The LoanContract entity 48338 includes a LoanOfficerID 48344, a LoanPurposeCode 48352, and a MaturityPeriod 48380. The LoanOfficerID 48344 is of type GDT 48348 "BusinessTransactionDocumentID" 48350, and there is zero or one LoanOfficerID for a LoanContract entity 48338. The LoanPurposeCode 48352 is of type GDT 48356 "LoanPurposeCode" 48358, and there is zero or one LoanPurposeCode 48352 for a LoanContract entity 48338. The MaturityPeriod 48380 is of type GDT 48364 "Date Period" 48366, and there is zero or one MaturityPeriod 48380 for a LoanContract entity 48338.

As depicted in FIG. 483B, the LoanContract entity 48338 also includes a FixedInterestPeriod 48368, an Amount 48376, an EffectiveYieldPercent 48384, an EffectiveYieldCalculationMethodCode 48392, a DisagioPercent 48300A, a DisagioDeductionEventTypeCode 48308A, and a LenderParty 48318A. For the FixedInterestPeriod 48368, there is one48370 FixedInterestPeriod 48368 for a LoanContract entity 48338, the type is GDT 48372 and the name is DatePeriod 48374. There is one 48378 Amount entity 48376 for a LoanContract entity 48338, the type is GDT 48380 and the name is Amount 48382. There is zero or one 48386 EffectiveYieldPercent entity 48384 for a LoanContract entity 48338, the type is GDT 48388, and the name is Percent 48390. There is zero or one 48394 EffectiveYieldCalculationMethodCode entity 48392 for a LoanContract entity 48338, the type is GDT 48396, and the name is EffectiveYieldCalculationMethodCode 48398. There is zero or one 48302A DisagioPercent entity 48300A for a LoanContract entity 48338, the data type is GDT 48304A, and the name is DisagioPercent 48306A. There is zero or one 48310A DisagioDeductionEventTypeCode entity 48308A for a LoanContract entity 48338, the type is GDT 48312A, and the name is DisagioDeductionEventTypeCode 48314A.

A Party package 48316A includes a LenderParty entity 48318A. For the LenderParty entity 48318A, there is one 48320A LenderParty entity 48318A for a LoanContract entity 48338, the type is GDT 48322A, and the name is BusinessTransactionDocumentParty 48324A. FIG. 483C depicts an InternalID entity 48326A with one 48328A Internal ID entity48326A for a LenderParty 48318A. The type is GDT 48330A, and the name is PartyInternalID 48332A.

As depicted in FIG. 483C, the Party package 48316A also includes a BorrowerParty entity 48334A, a PayerParty entity 48350A, a BrokerParty entity 48366A, and a BailsmanParty entity 48382A in the third level. There may be any number 48336A of BorrowerParty 48334A entity for a LenderParty 48318A, the type is GDT 48338A, and the name is BusinessTransactionDocumentParty 48340A. The BorrowerParty 48334A includes an InternalID entity 48342A with a cardinality of one 48344A to the BorrowerParty 48334A, the type is GDT 48346A, and the name is PartyInternalID 48348A. There is zero or one 48352A PayerParty entity 48350A for a LenderParty 48318A, the type is GDT 48354A, and the name is BusinessTransactionDocumentParty 48356A. The PayerParty 48350A includes an InternalID entity 48358A with a cardinality of one 48360A to the PayerParty 48350A, the type is GDT 48362A, and the name is PartyInternalID 48364A. There is zero or one 48368A BrokerParty entity 48366A for a LenderParty 48318A, the type is GDT 48370A, and the name is BusinessTransactionDocumentParty 48372A. The BrokerParty 48366A includes an InternalID 48374A with a cardinality of one 48376A to the BrokerParty 48366A, the type is GDT 48378A, and the name is PartyInternalID 48380A. There may be any number 48384A of BailsmanParty entity 48382A for a LenderParty 48318A, the type is GDT 48386A, and the name is BusinessTransactionDocumentParty 48388A. The BailsmanParty 48382A includes an InternalID entity 48390A with a cardinality of 148392A to the BailsmanParty 48382A, the type is GDT 48394A, and the name is PartyInternalID 48396A.

As depicted in FIG. 483D, a ProductInformation package 48398A is included in the LoanContractCreate Request Message package 48318. The ProductInformation package48398A includes a ProductCategory entity 48300B and a Product entity 48308B at the third level. The ProductCategory entity 48300B has a cardinality of one 48302B, the type is GDT 48304B, and the name is BusinessTransactionDocumentProductCategory 48306B. The Product entity 48308B has a cardinality of zero or one 48310B with LoanContractCreateRequestMessage package 48318, the type is GDT 48312B, and the name is BusinessTransactionDocumentProduct 48314B.

The LoanContractCreate Request Message package 48318 also includes a PaymentInformation entity 48316B at the third level. The PaymentInformation entity 48316B includes a PaymentForm entity 48318B with a cardinality of one 48320B to PaymentInformation 48316B. The PaymentForm entity 48318B includes a Code entity 48322B and a BankAccount entity 48330B. The Code entity 48322B has a cardinality of one 48324B, the type is GDT 48326B, and the name is PaymentFormCode 48328B. The BankAccount entity 48330B has a cardinality of zero or one 48332B, the type is GDT 48334B, and the name is BusinessTransactionDocumentBankAccount 48336B.

The LoanContractCreate Request Message package 48318 also includes an Attachment package 48338B. The Attachment package 48338B includes an AttachmentWebAddress entity 48340B with a cardinality including any number 48342B of AttachmentWebAddress entities 48340B for a LoanContractCreate Request Message package 48318. The type is GDT 48344B, and the name is AttachmentWebAddress 48346B.

As depicted in FIG. 483E, an Item package 48348B includes an Item entity 48350B in the first level with a cardinality of any number 48352B of Item entities 48350B for an Item package 48348B, and the name is LoanContractItem 48354B. The Item package also includes LoanConditionInformation entity 48356B, a Party entity 48382B, and a PaymentInformation 48392B entity. The LoanConditionInformation entity 48356B includes a LoanInterestCondition entity 48358B with a cardinality of zero or one 48360, the type GDT 48362B, and the name LoanInterestCondition 48364B. The LoanAmortizementCondition entity 48366B has a cardinality of zero or one 48368B, the type is GDT 48370B, and the name is LoanAmortizementCondition 48372B. The LoanFeeCondition entity 48374B has a cardinality of zero or one 48376B, the type is GDT 48378B, and the name is LoanFeeCondition 48380B.

The Item package 48348B also includes a Party entity 48382B in the first level. The Party entity 48382B includes a PayerParty entity 48384B with a cardinality of zero or one 48385B, the type is GDT 48386B, and the name is BusinessTransactionDocumentParty 48387B. The PayerParty entity 48384B includes an InternalID 48388B in the sixth level, with a cardinality of one 48389B, the type is GDT 48390B, and the name is PartyInternalID 48391B.

The Item package 48348B also includes a PaymentInformation entity 48392B in the first level. The PaymentInformation entity 48392B includes a PaymentForm entity 48393B with a cardinality of zero or one 48394. The PaymentForm entity 48393B includes a Code entity 48395B and a BankAccount entity 48399C. The Code 48395B has a cardinality of zero or one 48396B, the type is GDT 48397B, and the name is PaymentFormCode 48398B. The BankAccount entity 48399C has a cardinality of zero or one 48300D, the type is GDT 48302D, and the name is BusinessTransactionDocumentBankAccount 48304D.

The message data type element structure for the loan calculation message is depicted in FIG. 484. The element structure is similar to the data model, but provides additional information regarding the details of the interface. The element structure identifies the different packages 48400 in the interface, and represents the entities at various levels within the interface. The interface loan calculation message includes five levels 48402, 48404, 48406, 48408, and 48410. The outermost package of this interface is a LoanCalculationMessage package 48418, which includes a LoanCalculationMessage entity 48420 at the first level 48402. The LoanCalculationMessage entity 48420 is of a data type MDT 48422 "LoanCalculationMessage" 48424.

The LoanCalculationMessage package 48418 includes a MessageHeader entity 48426 and a LoanCalculation entity 48436. The MessageHeader 48426 includes a MessageHeader entity 48428 that has a cardinality of zero or one 48430, the type is GDT 48432, and the name is BusinessDocumentMessageHeader 48434. the LoanCalculation package 48436 includes a LoanCalculation entity 48438 with a cardinality of one and a the name LoanCalculation 48442. The LoanCalculation entity 48438 includes a MaturityPeriod entity 48444, an EffectiveYieldPercent entity 48452, and an EffectiveYieldCalculationMethodCode entity 48460. The MaturityPeriod entity 48444 has a cardinality of zero or one 48446, the type is GDT 48448, and the name is DatePeriod 48450. The EffectiveYieldPercent entity 48452 has a cardinality of zero or one 48454, the type is GDT 48456, and the name is Percent 48458. The EffectiveYieldCalculationMethodCode entity 48460 has a cardinality of zero or one 48462, the type is GDT 48464, and the name is EffectiveYieldCalculationMethodCode 48466. As depicted in FIG. 484B, the LoanCalculation entity 48438 also includes an InstallmentAmount entity 48468 with a cardinality of zero or one, the type is GDT 48472, and the name is Amount 48464.

The LoanCalculation Message package 48418 includes a LoanPaymentPlan package 48476. The LoanPaymentPlan package 48476 includes a LoanPaymentPlan 48478 with a cardinality of zero or one 48480 and the name is LoanPaymentPlan 48482. the LoanPayment Plan entity 48478 includes a LoanPaymentPlanItem entity 48484 having any number 48486 of LoanPaymentPlanItem entities 48484 for a LoanPaymentPlan entity 48478, the type is GDT 48488, and the name is LoanPaymentPlanItem 48490.

The message data type element structure for the loan contract create confirmation message is depicted in FIG. 485. The element structure is similar to the data model, but provides additional information regarding the details of the interface. The element structure identifies the different packages 48500 in the interface, and represents the entities at various levels within the interface. The interface loan calculation message includes three levels 48502, 48504, and 48506. The outermost package of this interface is a LoanContractCreateConfirmation Message package 48512, which includes a LoanContractCreate Confirmation Message entity 48514 at the first level 48502. The LoanContractCreate Confirmation Message entity 48514 is data type MDT 48516 "LoanContractCreate Confirmation Message" 48518.

The LoanContractCreate Confirmation Message package 48514 includes a MessageHeader entity package 48520. The MessageHeader entity package 48520 includes a Message- Header entity 48522 with a cardinality of one 48524, the type is GDT 48526, and the name is BusinessDocumentMessageHeader 48528.

The LoanContractCreateConfirmationMessage package 48512 includes a LoanContract package 48530. The LoanContract package 48530 includes a LoanContract entity 48532 with a cardinality of one 48534 and the name LoanContractCreateConfirmation 48536. The LoanContract entity 48532 includes an ID entity 48538 and a LoanOfferID entity 48546. The ID 48538 has a cardinality of zero or one 48540, the type is GDT 48542, and the name is BusinessTransactionDocumentID 48544. The LoanOfferID entity 48546 has a cardinality of one 48548, the type is GDT 48550, and the name is BusinessTransactionDocumentID 48552.

The LoanContractCreateConfirmationMessage package 48512 also includes a Log package 48554. The Log package 48554 includes a Log entity 48556 with a cardinality of zero or one, the type is GDT 48570, and the name is Log 48562.

The LoanContractCreateConfirmationMessage package 48512 also includes a PaymentInformation entity 48564. The PaymentInformation entity 48564 includes a BankAccount entity 48566 with a cardinality of zero or one 48568, the type is GDT 48570 and the name is BusinessTransactionDocumentBankAccount 48572.

The message data type element structure for the loan calculation query message 48612 is depicted in FIG. 486. The element structure is similar to the data model, but provides additional information regarding the details of the interface. The element structure identifies the different packages 48600 in the interface, and represents the entities at various levels within the interface. The interface loan calculation message includes three levels 48602, 48604, and 48606. The outermost package of this interface is a LoanCalculationQueryMessage package 48612, which includes a LoanCalculationQueryMessage entity 48614 at the first level 48602. The LoanCalculationQueryMessage entity 48614 is of a data type MDT 48616 "LoanCalculationQueryMessage" 48618.

The LoanCalculationQueryMessage package 48612 includes a MessageHeader package 48620 and a LoanCaculationQuery package 48630. The MessageHeader package 48620 includes a MessageHeader entity 48622 with a cardinality of zero or one 48624, the type is GDT 48626, and the name is BusinessDocumentMessageHeader 48628. The LoanCalculationQuery package 48630 includes a LoanCalculationQuery entity 48632 with a cardinality of one 48634 and the name LoanCalculationQuery 48636. The LoanCalculationQuery entity 48632 includes a LoanKeyFigureTypeCode entity 48638, a MaturityPeriod entity 48646, a FixedInterestPeriod entity 48654, and an Amount entity 48662. The LoanKeyFigureTypeCode entity 48638 has any number 48640 of LoanKeyFigureTypeCode entities for a LoanCalcuationQuery entity 48632, the type is GDT 48642, and the name is LoanKeyFigureTypeCode 48644. The MaturityPeriod entity 48646 has a cardinality of zero or one 48648, the type is GDT 48650, and the name is DatePeriod 48652. The FixedInterestPeriod entity 48654 has a cardinality of one 48656, the type is GDT 48658, and the name is DatePeriod entity 48660. The Amount entity 48662 has a cardinality of 1 48664, the type is GDT 48666, and the name is Amount 48668.

As depicted in FIG. 486B, the LoanCalculationQuery entity 48632 also includes an EffectiveYieldCalculationMethodCode entity 48670, a DisagioPercent entity 48678, and a DisagioDeductionEventTypeCode entity 48686. The EffectiveYieldCalculationMethodCode entity 48670 has a cardinality of zero or one 48672, the type is GDT 48674, and the name is EffectiveYieldCalculationMethodCode 48676. The DisagioPercent entity 48678 has a cardinality of zero or one 48680, the type is GDT 48682, and the name is DisagioPercent 48684. The DisagioDeductionEventTypeCode entity 48686 has a cardinality of zero or one 48688, the type is GDT 48690, and the name is DisagioDeductionEventTypeCode 48692.

The LoanCalculationQueryMessage package 48612 also includes a Productioninformation package 48694 and a LoanConditionInformation package 48612A. The ProductInformation package 48694 includes a ProductCategory entity 48696, and a Product entity 48604A. The ProductCategory entity 48696 has a cardinality of one, 48698, the type is GDT 48600A, and the name is BusinessTransactionDocumentProductCategory 48602A. The Product entity 48604A has a cardinality of zero or one 48606A, the type is GDT 48608A, and the name is BusinessTransactionDocumentProduct 48610A.

The LoanCalculationQueryMessage package 48612 also includes a LoanConditionInformation package 48612A. The LoanConditionInformation package 48612A includes a LoanInterestCondition entity 48614A, a LoanAmortizementCondition entity 48622A, and a LoanFeeCondition entity 48630A. The LoanInterestCondition entity 48614A has any number 48612A of LoanInterestCondition entities for a LoanConditionInformation package 48616A, the type is GDT 48618A, and the name is LoanInterestCondition 48620A. The LoanAmortizementCondition entity 48622A has any number 48624A of LoanAmortizementCondition entities for a LoanConditionInformation package 48616A, the type is GDT 48626A, and the name is LoanAmortizementCondition 48628A. The LoanFeeCondition 48630A has any number 48632A of LoanFeeCondition entities 48630Afor a LoanConditionInformation package 48616A, the type is GDT 48634A, and the name is LoanFeeCondition 48636A.

11) PurchaseRequest Interfaces

PurchaseRequest interfaces can be used to exchange purchase requisitions for products (materials, services) between a requester (an MRP controller, for example, in the Procure to Stock (PTS) scenario) and a buyer, and confirmations that these requisitions have been fulfilled. The PurchaseRequest interfaces include a PurchaseRequestRequest interface or message, and a PurchaseRequestConfimation interface or message.

In some implementations, the motivating business scenario for the PurchaseRequestRequest and PurchaseRequestConfirmation interfaces may be a PTS scenario. In the PTS scenario, a planning system (SCP) or the "requester," generates purchase requisitions that can be procured externally by a procurement system (SRM) or the "buyer."

(1) Message Types

Two messages types may be available for mapping an A2A requisition process: (1) the message type PurchaseRequestRequest is sent from the requester (a requirements planner in the PTS scenario or a planning/requirements system, for example) to the buyer and can be used to start a new requirements process. From now on, this document may simply use the terms 'requester' and 'buyer'; and (2) the message type PurchaseRequestConfirmation may be sent from the buyer to the requester. It can inform the requester of the extent to which the requirement has been fulfilled.

(a) PurchaseRequestRequest

A PurchaseRequestRequest may be a request from a requester asking a buyer to procure products (materials or services) externally. The structure of the message type PurchaseRequestRequest may be specified by the message data type PurchaseRequestMessage. A PurchaseRequestRequest message can result in the relevant requisition being created or changed in the procurement system. The procurement system can accept changes made to a requisition (except for technical errors). If the procurement system (buyer) cannot procure a requisition or partial quantity of a requisition (rejection), the procurement system indicates this by outputting the PurchaseRequestConfirmation message.

(b) PurchaseRequestConfirmation

A PurchaseRequestConfirmation may be a confirmation of the buyer that informs the requester of the extent to which a requisition has been fulfilled. The structure of the message type PurchaseRequestConfirmation can be specified by the message data type PurchaseRequestMessage. If a procurement system (buyer) cannot fulfil a requisition or partial quantity of a requisition, the buyer can indicate this by outputting the PurchaseRequestConfirmation message. In some variations, the buyer cannot cancel a rejection of a requisition.

(2) Message Choreography

FIG. 487 depicts the message choreography for an exemplary purchase requisition process. The purchase requisition process uses purchase request interfaces (also referred to as purchases requirement interfaces, see FIGS. 288-290)to exchange purchase requisitions for products (such as materials and/or services) between a requester 48702 (such as, an MRP controller or SupplyChainPlanning, for example in the PTS scenario) and a buyer 48704 (e.g., Purchasing in FIG. 487), and to exchange confirmations that these requisitions have been fulfilled. The buyer 48704 may then interface with a supplier 48706 for actual purchase of the requested products.

The requester 48702 starts the requisition process by sending a PurchaseRequestRequest message 48708 to the buyer 48704. The PurchaseRequestRequest message 48708 requests the buyer 48704 to fulfil a requisition generated by the requester 48702. The requisition system uses the PurchaseRequestRequest message 48708 when requisitions are created or changed. The buyer 48704 uses the PurchaseRequestConfirmation message 48710 to tell the requester 48702 the status of the requisition. For example, the PurchaseRequestConfirmation message 48710 may indicate which follow-on documents for each item have been created and how much of the required quantity has been procured. The PurchaseRequestConfirmation message 48710 may also include information regarding whether a requisition or partial quantity of a requisition can no longer be fulfilled.

The PurchaseRequestConfirmation message 48710 may need to be communicated in specified circumstances. In some variations, if the requirements-generating system manages the relevant follow-on documents itself or receives a copy of them and can carry out quantity offsetting in the requisition (as in the PTS scenario), the requirements-generating system requires the PurchaseRequestConfirmation message 48710 if the requisition or a remaining quantity can no longer be procured. The procurement system sends the PurchaseRequestConfirmation message 48710 if a purchase requisition item has been changed (once a purchase order with reference to a requisition has been created or changed, for example). The current procurement status may be transferred in full with each PurchaseRequestRequest message 48708.

(3) Message Data Type Purchase Request Message

FIG. 488A-D depicts an exemplary data model for the PurchaseRequestRequest 48708. The message data type PurchaseRequestMessage includes a PurchaseRequestMessage package 48800 that groups together the business information relevant for sending a business document in a message and the PurchaseRequest object or entity in the business document. The PurchaseRequestMessage package 48800 includes a MessageHeader package 48802, a PurchaseRequest package 48804, and a PurchaseRequestMessage entity 48806.

The MessageHeader package 48802 groups together the business from the perspective of the sending application (e.g., the requester 48702 in FIG. 487). In some implementations, the MessageHeader package 48802 may be omitted from or remain empty in the structure of the PurchaseRequestRequest message.

The PurchaseRequest package 48804 includes a Party package 48808, a Location package 48810, an Item package 48812, and a PurchaseRequest entity 48814. There is a 1:1 relationship between the PurchaseRequestMessage entity 48806 and the PurchaseRequest entity 48814.

A PurchaseRequest entity 48814 includes a requester's 48702 requirement for procuring products (materials or services). The PurchaseRequest entity 48814 is subdivided into PurchaseRequestItems entities 48850 that each specify a product to be procured or additional information relevant for such a product, such as information about product category or value limits as described below for the PurchaseRequestItem package 48812. In addition to the buying party and the seller as well as the proposed seller, additional parties can be involved in the PurchaseRequest as identified in the Party package 48808. Locations can be specified for the PurchaseRequest delivery as identified in the Location package 48810. PurchaseRequest entity 48814 is of type GDT: PurchaseRequest.

The PurchaseRequest entity 48814 includes a BaseBusinessTransactionDocumentID, a CreationDateTime, and a Note. The BaseBusinessTransactionDocumentID is a unique identifier assigned by the requisition system for the object or entity on which the requisition requirement is based. The BaseBusinessTransactionDocumentID is of type GDT: BusinessTransactionDocumentID. The CreationDateTime is the time at which the requisition was created in the requisition system. The CreationDateTime is of type GDT: DateTime. The Note is a short description/name for the requisition. The Note is of type GDT: Note.

(i) Purchase Request Party Package

Party package 48808 groups together the business parties involved in the PurchaseRequest. It includes a BuyerParty entity 48816, a SellerParty entity 48818, a ProposedSellerParty entity 48820, a RequestorParty entity 48822, a ProductRecipientParty entity 48824, and a ManufacturerParty entity 48826. There is a 1:c relationship 48828 between the PurchaseRequest entity 48814 and the BuyerParty entity 48816. There is a 1:c relationship 48830 between the PurchaseRequest entity 48814 and the SellerParty entity 48818. There is a 1:c relationship between the PurchaseRequest entity 48814 and the ProposedSellerParty entity 48820. There is a 1:c relationship between the PurchaseRequest entity 48814 and each of the entities in the Party package 48808. In addition, there is a 1:c relationship between entities in this Interface unless otherwise noted herein or indicated in the FIG. 488.

Either the ID or the ID and address can be transferred for each party. If the ID is transferred, the ID address defined in the master data is used. If the ID and address are transferred, the ID identifies the party and the address is deemed to be a document address that is different to the master data address. Where possible, the ID and address should be sent to avoid misunderstandings. The receiving application should implement a suitable optimization strategy to prevent many identical document addresses from being created.

A default logic is used for parties: from the header to the items and within item hierarchies. Parties specified in the header are valid for the items for which a corresponding party is not explicitly transferred and that are directly assigned to the header. In accordance with the same logic, parties transferred at item level are used for subitems assigned to the relevant item in an item hierarchy. The default logic applies for the party as a whole, including the contact person. Parts of a party specified at header level or for a hierarchy item cannot be specified in more detail at item level. The default logic is a simplified version of the transferred message. As regards logic, parties at header level and for hierarchy items behave as if they have been explicitly transferred for the subitems of the message.

(a) Buyer Party

A BuyerParty entity 48816 is a party that buys goods or services. The BuyerParty entity 48816 is of type GDT: BusinessTransactionDocumentParty. Although, in some implementations, the BuyerParty entity 48816 only includes the StandardID and InternalID elements, as well as the Address and ContactPerson entities. The ContactPerson includes the InternalID element and the Address entity.

The BuyerParty 48816 is specified if more than one company processes its purchases in the recipient system (hosting scenario). In other implementations, the BuyerParty 48816 is unique and does not need to be specified. Changes can be made to the BuyerParty/Contact and a different BuyerParty/Contact can exist for each item. Changes can be made to the address of the BuyerParty, but different addresses are not permitted for each item. If a ShipToLocation, a ShipToParty, and a RequestorParty have not been explicitly specified in the requisition process, the address of the BuyerParty 48816 is used as the ship-to address.

(b) Seller Party

A SellerParty entity 48818 can be a party that sells goods or services. The SellerParty entity 48818 is of type GDT: BusinessTransactionDocumentParty. Although, in some implementations, the SellerParty entity 48818 may only include the StandardID and InternalID elements, as well as the Address and ContactPerson entities, the ContactPerson may include the InternalID element and the Address entity. In some examples, if the SellerParty and ShipFromLocation have not been explicitly specified in the requisition process, then the address of the SellerParty 48818 is used as the ship-from address. If, in contrast, the SellerParty 48818 is specified, then it is used as the vendor when the requirement is generated in the procurement system (unlike the preferred vendor). The SellerParty 48818 is normally specified when the vendor was identified in the requirements system by a source of supply. In this case, the relevant source of supply may also specified in the corresponding BusinessTransactionDocumentReferencePackage entity.

(c) Proposed Seller Party

A ProposedSellerParty entity 48820 can be a preferred party for selling goods or services. The ProposedSellerParty entity 48820 is of type GDT: BusinessTransactionDocumentParty. Although, in some implementations, the ProposedSellerParty entity 48820 may only include the StandardID and InternalID elements, as well as the Address and ContactPerson entities, the ContactPerson may include the InternalID element and the Address entity. When a requisition is created, a user can specify a preferred vendor. In the procurement system, the professional buyer can use the preferred vendor as the actual vendor.

(d) Requestor Party

A RequestorParty entity 48822 can be a party that requests the procurement of goods or services. The RequestorParty entity 48822 is of type GDT: BusinessTransactionDocumentParty. Although, in some implementations, the RequestorParty entity 48822 may include the StandardID and InternalID elements, as well as the Address and ContactPerson entities, the ContactPerson may include the InternalID element and the Address entity. If a ShipToLocation and ProductRecipientParty may not be explicitly specified in the requisition process, the RequestorParty 48822 address can be used as the ship-to address. In the purchasing process, the RequestorParty (requestor 48702) carries out different follow-up actions. For this reason, it is specified explicitly (and not just as the Contact). In a SelfService process, the RequestorParty 48822 could enter and approve a goods receipt and invoice, for example.

(e) Product Recipient Party

A ProductRecipientParty entity 48824 may be a party to which goods are delivered or for whom services are provided. The ProductRecipientParty entity 48824 is of type GDT: BusinessTransactionDocumentParty. Although, in some implementations, the ProductRecipientParty entity 48824 may include the StandardID and InternalID elements, as well as the Address and ContactPerson entities, the ContactPerson may include the InternalID element and the Address entity. If a ShipToLocation is not specified explicitly in a requisition process, the address of the ProductRecipientParty 48824 is used as the delivery address. If the ProductRecipientParty 48824 (goods recipient) is not specified at item or header level, the RequestorParty is also used as the ProductRecipientParty. For a direct material item, the ProductRecipientParty is optional. The ShipToLocation, however, is mandatory. In the third-party process, the ProductRecipientParty 48824 is the customer. The ProductRecipientParty 48824 is not synonymous with the ShipToLocation and is to be used when the ProductRecipientParty 48824 (company or person) is actually different from the BuyerParty 48816.

(f) Manufacturer Party

A ManufacturerParty entity 48826 is a party that manufactures goods. The ManufacturerParty entity 48826 is of type GDT: BusinessTransactionDocumentParty. Although, in some implementations, the ManufacturerParty entity 48826 includes the StandardID and InternalID elements, as well as the Address and ContactPerson entities. The ContactPerson includes the InternalID element and the Address entity. The ManufacturerParty entity 48826 may be used for Material items. In some implementations, the ManufacturerParty 48826 is not used except for Material items.

(ii) Purchase Request Location Package

The Location package 48810 can group together the locations that are relevant for the requisition. The Location package 48810 includes a ShipToLocation entity 48828 and a ShipFromLocation entity 48830.

Similar to the party package entities for this Interface, either the ID or the address, or both may be transferred for each location entity 48828 and 48830. If the ID and address can be transferred, the ID identifies the location and the address may be deemed to be a document address that is different from the master data address. The receiving application (e.g., buyer 48704) implements a suitable optimization strategy to prevent many identical document addresses from being created.

(a) Ship To Location

A ShipToLocation entity 48828 can be the location to which goods are to be delivered or where services are to be provided. The ShipToLocation entity 48828 is of type GDT: BusinessTransactionDocumentLocation. In some implementations, the ShipToLocation entity 48828 may only include the StandardID and InternalID elements, as well as the Address entity.

(b) Ship From Location

A ShipFromLocation entity 48830 can be the location from where goods are to be shipped. The ShipFromLocation entity 48830 is of type GDT: BusinessTransactionDocumentLocation. In some implementations, the ShipToLocation entity 48828 may only include the StandardID and InternalID elements, as well as the Address entity. In some implementations, the ShipFromLocation is used for material items and not for other types of items.

(iii) Purchase Request Item Package

A PurchaseRequestItem package 48812 includes a ProductInformation package 48832, a PriceInformation package 48834, a Party package 48836, a Location package 48838, a BusinessDocumentObjectReference package 48840, an ItemAccounting (or AccountingObjectSetAssignment) package 48842, an Attachment package 48844, a Description package 48846, a ScheduleLine package 48848, and a PurchaseRequestItem (or Item) entity 48850. There is a 1:n relationship between the PurchaseRequest entity 48814 and the Item entity 48850. PurchaseRequestItem entities 48850 are arranged hierarchically using a HierarchyRelationship 48852. The HierarchyRelationship 48852 is the relationship between a sub-item and a higher-level parent item in an item hierarchy. There is a 1:cn relationship between the Item entity 48850 and its subordinate entities. There is a 1:c relationship between the Item entity 48850 and its superordinate entities.

(a) Purchase Request Item

A PurchaseRequestItem entity 48850 can specify a product requested by the PurchaseRequest 48814 or provides additional information about such a product. The PurchaseRequestItem entity 48850 may include detailed information about a particular product (see ProductInformation package 48832) and its price (see PriceInformation package 48834). The quantity of the product and (delivery) dates/times can be specified in the schedule line (see ScheduleLine package 48848). For the PurchaseRequestItem entity 48850 (compared to the information of the PurchaseRequest entity 48814), deviating parties or locations can be defined (see Party package 48836 and Location package 48838). The PurchaseRequestItem entity 48850 can contain references to other business documents that are relevant for the item (see BusinessDocumentObjectReference package 48840). Notes or references to attachments can also be specified for the item (see Description package 48846 and Attachment package 48844). A PurchaseRequestItem entity 48850 can be subordinate to another PurchaseRequestItem entity 48850 within a hierarchy to represent a business relationship between the two items. This could be information about a substitute product for an ordered product, for example. This relationship can also be used to group together PurchaseRequest items 48814, that is, a PurchaseRequestItem 48850 can group together other PurchaseRequestItems 48850. The PurchaseRequestItem entity 48850 is of type GDT: PurchaseRequestItem.

The PurchaseRequestItem entity 48850 includes a BaseBusinessTransactionDocumentItemID, a ThirdPartyDealIndicator, and a DirectMaterialIndicator. The BaseBusinessTransactionDocumentItemID can be an identifier (unique within the object or entity 48806) assigned by the requirement system for an item 48850 within the object on which the requirement is based. The BaseBusinessTransactionDocumentItemID is of type GDT: BusinessTransactionDocumentItemID. The ThirdPartyDealIndicator specifies that the purchase requisition item is used as part of a third-party process. The ThirdPartyDealIndicator may be of type GDT: BusinessTransactionDocumentItemThirdPartyDealIndicator. The DirectMaterialIndicator specifies whether the material in the purchase requisition item is used as part of a direct material process. The DirectMaterialIndicator is of type GDT: DirectMaterialIndicator.

From a semantic point of view, items 48850 may contain other items 48850. Item hierarchies are mapped in this way using the respective entity HierarchyRelationship 48852. There are various item categories, which are governed by a variety of constraints. An item 48850 may have several constraint types. In this implementation, the item satisfies the constraints of its constraint types. Which constraint types can be combined with one another and how, is specified in the description of the constraint types. The constraint types may include the following:

(1) Standard items are the items to which no lower-level items have been assigned in the hierarchy. An item that is not referenced by the ParentItemID of another item is a standard item.

(2) Hierarchy items are items to which at least one other lower-level item has been assigned in the hierarchy. An item that is referenced by the ParentItemID of at least one other item is a hierarchy item. Items are either standard or hierarchy items.

(3) Subitems are items that are assigned below a hierarchy item and not directly assigned to the requisition header. Subitems can be both standard items and hierarchy items. Each item that references another item by the ParentItemID is a subitem.

(4) Material items are items whose product is a material. Items whose ProductTypeCode is "1" (or correspond to a Material) are Material items.

(5) DirectMaterial items are material items that are used as part of a direct material process (see DirectMaterialIndicator).

(6) Service items are items whose product is a service. Items whose ProductTypeCode is "2" (or correspond to a service) are service items.

(7) Limit items are items with a cost limit. Limit items are used as placeholders in a requisition if the exact requirements are unknown at the time the requisition is issued. This can be the case for repairs, where the time and spare parts required are not known until the repair has been made.

(8) Grouping hierarchy items are hierarchy items that logically group together other items. Multilevel grouping hierarchies are permitted, that is, a grouping hierarchy item can contain subitems that are also grouping hierarchy items. Hierarchy items whose subitems have HierarchyRelationshipTypeCode "002" (or identify a group) are grouping hierarchy items; subitems with a different HierarchyRelationshipTypeCode are not permitted. In some implementations, Grouping hierarchy items are not permitted as subitems of other types of hierarchy items.

(9) BOM hierarchy items are hierarchy items that group together other items in a bill of materials (BOM). Multilevel BOM hierarchies are permitted. Hierarchy items with at least one subitem with HierarchyRelationshipTypeCode "001" (or identifying a bill of materials) are BOM hierarchy items; additional subitems are permitted with the HierarchyRelationshipTypeCode "003" (corresponding to a discount in kind).

(10) Discount in kind hierarchy items are hierarchy items for which a goods discount is granted in the form of an inclusive or exclusive bonus quantity. In some implementations, multilevel discount in kind hierarchies are not permitted, that is, no discount in kind can be granted for discount in kind. The goods discount is described in the form of one or more subitems in the discount in kind hierarchy item. Hierarchy items with at least one subitem with HierarchyRelationshipTypeCode "003" (discount in kind) are discount in kind hierarchy items; additional subitems are permitted with the HierarchyRelationshipTypeCode "001" (bill of material). Hierarchy items are grouping, BOM, or discount in kind hierarchy items. A hierarchy item can be both BOM and a discount in kind hierarchy item, if a discount in kind has been granted for a BOM.

(b) Hierarchy Relationship

A HierarchyRelationship 48852 is the relationship between a subitem (a first Item entity 48850) and a higher-level parent item (a second Item entity 48850) in an item hierarchy. The HierarchyRelationship may include a ParentItemID and a TypeCode. The ParentItemID can be a reference to a parent item. The ParentItemID can be of type GDT: BusinessTransactionDocumentItemID. The TypeCode represents the hierarchical relationship between the subitem and its higher-level parent item. The TypeCode is of type GDT: BusinessTransactionDocument-ItemHierarchyRelationshipTypeCode.

In some implementations, neither the ParentItemID nor the TypeCode can be changed once the corresponding item has been created.

(c) Purchase Request Item Product Information Package

A ProductInformation package 48832 groups together the information for identifying, describing, and classifying a product in a purchase requisition item. The ProductInformation package 48832 includes a Product entity 48854 and a ProductCategory entity 48856. In some implementations, the ProductInformation package 48832 is not used in grouping hierarchy items.

(i) Product

A Product entity 48854 may include the details about a product as generally understood from a commercial point of view in business documents. These can be the details for identifying a product and product type, and the description of the product. The Product entity 48854 may be of type GDT: BusinessTransactionDocumentProduct, in some implementations, although Product entity 48854 only includes the StandardID, InternalID, TypeCode, and Note elements.

In some implementations for limit items, the description (note) may be used in the Product entity 48854 and the product number and ProductTypeCode may be not used. In this implementation, either a product number or a description along with the ProductTypeCode (material or service) is specified for each item 48850 other than limit items. The ProductTypeCode may be not changed once a corresponding item has been created. If both the product number and description are specified, the description can be merely additional information in the message 48806 and can be ignored by the recipient. In substitution product subitems, the ProductTypeCode does not differ from the parent item ProductTypeCode.

(ii) Product Category

A ProductCategory entity 48856 may include the details about a product category as generally understood from a commercial point of view in business transaction documents. The ProductCategory entity 48856 may include details for identifying the product category using an internal ID, a standard ID, and IDs assigned by the involved parties. The ProductCategory entity 48856 is of type GDT: BusinessTransactionDocumentProductCategory. In some implementations, the ProductCategory entity 48856 only may include the StandardID and InternalID elements. The product category 48856 may be derived directly from the product 48854 if a product number is specified for the product 48854.

(d) Purchase Request Item Price Information Package

A PriceInformation package 48834 can group together price-relevant information. The PriceInformation package 48834 includes a Price entity 48858 and a ProcurementCostUpperLimit entity 48860. In some implementations, the Price package 48834 for a purchase requisition item may include prices but does not include any information about how the prices are calculated (e.g., pricing scales).

(i) Price

A Price entity 48858 can be the purchase order price specified by the requester or buyer. The Price entity 48858 includes a NetUnitPrice, which can be a net price (without tax or cash discount) specified by the buyer for the base quantity of the service or material. The NetUnitPrice is of type GDT: Price.

In BOM hierarchies, the following rules can apply for the Price entity 48858: (1) if the price is specified for the item at the top of the BOM hierarchy and not the subitems, the price identified by this Price entity 48858 applies; (2) if the price is specified for standard items (e.g., end nodes in the BOM hierarchy tree) in the BOM hierarchy, these prices apply. The price of the entire BOM is the total of the individual prices; and (3) if a price is specified at different levels in the BOM hierarchy, the price that appears above the others in the tree always applies. Differences between the total of the individual prices and the price at the next highest hierarchy level are permissible. The differences may be caused by discounts for the entire BOM.

(ii) Procurement Cost Upper Limit

A ProcurementCostUpperLimit entity 48860 can be the cost upper limit for different types of procurement costs. The ProcurementCostUpperLimit entity 48860 may be of type GDT: ProcurementCostUpperLimit. If a ProcurementCostUpperLimit entity 48860 is specified, this implies that the purchase requisition item may be a limit item; in other words, the requisition item can indicate a requirement for a certain quantity of a particular product or service within a certain period. Limit items are used as placeholders in a requisition if the exact requirements may be unknown at the time the requisition is issued. For example, this may be the case for repairs, where the time and spare parts required are not known until the repair has been made.

(e) Purchase Request Item Party Package

The ItemParty package 48834 may be similar to the Party package 48808 in the PurchaseRequest package 48804. The ItemParty package 48852 also includes a BuyerParty entity 48862, a SellerParty entity 48864, a ProposedSellerParty entity 48866, a RequestorParty entity 48868, a ProductRecipientParty entity 48870, and a ManufacturerParty entity 48872. Each of the entities in the ItemParty package 48852 is similar to the similarly named entities in the PurchaseRequestParty package 48808 described above.

(f) Purchase Request Item Location Package

The ItemLocation package 48838 may be similar to the Location package 48810 in the PurchaseRequest package 48804. The ItemLocation package 48854 also includes a ShipToLocation entity 48874 and a ShipFromLocation entity 48876 as described above.

(g) Purchase Request Item Business Document Object Reference Package

A BusinessDocumentObjectReference package 48840 groups together references to business documents that are relevant for the PurchaseRequestItem 48850 and have a business relationship with the item. The BusinessDocumentObjectReference package 48840 includes a PurchasingContractReference entity 48878, an OriginPurchaseOrderReference entity 48880, a ProjectReference entity 48882, and a ProjectElementAssignment entity 48884. In some implementations, none of the entities in the BusinessDocumentObjectReference package 48840 are used in grouping hierarchy items.

(i) Purchase Contract Reference

A PurchasingContractReference entity 48878 may be a reference to a purchase contract or item in a purchase contract. The PurchasingContractReference entity 48878 may be of type GDT: BusinessTransactionDocumentReference.

In some implementations, a PurchasingContractReference entity 48878 may be not used in limit items 48850, which are defined by the ProcurementCostUpperLimit entity 48860. A PurchasingContractReference entity 48878 may include one ItemID to reference one item.

(ii) Origin Purchase Order Reference

The OriginPurchaseOrderReference entity 48880 can be a reference to the origin purchase order or to an item within the origin purchase order in a third-party process. The OriginPurchaseOrderReference entity 48880 may be of type GDT: BusinessTransactionDocumentReference.

The OriginPurchaseOrderReference entity 48880 may include one ItemID to reference one item. The OriginPurchaseOrderReference entity 48880 is passed on to the purchase orders in a third-party deal, so that the seller can reference the original purchase order of the ShipToParty with the OriginPurchaseOrderReference.

(h) Project Reference

A ProjectReference 48882 is a reference to a project or an element within a project from which the requirement arose. The ProjectReference 48882 may be of type GDT: ProjectReference. The ProjectReference 48882 includes a ProjectElementTypeCode corresponding to a Task or a Role.

A ProjectElementAssignment 48884 can be the assignment between two elements of a project from which the requirement arose. The ProjectElementAssignment in a purchasing process is passed right through to goods receipt, service entry and the invoice so that a project system can always be informed of the status of the requirement. The ProjectElementAssignment is of type GDT: ProjectElementAssignment. In some implementations, only one assignment 48884 of a role (e.g., ProjectElementTypeCode corresponds to a "role") to a task (ProjectElementTypeCode corresponds to a "task") can be allowed.

In addition, in some implementations, either one ProjectReference 48882 or one ProjectElementAssignment 48884 can be specified for the item 48850.

(i) Accounting Object Set Assignment

The AccountingObjectSetAssignment package 48842 can group all account assignment information for a requirement item. The AccountingObjectSetAssignment package 48842 includes an AccountingObjectSetAssignment entity 48886, which is the assignment of the amount or a percentage, value portion, or quantity subamount of an item in the requirement to a quantity of account assignment objects. The AccountingObjectSetAssignment is of type GDT: AccountingObjectSetAssignment. There is a 1:cn relationship between the Item entity 48850 and the AccountingObjectSetAssignment entity 48886.

(j) Purchase Request Item Attachment Package

The Attachment Package 48842 can group together the relevant attachments with reference to the purchase requisition item. The Attachment Package 48842 includes an AttachmentWebAddress entity 48888. There is a 1:cn relationship between the Item entity 48850 and the AttachmentWebAddress entity 48888.

The AttachmentWebAddress entity 48888 is a Web address for a document of any type that is related to the transmitted message or a part of the message, but is not itself transferred as part of the message. The AttachmentWebAddress entity 48888 is of type GDT: AttachmentWebAddress.

(k) Purchase Request Item Description Package

A Description package 48846 can group together the texts relating to the purchase requisition item. The Description package 48846 includes a Description entity 48890 and an InternalDescription entity 48892.

The Description entity 48890 can be a natural-language text regarding the purchase requisition item, which is visible to the parties. The Description entity 48890 is of type GDT: Description. The Description entity 48890 may be used for the textual information about the transferred requisition and not just the current message. An example of this would be information that the responsible Purchasing employee is on vacation as of a specific date, and indicating the name and telephone number of a substitute as of this date.

An InternalDescription entity 48892 is a natural-language text regarding the purchase requisition item, which is visible to the parties within the company. The InternalDescription entity 48892 is of type GDT: Description. The InternalDescription entity 48892 may be used for the textual information about the transferred requisition and not just the current message. An example of this is a note indicating that the requisition is required for a particular internal purpose. Unlike the Description entity 48890, the InternalDescription 48892 is not included in a message that would be sent to the vendor.

(l) Purchase Request Item Schedule Line Package

A ScheduleLine package 48848 groups the quantity and date information about a PurchaseRequestItem entity 48850. The ScheduleLine package 48848 includes a ScheduleLine entity 48894. There is a 1:1 relationship between the Item entity 48850 and the ScheduleLine entity 48894.

A ScheduleLine entity 48894 is a line containing the quantity and dates of the performance period requested in a requisition. The ScheduleLine entity 48894 includes a DeliveryPeriod 48896 and a Quantity 48898. The DeliveryPeriod 48896 can be the period in which the requester expects a product to be delivered or service provided. The DeliveryPeriod may be of type GDT: DateTimePeriod. The Quantity 48898 is the required quantity. The Quantity 48898 may be of type GDT: Quantity. The quantity is specified, unless the item in question is a limit item, in which case it may be left empty. In some implementations, exactly one ScheduleLine 48894 can be provided in the PurchaseRequestItem 48850.

(4) Message Data Type Purchase Request Confirmation Message

FIG. 489 depicts an exemplary data model for the PurchaseRequestConfirmation 48710. The message data type PurchaseRequestConfirmationMessage includes a PurchaseRequestConfirmationMessage package 48800 that groups the business information relevant for sending a business document in a message and the PurchaseRequestConfirmation object or entity contained in the business document. The PurchaseRequestConfirmationMessage package 48800 includes a MessageHeader package 48902, a PurchaseRequest package 48904, and a PurchaseRequestConfirmationMessage entity 48906.

The MessageHeader package 48902 can group together the business from the perspective of the sending application. In the implementation shown in FIG. 489, the MessageHeader package 48802 may be omitted from or remain empty in the structure of the PurchaseRequestConfirmation message.

(a) PurchaseRequest Package

The PurchaseRequestPackage 48902 includes a PurchaseRequestItemPackage 48908 and a PurchaseRequest entity 48910.

The PurchaseRequest entity 48910 included in or associated with the PurchaseRequestConfirmationMessage entity 48906 includes a purchaser's confirmation of a requester's requirement with respect to the external procurement of products (materials, services). There is a 1:1 relationship between the PurchaseRequestConfirmationMessage 48906 and the PurchaseRequest entity 48910. The PurchaseRequest 48910 is subdivided into PurchaseRequestItems 48914 that can include information on the extent of fulfillment of the requirement (see PurchaseRequestItem package 48908). The PurchaseRequest 48910 is of type: GDT PurchaseRequestConfirmation. The PurchaseRequest 48910 includes a BaseBusinessTransactionDocumentID. The BaseBusinessTransactionDocumentID is a unique identifier assigned by the requirement system for the object on which the requirement is based. The BaseBusinessTransactionDocumentID may be of type GDT: BusinessTransactionDocumentID.

(i) PurchaseRequest Item Package

The PurchaseRequestItem package 48908 includes a FulfillingPurchaseOrderPackage 48912 and a PurchaseRequestItem entity 48914.

The PurchaseRequestItem entity 48914 can specify a product required by means of the PurchaseRequest 48910 or additional information on such a product. The PurchaseRequestItem entity 48914 may include information on the extent of fulfillment of a requirement. The PurchaseRequestItem entity 48914 is of type: GDT PurchaseRequestConfirmationItem. There can be a 1:n relationship between the PurchaseRequest 48910 and the PurchaseRequestItem entity 48914. The PurchaseRequestItem entity 48914 may include a BaseBusinessTransactionDocumentItemID element, an OpenQuantityCancelledIndicator element, a TotalRequestedQuantity element, and a TotalOrderedQuantity element. The BaseBusinessTransactionDocumentItemID can be the identifier assigned by the requirement system for an item within the object on which the requirement is based. The BaseBusinessTransactionDocumentItemID may be of type GDT: BusinessTransactionDocumentItemID. The OpenQuantityCancelledIndicator may be an indicator of whether further sources of supply are to be determined for remaining quantities or if the remaining quantities are to be regarded as cancelled. The OpenQuantityCancelledIndicator may be of type GDT: CancelledIndicator. The TotalRequestedQuantity is the total requested quantity for a requirement item. The TotalRequestedQuantity may be of type GDT: Quantity. The TotalOrderedQuantity may be the total ordered quantity for a requirement item. The TotalOrderedQuantity is of type GDT: Quantity.

(a) Purchase Request Item Fulfilling Purchase Order Package

The FulfillingPurchaseOrder package 48912 can group information on the extent of fulfillment of a requirement by a purchase order. The FulfillingPurchaseOrder package 48912 includes a FulfillingPurchaseOrderItem package 48916 and a FulfullingPurchaseOrder entity 48918.

The FulfillingPurchaseOrder entity 48918 can be a view of a PurchaseOrder that shows the extent of fulfillment of a requirement item. The FulfillingPurchaseOrder entity 48918 may be of type: GDT: PurchaseRequestConfirmationItemFulfillingPurchaseOrder. There may be a 1:cn relationship between the PurchaseRequestItem entity 48914 and the FulfillingPurchaseOrder entity 48918. The FulfillingPurchaseOrder entity 48918 may include an ID element of type GDT: BusinessTransactionDocumentID and an OrderedIndicator element of type GDT: PurchaseOrderOrderedIndicator. The ID can correspond to the purchase order number. The OrderedIndicator identifies the purchase order has already been sent to the vendor.

(i) Purchase Request Item Fulfilling Purchase Order Item Package

The FulfillingPurchaseOrderItem package 48916 can group information on the extent of fulfillment of a requirement by a purchase order item. The FulfillingPurchaseOrderItem package 48916 includes a FulfillingPurchaseOrderItem entity 48920. There is a 1:n relationship between the FulfillingPurchaseOrder entity 48918 and the FulfillingPurchaseOrderItem entity 48920.

The FulfillingPurchaseOrderItem entity 48920 can be a view of a PurchaseOrderItem that shows the extent of fulfillment of a requirement item. The FulfillingPurchaseOrderItem entity 48920 is of type GDT: PurchaseRequestItemFulfillingPurchaseOrderItem. The FulfillingPurchaseOrderItem entity 48920 may include an ID element and a Quantity element. The ID corresponds to the purchase order item number. The ID is of type GDT: BusinessTransactionDocumentItemID. The Quantity element can identify the Quantity ordered and is of type GDT: Quantity.

(5) Message Data Type Element Structure (a) PurchaseRequestRequest

The message data type element structure for the PurchaseRequestRequest message is depicted in FIG. 490A-J. The element structure is similar to the data model, but provides additional information regarding the details of the interface. The element structure identifies the different packages 49000 in the interface, and represents the entities at various levels within the interface. As depicted in FIG. 490A, the interface for PurchaseRequest Message includes five levels 49002, 49004, 49006, 49008, and 49010. The outermost package of this interface is a PurchaseRequestMessage package 49018, which includes a Purchase Request Message entity 49020 at the first level 49002. The Purchase Request Message entity 49020 is of a data type MDT 49022 "PurchaseRequestMessage" 49024.

The PurchaseRequestMessage package 49028 includes a PurchaseRequest package 49030, a location package 49092A, and an Item package 49044B. The PurchaseRequest package 49028 includes a PurchaseRequest entity 49030 at the second level 49004. The PurchaseRequest entity 49030 is of a data type "Purchase Request" 49036, and there is one 49032 PurchaseRequest entity 49026 for each PurchaseRequestpackage 49028.

The PurchaseRequest entity 49030 includes a Base Business Transaction Document ID 49040, a CreationDateTime 49050, and a Note 49060. The Base Business Transaction Document ID 49040 is of a type GDT 49044 "BusinessTransactionDocumentID" 49046, and there is one or two 49042 Base Business Transaction Document ID 49040 for a PurchaseRequest entity 49030. The CreationDateTime 49050 is of a type GDT 49054 "DateTime" 49056, and there is one 49052 CreationDateTime 49050 for a PurchaseRequest entity 49030. The Note 49060 is of a type GDT 49064 "Note" 49066, and there is zero or one 49062 Note 49060 for a PurchaseRequest entity 49028.

The PurchaseRequest package 49028 includes a Party package 49070. The Party package 49070 includes a BuyerParty entity 49072, a Seller Party 49042A, a ProposedSellerParty 49052A, a RequestorParty 49062A, a ShipToParty 49072A, a ManufacturerParty 49082A at the third level. The BuyerParty 49072 is of a type GDT 49076 "BusinessTransactionDocumentParty" 49078, and there is either zero or one 49074 BuyerParty entity 49072 for each Party package 49070.

The BuyerParty entity 49072 includes a Standard ID 49082, an Internal ID 49092, an Address 49002A, and a Contact Person 49012A at the fourth level. The Standard ID

49082 is of type GDT 49086 "PartyStandardID" 49088, and there is any number of Standard ID 49082 for a BuyerParty entity 49072. The Internal ID 49092 is of type GDT 49096 "PartyInternalID" 49098, and there is either zero or one 49094 Internal ID 49092 for a BuyerParty entity 49072. The Address 49002A is of type GDT 49006A "Address" 49008A, and there is either zero or one 49004A Address 49002A for a BuyerParty entity 49072. The Contact Person 49012A is of type GDT 49016A "Address" 49018A, and there is either zero or one 49014A Contact Person 49012A for a BuyerParty entity 49072.

The Contact Person 49012A includes an Internal ID 49022A and an Address 49032A. The Internal ID 49012A is of type GDT 49026A "ContactPersonInternalID" 49028A, and there is any number of 49024A Internal ID 49022A for a Contact Person 49012A. The Address 49032A is of type GDT 49006A "Address" 49038A, and there is either zero or one 49034A Address 49032A for a BuyerParty entity 49012A.

The SellerParty 49042A is of a type GDT 49046A "BusinessTransactionDocumentParty" 49048A, and there is either zero or one 49044A SellerParty entity 49042A for each Party package 49070. The ProposedSellerParty 49052A is of a type GDT 49056A "BusinessTransactionDocumentParty" 49058A, and there is either zero or one 49054A ProposedSellerParty entity 49052A for each Party package 49070. The RequestorParty 49062A is of a type GDT 49066A "BusinessTransactionDocumentParty" 49068A, and there is either zero or one 49064A RequestorParty entity 49062A for each Party package 49070. The ShipToParty 49072A is of a type GDT 49076A "BusinessTransactionDocumentParty" 49078A, and there is either zero or one 49074A ShipToParty entity 49072A for each Party package 49070. The ManufacturerParty 49082A is of a type GDT 49086A "BusinessTransactionDocumentParty" 49088A, and there is either zero or one 49084A ManufacturerParty entity 49082A for each Party package 49070.

The location package 49092A includes a ShipToLocation entity 49094A and a ShipFromLocation entity 49034B at the third level. The ShipToLocation entity 49094A includes a Standard ID 49004B, an Internal ID 49014B, and an Address 49024B at the fourth level. The ShipToLocation entity is a GDT 49098A "BusinessTransactionBodumentLocation" 49000B, and there is either zero or one 49096A ShipToLocation 49094A for each Location package 49092A. The Standard ID 49004B is of type GDT 49008B "LocationStandardID" 49010B, and there is any number of Standard ID 49004B for a ShipToLocation entity 49092A. The Internal ID 49014B is of type GDT 49018B "LocationInternalID" 49020B, and there is either zero or one 49016B Internal ID 49014B for a Location package 49092A. The Address 49024B is of type GDT 49028A "Address" 49030B, and there is either zero or one 49036B Address 49034B for a Location package 49092A. The ShipFromLocation is a GDT 49038B "BusinessTransactionBodumentLocation" 49040B, and there is either zero or one 49026A ShipToLocation 49094A for each Location package 49092A.

The Item package includes a Product Information package 49012C, a Price Information package 49094C, a Party package 49022D, a Location package 49084D, a Business Document Object Reference package 49004E, an Accounting package 49066E, an Attachment package 49024F, a Description package 49036F, and a Schedule Line package 49058F. The Item package also includes an Item entity 49046B at the third level. The Item entity is a "PurchaseRequestItem" 49052B and there can be any number of Item entity 49046B for each Item package 49044B. The Item entity 49046B includes a Base Business Transaction Document Item ID 49056B, a Third Party Deal Indicator 49066B, a Direct Material Indicator 49076B, and a Hierarchy Relationship 49086B. The Base Business Transaction Document Item ID 49056B is a GDT 49060B "BusinessTransactionDocumentItemID" 49062B, and there is either one or two Base Business Transaction Document Item ID 49056B for an Item entity 49046B. The Third Party Deal Indicator 49066B is a GDT 49070B "BusinessTransactionDocumentThirdPartyDealIndicator" 49072B, and there is either zero or one Base Business Transaction Document Item ID 49076B for an Item entity 49046B. The Direct Material Indicator 49076B is a GDT 49080B "DirectMaterialIndicator" 49082B, and there is either zero or one 49078B Direct Material Indicator 49076B for an Item entity 49046B. There is either zero or one 49088B Hierarchy Relationship 49086B for an Item entity 49046B.

The Hierarchy Relationship 49086B includes a Parent Item ID 49092B and a Type Code 49002C at the fifth level. The Parent Item ID 49092B is a GDT 49096B "BusinessTransactionDocumentItemID" 49098B, and there is one 49094B Parent Item ID 49092B for a Hierarchy Relationship 49086B. The Type Code 49002C is a GDT 49006C "BusinessTransactionDocumentItemHierarchyRelationshipTypeCode" 49008C, and there is one 49094B Type Code 49002C for a Hierarchy Relationship 49086B.

The Product Information package includes a Product entity 49014C, a Product Category entity 49064C, a Price entity 49096C, a Price entity 49096C, and a ProcurementCostUpperLimit entity 49012D at the fourth level. The Product entity is a GDT 49018C "BusinessTransactionDocumentProduct" 49020C, and there is either zero or one 49016C Product entity 49014C for each Product Information 49012C. The Product entity 49014C includes a StandardID 49024C, an InternalID 49034C, a Type Code 49044C, and a Note 49054C at the fifth level. The StandardID 49024C is of type GDT 49028C "ProductStandardID" 49030C, and there is any number of StandardID 49024C for a Product entity 49014C. The InternalID 49034C is of type GDT 49038C "ProductInternalID" 49040C, and there is either zero or one 49036C InternalID 49034C for a Product entity 49014C. The Type Code 49044C is a GDT 49048C "ProductTypeCode" 49050C, and there is either zero or one 49046C Type Code 49002C for a Product entity 49014C. The Note 49054C is of a type GDT 49058C "Note" 49060C, and there is zero or one 49056C Note 49054C for a Product entity 49014C.

The Product Category entity 49064C is a GDT 49068C "BusinessTransactionDocumentProductCategory" 49070C, and there is either zero or one 49066C Product Category 49064C for each Product Information package 49012C. The Product Category entity 49064C includes a StandardID 49074C and an Internal ID 49084C at the fifth level. The StandardID 49074C is of type GDT 49078C "ProductCategoryStandardID" 49030C, and there is any number of StandardID 49024C for a Product Category entity 49064C. The InternalID 49084C is of type GDT 49088C "ProductCategoryInternalID" 49090C, and there can be any number 49086C of InternalID 49084C for a Product Category entity 49064C.

There is either zero or one 49098C Price entity 49096Cis a GDT 49068C for each Product Information package 49012C. The Price entity 49096C includes a NetUnitPrice 49002D at the fifth level. The NetUnitPrice 49002D is of type GDT 49006D "Price" 49008D, and there is either zero or one 49004D of NetUnitPrice 49002D for a Price entity 49096C.

The ProcurementCostUpperLimit entity 49012D is of type GDT 49016D "ProcurementCostUpperLimit" 49018D, and there is either zero or one 49014D of ProcurementCostUpperLimit entity 49012D for a Price entity 49096C.

The Party package 49022D includes a BuyerParty entity 49024D, a Seller Party 49034D, a ProposedSellerParty 49044D, a RequestorParty 49054D, a ShipToParty 49064D, a ManufacturerParty 49074D at the fourth level. The BuyerParty 49024D is of a type GDT 49028D "BusinessTransactionDocumentParty" 49030D, and there is either zero or one 49026D BuyerParty entity 49024D for each Party package 49022D. The SellerParty 49034D is of a type GDT 49038D "BusinessTransactionDocumentParty" 49040D, and there is either zero or one 49036D SellerParty entity 49034D for each Party package 49022D. The ProposedSellerParty 49044D is of a type GDT 49048D "BusinessTransactionDocumentParty" 49050D, and there is either zero or one 49046D ProposedSellerParty entity 49044D for each Party package 49022D. The RequestorParty 49054D is of a type GDT 49058D "BusinessTransactionDocumentParty" 49060D, and there is either zero or one 49056D RequestorParty entity 49054D for each Party package 49022D. The ShipToParty 49064D is of a type GDT 49068D "BusinessTransactionDocumentParty" 49070D, and there is either zero or one 49066D ShipToParty entity 49064D for each Party package 49022D. The ManufacturerParty 49074D is of a type GDT 49078D "BusinessTransactionDocumentParty" 49080D, and there is either zero or one 49076D ManufacturerParty entity 49074D for each Party package 49022D.

The Location package 49084D includes a ShipToLocation entity 49094D and a ShipFromLocation entity 49086D at the fourth level. The ShipFromLocation entity 49086D is a GDT 49090D "BusinessTransactionBodumentLocation" 49092D, and there is either zero or one 49088D ShipToLocation 49094D for each Location package 49084D. The ShipToLocation entity 49094D is a GDT 49098D "BusinessTransactionBodumentLocation" 49000E, and there is either zero or one 49096D ShipToLocation 49094D for each Location package 49084D.

The BusinessDocumentObjectReference package 49004E includes a Purchasing Contract Reference 49006E, an Origin Purchase Order Reference 49016E, a Project Reference 49026E, and a Project Element Assignment 49036E at the fourth level. The Purchasing Contract Reference 49006E is a GDT 49010E "BusinessTransactionDocumentReference" 49012E, and there is either zero or one 49008E Purchasing Contract Reference 49006E for each BusinessDocumentObjectReference package 49004E. The Origin Purchase Order Reference 49016E is a GDT 49020E "BusinessTransactionDocumentReference" 49022E, and there is either zero or one 49018E Origin Purchase Order Reference 49016E for each BusinessDocumentObjectReference package 49004E. The Project Reference 49026E is a GDT 49030E "ProjectReference" 49032E, and there is either zero or one 49028E Project Reference 49026E for each BusinessDocumentObjectReference package 49004E. The Project Element Assignment 49036E is a GDT 49040E "ProjectElementAssignment" 49042E, and there is either zero or one 49038E Project Element Assignment 49036E for each BusinessDocumentObjectReference package 49004E.

The ProjectElementAssignment 49036E includes a FromProjectReference 49046E and a ToProjectReference 49056E at the fifth level. The FromProjectReference 49046E is a GDT 49050E "ProjectReference" 49052E, and there is one 49050E FromProjectReference 49046E for a ProjectElementAssignment 49036E. The ToProjectReference 49056E is a GDT 49060E "ProjectReference" 49062E, and there is one 49058E ToProjectReference 49056E for a ProjectElementAssignment 49036E.

The Accounting package 49066E includes an AccountingObjectSetAssignment entity 49068E in the fourth level. The AccountingObjectSetAssignment entity 49068E is a GDT 49072E "AccountingObjectSetAssignment" 49074E, and there is zero to any number of AccountingObjectSetAssignment entities 49068E for each Accounting package 49066E. The AccountingObjectSetAssignment entity 49068E includes a Percent 49078E, an Amount 49088E, a Quantity 49004F, and an AccountingObjectSet 49014F. The Percent 49078E is a GDT 49082E "Percent" 49084E, and there is either zero or one 49080E Percent 49078E for an AccountingObjectSetAssignment 49068E. The Amount 49088E is a GDT 49092E "Amount" 49000E, and there is either zero or one 49090E Amount 49088E for an AccountingObjectSetAssignment 49068E. The Quantity 49004F is a GDT 49008F "Quantity" 49010F, and there is either zero or one 49006F Quantity 49004F for an AccountingObjectSetAssignment 49068E. The AccountingObjectSet 49014F is a GDT 49018F "AccountingObject" 49020F, and there is either zero or one 49016F AccountingObjectSet 49014F for an AccountingObjectSetAssignment 49068E.

The Attachment package 49024F includes an AttachmentWebAddress entity 49026F in the fourth level. The AttachmentWebAddress entity 49026F is a GDT 49030F "AttachmentWebAddress" 49032F, and there is either zero or one 49028F AttachmentWebAddress entity 49026F for each Attachment package 49024F.

The Description package 49036F includes a Description entity 49038F and an InternalDescription 49048F in the fourth level. The Description entity 49038F is a GDT 49042F "Description" 49044F, and there is either zero or one 49040F Description entity 49038F for each Description package 49036F. The InternalDescription 49048F is a GDT 49042F "Description" 49044F, and there is either zero or one 49040F InternalDescription 49048F for each Description package 49036F.

The ScheduleLine package 49058F includes an ScheduleLine entity 49060F in the fourth level. The ScheduleLine entity 49060F is a "PurchaseRequestItemScheduleLine" 49066F, and there is one 49062F ScheduleLine entity 49060F for each ScheduleLine package 49058F. The ScheduleLine entity 49060F includes a DeliveryPeriod 49070F and a Quantity 49080F. The DeliveryPeriod 49070F is a GDT 49074F "DateTimePeriod" 49076F, and there is one 49072F DeliveryPeriod 49070F for a ScheduleLine 49060F. The Quantity 49080F is a GDT 49084F "Quantity" 49086F, and there is either zero or one 49082F Quantity 49080F for a ScheduleLine 49060F.

(b) PurchaseRequestConfirmation

The message data type element structure for the PurchaseRequestConfirmation message is depicted in FIG. 491A-B. The element structure is similar to the data model, but provides additional information regarding the details of the interface. The element structure identifies the different packages 49101 in the interface, and represents the entities at various levels within the interface. As depicted in FIG. 491A, the interface for PurchaseRequestConfirmation Message includes five levels 49102, 49103, 49104, 49105, 49106. The outermost package of this interface is a PurchaseRequestConfirmationMessage package 49109, which includes a PurchaseRequestConfirmation Message entity 49110 at the first level 49102. The Purchase Request Message entity 49110 is of a data type MDT 49111 "PurchaseRequestConfirmationMessage" 49112.

The PurchaseRequestConfirmationMessage package 49109 includes a Purchase Request package 49113. The Purchase Request package 49113 includes a Purchase Request entity 49114 at the second level. The Purchase Request entity 49114 is a "PurchaseRequestConfirmation" 49116, and there is one 49115 Purchase Request entity 49114 for each Purchase Request package 49113. The Purchase Request entity 49114 includes a BaseBusinessTransactionDocuentID 49117 at the third level. The BaseBusinessTransactionDocuentID 49117 is a GDT 49119 "BusinessTransactionDocumentID" 49120, and there is either one or two 49118 BaseBusinessTransactionDocuentID 49117 for a Purchase Request entity 49114.

The Purchase Request package 49113 also includes an Item package 49121. The Item package 49121 includes an Item entity 49122 at the third level. The Item entity 49122 is a "PurchaseRequestConfimmation" 49124, and there is from one to any number 49123 of Item entity 49122 for each Item package 49121. The Item entity 49122 includes a BsseBusinessTransactionDocumentItemID 49125, an OpenQuantityCancelledIndicator 49129, a TotalRequestedQuantity 49133, and a TotalOrderedQuantity 49137. The BsseBusinessTransactionDocumentItemID 49125 is a GDT 49127 "BusinessTransactionDocumentID" 49128, and there is either one or two 49126 BsseBusinessTransactionDocumentItemID 49125 for an Item entity 49122. The OpenQuantityCancelledIndicator 49129 is a GDT 49131 "Cancelled Indicator" 49132, and there is either zero or one 49130 OpenQuantityCancelledIndicator 49129 for an Item entity 49122. The TotalRequestedQuantity 49133 is a GDT 49135 "Quantity" 49136, and there is one 49134 TotalRequestedQuantity 49133 for an Item entity 49122. The TotalOrderedQuantity 49137 is a GDT 49139 "Quantity" 49140, and there is one 49138 TotalOrderedQuantity 49137 for an Item entity 49122.

The Item package 49121 includes a Fulfilling Purchase Order package 49141. The Fulfilling Purchase Order package 49141 includes a Fulfilling Purchase Order entity 49142 at the fourth level. The Fulfilling Purchase Order entity 49142 is a "Purchase Request Confirmation Item Fulfilling Purchase Order" 49144, and there is from zero to any number of Fulfilling Purchase Order entities 49142 for each Fulfilling Purchase Order 49141. The Fulfilling Purchase Order entity 49142 includes an ID 49145 and an OrderedIndicator 49149. The ID 49145 is a GDT 49147 "BusinessTransactionDocumentID" 49148, and there is one 49146 ID 49145 for a Fulfilling Purchase Order entity 49142. The OrderedIndicator 49149 is a GDT 49151 "Purchase Order OrderedIndicator" 49152, and there is either zero or one 49150 OrderedIndicator 49149 for a Fulfilling Purchase Order entity 49142.

The Fulfilling Purchase Order package 49141 includes a Fulfilling Purchase Order Item package 49153. The a Fulfilling Purchase Order Item package 49153 includes an Item entity 49154 in the fourth level. The Item entity 49154 is a "PurchaseRequestConfirmation-ItemFufillingpurchaseOrderItem" 49156, and there is from one to any number of Item entity 49154 for each Fulfilling Purchase Order Item package 49153. The Item entity 49154 includes an ID 49157 and a Quantity 49161 at the fifth level. The ID 49157 is a GDT 49159 "BusinessTransactionDocumentID" 49160, and there is one 49158 ID 49157 for an Item entity 49153. The Quantity 49161 is a GDT 49163 "Quantity" 49164, and there is either zero or one 49162 Quantity 49161 for an Item entity 49154.

mm) ReturnDeliveryInstructionNotification

A ReturnDeliveryInstructionNotification informs the vendor about the details of the return delivery, in particular about the ship-to location, the products being returned, the arrival times, and the carrier who is going to perform the shipment. This instruction is important since a return delivery can be necessary due to repairs, damage, disposal or scrapping, or regular return deliveries of unsold products.

The motivating business scenario for the ReturnDeliveryInstructionNotification message is found under circumstances of "Returns Processing" business scenario. The starting-point of the scenario is the Web-based request from a business partner for authorization to return goods, remaining materials, and so on. This request might not be made if there are regular returns. In these cases, the scenario starts as with the automatic sending of the ReturnDeliveryInstructionNotification. The product recipient (for third-party deals, also the original buyer or ordering party), using the ReturnDeliveryInstructionNotification, gives the vendor logistical instructions that help the vendor perform the return delivery. The vendor then informs the product recipient of the return delivery using a DespatchedDeliveryNotification. The product recipient can then use a ReceivedDeliveryNotification to confirm receipt of the return delivery to the vendor.

The vendor and product recipient parties have a rolls that are specially defined in the context of returns processing. A vendor is defined as a party who delivers goods or who performs a service. A product recipient is defined as a party to whom goods are delivered or for whom a service is performed (see GDT BusinessTransactionDocumentParty).

A message type ReturnDeliveryInstructionNotification is a message to a vendor containing logistical instructions for one of the return deliveries that he or she has to perform. The message type ReturnDeliveryInstructionNotification is specified by the message data type ReturnDeliveryInstructionNotificationMessage. The ReturnDeliveryInstructionNotification is sent from a product recipient to a vendor. The message transmission is always complete ("complete transmission"). The functionality of the ReturnDeliveryInstructionNotification is covered in the message standard "EDIFACT" by the message type RETINS (Instruction for Returns). In RosettaNet, this corresponds to the ReturnProductConfirmation message in the PIP 3C1 (return product). The ReturnDeliveryInstructionNotification, with its logistical instructions, goes beyond the ReturnProductConfirmation message.

Methods and systems consistent with the subject matter described herein use the package template for a BusinessTransactionDocument for an SCM Master Data depicted in FIG. 270B to derive the DeliveryInformation interface.

(a) PurchasingContract Interfaces

PurchasingContract interfaces are interfaces between contract management and purchasing. They are used throughout the life-cycle of purchasing contracts to exchange messages relating to these contracts. In the following, the term purchasing contract is referred to as contract, for simplicity.

The purchasing contract is a superordinate term that covers outline agreements and operational contracts. An outline agreement is the information for a contract in procurement systems involved in contract distribution. The operational contract contains contract information relevant for the procurement systems. In the following, the term purchasing contract is used for simplicity.

The aim of contract management is to provide contractual outline agreements for vendor relationships in a standard format in the company. This includes the life-cycle, from contract creation, through distribution to the respective purchasing organization, to checking whether the purchasing department actually observes the terms of the contract.

Implementing a standard company-wide contract management can help achieve cost-savings in purchasing. The company-wide bundling and consolidated contractual firming of similar requirements results in a stronger negotiating position that brings with it improved procurement prices. A more uniform maintenance of vendor relationships on the basis of more transparent global agreements raises the efficiency of the purchasing organization in day-to-day activities. With the monitoring that is provided, it is possible to react quickly and in targeted fashion to problematic and exceptional situations. By establishing supply contracts in company-wide fashion and then controlling whether they are being kept to, it is possible to avoid value losses that occur when individual units cover smaller requirements on an ad hoc basis, placing them with vendors that would not otherwise be favoured, at prices that are not the best.

The value contribution of contract management is therefore only really appreciable when as many units as possible within the company are incorporated. This means that, in a system landscape that is often very heterogeneous, involved systems must be supplied with the relevant information. Traditional procedures involve high process costs due to manual multiple entries, are prone to errors, and take longer. These disadvantages do not apply to electronic communication between the different systems involved in the contract lifecycle.

In the following, the term purchasing is used to describe the business role of the systems involved in purchasing.

Document management (this is actually the builder application but we will continue to refer to it as document management) generates the contract management document with the relevant clauses from the business data framework of the contract before sending it back to contract management as an attachment.

Contract management manages the information that is always valid for the connected operational purchasing. It triggers the creation of the legal contract text by document management. Contract management transfers the standard contract parts to all connected operational purchasing systems and receives information on contract usage caused by contract releases.

Operational purchasing receives the standard contract parts from contract management. Contract releases are communicated back to contract management.

As well as acting as a simple interface structure, the PurchasingContract interfaces define the fundamental business meaning and do away with the need to exchange proprietary information in simple contract scenarios. An integration of applications that implement the contract interfaces is possible without extensive project work.

In contract scenarios with complex price conditions, a standard codification is difficult because of the confusing array of conceivable condition models. One possibility would be to ensure a standard means of calculation of the price conditions in all affected systems. This means that a standard Customizing is maintained.

(2) Message Types

Five messages are used to represent a contract scenario in the current implementation: PurchasingContractLegalDocumentRequest, PurchasingContractLegalDocumentNotification, PurchasingContractUseRequest, PurchasingContractUseConfirmation, and PurchasingContractReleaseNotification.

The structures of the message types are defined by the three message data types. The message data type PurchasingContractLegalDocumentMessage is used for the message types PurchasingContractLegalDocumentRequest and PurchasingContractLegalDocumentNotification, the message data type PurchasingContractUseMessage is used for the message types PurchasingContractUseRequest and PurchasingContractUseConfirmation, and the message data type PurchasingContractReleaseMessage is used for the message type PurchasingContractReleaseNotification.

The messages that are described by the message data types PurchasingContractLegalDocumentMessage and PurchasingContractUseMessage use the object PurchasingContract in the PurchasingContractInformation view.

The PurchasingContractInformation view contains all contract data required for A2A contract scenarios. This is why it is used for both the PurchasingContractLegalDocumentMessage and PurchasingContractUseMessage messages. In both scenarios, a comprehensive transmission of contract information is required.

(a) PurchasingContractLegalDocumentRequest

A PurchasingContractLegalDocumentRequest is a request from contract management to document management to create a legal contract text from the purchasing contract. The structure of the message type PurchasingContractLegalDocumentRequest is prescribed by the message data type PurchasingContractLegalDocumentMessage that contains the object PurchasingContract in the PurchasingContractInformation view. Structural restrictions and integration requirements of the PurchasingContractLegalDocumentRequest in regard of the message data type PurchasingContractLegalDocument message are detailed below. A PurchasingContractLegalDocumentRequest message provides document management with a purchasing contract. In document management, enhancements are carried out and these are then added in the form of attachments. The structure of the purchasing contract business object remains unchanged. The process ownership remains with contract management.

(b) PurchasingContractLegalDocumentNotification

A PurchasingContractLegalDocumentNotification is a message from document management to a contract management with the legal contract document. The structure of the message type PurchasingContractLegalDocumentNotification is prescribed by the message data type PurchasingContractLegalDocumentMessage that contains the object PurchasingContract in the PurchasingContractInformation view. Structural restrictions and integration requirements of the PurchasingContractLegalDocumentNotification in regard of the message data type PurchasingContractLegalDocument message are detailed below. The created contract document is transmitted as structural component LegalDocumentAttachment. The remaining structural components of the MDT PurchaseOrderLegalDocumentMessage are not used.

(c) PurchasingContractUseRequest

A PurchasingContractUseRequest is a request from contract management to purchasing to use the transmitted outline agreement and to take changes in the outline agreement into consideration. The structure of the message type PurchasingContractUseRequest is prescribed by the message data type PurchasingContractUseMessage that contains the object PurchasingContract in the PurchasingContractInformation view. Structural restrictions or integration conditions of the PurchasingContractUseRequest in regard of the message data type PurchasingContractUse message are detailed below. The PurchasingContractUseRequest message starts a new contract distribution cycle or, where there are changes to the outline agreement in a contract distribution cycle that has already started, notifies purchasing of the current status.

The outline agreement communicates repeatedly in regard of changes, and imparts the current status of the outline agreement. Changes to header data and existing items could have been made, new items might have been added, while deleted items might no longer be included. If an item transferred at an earlier date is no longer contained in the outline agreement after a new distribution, this means that the item is deleted from the outline agreement.

A legal document created in document management can be contained in the PurchasingContractUseRequest message and sent as an attachment.

The PurchasingContractUseRequest can be sent an unlimited number of times—at any time—after the organizational unit responsible for the outline agreement is been established.

(d) PurchasingContractUseConfirmation

A PurchasingContractUseConfirmation is a confirmation from purchasing to the contract management concerning the use or change of use of an outline agreement that has been distributed for use. The structure of the message type PurchasingContractUseConfirmation is prescribed by the message data type PurchasingContractUseMessage that contains the object PurchasingContract in the PurchasingContractInformation view. Structural restrictions or integration conditions of the PurchasingContractUseConfirmation in regard of the message data type PurchasingContractUse Message are detailed below. The PurchasingContractUseConfirmation message confirms the successful creation or change of items in an operational contract by sending the IDs for item and contract with reference to the relevant IDs in the outline agreement.

Errors when creating or changing local contracts or contract items for the outline agreement are dealt with by the messaging infrastructure.

The PurchasingContractUseConfirmation contains information on the created objects (ID and item ID) for a transmitted outline agreement (ID and item ID). No internal information is communicated in regard of the operational contract. In particular, no changes to internal parts of a contract are transmitted.

(e) PurchasingContractReleaseNotification

A PurchasingContractReleaseNotification is a notification from purchasing to contract management concerning a contract release. A notification concerning a release can be generated from a purchase order, goods receipt, service entry, or invoice with reference to a transmitted outline agreement. The structure of the message type PurchasingContractReleaseNotification is prescribed by the message data type PurchasingContractReleaseMessage. Following a PurchasingContractUseConfirmation, an unlimited number of PurchasingContractReleaseNotification messages can be sent.

The PurchasingContractReleaseNotification can be triggered by the following objects: a purchase order with contract reference (concrete release quantity or concrete release value known); a goods receipt in the case of a limit purchase order (the release amount is determined at the time of the goods receipt); a service entry in the case of a limit purchase order (the release amount is determined at the time of the service entry); and an invoice (for example travel expenses: Hotel invoice without purchase order in the scope of an outline agreement with a hotel chain).

If the triggering documents are changed, the most current PurchasingContractReleaseNotification overwrites all messages previously sent for the respective document.

Deletion of an item of a triggering document is represented in the form of an ActionCode in the PurchasingContractReleaseNotification message.

The PurchasingContractRequest and PurchasingContractConfirmation messages would support the negotiation process for a purchasing contract; however both messages will not be implemented in the near future.

(3)

(4) Message Choreography

The following message choreography describes the possible logical sequence of the messages that can be used to realize the scenario between a Document Builder server 49200, a Purchasing Contract Management server 49202, a Purchasing server 49204, and a Sales server 49206.

In the following, the interaction between the represented PurchasingContract interfaces in a contract process is described in detail. There are two distinct scenarios that deal with a particular part of the contract life-cycle and use specific messages. The first scenario is the creation of the legal contract document with the two messages PurchasingContractLegalDocumentRequest 49208 and PurchasingContractLegalDocumentNotification 49210. This occurs within the scope of creation of a new purchasing contract or a purchasing contract that requires renegotiation. The second scenario is the distribution of an outline agreement that has already been created with the PurchasingContractUse messages and the monitoring of releases with the PurchasingContractReleaseNotification. The legal contract document created prior to this can be included in distribution in the form of an attachment.

The purchaser takes the initiative and creates the legal contract document. Typically, the contract is in an early stage of the contract life-cycle, for example the negotiation and creation stage. The creation of the structured document with the business-related data in contract management can occur in the form of a bid invitation or can be created by the purchaser directly using delivery negotiations as the basis, for example. Traditionally, the legal department is involved in the creation of the legal text based on the business data framework. After the legal form of words has been agreed upon, it is then signed and is traditionally stored as an unstructured text document on a file server. This manual process of agreement between structured document in contract management and legal text document is transmitted to a system-integrated process by the PurchasingContractLegalDocumentRequest message 49208 and the PurchasingContractLegalDocumentNotification message 49210.

In the scope of contract negotiations, contract management can send the current status of the structured business document to document management using the PurchasingContractLegalDocumentRequest message 49208 at certain times. The conditions that lead to the document being sent are defined by the user of the external application. This system creates the legal text document from the structured data framework. In this way, document management can use predefined legal clauses and text modules in order to organize the internal process of the legal department more efficiently. The legal text document that has been created is then sent back to contract management in the form of an attachment with the PurchasingContractLegalDocumentNotification message 49210. The structure of the purchasing contract business document does not change.

Contract distribution is based on a completed outline agreement that can be supplemented by an attached legal text document. Settings in the contract management system determine to which operational purchasing systems an outline agreement can be distributed for use. Purchasing organizations can also enter themselves for an outline agreement by assigning themselves to its distribution list.

The outline agreement provides the purchasing organization with the framework for operational purchasing contracts. In addition to the data that is passed on, operational purchasing contracts can also contain elements like additional country-specific information. The PurchasingContractUseRequest message 49212 and PurchasingContractUseConfirmation 49214 messages on contract management side are always only requests that outline agreements be used. Purchasing can display the transfer on item-basis using the PurchasingContractUseConfirmation 49214. An internal control process (to establish which contract data has been changed in which system, for example) does not occur. Such an alignment process is not workable due to the potentially high number of affected local purchasing systems.

After changes have been made to the outline agreement, the current status is communicated to all affected systems. Purchasing can then display the transfer of the changed outline agreement on item basis. A contextual adjustment of transferred changes does not occur here either.

A central monitoring of the contract usage is facilitated by the PurchasingContractReleaseNotification message 49216. The PurchasingContractReleaseNotification message 49216 transmits to contract management information on releases for an operational contract that resulted from an outline agreement. Releases can result from purchase orders with reference to operational contracts, from service entries in the case of limit purchase orders with contract reference, or from invoices with contract reference that are created without preceding purchase order (for example, hotel invoices in the scope of travel expenses).

The Purchasing server 49204 can send a PurchaseOrderRequest message 49218 to the Sales server 49206. Upon successful completion of the request, the Sales server 49206 can send a PurchaseOrderConfirmation message 49220 to the Purchasing server 49204.

As an example of how this choreography may play out, in central purchasing, a new outline agreement can be negotiated. The business details of that agreement can be transferred to a document management system for creation of the legal text document. The legal document can be sent back to central purchasing as an attachment. Before the final conclusion of a contract, two changes might be necessary to both the business document in the contract management system and to the legal document in the external application. The global outline agreement can be finally signed and transmitted to five affected purchasing systems. Two purchasing organizations can confirm the creation of local contract items for all transferred items of the outline agreement. The three other purchasing organizations only notify the transfer of individual items of the outline agreement to an operational purchasing contract and need to carry out some content changes and some country-specific changes. A field control in the systems can be used to prevent certain fields from being changed and guidelines for possible changes and enhancements are defined on an organizational level. In the scope of operational daily business, central purchasing is notified of the current status of contract usage due to the transfer of local contract releases.

To serialize the messages, the messages within a contract process are transferred exactly once in order (EOIO) and are serialized using message queues. There should be one message queue per contract process (and not just one queue for all contract processes). This helps prevent one erroneous message from blocking all other contract messages throughout the whole system.

To handle errors, business errors have to be sorted out in the correct order. A receiving system should accept every formal contract message that is received correctly. In contract management, business errors have to be resolved via a PurchasingContractUseRequest message or a PurchasingContractLegalDocumentRequest message. In the purchasing system, the errors have to be resolved by a PurchasingContractUseConfirmation message, and in the document management system, by a PurchasingContractLegalDocumentNotification message. The receiving system differentiates between technical and business errors. Borderline cases also exist. These are, for example, erroneous ISO codes for currency, language, and so on. Where a corrupt contract process has to be restarted as a result of an erroneous message, the contract management system has to provide a way to transmit the current status of the outline agreement with a PurchasingContractUseRequest message or PurchasingContractLegalDocumentRequest including all data, at all times. To restart a process after an erroneous PurchasingContractUseRequest or PurchasingContractLegalDocumentRequest message, the purchasing system should always be in a position to start a contract process again with a PurchasingContractUseRequest or PurchasingContractLegalDocumentRequest message. The contract management system uses the error to decide whether one, several, or all affected systems are to be considered in the release process.

(5) Message Interfaces

The PurchasingContractLegalDocument messages are implemented by two message interfaces on the side of the contract management system. On contract management side, these are: PurchasingContractLegalDocumentRequest_Out and PurchasingContractLegalDocumentNotification_In. The messages in the contract distribution process are implemented by the following message interfaces on contract management system side and purchasing system side. On contract management side, these are: PurchasingContractUseRequest_Out, PurchasingContractUseConfirmation_In, and PurchasingContractReleaseNotification_In. On purchasing system side, these are: PurchasingContractUseRequest_In, PurchasingContractUseConfirmation_Out, and PurchasingContractReleaseNotification_Out.

(6) Message Data Type PurchasingContractUseMessage

FIGS. 493A-D depict a data model of the message data type PurchasingContractUseMessage. The message data type PurchasingContractUseMessage groups the business information that is relevant for the sending of a business document in a message and the PurchasingContract object in the business document in the view that is required by PurchasingContractUse. A PurchasingContractUseMessage package 49301 contains packages: MessageHeader package BB02 and PurchasingContract package 49303. The PurchasingContractUseMessage package 49301 also contains a PurchasingContractUseMessage entity 49304.

The following rules can govern the use of elements and entities within the message data type PurchasingContractMessage in regard of their changeability within a contract process:

If it has been specified that the element or the entity cannot be changed, changes are not permitted after creation. The element or the entity can be assigned a new value during creation of a contract or when a new item is created within a contract. This value cannot be changed in subsequent messages.

When referring to changes, the description of this interface is referring to those changes that are actually real changes and not another representation of the same data (For example, the same product can be referenced by a proprietary ID or a standard ID. Both options are just different representations of the same data and can be used interchangeably and do not constitute changes). This same content is deemed to be a different ID for the same object and a different order in the case of elements that occur more than once. Other same content is described explicitly for the relevant element or entity.

If certain elements or entities of the PurchasingContractUseMessage message data types are not used in all message types that are based on the PurchasingContractUseMessage message data types, this can be specified as "Integration Conditions."

The message data type PurchasingContractUseMessage provides the structure for the message types PurchasingContractUseRequest, PurchasingContractUseConfirmation, and the interfaces that are based on them.

(a) MessageHeader Package

A MessageHeader package 49302 groups the business information that is necessary to send a business document in a message. The MessageHeader package 49302 contains a MessageHeader entity 49305.

The MessageHeader entity 49305 is the quantity of non-technical administrative information in the PurchasingContractUse message. A SenderParty entity 49306 and a RecipientParty entity 49307 exist for the MessageHeader entity 49305. There is a 1:1 relationship between the PurchasingContractUseMessage entity 49304 and the MessageHeader entity 49305. There is a 1:cn relationship between the MessageHeader entity 49305 and the RecipientParty entity 49307. Where a relationship is identified between entitites in FIGS. 493A-D for this Interface, the respective relationship is a 1:c relationship unless otherwise noted herein or indicated in FIGS. 493A-D.

The MessageHeader contains the elements: MessageID, ReferencedMessageID, and CreationDateTime. The MessageID is the unique identification of the BusinessDocument. MessageID is of the type GDT: MessageID. The ReferencedMessageID is the unique reference to a preceding BusinessDocument. ReferencedMessageID is of the type GDT: MessageID. CreationDateTime is the time when the BusinessDocument was created. CreationDateTime is of type GDT: DateTime.

The SenderParty entity 49306 is a party that is the business sender of a message. The SenderParty entity 49306 is of the type GDT: BusinessTransactionDocumentParty. The SenderParty entity 49306 can be filled by the sending application to specify a contact person should there be problems with the message. The SenderParty entity 49306 is only intended as an aid during message transmission and can be ignored by the receiving application.

The RecipientParty entity 49307 is a party that is a business recipient of a message. The RecipientParty entity 49307 is of the type GDT: BusinessTransactionDocumentParty.

(b) PurchasingContract Package

A PurchasingContract package 49303 groups a PurchasingContract with its packages. The PurchasingContract package 49303 contains the packages: Party package 49308, Location package 49309, DeliveryInformation package 49310, PaymentInformation package 49311, PriceInformation package 49312, Attachment package 49314, Description package 49315, and Item package 49316. The PurchasingContract package 49303 also contains a PurchasingContract entity 49317.

A PurchasingContract entity 49317 is an outline agreement to order products (including performance of services) within a certain period of time that is binding for all parties. Total quantities or total values and also conditions that are to be released are defined in a contract. A PurchasingContract entity 49317 can contain company-internal information, such as details on affected organizational units. The PurchasingContract is subdivided into PurchasingContractItems that contain data on product or additional information for such a product (see PurchasingContractItem package). The price agreements for a product are listed. (See the PriceInformation package).

As well as the purchasing party and the seller, further parties can also be involved with the PurchasingContract (see Party package). Locations can be defined for the delivery of the PurchasingContract (see Location package). Delivery and payment details are also agreed (see DeliveryInformation package or PaymentInformation package). It is possible to add notes to the PurchasingContract or to specify links to attachments (see Description package or Attachment package). It is also possible to define the types of follow-on documents are expected for the PurchasingContract package (see BusinessTransactionDocumentReference package).

The PurchasingContract entity 49317 is of the type PurchasingContractInformation. There is a 1:1 relationship between the PurchasingContractUseMessage entity 49304 and the PurchasingContract entity 49317. The PurchasingContract entity 49317 contains the elements: ID, CreationDateTime, LastChangeDateTime, CompletedIndicator, BlockedIndicator, ValidityPeriod, Note, and TargetAmount. The ID is the unique identifier assigned by the purchaser for the purchasing contract. The CreationDateTime is the creation time of the PurchasingContract document. The CreationDateTime is of the type GDT: DateTime. The LastChangeDateTime is the time of the last change of the purchasing contract by the purchaser. The LastChangeDateTime is of the type GDT: DateTime. The CompletedIndicator specifies whether or not the purchasing contract has been completed by releases with contract reference. The CompletedIndicator is of the type GDT: BusinessTransactionCompletedIndicator. The BlockedIndicator specifies whether or not a purchasing contract is locked for releases. A validity period is not defined when the indicator is set. The BlockedIndicator is of the type GDT: BusinessTransactionBlockedIndicator. the ValidityPeriod is the validity period of the PurchasingContract document. The ValidityPeriod is of the type GDT: DateTimePeriod. The Note is a short description or title of the PurchasingContract document. It is generally used to provide the user with a simple way to search for a certain PurchasingContract document. The note is of type GDT: Note. The TargetAmount describes the target value of a purchasing contract. The TargetAmount is of type GDT: Amount.

Within a purchasing contract, monetary amounts and prices can be maintained in the same currency. The ID is not changed after creation of the purchasing contract. The CreationDateTime is not changed after creation of the purchasing contract. The BlockedIndicator in the document header, if set to "true", overrides the ActiveIndicator at item level. The CompletedIndicator, if set to "true" in the document header, overrides the ActiveIndicator at item level.

A purchasing contract is a business object that contains the subtypes outline agreement and operational purchasing contract. Unlike with outline agreements, releases can occur from an operational contract.

(i) PurchasingContractParty Package

The Party package 49308 groups business parties that can feature in one of the PurchasingContractUse messages. The Party package 49308 contains the entities: BuyerParty entity 49319, SellerParty entity 49321, ProductRecipientParty entity 49322, and ContractReleaseAuthorisedParty entity 49323. Either the ID, or address and ID can be transmitted for each party. If the ID is transmitted, the address for the ID stored in the master data is relevant. If ID and address are transmitted, the ID identifies the party and the address is the document address that differs from the address stored in the master data. If possible, both ID and address can be sent to prevent misunderstandings. The receiving application can implement a suitable optimization strategy to prevent lots of identical document addresses.

For parties, default logic applies from the header to the items, and within item hierarchies. Parties that are specified in the header apply for items for which no relevant party is explicitly transferred and which are directly on the header. Parties that are transferred on item level apply for subitems that are under the relevant item in the item hierarchy. The default logic applies for the party including contact person as a whole. On item level, no parts of a party on header level or in a hierarchy can be specified more precisely. The default logic is a simplification of the message that is transferred. From a logical standpoint, parties on the header and hierarchy items behave as if they were explicitly transferred. This also means that when not all, but just changed items are transferred, the parties only apply for the transferred items. If a party is changed, then all items that are valid for this party are also changed.

The BuyerParty entity 49319 is a party that purchases a product or service in accordance with an outline agreement. The BuyerParty entity 49319 is of the type GDT: BusinessTransactionDocumentParty. The BuyerParty entity 49319 contains the responsible purchaser. In PurchasingContract messages, the BuyerParty entity 49319 can be specified on a header level. In some implementations, the BuyerParty entity 49319 must be specified.

The SellerParty entity 49321 is a party that sells goods/services in accordance with an outline agreement. The SellerParty entity 49321 is of the type GDT: BusinessTransactionDocumentParty. In PurchasingContract messages, the SellerParty entity 49321 can be specified on a header level (e.g., restricted to only being specified on a header level).

In a contract scenario, a ProductRecipientParty entity 49322 is a party that receives goods or services. The ProductRecipientParty entity 49322 is of the type GDT: BusinessTransactionDocumentParty. The ProductRecipientParty entity 49322 is not used as a synonym for the ShipToLocation. It should only be used if the ProductRecipientParty entity 49322 really does differ from the BuyerParty entity 49319 as company or person.

The ContractReleaseAuthorisedParty entity 49323 is a party that is authorized to effect releases from a purchasing contract. The ContractReleaseAuthorisedParty entity 49323 is of the type GDT: BusinessTransactionDocumentParty. There is a 1:cn relationship between the PurchasingContract entity 49317 and the ContractReleaseAuthorizedParty entity 49323. In the PurchasingContract messages, the ContractReleaseParty entity 49323 can be specified on a header level. The release-authorized purchasing organization is authorized to effect releases from a contract. The releases occur from purchase orders, and from goods receipts/service entries and invoices in the case of limit purchase orders. If the releases occur from purchase orders, the ContractReleaseAuthorisedParty entity 49323 is the BuyerParty entity 49319 in the following order process.

(ii) PurchasingContractLocation Package

The Location package 49309 groups locations that are relevant for a purchasing contract. The Location package 49309 contains a ShipToLocation entity 49328. Default logic applies for the location, analogous to the default logic for parties. Either the ID, or the address, or both can be transmitted for each location. If the ID is transmitted, the address for the ID stored in the master data is relevant. If the address is transmitted, this address applies (it might be necessary to assign a location at the recipient address). If both ID and address are transmitted, the ID identifies the location and the address is the document address that differs from the address stored in the master data. Both ID and address can be sent to prevent misunderstandings. The receiving application can implement a suitable optimization strategy to prevent lots of identical document addresses.

The ShipToLocation entity 49328 is the location where goods are to be delivered/services are to be performed. The ShipToLocation entity 49328 is of the type GDT: BusinessTransactionDocumentLocation.

(iii) PurchasingContractDeliveryInfommation Package

The DeliveryInformation package 49310 groups information for a delivery requested in a purchasing contract. The DeliveryInformation package 49310 contains a DeliveryTerms entity 49329. Default logic applies for the DeliveryTerms entity 49329. This default logic is analogous to the default logic for Parties.

The DeliveryTerms entity 49329 is the conditions and agreements that apply to the delivery and transport of ordered goods and to the necessary services and activities. The DeliveryTerms entity 49329 is of the type GDT: DeliveryTerms. The DeliveryTerms entity 49329 contains the entities: Incoterms entity 49330 and QualityTolerance entity 49331. The Incoterms entity 49330 is used for material items. The default logic takes the Incoterms entity 49330 and transport into account in the case of material items. The Incoterms entity 49330 and transport are ignored for other items.

(iv) PurchasingContractPaymentInformation Package

The PaymentInformation package 49311 contains the entities: CashDiscountTerms entity 49332 and PaymentForm.

The CashDiscountTerms entity 49332 is the payment conditions in an order process. The CashDiscountTerms entity 49332 is of type GDT: CashDiscountTerms. The CashDiscountTerms entity 49332 contains the entities: MaximumDiscount entity 49333 and NormalDiscount entity 49334.

The PaymentForm entity is the payment method with the necessary data for the payment method. The PaymentForm entity contains a PaymentFormCode element. The PaymentFormCode is the coded representation of the payment method. The PaymentFormCode is of the type GDT: PaymentFormCode. The PaymentForm contains a PaymentCard entity The PaymentCard entity is a credit card or a customer card. The PaymentCard entity is of the type GDT: PaymentCard. The PaymentCard entity can be used for the payment method PaymentCard (PaymentFormCode "02").

(v) PriceInformation Package

The PriceInformation package 49312 is the grouping of price information with reference to the purchasing contract. The PriceInformation package 49312 contains a PriceSpecificationElement entity 49335. The PurchasingContract entity 49317 has a 1:cn relationship with PriceSpecificationElement entity 49335.

The PriceSpecificationElement entity 49335 is the definition of a price, a discount or a surcharge that is dependent on a combination of properties and that is valid for a certain period of time. The PriceSpecificationElement entity 49335 is of type GDT: PriceSpecificationElement.

(vi) PurchasingContractAttachment Package

The Attachment package 49314 is the grouping of attachment information with reference to the purchasing contract. The Attachment package 49314 contains the entities: AttachmentWebAddress entity 49336, InternalAttachmentWebAddress entity 49337, and LegalDocumentAttachment entity 49338. The PurchasingContract entity 49317 has a 1:cn relationship with AttachmentWebAddress entity 49336, InternalAttachmentWebAddress entity 49337, and LegalDocumentAttachment entity 49338

The AttachmentWebAddress entity 49336 is a WebAddress for a document that refers to a PurchasingContract. The AttachmentWebAddress entity 49336 is of the type GDT: WebAddress.

An InternalAttachment entity 49337 is a WebAddress for a document (for internal use) that refers to a PurchasingContract. The InternalAttachmentWebAddress entity 49337 is of type GDT: WebAddress.

A LegalDocumentAttachment entity 49338 is an attachment that contains the legal contract text of the PurchasingContract. The Attachment entity 49338 is of the type GDT: Attachment.

(vii) PurchasingContractDescription Package

The Description package 49315 is the grouping of texts with reference to the purchasing contract. The Description package 49315 contains the entities: Description entity 49340 and InternalDescription entity 49341.

The Description entity 49340 is a more visible, more explanatory text for the business partner, with reference to the purchasing contract. The Description entity 49340 is of the type GDT: Description. The Description entity 49340 can be used for types of textual information that refer to the transmitted purchasing contract and not just to the current message. An example of this could be a note that details that the responsible employee in purchasing is on holiday from a certain date, and that provides the name and telephone number of a substitute for this period.

The InternalDescription entity 49341 is a descriptive text with reference to the purchasing contract that is not visible to the business partner. The description entity 49341 is of the type GDT: Description.

(viii) PurchasingContractItem Package

The PurchasingContractItem package 49316 groups the PurchasingContractItem with its packages. The PurchasingContractItem package 49316 contains the following packages: ProductInformation package 49342, PriceInformation package 49343, Party package 49344, Location package 49345, DeliveryInformation package 49347, BusinessDocumentObjectReference package 49348, Attachment package 49350, and Description package 49351. The PurchasingContractItem package 49316 also contains a PurchasingContractItem entity 49352.

The PurchasingContractItem entity 49352 specifies a certain product in a purchasing contract or additional information for such a product. The PurchasingContractItem entity 49352 contains detailed data for a product (see Product package) and its price (see Price package). The price conditions that contain the price depending on order quantity belong to the Price package.

It is possible to define differing parties and delivery methods (than those in the PurchasingContractDocument) for the PurchasingContractItem (see Party Package, DeliveryInformation Package). The PurchasingContractItem can contain references to other business documents that are relevant for the item (see BusinessTransactionDocumentReference package). Furthermore, it is possible to create notes or links to attachments for the item (see Description package or Attachment package).

A PurchasingContractItem entity 49352 can be hierarchically assigned at a lower level to another PurchasingContractItem entity 49352 in order to represent a business connection between the two items. This could take the form of a discount in kind or substitute product for an ordered product.

This assignment can also lead to a grouping of the items of a purchasing contract, meaning that a PurchasingContractItem entity 49352 can group further PurchasingContractItems entity 49352.

The PurchasingContractItem entity 49352 is of the type PurchasingContractDocumentItem. The PurchasingContractItem entity 49352 contains the following elements: ID, AcitveIndicator, TypeCode, TargetQuantity, TargetAmount, MinimumOrderQuantity, and MinimumOrderAmount. The ID is a contract item identifier assigned by the purchaser that is unique within a purchasing contract. The ID is of type GDT: BusinessTransactionDocumentItemID. The AcitveIndicator specifies whether or not a purchasing contract may be used. The ActiveIndicator is of type GDT: ActiveIndicator. The TypeCode is a coded representation of the type of an item of a purchasing contract. The TypeCode is of type GDT: BusinessTransactionDocumentItemTypeCode. The TargetQuantity is an envisaged total quantity for the product that is to be purchased within the scope of a purchasing contract. The TargetQuantity is of the type GDT: Quantity. The TargetAmount is an envisaged total value for the product that is to be purchased within the scope of a purchasing contract. The TargetAmount is of type GDT: Amount. The MinimumOrderQuantity is a minimum order quantity for the product that is to be purchased within the scope of a purchasing contract. The MinimumOrderQuantity is of type GDT: Quantity. The MinimumOrderAmount is a minimum order value for the product that is to be purchased within the scope of a purchasing contract. The MinimumOrderAmount is of type GDT: Amount.

The ID is not changed after an item has been created. Dependencies of elements or entities of item type are described below.

(a) PurchasingContractItemProductInformation Package

The ProductInformation package 49342 is the grouping of information for identification, description, and classification of a product that can be procured using a purchasing contract item. The ProductInformation package 49342 contains the entities: Product entity 49354 and ProductCategory entity 49355. A product or a product category can be specified.

The Product entity 49354 is the identification, description, and classification of a product or service. The Product entity 49354 is of type GDT: BusinessTransactionDocumentProduct. In some implementations, only the InternalID is used.

The ProductCategory entity 49355 is the product category of a product or service. The ProductCategory entity 49355 is of type GDT: BusinessTransactionDocumentProductCategory. In some implementations, only the InternalID is used.

(b) PurchasingContractItemPriceInformation Package

The PurchasingContractitemPriceInformation package 49343 contains a PriceSpecificationElement entity 49356. The PurchasingContractItemPriceInformation package 49343 is analogous to PurchasingContractPriceInformation package 49312 in the header.

(c) PurchasingContractItemParty Package

The Party package 49344 groups relevant parties for a purchasing contract item. The Party package 49344 contains a ProductRecipientParty entity 49361.

The ProductRecipientParty entity 49361 is a party to which goods are delivered or for which services are performed. The ProductRecipientParty entity 49361 is of the type GDT: BusinessTransactionDocumentParty. If no ShipToLocation is explicitly specified in an order process, the address of the ShipToParty is taken as the delivery address.

The ProductRecipientParty entity 49361 is not be used as a synonym for the ShipToLocation and can be used if the ProductRecipientParty entity 49361 differs from the BuyerParty as company or person.

In the contract distribution scenario, the ProductRecipientParty entity 49361 can be specified for a certain item that differs from the ProductRecipientParty entity 49361 on header level according to the default logic.

(d) PurchasingContractItemLocation Package

The Location package 49345 groups relevant locations for a purchasing contract item. The Location package 49345 contains a ShipToLocation entity 49365.

The ShipToLocation entity 49365 is the location to which goods are to be delivered or at which a service is to be performed. The ShipToLocation entity 49365 is of the type GDT: BusinessTransactionDocumentLocation. In the contract distribution scenario, a certain ShipToLocation entity 49365 can be specified for a certain item that differs from the ShipToLocation on header level according to the default logic.

(e) PurchasingContractItemDeliveryItemOInformation Package

The PurchasingContractItemDeliveryInformation package 49347 contains a DeliveryTerms entity 49367. The DeliveryTerms entity 49367 contains the entities: Incoterms entity 49368 and QuantityTolerance entity 49369. The PurchasingContractItemDeliveryInformation package 49347 is analogous to the PurchasingContractDeliveryInformation package 49310 in the header area.

(f) PurchasingContractItemBusinessDocumentObjectReference Package

The BusinessDocumentObjectReference package 49348 is the grouping of references to business documents that are relevant for the PurchasingContractDocumentItem and are connected to the item in a business sense. The BusinessDocumentObjectReference package 49348 contains the entities: QuoteReference entity 49370, OperationalPurchasingContractReference entity 49371, and BuyerProductCatalogueReference entity 49372.

The QuoteReference entity 49370 is the reference to a bid of the purchaser or to an item within a bid. The QuoteReference entity 49370 is of type GDT: BusinessTransactionDocumentReference.

The OperationalPurchasingContractReference entity 49371 is the reference to an operational purchasing contract or to an item within an operational purchasing contract. The OperationalPurchasingContractReference entity 49371 is of type GDT: BusinessTransactionDocumentReference.

The BuyerProductCatalogueReference entity 49372 is the reference to a product catalog of the purchaser or to an item within such a catalog. The BuyerProductCatalogueReference entity 49372 is of type GDT: CatalogueReference. A BuyerProductCatalogueReference entity 49372 can reference one item. This means that a maximum of one ItemID is permitted. The BuyerProductCatalogueReference entity 49372 can be filled if a contract item refers to a catalog whose number and item numbers have been assigned by the purchaser.

(g) PurchasingContractItemAttachment Package

The Attachment package 49350 is the grouping of attachments information with reference to a purchasing contract item. The Attachment package 49350 contains the entities: Attachment entity 49380 and InternalAttachment entity 49381.

The Attachment entity 49380 is a WebAddress for a document that refers to a PurchasingContractItem. The Attachment entity 49380 is of type GDT: WebAddress.

The InternalAttachment entity 49381 is a WebAddress for a document that refers to a PurchasingContractItem and that is only intended for internal use. The InternalAttachmentWebAddress entity 49381 is of type GDT: WebAddress.

(h) PurchasingContractItemDescription Package

The PurchasingContractItemDescription package 49351 contains the entities: Description entity 49382 and InternalDescription entity 49383. The PurchasingContractItemDescription package 49351 is analogous to the Description package 49315 on the header level.

(7) Message Data Type PurchasingContractReleaseMessage

FIGS. 494A-D depict a data model of the message data type PurchasingContractReleaseMessage. The message data type PurchasingContractReleaseMessage contains the business information that is relevant for sending of a business document in a message and the PurchasingContractRelease object contained in the business document. The PurchasingContractReleaseMessage package 49402 contains the packages: MessageHeader package 49404 and PurchasingContractRelease package 49406. The PurchasingContractReleaseMessage package 49402 also contains a PurchasingContractReleaseMessage entity 49408.

The following rules govern the use of elements and entities within the message data type PurchasingContractMessage in regard of their changeability within a contract process:

If it has been specified that the element or the entity cannot be changed, changes are not permitted after creation. The element or the entity can only be assigned a new value during creation of a contract or when a new item is created within a contract. This value cannot be changed in all subsequent messages.

When referring to changes, the description in this interface is referring to those changes that are actually real changes and not another representation of the same data (For example, the same product can be referenced by a proprietary ID or a standard ID. Both options are just different representations of the same data and can be used interchangeably and do not constitute changes). This same content is deemed to be a different ID for the same object and a different order in the case of elements that occur more than once. Other same content is described explicitly under "Notes" for the relevant element or entity.

If certain elements or entities of the PurchasingContractUseMessage message data types are not used in all message types that are based on the PurchasingContractUseMessage message data types, this is specified below.

The message data type PurchasingContractReleaseMessage provides the structure for the message types PurchasingContractReleaseRequest and the interfaces that are based on them.

(a) MessageHeader Package

The MessageHeader package 49404 groups the business information that is necessary to send a business document in a message. The MessageHeader package 49404 contains a MessageHeader entity 49410. There is a 1:1 relationship between the PurchasingContractReleaseMessage entity 49408 and the MessageHeader entity 49410. Where a relationship is identified between entitites in FIGS. 494A-D for this Interface, the respective relationship is a 1:c relationship unless otherwise noted herein or indicated in FIGS. 494A-D.

The MessageHeader entity 49410 is the quantity of non-technical administrative information in the PurchasingContractRelease message. A SenderParty entity 49412 exists for the MessageHeader entity 49410 as well as a RecipientParty entity 49414. The MessageHeader entity 49410 contains the elements: MessageID, ReferencedMessageID, and CreationDateTime. The MessageID is the unique identification of the BusinessDocument. The MessageID is of type GDT: MessageID. The ReferencedMessageID is the unique reference to a preceding BusinessDocument. The ReferencedMessageID is of the type GDT: MessageID. The CreationDateTime is the time at which the BusinessDocument was created. The CreationDateTime is of type GDT: DateTime.

The SenderParty entity 49412 is a party that is the sender of a message in a business sense. The SenderParty entity 49412 is of type GDT: BusinessTransactionDocumentParty. The SenderParty entity 49412 can be filled by the sending application to specify a contact person should there be problems with the message. The SenderParty entity 49412 is only intended as an aid during message transmission and can be ignored by the receiving application.

The RecipientParty entity 49414 is a party that is a business recipient of a message. The RecipientParty entity 49414 is of the type GDT: BusinessTransactionDocumentParty. There is a 1:cn relationship between the MessageHeader entity 49410 and the RecipientParty entity 49414.

(b) PurchasingContractRelease Package

The PurchasingContractRelease package 49406 groups a PurchasingContract with its packages. The PurchasingContractRelease package 49406 contains the packages: Party package 49416, Location package 49418 and Item package 49420. The PurchasingContractRelease package 49406 also contains a PurchasingContractRelease entity 49422. There is a 1:1 relationship between the PurchasingContractReleaseMessage entity 49408 and the PurchasingContractRelease entity 49422.

The PurchasingContractRelease entity 49422 (purchasing contract release) is a notification from purchasing to contract management regarding a performed release with reference to a purchasing contract. A purchasing contract release can be generated from a purchase order, goods receipt, service entry, or invoice with reference to a contract that has been distributed for use. The buying party is involved (see Party package). Locations for the delivery of the PurchasingContractRelease can be specified (see Location package).

The PurchasingContract is subdivided into PurchasingContractItems that contain data on the location (see PurchasingContractItem-Location Package). In addition, it is possible to include a reference to the original purchasing contract (see BusinessTransactionDocumentReference package).

The PurchasingContractRelease entity 49422 is of the type PurchasingContractRelease. The PurchasingContractRelease entity 49422 contains the elements: BaseBusinessTransactionDocumentID, BaseBusinessTransactionDocumentTypeCode, and BaseBusinessTransactionDocumentDateTime. The BaseBusinessTransactionDocumentID is a unique identifier for a business document on which the PurchasingContractRelease is based and is of type GDT: BusinessTransactionDocumentID. The BaseBusinessTransactionDocumentTypeCode is a coded representation of the business document type on which the PurchasingContractRelease is based. The types currently relevant for message type PurchasingContractRelease are purchase order, invoice, goods receipt and service entry. The BaseBusinessTransactionDocumentTypeCode is of type GDT: BusinessTransactionDocumentTypeCode. The BaseBusinessTransactionDocumentDateTime is a document date of a business document on which the PurchasingContractRelease is based and is of type GDT: DateTime.

The PurchasingContractRelease entity 49422 can be triggered by the following objects: a purchase order with contract reference (concrete release quantity or concrete release value), a goods receipt in the case of a limit purchase order (the release amount is set at the time of goods receipt), a service entry in the case of a limit purchase order (the release amount is set at the time of service entry), and an invoice (for example travel expenses: Hotel invoice without purchase order using an outline agreement with a hotel chain).

In the case of a change to the triggering documents, the current PurchasingContractRelease entity 49422 overwrites information from PurchasingContractRelease entity 49422 messages sent prior to this.

(i) PurchasingContractReleaseParty Package

The Party package 49416 groups business parties that could occur in one of the PurchasingContractUse messages. The Party package 49416 contains a BuyerParty entity 49424. Either the ID, or address and ID can be transmitted for each party. If the ID is transmitted, the address for the ID stored in the master data is relevant. If ID and address are transmitted, the ID identifies the party and the address is the document address that differs from the address stored in the master data. Both ID and address can be sent to prevent misunderstandings. The receiving application can implement a suitable optimization strategy to prevent lots of identical document addresses.

For parties, default logic applies from the header to the items, and within item hierarchies. Parties that are specified in the header apply for items for which no relevant party is explicitly transferred and which are directly on the header. Parties that are transferred on item level apply for subitems that are under the relevant item in the item hierarchy. The default logic applies for the party including contact person as a whole. On item level, no parts of a party on header level or in a hierarchy can be specified more precisely. The default logic is only a simplification of the message that is transferred. From a logical standpoint, parties on the header and hierarchy items behave as if they were explicitly transferred. This also means that when not all, but just changed items are transferred, the parties only apply for the transferred items. If a party is changed, then all items that are valid for this party are also changed.

The BuyerParty entity 49424 is a party that purchases goods or services. The BuyerParty entity 49424 is of type GDT: BusinessTransactionDocumentParty. In some implementations, the BuyerParty must be specified. The ContactPerson specified in the BuyerParty entity 49424 describes the person responsible on the purchaser-side. The ContactPerson contains the elements BuyerID, SellerID, and entity address.

(ii) PurchasingContractReleaseLocation Package

The Location package 49418 groups relevant locations for a purchasing contract release. The Location package 49418 contains a ShipToLocation entity 49426.

The ShipToLocation entity 49426 is the location to where goods are delivered or where a service is to be performed. The ShipToLocation entity 49426 is of type GDT: BusinessTransactionDocumentLocation.

(iii) PurchasingContractReleaseItem Package

The PurchasingContractReleaseItem package 49420 groups the PurchasingContractItem with its packages. The PurchasingContractReleaseItem package 49420 contains the following packages: Location package 49428 and BusinessDocumentObjectReference package 49430. The PurchasingContractReleaseItem package 49420 also contains a PurchasingContractReleaseItem entity 49432. There is a 1:cn relationship between the PurchasingContractRelease entity 49422 and the PurchasingContractReleaseItem entity 49432.

The PurchasingContractReleaseItem entity 49432 specifies a certain item in a PurchasingContractRelease item or provides additional information on such an item. This includes information on release quantities and release amounts. The PurchasingContractReleaseItem entity 49432 contains details on party and location. Differing parties and locations can be defined for the PurchasingContractReleaseItem (see Party package, Location package). The PurchasingContractReleaseItem can contain references to other business documents that are relevant for the item (see BusinessDocumentObjectReference package). The PurchasingContractReleaseItem entity 49432 is of the type PurchasingContractReleaseItem. The PurchasingContractReleaseItem entity 49432 contains the elements: BaseBusinessTransactionDocumentItemID, BaseBusinessTransactionDocumentItemTypeCode, ReleaseQuantity, and RelaseAmount. The BaseBusinessTransactionDocumentItemID is a unique identifier of item type in a business document on which the PurchasingContractReleaseItem is based and is of type GDT: BusinessTransactionDocumentItemID. The BaseBusinessTransactionDocumentItemTypeCode is a coded representation of item type of a business document on which the PurchasingContractReleaseItem is based and is of type GDT: BusinessTransactionDocumentItemTypeCode. The ReleaseQuantity describes the quantity released from a purchasing contract and is of type GDT: Quantity. The ReleaseAmount describes the value released from a purchasing contract and is of type GDT: Amount.

The PurchasingContractReleaseItem contains the elements: BaseBusinessTransactionDocumentID, BaseBusinessTransactionDocumentTypeCode, and BaseBusinessTransactionDocumentDateTime, ReleaseQuantity, and ReleaseAmount. The BaseBusinessTransactionDocumentID is a unique identifier for a business document based on the original PurchasingContractRelease and is of type GDT: BaseBusinessTransactionDocumentID. The BaseBusinessTransactionDocumentTypeCode is a coded representation of the business document type based on the original PurchasingContractRelease. Currently, the types purchase order, invoice, goods receipt, and service confirmation are relevant for the message type PurchasingContractRelease. The BaseBusinessTransactionDocumentTypeCode is of type GDT: BaseBusinessTransactionDocumentTypeCode. The BaseBusinessTransactionDocumentDateTime is a document date of a business document that is based on the original PurchasingContractRelease and is of type GDT: DateTime. The ReleaseQuantity describes the released quantity from a purchasing contract and is of type GDT: Quantity. The ReleaseAmount describes the released value from a purchasing contract and is of type GDT: Amount.

In some implementations, the ID must not be changed after an item has been created. Dependencies of elements or entities of item type are described below.

(a) PurchasingContractReleaseItemLocation Package

The Location package 49428 groups relevant locations for a contract release item. The Location package 49428 contains a ShipToLocation entity 49434.

The ShipToLocation entity 49434 is the location where goods are to be delivered/services are to be performed. The ShipToLocation entity 49434 is of the type GDT: BusinessTransactionDocumentLocation.

(b) PurchasingContractReleaseItemBusinessDocumentObjectReference Package

The BusinessDocumentObjectReference package 49430 is the grouping of references to business documents that are relevant for the PurchasingContractDocumentItem and have a business connection to the item. The BusinessTransactionDocumentReference package 49430 contains a PurchasingContractReference entity 49436. There is a 1:1 relationship between the Item entity 49432 and the PurchasingContractReference entity 49436.

The PurchasingContractReference entity 49436 is the reference to a PurchasingContract of the purchaser or to an item within such a PurchasingContract. The PurchasingContractReference entity 49436 is of the type GDT: BusinessTransactionDocumentReference. The PurchasingContractReference entity 49436 has the cardinality 1. The PurchasingContractReference entity 49436 contains the reference to the operational purchasing contract.

(8) Message Data Type PurchasingContractLegalDocument Message

The message data type PurchaseOrderLegalDocumentMessage contains the business information that is required to send a business document in a message and the object PurchasingContract contained in the business document in the view required by the PurchaseOrderLegalDocument. The PurchaseOrderLegalDocumentMessage package contains the packages: MessageHeader package and PurchasingContract package.

The message data type PurchasingContractLegalDocumentMessage provides the structure for the message types PurchasingContractLegalDocumentRequest and PurchasingContractLegalDocumentNotification and the interfaces that are based on them.

(a) MessageHeader Package

This is analogous to the MessageHeader package 49302 in the PurchasingContractMessage.

(b) PurchasingContract Package

This is analogous to the PurchasingContractRelease package 49303.

Differing integration conditions regarding the message types PurchasingContractLegalDocumentRequest and PurchasingContractLegalDocumentNotification are listed as follows: within the Party package, the BuyerParty entity is optional; within the PurchasingContractAttachment package the InternalAttachmentWebAddress entity is not available for transmission to document management and may not be used for this reason; within the PurchasingContractDescription package the InternalDescription entity is not available for transmission to document management and may not be used for this reason; and within the PurchasingContractItemAttachment package the InternalAttachmentWebAddress is not available for transmission to document management.

(9) PurchasingContractRelease Element Structure

The message data type element structure for the Invoice message is depicted in FIG. 495A-D. The element structure is similar to the data model, but provides additional information regarding the details of the interface. The element structure identifies the different packages 49500 in the interface, and represents the entities at various levels within the interface. As depicted in FIG. 495A, the interface for Purchasing Contract Release Message includes five levels 49502, 49504, 49506, 49508, and 49510. The outermost package of this interface is a Purchasing Contract Release Message 49518, which includes a Purchasing Contract Release Message entity 49520 at the first level 49502. The Invoice entity 49520 is of a data type MDT 49522 "PurchasingContractReleaseMessage" 49524.

The Purchasing Contract Release Message package 49518 includes a Purchasing Contract Release package 49526. The Purchasing Contract Release package 49526 includes a PurchasingContractRelease entity 49528. The PurchasingContractRelease entity 49528 is a "PurchasingContractRelease" 49532, and there is one "PurchasingContractRelease" 49532 for each Purchasing Contract Release package 49526.

The PurchasingContractRelease entity 49528 includes a BaseBusinessTransactionDocumentID 49534, a BaseBusinessTransactionDocumentTypeCode 49544, a BaseBusinessTransactionDocumentDateTime 49554. The BaseBusinessTransactionDocumentID 49534 is a GDT 49538 "BusinessTransactionDocumentID" 49540, and there is one 49536 BaseBusinessTransactionDocumentID 49534 for a PurchasingContractRelease entity 49528. The BaseBusinessTransactionDocumentTypeCode 49544 is a GDT 49548 "BusinessTransactionDocumentID" 49550, and there is one 49546 BaseBusinessTransactionDocumentTypeCode 49544 for a PurchasingContractRelease entity 49528. The BaseBusinessTransactionDocumentDateTime 49554 is a GDT 49558 "DateTime" 49560, and there is either zero or one 49556 BaseBusinessTransactionDocumentDateTime 49554 for a PurchasingContractRelease entity 49528.

The Purchasing Contract Release package 49526 also includes a Party package 49562, a Location package 49502A, and an Item package 49512A. The Party package includes a BuyerParty entity 49562. The BuyerParty entity 49564 GDT 49568 "BusinessTransactionDocumentParty" 49570, and there is either zero or one 49566 BuyerParty entity 49562 for each Party package 49562.

The BuyerParty entity 49562 includes an InternalID 49574, a StandardID 49584, and a ContactPerson 49594. The InternalID 49574 is a GDT 49578 "PartyInternalID" 49580, and there is either zero or one 49576 InternalID 49574 for a BuyerParty entity 49562. The StandardID 49584 is a GDT 49588 "PartyStandardID" 49590, and there is from zero to any number 49586 StandardID 49584 for a BuyerParty entity 49562. The ContactPerson 49594 is a GDT 49598 "ContactPerson" 49500A, and there is either zero or one 49596 ContactPerson 49594 for a BuyerParty entity 49562.

The Location package 49502A includes a ShipToLocation entity 49504A. The ShipToLocation entity 49504A is GDT 49508A "BusinessTransactionDocumentShipToParty" 49510A, and there is either zero or one 49506A ShipToLocation entity 49504A for each Location package 49502A.

The Item package 49512A includes an Item entity 49514A. The Item entity 49514A is a "PurchaseContractReleaseItem" 49518A, and there is from one to any number 49516A Item entity 49514A for each Item package 49512A. The Item entity 49514A includes a BaseBusinessTransactionDocumentItemID 49524A, a BaseBusinessTransactionDocumentItemTypeCode 49534A, a ReleaseQuantity 49544A, and a ReleaseAmount 49554A. The BaseBusinessTransactionDocumentItemID 49524 is a GDT 49528A "BusinessTransactionDocumentItemID" 49530A, and there is one 49526A BaseBusinessTransactionDocumentItemID for an Item entity 49514A. The BaseBusinessTransactionDocumentItemTypeCode 49534A is a GDT 49538A "BusinessTransactionDocumentItemTypeCode" 49540A, and there is one 49536A BaseBusinessTransactionDocumentItemTypeCode 49534A for an Item entity 49514A. The ReleaseQuantity 49544A is a GDT 49548A "Quantity" 49550A, and there is either zero or one 49546A ReleaseQuantity 49544A for an Item entity 49514A. The ReleaseAmount 49554A is a GDT 49558A "Amount" 49560A, and there is either zero or one 49556A ReleaseAmount 49554A for an Item entity 49514A.

The Item package 49512A also includes a Location package 49562A and a BusinessDocumentObjectReference package 49572A. The Location package 49562A includes a ShipToLocation entity 49564A. The ShipToLocation entity 49564A is GDT 49568A "BusinessTransactionDocumentShipToParty" 49570A, and there is either zero or one 49566A ShipToLocation entity 49564A for each Location package 49562A.

The BusinessDocumentObjectReference package 49572A includes a BusinessContractReference entity 49574A. The BusinessContractReference entity 49574A is a GDT 49578A "BusinessTransactionDocumentReference" 49580A, and there is one 49576A BusinessContractReference entity for each BusinessDocumentObjectReference package 49572A. The BusinessContractReference entity 49574A includes an ID 49584A and an ItemID 49594A. The ID 49584A is a GDT 49588A "BusinessTransactionDocumentID" 49590A, and there is one 49586A ID 49594A for a BusinessContractReference entity 49574A. The ItemID 49594A is a GDT 49598A "BusinessTransactionDocumentItemID" 49599A, and there is from zero to any number 49596A ItemID 49594A for a BusinessContractReference entity 49574A.

(10) PurchasingContract Element Structure

The message data type element structure for the Purchasing Contract message is depicted in FIGS. 496A-K. The element structure is similar to the data model, but provides additional information regarding the details of the interface. The element structure identifies the different packages 49600 in the interface, and represents the entities at various levels within the interface. As depicted in FIG. 496A, the interface for Purchasing Contract Message includes five levels 49601, 49602, 49603, 49604 and 49605. The outermost package of this interface is a PurchasingContractMessage package 49608, which includes a Purchasing Contract Message entity 49609 at the first level 49601. The Purchasing Contract Message entity 49609 is of data type MDT 49607 "PurchasingContractInformationMessage" 49610.

The PurchasingContractMessage package 49608 includes a PurchasingContract package 49611. The PurchasingContract package 49611 includes a PurchasingContract entity 49612 at the second level 49602. The PurchasingContract entity 49612 is a "PurchasingContractInformation" 49614, and there is one 49613 PurchasingContract entity 49612 for a PurchasingContractMessage package 49608.

The PurchasingContract entity 49612 includes an ID 49615, a CreationDateTime 49618, a LastChangeDateTime 49621, a CompletedIndicator 49624, a BlockedIndicator 49627, a Note 49630, a ValidityPeriod 49633, and a TargetAmount 49636. The ID 49615 is a "BusinessTransactionDocumentID" 49617, and there is one 49616 ID 49615 for a PurchasingContract entity 49612. The CreationDateTime 49618 is a "DateTime" 49620, and there is either zero or one 49619 CreationDateTime 49618 for a PurchasingContract entity 49612. The LastChangeDateTime 49621 is a "DateTime" 49623, and there is either zero or one 49622 LastChangeDateTime 49621 for a PurchasingContract entity 49612. The CompletedIndicator 49624 is a "BusinessTransactionCompletedIndicator" 49626, and there is either zero or one 49625 CompletedIndicator 49624 for a PurchasingContract entity 49612. The BlockedIndicator 49627 is a "BusinessTransactionBlockedIndicator" 49629, and there is either zero or one 49628 BlockedIndicator 49627 for a PurchasingContract entity 49612. The Note 49630 is a "Note" 49632, and there is either zero or one 49631 Note 49630 for a PurchasingContract entity 49612. The ValidityPeriod 49633 is a "DateTimePeriod" 49635, and there is either zero or one 49634 ValidityPeriod 49633 for a PurchasingContract entity 49612. The TargetAmount 49636 is an "Amount" 49638, and there is either zero or one 49637 TargetAmount 49636 for a PurchasingContract entity 49612.

The PurchasingContract package 49611 also includes a Party package 49639. The Party package 49639 includes a BuyerParty entity 49640 at the third level 49603. The BuyerParty entity 49640 is a "BusinessTransactionDocumentParty" 49642, and there is either zero or one 49641 BuyerParty entity 49640 for a Party package 49639.

The PurchasingContract entity 49612 includes an InternalID 49643, a StandardID 49646, an Address entity 49649 and a ContactPerson entity 49652. The InternalID 49643 is a "PartyInternalID" 49645, and there is either zero or one 49644 InternalID 49643 for a PurchasingContract entity 49612. The StandardID 49646 is a "PartyStandardID" 49648, and there is from zero to any number 49647 StandardID 49646 for a PurchasingContract entity 49612. The Address entity 49649 is an “Address” 49651, and there is either zero or one 49650 Address entity 49649 for a PurchasingContract entity 49612. The ContactPerson entity 49652 is a “ContactPerson” 49654, and there is either zero or one 49653 ContactPerson entity 49652 for a PurchasingContract entity 49612.

The ContactPerson entity 49652 includes an InternalID 49655 and an Address entity 49658. The InternalID 49655 is a “ContactPersonID” 49657, and there is either zero or one 49656 InternalID 49655 for a ContactPerson entity 49652. The Address entity 49658 is an “Address” 49660, and there is either zero or one 49659 Address entity 49658 for a ContactPerson entity 49652.

The Party package 49639 also includes a SellerParty entity 49661, a ProductRecipientParty entity 49664 and a PurchasingContractReleaseAuthorizedParty entity 49667. The SellerParty entity 49661 is a “BusinessTransactionDocumentParty” 49663, and there is either zero or one 49662 SellerParty entity 49661 for a Party package 49639. The ProductRecipientParty entity 49664 is a “BusinessTransactionDocumentParty” 49666, and there is either zero or one 49665 ProductRecipientParty entity 49664 for a Party package 49639. The PurchasingContractReleaseAuthorizedParty entity 49667 is a “BusinessTransactionDocumentParty” 49666, and there is from zero to any number 49668 PurchasingContractReleaseAuthorizedParty entity 49667 for a Party package 49639.

The PurchasingContract package 49611 also includes a Location package 49670. The Location package 49670 includes a ShipToLocation entity 49671 at the third level 49603. The ShipToLocation entity 49671 is a “BusinessTransactionDocumentLocation” 49673, and there is either zero or one 49672 ShipToLocation entity 49671 for a Location package 49670.

The PurchasingContract package 49611 also includes a DeliveryInformation package 49674. The DeliveryInformation package 49674 includes a DeliveryTerms entity 49675 at the third level 49603. The DeliveryTerms entity 49675 is a “DeliveryTerms” 49677, and there is either zero or one 49676 DeliveryTerms entity 49675 for a DeliveryInformation package 49674.

The DeliveryTerms entity 49675 includes an Incoterms entity 49678, a QuantityTolerance entity 49681, and a MaximumLeadTimeDuration 49684 at the fourth level 49604. The Incoterms entity 49678 is an “Incoterms” 49680, and there is either zero or one 49679 Incoterms entity 49678 for a DeliveryTerms entity 49675. The QuantityTolerance entity 49681 is a “QuantityTolerance” 49683, and there is either zero or one 49682 QuantityTolerance entity 49681 for a DeliveryTerms entity 49675. The MaximumLeadTimeDuration 49684 is a “Duration” 49686, and there is either zero or one 49685 MaximumLeadTimeDuration 49684 for a DeliveryTerms entity 49675.

The PurchasingContract package 49611 also includes a PaymentInformation package 49687. The PaymentInformation package 49687 includes a CashDiscountTerms entity 49688 at the third level 49603. The CashDiscountTerms entity 49688 is a “CashDiscount-Terms” 49690, and there is either zero or one 49689 CashDiscountTerms entity 49688 for a PaymentInformation package 49687.

The CashDiscountTerms entity 49688 includes a MaximumCashDiscount entity 49691, a NormalCashDiscount entity 49694 and a FullPaymentDueDaysValue 49697 at the fourth level 49604. The MaximumCashDiscount entity 49691 is a “CashDiscount” 49693, and there is either zero or one 49692 MaximumCashDiscount entity 49691 for a CashDiscountTerms entity 49688. The NormalCashDiscount entity 49694 is a “CashDiscount” 49696, and there is either zero or one 49695 NormalCashDiscount entity 49694 for a CashDiscountTerms entity 49688. There is either zero or one 49698 FullPaymentDueDaysValue 49697 for a CashDiscountTerms entity 49688.

The PurchasingContract package 49611 also includes a PriceInformation package 49699. The PriceInformation package 49699 includes a PriceSpecificationElement entity 49600A at the third level 49603. The PriceSpecificationElement entity 49600A is a “PriceSpecificationElement” 49602A, and there is from zero to any number 49601A PriceSpecificationElement entity 49600A for a PriceInformation package 49699.

The PriceSpecificationElement entity 49600A includes a TypeCode 49603A, a ValidityPeriod entity 49606A, a PropertyValuation entity 49609A, a Price 49612A, a Percent 49615A, a FixedAmount 49618A and a PriceSpecificationElementScaleLine entity 49621A at the fourth level 49604. The TypeCode 49603A is a “PriceSpecificationElementTypeCode” 49605A, and there is one 49604A TypeCode 49603A for a PriceSpecificationElement entity 49600A. The ValidityPeriod entity 49606A is a “DateTimePeriod” 49608A, and there is one 49607A ValidityPeriod entity 49606A for a PriceSpecificationElement entity 49600A. The PropertyValuation entity 49609A is a “PriceSpecificationElementPropertyValuation” 49611A, and there is from one to any number 49610A PropertyValuation entity 49609A for a PriceSpecificationElement entity 49600A. The Price 49612A is a “Price” 49614A, and there is either zero or one 49613A Price 49612A for a PriceSpecificationElement entity 49600A. The Percent 49615A is a “Percent” 49617A, and there is either zero or one 49616A Percent 49615A for a PriceSpecificationElement entity 49600A. The FixedAmount 49618A is an “Amount” 49620A, and there is either zero or one 49619A FixedAmount 49618A for a PriceSpecificationElement entity 49600A. The PriceSpecificationElementScaleLine entity 49621A is a “PriceSpecificationElementScaleLine” 49623A, and there is from zero to any number 49622A PriceSpecificationElementScaleLine entity 49621A for a PriceSpecificationElement entity 49600A.

The PurchasingContract package 49611 also includes an Attachment package 49624A. The Attachment package 49624A includes an AttachmentWebAddress entity 49625A, an InternalAttachmentWebAddress entity 49628A and a LegalDocumentAttachment entity 49631A at the third level 49603. The AttachmentWebAddress entity 49625A is a “WebAddress” 49627A, and there is from zero to any number 49626A AttachmentWebAddress entity 49625A for an Attachment package 49624A. The InternalAttachmentWebAddress entity 49628A is a “WebAddress” 49630A, and there is from zero to any number 49629A InternalAttachmentWebAddress entity 49628A for an Attachment package 49624A. The LegalDocumentAttachment entity 49631A is an “Attachment” 49633A, and there is from zero to any number 49632A LegalDocumentAttachment entity 49631A for an Attachment package 49624A.

The PurchasingContract package 49611 also includes a Description package 49634A. The Description package 49634A includes an InternalDescription entity 49635A and a Description entity 49638A at the third level 49603. The InternalDescription entity 49635A is a “Description” 49637A, and there is either zero or one 49636A InternalDescription entity 49635A for a Description package 49634A. The Description entity 49638A is a “Description” 49640A, and there is either zero or one 49639A Description entity 49638A for a Description package 49634A.

The PurchasingContract package 49611 also includes an Item package 49641A. The Item package 49641A includes an Item entity 49642A at the third level 49603. The Item entity 49642A is a "PurchasingContractInformationItem" 49644A, and there is from zero to any number 49643A Item entity 49642A for an Item package 49641A.

The Item entity 49642A includes an ID 49645A, an ActiveIndicator 49648A, a TypeCode 49651A, a TargetQuantity 49654A, a TargetAmount 49657A, a MinimumOrderQuantity 49660A and a MinimumOrderAmount 49663A at the fourth level 49604. The ID 49645A is a "BusinessTransactionDocumentItemID" 49647A, and there is one 49646A ID 49645A for an Item entity 49642A. The ActiveIndicator 49648A is an "ActiveIndicator" 49650A, and there is either zero or one 49649A ActiveIndicator 49648A for an Item entity 49642A. The TypeCode 49651A is a "BusinessTransactionDocumentItemTypeCode" 49653A, and there is either zero or one 49652A TypeCode 49651A for an Item entity 49642A. The TargetQuantity 49654A is a "Quantity" 49656A, and there is either zero or one 49655A TargetQuantity 49654A for an Item entity 49642A. The TargetAmount 49657A is an "Amount" 49659A, and there is either zero or one 49658A TargetAmount 49657A for an Item entity 49642A. The MinimumOrderQuantity 49660A is a "Quantity" 49662A, and there is either zero or one 49661A MinimumOrderQuantity 49660A for an Item entity 49642A. The MinimumOrderAmount 49663A is an "Amount" 49665A, and there is either zero or one 49664A MinimumOrderAmount 49663A for an Item entity 49642A.

The Item entity 49642A also includes a ProductInformation package 49666A. The ProductInformation package 49666A includes a Product entity 49667A at the fourth level 49604. The Product entity 49667A is a "BusinessTransactionDocumentProduct" 49669A, and there is either zero or one 49668A Product entity 49667A for a ProductInformation package 49666A.

The Product entity 49667A includes an InternalID 49670A, a StandardID 49673A, a ManufacturerID 49676A, a SellerID 49679A, a TypeCode 49682A and a Note 49685A at the fifth level 49605. The InternalID 49670A is a "ProdcutInternalID" 49672A, and there is either zero or one 49671A InternalID 49670A for a Product entity 49667A. The StandardID 49673A is a "ProductStandardID" 49675A, and there is from zero to any number 49674A StandardID 49673A for a Product entity 49667A. The ManufacturerID 49676A is a "ProductPartyID" 49678A, and there is either zero or one 49677A ManufacturerID 49676A for a Product entity 49667A. The SellerID 49679A is a "ProductPartyID" 49681A, and there is either zero or one 49680A SellerID 49679A for a Product entity 49667A. The TypeCode 49682A is a "ProductTypeCode" 49684A, and there is either zero or one 49683A TypeCode 49682A for a Product entity 49667A. The Note 49685A is a "Note" 49687A, and there is either zero or one 49686A Note 49685A for a Product entity 49667A.

The ProductInformation package 49666A also includes a ProductCategory entity 49688A at the fourth level 49604. The ProductCategory entity 49688A is a "BusinessTransactionDocumentProductCategory" 49690A, and there is either zero or one 49689A ProductCategory entity 49688A for a ProductInformation package 49666A.

The ProductCategory entity 49688A includes an InternalID 49691A and a StandardID 49694A at the fifth level 49605. The InternalID 49691A is a "ProductCategoryInternalID" 49693A, and there is either zero or one 49692A InternalID 49691A for a ProductCategory entity 49688A. The StandardID 49694A is a "ProductCategoryStandardID" 49696A, and there is from zero to any number 49695A StandardID 49694A for a ProductCategory entity 49688A.

The Item package 49641A also includes a PriceInformation entity 49697A. The PriceInformation entity 49697A includes a PriceSpecificationElement entity 49698A at the fourth level 49604. The PriceSpecificationElement entity 49698A is a "PriceSpecificationElement" 49600B, and there is from zero to any number 49699A PriceSpecificationElement entity 49698A for a PriceInformation entity 49697A.

The Item package 49641A also includes Party package 49601B. The Party package 49601B includes a ProductRecipientParty entity 49602B at the fourth level 49604. The ProductRecipientParty entity 49602B is a "BusinessTransactionDocumentParty" 49604B, and there is from zero to any number 49603B ProductRecipientParty entity 49602B for a Party package 49601B.

The Item package 49641A also includes a Location package 49605B. The Location package 49605B includes a ShipToLocation entity 49606B at the fourth level 49604. The ShipToLocation entity 49606B is a "BusinessTransactionDocumentShipToLocation" 49608B, and there is from zero to any number 49607B ShipToLocation entity 49606B for a Location package 49605B.

The Item package 49641A also includes a DeliveryInformation package 49609B. The DeliveryInformation package 49609B includes a DeliveryTerms entity 49610B at the fourth level 49604. The DeliveryTerms entity 49610B is a "DeliveryTerms" 49612B, and there is either zero or one 49611B DeliveryTerms entity 49610B for a DeliveryInformation package 49609B.

The Item package 49641A also includes a BusinessDocumentObjectReference package 49613B. The BusinessDocumentObjectReference package 49613B includes a QuoteReference entity 49614B at the fourth level 49604. The QuoteReference entity 49614B is a "BusinessTransactionDocumentReference" 49616B, and there is either zero or one 49615B QuoteReference entity 49614B for a BusinessDocumentObjectReference package 49613B.

The QuoteReference entity 49614B includes an ID 49617B and an ItemID 49620B at the fifth level 49605. The ID 49617B is a "BusinessTransactionDocumentID" 49619B, and there is one 49618B ID 49617B for a QuoteReference entity 49614B. The ItemID 49620B is a "BusinessTransactionDocumentItemID" 49622B, and there is from zero to any number 49621B ItemID 49620B for a QuoteReference entity 49614B.

The BusinessDocumentObjectReference package 49613B also includes an OperationalPurchasingContractReference entity 49623B at the fourth level 49604. The OperationalPurchasingContractReference entity 49623B is a "BusinessTransactionDocumentReference" 49625B, and there is either zero or one 49624B OperationalPurchasingContractReference entity 49623B for a BusinessDocumentObjectReference package 49613B.

The OperationalPurchasingContractReference entity 49623B includes an ID 49626B and an ItemID 49629B at the fifth level 49605. The ID 49626B is a "BusinessTransactionDocumentID" 49628B, and there is one 49627B ID 49626B for an OperationalPurchasingContractReference entity 49623B. The ItemID 49629B is a "BusinessTransactionDocumentItemID" 49631B, and there is from zero to any number 49630B ItemID 49629B for an OperationalPurchasingContractReference entity 49623B.

The BusinessDocumentObjectReference package 49613B also includes a BuyerProductCatalogueReference entity 49632B at the fourth level 49604. The BuyerProductCatalogueReference entity 49632B is a "CatalogueReference" 49634B, and there is either zero or one 49633B BuyerProductCatalogueReference entity 49632B for a BusinessDocumentObjetReference package 49613B.

The BuyerProductCatalogueReference entity 49632B includes an ID 49635B and an ItemID 49638B at the fifth level 49605. The ID 49635B is a "BusinessTransactionDocumentID" 49637B, and there is one 49636B ID 49635B for an OperationalPurchasing-ContractReference entity 49623B. The ItemID 49638B is a "BusinessTransactionDocumentItemID" 49640B, and there is from zero to any number 49639B ItemID 49638B for a BuyerProductCatalogueReference entity 49632B.

The Item package 49641A also includes an Attachment package 49641B. The Attachment package 49641 B includes an AttachmentWebAddress 49642B and an InternalAttachmentWebAddress 49645B at the fourth level 49604. The AttachmentWebAddress 49642B is a "WebAddress" 49644B, and there is from zero to any number 49643B AttachmentWebAddress 49642B for an Attachment package 49641B. The InternalAttachmentWebAddress 49645B is a "WebAddress" 49647B, and there is from zero to any number 49646B InternalAttachmentWebAddress 49645B for an Attachment package 49641B.

The Item package 49641A also includes a Description package 49648B. The Description package 49648B includes a Description 49649B and an InternalDescription 49652B. The Description 49649B is a "Description" 49651B, and there is either zero or one 49650B Description 49649B for a Description package 49648B. The InternalDescription 49652B is a "Description" 49654B, and there is either zero or one 49653B InternalDescription 49652B for a Description package 49648B.

nn) ReplenishmentOrderProposal Interfaces

In the "Forecasting and Replenishment" business scenario, the ReplenishmentOrderProposalRequest and ReplenishmentOrderProposalConfirmation messages are exchanged between the back end system (ERP system) and the planning system. As part of this scenario, order proposals are created during the replenishment process (replenishment planning), released automatically, and transferred to the connected ERP system with the ReplenishmentOrderProposalRequest message. Depending on the business scenario, purchase orders or other follow-on documents are created there from these order proposals.

The aim of the replenishment run is to release 100% of the order proposals that occur automatically and export them from the planning system.

If order proposals that are relevant for the planning system are created in the ERP system (for example, manually), they are transferred with the PurchaseOrderInformation to the planning system. If order proposals created by the planning system are modified in the ERP system (for example, purchasing system), these changes are also transferred to the planning system with the ReplenishmentOrderProposalConfirmation.

(1) Message Types (a) ReplenishmentOrderProposalRequest

A ReplenishmentOrderProposalRequest is a detailed proposal from a requester to a buyer to order products for replenishment purposes. The ReplenishmentOrderProposalRequest message type is based on the message data type ReplenishmentOrderProposalRequestMessage. Depending on the source of supply, this is an order proposal with a vendor (external procurement), or a stock transport order proposal if the source of supply is a distribution center or another store (internal procurement). A purchase order may be created in the purchasing system on the basis of the order proposal, but it is still possible for changes to be made to the order proposal in the purchasing system. It is, however, also possible that the purchasing system might reject the order proposal. In both cases, the purchasing system uses the ReplenishmentOrderProposalConfirmation to inform the planning system.

(b) ReplenishmentOrderProposalConfirmation

A ReplenishmentOrderProposalConfirmation is a confirmation from a buyer to a requester that details the level to which the request can be met. The ReplenishmentOrderProposalConfirmation message type is based on the message data type ReplenishmentOrderProposalConfirmationMessage. The Confirmation is also used to inform the planning system about changes to existing order proposals it contains. These are planning-relevant changes for a replenishment order proposal.

(2) Message Choreography

FIG. 497 shows the interaction between the represented Replenishment Order Proposal interfaces in a contract process is described in detail.

The following message choreography describes the possible logical sequence of the messages that are necessary to realize the scenario between a Planning server 49700 and a Purchasing server 49702.

The Planning 49700 server can send a ReplenishmentOrderProposalRequest message 49704 to the Purchasing server 49702. In response, the Purchasing server 49702 can send a ReplenishmentOrderProposalConfirmation message 49706 to the Planning 49700.

The ReplenishmentOrderProposalRequest message 49704 is used to create the order proposal in the purchasing system. If the order proposal is created or rejected, the planning system receives the ReplenishmentOrderProposalConfirmation message 49706.

(3) Message Data Type ReplenishmentOrderProposalMessage

FIGS. 498A-C depict a data model of the message data type ReplenishmentOrderProposalMessage. The message data type ReplenishmentOrderProposalMessage groups together business information required when a business document is sent in a message and the ReplenishmentOrderProposal object contained in the business document. The template message data type ReplenishmentOrderProposalMessage represents the maximum structure for the message data types ReplenishmentOrderProposalRequestMessage, ReplenishmentOrderProposalConfirmationMessage, and the message types and interfaces based on them.

The ReplenishmentOrderProposalRequestMessage and the ReplenishmentOrderProposalConfirmationMessage are derived from the ReplenishmentOrderProposalMessage as structural views.

Restrictions and differences between the ReplenishmentOrderProposalRequestMessage or ReplenishmentOrderProposalConfirmationMessage and the ReplenishmentOrderProposalMessage are described below.

The ReplenishmentOrderProposalMessage package 49802 contains the packages: MessageHeader package 49804 and the ReplenishmentOrderProposal package 49806. The ReplenishmentOrderProposalMessage package 49802 also contains a ReplenishmentOrderProposalMessage entity 49808.

(a) MessageHeader Package

See general data type (GDT) BusinessDocumentMessageHeader. The MessageHeader package 49802 contains a MessageHeader entity 49810. There is a 1:1 relationship between the ReplenishmentOrderProposalMessage entity 49808 and the MessageHeader entity 49810. Where a relationship is identified between entitites in FIGS. 498A-C for this Interface, the respective relationship is a 1:c relationship unless otherwise noted herein or indicated in FIG. 498. The following elements of the GDT are used: ID and CreationDateTime.

(b) ReplenishmentOrderProposal Package

The ReplenishmentOrderProposal package 49806 groups together the ReplenishmentOrderProposal and its packages. The ReplenishmentOrderProposal package 49806 contains the following packages: Party package 49812, Location package 49814, BusinessObjectDocumentReference package 49816, and Item package 49818. The ReplenishmentOrderProposal package 49806 also contains a ReplenishmentOrderProposal entity 49820. There is a 1:1 relationship between the ReplenishmentOrderProposalMessage entity 49808 and the ReplenishmentOrderProposal entity 49820.

The ReplenishmentOrderProposal entity 49820 is a proposal for a source location (for example, a vendor) to deliver certain quantities of products to a target location (goods recipient, for example, distribution center) at a specific time, for replenishment purposes. The ReplenishmentOrderProposal entity 49820 usually consists of several items (order proposal items) that contain information about the source and target location, product and quantities, dates and reference documents. The ReplenishmentOrderProposal contains the following elements: actionCode, completeTransmissionIndicator, ID, PurchasingGroupID, TransshipmentMethodCode, ConsignmentIndicator, QuantityRoundingAllowedIndicator, OrderPeriod, and DeliveryPeriod. The @actionCode is a coded display of actions that control how the recipient of the message creates, changes, and deletes the document and is of type GDT ActionCode. The @completeTransmissionIndicator indicates that the complete order proposal is transferred and is of type GDT CompleteTransmissionIndicator. The ID is an identifier for the ReplenishmentOrderProposal—order proposal number and is of type GDT BusinessTransactionDocumentID. The PurchasingGroupID is a Purchasing group and is of type GDT: PurchasingGroupID. The TransshipmentMethodCode is a processing method that describes how the products are to be handled in the warehouse (for example, cross-docking, put away) and is of type GDT: TransshipmentMethodCode. The ConsignmentIndicator indicates that the business form consignment is used and is of type GDT: ConsignmentIndicator. The QuantityRoundingAllowedIndicator indicates that quantities of the order proposal items may be rounded and is of type GDT AllowedIndicator. If the quantities in the planning system have already been rounded (for example, to logistics units of measure), these may not be rounded again when the follow-on document (for example, purchase order) is created in the purchasing system. The OrderPeriod is a period in which the products planned for replenishment must be ordered from the source of supply (for example, vendor or distribution center) and is of type GDT DateTimePeriod. The DeliveryPeriod is a period in which the products planned in the order proposal are available in the target location and is of type GDT DateTimePeriod. The following elements are supported for the element @actionCode: Create (Code 01, attribute for initial data transfer), Change (Code 02), And Delete (Code 03). The following attributes of the CompleteTransmissionIndicator are supported. When an order proposal is created (@actionCode: Create' (Code 01)), the CompleteTransmissionIndicator has the attribute “true”, otherwise it is “false”. Therefore only order proposal changes are transferred. An unchanged order proposal is not transferred. In some implementations, the QuantityRoundingAllowedIndicator element is not used in the ReplenishmentOrderProposalConfirmationMessage.

(i) ReplenishmentOrderProposalParty Package

The Party package 49812 groups together parties that are involved in order proposal processing. The Party package 49812 contains the following entities: BuyerParty entity 49822, VendorParty entity, and ProductRecipientParty entity.

The BuyerParty entity 49822 is the company, organization, group or person that does the buying. The BuyerParty entity 49822 type is GDT: BusinessTransactionDocumentParty. At present, the internal ID is a form of identification supported. In some implementations, only the internal ID may be transferred.

The VendorParty entity is the company or person that is to deliver the products to be ordered. The VendorParty entity type is GDT: BusinessTransactionDocumentParty, for which the InternalID and the StandardID are used.

The ProductRecipientParty entity is the company or person to which products are delivered. The ProductRecipientParty entity type is GDT: BusinessTransactionDocumentParty, for which the InternalID and the StandardID are used.

(ii) ReplenishmentOrderProposalLocation Package

The Location package 49814 groups together locations of relevance for the ReplenishmentOrderProposal messages. The Location package 49814 contains the entities: ShipFromLocation entity 49824 and ShipToLocation entity 49826. There is a 1:1 relationship between the ReplenishmentOrderProposal entity 49820 and both the ShipFromLocation entity 49824 and the ShipToLocation entity 49826. A default logic applies from the header to the items for locations. Locations that are specified in the header apply to items for which no corresponding location is transferred explicitly. This default logic is used to simplify the message. From a logical perspective, locations in the header behave as if they were being transferred explicitly for the items in a message.

The ShipFromLocation entity 49824 (source of supply) is the location that is to supply the product to be ordered. The ShipFromLocation entity 49824 type is GDT BusinessTransactionDocumentShipFromLocation. The InternalID and the StandardID are supported as identification. In some implementations, the source of supply must always be specified.

The ShipToLocation entity 49826 (target location) is the location to which the product to be ordered is to be delivered. The ShipToLocation entity 49826 type is GDT BusinessTransactionDocumentShipToLocation. The InternalID and the StandardID are supported as identification.

(iii) ReplenishmentOrderProposal-BusinessDocumentObjectReference Package

The BusinessDocumentObjectReference package 49816 groups references to business documents that are related to the ReplenishmentOrderProposal in business terms. The BusinessDocumentObjectReference package 49816 contains a PurchaseOrderReference entity 49828.

The PurchaseOrderReference entity 49828 is the reference to a purchase order in the purchasing system (ERP system) that was created on the basis of the order proposal. The PurchaseOrderReference entity 49828 type is GDT BusinessTransactionDocumentReference, for which only the ID element is used. The ID is an identifier for the purchase order—follow-on document that was created in the ERP system (purchasing system) from the order proposal and is of type GDT BusinessTransactionDocumentID.

The order proposals created in the planning system are transferred to the purchasing system with the ReplenishmentOrderProposalRequestMessage. It is possible that different order proposals (or purchase orders) with different (order proposal or purchase order) numbers are created from this order proposal in the purchasing system. These reference numbers (header and item level) are transferred to the planning system in the ReplenishmentOrderProposalConfirmationMessage.

This information is required in the planning system to show the replenishment planner which purchase order item in the ERP system (purchasing system) is behind the order proposal item.

In some implementations, the package is not filled in the ReplenishmentOrderProposalRequestMessage. Only the ID is transferred.

(iv) ReplenishmentOrderProposalItem Package

The ReplenishmentOrderProposalItem package 49818 groups the ReplenishmentOrderProposalItem with its packages. The ReplenishmentOrderProposalItem package 49818 contains the following packages: ProductInformation package 49830, PriceInformation package 49832, Party package 49834, Location package 49836, BusinessDocumentObjectReference package 49838, and ScheduleLine package 49840. The ReplenishmentOrderProposalItem package 49818 also contains a ReplenishmentOrderProposalItem entity 49841.

The ReplenishmentOrderProposalItem entity 49841 groups information, the type, quantity and dates for the products proposed for the replenishment purchase order. The ReplenishmentOrderProposalItem entity 49841 contains detailed information about a product (see ProductInformation Package) and its price (see PriceInformation Package), source of supply and target location (see Location Package), and details about the quantity of a product and the (delivery) dates (see ScheduleLine Package). The ReplenishmentOrderProposalItem entity 49841 can contain references to other business documents of relevance for the item (see BusinessDocumentObjectReference Package). The ReplenishmentOrderProposalItem entity 49841 contains the elements: actionCode, completeTransmissionIndicator, ID, PurchasingGroupID, TransshipmentMethodCode, ConsignmentIndicator, ReturnsIndicator, PlanningRelevanceIndicator, CompletedIndicator, ReceivedQuantity, and OrderPeriod. The @actionCode is a coded display of actions that control how the item is created, changed, and deleted by the recipient of the message and is of type GDT ActionCode. The ActionCode for the item and the ReplenishmentOrderProposals can be different. For example, it is possible that several items of a purchase order are to be changed and deleted. In this case, the ActionCode displays a change at ReplenishmentOrderProposal level, and the ActionCode at item level displays the action to be performed for the item in question. The @completeTransmissionIndicator indicates that the complete order proposal item is transferred and is of type GDT CompleteTransmissionIndicator. The ID is an identifier for the item of an order proposal and is of type GDT BusinessTransactionDocumentItemID. The PurchasingGroupID is a purchasing group and is of type GDT: PurchasingGroupID. The TransshipmentMethodCode is a processing method that describes how goods are to be distributed (for example, cross-docking, putaway) and is of type GDT TransshipmentMethodCode. The ConsignmentIndicator indicates that the business form consignment is used and is of type GDT: ConsignmentIndicator. The ReturnsIndicator indicates that the order proposal item is a return and is of type GDT ReturnsIndicator. As part of replenishment planning for distribution centers, goods receipts can be posted by both vendors and the supplied stores. This is a case of store returns to the distribution center. The PlanningRelevanceIndicator displays whether or not the item is taken into account in the planning run and is of type GDT PlanningRelevanceIndicator. The CompletedIndicator indicates that the item is complete. As such, no more partial deliveries are expected for this order item. The CompletedIndicator is of type GDT BusinessTransactionCompletedIndicator. The ReceivedQuantity is a cumulated goods receipt quantity that is updated in the purchasing system and is of type GDT Quantity. The OrderPeriod is a period in which the products planned for replenishment must be ordered from the source of supply (for example, vendor, distribution center) and is of type GDT DateTimePeriod.Integrity In some implementations, the BusinessDocumentObjectReference package is only used for the ReplenishmentOrderProposalConfirmationMessage. It is not used for the ReplenishmentOrderProposalRequestMessage. The following attributes of the @actionCode element are supported: Create (Code 01), Change (Code 02), And Delete (Code 03). When a ReplenishmentOrderProposalItem (@actionCode, Create' (Code 01)) is created, the CompleteTransmissionIndicator has the attribute "true". The following elements are not filled for the ReplenishmentOrderProposalRequestMessage: ReturnsIndicator, PlanningRelevanceIndicator, CompletedIndicator, and ReceivedQuantity. The ReceivedQuantity element can only be filled in the case of a ReplenishmentOrderProposalConfirmationMessage with @actionCode Change (Code 02).

(a) ReplenishmentOrderProposalItemProductInformation Package

The ProductInformation package 49830 groups together information used to identify, describe, and classify a product. The ProductInformation package 49830 contains the entities: Product entity 49842, ProductCategory entity 49844, and VendorProductCategory entity 49844.

The Product entity 49842 is the identification used for the product to be ordered. The Product entity 49842 type is GDT BusinessTransactionDocumentProduct. There is a 1:1 relationship between the Item entity 49841 and the Product entity 49842. The InternalID and the StandardID are supported as identification.

The ProductCategory entity 49844 specifies the category of the product to be ordered from the retailer's perspective. The ProductCategory entity 49844 type is GDT BusinessTransactionDocumentProductCategory. In some implementations, the only identification supported is the InternalID. This means that only the InternalID may be transferred. This field is optional, as this information is company-specific and is not always defined.

The VendorProductCategory entity 49846 is a company-specific or vendor-specific schedule line for a vendor's entire range of products (vendor subrange). The VendorProductCategory entity 49846 provides the vendor view. The VendorProductCategory entity 49846 type is GDT BusinessTransactionDocumentProductCategory. In some implementations, the only identification supported is the InternalID. This means that only the InternalID can be transferred. The InternalID is optional, as this information is company-specific. For example, frozen goods offered by a vendor can be defined as a vendor subrange.

(b) ReplenishmentOrderProposalParty Package

The Party package 49834 groups together information relating to business partners involved in a replenishment process. The Party package 49834 contains the entities: BuyerParty entity 49850, VendorParty entity, and ProductRecipientParty entity.

The BuyerParty entity 49850 groups together information relating to the company, organization, group or person doing the buying. The BuyerParty entity 49850 contains detailed information about the purchasing party and contains the InternalID element. The InternalID is a purchasing organization and is of type GDT: BusinessTranscationDocumentPartyInternalID. In some implementations, the only identification supported is the InternalID. This means that only the InternalID may be transferred.

The VendorParty is the company or person that is to deliver the products to be ordered. The VendorParty type is GDT: BusinessTransactionDocumentParty, for which the InternalID and the StandardID are used.

The ProductRecipientParty is the company or person to which products are delivered. The ProductRecipientParty type is GDT: BusinessTransactionDocumentParty, for which the InternalID and the StandardID are used.

(c) ReplenishmentOrderProposalItemPriceInformation Package

The PriceInformation package 49832 groups together the relevant price information. The PriceInformation package 49832 contains a NetPurchasePrice entity 49848.

The price refers to the net purchase price specified by the requester or the buyer (relating to the quantity ordered) for the product or service. This price forms the basis for order optimizing in the planning system. The NetPurchasePrice entity 49848 type is GDT: Price. The NetPurchasePrice entity 49848 is optional and is only filled in the ReplenishmentOrderProposalRequestMessage.

(d) ReplenishmentOrderProposalItemLocation Package

The Location package 49836 groups together locations of relevance for the ReplenishmentOrderProposalMessage. The Location package 49836 contains the following entities: ShipFromLocation entity 49852 and ShipToLocation entity 49854. The data transfer of locations from header to item level is supported. This means that the item contains only the locations that differ from the header.

The ShipFromLocation entity 49852 (source of supply) is the location from which the product to be ordered is to be delivered. The ShipFromLocation entity 49852 type is GDT BusinessTransactionDocumentShipFromLocation. The InternalID and the StandardID are supported as identification.

The ShipToLocation entity 49854 (target location) is the location to which the product to be ordered is to be delivered. The ShipToLocation entity 49854 type is GDT BusinessTransactionDocumentShipToLocation. The InternalID and the StandardID are supported as identification.

(e) ReplenishmentOrderProposalItemBusinessDocumentObjectReference Package

The BusinessTransactionDocumentReference package 49838 groups together references to business documents that are related to the ReplenishmentOrderProposalItem in business terms. The BusinessTransactionDocumentReference package 49838 contains a PurchaseOrderReference entity 49856.

The PurchaseOrderReference entity 49856 is a reference to a purchase order in the purchasing system (ERP system) that was created as a result of the order proposal. The PurchaseOrderReference entity 49856 contains the elements: ID and ItemID. The ID is an identifier for the reference document in the purchasing system (ERP system). For example, this can be a purchase order, an order proposal or a stock transport order. This is dependent on the sending system. The ItemID is an identifier for the reference document item in the purchasing system (ERP system) and is of type GDT BusinessTransactionDocumentItemID. This information is needed in the planning system to enable the replenishment planner to see which document number and which order item is behind the order proposal item in the purchasing system (ERP system). In some implementations, an item only ever refers to one item in the ERP system. The package is not filled in the ReplenishmentOrderProposalRequestMessage. If several follow-on documents are created in the purchasing system (ERP) from an order proposal, the references at header and item level can be different.

A purchase order is created in the purchasing system (ERP) from the order proposal created in the planning system (SCP). Usually this order number differs from the number of the order proposal.

If a planning-relevant change is made to this purchase order in ERP (for example, a date change to an order item), this information must be transferred to the SCP with the ReplenishmentOrderProposalConfirmationMessage. The original order proposal number and the number of the item must be forwarded to the SCP so the SCP knows which order proposal this message refers to. With these references, the relevant changes can be made to the order proposal in the SCP.

If a partial delivery is made to the ERP system, this information must be forwarded to the planning system. In this case, the BusinessTransactionDocumentReference Package must be filled with the order proposal number and the corresponding reference item number.

If the ERP system works with schedule lines, the corresponding schedule line numbers can also be transferred (optional). The order proposals in the planning system (SCP) consist of header and item data. The planning system does not work with schedule lines.

(f) ReplenishmentOrderProposalItemScheduleLine Package

A ScheduleLine package 49840 groups together the quantity and date information for a ReplenishmentOrderProposalItem. The ScheduleLine package 49840 contains the entities: ScheduleLine entity 49858 and ConfirmedScheduleLine 49860.

The ScheduleLine entity 49858 is a schedule line with quantities and dates for the schedule created by the planning system for a replenishment delivery of products. The ScheduleLine entity 49858 contains the elements: DeliveryPeriod and Quantity. The DeliveryPeriod is a period in which the requested products are available in the target location and is of type GDT DateTimePeriod. The Quantity is a product quantity of a replenishment order proposal that can be converted to the base unit of measure and is of type GDT Quantity. The ScheduleLine Package is not filled in the ReplenishmentOrderProposalConfirmationMessage.

The ConfirmedScheduleLine entity 49860 is a schedule line with quantities and dates for the schedule confirmed by a purchasing system for a replenishment delivery of products. The ConfirmedScheduleLine entity 49860 contains the elements: PurchaseOrderItemScheduleLineReferenceID, DeliveryPeriod, and Quantity. The PurchaseOrderItemScheduleLineReferenceID is an identifier for the schedule line number for the order item in the purchasing system and is of type GDT BusinessTransactionDocumentItemScheduleLineID. The DeliveryPeriod is a period in which the requested products are available in the target location and is of type GDT DateTimePeriod. The Quantity is a product quantity that can be converted to the base unit of measure and is of type GDT Quantity. The ConfirmedScheduleLine Package is not filled in the ReplenishmentOrderProposalRequestMessage.

(4) Message Data Type Element Structure (a) ReplenishmentOrderProposalRequest

The message data type element structure for the ReplenishmentOrderProposalRequest message is depicted in FIG. 499A-I. The element structure is similar to the data model, but provides additional information regarding the details of the interface. The element structure identifies the different packages 49900 in the interface, and represents the entities at various levels within the interface. As depicted in FIG. 499A, the interface for ReplenishmentOrderProposalRequest Message includes five levels 49901, 49902, 49903, 49904, and 49905.

The outermost package of this interface is a ReplenishmentOrderProposalRequestMessage package 49910, which includes a ReplenishmentOrderProposal Message entity 49911 at the first level 49901. The ReplenishmentOrderProposal Message entity 49911 is of a data type MDT 49917 "ReplenishmentOrderProposalMessage" 49918. The ReplenishmentOrderProposalRequestMessage package 49910 includes a MessageHeader package 49920 and a ReplenishmentOrderProposal package 49950.

The MessageHeader package 49920 includes a MessageHeader entity 49922 at the second level. There is one 49926 MessageHeader entity 49922 for each ReplenishmentOrderProposalRequest Message entity 49911, and the MessageHeader entity 49922 is of type GDT 49927 Business Document Message Header 49928. The MessageHeader entity 49922 includes an ID 49933 and a CreationDate Time 49943. There is one 49936 ID 49933 for each MessageHeader entity 49922, and the ID 49933 is of type GDT 49937 Business Document MessageID 49938. There is one 499×6 CreationDate Time 49943 for each MessageHeader entity 49922, and the CreationDate Time 49943 is of type GDT 49947 DateTime 49948.

The ReplenishmentOrderProposal package 49950 includes a ReplenishmentOrderProposal entity 49952. There is one 49956 ReplenishmentOrderProposal entity 49952 for each ReplenishmentOrderProposal package 49950. The Replenishment Order Proposal 49952 is of type ReplenishmentOrder Proposal 49958. The ReplenishmentOrderProposal entity 49952 includes elements: @actionCode 49963, @complete Transmission Indicator 49973, ID 49983, Purchasing GroupID 49993, TransshipmentMethodCode 49903A, Consignment Indicator 49913A, Quantity Rounding Allowed Indicator 49923A, OrderPeriod 49933A, and Delivery Period 49943A.

There is one 49966 @actionCode 49963 for each Replenishment Order Proposal 49952. The @actionCode 49963 is of type GDT 49967 ActionCode 49968.

There is one 49976 @complete Transmission Indicator 49973 for each Replenishment Order Proposal 49952. The @complete Transmission Indicator 49973 is of type GDT 49977 Complete Transmission Indicator 49978.

There is one 49986 ID 49983 for each Replenishment Order Proposal 49952. The ID 49983 is of type GDT 49987 Business Transaction DocumentID 49988.

There is zero or one 49996 Purchasing GroupID 49993 for each Replenishment Order Proposal 49952. The Purchasing GroupID 49993 is of type GDT 49997 Purchasing GroupID 49998.

There is zero or one 49906A TransshipmentMethodCode 49903A for each Replenishment Order Proposal 49952. The TransshipmentMethodCode 49903A is of type GDT 49907A TransshipmentMethodCode 49908A.

There is zero or one 49916A Consignment Indicator 49913A for each Replenishment Order Proposal 49952. The Consignment Indicator 49913A is of type GDT 49917A Consignment Indicator 49918A.

There is zero or one 49926A Quantity Rounding Allowed Indicator 49923A for each Replenishment Order Proposal 49952. The Quantity Rounding Allowed Indicator 49923A is of type GDT 49927A Allowed Indicator 49928A.

There is zero or one 49936A OrderPeriod 49933A for each Replenishment Order Proposal 49952. The OrderPeriod 49933A is of type GDT 49937A DateTime Period 49938A.

There is zero or one 49946A Delivery Period 49943A for each Replenishment Order Proposal 49952. The Delivery Period 49943A is of type GDT 49947A DateTime Period 49948A.

The ReplenishmentOrderProposal package 49950 includes packages: Party package 49950A, Location package 49930B, BusinessDocumentObjectReference package 49990B, and Item package 49910C. The Party package 49950A includes entities: BuyerParty 49953A, VendorParty 49973A, and Product Recipient 49903B.

There is zero or one 49956A BuyerParty 49953A for each Party 49950A. The BuyerParty 49953A includes an InternalID 49964A element.

There is zero or one 49966A InternalID 49964A for each BuyerParty 49953A. The InternalID 49964A is of type GDT 49967A Business Transaction Document Party InternalID 49968A.

There is zero or one 49976A VendorParty 49973A for each Party 49950A. The VendorParty 49973A includes elements: InternalID 49984A and StandardID 49994A.

There is zero or one 49986A InternalID 49984A for each VendorParty 49973A. The InternalID 49984A is of type GDT 49987A Business Transaction Document Party InternalID 49988A.

There is zero or one 49996A StandardID 49994A for each VendorParty 49973A. The StandardID 49994A is of type GDT 49997A Business Transaction Document Party StandardID 49998A.

There is zero or one 49906B Product Recipient 49903B for each Party 49950A. The VendorParty 49973A includes elements: InternalID 49914B and StandardID 49924B.

There is zero or one 49916B InternalID 49914B for each Product Recipient 49903B. The InternalID 49914B is of type GDT 49917B Business Transaction Document Party InternalID 49918B.

There is zero or one 49926B StandardID 49924B for each Product Recipient 49903B. The StandardID 49924B is of type GDT 49927B Business Transaction Document Party StandardID 49928B.

The Location package 49930B includes entities: ShipFrom Location 49933B and ShipTo Location 49963B.

There is one 49936B ShipFrom Location 49933B for each Location 49930B. The ShipFrom Location 49933B is of type GDT 49937B Business Transaction Document ShipFrom Location 49938B. The ShipFrom Location 49933B includes elements: InternalID 49944B and StandardID 49954B.

There is zero or one 49946B InternalID 49944B for each ShipFrom Location 49933B. The InternalID 49944B is of type GDT 49947B Location InternalID 49948B.

There is zero or one 49956B StandardID 49954B for each ShipFrom Location 49933B. The StandardID 49954B is of type GDT 49957B Location StandardID 49958B.

There is one 49966B ShipTo Location 49963B for each Location 49930B. The ShipTo Location 49963B is of type GDT 49967B Business Transaction Document ShipTo Location 49968B. The ShipTo Location 49963B includes elements: InternalID 49974B and StandardID 49984B.

There is zero or one 49976B InternalID 49974B for each ShipTo Location 49963B. The InternalID 49974B is of type GDT 49977B Location InternalID 49978B.

There is zero or one 49986B StandardID 49984B for each ShipTo Location 49963B. The StandardID 49984B is of type GDT 49987B Location StandardID 49988B.

The Business Document Object Reference package 49990B includes a Purchase Order Reference entity 49993B.

There is zero or one 49996B Purchase Order Reference 49993B for each Business Document Object Reference 49990B. The Purchase Order Reference 49993B is of type GDT 49997B Business Transaction Document Reference 49998B. The Purchase Order Reference 49993B includes an ID 49904C element.

There is one 49906C ID 49904C for each Purchase Order Reference 49993B. The ID 49904C is of type GDT 49907C Business Transaction Document ItemID 49908C.

The Item package 49910C includes an Item entity 49913C and packages: ProductInformation 49990C, PriceInformation 49960D, Party 49970D, Location 49950E, and ScheduleLine 49910F.

There may be any number 49916C of Item 49913C for each Item 49910C. The Item 49913C is of type ReplenishmentOrder ProposalItem 49918C. The Item 49913C includes elements: @actionCode 49924C, @complete Transmission-Indicator 49934C, ID 49944C, Purchasing GroupID 49954C, TransshipmentMethodCode 49964C, ConsignmentIndicator 49974C, and OrderPeriod 49984C.

There is one 49926C @actionCode 49924C for each Item 49913C. The @actionCode 49924C is of type GDT 49927C ActionCode 49928C.

There is one 49936C @complete TransmissionIndicator 49934C for each Item 49913C. The @complete TransmissionIndicator 49934C is of type GDT 49937C Complete Transmission Indicator 49938C.

There is one 49946C ID 49944C for each Item 49913C. The ID 49944C is of type GDT 49947C Business Transaction Document ItemID 49948C.

There is zero or one 49956C Purchasing GroupID 49954C for each Item 49913C. The Purchasing GroupID 49954C is of type GDT 49957C Purchasing GroupID 49958C.

There is zero or one 49966C TransshipmentMethodCode 49964C for each Item 49913C. The TransshipmentMethodCode 49964C is of type GDT 49967C Transshipment MethodCode 49968C.

There is zero or one 49976C ConsignmentIndicator 49974C for each Item 49913C. The ConsignmentIndicator 49974C is of type GDT 49977C Consignment Indicator 49978C.

There is zero or one 49986C OrderPeriod 49984C for each Item 49913C. The OrderPeriod 49984C is of type GDT 49987C DateTime Period 49988C.

The Product Information package 49990C includes packages: Product 49994C, Product Category 49924D, and Vendor Product Category 49944D.

There is one 49996C Product 49994C for each Product Information 49990C. The Product 49994C is of type GDT 49997C Business Transaction Document Product 49998C. The Product 49994C includes elements: Internal ID 49905D and StandardID 49915D.

There is one 49906D Internal ID 49905D for each Product 49994C. The Internal ID 49905D is of type GDT 49907D Product InternalID 49908D.

There is one 49916D StandardID 49915D for each Product 49994C. The StandardID 49915D is of type GDT 49917D Product StandardID 49918D.

There is zero or one 49926D Product Category 49924D for each Product Information 49990C. The Product Category 49924D is of type GDT 49927D Business Transaction Document Product Category 49928D. The Product Category 49924D includes an element Internal ID 49935D.

There is one 49936D Internal ID 49935D for each Product Category 49924D. The Internal ID 49935D is of type GDT 49937D Product Category InternalID 49938D.

There is zero or one 49946D Vendor Product Category 49944D for each Product Information 49990C. The Vendor Product Category 49944D is of type GDT 49947D Business Transaction Document Product Category 49948D. The Vendor Product Category 49944D includes an element Internal ID 49955D.

There is one 49956D Internal ID 49955D for each Vendor Product Category 49944D. The Internal ID 49955D is of type GDT 49957D Product Category InternalID 49958D.

The Price Information 49960D includes an entity NetPurchasePrice 49964D.

There is zero or one 49966D NetPurchasePrice 49964D for each Price Information 49960D. The NetPurchasePrice 49964D is of type GDT 49967D Price 49968D.

The Party package 49970D includes entities: BuyerParty 49974D, VendorParty 49994D, and Product Recipient Party 49924E.

There is zero or one 49976D BuyerParty 49974D for each Party 49970D. The BuyerParty 49974D includes an element Internal ID 49985D.

There is zero or one 49986D Internal ID 49985D for each BuyerParty 49974D. The Internal ID 49985D is of type GDT 49987D Business Transaction Document Party InternalID 49988D.

There is zero or one 49996D VendorParty 49994D for each Party 49970D. The VendorParty 49994D includes elements: Internal ID 49905E and Standard ID 4991 SE.

There is zero or one 49906E Internal ID 49905E for each VendorParty 49994D. The Internal ID 49905E is of type GDT 49907E Business Transaction Document Party InternalID 49908E.

There is zero or one 49916E Standard ID 49915E for each VendorParty 49994D. The Standard ID 4991 SE is of type GDT 49917E Business Transaction Document Party StandardID 49918E.

There is zero or one 49926E Product Recipient Party 49924E for each Party 49970D. The Product Recipient Party 49924E includes elements: Internal ID 49935E and Standard ID 49945E.

There is zero or one 49936E Internal ID 49935E for each Product Recipient Party 49924E. The Internal ID 49935E is of type GDT 49937E Business Transaction Document Party InternalID 49938E.

There is zero or one 49946E StandardID 49945E for each Product Recipient Party 49924E. The StandardID 49945E is of type GDT 49947E Business Transaction Document Party StandardID 49948E.

The Location package 49950E includes entities: ShipFrom Location 49954E and ShipTo Location 49984E.

There is zero or one 49956E ShipFrom Location 49954E for each Location 49950E. The ShipFrom Location 49954E is of type GDT 49957E Business Transaction Document ShipFrom Location 49958E. The ShipFrom Location 49954E includes elements: Internal ID 49965E and Standard ID 49975E.

There is zero or one 49966E Internal ID 49965E for each ShipFrom Location 49954E. The Internal ID 49965E is of type GDT 49967E Location InternalID 49968E.

There is zero or one 49976E StandardID 49975E for each ShipFrom Location 49954E. The StandardID 49975E is of type GDT 49977E Location StandardID 49978E.

There is zero or one 49986E ShipTo Location 49984E for each Location 49950E. The ShipTo Location 49984E is of type GDT 49987E BusinessTransactionDocument- ShipToLocation 49988E. The ShipTo Location 49984E includes elements: Internal ID 49995E and Standard ID 49905F.

There is zero or one 49996E Internal ID 49995E for each ShipTo Location 49984E. The Internal ID 49995E is of type GDT 49997E Location InternalID 49998E.

There is zero or one 49906F StandardID 49905F for each ShipTo Location 49984E. The StandardID 49905F is of type GDT 49907F Location StandardID 49908F.

The Schedule Line package 49910F includes an entity ScheduleLine 49914F.

There is one 49916F ScheduleLine 49914F for each Schedule Line 49910F. The ScheduleLine 49914F includes elements: Delivery Period 49925F and Quantity 49935F.

There is one 49926F Delivery Period 49925F for each ScheduleLine 49914F. The Delivery Period 49925F is of type GDT 49927F DateTime Period 49928F.

There is one 49936F Quantity 49935F for each ScheduleLine 49914F. The Quantity 49935F is of type GDT 49937F Quantity 49938F.

(b) Replenishment Order Proposal Confirmation Message

The message data type element structure for Replenishment Order Proposal Confirmation Message is depicted in FIG. 499AA-L. The element structure is similar to the data model, but provides additional information regarding the details of the interface. The element structure identifies the different packages 499A00 in the interface, and represents the entities at various levels within the interface. As depicted in FIG. 499AA, the interface for Replenishment Order Proposal Confirmation Message includes five levels 499A02, 499A04, 499A06, 499A08, and 499A10. The outermost package of this interface is a ReplenishmentOrderProposalConfirmationMessage 499A16, which includes a ReplenishmentOrderProposalMessage 499A18 at the first level 499A02. The ReplenishmentOrderProposalMessage 499A18 is of a data type MDT 499A20 and the name is ReplenishmentOrderProposalMessage 499A22.

The ReplenishmentOrderProposalConfirmationMessage 499A16 includes a MessageHeader 499A24. The MessageHeader 499A24 includes a MessageHeader entity 499A26 with a cardinality of one 499A28, the type is GDT 499A30 and the name is BusinessDocumentMessageHeader 499A32. The MessageHeader entity 499A26 includes an ID 499A34 and a CreationDateTime 499A42. The ID 499A34 has a cardinality of one 499A36, the type is GDT 499A38 and the name is BusinessDocumentMessageID 499A40. The CreationDateTime 499A42 has a cardinality of one 499A44, the type is GDT 499A46 and the name is DateTime 499A48.

As depicted in FIG. 499AB, a ReplenishmentOrderProposal package 499A50 includes a ReplenishmentOrderProposal entity 499A52. The ReplenishmentOrderProposal entity 499A52 includes an @actionCode 499A60, an @completeTransmissionIndicator 499A68, an ID 499A76, a PurchasingGroupID 499A84, a TransshipmentMethodCode 499A92, and a ConsignmentIndicator 499A00A. The @actionCode 499A60 has a cardinality of one 499A62, the type is GDT 499A64 and the name is ActionCode 499A66. The @completeTransmissionIndicator 499A68 has a cardinality of one 499A70, the type is GDT 499A72 and the name is CompleteTransmissionIndicator 499A74. The ID 499A76 has a cardinality of one 499A78, the type is GDT 499A80 and the name is BusinessTransactionDocumentID 499A82. The PurchasingGroupID 499A84 has a cardinality of zero or one 499A86, the type is GDT 499A88 and the name is PurchasingGroupID 499A90. The TransshipmentMethodCode 499A92 has a cardinality of zero or one 499A94, the type is GDT 499A96 and the name is TransshipmentMethodCode 499A98. The ConsignmentIndicator 499A00A has a cardinality of zero or one 499A02A, the type is GDT 499A04A and the name is ConsignmentIndicator 499A06A.

As depicted in FIG. 499AC, the ReplenishmentOrderProposal 499A52 also includes an OrderPeriod 499A08A with a cardinality of zero or one 499A10A, the type is GDT 499A12A and the name is DateTimePeriod 499A14A. The ReplenishmentOrderProposal 499A52 also includes a DeliveryPeriod 499A16A with a cardinality of zero or one 499A18A, the type is GDT 499A20A and the name is DateTimePeriod 499A22A.

A Party package 499A24A includes a BuyerParty entity 499A26A with a cardinality of zero or one 499A28A. The BuyerParty entity 499A26A includes an InternalID 499A30A with a cardinality of zero or one 499A32A, the type is GDT 499A34A, and the name is BusinessTransactionDocumentPartyInternalID 499A36A. A VendorParty 499A38A has a cardinality of zero or one 499A40A and includes an InternalID 499A42A and a StandardID 499A50A. The InternalID 499A42A has a cardinality of zero or one 499A44A, the type is GDT 499A46A and the name is BusinessTransactionDocumentPartyInternalID 499A48A. The StandardID 499A50A has a cardinality of zero or one 499A52A, the type is GDT 499A54A, and the name is BusinessTransactionDocumentPartyStandardID 499A56A.

As depicted in FIG. 499AD, a Party package includes a ProductRecipientParty entity 499A58A with a cardinality of zero or one 499A60A. The ProductRecipientParty entity 499A58A includes an InternalID 499A62A with a cardinality of zero or one 499A64A, the type is GDT 499A66A, and the name is BusinessTransactionDocumentPartyInternalID 499A68A. A StandardID 499A70A is also included with a cardinality of zero or one 499A72A, a type of GDT 499A74A and the name BusinessTransactionDocumentPartyStandardID 499A76A.

A Location package 499A78A includes a ShipFromLocation entity 499A80A with a cardinality of one 499A82A, the type is GDT 499A84A, and the name is BusinessTransactionDocumentShipFromLocation 499A86A. An InternalID entity 499A88A has a cardinality of zero or one 499A90A, the type is GDT 499A92A and the name is LocationInternalID 499A94A. A StandardID entity 499A96A is also included with a cardinality of zero or one 499A98A, the type is GDT 499A00B and the name is LocationStandardID 499A02B.

As depicted in FIG. 499AE, a ShipToLocation package 499A04B has a cardinality of one 499A06B, the type is GDT 499A08B and the name is BusinessTransactionDocumentlShipToLocation 499A10B. An InternalID entity 499A12B is included with a cardinality of zero or one 499A14B, the type is GDT 499A161B, and the name is LocationInternalID 499A18B. A StandardID entity 499A20B is included with a cardinality of zero or one 499A22B, the type is GDT 499A24B, and the name is LocationStandardID 499A26B.

A BusinessDocumentObjectReference package 499A28B includes a PurchaseOrderReference 499A30B with a cardinality of zero or one 499A32B, the type is GDT 499A34B, and the name is BusinessTransactionDocumentReference 499A36B. The PurchaseOrderReference 499A30B includes an ID entity 499A38B with a cardinality of one 499A40B, the type is GDT 499A42B, and the name is BusinessTransactionDocumentItemID 499A44B.

A ReplenishmentOrderProposal package 499A50 includes an Item package 499A46B. The Item package 499A46B includes an Item entity 499A48B with any number 499A50B of item entities 499A48B for an Item package 499A46B. The name is ReplenishmentOrderProposalItem 499A52B. The Item entity 499A48B includes an @actionCode 499A54B, an @completeTransmissionIndicator 499A62B, an ID 499A70B, a PurchasingGroupID 499A78B, a TransshipmentMethodCode 499A86B, a ConsignmentIndicator 499A94B, and a ReturnsIndicator 499A02C. The @actionCode 499A54B has a cardinality of one 499A56B, the type is GDT 499A58B, and the name is ActionCode 499A60B. The @completeTransmissionIndicator 499A62B has a cardinality of one 499A64B, the type is GDT 499A66B, and the name is CompleteTransmissionIndicator 499A68B. The ID 499A70B has a cardinality of one 499A72B, the type is GDT 499A74B, and the name is BusinessTransactionDocumentItemID 499A76B. The PurchasingGroupID 499A78B has a cardinality of zero or one 499A80B, the type is GDT 499A82B, and the name is PurchasingGroupID 499A84B. The TransshipmentMethodCode 499A86B has a cardinality of one 499A88B, the type is GDT 499A90B, and the name is TransshipmentMethodCode 499A92B. The ConsignmentIndicator 499A94B has a cardinality of zero or one 499A96B, the type is GDT 499A98B, and the name is ConsignmentIndicator 499A00C. The ReturnsIndicator 499A02C has a cardinality of zero or one 499A04C, the type is GDT 499A06C, and the name is ReturnsIndicator 499A08C.

As depicted in FIG. 499AG, the Item package 499A46B includes a PlanningRelevanceIndicator 499A10C, a CompletedIndicator 499A18C, a ReceivedQuantity 499A26C, and an OrderPeriod 499A34C. The PlanningRelevanceIndicator 499A10C has a cardinality of zero or one 499A12C, the type is GDT 499A14C, and the name is PlanningRelevanceIndicator 499A16C. The CompletedIndicator 499A18C has a cardinality of zero one 499A20C, the type is GDT 499A22C, and the name is BusinessTransactionCompletedIndicator 499A24C. the ReceivedQuantity 499A26C has a cardinality of zero or one 499A28C, the type is GDT 499A30C, and the name is Quantity 499A32C. The OrderPeriod 499A34C has a cardinality of zero or one 499A36C, the type is GDT 499A38C, and the name is DateTimePeriod 499A40C.

A ProductInformation package 499A42C includes a Product entity 499A44C with a cardinality of one 499A46C, the type is GDT 499A48C and the name is BusinessTransactionDocumentProduct 499A50C. The Product entity 499A44C includes an InternalID and a StandardID 499A60C. The InternalID 499A52C has a cardinality of one 499A54C, the type is GDT 499A56C, and the name is ProductInternalID 499A58C. The StandardID 499A60C has a cardinality of one 499A62C, the type is GDT 499A64C and the name is ProductStandardID 499A66C.

As depicted in FIG. 499AI, the Item package 499A46B includes a Party package 499A00D. The Party package 499A00D includes a BuyerParty entity 499A02D with a cardinality of zero or one 499A04D. An InternalID entity 499A06D is included with a cardinality of zero or one 499A08D, the type is GDT 499A10D, and the name is BusinessTransactionDocumentPartyInternalID 499A12D.

The Party package 499A00D also includes a VendorParty 499A14D with a cardinality of zero or one 499A16D. The VendorParty 499A14D includes an InternalID 499A18D and a StandardID 499A26D. The InternalID 499A18D has a cardinality of zero or one 499A20D, the type is GDT 499A22D, and the name is BusinessTransactionDocumentPartyInternalID 499A24D. The StandardID 499A26D has a cardinality of zero or one 499A28D, the type is GDT 499A30D, and the name is BusinessTransactionDocumentPartyStandardID 499A32D. A ProductRecipientParty entity 499A34D has a cardinality of zero or one 499A36D.

The Party package 499A00D includes an InternalID 499A38D and a StandardID 499A46D. The InternalID 499A38D has a cardinality of zero or one 499A40D, the type is GDT 499A42D, and the name is BusinessTransactionDocumentPartyInternalID 499A44D. The StandardID 499A46D has a cardinality of zero or one 499A48D, the type is GDT 499A50D, and the name is BusinessTransactionDocumentPartyStandardID 499A52D.

A Location package 499A54D includes a ShipFromLocation entity 499A56D with a cardinality of zero or one 499A58D, the type is GDT 499A60D, and the name is BusinessTransactionDocumentShipFromLocation 499A62D. An InternalID 499A64D and a StandardID 499A72D are included. The InternalID 499A64D has a cardinality of zero or one 499A66D, the type is GDT 499A68D, and the name is LocationInternalID 499A70D. The StandardID 499A72D has a cardinality of zero or one 499A74D, the type is GDT 499A76D, and the name is LocationStandardID 499A78D. A ShipToLocation entity 499A80D is also included with a cardinality of zero or one 499A82D, the type is GDT 499A84D, and the name is BusinessTransactionDocumentShipToLocation 499A86D.

As depicted in FIG. 499AK, the Location package 499A54D includes an InternalID 499A88D with a cardinality of zero or one 499A90D, the type is GDT 499A92D, and the name is LocationInternalID 499A94D. A StandardID 499A96D is also included with a cardinality of zero or one 499A98D, the type is GDT 499A00E, and the name is LocationStandardID 499A02E.

A BusinessDocumentObjectReference package 499A04E includes a PurchaseOrderReference entity 499A06E. The PurchaseOrderReference entity 499A06E has a cardinality of zero or one 499A08E, the type is GDT 499A10E, and the name is BusinessTransactionDocumentReference 499A12E. An ID entity 499A14E and an ItemID entity 499A22E are included. The ID 499A14E has a cardinality of one 499A16E, the type is GDT 499A18E, and the name is BusinessTransactionDocumentID 499A20E. The ItemID 499A22E has a cardinality of one 499A24E, the type is GDT 499A26E, and the name is BusinessTransactionDocumentItemID 499A28E.

As depicted in FIG. 499AL, the ScheduleLine package 499A30E includes a ConfirmedScheduleLine entity 499A32E with a cardinality of one 499A34E. The ConfirmedScheduleLine entity 499A32E includes a PurchaseOrderItemScheduleLineReferenceID entity 499A36E, a DeliveryPeriod entity 499A44E, and a Quantity entity 499A52E. The PurchaseOrderItemScheduleLineReferenceID 499A36E has a cardinality of zero or one 499A38E, the type is GDT 499A40E, and the name is BusinessTransactionDocumentItemSceduleLineID 499A42E. The DeliveryPeriod 499A44E has a cardinality of zero or one 499A46E, the type is GDT 499A48E, and the name is DateTimePeriod 499A50E. The Quantity 499A52E has a cardinality of zero or one 499A54E, the type is GDT 499A56E, and the name is Quantity 499A58E.

(5) Message Choreography

FIG. 500 depicts a message choreography that describes the logical sequence of messages that can be used to realize the scenario between vendor 50000 and product recipient 50002. The product recipient 50002 informs a vendor 50000 of the need to perform a return delivery of goods. The Vendor 50000 initially sends a ReturnAuthorizationRequest 50004 to a ProductRecipient 50002 to authorize a goods return. The ProductRecipient 50002 then sends instructions in the form of ReturnDeliveryInstructionNotification 50006 to Vendor 50000 to perform the return delivery. These instructions can be confirmed for example, by the vendor 50000 sending a ReturnDeliveryInstructionConfirmation 50008 to the product recipient 50002. The vendor 50000 informs the product recipient 50002 of the return delivery using DespatchedDeliveryNotification 50010. Receipt of the return delivery can be confirmed by the product recipient 50002 relaying a RecievedDeliveryNotification 50012 to Vendor 50000.

(6) Message Data Type Data Model

FIG. 501 depicts the data model for the ReturnDeliveryInstructionMessage. The message data type ReturnDeliveryInstructionMessage includes a ReturnDeliveryInstructionMessage package 50100, which includes a ReturnDeliveryInstructionMessage entity 50102. The ReturnDeliveryInstructionMessage package 50100 also includes a MessageHeader package 50104 and a ReturnDeliveryInstruction package 50106. The message data type ReturnDeliveryInstructionMessage makes the structure available for the following message data types: ReturnDeliveryInstructionNotificationMessage, ReturnDeliveryInstructionConfirmationMessage, and their associated message types and interfaces. The ReturnDeliveryInstructionNotificationMessage and the ReturnDeliveryInstructionConfirmationMessage are derived from the ReturnDeliveryInstructionMessage as structural views.

There is a 1:c relationship between entities in this Interface unless otherwise noted herein or indicated in the Figures.

(a) Message Header Package

The MessageHeader package 50104 groups together the business information that is relevant for sending a business document in a message. It may include a MessageHeader entity 50108, which groups together the business information from the viewpoint of the sending application to identify the business document in a message, information about the sender, and, optionally, information about the recipient. The MessageHeader entity 50108 may be divided up into a SenderParty 50110 and a RecipientParty 50112, and is of type GDT: BusinessDocumentMessageHeaderParty. The MessageHeader entity 50108 may also include an ID, which is the identification of the business document in the technical message, and a CreationDateTime, which is the creation date of the business document in the technical message. A MessageHeader is optional. There is a 1:1 relationship between MessageHeader entity 50108 and ReturnDeliveryInstructionMessage entity 50102.

A SenderParty entity 50110 is the party responsible for sending a business document at the business application level and is of type GDT: BusinessDocumentMessageHeaderParty.

A RecipientParty entity 50112 is the party responsible for receiving a business document at the business application level and is of type GDT: BusinessDocumentMessageHeaderParty.

(b) Return Delivery Instruction Package

The ReturnDeliveryInstruction package 50106 groups together the ReturnDeliveryInstruction entity 50114 and its packages: a Party package 50116; an Location package 50118; a ReturnDeliveryItem package 50120; and a HandlingUnit package 50122. There is a 1:1 relationship between the ReturnDeliveryInstruction entity 50114 and the ReturnDeliveryInstructionMessage entity 50102.

A ReturnDeliveryInstruction entity 50114 includes logistical instructions to a vendor for a return delivery that he or she is to perform in the future. The ReturnDeliveryInstruction contains values for the business parties between which the return delivery is to take place, as well as the ship-to location of the return delivery. It subdivides into instruction items (ReturnDeliveryInstructionItems) with information about the arrival times, the quantities of a product to be returned, and the carriers who are to perform the return transport. References to relevant business documents, in particular to an authorization given previously for return delivery of goods, can be specified for a ReturnDeliveryInstructionItem.

ReturnDeliveryInstruction contains the following elements: an ID; a CreationDateTime; a DeliveryTypeCode; and a Note. The ID element is a unique identifier of the return delivery instruction and is of type GDT: BusinessTransactionDocumentID. The CreationDateTime element is the creation date of the return delivery instruction and is of type GDT: DateTime. The DeliveryTypeCode element is a logistically-relevant type of delivery (e.g., scrapping or disposal delivery) and is of type GDT: DeliveryTypeCode. The Note element is for return delivery instruction (e.g., data regarding reason for return delivery) is of type GDT: Note.

(i) Party Package

The Party package 50116 groups together the business partners that may be relevant within the ReturnDeliveryInstruction. The Party package 50116 includes a BuyerParty entity 50124, a VendorParty entity 50126, and ProductRecipientParty entity 50128.

The BuyerParty entity 50124 is a party that has purchased the goods being returned or has ordered the repurchase of these goods. The BuyerParty 501 is of type GDT: BusinessTransactionDocumentParty, whereby, in one implementation, only the InternalID, the StandardID, the BuyerID, the VendorID, and Address are required. For intra-enterprise communication (with common master data), use only InternalID for all party entities. For an inter-enterprise communication (with business-partner-specific master data), use only the StandardID or the partner-role-specific ID of the receiving partner for all party entities; in other words, use the BuyerID for Supplier Collaboration scenarios, and use the VendorID for Customer Collaboration scenarios. Due to the different possibilities for ID use, all ID elements of the particular party are optional.

The VendorParty entity 50126 is the company that sends back the goods and is of type GDT: BusinessTransactionDocumentParty, whereby, in one implementation, only the InternalID, the StandardID, the BuyerID, the VendorID, and Address are required. There is a 1:1 relationship between the VendorParty entity 50126 and the ReturnDeliveryInstruction entity 50114. For intra-enterprise communication (with common master data), use only InternalID for all party entities. For an inter-enterprise communication (with business-partner-specific master data), use only the StandardID or the partner-role-specific ID of the receiving partner for all party entities; in other words, use the BuyerID for Supplier Collaboration scenarios, and use the VendorID for Customer Collaboration scenarios. Due to the different possibilities for ID use, all ID elements of the particular party are optional.

The ProductRecipientParty 50128 is the company to whom the goods are returned and is of type GDT: BusinessTransactionDocumentParty, whereby, in one implementation, only the InternalID, the StandardID, the BuyerID, the VendorID, and Address are required. For intra-enterprise communication (with common master data), use only InternalID for all party entities. For an inter-enterprise communication (with business-partner-specific master data), use only the StandardID or the partner-role-specific ID of the receiving partner for all party entities; in other words, use the BuyerID for Supplier Collaboration scenarios, and use the VendorID for Customer Collaboration scenarios. Due to the different possibilities for ID use, all ID elements of the particular party are optional.

(ii) Location Package

The Location package 50118 groups together the locations that can occur in a delivery process. It includes a ShipFromLocation entity 50130 and a ShipToLocation entity 50132.

There is a 1:1 relationship between the ShipToLocation entity 50132 and the ReturnDeliveryInstruction entity 50114.

The ShipFromLocation is the location from which goods are sent back. The ShipFromLocation entity 50130 is of type GDT: BusinessTransactionDocumentShipFromLocation, whereby the InternalID, the StandardID, the BuyerID, the VendorID, the Note, the LoadingLocation, and the Address are used. For intra-enterprise communication (with common master data), only use the InternalID for all location entities. For inter-enterprise communication (with business-partner-specific master data), use for all location entities either only the StandardID or the partner-role-specific ID of the sending or receiving partner; in other words, the BuyerID or VendorID. Due to the different possibilities for ID use, all the ID elements of each location are optional.

The ShipToLocation is the location to which goods are sent back. The ShipToLocation entity 50132 is of type GDT: BusinessTransactionDocumentShipToLocation, whereby the InternalID, the StandardID, the BuyerID, the VendorID, the Note, the LoadingLocation, and the Address are used. For intra-enterprise communication (with common master data), only use the InternalID for all location entities. For inter-enterprise communication (with business-partner-specific master data), use for all location entities either only the StandardID or the partner-role-specific ID of the sending or receiving partner; in other words, the BuyerID or VendorID. Due to the different possibilities for ID use, all the ID elements of each location are optional.

(iii) Return Delivery Instruction Item Package

The ReturnDeliveryInstructionItem package 50120 groups together the ReturnDeliveryInstructionItem with its packages. It includes a ReturnDeliveryInstructionItem entity 50134, DeliveryBusinessTransactionDocumentReference package 50136, a Party package 50138, a ProductInformation package 50140, and a Batch package 50142.

The ReturnDeliveryInstructionItem entity 50134 is an item contained in the ReturnDeliveryInstruction that specifies the quantity of a product to be returned with its planned delivery period. The ReturnDeliveryInstructionItem 50134 contains values for the carriers who are going to perform the return, the ship-to location, and references to the business documents that are relevant within the return delivery. There is a 1:n relationship between the ReturnDeliveryInstructionItem entity 50134 and the ReturnDeliveryInstruction entity 50114.

The ReturnDeliveryInstructionItem 50134 contains the following elements: ID; DeliveryTypeCode; ReturnMaterialAuthorisationID; SerialID (serial number); GroupID; DeliveryPeriod; RequestedQuantity; ApprovedQuantity; and Note.

The ID is a unique identifier for a ReturnDeliveryInstructionItem and is of type GDT: BusinessTransactionDocumentItemID. The DeliveryTypeCode is a logistically-relevant type of delivery (e.g., scrapping or disposal delivery) and is of type GDT: DeliveryTypeCode. The ReturnMaterialAuthorisationID is a unique identifier for authorizing a goods return to which the party returning the goods can refer in a subsequent notification of the return delivery; for example, using the DespatchedDeliveryNotification message. It is required specifically within return delivery scenarios in which the delivery item does not refer to a purchase order or a scheduling agreement. The ReturnMaterialAuthorisationID is of typeGDT: ReturnMaterialAuthorisationID. The SerialID (serial number) is a unique identifier for an individual item of a delivered product that is assigned in the context of production and is of type GDT: SerialID. The serial numbers must only specify product instances of the product specified in the associated ReturnDeliveryInstructionItem. Therefore, the number of serial numbers must be the same or smaller than the product quantity specified under "ApprovedQuantity" in the ReturnDeliveryInstructionItem. The "smaller" case can occur if not all the individual items of a product can be specified by serial numbers. The GroupID is a unique identifier for a group of instruction items to which a ReturnDeliveryInstructionItem belongs and is of type GDT: BusinessTransactionDocumentItemGroupID. A return delivery must only contain the quantities of products that are listed in ReturnDeliveryInstructionItems with the same GroupID. The DeliveryPeriod is the period in which the quantity of a product given in the ReturnDeliveryInstructionItem should be delivered and is of type GDT: DateTimePeriod. The RequestedQuantity is a return delivery quantity requested in the delivery unit of measure and is of type GDT: Quantity. The ApprovedQuantity is an approved return delivery quantity in the delivery unit of measure and is of type GDT: Quantity. The Note is a note for item of return delivery instruction (e.g., instructions for handling the product being returned that is specified in the item) and is of type GDT: Note.

The DeliveryItemBusinessTransactionDocumentReference package 50136 groups together all the business document references that can be relevant to the ReturnDeliveryInstructionItem. The DeliveryItemBusinessTransactionDocumentReference package 50136 includes a ReturnAuthorizationReference entity 50144.

A ReturnAuthorizationReference entity 50144 is the reference to the request for authorization of a goods return and is of type GDT: BusinessTransactionDocumentReference.

The Party package 50138 groups together the business partners that might be relevant in a ReturnDeliveryInstructionItem. The Party package 50138 includes a BuyerParty entity 50146 and a CarrierParty entity 50148.

A BuyerParty entity 50146 is a party that has purchased the product to be returned or has ordered the repurchase of these goods. The BuyerParty entity 50146 is type GDT: BusinessTransactionDocumentParty, whereby, in one implementation, only the InternalID, the StandardID, the BuyerID, the VendorID, and Address are required. For intra-enterprise communication (with common master data), only use the InternalID for all product entities. For inter-enterprise communication (with business-partner-specific master data), use for all product entities either only the StandardID or the partner-role-specific ID of the sending or receiving partner; in other words, the BuyerID or VendorID. Due to the different possibilities for ID use, all ID elements of each particular product are optional.

In the case of BuyerParty 50146, a default logic may exist at the header level for the items. This means that the BuyerParty 50146 specified at the header level is valid for all items as long as the information specified at item level does not contradict this.

A CarrierParty entity 50148 is the company or person that/who transports the products being returned. The CarrierParty is type GDT: BusinessTransactionDocumentParty, whereby, in one implementation, only the InternalID, the StandardID, the BuyerID, the VendorID, and Address are required. There is a 1:cn relationship between CarrierParty entity 50148 and ReturnDeliveryInstructionItem entity 50134. For intra-enterprise communication (with common master data), only use the InternalID for all product entities. For inter-enterprise communication (with business-partner-specific master data), use for all product entities either only the StandardID or the partner-role-specific ID of the sending or receiving partner; in other words, the BuyerID or VendorID. Due to the different possibilities for ID use, all ID elements of each particular product are optional.

The ProductInformation package 50140 groups together all the information for identifying and describing a product in the ReturnDeliveryInstructionItem. The ProductInformation package 50140 contains a Product entity 50150.

The Product entity 50150 identifies and describes the product being returned and is of type GDT: BusinessTransactionDocumentProduct, whereby, in one implementation, only the InternalID, the StandardID, the BuyerID, and the VendorID are required. There is a 1:1 relationship between Product entity 50150 and ReturnDeliveryInstructionItem entity 50134. For inter-enterprise communication (with business-partner-specific master data), use for all product entities either only the StandardID or the partner-role-specific ID of the sending or receiving partner; in other words, the BuyerID or VendorID. Due to the different possibilities for ID use, all ID elements of each particular product are optional.

The Batch package 50142 groups information used to identify and describe a batch within the ReturnDeliveryInstructionItem. It contains a Batch entity 50152.

The Batch entity 50152 identifies and describes the batch to be returned and contains the following elements: InternalID; BuyerID; VendorID; ManufacturingDate; BestBeforeDate; and OriginCountryCode.

The InternalID is a proprietary identifier for the batch and is of type GDT: BatchID. The BuyerID is a unique identifier used by the BuyerParty for the batch and is of type GDT: BatchID. The VendorID is a Unique identifier used by the VendorParty for the batch and is of type GDT: BatchID. The ManufacturingDate is the date of manufacture of the batch and is of type GDT: Date. The BestBeforeDate is the Best-before date of batch and is of type GDT: Date. The OriginCountryCode is a coded representation of country of origin of the batch and is of type
GDT: CountryCode.

(iv) Delivery Handling Unit Package

The DeliveryHandlingUnit package entity 50122 summarizes information that characterizes in greater detail how the return delivery is to be packed. The DeliveryHandlingUnit package entity 50122 includes a HandlingUnit entity 50154.

A HandlingUnit entity 50154 is a physical unit of packaging materials (load carrier, additional packaging materials) and the packaged products (of type "material") and is of type GDT: HandlingUnit, whereby the lower structures "AdditionalPackaging" and "LowerLevelHandlingUnit" are not required. There is a 1:cn relationship between HandlingUnit entity 50154 and a ReturnDeliveryInstruction entity 50114.

(7) Message Data Type Element Structure

The message data type element structure for the Return Delivery Instruction Notification 50220 is depicted in FIG. 502A-L. The element structure is similar to the data model, but provides additional information regarding the details of the interface. The element structure identifies the different packages 50200 in the interface, and represents the entities at various levels within the interface. As depicted in FIG. 502A, the interface for Return Delivery Instruction Notification 50220 includes six levels 50202, 50204, 50206, 50208, 50210, and 50212. The outermost package of this interface is a ReturnDeliveryInstructionNotification 50220, which includes a ReturnDelivery-Notification entity 50222 at the first level 50202. The ReturnDelivery-Notification 50222 has a cardinality of one 1 50224, the type is MDT 50226, and the name is ReturnDeliveryInstructionNotification 50228.

The ReturnDeliveryInstructionNotification package 50220 includes a Business Document Header package 50230. The Business Document Header package 50230 includes a MessageHeader entity 50232 that has a cardinality of one 50234, the type is GDT 50236, and the name is BusinessDocumentMessageHeader 50238. The MessageHeader entity 50232 includes an ID entity 50240, a CreationDateTime entity 50248, and a SenderParty entity 50256. The ID entity 50240 has a cardinality of one 50242, the type is GDT 50244, and the name is BusinessDocumentMessageID 50246. The CreationDateTime entity 50248 has a cardinality of one 50250, the type is GDT 50252, and the name is DateTime 50254. The SenderParty entity 50256 has a cardinality of zero or one 50258, the type is GDT 50260, and the name is BusinessDocumentMessageHeaderParty 50262.

The SenderParty entity 50256 includes an InternalID entity 50264 and a StandardID entity 50272. The InternalID entity 50264 has a cardinality of zero or one 50266, the type is GDT 50268, and the name is PartyInternal ID 50270. The StandardID entity 50272 may have any number 50274 of StandardID entities 50272 for a SenderParty entity 50256, the type is GDT 50276, and the name is PartyStandardID 50278.

As depicted in FIG. 502B, the ReturnDeliveryInstructionNotification package 50220 includes a RecipientParty entity 50280 at the third level. The RecipientParty entity 50280 has a cardinality of zero or one 50282, the type is GDT 50284, and the name is BusinessDocument-MessageHeaderParty 50286. The RecipientParty entity 50280 includes an InternalID entity 50288 and a StandardID entity 50296. The InternalID entity 50288 has a cardinality of zero or one 50290, the type is GDT 50292, and the name is PartyInternalID 50294. The StandardID entity 50296 may have any number 50298 of StandardID entities 50296 for a RecipientParty entity 50280, the type is GDT 50200A and the name is PartyStandardID 50202A.

The ReturnDeliveryInstructionNotification package 50220 also includes a ReturnDelivery Instruction package 50204A. The ReturnDelivery Instruction package 50204A includes a ReturnDelivery-Instruction entity 50206A with a cardinality of one 50208A, and a name "ReturnDeliveryInstruction" 50210A. The ReturnDelivery-Instruction entity 50206A includes an ID entity 50212A, a CreationDateTime entity 50220A, and a DeliveryTypeCode entity 50228A. The ID entity 50212A has a cardinality of zero or one 50214A, the type is GDT 50216A and the name is BusinessTransactionDocumentID 50218A. The CreationDateTime entity 50220A has a cardinality of one 50222A, the type is GDT 50224A, and the name is DateTime 50226A. The DeliveryTypeCode entity 50228A has a cardinality of zero or one 50230A, the type is GDT 50232A, and the name is DeliveryTypeCode 50234A.

As depicted in FIG. 502C, the ReturnDeliveryInstructionNotification package 50220 also includes a Party package 50236A. The Party package 50236A includes a BuyerParty entity 50238A with a cardinality of zero or one 50240A. The data type is GDT 50242A, and the name is BusinessTransactionDocumentParty 50244A. The BuyerParty entity 50238A includes an InternalID entity 50246A, a StandardID entity 50254A, a BuyerID entity 50262A, a VendorID entity 50270A, and an Address entity 50278A. The InternalID entity 50246A has a cardinality of zero or one 50248A, the type is GDT 50250A, and the name is PartyInternalID 50252A. The StandardID entity 50254A may have any number 50256A of StandardID entities 50254A for a Party package, the type is GDT 50258A, and the name is PartyStandardID 50260A. The BuyerID entity 50262A has a cardinality of zero or one 50264A, the type is GDT 50266A, and the name is PartyPartyID 50268A. The VendorID entity 50270A has a cardinality of zero or one 50272A, the type is GDT 50274A, and the name is PartyPartyID 50276A. The Address entity 50278A has a cardinality of zero or one 50280A, the type is GDT 50282A, and the name is Address 50284A.

The Party package 50236A includes a VendorParty entity 50286A at the third level 50208. The cardinality of the VendorParty entity is zero or one 50288A for a Party package 50236A, the type is GDT 50290A, and the name is BusinessTransactionDocumentParty 50292A. The VendorParty entity 50286A includes an InternalID entity 50294A with a cardinality of zero or one 50296A, the type is GDT 50298A, and the name is PartyInternalID 50200B.

As depicted in FIG. 502D, the VendorParty entity 50286A also includes a StandardID entity 50202B, a BuyerID entity 50210B, a VendorID entity 50218B, and an Address entity 50226B. The StandardID entity 50202B may have any number 50204B of Standard ID entities for a VendorParty entity 50286A. The data type is GDT 50206B, and the name is PartyStandardID 50208B. The BuyerID entity 50210B has a cardinality of zero or one 50212B, the type is GDT 50214B, and the name is PartyPartyID 50216B. The VendorID entity 50218B has a cardinality of zero or one 50220B, the type is GDT 50222B, and the name is PartyPartyID 50224B. The Address entity 50226B has a cardinality of zero or one 50228B, the type is GDT 50230B, and the name is Address 50232B.

The ReturnDeliveryInstructionNotification 50220 also includes a ProductRecipientParty entity 50234B with a cardinality of zero or one 50236B, a data type of GDT 50238B, and a name of BusinessTransactionDocumentParty 50240B. The ProductRecipientParty entity 50234B includes an InternalID entity 50242B, a StandardID entity 50250B, a BuyerID entity 50258B, a VendorID entity 50266B, and an Address entity 50274B. The InternalID entity 50242B has a cardinality of zero or one 50244B, the type is GDT 50246B, and the name is PartyInternalID 50248B. The StandardID entity 50250B may have any number 50252B of StardardID entities 50250B for a ProductRecipientParty entity 50234B. The data type is GDT 50254B and the name is PartyStandardID 50256B. The BuyerID entity 50258 has a cardinality of zero or one 50260B, the type is GDT 50262B, and the name is PartyPartyID 50264B. The VendorID entity 50266B has a cardinality of zero or one 50268B, the type is GDT 50270B, and the name is PartyPartyID 50272B. The Address entity 50274B has a cardinality of zero or one 50276B, the type is GDT 50278B, and the name is Address 50280B.

As depicted in FIG. 502E, the ReturnDeliveryInstructionNotification package 50220 includes a Location package 50282B. The Location package 50282B includes a ShipFromLocation entity 50284B at the third level 50208 with a cardinality of zero or one 50286B, and a type of GDT 50288B, with a name of BusinessTransactionDocumentShipFromLocation 50290B. The ShipFromLocation entity 50284B includes an InternalID entity 50292B, a StandardID entity 50200C, a BuyerID entity 50208C, a VendorID entity 50216C, a Note entity 50224C, and a LoadingLocation entity 50232C at the fourth level 50210. The InternalID entity 50292B has a cardinality of zero or one 50294B, the type is GDT 50296B, and the name is LocationInternalID 50298B. The StandardID entity 50200C may have any number 50202C of StandardID entities 50200C for a ShipFromLocation entity 50284B. The type is GDT 50204C, and the name is LocationStandardID 50206C. The BuyerID entity 50208C has a cardinality of zero or one 50210C, the type is GDT 50212C and the name is LocationPartyID 50214C. The VendorID entity 50216C has a cardinality of zero or one 50218C, the type is GDT 50220C, and the name is LocationPartyID 50222C. The Note entity 50224C has a cardinality of zero or one 50226C, the type is GDT 50228C, and the name is Note 50230C. The LoadingLocation entity 50232C has a cardinality of zero or one 50234C, the type is GDT 50236C, and the name is BusinessTransactionDocumentLocation 50238C.

As depicted in FIG. 502F, the ShipFromLocation 50284B also includes an InternalID 50240C, a StandardID entity 50248C, a BuyerID entity 50256C, and a VendorID entity 50264C at the fifth level. The InternalID entity 50240C has a cardinality of zero or one 50242C, the type is GDT 50244C, and the name is LocationInternalID 50246C. The StandardID entity 50248C may have any number 50250C of StandardID entities 50248C for a ShipFromLocation entity 50284B. The type is GDT 50252C, and the name is LocationStandardID 50254C. The BuyerID entity 50256C has a cardinality of zero or one 50258C, the type is GDT 50260C, and the name is LocationPartyID 50262C. The VendorID entity 50264C has a cardinality of zero or one 50266C, the type is GDT 50268C, and the name is LocationPartyID 50270C. In addition, the ShipFromLocation entity 50284B includes an Address entity 50272C with a cardinality of zero or one 50274C, a data type GDT 50276C, and a name of Address 50278C.

The ReturnDeliveryInstructionNotification package 50220 also includes a ShipToLocation entity 50280C with a cardinality of zero or one 50282C, a data type GDT 50284C, and a name of BusinessTransactionDocumentShipToLocation 50286C. The ShipToLocation entity 50280C includes an InternalID entity 50288C, a StandardID entity 50296C, and a BuyerID entity 50204D. The InternalID entity 50288C has a cardinality of zero or one 50290C, the type is GDT 50292C, and the name is LocationInternalID 50294C. The StandardID entity 50296C may have any number 50298C of StandardID entities 50296Cfor a ShipToLocation entity 50280C. The data type is GDT 50200D and the name is LocationStandardID 50202D. The BuyerID 50204D has a cardinality of zero or one 50206D, the type is GDT 50208D, and the name is LocationPartyID 50210D.

As depicted in FIG. 502G, the ShipToLocation entity 50280C includes a VendorID entity 50212D and a Note entity 50216D. The VendorID entity 50212D has a cardinality of zero or one 50213D, the type is GDT 50214D, and the name is LocationPartyID 5021 SD. the Note entity 50216D has a cardinality of zero or one 50217D, the type is GDT 50218D, and the name is Note 50220D.

The ReturnDeliveryInstructionNotification package 50220 includes an UnloadingLocation entity 50222D at the third level 50208 with a cardinality of zero or one 50224D. The data type is GDT 50226D, and the name is BusinessTransactionDocumentLocation 50228D. The UnloadingLocation entity 50222D includes an InternalID entity 50230D, a StandardID entity 50238D, a BuyerID entity 50246D, and a VendorID 50256D at the fifth level 50212. An Address entity 50264D is included at the fourth level 50210 and a Note entity 50272D is included at the third level 50208. The InternalID entity 50230D has a cardinality of zero or one 50232D, the type is GDT 50234D, and the name is LocationInternalID 50236D. The StandardID entity 50238D may have any number 50240D of StandardID entities 50238D for a UnloadingLocation entity 50222D. The data type is GDT 50242D and the name is LocationStandardID 50244D. The BuyerID entity 50246D has a cardinality of zero or one 50248D, the type is GDT 50250D, and the name is LocationPartyID 50252D. The VendorID entity 50256D has a cardinality of zero or one 50258D, the type is GDT 50260D, and the name is LocationPartyID 50262D. The Address entity 50264D has a cardinality of zero or one 50266D, the type is GDT 50268D, and the name is Address entity 50270D. The Note entity 50272D has a cardinality of zero or one 50274D, the type is GDT 50276D, and the name is Note 50278D.

As depicted in FIG. 502G, the ReturnDeliveryInstruction-Notification package 50220 includes an Item package 50280D. The Item package 50280D includes an Item entity 50282D with any number 50284D of Item entities for an Item package 50280D. The name is ReturnDeliveryInstruction-Item 50286D. The Item entity 50282D includes an ID entity 50288D and a DeliveryTypeCode entity 50296D. The ID entity 50288D has a cardinality of zero or one 50290D, the type is GDT 50292D, and the name is BusinessTransaction-DocumentItemID 50294D. The DeliveryTypeCode entity 50296D has a cardinality of zero or one 50298D, the type is GDT 50200E, and the name is DeliveryTypeCode 50202E.

The ReturnDeliveryInstructionNotification package 50220 also includes a BusinessTransaction DocumentReference package 50204E. The BusinessTransaction DocumentReference package 50204E. The BusinessTransaction DocumentReference package 50204E includes a ReturnAuthorisationRequest Reference entity 50206E with a cardinality of zero or one 50208E, a type of GDT 50210E, and the name BusinessTransactionDocumentReference 50212E. The ReturnAuthorisationRequest Reference entity 50206E includes a ReturnMaterialAuthorisationID entity 50214E with a cardinality of one 50216E, the type is GDT 50218E, and the name is ReturnMaterialAuthorisationID 50220E.

The ReturnDeliveryInstructionNotification package 50220 also includes a Party package CC22E. The Party package 50222E includes a BuyerParty entity 50224E with cardinality of zero or one 50226E, a data type GDT 50228E, and the name BusinessTransactionDocumentParty 50230E. The BuyerParty entity 50224E includes an InternalID entity 50232E and a StandardID entity 50240E. The InternalID entity 50232E has a cardinality of zero or one 50234E, the type is GDT 50236E, and the name is PartyInternalID 50238E. The StandardID entity 50240E may have any number 50242E of StandardID entities 50240E for a BuyerParty entity 50224E. The data type is GDT 50244E and the name is PartyStandardID 50246E.

As depicted in FIG. 502H, the BuyerParty 50224E includes a BuyerID 50248E, a VendorID 502056E, and an Address 50264E. The BuyerID entity 50248E has a cardinality of zero or one 50250E, the type is GDT 50252E, and the name is PartyPartyID 50254E. The VendorID entity 502056E has a cardinality of zero or one 50258E, the type is GDT 50260E and the name is PartyPartyID 50262E. The Address entity 50264E has a cardinality of zero or one 50266E, the type is GDT 50268E, and the name is Address 50270E.

The ReturnDeliveryInstructionNotification package 50220 includes a CarrierParty entity 50272E at the fourth level 50210. The CarrierParty entity 50272E may have any number 50274E of CarrierParty entities 50272E for a ReturnDeliveryInstructionNotification package 50220. The data type is GDT 50276E and the name is BusinessTransaction-DocumentParty 50278E. The CarrierParty 50272E includes an InternalID entity 50280E, a StandardID entity 50288E, a BuyerID entity 50296E, a VendorID entity 50204F, and a Address entity 50212F. The InternalID entity 50280E has a cardinality of zero or one 50282E, the type is GDT 50284E, and the name is PartyInternalID 50286E. The StandardID entity 50288E may have any number 50290E of StandardID entities 50288E for a CarrierParty entity 50272E. The data type is GDT 50292E, and the name is PartyStandardID 50294E. The BuyerID entity 50296E has a cardinality of zero or one 50298E, the type is GDT 50200F, and the name is PartyPartyID 50202F. The VendorID entity 50204F has a cardinality of zero or one 50206F, the type is GDT 50208F, and the name is PartyPartyID 50210F. The Address entity 50212F has a cardinality of zero or one 50214F, the type is GDT 50216F, and the name is Address 50218F.

As depicted in FIG. 5021, the ReturnDeliveryInstruction-Notification package 50220 includes a ProductInformation package 50220F. The ProductInformation package 50220F includes a Product entity 50222F with a cardinality of one 50224F, a data type GDT 50226F, and a name of BusinessTransactionDocumentProduct 50228F. The Product entity 50222F includes an InternalID entity 50230F, a StandardID entity 50238F, a BuyerID entity 50246F, and a VendorID entity 50254F. The InternalID entity 50230F has a cardinality of zero or one 50232F, the type is GDT 50234F, and the name is ProductInternalID 50236F. The StandardID entity 50238F has a cardinality of zero or one 50240F, the type is GDT 50242F, and the name is ProductStandardID 50244F. The BuyerID entity 50246F has a cardinality of zero or one 50248F, the type is GDT 50250F, and the name is ProductPartyID 50252F. The VendorID entity 50254F has a cardinality of zero or one 50256F, the type is GDT 50258F, and the name is ProductPartyID 50260F.

The ReturnDeliveryInstructionNotification package 50220 also includes a Batch package 50262F. The Batch package 50262F includes a Batch entity 50264F with a cardinality of zero or one 50266F. The Batch entity 50264F includes an InternalID entity 50266F, a VendorID entity 50274F, a ProductRecipientID entity 50282F, and a ManufacturingDate entity 50290F. The InternalID entity 50266Fhas a cardinality of zero or one 50268F, the type is GDT 50270F, and the name is BatchID 50272F. The VendorID entity 50274F has a cardinality of zero or one 50276F, the type is GDT 50278F, and the name is BatchID 50280F. The ProductRecipientID entity 50282F has a cardinality of zero or one 50284F, the type is GDT 50286F, and the name is BatchID 50288F. The ManufacturingDate entity 50290F has a cardinality of zero or one 50292F, the type is GDT 50294F, and the name is Date 50296F.

As depicted in FIG. 502J, the Batch entity 50264F also includes a BestBeforeDate entity 50298F and an Origin-CountryCode entity 50206G. The BestBeforeDate entity 50298F has a cardinality of zero or one 50200G, the type is GDT 50202G, and the name is Date 50204G. The Origin-CountryCode entity 50206G has a cardinality of zero or one 50208G, the type is GDT 50210G, and the name is Country-Code 50212G.

The ReturnDeliveryInstructionNotification package 50220 includes a SerialID entity 50214G, a GroupID entity 50200, a DeliveryPeriod entity 50222G, a RequestedQuantity entity 50230G, an ApprovedQuantity entity 50238G, and a Note entity 50246G at the fourth level 50210. The SerialID entity 50214G may have any number 50216G of SerialID entities 50214G for a ReturnDeliveryInstructionNotification package 50220, a data type of GDT 50218G, and a name SerialID 50220G. The GroupID entity 50200 has cardinality of zero or one 50200, the type is GDT 50200, and the name is BusinessTransactionDocumentItemGroupID 50200. The DeliveryPeriod entity 50222G has a cardinality of zero or one 50224G, the type is GDT 50236G, and the name is DateTime-Period 50228G. The RequestedQuantity entity 50230G has a cardinality of zero or one 50232G, the type is GDT 50234G, and the name is Quantity 50236G. The ApprovedQuantity entity 50238G has a cardinality of one 50240G, the type is GDT 50242G, and the name is Quantity 50244G. The Note entity 50246G has a cardinality of zero or one 50248G, the type is GDT 50250G, and the name is Note 50252G.

The ReturnDeliveryInstructionNotification package 50220 also includes a Handling Unit package 50254G. The Unit package 50254G includes a HandlingUnit entity 50256G which may have any number 50258G of HandlingUnit entities 50256G for a Handling Unit package 50254G. The data type is GDT 50260G and the name is HandlingUnit 50262G. The HandlingUnit entity 50256G includes an ID entity 50264G and a LoadCarrier entity 50272G. The ID entity 50264G has a cardinality of one 50255G, a type of GDT 50268G, and the name HandlingUnitID 50270G. The LoadCarrier entity 50272G has a cardinality of one 50274G and a data type of GDT 50276G.

As depicted in FIG. 502K, the LoadCarrier entity 50272G includes a Product entity 50278G with a cardinality of one 50280G and a data type GDT 50282G. The a Product entity 50278G includes an InternalID entity 50284G, a StandardID entity 50292G, a Buyer ID entity 50200H, and a Vendor ID entity 50208H. The InternalID 50284G has a cardinality of zero or one 50286G, the type is GDT 50288G, and the name is ProductInternalID 50290G. The StandardID entity 50292G has a cardinality of zero or one 50294G, the type is GDT 50296G, and the name is ProductStandardID 50298G. The Buyer ID entity 50200H has a cardinality of zero or one 50202H, the type is GDT 50204H, and the name is ProductPartyID 50206H. The Vendor ID entity 50208H has a cardinality of zero or one 50210H, the type is GDT 50212H, and the name is ProductPartyID 50214H.

The ReturnDeliveryInstructionNotification package 50220 also includes a HeightMeasure 50216H, a LengthMeasure entity 50224H, a WidthMeasure entity 50232H, a GrossVolumeMeasure entity 50240H, and a NetVolumeMeasure entity 50248H. The HeightMeasure entity 50216H has a cardinality of zero or one 50218H, the type is GDT 50220H, and the name is Measure 50222H. The LengthMeasure entity 50224H has a cardinality of zero or one 50226H, the type is GDT 50228H, and the name is Measure 50230H. The WidthMeasure 50232H has a cardinality of zero or one 50234H, the type is GDT 50236H, and the name is Measure 50238H. The GrossVolumeMeasure entity 50240H has a cardinality of zero or one 50242H, the type is GDT 50244H, and the name is Measure 50246H. The NetVolumeMeasure entity 50248H has a cardinality of zero or one 50250H, the type is GDT 50252H, and the name is Measure 50254H.

The ReturnDeliveryInstructionNotification package 50220 also includes a GrossWeightMeasure entity 50256H, a NetWeightMeasure 50264H, and a Load 50272H at the fourth level 50210. The GrossWeightMeasure 50256H has a cardinality of zero or one 50258H, the type is GDT 50260H, and the name is Measure 50262H. The NetWeightMeasure entity 50264H has a cardinality of zero or one 50266H, the type is GDT 50268H, and the name is Measure 50270H. The Load entity 50272H may have any number 50274H of Load entities 50272 for a ReturnDeliveryInstructionNotification package 50220. The data type is GDT 50276H. A BusinessTransactionDocumentReference entity 50278H is included at the fifth level 50212 and has a type of GDT 50280H. An Item ID entity 50282H is included at the sixth level and has a cardinality of one 50284H, the type is GDT 50286H, and the name is BusinessTransactionDocumentItemID 50288H.

The Load entity 50272H includes a Quantity entity 50289H and a SerialID entity 50293H at the fifth level 50212. The Quantity entity 50289H has a cardinality of one 50290H, the type is GDT 50291H, and the name is Quantity 50292H. The SerialID entity 50293H has a cardinality of zero or one 50294H, the type is GDT 50295H, and the name is SerialID 50296H.

oo) RFQ Legal Document Interfaces

RFQLegalDocument interfaces can be used to exchange bid invitation data between a purchaser and a document management system in an A2A process and to generate a legal text document (e.g., a form contract). RFQ ("Request for Quotation") is a term ("Ausschreibung" in German) that includes bid invitations and auctions.

Many complex processes can exist that run in distributed system landscapes and that are dependent on information regarding bid invitations. The RFQLegalDocument interface can provide direct integration with a Document Management System (e.g., the application "DocumentBuilder" which can be referred to by "Document Management"). A Document Management System can generate a legal text document with corresponding legal clauses using the business data framework of the bid invitation and send this as an attachment back to a procurement system that is carrying out the bid invitation.

(1) Message Types (a) RFQ Legal Document Request

An RFQLegalDocumentRequest is a request from Purchasing to Document Management to generate a legal text document from a bid invitation. The structure of the message type RFQLegalDocumentRequest can be determined by the message data type RFQLegalDocumentMessage, which contains the object RFQ in the RFQLegalDocument view. An RFQLegalDocumentRequest message can place a bid invitation at the disposal of the Document Management System. In the Document Management System, enhancements can be made and added to an RFQLegalDocumentRequest in the form of attachments. The business document object RFQ (bid invitation) remains unchanged in structure and process ownership can remain in a procurement system.

(b) RFQ Legal Document Notification

An RFQLegalDocumentNotification is a notification from Document Management to Purchasing with a legal text document. The message type RFQLegalDocumentNotification can be determined by the message data type RFQLegalDocumentMessage, which contains the object RFQ in the RFQLegalDocument view. A generated legal text document is transmitted as a structure element LegalDocumentAttachment, while other structure elements of the MDT RFQLegalDocumentMessage are not used.

(2) Message Choreography

In some B2B processes, an initiator is a purchaser who sends a bid invitation. During a period before a submission deadline, information goes back and forth between the bidder and the purchaser. That information concerns the bid, queries, revised bids, possible changes to the bid invitation, and the like. After the submission deadline passes, the purchaser compares bids and decides to accept one, more, or none at all.

With regard to the RFQLegalDocument interfaces described in this document, the scenarios involving an initiative for creation of the legal text document coming from a purchaser can be distinguished. In some scenarios, a legal department is called on in parallel and with manual coordination, to come up with legal wording based on a business data framework of a bid invitation. On agreement, the legal wording (e.g., a contract) is signed and is usually filed as an unstructured text document on a file server. This manual process of coordination between a structured document in the procurement system and a legal text document is being converted to a system-integrated process by means of the messages RFQLegalDocumentRequest 50306 and RFQLegalDocumentNotification 50308.

FIG. 503 shows the message choreography for RFQLegalDocument. The message choreography describes the possible logical sequence of the messages that are necessary to realize the scenario between a Document Management server 50300, a Purchasing server 50302 and a Supplier server 50304.

In the framework of the bid invitation process, purchasing can send the current status of the structured business document at certain times to Document Management using the RFQLegalDocumentRequest 50306. The conditions that trigger sending of the status can be determined by the Document Management user. The Document Management System can create the legal text document from the structured data framework. Thus, Document Management can avail of the predefined contract clauses and text passages in order to make the legal department's internal process more efficient. The resulting legal text document is then returned to Purchasing in the form of an attachment with the RFQLegalDocumentNotification 50308, without changing the structure of the business object RFQ.

Other messages are sent between the Purchasing server 50302 and the Suplier server 50304. An RFQRequest message 50310 is sent from the Purchasing server 50302 to the Supplier server 50304. An RFQRequest is the request from a purchaser to a bidder to participate in a request for quotation for a product. An RFQAcceptanceConfirmation 50312 is sent from the Supplier server 50304 to the Purchasing server 50302. An RFQChangeRequest message 50314 is sent from the Purchasing server 50302 to the Supplier server 50304. An RFQChangeRequest is a change to the purchaser's request for a bidder to participate in the request for quotation for a product. An RFQCancellationRequest message 50316 is sent from the Purchasing server 50302 to the Supplier server 50304. An RFQCancellationRequest is a cancellation by the purchaser of a request for quotation for a product. A QuoteNotification message 50318 is sent from the Supplier server 50304 to the Purchasing server 50302. A QuoteNotification is the quote of a bidder communicated to a purchaser concerning the request for quotation for a product by the purchaser. An RFQResultNotification message 50320 is sent from the Purchasing server 50302 to the Supplier server 50304. An RFQResultNotification is a notification by a purchaser to a bidder about the type and extent of the acceptance of a quote or about the rejection of the quote. An RFQResultAcceptanceConfirmation message 50322 is sent from the Supplier server 50304 to the Purchasing server 50302.

Messages within the bid invitation process can be sent EOIO (exactly once in order) and serialized using message queues. Each purchase order could have its own message queue (as opposed to one queue for all bid invitations) such that one failed message might not block all the other bid invitation messages in the entire system.

To handle errors, for example, to restart a process that is corrupt as a result of a failed message, the bid invitation system should provide an option for transferring the current status of a bid invitation at any time using an RFQ message. At the same time the procurement system should provide a facility to transfer the current status of the preceding document (requirement or purchase contract) with an RFQExecutionRequest message (not shown) with all data. To be able to reset a process following a failed RFQExecutionRequest message, the bid invitation system should at all times be capable of restarting a bid invitation process with an RFQExecutionRequest message.

The RFQLegalDocument message can be implemented in an assignment system using the message RFQLegalDocumentRequest_Out and RFQLegalDocumentNotification_In.

(3) Data Model of the RFQ Legal Document Message

The message data type RFQLegalDocumentMessage groups business information that is relevant for the sending of a business document in a message and the object RFQ contained in the business document in the view required for RFQLegalDocument. As depicted in FIG. 504, the RFQLegalDocumentMessage package 50402 includes a MessageHeader package 50404, an RFQ package 50406 and an RFQLegalDocumentMessage entity 50408.

Elements or entities of the RFQLegalDocumentMessage message data type that might not be used in all message types may include all or fewer of the following: the InternalAttachmentWebAddress entity 50408C and the InternalDescription entity 50410C of the Description package 50438 of the RFQ package 50406, and those entities of the Description package 50416B of the Item package 50440. The message data type RFQLegalDocumentMessage provides the structure for the message types RFQLegalDocumentRequest and RFQLegalDocumentNotification and the relevant interfaces.

(a) MessageHeader Package

A MessageHeader package 50408 groups together the business information that is relevant for sending a business document in a message. It includes a MessageHeader entity 50410. This package is not required and may remain empty.

A MessageHeader entity 50410 groups the business information from the perspective of the sending application to identify the business document in a message, to provide information about the sender, and to provide any information about the recipient. The MessageHeader entity 50410 includes a SenderParty entity 50414 and a RecipientParty entity 50416. There is a 1:c relationship 50418 between the MessageHeader entity 50410 and the SenderParty entity 50414. There is a 1:cn relationship 50420 between the MessageHeader entity 50410 and the RecipientParty entity 50416. The MessageHeader entity 50410 is of type GDT: BusinessDocumentMessageHeader. The MessageHeader entity 50410 can include an ID, a ReferenceID, and a CreationDateTime.

The SenderParty entity 50414 is of type GDT: BusinessDocumentMessageHeader-Party. The SenderParty entity 50414 can be filled by the sending application to name a contact person for any problems with the message. This is particularly useful if an additional infrastructure (such as a marketplace or a tendering platform) is located between the sender and the recipient. The SenderParty entity 50414 is used to transfer the message and can be ignored by the receiving application. It should be filled by the sender particularly if the participating parties are not transferred with the RFQ package 50406.

The RecipientParty entity 50416 is of type GDT: BusinessDocument-MessageHeaderParty. The RecipientParty entity 50416 can be filled by the sending application to name a contact person for any problems that occur with the message. This is particularly useful if an additional infrastructure (such as a marketplace or a tendering platform) is located between the sender and the recipient. The RecipientParty entity 50416 is used to transfer the message and can be ignored by the receiving application. It should be filled by the sender particularly if the participating parties are not transferred with the RFQ package 50406.

(b) RFQ Package

The RFQ package 50406 contains the object in a view required for RFQLegalDocument. In this view, the object RFQ can be structurally identical to a view of the RFQ object used in the message data type RFQMessage with the exception of all or fewer of the variances described below.

The RFQ entity 50414 is of type GDT: RFQInformation and the RFQParty package 50446 may include an optional specification of a BuyerParty 50448. In an RFQAttachment Package 50436, InternalAttachmentWebAddress 50408C is not necessary for a LegalDocument scenario for transmission to Document Management and may, therefore, not be used (e.g., never used if no scenario covers it). Similarly, in the RFQ Description Package 50438, the InternalDescription entity 50412C is not necessary for a LegalDocument scenario for transmission to Document Management and may, therefore, not be used. Also, in the RFQItem Package 50440, in the RFQItemAttachment Package 50414B, the InternalAttachmentWebAddress 50414C is not necessary for the LegalDocument scenario for transmission to Document Management, and need not be used.

In any case, the data model for the RFQLegalDocumentMessage message data type can include an InternalAttachment entity 50408C and LegalDocumentAttachment entity 50410C in the RFQAttachment package 50436. Also, the RFQDescription package 50438 can include an InternalDescription entity 50412C.

Similarly, the RFQItemAttachment package 50414B can include the InternalAttachment entity 50414C and LegalDocumentAttachment entity 50416C. Also, the RFQItemDescription package 50416B can include an InternalDescription entity 50418C.

The RFQ package 50406 includes a Party package 50422, a Location package 50424, a DeliveryInformation package 50426, a PaymentInformation package 50428, a ProductInformation package 50430, a BusinessTransactionDocumentReference package 50432, a FollowUpBusinessTransactionDocument package 50434, an Attachment package 50436, a Description package 50438, and an Item package 50440. The RFQ package 50406 also includes an RFQ entity 50444. There is a 1:1 relationship 50446 between the RFQLegalDocumentMessage entity 50408 and the RFQ entity 50444.

The RFQ entity 50444 is a request (or a change to a request) from a buyer to a bidder to submit a quotation for the products (goods or services) specified in the RFQ. In addition to the buying party and the bidder, additional parties can be involved in the RFQ entity 50444 (see Party package 50422 below). The delivery location can also be specified (see Location package 50424 below). Delivery and payment terms are also agreed upon (see DeliveryInformation package 50426 and PaymentInformation package 50428 below). The RFQ entity 50444 can contain a reference to a Quote if the bidder has a question or if the buyer has changed the RFQ entity 50444 (see BusinessTransactionDocumentReference package 50432 and FollowUpBusinessTransactionDocumentReference package 50434 below). Notes or references to attachments can be specified for the RFQ (see Attachment package 50436 and Description package 50438 below). The RFQ entity 50444 is of type GDT: RFQ.

The RFQ entity 50444 includes an ID, a VersionID, a PostingDateTime, a LastChangeDateTime, a PublishDateTime, a DisplayDateTime, a BiddingStartDateTime, a QuoteSubmissionDateTime, a QuoteOpeningDateTime, a QuoteBindingDateTime, a ContractValidityDateTimePeriod, a Note, an RFQPublicIndicator, a QuoteChangeAllowedIndicator, a QuoteUnplannedItemPermissionCode, a QuotePriceBiddingCondition-Code, a QuoteQuantityBiddingConditionCode, a QuoteItemBiddingConditionCode, RequestedQuoteCurrencyCode, and a ContractTargetAmount. The ID is a unique identifier specified by the buyer for the RFQ. The ID is of type GDT: BusinessTransactionDocumentID. The VersionID is the unique identifier that the buyer assigns to the version of an RFQ. The VersionID is of type GDT: VersionID.

The PostingDateTime is the creation date/time of the RFQ at the buyer. The PostingDateTime is of type GDT: DateTime, as are the following elements in this paragraph. The LastChangeDateTime is the date/time of the last change made to the RFQ by the buyer. The PublishDateTime is the date/time when the RFQ is sent. The DisplayDateTime is the date/time as of which the published RFQ is displayed on a tendering platform. The BiddingStartDateTime is the date/time as of which quotations can be submitted. The QuoteSubmissionDateTime is the date/time after the BiddingStartDateTime up to which quotations can be submitted. The QuoteOpeningDateTime is the date/time when the quotations are opened and displayed for the quotation comparison. The QuoteBindingDateTime is the date/time up to which bidders are bound to the quotations they have submitted.

The ContractValidityDateTimePeriod is the validity period of the contract that is to be assigned using the RFQ. The ContractValidityDateTimePeriod is of type GDT: DateTimePeriod. The Note is a short description or the title of the RFQ. It is generally used to provide the user with a simple method for searching for a particular RFQ. The Note is of type GDT: Note. The RFQPublicIndicator specifies whether the RFQ process is a closed RFQ process with bidders that have been explicitly invited or an open RFQ process in which bidders who have not been explicitly invited can also participate. The RFQPublicIndicator is of type GDT: BusinessTransactionDocumentPublicIndicator. The QuoteChangeAllowedIndicator is indicator that the buyer assigns to an RFQ to indicate whether the bidder may change quotes after they have been issued. In one implementation, "True" means that quotes may be changed and "False" means that only quotes that have not been changed are valid. The QuoteChangeAllowedIndicator is of type GDT: AllowedIndicator. The QuoteUnplannedItem-PermissionCode specifies whether the bidder's quotation is allowed to contain own items with alternative quotations. The QuoteUnplannedItemPermissionCode is of type GDT: UnplannedItemPermissionCode. The QuotePriceBiddingConditionCode specifies whether the bidder is allowed to specify pricing information. If the RFQ is used to check the bidder's ability to meet certain technical requirements, for example, prices might not be required. The QuoteQuantityBiddingConditionCode specifies whether the bidder is allowed to enter in the quotation a quantity other than the requested quantity. The QuoteItemBiddingConditionCode specifies whether the bidder has to submit a quotation for all items. The QuotePriceBidding-ConditionCode and QuoteItemBiddingConditionCode are of type GDT: BiddingConditionCode. The ContractTargetAmount is the target amount in contractual negotiations. The ContractTargetAmount is of type GDT: Amount. The RequestedQuoteCurrencyCode is the currency that the buyer defines in the RFQ. The bidder's quote must be in this currency. The RequestedQuoteCurrencyCode is of type GDT: CurrencyCode.

The ContractTargetAmount in the QuoteNotification is information provided to the buyer by the bidder. The ContractTarget-Amount is used if a contract is to be negotiated and assigned using an RFQ. Differences between the RFQ-ContractTargetAmount and the QuoteContractTargetAmount are allowed and are subject to the business framework of the negotiation process as defined by the buyer and bidder. There are no dependencies between how the ContractTargetAmount is used at header and/or item level. The bidder decides which information to supply to the buyer.

(i) RFQ Party Package

The Party package 50422 groups together the business parties that occur in one of the RFQ messages. The party package 50422 includes a BuyerParty entity 50448, a BidderParty entity 50450, a BidderPortalProviderParty entity 50452, a ProductRecipientParty entity 50454, a VendorParty entity 50456, a ManufacturerParty entity 50458, and a PayerParty entity 50460. There is a respective 1:c relationship 50462, 50464, 50466, 50468, 50470, 50472, and 50474 between the RFQ entity 50444 and the BuyerParty entity 50448, the BidderParty entity 50450, the BidderPortalProviderParty entity 50452, the ProductRecipientParty entity 50454, the VendorParty entity 50456, the ManufacturerParty entity 50458, and the PayerParty entity 50460.

In one implementation, either the ID or the ID and address can be transferred for each party. If the ID is transferred, the ID address defined in the master data is used. If the ID and address are transferred, the ID identifies the party and the address is deemed to be a document address that is different to the master data address. The ID and address may be sent to avoid misunderstandings. The receiving application may implement a suitable optimization strategy to ensure that the system does not create many identical document addresses.

A default logic is used for the parties: from the header to the items and within item hierarchies. Parties specified in the header are used for the items for which a corresponding party is not explicitly transferred and that are directly assigned to the header. In accordance with the same logic, parties transferred at item level are used for subitems assigned to the relevant item in an item hierarchy. The default logic is used for the party as a whole, including the contact person. In one implementation, parts of a party specified at header level or for a hierarchy item cannot be specified in more detail at item level. The default logic may be a simplified version of the transferred message. As regards logic, parties at header level and for hierarchy items behave as if they have been explicitly transferred for the subitems of the message. This also means that if changed items are transmitted rather than all items, the parties are used for the transmitted items. Changes made to parties also apply to items relevant for the party in question.

A BuyerParty is a party that buys goods or services. The BuyerParty entity 50448 is of type GDT: BusinessTransactionParty. The same BuyerParty entity 50448 is used for all the items in an RFQ in one implementation. The BuyerParty is not changed once an RFQ has been created. Changes can be made to the BuyerParty/Contact entity and a different BuyerParty/Contact entity is permitted for each item. Changes can be made to the address of the BuyerParty, but different addresses are not permitted for each item. If a ProductRecipientParty is not explicitly specified in an RFQ process, the BuyerParty is also used as the ProductRecipientParty. If a ProductRecipientParty and ShipToLocation are not explicitly specified in the RFQ process, the BuyerParty address is also used as the ship-to address. If a PayerParty is not explicitly specified in an RFQ process, the BuyerParty is also used as the PayerParty.

The BuyerParty entity 50448 includes an Address entity 50476 and a Contact entity 50478. There is a 1:c relationship 50480 between the BuyerParty entity 50448 and the Address entity 50476, and there a 1:c relationship 50482 between the BuyerParty entity 50448 and Contact entities 50478. The Address entity 50476 includes a PersonName entity 50484, an Office entity 50486, a PhysicalAddress entity 50488, a GeoCoordinates entity 50490 and a Communication entity 50492. There is a respective 1:c relationship 50494, 50496, 50498, 50400A, and 50402A between the Address entity 50476 and the PersonName entity 50484, the Office entity 50486, the PhysicalAddress entity 50488, the GeoCoordinates entity 50490 and the Communication entity 50492.

The Contact entity 50478 includes an Address entity 50404A. There is a 1:c relationship 50405A between the Contact entity 50478 and the Address entity 50404A. The Address entity 50404A includes a PersonName entity 50406A, an Office entity 50408A, a PhysicalAddress entity 50410A, a GeoCoordinates entity 50412A, and a Communication entity 50414A. There is a respective 1:c relationship 50416A, 50418A, 50420A, 50422A, and 50424A between the Address entity 50404A and the PersonName entity 50406A, the Office entity 50408A, the PhysicalAddress entity 50410A, the GeoCoordinates entity 50412A, and the Communication entity 50414A.

The BidderParty is a party that bids for goods or services. The BidderParty entity 50450 is of type GDT: BusinessTransactionDocumentParty. The same BidderParty entity 50450 may be used for all the items in an RFQ. The BidderParty entity 50450 is not changed once an RFQ has been created. Changes can be made to the BidderParty/Contact entity and a different BidderParty/Contact entity is permitted for each item. Changes can be made to the address of the BidderParty, but different addresses are not permitted for each item. If a VendorParty is not explicitly specified in an RFQ process, the BidderParty is also used as the VendorParty. If a VendorParty and ShipFromLocation are not explicitly specified in an RFQ process, the address of the BidderParty is used as the ship-from address for the material items. The BidderParty entity 50450 includes the same elements as that described above for the BuyerParty entity 50448, as denoted by ellipses 50426A.

A BidderPortalProviderParty is a party that runs a portal that brings business partners together for a business transaction. The BidderPortalProviderParty entity 50452 is of type GDT: BusinessTransactionDocumentParty. The BidderPortalProviderParty entity 50452 is explicitly specified if an RFQ is to be sent to a public tendering platform. The BidderPortalProviderParty entity 50452 includes the same elements as that described above for the BuyerParty entity 50448, as denoted by ellipses 50428A.

The ProductRecipientParty is the party to which goods are delivered or for whom services are provided. The ProductRecipientParty entity 50454 is of type GDT: BusinessTransactionDocumentParty. If a ShipToLocation is not explicitly specified in an RFQ process, the ProductRecipientParty entity 50454 address is used as the ship-to address. The ProductRecipientParty is not synonymous with the ShipToLocation and should be used when the ProductRecipientParty (company or person) is different than the BuyerParty. The ProductRecipientParty entity 50454 includes the same elements as that described above for the BuyerParty entity 50448, as denoted by ellipses 50430A.

A VendorParty is a party that delivers goods or provides services. The VendorParty entity 50456 is of type GDT: BusinessTransactionDocumentParty. If a ShipFromLocation is not explicitly specified in an RFQ process, the address of the VendorParty entity 50456 is used as the ship-from address for the material items. The VendorParty entity 50456 is not the company or person that is responsible for transporting the goods. The CarrierParty entity is responsible for this; however, this party is not typically used in the RFQ interfaces. The VendorParty is not synonymous with the ShipFromLocation and should be used when the VendorParty (company or person) is actually different than the BidderParty. The VendorParty entity 50456 includes the same elements as that described above for the BuyerParty entity 50448, as denoted by ellipses 50432A.

A ManufacturerParty is a party that manufactures goods. The ManufacturerParty entity 50458 is of type GDT: BusinessTransactionDocumentParty. The ManufacturerParty entity 50458 can be used for material items. With regard to the ManufacturerParty entity 50458, the default logic (from header to item to subitems) is used for material items; for other items, the ManufacturerParty entity 50458 is ignored. The ManufacturerParty entity 50458 can be used to uniquely define the context of a ManufacturerProductID entity. The ManufacturerParty entity 50458 includes the same elements as that described above for the BuyerParty entity 50448, as denoted by ellipses 50434A.

A PayerParty is a party that pays for goods or services. The PayerParty entity 50460 is of type GDT: BusinessTransactionDocumentParty. The PayerParty is used for the ContractPayer. The ContractPayer is the party paying for contractual negotiations. The PayerParty entity 50460 includes the same elements as that described above for the BuyerParty entity 50448, as denoted by ellipses 50436A.

(ii) RFQ Location Package

A Location package 50424 groups together the locations that can occur in one of the RFQ messages. The Location package 50424 includes a ShipToLocation entity 50438A. There is a 1:c relationship 50440A between the RFQ entity 50444 and the ShipToLocation entity 50438A. The ShipToLocation entity 50438A includes an Address entity 50442A. There is a 1:c relationship 50444A between the ShipToLocation entity 50438A and the Address entity 50442A.

A similar default logic to that used for Parties is also used for locations. In one implementation, either the ID or the address, or both can be transferred to each location. If the ID is transferred, the ID address defined in the master data is used. If the address is transferred, it is this address that is used (if necessary, a location is assigned at the address recipient). If the ID and address are transferred, the ID identifies the location and the address is deemed to be a document address that is different to the master data address. The ID and address may be sent to avoid misunderstandings. The receiving application should implement a suitable optimization strategy to ensure that the system does not create many identical document addresses.

The ShipToLocation is the location to which goods are to be delivered or where services are to be provided. The ShipToLocation entity 50438A is of type GDT: BusinessTransaction-DocumentLocation.

The Address entity 50442A includes a PersonName entity 50446A, an Office entity 50448A, a PhysicalAddress entity 50450A, a GeoCoordinates entity 50452A, and a Communication entity 50454A. There is a respective 1:c relationship 50456A, 50458A, 50460A, 50462A, and 50464A between the Address entity 50442A and the PersonName entity 50446A, the Office entity 50448A, the PhysicalAddress entity 50450A, the GeoCoordinates entity 50452A, and the Communication entity 50454A.

(iii) RFQ Delivery Information Package

A DeliveryInformation package 50426 groups together the information about a required delivery in an RFQ process. The DeliveryInformation package 50426 includes a DeliveryTerms entity 50466A. There is a 1:c relationship 50468A between the RFQ entity 50444 and the DeliveryTerms entity 50466A.

The DeliveryTerms is the condition and agreement that is valid for executing the delivery and transporting the tendered goods and for the necessary services and activities. The DeliveryTerms entity 50466A is type GDT: DeliveryTerms. It includes an Incoterms entity 50470A. There is a 1:c relationship 50472A between the DeliveryTerrns entity 50466A and the Incoterms entity 50470A. The Incoterms is allowed to be used for material items. The default logic takes the Incoterms entity into account for material items. For other items, Incoterms may be ignored.

(iv) RFQ Payment Information Package

A PaymentInformation package 50428 groups together the payment information in an RFQ process. The PaymentInformation package 50428 includes a CashDiscountTerms entity 50474A and a PaymentForm entity 50476A. There is a 1:c relationship 50478A between the RFQ entity 50444 and the CashDiscountTerms entity 50474A, and a 1:c relationship 50480A between the RFQ entity 50444 and the PaymentForm entity 50476A.

The CashDiscountTerms is the term of payment in an RFQ process. The CashDiscountTerms entity 50474A is type GDT: CashDiscountTerms.

A PaymentForm is the payment form together with the data required. The PaymentForm entity 50476A includes a PaymentFormCode, which is the coded representation of the payment form. The PaymentFormCode is of type GDT: PaymentFormCode.

(v) RFQ Product Information Package

The ProductInformation package 50430 groups together the product category. The ProductInformation package 50430 includes a ProductCategory entity 50482A. There is a 1:c relationship 50484A between the RFQ entity 50444 and the ProductCategory entity 50482A.

The ProductCategory includes the details about a product category as generally understood from a commercial point of view in business transaction documents. The ProductCategory entity 50482A includes details for identifying the product category using an internal ID, a standard ID, and IDs assigned by involved parties. The ProductCategory entity 50482A is of type GDT: BusinessTransactionDocument-ProductCategory. The product category at header level can be used to classify the RFQ and provide the bidders with an initial indication of what is involved in the RFQ. The product category can differ between the buyer and seller.

(vi) RFQ Business Transaction Document Reference Package

The BusinessTransactionDocumentReference package 50432 groups together business document references that can occur in one of the RFQ messages. The BusinessTransactionDocumentReference package 50432 includes a QuoteReference entity 50486A. There is a 1:c relationship 50488A between the RFQ entity 50444 and the QuoteReference entity 50486A.

A QuoteReference is a reference to a quotation. The QuoteReference entity 50486A is of type GDT: BusinessTransactionDocument-Reference.

In one implementation, a QuoteReference can reference one quotation, that is, one ID is permissible. As far as the referenced quotation is concerned, there are no conflicts with a QuoteReference at item level. If a reference is used at both header and item level, it refers to one (the same) quotation.

The reference to a quotation is required at both header and item level, since RFQs do not always have item data. The QuoteReference is used when questions and answers are exchanged between the bidder and buyer and if the RFQ is changed.

(vii) RFQ Follow-Up Business Transaction Document Package

A FollowUpBusinessTransactionDocument package 50434 groups together the information about which business transaction documents the buyer is expecting as a result of the RFQ process. The FollowUpBusinessTransactionDocument entity 50434 includes a FollowUpPurchaseOrder entity 50490A and a FollowUpPurchaseContract entity 50492A. There is a 1:c relationship 50494A between the RFQ entity 50444 and the FollowUpPurchaseOrder entity 50490A, and a 1:c relationship 50496A between the RFQ entity 50444 and the FollowUpPurchaseContract entity 50492A. In the FollowUpBusinessTransactionDocument package 50434, the buyer provides the bidders with information about whether the RFQ is to result in a contract or a purchase order. However, the buyer can also leave this open by not providing any information.

The FollowUpPurchaseOrder provides information about whether the buyer expects a purchase order as a result of the RFQ process. The FollowUpPurchaseOrder entity 50490A includes a RequirementCode, which is a coded representation of information about whether the buyer expects a purchase order as a result of the RFQ process. The RequirementCode is of type GDT: FollowUpBusinessTransaction-DocumentRequirementCode. The RequirementCode entity can be changed by the buyer.

The FollowUpPurchaseContract provides information about whether the buyer expects a contract as the result of the RFQ process. The FollowUpPurchaseContract entity 50492A includes a RequirementCode, which is a coded representation of information about whether the buyer expects a contract as a result of the RFQ process. The RequirementCode is of type GDT: FollowUpBusinessTransaction-DocumentRequirementCode. The RequirementCode can be changed by the buyer.

(viii) RFQ Attachment Package

The Attachment package 50436 groups together the attachment information regarding the RFQ. The Attachment package 50436 includes an Attachment entity 50498A. The Attachment is any document that refers to the RFQ. The Attachment entity 50498A is of type GDT: Attachment. There is a 1:c relationship 50400B between the RFQ entity 50444 and the Attachment entity 50498A.

(ix) RFQ Description Package

The Description package 50438 groups together the texts regarding the RFQ. The Description package 50438 includes a Description entity 50402B. The Description is a natural-language text regarding the RFQ, which is visible to parties. The Description entity 50402B is of type GDT: Description. There is a 1:c relationship 50403B between the RFQ entity 50444 and the Description entity 50402B.

The Description can be used for textual information about the transferred RFQ and not just the current message. An example of this would be information stating that the employee responsible in Purchasing will be on vacation as of a specific date, and indicating the name and telephone number of a substitute as of this date. The Description can also be used for communication between the buyer and bidder in order to process queries, for example. In the case of a public tendering platform, measures are taken to ensure that individual communications with individual bidders, which contain explanatory information about the RFQ, are also made available to other RFQ participants. This is ensured by sending a copy of the description to the tendering platform, where it is published.

(x) RFQ Item Package

An RFQItem package 50440 includes a ProductInformation package 50404B, a Party package 50406B, a Location package 50408B, a DeliveryInformation package 50410B, a BusinessTransactionDocumentReference package 50412B, an Attachment package 50414B, a Description package 50416B, and a ScheduleLine package 50418B. The Item package 50440 also includes an RFQItem entity 50420B. There is a 1:cn relationship 50422B between the RFQ entity 50444 and the RFQItem entity 50420B. RFQItem entities are arranged hierarchically using a Hierarchy Relationship 50424B. The Hierarchy Relationship 50424B is the relationship between a sub-item and a higher-level parent item in an item hierarchy. There is a 1:cn relationship 50426B between the RFQItem entity 50420B and its subordinate entities, and there is a 1:c relationship 50428B between the RFQItem entity 50420B and its superordinate entities.

The RFQItem specifies a product tendered by an RFQ with additional information on such a product. The RFQItem entity 50420B includes detailed information about a particular product (see ProductInformation package 50404B). The quantity of the product and (delivery) dates/times are specified in the schedule line. For the RFQItem (compared to the information of the RFQ), deviating parties, locations, and delivery terms can be defined (see Party package 50406B, Location package 50408B, and DeliveryInformation package 50410B). The RFQItem can contain references to other business documents that are relevant for the item (see BusinessTransactionDocumentReference package 50412B). Notes or references to attachments can also be specified for the RFQItem (see Attachment package 50414B and Description package 50416B). The RFQItem entity 50420B is of type GDT: RFQItem.

The RFQItem entity 50420B includes an ID and a ContractTargetAmount. The ID is a unique identifier specified by the buyer for an item within an RFQ. The ID is of type GDT: BusinessTransactionDocumentItemID. The ContractTargetAmount is the target amount in contractual negotiations. The ContractTargetAmount is of type GDT: Amount.

A HierarchyRelationship 50424B includes a ParentItemBuyerID, a ParentItemVendorID, and a TypeCode. The ParentItemBuyerID is the reference to a parent item with the item number assigned by the buyer. The ParentItemBuyerID is of type GDT: BusinessTransactionDocumentItemID. The ParentItemVendorID is the reference to a parent item with the item number assigned by the seller. The ParentItemVendorID is of type GDT: BusinessTransactionDocumentItemID. The TypeCode represents the hierarchical relationship between the subitem and its higher-level parent item. The TypeCode is of type GDT: BusinessTransactionDocument-ItemHierarchyRelationshipTypeCode. The ParentItemBuyerID, ParentItemVendorID and TypeCode are generally not changed once an item has been created. Either the ParentItemBuyerID or the ParentItemVendorID is specified.

(a) RFQ Item Product Information Package

A ProductInformation package 50404B groups together the product and the product category. The ProductInformation package 50404B includes a Product entity 50430B and a ProductCategory entity 50432B. There is a 1:c relationship 50434B between the Item entity 50420B and the Product entity 50430B, and a 1:c relationship 50436B between the Item entity 50420B and the ProductCategory entity 50432B.

A Product includes the details about a product as generally understood from a commercial point of view in business documents. These are the details for identifying a product and product type, and the description of the product. The Product entity 50430B is of type GDT: BusinessTransactionDocumentProduct.

A ProductCategory includes the details about a product category as generally understood from a commercial point of view in business transaction documents. The ProductCategory entity 50432B includes details for identifying the product category using an internal ID, a standard ID, and IDs assigned by involved parties. The ProductCategory entity 50432B is of type GDT: BusinessTransaction-DocumentProductCategory. The product category is derived directly from the product if a product number is specified for the product. It can differ for the buyer and seller if they have classified the same product differently. This is allowed and should be tolerated by the systems involved. The product category at item level can differ from the product category at header level.

(b) RFQ Item Party Package

The Party package 50406B groups together the business parties that can occur in one of the RFQ messages at the item level and represents part of the Party package 50422 at the header level. The party package 50406B includes a Buyer- Party entity 50438B, a BidderParty entity 50440B, a ProductRecipientParty entity 50442B, a VendorParty entity 50444B, and a ManufacturerParty entity 50446B. There is a respective 1:c relationship 50448B, 50450B, 50452B, 50454B, and 50456B between the Item entity 50420B and the BuyerParty entity 50438B, the BidderParty entity 50440B, the ProductRecipientParty entity 50442B, the VendorParty entity 50444B, and the ManufacturerParty entity 50446B. Each of the BuyerParty entity 50438B, the BidderParty entity 50440B, the ProductRecipientParty entity 50442B, the VendorParty entity 50444B, and the ManufacturerParty entity 50446B includes the same elements as that described above for the BuyerParty entity 50448 as denoted by ellipses 50458B, 50460B, 50462B, 50464B, and 50466B.

(c) RFQ Item Location Package

Similar to the Location package 50424 at the header level, the Location package 50408B at the item level includes a ShipToLocation entity 50468B. There is a 1:c relationship 50470B between the Item entity 50420B and the ShipToLocation entity 50468B. The ShipToLocation entity 50468B includes the same elements as that described above for the ShipToLocation entity 50438A as denoted by ellipses 50472B.

(d) RFQ Item Delivery Information Package

Similar to the DeliveryInformation package 50426 at the header level, the DeliveryTerms package 50410B at the item level includes a DeliveryTerms entity 50474B. There is a 1:c relationship 50476B between the Item entity 50420B and the DeliveryTerms entity 50474B. The DeliveryTerms contains a MaximumLeadTimeDuration, which is the maximum lead time from the time of the order to the receipt of the delivery. This duration can be agreed in RFQs or contractual negotiations and represents the basis (that is binding) for the calculation of the received delivery date for an order date. The MaximumLeadTimeDuration is of type GDT: Duration.

The DeliveryTerms entity 50474B includes an Incoterms entity 50478B. There is a 1:c relationship 50480B between the DeliveryTerms entity 50474B and the Incoterms entity 50478B.

(e) RFQ Item Business Transaction Document Reference Package

The BusinessTransactionDocumentReference package 50412B groups together the business document references that can occur in one of the RFQ messages. The BusinessTransaction-DocumentReference package 50412B includes a QuoteReference entity 50482B, a PurchaseContractReference entity 50484B, and a BuyerProductCatalogueReference entity 50486B. There is a respective 1:c relationship 50488B, 50490B, and 50492B between the Item entity 50420B and the QuoteReference entity 50482B, the PurchaseContractReference entity 50484B, and the BuyerProductCatalogueReference entity 50486B.

A QuoteReference is a reference to the quotation or the item within the quotation. The QuoteReference entity 50482B is of type GDT: BusinessTransactionDocumentReference. In one implementation, a QuoteReference entity 50482B can reference one item, that is, one ItemID is permissible. As far as the referenced quotation is concerned, there are no conflicts with a QuoteReference entity 50486A at the header level. If a quotation reference is maintained at both the header and item levels, it refers to one (the same) quotation.

The PurchaseContractReference is a reference to a purchase contract or item in a purchase contract. The PurchaseContractReference entity 50484B is of type GDT: BusinessTransaction-DocumentReference. In one implementation, a PurchaseContractReference entity 50484B can reference one item, that is, one ItemID is permissible. Unless otherwise agreed, the seller is responsible for determining the correct PurchaseContractReference for a specified SellerContractReference.

A BuyerProductCatalogueReference is a reference to the buyer's product catalog or an item within the buyer's product catalog. The BuyerProductCatalogueReference entity 50486B is of type GDT: CatalogueReference. In one implementation, a BuyerProductCatalogueReference entity 50486B can reference one item, that is, one ItemID is permissible. The BuyerProductCatalogueReference entity 50486B should be filled if an RFQItem entity 50420B refers to a catalog whose number and item numbers were assigned by the buyer. In the RFQ process, the BuyerProductCatalogueReference entity 50486B can be used as a substitute product number if the product is defined in a catalog rather than having its own master record.

(f) RFQ Item Attachment Package

The RFQItemAttachment package 50414B includes an Attachment entity 50494B. There is a 1:c relationship 50496B between the Item entity 50420B and the Attachment entity 50494B.

(g) RFQ Item Description Package

The RFQItemDescription package 50416B includes a Description entity 50498B. There is a 1:c relationship 50400C between the Item entity 50420B and the Description entity 50498B.

(h) RFQ Item Schedule Line Package

The ScheduleLine package 50418B groups together the quantity and date information about an RFQItem. The ScheduleLine package 50418B includes a ScheduleLine entity 50402C. There is a 1:c relationship 50404C between the Item entity 50420B and the ScheduleLine entity 50402C.

A ScheduleLine is a line containing the quantity and date of the performance schedule requested by the buyer in an RFQ. The ScheduleLine entity 50402C is of type GDT: RFQItemScheduleLine. The ScheduleLine entity 50402C includes a DeliveryPeriod entity 50406C. There is a 1:1 relationship 50408C between the ScheduleLine entity 50402C and the DeliveryPeriod entity 50406C.

The ScheduleLine entity 50402C includes an ID, a DeliveryPeriod, and a Quantity. The ID is the ScheduleLine number assigned by the procurement system. The ID is of type GDT: BusinessTransactionDocumentItemScheduleLineID. The DeliveryPeriod is the period in which the buyer expects a product to be delivered or service provided. The DeliveryPeriod is of type GDT: DateTimePeriod. The Quantity is the RFQ quantity or the target quantity in contractual negotiations. The Quantity is of type GDT: Quantity.

In one implementation, one ScheduleLine is allowed for each RFQ item. When used more than once, the information in the ScheduleLine and DeliveryInformation is consistent (for example, if used twice, the delivery date is identical in both cases). The ID is optional; a procurement system does not have to number the ScheduleLine entities.

(4) Element Structure of the RFQ Legal Document Message

The message data type element structure for the RFQ Legal Document message is depicted in FIG. 505A. The element structure is similar to the data model, but provides additional information regarding the details of the interface. The element structure identifies the different packages 50500 in the interface, and represents the entities at various levels within the interface. As depicted in FIG. 505A, the interface for RFQLegalDocumentMessage includes five levels 50502D, 50504D, 50506D, 50508D, and 50510D. The outermost package of this interface is a RFQLegalDocumentMessage package 50500, which includes an RFQLegalDocumentMessage entity 50501 at the first level 50502D. The RFQLegalDocumentMessage entity 50501 is of a type MDT 50502 "RFQLegalDocumentMessage" 50503.

The RFQLegalDocumentMessage package 50500 includes an RFQ package 50504. The RFQ package 50504 includes an RFQ entity 50505 at the second level 50504D, a Party package 50577, a Location package 50530A, a DeliveryInformation package 50547A, a PaymentInformation package 50556A, a ProductInformation package 50577A, a FollowUpBusinessTransactionDocument package 50590A, an Attachment package 50503B, a Description package 50516B, and an Item package 50525B. The RFQ entity 50505 is of a type AGDT 50507 "RFQInformation" 50508. There is one 50506 RFQ entity 50505 for each RFQ package 50504. The RFQ entity 50505 includes an ID entity 50509, a PostingDateTime entity 50513, a LastChangeDateTime entity 50517, a PublishDateTime entity 50521, a DisplayDateTime entity 50525, a BiddingStartDateTime entity 50529, a QuoteSubmissionDateTime entity 50533, a QuoteOpeningDateTime entity 50537, a QuoteBindingDateTime entity 50541, a ContractValidityPeriod entity 50545, a Note entity 50549, an RFQPublicIndicator entity 50553, a QuoteUnplannedItemPermissionCode entity 50557, a QuotePriceBiddingConditionCode entity 50561, a QuoteQuantityBiddingConditionCode entity 50565, a QuoteItemBiddingConditionCode entity 50569, and a ContractTargetAmount entity 50573 at the third level 50506D.

The ID entity 50509 is of a type GDT 50511 "BusinessTransactionDocumentID" 50512. There is one 50510 ID entity 50509 for an RFQ entity 50505. The PostingDateTime entity 50513 is of a type GDT 50515 "DateTime" 50516. There is zero or one 50514 PostingDateTime entity 50513 for an RFQ entity 50505. The LastChangeDateTime entity 50517 is of a type GDT 50519 "DateTime" 50520. There is zero or one 50518 LastChangeDateTime entity 50517 for an RFQ entity 50505. The PublishDateTime entity 50521 is of a type GDT 50523 "DateTime" 50524. There is zero or one 50522 PublishDateTime entity 50521 for an RFQ entity 50505. The DisplayDateTime entity 50525 is of a type GDT 50527 "DateTime" 50528. There is zero or one 50526 DisplayDateTime entity 50525 for an RFQ entity 50505. The BiddingStartDateTime entity 50529 is of a type GDT 50531 "DateTime" 50532. There is zero or one 50530 BiddingStartDateTime entity 50529 for an RFQ entity 50505. The QuoteSubmissionDateTime entity 50533 is of a type GDT 50535 "DateTime" 50536. There is zero or one 50534 QuoteSubmissionDateTime entity 50533 for an RFQ entity 50505. The QuoteOpeningDateTime entity 50537 is of a type GDT 50539 "DateTime" 50540. There is zero or one 50538 QuoteOpeningDateTime entity 50537 for an RFQ entity 50505. The QuoteBindingDateTime entity 50541 is of a type GDT 50543 "DateTime" 50544. There is zero or one 50542 QuoteBindingDateTime entity 50541 for an RFQ entity 50505. The ContractValidityPeriod entity 50545 is of a type GDT 50547 "DateTimePeriod" 50548. There is zero or one 50546 ContractValidityPeriod entity 50545 for an RFQ entity 50505. The Note entity 50549 is of a type GDT 50551 "Note" 50552. There is zero or one 50550 Note entity 50549 for an RFQ entity 50505. The RFQPublicIndicator entity 50553 is of a type GDT 50555 "BusinessTransactionDocumentPublicIndicator" 50556. There is zero or one 50554 RFQPublicIndicator entity 50553 for an RFQ entity 50505. The QuoteUnplannedItemPermissionCode entity 50557 is of a type GDT 50559 "UnplannedItemPermissionCode" 50560. There is zero or one 50558 QuoteUnplannedItemPermissionCode entity 50557 for an RFQ entity 50505. The QuotePriceBiddingConditionCode entity 50561 is of a type GDT 50563 "BiddingConditionCode" 50564. There is zero or one 50562 QuotePriceBiddingConditionCode entity 50561 for an RFQ entity 50505. The QuoteQuantityBiddingConditionCode entity 50565 is of a type GDT 50567 "BiddingConditionCode" 50568. There is zero or one 50566 QuoteQuantityBiddingConditionCode entity 50565 for an RFQ entity 50505. The QuoteItemBiddingConditionCode entity 50569 is of a type GDT 50571 "BiddingConditionCode" 50572. There is zero or one 50570 QuoteItemBiddingConditionCode entity 50569 for an RFQ entity 50505. The ContractTargetAmount entity 50573 is of a type GDT 50575 "Amount" 50576. There is zero or one 50574 ContractTargetAmount entity 50573 for an RFQ entity 50505.

The Party package 50577 includes a BuyerParty entity 50578, a BidderParty entity 50506A, a BidderPortalProviderParty entity 50510A, a ProductRecipientParty entity 50514A, a VendorParty entity 50518A, a ManufacturerParty entity 50522A, and a PayerParty entity 50526A at the third level 50506D. The BuyerParty entity 50578 is of a type AGDT 50580 "BusinessTransactionDocumentParty" 50581. There is zero or one 50579 BuyerParty entity 50578 for each Party package 50577. The BuyerParty entity 50578 includes a StandardID entity 50582, an InternalID entity 50586, an Address entity 50590, and a ContactPerson entity 50594 at the fourth level 50508D. The StandardID entity 50582 is of a type CDT 50584 "PartyStandardID" 50585. There is any number of 50583 StandardID entity 50582 for a BuyerParty entity 50578. The InternalID entity 50586 is of a type CDT 50588 "PartyInternalID" 50589. There is zero or one 50587 InternalID entity 50586 for a BuyerParty entity 50578. The Address entity 50590 is of a type AGDT 50592 "Address" 50593. There is zero or one 50591 Address entity 50590 for a BuyerParty entity 50578.

The ContactPerson entity 50594 is of a type AGDT 50596 "ContactPerson" 50597. There is zero or one 50595 ContactPerson entity 50594 for a BuyerParty entity 50578. The ContactPerson entity 50594 includes an InternalID entity 50598 and an Address entity 50502A at the fifth level 50510D. The InternalID entity 50598 is of a type CDT 50500A "ContactPersonID" 50501A. There is zero or one 50599 InternalID entity 50598 for a ContactPerson entity 50594. The Address entity 50502A is of a type AGDT 50504A "Address" 50505A. There is zero or one 50503A Address entity 50502A for a ContactPerson entity 50594.

The BidderParty entity 50506A is of a type AGDT 50508A "BusinessTransactionDocumentParty" 50509A. There is zero or one 50507A BidderParty entity 50506A for each Party package 50577. The BidderPortalProviderParty entity 50510A is of a type AGDT 50512A "BusinessTransactionDocumentParty" 50513A. There is zero or one 50511 A BidderPortalProviderParty entity 50510A for each Party package 50577. The ProductRecipientParty entity 50514A is of a type AGDT 50516A "BusinessTransactionDocumentParty" 50517A. There is zero or one 50515A ProductRecipientParty entity 50514A for each Party package 50577. The VendorParty entity 50518A is of a type AGDT 50520A "BusinessTransactionDocumentParty" 50521A. There is zero or one 50519A VendorParty entity 50518A for each Party package 50577. The ManufacturerParty entity 50522A is of a type AGDT 50524A "BusinessTransactionDocumentParty" 50525A. There is zero or one 50523A ManufacturerParty entity 50522A for each Party package 50577. The PayerParty entity 50526A is of a type AGDT 50528A "BusinessTransactionDocumentParty" 50529A. There is zero or one 50527A PayerParty entity 50526A for each Party package 50577.

The Location package 50530A includes a ShipToLocation entity 5053 1A at the third level 50506D. The ShipToLocation entity 50531A is of a type AGDT 50533A "BusinessTransactionDocumentLocation" 50534A. There is zero or one 50532A ShipToLocation entity 50531A for each Location package 50530A. The ShipToLocation entity 5053 1A includes a StandardID entity 50535A, an InternalID entity 50539A, and an Address entity 50543A at the fourth level 50508D. The StandardID entity 50535A is of a type CDT 50537A "LocationStandardID" 50538A. There is any number of 50536A StandardID entity 50535A for a ShipToLocation entity 50531A. The InternalID entity 50539A is of a type CDT 50541A "LocationInternalID" 50542A. There is zero or one 50540A InternalID entity 50539A for a ShipToLocation entity 50531A. The Address entity 50543A is of a type AGDT 50545A "Address" 50546A. There is zero or one 50544A Address entity 50543A for a ShipToLocation entity 50531A.

The DeliveryInformation package 50547A includes a DeliveryTerms entity 50548A at the third level 50506D. The DeliveryTerms entity 50548A is of a type AGDT 50550A "DeliveryTerms" 50551A. There is zero or one 50549A DeliveryTerms entity 50548A for each DeliveryInformation package 50547A. The DeliveryTerms entity 50548A includes an Incoterms entity 50552A at the fourth level 50508D. The Incoterms entity 50552A is of a type GDT 50554A "Incoterms" 50555A. There is zero or one 50553A Incoterms entity 50552A for a DeliveryTerms entity 50548A.

The PaymentInformation package 50556A includes a CashDiscountTerms entity 50557A and a PaymentForm entity 50571A at the third level 50506D. The CashDiscountTerms entity 50557A is of a type AGDT 50559A "CashDiscountTerms" 50560A. There is zero or one 50558A CashDiscountTerms entity 50557A for each PaymentInformation package 50556A. The CashDiscountTerms entity 50557A includes a MaximumCashDiscount entity 50561A, a NormalCashDiscount entity 50565A, and a FullPaymentDueDaysValue entity 50569A at the fourth level 50508D. The MaximumCashDiscount entity 50561A is of a type GDT 50563A "CashDiscount" 50564A. There is zero or one 50562A MaximumCashDiscount entity 50561A for a CashDiscountTerms entity 50557A. The NormalCashDiscount entity 50565A is of a type GDT 50567A "CashDiscount" 50568A. There is zero or one 50566A NormalCashDiscount entity 50565A for a CashDiscountTerms entity 50557A. There is zero or one 50570A FullPaymentDueDaysValue entity 50569A for a CashDiscountTerms entity 50557A.

The PaymentForm entity 50571A includes a Code entity 50573A at the fourth level 50508D. There is zero or one 50572A PaymentForm entity 50571A for each PaymentInformation package 50556A. The Code entity 50573A is of a type GDT 50575A "PaymentFormCode" 50576A. There is one 50574A Code entity 50573A for a PaymentForm entity 50571A.

The ProductInformation package 50577A includes a ProductCategory entity 50578A at the third level 50506D. The ProductCategory entity 50578A is of a type GDT 50580A "BusinessTransactionDocumentProductCategory" 50581A. There is zero or one 50579A ProductCategory entity 50578A for each ProductInformation package 50577A. The ProductCategory entity 50578A includes a StandardID entity 50582A and an InternalID entity 50586A at the fourth level 50508D. The StandardID entity 50582A is of a type CDT 50584A "ProductCategoryStandardID" 50585A. There is any number of 50583A StandardID entity 50582A for a ProductCategory entity 50578A. The InternalID entity 50586A is of a type CDT 50588A "ProductCategoryInternalID" 50589A. There is zero or one 50587A InternalID entity 50586A for a ProductCategory entity 50578A.

The FollowUpBusinessTransactionDocument package 50590A includes a FollowUpPurchaseOrder entity 50591 A and a FollowUpPurchaseContract entity 50597A at the third level 50506D. The FollowUpPurchaseOrder entity 50591A includes a RequirementCode entity 50593A at the fourth level 50508D. There is zero or one 50592A FollowUpPurchaseOrder entity 50591 A for each FollowUpBusinessTransactionDocument package 50590A. The RequirementCode entity 50593A is of a type GDT 50595A "FollowUpBusinessTransactionDocumentRequirementCode" 50596A. There is one 50594A RequirementCode entity 50593A for a FollowUpPurchaseOrder entity 50591A. The FollowUpPurchaseContract entity 50597A includes a RequirementCode entity 50599A at the fourth level 50508D. There is zero or one 50598A FollowUpPurchaseContract entity 50597A for each FollowUpBusinessTransactionDocument package 50590A. The RequirementCode entity 50599A is of a type GDT 50501B "FollowUpBusinessTransactionDocumentRequirementCode" 50502B. There is one 50500B RequirementCode entity 50599A for a FollowUpPurchaseContract entity 50597A.

The Attachment package 50503B includes an AttachmentWebAddress entity 50504B, an InternalAttachmentWebAddress entity 50508B, and a LegalDocumentAttachment entity 50512B at the third level 50506D. The AttachmentWebAddress entity 50504B is of a type GDT 50506B "AttachmentWebAddress" 50507B. There is any number of 50505B AttachmentWebAddress entity 50504B for each Attachment package 50503B. The InternalAttachmentWebAddress entity 50508B is of a type GDT 50510B "AttachmentWebAddress" 50511B. There is any number of 50509B InternalAttachmentWebAddress entity 50508B for each Attachment package 50503B. The LegalDocumentAttachment entity 50512B is of a type GDT 50514B "Attachment" 50515B. There is any number of 50513B LegalDocumentAttachment entity 50512B for each Attachment package 50503B.

The Description package 50516B includes a Description entity 50517B and an InternalDescription entity 50521B at the third level 50506D. The Description entity 50517B is of a type GDT 50519B "Description" 50520B. There is zero or one 50518B Description entity 50517B for each Description package 50516B. The InternalDescription entity 50521B is of a type GDT 50523B "Description" 50524B. There is zero or one 50522B InternalDescription entity 50521B for each Description package 50516B.

The Item package 50525B includes an Item entity 50526B at the third level 50506D, a ProductInformation package 50548B, a Party package 50577B, a Location package 50598B, a DeliveryInformation package 50519C, a BusinessTransactionDocumentReference package 50532C, an Attachment package 50557C, a Description package 50566C, and a ScheduleLine package 50575C.

The Item entity 50526B is of a type AGDT 50528B "RFQInformationItem" 50529B. There is any number of 50527B Item entity 50526B for each Item package 50525B. The Item entity 50526B includes an ID entity 50530B, a ContractTargetAmount entity 50534B, and a HierarchyRelationship entity 50538B at the fourth level 50508D. The ID entity 50530B is of a type GDT 50532B "BusinessTransactionDocumentItemID" 50533B. There is one 50531B ID entity 50530B for an Item entity 50526B. The ContractTargetAmount entity 50534B is of a type GDT 50536B "Amount" 50537B. There is zero or one 50535B ContractTargetAmount entity 50534B for an Item entity 50526B. The HierarchyRelationship entity 50538B includes a ParentItemID entity 50540B and a TypeCode entity 50544B at the fifth level 50510D. There is zero or one 50539B HierarchyRelationship entity 50538B for an Item entity 50526B. The ParentItemID entity 50540B is of a type GDT 50542B "BusinessTransactionDocumentItemID" 50543B. There is one 50541B ParentItemID entity 50540B for a HierarchyRelationship entity 50538B. The TypeCode entity 50544B is of a type GDT 50546B "BusinessTransactionDocumentItemHierarchyRelationshipTypeCode" 50547B. There is one 50545B TypeCode entity 50544B for a HierarchyRelationship entity 50538B.

The ProductInformation package 50548B includes a Product entity 50549B and a ProductCategory entity 50569B at the fourth level 50508D. The Product entity 50549B is of a type GDT 50551B "BusinessTransactionDocumentProduct" 50552B. There is zero or one 50550B Product entity 50549B for each ProductInformation package 50548B. The Product entity 50549B includes a StandardID entity 50553B, a ManufacturerID entity 50557B, a TypeCode entity 50561B, and a Note entity 50565B at the fifth level 50510D. The StandardID entity 50553B is of a type CDT 50555B "ProductStandardID" 50556B. There is any number of 50554B StandardID entity 50553B for a Product entity 50549B. The ManufacturerID entity 50557B is of a type CDT 50559B "ProductPartyID" 50560B. There is zero or one 50558B ManufacturerID entity 50557B for a Product entity 50549B. The TypeCode entity 50561B is of a type GDT 50563B "ProductTypeCode" 50564B. There is zero or one 50562B TypeCode entity 50561B for a Product entity 50549B. The Note entity 50565B is of a type GDT 50567B "Note" 50568B. There is zero or one 50566B Note entity 50565B for a Product entity 50549B.

The ProductCategory entity 50569B is of a type GDT 50571B "BusinessTransactionDocumentProduct" 50572B. There is zero or one 50570B ProductCategory entity 50569B for each ProductInformation package 50548B. The ProductCategory entity 50569B includes a StandardID entity 50573B. The StandardID entity 50573B is of a type CDT 50575B "ProductCategoryStandardID" 50576B. There is any number of 50574B StandardID entity 50573B for a ProductCategory entity 50569B.

The Party package 50577B includes a BuyerParty entity 50578B, a BidderParty entity 50582B, a ProductRecipientParty entity 50586B, a VendorParty entity 50590B, and a ManufacturerParty entity 50594B at the fourth level 50508D. The BuyerParty entity 50578B is of a type AGDT 50580B "BusinessTransactionDocumentParty" 50581B. There is zero or one 50579B BuyerParty entity 50578B for each Party package 50577B. The BidderParty entity 50582B is of a type AGDT 50584B "BusinessTransactionDocumentParty" 50585B. There is zero or one 50583B BidderParty entity 50582B for each Party package 50577B. The ProductRecipientParty entity 50586B is of a type AGDT 50588B "BusinessTransactionDocumentParty" 50589B. There is zero or one 50587B ProductRecipientParty entity 50586B for each Party package 50577B. The VendorParty entity 50590B is of a type AGDT 50592B "BusinessTransactionDocumentParty" 50593B. There is zero or one 50591B VendorParty entity 50590B for each Party package 50577B. The ManufacturerParty entity 50594B is of a type AGDT 50596B "BusinessTransactionDocumentParty" 50597B. There is zero or one 50595B ManufacturerParty entity 50594B for each Party package 50577B.

The Location package 50598B includes a ShipToLocation entity 50599B at the fourth level 50508D. The ShipToLocation entity 50599B is of a type AGDT 50501C "BusinessTransactionDocumentLocation" 50502C. There is zero or one 50500C ShipToLocation entity 50599B for each Location package 50598B. The ShipToLocation entity 50599B includes a StandardID entity 50503C, a BuyerID entity 50507C, a BidderID entity 50511C, and an Address entity 50515C at the fifth level 50510D. The StandardID entity 50503C is of a type CDT 50505C "LocationStandardID" 50506C. There is any number of 50504C StandardID entity 50503C for a ShipToLocation entity 50599B. The BuyerID entity 50507C is of a type CDT 50509C "LocationPartyID" 50510C. There is zero or one 50508C BuyerID entity 50507C for a ShipToLocation entity 50599B. The BidderID entity 50511C is of a type CDT 50513C "LocationPartyID" 50514C. There is zero or one 50512C BidderID entity 50511C for a ShipToLocation entity 50599B. The Address entity 50515C is of a type AGDT 50517C "Address" 50518C. There is zero or one 50516C Address entity 50515C for a ShipToLocation entity 50599B.

The DeliveryInformation package 50519C includes a DeliveryTerms entity 50520C at the fourth level 50508D. The DeliveryTerms entity 50520C is of a type AGDT 50522C "DeliveryTerms" 50523C. There is zero or one 50521C DeliveryTerms entity 50520C for each DeliveryInformation package 50519C. The DeliveryTerms entity 50520C includes a MaximumLeadTimeDuration entity 50524C and an Incoterms entity 50528C at the fifth level 50510D. The MaximumLeadTimeDuration entity 50524C is of a type GDT 50526C "Duration" 50527C. There is zero or one 50525C MaximumLeadTimeDuration entity 50524C for a DeliveryTerms entity. The Incoterms entity 50528C is of a type GDT 50530C "Incoterms" 50530C. There is zero or one 50529C Incoterms entity 50528C for a DeliveryTerms entity.

The BusinessTransactionDocumentReference package 50532C includes a PurchaseContractReference entity 50533C and a BuyerProductCatalogueReference entity 50545C at the fourth level 50508D. The PurchaseContractReference entity 50533C is of a type GDT 50535C "BusinessTransactionDocumentReference" 50536C. There is zero or one 50534C PurchaseContractReference entity 50533C for each BusinessTransactionDocumentReference package 50532C. The PurchaseContractReference entity 50533C includes an ID entity 50537C and an ItemID entity 50541C at the fifth level 50510D. The ID entity 50537C is of a type GDT 50539C "BusinessTransactionDocumentID" 50540C. There is one 50538C ID entity 50537C for a PurchaseContractReference entity 50533C. The ItemID entity 50541C is of a type GDT 50543C "BusinessTransactionDocumentItemID" 50544C. There is any number of 50542C ItemID entity 50541C for a PurchaseContractReference entity 50533C.

The BuyerProductCatalogueReference entity 50545C is of a type AGDT 50547C "CatalogueReference" 50548C. There is zero or one 50546C BuyerProductCatalogueReference entity 50545C for each BusinessTransactionDocumentReference package 50532C. The BuyerProductCatalogueReference entity 50545C includes an ID entity 50549C and an ItemID entity 50553C at the fifth level 50510D. The ID entity 50549C is of a type GDT 50551C "CatalogueID" 50552C. There is one 50550C ID entity 50549C for a BuyerProductCatalogueReference entity 50545C. The ItemID entity 50553C is of a type GDT 50555C "CatalogueItemID" 50556C. There is zero or one 50554C ItemID entity 50553C for a BuyerProductCatalogueReference entity 50545C.

The Attachment package 50557C includes an AttachmentWebAddress entity 50558C and an InternalAttachmentWebAddress entity 50562C at the fourth level 50508D. The AttachmentWebAddress entity 50558C is of a type GDT 50560C "AttachmentWebAddress" 50561C. There is any number of 50559C AttachmentWebAddress entity 50558C for each Attachment package 50557C. The InternalAttachmentWebAddress entity 50562C is of a type GDT 50564C "AttachmentWebAddress" 50565C. There is any number of 50563C InternalAttachmentWebAddress entity 50562C for each Attachment package 50557C.

The Description package 50566C includes a Description entity 50567C and an InternalDescription entity 50571C at the fourth level 50508D. The Description entity 50567C is of a type GDT 50569C "Description" 50570C. There is zero or one 50568C Description entity 50567C for each Description package 50566C. The InternalDescription entity 50571C is of a type GDT 50573C "Description" 50574C. There is zero or one 50572C InternalDescription entity 50571C for each Description package 50566C.

The ScheduleLine package 50575C includes a ScheduleLine entity 50576C at the fourth level 50508D. The ScheduleLine entity 50576C is of a type AGDT 50578C "RFQItem-ScheduleLine" 50579C. There is zero or one 50577C ScheduleLine entity 50576C for each ScheduleLine package 50575C. The ScheduleLine entity 50576C includes an ID entity 50580C, a DeliveryPeriod entity 50584C, and a Quantity entity 50588C at the fifth level 50510D. The ID entity 50580C is of a type GDT 50582C "BusinessTransaction-DocumentItemScheduleLineID" 50583C. There is zero or one 50581C ID entity 50580C for a ScheduleLine entity 50576C. The DeliveryPeriod entity 50584C is of a type AGDT 50586C "DateTimePeriod" 50587C. There is one 50585C DeliveryPeriod entity 50584C for a ScheduleLine entity 50576C. The Quantity entity 50588C is of a type GDT 50590C "Quantity" 50591C. There is zero or one 50589C Quantity entity 50588C for a ScheduleLine entity 50576C.

pp) SupplyChainExceptionReport Interface

In B2B processes, SupplyChainExceptionReport interfaces are used by a business partner, such a a vendor entity, to send a notification about one or more exceptions that have occurred in the supply chain. Each exception is triggered typically either by an unforeseen event that affects the execution of the logistics process (such as production standstill) or is triggered when logistics-relevant threshold values or tolerances agreed upon between business partners in the supply chain are exceeded or fallen below the logistics-relevant threshold values. These threshold values or tolerances are defined at the level of the ship-from or ship-to locations and/or at product level as discussed below. Exceptions may be identified with automatically or manually-controlled monitoring of the logistics processes. They can affect different logistics-relevant issues such as forecast deviations, variances to logistical key figures, shortfall quantities of products, and transportation or production problems. The recipient of the notification transmitted using the SupplyChainExceptionReport interface is trigger to perform a corresponding process to handle the exception identified in the notification.

The motivating business scenario is the "Collaborative Planning and Forecasting" business scenario which describes the coordination of sales and purchase order forecasts between a buyer (e.g., retail company) and a vendor (e.g., consumer products manufacturer).

(1) SupplyChainExceptionReportNotification Message-Type

A SupplyChainExceptionReportNotification is a notification or report message to an entity, such as a buyer, about exceptions that have occurred during logistics planning or logistics execution within a supply chain. The SupplyChain-ExceptionReportNotification message structure is based on the message data type SupplyChainExceptionReportNotificationMessage.

(2) Message Choreography

FIG. 506 depicts the message choreography for SupplyChainExceptionReport interfaces. The choreography involves two business entities: a buyer 50602 and a vendor 50604. In the implementation shown in FIG. 506, the buyer 50602 transmits a sales forecast or purchase order forecast (ProductForecastNotification 50606) to the vendor 50604. The ProductForecastNotifiation 50606 may cause the vendor 50604 to generate one or more exceptions that the vendor 50604 subsequently notifies to the buyer 50602 via a SupplyChainExceptionReportNotification 50608. In response to the SupplyChainExceptionReportNotification 50608, the buyer 50602 may send the vendor 50604 a revised version of the original forecast (ProductForecastRevisionNotification 50610).

(3) Message Data Type SupplyChainExceptionReport-Message

The data model for the message data type SupplyChain-ExceptionReportMessage used to implement a SupplyChain-ExceptionReportNotification 50708 is depicted in FIG. 507. The SupplyChainExceptionReportMessage message data type groups the business information that is relevant for sending a business document in a message and the SupplyChain-ExceptionReport object or entity included in the business document. As depicted in FIG. 507, the message data type SupplyChainExceptionReportMessage includes a SupplyChainExceptionReportMessage package 50702, which includes a MessageHeader package 50704, a SupplyChain-ExceptionReport package 50706, and a SupplyChainExceptionReportMessage entity 50708.

(a) Message Header Package

A MessageHeader package 50704 groups together the business information that is relevant for sending a business document in a message. The MessageHeader package 50704 includes a MessageHeader entity 50710. There is a 1:1 relationship between the SupplyChainExceptionReportMessage entity 50708 and the MessageHeader entity 50710. Where a relationship is identified between entitites in FIG. 507 for this Interface, the respective relationship is a 1:1 relationship unless otherwise noted herein or indicated in FIG. 507. The MessageHeader package 50704 also includes a SenderParty entity 50712 and a RecipientParty entity 50714. There is a 1:c relationship between the MessageHeader entity 50710 and the SenderParty entity 50712 and between the Message-Header entity 50710 and the RecipientParty entity 50714.

The SenderParty 50712 is the party responsible for sending a business document at the business application level. The SenderParty entity 50712 is of type GDT: BusinessDocumentMessageHeaderParty.

The RecipientParty 50714 is the party responsible for receiving a business document at the business application level. The RecipientParty entity 50714 is of type GDT: BusinessDocumentMessageHeaderParty.

(b) SupplyChainExceptionReport package

The SupplyChainExceptionReport package 50706 includes a Party package 50716, a SupplyChainException package 50718, and a SupplyChainExceptionReport entity 50720. The SupplyChainExceptionReport entity 50720 identifies the exceptions that have occurred during logistics planning or logistics execution within a supply chain. The exceptions identified in the SupplyChainExceptionReport entity 50720 are grouped in relation to a sending and a receiving party, each of which may be ascertained from the list of business partners for the supply chain.

(i) SupplyChainExceptionReportParty Package

The SupplyChainExceptionReportParty package 50716 includes a BuyerParty entity 50722, a VendorParty entity 50724, and a ProductRecipientParty entity 50726. There is a respective 1:c relationship between the SupplyChainExceptionReport entity 50720 and each of the BuyerParty entity 50722, the VendorParty entity 50724, and the ProductRecipientParty entity 50726.

The BuyerParty entity 50722, as a buyer of goods or services, is affected by the exceptions identified in the SupplyChainExceptionReport entity 50720. The BuyerParty entity 50722 is of type GDT: BusinessTransactionDocumentParty. In one implementation, the BuyerParty entity 50722 includes the InternalID, the StandardID, the BuyerID, and the VendorID elements identified in the type GDT: BusinessTransactionDocumentParty.

The VendorParty entity 50724, as a vendor of goods or services, is also affected by the exceptions identified in the SupplyChainExceptionReport entity 50720. The VendorParty entity 50724 is of type GDT: BusinessTransactionDocumentParty. In one implementation, the BuyerParty entity 50722 includes the InternalID, the StandardID, the BuyerID, and the VendorID elements identified in the type GDT: BusinessTransactionDocumentParty.

The ProductRecipientParty entity 50726, as a recipient of goods or services, is also affected by the exceptions identified in the SupplyChainExceptionReport entity 50720. The ProductRecipientParty entity 50726 is of type GDT: BusinessTransactionDocumentParty and uses the InternalID, the StandardID, the BuyerID, and the VendorID of this type.

(ii) SupplyChainException Package

The SupplyChainException package 50718 includes a BusinessTransactionDocumentReference package 50728, a Location package 50730, a ProductInformation package 50732, a Batch package 50734, a PropertyValuation package 50736, a Log package 50738, and a SupplyChainException entity 50740, which has a I :n relationship with the SupplyChainExceptionReport entity 50720. The SupplyChainException entity 50720 is an exception that has occurred in the supply chain. The SupplyChainException entity 50720 includes the following an ActionCode attribute, which is a representation of an instruction to the message recipient as to how he or she should deal with the transmitted exception. For example, in one implementation, an ActionCode may identify a new creation instruction, a change instruction, or a delete instruction for an associated product forecast (e.g., as indentified in ProductForecastNotification 50706). Each ActionCode is of type GDT: ActionCode. The SupplyChainException entity 50720 also includes the following elements: an InternalID that is a unique internal identifier for the SupplyChainException entity 50720 and used if the sender and recipient are able to access the same master data. The InternalID is of type GDT: BusinessTransactionDocumentID; a BuyerID that is a unique identifier used to identify the BuyerParty entity 50722 associated with the SupplyChainException entity 50740. The BuyerID is of type GDT: BusinessTransactionDocumentID; a VendorID that is a unique identifier used to identify the VendorParty entity 50724 associated with the SupplyChainException entity 50740. The VendorID is of type GDT: BusinessTransactionDocumentID; a Name that describes the SupplyChainException entity 50740. The Name is of type GDT: Name; a TypeID that is a unique identifier for the type of SupplyChainException (such as product shortage). The TypeID is of type GDT: SupplyChainExceptionTypeID; a CreationDateTime, which is a creation time of the SupplyChainException entity 50740. The CreationDateTime is of type GDT: DateTime; a LastChangeDateTime, which identifies the last time the SupplyChainException entity 50740 was changed. The LastChangeDateTime is of type GDT: DateTime; a StatusCode, which is a representation of the status, such as new, resolved, or unresolved, of the SupplyChainException entity 50740. The StatusCode is of type GDT: SupplyChainExceptionStatusCode; a ProcessingPriorityCode, which is a representation of the urgency of the processing of a SupplyChainException entity 50740. The ProcessingPriorityCode is of type GDT: BusinessTransactionPriorityCode; a ValidityPeriod, which is identifies a period that the SupplyChainException entity 50740 is valid. This period can start in the past, present, or future (for forecasts) depending on the type and occurrence time of the exception. The ValidityPeriod is of type GDT: DateTimePeriod; a Note, which is text concerning the SupplyChainException entity 50740. The Note is of type GDT: Note;

(a) BusinessTransactionDocumentReference Package

The SupplyChainException BusinessTransactionDocumentReference package 50728 groups references to business documents for which a SupplyChainException 50740 can occur. The SupplyChainException BusinessTransactionDocumentReference package 50728 includes a PurchaseOrderReference entity 50742, a SchedulingAgreementReference entity 50744, a SalesOrderReference entity 50746, and an InboundDeliveryReference entity 50748. There is a respective 1:c relationship between the SupplyChainException entity 50740 and each of the PurchaseOrderReference entity 50742, the SchedulingAgreementReference entity 50744, the SalesOrderReference entity 50746, and the InboundDeliveryReference entity 50748.

The PurchaseOrderReference entity 50742 is the reference to a purchase order or to an item within a purchase order for which a SupplyChainException has occurred. The PurchaseOrderReference entity 50742 includes the purchase order number and purchase order item number assigned by the BuyerParty 50722. The PurchaseOrderReference entity 50742 is of type GDT: BusinessTransactionDocumentReference.

The SchedulingAgreementReference entity 50744 is the reference to an item in a scheduling agreement for which a SupplyChainException 50740 has occurred. The SchedulingAgreementReference entity 50744 includes an ItemID and is of type GDT: BusinessTransactionDocumentReference.

The SalesOrderReference entity 50746 is the reference to a sales order or to an item in a sales order. The SalesOrderReference entity 50746 includes the order number and order item number assigned by the seller. The SalesOrderReference is of type GDT: BusinessTransactionDocumentReference.

The InboundDeliveryReference entity 50748 is the reference to an inbound delivery or an item of an inbound delivery for which a SupplyChainException 50740 has occurred. The InboundDeliveryReference is of type GDT: BusinessTransactionDocumentReference.

(b) Location Package

The SupplyChainException Location Package 50730 groups locations where a SupplyChainException 50740 may occur. The SupplyChainException Location Package 50730 includes a ShipFromLocation 50750 and a ShipToLocation 50752. There is a 1:c relationship between the SupplyChainException enity 50740 and each of the ShipFromLocation entity 50750 and the ShipToLocation entity 50752.

The ShipFromLocation entity 50750 is the location from which the ordered products are delivered and where the SupplyChainException 50740 has occurred. The ShipFromLocation entity 50750 is of type GDT: BusinessTransactionDocumentShipFromLocation, where, in one implementation, only the InternalID, the StandardID, the BuyerID, and the VendorID are used. In another implementation, for intra-enterprise communication, only the InternalID in each ShipFromLocation entity 50750 is used. In yet another implementation, for inter-enterprise communication, each ShipFromLocation entity 50750 either uses the StandardID or the partner-role-specific ID of the sending or receiving partner; in other words, the BuyerID or VendorID. However, all the ID elements of each ShipFromLocation entity 50750 are optional.

The ShipToLocation entity 50752 is the location where the ordered products are delivered and where the SupplyChainException 50740 has occurred. The ShipToLocation entity 50752 is of type GDT: BusinessTransactionDocumentShipToLocation, where, in one implementation, only the InternalID, the StandardID, the BuyerID, and the VendorID are used. In another implementation, for intra-enterprise communication, only the InternalID in each ShipToLocation entity 50752 is used. In yet another implementation, for inter-enterprise communication, each ShipToLocation entity 50752 either uses the StandardID or the partner-role-specific ID of the sending or receiving partner; in other words, the BuyerID or VendorID. However, all the ID elements of each ShipToLocation entity 50750 are optional.

(c) ProductInformation Package

The SupplyChainException ProductInformation package 50732 includes a Product entity 50754 associated with the SupplyChainException 50740. There is a 1:c relationship between the SupplyChainException enity 50740 and the Product entity 50754. The Product entity 50754 is of type GDT: BusinessTransactionDocumentProduct, where, in one implementation, only the InternalID, the StandardID, the BuyerID, the VendorID, and the PackageQuantity are used. In another implementation, for intra-enterprise communication, only the InternalID is used for each Product entity 50754. In yet another implementation, for inter-enterprise communication, each Product entity 50754 uses either only the StandardID or the partner-role-specific ID of the sending or receiving partner, in other words, the BuyerID or VendorID. However, all ID elements of each Product entity 50754 are optional.

(d) Batch Package

The Batch package includes a Batch entity 50756 for which the SupplyChainException 50740 has occurred. There is a 1:c relationship between the SupplyChainException enity 50740 and the Batch entity 50756. The Batch entity 50756 includes an InternalID, a BuyerID, a VendorID, a ManufacturingDate, a BestBeforeDate, and an OriginCountryCode. The InternalID identifies the Batch 50756 and is of type GDT: BatchID. The BuyerID is a unique identifier assigned by the BuyerParty 50722 for the Batch 50756 and is of type GDT: BatchID. The VendorID is a unique identifier assigned by the VendorParty for the Batch 50756 and is of type GDT: BatchID. The ManufacturingDate is the date of manufacture of the Batch 50756 and is the type of the GDT: Date. The BestBeforeDate is the date of the Batch 50756 and is of type GDT: Date. The OriginCountryCode is a representation of the country of origin of the Batch 50756 and is of type GDT: CountryCode.

(e) PropertyValuation Package

The SupplyChainException PropertyValuation package 50736 groups information about characteristic properties of a SupplyChainException 50740 that may not be described by the ShipFromLocation entity 50750, the ShipToLocation entity 50752, or the Product entity 50754. The SupplyChainException PropertyValuation package 50736 includes a PropertyValuation entity 50758 assigned to and describes properties of a characteristic of the SupplyChainException 50740. There is a 1:nc relationship between the SupplyChainException enity 50740 and the PropertyValuation entity 50758. The PropertyValuation entity 50758 is of type GDT: PropertyValuation, where, in one implementation, only a PropertyReference and one PropertyValue (with AmountSpecification, QuantitySpecification, DateTimeSpecification, and NameSpecification elements) are supported. The PropertyReference is used to specify the identifier of the characteristic of the SupplyChainException 50740 assigned to the PropertyValuation entity 50758. Each PropertyValue is used to specify the related characteristic value. The use of the PropertyValuation entity 50758 as an additional description option for characteristic properties of a SupplyChainException 50740 may require a bilateral agreement between the message sender and the message recipient or the use of industry standards for characteristics and their properties. Examples of additional characteristic properties of a SupplyChainException 50740 are as follows: An exception type code correponding to a sales price increase having a PropertyID for the sales price and an AmountSpecification, an exception type code corresponding to a product shortage having a PropertyID for the shortfall quantity and a QuantitySpecification, an Exception type code corresponding to a delivery delay having a PropertyID for arrival time and a DateTimeSpecification, and an Exception type code corresponding to an assembly line standstill having a PropertyID for the assembly line description and a NameSpecification.

(f) Log Package

The SupplyChainException Log package 50738 groups logs that are relevant to the SupplyChainException 50740. The SupplyChainException Log package 50738 includes a ValidationLog entity 50760, which includes one or more Item entities 50762. The ValidationLog entity 50760 is a log for the process of the logistics planning or logistics execution check for a SupplyChainException. There is a 1:c relationship between the SupplyChainException enity 50740 and the PropertyLog entity 50760. There is a 1:n relationship between the PropertyLog enity 50760 and the Item entity 50762. The ValidationLog entity 50760 is of type GDT: Log, where, in one implementation, only the elements TypeID, SeverityCode, and Note are used in the Item. The check for exceptions may be performed using an automatically or manually-controlled process according to a defined criteria. If this check detects an exception, the relevant check log may be transmitted using the SupplyChainException ValidationLog entity 50760.

(4) Message Data Type Element Structure

The message data type element structure for the Supply Chain Exception Report message is depicted in FIG. 508. The element structure is similar to the data model, but provides additional information regarding the details of the interface. The element structure identifies the different packages 50800 in the interface, and represents the entities at various levels within the interface. As depicted in FIG. 508, the interface for SupplyChainExceptionReportMessage includes eight levels 50802, 50804, 50806, 50808, 50810, 50812, 50814, and 50816. The outermost package of this interface is a SupplyChainExceptionReportMessage package 50824, which includes a SupplyChainExceptionReportNotification entity 50826 at the first level 50802. The SupplyChainExceptionReportNotification entity 50826 is of a type MDT 50828 "SupplyChainExceptionReportMessage" 50830.

The SupplyChainExceptionReportMessage package 50824 includes a MessageHeader package 50832 and a SupplyChainExceptionReport package 50808A.

The MessageHeader package 50832 includes a MessageHeader entity 50834 at the second level 50804. The MessageHeader entity 50834 includes an ID entity 50842, a CreationDateTime entity 50850, a SenderParty entity 50858, and a RecipientParty entity 50882 at the third level 50806. The MessageHeader entity 50834 is of a type GDT 50838 "BusinessDocumentMessageHeader" 50840. There is one 50836

MessageHeader entity 50834 for each MessageHeader package 50832. The ID entity 50842 is of a type GDT 50846 "Business DocumentMessageID" 50848. There is one 50844 ID entity 50842 for a MessageHeader entity 50834. The CreationDateTime entity 50850 is of a type GDT 50854 "DateTime" 50856. There is one 50852 CreationDateTime entity 50850 for a MessageHeader entity 50834.

The SenderParty entity 50858 includes an InternalID entity 50866 and a StandardID entity 50874 at the fourth level 50808. The SenderParty entity 50858 is of a type GDT 50862 "BusinessDocumentMessageHeaderParty" 50864. There is zero or one 50852 SenderParty entity 50858 for a MessageHeader entity 50834. The InternaliD entity 50866 is of a type GDT 50870 "PartyInternalID" 50872. There is zero or one 50868 InternaliID entity 50866 for a SenderParty entity 50858. The StandardID entity 50874 is of a type GDT 50878 "PartyStandardID" 50880. There is any number of 50876 StandardID.entity 50874 for a SenderParty entity 50858.

The RecipientParty entity 50882 includes an InternalID entity 50890 and a StandardID entity 50898 at the fourth level 50808. The RecipientParty entity 50882 is of a type GDT 50886 "BusinessDocumentMessageHeaderParty" 50888. There is zero or one 50884 RecipientParty entity 50882 for a MessageHeader entity 50834. The InternalID entity 50890 is of a type GDT 50894 "PartyInternalID" 50896. There is zero or one 50892 InternalID entity 50890 for a RecipientParty entity 50882. The StandardID entity 50898 is of a type GDT 50804A "PartyStandardID" 50806A. There is any number of 50802A StandardID entity 50898 for a RecipientParty entity 50882.

The SupplyChainExceptionReport package 50808A includes a SupplyChainExceptionReport entity 50810A at the second level, a Party Package 50814A, and a SupplyChainException package 50838B. The SupplyChainExceptionReport entity 50810A has a data type name "SupplyChainExceptionReport" 50812A. There is one 50810A SupplyChainExceptionReport entity 50810A for each SupplyChainExceptionReport package 50808A.

The Party package 50814A includes a BuyerParty entity 50816A, a VendorParty entity 50856A, and a ProductRecipientParty entity 50896A at the third level 50806. The BuyerParty entity 50816A includes an InternalID entity 50824A, a StandardID entity 50832A, a BuyerID entity 50840A, and a VendorID entity 50848A at the fourth level 50808. The BuyerParty entity 50816A is of a type GDT 50820A "BusinessTransactionDocumentParty" 50822A. There is zero or one 50818A BuyerParty entity 50816A for each Party package 50814A. The InternalID entity 50824A is of a type GDT 50828A "PartyInternalID" 50830A. There is zero or one 50826A InternalID 50824A for a BuyerParty entity 50816A. The StandardID entity 50832A is of a type GDT 50836A "PartyStandardID" 50838A. There is any number of 50834A StandardID entity 50832A for a BuyerParty entity 50816A. The BuyerID entity 50840A is of a type GDT 50844A "PartyPartyID" 50846A. There is zero or one 50842A BuyerID entity 50840A for a BuyerParty entity 50816A. The VendorID entity 50848A is of a type GDT 50892A "PartyPartyID" 50846A. There is zero or one 50890A VendorID entity 50848A for a BuyerParty entity 50816A.

The ProductRecipientParty entity 50896A includes an InternalID entity 50806B, a StandardID entity 50814B, a BuyerID entity 50822B, and a VendorID entity 50830B at the fourth level 50808. The ProductRecipientParty entity 50896A is of a type GDT 50802B "BusinessTransactionDocumentParty" 50804B. There is zero or one 50898A ProductRecipientParty entity 50896A for each Party package 50814A. The InternalID entity 50806B is of a type GDT 50810B "PartyInternalID" 50812B. There is zero or one 50808B InternalID 50806B for a ProductRecipientParty entity 50896A. The StandardID entity 50814B is of a type GDT 50818B "PartyStandardID" 50820B. There is any number of 50816B StandardID entity 50814B for a ProductRecipientParty entity 50896A. The BuyerID entity 50822B is of a type GDT 50826B "PartyPartyID" 50828B. There is zero or one 50824B BuyerID entity 50822B for a ProductRecipientParty entity 50896A. The VendorID entity 50830B is of a type GDT 50834B "PartyPartyID" 50836B. There is zero or one 50832B VendorID entity 50830B for a ProductRecipientParty entity 50896A. The SupplyChainException package 50838B includes a SupplyChainException entity 50840B at the third level 50806, a BusinessTransactionDocumentReference package 50832C, a Location package 50866C, a ProductInformation package 50850D, a Batch package 50810E, a PropertyValuation package 50864E, and a Log package 50856F.

The SupplyChainException entity 50840B includes an @actionCode entity 50846B, an InternalID entity 50854B, a BuyerID entity 50862B, a VendorID entity 50870B, a Name entity 50878B, a TypeID entity 50886B, a CreationDateTime entity 50892B, a LastChangeDateTime entity 50802C, a StatusCode entity 50810C, a ProcessingPriorityCode entity 50818C, and a ValidityPeriod entity 50826C at the fourth level 50808. The SupplyChainException entity 50840B has a data type name "SupplyChainException" 50844B. There is any number of 50842B SupplyChainException entity 50840B for each SupplyChainException package 50838B.

The ActionCode entity 50846B is of a type GDT 50850B "ActionCode" 50844B. There is zero or one 50848B @actionCode entity 50846B for a SupplyChainException entity 50840B. The InternalID entity 50854B is of a type GDT 50858B "BusinessTransactionDocumentID" 50860B. There is zero or one 50856B InternalID entity 50854B for a SupplyChainException entity 50840B. The BuyerID entity 50862B is of a type GDT 50866B "BusinessTransactionDocumentID" 50868B. There is zero or one 50864B BuyerID entity 50862B for a SupplyChainException entity 50840B. The VendorID entity 50870B is of a type GDT 50874B "BusinessTransactionDocumentID" 50876B. There is zero or one 50872B VendorID entity 50870B for a SupplyChainException entity 50840B. The Name entity 50878B is of a type GDT 50882B "Name" 50876B. There is zero or one 50880B Name entity 50878B for a SupplyChainException entity 50840B. The TypeID entity 50886B is of a type GDT 50890B "SupplyChainExceptionTypeID" 50890B. There is one 50888B TypeID entity 50886B for a SupplyChainException entity 50840B. The CreationDateTime entity 50892B is of a type GDT 50896B "DateTime" 50898B. There is one 50894B CreationDateTime entity 50892B for a SupplyChainException entity 50840B. The LastChangeDateTime entity 50802C is of a type GDT 50806C "DateTime" 50808C. There is zero or one 50804C LastChangeDateTime entity 50802C for a SupplyChainException entity 50840B. The StatusCode entity 50810C is of a type GDT 50814C "SupplyChainExceptionStatusCode" 50816C. There is zero or one 50812C StatusCode entity 50810C for a SupplyChainException entity 50840B. The ProcessingPriorityCode entity 50818C is of a type GDT 50822C "BusinessTransactionPriorityCode" 50824C. There is one 50820C ProcessingPriorityCode entity 50818C for a SupplyChainException entity 50840B. The ValidityPeriod entity 50826C is of a type GDT 50830C "DateTimePeriod" 50832C. There is zero or one 50828C ValidityPeriod entity 50826C for a SupplyChainException entity 50840B.

The BusinessTransactionDocumentReference package 50832C includes a PurchaseOrderReference entity 50834C, a SchedulingAgreementReference entity 50842C, a SalesOrderReference entity 50850C, and an InboundDeliveryReference entity 50858C at the fourth level 50808. The PurchaseOrderReference entity 50834C is of a type GDT 50838C "BusinessTransactionDocumentReference" 50840C. There is zero or one 50836C PurchaseOrderReference entity 50834C for each BusinessTransactionDocumentReference package 50832C. The SchedulingAgreementReference entity 50842C is of a type GDT 50846C "BusinessTransactionDocumentReference" 50848C. There is zero or one 50844C SchedulingAgreementReference entity 50842C for each BusinessTransactionDocumentReference package 50832C. The SalesOrderReference entity 50850C is of a type GDT 50854C "BusinessTransactionDocumentReference" 50856C. There is zero or one 50852C SalesOrderReference entity 50850C for each BusinessTransactionDocumentReference package 50832C. The InboundDeliveryReference entity 50858C is of a type GDT 50862C "BusinessTransactionDocumentReference" 50864C. There is zero or one 50860C InboundDeliveryReference entity 50858C for each BusinessTransactionDocumentReference package 50832C.

The Location package 50866C includes a ShipFromLocation entity 50868C and a ShipToLocation entity 50810D at the fourth level 50808. The ShipFromLocation entity 50868C includes an InternalID entity 50876C, a StandardID entity 50884C, a BuyerID entity 50892C, and a VendorID entity 50802D. The ShipFromLocation entity 50868C is of a type GDT 50872C "BusinessTransactionDocumentShipFromLocation" 50874C. There is zero or one 50868C ShipFromLocation entity 50868C for each Location package 50866C. The InternalID entity 50876C is of a type GDT 50880C "LocationInternalID" 50882C. There is zero or one 50878C InternalID entity 50876C for a ShipFromLocation entity 50868C. The StandardID entity 50884C is of a type GDT 50888C "LocationStandardID" 50890C. There is zero or one 50886C StandardID entity 50884C for a ShipFromLocation entity 50868C. The BuyerID entity 50892C is of a type GDT 50896C "LocationPartyID" 50898C. There is zero or one 50894C BuyerID entity 50892C for a ShipFromLocation entity 50868C. The VendorID entity 50802D is of a type GDT 50806D "LocationPartyID" 50808D. There is zero or one 50804D VendorID entity 50802D for a ShipFromLocation entity 50868C.

The ShipToLocation entity 50810D is of a type GDT 50814D "BusinessTransactionDocumentShipToLocation" 50816D. There is zero or one 50812D ShipToLocation entity 50810D for each Location package 50866C. The InternalID entity 50818D is of a type GDT 50822D "LocationInternalID" 50824D. There is zero or one 50820D InternalID entity 50818D for a ShipToLocation entity 50810D. The StandardID entity 50826D is of a type GDT 50830D "LocationStandardID" 50832D. There is zero or one 50828D StandardID entity 50826D for a ShipToLocation entity 50810D. The BuyerID entity 50834D is of a type GDT 50838D "LocationPartyID" 50840D. There is zero or one 50836D BuyerID entity 50834D for a ShipToLocation entity 50810D. The VendorID entity 50842D is of a type GDT 50846D "LocationPartyID" 50848D. There is zero or one 50844D VendorID entity 50842D for a ShipToLocation entity 50810D.

The ProductInformation package 50850D includes a Product entity 50852D at the fourth level 50808. The Product entity 50852D includes an InternalID entity 50860D, a StandardID entity 50868D, a BuyerID entity 50876D, a VendorID entity 50884D, a ChangeID entity 50892D, and a PackageQuantity entity 50802E. The Product entity 50852D is of a type GDT 50856D "BusinessTransactionDocumentProduct" 50858D. There is zero or one 50854D Product entity 50852D for each ProductInformation package 50850D. The InternalID entity 50860D is of a type GDT 50864D "ProductInternalID" 50866D. There is zero or one 50862D InternalID entity 50860D for a Product entity 50852D. The StandardID entity 50868D is of a type GDT 50872D "ProductStandardID" 50874D. There is zero or one 50870D StandardID entity 50868D for a Product entity 50852D. The BuyerID entity 50876D is of a type GDT 50880D "ProductPartyID" 50882D. There is zero or one 50878D BuyerID entity 50876D for a Product entity 50852D. The VendorID entity 50884D is of a type GDT 50888D "ProductPartyID" 50890D. There is zero or one 50886D VendorID entity 50884D for a Product entity 50852D. The ChangeID entity 50892D is of a type GDT 50896D "ProductChangeID" 50898D. There is zero or one 50894D ChangeID entity 50892D for a Product entity 50852D. The PackageQuantity entity 50802E is of a type GDT 50806E "Quantity" 50808E. There is zero or one 50804E PackageQuantity entity 50802E for a Product entity 50852D.

The Batch package 50812E includes a Batch entity 50812E at the fourth level 50808. The Batch entity 50812E includes an InternalID entity 50816E, a BuyerID entity 50824E, a VendorID entity 50832E, a ManufacturingDate entity 50840E, a BestBeforeDate entity 50848E, and an OriginCountryCode entity 50856E at the fifth level 50810. There is zero or one 50814E Batch entity 50812E for each Batch package 50812E. The InternalID entity 50816E is of a type GDT 50820E "BatchInternalID" 50822E. There is zero or one 50818E InternalID entity 50816E for a Batch entity 50812E. The BuyerID entity 50824E is of a type GDT 50828E "BatchPartyID" 50830E. There is zero or one 50826E BuyerID entity 50824E for a Batch entity 50812E. The VendorID entity 50832E is of a type GDT 50836E "BatchPartyID" 50838E. There is zero or one 50834E VendorID entity 50832E for a Batch entity 50812E. The ManufacturingDate entity 50840E is of a type GDT 50844E "Date" 50846E. There is zero or one 50842E ManufacturingDate entity 50840E for a Batch entity 50812E. The BestBeforeDate entity 50848E is of a type GDT 50852E "Date" 50854E. There is zero or one 50850E BestBeforeDate entity 50848E for a Batch entity 50812E. The OriginCountryCode entity 50856E is of a type GDT 50860E "CountryCode" 50862E. There is zero or one 50858E OriginCountryCode entity 50856E for a Batch entity 50812E.

The PropertyValuation package 50864E includes a PropertyValuation entity 50866E at the fourth level 50808. The PropertyValuation entity 50866E is of a type GDT 50870E "PropertyValuation" 50872E. There is any number of 50868E PropertyValuation entity 50866E for each PropertyValuation package 50864E. The PropertyValuation entity 50866E includes a PropertyReference entity 50874E and a ValueGroup entity 50890E at the fifth level 50810.

The PropertyReference entity 50874E is of a type GDT 50878E "PropertyReference" 50880E. There is one 50876E PropertyReference entity 50874E for a PropertyValuation entity 50866E. The PropertyReference entity 50874E includes an ID entity 50882E at the sixth level 50812. The ID entity 50882E is of a type GDT 50886E "PropertyID" 50888E. There is one 50884E ID entity 50882E for a PropertyReference entity 50874E.

There is one 50892E ValueGroup entity 50890E for a PropertyValuation entity 50866E. The ValueGroup entity 50890E includes a PropertyValue entity 50894E at the sixth level 50812. The PropertyValue entity 50894E includes an AmountSpecification entity 50802F, a QuantitySpecification entity 50814F, a DateTimeSpecification entity 50826F, and a NameSpecification entity 50838F at the seventh level 50814.

There is zero or one 50804F AmountSpecification entity 50802F for a PropertyValue entity 50894E. The AmountSpecification entity 50802F includes an Amount entity 50806F at the eighth level 50818. The Amount entity 50806F is of a type GDT 50810F "Amount" 50812F. There is one 50808F Amount entity 50806F for an AmountSpecification entity 50802F. There is one 50816F QuantitySpecification entity 50814F for a PropertyValue entity 50894E. The QuantitySpecification entity 50814F includes a Quantity entity 50818F at the eighth level 50818. The Quantity entity 50818F is of a type GDT 50822F "Quantity" 50824F. There is one 50820F Quantity entity 50818F for a QuantitySpecification entity 50814F. There is one 50828F DateTimeSpecification entity 50826F for a PropertyValue entity 50894E. The DateTimeSpecification entity 50826F includes a DateTime entity 50830F at the eighth level 50818. The DateTime entity 50830F is of a type GDT 50834F "DateTime" 50836F. There is one 50832F DateTime entity 50830F for a DateTimeSpecification entity 50826F. There is one 50840F NameSpecification entity 50838F for a PropertyValue entity 50894E. The NameSpecification entity 50838F includes a Name entity 50842F at the eighth level 50818. The Name entity 50842F is of a type GDT 50844F "Name" 50846F. There is one 50843F Name entity 50842F for a NameSpecification entity 50838F.

The SupplyChainException package 50838B also includes a Note entity 50848F at the fourth level 50808. The Note entity 50848F is of a type GDT 50852F "Note" 50854F. There is zero or one 50850F Note entity 50848F for each SupplyChainException package 50838B.

The Log package 50856F includes a ValidationLog entity 50858F at the fourth level 50808. The ValidationLog entity 50858F is of a type GDT 50862F "Log" 50864F. There is zero or one 50860F ValidationLog entity 50858F for each Log package 50856F. The ValidationLog entity 50858F includes a MinimumLogItemSeverityCode entity 50866F and an Item entity 50874F at the fifth level 50810.

The MinimumLogItemSeverityCode entity 50866F is of a type GDT 50870F "LogItemSeverityCode" 50872F. There is zero or one 50868F MinimumLogItemSeverityCode entity 50866F for a ValidationLog entity 50858F. The Item entity 50874F is of a type GDT 50878F "LogItem" 50880F. There is any number of 50876F Item entity 50874F for a ValidationLog entity 50858F. The Item entity 50874F includes a TypeID entity 50882F, a SeverityCode entity 50890F, and a Note Entity 50898F at the sixth level 50812. The TypeID entity 50882F is of a type CCT 50886F "Identifier" 50888F. There is one 50884F TypeID entity 50882F for an Item entity 50874F. The SeverityCode entity 50890F is of a type GDT 50894F "LogItemSeverityCode" 50896F. There is zero or one 50892F SeverityCode entity 50890F for an Item entity 50874F. The Note entity 50898F is of a type GDT 50804G "Note" 50806G. There is zero or one 50802G Note entity 50898F for an Item entity 50874F.

qq) VATDeclaration Interfaces

Value Added Tax (VAT) Declaration Interfaces are used to report taxes on sales/purchases to a tax authority and for the tax authority to confirm the receipt and correctness of the tax return. Taxes on sales/purchases are levied on taxable goods and services. There is typically a provisional return of the accrued taxes on sales/purchases per month or quarter and a final return at the end of the year. In Germany, for example, the tax return is sent to a tax office or to one of four clearing houses. The clearing house distributes the returns to the individual federal states. The VATDeclaration Interfaces are based on the following message types: a VATDeclarationRequest and a VATDeclarationConfirmation.

One business scenario for the VATDeclarationRequest and VATDeclarationConfirmation messages is the electronic advance return for tax on sales and Purchases. Here, data for an electronic tax return for tax on sales/purchases is transferred to the integration server from the tax register using the VATDeclarationRequest. The integration server converts the data into a country-specific format for the tax return for tax on sales/purchases. The tax authority synchronously or asynchronously returns a log about the receipt, completeness, and formal correctness of the tax return. The integration server converts this log into the format of the VATDeclarationConfirmation message and transfers it to the tax register.

(1) Message Types (a) VATDeclarationRequest

A VATDeclarationRequest is a request to a tax authority to handle a tax return for tax on sales/purchases. The structure of the message type VATDeclarationRequest is based on the message data type VATDeclarationRequestMessage. The VATDeclarationRequest is transformed within the Exchange Infrastructure into the legal format for a tax return for tax on sales/purchases that is required by the tax authorities.

(b) VATDeclarationConfirmation

A VATDeclarationConfirmation is a confirmation about the receipt, completeness, formal correctness and, if necessary, consistency of a tax return for tax on sales/purchases. The structure of the message type VATDeclarationConfirmation is based on the message data type VATDeclarationConfirmationMessage. The confirmation of the tax authority about the tax return for tax on sales/purchases is transformed within the Exchange Infrastructure from the official format of the tax authority to the VATDeclarationConfirmation.

(2) Message Choreography

FIG. 509 depicts an exemplary message choreography for a VAT declaration creation process between business applications or entities (e.g., Tax Register entity 50902 and Tax Authority entity 50904) implementing VAT Declaration Interfaces in accordance with the subject matter described herein. In the implementation shown in FIG. 509, the TaxOperator sends the VATDeclarationRequest 50906 from the TaxRegister entity 50902 to the TaxAuthority entity 50904 for the TaxPayer.

Depending on the country in which the tax authority operates, a confirmation for the tax return for tax on sales/purchases can be sent using the VATDeclarationConfirmation 50908. This can happen synchronously or asynchronously.

(3) Interfaces

The VATDeclarationRequest_Out interface is used to asynchronously send a message of type VATDeclarationRequest 50906 to tax authorities. The VATDeclarationConfirmation_In interface is used to asynchronously receive a message of type VATDeclarationConfirmation 50908.

The VATDeclarationRequestConfirmation_Out interface is used to synchronously send a message of type VATDeclarationRequest 50906 and receive an answer of type VATDeclarationConfirmation 50908.

(4) Message Data Type VATDeclarationMessage

FIG. 510 depicts a data model of the message data type VATDeclarationMessage. The message data type VATDeclarationMessage groups the business information that is relevant for sending a business document in a message and the VATDeclaration object is contained in the business document. As shown in FIG. 510, message data type VATDeclarationMessage includes a VATDeclarationMessage package 51002, which includes a MessageHeader package 51004, a VATDeclaration package 51006, and a VATDeclarationMessage entity 51008.

The template message data type VATDeclarationMessage is the maximum structure (template) for the message data types VATDeclarationRequestMessage, VATDeclarationConfirmationMessage, and the message types and interfaces based on it. VATDeclarationRequestMessage and VATDeclarationConfirmationMessage are derived as structural views from VATDeclarationMessage.

(a) MessageHeader Package

The MessageHeader package 51004 groups the business information that is relevant for sending a business document in a message. The MessageHeader package 51004 contains the MessageHeader entity 51010. There is a 1:c relationship between the VATDeclarationMessage entity 51008 and the MessageHeader entity 51010. Where a relationship is identified between entitites in FIG. 510 for this Interface, the respective relationship is a 1:1 relationship unless otherwise noted herein or indicated in FIG. 510. The MessageHeader entity 51010 groups business information from the perspective of the sending application to identify the business document in a message, information about the sender, and information about the recipient.

The MessageHeader entity 51010 is of type GDT: BusinessDocumentMessageHeader. In some implementations, the MessageHeader entity 51010 contains an ID element, that is the identification of the business document in the technical message, and a ReferenceID, that is a unique identifier for the message preceding the VATDeclarationConfirmation to report taxes on sales/purchases.

The MessageHeader entity 51010 can be used or not used in the VATDeclarationConfirmationMessage depending on the country in which the tax return for tax on sales/purchases is submitted.

(b) VATDeclaration Package

The VATDeclaration package 51006 groups the VATDeclaration with its packages. The VATDeclaration package 51006 contains a Log package 51012, a Party package 51014, and an Item package 51016.

In some implementations, the Log package 51012 is not used in the VATDeclarationRequestMessage and the Item package 51016 is not used in the VATDeclarationConfirmationMessage.

The VATDeclaration package 51006 also contains a VATDeclaration entity 51018. The VATDeclaration entity 51018 is a tax return for tax on sales/purchases to a tax authority. The VATDeclaration entity 51018 contains the following elements: an actionCode, an ID, a Period, an AcceptanceStatusCode, a PaymentAmount, an AdvancePaymentAmount, a TaxDueClearingIndicator, a CollectionAuthorisationRevocationIndicator, and a Note. The actionCode is a coded display of information regarding how the tax authority should process the transferred VATDeclaration. This concerns the actionCode “01” (Create) for a new VATDeclaration or the actionCode “02” (Change) to correct the contents of an earlier VATDeclaration. The actionCode is of type GDT: ActionCode. The ID is a unique identifier of tax return for tax on sales/purchases assigned by the TaxOperator and is of type GDT: BusinessTransactionDocumentID. The Period is the calendar period for which taxes on sales/purchases are reported and is of type GDT: DatePeriod. The AcceptanceStatusCode is the status of acceptance by the tax authority on the tax return for tax on sales/purchases. The codes “accepted” or “rejected” are possible. The Period is of type GDT: AcceptanceStatusCode. The PaymentAmount is the amount of taxes on sales/purchases to be paid for the calendar period specified and is of type GDT: Amount. The AdvancePaymentAmount is the amount paid in advance for taxes on sales/purchases and is of type GDT: Amount. The TaxDueClearingIndicator indicates whether a reimbursement of taxes on sales/purchases, which results from the transferred VATDeclaration, is cleared against the tax office with payables. The TaxDueClearingIndicator is of type GDT: DueClearingIndicator. The CollectionAuthorisationRevocationIndicator indicates whether or not a collection authorization issued earlier is revoked and is of type GDT: RevocationIndicator. The Note is a comment on the VATDeclaration. This can be free text such as “Due to poor demand there was only low sales in the current period.” It can be used, for example, in an Austrian tax return for tax on sales/purchases. In some implementations, the language to be used is predefined by the country or tax authority in which the return is submitted. The Note is of type GDT: Note.

In some implementations, during VATDeclarationRequestMessage, the AcceptanceStatusCode is not used in the VATDeclarationRequestMessage. In some implementations, the AdvancePaymentAmount and Note elements are optional.

In some implementations, during a VATDeclarationConfirmationMessage, the ID and Period elements are optional. In addition, the actionCode attribute and the PaymentAmount, AdvancePaymentAmount, TaxDueClearingIndicator, CollectionAuthorisationRevocationIndicator, and Note elements are not used.

(i) VATDeclarationLog Package

The Log package 51012 groups a ValidationLog entity 51020 and a ValidationLogItem entity 51022. In some implementations, the Log package 51012 is not used in the VATDeclarationRequestMessage and it is optional in the VATDeclarationConfirmationMessage. The ValidationLog entity 51020 is a series of log messages from the tax authority that is has received and validated a tax return for tax on sales/purchases. The ValidationLogItem entity 51022 is a log message on the receipt and validation of a tax return for tax on sales/purchases. The ValidationLogItem entity 51022 is of type GDT: LogItem, where only the following elements are used: a TypeID, a SeverityCode, and a Note. The TypeID is a unique identification of the character of a log message on the receipt or form of a tax return for tax on sales/purchases. The SeverityCode is a coded display of the severity of the named log message and is of type GDT: LogItemSeverityCode. The Note is a short text of the log message. There is a 1:n relationship between the ValidationLog entity 51020 and the ValidationLogItem entity 51022.

(ii) VATDeclarationParty Package

The Party Package 51014 is the grouping of the business partners that may be relevant within the tax return for tax on sales/purchases. The Party Package 51014 contains the entities: TaxPayerParty 51024, TaxAuthorityParty 51026, and TaxOperatorParty 51028. The TaxPayerParty entity 51024 is a party that is liable to tax on sales/purchases. The TaxPayerParty entity 51024 is of type GDT: BusinessTransactionDocumentParty, where only the TaxID and Address elements are used. The Address is a company address. The TaxPayerParty entity 51024 is a company or a group of companies that report their taxes on sales/purchases jointly. The TaxAuthorityParty entity 51026 is the tax authority that receives the VATDeclaration and is of type GDT: TaxAuthorityParty. The TaxOperatorParty entity 51028 is a party that creates and sends the tax return for tax on sales/purchases for the TaxPayerParty entity 51026. The TaxOperatorParty entity 51028 is of type GDT: BusinessTransactionDocumentParty, where only the Address and ContactPerson elements are used. The Address is a company address. Only the Address element is used in ContactPerson (address of contact person). The TaxOperatorParty entity 51028 is typically a tax adviser or the tax department of a company. If the TaxOperatorParty entity 51028 is not specified, the TaxPayerParty entity 51024 performs this role. There is a 1:c relationship between the VATDeclaration entity 51018 and the TaxOperatorParty entity 51028.

(iii) VATDeclarationItem Package

The VATDeclarationItem package 51016 groups the VATDeclarationItem entity 51030. In some implementations, the Item package 51016 is not used in the VATDeclarationConfirmationMessage. There is a 1:n relationship between the VATDeclaration entity 51018 and the VATDeclarationItem entity 51030. The VATDeclarationItem entity 51030 is detailed information on the type and scope of reported taxes on sales/purchases. The VATDeclarationItem contains the elements: TaxDeclarationAmountTypeCode, Amount, and Note. The TaxDeclarationAmountTypeCode is a coded display for the type of an amount in a tax return (in tax ID). For example, whether it is a tax base amount or a tax amount. The TaxationKeyID is dependent on the country, tax number, and calendar period for which the taxes on sales/purchases are reported. The TaxDeclarationAmountTypeCode is of type GDT: TaxDeclarationAmountTypeCode. The Amount is the amount applied to taxes on sales/purchases by the type specified by the tax ID. The Amount is used with plus/minus sign, where the meaning of the plus/minus sign is dependent on the tax ID. The Amount is of type GDT: Amount. The Note is a textual description of the tax ID and is of type GDT: Note.

(5) Message Data Type Element Structure

The message data type element structure for the VAT Declaration message is depicted in FIG. 511A. The element structure is similar to the data model, but provides additional information regarding the details of the interface. The element structure identifies the different packages 51100 in the interface, and represents the entities at various levels within the interface. As depicted in FIG. 511A, the interface for VATDeclarationMessage includes five levels 51102, 51104, 51106, 51108, and 51110. The outermost package of this interface is a VATDeclarationMessage package 51116, which includes a VATDeclarationMessage entity 51118 at the first level 51102. The VATDeclarationMessage entity 51118 is of a type MDT 51120 "VATDeclarationMessage" 51122.

The VATDeclarationMessage package 51116 includes a MessageHeader package 51124 and a VATDeclaration package 51158. The MessageHeader package 51124 includes a MessageHeader entity 51126 at the second level 51104. The MessageHeader entity 51126 is of a type GDT 51130 "BusinessDocumentMessageHeader" 51132. There is zero or one 51128 MessageHeader entity 51126 for each MessageHeader package 51124. The MessageHeader entity 51126 includes an ID entity 51134, a ReferenceID entity 51142, and a CreationDateTime entity 51150 at the third level 51106. The ID entity 51134 is of a type GDT 51138 "BusinessDocumentMessageID" 51140. There is one 51136 ID entity 51134 for a MessageHeader entity 51126. The ReferenceID entity 51142 is of a type GDT 51146 "BusinessDocumentMessageID" 51148. There is zero or one 51144 ReferenceID entity 51142 for a MessageHeader entity 51126. The CreationDateTime entity 51150 is of a type GDT 51154 "DateTime" 51156. There is one 51152 CreationDateTime entity 51150 for a MessageHeader entity 51126.

The VATDeclaration package 51158 includes a VATDeclaration entity 51160 at the second level 51104, a Log package 51140A, a Party package 51182A, and an Item package 51148B.

The VATDeclaration entity 51160 has a data type name "VATDeclaration" 51166. There is one 51162 VATDeclaration entity 51160 for each VATDeclaration package 51158. The VATDeclaration entity 51160 includes an @actionCode entity 51168, an ID entity 51176, a Period entity 51184, an AcceptanceStatusCode entity 51192, a PaymentAmount entity 51100A, an AdvancePaymentAmount entity 51108A, a TaxDueClearingIndicator entity 51116A, a CollectionAuthorisationRevocationIndicator entity 51124A, and a Note entity 51132A at the third level 51106.

The @actionCode entity 51168 is of a type GDT 51172 "ActionCode" 51174. There is zero or one 51170 @actionCode entity 51168 for a VATDeclaration entity 51160. The ID entity 51176 is of a type GDT 51180 "BusinessTransactionDocumentID" 51182. There is one 51178 ID entity 51176 for a VATDeclaration entity 51160. The Period entity 51184 is of a type GDT 51188 "DatePeriod" 51190. There is one 51186 Period entity 51184 for a VATDeclaration entity 51160. The AcceptanceStatusCode entity 51192 is of a type GDT 51196 "AcceptanceStatusCode" 51198. There is zero or one 51194 AcceptanceStatusCode entity 51192 for a VATDeclaration entity 51160. The PaymentAmount entity 51100A is of a type GDT 51104A "Amount" 51106A. There is one 51102A PaymentAmount entity 51 100A for a VATDeclaration entity 51160. The AdvancePaymentAmount entity 51108A is of a type GDT 51112A "Amount" 51114A. There is zero or one 51110A AdvancePaymentAmount entity 51108A for a VATDeclaration entity 51160. The TaxDueClearingIndicator entity 51116A is of a type GDT 51120A "DueClearingIndicator" 51122A. There is one 51118A TaxDueClearingIndicator entity 51116A for a VATDeclaration entity 51160. The CollectionAuthorisationRevocationIndicator entity 51124A is of a type GDT 51128A "RevocationIndicator" 51130A. There is zero or one 51126A CollectionAuthorisationRevocationIndicator entity 51124A for a VATDeclaration entity 51160. The Note entity 51132A is of a type GDT 51136A "Note" 51138A. There is zero or one 51134A Note entity 51132A for a VATDeclaration entity 51160.

The Log package 51140A includes a ValidationLog entity 51142A at the third level 51106. The ValidationLog entity 51142A has a data type name "VATDeclarationValidationLog" 51148A. There is zero or one 51144A ValidationLog entity 51142A for each Log package 51140A. The ValidationLog entity 51142A includes an Item entity 51150A at the fourth level 51108. The Item entity 51150A is of a type GDT 51154A "LogItem" 51156A. There is any number of 51152A Item entity 51150A for a ValidationLog entity 51142A. The Item entity 51150A includes a TypeID entity 51158A, a SeverityCode entity 51166A, and a Note entity 51174A at the fifth level 51110. The TypeID entity 51158A is of a type CCT 51162A "Identifier" 51164A. There is zero or one 51160A TypeID entity 51158A for an Item entity 51150A. The SeverityCode entity 51166A is of a type GDT 51170A "LogItemSeverityCode" 51172A. There is zero or one 51168A SeverityCode entity 51166A for an Item entity 51150A. The Note entity 51174A is of a type GDT 51178A "Note" 51180A. There is one 51176A Note entity 51174A for an Item entity 51150A.

The Party package 51182A includes a TaxPayerParty entity 51184A, a TaxAuthorityParty entity 51108B, and a TaxOperatorParty entity 51116B at the third level 51106. The TaxPayerParty entity 51184A is of a type GDT 51188A "BusinessTransactionDocumentParty" 51190A. There is one 51186A TaxPayerParty entity 51184A for each Party package 51182A. The TaxPayerParty entity 51184A includes a TaxID entity 51192A and an Address entity 51100B at the fourth level 51192A. The TaxID entity 51192A is of a type GDT

51196A "PartyTaxID" 51198A. There is one 51194A TaxID entity 51192A for a TaxPayerParty entity 51184A. The Address entity 51100B is of a type GDT 51104B "Address" 51106B. There is zero or one 51102B Address entity 51100B for a TaxPayerParty entity 51184A.

The TaxAuthorityParty entity 51108B is of a type GDT 51112B "TaxAuthorityParty" 51114B. There is one 51110B TaxAuthorityParty entity 51108B for each Party package 51182A.

The TaxOperatorParty entity 51116B is of a type GDT 51120B "BusinessTransactionDocumentParty" 51122B. There is zero or one 51118B TaxOperatorParty entity 51116B for each Party package 51182A. The TaxOperatorParty entity 51116B includes an Address entity 51124B and a ContactPerson entity 51132B at the fourth level 51108. The Address entity 51124B is of a type GDT 51128B "Address" 51130B. There is zero or one 51126B Address entity 51124B for a TaxOperatorParty entity 51116B. The ContactPerson entity 51132B is of a type GDT 51136B "ContactPerson" 51138B. There is one 51134B ContactPerson entity 51132B for a TaxOperatorParty entity 51116B. The ContactPerson entity 51132B includes an Address entity 51140B at the fifth level 51110. The Address entity 51140B is of a type GDT 51144B "Address" 51146B. There is one 51142B Address entity 51140B for a ContactPerson entity 51132B.

The Item package 51148B includes an Item entity 51150B at the third level 51106. The Item entity 51150B has a data type name "VatDeclarationItem" 51156B. There is any number of 51152B Item entity 51150B for each Item package 51148B. The Item entity 51150B includes a TaxDeclarationAmountTypeCode entity 51158B, an Amount entity 51166B, and a Note entity 51174B at the fourth level 51108. The TaxDeclarationAmountTypeCode entity 51158B is of a type GDT 51162B "TaxDeclarationAmountTypeCode" 51164B. There is one 51160B TaxDeclarationAmountTypeCode entity 51158B for an Item entity 51150B. The Amount entity 51166B is of a type GDT 51170B "Amount" 51172B. There is one 51168B Amount entity 51166B for an Item entity 51150B. The Note entity 51174B is of a type GDT 51178B "Note" 51180B. There is zero or one 51176B Note entity 51174B for an Item entity 51150B.

The message data type element structure for the VAT Declaration Request message is depicted in FIG. 512A. The element structure is similar to the data model, but provides additional information regarding the details of the interface. The element structure identifies the different packages 51200 in the interface, and represents the entities at various levels within the interface. As depicted in FIG. 512A, the interface for VATDeclarationRequestMessage includes five levels 51202, 51204, 51206, 51208, and 51210. The outermost package of this interface is a VATDeclarationRequestMessage package 51216, which includes a VATDeclarationRequestMessage entity 51218 at the first level 51202. The VATDeclarationRequestMessage entity 51218 is of a type MDT 51220 "VATDeclarationRequestMessage" 51222. The VATDeclarationRequestMessage package 51216 includes a MessageHeader package 51224 and a VatDeclaration package 51250.

The MessageHeader entity 51226 is of a type GDT 51230 "BusinessDocumentMessageHeader" 51232. There is zero or one 51228 MessageHeader entity 51226 for each MessageHeader package 51224. The MessageHeader entity 51226 includes an ID entity 51234 and a CreationDateTime entity 51242. The ID entity 51234 is of a type GDT 51238 "BusinessDocumentMessageID" 51240. There is one 51236 ID entity 51234 for a MessageHeader entity 51226. The CreationDateTime entity 51242 is of a type GDT 51246 "DateTime" 51248. There is one 51244 CreationDateTime entity 51242 for a MessageHeader entity 51226.

The VATDeclaration package 51250 includes a VATDeclaration entity 51252 at the second level 51204, a Party package 51224A, and an Item package 51290A.

The VATDeclaration entity 51260 has a data type name "VATDeclarationRequest" 51258. There is one 51254 VATDeclaration entity 51252 for each VATDeclaration package 51250. The VATDeclaration entity 51252 includes an @actionCode entity 51260, an ID entity 51268, a Period entity 51276, a PaymentAmount entity 51284, an AdvancePaymentAmount entity 51292, a TaxDueClearingIndicator entity 51200A, a CollectionAuthorisationRevocationIndicator entity 51208A, and a Note entity 51216A at the third level 51106.

The @actionCode entity 51260 is of a type GDT 51264 "ActionCode" 51266. There is one 51262 @actionCode entity 51260 for a VATDeclaration entity 51252.

The ID entity 51268 is of a type GDT 51272 "BusinessTransactionDocumentID" 51274. There is one 51270 ID entity 51268 for a VATDeclaration entity 51252.

The Period entity 51276 is of a type GDT 51280 "DatePeriod" 51282. There is one 51278 Period entity 51276 for a VATDeclaration entity 51252. The PaymentAmount entity 51284 is of a type GDT 51288 "Amount" 51290. There is one 51286 PaymentAmount entity 51284 for a VATDeclaration entity 51252. The AdvancePaymentAmount entity 51292 is of a type GDT 51296 "Amount" 51298. There is zero or one 51294 AdvancePaymentAmount entity 51292 for a VATDeclaration entity 51252. The TaxDueClearingIndicator entity 51200A is of a type GDT 51204A "DueClearingIndicator" 51206A. There is one 51202A TaxDueClearingIndicator entity 51200A for a VATDeclaration entity 51252. The CollectionAuthorisationRevocationIndicator entity 51208A is of a type GDT 51212A "RevocationIndicator" 51214A. There is one 51210A CollectionAuthorisationRevocationIndicator entity 51208A for a VATDeclaration entity 51252. The Note entity 51216A is of a type GDT 51220A "Note" 51222A. There is zero or one 51218A Note entity 51216A for a VATDeclaration entity 51252.

The Party package 51224A includes a TaxPayerParty entity 51226A, a TaxAuthorityParty entity 51250A, and a TaxOperatorParty entity 51258A at the third level 51206. The TaxPayerParty entity 51226A is of a type GDT 51230A "BusinessTransactionDocumentParty" 51232A. There is one 51228A TaxPayerParty entity 51226A for each Party package 51224A. The TaxPayerParty entity 51226A includes a TaxID entity 51234A and an Address entity 51242A at the fourth level 51208.

The TaxID entity 51234A is of a type GDT 51238A "PartyTaxID" 51240A. There is one 51236A TaxID entity 51234A for a TaxPayerParty entity 51226A.

The Address entity 51242A is of a type GDT 51246A "Address" 51248A. There is zero or one 51244A Address entity 51242A for a TaxPayerParty entity 51226A.

The TaxAuthorityParty entity 51250A is of a type GDT 51254A "TaxAuthorityParty" 51256A. There is one 51252A TaxAuthorityParty entity 51250A for each Party package 51224A.

The TaxOperatorParty entity 51258A is of a type GDT 51262A "BusinessTransactionDocumentParty" 51264A. There is zero or one 51260A TaxOperatorParty entity 51258A for each Party package 51224A. The TaxOperatorParty entity 51258A includes an Address entity 51266A and a ContactPerson entity 51274A at the fourth level 51208. The Address entity 51266A is of a type GDT 51270A "Address" 51272A. There is zero or one 51268A Address entity 51266A for a TaxOperatorParty entity 51258A. The ContactPerson entity 51274A is of a type GDT 51278A "ContactPerson" 51280A. There is one 51276A ContactPerson entity 51274A for a TaxOperatorParty entity 51258A. The ContactPerson entity 51274A includes an Address entity 51282A at the fifth level 51210. The Address entity 51282A is of a type GDT 51286A "Address" 51288A. There is one 51284A Address entity 51282A for a ContactPerson entity 51274A.

The Item package 51290A includes an Item entity 51292A at the third level 51206. The Item entity 51292A has a data type name "VatDeclarationItem" 51298A. There is any number of 51294A Item entity 51292A for each Item package 51290A. The Item entity 51292A includes a TaxDeclarationAmountTypeCode entity 51200B, an Amount entity 51208B, and a Note entity 51216B at the fourth level 51208.

The TaxDeclarationAmountTypeCode entity 51200B is of a type GDT 51204B "TaxDeclarationAmountTypeCode" 51206B. There is one 51202B TaxDeclarationAmountTypeCode entity 51200B for an Item entity 51292A. The Amount entity 51208B is of a type GDT 51212B "Amount" 51214B. There is one 51210B Amount entity 51208B for an Item entity 51292A.

The Note entity 51216B is of a type GDT 51220B "Note" 51222B. There is zero or one 51218B Note entity 51216B for an Item entity 51292A.

The message data type element structure for the VAT Declaration Confirmation message is depicted in FIG. 513A. The element structure is similar to the data model, but provides additional information regarding the details of the interface. The element structure identifies the different packages 51300 in the interface, and represents the entities at various levels within the interface. As depicted in FIG. 513A, the interface for VATDeclarationConfirmationMessage includes five levels 51302, 51304, 51306, 51308, and 51310. The outermost package of this interface is a VATDeclarationConfirmationMessage package 51316, which includes a VATDeclarationConfirmationMessage entity 51318 at the first level 51302. The VATDeclarationConfirmationMessage entity 51318 is of a type MDT 51320 "VATDeclarationConfirmationMessage" 51322.

The VATDeclarationConfirmationMessage package 51316 includes a MessageHeader package 51324 and a VATDeclaration package 51358. The MessageHeader package 51324 includes a MessageHeader entity 51326 at the second level 51304. The MessageHeader entity 51326 is of a type GDT 51330 "MessageHeader" 51332. There is zero or one 51328 MessageHeader entity 51326 for each MessageHeader package 51324. The MessageHeader entity 51326 includes an ID entity 51334, a ReferenceID entity 51342, and a CreationDateTime entity 51350. The ID entity 51334 is of a type GDT 51338 "BusinessDocumentMessageID" 51340. There is one 51336D entity 51334 for a MessageHeader entity 51326. The ReferenceID entity 51342 is of a type GDT 51346 "BusinessDocumentMessageID" 51348. There is zero or one 51344 ReferenceID entity 51342 for a MessageHeader entity 51326. The CreationDateTime entity 51350 is of a type GDT 51354 "DateTime" 51356. There is one 51352 CreationDateTime entity 51350 for a MessageHeader entity 51326.

The VATDeclaration package 51358 includes a VATDeclaration entity 51360 at the second level 51304, a Log package 51392, and a Party package 51334A.

The VATDeclaration entity 51360 has a data type name "VATDeclarationConfirmation" 51366. There is one 51362 VATDeclaration entity 51360 for each VATDeclaration package 51358. The VATDeclaration entity 51360 includes an ID entity 51368, a Period entity 51376, and an AcceptanceStatusCode entity 51384 at the third level 51306.

The ID entity 51368 is of a type GDT 51372 "BusinessTransactionDocumentID" 51374. There is zero or one 51370D entity 51368 for a VATDeclaration entity 51360.

The Period entity 51376 is of a type GDT 51380 "DatePeriod" 51382. There is zero or one 51378 Period entity 51376 for a VATDeclaration entity 51360. The AcceptanceStatusCode entity 51384 is of a type GDT 51388 "AcceptanceStatusCode" 51390. There is one 51386 AcceptanceStatusCode entity 51384 for a VATDeclaration entity 51360.

The Log package 51392 includes a ValidationLog entity 51394 at the third level 51306. The ValidationLog entity 51394 has a data type name "VATDeclarationValidationLog" 51300A. There is zero or one 51396 ValidationLog entity 51394 for each Log package 51392. The ValidationLog entity 51394 includes an Item entity 51302A at the fourth level 51308. The Item entity 51302A is of a type GDT 51306A "LogItem" 51308A. There is any number of 51304A Item entity 51302A for a ValidationLog entity 51394. The Item entity 51302A includes a TypeID entity 51310A, a SeverityCode entity 51318A, and a Note entity 51326A at the fifth level 51310. The TypeID entity 51310A is of a type CCT 51314A "Identifier" 51316A. There is zero or one 51312A TypeID entity 51310A for an Item entity 51302A. The SeverityCode entity 51318A is of a type GDT 51322A "LogItemSeverityCode" 51324A. There is zero or one 51320A SeverityCode entity 51318A for an Item entity 51302A. The Note entity 51326A is of a type GDT 51330A "Note" 51332A. There is one 51328A Note entity 51326A for an Item entity 51302A.

The Party package 51334A includes a TaxPayerParty entity 51336A, a TaxAuthorityParty entity 51360A, and a TaxOperatorParty entity 51368A at the third level 51306. The TaxPayerParty entity 51336A is of a type GDT 51340A "BusinessTransactionDocumentParty" 51342A. There is one 51338A TaxPayerParty entity 51336A for each Party package 51334A. The TaxPayerParty entity 51336A includes a TaxID entity 51344A and an Address entity 51352A at the fourth level 51392A. The TaxID entity 51344A is of a type GDT 51348A "PartyTaxID" 51350A. There is one 51346A TaxID entity 51344A for a TaxPayerParty entity 51336A. The Address entity 51352A is of a type GDT 51356A "Address" 51358A. There is zero or one 51354A Address entity 51352A for a TaxPayerParty entity 51336A.

The TaxAuthorityParty entity 51360A is of a type GDT 51364A "TaxAuthorityParty" 51366A. There is one 51362A TaxAuthorityParty entity 51360A for each Party package 51334A. The TaxOperatorParty entity 51368A is of a type GDT 51372A "BusinessTransactionDocumentParty" 51374A. There is zero or one 51370A TaxOperatorParty entity 51368A for each Party package 51334A. The TaxOperatorParty entity 51368A includes an Address entity 51376A and a ContactPerson entity 51384A at the fourth level 51308. The Address entity 51376A is of a type GDT 51380A "Address" 51382A. There is zero or one 51378A Address entity 51376A for a TaxOperatorParty entity 51368A. The ContactPerson entity 51384A is of a type GDT 51388A "ContactPerson" 51390A. There is one 51386A ContactPerson entity 51384A for a TaxOperatorParty entity 51368A. The ContactPerson entity 51384A includes an Address entity 51392A at the fifth level 51310. The Address entity 51392A is of a type GDT 51396A "Address" 51398A. There is one 51394A Address entity 51392A for a ContactPerson entity 51384A.

Variations of the subject matter described herein and all of the functional operations described in this specification can be implemented in digital electronic circuitry, or in computer software, firmware, or hardware, including the structures disclosed in this specification and their structural equivalents, or in combinations of one or more of them. Variations of the subject matter described herein can be implemented as one or more computer program products, i.e., one or more modules of computer program instructions encoded on a computer-readable medium for execution by, or to control the operation of, data processing apparatus. The computer-readable medium can be a machine-readable storage device, a machine-readable storage substrate, a memory device, a composition of matter effecting a machine-readable propagated signal, or a combination of one or more them. The term "data processing apparatus" encompasses all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, or a combination of one or more of them. A propagated signal is an artificially generated signal, e.g., a machine-generated electrical, optical, or electromagnetic signal, that is generated to encode information for transmission to suitable receiver apparatus.

A computer program (also known as a program, software, software application, script, or code) can be written in any form of programming language, including compiled or interpreted languages, and it can be deployed in any form, including as a stand-alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio player, a Global Positioning System (GPS) receiver, to name just a few. Computer-readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, variations of the subject matter described herein can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

Variations of the subject matter described herein can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the subject matter described herein, or any combination of one or more such back-end, middleware, or front-end components. The components of the system can be interconnected by any form or medium of digital data communication, e.g., a communication network. Examples of communication networks include a local area network ("LAN") and a wide area network ("WAN"), e.g., the Internet.

The computing system can include clients and servers. A client and server are generally remote from each other and typically interact through a communication network. The relationship of client and server arises by virtue of computer programs running on the respective computers and having a client-server relationship to each other.

Although a few variations have been described in detail above, other modifications are possible. For example, the logic flow depicted in the accompanying figures and described herein do not require the particular order shown, or sequential order, to achieve desirable results. Other embodiments may be within the scope of the following claims.

What is claimed is:

1. A tangible computer readable medium including program code for providing a message-based interface for cancelling an original message sent to accounting, the medium comprising:

program code for receiving via a message-based interface derived from a common business object model, where the common business object model includes business objects having relationships that enable derivation of message-based interfaces and message packages, the message-based interface exposing at least one service as defined in a service registry and from a heterogeneous application executing in an environment of computer systems providing message-based services, a first message for requesting cancellation of posting information previously sent to accounting for an incoming or outgoing invoice or credit memo that includes a first message package derived from the common business object model and hierarchically organized in memory as:

an accounting cancellation message entity; and an accounting cancellation package comprising an accounting cancellation entity and a business transaction document reference package, where the accounting cancellation entity includes a base prima nota ID and an origin prima nota type code, where the business transaction document reference package includes an origin prima nota reference, and where the origin prima nota reference includes an ID; and program code for processing the first message according to the hierarchical organization of the first message package, where processing the first message includes unpacking the first message package based on the common business object model; and program code for sending a second message to the heterogeneous application responsive to the first message, where the second message includes a second message package derived from the common business object model to provide consistent semantics with the first message package.

2. The computer readable medium of claim 1, wherein the accounting cancellation entity further includes at least one of the following: a posting date and a note.

3. A distributed system operating in a landscape of computer systems providing message-based services defined in a service registry, the system comprising:

a graphical user interface comprising computer readable instructions, embedded on tangible media, for requesting cancellation of posting information previously sent to accounting for an incoming or outgoing invoice or credit memo using a request;

a first memory storing a user interface controller for processing the request and involving a message including a message package derived from a common business object model, where the common business object model includes business objects having relationships that enable derivation of message-based service interfaces and message packages, the message package hierarchically organized as:

an accounting cancellation message entity; and an accounting cancellation package comprising an accounting cancellation entity and a business transaction document reference package, where the accounting cancellation entity includes a base prima nota ID and an origin prima nota type code, where the business transaction document reference package includes an origin prima nota reference, and where the origin prima nota reference includes an ID; and a second memory, remote from the graphical user interface, storing a plurality of message-based service interfaces derived from the common business object model to provide consistent semantics with messages derived from the common business object model, where one of the message-based service interfaces processes the message according to the hierarchical organization of the message package, where processing the message includes unpacking the first message package based on the common business object model.

4. The distributed system of claim 3, wherein the first memory is remote from the graphical user interface.

5. A tangible computer readable medium including program code for providing a message-based interface for exchanging notifications between a bank or central payment server and a bank statement receiver, the medium comprising:

program code for receiving via a message-based interface derived from a common business object model, where the common business object model includes business objects having relationships that enable derivation of message-based interfaces and message packages, the message-based interface exposing at least one service as defined in a service registry and from a heterogeneous application executing in an environment of computer systems providing message-based services, a first message for transmitting information regarding turnovers of a bank account in a business-to-business process that includes a first message package derived from the common business object model and hierarchically organized in memory as:

a bank account statement message entity; and a bank account statement package comprising a bank account statement entity and a bank account package, where the bank account statement entity includes an ID and a date, and where the bank account package includes a bank account entity; and program code for processing the first message according to the hierarchical organization of the first message package, where processing the first message includes unpacking the first message package based on the common business object model; and program code for sending a second message to the heterogeneous application responsive to the first message, where the second message includes a second message package derived from the common business object model to provide consistent semantics with the first message package.

6. The computer readable medium of claim 5, wherein the bank account statement entity further includes at least one of the following: a validity period, an opening balance amount, a closing balance amount, a total debit amount, a total credit amount, and an item total number value.

7. A distributed system operating in a landscape of computer systems providing message-based services defined in a service registry, the system comprising:

a graphical user interface comprising computer readable instructions, embedded on tangible media, for transmitting information regarding turnovers of a bank account in a business-to-business process using a request;

a first memory storing a user interface controller for processing the request and involving a message including a message package derived from a common business object model, where the common business object model includes business objects having relationships that enable derivation of message-based service interfaces and message packages, the message package hierarchically organized as:

a bank account statement message entity; and a bank account statement package comprising a bank account statement entity and a bank account package, where the bank account statement entity includes an ID and a date, and where the bank account package includes a bank account entity; and a second memory, remote from the graphical user interface, storing a plurality of message-based service interfaces derived from the common business object model to provide consistent semantics with messages derived from the common business object model, where one of the message-based service interfaces processes the message according to the hierarchical organization of the message package, where processing the message includes unpacking the first message package based on the common business object model.

8. The distributed system of claim 7, wherein the first memory is remote from the graphical user interface.

9. A tangible computer readable medium including program code for providing a message-based interface for exchanging information determining bundle pricing to be used for settlement chart calculation for a group of bank accounts, the medium comprising:

program code for receiving via a message-based interface derived from a common business object model, where the common business object model includes business objects having relationships that enable derivation of message-based interfaces and message packages, the message-based interface exposing at least one service as defined in a service registry and from a heterogeneous application executing in an environment of computer systems providing message-based services, a first message for requesting a bank account balance from account management that includes a first message package derived from the common business object model and hierarchically organized in memory as:

a bank account balance report query message entity; and a bank account balance report query package comprising a bank account balance report query entity, a bank account package, and an item package, where the bank account package includes a bank account entity, and where the item package includes at least one item entity, each item entity including a bank account balance type code and a date period; and program code for processing the first message according to the hierarchical organization of the first message package, where processing the first message includes unpacking the first message package based on the common business object model; and program code for sending a second message to the heterogeneous application responsive to the first message, where the second message includes a second message package derived from the common business object model to provide consistent semantics with the first message package.

10. The computer readable medium of claim 9, wherein the bank account package further includes a bank account differentiator entity.

11. A distributed system operating in a landscape of computer systems providing message-based services defined in a service registry, the system comprising:

a graphical user interface comprising computer readable instructions, embedded on tangible media, for requesting a bank account balance from account management to determine bundle pricing to be used for settlement chart calculation for a group of bank accounts using a request;

a first memory storing a user interface controller for processing the request and involving a message including a message package derived from a common business object model, where the common business object model includes business objects having relationships that enable derivation of message-based service interfaces and message packages, the message package hierarchically organized as:

a bank account balance report query message entity; and a bank account balance report query package comprising a bank account balance report query entity, a bank account package, and an item package, where the bank account package includes a bank account entity, and where the item package includes at least one item entity, each item entity including a bank account balance type code and a date period; and a second memory, remote from the graphical user interface, storing a plurality of message-based service interfaces derived from the common business object model to provide consistent semantics with messages derived from the common business object model, where one of the message-based service interfaces processes the message according to the hierarchical organization of the message package, where processing the message includes unpacking the first message package based on the common business object model.

12. The distributed system of claim 11, wherein the first memory is remote from the graphical user interface.

13. A tangible computer readable medium including program code for providing a message-based interface for recording data of a business document from an image template, the medium comprising:

program code for receiving via a message-based interface derived from a common business object model, where the common business object model includes business objects having relationships that enable derivation of message-based interfaces and message packages, the message-based interface exposing at least one service as defined in a service registry and from a heterogeneous application executing in an environment of computer systems providing message-based services, a first message for requesting the recordation of business document data from an image template that includes a first message package derived from the common business object model and hierarchically organized in memory as:

a business transaction document image recognition request message entity; and a business transaction document image recognition package comprising a business transaction document image recognition entity and an attachment package, where the business transaction document image recognition entity includes a business transaction document type code, and where the attachment package includes at least one attachment entity; and program code for processing the first message according to the hierarchical organization of the first message package, where processing the first message includes unpacking the first message package based on the common business object model; and program code for sending a second message to the heterogeneous application responsive to the first message, where the second message includes a second message package derived from the common business object model to provide consistent semantics with the first message package.

14. The computer readable medium of claim 13, wherein the first message for requesting the recordation of business document data comprises a request to recognize the business document data from the image template using optical character recognition software.

15. A distributed system operating in a landscape of computer systems providing message-based services defined in a service registry, the system comprising:

a graphical user interface comprising computer readable instructions, embedded on tangible media, for requesting the recordation of business document data from an image template, either manually from a digitized version of the image template or automatically via optical character recognition using a request;

a first memory storing a user interface controller for processing the request and involving a message including a message package derived from a common business object model, where the common business object model includes business objects having relationships that enable derivation of message-based service interfaces and message packages, the message package hierarchically organized as:

a business transaction document image recognition request message entity; and a business transaction document image recognition package comprising a business transaction document image recognition entity and an attachment package, where the business transaction document image recognition entity includes a business transaction document type code, and where the attachment package includes at least one attachment entity; and a second memory, remote from the graphical user interface, storing a plurality of message-based service interfaces derived from the common business object model to provide consistent semantics with messages derived from the common business object model, where one of the message-based service interfaces processes the message according to the hierarchical organization of the message package, where processing the message includes unpacking the first message package based on the common business object model.

16. The distributed system of claim 15, wherein the first memory is remote from the second memory.

17. A tangible computer readable medium including program code for providing a message-based interface for allowing for creation of a catalogue and management of electronic publication or viewing of the catalogue for a company or enterprise, the medium comprising:

program code for receiving via a message-based interface derived from a common business object model, where the common business object model includes business objects having relationships that enable derivation of message-based interfaces and message packages, the message-based interface exposing at least one service as defined in a service registry and from a heterogeneous application executing in an environment of computer systems providing message-based services, a first message for requesting a change, creation, or deletion of at least one catalog item contained in a catalog publication transmission that includes a first message package derived from the common business object model and hierarchically organized in memory as:

a catalogue publication transmission content change request message entity; and a catalogue publication transmission package comprising a catalogue publication transmission entity, a catalogue package, where the catalogue publication transmission entity includes an ID, where the catalogue package includes a catalogue entity and a content package, where the catalogue entity includes a complete transmission indicator and an ID, and where the content package includes a content entity; and program code for processing the first message according to the hierarchical organization of the first message package, where processing the first message includes unpacking the first message package based on the common business object model; and program code for sending a second message to the heterogeneous application responsive to the first message, where the second message includes a second message package derived from the common business object model to provide consistent semantics with the first message package.

18. The computer readable medium of claim 17, wherein the content package further includes at least one of the following: a catalogue item package and a catalogue view package.

19. A distributed system operating in a landscape of computer systems providing message-based services defined in a service registry, the system comprising:

a graphical user interface comprising computer readable instructions, embedded on tangible media, for requesting a change, creation, or deletion of at least one catalog item contained in a catalog publication transmission using a request;

a first memory storing a user interface controller for processing the request and involving a message including a message package derived from a common business object model, where the common business object model includes business objects having relationships that enable derivation of message-based service interfaces and message packages, the message package hierarchically organized as:

a catalogue publication transmission content change request message entity; and a catalogue publication transmission package comprising a catalogue publication transmission entity, a catalogue package, where the catalogue publication transmission entity includes an ID, where the catalogue package includes a catalogue entity and a content package, where the catalogue entity includes a complete transmission indicator and an ID, and where the content package includes a content entity; and a second memory, remote from the graphical user interface, storing a plurality of message-based service interfaces derived from the common business object model to provide consistent semantics with messages derived from the common business object model, where one of the message-based service interfaces processes the message according to the hierarchical organization of the message package, where processing the message includes unpacking the first message package based on the common business object model.

20. The distributed system of claim 19, wherein the first memory is remote from the second memory.

21. A tangible computer readable medium including program code for providing a message-based interface for exchanging payment orders in a business-to-business process, the medium comprising:

program code for receiving via a message-based interface derived from a common business object model, where the common business object model includes business objects having relationships that enable derivation of message-based interfaces and message packages, the message-based interface exposing at least one service as defined in a service registry and from a heterogeneous application executing in an environment of computer systems providing message-based services, a first message for requesting a bank to carry out at least one set of payment instructions that includes a first message package derived from the common business object model and hierarchically organized in memory as:

a collective payment order request message entity; and a collective payment order package comprising a collective payment order entity and a payment order package, where the collective payment order entity includes a payment form code, a payment procedure code, an account debit indicator, and a payment execution date, and where the payment order package includes at least one payment order entity, and where each payment order entity includes a net amount; and program code for processing the first message according to the hierarchical organization of the first message package, where processing the first message includes unpacking the first message package based on the common business object model; and program code for sending a second message to the heterogeneous application responsive to the first message, where the second message includes a second message package derived from the common business object model to provide consistent semantics with the first message package.

22. The computer readable medium of claim 21, wherein the payment order package further includes at least one of the following: a party package, a bank account package, a payment instruction package, a state central bank report package, a business transaction document reference package, and a payment explanation package.

23. A distributed system operating in a landscape of computer systems providing message-based services defined in a service registry, the system comprising:

a graphical user interface comprising computer readable instructions, embedded on tangible media, for requesting a bank to carry out at least one set of payment instructions using a request;

a first memory storing a user interface controller for processing the request and involving a message including a message package derived from a common business object model, where the common business object model includes business objects having relationships that enable derivation of message-based service interfaces and message packages, the message package hierarchically organized as:

a collective payment order request message entity; and a collective payment order package comprising a collective payment order entity and a payment order package, where the collective payment order entity includes a payment form code, a payment procedure code, an account debit indicator, and a payment execution date, and where the payment order package includes at least one payment order entity, and where each payment order entity includes a net amount; and a second memory, remote from the graphical user interface, storing a plurality of message-based service interfaces derived from the common business object model to provide consistent semantics with messages derived from the common business object model, where one of the message-based service interfaces processes the message according to the hierarchical organization of the message package, where processing the message includes unpacking the first message package based on the common business object model.

24. The distributed system of claim 23, wherein the first memory is remote from the graphical user interface.

25. A tangible computer readable medium including program code for providing a message-based interface for exchanging information regarding payment behavior of a business partner, the medium comprising:

program code for receiving via a message-based interface derived from a common business object model, where the common business object model includes business objects having relationships that enable derivation of message-based interfaces and message packages, the message-based interface exposing at least one service as defined in a service registry and from a heterogeneous application executing in an environment of computer systems providing message-based services, a first message for notifying credit management about the payment behavior of a business partner that includes a first message package derived from the common business object model and hierarchically organized in memory as:

a credit payment behavior summary notification message entity; and a credit payment behavior summary package comprising a credit payment behavior summary entity and a party package, where the party package includes a debtor party entity, and where the debtor party entity includes an internal ID; and program code for processing the first message according to the hierarchical organization of the first message package, where processing the first message includes unpacking the first message package based on the common business object model; and program code for sending a second message to the heterogeneous application responsive to the first message, where the second message includes a second message package derived from the common business object model to provide consistent semantics with the first message package.

26. The computer readable medium of claim 25, wherein the credit payment behavior summary package further includes at least one of the following: a product information package and a payment information package, where the product information package includes a product category entity and where the payment information package includes a last payment entity.

27. A distributed system operating in a landscape of computer systems providing message-based services defined in a service registry, the system comprising:

a graphical user interface comprising computer readable instructions, embedded on tangible media, for notifying credit management about the payment behavior of a business partner using a request;

a first memory storing a user interface controller for processing the request and involving a message including a message package derived from a common business object model, where the common business object model includes business objects having relationships that enable derivation of message-based service interfaces and message packages, the message package hierarchically organized as:

a credit payment behavior summary notification message entity; and a credit payment behavior summary package comprising a credit payment behavior summary entity and a party package, where the party package includes a debtor party entity, and where the debtor party entity includes an internal ID; and a second memory, remote from the graphical user interface, storing a plurality of message-based service interfaces derived from the common business object model to provide consistent semantics with messages derived from the common business object model, where one of the message-based service interfaces processes the message according to the hierarchical organization of the message package, where processing the message includes unpacking the first message package based on the common business object model.

28. The distributed system of claim 27, wherein the first memory is remote from the graphical user interface.

29. A tangible computer readable medium including program code for providing a message-based interface for exchanging vendor declarations in an application-to-application process between a buyer and a seller, the medium comprising:

program code for receiving via a message-based interface derived from a common business object model, where the common business object model includes business objects having relationships that enable derivation of message-based interfaces and message packages, the message-based interface exposing at least one service as defined in a service registry and from a heterogeneous application executing in an environment of computer systems providing message-based services, a first message for requesting a vendor to complete a long-term vendor declaration for customs purposes that includes a first message package derived from the common business object model and hierarchically organized in memory as:

a customs vendor declaration complete request message entity; and a customs vendor declaration package comprising a customs vendor declaration entity and a party package, where the customs vendor declaration entity includes a creation date, where the party package includes a buyer party entity and a vendor party entity, where the buyer party entity includes an address, and where the vendor party entity includes an address; and program code for processing the first message according to the hierarchical organization of the first message package, where processing the first message includes unpacking the first message package based on the common business object model; and program code for sending a second message to the heterogeneous application responsive to the first message, where the second message includes a second message package derived from the common business object model to provide consistent semantics with the first message package.

30. A distributed system operating in a landscape of computer systems providing message-based services defined in a service registry, the system comprising:

a graphical user interface comprising computer readable instructions, embedded on tangible media, for requesting a vendor to complete a long-term vendor declaration for customs purposes using a request;

a first memory storing a user interface controller for processing the request and involving a message including a message package derived from a common business object model, where the common business object model includes business objects having relationships that enable derivation of message-based service interfaces and message packages, the message package hierarchically organized as:

a customs vendor declaration complete request message entity; and a customs vendor declaration package comprising a customs vendor declaration entity and a party package, where the customs vendor declaration entity includes a creation date, where the party package includes a buyer party entity and a vendor party entity, where the buyer party entity includes an address, and where the vendor party entity includes an address; and a second memory, remote from the graphical user interface, storing a plurality of message-based service interfaces derived from the common business object model to provide consistent semantics with messages derived from the common business object model, where one of the message-based service interfaces processes the message according to the hierarchical organization of the message package, where processing the message includes unpacking the first message package based on the common business object model.

31. The distributed system of claim 30, wherein the first memory is remote from the second memory.

32. A tangible computer readable medium including program code for providing a message-based interface for exchanging details between a buyer and a vendor of product requirements for conditions of purchase orders and deliveries, the medium comprising:

program code for receiving via a message-based interface derived from a common business object model, where the common business object model includes business objects having relationships that enable derivation of message-based interfaces and message packages, the message-based interface exposing at least one service as defined in a service registry and from a heterogeneous application executing in an environment of computer systems providing message-based services, a first message for notifying the vendor about the quantity of a product to be delivered with a certain liability at a certain date in accordance with a scheduling agreement between a buyer and the vendor that includes a first message package derived from the common business object model and hierarchically organized in memory as:

a delivery schedule notification message entity; and a delivery schedule package comprising a delivery schedule entity, a party package, and an item package, where the delivery schedule entity includes a creation date time, where the party package includes a vendor party entity, where the item package includes at least one item entity, a business transaction document reference package, a release package, a product information package, and a schedule line package, where each item entity includes an ID, where the business transaction document reference package includes a scheduling agreement reference entity, where the release package includes a release entity including an ID, where the product information package includes a product entity, where each schedule line package includes at least one schedule line entity, and where each schedule line entity includes a commitment code and a quantity; and program code for processing the first message according to the hierarchical organization of the first message package, where processing the first message includes unpacking the first message package based on the common business object model; and program code for sending a second message to the heterogeneous application responsive to the first message, where the second message includes a second message package derived from the common business object model to provide consistent semantics with the first message package.

33. The computer readable medium of claim 32, wherein the item package further includes at least one of the following: a location package, a product information package, and a delivery information package.

34. A distributed system operating in a landscape of computer systems providing message-based services defined in a service registry, the system comprising:

a graphical user interface comprising computer readable instructions, embedded on tangible media, for notifying the vendor about the quantity of a product to be delivered with a certain liability at a certain date in accordance with a scheduling agreement between a buyer and the vendor using a request;

a first memory storing a user interface controller for processing the request and involving a message including a message package derived from a common business object model, where the common business object model includes business objects having relationships that enable derivation of message-based service interfaces and message packages, the message package hierarchically organized as:

a delivery schedule notification message entity; and a delivery schedule package comprising a delivery schedule entity, a party package, and an item package, where the delivery schedule entity includes a creation date time, where the party package includes a vendor party entity, where the item package includes at least one item entity, a business transaction document reference package, a release package, a product information package, and a schedule line package, where each item entity includes an ID, where the business transaction document reference package includes a scheduling agreement reference entity, where the release package includes a release entity including an ID, where the product information package includes a product entity, where each schedule line package includes at least one schedule line entity, and where each schedule line entity includes a commitment code and a quantity; and a second memory, remote from the graphical user interface, storing a plurality of message-based service interfaces derived from the common business object model to provide consistent semantics with messages derived from the common business object model, where one of the message-based service interfaces processes the message according to the hierarchical organization of the message package, where processing the message includes unpacking the first message package based on the common business object model.

35. A tangible computer readable medium including program code for providing a message-based interface for implementing a financial services business process providing an integrated customer-oriented solution for processing a loan contract request between business applications or entities, the medium comprising:

program code for receiving via a message-based interface derived from a common business object model, where the common business object model includes business objects having relationships that enable derivation of message-based interfaces and message packages, the message-based interface exposing at least one service as defined in a service registry and from a heterogeneous application executing in an environment of computer systems providing message-based services, a first message for requesting a loan management system to create a loan contract that includes a first message package derived from the common business object model and hierarchically organized in memory as:

a loan contract create request message entity; and a loan contract package comprising a loan contract entity, a party package, a product information package, a payment information package, and an item package, where the loan contract entity includes a fixed interest period and an amount, where the party package includes a lender party entity and at least one borrower party entity, where the product information package includes at least a product category entity, where the payment information package includes a payment form entity, and where the item package includes at least one item entity; and program code for processing the first message according to the hierarchical organization of the first message package, where processing the first message includes unpacking the first message package based on the common business object model; and program code for sending a second message to the heterogeneous application responsive to the first message, where the second message includes a second message package derived from the common business object model to provide consistent semantics with the first message package.

36. The computer readable medium of claim 35, wherein the item package further includes at least one of the following: a location package, a product information package, and a delivery information package.

37. A distributed system operating in a landscape of computer systems providing message-based services defined in a service registry, the system comprising:

a graphical user interface comprising computer readable instructions, embedded on tangible media, for requesting a loan management system to create a loan contract using a request;

a first memory storing a user interface controller for processing the request and involving a message including a message package derived from a common business object model, where the common business object model includes business objects having relationships that enable derivation of message-based service interfaces and message packages, the message package hierarchically organized as:

a loan contract create request message entity; and a loan contract package comprising a loan contract entity, a party package, a product information package, a payment information package, and an item package, where the loan contract entity includes a fixed interest period and an amount, where the party package includes a lender party entity and at least one borrower party entity, where the product information package includes at least a product category entity, where the payment information package includes a payment form entity, and where the item package includes at least one item entity; and a second memory, remote from the graphical user interface, storing a plurality of message-based service interfaces derived from the common business object model to provide consistent semantics with messages derived from the common business object model, where one of the message-based service interfaces processes the message according to the hierarchical organization of the message package, where processing the message includes unpacking the first message package based on the common business object model.

* * * * *